US012677830B2

(12) United States Patent
Tanaka et al.

(10) Patent No.: US 12,677,830 B2
(45) Date of Patent: Jul. 14, 2026

(54) 3-ALKOXYBENZAMIDE DERIVATIVE, AND PEST CONTROL AGENT

(71) Applicant: Kumiai Chemical Industry Co., Ltd., Tokyo (JP)

(72) Inventors: Kosuke Tanaka, Tokyo (JP); Sakae Sakurai, Tokyo (JP); Yukihiro Enomoto, Tokyo (JP); Keiji Toriyabe, Tokyo (JP); Hirokazu Arai, Tokyo (JP); Yuhsuke Nakane, Tokyo (JP); Takeshi Matsuda, Tokyo (JP); Akira Takanezawa, Tokyo (JP); Shusuke Koike, Tokyo (JP); Shunsuke Kitahara, Tokyo (JP); Shigeyuki Mukawa, Tokyo (JP)

(73) Assignee: KUMIAI CHEMICAL INDUSTRY CO, LTD., Tokyo (JP)

( * ) Notice: Subject to any disclaimer, the term of this patent is extended or adjusted under 35 U.S.C. 154(b) by 0 days.

(21) Appl. No.: 17/796,592

(22) PCT Filed: Jan. 29, 2021

(86) PCT No.: PCT/JP2021/003204
§ 371 (c)(1),
(2) Date: Jul. 29, 2022

(87) PCT Pub. No.: WO2021/153720
PCT Pub. Date: Aug. 5, 2021

(65) Prior Publication Data

US 2023/0110603 A1 Apr. 13, 2023

(30) Foreign Application Priority Data

Jan. 31, 2020 (JP) ................................ 2020-014653

(51) Int. Cl.

| | |
|---|---|
| ***A01N 37/18*** | (2006.01) |
| ***A01N 25/30*** | (2006.01) |
| ***A01P 5/00*** | (2006.01) |
| ***A01P 7/02*** | (2006.01) |
| ***A01P 7/04*** | (2006.01) |

(52) U.S. Cl.
CPC ............. *A01N 37/18* (2013.01); *A01N 25/30* (2013.01); *A01P 5/00* (2021.08); *A01P 7/02* (2021.08); *A01P 7/04* (2021.08)

(58) Field of Classification Search
CPC ........ A01N 37/18; A01N 25/30; A01N 55/00; A01P 5/00; A01P 7/02; A01P 7/04; C07F 7/081; C07F 7/12; C07C 235/46; C07C 251/40; C07C 271/16; C07C 317/18; C07C 317/28; C07C 323/12; C07C 327/48;

(Continued)

(56) References Cited

U.S. PATENT DOCUMENTS 3,996,280 A * 12/1976 Mendel ................. C07C 243/38 564/150
2005/0215590 A1* 9/2005 Brown ................. C07D 213/38 514/357
2007/0112035 A1 5/2007 Jeschke et al.

FOREIGN PATENT DOCUMENTS

JP 51-125243 A 11/1976
JP 51-131847 A 11/1976

(Continued)

OTHER PUBLICATIONS

Tiefenbrunn, T. et al. "Crystallographic Fragment-based drug discovery . . . " Chem Biol Drug Des. 2014, 83, 141-148. (Year: 2014).*
EPA (https://www.govinfo.gov/content/pkg/CFR-1996-title40-vol11/html/CFR-1996-title40-vol11-sec180-1001.htm, 1996).*
Banitt et al. (J. Med. Chem., 1975, 18(11), 1130-1134).*
Korger et al. (Arzneimittel-Forschung, 1960, 10, 104-109).*
Covello et al. (Rend. dell'Accademia delle Scienze . . . , 1966, 33(Dec.), 309-318.*
Wang et al. (Helv. Chim. Acta, 2012, 95, 2680-2694).*
CAS Registry entry for compound 2139567-55-6, entered Nov. 9, 2017, no pagination.*
CAS Registry entry for compound 1852032-33-7, entered Jan. 25, 2016, no pagination.*

(Continued)

*Primary Examiner* — Mina Haghighatian
*Assistant Examiner* — Nathan W Schlientz
(74) *Attorney, Agent, or Firm* — Day Pitney LLP; Christopher R. Cowles Jd

(57) ABSTRACT

The present invention provides: a 3-alkoxybenzamide derivative having an excellent pest control effect, or a salt thereof; and a pest control agent and a production intermediate which contain the same as an active ingredient. Provided are: a 3-alkoxybenzamide derivative represented by general formula [I]

[I]

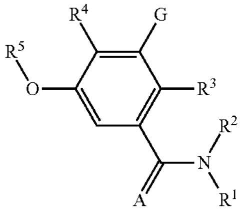

[In the formula, A represents an oxygen atom or a sulfur atom, G represents a hydrogen atom, a halogen atom, or a $C_1$-$C_6$ alkyl group, $R^1$ represents a $C_1$-$C_6$ alkyl group, a $C_3$-$C_6$ cycloalkyl group, etc., $R^2$ represents a hydrogen atom, etc., $R^3$ represents a halogen atom, $C_1$-$C_6$ alkyl group, etc., $R^4$ represents a halogen atom, $C_1$-$C_6$ alkyl group, etc., and $R^5$ represents a $C_1$-$C_{12}$ alkyl group, etc.], or a salt thereof; and a pest control agent characterized by containing said derivative or salt thereof as an active ingredient.

6 Claims, No Drawings

(58) Field of Classification Search
CPC ... C07C 333/04; C07C 311/09; C07C 311/33; C07C 323/17; C07C 323/42
See application file for complete search history.

(56) References Cited

FOREIGN PATENT DOCUMENTS

| | | | | | |
|---|---|---|---|---|---|
| JP | 8-048662 | A | | 2/1996 | |
| JP | 2006-525964 | A | | 11/2006 | |
| JP | 2008-525345 | A | | 7/2008 | |
| JP | 2008-525964 | A | | 7/2008 | |
| JP | 2015-535843 | A | | 12/2015 | |
| WO | WO-9405153 | A1 | * | 3/1944 | ............. A01N 31/14 |
| WO | 2002/092584 | A1 | | 11/2002 | |
| WO | 2019/099703 | A1 | | 5/2019 | |
| WO | WO-2020036940 | A1 | * | 2/2020 | ........... A61K 31/403 |

OTHER PUBLICATIONS

Barrett et al. (JACS, 2013, 135, 2963-2966).*
Barrett et al. (J. Am. Chem. Soc., 2013, 135, 2963-2966).*
CAS registry No. 2373074-41-8, entered registry Sep. 3, 2019, 1 pg. (Year: 2019).*
CAS registry No. 2382562-63-0, entered registry Nov. 25, 2019, 1 pg. (Year: 2019).*
CAS registry No. 2381568-83-6, entered registry Nov. 24, 2019, 1 pg. (Year: 2019).*
CAS Registry No. 2380812-44-0 (RN2380812-44-0) which entered STN registry Nov. 22, 2019 (Year: 2019).*
CAS Registry No. 2373566-99-3 (RN2373566-99-3) which entered STN registry Sep. 4, 2019 (Year: 2019).*
Patani et al. (Chem. Rev., 1996, 96(8), 3147-3176).*
Meisenheimer, Jakob, Rudolf Hanssen, and Alfred Wächterowitz. "Über die Konfiguration o-substituierter Benzophenonoxime." Journal für Praktische Chemie 119, No. 1 (1928): 315-367. (Year: 1928).*
Decision to Grant a Patent in corresponding JP application No. 2021-574142 dated Jun. 20, 2023.
Notice of Reasons for Refusal in corresponding JP application No. 2021-574142 dated Feb. 7, 2023.
International Search Report in corresponding PCT application No. PCT/JP2021/003204 dated Apr. 20, 2021.
Office Action in corresponding KR application No. 10-2022-7026158 dated Oct. 18, 2023.
Extended European Search Report in corresponding EP application No. 21748308.0 dated Feb. 12, 2024.
Second Office Action in corresponding CN application 202180012114.6 dated May 21, 2024.
Office Action in corresponding Korean application No. 10-2024-7005391 dated Nov. 6, 2025.
Xu. M. et al. Continuation of structure-activity relationship study of novel benzamide derivatives as potential antipsychotics. Arch Pharm Chem Life Sci. 2019.
CAS Registry No. 1243371-16-5, published on Sep. 28, 2010.
CAS Registry No. 19503-70-9, published on Nov. 16, 1984.
CAS Registry No. 19503-71-0, published on Nov. 16, 1984.
CAS Registry No. 197141-51-8, published on Nov. 12, 1997.

* cited by examiner

3-ALKOXYBENZAMIDE DERIVATIVE, AND PEST CONTROL AGENT

CROSS REFERENCE TO RELATED APPLICATIONS

This application is a national stage application, filed under 35 U.S.C. § 371, of international application No. PCT/JP2021/003204, filed Jan. 29, 2021, which claims the benefit of Japanese Application No. 2020-014653, filed Jan. 31, 2020, entitled "3-ALKOXY BENZOIC ACID AMIDE DERIVATIVE, AND PEST CONTROL AGENT".

TECHNICAL FIELD

The present invention relates to a novel 3-alkoxybenzamide derivative or an agriculturally acceptable salt thereof, a pest control agent comprising the derivative as an active ingredient, and a production intermediate of the derivative.

BACKGROUND ART

Patent Documents 1 and 2 describe 3-alkoxybenzamide derivatives, but in the compound described in Patent Document 1, the amine moiety of the amide bond is limited to an adamantylalkyl group. In addition, in the compound described in Patent Document 2, the substituent on the alkoxy group is limited to a pyridopyrimidinone ring. Patent Document 3 describes a 3-alkoxybenzamide derivative having herbicidal effect, but does not describe a pest control effect.

CITATION LIST

Patent Document

Patent Document 1: WO 01/042194 A1
Patent Document 2: WO 2016/068580 A2
Patent Document 3: WO 94/05153 A1

SUMMARY OF THE INVENTION

Problems to be Solved by the Invention

It is desired that the pest control agent to be used for useful crops is a chemical agent which is applied to soil or foliage and capable of exhibiting a sufficient pest control effect at a low dosage. In addition, due to an increasing demand for safety and influence on the environment of chemical substances, and development of a safer pest control agent is desired. Furthermore, in recent years, pests having acquired resistance to pest control agents have appeared due to long use of pest control agents such as insecticides and acaricides for many years, and therefore it is difficult to completely control pests. In addition, the use of pest control agents having high human and animal toxicity is also a problem in terms of safety for workers and the like.

Under such circumstances, an object of the present invention is to solve the above-described problems of conventional pest control agents, and to provide a pest control agent excellent in safety, control effect, residual effect, and the like.

Means for Solving the Problems

In order to develop a pest control agent having the above-described preferable properties, the present inventors synthesized various 3-alkoxybenzamide derivatives, and conducted intensive studies on their physiological activity. As a result, the present inventors have found that 3-alkoxybenzamide derivatives (hereinafter, referred to as compounds of the present invention) of formula [I] below exhibit excellent effects on various pests, and have further continued the research to complete the present invention.

That is, the present invention has the following features.

(1) A 3-alkoxybenzamide derivative of formula [I], or an agriculturally acceptable salt thereof,

[Chemical Formula 1]

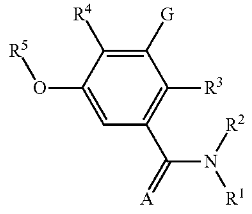

[I]

wherein in the formula [I],

A represents an oxygen atom or a sulfur atom,

G represents a hydrogen atom; a halogen atom; or a (C1-C6)alkyl, $R^1$ represents a (C1-C6)alkyl; a (C1-C6)haloalkyl; a (C3-C6)cycloalkyl; a (C3-C6)halocycloalkyl; a (C2-C6) alkenyl; a (C2-C6)haloalkenyl; a (C2-C6)alkynyl; a (C2-C6)haloalkynyl; a (C1-C6)alkoxy; a (C1-C6)haloalkoxy; a (C1-C6)alkoxy (C1-C6)alkyl; a (C3-C6) cycloalkyl (C1-C6)alkyl; a (C3-C6)halocycloalkyl (C1-C6)alkyl; a cyano (C1-C6)alkyl; a cyano (C3-C6) cycloalkyl; a cyano (C3-C6)cycloalkyl (C1-C6)alkyl; a cyano heterocycloalkyl; a hydroxy (C3-C6)cycloalkyl; a (C1-C6)alkylcarbonyloxy (C3-C6)cycloalkyl; a (C1-C6)alkylsulfonyloxy (C3-C6)cycloalkyl; a (C1-C6) alkoxy (C3-C6)cycloalkyl; a (C1-C6)haloalkoxy (C3-C6)cycloalkyl; a (C1-C6)alkylthio (C3-C6)cycloalkyl; a (C1-C6)haloalkylthio (C3-C6)cycloalkyl; a (C1-C6) alkylsulfinyl (C3-C6)cycloalkyl; a (C1-C6)haloalkylsulfinyl (C3-C6)cycloalkyl; a (C1-C6)alkylsulfonyl (C3-C6)cycloalkyl; a (C1-C6)haloalkylsulfonyl (C3-C6)cycloalkyl; a (C2-C6)alkynyl (C3-C6)cycloalkyl; a (C1-C6)alkoxycarbonyl (C3-C6)cycloalkyl; a carboxy (C3-C6)cycloalkyl; a carbamoyl (C3-C6)cycloalkyl; a (C1-C6)alkylaminocarbonyl (C3-C6)cycloalkyl (the amino moiety is optionally substituted with $R^{10}$); a (C4-C8)bicycloalkyl; a (C1-C6)alkoxyimino; a phenyl (the phenyl is optionally mono-substituted or poly-substituted with $R^7$); a phenyl (C1-C6)alkyl (the phenyl moiety is optionally mono-substituted or poly-substituted with $R^7$); a heteroaryl (the heteroaryl is optionally mono-substituted or poly-substituted with $R^7$); a heteroaryl (C1-C3)alkyl (the heteroaryl moiety is optionally mono-substituted or poly-substituted with $R^7$); a heteroaryl (C3-C6)cycloalkyl (the heteroaryl moiety is optionally mono-substituted or poly-substituted with $R^7$); a heterocycloalkyl (the heterocycloalkyl is optionally substituted with $R^{10}$); a heterocycloalkyl (C1-C6) alkyl (the heterocycloalkyl moiety is optionally substituted with $R^{10}$); or a heterocycloalkyl (C3-C6) cycloalkyl (the heterocycloalkyl moiety is optionally substituted with $R^{10}$), $R^2$ represents a hydrogen atom; a (C1-C6)alkyl; a (C1-C6)haloalkyl; a (C3-C6)cycloalkyl; a (C3-C6)halocycloalkyl; a (C2-C6)alkenyl; a (C2-C6)haloalkenyl; a (C2-C6)alkynyl; a (C2-C6)haloalkynyl; a (C1-C6) alkoxy; a (C1-C6)haloalkoxy; a (C3-C6)cycloalkyl (C1-C6)alkyl; a (C3-C6)halocycloalkyl (C1-C6)alkyl; a phenyl (the phenyl is optionally mono-substituted or poly-substituted with $R^7$); a phenyl (C1-C6)alkyl (the phenyl moiety is optionally mono-substituted or poly-substituted with $R^7$); a heteroaryl (the heteroaryl is optionally mono-substituted or poly-substituted with $R^7$); a heteroaryl (C1-C3)alkyl (the heteroaryl moiety is optionally mono-substituted or poly-substituted with $R^7$); a cyano; a cyano (C1-C6)alkyl; a cyano (C3-C6) cycloalkyl; a hydroxy; a hydroxy (C1-C6)alkyl; a (C1-C6)alkoxy (C1-C6)alkyl; a formyl; an amino; a (C1-C6)alkylamino (the amino moiety is optionally substituted with $R^{10}$); a (C1-C6)alkylcarbonyl; a (C1-C6)alkoxy (C1-C6)alkylcarbonyl; a (C3-C6)cycloalkylcarbonyl; a (C3-C6)cycloalkyl (C1-C6)alkylcarbonyl; a benzoyl (the benzoyl is optionally mono-substituted or poly-substituted with $R^7$); a (C1-C6) alkoxycarbonyl; a (C1-C6)haloalkoxycarbonyl; a (C2-C6)alkenyloxycarbonyl; a carbamoyl; a (C1-C6) alkylaminocarbonyl (the amino moiety is optionally substituted with $R^{10}$); a (C1-C6)alkoxycarbonyl (C1-C6)alkylamino (the amino moiety is optionally substituted with $R^{10}$); a (C1-C6)alkoxycarbonylamino (the amino moiety is optionally substituted with $R^{10}$); a ((C1-C6)alkylthio)carbonyl; a ((C1-C6)alkyl)thiocarbonyl; a ((C1-C6)alkoxy)thiocarbonyl; a thiocarbamoyl; a (C1-C6)alkylaminothiocarbonyl (the amino moiety is optionally substituted with $R^{10}$); a (C1-C6) alkylsulfonyl; a (C1-C6)haloalkylsulfonyl; a sulfamoyl; a (C1-C6)alkylaminosulfonyl (the amino moiety is optionally substituted with $R^{10}$); a (C1-C6) alkoxycarbonyl (C1-C6)alkyl; an aminocarbonyl (C1-C6)alkyl; a (C1-C6)alkylaminocarbonyl (C1-C6)alkyl (the amino moiety is optionally substituted with $R^{10}$); a (C3-C6)cycloalkylaminocarbonyl (C1-C6)alkyl (the amino moiety is optionally substituted with $R^{10}$); a (C1-C6)haloalkylaminocarbonyl (C1-C6)alkyl (the amino moiety is optionally substituted with $R^{10}$); a (C1-C6)alkylcarbonyl (C1-C6)alkyl; a (C1-C6)haloalkylcarbonyl (C1-C6)alkyl; a (C1-C6)alkylcarbonyloxy (C1-C6)alkyl; a (C1-C6)alkoxycarbonyloxy (C1-C6) alkyl; a (C1-C6)alkoxycarbonylamino (C1-C6)alkyl (the amino moiety is optionally substituted with a (C1-C6)alkyl); a hydroxyimino; a hydroxyimino (C1-C6)alkyl; a (C1-C6)alkoxyimino; a (C1-C6)alkoxyimino (C1-C6)alkyl; or a (C1-C6)haloalkoxyimino (C1-C6)alkyl, or $R^1$ and $R^2$, together with the nitrogen atom to which $R^1$ and $R^2$ are attached form a 3- to 8-membered heterocyclic ring or a 3- to 8-membered heterocyclic ring having 1 to 4 heteroatoms selected from an oxygen atom, a sulfur atom, and a nitrogen atom, wherein the formed heterocyclic ring is optionally substituted with a halogen atom, a cyano, a nitro, a (C1-C6)alkyl, a (C1-C6)alkoxy, a (C1-C6)haloalkyl, or an oxo, $R^3$ represents a halogen atom; a cyano; a (C1-C6)alkyl; a (C1-C6)haloalkyl; a (C3-C6)cycloalkyl; a (C1-C6) alkoxy; or a (C1-C6)haloalkoxy, $R^4$ represents a hydrogen atom; a halogen atom; a (C1-C6)alkyl; or a (C1-C6)haloalkyl, $R^5$ represents a (C1-C12)alkyl (the (C1-C12)alkyl is optionally mono-substituted or poly-substituted with $R^6$); a (C3-C6)cycloalkyl (the (C3-C6)cycloalkyl is optionally mono-substituted or poly-substituted with $R^6$); a (C2-C6)alkenyl (the (C2-C6)alkenyl is optionally mono-substituted or poly-substituted with $R^6$); or a (C2-C6)alkynyl (the (C2-C6)alkynyl is optionally mono-substituted or poly-substituted with $R^6$), $R^6$ represents a halogen atom; a (C1-C6)alkyl; a (C1-C6) haloalkyl; a (C3-C6)cycloalkyl; a (C3-C6)halocycloalkyl; a hydroxy; a (C1-C6)alkoxy; a (C1-C6)haloalkoxy; a (C3-C6)cycloalkoxy; a (C3-C6) halocycloalkoxy; a (C1-C6)alkoxy (C1-C6)alkoxy; a (C1-C6)haloalkoxy (C1-C6)alkoxy; a (C1-C6)haloalkoxy (C1-C6)haloalkoxy; a thiol; a (C1-C6)alkylthio; a (C1-C6)haloalkylthio; a (C2-C6)alkenylthio; a (C2-C6)haloalkenylthio; a (C3-C6)cycloalkylthio; a (C3-C6)halocycloalkylthio; a (C3-C6)cycloalkyl (C1-C6)alkylthio; a (C3-C6)halocycloalkyl (C1-C6)alkylthio; a tri((C1-C6)alkyl)silyl (C1-C6)alkylthio; a (C1-C6)alkylthio (C1-C6)alkoxy; a (C1-C6)haloalkylthio (C1-C6)alkoxy; a (C1-C6)alkylsulfinyl; a (C1-C6)haloalkylsulfinyl; a (C3-C6)cycloalkylsulfinyl; a (C3-C6) halocycloalkylsulfinyl; a (C1-C6)alkylsulfonyl; a (C1-C6)haloalkylsulfonyl; a (C3-C6)cycloalkylsulfonyl; a (C3-C6)halocycloalkylsulfonyl; a formyl; a (C1-C6) alkylcarbonyl; a (C1-C6)haloalkylcarbonyl; a benzoyl (the benzoyl is optionally mono-substituted or poly-substituted with $R^7$); a (C1-C6)alkoxycarbonyl; a (C1-C6)haloalkoxycarbonyl; a (C1-C6)alkylaminocarbonyl (the amino moiety is optionally substituted with $R^{10}$); a (C1-C6)haloalkylaminocarbonyl (the amino moiety is optionally substituted with $R^{10}$); a (C1-C6)alkylaminocarbonylthio (the amino moiety is optionally substituted with $R^{10}$); a (C1-C6)haloalkylaminocarbonylthio (the amino moiety is optionally substituted with $R^{10}$); a formyloxy; a (C1-C6)alkylcarbonyloxy; a (C1-C6) haloalkylcarbonyloxy; a benzoyloxy (the benzoyloxy is optionally mono-substituted or poly-substituted with $R^7$); a (C1-C6)alkylsulfinyloxy; a (C1-C6)haloalkylsulfinyloxy; a (C3-C6)cycloalkylsulfinyloxy; a (C3-C6)halocycloalkylsulfinyloxy; a phenylsulfinyloxy (the phenylsulfinyloxy is optionally mono-substituted or poly-substituted with $R^7$); a (C1-C6)alkylsulfonyloxy; a (C1-C6)haloalkylsulfonyloxy; a (C3-C6)cycloalkylsulfonyloxy; a (C3-C6)halocycloalkylsulfonyloxy; a phenylsulfonyloxy (the phenyl moiety is optionally mono-substituted or poly-substituted with $R^7$); an amino; a (C1-C6)alkylamino (the amino moiety is optionally substituted with $R^{10}$); a (C1-C6)haloalkylamino (the amino moiety is optionally substituted with $R^{10}$); a (C1-C6)alkylcarbonylamino (the amino moiety is optionally substituted with $R^{10}$); a (C1-C6)haloalkylcarbonylamino (the amino moiety is optionally substituted with $R^{10}$); a phenylcarbonylamino (the phenyl moiety is optionally mono-substituted or poly-substituted with $R^7$, and the amino moiety is optionally substituted with $R^{10}$); a (C1-C6)alkoxycarbonylamino (the amino moiety is optionally substituted with $R^{10}$); a (C1-C6)haloalkoxycarbonylamino (the amino moiety is optionally substituted with $R^{10}$); a (C1-C6)alkylaminocarbonylamino (the amino moiety is optionally substituted with $R^{10}$); a (C1-C6)haloalkylaminocarbonylamino (the amino moiety is optionally substituted with $R^{10}$); a (C1-C6)alkylsulfinylamino (the amino moiety is optionally substituted with $R^{10}$); a (C1-C6) haloalkylsulfinylamino (the amino moiety is optionally substituted with $R^{10}$); a phenylsulfinylamino (the phenyl moiety is optionally mono-substituted or poly-substituted with $R^7$, and the amino moiety is optionally substituted with $R^{10}$); a (C1-C6)alkylsulfonylamino (the amino moiety is optionally substituted with $R^{10}$); a (C1-C6)haloalkylsulfonylamino (the amino moiety is optionally substituted with $R^{10}$); a phenylsulfonylamino (the phenyl moiety is optionally mono-substituted or poly-substituted with $R^7$, and the amino moiety is optionally substituted with $R^{10}$); a (C1-C6) alkoxyimino; a tri((C1-C6)alkyl)silyl; a phenyl (the phenyl is optionally mono-substituted or poly-substituted with $R^7$); a phenoxy (the phenoxy is optionally mono-substituted or poly-substituted with $R^7$); a phenyl (C1-C6)alkoxy (the phenyl moiety is optionally mono-substituted or poly-substituted with $R^7$); a phenylthio (the phenylthio is optionally mono-substituted or poly-substituted with $R^7$); a phenylsulfinyl (the phenylsulfinyl is optionally mono-substituted or poly-substituted with $R^7$); a phenylsulfonyl (the phenylsulfonyl is optionally mono-substituted or poly-substituted with $R^7$); a phenyl (C1-C6)alkylthio (the phenyl moiety is optionally mono-substituted or poly-substituted with $R^7$); a phenyl (C1-C6)alkylsulfinyl (the phenyl moiety is optionally mono-substituted or poly-substituted with $R^7$); a phenyl (C1-C6)alkylsulfonyl (the phenyl moiety is optionally mono-substituted or poly-substituted with $R^7$); a —O—N═C($R^8$) ($R^9$) group; an adamantyl; an azetidinyl (a nitrogen atom of the azetidinyl is optionally substituted with $R^{10}$); a pyrrolidinyl (a nitrogen atom of the pyrrolidinyl is optionally substituted with $R^{10}$); a piperidinyl (a nitrogen atom of the piperidinyl is optionally substituted with $R^{10}$); a 1,3-dioxolanyl; a 1,3-dioxanyl; a pyrrolyl (the pyrrolyl is optionally mono-substituted or poly-substituted with $R^7$); a pyrazolyl (the pyrazolyl is optionally mono-substituted or poly-substituted with $R^7$); an imidazolyl (the imidazolyl is optionally mono-substituted or poly-substituted with $R^7$); a triazolyl (the triazolyl is optionally mono-substituted or poly-substituted with $R^7$); an oxazolyl (the oxazolyl is optionally mono-substituted or poly-substituted with $R^7$); an isoxazolyl (the isoxazolyl is optionally mono-substituted or poly-substituted with $R^7$); a thiazolyl (the thiazolyl is optionally mono-substituted or poly-substituted with $R^7$); an isothiazolyl (the isothiazolyl is optionally mono-substituted or poly-substituted with $R^7$); a pyridyl (the pyridyl is optionally mono-substituted or poly-substituted with $R^7$, and further a nitrogen atom of the pyridyl is optionally oxidized to form a N-oxide); a pyrimidinyl (the pyrimidinyl is optionally mono-substituted or poly-substituted with $R^7$); a pyridyloxy (the pyridyloxy is optionally mono-substituted or poly-substituted with $R^7$); a tetrahydrofuranyl (the tetrahydrofuranyl is optionally mono-substituted or poly-substituted with $R^7$); a 1,3-dioxoisoindolinyl (the 1,3-dioxoisoindolinyl is optionally mono-substituted or poly-substituted with $R^7$); a cyano; a nitro; a carboxy; a thiocyanato; or an aminooxy, $R^7$ represents a halogen atom; a (C1-C6)alkyl; a (C1-C6) haloalkyl; a (C3-C6)cycloalkyl; a (C3-C6)halocycloalkyl; a (C3-C6)cycloalkyl (C1-C6)alkyl; a (C3-C6)halocycloalkyl (C1-C6)alkyl; a (C1-C6)alkoxy; a (C1-C6)haloalkoxy; a (C1-C6)alkylthio; a (C1-C6) haloalkylthio; a (C1-C6)alkylsulfinyl; a (C1-C6) haloalkylsulfinyl; a (C1-C6)alkylsulfonyl; a (C1-C6) haloalkylsulfonyl; a (C1-C6)alkylthio (C1-C6)alkyl; a (C1-C6)haloalkylthio (C1-C6)alkyl; a (C1-C6)alkylsulfonyloxy; a (C1-C6)haloalkylsulfonyloxy; a phenyl (the phenyl is optionally mono-substituted or poly-substituted with a halogen atom, an alkyl, or a haloalkyl); a phenyl (C1-C6)alkyl; a phenyl (C1-C6) alkoxy; a cyano; or a nitro, $R^8$ and $R^9$ are identical to or different from each other, and represent a hydrogen atom; a (C1-C6)alkyl; a (C1-C6) haloalkyl; a (C3-C6)cycloalkyl; a (C3-C6)halocycloalkyl; or a phenyl (the phenyl is optionally mono-substituted or poly-substituted with $R^7$); or $R^8$ and $R^9$, together with the carbon atom to which $R^8$ and $R^9$ are attached form a 3- to 6-membered ring, and $R^{10}$ represents a (C1-C6)alkyl; a (C1-C6) haloalkyl; a (C3-C6)cycloalkyl; a (C3-C6)halocycloalkyl; a (C1-C6)alkoxy; a (C1-C6)alkoxy (C1-C6)alkyl; a (C1-C6) haloalkoxy (C1-C6)alkyl; a (C1-C6)alkoxy (C1-C6) alkoxy (C1-C6)alkyl; a (C1-C6)alkylthio (C1-C6) alkyl; a (C1-C6)alkylsulfinyl (C1-C6)alkyl; a (C1-C6) alkylsulfonyl (C1-C6)alkyl; a (C1-C6)alkylthio (C1-C6)alkoxy (C1-C6)alkyl; a (C1-C6)alkylsulfinyl (C1-C6)alkoxy (C1-C6)alkyl; a (C1-C6)alkylsulfonyl (C1-C6)alkoxy (C1-C6)alkyl; a cyano (C1-C6)alkyl; a cyano (C1-C6)alkoxy (C1-C6)alkyl; a (C1-C6)alkylcarbonyl; a (C1-C6)haloalkylcarbonyl; a (C1-C6) alkoxycarbonyl; a (C1-C6)haloalkoxycarbonyl; a (C1-C6)alkylaminocarbonyl; a (C1-C6) haloalkylaminocarbonyl; a benzoyl (the benzoyl is optionally mono-substituted or poly-substituted with $R^7$); a (C1-C6)alkylsulfonyl; a (C1-C6)haloalkylsulfonyl; a (C1-C6)alkylcarbonyl (C1-C6)alkyl; a (C1-C6) alkoxycarbonyl (C1-C6)alkyl; a (C1-C6)alkylaminocarbonyl (C1-C6)alkyl; a (C1-C6)alkylcarbonyloxy (C1-C6)alkyl; a (C1-C6)alkoxycarbonyloxy (C1-C6) alkyl; a (C1-C6)alkoxycarbonylamino (C1-C6)alkyl (the amino moiety is optionally substituted with a (C1-C6)alkyl); or a 5-methyl-1,3-dioxole-2-one-4-yl-methyl.

(2) An agrochemical composition comprising the 3-alkoxybenzamide derivative or the agriculturally acceptable salt thereof according to (1) as an active ingredient.

(3) The agrochemical composition according to (2), which further comprises a surfactant.

(4) A pest control agent comprising the 3-alkoxybenzamide derivative or the agriculturally acceptable salt thereof according to (1) as an active ingredient.

(5) The pest control agent according to (4), wherein the pest control agent is an insecticide, a nematicide, and an acaricide.

(6) The pest control agent according to (5), wherein the pest control agent is capable of controlling pests in a paddy field, a dry field, a lawn, an orchard, a non-crop land, a greenhouse, a raising seeding facility, and a plant factory where an agricultural or horticultural plant is cultivated.

(7) The pest control agent according to (6), wherein the agricultural or horticultural plant is a plant to which resistance is imparted by a breeding or genetic modification techniques.

(8) A process for controlling a pest, comprising a step of applying an effective amount of the 3-alkoxybenzamide derivative or the agriculturally acceptable salt thereof according to (1).

(9) A process for controlling a pest, comprising a step of applying an agrochemical composition comprising the 3-alkoxybenzamide derivative or the agriculturally acceptable salt thereof according to (1) as an active ingredient to an agricultural or horticultural crop or a place where the agricultural or horticultural crop is to be grown or being grown, in a single or divided dose.

(10) The process for controlling a pest according to (8) or (9), wherein a place where a pest control agent is applied is a paddy field, a dry field, a lawn, an orchard, a non-crop land, a greenhouse, a raising seeding facility, and a plant factory.

(11) The process for controlling a pest according to any one of (8) to (10), wherein the 3-alkoxybenzamide derivative or agriculturally acceptable salt thereof according to (1) is used as an insecticide, a nematicide, and an acaricide.

(12) A process for using a pest control agent, characterized in that, in the process, the pest control agent according to any one of (4) to (7) is applied for controlling a pest harmful to an agricultural or horticultural crop.

(13) A hydroxybenzamide derivative of formula [II], or a salt thereof,

[Chemical Formula 2]

[II]

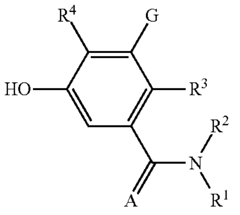

wherein in the formula [II],

A represents an oxygen atom or a sulfur atom,

G represents a hydrogen atom; a halogen atom; or a (C1-C6)alkyl, $R^1$ represents a (C1-C6)alkyl; a (C1-C6)haloalkyl; a (C3-C6)cycloalkyl; a (C3-C6)halocycloalkyl; a (C2-C6) alkenyl; a (C2-C6)haloalkenyl; a (C2-C6)alkynyl; a (C2-C6)haloalkynyl; a (C1-C6)alkoxy; a (C1-C6)haloalkoxy; a (C1-C6)alkoxy (C1-C6)alkyl; a (C3-C6) cycloalkyl (C1-C6)alkyl; a (C3-C6)halocycloalkyl (C1-C6)alkyl; a cyano (C1-C6)alkyl; a cyano (C3-C6) cycloalkyl; a cyano (C3-C6)cycloalkyl (C1-C6)alkyl; a cyano heterocycloalkyl; a hydroxy (C3-C6)cycloalkyl; a (C1-C6)alkylcarbonyloxy (C3-C6)cycloalkyl; a (C1-C6)alkylsulfonyloxy (C3-C6)cycloalkyl; a (C1-C6) alkoxy (C3-C6)cycloalkyl; a (C1-C6)haloalkoxy (C3-C6)cycloalkyl; a (C1-C6)alkylthio (C3-C6)cycloalkyl; a (C1-C6)haloalkylthio (C3-C6)cycloalkyl; a (C1-C6) alkylsulfinyl (C3-C6)cycloalkyl; a (C1-C6)haloalkylsulfinyl (C3-C6)cycloalkyl; a (C1-C6)alkylsulfonyl (C3-C6)cycloalkyl; a (C1-C6)haloalkylsulfonyl (C3-C6)cycloalkyl; a (C2-C6)alkynyl (C3-C6)cycloalkyl; a (C1-C6)alkoxycarbonyl (C3-C6)cycloalkyl; a carboxy (C3-C6)cycloalkyl; a carbamoyl (C3-C6)cycloalkyl; a (C1-C6)alkylaminocarbonyl (C3-C6)cycloalkyl (the amino moiety is optionally substituted with $R^{10}$); a (C4-C8)bicycloalkyl; a (C1-C6)alkoxyimino; a phenyl (the phenyl is optionally mono-substituted or poly-substituted with $R^7$); a phenyl (C1-C6)alkyl (the phenyl moiety is optionally mono-substituted or poly-substituted with $R^7$); a heteroaryl (the heteroaryl is optionally mono-substituted or poly-substituted with $R^7$); a heteroaryl (C1-C3)alkyl (the heteroaryl moiety is optionally mono-substituted or poly-substituted with $R^7$); a heteroaryl (C3-C6)cycloalkyl (the heteroaryl moiety is optionally mono-substituted or poly-substituted with $R^7$); a heterocycloalkyl (the heterocycloalkyl is optionally substituted with $R^{10}$); a heterocycloalkyl (C1-C6) alkyl (the heterocycloalkyl moiety is optionally substituted with $R^{10}$); or a heterocycloalkyl (C3-C6) cycloalkyl (the heterocycloalkyl moiety is optionally substituted with $R^{10}$), $R^2$ represents a hydrogen atom; a (C1-C6)alkyl; a (C1-C6)haloalkyl; a (C3-C6)cycloalkyl; a (C3-C6)halocycloalkyl; a (C2-C6)alkenyl; a (C2-C6)haloalkenyl; a (C2-C6)alkynyl; a (C2-C6)haloalkynyl; a (C1-C6) alkoxy; a (C1-C6)haloalkoxy; a (C3-C6)cycloalkyl (C1-C6)alkyl; a (C3-C6)halocycloalkyl (C1-C6)alkyl; a phenyl (the phenyl is optionally mono-substituted or poly-substituted with $R^7$); a phenyl (C1-C6)alkyl (the phenyl moiety is optionally mono-substituted or poly-substituted with $R^7$); a heteroaryl (the heteroaryl is optionally mono-substituted or poly-substituted with $R^7$); a heteroaryl (C1-C3)alkyl (the heteroaryl moiety is optionally mono-substituted or poly-substituted with $R^7$); a cyano; a cyano (C1-C6)alkyl; a cyano (C3-C6) cycloalkyl; a hydroxy; a hydroxy (C1-C6)alkyl; a (C1-C6)alkoxy (C1-C6)alkyl; a formyl; an amino; a (C1-C6)alkylamino (the amino moiety is optionally substituted with $R^{10}$); a (C1-C6)alkylcarbonyl; a (C1-C6)alkoxy (C1-C6)alkylcarbonyl; a (C3-C6)cycloalkylcarbonyl; a (C3-C6)cycloalkyl (C1-C6)alkylcarbonyl; a benzoyl (the benzoyl is optionally mono-substituted or poly-substituted with $R^7$); a (C1-C6) alkoxycarbonyl; a (C1-C6)haloalkoxycarbonyl; a (C2-C6)alkenyloxycarbonyl; a carbamoyl; a (C1-C6) alkylaminocarbonyl (the amino moiety is optionally substituted with $R^{10}$); a (C1-C6)alkoxycarbonyl (C1-C6)alkylamino (the amino moiety is optionally substituted with $R^{10}$); a (C1-C6)alkoxycarbonylamino (the amino moiety is optionally substituted with $R^{10}$); a ((C1-C6)alkylthio)carbonyl; a ((C1-C6)alkyl)thiocarbonyl; a ((C1-C6)alkoxy)thiocarbonyl; a thiocarbamoyl; a (C1-C6)alkylaminothiocarbonyl (the amino moiety is optionally substituted with $R^{10}$); a (C1-C6) alkylsulfonyl; a (C1-C6)haloalkylsulfonyl; a sulfamoyl; a (C1-C6)alkylaminosulfonyl (the amino moiety is optionally substituted with $R^{10}$); a (C1-C6) alkoxycarbonyl (C1-C6)alkyl; an aminocarbonyl (C1-C6)alkyl; a (C1-C6)alkylaminocarbonyl (C1-C6)alkyl (the amino moiety is optionally substituted with $R^{10}$); a (C3-C6)cycloalkylaminocarbonyl (C1-C6)alkyl (the amino moiety is optionally substituted with $R^{10}$); a (C1-C6)haloalkylaminocarbonyl (C1-C6)alkyl (the amino moiety is optionally substituted with $R^{10}$); a (C1-C6)alkylcarbonyl (C1-C6)alkyl; a (C1-C6)haloalkylcarbonyl (C1-C6)alkyl; a (C1-C6)alkylcarbonyloxy (C1-C6)alkyl; a (C1-C6)alkoxycarbonyloxy (C1-C6) alkyl; a (C1-C6)alkoxycarbonylamino (C1-C6)alkyl (the amino moiety is optionally substituted with a (C1-C6)alkyl); a hydroxyimino; a hydroxyimino (C1-C6)alkyl; a (C1-C6)alkoxyimino; a (C1-C6)alkoxyimino (C1-C6)alkyl; or a (C1-C6)haloalkoxyimino (C1-C6)alkyl, or $R^1$ and $R^2$, together with the nitrogen atom to which $R^1$ and $R^2$ are attached form a 3- to 8-membered heterocyclic ring or a 3- to 8-membered heterocyclic ring having 1 to 4 heteroatoms selected from an oxygen atom, a sulfur atom, and a nitrogen atom, and the heterocyclic ring is optionally substituted with a halogen atom, a cyano, a nitro, a (C1-C6)alkyl, a (C1-C6) alkoxy, a (C1-C6)haloalkyl, or an oxo, $R^3$ represents a halogen atom; a cyano; a (C1-C6)alkyl; a (C1-C6)haloalkyl; a (C3-C6)cycloalkyl; a (C1-C6) alkoxy; or a (C1-C6)haloalkoxy, $R^4$ represents a hydrogen atom; a halogen atom; a (C1-C6)alkyl; or a (C1-C6) haloalkyl, $R^7$ represents a halogen atom; a (C1-C6)alkyl; a (C1-C6) haloalkyl; a (C3-C6)cycloalkyl; a (C3-C6)halocycloalkyl; a (C3-C6)cycloalkyl (C1-C6)alkyl; a (C3-C6)halocycloalkyl (C1-C6)alkyl; a (C1-C6)alkoxy; a (C1-C6)haloalkoxy; a (C1-C6)alkylthio; a (C1-C6) haloalkylthio; a (C1-C6)alkylsulfinyl; a (C1-C6) haloalkylsulfinyl; a (C1-C6)alkylsulfonyl; a (C1-C6) haloalkylsulfonyl; a (C1-C6)alkylthio (C1-C6)alkyl; a (C1-C6)haloalkylthio (C1-C6)alkyl; a (C1-C6)alkylsulfonyloxy; a (C1-C6)haloalkylsulfonyloxy; a phenyl (the phenyl is optionally mono-substituted or poly-substituted with a halogen atom, an alkyl, or a haloalkyl); a phenyl (C1-C6)alkyl; a phenyl (C1-C6) alkoxy; a cyano; or a nitro, and $R^{10}$ represents a (C1-C6)alkyl; a (C1-C6) haloalkyl; a (C3-C6)cycloalkyl; a (C3-C6)halocycloalkyl; a (C1-C6)alkoxy; a (C1-C6)alkoxy (C1-C6)alkyl; a (C1-C6) haloalkoxy (C1-C6)alkyl; a (C1-C6)alkoxy (C1-C6) alkoxy (C1-C6)alkyl; a (C1-C6)alkylthio (C1-C6) alkyl; a (C1-C6)alkylsulfinyl (C1-C6)alkyl; a (C1-C6) alkylsulfonyl (C1-C6)alkyl; a (C1-C6)alkylthio (C1-C6)alkoxy (C1-C6)alkyl; a (C1-C6)alkylsulfinyl (C1-C6)alkoxy (C1-C6)alkyl; a (C1-C6)alkylsulfonyl (C1-C6)alkoxy (C1-C6)alkyl; a cyano (C1-C6)alkyl; a cyano (C1-C6)alkoxy (C1-C6)alkyl; a (C1-C6)alkylcarbonyl; a (C1-C6)haloalkylcarbonyl; a (C1-C6) alkoxycarbonyl; a (C1-C6)haloalkoxycarbonyl; a (C1-C6)alkylaminocarbonyl; a (C1-C6) haloalkylaminocarbonyl; a benzoyl (the benzoyl is optionally mono-substituted or poly-substituted with $R^7$); a (C1-C6)alkylsulfonyl; a (C1-C6)haloalkylsulfonyl; a (C1-C6)alkylcarbonyl (C1-C6)alkyl; a (C1-C6) alkoxycarbonyl (C1-C6)alkyl; a (C1-C6)alkylaminocarbonyl (C1-C6)alkyl; a (C1-C6)alkylcarbonyloxy (C1-C6)alkyl; a (C1-C6)alkoxycarbonyloxy (C1-C6) alkyl; a (C1-C6)alkoxycarbonylamino (C1-C6)alkyl (the amino moiety is optionally substituted with a (C1-C6)alkyl); or a 5-methyl-1,3-dioxole-2-one-4-yl-methyl.

(14) An alkoxybenzoic acid derivative of formula [III] or a salt thereof,

[Chemical Formula 3]

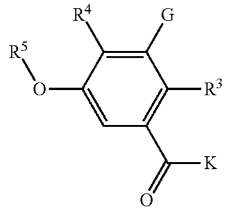

[III]

wherein in the formula [III],

G represents a hydrogen atom; a halogen atom; or a (C1-C6)alkyl,

K represents a hydroxy; a (C1-C6)alkoxy; or a phenoxy (the phenoxy is optionally mono-substituted or poly-substituted with $R^7$), $R^3$ represents a halogen atom; a cyano; a (C1-C6)alkyl; a (C1-C6)haloalkyl; a (C3-C6)cycloalkyl; a (C1-C6) alkoxy; or a (C1-C6)haloalkoxy, $R^4$ represents a hydrogen atom; a halogen atom; a (C1-C6)alkyl; or a (C1-C6)haloalkyl, $R^5$ represents a (C1-C12)alkyl (the (C1-C12)alkyl is optionally mono-substituted or poly-substituted with $R^6$); a (C3-C6)cycloalkyl (the (C3-C6)cycloalkyl is optionally mono-substituted or poly-substituted with $R^6$); a (C2-C6)alkenyl (the (C2-C6)alkenyl is optionally mono-substituted or poly-substituted with $R^6$); or a (C2-C6)alkynyl (the (C2-C6)alkynyl is optionally mono-substituted or poly-substituted with $R^6$), $R^6$ represents a halogen atom; a (C1-C6)alkyl; a (C1-C6) haloalkyl; a (C3-C6)cycloalkyl; a (C3-C6)halocycloalkyl; a hydroxy; a (C1-C6)alkoxy; a (C1-C6)haloalkoxy; a (C3-C6)cycloalkoxy; a (C3-C6) halocycloalkoxy; a (C1-C6)alkoxy (C1-C6)alkoxy; a (C1-C6)haloalkoxy (C1-C6)alkoxy; a (C1-C6)haloalkoxy (C1-C6)haloalkoxy; a thiol; a (C1-C6)alkylthio; a (C1-C6)haloalkylthio; a (C2-C6)alkenylthio; a (C2-C6)haloalkenylthio; a (C3-C6)cycloalkylthio; a (C3-C6)halocycloalkylthio; a (C3-C6)cycloalkyl (C1-C6)alkylthio; a (C3-C6)halocycloalkyl (C1-C6)alkylthio; a tri((C1-C6)alkyl)silyl (C1-C6)alkylthio; a (C1-C6)alkylthio (C1-C6)alkoxy; a (C1-C6)haloalkylthio (C1-C6)alkoxy; a (C1-C6)alkylsulfinyl; a (C1-C6)haloalkylsulfinyl; a (C3-C6)cycloalkylsulfinyl; a (C3-C6) halocycloalkylsulfinyl; a (C1-C6)alkylsulfonyl; a (C1-C6)haloalkylsulfonyl; a (C3-C6)cycloalkylsulfonyl; a (C3-C6)halocycloalkylsulfonyl; a formyl; a (C1-C6) alkylcarbonyl; a (C1-C6)haloalkylcarbonyl; a benzoyl (the benzoyl is optionally mono-substituted or poly-substituted with $R^7$); a (C1-C6)alkoxycarbonyl; a (C1-C6)haloalkoxycarbonyl; a (C1-C6)alkylaminocarbonyl (the amino moiety is optionally substituted with $R^{10}$); a (C1-C6)haloalkylaminocarbonyl (the amino moiety is optionally substituted with $R^{10}$); a (C1-C6)alkylaminocarbonylthio (the amino moiety is optionally substituted with $R^{10}$); a (C1-C6)haloalkylaminocarbonylthio (the amino moiety is optionally substituted with $R^{10}$); a formyloxy; a (C1-C6)alkylcarbonyloxy; a (C1-C6) haloalkylcarbonyloxy; a benzoyloxy (the benzoyloxy is optionally mono-substituted or poly-substituted with $R^7$); a (C1-C6)alkylsulfinyloxy; a (C1-C6)haloalkylsulfinyloxy; a (C3-C6)cycloalkylsulfinyloxy; a (C3-C6)halocycloalkylsulfinyloxy; a phenylsulfinyloxy (the phenylsulfinyloxy is optionally mono-substituted or poly-substituted with $R^7$); a (C1-C6)alkylsulfonyloxy; a (C1-C6)haloalkylsulfonyloxy; a (C3-C6)cycloalkylsulfonyloxy; a (C3-C6)halocycloalkylsulfonyloxy; a phenylsulfonyloxy (the phenyl moiety is optionally mono-substituted or poly-substituted with $R^7$); an amino; a (C1-C6)alkylamino (the amino moiety is optionally substituted with $R^{10}$); a (C1-C6)haloalkylamino (the amino moiety is optionally substituted with $R^{10}$); a (C1-C6)alkylcarbonylamino (the amino moiety is optionally substituted with $R^{10}$); a (C1-C6)haloalkylcarbonylamino (the amino moiety is optionally substituted with $R^{10}$); a phenylcarbonylamino (the phenyl moiety is optionally mono-substituted or poly-substituted with $R^7$, and the amino moiety is optionally substituted with $R^{10}$); a (C1-C6)alkoxycarbonylamino (the amino moiety is optionally substituted with $R^{10}$); a (C1-C6)haloalkoxycarbonylamino (the amino moiety is optionally substituted with $R^{10}$); a (C1-C6)alkylaminocarbonylamino (the amino moiety is optionally substituted with $R^{10}$); a (C1-C6)haloalkylaminocarbonylamino (the amino moiety is optionally substituted with $R^{10}$); a (C1-C6)alkylsulfinylamino (the amino moiety is optionally substituted with $R^{10}$); a (C1-C6) haloalkylsulfinylamino (the amino moiety is optionally substituted with $R^{10}$); a phenylsulfinylamino (the phenyl moiety is optionally mono-substituted or poly-substituted with $R^7$, and the amino moiety is optionally substituted with $R^{10}$); a (C1-C6)alkylsulfonylamino (the amino moiety is optionally substituted with $R^{10}$); a (C1-C6)haloalkylsulfonylamino (the amino moiety is optionally substituted with $R^{10}$); a phenylsulfonylamino (the phenyl moiety is optionally mono-substituted or poly-substituted with $R^7$, and the amino moiety is optionally substituted with $R^{10}$); a (C1-C6) alkoxyimino; a tri((C1-C6)alkyl)silyl; a phenyl (the phenyl is optionally mono-substituted or poly-substituted with $R^7$); a phenoxy (the phenoxy is optionally mono-substituted or poly-substituted with $R^7$); a phenyl (C1-C6)alkoxy (the phenyl moiety is optionally mono-substituted or poly-substituted with $R^7$); a phenylthio (the phenylthio is optionally mono-substituted or poly-substituted with $R^7$); a phenylsulfinyl (the phenylsulfinyl is optionally mono-substituted or poly-substituted with $R^7$); a phenylsulfonyl (the phenylsulfonyl is optionally mono-substituted or poly-substituted with $R^7$); a phenyl (C1-C6)alkylthio (the phenyl moiety is optionally mono-substituted or poly-substituted with $R^7$); a phenyl (C1-C6)alkylsulfinyl (the phenyl moiety is optionally mono-substituted or poly-substituted with $R^7$); a phenyl (C1-C6)alkylsulfonyl (the phenyl moiety is optionally mono-substituted or poly-substituted with $R^7$); a —O—N═C($R^8$) ($R^9$) group; an adamantyl; an azetidinyl (a nitrogen atom of the azetidinyl is optionally substituted with $R^{10}$); a pyrrolidinyl (a nitrogen atom of the pyrrolidinyl is optionally substituted with $R^{10}$); a piperidinyl (a nitrogen atom of the piperidinyl is optionally substituted with $R^{10}$); a 1,3-dioxolanyl; a 1,3-dioxanyl; a pyrrolyl (the pyrrolyl is optionally mono-substituted or poly-substituted with $R^7$); a pyrazolyl (the pyrazolyl is optionally mono-substituted or poly-substituted with $R^7$); an imidazolyl (the imidazolyl is optionally mono-substituted or poly-substituted with $R^7$); a triazolyl (the triazolyl is optionally mono-substituted or poly-substituted with $R^7$); an oxazolyl (the oxazolyl is optionally mono-substituted or poly-substituted with $R^7$); an isoxazolyl (the isoxazolyl is optionally mono-substituted or poly-substituted with $R^7$); a thiazolyl (the thiazolyl is optionally mono-substituted or poly-substituted with $R^7$); an isothiazolyl (the isothiazolyl is optionally mono-substituted or poly-substituted with $R^7$); a pyridyl (the pyridyl is optionally mono-substituted or poly-substituted with $R^7$, and further a nitrogen atom of the pyridyl is optionally oxidized to form a N-oxide); a pyrimidinyl (the pyrimidinyl is optionally mono-substituted or poly-substituted with $R^7$); a pyridyloxy (the pyridyloxy is optionally mono-substituted or poly-substituted with $R^7$); a tetrahydrofuranyl (the tetrahydrofuranyl is optionally mono-substituted or poly-substituted with $R^7$); a 1,3-dioxoisoindolinyl (the 1,3-dioxoisoindolinyl is optionally mono-substituted or poly-substituted with $R^7$); a cyano; a nitro; a carboxy; a thiocyanato; or an aminooxy, $R^7$ represents a halogen atom; a (C1-C6)alkyl; a (C1-C6) haloalkyl; a (C3-C6)cycloalkyl; a (C3-C6)halocycloalkyl; a (C3-C6)cycloalkyl (C1-C6)alkyl; a (C3-C6)halocycloalkyl (C1-C6)alkyl; a (C1-C6)alkoxy; a (C1-C6)haloalkoxy; a (C1-C6)alkylthio; a (C1-C6) haloalkylthio; a (C1-C6)alkylsulfinyl; a (C1-C6) haloalkylsulfinyl; a (C1-C6)alkylsulfonyl; a (C1-C6) haloalkylsulfonyl; a (C1-C6)alkylthio (C1-C6)alkyl; a (C1-C6)haloalkylthio (C1-C6)alkyl; a (C1-C6)alkylsulfonyloxy; a (C1-C6)haloalkylsulfonyloxy; a phenyl (the phenyl is optionally mono-substituted or poly-substituted with a halogen atom, an alkyl, or a haloalkyl); a phenyl (C1-C6)alkyl; a phenyl (C1-C6) alkoxy; a cyano; or a nitro, $R^8$ and $R^9$ are identical to or different from each other, and represent a hydrogen atom; a (C1-C6)alkyl; a (C1-C6) haloalkyl; a (C3-C6)cycloalkyl; a (C3-C6)halocycloalkyl; or a phenyl (the phenyl is optionally mono-substituted or poly-substituted with $R^7$), or $R^8$ and $R^9$, together with the carbon atom to which $R^8$ and $R^9$ are attached form a 3- to 6-membered ring, and $R^{10}$ represents a (C1-C6)alkyl; a (C1-C6)haloalkyl; a (C3-C6)cycloalkyl; a (C3-C6)halocycloalkyl; a (C1-C6)alkoxy; a (C1-C6)alkoxy (C1-C6)alkyl; a (C1-C6) haloalkoxy (C1-C6)alkyl; a (C1-C6)alkoxy (C1-C6) alkoxy (C1-C6)alkyl; a (C1-C6)alkylthio (C1-C6) alkyl; a (C1-C6)alkylsulfinyl (C1-C6)alkyl; a (C1-C6) alkylsulfonyl (C1-C6)alkyl; a (C1-C6)alkylthio (C1-C6)alkoxy (C1-C6)alkyl; a (C1-C6)alkylsulfinyl (C1-C6)alkoxy (C1-C6)alkyl; a (C1-C6)alkylsulfonyl (C1-C6)alkoxy (C1-C6)alkyl; a cyano (C1-C6)alkyl; a cyano (C1-C6)alkoxy (C1-C6)alkyl; a (C1-C6)alkylcarbonyl; a (C1-C6)haloalkylcarbonyl; a (C1-C6) alkoxycarbonyl; a (C1-C6)haloalkoxycarbonyl; a (C1-C6)alkylaminocarbonyl; a (C1-C6) haloalkylaminocarbonyl; a benzoyl (the benzoyl is optionally mono-substituted or poly-substituted with $R^7$); a (C1-C6)alkylsulfonyl; a (C1-C6)haloalkylsulfonyl; a (C1-C6)alkylcarbonyl (C1-C6)alkyl; a (C1-C6) alkoxycarbonyl (C1-C6)alkyl; a (C1-C6)alkylaminocarbonyl (C1-C6)alkyl; a (C1-C6)alkylcarbonyloxy (C1-C6)alkyl; a (C1-C6)alkoxycarbonyloxy (C1-C6) alkyl; a (C1-C6)alkoxycarbonylamino (C1-C6)alkyl (the amino moiety is optionally substituted with a (C1-C6)alkyl); or a 5-methyl-1,3-dioxole-2-one-4-yl-methyl.

Effects of the Invention

The pest control agent comprising the compound of the present invention exhibits an excellent control effect on a wide range of pests such as *Hemiptera* pests, *Lepidoptera* pests, *Coleoptera* pests, *Diptera* pests, *Hymenoptera* pests, *Orthoptera* pests, *Isoptera* pests, *Thysanoptera* pests, *Acari* pests, and plant parasitic nematodes, and can also control pests having acquired chemical resistance.

DESCRIPTION OF EMBODIMENTS

Symbols and terms described in the present specification will be described.

In the present invention, the "pest control agent" means insecticides, acaricides, nematicides, and the like for agricultural or horticultural fields, animals such as domestic animals and pets, household use, or prevention of epidemics.

In the present invention, the "halogen atom" represents a fluorine atom; a chlorine atom; a bromine atom; or an iodine atom.

In the present invention, the description of "(C1-C6)" or the like indicates that the number of carbon atoms of the substituent following this description is 1 to 6 in this case.

In the present invention, unless otherwise specified, the "(C1-C6)alkyl" refers to a linear or branched alkyl group having 1 to 6 carbon atoms. Examples thereof include methyl, ethyl, n-propyl, isopropyl, n-butyl, sec-butyl, isobutyl, tert-butyl, n-pentyl, 1-methylbutyl, 2-methylbutyl, 3-methylbutyl, 1-ethylpropyl, 1,1-dimethylpropyl, 1,2-dimethylpropyl, neopentyl, n-hexyl, 1-methylpentyl, 2-methylpentyl, 3-methylpentyl, 4-methylpentyl, 1-ethylbutyl, 2-ethylbutyl, 1,1-dimethylbutyl, 1,2-dimethylbutyl, 1,3-dimethylbutyl, 2,2-dimethylbutyl, 2,3-dimethylbutyl, 3,3-dimethylbutyl, 1,1,2-trimethylpropyl, 1,2,2-trimethylpropyl, 1-ethyl-1-methylpropyl, and 1-ethyl-2-methylpropyl groups.

In the present invention, unless otherwise specified, the "(C1-C6)haloalkyl" refers to a linear or branched alkyl group having 1 to 6 carbon atoms and being substituted with 1 to 13 halogen atoms and which are identical or different. Examples thereof include fluoromethyl, difluoromethyl, trifluoromethyl, chloromethyl, dichloromethyl, trichloromethyl, bromomethyl, dibromomethyl, tribromomethyl, iodomethyl, chlorodifluoromethyl, dichlorofluoromethyl, 1-fluoroethyl, 2-fluoroethyl, 1,1-difluoroethyl, 2,2-difluoroethyl, 2,2,2-trifluoroethyl, 1,1,2,2-tetrafluoroethyl, pentafluoroethyl, 1-chloroethyl, 2-chloroethyl, 1,1-dichloroethyl, 2,2-dichloroethyl, 2,2,2-trichloroethyl, 1,1,2,2-tetrachloroethyl, pentachloroethyl, 1-bromoethyl, 2-bromoethyl, 2,2,2-tribromoethyl, 1-iodoethyl, 2-iodoethyl, 2-chloro-2,2-difluoroethyl, 2,2-dichloro-2-fluoroethyl, 1-fluoropropyl, 2-fluoropropyl, 3-fluoropropyl, 1,1-difluoropropyl, 2,2-difluoropropyl, 3,3-difluoropropyl, 3,3,3-trifluoropropyl, 2,2,3,3,3-pentafluoropropyl, 1,1,2,3,3,3-hexafluoropropyl, heptafluoropropyl, 1-fluoro-2-propyl, 2-fluoro-2-propyl, 1,1-difluoro-2-propyl, 1,2-difluoro-2-propyl, 1,3-difluoro-2-propyl, 1,2,3-trifluoro-2-propyl, 1,1,3,3-tetrafluoro-2-propyl, 1,1,1,3,3,3-hexafluoro-2-propyl, heptafluoro-2-propyl, 1-chloropropyl, 2-chloropropyl, 3-chloropropyl, 1,1-dichloropropyl, 2,2-dichloropropyl, 3,3-dichloropropyl, 3,3,3-trichloropropyl, 2,2,3,3,3-pentachloropropyl, heptachloropropyl, 1-chloro-2-propyl, 2-chloro-2-propyl, 1,1-dichloro-2-propyl, 1,2-dichloro-2-propyl, 1,3-dichloro-2-propyl, 1,2,3-trichloro-2-propyl, 1,1,3,3-tetrachloro propyl, 1,1,1,3,3,3-hexachloro-2-propyl, heptachloro propyl, 1-bromopropyl, 2-bromopropyl, 3-bromopropyl, 1-bromo-2-propyl, 2-bromo-2-propyl, 1-iodopropyl, 2-iodopropyl, 3-iodopropyl, 1-iodo-2-propyl, 2-iodo-2-propyl, 1-fluorobutyl, 2-fluorobutyl, 3-fluorobutyl, 4-fluorobutyl, 4,4-difluorobutyl, 4,4,4-trifluorobutyl, 4,4,4-trifluoro-3-methylbutyl, 3,3,4,4,4-pentafluorobutyl, 2,2,3,4,4,4-hexafluorobutyl, 2,2,3,3,4,4,4-heptafluorobutyl, nonafluorobutyl, 1,1,1-trifluoro-2-butyl, 4,4,4-trifluoro-2-butyl, 3,3,4,4,4-pentafluoro-2-butyl, nonafluoro-2-butyl, 1,1,1,3,3,3-hexafluoro-2-(trifluoromethyl)-2-propyl, 1-chlorobutyl, 2-chlorobutyl, 3-chlorobutyl, 4-chlorobutyl, 4,4-dichlorobutyl, 4,4,4-trichlorobutyl, nonachlorobutyl, 1,1,1-trichloro-2-butyl, 4,4,4-trichloro-2-butyl, nonachloro-2-butyl, 1-bromobutyl, 2-bromobutyl, 3-bromobutyl, 4-bromobutyl, 1-iodobutyl, 2-iodobutyl, 3-iodobutyl, 4-iodobutyl, 4-chloro-1,1,2,2,3,3,4,4-octafluorobutyl, 4-bromo-1,1,2,2,3,3,4,4-octafluorobutyl, 1-fluoropentyl, 2-fluoropentyl, 3-fluoropentyl, 4-fluoropentyl, 5-fluoropentyl, 5,5,5-trifluoropentyl, 4,4,5,5,5-pentafluoropentyl, 3,3,4,4,5,5,5-heptafluoropentyl, 2,2,3,3,4,4,5,5-octafluoropentyl, 2,2,3,3,4,4,5,5,5-nonafluoropentyl, undecafluoropentyl, 1-chloropentyl, 2-chloropentyl, 3-chloropentyl, 4-chloropentyl, 5-chloropentyl, 5,5,5-trichloropentyl, 4,4,5,5,5-pentachloropentyl, 3,3,4,4,5,5,5-heptachloropentyl, 2,2,3,3,4,4,5,5,5-nonachloropentyl, undecachloropentyl, 1-bromopentyl, 2-bromopentyl, 3-bromopentyl, 4-bromopentyl, 5-bromopentyl, 5-iodopentyl, 1-fluorohexyl, 2-fluorohexyl, 3-fluorohexyl, 4-fluorohexyl, 5-fluorohexyl, 6-fluorohexyl, 6,6,6-trifluorohexyl, 5,5,6,6,6-pentafluorohexyl, 4,4,5,5,6,6,6-heptafluorohexyl, 3,3,4,4,5,5,6,6,6-nonafluorohexyl, 2,2,3,3,4,4,5,5,6,6,6-undecafluorohexyl, 2,2,3,3,4,4,5,5,6,6-decafluorohexyl, tridecafluorohexyl, 1-chlorohexyl, 2-chlorohexyl, 3-chlorohexyl, 4-chlorohexyl, 5-chlorohexyl, 6-chlorohexyl, 5-bromohexyl, 6-bromohexyl, 5-iodohexyl, and 6-iodohexyl groups.

In the present invention, unless otherwise specified, the "(C3-C6)cycloalkyl" refers to a cycloalkyl group having 3 to 6 carbon atoms, and the ring may be arbitrarily substituted with alkyl groups in the range of the designated number of carbon atoms. Examples thereof include cyclopropyl, 1-methylcyclopropyl, 2-methylcyclopropyl, 2,2-dimethylcyclopropyl, cyclobutyl, 1-methylcyclobutyl, cyclopentyl, 1-methylcyclopentyl, and cyclohexyl groups.

In the present invention, unless otherwise specified, the "(C3-C6)halocycloalkyl" refers to a cycloalkyl group having 3 to 6 carbon atoms and being substituted with 1 to 11 halogen atoms and which are identical or different, and the ring may be arbitrarily substituted with alkyl groups or haloalkyl groups within the specified range of carbon atoms. Examples thereof include 1-fluorocyclopropyl, 2-fluorocyclopropyl, 2,2-difluorocyclopropyl, 2,2,3,3-tetrafluorocyclopropyl, 1-chlorocyclopropyl, 2-chlorocyclopropyl, 2,2-dichlorocyclopropyl, 2,2,3,3-tetrachlorocyclopropyl, 1-bromocyclopropyl, 2,2-dibromocyclopropyl, 1-iodocyclopropyl, 1-fluoromethylcyclopropyl, 1-difluoromethylcyclopropyl, 1-trifluoromethylcyclopropyl, 1-chloromethylcyclopropyl, 1-bromomethylcyclopropyl, 2,2-diiodocyclopropyl, 1-fluorocyclobutyl, 2-fluorocyclobutyl, 3-fluorocyclobutyl, 3,3-difluorocyclobutyl, heptafluorocyclobutyl, 1-difluoromethylcyclobutyl, 1-trifluoromethylcyclobutyl, 2-chlorocyclobutyl, 3-chlorocyclobutyl, 3,3-dichlorocyclobutyl, 3,3-dibromocyclobutyl, 3,3-diiodocyclobutyl, 1-fluorocyclopentyl, 2-fluorocyclopentyl, 3-fluorocyclopentyl, 2,2-difluorocyclopentyl, 3,3-difluorocyclopentyl, nonafluorocyclopentyl, 2,2-dichlorocyclopentyl, 3,3-dichlorocyclopentyl, 2,2-dibromocyclopentyl, 3,3-dibromocyclopentyl, 2,2-diiodocyclopentyl, 3,3-diiodocyclopentyl, 1-fluorocyclohexyl, 2-fluorocyclohexyl, 3-fluorocyclohexyl, 4-fluorocyclohexyl, 2,2-difluorocyclohexyl, 3,3-difluorocyclohexyl, 4,4-difluorocyclohexyl, 1-chlorocyclohexyl, 2-chlorocyclohexyl, 3-chlorocyclohexyl, 4-chlorocyclohexyl, 2,2-dichlorocyclohexyl, 3,3-dichlorocyclohexyl, 4,4-dichlorocyclohexyl, 3,3-dibromocyclohexyl, 4,4-dibromocyclohexyl, 3,3-diiodocyclohexyl, and 4,4-diiodocyclohexyl groups.

In the present invention, unless otherwise specified, the "(C2-C6)alkenyl" refers to a linear or branched alkenyl group having 2 to 6 carbon atoms. Examples thereof include vinyl, 1-propenyl, isopropenyl, 2-propenyl, 1-butenyl, 1-methyl-1-propenyl, 2-butenyl, 1-methyl-2-propenyl, 3-butenyl, 2-methyl-1-propenyl, 2-methyl-2-propenyl, 1,3-butadienyl, 1-pentenyl, 1-ethyl-2-propenyl, 2-pentenyl, 1-methyl-1-butenyl, 3-pentenyl, 1-methyl-2-butenyl, 4-pentenyl, 1-methyl-3-butenyl, 3-methyl-1-butenyl, 1,2-dimethyl-2-propenyl, 1,1-dimethyl-2-propenyl, 2-methyl-2-butenyl, 3-methyl-2-butenyl, 1,2-dimethyl-1-propenyl, 2-methyl-3-butenyl, 3-methyl-3-butenyl, 1,3-pentadienyl, 1-vinyl-2-propenyl, 1-hexenyl, 1-propyl-2-propenyl, 2-hexenyl, 1-methyl-1-pentenyl, 1-ethyl-2-butenyl, 3-hexenyl, 4-hexenyl, 5-hexenyl, 1-methyl-4-pentenyl, 1-ethyl butenyl, 1-(isobutyl)vinyl, 1-ethyl-1-methyl-2-propenyl, 1-ethyl-2-methyl-2-propenyl, 1-(isopropyl)-2-propenyl, 2-methyl-2-pentenyl, 3-methyl-3-pentenyl, 4-methyl-3-pentenyl, 1,3-dimethyl-2-butenyl, 1,1-dimethyl-3-butenyl, 3-methyl-4- pentenyl, 4-methyl-4-pentenyl, 1,2-dimethyl-3-butenyl, 1,3-dimethyl-3-butenyl, 1,1,2-trimethyl-2-propenyl, 1,5-hexadienyl, 1-vinyl-3-butenyl, and 2,4-hexadienyl groups.

In the present invention, unless otherwise specified, the "(C2-C6)haloalkenyl" refers to a linear or branched alkenyl group having 2 to 6 carbon atoms and being substituted with 1 to 11 halogen atoms and which are identical or different. Examples thereof include 1-fluorovinyl, 2-fluorovinyl, 1,2-difluorovinyl, 2,2-difluorovinyl, trifluorovinyl, 1-chlorovinyl, 2-chlorovinyl, 1,2-dichlorovinyl, 2,2-dichlorovinyl, trichlorovinyl, 1,2-dibromovinyl, 2,2-dibromovinyl, tribromovinyl, 1,2-diiodovinyl, 2,2-diiodovinyl, triiodovinyl, 1-fluoro-2-propenyl, 2-fluoro-2-propenyl, 3-fluoro-2-propenyl, 2,3-difluoro-2-propenyl, 3,3-difluoro-2-propenyl, 3,3-difluoro-1-propenyl, 2,3,3-trifluoro propenyl, 3,3,3-trifluoro-1-propenyl, 2-chloro-3,3,3-trifluoro-1-propenyl, 1,2,3,3,3-pentafluoro-1-propenyl, 1-chloro-2-propenyl, 2-chloro-2-propenyl, 3-chloro propenyl, 2,3-dichloro-2-propenyl, 3,3-dichloro-2-propenyl, 3,3-dichloro-1-propenyl, 2,3,3-trichloro-2-propenyl, 3,3,3-trichloro-1-propenyl, 3-bromo-2-propenyl, 3,3-dibromo-2-propenyl, 3,3-diiodo-2-propenyl, 2,2-difluoro-1-propene-2-yl, 3,3,3-trifluoro-1-propene-2-yl, 3,3,3-trichloro-1-propene-2-yl, 4-fluoro-3-butenyl, 4,4-difluoro-3-butenyl, 4,4-difluoro-3-butene-2-yl, 4,4,4-trifluoro-2-butenyl, 3,4,4-trifluoro-3-butenyl, 2-trifluoromethyl-2-propenyl, 2-trifluoromethyl-3,3-difluoro-2-propenyl, 4,4,4-trifluoro-3-chloro-2-butenyl, 4,4-dichloro-3-butenyl, 4,4,4-trichloro-2-butenyl, 2-trichloromethyl-2-propenyl, 5,5-difluoro-4-pentenyl, 4,5,5-trifluoro-4-pentenyl, 5,5,5-trifluoro-3-pentenyl, 4,4,4-trifluoro-3-methyl-2-butenyl, 4,4,4-trifluoro-3-trifluoromethyl-2-butenyl, 5,5-dichloro-4-pentenyl, 4,4,4-trichloro-3-methyl-2-butenyl, 6,6-difluoro-5-hexenyl, 5,6,6-trifluoro-5-pentenyl, 6,6,6-trifluoro-4-pentenyl, 5,5,5-trifluoro-4-methyl-3-pentenyl, 5,5,5-trifluoro-4-trifluoromethyl-3-pentenyl, 6,6-dichloro-5-hexenyl, and 5,5,5-trichloro-4-methyl-3-pentenyl groups.

In the present invention, unless otherwise specified, the "(C2-C6)alkynyl" refers to a linear or branched alkynyl group having 2 to 6 carbon atoms. Examples thereof include ethynyl, 1-propynyl, 2-propynyl, 1-butynyl, 1-methyl propynyl, 2-butynyl, 3-butynyl, 1-pentynyl, 1-ethyl propynyl, 2-pentynyl, 3-pentynyl, 1-methyl-2-butynyl, 4-pentynyl, 1-methyl-3-butynyl, 2-methyl-3-butynyl, 1-hexynyl, 1-(n-propyl)-2-propynyl, 2-hexynyl, 1-ethyl-2-butynyl, 3-hexynyl, 1-methyl-2-pentynyl, 1-methyl-3-pentynyl, 4-methyl-1-pentynyl, 3-methyl-1-pentynyl, 5-hexynyl, 1-ethyl-3-butynyl, 1-ethyl-1-methyl-2-propynyl, 1-(isopropyl)-2-propynyl, 1,1-dimethyl-2-butynyl, and 2,2-dimethyl-3-butynyl groups.

In the present invention, unless otherwise specified, the "(C2-C6)haloalkynyl" refers to a linear or branched alkynyl group having 2 to 6 carbon atoms and being substituted with 1 to 9 halogen atoms and which are identical or different. Examples thereof include fluoroethynyl, chloroethynyl, bromoethynyl, iodoethynyl, 3-fluoro-2-propynyl, 3-chloro-2-propynyl, 3-bromo-2-propynyl, 3-iodo-2-propynyl, 4-fluoro-3-butynyl, 4-chloro-3-butynyl, 4-bromo-3-butynyl, 4-iodo-3-butynyl, 4,4-difluoro-2-butynyl, 4,4-dichloro-2-butynyl, 4,4,4-trifluoro-2-butynyl, 4,4,4-trichloro-2-butynyl, 3-fluoro-1-methyl-2-propynyl, 3-chloro-1-methyl-2-propynyl, 5-fluoro-4-pentynyl, 5-chloro-4-pentynyl, 5,5,5-trifluoro-3-pentynyl, 5,5,5-trichloro pentynyl, 4-fluoro-2-methyl-3-butynyl, 4-chloro-2-methyl butynyl, 6-fluoro-5-hexynyl, 6-chloro-5-hexynyl, 6,6,6-trifluoro-4-hexynyl, 6,6,6-trichloro-4-hexynyl, 5-fluoro methyl-4-pentynyl, and 5-chloro-3-methyl-4-pentynyl groups.

In the present invention, unless otherwise specified, the "(C1-C6)alkoxy" refers to a ((C1-C6)alkyl)-O— group in which the alkyl moiety is as defined above. Examples thereof include methoxy, ethoxy, n-propoxy, isopropoxy, n-butoxy, isobutoxy, sec-butoxy, tert-butoxy, n-pentoxy, 1-methylbutoxy, 2-methylbutoxy, 3-methylbutoxy, 1-ethylpropoxy, 1,1-dimethylpropoxy, 1,2-dimethylpropoxy, and n-hexyloxy groups.

In the present invention, unless otherwise specified, the "(C1-C6)haloalkoxy" refers to a ((C1-C6)haloalkyl)-O— group in which the haloalkyl moiety is as defined above. Examples thereof include difluoromethoxy, dichloromethoxy, trifluoromethoxy, trichloromethoxy, tribromomethoxy, chlorodifluoromethoxy, bromodifluoromethoxy, 2-fluoroethoxy, 1-chloroethoxy, 2-chloroethoxy, 1-bromoethoxy, 2-bromoethoxy, 2,2-difluoroethoxy, 1,2-dichloroethoxy, 2,2-dichloroethoxy, 2,2,2-trifluoroethoxy, 2,2,2-trichloroethoxy, 1,1,2,2-tetrafluoroethoxy, pentafluoroethoxy, 2-bromo-2-chloroethoxy, 2-chloro-1,1,2,2-tetrafluoroethoxy, 1-chloro-1,2,2,2-tetrafluoroethoxy, 1-chloropropoxy, 2-chloropropoxy, 3-chloropropoxy, 2-bromopropoxy, 3-bromopropoxy, 2-bromo-1-methylethoxy, 3-iodopropoxy, 2,3-dichloropropoxy, 2,3-dibromopropoxy, 3,3,3-trifluoropropoxy, 3,3,3-trifluoro propoxy, 3,3,3-trichloropropoxy, 3-bromo-3,3-difluoropropoxy, 2,2-difluoropropoxy, 3,3-dichloro-3-fluoropropoxy, 2,2,3,3-tetrafluoropropoxy, 1-bromo-3,3,3-trifluoropropoxy, 2,2,3,3,3-pentafluoropropoxy, 2,2,2-trifluoro-1-trifluoromethylethoxy, heptafluoropropoxy, heptafluoro-2-propoxy, 1,2,2,2-tetrafluoro-1-trifluoromethylethoxy, 1,1,2,3,3,3-hexafluoropropoxy, 2-chlorobutoxy, 3-chlorobutoxy, 4-chlorobutoxy, 2-chloro-1,1-dimethylethoxy, 4-bromobutoxy, 3-bromo-2-methylpropoxy, 2-bromo-1,1-dimethylethoxy, 2,2-dichloro-1,1-dimethylethoxy, 2-chloro-1-chloromethyl-2-methylethoxy, 4,4,4-trifluorobutoxy, 3,3,3-trifluoro-1-methylpropoxy, 3,3,3-trifluoro-2-methylpropoxy, 2,3,4-trichlorobutoxy, 2,2,2-trichloro-1,1-dimethylethoxy, 4-chloro-4,4-difluorobutoxy, 4,4-dichloro-4-fluorobutoxy, 4-bromo-4,4-difluorobutoxy, 2,4-dibromo-4,4-difluorobutoxy, 3,4-dichloro-3,4,4-trifluorobutoxy, 3,3-dichloro-4,4,4-trifluorobutoxy, 4-bromo-3,3,4,4-tetrafluorobutoxy, 4-bromo-3-chloro-3,4,4-trifluorobutoxy, 2,2,3,3,4,4-hexafluorobutoxy, 2,2,3,4,4,4-hexafluorobutoxy, 2,2,2-trifluoro-1-methyl trifluoromethylethoxy, 3,3,3-trifluoro trifluoromethylpropoxy, 2,2,3,3,4,4,4-heptafluorobutoxy, 3,3,4,4,4-pentafluoro-2-butoxy, 2,3,3,3-tetrafluoro trifluoromethylpropoxy, 1,1,2,2,3,3,4,4-octafluorobutoxy, nonafluorobutoxy, perfluoro-tert-butoxy, 4-chloro-1,1,2,2,3,3,4,4-octafluorobutoxy, 5,5,5-trifluoropentoxy, 4,4,5,5,5-pentafluoropentoxy, 3,3,4,4,5,5,5-heptafluoropentoxy, 3,3,4,4,5,5,5-heptafluoro-2-pentoxy, 2,2,3,3,4,4,5,5,5-nonafluoropentoxy, 2,2,3,3,4,4,5,5-octafluoropentoxy, perfluoropentoxy, 4,4,5,5,5-pentafluoro-2-butoxy, 2,2-bis(trifluoromethyl)propoxy, 2,2,3,3,4,4,5,5,6,6,6-undecafluorohexyloxy, 3,3,4,4,5,5,6,6,6-nonafluorohexyloxy, 4,4,5,5,6,6,6-heptafluorohexyloxy, 2,2,3,3,4,4,5,5,6,6-decafluorohexyloxy, 4,4,4-trifluoro-3,3-bis(trifluoromethyl)butyloxy, and perfluorohexyloxy groups.

In the present invention, unless otherwise specified, the "(C3-C6)cycloalkyl C1-C6 alkyl" refers to a ((C3-C6)cycloalkyl)-((C1-C6)alkyl)- group in which the cycloalkyl moiety and the alkyl moiety are as defined above. Examples thereof include cyclopropylmethyl, cyclobutylmethyl, cyclopentylmethyl, cyclohexylmethyl, 1-(cyclopropyl)ethyl, 2-(cyclopropyl)ethyl, and 1-(cyclopropyl) propyl groups.

In the present invention, unless otherwise specified, the "(C3-C6)halocycloalkyl (C1-C6)alkyl" refers to a ((C3-C6) halocycloalkyl)-((C1-C6)alkyl)- group in which the halocycloalkyl moiety and the alkyl moiety are as defined above. Examples thereof include 2,2-difluorocyclopropylmethyl, 2,2-dichlorocyclopropylmethyl, 1-(2,2-difluorocyclopropyl) ethyl, 2-(2,2-difluorocyclopropyl)ethyl, 1-(2,2-dichlorocyclopropyl)ethyl, 2-(2,2-dichlorocyclopropyl)ethyl, 2-(2,2-difluorocyclopropyl)propyl, 3,3-difluorocyclobutylmethyl, 2,2,3,3-tetrafluorocyclobutylmethyl, 2-(2,2,3,3-tetrafluorocyclobutyl)ethyl, 2-(3,3-difluorocyclobutyl)ethyl, 2-(3,3-difluorocyclobutyl)propyl, 3,3-difluorocyclopentylmethyl, and 2-(3,3-difluorocyclopentyl)propyl groups.

In the present invention, unless otherwise specified, the "phenyl (C1-C6)alkyl" refers to a (phenyl)-((C1-C6)alkyl)- group. Examples thereof include benzyl, 1-phenylethyl, 2-phenylethyl, 2-phenylpropyl, 2-phenylbutyl, and 1-phenylpentyl groups.

In the present invention, unless otherwise specified, the "heteroaryl" refers to a 5- or 6-membered monocyclic heterocyclic ring having 1 to 6 heteroatoms selected from a nitrogen atom, an oxygen atom, and a sulfur atom, in addition to a carbon atom. Examples thereof include thiophene-2-yl, thiophene-3-yl, furan-2-yl, furan-3-yl, pyrrole-1-yl, pyrrole-2-yl, pyrrole-3-yl, oxazole-2-yl, oxazole-4-yl, oxazole-5-yl, isoxazole-3-yl, isoxazole-4-yl, isoxazole-5-yl, thiazole-2-yl, thiazole-4-yl, thiazole-5-yl, isothiazole-3-yl, isothiazole-4-yl, isothiazole-5-yl, imidazole-1-yl, imidazole-2-yl, imidazole-4-yl, pyrazole-1-yl, pyrazole-3-yl, pyrazole-4-yl, pyrazole-5-yl, 1,3,4-oxadiazole-2-yl, 1,2,3-oxadiazole-4-yl, 1,2,3-oxadiazole-5-yl, 1,2,4-oxadiazole-3-yl, 1,2,4-oxadiazole-5-yl, 1,2,5-oxadiazole-3-yl, 1,3,4-thiadiazole-2-yl, 1,2,3-thiadiazole-4-yl, 1,2,3-thiadiazole-5-yl, 1,2,4-thiadiazole-3-yl, 1,2,4-thiadiazole-5-yl, 1,2,5-thiadiazole-3-yl, 1,2,4-triazole-3-yl, 1,2,4-triazole-1-yl, 1,2,3-triazole-1-yl, 1,2,3-triazole-2-yl, 1,3,4-triazole-1-yl, tetrazole-1-yl, tetrazole-2-yl, tetrazole-5-yl, pyridine-2-yl, pyridine-3-yl, pyridine-4-yl, pyrimidine-2-yl, pyrimidine-4-yl, pyrimidine-5-yl, pyridazine-3-yl, pyridazine-4-yl, pyrazine-2-yl, and 1,3,5-triazine-2-yl groups.

In the present invention, unless otherwise specified, the "heteroaryl (C1-C3)alkyl" refers to a (heteroaryl)-((C1-C3) alkyl)- group in which the heteroaryl moiety is as defined above. Examples thereof include (pyridine yl)methyl, (pyridine-3-yl)methyl, (pyridine-4-yl)methyl, (pyrimidine-2-yl) methyl, (pyrimidine-4-yl)methyl, (thiazole-2-yl)methyl, (thiazole-4-yl)methyl, (thiazole yl)methyl, (pyrazole-1-yl) methyl, (pyrazole-3-yl)methyl, (pyrazole-4-yl)methyl, and (pyrazole-5-yl)methyl groups.

In the present invention, unless otherwise specified, the "heteroaryl (C3-C6)cycloalkyl" refers to a (heteroaryl)-((C3-C6)cycloalkyl)- group in which the heteroaryl moiety and the cycloalkyl moiety are as defined above. Examples thereof include 1-(pyridine-2-yl)cyclopropyl, 1-(pyridine-3-yl)cyclopropyl, 1-(pyridine-4-yl)cyclopropyl, 1-(pyrimidine-2-yl)cyclopropyl, 1-(pyrimidine-4-yl)cyclopropyl, 1-(thiazole-2-yl)cyclopropyl, 1-(thiazole-4-yl)cyclopropyl, 1-(thiazole-5-yl)cyclopropyl, 1-(pyrazole-1-yl)cyclopropyl, 1-(pyrazole-3-yl)cyclopropyl, 1-(pyrazole-4-yl)cyclopropyl, and 1-(pyrazole-5-yl)cyclopropyl groups.

In the present invention, unless otherwise specified, the "heterocycloalkyl" refers to a 3- to 6-membered saturated heterocyclic ring containing one or more atoms selected from an oxygen atom, a nitrogen atom, and a sulfur atom, in addition to a carbon atom. Examples thereof include oxetane-2-yl, oxetane-3-yl, thietane-3-yl, tetrahydrofuran-2-yl, tetrahydrofuran-3-yl, tetrahydrothiophene-3-yl, tetrahydropyran-2-yl, tetrahydropyran-3-yl, tetrahydropyran-4-yl, tetrahydrothiopyran-4-yl, morpholine-4-yl, azetidine-1-yl, azetidine-3-yl, pyrrolidine-3-yl, and piperidine-4-yl groups.

In the present invention, unless otherwise specified, the "cyano heterocycloalkyl" refers to a (cyano)-(heterocycloalkyl)-group in which the heterocycloalkyl moiety is as defined above. Examples thereof include 3-cyanooxetane-3-yl, 3-cyanothietane-3-yl, 3-cyanotetrahydrofuran-3-yl, 3-cyanotetrahydrothiophene-3-yl, 3-cyanotetrahydropyran-3-yl, 4-cyanotetrahydrothiopyran-4-yl, 3-cyanoazetidine-3-yl, 3-cyanopyrrolidine-3-yl, and 4-cyanopiperidine-4-yl groups.

In the present invention, unless otherwise specified, the "heterocycloalkyl (C1-C6)alkyl" refers to a (3- to 6-membered heterocycloalkyl)-((C1-C6)alkyl)- group in which the heterocycloalkyl moiety and the alkyl moiety are as defined above. Examples thereof include (oxetane-3-yl)methyl, (tetrahydrofuran-2-yl)methyl, (tetrahydrofuran-3-yl)methyl, (tetrahydropyran-2-yl)methyl, (tetrahydropyran-3-yl) methyl, and (tetrahydropyran yl)methyl groups.

In the present invention, unless otherwise specified, the "cyano (C1-C6)alkyl" refers to a (cyano)-((C1-C6)alkyl)- group in which the alkyl moiety is as defined above. Examples thereof include cyanomethyl, 1-cyanoethyl, 2-cyanoethyl, 1-cyanopropyl, 3-cyanopropyl, 2-cyano-2-propyl, 1-cyanobutyl, 4-cyanobutyl, 5-cyanopentyl, and 6-cyanohexyl groups.

In the present invention, unless otherwise specified, the "cyano (C3-C6)cycloalkyl" refers to a (cyano)-((C3-C6) cycloalkyl)- group in which the cycloalkyl moiety is as defined above. Examples thereof include 1-cyanocyclopropyl, 2-cyanocyclopropyl, 1-cyanomethylcyclopropyl, 1-cyanocyclobutyl, 3-cyanocyclobutyl, 1-cyanocyclopentyl, and 1-cyanocyclohexyl groups.

In the present invention, unless otherwise specified, the "hydroxy (C1-C6)alkyl" refers to a (hydroxy)-((C1-C6) alkyl)- group in which the alkyl moiety is as defined above. Examples thereof include hydroxymethyl, 1-hydroxyethyl, 2-hydroxyethyl, 1-hydroxypropyl, 2-hydroxypropyl, 3-hydroxypropyl, 1-hydroxybutyl, and 4-hydroxybutyl groups.

In the present invention, unless otherwise specified, the "(C1-C6)alkoxy (C1-C6)alkyl" refers to a ((C1-C6)alkoxy)-((C1-C6)alkyl)- group in which the alkoxy moiety and the alkyl moiety are as defined above. Examples thereof include methoxymethyl, 1-methoxyethyl, 2-methoxyethyl, 2-ethoxyethyl, 2-methoxypropyl, 3-methoxypropyl, 2-ethoxypropyl, 3-ethoxypropyl, 1-methyl-3-methoxybutyl, and 3-butoxybutyl groups.

In the present invention, unless otherwise specified, the "(C1-C6)alkylamino" refers to a ((C1-C6)alkyl)-NH— group in which the alkyl moiety is as defined above. Examples thereof include methylamino, ethylamino, n-propylamino, and isopropylamino groups.

In the present invention, unless otherwise specified, the "(C1-C6)alkylcarbonyl" refers to a ((C1-C6)alkyl)-C(═O)— group in which the alkyl moiety is as defined above. Examples thereof include acetyl, propionyl, 2-methylpropionyl, 2,2-dimethylpropionyl, butanoyl, pivaloyl, 2-methylbutanoyl, 3-methylbutanoyl, 2-ethylbutanoyl, 2,2-dimethylbutanoyl, 2,3-dimethylbutanoyl, 3,3-dimethylbutanoyl, pentanoyl, 2-methylpentanoyl, 3-methylpentanoyl, 4-methylpentanoyl, and hexanoyl groups.

In the present invention, unless otherwise specified, the "(C1-C6)alkoxy (C1-C6)alkylcarbonyl" refers to a ((C1-C6) alkyl)-O—((C1-C6)alkyl)-C(═O)— group in which the alkyl moiety is as defined above. Examples thereof include methoxyacetyl, ethoxyacetyl, propoxyacetyl, isopropoxy-acetyl, butoxyacetyl, 2-methoxypropionyl, 3-methoxypropionyl, 2-ethoxypropionyl, 3-ethoxypropionyl, 2-methoxybutanoyl, 4-methoxybutanoyl, 2-methoxypentanoyl, and 5-methoxypentanoyl groups.

In the present invention, unless otherwise specified, the "(C3-C6)cycloalkylcarbonyl" refers to a ((C3-C6)cycloalkyl)-C(═O)— group in which the cycloalkyl moiety is as defined above. Examples thereof include cyclopropanecarbonyl, cyclobutanecarbonyl, cyclopentanecarbonyl, and cyclohexanecarbonyl groups.

In the present invention, unless otherwise specified, the "(C3-C6)cycloalkyl (C1-C6)alkylcarbonyl" refers to a ((C3-C6)cycloalkyl)-((C1-C6)alkyl)-C(═O)— group in which the cycloalkyl and alkyl moieties are as defined above. Examples thereof include 2-cyclopropylacetyl, 2-cyclobutylacetyl, 2-cyclopentylacetyl, 2-cyclohexylacetyl, 2-cyclopropylpropanol, and 2-cyclopropylbutanoyl groups.

In the present invention, unless otherwise specified, the "(C1-C6)alkoxycarbonyl" refers to a ((C1-C6)alkoxy)-C(═O)— group in which the alkoxy moiety is as defined above. Examples thereof include methoxycarbonyl, ethoxycarbonyl, n-propoxycarbonyl, isopropoxycarbonyl, n-butoxycarbonyl, isobutoxycarbonyl, sec-butoxycarbonyl, tert-butoxycarbonyl, n-pentoxycarbonyl, 1-methylbutoxycarbonyl, 2-methylbutoxycarbonyl, 3-methylbutoxycarbonyl, 1-ethylpropoxycarbonyl, 1,1-dimethylpropoxycarbonyl, 1,2-dimethylpropoxycarbonyl, and 2,2-dimethylpropoxycarbonyl groups.

In the present invention, unless otherwise specified, the "(C1-C6)alkylaminocarbonyl" refers to a ((C1-C6)alkyl)-NH—C(═O)— group in which the alkyl moiety is as defined above. Examples thereof include methylaminocarbonyl, ethylaminocarbonyl, n-propylaminocarbonyl, isopropylaminocarbonyl, n-butylaminocarbonyl, isobutylaminocarbonyl, sec-butylaminocarbonyl, tert-butylaminocarbonyl, n-pentylaminocarbonyl, 1-methylbutylaminocarbonyl, 2-methylbutylaminocarbonyl, 3-methylbutylaminocarbonyl, 1-ethylpropylaminocarbonyl, 1,1-dimethylpropylaminocarbonyl, 1,2-dimethylpropylaminocarbonyl, 2,2-dimethylpropylaminocarbonyl, and n-hexylaminocarbonyl groups.

In the present invention, unless otherwise specified, the "(C1-C6)alkoxycarbonyl (C1-C6)alkylamino" refers to a ((C1-C6)alkyl)-O—C(═O)—((C1-C6)alkyl)-NH— group in which the alkyl moiety is as defined above. Examples thereof include methoxycarbonylmethylamino, ethoxycarbonylmethylamino, tert-butoxycarbonylmethylamino, and 1-(tert-butoxycarbonyl)ethylamino groups.

In the present invention, unless otherwise specified, the "(C1-C6)alkoxycarbonylamino" refers to a ((C1-C6)alkyl)-O—C(═O)—NH— group in which the alkyl moiety is as defined above. Examples thereof include methoxycarbonylamino, ethoxycarbonylamino, isopropoxycarbonylamino, tert-butoxycarbonylamino, and isobutoxycarbonylamino groups.

In the present invention, unless otherwise specified, the "(C1-C6)alkylthio" refers to a ((C1-C6)alkyl)-S— group in which the alkyl moiety is as defined above. Examples thereof include methylthio, ethylthio, n-propylthio, isopropylthio, n-butylthio, isobutylthio, sec-butylthio, and tert-butylthio groups.

In the present invention, unless otherwise specified, the "((C1-C)alkylthio)carbonyl" refers to a ((C1-C)alkylthio)-C(═O)— group in which the alkylthio moiety is as defined above. Examples thereof include methylthiocarbonyl, ethylthiocarbonyl, and isopropylthiocarbonyl groups.

In the present invention, unless otherwise specified, the "((C1-C6)alkyl) thiocarbonyl" refers to a ((C1-C6)alkyl)-C(═S)— group in which the alkyl moiety is as defined above. Examples thereof include methyl(thiocarbonyl), ethyl(thiocarbonyl), n-propyl(thiocarbonyl), isopropyl(thiocarbonyl), n-butyl(thiocarbonyl), isobutyl(thiocarbonyl), sec-butyl (thiocarbonyl), tert-butyl(thiocarbonyl), and n-pentyl(thiocarbonyl) groups.

In the present invention, unless otherwise specified, the "((C1-C6)alkoxy) thiocarbonyl" refers to a ((C1-C6)alkyl)-O—C(═S)— group in which the alkyl moiety is as defined above. Examples thereof include methoxy(thiocarbonyl), ethoxy(thiocarbonyl), n-propoxy(thiocarbonyl), isopropoxy (thiocarbonyl), n-butoxy(thiocarbonyl), isobutoxy(thiocarbonyl), sec-butoxy(thiocarbonyl), tert-butoxy(thiocarbonyl), n-pentoxy(thiocarbonyl), 1-methylbutoxy (thiocarbonyl), 2-methylbutoxy(thiocarbonyl), 3-methylbutoxy(thiocarbonyl), 1-ethylpropoxy(thiocarbonyl), 1,1-dimethylpropoxy(thiocarbonyl), 1,2-dimethylpropoxy(thiocarbonyl), and 2,2-dimethylpropoxy(thiocarbonyl) groups.

In the present invention, unless otherwise specified, the "(C1-C6)alkylaminothiocarbonyl" refers to a ((C1-C6)alkyl)-NH—C(═S)— group in which the alkyl moiety is as defined above. Examples thereof include methylamino(thiocarbonyl), ethylamino(thiocarbonyl), n-propylamino(thiocarbonyl), isopropylamino(thiocarbonyl), n-butylamino (thiocarbonyl), isobutylamino(thiocarbonyl), sec-butylamino(thiocarbonyl), tert-butylamino(thiocarbonyl), n-pentylamino(thiocarbonyl), 1-methylbutylamino(thiocarbonyl), 2-methylbutylamino(thiocarbonyl), 3-methylbutylamino(thiocarbonyl), 1-ethylpropylamino(thiocarbonyl), 1,1-dimethylpropylamino(thiocarbonyl), 1,2-dimethylpropylamino(thiocarbonyl), 2,2-dimethylpropylamino(thiocarbonyl), and n-hexylamino(thiocarbonyl) groups.

In the present invention, unless otherwise specified, the "(C1-C6)alkylsulfonyl" refers to a ((C1-C6)alkyl)-$S(═O)_2$— group in which the alkyl moiety is as defined above. Examples thereof include methylsulfonyl, ethylsulfonyl, n-propylsulfonyl, isopropylsulfonyl, n-butylsulfonyl, isobutylsulfonyl, sec-butylsulfonyl, and tert-butylsulfonyl groups.

In the present invention, unless otherwise specified, the "(C1-C6)haloalkylsulfonyl" refers to a ((C1-C6)haloalkyl)-$S(═O)_2$— group in which the haloalkyl moiety is as defined above. Examples thereof include difluoromethylsulfonyl, trifluoromethylsulfonyl, trichloromethylsulfonyl, 2,2,2-trifluoroethylsulfonyl, pentafluoroethylsulfonyl, 3,3,3-trifluoropropylsulfonyl, heptafluoropropylsulfonyl, heptafluoro-2-propylsulfonyl, and nonafluorobutylsulfonyl groups.

In the present invention, unless otherwise specified, the "(C1-C6)alkylaminosulfonyl" refers to a ((C1-C6)alkyl)-NH—$S(═O)_2$— group in which the alkyl moiety is as defined above. Examples thereof include methylaminosulfonyl, ethylaminosulfonyl, n-propylaminosulfonyl, isopropylaminosulfonyl, n-butylaminosulfonyl, isobutylaminosulfonyl, sec-butylaminosulfonyl, tert-butylaminosulfonyl, n-pentylaminosulfonyl, 1-methylbutylaminosulfonyl, 2-methylbutylaminosulfonyl, 3-methylbutylaminosulfonyl, 1-ethylpropylaminosulfonyl, 1,1-dimethylpropylaminosulfonyl, 1,2-dimethylpropylaminosulfonyl, 2,2-dimethylpropylaminosulfonyl, and n-hexylaminosulfonyl groups.

In the present invention, unless otherwise specified, the "(C1-C6)alkoxycarbonyl (C1-C6)alkyl" refers to a ((C1-C6) alkoxy)-C(═O)—((C1-C6)alkyl)- group in which the alkoxy moiety and the alkyl moiety are as defined above. Examples thereof include methoxycarbonylmethyl, ethoxycarbonylmethyl, n-propoxycarbonylmethyl, isopropoxycarbonylmethyl, tert-butoxycarbonylmethyl, 1-(methoxycarbonyl)ethyl, 2-(methoxycarbonyl)ethyl, 1-(ethoxycarbonyl)ethyl, 2-(ethoxycarbonyl)ethyl, 1-(methoxycarbonyl)-1-methylethyl, 1-(ethoxycarbonyl)-1-methylethyl, and 2-(tert-butoxycarbonyl)ethyl groups.

In the present invention, unless otherwise specified, the "aminocarbonyl (C1-C6)alkyl" refers to a $H_2N$—C(═O)—((C1-C6)alkyl)- group in which the alkyl moiety is as defined above. Examples thereof include carbamoylmethyl, 1-carbamoylethyl, and 2-carbamoylethyl groups.

In the present invention, unless otherwise specified, the "(C1-C6)alkylaminocarbonyl (C1-C6)alkyl" refers to a ((C1-C6)alkyl)-NH—C(═O)—((C1-C6)alkyl)- group in which the alkyl moiety is as defined above. Examples thereof include N-methylcarbamoylmethyl, N-ethylcarbamoylmethyl, and N-(tert-butyl)carbamoylmethyl groups.

In the present invention, unless otherwise specified, the "(C3-C6)cycloalkylaminocarbonyl (C1-C6)alkyl" refers to a ((C3-C6)cycloalkyl)-NH—C(═O)—((C1-C6)alkyl)- group in which the cycloalkyl moiety and the alkyl moiety are as defined above. Examples thereof include N-cyclopropylcarbamoylmethyl, N-cyclobutylcarbamoylmethyl, N-cyclopentylcarbamoylmethyl, and N-cyclohexylcarbamoylmethyl groups.

In the present invention, unless otherwise specified, the "(C1-C6)haloalkylaminocarbonyl (C1-C6)alkyl" refers to a ((C1-C6)haloalkyl)-NH—C(═O)—((C1-C6)alkyl)- group in which the haloalkyl moiety and the alkyl moiety are as defined above. Examples thereof include N-(2,2-difluoroethyl)carbamoylmethyl, N-(2,2,2-trifluoroethyl)carbamoylmethyl, 1-[N-(2,2-difluoroethyl)carbamoyl]ethyl, 1-[N-(2,2,2-trifluoroethyl)carbamoyl]ethyl, 1-[N-(2,2-difluoroethyl)carbamoyl]-1-methylethyl, and 1-[N-(2,2,2-trifluoroethyl)carbamoyl]-1-methylethyl groups.

In the present invention, unless otherwise specified, the "(C1-C6)alkylcarbonyl (C1-C6)alkyl" refers to a ((C1-C6)alkyl)-C(═O)—((C1-C6)alkyl)- group in which the alkyl moiety is as defined above. Examples thereof include acetonyl, propionylmethyl, 2-methylpropionylmethyl, pivaloylmethyl, 2-acetylethyl, 2-propionylethyl, 2-(2-methylpropionyl)ethyl, 2-pivaloylethyl, 3-acetylpropyl, 3-propionylpropyl, 3-(2-methylpropionyl)propyl, and 3-pivaloylpropyl groups.

In the present invention, unless otherwise specified, the "(C1-C6)haloalkylcarbonyl (C1-C6)alkyl group" refers to a ((C1-C6)haloalkyl)-C(═O)—(C1-C6)alkyl)- group in which the haloalkyl moiety and the alkyl moiety are as defined above. Examples thereof include 2-oxo-3,3-difluoropropyl, 3-chloro-2-oxo-3,3-difluoropropyl, 2-oxo-3,3,3-trifluoropropyl, 3-oxo-4,4-difluorobutyl, 4-chloro-3-oxo-4,4-difluorobutyl, 3-oxo-4,4,4-trifluorobutyl, 3-oxo-4,4,5,5,5-pentafluoropentyl, 4-oxo-5,5,5-trifluoropentyl, and 4-oxo-5,5,6,6,6-pentafluorohexyl groups.

In the present invention, unless otherwise specified, the "hydroxyimino (C1-C6)alkyl" refers to a HO—N═((C1-C6)alkyl)- group in which the alkyl moiety is as defined above. Examples thereof include 1-(hydroxyimino)ethyl, 2-(hydroxyimino)ethyl, 1-(hydroxyimino)propyl, 2-(hydroxyimino)propyl, and 3-(hydroxyimino)propyl groups.

In the present invention, unless otherwise specified, the "(C1-C6)alkoxyimino" refers to a ((C1-C6)alkyl)-O—N═C— group in which the alkyl moiety is as defined above. Examples thereof include methoxyimino, ethoxyimino, and isopropoxyimino groups.

In the present invention, unless otherwise specified, the "(C1-C6)alkoxyimino (C1-C6)alkyl" refers to a ((C1-C6)alkyl)-O—N═C—((C1-C6)alkyl)- group in which the alkyl moiety is as defined above. Examples thereof include 1-(methoxyimino)ethyl, 2-(methoxyimino)ethyl, 1-(methoxyimino)propyl, 2-(methoxyimino)propyl, 3-(methoxyimino)propyl, 1-(ethoxyimino)ethyl, 2-(ethoxyimino)ethyl, 1-(ethoxyimino)propyl, 2-(ethoxyimino)propyl, 3-(ethoxyimino)propyl, 1-(isopropoxyimino)ethyl, and 2-(isopropoxyimino)ethyl groups.

In the present invention, unless otherwise specified, the "(C1-C6)haloalkoxyimino (C1-C6)alkyl" refers to a ((C1-C6)haloalkyl)-O—N═((C1-C6)alkyl)- group in which the haloalkyl moiety and the alkyl moiety are as defined above. Examples thereof include (2,2,2-trifluoroethoxyimino)methyl, 2-(2,2-difluoroethoxyimino)ethyl, 2-(2,2,2-trifluoroethoxyimino)ethyl, 2-(2,2,2-trifluoroethoxyimino)propyl, and 3-(2,2,2-trifluoroethoxyimino) propyl groups.

In the present invention, unless otherwise specified, the "(C1-C12)alkyl" refers to a linear or branched alkyl group having 1 to 12 carbon atoms. Examples thereof include, in addition to the examples of the (C1-C6)alkyl group, n-heptyl, n-octyl, n-nonyl, n-decyl, n-undecyl, n-dodecyl, 4,4-dimethylpentyl, 5-methylhexyl, 5,5-dimethylhexyl, 3,5,5-trimethylhexyl, 6-methylheptyl, 6,6-dimethylheptyl, 3,6,6-trimethylheptyl, 7-methyloctyl, 7,7-dimethyloctyl, 8-methylnonyl, 8,8-dimethylnonyl, 9-methyldecyl, 9,9-dimethyldecyl, and 10-methylundecyl groups.

In the present invention, unless otherwise specified, the "(C3-C6)cycloalkoxy" refers to a ((C3-C6)cycloalkyl) group in which the cycloalkyl moiety is as defined above. Examples thereof include cyclopropoxy, cyclobutoxy, cyclopentyloxy, and cyclohexyloxy groups.

In the present invention, unless otherwise specified, the "(C3-C6)halocycloalkoxy" refers to a ((C3-C6)halocycloalkyl)-O— group in which the halocycloalkyl moiety is as defined above. Examples thereof include 2,2-difluorocyclopropoxy, 2,2-dichlorocyclopropoxy, 3,3-difluorocyclobutoxy, 3,3-dichlorocyclobutoxy, 3-fluorocyclopentyloxy, 3,3-difluorocyclopentyloxy, nonafluorocyclopentyloxy, 3,3-dichlorocyclopentyloxy, 4,4-difluorocyclohexyloxy, and 4,4-dichlorocyclohexyloxy groups.

In the present invention, unless otherwise specified, the "(C1-C6)alkoxy (C1-C6)alkoxy" refers to a ((C1-C6)alkoxy)-((C1-C6)alkoxy)- group in which the alkoxy moiety is as defined above. Examples thereof include 2-methoxyethoxy, 3-methoxypropoxy, 2-ethoxyisopropoxy, 2-isopropoxybutoxy, 5-ethoxypentyloxy, 6-ethoxyhexyloxy, 2-(tert-butoxy)ethoxy, 2-methoxyisopentyloxy, and 2-isopropoxyisobutoxy groups.

In the present invention, unless otherwise specified, the "(C1-C6)haloalkoxy (C1-C6)alkoxy" refers to a ((C1-C6)haloalkoxy)-((C1-C6)alkoxy)- group in which the haloalkoxy and alkoxy moieties are as defined above. Examples thereof include 2-difluoromethoxyethoxy, 2-trifluoromethoxyethoxy, 3-trifluoromethoxypropoxy, and 2-(2,2,2-trifluoroethoxy)ethoxy groups.

In the present invention, unless otherwise specified, the "(C1-C6)haloalkoxy (C1-C6)haloalkoxy" refers to a ((C1-C6)haloalkoxy)-((C1-C6)haloalkoxy)- group in which the haloalkoxy moiety is as defined above. Examples thereof include 2-(difluoromethoxy)-1,1,2,2-tetrafluoroethoxy, 2-(trifluoromethoxy)-1,1,2,2-tetrafluoroethoxy, 1,1,2,3,3,3-hexafluoro-2-(heptafluoropropoxy)propoxy, and 2-(2,2,2-trifluoroethoxy)-1,1,2,2-tetrafluoroethoxy groups.

In the present invention, unless otherwise specified, the "(C1-C6)haloalkylthio" refers to a ((C1-C6)haloalkyl)-S— group in which the haloalkyl moiety is as defined above. Examples thereof include fluoromethylthio, difluoromethylthio, trifluoromethylthio, trichloromethylthio, 2,2,2-trifluoroethylthio, pentafluoroethylthio, 2,2,2-trichloroethylthio, 3,3,3-trifluoropropylthio, heptafluoropropylthio, 1,1,1,3,3,3-hexafluoropropan-2-ylthio, heptafluoropropan-2-ylthio, and 4,4,4-trifluorobutylthio groups.

In the present invention, unless otherwise specified, the "(C2-C6)alkenylthio" refers to a ((C2-C6)alkenyl)-S— group in which the alkenyl moiety is as defined above. Examples thereof include vinylthio, 1-propenylthio, isopropenylthio, 2-propenylthio, 2-butenylthio, 3-butenylthio, 2-pentenylthio, 3-pentenylthio, 4-pentenylthio, 2-methyl-2-butenylthio, 2,4-pentadienylthio, 2-hexenylthio, 3-hexenylthio, 4-hexenylthio, 5-hexenylthio, and 2,4-hexadienylthio groups.

In the present invention, unless otherwise specified, the "(C2-C6)haloalkenylthio" refers to a ((C2-C6)haloalkenyl)-S— group in which the haloalkenyl moiety is as defined above. Examples of thereof include 2,2-difluorovinylthio, 2,2-dichlorovinylthio, 3,3-difluoro-2-propenylthio, 2,3,3-trifluoro-2-propenylthio, 3-chloro-2-propenylthio, 3,3-dichloro-2-propenylthio, 3-bromo-2-propenylthio, 4,4-difluoro-3-butenylthio, 4,4-difluoro-3-butene-2-ylthio, 3,4,4-trifluoro-3-butenylthio, 4,4,4-trifluoro-3-chloro-2-butenylthio, 4,4-dichloro butenylthio, 4,5,5-trifluoro-4-pentenylthio, 5,5,5-trifluoro-3-pentenylthio, 4,4,4-trifluoro trifluoromethyl-2-butenylthio, 6,6-difluoro-5-hexenylthio, 5,6,6-trifluoro-5-hexenylthio, and 6,6-dichloro hexenylthio groups.

In the present invention, unless otherwise specified, the "(C3-C6)cycloalkylthio" refers to a ((C3-C6)cycloalkyl)-S— group in which the cycloalkyl moiety is as defined above. Examples thereof include cyclopropylthio, cyclobutylthio, cyclopentylthio, and cyclohexylthio groups.

In the present invention, unless otherwise specified, the "(C3-C6)halocycloalkylthio" refers to a ((C3-C6)halocycloalkyl)-S— group in which the halocycloalkyl moiety is as defined above. Examples thereof include 2,2-difluorocyclopropylthio, 2,2-dichlorocyclopropylthio, 3,3-difluorocyclobutylthio, 3,3-difluorocyclopentylthio, and 4,4-difluorocyclohexylthio groups.

In the present invention, unless otherwise specified, the "(C3-C6)cycloalkyl (C1-C6)alkylthio" refers to a ((C3-C6) cycloalkyl)-((C1-C6)alkyl)-S— group in which the cycloalkyl and alkyl moieties are as defined above. Examples thereof include cyclopropylmethylthio, 2-cyclopropylethylthio, 3-cyclopropylpropylthio, 4-cyclopropylbutylthio, 5-cyclopropylpentylthio, cyclobutylmethylthio, cyclopentylmethylthio, and cyclohexylmethylthio groups.

In the present invention, unless otherwise specified, the "(C3-C6)halocycloalkyl (C1-C6)alkylthio" refers to a ((C3-C6)halocycloalkyl)-((C1-C6)alkyl)-S— group in which the halocycloalkyl and alkyl moieties are as defined above. Examples thereof include 2,2-difluorocyclopropylmethylthio, 2,2-dichlorocyclopropylmethylthio, 2-(2,2-difluorocyclopropyl)ethylthio, 2-(2,2-dichlorocyclopropyl)ethylthio, 2,2-difluorocyclobutylmethylthio, and 4,4-difluorocyclohexylmethylthio groups.

In the present invention, unless otherwise specified, the "tri((C1-C6)alkyl)silyl (C1-C6)alkylthio" refers to a ((C1-C6)alkyl)$_3$Si—((C1-C6)alkyl)-S— group in which the alkyl moiety is as defined above, and the three alkyl groups of the ((C1-C6)alkyl)$_3$ moiety are identical to or different from each other. Examples thereof include trimethylsilylmethylthio, triethylsilylmethylthio, trimethylsilylethylthio, tert-butyldimethylsilylmethylthio, and trimethylsilylpropylthio groups.

In the present invention, unless otherwise specified, the "(C1-C6)alkylthio (C1-C6)alkoxy" refers to a ((C1-C6)alkyl)-S—((C1-C6)alkyl)-O— group in which the alkyl moiety is as defined above. Examples thereof include methylthiomethoxy, 2-methylthioethoxy, ethylthiomethoxy, 2-ethylthioethoxy, tert-butylthiomethoxy, and 2-(tert-butylthio)ethoxy groups.

In the present invention, unless otherwise specified, the "(C1-C6)haloalkylthio (C1-C6)alkoxy" refers to a ((C1-C6) haloalkyl)-S—((C1-C6)alkyl)-O— group in which the haloalkyl and alkyl moieties are as defined above. Examples thereof include fluoromethylthiomethoxy, difluoromethylthiomethoxy, trifluoromethylthiomethoxy, 1-(fluoromethylthio)ethoxy, 1-(difluoromethylthio)ethoxy, 1-(trifluoromethylthio)ethoxy, 2-(fluoromethylthio)ethoxy, 2-(difluoromethylthio) ethoxy, and 2-(trifluoromethylthio) ethoxy groups.

In the present invention, unless otherwise specified, the "(C1-C6)alkylsulfinyl" refers to a ((C1-C6)alkyl)-S(═O)— group in which the alkyl moiety is as defined above. Examples thereof include methylsulfinyl, ethylsulfinyl, n-propylsulfinyl, isopropylsulfinyl, n-butylsulfinyl, isobutylsulfinyl, sec-butylsulfinyl, and tert-butylsulfinyl groups.

In the present invention, unless otherwise specified, the "(C1-C6)haloalkylsulfinyl" refers to a ((C1-C6)haloalkyl)-S(═O)— group in which the haloalkyl moiety is as defined above. Examples thereof include difluoromethylsulfinyl, trifluoromethylsulfinyl, 2,2,2-trifluoroethylsulfinyl, 2,2,2-trichloroethylsulfinyl, pentafluoroethylsulfinyl, heptafluoropropylsulfinyl, trichloromethylsulfinyl, and heptafluoro-2-propylsulfinyl groups.

In the present invention, unless otherwise specified, the "(C3-C6)cycloalkylsulfinyl" refers to a ((C3-C6)cycloalkyl)-S(═O)— group in which the cycloalkyl moiety is as defined above. Examples thereof include cyclopropylsulfinyl, cyclobutylsulfinyl, cyclopentylsulfinyl, and cyclohexylsulfinyl groups.

In the present invention, unless otherwise specified, the "(C3-C6)halocycloalkylsulfinyl" refers to a ((C3-C6)halocycloalkyl)-S(═O)— group in which the halocycloalkyl moiety is as defined above. Examples thereof include 2,2-difluorocyclopropylsulfinyl, 2,2-dichlorocyclopropylsulfinyl, 3,3-difluorocyclobutylsulfinyl, 3,3-difluorocyclopentylsulfinyl, and 4,4-difluorocyclohexylsulfinyl groups.

In the present invention, unless otherwise specified, the "(C3-C6)cycloalkylsulfonyl" refers to a ((C3-C6)cycloalkyl)-S(═O)$_2$— group in which the cycloalkyl moiety is as defined above. Examples thereof include cyclopropylsulfonyl, cyclobutylsulfonyl, cyclopentylsulfonyl, and cyclohexylsulfonyl groups.

In the present invention, unless otherwise specified, the "(C3-C6)halocycloalkylsulfonyl" refers to a ((C3-C6)halocycloalkyl)-S(═O)$_2$— group in which the halocycloalkyl moiety is as defined above. Examples thereof include 2,2-difluorocyclopropylsulfonyl, 2,2-dichlorocyclopropylsulfonyl, 3,3-difluorocyclobutylsulfonyl, 3,3-difluorocyclopentylsulfonyl, and 4,4-difluorocyclohexylsulfonyl groups.

In the present invention, unless otherwise specified, the "(C1-C6)haloalkylcarbonyl" refers to a ((C1-C6)haloalkyl)-C(═O)— group in which the haloalkyl moiety is as defined above. Examples thereof include fluoroacetyl, difluoroacetyl, trifluoroacetyl, chloroacetyl, trichloroacetyl, tribromoacetyl, 3,3,3-trifluoropropionyl, 3,3-difluoropropionyl, and 4,4,4-trifluorobutyryl groups.

In the present invention, unless otherwise specified, the "(C1-C6)haloalkoxycarbonyl" refers to a ((C1-C6)haloalkyl)-O—C(═O)— group in which the haloalkyl moiety is as defined above. Examples thereof include 2-fluoroethoxycarbonyl, 2,2,2-trifluoroethoxycarbonyl, 2,2,2-trichloroethoxycarbonyl, pentafluoroethoxycarbonyl, 3,3,3-trifluoropropoxycarbonyl, and heptafluoro-2-propoxycarbonyl groups.

In the present invention, unless otherwise specified, the "(C1-C6)haloalkylaminocarbonyl" refers to a ((C1-C6)haloalkyl)-NH—C(═O)— group in which the haloalkyl moiety is as defined above. Examples thereof include 2-fluoroethylaminocarbonyl, 2,2,2-trifluoroethylaminocarbonyl, 2,2,2-trichloroethylaminocarbonyl, pentafluoroethylaminocarbonyl, and 1,1,1,3,3,3-hexafluoro-2-propylaminocarbonyl groups.

In the present invention, unless otherwise specified, the "(C1-C6)alkylaminocarbonylthio" refers to a ((C1-C6)alkyl)-NH—C(═O)—S— group in which the alkyl moiety is as defined above. Examples thereof include methylaminocarbonylthio, ethylaminocarbonylthio, propylaminocarbonylthio, and isopropylaminocarbonylthio groups.

In the present invention, unless otherwise specified, the "(C1-C6)haloalkylaminocarbonylthio" refers to a ((C1-C6) haloalkyl)-NH—C(═O)—S— group in which the haloalkyl moiety is as defined above. Examples thereof include 2-fluoroethylaminocarbonylthio, 2,2,2-trifluoroethylaminocarbonylthio, 2,2,2-trichloroethylaminocarbonylthio, pentafluoroethylaminocarbonylthio, and 1,1,1,3,3,3-hexafluoro-2-propylaminocarbonylthio groups.

In the present invention, unless otherwise specified, the "(C1-C6)alkylcarbonyloxy" refers to a ((C1-C6)alkyl)-C(═O)O— group in which the alkyl moiety is as defined above. Examples thereof include acetoxy and propionyloxy groups.

In the present invention, unless otherwise specified, the "(C1-C6)haloalkylcarbonyloxy" refers to a ((C1-C6)haloalkyl)-C(═O)O— group in which the haloalkyl moiety is as defined above. Examples thereof include fluoroacetoxy, difluoroacetoxy, trifluoroacetoxy, chloroacetoxy, trichloroacetoxy, tribromoacetoxy, 3,3,3-trifluoropropionyloxy, 3,3-difluoropropionyloxy, and 4,4,4-trifluorobutyryloxy groups.

In the present invention, unless otherwise specified, the "(C1-C6)alkylsulfinyloxy" refers to a ((C1-C6)alkyl)-S(═O)—O— group in which the alkyl moiety is as defined above. Examples thereof include methylsulfinyloxy, ethylsulfinyloxy, n-propylsulfinyloxy, and isopropylsulfinyloxy groups.

In the present invention, unless otherwise specified, the "(C1-C6)haloalkylsulfinyloxy" refers to a ((C1-C6)haloalkyl)-S(═O)—O— group in which the haloalkyl moiety is as defined above. Examples thereof include difluoromethylsulfinyloxy, trifluoromethylsulfinyloxy, 2,2,2-trifluoroethylsulfinyloxy, pentafluoroethylsulfinyloxy, heptafluoropropylsulfinyloxy, trichloromethylsulfinyloxy, and heptafluoro-2-propylsulfinyloxy groups.

In the present invention, unless otherwise specified, the "(C3-C6)cycloalkylsulfinyloxy" refers to a ((C3-C6)cycloalkyl)-S(═O)—O— group in which the cycloalkyl moiety is as defined above. Examples thereof include cyclopropylfinyloxy, cyclobutylsulfinyloxy, cyclopentylsulfinyloxy, and cyclohexylsulfinyloxy groups.

In the present invention, unless otherwise specified, the "(C3-C6)halocycloalkylsulfinyloxy" refers to a ((C3-C6) halocycloalkyl)-S(═O)—O— group in which the halocycloalkyl moiety is as defined above. Examples thereof include 2,2-difluorocyclopropylsulfinyloxy, 2,2-dichlorocyclopropylsulfinyloxy, 3,3-difluorocyclobutylsulfinyloxy, 3,3-difluorocyclopentylsulfinyloxy, and 4,4-difluorocyclohexylsulfinyloxy groups.

In the present invention, unless otherwise specified, the "(C1-C6)alkylsulfonyloxy" refers to a ((C1-C6)alkyl)-S(═O)$_2$—O— group in which the alkyl moiety is as defined above. Examples thereof include methylsulfonyloxy, ethylsulfonyloxy, n-propylsulfonyloxy, and isopropylsulfonyloxy groups.

In the present invention, unless otherwise specified, the "(C1-C6)haloalkylsulfonyloxy" refers to a ((C1-C6)haloalkyl)-S(═O)$_2$—O— group in which the haloalkyl moiety is as defined above. Examples thereof include difluoromethylsulfonyloxy, trifluoromethylsulfonyloxy, trichloromethylsulfonyloxy, 2,2,2-trifluoroethylsulfonyloxy, 2,2,2-trichloroethylsulfonyloxy, 3,3,3-trifluoropropylsulfonyloxy, and heptafluoro-2-propylsulfonyloxy groups.

In the present invention, unless otherwise specified, the "(C3-C6)cycloalkylsulfonyloxy" refers to a ((C3-C6)cycloalkyl)-S(═O)$_2$—O— group in which the cycloalkyl moiety is as defined above. Examples thereof include cyclopropylsulfonyloxy, cyclobutylsulfonyloxy, cyclopentylsulfonyloxy, and cyclohexylsulfonyloxy groups.

In the present invention, unless otherwise specified, the "(C3-C6)halocycloalkylsulfonyloxy" refers to a ((C3-C6) halocycloalkyl)-S(═O)$_2$—O— group in which the halocycloalkyl moiety is as defined above. Examples thereof include 2,2-difluorocyclopropylsulfonyloxy, 2,2-dichlorocyclopropylsulfonyloxy, 3,3-difluorocyclobutylsulfonyloxy, 3,3-difluorocyclopentylsulfonyloxy, and 4,4-difluorocyclohexylsulfonyloxy groups.

In the present invention, unless otherwise specified, the "(C1-C6)haloalkylamino" refers to a ((C1-C6)haloalkyl)-NH— group in which the haloalkyl moiety is as defined above. Examples thereof include 2-fluoroethylamino, 2,2-difluoroethylamino, 2,2,2-trifluoroethylamino, 2,2,2-trichloroethylamino, pentafluoroethylamino, 3,3,3-trifluoropropylamino, and 1,1,1,3,3,3-hexafluoro-2-propylamino groups.

In the present invention, unless otherwise specified, the "(C1-C6)alkylcarbonylamino" refers to a ((C1-C6)alkyl)-C(═O)—NH— group in which the alkyl moiety is as defined above. Examples thereof include acetylamino, propionylamino, butyrylamino, and isobutyrylamino groups.

In the present invention, unless otherwise specified, the "(C1-C6)haloalkylcarbonylamino" refers to a ((C1-C6)haloalkyl)-C(═O)—NH— group in which the haloalkyl moiety is as defined above. Examples thereof include fluoroacetylamino, difluoroacetylamino, trifluoroacetylamino, chloroacetylamino, trichloroacetylamino, tribromoacetylamino, 3,3,3-trifluoropropionylamino, pentafluoropropionylamino, and 3,3-difluoropropionylamino group.

In the present invention, unless otherwise specified, the "(C1-C6)haloalkoxycarbonylamino" refers to a ((C1-C6) haloalkoxy)-C(═O)—NH— group in which the haloalkoxy moiety is as defined above. Examples thereof include 2-fluoroethoxycarbonylamino, 2,2,2-trifluoroethoxycarbonylamino, 2,2,2-trichloroethoxycarbonylamino, pentafluoroethoxycarbonylamino, 3,3,3-trifluoropropoxycarbonylamino, and heptafluoro-2-propoxycarbonylamino groups.

In the present invention, unless otherwise specified, the "(C1-C6)alkylaminocarbonylamino" refers to a ((C1-C6) alkyl)-NH—C(═O)—NH— group in which the alkyl moiety is as defined above. Examples thereof include methylaminocarbonylamino, ethylaminocarbonylamino, n-propylaminocarbonylamino, isopropylaminocarbonylamino, and tert-butylaminocarbonylamino groups.

In the present invention, unless otherwise specified, the "(C1-C6)haloalkylaminocarbonylamino" refers to a ((C1-C6)haloalkyl)-NH—C(═O)—NH— group in which the haloalkyl moiety is as defined above. Examples thereof include 2-fluoroethylaminocarbonylamino, 2,2,2-trifluoroethylaminocarbonylamino, 2,2,2-trichloroethylaminocarbonylamino, pentafluoroethylaminocarbonylamino, and 1,1,1,3,3,3-hexafluoro-2-propylaminocarbonylamino groups.

In the present invention, unless otherwise specified, the "(C1-C6)alkylsulfinylamino" refers to a ((C1-C6)alkyl)-SO—NH— group in which the alkyl moiety is as defined above. Examples thereof include methylsulfinylamino, ethylsulfinylamino, n-propylsulfinylamino, isopropylsulfinylamino, and tert-butylsulfinylamino groups.

In the present invention, unless otherwise specified, the "(C1-C6)haloalkylsulfinylamino" refers to a ((C1-C6)haloalkyl)-S(═O)—NH— group in which the haloalkyl moiety is as defined above. Examples thereof include fluoromethylsulfinylamino, difluoromethylsulfinylamino, trifluoromethylsulfinylamino, chloromethylsulfinylamino, trichloromethylsulfinylamino, 2,2,2-trifluoroethylsulfinylamino, 2,2-difluoroethylsulfinylamino, and 3,3,3-trifluoropropylsulfinylamino groups.

In the present invention, unless otherwise specified, the "(C1-C6)alkylsulfonylamino" refers to a ((C1-C6)alkyl)-S(═O)$_2$—NH— group in which the alkyl moiety is as defined above. Examples thereof include methylsulfonylamino, ethylsulfonylamino, n-propylsulfonylamino, isopropylsulfonylamino, and tert-butylsulfonylamino groups.

In the present invention, unless otherwise specified, the "(C1-C6)haloalkylsulfonylamino" refers to a ((C1-C6)haloalkyl)-S(═O)$_2$—NH— group in which the haloalkyl moiety is as defined above. Examples thereof include fluoromethylsulfonylamino, difluoromethylsulfonylamino, trifluoromethylsulfonylamino, chloromethylsulfonylamino, trichloromethylsulfonylamino, 2,2,2-trifluoroethylsulfonylamino, 2,2-difluoroethylsulfonylamino, and 3,3,3-trifluoropropylsulfonylamino groups.

In the present invention, unless otherwise specified, the "tri((C1-C6)alkyl)silyl" refers to a ((C1-C6)alkyl)$_3$-Si- group in which the alkyl moiety is as defined above, and the three alkyl groups are optionally identical or different from each other. Examples thereof include trimethylsilyl, triethylsilyl, triisopropylsilyl, dimethylisopropylsilyl, and tert-butyldimethylsilyl groups.

In the present invention, unless otherwise specified, the "phenyl (C1-C6)alkoxy" refers to a phenyl-((C1-C6)alkyl)-O— group in which the alkyl moiety is as defined above. Examples thereof include phenylmethoxy, 1-phenylethoxy, 2-phenylethoxy, 1-phenylpropoxy, 2-phenylbutoxy, and 1-phenylpentoxy groups.

In the present invention, unless otherwise specified, the "phenyl (C1-C6)alkylthio" refers to a phenyl-((C1-C6)alkyl)-S— group in which the alkyl moiety is as defined above. Examples thereof include phenylmethylthio, 1-phenylethylthio, 2-phenylethylthio, 1-phenylpropylthio, 2-phenylbutylthio, and 1-phenylpentylthio groups.

In the present invention, unless otherwise specified, the "phenyl (C1-C6)alkylsulfinyl" refers to a phenyl-((C1-C6)alkyl)-S(═O)— group in which the alkyl moiety is as defined above. Examples thereof include phenylmethylsulfinyl, 1-phenylethylsulfinyl, 2-phenylethylsulfinyl, 1-phenylpropylsulfinyl, 2-phenylbutylsulfinyl, and 1-phenylpentylsulfinyl groups.

In the present invention, unless otherwise specified, the "phenyl (C1-C6)alkylsulfonyl" refers to a phenyl-((C1-C6)alkyl)-S(═O)$_2$— group in which the alkyl moiety is as defined above. Examples thereof include phenylmethylsulfonyl, 1-phenylethylsulfonyl, 2-phenylethylsulfonyl, 1-phenylpropylsulfonyl, 2-phenylbutylsulfonyl, and 1-phenylpentylsulfonyl groups.

In the present invention, unless otherwise specified, the "(C1-C6)alkylthio (C1-C6)alkyl" refers to a ((C1-C6)alkyl)-S—((C1-C6)alkyl)- group in which the alkyl moiety is as defined above. Examples thereof include methylthiomethyl, ethylthiomethyl, n-propylthiomethyl, isopropylthiomethyl, 1-(methylthio)ethyl, 2-(methylthio)ethyl, 2-(ethylthio)ethyl, 1-(n-propylthio)ethyl, 2-(n-propylthio)ethyl, 1-(isopropylthio)ethyl, 2-(isopropylthio)ethyl, 1-(methylthio)propyl, 2-(methylthio)propyl, 3-(methylthio)propyl, 1-(ethylthio)propyl, 2-(ethylthio)propyl, 3-(ethylthio)propyl, 1-(n-propylthio) propyl, 2-(n-propylthio)propyl, 3-(n-propylthio)propyl, 1-(methylthio)butyl, 2-(methylthio)butyl, 3-(methylthio)butyl, 4-(methylthio)butyl, 1-(methylthio)pentyl, 2-(methylthio)pentyl, 3-(methylthio)pentyl, 4-(methylthio)pentyl, 5-(methylthio)pentyl, 2-(n-butylthio)ethyl, 2-(isobutylthio)ethyl, 2-(sec-butylthio)ethyl, 2-(tert-butylthio)ethyl, pentylthiomethyl, and hexylthiomethyl groups.

In the present invention, unless otherwise specified, the "(C1-C6)haloalkylthio (C1-C6)alkyl" refers to a ((C1-C6)haloalkyl)-S—((C1-C6)alkyl)- group in which the haloalkyl moiety and the alkyl moiety are as defined above. Examples thereof include 2-(difluoromethylthio)ethyl, 2-(trifluoromethylthio)ethyl, 2-(2,2-difluoroethylthio)ethyl, 2-(2,2,2-trifluoroethylthio)ethyl, 2-(3,3-difluoropropylthio)ethyl, 2-(3,3,3-trifluoropropylthio)ethyl, 3-(difluoromethylthio)propyl, 3-(trifluoromethylthio)propyl, 3-(2,2-difluoroethylthio)propyl, 3-(2,2,2-trifluoroethylthio)propyl, 3-(3,3-difluoropropylthio)propyl, 3-(3,3,3-trifluoropropylthio)propyl, 4-(trifluoromethylthio)butyl, and 5-(trifluoromethylthio)pentyl groups.

In the present invention, unless otherwise specified, the "(C1-C6)haloalkoxy (C1-C6)alkyl" refers to a ((C1-C6)haloalkyl)-O—((C1-C6)alkyl)- group in which the haloalkoxy moiety and the alkyl moiety are as defined above. Examples thereof include 2-(difluoromethoxy)ethyl, 2-(trifluoromethoxy)ethyl, 2-(2,2-difluoroethoxy)ethyl, 2-(2,2,2-trifluoroethoxy)ethyl, 2-(3,3-difluoropropioxy)ethyl, 2-(3,3,3-trifluoropropioxy)ethyl, 3-(difluoromethoxy)propyl, 3-(trifluoromethoxy)propyl, 3-(2,2-difluoroethoxy)propyl, 3-(2,2,2-trifluoroethoxy)propyl, 3-(3,3-difluoropropioxy)propyl, 3-(3,3,3-trifluoropropioxy)propyl, 4-(trifluoromethoxy)butyl, and 5-(trifluoromethoxy)pentyl groups.

In the present invention, unless otherwise specified, the "cyano (C3-C6)cycloalkyl (C1-C6)alkyl" refers to a (cyano)-((C3-C6)cycloalkyl)-((C1-C6)alkyl group)- group in which the cycloalkyl moiety and the alkyl moiety are as defined above. Examples thereof include (1-cyanocyclopropane-1-yl)methyl, 2-(1-cyanocyclopropane-1-yl)ethyl, (1-cyanocyclobutane-1-yl)methyl, 2-(1-cyanocyclobutane-1-yl)ethyl, (1-cyanocyclopentane-1-yl)methyl, 2-(1-cyanocyclopentane-1-yl)ethyl, (1-cyanocyclohexane-1-yl)methyl, and 2-(1-cyanocyclohexane-1-yl)ethyl groups.

In the present invention, unless otherwise specified, the "hydroxy (C3-C6)cycloalkyl" refers to a (hydroxy)-(C3-C6)cycloalkyl)- group in which the cycloalkyl moiety is as defined above. Examples thereof include 2-(hydroxy)cyclopropyl, 1-(hydroxymethyl)cyclopropyl, 3-(hydroxy)cyclobutyl, 3-(hydroxy)cyclopentyl, 4-(hydroxy)cyclohexyl, 2-(hydroxy)cyclopropyl, 1-(hydroxymethyl)cyclopropyl, 3-(hydroxy)cyclobutyl, 3-(hydroxy)cyclopentyl, and 4-(hydroxy)cyclohexyl groups.

In the present invention, unless otherwise specified, the "(C1-C6)alkylcarbonyloxy (C3-C6)cycloalkyl" refers to a ((C1-C6)alkyl)-C(═O)O—((C3-C6)cycloalkyl)- group in which the alkyl moiety and the cycloalkyl moiety are as defined above. Examples thereof include 2-(acetoxy)cyclopropyl, 1-(acetoxymethyl)cyclopropyl, 3-(acetoxy)cyclobutyl, 3-(acetoxy)cyclopentyl, 4-(acetoxy)cyclohexyl, 2-(propionyloxy)cyclopropyl, 1-(propionyloxymethyl)cyclopropyl, 3-(propionyloxy)cyclobutyl, 3-(propionyloxy) cyclopentyl, and 4-(propionyloxy)cyclohexyl groups.

In the present invention, unless otherwise specified, the "(C1-C6)alkylsulfonyloxy (C3-C6)cycloalkyl" refers to a ((C1-C6)alkyl)-S(═O)$_2$—O—((C3-C6)cycloalkyl)- group in which the alkyl moiety is as defined above. Examples thereof include 2-(methylsulfonyloxy)cyclopropyl, 1-(methylsulfonyloxymethyl)cyclopropyl, 3-(methylsulfonyloxy) cyclobutyl, 3-(methylsulfonyloxy)cyclopentyl, 4-(methylsulfonyloxy)cyclohexyl, 2-(ethylsulfonyloxy)cyclopropyl, 1-(ethylsulfonyloxymethyl)cyclopropyl, 3-(ethylsulfonyloxy)cyclobutyl, 3-(ethylsulfonyloxy)cyclopentyl, and 4-(ethylsulfonyloxy)cyclohexyl groups.

In the present invention, unless otherwise specified, the "(C1-C6)alkoxy (C3-C6)cycloalkyl" refers to a ((C1-C6) alkoxy)-((C3-C6)cycloalkyl)- group in which the alkoxy moiety and the cycloalkyl moiety are as defined above. Examples thereof include 1-(methoxy)cyclopropyl, 1-(ethoxy)cyclopropyl, 1-(methoxymethyl)cyclopropyl, 1-(ethoxymethyl)cyclopropyl, 1-(n-propoxy)cyclopropyl, 1-(isopropoxy)cyclopropyl, 1-(methoxy)cyclobutyl, 1-(ethoxy)cyclobutyl, 1-(n-propoxy)cyclobutyl, 1-(isopropoxy)cyclobutyl, 1-(methoxy)cyclopentyl, 1-(ethoxy)cyclopentyl, 1-(methoxy)cyclohexyl, and 1-(ethoxy)cyclohexyl groups.

In the present invention, unless otherwise specified, the "(C1-C6)haloalkoxy (C3-C6)cycloalkyl" refers to a ((C1-C6)haloalkoxy)-((C3-C6)cycloalkyl)- group in which the haloalkoxy moiety and the cycloalkyl moiety are as defined above. Examples thereof include 1-(difluoromethoxy)cyclopropyl, 1-(trifluoromethoxy)cyclopropyl, 1-(2,2-difluoroethoxy)cyclopropyl, 1-(2,2,2-trifluoroethoxy)cyclopropyl, 1-(difluoromethoxymethyl)cyclopropyl, 1-(trifluoromethoxymethyl)cyclopropyl, 1-(2,2-difluoroethoxymethyl)cyclopropyl, 1-(2,2,2-trifluoroethoxymethyl)cyclopropyl, 1-(difluoromethoxy)cyclobutyl, 1-(trifluoromethoxy)cyclobutyl, 1-(2,2-difluoroethoxy)cyclobutyl, 1-(2,2,2-trifluoroethoxy)cyclobutyl, 1-(difluoromethoxy)cyclopentyl, 1-(trifluoromethoxy)cyclopentyl, 1-(2,2-difluoroethoxy)cyclopentyl, 1-(2,2,2-trifluoroethoxy) cyclopentyl, 1-(difluoromethoxy)cyclohexyl, 1-(trifluoromethoxy)cyclohexyl, 1-(2,2-difluoroethoxy)cyclohexyl, and 1-(2,2,2-trifluoroethoxy)cyclohexyl groups.

In the present invention, unless otherwise specified, the "(C1-C6)alkylthio (C3-C6)cycloalkyl" refers to a ((C1-C6) alkyl)-S—((C3-C6)cycloalkyl group)- group in which the alkyl moiety and the cycloalkyl moiety are as defined above. Examples thereof include 1-(methylthio)cyclopropyl, 1-(ethylthio)cyclopropyl, 1-(methylthiomethyl)cyclopropyl, 1-(ethylthiomethyl)cyclopropyl, 1-(n-propylthio)cyclopropyl, 1-(isopropylthio)cyclopropyl, 1-(pentylthio)cyclopropyl, 1-(hexylthio)cyclopropyl, 1-(methylthio)cyclobutyl, 1-(ethylthio)cyclobutyl, 1-(n-propylthio)cyclobutyl, 1-(isopropylthio)cyclobutyl, 1-(pentylthio)cyclobutyl, 1-(hexylthio)cyclobutyl, 1-(methylthio)cyclopentyl, 1-(ethylthio)cyclopentyl, 1-(methylthio)cyclohexyl, and 1-(ethylthio) cyclohexyl groups.

In the present invention, unless otherwise specified, the "(C1-C6)haloalkylthio (C3-C6)cycloalkyl" refers to a ((C1-C6)haloalkyl)-S—((C3-C6)cycloalkyl group)- group in which the haloalkyl moiety and the cycloalkyl moiety are as defined above. Examples thereof include 1-(difluoromethylthio)cyclopropyl, 1-(trifluoromethylthio)cyclopropyl, 1-(2,2-difluoroethylthio)cyclopropyl, 1-(2,2,2-trifluoroethylthio)cyclopropyl, 1-(difluoromethylthiomethyl)cyclopropyl, 1-(trifluoromethylthiomethyl)cyclopropyl, 1-(2,2-difluoroethylthiomethyl)cyclopropyl, 1-(2,2,2-trifluoroethylthiomethyl)cyclopropyl, 1-(difluoromethylthio)cyclobutyl, 1-(trifluoromethylthio) cyclobutyl, 1-(2,2-difluoroethylthio)cyclobutyl, 1-(2,2,2-trifluoroethylthio)cyclobutyl, 1-(difluoromethylthio)cyclopentyl, 1-(trifluoromethylthio)cyclopentyl, 1-(2,2-difluoroethylthio)cyclopentyl, 1-(2,2,2-trifluoroethylthio) cyclopentyl, 1-(difluoromethylthio)cyclohexyl, 1-(trifluoromethylthio)cyclohexyl, 1-(2,2-difluoroethylthio) cyclohexyl, and 1-(2,2,2-trifluoroethylthio)cyclohexyl groups.

In the present invention, unless otherwise specified, the "(C1-C6)alkylsulfinyl (C3-C6)cycloalkyl" refers to a ((C1-C6)alkyl)-S(═O)—((C3-C6)cycloalkyl group)- group in which the alkyl moiety and the cycloalkyl moiety are as defined above. Examples thereof include 1-(methylsulfinyl) cyclopropyl, 1-(ethylsulfinyl)cyclopropyl, 1-(methylsulfinylmethyl)cyclopropyl, 1-(ethylsulfinylmethyl)cyclopropyl, 1-(n-propylsulfinyl)cyclopropyl, 1-(isopropylsulfinyl)cyclopropyl, 1-(pentylsulfinyl)cyclopropyl, 1-(hexylsulfinyl)cyclopropyl, 1-(methylsulfinyl)cyclobutyl, 1-(ethylsulfinyl) cyclobutyl, 1-(n-propylsulfinyl)cyclobutyl, 1-(isopropylsulfinyl)cyclobutyl, 1-(pentylsulfinyl)cyclobutyl, 1-(hexylsulfinyl)cyclobutyl, 1-(methylsulfinyl)cyclopentyl, 1-(ethylsulfinyl)cyclopentyl, 1-(methylsulfinyl) cyclohexyl, and 1-(ethylsulfinyl)cyclohexyl groups.

In the present invention, unless otherwise specified, the "(C1-C6)haloalkylsulfinyl (C3-C6)cycloalkyl" refers to a ((C1-C6)haloalkyl)-S(═O)—((C3-C6)cycloalkyl group)- group in which the haloalkyl moiety and the cycloalkyl moiety are as defined above. Examples thereof include 1-(difluoromethylsulfinyl)cyclopropyl, 1-(trifluoromethylsulfinyl)cyclopropyl, 1-(2,2-difluoroethylsulfinyl)cyclopropyl, 1-(2,2,2-trifluoroethylsulfinyl)cyclopropyl, 1-(difluoromethylsulfinylmethyl)cyclopropyl, 1-(trifluoromethylsulfinylmethyl)cyclopropyl, 1-(2,2-difluoroethylsulfinylmethyl)cyclopropyl, 1-(2,2,2-trifluoroethylsulfinylmethyl)cyclopropyl, 1-(difluoromethylsulfinyl)cyclobutyl, 1-(trifluoromethylsulfinyl)cyclobutyl, 1-(2,2-difluoroethylsulfinyl)cyclobutyl, 1-(2,2,2-trifluoroethylsulfinyl)cyclobutyl, 1-(difluoromethylsulfinyl) cyclopentyl, 1-(trifluoromethylsulfinyl)cyclopentyl, 1-(2,2-difluoroethylsulfinyl)cyclopentyl, 1-(2,2,2-trifluoroethylsulfinyl)cyclopentyl, 1-(difluoromethylsulfinyl)cyclohexyl, 1-(trifluoromethylsulfinyl)cyclohexyl, 1-(2,2-difluoroethylsulfinyl)cyclohexyl, and 1-(2,2,2-trifluoroethylsulfinyl)cyclohexyl groups.

In the present invention, unless otherwise specified, the "(C1-C6)alkylsulfonyl (C3-C6)cycloalkyl" refers to a ((C1-C6)alkyl)-S(═O)$_2$—((C3-C6)cycloalkyl group)- group in which the alkyl moiety and the cycloalkyl moiety are as defined above. Examples thereof include 1-(methylsulfonyl) cyclopropyl, 1-(ethylsulfonyl)cyclopropyl, 1-(methylsulfonylmethyl)cyclopropyl, 1-(ethylsulfonylmethyl)cyclopropyl, 1-(n-propylsulfonyl)cyclopropyl, 1-(isopropylsulfonyl) cyclopropyl, 1-(pentylsulfonyl)cyclopropyl, 1-(hexylsulfonyl)cyclopropyl, 1-(methylsulfonyl)cyclobutyl, 1-(ethylsulfonyl)cyclobutyl, 1-(n-propylsulfonyl) cyclobutyl, 1-(isopropylsulfonyl)cyclobutyl, 1-(pentylsulfonyl)cyclobutyl, 1-(hexylsulfonyl)cyclobutyl, 1-(methylsulfonyl)cyclopentyl, 1-(ethylsulfonyl)cyclopentyl, 1-(methylsulfonyl)cyclohexyl, and 1-(ethylsulfonyl)cyclohexyl groups.

In the present invention, unless otherwise specified, the "(C1-C6)haloalkylsulfonyl (C3-C6)cycloalkyl" refers to a ((C1-C6)haloalkyl)-S(=O)$_2$—((C3-C6)cycloalkyl group)-group in which the haloalkyl moiety and the cycloalkyl moiety are as defined above. Examples thereof include 1-(difluoromethylsulfonyl)cyclopropyl, 1-(trifluoromethylsulfonyl)cyclopropyl, 1-(2,2-difluoroethylsulfonyl)cyclopropyl, 1-(2,2,2-trifluoroethylsulfonyl)cyclopropyl, 1-(difluoromethylsulfonylmethyl)cyclopropyl, 1-(trifluoromethylsulfonylmethyl)cyclopropyl, 1-(2,2-difluoroethylsulfonylmethyl)cyclopropyl, 1-(2,2,2-trifluoroethylsulfonylmethyl)cyclopropyl, 1-(difluoromethylsulfonyl)cyclobutyl, 1-(trifluoromethylsulfonyl)cyclobutyl, 1-(2,2-difluoroethylsulfonyl)cyclobutyl, 1-(2,2,2-trifluoroethylsulfonyl)cyclobutyl, 1-(difluoromethylsulfonyl)cyclopentyl, 1-(trifluoromethylsulfonyl)cyclopentyl, 1-(2,2-difluoroethylsulfonyl)cyclopentyl, 1-(2,2,2-trifluoroethylsulfonyl)cyclopentyl, 1-(difluoromethylsulfonyl)cyclohexyl, 1-(trifluoromethylsulfonyl)cyclohexyl, 1-(2,2-difluoroethylsulfonyl)cyclohexyl, and 1-(2,2,2-trifluoroethylsulfonyl)cyclohexyl groups.

In the present invention, unless otherwise specified, the "(C1-C6)alkoxycarbonyl (C3-C6)cycloalkyl" refers to a ((C1-C6)alkyl)-O—C(=O)—((C3-C6)cycloalkyl)- group in which the alkyl moiety and the cycloalkyl moiety are as defined above. Examples thereof include 1-(methoxycarbonyl)cyclopropyl, 1-(ethoxycarbonyl)cyclopropyl, 2-(methoxycarbonyl)cyclopropyl, 2-(ethoxycarbonyl)cyclopropyl, 1-(methoxycarbonyl)cyclobutyl, 1-(ethoxycarbonyl)cyclobutyl, 1-(methoxycarbonyl)cyclopentyl, 1-(ethoxycarbonyl)cyclopentyl, 1-(methoxycarbonyl)cyclohexyl, 1-(ethoxycarbonyl)cyclohexyl, 1-(isopropoxycarbonyl)cyclohexyl, and 1-(tert-butoxycarbonyl)cyclohexyl groups.

In the present invention, unless otherwise specified, the "carboxy (C3-C6)cycloalkyl" refers to a (carboxy)-((C3-C6) cycloalkyl group)- group in which the cycloalkyl moiety is as defined above. Examples thereof include 1-(carboxy)cyclopropyl, 2-(carboxy)cyclopropyl, 1-(carboxy)cyclobutyl, 1-(carboxy)cyclopentyl, and 1-(carboxy)cyclohexyl groups.

In the present invention, unless otherwise specified, the "carbamoyl (C3-C6)cycloalkyl" refers to a (carbamoyl)-((C3-C6)cycloalkyl group)- group in which the cycloalkyl moiety is as defined above. Examples thereof include 1-(carbamoyl)cyclopropyl, 2-(carbamoyl)cyclopropyl, 1-(carbamoyl)cyclobutyl, 1-(carbamoyl)cyclopentyl, and 1-(carbamoyl)cyclohexyl groups.

In the present invention, unless otherwise specified, the "(C1-C6)alkylaminocarbonyl (C3-C6)cycloalkyl" refers to a ((C1-C6)alkyl)-NH—C(=O)—((C3-C6)cycloalkyl)-group in which the alkyl moiety and the cycloalkyl moiety are as defined above. Examples thereof include 1-(methylaminocarbonyl)cyclopropyl, 1-(ethylaminocarbonyl)cyclopropyl, 1-(n-propylaminocarbonyl)cyclopropyl, 1-(isopropylaminocarbonyl)cyclopropyl, 1-(tert-butylaminocarbonyl)cyclopropyl, 1-(methylaminocarbonyl)cyclobutyl, 1-(methylaminocarbonyl)cyclopentyl, and 1-(methylaminocarbonyl)cyclohexyl groups.

In the present invention, unless otherwise specified, the "heterocycloalkyl (C3-C6)cycloalkyl" refers to a (3- to 6-membered heterocycloalkyl)-((C3-C6)cycloalkyl group)-group in which the heterocycloalkyl moiety and the cycloalkyl moiety are as defined above. Examples thereof include 1-(oxetane-2-yl)cyclopropyl, 1-(oxetane yl)cyclopropyl, 1-(tetrahydrofuran-2-yl)cyclopropyl, 1-(tetrahydrofuran-3-yl)cyclopropyl, 1-(tetrahydrothiophene-3-yl)cyclopropyl, 1-(tetrahydropyran-2-yl)cyclopropyl, 1-(tetrahydropyran-3-yl)cyclopropyl, 1-(tetrahydropyran yl)cyclopropyl, 1-(tetrahydrothiopyran-4-yl)cyclopropyl, 1-(morpholine-4-yl)cyclopropyl, 1-(azetidine-3-yl)cyclopropyl, 1-(pyrrolidine-3-yl)cyclopropyl, and 1-(piperidine-4-yl)cyclopropyl groups.

In the present invention, unless otherwise specified, the "(C4-C8)bicycloalkyl" refers to a bicyclic cyclic alkyl group having 4 to 8 carbon atoms. Examples thereof include bicyclo[1.1.0]butane-2-yl, bicyclo[1.1.1]pentane-1-yl, bicyclo[2.1.0]pentane-2-yl, and bicyclo[2.1.0]pentane-5-yl groups.

In the present invention, unless otherwise specified, the "(C1-C6)alkylsulfinyl (C1-C6)alkyl" refers to a ((C1-C6) alkylsulfinyl)-((C1-C6)alkyl)- group in which the alkylsulfinyl moiety and the alkyl moiety are as defined above. Examples thereof include methylsulfinylmethyl, ethylsulfinylmethyl, n-propylsulfinylmethyl, isopropylsulfinylmethyl, 1-(methylsulfinyl)ethyl, 2-(methylsulfinyl)ethyl, 2-(ethylsulfinyl)ethyl, 1-(n-propylsulfinyl)ethyl, 2-(n-propylsulfinyl)ethyl, 1-(isopropylsulfinyl)ethyl, 2-(isopropylsulfinyl) ethyl, 1-(methylsulfinyl)propyl, 2-(methylsulfinyl)propyl, 3-(methylsulfinyl)propyl, 1-(ethylsulfinyl)propyl, 2-(ethylsulfinyl)propyl, 3-(ethylsulfinyl)propyl, 1-(n-propylsulfinyl) propyl, 2-(n-propylsulfinyl)propyl, 3-(n-propylsulfinyl)propyl, 1-(methylsulfinyl)butyl, 2-(methylsulfinyl)butyl, 3-(methylsulfinyl)butyl, 4-(methylsulfinyl)butyl, 1-(methylsulfinyl)pentyl, 2-(methylsulfinyl)pentyl, 3-(methylsulfinyl) pentyl, 4-(methylsulfinyl)pentyl, 5-(methylsulfinyl)pentyl, 2-(n-butylsulfinyl)ethyl, 2-(isobutylsulfinyl)ethyl, 2-(sec-butylsulfinyl)ethyl, 2-(tert-butylsulfinyl)ethyl, pentylsulfinylmethyl, and hexylsulfinylmethyl groups.

In the present invention, unless otherwise specified, the "(C1-C6)alkylsulfonyl (C1-C6)alkyl" refers to a ((C1-C6) alkylsulfonyl)-((C1-C6)alkyl)- group in which the alkylsulfonyl moiety and the alkyl moiety are as defined above. Examples thereof include methylsulfonylmethyl, ethylsulfonylmethyl, n-propylsulfonylmethyl, isopropylsulfonylmethyl, 1-(methylsulfonyl)ethyl, 2-(methylsulfonyl) ethyl, 2-(ethylsulfonyl)ethyl, 1-(n-propylsulfonyl)ethyl, 2-(n-propylsulfonyl)ethyl, 1-(isopropylsulfonyl)ethyl, 2-(isopropylsulfonyl)ethyl, 1-(methylsulfonyl)propyl, 2-(methylsulfonyl)propyl, 3-(methylsulfonyl)propyl, 1-(ethylsulfonyl)propyl, 2-(ethylsulfonyl)propyl, 3-(ethylsulfonyl)propyl, 1-(n-propylsulfonyl) propyl, 2-(n-propylsulfonyl)propyl, 3-(n-propylsulfonyl)propyl, 1-(methylsulfonyl) butyl, 2-(methylsulfonyl)butyl, 3-(methylsulfonyl)butyl, 4-(methylsulfonyl)butyl, 1-(methylsulfonyl)pentyl, 2-(methylsulfonyl)pentyl, 3-(methylsulfonyl)pentyl, 4-(methylsulfonyl)pentyl, 5-(methylsulfonyl)pentyl, 2-(n-butylsulfonyl)ethyl, 2-(isobutylsulfonyl)ethyl, 2-(sec-butylsulfonyl)ethyl, 2-(tert-butylsulfonyl)ethyl, pentylsulfonylmethyl, and hexylsulfonylmethyl groups.

In the present invention, unless otherwise specified, the "(C1-C6)alkoxy (C1-C6)alkoxy (C1-C6)alkyl" refers to a ((C1-C6)alkoxy)-((C1-C6)alkoxy)-((C1-C6)alkyl)- group in which the alkoxy moiety and the alkyl moiety are as defined above. Examples thereof include (2-methoxyethoxy)methyl and (2-ethoxyethoxy)methyl groups.

In the present invention, unless otherwise specified, the "cyano (C1-C6)alkoxy (C1-C6)alkyl" refers to a (cyano)-((C1-C6)alkoxy)-((C1-C6)alkyl)- group in which the alkoxy moiety and the alkyl moiety are as defined above. Examples thereof include a (2-cyanoethoxy)methyl group.

In the present invention, unless otherwise specified, the "(C1-C6)alkylthio (C1-C6)alkoxy (C1-C6)alkyl" refers to a ((C1-C6)alkylthio)-((C1-C6)alkoxy)-((C1-C6)alkyl)- group in which the alkylthio moiety, the alkoxy moiety, and the alkyl moiety are as defined above. Examples thereof include (2-methylthioethoxy)methyl and (2-ethylthioethoxy)methyl groups.

In the present invention, unless otherwise specified, the "(C1-C6)alkylsulfinyl (C1-C6)alkoxy (C1-C6)alkyl" refers to a ((C1-C6)alkylsulfinyl)-((C1-C6)alkoxy)-((C1-C6)alkyl)- group in which the alkylsulfinyl moiety, the alkoxy moiety, and the alkyl moiety are as defined above. Examples thereof include (2-methylsulfinylethoxy)methyl and (2-ethylsulfinylethoxy)methyl groups.

In the present invention, unless otherwise specified, the "(C1-C6)alkylsulfonyl (C1-C6)alkoxy (C1-C6)alkyl" refers to a ((C1-C6)alkylsulfonyl)-((C1-C6)alkoxy)-((C1-C6)alkyl)- group in which the alkylsulfonyl moiety, the alkoxy moiety, and the alkyl moiety are as defined above. Examples thereof include (2-methylsulfonylethoxy)methyl and (2-ethylsulfonylethoxy)methyl groups.

In the present invention, unless otherwise specified, the "(C1-C6)alkylcarbonyloxy (C1-C6)alkyl" refers to a ((C1-C6)alkyl)-C(=O)O—((C1-C6)alkyl)- group in which the alkyl moiety is as defined above. Examples thereof include acetoxymethyl, propionyloxymethyl, isobutyryloxymethyl, and pivaloyloxymethyl groups.

In the present invention, unless otherwise specified, the "(C1-C6)alkoxycarbonyloxy (C1-C6)alkyl" refers to a ((C1-C6)alkyl)-O—C(=O)—O—((C1-C6)alkyl)- group in which the alkyl moiety is as defined above. Examples thereof include methoxycarbonyloxymethyl, ethoxycarbonyloxymethyl, isopropoxycarbonyloxymethyl, tert-butoxycarbonyloxymethyl, and isobutoxycarbonyloxymethyl groups.

In the present invention, unless otherwise specified, the "(C1-C6)alkoxycarbonylamino (C1-C6)alkyl" refers to a ((C1-C6)alkyl)-O—C(=O)—NH—((C1-C6)alkyl)- group in which the alkyl moiety is as defined above. Examples thereof include methoxycarbonylaminomethyl, ethoxycarbonylaminomethyl, isopropoxycarbonylaminomethyl, tert-butoxycarbonylaminomethyl, and isobutoxycarbonylaminomethyl groups.

In the present invention, unless otherwise specified, the "(C2-C6)alkynyl (C3-C6)cycloalkyl" refers to a ((C2-C6) alkynyl)-((C1-C6)cycloalkyl)- group in which the alkynyl moiety and the cycloalkyl moiety are as defined above. Examples thereof include 1-(ethynyl)cyclopropyl, 1-(1-propynyl)cyclopropyl, 1-(2-propynyl)cyclopropyl, 1-(1-butynyl)cyclopropyl, 1-(2-butynyl)cyclopropyl, 1-(3-butynyl) cyclopropyl, and 1-(1-pentynyl)cyclopropyl groups.

In the present invention, unless otherwise specified, the "(C2-C6)alkenyloxycarbonyl" refers to a ((C1-C6)alkenyl)-O—C(=O)— group in which the alkenyl moiety is as defined above. Examples thereof include 1-propenyloxycarbonyl, isopropenyloxycarbonyl, 2-propenyloxycarbonyl, 2-butenyloxycarbonyl, 3-butenyloxycarbonyl, 2-pentenyloxycarbonyl, 3-pentenyloxycarbonyl, 4-pentenyloxycarbonyl, 2-methyl-2-butenyloxycarbonyl, 2,4-pentadienyloxycarbonyl, 2-hexenyloxycarbonyl, 3-hexenyloxycarbonyl, 4-hexenyloxycarbonyl, 5-hexenyloxycarbonyl, and 2,4-hexadienyloxycarbonyl groups.

In the present invention, unless otherwise specified, the "tri((C1-C6)alkyl)silyl (C1-C6)alkyl" refers to a ((C1-C6) alkyl)$_3$-Si—((C1-C6)alkyl)- group in which the tri (C1-C6 alkyl)silyl moiety and the alkyl moiety are as defined above, and three alkyl groups of the ((C1-C6)alkyl)$_3$ moiety are optionally identical or different from each other.

Examples thereof include trimethylsilylmethyl, 1-trimethylsilylethyl, 1-trimethylsilylpropyl, 1-trimethylsilylbutyl, 1-trimethylsilylpentyl, 1-trimethylsilylhexyl, triethylsilylmethyl, 1-triethylsilylethyl, triisopropylsilylmethyl, 1-triisopropylsilylethyl, dimethylisilylmethyl, and tert-butyldimethylsilylmethyl groups.

In the present invention, unless otherwise specified, the "(C1-C6)alkoxymethyl" refers to a ((C1-C6)alkoxy)-methyl group in which the alkoxy moiety is as defined above. Examples thereof include methoxymethyl, ethoxymethyl, n-propoxymethyl, isopropoxymethyl, n-butoxymethyl, isobutoxymethyl, sec-butoxymethyl, tert-butoxymethyl, n-pentoxymethyl, 1-methylbutoxymethyl, 2-methylbutoxymethyl, 3-methylbutoxymethyl, 1-ethylpropoxymethyl, 1,1-dimethylpropoxymethyl, 1,2-dimethylpropoxymethyl, and 2,2-dimethylpropoxymethyl groups.

In the present invention, unless otherwise specified, the "(C1-C12)alkylene" refers to alkylene having 1 to 12 carbon atoms. Examples thereof include methylene, ethylene, n-propylene, n-butylene, n-hexylene, n-heptylene, n-octylene, and n-dodecylene.

In the present invention, unless otherwise specified, the "(C3-C6)cycloalkylene" refers to cycloalkylene having 3 to 6 carbon atoms. Examples thereof include cyclopropylene, cyclobutylene, cyclopentylene, and cyclohexylene.

In the present invention, unless otherwise specified, the "(C1-C6)alkyleneoxy (C1-C12)alkylene" refers to ((C1-C6) alkylene)-O—(C1-C12 alkylene) in which the alkylene moiety is as defined above. Examples thereof include methyleneoxymethylene ($—CH_2—O—CH_2—$), methyleneoxyethylene ($—CH_2—O—CH_2CH_2—$), and ethyleneoxyethylene ($—CH_2CH_2—O—CH_2CH_2—$).

In the present invention, unless otherwise specified, the "(C2-C6)alkenylene" refers to alkenylene having 2 to 6 carbon atoms. Examples thereof include vinylene, propenylene, and butenylene.

In the present invention, unless otherwise specified, the "(C2-C6)alkynylene" refers to alkynylene having 2 to 6 carbon atoms. Examples thereof include ethynylene, propynylene, butynylene, and pentynylene.

In the present invention, "optionally mono-substituted or poly-substituted with $R^6$" means "optionally substituted with one or two or more $R^6$". When the group is substituted with two or more $R^6$, the two or more $R^6$ are identical to or different from each other, and each represent a halogen atom; a (C1-C6)alkyl; a (C1-C6)haloalkyl; a (C3-C6)cycloalkyl; a (C3-C6)halocycloalkyl; a hydroxy; a (C1-C6) alkoxy; a (C1-C6)haloalkoxy; a (C3-C6)cycloalkoxy; a (C3-C6)halocycloalkoxy; a (C1-C6)alkoxy (C1-C6)alkoxy; a (C1-C6)haloalkoxy (C1-C6)alkoxy; a (C1-C6)haloalkoxy (C1-C6)haloalkoxy; a thiol; a (C1-C6)alkylthio; a (C1-C6) haloalkylthio; a (C2-C6)alkenylthio; a (C2-C6)haloalkenylthio; a (C3-C6)cycloalkylthio; a (C3-C6)halocycloalkylthio; a (C3-C6)cycloalkyl (C1-C6)alkylthio; a (C3-C6)halocycloalkyl (C1-C6)alkylthio; a tri((C1-C6)alkyl)silyl (C1-C6) alkylthio; a (C1-C6)alkylthio (C1-C6)alkoxy; a (C1-C6) haloalkylthio (C1-C6)alkoxy; a (C1-C6)alkylsulfinyl; a (C1-C6)haloalkylsulfinyl; a (C3-C6)cycloalkylsulfinyl; a (C3-C6)halocycloalkylsulfinyl; a (C1-C6)alkylsulfonyl; a (C1-C6)haloalkylsulfonyl; a (C3-C6)cycloalkylsulfonyl; a (C3-C6)halocycloalkylsulfonyl; a formyl; a (C1-C6) alkylcarbonyl; a (C1-C6)haloalkylcarbonyl; a benzoyl (the benzoyl is optionally mono-substituted or poly-substituted with $R^7$); a (C1-C6)alkoxycarbonyl; a (C1-C6)haloalkoxycarbonyl; a (C1-C6)alkylaminocarbonyl (the amino moiety is optionally substituted with $R^{10}$); a (C1-C6)haloalkylaminocarbonyl (the amino moiety is optionally substituted with $R^{10}$); a (C1-C6)alkylaminocarbonylthio (the amino moiety is optionally substituted with $R^{10}$); a (C1-C6)haloalkylaminocarbonylthio (the amino moiety is optionally substituted with $R^{10}$); a formyloxy; a (C1-C6)alkylcarbonyloxy; a (C1-C6)haloalkylcarbonyloxy; a benzoyloxy (the benzoyloxy is optionally mono-substituted or poly-substituted with $R^7$); a (C1-C6)alkylsulfinyloxy; a (C1-C6)haloalkylsulfinyloxy; a (C3-C6)cycloalkylsulfinyloxy; a (C3-C6)halocycloalkylsulfinyloxy; a phenylsulfinyloxy (the phenylsulfinyloxy is optionally mono-substituted or poly-substituted with $R^7$); a (C1-C6)alkylsulfonyloxy; a (C1-C6)haloalkylsulfonyloxy; a (C3-C6)cycloalkylsulfonyloxy; a (C3-C6)halocycloalkylsulfonyloxy; a phenylsulfonyloxy (the phenyl moiety is optionally mono-substituted or poly-substituted with $R^7$); an amino; a (C1-C6)alkylamino (the amino moiety is optionally substituted with $R^{10}$); a (C1-C6)haloalkylamino (the amino moiety is optionally substituted with $R^{10}$); a (C1-C6) alkylcarbonylamino (the amino moiety is optionally substituted with $R^{10}$); a (C1-C6)haloalkylcarbonylamino (the amino moiety is optionally substituted with $R^{10}$); a phenylcarbonylamino (the phenyl moiety is optionally mono-substituted or poly-substituted with $R^7$, and the amino moiety is optionally substituted with $R^{10}$); a (C1-C6)alkoxycarbonylamino (the amino moiety is optionally substituted with $R^{10}$); a (C1-C6)haloalkoxycarbonylamino (the amino moiety is optionally substituted with $R^{10}$); a (C1-C6)alkylaminocarbonylamino (the amino moiety is optionally substituted with $R^{10}$); a (C1-C6)haloalkylaminocarbonylamino (the amino moiety is optionally substituted with $R^{10}$); a (C1-C6)alkylsulfinylamino (the amino moiety is optionally substituted with $R^{10}$); a (C1-C6)haloalkylsulfinylamino (the amino moiety is optionally substituted with $R^{10}$); a phenylsulfinylamino (the phenyl moiety is optionally mono-substituted or poly-substituted with $R^7$, and the amino moiety is optionally substituted with $R^{10}$); a (C1-C6)alkylsulfonylamino (the amino moiety is optionally substituted with $R^{10}$); a (C1-C6)haloalkylsulfonylamino (the amino moiety is optionally substituted with $R^{10}$); a phenylsulfonylamino (the phenyl moiety is optionally mono-substituted or poly-substituted with $R^7$, and the amino moiety is optionally substituted with $R^{10}$); a (C1-C6)alkoxyimino; a tri((C1-C6)alkyl)silyl; a phenyl (the phenyl is optionally mono-substituted or poly-substituted with $R^7$); a phenoxy (the phenoxy is optionally mono-substituted or poly-substituted with $R^7$); a phenyl (C1-C6)alkoxy (the phenyl moiety is optionally mono-substituted or poly-substituted with $R^7$); a phenylthio (the phenylthio is optionally mono-substituted or poly-substituted with $R^7$); a phenylsulfinyl (the phenylsulfinyl is optionally mono-substituted or poly-substituted with $R^7$); a phenylsulfonyl (the phenylsulfonyl is optionally mono-substituted or poly-substituted with $R^7$); a phenyl (C1-C6)alkylthio (the phenyl moiety is optionally mono-substituted or poly-substituted with $R^7$); a phenyl (C1-C6)alkylsulfinyl (the phenyl moiety is optionally mono-substituted or poly-substituted with $R^7$); a phenyl (C1-C6)alkylsulfonyl (the phenyl moiety is optionally mono-substituted or poly-substituted with $R^7$); a —O—N═C($R^8$) ($R^9$) group; an adamantyl; an azetidinyl (a nitrogen atom of the azetidinyl is optionally substituted with $R^{10}$); a pyrrolidinyl (a nitrogen atom of the pyrrolidinyl is optionally substituted with $R^{10}$); a piperidinyl (a nitrogen atom of the piperidinyl is optionally substituted with $R^{10}$); a 1,3-dioxolanyl; a 1,3-dioxanyl; a pyrrolyl (the pyrrolyl is optionally mono-substituted or poly-substituted with $R^7$); a pyrazolyl (the pyrazolyl is optionally mono-substituted or poly-substituted with $R^7$); an imidazolyl (the imidazolyl is optionally mono-substituted or poly-substituted with $R^7$); a triazolyl (the triazolyl is optionally mono-substituted or poly-substituted with $R^7$); an oxazolyl (the oxazolyl is optionally mono-substituted or poly-substituted with $R^7$); an isoxazolyl (the isoxazolyl is optionally mono-substituted or poly-substituted with $R^7$); a thiazolyl (the thiazolyl is optionally mono-substituted or poly-substituted with $R^7$); an isothiazolyl (the isothiazolyl is optionally mono-substituted or poly-substituted with $R^7$); a pyridyl (the pyridyl is optionally mono-substituted or poly-substituted with $R^7$, and further a nitrogen atom of the pyridyl is optionally oxidized to form an N-oxide); a pyrimidinyl (the pyrimidinyl is optionally mono-substituted or poly-substituted with $R^7$); a pyridyloxy (the pyridyloxy is optionally mono-substituted or poly-substituted with $R^7$); a tetrahydrofuranyl (the tetrahydrofuranyl is optionally mono-substituted or poly-substituted with $R^7$); a 1,3-dioxoisoindolinyl group (the dioxoisoindolinyl group is optionally mono-substituted or poly-substituted with $R^7$); a cyano; a nitro; a carboxy; a thiocyanato; or an aminooxy.

In the present invention, "optionally mono-substituted or poly-substituted with $R^7$" means "optionally substituted with one or two or more $R^7$". When the group is substituted with two or more $R^7$, the two or more $R^7$ are identical to or different from each other, and each represent a halogen atom; a (C1-C6)alkyl; a (C1-C6)haloalkyl; a (C3-C6)cycloalkyl; a (C3-C6)halocycloalkyl; a (C3-C6)cycloalkyl (C1-C6)alkyl; a (C3-C6)halocycloalkyl (C1-C6)alkyl; a (C1-C6)alkoxy; a (C1-C6)haloalkoxy; a (C1-C6)alkylthio; a (C1-C6)haloalkylthio; a (C1-C6)alkylsulfinyl; a (C1-C6) haloalkylsulfinyl; a (C1-C6)alkylsulfonyl; a (C1-C6)haloalkylsulfonyl; a (C1-C6)alkylthio (C1-C6)alkyl; a (C1-C6) haloalkylthio (C1-C6)alkyl; a (C1-C6)alkylsulfonyloxy; a (C1-C6)haloalkylsulfonyloxy; a phenyl (the phenyl is optionally mono-substituted or poly-substituted with a halogen atom, an alkyl, or a haloalkyl); a phenyl (C1-C6)alkyl; a phenyl (C1-C6)alkoxy; a cyano; or a nitro group.

In the present invention, the agriculturally acceptable salt or salt means a salt of any compound of the present invention of formula [I], [II], or [III], which contains a hydroxyl group, a carboxyl group, an amino group, or the like, or a nitrogen atom of a pyridine ring in the structure thereof, with a metal or an organic base, or with a mineral acid or an organic acid. Examples of the metal include an alkali metal such as sodium or potassium, or an alkaline earth metal such as magnesium or calcium. Examples of the organic base include triethylamine or diisopropylamine. Examples of the mineral acid include phosphoric acid, hydrochloric acid, hydrobromic acid, hydroiodic acid, boric acid, or sulfuric acid. Examples of the organic acid include formic acid, acetic acid, lactic acid, ascorbic acid, succinic acid, fumaric acid, maleic acid, oxalic acid, citric acid, benzoic acid, salicylic acid, tartaric acid, methanesulfonic acid, 4-toluenesulfonic acid, and trifluoromethanesulfonic acid.

Next, representative compounds of the compounds included in the 3-alkoxybenzamide derivative of the present invention of formula [I] are shown in Tables 1 to 1062, representative compounds of the compounds included in the hydroxybenzamide derivative of the present invention of formula [II] are shown in Tables 1063 to 1064, and representative compounds of the compounds included in the alkoxybenzoic acid derivative of the present invention of formula [III] are shown in Tables 1065 to 1233. However, the compounds included in the derivatives of the present invention are not limited thereto. In addition, the compound numbers in the tables are referred to in the following description.

The compounds included in the 3-alkoxybenzamide derivative, alkoxybenzoic acid derivative, or hydroxybenzderivative of the present invention may have E- and Z-form geometric isomers depending on the type of the substituent, but the present invention includes a mixture containing these E-, Z-, or E- and Z-forms in an arbitrary ratio. In addition, the compounds included in the present invention may have optical isomers resulting from the presence of one or two or more asymmetric carbon atoms and asymmetric sulfur atoms, but the present invention includes all optically active forms, racemates, or diastereomers.

The following notations in the tables in the present specification represent, for example, corresponding groups as follows.

Me: Methyl;
Et: Ethyl;
n-Pr: n-Propyl;
i-Pr: Isopropyl;
n-Bu: n-Butyl;
t-Bu: tert-Butyl;
n-Pen: n-Pentyl;
t-Pen: tert-Pentyl;
n-Hex: n-Hexyl;
n-Heptyl: n-Heptyl;
n-Octyl: n-Octyl;
n-Nonyl: n-Nonyl;
n-Decyl: n-Decyl;
c-Pr: Cyclopropyl;
c-Pen: Cyclopentyl;
c-Hex: Cyclohexyl;
$CHF_2$: Difluoromethyl;
$CF_3$: Trifluoromethyl;
Ph(4-$CF_3$): 4-Trifluoromethylphenyl;
Ph(2-F-4-$CF_3$): 2-Fluoro-4-trifluoromethylphenyl;
Ph(3,4,5-$Cl_3$): 3,4,5-Trichlorophenyl;
c-Pr(2,2-$F_2$): 2,2-Difluorocyclopropyl;
N(Phth): Phthalimide;
THF: Tetrahydrofuran;

TABLE 1

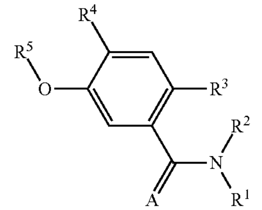

| Compound Number | $R^1$ | $R^2$ | $R^3$ | $R^4$ | $R^5$ | A |
|---|---|---|---|---|---|---|
| A-0001 | $CH_2CF_3$ | H | Cl | F | Me | O |
| A-0002 | $CH_2CF_3$ | H | Cl | F | Et | O |
| A-0003 | $CH_2CF_3$ | H | Cl | F | n-Pr | O |
| A-0004 | $CH_2CF_3$ | H | Cl | F | i-Pr | O |
| A-0005 | $CH_2CF_3$ | H | Cl | F | n-Bu | O |
| A-0006 | $CH_2CF_3$ | H | Cl | F | n-Pen | O |
| A-0007 | $CH_2CF_3$ | H | Cl | F | n-Hex | O |
| A-0008 | $CH_2CF_3$ | H | Cl | F | n-Heptyl | O |
| A-0009 | $CH_2CF_3$ | H | Cl | F | n-Octyl | O |
| A-0010 | $CH_2CF_3$ | H | Cl | F | n-Nonyl | O |
| A-0011 | $CH_2CF_3$ | H | Cl | F | n-Decyl | O |
| A-0012 | $CH_2CF_3$ | H | Cl | F | c-Pr | O |
| A-0013 | $CH_2CF_3$ | H | Cl | F | c-Pen | O |
| A-0014 | $CH_2CF_3$ | H | Cl | F | c-Hex | O |
| A-0015 | $CH_2CF_3$ | H | Cl | F | $CH_2C(Me){=}CH_2$ | O |
| A-0016 | $CH_2CF_3$ | H | Cl | F | $CH_2CH_2CH{=}CH_2$ | O |
| A-0017 | $CH_2CF_3$ | H | Cl | F | $CH_2CH_2CH{=}C(CH_3)_2$ | O |
| A-0018 | $CH_2CF_3$ | H | Cl | F | $CH_2CH_2CH_2CH{=}CH_2$ | O |
| A-0019 | $CH_2CF_3$ | H | Cl | F | $CH_2CH_2CH_2CH{=}C(CH_3)_2$ | O |
| A-0020 | $CH_2CF_3$ | H | Cl | F | $CH_2CH_2CH_2CH_2CH{=}CH_2$ | O |
| A-0021 | $CH_2CF_3$ | H | Cl | F | $CH_2CH_2CH_2CH_2CH{=}C(CH_3)_2$ | O |
| A-0022 | $CH_2CF_3$ | H | Cl | F | $CH_2CH_2CH{\equiv}CH$ | O |
| A-0023 | $CH_2CF_3$ | H | Cl | F | $CH_2CH_2CH_2CH{\equiv}CH$ | O |
| A-0024 | $CH_2CF_3$ | H | Cl | F | $CH_2CH_2CH_2CH_2CH{\equiv}CH$ | O |
| A-0025 | $CH_2CF_3$ | H | Cl | F | $CH_2CH_2CH_2Cl$ | O |
| A-0026 | $CH_2CF_3$ | H | Cl | F | $CH_2CH_2CH_2Br$ | O |
| A-0027 | $CH_2CF_3$ | H | Cl | F | $CH_2CH_2CH_2CH_2Cl$ | O |
| A-0028 | $CH_2CF_3$ | H | Cl | F | $CH_2CH_2CH_2CH_2Br$ | O |
| A-0029 | $CH_2CF_3$ | H | Cl | F | $CH_2CH_2CH_2CH_2CH_2Cl$ | O |
| A-0030 | $CH_2CF_3$ | H | Cl | F | $CH_2CH_2CH_2CH_2CH_2Br$ | O |
| A-0031 | $CH_2CF_3$ | H | Cl | Cl | $CH_2CH_2CH_2CH_2CH_2Br$ | O |
| A-0032 | $CH_2CF_3$ | H | Cl | F | $CH_2CH_2CH_2CH_2CH_2CH_2Cl$ | O |
| A-0033 | $CH_2CF_3$ | H | Cl | F | $CH_2CH_2CH_2CH_2CH_2CH_2Br$ | O |
| A-0034 | $CH_2CF_3$ | H | Cl | F | $CH_2CH_2CH_2CH_2CH_2CH_2CH_2Cl$ | O |
| A-0035 | $CH_2CF_3$ | H | Cl | F | $CH_2CH_2CH_2CH_2CH_2CH_2CH_2Br$ | O |
| A-0036 | $CH_2CF_3$ | H | Cl | F | $CH_2CH_2CH_2CH_2CH_2CH_2CH_2CH_2Br$ | O |
| A-0037 | $CH_2CF_3$ | H | Cl | F | $CH_2CH(Me)CH_2Cl$ | O |
| A-0038 | $CH_2CF_3$ | H | Cl | F | $CH_2CH(Me)CH_2Br$ | O |

TABLE 2

| Compound Number | $R^1$ | $R^2$ | $R^3$ | $R^4$ | $R^5$ | A |
|---|---|---|---|---|---|---|
| A-0039 | $CH_2CF_3$ | H | Cl | F | $CH_2CH_2CH(Me)CH_2CH_2Cl$ | O |
| A-0040 | $CH_2CF_3$ | H | Cl | F | $CH_2CH_2CH(Me)CH_2CH_2Br$ | O |
| A-0041 | $CH_2CF_3$ | H | Cl | F | $CH_2CH_2CF{=}CF_2$ | O |
| A-0042 | $CH_2CF_3$ | H | Cl | F | $CH_2CH{=}C(Cl)CF_3$ | O |
| A-0043 | $CH_2CF_3$ | H | Cl | F | $CH_2CH_2CH_2CF{=}CF_2$ | O |
| A-0044 | $CH_2CF_3$ | H | Cl | F | $CH_2CH_2CH_2CH_2CF{=}CF_2$ | O |
| A-0045 | $CH_2CF_3$ | H | Cl | F | $CH_2CH_2CH_2CH_2CH_2CF{=}CF_2$ | O |
| A-0046 | $CH_2CF_3$ | H | Cl | F | $CH_2$(t-Bu) | O |
| A-0047 | $CH_2CF_3$ | H | Cl | F | $CH_2CH_2$(t-Bu) | O |
| A-0048 | $CH_2CF_3$ | H | Cl | F | $CH_2CH_2CH_2$(t-Bu) | O |
| A-0049 | $CH_2CF_3$ | H | Cl | F | $CH_2CH_2CH_2CH_2$(t-Bu) | O |
| A-0050 | $CH_2CF_3$ | H | Cl | F | $CH_2CH_2CH_2CH_2CH_2$(t-Bu) | O |
| A-0051 | $CH_2CF_3$ | H | Cl | F | $CH_2CH_2CH_2CH_2CH_2CH_2$(t-Bu) | O |
| A-0052 | $CH_2CF_3$ | H | Cl | F | $CH_2CF_3$ | O |
| A-0053 | $CH_2CF_3$ | H | Cl | F | $CH_2CH_2CF_3$ | O |
| A-0054 | $CH_2CF_3$ | H | Cl | F | $CH_2CH_2CH_2CF_3$ | O |
| A-0055 | $CH_2CF_3$ | H | Cl | F | $CH_2CH_2CH_2CH_2CF_3$ | O |
| A-0056 | $CH_2CF_3$ | H | Cl | F | $CH_2CH_2CH_2CH_2CH_2CF_3$ | O |
| A-0057 | $CH_2CF_3$ | H | Cl | F | $CH_2CH_2CH_2CH_2CH_2CH_2CF_3$ | O |
| A-0058 | $CH_2CF_3$ | H | Cl | F | $CH_2CH_2CH_2CH_2CH_2CH_2CH_2CF_3$ | O |
| A-0059 | $CH_2CF_3$ | H | Cl | F | $CH_2CF_2CF_3$ | O |
| A-0060 | $CH_2CF_3$ | H | Cl | F | $CF_2CHFCF_3$ | O |
| A-0061 | $CH_2CF_3$ | H | Cl | F | $CF_2CF_2CF_3$ | O |
| A-0062 | $CH_2CF_3$ | H | Cl | F | $CH_2CF_2CF_2CF_3$ | O |
| A-0063 | $CH_2CF_3$ | H | Cl | F | $CH_2CF_2CF_2CF_2CF_3$ | O |
| A-0064 | $CH_2CF_3$ | H | Cl | F | $CH_2CF_2CF_2CF_2$CHF2 | O |
| A-0065 | $CH_2CF_3$ | H | Cl | F | $CH(CF_3)CF_3$ | O |
| A-0066 | $CH_2CF_3$ | H | Cl | F | $CH_2CF(CF_3)CF_3$ | O |
| A-0067 | $CH_2CF_3$ | H | Cl | F | $CH_2CF_2CF(CF_3)CF_3$ | O |
| A-0068 | $CH_2CF_3$ | H | Cl | F | $CH_2CF(CF_3)CF_2CF_3$ | O |
| A-0069 | $CH_2CF_3$ | H | Cl | F | $CH_2CF_2CF_2CF(CF_3)CF_3$ | O |
| A-0070 | $CH_2CF_3$ | H | Cl | F | $CH_2CF_2CF(CF_3)CF_2CF_3$ | O |
| A-0071 | $CH_2CF_3$ | H | Cl | F | $CH_2CF(CF_3)CF_2CF_2CF_3$ | O |
| A-0072 | $CH_2CF_3$ | H | Cl | F | $CH_2$(c-Pr) | O |
| A-0073 | $CH_2CF_3$ | H | Cl | F | $CH_2$[c-Pr(1-Me)] | O |
| A-0074 | $CH_2CF_3$ | H | Cl | F | $CH_2$[c-Pr(1-Ph)] | O |
| A-0075 | $CH_2CF_3$ | H | Cl | F | $CH_2$[c-Pr(1-$NH_2$)] | O |
| A-0076 | $CH_2CF_3$ | H | Cl | F | $CH_2$[c-Pr(1-NHC(=O)O(t-Bu)] | O |
| A-0077 | $CH_2CF_3$ | H | Cl | F | $CH_2${c-Pr[1-NHS(=O)$_2CF_3$]} | O |
| A-0078 | $CH_2CF_3$ | H | Cl | F | $CH_2${c-Pr[1-Ph(4-$CF_3$)]} | O |
| A-0079 | $CH_2CF_3$ | H | Cl | F | $CH_2${c-Pr[1-Ph(3,4,5-$F_3$)]} | O |
| A-0080 | $CH_2CF_3$ | H | Cl | F | $CH_2${c-Hex[4-(t-Bu)]} | O |
| A-0081 | $CH_2CF_3$ | H | Cl | F | $CH_2$[c-Hex(4-$CF_3$)] | O |
| A-0082 | $CH_2CF_3$ | H | Cl | F | $CH_2CH_2$(c-Pr) | O |

TABLE 3

| Compound Number | $R^1$ | $R^2$ | $R^3$ | $R^4$ | $R^5$ | A |
|---|---|---|---|---|---|---|
| A-0083 | $CH_2CF_3$ | H | Cl | F | $CH_2CH_2$(c-Hex) | O |
| A-0084 | $CH_2CF_3$ | H | Cl | F | $CH_2CH_2$[c-Hex(4-$CF_3$)] | O |
| A-0085 | $CH_2CF_3$ | H | Cl | F | $CH_2CH_2$[c-Hex(4-$SCF_3$)] | O |
| A-0086 | $CH_2CF_3$ | H | Cl | F | $CH_2CH_2CH_2$(c-Pr) | O |
| A-0087 | $CH_2CF_3$ | H | Cl | F | $CH_2CH_2CH_2$(c-Hex) | O |
| A-0088 | $CH_2CF_3$ | H | Cl | F | $CH_2CH_2CH_2${c-Hex[4-(t-Bu)]} | O |
| A-0089 | $CH_2CF_3$ | H | Cl | F | $CH_2CH_2CH_2$[c-Hex(4-$CF_3$)] | O |
| A-0090 | $CH_2CF_3$ | H | Cl | F | $CH_2CH_2CH_2$[c-Hex(4-$SCF_3$)] | O |
| A-0091 | $CH_2CF_3$ | H | Cl | F | $CH_2CH_2CH_2CH_2$(c-Pr) | O |
| A-0092 | $CH_2CF_3$ | H | Cl | F | $CH_2CH_2CH_2CH_2$(c-Hex) | O |
| A-0093 | $CH_2CF_3$ | H | Cl | F | $CH_2CH_2CH_2CH_2$[c-Hex(4-$CF_3$)] | O |
| A-0094 | $CH_2CF_3$ | H | Cl | F | $CH_2$[c-Pr(2,2-F2)] | O |
| A-0095 | $CH_2CF_3$ | H | Cl | F | $CH_2$[c-Hex(4,4-$F_2$)] | O |
| A-0096 | $CH_2CF_3$ | H | Cl | F | $CH_2CH_2$[c-Pr(2,2-$F_2$)] | O |
| A-0097 | $CH_2CF_3$ | H | Cl | F | $CH_2CH_2$[c-Hex(4,4-$F_2$)] | O |
| A-0098 | $CH_2CF_3$ | H | Cl | F | $CH_2CH_2CH_2$[c-Pr(2,2-$F_2$)] | O |
| A-0099 | $CH_2CF_3$ | H | Cl | F | $CH_2CH_2CH_2CH_2$[c-Pr(2,2-$F_2$)] | O |
| A-0100 | $CH_2CF_3$ | H | Cl | F | $CH_2CH_2OH$ | O |
| A-0101 | $CH_2CF_3$ | H | Cl | F | $CH_2CH_2CH_2OH$ | O |
| A-0102 | $CH_2CF_3$ | H | Cl | F | $CH_2CH_2CH_2CH_2OH$ | O |
| A-0103 | $CH_2CF_3$ | H | Cl | F | $CH_2CH_2CH_2CH_2CH_2OH$ | O |
| A-0104 | $CH_2CF_3$ | H | Cl | F | $CH_2CH_2CH_2CH_2CH_2CH_2OH$ | O |
| A-0105 | $CH_2CF_3$ | H | Cl | F | $CH_2C(=O)Me$ | O |
| A-0106 | $CH_2CF_3$ | H | Cl | F | $CH_2CH(OH)Me$ | O |
| A-0107 | $CH_2CF_3$ | H | Cl | F | $CH_2CH(OH)CF_3$ | O |
| A-0108 | $CH_2CF_3$ | H | Cl | F | $CH_2C(OH)_2CF_3$ | O |
| A-0109 | $CH_2CF_3$ | H | Cl | F | $CH_2C(CF_3){=}NOH$ | O |
| A-0110 | $CH_2CF_3$ | H | Cl | F | $CH_2C(CF_3){=}NOMe$ | O |
| A-0111 | $CH_2CF_3$ | H | Cl | F | $CH_2CH(CF_3)NH_2$ | O |
| A-0112 | $CH_2CF_3$ | H | Cl | F | $CH_2CH_2OMe$ | O |
| A-0113 | $CH_2CF_3$ | H | Cl | F | $CH_2CH_2CH_2OMe$ | O |
| A-0114 | $CH_2CF_3$ | H | Cl | F | $CH_2CH_2CH_2CH_2OMe$ | O |
| A-0115 | $CH_2CF_3$ | H | Cl | F | $CH_2CH_2CH_2CH_2CH_2OMe$ | O |
| A-0116 | $CH_2CF_3$ | H | Cl | F | $CH_2CH_2CH_2CH_2CH_2CH_2OMe$ | O |
| A-0117 | $CH_2CF_3$ | H | Cl | F | $CH_2CH_2OCHF_2$ | O |
| A-0118 | $CH_2CF_3$ | H | Cl | F | $CH_2CH_2CH_2OCHF_2$ | O |
| A-0119 | $CH_2CF_3$ | H | Cl | F | $CH_2CH_2CH_2CH_2OCHF_2$ | O |
| A-0120 | $CH_2CF_3$ | H | Cl | F | $CH_2CH_2CH_2CH_2CH_2OCHF_2$ | O |
| A-0121 | $CH_2CF_3$ | H | Cl | F | $CH_2CH_2CH_2CH_2CH_2CH_2OCHF_2$ | O |
| A-0122 | $CH_2CF_3$ | H | Cl | F | $CH_2CH_2OCH_2CF_3$ | O |
| A-0123 | $CH_2CF_3$ | H | Cl | F | $CH_2CH_2CH_2OCH_2CF_3$ | O |
| A-0124 | $CH_2CF_3$ | H | Cl | F | $CH_2CH_2CH_2CH_2OCH_2CF_3$ | O |
| A-0125 | $CH_2CF_3$ | H | Cl | F | $CH_2CH_2CH_2CH_2CH_2OCH_2CF_3$ | O |
| A-0126 | $CH_2CF_3$ | H | Cl | F | $CH_2CH_2CH_2CH_2CH_2CH_2OCH_2CF_3$ | O |

TABLE 4

| Compound Number | $R^1$ | $R^2$ | $R^3$ | $R^4$ | $R^5$ | A |
|---|---|---|---|---|---|---|
| A-0127 | $CH_2CF_3$ | H | Cl | F | $CH_2CH_2CH_2CH_2CH_2CH_2CH_2OCH_2CF_3$ | O |
| A-0128 | $CH_2CF_3$ | H | Cl | F | $CH_2CH_2OC(CF_3)_3$ | O |
| A-0129 | $CH_2CF_3$ | H | Cl | F | $CH_2CH_2CH_2OC(CF_3)_3$ | O |
| A-0130 | $CH_2CF_3$ | H | Cl | F | $CH_2CH_2CH_2CH_2OC(CF_3)_3$ | O |
| A-0131 | $CH_2CF_3$ | H | Cl | F | $CH_2CH_2CH_2CH_2CH_2OC(CF_3)_3$ | O |
| A-0132 | $CH_2CF_3$ | H | Cl | F | $CF_2CHFOCF_2CF_2CF_3$ | O |
| A-0133 | $CH_2CF_3$ | H | Cl | F | $CH_2CH_2O$(c-Pr) | O |
| A-0134 | $CH_2CF_3$ | H | Cl | F | $CH_2CH_2O$(c-Pen) | O |
| A-0135 | $CH_2CF_3$ | H | Cl | F | $CH_2CH_2O$(c-Hex) | O |
| A-0136 | $CH_2CF_3$ | H | Cl | F | $CH_2CH_2CH_2O$(c-Pr) | O |
| A-0137 | $CH_2CF_3$ | H | Cl | F | $CH_2CH_2CH_2O$(c-Pen) | O |
| A-0138 | $CH_2CF_3$ | H | Cl | F | $CH_2CH_2CH_2O$(c-Hex) | O |
| A-0139 | $CH_2CF_3$ | H | Cl | F | $CH_2CH_2CH_2CH_2O$(c-Pr) | O |
| A-0140 | $CH_2CF_3$ | H | Cl | F | $CH_2CH_2CH_2CH_2O$(c-Pen) | O |
| A-0141 | $CH_2CF_3$ | H | Cl | F | $CH_2CH_2CH_2CH_2O$(c-Hex) | O |
| A-0142 | $CH_2CF_3$ | H | Cl | F | $CH_2CH_2O$[c-Pr(2,2-$F_2$)] | O |
| A-0143 | $CH_2CF_3$ | H | Cl | F | $CH_2CH_2CH_2O$[c-Pr(2,2-$F_2$)] | O |
| A-0144 | $CH_2CF_3$ | H | Cl | F | $CH_2CH_2CH_2CH_2O$[c-Pr(2,2-$F_2$)] | O |
| A-0145 | $CH_2CF_3$ | H | Cl | F | $CH_2CH_2OCH_2CH_2OCH_3$ | O |
| A-0146 | $CH_2CF_3$ | H | Cl | F | $CH_2CH_2OCH_2CH_2OCH_2CF_3$ | O |
| A-0147 | $CH_2CF_3$ | H | Cl | F | $CH_2CF_2OCF_2CF_2OCF_3$ | O |
| A-0148 | $CH_2CF_3$ | H | Cl | F | $CF_2CHFOCF_2CF_2OCF_3$ | O |
| A-0149 | $CH_2CF_3$ | H | Cl | F | $CF_2CHFOCF_2CF(CF_3)OCF_2CF_2CF_3$ | O |
| A-0150 | $CH_2CF_3$ | H | Cl | F | $CH_2CH_2SH$ | O |

TABLE 4-continued

| Compound Number | $R^1$ | $R^2$ | $R^3$ | $R^4$ | $R^5$ | A |
|---|---|---|---|---|---|---|
| A-0151 | $CH_2CF_3$ | H | Cl | F | $CH_2CH_2CH_2SH$ | O |
| A-0152 | $CH_2CF_3$ | H | Cl | F | $CH_2CH_2CH_2CH_2SH$ | O |
| A-0153 | $CH_2CF_3$ | H | Cl | F | $CH_2CH_2CH_2CH_2CH_2SH$ | O |
| A-0154 | $CH_2CF_3$ | H | Cl | F | $CH_2CH_2CH_2CH_2CH_2CH_2SH$ | O |
| A-0155 | $CH_2CF_3$ | H | Cl | F | $CH_2CH(SH)Me$ | O |
| A-0156 | $CH_2CF_3$ | H | Cl | F | $CH_2CH[SC({=}O)Me]Me$ | O |
| A-0157 | $CH_2CF_3$ | H | Cl | F | $CH_2CH_2S$(t-Bu) | O |
| A-0158 | $CH_2CF_3$ | H | Cl | F | $CH_2CH_2CH_2S$(t-Bu) | O |
| A-0159 | $CH_2CF_3$ | H | Cl | F | $CH_2CH_2CH_2CH_2S$(t-Bu) | O |
| A-0160 | $CH_2CF_3$ | H | Cl | F | $CH_2CH_2CH_2CH_2CH_2SCH_3$ | O |
| A-0161 | $CH_2CF_3$ | H | Cl | F | $CH_2CH_2CH_2CH_2CH_2SCH(CH_3)_2$ | O |
| A-0162 | $CH_2CF_3$ | H | Cl | F | $CH_2CH_2CH_2CH_2CH_2S$(t-Bu) | O |
| A-0163 | $CH_2CF_3$ | H | Cl | F | $CH_2CH_2CH_2CH_2CH_2CH_2SCH(CH_3)_2$ | O |
| A-0164 | $CH_2CF_3$ | H | Cl | F | $CH_2CH_2CH_2CH_2CH_2CH_2S$(t-Bu) | O |
| A-0165 | $CH_2CF_3$ | H | Cl | F | $CH_2CH_2CH_2CH_2CH_2CH_2CH_2S$(t-Bu) | O |
| A-0166 | $CH_2CF_3$ | H | Cl | F | $CH_2CH_2SCHF_2$ | O |
| A-0167 | $CH_2CF_3$ | H | Cl | F | $CH_2CH_2CH_2SCHF_2$ | O |
| A-0168 | $CH_2CF_3$ | H | Cl | F | $CH_2CH_2CH_2CH_2SCHF_2$ | O |
| A-0169 | $CH_2CF_3$ | H | Cl | H | $CH_2CH_2CH_2CH_2CH_2SCHF_2$ | O |
| A-0170 | $CH_2CF_3$ | H | Cl | F | $CH_2CH_2CH_2CH_2CH_2SCHF_2$ | O |

TABLE 5

| Compound Number | $R^1$ | $R^2$ | $R^3$ | $R^4$ | $R^5$ | A |
|---|---|---|---|---|---|---|
| A-0171 | $CH_2CF_3$ | H | Cl | F | $CH_2CH_2CH_2CH_2CH_2CH_2SCHF_2$ | O |
| A-0172 | $CH_2CF_3$ | H | Cl | F | $CH_2CH_2CH_2CH_2CH_2CH_2CH_2SCHF_2$ | O |
| A-0173 | $CH_2CF_3$ | H | Cl | F | $CH_2CH_2SCH_2CF_3$ | O |
| A-0174 | $CH_2CF_3$ | H | Cl | F | $CH_2CH_2CH_2SCH_2CF_3$ | O |
| A-0175 | $CH_2CF_3$ | H | Cl | F | $CH_2CH_2CH_2CH_2SCH_2CF_3$ | O |
| A-0176 | $CH_2CF_3$ | H | Cl | F | $CH_2CH_2CH_2CH_2CH_2SCH_2CF_3$ | O |
| A-0177 | $CH_2CF_3$ | H | Cl | F | $CH_2CH_2CH_2CH_2CH_2CH_2SCH_2CF_3$ | O |
| A-0178 | $CH_2CF_3$ | H | Cl | F | $CH_2CH_2CH_2CH_2CH_2CH_2CH_2SCH_2CF_3$ | O |
| A-0179 | $CH_2CF_3$ | H | Cl | F | $CH_2CH(Me)SCH_2CF_3$ | O |
| A-0180 | $CH_2CF_3$ | H | Cl | F | $CH_2CH_2SCH(CF_3)_2$ | O |
| A-0181 | $CH_2CF_3$ | H | Cl | F | $CH_2CH_2CH_2SCH(CF_3)_2$ | O |
| A-0182 | $CH_2CF_3$ | H | Cl | F | $CH_2CH_2CH_2CH_2SCH(CF_3)_2$ | O |
| A-0183 | $CH_2CF_3$ | H | Cl | F | $CH_2CH_2CH_2CH_2CH_2SCH(CF_3)_2$ | O |
| A-0184 | $CH_2CF_3$ | H | Cl | F | $CH_2CH_2CH_2CH_2CH_2CH_2SCH(CF_3)_2$ | O |
| A-0185 | $CH_2CF_3$ | H | Cl | F | $CH_2CH_2CH_2CH_2CH_2SCF_2CF_3$ | O |
| A-0186 | $CH_2CF_3$ | H | Cl | F | $CH_2CH_2CH_2CH_2CH_2CH_2SCF_2CF_3$ | O |
| A-0187 | $CH_2CF_3$ | H | Cl | F | $CH_2CH_2CH_2CH_2CH_2CH_2SCF(CF_3)_2$ | O |
| A-0188 | $CH_2CF_3$ | H | Cl | F | $CH_2CH_2CH_2CH_2CH_2CH_2CH_2SCF(CF_3)_2$ | O |
| A-0189 | $CH_2CF_3$ | H | Cl | F | $CH_2CH_2CH_2CH_2CH_2SCCl_3$ | O |
| A-0190 | $CH_2CF_3$ | H | Cl | F | $CH_2CH_2CH_2CH_2CH_2CH_2SCCl_3$ | O |
| A-0191 | $CH_2CF_3$ | H | Cl | F | $CH_2CH_2SCH_2CH{=}CH_2$ | O |
| A-0192 | $CH_2CF_3$ | H | Cl | F | $CH_2CH_2CH_2SCH_2CH{=}CH_2$ | O |
| A-0193 | $CH_2CF_3$ | H | Cl | F | $CH_2CH_2CH_2CH_2SCH_2CH{=}CH_2$ | O |
| A-0194 | $CH_2CF_3$ | H | Cl | F | $CH_2CH_2SCF{=}CFCF_3$ | O |
| A-0195 | $CH_2CF_3$ | H | Cl | F | $CH_2CH_2CH_2SCF{=}CFCF_3$ | O |
| A-0196 | $CH_2CF_3$ | H | Cl | F | $CH_2CH_2CH_2CH_2SCF{=}CFCF_3$ | O |
| A-0197 | $CH_2CF_3$ | H | Cl | F | $CH_2CH_2CH_2S$(c-Pr) | O |
| A-0198 | $CH_2CF_3$ | H | Cl | F | $CH_2CH_2CH_2S$(c-Hex) | O |
| A-0199 | $CH_2CF_3$ | H | Cl | F | $CH_2CH_2CH_2CH_2S$(c-Pr) | O |
| A-0200 | $CH_2CF_3$ | H | Cl | F | $CH_2CH_2CH_2CH_2S$(c-Hex) | O |
| A-0201 | $CH_2CF_3$ | H | Cl | F | $CH_2CH_2CH_2CH_2CH_2S$(c-Pr) | O |
| A-0202 | $CH_2CF_3$ | H | Cl | F | $CH_2CH_2CH_2CH_2CH_2S$(c-Hex) | O |
| A-0203 | $CH_2CF_3$ | H | Cl | F | $CH_2CH_2CH_2S$[c-Hex(4,4-$F_2$)] | O |
| A-0204 | $CH_2CF_3$ | H | Cl | F | $CH_2CH_2CH_2CH_2S$[c-Hex(4,4-$F_2$)] | O |
| A-0205 | $CH_2CF_3$ | H | Cl | F | $CH_2CH_2CH_2CH_2CH_2S$[c-Hex(4,4-$F_2$)] | O |
| A-0206 | $CH_2CF_3$ | H | Cl | F | $CH_2CH_2CH_2SCH_2$(c-Pr) | O |
| A-0207 | $CH_2CF_3$ | H | Cl | F | $CH_2CH_2CH_2SCH_2$(c-Hex) | O |
| A-0208 | $CH_2CF_3$ | H | Cl | F | $CH_2CH_2CH_2CH_2SCH_2$(c-Pr) | O |
| A-0209 | $CH_2CF_3$ | H | Cl | F | $CH_2CH_2CH_2CH_2SCH_2$(c-Hex) | O |
| A-0210 | $CH_2CF_3$ | H | Cl | F | $CH_2CH_2CH_2CH_2CH_2SCH_2$(c-Pr) | O |
| A-0211 | $CH_2CF_3$ | H | Cl | F | $CH_2CH_2CH_2CH_2CH_2SCH_2$(c-Hex) | O |
| A-0212 | $CH_2CF_3$ | H | Cl | F | $CH_2CH_2CH_2SCH_2$[c-Hex(4,4-$F_2$)] | O |
| A-0213 | $CH_2CF_3$ | H | Cl | F | $CH_2CH_2CH_2CH_2SCH_2$[C-Hex(4,4-$F_2$)] | O |
| A-0214 | $CH_2CF_3$ | H | Cl | F | $CH_2CH_2CH_2CH_2CH_2SCH_2$[C-Hex(4,4-$F_2$)] | O |

TABLE 6

| Compound Number | $R^1$ | $R^2$ | $R^3$ | $R^4$ | $R^5$ | A |
|---|---|---|---|---|---|---|
| A-0215 | $CH_2CF_3$ | H | Cl | F | $CH_2CH_2CH_2SCH_2SiMe_3$ | O |
| A-0216 | $CH_2CF_3$ | H | Cl | F | $CH_2CH_2CH_2CH_2SCH_2SiMe_3$ | O |
| A-0217 | $CH_2CF_3$ | H | Cl | F | $CH_2CH_2CH_2CH_2CH_2SCH_2SiMe_3$ | O |
| A-0218 | $CH_2CF_3$ | H | Cl | F | $CH_2CH_2OCH_2CH_2SCH_3$ | O |
| A-0219 | $CH_2CF_3$ | H | Cl | F | $CH_2CH_2OCH_2CH_2SCHF_2$ | O |
| A-0220 | $CH_2CF_3$ | H | Cl | F | $CH_2CH_2OCH_2CH_2SCF_3$ | O |
| A-0221 | $CH_2CF_3$ | H | Cl | F | $CH_2CH_2OCH_2CH_2SCH_2CF_3$ | O |
| A-0222 | $CH_2CF_3$ | H | Cl | F | $CH_2CH_2CH_2S({=}O)$(t-Bu) | O |
| A-0223 | $CH_2CF_3$ | H | Cl | F | $CH_2CH_2CH_2CH_2S({=}O)$(t-Bu) | O |
| A-0224 | $CH_2CF_3$ | H | Cl | F | $CH_2CH_2CH_2CH_2CH_2CH_2S({=}O)$(t-Bu) | O |
| A-0225 | $CH_2CF_3$ | H | Cl | F | $CH_2CH_2S({=}O)CHF_2$ | O |
| A-0226 | $CH_2CF_3$ | H | Cl | F | $CH_2CH_2CH_2S({=}O)CHF_2$ | O |
| A-0227 | $CH_2CF_3$ | H | Cl | F | $CH_2CH_2CH_2CH_2S({=}O)CHF_2$ | O |
| A-0228 | $CH_2CF_3$ | H | Cl | F | $CH_2CH_2CH_2CH_2CH_2S({=}O)CHF_2$ | O |
| A-0229 | $CH_2CF_3$ | H | Cl | F | $CH_2CH_2CH_2CH_2CH_2CH_2S({=}O)CHF_2$ | O |
| A-0230 | $CH_2CF_3$ | H | Cl | F | $CH_2CH_2CH_2CH_2CH_2CH_2CH_2S({=}O)CHF_2$ | O |
| A-0231 | $CH_2CF_3$ | H | Cl | F | $CH_2CH_2S({=}O)CF_3$ | O |
| A-0232 | $CH_2CF_3$ | H | Cl | F | $CH_2CH_2CH_2S({=}O)CF_3$ | O |
| A-0233 | $CH_2CF_3$ | H | Cl | F | $CH_2CH_2CH_2CH_2S({=}O)CF_3$ | O |
| A-0234 | $CH_2CF_3$ | H | Cl | F | $CH_2CH_2CH_2CH_2CH_2S({=}O)CF_3$ | O |
| A-0235 | $CH_2CF_3$ | H | Cl | F | $CH_2CH_2CH_2CH_2CH_2CH_2S({=}O)CF_3$ | O |
| A-0236 | $CH_2CF_3$ | H | Cl | F | $CH_2CH_2CH_2CH_2CH_2CH_2CH_2S({=}O)CF_3$ | O |
| A-0237 | $CH_2CF_3$ | H | Cl | F | $CH_2CH_2S({=}O)CH_2CF_3$ | O |
| A-0238 | $CH_2CF_3$ | H | Cl | F | $CH_2CH_2CH_2S({=}O)CH_2CF_3$ | O |
| A-0239 | $CH_2CF_3$ | H | Cl | F | $CH_2CH_2CH_2CH_2S({=}O)CH_2CF_3$ | O |
| A-0240 | $CH_2CF_3$ | H | Cl | F | $CH_2CH_2CH_2CH_2CH_2S({=}O)CH_2CF_3$ | O |
| A-0241 | $CH_2CF_3$ | H | Cl | F | $CH_2CH_2CH_2CH_2CH_2CH_2S({=}O)CH_2CF_3$ | O |
| A-0242 | $CH_2CF_3$ | H | Cl | F | $CH_2CH_2CH_2CH_2CH_2CH_2CH_2S({=}O)CH_2CF_3$ | O |
| A-0243 | $CH_2CF_3$ | H | Cl | F | $CH_2CH(Me)S({=}O)CH_2CF_3$ | O |
| A-0244 | $CH_2CF_3$ | H | Cl | F | $CH_2CH_2CH_2S({=}O)$(c-Pr) | O |
| A-0245 | $CH_2CF_3$ | H | Cl | F | $CH_2CH_2CH_2CH_2S({=}O)$(c-Pr) | O |
| A-0246 | $CH_2CF_3$ | H | Cl | F | $CH_2CH_2CH_2CH_2S({=}O)$(c-Pen) | O |
| A-0247 | $CH_2CF_3$ | H | Cl | F | $CH_2CH_2CH_2CH_2S({=}O)$(c-Hex) | O |
| A-0248 | $CH_2CF_3$ | H | Cl | F | $CH_2CH_2CH_2CH_2CH_2S({=}O)$(c-Pr) | O |
| A-0249 | $CH_2CF_3$ | H | Cl | F | $CH_2CH_2CH_2CH_2CH_2S({=}O)$(c-Hex) | O |
| A-0250 | $CH_2CF_3$ | H | Cl | F | $CH_2CH_2CH_2S({=}O)$[c-Hex(4,4-$F_2$)] | O |
| A-0251 | $CH_2CF_3$ | H | Cl | F | $CH_2CH_2CH_2CH_2S({=}O)$[c-Hex(4,4-$F_2$)] | O |
| A-0252 | $CH_2CF_3$ | H | Cl | F | $CH_2CH_2CH_2CH_2CH_2S({=}O)$[c-Hex(4,4-$F_2$)] | O |
| A-0253 | $CH_2CF_3$ | H | Cl | F | $CH_2CH_2CH_2CH_2S({=}O)_2Me$ | O |
| A-0254 | $CH_2CF_3$ | H | Cl | F | $CH_2CH_2CH_2CH_2CH_2S({=}O)_2Me$ | O |
| A-0255 | $CH_2CF_3$ | H | Cl | F | $CH_2CH_2CH_2CH_2CH_2S({=}O)_2$(t-Bu) | O |
| A-0256 | $CH_2CF_3$ | H | Cl | F | $CH_2CH_2S({=}O)_2CHF_2$ | O |
| A-0257 | $CH_2CF_3$ | H | Cl | F | $CH_2CH_2CH_2S({=}O)_2CHF_2$ | O |
| A-0258 | $CH_2CF_3$ | H | Cl | F | $CH_2CH_2CH_2CH_2S({=}O)_2CHF_2$ | O |

TABLE 7

| Compound Number | $R^1$ | $R^2$ | $R^3$ | $R^4$ | $R^5$ | A |
|---|---|---|---|---|---|---|
| A-0259 | $CH_2CF_3$ | H | Cl | F | $CH_2CH_2CH_2CH_2CH_2S({=}O)_2CHF_2$ | O |
| A-0260 | $CH_2CF_3$ | H | Cl | F | $CH_2CH_2CH_2CH_2CH_2CH_2S({=}O)_2CHF_2$ | O |
| A-0261 | $CH_2CF_3$ | H | Cl | F | $CH_2CH_2S({=}O)_2CF_3$ | O |
| A-0262 | $CH_2CF_3$ | H | Cl | F | $CH_2CH_2CH_2S({=}O)_2CF_3$ | O |
| A-0263 | $CH_2CF_3$ | H | Cl | F | $CH_2CH_2CH_2CH_2S({=}O)_2CF_3$ | O |
| A-0264 | $CH_2CF_3$ | H | Cl | F | $CH_2CH_2CH_2CH_2CH_2S({=}O)_2CF_3$ | O |
| A-0265 | $CH_2CF_3$ | H | Cl | F | $CH_2CH_2CH_2CH_2CH_2CH_2S({=}O)_2CF_3$ | O |
| A-0266 | $CH_2CF_3$ | H | Cl | F | $CH_2CH_2CH_2CH_2CH_2CH_2CH_2S({=}O)_2CF_3$ | O |
| A-0267 | $CH_2CF_3$ | H | Cl | F | $CH_2CH_2CH_2CH_2CH_2CH_2CH_2CH_2S({=}O)_2CF_3$ | O |
| A-0268 | $CH_2CF_3$ | H | Cl | F | $CH_2CH_2S({=}O)_2CH_2CF_3$ | O |
| A-0269 | $CH_2CF_3$ | H | Cl | F | $CH_2CH_2CH_2S({=}O)_2CH_2CF_3$ | O |
| A-0270 | $CH_2CF_3$ | H | Cl | F | $CH_2CH_2CH_2CH_2S({=}O)_2CH_2CF_3$ | O |
| A-0271 | $CH_2CF_3$ | H | Cl | F | $CH_2CH_2CH_2CH_2CH_2S({=}O)_2CH_2CF_3$ | O |
| A-0272 | $CH_2CF_3$ | H | Cl | F | $CH_2CH_2CH_2CH_2CH_2CH_2S({=}O)_2CH_2CF_3$ | O |
| A-0273 | $CH_2CF_3$ | H | Cl | F | $CH_2CH(Me)S({=}O)_2CH_2CF_3$ | O |
| A-0274 | $CH_2CF_3$ | H | Cl | F | $CH_2CH_2CH_2S({=}O)_2$(c-Pr) | O |
| A-0275 | $CH_2CF_3$ | H | Cl | F | $CH_2CH_2CH_2CH_2S({=}O)_2$(c-Pr) | O |
| A-0276 | $CH_2CF_3$ | H | Cl | F | $CH_2CH_2CH_2CH_2CH_2S({=}O)_2$(c-Pr) | O |
| A-0277 | $CH_2CF_3$ | H | Cl | F | $CH_2CH_2CH_2S({=}O)_2$[c-Hex(4,4-$F_2$)] | O |
| A-0278 | $CH_2CF_3$ | H | Cl | F | $CH_2CH_2CH_2CH_2S({=}O)_2$[c-Hex(4,4-$F_2$)] | O |
| A-0279 | $CH_2CF_3$ | H | Cl | F | $CH_2CH_2CH_2CH_2CH_2S({=}O)_2$[c-Hex(4,4-$F_2$)] | O |
| A-0280 | $CH_2CF_3$ | H | Cl | F | $CH_2CH_2CH_2C({=}O)H$ | O |
| A-0281 | $CH_2CF_3$ | H | Cl | F | $CH_2CH_2CH_2CH_2C({=}O)H$ | O |

TABLE 7-continued

| Compound Number | $R^1$ | $R^2$ | $R^3$ | $R^4$ | $R^5$ | A |
|---|---|---|---|---|---|---|
| A-0282 | $CH_2CF_3$ | H | Cl | F | $CH_2CH_2CH_2CH_2CH_2C(=O)H$ | O |
| A-0283 | $CH_2CF_3$ | H | Cl | F | $CH_2CH_2CH_2C(=O)$(t-Bu) | O |
| A-0284 | $CH_2CF_3$ | H | Cl | F | $CH_2CH_2CH_2CH_2C(=O)$(t-Bu) | O |
| A-0285 | $CH_2CF_3$ | H | Cl | F | $CH_2CH_2CH_2CH_2CH_2C(=O)$(t-Bu) | O |
| A-0286 | $CH_2CF_3$ | H | Cl | F | $CH_2CH_2CH_2C(=O)CF_3$ | O |
| A-0287 | $CH_2CF_3$ | H | Cl | F | $CH_2CH_2CH_2CH_2C(=O)CF_3$ | O |
| A-0288 | $CH_2CF_3$ | H | Cl | F | $CH_2CH_2CH_2CH_2CH_2C(=O)CF_3$ | O |
| A-0289 | $CH_2CF_3$ | H | Cl | F | $CH_2C(=O)Ph$ | O |
| A-0290 | $CH_2CF_3$ | H | Cl | F | $CH_2C(=O)Ph(4-Cl)$ | O |
| A-0291 | $CH_2CF_3$ | H | Cl | F | $CH_2C(=O)Ph(4-CF_3)$ | O |
| A-0292 | $CH_2CF_3$ | H | Cl | F | $CH_2CH_2C(=O)Ph(4-CF_3)$ | O |
| A-0293 | $CH_2CF_3$ | H | Cl | F | $CH_2CH_2CH_2C(=O)Ph(4-CF_3)$ | O |
| A-0294 | $CH_2CF_3$ | H | Cl | F | $CH_2CH_2CH_2CH_2C(=O)Ph(4-CF_3)$ | O |
| A-0295 | $CH_2CF_3$ | H | Cl | F | $CH_2CH_2CH_2CH_2CH_2C(=O)Ph(4-CF_3)$ | O |
| A-0296 | $CH_2CF_3$ | H | Cl | F | $CH_2C(=O)OEt$ | O |
| A-0297 | $CH_2CF_3$ | H | Cl | F | $CH_2CH_2C(=O)O$(t-Bu) | O |
| A-0298 | $CH_2CF_3$ | H | Cl | F | $CH_2CH_2CH_2C(=O)OEt$ | O |
| A-0299 | $CH_2CF_3$ | H | Cl | F | $CH_2CH_2CH_2C(=O)O$(t-Bu) | O |
| A-0300 | $CH_2CF_3$ | H | Cl | F | $CH_2CH_2CH_2CH_2C(=O)O$(t-Bu) | O |
| A-0301 | $CH_2CF_3$ | H | Cl | F | $CH_2CH_2CH_2CH_2CH_2C(=O)O$(t-Bu) | O |
| A-0302 | $CH_2CF_3$ | H | Cl | F | $CH_2CH_2CH_2CH_2CH_2CH_2C(=O)O$(t-Bu) | O |

TABLE 8

| Compound Number | $R^1$ | $R^2$ | $R^3$ | $R^4$ | $R^5$ | A |
|---|---|---|---|---|---|---|
| A-0303 | $CH_2CF_3$ | H | Cl | F | $CH_2CH_2CH_2CH_2CH_2CH_2CH_2C(=O)OEt$ | O |
| A-0304 | $CH_2CF_3$ | H | Cl | F | $CH_2CH_2C(=O)OCH_2CF_3$ | O |
| A-0305 | $CH_2CF_3$ | H | Cl | F | $CH_2CH_2CH_2C(=O)OCH_2CF_3$ | O |
| A-0306 | $CH_2CF_3$ | H | Cl | F | $CH_2CH_2CH_2CH_2C(=O)OCH_2CF_3$ | O |
| A-0307 | $CH_2CF_3$ | H | Cl | F | $CH_2CH_2CH_2CH_2CH_2C(=O)OCH_2CF_3$ | O |
| A-0308 | $CH_2CF_3$ | H | Cl | F | $CH_2CH_2C(=O)NH$(t-Bu) | O |
| A-0309 | $CH_2CF_3$ | H | Cl | F | $CH_2CH_2CH_2C(=O)NH$(t-Bu) | O |
| A-0310 | $CH_2CF_3$ | H | Cl | F | $CH_2CH_2CH_2C(=O)NH$(t-Pen) | O |
| A-0311 | $CH_2CF_3$ | H | Cl | F | $CH_2CH_2CH_2CH_2C(=O)NH$(t-Bu) | O |
| A-0312 | $CH_2CF_3$ | H | Cl | F | $CH_2CH_2C(=O)NHCH_2CF_3$ | O |
| A-0313 | $CH_2CF_3$ | H | Cl | F | $CH_2CH_2CH_2C(=O)NHCH_2CF_3$ | O |
| A-0314 | $CH_2CF_3$ | H | Cl | F | $CH_2CH_2CH_2CH_2C(=O)NHCH_2CF_3$ | O |
| A-0315 | $CH_2CF_3$ | H | Cl | F | $CH_2CH_2SC(=O)N(Me)_2$ | O |
| A-0316 | $CH_2CF_3$ | H | Cl | F | $CH_2CH_2CH_2SC(=O)N(Me)_2$ | O |
| A-0317 | $CH_2CF_3$ | H | Cl | F | $CH_2CH_2CH_2SC(=O)NH$(t-Bu) | O |
| A-0318 | $CH_2CF_3$ | H | Cl | F | $CH_2CH_2CH_2CH_2CH_2SC(=O)NH$(t-Bu) | O |
| A-0319 | $CH_2CF_3$ | H | Cl | F | $CH_2CH_2SC(=O)NHCH_2CF_3$ | O |
| A-0320 | $CH_2CF_3$ | H | Cl | F | $CH_2CH_2CH_2SC(=O)NHCH_2CF_3$ | O |
| A-0321 | $CH_2CF_3$ | H | Cl | F | $CH_2CH_2CH_2CH_2SC(=O)NHCH_2CF_3$ | O |
| A-0322 | $CH_2CF_3$ | H | Cl | F | $CH_2CH_2CH_2OC(=O)H$ | O |
| A-0323 | $CH_2CF_3$ | H | Cl | F | $CH_2CH_2CH_2CH_2OC(=O)H$ | O |
| A-0324 | $CH_2CF_3$ | H | Cl | F | $CH_2CH_2CH_2CH_2CH_2OC(=O)H$ | O |
| A-0325 | $CH_2CF_3$ | H | Cl | F | $CH_2CH_2CH_2OC(=O)Me$ | O |
| A-0326 | $CH_2CF_3$ | H | Cl | F | $CH_2CH_2CH_2CH_2OC(=O)Me$ | O |
| A-0327 | $CH_2CF_3$ | H | Cl | F | $CH_2CH_2CH_2CH_2CH_2OC(=O)Me$ | O |
| A-0328 | $CH_2CF_3$ | H | Cl | F | $CH_2CH_2OC(=O)CF_3$ | O |
| A-0329 | $CH_2CF_3$ | H | Cl | F | $CH_2CH_2CH_2OC(=O)CF_3$ | O |
| A-0330 | $CH_2CF_3$ | H | Cl | F | $CH_2CH_2CH_2CH_2OC(=O)CF_3$ | O |
| A-0331 | $CH_2CF_3$ | H | Cl | F | $CH_2CH_2CH_2CH_2CH_2OC(=O)Ph(4-CF_3)$ | O |
| A-0332 | $CH_2CF_3$ | H | Cl | F | $CH_2CH_2OC(=O)Ph$ | O |
| A-0333 | $CH_2CF_3$ | H | Cl | F | $CH_2CH_2OC(=O)Ph(4-CF_3)$ | O |
| A-0334 | $CH_2CF_3$ | H | Cl | F | $CH_2CH_2CH_2OC(=O)Ph(4-CF_3)$ | O |
| A-0335 | $CH_2CF_3$ | H | Cl | F | $CH_2CH_2CH_2CH_2OC(=O)Ph(4-CF_3)$ | O |
| A-0336 | $CH_2CF_3$ | H | Cl | F | $CH_2CH_2CH_2CH_2CH_2OC(=O)Ph(4-CF_3)$ | O |
| A-0337 | $CH_2CF_3$ | H | Cl | F | $CH_2CH_2OS(=O)Me$ | O |
| A-0338 | $CH_2CF_3$ | H | Cl | F | $CH_2CH_2CH_2OS(=O)Me$ | O |
| A-0339 | $CH_2CF_3$ | H | Cl | F | $CH_2CH_2CH_2CH_2OS(=O)Me$ | O |
| A-0340 | $CH_2CF_3$ | H | Cl | F | $CH_2CH_2CH_2CH_2CH_2OS(=O)Me$ | O |
| A-0341 | $CH_2CF_3$ | H | Cl | F | $CH_2CH_2CH_2CH_2CH_2CH_2OS(=O)Me$ | O |
| A-0342 | $CH_2CF_3$ | H | Cl | F | $CH_2CH_2OS(=O)CF_3$ | O |
| A-0343 | $CH_2CF_3$ | H | Cl | F | $CH_2CH_2CH_2OS(=O)CF_3$ | O |
| A-0344 | $CH_2CF_3$ | H | Cl | F | $CH_2CH_2CH_2CH_2OS(=O)CF_3$ | O |
| A-0345 | $CH_2CF_3$ | H | Cl | F | $CH_2CH_2CH_2CH_2CH_2OS(=O)CF_3$ | O |
| A-0346 | $CH_2CF_3$ | H | Cl | F | $CH_2CH_2CH_2CH_2CH_2CH_2OS(=O)CF_3$ | O |

TABLE 9

| Compound Number | $R^1$ | $R^2$ | $R^3$ | $R^4$ | $R^5$ | A |
|---|---|---|---|---|---|---|
| A-0347 | $CH_2CF_3$ | H | Cl | F | $CH_2CH_2OS(=O)Ph$ | O |
| A-0348 | $CH_2CF_3$ | H | Cl | F | $CH_2CH_2OS(=O)Ph(4-Me)$ | O |
| A-0349 | $CH_2CF_3$ | H | Cl | F | $CH_2CH_2CH_2OS(=O)Ph$ | O |
| A-0350 | $CH_2CF_3$ | H | Cl | F | $CH_2CH_2CH_2OS(=O)Ph(4-Me)$ | O |
| A-0351 | $CH_2CF_3$ | H | Cl | F | $CH_2CH_2OS(=O)_2Me$ | O |
| A-0352 | $CH_2CF_3$ | H | Cl | F | $CH_2CH_2CH_2OS(=O)_2Me$ | O |
| A-0353 | $CH_2CF_3$ | H | Cl | F | $CH_2CH_2CH_2OS(=O)_2CF_3$ | O |
| A-0354 | $CH_2CF_3$ | H | Cl | F | $CH_2CH_2CH_2CH_2OS(=O)_2CF_3$ | O |
| A-0355 | $CH_2CF_3$ | H | Cl | F | $CH_2CH_2CH_2CH_2CH_2OS(=O)_2CF_3$ | O |
| A-0356 | $CH_2CF_3$ | H | Cl | F | $CH_2CH_2CH_2CH_2CH_2OS(=O)_2CF_2CF_2CF_2CF_3$ | O |
| A-0357 | $CH_2CF_3$ | H | Cl | F | $CH_2CH_2OS(=O)_2Ph$ | O |
| A-0358 | $CH_2CF_3$ | H | Cl | F | $CH_2CH_2OS(=O)_2Ph(4-Me)$ | O |
| A-0359 | $CH_2CF_3$ | H | Cl | F | $CH_2CH_2CH_2OS(=O)_2Ph$ | O |
| A-0360 | $CH_2CF_3$ | H | Cl | F | $CH_2CH_2CH_2OS(=O)_2Ph(4-Me)$ | O |
| A-0361 | $CH_2CF_3$ | H | Cl | F | $CH_2CH_2NH_2$ | O |
| A-0362 | $CH_2CF_3$ | H | Cl | F | $CH_2CH_2CH_2NH_2$ | O |
| A-0363 | $CH_2CF_3$ | H | Cl | F | $CH_2CH_2CH_2CH_2NH_2$ | O |
| A-0364 | $CH_2CF_3$ | H | Cl | F | $CH_2CH_2CH_2CH_2CH_2NH_2$ | O |
| A-0365 | $CH_2CF_3$ | H | Cl | F | $CH_2CH_2CH_2CH_2CH_2CH_2NH_2$ | O |
| A-0366 | $CH_2CF_3$ | H | Cl | F | $CH_2CH_2CH_2CH_2CH_2CH_2CH_2NH_2$ | O |
| A-0367 | $CH_2CF_3$ | H | Cl | F | $CH_2CH(Me)NH_2$ | O |
| A-0368 | $CH_2CF_3$ | H | Cl | F | $CH_2C*H(Me)NH_2$:(R) | O |
| A-0369 | $CH_2CF_3$ | H | Cl | F | $CH_2C*H(Me)NH_2$:(S) | O |
| A-0370 | $CH_2CF_3$ | H | Cl | F | $CH_2CH(Et)NH_2$ | O |
| A-0371 | $CH_2CF_3$ | H | Cl | F | $CH_2CH(i-Pr)NH_2$ | O |
| A-0372 | $CH_2CF_3$ | H | Cl | F | $CH(Me)CH_2NH_2$ | O |
| A-0373 | $CH_2CF_3$ | H | Cl | F | $CH(Et)CH_2NH_2$ | O |
| A-0374 | $CH_2CF_3$ | H | Cl | F | $CH(i-Pr)CH_2NH_2$ | O |
| A-0375 | $CH_2CF_3$ | H | Cl | F | $CH_2CH_2CH(Me)NH_2$ | O |
| A-0376 | $CH_2CF_3$ | H | Cl | F | $CH_2CH(Me)CH_2NH_2$ | O |
| A-0377 | $CH_2CF_3$ | H | Cl | F | $CH(Me)CH_2CH_2NH_2$ | O |
| A-0378 | $CH_2CF_3$ | H | Cl | F | $CH_2CH(Me)NH(c-Pr)$ | O |
| A-0379 | $CH_2CF_3$ | H | Cl | F | $CH_2CH(Me)NHOMe$ | O |
| A-0380 | $CH_2CF_3$ | H | Cl | F | $CH_2CH(Me)N(OMe)S(=O)_2Ph(2-NO_2)$ | O |
| A-0381 | $CH_2CF_3$ | H | Cl | F | $CH_2CH(Me)N(OMe)S(=O)_2Ph(4-NO_2)$ | O |
| A-0382 | $CH_2CF_3$ | H | Cl | F | $CH_2CH_2N(Me)(t-Bu)$ | O |
| A-0383 | $CH_2CF_3$ | H | Cl | F | $CH_2CH_2CH_2N(Me)(t-Bu)$ | O |
| A-0384 | $CH_2CF_3$ | H | Cl | F | $CH_2CH_2CH_2CH_2N(Me)(t-Bu)$ | O |
| A-0385 | $CH_2CF_3$ | H | Cl | F | $CH_2CH_2NHCH_2CF_3$ | O |
| A-0386 | $CH_2CF_3$ | H | Cl | F | $CH_2CH_2CH_2NHCH_2CF_3$ | O |
| A-0387 | $CH_2CF_3$ | H | Cl | F | $CH_2CH_2CH_2CH_2NHCH_2CF_3$ | O |
| A-0388 | $CH_2CF_3$ | H | Cl | F | $CH_2CH_2NHC(=O)C(Me)(CF_3)_2$ | O |
| A-0389 | $CH_2CF_3$ | H | Cl | F | $CH_2CH_2NHC(=O)Me$ | O |
| A-0390 | $CH_2CF_3$ | H | Cl | F | $CH_2CH_2NHC(=O)(t-Bu)$ | O |

TABLE 10

| Compound Number | $R^1$ | $R^2$ | $R^3$ | $R^4$ | $R^5$ | A |
|---|---|---|---|---|---|---|
| A-0391 | $CH_2CF_3$ | H | Cl | F | $CH_2CH_2CH_2CH_2NHC(=O)CH(CH_3)_2$ | O |
| A-0392 | $CH_2CF_3$ | H | Cl | F | $CH_2CH_2CH_2CH_2NHC(=O)(t-Bu)$ | O |
| A-0393 | $CH_2CF_3$ | H | Cl | F | $CH_2CH_2CH_2CH_2NHC(=O)CH_2(t-Bu)$ | O |
| A-0394 | $CH_2CF_3$ | H | Cl | F | $CH_2CH_2NHC(=O)CF_3$ | O |
| A-0395 | $CH_2CF_3$ | H | Cl | F | $CH_2CH_2NHC(=O)CH_2CF_3$ | O |
| A-0396 | $CH_2CF_3$ | H | Cl | F | $CH_2CH_2NHC(=O)CF_2CF_3$ | O |
| A-0397 | $CH_2CF_3$ | H | Cl | F | $CH_2CH_2CH_2NHC(=O)CF_3$ | O |
| A-0398 | $CH_2CF_3$ | H | Cl | F | $CH_2CH_2CH_2NHC(=O)CH_2CF_3$ | O |
| A-0399 | $CH_2CF_3$ | H | Cl | F | $CH_2CH_2CH_2NHC(=O)CF_2CF_3$ | O |
| A-0400 | $CH_2CF_3$ | H | Cl | F | $CH_2CH_2CH_2CH_2NHC(=O)CF_3$ | O |
| A-0401 | $CH_2CF_3$ | H | Cl | F | $CH_2CH_2CH_2CH_2NHC(=O)CH_2CF_3$ | O |
| A-0402 | $CH_2CF_3$ | H | Cl | F | $CH_2CH_2CH_2CH_2NHC(=O)CF_2CF_3$ | O |
| A-0403 | $CH_2CF_3$ | H | Cl | F | $CH_2CH_2CH_2CH_2NHC(=O)CF(CF_3)_2$ | O |
| A-0404 | $CH_2CF_3$ | H | Cl | F | $CH_2CH_2CH_2CH_2NHC(=O)CCl_3$ | O |
| A-0405 | $CH_2CF_3$ | H | Cl | F | $CH_2CH(Me)NHC(=O)CF_3$ | O |
| A-0406 | $CH_2CF_3$ | H | Cl | F | $CH_2CH_2NHC(=O)Ph$ | O |
| A-0407 | $CH_2CF_3$ | H | Cl | F | $CH_2CH_2NHC(=O)Ph(4-CF_3)$ | O |
| A-0408 | $CH_2CF_3$ | H | Cl | F | $CH_2CH_2CH_2NHC(=O)Ph(4-CF_3)$ | O |
| A-0409 | $CH_2CF_3$ | H | Cl | F | $CH_2CH_2CH_2CH_2NHC(=O)Ph(4-CF_3)$ | O |
| A-0410 | $CH_2CF_3$ | H | Cl | F | $CH_2CH_2NHC(=O)O(t-Bu)$ | O |
| A-0411 | $CH_2CF_3$ | H | Cl | F | $CH_2CH_2CH_2NHC(=O)O(t-Bu)$ | O |
| A-0412 | $CH_2CF_3$ | H | Cl | F | $CH_2CH_2CH_2CH_2NHC(=O)O(t-Bu)$ | O |
| A-0413 | $CH_2CF_3$ | H | Cl | F | $CH_2CH_2CH_2CH_2NHC(=O)OCH(CH_3)_2$ | O |

TABLE 10-continued

| Compound Number | $R^1$ | $R^2$ | $R^3$ | $R^4$ | $R^5$ | A |
|---|---|---|---|---|---|---|
| A-0414 | $CH_2CF_3$ | H | Cl | F | $CH_2CH(Me)NHC(=O)O(t-Bu)$ | O |
| A-0415 | $CH_2CF_3$ | H | Cl | F | $CH_2C^*H(Me)NHC(=O)O(t-Bu)$:(R) | O |
| A-0416 | $CH_2CF_3$ | H | Cl | F | $CH_2C^*H(Me)NHC(=O)O(t-Bu)$:(S) | O |
| A-0417 | $CH_2CF_3$ | H | Cl | F | $CH_2CH(Et)NHC(=O)O(t-Bu)$ | O |
| A-0418 | $CH_2CF_3$ | H | Cl | F | $CH_2CH(i-Pr)NHC(=O)O(t-Bu)$ | O |
| A-0419 | $CH_2CF_3$ | H | Cl | F | $CH(Me)CH_2NHC(=O)O(t-Bu)$ | O |
| A-0420 | $CH_2CF_3$ | H | Cl | F | $CH(Et)CH_2NHC(=O)O(t-Bu)$ | O |
| A-0421 | $CH_2CF_3$ | H | Cl | F | $CH(i-Pr)CH_2NHC(=O)O(t-Bu)$ | O |
| A-0422 | $CH_2CF_3$ | H | Cl | F | $CH_2CH(Me)CH_2NHC(=O)O(t-Bu)$ | O |
| A-0423 | $CH_2CF_3$ | H | Cl | F | $CH_2CH_2NHC(=O)OC(Me)_2CF_3$ | O |
| A-0424 | $CH_2CF_3$ | H | Cl | F | $CH_2CH_2CH_2NHC(=O)OCH_2CF_3$ | O |
| A-0425 | $CH_2CF_3$ | H | Cl | F | $CH_2CH_2CH_2NHC(=O)OCH_2CH_2CF_3$ | O |
| A-0426 | $CH_2CF_3$ | H | Cl | F | $CH_2CH_2CH_2CH_2NHC(=O)OCH_2CCl_3$ | O |
| A-0427 | $CH_2CF_3$ | H | Cl | F | $CH_2CH_2CH_2CH_2NHC(=O)OCH_2CF_3$ | O |
| A-0428 | $CH_2CF_3$ | H | Cl | F | $CH_2CH_2NHC(=O)NH(t-Bu)$ | O |
| A-0429 | $CH_2CF_3$ | H | Cl | F | $CH_2CH_2CH_2NHC(=O)NH(t-Bu)$ | O |
| A-0430 | $CH_2CF_3$ | H | Cl | F | $CH_2CH_2CH_2CH_2NHC(=O)NHEt$ | O |
| A-0431 | $CH_2CF_3$ | H | Cl | F | $CH_2CH_2CH_2CH_2NHC(=O)NH(t-Bu)$ | O |
| A-0432 | $CH_2CF_3$ | H | Cl | F | $CH_2CH_2CH_2NHC(=O)NHCH_2CCl_3$ | O |
| A-0433 | $CH_2CF_3$ | H | Cl | F | $CH_2CH_2CH_2NHC(=O)NHCH_2CH_2F$ | O |
| A-0434 | $CH_2CF_3$ | H | Cl | F | $CH_2CH_2CH_2NHC(=O)NHCH_2CF_3$ | O |

TABLE 11

| Compound Number | $R^1$ | $R^2$ | $R^3$ | $R^4$ | $R^5$ | A |
|---|---|---|---|---|---|---|
| A-0435 | $CH_2CF_3$ | H | Cl | F | $CH_2CH_2CH_2CH_2NHC(=O)NHCH_2CCl_3$ | O |
| A-0436 | $CH_2CF_3$ | H | Cl | F | $CH_2CH_2CH_2CH_2NHC(=O)NHCH_2CH_2F$ | O |
| A-0437 | $CH_2CF_3$ | H | Cl | F | $CH_2CH_2CH_2CH_2NHC(=O)NHCH_2CF_3$ | O |
| A-0438 | $CH_2CF_3$ | H | Cl | F | $CH_2CH_2NHS(=O)Me$ | O |
| A-0439 | $CH_2CF_3$ | H | Cl | F | $CH_2CH_2CH_2NHS(=O)Me$ | O |
| A-0440 | $CH_2CF_3$ | H | Cl | F | $CH_2CH_2CH_2CH_2NHS(=O)Me$ | O |
| A-0441 | $CH_2CF_3$ | H | Cl | F | $CH_2CH_2CH_2CH_2NHS(=O)CH(CH_3)_2$ | O |
| A-0442 | $CH_2CF_3$ | H | Cl | F | $CH_2CH_2CH_2CH_2CH_2NHS(=O)Me$ | O |
| A-0443 | $CH_2CF_3$ | H | Cl | F | $CH_2CH_2NHS(=O)CHF_2$ | O |
| A-0444 | $CH_2CF_3$ | H | Cl | F | $CH_2CH_2CH_2NHS(=O)CHF_2$ | O |
| A-0445 | $CH_2CF_3$ | H | Cl | F | $CH_2CH_2CH_2CH_2NHS(=O)CHF_2$ | O |
| A-0446 | $CH_2CF_3$ | H | Cl | F | $CH_2CH_2CH_2CH_2CH_2NHS(=O)CHF_2$ | O |
| A-0447 | $CH_2CF_3$ | H | Cl | F | $CH_2CH(Me)NHS(=O)CHF_2$ | O |
| A-0448 | $CH_2CF_3$ | H | Cl | F | $CH(Me)CH_2NHS(=O)CHF_2$ | O |
| A-0449 | $CH_2CF_3$ | H | Cl | F | $CH_2CH_2CH(Me)NHS(=O)CHF_2$ | O |
| A-0450 | $CH_2CF_3$ | H | Cl | F | $CH_2CH(Me)CH_2NHS(=O)CHF_2$ | O |
| A-0451 | $CH_2CF_3$ | H | Cl | F | $CH(Me)CH_2CH_2NHS(=O)CHF_2$ | O |
| A-0452 | $CH_2CF_3$ | H | Cl | F | $CH_2CH_2NHS(=O)CF_3$ | O |
| A-0453 | $CH_2CF_3$ | H | Cl | F | $CH_2CH_2CH_2NHS(=O)CF_3$ | O |
| A-0454 | $CH_2CF_3$ | H | Cl | F | $CH_2CH_2CH_2CH_2NHS(=O)CF_3$ | O |
| A-0455 | $CH_2CF_3$ | H | Cl | F | $CH_2CH_2CH_2CH_2CH_2NHS(=O)CF_3$ | O |
| A-0456 | $CH_2CF_3$ | H | Cl | F | $CH_2CH_2CH_2NHS(=O)Ph$ | O |
| A-0457 | $CH_2CF_3$ | H | Cl | F | $CH_2CH_2CH_2CH_2NHS(=O)Ph$ | O |
| A-0458 | $CH_2CF_3$ | H | Cl | F | $CH_2CH_2CH_2CH_2CH_2NHS(=O)Ph$ | O |
| A-0459 | $CH_2CF_3$ | H | Cl | F | $CH_2CH_2CH_2CH_2CH_2NHS(=O)Ph(4-CF_3)$ | O |
| A-0460 | $CH_2CF_3$ | H | Cl | F | $CH_2CH(Me)NHS(=O)Ph(4-CF_3)$ | O |
| A-0461 | $CH_2CF_3$ | H | Cl | F | $CH_2CH(Et)NHS(=O)Ph(4-CF_3)$ | O |
| A-0462 | $CH_2CF_3$ | H | Cl | F | $CH(Me)CH_2NHS(=O)Ph(4-CF_3)$ | O |
| A-0463 | $CH_2CF_3$ | H | Cl | F | $CH(Et)CH_2NHS(=O)Ph(4-CF_3)$ | O |
| A-0464 | $CH_2CF_3$ | H | Cl | F | $CH_2CH(Et)CH_2NHS(=O)Ph(4-CF_3)$ | O |
| A-0465 | $CH_2CF_3$ | H | Cl | F | $CH_2CH_2NHS(=O)_2Me$ | O |
| A-0466 | $CH_2CF_3$ | H | Cl | F | $CH_2CH_2CH_2NHS(=O)_2Me$ | O |
| A-0467 | $CH_2CF_3$ | H | Cl | F | $CH_2CH_2CH_2CH_2NHS(=O)_2Me$ | O |
| A-0468 | $CH_2CF_3$ | H | Cl | F | $CH_2CH_2CH_2CH_2NHS(=O)_2CH(CH_3)_2$ | O |
| A-0469 | $CH_2CF_3$ | H | Cl | F | $CH_2CH_2CH_2CH_2CH_2NHS(=O)_2Me$ | O |
| A-0470 | $CH_2CF_3$ | H | Cl | F | $CH_2CH_2NHS(=O)_2CHF_2$ | O |
| A-0471 | $CH_2CF_3$ | H | Cl | F | $CH_2CH_2CH_2NHS(=O)_2CHF_2$ | O |
| A-0472 | $CH_2CF_3$ | H | Cl | F | $CH_2CH_2CH_2CH_2NHS(=O)_2CHF_2$ | O |
| A-0473 | $CH_2CF_3$ | H | Cl | F | $CH_2CH_2CH_2CH_2CH_2NHS(=O)_2CHF_2$ | O |
| A-0474 | $CH_2CF_3$ | H | Cl | F | $CH_2CH(Me)NHS(=O)_2CHF_2$ | O |
| A-0475 | $CH_2CF_3$ | H | Cl | F | $CH(Me)CH_2NHS(=O)_2CHF_2$ | O |
| A-0476 | $CH_2CF_3$ | H | Cl | F | $CH_2CH_2CH(Me)NHS(=O)_2CHF_2$ | O |
| A-0477 | $CH_2CF_3$ | H | Cl | F | $CH_2CH(Me)CH_2NHS(=O)_2CHF_2$ | O |
| A-0478 | $CH_2CF_3$ | H | Cl | F | $CH(Me)CH_2CH_2NHS(=O)_2CHF_2$ | O |

TABLE 12

| Compound Number | $R^1$ | $R^2$ | $R^3$ | $R^4$ | $R^5$ | A |
|---|---|---|---|---|---|---|
| A-0479 | $CH_2CF_3$ | H | Cl | F | $CH_2CH(Me)N(Me)S({=}O)_2CHF_2$ | O |
| A-0480 | $CH_2CF_3$ | H | Cl | F | $CH(Me)CH_2N(Me)S({=}O)_2CHF_2$ | O |
| A-0481 | $CH_2CF_3$ | H | Cl | F | $CH_2CH_2CH(Me)N(Me)S({=}O)_2CHF_2$ | O |
| A-0482 | $CH_2CF_3$ | H | Cl | F | $CH_2CH(Me)CH_2N(Me)S({=}O)_2CHF_2$ | O |
| A-0483 | $CH_2CF_3$ | H | Cl | F | $CH(Me)CH_2CH_2N(Me)S({=}O)_2CHF_2$ | O |
| A-0484 | $CH_2CF_3$ | H | Cl | F | $CH_2CH_2CH_2NHS({=}O)_2Ph$ | O |
| A-0485 | $CH_2CF_3$ | H | Cl | F | $CH_2CH_2CH_2CH_2NHS({=}O)_2Ph$ | O |
| A-0486 | $CH_2CF_3$ | H | Cl | F | $CH_2CH_2CH_2CH_2CH_2NHS({=}O)_2Ph$ | O |
| A-0487 | $CH_2CF_3$ | H | Cl | F | $CH_2CH_2CH_2CH_2CH_2NHS({=}O)_2Ph(4\text{-}CF_3)$ | O |
| A-0488 | $CH_2CF_3$ | H | Cl | F | $CH_2CH(Me)NHS({=}O)_2Ph(4\text{-}CF_3)$ | O |
| A-0489 | $CH_2CF_3$ | H | Cl | F | $CH_2CH(Et)NHS({=}O)_2Ph(4\text{-}CF_3)$ | O |
| A-0490 | $CH_2CF_3$ | H | Cl | F | $CH(Me)CH_2NHS({=}O)_2Ph(4\text{-}CF_3)$ | O |
| A-0491 | $CH_2CF_3$ | H | Cl | F | $CH(Et)CH_2NHS({=}O)_2Ph(4\text{-}CF_3)$ | O |
| A-0492 | $CH_2CF_3$ | H | Cl | F | $CH_2CH(Me)CH_2NHS({=}O)_2Ph(4\text{-}CF_3)$ | O |
| A-0493 | $CH_2CF_3$ | H | Cl | F | $CH_2CH_2SiMe_3$ | O |
| A-0494 | $CH_2CF_3$ | H | Cl | F | $CH_2CH_2CH_2SiMe_3$ | O |
| A-0495 | $CH_2CF_3$ | H | Cl | F | $CH_2CH_2CH_2CH_2SiMe_3$ | O |
| A-0496 | $CH_2CF_3$ | H | Cl | F | $CH_2Ph$ | O |
| A-0497 | $CH_2CF_3$ | H | Cl | F | $CH_2Ph(2\text{-}CF_3)$ | O |
| A-0498 | $CH_2CF_3$ | H | Cl | F | $CH_2Ph(3\text{-}CF_3)$ | O |
| A-0499 | $CH_2CF_3$ | H | Cl | F | $CH_2Ph(4\text{-}CF_3)$ | O |
| A-0500 | $CH_2CF_3$ | H | Cl | F | $CH_2Ph(2\text{-}OCF_3)$ | O |
| A-0501 | $CH_2CF_3$ | H | Cl | F | $CH_2Ph(3\text{-}OCF_3)$ | O |
| A-0502 | $CH_2CF_3$ | H | Cl | F | $CH_2Ph(4\text{-}OCF_3)$ | O |
| A-0503 | $CH_2CF_3$ | H | Cl | F | $CH_2Ph(2\text{-}SCF_3)$ | O |
| A-0504 | $CH_2CF_3$ | H | Cl | F | $CH_2Ph(3\text{-}SCF_3)$ | O |
| A-0505 | $CH_2CF_3$ | H | Cl | F | $CH_2Ph(4\text{-}SCF_3)$ | O |
| A-0506 | $CH_2CF_3$ | H | Cl | F | $CH_2Ph(3\text{-}CH_2SCF_3)$ | O |
| A-0507 | $CH_2CF_3$ | H | Cl | F | $CH_2Ph(4\text{-}F)$ | O |
| A-0508 | $CH_2CF_3$ | H | Cl | F | $CH_2Ph(4\text{-}Cl)$ | O |
| A-0509 | $CH_2CF_3$ | H | Cl | F | $CH_2Ph(4\text{-}Br)$ | O |
| A-0510 | $CH_2CF_3$ | H | Cl | F | $CH_2Ph(4\text{-}Me)$ | O |
| A-0511 | $CH_2CF_3$ | H | Cl | F | $CH_2Ph[4\text{-}(t\text{-}Bu)]$ | O |
| A-0512 | $CH_2CF_3$ | H | Cl | F | $CH_2Ph(4\text{-}CN)$ | O |
| A-0513 | $CH_2CF_3$ | H | Cl | F | $CH_2Ph(4\text{-}NO_2)$ | O |
| A-0514 | $CH_2CF_3$ | H | Cl | F | $CH_2Ph(4\text{-}OCHF_2)$ | O |
| A-0515 | $CH_2CF_3$ | H | Cl | F | $CH_2Ph(4\text{-}SCHF_2)$ | O |
| A-0516 | $CH_2CF_3$ | H | Cl | F | $CH_2Ph(4\text{-}CH_2SCF_3)$ | O |
| A-0517 | $CH_2CF_3$ | H | Cl | F | $CH_2Ph[4\text{-}CF(CF_3)_2]$ | O |
| A-0518 | $CH_2CF_3$ | H | Cl | F | $CH_2Ph(4\text{-}CH_2SCF_3)$ | O |
| A-0519 | $CH_2CF_3$ | H | Cl | F | $CH_2Ph[4\text{-}Ph(4\text{-}CF_3)]$ | O |
| A-0520 | $CH_2CF_3$ | H | Cl | F | $CH_2Ph(2,4\text{-}Cl_2)$ | O |
| A-0521 | $CH_2CF_3$ | H | Cl | F | $CH_2Ph[2,5\text{-}(CF_3)_2]$ | O |
| A-0522 | $CH_2CF_3$ | H | Cl | F | $CH_2Ph(3,4\text{-}Cl_2)$ | O |

TABLE 13

| Compound Number | $R^1$ | $R^2$ | $R^3$ | $R^4$ | $R^5$ | A |
|---|---|---|---|---|---|---|
| A-0523 | $CH_2CF_3$ | H | Cl | F | $CH_2Ph(3\text{-}CF_3\text{-}4\text{-}F)$ | O |
| A-0524 | $CH_2CF_3$ | H | Cl | F | $CH_2Ph(3\text{-}CF_3\text{-}4\text{-}Cl)$ | O |
| A-0525 | $CH_2CF_3$ | H | Cl | F | $CH_2Ph(3\text{-}F\text{-}4\text{-}CF_3)$ | O |
| A-0526 | $CH_2CF_3$ | H | Cl | F | $CH_2Ph(2,4,6\text{-}F_3)$ | O |
| A-0527 | $CH_2CF_3$ | H | Cl | F | $CH_2Ph(3,4,5\text{-}F_3)$ | O |
| A-0528 | $CH_2CF_3$ | H | Cl | F | $CH_2Ph(2,3,4\text{-}F_3)$ | O |
| A-0529 | $CH_2CF_3$ | H | Cl | F | $CH_2Ph(3,4,5\text{-}Cl_3)$ | O |
| A-0530 | $CH_2CF_3$ | H | Cl | F | $CH_2CH_2Ph$ | O |
| A-0531 | $CH_2CF_3$ | H | Cl | F | $CH_2CH_2Ph(4\text{-}F)$ | O |
| A-0532 | $CH_2CF_3$ | H | Cl | F | $CH_2CH_2Ph(4\text{-}Cl)$ | O |
| A-0533 | $CH_2CF_3$ | H | Cl | F | $CH_2CH_2Ph(4\text{-}Br)$ | O |
| A-0534 | $CH_2CF_3$ | H | Cl | F | $CH_2CH_2Ph[4\text{-}(t\text{-}Bu)]$ | O |
| A-0535 | $CH_2CF_3$ | H | Cl | F | $CH_2CH_2Ph(2\text{-}CF_3)$ | O |
| A-0536 | $CH_2CF_3$ | H | Cl | F | $CH_2CH_2Ph(3\text{-}CF_3)$ | O |
| A-0537 | $CH_2CF_3$ | H | Cl | H | $CH_2CH_2Ph(4\text{-}CF_3)$ | O |
| A-0538 | $CH_2CF_3$ | H | Cl | F | $CH_2CH_2Ph(4\text{-}CF_3)$ | O |
| A-0539 | $CH_2CF_3$ | H | Cl | F | $CH_2CH_2Ph(4\text{-}CF(CF_3)_2)$ | O |
| A-0540 | $CH_2CF_3$ | H | Cl | F | $CH_2CH_2Ph[4\text{-}(c\text{-}Pr)]$ | O |
| A-0541 | $CH_2CF_3$ | H | Cl | F | $CH_2CH_2Ph\{4\text{-}[c\text{-}Pr(2,2\text{-}F_2)]\}$ | O |
| A-0542 | $CH_2CF_3$ | H | Cl | F | $CH_2CH_2Ph(4\text{-}OMe)$ | O |
| A-0543 | $CH_2CF_3$ | H | Cl | F | $CH_2CH_2Ph(3\text{-}OCF_3)$ | O |
| A-0544 | $CH_2CF_3$ | H | Cl | F | $CH_2CH_2Ph(4\text{-}OCHF_2)$ | O |
| A-0545 | $CH_2CF_3$ | H | Cl | F | $CH_2CH_2Ph(4\text{-}OCF_3)$ | O |

TABLE 13-continued

| Compound Number | $R^1$ | $R^2$ | $R^3$ | $R^4$ | $R^5$ | A |
|---|---|---|---|---|---|---|
| A-0546 | $CH_2CF_3$ | H | Cl | F | $CH_2CH_2Ph(4\text{-}SMe)$ | O |
| A-0547 | $CH_2CF_3$ | H | Cl | F | $CH_2CH_2Ph(4\text{-}SCHF_2)$ | O |
| A-0548 | $CH_2CF_3$ | H | Cl | F | $CH_2CH_2Ph(4\text{-}SCF_3)$ | O |
| A-0549 | $CH_2CF_3$ | H | Cl | F | $CH_2CH_2Ph[4\text{-}S({=}O)Me]$ | O |
| A-0550 | $CH_2CF_3$ | H | Cl | F | $CH_2CH_2Ph[4\text{-}S({=}O)CF_3]$ | O |
| A-0551 | $CH_2CF_3$ | H | Cl | F | $CH_2CH_2Ph[4\text{-}S({=}O)_2Me]$ | O |
| A-0552 | $CH_2CF_3$ | H | Cl | F | $CH_2CH_2Ph[4\text{-}S({=}O)_2CF_3]$ | O |
| A-0553 | $CH_2CF_3$ | H | Cl | F | $CH_2CH_2Ph(4\text{-}CH_2SMe)$ | O |
| A-0554 | $CH_2CF_3$ | H | Cl | F | $CH_2CH_2Ph(4\text{-}CH_2SCF_3)$ | O |
| A-0555 | $CH_2CF_3$ | H | Cl | F | $CH_2CH_2Ph[4\text{-}OS({=}O)_2Me]$ | O |
| A-0556 | $CH_2CF_3$ | H | Cl | F | $CH_2CH_2Ph[4\text{-}OS({=}O)_2CF_3]$ | O |
| A-0557 | $CH_2CF_3$ | H | Cl | F | $CH_2CH_2Ph[4\text{-}Ph(4\text{-}CF_3)]$ | O |
| A-0558 | $CH_2CF_3$ | H | Cl | F | $CH_2CH_2Ph(4\text{-}CH_2Ph)$ | O |
| A-0559 | $CH_2CF_3$ | H | Cl | F | $CH_2CH_2Ph(4\text{-}OCH_2Ph)$ | O |
| A-0560 | $CH_2CF_3$ | H | Cl | F | $CH_2CH_2Ph(4\text{-}CN)$ | O |
| A-0561 | $CH_2CF_3$ | H | Cl | F | $CH_2CH_2Ph(4\text{-}NO_2)$ | O |
| A-0562 | $CH_2CF_3$ | H | Cl | F | $CH_2CH_2Ph(2,4\text{-}Cl_2)$ | O |
| A-0563 | $CH_2CF_3$ | H | Cl | F | $CH_2CH_2Ph(3,4\text{-}Cl_2)$ | O |
| A-0564 | $CH_2CF_3$ | H | Cl | F | $CH_2CH_2Ph(3\text{-}CF_3\text{-}4\text{-}F)$ | O |
| A-0565 | $CH_2CF_3$ | H | Cl | F | $CH_2CH_2Ph(2\text{-}CF_3\text{-}4\text{-}F)$ | O |
| A-0566 | $CH_2CF_3$ | H | Cl | F | $CH_2CH_2Ph(3\text{-}F\text{-}4\text{-}CF_3)$ | O |

TABLE 14

| Compound Number | $R^1$ | $R^2$ | $R^3$ | $R^4$ | $R^5$ | A |
|---|---|---|---|---|---|---|
| A-0567 | $CH_2CF_3$ | H | Cl | F | $CH_2CH_2Ph(2\text{-}F\text{-}4\text{-}CF_3)$ | O |
| A-0568 | $CH_2CF_3$ | H | Cl | F | $CH_2CH_2Ph(3\text{-}Cl\text{-}4\text{-}OCHF_2)$ | O |
| A-0569 | $CH_2CF_3$ | H | Cl | F | $CH_2CH_2Ph(3,4,5\text{-}Cl_3)$ | O |
| A-0570 | $CH_2CF_3$ | H | Cl | F | $CH_2CH_2Ph(2,3,4\text{-}F_3)$ | O |
| A-0571 | $CH_2CF_3$ | H | Cl | F | $CH_2CH_2Ph(2,4,5\text{-}F_3)$ | O |
| A-0572 | $CH_2CF_3$ | H | Cl | F | $CH_2CH_2Ph(3,4,5\text{-}F_3)$ | O |
| A-0573 | $CH_2CF_3$ | H | Cl | F | $CH_2CH_2Ph(2,4,6\text{-}F_3)$ | O |
| A-0574 | $CH_2CF_3$ | H | Cl | F | $CH_2CH_2CH_2Ph$ | O |
| A-0575 | $CH_2CF_3$ | H | Cl | F | $CH_2CH_2CH_2Ph(3\text{-}CF_3)$ | O |
| A-0576 | $CH_2CF_3$ | H | Cl | F | $CH_2CH_2CH_2Ph(4\text{-}CF_3)$ | O |
| A-0577 | $CH_2CF_3$ | H | Cl | F | $CH_2CH_2CH_2Ph(4\text{-}F)$ | O |
| A-0578 | $CH_2CF_3$ | H | Cl | F | $CH_2CH_2CH_2Ph[4\text{-}(t\text{-}Bu)]$ | O |
| A-0579 | $CH_2CF_3$ | H | Cl | F | $CH_2CH_2CH_2Ph(4\text{-}CN)$ | O |
| A-0580 | $CH_2CF_3$ | H | Cl | F | $CH_2CH_2CH_2Ph(4\text{-}CF_3)$ | O |
| A-0581 | $CH_2CF_3$ | H | Cl | F | $CH_2CH_2CH_2Ph(4\text{-}OCHF_2)$ | O |
| A-0582 | $CH_2CF_3$ | H | Cl | F | $CH_2CH_2CH_2Ph(4\text{-}OCF_3)$ | O |
| A-0583 | $CH_2CF_3$ | H | Cl | F | $CH_2CH_2CH_2Ph(4\text{-}SCHF_2)$ | O |
| A-0584 | $CH_2CF_3$ | H | Cl | F | $CH_2CH_2CH_2Ph(4\text{-}SCF_3)$ | O |
| A-0585 | $CH_2CF_3$ | H | Cl | F | $CH_2CH_2CH_2Ph[4\text{-}CF(CF_3)_2]$ | O |
| A-0586 | $CH_2CF_3$ | H | Cl | F | $CH_2CH_2CH_2Ph(3,4,5\text{-}F_3)$ | O |
| A-0587 | $CH_2CF_3$ | H | Cl | F | $CH_2CH_2CH_2Ph(2,4,6\text{-}F_3)$ | O |
| A-0588 | $CH_2CF_3$ | H | Cl | F | $CH_2CH_2CH_2CH_2Ph$ | O |
| A-0589 | $CH_2CF_3$ | H | Cl | F | $CH_2CH_2CH_2CH_2Ph(4\text{-}F)$ | O |
| A-0590 | $CH_2CF_3$ | H | Cl | F | $CH_2CH_2CH_2CH_2Ph(4\text{-}CF_3)$ | O |
| A-0591 | $CH_2CF_3$ | H | Cl | F | $CH_2CH_2CH_2CH_2Ph(4\text{-}OCF_3)$ | O |
| A-0592 | $CH_2CF_3$ | H | Cl | F | $CH_2CH_2CH_2CH_2Ph(4\text{-}SCF_3)$ | O |
| A-0593 | $CH_2CF_3$ | H | Cl | F | $CH_2CH_2CH_2CH_2CH_2Ph$ | O |
| A-0594 | $CH_2CF_3$ | H | Cl | F | $CH_2CH_2CH_2CH_2CH_2CH_2Ph$ | O |
| A-0595 | $CH_2CF_3$ | H | Cl | F | $CH_2CF_2Ph(4\text{-}F)$ | O |
| A-0596 | $CH_2CF_3$ | H | Cl | F | $CH_2CF_2Ph(4\text{-}CF_3)$ | O |
| A-0597 | $CH_2CF_3$ | H | Cl | H | $CH_2CF_2Ph(3,4,5\text{-}F_3)$ | O |
| A-0598 | $CH_2CF_3$ | H | Cl | F | $CH_2CF_2Ph(3,4,5\text{-}F_3)$ | O |
| A-0599 | $CH_2CF_3$ | H | Cl | F | $CH_2CH_2OPh$ | O |
| A-0600 | $CH_2CF_3$ | H | Cl | F | $CH_2CH_2OPh(4\text{-}F)$ | O |
| A-0601 | $CH_2CF_3$ | H | Cl | F | $CH_2CH_2OPh(4\text{-}CF_3)$ | O |
| A-0602 | $CH_2CF_3$ | H | Cl | F | $CH_2CH_2CH_2OPh$ | O |
| A-0603 | $CH_2CF_3$ | H | Cl | F | $CH_2CH_2CH_2OPh(4\text{-}Cl)$ | O |
| A-0604 | $CH_2CF_3$ | H | Cl | F | $CH_2CH_2CH_2OPh(4\text{-}CF_3)$ | O |
| A-0605 | $CH_2CF_3$ | H | Cl | F | $CH_2CH_2CH_2CH_2OPh(4\text{-}CF_3)$ | O |
| A-0606 | $CH_2CF_3$ | H | Cl | F | $CH_2CH_2CH_2CH_2OPh(4\text{-}OCF_3)$ | O |
| A-0607 | $CH_2CF_3$ | H | Cl | F | $CH_2CH_2CH_2CH_2CH_2OPh(4\text{-}CF_3)$ | O |
| A-0608 | $CH_2CF_3$ | H | Cl | F | $CH_2CH_2OCH_2Ph$ | O |
| A-0609 | $CH_2CF_3$ | H | Cl | F | $CH_2CH_2CH_2OCH_2Ph$ | O |
| A-0610 | $CH_2CF_3$ | H | Cl | F | $CH_2CH_2CH_2CH_2OCH_2Ph$ | O |

TABLE 15

| Compound Number | $R^1$ | $R^2$ | $R^3$ | $R^4$ | $R^5$ | A |
|---|---|---|---|---|---|---|
| A-0611 | $CH_2CF_3$ | H | Cl | F | $CH_2CH_2CH_2CH_2CH_2OCH_2Ph$ | O |
| A-0612 | $CH_2CF_3$ | H | Cl | F | $CH_2CH_2SPh$ | O |
| A-0613 | $CH_2CF_3$ | H | Cl | F | $CH_2CH_2CH_2SPh$ | O |
| A-0614 | $CH_2CF_3$ | H | Cl | F | $CH_2CH_2CH_2SPh(4\text{-}F)$ | O |
| A-0615 | $CH_2CF_3$ | H | Cl | F | $CH_2CH_2CH_2SPh(4\text{-}Cl)$ | O |
| A-0616 | $CH_2CF_3$ | H | Cl | F | $CH_2CH_2CH_2SPh(4\text{-}Br)$ | O |
| A-0617 | $CH_2CF_3$ | H | Cl | F | $CH_2CH_2CH_2SPh[4\text{-}(t\text{-}Bu)]$ | O |
| A-0618 | $CH_2CF_3$ | H | Cl | F | $CH_2CH_2CH_2SPh(3\text{-}CF_3)$ | O |
| A-0619 | $CH_2CF_3$ | H | Cl | F | $CH_2CH_2CH_2SPh(4\text{-}CF_3)$ | O |
| A-0620 | $CH_2CF_3$ | H | Cl | F | $CH_2CH_2CH_2SPh(3\text{-}SCF_3)$ | O |
| A-0621 | $CH_2CF_3$ | H | Cl | F | $CH_2CH_2CH_2SPh(4\text{-}SCF_3)$ | O |
| A-0622 | $CH_2CF_3$ | H | Cl | F | $CH_2CH_2CH_2CH_2SPh$ | O |
| A-0623 | $CH_2CF_3$ | H | Cl | F | $CH_2CH_2CH_2CH_2SPh(4\text{-}F)$ | O |
| A-0624 | $CH_2CF_3$ | H | Cl | F | $CH_2CH_2CH_2CH_2SPh(4\text{-}Cl)$ | O |
| A-0625 | $CH_2CF_3$ | H | Cl | F | $CH_2CH_2CH_2CH_2SPh[4\text{-}(t\text{-}Bu)]$ | O |
| A-0626 | $CH_2CF_3$ | H | Cl | F | $CH_2CH_2CH_2CH_2SPh(4\text{-}CF_3)$ | O |
| A-0627 | $CH_2CF_3$ | H | Cl | F | $CH_2CH_2CH_2CH_2CH_2SPh$ | O |
| A-0628 | $CH_2CF_3$ | H | Cl | F | $CH_2CH_2CH_2CH_2CH_2SPh(4\text{-}F)$ | O |
| A-0629 | $CH_2CF_3$ | H | Cl | F | $CH_2CH_2CH_2CH_2CH_2SPh(4\text{-}Cl)$ | O |
| A-0630 | $CH_2CF_3$ | H | Cl | F | $CH_2CH_2CH_2CH_2CH_2SPh(4\text{-}CF_3)$ | O |
| A-0631 | $CH_2CF_3$ | H | Cl | F | $CH_2CH_2S(=O)Ph$ | O |
| A-0632 | $CH_2CF_3$ | H | Cl | F | $CH_2CH_2CH_2S(=O)Ph$ | O |
| A-0633 | $CH_2CF_3$ | H | Cl | F | $CH_2CH_2CH_2S(=O)Ph(4\text{-}F)$ | O |
| A-0634 | $CH_2CF_3$ | H | Cl | F | $CH_2CH_2CH_2S(=O)Ph[4\text{-}(t\text{-}Bu)]$ | O |
| A-0635 | $CH_2CF_3$ | H | Cl | F | $CH_2CH_2CH_2S(=O)Ph(4\text{-}CF_3)$ | O |
| A-0636 | $CH_2CF_3$ | H | Cl | F | $CH_2CH_2S(=O)_2Ph$ | O |
| A-0637 | $CH_2CF_3$ | H | Cl | F | $CH_2CH_2S(=O)_2Ph(4\text{-}CF_3)$ | O |
| A-0638 | $CH_2CF_3$ | H | Cl | F | $CH_2CH_2CH_2S(=O)_2Ph(4\text{-}F)$ | O |
| A-0639 | $CH_2CF_3$ | H | Cl | F | $CH_2CH_2CH_2S(=O)_2Ph(4\text{-}Cl)$ | O |
| A-0640 | $CH_2CF_3$ | H | Cl | F | $CH_2CH_2CH_2S(=O)_2Ph(4\text{-}CF_3)$ | O |
| A-0641 | $CH_2CF_3$ | H | Cl | F | $CH_2CH_2CH_2CH_2S(=O)_2Ph$ | O |
| A-0642 | $CH_2CF_3$ | H | Cl | F | $CH_2CH_2CH_2CH_2S(=O)_2Ph(4\text{-}Cl)$ | O |
| A-0643 | $CH_2CF_3$ | H | Cl | F | $CH_2CH_2CH_2CH_2S(=O)_2Ph(4\text{-}CF_3)$ | O |
| A-0644 | $CH_2CF_3$ | H | Cl | F | $CH_2CH_2SCH_2Ph$ | O |
| A-0645 | $CH_2CF_3$ | H | Cl | F | $CH_2CH_2CH_2SCH_2Ph$ | O |
| A-0646 | $CH_2CF_3$ | H | Cl | F | $CH_2CH_2CH_2SCH_2Ph(2\text{-}Cl)$ | O |
| A-0647 | $CH_2CF_3$ | H | Cl | F | $CH_2CH_2CH_2SCH_2Ph(3\text{-}Cl)$ | O |
| A-0648 | $CH_2CF_3$ | H | Cl | F | $CH_2CH_2CH_2SCH_2Ph(4\text{-}Cl)$ | O |
| A-0649 | $CH_2CF_3$ | H | Cl | F | $CH_2CH_2CH_2SCH_2Ph(2\text{-}SCF_3)$ | O |
| A-0650 | $CH_2CF_3$ | H | Cl | F | $CH_2CH_2CH_2SCH_2Ph(3\text{-}CF_3)$ | O |
| A-0651 | $CH_2CF_3$ | H | Cl | F | $CH_2CH_2CH_2SCH_2Ph(4\text{-}CF_3)$ | O |
| A-0652 | $CH_2CF_3$ | H | Cl | F | $CH_2CH_2CH_2SCH_2Ph(4\text{-}NO_2)$ | O |
| A-0653 | $CH_2CF_3$ | H | Cl | F | $CH_2CH_2CH_2CH_2SCH_2Ph$ | O |
| A-0654 | $CH_2CF_3$ | H | Cl | F | $CH_2CH_2CH_2CH_2SCH_2Ph(4\text{-}Cl)$ | O |

TABLE 16

| Compound Number | $R^1$ | $R^2$ | $R^3$ | $R^4$ | $R^5$ | A |
|---|---|---|---|---|---|---|
| A-0655 | $CH_2CF_3$ | H | Cl | F | $CH_2CH_2CH_2CH_2SCH_2Ph(4\text{-}CF_3)$ | O |
| A-0656 | $CH_2CF_3$ | H | Cl | F | $CH_2CH_2CH_2CH_2SCH_2Ph(4\text{-}CN)$ | O |
| A-0657 | $CH_2CF_3$ | H | Cl | F | $CH_2CH_2CH_2CH_2CH_2SCH_2Ph$ | O |
| A-0658 | $CH_2CF_3$ | H | Cl | F | $CH_2CH_2SCH_2CH_2Ph$ | O |
| A-0659 | $CH_2CF_3$ | H | Cl | F | $CH_2CH_2CH_2SCH_2CH_2Ph$ | O |
| A-0660 | $CH_2CF_3$ | H | Cl | F | $CH_2CH_2CH_2CH_2SCH_2CH_2Ph$ | O |
| A-0661 | $CH_2CF_3$ | H | Cl | F | $CH_2CH_2SCH(Me)Ph$ | O |
| A-0662 | $CH_2CF_3$ | H | Cl | F | $CH_2CH_2CH_2SCH(Me)Ph$ | O |
| A-0663 | $CH_2CF_3$ | H | Cl | F | $CH_2CH_2CH_2CH_2SCH(Me)Ph$ | O |
| A-0664 | $CH_2CF_3$ | H | Cl | F | $CH_2CH_2S(=O)CH_2Ph$ | O |
| A-0665 | $CH_2CF_3$ | H | Cl | F | $CH_2CH_2S(=O)CH_2Ph(4\text{-}CF_3)$ | O |
| A-0666 | $CH_2CF_3$ | H | Cl | F | $CH_2CH_2CH_2S(=O)CH_2Ph$ | O |
| A-0667 | $CH_2CF_3$ | H | Cl | F | $CH_2CH_2CH_2S(=O)CH_2Ph(2\text{-}SCF_3)$ | O |
| A-0668 | $CH_2CF_3$ | H | Cl | F | $CH_2CH_2CH_2S(=O)CH_2Ph(4\text{-}SCF_3)$ | O |
| A-0669 | $CH_2CF_3$ | H | Cl | F | $CH_2CH_2CH_2S(=O)CH_2Ph(4\text{-}Cl)$ | O |
| A-0670 | $CH_2CF_3$ | H | Cl | F | $CH_2CH_2CH_2S(=O)CH_2Ph(4\text{-}CF_3)$ | O |
| A-0671 | $CH_2CF_3$ | H | Cl | F | $CH_2CH_2CH_2CH_2S(=O)CH_2Ph$ | O |
| A-0672 | $CH_2CF_3$ | H | Cl | F | $CH_2CH_2CH_2CH_2S(=O)CH_2Ph(4\text{-}CF_3)$ | O |
| A-0673 | $CH_2CF_3$ | H | Cl | F | $CH_2CH_2CH_2CH_2CH_2S(=O)CH_2Ph(4\text{-}CF_3)$ | O |
| A-0674 | $CH_2CF_3$ | H | Cl | F | $CH_2CH_2S(=O)_2CH_2Ph$ | O |
| A-0675 | $CH_2CF_3$ | H | Cl | F | $CH_2CH_2S(=O)_2CH_2Ph(4\text{-}CF_3)$ | O |
| A-0676 | $CH_2CF_3$ | H | Cl | F | $CH_2CH_2CH_2S(=O)_2CH_2Ph$ | O |
| A-0677 | $CH_2CF_3$ | H | Cl | F | $CH_2CH_2CH_2S(=O)_2CH_2Ph(4\text{-}Cl)$ | O |

TABLE 16-continued

| Compound Number | $R^1$ | $R^2$ | $R^3$ | $R^4$ | $R^5$ | A |
|---|---|---|---|---|---|---|
| A-0678 | $CH_2CF_3$ | H | Cl | F | $CH_2CH_2CH_2S(=O)_2CH_2Ph(4\text{-}CF_3)$ | O |
| A-0679 | $CH_2CF_3$ | H | Cl | F | $CH_2CH_2CH_2CH_2S(=O)_2CH_2Ph$ | O |
| A-0680 | $CH_2CF_3$ | H | Cl | F | $CH_2CH_2CH_2CH_2S(=O)_2CH_2Ph(4\text{-}CF_3)$ | O |
| A-0681 | $CH_2CF_3$ | H | Cl | F | $CH_2CH_2CH_2CH_2CH_2S(=O)_2CH_2Ph$ | O |
| A-0682 | $CH_2CF_3$ | H | Cl | F | $CH_2CH_2CH_2CH_2CH_2S(=O)_2CH_2Ph(4\text{-}CF_3)$ | O |
| A-0683 | $CH_2CF_3$ | H | Cl | F | $CH_2CH_2ON{=}CH$(t-Bu) | O |
| A-0684 | $CH_2CF_3$ | H | Cl | F | $CH_2CH_2CH_2ON{=}CH$(t-Bu) | O |
| A-0685 | $CH_2CF_3$ | H | Cl | F | $CH_2CH_2CH_2CH_2ON{=}C$(Me)(c-Pr) | O |
| A-0686 | $CH_2CF_3$ | H | Cl | F | $CH_2CH_2ON{=}C(Me)CF_3$ | O |
| A-0687 | $CH_2CF_3$ | H | Cl | F | $CH_2CH_2CH_2ON{=}CHCF_3$ | O |
| A-0688 | $CH_2CF_3$ | H | Cl | F | $CH_2CH_2CH_2ON{=}C(Me)CF_3$ | O |
| A-0689 | $CH_2CF_3$ | H | Cl | F | $CH_2CH_2CH_2ON{=}C(Me)CCl_3$ | O |
| A-0690 | $CH_2CF_3$ | H | Cl | F | $CH_2CH_2CH_2CH_2ON{=}CHCF_3$ | O |
| A-0691 | $CH_2CF_3$ | H | Cl | F | $CH_2CH_2CH_2CH_2ON{=}C(Me)CF_3$ | O |
| A-0692 | $CH_2CF_3$ | H | Cl | F | $CH_2CH_2CH_2CH_2CH_2ON{=}C(Me)CF_3$ | O |
| A-0693 | $CH_2CF_3$ | H | Cl | F | $CH_2CH_2ON{=}CHPh$ | O |
| A-0694 | $CH_2CF_3$ | H | Cl | F | $CH_2CH_2ON{=}CHPh(4\text{-}CF_3)$ | O |
| A-0695 | $CH_2CF_3$ | H | Cl | F | $CH_2CH_2ON{=}CHPh(4\text{-}SCF_3)$ | O |
| A-0696 | $CH_2CF_3$ | H | Cl | F | $CH_2CH_2CH_2ON{=}CHPh(3\text{-}CF_3)$ | O |
| A-0697 | $CH_2CF_3$ | H | Cl | F | $CH_2CH_2CH_2ON{=}CHPh(4\text{-}CF_3)$ | O |
| A-0698 | $CH_2CF_3$ | H | Cl | F | $CH_2CH_2CH_2ON{=}CHPh(4\text{-}SCF_3)$ | O |

TABLE 17

| Compound Number | $R^1$ | $R^2$ | $R^3$ | $R^4$ | $R^5$ | A |
|---|---|---|---|---|---|---|
| A-0699 | $CH_2CF_3$ | H | Cl | F | $CH_2CH_2CH_2ON{=}C(Me)Ph(4\text{-}CF_3)$ | O |
| A-0700 | $CH_2CF_3$ | H | Cl | F | $CH_2CH_2CH_2CH_2ON{=}CHPh(4\text{-}SCF_3)$ | O |
| A-0701 | $CH_2CF_3$ | H | Cl | F | $CH_2CH_2$(adamant-1-yl) | O |
| A-0702 | $CH_2CF_3$ | H | Cl | F | $CH_2CH_2CH_2(3\text{-}CF_3$-pyrazol-1-yl) | O |
| A-0703 | $CH_2CF_3$ | H | Cl | F | $CH_2CH_2CH_2CH_2(3\text{-}CF_3$-pyrazol-1-yl) | O |
| A-0704 | $CH_2CF_3$ | H | Cl | F | $CH_2CH_2CH_2CH_2CH_2(3\text{-}CF_3$-pyrazol-1-yl) | O |
| A-0705 | $CH_2CF_3$ | H | Cl | F | $CH_2(1\text{-}Me\text{-}4\text{-}CF_3$-imidazol-5-yl) | O |
| A-0706 | $CH_2CF_3$ | H | Cl | F | $CH_2CH_2$(1-Me-4-CF 3-imidazol-5-yl) | O |
| A-0707 | $CH_2CF_3$ | H | Cl | F | $CH_2CH_2CH_2(1\text{-}Me\text{-}4\text{-}CF_3$-imidazol-5-yl) | O |
| A-0708 | $CH_2CF_3$ | H | Cl | F | $CH_2CH_2CH_2(3\text{-}CF_3$-1,2,4-triazol-1-yl) | O |
| A-0709 | $CH_2CF_3$ | H | Cl | F | $CH_2CH_2CH_2CH_2(3\text{-}CF_3$-1,2,4-triazol-1-yl) | O |
| A-0710 | $CH_2CF_3$ | H | Cl | F | $CH_2CH_2CH_2CH_2CH_2(3\text{-}CF_3$-1,2,4-triazol-1-yl) | O |
| A-0711 | $CH_2CF_3$ | H | Cl | F | $CH_2CH_2CH_2(4\text{-}CF_3$-thiazol-2-yl) | O |
| A-0712 | $CH_2CF_3$ | H | Cl | F | $CH_2CH_2CH_2CH_2(4\text{-}CF_3$-thiazol-2-yl) | O |
| A-0713 | $CH_2CF_3$ | H | Cl | F | $CH_2CH_2CH_2CH_2CH_2(4\text{-}CF_3$-thiazol-2-yl) | O |
| A-0714 | $CH_2CF_3$ | H | Cl | F | $CH_2CH_2CH_2(2\text{-}CF_3$-pyridin-5-yl) | O |
| A-0715 | $CH_2CF_3$ | H | Cl | F | $CH_2CH_2CH_2CH_2(2\text{-}CF_3$-pyridin-5-yl) | O |
| A-0716 | $CH_2CF_3$ | H | Cl | F | $CH_2CH_2CH_2CH_2CH_2(2\text{-}CF_3$-pyridin-5-yl) | O |
| A-0717 | $CH_2CF_3$ | H | Cl | F | $CH_2(4\text{-}CF_3$-pyrimidin-2-yl) | O |
| A-0718 | $CH_2CF_3$ | H | Cl | F | $CH_2CH_2(4\text{-}CF_3$-pyrimidin-2-yl) | O |
| A-0719 | $CH_2CF_3$ | H | Cl | F | $CH_2CH_2CH_2(4\text{-}CF_3$-pyrimidin-2-yl) | O |
| A-0720 | $CH_2CF_3$ | H | Cl | F | $CH_2CH_2O(3\text{-}Cl\text{-}5\text{-}CF_3$-pyridin-2-yl) | O |
| A-0721 | $CH_2CF_3$ | H | Cl | F | $CH_2CH_2CH_2O(3\text{-}Cl\text{-}5\text{-}CF_3$-pyridin-2-yl) | O |
| A-0722 | $CH_2CF_3$ | H | Cl | F | $CH_2CH_2CH_2CH_2O(3\text{-}Cl\text{-}5\text{-}CF_3$-pyridin-2-yl) | O |
| A-0723 | $CH_2CF_3$ | H | Cl | F | $CH_2CH_2CH_2CH_2CH_2O(3\text{-}Cl\text{-}5\text{-}CF_3$-pyridin-2-yl) | O |
| A-0724 | $CH_2CF_3$ | H | Cl | F | $CH_2CH_2N$(Phth) | O |
| A-0725 | $CH_2CF_3$ | H | Cl | F | $CH_2CH_2CH_2N$(Phth) | O |
| A-0726 | $CH_2CF_3$ | H | Cl | F | $CH_2CH_2CH_2CH_2N$(Phth) | O |
| A-0727 | $CH_2CF_3$ | H | Cl | F | $CH_2CH_2CH_2CH_2CH_2N$(Phth) | O |
| A-0728 | $CH_2CF_3$ | H | Cl | F | $CH_2CH(Me)CH_2N$(Phth) | O |
| A-0729 | $CH_2CF_3$ | H | Cl | F | $CH_2$[1,3-dioxolan(2-$CF_3$)-2-yl] | O |
| A-0730 | $CH_2CF_3$ | H | Cl | F | $CH_2$(azetidin-3-yl) | O |
| A-0731 | $CH_2CF_3$ | H | Cl | F | $CH_2$(pyrrolidin-3-yl) | O |
| A-0732 | $CH_2CF_3$ | H | Cl | F | $CH_2$(piperidin-3-yl) | O |
| A-0733 | $CH_2CF_3$ | H | Cl | F | $CH_2${azetidin[1-C(=O)O(t-Bu)]-3-yl} | O |
| A-0734 | $CH_2CF_3$ | H | Cl | F | $CH_2${pyrrolidin[1-C(=O)O(t-Bu)]-3-yl} | O |
| A-0735 | $CH_2CF_3$ | H | Cl | F | $CH_2${piperidin[1-C(=O)O(t-Bu)]-3-yl} | O |
| A-0736 | $CH_2CF_3$ | H | Cl | F | $CH_2${azetidin[1-C(=O)$CF_3$]-3-yl} | O |
| A-0737 | $CH_2CF_3$ | H | Cl | F | $CH_2${azetidin[1-S(=O)$_2CF_3$]-3-yl} | O |
| A-0738 | $CH_2CF_3$ | H | Cl | F | $CH_2${pyrrolidin[1-C(=O)$CF_3$]-3-yl} | O |
| A-0739 | $CH_2CF_3$ | H | Cl | F | $CH_2${pyrrolidin[1-S(=O)$_2CF_3$]-3-yl} | O |
| A-0740 | $CH_2CF_3$ | H | Cl | F | $CH_2${piperidin[1-C(=O)CF 3]-3-yl} | O |
| A-0741 | $CH_2CF_3$ | H | Cl | F | $CH_2${piperidin[1-S(=O)$_2CF_3$]-3-yl} | O |
| A-0742 | $CH_2CF_3$ | H | Cl | F | $CH_2CH_2CH_2CN$ | O |

TABLE 18

| Compound Number | $R^1$ | $R^2$ | $R^3$ | $R^4$ | $R^5$ | A |
|---|---|---|---|---|---|---|
| A-0743 | $CH_2CF_3$ | H | Cl | F | $CH_2CH_2CH_2CH_2CN$ | O |
| A-0744 | $CH_2CF_3$ | H | Cl | F | $CH_2CH_2CH_2CH_2CH_2CN$ | O |
| A-0745 | $CH_2CF_3$ | H | Cl | F | $CH_2CH_2CH_2CH_2CH_2CH_2CN$ | O |
| A-0746 | $CH_2CF_3$ | H | Cl | F | $CH_2CH_2CH_2C({=}O)OH$ | O |
| A-0747 | $CH_2CF_3$ | H | Cl | F | $CH_2CH_2CH_2CH_2C({=}O)OH$ | O |
| A-0748 | $CH_2CF_3$ | H | Cl | F | $CH_2CH_2CH_2CH_2CH_2C({=}O)OH$ | O |
| A-0749 | $CH_2CF_3$ | H | Cl | F | $CH_2CH_2SCN$ | O |
| A-0750 | $CH_2CF_3$ | H | Cl | F | $CH_2CH_2CH_2SCN$ | O |
| A-0751 | $CH_2CF_3$ | H | Cl | F | $CH_2CH_2CH_2CH_2SCN$ | O |
| A-0752 | $CH_2CF_3$ | H | Cl | F | $CH_2CH_2CH_2CH_2CH_2SCN$ | O |
| A-0753 | $CH_2CF_3$ | H | Cl | Cl | $CH_2CH_2CH_2CH_2CH_2SCN$ | O |
| A-0754 | $CH_2CF_3$ | H | Cl | F | $CH_2CH_2CH_2CH_2CH_2CH_2SCN$ | O |
| A-0755 | $CH_2CF_3$ | H | Cl | F | $CH_2CH_2CH_2CH_2CH_2CH_2CH_2SCN$ | O |
| A-0756 | $CH_2CF_3$ | H | Cl | F | $CH_2CH_2CH_2CH_2CH_2CH_2CH_2CH_2SCN$ | O |
| A-0757 | $CH_2CF_3$ | H | Cl | F | $CH_2CH_2CH(Me)SCN$ | O |
| A-0758 | $CH_2CF_3$ | H | Cl | F | $CH_2CH(Me)CH_2SCN$ | O |
| A-0759 | $CH_2CF_3$ | H | Cl | F | $CH(Me)CH_2CH_2SCN$ | O |
| A-0760 | $CH_2CF_3$ | H | Cl | F | $CH_2CH_2CH_2CH(Me)SCN$ | O |
| A-0761 | $CH_2CF_3$ | H | Cl | F | $CH_2CH_2CH(Me)CH_2SCN$ | O |
| A-0762 | $CH_2CF_3$ | H | Cl | F | $CH_2CH(Me)CH_2CH_2SCN$ | O |
| A-0763 | $CH_2CF_3$ | H | Cl | F | $CH(Me)CH_2CH_2CH_2SCN$ | O |
| A-0764 | $CH_2CF_3$ | H | Cl | F | $CH_2CH_2CH_2CH_2CH(Me)SCN$ | O |
| A-0765 | $CH_2CF_3$ | H | Cl | F | $CH_2CH_2CH_2CH(Me)CH_2SCN$ | O |
| A-0766 | $CH_2CF_3$ | H | Cl | F | $CH_2CH_2CH(Me)CH_2CH_2SCN$ | O |
| A-0767 | $CH_2CF_3$ | H | Cl | F | $CH_2CH(Me)CH_2CH_2CH_2SCN$ | O |
| A-0768 | $CH_2CF_3$ | H | Cl | F | $CH(Me)CH_2CH_2CH_2CH_2SCN$ | O |
| A-0769 | $CH_2CF_3$ | H | Cl | F | $CH_2CH_2ONH_2$ | O |
| A-0770 | $CH_2CF_3$ | H | Cl | F | $CH_2CH_2CH_2ONH_2$ | O |
| A-0771 | $CH_2CF_3$ | H | Cl | F | $CH_2CH_2CH_2CH_2ONH_2$ | O |
| A-0772 | $CH_2CF_3$ | H | Cl | F | $CH_2CH_2CH_2CH_2CH_2ONH_2$ | O |
| A-0773 | $CH_2CF_3$ | H | Cl | F | $CH_2CH_2CH_2CH_2CH_2CH_2ONH_2$ | O |
| A-0774 | $CH_2CF_3$ | H | Me | F | Me | O |
| A-0775 | $CH_2CF_3$ | H | Me | F | Et | O |
| A-0776 | $CH_2CF_3$ | H | Me | F | n-Pr | O |
| A-0777 | $CH_2CF_3$ | H | Me | F | i-Pr | O |
| A-0778 | $CH_2CF_3$ | H | Me | F | n-Bu | O |
| A-0779 | $CH_2CF_3$ | H | Me | F | n-Pen | O |
| A-0780 | $CH_2CF_3$ | H | Me | F | n-Hex | O |
| A-0781 | $CH_2CF_3$ | H | Me | F | n-Heptyl | O |
| A-0782 | $CH_2CF_3$ | H | Me | F | n-Octyl | O |
| A-0783 | $CH_2CF_3$ | H | Me | F | n-Nonyl | O |
| A-0784 | $CH_2CF_3$ | H | Me | F | n-Decyl | O |
| A-0785 | $CH_2CF_3$ | H | Me | F | c-Pr | O |
| A-0786 | $CH_2CF_3$ | H | Me | F | c-Pen | O |

TABLE 19

| Compound Number | $R^1$ | $R^2$ | $R^3$ | $R^4$ | $R^5$ | A |
|---|---|---|---|---|---|---|
| A-0787 | $CH_2CF_3$ | H | Me | F | c-Hex | O |
| A-0788 | $CH_2CF_3$ | H | Me | F | $CH_2C(Me){=}CH_2$ | O |
| A-0789 | $CH_2CF_3$ | H | Me | F | $CH_2CH_2CH{=}CH_2$ | O |
| A-0790 | $CH_2CF_3$ | H | Me | F | $CH_2CH_2CH{=}C(CH_3)_2$ | O |
| A-0791 | $CH_2CF_3$ | H | Me | F | $CH_2CH_2CH_2CH{=}CH_2$ | O |
| A-0792 | $CH_2CF_3$ | H | Me | F | $CH_2CH_2CH_2CH{=}C(CH_3)_2$ | O |
| A-0793 | $CH_2CF_3$ | H | Me | F | $CH_2CH_2CH_2CH_2CH{=}CH_2$ | O |
| A-0794 | $CH_2CF_3$ | H | Me | F | $CH_2CH_2CH_2CH_2CH{=}C(CH_3)_2$ | O |
| A-0795 | $CH_2CF_3$ | H | Me | F | $CH_2CH_2CH{\equiv}CH$ | O |
| A-0796 | $CH_2CF_3$ | H | Me | F | $CH_2CH_2CH_2CH{\equiv}CH$ | O |
| A-0797 | $CH_2CF_3$ | H | Me | F | $CH_2CH_2CH_2CH_2CH{\equiv}CH$ | O |
| A-0798 | $CH_2CF_3$ | H | Me | F | $CH_2CH_2CH_2Cl$ | O |
| A-0799 | $CH_2CF_3$ | H | Me | F | $CH_2CH_2CH_2Br$ | O |
| A-0800 | $CH_2CF_3$ | H | Me | F | $CH_2CH_2CH_2CH_2Cl$ | O |
| A-0801 | $CH_2CF_3$ | H | Me | F | $CH_2CH_2CH_2CH_2Br$ | O |
| A-0802 | $CH_2CF_3$ | H | Me | F | $CH_2CH_2CH_2CH_2CH_2Cl$ | O |
| A-0803 | $CH_2CF_3$ | H | Me | F | $CH_2CH_2CH_2CH_2CH_2Br$ | O |
| A-0804 | $CH_2CF_3$ | H | Me | Cl | $CH_2CH_2CH_2CH_2CH_2Br$ | O |
| A-0805 | $CH_2CF_3$ | H | Me | F | $CH_2CH_2CH_2CH_2CH_2CH_2Cl$ | O |
| A-0806 | $CH_2CF_3$ | H | Me | F | $CH_2CH_2CH_2CH_2CH_2CH_2Br$ | O |
| A-0807 | $CH_2CF_3$ | H | Me | F | $CH_2CH_2CH_2CH_2CH_2CH_2CH_2Cl$ | O |

TABLE 19-continued

| Compound Number | $R^1$ | $R^2$ | $R^3$ | $R^4$ | $R^5$ | A |
|---|---|---|---|---|---|---|
| A-0808 | $CH_2CF_3$ | H | Me | F | $CH_2CH_2CH_2CH_2CH_2CH_2CH_2Br$ | O |
| A-0809 | $CH_2CF_3$ | H | Me | F | $CH_2CH_2CH_2CH_2CH_2CH_2CH_2CH_2Br$ | O |
| A-0810 | $CH_2CF_3$ | H | Me | F | $CH_2CH(Me)CH_2Cl$ | O |
| A-0811 | $CH_2CF_3$ | H | Me | F | $CH_2CH(Me)CH_2Br$ | O |
| A-0812 | $CH_2CF_3$ | H | Me | F | $CH_2CH_2CH(Me)CH_2CH_2Cl$ | O |
| A-0813 | $CH_2CF_3$ | H | Me | F | $CH_2CH_2CH(Me)CH_2CH_2Br$ | O |
| A-0814 | $CH_2CF_3$ | H | Me | F | $CH_2CH_2CF{=}CF_2$ | O |
| A-0815 | $CH_2CF_3$ | H | Me | F | $CH_2CH{=}C(Cl)CF_3$ | O |
| A-0816 | $CH_2CF_3$ | H | Me | F | $CH_2CH_2CH_2CF{=}CF_2$ | O |
| A-0817 | $CH_2CF_3$ | H | Me | F | $CH_2CH_2CH_2CH_2CF{=}CF_2$ | O |
| A-0818 | $CH_2CF_3$ | H | Me | F | $CH_2CH_2CH_2CH_2CH_2CF{=}CF_2$ | O |
| A-0819 | $CH_2CF_3$ | H | Me | F | $CH_2$(t-Bu) | O |
| A-0820 | $CH_2CF_3$ | H | Me | F | CH2CH2(t-Bu) | O |
| A-0821 | $CH_2CF_3$ | H | Me | F | $CH_2CH_2CH_2$(t-Bu) | O |
| A-0822 | $CH_2CF_3$ | H | Me | F | $CH_2CH_2CH_2CH_2$(t-Bu) | O |
| A-0823 | $CH_2CF_3$ | H | Me | F | $CH_2CH_2CH_2CH_2CH_2$(t-Bu) | O |
| A-0824 | $CH_2CF_3$ | H | Me | F | $CH_2CH_2CH_2CH_2CH_2CH_2$(t-Bu) | O |
| A-0825 | $CH_2CF_3$ | H | Me | F | $CH_2CF_3$ | O |
| A-0826 | $CH_2CF_3$ | H | Me | F | $CH_2CH_2CF_3$ | O |
| A-0827 | $CH_2CF_3$ | H | Me | F | $CH_2CH_2CH_2CF_3$ | O |
| A-0828 | $CH_2CF_3$ | H | Me | F | $CH_2CH_2CH_2CH_2CF_3$ | O |
| A-0829 | $CH_2CF_3$ | H | Me | F | $CH_2CH_2CH_2CH_2CH_2CF_3$ | O |
| A-0830 | $CH_2CF_3$ | H | Me | F | $CH_2CH_2CH_2CH_2CH_2CH_2CF_3$ | O |

TABLE 20

| Compound Number | $R^1$ | $R^2$ | $R^3$ | $R^4$ | $R^5$ | A |
|---|---|---|---|---|---|---|
| A-0831 | $CH_2CF_3$ | H | Me | F | $CH_2CH_2CH_2CH_2CH_2CH_2CH_2CF_3$ | O |
| A-0832 | $CH_2CF_3$ | H | Me | F | $CH_2CF_2CF_3$ | O |
| A-0833 | $CH_2CF_3$ | H | Me | F | $CF_2CHFCF_3$ | O |
| A-0834 | $CH_2CF_3$ | H | Me | F | $CF_2CF_2CF_3$ | O |
| A-0835 | $CH_2CF_3$ | H | Me | F | $CH_2CF_2CF_2CF_3$ | O |
| A-0836 | $CH_2CF_3$ | H | Me | F | $CH_2CF_2CF_2CF_2CF_3$ | O |
| A-0837 | $CH_2CF_3$ | H | Me | F | $CH_2CF_2CF_2CF_2CHF_2$ | O |
| A-0838 | $CH_2CF_3$ | H | Me | F | $CH(CF_3)CF_3$ | O |
| A-0839 | $CH_2CF_3$ | H | Me | F | $CH_2CF(CF_3)CF_3$ | O |
| A-0840 | $CH_2CF_3$ | H | Me | F | $CH_2CF_2CF(CF_3)CF_3$ | O |
| A-0841 | $CH_2CF_3$ | H | Me | F | $CH_2CF(CF_3)CF_2CF_3$ | O |
| A-0842 | $CH_2CF_3$ | H | Me | F | $CH_2CF_2CF_2CF(CF_3)CF_3$ | O |
| A-0843 | $CH_2CF_3$ | H | Me | F | $CH_2CF_2CF(CF_3)CF_2CF_3$ | O |
| A-0844 | $CH_2CF_3$ | H | Me | F | $CH_2CF(CF_3)CF_2CF_2CF_3$ | O |
| A-0845 | $CH_2CF_3$ | H | Me | F | $CH_2$(c-Pr) | O |
| A-0846 | $CH_2CF_3$ | H | Me | F | $CH_2$[c-Pr(1-Me)] | O |
| A-0847 | $CH_2CF_3$ | H | Me | F | $CH_2$[c-Pr(1-Ph)] | O |
| A-0848 | $CH_2CF_3$ | H | Me | F | $CH_2$[c-Pr(1-$NH_2$)] | O |
| A-0849 | $CH_2CF_3$ | H | Me | F | $CH_2$[c-Pr(1-NHC(=O)O(t-Bu)] | O |
| A-0850 | $CH_2CF_3$ | H | Me | F | $CH_2${c-Pr[1-NHS(=O)$_2CF_3$]} | O |
| A-0851 | $CH_2CF_3$ | H | Me | F | $CH_2${c-Pr[1-Ph(4-$CF_3$)]} | O |
| A-0852 | $CH_2CF_3$ | H | Me | F | $CH_2${c-Pr[1-Ph(3,4,5-$F_3$)]} | O |
| A-0853 | $CH_2CF_3$ | H | Me | F | $CH_2${c-Hex[4-(t-Bu)]} | O |
| A-0854 | $CH_2CF_3$ | H | Me | F | $CH_2$[c-Hex(4-$CF_3$)] | O |
| A-0855 | $CH_2CF_3$ | H | Me | F | $CH_2CH_2$(c-Pr) | O |
| A-0856 | $CH_2CF_3$ | H | Me | F | $CH_2CH_2$(c-Hex) | O |
| A-0857 | $CH_2CF_3$ | H | Me | F | $CH_2CH_2$[c-Hex(4-$CF_3$)] | O |
| A-0858 | $CH_2CF_3$ | H | Me | F | $CH_2CH_2$[c-Hex(4-$SCF_3$)] | O |
| A-0859 | $CH_2CF_3$ | H | Me | F | $CH_2CH_2CH_2$(c-Pr) | O |
| A-0860 | $CH_2CF_3$ | H | Me | F | $CH_2CH_2CH_2$(c-Hex) | O |
| A-0861 | $CH_2CF_3$ | H | Me | F | $CH_2CH_2CH_2${c-Hex[4-(t-Bu)]} | O |
| A-0862 | $CH_2CF_3$ | H | Me | F | $CH_2CH_2CH_2$[c-Hex(4-$CF_3$)] | O |
| A-0863 | $CH_2CF_3$ | H | Me | F | $CH_2CH_2CH_2$[c-Hex(4-$SCF_3$)] | O |
| A-0864 | $CH_2CF_3$ | H | Me | F | $CH_2CH_2CH_2CH_2$(c-Pr) | O |
| A-0865 | $CH_2CF_3$ | H | Me | F | $CH_2CH_2CH_2CH_2$(c-Hex) | O |
| A-0866 | $CH_2CF_3$ | H | Me | F | $CH_2CH_2CH_2CH_2$[c-Hex(4-$CF_3$)] | O |
| A-0867 | $CH_2CF_3$ | H | Me | F | $CH_2$[c-Pr(2,2-$F_2$)] | O |
| A-0868 | $CH_2CF_3$ | H | Me | F | $CH_2$[c-Hex(4,4-$F_2$)] | O |
| A-0869 | $CH_2CF_3$ | H | Me | F | $CH_2CH_2$[c-Pr(2,2-$F_2$)] | O |
| A-0870 | $CH_2CF_3$ | H | Me | F | $CH_2CH_2$[c-Hex(4,4-$F_2$)] | O |
| A-0871 | $CH_2CF_3$ | H | Me | F | $CH_2CH_2CH_2$[c-Pr(2,2-$F_2$)] | O |
| A-0872 | $CH_2CF_3$ | H | Me | F | $CH_2CH_2CH_2CH_2$[c-Pr(2,2-$F_2$)] | O |
| A-0873 | $CH_2CF_3$ | H | Me | F | $CH_2CH_2OH$ | O |
| A-0874 | $CH_2CF_3$ | H | Me | F | $CH_2CH_2CH_2OH$ | O |

TABLE 21

| Compound Number | $R^1$ | $R^2$ | $R^3$ | $R^4$ | $R^5$ | A |
|---|---|---|---|---|---|---|
| A-0875 | $CH_2CF_3$ | H | Me | F | $CH_2CH_2CH_2CH_2OH$ | O |
| A-0876 | $CH_2CF_3$ | H | Me | F | $CH_2CH_2CH_2CH_2CH_2OH$ | O |
| A-0877 | $CH_2CF_3$ | H | Me | F | $CH_2CH_2CH_2CH_2CH_2CH_2OH$ | O |
| A-0878 | $CH_2CF_3$ | H | Me | F | $CH_2C({=}O)Me$ | O |
| A-0879 | $CH_2CF_3$ | H | Me | F | $CH_2CH(OH)Me$ | O |
| A-0880 | $CH_2CF_3$ | H | Me | F | $CH_2CH(OH)CF_3$ | O |
| A-0881 | $CH_2CF_3$ | H | Me | F | $CH_2C(OH)_2CF_3$ | O |
| A-0882 | $CH_2CF_3$ | H | Me | F | $CH_2C(CF_3){=}NOH$ | O |
| A-0883 | $CH_2CF_3$ | H | Me | F | $CH_2C(CF_3){=}NOMe$ | O |
| A-0884 | $CH_2CF_3$ | H | Me | F | $CH_2CH(CF_3)NH_2$ | O |
| A-0885 | $CH_2CF_3$ | H | Me | F | $CH_2CH_2OMe$ | O |
| A-0886 | $CH_2CF_3$ | H | Me | F | $CH_2CH_2CH_2OMe$ | O |
| A-0887 | $CH_2CF_3$ | H | Me | F | $CH_2CH_2CH_2CH_2OMe$ | O |
| A-0888 | $CH_2CF_3$ | H | Me | F | $CH_2CH_2CH_2CH_2CH_2OMe$ | O |
| A-0889 | $CH_2CF_3$ | H | Me | F | $CH_2CH_2CH_2CH_2CH_2CH_2OMe$ | O |
| A-0890 | $CH_2CF_3$ | H | Me | F | $CH_2CH_2OCHF_2$ | O |
| A-0891 | $CH_2CF_3$ | H | Me | F | $CH_2CH_2CH_2OCHF2$ | O |
| A-0892 | $CH_2CF_3$ | H | Me | F | $CH_2CH_2CH_2CH_2OCHF_2$ | O |
| A-0893 | $CH_2CF_3$ | H | Me | F | $CH_2CH_2CH_2CH_2CH_2OCHF_2$ | O |
| A-0894 | $CH_2CF_3$ | H | Me | F | $CH_2CH_2CH_2CH_2CH_2CH_2OCHF_2$ | O |
| A-0895 | $CH_2CF_3$ | H | Me | F | $CH_2CH_2OCH_2CF_3$ | O |
| A-0896 | $CH_2CF_3$ | H | Me | F | $CH_2CH_2CH_2OCH_2CF_3$ | O |
| A-0897 | $CH_2CF_3$ | H | Me | F | $CH_2CH_2CH_2CH_2OCH_2CF_3$ | O |
| A-0898 | $CH_2CF_3$ | H | Me | F | $CH_2CH_2CH_2CH_2CH_2OCH_2CF_3$ | O |
| A-0899 | $CH_2CF_3$ | H | Me | F | $CH_2CH_2CH_2CH_2CH_2CH_2OCH_2CF_3$ | O |
| A-0900 | $CH_2CF_3$ | H | Me | F | $CH_2CH_2CH_2CH_2CH_2CH_2CH_2CH_2OCH_2CF_3$ | O |
| A-0901 | $CH_2CF_3$ | H | Me | F | $CH_2CH_2OC(CF_3)_3$ | O |
| A-0902 | $CH_2CF_3$ | H | Me | F | $CH_2CH_2CH_2OC(CF_3)_3$ | O |
| A-0903 | $CH_2CF_3$ | H | Me | F | $CH_2CH_2CH_2CH_2OC(CF_3)_3$ | O |
| A-0904 | $CH_2CF_3$ | H | Me | F | $CH_2CH_2CH_2CH_2CH_2OC(CF_3)_3$ | O |
| A-0905 | $CH_2CF_3$ | H | Me | F | $CF_2CHFOCF_2CF_2CF_3$ | O |
| A-0906 | $CH_2CF_3$ | H | Me | F | $CH_2CH_2O$(c-Pr) | O |
| A-0907 | $CH_2CF_3$ | H | Me | F | $CH_2CH_2O$(c-Pen) | O |
| A-0908 | $CH_2CF_3$ | H | Me | F | $CH_2CH_2O$(c-Hex) | O |
| A-0909 | $CH_2CF_3$ | H | Me | F | $CH_2CH_2CH_2O$(c-Pr) | O |
| A-0910 | $CH_2CF_3$ | H | Me | F | $CH_2CH_2CH_2O$(c-Pen) | O |
| A-0911 | $CH_2CF_3$ | H | Me | F | $CH_2CH_2CH_2O$(c-Hex) | O |
| A-0912 | $CH_2CF_3$ | H | Me | F | $CH_2CH_2CH_2CH_2O$(c-Pr) | O |
| A-0913 | $CH_2CF_3$ | H | Me | F | $CH_2CH_2CH_2CH_2O$(c-Pen) | O |
| A-0914 | $CH_2CF_3$ | H | Me | F | $CH_2CH_2CH_2CH_2O$(c-Hex) | O |
| A-0915 | $CH_2CF_3$ | H | Me | F | $CH_2CH_2O$[c-Pr(2,2-$F_2$)] | O |
| A-0916 | $CH_2CF_3$ | H | Me | F | $CH_2CH_2CH_2O$[c-Pr(2,2-$F_2$)] | O |
| A-0917 | $CH_2CF_3$ | H | Me | F | $CH_2CH_2CH_2CH_2O$[c-Pr(2,2-$F_2$)] | O |
| A-0918 | $CH_2CF_3$ | H | Me | F | $CH_2CH_2OCH_2CH_2OCH_3$ | O |

TABLE 22

| Compound Number | $R^1$ | $R^2$ | $R^3$ | $R^4$ | $R^5$ | A |
|---|---|---|---|---|---|---|
| A-0919 | $CH_2CF_3$ | H | Me | F | $CH_2CH_2OCH_2CH_2OCH_2CF_3$ | O |
| A-0920 | $CH_2CF_3$ | H | Me | F | $CH_2CF_2OCF_2CF_2OCF_3$ | O |
| A-0921 | $CH_2CF_3$ | H | Me | F | $CF_2CHFOCF_2CF_2OCF_3$ | O |
| A-0922 | $CH_2CF_3$ | H | Me | F | $CF_2CHFOCF_2CF(CF_3)OCF_2CF_2CF_3$ | O |
| A-0923 | $CH_2CF_3$ | H | Me | F | $CH_2CH_2SH$ | O |
| A-0924 | $CH_2CF_3$ | H | Me | F | $CH_2CH_2CH_2SH$ | O |
| A-0925 | $CH_2CF_3$ | H | Me | F | $CH_2CH_2CH_2CH_2SH$ | O |
| A-0926 | $CH_2CF_3$ | H | Me | F | $CH_2CH_2CH_2CH_2CH_2SH$ | O |
| A-0927 | $CH_2CF_3$ | H | Me | F | $CH_2CH_2CH_2CH_2CH_2CH_2SH$ | O |
| A-0928 | $CH_2CF_3$ | H | Me | F | $CH_2CH(SH)Me$ | O |
| A-0929 | $CH_2CF_3$ | H | Me | F | $CH_2CH[SC({=}O)Me]Me$ | O |
| A-0930 | $CH_2CF_3$ | H | Me | F | $CH_2CH_2S$(t-Bu) | O |
| A-0931 | $CH_2CF_3$ | H | Me | F | $CH_2CH_2CH_2S$(t-Bu) | O |
| A-0932 | $CH_2CF_3$ | H | Me | F | $CH_2CH_2CH_2CH_2S$(t-Bu) | O |
| A-0933 | $CH_2CF_3$ | H | Me | F | $CH_2CH_2CH_2CH_2CH_2SCH_3$ | O |
| A-0934 | $CH_2CF_3$ | H | Me | F | $CH_2CH_2CH_2CH_2CH_2SCH(CH_3)_2$ | O |
| A-0935 | $CH_2CF_3$ | H | Me | F | $CH_2CH_2CH_2CH_2CH_2S$(t-Bu) | O |
| A-0936 | $CH_2CF_3$ | H | Me | F | $CH_2CH_2CH_2CH_2CH_2CH_2SCH(CH_3)_2$ | O |
| A-0937 | $CH_2CF_3$ | H | Me | F | $CH_2CH_2CH_2CH_2CH_2CH_2S$(t-Bu) | O |
| A-0938 | $CH_2CF_3$ | H | Me | F | $CH_2CH_2CH_2CH_2CH_2CH_2CH_2S$(t-Bu) | O |
| A-0939 | $CH_2CF_3$ | H | Me | F | $CH_2CH_2SCHF_2$ | O |

TABLE 22-continued

| Compound Number | $R^1$ | $R^2$ | $R^3$ | $R^4$ | $R^5$ | A |
|---|---|---|---|---|---|---|
| A-0940 | $CH_2CF_3$ | H | Me | F | $CH_2CH_2CH_2SCHF_2$ | O |
| A-0941 | $CH_2CF_3$ | H | Me | F | $CH_2CH_2CH_2CH_2SCHF_2$ | O |
| A-0942 | $CH_2CF_3$ | H | Me | H | $CH_2CH_2CH_2CH_2CH_2SCHF_2$ | O |
| A-0943 | $CH_2CF_3$ | H | Me | F | $CH_2CH_2CH_2CH_2CH_2SCHF_2$ | O |
| A-0944 | $CH_2CF_3$ | H | Me | F | $CH_2CH_2CH_2CH_2CH_2CH_2SCHF_2$ | O |
| A-0945 | $CH_2CF_3$ | H | Me | F | $CH_2CH_2CH_2CH_2CH_2CH_2CH_2SCHF_2$ | O |
| A-0946 | $CH_2CF_3$ | H | Me | F | $CH_2CH_2SCH_2CF_3$ | O |
| A-0947 | $CH_2CF_3$ | H | Me | F | $CH_2CH_2CH_2SCH_2CF_3$ | O |
| A-0948 | $CH_2CF_3$ | H | Me | F | $CH_2CH_2CH_2CH_2SCH_2CF_3$ | O |
| A-0949 | $CH_2CF_3$ | H | Me | F | $CH_2CH_2CH_2CH_2CH_2SCH_2CF_3$ | O |
| A-0950 | $CH_2CF_3$ | H | Me | F | $CH_2CH_2CH_2CH_2CH_2CH_2SCH_2CF_3$ | O |
| A-0951 | $CH_2CF_3$ | H | Me | F | $CH_2CH_2CH_2CH_2CH_2CH_2CH_2SCH_2CF_3$ | O |
| A-0952 | $CH_2CF_3$ | H | Me | F | $CH_2CH(Me)SCH_2CF_3$ | O |
| A-0953 | $CH_2CF_3$ | H | Me | F | $CH_2CH_2SCH(CF_3)_2$ | O |
| A-0954 | $CH_2CF_3$ | H | Me | F | $CH_2CH_2CH_2SCH(CF_3)_2$ | O |
| A-0955 | $CH_2CF_3$ | H | Me | F | $CH_2CH_2CH_2CH_2SCH(CF_3)_2$ | O |
| A-0956 | $CH_2CF_3$ | H | Me | F | $CH_2CH_2CH_2CH_2CH_2SCH(CF_3)_2$ | O |
| A-0957 | $CH_2CF_3$ | H | Me | F | $CH_2CH_2CH_2CH_2CH_2CH_2SCH(CF_3)_2$ | O |
| A-0958 | $CH_2CF_3$ | H | Me | F | $CH_2CH_2CH_2CH_2CH_2SCF_2CF_3$ | O |
| A-0959 | $CH_2CF_3$ | H | Me | F | $CH_2CH_2CH_2CH_2CH_2CH_2SCF_2CF_3$ | O |
| A-0960 | $CH_2CF_3$ | H | Me | F | $CH_2CH_2CH_2CH_2CH_2CH_2SCF(CF3)_2$ | O |
| A-0961 | $CH_2CF_3$ | H | Me | F | $CH_2CH_2CH_2CH_2CH_2CH_2CH_2SCF(CF_3)_2$ | O |
| A-0962 | $CH_2CF_3$ | H | Me | F | $CH_2CH_2CH_2CH_2CH_2SCCl_3$ | O |

TABLE 23

| Compound Number | $R^1$ | $R^2$ | $R^3$ | $R^4$ | $R^5$ | A |
|---|---|---|---|---|---|---|
| A-0963 | $CH_2CF_3$ | H | Me | F | $CH_2CH_2CH_2CH_2CH_2CH_2SCCl_3$ | O |
| A-0964 | $CH_2CF_3$ | H | Me | F | $CH_2CH_2SCH_2CH{=}CH_2$ | O |
| A-0965 | $CH_2CF_3$ | H | Me | F | $CH_2CH_2CH_2SCH_2CH{=}CH_2$ | O |
| A-0966 | $CH_2CF_3$ | H | Me | F | $CH_2CH_2CH_2CH_2SCH_2CH{=}CH_2$ | O |
| A-0967 | $CH_2CF_3$ | H | Me | F | $CH_2CH_2SCF{=}CFCF_3$ | O |
| A-0968 | $CH_2CF_3$ | H | Me | F | $CH_2CH_2CH_2SCF{=}CFCF_3$ | O |
| A-0969 | $CH_2CF_3$ | H | Me | F | $CH_2CH_2CH_2CH_2SCF{=}CFCF_3$ | O |
| A-0970 | $CH_2CF_3$ | H | Me | F | $CH_2CH_2CH_2S$(c-Pr) | O |
| A-0971 | $CH_2CF_3$ | H | Me | F | $CH_2CH_2CH_2S$(c-Hex) | O |
| A-0972 | $CH_2CF_3$ | H | Me | F | $CH_2CH_2CH_2CH_2S$(c-Pr) | O |
| A-0973 | $CH_2CF_3$ | H | Me | F | $CH_2CH_2CH_2CH_2S$(c-Hex) | O |
| A-0974 | $CH_2CF_3$ | H | Me | F | $CH_2CH_2CH_2CH_2CH_2S$(c-Pr) | O |
| A-0975 | $CH_2CF_3$ | H | Me | F | $CH_2CH_2CH_2CH_2CH_2S$(c-Hex) | O |
| A-0976 | $CH_2CF_3$ | H | Me | F | $CH_2CH_2CH_2S$[c-Hex(4,4-$F_2$)] | O |
| A-0977 | $CH_2CF_3$ | H | Me | F | $CH_2CH_2CH_2CH_2S$[c-Hex(4,4-$F_2$)] | O |
| A-0978 | $CH_2CF_3$ | H | Me | F | $CH_2CH_2CH_2CH_2CH_2S$[c-Hex(4,4-$F_2$)] | O |
| A-0979 | $CH_2CF_3$ | H | Me | F | $CH_2CH_2CH_2SCH_2$(c-Pr) | O |
| A-0980 | $CH_2CF_3$ | H | Me | F | $CH_2CH_2CH_2SCH_2$(c-Hex) | O |
| A-0981 | $CH_2CF_3$ | H | Me | F | $CH_2CH_2CH_2CH_2SCH_2$(c-Pr) | O |
| A-0982 | $CH_2CF_3$ | H | Me | F | $CH_2CH_2CH_2CH_2SCH_2$(c-Hex) | O |
| A-0983 | $CH_2CF_3$ | H | Me | F | $CH_2CH_2CH_2CH_2CH_2SCH_2$(c-Pr) | O |
| A-0984 | $CH_2CF_3$ | H | Me | F | $CH_2CH_2CH_2CH_2CH_2SCH_2$(c-Hex) | O |
| A-0985 | $CH_2CF_3$ | H | Me | F | $CH_2CH_2CH_2SCH_2$[c-Hex(4,4-$F_2$)] | O |
| A-0986 | $CH_2CF_3$ | H | Me | F | $CH_2CH_2CH_2CH_2SCH_2$[c-Hex(4,4-$F_2$)] | O |
| A-0987 | $CH_2CF_3$ | H | Me | F | $CH_2CH_2CH_2CH_2CH_2SCH_2$[c-Hex(4,4-$F_2$)] | O |
| A-0988 | $CH_2CF_3$ | H | Me | F | $CH_2CH_2CH_2SCH_2SiMe_3$ | O |
| A-0989 | $CH_2CF_3$ | H | Me | F | $CH_2CH_2CH_2CH_2SCH_2SiMe_3$ | O |
| A-0990 | $CH_2CF_3$ | H | Me | F | $CH_2CH_2CH_2CH_2CH_2SCH_2SiMe_3$ | O |
| A-0991 | $CH_2CF_3$ | H | Me | F | $CH_2CH_2OCH_2CH_2SCH_3$ | O |
| A-0992 | $CH_2CF_3$ | H | Me | F | $CH_2CH_2OCH_2CH_2SCHF_2$ | O |
| A-0993 | $CH_2CF_3$ | H | Me | F | $CH_2CH_2OCH_2CH_2SCF_3$ | O |
| A-0994 | $CH_2CF_3$ | H | Me | F | $CH_2CH_2OCH_2CH_2SCH_2CF_3$ | O |
| A-0995 | $CH_2CF_3$ | H | Me | F | $CH_2CH_2CH_2S({=}O)$(t-Bu) | O |
| A-0996 | $CH_2CF_3$ | H | Me | F | $CH_2CH_2CH_2CH_2S({=}O)$(t-Bu) | O |
| A-0997 | $CH_2CF_3$ | H | Me | F | $CH_2CH_2CH_2CH_2CH_2CH_2S({=}O)$(t-Bu) | O |
| A-0998 | $CH_2CF_3$ | H | Me | F | $CH_2CH_2S({=}O)CHF_2$ | O |
| A-0999 | $CH_2CF_3$ | H | Me | F | $CH_2CH_2CH_2S({=}O)CHF_2$ | O |
| A-1000 | $CH_2CF_3$ | H | Me | F | $CH_2CH_2CH_2CH_2S({=}O)CHF_2$ | O |
| A-1001 | $CH_2CF_3$ | H | Me | F | $CH_2CH_2CH_2CH_2CH_2S({=}O)CHF_2$ | O |
| A-1002 | $CH_2CF_3$ | H | Me | F | $CH_2CH_2CH_2CH_2CH_2CH_2S({=}O)CHF_2$ | O |
| A-1003 | $CH_2CF_3$ | H | Me | F | $CH_2CH_2CH_2CH_2CH_2CH_2CH_2S({=}O)CHF_2$ | O |
| A-1004 | $CH_2CF_3$ | H | Me | F | $CH_2CH_2S({=}O)CF_3$ | O |
| A-1005 | $CH_2CF_3$ | H | Me | F | $CH_2CH_2CH_2S({=}O)CF_3$ | O |
| A-1006 | $CH_2CF_3$ | H | Me | F | $CH_2CH_2CH_2CH_2S({=}O)CF_3$ | O |

TABLE 24

| Compound Number | $R^1$ | $R^2$ | $R^3$ | $R^4$ | $R^5$ | A |
|---|---|---|---|---|---|---|
| A-1007 | $CH_2CF_3$ | H | Me | F | $CH_2CH_2CH_2CH_2CH_2S(=O)CF_3$ | O |
| A-1008 | $CH_2CF_3$ | H | Me | F | $CH_2CH_2CH_2CH_2CH_2CH_2S(=O)CF_3$ | O |
| A-1009 | $CH_2CF_3$ | H | Me | F | $CH_2CH_2CH_2CH_2CH_2CH_2CH_2S(=O)CF_3$ | O |
| A-1010 | $CH_2CF_3$ | H | Me | F | $CH_2CH_2S(=O)CH_2CF_3$ | O |
| A-1011 | $CH_2CF_3$ | H | Me | F | $CH_2CH_2CH_2S(=O)CH_2CF_3$ | O |
| A-1012 | $CH_2CF_3$ | H | Me | F | $CH_2CH_2CH_2CH_2S(=O)CH_2CF_3$ | O |
| A-1013 | $CH_2CF_3$ | H | Me | F | $CH_2CH_2CH_2CH_2CH_2S(=O)CH_2CF_3$ | O |
| A-1014 | $CH_2CF_3$ | H | Me | F | $CH_2CH_2CH_2CH_2CH_2CH_2S(=O)CH_2CF_3$ | O |
| A-1015 | $CH_2CF_3$ | H | Me | F | $CH_2CH_2CH_2CH_2CH_2CH_2CH_2S(=O)CH_2CF_3$ | O |
| A-1016 | $CH_2CF_3$ | H | Me | F | $CH_2CH(Me)S(=O)CH_2CF_3$ | O |
| A-1017 | $CH_2CF_3$ | H | Me | F | $CH_2CH_2CH_2S(=O)$(c-Pr) | O |
| A-1018 | $CH_2CF_3$ | H | Me | F | $CH_2CH_2CH_2CH_2S(=O)$(c-Pr) | O |
| A-1019 | $CH_2CF_3$ | H | Me | F | $CH_2CH_2CH_2CH_2S(=O)$(c-Pen) | O |
| A-1020 | $CH_2CF_3$ | H | Me | F | $CH_2CH_2CH_2CH_2S(=O)$(c-Hex) | O |
| A-1021 | $CH_2CF_3$ | H | Me | F | $CH_2CH_2CH_2CH_2CH_2S(=O)$(c-Pr) | O |
| A-1022 | $CH_2CF_3$ | H | Me | F | $CH_2CH_2CH_2CH_2CH_2S(=O)$(c-Hex) | O |
| A-1023 | $CH_2CF_3$ | H | Me | F | $CH_2CH_2CH_2S(=O)$[c-Hex(4,4-$F_2$)] | O |
| A-1024 | $CH_2CF_3$ | H | Me | F | $CH_2CH_2CH_2CH_2S(=O)$[c-Hex(4,4-$F_2$)] | O |
| A-1025 | $CH_2CF_3$ | H | Me | F | $CH_2CH_2CH_2CH_2CH_2S(=O)$[c-Hex(4,4-$F_2$)] | O |
| A-1026 | $CH_2CF_3$ | H | Me | F | $CH_2CH_2CH_2CH_2S(=O)_2Me$ | O |
| A-1027 | $CH_2CF_3$ | H | Me | F | $CH_2CH_2CH_2CH_2CH_2S(=O)_2Me$ | O |
| A-1028 | $CH_2CF_3$ | H | Me | F | $CH_2CH_2CH_2CH_2CH_2S(=O)_2$(t-Bu) | O |
| A-1029 | $CH_2CF_3$ | H | Me | F | $CH_2CH_2S(=O)_2CHF_2$ | O |
| A-1030 | $CH_2CF_3$ | H | Me | F | $CH_2CH_2CH_2S(=O)_2CHF_2$ | O |
| A-1031 | $CH_2CF_3$ | H | Me | F | $CH_2CH_2CH_2CH_2S(=O)_2CHF_2$ | O |
| A-1032 | $CH_2CF_3$ | H | Me | F | $CH_2CH_2CH_2CH_2CH_2S(=O)_2CHF_2$ | O |
| A-1033 | $CH_2CF_3$ | H | Me | F | $CH_2CH_2CH_2CH_2CH_2CH_2S(=O)_2CHF_2$ | O |
| A-1034 | $CH_2CF_3$ | H | Me | F | $CH_2CH_2S(=O)_2CF_3$ | O |
| A-1035 | $CH_2CF_3$ | H | Me | F | $CH_2CH_2CH_2S(=O)_2CF_3$ | O |
| A-1036 | $CH_2CF_3$ | H | Me | F | $CH_2CH_2CH_2CH_2S(=O)_2CF_3$ | O |
| A-1037 | $CH_2CF_3$ | H | Me | F | $CH_2CH_2CH_2CH_2CH_2S(=O)_2CF_3$ | O |
| A-1038 | $CH_2CF_3$ | H | Me | F | $CH_2CH_2CH_2CH_2CH_2CH_2S(=O)_2CF_3$ | O |
| A-1039 | $CH_2CF_3$ | H | Me | F | $CH_2CH_2CH_2CH_2CH_2CH_2CH_2S(=O)_2CF_3$ | O |
| A-1040 | $CH_2CF_3$ | H | Me | F | $CH_2CH_2CH_2CH_2CH_2CH_2CH_2CH_2S(=O)_2CF_3$ | O |
| A-1041 | $CH_2CF_3$ | H | Me | F | $CH_2CH_2S(=O)_2CH_2CF_3$ | O |
| A-1042 | $CH_2CF_3$ | H | Me | F | $CH_2CH_2CH_2S(=O)_2CH_2CF_3$ | O |
| A-1043 | $CH_2CF_3$ | H | Me | F | $CH_2CH_2CH_2CH_2S(=O)_2CH_2CF_3$ | O |
| A-1044 | $CH_2CF_3$ | H | Me | F | $CH_2CH_2CH_2CH_2CH_2S(=O)_2CH_2CF_3$ | O |
| A-1045 | $CH_2CF_3$ | H | Me | F | $CH_2CH_2CH_2CH_2CH_2CH_2S(=O)_2CH_2CF_3$ | O |
| A-1046 | $CH_2CF_3$ | H | Me | F | $CH_2CH(Me)S(=O)_2CH_2CF_3$ | O |
| A-1047 | $CH_2CF_3$ | H | Me | F | $CH_2CH_2CH_2S(=O)_2$(c-Pr) | O |
| A-1048 | $CH_2CF_3$ | H | Me | F | $CH_2CH_2CH_2CH_2S(=O)_2$(c-Pr) | O |
| A-1049 | $CH_2CF_3$ | H | Me | F | $CH_2CH_2CH_2CH_2CH_2S(=O)_2$(c-Pr) | O |
| A-1050 | $CH_2CF_3$ | H | Me | F | $CH_2CH_2CH_2S(=O)_2$[c-Hex(4,4-$F_2$)] | O |

TABLE 25

| Compound Number | $R^1$ | $R^2$ | $R^3$ | $R^4$ | $R^5$ | A |
|---|---|---|---|---|---|---|
| A-1051 | $CH_2CF_3$ | H | Me | F | $CH_2CH_2CH_2CH_2S(=O)_2$[c-Hex(4,4-$F_2$)] | O |
| A-1052 | $CH_2CF_3$ | H | Me | F | $CH_2CH_2CH_2CH_2CH_2S(=O)_2$[c-Hex(4,4-$F_2$)] | O |
| A-1053 | $CH_2CF_3$ | H | Me | F | $CH_2CH_2CH_2C(=O)H$ | O |
| A-1054 | $CH_2CF_3$ | H | Me | F | $CH_2CH_2CH_2CH_2C(=O)H$ | O |
| A-1055 | $CH_2CF_3$ | H | Me | F | $CH_2CH_2CH_2CH_2CH_2C(=O)H$ | O |
| A-1056 | $CH_2CF_3$ | H | Me | F | $CH_2CH_2CH_2C(=O)$(t-Bu) | O |
| A-1057 | $CH_2CF_3$ | H | Me | F | $CH_2CH_2CH_2CH_2C(=O)$(t-Bu) | O |
| A-1058 | $CH_2CF_3$ | H | Me | F | $CH_2CH_2CH_2CH_2CH_2C(=O)$(t-Bu) | O |
| A-1059 | $CH_2CF_3$ | H | Me | F | $CH_2CH_2CH_2C(=O)CF_3$ | O |
| A-1060 | $CH_2CF_3$ | H | Me | F | $CH_2CH_2CH_2CH_2C(=O)CF_3$ | O |
| A-1061 | $CH_2CF_3$ | H | Me | F | $CH_2CH_2CH_2CH_2CH_2C(=O)CF_3$ | O |
| A-1062 | $CH_2CF_3$ | H | Me | F | $CH_2C(=O)Ph$ | O |
| A-1063 | $CH_2CF_3$ | H | Me | F | $CH_2C(=O)Ph$(4-Cl) | O |
| A-1064 | $CH_2CF_3$ | H | Me | F | $CH_2C(=O)Ph(4-CF_3)$ | O |
| A-1065 | $CH_2CF_3$ | H | Me | F | $CH_2CH_2C(=O)Ph(4-CF_3)$ | O |
| A-1066 | $CH_2CF_3$ | H | Me | F | $CH_2CH_2CH_2C(=O)Ph(4-CF_3)$ | O |
| A-1067 | $CH_2CF_3$ | H | Me | F | $CH_2CH_2CH_2CH_2C(=O)Ph(4-CF_3)$ | O |
| A-1068 | $CH_2CF_3$ | H | Me | F | $CH_2CH_2CH_2CH_2CH_2C(=O)Ph(4-CF_3)$ | O |
| A-1069 | $CH_2CF_3$ | H | Me | F | $CH_2C(=O)OEt$ | O |
| A-1070 | $CH_2CF_3$ | H | Me | F | $CH_2CH_2C(=O)O$(t-Bu) | O |
| A-1071 | $CH_2CF_3$ | H | Me | F | $CH_2CH_2CH_2C(=O)OEt$ | O |

TABLE 25-continued

| Compound Number | $R^1$ | $R^2$ | $R^3$ | $R^4$ | $R^5$ | A |
|---|---|---|---|---|---|---|
| A-1072 | $CH_2CF_3$ | H | Me | F | $CH_2CH_2CH_2C(=O)O$(t-Bu) | O |
| A-1073 | $CH_2CF_3$ | H | Me | F | $CH_2CH_2CH_2CH_2C(=O)O$(t-Bu) | O |
| A-1074 | $CH_2CF_3$ | H | Me | F | $CH_2CH_2CH_2CH_2CH_2C(=O)O$(t-Bu) | O |
| A-1075 | $CH_2CF_3$ | H | Me | F | $CH_2CH_2CH_2CH_2CH_2CH_2C(=O)O$(t-Bu) | O |
| A-1076 | $CH_2CF_3$ | H | Me | F | $CH_2CH_2CH_2CH_2CH_2CH_2CH_2C(=O)OEt$ | O |
| A-1077 | $CH_2CF_3$ | H | Me | F | $CH_2CH_2C(=O)OCH_2CF_3$ | O |
| A-1078 | $CH_2CF_3$ | H | Me | F | $CH_2CH_2CH_2C(=O)OCH_2CF_3$ | O |
| A-1079 | $CH_2CF_3$ | H | Me | F | $CH_2CH_2CH_2CH_2C(=O)OCH_2CF_3$ | O |
| A-1080 | $CH_2CF_3$ | H | Me | F | $CH_2CH_2CH_2CH_2CH_2C(=O)OCH_2CF_3$ | O |
| A-1081 | $CH_2CF_3$ | H | Me | F | $CH_2CH_2C(=O)NH$(t-Bu) | O |
| A-1082 | $CH_2CF_3$ | H | Me | F | $CH_2CH_2CH_2C(=O)NH$(t-Bu) | O |
| A-1083 | $CH_2CF_3$ | H | Me | F | $CH_2CH_2CH_2C(=O)NH$(t-Pen) | O |
| A-1084 | $CH_2CF_3$ | H | Me | F | $CH_2CH_2CH_2CH_2C(=O)NH$(t-Bu) | O |
| A-1085 | $CH_2CF_3$ | H | Me | F | $CH_2CH_2C(=O)NHCH_2CF_3$ | O |
| A-1086 | $CH_2CF_3$ | H | Me | F | $CH_2CH_2CH_2C(=O)NHCH_2CF_3$ | O |
| A-1087 | $CH_2CF_3$ | H | Me | F | $CH_2CH_2CH_2CH_2C(=O)NHCH_2CF_3$ | O |
| A-1088 | $CH_2CF_3$ | H | Me | F | $CH_2CH_2SC(=O)N(Me)_2$ | O |
| A-1089 | $CH_2CF_3$ | H | Me | F | $CH_2CH_2CH_2SC(=O)N(Me)_2$ | O |
| A-1090 | $CH_2CF_3$ | H | Me | F | $CH_2CH_2CH_2SC(=O)NH$(t-Bu) | O |
| A-1091 | $CH_2CF_3$ | H | Me | F | $CH_2CH_2CH_2CH_2CH_2SC(=O)NH$(t-Bu) | O |
| A-1092 | $CH_2CF_3$ | H | Me | F | $CH_2CH_2SC(=O)NHCH_2CF_3$ | O |
| A-1093 | $CH_2CF_3$ | H | Me | F | $CH_2CH_2CH_2SC(=O)NHCH_2CF_3$ | O |
| A-1094 | $CH_2CF_3$ | H | Me | F | $CH_2CH_2CH_2CH_2SC(=O)NHCH_2CF_3$ | O |

TABLE 26

| Compound Number | $R^1$ | $R^2$ | $R^3$ | $R^4$ | $R^5$ | A |
|---|---|---|---|---|---|---|
| A-1095 | $CH_2CF_3$ | H | Me | F | $CH_2CH_2CH_2OC(=O)H$ | O |
| A-1096 | $CH_2CF_3$ | H | Me | F | $CH_2CH_2CH_2CH_2OC(=O)H$ | O |
| A-1097 | $CH_2CF_3$ | H | Me | F | $CH_2CH_2CH_2CH_2CH_2OC(=O)H$ | O |
| A-1098 | $CH_2CF_3$ | H | Me | F | $CH_2CH_2CH_2OC(=O)Me$ | O |
| A-1099 | $CH_2CF_3$ | H | Me | F | $CH_2CH_2CH_2CH_2OC(=O)Me$ | O |
| A-1100 | $CH_2CF_3$ | H | Me | F | $CH_2CH_2CH_2CH_2CH_2OC(=O)Me$ | O |
| A-1101 | $CH_2CF_3$ | H | Me | F | $CH_2CH_2OC(=O)CF_3$ | O |
| A-1102 | $CH_2CF_3$ | H | Me | F | $CH_2CH_2CH_2OC(=O)CF_3$ | O |
| A-1103 | $CH_2CF_3$ | H | Me | F | $CH_2CH_2CH_2CH_2OC(=O)CF_3$ | O |
| A-1104 | $CH_2CF_3$ | H | Me | F | $CH_2CH_2CH_2CH_2CH_2OC(=O)Ph(4\text{-}CF_3)$ | O |
| A-1105 | $CH_2CF_3$ | H | Me | F | $CH_2CH_2OC(=O)Ph$ | O |
| A-1106 | $CH_2CF_3$ | H | Me | F | $CH_2CH_2OC(=O)Ph(4\text{-}CF_3)$ | O |
| A-1107 | $CH_2CF_3$ | H | Me | F | $CH_2CH_2CH_2OC(=O)Ph(4\text{-}CF_3)$ | O |
| A-1108 | $CH_2CF_3$ | H | Me | F | $CH_2CH_2CH_2CH_2OC(=O)Ph(4\text{-}CF_3)$ | O |
| A-1109 | $CH_2CF_3$ | H | Me | F | $CH_2CH_2CH_2CH_2CH_2OC(=O)Ph(4\text{-}CF_3)$ | O |
| A-1110 | $CH_2CF_3$ | H | Me | F | $CH_2CH_2OS(=O)Me$ | O |
| A-1111 | $CH_2CF_3$ | H | Me | F | $CH_2CH_2CH_2OS(=O)Me$ | O |
| A-1112 | $CH_2CF_3$ | H | Me | F | $CH_2CH_2CH_2CH_2OS(=O)Me$ | O |
| A-1113 | $CH_2CF_3$ | H | Me | F | $CH_2CH_2CH_2CH_2CH_2OS(=O)Me$ | O |
| A-1114 | $CH_2CF_3$ | H | Me | F | $CH_2CH_2CH_2CH_2CH_2CH_2OS(=O)Me$ | O |
| A-1115 | $CH_2CF_3$ | H | Me | F | $CH_2CH_2OS(=O)CF_3$ | O |
| A-1116 | $CH_2CF_3$ | H | Me | F | $CH_2CH_2CH_2OS(=O)CF_3$ | O |
| A-1117 | $CH_2CF_3$ | H | Me | F | $CH_2CH_2CH_2CH_2OS(=O)CF_3$ | O |
| A-1118 | $CH_2CF_3$ | H | Me | F | $CH_2CH_2CH_2CH_2CH_2OS(=O)CF_3$ | O |
| A-1119 | $CH_2CF_3$ | H | Me | F | $CH_2CH_2CH_2CH_2CH_2CH_2OS(=O)CF_3$ | O |
| A-1120 | $CH_2CF_3$ | H | Me | F | $CH_2CH_2OS(=O)Ph$ | O |
| A-1121 | $CH_2CF_3$ | H | Me | F | $CH_2CH_2OS(=O)Ph(4\text{-}Me)$ | O |
| A-1122 | $CH_2CF_3$ | H | Me | F | $CH_2CH_2CH_2OS(=O)Ph$ | O |
| A-1123 | $CH_2CF_3$ | H | Me | F | $CH_2CH_2CH_2OS(=O)Ph(4\text{-}Me)$ | O |
| A-1124 | $CH_2CF_3$ | H | Me | F | $CH_2CH_2OS(=O)_2Me$ | O |
| A-1125 | $CH_2CF_3$ | H | Me | F | $CH_2CH_2CH_2OS(=O)_2Me$ | O |
| A-1126 | $CH_2CF_3$ | H | Me | F | $CH_2CH_2CH_2OS(=O)_2CF_3$ | O |
| A-1127 | $CH_2CF_3$ | H | Me | F | $CH_2CH_2CH_2CH_2OS(=O)_2CF_3$ | O |
| A-1128 | $CH_2CF_3$ | H | Me | F | $CH_2CH_2CH_2CH_2CH_2OS(=O)_2CF_3$ | O |
| A-1129 | $CH_2CF_3$ | H | Me | F | $CH_2CH_2CH_2CH_2CH_2OS(=O)_2CF_2CF_2CF_2CF_3$ | O |
| A-1130 | $CH_2CF_3$ | H | Me | F | $CH_2CH_2OS(=O)_2Ph$ | O |
| A-1131 | $CH_2CF_3$ | H | Me | F | $CH_2CH_2OS(=O)_2Ph(4\text{-}Me)$ | O |
| A-1132 | $CH_2CF_3$ | H | Me | F | $CH_2CH_2CH_2OS(=O)_2Ph$ | O |
| A-1133 | $CH_2CF_3$ | H | Me | F | $CH_2CH_2CH_2OS(=O)_2Ph(4\text{-}Me)$ | O |
| A-1134 | $CH_2CF_3$ | H | Me | F | $CH_2CH_2NH_2$ | O |
| A-1135 | $CH_2CF_3$ | H | Me | F | $CH_2CH_2CH_2NH_2$ | O |

TABLE 26-continued

| Compound Number | $R^1$ | $R^2$ | $R^3$ | $R^4$ | $R^5$ | A |
|---|---|---|---|---|---|---|
| A-1136 | $CH_2CF_3$ | H | Me | F | $CH_2CH_2CH_2CH_2NH_2$ | O |
| A-1137 | $CH_2CF_3$ | H | Me | F | $CH_2CH_2CH_2CH_2CH_2NH_2$ | O |
| A-1138 | $CH_2CF_3$ | H | Me | F | $CH_2CH_2CH_2CH_2CH_2CH_2NH_2$ | O |

TABLE 27

| Compound Number | $R^1$ | $R^2$ | $R^3$ | $R^4$ | $R^5$ | A |
|---|---|---|---|---|---|---|
| A-1139 | $CH_2CF_3$ | H | Me | F | $CH_2CH_2CH_2CH_2CH_2CH_2CH_2NH_2$ | O |
| A-1140 | $CH_2CF_3$ | H | Me | F | $CH_2CH(Me)NH_2$ | O |
| A-1141 | $CH_2CF_3$ | H | Me | F | $CH_2C$*$H(Me)NH_2$:(R) | O |
| A-1142 | $CH_2CF_3$ | H | Me | F | $CH_2C$*$H(Me)NH_2$:(S) | O |
| A-1143 | $CH_2CF_3$ | H | Me | F | $CH_2CH(Et)NH_2$ | O |
| A-1144 | $CH_2CF_3$ | H | Me | F | $CH_2CH$(i-Pr)$NH_2$ | O |
| A-1145 | $CH_2CF_3$ | H | Me | F | $CH(Me)CH_2NH_2$ | O |
| A-1146 | $CH_2CF_3$ | H | Me | F | $CH(Et)CH_2NH_2$ | O |
| A-1147 | $CH_2CF_3$ | H | Me | F | CH(i-Pr)$CH_2NH_2$ | O |
| A-1148 | $CH_2CF_3$ | H | Me | F | $CH_2CH_2CH(Me)NH_2$ | O |
| A-1149 | $CH_2CF_3$ | H | Me | F | $CH_2CH(Me)CH_2NH_2$ | O |
| A-1150 | $CH_2CF_3$ | H | Me | F | $CH(Me)CH_2CH_2NH_2$ | O |
| A-1151 | $CH_2CF_3$ | H | Me | F | $CH_2CH(Me)NH$(c-Pr) | O |
| A-1152 | $CH_2CF_3$ | H | Me | F | $CH_2CH(Me)NHOMe$ | O |
| A-1153 | $CH_2CF_3$ | H | Me | F | $CH_2CH(Me)N(OMe)S({=}O)_2Ph(2\text{-}NO_2)$ | O |
| A-1154 | $CH_2CF_3$ | H | Me | F | $CH_2CH(Me)N(OMe)S({=}O)_2Ph(4\text{-}NO_2)$ | O |
| A-1155 | $CH_2CF_3$ | H | Me | F | $CH_2CH_2N(Me)$(t-Bu) | O |
| A-1156 | $CH_2CF_3$ | H | Me | F | $CH_2CH_2CH_2N(Me)$(t-Bu) | O |
| A-1157 | $CH_2CF_3$ | H | Me | F | $CH_2CH_2CH_2CH_2N(Me)$(t-Bu) | O |
| A-1158 | $CH_2CF_3$ | H | Me | F | $CH_2CH_2NHCH_2CF_3$ | O |
| A-1159 | $CH_2CF_3$ | H | Me | F | $CH_2CH_2CH_2NHCH_2CF_3$ | O |
| A-1160 | $CH_2CF_3$ | H | Me | F | $CH_2CH_2CH_2CH_2NHCH_2CF_3$ | O |
| A-1161 | $CH_2CF_3$ | H | Me | F | $CH_2CH_2NHC({=}O)C(Me)(CF_3)_2$ | O |
| A-1162 | $CH_2CF_3$ | H | Me | F | $CH_2CH_2NHC({=}O)Me$ | O |
| A-1163 | $CH_2CF_3$ | H | Me | F | $CH_2CH_2NHC({=}O)$(t-Bu) | O |
| A-1164 | $CH_2CF_3$ | H | Me | F | $CH_2CH_2CH_2CH_2NHC({=}O)CH(CH_3)_2$ | O |
| A-1165 | $CH_2CF_3$ | H | Me | F | $CH_2CH_2CH_2CH_2NHC({=}O)$(t-Bu) | O |
| A-1166 | $CH_2CF_3$ | H | Me | F | $CH_2CH_2CH_2CH_2NHC({=}O)CH_2$(t-Bu) | O |
| A-1167 | $CH_2CF_3$ | H | Me | F | $CH_2CH_2NHC({=}O)CF_3$ | O |
| A-1168 | $CH_2CF_3$ | H | Me | F | $CH_2CH_2NHC({=}O)CH_2CF_3$ | O |
| A-1169 | $CH_2CF_3$ | H | Me | F | $CH_2CH_2NHC({=}O)CF_2CF_3$ | O |
| A-1170 | $CH_2CF_3$ | H | Me | F | $CH_2CH_2CH_2NHC({=}O)CF_3$ | O |
| A-1171 | $CH_2CF_3$ | H | Me | F | $CH_2CH_2CH_2NHC({=}O)CH_2CF_3$ | O |
| A-1172 | $CH_2CF_3$ | H | Me | F | $CH_2CH_2CH_2NHC({=}O)CF_2CF_3$ | O |
| A-1173 | $CH_2CF_3$ | H | Me | F | $CH_2CH_2CH_2CH_2NHC({=}O)CF_3$ | O |
| A-1174 | $CH_2CF_3$ | H | Me | F | $CH_2CH_2CH_2CH_2NHC({=}O)CH_2CF_3$ | O |
| A-1175 | $CH_2CF_3$ | H | Me | F | $CH_2CH_2CH_2CH_2NHC({=}O)CF_2CF_3$ | O |
| A-1176 | $CH_2CF_3$ | H | Me | F | $CH_2CH_2CH_2CH_2NHC({=}O)CF(CF_3)_2$ | O |
| A-1177 | $CH_2CF_3$ | H | Me | F | $CH_2CH_2CH_2CH_2NHC({=}O)CCl_3$ | O |
| A-1178 | $CH_2CF_3$ | H | Me | F | $CH_2CH(Me)NHC({=}O)CF_3$ | O |
| A-1179 | $CH_2CF_3$ | H | Me | F | $CH_2CH_2NHC({=}O)Ph$ | O |
| A-1180 | $CH_2CF_3$ | H | Me | F | $CH_2CH_2NHC({=}O)Ph(4\text{-}CF_3)$ | O |
| A-1181 | $CH_2CF_3$ | H | Me | F | $CH_2CH_2CH_2NHC({=}O)Ph(4\text{-}CF_3)$ | O |
| A-1182 | $CH_2CF_3$ | H | Me | F | $CH_2CH_2CH_2CH_2NHC({=}O)Ph(4\text{-}CF_3)$ | O |

TABLE 28

| Compound Number | $R^1$ | $R^2$ | $R^3$ | $R^4$ | $R^5$ | A |
|---|---|---|---|---|---|---|
| A-1183 | $CH_2CF_3$ | H | Me | F | $CH_2CH_2NHC({=}O)O$(t-Bu) | O |
| A-1184 | $CH_2CF_3$ | H | Me | F | $CH_2CH_2CH_2NHC({=}O)O$(t-Bu) | O |
| A-1185 | $CH_2CF_3$ | H | Me | F | $CH_2CH_2CH_2CH_2NHC({=}O)O$(t-Bu) | O |
| A-1186 | $CH_2CF_3$ | H | Me | F | $CH_2CH_2CH_2CH_2NHC({=}O)OCH(CH_3)_2$ | O |
| A-1187 | $CH_2CF_3$ | H | Me | F | $CH_2CH(Me)NHC({=}O)O$(t-Bu) | O |
| A-1188 | $CH_2CF_3$ | H | Me | F | $CH_2C$*$H(Me)NHC({=}O)O$(t-Bu):(R) | O |
| A-1189 | $CH_2CF_3$ | H | Me | F | $CH_2C$*$H(Me)NHC({=}O)O$(t-Bu):(S) | O |
| A-1190 | $CH_2CF_3$ | H | Me | F | $CH_2CH(Et)NHC({=}O)O$(t-Bu) | O |
| A-1191 | $CH_2CF_3$ | H | Me | F | $CH_2CH$(i-Pr)$NHC({=}O)O$(t-Bu) | O |

TABLE 28-continued

| Compound Number | $R^1$ | $R^2$ | $R^3$ | $R^4$ | $R^5$ | A |
|---|---|---|---|---|---|---|
| A-1192 | $CH_2CF_3$ | H | Me | F | $CH(Me)CH_2NHC({=}O)O(t\text{-}Bu)$ | O |
| A-1193 | $CH_2CF_3$ | H | Me | F | $CH(Et)CH_2NHC({=}O)O(t\text{-}Bu)$ | O |
| A-1194 | $CH_2CF_3$ | H | Me | F | $CH(i\text{-}Pr)CH_2NHC({=}O)O(t\text{-}Bu)$ | O |
| A-1195 | $CH_2CF_3$ | H | Me | F | $CH_2CH(Me)CH_2NHC({=}O)O(t\text{-}Bu)$ | O |
| A-1196 | $CH_2CF_3$ | H | Me | F | $CH_2CH_2NHC({=}O)OC(Me)_2CF_3$ | O |
| A-1197 | $CH_2CF_3$ | H | Me | F | $CH_2CH_2CH_2NHC({=}O)OCH_2CF_3$ | O |
| A-1198 | $CH_2CF_3$ | H | Me | F | $CH_2CH_2CH_2NHC({=}O)OCH_2CH_2CF_3$ | O |
| A-1199 | $CH_2CF_3$ | H | Me | F | $CH_2CH_2CH_2CH_2NHC({=}O)OCH_2CCl_3$ | O |
| A-1200 | $CH_2CF_3$ | H | Me | F | $CH_2CH_2CH_2CH_2NHC({=}O)OCH_2CF_3$ | O |
| A-1201 | $CH_2CF_3$ | H | Me | F | $CH2CH_2NHC({=}O)NH(t\text{-}Bu)$ | O |
| A-1202 | $CH_2CF_3$ | H | Me | F | $CH_2CH_2CH_2NHC({=}O)NH(t\text{-}Bu)$ | O |
| A-1203 | $CH_2CF_3$ | H | Me | F | $CH_2CH_2CH_2CH_2NHC({=}O)NHEt$ | O |
| A-1204 | $CH_2CF_3$ | H | Me | F | $CH_2CH_2CH_2CH_2NHC({=}O)NH(t\text{-}Bu)$ | O |
| A-1205 | $CH_2CF_3$ | H | Me | F | $CH_2CH_2CH_2NHC({=}O)NHCH_2CCl_3$ | O |
| A-1206 | $CH_2CF_3$ | H | Me | F | $CH_2CH_2CH_2NHC({=}O)NHCH_2CH_2F$ | O |
| A-1207 | $CH_2CF_3$ | H | Me | F | $CH_2CH_2CH_2NHC({=}O)NHCH_2CF_3$ | O |
| A-1208 | $CH_2CF_3$ | H | Me | F | $CH_2CH_2CH_2CH_2NHC({=}O)NHCH_2CCl_3$ | O |
| A-1209 | $CH_2CF_3$ | H | Me | F | $CH_2CH_2CH_2CH_2NHC({=}O)NHCH_2CH_2F$ | O |
| A-1210 | $CH_2CF_3$ | H | Me | F | $CH_2CH_2CH_2CH_2NHC({=}O)NHCH_2CF_3$ | O |
| A-1211 | $CH_2CF_3$ | H | Me | F | $CH_2CH_2NHS({=}O)Me$ | O |
| A-1212 | $CH_2CF_3$ | H | Me | F | $CH_2CH_2CH_2NHS({=}O)Me$ | O |
| A-1213 | $CH_2CF_3$ | H | Me | F | $CH_2CH_2CH_2CH_2NHS({=}O)Me$ | O |
| A-1214 | $CH_2CF_3$ | H | Me | F | $CH_2CH_2CH_2CH_2NHS({=}O)CH(CH_3)_2$ | O |
| A-1215 | $CH_2CF_3$ | H | Me | F | $CH_2CH_2CH_2CH_2CH_2NHS({=}O)Me$ | O |
| A-1216 | $CH_2CF_3$ | H | Me | F | $CH_2CH_2NHS({=}O)CHF_2$ | O |
| A-1217 | $CH_2CF_3$ | H | Me | F | $CH_2CH_2CH_2NHS({=}O)CHF_2$ | O |
| A-1218 | $CH_2CF_3$ | H | Me | F | $CH_2CH_2CH_2CH_2NHS({=}O)CHF_2$ | O |
| A-1219 | $CH_2CF_3$ | H | Me | F | $CH_2CH_2CH_2CH_2CH_2NHS({=}O)CHF_2$ | O |
| A-1220 | $CH_2CF_3$ | H | Me | F | $CH_2CH(Me)NHS({=}O)CHF_2$ | O |
| A-1221 | $CH_2CF_3$ | H | Me | F | $CH(Me)CH_2NHS({=}O)CHF_2$ | O |
| A-1222 | $CH_2CF_3$ | H | Me | F | $CH_2CH_2CH(Me)NHS({=}O)CHF_2$ | O |
| A-1223 | $CH_2CF_3$ | H | Me | F | $CH_2CH(Me)CH_2NHS({=}O)CHF_2$ | O |
| A-1224 | $CH_2CF_3$ | H | Me | F | $CH(Me)CH_2CH_2NHS({=}O)CHF_2$ | O |
| A-1225 | $CH_2CF_3$ | H | Me | F | $CH_2CH_2NHS({=}O)CF_3$ | O |
| A-1226 | $CH_2CF_3$ | H | Me | F | $CH_2CH_2CH_2NHS({=}O)CF_3$ | O |

TABLE 29

| Compound Number | $R^1$ | $R^2$ | $R^3$ | $R^4$ | $R^5$ | A |
|---|---|---|---|---|---|---|
| A-1227 | $CH_2CF_3$ | H | Me | F | $CH_2CH_2CH_2CH_2NHS({=}O)CF_3$ | O |
| A-1228 | $CH_2CF_3$ | H | Me | F | $CH_2CH_2CH_2CH_2CH_2NHS({=}O)CF_3$ | O |
| A-1229 | $CH_2CF_3$ | H | Me | F | $CH_2CH_2CH_2NHS({=}O)Ph$ | O |
| A-1230 | $CH_2CF_3$ | H | Me | F | $CH_2CH_2CH_2CH_2NHS({=}O)Ph$ | O |
| A-1231 | $CH_2CF_3$ | H | Me | F | $CH_2CH_2CH_2CH_2CH_2NHS({=}O)Ph$ | O |
| A-1232 | $CH_2CF_3$ | H | Me | F | $CH_2CH_2CH_2CH_2CH_2NHS({=}O)Ph(4\text{-}CF_3)$ | O |
| A-1233 | $CH_2CF_3$ | H | Me | F | $CH_2CH(Me)NHS({=}O)Ph(4\text{-}CF_3)$ | O |
| A-1234 | $CH_2CF_3$ | H | Me | F | $CH_2CH(Et)NHS({=}O)Ph(4\text{-}CF_3)$ | O |
| A-1235 | $CH_2CF_3$ | H | Me | F | $CH(Me)CH_2NHS({=}O)Ph(4\text{-}CF_3)$ | O |
| A-1236 | $CH_2CF_3$ | H | Me | F | $CH(Et)CH_2NHS({=}O)Ph(4\text{-}CF_3)$ | O |
| A-1237 | $CH_2CF_3$ | H | Me | F | $CH_2CH(Et)CH_2NHS({=}O)Ph(4\text{-}CF_3)$ | O |
| A-1238 | $CH_2CF_3$ | H | Me | F | $CH_2CH_2NHS({=}O)_2Me$ | O |
| A-1239 | $CH_2CF_3$ | H | Me | F | $CH_2CH_2CH_2NHS({=}O)_2Me$ | O |
| A-1240 | $CH_2CF_3$ | H | Me | F | $CH_2CH_2CH_2CH_2NHS({=}O)_2Me$ | O |
| A-1241 | $CH_2CF_3$ | H | Me | F | $CH_2CH_2CH_2CH_2NHS({=}O)_2CH(CH_3)_2$ | O |
| A-1242 | $CH_2CF_3$ | H | Me | F | $CH_2CH_2CH_2CH_2CH_2NHS({=}O)_2Me$ | O |
| A-1243 | $CH_2CF_3$ | H | Me | F | $CH_2CH_2NHS({=}O)_2CHF_2$ | O |
| A-1244 | $CH_2CF_3$ | H | Me | F | $CH_2CH_2CH_2NHS({=}O)_2CHF_2$ | O |
| A-1245 | $CH_2CF_3$ | H | Me | F | $CH_2CH_2CH_2CH_2NHS({=}O)_2CHF_2$ | O |
| A-1246 | $CH_2CF_3$ | H | Me | F | $CH_2CH_2CH_2CH_2CH_2NHS({=}O)_2CHF_2$ | O |
| A-1247 | $CH_2CF_3$ | H | Me | F | $CH_2CH(Me)NHS({=}O)_2CHF_2$ | O |
| A-1248 | $CH_2CF_3$ | H | Me | F | $CH(Me)CH_2NHS({=}O)_2CHF_2$ | O |
| A-1249 | $CH_2CF_3$ | H | Me | F | $CH_2CH_2CH(Me)NHS({=}O)_2CHF_2$ | O |
| A-1250 | $CH_2CF_3$ | H | Me | F | $CH_2CH(Me)CH_2NHS({=}O)_2CHF_2$ | O |
| A-1251 | $CH_2CF_3$ | H | Me | F | $CH(Me)CH_2CH_2NHS({=}O)_2CHF_2$ | O |
| A-1252 | $CH_2CF_3$ | H | Me | F | $CH_2CH(Me)N(Me)S({=}O)_2CHF_2$ | O |
| A-1253 | $CH_2CF_3$ | H | Me | F | $CH(Me)CH_2N(Me)S({=}O)_2CHF_2$ | O |
| A-1254 | $CH_2CF_3$ | H | Me | F | $CH_2CH_2CH(Me)N(Me)S({=}O)_2CHF_2$ | O |
| A-1255 | $CH_2CF_3$ | H | Me | F | $CH_2CH(Me)CH_2N(Me)S({=}O)_2CHF_2$ | O |
| A-1256 | $CH_2CF_3$ | H | Me | F | $CH(Me)CH_2CH_2N(Me)S({=}O)_2CHF_2$ | O |
| A-1257 | $CH_2CF_3$ | H | Me | F | $CH_2CH_2CH_2NHS({=}O)_2Ph$ | O |
| A-1258 | $CH_2CF_3$ | H | Me | F | $CH_2CH_2CH_2CH_2NHS({=}O)_2Ph$ | O |

TABLE 29-continued

| Compound Number | $R^1$ | $R^2$ | $R^3$ | $R^4$ | $R^5$ | A |
|---|---|---|---|---|---|---|
| A-1259 | $CH_2CF_3$ | H | Me | F | $CH_2CH_2CH_2CH_2CH_2NHS(=O)_2Ph$ | O |
| A-1260 | $CH_2CF_3$ | H | Me | F | $CH_2CH_2CH_2CH_2CH_2NHS(=O)_2Ph(4\text{-}CF_3)$ | O |
| A-1261 | $CH_2CF_3$ | H | Me | F | $CH_2CH(Me)NHS(=O)_2Ph(4\text{-}CF_3)$ | O |
| A-1262 | $CH_2CF_3$ | H | Me | F | $CH_2CH(Et)NHS(=O)_2Ph(4\text{-}CF_3)$ | O |
| A-1263 | $CH_2CF_3$ | H | Me | F | $CH(Me)CH_2NHS(=O)_2Ph(4\text{-}CF_3)$ | O |
| A-1264 | $CH_2CF_3$ | H | Me | F | $CH(Et)CH_2NHS(=O)_2Ph(4\text{-}CF_3)$ | O |
| A-1265 | $CH_2CF_3$ | H | Me | F | $CH_2CH(Me)CH_2NHS(=O)_2Ph(4\text{-}CF_3)$ | O |
| A-1266 | $CH_2CF_3$ | H | Me | F | $CH_2CH_2SiMe_3$ | O |
| A-1267 | $CH_2CF_3$ | H | Me | F | $CH_2CH_2CH_2SiMe_3$ | O |
| A-1268 | $CH_2CF_3$ | H | Me | F | $CH_2CH_2CH_2CH_2SiMe_3$ | O |
| A-1269 | $CH_2CF_3$ | H | Me | F | $CH_2Ph$ | O |
| A-1270 | $CH_2CF_3$ | H | Me | F | $CH_2Ph(2\text{-}CF_3)$ | O |

TABLE 30

| Compound Number | $R^1$ | $R^2$ | $R^3$ | $R^4$ | $R^5$ | A |
|---|---|---|---|---|---|---|
| A-1271 | $CH_2CF_3$ | H | Me | F | $CH_2Ph(3\text{-}CF_3)$ | O |
| A-1272 | $CH_2CF_3$ | H | Me | F | $CH_2Ph(4\text{-}CF_3)$ | O |
| A-1273 | $CH_2CF_3$ | H | Me | F | $CH_2Ph(2\text{-}OCF_3)$ | O |
| A-1274 | $CH_2CF_3$ | H | Me | F | $CH_2Ph(3\text{-}OCF_3)$ | O |
| A-1275 | $CH_2CF_3$ | H | Me | F | $CH_2Ph(4\text{-}OCF_3)$ | O |
| A-1276 | $CH_2CF_3$ | H | Me | F | $CH_2Ph(2\text{-}SCF_3)$ | O |
| A-1277 | $CH_2CF_3$ | H | Me | F | $CH_2Ph(3\text{-}SCF_3)$ | O |
| A-1278 | $CH_2CF_3$ | H | Me | F | $CH_2Ph(4\text{-}SCF_3)$ | O |
| A-1279 | $CH_2CF_3$ | H | Me | F | $CH_2Ph(3\text{-}CH_2SCF_3)$ | O |
| A-1280 | $CH_2CF_3$ | H | Me | F | $CH_2Ph(4\text{-}F)$ | O |
| A-1281 | $CH_2CF_3$ | H | Me | F | $CH_2Ph(4\text{-}Cl)$ | O |
| A-1282 | $CH_2CF_3$ | H | Me | F | $CH_2Ph(4\text{-}Br)$ | O |
| A-1283 | $CH_2CF_3$ | H | Me | F | $CH_2Ph(4\text{-}Me)$ | O |
| A-1284 | $CH_2CF_3$ | H | Me | F | $CH_2Ph[4\text{-}(t\text{-}Bu)]$ | O |
| A-1285 | $CH_2CF_3$ | H | Me | F | $CH_2Ph(4\text{-}CN)$ | O |
| A-1286 | $CH_2CF_3$ | H | Me | F | $CH_2Ph(4\text{-}NO_2)$ | O |
| A-1287 | $CH_2CF_3$ | H | Me | F | $CH_2Ph(4\text{-}OCHF_2)$ | O |
| A-1288 | $CH_2CF_3$ | H | Me | F | $CH_2Ph(4\text{-}SCHF_2)$ | O |
| A-1289 | $CH_2CF_3$ | H | Me | F | $CH_2Ph(4\text{-}CH_2SCF_3)$ | O |
| A-1290 | $CH_2CF_3$ | H | Me | F | $CH_2Ph[4\text{-}CF(CF_3)_2]$ | O |
| A-1291 | $CH_2CF_3$ | H | Me | F | $CH_2Ph(4\text{-}CH_2SCF_3)$ | O |
| A-1292 | $CH_2CF_3$ | H | Me | F | $CH_2Ph[4\text{-}Ph(4\text{-}CF_3)]$ | O |
| A-1293 | $CH_2CF_3$ | H | Me | F | $CH_2Ph(2,4\text{-}Cl_2)$ | O |
| A-1294 | $CH_2CF_3$ | H | Me | F | $CH_2Ph[2,5\text{-}(CF_3)_2]$ | O |
| A-1295 | $CH_2CF_3$ | H | Me | F | $CH_2Ph(3,4\text{-}Cl_2)$ | O |
| A-1296 | $CH_2CF_3$ | H | Me | F | $CH_2Ph(3\text{-}CF_3\text{-}4\text{-}F)$ | O |
| A-1297 | $CH_2CF_3$ | H | Me | F | $CH_2Ph(3\text{-}CF_3\text{-}4\text{-}Cl)$ | O |
| A-1298 | $CH_2CF_3$ | H | Me | F | $CH_2Ph(3\text{-}F\text{-}4\text{-}CF_3)$ | O |
| A-1299 | $CH_2CF_3$ | H | Me | F | $CH_2Ph(2,4,6\text{-}F_3)$ | O |
| A-1300 | $CH_2CF_3$ | H | Me | F | $CH_2Ph(3,4,5\text{-}F_3)$ | O |
| A-1301 | $CH_2CF_3$ | H | Me | F | $CH_2Ph(2,3,4\text{-}F_3)$ | O |
| A-1302 | $CH_2CF_3$ | H | Me | F | $CH_2Ph(3,4,5\text{-}Cl_3)$ | O |
| A-1303 | $CH_2CF_3$ | H | Me | F | $CH_2CH_2Ph$ | O |
| A-1304 | $CH_2CF_3$ | H | Me | F | $CH_2CH_2Ph(4\text{-}F)$ | O |
| A-1305 | $CH_2CF_3$ | H | Me | F | $CH_2CH_2Ph(4\text{-}Cl)$ | O |
| A-1306 | $CH_2CF_3$ | H | Me | F | $CH_2CH_2Ph(4\text{-}Br)$ | O |
| A-1307 | $CH_2CF_3$ | H | Me | F | $CH_2CH_2Ph[4\text{-}(t\text{-}Bu)]$ | O |
| A-1308 | $CH_2CF_3$ | H | Me | F | $CH_2CH_2Ph(2\text{-}CF_3)$ | O |
| A-1309 | $CH_2CF_3$ | H | Me | F | $CH_2CH_2Ph(3\text{-}CF_3)$ | O |
| A-1310 | $CH_2CF_3$ | H | Me | H | $CH_2CH_2Ph(4\text{-}CF_3)$ | O |
| A-1311 | $CH_2CF_3$ | H | Me | F | $CH_2CH_2Ph(4\text{-}CF_3)$ | O |
| A-1312 | $CH_2CF_3$ | H | Me | F | $CH_2CH_2Ph(4\text{-}CF(CF_3)_2)$ | O |
| A-1313 | $CH_2CF_3$ | H | Me | F | $CH_2CH_2Ph[4\text{-}(c\text{-}Pr)]$ | O |
| A-1314 | $CH_2CF_3$ | H | Me | F | $CH_2CH_2Ph\{4\text{-}[c\text{-}Pr(2,2\text{-}F_2)]\}$ | O |

TABLE 31

| Compound Number | $R^1$ | $R^2$ | $R^3$ | $R^4$ | $R^5$ | A |
|---|---|---|---|---|---|---|
| A-1315 | $CH_2CF_3$ | H | Me | F | $CH_2CH_2Ph(4\text{-}OMe)$ | O |
| A-1316 | $CH_2CF_3$ | H | Me | F | $CH_2CH_2Ph(3\text{-}OCF_3)$ | O |
| A-1317 | $CH_2CF_3$ | H | Me | F | $CH_2CH_2Ph(4\text{-}OCHF_2)$ | O |
| A-1318 | $CH_2CF_3$ | H | Me | F | $CH_2CH_2Ph(4\text{-}OCF_3)$ | O |

TABLE 31-continued

| Compound Number | $R^1$ | $R^2$ | $R^3$ | $R^4$ | $R^5$ | A |
|---|---|---|---|---|---|---|
| A-1319 | $CH_2CF_3$ | H | Me | F | $CH_2CH_2Ph(4\text{-}SMe)$ | O |
| A-1320 | $CH_2CF_3$ | H | Me | F | $CH_2CH_2Ph(4\text{-}SCHF_2)$ | O |
| A-1321 | $CH_2CF_3$ | H | Me | F | $CH_2CH_2Ph(4\text{-}SCF_3)$ | O |
| A-1322 | $CH_2CF_3$ | H | Me | F | $CH_2CH_2Ph[4\text{-}S(=O)Me]$ | O |
| A-1323 | $CH_2CF_3$ | H | Me | F | $CH_2CH_2Ph[4\text{-}S(=O)CF_3]$ | O |
| A-1324 | $CH_2CF_3$ | H | Me | F | $CH_2CH_2Ph[4\text{-}S(=O)_2Me]$ | O |
| A-1325 | $CH_2CF_3$ | H | Me | F | $CH_2CH_2Ph[4\text{-}S(=O)_2CF_3]$ | O |
| A-1326 | $CH_2CF_3$ | H | Me | F | $CH_2CH_2Ph(4\text{-}CH_2SMe)$ | O |
| A-1327 | $CH_2CF_3$ | H | Me | F | $CH_2CH_2Ph(4\text{-}CH_2SCF_3)$ | O |
| A-1328 | $CH_2CF_3$ | H | Me | F | $CH_2CH_2Ph[4\text{-}OS(=O)_2Me]$ | O |
| A-1329 | $CH_2CF_3$ | H | Me | F | $CH_2CH_2Ph[4\text{-}OS(=O)_2CF_3]$ | O |
| A-1330 | $CH_2CF_3$ | H | Me | F | $CH_2CH_2Ph[4\text{-}Ph(4\text{-}CF_3)]$ | O |
| A-1331 | $CH_2CF_3$ | H | Me | F | $CH_2CH_2Ph(4\text{-}CH_2Ph)$ | O |
| A-1332 | $CH_2CF_3$ | H | Me | F | $CH_2CH_2Ph(4\text{-}OCH_2Ph)$ | O |
| A-1333 | $CH_2CF_3$ | H | Me | F | $CH_2CH_2Ph(4\text{-}CN)$ | O |
| A-1334 | $CH_2CF_3$ | H | Me | F | $CH_2CH_2Ph(4\text{-}NO_2)$ | O |
| A-1335 | $CH_2CF_3$ | H | Me | F | $CH_2CH_2Ph(2,4\text{-}Cl_2)$ | O |
| A-1336 | $CH_2CF_3$ | H | Me | F | $CH_2CH_2Ph(3,4\text{-}Cl_2)$ | O |
| A-1337 | $CH_2CF_3$ | H | Me | F | $CH_2CH_2Ph(3\text{-}CF_3\text{-}4\text{-}F)$ | O |
| A-1338 | $CH_2CF_3$ | H | Me | F | $CH_2CH_2Ph(2\text{-}CF_3\text{-}4\text{-}F)$ | O |
| A-1339 | $CH_2CF_3$ | H | Me | F | $CH_2CH_2Ph(3\text{-}F\text{-}4\text{-}CF_3)$ | O |
| A-1340 | $CH_2CF_3$ | H | Me | F | $CH_2CH_2Ph(2\text{-}F\text{-}4\text{-}CF_3)$ | O |
| A-1341 | $CH_2CF_3$ | H | Me | F | $CH_2CH_2Ph(3\text{-}Cl\text{-}4\text{-}OCHF_2)$ | O |
| A-1342 | $CH_2CF_3$ | H | Me | F | $CH_2CH_2Ph(3,4,5\text{-}Cl_3)$ | O |
| A-1343 | $CH_2CF_3$ | H | Me | F | $CH_2CH_2Ph(2,3,4\text{-}F_3)$ | O |
| A-1344 | $CH_2CF_3$ | H | Me | F | $CH_2CH_2Ph(2,4,5\text{-}F_3)$ | O |
| A-1345 | $CH_2CF_3$ | H | Me | F | $CH_2CH_2Ph(3,4,5\text{-}F_3)$ | O |
| A-1346 | $CH_2CF_3$ | H | Me | F | $CH_2CH_2Ph(2,4,6\text{-}F_3)$ | O |
| A-1347 | $CH_2CF_3$ | H | Me | F | $CH_2CH_2CH_2Ph$ | O |
| A-1348 | $CH_2CF_3$ | H | Me | F | $CH_2CH_2CH_2Ph(3\text{-}CF_3)$ | O |
| A-1349 | $CH_2CF_3$ | H | Me | F | $CH_2CH_2CH_2Ph(4\text{-}CF_3)$ | O |
| A-1350 | $CH_2CF_3$ | H | Me | F | $CH_2CH_2CH_2Ph(4\text{-}F)$ | O |
| A-1351 | $CH_2CF_3$ | H | Me | F | $CH_2CH_2CH_2Ph[4\text{-}(t\text{-}Bu)]$ | O |
| A-1352 | $CH_2CF_3$ | H | Me | F | $CH_2CH_2CH_2Ph(4\text{-}CN)$ | O |
| A-1353 | $CH_2CF_3$ | H | Me | F | $CH_2CH_2CH_2Ph(4\text{-}CF_3)$ | O |
| A-1354 | $CH_2CF_3$ | H | Me | F | $CH_2CH_2CH_2Ph(4\text{-}OCHF_2)$ | O |
| A-1355 | $CH_2CF_3$ | H | Me | F | $CH_2CH_2CH_2Ph(4\text{-}OCF_3)$ | O |
| A-1356 | $CH_2CF_3$ | H | Me | F | $CH_2CH_2CH_2Ph(4\text{-}SCHF_2)$ | O |
| A-1357 | $CH_2CF_3$ | H | Me | F | $CH_2CH_2CH_2Ph(4\text{-}SCF_3)$ | O |
| A-1358 | $CH_2CF_3$ | H | Me | F | $CH_2CH_2CH_2Ph[4\text{-}CF(CF_3)_2]$ | O |

TABLE 32

| Compound Number | $R^1$ | $R^2$ | $R^3$ | $R^4$ | $R^5$ | A |
|---|---|---|---|---|---|---|
| A-1359 | $CH_2CF_3$ | H | Me | F | $CH_2CH_2CH_2Ph(3,4,5\text{-}F_3)$ | O |
| A-1360 | $CH_2CF_3$ | H | Me | F | $CH_2CH_2CH_2Ph(2,4,6\text{-}F_3)$ | O |
| A-1361 | $CH_2CF_3$ | H | Me | F | $CH_2CH_2CH_2CH_2Ph$ | O |
| A-1362 | $CH_2CF_3$ | H | Me | F | $CH_2CH_2CH_2CH_2Ph(4\text{-}F)$ | O |
| A-1363 | $CH_2CF_3$ | H | Me | F | $CH_2CH_2CH_2CH_2Ph(4\text{-}CF_3)$ | O |
| A-1364 | $CH_2CF_3$ | H | Me | F | $CH_2CH_2CH_2CH_2Ph(4\text{-}OCF_3)$ | O |
| A-1365 | $CH_2CF_3$ | H | Me | F | $CH_2CH_2CH_2CH_2Ph(4\text{-}SCF_3)$ | O |
| A-1366 | $CH_2CF_3$ | H | Me | F | $CH_2CH_2CH_2CH_2CH_2Ph$ | O |

TABLE 32-continued

| Compound Number | $R^1$ | $R^2$ | $R^3$ | $R^4$ | $R^5$ | A |
|---|---|---|---|---|---|---|
| A-1367 | $CH_2CF_3$ | H | Me | F | $CH_2CH_2CH_2CH_2CH_2CH_2Ph$ | O |
| A-1368 | $CH_2CF_3$ | H | Me | F | $CH_2CF_2Ph(4-F)$ | O |
| A-1369 | $CH_2CF_3$ | H | Me | F | $CH_2CF_2Ph(4-CF_3)$ | O |
| A-1370 | $CH_2CF_3$ | H | Me | H | $CH_2CF_2Ph(3,4,5-F_3)$ | O |
| A-1371 | $CH_2CF_3$ | H | Me | F | $CH_2CF_2Ph(3,4,5-F_3)$ | O |
| A-1372 | $CH_2CF_3$ | H | Me | F | $CH_2CH_2OPh$ | O |
| A-1373 | $CH_2CF_3$ | H | Me | F | $CH_2CH_2OPh(4-F)$ | O |
| A-1374 | $CH_2CF_3$ | H | Me | F | $CH_2CH_2OPh(4-CF_3)$ | O |
| A-1375 | $CH_2CF_3$ | H | Me | F | $CH_2CH_2CH_2OPh$ | O |
| A-1376 | $CH_2CF_3$ | H | Me | F | $CH_2CH_2CH_2OPh(4-Cl)$ | O |
| A-1377 | $CH_2CF_3$ | H | Me | F | $CH_2CH_2CH_2OPh(4-CF_3)$ | O |
| A-1378 | $CH_2CF_3$ | H | Me | F | $CH_2CH_2CH_2CH_2OPh(4-CF_3)$ | O |
| A-1379 | $CH_2CF_3$ | H | Me | F | $CH_2CH_2CH_2CH_2OPh(4-OCF_3)$ | O |
| A-1380 | $CH_2CF_3$ | H | Me | F | $CH_2CH_2CH_2CH_2CH_2OPh(4-CF_3)$ | O |
| A-1381 | $CH_2CF_3$ | H | Me | F | $CH_2CH_2OCH_2Ph$ | O |
| A-1382 | $CH_2CF_3$ | H | Me | F | $CH_2CH_2CH_2OCH_2Ph$ | O |
| A-1383 | $CH_2CF_3$ | H | Me | F | $CH_2CH_2CH_2CH_2OCH_2Ph$ | O |
| A-1384 | $CH_2CF_3$ | H | Me | F | $CH_2CH_2CH_2CH_2CH_2OCH_2Ph$ | O |
| A-1385 | $CH_2CF_3$ | H | Me | F | $CH_2CH_2SPh$ | O |

TABLE 32-continued

| Compound Number | $R^1$ | $R^2$ | $R^3$ | $R^4$ | $R^5$ | A |
|---|---|---|---|---|---|---|
| A-1386 | $CH_2CF_3$ | H | Me | F | $CH_2CH_2CH_2SPh$ | O |
| A-1387 | $CH_2CF_3$ | H | Me | F | $CH_2CH_2CH_2SPh(4-F)$ | O |
| A-1388 | $CH_2CF_3$ | H | Me | F | $CH_2CH_2CH_2SPh(4-Cl)$ | O |
| A-1389 | $CH_2CF_3$ | H | Me | F | $CH_2CH_2CH_2SPh(4-Br)$ | O |
| A-1390 | $CH_2CF_3$ | H | Me | F | $CH_2CH_2CH_2SPh[4-(t-Bu)]$ | O |
| A-1391 | $CH_2CF_3$ | H | Me | F | $CH_2CH_2CH_2SPh(3-CF_3)$ | O |
| A-1392 | $CH_2CF_3$ | H | Me | F | $CH_2CH_2CH_2SPh(4-CF_3)$ | O |
| A-1393 | $CH_2CF_3$ | H | Me | F | $CH_2CH_2CH_2SPh(3-SCF_3)$ | O |
| A-1394 | $CH_2CF_3$ | H | Me | F | $CH_2CH_2CH_2SPh(4-SCF_3)$ | O |
| A-1395 | $CH_2CF_3$ | H | Me | F | $CH_2CH_2CH_2CH_2SPh$ | O |
| A-1396 | $CH_2CF_3$ | H | Me | F | $CH_2CH_2CH_2CH_2SPh(4-F)$ | O |
| A-1397 | $CH_2CF_3$ | H | Me | F | $CH_2CH_2CH_2CH_2SPh(4-Cl)$ | O |
| A-1398 | $CH_2CF_3$ | H | Me | F | $CH_2CH_2CH_2CH_2SPh[4-(t-Bu)]$ | O |
| A-1399 | $CH_2CF_3$ | H | Me | F | $CH_2CH_2CH_2CH_2SPh(4-CF_3)$ | O |
| A-1400 | $CH_2CF_3$ | H | Me | F | $CH_2CH_2CH_2CH_2CH_2SPh$ | O |
| A-1401 | $CH_2CF_3$ | H | Me | F | $CH_2CH_2CH_2CH_2CH_2SPh(4-F)$ | O |
| A-1402 | $CH_2CF_3$ | H | Me | F | $CH_2CH_2CH_2CH_2CH_2SPh(4-Cl)$ | O |

TABLE 33

| Compound Number | $R^1$ | $R^2$ | $R^3$ | $R^4$ | $R^5$ | A |
|---|---|---|---|---|---|---|
| A-1403 | $CH_2CF_3$ | H | Me | F | $CH_2CH_2CH_2CH_2CH_2SPh(4-CF_3)$ | O |
| A-1404 | $CH_2CF_3$ | H | Me | F | $CH_2CH_2S({=}O)Ph$ | O |
| A-1405 | $CH_2CF_3$ | H | Me | F | $CH_2CH_2CH_2S({=}O)Ph$ | O |
| A-1406 | $CH_2CF_3$ | H | Me | F | $CH_2CH_2CH_2S({=}O)Ph(4-F)$ | O |
| A-1407 | $CH_2CF_3$ | H | Me | F | $CH_2CH_2CH_2S({=}O)Ph[4-(t-Bu)]$ | O |
| A-1408 | $CH_2CF_3$ | H | Me | F | $CH_2CH_2CH_2S({=}O)Ph(4-CF_3)$ | O |
| A-1409 | $CH_2CF_3$ | H | Me | F | $CH_2CH_2S({=}O)_2Ph$ | O |
| A-1410 | $CH_2CF_3$ | H | Me | F | $CH_2CH_2S({=}O)_2Ph(4-CF_3)$ | O |
| A-1411 | $CH_2CF_3$ | H | Me | F | $CH_2CH_2CH_2S({=}O)_2Ph(4-F)$ | O |
| A-1412 | $CH_2CF_3$ | H | Me | F | $CH_2CH_2CH_2S({=}O)_2Ph(4-Cl)$ | O |
| A-1413 | $CH_2CF_3$ | H | Me | F | $CH_2CH_2CH_2S({=}O)_2Ph(4-CF_3)$ | O |
| A-1414 | $CH_2CF_3$ | H | Me | F | $CH_2CH_2CH_2CH_2S({=}O)_2Ph$ | O |
| A-1415 | $CH_2CF_3$ | H | Me | F | $CH_2CH_2CH_2CH_2S({=}O)_2Ph(4-Cl)$ | O |
| A-1416 | $CH_2CF_3$ | H | Me | F | $CH_2CH_2CH_2CH_2S({=}O)_2Ph(4-CF_3)$ | O |
| A-1417 | $CH_2CF_3$ | H | Me | F | $CH_2CH_2SCH_2Ph$ | O |
| A-1418 | $CH_2CF_3$ | H | Me | F | $CH_2CH_2CH_2SCH_2Ph$ | O |
| A-1419 | $CH_2CF_3$ | H | Me | F | $CH_2CH_2CH_2SCH_2Ph(2-Cl)$ | O |
| A-1420 | $CH_2CF_3$ | H | Me | F | $CH_2CH_2CH_2SCH_2Ph(3-Cl)$ | O |
| A-1421 | $CH_2CF_3$ | H | Me | F | $CH_2CH_2CH_2SCH_2Ph(4-Cl)$ | O |
| A-1422 | $CH_2CF_3$ | H | Me | F | $CH_2CH_2CH_2SCH_2Ph(2-SCF_3)$ | O |
| A-1423 | $CH_2CF_3$ | H | Me | F | $CH_2CH_2CH_2SCH_2Ph(3-CF_3)$ | O |
| A-1424 | $CH_2CF_3$ | H | Me | F | $CH_2CH_2CH_2SCH_2Ph(4-CF_3)$ | O |
| A-1425 | $CH_2CF_3$ | H | Me | F | $CH_2CH_2CH_2SCH_2Ph(4-NO_2)$ | O |
| A-1426 | $CH_2CF_3$ | H | Me | F | $CH_2CH_2CH_2CH_2SCH_2Ph$ | O |
| A-1427 | $CH_2CF_3$ | H | Me | F | $CH_2CH_2CH_2CH_2SCH_2Ph(4-Cl)$ | O |
| A-1428 | $CH_2CF_3$ | H | Me | F | $CH_2CH_2CH_2CH_2SCH_2Ph(4-CF_3)$ | O |
| A-1429 | $CH_2CF_3$ | H | Me | F | $CH_2CH_2CH_2CH_2SCH_2Ph(4-CN)$ | O |
| A-1430 | $CH_2CF_3$ | H | Me | F | $CH_2CH_2CH_2CH_2CH_2SCH_2Ph$ | O |
| A-1431 | $CH_2CF_3$ | H | Me | F | $CH_2CH_2SCH_2CH_2Ph$ | O |
| A-1432 | $CH_2CF_3$ | H | Me | F | $CH_2CH_2CH_2SCH_2CH_2Ph$ | O |
| A-1433 | $CH_2CF_3$ | H | Me | F | $CH_2CH_2CH_2CH_2SCH_2CH_2Ph$ | O |
| A-1434 | $CH_2CF_3$ | H | Me | F | $CH_2CH_2SCH(Me)Ph$ | O |
| A-1435 | $CH_2CF_3$ | H | Me | F | $CH_2CH_2CH_2SCH(Me)Ph$ | O |
| A-1436 | $CH_2CF_3$ | H | Me | F | $CH_2CH_2CH_2CH_2SCH(Me)Ph$ | O |
| A-1437 | $CH_2CF_3$ | H | Me | F | $CH_2CH_2S({=}O)CH_2Ph$ | O |
| A-1438 | $CH_2CF_3$ | H | Me | F | $CH_2CH_2S({=}O)CH_2Ph(4-CF_3)$ | O |
| A-1439 | $CH_2CF_3$ | H | Me | F | $CH_2CH_2CH2S({=}O)CH_2Ph$ | O |
| A-1440 | $CH_2CF_3$ | H | Me | F | $CH_2CH_2CH_2S({=}O)CH_2Ph(2-SCF_3)$ | O |
| A-1441 | $CH_2CF_3$ | H | Me | F | $CH_2CH_2CH_2S({=}O)CH_2Ph(4-SCF_3)$ | O |
| A-1442 | $CH_2CF_3$ | H | Me | F | $CH_2CH_2CH_2S({=}O)CH_2Ph(4-Cl)$ | O |
| A-1443 | $CH_2CF_3$ | H | Me | F | $CH_2CH_2CH_2S({=}O)CH_2Ph(4-CF_3)$ | O |
| A-1444 | $CH_2CF_3$ | H | Me | F | $CH_2CH_2CH_2CH_2S({=}O)CH_2Ph$ | O |
| A-1445 | $CH_2CF_3$ | H | Me | F | $CH_2CH_2CH_2CH_2S({=}O)CH_2Ph(4-CF_3)$ | O |
| A-1446 | $CH_2CF_3$ | H | Me | F | $CH_2CH_2CH_2CH_2CH_2S({=}O)CH_2Ph(4-CF_3)$ | O |

TABLE 34

| Compound Number | $R^1$ | $R^2$ | $R^3$ | $R^4$ | $R^5$ | A |
|---|---|---|---|---|---|---|
| A-1447 | $CH_2CF_3$ | H | Me | F | $CH_2CH_2S(=O)_2CH_2Ph$ | O |
| A-1448 | $CH_2CF_3$ | H | Me | F | $CH_2CH_2S(=O)_2CH_2Ph(4\text{-}CF_3)$ | O |
| A-1449 | $CH_2CF_3$ | H | Me | F | $CH_2CH_2CH_2S(=O)_2CH_2Ph$ | O |
| A-1450 | $CH_2CF_3$ | H | Me | F | $CH_2CH_2CH_2S(=O)_2CH_2Ph(4\text{-}Cl)$ | O |
| A-1451 | $CH_2CF_3$ | H | Me | F | $CH_2CH_2CH_2S(=O)_2CH_2Ph(4\text{-}CF_3)$ | O |
| A-1452 | $CH_2CF_3$ | H | Me | F | $CH_2CH_2CH_2CH_2S(=O)_2CH_2Ph$ | O |
| A-1453 | $CH_2CF_3$ | H | Me | F | $CH_2CH_2CH_2CH_2S(=O)_2CH_2Ph(4\text{-}CF_3)$ | O |
| A-1454 | $CH_2CF_3$ | H | Me | F | $CH_2CH_2CH_2CH_2CH_2S(=O)_2CH_2Ph$ | O |
| A-1455 | $CH_2CF_3$ | H | Me | F | $CH_2CH_2CH_2CH_2CH_2S(=O)_2CH_2Ph(4\text{-}CF_3)$ | O |
| A-1456 | $CH_2CF_3$ | H | Me | F | $CH_2CH_2ON=CH(t\text{-}Bu)$ | O |
| A-1457 | $CH_2CF_3$ | H | Me | F | $CH_2CH_2CH_2ON=CH(t\text{-}Bu)$ | O |
| A-1458 | $CH_2CF_3$ | H | Me | F | $CH_2CH_2CH_2CH_2ON=C(Me)(c\text{-}Pr)$ | O |
| A-1459 | $CH_2CF_3$ | H | Me | F | $CH_2CH_2ON=C(Me)CF_3$ | O |
| A-1460 | $CH_2CF_3$ | H | Me | F | $CH_2CH_2CH_2ON=CHCF_3$ | O |
| A-1461 | $CH_2CF_3$ | H | Me | F | $CH_2CH_2CH_2ON=C(Me)CF_3$ | O |
| A-1462 | $CH_2CF_3$ | H | Me | F | $CH_2CH_2CH_2ON=C(Me)CCl_3$ | O |
| A-1463 | $CH_2CF_3$ | H | Me | F | $CH_2CH_2CH_2CH_2ON=CHCF_3$ | O |
| A-1464 | $CH_2CF_3$ | H | Me | F | $CH_2CH_2CH_2CH_2ON=C(Me)CF_3$ | O |
| A-1465 | $CH_2CF_3$ | H | Me | F | $CH_2CH_2CH_2CH_2CH_2ON=C(Me)CF_3$ | O |
| A-1466 | $CH_2CF_3$ | H | Me | F | $CH_2CH_2ON=CHPh$ | O |
| A-1467 | $CH_2CF_3$ | H | Me | F | $CH_2CH_2ON=CHPh(4\text{-}CF_3)$ | O |
| A-1468 | $CH_2CF_3$ | H | Me | F | $CH_2CH_2ON=CHPh(4\text{-}SCF_3)$ | O |
| A-1469 | $CH_2CF_3$ | H | Me | F | $CH_2CH_2CH_2ON=CHPh(3\text{-}CF_3)$ | O |
| A-1470 | $CH_2CF_3$ | H | Me | F | $CH_2CH_2CH_2ON=CHPh(4\text{-}CF_3)$ | O |
| A-1471 | $CH_2CF_3$ | H | Me | F | $CH_2CH_2CH_2ON=CHPh(4\text{-}SCF_3)$ | O |
| A-1472 | $CH_2CF_3$ | H | Me | F | $CH_2CH_2CH_2ON=C(Me)Ph(4\text{-}CF_3)$ | O |
| A-1473 | $CH_2CF_3$ | H | Me | F | $CH_2CH_2CH_2CH_2ON=CHPh(4\text{-}SCF_3)$ | O |
| A-1474 | $CH_2CF_3$ | H | Me | F | $CH_2CH_2$(adamant-1-yl) | O |
| A-1475 | $CH_2CF_3$ | H | Me | F | $CH_2CH_2CH_2$(3-$CF_3$-pyrazol-1-yl) | O |
| A-1476 | $CH_2CF_3$ | H | Me | F | $CH_2CH_2CH_2CH_2$(3-$CF_3$-pyrazol-1-yl) | O |
| A-1477 | $CH_2CF_3$ | H | Me | F | $CH_2CH_2CH_2CH_2CH_2$(3-$CF_3$-pyrazol-1-yl) | O |
| A-1478 | $CH_2CF_3$ | H | Me | F | $CH_2$(1-Me-4-$CF_3$-imidazol-5-yl) | O |
| A-1479 | $CH_2CF_3$ | H | Me | F | $CH_2CH_2$(1-Me-4-$CF_3$-imidazol-5-yl) | O |
| A-1480 | $CH_2CF_3$ | H | Me | F | $CH_2CH_2CH_2$(1-Me-4-$CF_3$-imidazol-5-yl) | O |
| A-1481 | $CH_2CF_3$ | H | Me | F | $CH_2CH_2CH_2$(3-$CF_3$-1,2,4-triazol-1-yl) | O |
| A-1482 | $CH_2CF_3$ | H | Me | F | $CH_2CH_2CH_2CH_2$(3-$CF_3$-1,2,4-triazol-1-yl) | O |
| A-1483 | $CH_2CF_3$ | H | Me | F | $CH_2CH_2CH_2CH_2CH_2$(3-$CF_3$-1,2,4-triazol-1-yl) | O |
| A-1484 | $CH_2CF_3$ | H | Me | F | $CH_2CH_2CH_2$(4-$CF_3$-thiazol-2-yl) | O |
| A-1485 | $CH_2CF_3$ | H | Me | F | $CH_2CH_2CH_2CH_2$(4-$CF_3$-thiazol-2-yl) | O |
| A-1486 | $CH_2CF_3$ | H | Me | F | $CH_2CH_2CH_2CH_2CH_2$(4-$CF_3$-thiazol-2-yl) | O |
| A-1487 | $CH_2CF_3$ | H | Me | F | $CH_2CH_2CH_2$(2-$CF_3$-pyridin-5-yl) | O |
| A-1488 | $CH_2CF_3$ | H | Me | F | $CH_2CH_2CH_2CH_2$(2-$CF_3$-pyridin-5-yl) | O |
| A-1489 | $CH_2CF_3$ | H | Me | F | $CH_2CH_2CH_2CH_2CH_2$(2-$CF_3$-pyridin-5-yl) | O |
| A-1490 | $CH_2CF_3$ | H | Me | F | $CH_2$(4-$CF_3$-pyrimidin-2-yl) | O |

TABLE 35

| Compound Number | $R^1$ | $R^2$ | $R^3$ | $R^4$ | $R^5$ | A |
|---|---|---|---|---|---|---|
| A-1491 | $CH_2CF_3$ | H | Me | F | $CH_2CH_2$(4-$CF_3$-pyrimidin-2-yl) | O |
| A-1492 | $CH_2CF_3$ | H | Me | F | $CH_2CH_2CH_2$(4-$CF_3$-pyrimidin-2-yl) | O |
| A-1493 | $CH_2CF_3$ | H | Me | F | $CH_2CH_2O$(3-Cl-5-$CF_3$-pyridin-2-yl) | O |
| A-1494 | $CH_2CF_3$ | H | Me | F | $CH_2CH_2CH_2O$(3-Cl-5-$CF_3$-pyridin-2-yl) | O |
| A-1495 | $CH_2CF_3$ | H | Me | F | $CH_2CH_2CH_2CH_2O$(3-Cl-5-$CF_3$-pyridin-2-yl) | O |
| A-1496 | $CH_2CF_3$ | H | Me | F | $CH_2CH_2CH_2CH_2CH_2O$(3-Cl-5-$CF_3$-pyridin-2-yl) | O |
| A-1497 | $CH_2CF_3$ | H | Me | F | $CH_2CH_2N$(Phth) | O |
| A-1498 | $CH_2CF_3$ | H | Me | F | $CH_2CH_2CH_2N$(Phth) | O |
| A-1499 | $CH_2CF_3$ | H | Me | F | $CH_2CH_2CH_2CH_2N$(Phth) | O |
| A-1500 | $CH_2CF_3$ | H | Me | F | $CH_2CH_2CH_2CH_2CH_2N$(Phth) | O |
| A-1501 | $CH_2CF_3$ | H | Me | F | $CH_2CH(Me)CH_2N$(Phth) | O |
| A-1502 | $CH_2CF_3$ | H | Me | F | $CH_2$[1,3-dioxolan(2-$CF_3$)-2-yl] | O |
| A-1503 | $CH_2CF_3$ | H | Me | F | $CH_2$(azetidin-3-yl) | O |
| A-1504 | $CH_2CF_3$ | H | Me | F | $CH_2$(pyrrolidin-3-yl) | O |
| A-1505 | $CH_2CF_3$ | H | Me | F | $CH_2$(piperidin-3-yl) | O |
| A-1506 | $CH_2CF_3$ | H | Me | F | $CH_2${azetidin[1-C(=O)O(t-Bu)]-3-yl} | O |
| A-1507 | $CH_2CF_3$ | H | Me | F | $CH_2${pyrrolidin[1-C(=O)O(t-Bu)]-3-yl} | O |
| A-1508 | $CH_2CF_3$ | H | Me | F | $CH_2${piperidin[1-C(=O)O(t-Bu)]-3-yl} | O |
| A-1509 | $CH_2CF_3$ | H | Me | F | $CH_2${azetidin[1-C(=O)$CF_3$]-3-yl} | O |
| A-1510 | $CH_2CF_3$ | H | Me | F | $CH_2${azetidin[1-S(=O)$_2CF_3$]-3-yl} | O |
| A-1511 | $CH_2CF_3$ | H | Me | F | $CH_2${pyrrolidin[1-C(=O)$CF_3$]-3-yl} | O |
| A-1512 | $CH_2CF_3$ | H | Me | F | $CH_2${pyrrolidin[1-S(=O)$_2CF_3$]-3-yl} | O |
| A-1513 | $CH_2CF_3$ | H | Me | F | $CH_2${piperidin[1-C(=O)$CF_3$]-3-yl} | O |

TABLE 35-continued

| Compound Number | $R^1$ | $R^2$ | $R^3$ | $R^4$ | $R^5$ | A |
|---|---|---|---|---|---|---|
| A-1514 | $CH_2CF_3$ | H | Me | F | $CH_2$\{piperidin[1-S(=O)$_2$CF$_3$]-3-yl\} | O |
| A-1515 | $CH_2CF_3$ | H | Me | F | $CH_2CH_2CH_2CN$ | O |
| A-1516 | $CH_2CF_3$ | H | Me | F | $CH_2CH_2CH_2CH_2CN$ | O |
| A-1517 | $CH_2CF_3$ | H | Me | F | $CH_2CH_2CH_2CH_2CH_2CN$ | O |
| A-1518 | $CH_2CF_3$ | H | Me | F | $CH_2CH_2CH_2CH_2CH_2CH_2CN$ | O |
| A-1519 | $CH_2CF_3$ | H | Me | F | $CH_2CH_2CH_2C(=O)OH$ | O |
| A-1520 | $CH_2CF_3$ | H | Me | F | $CH_2CH_2CH_2CH_2C(=O)OH$ | O |
| A-1521 | $CH_2CF_3$ | H | Me | F | $CH_2CH_2CH_2CH_2CH_2C(=O)OH$ | O |
| A-1522 | $CH_2CF_3$ | H | Me | F | $CH_2CH_2SCN$ | O |
| A-1523 | $CH_2CF_3$ | H | Me | F | $CH_2CH_2CH_2SCN$ | O |
| A-1524 | $CH_2CF_3$ | H | Me | F | $CH_2CH_2CH_2CH_2SCN$ | O |
| A-1525 | $CH_2CF_3$ | H | Me | F | $CH_2CH_2CH_2CH_2CH_2SCN$ | O |
| A-1526 | $CH_2CF_3$ | H | Me | Cl | $CH_2CH_2CH_2CH_2CH_2SCN$ | O |
| A-1527 | $CH_2CF_3$ | H | Me | F | $CH_2CH_2CH_2CH_2CH_2CH_2SCN$ | O |
| A-1528 | $CH_2CF_3$ | H | Me | F | $CH_2CH_2CH_2CH_2CH_2CH_2CH_2SCN$ | O |
| A-1529 | $CH_2CF_3$ | H | Me | F | $CH_2CH_2CH_2CH_2CH_2CH_2CH_2CH_2SCN$ | O |
| A-1530 | $CH_2CF_3$ | H | Me | F | $CH_2CH_2CH(Me)SCN$ | O |
| A-1531 | $CH_2CF_3$ | H | Me | F | $CH_2CH(Me)CH_2SCN$ | O |
| A-1532 | $CH_2CF_3$ | H | Me | F | $CH(Me)CH_2CH_2SCN$ | O |
| A-1533 | $CH_2CF_3$ | H | Me | F | $CH_2CH_2CH_2CH(Me)SCN$ | O |
| A-1534 | $CH_2CF_3$ | H | Me | F | $CH_2CH_2CH(Me)CH_2SCN$ | O |

TABLE 36

| Compound Number | $R^1$ | $R^2$ | $R^3$ | $R^4$ | $R^5$ | A |
|---|---|---|---|---|---|---|
| A-1535 | $CH_2CF_3$ | H | Me | F | $CH_2CH(Me)CH_2CH_2SCN$ | O |
| A-1536 | $CH_2CF_3$ | H | Me | F | $CH(Me)CH_2CH_2CH_2SCN$ | O |
| A-1537 | $CH_2CF_3$ | H | Me | F | $CH_2CH_2CH_2CH_2CH(Me)SCN$ | O |
| A-1538 | $CH_2CF_3$ | H | Me | F | $CH_2CH_2CH_2CH(Me)CH_2SCN$ | O |
| A-1539 | $CH_2CF_3$ | H | Me | F | $CH_2CH_2CH(Me)CH_2CH_2SCN$ | O |
| A-1540 | $CH_2CF_3$ | H | Me | F | $CH_2CH(Me)CH_2CH_2CH_2SCN$ | O |
| A-1541 | $CH_2CF_3$ | H | Me | F | $CH(Me)CH_2CH_2CH_2CH_2SCN$ | O |
| A-1542 | $CH_2CF_3$ | H | Me | F | $CH_2CH_2ONH_2$ | O |
| A-1543 | $CH_2CF_3$ | H | Me | F | $CH_2CH_2CH_2ONH_2$ | O |
| A-1544 | $CH_2CF_3$ | H | Me | F | $CH_2CH_2CH_2CH_2ONH_2$ | O |
| A-1545 | $CH_2CF_3$ | H | Me | F | $CH_2CH_2CH_2CH_2CH_2ONH_2$ | O |
| A-1546 | $CH_2CF_3$ | H | Me | F | $CH_2CH_2CH_2CH_2CH_2CH_2ONH_2$ | O |
| A-1547 | Et | H | Cl | F | Me | O |
| A-1548 | Et | H | Cl | F | Et | O |
| A-1549 | Et | H | Cl | F | n-Pr | O |
| A-1550 | Et | H | Cl | F | i-Pr | O |
| A-1551 | Et | H | Cl | F | n-Bu | O |
| A-1552 | Et | H | Cl | F | n-Pen | O |
| A-1553 | Et | H | Cl | F | n-Hex | O |
| A-1554 | Et | H | Cl | F | n-Heptyl | O |
| A-1555 | Et | H | Cl | F | n-Octyl | O |
| A-1556 | Et | H | Cl | F | n-Nonyl | O |
| A-1557 | Et | H | Cl | F | n-Decyl | O |
| A-1558 | Et | H | Cl | F | c-Pr | O |
| A-1559 | Et | H | Cl | F | c-Pen | O |
| A-1560 | Et | H | Cl | F | c-Hex | O |
| A-1561 | Et | H | Cl | F | $CH_2C(Me)=CH_2$ | O |
| A-1562 | Et | H | Cl | F | $CH_2CH_2CH=CH_2$ | O |
| A-1563 | Et | H | Cl | F | $CH_2CH_2CH=C(CH_3)_2$ | O |
| A-1564 | Et | H | Cl | F | $CH_2CH_2CH_2CH=CH_2$ | O |
| A-1565 | Et | H | Cl | F | $CH_2CH_2CH_2CH=C(CH_3)_2$ | O |
| A-1566 | Et | H | Cl | F | $CH_2CH_2CH_2CH_2CH=CH_2$ | O |
| A-1567 | Et | H | Cl | F | $CH_2CH_2CH_2CH_2CH=C(CH_3)_2$ | O |
| A-1568 | Et | H | Cl | F | $CH_2CH_2CH \equiv CH$ | O |
| A-1569 | Et | H | Cl | F | $CH_2CH_2CH_2CH \equiv CH$ | O |
| A-1570 | Et | H | Cl | F | $CH_2CH_2CH_2CH_2CH \equiv CH$ | O |
| A-1571 | Et | H | Cl | F | $CH_2CH_2CH_2Cl$ | O |
| A-1572 | Et | H | Cl | F | $CH_2CH_2CH_2Br$ | O |
| A-1573 | Et | H | Cl | F | $CH_2CH_2CH_2CH_2Cl$ | O |
| A-1574 | Et | H | Cl | F | $CH_2CH_2CH_2CH_2Br$ | O |
| A-1575 | Et | H | Cl | F | $CH_2CH_2CH_2CH_2CH_2Cl$ | O |
| A-1576 | Et | H | Cl | F | $CH_2CH_2CH_2CH_2CH_2Br$ | O |
| A-1577 | Et | H | Cl | Cl | $CH_2CH_2CH_2CH_2CH_2Br$ | O |
| A-1578 | Et | H | Cl | F | $CH_2CH_2CH_2CH_2CH_2CH_2Cl$ | O |

TABLE 37

| Compound Number | $R^1$ | $R^2$ | $R^3$ | $R^4$ | $R^5$ | A |
|---|---|---|---|---|---|---|
| A-1579 | Et | H | Cl | F | $CH_2CH_2CH_2CH_2CH_2CH_2Br$ | O |
| A-1580 | Et | H | Cl | F | $CH_2CH_2CH_2CH_2CH_2CH_2CH_2Cl$ | O |
| A-1581 | Et | H | Cl | F | $CH_2CH_2CH_2CH_2CH_2CH_2CH_2Br$ | O |
| A-1582 | Et | H | Cl | F | $CH_2CH_2CH_2CH_2CH_2CH_2CH_2CH_2Br$ | O |
| A-1583 | Et | H | Cl | F | $CH_2CH(Me)CH_2Cl$ | O |
| A-1584 | Et | H | Cl | F | $CH_2CH(Me)CH_2Br$ | O |
| A-1585 | Et | H | Cl | F | $CH_2CH_2CH(Me)CH_2CH_2Cl$ | O |
| A-1586 | Et | H | Cl | F | $CH_2CH_2CH(Me)CH_2CH_2Br$ | O |
| A-1587 | Et | H | Cl | F | $CH_2CH_2CF=CF_2$ | O |
| A-1588 | Et | H | Cl | F | $CH_2CH=C(Cl)CF_3$ | O |
| A-1589 | Et | H | Cl | F | $CH_2CH_2CH_2CF=CF_2$ | O |
| A-1590 | Et | H | Cl | F | $CH_2CH_2CH_2CH_2CF=CF_2$ | O |
| A-1591 | Et | H | Cl | F | $CH_2CH_2CH_2CH_2CH_2CF=CF_2$ | O |
| A-1592 | Et | H | Cl | F | $CH_2$(t-Bu) | O |
| A-1593 | Et | H | Cl | F | $CH_2CH_2$(t-Bu) | O |
| A-1594 | Et | H | Cl | F | $CH_2CH_2CH_2$(t-Bu) | O |
| A-1595 | Et | H | Cl | F | $CH_2CH_2CH_2CH_2$(t-Bu) | O |
| A-1596 | Et | H | Cl | F | $CH_2CH_2CH_2CH_2CH_2$(t-Bu) | O |
| A-1597 | Et | H | Cl | F | $CH_2CH_2CH_2CH_2CH_2CH_2$(t-Bu) | O |
| A-1598 | Et | H | Cl | F | $CH_2CF_3$ | O |
| A-1599 | Et | H | Cl | F | $CH_2CH_2CF_3$ | O |
| A-1600 | Et | H | Cl | F | $CH_2CH_2CH_2CF_3$ | O |
| A-1601 | Et | H | Cl | F | $CH_2CH_2CH_2CH_2CF_3$ | O |
| A-1602 | Et | H | Cl | F | $CH_2CH_2CH_2CH_2CH_2CF_3$ | O |
| A-1603 | Et | H | Cl | F | $CH_2CH_2CH_2CH_2CH_2CH_2CF_3$ | O |
| A-1604 | Et | H | Cl | F | $CH_2CH_2CH_2CH_2CH_2CH_2CH_2CF_3$ | O |
| A-1605 | Et | H | Cl | F | $CH_2CF_2CF_3$ | O |
| A-1606 | Et | H | Cl | F | $CF_2CHFCF_3$ | O |
| A-1607 | Et | H | Cl | F | $CF_2CF_2CF_3$ | O |
| A-1608 | Et | H | Cl | F | $CH_2CF_2CF_2CF_3$ | O |
| A-1609 | Et | H | Cl | F | $CH_2CF_2CF_2CF_2CF_3$ | O |
| A-1610 | Et | H | Cl | F | $CH_2CF_2CF_2CF_2CHF_2$ | O |
| A-1611 | Et | H | Cl | F | $CH(CF_3)CF_3$ | O |
| A-1612 | Et | H | Cl | F | $CH_2CF(CF_3)CF_3$ | O |
| A-1613 | Et | H | Cl | F | $CH_2CF_2CF(CF_3)CF_3$ | O |
| A-1614 | Et | H | Cl | F | $CH_2CF(CF_3)CF_2CF_3$ | O |
| A-1615 | Et | H | Cl | F | $CH_2CF_2CF_2CF(CF_3)CF_3$ | O |
| A-1616 | Et | H | Cl | F | $CH_2CF_2CF(CF_3)CF_2CF_3$ | O |
| A-1617 | Et | H | Cl | F | $CH_2CF(CF_3)CF_2CF_2CF_3$ | O |
| A-1618 | Et | H | Cl | F | $CH_2$(c-Pr) | O |
| A-1619 | Et | H | Cl | F | $CH_2$[c-Pr(1-Me)] | O |
| A-1620 | Et | H | Cl | F | $CH_2$[c-Pr(1-Ph)] | O |
| A-1621 | Et | H | Cl | F | $CH_2$[c-Pr(1-$NH_2$)] | O |
| A-1622 | Et | H | Cl | F | $CH_2$[c-Pr(1-NHC(=O)O(t-Bu)] | O |

TABLE 38

| Compound Number | $R^1$ | $R^2$ | $R^3$ | $R^4$ | $R^5$ | A |
|---|---|---|---|---|---|---|
| A-1623 | Et | H | Cl | F | $CH_2${c-Pr[1-NHS(=O)$_2CF_3$]} | O |
| A-1624 | Et | H | Cl | F | $CH_2${c-Pr[1-Ph(4-$CF_3$)]} | O |
| A-1625 | Et | H | Cl | F | $CH_2${c-Pr[1-Ph(3,4,5-$F_3$)]} | O |
| A-1626 | Et | H | Cl | F | $CH_2${c-Hex[4-(t-Bu)]} | O |
| A-1627 | Et | H | Cl | F | $CH_2$[c-Hex(4-$CF_3$)] | O |
| A-1628 | Et | H | Cl | F | $CH_2CH_2$(c-Pr) | O |
| A-1629 | Et | H | Cl | F | $CH_2CH_2$(c-Hex) | O |
| A-1630 | Et | H | Cl | F | $CH_2CH_2$[c-Hex(4-$CF_3$)] | O |
| A-1631 | Et | H | Cl | F | $CH_2CH_2$[c-Hex(4-$SCF_3$)] | O |
| A-1632 | Et | H | Cl | F | $CH_2CH_2CH_2$(c-Pr) | O |
| A-1633 | Et | H | Cl | F | $CH_2CH_2CH_2$(c-Hex) | O |
| A-1634 | Et | H | Cl | F | $CH_2CH_2CH_2${c-Hex[4-(t-Bu)]} | O |
| A-1635 | Et | H | Cl | F | $CH_2CH_2CH_2$[c-Hex(4-$CF_3$)] | O |
| A-1636 | Et | H | Cl | F | $CH_2CH_2CH_2$[c-Hex(4-$SCF_3$)] | O |
| A-1637 | Et | H | Cl | F | $CH_2CH_2CH_2CH_2$(c-Pr) | O |
| A-1638 | Et | H | Cl | F | $CH_2CH_2CH_2CH_2$(c-Hex) | O |
| A-1639 | Et | H | Cl | F | $CH_2CH_2CH_2CH_2$[c-Hex(4-$CF_3$)] | O |
| A-1640 | Et | H | Cl | F | $CH_2$[c-Pr(2,2-$F_2$)] | O |
| A-1641 | Et | H | Cl | F | $CH_2$[c-Hex(4,4-$F_2$)] | O |
| A-1642 | Et | H | Cl | F | $CH_2CH_2$[c-Pr(2,2-$F_2$)] | O |
| A-1643 | Et | H | Cl | F | $CH_2CH_2$[c-Hex(4,4-$F_2$)] | O |
| A-1644 | Et | H | Cl | F | $CH_2CH_2CH_2$[c-Pr(2,2-$F_2$)] | O |
| A-1645 | Et | H | Cl | F | $CH_2CH_2CH_2CH_2$[c-Pr(2,2-$F_2$)] | O |
| A-1646 | Et | H | Cl | F | $CH_2CH_2OH$ | O |
| A-1647 | Et | H | Cl | F | $CH_2CH_2CH_2OH$ | O |
| A-1648 | Et | H | Cl | F | $CH_2CH_2CH_2CH_2OH$ | O |
| A-1649 | Et | H | Cl | F | $CH_2CH_2CH_2CH_2CH_2OH$ | O |
| A-1650 | Et | H | Cl | F | $CH_2CH_2CH_2CH_2CH_2CH_2OH$ | O |
| A-1651 | Et | H | Cl | F | $CH_2C(=O)Me$ | O |
| A-1652 | Et | H | Cl | F | $CH_2CH(OH)Me$ | O |
| A-1653 | Et | H | Cl | F | $CH_2CH(OH)CF_3$ | O |
| A-1654 | Et | H | Cl | F | $CH_2C(OH)_2CF_3$ | O |
| A-1655 | Et | H | Cl | F | $CH_2C(CF_3)=NOH$ | O |
| A-1656 | Et | H | Cl | F | $CH_2C(CF_3)=NOMe$ | O |
| A-1657 | Et | H | Cl | F | $CH_2CH(CF_3)NH_2$ | O |
| A-1658 | Et | H | Cl | F | $CH_2CH_2OMe$ | O |
| A-1659 | Et | H | Cl | F | $CH_2CH_2CH_2OMe$ | O |
| A-1660 | Et | H | Cl | F | $CH_2CH_2CH_2CH_2OMe$ | O |
| A-1661 | Et | H | Cl | F | $CH_2CH_2CH_2CH_2CH_2OMe$ | O |
| A-1662 | Et | H | Cl | F | $CH_2CH_2CH_2CH_2CH_2CH_2OMe$ | O |
| A-1663 | Et | H | Cl | F | $CH_2CH_2OCHF_2$ | O |
| A-1664 | Et | H | Cl | F | $CH_2CH_2CH_2OCHF_2$ | O |
| A-1665 | Et | H | Cl | F | $CH_2CH_2CH_2CH_2OCHF_2$ | O |
| A-1666 | Et | H | Cl | F | $CH_2CH_2CH_2CH_2CH_2OCHF_2$ | O |

TABLE 39

| Compound Number | $R^1$ | $R^2$ | $R^3$ | $R^4$ | $R^5$ | A |
|---|---|---|---|---|---|---|
| A-1667 | Et | H | Cl | F | $CH_2CH_2CH_2CH_2CH_2CH_2OCHF_2$ | O |
| A-1668 | Et | H | Cl | F | $CH_2CH_2OCH_2CF_3$ | O |
| A-1669 | Et | H | Cl | F | $CH_2CH_2CH_2OCH_2CF_3$ | O |
| A-1670 | Et | H | Cl | F | $CH_2CH_2CH_2CH_2OCH_2CF_3$ | O |
| A-1671 | Et | H | Cl | F | $CH_2CH_2CH_2CH_2CH_2OCH_2CF_3$ | O |
| A-1672 | Et | H | Cl | F | $CH_2CH_2CH_2CH_2CH_2CH_2OCH_2CF_3$ | O |
| A-1673 | Et | H | Cl | F | $CH_2CH_2CH_2CH_2CH_2CH_2CH_2OCH_2CF_3$ | O |
| A-1674 | Et | H | Cl | F | $CH_2CH_2OC(CF_3)_3$ | O |
| A-1675 | Et | H | Cl | F | $CH_2CH_2CH_2OC(CF_3)_3$ | O |
| A-1676 | Et | H | Cl | F | $CH_2CH_2CH_2CH_2OC(CF_3)_3$ | O |
| A-1677 | Et | H | Cl | F | $CH_2CH_2CH_2CH_2CH_2OC(CF_3)_3$ | O |
| A-1678 | Et | H | Cl | F | $CF_2CHFOCF_2CF_2CF_3$ | O |
| A-1679 | Et | H | Cl | F | $CH_2CH_2O$(c-Pr) | O |
| A-1680 | Et | H | Cl | F | $CH_2CH_2O$(c-Pen) | O |
| A-1681 | Et | H | Cl | F | $CH_2CH_2O$(c-Hex) | O |
| A-1682 | Et | H | Cl | F | $CH_2CH_2CH_2O$(c-Pr) | O |
| A-1683 | Et | H | Cl | F | $CH_2CH_2CH_2O$(c-Pen) | O |
| A-1684 | Et | H | Cl | F | $CH_2CH_2CH_2O$(c-Hex) | O |
| A-1685 | Et | H | Cl | F | $CH_2CH_2CH_2CH_2O$(c-Pr) | O |
| A-1686 | Et | H | Cl | F | $CH_2CH_2CH_2CH_2O$(c-Pen) | O |
| A-1687 | Et | H | Cl | F | $CH_2CH_2CH_2CH_2O$(c-Hex) | O |
| A-1688 | Et | H | Cl | F | $CH_2CH_2O$[c-Pr(2,2-$F_2$)] | O |
| A-1689 | Et | H | Cl | F | $CH_2CH_2CH_2O$[c-Pr(2,2-$F_2$)] | O |
| A-1690 | Et | H | Cl | F | $CH_2CH_2CH_2CH_2O$[c-Pr(2,2-$F_2$)] | O |
| A-1691 | Et | H | Cl | F | $CH_2CH_2OCH_2CH_2OCH_3$ | O |
| A-1692 | Et | H | Cl | F | $CH_2CH_2OCH_2CH_2OCH_2CF_3$ | O |
| A-1693 | Et | H | Cl | F | $CH_2CF_2OCF_2CF_2OCF_3$ | O |
| A-1694 | Et | H | Cl | F | $CF_2CHFOCF_2CF_2OCF_3$ | O |
| A-1695 | Et | H | Cl | F | $CF_2CHFOCF_2CF(CF_3)OCF_2CF_2CF_3$ | O |
| A-1696 | Et | H | Cl | F | $CH_2CH_2SH$ | O |
| A-1697 | Et | H | Cl | F | $CH_2CH_2CH_2SH$ | O |
| A-1698 | Et | H | Cl | F | $CH_2CH_2CH_2CH_2SH$ | O |
| A-1699 | Et | H | Cl | F | $CH_2CH_2CH_2CH_2CH_2SH$ | O |
| A-1700 | Et | H | Cl | F | $CH_2CH_2CH_2CH_2CH_2CH_2SH$ | O |
| A-1701 | Et | H | Cl | F | $CH_2CH(SH)Me$ | O |
| A-1702 | Et | H | Cl | F | $CH_2CH[SC(=O)Me]Me$ | O |
| A-1703 | Et | H | Cl | F | $CH_2CH_2S$(t-Bu) | O |
| A-1704 | Et | H | Cl | F | $CH_2CH_2CH_2S$(t-Bu) | O |
| A-1705 | Et | H | Cl | F | $CH_2CH_2CH_2CH_2S$(t-Bu) | O |
| A-1706 | Et | H | Cl | F | $CH_2CH_2CH_2CH_2CH_2SCH_3$ | O |
| A-1707 | Et | H | Cl | F | $CH_2CH_2CH_2CH_2CH_2SCH(CH_3)_2$ | O |
| A-1708 | Et | H | Cl | F | $CH_2CH_2CH_2CH_2CH_2S$(t-Bu) | O |
| A-1709 | Et | H | Cl | F | $CH_2CH_2CH_2CH_2CH_2CH_2SCH(CH_3)_2$ | O |
| A-1710 | Et | H | Cl | F | $CH_2CH_2CH_2CH_2CH_2CH_2S$(t-Bu) | O |

TABLE 40

| Compound Number | $R^1$ | $R^2$ | $R^3$ | $R^4$ | $R^5$ | A |
|---|---|---|---|---|---|---|
| A-1711 | Et | H | Cl | F | $CH_2CH_2CH_2CH_2CH_2CH_2CH_2S$(t-Bu) | O |
| A-1712 | Et | H | Cl | F | $CH_2CH_2SCHF_2$ | O |
| A-1713 | Et | H | Cl | F | $CH_2CH_2CH_2SCHF_2$ | O |
| A-1714 | Et | H | Cl | F | $CH_2CH_2CH_2CH_2SCHF_2$ | O |
| A-1715 | Et | H | Cl | H | $CH_2CH_2CH_2CH_2CH_2SCHF_2$ | O |
| A-1716 | Et | H | Cl | F | $CH_2CH_2CH_2CH_2CH_2SCHF_2$ | O |
| A-1717 | Et | H | Cl | F | $CH_2CH_2CH_2CH_2CH_2CH_2SCHF_2$ | O |
| A-1718 | Et | H | Cl | F | $CH_2CH_2CH_2CH_2CH_2CH_2CH_2SCHF_2$ | O |
| A-1719 | Et | H | Cl | F | $CH_2CH_2SCH_2CF_3$ | O |
| A-1720 | Et | H | Cl | F | $CH_2CH_2CH_2SCH_2CF_3$ | O |
| A-1721 | Et | H | Cl | F | $CH_2CH_2CH_2CH_2SCH_2CF_3$ | O |
| A-1722 | Et | H | Cl | F | $CH_2CH_2CH_2CH_2CH_2SCH_2CF_3$ | O |
| A-1723 | Et | H | Cl | F | $CH_2CH_2CH_2CH_2CH_2CH_2SCH_2CF_3$ | O |
| A-1724 | Et | H | Cl | F | $CH_2CH_2CH_2CH_2CH_2CH_2CH_2SCH_2CF_3$ | O |
| A-1725 | Et | H | Cl | F | $CH_2CH(Me)SCH_2CF_3$ | O |
| A-1726 | Et | H | Cl | F | $CH_2CH_2SCH(CF_3)_2$ | O |
| A-1727 | Et | H | Cl | F | $CH_2CH_2CH_2SCH(CF_3)_2$ | O |
| A-1728 | Et | H | Cl | F | $CH_2CH_2CH_2CH_2SCH(CF_3)_2$ | O |
| A-1729 | Et | H | Cl | F | $CH_2CH_2CH_2CH_2CH_2SCH(CF_3)_2$ | O |
| A-1730 | Et | H | Cl | F | $CH_2CH_2CH_2CH_2CH_2CH_2SCH(CF_3)_2$ | O |
| A-1731 | Et | H | Cl | F | $CH_2CH_2CH_2CH_2CH_2SCF_2CF_3$ | O |
| A-1732 | Et | H | Cl | F | $CH_2CH_2CH_2CH_2CH_2CH_2SCF_2CF_3$ | O |
| A-1733 | Et | H | Cl | F | $CH_2CH_2CH_2CH_2CH_2CH_2SCF(CF_3)_2$ | O |
| A-1734 | Et | H | Cl | F | $CH_2CH_2CH_2CH_2CH_2CH_2CH_2SCF(CF_3)_2$ | O |
| A-1735 | Et | H | Cl | F | $CH_2CH_2CH_2CH_2CH_2SCCl_3$ | O |
| A-1736 | Et | H | Cl | F | $CH_2CH_2CH_2CH_2CH_2CH_2SCCl_3$ | O |
| A-1737 | Et | H | Cl | F | $CH_2CH_2SCH_2CH=CH_2$ | O |
| A-1738 | Et | H | Cl | F | $CH_2CH_2CH_2SCH_2CH=CH_2$ | O |
| A-1739 | Et | H | Cl | F | $CH_2CH_2CH_2CH_2SCH_2CH=CH_2$ | O |
| A-1740 | Et | H | Cl | F | $CH_2CH_2SCF=CFCF_3$ | O |
| A-1741 | Et | H | Cl | F | $CH_2CH_2CH_2SCF=CFCF_3$ | O |
| A-1742 | Et | H | Cl | F | $CH_2CH_2CH_2CH_2SCF=CFCF_3$ | O |
| A-1743 | Et | H | Cl | F | $CH_2CH_2CH_2S$(c-Pr) | O |
| A-1744 | Et | H | Cl | F | $CH_2CH_2CH_2S$(c-Hex) | O |
| A-1745 | Et | H | Cl | F | $CH_2CH_2CH_2CH_2S$(c-Pr) | O |
| A-1746 | Et | H | Cl | F | $CH_2CH_2CH_2CH_2S$(c-Hex) | O |
| A-1747 | Et | H | Cl | F | $CH_2CH_2CH_2CH_2CH_2S$(c-Pr) | O |
| A-1748 | Et | H | Cl | F | $CH_2CH_2CH_2CH_2CH_2S$(c-Hex) | O |
| A-1749 | Et | H | Cl | F | $CH_2CH_2CH_2S$[c-Hex(4,4-$F_2$)] | O |
| A-1750 | Et | H | Cl | F | $CH_2CH_2CH_2CH_2S$[c-Hex(4,4-$F_2$)] | O |
| A-1751 | Et | H | Cl | F | $CH_2CH_2CH_2CH_2CH_2S$[c-Hex(4,4-$F_2$)] | O |
| A-1752 | Et | H | Cl | F | $CH_2CH_2CH_2SCH_2$(c-Pr) | O |
| A-1753 | Et | H | Cl | F | $CH_2CH_2CH_2SCH_2$(c-Hex) | O |
| A-1754 | Et | H | Cl | F | $CH_2CH_2CH_2CH_2SCH_2$(c-Pr) | O |

TABLE 41

| Compound Number | $R^1$ | $R^2$ | $R^3$ | $R^4$ | $R^5$ | A |
|---|---|---|---|---|---|---|
| A-1755 | Et | H | Cl | F | $CH_2CH_2CH_2CH_2SCH_2$(c-Hex) | O |
| A-1756 | Et | H | Cl | F | $CH_2CH_2CH_2CH_2CH_2SCH_2$(c-Pr) | O |
| A-1757 | Et | H | Cl | F | $CH_2CH_2CH_2CH_2CH_2SCH_2$(c-Hex) | O |
| A-1758 | Et | H | Cl | F | $CH_2CH_2CH_2SCH_2$[c-Hex(4,4-$F_2$)] | O |
| A-1759 | Et | H | Cl | F | $CH_2CH_2CH_2CH_2SCH_2$[c-Hex(4,4-$F_2$)] | O |
| A-1760 | Et | H | Cl | F | $CH_2CH_2CH_2CH_2CH_2SCH_2$[c-Hex(4,4-$F_2$)] | O |
| A-1761 | Et | H | Cl | F | $CH_2CH_2CH_2SCH_2SiMe_3$ | O |
| A-1762 | Et | H | Cl | F | $CH_2CH_2CH_2CH_2SCH_2SiMe_3$ | O |
| A-1763 | Et | H | Cl | F | $CH_2CH_2CH_2CH_2CH_2SCH_2SiMe_3$ | O |
| A-1764 | Et | H | Cl | F | $CH_2CH_2OCH_2CH_2SCH_3$ | O |
| A-1765 | Et | H | Cl | F | $CH_2CH_2OCH_2CH_2SCHF_2$ | O |
| A-1766 | Et | H | Cl | F | $CH_2CH_2OCH_2CH_2SCF_3$ | O |
| A-1767 | Et | H | Cl | F | $CH_2CH_2OCH_2CH_2SCH_2CF_3$ | O |
| A-1768 | Et | H | Cl | F | $CH_2CH_2CH_2S({=}O)$(t-Bu) | O |
| A-1769 | Et | H | Cl | F | $CH_2CH_2CH_2CH_2S({=}O)$(t-Bu) | O |
| A-1770 | Et | H | Cl | F | $CH_2CH_2CH_2CH_2CH_2CH_2S({=}O)$(t-Bu) | O |
| A-1771 | Et | H | Cl | F | $CH_2CH_2S({=}O)CHF_2$ | O |
| A-1772 | Et | H | Cl | F | $CH_2CH_2CH_2S({=}O)CHF_2$ | O |
| A-1773 | Et | H | Cl | F | $CH_2CH_2CH_2CH_2S({=}O)CHF_2$ | O |
| A-1774 | Et | H | Cl | F | $CH_2CH_2CH_2CH_2CH_2S({=}O)CHF_2$ | O |
| A-1775 | Et | H | Cl | F | $CH_2CH_2CH_2CH_2CH_2CH_2S({=}O)CHF_2$ | O |
| A-1776 | Et | H | Cl | F | $CH_2CH_2CH_2CH_2CH_2CH_2CH_2S({=}O)CHF_2$ | O |
| A-1777 | Et | H | Cl | F | $CH_2CH_2S({=}O)CF_3$ | O |
| A-1778 | Et | H | Cl | F | $CH_2CH_2CH_2S({=}O)CF_3$ | O |
| A-1779 | Et | H | Cl | F | $CH_2CH_2CH_2CH_2S({=}O)CF_3$ | O |
| A-1780 | Et | H | Cl | F | $CH_2CH_2CH_2CH_2CH_2S({=}O)CF_3$ | O |
| A-1781 | Et | H | Cl | F | $CH_2CH_2CH_2CH_2CH_2CH_2S({=}O)CF_3$ | O |
| A-1782 | Et | H | Cl | F | $CH_2CH_2CH_2CH_2CH_2CH_2CH_2S({=}O)CF_3$ | O |
| A-1783 | Et | H | Cl | F | $CH_2CH_2S({=}O)CH_2CF_3$ | O |
| A-1784 | Et | H | Cl | F | $CH_2CH_2CH_2S({=}O)CH_2CF_3$ | O |
| A-1785 | Et | H | Cl | F | $CH_2CH_2CH_2CH_2S({=}O)CH_2CF_3$ | O |
| A-1786 | Et | H | Cl | F | $CH_2CH_2CH_2CH_2CH_2S({=}O)CH_2CF_3$ | O |
| A-1787 | Et | H | Cl | F | $CH_2CH_2CH_2CH_2CH_2CH_2S({=}O)CH_2CF_3$ | O |
| A-1788 | Et | H | Cl | F | $CH_2CH_2CH_2CH_2CH_2CH_2CH_2S({=}O)CH_2CF_3$ | O |
| A-1789 | Et | H | Cl | F | $CH_2CH(Me)S({=}O)CH_2CF_3$ | O |
| A-1790 | Et | H | Cl | F | $CH_2CH_2CH_2S({=}O)$(c-Pr) | O |
| A-1791 | Et | H | Cl | F | $CH_2CH_2CH_2CH_2S({=}O)$(c-Pr) | O |
| A-1792 | Et | H | Cl | F | $CH_2CH_2CH_2CH_2S({=}O)$(c-Pen) | O |
| A-1793 | Et | H | Cl | F | $CH_2CH_2CH_2CH_2S({=}O)$(c-Hex) | O |
| A-1794 | Et | H | Cl | F | $CH_2CH_2CH_2CH_2CH_2S({=}O)$(c-Pr) | O |
| A-1795 | Et | H | Cl | F | $CH_2CH_2CH_2CH_2CH_2S({=}O)$(c-Hex) | O |
| A-1796 | Et | H | Cl | F | $CH_2CH_2CH_2S({=}O)$[c-Hex(4,4-$F_2$)] | O |
| A-1797 | Et | H | Cl | F | $CH_2CH_2CH_2CH_2S({=}O)$[c-Hex(4,4-$F_2$)] | O |
| A-1798 | Et | H | Cl | F | $CH_2CH_2CH_2CH_2CH_2S({=}O)$[c-Hex(4,4-$F_2$)] | O |

TABLE 42

| Compound Number | $R^1$ | $R^2$ | $R^3$ | $R^4$ | $R^5$ | A |
|---|---|---|---|---|---|---|
| A-1799 | Et | H | Cl | F | $CH_2CH_2CH_2CH_2S({=}O)_2Me$ | O |
| A-1800 | Et | H | Cl | F | $CH_2CH_2CH_2CH_2CH_2S({=}O)_2Me$ | O |
| A-1801 | Et | H | Cl | F | $CH_2CH_2CH_2CH_2CH_2S({=}O)_2$(t-Bu) | O |
| A-1802 | Et | H | Cl | F | $CH_2CH_2S({=}O)_2CHF_2$ | O |
| A-1803 | Et | H | Cl | F | $CH_2CH_2CH_2S({=}O)_2CHF_2$ | O |
| A-1804 | Et | H | Cl | F | $CH_2CH_2CH_2CH_2S({=}O)_2CHF_2$ | O |
| A-1805 | Et | H | Cl | F | $CH_2CH_2CH_2CH_2CH_2S({=}O)_2CHF_2$ | O |
| A-1806 | Et | H | Cl | F | $CH_2CH_2CH_2CH_2CH_2CH_2S({=}O)_2CHF_2$ | O |
| A-1807 | Et | H | Cl | F | $CH_2CH_2S({=}O)_2CF_3$ | O |
| A-1808 | Et | H | Cl | F | $CH_2CH_2CH_2S({=}O)_2CF_3$ | O |
| A-1809 | Et | H | Cl | F | $CH_2CH_2CH_2CH_2S({=}O)_2CF_3$ | O |
| A-1810 | Et | H | Cl | F | $CH_2CH_2CH_2CH_2CH_2S({=}O)_2CF_3$ | O |
| A-1811 | Et | H | Cl | F | $CH_2CH_2CH_2CH_2CH_2CH_2S({=}O)_2CF_3$ | O |
| A-1812 | Et | H | Cl | F | $CH_2CH_2CH_2CH_2CH_2CH_2CH_2S({=}O)_2CF_3$ | O |
| A-1813 | Et | H | Cl | F | $CH_2CH_2CH_2CH_2CH_2CH_2CH_2CH_2S({=}O)_2CF_3$ | O |
| A-1814 | Et | H | Cl | F | $CH_2CH_2S({=}O)_2CH_2CF_3$ | O |
| A-1815 | Et | H | Cl | F | $CH_2CH_2CH_2S({=}O)_2CH_2CF_3$ | O |
| A-1816 | Et | H | Cl | F | $CH_2CH_2CH_2CH_2S({=}O)_2CH_2CF_3$ | O |
| A-1817 | Et | H | Cl | F | $CH_2CH_2CH_2CH_2CH_2S({=}O)_2CH_2CF_3$ | O |
| A-1818 | Et | H | Cl | F | $CH_2CH_2CH_2CH_2CH_2CH_2S({=}O)_2CH_2CF_3$ | O |
| A-1819 | Et | H | Cl | F | $CH_2CH(Me)S({=}O)_2CH_2CF_3$ | O |
| A-1820 | Et | H | Cl | F | $CH_2CH_2CH_2S({=}O)_2$(c-Pr) | O |
| A-1821 | Et | H | Cl | F | $CH_2CH_2CH_2CH_2S({=}O)_2$(c-Pr) | O |

TABLE 42-continued

| Compound Number | $R^1$ | $R^2$ | $R^3$ | $R^4$ | $R^5$ | A |
|---|---|---|---|---|---|---|
| A-1822 | Et | H | Cl | F | $CH_2CH_2CH_2CH_2CH_2S(=O)_2$(c-Pr) | O |
| A-1823 | Et | H | Cl | F | $CH_2CH_2CH_2S(=O)_2$[c-Hex(4,4-$F_2$)] | O |
| A-1824 | Et | H | Cl | F | $CH_2CH_2CH_2CH_2S(=O)_2$[c-Hex(4,4-$F_2$)] | O |
| A-1825 | Et | H | Cl | F | $CH_2CH_2CH_2CH_2CH_2S(=O)_2$[c-Hex(4,4-$F_2$)] | O |
| A-1826 | Et | H | Cl | F | $CH_2CH_2CH_2C(=O)H$ | O |
| A-1827 | Et | H | Cl | F | $CH_2CH_2CH_2CH_2C(=O)H$ | O |
| A-1828 | Et | H | Cl | F | $CH_2CH_2CH_2CH_2CH_2C(=O)H$ | O |
| A-1829 | Et | H | Cl | F | $CH_2CH_2CH_2C(=O)$(t-Bu) | O |
| A-1830 | Et | H | Cl | F | $CH_2CH_2CH_2CH_2C(=O)$(t-Bu) | O |
| A-1831 | Et | H | Cl | F | $CH_2CH_2CH_2CH_2CH_2C(=O)$(t-Bu) | O |
| A-1832 | Et | H | Cl | F | $CH_2CH_2CH_2C(=O)CF_3$ | O |
| A-1833 | Et | H | Cl | F | $CH_2CH_2CH_2CH_2C(=O)CF_3$ | O |
| A-1834 | Et | H | Cl | F | $CH_2CH_2CH_2CH_2CH_2C(=O)CF_3$ | O |
| A-1835 | Et | H | Cl | F | $CH_2C(=O)Ph$ | O |
| A-1836 | Et | H | Cl | F | $CH_2C(=O)Ph$(4-Cl) | O |
| A-1837 | Et | H | Cl | F | $CH_2C(=O)Ph(4\text{-}CF_3)$ | O |
| A-1838 | Et | H | Cl | F | $CH_2CH_2C(=O)Ph(4\text{-}CF_3)$ | O |
| A-1839 | Et | H | Cl | F | $CH_2CH_2CH_2C(=O)Ph(4\text{-}CF_3)$ | O |
| A-1840 | Et | H | Cl | F | $CH_2CH_2CH_2CH_2C(=O)Ph(4\text{-}CF_3)$ | O |
| A-1841 | Et | H | Cl | F | $CH_2CH_2CH_2CH_2CH_2C(=O)Ph(4\text{-}CF_3)$ | O |
| A-1842 | Et | H | Cl | F | $CH_2C(=O)OEt$ | O |

TABLE 437

| Compound Number | $R^1$ | $R^2$ | $R^3$ | $R^4$ | $R^5$ | A |
|---|---|---|---|---|---|---|
| A-1843 | Et | H | Cl | F | $CH_2CH_2C(=O)O$(t-Bu) | O |
| A-1844 | Et | H | Cl | F | $CH_2CH_2CH_2C(=O)OEt$ | O |
| A-1845 | Et | H | Cl | F | $CH_2CH_2CH_2C(=O)O$(t-Bu) | O |
| A-1846 | Et | H | Cl | F | $CH_2CH_2CH_2CH_2C(=O)O$(t-Bu) | O |
| A-1847 | Et | H | Cl | F | $CH_2CH_2CH_2CH_2CH_2C(=O)O$(t-Bu) | O |
| A-1848 | Et | H | Cl | F | $CH_2CH_2CH_2CH_2CH_2CH_2C(=O)O$(t-Bu) | O |
| A-1849 | Et | H | Cl | F | $CH_2CH_2CH_2CH_2CH_2CH_2CH_2C(=O)OEt$ | O |
| A-1850 | Et | H | Cl | F | $CH_2CH_2C(=O)OCH_2CF_3$ | O |
| A-1851 | Et | H | Cl | F | $CH_2CH_2CH_2C(=O)OCH_2CF_3$ | O |
| A-1852 | Et | H | Cl | F | $CH_2CH_2CH_2CH_2C(=O)OCH_2CF_3$ | O |
| A-1853 | Et | H | Cl | F | $CH_2CH_2CH_2CH_2CH_2C(=O)OCH_2CF_3$ | O |
| A-1854 | Et | H | Cl | F | $CH_2CH_2C(=O)NH$(t-Bu) | O |
| A-1855 | Et | H | Cl | F | $CH_2CH_2CH_2C(=O)NH$(t-Bu) | O |
| A-1856 | Et | H | Cl | F | $CH_2CH_2CH_2C(=O)NH$(t-Pen) | O |
| A-1857 | Et | H | Cl | F | $CH_2CH_2CH_2CH_2C(=O)NH$(t-Bu) | O |
| A-1858 | Et | H | Cl | F | $CH_2CH_2C(=O)NHCH_2CF_3$ | O |
| A-1859 | Et | H | Cl | F | $CH_2CH_2CH_2C(=O)NHCH_2CF_3$ | O |
| A-1860 | Et | H | Cl | F | $CH_2CH_2CH_2CH_2C(=O)NHCH_2CF_3$ | O |
| A-1861 | Et | H | Cl | F | $CH_2CH_2SC(=O)N(Me)_2$ | O |
| A-1862 | Et | H | Cl | F | $CH_2CH_2CH_2SC(=O)N(Me)_2$ | O |
| A-1863 | Et | H | Cl | F | $CH_2CH_2CH_2SC(=O)NH$(t-Bu) | O |
| A-1864 | Et | H | Cl | F | $CH_2CH_2CH_2CH_2CH_2SC(=O)NH$(t-Bu) | O |
| A-1865 | Et | H | Cl | F | $CH_2CH_2SC(=O)NHCH_2CF_3$ | O |
| A-1866 | Et | H | Cl | F | $CH_2CH_2CH_2SC(=O)NHCH_2CF_3$ | O |
| A-1867 | Et | H | Cl | F | $CH_2CH_2CH_2CH_2SC(=O)NHCH_2CF_3$ | O |
| A-1868 | Et | H | Cl | F | $CH_2CH_2CH_2OC(=O)H$ | O |
| A-1869 | Et | H | Cl | F | $CH_2CH_2CH_2CH_2OC(=O)H$ | O |
| A-1870 | Et | H | Cl | F | $CH_2CH_2CH_2CH_2CH_2OC(=O)H$ | O |
| A-1871 | Et | H | Cl | F | $CH_2CH_2CH_2OC(=O)Me$ | O |
| A-1872 | Et | H | Cl | F | $CH_2CH_2CH_2CH_2OC(=O)Me$ | O |
| A-1873 | Et | H | Cl | F | $CH_2CH_2CH_2CH_2CH_2OC(=O)Me$ | O |
| A-1874 | Et | H | Cl | F | $CH_2CH_2OC(=O)CF_3$ | O |
| A-1875 | Et | H | Cl | F | $CH_2CH_2CH_2OC(=O)CF_3$ | O |
| A-1876 | Et | H | Cl | F | $CH_2CH_2CH_2CH_2OC(=O)CF_3$ | O |
| A-1877 | Et | H | Cl | F | $CH_2CH_2CH_2CH_2CH_2OC(=O)Ph(4\text{-}CF_3)$ | O |
| A-1878 | Et | H | Cl | F | $CH_2CH_2OC(=O)Ph$ | O |
| A-1879 | Et | H | Cl | F | $CH_2CH_2OC(=O)Ph(4\text{-}CF_3)$ | O |
| A-1880 | Et | H | Cl | F | $CH_2CH_2CH_2OC(=O)Ph(4\text{-}CF_3)$ | O |
| A-1881 | Et | H | Cl | F | $CH_2CH_2CH_2CH_2OC(=O)Ph(4\text{-}CF_3)$ | O |
| A-1882 | Et | H | Cl | F | $CH_2CH_2CH_2CH_2CH_2OC(=O)Ph(4\text{-}CF_3)$ | O |
| A-1883 | Et | H | Cl | F | $CH_2CH_2OS(=O)Me$ | O |
| A-1884 | Et | H | Cl | F | $CH_2CH_2CH_2OS(=O)Me$ | O |
| A-1885 | Et | H | Cl | F | $CH_2CH_2CH_2CH_2OS(=O)Me$ | O |
| A-1886 | Et | H | Cl | F | $CH_2CH_2CH_2CH_2CH_2OS(=O)Me$ | O |

TABLE 44

| Compound Number | $R^1$ | $R^2$ | $R^3$ | $R^4$ | $R^5$ | A |
|---|---|---|---|---|---|---|
| A-1887 | Et | H | Cl | F | $CH_2CH_2CH_2CH_2CH_2CH_2OS({=}O)Me$ | O |
| A-1888 | Et | H | Cl | F | $CH_2CH_2OS({=}O)CF_3$ | O |
| A-1889 | Et | H | Cl | F | $CH_2CH_2CH_2OS({=}O)CF_3$ | O |
| A-1890 | Et | H | Cl | F | $CH_2CH_2CH_2CH_2OS({=}O)CF_3$ | O |
| A-1891 | Et | H | Cl | F | $CH_2CH_2CH_2CH_2CH_2OS({=}O)CF_3$ | O |
| A-1892 | Et | H | Cl | F | $CH_2CH_2CH_2CH_2CH_2CH_2OS({=}O)CF_3$ | O |
| A-1893 | Et | H | Cl | F | $CH_2CH_2OS({=}O)Ph$ | O |
| A-1894 | Et | H | Cl | F | $CH_2CH_2OS({=}O)Ph(4\text{-}Me)$ | O |
| A-1895 | Et | H | Cl | F | $CH_2CH_2CH_2OS({=}O)Ph$ | O |
| A-1896 | Et | H | Cl | F | $CH_2CH_2CH_2OS({=}O)Ph(4\text{-}Me)$ | O |
| A-1897 | Et | H | Cl | F | $CH_2CH_2OS({=}O)_2Me$ | O |
| A-1898 | Et | H | Cl | F | $CH_2CH_2CH_2OS({=}O)_2Me$ | O |
| A-1899 | Et | H | Cl | F | $CH_2CH_2CH_2OS({=}O)_2CF_3$ | O |
| A-1900 | Et | H | Cl | F | $CH_2CH_2CH_2CH_2OS({=}O)_2CF_3$ | O |
| A-1901 | Et | H | Cl | F | $CH_2CH_2CH_2CH_2CH_2OS({=}O)_2CF_3$ | O |
| A-1902 | Et | H | Cl | F | $CH_2CH_2CH_2CH_2CH_2OS({=}O)_2CF_2CF_2CF_2CF_3$ | O |
| A-1903 | Et | H | Cl | F | $CH_2CH_2OS({=}O)_2Ph$ | O |
| A-1904 | Et | H | Cl | F | $CH_2CH_2OS({=}O)_2Ph(4\text{-}Me)$ | O |
| A-1905 | Et | H | Cl | F | $CH_2CH_2CH_2OS({=}O)_2Ph$ | O |
| A-1906 | Et | H | Cl | F | $CH_2CH_2CH_2OS({=}O)_2Ph(4\text{-}Me)$ | O |
| A-1907 | Et | H | Cl | F | $CH_2CH_2NH_2$ | O |
| A-1908 | Et | H | Cl | F | $CH_2CH_2CH_2NH_2$ | O |
| A-1909 | Et | H | Cl | F | $CH_2CH_2CH_2CH_2NH_2$ | O |
| A-1910 | Et | H | Cl | F | $CH_2CH_2CH_2CH_2CH_2NH_2$ | O |
| A-1911 | Et | H | Cl | F | $CH_2CH_2CH_2CH_2CH_2CH_2NH_2$ | O |
| A-1912 | Et | H | Cl | F | $CH_2CH_2CH_2CH_2CH_2CH_2CH_2NH_2$ | O |
| A-1913 | Et | H | Cl | F | $CH_2CH(Me)NH_2$ | O |
| A-1914 | Et | H | Cl | F | $CH_2C^*H(Me)NH_2$:(R) | O |
| A-1915 | Et | H | Cl | F | $CH_2C^*H(Me)NH_2$:(S) | O |
| A-1916 | Et | H | Cl | F | $CH_2CH(Et)NH_2$ | O |
| A-1917 | Et | H | Cl | F | $CH_2CH(i\text{-}Pr)NH_2$ | O |
| A-1918 | Et | H | Cl | F | $CH(Me)CH_2NH_2$ | O |
| A-1919 | Et | H | Cl | F | $CH(Et)CH_2NH_2$ | O |
| A-1920 | Et | H | Cl | F | $CH(i\text{-}Pr)CH_2NH_2$ | O |
| A-1921 | Et | H | Cl | F | $CH_2CH_2CH(Me)NH_2$ | O |
| A-1922 | Et | H | Cl | F | $CH_2CH(Me)CH_2NH_2$ | O |
| A-1923 | Et | H | Cl | F | $CH(Me)CH_2CH_2NH_2$ | O |
| A-1924 | Et | H | Cl | F | $CH_2CH(Me)NH(c\text{-}Pr)$ | O |
| A-1925 | Et | H | Cl | F | $CH_2CH(Me)NHOMe$ | O |
| A-1926 | Et | H | Cl | F | $CH_2CH(Me)N(OMe)S({=}O)_2Ph(2\text{-}NO_2)$ | O |
| A-1927 | Et | H | Cl | F | $CH_2CH(Me)N(OMe)S({=}O)_2Ph(4\text{-}NO_2)$ | O |
| A-1928 | Et | H | Cl | F | $CH_2CH_2N(Me)(t\text{-}Bu)$ | O |
| A-1929 | Et | H | Cl | F | $CH_2CH_2CH_2N(Me)(t\text{-}Bu)$ | O |
| A-1930 | Et | H | Cl | F | $CH_2CH_2CH_2CH_2N(Me)(t\text{-}Bu)$ | O |

TABLE 45

| Compound Number | $R^1$ | $R^2$ | $R^3$ | $R^4$ | $R^5$ | A |
|---|---|---|---|---|---|---|
| A-1931 | Et | H | Cl | F | $CH_2CH_2NHCH_2CF_3$ | O |
| A-1932 | Et | H | Cl | F | $CH_2CH_2CH_2NHCH_2CF_3$ | O |
| A-1933 | Et | H | Cl | F | $CH_2CH_2CH_2CH_2NHCH_2CF_3$ | O |
| A-1934 | Et | H | Cl | F | $CH_2CH_2NHC({=}O)C(Me)(CF_3)_2$ | O |
| A-1935 | Et | H | Cl | F | $CH_2CH_2NHC({=}O)Me$ | O |
| A-1936 | Et | H | Cl | F | $CH_2CH_2NHC({=}O)(t\text{-}Bu)$ | O |
| A-1937 | Et | H | Cl | F | $CH_2CH_2CH_2CH_2NHC({=}O)CH(CH_3)_2$ | O |
| A-1938 | Et | H | Cl | F | $CH_2CH_2CH_2CH_2NHC({=}O)(t\text{-}Bu)$ | O |
| A-1939 | Et | H | Cl | F | $CH_2CH_2CH_2CH_2NHC({=}O)CH_2(t\text{-}Bu)$ | O |
| A-1940 | Et | H | Cl | F | $CH_2CH_2NHC({=}O)CF_3$ | O |
| A-1941 | Et | H | Cl | F | $CH_2CH_2NHC({=}O)CH_2CF_3$ | O |
| A-1942 | Et | H | Cl | F | $CH_2CH_2NHC({=}O)CF_2CF_3$ | O |
| A-1943 | Et | H | Cl | F | $CH_2CH_2CH_2NHC({=}O)CF_3$ | O |
| A-1944 | Et | H | Cl | F | $CH_2CH_2CH_2NHC({=}O)CH_2CF_3$ | O |
| A-1945 | Et | H | Cl | F | $CH_2CH_2CH_2NHC({=}O)CF_2CF_3$ | O |
| A-1946 | Et | H | Cl | F | $CH_2CH_2CH_2CH_2NHC({=}O)CF_3$ | O |
| A-1947 | Et | H | Cl | F | $CH_2CH_2CH_2CH_2NHC({=}O)CH_2CF_3$ | O |
| A-1948 | Et | H | Cl | F | $CH_2CH_2CH_2CH_2NHC({=}O)CF_2CF_3$ | O |
| A-1949 | Et | H | Cl | F | $CH_2CH_2CH_2CH_2NHC({=}O)CF(CF_3)_2$ | O |
| A-1950 | Et | H | Cl | F | $CH_2CH_2CH_2CH_2NHC({=}O)CCl_3$ | O |
| A-1951 | Et | H | Cl | F | $CH_2CH(Me)NHC({=}O)CF_3$ | O |

TABLE 45-continued

| Compound Number | $R^1$ | $R^2$ | $R^3$ | $R^4$ | $R^5$ | A |
|---|---|---|---|---|---|---|
| A-1952 | Et | H | Cl | F | $CH_2CH_2NHC({=}O)Ph$ | O |
| A-1953 | Et | H | Cl | F | $CH_2CH_2NHC({=}O)Ph(4\text{-}CF_3)$ | O |
| A-1954 | Et | H | Cl | F | $CH_2CH_2CH_2NHC({=}O)Ph(4\text{-}CF_3)$ | O |
| A-1955 | Et | H | Cl | F | $CH_2CH_2CH_2CH_2NHC({=}O)Ph(4\text{-}CF_3)$ | O |
| A-1956 | Et | H | Cl | F | $CH_2CH_2NHC({=}O)O(t\text{-}Bu)$ | O |
| A-1957 | Et | H | Cl | F | $CH_2CH_2CH_2NHC({=}O)O(t\text{-}Bu)$ | O |
| A-1958 | Et | H | Cl | F | $CH_2CH_2CH_2CH_2NHC({=}O)O(t\text{-}Bu)$ | O |
| A-1959 | Et | H | Cl | F | $CH_2CH_2CH_2CH_2NHC({=}O)OCH(CH_3)_2$ | O |
| A-1960 | Et | H | Cl | F | $CH_2CH(Me)NHC({=}O)O(t\text{-}Bu)$ | O |
| A-1961 | Et | H | Cl | F | $CH_2C{*}H(Me)NHC({=}O)O(t\text{-}Bu){:}(R)$ | O |
| A-1962 | Et | H | Cl | F | $CH_2C{*}H(Me)NHC({=}O)O(t\text{-}Bu){:}(S)$ | O |
| A-1963 | Et | H | Cl | F | $CH_2CH(Et)NHC({=}O)O(t\text{-}Bu)$ | O |
| A-1964 | Et | H | Cl | F | $CH_2CH(i\text{-}Pr)NHC({=}O)O(t\text{-}Bu)$ | O |
| A-1965 | Et | H | Cl | F | $CH(Me)CH_2NHC({=}O)O(t\text{-}Bu)$ | O |
| A-1966 | Et | H | Cl | F | $CH(Et)CH_2NHC({=}O)O(t\text{-}Bu)$ | O |
| A-1967 | Et | H | Cl | F | $CH(i\text{-}Pr)CH_2NHC({=}O)O(t\text{-}Bu)$ | O |
| A-1968 | Et | H | Cl | F | $CH_2CH(Me)CH_2NHC({=}O)O(t\text{-}Bu)$ | O |
| A-1969 | Et | H | Cl | F | $CH_2CH_2NHC({=}O)OC(Me)_2CF_3$ | O |
| A-1970 | Et | H | Cl | F | $CH_2CH_2CH_2NHC({=}O)OCH_2CF_3$ | O |
| A-1971 | Et | H | Cl | F | $CH_2CH_2CH_2NHC({=}O)OCH_2CH_2CF_3$ | O |
| A-1972 | Et | H | Cl | F | $CH_2CH_2CH_2CH_2NHC({=}O)OCH_2CCl_3$ | O |
| A-1973 | Et | H | Cl | F | $CH_2CH_2CH_2CH_2NHC({=}O)OCH_2CF_3$ | O |
| A-1974 | Et | H | Cl | F | $CH_2CH_2NHC({=}O)NH(t\text{-}Bu)$ | O |

TABLE 46

| Compound Number | $R^1$ | $R^2$ | $R^3$ | $R^4$ | $R^5$ | A |
|---|---|---|---|---|---|---|
| A-1975 | Et | H | Cl | F | $CH_2CH_2CH_2NHC({=}O)NH(t\text{-}Bu)$ | O |
| A-1976 | Et | H | Cl | F | $CH_2CH_2CH_2CH_2NHC({=}O)NHEt$ | O |
| A-1977 | Et | H | Cl | F | $CH_2CH_2CH_2CH_2NHC({=}O)NH(t\text{-}Bu)$ | O |
| A-1978 | Et | H | Cl | F | $CH_2CH_2CH_2NHC({=}O)NHCH_2CCl_3$ | O |
| A-1979 | Et | H | Cl | F | $CH_2CH_2CH_2NHC({=}O)NHCH_2CH_2F$ | O |
| A-1980 | Et | H | Cl | F | $CH_2CH_2CH_2NHC({=}O)NHCH_2CF_3$ | O |
| A-1981 | Et | H | Cl | F | $CH_2CH_2CH_2CH_2NHC({=}O)NHCH_2CCl_3$ | O |
| A-1982 | Et | H | Cl | F | $CH_2CH_2CH_2CH_2NHC({=}O)NHCH_2CH_2F$ | O |
| A-1983 | Et | H | Cl | F | $CH_2CH_2CH_2CH_2NHC({=}O)NHCH_2CF_3$ | O |
| A-1984 | Et | H | Cl | F | $CH_2CH_2NHS({=}O)Me$ | O |
| A-1985 | Et | H | Cl | F | $CH_2CH_2CH_2NHS({=}O)Me$ | O |
| A-1986 | Et | H | Cl | F | $CH_2CH_2CH_2CH_2NHS({=}O)Me$ | O |
| A-1987 | Et | H | Cl | F | $CH_2CH_2CH_2CH_2NHS({=}O)CH(CH_3)_2$ | O |
| A-1988 | Et | H | Cl | F | $CH_2CH_2CH_2CH_2CH_2NHS({=}O)Me$ | O |
| A-1989 | Et | H | Cl | F | $CH_2CH_2NHS({=}O)CHF_2$ | O |
| A-1990 | Et | H | Cl | F | $CH_2CH_2CH_2NHS({=}O)CHF_2$ | O |
| A-1991 | Et | H | Cl | F | $CH_2CH_2CH_2CH_2NHS({=}O)CHF_2$ | O |
| A-1992 | Et | H | Cl | F | $CH_2CH_2CH_2CH_2CH_2NHS({=}O)CHF_2$ | O |
| A-1993 | Et | H | Cl | F | $CH_2CH(Me)NHS({=}O)CHF_2$ | O |
| A-1994 | Et | H | Cl | F | $CH(Me)CH_2NHS({=}O)CHF_2$ | O |
| A-1995 | Et | H | Cl | F | $CH_2CH_2CH(Me)NHS({=}O)CHF_2$ | O |
| A-1996 | Et | H | Cl | F | $CH_2CH(Me)CH_2NHS({=}O)CHF_2$ | O |
| A-1997 | Et | H | Cl | F | $CH(Me)CH_2CH_2NHS({=}O)CHF_2$ | O |
| A-1998 | Et | H | Cl | F | $CH_2CH_2NHS({=}O)CF_3$ | O |
| A-1999 | Et | H | Cl | F | $CH_2CH_2CH_2NHS({=}O)CF_3$ | O |
| A-2000 | Et | H | Cl | F | $CH_2CH_2CH_2CH_2NHS({=}O)CF_3$ | O |
| A-2001 | Et | H | Cl | F | $CH_2CH_2CH_2CH_2CH_2NHS({=}O)CF_3$ | O |
| A-2002 | Et | H | Cl | F | $CH_2CH_2CH_2NHS({=}O)Ph$ | O |
| A-2003 | Et | H | Cl | F | $CH_2CH_2CH_2CH_2NHS({=}O)Ph$ | O |
| A-2004 | Et | H | Cl | F | $CH_2CH_2CH_2CH_2CH_2NHS({=}O)Ph$ | O |
| A-2005 | Et | H | Cl | F | $CH_2CH_2CH_2CH_2CH_2NHS({=}O)Ph(4\text{-}CF_3)$ | O |
| A-2006 | Et | H | Cl | F | $CH_2CH(Me)NHS({=}O)Ph(4\text{-}CF_3)$ | O |
| A-2007 | Et | H | Cl | F | $CH_2CH(Et)NHS({=}O)Ph(4\text{-}CF_3)$ | O |
| A-2008 | Et | H | Cl | F | $CH(Me)CH_2NHS({=}O)Ph(4\text{-}CF_3)$ | O |
| A-2009 | Et | H | Cl | F | $CH(Et)CH_2NHS({=}O)Ph(4\text{-}CF_3)$ | O |
| A-2010 | Et | H | Cl | F | $CH_2CH(Et)CH_2NHS({=}O)Ph(4\text{-}CF_3)$ | O |
| A-2011 | Et | H | Cl | F | $CH_2CH_2NHS({=}O)_2Me$ | O |
| A-2012 | Et | H | Cl | F | $CH_2CH_2CH_2NHS({=}O)_2Me$ | O |
| A-2013 | Et | H | Cl | F | $CH_2CH_2CH_2CH_2NHS({=}O)_2Me$ | O |
| A-2014 | Et | H | Cl | F | $CH_2CH_2CH_2CH_2NHS({=}O)_2CH(CH_3)_2$ | O |
| A-2015 | Et | H | Cl | F | $CH_2CH_2CH_2CH_2CH_2NHS({=}O)_2Me$ | O |

TABLE 46-continued

| Compound Number | $R^1$ | $R^2$ | $R^3$ | $R^4$ | $R^5$ | A |
|---|---|---|---|---|---|---|
| A-2016 | Et | H | Cl | F | $CH_2CH_2NHS(=O)_2CHF_2$ | O |
| A-2017 | Et | H | Cl | F | $CH_2CH_2CH_2NHS(=O)_2CHF_2$ | O |
| A-2018 | Et | H | Cl | F | $CH_2CH_2CH_2CH_2NHS(=O)_2CHF_2$ | O |

TABLE 47

| Compound Number | $R^1$ | $R^2$ | $R^3$ | $R^4$ | $R^5$ | A |
|---|---|---|---|---|---|---|
| A-2019 | Et | H | Cl | F | $CH_2CH_2CH_2CH_2CH_2NHS(=O)_2CHF_2$ | O |
| A-2020 | Et | H | Cl | F | $CH_2CH(Me)NHS(=O)_2CHF_2$ | O |
| A-2021 | Et | H | Cl | F | $CH(Me)CH_2NHS(=O)_2CHF_2$ | O |
| A-2022 | Et | H | Cl | F | $CH_2CH_2CH(Me)NHS(=O)_2CHF_2$ | O |
| A-2023 | Et | H | Cl | F | $CH_2CH(Me)CH_2NHS(=O)_2CHF_2$ | O |
| A-2024 | Et | H | Cl | F | $CH(Me)CH_2CH_2NHS(=O)_2CHF_2$ | O |
| A-2025 | Et | H | Cl | F | $CH_2CH(Me)N(Me)S(=O)_2CHF_2$ | O |
| A-2026 | Et | H | Cl | F | $CH(Me)CH_2N(Me)S(=O)_2CHF_2$ | O |
| A-2027 | Et | H | Cl | F | $CH_2CH_2CH(Me)N(Me)S(=O)_2CHF_2$ | O |
| A-2028 | Et | H | Cl | F | $CH_2CH(Me)CH_2N(Me)S(=O)_2CHF_2$ | O |
| A-2029 | Et | H | Cl | F | $CH(Me)CH_2CH_2N(Me)S(=O)_2CHF_2$ | O |
| A-2030 | Et | H | Cl | F | $CH_2CH_2CH_2NHS(=O)_2Ph$ | O |
| A-2031 | Et | H | Cl | F | $CH_2CH_2CH_2CH_2NHS(=O)_2Ph$ | O |
| A-2032 | Et | H | Cl | F | $CH_2CH_2CH_2CH_2CH_2NHS(=O)_2Ph$ | O |
| A-2033 | Et | H | Cl | F | $CH_2CH_2CH_2CH_2CH_2NHS(=O)_2Ph(4-CF_3)$ | O |
| A-2034 | Et | H | Cl | F | $CH_2CH(Me)NHS(=O)_2Ph(4-CF_3)$ | O |
| A-2035 | Et | H | Cl | F | $CH_2CH(Et)NHS(=O)_2Ph(4-CF_3)$ | O |
| A-2036 | Et | H | Cl | F | $CH(Me)CH_2NHS(=O)_2Ph(4-CF_3)$ | O |
| A-2037 | Et | H | Cl | F | $CH(Et)CH_2NHS(=O)_2Ph(4-CF_3)$ | O |
| A-2038 | Et | H | Cl | F | $CH_2CH(Me)CH_2NHS(=O)_2Ph(4-CF_3)$ | O |
| A-2039 | Et | H | Cl | F | $CH_2CH_2SiMe_3$ | O |
| A-2040 | Et | H | Cl | F | $CH_2CH_2CH_2SiMe_3$ | O |
| A-2041 | Et | H | Cl | F | $CH_2CH_2CH_2CH_2SiMe_3$ | O |
| A-2042 | Et | H | Cl | F | $CH_2Ph$ | O |
| A-2043 | Et | H | Cl | F | $CH_2Ph(2-CF_3)$ | O |
| A-2044 | Et | H | Cl | F | $CH_2Ph(3-CF_3)$ | O |
| A-2045 | Et | H | Cl | F | $CH_2Ph(4-CF_3)$ | O |
| A-2046 | Et | H | Cl | F | $CH_2Ph(2-OCF_3)$ | O |
| A-2047 | Et | H | Cl | F | $CH_2Ph(3-OCF_3)$ | O |
| A-2048 | Et | H | Cl | F | $CH_2Ph(4-OCF_3)$ | O |
| A-2049 | Et | H | Cl | F | $CH_2Ph(2-SCF_3)$ | O |
| A-2050 | Et | H | Cl | F | $CH_2Ph(3-SCF_3)$ | O |
| A-2051 | Et | H | Cl | F | $CH_2Ph(4-SCF_3)$ | O |
| A-2052 | Et | H | Cl | F | $CH_2Ph(3-CH_2SCF_3)$ | O |
| A-2053 | Et | H | Cl | F | $CH_2Ph(4-F)$ | O |
| A-2054 | Et | H | Cl | F | $CH_2Ph(4-Cl)$ | O |
| A-2055 | Et | H | Cl | F | $CH_2Ph(4-Br)$ | O |
| A-2056 | Et | H | Cl | F | $CH_2Ph(4-Me)$ | O |
| A-2057 | Et | H | Cl | F | $CH_2Ph[4-(t-Bu)]$ | O |
| A-2058 | Et | H | Cl | F | $CH_2Ph(4-CN)$ | O |
| A-2059 | Et | H | Cl | F | $CH_2Ph(4-NO_2)$ | O |
| A-2060 | Et | H | Cl | F | $CH_2Ph(4-OCHF_2)$ | O |
| A-2061 | Et | H | Cl | F | $CH_2Ph(4-SCHF_2)$ | O |
| A-2062 | Et | H | Cl | F | $CH_2Ph(4-CH_2SCF_3)$ | O |

TABLE 48

| Compound Number | $R^1$ | $R^2$ | $R^3$ | $R^4$ | $R^5$ | A |
|---|---|---|---|---|---|---|
| A-2063 | Et | H | Cl | F | $CH_2Ph[4-CF(CF_3)_2]$ | O |
| A-2064 | Et | H | Cl | F | $CH_2Ph(4-CH_2SCF_3)$ | O |
| A-2065 | Et | H | Cl | F | $CH_2Ph[4-Ph(4-CF_3)]$ | O |
| A-2066 | Et | H | Cl | F | $CH_2Ph(2,4-Cl_2)$ | O |
| A-2067 | Et | H | Cl | F | $CH_2Ph[2,5-(CF_3)_2]$ | O |
| A-2068 | Et | H | Cl | F | $CH_2Ph(3,4-Cl_2)$ | O |
| A-2069 | Et | H | Cl | F | $CH_2Ph(3-CF_3-4-F)$ | O |
| A-2070 | Et | H | Cl | F | $CH_2Ph(3-CF_3-4-Cl)$ | O |
| A-2071 | Et | H | Cl | F | $CH_2Ph(3-F-4-CF_3)$ | O |
| A-2072 | Et | H | Cl | F | $CH_2Ph(2,4,6-F_3)$ | O |
| A-2073 | Et | H | Cl | F | $CH_2Ph(3,4,5-F_3)$ | O |

TABLE 48-continued

| Compound Number | $R^1$ | $R^2$ | $R^3$ | $R^4$ | $R^5$ | A |
|---|---|---|---|---|---|---|
| A-2074 | Et | H | Cl | F | $CH_2Ph(2,3,4-F_3)$ | O |
| A-2075 | Et | H | Cl | F | $CH_2Ph(3,4,5-Cl_3)$ | O |
| A-2076 | Et | H | Cl | F | $CH_2CH_2Ph$ | O |
| A-2077 | Et | H | Cl | F | $CH_2CH_2Ph(4-F)$ | O |
| A-2078 | Et | H | Cl | F | $CH_2CH_2Ph(4-Cl)$ | O |
| A-2079 | Et | H | Cl | F | $CH_2CH_2Ph(4-Br)$ | O |
| A-2080 | Et | H | Cl | F | $CH_2CH_2Ph[4-(t-Bu)]$ | O |
| A-2081 | Et | H | Cl | F | $CH_2CH_2Ph(2-CF_3)$ | O |
| A-2082 | Et | H | Cl | F | $CH_2CH_2Ph(3-CF_3)$ | O |
| A-2083 | Et | H | Cl | H | $CH_2CH_2Ph(4-CF_3)$ | O |
| A-2084 | Et | H | Cl | F | $CH_2CH_2Ph(4-CF_3)$ | O |

TABLE 48-continued

| Compound Number | $R^1$ | $R^2$ | $R^3$ | $R^4$ | $R^5$ | A |
|---|---|---|---|---|---|---|
| A-2085 | Et | H | Cl | F | $CH_2CH_2Ph(4\text{-}CF(CF_3)_2)$ | O |
| A-2086 | Et | H | Cl | F | $CH_2CH_2Ph[4\text{-}(c\text{-}Pr)]$ | O |
| A-2087 | Et | H | Cl | F | $CH_2CH_2Ph\{4\text{-}[c\text{-}Pr(2,2\text{-}F_2)]\}$ | O |
| A-2088 | Et | H | Cl | F | $CH_2CH_2Ph(4\text{-}OMe)$ | O |
| A-2089 | Et | H | Cl | F | $CH_2CH_2Ph(3\text{-}OCF_3)$ | O |
| A-2090 | Et | H | Cl | F | $CH_2CH_2Ph(4\text{-}OCHF_2)$ | O |
| A-2091 | Et | H | Cl | F | $CH_2CH_2Ph(4\text{-}OCF_3)$ | O |
| A-2092 | Et | H | Cl | F | $CH_2CH_2Ph(4\text{-}SMe)$ | O |
| A-2093 | Et | H | Cl | F | $CH_2CH_2Ph(4\text{-}SCHF_2)$ | O |
| A-2094 | Et | H | Cl | F | $CH_2CH_2Ph(4\text{-}SCF_3)$ | O |
| A-2095 | Et | H | Cl | F | $CH_2CH_2Ph[4\text{-}S({=}O)Me]$ | O |
| A-2096 | Et | H | Cl | F | $CH_2CH_2Ph[4\text{-}S({=}O)CF_3]$ | O |
| A-2097 | Et | H | Cl | F | $CH_2CH_2Ph[4\text{-}S({=}O)_2Me]$ | O |
| A-2098 | Et | H | Cl | F | $CH_2CH_2Ph[4\text{-}S({=}O)_2CF_3]$ | O |
| A-2099 | Et | H | Cl | F | $CH_2CH_2Ph(4\text{-}CH_2SMe)$ | O |
| A-2100 | Et | H | Cl | F | $CH_2CH_2Ph(4\text{-}CH_2SCF_3)$ | O |
| A-2101 | Et | H | Cl | F | $CH_2CH_2Ph[4\text{-}OS({=}O)_2Me]$ | O |
| A-2102 | Et | H | Cl | F | $CH_2CH_2Ph[4\text{-}OS({=}O)_2CF_3]$ | O |
| A-2103 | Et | H | Cl | F | $CH_2CH_2Ph[4\text{-}Ph(4\text{-}CF_3)]$ | O |
| A-2104 | Et | H | Cl | F | $CH_2CH_2Ph(4\text{-}CH_2Ph)$ | O |
| A-2105 | Et | H | Cl | F | $CH_2CH_2Ph(4\text{-}OCH_2Ph)$ | O |
| A-2106 | Et | H | Cl | F | $CH_2CH_2Ph(4\text{-}CN)$ | O |

TABLE 49

| Compound Number | $R^1$ | $R^2$ | $R^3$ | $R^4$ | $R^5$ | A |
|---|---|---|---|---|---|---|
| A-2107 | Et | H | Cl | F | $CH_2CH_2Ph(4\text{-}NO_2)$ | O |
| A-2108 | Et | H | Cl | F | $CH_2CH_2Ph(2,4\text{-}Cl_2)$ | O |
| A-2109 | Et | H | Cl | F | $CH_2CH_2Ph(3,4\text{-}Cl_2)$ | O |
| A-2110 | Et | H | Cl | F | $CH_2CH_2Ph$(3-CF3-4-F) | O |
| A-2111 | Et | H | Cl | F | $CH_2CH_2Ph$(2-CF3-4-F) | O |
| A-2112 | Et | H | Cl | F | $CH_2CH_2Ph(3\text{-}F\text{-}4\text{-}CF_3)$ | O |
| A-2113 | Et | H | Cl | F | $CH_2CH_2Ph(2\text{-}F\text{-}4\text{-}CF_3)$ | O |
| A-2114 | Et | H | Cl | F | $CH_2CH_2Ph(3\text{-}Cl\text{-}4\text{-}OCHF_2)$ | O |
| A-2115 | Et | H | Cl | F | $CH_2CH_2Ph(3,4,5\text{-}Cl_3)$ | O |
| A-2116 | Et | H | Cl | F | $CH_2CH_2Ph(2,3,4\text{-}F_3)$ | O |
| A-2117 | Et | H | Cl | F | $CH_2CH_2Ph(2,4,5\text{-}F_3)$ | O |
| A-2118 | Et | H | Cl | F | $CH_2CH_2Ph(3,4,5\text{-}F_3)$ | O |
| A-2119 | Et | H | Cl | F | $CH_2CH_2Ph(2,4,6\text{-}F_3)$ | O |
| A-2120 | Et | H | Cl | F | $CH_2CH_2CH_2Ph$ | O |
| A-2121 | Et | H | Cl | F | $CH_2CH_2CH_2Ph(3\text{-}CF_3)$ | O |
| A-2122 | Et | H | Cl | F | $CH_2CH_2CH_2Ph(4\text{-}CF_3)$ | O |
| A-2123 | Et | H | Cl | F | $CH_2CH_2CH_2Ph(4\text{-}F)$ | O |
| A-2124 | Et | H | Cl | F | $CH_2CH_2CH_2Ph[4\text{-}(t\text{-}Bu)]$ | O |
| A-2125 | Et | H | Cl | F | $CH_2CH_2CH_2Ph(4\text{-}CN)$ | O |
| A-2126 | Et | H | Cl | F | $CH_2CH_2CH_2Ph(4\text{-}CF_3)$ | O |
| A-2127 | Et | H | Cl | F | $CH_2CH_2CH_2Ph(4\text{-}OCHF_2)$ | O |
| A-2128 | Et | H | Cl | F | $CH_2CH_2CH_2Ph(4\text{-}OCF_3)$ | O |
| A-2129 | Et | H | Cl | F | $CH_2CH_2CH_2Ph(4\text{-}SCHF_2)$ | O |
| A-2130 | Et | H | Cl | F | $CH_2CH_2CH_2Ph(4\text{-}SCF_3)$ | O |
| A-2131 | Et | H | Cl | F | $CH_2CH_2CH_2Ph[4\text{-}CF(CF_3)_2]$ | O |
| A-2132 | Et | H | Cl | F | $CH_2CH_2CH_2Ph(3,4,5\text{-}F_3)$ | O |
| A-2133 | Et | H | Cl | F | $CH_2CH_2CH_2Ph(2,4,6\text{-}F_3)$ | O |
| A-2134 | Et | H | Cl | F | $CH_2CH_2CH_2CH_2Ph$ | O |
| A-2135 | Et | H | Cl | F | $CH_2CH_2CH_2CH_2Ph(4\text{-}F)$ | O |
| A-2136 | Et | H | Cl | F | $CH_2CH_2CH_2CH_2Ph(4\text{-}CF_3)$ | O |
| A-2137 | Et | H | Cl | F | $CH_2CH_2CH_2CH_2Ph(4\text{-}OCF_3)$ | O |
| A-2138 | Et | H | Cl | F | $CH_2CH_2CH_2CH_2Ph(4\text{-}SCF_3)$ | O |
| A-2139 | Et | H | Cl | F | $CH_2CH_2CH_2CH_2CH_2Ph$ | O |
| A-2140 | Et | H | Cl | F | $CH_2CH_2CH_2CH_2CH_2CH_2Ph$ | O |

TABLE 49-continued

| Compound Number | $R^1$ | $R^2$ | $R^3$ | $R^4$ | $R^5$ | A |
|---|---|---|---|---|---|---|
| A-2141 | Et | H | Cl | F | $CH_2CF_2Ph(4\text{-}F)$ | O |
| A-2142 | Et | H | Cl | F | $CH_2CF_2Ph(4\text{-}CF_3)$ | O |
| A-2143 | Et | H | Cl | F | $CH_2CF_2Ph(3,4,5\text{-}F_3)$ | O |
| A-2144 | Et | H | Cl | F | $CH_2CF_2Ph(3,4,5\text{-}F_3)$ | O |
| A-2145 | Et | H | Cl | F | $CH_2CH_2OPh$ | O |
| A-2146 | Et | H | Cl | F | $CH_2CH_2OPh(4\text{-}F)$ | O |
| A-2147 | Et | H | Cl | F | $CH_2CH_2OPh(4\text{-}CF_3)$ | O |
| A-2148 | Et | H | Cl | F | $CH_2CH_2CH_2OPh$ | O |
| A-2149 | Et | H | Cl | F | $CH_2CH_2CH_2OPh(4\text{-}Cl)$ | O |
| A-2150 | Et | H | Cl | F | $CH_2CH_2CH_2OPh(4\text{-}CF_3)$ | O |

TABLE 50

| Compound Number | $R^1$ | $R^2$ | $R^3$ | $R^4$ | $R^5$ | A |
|---|---|---|---|---|---|---|
| A-2151 | Et | H | Cl | F | $CH_2CH_2CH_2CH_2OPh(4\text{-}CF_3)$ | O |
| A-2152 | Et | H | Cl | F | $CH_2CH_2CH_2CH_2OPh(4\text{-}OCF_3)$ | O |
| A-2153 | Et | H | Cl | F | $CH_2CH_2CH_2CH_2CH_2OPh(4\text{-}CF_3)$ | O |
| A-2154 | Et | H | Cl | F | $CH_2CH_2OCH_2Ph$ | O |
| A-2155 | Et | H | Cl | F | $CH_2CH_2CH_2OCH_2Ph$ | O |
| A-2156 | Et | H | Cl | F | $CH_2CH_2CH_2CH_2OCH_2Ph$ | O |
| A-2157 | Et | H | Cl | F | $CH_2CH_2CH_2CH_2CH_2OCH_2Ph$ | O |
| A-2158 | Et | H | Cl | F | $CH_2CH_2SPh$ | O |
| A-2159 | Et | H | Cl | F | $CH_2CH_2CH_2SPh$ | O |
| A-2160 | Et | H | Cl | F | $CH_2CH_2CH_2SPh(4\text{-}F)$ | O |
| A-2161 | Et | H | Cl | F | $CH_2CH_2CH_2SPh(4\text{-}Cl)$ | O |
| A-2162 | Et | H | Cl | F | $CH_2CH_2CH_2SPh(4\text{-}Br)$ | O |
| A-2163 | Et | H | Cl | F | $CH_2CH_2CH_2SPh[4\text{-}(t\text{-}Bu)]$ | O |
| A-2164 | Et | H | Cl | F | $CH_2CH_2CH_2SPh(3\text{-}CF_3)$ | O |
| A-2165 | Et | H | Cl | F | $CH_2CH_2CH_2SPh(4\text{-}CF_3)$ | O |
| A-2166 | Et | H | Cl | F | $CH_2CH_2CH_2SPh(3\text{-}SCF_3)$ | O |
| A-2167 | Et | H | Cl | F | $CH_2CH_2CH_2SPh(4\text{-}SCF_3)$ | O |
| A-2168 | Et | H | Cl | F | $CH_2CH_2CH_2CH_2SPh$ | O |
| A-2169 | Et | H | Cl | F | $CH_2CH_2CH_2CH_2SPh(4\text{-}F)$ | O |
| A-2170 | Et | H | Cl | F | $CH_2CH_2CH_2CH_2SPh(4\text{-}Cl)$ | O |
| A-2171 | Et | H | Cl | F | $CH_2CH_2CH_2CH_2SPh[4\text{-}(t\text{-}Bu)]$ | O |
| A-2172 | Et | H | Cl | F | $CH_2CH_2CH_2CH_2SPh(4\text{-}CF_3)$ | O |
| A-2173 | Et | H | Cl | F | $CH_2CH_2CH_2CH_2CH_2SPh$ | O |
| A-2174 | Et | H | Cl | F | $CH_2CH_2CH_2CH_2CH_2SPh(4\text{-}F)$ | O |
| A-2175 | Et | H | Cl | F | $CH_2CH_2CH_2CH_2CH_2SPh(4\text{-}Cl)$ | O |
| A-2176 | Et | H | Cl | F | $CH_2CH_2CH_2CH_2CH_2SPh(4\text{-}CF_3)$ | O |
| A-2177 | Et | H | Cl | F | $CH_2CH_2S({=}O)Ph$ | O |
| A-2178 | Et | H | Cl | F | $CH_2CH_2CH_2S({=}O)Ph$ | O |
| A-2179 | Et | H | Cl | F | $CH_2CH_2CH_2S({=}O)Ph(4\text{-}F)$ | O |
| A-2180 | Et | H | Cl | F | $CH_2CH_2CH_2S({=}O)Ph[4\text{-}(t\text{-}Bu)]$ | O |
| A-2181 | Et | H | Cl | F | $CH_2CH_2CH_2S({=}O)Ph(4\text{-}CF_3)$ | O |
| A-2182 | Et | H | Cl | F | $CH_2CH_2S({=}O)_2Ph$ | O |
| A-2183 | Et | H | Cl | F | $CH_2CH_2S({=}O)_2Ph(4\text{-}CF_3)$ | O |
| A-2184 | Et | H | Cl | F | $CH_2CH_2CH_2S({=}O)_2Ph(4\text{-}F)$ | O |
| A-2185 | Et | H | Cl | F | $CH_2CH_2CH_2S({=}O)_2Ph(4\text{-}Cl)$ | O |
| A-2186 | Et | H | Cl | F | $CH_2CH_2CH_2S({=}O)_2Ph(4\text{-}CF_3)$ | O |
| A-2187 | Et | H | Cl | F | $CH_2CH_2CH_2CH_2S({=}O)_2Ph$ | O |
| A-2188 | Et | H | Cl | F | $CH_2CH_2CH_2CH_2S({=}O)_2Ph(4\text{-}Cl)$ | O |
| A-2189 | Et | H | Cl | F | $CH_2CH_2CH_2CH_2S({=}O)_2Ph(4\text{-}CF_3)$ | O |
| A-2190 | Et | H | Cl | F | $CH_2CH_2SCH_2Ph$ | O |
| A-2191 | Et | H | Cl | F | $CH_2CH_2CH_2SCH_2Ph$ | O |
| A-2192 | Et | H | Cl | F | $CH_2CH_2CH_2SCH_2Ph(2\text{-}Cl)$ | O |
| A-2193 | Et | H | Cl | F | $CH_2CH_2CH_2SCH_2Ph(3\text{-}Cl)$ | O |
| A-2194 | Et | H | Cl | F | $CH_2CH_2CH_2SCH_2Ph(4\text{-}Cl)$ | O |

TABLE 51

| Compound Number | $R^1$ | $R^2$ | $R^3$ | $R^4$ | $R^5$ | A |
|---|---|---|---|---|---|---|
| A-2195 | Et | H | Cl | F | $CH_2CH_2CH_2SCH_2Ph(2\text{-}SCF_3)$ | O |
| A-2196 | Et | H | Cl | F | $CH_2CH_2CH_2SCH_2Ph(3\text{-}CF_3)$ | O |
| A-2197 | Et | H | Cl | F | $CH_2CH_2CH_2SCH_2Ph(4\text{-}CF_3)$ | O |
| A-2198 | Et | H | Cl | F | $CH_2CH_2CH_2SCH_2Ph(4\text{-}NO_2)$ | O |
| A-2199 | Et | H | Cl | F | $CH_2CH_2CH_2CH_2SCH_2Ph$ | O |

TABLE 51-continued

| Compound Number | $R^1$ | $R^2$ | $R^3$ | $R^4$ | $R^5$ | A |
|---|---|---|---|---|---|---|
| A-2200 | Et | H | Cl | F | $CH_2CH_2CH_2CH_2SCH_2Ph(4\text{-}Cl)$ | O |
| A-2201 | Et | H | Cl | F | $CH_2CH_2CH_2CH_2SCH_2Ph(4\text{-}CF_3)$ | O |
| A-2202 | Et | H | Cl | F | $CH_2CH_2CH_2CH_2SCH_2Ph(4\text{-}CN)$ | O |
| A-2203 | Et | H | Cl | F | $CH_2CH_2CH_2CH_2CH_2SCH_2Ph$ | O |
| A-2204 | Et | H | Cl | F | $CH_2CH_2SCH_2CH_2Ph$ | O |
| A-2205 | Et | H | Cl | F | $CH_2CH_2CH_2SCH_2CH_2Ph$ | O |
| A-2206 | Et | H | Cl | F | $CH_2CH_2CH_2CH_2SCH_2CH_2Ph$ | O |
| A-2207 | Et | H | Cl | F | $CH_2CH_2SCH(Me)Ph$ | O |
| A-2208 | Et | H | Cl | F | $CH_2CH_2CH_2SCH(Me)Ph$ | O |
| A-2209 | Et | H | Cl | F | $CH_2CH_2CH_2CH_2SCH(Me)Ph$ | O |
| A-2210 | Et | H | Cl | F | $CH_2CH_2S({=}O)CH_2Ph$ | O |
| A-2211 | Et | H | Cl | F | $CH_2CH_2S({=}O)CH_2Ph(4\text{-}CF_3)$ | O |
| A-2212 | Et | H | Cl | F | $CH_2CH_2CH_2S({=}O)CH_2Ph$ | O |
| A-2213 | Et | H | Cl | F | $CH_2CH_2CH_2S({=}O)CH_2Ph(2\text{-}SCF_3)$ | O |
| A-2214 | Et | H | Cl | F | $CH_2CH_2CH_2S({=}O)CH_2Ph(4\text{-}SCF_3)$ | O |
| A-2215 | Et | H | Cl | F | $CH_2CH_2CH_2S({=}O)CH_2Ph(4\text{-}Cl)$ | O |
| A-2216 | Et | H | Cl | F | $CH_2CH_2CH_2S({=}O)CH_2Ph(4\text{-}CF_3)$ | O |
| A-2217 | Et | H | Cl | F | $CH_2CH_2CH_2CH_2S({=}O)CH_2Ph$ | O |
| A-2218 | Et | H | Cl | F | $CH_2CH_2CH_2CH_2S({=}O)CH_2Ph(4\text{-}CF_3)$ | O |
| A-2219 | Et | H | Cl | F | $CH_2CH_2CH_2CH_2CH_2S({=}O)CH_2Ph(4\text{-}CF_3)$ | O |
| A-2220 | Et | H | Cl | F | $CH_2CH_2S({=}O)_2CH_2Ph$ | O |
| A-2221 | Et | H | Cl | F | $CH_2CH_2S({=}O)_2CH_2Ph(4\text{-}CF_3)$ | O |
| A-2222 | Et | H | Cl | F | $CH_2CH_2CH_2S({=}O)_2CH_2Ph$ | O |
| A-2223 | Et | H | Cl | F | $CH_2CH_2CH_2S({=}O)_2CH_2Ph(4\text{-}Cl)$ | O |
| A-2224 | Et | H | Cl | F | $CH_2CH_2CH_2S({=}O)_2CH_2Ph(4\text{-}CF_3)$ | O |
| A-2225 | Et | H | Cl | F | $CH_2CH_2CH_2CH_2S({=}O)_2CH_2Ph$ | O |
| A-2226 | Et | H | Cl | F | $CH_2CH_2CH_2CH_2S({=}O)_2CH_2Ph(4\text{-}CF_3)$ | O |
| A-2227 | Et | H | Cl | F | $CH_2CH_2CH_2CH_2CH_2S({=}O)_2CH_2Ph$ | O |
| A-2228 | Et | H | Cl | F | $CH_2CH_2CH_2CH_2CH_2S({=}O)_2CH_2Ph(4\text{-}CF_3)$ | O |
| A-2229 | Et | H | Cl | F | $CH_2CH_2ON{=}CH(t\text{-}Bu)$ | O |
| A-2230 | Et | H | Cl | F | $CH_2CH_2CH_2ON{=}CH(t\text{-}Bu)$ | O |
| A-2231 | Et | H | Cl | F | $CH_2CH_2CH_2CH_2ON{=}C(Me)(c\text{-}Pr)$ | O |
| A-2232 | Et | H | Cl | F | $CH_2CH_2ON{=}C(Me)CF_3$ | O |
| A-2233 | Et | H | Cl | F | $CH_2CH_2CH_2ON{=}CHCF_3$ | O |
| A-2234 | Et | H | Cl | F | $CH_2CH_2CH_2ON{=}C(Me)CF_3$ | O |
| A-2235 | Et | H | Cl | F | $CH_2CH_2CH_2ON{=}C(Me)CCl_3$ | O |
| A-2236 | Et | H | Cl | F | $CH_2CH_2CH_2CH_2ON{=}CHCF_3$ | O |
| A-2237 | Et | H | Cl | F | $CH_2CH_2CH_2CH_2ON{=}C(Me)CF_3$ | O |
| A-2238 | Et | H | Cl | F | $CH_2CH_2CH_2CH_2CH_2ON{=}C(Me)CF_3$ | O |

TABLE 52

| Compound Number | $R^1$ | $R^2$ | $R^3$ | $R^4$ | $R^5$ | A |
|---|---|---|---|---|---|---|
| A-2239 | Et | H | Cl | F | $CH_2CH_2ON{=}CHPh$ | O |
| A-2240 | Et | H | Cl | F | $CH_2CH_2ON{=}CHPh(4\text{-}CF_3)$ | O |
| A-2241 | Et | H | Cl | F | $CH_2CH_2ON{=}CHPh(4\text{-}SCF_3)$ | O |
| A-2242 | Et | H | Cl | F | $CH_2CH_2CH_2ON{=}CHPh(3\text{-}CF_3)$ | O |
| A-2243 | Et | H | Cl | F | $CH_2CH_2CH_2ON{=}CHPh(4\text{-}CF_3)$ | O |
| A-2244 | Et | H | Cl | F | $CH_2CH_2CH_2ON{=}CHPh(4\text{-}SCF_3)$ | O |
| A-2245 | Et | H | Cl | F | $CH_2CH_2CH_2ON{=}C(Me)Ph(4\text{-}CF_3)$ | O |
| A-2246 | Et | H | Cl | F | $CH_2CH_2CH_2CH_2ON{=}CHPh(4\text{-}SCF_3)$ | O |
| A-2247 | Et | H | Cl | F | $CH_2CH_2$(adamant-1-yl) | O |
| A-2248 | Et | H | Cl | F | $CH_2CH_2CH_2(3\text{-}CF_3$-pyrazol-1-yl) | O |
| A-2249 | Et | H | Cl | F | CH2CH2CH2CH2(3-$CF_3$-pyrazol-1-yl) | O |
| A-2250 | Et | H | Cl | F | $CH_2CH_2CH_2CH_2CH_2(3\text{-}CF_3$-pyrazol-1-yl) | O |
| A-2251 | Et | H | Cl | F | $CH_2(1\text{-}Me\text{-}4\text{-}CF_3$-imidazol-5-yl) | O |
| A-2252 | Et | H | Cl | F | $CH_2CH_2(1\text{-}Me\text{-}4\text{-}CF_3$-imidazol-5-yl) | O |
| A-2253 | Et | H | Cl | F | $CH_2CH_2CH_2(1\text{-}Me\text{-}4\text{-}CF_3$-imidazol-5-yl) | O |
| A-2254 | Et | H | Cl | F | $CH_2CH_2CH_2(3\text{-}CF_3$-1,2,4-triazol-1-yl) | O |
| A-2255 | Et | H | Cl | F | $CH_2CH_2CH_2CH_2(3\text{-}CF_3$-1,2,4-triazol-1-yl) | O |
| A-2256 | Et | H | Cl | F | CH2CH2CH2CH2CH2(3-$CF_3$-1,2,4-triazol-1-yl) | O |
| A-2257 | Et | H | Cl | F | $CH_2CH_2CH_2(4\text{-}CF_3$-thiazol-2-yl) | O |
| A-2258 | Et | H | Cl | F | $CH_2CH_2CH_2CH_2(4\text{-}CF_3$-thiazol-2-yl) | O |
| A-2259 | Et | H | Cl | F | $CH_2CH_2CH_2CH_2CH_2(4\text{-}CF_3$-thiazol-2-yl) | O |
| A-2260 | Et | H | Cl | F | $CH_2CH_2CH_2(2\text{-}CF_3$-pyridin-5-yl) | O |
| A-2261 | Et | H | Cl | F | $CH_2CH_2CH_2CH_2(2\text{-}CF_3$-pyridin-5-yl) | O |
| A-2262 | Et | H | Cl | F | $CH_2CH_2CH_2CH_2CH_2(2\text{-}CF_3$-pyridin-5-yl) | O |
| A-2263 | Et | H | Cl | F | $CH_2(4\text{-}CF_3$-pyrimidin-2-yl) | O |
| A-2264 | Et | H | Cl | F | $CH_2CH_2(4\text{-}CF_3$-pyrimidin-2-yl) | O |
| A-2265 | Et | H | Cl | F | $CH_2CH_2CH_2(4\text{-}CF_3$-pyrimidin-2-yl) | O |
| A-2266 | Et | H | Cl | F | $CH_2CH_2O(3\text{-}Cl\text{-}5\text{-}CF_3$-pyridin-2-yl) | O |

TABLE 52-continued

| Compound Number | $R^1$ | $R^2$ | $R^3$ | $R^4$ | $R^5$ | A |
|---|---|---|---|---|---|---|
| A-2267 | Et | H | Cl | F | $CH_2CH_2CH_2O$(3-Cl-5-$CF_3$-pyridin-2-yl) | O |
| A-2268 | Et | H | Cl | F | $CH_2CH_2CH_2CH_2O$(3-Cl-5-$CF_3$-pyridin-2-yl) | O |
| A-2269 | Et | H | Cl | F | $CH_2CH_2CH_2CH_2CH_2O$(3-Cl-5-$CF_3$-pyridin-2-yl) | O |
| A-2270 | Et | H | Cl | F | $CH_2CH_2N$(Phth) | O |
| A-2271 | Et | H | Cl | F | $CH_2CH_2CH_2N$(Phth) | O |
| A-2272 | Et | H | Cl | F | $CH_2CH_2CH_2CH_2N$(Phth) | O |
| A-2273 | Et | H | Cl | F | $CH_2CH_2CH_2CH_2CH_2N$(Phth) | O |
| A-2274 | Et | H | Cl | F | $CH_2CH(Me)CH_2N$(Phth) | O |
| A-2275 | Et | H | Cl | F | $CH_2$[1,3-dioxolan(2-$CF_3$)-2-yl] | O |
| A-2276 | Et | H | Cl | F | $CH_2$(azetidin-3-yl) | O |
| A-2277 | Et | H | Cl | F | $CH_2$(pyrrolidin-3-yl) | O |
| A-2278 | Et | H | Cl | F | $CH_2$(piperidin-3-yl) | O |
| A-2279 | Et | H | Cl | F | $CH_2${azetidin[1-C(═O)O(t-Bu)]-3-yl} | O |
| A-2280 | Et | H | Cl | F | $CH_2${pyrrolidin[1-C(═O)O(t-Bu)]-3-yl} | O |
| A-2281 | Et | H | Cl | F | $CH_2${piperidin[1-C(═O)O(t-Bu)]-3-yl} | O |
| A-2282 | Et | H | Cl | F | $CH_2${azetidin[1-C(═O)CF3]-3-yl} | O |

TABLE 53

| Compound Number | $R^1$ | $R^2$ | $R^3$ | $R^4$ | $R^5$ | A |
|---|---|---|---|---|---|---|
| A-2283 | Et | H | Cl | F | $CH_2${azetidin[1-S(═O)$_2CF_3$]-3-yl} | O |
| A-2284 | Et | H | Cl | F | $CH_2${pyrrolidin[1-C(═O)$CF_3$]-3-yl} | O |
| A-2285 | Et | H | Cl | F | $CH_2${pyrrolidin[1-S(═O)$_2CF_3$]-3-yl} | O |
| A-2286 | Et | H | Cl | F | $CH_2${piperidin[1-C(═O)$CF_3$]-3-yl} | O |
| A-2287 | Et | H | Cl | F | $CH_2${piperidin[1-S(═O)$_2CF_3$]-3-yl} | O |
| A-2288 | Et | H | Cl | F | $CH_2CH_2CH_2CN$ | O |
| A-2289 | Et | H | Cl | F | $CH_2CH_2CH_2CH_2CN$ | O |
| A-2290 | Et | H | Cl | F | $CH_2CH_2CH_2CH_2CH_2CN$ | O |
| A-2291 | Et | H | Cl | F | $CH_2CH_2CH_2CH_2CH_2CH_2CN$ | O |
| A-2292 | Et | H | Cl | F | $CH_2CH_2CH_2C$(═O)OH | O |
| A-2293 | Et | H | Cl | F | $CH_2CH_2CH_2CH_2C$(═O)OH | O |
| A-2294 | Et | H | Cl | F | $CH_2CH_2CH_2CH_2CH_2C$(═O)OH | O |
| A-2295 | Et | H | Cl | F | $CH_2CH_2SCN$ | O |
| A-2296 | Et | H | Cl | F | $CH_2CH_2CH_2SCN$ | O |
| A-2297 | Et | H | Cl | F | $CH_2CH_2CH_2CH_2SCN$ | O |
| A-2298 | Et | H | Cl | F | $CH_2CH_2CH_2CH_2CH_2SCN$ | O |
| A-2299 | Et | H | Cl | Cl | $CH_2CH_2CH_2CH_2CH_2SCN$ | O |
| A-2300 | Et | H | Cl | F | $CH_2CH_2CH_2CH_2CH_2CH_2SCN$ | O |
| A-2301 | Et | H | Cl | F | $CH_2CH_2CH_2CH_2CH_2CH_2CH_2SCN$ | O |
| A-2302 | Et | H | Cl | F | $CH_2CH_2CH_2CH_2CH_2CH_2CH_2CH_2SCN$ | O |
| A-2303 | Et | H | Cl | F | $CH_2CH_2CH(Me)SCN$ | O |
| A-2304 | Et | H | Cl | F | $CH_2CH(Me)CH_2SCN$ | O |
| A-2305 | Et | H | Cl | F | $CH(Me)CH_2CH_2SCN$ | O |
| A-2306 | Et | H | Cl | F | $CH_2CH_2CH_2CH(Me)SCN$ | O |
| A-2307 | Et | H | Cl | F | $CH_2CH_2CH(Me)CH_2SCN$ | O |
| A-2308 | Et | H | Cl | F | $CH_2CH(Me)CH_2CH_2SCN$ | O |
| A-2309 | Et | H | Cl | F | $CH(Me)CH_2CH_2CH_2SCN$ | O |
| A-2310 | Et | H | Cl | F | $CH_2CH_2CH_2CH_2CH(Me)SCN$ | O |
| A-2311 | Et | H | Cl | F | $CH_2CH_2CH_2CH(Me)CH_2SCN$ | O |
| A-2312 | Et | H | Cl | F | $CH_2CH_2CH(Me)CH_2CH_2SCN$ | O |
| A-2313 | Et | H | Cl | F | $CH_2CH(Me)CH_2CH_2CH_2SCN$ | O |
| A-2314 | Et | H | Cl | F | $CH(Me)CH_2CH_2CH_2CH_2SCN$ | O |
| A-2315 | Et | H | Cl | F | $CH_2CH_2ONH_2$ | O |
| A-2316 | Et | H | Cl | F | $CH_2CH_2CH_2ONH_2$ | O |
| A-2317 | Et | H | Cl | F | $CH_2CH_2CH_2CH_2ONH_2$ | O |
| A-2318 | Et | H | Cl | F | $CH_2CH_2CH_2CH_2CH_2ONH_2$ | O |
| A-2319 | Et | H | Cl | F | $CH_2CH_2CH_2CH_2CH_2CH_2ONH_2$ | O |
| A-2320 | Et | H | Me | F | Me | O |
| A-2321 | Et | H | Me | F | Et | O |
| A-2322 | Et | H | Me | F | n-Pr | O |
| A-2323 | Et | H | Me | F | i-Pr | O |
| A-2324 | Et | H | Me | F | n-Bu | O |
| A-2325 | Et | H | Me | F | n-Pen | O |
| A-2326 | Et | H | Me | F | n-Hex | O |

TABLE 54

| Compound Number | $R^1$ | $R^2$ | $R^3$ | $R^4$ | $R^5$ | A |
|---|---|---|---|---|---|---|
| A-2327 | Et | H | Me | F | n-Heptyl | O |
| A-2328 | Et | H | Me | F | n-Octyl | O |
| A-2329 | Et | H | Me | F | n-Nonyl | O |
| A-2330 | Et | H | Me | F | n-Decyl | O |
| A-2331 | Et | H | Me | F | c-Pr | O |
| A-2332 | Et | H | Me | F | c-Pen | O |
| A-2333 | Et | H | Me | F | c-Hex | O |
| A-2334 | Et | H | Me | F | $CH_2C(Me)═CH_2$ | O |
| A-2335 | Et | H | Me | F | $CH_2CH_2CH═CH_2$ | O |
| A-2336 | Et | H | Me | F | $CH_2CH_2CH═C(CH_3)_2$ | O |
| A-2337 | Et | H | Me | F | $CH_2CH_2CH_2CH═CH_2$ | O |
| A-2338 | Et | H | Me | F | $CH_2CH_2CH_2CH═C(CH_3)_2$ | O |
| A-2339 | Et | H | Me | F | $CH_2CH_2CH_2CH_2CH═CH_2$ | O |
| A-2340 | Et | H | Me | F | $CH_2CH_2CH_2CH_2CH═C(CH_3)_2$ | O |
| A-2341 | Et | H | Me | F | $CH_2CH_2CH$≡CH | O |
| A-2342 | Et | H | Me | F | $CH_2CH_2CH_2C$≡CH | O |
| A-2343 | Et | H | Me | F | $CH_2CH_2CH_2CH_2CH$≡CH | O |
| A-2344 | Et | H | Me | F | $CH_2CH_2CH_2Cl$ | O |
| A-2345 | Et | H | Me | F | $CH_2CH_2CH_2Br$ | O |
| A-2346 | Et | H | Me | F | $CH_2CH_2CH_2CH_2Cl$ | O |
| A-2347 | Et | H | Me | F | $CH_2CH_2CH_2CH_2Br$ | O |
| A-2348 | Et | H | Me | F | $CH_2CH_2CH_2CH_2CH_2Cl$ | O |
| A-2349 | Et | H | Me | F | $CH_2CH_2CH_2CH_2CH_2Br$ | O |
| A-2350 | Et | H | Me | Cl | $CH_2CH_2CH_2CH_2CH_2Br$ | O |
| A-2351 | Et | H | Me | F | $CH_2CH_2CH_2CH_2CH_2CH_2Cl$ | O |
| A-2352 | Et | H | Me | F | CH2CH2CH2CH2CH2CH2Br | O |
| A-2353 | Et | H | Me | F | $CH_2CH_2CH_2CH_2CH_2CH_2CH_2Cl$ | O |
| A-2354 | Et | H | Me | F | $CH_2CH_2CH_2CH_2CH_2CH_2CH_2Br$ | O |
| A-2355 | Et | H | Me | F | $CH_2CH_2CH_2CH_2CH_2CH_2CH_2CH_2Br$ | O |
| A-2356 | Et | H | Me | F | $CH_2CH(Me)CH_2Cl$ | O |
| A-2357 | Et | H | Me | F | $CH_2CH(Me)CH_2Br$ | O |
| A-2358 | Et | H | Me | F | $CH_2CH_2CH(Me)CH_2CH_2Cl$ | O |
| A-2359 | Et | H | Me | F | $CH_2CH_2CH(Me)CH_2CH_2Br$ | O |
| A-2360 | Et | H | Me | F | $CH_2CH_2CF═CF_2$ | O |
| A-2361 | Et | H | Me | F | $CH_2CH═C(Cl)CF_3$ | O |
| A-2362 | Et | H | Me | F | $CH_2CH_2CH_2CF═CF_2$ | O |
| A-2363 | Et | H | Me | F | $CH_2CH_2CH_2CH_2CF═CF_2$ | O |
| A-2364 | Et | H | Me | F | $CH_2CH_2CH_2CH_2CH_2CF═CF_2$ | O |
| A-2365 | Et | H | Me | F | $CH_2$(t-Bu) | O |
| A-2366 | Et | H | Me | F | $CH_2CH_2$(t-Bu) | O |
| A-2367 | Et | H | Me | F | $CH_2CH_2CH_2$(t-Bu) | O |
| A-2368 | Et | H | Me | F | $CH_2CH_2CH_2CH_2$(t-Bu) | O |
| A-2369 | Et | H | Me | F | $CH_2CH_2CH_2CH_2CH_2$(t-Bu) | O |
| A-2370 | Et | H | Me | F | $CH_2CH_2CH_2CH_2CH_2CH_2$(t-Bu) | O |

TABLE 55

| Compound Number | R[1] | R[2] | R[3] | R[4] | R[5] | A |
|---|---|---|---|---|---|---|
| A-2371 | Et | H | Me | F | $CH_2CF_3$ | O |
| A-2372 | Et | H | Me | F | $CH_2CH_2CF_3$ | O |
| A-2373 | Et | H | Me | F | $CH_2CH_2CH_2CF_3$ | O |
| A-2374 | Et | H | Me | F | $CH_2CH_2CH_2CH_2CF_3$ | O |
| A-2375 | Et | H | Me | F | $CH_2CH_2CH_2CH_2CH_2CF_3$ | O |
| A-2376 | Et | H | Me | F | $CH_2CH_2CH_2CH_2CH_2CH_{22}CF_3$ | O |
| A-2377 | Et | H | Me | F | $CH_2CH_2CH_2CH_2CH_2CH_2CH_2CF_3$ | O |
| A-2378 | Et | H | Me | F | $CH_2CH_2CF_3$ | O |
| A-2379 | Et | H | Me | F | $CF_2CHFCF_3$ | O |
| A-2380 | Et | H | Me | F | $CF_2CF_2CF_3$ | O |
| A-2381 | Et | H | Me | F | $CH_2CF_2CF_2CF_3$ | O |
| A-2382 | Et | H | Me | F | $CH_2CF_2CF_2CF_2CF_3$ | O |
| A-2383 | Et | H | Me | F | $CH_2CF_2CF_2CF_2CF_2$ | O |
| A-2384 | Et | H | Me | F | $CH(CF_3)CF_3$ | O |
| A-2385 | Et | H | Me | F | $CH_2CF(CF_3)CF_3$ | O |
| A-2386 | Et | H | Me | F | $CH_2CF_2CF(CF_3)CF_3$ | O |
| A-2387 | Et | H | Me | F | $CH_2CF(CF_3)$CF2CF$_3$ | O |
| A-2388 | Et | H | Me | F | $CH_2CF_2CF_2CF(CF_3)CF_3$ | O |
| A-2389 | Et | H | Me | F | $CH_2CF_2CF(CF_3)CF_2CF_3$ | O |
| A-2390 | Et | H | Me | F | $CH_2$CF(CF3)$CF_2CF_2CF_3$ | O |
| A-2391 | Et | H | Me | F | $CH_2$(c-Pr) | O |
| A-2392 | Et | H | Me | F | $CH_2$[c-Pr(1-Me)] | O |
| A-2393 | Et | H | Me | F | $CH_2$[c-Pr(1-Ph)] | O |
| A-2394 | Et | H | Me | F | $CH_2$[C-Pr(1-$NH_2$)] | O |
| A-2395 | Et | H | Me | F | $CH_2$[c-Pr(1-NHC(=O)O(t-Bu)] | O |
| A-2396 | Et | H | Me | F | $CH_2${c-Pr[1-NHS(=O)$_2CF_3$]} | O |
| A-2397 | Et | H | Me | F | $CH_2${C-Pr[1-Ph(4-$CCF_3$)]} | O |
| A-2398 | Et | H | Me | F | $CH_2${C-Pr[1-Ph(3,4,5-$F_3$)]} | O |
| A-2399 | Et | H | Me | F | $CH_2${C-Hex[4-(t-Bu)]} | O |
| A-2400 | Et | H | Me | F | $CH_2$[c-Hex(4-$CF_3$)] | O |
| A-2401 | Et | H | Me | F | $CH_2CH_2$(c-Pr) | O |
| A-2402 | Et | H | Me | F | $CH_2CH_2$(c-Hex) | O |
| A-2403 | Et | H | Me | F | $CH_2CH_2$[c-Hex(4-$CF_3$)] | O |
| A-2404 | Et | H | Me | F | $CH_2CH_2$[C-Hex(4-$SCF_3$)] | O |
| A-2405 | Et | H | Me | F | $CH_2CH_2CH_2$(c-Pr) | O |
| A-2406 | Et | H | Me | F | $CH_2CH_2CH_2$(c-Hex) | O |
| A-2407 | Et | H | Me | F | $CH_2CH_2CH_2${C-Hex[4-(t-Bu)]} | O |
| A-2408 | Et | H | Me | F | $CH_2CH_2CH_2$[c-Hex(4-$CF_3$)] | O |
| A-2409 | Et | H | Me | F | $CH_2CH_2CH_2$[C-Hex(4-$SCF_3$)] | O |
| A-2410 | Et | H | Me | F | $CH_2CH_2CH_2CH_2$(c-Pr) | O |
| A-2411 | Et | H | Me | F | $CH_2CH_2CH_2CH_2$(c-Hex) | O |
| A-2412 | Et | H | Me | F | $CH_2CH_2CH_2CH_2$[C-Hex(4-$CF_3$)] | O |
| A-2413 | Et | H | Me | F | $CH_2$[C-Pr(2,2-$F_2$)] | O |
| A-2414 | Et | H | Me | F | $CH_2$[c-Hex(4,4-$F_2$)] | O |

TABLE 56

| Compound Number | R[1] | R[2] | R[3] | R[4] | R[5] | A |
|---|---|---|---|---|---|---|
| A-2415 | Et | H | Me | F | $CH_2CH_2$[C-Pr(2,2-$F_2$)] | O |
| A-2416 | Et | H | Me | F | $CH_2CH_2$[c-Hex(4,4-$F_2$)] | O |
| A-2417 | Et | H | Me | F | $CH_2CH_2CH_2$[C-Pr(2,2-$F_2$)] | O |
| A-2418 | Et | H | Me | F | $CH_2CH_2CH_2CH_2$[C-Pr(2,2-$F_2$)] | O |
| A-2419 | Et | H | Me | F | $CH_2CH_2OH$ | O |
| A-2420 | Et | H | Me | F | $CH_2CH_2CH_2OH$ | O |
| A-2421 | Et | H | Me | F | $CH_2CH_2CH_2CH_2OH$ | O |
| A-2422 | Et | H | Me | F | $CH_2CH_2CH_2CH_2CH_2OH$ | O |
| A-2423 | Et | H | Me | F | $CH_2CH_2CH_2CH_2CH_2CH_2OH$ | O |
| A-2424 | Et | H | Me | F | $CH_2$C(=O)Me | O |
| A-2425 | Et | H | Me | F | $CH_2$CH(OH)Me | O |
| A-2426 | Et | H | Me | F | $CH_2CH(OH)CF_3$ | O |
| A-2427 | Et | H | Me | F | $CH_2$C(OH)2$CF_3$ | O |
| A-2428 | Et | H | Me | F | $CH_2C(CF_3)$=NOH | O |
| A-2429 | Et | H | Me | F | $CH_2C(CF_3)$=NOMe | O |
| A-2430 | Et | H | Me | F | $CH_2CH(CF_3)NH_2$ | O |
| A-2431 | Et | H | Me | F | $CH_2CH_2$OMe | O |
| A-2432 | Et | H | Me | F | $CH_2CH_2CH_2$OMe | O |
| A-2433 | Et | H | Me | F | $CH_2CH_2CH_2CH_2$OMe | O |
| A-2434 | Et | H | Me | F | $CH_2CH_2CH_2CH_2CH_2$OMe | O |
| A-2435 | Et | H | Me | F | $CH_2CH_2CH_2CH_2CH_2CH_2$OMe | O |
| A-2436 | Et | H | Me | F | $CH_2CH_2OCHF_2$ | O |
| A-2437 | Et | H | Me | F | $CH_2CH_2CH_2OCHF_2$ | O |
| A-2438 | Et | H | Me | F | $CH_2CH_2CH_2CH_2OCHF_2$ | O |

TABLE 56-continued

| Compound Number | R[1] | R[2] | R[3] | R[4] | R[5] | A |
|---|---|---|---|---|---|---|
| A-2439 | Et | H | Me | F | $CH_2CH_2CH_2CH_2CH_2OCHF_2$ | O |
| A-2440 | Et | H | Me | F | $CH_2CH_2CH_2CH_2CH_2CH_2OCHF_2$ | O |
| A-2441 | Et | H | Me | F | $CH_2CH_2OCH_2CF_3$ | O |
| A-2442 | Et | H | Me | F | $CH_2CH_2CH_2OCH_2CF_3$ | O |
| A-2443 | Et | H | Me | F | $CH_2CH_2CH_2CH_2OCH_2CF_3$ | O |
| A-2444 | Et | H | Me | F | $CH_2CH_2CH_2CH_2CH_2OCH_2CF_3$ | O |
| A-2445 | Et | H | Me | F | $CH_2CH_2CH_2CH_2CH_2CH_2OCH_2CF_3$ | O |
| A-2446 | Et | H | Me | F | $CH_2CH_2CH_2CH_2CH_2CH_2CH_2CH_2OCH_2CF_3$ | O |
| A-2447 | Et | H | Me | F | $CH_2CH_2OC(CF_3)_3$ | O |
| A-2448 | Et | H | Me | F | $CH_2CH_2CH_2OC(CF_3)_3$ | O |
| A-2449 | Et | H | Me | F | $CH_2CH_2CH_2CH_2OC(CF_3)_3$ | O |
| A-2450 | Et | H | Me | F | $CH_2CH_2CH_2CH_2CH_2OC(CF_3)_3$ | O |
| A-2451 | Et | H | Me | F | $CF_2CHFOCF_2CF_2CF_3$ | O |
| A-2452 | Et | H | Me | F | $CH_2CH_2$O(c-Pr) | O |
| A-2453 | Et | H | Me | F | $CH_2CH_2$O(c-Pen) | O |
| A-2454 | Et | H | Me | F | $CH_2CH_2$O(c-Hex) | O |
| A-2455 | Et | H | Me | F | $CH_2CH_2CH_2$O(c-Pr) | O |
| A-2456 | Et | H | Me | F | $CH_2CH_2CH_2$O(c-Pen) | O |
| A-2457 | Et | H | Me | F | $CH_2CH_2CH_2$O(c-Hex) | O |
| A-2458 | Et | H | Me | F | $CH_2CH_2CH_2CH_2$O(c-Pr) | O |

TABLE 57

| Compound Number | R[1] | R[2] | R[3] | R[4] | R[5] | A |
|---|---|---|---|---|---|---|
| A-2459 | Et | H | Me | F | $CH_2CH_2CH_2CH_2$O(c-Pen) | O |
| A-2460 | Et | H | Me | F | $CH_2CH_2CH_2CH_2$O(c-Hex) | O |
| A-2461 | Et | H | Me | F | $CH_2CH_2$O[c-Pr(2,2-$F_2$)] | O |
| A-2462 | Et | H | Me | F | $CH_2CH_2CH_2$O[c-Pr(2,2-$F_2$)] | O |
| A-2463 | Et | H | Me | F | $CH_2CH_2CH_2CH_2$O[c-Pr(2,2-$F_2$)] | O |
| A-2464 | Et | H | Me | F | $CH_2CH_2OCH_2CH_2OCH_3$ | O |
| A-2465 | Et | H | Me | F | $CH_2CH_2OCH_2CH_2OCH_2CF_3$ | O |
| A-2466 | Et | H | Me | F | $CH_2CF_2OCF_2CF_2OCF_3$ | O |
| A-2467 | Et | H | Me | F | $CF_2CHFOCF_2CF_2OCF_3$ | O |
| A-2468 | Et | H | Me | F | $CF_2CHFOCF_2$CF(CF3)$OCF_2CF_2CF_3$ | O |
| A-2469 | Et | H | Me | F | $CH_2CH_2SH$ | O |
| A-2470 | Et | H | Me | F | $CH_2CH_2CH_2SH$ | O |
| A-2471 | Et | H | Me | F | $CH_2CH_2CH_2CH_2SH$ | O |
| A-2472 | Et | H | Me | F | $CH_2CH_2CH_2CH_2CH_2SH$ | O |
| A-2473 | Et | H | Me | F | $CH_2CH_2CH_2CH_2CH_2CH_2SH$ | O |
| A-2474 | Et | H | Me | F | $CH_2$CH(SH)Me | O |
| A-2475 | Et | H | Me | F | $CH_2$CH[SC(=O)Me]Me | O |
| A-2476 | Et | H | Me | F | $CH_2CH_2$S(t-Bu) | O |
| A-2477 | Et | H | Me | F | $CH_2CH_2CH_2$S(t-Bu) | O |
| A-2478 | Et | H | Me | F | $CH_2CH_2CH_2CH_2$S(t-Bu) | O |
| A-2479 | Et | H | Me | F | $CH_2CH_2CH_2CH_2CH_2SCH_3$ | O |
| A-2480 | Et | H | Me | F | $CH_2CH_2CH_2CH_2CH_2SCH(CH_3)_2$ | O |
| A-2481 | Et | H | Me | F | $CH_2CH_2CH_2CH_2CH_2$S(t-Bu) | O |
| A-2482 | Et | H | Me | F | $CH_2CH_2CH_2CH_2CH_2CH_2SCH(CH_3)_2$ | O |
| A-2483 | Et | H | Me | F | $CH_2CH_2CH_2CH_2CH_2CH_2$S(t-Bu) | O |
| A-2484 | Et | H | Me | F | $CH_2CH_2CH_2CH_2CH_2CH_2CH_2$S(t-Bu) | O |
| A-2485 | Et | H | Me | F | $CH_2CH_2SCHF_2$ | O |
| A-2486 | Et | H | Me | F | $CH_2CH_2CH_2SCHF_2$ | O |
| A-2487 | Et | H | Me | F | $CH_2CH_2CH_2CH_2SCHF_2$ | O |
| A-2488 | Et | H | Me | F | $CH_2CH_2CH_2CH_2CH_2SCHF_2$ | O |
| A-2489 | Et | H | Me | F | $CH_2CH_2CH_2CH_2CH_2SCHF_2$ | O |
| A-2490 | Et | H | Me | F | $CH_2CH_2CH_2CH_2CH_2CH_2SCHF_2$ | O |
| A-2491 | Et | H | Me | F | $CH_2CH_2CH_2CH_2CH_2CH_2CH_2SCHF_2$ | O |
| A-2492 | Et | H | Me | F | $CH_2CH_2SCH_2CF_3$ | O |
| A-2493 | Et | H | Me | F | $CH_2CH_2CH_2CH_2CF_3$ | O |
| A-2494 | Et | H | Me | F | $CH_2CH_2CH_2CH_2SCH_2CF_3$ | O |
| A-2495 | Et | H | Me | F | $CH_2CH_2CH_2CH_2CH_2SCH_2CF_3$ | O |
| A-2496 | Et | H | Me | F | $CH_2CH_2CH_2CH_2CH_2CH_2SCH_2CF_3$ | O |
| A-2497 | Et | H | Me | F | $CH_2CH_2CH_2CH_2CH_2CH_2CH_2SCH_2CF_3$ | O |
| A-2498 | Et | H | Me | F | $CH_2CH(Me)SCH_2CF_3$ | O |
| A-2499 | Et | H | Me | F | $CH_2CH_2SCH(CF_3)_2$ | O |
| A-2500 | Et | H | Me | F | $CH_2CH_2CH_2SCH(CF_3)_2$ | O |
| A-2501 | Et | H | Me | F | $CH_2CH_2CH_2CH_2SCH(CF_3)_2$ | O |
| A-2502 | Et | H | Me | F | $CH_2CH_2CH_2CH_2CH_2SCH(CF_3)_2$ | O |

TABLE 58

| Compound Number | $R^1$ | $R^2$ | $R^3$ | $R^4$ | $R^5$ | A |
|---|---|---|---|---|---|---|
| A-2503 | Et | H | Me | F | $CH_2CH_2CH_2CH_2CH_2CH_2SCH(CF_3)_2$ | O |
| A-2504 | Et | H | Me | F | $CH_2CH_2CH_2CH_2CH_2SCF_2CF_3$ | O |
| A-2505 | Et | H | Me | F | $CH_2CH_2CH_2CH_2CH_2CH_2SCF_2CF_3$ | O |
| A-2506 | Et | H | Me | F | $CH_2CH_2CH_2CH_2CH_2CH_2SCF(CF_3)_2$ | O |
| A-2507 | Et | H | Me | F | $CH_2CH_2CH_2CH_2CH_2CH_2CH_2SCF(CF_3)_2$ | O |
| A-2508 | Et | H | Me | F | $CH_2CH_2CH_2CH_2CH_2SCCl_3$ | O |
| A-2509 | Et | H | Me | F | $CH_2CH_2CH_2CH_2CH_2CH_2SCCl_3$ | O |
| A-2510 | Et | H | Me | F | $CH_2CH_2SCH_2CH{=}CH_2$ | O |
| A-2511 | Et | H | Me | F | $CH_2CH_2CH_2SCH_2CH{=}CH_2$ | O |
| A-2512 | Et | H | Me | F | $CH_2CH_2CH_2CH_2SCH_2CH{=}CH_2$ | O |
| A-2513 | Et | H | Me | F | $CH_2CH_2SCF{=}CFCF_3$ | O |
| A-2514 | Et | H | Me | F | $CH_2CH_2CH_2SCF{=}CFCF_3$ | O |
| A-2515 | Et | H | Me | F | $CH_2CH_2CH_2CH_2SCF{=}CFCF_3$ | O |
| A-2516 | Et | H | Me | F | $CH_2CH_2CH_2S$(c-Pr) | O |
| A-2517 | Et | H | Me | F | $CH_2CH_2CH_2S$(c-Hex) | O |
| A-2518 | Et | H | Me | F | $CH_2CH_2CH_2CH_2S$(c-Pr) | O |
| A-2519 | Et | H | Me | F | $CH_2CH_2CH_2CH_2S$(c-Hex) | O |
| A-2520 | Et | H | Me | F | $CH_2CH_2CH_2CH_2CH_2S$(c-Pr) | O |
| A-2521 | Et | H | Me | F | $CH_2CH_2CH_2CH_2CH_2S$(c-Hex) | O |
| A-2522 | Et | H | Me | F | $CH_2CH_2CH_2S$[c-Hex(4,4-$F_2$)] | O |
| A-2523 | Et | H | Me | F | $CH_2CH_2CH_2CH_2S$[c-Hex(4,4-$F_2$)] | O |
| A-2524 | Et | H | Me | F | $CH_2CH_2CH_2CH_2CH_2S$[c-Hex(4,4-$F_2$)] | O |
| A-2525 | Et | H | Me | F | $CH_2CH_2CH_2SCH_2$(c-Pr) | O |
| A-2526 | Et | H | Me | F | $CH_2CH_2CH_2SCH_2$(c-Hex) | O |
| A-2527 | Et | H | Me | F | $CH_2CH_2CH_2CH_2SCH_2$(c-Pr) | O |
| A-2528 | Et | H | Me | F | $CH_2CH_2CH_2CH_2SCH_2$(C-Hex) | O |
| A-2529 | Et | H | Me | F | $CH_2CH_2CH_2CH_2CH_2SCH_2$(c-Pr) | O |
| A-2530 | Et | H | Me | F | $CH_2CH_2CH_2CH_2CH_2SCH_2$(c-Hex) | O |
| A-2531 | Et | H | Me | F | $CH_2CH_2CH_2SCH_2$[c-Hex(4,4-$F_2$)] | O |
| A-2532 | Et | H | Me | F | $CH_2CH_2CH_2CH_2SCH_2$[c-Hex(4,4-$F_2$)] | O |
| A-2533 | Et | H | Me | F | $CH_2CH_2CH_2CH_2CH_2SCH_2$[c-Hex(4,4-$F_2$)] | O |
| A-2534 | Et | H | Me | F | $CH_2CH_2CH_2SCH_2SiMe_3$ | O |
| A-2535 | Et | H | Me | F | $CH_2CH_2CH_2CH_2SCH_2SiMe_3$ | O |
| A-2536 | Et | H | Me | F | $CH_2CH_2CH_2CH_2CH_2SCH_2SiMe_3$ | O |
| A-2537 | Et | H | Me | F | $CH_2CH_2OCH_2CH_2SCH_3$ | O |
| A-2538 | Et | H | Me | F | $CH_2CH_2OCH_2CH_2SCHF_2$ | O |
| A-2539 | Et | H | Me | F | $CH_2CH_2OCH_2CH_2SCF_3$ | O |
| A-2540 | Et | H | Me | F | $CH_2CH_2OCH_2CH_2SCH_2CF_3$ | O |
| A-2541 | Et | H | Me | F | $CH_2CH_2CH_2S({=}O)$(t-Bu) | O |
| A-2542 | Et | H | Me | F | $CH_2CH_2CH_2CH_2S({=}O)$(t-Bu) | O |
| A-2543 | Et | H | Me | F | $CH_2CH_2CH_2CH_2CH_2CH_2CH_2S({=}O)$(t-Bu) | O |
| A-2544 | Et | H | Me | F | $CH_2CH_2S({=}O)CHF_2$ | O |
| A-2545 | Et | H | Me | F | $CH_2CH_2CH_2S({=}O)CHF_2$ | O |
| A-2546 | Et | H | Me | F | $CH_2CH_2CH_2CH_2S({=}O)CHF_2$ | O |

TABLE 59

| Compound Number | $R^1$ | $R^2$ | $R^3$ | $R^4$ | $R^5$ | A |
|---|---|---|---|---|---|---|
| A-2547 | Et | H | Me | F | $CH_2CH_2CH_2CH_2CH_2S({=}O)CHF_2$ | O |
| A-2548 | Et | H | Me | F | $CH_2CH_2CH_2CH_2CH_2CH_2S({=}O)CHF_2$ | O |
| A-2549 | Et | H | Me | F | $CH_2CH_2CH_2CH_2CH_2CH_2CH_2S({=}O)CHF_2$ | O |
| A-2550 | Et | H | Me | F | $CH_2CH_2S({=}O)CF_3$ | O |
| A-2551 | Et | H | Me | F | $CH_2CH_2CH_2S({=}O)CF_3$ | O |
| A-2552 | Et | H | Me | F | $CH_2CH_2CH_2CH_2S({=}O)CF_3$ | O |
| A-2553 | Et | H | Me | F | $CH_2CH_2CH_2CH_2CH_2S({=}O)CF_3$ | O |
| A-2554 | Et | H | Me | F | $CH_2CH_2CH_2CH_2CH_2CH_2S({=}O)CF_3$ | O |
| A-2555 | Et | H | Me | F | $CH_2CH_2CH_2CH_2CH_2CH_2CH_2S({=}O)CF_3$ | O |
| A-2556 | Et | H | Me | F | $CH_2CH_2S({=}O)CH_2CF_3$ | O |
| A-2557 | Et | H | Me | F | $CH_2CH_2CH_2S({=}O)CH_2CF_3$ | O |
| A-2558 | Et | H | Me | F | $CH_2CH_2CH_2CH_2S({=}O)CH_2CF_3$ | O |
| A-2559 | Et | H | Me | F | $CH_2CH_2CH_2CH_2CH_2S({=}O)CH_2CF_3$ | O |
| A-2560 | Et | H | Me | F | $CH_2CH_2CH_2CH_2CH_2CH_2S({=}O)CH_2CF_3$ | O |
| A-2561 | Et | H | Me | F | $CH_2CH_2CH_2CH_2CH_2CH_2CH_2S({=}O)CH_2CF_3$ | O |
| A-2562 | Et | H | Me | F | $CH_2CH(Me)S({=}O)CH_2CF_3$ | O |
| A-2563 | Et | H | Me | F | $CH_2CH_2CH_2S({=}O)$(c-Pr) | O |
| A-2564 | Et | H | Me | F | $CH_2CH_2CH_2CH_2S({=}O)$(c-Pr) | O |
| A-2565 | Et | H | Me | F | $CH_2CH_2CH_2CH_2S({=}O)$(c-Pen) | O |
| A-2566 | Et | H | Me | F | $CH_2CH_2CH_2CH_2S({=}O)$(c-Hex) | O |
| A-2567 | Et | H | Me | F | $CH_2CH_2CH_2CH_2CH_2S({=}O)$(c-Pr) | O |
| A-2568 | Et | H | Me | F | $CH_2CH_2CH_2CH_2CH_2S({=}O)$(c-Hex) | O |
| A-2569 | Et | H | Me | F | $CH_2CH_2CH_2S({=}O)$[c-Hex(4,4-$F_2$)] | O |

TABLE 59-continued

| Compound Number | $R^1$ | $R^2$ | $R^3$ | $R^4$ | $R^5$ | A |
|---|---|---|---|---|---|---|
| A-2570 | Et | H | Me | F | $CH_2CH_2CH_2CH_2S(=O)[c\text{-}Hex(4,4\text{-}F_2)]$ | O |
| A-2571 | Et | H | Me | F | $CH_2CH_2CH_2CH_2CH2S(=O)[c\text{-}Hex(4,4\text{-}F_2)]$ | O |
| A-2572 | Et | H | Me | F | $CH_2CH_2CH_2CH_2S(=O)_2Me$ | O |
| A-2573 | Et | H | Me | F | $CH_2CH_2CH_2CH_2CH_2S(=O)_2Me$ | O |
| A-2574 | Et | H | Me | F | $CH_2CH_2CH_2CH_2CH_2S(=O)_2(t\text{-}Bu)$ | O |
| A-2575 | Et | H | Me | F | $CH_2CH_2S(=O)_2CHF_2$ | O |
| A-2576 | Et | H | Me | F | $CH_2CH_2CH_2S(=O)_2CHF_2$ | O |
| A-2577 | Et | H | Me | F | $CH_2CH_2CH_2CH_2S(=O)_2CHF_2$ | O |
| A-2578 | Et | H | Me | F | $CH_2CH_2CH_2CH_2CH_2S(=O)_2CHF_2$ | O |
| A-2579 | Et | H | Me | F | $CH_2CH_2CH_2CH_2CH_2CH_2S(=O)_2CHF_2$ | O |
| A-2580 | Et | H | Me | F | $CH_2CH_2S(=O)_2CF_3$ | O |
| A-2581 | Et | H | Me | F | $CH_2CH_2CH_2S(=O)_2CF_3$ | O |
| A-2582 | Et | H | Me | F | $CH_2CH_2CH_2CH_2S(=O)_2CF_3$ | O |
| A-2583 | Et | H | Me | F | $CH_2CH_2CH_2CH_2CH_2S(=O)_2CF_3$ | O |
| A-2584 | Et | H | Me | F | $CH_2CH_2CH_2CH_2CH_2CH_2S(=O)_2CF_3$ | O |
| A-2585 | Et | H | Me | F | $CH_2CH_2CH_2CH_2CH_2CH_2CH_2S(=O)_2CF_3$ | O |
| A-2586 | Et | H | Me | F | $CH_2CH_2CH_2CH_2CH_2CH_2CH_2CH_2S(=O)_2CF_3$ | O |
| A-2587 | Et | H | Me | F | $CH_2CH_2S(=O)_2CH2CF_3$ | O |
| A-2588 | Et | H | Me | F | $CH_2CH_2CH_2S(=O)_2CH2CF_3$ | O |
| A-2589 | Et | H | Me | F | $CH_2CH_2CH_2CH_2S(=O)_2CH2CF_3$ | O |
| A-2590 | Et | H | Me | F | $CH_2CH_2CH_2CH_2CH_2S(=O)_2CH2CF_3$ | O |

TABLE 60

| Compound Number | $R^1$ | $R^2$ | $R^3$ | $R^4$ | $R^5$ | A |
|---|---|---|---|---|---|---|
| A-2591 | Et | H | Me | F | $CH_2CH_2CH_2CH_2CH_2CH_2S(=O)_2CH_2CF_3$ | O |
| A-2592 | Et | H | Me | F | $CH_2CH(Me)S(=O)_2CH2CF_3$ | O |
| A-2593 | Et | H | Me | F | $CH_2CH_2CH_2S(=O)_2(c\text{-}Pr)$ | O |
| A-2594 | Et | H | Me | F | $CH_2CH_2CH_2CH_2S(=O)_2(c\text{-}Pr)$ | O |
| A-2595 | Et | H | Me | F | $CH_2CH_2CH_2CH_2CH_2S(=O)_2(c\text{-}Pr)$ | O |
| A-2596 | Et | H | Me | F | $CH_2CH_2CH2S(=O)_2[c\text{-}Hex(4,4\text{-}F_2)]$ | O |
| A-2597 | Et | H | Me | F | $CH_2CH_2CH_2CH_2S(=O)_2[c\text{-}Hex(4,4\text{-}F_2)]$ | O |
| A-2598 | Et | H | Me | F | $CH_2CH_2CH_2CH_2CH_2S(=O)_2[c\text{-}Hex(4,4\text{-}F_2)]$ | O |
| A-2599 | Et | H | Me | F | $CH_2CH_2CH_2C(=O)H$ | O |
| A-2600 | Et | H | Me | F | $CH_2CH_2CH_2CH_2C(=O)H$ | O |
| A-2601 | Et | H | Me | F | $CH_2CH_2CH_2CH_2CH_2C(=O)H$ | O |
| A-2602 | Et | H | Me | F | $CH_2CH_2CH_2C(=O)(t\text{-}Bu)$ | O |
| A-2603 | Et | H | Me | F | $CH_2CH_2CH_2CH_2C(=O)(t\text{-}Bu)$ | O |
| A-2604 | Et | H | Me | F | $CH_2CH_2CH_2CH_2CH_2C(=O)(t\text{-}Bu)$ | O |
| A-2605 | Et | H | Me | F | $CH_2CH_2CH_2C(=O)CF_3$ | O |
| A-2606 | Et | H | Me | F | $CH_2CH_2CH_2CH_2C(=O)CF_3$ | O |
| A-2607 | Et | H | Me | F | $CH_2CH_2CH_2CH_2CH_2C(=O)CF_3$ | O |
| A-2608 | Et | H | Me | F | $CH_2C(=O)Ph$ | O |
| A-2609 | Et | H | Me | F | $CH_2C(=O)Ph(4\text{-}Cl)$ | O |
| A-2610 | Et | H | Me | F | $CH_2C(=O)Ph(4\text{-}CF_3)$ | O |
| A-2611 | Et | H | Me | F | $CH_2CH_2C(=O)Ph(4\text{-}CF_3)$ | O |
| A-2612 | Et | H | Me | F | $CH_2CH_2CH_2C(=O)Ph(4\text{-}CF_3)$ | O |
| A-2613 | Et | H | Me | F | $CH_2CH_2CH_2CH_2C(=O)Ph(4\text{-}CF_3)$ | O |
| A-2614 | Et | H | Me | F | $CH_2CH_2CH_2CH_2CH_2C(=O)Ph(4\text{-}CF_3)$ | O |
| A-2615 | Et | H | Me | F | $CH_2C(=O)OEt$ | O |
| A-2616 | Et | H | Me | F | $CH_2CH_2C(=O)O(t\text{-}Bu)$ | O |
| A-2617 | Et | H | Me | F | $CH_2CH_2CH_2C(=O)OEt$ | O |
| A-2618 | Et | H | Me | F | $CH_2CH_2CH_2C(=O)O(t\text{-}Bu)$ | O |
| A-2619 | Et | H | Me | F | $CH_2CH_2CH_2CH_2C(=O)O(t\text{-}Bu)$ | O |
| A-2620 | Et | H | Me | F | $CH_2CH_2CH_2CH_2CH_2C(=O)O(t\text{-}Bu)$ | O |
| A-2621 | Et | H | Me | F | $CH_2CH_2CH_2CH_2CH_2CH_2C(=O)O(t\text{-}Bu)$ | O |
| A-2622 | Et | H | Me | F | $CH_2CH_2CH_2CH_2CH_2CH_2CH_2C(=O)OEt$ | O |
| A-2623 | Et | H | Me | F | $CH_2CH_2C(=O)OCH_2CF_3$ | O |
| A-2624 | Et | H | Me | F | $CH_2CH_2CH_2C(=O)OCH_2CF_3$ | O |
| A-2625 | Et | H | Me | F | $CH_2CH_2CH_2CH_2C(=O)OCH_2CF_3$ | O |
| A-2626 | Et | H | Me | F | $CH_2CH_2CH_2CH_2CH_2C(=O)OCH_2CF_3$ | O |
| A-2627 | Et | H | Me | F | $CH_2CH_2C(=O)NH(t\text{-}Bu)$ | O |
| A-2628 | Et | H | Me | F | $CH_2CH_2CH_2C(=O)NH(t\text{-}Bu)$ | O |
| A-2629 | Et | H | Me | F | $CH_2CH_2CH_2C(=O)NH(t\text{-}Pen)$ | O |
| A-2630 | Et | H | Me | F | $CH_2CH_2CH_2CH_2C(=O)NH(t\text{-}Bu)$ | O |
| A-2631 | Et | H | Me | F | $CH_2CH_2C(=O)NHCH_2CF_3$ | O |
| A-2632 | Et | H | Me | F | $CH_2CH_2CH_2C(=O)NHCH_2CF_3$ | O |
| A-2633 | Et | H | Me | F | $CH_2CH_2CH_2CH_2C(=O)NHCH_2CF_3$ | O |
| A-2634 | Et | H | Me | F | $CH_2CH_2SC(=O)N(Me)_2$ | O |

TABLE 61

| Compound Number | $R^1$ | $R^2$ | $R^3$ | $R^4$ | $R^5$ | A |
|---|---|---|---|---|---|---|
| A-2635 | Et | H | Me | F | $CH_2CH_2CH_2SC({=}O)N(Me)_2$ | O |
| A-2636 | Et | H | Me | F | $CH_2CH_2CH_2SC({=}O)NH(t\text{-}Bu)$ | O |
| A-2637 | Et | H | Me | F | $CH_2CH_2CH_2CH_2CH_2SC({=}O)NH(t\text{-}Bu)$ | O |
| A-2638 | Et | H | Me | F | $CH_2CH_2SC({=}O)NHCH_2CF_3$ | O |
| A-2639 | Et | H | Me | F | $CH_2CH_2CH_2SC({=}O)NHCH_2CF_3$ | O |
| A-2640 | Et | H | Me | F | $CH_2CH_2CH_2CH_2SC({=}O)NHCH_2CF_3$ | O |
| A-2641 | Et | H | Me | F | $CH_2CH_2CH_2OC({=}O)H$ | O |
| A-2642 | Et | H | Me | F | $CH_2CH_2CH_2CH_2OC({=}O)H$ | O |
| A-2643 | Et | H | Me | F | $CH_2CH_2CH_2CH_2CH_2OC({=}O)H$ | O |
| A-2644 | Et | H | Me | F | $CH_2CH_2CH_2OC({=}O)Me$ | O |
| A-2645 | Et | H | Me | F | $CH_2CH_2CH_2CH_2OC({=}O)Me$ | O |
| A-2646 | Et | H | Me | F | $CH_2CH_2CH_2CH_2CH_2OC({=}O)Me$ | O |
| A-2647 | Et | H | Me | F | $CH_2CH_2OC({=}O)CF_3$ | O |
| A-2648 | Et | H | Me | F | $CH_2CH_2CH_2OC({=}O)CF_3$ | O |
| A-2649 | Et | H | Me | F | $CH_2CH_2CH_2CH_2OC({=}O)CF_3$ | O |
| A-2650 | Et | H | Me | F | $CH_2CH_2CH_2CH_2CH_2OC({=}O)Ph(4\text{-}CF_3)$ | O |
| A-2651 | Et | H | Me | F | $CH_2CH_2OC({=}O)Ph$ | O |
| A-2652 | Et | H | Me | F | $CH_2CH_2OC({=}O)Ph(4\text{-}CF_3)$ | O |
| A-2653 | Et | H | Me | F | $CH_2CH_2CH_2OC({=}O)Ph(4\text{-}CF_3)$ | O |
| A-2654 | Et | H | Me | F | $CH_2CH_2CH_2CH_2OC({=}O)Ph(4\text{-}CF_3)$ | O |
| A-2655 | Et | H | Me | F | $CH_2CH_2CH_2CH_2CH_2OC({=}O)Ph(4\text{-}CF_3)$ | O |
| A-2656 | Et | H | Me | F | $CH_2CH_2OS({=}O)Me$ | O |
| A-2657 | Et | H | Me | F | $CH_2CH_2CH_2OS({=}O)Me$ | O |
| A-2658 | Et | H | Me | F | $CH_2CH_2CH_2CH_2OS({=}O)Me$ | O |
| A-2659 | Et | H | Me | F | $CH_2CH_2CH_2CH_2CH_2OS({=}O)Me$ | O |
| A-2660 | Et | H | Me | F | $CH_2CH_2CH_2CH_2CH_2CH_2OS({=}O)Me$ | O |
| A-2661 | Et | H | Me | F | $CH_2CH_2OS({=}O)CF_3$ | O |
| A-2662 | Et | H | Me | F | $CH_2CH_2CH_2OS({=}O)CF_3$ | O |
| A-2663 | Et | H | Me | F | $CH_2CH_2CH_2CH_2OS({=}O)CF_3$ | O |
| A-2664 | Et | H | Me | F | $CH_2CH_2CH_2CH_2CH_2OS({=}O)CF_3$ | O |
| A-2665 | Et | H | Me | F | $CH_2CH_2CH_2CH_2CH_2CH_2OS({=}O)CF_3$ | O |
| A-2666 | Et | H | Me | F | $CH_2CH_2OS({=}O)Ph$ | O |
| A-2667 | Et | H | Me | F | $CH_2CH_2OS({=}O)Ph(4\text{-}Me)$ | O |
| A-2668 | Et | H | Me | F | $CH_2CH_2CH_2OS({=}O)Ph$ | O |
| A-2669 | Et | H | Me | F | $CH_2CH_2CH_2OS({=}O)Ph(4\text{-}Me)$ | O |
| A-2670 | Et | H | Me | F | $CH_2CH_2OS({=}O)_2Me$ | O |
| A-2671 | Et | H | Me | F | $CH_2CH_2CH_2OS({=}O)_2Me$ | O |
| A-2672 | Et | H | Me | F | $CH_2CH_2CH_2OS({=}O)_2CF_3$ | O |
| A-2673 | Et | H | Me | F | $CH_2CH_2CH_2CH_2OS({=}O)_2CF_3$ | O |
| A-2674 | Et | H | Me | F | $CH_2CH_2CH_2CH_2CH_2OS({=}O)_2CF_3$ | O |
| A-2675 | Et | H | Me | F | $CH_2CH_2CH_2CH_2CH_2CH_2OS({=}O)_2CF_2CF_2CF_2CF_3$ | O |
| A-2676 | Et | H | Me | F | $CH_2CH_2OS({=}O)_2Ph$ | O |
| A-2677 | Et | H | Me | F | $CH_2CH_2OS({=}O)_2Ph(4\text{-}Me)$ | O |
| A-2678 | Et | H | Me | F | $CH_2CH_2CH_2OS({=}O)_2Ph$ | O |

TABLE 62

| Compound Number | $R^1$ | $R^2$ | $R^3$ | $R^4$ | $R^5$ | A |
|---|---|---|---|---|---|---|
| A-2679 | Et | H | Me | F | $CH_2CH_2CH_2OS({=}O)_2Ph(4\text{-}Me)$ | O |
| A-2680 | Et | H | Me | F | $CH_2CH_2NH_2$ | O |
| A-2681 | Et | H | Me | F | $CH_2CH_2CH_2NH_2$ | O |
| A-2682 | Et | H | Me | F | $CH_2CH_2CH_2CH_2NH_2$ | O |
| A-2683 | Et | H | Me | F | $CH_2CH_2CH_2CH_2CH_2NH_2$ | O |
| A-2684 | Et | H | Me | F | $CH_2CH_2CH_2CH_2CH_2CH_2NH_2$ | O |
| A-2685 | Et | H | Me | F | $CH_2CH_2CH_2CH_2CH_2CH_2CH_2NH_2$ | O |
| A-2686 | Et | H | Me | F | $CH_2CH(Me)NH_2$ | O |
| A-2687 | Et | H | Me | F | $CH_2C^*H(Me)NH_2$:(R) | O |
| A-2688 | Et | H | Me | F | $CH_2C^*H(Me)NH_2$:(S) | O |
| A-2689 | Et | H | Me | F | $CH_2CH(Et)NH_2$ | O |
| A-2690 | Et | H | Me | F | $CH_2CH(i\text{-}Pr)NH_2$ | O |
| A-2691 | Et | H | Me | F | $CH(Me)CH_2NH_2$ | O |
| A-2692 | Et | H | Me | F | $CH(Et)CH_2NH_2$ | O |
| A-2693 | Et | H | Me | F | $CH(i\text{-}Pr)CH_2NH_2$ | O |
| A-2694 | Et | H | Me | F | $CH_2CH_2CH(Me)NH_2$ | O |
| A-2695 | Et | H | Me | F | $CH_2CH(Me)CH_2NH_2$ | O |
| A-2696 | Et | H | Me | F | $CH(Me)CH_2CH_2NH_2$ | O |
| A-2697 | Et | H | Me | F | $CH_2CH(Me)NH(c\text{-}Pr)$ | O |
| A-2698 | Et | H | Me | F | $CH_2CH(Me)NHOMe$ | O |
| A-2699 | Et | H | Me | F | $CH_2CH(Me)N(OMe)S({=}O)_2Ph(2\text{-}NO_2)$ | O |

TABLE 62-continued

| Compound Number | $R^1$ | $R^2$ | $R^3$ | $R^4$ | $R^5$ | A |
|---|---|---|---|---|---|---|
| A-2700 | Et | H | Me | F | $CH_2CH(Me)N(OMe)S(=O)_2Ph(4-NO_2)$ | O |
| A-2701 | Et | H | Me | F | $CH_2CH_2N(Me)(t-Bu)$ | O |
| A-2702 | Et | H | Me | F | $CH_2CH_2CH_2N(Me)(t-Bu)$ | O |
| A-2703 | Et | H | Me | F | $CH_2CH_2CH_2CH_2N(Me)(t-Bu)$ | O |
| A-2704 | Et | H | Me | F | $CH_2CH_2NHCH_2CF_3$ | O |
| A-2705 | Et | H | Me | F | $CH_2CH_2CH_2NHCH_2CF_3$ | O |
| A-2706 | Et | H | Me | F | $CH_2CH_2CH_2CH_2NHCH_2CF_3$ | O |
| A-2707 | Et | H | Me | F | $CH_2CH_2NHC(=O)C(Me)(CF_3)_2$ | O |
| A-2708 | Et | H | Me | F | $CH_2CH_2NHC(=O)Me$ | O |
| A-2709 | Et | H | Me | F | $CH_2CH_2NHC(=O)(t-Bu)$ | O |
| A-2710 | Et | H | Me | F | $CH_2CH_2CH_2CH_2NHC(=O)CH(CH_3)_2$ | O |
| A-2711 | Et | H | Me | F | $CH_2CH_2CH_2CH_2NHC(=O)(t-Bu)$ | O |
| A-2712 | Et | H | Me | F | $CH_2CH_2CH_2CH_2NHC(=O)CH_2(t-Bu)$ | O |
| A-2713 | Et | H | Me | F | $CH_2CH_2NHC(=O)CF_3$ | O |
| A-2714 | Et | H | Me | F | $CH_2CH_2NHC(=O)CH_2CF_3$ | O |
| A-2715 | Et | H | Me | F | $CH_2CH_2NHC(=O)CF_2CF_3$ | O |
| A-2716 | Et | H | Me | F | $CH_2CH_2CH_2NHC(=O)CF_3$ | O |
| A-2717 | Et | H | Me | F | $CH_2CH_2CH_2NHC(=O)CH_2CF_3$ | O |
| A-2718 | Et | H | Me | F | $CH_2CH_2CH_2NHC(=O)CF_2CF_3$ | O |
| A-2719 | Et | H | Me | F | $CH_2CH_2CH_2CH_2NHC(=O)CF_3$ | O |
| A-2720 | Et | H | Me | F | $CH_2CH_2CH_2CH_2NHC(=O)CH_2CF3$ | O |
| A-2721 | Et | H | Me | F | $CH_2CH_2CH_2CH_2NHC(=O)CF_2CF_3$ | O |
| A-2722 | Et | H | Me | F | $CH_2CH_2CH_2CH_2NHC(=O)CF(CF_3)_2$ | O |

TABLE 63

| Compound Number | $R^1$ | $R^2$ | $R^3$ | $R^4$ | $R^5$ | A |
|---|---|---|---|---|---|---|
| A-2723 | Et | H | Me | F | $CH_2CH_2CH_2CH_2NHC(=O)CCl_3$ | O |
| A-2724 | Et | H | Me | F | $CH_2CH(Me)NHC(=O)CF_3$ | O |
| A-2725 | Et | H | Me | F | $CH_2CH_2NHC(=O)Ph$ | O |
| A-2726 | Et | H | Me | F | $CH_2CH_2NHC(=O)Ph(4-CF_3)$ | O |
| A-2727 | Et | H | Me | F | $CH_2CH_2CH_2NHC(=O)Ph(4-CF_3)$ | O |
| A-2728 | Et | H | Me | F | $CH_2CH_2CH_2CH_2NHC(=O)Ph(4-CF_3)$ | O |
| A-2729 | Et | H | Me | F | $CH_2CH_2NHC(=O)O(t-Bu)$ | O |
| A-2730 | Et | H | Me | F | $CH_2CH_2CH_2NHC(=O)O(t-Bu)$ | O |
| A-2731 | Et | H | Me | F | $CH_2CH_2CH_2CH_2NHC(=O)O(t-Bu)$ | O |
| A-2732 | Et | H | Me | F | $CH_2CH_2CH_2CH_2NHC(=O)OCH(CH_3)_2$ | O |
| A-2733 | Et | H | Me | F | $CH_2CH(Me)NHC(=O)O(t-Bu)$ | O |
| A-2734 | Et | H | Me | F | $CH_2C$*$H(Me)NHC(=O)O(t-Bu)$:(R) | O |
| A-2735 | Et | H | Me | F | $CH_2C$*$H(Me)NHC(=O)O(t-Bu)$:(S) | O |
| A-2736 | Et | H | Me | F | $CH_2CH(Et)NHC(=O)O(t-Bu)$ | O |
| A-2737 | Et | H | Me | F | $CH_2CH(i-Pr)NHC(=O)O(t-Bu)$ | O |
| A-2738 | Et | H | Me | F | $CH(Me)CH_2NHC(=O)O(t-Bu)$ | O |
| A-2739 | Et | H | Me | F | $CH(Et)CH_2NHC(=O)O(t-Bu)$ | O |
| A-2740 | Et | H | Me | F | $CH(i-Pr)CH_2NHC(=O)O(t-Bu)$ | O |
| A-2741 | Et | H | Me | F | $CH_2CH(Me)CH_2NHC(=O)O(t-Bu)$ | O |
| A-2742 | Et | H | Me | F | $CH_2CH_2NHC(=O)OC(Me)_2CF_3$ | O |
| A-2743 | Et | H | Me | F | $CH_2CH_2CH_2NHC(=O)OCH_2CF_3$ | O |
| A-2744 | Et | H | Me | F | $CH_2CH_2CH_2NHC(=O)OCH_2CH_2CF_3$ | O |
| A-2745 | Et | H | Me | F | $CH_2CH_2CH_2CH_2NHC(=O)OCH_2CCl_3$ | O |
| A-2746 | Et | H | Me | F | $CH_2CH_2CH_2CH_2NHC(=O)OCH_2CF_3$ | O |
| A-2747 | Et | H | Me | F | $CH_2CH_2NHC(=O)NH(t-Bu)$ | O |
| A-2748 | Et | H | Me | F | $CH_2CH_2CH_2NHC(=O)NH(t-Bu)$ | O |
| A-2749 | Et | H | Me | F | $CH_2CH_2CH_2CH_2NHC(=O)NHEt$ | O |
| A-2750 | Et | H | Me | F | $CH_2CH_2CH_2CH_2NHC(=O)NH(t-Bu)$ | O |
| A-2751 | Et | H | Me | F | $CH_2CH_2CH_2NHC(=O)NHCH_2CCl_3$ | O |
| A-2752 | Et | H | Me | F | $CH_2CH_2CH_2NHC(=O)NHCH_2CH_2F$ | O |
| A-2753 | Et | H | Me | F | $CH_2CH_2CH_2NHC(=O)NHCH_2CF_3$ | O |
| A-2754 | Et | H | Me | F | $CH_2CH_2CH_2CH_2NHC(=O)NHCH_2CCl_3$ | O |
| A-2755 | Et | H | Me | F | $CH_2CH_2CH_2CH_2NHC(=O)NHCH_2CH_2F$ | O |
| A-2756 | Et | H | Me | F | $CH_2CH_2CH_2CH_2NHC(=O)NHCH_2CF_3$ | O |
| A-2757 | Et | H | Me | F | $CH_2CH_2NHS(=O)Me$ | O |
| A-2758 | Et | H | Me | F | $CH_2CH_2CH_2NHS(=O)Me$ | O |
| A-2759 | Et | H | Me | F | $CH_2CH_2CH_2CH_2NHS(=O)Me$ | O |
| A-2760 | Et | H | Me | F | $CH_2CH_2CH_2CH_2NHS(=O)CH(CH_3)_2$ | O |
| A-2761 | Et | H | Me | F | $CH_2CH_2CH_2CH_2CH_2NHS(=O)Me$ | O |
| A-2762 | Et | H | Me | F | $CH_2CH_2NHS(=O)CHF_2$ | O |
| A-2763 | Et | H | Me | F | $CH_2CH_2CH_2NHS(=O)CHF_2$ | O |
| A-2764 | Et | H | Me | F | $CH_2CH_2CH_2CH_2NHS(=O)CHF_2$ | O |
| A-2765 | Et | H | Me | F | $CH_2CH_2CH_2CH_2CH_2NHS(=O)CHF_2$ | O |
| A-2766 | Et | H | Me | F | $CH_2CH(Me)NHS(=O)CHF_2$ | O |

TABLE 64

| Compound Number | $R^1$ | $R^2$ | $R^3$ | $R^4$ | $R^5$ | A |
|---|---|---|---|---|---|---|
| A-2767 | Et | H | Me | F | $CH(Me)CH_2NHS(=O)CHF_2$ | O |
| A-2768 | Et | H | Me | F | $CH_2CH_2CH(Me)NHS(=O)CHF_2$ | O |
| A-2769 | Et | H | Me | F | $CH_2CH(Me)CH_2NHS(=O)CHF_2$ | O |
| A-2770 | Et | H | Me | F | $CH(Me)CH_2CH_2NHS(=O)CHF_2$ | O |
| A-2771 | Et | H | Me | F | $CH_2CH_2NHS(=O)CF_3$ | O |
| A-2772 | Et | H | Me | F | $CH_2CH_2CH_2NHS(=O)CF_3$ | O |
| A-2773 | Et | H | Me | F | $CH_2CH_2CH_2CH_2NHS(=O)CF_3$ | O |
| A-2774 | Et | H | Me | F | $CH_2CH_2CH_2CH_2CH_2NHS(=O)CF_3$ | O |
| A-2775 | Et | H | Me | F | $CH_2CH_2CH_2NHS(=O)Ph$ | O |
| A-2776 | Et | H | Me | F | $CH_2CH_2CH_2CH_2NHS(=O)Ph$ | O |
| A-2777 | Et | H | Me | F | $CH_2CH_2CH_2CH_2CH_2NHS(=O)Ph$ | O |
| A-2778 | Et | H | Me | F | $CH_2CH_2CH_2CH_2CH_2NHS(=O)Ph(4-CF_3)$ | O |
| A-2779 | Et | H | Me | F | $CH_2CH(Me)NHS(=O)Ph(4-CF_3)$ | O |
| A-2780 | Et | H | Me | F | $CH_2CH(Et)NHS(=O)Ph(4-CF_3)$ | O |
| A-2781 | Et | H | Me | F | $CH(Me)CH_2NHS(=O)Ph(4-CF_3)$ | O |
| A-2782 | Et | H | Me | F | $CH(Et)CH_2NHS(=O)Ph(4-CF_3)$ | O |
| A-2783 | Et | H | Me | F | $CH_2CH(Et)CH_2NHS(=O)Ph(4-CF_3)$ | O |
| A-2784 | Et | H | Me | F | $CH_2CH_2NHS(=O)_2Me$ | O |
| A-2785 | Et | H | Me | F | $CH_2CH_2CH_2NHS(=O)_2Me$ | O |
| A-2786 | Et | H | Me | F | $CH_2CH_2CH_2CH_2NHS(=O)_2Me$ | O |
| A-2787 | Et | H | Me | F | $CH_2CH_2CH_2CH_2NHS(=O)_2CH(CH_3)_2$ | O |
| A-2788 | Et | H | Me | F | $CH_2CH_2CH_2CH_2CH_2NHS(=O)_2Me$ | O |
| A-2789 | Et | H | Me | F | $CH_2CH_2NHS(=O)_2CHF_2$ | O |
| A-2790 | Et | H | Me | F | $CH_2CH_2CH_2NHS(=O)_2CHF_2$ | O |
| A-2791 | Et | H | Me | F | $CH_2CH_2CH_2CH_2NHS(=O)_2CHF_2$ | O |
| A-2792 | Et | H | Me | F | $CH_2CH_2CH_2CH_2CH_2NHS(=O)_2CHF_2$ | O |
| A-2793 | Et | H | Me | F | $CH_2CH(Me)NHS(=O)_2CHF_2$ | O |
| A-2794 | Et | H | Me | F | $CH(Me)CH_2NHS(=O)_2CHF_2$ | O |
| A-2795 | Et | H | Me | F | $CH_2CH_2CH(Me)NHS(=O)_2CHF_2$ | O |
| A-2796 | Et | H | Me | F | $CH_2CH(Me)CH_2NHS(=O)_2CHF_2$ | O |
| A-2797 | Et | H | Me | F | $CH(Me)CH_2CH_2NHS(=O)_2CHF_2$ | O |
| A-2798 | Et | H | Me | F | $CH_2CH(Me)N(Me)S(=O)_2CHF_2$ | O |
| A-2799 | Et | H | Me | F | $CH(Me)CH_2N(Me)S(=O)_2CHF_2$ | O |
| A-2800 | Et | H | Me | F | $CH_2CH_2CH(Me)N(Me)S(=O)_2CHF_2$ | O |
| A-2801 | Et | H | Me | F | $CH_2CH(Me)CH_2N(Me)S(=O)_2CHF_2$ | O |
| A-2802 | Et | H | Me | F | $CH(Me)CH_2CH_2N(Me)S(=O)_2CHF_2$ | O |
| A-2803 | Et | H | Me | F | $CH_2CH_2CH_2NHS(=O)_2Ph$ | O |
| A-2804 | Et | H | Me | F | $CH_2CH_2CH_2CH_2NHS(=O)_2Ph$ | O |
| A-2805 | Et | H | Me | F | $CH_2CH_2CH_2CH_2CH_2NHS(=O)_2Ph$ | O |
| A-2806 | Et | H | Me | F | $CH_2CH_2CH_2CH_2CH_2NHS(=O)_2Ph(4-CF_3)$ | O |
| A-2807 | Et | H | Me | F | $CH_2CH(Me)NHS(=O)_2Ph(4-CF_3)$ | O |
| A-2808 | Et | H | Me | F | $CH_2CH(Et)NHS(=O)_2Ph(4-CF_3)$ | O |
| A-2809 | Et | H | Me | F | $CH(Me)CH_2NHS(=O)_2Ph(4-CF_3)$ | O |
| A-2810 | Et | H | Me | F | $CH(Et)CH_2NHS(=O)_2Ph(4-CF_3)$ | O |

TABLE 65

| Compound Number | $R^1$ | $R^2$ | $R^3$ | $R^4$ | $R^5$ | A |
|---|---|---|---|---|---|---|
| A-2811 | Et | H | Me | F | $CH_2CH(Me)CH_2NHS(=O)_2Ph(4-CF_3)$ | O |
| A-2812 | Et | H | Me | F | $CH_2CH_2SiMe_3$ | O |
| A-2813 | Et | H | Me | F | $CH_2CH_2CH_2SiMe_3$ | O |
| A-2814 | Et | H | Me | F | $CH_2CH_2CH_2CH_2SiMe_3$ | O |
| A-2815 | Et | H | Me | F | $CH_2Ph$ | O |
| A-2816 | Et | H | Me | F | $CH_2Ph(2-CF_3)$ | O |
| A-2817 | Et | H | Me | F | $CH_2Ph(3-CF_3)$ | O |
| A-2818 | Et | H | Me | F | $CH_2Ph(4-CF_3)$ | O |
| A-2819 | Et | H | Me | F | $CH_2Ph(2-OCF_3)$ | O |
| A-2820 | Et | H | Me | F | $CH_2Ph(3-OCF_3)$ | O |
| A-2821 | Et | H | Me | F | $CH_2Ph(4-OCF_3)$ | O |
| A-2822 | Et | H | Me | F | $CH_2Ph(2-SCF_3)$ | O |
| A-2823 | Et | H | Me | F | $CH_2Ph(3-SCF_3)$ | O |
| A-2824 | Et | H | Me | F | $CH_2Ph(4-SCF_3)$ | O |
| A-2825 | Et | H | Me | F | $CH_2Ph(3-CH_2SCF_3)$ | O |
| A-2826 | Et | H | Me | F | $CH_2Ph(4-F)$ | O |
| A-2827 | Et | H | Me | F | $CH_2Ph(4-Cl)$ | O |
| A-2828 | Et | H | Me | F | $CH_2Ph(4-Br)$ | O |
| A-2829 | Et | H | Me | F | $CH_2Ph(4-Me)$ | O |
| A-2830 | Et | H | Me | F | $CH_2Ph[4-(t-Bu)]$ | O |
| A-2831 | Et | H | Me | F | $CH_2Ph(4-CN)$ | O |
| A-2832 | Et | H | Me | F | $CH_2Ph(4-NO_2)$ | O |
| A-2833 | Et | H | Me | F | $CH_2Ph(4-OCHF_2)$ | O |
| A-2834 | Et | H | Me | F | $CH_2Ph(4-SCHF_2)$ | O |
| A-2835 | Et | H | Me | F | $CH_2Ph(4-CH_2SCF_3)$ | O |
| A-2836 | Et | H | Me | F | $CH_2Ph[4-CF(CF_3)_2]$ | O |
| A-2837 | Et | H | Me | F | $CH_2Ph(4-CH_2SCF_3)$ | O |
| A-2838 | Et | H | Me | F | $CH_2Ph[4-Ph(4-CF_3)]$ | O |
| A-2839 | Et | H | Me | F | $CH_2Ph(2,4-Cl_2)$ | O |
| A-2840 | Et | H | Me | F | $CH_2Ph[2,5-(CF_3)_2]$ | O |
| A-2841 | Et | H | Me | F | $CH_2Ph(3,4-Cl_2)$ | O |
| A-2842 | Et | H | Me | F | $CH_2Ph(3-CF_3-4-F)$ | O |
| A-2843 | Et | H | Me | F | $CH_2Ph(3-CF_3-4-Cl)$ | O |
| A-2844 | Et | H | Me | F | $CH_2Ph(3-F-4-CF_3)$ | O |
| A-2845 | Et | H | Me | F | $CH_2Ph(2,4,6-F_3)$ | O |
| A-2846 | Et | H | Me | F | $CH_2Ph(3,4,5-F_3)$ | O |
| A-2847 | Et | H | Me | F | $CH_2Ph(2,3,4-F_3)$ | O |
| A-2848 | Et | H | Me | F | $CH_2Ph(3,4,5-Cl_3)$ | O |
| A-2849 | Et | H | Me | F | $CH_2CH_2Ph$ | O |
| A-2850 | Et | H | Me | F | $CH_2CH_2Ph(4-F)$ | O |
| A-2851 | Et | H | Me | F | $CH_2CH_2Ph(4-Cl)$ | O |
| A-2852 | Et | H | Me | F | $CH_2CH_2Ph(4-Br)$ | O |
| A-2853 | Et | H | Me | F | $CH_2CH_2Ph[4-(t-Bu)]$ | O |
| A-2854 | Et | H | Me | F | $CH_2CH_2Ph(2-CF_3)$ | O |

TABLE 66

| Compound Number | $R^1$ | $R^2$ | $R^3$ | $R^4$ | $R^5$ | A |
|---|---|---|---|---|---|---|
| A-2855 | Et | H | Me | F | $CH_2CH_2Ph(3-CF_3)$ | O |
| A-2856 | Et | H | Me | H | $CH_2CH_2Ph(4-CF_3)$ | O |
| A-2857 | Et | H | Me | F | $CH_2CH_2Ph(4-CF_3)$ | O |
| A-2858 | Et | H | Me | F | $CH_2CH_2Ph(4-CF(CF_3)_2)$ | O |
| A-2859 | Et | H | Me | F | $CH_2CH_2Ph[4-(c-Pr)]$ | O |
| A-2860 | Et | H | Me | F | $CH_2CH_2Ph\{4-[c-Pr(2,2-F_2)]\}$ | O |
| A-2861 | Et | H | Me | F | $CH_2CH_2Ph(4-OMe)$ | O |
| A-2862 | Et | H | Me | F | $CH_2CH_2Ph(3-OCF_3)$ | O |
| A-2863 | Et | H | Me | F | $CH_2CH_2Ph(4-OCHF_2)$ | O |
| A-2864 | Et | H | Me | F | $CH_2CH_2Ph(4-OCF_3)$ | O |
| A-2865 | Et | H | Me | F | $CH_2CH_2Ph(4-SMe)$ | O |
| A-2866 | Et | H | Me | F | $CH_2CH_2Ph(4-SCHF_2)$ | O |
| A-2867 | Et | H | Me | F | $CH_2CH_2Ph(4-SCF_3)$ | O |
| A-2868 | Et | H | Me | F | $CH_2CH_2Ph[4-S(=O)Me]$ | O |
| A-2869 | Et | H | Me | F | $CH_2CH_2Ph[4-S(=O)CF_3]$ | O |
| A-2870 | Et | H | Me | F | $CH_2CH_2Ph[4-S(=O)_2Me]$ | O |
| A-2871 | Et | H | Me | F | $CH_2CH_2Ph[4-S(=O)_2CF_3]$ | O |
| A-2872 | Et | H | Me | F | $CH_2CH_2Ph(4-CH_2SMe)$ | O |
| A-2873 | Et | H | Me | F | $CH_2CH_2Ph(4-CH_2SCF_3)$ | O |
| A-2874 | Et | H | Me | F | $CH_2CH_2Ph[4-OS(=O)_2Me]$ | O |
| A-2875 | Et | H | Me | F | $CH_2CH_2Ph[4-OS(=O)_2CF_3]$ | O |
| A-2876 | Et | H | Me | F | $CH_2CH_2Ph[4-Ph(4-CF_3)]$ | O |
| A-2877 | Et | H | Me | F | $CH_2CH_2Ph(4-CH_2Ph)$ | O |
| A-2878 | Et | H | Me | F | $CH_2CH_2Ph(4-OCH_2Ph)$ | O |
| A-2879 | Et | H | Me | F | $CH_2CH_2Ph(4-CN)$ | O |
| A-2880 | Et | H | Me | F | $CH_2CH_2Ph(4-NO_2)$ | O |
| A-2881 | Et | H | Me | F | $CH_2CH_2Ph(2,4-Cl_2)$ | O |
| A-2882 | Et | H | Me | F | $CH_2CH_2Ph(3,4-Cl_2)$ | O |
| A-2883 | Et | H | Me | F | $CH_2CH_2Ph(3-CF_3-4-F)$ | O |
| A-2884 | Et | H | Me | F | $CH_2CH_2Ph(2-CF_3-4-F)$ | O |
| A-2885 | Et | H | Me | F | $CH_2CH_2Ph(3-F-4-CF_3)$ | O |
| A-2886 | Et | H | Me | F | $CH_2CH_2Ph(2-F-4-CF_3)$ | O |
| A-2887 | Et | H | Me | F | $CH_2CH_2Ph(3-Cl-4-OCHF_2)$ | O |
| A-2888 | Et | H | Me | F | $CH_2CH_2Ph(3,4,5-Cl_3)$ | O |
| A-2889 | Et | H | Me | F | $CH_2CH_2Ph(2,3,4-F_3)$ | O |
| A-2890 | Et | H | Me | F | $CH_2CH_2Ph(2,4,5-F_3)$ | O |
| A-2891 | Et | H | Me | F | $CH_2CH_2Ph(3,4,5-F_3)$ | O |
| A-2892 | Et | H | Me | F | $CH_2CH_2Ph(2,4,6-F_3)$ | O |
| A-2893 | Et | H | Me | F | $CH_2CH_2CH_2Ph$ | O |
| A-2894 | Et | H | Me | F | $CH_2CH_2CH_2Ph(3-CF_3)$ | O |
| A-2895 | Et | H | Me | F | $CH_2CH_2CH_2Ph(4-CF_3)$ | O |
| A-2896 | Et | H | Me | F | $CH_2CH_2CH_2Ph(4-F)$ | O |

TABLE 66-continued

| Compound Number | $R^1$ | $R^2$ | $R^3$ | $R^4$ | $R^5$ | A |
|---|---|---|---|---|---|---|
| A-2897 | Et | H | Me | F | $CH_2CH_2CH_2Ph[4-(t-Bu)]$ | O |
| A-2898 | Et | H | Me | F | $CH_2CH_2CH_2Ph(4-CN)$ | O |

TABLE 67

| Compound Number | $R^1$ | $R^2$ | $R^3$ | $R^4$ | $R^5$ | A |
|---|---|---|---|---|---|---|
| A-2899 | Et | H | Me | F | $CH_2CH_2CH_2Ph(4-CF_3)$ | O |
| A-2900 | Et | H | Me | F | $CH_2CH_2CH_2Ph(4-OCHF_2)$ | O |
| A-2901 | Et | H | Me | F | $CH_2CH_2CH_2Ph(4-OCF_3)$ | O |
| A-2902 | Et | H | Me | F | $CH_2CH_2CH_2Ph(4-SCHF_2)$ | O |
| A-2903 | Et | H | Me | F | $CH_2CH_2CH_2Ph(4-SCF_3)$ | O |
| A-2904 | Et | H | Me | F | $CH_2CH_2CH_2Ph[4-CF(CF_3)_2]$ | O |
| A-2905 | Et | H | Me | F | $CH_2CH_2CH_2Ph(3,4,5-F_3)$ | O |
| A-2906 | Et | H | Me | F | $CH_2CH_2CH_2Ph(2,4,6-F_3)$ | O |
| A-2907 | Et | H | Me | F | $CH_2CH_2CH_2CH_2Ph$ | O |
| A-2908 | Et | H | Me | F | $CH_2CH_2CH_2CH_2Ph(4-F)$ | O |
| A-2909 | Et | H | Me | F | $CH_2CH_2CH_2CH_2Ph(4-CF_3)$ | O |
| A-2910 | Et | H | Me | F | $CH_2CH_2CH_2CH_2Ph(4-OCF_3)$ | O |
| A-2911 | Et | H | Me | F | $CH_2CH_2CH_2CH_2Ph(4-SCF_3)$ | O |
| A-2912 | Et | H | Me | F | $CH_2CH_2CH_2CH_2CH_2Ph$ | O |
| A-2913 | Et | H | Me | F | $CH_2CH_2CH_2CH_2CH_2CH_2Ph$ | O |
| A-2914 | Et | H | Me | F | $CH_2CF_2Ph(4-F)$ | O |
| A-2915 | Et | H | Me | F | $CH_2CF_2Ph(4-CF_3)$ | O |
| A-2916 | Et | H | Me | H | $CH_2CF_2Ph(3,4,5-F_3)$ | O |
| A-2917 | Et | H | Me | F | $CH_2CF_2Ph(3,4,5-F_3)$ | O |
| A-2918 | Et | H | Me | F | $CH_2CH_2OPh$ | O |
| A-2919 | Et | H | Me | F | $CH_2CH_2OPh(4-F)$ | O |
| A-2920 | Et | H | Me | F | $CH_2CH_2OPh(4-CF_3)$ | O |
| A-2921 | Et | H | Me | F | $CH_2CH_2CH_2OPh$ | O |
| A-2922 | Et | H | Me | F | $CH_2CH_2CH_2OPh(4-Cl)$ | O |
| A-2923 | Et | H | Me | F | $CH_2CH_2CH_2OPh(4-CF_3)$ | O |
| A-2924 | Et | H | Me | F | $CH_2CH_2CH_2CH_2OPh(4-CF_3)$ | O |
| A-2925 | Et | H | Me | F | $CH_2CH_2CH_2CH_2OPh(4-OCF_3)$ | O |
| A-2926 | Et | H | Me | F | $CH_2CH_2CH_2CH_2CH_2OPh(4-CF_3)$ | O |
| A-2927 | Et | H | Me | F | $CH_2CH_2OCH_2Ph$ | O |
| A-2928 | Et | H | Me | F | $CH_2CH_2CH_2OCH_2Ph$ | O |
| A-2929 | Et | H | Me | F | $CH_2CH_2CH_2CH_2OCH_2Ph$ | O |
| A-2930 | Et | H | Me | F | $CH_2CH_2CH_2CH_2CH_2OCH_2Ph$ | O |
| A-2931 | Et | H | Me | F | $CH_2CH_2SPh$ | O |
| A-2932 | Et | H | Me | F | $CH_2CH_2CH_2SPh$ | O |
| A-2933 | Et | H | Me | F | $CH_2CH_2CH_2SPh(4-F)$ | O |
| A-2934 | Et | H | Me | F | $CH_2CH_2CH_2SPh(4-Cl)$ | O |
| A-2935 | Et | H | Me | F | $CH_2CH_2CH_2SPh(4-Br)$ | O |
| A-2936 | Et | H | Me | F | $CH_2CH_2CH_2SPh[4-(t-Bu)]$ | O |
| A-2937 | Et | H | Me | F | $CH_2CH_2CH_2SPh(3-CF_3)$ | O |
| A-2938 | Et | H | Me | F | $CH_2CH_2CH_2SPh(4-CF_3)$ | O |
| A-2939 | Et | H | Me | F | $CH_2CH_2CH_2SPh(3-SCF_3)$ | O |
| A-2940 | Et | H | Me | F | $CH_2CH_2CH_2SPh(4-SCF_3)$ | O |

TABLE 67-continued

| Compound Number | $R^1$ | $R^2$ | $R^3$ | $R^4$ | $R^5$ | A |
|---|---|---|---|---|---|---|
| A-2941 | Et | H | Me | F | $CH_2CH_2CH_2CH_2SPh$ | O |
| A-2942 | Et | H | Me | F | $CH_2CH_2CH_2CH_2SPh(4-F)$ | O |

TABLE 68

| Compound Number | $R^1$ | $R^2$ | $R^3$ | $R^4$ | $R^5$ | A |
|---|---|---|---|---|---|---|
| A-2943 | Et | H | Me | F | $CH_2CH_2CH_2CH_2SPh(4-Cl)$ | O |
| A-2944 | Et | H | Me | F | $CH_2CH_2CH_2CH_2SPh[4-(t-Bu)]$ | O |
| A-2945 | Et | H | Me | F | $CH_2CH_2CH_2CH_2SPh(4-CF_3)$ | O |
| A-2946 | Et | H | Me | F | $CH_2CH_2CH_2CH_2CH_2SPh$ | O |
| A-2947 | Et | H | Me | F | $CH_2CH_2CH_2CH_2CH_2SPh(4-F)$ | O |
| A-2948 | Et | H | Me | F | $CH_2CH_2CH_2CH_2CH_2SPh(4-Cl)$ | O |
| A-2949 | Et | H | Me | F | $CH_2CH_2CH_2CH_2CH_2SPh(4-CF_3)$ | O |
| A-2950 | Et | H | Me | F | $CH_2CH_2S(=O)Ph$ | O |
| A-2951 | Et | H | Me | F | $CH_2CH_2CH_2S(=O)Ph$ | O |
| A-2952 | Et | H | Me | F | $CH_2CH_2CH_2S(=O)Ph(4-F)$ | O |
| A-2953 | Et | H | Me | F | $CH_2CH_2CH_2S(=O)Ph[4-(t-Bu)]$ | O |
| A-2954 | Et | H | Me | F | $CH_2CH_2CH_2S(=O)Ph(4-CF_3)$ | O |
| A-2955 | Et | H | Me | F | $CH_2CH_2S(=O)_2Ph$ | O |
| A-2956 | Et | H | Me | F | $CH_2CH_2S(=O)_2Ph(4-CF_3)$ | O |
| A-2957 | Et | H | Me | F | $CH_2CH_2CH_2S(=O)_2Ph(4-F)$ | O |
| A-2958 | Et | H | Me | F | $CH_2CH_2CH_2S(=O)_2Ph(4-Cl)$ | O |
| A-2959 | Et | H | Me | F | $CH_2CH_2CH_2S(=O)_2Ph(4-CF_3)$ | O |
| A-2960 | Et | H | Me | F | $CH_2CH_2CH_2CH_2S(=O)_2Ph$ | O |
| A-2961 | Et | H | Me | F | $CH_2CH_2CH_2CH_2S(=O)_2Ph(4-Cl)$ | O |
| A-2962 | Et | H | Me | F | $CH_2CH_2CH_2CH_2S(=O)_2Ph(4-CF_3)$ | O |
| A-2963 | Et | H | Me | F | $CH_2CH_2SCH_2Ph$ | O |
| A-2964 | Et | H | Me | F | $CH_2CH_2CH_2SCH_2Ph$ | O |
| A-2965 | Et | H | Me | F | $CH_2CH_2CH_2SCH_2Ph(2-Cl)$ | O |
| A-2966 | Et | H | Me | F | $CH_2CH_2CH_2SCH_2Ph(3-Cl)$ | O |
| A-2967 | Et | H | Me | F | $CH_2CH_2CH_2SCH_2Ph(4-Cl)$ | O |
| A-2968 | Et | H | Me | F | $CH_2CH_2CH_2SCH_2Ph(2-SCF_3)$ | O |
| A-2969 | Et | H | Me | F | $CH_2CH_2CH_2SCH_2Ph(3-CF_3)$ | O |
| A-2970 | Et | H | Me | F | $CH_2CH_2CH_2SCH_2Ph(4-CF_3)$ | O |
| A-2971 | Et | H | Me | F | $CH_2CH_2CH_2SCH_2Ph(4-NO_2)$ | O |
| A-2972 | Et | H | Me | F | $CH_2CH_2CH_2CH_2SCH_2Ph$ | O |
| A-2973 | Et | H | Me | F | $CH_2CH_2CH_2CH_2SCH_2Ph(4-Cl)$ | O |
| A-2974 | Et | H | Me | F | $CH_2CH_2CH_2CH_2SCH_2Ph(4-CF_3)$ | O |
| A-2975 | Et | H | Me | F | $CH_2CH_2CH_2CH_2SCH_2Ph(4-CN)$ | O |
| A-2976 | Et | H | Me | F | $CH_2CH_2CH_2CH_2CH_2SCH_2Ph$ | O |
| A-2977 | Et | H | Me | F | $CH_2CH_2SCH_2CH_2Ph$ | O |
| A-2978 | Et | H | Me | F | $CH_2CH_2CH_2SCH_2CH_2Ph$ | O |
| A-2979 | Et | H | Me | F | $CH_2CH_2CH_2CH_2SCH_2CH_2Ph$ | O |
| A-2980 | Et | H | Me | F | $CH_2CH_2SCH(Me)Ph$ | O |
| A-2981 | Et | H | Me | F | $CH_2CH_2CH_2SCH(Me)Ph$ | O |
| A-2982 | Et | H | Me | F | $CH_2CH_2CH_2CH_2SCH(Me)Ph$ | O |
| A-2983 | Et | H | Me | F | $CH_2CH_2S(=O)CH_2Ph$ | O |
| A-2984 | Et | H | Me | F | $CH_2CH_2S(=O)CH_2Ph(4-CF_3)$ | O |
| A-2985 | Et | H | Me | F | $CH_2CH_2CH_2S(=O)CH_2Ph$ | O |
| A-2986 | Et | H | Me | F | $CH_2CH_2CH_2S(=O)CH_2Ph(2-SCF_3)$ | O |

TABLE 69

| Compound Number | $R^1$ | $R^2$ | $R^3$ | $R^4$ | $R^5$ | A |
|---|---|---|---|---|---|---|
| A-2987 | Et | H | Me | F | $CH_2CH_2CH_2S(=O)CH_2Ph(4-SCF_3)$ | O |
| A-2988 | Et | H | Me | F | $CH_2CH_2CH_2S(=O)CH_2Ph(4-Cl)$ | O |
| A-2989 | Et | H | Me | F | $CH_2CH_2CH_2S(=O)CH_2Ph(4-CF_3)$ | O |
| A-2990 | Et | H | Me | F | $CH_2CH_2CH_2CH_2S(=O)CH_2Ph$ | O |
| A-2991 | Et | H | Me | F | $CH_2CH_2CH_2CH_2S(=O)CH_2Ph(4-CF_3)$ | O |
| A-2992 | Et | H | Me | F | $CH_2CH_2CH_2CH_2CH_2S(=O)CH_2Ph(4-CF_3)$ | O |
| A-2993 | Et | H | Me | F | $CH_2CH_2S(=O)_2CH_2Ph$ | O |
| A-2994 | Et | H | Me | F | $CH_2CH_2S(=O)_2CH_2Ph(4-CF_3)$ | O |
| A-2995 | Et | H | Me | F | $CH_2CH_2CH_2S(=O)_2CH_2Ph$ | O |
| A-2996 | Et | H | Me | F | $CH_2CH_2CH_2S(=O)_2CH_2Ph(4-Cl)$ | O |
| A-2997 | Et | H | Me | F | $CH_2CH_2CH_2S(=O)_2CH_2Ph(4-CF_3)$ | O |
| A-2998 | Et | H | Me | F | $CH_2CH_2CH_2CH_2S(=O)_2CH_2Ph$ | O |

TABLE 69-continued

| Compound Number | $R^1$ | $R^2$ | $R^3$ | $R^4$ | $R^5$ | A |
|---|---|---|---|---|---|---|
| A-2999 | Et | H | Me | F | $CH_2CH_2CH_2CH_2S(=O)_2CH_2Ph(4\text{-}CF_3)$ | O |
| A-3000 | Et | H | Me | F | $CH_2CH_2CH_2CH_2CH_2S(=O)_2CH_2Ph$ | O |
| A-3001 | Et | H | Me | F | $CH_2CH_2CH_2CH_2CH_2S(=O)_2CH_2Ph(4\text{-}CF_3)$ | O |
| A-3002 | Et | H | Me | F | $CH_2CH_2ON{=}CH$(t-Bu) | O |
| A-3003 | Et | H | Me | F | $CH_2CH_2CH_2ON{=}CH$(t-Bu) | O |
| A-3004 | Et | H | Me | F | $CH_2CH_2CH_2CH_2ON{=}C$(Me)(c-Pr) | O |
| A-3005 | Et | H | Me | F | $CH_2CH_2ON{=}C(Me)CF_3$ | O |
| A-3006 | Et | H | Me | F | $CH_2CH_2CH_2ON{=}CHCF_3$ | O |
| A-3007 | Et | H | Me | F | $CH_2CH_2CH_2ON{=}C(Me)CF_3$ | O |
| A-3008 | Et | H | Me | F | $CH_2CH_2CH_2ON{=}C(Me)CCl_3$ | O |
| A-3009 | Et | H | Me | F | $CH_2CH_2CH_2CH_2ON{=}CHCF_3$ | O |
| A-3010 | Et | H | Me | F | $CH_2CH_2CH_2CH_2ON{=}C(Me)CF_3$ | O |
| A-3011 | Et | H | Me | F | $CH_2CH_2CH_2CH_2CH_2ON{=}C(Me)CF_3$ | O |
| A-3012 | Et | H | Me | F | $CH_2CH_2ON{=}CHPh$ | O |
| A-3013 | Et | H | Me | F | $CH_2CH_2ON{=}CHPh(4\text{-}CF_3)$ | O |
| A-3014 | Et | H | Me | F | $CH_2CH_2ON{=}CHPh(4\text{-}SCF_3)$ | O |
| A-3015 | Et | H | Me | F | $CH_2CH_2CH_2ON{=}CHPh(3\text{-}CF_3)$ | O |
| A-3016 | Et | H | Me | F | $CH_2CH_2CH_2ON{=}CHPh(4\text{-}CF_3)$ | O |
| A-3017 | Et | H | Me | F | $CH_2CH_2CH_2ON{=}CHPh(4\text{-}SCF_3)$ | O |
| A-3018 | Et | H | Me | F | $CH_2CH_2CH_2ON{=}C(Me)Ph(4\text{-}CF_3)$ | O |
| A-3019 | Et | H | Me | F | $CH_2CH_2CH_2CH_2ON{=}CHPh(4\text{-}SCF_3)$ | O |
| A-3020 | Et | H | Me | F | $CH_2CH_2$(adamant-1-yl) | O |
| A-3021 | Et | H | Me | F | $CH_2CH_2CH_2(3\text{-}CF_3$-pyrazol-1-yl) | O |
| A-3022 | Et | H | Me | F | $CH_2CH_2CH_2CH_2(3\text{-}CF_3$-pyrazol-1-yl) | O |
| A-3023 | Et | H | Me | F | $CH_2CH_2CH_2CH_2CH_2(3\text{-}CF_3$-pyrazol-1-yl) | O |
| A-3024 | Et | H | Me | F | $CH_2$(1-Me-4-$CF_3$-imidazol-5-yl) | O |
| A-3025 | Et | H | Me | F | $CH_2CH_2$(1-Me-4-$CF_3$-imidazol-5-yl) | O |
| A-3026 | Et | H | Me | F | $CH_2CH_2CH_2$(1-Me-4-$CF_3$-imidazol-5-yl) | O |
| A-3027 | Et | H | Me | F | $CH_2CH_2CH_2(3\text{-}CF_3$-1,2,4-triazol-1-yl) | O |
| A-3028 | Et | H | Me | F | $CH_2CH_2CH_2CH_2(3\text{-}CF_3$-1,2,4-triazol-1-yl) | O |
| A-3029 | Et | H | Me | F | $CH_2CH_2CH_2CH_2CH_2(3\text{-}CF_3$-1,2,4-triazol-1-yl) | O |
| A-3030 | Et | H | Me | F | $CH_2CH_2CH_2(4\text{-}CF_3$-thiazol-2-yl) | O |

TABLE 70

| Compound Number | $R^1$ | $R^2$ | $R^3$ | $R^4$ | $R^5$ | A |
|---|---|---|---|---|---|---|
| A-3031 | Et | H | Me | F | $CH_2CH_2CH_2CH_2(4\text{-}CF_3$-thiazol-2-yl) | O |
| A-3032 | Et | H | Me | F | $CH_2CH_2CH_2CH_2CH_2(4\text{-}CF_3$-thiazol-2-yl) | O |
| A-3033 | Et | H | Me | F | $CH_2CH_2CH_2(2\text{-}CF_3$-pyridin-5-yl) | O |
| A-3034 | Et | H | Me | F | $CH_2CH_2CH_2CH_2(2\text{-}CF_3$-pyridin-5-yl) | O |
| A-3035 | Et | H | Me | F | $CH_2CH_2CH_2CH_2CH_2(2\text{-}CF_3$-pyridin-5-yl) | O |
| A-3036 | Et | H | Me | F | $CH_2(4\text{-}CF_3$-pyrimidin-2-yl) | O |
| A-3037 | Et | H | Me | F | $CH_2CH_2(4\text{-}CF_3$-pyrimidin-2-yl) | O |
| A-3038 | Et | H | Me | F | $CH_2CH_2CH_2(4\text{-}CF_3$-pyrimidin-2-yl) | O |
| A-3039 | Et | H | Me | F | $CH_2CH_2O$(3-Cl-5-$CF_3$-pyridin-2-yl) | O |
| A-3040 | Et | H | Me | F | $CH_2CH_2CH_2O$(3-Cl-5-$CF_3$-pyridin-2-yl) | O |
| A-3041 | Et | H | Me | F | $CH_2CH_2CH_2CH_2O$(3-Cl-5-$CF_3$-pyridin-2-yl) | O |
| A-3042 | Et | H | Me | F | $CH_2CH_2CH_2CH_2CH_2O$(3-Cl-5-$CF_3$-pyridin-2-yl) | O |
| A-3043 | Et | H | Me | F | $CH_2CH_2N$(Phth) | O |
| A-3044 | Et | H | Me | F | $CH_2CH_2CH_2N$(Phth) | O |
| A-3045 | Et | H | Me | F | $CH_2CH_2CH_2CH_2N$(Phth) | O |
| A-3046 | Et | H | Me | F | $CH_2CH_2CH_2CH_2CH_2N$(Phth) | O |
| A-3047 | Et | H | Me | F | $CH_2CH(Me)CH_2N$(Phth) | O |
| A-3048 | Et | H | Me | F | $CH_2$[1,3-dioxolan(2-$CF_3$)-2-yl] | O |
| A-3049 | Et | H | Me | F | $CH_2$(azetidin-3-yl) | O |
| A-3050 | Et | H | Me | F | $CH_2$(pyrrolidin-3-yl) | O |
| A-3051 | Et | H | Me | F | $CH_2$(piperidin-3-yl) | O |
| A-3052 | Et | H | Me | F | $CH_2${azetidin[1-C(=O)O(t-Bu)]-3-yl} | O |
| A-3053 | Et | H | Me | F | $CH_2${pyrrolidin[1-C(=O)O(t-Bu)]-3-yl} | O |
| A-3054 | Et | H | Me | F | $CH_2${piperidin[1-C(=O)O(t-Bu)]-3-yl} | O |
| A-3055 | Et | H | Me | F | $CH_2${azetidin[1-C(=O)$CF_3$]-3-yl} | O |
| A-3056 | Et | H | Me | F | $CH_2${azetidin[1-S(=O)$_2CF_3$]-3-yl} | O |
| A-3057 | Et | H | Me | F | $CH_2${pyrrolidin[1-C(=O)$CF_3$]-3-yl} | O |
| A-3058 | Et | H | Me | F | $CH_2${pyrrolidin[1-S(=O)$_2CF_3$]-3-yl} | O |
| A-3059 | Et | H | Me | F | $CH_2${piperidin[1-C(=O)$CF_3$]-3-yl} | O |
| A-3060 | Et | H | Me | F | $CH_2${piperidin[1-S(=O)$_2CF_3$]-3-yl} | O |
| A-3061 | Et | H | Me | F | $CH_2CH_2CH_2CN$ | O |
| A-3062 | Et | H | Me | F | $CH_2CH_2CH_2CH_2CN$ | O |
| A-3063 | Et | H | Me | F | $CH_2CH_2CH_2CH_2CH_2CN$ | O |
| A-3064 | Et | H | Me | F | $CH_2CH_2CH_2CH_2CH_2CH_2CN$ | O |
| A-3065 | Et | H | Me | F | $CH_2CH_2CH_2C(=O)OH$ | O |

TABLE 70-continued

| Compound Number | $R^1$ | $R^2$ | $R^3$ | $R^4$ | $R^5$ | A |
|---|---|---|---|---|---|---|
| A-3066 | Et | H | Me | F | $CH_2CH_2CH_2CH_2C(=O)OH$ | O |
| A-3067 | Et | H | Me | F | $CH_2CH_2CH_2CH_2CH_2C(=O)OH$ | O |
| A-3068 | Et | H | Me | F | $CH_2CH_2SCN$ | O |
| A-3069 | Et | H | Me | F | $CH_2CH_2CH_2SCN$ | O |
| A-3070 | Et | H | Me | F | $CH_2CH_2CH_2CH_2SCN$ | O |
| A-3071 | Et | H | Me | F | $CH_2CH_2CH_2CH_2CH_2SCN$ | O |
| A-3072 | Et | H | Me | Cl | $CH_2CH_2CH_2CH_2CH_2SCN$ | O |
| A-3073 | Et | H | Me | F | $CH_2CH_2CH_2CH_2CH_2CH_2SCN$ | O |
| A-3074 | Et | H | Me | F | $CH_2CH_2CH_2CH_2CH_2CH_2CH_2SCN$ | O |

TABLE 71

| Compound Number | $R^1$ | $R^2$ | $R^3$ | $R^4$ | $R^5$ | A |
|---|---|---|---|---|---|---|
| A-3075 | Et | H | Me | F | $CH_2CH_2CH_2CH_2CH_2CH_2CH_2CH_2SCN$ | O |
| A-3076 | Et | H | Me | F | $CH_2CH_2CH(Me)SCN$ | O |
| A-3077 | Et | H | Me | F | $CH_2CH(Me)CH_2SCN$ | O |
| A-3078 | Et | H | Me | F | $CH(Me)CH_2CH_2SCN$ | O |
| A-3079 | Et | H | Me | F | $CH_2CH_2CH_2CH(Me)SCN$ | O |
| A-3080 | Et | H | Me | F | $CH_2CH_2CH(Me)CH_2SCN$ | O |
| A-3081 | Et | H | Me | F | $CH_2CH(Me)CH_2CH_2SCN$ | O |
| A-3082 | Et | H | Me | F | $CH(Me)CH_2CH_2CH_2SCN$ | O |
| A-3083 | Et | H | Me | F | $CH_2CH_2CH_2CH_2CH(Me)SCN$ | O |
| A-3084 | Et | H | Me | F | $CH_2CH_2CH_2CH(Me)CH_2SCN$ | O |
| A-3085 | Et | H | Me | F | $CH_2CH_2CH(Me)CH_2CH_2SCN$ | O |
| A-3086 | Et | H | Me | F | $CH_2CH(Me)CH_2CH_2CH_2SCN$ | O |
| A-3087 | Et | H | Me | F | $CH(Me)CH_2CH_2CH_2CH_2SCN$ | O |
| A-3088 | Et | H | Me | F | $CH_2CH_2ONH_2$ | O |
| A-3089 | Et | H | Me | F | $CH_2CH_2CH_2ONH_2$ | O |
| A-3090 | Et | H | Me | F | $CH_2CH_2CH_2CH_2ONH_2$ | O |
| A-3091 | Et | H | Me | F | $CH_2CH_2CH_2CH_2CH_2ONH_2$ | O |
| A-3092 | Et | H | Me | F | $CH_2CH_2CH_2CH_2CH_2CH_2ONH_2$ | O |
| A-3093 | c-Pr | H | Cl | F | Me | O |
| A-3094 | c-Pr | H | Cl | F | Et | O |
| A-3095 | c-Pr | H | Cl | F | n-Pr | O |
| A-3096 | c-Pr | H | Cl | F | i-Pr | O |
| A-3097 | c-Pr | H | Cl | F | n-Bu | O |
| A-3098 | c-Pr | H | Cl | F | n-Pen | O |
| A-3099 | c-Pr | H | Cl | F | n-Hex | O |
| A-3100 | c-Pr | H | Cl | F | n-Heptyl | O |
| A-3101 | c-Pr | H | Cl | F | n-Octyl | O |
| A-3102 | c-Pr | H | Cl | F | n-Nonyl | O |
| A-3103 | c-Pr | H | Cl | F | n-Decyl | O |
| A-3104 | c-Pr | H | Cl | F | c-Pr | O |
| A-3105 | c-Pr | H | Cl | F | c-Pen | O |
| A-3106 | c-Pr | H | Cl | F | c-Hex | O |
| A-3107 | c-Pr | H | Cl | F | $CH_2C(Me)=CH_2$ | O |
| A-3108 | c-Pr | H | Cl | F | $CH_2CH_2CH=CH_2$ | O |
| A-3109 | c-Pr | H | Cl | F | $CH_2CH_2CH=C(CH_3)_2$ | O |
| A-3110 | c-Pr | H | Cl | F | $CH_2CH_2CH_2CH=CH_2$ | O |
| A-3111 | c-Pr | H | Cl | F | $CH_2CH_2CH_2CH=C(CH_3)_2$ | O |
| A-3112 | c-Pr | H | Cl | F | $CH_2CH_2CH_2CH_2CH=CH_2$ | O |
| A-3113 | c-Pr | H | Cl | F | $CH_2CH_2CH_2CH_2CH=C(CH_3)_2$ | O |
| A-3114 | c-Pr | H | Cl | F | $CH_2CH_2CH \equiv CH$ | O |
| A-3115 | c-Pr | H | Cl | F | $CH_2CH_2CH_2CH \equiv CH$ | O |
| A-3116 | c-Pr | H | Cl | F | $CH_2CH_2CH_2CH_2CH \equiv CH$ | O |
| A-3117 | c-Pr | H | Cl | F | $CH_2CH_2CH_2Cl$ | O |
| A-3118 | c-Pr | H | Cl | F | $CH_2CH_2CH_2Br$ | O |

TABLE 72

| Compound Number | $R^1$ | $R^2$ | $R^3$ | $R^4$ | $R^5$ | A |
|---|---|---|---|---|---|---|
| A-3119 | c-Pr | H | Cl | F | $CH_2CH_2CH_2CH_2Cl$ | O |
| A-3120 | c-Pr | H | Cl | F | $CH_2CH_2CH_2CH_2Br$ | O |
| A-3121 | c-Pr | H | Cl | F | $CH_2CH_2CH_2CH_2CH_2Cl$ | O |
| A-3122 | c-Pr | H | Cl | F | $CH_2CH_2CH_2CH_2CH_2Br$ | O |
| A-3123 | c-Pr | H | Cl | Cl | $CH_2CH_2CH_2CH_2CH_2Br$ | O |

TABLE 72-continued

| Compound Number | $R^1$ | $R^2$ | $R^3$ | $R^4$ | $R^5$ | A |
|---|---|---|---|---|---|---|
| A-3124 | c-Pr | H | Cl | F | $CH_2CH_2CH_2CH_2CH_2CH_2Cl$ | O |
| A-3125 | c-Pr | H | Cl | F | $CH_2CH_2CH_2CH_2CH_2CH_2Br$ | O |
| A-3126 | c-Pr | H | Cl | F | $CH_2CH_2CH_2CH_2CH_2CH_2CH_2Cl$ | O |
| A-3127 | c-Pr | H | Cl | F | $CH_2CH_2CH_2CH_2CH_2CH_2CH_2Br$ | O |
| A-3128 | c-Pr | H | Cl | F | $CH_2CH_2CH_2CH_2CH_2CH_2CH_2CH_2Br$ | O |
| A-3129 | c-Pr | H | Cl | F | $CH_2CH(Me)CH_2Cl$ | O |
| A-3130 | c-Pr | H | Cl | F | $CH_2CH(Me)CH_2Br$ | O |
| A-3131 | c-Pr | H | Cl | F | $CH_2CH_2CH(Me)CH_2CH_2Cl$ | O |
| A-3132 | c-Pr | H | Cl | F | $CH_2CH_2CH(Me)CH_2CH_2Br$ | O |
| A-3133 | c-Pr | H | Cl | F | $CH_2CH_2CF=CF_2$ | O |
| A-3134 | c-Pr | H | Cl | F | $CH_2CH=C(Cl)CF_3$ | O |
| A-3135 | c-Pr | H | Cl | F | $CH_2CH_2CH_2CF=CF_2$ | O |
| A-3136 | c-Pr | H | Cl | F | $CH_2CH_2CH_2CH_2CF=CF_2$ | O |
| A-3137 | c-Pr | H | Cl | F | $CH_2CH_2CH_2CH_2CH_2CF=CF_2$ | O |
| A-3138 | c-Pr | H | Cl | F | $CH_2$(t-Bu) | O |
| A-3139 | c-Pr | H | Cl | F | $CH_2CH_2$(t-Bu) | O |
| A-3140 | c-Pr | H | Cl | F | $CH_2CH_2CH_2$(t-Bu) | O |
| A-3141 | c-Pr | H | Cl | F | $CH_2CH_2CH_2CH_2$(t-Bu) | O |
| A-3142 | c-Pr | H | Cl | F | $CH_2CH_2CH_2CH_2CH_2$(t-Bu) | O |
| A-3143 | c-Pr | H | Cl | F | $CH_2CH_2CH_2CH_2CH_2CH_2$(t-Bu) | O |
| A-3144 | c-Pr | H | Cl | F | $CH_2CF_3$ | O |
| A-3145 | c-Pr | H | Cl | F | $CH_2CH_2CF_3$ | O |
| A-3146 | c-Pr | H | Cl | F | $CH_2CH_2CH_2CF_3$ | O |
| A-3147 | c-Pr | H | Cl | F | $CH_2CH_2CH_2CH_2CF_3$ | O |
| A-3148 | c-Pr | H | Cl | F | $CH_2CH_2CH_2CH_2CH_2CF_3$ | O |
| A-3149 | c-Pr | H | Cl | F | $CH_2CH_2CH_2CH_2CH_2CH_2CF_3$ | O |
| A-3150 | c-Pr | H | Cl | F | $CH_2CH_2CH_2CH_2CH_2CH_2CH_2CF_3$ | O |
| A-3151 | c-Pr | H | Cl | F | $CH_2CF_2CF_3$ | O |
| A-3152 | c-Pr | H | Cl | F | $CF_2CHFCF_3$ | O |
| A-3153 | c-Pr | H | Cl | F | $CF_2CF_2CF_3$ | O |
| A-3154 | c-Pr | H | Cl | F | $CH_2CF_2CF_2CF_3$ | O |
| A-3155 | c-Pr | H | Cl | F | $CH_2CF_2CF_2CF_2CF_3$ | O |
| A-3156 | c-Pr | H | Cl | F | $CH_2CF_2CF_2CF_2CHF_2$ | O |
| A-3157 | c-Pr | H | Cl | F | $CH(CF_3)CF_3$ | O |
| A-3158 | c-Pr | H | Cl | F | $CH_2CF(CF_3)CF_3$ | O |
| A-3159 | c-Pr | H | Cl | F | $CH_2CF_2CF(CF_3)CF_3$ | O |
| A-3160 | c-Pr | H | Cl | F | $CH_2CF(CF_3)CF_2CF_3$ | O |
| A-3161 | c-Pr | H | Cl | F | $CH_2CF_2CF_2CF(CF_3)CF_3$ | O |
| A-3162 | c-Pr | H | Cl | F | $CH_2CF_2CF(CF_3)CF_2CF_3$ | O |

TABLE 73

| Compound Number | $R^1$ | $R^2$ | $R^3$ | $R^4$ | $R^5$ | A |
|---|---|---|---|---|---|---|
| A-3163 | c-Pr | H | Cl | F | $CH_2CF(CF_3)CF_2CF_2CF_3$ | O |
| A-3164 | c-Pr | H | Cl | F | $CH_2$(c-Pr) | O |
| A-3165 | c-Pr | H | Cl | F | $CH_2$[C-Pr(1-Me)] | O |
| A-3166 | c-Pr | H | Cl | F | $CH_2$[C-Pr(1-Ph)] | O |
| A-3167 | c-Pr | H | Cl | F | $CH_2$[C-Pr(1-$NH_2$)] | O |
| A-3168 | c-Pr | H | Cl | F | $CH_2$[c-Pr(1-NHC(=O)O(t-Bu)] | O |
| A-3169 | c-Pr | H | Cl | F | $CH_2${c-Pr[1-NHS(=O)$_2CF_3$]} | O |
| A-3170 | c-Pr | H | Cl | F | $CH_2${C-Pr[1-Ph(4-$CF_3$)]} | O |
| A-3171 | c-Pr | H | Cl | F | $CH_2${c-Pr[1-Ph(3,4,5-$F_3$)]} | O |
| A-3172 | c-Pr | H | Cl | F | $CH_2${C-Hex[4-(t-Bu)]} | O |
| A-3173 | c-Pr | H | Cl | F | $CH_2$[C-Hex(4-$CF_3$)] | O |

TABLE 73-continued

| Compound Number | $R^1$ | $R^2$ | $R^3$ | $R^4$ | $R^5$ | A |
|---|---|---|---|---|---|---|
| A-3174 | c-Pr | H | Cl | F | $CH_2CH_2$(c-Pr) | O |
| A-3175 | c-Pr | H | Cl | F | $CH_2CH_2$(c-Hex) | O |
| A-3176 | c-Pr | H | Cl | F | $CH_2CH_2$[C-Hex(4-$CF_3$)] | O |
| A-3177 | c-Pr | H | Cl | F | $CH_2CH_2$[c-Hex(4-$SCF_3$)] | O |
| A-3178 | c-Pr | H | Cl | F | $CH_2CH_2CH_2$(c-Pr) | O |
| A-3179 | c-Pr | H | Cl | F | $CH_2CH_2CH_2$(c-Hex) | O |
| A-3180 | c-Pr | H | Cl | F | $CH_2CH_2CH_2${c-Hex[4-(t-Bu)]} | O |
| A-3181 | c-Pr | H | Cl | F | $CH_2CH_2CH_2$[C-Hex(4-$CF_3$)] | O |
| A-3182 | c-Pr | H | Cl | F | $CH_2CH_2CH_2$[C-Hex(4-$SCF_3$)] | O |
| A-3183 | c-Pr | H | Cl | F | $CH_2CH_2CH_2CH_2$(c-Pr) | O |
| A-3184 | c-Pr | H | Cl | F | $CH_2CH_2CH_2CH_2$(c-Hex) | O |
| A-3185 | c-Pr | H | Cl | F | $CH_2CH_2CH_2CH_2$[c-Hex(4-$CF_3$)] | O |
| A-3186 | c-Pr | H | Cl | F | $CH_2$[C-Pr(2,2-$F_2$)] | O |
| A-3187 | c-Pr | H | Cl | F | $CH_2$[c-Hex(4,4-$F_2$)] | O |
| A-3188 | c-Pr | H | Cl | F | $CH_2CH_2$[C-Pr(2,2-$F_2$)] | O |
| A-3189 | c-Pr | H | Cl | F | $CH_2CH_2$[C-Hex(4,4-$F_2$)] | O |
| A-3190 | c-Pr | H | Cl | F | $CH_2CH_2CH_2$[C-Pr(2,2-$F_2$)] | O |
| A-3191 | c-Pr | H | Cl | F | $CH_2CH_2CH_2CH_2$[C-Pr(2,2-$F_2$)] | O |
| A-3192 | c-Pr | H | Cl | F | $CH_2CH_2OH$ | O |
| A-3193 | c-Pr | H | Cl | F | $CH_2CH_2CH_2OH$ | O |
| A-3194 | c-Pr | H | Cl | F | $CH_2CH_2CH_2CH_2OH$ | O |
| A-3195 | c-Pr | H | Cl | F | $CH_2CH_2CH_2CH_2CH_2OH$ | O |
| A-3196 | c-Pr | H | Cl | F | $CH_2CH_2CH_2CH_2CH_2CH_2OH$ | O |
| A-3197 | c-Pr | H | Cl | F | $CH_2C$(=O)Me | O |
| A-3198 | c-Pr | H | Cl | F | $CH_2CH$(OH)Me | O |
| A-3199 | c-Pr | H | Cl | F | $CH_2CH(OH)CF_3$ | O |
| A-3200 | c-Pr | H | Cl | F | $CH_2C(OH)_2CF_3$ | O |
| A-3201 | c-Pr | H | Cl | F | $CH_2C(CF_3)$=NOH | O |
| A-3202 | c-Pr | H | Cl | F | $CH_2C(CF_3)$=NOMe | O |
| A-3203 | c-Pr | H | Cl | F | $CH_2CH(CF_3)NH_2$ | O |
| A-3204 | c-Pr | H | Cl | F | $CH_2CH_2$OMe | O |
| A-3205 | c-Pr | H | Cl | F | $CH_2CH_2CH_2$OMe | O |
| A-3206 | c-Pr | H | Cl | F | $CH_2CH_2CH_2CH_2$OMe | O |

TABLE 74

| Compound Number | $R^1$ | $R^2$ | $R^3$ | $R^4$ | $R^5$ | A |
|---|---|---|---|---|---|---|
| A-3207 | c-Pr | H | Cl | F | $CH_2CH_2CH_2CH_2CH_2$OMe | O |
| A-3208 | c-Pr | H | Cl | F | $CH_2CH_2CH_2CH_2CH_2CH_2$OMe | O |

TABLE 74-continued

| Compound Number | $R^1$ | $R^2$ | $R^3$ | $R^4$ | $R^5$ | A |
|---|---|---|---|---|---|---|
| A-3209 | c-Pr | H | Cl | F | $CH_2CH_2OCHF_2$ | O |
| A-3210 | c-Pr | H | Cl | F | $CH_2CH_2CH_2OCHF_2$ | O |
| A-3211 | c-Pr | H | Cl | F | $CH_2CH_2CH_2CH_2OCHF_2$ | O |
| A-3212 | c-Pr | H | Cl | F | $CH_2CH_2CH_2CH_2CH_2OCHF_2$ | O |
| A-3213 | c-Pr | H | Cl | F | $CH_2CH_2CH_2CH_2CH_2CH_2OCHF_2$ | O |
| A-3214 | c-Pr | H | Cl | F | $CH_2CH_2OCH_2CF_3$ | O |
| A-3215 | c-Pr | H | Cl | F | $CH_2CH_2CH_2OCH_2CF_3$ | O |
| A-3216 | c-Pr | H | Cl | F | $CH_2CH_2CH_2CH_2OCH_2CF_3$ | O |
| A-3217 | c-Pr | H | Cl | F | $CH_2CH_2CH_2CH_2CH_2OCH_2CF_3$ | O |
| A-3218 | c-Pr | H | Cl | F | $CH_2CH_2CH_2CH_2CH_2CH_2OCH_2CF_3$ | O |
| A-3219 | c-Pr | H | Cl | F | $CH_2CH_2CH_2CH_2CH_2CH_2CH_2OCH_2CF_3$ | O |
| A-3220 | c-Pr | H | Cl | F | $CH_2CH_2OC(CF_3)3$ | O |
| A-3221 | c-Pr | H | Cl | F | $CH_2CH_2CH_2OC(CF_3)3$ | O |
| A-3222 | c-Pr | H | Cl | F | $CH_2CH_2CH_2CH_2OC(CF_3)3$ | O |
| A-3223 | C-Pr | H | Cl | F | $CH_2CH_2CH_2CH_2CH_2OC(CF_3)3$ | O |
| A-3224 | c-Pr | H | Cl | F | $CF_2CHFOCF_2CF_2CF_3$ | O |
| A-3225 | c-Pr | H | Cl | F | $CH_2CH_2O$(c-Pr) | O |
| A-3226 | c-Pr | H | Cl | F | $CH_2CH_2O$(c-Pen) | O |
| A-3227 | c-Pr | H | Cl | F | $CH_2CH_2O$(c-Hex) | O |
| A-3228 | c-Pr | H | Cl | F | $CH_2CH_2CH_2O$(c-Pr) | O |
| A-3229 | c-Pr | H | Cl | F | $CH_2CH_2CH_2O$(c-Pen) | O |
| A-3230 | c-Pr | H | Cl | F | $CH_2CH_2CH_2O$(c-Hex) | O |
| A-3231 | c-Pr | H | Cl | F | $CH_2CH_2CH_2CH_2O$(c-Pr) | O |
| A-3232 | c-Pr | H | Cl | F | $CH_2CH_2CH_2CH_2O$(c-Pen) | O |
| A-3233 | c-Pr | H | Cl | F | $CH_2CH_2CH_2CH_2O$(c-Hex) | O |
| A-3234 | c-Pr | H | Cl | F | $CH_2CH_2O$[c-Pr(2,2-$F_2$)] | O |
| A-3235 | c-Pr | H | Cl | F | $CH_2CH_2CH_2O$[c-Pr(2,2-$F_2$)] | O |
| A-3236 | c-Pr | H | Cl | F | $CH_2CH_2CH_2CH_2O$[c-Pr(2,2-$F_2$)] | O |
| A-3237 | c-Pr | H | Cl | F | $CH_2CH_2OCH_2CH_2OCH_3$ | O |
| A-3238 | c-Pr | H | Cl | F | $CH_2CH_2OCH_2CH_2OCH_2CF_3$ | O |
| A-3239 | c-Pr | H | Cl | F | $CH_2CF_2OCF_2CF_2OCF_3$ | O |
| A-3240 | c-Pr | H | Cl | F | $CF_2CHFOCF_2CF_20CF_3$ | O |
| A-3241 | c-Pr | H | Cl | F | $CF_2CHFOCF_2CF(CF_3)OCF_2CF_2CF_3$ | O |
| A-3242 | c-Pr | H | Cl | F | $CH_2CH_2SH$ | O |
| A-3243 | c-Pr | H | Cl | F | $CH_2CH_2CH_2SH$ | O |
| A-3244 | c-Pr | H | Cl | F | $CH_2CH_2CH_2CH_2SH$ | O |
| A-3245 | c-Pr | H | Cl | F | $CH_2CH_2CH_2CH_2CH_2SH$ | O |
| A-3246 | c-Pr | H | Cl | F | $CH_2CH_2CH_2CH_2CH_2CH_2SH$ | O |
| A-3247 | c-Pr | H | Cl | F | $CH_2CH$(SH)Me | O |
| A-3248 | c-Pr | H | Cl | F | $CH_2CH$[SC(=O)Me]Me | O |
| A-3249 | c-Pr | H | Cl | F | $CH_2CH_2S$(t-Bu) | O |
| A-3250 | c-Pr | H | Cl | F | $CH_2CH_2CH_2S$(t-Bu) | O |

TABLE 75

| Compound Number | $R^1$ | $R^2$ | $R^3$ | $R^4$ | $R^5$ | A |
|---|---|---|---|---|---|---|
| A-3251 | c-Pr | H | Cl | F | $CH_2CH_2CH_2CH_2S$(t-Bu) | O |
| A-3252 | c-Pr | H | Cl | F | $CH_2CH_2CH_2CH_2CH_2SCH_3$ | O |
| A-3253 | c-Pr | H | Cl | F | $CH_2CH_2CH_2CH_2CH_2SCH(CH_3)_2$ | O |
| A-3254 | c-Pr | H | Cl | F | $CH_2CH_2CH_2CH_2CH_2S$(t-Bu) | O |
| A-3255 | c-Pr | H | Cl | F | $CH_2CH_2CH_2CH_2CH_2CH_2SCH(CH_3)_2$ | O |
| A-3256 | c-Pr | H | Cl | F | $CH_2CH_2CH_2CH_2CH_2CH_2S$(t-Bu) | O |
| A-3257 | c-Pr | H | Cl | F | $CH_2CH_2CH_2CH_2CH_2CH_2CH_2S$(t-Bu) | O |
| A-3258 | c-Pr | H | Cl | F | $CH_2CH_2SCHF_2$ | O |
| A-3259 | c-Pr | H | Cl | F | $CH_2CH_2CH_2SCHF_2$ | O |
| A-3260 | c-Pr | H | Cl | F | $CH_2CH_2CH_2CH_2SCHF_2$ | O |
| A-3261 | c-Pr | H | Cl | H | $CH_2CH_2CH_2CH_2CH_2SCHF_2$ | O |
| A-3262 | c-Pr | H | Cl | F | $CH_2CH_2CH_2CH_2CH_2SCHF_2$ | O |
| A-3263 | c-Pr | H | Cl | F | $CH_2CH_2CH_2CH_2CH_2CH_2SCHF_2$ | O |
| A-3264 | c-Pr | H | Cl | F | $CH_2CH_2CH_2CH_2CH_2CH_2CH_2SCHF_2$ | O |
| A-3265 | c-Pr | H | Cl | F | $CH_2CH_2SCH_2CF_3$ | O |
| A-3266 | c-Pr | H | Cl | F | $CH_2CH_2CH_2SCH_2CF_3$ | O |
| A-3267 | c-Pr | H | Cl | F | $CH_2CH_2CH_2CH_2SCH_2CF_3$ | O |
| A-3268 | c-Pr | H | Cl | F | $CH_2CH_2CH_2CH_2CH_2SCH_2CF_3$ | O |
| A-3269 | c-Pr | H | Cl | F | $CH_2CH_2CH_2CH_2CH_2CH_2SCH_2CF_3$ | O |
| A-3270 | c-Pr | H | Cl | F | $CH_2CH_2CH_2CH_2CH_2CH_2CH_2SCH_2CF_3$ | O |
| A-3271 | c-Pr | H | Cl | F | $CH_2CH$(Me)$SCH_2CF_3$ | O |
| A-3272 | c-Pr | H | Cl | F | $CH_2CH_2SCH(CF_3)_2$ | O |
| A-3273 | c-Pr | H | Cl | F | $CH_2CH_2CH_2SCH(CF_3)_2$ | O |
| A-3274 | c-Pr | H | Cl | F | $CH_2CH_2CH_2CH_2SCH(CF_3)_2$ | O |
| A-3275 | c-Pr | H | Cl | F | $CH_2CH_2CH_2CH_2CH_2SCH(CF_3)_2$ | O |

TABLE 75-continued

| Compound Number | $R^1$ | $R^2$ | $R^3$ | $R^4$ | $R^5$ | A |
|---|---|---|---|---|---|---|
| A-3276 | c-Pr | H | Cl | F | $CH_2CH_2CH_2CH_2CH_2CH_2SCH(CF_3)_2$ | O |
| A-3277 | c-Pr | H | Cl | F | $CH_2CH_2CH_2CH_2CH_2SCF_2CF_3$ | O |
| A-3278 | c-Pr | H | Cl | F | $CH_2CH_2CH_2CH_2CH_2CH_2SCF_2CF_3$ | O |
| A-3279 | c-Pr | H | Cl | F | $CH_2CH_2CH_2CH_2CH_2CH_2SCF(CF_3)_2$ | O |
| A-3280 | c-Pr | H | Cl | F | $CH_2CH_2CH_2CH_2CH_2CH_2CH_2SCF(CF_3)_2$ | O |
| A-3281 | c-Pr | H | Cl | F | $CH_2CH_2CH_2CH_2CH_2SCCl_3$ | O |
| A-3282 | c-Pr | H | Cl | F | $CH_2CH_2CH_2CH_2CH_2CH_2SCCl_3$ | O |
| A-3283 | c-Pr | H | Cl | F | $CH_2CH_2SCH_2CH{=}CH_2$ | O |
| A-3284 | c-Pr | H | Cl | F | $CH_2CH_2CH_2SCH_2CH{=}CH_2$ | O |
| A-3285 | c-Pr | H | Cl | F | $CH_2CH_2CH_2CH_2SCH_2CH{=}CH_2$ | O |
| A-3286 | c-Pr | H | Cl | F | $CH_2CH_2SCF{=}CFCF_3$ | O |
| A-3287 | c-Pr | H | Cl | F | $CH_2CH_2CH_2SCF{=}CFCF_3$ | O |
| A-3288 | c-Pr | H | Cl | F | $CH_2CH_2CH_2CH_2SCF{=}CFCF_3$ | O |
| A-3289 | c-Pr | H | Cl | F | $CH_2CH_2CH_2S$(c-Pr) | O |
| A-3290 | c-Pr | H | Cl | F | $CH_2CH_2CH_2S$(c-Hex) | O |
| A-3291 | c-Pr | H | Cl | F | $CH_2CH_2CH_2CH_2S$(c-Pr) | O |
| A-3292 | c-Pr | H | Cl | F | $CH_2CH_2CH_2CH_2S$(c-Hex) | O |
| A-3293 | c-Pr | H | Cl | F | $CH_2CH_2CH_2CH_2CH_2S$(c-Pr) | O |
| A-3294 | c-Pr | H | Cl | F | $CH_2CH_2CH_2CH_2CH_2S$(c-Hex) | O |

TABLE 76

| Compound Number | $R^1$ | $R^2$ | $R^3$ | $R^4$ | $R^5$ | A |
|---|---|---|---|---|---|---|
| A-3295 | c-Pr | H | Cl | F | $CH_2CH_2CH_2S$[c-Hex(4,4-$F_2$)] | O |
| A-3296 | c-Pr | H | Cl | F | $CH_2CH_2CH_2CH_2S$[c-Hex(4,4-$F_2$)] | O |
| A-3297 | c-Pr | H | Cl | F | $CH_2CH_2CH_2CH_2CH_2S$[c-Hex(4,4-$F_2$)] | O |
| A-3298 | c-Pr | H | Cl | F | $CH_2CH_2CH_2SCH_2$(c-Pr) | O |
| A-3299 | c-Pr | H | Cl | F | $CH_2CH_2CH_2SCH_2$(c-Hex) | O |
| A-3300 | c-Pr | H | Cl | F | $CH_2CH_2CH_2CH_2SCH_2$(c-Pr) | O |
| A-3301 | c-Pr | H | Cl | F | $CH_2CH_2CH_2CH_2SCH_2$(c-Hex) | O |
| A-3302 | c-Pr | H | Cl | F | $CH_2CH_2CH_2CH_2CH_2SCH_2$(C-Pr) | O |
| A-3303 | c-Pr | H | Cl | F | $CH_2CH_2CH_2CH_2CH_2SCH_2$(C-Hex) | O |
| A-3304 | c-Pr | H | Cl | F | $CH_2CH_2CH_2SCH_2$[c-Hex(4,4-$F_2$)] | O |
| A-3305 | c-Pr | H | Cl | F | $CH_2CH_2CH_2CH_2SCH_2$[c-Hex(4,4-$F_2$)] | O |
| A-3306 | c-Pr | H | Cl | F | $CH_2CH_2CH_2CH_2CH_2SCH_2$[C-Hex(4,4-$F_2$)] | O |
| A-3307 | c-Pr | H | Cl | F | $CH_2CH_2CH_2SCH_2SiMe_3$ | O |
| A-3308 | c-Pr | H | Cl | F | $CH_2CH_2CH_2CH_2SCH_2SiMe_3$ | O |
| A-3309 | c-Pr | H | Cl | F | $CH_2CH_2CH_2CH_2CH_2SCH_2SiMe_3$ | O |
| A-3310 | c-Pr | H | Cl | F | $CH_2CH_2OCH_2CH_2SCH_3$ | O |
| A-3311 | c-Pr | H | Cl | F | $CH_2CH_2OCH_2CH_2SCHF_2$ | O |
| A-3312 | c-Pr | H | Cl | F | $CH_2CH_2OCH_2CH_2SCF_3$ | O |
| A-3313 | c-Pr | H | Cl | F | $CH_2CH_2OCH_2CH_2SCH_2CF_3$ | O |
| A-3314 | c-Pr | H | Cl | F | $CH_2CH_2CH_2S({=}O)$(t-Bu) | O |
| A-3315 | c-Pr | H | Cl | F | $CH_2CH_2CH_2CH_2S({=}O)$(t-Bu) | O |
| A-3316 | c-Pr | H | Cl | F | $CH_2CH_2CH_2CH_2CH_2CH_2CH_2S({=}O)$(t-Bu) | O |
| A-3317 | c-Pr | H | Cl | F | $CH_2CH_2S({=}O)CHF_2$ | O |
| A-3318 | c-Pr | H | Cl | F | $CH_2CH_2CH_2S({=}O)CHF_2$ | O |
| A-3319 | c-Pr | H | Cl | F | $CH_2CH_2CH_2CH_2S({=}O)CHF_2$ | O |
| A-3320 | c-Pr | H | Cl | F | $CH_2CH_2CH_2CH_2CH_2S({=}O)CHF_2$ | O |
| A-3321 | c-Pr | H | Cl | F | $CH_2CH_2CH_2CH_2CH_2CH_2S({=}O)CHF_2$ | O |
| A-3322 | c-Pr | H | Cl | F | $CH_2CH_2CH_2CH_2CH_2CH_2CH_2S({=}O)CHF_2$ | O |
| A-3323 | c-Pr | H | Cl | F | $CH_2CH_2S({=}O)CF_3$ | O |
| A-3324 | c-Pr | H | Cl | F | $CH_2CH_2CH_2S({=}O)CF_3$ | O |
| A-3325 | c-Pr | H | Cl | F | $CH_2CH_2CH_2CH_2S({=}O)CF_3$ | O |
| A-3326 | c-Pr | H | Cl | F | $CH_2CH_2CH_2CH_2CH_2S({=}O)CF_3$ | O |
| A-3327 | c-Pr | H | Cl | F | $CH_2CH_2CH_2CH_2CH_2CH_2S({=}O)CF_3$ | O |
| A-3328 | c-Pr | H | Cl | F | $CH_2CH_2CH_2CH_2CH_2CH_2CH_2S({=}O)CF_3$ | O |
| A-3329 | c-Pr | H | Cl | F | $CH_2CH_2S({=}O)CH_2CF_3$ | O |
| A-3330 | c-Pr | H | Cl | F | $CH_2CH_2CH_2S({=}O)CH_2CF_3$ | O |
| A-3331 | c-Pr | H | Cl | F | $CH_2CH_2CH_2CH_2S({=}O)CH_2CF_3$ | O |
| A-3332 | c-Pr | H | Cl | F | $CH_2CH_2CH_2CH_2CH_2S({=}O)CH_2CF_3$ | O |
| A-3333 | c-Pr | H | Cl | F | $CH_2CH_2CH_2CH_2CH_2CH_2S({=}O)CH_2CF_3$ | O |
| A-3334 | c-Pr | H | Cl | F | $CH_2CH_2CH_2CH_2CH_2CH_2CH_2S({=}O)CH_2CF_3$ | O |
| A-3335 | c-Pr | H | Cl | F | $CH_2CH(Me)S({=}O)CH_2CF_3$ | O |
| A-3336 | c-Pr | H | Cl | F | $CH_2CH_2CH_2S({=}O)$(c-Pr) | O |
| A-3337 | c-Pr | H | Cl | F | $CH_2CH_2CH_2CH_2S({=}O)$(c-Pr) | O |
| A-3338 | c-Pr | H | Cl | F | $CH_2CH_2CH_2CH_2S({=}O)$(c-Pen) | O |

TABLE 77

| Compound Number | $R^1$ | $R^2$ | $R^3$ | $R^4$ | $R^5$ | A |
|---|---|---|---|---|---|---|
| A-3339 | c-Pr | H | Cl | F | $CH_2CH_2CH_2CH_2S(=O)(c\text{-}Hex)$ | O |
| A-3340 | c-Pr | H | Cl | F | $CH_2CH_2CH_2CH_2CH_2S(=O)(c\text{-}Pr)$ | O |
| A-3341 | c-Pr | H | Cl | F | $CH_2CH_2CH_2CH_2CH_2S(=O)(c\text{-}Hex)$ | O |
| A-3342 | c-Pr | H | Cl | F | $CH_2CH_2CH_2S(=O)[c\text{-}Hex(4,4\text{-}F_2)]$ | O |
| A-3343 | c-Pr | H | Cl | F | $CH_2CH_2CH_2CH_2S(=O)[c\text{-}Hex(4,4\text{-}F_2)]$ | O |
| A-3344 | c-Pr | H | Cl | F | $CH_2CH_2CH_2CH_2CH_2S(=O)[c\text{-}Hex(4,4\text{-}F_2)]$ | O |
| A-3345 | c-Pr | H | Cl | F | $CH_2CH_2CH_2CH_2S(=O)_2Me$ | O |
| A-3346 | c-Pr | H | Cl | F | $CH_2CH_2CH_2CH_2CH_2S(=O)_2Me$ | O |
| A-3347 | c-Pr | H | Cl | F | $CH_2CH_2CH_2CH_2CH_2S(=O)_2(t\text{-}Bu)$ | O |
| A-3348 | c-Pr | H | Cl | F | $CH_2CH_2S(=O)_2CHF_2$ | O |
| A-3349 | c-Pr | H | Cl | F | $CH_2CH_2CH_2S(=O)_2CHF_2$ | O |
| A-3350 | c-Pr | H | Cl | F | $CH_2CH_2CH_2CH_2S(=O)_2CHF_2$ | O |
| A-3351 | c-Pr | H | Cl | F | $CH_2CH_2CH_2CH_2CH_2S(=O)_2CHF_2$ | O |
| A-3352 | c-Pr | H | Cl | F | $CH_2CH_2CH_2CH_2CH_2CH_2S(=O)_2CHF_2$ | O |
| A-3353 | c-Pr | H | Cl | F | $CH_2CH_2S(=O)_2CF_3$ | O |
| A-3354 | c-Pr | H | Cl | F | $CH_2CH_2CH_2S(=O)_2CF_3$ | O |
| A-3355 | c-Pr | H | Cl | F | $CH_2CH_2CH_2CH_2S(=O)_2CF_3$ | O |
| A-3356 | c-Pr | H | Cl | F | $CH_2CH_2CH_2CH_2CH_2S(=O)_2CF_3$ | O |
| A-3357 | c-Pr | H | Cl | F | $CH_2CH_2CH_2CH_2CH_2CH_2S(=O)_2CF_3$ | O |
| A-3358 | c-Pr | H | Cl | F | $CH_2CH_2CH_2CH_2CH_2CH_2CH_2S(=O)_2CF_3$ | O |
| A-3359 | c-Pr | H | Cl | F | $CH_2CH_2CH_2CH_2CH_2CH_2CH_2CH_2S(=O)_2CF_3$ | O |
| A-3360 | c-Pr | H | Cl | F | $CH_2CH_2S(=O)_2CH_2CF_3$ | O |
| A-3361 | c-Pr | H | Cl | F | $CH_2CH_2CH_2S(=O)_2CH_2CF_3$ | O |
| A-3362 | c-Pr | H | Cl | F | $CH_2CH_2CH_2CH_2S(=O)_2CH_2CF_3$ | O |
| A-3363 | c-Pr | H | Cl | F | $CH_2CH_2CH_2CH_2CH_2S(=O)_2CH_2CF_3$ | O |
| A-3364 | c-Pr | H | Cl | F | $CH_2CH_2CH_2CH_2CH_2CH_2S(=O)_2CH_2CF_3$ | O |
| A-3365 | c-Pr | H | Cl | F | $CH_2CH(Me)S(=O)_2CH_2CF_3$ | O |
| A-3366 | c-Pr | H | Cl | F | $CH_2CH_2CH_2S(=O)_2(c\text{-}Pr)$ | O |
| A-3367 | c-Pr | H | Cl | F | $CH_2CH_2CH_2CH_2S(=O)_2(c\text{-}Pr)$ | O |
| A-3368 | c-Pr | H | Cl | F | $CH_2CH_2CH_2CH_2CH_2S(=O)_2(c\text{-}Pr)$ | O |
| A-3369 | c-Pr | H | Cl | F | $CH_2CH_2CH_2S(=O)_2[c\text{-}Hex(4,4\text{-}F_2)]$ | O |
| A-3370 | c-Pr | H | Cl | F | $CH_2CH_2CH_2CH_2S(=O)_2[c\text{-}Hex(4,4\text{-}F_2)]$ | O |
| A-3371 | c-Pr | H | Cl | F | $CH_2CH_2CH_2CH_2CH_2S(=O)_2[c\text{-}Hex(4,4\text{-}F_2)]$ | O |
| A-3372 | c-Pr | H | Cl | F | $CH_2CH_2CH_2C(=O)H$ | O |
| A-3373 | c-Pr | H | Cl | F | $CH_2CH_2CH_2CH_2C(=O)H$ | O |
| A-3374 | c-Pr | H | Cl | F | $CH_2CH_2CH_2CH_2CH_2C(=O)H$ | O |
| A-3375 | c-Pr | H | Cl | F | $CH_2CH_2CH_2C(=O)(t\text{-}Bu)$ | O |
| A-3376 | c-Pr | H | Cl | F | $CH_2CH_2CH_2CH_2C(=O)(t\text{-}Bu)$ | O |
| A-3377 | c-Pr | H | Cl | F | $CH_2CH_2CH_2CH_2CH_2C(=O)(t\text{-}Bu)$ | O |
| A-3378 | c-Pr | H | Cl | F | $CH_2CH_2CH_2C(=O)CF_3$ | O |
| A-3379 | c-Pr | H | Cl | F | $CH_2CH_2CH_2CH_2C(=O)CF_3$ | O |
| A-3380 | c-Pr | H | Cl | F | $CH_2CH_2CH_2CH_2CH_2C(=O)CF_3$ | O |
| A-3381 | c-Pr | H | Cl | F | $CH_2C(=O)Ph$ | O |
| A-3382 | c-Pr | H | Cl | F | $CH_2C(=O)Ph(4\text{-}Cl)$ | O |

TABLE 78

| Compound Number | $R^1$ | $R^2$ | $R^3$ | $R^4$ | $R^5$ | A |
|---|---|---|---|---|---|---|
| A-3383 | c-Pr | H | Cl | F | $CH_2C(=O)Ph(4\text{-}CF_3)$ | O |
| A-3384 | c-Pr | H | Cl | F | $CH_2CH_2C(=O)Ph(4\text{-}CF_3)$ | O |
| A-3385 | c-Pr | H | Cl | F | $CH_2CH_2CH_2C(=O)Ph(4\text{-}CF_3)$ | O |
| A-3386 | c-Pr | H | Cl | F | $CH_2CH_2CH_2CH_2C(=O)Ph(4\text{-}CF_3)$ | O |
| A-3387 | c-Pr | H | Cl | F | $CH_2CH_2CH_2CH_2CH_2C(=O)Ph(4\text{-}CF_3)$ | O |
| A-3388 | c-Pr | H | Cl | F | $CH_2C(=O)OEt$ | O |
| A-3389 | c-Pr | H | Cl | F | $CH_2CH_2C(=O)O(t\text{-}Bu)$ | O |
| A-3390 | c-Pr | H | Cl | F | $CH_2CH_2CH_2C(=O)OEt$ | O |
| A-3391 | c-Pr | H | Cl | F | $CH_2CH_2CH_2C(=O)O(t\text{-}Bu)$ | O |
| A-3392 | c-Pr | H | Cl | F | $CH_2CH_2CH_2CH_2C(=O)O(t\text{-}Bu)$ | O |
| A-3393 | c-Pr | H | Cl | F | $CH_2CH_2CH_2CH_2CH_2C(=O)O(t\text{-}Bu)$ | O |
| A-3394 | c-Pr | H | Cl | F | $CH_2CH_2CH_2CH_2CH_2CH_2C(=O)O(t\text{-}Bu)$ | O |
| A-3395 | c-Pr | H | Cl | F | $CH_2CH_2CH_2CH_2CH_2CH_2CH_2C(=O)OEt$ | O |
| A-3396 | c-Pr | H | Cl | F | $CH_2CH_2C(=O)OCH_2CF_3$ | O |
| A-3397 | c-Pr | H | Cl | F | $CH_2CH_2CH_2C(=O)OCH_2CF_3$ | O |
| A-3398 | c-Pr | H | Cl | F | $CH_2CH_2CH_2CH_2C(=O)OCH_2CF_3$ | O |
| A-3399 | c-Pr | H | Cl | F | $CH_2CH_2CH_2CH_2CH_2C(=O)OCH_2CF_3$ | O |
| A-3400 | c-Pr | H | Cl | F | $CH_2CH_2C(=O)NH(t\text{-}Bu)$ | O |
| A-3401 | c-Pr | H | Cl | F | $CH_2CH_2CH_2C(=O)NH(t\text{-}Bu)$ | O |
| A-3402 | c-Pr | H | Cl | F | $CH_2CH_2CH_2C(=O)NH(t\text{-}Pen)$ | O |
| A-3403 | c-Pr | H | Cl | F | $CH_2CH_2CH_2CH_2C(=O)NH(t\text{-}Bu)$ | O |
| A-3404 | c-Pr | H | Cl | F | $CH_2CH_2C(=O)NHCH_2CF_3$ | O |
| A-3405 | c-Pr | H | Cl | F | $CH_2CH_2CH_2C(=O)NHCH_2CF_3$ | O |

TABLE 78-continued

| Compound Number | $R^1$ | $R^2$ | $R^3$ | $R^4$ | $R^5$ | A |
|---|---|---|---|---|---|---|
| A-3406 | c-Pr | H | Cl | F | $CH_2CH_2CH_2CH_2C(=O)NHCH_2CF_3$ | O |
| A-3407 | c-Pr | H | Cl | F | $CH_2CH_2SC(=O)N(Me)_2$ | O |
| A-3408 | c-Pr | H | Cl | F | $CH_2CH_2CH_2SC(=O)N(Me)_2$ | O |
| A-3409 | c-Pr | H | Cl | F | $CH_2CH_2CH_2SC(=O)NH(t-Bu)$ | O |
| A-3410 | c-Pr | H | Cl | F | $CH_2CH_2CH_2CH_2CH_2SC(=O)NH(t-Bu)$ | O |
| A-3411 | c-Pr | H | Cl | F | $CH_2CH_2SC(=O)NHCH_2CF_3$ | O |
| A-3412 | c-Pr | H | Cl | F | $CH_2CH_2CH_2SC(=O)NHCH_2CF_3$ | O |
| A-3413 | c-Pr | H | Cl | F | $CH_2CH_2CH_2CH_2SC(=O)NHCH_2CF_3$ | O |
| A-3414 | c-Pr | H | Cl | F | $CH_2CH_2CH_2OC(=O)H$ | O |
| A-3415 | c-Pr | H | Cl | F | $CH_2CH_2CH_2CH_2OC(=O)H$ | O |
| A-3416 | c-Pr | H | Cl | F | $CH_2CH_2CH_2CH_2CH_2OC(=O)H$ | O |
| A-3417 | c-Pr | H | Cl | F | $CH_2CH_2CH_2OC(=O)Me$ | O |
| A-3418 | c-Pr | H | Cl | F | $CH_2CH_2CH_2CH_2OC(=O)Me$ | O |
| A-3419 | c-Pr | H | Cl | F | $CH_2CH_2CH_2CH_2CH_2OC(=O)Me$ | O |
| A-3420 | c-Pr | H | Cl | F | $CH_2CH_2OC(=O)CF_3$ | O |
| A-3421 | c-Pr | H | Cl | F | $CH_2CH_2CH_2OC(=O)CF_3$ | O |
| A-3422 | c-Pr | H | Cl | F | $CH_2CH_2CH_2CH_2OC(=O)CF_3$ | O |
| A-3423 | c-Pr | H | Cl | F | $CH_2CH_2CH_2CH_2CH_2OC(=O)Ph(4-CF_3)$ | O |
| A-3424 | c-Pr | H | Cl | F | $CH_2CH_2OC(=O)Ph$ | O |
| A-3425 | c-Pr | H | Cl | F | $CH_2CH_2OC(=O)Ph(4-CF_3)$ | O |
| A-3426 | c-Pr | H | Cl | F | $CH_2CH_2CH_2OC(=O)Ph(4-CF_3)$ | O |

TABLE 79

| Compound Number | $R^1$ | $R^2$ | $R^3$ | $R^4$ | $R^5$ | A |
|---|---|---|---|---|---|---|
| A-3427 | c-Pr | H | Cl | F | $CH_2CH_2CH_2CH_2OC(=O)Ph(4-CF_3)$ | O |
| A-3428 | c-Pr | H | Cl | F | $CH_2CH_2CH_2CH_2CH_2OC(=O)Ph(4-CF_3)$ | O |
| A-3429 | c-Pr | H | Cl | F | $CH_2CH_2OS(=O)Me$ | O |
| A-3430 | c-Pr | H | Cl | F | $CH_2CH_2CH_2OS(=O)Me$ | O |
| A-3431 | c-Pr | H | Cl | F | $CH_2CH_2CH_2CH_2OS(=O)Me$ | O |
| A-3432 | c-Pr | H | Cl | F | $CH_2CH_2CH_2CH_2CH_2OS(=O)Me$ | O |
| A-3433 | c-Pr | H | Cl | F | $CH_2CH_2CH_2CH_2CH_2CH_2OS(=O)Me$ | O |
| A-3434 | c-Pr | H | Cl | F | $CH_2CH_2OS(=O)CF_3$ | O |
| A-3435 | c-Pr | H | Cl | F | $CH_2CH_2CH_2OS(=O)CF_3$ | O |
| A-3436 | c-Pr | H | Cl | F | $CH_2CH_2CH_2CH_2OS(=O)CF_3$ | O |
| A-3437 | c-Pr | H | Cl | F | $CH_2CH_2CH_2CH_2CH_2OS(=O)CF_3$ | O |
| A-3438 | c-Pr | H | Cl | F | $CH_2CH_2CH_2CH_2CH_2CH_2OS(=O)CF_3$ | O |
| A-3439 | c-Pr | H | Cl | F | $CH_2CH_2OS(=O)Ph$ | O |
| A-3440 | c-Pr | H | Cl | F | $CH_2CH_2OS(=O)Ph(4-Me)$ | O |
| A-3441 | c-Pr | H | Cl | F | $CH_2CH_2CH_2OS(=O)Ph$ | O |
| A-3442 | c-Pr | H | Cl | F | $CH_2CH_2CH_2OS(=O)Ph(4-Me)$ | O |
| A-3443 | c-Pr | H | Cl | F | $CH_2CH_2OS(=O)_2Me$ | O |
| A-3444 | c-Pr | H | Cl | F | $CH_2CH_2CH_2OS(=O)_2Me$ | O |
| A-3445 | c-Pr | H | Cl | F | $CH_2CH_2CH_2OS(=O)_2CF_3$ | O |
| A-3446 | c-Pr | H | Cl | F | $CH_2CH_2CH_2CH_2OS(=O)_2CF_3$ | O |
| A-3447 | c-Pr | H | Cl | F | $CH_2CH_2CH_2CH_2CH_2OS(=O)_2CF_3$ | O |
| A-3448 | c-Pr | H | Cl | F | $CH_2CH_2CH_2CH_2CH_2OS(=O)_2CF_2CF_2CF_2CF_3$ | O |
| A-3449 | c-Pr | H | Cl | F | $CH_2CH_2OS(=O)_2Ph$ | O |
| A-3450 | c-Pr | H | Cl | F | $CH_2CH_2OS(=O)_2Ph(4-Me)$ | O |
| A-3451 | c-Pr | H | Cl | F | $CH_2CH_2CH_2OS(=O)_2Ph$ | O |
| A-3452 | c-Pr | H | Cl | F | $CH_2CH_2CH_2OS(=O)_2Ph(4-Me)$ | O |
| A-3453 | c-Pr | H | Cl | F | $CH_2CH_2NH_2$ | O |
| A-3454 | c-Pr | H | Cl | F | $CH_2CH_2CH_2NH_2$ | O |
| A-3455 | c-Pr | H | Cl | F | $CH_2CH_2CH_2CH_2NH_2$ | O |
| A-3456 | c-Pr | H | Cl | F | $CH_2CH_2CH_2CH_2CH_2NH_2$ | O |
| A-3457 | c-Pr | H | Cl | F | $CH_2CH_2CH_2CH_2CH_2CH_2NH_2$ | O |
| A-3458 | c-Pr | H | Cl | F | $CH_2CH_2CH_2CH_2CH_2CH_2CH_2NH_2$ | O |
| A-3459 | c-Pr | H | Cl | F | $CH_2CH(Me)NH_2$ | O |
| A-3460 | c-Pr | H | Cl | F | $CH_2C^*H(Me)NH_2$:(R) | O |
| A-3461 | c-Pr | H | Cl | F | $CH_2C^*H(Me)NH_2$:(S) | O |
| A-3462 | c-Pr | H | Cl | F | $CH_2CH(Et)NH_2$ | O |
| A-3463 | c-Pr | H | Cl | F | $CH_2CH(i-Pr)NH_2$ | O |
| A-3464 | c-Pr | H | Cl | F | $CH(Me)CH_2NH_2$ | O |
| A-3465 | c-Pr | H | Cl | F | $CH(Et)CH_2NH_2$ | O |
| A-3466 | c-Pr | H | Cl | F | $CH(i-Pr)CH_2NH_2$ | O |
| A-3467 | c-Pr | H | Cl | F | $CH_2CH_2CH(Me)NH_2$ | O |
| A-3468 | c-Pr | H | Cl | F | $CH_2CH(Me)CH_2NH_2$ | O |
| A-3469 | c-Pr | H | Cl | F | $CH(Me)CH_2CH_2NH_2$ | O |
| A-3470 | c-Pr | H | Cl | F | $CH_2CH(Me)NH(c-Pr)$ | O |

TABLE 80

| Compound Number | $R^1$ | $R^2$ | $R^3$ | $R^4$ | $R^5$ | A |
|---|---|---|---|---|---|---|
| A-3471 | c-Pr | H | Cl | F | $CH_2CH(Me)NHOMe$ | O |
| A-3472 | c-Pr | H | Cl | F | $CH_2CH(Me)N(OMe)S({=}O)_2Ph(2\text{-}NO_2)$ | O |
| A-3473 | c-Pr | H | Cl | F | $CH_2CH(Me)N(OMe)S({=}O)_2Ph(4\text{-}NO_2)$ | O |
| A-3474 | c-Pr | H | Cl | F | $CH_2CH_2N(Me)(t\text{-}Bu)$ | O |
| A-3475 | c-Pr | H | Cl | F | $CH_2CH_2CH_2N(Me)(t\text{-}Bu)$ | O |
| A-3476 | c-Pr | H | Cl | F | $CH_2CH_2CH_2CH_2N(Me)(t\text{-}Bu)$ | O |
| A-3477 | c-Pr | H | Cl | F | $CH_2CH_2NHCH_2CF_3$ | O |
| A-3478 | c-Pr | H | Cl | F | $CH_2CH_2CH_2NHCH_2CF_3$ | O |
| A-3479 | c-Pr | H | Cl | F | $CH_2CH_2CH_2CH_2NHCH_2CF_3$ | O |
| A-3480 | c-Pr | H | Cl | F | $CH_2CH_2NHC({=}O)C(Me)(CF_3)_2$ | O |
| A-3481 | c-Pr | H | Cl | F | $CH_2CH_2NHC({=}O)Me$ | O |
| A-3482 | c-Pr | H | Cl | F | $CH_2CH_2NHC({=}O)(t\text{-}Bu)$ | O |
| A-3483 | c-Pr | H | Cl | F | $CH_2CH_2CH_2CH_2NHC({=}O)CH(CH_3)_2$ | O |
| A-3484 | c-Pr | H | Cl | F | $CH_2CH_2CH_2CH_2NHC({=}O)(t\text{-}Bu)$ | O |
| A-3485 | c-Pr | H | Cl | F | $CH_2CH_2CH_2CH_2NHC({=}O)CH_2(t\text{-}Bu)$ | O |
| A-3486 | c-Pr | H | Cl | F | $CH_2CH_2NHC({=}O)CF_3$ | O |
| A-3487 | c-Pr | H | Cl | F | $CH_2CH_2NHC({=}O)CH_2CF_3$ | O |
| A-3488 | c-Pr | H | Cl | F | $CH_2CH_2NHC({=}O)CF_2CF_3$ | O |
| A-3489 | c-Pr | H | Cl | F | $CH_2CH_2CH_2NHC({=}O)CF_3$ | O |
| A-3490 | c-Pr | H | Cl | F | $CH_2CH_2CH_2NHC({=}O)CH_2CF_3$ | O |
| A-3491 | c-Pr | H | Cl | F | $CH_2CH_2CH_2NHC({=}O)CF_2CF_3$ | O |
| A-3492 | c-Pr | H | Cl | F | $CH_2CH_2CH_2CH_2NHC({=}O)CF_3$ | O |
| A-3493 | c-Pr | H | Cl | F | $CH_2CH_2CH_2CH_2NHC({=}O)CH_2CF_3$ | O |
| A-3494 | c-Pr | H | Cl | F | $CH_2CH_2CH_2CH_2NHC({=}O)CF_2CF_3$ | O |
| A-3495 | c-Pr | H | Cl | F | $CH_2CH_2CH_2CH_2NHC({=}O)CF(CF_3)_2$ | O |
| A-3496 | c-Pr | H | Cl | F | $CH_2CH_2CH_2CH_2NHC({=}O)CCl_3$ | O |
| A-3497 | c-Pr | H | Cl | F | $CH_2CH(Me)NHC({=}O)CF_3$ | O |
| A-3498 | c-Pr | H | Cl | F | $CH_2CH_2NHC({=}O)Ph$ | O |
| A-3499 | c-Pr | H | Cl | F | $CH_2CH_2NHC({=}O)Ph(4\text{-}CF_3)$ | O |
| A-3500 | c-Pr | H | Cl | F | $CH_2CH_2CH_2NHC({=}O)Ph(4\text{-}CF_3)$ | O |
| A-3501 | c-Pr | H | Cl | F | $CH_2CH_2CH_2CH_2NHC({=}O)Ph(4\text{-}CF_3)$ | O |
| A-3502 | c-Pr | H | Cl | F | $CH_2CH_2NHC({=}O)O(t\text{-}Bu)$ | O |
| A-3503 | c-Pr | H | Cl | F | $CH_2CH_2CH_2NHC({=}O)O(t\text{-}Bu)$ | O |
| A-3504 | c-Pr | H | Cl | F | $CH_2CH_2CH_2CH_2NHC({=}O)O(t\text{-}Bu)$ | O |
| A-3505 | c-Pr | H | Cl | F | $CH_2CH_2CH_2CH_2NHC({=}O)OCH(CH_3)_2$ | O |
| A-3506 | c-Pr | H | Cl | F | $CH_2CH(Me)NHC({=}O)O(t\text{-}Bu)$ | O |
| A-3507 | c-Pr | H | Cl | F | $CH_2C^*H(Me)NHC({=}O)O(t\text{-}Bu)$:(R) | O |
| A-3508 | c-Pr | H | Cl | F | $CH_2C^*H(Me)NHC({=}O)O(t\text{-}Bu)$:(S) | O |
| A-3509 | c-Pr | H | Cl | F | $CH_2CH(Et)NHC({=}O)O(t\text{-}Bu)$ | O |
| A-3510 | c-Pr | H | Cl | F | $CH_2CH(i\text{-}Pr)NHC({=}O)O(t\text{-}Bu)$ | O |
| A-3511 | c-Pr | H | Cl | F | $CH(Me)CH_2NHC({=}O)O(t\text{-}Bu)$ | O |
| A-3512 | c-Pr | H | Cl | F | $CH(Et)CH_2NHC({=}O)O(t\text{-}Bu)$ | O |
| A-3513 | c-Pr | H | Cl | F | $CH(i\text{-}Pr)CH_2NHC({=}O)O(t\text{-}Bu)$ | O |
| A-3514 | c-Pr | H | Cl | F | $CH_2CH(Me)CH_2NHC({=}O)O(t\text{-}Bu)$ | O |

TABLE 81

| Compound Number | $R^1$ | $R^2$ | $R^3$ | $R^4$ | $R^5$ | A |
|---|---|---|---|---|---|---|
| A-3515 | c-Pr | H | Cl | F | $CH_2CH_2NHC({=}O)OC(Me)_2CF_3$ | O |
| A-3516 | c-Pr | H | Cl | F | $CH_2CH_2CH_2NHC({=}O)OCH_2CF_3$ | O |
| A-3517 | c-Pr | H | Cl | F | $CH_2CH_2CH_2NHC({=}O)OCH_2CH_2CF_3$ | O |
| A-3518 | c-Pr | H | Cl | F | $CH_2CH_2CH_2CH_2NHC({=}O)OCH_2CCl_3$ | O |
| A-3519 | c-Pr | H | Cl | F | $CH_2CH_2CH_2CH_2NHC({=}O)OCH_2CF_3$ | O |
| A-3520 | c-Pr | H | Cl | F | $CH_2CH_2NHC({=}O)NH(t\text{-}Bu)$ | O |
| A-3521 | c-Pr | H | Cl | F | $CH_2CH_2CH_2NHC({=}O)NH(t\text{-}Bu)$ | O |
| A-3522 | c-Pr | H | Cl | F | $CH_2CH_2CH_2CH_2NHC({=}O)NHEt$ | O |
| A-3523 | c-Pr | H | Cl | F | $CH_2CH_2CH_2CH_2NHC({=}O)NH(t\text{-}Bu)$ | O |
| A-3524 | c-Pr | H | Cl | F | $CH_2CH_2CH_2NHC({=}O)NHCH_2CCl_3$ | O |
| A-3525 | c-Pr | H | Cl | F | $CH_2CH_2CH_2NHC({=}O)NHCH_2CH_2F$ | O |
| A-3526 | c-Pr | H | Cl | F | $CH_2CH_2CH_2NHC({=}O)NHCH_2CF_3$ | O |
| A-3527 | c-Pr | H | Cl | F | $CH_2CH_2CH_2CH_2NHC({=}O)NHCH_2CCl_3$ | O |
| A-3528 | c-Pr | H | Cl | F | $CH_2CH_2CH_2CH_2NHC({=}O)NHCH_2CH_2F$ | O |
| A-3529 | c-Pr | H | Cl | F | $CH_2CH_2CH_2CH_2NHC({=}O)NHCH_2CF_3$ | O |
| A-3530 | c-Pr | H | Cl | F | $CH_2CH_2NHS({=}O)Me$ | O |
| A-3531 | c-Pr | H | Cl | F | $CH_2CH_2CH_2NHS({=}O)Me$ | O |
| A-3532 | c-Pr | H | Cl | F | $CH_2CH_2CH_2CH_2NHS({=}O)Me$ | O |
| A-3533 | c-Pr | H | Cl | F | $CH_2CH_2CH_2CH_2NHS({=}O)CH(CH_3)_2$ | O |
| A-3534 | c-Pr | H | Cl | F | $CH_2CH_2CH_2CH_2CH_2NHS({=}O)Me$ | O |
| A-3535 | c-Pr | H | Cl | F | $CH_2CH_2NHS({=}O)CHF_2$ | O |

TABLE 81-continued

| Compound Number | $R^1$ | $R^2$ | $R^3$ | $R^4$ | $R^5$ | A |
|---|---|---|---|---|---|---|
| A-3536 | c-Pr | H | Cl | F | $CH_2CH_2CH_2NHS(=O)CHF_2$ | O |
| A-3537 | c-Pr | H | Cl | F | $CH_2CH_2CH_2CH_2NHS(=O)CHF_2$ | O |
| A-3538 | c-Pr | H | Cl | F | $CH_2CH_2CH_2CH_2CH_2NHS(=O)CHF_2$ | O |
| A-3539 | c-Pr | H | Cl | F | $CH_2CH(Me)NHS(=O)CHF_2$ | O |
| A-3540 | c-Pr | H | Cl | F | $CH(Me)CH_2NHS(=O)CHF_2$ | O |
| A-3541 | c-Pr | H | Cl | F | $CH_2CH_2CH(Me)NHS(=O)CHF_2$ | O |
| A-3542 | c-Pr | H | Cl | F | $CH_2CH(Me)CH_2NHS(=O)CHF_2$ | O |
| A-3543 | c-Pr | H | Cl | F | $CH(Me)CH_2CH_2NHS(=O)CHF_2$ | O |
| A-3544 | c-Pr | H | Cl | F | $CH_2CH_2NHS(=O)CF_3$ | O |
| A-3545 | c-Pr | H | Cl | F | $CH_2CH_2CH_2NHS(=O)CF_3$ | O |
| A-3546 | c-Pr | H | Cl | F | $CH_2CH_2CH_2CH_2NHS(=O)CF_3$ | O |
| A-3547 | c-Pr | H | Cl | F | $CH_2CH_2CH_2CH_2CH_2NHS(=O)CF_3$ | O |
| A-3548 | c-Pr | H | Cl | F | $CH_2CH_2CH_2NHS(=O)Ph$ | O |
| A-3549 | c-Pr | H | Cl | F | $CH_2CH_2CH_2CH_2NHS(=O)Ph$ | O |
| A-3550 | c-Pr | H | Cl | F | $CH_2CH_2CH_2CH_2CH_2NHS(=O)Ph$ | O |
| A-3551 | c-Pr | H | Cl | F | $CH_2CH_2CH_2CH_2CH_2NHS(=O)Ph(4-CF_3)$ | O |
| A-3552 | c-Pr | H | Cl | F | $CH_2CH(Me)NHS(=O)Ph(4-CF_3)$ | O |
| A-3553 | c-Pr | H | Cl | F | $CH_2CH(Et)NHS(=O)Ph(4-CF_3)$ | O |
| A-3554 | c-Pr | H | Cl | F | $CH(Me)CH_2NHS(=O)Ph(4-CF_3)$ | O |
| A-3555 | c-Pr | H | Cl | F | $CH(Et)CH_2NHS(=O)Ph(4-CF_3)$ | O |
| A-3556 | c-Pr | H | Cl | F | $CH_2CH(Et)CH_2NHS(=O)Ph(4-CF_3)$ | O |
| A-3557 | c-Pr | H | Cl | F | $CH_2CH_2NHS(=O)_2Me$ | O |
| A-3558 | c-Pr | H | Cl | F | $CH_2CH_2CH_2NHS(=O)_2Me$ | O |

TABLE 82

| Compound Number | $R^1$ | $R^2$ | $R^3$ | $R^4$ | $R^5$ | A |
|---|---|---|---|---|---|---|
| A-3559 | c-Pr | H | Cl | F | $CH_2CH_2CH_2CH_2NHS(=O)_2Me$ | O |
| A-3560 | c-Pr | H | Cl | F | $CH_2CH_2CH_2CH_2NHS(=O)_2CH(CH_3)_2$ | O |
| A-3561 | c-Pr | H | Cl | F | $CH_2CH_2CH_2CH_2CH_2NHS(=O)_2Me$ | O |
| A-3562 | c-Pr | H | Cl | F | $CH_2CH_2NHS(=O)_2CHF_2$ | O |
| A-3563 | c-Pr | H | Cl | F | $CH_2CH_2CH_2NHS(=O)_2CHF_2$ | O |
| A-3564 | c-Pr | H | Cl | F | $CH_2CH_2CH_2CH_2NHS(=O)_2CHF_2$ | O |
| A-3565 | c-Pr | H | Cl | F | $CH_2CH_2CH_2CH_2CH_2NHS(=O)_2CHF_2$ | O |
| A-3566 | c-Pr | H | Cl | F | $CH_2CH(Me)NHS(=O)_2CHF_2$ | O |
| A-3567 | c-Pr | H | Cl | F | $CH(Me)CH_2NHS(=O)_2CHF_2$ | O |
| A-3568 | c-Pr | H | Cl | F | $CH_2CH_2CH(Me)NHS(=O)_2CHF_2$ | O |
| A-3569 | c-Pr | H | Cl | F | $CH_2CH(Me)CH_2NHS(=O)_2CHF_2$ | O |
| A-3570 | c-Pr | H | Cl | F | $CH(Me)CH_2CH_2NHS(=O)_2CHF_2$ | O |
| A-3571 | c-Pr | H | Cl | F | $CH_2CH(Me)N(Me)S(=O)_2CHF_2$ | O |
| A-3572 | c-Pr | H | Cl | F | $CH(Me)CH_2N(Me)S(=O)_2CHF_2$ | O |
| A-3573 | c-Pr | H | Cl | F | $CH_2CH_2CH(Me)N(Me)S(=O)_2CHF_2$ | O |
| A-3574 | c-Pr | H | Cl | F | $CH_2CH(Me)CH_2N(Me)S(=O)_2CHF_2$ | O |
| A-3575 | c-Pr | H | Cl | F | $CH(Me)CH_2CH_2N(Me)S(=O)_2CHF_2$ | O |
| A-3576 | c-Pr | H | Cl | F | $CH_2CH_2CH_2NHS(=O)_2Ph$ | O |
| A-3577 | c-Pr | H | Cl | F | $CH_2CH_2CH_2CH_2NHS(=O)_2Ph$ | O |
| A-3578 | c-Pr | H | Cl | F | $CH_2CH_2CH_2CH_2CH_2NHS(=O)_2Ph$ | O |
| A-3579 | c-Pr | H | Cl | F | $CH_2CH_2CH_2CH_2CH_2NHS(=O)_2Ph(4-CF_3)$ | O |
| A-3580 | c-Pr | H | Cl | F | $CH_2CH(Me)NHS(=O)_2Ph(4-CF_3)$ | O |
| A-3581 | c-Pr | H | Cl | F | $CH_2CH(Et)NHS(=O)_2Ph(4-CF_3)$ | O |
| A-3582 | c-Pr | H | Cl | F | $CH(Me)CH_2NHS(=O)_2Ph(4-CF_3)$ | O |
| A-3583 | c-Pr | H | Cl | F | $CH(Et)CH_2NHS(=O)_2Ph(4-CF_3)$ | O |
| A-3584 | c-Pr | H | Cl | F | $CH_2CH(Me)CH_2NHS(=O)_2Ph(4-CF_3)$ | O |
| A-3585 | c-Pr | H | Cl | F | $CH_2CH_2SiMe_3$ | O |
| A-3586 | c-Pr | H | Cl | F | $CH_2CH_2CH_2SiMe_3$ | O |
| A-3587 | c-Pr | H | Cl | F | $CH_2CH_2CH_2CH_2SiMe_3$ | O |
| A-3588 | c-Pr | H | Cl | F | $CH_2Ph$ | O |
| A-3589 | c-Pr | H | Cl | F | $CH_2Ph(2-CF_3)$ | O |
| A-3590 | c-Pr | H | Cl | F | $CH_2Ph(3-CF_3)$ | O |
| A-3591 | c-Pr | H | Cl | F | $CH_2Ph(4-CF_3)$ | O |
| A-3592 | c-Pr | H | Cl | F | $CH_2Ph(2-OCF_3)$ | O |
| A-3593 | c-Pr | H | Cl | F | $CH_2Ph(3-OCF_3)$ | O |
| A-3594 | c-Pr | H | Cl | F | $CH_2Ph(4-OCF_3)$ | O |
| A-3595 | c-Pr | H | Cl | F | $CH_2Ph(2-SCF_3)$ | O |
| A-3596 | c-Pr | H | Cl | F | $CH_2Ph(3-SCF_3)$ | O |
| A-3597 | c-Pr | H | Cl | F | $CH_2Ph(4-SCF_3)$ | O |
| A-3598 | c-Pr | H | Cl | F | $CH_2Ph(3-CH_2SCF_3)$ | O |

TABLE 82-continued

| Compound Number | $R^1$ | $R^2$ | $R^3$ | $R^4$ | $R^5$ | A |
|---|---|---|---|---|---|---|
| A-3599 | c-Pr | H | Cl | F | $CH_2Ph(4-F)$ | O |
| A-3600 | c-Pr | H | Cl | F | $CH_2Ph(4-Cl)$ | O |
| A-3601 | c-Pr | H | Cl | F | $CH_2Ph(4-Br)$ | O |
| A-3602 | c-Pr | H | Cl | F | $CH_2Ph(4-Me)$ | O |

TABLE 83

| Compound Number | $R^1$ | $R^2$ | $R^3$ | $R^4$ | $R^5$ | A |
|---|---|---|---|---|---|---|
| A-3603 | c-Pr | H | Cl | F | $CH_2Ph[4-(t-Bu)]$ | O |
| A-3604 | c-Pr | H | Cl | F | $CH_2Ph(4-CN)$ | O |
| A-3605 | c-Pr | H | Cl | F | $CH_2Ph(4-NO_2)$ | O |
| A-3606 | c-Pr | H | Cl | F | $CH_2Ph(4-OCHF_2)$ | O |
| A-3607 | c-Pr | H | Cl | F | $CH_2Ph(4-SCHF_2)$ | O |
| A-3608 | c-Pr | H | Cl | F | $CH_2Ph(4-CH_2SCF_3)$ | O |
| A-3609 | c-Pr | H | Cl | F | $CH_2Ph[4-CF(CF_3)_2]$ | O |
| A-3610 | c-Pr | H | Cl | F | $CH_2Ph(4-CH_2SCF_3)$ | O |
| A-3611 | c-Pr | H | Cl | F | $CH_2Ph[4-Ph(4-CF_3)]$ | O |
| A-3612 | c-Pr | H | Cl | F | $CH_2Ph(2,4-Cl_2)$ | O |
| A-3613 | c-Pr | H | Cl | F | $CH_2Ph[2,5-(CF_3)_2]$ | O |
| A-3614 | c-Pr | H | Cl | F | $CH_2Ph(3,4-Cl_2)$ | O |
| A-3615 | c-Pr | H | Cl | F | $CH_2Ph(3-CF_3-4-F)$ | O |
| A-3616 | c-Pr | H | Cl | F | $CH_2Ph(3-CF_3-4-Cl)$ | O |
| A-3617 | c-Pr | H | Cl | F | $CH_2Ph(3-F-4-CF_3)$ | O |
| A-3618 | c-Pr | H | Cl | F | $CH_2Ph(2,4,6-F_3)$ | O |
| A-3619 | c-Pr | H | Cl | F | $CH_2Ph(3,4,5-F_3)$ | O |
| A-3620 | c-Pr | H | Cl | F | $CH_2Ph(2,3,4-F_3)$ | O |
| A-3621 | c-Pr | H | Cl | F | $CH_2Ph(3,4,5-Cl_3)$ | O |
| A-3622 | c-Pr | H | Cl | F | $CH_2CH_2Ph$ | O |
| A-3623 | c-Pr | H | Cl | F | $CH_2CH_2Ph(4-F)$ | O |
| A-3624 | c-Pr | H | Cl | F | $CH_2CH_2Ph(4-Cl)$ | O |
| A-3625 | c-Pr | H | Cl | F | $CH_2CH_2Ph(4-Br)$ | O |

TABLE 83-continued

| Compound Number | $R^1$ | $R^2$ | $R^3$ | $R^4$ | $R^5$ | A |
|---|---|---|---|---|---|---|
| A-3626 | c-Pr | H | Cl | F | $CH_2CH_2Ph[4-(t-Bu)]$ | O |
| A-3627 | c-Pr | H | Cl | F | $CH_2CH_2Ph(2-CF_3)$ | O |
| A-3628 | c-Pr | H | Cl | F | $CH_2CH_2Ph(3-CF_3)$ | O |
| A-3629 | c-Pr | H | Cl | F | $CH_2CH_2Ph(4-CF_3)$ | O |
| A-3630 | c-Pr | H | Cl | F | $CH_2CH_2Ph(4-CF_3)$ | O |
| A-3631 | c-Pr | H | Cl | F | $CH_2CH_2Ph(4-CF(CF_3)_2)$ | O |
| A-3632 | c-Pr | H | Cl | F | $CH_2CH_2Ph[4-(c-Pr)]$ | O |
| A-3633 | c-Pr | H | Cl | F | $CH_2CH_2Ph\{4-[c-Pr(2,2-F_2)]\}$ | O |
| A-3634 | c-Pr | H | Cl | F | $CH_2CH_2Ph(4-OMe)$ | O |
| A-3635 | c-Pr | H | Cl | F | $CH_2CH_2Ph(3-OCF_3)$ | O |
| A-3636 | c-Pr | H | Cl | F | $CH_2CH_2Ph(4-OCHF_2)$ | O |
| A-3637 | c-Pr | H | Cl | F | $CH_2CH_2Ph(4-OCF_3)$ | O |
| A-3638 | c-Pr | H | Cl | F | $CH_2CH_2Ph(4-SMe)$ | O |
| A-3639 | c-Pr | H | Cl | F | $CH_2CH_2Ph(4-SCHF_2)$ | O |
| A-3640 | c-Pr | H | Cl | F | $CH_2CH_2Ph(4-SCF_3)$ | O |
| A-3641 | c-Pr | H | Cl | F | $CH_2CH_2Ph[4-S(=O)Me]$ | O |
| A-3642 | c-Pr | H | Cl | F | $CH_2CH_2Ph[4-S(=O)CF_3]$ | O |
| A-3643 | c-Pr | H | Cl | F | $CH_2CH_2Ph[4-S(=O)2Me]$ | O |
| A-3644 | c-Pr | H | Cl | F | $CH_2CH_2Ph[4-S(=O)2CF_3]$ | O |
| A-3645 | c-Pr | H | Cl | F | $CH_2CH_2Ph(4-CH_2SMe)$ | O |
| A-3646 | c-Pr | H | Cl | F | $CH_2CH_2Ph(4-CH_2SCF_3)$ | O |

TABLE 84

| Compound Number | $R^1$ | $R^2$ | $R^3$ | $R^4$ | $R^5$ | A |
|---|---|---|---|---|---|---|
| A-3647 | c-Pr | H | Cl | F | $CH_2CH_2Ph[4-OS(=O)_2Me]$ | O |
| A-3648 | c-Pr | H | Cl | F | $CH_2CH_2Ph[4-OS(=O)_2CF_3]$ | O |
| A-3649 | c-Pr | H | Cl | F | $CH_2CH_2Ph[4-Ph(4-CF_3)]$ | O |
| A-3650 | c-Pr | H | Cl | F | $CH_2CH_2Ph(4-CH_2Ph)$ | O |
| A-3651 | c-Pr | H | Cl | F | $CH_2CH_2Ph(4-OCH_2Ph)$ | O |
| A-3652 | c-Pr | H | Cl | F | $CH_2CH_2Ph(4-CN)$ | O |
| A-3653 | c-Pr | H | Cl | F | $CH_2CH_2Ph(4-NO_2)$ | O |
| A-3654 | c-Pr | H | Cl | F | $CH_2CH_2Ph(2,4-Cl_2)$ | O |
| A-3655 | c-Pr | H | Cl | F | $CH_2CH_2Ph(3,4-Cl_2)$ | O |
| A-3656 | c-Pr | H | Cl | F | $CH_2CH_2Ph(3-CF_3-4-F)$ | O |
| A-3657 | c-Pr | H | Cl | F | $CH_2CH_2Ph(2-CF_3-4-F)$ | O |
| A-3658 | c-Pr | H | Cl | F | $CH_2CH_2Ph(3-F-4-CF_3)$ | O |
| A-3659 | c-Pr | H | Cl | F | $CH_2CH_2Ph(2-F-4-CF_3)$ | O |
| A-3660 | c-Pr | H | Cl | F | $CH_2CH_2Ph(3-Cl-4-OCHF_2)$ | O |
| A-3661 | c-Pr | H | Cl | F | $CH_2CH_2Ph(3,4,5-Cl_3)$ | O |
| A-3662 | c-Pr | H | Cl | F | $CH_2CH_2Ph(2,3,4-F_3)$ | O |
| A-3663 | c-Pr | H | Cl | F | $CH_2CH_2Ph(2,4,5-F_3)$ | O |
| A-3664 | c-Pr | H | Cl | F | $CH_2CH_2Ph(3,4,5-F_3)$ | O |
| A-3665 | c-Pr | H | Cl | F | $CH_2CH_2Ph(2,4,6-F_3)$ | O |
| A-3666 | c-Pr | H | Cl | F | $CH_2CH_2CH_2Ph$ | O |
| A-3667 | c-Pr | H | Cl | F | $CH_2CH_2CH_2Ph(3-CF_3)$ | O |
| A-3668 | c-Pr | H | Cl | F | $CH_2CH_2CH_2Ph(4-CF_3)$ | O |
| A-3669 | c-Pr | H | Cl | F | $CH_2CH_2CH_2Ph(4-F)$ | O |
| A-3670 | c-Pr | H | Cl | F | $CH_2CH_2CH_2Ph[4-(t-Bu)]$ | O |
| A-3671 | c-Pr | H | Cl | F | $CH_2CH_2CH_2Ph(4-CN)$ | O |
| A-3672 | c-Pr | H | Cl | F | $CH_2CH_2CH_2Ph(4-CF_3)$ | O |
| A-3673 | c-Pr | H | Cl | F | $CH_2CH_2CH_2Ph(4-OCHF_2)$ | O |
| A-3674 | c-Pr | H | Cl | F | $CH_2CH_2CH_2Ph(4-OCF_3)$ | O |
| A-3675 | c-Pr | H | Cl | F | $CH_2CH_2CH_2Ph(4-SCHF_2)$ | O |
| A-3676 | c-Pr | H | Cl | F | $CH_2CH_2CH_2Ph(4-SCF_3)$ | O |
| A-3677 | c-Pr | H | Cl | F | $CH_2CH_2CH_2Ph[4-CF(CF_3)_2]$ | O |
| A-3678 | c-Pr | H | Cl | F | $CH_2CH_2CH_2Ph(3,4,5-F_3)$ | O |
| A-3679 | c-Pr | H | Cl | F | $CH_2CH_2CH_2Ph(2,4,6-F_3)$ | O |
| A-3680 | c-Pr | H | Cl | F | $CH_2CH_2CH_2CH_2Ph$ | O |

TABLE 84-continued

| Compound Number | $R^1$ | $R^2$ | $R^3$ | $R^4$ | $R^5$ | A |
|---|---|---|---|---|---|---|
| A-3681 | c-Pr | H | Cl | F | $CH_2CH_2CH_2CH_2Ph(4\text{-}F)$ | O |
| A-3682 | c-Pr | H | Cl | F | $CH_2CH_2CH_2CH_2Ph(4\text{-}CF_3)$ | O |
| A-3683 | c-Pr | H | Cl | F | $CH_2CH_2CH_2CH_2Ph(4\text{-}OCF_3)$ | O |
| A-3684 | c-Pr | H | Cl | F | $CH_2CH_2CH_2CH_2Ph(4\text{-}SCF_3)$ | O |
| A-3685 | c-Pr | H | Cl | F | $CH_2CH_2CH_2CH_2CH_2Ph$ | O |
| A-3686 | c-Pr | H | Cl | F | $CH_2CH_2CH_2CH_2CH_2CH_2Ph$ | O |
| A-3687 | c-Pr | H | Cl | F | $CH_2CF_2Ph(4\text{-}F)$ | O |
| A-3688 | c-Pr | H | Cl | F | $CH_2CF_2Ph(4\text{-}CF_3)$ | O |
| A-3689 | c-Pr | H | Cl | F | $CH_2CF_2Ph(3,4,5\text{-}F_3)$ | O |
| A-3690 | c-Pr | H | Cl | F | $CH_2CF_2Ph(3,4,5\text{-}F_3)$ | O |

TABLE 85

| Compound Number | $R^1$ | $R^2$ | $R^3$ | $R^4$ | $R^5$ | A |
|---|---|---|---|---|---|---|
| A-3691 | c-Pr | H | Cl | F | $CH_2CH_2OPh$ | O |
| A-3692 | c-Pr | H | Cl | F | $CH_2CH_2OPh(4\text{-}F)$ | O |
| A-3693 | c-Pr | H | Cl | F | $CH_2CH_2OPh(4\text{-}CF_3)$ | O |
| A-3694 | c-Pr | H | Cl | F | $CH_2CH_2CH_2OPh$ | O |
| A-3695 | c-Pr | H | Cl | F | $CH_2CH_2CH_2OPh(4\text{-}Cl)$ | O |
| A-3696 | c-Pr | H | Cl | F | $CH_2CH_2CH_2OPh(4\text{-}CF_3)$ | O |
| A-3697 | c-Pr | H | Cl | F | $CH_2CH_2CH_2CH_2OPh(4\text{-}CF_3)$ | O |
| A-3698 | c-Pr | H | Cl | F | $CH_2CH_2CH_2CH_2OPh(4\text{-}OCF_3)$ | O |
| A-3699 | c-Pr | H | Cl | F | $CH_2CH_2CH_2CH_2CH_2OPh(4\text{-}CF_3)$ | O |
| A-3700 | c-Pr | H | Cl | F | $CH_2CH_2OCH_2Ph$ | O |
| A-3701 | c-Pr | H | Cl | F | $CH_2CH_2CH_2OCH_2Ph$ | O |
| A-3702 | c-Pr | H | Cl | F | $CH_2CH_2CH_2CH_2OCH_2Ph$ | O |
| A-3703 | c-Pr | H | Cl | F | $CH_2CH_2CH_2CH_2CH_2OCH_2Ph$ | O |
| A-3704 | c-Pr | H | Cl | F | $CH_2CH_2SPh$ | O |
| A-3705 | c-Pr | H | Cl | F | $CH_2CH_2CH_2SPh$ | O |
| A-3706 | c-Pr | H | Cl | F | $CH_2CH_2CH_2SPh(4\text{-}F)$ | O |
| A-3707 | c-Pr | H | Cl | F | $CH_2CH_2CH_2SPh(4\text{-}Cl)$ | O |
| A-3708 | c-Pr | H | Cl | F | $CH_2CH_2CH_2SPh(4\text{-}Br)$ | O |
| A-3709 | c-Pr | H | Cl | F | $CH_2CH_2CH_2SPh[4\text{-}(t\text{-}Bu)]$ | O |
| A-3710 | c-Pr | H | Cl | F | $CH_2CH_2CH_2SPh(3\text{-}CF_3)$ | O |
| A-3711 | c-Pr | H | Cl | F | $CH_2CH_2CH_2SPh(4\text{-}CF_3)$ | O |
| A-3712 | c-Pr | H | C | F | $CH_2CH_2CH_2SPh(3\text{-}SCF_3)$ | O |
| A-3713 | c-Pr | H | Cl | F | $CH_2CH_2CH_2SPh(4\text{-}SCF_3)$ | O |
| A-3714 | c-Pr | H | Cl | F | $CH_2CH_2CH_2CH_2SPh$ | O |
| A-3715 | c-Pr | H | Cl | F | $CH_2CH_2CH_2CH_2SPh(4\text{-}F)$ | O |
| A-3716 | c-Pr | H | Cl | F | $CH_2CH_2CH_2CH_2SPh(4\text{-}Cl)$ | O |
| A-3717 | c-Pr | H | Cl | F | $CH_2CH_2CH_2CH_2SPh[4\text{-}(t\text{-}Bu)]$ | O |
| A-3718 | c-Pr | H | Cl | F | $CH_2CH_2CH_2CH_2SPh(4\text{-}CF_3)$ | O |
| A-3719 | c-Pr | H | Cl | F | $CH_2CH_2CH_2CH_2CH_2SPh$ | O |
| A-3720 | c-Pr | H | Cl | F | $CH_2CH_2CH_2CH_2CH_2SPh(4\text{-}F)$ | O |
| A-3721 | c-Pr | H | Cl | F | $CH_2CH_2CH_2CH_2CH_2SPh(4\text{-}Cl)$ | O |
| A-3722 | c-Pr | H | Cl | F | $CH_2CH_2CH_2CH_2CH_2SPh(4\text{-}CF_3)$ | O |
| A-3723 | c-Pr | H | Cl | F | $CH_2CH_2S({=}O)Ph$ | O |
| A-3724 | c-Pr | H | Cl | F | $CH_2CH_2CH_2S({=}O)Ph$ | O |
| A-3725 | c-Pr | H | Cl | F | $CH_2CH_2CH_2S({=}O)Ph(4\text{-}F)$ | O |
| A-3726 | c-Pr | H | Cl | F | $CH_2CH_2CH_2S({=}O)Ph[4\text{-}(t\text{-}Bu)]$ | O |
| A-3727 | c-Pr | H | Cl | F | $CH_2CH_2CH_2S({=}O)Ph(4\text{-}CF_3)$ | O |
| A-3728 | c-Pr | H | Cl | F | $CH_2CH_2S({=}O)_2Ph$ | O |
| A-3729 | c-Pr | H | Cl | F | $CH_2CH_2S({=}O)_2Ph(4\text{-}CF_3)$ | O |
| A-3730 | c-Pr | H | Cl | F | $CH_2CH_2CH_2S({=}O)_2Ph(4\text{-}F)$ | O |
| A-3731 | c-Pr | H | Cl | F | $CH_2CH_2CH_2S({=}O)_2Ph(4\text{-}Cl)$ | O |
| A-3732 | c-Pr | H | Cl | F | $CH_2CH_2CH_2S({=}O)_2Ph(4\text{-}CF_3)$ | O |
| A-3733 | c-Pr | H | Cl | F | $CH_2CH_2CH_2CH_2S({=}O)_2Ph$ | O |
| A-3734 | c-Pr | H | Cl | F | $CH_2CH_2CH_2CH_2S({=}O)_2Ph(4\text{-}Cl)$ | O |

TABLE 86

| Compound Number | $R^1$ | $R^2$ | $R^3$ | $R^4$ | $R^5$ | A |
|---|---|---|---|---|---|---|
| A-3735 | c-Pr | H | Cl | F | $CH_2CH_2CH_2CH_2S({=}O)_2Ph(4\text{-}CF_3)$ | O |
| A-3736 | c-Pr | H | Cl | F | $CH_2CH_2SCH_2Ph$ | O |

TABLE 86-continued

| Compound Number | $R^1$ | $R^2$ | $R^3$ | $R^4$ | $R^5$ | A |
|---|---|---|---|---|---|---|
| A-3737 | c-Pr | H | Cl | F | $CH_2CH_2CH_2SCH_2Ph$ | O |
| A-3738 | c-Pr | H | Cl | F | $CH_2CH_2CH_2SCH_2Ph$(2-Cl) | O |
| A-3739 | c-Pr | H | Cl | F | $CH_2CH_2CH_2SCH_2Ph$(3-Cl) | O |
| A-3740 | c-Pr | H | Cl | F | $CH_2CH_2CH_2SCH_2Ph$(4-Cl) | O |
| A-3741 | c-Pr | H | Cl | F | $CH_2CH_2CH_2SCH_2Ph$(2-$SCF_3$) | O |
| A-3742 | c-Pr | H | Cl | F | $CH_2CH_2CH_2SCH_2Ph$(3-$CF_3$) | O |
| A-3743 | c-Pr | H | Cl | F | $CH_2CH_2CH_2SCH_2Ph$(4-$CF_3$) | O |
| A-3744 | c-Pr | H | Cl | F | $CH_2CH_2CH_2SCH_2Ph$(4-$NO_2$) | O |
| A-3745 | c-Pr | H | Cl | F | $CH_2CH_2CH_2CH_2SCH_2Ph$ | O |
| A-3746 | c-Pr | H | Cl | F | $CH_2CH_2CH_2CH_2SCH_2Ph$(4-Cl) | O |
| A-3747 | c-Pr | H | Cl | F | $CH_2CH_2CH_2CH_2SCH_2Ph$(4-$CF_3$) | O |
| A-3748 | c-Pr | H | Cl | F | $CH_2CH_2CH_2CH_2SCH_2Ph$(4-CN) | O |
| A-3749 | c-Pr | H | Cl | F | $CH_2CH_2CH_2CH_2CH_2SCH_2Ph$ | O |
| A-3750 | c-Pr | H | Cl | F | $CH_2CH_2SCH_2CH_2Ph$ | O |
| A-3751 | c-Pr | H | Cl | F | $CH_2CH_2CH_2SCH_2CH_2Ph$ | O |
| A-3752 | c-Pr | H | Cl | F | $CH_2CH_2CH_2CH_2SCH_2CH_2Ph$ | O |
| A-3753 | c-Pr | H | Cl | F | $CH_2CH_2SCH$(Me)Ph | O |
| A-3754 | c-Pr | H | Cl | F | $CH_2CH_2CH_2SCH$(Me)Ph | O |
| A-3755 | c-Pr | H | Cl | F | $CH_2CH_2CH_2CH_2SCH$(Me)Ph | O |
| A-3756 | c-Pr | H | Cl | F | $CH_2CH_2S$(=O)$CH_2Ph$ | O |
| A-3757 | c-Pr | H | Cl | F | $CH_2CH_2S$(=O)$CH_2Ph$(4-$CF_3$) | O |
| A-3758 | c-Pr | H | Cl | F | $CH_2CH_2CH_2S$(=O)$CH_2Ph$ | O |
| A-3759 | c-Pr | H | Cl | F | $CH_2CH_2CH_2S$(=O)$CH_2Ph$(2-$SCF_3$) | O |
| A-3760 | c-Pr | H | Cl | F | $CH_2CH_2CH_2S$(=O)$CH_2Ph$(4-$SCF_3$) | O |
| A-3761 | c-Pr | H | Cl | F | $CH_2CH_2CH_2S$(=O)$CH_2Ph$(4-Cl) | O |
| A-3762 | c-Pr | H | Cl | F | $CH_2CH_2CH_2S$(=O)$CH_2Ph$(4-$CF_3$) | O |
| A-3763 | c-Pr | H | Cl | F | $CH_2CH_2CH_2CH_2S$(=O)$CH_2Ph$ | O |
| A-3764 | c-Pr | H | Cl | F | $CH_2CH_2CH_2CH_2S$(=O)$CH_2Ph$(4-$CF_3$) | O |
| A-3765 | c-Pr | H | Cl | F | $CH_2CH_2CH_2CH_2CH_2S$(=O)$CH_2Ph$(4-$CF_3$) | O |
| A-3766 | c-Pr | H | Cl | F | $CH_2CH_2S(=O)_2CH_2Ph$ | O |
| A-3767 | c-Pr | H | Cl | F | $CH_2CH_2S(=O)_2CH_2Ph$(4-$CF_3$) | O |
| A-3768 | c-Pr | H | Cl | F | $CH_2CH_2CH_2S(=O)_2CH_2Ph$ | O |
| A-3769 | c-Pr | H | Cl | F | $CH_2CH_2CH_2S(=O)_2CH_2Ph$(4-Cl) | O |
| A-3770 | c-Pr | H | Cl | F | $CH_2CH_2CH_2S(=O)_2CH_2Ph$(4-$CF_3$) | O |
| A-3771 | c-Pr | H | Cl | F | $CH_2CH_2CH_2CH_2S(=O)_2CH_2Ph$ | O |
| A-3772 | c-Pr | H | Cl | F | $CH_2CH_2CH_2CH_2S(=O)_2CH_2Ph$(4-$CF_3$) | O |
| A-3773 | c-Pr | H | Cl | F | $CH_2CH_2CH_2CH_2CH_2S(=O)_2CH_2Ph$ | O |
| A-3774 | c-Pr | H | Cl | F | $CH_2CH_2CH_2CH_2CH_2S(=O)_2CH_2Ph$(4-$CF_3$) | O |
| A-3775 | c-Pr | H | Cl | F | $CH_2CH_2ON$=CH(t-Bu) | O |
| A-3776 | c-Pr | H | Cl | F | $CH_2CH_2CH_2ON$=CH(t-Bu) | O |
| A-3777 | c-Pr | H | Cl | F | $CH_2CH_2CH_2CH_2ON$=C(Me)(c-Pr) | O |
| A-3778 | c-Pr | H | Cl | F | $CH_2CH_2ON$=C(Me)$CF_3$ | O |

TABLE 87

| Compound Number | $R^1$ | $R^2$ | $R^3$ | $R^4$ | $R^5$ | A |
|---|---|---|---|---|---|---|
| A-3779 | c-Pr | H | Cl | F | $CH_2CH_2CH_2ON$=$CHCF_3$ | O |
| A-3780 | c-Pr | H | Cl | F | $CH_2CH_2CH_2ON$=C(Me)$CF_3$ | O |
| A-3781 | c-Pr | H | Cl | F | $CH_2CH_2CH_2ON$=C(Me)$CCl_3$ | O |
| A-3782 | c-Pr | H | Cl | F | $CH_2CH_2CH_2CH_2ON$=$CHCF_3$ | O |
| A-3783 | c-Pr | H | Cl | F | $CH_2CH_2CH_2CH_2ON$=C(Me)$CF_3$ | O |
| A-3784 | c-Pr | H | Cl | F | $CH_2CH_2CH_2CH_2CH_2ON$=C(Me)$CF_3$ | O |
| A-3785 | c-Pr | H | Cl | F | $CH_2CH_2ON$=CHPh | O |
| A-3786 | c-Pr | H | Cl | F | $CH_2CH_2ON$=CHPh(4-$CF_3$) | O |
| A-3787 | c-Pr | H | Cl | F | $CH_2CH_2ON$=CHPh(4-$SCF_3$) | O |
| A-3788 | c-Pr | H | Cl | F | $CH_2CH_2CH_2ON$=CHPh(3-$CF_3$) | O |
| A-3789 | c-Pr | H | Cl | F | $CH_2CH_2CH_2ON$=CHPh(4-$CF_3$) | O |
| A-3790 | c-Pr | H | Cl | F | $CH_2CH_2CH_2ON$=CHPh(4-$SCF_3$) | O |
| A-3791 | c-Pr | H | Cl | F | $CH_2CH_2CH_2ON$=C(Me)Ph(4-CF3) | O |
| A-3792 | c-Pr | H | Cl | F | $CH_2CH_2CH_2CH_2ON$=CHPh(4-$SCF_3$) | O |
| A-3793 | c-Pr | H | Cl | F | $CH_2CH_2$(adamant-1-yl) | O |
| A-3794 | c-Pr | H | Cl | F | $CH_2CH_2CH_2$(3-$CF_3$-pyrazol-1-yl) | O |
| A-3795 | c-Pr | H | Cl | F | $CH_2CH_2CH_2CH_2$(3-$CF_3$-pyrazol-1-yl) | O |
| A-3796 | c-Pr | H | Cl | F | $CH_2CH_2CH_2CH_2CH_2$(3-$CF_3$-pyrazol-1-yl) | O |
| A-3797 | c-Pr | H | Cl | F | $CH_2$(1-Me-4-$CF_3$-imidazol-5-yl) | O |
| A-3798 | c-Pr | H | Cl | F | $CH_2CH_2$(1-Me-4-$CF_3$-imidazol-5-yl) | O |
| A-3799 | c-Pr | H | Cl | F | $CH_2CH_2CH_2$(1-Me-4-$CF_3$-imidazol-5-yl) | O |
| A-3800 | c-Pr | H | Cl | F | $CH_2CH_2CH_2$(3-$CF_3$-1,2,4-triazol-1-yl) | O |
| A-3801 | c-Pr | H | Cl | F | $CH_2CH_2CH_2CH_2$(3-$CF_3$-1,2,4-triazol-1-yl) | O |
| A-3802 | c-Pr | H | Cl | F | $CH_2CH_2CH_2CH_2CH_2$(3-$CF_3$-1,2,4-triazol-1-yl) | O |
| A-3803 | c-Pr | H | Cl | F | $CH_2CH_2CH_2$(4-$CF_3$-thiazol-2-yl) | O |

TABLE 87-continued

| Compound Number | $R^1$ | $R^2$ | $R^3$ | $R^4$ | $R^5$ | A |
|---|---|---|---|---|---|---|
| A-3804 | c-Pr | H | Cl | F | $CH_2CH_2CH_2CH_2$(4-$CF_3$-thiazol-2-yl) | O |
| A-3805 | c-Pr | H | Cl | F | $CH_2CH_2CH_2CH_2CH_2$(4-$CF_3$-thiazol-2-yl) | O |
| A-3806 | c-Pr | H | Cl | F | $CH_2CH_2CH_2$(2-$CF_3$-pyridin-5-yl) | O |
| A-3807 | c-Pr | H | Cl | F | $CH_2CH_2CH_2CH_2$(2-$CF_3$-pyridin-5-yl) | O |
| A-3808 | c-Pr | H | Cl | F | $CH_2CH_2CH_2CH_2CH_2$(2-$CF_3$-pyridin-5-yl) | O |
| A-3809 | c-Pr | H | Cl | F | $CH_2$(4-$CF_3$-pyrimidin-2-yl) | O |
| A-3810 | c-Pr | H | Cl | F | $CH_2CH_2$(4-$CF_3$-pyrimidin-2-yl) | O |
| A-3811 | c-Pr | H | Cl | F | $CH_2CH_2CH_2$(4-$CF_3$-pyrimidin-2-yl) | O |
| A-3812 | c-Pr | H | Cl | F | $CH_2CH_2O$(3-Cl-5-$CF_3$-pyridin-2-yl) | O |
| A-3813 | c-Pr | H | Cl | F | $CH_2CH_2CH_2O$(3-Cl-5-$CF_3$-pyridin-2-yl) | O |
| A-3814 | c-Pr | H | Cl | F | $CH_2CH_2CH_2CH_2O$(3-Cl-5-$CF_3$-pyridin-2-yl) | O |
| A-3815 | c-Pr | H | Cl | F | $CH_2CH_2CH_2CH_2CH_2O$(3-Cl-5-$CF_3$-pyridin-2-yl) | O |
| A-3816 | c-Pr | H | Cl | F | $CH_2CH_2N$(Phth) | O |
| A-3817 | c-Pr | H | Cl | F | $CH_2CH_2CH_2N$(Phth) | O |
| A-3818 | c-Pr | H | Cl | F | $CH_2CH_2CH_2CH_2N$(Phth) | O |
| A-3819 | c-Pr | H | Cl | F | $CH_2CH_2CH_2CH_2CH_2N$(Phth) | O |
| A-3820 | c-Pr | H | Cl | F | $CH_2CH(Me)CH_2N$(Phth) | O |
| A-3821 | c-Pr | H | Cl | F | $CH_2$[1,3-dioxolan(2-$CF_3$)-2-yl] | O |
| A-3822 | c-Pr | H | Cl | F | $CH_2$(azetidin-3-yl) | O |

TABLE 88

| Compound Number | $R^1$ | $R^2$ | $R^3$ | $R^4$ | $R^5$ | A |
|---|---|---|---|---|---|---|
| A-3823 | c-Pr | H | Cl | F | $CH_2$(pyrrolidin-3-yl) | O |
| A-3824 | c-Pr | H | Cl | F | $CH_2$(piperidin-3-yl) | O |
| A-3825 | c-Pr | H | Cl | F | $CH_2${azetidin[1-C(=O)O(t-Bu)]-3-yl} | O |
| A-3826 | c-Pr | H | Cl | F | $CH_2${pyrrolidin[1-C(=O)O(t-Bu)]-3-yl} | O |
| A-3827 | c-Pr | H | Cl | F | $CH_2${piperidin[1-C(=O)O(t-Bu)]-3-yl} | O |
| A-3828 | c-Pr | H | Cl | F | $CH_2${azetidin[1-C(=O)$CF_3$]-3-yl} | O |
| A-3829 | c-Pr | H | Cl | F | $CH_2${azetidin[1-S(=O)$_2CF_3$]-3-yl} | O |
| A-3830 | c-Pr | H | Cl | F | $CH_2${pyrrolidin[1-C(=O)$CF_3$]-3-yl} | O |
| A-3831 | c-Pr | H | Cl | F | $CH_2${pyrrolidin[1-S(=O)$_2CF_3$]-3-yl} | O |
| A-3832 | c-Pr | H | Cl | F | $CH_2${piperidin[1-C(=O)$CF_3$]-3-yl} | O |
| A-3833 | c-Pr | H | Cl | F | $CH_2${piperidin[1-S(=O)$_2CF_3$]-3-yl} | O |
| A-3834 | c-Pr | H | Cl | F | $CH_2CH_2CH_2CN$ | O |
| A-3835 | c-Pr | H | Cl | F | $CH_2CH_2CH_2CH_2CN$ | O |
| A-3836 | c-Pr | H | Cl | F | $CH_2CH_2CH_2CH_2CH_2CN$ | O |
| A-3837 | c-Pr | H | Cl | F | $CH_2CH_2CH_2CH_2CH_2CH_2CN$ | O |
| A-3838 | c-Pr | H | Cl | F | $CH_2CH_2CH_2C$(=O)OH | O |
| A-3839 | c-Pr | H | Cl | F | $CH_2CH_2CH_2CH_2C$(=O)OH | O |
| A-3840 | c-Pr | H | Cl | F | $CH_2CH_2CH_2CH_2CH_2C$(=O)OH | O |
| A-3841 | c-Pr | H | Cl | F | $CH_2CH_2SCN$ | O |
| A-3842 | c-Pr | H | Cl | F | $CH_2CH_2CH_2SCN$ | O |
| A-3843 | c-Pr | H | Cl | F | $CH_2CH_2CH_2CH_2SCN$ | O |
| A-3844 | c-Pr | H | Cl | F | $CH_2CH_2CH_2CH_2CH_2SCN$ | O |
| A-3845 | c-Pr | H | Cl | F | $CH_2CH_2CH_2CH_2CH_2SCN$ | O |
| A-3846 | c-Pr | H | Cl | F | $CH_2CH_2CH_2CH_2CH_2CH_2SCN$ | O |
| A-3847 | c-Pr | H | Cl | F | $CH_2CH_2CH_2CH_2CH_2CH_2CH_2SCN$ | O |
| A-3848 | c-Pr | H | Cl | F | $CH_2CH_2CH_2CH_2CH_2CH_2CH_2CH_2SCN$ | O |
| A-3849 | c-Pr | H | Cl | F | $CH_2CH_2CH(Me)SCN$ | O |
| A-3850 | c-Pr | H | Cl | F | $CH_2CH(Me)CH_2SCN$ | O |
| A-3851 | c-Pr | H | Cl | F | $CH(Me)CH_2CH_2SCN$ | O |
| A-3852 | c-Pr | H | Cl | F | $CH_2CH_2CH_2CH(Me)SCN$ | O |
| A-3853 | c-Pr | H | Cl | F | $CH_2CH_2CH(Me)CH_2SCN$ | O |
| A-3854 | c-Pr | H | Cl | F | $CH_2CH(Me)CH_2CH_2SCN$ | O |
| A-3855 | c-Pr | H | Cl | F | $CH(Me)CH_2CH_2CH_2SCN$ | O |
| A-3856 | c-Pr | H | Cl | F | $CH_2CH_2CH_2CH_2CH(Me)SCN$ | O |
| A-3857 | c-Pr | H | Cl | F | $CH_2CH_2CH_2CH(Me)CH_2SCN$ | O |
| A-3858 | c-Pr | H | Cl | F | $CH_2CH_2CH(Me)CH_2CH_2SCN$ | O |
| A-3859 | c-Pr | H | Cl | F | $CH_2CH(Me)CH_2CH_2CH_2SCN$ | O |
| A-3860 | c-Pr | H | Cl | F | $CH(Me)CH_2CH_2CH_2CH_2SCN$ | O |
| A-3861 | c-Pr | H | Cl | F | $CH_2CH_2ONH_2$ | O |
| A-3862 | c-Pr | H | Cl | F | $CH_2CH_2CH_2ONH_2$ | O |
| A-3863 | c-Pr | H | Cl | F | $CH_2CH_2CH_2CH_2ONH_2$ | O |
| A-3864 | c-Pr | H | Cl | F | $CH_2CH_2CH_2CH_2CH_2ONH_2$ | O |
| A-3865 | c-Pr | H | Cl | F | $CH_2CH_2CH_2CH_2CH_2CH_2ONH_2$ | O |
| A-3866 | c-Pr | H | Me | F | Me | O |

TABLE 89

| Compound Number | $R^1$ | $R^2$ | $R^3$ | $R^4$ | $R^5$ | A |
|---|---|---|---|---|---|---|
| A-3867 | c-Pr | H | Me | F | Et | O |
| A-3868 | c-Pr | H | Me | F | n-Pr | O |
| A-3869 | c-Pr | H | Me | F | i-Pr | O |
| A-3870 | c-Pr | H | Me | F | n-Bu | O |
| A-3871 | c-Pr | H | Me | F | n-Pen | O |
| A-3872 | c-Pr | H | Me | F | n-Hex | O |
| A-3873 | c-Pr | H | Me | F | n-Heptyl | O |
| A-3874 | c-Pr | H | Me | F | n-Octyl | O |
| A-3875 | c-Pr | H | Me | F | n-Nonyl | O |
| A-3876 | c-Pr | H | Me | F | n-Decyl | O |
| A-3877 | c-Pr | H | Me | F | c-Pr | O |
| A-3878 | c-Pr | H | Me | F | c-Pen | O |
| A-3879 | c-Pr | H | Me | F | c-Hex | O |
| A-3880 | c-Pr | H | Me | F | $CH_2C(Me)=CH_2$ | O |
| A-3881 | c-Pr | H | Me | F | $CH_2CH_2CH=CH_2$ | O |
| A-3882 | c-Pr | H | Me | F | $CH_2CH_2CH=C(CH_3)_2$ | O |
| A-3883 | c-Pr | H | Me | F | $CH_2CH_2CH_2CH=CH_2$ | O |
| A-3884 | c-Pr | H | Me | F | $CH_2CH_2CH_2CH=C(CH_3)_2$ | O |
| A-3885 | c-Pr | H | Me | F | $CH_2CH_2CH_2CH_2CH=CH_2$ | O |
| A-3886 | c-Pr | H | Me | F | $CH_2CH_2CH_2CH_2CH=C(CH_3)_2$ | O |
| A-3887 | c-Pr | H | Me | F | $CH_2CH_2CH{\equiv}CH$ | O |
| A-3888 | c-Pr | H | Me | F | $CH_2CH_2CH_2CH{\equiv}CH$ | O |
| A-3889 | c-Pr | H | Me | F | $CH_2CH_2CH_2CH_2CH{\equiv}CH$ | O |
| A-3890 | c-Pr | H | Me | F | $CH_2CH_2CH_2Cl$ | O |
| A-3891 | c-Pr | H | Me | F | $CH_2CH_2CH_2Br$ | O |
| A-3892 | c-Pr | H | Me | F | $CH_2CH_2CH_2CH_2Cl$ | O |
| A-3893 | c-Pr | H | Me | F | $CH_2CH_2CH_2CH_2Br$ | O |
| A-3894 | c-Pr | H | Me | F | $CH_2CH_2CH_2CH_2CH_2Cl$ | O |
| A-3895 | c-Pr | H | Me | F | $CH_2CH_2CH_2CH_2CH_2Br$ | O |
| A-3896 | c-Pr | H | Me | F | $CH_2CH_2CH_2CH_2CH_2Br$ | O |
| A-3897 | c-Pr | H | Me | F | $CH_2CH_2CH_2CH_2CH_2CH_2Cl$ | O |
| A-3898 | c-Pr | H | Me | F | $CH_2CH_2CH_2CH_2CH_2CH_2Br$ | O |
| A-3899 | c-Pr | H | Me | F | $CH_2CH_2CH_2CH_2CH_2CH_2CH_2Cl$ | O |
| A-3900 | c-Pr | H | Me | F | $CH_2CH_2CH_2CH_2CH_2CH_2CH_2Br$ | O |
| A-3901 | c-Pr | H | Me | F | $CH_2CH_2CH_2CH_2CH_2CH_2CH_2CH_2Br$ | O |
| A-3902 | c-Pr | H | Me | F | $CH_2CH(Me)CH_2Cl$ | O |
| A-3903 | c-Pr | H | Me | F | $CH_2CH(Me)CH_2Br$ | O |
| A-3904 | c-Pr | H | Me | F | $CH_2CH_2CH(Me)CH_2CH_2Cl$ | O |
| A-3905 | c-Pr | H | Me | F | $CH_2CH_2CH(Me)CH_2CH_2Br$ | O |
| A-3906 | c-Pr | H | Me | F | $CH_2CH_2CF=CF_2$ | O |
| A-3907 | c-Pr | H | Me | F | $CH_2CH=C(Cl)CF_3$ | O |
| A-3908 | c-Pr | H | Me | F | $CH_2CH_2CH_2CF=CF_2$ | O |
| A-3909 | c-Pr | H | Me | F | $CH_2CH_2CH_2CH_2CF=CF_2$ | O |
| A-3910 | c-Pr | H | Me | F | $CH_2CH_2CH_2CH_2CH_2CF=CF_2$ | O |

TABLE 90

| Compound Number | $R^1$ | $R^2$ | $R^3$ | $R^4$ | $R^5$ | A |
|---|---|---|---|---|---|---|
| A-3911 | c-Pr | H | Me | F | $CH_2$(t-Bu) | O |
| A-3912 | c-Pr | H | Me | F | $CH_2CH_2$(t-Bu) | O |
| A-3913 | c-Pr | H | Me | F | $CH_2CH_2CH_2$(t-Bu) | O |
| A-3914 | c-Pr | H | Me | F | $CH_2CH_2CH_2CH_2$(t-Bu) | O |
| A-3915 | c-Pr | H | Me | F | $CH_2CH_2CH_2CH_2CH_2$(t-Bu) | O |
| A-3916 | c-Pr | H | Me | F | $CH_2CH_2CH_2CH_2CH_2CH_2$(t-Bu) | O |
| A-3917 | c-Pr | H | Me | F | $CH_2CF_3$ | O |
| A-3918 | c-Pr | H | Me | F | $CH_2CH_2CF_3$ | O |
| A-3919 | c-Pr | H | Me | F | $CH_2CH_2CH_2CF_3$ | O |
| A-3920 | c-Pr | H | Me | F | $CH_2CH_2CH_2CH_2CF_3$ | O |
| A-3921 | c-Pr | H | Me | F | $CH_2CH_2CH_2CH_2CH_2CF_3$ | O |
| A-3922 | c-Pr | H | Me | F | $CH_2CH_2CH_2CH_2CH_2CH_2CF_3$ | O |
| A-3923 | c-Pr | H | Me | F | $CH_2CH_2CH_2CH_2CH_2CH_2CH_2CF_3$ | O |
| A-3924 | c-Pr | H | Me | F | $CH_2CF_2CF_3$ | O |
| A-3925 | c-Pr | H | Me | F | $CF_2CHFCF_3$ | O |
| A-3926 | c-Pr | H | Me | F | $CF_2CF_2CF_3$ | O |
| A-3927 | c-Pr | H | Me | F | $CH_2CF_2CF_2CF_3$ | O |
| A-3928 | c-Pr | H | Me | F | $CH_2CF_2CF_2CF_2CF_3$ | O |
| A-3929 | c-Pr | H | Me | F | $CH_2CF_2CF_2CF_2CHF_2$ | O |
| A-3930 | c-Pr | H | Me | F | $CH(CF_3)CF_3$ | O |
| A-3931 | c-Pr | H | Me | F | $CH_2CF(CF_3)CF_3$ | O |
| A-3932 | c-Pr | H | Me | F | $CH_2CF_2CF(CF_3)CF_3$ | O |
| A-3933 | c-Pr | H | Me | F | $CH_2CF(CF_3)CF_2CF_3$ | O |
| A-3934 | c-Pr | H | Me | F | $CH_2CF_2CF_2CF(CF_3)CF_3$ | O |

TABLE 90-continued

| Compound Number | $R^1$ | $R^2$ | $R^3$ | $R^4$ | $R^5$ | A |
|---|---|---|---|---|---|---|
| A-3935 | c-Pr | H | Me | F | $CH_2CF_2CF(CF_3)CF_2CF_3$ | O |
| A-3936 | c-Pr | H | Me | F | $CH_2CF(CF_3)CF_2CF_2CF_3$ | O |
| A-3937 | c-Pr | H | Me | F | $CH_2$(c-Pr) | O |
| A-3938 | c-Pr | H | Me | F | $CH_2$[c-Pr(1-Me)] | O |
| A-3939 | c-Pr | H | Me | F | $CH_2$[c-Pr(1-Ph)] | O |
| A-3940 | c-Pr | H | Me | F | $CH_2$[c-Pr(1-$NH_2$)] | O |
| A-3941 | c-Pr | H | Me | F | $CH_2$[c-Pr(1-NHC(=O)O(t-Bu)] | O |
| A-3942 | c-Pr | H | Me | F | $CH_2${c-Pr[1-NHS(=O)$_2CF_3$]} | O |
| A-3943 | c-Pr | H | Me | F | $CH_2${c-Pr[1-Ph(4-$CF_3$)]} | O |
| A-3944 | c-Pr | H | Me | F | $CH_2${c-Pr[1-Ph(3,4,5-$F_3$)]} | O |
| A-3945 | c-Pr | H | Me | F | $CH_2${c-Hex[4-(t-Bu)]} | O |
| A-3946 | c-Pr | H | Me | F | $CH_2$[c-Hex(4-$CF_3$)] | O |
| A-3947 | c-Pr | H | Me | F | $CH_2CH_2$(c-Pr) | O |
| A-3948 | c-Pr | H | Me | F | $CH_2CH_2$(c-Hex) | O |
| A-3949 | c-Pr | H | Me | F | $CH_2CH_2$[c-Hex(4-$CF_3$)] | O |
| A-3950 | c-Pr | H | Me | F | $CH_2CH_2$[c-Hex(4-$SCF_3$)] | O |
| A-3951 | c-Pr | H | Me | F | $CH_2CH_2CH_2$(c-Pr) | O |
| A-3952 | c-Pr | H | Me | F | $CH_2CH_2CH_2$(c-Hex) | O |
| A-3953 | c-Pr | H | Me | F | $CH_2CH_2CH_2${c-Hex[4-(t-Bu)]} | O |
| A-3954 | c-Pr | H | Me | F | $CH_2CH_2CH_2$[c-Hex(4-$CF_3$)] | O |

TABLE 91

| Compound Number | $R^1$ | $R^2$ | $R^3$ | $R^4$ | $R^5$ | A |
|---|---|---|---|---|---|---|
| A-3955 | c-Pr | H | Me | F | $CH_2CH_2CH_2$[c-Hex(4-$SCF_3$)] | O |
| A-3956 | c-Pr | H | Me | F | $CH_2CH_2CH_2CH_2$(c-Pr) | O |
| A-3957 | c-Pr | H | Me | F | $CH_2CH_2CH_2CH_2$(c-Hex) | O |
| A-3958 | c-Pr | H | Me | F | $CH_2CH_2CH_2CH_2$[c-Hex(4-$CF_3$)] | O |
| A-3959 | c-Pr | H | Me | F | $CH_2$[c-Pr(2,2-$F_2$)] | O |
| A-3960 | c-Pr | H | Me | F | $CH_2$[c-Hex(4,4-$F_2$)] | O |
| A-3961 | c-Pr | H | Me | F | $CH_2CH_2$[c-Pr(2,2-$F_2$)] | O |
| A-3962 | c-Pr | H | Me | F | $CH_2CH_2$[c-Hex(4,4-$F_2$)] | O |
| A-3963 | c-Pr | H | Me | F | $CH_2CH_2CH_2$[c-Pr(2,2-$F_2$)] | O |
| A-3964 | c-Pr | H | Me | F | $CH_2CH_2CH_2CH_2$[c-Pr(2,2-$F_2$)] | O |
| A-3965 | c-Pr | H | Me | F | $CH_2CH_2OH$ | O |
| A-3966 | c-Pr | H | Me | F | $CH_2CH_2CH_2OH$ | O |
| A-3967 | c-Pr | H | Me | F | $CH_2CH_2CH_2CH_2OH$ | O |
| A-3968 | c-Pr | H | Me | F | $CH_2CH_2CH_2CH_2CH_2OH$ | O |
| A-3969 | c-Pr | H | Me | F | $CH_2CH_2CH_2CH_2CH_2CH_2OH$ | O |
| A-3970 | c-Pr | H | Me | F | $CH_2C$(═O)Me | O |
| A-3971 | c-Pr | H | Me | F | $CH_2CH$(OH)Me | O |
| A-3972 | c-Pr | H | Me | F | $CH_2CH(OH)CF_3$ | O |
| A-3973 | c-Pr | H | Me | F | $CH_2C(OH)_2CF_3$ | O |
| A-3974 | c-Pr | H | Me | F | $CH_2C(CF_3)$═NOH | O |
| A-3975 | c-Pr | H | Me | F | $CH_2C(CF_3)$═NOMe | O |
| A-3976 | c-Pr | H | Me | F | $CH_2CH(CF_3)NH_2$ | O |
| A-3977 | c-Pr | H | Me | F | $CH_2CH_2OMe$ | O |
| A-3978 | c-Pr | H | Me | F | $CH_2CH_2CH_2OMe$ | O |
| A-3979 | c-Pr | H | Me | F | $CH_2CH_2CH_2CH_2OMe$ | O |
| A-3980 | c-Pr | H | Me | F | $CH_2CH_2CH_2CH_2CH_2OMe$ | O |
| A-3981 | c-Pr | H | Me | F | $CH_2CH_2CH_2CH_2CH_2CH_2OMe$ | O |
| A-3982 | c-Pr | H | Me | F | $CH_2CH_2OCHF_2$ | O |
| A-3983 | c-Pr | H | Me | F | $CH_2CH_2CH_2OCHF_2$ | O |
| A-3984 | c-Pr | H | Me | F | $CH_2CH_2CH_2CH_2OCHF_2$ | O |
| A-3985 | c-Pr | H | Me | F | $CH_2CH_2CH_2CH_2CH_2OCHF_2$ | O |
| A-3986 | c-Pr | H | Me | F | $CH_2CH_2CH_2CH_2CH_2CH_2OCHF_2$ | O |
| A-3987 | c-Pr | H | Me | F | $CH_2CH_2OCH_2CF_3$ | O |
| A-3988 | c-Pr | H | Me | F | $CH_2CH_2CH_2OCH_2CF_3$ | O |
| A-3989 | c-Pr | H | Me | F | $CH_2CH_2CH_2CH_2OCH_2CF_3$ | O |
| A-3990 | c-Pr | H | Me | F | $CH_2CH_2CH_2CH_2CH_2OCH_2CF_3$ | O |
| A-3991 | c-Pr | H | Me | F | $CH_2CH_2CH_2CH_2CH_2CH_2OCH_2CF_3$ | O |
| A-3992 | c-Pr | H | Me | F | $CH_2CH_2CH_2CH_2CH_2CH_2CH_2OCH_2CF_3$ | O |
| A-3993 | c-Pr | H | Me | F | $CH_2CH_2OC(CF_3)_3$ | O |
| A-3994 | c-Pr | H | Me | F | $CH_2CH_2CH_2OC(CF_3)_3$ | O |
| A-3995 | c-Pr | H | Me | F | $CH_2CH_2CH_2CH_2OC(CF_3)_3$ | O |
| A-3996 | c-Pr | H | Me | F | $CH_2CH_2CH_2CH_2CH_2OC(CF_3)_3$ | O |
| A-3997 | c-Pr | H | Me | F | $CF_2CHFOCF_2CF_2CF_3$ | O |
| A-3998 | c-Pr | H | Me | F | $CH_2CH_2O$(c-Pr) | O |

TABLE 92

| Compound Number | $R^1$ | $R^2$ | $R^3$ | $R^4$ | $R^5$ | A |
|---|---|---|---|---|---|---|
| A-3999 | c-Pr | H | Me | F | $CH_2CH_2O$(c-Pen) | O |
| A-4000 | c-Pr | H | Me | F | $CH_2CH_2O$(c-Hex) | O |
| A-4001 | c-Pr | H | Me | F | $CH_2CH_2CH_2O$(c-Pr) | O |
| A-4002 | c-Pr | H | Me | F | $CH_2CH_2CH_2O$(c-Pen) | O |
| A-4003 | c-Pr | H | Me | F | $CH_2CH_2CH_2O$(c-Hex) | O |
| A-4004 | c-Pr | H | Me | F | $CH_2CH_2CH_2CH_2O$(c-Pr) | O |
| A-4005 | c-Pr | H | Me | F | $CH_2CH_2CH_2CH_2O$(c-Pen) | O |
| A-4006 | c-Pr | H | Me | F | $CH_2CH_2CH_2CH_2O$(c-Hex) | O |
| A-4007 | c-Pr | H | Me | F | $CH_2CH_2O$[c-Pr(2,2-$F_2$)] | O |
| A-4008 | c-Pr | H | Me | F | $CH_2CH_2CH_2O$[c-Pr(2,2-$F_2$)] | O |
| A-4009 | c-Pr | H | Me | F | $CH_2CH_2CH_2CH_2O$[c-Pr(2,2-$F_2$)] | O |
| A-4010 | c-Pr | H | Me | F | $CH_2CH_2OCH_2CH_2OCH_3$ | O |
| A-4011 | c-Pr | H | Me | F | $CH_2CH_2OCH_2CH_2OCH_2CF_3$ | O |
| A-4012 | c-Pr | H | Me | F | $CH_2CF_2OCF_2CF_2OCF_3$ | O |
| A-4013 | c-Pr | H | Me | F | $CF_2CHFOCF_2CF_2OCF_3$ | O |
| A-4014 | c-Pr | H | Me | F | $CF_2CHFOCF_2CF(CF_3)OCF_2CF_2CF_3$ | O |
| A-4015 | c-Pr | H | Me | F | $CH_2CH_2SH$ | O |
| A-4016 | c-Pr | H | Me | F | $CH_2CH_2CH_2SH$ | O |
| A-4017 | c-Pr | H | Me | F | $CH_2CH_2CH_2CH_2SH$ | O |
| A-4018 | c-Pr | H | Me | F | $CH_2CH_2CH_2CH_2CH_2SH$ | O |
| A-4019 | c-Pr | H | Me | F | $CH_2CH_2CH_2CH_2CH_2CH_2SH$ | O |
| A-4020 | c-Pr | H | Me | F | $CH_2CH$(SH)Me | O |
| A-4021 | c-Pr | H | Me | F | $CH_2CH$[SC(═O)Me]Me | O |

TABLE 92-continued

| Compound Number | $R^1$ | $R^2$ | $R^3$ | $R^4$ | $R^5$ | A |
|---|---|---|---|---|---|---|
| A-4022 | c-Pr | H | Me | F | $CH_2CH_2S$(t-Bu) | O |
| A-4023 | c-Pr | H | Me | F | $CH_2CH_2CH_2S$(t-Bu) | O |
| A-4024 | c-Pr | H | Me | F | $CH_2CH_2CH_2CH_2S$(t-Bu) | O |
| A-4025 | c-Pr | H | Me | F | $CH_2CH_2CH_2CH_2CH_2SCH_3$ | O |
| A-4026 | c-Pr | H | Me | F | $CH_2CH_2CH_2CH_2CH_2SCH(CH_3)_2$ | O |
| A-4027 | c-Pr | H | Me | F | $CH_2CH_2CH_2CH_2CH_2S$(t-Bu) | O |
| A-4028 | c-Pr | H | Me | F | $CH_2CH_2CH_2CH_2CH_2CH_2SCH(CH_3)_2$ | O |
| A-4029 | c-Pr | H | Me | F | $CH_2CH_2CH_2CH_2CH_2CH_2S$(t-Bu) | O |
| A-4030 | c-Pr | H | Me | F | $CH_2CH_2CH_2CH_2CH_2CH_2CH_2S$(t-Bu) | O |
| A-4031 | c-Pr | H | Me | F | $CH_2CH_2SCHF_2$ | O |
| A-4032 | c-Pr | H | Me | F | $CH_2CH_2CH_2SCHF_2$ | O |
| A-4033 | c-Pr | H | Me | F | $CH_2CH_2CH_2CH_2SCHF_2$ | O |
| A-4034 | c-Pr | H | Me | F | $CH_2CH_2CH_2CH_2CH_2SCHF_2$ | O |
| A-4035 | c-Pr | H | Me | F | $CH_2CH_2CH_2CH_2CH_2SCHF_2$ | O |
| A-4036 | c-Pr | H | Me | F | $CH_2CH_2CH_2CH_2CH_2CH_2SCHF_2$ | O |
| A-4037 | c-Pr | H | Me | F | $CH_2CH_2CH_2CH_2CH_2CH_2CH_2SCHF_2$ | O |
| A-4038 | c-Pr | H | Me | F | $CH_2CH_2SCH_2CF_3$ | O |
| A-4039 | c-Pr | H | Me | F | $CH_2CH_2CH_2SCH_2CF_3$ | O |
| A-4040 | c-Pr | H | Me | F | $CH_2CH_2CH_2CH_2SCH_2CF_3$ | O |
| A-4041 | c-Pr | H | Me | F | $CH_2CH_2CH_2CH_2CH_2SCH_2CF_3$ | O |
| A-4042 | c-Pr | H | Me | F | $CH_2CH_2CH_2CH_2CH_2CH_2SCH_2CF_3$ | O |

TABLE 93

| Compound Number | $R^1$ | $R^2$ | $R^3$ | $R^4$ | $R^5$ | A |
|---|---|---|---|---|---|---|
| A-4043 | c-Pr | H | Me | F | $CH_2CH_2CH_2CH_2CH_2CH_2CH_2SCH_2CF_3$ | O |
| A-4044 | c-Pr | H | Me | F | $CH_2CH(Me)SCH_2CF_3$ | O |
| A-4045 | c-Pr | H | Me | F | $CH_2CH_2SCH(CF_3)_2$ | O |
| A-4046 | c-Pr | H | Me | F | $CH_2CH_2CH_2SCH(CF_3)_2$ | O |
| A-4047 | c-Pr | H | Me | F | $CH_2CH_2CH_2CH_2SCH(CF_3)_2$ | O |
| A-4048 | c-Pr | H | Me | F | $CH_2CH_2CH_2CH_2CH_2SCH(CF_3)_2$ | O |
| A-4049 | c-Pr | H | Me | F | $CH_2CH_2CH_2CH_2CH_2CH_2SCH(CF_3)_2$ | O |
| A-4050 | c-Pr | H | Me | F | $CH_2CH_2CH_2CH_2CH_2SCF_2CF_3$ | O |
| A-4051 | c-Pr | H | Me | F | $CH_2CH_2CH_2CH_2CH_2CH_2SCF_2CF_3$ | O |
| A-4052 | c-Pr | H | Me | F | $CH_2CH_2CH_2CH_2CH_2CH_2SCF(CF_3)_2$ | O |
| A-4053 | c-Pr | H | Me | F | $CH_2CH_2CH_2CH_2CH_2CH_2CH_2SCF(CF_3)_2$ | O |
| A-4054 | c-Pr | H | Me | F | $CH_2CH_2CH_2CH_2CH_2SCCl_3$ | O |
| A-4055 | c-Pr | H | Me | F | $CH_2CH_2CH_2CH_2CH_2CH_2SCCl_3$ | O |
| A-4056 | c-Pr | H | Me | F | $CH_2CH_2SCH_2CH{=}CH_2$ | O |
| A-4057 | c-Pr | H | Me | F | $CH_2CH_2CH_2SCH_2CH{=}CH_2$ | O |
| A-4058 | c-Pr | H | Me | F | $CH_2CH_2CH_2CH_2SCH_2CH{=}CH_2$ | O |
| A-4059 | c-Pr | H | Me | F | $CH_2CH_2SCF{=}CFCF_3$ | O |
| A-4060 | c-Pr | H | Me | F | $CH_2CH_2CH_2SCF{=}CFCF_3$ | O |
| A-4061 | c-Pr | H | Me | F | $CH_2CH_2CH_2CH_2SCF{=}CFCF_3$ | O |
| A-4062 | c-Pr | H | Me | F | $CH_2CH_2CH_2S$(c-Pr) | O |
| A-4063 | c-Pr | H | Me | F | $CH_2CH_2CH_2S$(c-Hex) | O |
| A-4064 | c-Pr | H | Me | F | $CH_2CH_2CH_2CH_2S$(c-Pr) | O |
| A-4065 | c-Pr | H | Me | F | $CH_2CH_2CH_2CH_2S$(c-Hex) | O |
| A-4066 | c-Pr | H | Me | F | $CH_2CH_2CH_2CH_2CH_2S$(c-Pr) | O |
| A-4067 | c-Pr | H | Me | F | $CH_2CH_2CH_2CH_2CH_2S$(c-Hex) | O |
| A-4068 | c-Pr | H | Me | F | $CH_2CH_2CH_2S$[c-Hex(4,4-$F_2$)] | O |
| A-4069 | c-Pr | H | Me | F | $CH_2CH_2CH_2CH_2S$[c-Hex(4,4-$F_2$)] | O |
| A-4070 | c-Pr | H | Me | F | $CH_2CH_2CH_2CH_2CH_2S$[c-Hex(4,4-$F_2$)] | O |
| A-4071 | c-Pr | H | Me | F | $CH_2CH_2CH_2SCH_2$(c-Pr) | O |
| A-4072 | c-Pr | H | Me | F | $CH_2CH_2CH_2SCH_2$(c-Hex) | O |
| A-4073 | c-Pr | H | Me | F | $CH_2CH_2CH_2CH_2SCH_2$(c-Pr) | O |
| A-4074 | c-Pr | H | Me | F | $CH_2CH_2CH_2CH_2SCH_2$(c-Hex) | O |
| A-4075 | c-Pr | H | Me | F | $CH_2CH_2CH_2CH_2CH_2SCH_2$(c-Pr) | O |
| A-4076 | c-Pr | H | Me | F | $CH_2CH_2CH_2CH_2CH_2SCH_2$(c-Hex) | O |
| A-4077 | c-Pr | H | Me | F | $CH_2CH_2CH_2SCH_2$[c-Hex(4,4-$F_2$)] | O |
| A-4078 | :- Pr | H | Me | F | $CH_2CH_2CH_2CH_2SCH_2$[c-Hex(4,4-$F_2$)] | O |
| A-4079 | c-Pr | H | Me | F | $CH_2CH_2CH_2CH_2CH_2SCH_2$[c-Hex(4,4-$F_2$)] | O |
| A-4080 | c-Pr | H | Me | F | $CH_2CH_2CH_2SCH_2SiMe_3$ | O |
| A-4081 | c-Pr | H | Me | F | $CH_2CH_2CH_2CH_2SCH_2SiMe_3$ | O |
| A-4082 | c-Pr | H | Me | F | $CH_2CH_2CH_2CH_2CH_2SCH_2SiMe_3$ | O |
| A-4083 | c-Pr | H | Me | F | $CH_2CH_2OCH_2CH_2SCH_3$ | O |
| A-4084 | c-Pr | H | Me | F | $CH_2CH_2OCH_2CH_2SCHF_2$ | O |
| A-4085 | c-Pr | H | Me | F | $CH_2CH_2OCH_2CH_2SCF_3$ | O |
| A-4086 | c-Pr | H | Me | F | $CH_2CH_2OCH_2CH_2SCH_2CF_3$ | O |

TABLE 94

| Compound Number | $R^1$ | $R^2$ | $R^3$ | $R^4$ | $R^5$ | A |
|---|---|---|---|---|---|---|
| A-4087 | c-Pr | H | Me | F | $CH_2CH_2CH_2S(=O)(t\text{-}Bu)$ | O |
| A-4088 | c-Pr | H | Me | F | $CH_2CH_2CH_2CH_2S(=O)(t\text{-}Bu)$ | O |
| A-4089 | c-Pr | H | Me | F | $CH_2CH_2CH_2CH_2CH_2CH_2S(=O)(t\text{-}Bu)$ | O |
| A-4090 | c-Pr | H | Me | F | $CH_2CH_2S(=O)CHF_2$ | O |
| A-4091 | c-Pr | H | Me | F | $CH_2CH_2CH_2S(=O)CHF_2$ | O |
| A-4092 | c-Pr | H | Me | F | $CH_2CH_2CH_2CH_2S(=O)CHF_2$ | O |
| A-4093 | c-Pr | H | Me | F | $CH_2CH_2CH_2CH_2CH_2S(=O)CHF_2$ | O |
| A-4094 | c-Pr | H | Me | F | $CH_2CH_2CH_2CH_2CH_2CH_2S(=O)CHF_2$ | O |
| A-4095 | c-Pr | H | Me | F | $CH_2CH_2CH_2CH_2CH_2CH_2CH_2S(=O)CHF_2$ | O |
| A-4096 | c-Pr | H | Me | F | $CH_2CH_2S(=O)CF_3$ | O |
| A-4097 | c-Pr | H | Me | F | $CH_2CH_2CH_2S(=O)CF_3$ | O |
| A-4098 | c-Pr | H | Me | F | $CH_2CH_2CH_2CH_2S(=O)CF_3$ | O |
| A-4099 | c-Pr | H | Me | F | $CH_2CH_2CH_2CH_2CH_2S(=O)CF_3$ | O |
| A-4100 | c-Pr | H | Me | F | $CH_2CH_2CH_2CH_2CH_2CH_2S(=O)CF_3$ | O |
| A-4101 | c-Pr | H | Me | F | $CH_2CH_2CH_2CH_2CH_2CH_2CH_2S(=O)CF_3$ | O |
| A-4102 | c-Pr | H | Me | F | $CH_2CH_2S(=O)CH_2CF_3$ | O |
| A-4103 | c-Pr | H | Me | F | $CH_2CH_2CH_2S(=O)CH_2CF_3$ | O |
| A-4104 | c-Pr | H | Me | F | $CH_2CH_2CH_2CH_2S(=O)CH_2CF_3$ | O |
| A-4105 | c-Pr | H | Me | F | $CH_2CH_2CH_2CH_2CH_2S(=O)CH_2CF_3$ | O |
| A-4106 | c-Pr | H | Me | F | $CH_2CH_2CH_2CH_2CH_2CH_2S(=O)CH_2CF_3$ | O |
| A-4107 | c-Pr | H | Me | F | $CH_2CH_2CH_2CH_2CH_2CH_2CH_2S(=O)CH_2CF_3$ | O |
| A-4108 | c-Pr | H | Me | F | $CH_2CH(Me)S(=O)CH_2CF_3$ | O |
| A-4109 | c-Pr | H | Me | F | $CH_2CH_2CH_2S(=O)(c\text{-}Pr)$ | O |
| A-4110 | c-Pr | H | Me | F | $CH_2CH_2CH_2CH_2S(=O)(c\text{-}Pr)$ | O |
| A-4111 | c-Pr | H | Me | F | $CH_2CH_2CH_2CH_2S(=O)(c\text{-}Pen)$ | O |
| A-4112 | c-Pr | H | Me | F | $CH_2CH_2CH_2CH_2S(=O)(c\text{-}Hex)$ | O |
| A-4113 | c-Pr | H | Me | F | $CH_2CH_2CH_2CH_2CH_2S(=O)(c\text{-}Pr)$ | O |
| A-4114 | c-Pr | H | Me | F | $CH_2CH_2CH_2CH_2CH_2S(=O)(c\text{-}Hex)$ | O |
| A-4115 | c-Pr | H | Me | F | $CH_2CH_2CH_2S(=O)[c\text{-}Hex(4,4\text{-}F_2)]$ | O |
| A-4116 | c-Pr | H | Me | F | $CH_2CH_2CH_2CH_2S(=O)[c\text{-}Hex(4,4\text{-}F_2)]$ | O |
| A-4117 | c-Pr | H | Me | F | $CH_2CH_2CH_2CH_2CH_2S(=O)[c\text{-}Hex(4,4\text{-}F_2)]$ | O |
| A-4118 | c-Pr | H | Me | F | $CH_2CH_2CH_2CH_2S(=O)_2Me$ | O |
| A-4119 | c-Pr | H | Me | F | $CH_2CH_2CH_2CH_2CH_2S(=O)_2Me$ | O |
| A-4120 | c-Pr | H | Me | F | $CH_2CH_2CH_2CH_2CH_2S(=O)_2(t\text{-}Bu)$ | O |
| A-4121 | c-Pr | H | Me | F | $CH_2CH_2S(=O)_2CHF_2$ | O |
| A-4122 | c-Pr | H | Me | F | $CH_2CH_2CH_2S(=O)_2CHF_2$ | O |
| A-4123 | c-Pr | H | Me | F | $CH_2CH_2CH_2CH_2S(=O)_2CHF_2$ | O |
| A-4124 | c-Pr | H | Me | F | $CH_2CH_2CH_2CH_2CH_2S(=O)_2CHF_2$ | O |
| A-4125 | c-Pr | H | Me | F | $CH_2CH_2CH_2CH_2CH_2CH_2S(=O)_2CHF_2$ | O |
| A-4126 | c-Pr | H | Me | F | $CH_2CH_2S(=O)_2CF_3$ | O |
| A-4127 | c-Pr | H | Me | F | $CH_2CH_2CH_2S(=O)_2CF_3$ | O |
| A-4128 | c-Pr | H | Me | F | $CH_2CH_2CH_2CH_2S(=O)_2CF_3$ | O |
| A-4129 | c-Pr | H | Me | F | $CH_2CH_2CH_2CH_2CH_2S(=O)_2CF_3$ | O |
| A-4130 | c-Pr | H | Me | F | $CH_2CH_2CH_2CH_2CH_2CH_2S(=O)_2CF_3$ | O |

TABLE 95

| Compound Number | $R^1$ | $R^2$ | $R^3$ | $R^4$ | $R^5$ | A |
|---|---|---|---|---|---|---|
| A-4131 | c-Pr | H | Me | F | $CH_2CH_2CH_2CH_2CH_2CH_2CH_2S(=O)_2CF_3$ | O |
| A-4132 | c-Pr | H | Me | F | $CH_2CH_2CH_2CH_2CH_2CH_2CH_2CH_2S(=O)_2CF_3$ | O |
| A-4133 | c-Pr | H | Me | F | $CH_2CH_2S(=O)_2CH_2CF_3$ | O |
| A-4134 | c-Pr | H | Me | F | $CH_2CH_2CH_2S(=O)_2CH_2CF_3$ | O |
| A-4135 | c-Pr | H | Me | F | $CH_2CH_2CH_2CH_2S(=O)_2CH_2CF_3$ | O |
| A-4136 | c-Pr | H | Me | F | $CH_2CH_2CH_2CH_2CH_2S(=O)_2CH_2CF_3$ | O |
| A-4137 | c-Pr | H | Me | F | $CH_2CH_2CH_2CH_2CH_2CH_2S(=O)_2CH_2CF_3$ | O |
| A-4138 | c-Pr | H | Me | F | $CH_2CH(Me)S(=O)_2CH_2CF_3$ | O |
| A-4139 | c-Pr | H | Me | F | $CH_2CH_2CH_2S(=O)_2(c\text{-}Pr)$ | O |
| A-4140 | c-Pr | H | Me | F | $CH_2CH_2CH_2CH_2S(=O)_2(c\text{-}Pr)$ | O |
| A-4141 | c-Pr | H | Me | F | $CH_2CH_2CH_2CH_2CH_2S(=O)_2(c\text{-}Pr)$ | O |
| A-4142 | c-Pr | H | Me | F | $CH_2CH_2CH_2S(=O)_2[c\text{-}Hex(4,4\text{-}F_2)]$ | O |
| A-4143 | c-Pr | H | Me | F | $CH_2CH_2CH_2CH_2S(=O)_2[c\text{-}Hex(4,4\text{-}F_2)]$ | O |
| A-4144 | c-Pr | H | Me | F | $CH_2CH_2CH_2CH_2CH_2S(=O)_2[c\text{-}Hex(4,4\text{-}F_2)]$ | O |
| A-4145 | c-Pr | H | Me | F | $CH_2CH_2CH_2C(=O)H$ | O |
| A-4146 | c-Pr | H | Me | F | $CH_2CH_2CH_2CH_2C(=O)H$ | O |
| A-4147 | c-Pr | H | Me | F | $CH_2CH_2CH_2CH_2CH_2C(=O)H$ | O |
| A-4148 | c-Pr | H | Me | F | $CH_2CH_2CH_2C(=O)(t\text{-}Bu)$ | O |
| A-4149 | c-Pr | H | Me | F | $CH_2CH_2CH_2CH_2C(=O)(t\text{-}Bu)$ | O |
| A-4150 | c-Pr | H | Me | F | $CH_2CH_2CH_2CH_2CH_2C(=O)(t\text{-}Bu)$ | O |
| A-4151 | c-Pr | H | Me | F | $CH_2CH_2CH_2C(=O)CF_3$ | O |

TABLE 95-continued

| Compound Number | $R^1$ | $R^2$ | $R^3$ | $R^4$ | $R^5$ | A |
|---|---|---|---|---|---|---|
| A-4152 | c-Pr | H | Me | F | $CH_2CH_2CH_2CH_2C(=O)CF_3$ | O |
| A-4153 | c-Pr | H | Me | F | $CH_2CH_2CH_2CH_2CH_2C(=O)CF_3$ | O |
| A-4154 | c-Pr | H | Me | F | $CH_2C(=O)Ph$ | O |
| A-4155 | c-Pr | H | Me | F | $CH_2C(=O)Ph(4-Cl)$ | O |
| A-4156 | c-Pr | H | Me | F | $CH_2C(=O)Ph(4-CF_3)$ | O |
| A-4157 | c-Pr | H | Me | F | $CH_2CH_2C(=O)Ph(4-CF_3)$ | O |
| A-4158 | c-Pr | H | Me | F | $CH_2CH_2CH_2C(=O)Ph(4-CF_3)$ | O |
| A-4159 | c-Pr | H | Me | F | $CH_2CH_2CH_2CH_2C(=O)Ph(4-CF_3)$ | O |
| A-4160 | c-Pr | H | Me | F | $CH_2CH_2CH_2CH_2CH_2C(=O)Ph(4-CF_3)$ | O |
| A-4161 | c-Pr | H | Me | F | $CH_2C(=O)OEt$ | O |
| A-4162 | c-Pr | H | Me | F | $CH_2CH_2C(=O)O(t-Bu)$ | O |
| A-4163 | c-Pr | H | Me | F | $CH_2CH_2CH_2C(=O)OEt$ | O |
| A-4164 | c-Pr | H | Me | F | $CH_2CH_2CH_2C(=O)O(t-Bu)$ | O |
| A-4165 | c-Pr | H | Me | F | $CH_2CH_2CH_2CH_2C(=O)O(t-Bu)$ | O |
| A-4166 | c-Pr | H | Me | F | $CH_2CH_2CH_2CH_2CH_2C(=O)O(t-Bu)$ | O |
| A-4167 | c-Pr | H | Me | F | $CH_2CH_2CH_2CH_2CH_2CH_2C(=O)O(t-Bu)$ | O |
| A-4168 | c-Pr | H | Me | F | $CH_2CH_2CH_2CH_2CH_2CH_2CH_2C(=O)OEt$ | O |
| A-4169 | c-Pr | H | Me | F | $CH_2CH_2C(=O)OCH_2CF_3$ | O |
| A-4170 | c-Pr | H | Me | F | $CH_2CH_2CH_2C(=O)OCH_2CF_3$ | O |
| A-4171 | c-Pr | H | Me | F | $CH_2CH_2CH_2CH_2C(=O)OCH_2CF_3$ | O |
| A-4172 | c-Pr | H | Me | F | $CH_2CH_2CH_2CH_2CH_2C(=O)OCH_2CF_3$ | O |
| A-4173 | c-Pr | H | Me | F | $CH_2CH_2C(=O)NH(t-Bu)$ | O |
| A-4174 | c-Pr | H | Me | F | $CH_2CH_2CH_2C(=O)NH(t-Bu)$ | O |

TABLE 96

| Compound Number | $R^1$ | $R^2$ | $R^3$ | $R^4$ | $R^5$ | A |
|---|---|---|---|---|---|---|
| A-4175 | c-Pr | H | Me | F | $CH_2CH_2CH_2C(=O)NH(t-Pen)$ | O |
| A-4176 | c-Pr | H | Me | F | $CH_2CH_2CH_2CH_2C(=O)NH(t-Bu)$ | O |
| A-4177 | c-Pr | H | Me | F | $CH_2CH_2C(=O)NHCH_2CF_3$ | O |
| A-4178 | c-Pr | H | Me | F | $CH_2CH_2CH_2C(=O)NHCH_2CF_3$ | O |
| A-4179 | c-Pr | H | Me | F | $CH_2CH_2CH_2CH_2C(=O)NHCH_2CF_3$ | O |
| A-4180 | c-Pr | H | Me | F | $CH_2CH_2SC(=O)N(Me)_2$ | O |
| A-4181 | c-Pr | H | Me | F | $CH_2CH_2CH_2SC(=O)N(Me)_2$ | O |
| A-4182 | c-Pr | H | Me | F | $CH_2CH_2CH_2SC(=O)NH(t-Bu)$ | O |
| A-4183 | c-Pr | H | Me | F | $CH_2CH_2CH_2CH_2CH_2SC(=O)NH(t-Bu)$ | O |
| A-4184 | c-Pr | H | Me | F | $CH_2CH_2SC(=O)NHCH_2CF_3$ | O |
| A-4185 | c-Pr | H | Me | F | $CH_2CH_2CH_2SC(=O)NHCH_2CF_3$ | O |
| A-4186 | c-Pr | H | Me | F | $CH_2CH_2CH_2CH_2SC(=O)NHCH_2CF_3$ | O |
| A-4187 | c-Pr | H | Me | F | $CH_2CH_2CH_2OC(=O)H$ | O |
| A-4188 | c-Pr | H | Me | F | $CH_2CH_2CH_2CH_2OC(=O)H$ | O |
| A-4189 | c-Pr | H | Me | F | $CH_2CH_2CH_2CH_2CH_2OC(=O)H$ | O |
| A-4190 | c-Pr | H | Me | F | $CH_2CH_2CH_2OC(=O)Me$ | O |
| A-4191 | c-Pr | H | Me | F | $CH_2CH_2CH_2CH_2OC(=O)Me$ | O |
| A-4192 | c-Pr | H | Me | F | $CH_2CH_2CH_2CH_2CH_2OC(=O)Me$ | O |
| A-4193 | c-Pr | H | Me | F | $CH_2CH_2OC(=O)CF_3$ | O |
| A-4194 | c-Pr | H | Me | F | $CH_2CH_2CH_2OC(=O)CF_3$ | O |
| A-4195 | c-Pr | H | Me | F | $CH_2CH_2CH_2CH_2OC(=O)CF_3$ | O |
| A-4196 | c-Pr | H | Me | F | $CH_2CH_2CH_2CH_2CH_2OC(=O)Ph(4-CF_3)$ | O |
| A-4197 | c-Pr | H | Me | F | $CH_2CH_2OC(=O)Ph$ | O |
| A-4198 | c-Pr | H | Me | F | $CH_2CH_2OC(=O)Ph(4-CF_3)$ | O |
| A-4199 | c-Pr | H | Me | F | $CH_2CH_2CH_2OC(=O)Ph(4-CF_3)$ | O |
| A-4200 | c-Pr | H | Me | F | $CH_2CH_2CH_2CH_2OC(=O)Ph(4-CF_3)$ | O |
| A-4201 | c-Pr | H | Me | F | $CH_2CH_2CH_2CH_2CH_2OC(=O)Ph(4-CF_3)$ | O |
| A-4202 | c-Pr | H | Me | F | $CH_2CH_2OS(=O)Me$ | O |
| A-4203 | c-Pr | H | Me | F | $CH_2CH_2CH_2OS(=O)Me$ | O |
| A-4204 | c-Pr | H | Me | F | $CH_2CH_2CH_2CH_2OS(=O)Me$ | O |
| A-4205 | c-Pr | H | Me | F | $CH_2CH_2CH_2CH_2CH_2OS(=O)Me$ | O |
| A-4206 | c-Pr | H | Me | F | $CH_2CH_2CH_2CH_2CH_2CH_2OS(=O)Me$ | O |
| A-4207 | c-Pr | H | Me | F | $CH_2CH_2OS(=O)CF_3$ | O |
| A-4208 | c-Pr | H | Me | F | $CH_2CH_2CH_2OS(=O)CF_3$ | O |
| A-4209 | c-Pr | H | Me | F | $CH_2CH_2CH_2CH_2OS(=O)CF_3$ | O |
| A-4210 | c-Pr | H | Me | F | $CH_2CH_2CH_2CH_2CH_2OS(=O)CF_3$ | O |
| A-4211 | c-Pr | H | Me | F | $CH_2CH_2CH_2CH_2CH_2CH_2OS(=O)CF_3$ | O |
| A-4212 | c-Pr | H | Me | F | $CH_2CH_2OS(=O)Ph$ | O |
| A-4213 | c-Pr | H | Me | F | $CH_2CH_2OS(=O)Ph(4-Me)$ | O |
| A-4214 | c-Pr | H | Me | F | $CH_2CH_2CH_2OS(=O)Ph$ | O |
| A-4215 | c-Pr | H | Me | F | $CH_2CH_2CH_2OS(=O)Ph(4-Me)$ | O |

TABLE 96-continued

| Compound Number | $R^1$ | $R^2$ | $R^3$ | $R^4$ | $R^5$ | A |
|---|---|---|---|---|---|---|
| A-4216 | c-Pr | H | Me | F | $CH_2CH_2OS(=O)_2Me$ | O |
| A-4217 | c-Pr | H | Me | F | $CH_2CH_2CH_2OS(=O)_2Me$ | O |
| A-4218 | c-Pr | H | Me | F | $CH_2CH_2CH_2OS(=O)_2CF_3$ | O |

TABLE 97

| Compound Number | $R^1$ | $R^2$ | $R^3$ | $R^4$ | $R^5$ | A |
|---|---|---|---|---|---|---|
| A-4219 | c-Pr | H | Me | F | $CH_2CH_2CH_2CH_2OS(=O)_2CF_3$ | O |
| A-4220 | c-Pr | H | Me | F | $CH_2CH_2CH_2CH_2CH_2OS(=O)_2CF_3$ | O |
| A-4221 | c-Pr | H | Me | F | $CH_2CH_2CH_2CH_2CH_2OS(=O)_2CF_2CF_2CF_2CF_3$ | O |
| A-4222 | c-Pr | H | Me | F | $CH_2CH_2OS(=O)_2Ph$ | O |
| A-4223 | c-Pr | H | Me | F | $CH_2CH_2OS(=O)_2Ph(4-Me)$ | O |
| A-4224 | c-Pr | H | Me | F | $CH_2CH_2CH_2OS(=O)_2Ph$ | O |
| A-4225 | c-Pr | H | Me | F | $CH_2CH_2CH_2OS(=O)_2Ph(4-Me)$ | O |
| A-4226 | c-Pr | H | Me | F | $CH_2CH_2NH_2$ | O |
| A-4227 | c-Pr | H | Me | F | $CH_2CH_2CH_2NH_2$ | O |
| A-4228 | c-Pr | H | Me | F | $CH_2CH_2CH_2CH_2NH_2$ | O |
| A-4229 | c-Pr | H | Me | F | $CH_2CH_2CH_2CH_2CH_2NH_2$ | O |
| A-4230 | c-Pr | H | Me | F | $CH_2CH_2CH_2CH_2CH_2CH_2NH_2$ | O |
| A-4231 | c-Pr | H | Me | F | $CH_2CH_2CH_2CH_2CH_2CH_2CH_2NH_2$ | O |
| A-4232 | c-Pr | H | Me | F | $CH_2CH(Me)NH_2$ | O |
| A-4233 | c-Pr | H | Me | F | $CH_2C^*H(Me)NH_2$:(R) | O |
| A-4234 | c-Pr | H | Me | F | $CH_2C^*H(Me)NH_2$:(S) | O |
| A-4235 | c-Pr | H | Me | F | $CH_2CH(Et)NH_2$ | O |
| A-4236 | c-Pr | H | Me | F | $CH_2CH(i-Pr)NH_2$ | O |
| A-4237 | c-Pr | H | Me | F | $CH(Me)CH_2NH_2$ | O |
| A-4238 | c-Pr | H | Me | F | $CH(Et)CH_2NH_2$ | O |
| A-4239 | c-Pr | H | Me | F | $CH(i-Pr)CH_2NH_2$ | O |
| A-4240 | c-Pr | H | Me | F | $CH_2CH_2CH(Me)NH_2$ | O |
| A-4241 | c-Pr | H | Me | F | $CH_2CH(Me)CH_2NH_2$ | O |
| A-4242 | c-Pr | H | Me | F | $CH(Me)CH_2CH_2NH_2$ | O |
| A-4243 | c-Pr | H | Me | F | $CH_2CH(Me)NH(c-Pr)$ | O |
| A-4244 | c-Pr | H | Me | F | $CH_2CH(Me)NHOMe$ | O |
| A-4245 | c-Pr | H | Me | F | $CH_2CH(Me)N(OMe)S(=O)_2Ph(2-NO_2)$ | O |
| A-4246 | c-Pr | H | Me | F | $CH_2CH(Me)N(OMe)S(=O)_2Ph(4-NO_2)$ | O |
| A-4247 | c-Pr | H | Me | F | $CH_2CH_2N(Me)(t-Bu)$ | O |
| A-4248 | c-Pr | H | Me | F | $CH_2CH_2CH_2N(Me)(t-Bu)$ | O |
| A-4249 | c-Pr | H | Me | F | $CH_2CH_2CH_2CH_2N(Me)(t-Bu)$ | O |
| A-4250 | c-Pr | H | Me | F | $CH_2CH_2NHCH_2CF_3$ | O |
| A-4251 | c-Pr | H | Me | F | $CH_2CH_2CH_2NHCH_2CF_3$ | O |
| A-4252 | c-Pr | H | Me | F | $CH_2CH_2CH_2CH_2NHCH_2CF_3$ | O |
| A-4253 | c-Pr | H | Me | F | $CH_2CH_2NHC(=O)C(Me)(CF_3)_2$ | O |
| A-4254 | c-Pr | H | Me | F | $CH_2CH_2NHC(=O)Me$ | O |
| A-4255 | c-Pr | H | Me | F | $CH_2CH_2NHC(=O)(t-Bu)$ | O |
| A-4256 | c-Pr | H | Me | F | $CH_2CH_2CH_2CH_2NHC(=O)CH(CH_3)_2$ | O |
| A-4257 | c-Pr | H | Me | F | $CH_2CH_2CH_2CH_2NHC(=O)(t-Bu)$ | O |
| A-4258 | c-Pr | H | Me | F | $CH_2CH_2CH_2CH_2NHC(=O)CH_2(t-Bu)$ | O |
| A-4259 | c-Pr | H | Me | F | $CH_2CH_2NHC(=O)CF_3$ | O |
| A-4260 | c-Pr | H | Me | F | $CH_2CH_2NHC(=O)CH_2CF_3$ | O |
| A-4261 | c-Pr | H | Me | F | $CH_2CH_2NHC(=O)CF_2CF_3$ | O |
| A-4262 | c-Pr | H | Me | F | $CH_2CH_2CH_2NHC(=O)CF_3$ | O |

TABLE 98

| Compound Number | $R^1$ | $R^2$ | $R^3$ | $R^4$ | $R^5$ | A |
|---|---|---|---|---|---|---|
| A-4263 | c-Pr | H | Me | F | $CH_2CH_2CH_2NHC(=O)CH_2CF_3$ | O |
| A-4264 | c-Pr | H | Me | F | $CH_2CH_2CH_2NHC(=O)CF_2CF_3$ | O |
| A-4265 | c-Pr | H | Me | F | $CH_2CH_2CH_2CH_2NHC(=O)CF_3$ | O |
| A-4266 | c-Pr | H | Me | F | $CH_2CH_2CH_2CH_2NHC(=O)CH_2CF_3$ | O |
| A-4267 | c-Pr | H | Me | F | $CH_2CH_2CH_2CH_2NHC(=O)CF_2CF_3$ | O |
| A-4268 | c-Pr | H | Me | F | $CH_2CH_2CH_2CH_2NHC(=O)CF(CF_3)_2$ | O |
| A-4269 | c-Pr | H | Me | F | $CH_2CH_2CH_2CH_2NHC(=O)CCl_3$ | O |
| A-4270 | c-Pr | H | Me | F | $CH_2CH(Me)NHC(=O)CF_3$ | O |
| A-4271 | c-Pr | H | Me | F | $CH_2CH_2NHC(=O)Ph$ | O |

TABLE 98-continued

| Compound Number | $R^1$ | $R^2$ | $R^3$ | $R^4$ | $R^5$ | A |
|---|---|---|---|---|---|---|
| A-4272 | c-Pr | H | Me | F | $CH_2CH_2NHC({=}O)Ph(4\text{-}CF_3)$ | O |
| A-4273 | c-Pr | H | Me | F | $CH_2CH_2CH_2NHC({=}O)Ph(4\text{-}CF_3)$ | O |
| A-4274 | c-Pr | H | Me | F | $CH_2CH_2CH_2CH_2NHC({=}O)Ph(4\text{-}CF_3)$ | O |
| A-4275 | c-Pr | H | Me | F | $CH_2CH_2NHC({=}O)O(t\text{-}Bu)$ | O |
| A-4276 | c-Pr | H | Me | F | $CH_2CH_2CH_2NHC({=}O)O(t\text{-}Bu)$ | O |
| A-4277 | c-Pr | H | Me | F | $CH_2CH_2CH_2CH_2NHC({=}O)O(t\text{-}Bu)$ | O |
| A-4278 | c-Pr | H | Me | F | $CH_2CH_2CH_2CH_2NHC({=}O)OCH(CH_3)_2$ | O |
| A-4279 | c-Pr | H | Me | F | $CH_2CH(Me)NHC({=}O)O(t\text{-}Bu)$ | O |
| A-4280 | c-Pr | H | Me | F | $CH_2C{*}H(Me)NHC({=}O)O(t\text{-}Bu){:}(R)$ | O |
| A-4281 | c-Pr | H | Me | F | $CH_2C{*}H(Me)NHC({=}O)O(t\text{-}Bu){:}(S)$ | O |
| A-4282 | c-Pr | H | Me | F | $CH_2CH(Et)NHC({=}O)O(t\text{-}Bu)$ | O |
| A-4283 | c-Pr | H | Me | F | $CH_2CH(i\text{-}Pr)NHC({=}O)O(t\text{-}Bu)$ | O |
| A-4284 | c-Pr | H | Me | F | $CH(Me)CH_2NHC({=}O)O(t\text{-}Bu)$ | O |
| A-4285 | c-Pr | H | Me | F | $CH(Et)CH_2NHC({=}O)O(t\text{-}Bu)$ | O |
| A-4286 | c-Pr | H | Me | F | $CH(i\text{-}Pr)CH_2NHC({=}O)O(t\text{-}Bu)$ | O |
| A-4287 | c-Pr | H | Me | F | $CH_2CH(Me)CH_2NHC({=}O)O(t\text{-}Bu)$ | O |
| A-4288 | c-Pr | H | Me | F | $CH_2CH_2NHC({=}O)OC(Me)_2CF_3$ | O |
| A-4289 | c-Pr | H | Me | F | $CH_2CH_2CH_2NHC({=}O)OCH_2CF_3$ | O |
| A-4290 | c-Pr | H | Me | F | $CH_2CH_2CH_2NHC({=}O)OCH_2CH_2CF_3$ | O |
| A-4291 | c-Pr | H | Me | F | $CH_2CH_2CH_2CH_2NHC({=}O)OCH_2CCl_3$ | O |
| A-4292 | c-Pr | H | Me | F | $CH_2CH_2CH_2CH_2NHC({=}O)OCH_2CF_3$ | O |
| A-4293 | c-Pr | H | Me | F | $CH_2CH_2NHC({=}O)NH(t\text{-}Bu)$ | O |
| A-4294 | c-Pr | H | Me | F | $CH_2CH_2CH_2NHC({=}O)NH(t\text{-}Bu)$ | O |
| A-4295 | c-Pr | H | Me | F | $CH_2CH_2CH_2CH_2NHC({=}O)NHEt$ | O |
| A-4296 | c-Pr | H | Me | F | $CH_2CH_2CH_2CH_2NHC({=}O)NH(t\text{-}Bu)$ | O |
| A-4297 | c-Pr | H | Me | F | $CH_2CH_2CH_2NHC({=}O)NHCH_2CCl_3$ | O |
| A-4298 | c-Pr | H | Me | F | $CH_2CH_2CH_2NHC({=}O)NHCH_2CH_2F$ | O |
| A-4299 | c-Pr | H | Me | F | $CH_2CH_2CH_2NHC({=}O)NHCH_2CF_3$ | O |
| A-4300 | c-Pr | H | Me | F | $CH_2CH_2CH_2CH_2NHC({=}O)NHCH_2CCl_3$ | O |
| A-4301 | c-Pr | H | Me | F | $CH_2CH_2CH_2CH_2NHC({=}O)NHCH_2CH_2F$ | O |
| A-4302 | c-Pr | H | Me | F | $CH_2CH_2CH_2CH_2NHC({=}O)NHCH_2CF_3$ | O |
| A-4303 | c-Pr | H | Me | F | $CH_2CH_2NHS({=}O)Me$ | O |
| A-4304 | c-Pr | H | Me | F | $CH_2CH_2CH_2NHS({=}O)Me$ | O |
| A-4305 | c-Pr | H | Me | F | $CH_2CH_2CH_2CH_2NHS({=}O)Me$ | O |
| A-4306 | c-Pr | H | Me | F | $CH_2CH_2CH_2CH_2NHS({=}O)CH(CH_3)_2$ | O |

TABLE 99

| Compound Number | $R^1$ | $R^2$ | $R^3$ | $R^4$ | $R^5$ | A |
|---|---|---|---|---|---|---|
| A-4307 | c-Pr | H | Me | F | $CH_2CH_2CH_2CH_2CH_2NHS({=}O)Me$ | O |
| A-4308 | c-Pr | H | Me | F | $CH_2CH_2NHS({=}O)CHF_2$ | O |
| A-4309 | c-Pr | H | Me | F | $CH_2CH_2CH_2NHS({=}O)CHF_2$ | O |
| A-4310 | c-Pr | H | Me | F | $CH_2CH_2CH_2CH_2NHS({=}O)CHF_2$ | O |
| A-4311 | c-Pr | H | Me | F | $CH_2CH_2CH_2CH_2CH_2NHS({=}O)CHF_2$ | O |
| A-4312 | c-Pr | H | Me | F | $CH_2CH(Me)NHS({=}O)CHF_2$ | O |
| A-4313 | c-Pr | H | Me | F | $CH(Me)CH_2NHS({=}O)CHF_2$ | O |
| A-4314 | c-Pr | H | Me | F | $CH_2CH_2CH(Me)NHS({=}O)CHF_2$ | O |
| A-4315 | c-Pr | H | Me | F | $CH_2CH(Me)CH_2NHS({=}O)CHF_2$ | O |
| A-4316 | c-Pr | H | Me | F | $CH(Me)CH_2CH_2NHS({=}O)CHF_2$ | O |
| A-4317 | c-Pr | H | Me | F | $CH_2CH_2NHS({=}O)CF_3$ | O |
| A-4318 | c-Pr | H | Me | F | $CH_2CH_2CH_2NHS({=}O)CF_3$ | O |
| A-4319 | c-Pr | H | Me | F | $CH_2CH_2CH_2CH_2NHS({=}O)CF_3$ | O |
| A-4320 | c-Pr | H | Me | F | $CH_2CH_2CH_2CH_2CH_2NHS({=}O)CF_3$ | O |
| A-4321 | c-Pr | H | Me | F | $CH_2CH_2CH_2NHS({=}O)Ph$ | O |
| A-4322 | c-Pr | H | Me | F | $CH_2CH_2CH_2CH_2NHS({=}O)Ph$ | O |
| A-4323 | c-Pr | H | Me | F | $CH_2CH_2CH_2CH_2CH_2NHS({=}O)Ph$ | O |
| A-4324 | c-Pr | H | Me | F | $CH_2CH_2CH_2CH_2CH_2NHS({=}O)Ph(4\text{-}CF_3)$ | O |
| A-4325 | c-Pr | H | Me | F | $CH_2CH(Me)NHS({=}O)Ph(4\text{-}CF_3)$ | O |
| A-4326 | c-Pr | H | Me | F | $CH_2CH(Et)NHS({=}O)Ph(4\text{-}CF_3)$ | O |
| A-4327 | c-Pr | H | Me | F | $CH(Me)CH_2NHS({=}O)Ph(4\text{-}CF_3)$ | O |
| A-4328 | c-Pr | H | Me | F | $CH(Et)CH_2NHS({=}O)Ph(4\text{-}CF_3)$ | O |
| A-4329 | c-Pr | H | Me | F | $CH_2CH(Et)CH_2NHS({=}O)Ph(4\text{-}CF_3)$ | O |
| A-4330 | c-Pr | H | Me | F | $CH_2CH_2NHS({=}O)_2Me$ | O |
| A-4331 | c-Pr | H | Me | F | $CH_2CH_2CH_2NHS({=}O)_2Me$ | O |
| A-4332 | c-Pr | H | Me | F | $CH_2CH_2CH_2CH_2NHS({=}O)_2Me$ | O |
| A-4333 | c-Pr | H | Me | F | $CH_2CH_2CH_2CH_2NHS({=}O)_2CH(CH_3)_2$ | O |
| A-4334 | c-Pr | H | Me | F | $CH_2CH_2CH_2CH_2CH_2NHS({=}O)_2Me$ | O |
| A-4335 | c-Pr | H | Me | F | $CH_2CH_2NHS({=}O)_2CHF_2$ | O |
| A-4336 | c-Pr | H | Me | F | $CH_2CH_2CH_2NHS({=}O)_2CHF_2$ | O |
| A-4337 | c-Pr | H | Me | F | $CH_2CH_2CH_2CH_2NHS({=}O)_2CHF_2$ | O |
| A-4338 | c-Pr | H | Me | F | $CH_2CH_2CH_2CH_2CH_2NHS({=}O)_2CHF_2$ | O |

TABLE 99-continued

| Compound Number | $R^1$ | $R^2$ | $R^3$ | $R^4$ | $R^5$ | A |
|---|---|---|---|---|---|---|
| A-4339 | c-Pr | H | Me | F | $CH_2CH(Me)NHS({=}O)_2CHF_2$ | O |
| A-4340 | c-Pr | H | Me | F | $CH(Me)CH_2NHS({=}O)_2CHF_2$ | O |
| A-4341 | c-Pr | H | Me | F | $CH_2CH_2CH(Me)NHS({=}O)_2CHF_2$ | O |
| A-4342 | c-Pr | H | Me | F | $CH_2CH(Me)CH_2NHS({=}O)_2CHF_2$ | O |
| A-4343 | c-Pr | H | Me | F | $CH(Me)CH_2CH_2NHS({=}O)_2CHF_2$ | O |
| A-4344 | c-Pr | H | Me | F | $CH_2CH(Me)N(Me)S({=}O)_2CHF_2$ | O |
| A-4345 | c-Pr | H | Me | F | $CH(Me)CH_2N(Me)S({=}O)_2CHF_2$ | O |
| A-4346 | c-Pr | H | Me | F | $CH_2CH_2CH(Me)N(Me)S({=}O)_2CHF_2$ | O |
| A-4347 | c-Pr | H | Me | F | $CH_2CH(Me)CH_2N(Me)S({=}O)_2CHF_2$ | O |
| A-4348 | c-Pr | H | Me | F | $CH(Me)CH_2CH_2N(Me)S({=}O)_2CHF_2$ | O |
| A-4349 | c-Pr | H | Me | F | $CH_2CH_2CH_2NHS({=}O)_2Ph$ | O |
| A-4350 | c-Pr | H | Me | F | $CH_2CH_2CH_2CH_2NHS({=}O)_2Ph$ | O |

TABLE 100

| Compound Number | $R^1$ | $R^2$ | $R^3$ | $R^4$ | $R^5$ | A |
|---|---|---|---|---|---|---|
| A-4351 | c-Pr | H | Me | F | $CH_2CH_2CH_2CH_2CH_2NHS({=}O)_2Ph$ | O |
| A-4352 | c-Pr | H | Me | F | $CH_2CH_2CH_2CH_2CH_2NHS({=}O)_2Ph(4\text{-}CF_3)$ | O |
| A-4353 | c-Pr | H | Me | F | $CH_2CH(Me)NHS({=}O)_2Ph(4\text{-}CF_3)$ | O |
| A-4354 | c-Pr | H | Me | F | $CH_2CH(Et)NHS({=}O)_2Ph(4\text{-}CF_3)$ | O |
| A-4355 | c-Pr | H | Me | F | $CH(Me)CH_2NHS({=}O)_2Ph(4\text{-}CF_3)$ | O |
| A-4356 | c-Pr | H | Me | F | $CH(Et)CH_2NHS({=}O)_2Ph(4\text{-}CF_3)$ | O |
| A-4357 | c-Pr | H | Me | F | $CH_2CH(Me)CH_2NHS({=}O)_2Ph(4\text{-}CF_3)$ | O |
| A-4358 | c-Pr | H | Me | F | $CH_2CH_2SiMe_3$ | O |
| A-4359 | c-Pr | H | Me | F | $CH_2CH_2CH_2SiMe_3$ | O |
| A-4360 | c-Pr | H | Me | F | $CH_2CH_2CH_2CH_2SiMe_3$ | O |
| A-4361 | c-Pr | H | Me | F | $CH_2Ph$ | O |
| A-4362 | c-Pr | H | Me | F | $CH_2Ph(2\text{-}CF_3)$ | O |
| A-4363 | c-Pr | H | Me | F | $CH_2Ph(3\text{-}CF_3)$ | O |
| A-4364 | c-Pr | H | Me | F | $CH_2Ph(4\text{-}CF_3)$ | O |
| A-4365 | c-Pr | H | Me | F | $CH_2Ph(2\text{-}OCF_3)$ | O |
| A-4366 | c-Pr | H | Me | F | $CH_2Ph(3\text{-}OCF_3)$ | O |
| A-4367 | c-Pr | H | Me | F | $CH_2Ph(4\text{-}OCF_3)$ | O |
| A-4368 | c-Pr | H | Me | F | $CH_2Ph(2\text{-}SCF_3)$ | O |
| A-4369 | c-Pr | H | Me | F | $CH_2Ph(3\text{-}SCF_3)$ | O |
| A-4370 | c-Pr | H | Me | F | $CH_2Ph(4\text{-}SCF_3)$ | O |
| A-4371 | c-Pr | H | Me | F | $CH_2Ph(3\text{-}CH_2SCF_3)$ | O |
| A-4372 | c-Pr | H | Me | F | $CH_2Ph(4\text{-}F)$ | O |
| A-4373 | c-Pr | H | Me | F | $CH_2Ph(4\text{-}Cl)$ | O |
| A-4374 | c-Pr | H | Me | F | $CH_2Ph(4\text{-}Br)$ | O |
| A-4375 | c-Pr | H | Me | F | $CH_2Ph(4\text{-}Me)$ | O |
| A-4376 | c-Pr | H | Me | F | $CH_2Ph[4\text{-}(t\text{-}Bu)]$ | O |
| A-4377 | c-Pr | H | Me | F | $CH_2Ph(4\text{-}CN)$ | O |
| A-4378 | c-Pr | H | Me | F | $CH_2Ph(4\text{-}NO2)$ | O |
| A-4379 | c-Pr | H | Me | F | $CH_2Ph(4\text{-}OCHF_2)$ | O |
| A-4380 | c-Pr | H | Me | F | $CH_2Ph(4\text{-}SCHF_2)$ | O |
| A-4381 | c-Pr | H | Me | F | $CH_2Ph(4\text{-}CH_2SCF_3)$ | O |
| A-4382 | c-Pr | H | Me | F | $CH_2Ph[4\text{-}CF(CF_3)_2]$ | O |
| A-4383 | c-Pr | H | Me | F | $CH_2Ph(4\text{-}CH_2SCF_3)$ | O |
| A-4384 | c-Pr | H | Me | F | $CH_2Ph[4\text{-}Ph(4\text{-}CF_3)]$ | O |
| A-4385 | c-Pr | H | Me | F | $CH_2Ph(2,4\text{-}Cl2)$ | O |
| A-4386 | c-Pr | H | Me | F | $CH_2Ph[2,5\text{-}(CF_3)_2]$ | O |
| A-4387 | c-Pr | H | Me | F | $CH_2Ph(3,4\text{-}Cl2)$ | O |
| A-4388 | c-Pr | H | Me | F | $CH_2Ph(3\text{-}CF_3\text{-}4\text{-}F)$ | O |
| A-4389 | c-Pr | H | Me | F | $CH_2Ph(3\text{-}CF_3\text{-}4\text{-}Cl)$ | O |
| A-4390 | c-Pr | H | Me | F | $CH_2Ph(3\text{-}F\text{-}4\text{-}CF_3)$ | O |
| A-4391 | c-Pr | H | Me | F | $CH_2Ph(2,4,6\text{-}F_3)$ | O |
| A-4392 | c-Pr | H | Me | F | $CH_2Ph(3,4,5\text{-}F_3)$ | O |
| A-4393 | c-Pr | H | Me | F | $CH_2Ph(2,3,4\text{-}F_3)$ | O |
| A-4394 | c-Pr | H | Me | F | $CH_2Ph(3,4,5\text{-}Cl_3)$ | O |

TABLE 101

| Compound Number | $R^1$ | $R^2$ | $R^3$ | $R^4$ | $R^5$ | A |
|---|---|---|---|---|---|---|
| A-4395 | c-Pr | H | Me | F | $CH_2CH_2Ph$ | O |
| A-4396 | c-Pr | H | Me | F | $CH_2CH_2Ph(4\text{-}F)$ | O |
| A-4397 | c-Pr | H | Me | F | $CH_2CH_2Ph(4\text{-}Cl)$ | O |

TABLE 101-continued

| Compound Number | $R^1$ | $R^2$ | $R^3$ | $R^4$ | $R^5$ | A |
|---|---|---|---|---|---|---|
| A-4398 | c-Pr | H | Me | F | $CH_2CH_2Ph(4\text{-}Br)$ | O |
| A-4399 | c-Pr | H | Me | F | $CH_2CH_2Ph[4\text{-}(t\text{-}Bu)]$ | O |
| A-4400 | c-Pr | H | Me | F | $CH_2CH_2Ph(2\text{-}CF_3)$ | O |

TABLE 101-continued

| Compound Number | $R^1$ | $R^2$ | $R^3$ | $R^4$ | $R^5$ | A |
|---|---|---|---|---|---|---|
| A-4401 | c-Pr | H | Me | F | $CH_2CH_2Ph(3\text{-}CF_3)$ | O |
| A-4402 | c-Pr | H | Me | H | $CH_2CH_2Ph(4\text{-}CF_3)$ | O |
| A-4403 | c-Pr | H | Me | F | $CH_2CH_2Ph(4\text{-}CF_3)$ | O |
| A-4404 | c-Pr | H | Me | F | $CH_2CH_2Ph(4\text{-}CF(CF_3)_2)$ | O |
| A-4405 | c-Pr | H | Me | F | $CH_2CH_2Ph[4\text{-}(c\text{-}Pr)]$ | O |
| A-4406 | c-Pr | H | Me | F | $CH_2CH_2Ph\{4\text{-}[c\text{-}Pr(2,2\text{-}F_2)]\}$ | O |
| A-4407 | c-Pr | H | Me | F | $CH_2CH_2Ph(4\text{-}OMe)$ | O |
| A-4408 | c-Pr | H | Me | F | $CH_2CH_2Ph(3\text{-}OCF_3)$ | O |
| A-4409 | c-Pr | H | Me | F | $CH_2CH_2Ph(4\text{-}OCHF_2)$ | O |
| A-4410 | c-Pr | H | Me | F | $CH_2CH_2Ph(4\text{-}OCF_3)$ | O |
| A-4411 | c-Pr | H | Me | F | $CH_2CH_2Ph(4\text{-}SMe)$ | O |
| A-4412 | c-Pr | H | Me | F | $CH_2CH_2Ph(4\text{-}SCHF_2)$ | O |
| A-4413 | c-Pr | H | Me | F | $CH_2CH_2Ph(4\text{-}SCF_3)$ | O |
| A-4414 | c-Pr | H | Me | F | $CH_2CH_2Ph[4\text{-}S({=}O)Me]$ | O |
| A-4415 | c-Pr | H | Me | F | $CH_2CH_2Ph[4\text{-}S({=}O)CF_3]$ | O |
| A-4416 | c-Pr | H | Me | F | $CH_2CH_2Ph[4\text{-}S({=}O)_2Me]$ | O |
| A-4417 | c-Pr | H | Me | F | $CH_2CH_2Ph[4\text{-}S({=}O)_2CF_3]$ | O |
| A-4418 | c-Pr | H | Me | F | $CH_2CH_2Ph(4\text{-}CH_2SMe)$ | O |
| A-4419 | c-Pr | H | Me | F | $CH_2CH_2Ph(4\text{-}CH_2SCF_3)$ | O |
| A-4420 | c-Pr | H | Me | F | $CH_2CH_2Ph[4\text{-}OS({=}O)_2Me]$ | O |
| A-4421 | c-Pr | H | Me | F | $CH_2CH_2Ph[4\text{-}OS({=}O)_2CF_3]$ | O |
| A-4422 | c-Pr | H | Me | F | $CH_2CH_2Ph[4\text{-}Ph(4\text{-}CF_3)]$ | O |
| A-4423 | c-Pr | H | Me | F | $CH_2CH_2Ph(4\text{-}CH_2Ph)$ | O |
| A-4424 | c-Pr | H | Me | F | $CH_2CH_2Ph(4\text{-}OCH_2Ph)$ | O |
| A-4425 | c-Pr | H | Me | F | $CH_2CH_2Ph(4\text{-}CN)$ | O |
| A-4426 | c-Pr | H | Me | F | $CH_2CH_2Ph$(4-NO2) | O |
| A-4427 | c-Pr | H | Me | F | $CH_2CH_2Ph$(2,4-Cl2) | O |
| A-4428 | c-Pr | H | Me | F | $CH_2CH_2Ph$(3,4-Cl2) | O |
| A-4429 | c-Pr | H | Me | F | $CH_2CH_2Ph(3\text{-}CF_3\text{-}4\text{-}F)$ | O |
| A-4430 | c-Pr | H | Me | F | $CH_2CH_2Ph(2\text{-}CF_3\text{-}4\text{-}F)$ | O |
| A-4431 | c-Pr | H | Me | F | $CH_2CH_2Ph(3\text{-}F\text{-}4\text{-}CF_3)$ | O |
| A-4432 | c-Pr | H | Me | F | $CH_2CH_2Ph(2\text{-}F\text{-}4\text{-}CF_3)$ | O |
| A-4433 | c-Pr | H | Me | F | $CH_2CH_2Ph(3\text{-}Cl\text{-}4\text{-}OCHF_2)$ | O |
| A-4434 | c-Pr | H | Me | F | $CH_2CH_2Ph(3,4,5\text{-}Cl_3)$ | O |
| A-4435 | c-Pr | H | Me | F | $CH_2CH_2Ph(2,3,4\text{-}F_3)$ | O |
| A-4436 | c-Pr | H | Me | F | $CH_2CH_2Ph(2,4,5\text{-}F_3)$ | O |
| A-4437 | c-Pr | H | Me | F | $CH_2CH_2Ph(3,4,5\text{-}F_3)$ | O |
| A-4438 | c-Pr | H | Me | F | $CH_2CH_2Ph(2,4,6\text{-}F_3)$ | O |

TABLE 102

| Compound Number | $R^1$ | $R^2$ | $R^3$ | $R^4$ | $R^5$ | A |
|---|---|---|---|---|---|---|
| A-4439 | c-Pr | H | Me | F | $CH_2CH_2CH_2Ph$ | O |
| A-4440 | c-Pr | H | Me | F | $CH_2CH_2CH_2Ph(3\text{-}CF_3)$ | O |
| A-4441 | c-Pr | H | Me | F | $CH_2CH_2CH_2Ph(4\text{-}CF_3)$ | O |
| A-4442 | c-Pr | H | Me | F | $CH_2CH_2CH_2Ph(4\text{-}F)$ | O |
| A-4443 | c-Pr | H | Me | F | $CH_2CH_2CH_2Ph[4\text{-}(t\text{-}Bu)]$ | O |
| A-4444 | c-Pr | H | Me | F | $CH_2CH_2CH_2Ph(4\text{-}CN)$ | O |
| A-4445 | c-Pr | H | Me | F | $CH_2CH_2CH_2Ph(4\text{-}CF_3)$ | O |
| A-4446 | c-Pr | H | Me | F | $CH_2CH_2CH_2Ph(4\text{-}OCHF_2)$ | O |
| A-4447 | c-Pr | H | Me | F | $CH_2CH_2CH_2Ph(4\text{-}OCF_3)$ | O |
| A-4448 | c-Pr | H | Me | F | $CH_2CH_2CH_2Ph(4\text{-}SCHF_2)$ | O |
| A-4449 | c-Pr | H | Me | F | $CH_2CH_2CH_2Ph(4\text{-}SCF_3)$ | O |
| A-4450 | c-Pr | H | Me | F | $CH_2CH_2CH_2Ph[4\text{-}CF(CF_3)_2]$ | O |
| A-4451 | c-Pr | H | Me | F | $CH_2CH_2CH_2Ph(3,4,5\text{-}F_3)$ | O |
| A-4452 | c-Pr | H | Me | F | $CH_2CH_2CH_2Ph(2,4,6\text{-}F_3)$ | O |
| A-4453 | c-Pr | H | Me | F | $CH_2CH_2CH_2CH_2Ph$ | O |
| A-4454 | c-Pr | H | Me | F | $CH_2CH_2CH_2CH_2Ph(4\text{-}F)$ | O |
| A-4455 | c-Pr | H | Me | F | $CH_2CH_2CH_2CH_2Ph(4\text{-}CF_3)$ | O |
| A-4456 | c-Pr | H | Me | F | $CH_2CH_2CH_2CH_2Ph(4\text{-}OCF_3)$ | O |
| A-4457 | c-Pr | H | Me | F | $CH_2CH_2CH_2CH_2Ph(4\text{-}SCF_3)$ | O |
| A-4458 | c-Pr | H | Me | F | $CH_2CH_2CH_2CH_2CH_2Ph$ | O |
| A-4459 | c-Pr | H | Me | F | $CH_2CH_2CH_2CH_2CH_2CH_2Ph$ | O |
| A-4460 | c-Pr | H | Me | F | $CH_2CF_2Ph(4\text{-}F)$ | O |
| A-4461 | c-Pr | H | Me | F | $CH_2CF_2Ph(4\text{-}CF_3)$ | O |
| A-4462 | c-Pr | H | Me | H | $CH_2CF_2Ph(3,4,5\text{-}F_3)$ | O |
| A-4463 | c-Pr | H | Me | F | $CH_2CF_2Ph(3,4,5\text{-}F_3)$ | O |
| A-4464 | c-Pr | H | Me | F | $CH_2CH_2OPh$ | O |
| A-4465 | c-Pr | H | Me | F | $CH_2CH_2OPh(4\text{-}F)$ | O |
| A-4466 | c-Pr | H | Me | F | $CH_2CH_2OPh(4\text{-}CF_3)$ | O |

TABLE 102-continued

| Compound Number | $R^1$ | $R^2$ | $R^3$ | $R^4$ | $R^5$ | A |
|---|---|---|---|---|---|---|
| A-4467 | c-Pr | H | Me | F | $CH_2CH_2CH_2OPh$ | O |
| A-4468 | c-Pr | H | Me | F | $CH_2CH_2CH_2OPh(4\text{-}Cl)$ | O |
| A-4469 | c-Pr | H | Me | F | $CH_2CH_2CH_2OPh(4\text{-}CF_3)$ | O |
| A-4470 | c-Pr | H | Me | F | $CH_2CH_2CH_2CH_2OPh(4\text{-}CF_3)$ | O |
| A-4471 | c-Pr | H | Me | F | $CH_2CH_2CH_2CH_2OPh(4\text{-}OCF_3)$ | O |
| A-4472 | c-Pr | H | Me | F | $CH_2CH_2CH_2CH_2CH_2OPh(4\text{-}CF_3)$ | O |
| A-4473 | c-Pr | H | Me | F | $CH_2CH_2OCH_2Ph$ | O |
| A-4474 | c-Pr | H | Me | F | $CH_2CH_2CH_2OCH_2Ph$ | O |
| A-4475 | c-Pr | H | Me | F | $CH_2CH_2CH_2CH_2OCH_2Ph$ | O |
| A-4476 | c-Pr | H | Me | F | $CH_2CH_2CH_2CH_2CH_2OCH_2Ph$ | O |
| A-4477 | c-Pr | H | Me | F | $CH_2CH_2SPh$ | O |
| A-4478 | c-Pr | H | Me | F | $CH_2CH_2CH_2SPh$ | O |
| A-4479 | c-Pr | H | Me | F | $CH_2CH_2CH_2SPh(4\text{-}F)$ | O |
| A-4480 | c-Pr | H | Me | F | $CH_2CH_2CH_2SPh(4\text{-}Cl)$ | O |
| A-4481 | c-Pr | H | Me | F | $CH_2CH_2CH_2SPh(4\text{-}Br)$ | O |
| A-4482 | c-Pr | H | Me | F | $CH_2CH_2CH_2SPh[4\text{-}(t\text{-}Bu)]$ | O |

TABLE 103

| Compound Number | $R^1$ | $R^2$ | $R^3$ | $R^4$ | $R^5$ | A |
|---|---|---|---|---|---|---|
| A-4483 | c-Pr | H | Me | F | $CH_2CH_2CH_2SPh(3\text{-}CF_3)$ | O |
| A-4484 | c-Pr | H | Me | F | $CH_2CH_2CH_2SPh(4\text{-}CF_3)$ | O |
| A-4485 | c-Pr | H | Me | F | $CH_2CH_2CH_2SPh(3\text{-}SCF_3)$ | O |
| A-4486 | c-Pr | H | Me | F | $CH_2CH_2CH_2SPh(4\text{-}SCF_3)$ | O |
| A-4487 | c-Pr | H | Me | F | $CH_2CH_2CH_2CH_2SPh$ | O |
| A-4488 | c-Pr | H | Me | F | $CH_2CH_2CH_2CH_2SPh(4\text{-}F)$ | O |
| A-4489 | c-Pr | H | Me | F | $CH_2CH_2CH_2CH_2SPh(4\text{-}Cl)$ | O |
| A-4490 | c-Pr | H | Me | F | $CH_2CH_2CH_2CH_2SPh[4\text{-}(t\text{-}Bu)]$ | O |
| A-4491 | c-Pr | H | Me | F | $CH_2CH_2CH_2CH_2SPh(4\text{-}CF_3)$ | O |
| A-4492 | c-Pr | H | Me | F | $CH_2CH_2CH_2CH_2CH_2SPh$ | O |
| A-4493 | c-Pr | H | Me | F | $CH_2CH_2CH_2CH_2CH_2SPh(4\text{-}F)$ | O |
| A-4494 | c-Pr | H | Me | F | $CH_2CH_2CH_2CH_2CH_2SPh(4\text{-}Cl)$ | O |
| A-4495 | c-Pr | H | Me | F | $CH_2CH_2CH_2CH_2CH_2SPh(4\text{-}CF_3)$ | O |
| A-4496 | c-Pr | H | Me | F | $CH_2CH_2S({=}O)Ph$ | O |
| A-4497 | c-Pr | H | Me | F | $CH_2CH_2CH_2S({=}O)Ph$ | O |
| A-4498 | c-Pr | H | Me | F | $CH_2CH_2CH_2S({=}O)Ph(4\text{-}F)$ | O |
| A-4499 | c-Pr | H | Me | F | $CH_2CH_2CH_2S({=}O)Ph[4\text{-}(t\text{-}Bu)]$ | O |
| A-4500 | c-Pr | H | Me | F | $CH_2CH_2CH_2S({=}O)Ph(4\text{-}CF_3)$ | O |
| A-4501 | c-Pr | H | Me | F | $CH_2CH_2S({=}O)_2Ph$ | O |
| A-4502 | c-Pr | H | Me | F | $CH_2CH_2S({=}O)_2Ph(4\text{-}CF_3)$ | O |
| A-4503 | c-Pr | H | Me | F | $CH_2CH_2CH_2S({=}O)_2Ph(4\text{-}F)$ | O |
| A-4504 | c-Pr | H | Me | F | $CH_2CH_2CH_2S({=}O)_2Ph(4\text{-}Cl)$ | O |
| A-4505 | c-Pr | H | Me | F | $CH_2CH_2CH_2S({=}O)_2Ph(4\text{-}CF_3)$ | O |
| A-4506 | c-Pr | H | Me | F | $CH_2CH_2CH_2CH_2S({=}O)_2Ph$ | O |
| A-4507 | c-Pr | H | Me | F | $CH_2CH_2CH_2CH_2S({=}O)_2Ph(4\text{-}Cl)$ | O |
| A-4508 | c-Pr | H | Me | F | $CH_2CH_2CH_2CH_2S({=}O)_2Ph(4\text{-}CF_3)$ | O |
| A-4509 | c-Pr | H | Me | F | $CH_2CH_2SCH_2Ph$ | O |
| A-4510 | c-Pr | H | Me | F | $CH_2CH_2CH_2SCH_2Ph$ | O |
| A-4511 | c-Pr | H | Me | F | $CH_2CH_2CH_2SCH_2Ph(2\text{-}Cl)$ | O |
| A-4512 | c-Pr | H | Me | F | $CH_2CH_2CH_2SCH_2Ph(3\text{-}Cl)$ | O |
| A-4513 | c-Pr | H | Me | F | $CH_2CH_2CH_2SCH_2Ph(4\text{-}Cl)$ | O |
| A-4514 | c-Pr | H | Me | F | $CH_2CH_2CH_2SCH_2Ph(2\text{-}SCF_3)$ | O |
| A-4515 | c-Pr | H | Me | F | $CH_2CH_2CH_2SCH_2Ph(3\text{-}CF_3)$ | O |
| A-4516 | c-Pr | H | Me | F | $CH_2CH_2CH_2SCH_2Ph(4\text{-}CF_3)$ | O |
| A-4517 | c-Pr | H | Me | F | $CH_2CH_2CH_2SCH_2Ph$(4-NO2) | O |
| A-4518 | c-Pr | H | Me | F | $CH_2CH_2CH_2CH_2SCH_2Ph$ | O |
| A-4519 | c-Pr | H | Me | F | $CH_2CH_2CH_2CH_2SCH_2Ph(4\text{-}Cl)$ | O |
| A-4520 | c-Pr | H | Me | F | $CH_2CH_2CH_2CH_2SCH_2Ph(4\text{-}CF_3)$ | O |
| A-4521 | c-Pr | H | Me | F | $CH_2CH_2CH_2CH_2SCH_2Ph(4\text{-}CN)$ | O |
| A-4522 | c-Pr | H | Me | F | $CH_2CH_2CH_2CH_2CH_2SCH_2Ph$ | O |
| A-4523 | c-Pr | H | Me | F | $CH_2CH_2SCH_2CH_2Ph$ | O |
| A-4524 | c-Pr | H | Me | F | $CH_2CH_2CH_2SCH_2CH_2Ph$ | O |
| A-4525 | c-Pr | H | Me | F | $CH_2CH_2CH_2CH_2SCH_2CH_2Ph$ | O |
| A-4526 | c-Pr | H | Me | F | $CH_2CH_2SCH(Me)Ph$ | O |

TABLE 104

| Compound Number | $R^1$ | $R^2$ | $R^3$ | $R^4$ | $R^5$ | A |
|---|---|---|---|---|---|---|
| A-4527 | c-Pr | H | Me | F | $CH_2CH_2CH_2SCH(Me)Ph$ | O |
| A-4528 | c-Pr | H | Me | F | $CH_2CH_2CH_2CH_2SCH(Me)Ph$ | O |
| A-4529 | c-Pr | H | Me | F | $CH_2CH_2S(=O)CH_2Ph$ | O |
| A-4530 | c-Pr | H | Me | F | $CH_2CH_2S(=O)CH_2Ph(4\text{-}CF_3)$ | O |
| A-4531 | c-Pr | H | Me | F | $CH_2CH_2CH_2S(=O)CH_2Ph$ | O |
| A-4532 | c-Pr | H | Me | F | $CH_2CH_2CH_2S(=O)CH_2Ph(2\text{-}SCF_3)$ | O |
| A-4533 | c-Pr | H | Me | F | $CH_2CH_2CH_2S(=O)CH_2Ph(4\text{-}SCF_3)$ | O |
| A-4534 | c-Pr | H | Me | F | $CH_2CH_2CH_2S(=O)CH_2Ph(4\text{-}Cl)$ | O |
| A-4535 | c-Pr | H | Me | F | $CH_2CH_2CH_2S(=O)CH_2Ph(4\text{-}CF_3)$ | O |
| A-4536 | c-Pr | H | Me | F | $CH_2CH_2CH_2CH_2S(=O)CH_2Ph$ | O |
| A-4537 | c-Pr | H | Me | F | $CH_2CH_2CH_2CH_2S(=O)CH_2Ph(4\text{-}CF_3)$ | O |
| A-4538 | c-Pr | H | Me | F | $CH_2CH_2CH_2CH_2CH_2S(=O)CH_2Ph(4\text{-}CF_3)$ | O |
| A-4539 | c-Pr | H | Me | F | $CH_2CH_2S(=O)_2CH_2Ph$ | O |
| A-4540 | c-Pr | H | Me | F | $CH_2CH_2S(=O)_2CH_2Ph(4\text{-}CF_3)$ | O |
| A-4541 | c-Pr | H | Me | F | $CH_2CH_2CH_2S(=O)_2CH_2Ph$ | O |
| A-4542 | c-Pr | H | Me | F | $CH_2CH_2CH_2S(=O)_2CH_2Ph(4\text{-}Cl)$ | O |
| A-4543 | c-Pr | H | Me | F | $CH_2CH_2CH_2S(=O)_2CH_2Ph(4\text{-}CF_3)$ | O |
| A-4544 | c-Pr | H | Me | F | $CH_2CH_2CH_2CH_2S(=O)_2CH_2Ph$ | O |
| A-4545 | c-Pr | H | Me | F | $CH_2CH_2CH_2CH_2S(=O)_2CH_2Ph(4\text{-}CF_3)$ | O |
| A-4546 | c-Pr | H | Me | F | $CH_2CH_2CH_2CH_2CH_2S(=O)_2CH_2Ph$ | O |
| A-4547 | c-Pr | H | Me | F | $CH_2CH_2CH_2CH_2CH_2S(=O)_2CH_2Ph(4\text{-}CF_3)$ | O |
| A-4548 | c-Pr | H | Me | F | $CH_2CH_2ON{=}CH(t\text{-}Bu)$ | O |
| A-4549 | c-Pr | H | Me | F | $CH_2CH_2CH_2ON{=}CH(t\text{-}Bu)$ | O |
| A-4550 | c-Pr | H | Me | F | $CH_2CH_2CH_2CH_2ON{=}C(Me)(c\text{-}Pr)$ | O |
| A-4551 | c-Pr | H | Me | F | $CH_2CH_2ON{=}C(Me)CF_3$ | O |
| A-4552 | c-Pr | H | Me | F | $CH_2CH_2CH_2ON{=}CHCF_3$ | O |
| A-4553 | c-Pr | H | Me | F | $CH_2CH_2CH_2ON{=}C(Me)CF_3$ | O |
| A-4554 | c-Pr | H | Me | F | $CH_2CH_2CH_2ON{=}C(Me)CCl_3$ | O |
| A-4555 | c-Pr | H | Me | F | $CH_2CH_2CH_2CH_2ON{=}CHCF_3$ | O |
| A-4556 | c-Pr | H | Me | F | $CH_2CH_2CH_2CH_2ON{=}C(Me)CF_3$ | O |
| A-4557 | c-Pr | H | Me | F | $CH_2CH_2CH_2CH_2CH_2ON{=}C(Me)CF_3$ | O |
| A-4558 | c-Pr | H | Me | F | $CH_2CH_2ON{=}CHPh$ | O |
| A-4559 | c-Pr | H | Me | F | $CH_2CH_2ON{=}CHPh(4\text{-}CF_3)$ | O |
| A-4560 | c-Pr | H | Me | F | $CH_2CH_2ON{=}CHPh(4\text{-}SCF_3)$ | O |
| A-4561 | c-Pr | H | Me | F | $CH_2CH_2CH_2ON{=}CHPh(3\text{-}CF_3)$ | O |
| A-4562 | c-Pr | H | Me | F | $CH_2CH_2CH_2ON{=}CHPh(4\text{-}CF_3)$ | O |
| A-4563 | c-Pr | H | Me | F | $CH_2CH_2CH_2ON{=}CHPh(4\text{-}SCF_3)$ | O |
| A-4564 | c-Pr | H | Me | F | $CH_2CH_2CH_2ON{=}C(Me)Ph(4\text{-}CF_3)$ | O |
| A-4565 | c-Pr | H | Me | F | $CH_2CH_2CH_2CH_2ON{=}CHPh(4\text{-}SCF_3)$ | O |
| A-4566 | c-Pr | H | Me | F | $CH_2CH_2$(adamant-1-yl) | O |
| A-4567 | c-Pr | H | Me | F | $CH_2CH_2CH_2(3\text{-}CF_3$-pyrazol-1-yl) | O |
| A-4568 | c-Pr | H | Me | F | $CH_2CH_2CH_2CH_2(3\text{-}CF_3$-pyrazol-1-yl) | O |
| A-4569 | c-Pr | H | Me | F | $CH_2CH_2CH_2CH_2CH_2(3\text{-}CF_3$-pyrazol-1-yl) | O |
| A-4570 | c-Pr | H | Me | F | $CH_2(1\text{-}Me\text{-}4\text{-}CF_3$-imidazol-5-yl) | O |

TABLE 105

| Compound Number | $R^1$ | $R^2$ | $R^3$ | $R^4$ | $R^5$ | A |
|---|---|---|---|---|---|---|
| A-4571 | c-Pr | H | Me | F | $CH_2CH_2(1\text{-}Me\text{-}4\text{-}CF_3$-imidazol-5-yl) | O |
| A-4572 | c-Pr | H | Me | F | $CH_2CH_2CH_2(1\text{-}Me\text{-}4\text{-}CF_3$-imidazol-5-yl) | O |
| A-4573 | c-Pr | H | Me | F | $CH_2CH_2CH_2(3\text{-}CF_3$-1,2,4-triazol-1-yl) | O |
| A-4574 | c-Pr | H | Me | F | $CH_2CH_2CH_2CH_2(3\text{-}CF_3$-1,2,4-triazol-1-yl) | O |
| A-4575 | c-Pr | H | Me | F | $CH_2CH_2CH_2CH_2CH_2(3\text{-}CF_3$-1,2,4-triazol-1-yl) | O |
| A-4576 | c-Pr | H | Me | F | $CH_2CH_2CH_2(4\text{-}CF_3$-thiazol-2-yl) | O |
| A-4577 | c-Pr | H | Me | F | $CH_2CH_2CH_2CH_2(4\text{-}CF_3$-thiazol-2-yl) | O |
| A-4578 | c-Pr | H | Me | F | $CH_2CH_2CH_2CH_2CH_2(4\text{-}CF_3$-thiazol-2-yl) | O |
| A-4579 | c-Pr | H | Me | F | $CH_2CH_2CH_2(2\text{-}CF_3$-pyridin-5-yl) | O |
| A-4580 | c-Pr | H | Me | F | $CH_2CH_2CH_2CH_2(2\text{-}CF_3$-pyridin-5-yl) | O |
| A-4581 | c-Pr | H | Me | F | $CH_2CH_2CH_2CH_2CH_2(2\text{-}CF_3$-pyridin-5-yl) | O |
| A-4582 | c-Pr | H | Me | F | $CH_2(4\text{-}CF_3$-pyrimidin-2-yl) | O |
| A-4583 | c-Pr | H | Me | F | $CH_2CH_2(4\text{-}CF_3$-pyrimidin-2-yl) | O |
| A-4584 | c-Pr | H | Me | F | $CH_2CH_2CH_2(4\text{-}CF_3$-pyrimidin-2-yl) | O |
| A-4585 | c-Pr | H | Me | F | $CH_2CH_2O(3\text{-}Cl\text{-}5\text{-}CF_3$-pyridin-2-yl) | O |
| A-4586 | c-Pr | H | Me | F | $CH_2CH_2CH_2O(3\text{-}Cl\text{-}5\text{-}CF_3$-pyridin-2-yl) | O |
| A-4587 | c-Pr | H | Me | F | $CH_2CH_2CH_2CH_20(3\text{-}Cl\text{-}5\text{-}CF_3$-pyridin-2-yl) | O |
| A-4588 | c-Pr | H | Me | F | $CH_2CH_2CH_2CH_2CH_20(3\text{-}Cl\text{-}5\text{-}CF_3$-pyridin-2-yl) | O |
| A-4589 | c-Pr | H | Me | F | $CH_2CH_2N$(Phth) | O |
| A-4590 | c-Pr | H | Me | F | $CH_2CH_2CH_2N$(Phth) | O |
| A-4591 | c-Pr | H | Me | F | $CH_2CH_2CH_2CH_2N$(Phth) | O |
| A-4592 | c-Pr | H | Me | F | $CH_2CH_2CH_2CH_2CH_2N$(Phth) | O |
| A-4593 | c-Pr | H | Me | F | $CH_2CH(Me)CH_2N$(Phth) | O |

TABLE 105-continued

| Compound Number | $R^1$ | $R^2$ | $R^3$ | $R^4$ | $R^5$ | A |
|---|---|---|---|---|---|---|
| A-4594 | c-Pr | H | Me | F | $CH_2$[1,3-dioxolan(2-$CF_3$)-2-yl] | O |
| A-4595 | c-Pr | H | Me | F | $CH_2$(azetidin-3-yl) | O |
| A-4596 | c-Pr | H | Me | F | $CH_2$(pyrrolidin-3-yl) | O |
| A-4597 | c-Pr | H | Me | F | $CH_2$(piperidin-3-yl) | O |
| A-4598 | c-Pr | H | Me | F | $CH_2${azetidin[1-C(═O)O(t-Bu)]-3-yl} | O |
| A-4599 | c-Pr | H | Me | F | $CH_2${pyrrolidin[1-C(═O)O(t-Bu)]-3-yl} | O |
| A-4600 | c-Pr | H | Me | F | $CH_2${piperidin[1-C(═O)O(t-Bu)]-3-yl} | O |
| A-4601 | c-Pr | H | Me | F | $CH_2${azetidin[1-C(═O)$CF_3$]-3-yl} | O |
| A-4602 | c-Pr | H | Me | F | $CH_2${azetidin[1-S(═O)$_2CF_3$]-3-yl} | O |
| A-4603 | c-Pr | H | Me | F | $CH_2${pyrrolidin[1-C(═O)$CF_3$]-3-yl} | O |
| A-4604 | c-Pr | H | Me | F | $CH_2${pyrrolidin[1-S(═O)$_2CF_3$]-3-yl} | O |
| A-4605 | c-Pr | H | Me | F | $CH_2${piperidin[1-C(═O)$CF_3$]-3-yl} | O |
| A-4606 | c-Pr | H | Me | F | $CH_2${piperidin[1-S(═O)$_2CF_3$]-3-yl} | O |
| A-4607 | c-Pr | H | Me | F | $CH_2CH_2CH_2CN$ | O |
| A-4608 | c-Pr | H | Me | F | $CH_2CH_2CH_2CH_2CN$ | O |
| A-4609 | c-Pr | H | Me | F | $CH_2CH_2CH_2CH_2CH_2CN$ | O |
| A-4610 | c-Pr | H | Me | F | $CH_2CH_2CH_2CH_2CH_2CH_2CN$ | O |
| A-4611 | c-Pr | H | Me | F | $CH_2CH_2CH_2C$(═O)OH | O |
| A-4612 | c-Pr | H | Me | F | $CH_2CH_2CH_2CH_2C$(═O)OH | O |
| A-4613 | c-Pr | H | Me | F | $CH_2CH_2CH_2CH_2CH_2C$(═O)OH | O |
| A-4614 | c-Pr | H | Me | F | $CH_2CH_2SCN$ | O |

TABLE 106

| Compound Number | $R^1$ | $R^2$ | $R^3$ | $R^4$ | $R^5$ | A |
|---|---|---|---|---|---|---|
| A-4615 | c-Pr | H | Me | F | $CH_2CH_2CH_2SCN$ | O |
| A-4616 | c-Pr | H | Me | F | $CH_2CH_2CH_2CH_2SCN$ | O |
| A-4617 | c-Pr | H | Me | F | $CH_2CH_2CH_2CH_2CH_2SCN$ | O |
| A-4618 | c-Pr | H | Me | Cl | $CH_2CH_2CH_2CH_2CH_2SCN$ | O |
| A-4619 | c-Pr | H | Me | F | $CH_2CH_2CH_2CH_2CH_2CH_2SCN$ | O |
| A-4620 | c-Pr | H | Me | F | $CH_2CH_2CH_2CH_2CH_2CH_2CH_2SCN$ | O |
| A-4621 | c-Pr | H | Me | F | $CH_2CH_2CH_2CH_2CH_2CH_2CH_2CH_2SCN$ | O |
| A-4622 | c-Pr | H | Me | F | $CH_2CH_2CH$(Me)SCN | O |
| A-4623 | c-Pr | H | Me | F | $CH_2CH$(Me)$CH_2SCN$ | O |
| A-4624 | c-Pr | H | Me | F | CH(Me)$CH_2CH_2SCN$ | O |
| A-4625 | c-Pr | H | Me | F | $CH_2CH_2CH_2CH$(Me)SCN | O |
| A-4626 | c-Pr | H | Me | F | $CH_2CH_2CH$(Me)$CH_2SCN$ | O |
| A-4627 | c-Pr | H | Me | F | $CH_2CH$(Me)$CH_2CH_2SCN$ | O |
| A-4628 | c-Pr | H | Me | F | CH(Me)$CH_2CH_2CH_2SCN$ | O |
| A-4629 | c-Pr | H | Me | F | $CH_2CH_2CH_2CH_2CH$(Me)SCN | O |
| A-4630 | c-Pr | H | Me | F | $CH_2CH_2CH_2CH$(Me)$CH_2SCN$ | O |
| A-4631 | c-Pr | H | Me | F | $CH_2CH_2CH$(Me)$CH_2CH_2SCN$ | O |
| A-4632 | c-Pr | H | Me | F | $CH_2CH$(Me)$CH_2CH_2CH_2SCN$ | O |
| A-4633 | c-Pr | H | Me | F | CH(Me)$CH_2CH_2CH_2CH_2SCN$ | O |
| A-4634 | c-Pr | H | Me | F | $CH_2CH_2ONH_2$ | O |
| A-4635 | c-Pr | H | Me | F | $CH_2CH_2CH_2ONH_2$ | O |
| A-4636 | c-Pr | H | Me | F | $CH_2CH_2CH_2CH_2ONH_2$ | O |
| A-4637 | c-Pr | H | Me | F | $CH_2CH_2CH_2CH_2CH_2ONH_2$ | O |
| A-4638 | c-Pr | H | Me | F | $CH_2CH_2CH_2CH_2CH_2CH_2ONH_2$ | O |
| A-4639 | $CH_2CF_3$ | H | Cl | H | $CH_2CH_2SCF_3$ | O |
| A-4640 | $CH_2CF_3$ | H | Cl | H | $CH_2CH_2CH_2SCF_3$ | O |
| A-4641 | $CH_2CF_3$ | H | Cl | H | $CH_2CH_2CH_2CH_2SCF_3$ | O |
| A-4642 | $CH_2CF_3$ | H | Cl | H | $CH_2CH_2CH_2CH_2CH_2SCF_3$ | O |
| A-4643 | $CH_2CF_3$ | H | Cl | H | $CH_2CH_2CH_2CH_2CH_2CH_2SCF_3$ | O |
| A-4644 | $CH_2CF_3$ | H | Cl | H | $CH_2CH_2CH_2CH_2CH_2CH_2CH_2SCF_3$ | O |
| A-4645 | $CH_2CF_3$ | H | Cl | H | $CH_2CH_2CH_2CH_2CH_2CH_2CH_2CH_2SCF_3$ | O |
| A-4646 | $CH_2CF_3$ | H | Cl | H | $CH_2CH_2NHS$(═O)$_2CF_3$ | O |
| A-4647 | $CH_2CF_3$ | H | Cl | H | $CH_2CH_2CH_2NHS$(═O)$_2CF_3$ | O |
| A-4648 | $CH_2CF_3$ | H | Cl | H | $CH_2CH_2CH_2CH_2NHS$(═O)$_2CF_3$ | O |
| A-4649 | $CH_2CF_3$ | H | Cl | H | $CH_2CH_2CH_2CH_2CH_2NHS$(═O)$_2CF_3$ | O |
| A-4650 | $CH_2CF_3$ | H | Cl | H | $CH_2CH_2N$(Me)S(═O)$_2CF_3$ | O |
| A-4651 | $CH_2CF_3$ | H | Cl | H | $CH_2CH_2N$(Et)S(═O)$_2CF_3$ | O |
| A-4652 | $CH_2CF_3$ | H | Cl | H | $CH_2CH_2N$($CH_2CN$)S(═O)$_2CF_3$ | O |
| A-4653 | $CH_2CF_3$ | H | Cl | H | $CH_2CH_2N$($CH_2OMe$)S(═O)$_2CF_3$ | O |
| A-4654 | $CH_2CF_3$ | H | Cl | H | $CH_2CH_2CH_2N$(Me)S(═O)$_2CF_3$ | O |
| A-4655 | $CH_2CF_3$ | H | Cl | H | $CH_2CH_2CH_2N$(Et)S(═O)$_2CF_3$ | O |
| A-4656 | $CH_2CF_3$ | H | Cl | H | $CH_2CH_2CH_2N$($CH_2CN$)S(═O)$_2CF_3$ | O |
| A-4657 | $CH_2CF_3$ | H | Cl | H | $CH_2CH_2CH_2N$($CH_2OMe$)S(═O)$_2CF_3$ | O |
| A-4658 | $CH_2CF_3$ | H | Cl | H | $CH_2CH_2CH_2CH_2N$(Me)S(═O)$_2CF_3$ | O |

TABLE 107

| Compound Number | $R^1$ | $R^2$ | $R^3$ | $R^4$ | $R^5$ | A |
|---|---|---|---|---|---|---|
| A-4659 | $CH_2CF_3$ | H | Cl | H | $CH_2CH_2CH_2CH_2N(Et)S({=}O)_2CF_3$ | O |
| A-4660 | $CH_2CF_3$ | H | Cl | H | $CH_2CH_2CH_2CH_2N(CH_2CN)S({=}O)_2CF_3$ | O |
| A-4661 | $CH_2CF_3$ | H | Cl | H | $CH_2CH_2CH_2CH_2N(CH_2OMe)S({=}O)_2CF_3$ | O |
| A-4662 | $CH_2CF_3$ | H | Me | H | $CH_2CH_2SCF_3$ | O |
| A-4663 | $CH_2CF_3$ | H | Me | H | $CH_2CH_2CH_2SCF_3$ | O |
| A-4664 | $CH_2CF_3$ | H | Me | H | $CH_2CH_2CH_2CH_2SCF_3$ | O |
| A-4665 | $CH_2CF_3$ | H | Me | H | $CH_2CH_2CH_2CH_2CH_2SCF_3$ | O |
| A-4666 | $CH_2CF_3$ | H | Me | H | $CH_2CH_2CH_2CH_2CH_2CH_2SCF_3$ | O |
| A-4667 | $CH_2CF_3$ | H | Me | H | $CH_2CH_2CH_2CH_2CH_2CH_2CH_2SCF_3$ | O |
| A-4668 | $CH_2CF_3$ | H | Me | H | $CH_2CH_2CH_2CH_2CH_2CH_2CH_2CH_2SCF_3$ | O |
| A-4669 | $CH_2CF_3$ | H | Me | H | $CH_2CH_2NHS({=}O)_2CF_3$ | O |
| A-4670 | $CH_2CF_3$ | H | Me | H | $CH_2CH_2CH_2NHS({=}O)_2CF_3$ | O |
| A-4671 | $CH_2CF_3$ | H | Me | H | $CH_2CH_2CH_2CH_2NHS({=}O)_2CF_3$ | O |
| A-4672 | $CH_2CF_3$ | H | Me | H | $CH_2CH_2CH_2CH_2CH_2NHS({=}O)_2CF_3$ | O |
| A-4673 | $CH_2CF_3$ | H | Me | H | $CH_2CH_2N(Me)S({=}O)_2CF_3$ | O |
| A-4674 | $CH_2CF_3$ | H | Me | H | $CH_2CH_2N(Et)S({=}O)_2CF_3$ | O |
| A-4675 | $CH_2CF_3$ | H | Me | H | $CH_2CH_2N(CH_2CN)S({=}O)_2CF_3$ | O |
| A-4676 | $CH_2CF_3$ | H | Me | H | $CH_2CH_2N(CH_2OMe)S({=}O)_2CF_3$ | O |
| A-4677 | $CH_2CF_3$ | H | Me | H | $CH_2CH_2CH_2N(Me)S({=}O)_2CF_3$ | O |
| A-4678 | $CH_2CF_3$ | H | Me | H | $CH_2CH_2CH_2N(Et)S({=}O)_2CF_3$ | O |
| A-4679 | $CH_2CF_3$ | H | Me | H | $CH_2CH_2CH_2N(CH_2CN)S({=}O)_2CF_3$ | O |
| A-4680 | $CH_2CF_3$ | H | Me | H | $CH_2CH_2CH_2N(CH_2OMe)S({=}O)_2CF_3$ | O |
| A-4681 | $CH_2CF_3$ | H | Me | H | $CH_2CH_2CH_2CH_2N(Me)S({=}O)_2CF_3$ | O |
| A-4682 | $CH_2CF_3$ | H | Me | H | $CH_2CH_2CH_2CH_2N(Et)S({=}O)_2CF_3$ | O |
| A-4683 | $CH_2CF_3$ | H | Me | H | $CH_2CH_2CH_2CH_2N(CH_2CN)S({=}O)_2CF_3$ | O |
| A-4684 | $CH_2CF_3$ | H | Me | H | $CH_2CH_2CH_2CH_2N(CH_2OMe)S({=}O)_2CF_3$ | O |
| A-4685 | $CH_2CF_3$ | H | Cl | F | $CH_2CH_2SCF_3$ | O |
| A-4686 | $CH_2CF_3$ | H | Cl | F | $CH_2CH_2CH_2SCF_3$ | O |
| A-4687 | $CH_2CF_3$ | H | Cl | F | $CH_2CH_2CH_2CH_2SCF_3$ | O |
| A-4688 | $CH_2CF_3$ | H | F | F | $CH_2CH_2CH_2CH_2CH_2SCF_3$ | O |
| A-4689 | $CH_2CF_3$ | H | Cl | F | $CH_2CH_2CH_2CH_2CH_2SCF_3$ | O |
| A-4690 | $CH_2CF_3$ | H | Cl | F | $CH_2CH_2CH_2CH_2CH_2CH_2SCF_3$ | O |
| A-4691 | $CH_2CF_3$ | H | Cl | F | $CH_2CH_2CH_2CH_2CH_2CH_2CH_2SCF_3$ | O |
| A-4692 | $CH_2CF_3$ | H | Cl | F | $CH_2CH_2CH_2CH_2CH_2CH_2CH_2CH_2SCF_3$ | O |
| A-4693 | $CH_2CF_3$ | H | Cl | F | $CH_2CH_2NHS({=}O)_2CF_3$ | O |
| A-4694 | $CH_2CF_3$ | H | Cl | F | $CH_2CH_2CH_2NHS({=}O)_2CF_3$ | O |
| A-4695 | $CH_2CF_3$ | H | Cl | F | $CH_2CH_2CH_2CH_2NHS({=}O)_2CF_3$ | O |
| A-4696 | $CH_2CF_3$ | H | Cl | F | $CH_2CH_2CH_2CH_2CH_2NHS({=}O)_2CF_3$ | O |
| A-4697 | $CH_2CF_3$ | H | Cl | F | $CH_2CH_2N(Me)S({=}O)_2CF_3$ | O |
| A-4698 | $CH_2CF_3$ | H | Cl | F | $CH_2CH_2N(Et)S({=}O)_2CF_3$ | O |
| A-4699 | $CH_2CF_3$ | H | Cl | F | $CH_2CH_2N(CH_2CN)S({=}O)_2CF_3$ | O |
| A-4700 | $CH_2CF_3$ | H | Cl | F | $CH_2CH_2N(CH_2OMe)S({=}O)_2CF_3$ | O |
| A-4701 | $CH_2CF_3$ | H | Cl | F | $CH_2CH_2CH_2N(Me)S({=}O)_2CF_3$ | O |
| A-4702 | $CH_2CF_3$ | H | Cl | F | $CH_2CH_2CH_2N(Et)S({=}O)_2CF_3$ | O |

TABLE 108

| CCompound Number | $R^1$ | $R^2$ | $R^3$ | $R^4$ | $R^5$ | A |
|---|---|---|---|---|---|---|
| A-4703 | $CH_2CF_3$ | H | Cl | F | $CH_2CH_2CH_2N(CH_2CN)S({=}O)_2CF_3$ | O |
| A-4704 | $CH_2CF_3$ | H | Cl | F | $CH_2CH_2CH_2N(CH_2OMe)S({=}O)_2CF_3$ | O |
| A-4705 | $CH_2CF_3$ | H | Cl | F | $CH_2CH_2CH_2CH_2N(Me)S({=}O)_2CF_3$ | O |
| A-4706 | $CH_2CF_3$ | H | Cl | F | $CH_2CH_2CH_2CH_2N(Et)S({=}O)_2CF_3$ | O |
| A-4707 | $CH_2CF_3$ | H | Cl | F | $CH_2CH_2CH_2CH_2N(CH_2CN)S({=}O)_2CF_3$ | O |
| A-4708 | $CH_2CF_3$ | H | Cl | F | $CH_2CH_2CH_2CH_2N(CH_2OMe)S({=}O)_2CF_3$ | O |
| A-4709 | $CH_2CF_3$ | H | Me | F | $CH_2CH_2SCF_3$ | O |
| A-4710 | $CH_2CF_3$ | H | Me | F | $CH_2CH_2CH_2SCF_3$ | O |
| A-4711 | $CH_2CF_3$ | H | Me | F | $CH_2CH_2CH_2CH_2SCF_3$ | O |
| A-4712 | $CH_2CF_3$ | H | Me | F | $CH_2CH_2CH_2CH_2CH_2SCF_3$ | O |
| A-4713 | $CH_2CF_3$ | H | Me | F | $CH_2CH_2CH_2CH_2CH_2CH_2SCF_3$ | O |
| A-4714 | $CH_2CF_3$ | H | Me | F | $CH_2CH_2CH_2CH_2CH_2CH_2CH_2SCF_3$ | O |
| A-4715 | $CH_2CF_3$ | H | Me | F | $CH_2CH_2CH_2CH_2CH_2CH_2CH_2CH_2SCF_3$ | O |
| A-4716 | $CH_2CF_3$ | H | Me | F | $CH_2CH_2NHS({=}O)_2CF_3$ | O |
| A-4717 | $CH_2CF_3$ | H | Me | F | $CH_2CH_2CH_2NHS({=}O)_2CF_3$ | O |
| A-4718 | $CH_2CF_3$ | H | Me | F | $CH_2CH_2CH_2CH_2NHS({=}O)_2CF_3$ | O |
| A-4719 | $CH_2CF_3$ | H | Me | F | $CH_2CH_2CH_2CH_2CH_2NHS({=}O)_2CF_3$ | O |
| A-4720 | $CH_2CF_3$ | H | Me | F | $CH_2CH_2N(Me)S({=}O)_2CF_3$ | O |
| A-4721 | $CH_2CF_3$ | H | Me | F | $CH_2CH_2N(Et)S({=}O)_2CF_3$ | O |
| A-4722 | $CH_2CF_3$ | H | Me | F | $CH_2CH_2N(CH_2CN)S({=}O)_2CF_3$ | O |
| A-4723 | $CH_2CF_3$ | H | Me | F | $CH_2CH_2N(CH_2OMe)S({=}O)_2CF_3$ | O |

TABLE 108-continued

| CCompound Number | $R^1$ | $R^2$ | $R^3$ | $R^4$ | $R^5$ | A |
|---|---|---|---|---|---|---|
| A-4724 | $CH_2CF_3$ | H | Me | F | $CH_2CH_2CH_2N(Me)S(=O)_2CF_3$ | O |
| A-4725 | $CH_2CF_3$ | H | Me | F | $CH_2CH_2CH_2N(Et)S(=O)_2CF_3$ | O |
| A-4726 | $CH_2CF_3$ | H | Me | F | $CH_2CH_2CH_2N(CH_2CN)S(=O)_2CF_3$ | O |
| A-4727 | $CH_2CF_3$ | H | Me | F | $CH_2CH_2CH_2N(CH_2OMe)S(=O)_2CF_3$ | O |
| A-4728 | $CH_2CF_3$ | H | Me | F | $CH_2CH_2CH_2CH_2N(Me)S(=O)_2CF_3$ | O |
| A-4729 | $CH_2CF_3$ | H | Me | F | $CH_2CH_2CH_2CH_2N(Et)S(=O)_2CF_3$ | O |
| A-4730 | $CH_2CF_3$ | H | Me | F | $CH_2CH_2CH_2CH_2N(CH_2CN)S(=O)_2CF_3$ | O |
| A-4731 | $CH_2CF_3$ | H | Me | F | $CH_2CH_2CH_2CH_2N(CH_2OMe)S(=O)_2CF_3$ | O |
| A-4732 | $CH_2CF_3$ | H | Cl | Cl | $CH_2CH_2SCF_3$ | O |
| A-4733 | $CH_2CF_3$ | H | Cl | Cl | $CH_2CH_2CH_2SCF_3$ | O |
| A-4734 | $CH_2CF_3$ | H | Cl | Cl | $CH_2CH_2CH_2CH_2SCF_3$ | O |
| A-4735 | $CH_2CF_3$ | H | Cl | Cl | $CH_2CH_2CH_2CH_2CH_2SCF_3$ | O |
| A-4736 | $CH_2CF_3$ | H | Cl | Cl | $CH_2CH_2CH_2CH_2CH_2CH_2SCF_3$ | O |
| A-4737 | $CH_2CF_3$ | H | Cl | Cl | $CH_2CH_2CH_2CH_2CH_2CH_2CH_2SCF_3$ | O |
| A-4738 | $CH_2CF_3$ | H | Cl | Cl | $CH_2CH_2CH_2CH_2CH_2CH_2CH_2CH_2SCF_3$ | O |
| A-4739 | $CH_2CF_3$ | H | Cl | Cl | $CH_2CH_2NHS(=O)_2CF_3$ | O |
| A-4740 | $CH_2CF_3$ | H | Cl | Cl | $CH_2CH_2CH_2NHS(=O)_2CF_3$ | O |
| A-4741 | $CH_2CF_3$ | H | Cl | Cl | $CH_2CH_2CH_2CH_2NHS(=O)_2CF_3$ | O |
| A-4742 | $CH_2CF_3$ | H | Cl | Cl | $CH_2CH_2CH_2CH_2CH_2NHS(=O)_2CF_3$ | O |
| A-4743 | $CH_2CF_3$ | H | Cl | Cl | $CH_2CH_2N(Me)S(=O)_2CF_3$ | O |
| A-4744 | $CH_2CF_3$ | H | Cl | Cl | $CH_2CH_2N(Et)S(=O)_2CF_3$ | O |
| A-4745 | $CH_2CF_3$ | H | Cl | Cl | $CH_2CH_2N(CH_2CN)S(=O)_2CF_3$ | O |
| A-4746 | $CH_2CF_3$ | H | Cl | Cl | $CH_2CH_2N(CH_2OMe)S(=O)_2CF_3$ | O |

TABLE 109

| Compound Number | $R^1$ | $R^2$ | $R^3$ | $R^4$ | $R^5$ | A |
|---|---|---|---|---|---|---|
| A-4747 | $CH_2CF_3$ | H | Cl | Cl | $CH_2CH_2CH_2N(Me)S(=O)_2CF_3$ | O |
| A-4748 | $CH_2CF_3$ | H | Cl | Cl | $CH_2CH_2CH_2N(Et)S(=O)_2CF_3$ | O |
| A-4749 | $CH_2CF_3$ | H | Cl | Cl | $CH_2CH_2CH_2N(CH_2CN)_2(=O)_2CF_3$ | O |
| A-4750 | $CH_2CF_3$ | H | Cl | Cl | $CH_2CH_2CH_2N(CH_2OMe)S(=O)_2CF_3$ | O |
| A-4751 | $CH_2CF_3$ | H | Cl | Cl | $CH_2CH_2CH_2CH_2N(Me)S(=O)_2CF_3$ | O |
| A-4752 | $CH_2CF_3$ | H | Cl | Cl | $CH_2CH_2CH_2CH_2N(Et)S(=O)_2CF_3$ | O |
| A-4753 | $CH_2CF_3$ | H | Cl | Cl | $CH_2CH_2CH_2CH_2N(CH_2CN)S(=O)_2CF_3$ | O |
| A-4754 | $CH_2CF_3$ | H | Cl | Cl | $CH_2CH_2CH_2CH_2N(CH_2OMe)S(=O)_2CF_3$ | O |
| A-4755 | $CH_2CF_3$ | H | Me | Cl | $CH_2CH_2SCF_3$ | O |
| A-4756 | $CH_2CF_3$ | H | Me | Cl | $CH_2CH_2CH_2SCF_3$ | O |
| A-4757 | $CH_2CF_3$ | H | Me | Cl | $CH_2CH_2CH_2CH_2SCF_3$ | O |
| A-4758 | $CH_2CF_3$ | H | Me | Cl | $CH_2CH_2CH_2CH_2CH_2SCF_3$ | O |
| A-4759 | $CH_2CF_3$ | H | Me | Cl | $CH_2CH_2CH_2CH_2CH_2CH_2SCF_3$ | O |
| A-4760 | $CH_2CF_3$ | H | Me | Cl | $CH_2CH_2CH_2CH_2CH_2CH_2CH_2SCF_3$ | O |
| A-4761 | $CH_2CF_3$ | H | Me | Cl | $CH_2CH_2CH_2CH_2CH_2CH_2CH_2CH_2SCF_3$ | O |
| A-4762 | $CH_2CF_3$ | H | Me | Cl | $CH_2CH_2NHS(=O)_2CF_3$ | O |
| A-4763 | $CH_2CF_3$ | H | Me | Cl | $CH_2CH_2CH_2NHS(=O)_2CF_3$ | O |
| A-4764 | $CH_2CF_3$ | H | Me | Cl | $CH_2CH_2CH_2CH_2NHS(=O)_2CF_3$ | O |
| A-4765 | $CH_2CF_3$ | H | Me | Cl | $CH_2CH_2CH_2CH_2CH_2NHS(=O)_2CF_3$ | O |
| A-4766 | $CH_2CF_3$ | H | Me | Cl | $CH_2CH_2N(Me)S(=O)_2CF_3$ | O |
| A-4767 | $CH_2CF_3$ | H | Me | Cl | $CH_2CH_2N(Et)S(=O)_2CF_3$ | O |
| A-4768 | $CH_2CF_3$ | H | Me | Cl | $CH_2CH_2N(CH_2CN)S(=O)_2CF_3$ | O |
| A-4769 | $CH_2CF_3$ | H | Me | Cl | $CH_2CH_2N(CH_2OMe)S(=O)_2CF_3$ | O |
| A-4770 | $CH_2CF_3$ | H | Me | Cl | $CH_2CH_2CH_2N(Me)S(=O)_2CF_3$ | O |
| A-4771 | $CH_2CF_3$ | H | Me | Cl | $CH_2CH_2CH_2N(Et)S(=O)_2CF_3$ | O |
| A-4772 | $CH_2CF_3$ | H | Me | Cl | $CH_2CH_2CH_2N(CH_2CN)S(=O)_2CF_3$ | O |
| A-4773 | $CH_2CF_3$ | H | Me | Cl | $CH_2CH_2CH_2N(CH_2OMe)S(=O)_2CF_3$ | O |
| A-4774 | $CH_2CF_3$ | H | Me | Cl | $CH_2CH_2CH_2CH_2N(Me)S(=O)_2CF_3$ | O |
| A-4775 | $CH_2CF_3$ | H | Me | Cl | $CH_2CH_2CH_2CH_2N(Et)S(=O)_2CF_3$ | O |
| A-4776 | $CH_2CF_3$ | H | Me | Cl | $CH_2CH_2CH_2CH_2N(CH_2CN)S(=O)_2CF_3$ | O |
| A-4777 | $CH_2CF_3$ | H | Me | Cl | $CH_2CH_2CH_2CH_2N(CH_2OMe)S(=O)_2CF_3$ | O |
| A-4778 | $CH_2CF_3$ | H | Me | Me | $CH_2CH_2SCF_3$ | O |
| A-4779 | $CH_2CF_3$ | H | Me | Me | $CH_2CH_2CH_2SCF_3$ | O |
| A-4780 | $CH_2CF_3$ | H | Me | Me | $CH_2CH_2CH_2CH_2SCF_3$ | O |
| A-4781 | $CH_2CF_3$ | H | Me | Me | $CH_2CH_2CH_2CH_2CH_2SCF_3$ | O |
| A-4782 | $CH_2CF_3$ | H | Me | Me | $CH_2CH_2CH_2CH_2CH_2CH_2SCF_3$ | O |
| A-4783 | $CH_2CF_3$ | H | Me | Me | $CH_2CH_2CH_2CH_2CH_2CH_2CH_2SCF_3$ | O |
| A-4784 | $CH_2CF_3$ | H | Me | Me | $CH_2CH_2CH_2CH_2CH_2CH_2CH_2CH_2SCF_3$ | O |
| A-4785 | $CH_2CF_3$ | H | Me | Me | $CH_2CH_2NHS(=O)_2CF_3$ | O |
| A-4786 | $CH_2CF_3$ | H | Me | Me | $CH_2CH_2CH_2NHS(=O)_2CF_3$ | O |
| A-4787 | $CH_2CF_3$ | H | Me | Me | $CH_2CH_2CH_2CH_2NHS(=O)_2CF_3$ | O |

TABLE 109-continued

| Compound Number | $R^1$ | $R^2$ | $R^3$ | $R^4$ | $R^5$ | A |
|---|---|---|---|---|---|---|
| A-4788 | $CH_2CF_3$ | H | Me | Me | $CH_2CH_2CH_2CH_2CH_2NHS(=O)_2CF_3$ | O |
| A-4789 | $CH_2CF_3$ | H | Me | Me | $CH_2CH_2N(Me)S(=O)_2CF_3$ | O |
| A-4790 | $CH_2CF_3$ | H | Me | Me | $CH_2CH_2N(Et)S(=O)_2CF_3$ | O |

TABLE 110

| Compound Number | $R^1$ | $R^2$ | $R^3$ | $R^4$ | $R^5$ | A |
|---|---|---|---|---|---|---|
| A-4791 | $CH_2CF_3$ | H | Me | Me | $CH_2CH_2N(CH_2CN)S(=O)_2CF_3$ | O |
| A-4792 | $CH_2CF_3$ | H | Me | Me | $CH_2CH_2N(CH_2OMe)S(=O)_2CF_3$ | O |
| A-4793 | $CH_2CF_3$ | H | Me | Me | $CH_2CH_2CH_2N(Me)S(=O)_2CF_3$ | O |
| A-4794 | $CH_2CF_3$ | H | Me | Me | $CH_2CH_2CH_2N(Et)S(=O)_2CF_3$ | O |
| A-4795 | $CH_2CF_3$ | H | Me | Me | $CH_2CH_2CH_2N(CH_2CN)S(=O)_2CF_3$ | O |
| A-4796 | $CH_2CF_3$ | H | Me | Me | $CH_2CH_2CH_2N(CH_2OMe)S(=O)_2CF_3$ | O |
| A-4797 | $CH_2CF_3$ | H | Me | Me | $CH_2CH_2CH_2CH_2N(Me)S(=O)_2CF_3$ | O |
| A-4798 | $CH_2CF_3$ | H | Me | Me | $CH_2CH_2CH_2CH_2N(Et)S(=O)_2CF_3$ | O |
| A-4799 | $CH_2CF_3$ | H | Me | Me | $CH_2CH_2CH_2CH_2N(CH_2CN)S(=O)_2CF_3$ | O |
| A-4800 | $CH_2CF_3$ | H | Me | Me | $CH_2CH_2CH_2CH_2N(CH_2OMe)S(=O)_2CF_3$ | O |
| A-4801 | Et | H | Cl | H | $CH_2CH_2SCF_3$ | O |
| A-4802 | Et | H | Cl | H | $CH_2CH_2CH_2SCF_3$ | O |
| A-4803 | Et | H | Cl | H | $CH_2CH_2CH_2CH_2SCF_3$ | O |
| A-4804 | Et | H | Cl | H | $CH_2CH_2CH_2CH_2CH_2SCF_3$ | O |
| A-4805 | Et | H | Cl | H | $CH_2CH_2CH_2CH_2CH_2CH_2SCF_3$ | O |
| A-4806 | Et | H | Cl | H | $CH_2CH_2CH_2CH_2CH_2CH_2CH_2SCF_3$ | O |
| A-4807 | Et | H | Cl | H | $CH_2CH_2CH_2CH_2CH_2CH_2CH_2CH_2SCF_3$ | O |
| A-4808 | Et | H | Cl | H | $CH_2CH_2NHS(=O)_2CF_3$ | O |
| A-4809 | Et | H | Cl | H | $CH_2CH_2CH_2NHS(=O)_2CF_3$ | O |
| A-4810 | Et | H | Cl | H | $CH_2CH_2CH_2CH_2NHS(=O)_2CF_3$ | O |
| A-4811 | Et | H | Cl | H | $CH_2CH_2CH_2CH_2CH_2NHS(=O)_2CF_3$ | O |
| A-4812 | Et | H | Cl | H | $CH_2CH_2N(Me)S(=O)_2CF_3$ | O |
| A-4813 | Et | H | Cl | H | $CH_2CH_2N(Et)S(=O)_2CF_3$ | O |
| A-4814 | Et | H | Cl | H | $CH_2CH_2N(CH_2CN)S(=O)_2CF_3$ | O |
| A-4815 | Et | H | Cl | H | $CH_2CH_2N(CH_2OMe)S(=O)_2CF_3$ | O |
| A-4816 | Et | H | Cl | H | $CH_2CH_2CH_2N(Me)S(=O)_2CF_3$ | O |
| A-4817 | Et | H | Cl | H | $CH_2CH_2CH_2N(Et)S(=O)_2CF_3$ | O |
| A-4818 | Et | H | Cl | H | $CH_2CH_2CH_2N(CH_2CN)S(=O)_2CF_3$ | O |
| A-4819 | Et | H | Cl | H | $CH_2CH_2CH_2N(CH_2OMe)S(=O)_2CF_3$ | O |
| A-4820 | Et | H | Cl | H | $CH_2CH_2CH_2CH_2N(Me)S(=O)_2CF_3$ | O |
| A-4821 | Et | H | Cl | H | $CH_2CH_2CH_2CH_2N(Et)S(=O)_2CF_3$ | O |
| A-4822 | Et | H | Cl | H | $CH_2CH_2CH_2CH_2N(CH_2CN)S(=O)_2CF_3$ | O |
| A-4823 | Et | H | Cl | H | $CH_2CH_2CH_2CH_2N(CH_2OMe)S(=O)_2CF_3$ | O |
| A-4824 | Et | H | Me | H | $CH_2CH_2SCF_3$ | O |
| A-4825 | Et | H | Me | H | $CH_2CH_2CH_2SCF_3$ | O |
| A-4826 | Et | H | Me | H | $CH_2CH_2CH_2CH_2SCF_3$ | O |
| A-4827 | Et | H | Me | H | $CH_2CH_2CH_2CH_2CH_2SCF_3$ | O |
| A-4828 | Et | H | Me | H | $CH_2CH_2CH_2CH_2CH_2CH_2SCF_3$ | O |
| A-4829 | Et | H | Me | H | $CH_2CH_2CH_2CH_2CH_2CH_2CH_2SCF_3$ | O |
| A-4830 | Et | H | Me | H | $CH_2CH_2CH_2CH_2CH_2CH_2CH_2CH_2SCF_3$ | O |
| A-4831 | Et | H | Me | H | $CH_2CH_2NHS(=O)_2CF_3$ | O |
| A-4832 | Et | H | Me | H | $CH_2CH_2CH_2NHS(=O)_2CF_3$ | O |
| A-4833 | Et | H | Me | H | $CH_2CH_2CH_2CH_2NHS(=O)_2CF_3$ | O |
| A-4834 | Et | H | Me | H | $CH2CH_2CH_2CH_2CH_2NHS(=O)_2CF_3$ | O |

TABLE 111

| Compound Number | $R^1$ | $R^2$ | $R^3$ | $R^4$ | $R^5$ | A |
|---|---|---|---|---|---|---|
| A-4835 | Et | H | Me | H | $CH_2CH_2N(Me)S(=O)_2CF_3$ | O |
| A-4836 | Et | H | Me | H | $CH_2CH_2N(Et)S(=O)_2CF_3$ | O |
| A-4837 | Et | H | Me | H | $CH_2CH_2N(CH_2CN)S(=O)_2CF_3$ | O |
| A-4838 | Et | H | Me | H | $CH_2CH_2N(CH_2OMe)S(=O)_2CF_3$ | O |
| A-4839 | Et | H | Me | H | $CH_2CH_2CH_2N(Me)S(=O)_2CF_3$ | O |
| A-4840 | Et | H | Me | H | $CH_2CH_2CH_2N(Et)S(=O)_2CF_3$ | O |
| A-4841 | Et | H | Me | H | $CH_2CH_2CH_2N(CH_2CN)S(=O)_2CF_3$ | O |
| A-4842 | Et | H | Me | H | $CH_2CH_2CH_2N(CH_2OMe)S(=O)_2CF_3$ | O |
| A-4843 | Et | H | Me | H | $CH_2CH_2CH_2CH_2N(Me)S(=O)_2CF_3$ | O |

TABLE 111-continued

| Compound Number | $R^1$ | $R^2$ | $R^3$ | $R^4$ | $R^5$ | A |
|---|---|---|---|---|---|---|
| A-4844 | Et | H | Me | H | $CH_2CH_2CH_2CH_2N(Et)S(=O)_2CF_3$ | O |
| A-4845 | Et | H | Me | H | $CH_2CH_2CH_2CH_2N(CH_2CN)S(=O)_2CF_3$ | O |
| A-4846 | Et | H | Me | H | $CH_2CH_2CH_2CH_2N(CH_2OMe)S(=O)_2CF_3$ | O |
| A-4847 | Et | H | Cl | F | $CH_2CH_2SCF_3$ | O |
| A-4848 | Et | H | Cl | F | $CH_2CH_2CH_2SCF_3$ | O |
| A-4849 | Et | H | Cl | F | $CH_2CH_2CH_2CH_2SCF_3$ | O |
| A-4850 | Et | H | Cl | F | $CH_2CH_2CH_2CH_2CH_2SCF_3$ | O |
| A-4851 | Et | H | Cl | F | $CH_2CH_2CH_2CH_2CH_2CH_2SCF_3$ | O |
| A-4852 | Et | H | Cl | F | $CH_2CH_2CH_2CH_2CH_2CH_2CH_2SCF_3$ | O |
| A-4853 | Et | H | Cl | F | $CH_2CH_2CH_2CH_2CH_2CH_2CH_2CH_2SCF_3$ | O |
| A-4854 | Et | H | Cl | F | $CH_2CH_2NHS(=O)_2CF_3$ | O |
| A-4855 | Et | H | Cl | F | $CH_2CH_2CH_2NHS(=O)_2CF_3$ | O |
| A-4856 | Et | H | Cl | F | $CH_2CH_2CH_2CH_2NHS(=O)_2CF_3$ | O |
| A-4857 | Et | H | Cl | F | $CH_2CH_2CH_2CH_2CH_2NHS(=O)_2CF_3$ | O |
| A-4858 | Et | H | Cl | F | $CH_2CH_2N(Me)S(=O)_2CF_3$ | O |
| A-4859 | Et | H | Cl | F | $CH_2CH_2N(Et)S(=O)_2CF_3$ | O |
| A-4860 | Et | H | Cl | F | $CH_2CH_2N(CH_2CN)S(=O)_2CF_3$ | O |
| A-4861 | Et | H | Cl | F | $CH_2CH_2N(CH_2OMe)S(=O)_2CF_3$ | O |
| A-4862 | Et | H | Cl | F | $CH_2CH_2CH_2N(Me)S(=O)_2CF_3$ | O |
| A-4863 | Et | H | Cl | F | $CH_2CH_2CH_2N(Et)S(=O)_2CF_3$ | O |
| A-4864 | Et | H | Cl | F | $CH_2CH_2CH_2N(CH_2CN)S(=O)_2CF_3$ | O |
| A-4865 | Et | H | Cl | F | $CH_2CH_2CH_2N(CH_2OMe)S(=O)_2CF_3$ | O |
| A-4866 | Et | H | Cl | F | $CH_2CH_2CH_2CH_2N(Me)S(=O)_2CF_3$ | O |
| A-4867 | Et | H | Cl | F | $CH_2CH_2CH_2CH_2N(Et)S(=O)_2CF_3$ | O |
| A-4868 | Et | H | Cl | F | $CH_2CH_2CH_2CH_2N(CH_2CN)S(=O)_2CF_3$ | O |
| A-4869 | Et | H | Cl | F | $CH_2CH_2CH_2CH_2N(CH_2OMe)S(=O)_2CF_3$ | O |
| A-4870 | Et | H | Me | F | $CH_2CH_2SCF_3$ | O |
| A-4871 | Et | H | Me | F | $CH_2CH_2CH_2SCF_3$ | O |
| A-4872 | Et | H | Me | F | $CH_2CH_2CH_2CH_2SCF_3$ | O |
| A-4873 | Et | H | Me | F | $CH_2CH_2CH_2CH_2CH_2SCF_3$ | O |
| A-4874 | Et | H | Me | F | $CH_2CH_2CH_2CH_2CH_2CH_2SCF_3$ | O |
| A-4875 | Et | H | Me | F | $CH_2CH_2CH_2CH_2CH_2CH_2CH_2SCF_3$ | O |
| A-4876 | Et | H | Me | F | $CH_2CH_2CH_2CH_2CH_2CH_2CH_2CH_2SCF_3$ | O |
| A-4877 | Et | H | Me | F | $CH_2CH_2NHS(=O)_2CF_3$ | O |
| A-4878 | Et | H | Me | F | $CH_2CH_2CH_2NHS(=O)_2CF_3$ | O |

TABLE 112

| Compound Number | $R^1$ | $R^2$ | $R^3$ | $R^4$ | $R^5$ | A |
|---|---|---|---|---|---|---|
| A-4879 | Et | H | Me | F | $CH_2CH_2CH_2CH_2NHS(=O)_2CF_3$ | O |
| A-4880 | Et | H | Me | F | $CH_2CH_2CH_2CH_2CH_2NHS(=O)_2CF_3$ | O |
| A-4881 | Et | H | Me | F | $CH_2CH_2N(Me)S(=O)_2CF_3$ | O |
| A-4882 | Et | H | Me | F | $CH_2CH_2N(Et)S(=O)_2CF_3$ | O |
| A-4883 | Et | H | Me | F | $CH_2CH_2N(CH_2CN)S(=O)_2CF_3$ | O |
| A-4884 | Et | H | Me | F | $CH_2CH_2N(CH_2OMe)S(=O)_2CF_3$ | O |
| A-4885 | Et | H | Me | F | $CH_2CH_2CH_2N(Me)S(=O)_2CF_3$ | O |
| A-4886 | Et | H | Me | F | $CH_2CH_2CH_2N(Et)S(=O)_2CF_3$ | O |
| A-4887 | Et | H | Me | F | $CH_2CH_2CH_2N(CH_2CN)S(=O)_2CF_3$ | O |
| A-4888 | Et | H | Me | F | $CH_2CH_2CH_2N(CH_2OMe)S(=O)_2CF_3$ | O |
| A-4889 | Et | H | Me | F | $CH_2CH_2CH_2CH_2N(Me)S(=O)_2CF_3$ | O |
| A-4890 | Et | H | Me | F | $CH_2CH_2CH_2CH_2N(Et)S(=O)_2CF_3$ | O |
| A-4891 | Et | H | Me | F | $CH_2CH_2CH_2CH_2N(CH_2CN)S(=O)_2CF_3$ | O |
| A-4892 | Et | H | Me | F | $CH_2CH_2CH_2CH_2N(CH_2OMe)S(=O)_2CF_3$ | O |
| A-4893 | Et | H | Cl | Cl | $CH_2CH_2SCF_3$ | O |
| A-4894 | Et | H | Cl | Cl | $CH_2CH_2CH_2SCF_3$ | O |
| A-4895 | Et | H | Cl | Cl | $CH_2CH_2CH_2CH_2SCF_3$ | O |
| A-4896 | Et | H | Cl | Cl | $CH_2CH_2CH_2CH_2CH_2SCF_3$ | O |
| A-4897 | Et | H | Cl | Cl | $CH_2CH_2CH_2CH_2CH_2CH_2SCF_3$ | O |
| A-4898 | Et | H | Cl | Cl | $CH_2CH_2CH_2CH_2CH_2CH_2CH_2SCF_3$ | O |
| A-4899 | Et | H | Cl | Cl | $CH_2CH_2CH_2CH_2CH_2CH_2CH_2CH_2SCF_3$ | O |
| A-4900 | Et | H | Cl | Cl | $CH_2CH_2NHS(=O)_2CF_3$ | O |
| A-4901 | Et | H | Cl | Cl | $CH_2CH_2CH_2NHS(=O)_2CF_3$ | O |
| A-4902 | Et | H | Cl | Cl | $CH_2CH_2CH_2CH_2NHS(=O)_2CF_3$ | O |
| A-4903 | Et | H | Cl | Cl | $CH_2CH_2CH_2CH_2CH_2NHS(=O)_2CF_3$ | O |
| A-4904 | Et | H | Cl | Cl | $CH_2CH_2N(Me)S(=O)_2CF_3$ | O |
| A-4905 | Et | H | Cl | Cl | $CH_2CH_2N(Et)S(=O)_2CF_33$ | O |
| A-4906 | Et | H | Cl | Cl | $CH_2CH_2N(CH_2CN)S(=O)_2CF_3$ | O |
| A-4907 | Et | H | Cl | Cl | $CH_2CH_2N(CH_2OMe)S(=O)_2CF_3$ | O |
| A-4908 | Et | H | Cl | Cl | $CH_2CH_2CH_2N(Me)S(=O)_2CF_3$ | O |
| A-4909 | Et | H | Cl | Cl | $CH_2CH_2CH_2N(Et)S(=O)_2CF_3$ | O |
| A-4910 | Et | H | Cl | Cl | $CH_2CH_2CH_2N(CH_2CN)S(=O)_2CF_3$ | O |

TABLE 112-continued

| Compound Number | $R^1$ | $R^2$ | $R^3$ | $R^4$ | $R^5$ | A |
|---|---|---|---|---|---|---|
| A-4911 | Et | H | Cl | Cl | $CH_2CH_2CH_2N(CH_2OMe)S(=O)_2CF_3$ | O |
| A-4912 | Et | H | Cl | Cl | $CH_2CH_2CH_2CH_2N(Me)S(=O)_2CF_3$ | O |
| A-4913 | Et | H | Cl | Cl | $CH_2CH_2CH_2CH_2N(Et)S(=O)_2CF_3$ | O |
| A-4914 | Et | H | Cl | Cl | $CH_2CH_2CH_2CH_2N(CH_2CN)S(=O)_2CF_3$ | O |
| A-4915 | Et | H | Cl | Cl | $CH_2CH_2CH_2CH_2N(CH_2OMe)S(=O)_2CF_3$ | O |
| A-4916 | Et | H | Me | Cl | $CH_2CH_2SCF_3$ | O |
| A-4917 | Et | H | Me | Cl | $CH_2CH_2CH_2SCF_3$ | O |
| A-4918 | Et | H | Me | Cl | $CH_2CH_2CH_2CH_2SCF_3$ | O |
| A-4919 | Et | H | Me | Cl | $CH_2CH_2CH_2CH_2CH_2SCF_3$ | O |
| A-4920 | Et | H | Me | Cl | $CH_2CH_2CH_2CH_2CH_2CH_2SCF_3$ | O |
| A-4921 | Et | H | Me | Cl | $CH_2CH_2CH_2CH_2CH_2CH_2CH_2SCF_3$ | O |
| A-4922 | Et | H | Me | Cl | $CH_2CH_2CH_2CH_2CH_2CH_2CH_2CH_2SCF_3$ | O |

TABLE 113

| Compound Number | $R^1$ | $R^2$ | $R^3$ | $R^4$ | $R^5$ | A |
|---|---|---|---|---|---|---|
| A-4923 | Et | H | Me | Cl | $CH_2CH_2NHS(=O)_2CF_3$ | O |
| A-4924 | Et | H | Me | Cl | $CH_2CH_2CH_2NHS(=O)_2CF_3$ | O |
| A-4925 | Et | H | Me | Cl | $CH_2CH_2CH_2CH_2NHS(=O)_2CF_3$ | O |
| A-4926 | Et | H | Me | Cl | $CH_2CH_2CH_2CH_2CH_2NHS(=O)_2CF_3$ | O |
| A-4927 | Et | H | Me | Cl | $CH_2CH_2N(Me)S(=O)_2CF_3$ | O |
| A-4928 | Et | H | Me | Cl | $CH_2CH_2N(Et)S(=O)_2CF_3$ | O |
| A-4929 | Et | H | Me | Cl | $CH_2CH_2N(CH_2CN)S(=O)_2CF_3$ | O |
| A-4930 | Et | H | Me | Cl | $CH_2CH_2N(CH_2OMe)S(=O)_2CF_3$ | O |
| A-4931 | Et | H | Me | Cl | $CH_2CH_2CH_2N(Me)S(=O)_2CF_3$ | O |
| A-4932 | Et | H | Me | Cl | $CH_2CH_2CH_2N(Et)S(=O)_2CF_3$ | O |
| A-4933 | Et | H | Me | Cl | $CH_2CH_2CH_2N(CH_2CN)S(=O)_2CF_3$ | O |
| A-4934 | Et | H | Me | Cl | $CH_2CH_2CH_2N(CH_2OMe)S(=O)_2CF_3$ | O |
| A-4935 | Et | H | Me | Cl | $CH_2CH_2CH_2CH_2N(Me)S(=O)_2CF_3$ | O |
| A-4936 | Et | H | Me | Cl | $CH_2CH_2CH_2CH_2N(Et)S(=O)_2CF_3$ | O |
| A-4937 | Et | H | Me | Cl | $CH_2CH_2CH_2CH_2N(CH_2CN)S(=O)_2CF_3$ | O |
| A-4938 | Et | H | Me | Cl | $CH_2CH_2CH_2CH_2N(CH_2OMe)S(=O)_2CF_3$ | O |
| A-4939 | Et | H | Me | Me | $CH_2CH_2SCF_3$ | O |
| A-4940 | Et | H | Me | Me | $CH_2CH_2CH_2SCF_3$ | O |
| A-4941 | Et | H | Me | Me | $CH_2CH_2CH_2CH_2SCF_3$ | O |
| A-4942 | Et | H | Me | Me | $CH_2CH_2CH_2CH_2CH_2SCF_3$ | O |
| A-4943 | Et | H | Me | Me | $CH_2CH_2CH_2CH_2CH_2CH_2SCF_3$ | O |
| A-4944 | Et | H | Me | Me | $CH_2CH_2CH_2CH_2CH_2CH_2CH_2SCF_3$ | O |
| A-4945 | Et | H | Me | Me | $CH_2CH_2CH_2CH_2CH_2CH_2CH_2CH_2SCF_3$ | O |
| A-4946 | Et | H | Me | Me | $CH_2CH_2NHS(=O)_2CF_3$ | O |
| A-4947 | Et | H | Me | Me | $CH_2CH_2CH_2NHS(=O)_2CF_3$ | O |
| A-4948 | Et | H | Me | Me | $CH_2CH_2CH_2CH_2NHS(=O)_2CF_3$ | O |
| A-4949 | Et | H | Me | Me | $CH_2CH_2CH_2CH_2CH_2NHS(=O)_2CF_3$ | O |
| A-4950 | Et | H | Me | Me | $CH_2CH_2N(Me)S(=O)_2CF_3$ | O |
| A-4951 | Et | H | Me | Me | $CH_2CH_2N(Et)S(=O)_2CF_3$ | O |
| A-4952 | Et | H | Me | Me | $CH_2CH_2N(CH_2CN)S(=O)_2CF_3$ | O |
| A-4953 | Et | H | Me | Me | $CH_2CH_2N(CH_2OMe)S(=O)_2CF_3$ | O |
| A-4954 | Et | H | Me | Me | $CH_2CH_2CH_2N(Me)S(=O)_2CF_3$ | O |
| A-4955 | Et | H | Me | Me | $CH_2CH_2CH_2N(Et)S(=O)_2CF_3$ | O |
| A-4956 | Et | H | Me | Me | $CH_2CH_2CH_2N(CH_2CN)S(=O)_2CF_3$ | O |
| A-4957 | Et | H | Me | Me | $CH_2CH_2CH_2N(CH_2OMe)S(=O)_2CF_3$ | O |
| A-4958 | Et | H | Me | Me | $CH_2CH_2CH_2CH_2N(Me)S(=O)_2CF_3$ | O |
| A-4959 | Et | H | Me | Me | $CH_2CH_2CH_2CH_2N(Et)S(=O)_2CF_3$ | O |
| A-4960 | Et | H | Me | Me | $CH_2CH_2CH_2CH_2N(CH_2CN)S(=O)_2CF_3$ | O |
| A-4961 | Et | H | Me | Me | $CH_2CH_2CH_2CH_2N(CH_2OMe)S(=O)_2CF_3$ | O |
| A-4962 | c-Pr | H | Cl | H | $CH_2CH_2SCF_3$ | O |
| A-4963 | c-Pr | H | Cl | H | $CH_2CH_2CH_2SCF_3$ | O |
| A-4964 | c-Pr | H | Cl | H | $CH_2CH_2CH_2CH_2SCF_3$ | O |
| A-4965 | c-Pr | H | Cl | H | $CH_2CH_2CH_2CH_2CH_2SCF_3$ | O |
| A-4966 | c-Pr | H | Cl | H | $CH_2CH_2CH_2CH_2CH_2CH_2SCF_3$ | O |

TABLE 114

| Compound Number | $R^1$ | $R^2$ | $R^3$ | $R^4$ | $R^5$ | A |
|---|---|---|---|---|---|---|
| A-4967 | c-Pr | H | Cl | H | $CH_2CH_2CH_2CH_2CH_2CH_2CH_2SCF_3$ | O |
| A-4968 | c-Pr | H | Cl | H | $CH_2CH_2CH_2CH_2CH_2CH_2CH_2CH_2SCF_3$ | O |
| A-4969 | c-Pr | H | Cl | H | $CH_2CH_2NHS({=}O)_2CF_3$ | O |
| A-4970 | c-Pr | H | Cl | H | $CH_2CH_2CH_2NHS({=}O)_2CF_3$ | O |
| A-4971 | c-Pr | H | Cl | H | $CH_2CH_2CH_2CH_2NHS({=}O)_2CF_3$ | O |
| A-4972 | c-Pr | H | Cl | H | $CH_2CH_2CH_2CH_2CH_2NHS({=}O)_2CF_3$ | O |
| A-4973 | c-Pr | H | Cl | H | $CH_2CH_2N(Me)S({=}O)_2CF_3$ | O |
| A-4974 | c-Pr | H | Cl | H | $CH_2CH_2N(Et)S({=}O)_2CF_3$ | O |
| A-4975 | c-Pr | H | Cl | H | $CH_2CH_2N(CH_2CN)S({=}O)_2CF_3$ | O |
| A-4976 | c-Pr | H | Cl | H | $CH_2CH_2N(CH_2OMe)S({=}O)_2CF_3$ | O |
| A-4977 | c-Pr | H | Cl | H | $CH_2CH_2CH_2N(Me)S({=}O)_2CF_3$ | O |
| A-4978 | c-Pr | H | Cl | H | $CH_2CH_2CH_2N(Et)S({=}O)_2CF_3$ | O |
| A-4979 | c-Pr | H | Cl | H | $CH_2CH_2CH_2N(CH_2CN)S({=}O)_2CF_3$ | O |
| A-4980 | c-Pr | H | Cl | H | $CH_2CH_2CH_2N(CH_2OMe)S({=}O)_2CF_3$ | O |
| A-4981 | c-Pr | H | Cl | H | $CH_2CH_2CH_2CH_2N(Me)S({=}O)_2CF_3$ | O |
| A-4982 | c-Pr | H | Cl | H | $CH_2CH_2CH_2CH_2N(Et)S({=}O)_2CF_3$ | O |
| A-4983 | c-Pr | H | Cl | H | $CH_2CH_2CH_2CH_2N(CH_2CN)S({=}O)_2CF_3$ | O |
| A-4984 | c-Pr | H | Cl | H | $CH_2CH_2CH_2CH_2N(CH_2OMe)S({=}O)_2CF_3$ | O |
| A-4985 | c-Pr | H | Me | H | $CH_2CH_2SCF_3$ | O |
| A-4986 | c-Pr | H | Me | H | $CH_2CH_2CH_2SCF3$ | O |
| A-4987 | c-Pr | H | Me | H | $CH_2CH_2CH_2CH_2SCF_3$ | O |
| A-4988 | c-Pr | H | Me | H | $CH_2CH_2CH_2CH_2CH_2SCF_3$ | O |
| A-4989 | c-Pr | H | Me | H | $CH_2CH_2CH_2CH_2CH_2CH_2SCF_3$ | O |
| A-4990 | c-Pr | H | Me | H | $CH_2CH_2CH_2CH_2CH_2CH_2CH_2SCF_3$ | O |
| A-4991 | c-Pr | H | Me | H | $CH_2CH_2CH_2CH_2CH_2CH_2CH_2CH_2SCF_3$ | O |
| A-4992 | c-Pr | H | Me | H | $CH_2CH_2NHS({=}O)_2CF_3$ | O |
| A-4993 | c-Pr | H | Me | H | $CH_2CH_2CH_2NHS({=}O)_2CF_3$ | O |
| A-4994 | c-Pr | H | Me | H | $CH_2CH_2CH_2CH_2NHS({=}O)_2CF_3$ | O |
| A-4995 | c-Pr | H | Me | H | $CH_2CH_2CH_2CH_2CH_2NHS({=}O)_2CF_3$ | O |
| A-4996 | c-Pr | H | Me | H | $CH_2CH_2N(Me)S({=}O)_2CF_33$ | O |
| A-4997 | c-Pr | H | Me | H | $CH_2CH_2N(Et)S({=}O)_2CF_3$ | O |
| A-4998 | c-Pr | H | Me | H | $CH_2CH_2N(CH_2CN)S({=}O)_2CF_3$ | O |
| A-4999 | c-Pr | H | Me | H | $CH_2CH_2N(CH_2OMe)S({=}O)_2CF_3$ | O |
| A-5000 | c-Pr | H | Me | H | $CH_2CH_2CH_2N(Me)S({=}O)_2CF_3$ | O |
| A-5001 | c-Pr | H | Me | H | $CH_2CH_2CH_2N(Et)S({=}O)_2CF_3$ | O |
| A-5002 | c-Pr | H | Me | H | $CH_2CH_2CH_2N(CH_2CN)S({=}O)_2CF_3$ | O |
| A-5003 | c-Pr | H | Me | H | $CH_2CH_2CH_2N(CH_2OMe)S({=}O)_2CF_3$ | O |
| A-5004 | c-Pr | H | Me | H | $CH_2CH_2CH_2CH_2N(Me)S({=}O)_2CF_3$ | O |
| A-5005 | c-Pr | H | Me | H | $CH_2CH_2CH_2CH_2N(Et)S({=}O)_2CF_3$ | O |
| A-5006 | c-Pr | H | Me | H | $CH_2CH_2CH_2CH_2N(CH_2CN)S({=}O)_2CF_3$ | O |
| A-5007 | c-Pr | H | Me | H | $CH_2CH_2CH_2CH_2N(CH_2OMe)S({=}O)_2CF_3$ | O |
| A-5008 | c-Pr | H | Cl | F | $CH_2CH_2SCF_3$ | O |
| A-5009 | c-Pr | H | Cl | F | $CH_2CH_2CH_2SCF_3$ | O |
| A-5010 | c-Pr | H | Cl | F | $CH_2CH_2CH_2CH_2SCF_3$ | O |

TABLE 115

| Compound Number | $R^1$ | $R^2$ | $R^3$ | $R^4$ | $R^5$ | A |
|---|---|---|---|---|---|---|
| A-5011 | c-Pr | H | Cl | F | $CH_2CH_2CH_2CH_2CH_2SCF_3$ | O |
| A-5012 | c-Pr | H | Cl | F | $CH_2CH_2CH_2CH_2CH_2CH_2SCF_3$ | O |
| A-5013 | c-Pr | H | Cl | F | $CH_2CH_2CH_2CH_2CH_2CH_2CH_2SCF_3$ | O |
| A-5014 | c-Pr | H | Cl | F | $CH_2CH_2CH_2CH_2CH_2CH_2CH_2CH_2SCF_3$ | O |
| A-5015 | c-Pr | H | Cl | F | $CH_2CH_2NHS({=}O)_2CF_3$ | O |
| A-5016 | c-Pr | H | Cl | F | $CH_2CH_2CH_2NHS({=}O)_2CF_3$ | O |
| A-5017 | c-Pr | H | Cl | F | $CH_2CH_2CH_2CH_2NHS({=}O)_2CF_3$ | O |
| A-5018 | c-Pr | H | Cl | F | $CH_2CH_2CH_2CH_2CH_2NHS({=}O)_2CF_3$ | O |
| A-5019 | c-Pr | H | Cl | F | $CH_2CH_2N(Me)S({=}O)_2CF_3$ | O |
| A-5020 | c-Pr | H | Cl | F | $CH_2CH_2N(Et)S({=}O)_2CF_3$ | O |
| A-5021 | c-Pr | H | Cl | F | $CH_2CH_2N(CH_2CN)S({=}O)_2CF_3$ | O |
| A-5022 | c-Pr | H | Cl | F | $CH_2CH_2N(CH_2OMe)S({=}O)_2CF_3$ | O |
| A-5023 | c-Pr | H | Cl | F | $CH_2CH_2CH_2N(Me)S({=}O)_2CF_3$ | O |
| A-5024 | c-Pr | H | Cl | F | $CH_2CH_2CH_2N(Et)S({=}O)_2CF_3$ | O |
| A-5025 | c-Pr | H | Cl | F | $CH_2CH_2CH_2N(CH_2CN)S({=}O)_2CF_3$ | O |
| A-5026 | c-Pr | H | Cl | F | $CH_2CH_2CH_2N(CH_2OMe)S({=}O)_2CF_3$ | O |
| A-5027 | c-Pr | H | Cl | F | $CH_2CH_2CH_2CH_2N(Me)S({=}O)_2CF_3$ | O |
| A-5028 | c-Pr | H | Cl | F | $CH_2CH_2CH_2CH_2N(Et)S({=}O)_2CF_3$ | O |
| A-5029 | c-Pr | H | Cl | F | $CH_2CH_2CH_2CH_2N(CH_2CN)S({=}O)_2CF_3$ | O |
| A-5030 | c-Pr | H | Cl | F | $CH_2CH_2CH_2CH_2N(CH_2OMe)S({=}O)_2CF_3$ | O |
| A-5031 | c-Pr | H | Me | F | $CH_2CH_2SCF_3$ | O |
| A-5032 | c-Pr | H | Me | F | $CH_2CH_2CH_2SCF_3$ | O |
| A-5033 | c-Pr | H | Me | F | $CH_2CH_2CH_2CH_2SCF_3$ | O |

TABLE 115-continued

| Compound Number | $R^1$ | $R^2$ | $R^3$ | $R^4$ | $R^5$ | A |
|---|---|---|---|---|---|---|
| A-5034 | c-Pr | H | Me | F | $CH_2CH_2CH_2CH_2CH_2SCF_3$ | O |
| A-5035 | c-Pr | H | Me | F | $CH_2CH_2CH_2CH_2CH_2CH_2SCF_3$ | O |
| A-5036 | c-Pr | H | Me | F | $CH_2CH_2CH_2CH_2CH_2CH_2CH_2SCF_3$ | O |
| A-5037 | c-Pr | H | Me | F | $CH_2CH_2CH_2CH_2CH_2CH_2CH_2CH_2SCF_3$ | O |
| A-5038 | c-Pr | H | Me | F | $CH_2CH_2NHS(=O)_2CF_3$ | O |
| A-5039 | c-Pr | H | Me | F | $CH_2CH_2CH_2NHS(=O)_2CF_3$ | O |
| A-5040 | c-Pr | H | Me | F | $CH_2CH_2CH_2CH_2NHS(=O)_2CF_3$ | O |
| A-5041 | c-Pr | H | Me | F | $CH_2CH_2CH_2CH_2CH_2NHS(=O)_2CF_3$ | O |
| A-5042 | c-Pr | H | Me | F | $CH_2CH_2N(Me)S(=O)_2CF_3$ | O |
| A-5043 | c-Pr | H | Me | F | $CH_2CH_2N(Et)S(=O)_2CF_3$ | O |
| A-5044 | c-Pr | H | Me | F | $CH_2CH_2N(CH_2CN)S(=O)_2CF_3$ | O |
| A-5045 | c-Pr | H | Me | F | $CH_2CH_2N(CH_2OMe)S(=O)_2CF_3$ | O |
| A-5046 | c-Pr | H | Me | F | $CH_2CH_2CH_2N(Me)S(=O)_2CF_3$ | O |
| A-5047 | c-Pr | H | Me | F | $CH_2CH_2CH_2N(Et)S(=O)_2CF_3$ | O |
| A-5048 | c-Pr | H | Me | F | $CH_2CH_2CH_2N(CH_2CN)S(=O)_2CF_3$ | O |
| A-5049 | c-Pr | H | Me | F | $CH_2CH_2CH_2N(CH_2OMe)S(=O)_2CF_3$ | O |
| A-5050 | c-Pr | H | Me | F | $CH_2CH_2CH_2CH_2N(Me)S(=O)_2CF_3$ | O |
| A-5051 | c-Pr | H | Me | F | $CH_2CH_2CH_2CH_2N(Et)S(=O)_2CF_3$ | O |
| A-5052 | c-Pr | H | Me | F | $CH_2CH_2CH_2CH_2N(CH_2CN)S(=O)_2CF_3$ | O |
| A-5053 | c-Pr | H | Me | F | $CH_2CH_2CH_2CH_2N(CH_2OMe)S(=O)_2CF_3$ | O |
| A-5054 | c-Pr | H | Cl | Cl | $CH_2CH_2SCF_3$ | O |

TABLE 116

| Compound Number | $R^1$ | $R^2$ | $R^3$ | $R^4$ | $R^5$ | A |
|---|---|---|---|---|---|---|
| A-5055 | c-Pr | H | Cl | Cl | $CH_2CH_2CH_2SCF_3$ | O |
| A-5056 | c-Pr | H | Cl | Cl | $CH_2CH_2CH_2CH_2SCF_3$ | O |
| A-5057 | c-Pr | H | Cl | Cl | $CH_2CH_2CH_2CH_2CH_2SCF_3$ | O |
| A-5058 | c-Pr | H | Cl | Cl | $CH_2CH_2CH_2CH_2CH_2CH_2SCF_3$ | O |
| A-5059 | c-Pr | H | Cl | Cl | $CH_2CH_2CH_2CH_2CH_2CH_2CH_2SCF_3$ | O |
| A-5060 | c-Pr | H | Cl | Cl | $CH_2CH_2CH_2CH_2CH_2CH_2CH_2CH_2SCF_3$ | O |
| A-5061 | c-Pr | H | Cl | Cl | $CH_2CH_2NHS(=O)_2CF_3$ | O |
| A-5062 | c-Pr | H | Cl | Cl | $CH_2CH_2CH_2NHS(=O)_2CF_3$ | O |
| A-5063 | c-Pr | H | Cl | Cl | $CH_2CH_2CH_2CH_2NHS(=O)_2CF_3$ | O |
| A-5064 | c-Pr | H | Cl | Cl | $CH_2CH_2CH_2CH_2CH_2NHS(=O)_2CF_3$ | O |
| A-5065 | c-Pr | H | Cl | Cl | $CH_2CH_2N(Me)S(=O)_2CF_3$ | O |
| A-5066 | c-Pr | H | Cl | Cl | $CH_2CH_2N(Et)S(=O)_2CF_3$ | O |
| A-5067 | c-Pr | H | Cl | Cl | $CH_2CH_2N(CH_2CN)S(=O)_2CF_3$ | O |
| A-5068 | c-Pr | H | Cl | Cl | $CH_2CH_2N(CH_2OMe)S(=O)_2CF_3$ | O |
| A-5069 | c-Pr | H | Cl | Cl | $CH_2CH_2CH_2N(Me)S(=O)_2CF_3$ | O |
| A-5070 | c-Pr | H | Cl | Cl | $CH_2CH_2CH_2N(Et)S(=O)_2CF_3$ | O |
| A-5071 | c-Pr | H | Cl | Cl | $CH_2CH_2CH_2N(CH_2CN)S(=O)_2CF_3$ | O |
| A-5072 | c-Pr | H | Cl | Cl | $CH_2CH_2CH_2N(CH_2OMe)S(=O)_2CF_3$ | O |
| A-5073 | c-Pr | H | Cl | Cl | $CH_2CH_2CH_2CH_2N(Me)S(=O)_2CF_3$ | O |
| A-5074 | c-Pr | H | Cl | Cl | $CH_2CH_2CH_2CH_2N(Et)S(=O)_2CF_3$ | O |
| A-5075 | c-Pr | H | Cl | Cl | $CH_2CH_2CH_2CH_2N(CH_2CN)S(=O)_2CF_3$ | O |
| A-5076 | c-Pr | H | Cl | Cl | $CH_2CH_2CH_2CH_2N(CH_2OMe)S(=O)_2CF_3$ | O |
| A-5077 | c-Pr | H | Me | Cl | $CH_2CH_2SCF_3$ | O |
| A-5078 | c-Pr | H | Me | Cl | $CH_2CH_2CH_2SCF_3$ | O |
| A-5079 | c-Pr | H | Me | Cl | $CH_2CH_2CH_2CH_2SCF_3$ | O |
| A-5080 | c-Pr | H | Me | Cl | $CH_2CH_2CH_2CH_2CH_2SCF_3$ | O |
| A-5081 | c-Pr | H | Me | Cl | $CH_2CH_2CH_2CH_2CH_2CH_2SCF_3$ | O |
| A-5082 | c-Pr | H | Me | Cl | $CH_2CH_2CH_2CH_2CH_2CH_2CH_2SCF_3$ | O |
| A-5083 | c-Pr | H | Me | Cl | $CH_2CH_2CH_2CH_2CH_2CH_2CH_2CH_2SCF_3$ | O |
| A-5084 | c-Pr | H | Me | Cl | $CH_2CH_2NHS(=O)_2CF_3$ | O |
| A-5085 | c-Pr | H | Me | Cl | $CH_2CH_2CH_2NHS(=O)_2CF_3$ | O |
| A-5086 | c-Pr | H | Me | Cl | $CH_2CH_2CH_2CH_2NHS(=O)_2CF_3$ | O |
| A-5087 | c-Pr | H | Me | Cl | $CH_2CH_2CH_2CH_2CH_2NHS(=O)_2CF_3$ | O |
| A-5088 | c-Pr | H | Me | Cl | $CH_2CH_2N(Me)S(=O)_2CF_3$ | O |
| A-5089 | c-Pr | H | Me | Cl | $CH_2CH_2N(Et)S(=O)_2CF_3$ | O |
| A-5090 | c-Pr | H | Me | Cl | $CH_2CH_2N(CH_2CN)S(=O)_2CF_3$ | O |
| A-5091 | c-Pr | H | Me | Cl | $CH_2CH_2N(CH_2OMe)S(=O)_2CF_3$ | O |
| A-5092 | c-Pr | H | Me | Cl | $CH_2CH_2CH_2N(Me)S(=O)_2CF_3$ | O |
| A-5093 | c-Pr | H | Me | Cl | $CH_2CH_2CH_2N(Et)S(=O)_2CF_3$ | O |
| A-5094 | c-Pr | H | Me | Cl | $CH_2CH_2CH_2N(CH_2CN)S(=O)_2CF_3$ | O |
| A-5095 | c-Pr | H | Me | Cl | $CH_2CH_2CH_2N(CH_2OMe)S(=O)_2CF_3$ | O |
| A-5096 | c-Pr | H | Me | Cl | $CH_2CH_2CH_2CH_2N(Me)S(=O)_2CF_3$ | O |
| A-5097 | c-Pr | H | Me | Cl | $CH_2CH_2CH_2CH_2N(Et)S(=O)_2CF_3$ | O |
| A-5098 | c-Pr | H | Me | Cl | $CH_2CH_2CH_2CH_2N(CH_2CN)S(=O)_2CF_3$ | O |

TABLE 117

| Compound Number | $R^1$ | $R^2$ | $R^3$ | $R^4$ | $R^5$ | A |
|---|---|---|---|---|---|---|
| A-5099 | c-Pr | H | Me | Cl | $CH_2CH_2CH_2CH_2N(CH_2OMe)S(=O)_2CF_3$ | O |
| A-5100 | c-Pr | H | Me | Me | $CH_2CH_2SCF_3$ | O |
| A-5101 | c-Pr | H | Me | Me | $CH_2CH_2CH_2SCF_3$ | O |
| A-5102 | c-Pr | H | Me | Me | $CH_2CH_2CH_2CH_2SCF_3$ | O |
| A-5103 | c-Pr | H | Me | Me | $CH_2CH_2CH_2CH_2CH_2SCF_3$ | O |
| A-5104 | c-Pr | H | Me | Me | $CH_2CH_2CH_2CH_2CH_2CH_2SCF_3$ | O |
| A-5105 | c-Pr | H | Me | Me | $CH_2CH_2CH_2CH_2CH_2CH_2CH_2SCF_3$ | O |
| A-5106 | c-Pr | H | Me | Me | $CH_2CH_2CH_2CH_2CH_2CH_2CH_2CH_2SCF_3$ | O |
| A-5107 | c-Pr | H | Me | Me | $CH_2CH_2NHS(=O)_2CF_3$ | O |
| A-5108 | c-Pr | H | Me | Me | $CH_2CH_2CH_2NHS(=O)_2CF_3$ | O |
| A-5109 | c-Pr | H | Me | Me | $CH_2CH_2CH_2CH_2NHS(=O)_2CF_3$ | O |
| A-5110 | c-Pr | H | Me | Me | $CH_2CH_2CH_2CH_2CH_2NHS(=O)_2CF_3$ | O |
| A-5111 | c-Pr | H | Me | Me | $CH_2CH_2N(Me)S(=O)_2CF_3$ | O |
| A-5112 | c-Pr | H | Me | Me | $CH_2CH_2N(Et)S(=O)_2CF_3$ | O |
| A-5113 | c-Pr | H | Me | Me | $CH_2CH_2N(CH_2CN)$S(=O)2CF3 | O |
| A-5114 | c-Pr | H | Me | Me | $CH_2CH_2N(CH_2OMe)$S(=0)2CF3 | O |
| A-5115 | c-Pr | H | Me | Me | $CH_2CH_2CH_2N(Me)$S(=O)2CF3 | O |
| A-5116 | c-Pr | H | Me | Me | $CH_2CH_2CH_2N(Et)$S(=0)2CF3 | O |
| A-5117 | c-Pr | H | Me | Me | $CH_2CH_2CH_2N(CH_2CN)S(=O)_2CF_3$ | O |
| A-5118 | c-Pr | H | Me | Me | $CH_2CH_2CH_2N(CH_2OMe)S(=O)_2CF_3$ | O |
| A-5119 | c-Pr | H | Me | Me | $CH_2CH_2CH_2CH_2N(Me)S(=O)_2CF_3$ | O |
| A-5120 | c-Pr | H | Me | Me | $CH_2CH_2CH_2CH_2N(Et)S(=O)_2CF_3$ | O |
| A-5121 | c-Pr | H | Me | Me | $CH_2CH_2CH_2CH_2N(CH_2CN)S(=O)_2CF_3$ | O |
| A-5122 | c-Pr | H | Me | Me | $CH_2CH_2CH_2CH_2N(CH_2OMe)S(=O)_2CF_3$ | O |
| A-5123 | $CH_2CF_3$ | H | Cl | H | $CH_2CH_2SCF_3$ | S |
| A-5124 | $CH_2CF_3$ | H | Cl | H | $CH_2CH_2CH_2SCF_3$ | S |
| A-5125 | $CH_2CF_3$ | H | Cl | H | $CH_2CH_2CH_2CH_2SCF_3$ | S |
| A-5126 | $CH_2CF_3$ | H | Cl | H | $CH_2CH_2CH_2CH_2CH_2SCF_3$ | S |
| A-5127 | $CH_2CF_3$ | H | Cl | H | $CH_2CH_2CH_2CH_2CH_2CH_2SCF_3$ | S |
| A-5128 | $CH_2CF_3$ | H | Cl | H | $CH_2CH_2CH_2CH_2CH_2CH_2CH_2SCF_3$ | S |
| A-5129 | $CH_2CF_3$ | H | Cl | H | $CH_2CH_2CH_2CH_2CH_2CH_2CH_2CH_2SCF_3$ | S |
| A-5130 | $CH_2CF_3$ | H | Cl | H | $CH_2CH_2NHS(=O)_2CF_3$3 | S |
| A-5131 | $CH_2CF_3$ | H | Cl | H | $CH_2CH_2CH_2NHS(=O)_2CF_3$ | S |
| A-5132 | $CH_2CF_3$ | H | Cl | H | $CH_2CH_2CH_2CH_2NHS(=O)_2CF_3$ | S |
| A-5133 | $CH_2CF_3$ | H | Cl | H | $CH_2CH_2CH_2CH_2CH_2NHS(=O)_2CF_3$ | S |
| A-5134 | $CH_2CF_3$ | H | Cl | H | $CH_2CH_2N(Me)S(=O)_2CF_3$ | S |
| A-5135 | $CH_2CF_3$ | H | Cl | H | $CH_2CH_2N(Et)S(=O)_2CF_3$ | S |
| A-5136 | $CH_2CF_3$ | H | Cl | H | $CH_2CH_2N(CH_2CN)S(=O)_2CF_3$ | S |
| A-5137 | $CH_2CF_3$ | H | Cl | H | $CH_2CH_2N(CH_2OMe)S(=O)_2CF_3$ | S |
| A-5138 | $CH_2CF_3$ | H | Cl | H | $CH_2CH_2CH_2N(Me)S(=O)_2CF_3$ | S |
| A-5139 | $CH_2CF_3$ | H | Cl | H | $CH_2CH_2CH_2N(Et)S(=O)_2CF_3$ | S |
| A-5140 | $CH_2CF_3$ | H | Cl | H | $CH_2CH_2CH_2N(CH_2CN)S(=O)_2CF_3$ | S |
| A-5141 | $CH_2CF_3$ | H | Cl | H | $CH_2CH_2CH_2N(CH_2OMe)S(=O)_2CF_3$ | S |
| A-5142 | $CH_2CF_3$ | H | Cl | H | $CH_2CH_2CH_2CH_2N(Me)S(=O)_2CF_3$ | S |

TABLE 118

| Compound Number | $R^1$ | $R^2$ | $R^3$ | $R^4$ | $R^5$ | A |
|---|---|---|---|---|---|---|
| A-5143 | $CH_2CF_3$ | H | Cl | H | $CH_2CH_2CH_2CH_2N(Et)S(=O)_2CF_3$ | S |
| A-5144 | $CH_2CF_3$ | H | Cl | H | $CH_2CH_2CH_2CH_2N(CH_2CN)S(=O)_2CF_3$ | S |
| A-5145 | $CH_2CF_3$ | H | Cl | H | $CH_2CH_2CH_2CH_2N(CH_2OMe)S(=O)_2CF_3$ | S |
| A-5146 | $CH_2CF_3$ | H | Me | H | $CH_2$CH2SCF3 | S |
| A-5147 | $CH_2CF_3$ | H | Me | H | $CH_2CH_2CH_2SCF_3$ | S |
| A-5148 | $CH_2CF_3$ | H | Me | H | $CH_2CH_2CH_2CH_2SCF_3$ | S |
| A-5149 | $CH_2CF_3$ | H | Me | H | $CH_2CH_2CH_2CH_2CH_2SCF_3$ | S |
| A-5150 | $CH_2CF_3$ | H | Me | H | $CH_2$CH2$CH_2CH_2CH_2CH_2SCF_3$ | S |
| A-5151 | $CH_2CF_3$ | H | Me | H | $CH_2CH_2CH_2CH_2CH_2CH_2CH_2SCF_3$ | S |
| A-5152 | $CH_2CF_3$ | H | Me | H | $CH_2CH_2CH_2CH_2CH_2CH_2CH_2CH_2SCF_3$ | S |
| A-5153 | $CH_2CF_3$ | H | Me | H | $CH_2CH_2NHS(=O)_2CF_3$ | S |
| A-5154 | $CH_2CF_3$ | H | Me | H | $CH_2CH_2CH_2NHS(=O)_2CF_3$ | S |
| A-5155 | $CH_2CF_3$ | H | Me | H | $CH_2CH_2CH_2CH_2NHS(=O)_2CF_3$ | S |
| A-5156 | $CH_2CF_3$ | H | Me | H | $CH_2CH_2CH_2CH_2CH_2NHS(=O)_2CF_3$ | S |
| A-5157 | $CH_2CF_3$ | H | Me | H | $CH_2CH_2N(Me)S(=O)_2CF_3$ | S |
| A-5158 | $CH_2CF_3$ | H | Me | H | $CH_2CH_2N(Et)S(=O)_2CF_3$ | S |
| A-5159 | $CH_2CF_3$ | H | Me | H | $CH_2CH_2N(CH_2CN)S(=O)_2CF_3$ | S |
| A-5160 | $CH_2CF_3$ | H | Me | H | $CH_2CH_2N(CH_2OMe)S(=O)_2CF_3$ | S |
| A-5161 | $CH_2CF_3$ | H | Me | H | $CH_2CH_2CH_2N(Me)S(=O)_2CF_3$ | S |
| A-5162 | $CH_2CF_3$ | H | Me | H | $CH_2CH_2CH_2N(Et)S(=O)_2CF_3$ | S |
| A-5163 | $CH_2CF_3$ | H | Me | H | $CH_2CH_2CH_2N(CH_2CN)S(=O)_2CF_3$ | S |

TABLE 118-continued

| Compound Number | $R^1$ | $R^2$ | $R^3$ | $R^4$ | $R^5$ | A |
|---|---|---|---|---|---|---|
| A-5164 | $CH_2CF_3$ | H | Me | H | $CH_2CH_2CH_2N(CH_2OMe)S(=O)_2CF_3$ | S |
| A-5165 | $CH_2CF_3$ | H | Me | H | $CH_2CH_2CH_2CH_2N(Me)S(=O)_2CF_3$ | S |
| A-5166 | $CH_2CF_3$ | H | Me | H | $CH_2CH_2CH_2CH_2N(Et)S(=O)_2CF_3$ | S |
| A-5167 | $CH_2CF_3$ | H | Me | H | $CH_2CH_2CH_2CH_2N(CH_2CN)S(=O)_2CF_3$ | S |
| A-5168 | $CH_2CF_3$ | H | Me | H | $CH_2CH_2CH_2CH_2N(CH_2OMe)S(=O)_2CF_3$ | S |
| A-5169 | $CH_2CF_3$ | H | Cl | F | $CH_2CH_2SCF_3$ | S |
| A-5170 | $CH_2CF_3$ | H | Cl | F | $CH_2CH_2CH_2SCF_3$ | S |
| A-5171 | $CH_2CF_3$ | H | Cl | F | $CH_2CH_2CH_2CH_2SCF_3$ | S |
| A-5172 | $CH_2CF_3$ | H | Cl | F | $CH_2CH_2CH_2CH_2CH_2SCF_3$ | S |
| A-5173 | $CH_2CF_3$ | H | Cl | F | $CH_2CH_2CH_2CH_2CH_2CH_2SCF_3$ | S |
| A-5174 | $CH_2CF_3$ | H | Cl | F | $CH_2CH_2CH_2CH_2CH_2CH_2CH_2SCF_3$ | S |
| A-5175 | $CH_2CF_3$ | H | Cl | F | $CH_2CH_2CH_2CH_2CH_2CH_2CH_2CH_2SCF_3$ | S |
| A-5176 | $CH_2CF_3$ | H | Cl | F | $CH_2CH_2NHS(=O)_2CF_3$ | S |
| A-5177 | $CH_2CF_3$ | H | Cl | F | $CH_2CH_2CH_2NHS(=O)_2CF_3$ | S |
| A-5178 | $CH_2CF_3$ | H | Cl | F | $CH_2CH_2CH_2CH_2NHS(=O)_2CF_3$ | S |
| A-5179 | $CH_2CF_3$ | H | Cl | F | $CH_2CH_2CH_2CH_2CH_2NHS(=O)_2CF_3$ | S |
| A-5180 | $CH_2CF_3$ | H | Cl | F | $CH_2CH_2N(Me)S(=O)_2CF_3$ | S |
| A-5181 | $CH_2CF_3$ | H | Cl | F | $CH_2CH_2N(Et)S(=O)_2CF_3$ | S |
| A-5182 | $CH_2CF_3$ | H | Cl | F | $CH_2CH_2N(CH_2CN)S(=O)_2CF_3$ | S |
| A-5183 | $CH_2CF_3$ | H | Cl | F | $CH_2CH_2N(CH_2OMe)S(=O)_2CF_3$ | S |
| A-5184 | $CH_2CF_3$ | H | Cl | F | $CH_2CH_2CH_2N(Me)S(=O)_2CF_3$ | S |
| A-5185 | $CH_2CF_3$ | H | Cl | F | $CH_2CH_2CH_2N(Et)S(=O)_2CF_3$ | S |
| A-5186 | $CH_2CF_3$ | H | Cl | F | $CH_2CH_2CH_2N(CH_2CN)S(=O)_2CF_3$ | S |

TABLE 119

| Compound Number | $R^1$ | $R^2$ | $R^3$ | $R^4$ | $R^5$ | A |
|---|---|---|---|---|---|---|
| A-5187 | $CH_2CF_3$ | H | Cl | F | $CH_2CH_2CH_2N(CH_2OMe)S(=O)_2CF_3$ | S |
| A-5188 | $CH_2CF_3$ | H | Cl | F | $CH_2CH_2CH_2CH_2N(Me)S(=O)_2CF_3$ | S |
| A-5189 | $CH_2CF_3$ | H | Cl | F | $CH_2CH_2CH_2CH_2N(Et)S(=O)_2CF_3$ | S |
| A-5190 | $CH_2CF_3$ | H | Cl | F | $CH_2CH_2CH_2CH_2N(CH_2CN)S(=O)_2CF_3$ | S |
| A-5191 | $CH_2CF_3$ | H | Cl | F | $CH_2CH_2CH_2CH_2N(CH_2OMe)S(=O)_2CF_3$ | S |
| A-5192 | $CH_2CF_3$ | H | Me | F | $CH_2CH_2SCF_3$ | S |
| A-5193 | $CH_2CF_3$ | H | Me | F | $CH_2CH_2CH_2SCF_3$ | S |
| A-5194 | $CH_2CF_3$ | H | Me | F | $CH_2CH_2CH_2CH_2SCF_3$ | S |
| A-5195 | $CH_2CF_3$ | H | Me | F | $CH_2CH_2CH_2CH_2CH_2SCF_3$ | S |
| A-5196 | $CH_2CF_3$ | H | Me | F | $CH_2CH_2CH_2CH_2CH_2CH_2SCF_3$ | S |
| A-5197 | $CH_2CF_3$ | H | Me | F | $CH_2CH_2CH_2CH_2CH_2CH_2CH_2SCF_3$ | S |
| A-5198 | $CH_2CF_3$ | H | Me | F | $CH_2CH_2CH_2CH_2CH_2CH_2CH_2CH_2SCF_3$ | S |
| A-5199 | $CH_2CF_3$ | H | Me | F | $CH_2CH2NHS(=O)_2CF_3$ | S |
| A-5200 | $CH_2CF_3$ | H | Me | F | $CH_2CH_2CH_2NHS(=O)_2CF_3$ | S |
| A-5201 | $CH_2CF_3$ | H | Me | F | $CH_2CH_2CH_2CH_2NHS(=O)_2CF_3$ | S |
| A-5202 | $CH_2CF_3$ | H | Me | F | $CH_2CH_2CH_2CH_2CH_2NHS(=O)_2CF_3$ | S |
| A-5203 | $CH_2CF_3$ | H | Me | F | $CH_2CH_2N(Me)S(=O)_2CF_3$ | S |
| A-5204 | $CH_2CF_3$ | H | Me | F | $CH_2CH_2N(Et)S(=O)_2CF_3$ | S |
| A-5205 | $CH_2CF_3$ | H | Me | F | $CH_2CH_2N(CH_2CN)S(=O)_2CF_3$ | S |
| A-5206 | $CH_2CF_3$ | H | Me | F | $CH_2CH_2N(CH_2OMe)S(=O)_2CF_3$ | S |
| A-5207 | $CH_2CF_3$ | H | Me | F | $CH_2CH_2CH_2N(Me)S(=O)_2CF_3$ | S |
| A-5208 | $CH_2CF_3$ | H | Me | F | $CH_2CH_2CH_2N(Et)S(=O)_2CF_3$ | S |
| A-5209 | $CH_2CF_3$ | H | Me | F | $CH_2CH_2CH_2N(CH_2CN)S(=O)_2CF_3$ | S |
| A-5210 | $CH_2CF_3$ | H | Me | F | $CH_2CH_2CH_2N(CH_2OMe)S(=O)_2CF_3$ | S |
| A-5211 | $CH_2CF_3$ | H | Me | F | $CH_2CH_2CH_2CH_2N(Me)S(=O)_2CF_3$ | S |
| A-5212 | $CH_2CF_3$ | H | Me | F | $CH_2CH_2CH_2CH_2N(Et)S(=O)_2CF_3$ | S |
| A-5213 | $CH_2CF_3$ | H | Me | F | $CH_2CH_2CH_2CH_2N(CH_2CN)S(=O)_2CF_3$ | S |
| A-5214 | $CH_2CF_3$ | H | Me | F | $CH_2CH_2CH_2CH_2N(CH_2OMe)S(=O)_2CF_3$ | S |
| A-5215 | $CH_2CF_3$ | H | Cl | Cl | $CH_2CH_2SCF_3$ | S |
| A-5216 | $CH_2CF_3$ | H | Cl | Cl | $CH_2CH_2CH_2SCF_3$ | S |
| A-5217 | $CH_2CF_3$ | H | Cl | Cl | $CH_2CH_2CH_2CH_2SCF_3$ | S |
| A-5218 | $CH_2CF_3$ | H | Cl | Cl | $CH_2CH_2CH_2CH_2CH_2SCF_3$ | S |
| A-5219 | $CH_2CF_3$ | H | Cl | Cl | $CH_2CH_2CH_2CH_2CH_2CH_2SCF_3$ | S |
| A-5220 | $CH_2CF_3$ | H | Cl | Cl | $CH_2CH_2CH_2CH_2CH_2CH_2CH_2SCF_3$ | S |
| A-5221 | $CH_2CF_3$ | H | Cl | Cl | $CH_2CH_2CH_2CH_2CH_2CH_2CH_2CH_2SCF_3$ | S |
| A-5222 | $CH_2CF_3$ | H | Cl | Cl | $CH_2CH_2NHS(=O)_2CF_3$ | S |
| A-5223 | $CH_2CF_3$ | H | Cl | Cl | $CH_2CH_2CH_2NHS(=O)_2CF_3$ | S |
| A-5224 | $CH_2CF_3$ | H | Cl | Cl | $CH_2CH_2CH_2CH_2NHS(=O)_2CF_3$ | S |
| A-5225 | $CH_2CF_3$ | H | Cl | Cl | $CH_2CH_2CH_2CH_2CH_2NH(=O)_2CF_3$ | S |
| A-5226 | $CH_2CF_3$ | H | Cl | Cl | $CH_2CH_2N(Me)S(=O)_2CF_3$ | S |
| A-5227 | $CH_2CF_3$ | H | Cl | Cl | $CH_2CH_2N(Et)S(=O)_2CF_3$ | S |
| A-5228 | $CH_2CF_3$ | H | Cl | Cl | $CH_2CH_2N(CH_2CN)S(=O)_2CF_3$ | S |

TABLE 119-continued

| Compound Number | $R^1$ | $R^2$ | $R^3$ | $R^4$ | $R^5$ | A |
|---|---|---|---|---|---|---|
| A-5229 | $CH_2CF_3$ | H | Cl | Cl | $CH_2CH_2N(CH_2OMe)S(=O)_2CF_3$ | S |
| A-5230 | $CH_2CF_3$ | H | Cl | Cl | $CH_2CH_2CH_2N(Me)S(=O)_2CF_3$ | S |

TABLE 120

| Compound Number | $R^1$ | $R^2$ | $R^3$ | $R^4$ | $R^5$ | A |
|---|---|---|---|---|---|---|
| A-5231 | $CH_2CF_3$ | H | Cl | Cl | $CH_2CH_2CH_2N(Et)S(=O)_2CF_3$ | S |
| A-5232 | $CH_2CF_3$ | H | Cl | Cl | $CH_2CH_2CH_2N(CH_2CN)S(=O)_2CF_3$ | S |
| A-5233 | $CH_2CF_3$ | H | Cl | Cl | $CH_2CH_2CH_2N(CH_2OMe)S(=O)_2CF_3$ | S |
| A-5234 | $CH_2CF_3$ | H | Cl | Cl | $CH_2CH_2CH_2CH_2N(Me)S(=O)_2CF_3$ | S |
| A-5235 | $CH_2CF_3$ | H | Cl | Cl | $CH_2CH_2CH_2CH_2N(Et)S(=O)_2CF_3$ | S |
| A-5236 | $CH_2CF_3$ | H | Cl | Cl | $CH_2CH_2CH_2CH_2N(CH_2CN)S(=O)_2CF_3$ | S |
| A-5237 | $CH_2CF_3$ | H | Cl | Cl | $CH_2CH_2CH_2CH_2N(CH_2OMe)S(=O)_2CF_3$ | S |
| A-5238 | $CH_2CF_3$ | H | Me | Cl | $CH_2CH_2SCF_3$ | S |
| A-5239 | $CH_2CF_3$ | H | Me | Cl | $CH_2CH_2CH_2SCF_3$ | S |
| A-5240 | $CH_2CF_3$ | H | Me | Cl | $CH_2CH_2CH_2CH_2SCF_3$ | S |
| A-5241 | $CH_2CF_3$ | H | Me | Cl | $CH_2CH_2CH_2CH_2CH_2SCF_3$ | S |
| A-5242 | $CH_2CF_3$ | H | Me | Cl | $CH_2CH_2CH_2CH_2CH_2CH_2SCF_3$ | S |
| A-5243 | $CH_2CF_3$ | H | Me | Cl | $CH_2CH_2CH_2CH_2CH_2CH_2CH_2SCF_3$ | S |
| A-5244 | $CH_2CF_3$ | H | Me | Cl | $CH_2CH_2CH_2CH_2CH_2CH_2CH_2CH_2SCF_3$ | S |
| A-5245 | $CH_2CF_3$ | H | Me | Cl | $CH_2CH_2NHS(=O)_2CF_3$ | S |
| A-5246 | $CH_2CF_3$ | H | Me | Cl | $CH_2CH_2CH_2NHS(=O)_2CF_3$ | S |
| A-5247 | $CH_2CF_3$ | H | Me | Cl | $CH_2CH_2CH_2CH_2NHS(=O)_2CF_3$ | S |
| A-5248 | $CH_2CF_3$ | H | Me | Cl | $CH_2CH_2CH_2CH_2CH_2NH(=O)_2CF_3$ | S |
| A-5249 | $CH_2CF_3$ | H | Me | Cl | $CH_2CH_2N(Me)S(=O)_2CF_3$ | S |
| A-5250 | $CH_2CF_3$ | H | Me | Cl | $CH_2CH_2N(Et)S(=O)_2CF_3$ | S |
| A-5251 | $CH_2CF_3$ | H | Me | Cl | $CH_2CH_2N(CH_2CN)S(=O)_2CF_3$ | S |
| A-5252 | $CH_2CF_3$ | H | Me | Cl | $CH_2CH_2N(CH_2OMe)S(=O)_2CF_3$ | S |
| A-5253 | $CH_2CF_3$ | H | Me | Cl | $CH_2CH_2CH_2N(Me)S(=O)_2CF_3$ | S |
| A-5254 | $CH_2CF_3$ | H | Me | Cl | $CH_2CH_2CH_2N(Et)S(=O)_2CF_3$ | S |
| A-5255 | $CH_2CF_3$ | H | Me | Cl | $CH_2CH_2CH_2N(CH_2CN)S(=O)_2CF_3$ | S |
| A-5256 | $CH_2CF_3$ | H | Me | Cl | $CH_2CH_2CH_2N(CH_2OMe)S(=O)_2CF_3$ | S |
| A-5257 | $CH_2CF_3$ | H | Me | Cl | $CH_2CH_2CH_2CH_2N(Me)S(=O)_2CF_3$ | S |
| A-5258 | $CH_2CF_3$ | H | Me | Cl | $CH_2CH_2CH_2CH_2N(Et)S(=O)_2CF_3$ | S |
| A-5259 | $CH_2CF_3$ | H | Me | Cl | $CH_2CH_2CH_2CH_2N(CH_2CN)S(=O)_2CF_3$ | S |
| A-5260 | $CH_2CF_3$ | H | Me | Cl | $CH_2CH_2CH_2CH_2N(CH_2OMe)S(=O)_2CF_3$ | S |
| A-5261 | $CH_2CF_3$ | H | Me | Me | $CH_2CH_2SCF_3$ | S |
| A-5262 | $CH_2CF_3$ | H | Me | Me | $CH_2CH_2CH_2SCF_3$ | S |
| A-5263 | $CH_2CF_3$ | H | Me | Me | $CH_2CH_2CH_2CH_2SCF_3$ | S |
| A-5264 | $CH_2CF_3$ | H | Me | Me | $CH_2CH_2CH_2CH_2CH_2SCF_3$ | S |
| A-5265 | $CH_2CF_3$ | H | Me | Me | $CH_2CH_2CH_2CH_2CH_2CH_2SCF_3$ | S |
| A-5266 | $CH_2CF_3$ | H | Me | Me | $CH_2CH_2CH_2CH_2CH_2CH_2CH_2SCF_3$ | S |
| A-5267 | $CH_2CF_3$ | H | Me | Me | $CH_2CH_2CH_2CH_2CH_2CH_2CH_2CH_2SCF_3$ | S |
| A-5268 | $CH_2CF_3$ | H | Me | Me | $CH_2CH_2NHS(=O)_2CF_3$ | S |
| A-5269 | $CH_2CF_3$ | H | Me | Me | $CH_2CH_2CH_2NHS(=O)_2CF_3$ | S |
| A-5270 | $CH_2CF_3$ | H | Me | Me | $CH_2CH_2CH_2CH_2NHS(=O)_2CF_3$ | S |
| A-5271 | $CH_2CF_3$ | H | Me | Me | $CH_2CH_2CH_2CH_2CH_2NH(=O)_2CF_3$ | S |
| A-5272 | $CH_2CF_3$ | H | Me | Me | $CH_2CH_2N(Me)S(=O)_2CF_3$ | S |
| A-5273 | $CH_2CF_3$ | H | Me | Me | $CH_2CH_2N(Et)S(=O)_2CF_3$ | S |
| A-5274 | $CH_2CF_3$ | H | Me | Me | $CH_2CH_2N(CH_2CN)S(=O)_2CF_3$ | S |

TABLE 121

| Compound Number | $R^1$ | $R^2$ | $R^3$ | $R^4$ | $R^5$ | A |
|---|---|---|---|---|---|---|
| A-5275 | $CH_2CF_3$ | H | Me | Me | $CH_2CH_2N(CH_2OMe)S(=O)_2CF_3$ | S |
| A-5276 | $CH_2CF_3$ | H | Me | Me | $CH_2CH_2CH_2N(Me)S(=O)_2CF_3$ | S |
| A-5277 | $CH_2CF_3$ | H | Me | Me | $CH_2CH_2CH_2N(Et)S(=O)_2CF_3$ | S |
| A-5278 | $CH_2CF_3$ | H | Me | Me | $CH_2CH_2CH_2N(CH_2CN)S(=O)_2CF_3$ | S |
| A-5279 | $CH_2CF_3$ | H | Me | Me | $CH_2CH_2CH_2N(CH_2OMe)S(=O)_2CF_3$ | S |
| A-5280 | $CH_2CF_3$ | H | Me | Me | $CH_2CH_2CH_2CH_2N(Me)S(=O)_2CF_3$ | S |
| A-5281 | $CH_2CF_3$ | H | Me | Me | $CH_2CH_2CH_2CH_2N(Et)S(=O)_2CF_3$ | S |
| A-5282 | $CH_2CF_3$ | H | Me | Me | $CH_2CH_2CH_2CH_2N(CH_2CN)S(=O)_2CF_3$ | S |
| A-5283 | $CH_2CF_3$ | H | Me | Me | $CH_2CH_2CH_2CH_2N(CH_2OMe)S(=O)_2CF_3$ | S |
| A-5284 | Et | H | Cl | H | $CH_2CH_2SCF_3$ | S |

TABLE 121-continued

| Compound Number | $R^1$ | $R^2$ | $R^3$ | $R^4$ | $R^5$ | A |
|---|---|---|---|---|---|---|
| A-5285 | Et | H | Cl | H | $CH_2CH_2CH_2SCF_3$ | S |
| A-5286 | Et | H | Cl | H | $CH_2CH_2CH_2CH_2SCF_3$ | S |
| A-5287 | Et | H | Cl | H | $CH_2CH_2CH_2CH_2CH_2SCF_3$ | S |
| A-5288 | Et | H | Cl | H | $CH_2CH_2CH_2CH_2CH_2CH_2SCF_3$ | S |
| A-5289 | Et | H | Cl | H | $CH_2CH_2CH_2CH_2CH_2CH_2CH_2SCF_3$ | S |
| A-5290 | Et | H | Cl | H | $CH_2CH_2CH_2CH_2CH_2CH_2CH_2CH_2SCF_3$ | S |
| A-5291 | Et | H | Cl | H | $CH_2CH_2NHS({=}O)_2CF_3$ | S |
| A-5292 | Et | H | Cl | H | $CH_2CH_2CH_2NHS({=}O)_2CF_3$ | S |
| A-5293 | Et | H | Cl | H | $CH_2CH_2CH_2CH_2NHS({=}O)_2CF_3$ | S |
| A-5294 | Et | H | Cl | H | $CH_2CH_2CH_2CH_2CH_2NH({=}O)_2CF_3$ | S |
| A-5295 | Et | H | Cl | H | $CH_2CH_2N(Me)S({=}O)_2CF_3$ | S |
| A-5296 | Et | H | Cl | H | $CH_2CH_2N(Et)S({=}O)_2CF_3$ | S |
| A-5297 | Et | H | Cl | H | $CH_2CH_2N(CH_2CN)S({=}O)_2CF_3$ | S |
| A-5298 | Et | H | Cl | H | $CH_2CH_2N(CH_2OMe)S({=}O)_2CF_3$ | S |
| A-5299 | Et | H | Cl | H | $CH_2CH_2CH_2N(Me)S({=}O)_2CF_3$ | S |
| A-5300 | Et | H | Cl | H | $CH_2CH_2CH_2N(Et)S({=}O)_2CF_3$ | S |
| A-5301 | Et | H | Cl | H | $CH_2CH_2CH_2N(CH_2CN)S({=}O)_2CF_3$ | S |
| A-5302 | Et | H | Cl | H | $CH_2CH_2CH_2N(CH_2OMe)S({=}O)_2CF_3$ | S |
| A-5303 | Et | H | Cl | H | $CH_2CH_2CH_2CH_2N(Me)S({=}O)_2CF_3$ | S |
| A-5304 | Et | H | Cl | H | $CH_2CH_2CH_2CH_2N(Et)S({=}O)_2CF_3$ | S |
| A-5305 | Et | H | Cl | H | $CH_2CH_2CH_2CH_2N(CH_2CN)S({=}O)_2CF_3$ | S |
| A-5306 | Et | H | Cl | H | $CH_2CH_2CH_2CH_2N(CH_2OMe)S({=}O)_2CF_3$ | S |
| A-5307 | Et | H | Me | H | $CH_2CH_2SCF_3$ | S |
| A-5308 | Et | H | Me | H | $CH_2CH_2CH_2SCF_3$ | S |
| A-5309 | Et | H | Me | H | $CH_2CH_2CH_2CH_2SCF_3$ | S |
| A-5310 | Et | H | Me | H | $CH_2CH_2CH_2CH_2CH_2SCF_3$ | S |
| A-5311 | Et | H | Me | H | $CH_2CH_2CH_2CH_2CH_2CH_2SCF_3$ | S |
| A-5312 | Et | H | Me | H | $CH_2CH_2CH_2CH_2CH_2CH_2CH_2SCF_3$ | S |
| A-5313 | Et | H | Me | H | $CH_2CH_2CH_2CH_2CH_2CH_2CH_2CH_2SCF_3$ | S |
| A-5314 | Et | H | Me | H | $CH_2CH_2NHS({=}O)_2CF_3$ | S |
| A-5315 | Et | H | Me | H | $CH_2CH_2CH_2NHS({=}O)_2CF_3$ | S |
| A-5316 | Et | H | Me | H | $CH_2CH_2CH_2CH_2NHS({=}O)_2CF_3$ | S |
| A-5317 | Et | H | Me | H | $CH_2CH_2CH_2CH_2CH_2NH({=}O)_2CF_3$ | S |
| A-5318 | Et | H | Me | H | $CH_2CH_2N(Me)S({=}O)_2CF_3$ | S |

TABLE 122

| Compound Number | $R^1$ | $R^2$ | $R^3$ | $R^4$ | $R^5$ | A |
|---|---|---|---|---|---|---|
| A-5319 | Et | H | Me | H | $CH_2CH_2N(Et)S({=}O)_2CF_3$ | S |
| A-5320 | Et | H | Me | H | $CH_2CH_2N(CH_2CN)S({=}O)_2CF_3$ | S |
| A-5321 | Et | H | Me | H | $CH_2CH_2N(CH_2OMe)S({=}O)_2CF_3$ | S |
| A-5322 | Et | H | Me | H | $CH_2CH_2CH_2N(Me)S({=}O)_2CF_3$ | S |
| A-5323 | Et | H | Me | H | $CH_2CH_2CH_2N(Et)S({=}O)_2CF_3$ | S |
| A-5324 | Et | H | Me | H | $CH_2CH_2CH_2N(CH_2CN)S({=}O)_2CF_3$ | S |
| A-5325 | Et | H | Me | H | $CH_2CH_2CH_2N(CH_2OMe)S({=}O)_2CF_3$ | S |
| A-5326 | Et | H | Me | H | $CH_2CH_2CH_2CH_2N(Me)S({=}O)_2CF_3$ | S |
| A-5327 | Et | H | Me | H | $CH_2CH_2CH_2CH_2N(Et)S({=}O)_2CF_3$ | S |
| A-5328 | Et | H | Me | H | $CH_2CH_2CH_2CH_2N(CH_2CN)S({=}O)_2CF_3$ | S |
| A-5329 | Et | H | Me | H | $CH_2CH_2CH_2CH_2N(CH_2OMe)S({=}O)_2CF_3$ | S |
| A-5330 | Et | H | Cl | H | $CH_2CH_2SCF_3$ | S |
| A-5331 | Et | H | Cl | F | $CH_2CH_2CH_2SCF_3$ | S |
| A-5332 | Et | H | Cl | F | $CH_2CH_2CH_2CH_2SCF_3$ | S |
| A-5333 | Et | H | Cl | F | $CH_2CH_2CH_2CH_2CH_2SCF_3$ | S |
| A-5334 | Et | H | Cl | F | $CH_2CH_2CH_2CH_2CH_2CH_2SCF_3$ | S |
| A-5335 | Et | H | Cl | F | $CH_2CH_2CH_2CH_2CH_2CH_2CH_2SCF_3$ | S |
| A-5336 | Et | H | Cl | F | $CH_2CH_2CH_2CH_2CH_2CH_2CH_2CH_2SCF_3$ | S |
| A-5337 | Et | H | Cl | F | $CH_2CH_2NHS({=}O)_2CF_3$ | S |
| A-5338 | Et | H | Cl | F | $CH_2CH_2CH_2NHS({=}O)_2CF_3$ | S |
| A-5339 | Et | H | Cl | F | $CH_2CH_2CH_2CH_2NHS({=}O)_2CF_3$ | S |
| A-5340 | Et | H | Cl | F | $CH_2CH_2CH_2CH_2CH_2NH({=}O)_2CF_3$ | S |
| A-5341 | Et | H | Cl | F | $CH_2CH_2N(Me)S({=}O)_2CF_3$ | S |
| A-5342 | Et | H | Cl | F | $CH_2CH_2N(Et)S({=}O)_2CF_3$ | S |
| A-5343 | Et | H | Cl | F | $CH_2CH_2N(CH_2CN)S({=}O)_2CF_3$ | S |
| A-5344 | Et | H | Cl | F | $CH_2CH_2N(CH_2OMe)S({=}O)_2CF_3$ | S |
| A-5345 | Et | H | Cl | F | $CH_2CH_2CH_2N(Me)S({=}O)_2CF_3$ | S |
| A-5346 | Et | H | Cl | F | $CH_2CH_2CH_2N(Et)S({=}O)_2CF_3$ | S |
| A-5347 | Et | H | Cl | F | $CH_2CH_2CH_2N(CH_2CN)S({=}O)_2CF_3$ | S |
| A-5348 | Et | H | Cl | F | $CH_2CH_2CH_2N(CH_2OMe)S({=}O)_2CF_3$ | S |
| A-5349 | Et | H | Cl | F | $CH_2CH_2CH_2CH_2N(Me)S({=}O)_2CF_3$ | S |
| A-5350 | Et | H | Cl | F | $CH_2CH_2CH_2CH_2N(Et)S({=}O)_2CF_3$ | S |
| A-5351 | Et | H | Cl | F | $CH_2CH_2CH_2CH_2N(CH_2CN)S({=}O)_2CF_3$ | S |

TABLE 122-continued

| Compound Number | $R^1$ | $R^2$ | $R^3$ | $R^4$ | $R^5$ | A |
|---|---|---|---|---|---|---|
| A-5352 | Et | H | Cl | F | $CH_2CH_2CH_2CH_2N(CH_2OMe)S(=O)_2CF_3$ | S |
| A-5353 | Et | H | Me | F | $CH_2CH_2SCF_3$ | S |
| A-5354 | Et | H | Me | F | $CH_2CH_2CH_2SCF_3$ | S |
| A-5355 | Et | H | Me | F | $CH_2CH_2CH_2CH_2SCF_3$ | S |
| A-5356 | Et | H | Me | F | $CH_2CH_2CH_2CH_2CH_2SCF_3$ | S |
| A-5357 | Et | H | Me | F | $CH_2CH_2CH_2CH_2CH_2CH_2SCF_3$ | S |
| A-5358 | Et | H | Me | F | $CH_2CH_2CH_2CH_2CH_2CH_2CH_2SCF_3$ | S |
| A-5359 | Et | H | Me | F | $CH_2CH_2CH_2CH_2CH_2CH_2CH_2CH_2SCF_3$ | S |
| A-5360 | Et | H | Me | F | $CH_2CH_2NHS(=O)_2CF_3$ | S |
| A-5361 | Et | H | Me | F | $CH_2CH_2CH_2NHS(=O)_2CF_3$ | S |
| A-5362 | Et | H | Me | F | $CH_2CH_2CH_2CH_2NHS(=O)_2CF_3$ | S |

TABLE 123

| Compound Number | $R^1$ | $R^2$ | $R^3$ | $R^4$ | $R^5$ | A |
|---|---|---|---|---|---|---|
| A-5363 | Et | H | Me | F | $CH_2CH_2CH_2CH_2CH_2NH(=O)_2CF_3$ | S |
| A-5364 | Et | H | Me | F | $CH_2CH_2N(Me)S(=O)_2CF_3$ | S |
| A-5365 | Et | H | Me | F | $CH_2CH_2N(Et)S(=O)_2CF_3$ | S |
| A-5366 | Et | H | Me | F | $CH_2CH_2N(CH_2CN)S(=O)_2CF_3$ | S |
| A-5367 | Et | H | Me | F | $CH_2CH_2N(CH_2OMe)S(=O)_2CF_3$ | S |
| A-5368 | Et | H | Me | F | $CH_2CH_2CH_2N(Me)S(=O)_2CF_3$ | S |
| A-5369 | Et | H | Me | F | $CH_2CH_2CH_2N(Et)S(=O)_2CF_3$ | S |
| A-5370 | Et | H | Me | F | $CH_2CH_2CH_2N(CH_2CN)S(=O)_2CF_3$ | S |
| A-5371 | Et | H | Me | F | $CH_2CH_2CH_2N(CH_2OMe)S(=O)_2CF_3$ | S |
| A-5372 | Et | H | Me | F | $CH_2CH_2CH_2CH_2N(Me)S(=O)_2CF_3$ | S |
| A-5373 | Et | H | Me | F | $CH_2CH_2CH_2CH_2N(Et)S(=O)_2CF_3$ | S |
| A-5374 | Et | H | Me | F | $CH_2CH_2CH_2CH_2N(CH_2CN)S(=O)_2CF_3$ | S |
| A-5375 | Et | H | Me | F | $CH_2CH_2CH_2CH_2N(CH_2OMe)S(=O)_2CF_3$ | S |
| A-5376 | Et | H | Cl | Cl | $CH_2CH_2SCF_3$ | S |
| A-5377 | Et | H | Cl | Cl | $CH_2CH_2CH_2SCF_3$ | S |
| A-5378 | Et | H | Cl | Cl | $CH_2CH_2CH_2CH_2SCF_3$ | S |
| A-5379 | Et | H | Cl | Cl | $CH_2CH_2CH_2CH_2CH_2SCF_3$ | S |
| A-5380 | Et | H | Cl | Cl | $CH_2CH_2CH_2CH_2CH_2CH_2SCF_3$ | S |
| A-5381 | Et | H | Cl | Cl | $CH_2CH_2CH_2CH_2CH_2CH_2CH_2SCF_3$ | S |
| A-5382 | Et | H | Cl | Cl | $CH_2CH_2CH_2CH_2CH_2CH_2CH_2CH_2SCF_3$ | S |
| A-5383 | Et | H | Cl | Cl | $CH_2CH_2NHS(=O)_2CF_3$ | S |
| A-5384 | Et | H | Cl | Cl | $CH_2CH_2CH_2NHS(=O)_2CF_3$ | S |
| A-5385 | Et | H | Cl | Cl | $CH_2CH_2CH_2CH_2NHS(=O)_2CF_3$ | S |
| A-5386 | Et | H | Cl | Cl | $CH_2CH_2CH_2CH_2CH_2NH(=O)_2CF_3$ | S |
| A-5387 | Et | H | Cl | Cl | $CH_2CH_2N(Me)S(=O)_2CF_3$ | S |
| A-5388 | Et | H | Cl | Cl | $CH_2CH_2N(Et)S(=O)_2CF_3$ | S |
| A-5389 | Et | H | Cl | Cl | $CH_2CH_2N(CH_2CN)S(=O)_2CF_3$ | S |
| A-5390 | Et | H | Cl | Cl | $CH_2CH_2N(CH_2OMe)S(=O)_2CF_3$ | S |
| A-5391 | Et | H | Cl | Cl | $CH_2CH_2CH_2N(Me)S(=O)_2CF_3$ | S |
| A-5392 | Et | H | Cl | Cl | $CH_2CH_2CH_2N(Et)S(=O)_2CF_3$ | S |
| A-5393 | Et | H | Cl | Cl | $CH_2CH_2CH_2N(CH_2CN)S(=O)_2CF_3$ | S |
| A-5394 | Et | H | Cl | Cl | $CH_2CH_2CH_2N(CH_2OMe)S(=O)_2CF_3$ | S |
| A-5395 | Et | H | Cl | Cl | $CH_2CH_2CH_2CH_2N(Me)S(=O)_2CF_3$ | S |
| A-5396 | Et | H | Cl | Cl | $CH_2CH_2CH_2CH_2N(Et)S(=O)_2CF_3$ | S |
| A-5397 | Et | H | Cl | Cl | $CH_2CH_2CH_2CH_2N(CH_2CN)S(=O)_2CF_3$ | S |
| A-5398 | Et | H | Cl | Cl | $CH_2CH_2CH_2CH_2N(CH_2OMe)S(=O)_2CF_3$ | S |
| A-5399 | Et | H | Me | Cl | $CH_2CH_2SCF_3$ | S |
| A-5400 | Et | H | Me | Cl | $CH_2CH_2CH_2SCF_3$ | S |
| A-5401 | Et | H | Me | Cl | $CH_2CH_2CH_2CH_2SCF_3$ | S |
| A-5402 | Et | H | Me | Cl | $CH_2CH_2CH_2CH_2CH_2SCF_3$ | S |
| A-5403 | Et | H | Me | Cl | $CH_2CH_2CH_2CH_2CH_2CH_2SCF_3$ | S |
| A-5404 | Et | H | Me | Cl | $CH_2CH_2CH_2CH_2CH_2CH_2CH_2SCF_3$ | S |
| A-5405 | Et | H | Me | Cl | $CH_2CH_2CH_2CH_2CH_2CH_2CH_2CH_2SCF_3$ | S |
| A-5406 | Et | H | Me | Cl | $CH_2CH_2NHS(=O)_2CF_3$ | S |

TABLE 124

| Compound Number | $R^1$ | $R^2$ | $R^3$ | $R^4$ | $R^5$ | A |
|---|---|---|---|---|---|---|
| A-5407 | Et | H | Me | Cl | $CH_2CH_2CH_2NHS(=O)_2CF_3$ | S |
| A-5408 | Et | H | Me | Cl | $CH_2CH_2CH_2CH_2NHS(=O)_2CF_3$ | S |
| A-5409 | Et | H | Me | Cl | $CH_2CH_2CH_2CH_2CH_2NHS(=O)_2CF_3$ | S |

TABLE 124-continued

| Compound Number | $R^1$ | $R^2$ | $R^3$ | $R^4$ | $R^5$ | A |
|---|---|---|---|---|---|---|
| A-5410 | Et | H | Me | Cl | $CH_2CH_2N(Me)S(=O)_2CF_3$ | S |
| A-5411 | Et | H | Me | Cl | $CH_2CH_2N(Et)S(=O)_2CF_3$ | S |
| A-5412 | Et | H | Me | Cl | $CH_2CH_2N(CH_2CN)S(=O)_2CF_3$ | S |
| A-5413 | Et | H | Me | Cl | $CH_2CH_2N(CH_2OMe)S(=O)_2CF_3$ | S |
| A-5414 | Et | H | Me | Cl | $CH_2CH_2CH_2N(Me)S(=O)_2CF_3$ | S |
| A-5415 | Et | H | Me | Cl | $CH_2CH_2CH_2N(Et)S(=O)_2CF_3$ | S |
| A-5416 | Et | H | Me | Cl | $CH_2CH_2CH_2N(CH_2CN)S(=O)_2CF_3$ | S |
| A-5417 | Et | H | Me | Cl | $CH_2CH_2CH_2N(CH_2OMe)S(=O)_2CF_3$ | S |
| A-5418 | Et | H | Me | Cl | $CH_2CH_2CH_2CH_2N(Me)S(=O)_2CF_3$ | S |
| A-5419 | Et | H | Me | Cl | $CH_2CH_2CH_2CH_2N(Et)S(=O)_2CF_3$ | S |
| A-5420 | Et | H | Me | Cl | $CH_2CH_2CH_2CH_2N(CH_2CN)S(=O)_2CF_3$ | S |
| A-5421 | Et | H | Me | Cl | $CH_2CH_2CH_2CH_2N(CH_2OMe)S(=O)_2CF_3$ | S |
| A-5422 | Et | H | Me | Me | $CH_2CH_2SCF_3$ | S |
| A-5423 | Et | H | Me | Me | $CH_2CH_2CH_2SCF_3$ | S |
| A-5424 | Et | H | Me | Me | $CH_2CH_2CH_2CH_2SCF_3$ | S |
| A-5425 | Et | H | Me | Me | $CH_2CH_2CH_2CH_2CH_2SCF_3$ | S |
| A-5426 | Et | H | Me | Me | $CH_2CH_2CH_2CH_2CH_2CH_2SCF_3$ | S |
| A-5427 | Et | H | Me | Me | $CH_2CH_2CH_2CH_2CH_2CH_2CH_2SCF_3$ | S |
| A-5428 | Et | H | Me | Me | $CH_2CH_2CH_2CH_2CH_2CH_2CH_2CH_2SCF_3$ | S |
| A-5429 | Et | H | Me | Me | $CH_2CH_2NHS(=O)_2CF_3$ | S |
| A-5430 | Et | H | Me | Me | $CH_2CH_2CH_2NHS(=O)_2CF_3$ | S |
| A-5431 | Et | H | Me | Me | $CH_2CH_2CH_2CH_2NHS(=O)_2CF_3$ | S |
| A-5432 | Et | H | Me | Me | $CH_2CH_2CH_2CH_2CH_2NHS(=O)_2CF_3$ | S |
| A-5433 | Et | H | Me | Me | $CH_2CH_2N(Me)S(=O)_2CF_3$ | S |
| A-5434 | Et | H | Me | Me | $CH_2CH_2N(Et)S(=O)_2CF_3$ | S |
| A-5435 | Et | H | Me | Me | $CH_2CH_2N(CH_2CN)S(=O)_2CF_3$ | S |
| A-5436 | Et | H | Me | Me | $CH_2CH_2N(CH_2OMe)S(=O)_2CF_3$ | S |
| A-5437 | Et | H | Me | Me | $CH_2CH_2CH_2N(Me)S(=O)_2CF_3$ | S |
| A-5438 | Et | H | Me | Me | $CH_2CH_2CH_2N(Et)S(=O)_2CF_3$ | S |
| A-5439 | Et | H | Me | Me | $CH_2CH_2CH_2N(CH_2CN)S(=O)_2CF_3$ | S |
| A-5440 | Et | H | Me | Me | $CH_2CH_2CH_2N(CH_2OMe)S(=O)_2CF_3$ | S |
| A-5441 | Et | H | Me | Me | $CH_2CH_2CH_2CH_2N(Me)S(=O)_2CF_3$ | S |
| A-5442 | Et | H | Me | Me | $CH_2CH_2CH_2CH_2N(Et)S(=O)_2CF_3$ | S |
| A-5443 | Et | H | Me | Me | $CH_2CH_2CH_2CH_2N(CH_2CN)S(=O)_2CF_3$ | S |
| A-5444 | Et | H | Me | Me | $CH_2CH_2CH_2CH_2N(CH_2OMe)S(=O)_2CF_3$ | S |
| A-5445 | c-Pr | H | Cl | H | $CH_2CH_2SCF_3$ | S |
| A-5446 | c-Pr | H | Cl | H | $CH_2CH_2CH_2SCF_3$ | S |
| A-5447 | c-Pr | H | Cl | H | $CH_2CH_2CH_2CH_2SCF_3$ | S |
| A-5448 | c-Pr | H | Cl | H | $CH_2CH_2CH_2CH_2CH_2SCF_3$ | S |
| A-5449 | c-Pr | H | Cl | H | $CH_2CH_2CH_2CH_2CH_2CH_2SCF_3$ | S |
| A-5450 | c-Pr | H | Cl | H | $CH_2CH_2CH_2CH_2CH_2CH_2CH_2SCF_3$ | S |

TABLE 125

| Compound Number | $R^1$ | $R^2$ | $R^3$ | $R^4$ | $R^5$ | A |
|---|---|---|---|---|---|---|
| A-5451 | c-Pr | H | Cl | H | $CH_2CH_2CH_2CH_2CH_2CH_2CH_2CH_2SCF_3$ | S |
| A-5452 | c-Pr | H | Cl | H | $CH_2CH_2NHS(=O)_2CF_3$ | S |
| A-5453 | c-Pr | H | Cl | H | $CH_2CH_2CH_2NHS(=O)_2CF_3$ | S |
| A-5454 | c-Pr | H | Cl | H | $CH_2CH_2CH_2CH_2NHS(=O)_2CF_3$ | S |
| A-5455 | c-Pr | H | Cl | H | $CH_2CH_2CH_2CH_2CH_2NHS(=O)_2CF_3$ | S |
| A-5456 | c-Pr | H | Cl | H | $CH_2CH_2N(Me)S(=O)_2CF_3$ | S |
| A-5457 | c-Pr | H | Cl | H | $CH_2CH_2N(Et)S(=O)_2CF_3$ | S |
| A-5458 | c-Pr | H | Cl | H | $CH_2CH_2N(CH_2CN)S(=O)_2CF_3$ | S |
| A-5459 | c-Pr | H | Cl | H | $CH_2CH_2N(CH_2OMe)S(=O)_2CF_3$ | S |
| A-5460 | c-Pr | H | Cl | H | $CH_2CH_2CH_2N(Me)S(=O)_2CF_3$ | S |
| A-5461 | c-Pr | H | Cl | H | $CH_2CH_2CH_2N(Et)S(=O)_2CF_3$ | S |
| A-5462 | c-Pr | H | Cl | H | $CH_2CH_2CH_2N(CH_2CN)S(=O)_2CF_3$ | S |
| A-5463 | c-Pr | H | Cl | H | $CH_2CH_2CH_2N(CH_2OMe)S(=O)_2CF_3$ | S |
| A-5464 | c-Pr | H | Cl | H | $CH_2CH_2CH_2CH_2N(Me)S(=O)_2CF_3$ | S |
| A-5465 | c-Pr | H | Cl | H | $CH_2CH_2CH_2CH_2N(Et)S(=O)_2CF_3$ | S |
| A-5466 | c-Pr | H | Cl | H | $CH_2CH_2CH_2CH_2N(CH_2CN)S(=O)_2CF_3$ | S |
| A-5467 | c-Pr | H | Cl | H | $CH_2CH_2CH_2CH_2N(CH_2OMe)S(=O)_2CF_3$ | S |
| A-5468 | c-Pr | H | Me | H | $CH_2CH_2SCF_3$ | S |
| A-5469 | c-Pr | H | Me | H | $CH_2CH_2CH_2SCF_3$ | S |
| A-5470 | c-Pr | H | Me | H | $CH_2CH_2CH_2CH_2SCF_3$ | S |
| A-5471 | c-Pr | H | Me | H | $CH_2CH_2CH_2CH_2CH_2SCF_3$ | S |
| A-5472 | c-Pr | H | Me | H | $CH_2CH_2CH_2CH_2CH_2CH_2SCF_3$ | S |
| A-5473 | c-Pr | H | Me | H | $CH_2CH_2CH_2CH_2CH_2CH_2CH_2SCF_3$ | S |
| A-5474 | c-Pr | H | Me | H | $CH_2CH_2CH_2CH_2CH_2CH_2CH_2CH_2SCF_3$ | S |
| A-5475 | c-Pr | H | Me | H | $CH_2CH_2NHS(=O)_2CF_3$ | S |
| A-5476 | c-Pr | H | Me | H | $CH_2CH_2CH_2NHS(=O)_2CF_3$ | S |

TABLE 125-continued

| Compound Number | $R^1$ | $R^2$ | $R^3$ | $R^4$ | $R^5$ | A |
|---|---|---|---|---|---|---|
| A-5477 | c-Pr | H | Me | H | $CH_2CH_2CH_2CH_2NHS(=O)_2CF_3$ | S |
| A-5478 | c-Pr | H | Me | H | $CH_2CH_2CH_2CH_2CH_2NHS(=O)_2CF_3$ | S |
| A-5479 | c-Pr | H | Me | H | $CH_2CH_2N(Me)S(=O)_2CF_3$ | S |
| A-5480 | c-Pr | H | Me | H | $CH_2CH_2N(Et)S(=O)_2CF_3$ | S |
| A-5481 | c-Pr | H | Me | H | $CH_2CH_2N(CH_2CN)S(=O)_2CF_3$ | S |
| A-5482 | c-Pr | H | Me | H | $CH_2CH_2N(CH_2OMe)S(=O)_2CF_3$ | S |
| A-5483 | c-Pr | H | Me | H | $CH_2CH_2CH_2N(Me)S(=O)_2CF_3$ | S |
| A-5484 | c-Pr | H | Me | H | $CH_2CH_2CH_2N(Et)S(=O)_2CF_3$ | S |
| A-5485 | c-Pr | H | Me | H | $CH_2CH_2CH_2N(CH_2CN)S(=O)_2CF_3$ | S |
| A-5486 | c-Pr | H | Me | H | $CH_2CH_2CH_2N(CH_2OMe)S(=O)_2CF_3$ | S |
| A-5487 | c-Pr | H | Me | H | $CH_2CH_2CH_2CH_2N(Me)S(=O)_2CF_3$ | S |
| A-5488 | c-Pr | H | Me | H | $CH_2CH_2CH_2CH_2N(Et)S(=O)_2CF_3$ | S |
| A-5489 | c-Pr | H | Me | H | $CH_2CH_2CH_2CH_2N(CH_2CN)S(=O)_2CF_3$ | S |
| A-5490 | c-Pr | H | Me | H | $CH_2CH_2CH_2CH_2N(CH_2OMe)S(=O)_2CF_3$ | S |
| A-5491 | c-Pr | H | Cl | F | $CH_2CH_2SCF_3$ | S |
| A-5492 | c-Pr | H | Cl | F | $CH_2CH_2CH_2SCF_3$ | S |
| A-5493 | c-Pr | H | Cl | F | $CH_2CH_2CH_2CH_2SCF_3$ | S |
| A-5494 | c-Pr | H | Cl | F | $CH_2CH_2CH_2CH_2CH_2SCF_3$ | S |

TABLE 126

| Compound Number | $R^1$ | $R^2$ | $R^3$ | $R^4$ | $R^5$ | A |
|---|---|---|---|---|---|---|
| A-5495 | c-Pr | H | Cl | F | $CH_2CH_2CH_2CH_2CH_2CH_2SCF_3$ | S |
| A-5496 | c-Pr | H | Cl | F | $CH_2CH_2CH_2CH_2CH_2CH_2CH_2SCF_3$ | S |
| A-5497 | c-Pr | H | Cl | F | $CH_2CH_2CH_2CH_2CH_2CH_2CH_2CH_2SCF_3$ | S |
| A-5498 | c-Pr | H | Cl | F | $CH_2CH_2NHS(=O)_2CF_3$ | S |
| A-5499 | c-Pr | H | Cl | F | $CH_2CH_2CH_2NHS(=O)_2CF_3$ | S |
| A-5500 | c-Pr | H | Cl | F | $CH_2CH_2CH_2CH_2NHS(=O)_2CF_3$ | S |
| A-5501 | c-Pr | H | Cl | F | $CH_2CH_2CH_2CH_2CH_2NHS(=O)_2CF_3$ | S |
| A-5502 | c-Pr | H | Cl | F | $CH_2CH_2N(Me)S(=O)_2CF_3$ | S |
| A-5503 | c-Pr | H | Cl | F | $CH_2CH_2N(Et)S(=O)_2CF_3$ | S |
| A-5504 | c-Pr | H | Cl | F | $CH_2CH_2N(CH_2CN)S(=O)_2CF_3$ | S |
| A-5505 | c-Pr | H | Cl | F | $CH_2CH_2N(CH_2OMe)S(=O)_2CF_3$ | S |
| A-5506 | c-Pr | H | Cl | F | $CH_2CH_2CH_2N(Me)S(=O)_2CF_3$ | S |
| A-5507 | c-Pr | H | Cl | F | $CH_2CH_2CH_2N(Et)S(=O)_2CF_3$ | S |
| A-5508 | c-Pr | H | Cl | F | $CH_2CH_2CH_2N(CH_2CN)S(=O)_2CF_3$ | S |
| A-5509 | c-Pr | H | Cl | F | $CH_2CH_2CH_2N(CH_2OMe)S(=O)_2CF_3$ | S |
| A-5510 | c-Pr | H | Cl | F | $CH_2CH_2CH_2CH_2N(Me)S(=O)_2CF_3$ | S |
| A-5511 | c-Pr | H | Cl | F | $CH_2CH_2CH_2CH_2N(Et)S(=O)_2CF_3$ | S |
| A-5512 | c-Pr | H | Cl | F | $CH_2CH_2CH_2CH_2N(CH_2CN)S(=O)_2CF_3$ | S |
| A-5513 | c-Pr | H | Cl | F | $CH_2CH_2CH_2CH_2N(CH_2OMe)S(=O)_2CF_3$ | S |
| A-5514 | c-Pr | H | Me | F | $CH_2CH_2SCF_3$ | S |
| A-5515 | c-Pr | H | Me | F | $CH_2CH_2CH_2SCF_3$ | S |
| A-5516 | c-Pr | H | Me | F | $CH_2CH_2CH_2CH_2SCF_3$ | S |
| A-5517 | c-Pr | H | Me | F | $CH_2CH_2CH_2CH_2CH_2SCF_3$ | S |
| A-5518 | c-Pr | H | Me | F | $CH_2CH_2CH_2CH_2CH_2CH_2SCF_3$ | S |
| A-5519 | c-Pr | H | Me | F | $CH_2CH_2CH_2CH_2CH_2CH_2CH_2SCF_3$ | S |
| A-5520 | c-Pr | H | Me | F | $CH_2CH_2CH_2CH_2CH_2CH_2CH_2CH_2SCF_3$ | S |
| A-5521 | c-Pr | H | Me | F | $CH_2CH_2NHS(=O)_2CF_3$ | S |
| A-5522 | c-Pr | H | Me | F | $CH_2CH_2CH_2NHS(=O)_2CF_3$ | S |
| A-5523 | c-Pr | H | Me | F | $CH_2CH_2CH_2CH_2NHS(=O)_2CF_3$ | S |
| A-5524 | c-Pr | H | Me | F | $CH_2CH_2CH_2CH_2CH_2NHS(=O)_2CF_3$ | S |
| A-5525 | c-Pr | H | Me | F | $CH_2CH_2N(Me)S(=O)_2CF_3$ | S |
| A-5526 | c-Pr | H | Me | F | $CH_2CH_2N(Et)S(=O)_2CF_3$ | S |
| A-5527 | c-Pr | H | Me | F | $CH_2CH_2N(CH_2CN)S(=O)_2CF_3$ | S |
| A-5528 | c-Pr | H | Me | F | $CH_2CH_2N(CH_2OMe)S(=O)_2CF_3$ | S |
| A-5529 | c-Pr | H | Me | F | $CH_2CH_2CH_2N(Me)S(=O)_2CF_3$ | S |
| A-5530 | c-Pr | H | Me | F | $CH_2CH_2CH_2N(Et)S(=O)_2CF_3$ | S |
| A-5531 | c-Pr | H | Me | F | $CH_2CH_2CH_2N(CH_2CN)S(=O)_2CF_3$ | S |
| A-5532 | c-Pr | H | Me | F | $CH_2CH_2CH_2N(CH_2OMe)S(=O)_2CF_3$ | S |
| A-5533 | c-Pr | H | Me | F | $CH_2CH_2CH_2CH_2N(Me)S(=O)_2CF_3$ | S |
| A-5534 | c-Pr | H | Me | F | $CH_2CH_2CH_2CH_2N(Et)S(=O)_2CF_3$ | S |
| A-5535 | c-Pr | H | Me | F | $CH_2CH_2CH_2CH_2N(CH_2CN)S(=O)_2CF_3$ | S |
| A-5536 | c-Pr | H | Me | F | $CH_2CH_2CH_2CH_2N(CH_2OMe)S(=O)_2CF_3$ | S |
| A-5537 | c-Pr | H | Cl | Cl | $CH_2CH_2SCF_3$ | S |
| A-5538 | c-Pr | H | Cl | Cl | $CH_2CH_2CH_2SCF_3$ | S |

TABLE 127

| Compound Number | $R^1$ | $R^2$ | $R^3$ | $R^4$ | $R^5$ | A |
|---|---|---|---|---|---|---|
| A-5539 | c-Pr | H | Cl | Cl | $CH_2CH_2CH_2CH_2SCF_3$ | S |
| A-5540 | c-Pr | H | Cl | Cl | $CH_2CH_2CH_2CH_2CH_2SCF_3$ | S |
| A-5541 | c-Pr | H | Cl | Cl | $CH_2CH_2CH_2CH_2CH_2CH_2SCF_3$ | S |
| A-5542 | c-Pr | H | Cl | Cl | $CH_2CH_2CH_2CH_2CH_2CH_2CH_2SCF_3$ | S |
| A-5543 | c-Pr | H | Cl | Cl | $CH_2CH_2CH_2CH_2CH_2CH_2CH_2CH_2SCF_3$ | S |
| A-5544 | c-Pr | H | Cl | Cl | $CH_2CH_2NHS({=}O)_2CF_3$ | S |
| A-5545 | c-Pr | H | Cl | Cl | $CH_2CH_2CH_2NHS({=}O)_2CF_3$ | S |
| A-5546 | c-Pr | H | Cl | Cl | $CH_2CH_2CH_2CH_2NHS({=}O)_2CF_3$ | S |
| A-5547 | c-Pr | H | Cl | Cl | $CH_2CH_2CH_2CH_2CH_2NHS({=}O)_2CF_3$ | S |
| A-5548 | c-Pr | H | Cl | Cl | $CH_2CH_2N(Me)S({=}O)_2CF_3$ | S |
| A-5549 | c-Pr | H | Cl | Cl | $CH_2CH_2N(Et)S({=}O)_2CF_3$ | S |
| A-5550 | c-Pr | H | Cl | Cl | $CH_2CH_2N(CH_2CN)S({=}O)_2CF_3$ | S |
| A-5551 | c-Pr | H | Cl | Cl | $CH_2CH_2N(CH_2OMe)S({=}O)_2CF_3$ | S |
| A-5552 | c-Pr | H | Cl | Cl | $CH_2CH_2CH_2N(Me)S({=}O)_2CF_3$ | S |
| A-5553 | c-Pr | H | Cl | Cl | $CH_2CH_2CH_2N(Et)S({=}O)_2CF_3$ | S |
| A-5554 | c-Pr | H | Cl | Cl | $CH_2CH_2CH_2N(CH_2CN)S({=}O)_2CF_3$ | S |
| A-5555 | c-Pr | H | Cl | Cl | $CH_2CH_2CH_2N(CH_2OMe)S({=}O)_2CF_3$ | S |
| A-5556 | c-Pr | H | Cl | Cl | $CH_2CH_2CH_2CH_2N(Me)S({=}O)_2CF_3$ | S |
| A-5557 | c-Pr | H | Cl | Cl | $CH_2CH_2CH_2CH_2N(Et)S({=}O)_2CF_3$ | S |
| A-5558 | c-Pr | H | Cl | Cl | $CH_2CH_2CH_2CH_2N(CH_2CN)S({=}O)_2CF_3$ | S |
| A-5559 | c-Pr | H | Cl | Cl | $CH_2CH_2CH_2CH_2N(CH_2OMe)S({=}O)_2CF_3$ | S |
| A-5560 | c-Pr | H | Me | Cl | $CH_2CH_2SCF_3$ | S |
| A-5561 | c-Pr | H | Me | Cl | $CH_2CH_2CH_2SCF_3$ | S |
| A-5562 | c-Pr | H | Me | Cl | $CH_2CH_2CH_2CH_2SCF_3$ | S |
| A-5563 | c-Pr | H | Me | Cl | $CH_2CH_2CH_2CH_2CH_2SCF_3$ | S |
| A-5564 | c-Pr | H | Me | Cl | $CH_2CH_2CH_2CH_2CH_2CH_2SCF_3$ | S |
| A-5565 | c-Pr | H | Me | Cl | $CH_2CH_2CH_2CH_2CH_2CH_2CH_2SCF_3$ | S |
| A-5566 | c-Pr | H | Me | Cl | $CH_2CH_2CH_2CH_2CH_2CH_2CH_2CH_2SCF_3$ | S |
| A-5567 | c-Pr | H | Me | Cl | $CH_2CH_2NHS({=}O)_2CF_3$ | S |
| A-5568 | c-Pr | H | Me | Cl | $CH_2CH_2CH_2NHS({=}O)_2CF_3$ | S |
| A-5569 | c-Pr | H | Me | Cl | $CH_2CH_2CH_2CH_2NHS({=}O)_2CF_3$ | S |
| A-5570 | c-Pr | H | Me | Cl | $CH_2CH_2CH_2CH_2CH_2NHS({=}O)_2CF_3$ | S |
| A-5571 | c-Pr | H | Me | Cl | $CH_2CH_2N(Me)S({=}O)_2CF_3$ | S |
| A-5572 | c-Pr | H | Me | Cl | $CH_2CH_2N(Et)S({=}O)_2CF_3$ | S |
| A-5573 | c-Pr | H | Me | Cl | $CH_2CH_2N(CH_2CN)S({=}O)_2CF_3$ | S |
| A-5574 | c-Pr | H | Me | Cl | $CH_2CH_2N(CH_2OMe)S({=}O)_2CF_3$ | S |
| A-5575 | c-Pr | H | Me | Cl | $CH_2CH_2CH_2N(Me)S({=}O)_2CF_3$ | S |
| A-5576 | c-Pr | H | Me | Cl | $CH_2CH_2CH_2N(Et)S({=}O)_2CF_3$ | S |
| A-5577 | c-Pr | H | Me | Cl | $CH_2CH_2CH_2N(CH_2CN)S({=}O)_2CF_3$ | S |
| A-5578 | c-Pr | H | Me | Cl | $CH_2CH_2CH_2N(CH_2OMe)S({=}O)_2CF_3$ | S |
| A-5579 | c-Pr | H | Me | Cl | $CH_2CH_2CH_2CH_2N(Me)S({=}O)_2CF_3$ | S |
| A-5580 | c-Pr | H | Me | Cl | $CH_2CH_2CH_2CH_2N(Et)S({=}O)_2CF_3$ | S |
| A-5581 | c-Pr | H | Me | Cl | $CH_2CH_2CH_2CH_2N(CH_2CN)S({=}O)_2CF_3$ | S |
| A-5582 | c-Pr | H | Me | Cl | $CH_2CH_2CH_2CH_2N(CH_2OMe)S({=}O)_2CF_3$ | S |

TABLE 128

| Compound Number | $R^1$ | $R^2$ | $R^3$ | $R^4$ | $R^5$ | A |
|---|---|---|---|---|---|---|
| A-5583 | c-Pr | H | Me | Me | $CH_2CH_2SCF_3$ | S |
| A-5584 | c-Pr | H | Me | Me | $CH_2CH_2CH_2SCF_3$ | S |
| A-5585 | c-Pr | H | Me | Me | $CH_2CH_2CH_2CH_2SCF_3$ | S |
| A-5586 | c-Pr | H | Me | Me | $CH_2CH_2CH_2CH_2CH_2SCF_3$ | S |
| A-5587 | c-Pr | H | Me | Me | $CH_2CH_2CH_2CH_2CH_2CH_2SCF_3$ | S |
| A-5588 | c-Pr | H | Me | Me | $CH_2CH_2CH_2CH_2CH_2CH_2CH_2SCF_3$ | S |
| A-5589 | c-Pr | H | Me | Me | $CH_2CH_2CH_2CH_2CH_2CH_2CH_2CH_2SCF_3$ | S |
| A-5590 | c-Pr | H | Me | Me | $CH_2CH_2NHS({=}O)_2CF_3$ | S |
| A-5591 | c-Pr | H | Me | Me | $CH_2CH_2CH_2NHS({=}O)_2CF_3$ | S |
| A-5592 | c-Pr | H | Me | Me | $CH_2CH_2CH_2CH_2NHS({=}O)_2CF_3$ | S |
| A-5593 | c-Pr | H | Me | Me | $CH_2CH_2CH_2CH_2CH_2NHS({=}O)_2CF_3$ | S |
| A-5594 | c-Pr | H | Me | Me | $CH_2CH_2N(Me)S({=}O)_2CF_3$ | S |
| A-5595 | c-Pr | H | Me | Me | $CH_2CH_2N(Et)S({=}O)_2CF_3$ | S |
| A-5596 | c-Pr | H | Me | Me | $CH_2CH_2N(CH_2CN)S({=}O)_2CF_3$ | S |
| A-5597 | c-Pr | H | Me | Me | $CH_2CH_2N(CH_2OMe)S({=}O)_2CF_3$ | S |
| A-5598 | c-Pr | H | Me | Me | $CH_2CH_2CH_2N(Me)S({=}O)_2CF_3$ | S |
| A-5599 | c-Pr | H | Me | Me | $CH_2CH_2CH_2N(Et)S({=}O)_2CF_3$ | S |
| A-5600 | c-Pr | H | Me | Me | $CH_2CH_2CH_2N(CH_2CN)S({=}O)_2CF_3$ | S |
| A-5601 | c-Pr | H | Me | Me | $CH_2CH_2CH_2N(CH_2OMe)S({=}O)_2CF_3$ | S |
| A-5602 | c-Pr | H | Me | Me | $CH_2CH_2CH_2CH_2N(Me)S({=}O)_2CF_3$ | S |
| A-5603 | c-Pr | H | Me | Me | $CH_2CH_2CH_2CH_2N(Et)S({=}O)_2CF_3$ | S |
| A-5604 | c-Pr | H | Me | Me | $CH_2CH_2CH_2CH_2N(CH_2CN)S({=}O)_2CF_3$ | S |
| A-5605 | c-Pr | H | Me | Me | $CH_2CH_2CH_2CH_2N(CH_2OMe)S({=}O)_2CF_3$ | S |

TABLE 128-continued

| Compound Number | $R^1$ | $R^2$ | $R^3$ | $R^4$ | $R^5$ | A |
|---|---|---|---|---|---|---|
| A-5606 | Me | H | Cl | F | $CH_2CH_2SCF_3$ | O |
| A-5607 | Me | H | Cl | F | $CH_2CH_2CH_2SCF_3$ | O |
| A-5608 | Me | H | Cl | F | $CH_2CH_2CH_2CH_2SCF_3$ | O |
| A-5609 | Me | H | Cl | F | $CH_2CH_2CH_2CH_2CH_2SCF_3$ | O |
| A-5610 | Me | H | Cl | F | $CH_2CH_2CH_2CH_2CH_2CH_2SCF_3$ | O |
| A-5611 | Me | H | Cl | F | $CH_2CH_2CH_2CH_2CH_2CH_2CH_2SCF_3$ | O |
| A-5612 | Me | H | Cl | F | $CH_2CH_2CH_2CH_2CH_2CH_2CH_2CH_2SCF_3$ | O |
| A-5613 | Me | H | Cl | F | $CH_2CH_2NHS(=O)_2CF_3$ | O |
| A-5614 | Me | H | Cl | F | $CH_2CH_2CH_2NHS(=O)_2CF_3$ | O |
| A-5615 | Me | H | Cl | F | $CH_2CH_2CH_2CH_2NHS(=O)_2CF_3$ | O |
| A-5616 | Me | H | Cl | F | $CH_2CH_2CH_2CH_2CH_2NHS(=O)_2CF_3$ | O |
| A-5617 | Me | H | Cl | F | $CH_2CH_2N(Me)S(=O)_2CF_3$ | O |
| A-5618 | Me | H | Cl | F | $CH_2CH_2N(Et)S(=O)_2CF_3$ | O |
| A-5619 | Me | H | Cl | F | $CH_2CH_2N(CH_2CN)S(=O)_2CF_3$ | O |
| A-5620 | Me | H | Cl | F | $CH_2CH_2N(CH_2OMe)S(=O)_2CF_3$ | O |
| A-5621 | Me | H | Cl | F | $CH_2CH_2CH_2N(Me)S(=O)_2CF_3$ | O |
| A-5622 | Me | H | Cl | F | $CH_2CH_2CH_2N(Et)S(=O)_2CF_3$ | O |
| A-5623 | Me | H | Cl | F | $CH_2CH_2CH_2N(CH_2CN)S(=O)_2CF_3$ | O |
| A-5624 | Me | H | Cl | F | $CH_2CH_2CH_2N(CH_2OMe)S(=O)_2CF_3$ | O |
| A-5625 | Me | H | Cl | F | $CH_2CH_2CH_2CH_2N(Me)S(=O)_2CF_3$ | O |
| A-5626 | Me | H | Cl | F | $CH_2CH_2CH_2CH_2N(Et)S(=O)_2CF_3$ | O |

TABLE 129

| Compound Number | $R^1$ | $R^2$ | $R^3$ | $R^4$ | $R^5$ | A |
|---|---|---|---|---|---|---|
| A-5627 | Me | H | C | F | $CH_2CH_2CH_2CH_2N(CH_2CN)S(=O)_2CF_3$ | O |
| A-5628 | Me | H | Cl | F | $CH_2CH_2CH_2CH_2N(CH_2OMe)S(=O)_2CF_3$ | O |
| A-5629 | Me | H | Me | F | $CH_2CH_2SCF_3$ | O |
| A-5630 | Me | H | Me | F | $CH_2CH_2CH_2SCF_3$ | O |
| A-5631 | Me | H | Me | F | $CH_2CH_2CH_2CH_2SCF_3$ | O |
| A-5632 | Me | H | Me | F | $CH_2CH_2CH_2CH_2CH_2SCF_3$ | O |
| A-5633 | Me | H | Me | F | $CH_2CH_2CH_2CH_2CH_2CH_2SCF_3$ | O |
| A-5634 | Me | H | Me | F | $CH_2CH_2CH_2CH_2CH_2CH_2CH_2SCF_3$ | O |
| A-5635 | Me | H | Me | F | $CH_2CH_2CH_2CH_2CH_2CH_2CH_2CH_2SCF_3$ | O |
| A-5636 | Me | H | Me | F | $CH_2CH_2NHS(=O)_2CF_3$ | O |
| A-5637 | Me | H | Me | F | $CH_2CH_2CH_2NHS(=O)_2CF_3$ | O |
| A-5638 | Me | H | Me | F | $CH_2CH_2CH_2CH_2NHS(=O)_2CF_3$ | O |
| A-5639 | Me | H | Me | F | $CH_2CH_2CH_2CH_2CH_2NHS(=O)_2CF_3$ | O |
| A-5640 | Me | H | Me | F | $CH_2CH_2N(Me)S(=O)_2CF_3$ | O |
| A-5641 | Me | H | Me | F | $CH_2CH_2N(Et)S(=O)_2CF_3$ | O |
| A-5642 | Me | H | Me | F | $CH_2CH_2N(CH_2CN)S(=O)_2CF_3$ | O |
| A-5643 | Me | H | Me | F | $CH_2CH_2N(CH_2OMe)S(=O)_2CF_3$ | O |
| A-5644 | Me | H | Me | F | $CH_2CH_2CH_2N(Me)S(=O)_2CF_3$ | O |
| A-5645 | Me | H | Me | F | $CH_2CH_2CH_2N(Et)S(=O)_2CF_3$ | O |
| A-5646 | Me | H | Me | F | $CH_2CH_2CH_2N(CH_2CN)S(=O)_2CF_3$ | O |
| A-5647 | Me | H | Me | F | $CH_2CH_2CH_2N(CH_2OMe)S(=O)_2CF_3$ | O |
| A-5648 | Me | H | Me | F | $CH_2CH_2CH_2CH_2N(Me)S(=O)_2CF_3$ | O |
| A-5649 | Me | H | Me | F | $CH_2CH_2CH_2CH_2N(Et)S(=O)_2CF_3$ | O |
| A-5650 | Me | H | Me | F | $CH_2CH_2CH_2CH_2N(CH_2CN)S(=O)_2CF_3$ | O |
| A-5651 | Me | H | Me | F | $CH_2CH_2CH_2CH_2N(CH_2OMe)S(=O)_2CF_3$ | O |
| A-5652 | n-Pr | H | Cl | F | $CH_2CH_2SCF_3$ | O |
| A-5653 | n-Pr | H | Cl | F | $CH_2CH_2CH_2SCF_3$ | O |
| A-5654 | n-Pr | H | Cl | F | $CH_2CH_2CH_2CH_2SCF_3$ | O |
| A-5655 | n-Pr | H | Cl | F | $CH_2CH_2CH_2CH_2CH_2SCF_3$ | O |
| A-5656 | n-Pr | H | Cl | F | $CH_2CH_2CH_2CH_2CH_2CH_2SCF_3$ | O |
| A-5657 | n-Pr | H | Cl | F | $CH_2CH_2CH_2CH_2CH_2CH_2CH_2SCF_3$ | O |
| A-5658 | n-Pr | H | Cl | F | $CH_2CH_2CH_2CH_2CH_2CH_2CH_2CH_2SCF_3$ | O |
| A-5659 | n-Pr | H | Cl | F | $CH_2CH_2NHS(=O)_2CF_3$ | O |
| A-5660 | n-Pr | H | Cl | F | $CH_2CH_2CH_2NHS(=O)_2CF_3$ | O |
| A-5661 | n-Pr | H | Cl | F | $CH_2CH_2CH_2CH_2NHS(=O)_2CF_3$ | O |
| A-5662 | n-Pr | H | Cl | F | $CH_2CH_2CH_2CH_2CH_2NHS(=O)_2CF_3$ | O |
| A-5663 | n-Pr | H | Cl | F | $CH_2CH_2N(Me)S(=O)_2CF_3$ | O |
| A-5664 | n-Pr | H | Cl | F | $CH_2CH_2N(Et)S(=O)_2CF_3$ | O |
| A-5665 | n-Pr | H | Cl | F | $CH_2CH_2N(CH_2CN)S(=O)_2CF_3$ | O |
| A-5666 | n-Pr | H | Cl | F | $CH_2CH_2N(CH_2OMe)S(=O)_2CF_3$ | O |
| A-5667 | n-Pr | H | Cl | F | $CH_2CH_2CH_2N(Me)S(=O)_2CF_3$ | O |
| A-5668 | n-Pr | H | Cl | F | $CH_2CH_2CH_2N(Et)S(=O)_2CF_3$ | O |
| A-5669 | n-Pr | H | Cl | F | $CH_2CH_2CH_2N(CH_2CN)S(=O)_2CF_3$ | O |
| A-5670 | n-Pr | H | Cl | F | $CH_2CH_2CH_2N(CH_2OMe)S(=O)_2CF_3$ | O |

TABLE 130

| Compound Number | $R^1$ | $R^2$ | $R^3$ | $R^4$ | $R^5$ | A |
|---|---|---|---|---|---|---|
| A-5671 | n-Pr | H | Cl | F | $CH_2CH_2CH_2CH_2N(Me)S(=O)_2CF_3$ | O |
| A-5672 | n-Pr | H | Cl | F | $CH_2CH_2CH_2CH_2N(Et)S(=O)_2CF_3$ | O |
| A-5673 | n-Pr | H | Cl | F | $CH_2CH_2CH_2CH_2N(CH_2CN)S(=O)_2CF_3$ | O |
| A-5674 | n-Pr | H | Cl | F | $CH_2CH_2CH_2CH_2N(CH_2OMe)S(=O)_2CF_3$ | O |
| A-5675 | n-Pr | H | Me | F | $CH_2CH_2SCF_3$ | O |
| A-5676 | n-Pr | H | Me | F | $CH_2CH_2CH_2SCF_3$ | O |
| A-5677 | n-Pr | H | Me | F | $CH_2CH_2CH_2CH_2SCF_3$ | O |
| A-5678 | n-Pr | H | Me | F | $CH_2CH_2CH_2CH_2CH_2SCF_3$ | O |
| A-5679 | n-Pr | H | Me | F | $CH_2CH_2CH_2CH_2CH_2CH_2SCF_3$ | O |
| A-5680 | n-Pr | H | Me | F | $CH_2CH_2CH_2CH_2CH_2CH_2CH_2SCF_3$ | O |
| A-5681 | n-Pr | H | Me | F | $CH_2CH_2CH_2CH_2CH_2CH_2CH_2CH_2SCF_3$ | O |
| A-5682 | n-Pr | H | Me | F | $CH_2CH_2NHS(=O)_2CF_3$ | O |
| A-5683 | n-Pr | H | Me | F | $CH_2CH_2CH_2NHS(=O)_2CF_3$ | O |
| A-5684 | n-Pr | H | Me | F | $CH_2CH_2CH_2CH_2NHS(=O)_2CF_3$ | O |
| A-5685 | n-Pr | H | Me | F | $CH_2CH_2CH_2CH_2CH_2NHS(=O)_2CF_3$ | O |
| A-5686 | n-Pr | H | Me | F | $CH_2CH_2N(Me)S(=O)_2CF_3$ | O |
| A-5687 | n-Pr | H | Me | F | $CH_2CH_2N(Et)S(=O)_2CF_3$ | O |
| A-5688 | n-Pr | H | Me | F | $CH_2CH_2N(CH_2CN)S(=O)_2CF_3$ | O |
| A-5689 | n-Pr | H | Me | F | $CH_2CH_2N(CH_2OMe)S(=O)_2CF_3$ | O |
| A-5690 | n-Pr | H | Me | F | $CH_2CH_2CH_2N(Me)S(=O)_2CF_3$ | O |
| A-5691 | n-Pr | H | Me | F | $CH_2CH_2CH_2N(Et)S(=O)_2CF_3$ | O |
| A-5692 | n-Pr | H | Me | F | $CH_2CH_2CH_2N(CH_2CN)S(=O)_2CF_3$ | O |
| A-5693 | n-Pr | H | Me | F | $CH_2CH_2CH_2N(CH_2OMe)S(=O)_2CF_3$ | O |
| A-5694 | n-Pr | H | Me | F | $CH_2CH_2CH_2CH_2N(Me)S(=O)_2CF_3$ | O |
| A-5695 | n-Pr | H | Me | F | $CH_2CH_2CH_2CH_2N(Et)S(=O)_2CF_3$ | O |
| A-5696 | n-Pr | H | Me | F | $CH_2CH_2CH_2CH_2N(CH_2CN)S(=O)_2CF_3$ | O |
| A-5697 | n-Pr | H | Me | F | $CH_2CH_2CH_2CH_2N(CH_2OMe)S(=O)_2CF_3$ | O |
| A-5698 | i-Pr | H | Cl | F | $CH_2CH_2SCF_3$ | O |
| A-5699 | i-Pr | H | Cl | F | $CH_2CH_2CH_2SCF_3$ | O |
| A-5700 | i-Pr | H | Cl | F | $CH_2CH_2CH_2CH_2SCF_3$ | O |
| A-5701 | i-Pr | H | Cl | F | $CH_2CH_2CH_2CH_2CH_2SCF_3$ | O |
| A-5702 | i-Pr | H | Cl | F | $CH_2CH_2CH_2CH_2CH_2CH_2SCF_3$ | O |
| A-5703 | i-Pr | H | Cl | F | $CH_2CH_2CH_2CH_2CH_2CH_2CH_2SCF_3$ | O |
| A-5704 | i-Pr | H | Cl | F | $CH_2CH_2CH_2CH_2CH_2CH_2CH_2CH_2SCF_3$ | O |
| A-5705 | i-Pr | H | Cl | F | $CH_2CH_2NHS(=O)_2CF_3$ | O |
| A-5706 | i-Pr | H | Cl | F | $CH_2CH_2CH_2NHS(=O)_2CF_3$ | O |
| A-5707 | i-Pr | H | Cl | F | $CH_2CH_2CH_2CH_2NHS(=O)_2CF_3$ | O |
| A-5708 | i-Pr | H | Cl | F | $CH_2CH_2CH_2CH_2CH_2NHS(=O)_2CF_3$ | O |
| A-5709 | i-Pr | H | Cl | F | $CH_2CH_2N(Me)S(=O)_2CF_3$ | O |
| A-5710 | i-Pr | H | Cl | F | $CH_2CH_2N(Et)S(=O)_2CF_3$ | O |
| A-5711 | i-Pr | H | Cl | F | $CH_2CH_2N(CH_2CN)S(=O)_2CF_3$ | O |
| A-5712 | i-Pr | H | Cl | F | $CH_2CH_2N(CH_2OMe)S(=O)_2CF_3$ | O |
| A-5713 | i-Pr | H | Cl | F | $CH_2CH_2CH_2N(Me)S(=O)_2CF_3$ | O |
| A-5714 | i-Pr | H | Cl | F | $CH_2CH_2CH_2N(Et)S(=O)_2CF_3$ | O |

TABLE 131

| Compound Number | $R^1$ | $R^2$ | $R^3$ | $R^4$ | $R^5$ | A |
|---|---|---|---|---|---|---|
| A-5715 | i-Pr | H | Cl | F | $CH_2CH_2CH_2N(CH_2CN)S(=O)_2CF_3$ | O |
| A-5716 | i-Pr | H | Cl | F | $CH_2CH_2CH_2N(CH_2OMe)S(=O)_2CF_3$ | O |
| A-5717 | i-Pr | H | Cl | F | $CH_2CH_2CH_2CH_2N(Me)S(=O)_2CF_3$ | O |
| A-5718 | i-Pr | H | Cl | F | $CH_2CH_2CH_2CH_2N(Et)S(=O)_2CF_3$ | O |
| A-5719 | i-Pr | H | Cl | F | $CH_2CH_2CH_2CH_2N(CH_2CN)S(=O)_2CF_3$ | O |
| A-5720 | i-Pr | H | Cl | F | $CH_2CH_2CH_2CH_2N(CH_2OMe)S(=O)_2CF_3$ | O |
| A-5721 | i-Pr | H | Me | F | $CH_2CH_2SCF_3$ | O |
| A-5722 | i-Pr | H | Me | F | $CH_2CH_2CH_2SCF_3$ | O |
| A-5723 | i-Pr | H | Me | F | $CH_2CH_2CH_2CH_2SCF_3$ | O |
| A-5724 | i-Pr | H | Me | F | $CH_2CH_2CH_2CH_2CH_2SCF_3$ | O |
| A-5725 | i-Pr | H | Me | F | $CH_2CH_2CH_2CH_2CH_2CH_2SCF_3$ | O |
| A-5726 | i-Pr | H | Me | F | $CH_2CH_2CH_2CH_2CH_2CH_2CH_2SCF_3$ | O |
| A-5727 | i-Pr | H | Me | F | $CH_2CH_2CH_2CH_2CH_2CH_2CH_2CH_2SCF_3$ | O |
| A-5728 | i-Pr | H | Me | F | $CH_2CH_2NHS(=O)_2CF_3$ | O |
| A-5729 | i-Pr | H | Me | F | $CH_2CH_2CH_2NHS(=O)_2CF_3$ | O |
| A-5730 | i-Pr | H | Me | F | $CH_2CH_2CH_2CH_2NHS(=O)_2CF_3$ | O |
| A-5731 | i-Pr | H | Me | F | $CH_2CH_2CH_2CH_2CH_2NHS(=O)_2CF_3$ | O |
| A-5732 | i-Pr | H | Me | F | $CH_2CH_2N(Me)S(=O)_2CF_3$ | O |
| A-5733 | i-Pr | H | Me | F | $CH_2CH_2N(Et)S(=O)_2CF_3$ | O |
| A-5734 | i-Pr | H | Me | F | $CH_2CH_2N(CH_2CN)S(=O)_2CF_3$ | O |
| A-5735 | i-Pr | H | Me | F | $CH_2CH_2N(CH_2OMe)S(=O)_2CF_3$ | O |

TABLE 131-continued

| Compound Number | $R^1$ | $R^2$ | $R^3$ | $R^4$ | $R^5$ | A |
|---|---|---|---|---|---|---|
| A-5736 | i-Pr | H | Me | F | $CH_2CH_2CH_2N(Me)S(=O)_2CF_3$ | O |
| A-5737 | i-Pr | H | Me | F | $CH_2CH_2CH_2N(Et)S(=O)_2CF_3$ | O |
| A-5738 | i-Pr | H | Me | F | $CH_2CH_2CH_2N(CH_2CN)S(=O)_2CF_3$ | O |
| A-5739 | i-Pr | H | Me | F | $CH_2CH_2CH_2N(CH_2OMe)S(=O)_2CF_3$ | O |
| A-5740 | i-Pr | H | Me | F | $CH_2CH_2CH_2CH_2N(Me)S(=O)_2CF_3$ | O |
| A-5741 | i-Pr | H | Me | F | $CH_2CH_2CH_2CH_2N(Et)S(=O)_2CF_3$ | O |
| A-5742 | i-Pr | H | Me | F | $CH_2CH_2CH_2CH_2N(CH_2CN)S(=O)_2CF_3$ | O |
| A-5743 | i-Pr | H | Me | F | $CH_2CH_2CH_2CH_2N(CH_2OMe)S(=O)_2CF_3$ | O |
| A-5744 | c-Pr(1-CN) | H | Cl | F | $CH_2CH_2SCF_3$ | O |
| A-5745 | c-Pr(1-CN) | H | Cl | F | $CH_2CH_2CH_2SCF_3$ | O |
| A-5746 | c-Pr(1-CN) | H | Cl | F | $CH_2CH_2CH_2CH_2SCF_3$ | O |
| A-5747 | c-Pr(1-CN) | H | Cl | F | $CH_2CH_2CH_2CH_2CH_2SCF_3$ | O |
| A-5748 | c-Pr(1-CN) | H | Cl | F | $CH_2CH_2CH_2CH_2CH_2CH_2SCF_3$ | O |
| A-5749 | c-Pr(1-CN) | H | Cl | F | $CH_2CH_2CH_2CH_2CH_2CH_2CH_2SCF_3$ | O |
| A-5750 | c-Pr(1-CN) | H | Cl | F | $CH_2CH_2CH_2CH_2CH_2CH_2CH_2CH_2SCF_3$ | O |
| A-5751 | c-Pr(1-CN) | H | Cl | F | $CH_2CH_2NHS(=O)_2CF_3$ | O |
| A-5752 | c-Pr(1-CN) | H | Cl | F | $CH_2CH_2CH_2NHS(=O)_2CF_3$ | O |
| A-5753 | c-Pr(1-CN) | H | Cl | F | $CH_2CH_2CH_2CH_2NHS(=O)_2CF_3$ | O |
| A-5754 | c-Pr(1-CN) | H | Cl | F | $CH_2CH_2CH_2CH_2CH_2NHS(=O)_2CF_3$ | O |
| A-5755 | c-Pr(1-CN) | H | Cl | F | $CH_2CH_2N(Me)S(=O)_2CF_3$ | O |
| A-5756 | c-Pr(1-CN) | H | Cl | F | $CH_2CH_2N(Et)S(=O)_2CF_3$ | O |
| A-5757 | c-Pr(1-CN) | H | Cl | F | $CH_2CH_2N(CH_2CN)S(=O)_2CF_3$ | O |
| A-5758 | c-Pr(1-CN) | H | Cl | F | $CH_2CH_2N(CH_2OMe)S(=O)_2CF_3$ | O |

TABLE 132

| Compound Number | $R^1$ | $R^2$ | $R^3$ | $R^4$ | $R^5$ | A |
|---|---|---|---|---|---|---|
| A-5759 | c-Pr(1-CN) | H | Cl | F | $CH_2CH_2CH_2N(Me)S(=O)_2CF_3$ | O |
| A-5760 | c-Pr(1-CN) | H | Cl | F | $CH_2CH_2CH_2N(Et)S(=O)_2CF_3$ | O |
| A-5761 | c-Pr(1-CN) | H | Cl | F | $CH_2CH_2CH_2N(CH_2CN)S(=O)_2CF_3$ | O |
| A-5762 | c-Pr(1-CN) | H | Cl | F | $CH_2CH_2CH_2N(CH_2OMe)S(=O)_2CF_3$ | O |
| A-5763 | c-Pr(1-CN) | H | Cl | F | $CH_2CH_2CH_2CH_2N(Me)S(=O)_2CF_3$ | O |
| A-5764 | c-Pr(1-CN) | H | Cl | F | $CH_2CH_2CH_2CH_2N(Et)S(=O)_2CF_3$ | O |
| A-5765 | c-Pr(1-CN) | H | Cl | F | $CH_2CH_2CH_2CH_2N(CH_2CN)S(=O)_2CF_3$ | O |
| A-5766 | c-Pr(1-CN) | H | Cl | F | $CH_2CH_2CH_2CH_2N(CH_2OMe)S(=O)_2CF_3$ | O |
| A-5767 | c-Pr(1-CN) | H | Me | F | $CH_2CH_2SCF_3$ | O |
| A-5768 | c-Pr(1-CN) | H | Me | F | $CH_2CH_2CH_2SCF_3$ | O |
| A-5769 | c-Pr(1-CN) | H | Me | F | $CH_2CH_2CH_2CH_2SCF_3$ | O |
| A-5770 | c-Pr(1-CN) | H | Me | F | $CH_2CH_2CH_2CH_2CH_2SCF_3$ | O |
| A-5771 | c-Pr(1-CN) | H | Me | F | $CH_2CH_2CH_2CH_2CH_2CH_2SCF_3$ | O |
| A-5772 | c-Pr(1-CN) | H | Me | F | $CH_2CH_2CH_2CH_2CH_2CH_2CH_2SCF_3$ | O |
| A-5773 | c-Pr(1-CN) | H | Me | F | $CH_2CH_2CH_2CH_2CH_2CH_2CH_2CH_2SCF_3$ | O |
| A-5774 | c-Pr(1-CN) | H | Me | F | $CH_2CH_2NHS(=O)_2CF_3$ | O |
| A-5775 | c-Pr(1-CN) | H | Me | F | $CH_2CH_2CH_2NHS(=O)_2CF_3$ | O |
| A-5776 | c-Pr(1-CN) | H | Me | F | $CH_2CH_2CH_2CH_2NHS(=O)_2CF_3$ | O |
| A-5777 | c-Pr(1-CN) | H | Me | F | $CH_2CH_2CH_2CH_2CH_2NHS(=O)_2CF_3$ | O |
| A-5778 | c-Pr(1-CN) | H | Me | F | $CH_2CH_2N(Me)S(=O)_2CF_3$ | O |
| A-5779 | c-Pr(1-CN) | H | Me | F | $CH_2CH_2N(Et)S(=O)_2CF_3$ | O |
| A-5780 | c-Pr(1-CN) | H | Me | F | $CH_2CH_2N(CH_2CN)S(=O)_2CF_3$ | O |
| A-5781 | c-Pr(1-CN) | H | Me | F | $CH_2CH_2N(CH_2OMe)S(=O)_2CF_3$ | O |
| A-5782 | c-Pr(1-CN) | H | Me | F | $CH_2CH_2CH_2N(Me)S(=O)_2CF_3$ | O |
| A-5783 | c-Pr(1-CN) | H | Me | F | $CH_2CH_2CH_2N(Et)S(=O)_2CF_3$ | O |
| A-5784 | c-Pr(1-CN) | H | Me | F | $CH_2CH_2CH_2N(CH_2CN)S(=O)_2CF_3$ | O |
| A-5785 | c-Pr(1-CN) | H | Me | F | $CH_2CH_2CH_2N(CH_2OMe)S(=O)_2CF_3$ | O |
| A-5786 | c-Pr(1-CN) | H | Me | F | $CH_2CH_2CH_2CH_2N(Me)S(=O)_2CF_3$ | O |
| A-5787 | c-Pr(1-CN) | H | Me | F | $CH_2CH_2CH_2CH_2N(Et)S(=O)_2CF_3$ | O |
| A-5788 | c-Pr(1-CN) | H | Me | F | $CH_2CH_2CH_2CH_2N(CH_2CN)S(=O)_2CF_3$ | O |
| A-5789 | c-Pr(1-CN) | H | Me | F | $CH_2CH_2CH_2CH_2N(CH_2OMe)S(=O)_2CF_3$ | O |
| A-5790 | c-Pr(1-CN) | H | Cl | H | $CH_2CH_2SCF_3$ | O |
| A-5791 | c-Pr(1-CN) | H | Cl | H | $CH_2CH_2CH_2SCF_3$ | O |
| A-5792 | c-Pr(1-CN) | H | Cl | H | $CH_2CH_2CH_2CH_2SCF_3$ | O |
| A-5793 | c-Pr(1-CN) | H | Cl | H | $CH_2CH_2CH_2CH_2CH_2SCF_3$ | O |
| A-5794 | c-Pr(1-CN) | H | Cl | H | $CH_2CH_2CH_2CH_2CH_2CH_2SCF_3$ | O |
| A-5795 | c-Pr(1-CN) | H | Cl | H | $CH_2CH_2CH_2CH_2CH_2CH_2CH_2SCF_3$ | O |
| A-5796 | c-Pr(1-CN) | H | Cl | H | $CH_2CH_2CH_2CH_2CH_2CH_2CH_2CH_2SCF_3$ | O |
| A-5797 | c-Pr(1-CN) | H | Cl | H | $CH_2CH_2NHS(=O)_2CF_3$ | O |
| A-5798 | c-Pr(1-CN) | H | Cl | H | $CH_2CH_2CH_2NHS(=O)_2CF_3$ | O |
| A-5799 | c-Pr(1-CN) | H | Cl | H | $CH_2CH_2CH_2CH_2NHS(=O)_2CF_3$ | O |

TABLE 132-continued

| Compound Number | $R^1$ | $R^2$ | $R^3$ | $R^4$ | $R^5$ | A |
|---|---|---|---|---|---|---|
| A-5800 | c-Pr(1-CN) | H | Cl | H | $CH_2CH_2CH_2CH_2CH_2NHS(=O)_2CF_3$ | O |
| A-5801 | c-Pr(1-CN) | H | Cl | H | $CH_2CH_2N(Me)S(=O)_2CF_3$ | O |
| A-5802 | c-Pr(1-CN) | H | Cl | H | $CH_2CH_2N(Et)S(=O)_2CF_3$ | O |

TABLE 133

| Compound Number | $R^1$ | $R^2$ | $R^3$ | $R^4$ | $R^5$ | A |
|---|---|---|---|---|---|---|
| A-5803 | c-Pr(1-CN) | H | Cl | H | $CH_2CH_2N(CH_2CN)S(=O)_2CF_3$ | O |
| A-5804 | c-Pr(1-CN) | H | Cl | H | $CH_2CH_2N(CH_2OMe)S(=O)_2CF_3$ | O |
| A-5805 | c-Pr(1-CN) | H | Cl | H | $CH_2CH_2CH_2N(Me)S(=O)_2CF_3$ | O |
| A-5806 | c-Pr(1-CN) | H | Cl | H | $CH_2CH_2CH_2N(Et)S(=O)_2CF_3$ | O |
| A-5807 | c-Pr(1-CN) | H | Cl | H | $CH_2CH_2CH_2N(CH_2CN)S(=O)_2CF_3$ | O |
| A-5808 | c-Pr(1-CN) | H | Cl | H | $CH_2CH_2CH_2N(CH_2OMe)S(=O)_2CF_3$ | O |
| A-5809 | c-Pr(1-CN) | H | Cl | H | $CH_2CH_2CH_2CH_2N(Me)S(=O)_2CF_3$ | O |
| A-5810 | c-Pr(1-CN) | H | Cl | H | $CH_2CH_2CH_2CH_2N(Et)S(=O)_2CF_3$ | O |
| A-5811 | c-Pr(1-CN) | H | Cl | H | $CH_2CH_2CH_2CH_2N(CH_2CN)S(=O)_2CF_3$ | O |
| A-5812 | c-Pr(1-CN) | H | Cl | H | $CH_2CH_2CH_2CH_2N(CH_2OMe)S(=O)_2CF_3$ | O |
| A-5813 | c-Pr(1-CN) | H | Me | H | $CH_2CH_2SCF_3$ | O |
| A-5814 | c-Pr(1-CN) | H | Me | H | $CH_2CH_2CH_2SCF_3$ | O |
| A-5815 | c-Pr(1-CN) | H | Me | H | $CH_2CH_2CH_2CH_2SCF_3$ | O |
| A-5816 | c-Pr(1-CN) | H | Me | H | $CH_2CH_2CH_2CH_2CH_2SCF_3$ | O |
| A-5817 | c-Pr(1-CN) | H | Me | H | $CH_2CH_2CH_2CH_2CH_2CH_2SCF_3$ | O |
| A-5818 | c-Pr(1-CN) | H | Me | H | $CH_2CH_2CH_2CH_2CH_2CH_2CH_2SCF_3$ | O |
| A-5819 | c-Pr(1-CN) | H | Me | H | $CH_2CH_2CH_2CH_2CH_2CH_2CH_2CH_2SCF_3$ | O |
| A-5820 | c-Pr(1-CN) | H | Me | H | $CH_2CH_2NHS(=O)_2CF_3$ | O |
| A-5821 | c-Pr(1-CN) | H | Me | H | $CH_2CH_2CH_2NHS(=O)_2CF_3$ | O |
| A-5822 | c-Pr(1-CN) | H | Me | H | $CH_2CH_2CH_2CH_2NHS(=O)_2CF_3$ | O |
| A-5823 | c-Pr(1-CN) | H | Me | H | $CH_2CH_2CH_2CH_2CH_2NHS(=O)_2CF_3$ | O |
| A-5824 | c-Pr(1-CN) | H | Me | H | $CH_2CH_2N(Me)S(=O)_2CF_3$ | O |
| A-5825 | c-Pr(1-CN) | H | Me | H | $CH_2CH_2N(Et)S(=O)_2CF_3$ | O |
| A-5826 | c-Pr(1-CN) | H | Me | H | $CH_2CH_2N(CH_2CN)S(=O)_2CF_3$ | O |
| A-5827 | c-Pr(1-CN) | H | Me | H | $CH_2CH_2N(CH_2OMe)S(=O)_2CF_3$ | O |
| A-5828 | c-Pr(1-CN) | H | Me | H | $CH_2CH_2CH_2N(Me)S(=O)_2CF_3$ | O |
| A-5829 | c-Pr(1-CN) | H | Me | H | $CH_2CH_2CH_2N(Et)S(=O)_2CF_3$ | O |
| A-5830 | c-Pr(1-CN) | H | Me | H | $CH_2CH_2CH_2N(CH_2CN)S(=O)_2CF_3$ | O |
| A-5831 | c-Pr(1-CN) | H | Me | H | $CH_2CH_2CH_2N(CH_2OMe)S(=O)_2CF_3$ | O |
| A-5832 | c-Pr(1-CN) | H | Me | H | $CH_2CH_2CH_2CH_2N(Me)S(=O)_2CF_3$ | O |
| A-5833 | c-Pr(1-CN) | H | Me | H | $CH_2CH_2CH_2CH_2N(Et)S(=O)_2CF_3$ | O |
| A-5834 | c-Pr(1-CN) | H | Me | H | $CH_2CH_2CH_2CH_2N(CH_2CN)S(=O)_2CF_3$ | O |
| A-5835 | c-Pr(1-CN) | H | Me | H | $CH_2CH_2CH_2CH_2N(CH_2OMe)S(=O)_2CF_3$ | O |
| A-5836 | c-Pr(2,2-$F_2$) | H | Cl | F | $CH_2CH_2SCF_3$ | O |
| A-5837 | c-Pr(2,2-$F_2$) | H | Cl | F | $CH_2CH_2CH_2SCF_3$ | O |
| A-5838 | c-Pr(2,2-$F_2$) | H | Cl | F | $CH_2CH_2CH_2CH_2SCF_3$ | O |
| A-5839 | c-Pr(2,2-$F_2$) | H | Cl | F | $CH_2CH_2CH_2CH_2CH_2SCF_3$ | O |
| A-5840 | c-Pr(2,2-$F_2$) | H | Cl | F | $CH_2CH_2CH_2CH_2CH_2CH_2SCF_3$ | O |
| A-5841 | c-Pr(2,2-$F_2$) | H | Cl | F | $CH_2CH_2CH_2CH_2CH_2CH_2CH_2SCF_3$ | O |
| A-5842 | c-Pr(2,2-$F_2$) | H | Cl | F | $CH_2CH_2CH_2CH_2CH_2CH_2CH_2CH_2SCF_3$ | O |
| A-5843 | c-Pr(2,2-$F_2$) | H | Cl | F | $CH_2CH_2NHS(=O)_2CF_3$ | O |
| A-5844 | c-Pr(2,2-$F_2$) | H | Cl | F | $CH_2CH_2CH_2NHS(=O)_2CF_3$ | O |
| A-5845 | c-Pr(2,2-$F_2$) | H | Cl | F | $CH_2CH_2CH_2CH_2NHS(=O)_2CF_3$ | O |
| A-5846 | c-Pr(2,2-$F_2$) | H | Cl | F | $CH_2CH_2CH_2CH_2CH_2NHS(=O)_2CF_3$ | O |

TABLE 134

| Compound Number | $R^1$ | $R^2$ | $R^3$ | $R^4$ | $R^5$ | A |
|---|---|---|---|---|---|---|
| A-5847 | c-Pr(2,2-$F_2$) | H | Cl | F | $CH_2CH_2N(Me)S(=O)_2CF_3$ | O |
| A-5848 | C-Pr(2,2-$F_2$) | H | Cl | F | $CH_2CH_2N(Et)S(=O)_2CF_3$ | O |
| A-5849 | c-Pr(2,2-$F_2$) | H | Cl | F | $CH_2CH_2N(CH_2CN)S(=O)_2CF_3$ | O |
| A-5850 | c-Pr(2,2-$F_2$) | H | Cl | F | $CH_2CH_2N(CH_2OMe)S(=O)_2CF_3$ | O |
| A-5851 | c-Pr(2,2-$F_2$) | H | Cl | F | $CH_2CH_2CH_2N(Me)S(=O)_2CF_3$ | O |
| A-5852 | c-Pr(2,2-$F_2$) | H | Cl | F | $CH_2CH_2CH_2N(Et)S(=O)_2CF_3$ | O |
| A-5853 | c-Pr(2,2-$F_2$) | H | Cl | F | $CH_2CH_2CH_2N(CH_2CN)S(=O)_2CF_3$ | O |
| A-5854 | c-Pr(2,2-$F_2$) | H | Cl | F | $CH_2CH_2CH_2N(CH_2OMe)S(=O)_2CF_3$ | O |
| A-5855 | c-Pr(2,2-$F_2$) | H | Cl | F | $CH_2CH_2CH_2CH_2N(Me)S(=O)_2CF_3$ | O |

TABLE 134-continued

| Compound Number | $R^1$ | $R^2$ | $R^3$ | $R^4$ | $R^5$ | A |
|---|---|---|---|---|---|---|
| A-5856 | c-Pr(2,2-$F_2$) | H | Cl | F | $CH_2CH_2CH_2CH_2N(Et)S(=O)_2CF_3$ | O |
| A-5857 | c-Pr(2,2-$F_2$) | H | Cl | F | $CH_2CH_2CH_2CH_2N(CH_2CN)S(=O)_2CF_3$ | O |
| A-5858 | c-Pr(2,2-$F_2$) | H | Cl | F | $CH_2CH_2CH_2CH_2N(CH_2OMe)S(=O)_2CF_3$ | O |
| A-5859 | c-Pr(2,2-$F_2$) | H | Me | F | $CH_2CH_2SCF_3$ | O |
| A-5860 | c-Pr(2,2-$F_2$) | H | Me | F | $CH_2CH_2CH_2SCF_3$ | O |
| A-5861 | c-Pr(2,2-$F_2$) | H | Me | F | $CH_2CH_2CH_2CH_2SCF_3$ | O |
| A-5862 | c-Pr(2,2-$F_2$) | H | Me | F | $CH_2CH_2CH_2CH_2CH_2SCF_3$ | O |
| A-5863 | c-Pr(2,2-$F_2$) | H | Me | F | $CH_2CH_2CH_2CH_2CH_2CH_2SCF_3$ | O |
| A-5864 | c-Pr(2,2-$F_2$) | H | Me | F | $CH_2CH_2CH_2CH_2CH_2CH_2CH_2SCF_3$ | O |
| A-5865 | c-Pr(2,2-$F_2$) | H | Me | F | $CH_2CH_2CH_2CH_2CH_2CH_2CH_2CH_2SCF_3$ | O |
| A-5866 | c-Pr(2,2-$F_2$) | H | Me | F | $CH_2CH_2NHS(=O)_2CF_3$ | O |
| A-5867 | c-Pr(2,2-$F_2$) | H | Me | F | $CH_2CH_2CH_2NHS(=O)_2CF_3$ | O |
| A-5868 | c-Pr(2,2-$F_2$) | H | Me | F | $CH_2CH_2CH_2CH_2NHS(=O)_2CF_3$ | O |
| A-5869 | c-Pr(2,2-$F_2$) | H | Me | F | $CH_2CH_2CH_2CH_2CH_2NHS(=O)_2CF_3$ | O |
| A-5870 | c-Pr(2,2-$F_2$) | H | Me | F | $CH_2CH_2N(Me)S(=O)_2CF_3$ | O |
| A-5871 | c-Pr(2,2-$F_2$) | H | Me | F | $CH_2CH_2N(Et)S(=O)_2CF_3$ | O |
| A-5872 | c-Pr(2,2-$F_2$) | H | Me | F | $CH_2CH_2N(CH_2CN)S(=O)_2CF_3$ | O |
| A-5873 | c-Pr(2,2-$F_2$) | H | Me | F | $CH_2CH_2N(CH_2OMe)S(=O)_2CF_3$ | O |
| A-5874 | c-Pr(2,2-$F_2$) | H | Me | F | $CH_2CH_2CH_2N(Me)S(=O)_2CF_3$ | O |
| A-5875 | c-Pr(2,2-$F_2$) | H | Me | F | $CH_2CH_2CH_2N(Et)S(=O)_2CF_3$ | O |
| A-5876 | c-Pr(2,2-$F_2$) | H | Me | F | $CH_2CH_2CH_2N(CH_2CN)S(=O)_2CF_3$ | O |
| A-5877 | c-Pr(2,2-$F_2$) | H | Me | F | $CH_2CH_2CH_2N(CH_2OMe)S(=O)_2CF_3$ | O |
| A-5878 | c-Pr(2,2-$F_2$) | H | Me | F | $CH_2CH_2CH_2CH_2N(Me)S(=O)_2CF_3$ | O |
| A-5879 | c-Pr(2,2-$F_2$) | H | Me | F | $CH_2CH_2CH_2CH_2N(Et)S(=O)_2CF_3$ | O |
| A-5880 | c-Pr(2,2-$F_2$) | H | Me | F | $CH_2CH_2CH_2CH_2N(CH_2CN)S(=O)_2CF_3$ | O |
| A-5881 | c-Pr(2,2-$F_2$) | H | Me | F | $CH_2CH_2CH_2CH_2N(CH_2OMe)S(=O)_2CF_3$ | O |
| A-5882 | $CH_2CH=CH_2$ | H | Cl | F | $CH_2CH_2SCF_3$ | O |
| A-5883 | $CH_2CH=CH_2$ | H | Cl | F | $CH_2CH_2CH_2SCF_3$ | O |
| A-5884 | $CH_2CH=CH_2$ | H | Cl | F | $CH_2CH_2CH_2CH_2SCF_3$ | O |
| A-5885 | $CH_2CH=CH_2$ | H | Cl | F | $CH_2CH_2CH_2CH_2CH_2SCF_3$ | O |
| A-5886 | $CH_2CH=CH_2$ | H | Cl | F | $CH_2CH_2CH_2CH_2CH_2CH_2SCF_3$ | O |
| A-5887 | $CH_2CH=CH_2$ | H | Cl | F | $CH_2CH_2CH_2CH_2CH_2CH_2CH_2SCF_3$ | O |
| A-5888 | $CH_2CH=CH_2$ | H | Cl | F | $CH_2CH_2CH_2CH_2CH_2CH_2CH_2CH_2SCF_3$ | O |
| A-5889 | $CH_2CH=CH_2$ | H | Cl | F | $CH_2CH_2NHS(=O)_2CF_3$ | O |
| A-5890 | $CH_2CH=CH_2$ | H | Cl | F | $CH_2CH_2CH_2NHS(=O)_2CF_3$ | O |

TABLE 135

| Compound Number | $R^1$ | $R^2$ | $R^3$ | $R^4$ | $R^5$ | A |
|---|---|---|---|---|---|---|
| A-5891 | $CH_2CH=CH_2$ | H | Cl | F | $CH_2CH_2CH_2CH_2NHS(=O)_2CF_3$ | O |
| A-5892 | $CH_2CH=CH_2$ | H | Cl | F | $CH_2CH_2CH_2CH_2CH_2NHS(=O)_2CF_3$ | O |
| A-5893 | $CH_2CH=CH_2$ | H | Cl | F | $CH_2CH_2N(Me)S(=O)_2CF_3$ | O |
| A-5894 | $CH_2CH=CH_2$ | H | Cl | F | $CH_2CH_2N(Et)S(=O)_2CF_3$ | O |
| A-5895 | $CH_2CH=CH_2$ | H | Cl | F | $CH_2CH_2N(CH_2CN)S(=O)_2CF_3$ | O |
| A-5896 | $CH_2CH=CH_2$ | H | Cl | F | $CH_2CH_2N(CH_2OMe)S(=O)_2CF_3$ | O |
| A-5897 | $CH_2CH=CH_2$ | H | Cl | F | $CH_2CH_2CH_2N(Me)S(=O)_2CF_3$ | O |
| A-5898 | $CH_2CH=CH_2$ | H | Cl | F | $CH_2CH_2CH_2N(Et)S(=O)_2CF_3$ | O |
| A-5899 | $CH_2CH=CH_2$ | H | Cl | F | $CH_2CH_2CH_2N(CH_2CN)S(=O)_2CF_3$ | O |
| A-5900 | $CH_2CH=CH_2$ | H | Cl | F | $CH_2CH_2CH_2N(CH_2OMe)S(=O)_2CF_3$ | O |
| A-5901 | $CH_2CH=CH_2$ | H | Cl | F | $CH_2CH_2CH_2CH_2N(Me)S(=O)_2CF_3$ | O |
| A-5902 | $CH_2CH=CH_2$ | H | Cl | F | $CH_2CH_2CH_2CH_2N(Et)S(=O)_2CF_3$ | O |
| A-5903 | $CH_2CH=CH_2$ | H | Cl | F | $CH_2CH_2CH_2CH_2N(CH_2CN)S(=O)_2CF_3$ | O |
| A-5904 | $CH_2CH=CH_2$ | H | Cl | F | $CH_2CH_2CH_2CH_2N(CH_2OMe)S(=O)_2CF_3$ | O |
| A-5905 | $CH_2CH=CH_2$ | H | Me | F | $CH_2CH_2SCF_3$ | O |
| A-5906 | $CH_2CH=CH_2$ | H | Me | F | $CH_2CH_2CH_2SCF_3$ | O |
| A-5907 | $CH_2CH=CH_2$ | H | Me | F | $CH_2CH_2CH_2CH_2SCF_3$ | O |
| A-5908 | $CH_2CH=CH_2$ | H | Me | F | $CH_2CH_2CH_2CH_2CH_2SCF_3$ | O |
| A-5909 | $CH_2CH=CH_2$ | H | Me | F | $CH_2CH_2CH_2CH_2CH_2CH_2SCF_3$ | O |
| A-5910 | $CH_2CH=CH_2$ | H | Me | F | $CH_2CH_2CH_2CH_2CH_2CH_2CH_2SCF_3$ | O |
| A-5911 | $CH_2CH=CH_2$ | H | Me | F | $CH_2CH_2CH_2CH_2CH_2CH_2CH_2CH_2SCF_3$ | O |
| A-5912 | $CH_2CH=CH_2$ | H | Me | F | $CH_2CH_2NHS(=O)_2CF_3$ | O |
| A-5913 | $CH_2CH=CH_2$ | H | Me | F | $CH_2CH_2CH_2NHS(=O)_2CF_3$ | O |
| A-5914 | $CH_2CH=CH_2$ | H | Me | F | $CH_2CH_2CH_2CH_2NHS(=O)_2CF_3$ | O |
| A-5915 | $CH_2CH=CH_2$ | H | Me | F | $CH_2CH_2CH_2CH_2CH_2NHS(=O)_2CF_3$ | O |
| A-5916 | $CH_2CH=CH_2$ | H | Me | F | $CH_2CH_2N(Me)S(=O)_2CF_3$ | O |
| A-5917 | $CH_2CH=CH_2$ | H | Me | F | $CH_2CH_2N(Et)S(=O)_2CF_3$ | O |
| A-5918 | $CH_2CH=CH_2$ | H | Me | F | $CH_2CH_2N(CH_2CN)S(=O)_2CF_3$ | O |
| A-5919 | $CH_2CH=CH_2$ | H | Me | F | $CH_2CH_2N(CH_2OMe)S(=O)_2CF_3$ | O |
| A-5920 | $CH_2CH=CH_2$ | H | Me | F | $CH_2CH_2CH_2N(Me)S(=O)_2CF_3$ | O |
| A-5921 | $CH_2CH=CH_2$ | H | Me | F | $CH_2CH_2CH_2N(Et)S(=O)_2CF_3$ | O |
| A-5922 | $CH_2CH=CH_2$ | H | Me | F | $CH_2CH_2CH_2N(CH_2CN)S(=O)_2CF_3$ | O |

TABLE 135-continued

| Compound Number | $R^1$ | $R^2$ | $R^3$ | $R^4$ | $R^5$ | A |
|---|---|---|---|---|---|---|
| A-5923 | $CH_2CH=CH_2$ | H | Me | F | $CH_2CH_2CH_2N(CH_2OMe)S(=O)_2CF_3$ | O |
| A-5924 | $CH_2CH=CH_2$ | H | Me | F | $CH_2CH_2CH_2CH_2N(Me)S(=O)_2CF_3$ | O |
| A-5925 | $CH_2CH=CH_2$ | H | Me | F | $CH_2CH_2CH_2CH_2N(Et)S(=O)_2CF_3$ | O |
| A-5926 | $CH_2CH=CH_2$ | H | Me | F | $CH_2CH_2CH_2CH_2N(CH_2CN)S(=O)_2CF_3$ | O |
| A-5927 | $CH_2CH=CH_2$ | H | Me | F | $CH_2CH_2CH_2CH_2N(CH_2OMe)S(=O)_2CF_3$ | O |
| A-5928 | $CH_2CH=CH$ | H | Cl | F | $CH_2CH_2SCF_3$ | O |
| A-5929 | $CH_2CHECH$ | H | Cl | F | $CH_2CH_2CH_2SCF_3$ | O |
| A-5930 | $CH_2CH=CH$ | H | Cl | F | $CH_2CH_2CH_2CH_2SCF_3$ | O |
| A-5931 | $CH_2CH=CH$ | H | Cl | F | $CH_2CH_2CH_2CH_2CH_2SCF_3$ | O |
| A-5932 | $CH_2CH=CH$ | H | Cl | F | $CH_2CH_2CH_2CH_2CH_2CH_2SCF_3$ | O |
| A-5933 | $CH_2CH=CH$ | H | Cl | F | $CH_2CH_2CH_2CH_2CH_2CH_2CH_2SCF_3$ | O |
| A-5934 | $CH_2CH=CH$ | H | Cl | F | $CH_2CH_2CH_2CH_2CH_2CH_2CH_2CH_2SCF_3$ | O |

TABLE 136

| Compound Number | $R^1$ | $R^2$ | $R^3$ | $R^4$ | $R^5$ | A |
|---|---|---|---|---|---|---|
| A-5935 | $CH_2CH\equiv CH$ | H | Cl | F | $CH_2CH_2NHS(=O)_2CF_3$ | O |
| A-5936 | $CH_2CH\equiv CH$ | H | Cl | F | $CH_2CH_2CH_2NHS(=O)_2CF_3$ | O |
| A-5937 | $CH_2CH\equiv CH$ | H | Cl | F | $CH_2CH_2CH_2CH_2NHS(=O)_2CF_3$ | O |
| A-5938 | $CH_2CH\equiv CH$ | H | Cl | F | $CH_2CH_2CH_2CH_2CH_2NHS(=O)_2CF_3$ | O |
| A-5939 | $CH_2CH\equiv CH$ | H | Cl | F | $CH_2CH_2N(Me)S(=O)_2CF_3$ | O |
| A-5940 | $CH_2CH\equiv CH$ | H | Cl | F | $CH_2CH_2N(Et)S(=O)_2CF_3$ | O |
| A-5941 | $CH_2CH\equiv CH$ | H | Cl | F | $CH_2CH_2N(CH_2CN)S(=O)_2CF_3$ | O |
| A-5942 | $CH_2CH\equiv CH$ | H | Cl | F | $CH_2CH_2N(CH_2OMe)S(=O)_2CF_3$ | O |
| A-5943 | $CH_2CH\equiv CH$ | H | Cl | F | $CH_2CH_2CH_2N(Me)S(=O)_2CF_3$ | O |
| A-5944 | $CH_2CH\equiv CH$ | H | Cl | F | $CH_2CH_2CH_2N(Et)S(=O)_2CF_3$ | O |
| A-5945 | $CH_2CH\equiv CH$ | H | Cl | F | $CH_2CH_2CH_2N(CH_2CN)S(=O)_2CF_3$ | O |
| A-5946 | $CH_2CH\equiv CH$ | H | Cl | F | $CH_2CH_2CH_2N(CH_2OMe)S(=O)_2CF_3$ | O |
| A-5947 | $CH_2CH\equiv CH$ | H | Cl | F | $CH_2CH_2CH_2CH_2N(Me)S(=O)_2CF_3$ | O |
| A-5948 | $CH_2CH\equiv CH$ | H | Cl | F | $CH_2CH_2CH_2CH_2N(Et)S(=O)_2CF_3$ | O |
| A-5949 | $CH_2CH\equiv CH$ | H | Cl | F | $CH_2CH_2CH_2CH_2N(CH_2CN)S(=O)_2CF_3$ | O |
| A-5950 | $CH_2CH\equiv CH$ | H | Cl | F | $CH_2CH_2CH_2CH_2N(CH_2OMe)S(=O)_2CF_3$ | O |
| A-5951 | $CH_2CH\equiv CH$ | H | Me | F | $CH_2CH_2SCF_3$ | O |
| A-5952 | $CH_2CH\equiv CH$ | H | Me | F | $CH_2CH_2CH_2SCF_3$ | O |
| A-5953 | $CH_2CH\equiv CH$ | H | Me | F | $CH_2CH_2CH_2CH_2SCF_3$ | O |
| A-5954 | $CH_2CH\equiv CH$ | H | Me | F | $CH_2CH_2CH_2CH_2CH_2SCF_3$ | O |
| A-5955 | $CH_2CH\equiv CH$ | H | Me | F | $CH_2CH_2CH_2CH_2CH_2CH_2SCF_3$ | O |
| A-5956 | $CH_2CH\equiv CH$ | H | Me | F | $CH_2CH_2CH_2CH_2CH_2CH_2CH_2SCF_3$ | O |
| A-5957 | $CH_2CH\equiv CH$ | H | Me | F | $CH_2CH_2CH_2CH_2CH_2CH_2CH_2CH_2SCF_3$ | O |
| A-5958 | $CH_2CH\equiv CH$ | H | Me | F | $CH_2CH_2NHS(=O)_2CF_3$ | O |
| A-5959 | $CH_2CH\equiv CH$ | H | Me | F | $CH_2CH_2CH_2NHS(=O)_2CF_3$ | O |
| A-5960 | $CH_2CH\equiv CH$ | H | Me | F | $CH_2CH_2CH_2CH_2NHS(=O)_2CF_3$ | O |
| A-5961 | $CH_2CH\equiv CH$ | H | Me | F | $CH_2CH_2CH_2CH_2CH_2NHS(=O)_2CF_3$ | O |
| A-5962 | $CH_2CH\equiv CH$ | H | Me | F | $CH_2CH_2N(Me)S(=O)_2CF_3$ | O |
| A-5963 | $CH_2CH\equiv CH$ | H | Me | F | $CH_2CH_2N(Et)S(=O)_2CF_3$ | O |
| A-5964 | $CH_2CH\equiv CH$ | H | Me | F | $CH_2CH_2N(CH_2CN)S(=O)_2CF_3$ | O |
| A-5965 | $CH_2CH\equiv CH$ | H | Me | F | $CH_2CH_2N(CH_2OMe)S(=O)_2CF_3$ | O |
| A-5966 | $CH_2CH\equiv CH$ | H | Me | F | $CH_2CH_2CH_2N(Me)S(=O)_2CF_3$ | O |
| A-5967 | $CH_2CH\equiv CH$ | H | Me | F | $CH_2CH_2CH_2N(Et)S(=O)_2CF_3$ | O |
| A-5968 | $CH_2CH\equiv CH$ | H | Me | F | $CH_2CH_2CH_2N(CH_2CN)S(=O)_2CF_3$ | O |
| A-5969 | $CH_2CH\equiv CH$ | H | Me | F | $CH_2CH_2CH_2N(CH_2OMe)S(=O)_2CF_3$ | O |
| A-5970 | $CH_2CH\equiv CH$ | H | Me | F | $CH_2CH_2CH_2CH_2N(Me)S(=O)_2CF_3$ | O |
| A-5971 | $CH_2CH\equiv CH$ | H | Me | F | $CH_2CH_2CH_2CH_2N(Et)S(=O)_2CF_3$ | O |
| A-5972 | $CH_2CH\equiv CH$ | H | Me | F | $CH_2CH_2CH_2CH_2N(CH_2CN)S(=O)_2CF_3$ | O |
| A-5973 | $CH_2CH\equiv CH$ | H | Me | F | $CH_2CH_2CH_2CH_2N(CH_2OMe)S(=O)_2CF_3$ | O |
| A-5974 | $CH_2CHF_2$ | H | Cl | F | $CH_2CH_2SCF_3$ | O |
| A-5975 | $CH_2CHF_2$ | H | Cl | F | $CH_2CH_2CH_2SCF_3$ | O |
| A-5976 | $CH_2CHF_2$ | H | Cl | F | $CH_2CH_2CH_2CH_2SCF_3$ | O |
| A-5977 | $CH_2CHF_2$ | H | Cl | F | $CH_2CH_2CH_2CH_2CH_2SCF_3$ | O |
| A-5978 | $CH_2CHF_2$ | H | Cl | F | $CH_2CH_2CH_2CH_2CH_2CH_2SCF_3$ | O |

TABLE 137

| Compound Number | $R^1$ | $R^2$ | $R^3$ | $R^4$ | $R^5$ | A |
|---|---|---|---|---|---|---|
| A-5979 | $CH_2CHF_2$ | H | Cl | F | $CH_2CH_2CH_2CH_2CH_2CH_2CH_2SCF_3$ | O |
| A-5980 | $CH_2CHF_2$ | H | Cl | F | $CH_2CH_2CH_2CH_2CH_2CH_2CH_2CH_2SCF_3$ | O |
| A-5981 | $CH_2CHF_2$ | H | Cl | F | $CH_2CH_2NHS({=}O)_2CF_3$ | O |
| A-5982 | $CH_2CHF_2$ | H | Cl | F | $CH_2CH_2CH_2NHS({=}O)_2CF_3$ | O |
| A-5983 | $CH_2CHF_2$ | H | Cl | F | $CH_2CH_2CH_2CH_2NHS({=}O)_2CF_3$ | O |
| A-5984 | $CH_2CHF_2$ | H | Cl | F | $CH_2CH_2CH_2CH_2CH_2NHS({=}O)_2CF_3$ | O |
| A-5985 | $CH_2CHF_2$ | H | Cl | F | $CH_2CH_2N(Me)S({=}O)_2CF_3$ | O |
| A-5986 | $CH_2CHF_2$ | H | Cl | F | $CH_2CH_2N(Et)S({=}O)_2CF_3$ | O |
| A-5987 | $CH_2CHF_2$ | H | Cl | F | $CH_2CH_2N(CH_2CN)S({=}O)_2CF_3$ | O |
| A-5988 | $CH_2CHF_2$ | H | Cl | F | $CH_2CH_2N(CH_2OMe)S({=}O)_2CF_3$ | O |
| A-5989 | $CH_2CHF_2$ | H | Cl | F | $CH_2CH_2CH_2N(Me)S({=}O)_2CF_3$ | O |
| A-5990 | $CH_2CHF_2$ | H | Cl | F | $CH_2CH_2CH_2N(Et)S({=}O)_2CF_3$ | O |
| A-5991 | $CH_2CHF_2$ | H | Cl | F | $CH_2CH_2CH_2N(CH_2CN)S({=}O)_2CF_3$ | O |
| A-5992 | $CH_2CHF_2$ | H | Cl | F | $CH_2CH_2CH_2N(CH_2OMe)S({=}O)_2CF_3$ | O |
| A-5993 | $CH_2CHF_2$ | H | Cl | F | $CH_2CH_2CH_2CH_2N(Me)S({=}O)_2CF_3$ | O |
| A-5994 | $CH_2CHF_2$ | H | Cl | F | $CH_2CH_2CH_2CH_2N(Et)S({=}O)_2CF_3$ | O |
| A-5995 | $CH_2CHF_2$ | H | Cl | F | $CH_2CH_2CH_2CH_2N(CH_2CN)S({=}O)_2CF_3$ | O |
| A-5996 | $CH_2CHF_2$ | H | Cl | F | $CH_2CH_2CH_2CH_2N(CH_2OMe)S({=}O)_2CF_3$ | O |
| A-5997 | $CH_2CHF_2$ | H | Me | F | $CH_2CH_2SCF_3$ | O |
| A-5998 | $CH_2CHF_2$ | H | Me | F | $CH_2CH_2CH_2SCF_3$ | O |
| A-5999 | $CH_2CHF_2$ | H | Me | F | $CH_2CH_2CH_2CH_2SCF_3$ | O |
| A-6000 | $CH_2CHF_2$ | H | Me | F | $CH_2CH_2CH_2CH_2CH_2SCF_3$ | O |
| A-6001 | $CH_2CHF_2$ | H | Me | F | $CH_2CH_2CH_2CH_2CH_2CH_2SCF_3$ | O |
| A-6002 | $CH_2CHF_2$ | H | Me | F | $CH_2CH_2CH_2CH_2CH_2CH_2CH_2SCF_3$ | O |
| A-6003 | $CH_2CHF_2$ | H | Me | F | $CH_2CH_2CH_2CH_2CH_2CH_2CH_2CH_2SCF_3$ | O |
| A-6004 | $CH_2CHF_2$ | H | Me | F | $CH_2CH_2NHS({=}O)_2CF_3$ | O |
| A-6005 | $CH_2CHF_2$ | H | Me | F | $CH_2CH_2CH_2NHS({=}O)_2CF_3$ | O |
| A-6006 | $CH_2CHF_2$ | H | Me | F | $CH_2CH_2CH_2CH_2NHS({=}O)_2CF_3$ | O |
| A-6007 | $CH_2CHF_2$ | H | Me | F | $CH_2CH_2CH_2CH_2CH_2NHS({=}O)_2CF_3$ | O |
| A-6008 | $CH_2CHF_2$ | H | Me | F | $CH_2CH_2N(Me)S({=}O)_2CF_3$ | O |
| A-6009 | $CH_2CHF_2$ | H | Me | F | $CH_2CH_2N(Et)S({=}O)_2CF_3$ | O |
| A-6010 | $CH_2CHF_2$ | H | Me | F | $CH_2CH_2N(CH_2CN)S({=}O)_2CF_3$ | O |
| A-6011 | $CH_2CHF_2$ | H | Me | F | $CH_2CH_2N(CH_2OMe)S({=}O)_2CF_3$ | O |
| A-6012 | $CH_2CHF_2$ | H | Me | F | $CH_2CH_2CH_2N(Me)S({=}O)_2CF_3$ | O |
| A-6013 | $CH_2CHF_2$ | H | Me | F | $CH_2CH_2CH_2N(Et)S({=}O)_2CF_3$ | O |
| A-6014 | $CH_2CHF_2$ | H | Me | F | $CH_2CH_2CH_2N(CH_2CN)S({=}O)_2CF_3$ | O |
| A-6015 | $CH_2CHF_2$ | H | Me | F | $CH_2CH_2CH_2N(CH_2OMe)S({=}O)_2CF_3$ | O |
| A-6016 | $CH_2CHF_2$ | H | Me | F | $CH_2CH_2CH_2CH_2N(Me)S({=}O)_2CF_3$ | O |
| A-6017 | $CH_2CHF_2$ | H | Me | F | $CH_2CH_2CH_2CH_2N(Et)S({=}O)_2CF_3$ | O |
| A-6018 | $CH_2CHF_2$ | H | Me | F | $CH_2CH_2CH_2CH_2N(CH_2CN)S({=}O)_2CF_3$ | O |
| A-6019 | $CH_2CHF_2$ | H | Me | F | $CH_2CH_2CH_2CH_2N(CH_2OMe)S({=}O)_2CF_3$ | O |
| A-6020 | OMe | H | Cl | F | $CH_2CH_2SCF_3$ | O |
| A-6021 | OMe | H | Cl | F | $CH_2CH_2CH_2SCF_3$ | O |
| A-6022 | OMe | H | Cl | F | $CH_2CH_2CH_2CH_2SCF_3$ | O |

TABLE 138

| Compound Number | $R^1$ | $R^2$ | $R^3$ | $R^4$ | $R^5$ | A |
|---|---|---|---|---|---|---|
| A-6023 | OMe | H | Cl | F | $CH_2CH_2CH_2CH_2CH_2SCF_3$ | O |
| A-6024 | OMe | H | Cl | F | $CH_2CH_2CH_2CH_2CH_2CH_2SCF_3$ | O |
| A-6025 | OMe | H | Cl | F | $CH_2CH_2CH_2CH_2CH_2CH_2CH_2SCF_3$ | O |
| A-6026 | OMe | H | Cl | F | $CH_2CH_2CH_2CH_2CH_2CH_2CH_2CH_2SCF_3$ | O |
| A-6027 | OMe | H | Cl | F | $CH_2CH_2NHS({=}O)_2CF_3$ | O |
| A-6028 | OMe | H | Cl | F | $CH_2CH_2CH_2NHS({=}O)_2CF_3$ | O |
| A-6029 | OMe | H | Cl | F | $CH_2CH_2CH_2CH_2NHS({=}O)_2CF_3$ | O |
| A-6030 | OMe | H | Cl | F | $CH_2CH_2CH_2CH_2CH_2NHS({=}O)_2CF_3$ | O |
| A-6031 | OMe | H | Cl | F | $CH_2CH_2N(Me)S({=}O)_2CF_3$ | O |
| A-6032 | OMe | H | Cl | F | $CH_2CH_2N(Et)S({=}O)_2CF_3$ | O |
| A-6033 | OMe | H | Cl | F | $CH_2CH_2N(CH_2CN)S({=}O)_2CF_3$ | O |
| A-6034 | OMe | H | Cl | F | $CH_2CH_2N(CH_2OMe)S({=}O)_2CF_3$ | O |
| A-6035 | OMe | H | Cl | F | $CH_2CH_2CH_2N(Me)S({=}O)_2CF_3$ | O |
| A-6036 | OMe | H | Cl | F | $CH_2CH_2CH_2N(Et)S({=}O)_2CF_3$ | O |
| A-6037 | OMe | H | Cl | F | $CH_2CH_2CH_2N(CH_2CN)S({=}O)_2CF_3$ | O |
| A-6038 | OMe | H | Cl | F | $CH_2CH_2CH_2N(CH_2OMe)S({=}O)_2CF_3$ | O |
| A-6039 | OMe | H | Cl | F | $CH_2CH_2CH_2CH_2N(Me)S({=}O)_2CF_3$ | O |
| A-6040 | OMe | H | Cl | F | $CH_2CH_2CH_2CH_2N(Et)S({=}O)_2CF_3$ | O |
| A-6041 | OMe | H | Cl | F | $CH_2CH_2CH_2CH_2N(CH_2CN)S({=}O)_2CF_3$ | O |
| A-6042 | OMe | H | Cl | F | $CH_2CH_2CH_2CH_2N(CH_2OMe)S({=}O)_2CF_3$ | O |
| A-6043 | OMe | H | Me | F | $CH_2CH_2SCF_3$ | O |
| A-6044 | OMe | H | Me | F | $CH_2CH_2CH_2SCF_3$ | O |
| A-6045 | OMe | H | Me | F | $CH_2CH_2CH_2CH_2SCF_3$ | O |

TABLE 138-continued

| Compound Number | $R^1$ | $R^2$ | $R^3$ | $R^4$ | $R^5$ | A |
|---|---|---|---|---|---|---|
| A-6046 | OMe | H | Me | F | $CH_2CH_2CH_2CH_2CH_2SCF_3$ | O |
| A-6047 | OMe | H | Me | F | $CH_2CH_2CH_2CH_2CH_2CH_2SCF_3$ | O |
| A-6048 | OMe | H | Me | F | $CH_2CH_2CH_2CH_2CH_2CH_2CH_2SCF_3$ | O |
| A-6049 | OMe | H | Me | F | $CH_2CH_2CH_2CH_2CH_2CH_2CH_2CH_2SCF_3$ | O |
| A-6050 | OMe | H | Me | F | $CH_2CH_2NHS(=O)_2CF_3$ | O |
| A-6051 | OMe | H | Me | F | $CH_2CH_2CH_2NHS(=O)_2CF_3$ | O |
| A-6052 | OMe | H | Me | F | $CH_2CH_2CH_2CH_2NHS(=O)_2CF_3$ | O |
| A-6053 | OMe | H | Me | F | $CH_2CH_2CH_2CH_2CH_2NHS(=O)_2CF_3$ | O |
| A-6054 | OMe | H | Me | F | $CH_2CH_2N(Me)S(=O)_2CF_3$ | O |
| A-6055 | OMe | H | Me | F | $CH_2CH_2N(Et)S(=O)_2CF_3$ | O |
| A-6056 | OMe | H | Me | F | $CH_2CH_2N(CH_2CN)S(=O)_2CF_3$ | O |
| A-6057 | OMe | H | Me | F | $CH_2CH_2N(CH_2OMe)S(=O)_2CF_3$ | O |
| A-6058 | OMe | H | Me | F | $CH_2CH_2CH_2N(Me)S(=O)_2CF_3$ | O |
| A-6059 | OMe | H | Me | F | $CH_2CH_2CH_2N(Et)S(=O)_2CF_3$ | O |
| A-6060 | OMe | H | Me | F | $CH_2CH_2CH_2N(CH_2CN)S(=O)_2CF_3$ | O |
| A-6061 | OMe | H | Me | F | $CH_2CH_2CH_2N(CH_2OMe)S(=O)_2CF_3$ | O |
| A-6062 | OMe | H | Me | F | $CH_2CH_2CH_2CH_2N(Me)S(=O)_2CF_3$ | O |
| A-6063 | OMe | H | Me | F | $CH_2CH_2CH_2CH_2N(Et)S(=O)_2CF_3$ | O |
| A-6064 | OMe | H | Me | F | $CH_2CH_2CH_2CH_2N(CH_2CN)S(=O)_2CF_3$ | O |
| A-6065 | OMe | H | Me | F | $CH_2CH_2CH_2CH_2N(CH_2OMe)S(=O)_2CF_3$ | O |
| A-6066 | OEt | H | Cl | F | $CH_2CH_2SCF_3$ | O |

TABLE 139

| Compound Number | $R^1$ | $R^2$ | $R^3$ | $R^4$ | $R^5$ | A |
|---|---|---|---|---|---|---|
| A-6067 | OEt | H | Cl | F | $CH_2CH_2CH_2SCF_3$ | O |
| A-6068 | OEt | H | Cl | F | $CH_2CH_2CH_2CH_2SCF_3$ | O |
| A-6069 | OEt | H | Cl | F | $CH_2CH_2CH_2CH_2CH_2SCF_3$ | O |
| A-6070 | OEt | H | Cl | F | $CH_2CH_2CH_2CH_2CH_2CH_2SCF_3$ | O |
| A-6071 | OEt | H | Cl | F | $CH_2CH_2CH_2CH_2CH_2CH_2CH_2SCF_3$ | O |
| A-6072 | OEt | H | Cl | F | $CH_2CH_2CH_2CH_2CH_2CH_2CH_2CH_2SCF_3$ | O |
| A-6073 | OEt | H | Cl | F | $CH_2CH_2NHS(=O)_2CF_3$ | O |
| A-6074 | OEt | H | Cl | F | $CH_2CH_2CH_2NHS(=O)_2CF_3$ | O |
| A-6075 | OEt | H | Cl | F | $CH_2CH_2CH_2CH_2NHS(=O)_2CF_3$ | O |
| A-6076 | OEt | H | Cl | F | $CH_2CH_2CH_2CH_2CH_2NHS(=O)_2CF_3$ | O |
| A-6077 | OEt | H | Cl | F | $CH_2CH_2N(Me)S(=O)_2CF_3$ | O |
| A-6078 | OEt | H | Cl | F | $CH_2CH_2N(Et)S(=O)_2CF_3$ | O |
| A-6079 | OEt | H | Cl | F | $CH_2CH_2N(CH_2CN)S(=O)_2CF_3$ | O |
| A-6080 | OEt | H | Cl | F | $CH_2CH_2N(CH_2OMe)S(=O)_2CF_3$ | O |
| A-6081 | OEt | H | Cl | F | $CH_2CH_2CH_2N(Me)S(=O)_2CF_3$ | O |
| A-6082 | OEt | H | Cl | F | $CH_2CH_2CH_2N(Et)S(=O)_2CF_3$ | O |
| A-6083 | OEt | H | Cl | F | $CH_2CH_2CH_2N(CH_2CN)S(=O)_2CF_3$ | O |
| A-6084 | OEt | H | Cl | F | $CH_2CH_2CH_2N(CH_2OMe)S(=O)_2CF_3$ | O |
| A-6085 | OEt | H | Cl | F | $CH_2CH_2CH_2CH_2N(Me)S(=O)_2CF_3$ | O |
| A-6086 | OEt | H | Cl | F | $CH_2CH_2CH_2CH_2N(Et)S(=O)_2CF_3$ | O |
| A-6087 | OEt | H | Cl | F | $CH_2CH_2CH_2CH_2N(CH_2CN)S(=O)_2CF_3$ | O |
| A-6088 | OEt | H | Cl | F | $CH_2CH_2CH_2CH_2N(CH_2OMe)S(=O)_2CF_3$ | O |
| A-6089 | OEt | H | Me | F | $CH_2CH_2SCF_3$ | O |
| A-6090 | OEt | H | Me | F | $CH_2CH_2CH_2SCF_3$ | O |
| A-6091 | OEt | H | Me | F | $CH_2CH_2CH_2CH_2SCF_3$ | O |
| A-6092 | OEt | H | Me | F | $CH_2CH_2CH_2CH_2CH_2SCF_3$ | O |
| A-6093 | OEt | H | Me | F | $CH_2CH_2CH_2CH_2CH_2CH_2SCF_3$ | O |
| A-6094 | OEt | H | Me | F | $CH_2CH_2CH_2CH_2CH_2CH_2CH_2SCF_3$ | O |
| A-6095 | OEt | H | Me | F | $CH_2CH_2CH_2CH_2CH_2CH_2CH_2CH_2SCF_3$ | O |
| A-6096 | OEt | H | Me | F | $CH_2CH_2NHS(=O)_2CF_3$ | O |
| A-6097 | OEt | H | Me | F | $CH_2CH_2CH_2NHS(=O)_2CF_3$ | O |
| A-6098 | OEt | H | Me | F | $CH_2CH_2CH_2CH_2NHS(=O)_2CF_3$ | O |
| A-6099 | OEt | H | Me | F | $CH_2CH_2CH_2CH_2CH_2NHS(=O)_2CF_3$ | O |
| A-6100 | OEt | H | Me | F | $CH_2CH_2N(Me)S(=O)_2CF_3$ | O |
| A-6101 | OEt | H | Me | F | $CH_2CH_2N(Et)S(=O)_2CF_3$ | O |
| A-6102 | OEt | H | Me | F | $CH_2CH_2N(CH_2CN)S(=O)_2CF_3$ | O |
| A-6103 | OEt | H | Me | F | $CH_2CH_2N(CH_2OMe)S(=O)_2CF_3$ | O |
| A-6104 | OEt | H | Me | F | $CH_2CH_2CH_2N(Me)S(=O)_2CF_3$ | O |
| A-6105 | OEt | H | Me | F | $CH_2CH_2CH_2N(Et)S(=O)_2CF_3$ | O |
| A-6106 | OEt | H | Me | F | $CH_2CH_2CH_2N(CH_2CN)S(=O)_2CF_3$ | O |
| A-6107 | OEt | H | Me | F | $CH_2CH_2CH_2N(CH_2OMe)S(=O)_2CF_3$ | O |
| A-6108 | OEt | H | Me | F | $CH_2CH_2CH_2CH_2N(Me)S(=O)_2CF_3$ | O |
| A-6109 | OEt | H | Me | F | $CH_2CH_2CH_2CH_2N(Et)S(=O)_2CF_3$ | O |
| A-6110 | OEt | H | Me | F | $CH_2CH_2CH_2CH_2N(CH_2CN)S(=O)_2CF_3$ | O |

TABLE 140

| Compound Number | $R^1$ | $R^2$ | $R^3$ | $R^4$ | $R^5$ | A |
|---|---|---|---|---|---|---|
| A-6111 | OEt | H | Me | F | $CH_2CH_2CH_2CH_2N(CH_2OMe)S(=O)_2CF_3$ | O |
| A-6112 | $OCH_2CF_3$ | H | Cl | F | $CH_2CH_2SCF_3$ | O |
| A-6113 | $OCH_2CF_3$ | H | Cl | F | $CH_2CH_2CH_2SCF_3$ | O |
| A-6114 | $OCH_2CF_3$ | H | Cl | F | $CH_2CH_2CH_2CH_2SCF_3$ | O |
| A-6115 | $OCH_2CF_3$ | H | Cl | F | $CH_2CH_2CH_2CH_2CH_2SCF_3$ | O |
| A-6116 | $OCH_2CF_3$ | H | Cl | F | $CH_2CH_2CH_2CH_2CH_2CH_2SCF_3$ | O |
| A-6117 | $OCH_2CF_3$ | H | Cl | F | $CH_2CH_2CH_2CH_2CH_2CH_2CH_2SCF_3$ | O |
| A-6118 | $OCH_2CF_3$ | H | Cl | F | $CH_2CH_2CH_2CH_2CH_2CH_2CH_2CH_2SCF_3$ | O |
| A-6119 | $OCH_2CF_3$ | H | Cl | F | $CH_2CH_2NHS(=O)_2CF_3$ | O |
| A-6120 | $OCH_2CF_3$ | H | Cl | F | $CH_2CH_2CH_2NHS(=O)_2CF_3$ | O |
| A-6121 | $OCH_2CF_3$ | H | Cl | F | $CH_2CH_2CH_2CH_2NHS(=O)_2CF_3$ | O |
| A-6122 | $OCH_2CF_3$ | H | Cl | F | $CH_2CH_2CH_2CH_2CH_2NHS(=O)_2CF_3$ | O |
| A-6123 | $OCH_2CF_3$ | H | Cl | F | $CH_2CH_2N(Me)S(=O)_2CF_3$ | O |
| A-6124 | $OCH_2CF_3$ | H | Cl | F | $CH_2CH_2N(Et)S(=O)_2CF_3$ | O |
| A-6125 | $OCH_2CF_3$ | H | Cl | F | $CH_2CH_2N(CH_2CN)S(=O)_2CF_3$ | O |
| A-6126 | $OCH_2CF_3$ | H | Cl | F | $CH_2CH_2N(CH_2OMe)S(=O)_2CF_3$ | O |
| A-6127 | $OCH_2CF_3$ | H | Cl | F | $CH_2CH_2CH_2N(Me)S(=O)_2CF_3$ | O |
| A-6128 | $OCH_2CF_3$ | H | Cl | F | $CH_2CH_2CH_2N(Et)S(=O)_2CF_3$ | O |
| A-6129 | $OCH_2CF_3$ | H | Cl | F | $CH_2CH_2CH_2N(CH_2CN)S(=O)_2CF_3$ | O |
| A-6130 | $OCH_2CF_3$ | H | Cl | F | $CH_2CH_2CH_2N(CH_2OMe)S(=O)_2CF_3$ | O |
| A-6131 | $OCH_2CF_3$ | H | Cl | F | $CH_2CH_2CH_2CH_2N(Me)S(=O)_2CF_3$ | O |
| A-6132 | $OCH_2CF_3$ | H | Cl | F | $CH_2CH_2CH_2CH_2N(Et)S(=O)_2CF_3$ | O |
| A-6133 | $OCH_2CF_3$ | H | Cl | F | $CH_2CH_2CH_2CH_2N(CH_2CN)S(=O)_2CF_3$ | O |
| A-6134 | $OCH_2CF_3$ | H | Cl | F | $CH_2CH_2CH_2CH_2N(CH_2OMe)S(=O)_2CF_3$ | O |
| A-6135 | $OCH_2CF_3$ | H | Me | F | $CH_2CH_2SCF_3$ | O |
| A-6136 | $OCH_2CF_3$ | H | Me | F | $CH_2CH_2CH_2SCF_3$ | O |
| A-6137 | $OCH_2CF_3$ | H | Me | F | $CH_2CH_2CH_2CH_2SCF_3$ | O |
| A-6138 | $OCH_2CF_3$ | H | Me | F | $CH_2CH_2CH_2CH_2CH_2SCF_3$ | O |
| A-6139 | $OCH_2CF_3$ | H | Me | F | $CH_2CH_2CH_2CH_2CH_2CH_2SCF_3$ | O |
| A-6140 | $OCH_2CF_3$ | H | Me | F | $CH_2CH_2CH_2CH_2CH_2CH_2CH_2SCF_3$ | O |
| A-6141 | $OCH_2CF_3$ | H | Me | F | $CH_2CH_2CH_2CH_2CH_2CH_2CH_2CH_2SCF_3$ | O |
| A-6142 | $OCH_2CF_3$ | H | Me | F | $CH_2CH_2NHS(=O)_2CF_3$ | O |
| A-6143 | $OCH_2CF_3$ | H | Me | F | $CH_2CH_2CH_2NHS(=O)_2CF_3$ | O |
| A-6144 | $OCH_2CF_3$ | H | Me | F | $CH_2CH_2CH_2CH_2NHS(=O)_2CF_3$ | O |
| A-6145 | $OCH_2CF_3$ | H | Me | F | $CH_2CH_2CH_2CH_2CH_2NHS(=O)_2CF_3$ | O |
| A-6146 | $OCH_2CF_3$ | H | Me | F | $CH_2CH_2N(Me)S(=O)_2CF_3$ | O |
| A-6147 | $OCH_2CF_3$ | H | Me | F | $CH_2CH_2N(Et)S(=O)_2CF_3$ | O |
| A-6148 | $OCH_2CF_3$ | H | Me | F | $CH_2CH_2N(CH_2CN)S(=O)_2CF_3$ | O |
| A-6149 | $OCH_2CF_3$ | H | Me | F | $CH_2CH_2N(CH_2OMe)S(=O)_2CF_3$ | O |
| A-6150 | $OCH_2CF_3$ | H | Me | F | $CH_2CH_2CH_2N(Me)S(=O)_2CF_3$ | O |
| A-6151 | $OCH_2CF_3$ | H | Me | F | $CH_2CH_2CH_2N(Et)S(=O)_2CF_3$ | O |
| A-6152 | $OCH_2CF_3$ | H | Me | F | $CH_2CH_2CH_2N(CH_2CN)S(=O)_2CF_3$ | O |
| A-6153 | $OCH_2CF_3$ | H | Me | F | $CH_2CH_2CH_2N(CH_2OMe)S(=O)_2CF_3$ | O |
| A-6154 | $OCH_2CF_3$ | H | Me | F | $CH_2CH_2CH_2CH_2N(Me)S(=O)_2CF_3$ | O |

TABLE 141

| Compound Number | $R^1$ | $R^2$ | $R^3$ | $R^4$ | $R^5$ | A |
|---|---|---|---|---|---|---|
| A-6155 | $OCH_2CF_3$ | H | Me | F | $CH_2CH_2CH_2CH_2N(Et)S(=O)_2CF_3$ | O |
| A-6156 | $OCH_2CF_3$ | H | Me | F | $CH_2CH_2CH_2CH_2N(CH_2CN)S(=O)_2CF_3$ | O |
| A-6157 | $OCH_2CF_3$ | H | Me | F | $CH_2CH_2CH_2CH_2N(CH_2OMe)S(=O)_2CF_3$ | O |
| A-6158 | $CH_2$(c-Pr) | H | Cl | F | $CH_2CH_2SCF_3$ | O |
| A-6159 | $CH_2$(c-Pr) | H | Cl | F | $CH_2CH_2CH_2SCF_3$ | O |
| A-6160 | $CH_2$(c-Pr) | H | Cl | F | $CH_2CH_2CH_2CH_2SCF_3$ | O |
| A-6161 | $CH_2$(c-Pr) | H | Cl | F | $CH_2CH_2CH_2CH_2CH_2SCF_3$ | O |
| A-6162 | $CH_2$(c-Pr) | H | Cl | F | $CH_2CH_2CH_2CH_2CH_2CH_2SCF_3$ | O |
| A-6163 | $CH_2$(c-Pr) | H | Cl | F | $CH_2CH_2CH_2CH_2CH_2CH_2CH_2SCF_3$ | O |
| A-6164 | $CH_2$(c-Pr) | H | Cl | F | $CH_2CH_2CH_2CH_2CH_2CH_2CH_2CH_2SCF_3$ | O |
| A-6165 | $CH_2$(c-Pr) | H | Cl | F | $CH_2CH_2NHS(=O)_2CF_3$ | O |
| A-6166 | $CH_2$(c-Pr) | H | Cl | F | $CH_2CH_2CH_2NHS(=O)_2CF_3$ | O |
| A-6167 | $CH_2$(c-Pr) | H | Cl | F | $CH_2CH_2CH_2CH_2NHS(=O)_2CF_3$ | O |
| A-6168 | $CH_2$(c-Pr) | H | Cl | F | $CH_2CH_2CH_2CH_2CH_2NHS(=O)_2CF_3$ | O |
| A-6169 | $CH_2$(c-Pr) | H | Cl | F | $CH_2CH_2N(Me)S(=O)_2CF_3$ | O |
| A-6170 | $CH_2$(c-Pr) | H | Cl | F | $CH_2CH_2N(Et)S(=O)_2CF_3$ | O |
| A-6171 | $CH_2$(c-Pr) | H | Cl | F | $CH_2CH_2N(CH_2CN)S(=O)_2CF_3$ | O |
| A-6172 | $CH_2$(c-Pr) | H | Cl | F | $CH_2CH_2N(CH_2OMe)S(=O)_2CF_3$ | O |
| A-6173 | $CH_2$(c-Pr) | H | Cl | F | $CH_2CH_2CH_2N(Me)S(=O)_2CF_3$ | O |
| A-6174 | $CH_2$(c-Pr) | H | Cl | F | $CH_2CH_2CH_2N(Et)S(=O)_2CF_3$ | O |
| A-6175 | $CH_2$(c-Pr) | H | Cl | F | $CH_2CH_2CH_2N(CH_2CN)S(=O)_2CF_3$ | O |

TABLE 141-continued

| Compound Number | $R^1$ | $R^2$ | $R^3$ | $R^4$ | $R^5$ | A |
|---|---|---|---|---|---|---|
| A-6176 | $CH_2$(c-Pr) | H | Cl | F | $CH_2CH_2CH_2N(CH_2OMe)S({=}O)_2CF_3$ | O |
| A-6177 | $CH_2$(c-Pr) | H | Cl | F | $CH_2CH_2CH_2CH_2N(Me)S({=}O)_2CF_3$ | O |
| A-6178 | $CH_2$(c-Pr) | H | Cl | F | $CH_2CH_2CH_2CH_2N(Et)S({=}O)_2CF_3$ | O |
| A-6179 | $CH_2$(c-Pr) | H | Cl | F | $CH_2CH_2CH_2CH_2N(CH_2CN)S({=}O)_2CF_3$ | O |
| A-6180 | $CH_2$(c-Pr) | H | Cl | F | $CH_2CH_2CH_2CH_2N(CH_2OMe)S({=}O)_2CF_3$ | O |
| A-6181 | $CH_2$(c-Pr) | H | Me | F | $CH_2CH_2SCF_3$ | O |
| A-6182 | $CH_2$(c-Pr) | H | Me | F | $CH_2CH_2CH_2SCF_3$ | O |
| A-6183 | $CH_2$(c-Pr) | H | Me | F | $CH_2CH_2CH_2CH_2SCF_3$ | O |
| A-6184 | $CH_2$(c-Pr) | H | Me | F | $CH_2CH_2CH_2CH_2CH_2SCF_3$ | O |
| A-6185 | $CH_2$(c-Pr) | H | Me | F | $CH_2CH_2CH_2CH_2CH_2CH_2SCF_3$ | O |
| A-6186 | $CH_2$(c-Pr) | H | Me | F | $CH_2CH_2CH_2CH_2CH_2CH_2CH_2SCF_3$ | O |
| A-6187 | $CH_2$(c-Pr) | H | Me | F | $CH_2CH_2CH_2CH_2CH_2CH_2CH_2CH_2SCF_3$ | O |
| A-6188 | $CH_2$(c-Pr) | H | Me | F | $CH_2CH_2NHS({=}O)_2CF_3$ | O |
| A-6189 | $CH_2$(c-Pr) | H | Me | F | $CH_2CH_2CH_2NHS({=}O)_2CF_3$ | O |
| A-6190 | $CH_2$(c-Pr) | H | Me | F | $CH_2CH_2CH_2CH_2NHS({=}O)_2CF_3$ | O |
| A-6191 | $CH_2$(c-Pr) | H | Me | F | $CH_2CH_2CH_2CH_2CH_2NHS({=}O)_2CF_3$ | O |
| A-6192 | $CH_2$(c-Pr) | H | Me | F | $CH_2CH_2N(Me)S({=}O)_2CF_3$ | O |
| A-6193 | $CH_2$(c-Pr) | H | Me | F | $CH_2CH_2N(Et)S({=}O)_2CF_3$ | O |
| A-6194 | $CH_2$(c-Pr) | H | Me | F | $CH_2CH_2N(CH_2CN)S({=}O)_2CF_3$ | O |
| A-6195 | $CH_2$(c-Pr) | H | Me | F | $CH_2CH_2N(CH_2OMe)S({=}O)_2CF_3$ | O |
| A-6196 | $CH_2$(c-Pr) | H | Me | F | $CH_2CH_2CH_2N(Me)S({=}O)_2CF_3$ | O |
| A-6197 | $CH_2$(c-Pr) | H | Me | F | $CH_2CH_2CH_2N(Et)S({=}O)_2CF_3$ | O |
| A-6198 | $CH_2$(c-Pr) | H | Me | F | $CH_2CH_2CH_2N(CH_2CN)S({=}O)_2CF_3$ | O |

TABLE 142

| Compound Number | $R^1$ | $R^2$ | $R^3$ | $R^4$ | $R^5$ | A |
|---|---|---|---|---|---|---|
| A-6199 | $CH_2$(c-Pr) | H | Me | F | $CH_2CH_2CH_2N(CH_2OMe)S({=}O)_2CF_3$ | O |
| A-6200 | $CH_2$(c-Pr) | H | Me | F | $CH_2CH_2CH_2CH_2N(Me)S({=}O)_2CF_3$ | O |
| A-6201 | $CH_2$(c-Pr) | H | Me | F | $CH_2CH_2CH_2CH_2N(Et)S({=}O)_2CF_3$ | O |
| A-6202 | $CH_2$(c-Pr) | H | Me | F | $CH_2CH_2CH_2CH_2N(CH_2CN)S({=}O)_2CF_3$ | O |
| A-6203 | $CH_2$(c-Pr) | H | Me | F | $CH_2CH_2CH_2CH_2N(CH_2OMe)S({=}O)_2CF_3$ | O |
| A-6204 | Ph | H | Cl | F | $CH_2CH_2SCF_3$ | O |
| A-6205 | Ph | H | Cl | F | $CH_2CH_2CH_2SCF_3$ | O |
| A-6206 | Ph | H | Cl | F | $CH_2CH_2CH_2CH_2SCF_3$ | O |
| A-6207 | Ph | H | Cl | F | $CH_2CH_2CH_2CH_2CH_2SCF_3$ | O |
| A-6208 | Ph | H | Cl | F | $CH_2CH_2CH_2CH_2CH_2CH_2SCF_3$ | O |
| A-6209 | Ph | H | Cl | F | $CH_2CH_2CH_2CH_2CH_2CH_2CH_2SCF_3$ | O |
| A-6210 | Ph | H | Cl | F | $CH_2CH_2CH_2CH_2CH_2CH_2CH_2CH_2SCF_3$ | O |
| A-6211 | Ph | H | Cl | F | $CH_2CH_2NHS({=}O)_2CF_3$ | O |
| A-6212 | Ph | H | Cl | F | $CH_2CH_2CH_2NHS({=}O)_2CF_3$ | O |
| A-6213 | Ph | H | Cl | F | $CH_2CH_2CH_2CH_2NHS({=}O)_2CF_3$ | O |
| A-6214 | Ph | H | Cl | F | $CH_2CH_2CH_2CH_2CH_2NHS({=}O)_2CF_3$ | O |
| A-6215 | Ph | H | Cl | F | $CH_2CH_2N(Me)S({=}O)_2CF_3$ | O |
| A-6216 | Ph | H | Cl | F | $CH_2CH_2N(Et)S({=}O)_2CF_3$ | O |
| A-6217 | Ph | H | Cl | F | $CH_2CH_2N(CH_2CN)S({=}O)_2CF_3$ | O |
| A-6218 | Ph | H | Cl | F | $CH_2CH_2N(CH_2OMe)S({=}O)_2CF_3$ | O |
| A-6219 | Ph | H | Cl | F | $CH_2CH_2CH_2N(Me)S({=}O)_2CF_3$ | O |
| A-6220 | Ph | H | Cl | F | $CH_2CH_2CH_2N(Et)S({=}O)_2CF_3$ | O |
| A-6221 | Ph | H | Cl | F | $CH_2CH_2CH_2N(CH_2CN)S({=}O)_2CF_3$ | O |
| A-6222 | Ph | H | Cl | F | $CH_2CH_2CH_2N(CH_2OMe)S({=}O)_2CF_3$ | O |
| A-6223 | Ph | H | Cl | F | $CH_2CH_2CH_2CH_2N(Me)S({=}O)_2CF_3$ | O |
| A-6224 | Ph | H | Cl | F | $CH_2CH_2CH_2CH_2N(Et)S({=}O)_2CF_3$ | O |
| A-6225 | Ph | H | Cl | F | $CH_2CH_2CH_2CH_2N(CH_2CN)S({=}O)_2CF_3$ | O |
| A-6226 | Ph | H | Cl | F | $CH_2CH_2CH_2CH_2N(CH_2OMe)S({=}O)_2CF_3$ | O |
| A-6227 | Ph | H | Me | F | $CH_2CH_2SCF_3$ | O |
| A-6228 | Ph | H | Me | F | $CH_2CH_2CH_2SCF_3$ | O |
| A-6229 | Ph | H | Me | F | $CH_2CH_2CH_2CH_2SCF_3$ | O |
| A-6230 | Ph | H | Me | F | $CH_2CH_2CH_2CH_2CH_2SCF_3$ | O |
| A-6231 | Ph | H | Me | F | $CH_2CH_2CH_2CH_2CH_2CH_2SCF_3$ | O |
| A-6232 | Ph | H | Me | F | $CH_2CH_2CH_2CH_2CH_2CH_2CH_2SCF_3$ | O |
| A-6233 | Ph | H | Me | F | $CH_2CH_2CH_2CH_2CH_2CH_2CH_2CH_2SCF_3$ | O |
| A-6234 | Ph | H | Me | F | $CH_2CH_2NHS({=}O)_2CF_3$ | O |
| A-6235 | Ph | H | Me | F | $CH_2CH_2CH_2NHS({=}O)_2CF_3$ | O |
| A-6236 | Ph | H | Me | F | $CH_2CH_2CH_2CH_2NHS({=}O)_2CF_3$ | O |
| A-6237 | Ph | H | Me | F | $CH_2CH_2CH_2CH_2CH_2NHS({=}O)_2CF_3$ | O |
| A-6238 | Ph | H | Me | F | $CH_2CH_2N(Me)S({=}O)_2CF_3$ | O |
| A-6239 | Ph | H | Me | F | $CH_2CH_2N(Et)S({=}O)_2CF_3$ | O |
| A-6240 | Ph | H | Me | F | $CH_2CH_2N(CH_2CN)S({=}O)_2CF_3$ | O |

TABLE 142-continued

| Compound Number | $R^1$ | $R^2$ | $R^3$ | $R^4$ | $R^5$ | A |
|---|---|---|---|---|---|---|
| A-6241 | Ph | H | Me | F | $CH_2CH_2N(CH_2OMe)S(=O)_2CF_3$ | O |
| A-6242 | Ph | H | Me | F | $CH_2CH_2CH_2N(Me)S(=O)_2CF_3$ | O |

TABLE 143

| Compound Number | $R^1$ | $R^2$ | $R^3$ | $R^4$ | $R^5$ | A |
|---|---|---|---|---|---|---|
| A-6243 | Ph | H | Me | F | $CH_2CH_2CH_2N(Et)S(=O)_2CF_3$ | O |
| A-6244 | Ph | H | Me | F | $CH_2CH_2CH_2N(CH_2CN)S(=O)_2CF_3$ | O |
| A-6245 | Ph | H | Me | F | $CH_2CH_2CH_2N(CH_2OMe)S(=O)_2CF_3$ | O |
| A-6246 | Ph | H | Me | F | $CH_2CH_2CH_2CH_2N(Me)S(=O)_2CF_3$ | O |
| A-6247 | Ph | H | Me | F | $CH_2CH_2CH_2CH_2N(Et)S(=O)_2CF_3$ | O |
| A-6248 | Ph | H | Me | F | $CH_2CH_2CH_2CH_2N(CH_2CN)S(=O)_2CF_3$ | O |
| A-6249 | Ph | H | Me | F | $CH_2CH_2CH_2CH_2N(CH_2OMe)S(=O)_2CF_3$ | O |
| A-6250 | $CH_2Ph$ | H | Cl | F | $CH_2CH_2SCF_3$ | O |
| A-6251 | $CH_2Ph$ | H | Cl | F | $CH_2CH_2CH_2SCF_3$ | O |
| A-6252 | $CH_2Ph$ | H | Cl | F | $CH_2CH_2CH_2CH_2SCF_3$ | O |
| A-6253 | $CH_2Ph$ | H | Cl | F | $CH_2CH_2CH_2CH_2CH_2SCF_3$ | O |
| A-6254 | $CH_2Ph$ | H | Cl | F | $CH_2CH_2CH_2CH_2CH_2CH_2SCF_3$ | O |
| A-6255 | $CH_2Ph$ | H | Cl | F | $CH_2CH_2CH_2CH_2CH_2CH_2CH_2SCF_3$ | O |
| A-6256 | $CH_2Ph$ | H | Cl | F | $CH_2CH_2CH_2CH_2CH_2CH_2CH_2CH_2SCF_3$ | O |
| A-6257 | $CH_2Ph$ | H | Cl | F | $CH_2CH_2NHS(=O)_2CF_3$ | O |
| A-6258 | $CH_2Ph$ | H | Cl | F | $CH_2CH_2CH_2NHS(=O)_2CF_3$ | O |
| A-6259 | $CH_2Ph$ | H | Cl | F | $CH_2CH_2CH_2CH_2NHS(=O)_2CF_3$ | O |
| A-6260 | $CH_2Ph$ | H | Cl | F | $CH_2CH_2CH_2CH_2CH_2NHS(=O)_2CF_3$ | O |
| A-6261 | $CH_2Ph$ | H | Cl | F | $CH_2CH_2N(Me)S(=O)_2CF_3$ | O |
| A-6262 | $CH_2Ph$ | H | Cl | F | $CH_2CH_2N(Et)S(=O)_2CF_3$ | O |
| A-6263 | $CH_2Ph$ | H | Cl | F | $CH_2CH_2N(CH_2CN)S(=O)_2CF_3$ | O |
| A-6264 | $CH_2Ph$ | H | Cl | F | $CH_2CH_2N(CH_2OMe)S(=O)_2CF_3$ | O |
| A-6265 | $CH_2Ph$ | H | Cl | F | $CH_2CH_2CH_2N(Me)S(=O)_2CF_3$ | O |
| A-6266 | $CH_2Ph$ | H | Cl | F | $CH_2CH_2CH_2N(Et)S(=O)_2CF_3$ | O |
| A-6267 | $CH_2Ph$ | H | Cl | F | $CH_2CH_2CH_2N(CH_2CN)S(=O)_2CF_3$ | O |
| A-6268 | $CH_2Ph$ | H | Cl | F | $CH_2CH_2CH_2N(CH_2OMe)S(=O)_2CF_3$ | O |
| A-6269 | $CH_2Ph$ | H | Cl | F | $CH_2CH_2CH_2CH_2N(Me)S(=O)_2CF_3$ | O |
| A-6270 | $CH_2Ph$ | H | Cl | F | $CH_2CH_2CH_2CH_2N(Et)S(=O)_2CF_3$ | O |
| A-6271 | $CH_2Ph$ | H | Cl | F | $CH_2CH_2CH_2CH_2N(CH_2CN)S(=O)_2CF_3$ | O |
| A-6272 | $CH_2Ph$ | H | Cl | F | $CH_2CH_2CH_2CH_2N(CH_2OMe)S(=O)_2CF_3$ | O |
| A-6273 | $CH_2Ph$ | H | Me | F | $CH_2CH_2SCF_3$ | O |
| A-6274 | $CH_2Ph$ | H | Me | F | $CH_2CH_2CH_2SCF_3$ | O |
| A-6275 | $CH_2Ph$ | H | Me | F | $CH_2CH_2CH_2CH_2SCF_3$ | O |
| A-6276 | $CH_2Ph$ | H | Me | F | $CH_2CH_2CH_2CH_2CH_2SCF_3$ | O |
| A-6277 | $CH_2Ph$ | H | Me | F | $CH_2CH_2CH_2CH_2CH_2CH_2SCF_3$ | O |
| A-6278 | $CH_2Ph$ | H | Me | F | $CH_2CH_2CH_2CH_2CH_2CH_2CH_2SCF_3$ | O |
| A-6279 | $CH_2Ph$ | H | Me | F | $CH_2CH_2CH_2CH_2CH_2CH_2CH_2CH_2SCF_3$ | O |
| A-6280 | $CH_2Ph$ | H | Me | F | $CH_2CH_2NHS(=O)_2CF_3$ | O |
| A-6281 | $CH_2Ph$ | H | Me | F | $CH_2CH_2CH_2NHS(=O)_2CF_3$ | O |
| A-6282 | $CH_2Ph$ | H | Me | F | $CH_2CH_2CH_2CH_2NHS(=O)_2CF_3$ | O |
| A-6283 | $CH_2Ph$ | H | Me | F | $CH_2CH_2CH_2CH_2CH_2NHS(=O)_2CF_3$ | O |
| A-6284 | $CH_2Ph$ | H | Me | F | $CH_2CH_2N(Me)S(=O)_2CF_3$ | O |
| A-6285 | $CH_2Ph$ | H | Me | F | $CH_2CH_2N(Et)S(=O)_2CF_3$ | O |
| A-6286 | $CH_2Ph$ | H | Me | F | $CH_2CH_2N(CH_2CN)S(=O)_2CF_3$ | O |

TABLE 144

| Compound Number | $R^1$ | $R^2$ | $R^3$ | $R^4$ | $R^5$ | A |
|---|---|---|---|---|---|---|
| A-6287 | $CH_2Ph$ | H | Me | F | $CH_2CH_2N(CH_2OMe)S(=O)_2CF_3$ | O |
| A-6288 | $CH_2Ph$ | H | Me | F | $CH_2CH_2CH_2N(Me)S(=O)_2CF_3$ | O |
| A-6289 | $CH_2Ph$ | H | Me | F | $CH_2CH_2CH_2N(Et)S(=O)_2CF_3$ | O |
| A-6290 | $CH_2Ph$ | H | Me | F | $CH_2CH_2CH_2N(CH_2CN)S(=O)_2CF_3$ | O |
| A-6291 | $CH_2Ph$ | H | Me | F | $CH_2CH_2CH_2N(CH_2OMe)S(=O)_2CF_3$ | O |
| A-6292 | $CH_2Ph$ | H | Me | F | $CH_2CH_2CH_2CH_2N(Me)S(=O)_2CF_3$ | O |
| A-6293 | $CH_2Ph$ | H | Me | F | $CH_2CH_2CH_2CH_2N(Et)S(=O)_2CF_3$ | O |
| A-6294 | $CH_2Ph$ | H | Me | F | $CH_2CH_2CH_2CH_2N(CH_2CN)S(=O)_2CF_3$ | O |
| A-6295 | $CH_2Ph$ | H | Me | F | $CH_2CH_2CH_2CH_2N(CH_2OMe)S(=O)_2CF_3$ | O |
| A-6296 | THF-3-yl | H | Cl | F | $CH_2CH_2SCF_3$ | O |
| A-6297 | THF-3-yl | H | Cl | F | $CH_2CH_2CH_2SCF_3$ | O |
| A-6298 | THF-3-yl | H | Cl | F | $CH_2CH_2CH_2CH_2SCF_3$ | O |

TABLE 144-continued

| Compound Number | $R^1$ | $R^2$ | $R^3$ | $R^4$ | $R^5$ | A |
|---|---|---|---|---|---|---|
| A-6299 | THF-3-yl | H | Cl | F | $CH_2CH_2CH_2CH_2CH_2SCF_3$ | O |
| A-6300 | THF-3-yl | H | Cl | F | $CH_2CH_2CH_2CH_2CH_2CH_2SCF_3$ | O |
| A-6301 | THF-3-yl | H | Cl | F | $CH_2CH_2CH_2CH_2CH_2CH_2CH_2SCF_3$ | O |
| A-6302 | THF-3-yl | H | Cl | F | $CH_2CH_2CH_2CH_2CH_2CH_2CH_2CH_2SCF_3$ | O |
| A-6303 | THF-3-yl | H | Cl | F | $CH_2CH_2NHS({=}O)_2CF_3$ | O |
| A-6304 | THF-3-yl | H | Cl | F | $CH_2CH_2CH_2NHS({=}O)_2CF_3$ | O |
| A-6305 | THF-3-yl | H | Cl | F | $CH_2CH_2CH_2CH_2NHS({=}O)_2CF_3$ | O |
| A-6306 | THF-3-yl | H | Cl | F | $CH_2CH_2CH_2CH_2CH_2NHS({=}O)_2CF_3$ | O |
| A-6307 | THF-3-yl | H | Cl | F | $CH_2CH_2N(Me)S({=}O)_2CF_3$ | O |
| A-6308 | THF-3-yl | H | Cl | F | $CH_2CH_2N(Et)S({=}O)_2CF_3$ | O |
| A-6309 | THF-3-yl | H | Cl | F | $CH_2CH_2N(CH_2CN)S({=}O)_2CF_3$ | O |
| A-6310 | THF-3-yl | H | Cl | F | $CH_2CH_2N(CH_2OMe)S({=}O)_2CF_3$ | O |
| A-6311 | THF-3-yl | H | Cl | F | $CH_2CH_2CH_2N(Me)S({=}O)_2CF_3$ | O |
| A-6312 | THF-3-yl | H | Cl | F | $CH_2CH_2CH_2N(Et)S({=}O)_2CF_3$ | O |
| A-6313 | THF-3-yl | H | Cl | F | $CH_2CH_2CH_2N(CH_2CN)S({=}O)_2CF_3$ | O |
| A-6314 | THF-3-yl | H | Cl | F | $CH_2CH_2CH_2N(CH_2OMe)S({=}O)_2CF_3$ | O |
| A-6315 | THF-3-yl | H | Cl | F | $CH_2CH_2CH_2CH_2N(Me)S({=}O)_2CF_3$ | O |
| A-6316 | THF-3-yl | H | Cl | F | $CH_2CH_2CH_2CH_2N(Et)S({=}O)_2CF_3$ | O |
| A-6317 | THF-3-yl | H | Cl | F | $CH_2CH_2CH_2CH_2N(CH_2CN)S({=}O)_2CF_3$ | O |
| A-6318 | THF-3-yl | H | Cl | F | $CH_2CH_2CH_2CH_2N(CH_2OMe)S({=}O)_2CF_3$ | O |
| A-6319 | THF-3-yl | H | Me | F | $CH_2CH_2SCF_3$ | O |
| A-6320 | THF-3-yl | H | Me | F | $CH_2CH_2CH_2SCF_3$ | O |
| A-6321 | THF-3-yl | H | Me | F | $CH_2CH_2CH_2CH_2SCF_3$ | O |
| A-6322 | THF-3-yl | H | Me | F | $CH_2CH_2CH_2CH_2CH_2SCF_3$ | O |
| A-6323 | THF-3-yl | H | Me | F | $CH_2CH_2CH_2CH_2CH_2CH_2SCF_3$ | O |
| A-6324 | THF-3-yl | H | Me | F | $CH_2CH_2CH_2CH_2CH_2CH_2CH_2SCF_3$ | O |
| A-6325 | THF-3-yl | H | Me | F | $CH_2CH_2CH_2CH_2CH_2CH_2CH_2CH_2SCF_3$ | O |
| A-6326 | THF-3-yl | H | Me | F | $CH_2CH_2NHS({=}O)_2CF_3$ | O |
| A-6327 | THF-3-yl | H | Me | F | $CH_2CH_2CH_2NHS({=}O)_2CF_3$ | O |
| A-6328 | THF-3-yl | H | Me | F | $CH_2CH_2CH_2CH_2NHS({=}O)_2CF_3$ | O |
| A-6329 | THF-3-yl | H | Me | F | $CH_2CH_2CH_2CH_2CH_2NHS({=}O)_2CF_3$ | O |
| A-6330 | THF-3-yl | H | Me | F | $CH_2CH_2N(Me)S({=}O)_2CF_3$ | O |

TABLE 145

| Compound Number | $R^1$ | $R^2$ | $R^3$ | $R^4$ | $R^5$ | A |
|---|---|---|---|---|---|---|
| A-6331 | THF-3-yl | H | Me | F | $CH_2CH_2N(Et)S({=}O)_2CF_3$ | O |
| A-6332 | THF-3-yl | H | Me | F | $CH_2CH_2N(CH_2CN)S({=}O)_2CF_3$ | O |
| A-6333 | THF-3-yl | H | Me | F | $CH_2CH_2N(CH_2OMe)S({=}O)_2CF_3$ | O |
| A-6334 | THF-3-yl | H | Me | F | $CH_2CH_2CH_2N(CHe)S({=}O)_2CF_3$ | O |
| A-6335 | THF-3-yl | H | Me | F | $CH_2CH_2CH_2N(ET)S({=}O)_2CF_3$ | O |
| A-6336 | THF-3-yl | H | Me | F | $CH_2CH_2CH_2N(CH_2CN))S({=}O)_2CF_3$ | O |
| A-6337 | THF-3-yl | H | Me | F | $CH_2CH_2CH_2N(CH_2OMe)S({=}O)_2CF_3$ | O |
| A-6338 | THF-3-yl | H | Me | F | $CH_2CH_2CH_2CH_2N(Me)S({=}O)_2CF_3$ | O |
| A-6339 | THF-3-yl | H | Me | F | $CH_2CH_2CH_2CH_2N(Et)S({=}O)_2CF_3$ | O |
| A-6340 | THF-3-yl | H | Me | F | $CH_2CH_2CH_2CH_2N(CH_2CN)S({=}O)_2CF_3$ | O |
| A-6341 | THF-3-yl | H | Me | F | $CH_2CH_2CH_2CH_2N(CH_2OMe)S({=}O)_2CF_3$ | O |
| A-6342 | $—(CH_2)_3—$ | | Cl | F | $CH_2CH_2SCF_3$ | O |
| A-6343 | $—(CH_2)_3—$ | | Cl | F | $CH_2CH_2CH_2SCF_3$ | O |
| A-6344 | $—(CH_2)_3—$ | | Cl | F | $CH_2CH_2CH_2CH_2SCF_3$ | O |
| A 6345 | $—(CH_2)_3—$ | | Cl | F | $CH_2CH_2CH_2CH_2CH_2SCF_3$ | O |
| A-6346 | $—(CH_2)_3—$ | | Cl | F | $CH_2CH_2CH_2CH_2CH_2CH_2SCF_3$ | O |
| A 6347 | $—(CH_2)_3—$ | | Cl | F | $CH_2CH_2CH_2CH_2CH_2CH_2CH_2SCF_3$ | O |
| A-6348 | $—(CH_2)_3—$ | | Cl | F | $CH_2CH_2CH_2CH_2CH_2CH_2CH_2CH_2SCF_3$ | O |
| A-6349 | $—(CH_2)_3—$ | | Cl | F | $CH_2CH_2NHS({=}O)_2CF_3$ | O |
| A-6350 | $—(CH_2)_3—$ | | Cl | F | $CH_2CH_2CH_2NHS({=}O)_2CF_3$ | O |
| A-6351 | $—(CH_2)_3—$ | | Cl | F | $CH_2CH_2CH_2CH_2NHS({=}O)_2CF_3$ | O |
| A-6352 | $—(CH_2)_3—$ | | Cl | F | $CH_2CH_2CH_2CH_2CH_2NHS({=}O)_2CF_3$ | O |
| A-6353 | $—(CH_2)_3—$ | | Cl | F | $CH_2CH_2N(Me)S({=}O)_2CF_3$ | O |
| A-6354 | $—(CH_2)_3—$ | | Cl | F | $CH_2CH_2N(Et)S({=}O)_2CF_3$ | O |
| A-6355 | $—(CH_2)_3—$ | | Cl | F | $CH_2CH_2N(CH_2CN)S({=}O)_2CF_3$ | O |
| A-6356 | $—(CH_2)_3—$ | | Cl | F | $CH_2CH_2N(CH_2OMe)S({=}O)_2CF_3$ | O |
| A-8357 | $—(CH_2)_3—$ | | Cl | F | $CH_2CH_2CH_2N(Me)S({=}O)_2CF_3$ | O |
| A-6358 | $—(CH_2)_3—$ | | Cl | F | $CH_2CH_2CH_2N(Et)S({=}O)_2CF_3$ | O |
| A-6359 | $—(CH_2)_3—$ | | Cl | F | $CH_2CH_2CH_2N(CH_2CN)S({=}O)_2CF_3$ | O |
| A-6360 | $—(CH_2)_3—$ | | Cl | F | $CH_2CH_2CH_2CH_2N(CH_2OMe)S({=}O)_2CF_3$ | O |
| A-6361 | $—(CH_2)_3—$ | | Cl | F | $CH_2CH_2CH_2CH_2N(Me)S({=}O)_2CF_3$ | O |
| A 6362 | $—(CH_2)_3—$ | | Cl | F | $CH_2CH_2CH_2CH_2N(Et)S({=}O)_2CF_3$ | O |
| A-6353 | $—(CH_2)_3—$ | | Cl | F | $CH_2CH_2CH_2CH_2N(CH_2CN)S({=}O)_2CF_3$ | O |
| A-6364 | $—(CH_2)_3—$ | | Cl | F | $CH_2CH_2CH_2CH_2N(CH_2OME)S({=}O)_2CF_3$ | O |
| A-6365 | $—(CH_2)_3—$ | | Me | F | $CH_2CH_2SCF_3$ | O |

TABLE 145-continued

| Compound Number | R1 | R2 | R3 | R4 | R5 | A |
|---|---|---|---|---|---|---|
| A-6366 | $-(CH_2)_3-$ | | Me | F | $CH_2CH_2CH_2SCF_3$ | O |
| A-6367 | $-(CH_2)_3-$ | | Me | F | $CH_2CH_2CH_2CH_2SCF_3$ | O |
| A-6368 | $-(CH_2)_3-$ | | Me | F | $CH_2CH_2CH_2CH_2CH_2SCF_3$ | O |
| A-6369 | $-(CH_2)_3-$ | | Me | F | $CH_2CH_2CH_2CH_2CH_2CH_2SCF_3$ | O |
| A-6370 | $-(CH_2)_3-$ | | Me | F | $CH_2CH_2CH_2CH_2CH_2CH_2CH_2SCF_3$ | O |
| A-6371 | $-(CH_2)_3-$ | | Me | F | $CH_2CH_2CH_2CH_2CH_2CH_2CH_2CH_2SCF_3$ | O |
| A-6372 | $-(CH_2)_3-$ | | Me | F | $CH_2CH_2NHS(=O)_2CF_3$ | O |
| A-6373 | $-(CH_2)_3-$ | | Me | F | $CH_2CH_2CH_2NHS(=O)_2CF_3$ | O |
| A-6374 | $-(CH_2)_3-$ | | Me | F | $CH_2CH_2CH_2CH_2NHS(=O)_2CF_3$ | O |

TABLE 146

| Compound Number | R1 | R2 | R3 | R4 | R5 | A |
|---|---|---|---|---|---|---|
| A-6375 | $-(CH_2)_3-$ | | Me | F | $CH_2CH_2CH_2CH_2CH_2NHS(=O)_2CF_3$ | O |
| A-6376 | $-(CH_2)_3-$ | | Me | F | $CH_2CH_2N(Me)S(=O)_2CF_3$ | O |
| A-6377 | $-(CH_2)_3-$ | | Me | F | $CH_2CH_2N(Et)S(=O)_2CF_3$ | O |
| A-6378 | $-(CH_2)_3-$ | | Me | F | $CH_2CH_2N(CH_2CN)S(=O)_2CF_3$ | O |
| A-6379 | $-(CH_2)_3-$ | | Me | F | $CH_2CH_2N(CH_2OMe)S(=O)_2CF_3$ | O |
| A-6380 | $-(CH_2)_3-$ | | Me | F | $CH_2CH_2CH_2N(Me)S(=O)_2CF_3$ | O |
| A-6381 | $-(CH_2)_3-$ | | Me | F | $CH_2CH_2CH_2N(Et)S(=O)_2CF_3$ | O |
| A-6382 | $-(CH_2)_3-$ | | Me | F | $CH_2CH_2CH_2N(CH_2CN)S(=O)_2CF_3$ | O |
| A-6383 | $-(CH_2)_3-$ | | Me | F | $CH_2CH_2CH_2N(CH_2OMe)S(=O)_2CF_3$ | O |
| A-6384 | $-(CH_2)_3-$ | | Me | F | $CH_2CH_2CH_2CH_2N(Me)S(=O)_2CF_3$ | O |
| A-6385 | $-(CH_2)_3-$ | | Me | F | $CH_2CH_2CH_2CH_2N(Et)S(=O)_2CF_3$ | O |
| A-6386 | $-(CH_2)_3-$ | | Me | F | $CH_2CH_2CH_2CH_2N(CH_2CN)S(=O)_2CF_3$ | O |
| A-6387 | $-(CH_2)_3-$ | | Me | F | $CH_2CH_2CH_2CH_2N(CH_2OMe)S(=O)_2CF_3$ | O |
| A-6388 | $-(CH_2)_4-$ | | Cl | F | $CH_2CH_2SCF_3$ | O |
| A-6389 | $-(CH_2)_4-$ | | Cl | F | $CH_2CH_2CH_2SCF_3$ | O |
| A-6390 | $-(CH_2)_4-$ | | Cl | F | $CH_2CH_2CH_2CH_2SCF_3$ | O |
| A-6391 | $-(CH_2)_4-$ | | Cl | F | $CH_2CH_2CH_2CH_2CH_2SCF_3$ | O |
| A-6392 | $-(CH_2)_4-$ | | Cl | F | $CH_2CH_2CH_2CH_2CH_2CH_2SCF_3$ | O |
| A-6393 | $-(CH_2)_4-$ | | Cl | F | $CH_2CH_2CH_2CH_2CH_2CH_2CH_2SCF_3$ | O |
| A-6394 | $-(CH_2)_4-$ | | Cl | F | $CH_2CH_2CH_2CH_2CH_2CH_2CH_2CH_2SCF_3$ | O |
| A-6395 | $-(CH_2)_4-$ | | Cl | F | $CH_2CH_2NHS(=O)_2CF_3$ | O |
| A-6396 | $-(CH_2)_4-$ | | Cl | F | $CH_2CH_2CH_2NHS(=O)_2CF_3$ | O |
| A-6397 | $-(CH_2)_4-$ | | Cl | F | $CH_2CH_2CH_2CH_2NHS(=O)_2CF_3$ | O |
| A-6398 | $-(CH_2)_4-$ | | Cl | F | $CH_2CH_2CH_2CH_2CH_2NHS(=O)_2CF_3$ | O |
| A-6399 | $-(CH_2)_4-$ | | Cl | F | $CH_2CH_2N(Me)S(=O)_2CF_3$ | O |
| A-6400 | $-(CH_2)_4-$ | | Cl | F | $CH_2CH_2N(Et)S(=O)_2CF_3$ | O |
| A-6401 | $-(CH_2)_4-$ | | Cl | F | $CH_2CH_2N(CH_2CN)S(=O)_2CF_3$ | O |
| A-6402 | $-(CH_2)_4-$ | | Cl | F | $CH_2CH_2N(CH_2OMe)S(=O)_2CF_3$ | O |
| A-6403 | $-(CH_2)_4-$ | | Cl | F | $CH_2CH_2CH_2N(Me)S(=O)_2CF_3$ | O |
| A-6404 | $-(CH_2)_4-$ | | Cl | F | $CH_2CH_2CH_2N(Et)S(=O)_2CF_3$ | O |
| A-6405 | $-(CH_2)_4-$ | | Cl | F | $CH_2CH_2CH_2N(CH_2CN)S(=O)_2CF_3$ | O |
| A-6406 | $-(CH_2)_4-$ | | Cl | F | $CH_2CH_2CH_2N(CH_2OMe)S(=O)_2CF_3$ | O |
| A-6407 | $-(CH_2)_4-$ | | Cl | F | $CH_2CH_2CH_2CH_2N(Me)S(=O)_2CF_3$ | O |
| A-6408 | $-(CH_2)_4-$ | | Cl | F | $CH_2CH_2CH_2CH_2N(Et)S(=O)_2CF_3$ | O |
| A-6409 | $-(CH_2)_4-$ | | Cl | F | $CH_2CH_2CH_2CH_2N(CH_2CN)S(=O)_2CF_3$ | O |
| A-6410 | $-(CH_2)_4-$ | | Cl | F | $CH_2CH_2CH_2CH_2N(CH_2OMe)S(=O)_2CF_3$ | O |
| A-6411 | $-(CH_2)_4-$ | | Me | F | $CH_2CH_2SCF_3$ | O |
| A-6412 | $-(CH_2)_4-$ | | Me | F | $CH_2CH_2CH_2SCF_3$ | O |
| A-6413 | $-(CH_2)_4-$ | | Me | F | $CH_2CH_2CH_2CH_2SCF_3$ | O |
| A-6414 | $-(CH_2)_4-$ | | Me | F | $CH_2CH_2CH_2CH_2CH_2SCF_3$ | O |
| A-6415 | $-(CH_2)_4-$ | | Me | F | $CH_2CH_2CH_2CH_2CH_2CH_2SCF_3$ | O |
| A-6416 | $-(CH_2)_4-$ | | Me | F | $CH_2CH_2CH_2CH_2CH_2CH_2CH_2SCF_3$ | O |
| A-6417 | $-(CH_2)_4-$ | | Me | F | $CH_2CH_2CH_2CH_2CH_2CH_2CH_2CH_2SCF_3$ | O |
| A-6418 | $-(CH_2)_4-$ | | Me | F | $CH_2CH_2NHS(=O)_2CF_3$ | O |

TABLE 147

| Compound Number | R1 | R2 | R3 | R4 | R5 | A |
|---|---|---|---|---|---|---|
| A-6419 | $-(CH_2)_4-$ | | Me | F | $CH_2CH_2CH_2NHS(=O)_2CF_3$ | O |
| A-6420 | $-(CH_2)_4-$ | | Me | F | $CH_2CH_2CH_2CH_2NHS(=O)_2CF_3$ | O |
| A-6421 | $-(CH_2)_4-$ | | Me | F | $CH_2CH_2CH_2CH_2CH_2NHS(=O)_2CF_3$ | O |

TABLE 147-continued

| Compound Number | $R^1$ | $R^2$ | $R^3$ | $R^4$ | $R^5$ | A |
|---|---|---|---|---|---|---|
| A-6422 | $-(CH_2)_4-$ | | Me | F | $CH_2CH_2N(Me)S(=O)_2CF_3$ | O |
| A-6423 | $-(CH_2)_4-$ | | Me | F | $CH_2CH_2N(Et)S(=O)_2CF_3$ | O |
| A-6424 | $-(CH_2)_4-$ | | Me | F | $CH_2CH_2N(CH_2CN)S(=O)_2CF_3$ | O |
| A-6425 | $-(CH_2)_4-$ | | Me | F | $CH_2CH_2N(CH_2OMe)S(=O)_2CF_3$ | O |
| A-6426 | $-(CH_2)_4-$ | | Me | F | $CH_2CH_2CH_2N(Me)S(=O)_2CF_3$ | O |
| A-6427 | $-(CH_2)_4-$ | | Me | F | $CH_2CH_2CH_2N(Et)S(=O)_2CF_3$ | O |
| A-6428 | $-(CH_2)_4-$ | | Me | F | $CH_2CH_2CH_2N(CH_2CN)S(=O)_2CF_3$ | O |
| A-6429 | $-(CH_2)_4-$ | | Me | F | $CH_2CH_2CH_2N(CH_2OMe)S(=O)_2CF_3$ | O |
| A-6430 | $-(CH_2)_4-$ | | Me | F | $CH_2CH_2CH_2CH_2N(Me)S(=O)_2CF_3$ | O |
| A-6431 | $-(CH_2)_4-$ | | Me | F | $CH_2CH_2CH_2CH_2N(Et)S(=O)_2CF_3$ | O |
| A-6432 | $-(CH_2)_4-$ | | Me | F | $CH_2CH_2CH_2CH_2N(CH_2CN)S(=O)_2CF_3$ | O |
| A-6433 | $-(CH_2)_4-$ | | Me | F | $CH_2CH_2CH_2CH_2N(CH_2OMe)S(=O)_2CF_3$ | O |
| A-6434 | $-(CH_2)_2O(CH_2)_2-$ | | Cl | F | $CH_2CH_2SCF_3$ | O |
| A-6435 | $-(CH_2)_2O(CH_2)_2-$ | | Cl | F | $CH_2CH_2CH_2SCF_3$ | O |
| A-6436 | $-(CH_2)_2O(CH_2)_2-$ | | Cl | F | $CH_2CH_2CH_2CH_2SCF_3$ | O |
| A-6437 | $-(CH_2)_2O(CH_2)_2-$ | | Cl | F | $CH_2CH_2CH_2CH_2CH_2SCF_3$ | O |
| A-6438 | $-(CH_2)_2O(CH_2)_2-$ | | Cl | F | $CH_2CH_2CH_2CH_2CH_2CH_2SCF_3$ | O |
| A-6439 | $-(CH_2)_2O(CH_2)_2-$ | | Cl | F | $CH_2CH_2CH_2CH_2CH_2CH_2CH_2SCF_3$ | O |
| A-6440 | $-(CH_2)_2O(CH_2)_2-$ | | Cl | F | $CH_2CH_2CH_2CH_2CH_2CH_2CH_2CH_2SCF_3$ | O |
| A-6441 | $-(CH_2)_2O(CH_2)_2-$ | | Cl | F | $CH_2CH_2NHS(=O)_2CF_3$ | O |
| A-6442 | $-(CH_2)_2O(CH_2)_2-$ | | Cl | F | $CH_2CH_2CH_2NHS(=O)_2CF_3$ | O |
| A-6443 | $-(CH_2)_2O(CH_2)_2-$ | | Cl | F | $CH_2CH_2CH_2CH_2NHS(=O)_2CF_3$ | O |
| A-6444 | $-(CH_2)_2O(CH_2)_2-$ | | Cl | F | $CH_2CH_2CH_2CH_2CH_2NHS(=O)_2CF_3$ | O |
| A-6445 | $-(CH_2)_2O(CH_2)_2-$ | | Cl | F | $CH_2CH_2N(Me)S(=O)_2CF_3$ | O |
| A-6446 | $-(CH_2)_2O(CH_2)_2-$ | | Cl | F | $CH_2CH_2N(Et)S(=O)_2CF_3$ | O |
| A-6447 | $-(CH_2)_2O(CH_2)_2-$ | | Cl | F | $CH_2CH_2N(CH_2CN)S(=O)_2CF_3$ | O |
| A-6448 | $-(CH_2)_2O(CH_2)_2-$ | | Cl | F | $CH_2CH_2N(CH_2OMe)S(=O)_2CF_3$ | O |
| A-6449 | $-(CH_2)_2O(CH_2)_2-$ | | Cl | F | $CH_2CH_2CH_2N(Me)S(=O)_2CF_3$ | O |
| A-6450 | $-(CH_2)_2O(CH_2)_2-$ | | Cl | F | $CH_2CH_2CH_2N(Et)S(=O)_2CF_3$ | O |
| A-6451 | $-(CH_2)_2O(CH_2)_2-$ | | Cl | F | $CH_2CH_2CH_2N(CH_2CN)S(=O)_2CF_3$ | O |
| A-6452 | $-(CH_2)_2O(CH_2)_2-$ | | Cl | F | $CH_2CH_2CH_2N(CH_2OMe)S(=O)_2CF_3$ | O |
| A-6453 | $-(CH_2)_2O(CH_2)_2-$ | | Cl | F | $CH_2CH_2CH_2CH_2N(Me)S(=O)_2CF_3$ | O |
| A-6454 | $-(CH_2)_2O(CH_2)_2-$ | | Cl | F | $CH_2CH_2CH_2CH_2N(Et)S(=O)_2CF_3$ | O |
| A-6455 | $-(CH_2)_2O(CH_2)_2-$ | | Cl | F | $CH_2CH_2CH_2CH_2N(CH_2CN)S(=O)_2CF_3$ | O |
| A-6456 | $-(CH_2)_2O(CH_2)_2-$ | | Cl | F | $CH_2CH_2CH_2CH_2N(CH_2OMe)S(=O)_2CF_3$ | O |
| A-6457 | $-(CH_2)_2O(CH_2)_2-$ | | Me | F | $CH_2CH_2SCF_3$ | O |
| A-6458 | $-(CH_2)_2O(CH_2)_2-$ | | Me | F | $CH_2CH_2CH_2SCF_3$ | O |
| A-6459 | $-(CH_2)_2O(CH_2)_2-$ | | Me | F | $CH_2CH_2CH_2CH_2SCF_3$ | O |
| A-6460 | $-(CH_2)_2O(CH_2)_2-$ | | Me | F | $CH_2CH_2CH_2CH_2CH_2SCF_3$ | O |
| A-6461 | $-(CH_2)_2O(CH_2)_2-$ | | Me | F | $CH_2CH_2CH_2CH_2CH_2CH_2SCF_3$ | O |
| A-6462 | $-(CH_2)_2O(CH_2)_2-$ | | Me | F | $CH_2CH_2CH_2CH_2CH_2CH_2CH_2SCF_3$ | O |

TABLE 148

| Compound Number | $R^1$ | $R^2$ | $R^3$ | $R^4$ | $R^5$ | A |
|---|---|---|---|---|---|---|
| A-6463 | $-(CH_2)_2O(CH_2)_2-$ | | Me | F | $CH_2CH_2CH_2CH_2CH_2CH_2CH_2CH_2SCF_3$ | O |
| A-6464 | $-(CH_2)_2O(CH_2)_2-$ | | Me | F | $CH_2CH_2NHS(=O)_2CF_3$ | O |
| A-6465 | $-(CH_2)_2O(CH_2)_2-$ | | Me | F | $CH_2CH_2CH_2NHS(=O)_2CF_3$ | O |
| A-6466 | $-(CH_2)_2O(CH_2)_2-$ | | Me | F | $CH_2CH_2CH_2CH_2NHS(=O)_2CF_3$ | O |
| A-6467 | $-(CH_2)_2O(CH_2)_2-$ | | Me | F | $CH_2CH_2CH_2CH_2CH_2NHS(=O)_2CF_3$ | O |
| A-6468 | $-(CH_2)_2O(CH_2)_2-$ | | Me | F | $CH_2CH_2N(Me)S(=O)_2CF_3$ | O |
| A-6469 | $-(CH_2)_2O(CH_2)_2-$ | | Me | F | $CH_2CH_2N(Et)S(=O)_2CF_3$ | O |
| A-6470 | $-(CH_2)_2O(CH_2)_2-$ | | Me | F | $CH_2CH_2N(CH_2CN)S(=O)_2CF_3$ | O |
| A-6471 | $-(CH_2)_2O(CH_2)_2-$ | | Me | F | $CH_2CH_2N(CH_2OMe)S(=O)_2CF_3$ | O |
| A-6472 | $-(CH_2)_2O(CH_2)_2-$ | | Me | F | $CH_2CH_2CH_2N(Me)S(=O)_2CF_3$ | O |
| A-6473 | $-(CH_2)_2O(CH_2)_2-$ | | Me | F | $CH_2CH_2CH_2N(Et)S(=O)_2CF_3$ | O |
| A-6474 | $-(CH_2)_2O(CH_2)_2-$ | | Me | F | $CH_2CH_2CH_2N(CH_2CN)S(=O)_2CF_3$ | O |
| A-6475 | $-(CH_2)_2O(CH_2)_2-$ | | Me | F | $CH_2CH_2CH_2N(CH_2OMe)S(=O)_2CF_3$ | O |
| A-6476 | $-(CH_2)_2O(CH_2)_2-$ | | Me | F | $CH_2CH_2CH_2CH_2N(Me)S(=O)_2CF_3$ | O |
| A-6477 | $-(CH_2)_2O(CH_2)_2-$ | | Me | F | $CH_2CH_2CH_2CH_2N(Et)S(=O)_2CF_3$ | O |
| A-6478 | $-(CH_2)_2O(CH_2)_2-$ | | Me | F | $CH_2CH_2CH_2CH_2N(CH_2CN)S(=O)_2CF_3$ | O |
| A-6479 | $-(CH_2)_2O(CH_2)_2-$ | | Me | F | $CH_2CH_2CH_2CH_2N(CH_2OMe)S(=O)_2CF_3$ | O |
| A-6480 | $CH_2CF_3$ | Me | Cl | F | $CH_2CH_2CH_2SCF_3$ | O |
| A-6481 | $CH_2CF_3$ | Me | Cl | F | $CH_2CH_2CH_2CH_2SCF_3$ | O |
| A-6482 | $CH_2CF_3$ | Me | Cl | F | $CH_2CH_2CH_2CH_2CH_2SCF_3$ | O |
| A-6483 | $CH_2CF_3$ | Me | Cl | F | $CH_2CH_2CH_2CH_2CH_2CH_2SCF_3$ | O |
| A-6484 | $CH_2CF_3$ | Me | Cl | F | $CH_2CH_2CH_2CH_2CH_2CH_2CH_2SCF_3$ | O |
| A-6485 | $CH_2CF_3$ | Me | Cl | F | $CH_2CH_2NHS(=O)_2CF_3$ | O |
| A-6486 | $CH_2CF_3$ | Me | Cl | F | $CH_2CH_2CH_2NHS(=O)_2CF_3$ | O |
| A-6487 | $CH_2CF_3$ | Me | Cl | F | $CH_2CH_2N(Me)S(=O)_2CF_3$ | O |
| A-6488 | $CH_2CF_3$ | Me | Cl | F | $CH_2CH_2N(Et)S(=O)_2CF_3$ | O |

TABLE 148-continued

| Compound Number | $R^1$ | $R^2$ | $R^3$ | $R^4$ | $R^5$ | A |
|---|---|---|---|---|---|---|
| A-6489 | $CH_2CF_3$ | Me | Cl | F | $CH_2CH_2N(CH_2CN)S(=O)_2CF_3$ | O |
| A-6490 | $CH_2CF_3$ | Me | Cl | F | $CH_2CH_2N(CH_2OMe)S(=O)_2CF_3$ | O |
| A-6491 | $CH_2CF_3$ | Me | Cl | F | $CH_2CH_2CH_2N(Me)S(=O)_2CF_3$ | O |
| A-6492 | $CH_2CF_3$ | Me | Cl | F | $CH_2CH_2CH_2N(Et)S(=O)_2CF_3$ | O |
| A-6493 | $CH_2CF_3$ | Me | Cl | F | $CH_2CH_2CH_2N(CH_2CN)S(=O)_2CF_3$ | O |
| A-6494 | $CH_2CF_3$ | Me | Cl | F | $CH_2CH_2CH_2N(CH_2OMe)S(=O)_2CF_3$ | O |
| A-6495 | $CH_2CF_3$ | Me | Me | F | $CH_2CH_2CH_2SCF_3$ | O |
| A-6496 | $CH_2CF_3$ | Me | Me | F | $CH_2CH_2CH_2CH_2SCF_3$ | O |
| A-6497 | $CH_2CF_3$ | Me | Me | H | $CH_2CH_2CH_2CH_2CH_2SCF_3$ | O |
| A-6498 | $CH_2CF_3$ | Me | Me | F | $CH_2CH_2CH_2CH_2CH_2CH_2SCF_3$ | O |
| A-6499 | $CH_2CF_3$ | Me | Me | F | $CH_2CH_2CH_2CH_2CH_2CH_2CH_2SCF_3$ | O |
| A-6500 | $CH_2CF_3$ | Me | Me | F | $CH_2CH_2NHS(=O)_2CF_3$ | O |
| A-6501 | $CH_2CF_3$ | Me | Me | F | $CH_2CH_2CH_2NHS(=O)_2CF_3$ | O |
| A-6502 | $CH_2CF_3$ | Me | Me | F | $CH_2CH_2N(Me)S(=O)_2CF_3$ | O |
| A-6503 | $CH_2CF_3$ | Me | Me | F | $CH_2CH_2N(Et)S(=O)_2CF_3$ | O |
| A-6504 | $CH_2CF_3$ | Me | Me | F | $CH_2CH_2N(CH_2CN)S(=O)_2CF_3$ | O |
| A-6505 | $CH_2CF_3$ | Me | Me | F | $CH_2CH_2N(CH_2OMe)S(=O)_2CF_3$ | O |
| A-6506 | $CH_2CF_3$ | Me | Me | F | $CH_2CH_2CH_2N(Me)S(=O)_2CF_3$ | O |

TBLE 149

| Compound Number | $R^1$ | $R^2$ | $R^3$ | $R^4$ | $R^5$ | A |
|---|---|---|---|---|---|---|
| A-6507 | $CH_2CF_3$ | Me | Me | F | $CH_2CH_2CH_2N(Et)S(=O)_2CF_3$ | O |
| A-6508 | $CH_2CF_3$ | Me | Me | F | $CH_2CH_2CH_2N(CH_2CN)S(=O)_2CF_3$ | O |
| A-6509 | $CH_2CF_3$ | Me | Me | F | $CH_2CH_2CH_2N(CH_2OMe)S(=O)_2CF_3$ | O |
| A-6510 | $CH_2CF_3$ | Et | Cl | F | $CH_2CH_2CH_2SCF_3$ | O |
| A-6511 | $CH_2CF_3$ | Et | Cl | F | $CH_2CH_2CH_2CH_2SCF_3$ | O |
| A-6512 | $CH_2CF_3$ | Et | Cl | F | $CH_2CH_2CH_2CH_2CH_2SCF_3$ | O |
| A-6513 | $CH_2CF_3$ | Et | Cl | F | $CH_2CH_2CH_2CH_2CH_2CH_2SCF_3$ | O |
| A-6514 | $CH_2CF_3$ | Et | Cl | F | $CH_2CH_2CH_2CH_2CH_2CH_2CH_2SCF_3$ | O |
| A-6515 | $CH_2CF_3$ | Et | Cl | F | $CH_2CH_2NHS(=O)_2CF_3$ | O |
| A-6516 | $CH_2CF_3$ | Et | Cl | F | $CH_2CH_2CH_2NHS(=O)_2CF_3$ | O |
| A-6517 | $CH_2CF_3$ | Et | Cl | F | $CH_2CH_2N(Me)S(=O)_2CF_3$ | O |
| A-6518 | $CH_2CF_3$ | Et | Cl | F | $CH_2CH_2N(Et)S(=O)_2CF_3$ | O |
| A-6519 | $CH_2CF_3$ | Et | Cl | F | $CH_2CH_2N(CH_2CN)S(=O)_2CF_3$ | O |
| A-6520 | $CH_2CF_3$ | Et | Cl | F | $CH_2CH_2N(CH_2OMe)S(=O)_2CF_3$ | O |
| A-6521 | $CH_2CF_3$ | Et | Cl | F | $CH_2CH_2CH_2N(Me)S(=O)_2CF_3$ | O |
| A-6522 | $CH_2CF_3$ | Et | Cl | F | $CH_2CH_2CH_2N(Et)S(=O)_2CF_3$ | O |
| A-6523 | $CH_2CF_3$ | Et | Cl | F | $CH_2CH_2CH_2N(CH_2CN)S(=O)_2CF_3$ | O |
| A-6524 | $CH_2CF_3$ | Et | Cl | F | $CH_2CH_2CH_2N(CH_2OMe)S(=O)_2CF_3$ | O |
| A-6525 | $CH_2CF_3$ | Et | Me | F | $CH_2CH_2CH_2SCF_3$ | O |
| A-6526 | $CH_2CF_3$ | Et | Me | F | $CH_2CH_2CH_2CH_2SCF_3$ | O |
| A-6527 | $CH_2CF_3$ | Et | Me | F | $CH_2CH_2CH_2CH_2CH_2SCF_3$ | O |
| A-6528 | $CH_2CF_3$ | Et | Me | F | $CH_2CH_2CH_2CH_2CH_2CH_2SCF_3$ | O |
| A-6529 | $CH_2CF_3$ | Et | Me | F | $CH_2CH_2CH_2CH_2CH_2CH_2CH_2SCF_3$ | O |
| A-6530 | $CH_2CF_3$ | Et | Me | F | $CH_2CH_2NHS(=O)_2CF_3$ | O |
| A-6531 | $CH_2CF_3$ | Et | Me | F | $CH_2CH_2CH_2NHS(=O)_2CF_3$ | O |
| A-6532 | $CH_2CF_3$ | Et | Me | F | $CH_2CH_2N(Me)S(=O)_2CF_3$ | O |
| A-6533 | $CH_2CF_3$ | Et | Me | F | $CH_2CH_2N(Et)S(=O)_2CF_3$ | O |
| A-6534 | $CH_2CF_3$ | Et | Me | F | $CH_2CH_2N(CH_2CN)S(=O)_2CF_3$ | O |
| A-6535 | $CH_2CF_3$ | Et | Me | F | $CH_2CH_2N(CH_2OMe)S(=O)_2CF_3$ | O |
| A-6536 | $CH_2CF_3$ | Et | Me | F | $CH_2CH_2CH_2N(Me)S(=O)_2CF_3$ | O |
| A-6537 | $CH_2CF_3$ | Et | Me | F | $CH_2CH_2CH_2N(Et)S(=O)_2CF_3$ | O |
| A-6538 | $CH_2CF_3$ | Et | Me | F | $CH_2CH_2CH_2N(CH_2CN)S(=O)_2CF_3$ | O |
| A-6539 | $CH_2CF_3$ | Et | Me | F | $CH_2CH_2CH_2N(CH_2OMe)S(=O)_2CF_3$ | O |
| A-6540 | $CH_2CF_3$ | n-Hex | Cl | F | $CH_2CH_2CH_2SCF_3$ | O |
| A-6541 | $CH_2CF_3$ | n-Hex | Cl | F | $CH_2CH_2CH_2CH_2SCF_3$ | O |
| A-6542 | $CH_2CF_3$ | n-Hex | Cl | F | $CH_2CH_2CH_2CH_2CH_2SCF_3$ | O |
| A-6543 | $CH_2CF_3$ | n-Hex | Cl | F | $CH_2CH_2CH_2CH_2CH_2CH_2SCF_3$ | O |
| A-6544 | $CH_2CF_3$ | n-Hex | Cl | F | $CH_2CH_2CH_2CH_2CH_2CH_2CH_2SCF_3$ | O |
| A-6545 | $CH_2CF_3$ | n-Hex | Cl | F | $CH_2CH_2NHS(=O)_2CF_3$ | O |
| A-6546 | $CH_2CF_3$ | n-Hex | Cl | F | $CH_2CH_2CH_2NHS(=O)_2CF_3$ | O |
| A-6547 | $CH_2CF_3$ | n-Hex | Cl | F | $CH_2CH_2N(Me)S(=O)_2CF_3$ | O |
| A-6548 | $CH_2CF_3$ | n-Hex | Cl | F | $CH_2CH_2N(Et)S(=O)_2CF_3$ | O |
| A-6549 | $CH_2CF_3$ | n-Hex | Cl | F | $CH_2CH_2N(CH_2CN)S(=O)_2CF_3$ | O |
| A-6550 | $CH_2CF_3$ | n-Hex | Cl | F | $CH_2CH_2N(CH_2OMe)S(=O)_2CF_3$ | O |

TABLE 150

| Compound Number | $R^1$ | $R^2$ | $R^3$ | $R^4$ | $R^5$ | A |
|---|---|---|---|---|---|---|
| A-6551 | $CH_2CF_3$ | n-Hex | Cl | F | $CH_2CH_2CH_2N(Me)S(=O)_2CF_3$ | O |
| A-6552 | $CH_2CF_3$ | n-Hex | Cl | F | $CH_2CH_2CH_2N(Et)S(=O)_2CF_3$ | O |
| A-6553 | $CH_2CF_3$ | n-Hex | Cl | F | $CH_2CH_2CH_2N(CH_2CN)S(=O)_2CF_3$ | O |
| A-6554 | $CH_2CF_3$ | n-Hex | Cl | F | $CH_2CH_2CH_2N(CH_2OMe)S(=O)_2CF_3$ | O |
| A-6555 | $CH_2CF_3$ | n-Hex | Me | F | $CH_2CH_2CH_2SCF_3$ | O |
| A-6556 | $CH_2CF_3$ | n-Hex | Me | F | $CH_2CH_2CH_2CH_2SCF_3$ | O |
| A-6557 | $CH_2CF_3$ | n-Hex | Me | F | $CH_2CH_2CH_2CH_2CH_2SCF_3$ | O |
| A-6558 | $CH_2CF_3$ | n-Hex | Me | F | $CH_2CH_2CH_2CH_2CH_2CH_2SCF_3$ | O |
| A-6559 | $CH_2CF_3$ | n-Hex | Me | F | $CH_2CH_2CH_2CH_2CH_2CH_2CH_2SCF_3$ | O |
| A-6560 | $CH_2CF_3$ | n-Hex | Me | F | $CH_2CH_2NHS(=O)_2CF_3$ | O |
| A-6561 | $CH_2CF_3$ | n-Hex | Me | F | $CH_2CH_2CH_2NHS(=O)_2CF_3$ | O |
| A-6562 | $CH_2CF_3$ | n-Hex | Me | F | $CH_2CH_2N(Me)S(=O)_2CF_3$ | O |
| A-6563 | $CH_2CF_3$ | n-Hex | Me | F | $CH_2CH_2N(Et)S(=O)_2CF_3$ | O |
| A-6564 | $CH_2CF_3$ | n-Hex | Me | F | $CH_2CH_2N(CH_2CN)S(=O)_2CF_3$ | O |
| A-6565 | $CH_2CF_3$ | n-Hex | Me | F | $CH_2CH_2N(CH_2OMe)S(=O)_2CF_3$ | O |
| A-6566 | $CH_2CF_3$ | n-Hex | Me | F | $CH_2CH_2CH_2N(Me)S(=O)_2CF_3$ | O |
| A-6567 | $CH_2CF_3$ | n-Hex | Me | F | $CH_2CH_2CH_2N(Et)S(=O)_2CF_3$ | O |
| A-6568 | $CH_2CF_3$ | n-Hex | Me | F | $CH_2CH_2CH_2N(CH_2CN)S(=O)_2CF_3$ | O |
| A-6569 | $CH_2CF_3$ | n-Hex | Me | F | $CH_2CH_2CH_2N(CH_2OMe)S(=O)_2CF_3$ | O |
| A-6570 | $CH_2CF_3$ | $CH_2CH_2F$ | Cl | F | $CH_2CH_2CH_2SCF_3$ | O |
| A-6571 | $CH_2CF_3$ | $CH_2CH_2F$ | Cl | F | $CH_2CH_2CH_2CH_2SCF_3$ | O |
| A-6572 | $CH_2CF_3$ | $CH_2CH_2F$ | Cl | F | $CH_2CH_2CH_2CH_2CH_2SCF_3$ | O |
| A-6573 | $CH_2CF_3$ | $CH_2CH_2F$ | Cl | F | $CH_2CH_2CH_2CH_2CH_2CH_2SCF_3$ | O |
| A-6574 | $CH_2CF_3$ | $CH_2CH_2F$ | Cl | F | $CH_2CH_2CH_2CH_2CH_2CH_2CH_2SCF_3$ | O |
| A-6575 | $CH_2CF_3$ | $CH_2CH_2F$ | Cl | F | $CH_2CH_2NHS(=O)_2CF_3$ | O |
| A-6576 | $CH_2CF_3$ | $CH_2CH_2F$ | Cl | F | $CH_2CH_2CH_2NHS(=O)_2CF_3$ | O |
| A-6577 | $CH_2CF_3$ | $CH_2CH_2F$ | Cl | F | $CH_2CH_2N(Me)S(=O)_2CF_3$ | O |
| A-6578 | $CH_2CF_3$ | $CH_2CH_2F$ | Cl | F | $CH_2CH_2N(Et)S(=O)_2CF_3$ | O |
| A-6579 | $CH_2CF_3$ | $CH_2CH_2F$ | Cl | F | $CH_2CH_2N(CH_2CN)S(=O)_2CF_3$ | O |
| A-6580 | $CH_2CF_3$ | $CH_2CH_2F$ | Cl | F | $CH_2CH_2N(CH_2OMe)S(=O)_2CF_3$ | O |
| A-6581 | $CH_2CF_3$ | $CH_2CH_2F$ | Cl | F | $CH_2CH_2CH_2N(Me)S(=O)_2CF_3$ | O |
| A-6582 | $CH_2CF_3$ | $CH_2CH_2F$ | Cl | F | $CH_2CH_2CH_2N(Et)S(=O)_2CF_3$ | O |
| A-6583 | $CH_2CF_3$ | $CH_2CH_2F$ | Cl | F | $CH_2CH_2CH_2N(CH_2CN)S(=O)_2CF_3$ | O |
| A-6584 | $CH_2CF_3$ | $CH_2CH_2F$ | Cl | F | $CH_2CH_2CH_2N(CH_2OMe)S(=O)_2CF_3$ | O |
| A-6585 | $CH_2CF_3$ | $CH_2CH_2F$ | Me | F | $CH_2CH_2CH_2SCF_3$ | O |
| A-6586 | $CH_2CF_3$ | $CH_2CH_2F$ | Me | F | $CH_2CH_2CH_2CH_2SCF_3$ | O |
| A-6587 | $CH_2CF_3$ | $CH_2CH_2F$ | Me | F | $CH_2CH_2CH_2CH_2CH_2SCF_3$ | O |
| A-6588 | $CH_2CF_3$ | $CH_2CH_2F$ | Me | F | $CH_2CH_2CH_2CH_2CH_2CH_2SCF_3$ | O |
| A-6589 | $CH_2CF_3$ | $CH_2CH_2F$ | Me | F | $CH_2CH_2CH_2CH_2CH_2CH_2CH_2SCF_3$ | O |
| A-6590 | $CH_2CF_3$ | $CH_2CH_2F$ | Me | F | $CH_2CH_2NHS(=O)_2CF_3$ | O |
| A-6591 | $CH_2CF_3$ | $CH_2CH_2F$ | Me | F | $CH_2CH_2CH_2NHS(=O)_2CF_3$ | O |
| A-6592 | $CH_2CF_3$ | $CH_2CH_2F$ | Me | F | $CH_2CH_2N(Me)S(=O)_2CF_3$ | O |
| A-6593 | $CH_2CF_3$ | $CH_2CH_2F$ | Me | F | $CH_2CH_2N(Et)S(=O)_2CF_3$ | O |
| A-6594 | $CH_2CF_3$ | $CH_2CH_2F$ | Me | F | $CH_2CH_2N(CH_2CN)S(=O)_2CF_3$ | O |

TABLE 151

| Compound Number | $R^1$ | $R^2$ | $R^3$ | $R^4$ | $R^5$ | A |
|---|---|---|---|---|---|---|
| A-6595 | $CH_2CF_3$ | $CH_2CH_2F$ | Me | F | $CH_2CH_2N(CH_2OMe)S(=O)_2CF_3$ | O |
| A-6596 | $CH_2CF_3$ | $CH_2CH_2F$ | Me | F | $CH_2CH_2CH_2N(Me)S(=O)_2CF_3$ | O |
| A-6597 | $CH_2CF_3$ | $CH_2CH_2F$ | Me | F | $CH_2CH_2CH_2N(Et)S(=O)_2CF_3$ | O |
| A-6598 | $CH_2CF_3$ | $CH_2CH_2F$ | Me | F | $CH_2CH_2CH_2N(CH_2CN)S(=O)_2CF_3$ | O |
| A-6599 | $CH_2CF_3$ | $CH_2CH_2F$ | Me | F | $CH_2CH_2CH_2N(CH_2OMe)S(=O)_2CF_3$ | O |
| A-6600 | $CH_2CF_3$ | $CH_2CHF_2$ | Cl | F | $CH_2CH_2CH_2SCF_3$ | O |
| A-6601 | $CH_2CF_3$ | $CH_2CHF_2$ | Cl | F | $CH_2CH_2CH_2CH_2SCF_3$ | O |
| A-6602 | $CH_2CF_3$ | $CH_2CHF_2$ | Cl | F | $CH_2CH_2CH_2CH_2CH_2SCF_3$ | O |
| A-6603 | $CH_2CF_3$ | $CH_2CHF_2$ | Cl | F | $CH_2CH_2CH_2CH_2CH_2CH_2SCF_3$ | O |
| A-6604 | $CH_2CF_3$ | $CH_2CHF_2$ | Cl | F | $CH_2CH_2CH_2CH_2CH_2CH_2CH_2SCF_3$ | O |
| A-6605 | $CH_2CF_3$ | $CH_2CHF_2$ | Cl | F | $CH_2CH_2NHS(=O)_2CF_3$ | O |
| A-6606 | $CH_2CF_3$ | $CH_2CHF_2$ | Cl | F | $CH_2CH_2CH_2NHS(=O)_2CF_3$ | O |
| A-6607 | $CH_2CF_3$ | $CH_2CHF_2$ | Cl | F | $CH_2CH_2N(Me)S(=O)_2CF_3$ | O |
| A-6608 | $CH_2CF_3$ | $CH_2CHF_2$ | Cl | F | $CH_2CH_2N(Et)S(=O)_2CF_3$ | O |
| A-6609 | $CH_2CF_3$ | $CH_2CHF_2$ | Cl | F | $CH_2CH_2N(CH_2CN)S(=O)_2CF_3$ | O |
| A-6610 | $CH_2CF_3$ | $CH_2CHF_2$ | Cl | F | $CH_2CH_2N(CH_2OMe)S(=O)_2CF_3$ | O |
| A-6611 | $CH_2CF_3$ | $CH_2CHF_2$ | Cl | F | $CH_2CH_2CH_2N(Me)S(=O)_2CF_3$ | O |
| A-6612 | $CH_2CF_3$ | $CH_2CHF_2$ | Cl | F | $CH_2CH_2CH_2N(Et)S(=O)_2CF_3$ | O |
| A-6613 | $CH_2CF_3$ | $CH_2CHF_2$ | Cl | F | $CH_2CH_2CH_2N(CH_2CN)S(=O)_2CF_3$ | O |
| A-6614 | $CH_2CF_3$ | $CH_2CHF_2$ | Cl | F | $CH_2CH_2CH_2N(CH_2OMe)S(=O)_2CF_3$ | O |
| A-6615 | $CH_2CF_3$ | $CH_2CHF_2$ | Me | F | $CH_2CH_2CH_2SCF_3$ | O |
| A-6616 | $CH_2CF_3$ | $CH_2CHF_2$ | Me | F | $CH_2CH_2CH_2CH_2SCF_3$ | O |
| A-6617 | $CH_2CF_3$ | $CH_2CHF_2$ | Me | F | $CH_2CH_2CH_2CH_2CH_2SCF_3$ | O |

TABLE 151-continued

| Compound Number | $R^1$ | $R^2$ | $R^3$ | $R^4$ | $R^5$ | A |
|---|---|---|---|---|---|---|
| A-6618 | $CH_2CF_3$ | $CH_2CHF_2$ | Me | F | $CH_2CH_2CH_2CH_2CH_2CH_2SCF_3$ | O |
| A-6619 | $CH_2CF_3$ | $CH_2CHF_2$ | Me | F | $CH_2CH_2CH_2CH_2CH_2CH_2CH_2SCF_3$ | O |
| A-6620 | $CH_2CF_3$ | $CH_2CHF_2$ | Me | F | $CH_2CH_2NHS(=O)_2CF_3$ | O |
| A-6621 | $CH_2CF_3$ | $CH_2CHF_2$ | Me | F | $CH_2CH_2CH_2NHS(=O)_2CF_3$ | O |
| A-6622 | $CH_2CF_3$ | $CH_2CHF_2$ | Me | F | $CH_2CH_2N(Me)S(=O)_2CF_3$ | O |
| A-6623 | $CH_2CF_3$ | $CH_2CHF_2$ | Me | F | $CH_2CH_2N(Et)S(=O)_2CF_3$ | O |
| A-6624 | $CH_2CF_3$ | $CH_2CHF_2$ | Me | F | $CH_2CH_2N(CH_2CN)S(=O)_2CF_3$ | O |
| A-6625 | $CH_2CF_3$ | $CH_2CHF_2$ | Me | F | $CH_2CH_2N(CH_2OMe)S(=O)_2CF_3$ | O |
| A-6626 | $CH_2CF_3$ | $CH_2CHF_2$ | Me | F | $CH_2CH_2CH_2N(Me)S(=O)_2CF_3$ | O |
| A-6627 | $CH_2CF_3$ | $CH_2CHF_2$ | Me | F | $CH_2CH_2CH_2N(Et)S(=O)_2CF_3$ | O |
| A-6628 | $CH_2CF_3$ | $CH_2CHF_2$ | Me | F | $CH_2CH_2CH_2N(CH_2CN)S(=O)_2CF_3$ | O |
| A-6629 | $CH_2CF_3$ | $CH_2CHF_2$ | Me | F | $CH_2CH_2CH_2N(CH_2OMe)S(=O)_2CF_3$ | O |
| A-6630 | $CH_2CF_3$ | $CH_2CF_3$ | Cl | F | $CH_2CH_2CH_2SCF_3$ | O |
| A-6631 | $CH_2CF_3$ | $CH_2CF_3$ | Cl | F | $CH_2CH_2CH_2CH_2SCF_3$ | O |
| A-6632 | $CH_2CF_3$ | $CH_2CF_3$ | Cl | F | $CH_2CH_2CH_2CH_2CH_2SCF_3$ | O |
| A-6633 | $CH_2CF_3$ | $CH_2CF_3$ | Cl | F | $CH_2CH_2CH_2CH_2CH_2CH_2SCF_3$ | O |
| A-6634 | $CH_2CF_3$ | $CH_2CF_3$ | Cl | F | $CH_2CH_2CH_2CH_2CH_2CH_2CH_2SCF_3$ | O |
| A-6635 | $CH_2CF_3$ | $CH_2CF_3$ | Cl | F | $CH_2CH_2NHS(=O)_2CF_3$ | O |
| A-6636 | $CH_2CF_3$ | $CH_2CF_3$ | Cl | F | $CH_2CH_2CH_2NHS(=O)_2CF_3$ | O |
| A-6637 | $CH_2CF_3$ | $CH_2CF_3$ | Cl | F | $CH_2CH_2N(Me)S(=O)_2CF_3$ | O |
| A-6638 | $CH_2CF_3$ | $CH_2CF_3$ | Cl | F | $CH_2CH_2N(Et)S(=O)_2CF_3$ | O |

TABLE 152

| Compound Number | $R^1$ | $R^2$ | $R^3$ | $R^4$ | $R^5$ | A |
|---|---|---|---|---|---|---|
| A-6639 | $CH_2CF_3$ | $CH_2CF_3$ | Cl | F | $CH_2CH_2N(CH_2CN)S(=O)_2CF_3$ | O |
| A-6640 | $CH_2CF_3$ | $CH_2CF_3$ | Cl | F | $CH_2CH_2N(CH_2OMe)S(=O)_2CF_3$ | O |
| A-6641 | $CH_2CF_3$ | $CH_2CF_3$ | Cl | F | $CH_2CH_2CH_2N(Me)S(=O)_2CF_3$ | O |
| A-6642 | $CH_2CF_3$ | $CH_2CF_3$ | Cl | F | $CH_2CH_2CH_2N(Et)S(=O)_2CF_3$ | O |
| A-6643 | $CH_2CF_3$ | $CH_2CF_3$ | Cl | F | $CH_2CH_2CH_2N(CH_2CN)S(=O)_2CF_3$ | O |
| A-6644 | $CH_2CF_3$ | $CH_2CF_3$ | Cl | F | $CH_2CH_2CH_2N(CH_2OMe)S(=O)_2CF_3$ | O |
| A-6645 | $CH_2CF_3$ | $CH_2CF_3$ | Me | F | $CH_2CH_2CH_2SCF_3$ | O |
| A-6646 | $CH_2CF_3$ | $CH_2CF_3$ | Me | F | $CH_2CH_2CH_2CH_2SCF_3$ | O |
| A-6647 | $CH_2CF_3$ | $CH_2CF_3$ | Me | F | $CH_2CH_2CH_2CH_2CH_2SCF_3$ | O |
| A-6648 | $CH_2CF_3$ | $CH_2CF_3$ | Me | F | $CH_2CH_2CH_2CH_2CH_2CH_2SCF_3$ | O |
| A-6649 | $CH_2CF_3$ | $CH_2CF_3$ | Me | F | $CH_2CH_2CH_2CH_2CH_2CH_2CH_2SCF_3$ | O |
| A-6650 | $CH_2CF_3$ | $CH_2CF_3$ | Me | F | $CH_2CH_2NHS(=O)_2CF_3$ | O |
| A-6651 | $CH_2CF_3$ | $CH_2CF_3$ | Me | F | $CH_2CH_2CH_2NHS(=O)_2CF_3$ | O |
| A-6652 | $CH_2CF_3$ | $CH_2CF_3$ | Me | F | $CH_2CH_2N(Me)S(=O)_2CF_3$ | O |
| A-6653 | $CH_2CF_3$ | $CH_2CF_3$ | Me | F | $CH_2CH_2N(Et)S(=O)_2CF_3$ | O |
| A-6654 | $CH_2CF_3$ | $CH_2CF_3$ | Me | F | $CH_2CH_2N(CH_2CN)S(=O)_2CF_3$ | O |
| A-6655 | $CH_2CF_3$ | $CH_2CF_3$ | Me | F | $CH_2CH_2N(CH_2OMe)S(=O)_2CF_3$ | O |
| A-6656 | $CH_2CF_3$ | $CH_2CF_3$ | Me | F | $CH_2CH_2CH_2N(Me)S(=O)_2CF_3$ | O |
| A-6657 | $CH_2CF_3$ | $CH_2CF_3$ | Me | F | $CH_2CH_2CH_2N(Et)S(=O)_2CF_3$ | O |
| A-6658 | $CH_2CF_3$ | $CH_2CF_3$ | Me | F | $CH_2CH_2CH_2N(CH_2CN)S(=O)_2CF_3$ | O |
| A-6659 | $CH_2CF_3$ | $CH_2CF_3$ | Me | F | $CH_2CH_2CH_2N(CH_2OMe)S(=O)_2CF_3$ | O |
| A-6660 | $CH_2CF_3$ | $CH_2C\equiv CH$ | Cl | F | $CH_2CH_2CH_2SCF_3$ | O |
| A-6661 | $CH_2CF_3$ | $CH_2C\equiv CH$ | Cl | F | $CH_2CH_2CH_2CH_2SCF_3$ | O |
| A-6662 | $CH_2CF_3$ | $CH_2C\equiv CH$ | Cl | F | $CH_2CH_2CH_2CH_2CH_2SCF_3$ | O |
| A-6663 | $CH_2CF_3$ | $CH_2C\equiv CH$ | Cl | F | $CH_2CH_2CH_2CH_2CH_2CH_2SCF_3$ | O |
| A-6664 | $CH_2CF_3$ | $CH_2C\equiv CH$ | Cl | F | $CH_2CH_2CH_2CH_2CH_2CH_2CH_2SCF_3$ | O |
| A-6665 | $CH_2CF_3$ | $CH_2C\equiv CH$ | Cl | F | $CH_2CH_2NHS(=O)_2CF_3$ | O |
| A-6666 | $CH_2CF_3$ | $CH_2C\equiv CH$ | Cl | F | $CH_2CH_2CH_2NHS(=O)_2CF_3$ | O |
| A-6667 | $CH_2CF_3$ | $CH_2C\equiv CH$ | Cl | F | $CH_2CH_2N(Me)S(=O)_2CF_3$ | O |
| A-6668 | $CH_2CF_3$ | $CH_2C\equiv CH$ | Cl | F | $CH_2CH_2N(Et)S(=O)_2CF_3$ | O |
| A-6669 | $CH_2CF_3$ | $CH_2C\equiv CH$ | Cl | F | $CH_2CH_2N(CH_2CN)S(=O)_2CF_3$ | O |
| A-6670 | $CH_2CF_3$ | $CH_2C\equiv CH$ | Cl | F | $CH_2CH_2N(CH_2OMe)S(=O)_2CF_3$ | O |
| A-6671 | $CH_2CF_3$ | $CH_2C\equiv CH$ | Cl | F | $CH_2CH_2CH_2N(Me)S(=O)_2CF_3$ | O |
| A-6672 | $CH_2CF_3$ | $CH_2C\equiv CH$ | Cl | F | $CH_2CH_2CH_2N(Et)S(=O)_2CF_3$ | O |
| A-6673 | $CH_2CF_3$ | $CH_2C\equiv CH$ | Cl | F | $CH_2CH_2CH_2N(CH_2CN)S(=O)_2CF_3$ | O |
| A-6674 | $CH_2CF_3$ | $CH_2C\equiv CH$ | Cl | F | $CH_2CH_2CH_2N(CH_2OMe)S(=O)_2CF_3$ | O |
| A-6675 | $CH_2CF_3$ | $CH_2C\equiv CH$ | Me | F | $CH_2CH_2CH_2SCF_3$ | O |
| A-6676 | $CH_2CF_3$ | $CH_2C\equiv CH$ | Me | F | $CH_2CH_2CH_2CH_2SCF_3$ | O |
| A-6677 | $CH_2CF_3$ | $CH_2C\equiv CH$ | Me | F | $CH_2CH_2CH_2CH_2CH_2SCF_3$ | O |
| A-6678 | $CH_2CF_3$ | $CH_2C\equiv CH$ | Me | F | $CH_2CH_2CH_2CH_2CH_2CH_2SCF_3$ | O |
| A-6679 | $CH_2CF_3$ | $CH_2C\equiv CH$ | Me | F | $CH_2CH_2CH_2CH_2CH_2CH_2CH_2SCF_3$ | O |
| A-6680 | $CH_2CF_3$ | $CH_2C\equiv CH$ | Me | F | $CH_2CH_2NHS(=O)_2CF_3$ | O |
| A-6681 | $CH_2CF_3$ | $CH_2C\equiv CH$ | Me | F | $CH_2CH_2CH_2NHS(=O)_2CF_3$ | O |
| A-6682 | $CH_2CF_3$ | $CH_2C\equiv CH$ | Me | F | $CH_2CH_2N(Me)S(=O)_2CF_3$ | O |

TABLE 153

| Compound Number | $R^1$ | $R^2$ | $R^3$ | $R^4$ | $R^5$ | A |
|---|---|---|---|---|---|---|
| A-6683 | $CH_2CF_3$ | $CH_2C{\equiv}CH$ | Me | F | $CH_2CH_2N(Et)S({=}O)_2CF_3$ | O |
| A-6684 | $CH_2CF_3$ | $CH_2C{\equiv}CH$ | Me | F | $CH_2CH_2N(CH_2CN)S({=}O)_2CF_3$ | O |
| A-6685 | $CH_2CF_3$ | $CH_2C{\equiv}CH$ | Me | F | $CH_2CH_2N(CH_2OMe)S({=}O)_2CF_3$ | O |
| A-6686 | $CH_2CF_3$ | $CH_2C{\equiv}CH$ | Me | F | $CH_2CH_2CH_2N(Me)S({=}O)_2CF_3$ | O |
| A-6687 | $CH_2CF_3$ | $CH_2C{\equiv}CH$ | Me | F | $CH_2CH_2CH_2N(Et)S({=}O)_2CF_3$ | O |
| A-6688 | $CH_2CF_3$ | $CH_2C{\equiv}CH$ | Me | F | $CH_2CH_2CH_2N(CH_2CN)S({=}O)_2CF_3$ | O |
| A-6689 | $CH_2CF_3$ | $CH_2C{\equiv}CH$ | Me | F | $CH_2CH_2CH_2N(CH_2OMe)S({=}O)_2CF_3$ | O |
| A-6690 | $CH_2CF_3$ | $CH_2CN$ | Cl | F | $CH_2CH_2CH_2SCF_3$ | O |
| A-6691 | $CH_2CF_3$ | $CH_2CN$ | Cl | F | $CH_2CH_2CH_2CH_2SCF_3$ | O |
| A-6692 | $CH_2CF_3$ | $CH_2CN$ | Cl | F | $CH_2CH_2CH_2CH_2CH_2SCF_3$ | O |
| A-6693 | $CH_2CF_3$ | $CH_2CN$ | Cl | F | $CH_2CH_2CH_2CH_2CH_2CH_2SCF_3$ | O |
| A-6694 | $CH_2CF_3$ | $CH_2CN$ | Cl | F | $CH_2CH_2CH_2CH_2CH_2CH_2CH_2SCF_3$ | O |
| A-6695 | $CH_2CF_3$ | $CH_2CN$ | Cl | F | $CH_2CH_2NHS({=}O)_2CF_3$ | O |
| A-6696 | $CH_2CF_3$ | $CH_2CN$ | Cl | F | $CH_2CH_2CH_2NHS({=}O)_2CF_3$ | O |
| A-6697 | $CH_2CF_3$ | $CH_2CN$ | Cl | F | $CH_2CH_2N(Me)S({=}O)_2CF_3$ | O |
| A-6698 | $CH_2CF_3$ | $CH_2CN$ | Cl | F | $CH_2CH_2N(Et)S({=}O)_2CF_3$ | O |
| A-6699 | $CH_2CF_3$ | $CH_2CN$ | Cl | F | $CH_2CH_2N(CH_2CN)S({=}O)_2CF_3$ | O |
| A-6700 | $CH_2CF_3$ | $CH_2CN$ | Cl | F | $CH_2CH_2N(CH_2OMe)S({=}O)_2CF_3$ | O |
| A-6701 | $CH_2CF_3$ | $CH_2CN$ | Cl | F | $CH_2CH_2CH_2N(Me)S({=}O)_2CF_3$ | O |
| A-6702 | $CH_2CF_3$ | $CH_2CN$ | Cl | F | $CH_2CH_2CH_2N(Et)S({=}O)_2CF_3$ | O |
| A-6703 | $CH_2CF_3$ | $CH_2CN$ | Cl | F | $CH_2CH_2CH_2N(CH_2CN)S({=}O)_2CF_3$ | O |
| A-6704 | $CH_2CF_3$ | $CH_2CN$ | Cl | F | $CH_2CH_2CH_2N(CH_2OMe)S({=}O)_2CF_3$ | O |
| A-6705 | $CH_2CF_3$ | $CH_2CN$ | Me | F | $CH_2CH_2CH_2SCF_3$ | O |
| A-6706 | $CH_2CF_3$ | $CH_2CN$ | Me | F | $CH_2CH_2CH_2CH_2SCF_3$ | O |
| A-6707 | $CH_2CF_3$ | $CH_2CN$ | Me | F | $CH_2CH_2CH_2CH_2CH_2SCF_3$ | O |
| A-6708 | $CH_2CF_3$ | $CH_2CN$ | Me | Cl | $CH_2CH_2CH_2CH_2CH_2SCF_3$ | O |
| A-6709 | $CH_2CF_3$ | $CH_2CN$ | Me | Me | $CH_2CH_2CH_2CH_2CH_2SCF_3$ | O |
| A-6710 | $CH_2CF_3$ | $CH_2CN$ | Me | F | $CH_2CH_2CH_2CH_2CH_2CH_2SCF_3$ | O |
| A-6711 | $CH_2CF_3$ | $CH_2CN$ | Me | F | $CH_2CH_2CH_2CH_2CH_2CH_2CH_2SCF_3$ | O |
| A-6712 | $CH_2CF_3$ | $CH_2CN$ | Me | F | $CH_2CH_2NHS({=}O)_2CF_3$ | O |
| A-6713 | $CH_2CF_3$ | $CH_2CN$ | Me | F | $CH_2CH_2CH_2NHS({=}O)_2CF_3$ | O |
| A-6714 | $CH_2CF_3$ | $CH_2CN$ | Me | F | $CH_2CH_2N(Me)S({=}O)_2CF_3$ | O |
| A-6715 | $CH_2CF_3$ | $CH_2CN$ | Me | F | $CH_2CH_2N(Et)S({=}O)_2CF_3$ | O |
| A-6716 | $CH_2CF_3$ | $CH_2CN$ | Me | F | $CH_2CH_2N(CH_2CN)S({=}O)_2CF_3$ | O |
| A-6717 | $CH_2CF_3$ | $CH_2CN$ | Me | F | $CH_2CH_2N(CH_2OMe)S({=}O)_2CF_3$ | O |
| A-6718 | $CH_2CF_3$ | $CH_2CN$ | Me | F | $CH_2CH_2CH_2N(Me)S({=}O)_2CF_3$ | O |
| A-6719 | $CH_2CF_3$ | $CH_2CN$ | Me | F | $CH_2CH_2CH_2N(Et)S({=}O)_2CF_3$ | O |
| A-6720 | $CH_2CF_3$ | $CH_2CN$ | Me | F | $CH_2CH_2CH_2N(CH_2CN)S({=}O)_2CF_3$ | O |
| A-6721 | $CH_2CF_3$ | $CH_2CN$ | Me | F | $CH_2CH_2CH_2N(CH_2OMe)S({=}O)_2CF_3$ | O |
| A-6722 | $CH_2CF_3$ | $CH_2CH(OH)CH_3$ | Cl | F | $CH_2CH_2CH_2SCF_3$ | O |
| A-6723 | $CH_2CF_3$ | $CH_2CH(OH)CH_3$ | Cl | F | $CH_2CH_2CH_2CH_2SCF_3$ | O |
| A-6724 | $CH_2CF_3$ | $CH_2CH(OH)CH_3$ | Cl | F | $CH_2CH_2CH_2CH_2CH_2SCF_3$ | O |
| A-6725 | $CH_2CF_3$ | $CH_2CH(OH)CH_3$ | Cl | F | $CH_2CH_2CH_2CH_2CH_2CH_2SCF_3$ | O |
| A-6726 | $CH_2CF_3$ | $CH_2CH(OH)CH_3$ | Cl | F | $CH_2CH_2CH_2CH_2CH_2CH_2CH_2SCF_3$ | O |

TABLE 154

| Compound Number | $R^1$ | $R^2$ | $R^3$ | $R^4$ | $R^5$ | A |
|---|---|---|---|---|---|---|
| A-6727 | $CH_2CF_3$ | $CH_2CH(OH)CH_3$ | Cl | F | $CH_2CH_2NHS({=}O)_2CF_3$ | O |
| A-6728 | $CH_2CF_3$ | $CH_2CH(OH)CH_3$ | Cl | F | $CH_2CH_2CH_2NHS({=}O)_2CF_3$ | O |
| A-6729 | $CH_2CF_3$ | $CH_2CH(OH)CH_3$ | Cl | F | $CH_2CH_2N(Me)S({=}O)_2CF_3$ | O |
| A-6730 | $CH_2CF_3$ | $CH_2CH(OH)CH_3$ | Cl | F | $CH_2CH_2N(Et)S({=}O)_2CF_3$ | O |
| A-6731 | $CH_2CF_3$ | $CH_2CH(OH)CH_3$ | Cl | F | $CH_2CH_2N(CH_2CN)S({=}O)_2CF_3$ | O |
| A-6732 | $CH_2CF_3$ | $CH_2CH(OH)CH_3$ | Cl | F | $CH_2CH_2N(CH_2OMe)S({=}O)_2CF_3$ | O |
| A-6733 | $CH_2CF_3$ | $CH_2CH(OH)CH_3$ | Cl | F | $CH_2CH_2CH_2N(Me)S({=}O)_2CF_3$ | O |
| A-6734 | $CH_2CF_3$ | $CH_2CH(OH)CH_3$ | Cl | F | $CH_2CH_2CH_2N(Et)S({=}O)_2CF_3$ | O |
| A-6735 | $CH_2CF_3$ | $CH_2CH(OH)CH_3$ | Cl | F | $CH_2CH_2CH_2N(CH_2CN)S({=}O)_2CF_3$ | O |
| A-6736 | $CH_2CF_3$ | $CH_2CH(OH)CH_3$ | Cl | F | $CH_2CH_2CH_2N(CH_2OMe)S({=}O)_2CF_3$ | O |
| A-6737 | $CH_2CF_3$ | $CH_2CH(OH)CH_3$ | Me | F | $CH_2CH_2CH_2SCF_3$ | O |
| A-6738 | $CH_2CF_3$ | $CH_2CH(OH)CH_3$ | Me | F | $CH_2CH_2CH_2CH_2SCF_3$ | O |
| A-6739 | $CH_2CF_3$ | $CH_2CH(OH)CH_3$ | Me | F | $CH_2CH_2CH_2CH_2CH_2SCF_3$ | O |
| A-6740 | $CH_2CF_3$ | $CH_2CH(OH)CH_3$ | Me | F | $CH_2CH_2CH_2CH_2CH_2CH_2SCF_3$ | O |
| A-6741 | $CH_2CF_3$ | $CH_2CH(OH)CH_3$ | Me | F | $CH_2CH_2CH_2CH_2CH_2CH_2CH_2SCF_3$ | O |
| A-6742 | $CH_2CF_3$ | $CH_2CH(OH)CH_3$ | Me | F | $CH_2CH_2NHS({=}O)_2CF_3$ | O |
| A-6743 | $CH_2CF_3$ | $CH_2CH(OH)CH_3$ | Me | F | $CH_2CH_2CH_2NHS({=}O)_2CF_3$ | O |
| A-6744 | $CH_2CF_3$ | $CH_2CH(OH)CH_3$ | Me | F | $CH_2CH_2N(Me)S({=}O)_2CF_3$ | O |
| A-6745 | $CH_2CF_3$ | $CH_2CH(OH)CH_3$ | Me | F | $CH_2CH_2N(Et)S({=}O)_2CF_3$ | O |
| A-6746 | $CH_2CF_3$ | $CH_2CH(OH)CH_3$ | Me | F | $CH_2CH_2N(CH_2CN)S({=}O)_2CF_3$ | O |
| A-6747 | $CH_2CF_3$ | $CH_2CH(OH)CH_3$ | Me | F | $CH_2CH_2N(CH_2OMe)S({=}O)_2CF_3$ | O |

TABLE 154-continued

| Compound Number | $R^1$ | $R^2$ | $R^3$ | $R^4$ | $R^5$ | A |
|---|---|---|---|---|---|---|
| A-6748 | $CH_2CF_3$ | $CH_2CH(OH)CH_3$ | Me | F | $CH_2CH_2CH_2N(Me)S(=O)_2CF_3$ | O |
| A-6749 | $CH_2CF_3$ | $CH_2CH(OH)CH_3$ | Me | F | $CH_2CH_2CH_2N(Et)S(=O)_2CF_3$ | O |
| A-6750 | $CH_2CF_3$ | $CH_2CH(OH)CH_3$ | Me | F | $CH_2CH_2CH_2N(CH_2CN)S(=O)_2CF_3$ | O |
| A-6751 | $CH_2CF_3$ | $CH_2CH(OH)CH_3$ | Me | F | $CH_2CH_2CH_2N(CH_2OMe)S(=O)_2CF_3$ | O |
| A-6752 | $CH_2CF_3$ | $CH_2OMe$ | Cl | F | $CH_2CH_2CH_2SCF_3$ | O |
| A-6753 | $CH_2CF_3$ | $CH_2OMe$ | Cl | F | $CH_2CH_2CH_2CH_2SCF_3$ | O |
| A-6754 | $CH_2CF_3$ | $CH_2OMe$ | Cl | F | $CH_2CH_2CH_2CH_2CH_2SCF_3$ | O |
| A-6755 | $CH_2CF_3$ | $CH_2OMe$ | Cl | F | $CH_2CH_2CH_2CH_2CH_2CH_2SCF_3$ | O |
| A-6756 | $CH_2CF_3$ | $CH_2OMe$ | Cl | F | $CH_2CH_2CH_2CH_2CH_2CH_2CH_2SCF_3$ | O |
| A-6757 | $CH_2CF_3$ | $CH_2OMe$ | Cl | F | $CH_2CH_2NHS(=O)_2CF_3$ | O |
| A-6758 | $CH_2CF_3$ | $CH_2OMe$ | Cl | F | $CH_2CH_2CH_2NHS(=O)_2CF_3$ | O |
| A-6759 | $CH_2CF_3$ | $CH_2OMe$ | Cl | F | $CH_2CH_2N(Me)S(=O)_2CF_3$ | O |
| A-6760 | $CH_2CF_3$ | $CH_2OMe$ | Cl | F | $CH_2CH_2N(Et)S(=O)_2CF_3$ | O |
| A-6761 | $CH_2CF_3$ | $CH_2OMe$ | Cl | F | $CH_2CH_2N(CH_2CN)S(=O)_2CF_3$ | O |
| A-6762 | $CH_2CF_3$ | $CH_2OMe$ | Cl | F | $CH_2CH_2N(CH_2OMe)S(=O)_2CF_3$ | O |
| A-6763 | $CH_2CF_3$ | $CH_2OMe$ | Cl | F | $CH_2CH_2CH_2N(Me)S(=O)_2CF_3$ | O |
| A-6764 | $CH_2CF_3$ | $CH_2OMe$ | Cl | F | $CH_2CH_2CH_2N(Et)S(=O)_2CF_3$ | O |
| A-6765 | $CH_2CF_3$ | $CH_2OMe$ | Cl | F | $CH_2CH_2CH_2N(CH_2CN)S(=O)_2CF_3$ | O |
| A-6766 | $CH_2CF_3$ | $CH_2OMe$ | Cl | F | $CH_2CH_2CH_2N(CH_2OMe)S(=O)_2CF_3$ | O |
| A-6767 | $CH_2CF_3$ | $CH_2OMe$ | Me | F | $CH_2CH_2CH_2SCF_3$ | O |
| A-6768 | $CH_2CF_3$ | $CH_2OMe$ | Me | F | $CH_2CH_2CH_2CH_2SCF_3$ | O |
| A-6769 | $CH_2CF_3$ | $CH_2OMe$ | Me | F | $CH_2CH_2CH_2CH_2CH_2SCF_3$ | O |
| A-6770 | $CH_2CF_3$ | $CH_2OMe$ | Me | F | $CH_2CH_2CH_2CH_2CH_2CH_2SCF_3$ | O |

TABLE 155

| Compound Number | $R^1$ | $R^2$ | $R^3$ | $R^4$ | $R^5$ | A |
|---|---|---|---|---|---|---|
| A-6771 | $CH_2CF_3$ | $CH_2OMe$ | Me | F | $CH_2CH_2CH_2CH_2CH_2CH_2CH_2SCF_3$ | O |
| A-6772 | $CH_2CF_3$ | $CH_2OMe$ | Me | F | $CH_2CH_2NHS(=O)_2CF_3$ | O |
| A-6773 | $CH_2CF_3$ | $CH_2OMe$ | Me | F | $CH_2CH_2CH_2NHS(=O)_2CF_3$ | O |
| A-6774 | $CH_2CF_3$ | $CH_2OMe$ | Me | F | $CH_2CH_2N(Me)S(=O)_2CF_3$ | O |
| A-6775 | $CH_2CF_3$ | $CH_2OMe$ | Me | F | $CH_2CH_2N(Et)S(=O)_2CF_3$ | O |
| A-6776 | $CH_2CF_3$ | $CH_2OMe$ | Me | F | $CH_2CH_2N(CH_2CN)S(=O)_2CF_3$ | O |
| A-6777 | $CH_2CF_3$ | $CH_2OMe$ | Me | F | $CH_2CH_2N(CH_2OMe)S(=O)_2CF_3$ | O |
| A-6778 | $CH_2CF_3$ | $CH_2OMe$ | Me | F | $CH_2CH_2CH_2N(Me)S(=O)_2CF_3$ | O |
| A-6779 | $CH_2CF_3$ | $CH_2OMe$ | Me | F | $CH_2CH_2CH_2N(Et)S(=O)_2CF_3$ | O |
| A-6780 | $CH_2CF_3$ | $CH_2OMe$ | Me | F | $CH_2CH_2CH_2N(CH_2CN)S(=O)_2CF_3$ | O |
| A-6781 | $CH_2CF_3$ | $CH_2OMe$ | Me | F | $CH_2CH_2CH_2N(CH_2OMe)S(=O)_2CF_3$ | O |
| A-6782 | $CH_2CF_3$ | $CH_2CH_2OMe$ | Cl | F | $CH_2CH_2CH_2SCF_3$ | O |
| A-6783 | $CH_2CF_3$ | $CH_2CH_2OMe$ | Cl | F | $CH_2CH_2CH_2CH_2SCF_3$ | O |
| A-6784 | $CH_2CF_3$ | $CH_2CH_2OMe$ | Cl | F | $CH_2CH_2CH_2CH_2CH_2SCF_3$ | O |
| A-6785 | $CH_2CF_3$ | $CH_2CH_2OMe$ | Cl | F | $CH_2CH_2CH_2CH_2CH_2CH_2SCF_3$ | O |
| A-6786 | $CH_2CF_3$ | $CH_2CH_2OMe$ | Cl | F | $CH_2CH_2CH_2CH_2CH_2CH_2CH_2SCF_3$ | O |
| A-6787 | $CH_2CF_3$ | $CH_2CH_2OMe$ | Cl | F | $CH_2CH_2NHS(=O)_2CF_3$ | O |
| A-6788 | $CH_2CF_3$ | $CH_2CH_2OMe$ | Cl | F | $CH_2CH_2CH_2NHS(=O)_2CF_3$ | O |
| A-6789 | $CH_2CF_3$ | $CH_2CH_2OMe$ | Cl | F | $CH_2CH_2N(Me)S(=O)_2CF_3$ | O |
| A-6790 | $CH_2CF_3$ | $CH_2CH_2OMe$ | Cl | F | $CH_2CH_2N(Et)S(=O)_2CF_3$ | O |
| A-6791 | $CH_2CF_3$ | $CH_2CH_2OMe$ | Cl | F | $CH_2CH_2N(CH_2CN)S(=O)_2CF_3$ | O |
| A-6792 | $CH_2CF_3$ | $CH_2CH_2OMe$ | Cl | F | $CH_2CH_2N(CH_2OMe)S(=O)_2CF_3$ | O |
| A-6793 | $CH_2CF_3$ | $CH_2CH_2OMe$ | Cl | F | $CH_2CH_2CH_2N(Me)S(=O)_2CF_3$ | O |
| A-6794 | $CH_2CF_3$ | $CH_2CH_2OMe$ | Cl | F | $CH_2CH_2CH_2N(Et)S(=O)_2CF_3$ | O |
| A-6795 | $CH_2CF_3$ | $CH_2CH_2OMe$ | Cl | F | $CH_2CH_2CH_2N(CH_2CN)S(=O)_2CF_3$ | O |
| A-6796 | $CH_2CF_3$ | $CH_2CH_2OMe$ | Cl | F | $CH_2CH_2CH_2N(CH_2OMe)S(=O)_2CF_3$ | O |
| A-6797 | $CH_2CF_3$ | $CH_2CH_2OMe$ | Me | F | $CH_2CH_2CH_2SCF_3$ | O |
| A-6798 | $CH_2CF_3$ | $CH_2CH_2OMe$ | Me | F | $CH_2CH_2CH_2CH_2SCF_3$ | O |
| A-6799 | $CH_2CF_3$ | $CH_2CH_2OMe$ | Me | F | $CH_2CH_2CH_2CH_2CH_2SCF_3$ | O |
| A-6800 | $CH_2CF_3$ | $CH_2CH_2OMe$ | Me | F | $CH_2CH_2CH_2CH_2CH_2CH_2SCF_3$ | O |
| A-6801 | $CH_2CF_3$ | $CH_2CH_2OMe$ | Me | F | $CH_2CH_2CH_2CH_2CH_2CH_2CH_2SCF_3$ | O |
| A-6802 | $CH_2CF_3$ | $CH_2CH_2OMe$ | Me | F | $CH_2CH_2NHS(=O)_2CF_3$ | O |
| A-6803 | $CH_2CF_3$ | $CH_2CH_2OMe$ | Me | F | $CH_2CH_2CH_2NHS(=O)_2CF_3$ | O |
| A-6804 | $CH_2CF_3$ | $CH_2CH_2OMe$ | Me | F | $CH_2CH_2N(Me)S(=O)_2CF_3$ | O |
| A-6805 | $CH_2CF_3$ | $CH_2CH_2OMe$ | Me | F | $CH_2CH_2N(Et)S(=O)_2CF_3$ | O |
| A-6806 | $CH_2CF_3$ | $CH_2CH_2OMe$ | Me | F | $CH_2CH_2N(CH_2CN)S(=O)_2CF_3$ | O |
| A-6807 | $CH_2CF_3$ | $CH_2CH_2OMe$ | Me | F | $CH_2CH_2N(CH_2OMe)S(=O)_2CF_3$ | O |
| A-6808 | $CH_2CF_3$ | $CH_2CH_2OMe$ | Me | F | $CH_2CH_2CH_2N(Me)S(=O)_2CF_3$ | O |
| A-6809 | $CH_2CF_3$ | $CH_2CH_2OMe$ | Me | F | $CH_2CH_2CH_2N(Et)S(=O)_2CF_3$ | O |
| A-6810 | $CH_2CF_3$ | $CH_2CH_2OMe$ | Me | F | $CH_2CH_2CH_2N(CH_2CN)S(=O)_2CF_3$ | O |
| A-6811 | $CH_2CF_3$ | $CH_2CH_2OMe$ | Me | F | $CH_2CH_2CH_2N(CH_2OMe)S(=O)_2CF_3$ | O |

TABLE 155-continued

| Compound Number | $R^1$ | $R^2$ | $R^3$ | $R^4$ | $R^5$ | A |
|---|---|---|---|---|---|---|
| A-6812 | $CH_2CF_3$ | C(=O)Me | Cl | F | $CH_2CH_2CH_2SCF_3$ | O |
| A-6813 | $CH_2CF_3$ | C(=O)Me | Cl | F | $CH_2CH_2CH_2CH_2SCF_3$ | O |
| A-6814 | $CH_2CF_3$ | C(=O)Me | Cl | F | $CH_2CH_2CH_2CH_2CH_2SCF_3$ | O |

TABLE 156

| Compound Number | $R^1$ | $R^2$ | $R^3$ | $R^4$ | $R^5$ | A |
|---|---|---|---|---|---|---|
| A-6815 | $CH_2CF_3$ | C(=O)Me | Cl | F | $CH_2CH_2CH_2CH_2CH_2CH_2SCF_3$ | O |
| A-6816 | $CH_2CF_3$ | C(=O)Me | Cl | F | $CH_2CH_2CH_2CH_2CH_2CH_2CH_2SCF_3$ | O |
| A-6817 | $CH_2CF_3$ | C(=O)Me | Cl | F | $CH_2CH_2NHS(=O)_2CF_3$ | O |
| A-6818 | $CH_2CF_3$ | C(=O)Me | Cl | F | $CH_2CH_2CH_2NHS(=O)_2CF_3$ | O |
| A-6819 | $CH_2CF_3$ | C(=O)Me | Cl | F | $CH_2CH_2N(Me)S(=O)_2CF_3$ | O |
| A-6820 | $CH_2CF_3$ | C(=O)Me | Cl | F | $CH_2CH_2N(Et)S(=O)_2CF_3$ | O |
| A-6821 | $CH_2CF_3$ | C(=O)Me | Cl | F | $CH_2CH_2N(CH_2CN)S(=O)_2CF_3$ | O |
| A-6822 | $CH_2CF_3$ | C(=O)Me | Cl | F | $CH_2CH_2N(CH_2OMe)S(=O)_2CF_3$ | O |
| A-6823 | $CH_2CF_3$ | C(=O)Me | Cl | F | $CH_2CH_2CH_2N(Me)S(=O)_2CF_3$ | O |
| A-6824 | $CH_2CF_3$ | C(=O)Me | Cl | F | $CH_2CH_2CH_2N(Et)S(=O)_2CF_3$ | O |
| A-6825 | $CH_2CF_3$ | C(=O)Me | Cl | F | $CH_2CH_2CH_2N(CH_2CN)S(=O)_2CF_3$ | O |
| A-6826 | $CH_2CF_3$ | C(=O)Me | Cl | F | $CH_2CH_2CH_2N(CH_2OMe)S(=O)_2CF_3$ | O |
| A-6827 | $CH_2CF_3$ | C(=O)Me | Me | F | $CH_2CH_2CH_2SCF_3$ | O |
| A-6828 | $CH_2CF_3$ | C(=O)Me | Me | F | $CH_2CH_2CH_2CH_2SCF_3$ | O |
| A-6829 | $CH_2CF_3$ | C(=O)Me | Me | F | $CH_2CH_2CH_2CH_2CH_2SCF_3$ | O |
| A-6830 | $CH_2CF_3$ | C(=O)Me | Me | F | $CH_2CH_2CH_2CH_2CH_2CH_2SCF_3$ | O |
| A-6831 | $CH_2CF_3$ | C(=O)Me | Me | F | $CH_2CH_2CH_2CH_2CH_2CH_2CH_2SCF_3$ | O |
| A-6832 | $CH_2CF_3$ | C(=O)Me | Me | F | $CH_2CH_2NHS(=O)_2CF_3$ | O |
| A-6833 | $CH_2CF_3$ | C(=O)Me | Me | F | $CH_2CH_2CH_2NHS(=O)_2CF_3$ | O |
| A-6834 | $CH_2CF_3$ | C(=O)Me | Me | F | $CH_2CH_2N(Me)S(=O)_2CF_3$ | O |
| A-6835 | $CH_2CF_3$ | C(=O)Me | Me | F | $CH_2CH_2N(Et)S(=O)_2CF_3$ | O |
| A-6836 | $CH_2CF_3$ | C(=O)Me | Me | F | $CH_2CH_2N(CH_2CN)S(=O)_2CF_3$ | O |
| A-6837 | $CH_2CF_3$ | C(=O)Me | Me | F | $CH_2CH_2N(CH_2OMe)S(=O)_2CF_3$ | O |
| A-6838 | $CH_2CF_3$ | C(=O)Me | Me | F | $CH_2CH_2CH_2N(Me)S(=O)_2CF_3$ | O |
| A-6839 | $CH_2CF_3$ | C(=O)Me | Me | F | $CH_2CH_2CH_2N(Et)S(=O)_2CF_3$ | O |
| A-6840 | $CH_2CF_3$ | C(=O)Me | Me | F | $CH_2CH_2CH_2N(CH_2CN)S(=O)_2CF_3$ | O |
| A-6841 | $CH_2CF_3$ | C(=O)Me | Me | F | $CH_2CH_2CH_2N(CH_2OMe)S(=O)_2CF_3$ | O |
| A-6842 | $CH_2CF_3$ | C(=O)(i-Pr) | Cl | F | $CH_2CH_2CH_2SCF_3$ | O |
| A-6843 | $CH_2CF_3$ | C(=O)(i-Pr) | Cl | F | $CH_2CH_2CH_2CH_2SCF_3$ | O |
| A-6844 | $CH_2CF_3$ | C(=O)(i-Pr) | Cl | F | $CH_2CH_2CH_2CH_2CH_2SCF_3$ | O |
| A-6845 | $CH_2CF_3$ | C(=O)(i-Pr) | Cl | F | $CH_2CH_2CH_2CH_2CH_2CH_2SCF_3$ | O |
| A-6846 | $CH_2CF_3$ | C(=O)(i-Pr) | Cl | F | $CH_2CH_2CH_2CH_2CH_2CH_2CH_2SCF_3$ | O |
| A-6847 | $CH_2CF_3$ | C(=O)(i-Pr) | Cl | F | $CH_2CH_2NHS(=O)_2CF_3$ | O |
| A-6848 | $CH_2CF_3$ | C(=O)(i-Pr) | Cl | F | $CH_2CH_2CH_2NHS(=O)_2CF_3$ | O |
| A-6849 | $CH_2CF_3$ | C(=O)(i-Pr) | Cl | F | $CH_2CH_2N(Me)S(=O)_2CF_3$ | O |
| A-6850 | $CH_2CF_3$ | C(=O)(i-Pr) | Cl | F | $CH_2CH_2N(Et)S(=O)_2CF_3$ | O |
| A-6851 | $CH_2CF_3$ | C(=O)(i-Pr) | Cl | F | $CH_2CH_2N(CH_2CN)S(=O)_2CF_3$ | O |
| A-6852 | $CH_2CF_3$ | C(=O)(i-Pr) | Cl | F | $CH_2CH_2N(CH_2OMe)S(=O)_2CF_3$ | O |
| A-6853 | $CH_2CF_3$ | C(=O)(i-Pr) | Cl | F | $CH_2CH_2CH_2N(Me)S(=O)_2CF_3$ | O |
| A-6854 | $CH_2CF_3$ | C(=O)(i-Pr) | Cl | F | $CH_2CH_2CH_2N(Et)S(=O)_2CF_3$ | O |
| A-6855 | $CH_2CF_3$ | C(=O)(i-Pr) | Cl | F | $CH_2CH_2CH_2N(CH_2CN)S(=O)_2CF_3$ | O |
| A-6856 | $CH_2CF_3$ | C(=O)(i-Pr) | Cl | F | $CH_2CH_2CH_2N(CH_2OMe)S(=O)_2CF_3$ | O |
| A-6857 | $CH_2CF_3$ | C(=O)(i-Pr) | Me | F | $CH_2CH_2CH_2SCF_3$ | O |
| A-6858 | $CH_2CF_3$ | C(=O)(i-Pr) | Me | F | $CH_2CH_2CH_2CH_2SCF_3$ | O |

TABLE 157

| Compound Number | $R^1$ | $R^2$ | $R^3$ | $R^4$ | $R^5$ | A |
|---|---|---|---|---|---|---|
| A-6859 | $CH_2CF_3$ | C(=O)(i-Pr) | Me | F | $CH_2CH_2CH_2CH_2CH_2SCF_3$ | O |
| A-6860 | $CH_2CF_3$ | C(=O)(i-Pr) | Me | F | $CH_2CH_2CH_2CH_2CH_2CH_2SCF_3$ | O |
| A-6861 | $CH_2CF_3$ | C(=O)(i-Pr) | Me | F | $CH_2CH_2CH_2CH_2CH_2CH_2CH_2SCF_3$ | O |
| A-6862 | $CH_2CF_3$ | C(=O)(i-Pr) | Me | F | $CH_2CH_2NHS(=O)_2CF_3$ | O |
| A-6863 | $CH_2CF_3$ | C(=O)(i-Pr) | Me | F | $CH_2CH_2CH_2NHS(=O)_2CF_3$ | O |
| A-6864 | $CH_2CF_3$ | C(=O)(i-Pr) | Me | F | $CH_2CH_2N(Me)S(=O)_2CF_3$ | O |
| A-6865 | $CH_2CF_3$ | C(=O)(i-Pr) | Me | F | $CH_2CH_2N(Et)S(=O)_2CF_3$ | O |
| A-6866 | $CH_2CF_3$ | C(=O)(i-Pr) | Me | F | $CH_2CH_2N(CH_2CN)S(=O)_2CF_3$ | O |
| A-6867 | $CH_2CF_3$ | C(=O)(i-Pr) | Me | F | $CH_2CH_2N(CH_2OMe)S(=O)_2CF_3$ | O |

TABLE 157-continued

| Compound Number | $R^1$ | $R^2$ | $R^3$ | $R^4$ | $R^5$ | A |
|---|---|---|---|---|---|---|
| A-6868 | $CH_2CF_3$ | C(=O)(i-Pr) | Me | F | $CH_2CH_2CH_2N(Me)S(=O)_2CF_3$ | O |
| A-6869 | $CH_2CF_3$ | C(=O)(i-Pr) | Me | F | $CH_2CH_2CH_2N(Et)S(=O)_2CF_3$ | O |
| A-6870 | $CH_2CF_3$ | C(=O)(i-Pr) | Me | F | $CH_2CH_2CH_2N(CH_2CN)S(=O)_2CF_3$ | O |
| A-6871 | $CH_2CF_3$ | C(=O)(i-Pr) | Me | F | $CH_2CH_2CH_2N(CH_2OMe)S(=O)_2CF_3$ | O |
| A-6872 | $CH_2CF_3$ | C(=O)(t-Bu) | Cl | F | $CH_2CH_2CH_2SCF_3$ | O |
| A-6873 | $CH_2CF_3$ | C(=O)(t-Bu) | Cl | F | $CH_2CH_2CH_2CH_2SCF_3$ | O |
| A-6874 | $CH_2CF_3$ | C(=O)(t-Bu) | Cl | F | $CH_2CH_2CH_2CH_2CH_2SCF_3$ | O |
| A-6875 | $CH_2CF_3$ | C(=O)(t-Bu) | Cl | F | $CH_2CH_2CH_2CH_2CH_2CH_2SCF_3$ | O |
| A-6876 | $CH_2CF_3$ | C(=O)(t-Bu) | Cl | F | $CH_2CH_2CH_2CH_2CH_2CH_2CH_2SCF_3$ | O |
| A-6877 | $CH_2CF_3$ | C(=O)(t-Bu) | Cl | F | $CH_2CH_2NHS(=O)_2CF_3$ | O |
| A-6878 | $CH_2CF_3$ | C(=O)(t-Bu) | Cl | F | $CH_2CH_2CH_2NHS(=O)_2CF_3$ | O |
| A-6879 | $CH_2CF_3$ | C(=O)(t-Bu) | Cl | F | $CH_2CH_2N(Me)S(=O)_2CF_3$ | O |
| A-6880 | $CH_2CF_3$ | C(=O)(t-Bu) | Cl | F | $CH_2CH_2N(Et)S(=O)_2CF_3$ | O |
| A-6881 | $CH_2CF_3$ | C(=O)(t-Bu) | Cl | F | $CH_2CH_2N(CH_2CN)S(=O)_2CF_3$ | O |
| A-6882 | $CH_2CF_3$ | C(=O)(t-Bu) | Cl | F | $CH_2CH_2N(CH_2OMe)S(=O)_2CF_3$ | O |
| A-6883 | $CH_2CF_3$ | C(=O)(t-Bu) | Cl | F | $CH_2CH_2CH_2N(Me)S(=O)_2CF_3$ | O |
| A-6884 | $CH_2CF_3$ | C(=O)(t-Bu) | Cl | F | $CH_2CH_2CH_2N(Et)S(=O)_2CF_3$ | O |
| A-6885 | $CH_2CF_3$ | C(=O)(t-Bu) | Cl | F | $CH_2CH_2CH_2N(CH_2CN)S(=O)_2CF_3$ | O |
| A-6886 | $CH_2CF_3$ | C(=O)(t-Bu) | Cl | F | $CH_2CH_2CH_2N(CH_2OMe)S(=O)_2CF_3$ | O |
| A-6887 | $CH_2CF_3$ | C(=O)(t-Bu) | Me | F | $CH_2CH_2CH_2SCF_3$ | O |
| A-6888 | $CH_2CF_3$ | C(=O)(t-Bu) | Me | F | $CH_2CH_2CH_2CH_2SCF_3$ | O |
| A-6889 | $CH_2CF_3$ | C(=O)(t-Bu) | Me | F | $CH_2CH_2CH_2CH_2CH_2SCF_3$ | O |
| A-6890 | $CH_2CF_3$ | C(=O)(t-Bu) | Me | F | $CH_2CH_2CH_2CH_2CH_2CH_2SCF_3$ | O |
| A-6891 | $CH_2CF_3$ | C(=O)(t-Bu) | Me | F | $CH_2CH_2CH_2CH_2CH_2CH_2CH_2SCF_3$ | O |
| A-6892 | $CH_2CF_3$ | C(=O)(t-Bu) | Me | F | $CH_2CH_2NHS(=O)_2CF_3$ | O |
| A-6893 | $CH_2CF_3$ | C(=O)(t-Bu) | Me | F | $CH_2CH_2CH_2NHS(=O)_2CF_3$ | O |
| A-6894 | $CH_2CF_3$ | C(=O)(t-Bu) | Me | F | $CH_2CH_2N(Me)S(=O)_2CF_3$ | O |
| A-6895 | $CH_2CF_3$ | C(=O)(t-Bu) | Me | F | $CH_2CH_2N(Et)S(=O)_2CF_3$ | O |
| A-6896 | $CH_2CF_3$ | C(=O)(t-Bu) | Me | F | $CH_2CH_2N(CH_2CN)S(=O)_2CF_3$ | O |
| A-6897 | $CH_2CF_3$ | C(=O)(t-Bu) | Me | F | $CH_2CH_2N(CH_2OMe)S(=O)_2CF_3$ | O |
| A-6898 | $CH_2CF_3$ | C(=O)(t-Bu) | Me | F | $CH_2CH_2CH_2N(Me)S(=O)_2CF_3$ | O |
| A-6899 | $CH_2CF_3$ | C(=O)(t-Bu) | Me | F | $CH_2CH_2CH_2N(Et)S(=O)_2CF_3$ | O |
| A-6900 | $CH_2CF_3$ | C(=O)(t-Bu) | Me | F | $CH_2CH_2CH_2N(CH_2CN)S(=O)_2CF_3$ | O |
| A-6901 | $CH_2CF_3$ | C(=O)(t-Bu) | Me | F | $CH_2CH_2CH_2N(CH_2OMe)S(=O)_2CF_3$ | O |
| A-6902 | $CH_2CF_3$ | C(=O)Ph | Cl | F | $CH_2CH_2CH_2SCF_3$ | O |

TABLE 158

| Compound Number | $R^1$ | $R^2$ | $R^3$ | $R^4$ | $R^5$ | A |
|---|---|---|---|---|---|---|
| A-6903 | $CH_2CF_3$ | C(=O)Ph | Cl | F | $CH_2CH_2CH_2CH_2SCF_3$ | O |
| A-6904 | $CH_2CF_3$ | C(=O)Ph | Cl | F | $CH_2CH_2CH_2CH_2CH_2SCF_3$ | O |
| A-6905 | $CH_2CF_3$ | C(=O)Ph | Cl | F | $CH_2CH_2CH_2CH_2CH_2CH_2SCF_3$ | O |
| A-6906 | $CH_2CF_3$ | C(=O)Ph | Cl | F | $CH_2CH_2CH_2CH_2CH_2CH_2CH_2SCF_3$ | O |
| A-6907 | $CH_2CF_3$ | C(=O)Ph | Cl | F | $CH_2CH_2NHS(=O)_2CF_3$ | O |
| A-6908 | $CH_2CF_3$ | C(=O)Ph | Cl | F | $CH_2CH_2CH_2NHS(=O)_2CF_3$ | O |
| A-6909 | $CH_2CF_3$ | C(=O)Ph | Cl | F | $CH_2CH_2N(Me)S(=O)_2CF_3$ | O |
| A-6910 | $CH_2CF_3$ | C(=O)Ph | Cl | F | $CH_2CH_2N(Et)S(=O)_2CF_3$ | O |
| A-6911 | $CH_2CF_3$ | C(=O)Ph | Cl | F | $CH_2CH_2N(CH_2CN)S(=O)_2CF_3$ | O |
| A-6912 | $CH_2CF_3$ | C(=O)Ph | Cl | F | $CH_2CH_2N(CH_2OMe)S(=O)_2CF_3$ | O |
| A-6913 | $CH_2CF_3$ | C(=O)Ph | Cl | F | $CH_2CH_2CH_2N(Me)S(=O)_2CF_3$ | O |
| A-6914 | $CH_2CF_3$ | C(=O)Ph | Cl | F | $CH_2CH_2CH_2N(Et)S(=O)_2CF_3$ | O |
| A-6915 | $CH_2CF_3$ | C(=O)Ph | Cl | F | $CH_2CH_2CH_2N(CH_2CN)S(=O)_2CF_3$ | O |
| A-6916 | $CH_2CF_3$ | C(=O)Ph | Cl | F | $CH_2CH_2CH_2N(CH_2OMe)S(=O)_2CF_3$ | O |
| A-6917 | $CH_2CF_3$ | C(=O)Ph | Me | F | $CH_2CH_2CH_2SCF_3$ | O |
| A-6918 | $CH_2CF_3$ | C(=O)Ph | Me | F | $CH_2CH_2CH_2CH_2SCF_3$ | O |
| A-6919 | $CH_2CF_3$ | C(=O)Ph | Me | F | $CH_2CH_2CH_2CH_2CH_2SCF_3$ | O |
| A-6920 | $CH_2CF_3$ | C(=O)Ph | Me | F | $CH_2CH_2CH_2CH_2CH_2CH_2SCF_3$ | O |
| A-6921 | $CH_2CF_3$ | C(=O)Ph | Me | F | $CH_2CH_2CH_2CH_2CH_2CH_2CH_2SCF_3$ | O |
| A-6922 | $CH_2CF_3$ | C(=O)Ph | Me | F | $CH_2CH_2NHS(=O)_2CF_3$ | O |
| A-6923 | $CH_2CF_3$ | C(=O)Ph | Me | F | $CH_2CH_2CH_2NHS(=O)_2CF_3$ | O |
| A-6924 | $CH_2CF_3$ | C(=O)Ph | Me | F | $CH_2CH_2N(Me)S(=O)_2CF_3$ | O |
| A-6925 | $CH_2CF_3$ | C(=O)Ph | Me | F | $CH_2CH_2N(Et)S(=O)_2CF_3$ | O |
| A-6926 | $CH_2CF_3$ | C(=O)Ph | Me | F | $CH_2CH_2N(CH_2CN)S(=O)_2CF_3$ | O |
| A-6927 | $CH_2CF_3$ | C(=O)Ph | Me | F | $CH_2CH_2N(CH_2OMe)S(=O)_2CF_3$ | O |
| A-6928 | $CH_2CF_3$ | C(=O)Ph | Me | F | $CH_2CH_2CH_2N(Me)S(=O)_2CF_3$ | O |
| A-6929 | $CH_2CF_3$ | C(=O)Ph | Me | F | $CH_2CH_2CH_2N(Et)S(=O)_2CF_3$ | O |
| A-6930 | $CH_2CF_3$ | C(=O)Ph | Me | F | $CH_2CH_2CH_2N(CH_2CN)S(=O)_2CF_3$ | O |
| A-6931 | $CH_2CF_3$ | C(=O)Ph | Me | F | $CH_2CH_2CH_2N(CH_2OMe)S(=O)_2CF_3$ | O |
| A-6932 | $CH_2CF_3$ | C(=O)OEt | Cl | F | $CH_2CH_2CH_2SCF_3$ | O |
| A-6933 | $CH_2CF_3$ | C(=O)OEt | Cl | F | $CH_2CH_2CH_2CH_2SCF_3$ | O |
| A-6934 | $CH_2CF_3$ | C(=O)OEt | Cl | F | $CH_2CH_2CH_2CH_2CH_2SCF_3$ | O |

TABLE 158-continued

| Compound Number | $R^1$ | $R^2$ | $R^3$ | $R^4$ | $R^5$ | A |
|---|---|---|---|---|---|---|
| A-6935 | $CH_2CF_3$ | C(═O)OEt | Cl | F | $CH_2CH_2CH_2CH_2CH_2CH_2SCF_3$ | O |
| A-6936 | $CH_2CF_3$ | C(═O)OEt | Cl | F | $CH_2CH_2CH_2CH_2CH_2CH_2CH_2SCF_3$ | O |
| A-6937 | $CH_2CF_3$ | C(═O)OEt | Cl | F | $CH_2CH_2NHS({=}O)_2CF_3$ | O |
| A-6938 | $CH_2CF_3$ | C(═O)OEt | Cl | F | $CH_2CH_2CH_2NHS({=}O)_2CF_3$ | O |
| A-6939 | $CH_2CF_3$ | C(═O)OEt | Cl | F | $CH_2CH_2N(Me)S({=}O)_2CF_3$ | O |
| A-6940 | $CH_2CF_3$ | C(═O)OEt | Cl | F | $CH_2CH_2N(Et)S({=}O)_2CF_3$ | O |
| A-6941 | $CH_2CF_3$ | C(═O)OEt | Cl | F | $CH_2CH_2N(CH_2CN)S({=}O)_2CF_3$ | O |
| A-6942 | $CH_2CF_3$ | C(═O)OEt | Cl | F | $CH_2CH_2N(CH_2OMe)S({=}O)_2CF_3$ | O |
| A-6943 | $CH_2CF_3$ | C(═O)OEt | Cl | F | $CH_2CH_2CH_2N(Me)S({=}O)_2CF_3$ | O |
| A-6944 | $CH_2CF_3$ | C(═O)OEt | Cl | F | $CH_2CH_2CH_2N(Et)S({=}O)_2CF_3$ | O |
| A-6945 | $CH_2CF_3$ | C(═O)OEt | Cl | F | $CH_2CH_2CH_2N(CH_2CN)S({=}O)_2CF_3$ | O |
| A-6946 | $CH_2CF_3$ | C(═O)OEt | Cl | F | $CH_2CH_2CH_2N(CH_2OMe)S({=}O)_2CF_3$ | O |

TABLE 159

| Compound Number | $R^1$ | $R^2$ | $R^3$ | $R^4$ | $R^5$ | A |
|---|---|---|---|---|---|---|
| A-6947 | $CH_2CF_3$ | C(═O)OEt | Me | F | $CH_2CH_2CH_2SCF_3$ | O |
| A-6948 | $CH_2CF_3$ | C(═O)OEt | Me | F | $CH_2CH_2CH_2CH_2SCF_3$ | O |
| A-6949 | $CH_2CF_3$ | C(═O)OEt | Me | F | $CH_2CH_2CH_2CH_2CH_2SCF_3$ | O |
| A-6950 | $CH_2CF_3$ | C(═O)OEt | Me | F | $CH_2CH_2CH_2CH_2CH_2CH_2SCF_3$ | O |
| A-6951 | $CH_2CF_3$ | C(═O)OEt | Me | F | $CH_2CH_2CH_2CH_2CH_2CH_2CH_2SCF_3$ | O |
| A-6952 | $CH_2CF_3$ | C(═O)OEt | Me | F | $CH_2CH_2NHS({=}O)_2CF_3$ | O |
| A-6953 | $CH_2CF_3$ | C(═O)OEt | Me | F | $CH_2CH_2CH_2NHS({=}O)_2CF_3$ | O |
| A-6954 | $CH_2CF_3$ | C(═O)OEt | Me | F | $CH_2CH_2N(Me)S({=}O)_2CF_3$ | O |
| A-6955 | $CH_2CF_3$ | C(═O)OEt | Me | F | $CH_2CH_2N(Et)S({=}O)_2CF_3$ | O |
| A-6956 | $CH_2CF_3$ | C(═O)OEt | Me | F | $CH_2CH_2N(CH_2CN)S({=}O)_2CF_3$ | O |
| A-6957 | $CH_2CF_3$ | C(═O)OEt | Me | F | $CH_2CH_2N(CH_2OMe)S({=}O)_2CF_3$ | O |
| A-6958 | $CH_2CF_3$ | C(═O)OEt | Me | F | $CH_2CH_2CH_2N(Me)S({=}O)_2CF_3$ | O |
| A-6959 | $CH_2CF_3$ | C(═O)OEt | Me | F | $CH_2CH_2CH_2N(Et)S({=}O)_2CF_3$ | O |
| A-6960 | $CH_2CF_3$ | C(═O)OEt | Me | F | $CH_2CH_2CH_2N(CH_2CN)S({=}O)_2CF_3$ | O |
| A-6961 | $CH_2CF_3$ | C(═O)OEt | Me | F | $CH_2CH_2CH_2N(CH_2OMe)S({=}O)_2CF_3$ | O |
| A-6962 | $CH_2CF_3$ | $S({=}O)_2Me$ | Cl | F | $CH_2CH_2CH_2SCF_3$ | O |
| A-6963 | $CH_2CF_3$ | $S({=}O)_2Me$ | Cl | F | $CH_2CH_2CH_2CH_2SCF_3$ | O |
| A-6964 | $CH_2CF_3$ | $S({=}O)_2Me$ | Cl | F | $CH_2CH_2CH_2CH_2CH_2SCF_3$ | O |
| A-6965 | $CH_2CF_3$ | $S({=}O)_2Me$ | Cl | F | $CH_2CH_2CH_2CH_2CH_2CH_2SCF_3$ | O |
| A-6966 | $CH_2CF_3$ | $S({=}O)_2Me$ | Cl | F | $CH_2CH_2CH_2CH_2CH_2CH_2CH_2SCF_3$ | O |
| A-6967 | $CH_2CF_3$ | $S({=}O)_2Me$ | Cl | F | $CH_2CH_2NHS({=}O)_2CF_3$ | O |
| A-6968 | $CH_2CF_3$ | $S({=}O)_2Me$ | Cl | F | $CH_2CH_2CH_2NHS({=}O)_2CF_3$ | O |
| A-6969 | $CH_2CF_3$ | $S({=}O)_2Me$ | Cl | F | $CH_2CH_2N(Me)S({=}O)_2CF_3$ | O |
| A-6970 | $CH_2CF_3$ | $S({=}O)_2Me$ | Cl | F | $CH_2CH_2N(Et)S({=}O)_2CF_3$ | O |
| A-6971 | $CH_2CF_3$ | $S({=}O)_2Me$ | Cl | F | $CH_2CH_2N(CH_2CN)S({=}O)_2CF_3$ | O |
| A-6972 | $CH_2CF_3$ | $S({=}O)_2Me$ | Cl | F | $CH_2CH_2N(CH_2OMe)S({=}O)_2CF_3$ | O |
| A-6973 | $CH_2CF_3$ | $S({=}O)_2Me$ | Cl | F | $CH_2CH_2CH_2N(Me)S({=}O)_2CF_3$ | O |
| A-6974 | $CH_2CF_3$ | $S({=}O)_2Me$ | Cl | F | $CH_2CH_2CH_2N(Et)S({=}O)_2CF_3$ | O |
| A-6975 | $CH_2CF_3$ | $S({=}O)_2Me$ | Cl | F | $CH_2CH_2CH_2N(CH_2CN)S({=}O)_2CF_3$ | O |
| A-6976 | $CH_2CF_3$ | $S({=}O)_2Me$ | Cl | F | $CH_2CH_2CH_2N(CH_2OMe)S({=}O)_2CF_3$ | O |
| A-6977 | $CH_2CF_3$ | $S({=}O)_2Me$ | Me | F | $CH_2CH_2CH_2SCF_3$ | O |
| A-6978 | $CH_2CF_3$ | $S({=}O)_2Me$ | Me | F | $CH_2CH_2CH_2CH_2SCF_3$ | O |
| A-6979 | $CH_2CF_3$ | $S({=}O)_2Me$ | Me | F | $CH_2CH_2CH_2CH_2CH_2SCF_3$ | O |
| A-6980 | $CH_2CF_3$ | $S({=}O)_2Me$ | Me | F | $CH_2CH_2CH_2CH_2CH_2CH_2SCF_3$ | O |
| A-6981 | $CH_2CF_3$ | $S({=}O)_2Me$ | Me | F | $CH_2CH_2CH_2CH_2CH_2CH_2CH_2SCF_3$ | O |
| A-6982 | $CH_2CF_3$ | $S({=}O)_2Me$ | Me | F | $CH_2CH_2NHS({=}O)_2CF_3$ | O |
| A-6983 | $CH_2CF_3$ | $S({=}O)_2Me$ | Me | F | $CH_2CH_2CH_2NHS({=}O)_2CF_3$ | O |
| A-6984 | $CH_2CF_3$ | $S({=}O)_2Me$ | Me | F | $CH_2CH_2N(Me)S({=}O)_2CF_3$ | O |
| A-6985 | $CH_2CF_3$ | $S({=}O)_2Me$ | Me | F | $CH_2CH_2N(Et)S({=}O)_2CF_3$ | O |
| A-6986 | $CH_2CF_3$ | $S({=}O)_2Me$ | Me | F | $CH_2CH_2N(CH_2CN)S({=}O)_2CF_3$ | O |
| A-6987 | $CH_2CF_3$ | $S({=}O)_2Me$ | Me | F | $CH_2CH_2N(CH_2OMe)S({=}O)_2CF_3$ | O |
| A-6988 | $CH_2CF_3$ | $S({=}O)_2Me$ | Me | F | $CH_2CH_2CH_2N(Me)S({=}O)_2CF_3$ | O |
| A-6989 | $CH_2CF_3$ | $S({=}O)_2Me$ | Me | F | $CH_2CH_2CH_2N(Et)S({=}O)_2CF_3$ | O |
| A-6990 | $CH_2CF_3$ | $S({=}O)_2Me$ | Me | F | $CH_2CH_2CH_2N(CH_2CN)S({=}O)_2CF_3$ | O |

TABLE 160

| Compound Number | $R^1$ | $R^2$ | $R^3$ | $R^4$ | $R^5$ | A |
|---|---|---|---|---|---|---|
| A-6991 | $CH_2CF_3$ | $S(=O)_2Me$ | Me | F | $CH_2CH_2CH_2N(CH_2OMe)S(=O)_2CF_3$ | O |
| A-6992 | $CH_2CF_3$ | $S(=O)_2CF_3$ | Cl | F | $CH_2CH_2CH_2SCF_3$ | O |
| A-6993 | $CH_2CF_3$ | $S(=O)_2CF_3$ | Cl | F | $CH_2CH_2CH_2CH_2SCF_3$ | O |
| A-6994 | $CH_2CF_3$ | $S(=O)_2CF_3$ | Cl | F | $CH_2CH_2CH_2CH_2CH_2SCF_3$ | O |
| A-6995 | $CH_2CF_3$ | $S(=O)_2CF_3$ | Cl | F | $CH_2CH_2CH_2CH_2CH_2CH_2SCF_3$ | O |
| A-6996 | $CH_2CF_3$ | $S(=O)_2CF_3$ | Cl | F | $CH_2CH_2CH_2CH_2CH_2CH_2CH_2SCF_3$ | O |
| A-6997 | $CH_2CF_3$ | $S(=O)_2CF_3$ | Cl | F | $CH_2CH_2NHS(=O)_2CF_3$ | O |
| A-6998 | $CH_2CF_3$ | $S(=O)_2CF_3$ | Cl | F | $CH_2CH_2CH_2NHS(=O)_2CF_3$ | O |
| A-6999 | $CH_2CF_3$ | $S(=O)_2CF_3$ | Cl | F | $CH_2CH_2N(Me)S(=O)_2CF_3$ | O |
| A-7000 | $CH_2CF_3$ | $S(=O)_2CF_3$ | Cl | F | $CH_2CH_2N(Et)S(=O)_2CF_3$ | O |
| A-7001 | $CH_2CF_3$ | $S(=O)_2CF_3$ | Cl | F | $CH_2CH_2N(CH_2CN)S(=O)_2CF_3$ | O |
| A-7002 | $CH_2CF_3$ | $S(=O)_2CF_3$ | Cl | F | $CH_2CH_2N(CH_2OMe)S(=O)_2CF_3$ | O |
| A-7003 | $CH_2CF_3$ | $S(=O)_2CF_3$ | Cl | F | $CH_2CH_2CH_2N(Me)S(=O)_2CF_3$ | O |
| A-7004 | $CH_2CF_3$ | $S(=O)_2CF_3$ | Cl | F | $CH_2CH_2CH_2N(Et)S(=O)_2CF_3$ | O |
| A-7005 | $CH_2CF_3$ | $S(=O)_2CF_3$ | Cl | F | $CH_2CH_2CH_2N(CH_2CN)S(=O)_2CF_3$ | O |
| A-7006 | $CH_2CF_3$ | $S(=O)_2CF_3$ | Cl | F | $CH_2CH_2CH_2N(CH_2OMe)S(=O)_2CF_3$ | O |
| A-7007 | $CH_2CF_3$ | $S(=O)_2CF_3$ | Me | F | $CH_2CH_2CH_2SCF_3$ | O |
| A-7008 | $CH_2CF_3$ | $S(=O)_2CF_3$ | Me | F | $CH_2CH_2CH_2CH_2SCF_3$ | O |
| A-7009 | $CH_2CF_3$ | $S(=O)_2CF_3$ | Me | F | $CH_2CH_2CH_2CH_2CH_2SCF_3$ | O |
| A-7010 | $CH_2CF_3$ | $S(=O)_2CF_3$ | Me | F | $CH_2CH_2CH_2CH_2CH_2CH_2SCF_3$ | O |
| A-7011 | $CH_2CF_3$ | $S(=O)_2CF_3$ | Me | F | $CH_2CH_2CH_2CH_2CH_2CH_2CH_2SCF_3$ | O |
| A-7012 | $CH_2CF_3$ | $S(=O)_2CF_3$ | Me | F | $CH_2CH_2NHS(=O)_2CF_3$ | O |
| A-7013 | $CH_2CF_3$ | $S(=O)_2CF_3$ | Me | F | $CH_2CH_2CH_2NHS(=O)_2CF_3$ | O |
| A-7014 | $CH_2CF_3$ | $S(=O)_2CF_3$ | Me | F | $CH_2CH_2N(Me)S(=O)_2CF_3$ | O |
| A-7015 | $CH_2CF_3$ | $S(=O)_2CF_3$ | Me | F | $CH_2CH_2N(Et)S(=O)_2CF_3$ | O |
| A-7016 | $CH_2CF_3$ | $S(=O)_2CF_3$ | Me | F | $CH_2CH_2N(CH_2CN)S(=O)_2CF_3$ | O |
| A-7017 | $CH_2CF_3$ | $S(=O)_2CF_3$ | Me | F | $CH_2CH_2N(CH_2OMe)S(=O)_2CF_3$ | O |
| A-7018 | $CH_2CF_3$ | $S(=O)_2CF_3$ | Me | F | $CH_2CH_2CH_2N(Me)S(=O)_2CF_3$ | O |
| A-7019 | $CH_2CF_3$ | $S(=O)_2CF_3$ | Me | F | $CH_2CH_2CH_2N(Et)S(=O)_2CF_3$ | O |
| A-7020 | $CH_2CF_3$ | $S(=O)_2CF_3$ | Me | F | $CH_2CH_2CH_2N(CH_2CN)S(=O)_2CF_3$ | O |
| A-7021 | $CH_2CF_3$ | $S(=O)_2CF_3$ | Me | F | $CH_2CH_2CH_2N(CH_2OMe)S(=O)_2CF_3$ | O |
| A-7022 | $CH_2CF_3$ | $CH_2C(=O)OEt$ | Cl | F | $CH_2CH_2CH_2SCF_3$ | O |
| A-7023 | $CH_2CF_3$ | $CH_2C(=O)OEt$ | Cl | F | $CH_2CH_2CH_2CH_2SCF_3$ | O |
| A-7024 | $CH_2CF_3$ | $CH_2C(=O)OEt$ | Cl | F | $CH_2CH_2CH_2CH_2CH_2SCF_3$ | O |
| A-7025 | $CH_2CF_3$ | $CH_2C(=O)OEt$ | Cl | F | $CH_2CH_2CH_2CH_2CH_2CH_2SCF_3$ | O |
| A-7026 | $CH_2CF_3$ | $CH_2C(=O)OEt$ | Cl | F | $CH_2CH_2CH_2CH_2CH_2CH_2CH_2SCF_3$ | O |
| A-7027 | $CH_2CF_3$ | $CH_2C(=O)OEt$ | Cl | F | $CH_2CH_2NHS(=O)_2CF_3$ | O |
| A-7028 | $CH_2CF_3$ | $CH_2C(=O)OEt$ | Cl | F | $CH_2CH_2CH_2NHS(=O)_2CF_3$ | O |
| A-7029 | $CH_2CF_3$ | $CH_2C(=O)OEt$ | Cl | F | $CH_2CH_2N(Me)S(=O)_2CF_3$ | O |
| A-7030 | $CH_2CF_3$ | $CH_2C(=O)OEt$ | Cl | F | $CH_2CH_2N(Et)S(=O)_2CF_3$ | O |
| A-7031 | $CH_2CF_3$ | $CH_2C(=O)OEt$ | Cl | F | $CH_2CH_2N(CH_2CN)S(=O)_2CF_3$ | O |
| A-7032 | $CH_2CF_3$ | $CH_2C(=O)OEt$ | Cl | F | $CH_2CH_2N(CH_2OMe)S(=O)_2CF_3$ | O |
| A-7033 | $CH_2CF_3$ | $CH_2C(=O)OEt$ | Cl | F | $CH_2CH_2CH_2N(Me)S(=O)_2CF_3$ | O |
| A-7034 | $CH_2CF_3$ | $CH_2C(=O)OEt$ | Cl | F | $CH_2CH_2CH_2N(Et)S(=O)_2CF_3$ | O |

TABLE 161

| Compound Number | $R^1$ | $R^2$ | $R^3$ | $R^4$ | $R^5$ | A |
|---|---|---|---|---|---|---|
| A-7035 | $CH_2CF_3$ | $CH_2C(=O)OEt$ | Cl | F | $CH_2CH_2CH_2N(CH_2CN)S(=O)_2CF_3$ | O |
| A-7036 | $CH_2CF_3$ | $CH_2C(=O)OEt$ | Cl | F | $CH_2CH_2CH_2N(CH_2OMe)S(=O)_2CF_3$ | O |
| A-7037 | $CH_2CF_3$ | $CH_2C(=O)OEt$ | Me | F | $CH_2CH_2CH_2SCF_3$ | O |
| A-7038 | $CH_2CF_3$ | $CH_2C(=O)OEt$ | Me | F | $CH_2CH_2CH_2CH_2SCF_3$ | O |
| A-7039 | $CH_2CF_3$ | $CH_2C(=O)OEt$ | Me | F | $CH_2CH_2CH_2CH_2CH_2SCF_3$ | O |
| A-7040 | $CH_2CF_3$ | $CH_2C(=O)OEt$ | Me | F | $CH_2CH_2CH_2CH_2CH_2CH_2SCF_3$ | O |
| A-7041 | $CH_2CF_3$ | $CH_2C(=O)OEt$ | Me | F | $CH_2CH_2CH_2CH_2CH_2CH_2CH_2SCF_3$ | O |
| A-7042 | $CH_2CF_3$ | $CH_2C(=O)OEt$ | Me | F | $CH_2CH_2NHS(=O)_2CF_3$ | O |
| A-7043 | $CH_2CF_3$ | $CH_2C(=O)OEt$ | Me | F | $CH_2CH_2CH_2NHS(=O)_2CF_3$ | O |
| A-7044 | $CH_2CF_3$ | $CH_2C(=O)OEt$ | Me | F | $CH_2CH_2N(Me)S(=O)_2CF_3$ | O |
| A-7045 | $CH_2CF_3$ | $CH_2C(=O)OEt$ | Me | F | $CH_2CH_2N(Et)S(=O)_2CF_3$ | O |
| A-7046 | $CH_2CF_3$ | $CH_2C(=O)OEt$ | Me | F | $CH_2CH_2N(CH_2CN)S(=O)_2CF_3$ | O |
| A-7047 | $CH_2CF_3$ | $CH_2C(=O)OEt$ | Me | F | $CH_2CH_2N(CH_2OMe)S(=O)_2CF_3$ | O |
| A-7048 | $CH_2CF_3$ | $CH_2C(=O)OEt$ | Me | F | $CH_2CH_2CH_2N(Me)S(=O)_2CF_3$ | O |
| A-7049 | $CH_2CF_3$ | $CH_2C(=O)OEt$ | Me | F | $CH_2CH_2CH_2N(Et)S(=O)_2CF_3$ | O |
| A-7050 | $CH_2CF_3$ | $CH_2C(=O)OEt$ | Me | F | $CH_2CH_2CH_2N(CH_2CN)S(=O)_2CF_3$ | O |
| A-7051 | $CH_2CF_3$ | $CH_2C(=O)OEt$ | Me | F | $CH_2CH_2CH_2N(CH_2OMe)S(=O)_2CF_3$ | O |
| A-7052 | $CH_2CF_3$ | $CH_2C(=O)NH_2$ | Cl | F | $CH_2CH_2CH_2SCF_3$ | O |
| A-7053 | $CH_2CF_3$ | $CH_2C(=O)NH_2$ | Cl | F | $CH_2CH_2CH_2CH_2SCF_3$ | O |
| A-7054 | $CH_2CF_3$ | $CH_2C(=O)NH_2$ | Cl | F | $CH_2CH_2CH_2CH_2CH_2SCF_3$ | O |
| A-7055 | $CH_2CF_3$ | $CH_2C(=O)NH_2$ | Cl | F | $CH_2CH_2CH_2CH_2CH_2CH_2SCF_3$ | O |
| A-7056 | $CH_2CF_3$ | $CH_2C(=O)NH_2$ | Cl | F | $CH_2CH_2CH_2CH_2CH_2CH_2CH_2SCF_3$ | O |
| A-7057 | $CH_2CF_3$ | $CH_2C(=O)NH_2$ | Cl | F | $CH_2CH_2NHS(=O)_2CF_3$ | O |

TABLE 161-continued

| Compound Number | $R^1$ | $R^2$ | $R^3$ | $R^4$ | $R^5$ | A |
|---|---|---|---|---|---|---|
| A-7058 | $CH_2CF_3$ | $CH_2C(=O)NH_2$ | Cl | F | $CH_2CH_2CH_2NHS(=O)_2CF_3$ | O |
| A-7059 | $CH_2CF_3$ | $CH_2C(=O)NH_2$ | Cl | F | $CH_2CH_2N(Me)S(=O)_2CF_3$ | O |
| A-7060 | $CH_2CF_3$ | $CH_2C(=O)NH_2$ | Cl | F | $CH_2CH_2N(Et)S(=O)_2CF_3$ | O |
| A-7061 | $CH_2CF_3$ | $CH_2C(=O)NH_2$ | Cl | F | $CH_2CH_2N(CH_2CN)S(=O)_2CF_3$ | O |
| A-7062 | $CH_2CF_3$ | $CH_2C(=O)NH_2$ | Cl | F | $CH_2CH_2N(CH_2OMe)S(=O)_2CF_3$ | O |
| A-7063 | $CH_2CF_3$ | $CH_2C(=O)NH_2$ | Cl | F | $CH_2CH_2CH_2N(Me)S(=O)_2CF_3$ | O |
| A-7064 | $CH_2CF_3$ | $CH_2C(=O)NH_2$ | Cl | F | $CH_2CH_2CH_2N(Et)S(=O)_2CF_3$ | O |
| A-7065 | $CH_2CF_3$ | $CH_2C(=O)NH_2$ | Cl | F | $CH_2CH_2CH_2N(CH_2CN)S(=O)_2CF_3$ | O |
| A-7066 | $CH_2CF_3$ | $CH_2C(=O)NH_2$ | Cl | F | $CH_2CH_2CH_2N(CH_2OMe)S(=O)_2CF_3$ | O |
| A-7067 | $CH_2CF_3$ | $CH_2C(=O)NH_2$ | Me | F | $CH_2CH_2CH_2SCF_3$ | O |
| A-7068 | $CH_2CF_3$ | $CH_2C(=O)NH_2$ | Me | F | $CH_2CH_2CH_2CH_2SCF_3$ | O |
| A-7069 | $CH_2CF_3$ | $CH_2C(=O)NH_2$ | Me | F | $CH_2CH_2CH_2CH_2CH_2SCF_3$ | O |
| A-7070 | $CH_2CF_3$ | $CH_2C(=O)NH_2$ | Me | F | $CH_2CH_2CH_2CH_2CH_2CH_2SCF_3$ | O |
| A-7071 | $CH_2CF_3$ | $CH_2C(=O)NH_2$ | Me | F | $CH_2CH_2CH_2CH_2CH_2CH_2CH_2SCF_3$ | O |
| A-7072 | $CH_2CF_3$ | $CH_2C(=O)NH_2$ | Me | F | $CH_2CH_2NHS(=O)_2CF_3$ | O |
| A-7073 | $CH_2CF_3$ | $CH_2C(=O)NH_2$ | Me | F | $CH_2CH_2CH_2NHS(=O)_2CF_3$ | O |
| A-7074 | $CH_2CF_3$ | $CH_2C(=O)NH_2$ | Me | F | $CH_2CH_2N(Me)S(=O)_2CF_3$ | O |
| A-7075 | $CH_2CF_3$ | $CH_2C(=O)NH_2$ | Me | F | $CH_2CH_2N(Et)S(=O)_2CF_3$ | O |
| A-7076 | $CH_2CF_3$ | $CH_2C(=O)NH_2$ | Me | F | $CH_2CH_2N(CH_2CN)S(=O)_2CF_3$ | O |
| A-7077 | $CH_2CF_3$ | $CH_2C(=O)NH_2$ | Me | F | $CH_2CH_2N(CH_2OMe)S(=O)_2CF_3$ | O |
| A-7078 | $CH_2CF_3$ | $CH_2C(=O)NH_2$ | Me | F | $CH_2CH_2CH_2N(Me)S(=O)_2CF_3$ | O |

TABLE 162

| Compound Number | $R^1$ | $R^2$ | $R^3$ | $R^4$ | $R^5$ | A |
|---|---|---|---|---|---|---|
| A-7079 | $CH_2CF_3$ | $CH_2C(=O)NH_2$ | Me | F | $CH_2CH_2CH_2N(Et)S(=O)_2CF_3$ | O |
| A-7080 | $CH_2CF_3$ | $CH_2C(=O)NH_2$ | Me | F | $CH_2CH_2CH_2N(CH_2CN)S(=O)_2CF_3$ | O |
| A-7081 | $CH_2CF_3$ | $CH_2C(=O)NH_2$ | Me | F | $CH_2CH_2CH_2N(CH_2OMe)S(=O)_2CF_3$ | O |
| A-7082 | $CH_2CF_3$ | $CH_2C(=O)NMe_2$ | Cl | F | $CH_2CH_2CH_2SCF_3$ | O |
| A-7083 | $CH_2CF_3$ | $CH_2C(=O)NMe_2$ | Cl | F | $CH_2CH_2CH_2CH_2SCF_3$ | O |
| A-7084 | $CH_2CF_3$ | $CH_2C(=O)NMe_2$ | Cl | F | $CH_2CH_2CH_2CH_2CH_2SCF_3$ | O |
| A-7085 | $CH_2CF_3$ | $CH_2C(=O)NMe_2$ | Cl | F | $CH_2CH_2CH_2CH_2CH_2CH_2SCF_3$ | O |
| A-7086 | $CH_2CF_3$ | $CH_2C(=O)NMe_2$ | Cl | F | $CH_2CH_2CH_2CH_2CH_2CH_2CH_2SCF_3$ | O |
| A-7087 | $CH_2CF_3$ | $CH_2C(=O)NMe_2$ | Cl | F | $CH_2CH_2NHS(=O)_2CF_3$ | O |
| A-7088 | $CH_2CF_3$ | $CH_2C(=O)NMe_2$ | Cl | F | $CH_2CH_2CH_2NHS(=O)_2CF_3$ | O |
| A-7089 | $CH_2CF_3$ | $CH_2C(=O)NMe_2$ | Cl | F | $CH_2CH_2N(Me)S(=O)_2CF_3$ | O |
| A-7090 | $CH_2CF_3$ | $CH_2C(=O)NMe_2$ | Cl | F | $CH_2CH_2N(Et)S(=O)_2CF_3$ | O |
| A-7091 | $CH_2CF_3$ | $CH_2C(=O)NMe_2$ | Cl | F | $CH_2CH_2N(CH_2CN)S(=O)_2CF_3$ | O |
| A-7092 | $CH_2CF_3$ | $CH_2C(=O)NMe_2$ | Cl | F | $CH_2CH_2N(CH_2OMe)S(=O)_2CF_3$ | O |
| A-7093 | $CH_2CF_3$ | $CH_2C(=O)NMe_2$ | Cl | F | $CH_2CH_2CH_2N(Me)S(=O)_2CF_3$ | O |
| A-7094 | $CH_2CF_3$ | $CH_2C(=O)NMe_2$ | Cl | F | $CH_2CH_2CH_2N(Et)S(=O)_2CF_3$ | O |
| A-7095 | $CH_2CF_3$ | $CH_2C(=O)NMe_2$ | Cl | F | $CH_2CH_2CH_2N(CH_2CN)S(=O)_2CF_3$ | O |
| A-7096 | $CH_2CF_3$ | $CH_2C(=O)NMe_2$ | Cl | F | $CH_2CH_2CH_2N(CH_2OMe)S(=O)_2CF_3$ | O |
| A-7097 | $CH_2CF_3$ | $CH_2C(=O)NMe_2$ | Me | F | $CH_2CH_2CH_2SCF_3$ | O |
| A-7098 | $CH_2CF_3$ | $CH_2C(=O)NMe_2$ | Me | F | $CH_2CH_2CH_2CH_2SCF_3$ | O |
| A-7099 | $CH_2CF_3$ | $CH_2C(=O)NMe_2$ | Me | F | $CH_2CH_2CH_2CH_2CH_2SCF_3$ | O |
| A-7100 | $CH_2CF_3$ | $CH_2C(=O)NMe_2$ | Me | F | $CH_2CH_2CH_2CH_2CH_2CH_2SCF_3$ | O |
| A-7101 | $CH_2CF_3$ | $CH_2C(=O)NMe_2$ | Me | F | $CH_2CH_2CH_2CH_2CH_2CH_2CH_2SCF_3$ | O |
| A-7102 | $CH_2CF_3$ | $CH_2C(=O)NMe_2$ | Me | F | $CH_2CH_2NHS(=O)_2CF_3$ | O |
| A-7103 | $CH_2CF_3$ | $CH_2C(=O)NMe_2$ | Me | F | $CH_2CH_2CH_2NHS(=O)_2CF_3$ | O |
| A-7104 | $CH_2CF_3$ | $CH_2C(=O)NMe_2$ | Me | F | $CH_2CH_2N(Me)S(=O)_2CF_3$ | O |
| A-7105 | $CH_2CF_3$ | $CH_2C(=O)NMe_2$ | Me | F | $CH_2CH_2N(Et)S(=O)_2CF_3$ | O |
| A-7106 | $CH_2CF_3$ | $CH_2C(=O)NMe_2$ | Me | F | $CH_2CH_2N(CH_2CN)S(=O)_2CF_3$ | O |
| A-7107 | $CH_2CF_3$ | $CH_2C(=O)NMe_2$ | Me | F | $CH_2CH_2N(CH_2OMe)S(=O)_2CF_3$ | O |
| A-7108 | $CH_2CF_3$ | $CH_2C(=O)NMe_2$ | Me | F | $CH_2CH_2CH_2N(Me)S(=O)_2CF_3$ | O |
| A-7109 | $CH_2CF_3$ | $CH_2C(=O)NMe_2$ | Me | F | $CH_2CH_2CH_2N(Et)S(=O)_2CF_3$ | O |
| A-7110 | $CH_2CF_3$ | $CH_2C(=O)NMe_2$ | Me | F | $CH_2CH_2CH_2N(CH_2CN)S(=O)_2CF_3$ | O |
| A-7111 | $CH_2CF_3$ | $CH_2C(=O)NMe_2$ | Me | F | $CH_2CH_2CH_2N(CH_2OMe)S(=O)_2CF_3$ | O |
| A-7112 | $CH_2CF_3$ | $CH=NOMe$ | Cl | F | $CH_2CH_2CH_2SCF_3$ | O |
| A-7113 | $CH_2CF_3$ | $CH=NOMe$ | Cl | F | $CH_2CH_2CH_2CH_2SCF_3$ | O |
| A-7114 | $CH_2CF_3$ | $CH=NOMe$ | Cl | F | $CH_2CH_2CH_2CH_2CH_2SCF_3$ | O |
| A-7115 | $CH_2CF_3$ | $CH=NOMe$ | Cl | F | $CH_2CH_2CH_2CH_2CH_2CH_2SCF_3$ | O |
| A-7116 | $CH_2CF_3$ | $CH=NOMe$ | Cl | F | $CH_2CH_2CH_2CH_2CH_2CH_2CH_2SCF_3$ | O |
| A-7117 | $CH_2CF_3$ | $CH=NOMe$ | Cl | F | $CH_2CH_2NHS(=O)_2CF_3$ | O |
| A-7118 | $CH_2CF_3$ | $CH=NOMe$ | Cl | F | $CH_2CH_2CH_2NHS(=O)_2CF_3$ | O |
| A-7119 | $CH_2CF_3$ | $CH=NOMe$ | Cl | F | $CH_2CH_2N(Me)S(=O)_2CF_3$ | O |
| A-7120 | $CH_2CF_3$ | $CH=NOMe$ | Cl | F | $CH_2CH_2N(Et)S(=O)_2CF_3$ | O |
| A-7121 | $CH_2CF_3$ | $CH=NOMe$ | Cl | F | $CH_2CH_2N(CH_2CN)S(=O)_2CF_3$ | O |
| A-7122 | $CH_2CF_3$ | $CH=NOMe$ | Cl | F | $CH_2CH_2N(CH_2OMe)S(=O)_2CF_3$ | O |

TABLE 163

| Compound Number | $R^1$ | $R^2$ | $R^3$ | $R^4$ | $R^5$ | A |
|---|---|---|---|---|---|---|
| A-7123 | $CH_2CF_3$ | CH=NOMe | Cl | F | $CH_2CH_2CH_2N(Me)S(=O)_2CF_3$ | O |
| A-7124 | $CH_2CF_3$ | CH=NOMe | Cl | F | $CH_2CH_2CH_2N(Et)S(=O)_2CF_3$ | O |
| A-7125 | $CH_2CF_3$ | CH=NOMe | Cl | F | $CH_2CH_2CH_2N(CH_2CN)S(=O)_2CF_3$ | O |
| A-7126 | $CH_2CF_3$ | CH=NOMe | Cl | F | $CH_2CH_2CH_2N(CH_2OMe)S(=O)_2CF_3$ | O |
| A-7127 | $CH_2CF_3$ | CH=NOMe | Me | F | $CH_2CH_2CH_2SCF_3$ | O |
| A-7128 | $CH_2CF_3$ | CH=NOMe | Me | F | $CH_2CH_2CH_2CH_2SCF_3$ | O |
| A-7129 | $CH_2CF_3$ | CH=NOMe | Me | F | $CH_2CH_2CH_2CH_2CH_2SCF_3$ | O |
| A-7130 | $CH_2CF_3$ | CH=NOMe | Me | F | $CH_2CH_2CH_2CH_2CH_2CH_2SCF_3$ | O |
| A-7131 | $CH_2CF_3$ | CH=NOMe | Me | F | $CH_2CH_2CH_2CH_2CH_2CH_2CH_2SCF_3$ | O |
| A-7132 | $CH_2CF_3$ | CH=NOMe | Me | F | $CH_2CH_2NHS(=O)_2CF_3$ | O |
| A-7133 | $CH_2CF_3$ | CH=NOMe | Me | F | $CH_2CH_2CH_2NHS(=O)_2CF_3$ | O |
| A-7134 | $CH_2CF_3$ | CH=NOMe | Me | F | $CH_2CH_2N(Me)S(=O)_2CF_3$ | O |
| A-7135 | $CH_2CF_3$ | CH=NOMe | Me | F | $CH_2CH_2N(Et)S(=O)_2CF_3$ | O |
| A-7136 | $CH_2CF_3$ | CH=NOMe | Me | F | $CH_2CH_2N(CH_2CN)S(=O)_2CF_3$ | O |
| A-7137 | $CH_2CF_3$ | CH=NOMe | Me | F | $CH_2CH_2N(CH_2OMe)S(=O)_2CF_3$ | O |
| A-7138 | $CH_2CF_3$ | CH=NOMe | Me | F | $CH_2CH_2CH_2N(Me)S(=O)_2CF_3$ | O |
| A-7139 | $CH_2CF_3$ | CH=NOMe | Me | F | $CH_2CH_2CH_2N(Et)S(=O)_2CF_3$ | O |
| A-7140 | $CH_2CF_3$ | CH=NOMe | Me | F | $CH_2CH_2CH_2N(CH_2CN)S(=O)_2CF_3$ | O |
| A-7141 | $CH_2CF_3$ | CH=NOMe | Me | F | $CH_2CH_2CH_2N(CH_2OMe)S(=O)_2CF_3$ | O |
| A-7142 | c-Pr(1-CN) | H | Cl | F | $CH_2\{c-Pr[1-NHS(=O)_2CF_3]\}$ | O |

TABLE 164

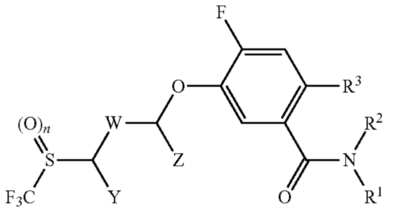

| Compound Number | n | Y | W | Z | $R^1$ | $R^2$ | $R^3$ |
|---|---|---|---|---|---|---|---|
| B-0001 | 0 | H | single bond | Me | $CH_2CF_3$ | H | Cl |
| B-0002 | 0 | H | single bond | Et | $CH_2CF_3$ | H | Cl |
| B-0003 | 0 | Me | single bond | H | $CH_2CF_3$ | H | C |
| B-0004 | 0 | Et | single bond | H | $CH_2CF_3$ | H | Cl |
| B-0005 | 0 | Me | single bond | Me | $CH_2CF_3$ | H | Cl |
| B-0006 | 0 | H | $CH_2$ | Me | $CH_2CF_3$ | H | Cl |
| B-0007 | 0 | Me | $CH_2$ | H | $CH_2CF_3$ | H | Cl |
| B-0008 | 0 | Me | $CH_2$ | Me | $CH_2CF_3$ | H | Cl |
| B-0009 | 0 | H | CH(Me) | H | $CH_2CF_3$ | H | Cl |
| B-0010 | 0 | H | CH(Me) | Me | $CH_2CF_3$ | H | Cl |
| B-0011 | 0 | Me | CH(Me) | H | $CH_2CF_3$ | H | Cl |
| B-0012 | 0 | Me | CH(Me) | Me | $CH_2CF_3$ | H | Cl |
| B-0013 | 0 | H | CH2CH2 | Me | $CH_2CF_3$ | H | Cl |
| B-0014 | 0 | Me | CH2CH2 | H | $CH_2CF_3$ | H | Cl |
| B-0015 | 0 | Me | CH2CH2 | Me | $CH_2CF_3$ | H | Cl |
| B-0016 | 0 | H | $CH_2CH(Me)$ | H | $CH_2CF_3$ | H | Cl |
| B-0017 | 0 | H | $CH_2CH(Me)$ | Me | $CH_2CF_3$ | H | Cl |
| B-0018 | 0 | Me | $CH_2CH(Me)$ | H | $CH_2CF_3$ | H | Cl |
| B-0019 | 0 | Me | $CH_2CH(Me)$ | Me | $CH_2CF_3$ | H | Cl |
| B-0020 | 0 | H | $CH(Me)CH_2$ | H | $CH_2CF_3$ | H | Cl |
| B-0021 | 0 | H | $CH(Me)CH_2$ | Me | $CH_2CF_3$ | H | Cl |
| B-0022 | 0 | Me | $CH(Me)CH_2$ | H | $CH_2CF_3$ | H | Cl |
| B-0023 | 0 | Me | $CH(Me)CH_2$ | Me | $CH_2CF_3$ | H | Cl |
| B-0024 | 0 | H | $CH_2CH_2CH_2$ | Me | $CH_2CF_3$ | H | Cl |
| B-0025 | 0 | Me | $CH_2CH_2CH_2$ | H | $CH_2CF_3$ | H | Cl |
| B-0026 | 0 | Me | $CH_2CH_2CH_2$ | Me | $CH_2CF_3$ | H | Cl |
| B-0027 | 0 | H | $CH_2CH_2CH(Me)$ | H | $CH_2CF_3$ | H | Cl |
| B-0028 | 0 | H | $CH_2CH_2CH(Me)$ | Me | $CH_2CF_3$ | H | Cl |
| B-0029 | 0 | Me | $CH_2CH_2CH(Me)$ | H | $CH_2CF_3$ | H | Cl |
| B-0030 | 0 | Me | $CH_2CH_2CH(Me)$ | Me | $CH_2CF_3$ | H | Cl |
| B-0031 | 0 | H | $CH_2CH(Me)CH_2$ | H | $CH_2CF_3$ | H | Cl |
| B-0032 | 0 | H | $CH_2CH(Me)CH_2$ | Me | $CH_2CF_3$ | H | Cl |
| B-0033 | 0 | Me | $CH_2CH(Me)CH_2$ | H | $CH_2CF_3$ | H | Cl |
| B-0034 | 0 | Me | $CH_2CH(Me)CH_2$ | Me | $CH_2CF_3$ | H | C |
| B-0035 | 0 | H | $CH(Me)CH_2CH_2$ | H | $CH_2CF_3$ | H | Cl |
| B-0036 | 0 | H | $CH(Me)CH_2CH_2$ | Me | $CH_2CF_3$ | H | Cl |

TABLE 164-continued

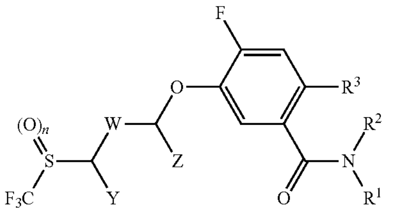

| Compound Number | n | Y | W | Z | $R^1$ | $R^2$ | $R^3$ |
|---|---|---|---|---|---|---|---|
| B-0037 | 0 | Me | $CH(Me)CH_2CH_2$ | H | $CH_2CF_3$ | H | Cl |
| B-0038 | 0 | Me | $CH(Me)CH_2CH_2$ | Me | $CH_2CF_3$ | H | Cl |

TABLE 165

| Compound Number | n | Y | W | Z | $R^1$ | $R^2$ | $R^3$ |
|---|---|---|---|---|---|---|---|
| B-0039 | 0 | H | single bond | Me | $CH_2CF_3$ | H | Me |
| B-0040 | 0 | H | single bond | Et | $CH_2CF_3$ | H | Me |
| B-0041 | 0 | Me | single bond | H | $CH_2CF_3$ | H | Me |
| B-0042 | 0 | Et | single bond | H | $CH_2CF_3$ | H | Me |
| B-0043 | 0 | Me | single bond | Me | $CH_2CF_3$ | H | Me |
| B-0044 | 0 | H | $CH_2$ | Me | $CH_2CF_3$ | H | Me |
| B-0045 | 0 | Me | $CH_2$ | H | $CH_2CF_3$ | H | Me |
| B-0046 | 0 | Me | $CH_2$ | Me | $CH_2CF_3$ | H | Me |
| B-0047 | 0 | H | CH(Me) | H | $CH_2CF_3$ | H | Me |
| B-0048 | 0 | H | CH(Me) | Me | $CH_2CF_3$ | H | Me |
| B-0049 | 0 | Me | CH(Me) | H | $CH_2CF_3$ | H | Me |
| B-0050 | 0 | Me | CH(Me) | Me | $CH_2CF_3$ | H | Me |
| B-0051 | 0 | H | $CH_2CH_2$ | Me | $CH_2CF_3$ | H | Me |
| B-0052 | 0 | Me | $CH_2CH_2$ | H | $CH_2CF_3$ | H | Me |
| B-0053 | 0 | Me | $CH_2CH_2$ | Me | $CH_2CF_3$ | H | Me |
| B-0054 | 0 | H | $CH_2CH(Me)$ | H | $CH_2CF_3$ | H | Me |
| B-0055 | 0 | H | $CH_2CH(Me)$ | Me | $CH_2CF_3$ | H | Me |
| B-0056 | 0 | Me | $CH_2CH(Me)$ | H | $CH_2CF_3$ | H | Me |
| B-0057 | 0 | Me | $CH_2CH(Me)$ | Me | $CH_2CF_3$ | H | Me |
| B-0058 | 0 | H | $CH(Me)CH_2$ | H | $CH_2CF_3$ | H | Me |
| B-0059 | 0 | H | $CH(Me)CH_2$ | Me | $CH_2CF_3$ | H | Me |
| B-0060 | 0 | Me | $CH(Me)CH_2$ | H | $CH_2CF_3$ | H | Me |
| B-0061 | 0 | Me | $CH(Me)CH_2$ | Me | $CH_2CF_3$ | H | Me |
| B-0062 | 0 | H | $CH_2CH_2CH_2$ | Me | $CH_2CF_3$ | H | Me |
| B-0063 | 0 | Me | $CH_2CH_2CH_2$ | H | $CH_2CF_3$ | H | Me |

TABLE 165-continued

| Compound Number | n | Y | W | Z | $R^1$ | $R^2$ | $R^3$ |
|---|---|---|---|---|---|---|---|
| B-0064 | 0 | Me | $CH_2CH_2CH_2$ | Me | $CH_2CF_3$ | H | Me |
| B-0065 | 0 | H | $CH_2CH_2CH(Me)$ | H | $CH_2CF_3$ | H | Me |
| B-0066 | 0 | H | $CH_2CH_2CH(Me)$ | Me | $CH_2CF_3$ | H | Me |
| B-0067 | 0 | Me | $CH_2CH_2CH(Me)$ | H | $CH_2CF_3$ | H | Me |
| B-0068 | 0 | Me | $CH_2CH_2CH(Me)$ | Me | $CH_2CF_3$ | H | Me |
| B-0069 | 0 | H | $CH_2CH(Me)CH_2$ | H | $CH_2CF_3$ | H | Me |
| B-0070 | 0 | H | $CH_2CH(Me)CH_2$ | Me | $CH_2CF_3$ | H | Me |
| B-0071 | 0 | Me | $CH_2CH(Me)CH_2$ | H | $CH_2CF_3$ | H | Me |
| B-0072 | 0 | Me | $CH_2CH(Me)CH_2$ | Me | $CH_2CF_3$ | H | Me |
| B-0073 | 0 | H | $CH(Me)CH_2CH_2$ | H | $CH_2CF_3$ | H | Me |
| B-0074 | 0 | H | $CH(Me)CH_2CH_2$ | Me | $CH_2CF_3$ | H | Me |
| B-0075 | 0 | Me | $CH(Me)CH_2CH_2$ | H | $CH_2CF_3$ | H | Me |
| B-0076 | 0 | Me | $CH(Me)CH_2CH_2$ | Me | $CH_2CF_3$ | H | Me |
| B-0077 | 0 | H | single bond | Me | Et | H | Cl |
| B-0078 | 0 | H | single bond | Et | Et | H | Cl |
| B-0079 | 0 | Me | single bond | H | Et | H | Cl |
| B-0080 | 0 | Et | single bond | H | Et | H | Cl |
| B-0081 | 0 | Me | single bond | Me | Et | H | Cl |
| B-0082 | 0 | H | $CH_2$ | Me | Et | H | Cl |

TABLE 166

| Compound Number | n | Y | W | Z | $R^1$ | $R^2$ | $R^3$ |
|---|---|---|---|---|---|---|---|
| B-0083 | 0 | Me | $CH_2$ | H | Et | H | Cl |
| B-0084 | 0 | Me | $CH_2$ | Me | Et | H | Cl |
| B-0085 | 0 | H | CH(Me) | H | Et | H | Cl |
| B-0086 | 0 | H | CH(Me) | Me | Et | H | Cl |
| B-0087 | 0 | Me | CH(Me) | H | Et | H | Cl |
| B-0088 | 0 | Me | CH(Me) | Me | Et | H | Cl |
| B-0089 | 0 | H | $CH_2CH_2$ | Me | Et | H | Cl |
| B-0090 | 0 | Me | $CH_2CH_2$ | H | Et | H | Cl |
| B-0091 | 0 | Me | $CH_2CH_2$ | Me | Et | H | Cl |
| B-0092 | 0 | H | $CH_2CH(Me)$ | H | Et | H | Cl |
| B-0093 | 0 | H | $CH_2CH(Me)$ | Me | Et | H | Cl |
| B-0094 | 0 | Me | $CH_2CH(Me)$ | H | Et | H | Cl |
| B-0095 | 0 | Me | $CH_2CH(Me)$ | Me | Et | H | Cl |
| B-0096 | 0 | H | $CH(Me)CH_2$ | H | Et | H | Cl |
| B-0097 | 0 | H | $CH(Me)CH_2$ | Me | Et | H | Cl |
| B-0098 | 0 | Me | $CH(Me)CH_2$ | H | Et | H | Cl |
| B-0099 | 0 | Me | $CH(Me)CH_2$ | Me | Et | H | Cl |
| B-0100 | 0 | H | $CH_2CH_2CH_2$ | Me | Et | H | Cl |
| B-0101 | 0 | Me | $CH_2CH_2CH_2$ | H | Et | H | Cl |
| B-0102 | 0 | Me | $CH_2CH_2CH_2$ | Me | Et | H | Cl |
| B-0103 | 0 | H | $CH_2CH_2CH(Me)$ | H | Et | H | Cl |
| B-0104 | 0 | H | $CH_2CH_2CH(Me)$ | Me | Et | H | Cl |
| B-0105 | 0 | Me | $CH_2CH_2CH(Me)$ | H | Et | H | Cl |
| B-0106 | 0 | Me | $CH_2CH_2CH(Me)$ | Me | Et | H | Cl |
| B-0107 | 0 | H | $CH_2CH(Me)CH_2$ | H | Et | H | Cl |
| B-0108 | 0 | H | $CH_2CH(Me)CH_2$ | Me | Et | H | Cl |
| B-0109 | 0 | Me | $CH_2CH(Me)CH_2$ | H | Et | H | Cl |
| B-0110 | 0 | Me | $CH_2CH(Me)CH_2$ | Me | Et | H | Cl |
| B-0111 | 0 | H | $CH(Me)CH_2CH_2$ | H | Et | H | Cl |
| B-0112 | 0 | H | $CH(Me)CH_2CH_2$ | Me | Et | H | Cl |
| B-0113 | 0 | Me | $CH(Me)CH_2CH_2$ | H | Et | H | Cl |
| B-0114 | 0 | Me | $CH(Me)CH_2CH_2$ | Me | Et | H | Cl |
| B-0115 | 0 | H | single bond | Me | Et | H | Me |
| B-0116 | 0 | H | single bond | Et | Et | H | Me |
| B-0117 | 0 | Me | single bond | H | Et | H | Me |
| B-0118 | 0 | Et | single bond | H | Et | H | Me |
| B-0119 | 0 | Me | single bond | Me | Et | H | Me |
| B-0120 | 0 | H | $CH_2$ | Me | Et | H | Me |
| B-0121 | 0 | Me | $CH_2$ | H | Et | H | Me |
| B-0122 | 0 | Me | $CH_2$ | Me | Et | H | Me |
| B-0123 | 0 | H | CH(Me) | H | Et | H | Me |
| B-0124 | 0 | H | CH(Me) | Me | Et | H | Me |
| B-0125 | 0 | Me | CH(Me) | H | Et | H | Me |
| B-0126 | 0 | Me | CH(Me) | Me | Et | H | Me |

TABLE 167

| Compound Number | n | Y | W | Z | $R^1$ | $R^2$ | $R^3$ |
|---|---|---|---|---|---|---|---|
| B-0127 | 0 | H | $CH_2CH_2$ | Me | Et | H | Me |
| B-0128 | 0 | Me | $CH_2CH_2$ | H | Et | H | Me |
| B-0129 | 0 | Me | $CH_2CH_2$ | Me | Et | H | Me |
| B-0130 | 0 | H | $CH_2CH(Me)$ | H | Et | H | Me |
| B-0131 | 0 | H | $CH_2CH(Me)$ | Me | Et | H | Me |
| B-0132 | 0 | Me | $CH_2CH(Me)$ | H | Et | H | Me |
| B-0133 | 0 | Me | $CH_2CH(Me)$ | Me | Et | H | Me |
| B-0134 | 0 | H | $CH(Me)CH_2$ | H | Et | H | Me |
| B-0135 | 0 | H | $CH(Me)CH_2$ | Me | Et | H | Me |
| B-0136 | 0 | Me | $CH(Me)CH_2$ | H | Et | H | Me |
| B-0137 | 0 | Me | $CH(Me)CH_2$ | Me | Et | H | Me |
| B-0138 | 0 | H | $CH_2CH_2CH_2$ | Me | Et | H | Me |
| B-0139 | 0 | Me | $CH_2CH_2CH_2$ | H | Et | H | Me |
| B-0140 | 0 | Me | $CH_2CH_2CH_2$ | Me | Et | H | Me |
| B-0141 | 0 | H | $CH_2CH_2CH(Me)$ | H | Et | H | Me |
| B-0142 | 0 | H | $CH_2CH_2CH(Me)$ | Me | Et | H | Me |
| B-0143 | 0 | Me | $CH_2CH_2CH(Me)$ | H | Et | H | Me |
| B-0144 | 0 | Me | $CH_2CH_2CH(Me)$ | Me | Et | H | Me |
| B-0145 | 0 | H | $CH_2CH(Me)CH_2$ | H | Et | H | Me |
| B-0146 | 0 | H | $CH_2CH(Me)CH_2$ | Me | Et | H | Me |
| B-0147 | 0 | Me | $CH_2CH(Me)CH_2$ | H | Et | H | Me |
| B-0148 | 0 | Me | $CH_2CH(Me)CH_2$ | Me | Et | H | Me |
| B-0149 | 0 | H | $CH(Me)CH_2CH_2$ | H | Et | H | Me |
| B-0150 | 0 | H | $CH(Me)CH_2CH_2$ | Me | Et | H | Me |
| B-0151 | 0 | Me | $CH(Me)CH_2CH_2$ | H | Et | H | Me |
| B-0152 | 0 | Me | $CH(Me)CH_2CH_2$ | Me | Et | H | Me |
| B-0153 | 0 | H | single bond | Me | c-Pr | H | Cl |
| B-0154 | 0 | H | single bond | Et | c-Pr | H | Cl |
| B-0155 | 0 | Me | single bond | H | c-Pr | H | Cl |
| B-0156 | 0 | Et | single bond | H | c-Pr | H | Cl |
| B-0157 | 0 | Me | single bond | Me | c-Pr | H | Cl |
| B-0158 | 0 | H | $CH_2$ | Me | c-Pr | H | Cl |
| B-0159 | 0 | Me | $CH_2$ | H | c-Pr | H | Cl |
| B-0160 | 0 | Me | $CH_2$ | Me | c-Pr | H | Cl |
| B-0161 | 0 | H | CH(Me) | H | c-Pr | H | Cl |
| B-0162 | 0 | H | CH(Me) | Me | c-Pr | H | Cl |
| B-0163 | 0 | Me | CH(Me) | H | c-Pr | H | Cl |
| B-0164 | 0 | Me | CH(Me) | Me | c-Pr | H | Cl |
| B-0165 | 0 | H | $CH_2CH_2$ | Me | c-Pr | H | Cl |
| B-0166 | 0 | Me | $CH_2CH_2$ | H | c-Pr | H | Cl |
| B-0167 | 0 | Me | $CH_2CH_2$ | Me | c-Pr | H | Cl |
| B-0168 | 0 | H | $CH_2CH(Me)$ | H | c-Pr | H | Cl |
| B-0169 | 0 | H | $CH_2CH(Me)$ | Me | c-Pr | H | Cl |
| B-0170 | 0 | Me | $CH_2CH(Me)$ | H | c-Pr | H | Cl |

TABLE 168

| Compound Number | n | Y | W | Z | $R^1$ | $R^2$ | $R^3$ |
|---|---|---|---|---|---|---|---|
| B-0171 | 0 | Me | $CH_2CH(Me)$ | Me | c-Pr | H | Cl |
| B-0172 | 0 | H | $CH(Me)CH_2$ | H | c-Pr | H | Cl |
| B-0173 | 0 | H | $CH(Me)CH_2$ | Me | c-Pr | H | Cl |
| B-0174 | 0 | Me | $CH(Me)CH_2$ | H | c-Pr | H | Cl |
| B-0175 | 0 | Me | $CH(Me)CH_2$ | Me | c-Pr | H | Cl |
| B-0176 | 0 | H | $CH_2CH_2CH_2$ | Me | c-Pr | H | Cl |
| B-0177 | 0 | Me | $CH_2CH_2CH_2$ | H | c-Pr | H | Cl |
| B-0178 | 0 | Me | $CH_2CH_2CH_2$ | Me | c-Pr | H | Cl |
| B-0179 | 0 | H | $CH_2CH_2CH(Me)$ | H | c-Pr | H | Cl |
| B-0180 | 0 | H | $CH_2CH_2CH(Me)$ | Me | c-Pr | H | Cl |
| B-0181 | 0 | Me | $CH_2CH_2CH(Me)$ | H | c-Pr | H | Cl |
| B-0182 | 0 | Me | $CH_2CH_2CH(Me)$ | Me | c-Pr | H | Cl |
| B-0183 | 0 | H | $CH_2CH(Me)CH_2$ | H | c-Pr | H | Cl |
| B-0184 | 0 | H | $CH_2CH(Me)CH_2$ | Me | c-Pr | H | Cl |
| B-0185 | 0 | Me | $CH_2CH(Me)CH_2$ | H | c-Pr | H | Cl |
| B-0186 | 0 | Me | $CH_2CH(Me)CH_2$ | Me | c-Pr | H | Cl |
| B-0187 | 0 | H | $CH(Me)CH_2CH_2$ | H | c-Pr | H | Cl |
| B-0188 | 0 | H | $CH(Me)CH_2CH_2$ | Me | c-Pr | H | Cl |
| B-0189 | 0 | Me | $CH(Me)CH_2CH_2$ | H | c-Pr | H | Cl |
| B-0190 | 0 | Me | $CH(Me)CH_2CH_2$ | Me | c-Pr | H | Cl |
| B-0191 | 0 | H | single bond | Me | c-Pr | H | Me |
| B-0192 | 0 | H | single bond | Et | c-Pr | H | Me |
| B-0193 | 0 | Me | single bond | H | c-Pr | H | Me |
| B-0194 | 0 | Et | single bond | H | c-Pr | H | Me |

TABLE 168-continued

| Compound Number | n | Y | W | Z | $R^1$ | $R^2$ | $R^3$ |
|---|---|---|---|---|---|---|---|
| B-0195 | 0 | Me | single bond | Me | c-Pr | H | Me |
| B-0196 | 0 | H | $CH_2$ | Me | c-Pr | H | Me |
| B-0197 | 0 | Me | $CH_2$ | H | c-Pr | H | Me |
| B-0198 | 0 | Me | $CH_2$ | Me | c-Pr | H | Me |
| B-0199 | 0 | H | CH(Me) | H | c-Pr | H | Me |
| B-0200 | 0 | H | CH(Me) | Me | c-Pr | H | Me |
| B-0201 | 0 | Me | CH(Me) | H | c-Pr | H | Me |
| B-0202 | 0 | Me | CH(Me) | Me | c-Pr | H | Me |
| B-0203 | 0 | H | $CH_2CH_2$ | Me | c-Pr | H | Me |
| B-0204 | 0 | Me | $CH_2CH_2$ | H | c-Pr | H | Me |
| B-0205 | 0 | Me | $CH_2CH_2$ | Me | c-Pr | H | Me |
| B-0206 | 0 | H | $CH_2CH(Me)$ | H | c-Pr | H | Me |
| B-0207 | 0 | H | $CH_2CH(Me)$ | Me | c-Pr | H | Me |
| B-0208 | 0 | Me | $CH_2CH(Me)$ | H | c-Pr | H | Me |
| B-0209 | 0 | Me | $CH_2CH(Me)$ | Me | c-Pr | H | Me |
| B-0210 | 0 | H | $CH(Me)CH_2$ | H | c-Pr | H | Me |
| B-0211 | 0 | H | $CH(Me)CH_2$ | Me | c-Pr | H | Me |
| B-0212 | 0 | Me | $CH(Me)CH_2$ | H | c-Pr | H | Me |
| B-0213 | 0 | Me | $CH(Me)CH_2$ | Me | c-Pr | H | Me |
| B-0214 | 0 | H | $CH_2CH_2CH_2$ | Me | c-Pr | H | Me |

TABLE 169

| Compound Number | n | Y | W | Z | $R^1$ | $R^2$ | $R^3$ |
|---|---|---|---|---|---|---|---|
| B-0215 | 0 | Me | $CH_2CH_2CH_2$ | H | c-Pr | H | Me |
| B-0216 | 0 | Me | $CH_2CH_2CH_2$ | Me | c-Pr | H | Me |
| B-0217 | 0 | H | $CH_2CH_2CH(Me)$ | H | c-Pr | H | Me |
| B-0218 | 0 | H | $CH_2CH_2CH(Me)$ | Me | c-Pr | H | Me |
| B-0219 | 0 | Me | $CH_2CH_2CH(Me)$ | H | c-Pr | H | Me |
| B-0220 | 0 | Me | $CH_2CH_2CH(Me)$ | Me | c-Pr | H | Me |
| B-0221 | 0 | H | $CH_2CH(Me)CH_2$ | H | c-Pr | H | Me |
| B-0222 | 0 | H | $CH_2CH(Me)CH_2$ | Me | c-Pr | H | Me |
| B-0223 | 0 | Me | $CH_2CH(Me)CH_2$ | H | c-Pr | H | Me |
| B-0224 | 0 | Me | $CH_2CH(Me)CH_2$ | Me | c-Pr | H | Me |
| B-0225 | 0 | H | $CH(Me)CH_2CH_2$ | H | c-Pr | H | Me |
| B-0226 | 0 | H | $CH(Me)CH_2CH_2$ | Me | c-Pr | H | Me |
| B-0227 | 0 | Me | $CH(Me)CH_2CH_2$ | H | c-Pr | H | Me |
| B-0228 | 0 | Me | $CH(Me)CH_2CH_2$ | Me | c-Pr | H | Me |
| B-0229 | 1 | H | single bond | Me | $CH_2CF_3$ | H | Cl |
| B-0230 | 1 | H | single bond | Et | $CH_2CF_3$ | H | Cl |
| B-0231 | 1 | Me | single bond | H | $CH_2CF_3$ | H | Cl |
| B-0232 | 1 | Et | single bond | H | $CH_2CF_3$ | H | Cl |
| B-0233 | 1 | Me | single bond | Me | $CH_2CF_3$ | H | Cl |
| B-0234 | 1 | H | $CH_2$ | Me | $CH_2CF_3$ | H | Cl |
| B-0235 | 1 | Me | $CH_2$ | H | $CH_2CF_3$ | H | Cl |
| B-0236 | 1 | Me | $CH_2$ | Me | $CH_2CF_3$ | H | Cl |
| B-0237 | 1 | H | CH(Me) | H | $CH_2CF_3$ | H | Cl |
| B-0238 | 1 | H | CH(Me) | Me | $CH_2CF_3$ | H | Cl |
| B-0239 | 1 | Me | CH(Me) | H | $CH_2CF_3$ | H | Cl |
| B-0240 | 1 | Me | CH(Me) | Me | $CH_2CF_3$ | H | Cl |
| B-0241 | 1 | H | $CH_2CH_2$ | Me | $CH_2CF_3$ | H | Cl |
| B-0242 | 1 | Me | $CH_2CH_2$ | H | $CH_2CF_3$ | H | Cl |
| B-0243 | 1 | Me | $CH_2CH_2$ | Me | $CH_2CF_3$ | H | Cl |
| B-0244 | 1 | H | $CH_2CH(Me)$ | H | $CH_2CF_3$ | H | Cl |
| B-0245 | 1 | H | $CH_2CH(Me)$ | Me | $CH_2CF_3$ | H | Cl |
| B-0246 | 1 | Me | $CH_2CH(Me)$ | H | $CH_2CF_3$ | H | Cl |
| B-0247 | 1 | Me | $CH_2CH(Me)$ | Me | $CH_2CF_3$ | H | Cl |
| B-0248 | 1 | H | $CH(Me)CH_2$ | H | $CH_2CF_3$ | H | Cl |
| B-0249 | 1 | H | $CH(Me)CH_2$ | Me | $CH_2CF_3$ | H | Cl |
| B-0250 | 1 | Me | $CH(Me)CH_2$ | H | $CH_2CF_3$ | H | Cl |
| B-0251 | 1 | Me | $CH(Me)CH_2$ | Me | $CH_2CF_3$ | H | Cl |
| B-0252 | 1 | H | $CH_2CH_2CH_2$ | Me | $CH_2CF_3$ | H | Cl |
| B-0253 | 1 | Me | $CH_2CH_2CH_2$ | H | $CH_2CF_3$ | H | Cl |
| B-0254 | 1 | Me | $CH_2CH_2CH_2$ | Me | $CH_2CF_3$ | H | Cl |
| B-0255 | 1 | H | $CH_2CH_2CH(Me)$ | H | $CH_2CF_3$ | H | Cl |
| B-0256 | 1 | H | $CH_2CH_2CH(Me)$ | Me | $CH_2CF_3$ | H | Cl |
| B-0257 | 1 | Me | $CH_2CH_2CH(Me)$ | H | $CH_2CF_3$ | H | Cl |
| B-0258 | 1 | Me | $CH_2CH_2CH(Me)$ | Me | $CH_2CF_3$ | H | Cl |

TABLE 170

| Compound Number | n | Y | W | Z | $R^1$ | $R^2$ | $R^3$ |
|---|---|---|---|---|---|---|---|
| B-0259 | 1 | H | $CH_2CH(Me)CH_2$ | H | $CH_2CF_3$ | H | Cl |
| B-0260 | 1 | H | $CH_2CH(Me)CH_2$ | Me | $CH_2CF_3$ | H | Cl |
| B-0261 | 1 | Me | $CH_2CH(Me)CH_2$ | H | $CH_2CF_3$ | H | Cl |
| B-0262 | 1 | Me | $CH_2CH(Me)CH_2$ | Me | $CH_2CF_3$ | H | Cl |
| B-0263 | 1 | H | $CH_2CH(Me)CH_2$ | H | $CH_2CF_3$ | H | Cl |
| B-0264 | 1 | H | $CH_2CH(Me)CH_2$ | Me | $CH_2CF_3$ | H | Cl |
| B-0265 | 1 | Me | $CH_2CH(Me)CH_2$ | H | $CH_2CF_3$ | H | Cl |
| B-0266 | 1 | Me | $CH_2CH(Me)CH_2$ | Me | $CH_2CF_3$ | H | Cl |
| B-0267 | 1 | H | single bond | Me | $CH_2CF_3$ | H | Me |
| B-0268 | 1 | H | single bond | Et | $CH_2CF_3$ | H | Me |
| B-0269 | 1 | Me | single bond | H | $CH_2CF_3$ | H | Me |
| B-0270 | 1 | Et | single bond | H | $CH_2CF_3$ | H | Me |
| B-0271 | 1 | Me | single bond | Me | $CH_2CF_3$ | H | Me |
| B-0272 | 1 | H | $CH_2$ | Me | $CH_2CF_3$ | H | Me |
| B-0273 | 1 | Me | $CH_2$ | H | $CH_2CF_3$ | H | Me |
| B-0274 | 1 | Me | $CH_2$ | Me | $CH_2CF_3$ | H | Me |
| B-0275 | 1 | H | CH(Me) | H | $CH_2CF_3$ | H | Me |
| B-0276 | 1 | H | CH(Me) | Me | $CH_2CF_3$ | H | Me |
| B-0277 | 1 | Me | CH(Me) | H | $CH_2CF_3$ | H | Me |
| B-0278 | 1 | Me | CH(Me) | Me | $CH_2CF_3$ | H | Me |
| B-0279 | 1 | H | $CH_2CH_2$ | Me | $CH_2CF_3$ | H | Me |
| B-0280 | 1 | Me | $CH_2CH_2$ | H | $CH_2CF_3$ | H | Me |
| B-0281 | 1 | Me | $CH_2CH_2$ | Me | $CH_2CF_3$ | H | Me |
| B-0282 | 1 | H | $CH_2CH(Me)$ | H | $CH_2CF_3$ | H | Me |
| B-0283 | 1 | H | $CH_2CH(Me)$ | Me | $CH_2CF_3$ | H | Me |
| B-0284 | 1 | Me | $CH_2CH(Me)$ | H | $CH_2CF_3$ | H | Me |
| B-0285 | 1 | Me | $CH_2CH(Me)$ | Me | $CH_2CF_3$ | H | Me |
| B-0286 | 1 | H | $CH(Me)CH_2$ | H | $CH_2CF_3$ | H | Me |
| B-0287 | 1 | H | $CH(Me)CH_2$ | Me | $CH_2CF_3$ | H | Me |
| B-0288 | 1 | Me | $CH(Me)CH_2$ | H | $CH_2CF_3$ | H | Me |
| B-0289 | 1 | Me | $CH(Me)CH_2$ | Me | $CH_2CF_3$ | H | Me |
| B-0290 | 1 | H | $CH_2CH_2CH_2$ | Me | $CH_2CF_3$ | H | Me |
| B-0291 | 1 | Me | $CH_2CH_2CH_2$ | H | $CH_2CF_3$ | H | Me |
| B-0292 | 1 | Me | $CH_2CH_2CH_2$ | Me | $CH_2CF_3$ | H | Me |
| B-0293 | 1 | H | $CH_2CH_2CH(Me)$ | H | $CH_2CF_3$ | H | Me |
| B-0294 | 1 | H | $CH_2CH_2CH(Me)$ | Me | $CH_2CF_3$ | H | Me |
| B-0295 | 1 | Me | $CH_2CH_2CH(Me)$ | H | $CH_2CF_3$ | H | Me |
| B-0296 | 1 | Me | $CH_2CH_2CH(Me)$ | Me | $CH_2CF_3$ | H | Me |
| B-0297 | 1 | H | $CH_2CH(Me)CH_2$ | H | $CH_2CF_3$ | H | Me |
| B-0298 | 1 | H | $CH_2CH(Me)CH_2$ | Me | $CH_2CF_3$ | H | Me |
| B-0299 | 1 | Me | $CH_2CH(Me)CH_2$ | H | $CH_2CF_3$ | H | Me |
| B-0300 | 1 | Me | $CH_2CH(Me)CH_2$ | Me | $CH_2CF_3$ | H | Me |
| B-0301 | 1 | H | $CH(Me)CH_2CH_2$ | H | $CH_2CF_3$ | H | Me |
| B-0302 | 1 | H | $CH(Me)CH_2CH_2$ | Me | $CH_2CF_3$ | H | Me |

TABLE 171

| Compound Number | n | Y | W | Z | $R^1$ | $R^2$ | $R^3$ |
|---|---|---|---|---|---|---|---|
| B-0303 | 1 | Me | $CH(Me)CH_2CH_2$ | H | $CH_2CF_3$ | H | Me |
| B-0304 | 1 | Me | $CH(Me)CH_2CH_2$ | Me | $CH_2CF_3$ | H | Me |
| B-0305 | 1 | H | single bond | Me | Et | H | Cl |
| B-0306 | 1 | H | single bond | Et | Et | H | Cl |
| B-0307 | 1 | Me | single bond | H | Et | H | Cl |
| B-0308 | 1 | Et | single bond | H | Et | H | Cl |
| B-0309 | 1 | Me | single bond | Me | Et | H | Cl |
| B-0310 | 1 | H | $CH_2$ | Me | Et | H | Cl |
| B-0311 | 1 | Me | $CH_2$ | H | Et | H | Cl |
| B-0312 | 1 | Me | $CH_2$ | Me | Et | H | Cl |
| B-0313 | 1 | H | CH(Me) | H | Et | H | Cl |
| B-0314 | 1 | H | CH(Me) | Me | Et | H | Cl |
| B-0315 | 1 | Me | CH(Me) | H | Et | H | Cl |
| B-0316 | 1 | Me | CH(Me) | Me | Et | H | Cl |
| B-0317 | 1 | H | $CH_2CH_2$ | Me | Et | H | Cl |
| B-0318 | 1 | Me | $CH_2CH_2$ | H | Et | H | Cl |
| B-0319 | 1 | Me | $CH_2CH_2$ | Me | Et | H | Cl |
| B-0320 | 1 | H | $CH_2CH(Me)$ | H | Et | H | Cl |
| B-0321 | 1 | H | $CH_2CH(Me)$ | Me | Et | H | Cl |
| B-0322 | 1 | Me | $CH_2CH(Me)$ | H | Et | H | Cl |
| B-0323 | 1 | Me | $CH_2CH(Me)$ | Me | Et | H | Cl |
| B-0324 | 1 | H | $CH(Me)CH_2$ | H | Et | H | Cl |
| B-0325 | 1 | H | $CH(Me)CH_2$ | Me | Et | H | Cl |
| B-0326 | 1 | Me | $CH(Me)CH_2$ | H | Et | H | Cl |

TABLE 171-continued

| Compound Number | n | Y | W | Z | $R^1$ | $R^2$ | $R^3$ |
|---|---|---|---|---|---|---|---|
| B-0327 | 1 | Me | $CH(Me)CH_2$ | Me | Et | H | Cl |
| B-0328 | 1 | H | $CH_2CH_2CH_2$ | Me | Et | H | Cl |
| B-0329 | 1 | Me | $CH_2CH_2CH_2$ | H | Et | H | Cl |
| B-0330 | 1 | Me | $CH_2CH_2CH_2$ | Me | Et | H | Cl |
| B-0331 | 1 | H | $CH_2CH_2CH(Me)$ | H | Et | H | Cl |
| B-0332 | 1 | H | $CH_2CH_2CH(Me)$ | Me | Et | H | Cl |
| B-0333 | 1 | Me | $CH_2CH_2CH(Me)$ | H | Et | H | Cl |
| B-0334 | 1 | Me | $CH_2CH_2CH(Me)$ | Me | Et | H | Cl |
| B-0335 | 1 | H | $CH_2CH(Me)CH_2$ | H | Et | H | Cl |
| B-0336 | 1 | H | $CH_2CH(Me)CH_2$ | Me | Et | H | Cl |
| B-0337 | 1 | Me | $CH_2CH(Me)CH_2$ | H | Et | H | Cl |
| B-0338 | 1 | Me | $CH_2CH(Me)CH_2$ | Me | Et | H | Cl |
| B-0339 | 1 | H | $CH(Me)CH_2CH_2$ | H | Et | H | Cl |
| B-0340 | 1 | H | $CH(Me)CH_2CH_2$ | Me | Et | H | Cl |
| B-0341 | 1 | Me | $CH(Me)CH_2CH_2$ | H | Et | H | Cl |
| B-0342 | 1 | Me | $CH(Me)CH_2CH_2$ | Me | Et | H | Cl |
| B-0343 | 1 | H | single bond | Me | Et | H | Me |
| B-0344 | 1 | H | single bond | Et | Et | H | Me |
| B-0345 | 1 | Me | single bond | H | Et | H | Me |
| B-0346 | 1 | Et | single bond | H | Et | H | Me |

TABLE 172

| Compound Number | n | Y | W | Z | $R^1$ | $R^2$ | $R^3$ |
|---|---|---|---|---|---|---|---|
| B-0347 | 1 | Me | single bond | Me | Et | H | Me |
| B-0348 | 1 | H | $CH_2$ | Me | Et | H | Me |
| B-0349 | 1 | Me | $CH_2$ | H | Et | H | Me |
| B-0350 | 1 | Me | $CH_2$ | Me | Et | H | Me |
| B-0351 | 1 | H | CH(Me) | H | Et | H | Me |
| B-0352 | 1 | H | CH(Me) | Me | Et | H | Me |
| B-0353 | 1 | Me | CH(Me) | H | Et | H | Me |
| B-0354 | 1 | Me | CH(Me) | Me | Et | H | Me |
| B-0355 | 1 | H | $CH_2CH_2$ | Me | Et | H | Me |
| B-0356 | 1 | Me | $CH_2CH_2$ | H | Et | H | Me |
| B-0357 | 1 | Me | $CH_2CH_2$ | Me | Et | H | Me |
| B-0358 | 1 | H | $CH_2CH(Me)$ | H | Et | H | Me |
| B-0359 | 1 | H | $CH_2CH(Me)$ | Me | Et | H | Me |
| B-0360 | 1 | Me | $CH_2CH(Me)$ | H | Et | H | Me |
| B-0361 | 1 | Me | $CH_2CH(Me)$ | Me | Et | H | Me |
| B-0362 | 1 | H | $CH(Me)CH_2$ | H | Et | H | Me |
| B-0363 | 1 | H | $CH(Me)CH_2$ | Me | Et | H | Me |
| B-0364 | 1 | Me | $CH(Me)CH_2$ | H | Et | H | Me |
| B-0365 | 1 | Me | $CH(Me)CH_2$ | Me | Et | H | Me |
| B-0366 | 1 | H | $CH_2CH_2CH_2$ | Me | Et | H | Me |
| B-0367 | 1 | Me | $CH_2CH_2CH_2$ | H | Et | H | Me |
| B-0368 | 1 | Me | $CH_2CH_2CH_2$ | Me | Et | H | Me |
| B-0369 | 1 | H | $CH_2CH_2CH(Me)$ | H | Et | H | Me |
| B-0370 | 1 | H | $CH_2CH_2CH(Me)$ | Me | Et | H | Me |
| B-0371 | 1 | Me | $CH_2CH_2CH(Me)$ | H | Et | H | Me |
| B-0372 | 1 | Me | $CH_2CH_2CH(Me)$ | Me | Et | H | Me |
| B-0373 | 1 | H | $CH_2CH(Me)CH_2$ | H | Et | H | Me |
| B-0374 | 1 | H | $CH_2CH(Me)CH_2$ | Me | Et | H | Me |
| B-0375 | 1 | Me | $CH_2CH(Me)CH_2$ | H | Et | H | Me |
| B-0376 | 1 | Me | $CH_2CH(Me)CH_2$ | Me | Et | H | Me |
| B-0377 | 1 | H | $CH(Me)CH_2CH_2$ | H | Et | H | Me |
| B-0378 | 1 | H | $CH(Me)CH_2CH_2$ | Me | Et | H | Me |
| B-0379 | 1 | Me | $CH(Me)CH_2CH_2$ | H | Et | H | Me |
| B-0380 | 1 | Me | $CH(Me)CH_2CH_2$ | Me | Et | H | Me |
| B-0381 | 1 | H | single bond | Me | c-Pr | H | Cl |
| B-0382 | 1 | H | single bond | Et | c-Pr | H | Cl |
| B-0383 | 1 | Me | single bond | H | c-Pr | H | Cl |
| B-0384 | 1 | Et | single bond | H | c-Pr | H | Cl |
| B-0385 | 1 | Me | single bond | Me | c-Pr | H | Cl |
| B-0386 | 1 | H | $CH_2$ | Me | c-Pr | H | Cl |
| B-0387 | 1 | Me | $CH_2$ | H | c-Pr | H | Cl |
| B-0388 | 1 | Me | $CH_2$ | Me | c-Pr | H | Cl |
| B-0389 | 1 | H | CH(Me) | H | c-Pr | H | Cl |
| B-0390 | 1 | H | CH(Me) | Me | c-Pr | H | Cl |

TABLE 173

| Compound Number | n | Y | W | Z | $R^1$ | $R^2$ | $R^3$ |
|---|---|---|---|---|---|---|---|
| B-0391 | 1 | Me | CH(Me) | H | c-Pr | H | Cl |
| B-0392 | 1 | Me | CH(Me) | Me | c-Pr | H | Cl |
| B-0393 | 1 | H | $CH_2CH_2$ | Me | c-Pr | H | Cl |
| B-0394 | 1 | Me | $CH_2CH_2$ | H | c-Pr | H | Cl |
| B-0395 | 1 | Me | $CH_2CH_2$ | Me | c-Pr | H | Cl |
| B-0396 | 1 | H | $CH_2CH(Me)$ | H | c-Pr | H | Cl |
| B-0397 | 1 | H | $CH_2CH(Me)$ | Me | c-Pr | H | Cl |
| B-0398 | 1 | Me | $CH_2CH(Me)$ | H | c-Pr | H | Cl |
| B-0399 | 1 | Me | $CH_2CH(Me)$ | Me | c-Pr | H | Cl |
| B-0400 | 1 | H | $CH(Me)CH_2$ | H | c-Pr | H | Cl |
| B-0401 | 1 | H | $CH(Me)CH_2$ | Me | c-Pr | H | Cl |
| B-0402 | 1 | Me | $CH(Me)CH_2$ | H | c-Pr | H | Cl |
| B-0403 | 1 | Me | $CH(Me)CH_2$ | Me | c-Pr | H | Cl |
| B-0404 | 1 | H | $CH_2CH_2CH_2$ | Me | c-Pr | H | Cl |
| B-0405 | 1 | Me | $CH_2CH_2CH_2$ | H | c-Pr | H | Cl |
| B-0406 | 1 | Me | $CH_2CH_2CH_2$ | Me | c-Pr | H | Cl |
| B-0407 | 1 | H | $CH_2CH_2CH(Me)$ | H | c-Pr | H | Cl |
| B-0408 | 1 | H | $CH_2CH_2CH(Me)$ | Me | c-Pr | H | Cl |
| B-0409 | 1 | Me | $CH_2CH_2CH(Me)$ | H | c-Pr | H | Cl |
| B-0410 | 1 | Me | $CH_2CH_2CH(Me)$ | Me | c-Pr | H | Cl |
| B-0411 | 1 | H | $CH_2CH(Me)CH_2$ | H | c-Pr | H | Cl |
| B-0412 | 1 | H | $CH_2CH(Me)CH_2$ | Me | c-Pr | H | Cl |
| B-0413 | 1 | Me | $CH_2CH(Me)CH_2$ | H | c-Pr | H | Cl |
| B-0414 | 1 | Me | $CH_2CH(Me)CH_2$ | Me | c-Pr | H | Cl |
| B-0415 | 1 | H | $CH(Me)CH_2CH_2$ | H | c-Pr | H | Cl |
| B-0416 | 1 | H | $CH(Me)CH_2CH_2$ | Me | c-Pr | H | Cl |
| B-0417 | 1 | Me | $CH(Me)CH_2CH_2$ | H | c-Pr | H | Cl |
| B-0418 | 1 | Me | $CH(Me)CH_2CH_2$ | Me | c-Pr | H | Cl |
| B-0419 | 1 | H | single bond | Me | c-Pr | H | Me |
| B-0420 | 1 | H | single bond | Et | c-Pr | H | Me |
| B-0421 | 1 | Me | single bond | H | c-Pr | H | Me |
| B-0422 | 1 | Et | single bond | H | c-Pr | H | Me |
| B-0423 | 1 | Me | single bond | Me | c-Pr | H | Me |
| B-0424 | 1 | H | $CH_2$ | Me | c-Pr | H | Me |
| B-0425 | 1 | Me | $CH_2$ | H | c-Pr | H | Me |
| B-0426 | 1 | Me | $CH_2$ | Me | c-Pr | H | Me |
| B-0427 | 1 | H | CH(Me) | H | c-Pr | H | Me |
| B-0428 | 1 | H | CH(Me) | Me | c-Pr | H | Me |
| B-0429 | 1 | Me | CH(Me) | H | c-Pr | H | Me |
| B-0430 | 1 | Me | CH(Me) | Me | c-Pr | H | Me |
| B-0431 | 1 | H | $CH_2CH_2$ | Me | c-Pr | H | Me |
| B-0432 | 1 | Me | $CH_2CH_2$ | H | c-Pr | H | Me |
| B-0433 | 1 | Me | $CH_2CH_2$ | Me | c-Pr | H | Me |
| B-0434 | 1 | H | $CH_2CH(Me)$ | H | c-Pr | H | Me |

TABLE 174

| Compound Number | n | Y | W | Z | $R^1$ | $R^2$ | $R^3$ |
|---|---|---|---|---|---|---|---|
| B-0435 | 1 | H | $CH_2CH(Me)$ | Me | c-Pr | H | Me |
| B-0436 | 1 | Me | $CH_2CH(Me)$ | H | c-Pr | H | Me |
| B-0437 | 1 | Me | $CH_2CH(Me)$ | Me | c-Pr | H | Me |
| B-0438 | 1 | H | $CH(Me)CH_2$ | H | c-Pr | H | Me |
| B-0439 | 1 | H | $CH(Me)CH_2$ | Me | c-Pr | H | Me |
| B-0440 | 1 | Me | $CH(Me)CH_2$ | H | c-Pr | H | Me |
| B-0441 | 1 | Me | $CH(Me)CH_2$ | Me | c-Pr | H | Me |
| B-0442 | 1 | H | $CH_2CH_2CH_2$ | Me | c-Pr | H | Me |
| B-0443 | 1 | Me | $CH_2CH_2CH_2$ | H | c-Pr | H | Me |
| B-0444 | 1 | Me | $CH_2CH_2CH_2$ | Me | c-Pr | H | Me |
| B-0445 | 1 | H | $CH_2CH_2CH(Me)$ | H | c-Pr | H | Me |
| B-0446 | 1 | H | $CH_2CH_2CH(Me)$ | Me | c-Pr | H | Me |
| B-0447 | 1 | Me | $CH_2CH_2CH(Me)$ | H | c-Pr | H | Me |
| B-0448 | 1 | Me | $CH_2CH_2CH(Me)$ | Me | c-Pr | H | Me |
| B-0449 | 1 | H | $CH_2CH(Me)CH_2$ | H | c-Pr | H | Me |
| B-0450 | 1 | H | $CH_2CH(Me)CH_2$ | Me | c-Pr | H | Me |
| B-0451 | 1 | Me | $CH_2CH(Me)CH_2$ | H | c-Pr | H | Me |
| B-0452 | 1 | Me | $CH_2CH(Me)CH_2$ | Me | c-Pr | H | Me |
| B-0453 | 1 | H | $CH(Me)CH_2CH_2$ | H | c-Pr | H | Me |
| B-0454 | 1 | H | $CH(Me)CH_2CH_2$ | Me | c-Pr | H | Me |
| B-0455 | 1 | Me | $CH(Me)CH_2CH_2$ | H | c-Pr | H | Me |
| B-0456 | 1 | Me | $CH(Me)CH_2CH_2$ | Me | c-Pr | H | Me |
| B-0457 | 2 | H | single bond | Me | $CH_2CF_3$ | H | Cl |
| B-0458 | 2 | H | single bond | Et | $CH_2CF_3$ | H | Cl |

TABLE 174-continued

| Compound Number | n | Y | W | Z | $R^1$ | $R^2$ | $R^3$ |
|---|---|---|---|---|---|---|---|
| B-0459 | 2 | Me | single bond | H | $CH_2CF_3$ | H | Cl |
| B-0460 | 2 | Et | single bond | H | $CH_2CF_3$ | H | Cl |
| B-0461 | 2 | Me | single bond | Me | $CH_2CF_3$ | H | Cl |
| B-0462 | 2 | H | $CH_2$ | Me | $CH_2CF_3$ | H | Cl |
| B-0463 | 2 | Me | $CH_2$ | H | $CH_2CF_3$ | H | Cl |
| B-0464 | 2 | Me | $CH_2$ | Me | $CH_2CF_3$ | H | Cl |
| B-0465 | 2 | H | CH(Me) | H | $CH_2CF_3$ | H | Cl |
| B-0466 | 2 | H | CH(Me) | Me | $CH_2CF_3$ | H | Cl |
| B-0467 | 2 | Me | CH(Me) | H | $CH_2CF_3$ | H | Cl |
| B-0468 | 2 | Me | CH(Me) | Me | $CH_2CF_3$ | H | Cl |
| B-0469 | 2 | H | $CH_2CH_2$ | Me | $CH_2CF_3$ | H | Cl |
| B-0470 | 2 | Me | $CH_2CH_2$ | H | $CH_2CF_3$ | H | Cl |
| B-0471 | 2 | Me | $CH_2CH_2$ | Me | $CH_2CF_3$ | H | Cl |
| B-0472 | 2 | H | $CH_2CH(Me)$ | H | $CH_2CF_3$ | H | Cl |
| B-0473 | 2 | H | $CH_2CH(Me)$ | Me | $CH_2CF_3$ | H | Cl |
| B-0474 | 2 | Me | $CH_2CH(Me)$ | H | $CH_2CF_3$ | H | Cl |
| B-0475 | 2 | Me | $CH_2CH(Me)$ | Me | $CH_2CF_3$ | H | Cl |
| B-0476 | 2 | H | $CH(Me)CH_2$ | H | $CH_2CF_3$ | H | Cl |
| B-0477 | 2 | H | $CH(Me)CH_2$ | Me | $CH_2CF_3$ | H | Cl |
| B-0478 | 2 | Me | $CH(Me)CH_2$ | H | $CH_2CF_3$ | H | Cl |

TABLE 175

| Compound Number | n | Y | W | Z | $R^1$ | $R^2$ | $R^3$ |
|---|---|---|---|---|---|---|---|
| B-0479 | 2 | Me | $CH(Me)CH_2$ | Me | $CH_2CF_3$ | H | Cl |
| B-0480 | 2 | H | $CH_2CH_2CH_2$ | Me | $CH_2CF_3$ | H | Cl |
| B-0481 | 2 | Me | $CH_2CH_2CH_2$ | H | $CH_2CF_3$ | H | Cl |
| B-0482 | 2 | Me | $CH_2CH_2CH_2$ | Me | $CH_2CF_3$ | H | Cl |
| B-0483 | 2 | H | $CH_2CH_2CH(Me)$ | H | $CH_2CF_3$ | H | Cl |
| B-0484 | 2 | H | $CH_2CH_2CH(Me)$ | Me | $CH_2CF_3$ | H | Cl |
| B-0485 | 2 | Me | $CH_2CH_2CH(Me)$ | H | $CH_2CF_3$ | H | Cl |
| B-0486 | 2 | Me | $CH_2CH_2CH(Me)$ | Me | $CH_2CF_3$ | H | Cl |
| B-0487 | 2 | H | $CH_2CH(Me)CH_2$ | H | $CH_2CF_3$ | H | Cl |
| B-0488 | 2 | H | $CH_2CH(Me)CH_2$ | Me | $CH_2CF_3$ | H | Cl |
| B-0489 | 2 | Me | $CH_2CH(Me)CH_2$ | H | $CH_2CF_3$ | H | Cl |
| B-0490 | 2 | Me | $CH_2CH(Me)CH_2$ | Me | $CH_2CF_3$ | H | Cl |
| B-0491 | 2 | H | $CH(Me)CH_2CH_2$ | H | $CH_2CF_3$ | H | Cl |
| B-0492 | 2 | H | $CH(Me)CH_2CH_2$ | Me | $CH_2CF_3$ | H | Cl |
| B-0493 | 2 | Me | $CH(Me)CH_2CH_2$ | H | $CH_2CF_3$ | H | Cl |
| B-0494 | 2 | Me | $CH(Me)CH_2CH_2$ | Me | $CH_2CF_3$ | H | Cl |
| B-0495 | 2 | H | single bond | Me | $CH_2CF_3$ | H | Me |
| B-0496 | 2 | H | single bond | Et | $CH_2CF_3$ | H | Me |
| B-0497 | 2 | Me | single bond | H | $CH_2CF_3$ | H | Me |
| B-0498 | 2 | Et | single bond | H | $CH_2CF_3$ | H | Me |
| B-0499 | 2 | Me | single bond | Me | $CH_2CF_3$ | H | Me |
| B-0500 | 2 | H | $CH_2$ | Me | $CH_2CF_3$ | H | Me |
| B-0501 | 2 | Me | $CH_2$ | H | $CH_2CF_3$ | H | Me |
| B-0502 | 2 | Me | $CH_2$ | Me | $CH_2CF_3$ | H | Me |
| B-0503 | 2 | H | CH(Me) | H | $CH_2CF_3$ | H | Me |
| B-0504 | 2 | H | CH(Me) | Me | $CH_2CF_3$ | H | Me |
| B-0505 | 2 | Me | CH(Me) | H | $CH_2CF_3$ | H | Me |
| B-0506 | 2 | Me | CH(Me) | Me | $CH_2CF_3$ | H | Me |
| B-0507 | 2 | H | $CH_2CH_2$ | Me | $CH_2CF_3$ | H | Me |
| B-0508 | 2 | Me | $CH_2CH_2$ | H | $CH_2CF_3$ | H | Me |
| B-0509 | 2 | Me | $CH_2CH_2$ | Me | $CH_2CF_3$ | H | Me |
| B-0510 | 2 | H | $CH_2CH(Me)$ | H | $CH_2CF_3$ | H | Me |
| B-0511 | 2 | H | $CH_2CH(Me)$ | Me | $CH_2CF_3$ | H | Me |
| B-0512 | 2 | Me | $CH_2CH(Me)$ | H | $CH_2CF_3$ | H | Me |
| B-0513 | 2 | Me | $CH_2CH(Me)$ | Me | $CH_2CF_3$ | H | Me |
| B-0514 | 2 | H | $CH(Me)CH_2$ | H | $CH_2CF_3$ | H | Me |
| B-0515 | 2 | H | $CH(Me)CH_2$ | Me | $CH_2CF_3$ | H | Me |
| B-0516 | 2 | Me | $CH(Me)CH_2$ | H | $CH_2CF_3$ | H | Me |
| B-0517 | 2 | Me | $CH(Me)CH_2$ | Me | $CH_2CF_3$ | H | Me |
| B-0518 | 2 | H | $CH_2CH_2CH_2$ | Me | $CH_2CF_3$ | H | Me |
| B-0519 | 2 | Me | $CH_2CH_2CH_2$ | H | $CH_2CF_3$ | H | Me |
| B-0520 | 2 | Me | $CH_2CH_2CH_2$ | Me | $CH_2CF_3$ | H | Me |
| B-0521 | 2 | H | $CH_2CH_2CH(Me)$ | H | $CH_2CF_3$ | H | Me |
| B-0522 | 2 | H | $CH_2CH_2CH(Me)$ | Me | $CH_2CF_3$ | H | Me |

TABLE 176

| Compound Number | n | Y | W | Z | $R^1$ | $R^2$ | $R^3$ |
|---|---|---|---|---|---|---|---|
| B-0523 | 2 | Me | $CH_2CH_2CH(Me)$ | H | $CH_2CF_3$ | H | Me |
| B-0524 | 2 | Me | $CH_2CH_2CH(Me)$ | Me | $CH_2CF_3$ | H | Me |
| B-0525 | 2 | H | $CH_2CH(Me)CH_2$ | H | $CH_2CF_3$ | H | Me |
| B-0526 | 2 | H | $CH_2CH(Me)CH_2$ | Me | $CH_2CF_3$ | H | Me |
| B-0527 | 2 | Me | $CH_2CH(Me)CH_2$ | H | $CH_2CF_3$ | H | Me |
| B-0528 | 2 | Me | $CH_2CH(Me)CH_2$ | Me | $CH_2CF_3$ | H | Me |
| B-0529 | 2 | H | $CH(Me)CH_2CH_2$ | H | $CH_2CF_3$ | H | Me |
| B-0530 | 2 | H | $CH(Me)CH_2CH_2$ | Me | $CH_2CF_3$ | H | Me |
| B-0531 | 2 | Me | $CH(Me)CH_2CH_2$ | H | $CH_2CF_3$ | H | Me |
| B-0532 | 2 | Me | $CH(Me)CH_2CH_2$ | Me | $CH_2CF_3$ | H | Me |
| B-0533 | 2 | H | single bond | Me | Et | H | Cl |
| B-0534 | 2 | H | single bond | Et | Et | H | Cl |
| B-0535 | 2 | Me | single bond | H | Et | H | Cl |
| B-0536 | 2 | Et | single bond | H | Et | H | Cl |
| B-0537 | 2 | Me | single bond | Me | Et | H | Cl |
| B-0538 | 2 | H | $CH_2$ | Me | Et | H | Cl |
| B-0539 | 2 | Me | $CH_2$ | H | Et | H | Cl |
| B-0540 | 2 | Me | $CH_2$ | Me | Et | H | Cl |
| B-0541 | 2 | H | CH(Me) | H | Et | H | Cl |
| B-0542 | 2 | H | CH(Me) | Me | Et | H | Cl |
| B-0543 | 2 | Me | CH(Me) | H | Et | H | Cl |
| B-0544 | 2 | Me | CH(Me) | Me | Et | H | Cl |
| B-0545 | 2 | H | $CH_2CH_2$ | Me | Et | H | Cl |
| B-0546 | 2 | Me | $CH_2CH_2$ | H | Et | H | Cl |
| B-0547 | 2 | Me | $CH_2CH_2$ | Me | Et | H | Cl |
| B-0548 | 2 | H | $CH_2CH(Me)$ | H | Et | H | Cl |
| B-0549 | 2 | H | $CH_2CH(Me)$ | Me | Et | H | Cl |
| B-0550 | 2 | Me | $CH_2CH(Me)$ | H | Et | H | Cl |
| B-0551 | 2 | Me | $CH_2CH(Me)$ | Me | Et | H | Cl |
| B-0552 | 2 | H | $CH(Me)CH_2$ | H | Et | H | Cl |
| B-0553 | 2 | H | $CH(Me)CH_2$ | Me | Et | H | Cl |
| B-0554 | 2 | Me | $CH(Me)CH_2$ | H | Et | H | Cl |
| B-0555 | 2 | Me | $CH(Me)CH_2$ | Me | Et | H | Cl |
| B-0556 | 2 | H | $CH_2CH_2CH_2$ | Me | Et | H | Cl |
| B-0557 | 2 | Me | $CH_2CH_2CH_2$ | H | Et | H | Cl |
| B-0558 | 2 | Me | $CH_2CH_2CH_2$ | Me | Et | H | Cl |
| B-0559 | 2 | H | $CH_2CH_2CH(Me)$ | H | Et | H | Cl |
| B-0560 | 2 | H | $CH_2CH_2CH(Me)$ | Me | Et | H | Cl |
| B-0561 | 2 | Me | $CH_2CH_2CH(Me)$ | H | Et | H | Cl |
| B-0562 | 2 | Me | $CH_2CH_2CH(Me)$ | Me | Et | H | Cl |
| B-0563 | 2 | H | $CH_2CH(Me)CH_2$ | H | Et | H | Cl |
| B-0564 | 2 | H | $CH_2CH(Me)CH_2$ | Me | Et | H | Cl |
| B-0565 | 2 | Me | $CH_2CH(Me)CH_2$ | H | Et | H | Cl |
| B-0566 | 2 | Me | $CH_2CH(Me)CH_2$ | Me | Et | H | Cl |

TABLE 177

| Compound Number | n | Y | W | Z | $R^1$ | $R^2$ | $R^3$ |
|---|---|---|---|---|---|---|---|
| B-0567 | 2 | H | $CH(Me)CH_2CH_2$ | H | Et | H | Cl |
| B-0568 | 2 | H | $CH(Me)CH_2CH_2$ | Me | Et | H | Cl |
| B-0569 | 2 | Me | $CH(Me)CH_2CH_2$ | H | Et | H | Cl |
| B-0570 | 2 | Me | $CH(Me)CH_2CH_2$ | Me | Et | H | Cl |
| B-0571 | 2 | H | single bond | Me | Et | H | Me |
| B-0572 | 2 | H | single bond | Et | Et | H | Me |
| B-0573 | 2 | Me | single bond | H | Et | H | Me |
| B-0574 | 2 | Et | single bond | H | Et | H | Me |
| B-0575 | 2 | Me | single bond | Me | Et | H | Me |
| B-0576 | 2 | H | $CH_2$ | Me | Et | H | Me |
| B-0577 | 2 | Me | $CH_2$ | H | Et | H | Me |
| B-0578 | 2 | Me | $CH_2$ | Me | Et | H | Me |
| B-0579 | 2 | H | CH(Me) | H | Et | H | Me |
| B-0580 | 2 | H | CH(Me) | Me | Et | H | Me |
| B-0581 | 2 | Me | CH(Me) | H | Et | H | Me |
| B-0582 | 2 | Me | CH(Me) | Me | Et | H | Me |
| B-0583 | 2 | H | $CH_2CH_2$ | Me | Et | H | Me |
| B-0584 | 2 | Me | $CH_2CH_2$ | H | Et | H | Me |
| B-0585 | 2 | Me | $CH_2CH_2$ | Me | Et | H | Me |
| B-0586 | 2 | H | $CH_2CH(Me)$ | H | Et | H | Me |
| B-0587 | 2 | H | $CH_2CH(Me)$ | Me | Et | H | Me |
| B-0588 | 2 | Me | $CH_2CH(Me)$ | H | Et | H | Me |
| B-0589 | 2 | Me | $CH_2CH(Me)$ | Me | Et | H | Me |
| B-0590 | 2 | H | $CH(Me)CH_2$ | H | Et | H | Me |

TABLE 177-continued

| Compound Number | n | Y | W | Z | $R^1$ | $R^2$ | $R^3$ |
|---|---|---|---|---|---|---|---|
| B-0591 | 2 | H | $CH(Me)CH_2$ | Me | Et | H | Me |
| B-0592 | 2 | Me | $CH(Me)CH_2$ | H | Et | H | Me |
| B-0593 | 2 | Me | $CH(Me)CH_2$ | Me | Et | H | Me |
| B-0594 | 2 | H | $CH_2CH_2CH_2$ | Me | Et | H | Me |
| B-0595 | 2 | Me | $CH_2CH_2CH_2$ | H | Et | H | Me |
| B-0596 | 2 | Me | $CH_2CH_2CH_2$ | Me | Et | H | Me |
| B-0597 | 2 | H | $CH_2CH_2CH(Me)$ | H | Et | H | Me |
| B-0598 | 2 | H | $CH_2CH_2CH(Me)$ | Me | Et | H | Me |
| B-0599 | 2 | Me | $CH_2CH_2CH(Me)$ | H | Et | H | Me |
| B-0600 | 2 | Me | $CH_2CH_2CH(Me)$ | Me | Et | H | Me |
| B-0601 | 2 | H | $CH_2CH(Me)CH_2$ | H | Et | H | Me |
| B-0602 | 2 | H | $CH_2CH(Me)CH_2$ | Me | Et | H | Me |
| B-0603 | 2 | Me | $CH_2CH(Me)CH_2$ | H | Et | H | Me |
| B-0604 | 2 | Me | $CH_2CH(Me)CH_2$ | Me | Et | H | Me |
| B-0605 | 2 | H | $CH(Me)CH_2CH_2$ | H | Et | H | Me |
| B-0606 | 2 | H | $CH(Me)CH_2CH_2$ | Me | Et | H | Me |
| B-0607 | 2 | Me | $CH(Me)CH_2CH_2$ | H | Et | H | Me |
| B-0608 | 2 | Me | $CH(Me)CH_2CH_2$ | Me | Et | H | Me |
| B-0609 | 2 | H | single bond | Me | c-Pr | H | Cl |
| B-0610 | 2 | H | single bond | Et | c-Pr | H | Cl |

TABLE 178

| Compound Number | n | Y | W | Z | $R^1$ | $R^2$ | $R^3$ |
|---|---|---|---|---|---|---|---|
| B-0611 | 2 | Me | single bond | H | c-Pr | H | Cl |
| B-0612 | 2 | Et | single bond | H | c-Pr | H | Cl |
| B-0613 | 2 | Me | single bond | Me | c-Pr | H | Cl |
| B-0614 | 2 | H | $CH_2$ | Me | c-Pr | H | Cl |
| B-0615 | 2 | Me | $CH_2$ | H | c-Pr | H | Cl |
| B-0616 | 2 | Me | $CH_2$ | Me | c-Pr | H | Cl |
| B-0617 | 2 | H | CH(Me) | H | c-Pr | H | Cl |
| B-0618 | 2 | H | CH(Me) | Me | c-Pr | H | Cl |
| B-0619 | 2 | Me | CH(Me) | H | c-Pr | H | Cl |
| B-0620 | 2 | Me | CH(Me) | Me | c-Pr | H | Cl |
| B-0621 | 2 | H | $CH_2CH_2$ | Me | c-Pr | H | Cl |
| B-0622 | 2 | Me | $CH_2CH_2$ | H | c-Pr | H | Cl |
| B-0623 | 2 | Me | $CH_2CH_2$ | Me | c-Pr | H | Cl |
| B-0624 | 2 | H | $CH_2CH(Me)$ | H | c-Pr | H | Cl |
| B-0625 | 2 | H | $CH_2CH(Me)$ | Me | c-Pr | H | Cl |
| B-0626 | 2 | Me | $CH_2CH(Me)$ | H | c-Pr | H | Cl |
| B-0627 | 2 | Me | $CH_2CH(Me)$ | Me | c-Pr | H | Cl |
| B-0628 | 2 | H | $CH(Me)CH_2$ | H | c-Pr | H | Cl |
| B-0629 | 2 | H | $CH(Me)CH_2$ | Me | c-Pr | H | Cl |
| B-0630 | 2 | Me | $CH(Me)CH_2$ | H | c-Pr | H | Cl |
| B-0631 | 2 | Me | $CH(Me)CH_2$ | Me | c-Pr | H | Cl |
| B-0632 | 2 | H | $CH_2CH_2CH_2$ | Me | c-Pr | H | Cl |
| B-0633 | 2 | Me | $CH_2CH_2CH_2$ | H | c-Pr | H | Cl |
| B-0634 | 2 | Me | $CH_2CH_2CH_2$ | Me | c-Pr | H | Cl |
| B-0635 | 2 | H | $CH_2CH_2CH(Me)$ | H | c-Pr | H | Cl |
| B-0636 | 2 | H | $CH_2CH_2CH(Me)$ | Me | c-Pr | H | Cl |
| B-0637 | 2 | Me | $CH_2CH_2CH(Me)$ | H | c-Pr | H | Cl |
| B-0638 | 2 | Me | $CH_2CH_2CH(Me)$ | Me | c-Pr | H | Cl |
| B-0639 | 2 | H | $CH_2CH(Me)CH_2$ | H | c-Pr | H | Cl |
| B-0640 | 2 | H | $CH_2CH(Me)CH_2$ | Me | c-Pr | H | Cl |
| B-0641 | 2 | Me | $CH_2CH(Me)CH_2$ | H | c-Pr | H | Cl |
| B-0642 | 2 | Me | $CH_2CH(Me)CH_2$ | Me | c-Pr | H | Cl |
| B-0643 | 2 | H | $CH(Me)CH_2CH_2$ | H | c-Pr | H | Cl |
| B-0644 | 2 | H | $CH(Me)CH_2CH_2$ | Me | c-Pr | H | Cl |
| B-0645 | 2 | Me | $CH(Me)CH_2CH_2$ | H | c-Pr | H | Cl |
| B-0646 | 2 | Me | $CH(Me)CH_2CH_2$ | Me | c-Pr | H | Cl |
| B-0647 | 2 | H | single bond | Me | c-Pr | H | Me |
| B-0648 | 2 | H | single bond | Et | c-Pr | H | Me |
| B-0649 | 2 | Me | single bond | H | c-Pr | H | Me |
| B-0650 | 2 | Et | single bond | H | c-Pr | H | Me |
| B-0651 | 2 | Me | single bond | Me | c-Pr | H | Me |
| B-0652 | 2 | H | $CH_2$ | Me | c-Pr | H | Me |
| B-0653 | 2 | Me | $CH_2$ | H | c-Pr | H | Me |
| B-0654 | 2 | Me | $CH_2$ | Me | c-Pr | H | Me |

TABLE 179

| Compound Number | n | Y | W | Z | $R^1$ | $R^2$ | $R^3$ |
|---|---|---|---|---|---|---|---|
| B-0655 | 2 | H | CH(Me) | H | c-Pr | H | Me |
| B-0656 | 2 | H | CH(Me) | Me | c-Pr | H | Me |
| B-0657 | 2 | Me | CH(Me) | H | c-Pr | H | Me |
| B-0658 | 2 | Me | CH(Me) | Me | c-Pr | H | Me |
| B-0659 | 2 | H | $CH_2CH_2$ | Me | c-Pr | H | Me |
| B-0660 | 2 | Me | $CH_2CH_2$ | H | c-Pr | H | Me |
| B-0661 | 2 | Me | $CH_2CH_2$ | Me | c-Pr | H | Me |
| B-0662 | 2 | H | $CH_2CH(Me)$ | H | c-Pr | H | Me |
| B-0663 | 2 | H | $CH_2CH(Me)$ | Me | c-Pr | H | Me |
| B-0664 | 2 | Me | $CH_2CH(Me)$ | H | c-Pr | H | Me |
| B-0665 | 2 | Me | $CH_2CH(Me)$ | Me | c-Pr | H | Me |
| B-0666 | 2 | H | $CH(Me)CH_2$ | H | c-Pr | H | Me |
| B-0667 | 2 | H | $CH(Me)CH_2$ | Me | c-Pr | H | Me |
| B-0668 | 2 | Me | $CH(Me)CH_2$ | H | c-Pr | H | Me |
| B-0669 | 2 | Me | $CH(Me)CH_2$ | Me | c-Pr | H | Me |
| B-0670 | 2 | H | $CH_2CH_2CH_2$ | Me | c-Pr | H | Me |
| B-0671 | 2 | Me | $CH_2CH_2CH_2$ | H | c-Pr | H | Me |
| B-0672 | 2 | Me | $CH_2CH_2CH_2$ | Me | c-Pr | H | Me |
| B-0673 | 2 | H | $CH_2CH_2CH(Me)$ | H | c-Pr | H | Me |
| B-0674 | 2 | H | $CH_2CH_2CH(Me)$ | Me | c-Pr | H | Me |
| B-0675 | 2 | Me | $CH_2CH_2CH(Me)$ | H | c-Pr | H | Me |
| B-0676 | 2 | Me | $CH_2CH_2CH(Me)$ | Me | c-Pr | H | Me |
| B-0677 | 2 | H | $CH_2CH(Me)CH_2$ | H | c-Pr | H | Me |
| B-0678 | 2 | H | $CH_2CH(Me)CH_2$ | Me | c-Pr | H | Me |
| B-0679 | 2 | Me | $CH_2CH(Me)CH_2$ | H | c-Pr | H | Me |
| B-0680 | 2 | Me | $CH_2CH(Me)CH_2$ | Me | c-Pr | H | Me |
| B-0681 | 2 | H | $CH(Me)CH_2CH_2$ | H | c-Pr | H | Me |
| B-0682 | 2 | H | $CH(Me)CH_2CH_2$ | Me | c-Pr | H | Me |
| B-0683 | 2 | Me | $CH(Me)CH_2CH_2$ | H | c-Pr | H | Me |
| B-0684 | 2 | Me | $CH(Me)CH_2CH_2$ | Me | c-Pr | H | Me |
| B-0685 | 0 | H | single bond | Me | $CH_2CF_3$ | Me | Cl |
| B-0686 | 0 | H | single bond | Et | $CH_2CF_3$ | Me | Cl |
| B-0687 | 0 | Me | single bond | H | $CH_2CF_3$ | Me | Cl |
| B-0688 | 0 | Et | single bond | H | $CH_2CF_3$ | Me | Cl |
| B-0689 | 0 | Me | single bond | Me | $CH_2CF_3$ | Me | Cl |
| B-0690 | 0 | H | $CH_2$ | Me | $CH_2CF_3$ | Me | Cl |
| B-0691 | 0 | Me | $CH_2$ | H | $CH_2CF_3$ | Me | Cl |
| B-0692 | 0 | Me | $CH_2$ | Me | $CH_2CF_3$ | Me | Cl |
| B-0693 | 0 | H | CH(Me) | H | $CH_2CF_3$ | Me | Cl |
| B-0694 | 0 | H | CH(Me) | Me | $CH_2CF_3$ | Me | Cl |
| B-0695 | 0 | Me | CH(Me) | H | $CH_2CF_3$ | Me | Cl |
| B-0696 | 0 | Me | CH(Me) | Me | $CH_2CF_3$ | Me | Cl |
| B-0697 | 0 | H | $CH_2CH_2$ | Me | $CH_2CF_3$ | Me | Cl |
| B-0698 | 0 | Me | $CH_2CH_2$ | H | $CH_2CF_3$ | Me | Cl |

TABLE 180

| Compound Number | n | Y | W | Z | $R^1$ | $R^2$ | $R^3$ |
|---|---|---|---|---|---|---|---|
| B-0699 | 0 | Me | $CH_2CH_2$ | Me | $CH_2CF_3$ | Me | Cl |
| B-0700 | 0 | H | $CH_2CH(Me)$ | H | $CH_2CF_3$ | Me | Cl |
| B-0701 | 0 | H | $CH_2CH(Me)$ | Me | $CH_2CF_3$ | Me | Cl |
| B-0702 | 0 | Me | $CH_2CH(Me)$ | H | $CH_2CF_3$ | Me | Cl |
| B-0703 | 0 | Me | $CH_2CH(Me)$ | Me | $CH_2CF_3$ | Me | Cl |
| B-0704 | 0 | H | $CH(Me)CH_2$ | H | $CH_2CF_3$ | Me | Cl |
| B-0705 | 0 | H | $CH(Me)CH_2$ | Me | $CH_2CF_3$ | Me | Cl |
| B-0706 | 0 | Me | $CH(Me)CH_2$ | H | $CH_2CF_3$ | Me | Cl |
| B-0707 | 0 | Me | $CH(Me)CH_2$ | Me | $CH_2CF_3$ | Me | Cl |
| B-0708 | 0 | H | $CH_2CH_2CH_2$ | Me | $CH_2CF_3$ | Me | Cl |
| B-0709 | 0 | Me | $CH_2CH_2CH_2$ | H | $CH_2CF_3$ | Me | Cl |
| B-0710 | 0 | Me | $CH_2CH_2CH_2$ | Me | $CH_2CF_3$ | Me | Cl |
| B-0711 | 0 | H | $CH_2CH_2CH(Me)$ | H | $CH_2CF_3$ | Me | Cl |
| B-0712 | 0 | H | $CH_2CH_2CH(Me)$ | Me | $CH_2CF_3$ | Me | Cl |
| B-0713 | 0 | Me | $CH_2CH_2CH(Me)$ | H | $CH_2CF_3$ | Me | Cl |
| B-0714 | 0 | Me | $CH_2CH_2CH(Me)$ | Me | $CH_2CF_3$ | Me | Cl |
| B-0715 | 0 | H | $CH_2CH(Me)CH_2$ | H | $CH_2CF_3$ | Me | Cl |
| B-0716 | 0 | H | $CH_2CH(Me)CH_2$ | Me | $CH_2CF_3$ | Me | Cl |
| B-0717 | 0 | Me | $CH_2CH(Me)CH_2$ | H | $CH_2CF_3$ | Me | Cl |
| B-0718 | 0 | Me | $CH_2CH(Me)CH_2$ | Me | $CH_2CF_3$ | Me | Cl |
| B-0719 | 0 | H | $CH(Me)CH_2CH_2$ | H | $CH_2CF_3$ | Me | Cl |
| B-0720 | 0 | H | $CH(Me)CH_2CH_2$ | Me | $CH_2CF_3$ | Me | Cl |
| B-0721 | 0 | Me | $CH(Me)CH_2CH_2$ | H | $CH_2CF_3$ | Me | Cl |
| B-0722 | 0 | Me | $CH(Me)CH_2CH_2$ | Me | $CH_2CF_3$ | Me | Cl |

TABLE 180-continued

| Compound Number | n | Y | W | Z | $R^1$ | $R^2$ | $R^3$ |
|---|---|---|---|---|---|---|---|
| B-0723 | 0 | H | single bond | Me | $CH_2CF_3$ | Me | Me |
| B-0724 | 0 | H | single bond | Et | $CH_2CF_3$ | Me | Me |
| B-0725 | 0 | Me | single bond | H | $CH_2CF_3$ | Me | Me |
| B-0726 | 0 | Et | single bond | H | $CH_2CF_3$ | Me | Me |
| B-0727 | 0 | Me | single bond | Me | $CH_2CF_3$ | Me | Me |
| B-0728 | 0 | H | $CH_2$ | Me | $CH_2CF_3$ | Me | Me |
| B-0729 | 0 | Me | $CH_2$ | H | $CH_2CF_3$ | Me | Me |
| B-0730 | 0 | Me | $CH_2$ | Me | $CH_2CF_3$ | Me | Me |
| B-0731 | 0 | H | CH(Me) | H | $CH_2CF_3$ | Me | Me |
| B-0732 | 0 | H | CH(Me) | Me | $CH_2CF_3$ | Me | Me |
| B-0733 | 0 | Me | CH(Me) | H | $CH_2CF_3$ | Me | Me |
| B-0734 | 0 | Me | CH(Me) | Me | $CH_2CF_3$ | Me | Me |
| B-0735 | 0 | H | $CH_2CH_2$ | Me | $CH_2CF_3$ | Me | Me |
| B-0736 | 0 | Me | $CH_2CH_2$ | H | $CH_2CF_3$ | Me | Me |
| B-0737 | 0 | Me | $CH_2CH_2$ | Me | $CH_2CF_3$ | Me | Me |
| B-0738 | 0 | H | $CH_2CH(Me)$ | H | $CH_2CF_3$ | Me | Me |
| B-0739 | 0 | H | $CH_2CH(Me)$ | Me | $CH_2CF_3$ | Me | Me |
| B-0740 | 0 | Me | $CH_2CH(Me)$ | H | $CH_2CF_3$ | Me | Me |
| B-0741 | 0 | Me | $CH_2CH(Me)$ | Me | $CH_2CF_3$ | Me | Me |
| B-0742 | 0 | H | $CH(Me)CH_2$ | H | $CH_2CF_3$ | Me | Me |

TABLE 181

| Compound Number | n | Y | W | Z | $R^1$ | $R^2$ | $R^3$ |
|---|---|---|---|---|---|---|---|
| B-0743 | 0 | H | $CH(Me)CH_2$ | Me | $CH_2CF_3$ | Me | Me |
| B-0744 | 0 | Me | $CH(Me)CH_2$ | H | $CH_2CF_3$ | Me | Me |
| B-0745 | 0 | Me | $CH(Me)CH_2$ | Me | $CH_2CF_3$ | Me | Me |
| B-0746 | 0 | H | $CH_2CH_2CH_2$ | Me | $CH_2CF_3$ | Me | Me |
| B-0747 | 0 | Me | $CH_2CH_2CH_2$ | H | $CH_2CF_3$ | Me | Me |
| B-0748 | 0 | Me | $CH_2CH_2CH_2$ | Me | $CH_2CF_3$ | Me | Me |
| B-0749 | 0 | H | $CH_2CH_2CH(Me)$ | H | $CH_2CF_3$ | Me | Me |
| B-0750 | 0 | H | $CH_2CH_2CH(Me)$ | Me | $CH_2CF_3$ | Me | Me |
| B-0751 | 0 | Me | $CH_2CH_2CH(Me)$ | H | $CH_2CF_3$ | Me | Me |
| B-0752 | 0 | Me | $CH_2CH_2CH(Me)$ | Me | $CH_2CF_3$ | Me | Me |
| B-0753 | 0 | H | $CH_2CH(Me)CH_2$ | H | $CH_2CF_3$ | Me | Me |
| B-0754 | 0 | H | $CH_2CH(Me)CH_2$ | Me | $CH_2CF_3$ | Me | Me |
| B-0755 | 0 | Me | $CH_2CH(Me)CH_2$ | H | $CH_2CF_3$ | Me | Me |
| B-0756 | 0 | Me | $CH_2CH(Me)CH_2$ | Me | $CH_2CF_3$ | Me | Me |
| B-0757 | 0 | H | $CH(Me)CH_2CH_2$ | H | $CH_2CF_3$ | Me | Me |
| B-0758 | 0 | H | $CH(Me)CH_2CH_2$ | Me | $CH_2CF_3$ | Me | Me |
| B-0759 | 0 | Me | $CH(Me)CH_2CH_2$ | H | $CH_2CF_3$ | Me | Me |
| B-0760 | 0 | Me | $CH(Me)CH_2CH_2$ | Me | $CH_2CF_3$ | Me | Me |
| B-0761 | 0 | H | single bond | Me | $CH_2CF_3$ | Et | Cl |
| B-0762 | 0 | H | single bond | Et | $CH_2CF_3$ | Et | Cl |
| B-0763 | 0 | Me | single bond | H | $CH_2CF_3$ | Et | Cl |
| B-0764 | 0 | Et | single bond | H | $CH_2CF_3$ | Et | Cl |
| B-0765 | 0 | Me | single bond | Me | $CH_2CF_3$ | Et | Cl |
| B-0766 | 0 | H | $CH_2$ | Me | $CH_2CF_3$ | Et | Cl |
| B-0767 | 0 | Me | $CH_2$ | H | $CH_2CF_3$ | Et | Cl |
| B-0768 | 0 | Me | $CH_2$ | Me | $CH_2CF_3$ | Et | Cl |
| B-0769 | 0 | H | CH(Me) | H | $CH_2CF_3$ | Et | Cl |
| B-0770 | 0 | H | CH(Me) | Me | $CH_2CF_3$ | Et | Cl |
| B-0771 | 0 | Me | CH(Me) | H | $CH_2CF_3$ | Et | Cl |
| B-0772 | 0 | Me | CH(Me) | Me | $CH_2CF_3$ | Et | Cl |
| B-0773 | 0 | H | $CH_2CH_2$ | Me | $CH_2CF_3$ | Et | Cl |
| B-0774 | 0 | Me | $CH_2CH_2$ | H | $CH_2CF_3$ | Et | Cl |
| B-0775 | 0 | Me | $CH_2CH_2$ | Me | $CH_2CF_3$ | Et | Cl |
| B-0776 | 0 | H | $CH_2CH(Me)$ | H | $CH_2CF_3$ | Et | Cl |
| B-0777 | 0 | H | $CH_2CH(Me)$ | Me | $CH_2CF_3$ | Et | Cl |
| B-0778 | 0 | Me | $CH_2CH(Me)$ | H | $CH_2CF_3$ | Et | Cl |
| B-0779 | 0 | Me | $CH_2CH(Me)$ | Me | $CH_2CF_3$ | Et | Cl |
| B-0780 | 0 | H | $CH(Me)CH_2$ | H | $CH_2CF_3$ | Et | Cl |
| B-0781 | 0 | H | $CH(Me)CH_2$ | Me | $CH_2CF_3$ | Et | Cl |
| B-0782 | 0 | Me | $CH(Me)CH_2$ | H | $CH_2CF_3$ | Et | Cl |
| B-0783 | 0 | Me | $CH(Me)CH_2$ | Me | $CH_2CF_3$ | Et | Cl |
| B-0784 | 0 | H | $CH_2CH_2CH_2$ | Me | $CH_2CF_3$ | Et | Cl |
| B-0785 | 0 | Me | $CH_2CH_2CH_2$ | H | $CH_2CF_3$ | Et | Cl |
| B-0786 | 0 | Me | $CH_2CH_2CH_2$ | Me | $CH_2CF_3$ | Et | Cl |

TABLE 182

| Compound Number | n | Y | W | Z | $R^1$ | $R^2$ | $R^3$ |
|---|---|---|---|---|---|---|---|
| B-0787 | 0 | H | $CH_2CH_2CH(Me)$ | H | $CH_2CF_3$ | Et | Cl |
| B-0788 | 0 | H | $CH_2CH_2CH(Me)$ | Me | $CH_2CF_3$ | Et | Cl |
| B-0789 | 0 | Me | $CH_2CH_2CH(Me)$ | H | $CH_2CF_3$ | Et | Cl |
| B-0790 | 0 | Me | $CH_2CH_2CH(Me)$ | Me | $CH_2CF_3$ | Et | Cl |
| B-0791 | 0 | H | $CH_2CH(Me)CH_2$ | H | $CH_2CF_3$ | Et | Cl |
| B-0792 | 0 | H | $CH_2CH(Me)CH_2$ | Me | $CH_2CF_3$ | Et | Cl |
| B-0793 | 0 | Me | $CH_2CH(Me)CH_2$ | H | $CH_2CF_3$ | Et | Cl |
| B-0794 | 0 | Me | $CH_2CH(Me)CH_2$ | Me | $CH_2CF_3$ | Et | Cl |
| B-0795 | 0 | H | $CH(Me)CH_2CH_2$ | H | $CH_2CF_3$ | Et | Cl |
| B-0796 | 0 | H | $CH(Me)CH_2CH_2$ | Me | $CH_2CF_3$ | Et | Cl |
| B-0797 | 0 | Me | $CH(Me)CH_2CH_2$ | H | $CH_2CF_3$ | Et | Cl |
| B-0798 | 0 | Me | $CH(Me)CH_2CH_2$ | Me | $CH_2CF_3$ | Et | Cl |
| B-0799 | 0 | H | single bond | Me | $CH_2CF_3$ | Et | Me |
| B-0800 | 0 | H | single bond | Et | $CH_2CF_3$ | Et | Me |
| B-0801 | 0 | Me | single bond | H | $CH_2CF_3$ | Et | Me |
| B-0802 | 0 | Et | single bond | H | $CH_2CF_3$ | Et | Me |
| B-0803 | 0 | Me | single bond | Me | $CH_2CF_3$ | Et | Me |
| B-0804 | 0 | H | $CH_2$ | Me | $CH_2CF_3$ | Et | Me |
| B-0805 | 0 | Me | $CH_2$ | H | $CH_2CF_3$ | Et | Me |
| B-0806 | 0 | Me | $CH_2$ | Me | $CH_2CF_3$ | Et | Me |
| B-0807 | 0 | H | CH(Me) | H | $CH_2CF_3$ | Et | Me |
| B-0808 | 0 | H | CH(Me) | Me | $CH_2CF_3$ | Et | Me |
| B-0809 | 0 | Me | CH(Me) | H | $CH_2CF_3$ | Et | Me |
| B-0810 | 0 | Me | CH(Me) | Me | $CH_2CF_3$ | Et | Me |
| B-0811 | 0 | H | $CH_2CH_2$ | Me | $CH_2CF_3$ | Et | Me |
| B-0812 | 0 | Me | $CH_2CH_2$ | H | $CH_2CF_3$ | Et | Me |
| B-0813 | 0 | Me | $CH_2CH_2$ | Me | $CH_2CF_3$ | Et | Me |
| B-0814 | 0 | H | $CH_2CH(Me)$ | H | $CH_2CF_3$ | Et | Me |
| B-0815 | 0 | H | $CH_2CH(Me)$ | Me | $CH_2CF_3$ | Et | Me |
| B-0816 | 0 | Me | $CH_2CH(Me)$ | H | $CH_2CF_3$ | Et | Me |
| B-0817 | 0 | Me | $CH_2CH(Me)$ | Me | $CH_2CF_3$ | Et | Me |
| B-0818 | 0 | H | $CH(Me)CH_2$ | H | $CH_2CF_3$ | Et | Me |
| B-0819 | 0 | H | $CH(Me)CH_2$ | Me | $CH_2CF_3$ | Et | Me |
| B-0820 | 0 | Me | $CH(Me)CH_2$ | H | $CH_2CF_3$ | Et | Me |
| B-0821 | 0 | Me | $CH(Me)CH_2$ | Me | $CH_2CF_3$ | Et | Me |
| B-0822 | 0 | H | $CH_2CH_2CH_2$ | Me | $CH_2CF_3$ | Et | Me |
| B-0823 | 0 | Me | $CH_2CH_2CH_2$ | H | $CH_2CF_3$ | Et | Me |
| B-0824 | 0 | Me | $CH_2CH_2CH_2$ | Me | $CH_2CF_3$ | Et | Me |
| B-0825 | 0 | H | $CH_2CH_2CH(Me)$ | H | $CH_2CF_3$ | Et | Me |
| B-0826 | 0 | H | $CH_2CH_2CH(Me)$ | Me | $CH_2CF_3$ | Et | Me |
| B-0827 | 0 | Me | $CH_2CH_2CH(Me)$ | H | $CH_2CF_3$ | Et | Me |
| B-0828 | 0 | Me | $CH_2CH_2CH(Me)$ | Me | $CH_2CF_3$ | Et | Me |
| B-0829 | 0 | H | $CH_2CH(Me)CH_2$ | H | $CH_2CF_3$ | Et | Me |
| B-0830 | 0 | H | $CH_2CH(Me)CH_2$ | Me | $CH_2CF_3$ | Et | Me |

TABLE 183

| Compound Number | n | Y | W | Z | $R^1$ | $R^2$ | $R^3$ |
|---|---|---|---|---|---|---|---|
| B-0831 | 0 | Me | $CH_2CH(Me)CH_2$ | H | $CH_2CF_3$ | Et | Me |
| B-0832 | 0 | Me | $CH_2CH(Me)CH_2$ | Me | $CH_2CF_3$ | Et | Me |
| B-0833 | 0 | H | $CH(Me)CH_2CH_2$ | H | $CH_2CF_3$ | Et | Me |
| B-0834 | 0 | H | $CH(Me)CH_2CH_2$ | Me | $CH_2CF_3$ | Et | Me |
| B-0835 | 0 | Me | $CH(Me)CH_2CH_2$ | H | $CH_2CF_3$ | Et | Me |
| B-0836 | 0 | Me | $CH(Me)CH_2CH_2$ | Me | $CH_2CF_3$ | Et | Me |
| B-0837 | 0 | H | single bond | Me | $CH_2CF_3$ | $CH_2OMe$ | Cl |
| B-0838 | 0 | H | single bond | Et | $CH_2CF_3$ | $CH_2OMe$ | Cl |
| B-0839 | 0 | Me | single bond | H | $CH_2CF_3$ | $CH_2OMe$ | Cl |
| B-0840 | 0 | Et | single bond | H | $CH_2CF_3$ | $CH_2OMe$ | Cl |
| B-0841 | 0 | Me | single bond | Me | $CH_2CF_3$ | $CH_2OMe$ | Cl |
| B-0842 | 0 | H | $CH_2$ | Me | $CH_2CF_3$ | $CH_2OMe$ | Cl |
| B-0843 | 0 | Me | $CH_2$ | H | $CH_2CF_3$ | $CH_2OMe$ | Cl |
| B-0844 | 0 | Me | $CH_2$ | Me | $CH_2CF_3$ | $CH_2OMe$ | Cl |
| B-0845 | 0 | H | CH(Me) | H | $CH_2CF_3$ | $CH_2OMe$ | Cl |
| B-0846 | 0 | H | CH(Me) | Me | $CH_2CF_3$ | $CH_2OMe$ | Cl |
| B-0847 | 0 | Me | CH(Me) | H | $CH_2CF_3$ | $CH_2OMe$ | Cl |
| B-0848 | 0 | Me | CH(Me) | Me | $CH_2CF_3$ | $CH_2OMe$ | Cl |
| B-0849 | 0 | H | $CH_2CH_2$ | Me | $CH_2CF_3$ | $CH_2OMe$ | Cl |
| B-0850 | 0 | Me | $CH_2CH_2$ | H | $CH_2CF_3$ | $CH_2OMe$ | Cl |
| B-0851 | 0 | Me | $CH_2CH_2$ | Me | $CH_2CF_3$ | $CH_2OMe$ | Cl |
| B-0852 | 0 | H | $CH_2CH(Me)$ | H | $CH_2CF_3$ | $CH_2OMe$ | Cl |
| B-0853 | 0 | H | $CH_2CH(Me)$ | Me | $CH_2CF_3$ | $CH_2OMe$ | Cl |
| B-0854 | 0 | Me | $CH_2CH(Me)$ | H | $CH_2CF_3$ | $CH_2OMe$ | Cl |

TABLE 183-continued

| Compound Number | n | Y | W | Z | $R^1$ | $R^2$ | $R^3$ |
|---|---|---|---|---|---|---|---|
| B-0855 | 0 | Me | $CH_2CH(Me)$ | Me | $CH_2CF_3$ | $CH_2OMe$ | Cl |
| B-0856 | 0 | H | $CH(Me)CH_2$ | H | $CH_2CF_3$ | $CH_2OMe$ | Cl |
| B-0857 | 0 | H | $CH(Me)CH_2$ | Me | $CH_2CF_3$ | $CH_2OMe$ | Cl |
| B-0858 | 0 | Me | $CH(Me)CH_2$ | H | $CH_2CF_3$ | $CH_2OMe$ | Cl |
| B-0859 | 0 | Me | $CH(Me)CH_2$ | Me | $CH_2CF_3$ | $CH_2OMe$ | Cl |
| B-0860 | 0 | H | $CH_2CH_2CH_2$ | Me | $CH_2CF_3$ | $CH_2OMe$ | Cl |
| B-0861 | 0 | Me | $CH_2CH_2CH_2$ | H | $CH_2CF_3$ | $CH_2OMe$ | Cl |
| B-0862 | 0 | Me | $CH_2CH_2CH_2$ | Me | $CH_2CF_3$ | $CH_2OMe$ | Cl |
| B-0863 | 0 | H | $CH_2CH_2CH(Me)$ | H | $CH_2CF_3$ | $CH_2OMe$ | Cl |
| B-0864 | 0 | H | $CH_2CH_2CH(Me)$ | Me | $CH_2CF_3$ | $CH_2OMe$ | Cl |
| B-0865 | 0 | Me | $CH_2CH_2CH(Me)$ | H | $CH_2CF_3$ | $CH_2OMe$ | Cl |
| B-0866 | 0 | Me | $CH_2CH_2CH(Me)$ | Me | $CH_2CF_3$ | $CH_2OMe$ | Cl |
| B-0867 | 0 | H | $CH_2CH(Me)CH_2$ | H | $CH_2CF_3$ | $CH_2OMe$ | Cl |
| B-0868 | 0 | H | $CH_2CH(Me)CH_2$ | Me | $CH_2CF_3$ | $CH_2OMe$ | Cl |
| B-0869 | 0 | Me | $CH_2CH(Me)CH_2$ | H | $CH_2CF_3$ | $CH_2OMe$ | Cl |
| B-0870 | 0 | Me | $CH_2CH(Me)CH_2$ | Me | $CH_2CF_3$ | $CH_2OMe$ | Cl |
| B-0871 | 0 | H | $CH(Me)CH_2CH_2$ | H | $CH_2CF_3$ | $CH_2OMe$ | Cl |
| B-0872 | 0 | H | $CH(Me)CH_2CH_2$ | Me | $CH_2CF_3$ | $CH_2OMe$ | Cl |
| B-0873 | 0 | Me | $CH(Me)CH_2CH_2$ | H | $CH_2CF_3$ | $CH_2OMe$ | Cl |
| B-0874 | 0 | Me | $CH(Me)CH_2CH_2$ | Me | $CH_2CF_3$ | $CH_2OMe$ | Cl |

TABLE 184

| Compound Number | n | Y | W | Z | $R^1$ | $R^2$ | $R^3$ |
|---|---|---|---|---|---|---|---|
| B-0875 | 0 | H | single bond | Me | $CH_2CF_3$ | $CH_2OMe$ | Me |
| B-0876 | 0 | H | single bond | Et | $CH_2CF_3$ | $CH_2OMe$ | Me |
| B-0877 | 0 | Me | single bond | H | $CH_2CF_3$ | $CH_2OMe$ | Me |
| B-0878 | 0 | Et | single bond | H | $CH_2CF_3$ | $CH_2OMe$ | Me |
| B-0879 | 0 | Me | single bond | Me | $CH_2CF_3$ | $CH_2OMe$ | Me |
| B-0880 | 0 | H | $CH_2$ | Me | $CH_2CF_3$ | $CH_2OMe$ | Me |
| B-0881 | 0 | Me | $CH_2$ | H | $CH_2CF_3$ | $CH_2OMe$ | Me |
| B-0882 | 0 | Me | $CH_2$ | Me | $CH_2CF_3$ | $CH_2OMe$ | Me |
| B-0883 | 0 | H | $CH(Me)$ | H | $CH_2CF_3$ | $CH_2OMe$ | Me |
| B-0884 | 0 | H | $CH(Me)$ | Me | $CH_2CF_3$ | $CH_2OMe$ | Me |
| B-0885 | 0 | Me | $CH(Me)$ | H | $CH_2CF_3$ | $CH_2OMe$ | Me |
| B-0886 | 0 | Me | $CH(Me)$ | Me | $CH_2CF_3$ | $CH_2OMe$ | Me |
| B-0887 | 0 | H | $CH_2CH_2$ | Me | $CH_2CF_3$ | $CH_2OMe$ | Me |
| B-0888 | 0 | Me | $CH_2CH_2$ | H | $CH_2CF_3$ | $CH_2OMe$ | Me |
| B-0889 | 0 | Me | $CH_2CH_2$ | Me | $CH_2CF_3$ | $CH_2OMe$ | Me |
| B-0890 | 0 | H | $CH_2CH(Me)$ | H | $CH_2CF_3$ | $CH_2OMe$ | Me |
| B-0891 | 0 | H | $CH_2CH(Me)$ | Me | $CH_2CF_3$ | $CH_2OMe$ | Me |
| B-0892 | 0 | Me | $CH_2CH(Me)$ | H | $CH_2CF_3$ | $CH_2OMe$ | Me |
| B-0893 | 0 | Me | $CH_2CH(Me)$ | Me | $CH_2CF_3$ | $CH_2OMe$ | Me |
| B-0894 | 0 | H | $CH(Me)CH_2$ | H | $CH_2CF_3$ | $CH_2OMe$ | Me |
| B-0895 | 0 | H | $CH(Me)CH_2$ | Me | $CH_2CF_3$ | $CH_2OMe$ | Me |
| B-0896 | 0 | Me | $CH(Me)CH_2$ | H | $CH_2CF_3$ | $CH_2OMe$ | Me |
| B-0897 | 0 | Me | $CH(Me)CH_2$ | Me | $CH_2CF_3$ | $CH_2OMe$ | Me |
| B-0898 | 0 | H | $CH_2CH_2CH_2$ | Me | $CH_2CF_3$ | $CH_2OMe$ | Me |
| B-0899 | 0 | Me | $CH_2CH_2CH_2$ | H | $CH_2CF_3$ | $CH_2OMe$ | Me |
| B-0900 | 0 | Me | $CH_2CH_2CH_2$ | Me | $CH_2CF_3$ | $CH_2OMe$ | Me |
| B-0901 | 0 | H | $CH_2CH_2CH(Me)$ | H | $CH_2CF_3$ | $CH_2OMe$ | Me |
| B-0902 | 0 | H | $CH_2CH_2CH(Me)$ | Me | $CH_2CF_3$ | $CH_2OMe$ | Me |
| B-0903 | 0 | Me | $CH_2CH_2CH(Me)$ | H | $CH_2CF_3$ | $CH_2OMe$ | Me |
| B-0904 | 0 | Me | $CH_2CH_2CH(Me)$ | Me | $CH_2CF_3$ | $CH_2OMe$ | Me |
| B-0905 | 0 | H | $CH_2CH(Me)CH_2$ | H | $CH_2CF_3$ | $CH_2OMe$ | Me |
| B-0906 | 0 | H | $CH_2CH(Me)CH_2$ | Me | $CH_2CF_3$ | $CH_2OMe$ | Me |
| B-0907 | 0 | Me | $CH_2CH(Me)CH_2$ | H | $CH_2CF_3$ | $CH_2OMe$ | Me |
| B-0908 | 0 | Me | $CH_2CH(Me)CH_2$ | Me | $CH_2CF_3$ | $CH_2OMe$ | Me |
| B-0909 | 0 | H | $CH(Me)CH_2CH_2$ | H | $CH_2CF_3$ | $CH_2OMe$ | Me |
| B-0910 | 0 | H | $CH(Me)CH_2CH_2$ | Me | $CH_2CF_3$ | $CH_2OMe$ | Me |
| B-0911 | 0 | Me | $CH(Me)CH_2CH_2$ | H | $CH_2CF_3$ | $CH_2OMe$ | Me |
| B-0912 | 0 | Me | $CH(Me)CH_2CH_2$ | Me | $CH_2CF_3$ | $CH_2OMe$ | Me |
| B-0913 | 0 | H | single bond | Me | $CH_2CF_3$ | $CH_2CN$ | Cl |
| B-0914 | 0 | H | single bond | Et | $CH_2CF_3$ | $CH_2CN$ | Cl |
| B-0915 | 0 | Me | single bond | H | $CH_2CF_3$ | $CH_2CN$ | Cl |
| B-0916 | 0 | Et | single bond | H | $CH_2CF_3$ | $CH_2CN$ | Cl |
| B-0917 | 0 | Me | single bond | Me | $CH_2CF_3$ | $CH_2CN$ | Cl |
| B-0918 | 0 | H | $CH_2$ | Me | $CH_2CF_3$ | $CH_2CN$ | Cl |

TABLE 185

| Compound Number | n | Y | W | Z | $R^1$ | $R^2$ | $R^3$ |
|---|---|---|---|---|---|---|---|
| B-0919 | 0 | Me | $CH_2$ | H | $CH_2CF_3$ | $CH_2CN$ | Cl |
| B-0920 | 0 | Me | $CH_2$ | Me | $CH_2CF_3$ | $CH_2CN$ | Cl |
| B-0921 | 0 | H | $CH(Me)$ | H | $CH_2CF_3$ | $CH_2CN$ | Cl |
| B-0922 | 0 | H | $CH(Me)$ | Me | $CH_2CF_3$ | $CH_2CN$ | Cl |
| B-0923 | 0 | Me | $CH(Me)$ | H | $CH_2CF_3$ | $CH_2CN$ | Cl |
| B-0924 | 0 | Me | $CH(Me)$ | Me | $CH_2CF_3$ | $CH_2CN$ | Cl |
| B-0925 | 0 | H | $CH_2CH_2$ | Me | $CH_2CF_3$ | $CH_2CN$ | Cl |
| B-0926 | 0 | Me | $CH_2CH_2$ | H | $CH_2CF_3$ | $CH_2CN$ | Cl |
| B-0927 | 0 | Me | $CH_2CH_2$ | Me | $CH_2CF_3$ | $CH_2CN$ | Cl |
| B-0928 | 0 | H | $CH_2CH(Me)$ | H | $CH_2CF_3$ | $CH_2CN$ | Cl |
| B-0929 | 0 | H | $CH_2CH(Me)$ | Me | $CH_2CF_3$ | $CH_2CN$ | Cl |
| B-0930 | 0 | Me | $CH_2CH(Me)$ | H | $CH_2CF_3$ | $CH_2CN$ | Cl |
| B-0931 | 0 | Me | $CH_2CH(Me)$ | Me | $CH_2CF_3$ | $CH_2CN$ | Cl |
| B-0932 | 0 | H | $CH(Me)CH_2$ | H | $CH_2CF_3$ | $CH_2CN$ | Cl |
| B-0933 | 0 | H | $CH(Me)CH_2$ | Me | $CH_2CF_3$ | $CH_2CN$ | Cl |
| B-0934 | 0 | Me | $CH(Me)CH_2$ | H | $CH_2CF_3$ | $CH_2CN$ | Cl |
| B-0935 | 0 | Me | $CH(Me)CH_2$ | Me | $CH_2CF_3$ | $CH_2CN$ | Cl |
| B-0936 | 0 | H | $CH_2CH_2CH_2$ | Me | $CH_2CF_3$ | $CH_2CN$ | Cl |
| B-0937 | 0 | Me | $CH_2CH_2CH_2$ | H | $CH_2CF_3$ | $CH_2CN$ | Cl |
| B-0938 | 0 | Me | $CH_2CH_2CH_2$ | Me | $CH_2CF_3$ | $CH_2CN$ | Cl |
| B-0939 | 0 | H | $CH_2CH_2CH(Me)$ | H | $CH_2CF_3$ | $CH_2CN$ | Cl |
| B-0940 | 0 | H | $CH_2CH_2CH(Me)$ | Me | $CH_2CF_3$ | $CH_2CN$ | Cl |
| B-0941 | 0 | Me | $CH_2CH_2CH(Me)$ | H | $CH_2CF_3$ | $CH_2CN$ | Cl |
| B-0942 | 0 | Me | $CH_2CH_2CH(Me)$ | Me | $CH_2CF_3$ | $CH_2CN$ | Cl |
| B-0943 | 0 | H | $CH_2CH(Me)CH_2$ | H | $CH_2CF_3$ | $CH_2CN$ | Cl |
| B-0944 | 0 | H | $CH_2CH(Me)CH_2$ | Me | $CH_2CF_3$ | $CH_2CN$ | Cl |
| B-0945 | 0 | Me | $CH_2CH(Me)CH_2$ | H | $CH_2CF_3$ | $CH_2CN$ | Cl |
| B-0946 | 0 | Me | $CH_2CH(Me)CH_2$ | Me | $CH_2CF_3$ | $CH_2CN$ | Cl |
| B-0947 | 0 | H | $CH(Me)CH_2CH_2$ | H | $CH_2CF_3$ | $CH_2CN$ | Cl |
| B-0948 | 0 | H | $CH(Me)CH_2CH_2$ | Me | $CH_2CF_3$ | $CH_2CN$ | Cl |
| B-0949 | 0 | Me | $CH(Me)CH_2CH_2$ | H | $CH_2CF_3$ | $CH_2CN$ | Cl |
| B-0950 | 0 | Me | $CH(Me)CH_2CH_2$ | Me | $CH_2CF_3$ | $CH_2CN$ | Cl |
| B-0951 | 0 | H | single bond | Me | $CH_2CF_3$ | $CH_2CN$ | Me |
| B-0952 | 0 | H | single bond | Et | $CH_2CF_3$ | $CH_2CN$ | Me |
| B-0953 | 0 | Me | single bond | H | $CH_2CF_3$ | $CH_2CN$ | Me |
| B-0954 | 0 | Et | single bond | H | $CH_2CF_3$ | $CH_2CN$ | Me |
| B-0955 | 0 | Me | single bond | Me | $CH_2CF_3$ | $CH_2CN$ | Me |
| B-0956 | 0 | H | $CH_2$ | Me | $CH_2CF_3$ | $CH_2CN$ | Me |
| B-0957 | 0 | Me | $CH_2$ | H | $CH_2CF_3$ | $CH_2CN$ | Me |
| B-0958 | 0 | Me | $CH_2$ | Me | $CH_2CF_3$ | $CH_2CN$ | Me |
| B-0959 | 0 | H | $CH(Me)$ | H | $CH_2CF_3$ | $CH_2CN$ | Me |
| B-0960 | 0 | H | $CH(Me)$ | Me | $CH_2CF_3$ | $CH_2CN$ | Me |
| B-0961 | 0 | Me | $CH(Me)$ | H | $CH_2CF_3$ | $CH_2CN$ | Me |
| B-0962 | 0 | Me | $CH(Me)$ | Me | $CH_2CF_3$ | $CH_2CN$ | Me |

TABLE 186

| Compound Number | n | Y | W | Z | $R^1$ | $R^2$ | $R^3$ |
|---|---|---|---|---|---|---|---|
| B-0963 | 0 | H | $CH_2CH_2$ | Me | $CH_2CF_3$ | $CH_2CN$ | Me |
| B-0964 | 0 | Me | $CH_2CH_2$ | H | $CH_2CF_3$ | $CH_2CN$ | Me |
| B-0965 | 0 | Me | $CH_2CH_2$ | Me | $CH_2CF_3$ | $CH_2CN$ | Me |
| B-0966 | 0 | H | $CH_2CH(Me)$ | H | $CH_2CF_3$ | $CH_2CN$ | Me |
| B-0967 | 0 | H | $CH_2CH(Me)$ | Me | $CH_2CF_3$ | $CH_2CN$ | Me |
| B-0968 | 0 | Me | $CH_2CH(Me)$ | H | $CH_2CF_3$ | $CH_2CN$ | Me |
| B-0969 | 0 | Me | $CH_2CH(Me)$ | Me | $CH_2CF_3$ | $CH_2CN$ | Me |
| B-0970 | 0 | H | $CH(Me)CH_2$ | H | $CH_2CF_3$ | $CH_2CN$ | Me |
| B-0971 | 0 | H | $CH(Me)CH_2$ | Me | $CH_2CF_3$ | $CH_2CN$ | Me |
| B-0972 | 0 | Me | $CH(Me)CH_2$ | H | $CH_2CF_3$ | $CH_2CN$ | Me |
| B-0973 | 0 | Me | $CH(Me)CH_2$ | Me | $CH_2CF_3$ | $CH_2CN$ | Me |
| B-0974 | 0 | H | $CH_2CH_2CH_2$ | Me | $CH_2CF_3$ | $CH_2CN$ | Me |
| B-0975 | 0 | Me | $CH_2CH_2CH_2$ | H | $CH_2CF_3$ | $CH_2CN$ | Me |
| B-0976 | 0 | Me | $CH_2CH_2CH_2$ | Me | $CH_2CF_3$ | $CH_2CN$ | Me |
| B-0977 | 0 | H | $CH_2CH_2CH(Me)$ | H | $CH_2CF_3$ | $CH_2CN$ | Me |
| B-0978 | 0 | H | $CH_2CH_2CH(Me)$ | Me | $CH_2CF_3$ | $CH_2CN$ | Me |
| B-0979 | 0 | Me | $CH_2CH_2CH(Me)$ | H | $CH_2CF_3$ | $CH_2CN$ | Me |
| B-0980 | 0 | Me | $CH_2CH_2CH(Me)$ | Me | $CH_2CF_3$ | $CH_2CN$ | Me |
| B-0981 | 0 | H | $CH_2CH(Me)CH_2$ | H | $CH_2CF_3$ | $CH_2CN$ | Me |
| B-0982 | 0 | H | $CH_2CH(Me)CH_2$ | Me | $CH_2CF_3$ | $CH_2CN$ | Me |
| B-0983 | 0 | Me | $CH_2CH(Me)CH_2$ | H | $CH_2CF_3$ | $CH_2CN$ | Me |
| B-0984 | 0 | Me | $CH_2CH(Me)CH_2$ | Me | $CH_2CF_3$ | $CH_2CN$ | Me |
| B-0985 | 0 | H | $CH(Me)CH_2CH_2$ | H | $CH_2CF_3$ | $CH_2CN$ | Me |
| B-0986 | 0 | H | $CH(Me)CH_2CH_2$ | Me | $CH_2CF_3$ | $CH_2CN$ | Me |

TABLE 186-continued

| Compound Number | n | Y | W | Z | $R^1$ | $R^2$ | $R^3$ |
|---|---|---|---|---|---|---|---|
| B-0987 | 0 | Me | $CH(Me)CH_2CH_2$ | H | $CH_2CF_3$ | $CH_2CN$ | Me |
| B-0988 | 0 | Me | $CH(Me)CH_2CH_2$ | Me | $CH_2CF_3$ | $CH_2CN$ | Me |
| B-0989 | 0 | H | single bond | Me | $CH_2CF_3$ | C(═O)Me | Cl |
| B-0990 | 0 | H | single bond | Et | $CH_2CF_3$ | C(═O)Me | Cl |
| B-0991 | 0 | Me | single bond | H | $CH_2CF_3$ | C(═O)Me | Cl |
| B-0992 | 0 | Et | single bond | H | $CH_2CF_3$ | C(═O)Me | Cl |
| B-0993 | 0 | Me | single bond | Me | $CH_2CF_3$ | C(═O)Me | Cl |
| B-0994 | 0 | H | $CH_2$ | Me | $CH_2CF_3$ | C(═O)Me | Cl |
| B-0995 | 0 | Me | $CH_2$ | H | $CH_2CF_3$ | C(═O)Me | Cl |
| B-0996 | 0 | Me | $CH_2$ | Me | $CH_2CF_3$ | C(═O)Me | Cl |
| B-0997 | 0 | H | CH(Me) | H | $CH_2CF_3$ | C(═O)Me | Cl |
| B-0998 | 0 | H | CH(Me) | Me | $CH_2CF_3$ | C(═O)Me | Cl |
| B-0999 | 0 | Me | CH(Me) | H | $CH_2CF_3$ | C(═O)Me | Cl |
| B-1000 | 0 | Me | CH(Me) | Me | $CH_2CF_3$ | C(═O)Me | Cl |
| B-1001 | 0 | H | $CH_2CH_2$ | Me | $CH_2CF_3$ | C(═O)Me | Cl |
| B-1002 | 0 | Me | $CH_2CH_2$ | H | $CH_2CF_3$ | C(═O)Me | Cl |
| B-1003 | 0 | Me | $CH_2CH_2$ | Me | $CH_2CF_3$ | C(═O)Me | Cl |
| B-1004 | 0 | H | $CH_2CH(Me)$ | H | $CH_2CF_3$ | C(═O)Me | Cl |
| B-1005 | 0 | H | $CH_2CH(Me)$ | Me | $CH_2CF_3$ | C(═O)Me | Cl |
| B-1006 | 0 | Me | $CH_2CH(Me)$ | H | $CH_2CF_3$ | C(═O)Me | Cl |

TABLE 187

| Compound Number | n | Y | W | Z | $R^1$ | $R^2$ | $R^3$ |
|---|---|---|---|---|---|---|---|
| B-1007 | 0 | Me | $CH_2CH(Me)$ | Me | $CH_2CF_3$ | C(═O)Me | Cl |
| B-1008 | 0 | H | $CH(Me)CH_2$ | H | $CH_2CF_3$ | C(═O)Me | Cl |
| B-1009 | 0 | H | $CH(Me)CH_2$ | Me | $CH_2CF_3$ | C(═O)Me | Cl |
| B-1010 | 0 | Me | $CH(Me)CH_2$ | H | $CH_2CF_3$ | C(═O)Me | Cl |
| B-1011 | 0 | Me | $CH(Me)CH_2$ | Me | $CH_2CF_3$ | C(═O)Me | Cl |
| B-1012 | 0 | H | $CH_2CH_2CH_2$ | Me | $CH_2CF_3$ | C(═O)Me | Cl |
| B-1013 | 0 | Me | $CH_2CH_2CH_2$ | H | $CH_2CF_3$ | C(═O)Me | Cl |
| B-1014 | 0 | Me | $CH_2CH_2CH_2$ | Me | $CH_2CF_3$ | C(═O)Me | Cl |
| B-1015 | 0 | H | $CH_2CH_2CH(Me)$ | H | $CH_2CF_3$ | C(═O)Me | Cl |
| B-1016 | 0 | H | $CH_2CH_2CH(Me)$ | Me | $CH_2CF_3$ | C(═O)Me | Cl |
| B-1017 | 0 | Me | $CH_2CH_2CH(Me)$ | H | $CH_2CF_3$ | C(═O)Me | Cl |
| B-1018 | 0 | Me | $CH_2CH_2CH(Me)$ | Me | $CH_2CF_3$ | C(═O)Me | Cl |
| B-1019 | 0 | H | $CH_2CH(Me)CH_2$ | H | $CH_2CF_3$ | C(═O)Me | Cl |
| B-1020 | 0 | H | $CH_2CH(Me)CH_2$ | Me | $CH_2CF_3$ | C(═O)Me | Cl |
| B-1021 | 0 | Me | $CH_2CH(Me)CH_2$ | H | $CH_2CF_3$ | C(═O)Me | Cl |
| B-1022 | 0 | Me | $CH_2CH(Me)CH_2$ | Me | $CH_2CF_3$ | C(═O)Me | Cl |
| B-1023 | 0 | H | $CH(Me)CH_2CH_2$ | H | $CH_2CF_3$ | C(═O)Me | Cl |
| B-1024 | 0 | H | $CH(Me)CH_2CH_2$ | Me | $CH_2CF_3$ | C(═O)Me | Cl |
| B-1025 | 0 | Me | $CH(Me)CH_2CH_2$ | H | $CH_2CF_3$ | C(═O)Me | Cl |
| B-1026 | 0 | Me | $CH(Me)CH_2CH_2$ | Me | $CH_2CF_3$ | C(═O)Me | Cl |
| B-1027 | 0 | H | single bond | Me | $CH_2CF_3$ | C(═O)Me | Me |
| B-1028 | 0 | H | single bond | Et | $CH_2CF_3$ | C(═O)Me | Me |
| B-1029 | 0 | Me | single bond | H | $CH_2CF_3$ | C(═O)Me | Me |
| B-1030 | 0 | Et | single bond | H | $CH_2CF_3$ | C(═O)Me | Me |
| B-1031 | 0 | Me | single bond | Me | $CH_2CF_3$ | C(═O)Me | Me |
| B-1032 | 0 | H | $CH_2$ | Me | $CH_2CF_3$ | C(═O)Me | Me |
| B-1033 | 0 | Me | $CH_2$ | H | $CH_2CF_3$ | C(═O)Me | Me |
| B-1034 | 0 | Me | $CH_2$ | Me | $CH_2CF_3$ | C(═O)Me | Me |
| B-1035 | 0 | H | CH(Me) | H | $CH_2CF_3$ | C(═O)Me | Me |
| B-1036 | 0 | H | CH(Me) | Me | $CH_2CF_3$ | C(═O)Me | Me |
| B-1037 | 0 | Me | CH(Me) | H | $CH_2CF_3$ | C(═O)Me | Me |
| B-1038 | 0 | Me | CH(Me) | Me | $CH_2CF_3$ | C(═O)Me | Me |
| B-1039 | 0 | H | $CH_2CH_2$ | Me | $CH_2CF_3$ | C(═O)Me | Me |
| B-1040 | 0 | Me | $CH_2CH_2$ | H | $CH_2CF_3$ | C(═O)Me | Me |
| B-1041 | 0 | Me | $CH_2CH_2$ | Me | $CH_2CF_3$ | C(═O)Me | Me |
| B-1042 | 0 | H | $CH_2CH(Me)$ | H | $CH_2CF_3$ | C(═O)Me | Me |
| B-1043 | 0 | H | $CH_2CH(Me)$ | Me | $CH_2CF_3$ | C(═O)Me | Me |
| B-1044 | 0 | Me | $CH_2CH(Me)$ | H | $CH_2CF_3$ | C(═O)Me | Me |
| B-1045 | 0 | Me | $CH_2CH(Me)$ | Me | $CH_2CF_3$ | C(═O)Me | Me |
| B-1046 | 0 | H | $CH(Me)CH_2$ | H | $CH_2CF_3$ | C(═O)Me | Me |
| B-1047 | 0 | H | $CH(Me)CH_2$ | Me | $CH_2CF_3$ | C(═O)Me | Me |
| B-1048 | 0 | Me | $CH(Me)CH_2$ | H | $CH_2CF_3$ | C(═O)Me | Me |
| B-1049 | 0 | Me | $CH(Me)CH_2$ | Me | $CH_2CF_3$ | C(═O)Me | Me |
| B-1050 | 0 | H | $CH_2CH_2CH_2$ | Me | $CH_2CF_3$ | C(═O)Me | Me |

TABLE 188

| Compound Number | n | Y | W | Z | $R^1$ | $R^2$ | $R^3$ |
|---|---|---|---|---|---|---|---|
| B-1051 | 0 | Me | $CH_2CH_2CH_2$ | H | $CH_2CF_3$ | C(═O)Me | Me |
| B-1052 | 0 | Me | $CH_2CH_2CH_2$ | Me | $CH_2CF_3$ | C(═O)Me | Me |
| B-1053 | 0 | H | $CH_2CH_2CH(Me)$ | H | $CH_2CF_3$ | C(═O)Me | Me |
| B-1054 | 0 | H | $CH_2CH_2CH(Me)$ | Me | $CH_2CF_3$ | C(═O)Me | Me |
| B-1055 | 0 | Me | $CH_2CH_2CH(Me)$ | H | $CH_2CF_3$ | C(═O)Me | Me |
| B-1056 | 0 | Me | $CH_2CH_2CH(Me)$ | Me | $CH_2CF_3$ | C(═O)Me | Me |
| B-1057 | 0 | H | $CH_2CH(Me)CH_2$ | H | $CH_2CF_3$ | C(═O)Me | Me |
| B-1058 | 0 | H | $CH_2CH(Me)CH_2$ | Me | $CH_2CF_3$ | C(═O)Me | Me |
| B-1059 | 0 | Me | $CH_2CH(Me)CH_2$ | H | $CH_2CF_3$ | C(═O)Me | Me |
| B-1060 | 0 | Me | $CH_2CH(Me)CH_2$ | Me | $CH_2CF_3$ | C(═O)Me | Me |
| B-1061 | 0 | H | $CH(Me)CH_2CH_2$ | H | $CH_2CF_3$ | C(═O)Me | Me |
| B-1062 | 0 | H | $CH(Me)CH_2CH_2$ | Me | $CH_2CF_3$ | C(═O)Me | Me |
| B-1063 | 0 | Me | $CH(Me)CH_2CH_2$ | H | $CH_2CF_3$ | C(═O)Me | Me |
| B-1064 | 0 | Me | $CH(Me)CH_2CH_2$ | Me | $CH_2CF_3$ | C(═O)Me | Me |
| B-1065 | 0 | H | single bond | Me | $CH_2CF_3$ | C(═O)Ph | Cl |
| B-1066 | 0 | H | single bond | Et | $CH_2CF_3$ | C(═O)Ph | Cl |
| B-1067 | 0 | Me | single bond | H | $CH_2CF_3$ | C(═O)Ph | Cl |
| B-1068 | 0 | Et | single bond | H | $CH_2CF_3$ | C(═O)Ph | Cl |
| B-1069 | 0 | Me | single bond | Me | $CH_2CF_3$ | C(═O)Ph | Cl |
| B-1070 | 0 | H | $CH_2$ | Me | $CH_2CF_3$ | C(═O)Ph | Cl |
| B-1071 | 0 | Me | $CH_2$ | H | $CH_2CF_3$ | C(═O)Ph | Cl |
| B-1072 | 0 | Me | $CH_2$ | Me | $CH_2CF_3$ | C(═O)Ph | Cl |
| B-1073 | 0 | H | CH(Me) | H | $CH_2CF_3$ | C(═O)Ph | Cl |
| B-1074 | 0 | H | CH(Me) | Me | $CH_2CF_3$ | C(═O)Ph | Cl |
| B-1075 | 0 | Me | CH(Me) | H | $CH_2CF_3$ | C(═O)Ph | Cl |
| B-1076 | 0 | Me | CH(Me) | Me | $CH_2CF_3$ | C(═O)Ph | Cl |
| B-1077 | 0 | H | $CH_2CH_2$ | Me | $CH_2CF_3$ | C(═O)Ph | Cl |
| B-1078 | 0 | Me | $CH_2CH_2$ | H | $CH_2CF_3$ | C(═O)Ph | Cl |
| B-1079 | 0 | Me | $CH_2CH_2$ | Me | $CH_2CF_3$ | C(═O)Ph | Cl |
| B-1080 | 0 | H | $CH_2CH(Me)$ | H | $CH_2CF_3$ | C(═O)Ph | Cl |
| B-1081 | 0 | H | $CH_2CH(Me)$ | Me | $CH_2CF_3$ | C(═O)Ph | Cl |
| B-1082 | 0 | Me | $CH_2CH(Me)$ | H | $CH_2CF_3$ | C(═O)Ph | Cl |
| B-1083 | 0 | Me | $CH_2CH(Me)$ | Me | $CH_2CF_3$ | C(═O)Ph | Cl |
| B-1084 | 0 | H | $CH(Me)CH_2$ | H | $CH_2CF_3$ | C(═O)Ph | Cl |
| B-1085 | 0 | H | $CH(Me)CH_2$ | Me | $CH_2CF_3$ | C(═O)Ph | Cl |
| B-1086 | 0 | Me | $CH(Me)CH_2$ | H | $CH_2CF_3$ | C(═O)Ph | Cl |
| B-1087 | 0 | Me | $CH(Me)CH_2$ | Me | $CH_2CF_3$ | C(═O)Ph | Cl |
| B-1088 | 0 | H | $CH_2CH_2CH_2$ | Me | $CH_2CF_3$ | C(═O)Ph | Cl |
| B-1089 | 0 | Me | $CH_2CH_2CH_2$ | H | $CH_2CF_3$ | C(═O)Ph | Cl |
| B-1090 | 0 | Me | $CH_2CH_2CH_2$ | Me | $CH_2CF_3$ | C(═O)Ph | Cl |
| B-1091 | 0 | H | $CH_2CH_2CH(Me)$ | H | $CH_2CF_3$ | C(═O)Ph | Cl |
| B-1092 | 0 | H | $CH_2CH_2CH(Me)$ | Me | $CH_2CF_3$ | C(═O)Ph | Cl |
| B-1093 | 0 | Me | $CH_2CH_2CH(Me)$ | H | $CH_2CF_3$ | C(═O)Ph | Cl |
| B-1094 | 0 | Me | $CH_2CH_2CH(Me)$ | Me | $CH_2CF_3$ | C(═O)Ph | Cl |

TABLE 189

| Compound Number | n | Y | W | Z | $R^1$ | $R^2$ | $R^3$ |
|---|---|---|---|---|---|---|---|
| B-1095 | 0 | H | $CH_2CH(Me)CH_2$ | H | $CH_2CF_3$ | C(═O)Ph | Cl |
| B-1096 | 0 | H | $CH_2CH(Me)CH_2$ | Me | $CH_2CF_3$ | C(═O)Ph | Cl |
| B-1097 | 0 | Me | $CH_2CH(Me)CH_2$ | H | $CH_2CF_3$ | C(═O)Ph | Cl |
| B-1098 | 0 | Me | $CH_2CH(Me)CH_2$ | Me | $CH_2CF_3$ | C(═O)Ph | Cl |
| B-1099 | 0 | H | $CH(Me)CH_2CH_2$ | H | $CH_2CF_3$ | C(═O)Ph | Cl |
| B-1100 | 0 | H | $CH(Me)CH_2CH_2$ | Me | $CH_2CF_3$ | C(═O)Ph | Cl |
| B-1101 | 0 | Me | $CH(Me)CH_2CH_2$ | H | $CH_2CF_3$ | C(═O)Ph | Cl |
| B-1102 | 0 | Me | $CH(Me)CH_2CH_2$ | Me | $CH_2CF_3$ | C(═O)Ph | Cl |
| B-1103 | 0 | H | single bond | Me | $CH_2CF_3$ | C(═O)Ph | Me |
| B-1104 | 0 | H | single bond | Et | $CH_2CF_3$ | C(═O)Ph | Me |
| B-1105 | 0 | Me | single bond | H | $CH_2CF_3$ | C(═O)Ph | Me |
| B-1106 | 0 | Et | single bond | H | $CH_2CF_3$ | C(═O)Ph | Me |
| B-1107 | 0 | Me | single bond | Me | $CH_2CF_3$ | C(═O)Ph | Me |
| B-1108 | 0 | H | $CH_2$ | Me | $CH_2CF_3$ | C(═O)Ph | Me |
| B-1109 | 0 | Me | $CH_2$ | H | $CH_2CF_3$ | C(═O)Ph | Me |
| B-1110 | 0 | Me | $CH_2$ | Me | $CH_2CF_3$ | C(═O)Ph | Me |
| B-1111 | 0 | H | CH(Me) | H | $CH_2CF_3$ | C(═O)Ph | Me |
| B-1112 | 0 | H | CH(Me) | Me | $CH_2CF_3$ | C(═O)Ph | Me |
| B-1113 | 0 | Me | CH(Me) | H | $CH_2CF_3$ | C(═O)Ph | Me |
| B-1114 | 0 | Me | CH(Me) | Me | $CH_2CF_3$ | C(═O)Ph | Me |
| B-1115 | 0 | H | $CH_2CH_2$ | Me | $CH_2CF_3$ | C(═O)Ph | Me |
| B-1116 | 0 | Me | $CH_2CH_2$ | H | $CH_2CF_3$ | C(═O)Ph | Me |
| B-1117 | 0 | Me | $CH_2CH_2$ | Me | $CH_2CF_3$ | C(═O)Ph | Me |
| B-1118 | 0 | H | $CH_2CH(Me)$ | H | $CH_2CF_3$ | C(═O)Ph | Me |

TABLE 189-continued

| Compound Number | n | Y | W | Z | $R^1$ | $R^2$ | $R^3$ |
|---|---|---|---|---|---|---|---|
| B-1119 | 0 | H | $CH_2CH(Me)$ | Me | $CH_2CF_3$ | C(=O)Ph | Me |
| B-1120 | 0 | Me | $CH_2CH(Me)$ | H | $CH_2CF_3$ | C(=O)Ph | Me |
| B-1121 | 0 | Me | $CH_2CH(Me)$ | Me | $CH_2CF_3$ | C(=O)Ph | Me |
| B-1122 | 0 | H | $CH(Me)CH_2$ | H | $CH_2CF_3$ | C(=O)Ph | Me |
| B-1123 | 0 | H | $CH(Me)CH_2$ | Me | $CH_2CF_3$ | C(=O)Ph | Me |
| B-1124 | 0 | Me | $CH(Me)CH_2$ | H | $CH_2CF_3$ | C(=O)Ph | Me |
| B-1125 | 0 | Me | $CH(Me)CH_2$ | Me | $CH_2CF_3$ | C(=O)Ph | Me |
| B-1126 | 0 | H | $CH_2CH_2CH_2$ | Me | $CH_2CF_3$ | C(=O)Ph | Me |
| B-1127 | 0 | Me | $CH_2CH_2CH_2$ | H | $CH_2CF_3$ | C(=O)Ph | Me |
| B-1128 | 0 | Me | $CH_2CH_2CH_2$ | Me | $CH_2CF_3$ | C(=O)Ph | Me |
| B-1129 | 0 | H | $CH_2CH_2CH(Me)$ | H | $CH_2CF_3$ | C(=O)Ph | Me |
| B-1130 | 0 | H | $CH_2CH_2CH(Me)$ | Me | $CH_2CF_3$ | C(=O)Ph | Me |
| B-1131 | 0 | Me | $CH_2CH_2CH(Me)$ | H | $CH_2CF_3$ | C(=O)Ph | Me |
| B-1132 | 0 | Me | $CH_2CH_2CH(Me)$ | Me | $CH_2CF_3$ | C(=O)Ph | Me |
| B-1133 | 0 | H | $CH_2CH(Me)CH_2$ | H | $CH_2CF_3$ | C(=O)Ph | Me |
| B-1134 | 0 | H | $CH_2CH(Me)CH_2$ | Me | $CH_2CF_3$ | C(=O)Ph | Me |
| B-1135 | 0 | Me | $CH_2CH(Me)CH_2$ | H | $CH_2CF_3$ | C(=O)Ph | Me |
| B-1136 | 0 | Me | $CH_2CH(Me)CH_2$ | Me | $CH_2CF_3$ | C(=O)Ph | Me |
| B-1137 | 0 | H | $CH(Me)CH_2CH_2$ | H | $CH_2CF_3$ | C(=O)Ph | Me |
| B-1138 | 0 | H | $CH(Me)CH_2CH_2$ | Me | $CH_2CF_3$ | C(=O)Ph | Me |

TABLE 190

| Compound Number | n | Y | W | Z | $R^1$ | $R^2$ | $R^3$ |
|---|---|---|---|---|---|---|---|
| B-1139 | 0 | Me | $CH(Me)CH_2CH_2$ | H | $CH_2CF_3$ | C(=O)Ph | Me |
| B-1140 | 0 | Me | $CH(Me)CH_2CH_2$ | Me | $CH_2CF_3$ | C(=O)Ph | Me |
| B-1141 | 0 | H | single bond | Me | $CH_2CF_3$ | C(=O)OEt | Cl |
| B-1142 | 0 | H | single bond | Et | $CH_2CF_3$ | C(=O)OEt | Cl |
| B-1143 | 0 | Me | single bond | H | $CH_2CF_3$ | C(=O)OEt | Cl |
| B-1144 | 0 | Et | single bond | H | $CH_2CF_3$ | C(=O)OEt | Cl |
| B-1145 | 0 | Me | single bond | Me | $CH_2CF_3$ | C(=O)OEt | Cl |
| B-1146 | 0 | H | $CH_2$ | Me | $CH_2CF_3$ | C(=O)OEt | Cl |
| B-1147 | 0 | Me | $CH_2$ | H | $CH_2CF_3$ | C(=O)OEt | Cl |
| B-1148 | 0 | Me | $CH_2$ | Me | $CH_2CF_3$ | C(=O)OEt | Cl |
| B-1149 | 0 | H | CH(Me) | H | $CH_2CF_3$ | C(=O)OEt | Cl |
| B-1150 | 0 | H | CH(Me) | Me | $CH_2CF_3$ | C(=O)OEt | Cl |
| B-1151 | 0 | Me | CH(Me) | H | $CH_2CF_3$ | C(=O)OEt | Cl |
| B-1152 | 0 | Me | CH(Me) | Me | $CH_2CF_3$ | C(=O)OEt | Cl |
| B-1153 | 0 | H | $CH_2CH_2$ | Me | $CH_2CF_3$ | C(=O)OEt | Cl |
| B-1154 | 0 | Me | $CH_2CH_2$ | H | $CH_2CF_3$ | C(=O)OEt | Cl |
| B-1155 | 0 | Me | $CH_2CH_2$ | Me | $CH_2CF_3$ | C(=O)OEt | Cl |
| B-1156 | 0 | H | $CH_2CH(Me)$ | H | $CH_2CF_3$ | C(=O)OEt | Cl |
| B-1157 | 0 | H | $CH_2CH(Me)$ | Me | $CH_2CF_3$ | C(=O)OEt | Cl |
| B-1158 | 0 | Me | $CH_2CH(Me)$ | H | $CH_2CF_3$ | C(=O)OEt | Cl |
| B-1159 | 0 | Me | $CH_2CH(Me)$ | Me | $CH_2CF_3$ | C(=O)OEt | Cl |
| B-1160 | 0 | H | $CH(Me)CH_2$ | H | $CH_2CF_3$ | C(=O)OEt | Cl |
| B-1161 | 0 | H | $CH(Me)CH_2$ | Me | $CH_2CF_3$ | C(=O)OEt | Cl |
| B-1162 | 0 | Me | $CH(Me)CH_2$ | H | $CH_2CF_3$ | C(=O)OEt | Cl |
| B-1163 | 0 | Me | $CH(Me)CH_2$ | Me | $CH_2CF_3$ | C(=O)OEt | Cl |
| B-1164 | 0 | H | $CH_2CH_2CH_2$ | Me | $CH_2CF_3$ | C(=O)OEt | Cl |
| B-1165 | 0 | Me | $CH_2CH_2CH_2$ | H | $CH_2CF_3$ | C(=O)OEt | Cl |
| B-1166 | 0 | Me | $CH_2CH_2CH_2$ | Me | $CH_2CF_3$ | C(=O)OEt | Cl |
| B-1167 | 0 | H | $CH_2CH_2CH(Me)$ | H | $CH_2CF_3$ | C(=O)OEt | Cl |
| B-1168 | 0 | H | $CH_2CH_2CH(Me)$ | Me | $CH_2CF_3$ | C(=O)OEt | Cl |
| B-1169 | 0 | Me | $CH_2CH_2CH(Me)$ | H | $CH_2CF_3$ | C(=O)OEt | Cl |
| B-1170 | 0 | Me | $CH_2CH_2CH(Me)$ | Me | $CH_2CF_3$ | C(=O)OEt | Cl |
| B-1171 | 0 | H | $CH_2CH(Me)CH_2$ | H | $CH_2CF_3$ | C(=O)OEt | Cl |
| B-1172 | 0 | H | $CH_2CH(Me)CH_2$ | Me | $CH_2CF_3$ | C(=O)OEt | Cl |
| B-1173 | 0 | Me | $CH_2CH(Me)CH_2$ | H | $CH_2CF_3$ | C(=O)OEt | Cl |
| B-1174 | 0 | Me | $CH_2CH(Me)CH_2$ | Me | $CH_2CF_3$ | C(=O)OEt | Cl |
| B-1175 | 0 | H | $CH(Me)CH_2CH_2$ | H | $CH_2CF_3$ | C(=O)OEt | Cl |
| B-1176 | 0 | H | $CH(Me)CH_2CH_2$ | Me | $CH_2CF_3$ | C(=O)OEt | Cl |
| B-1177 | 0 | Me | $CH(Me)CH_2CH_2$ | H | $CH_2CF_3$ | C(=O)OEt | Cl |
| B-1178 | 0 | Me | $CH(Me)CH_2CH_2$ | Me | $CH_2CF_3$ | C(=O)OEt | Cl |
| B-1179 | 0 | H | single bond | Me | $CH_2CF_3$ | C(=O)OEt | Me |
| B-1180 | 0 | H | single bond | Et | $CH_2CF_3$ | C(=O)OEt | Me |
| B-1181 | 0 | Me | single bond | H | $CH_2CF_3$ | C(=O)OEt | Me |
| B-1182 | 0 | Et | single bond | H | $CH_2CF_3$ | C(=O)OEt | Me |

TABLE 191

| Compound Number | n | Y | W | Z | $R^1$ | $R^2$ | $R^3$ |
|---|---|---|---|---|---|---|---|
| B-1183 | 0 | Me | single bond | Me | $CH_2CF_3$ | C(=O)OEt | Me |
| B-1184 | 0 | H | $CH_2$ | Me | $CH_2CF_3$ | C(=O)OEt | Me |
| B-1185 | 0 | Me | $CH_2$ | H | $CH_2CF_3$ | C(=O)OEt | Me |
| B-1186 | 0 | Me | $CH_2$ | Me | $CH_2CF_3$ | C(=O)OEt | Me |
| B-1187 | 0 | H | CH(Me) | H | $CH_2CF_3$ | C(=O)OEt | Me |
| B-1188 | 0 | H | CH(Me) | Me | $CH_2CF_3$ | C(=O)OEt | Me |
| B-1189 | 0 | Me | CH(Me) | H | $CH_2CF_3$ | C(=O)OEt | Me |
| B-1190 | 0 | Me | CH(Me) | Me | $CH_2CF_3$ | C(=O)OEt | Me |
| B-1191 | 0 | H | $CH_2CH_2$ | Me | $CH_2CF_3$ | C(=O)OEt | Me |
| B-1192 | 0 | Me | $CH_2CH_2$ | H | $CH_2CF_3$ | C(=O)OEt | Me |
| B-1193 | 0 | Me | $CH_2CH_2$ | Me | $CH_2CF_3$ | C(=O)OEt | Me |
| B-1194 | 0 | H | $CH_2CH(Me)$ | H | $CH_2CF_3$ | C(=O)OEt | Me |
| B-1195 | 0 | H | $CH_2CH(Me)$ | Me | $CH_2CF_3$ | C(=O)OEt | Me |
| B-1196 | 0 | Me | $CH_2CH(Me)$ | H | $CH_2CF_3$ | C(=O)OEt | Me |
| B-1197 | 0 | Me | $CH_2CH(Me)$ | Me | $CH_2CF_3$ | C(=O)OEt | Me |
| B-1198 | 0 | H | $CH(Me)CH_2$ | H | $CH_2CF_3$ | C(=O)OEt | Me |
| B-1199 | 0 | H | $CH(Me)CH_2$ | Me | $CH_2CF_3$ | C(=O)OEt | Me |
| B-1200 | 0 | Me | $CH(Me)CH_2$ | H | $CH_2CF_3$ | C(=O)OEt | Me |
| B-1201 | 0 | Me | $CH(Me)CH_2$ | Me | $CH_2CF_3$ | C(=O)OEt | Me |
| B-1202 | 0 | H | $CH_2CH_2CH_2$ | Me | $CH_2CF_3$ | C(=O)OEt | Me |
| B-1203 | 0 | Me | $CH_2CH_2CH_2$ | H | $CH_2CF_3$ | C(=O)OEt | Me |
| B-1204 | 0 | Me | $CH_2CH_2CH_2$ | Me | $CH_2CF_3$ | C(=O)OEt | Me |
| B-1205 | 0 | H | $CH_2CH_2CH(Me)$ | H | $CH_2CF_3$ | C(=O)OEt | Me |
| B-1206 | 0 | H | $CH_2CH_2CH(Me)$ | Me | $CH_2CF_3$ | C(=O)OEt | Me |
| B-1207 | 0 | Me | $CH_2CH_2CH(Me)$ | H | $CH_2CF_3$ | C(=O)OEt | Me |
| B-1208 | 0 | Me | $CH_2CH_2CH(Me)$ | Me | $CH_2CF_3$ | C(=O)OEt | Me |
| B-1209 | 0 | H | $CH_2CH(Me)CH_2$ | H | $CH_2CF_3$ | C(=O)OEt | Me |
| B-1210 | 0 | H | $CH_2CH(Me)CH_2$ | Me | $CH_2CF_3$ | C(=O)OEt | Me |
| B-1211 | 0 | Me | $CH_2CH(Me)CH_2$ | H | $CH_2CF_3$ | C(=O)OEt | Me |
| B-1212 | 0 | Me | $CH_2CH(Me)CH_2$ | Me | $CH_2CF_3$ | C(=O)OEt | Me |
| B-1213 | 0 | H | $CH(Me)CH_2CH_2$ | H | $CH_2CF_3$ | C(=O)OEt | Me |
| B-1214 | 0 | H | $CH(Me)CH_2CH_2$ | Me | $CH_2CF_3$ | C(=O)OEt | Me |
| B-1215 | 0 | Me | $CH(Me)CH_2CH_2$ | H | $CH_2CF_3$ | C(=O)OEt | Me |
| B-1216 | 0 | Me | $CH(Me)CH_2CH_2$ | Me | $CH_2CF_3$ | C(=O)OEt | Me |
| B-1217 | 0 | H | single bond | Me | $CH_2CF_3$ | $S(=O)_2Me$ | Cl |
| B-1218 | 0 | H | single bond | Et | $CH_2CF_3$ | $S(=O)_2Me$ | Cl |
| B-1219 | 0 | Me | single bond | H | $CH_2CF_3$ | $S(=O)_2Me$ | Cl |
| B-1220 | 0 | Et | single bond | H | $CH_2CF_3$ | $S(=O)_2Me$ | Cl |
| B-1221 | 0 | Me | single bond | Me | $CH_2CF_3$ | $S(=O)_2Me$ | Cl |
| B-1222 | 0 | H | $CH_2$ | Me | $CH_2CF_3$ | $S(=O)_2Me$ | Cl |
| B-1223 | 0 | Me | $CH_2$ | H | $CH_2CF_3$ | $S(=O)_2Me$ | Cl |
| B-1224 | 0 | Me | $CH_2$ | Me | $CH_2CF_3$ | $S(=O)_2Me$ | Cl |
| B-1225 | 0 | H | CH(Me) | H | $CH_2CF_3$ | $S(=O)_2Me$ | Cl |
| B-1226 | 0 | H | CH(Me) | Me | $CH_2CF_3$ | $S(=O)_2Me$ | Cl |

TABLE 192

| Compound Number | n | Y | W | Z | $R^1$ | $R^2$ | $R^3$ |
|---|---|---|---|---|---|---|---|
| B-1227 | 0 | Me | CH(Me) | H | $CH_2CF_3$ | $S(=O)_2Me$ | Cl |
| B-1228 | 0 | Me | CH(Me) | Me | $CH_2CF_3$ | $S(=O)_2Me$ | Cl |
| B-1229 | 0 | H | $CH_2CH_2$ | Me | $CH_2CF_3$ | $S(=O)_2Me$ | Cl |
| B-1230 | 0 | Me | $CH_2CH_2$ | H | $CH_2CF_3$ | $S(=O)_2Me$ | C |
| B-1231 | 0 | Me | $CH_2CH_2$ | Me | $CH_2CF_3$ | $S(=O)_2Me$ | Cl |
| B-1232 | 0 | H | $CH_2CH(Me)$ | H | $CH_2CF_3$ | $S(=O)_2Me$ | C |
| B-1233 | 0 | H | $CH_2CH(Me)$ | Me | $CH_2CF_3$ | $S(=O)_2Me$ | C |
| B-1234 | 0 | Me | $CH_2CH(Me)$ | H | $CH_2CF_3$ | $S(=O)_2Me$ | Cl |
| B-1235 | 0 | Me | $CH_2CH(Me)$ | Me | $CH_2CF_3$ | $S(=O)_2Me$ | Cl |
| B-1236 | 0 | H | $CH(Me)CH_2$ | H | $CH_2CF_3$ | $S(=O)_2Me$ | Cl |
| B-1237 | 0 | H | $CH(Me)CH_2$ | Me | $CH_2CF_3$ | $S(=O)_2Me$ | Cl |
| B-1238 | 0 | Me | $CH(Me)CH_2$ | H | $CH_2CF_3$ | $S(=O)_2Me$ | C |
| B-1239 | 0 | Me | $CH(Me)CH_2$ | Me | $CH_2CF_3$ | $S(=O)_2Me$ | Cl |
| B-1240 | 0 | H | $CH_2CH_2CH_2$ | Me | $CH_2CF_3$ | $S(=O)_2Me$ | C |
| B-1241 | 0 | Me | $CH_2CH_2CH_2$ | H | $CH_2CF_3$ | $S(=O)_2Me$ | C |
| B-1242 | 0 | Me | $CH_2CH_2CH_2$ | Me | $CH_2CF_3$ | $S(=O)_2Me$ | Cl |
| B-1243 | 0 | H | $CH_2CH_2CH(Me)$ | H | $CH_2CF_3$ | $S(=O)_2Me$ | C |
| B-1244 | 0 | H | $CH_2CH_2CH(Me)$ | Me | $CH_2CF_3$ | $S(=O)_2Me$ | C |
| B-1245 | 0 | Me | $CH_2CH_2CH(Me)$ | H | $CH_2CF_3$ | $S(=O)_2Me$ | C |
| B-1246 | 0 | Me | $CH_2CH_2CH(Me)$ | Me | $CH_2CF_3$ | $S(=O)_2Me$ | Cl |
| B-1247 | 0 | H | $CH_2CH(Me)CH_2$ | H | $CH_2CF_3$ | $S(=O)_2Me$ | C |
| B-1248 | 0 | H | $CH_2CH(Me)CH_2$ | Me | $CH_2CF_3$ | $S(=O)_2Me$ | Cl |
| B-1249 | 0 | Me | $CH_2CH(Me)CH_2$ | H | $CH_2CF_3$ | $S(=O)_2Me$ | C |
| B-1250 | 0 | Me | $CH_2CH(Me)CH_2$ | Me | $CH_2CF_3$ | $S(=O)_2Me$ | C |

TABLE 192-continued

| Compound Number | n | Y | W | Z | $R^1$ | $R^2$ | $R^3$ |
|---|---|---|---|---|---|---|---|
| B-1251 | 0 | H | $CH(Me)CH_2CH_2$ | H | $CH_2CF_3$ | $S(=O)_2Me$ | Cl |
| B-1252 | 0 | H | $CH(Me)CH_2CH_2$ | Me | $CH_2CF_3$ | $S(=O)_2Me$ | C |
| B-1253 | 0 | Me | $CH(Me)CH_2CH_2$ | H | $CH_2CF_3$ | $S(=O)_2Me$ | Cl |
| B-1254 | 0 | Me | $CH(Me)CH_2CH_2$ | Me | $CH_2CF_3$ | $S(=O)_2Me$ | Cl |
| B-1255 | 0 | H | single bond | Me | $CH_2CF_3$ | $S(=O)_2Me$ | Me |
| B-1256 | 0 | H | single bond | Et | $CH_2CF_3$ | $S(=O)_2Me$ | Me |
| B-1257 | 0 | Me | single bond | H | $CH_2CF_3$ | $S(=O)_2Me$ | Me |
| B-1258 | 0 | Et | single bond | H | $CH_2CF_3$ | $S(=O)_2Me$ | Me |
| B-1259 | 0 | Me | single bond | Me | $CH_2CF_3$ | $S(=O)_2Me$ | Me |
| B-1260 | 0 | H | $CH_2$ | Me | $CH_2CF_3$ | $S(=O)_2Me$ | Me |
| B-1261 | 0 | Me | $CH_2$ | H | $CH_2CF_3$ | $S(=O)_2Me$ | Me |
| B-1262 | 0 | Me | $CH_2$ | Me | $CH_2CF_3$ | $S(=O)_2Me$ | Me |
| B-1263 | 0 | H | CH(Me) | H | $CH_2CF_3$ | $S(=O)_2Me$ | Me |
| B-1264 | 0 | H | CH(Me) | Me | $CH_2CF_3$ | $S(=O)_2Me$ | Me |
| B-1265 | 0 | Me | CH(Me) | H | $CH_2CF_3$ | $S(=O)_2Me$ | Me |
| B-1266 | 0 | Me | CH(Me) | Me | $CH_2CF_3$ | $S(=O)_2Me$ | Me |
| B-1267 | 0 | H | $CH_2CH_2$ | Me | $CH_2CF_3$ | $S(=O)_2Me$ | Me |
| B-1268 | 0 | Me | $CH_2CH_2$ | H | $CH_2CF_3$ | $S(=O)_2Me$ | Me |
| B-1269 | 0 | Me | $CH_2CH_2$ | Me | $CH_2CF_3$ | $S(=O)_2Me$ | Me |
| B-1270 | 0 | H | $CH_2CH(Me)$ | H | $CH_2CF_3$ | $S(=O)_2Me$ | Me |

TABLE 193

| Compound Number | n | Y | W | Z | $R^1$ | $R^2$ | $R^3$ |
|---|---|---|---|---|---|---|---|
| B-1271 | 0 | M | $CH_2CH(Me)$ | Me | $CH_2CF_3$ | $S(=O)_2Me$ | Me |
| B-1272 | 0 | Me | $CH_2CH(Me)$ | H | $CH_2CF_3$ | $S(=O)_2Me$ | Me |
| B-1273 | 0 | Me | $CH_2CH(Me)$ | Me | $CH_2CF_3$ | $S(=O)_2Me$ | Me |
| B-1274 | 0 | H | $CH(Me)CH_2$ | H | $CH_2CF_3$ | $S(=O)_2Me$ | Me |
| B-1275 | 0 | H | $CH(Me)CH_2$ | Me | $CH_2CF_3$ | $S(=O)_2Me$ | Me |
| B-1276 | 0 | Me | $CH(Me)CH_2$ | H | $CH_2CF_3$ | $S(=O)_2Me$ | Me |
| B-1277 | 0 | Me | $CH(Me)CH_2$ | Me | $CH_2CF_3$ | $S(=O)_2Me$ | Me |
| B-1278 | 0 | H | $CH_2CH_2CH_2$ | Me | $CH_2CF_3$ | $S(=O)_2Me$ | Me |
| B-1279 | 0 | Me | $CH_2CH_2CH_2$ | H | $CH_2CF_3$ | $S(=O)_2Me$ | Me |
| B-1280 | 0 | Me | $CH_2CH_2CH_2$ | Me | $CH_2CF_3$ | $S(=O)_2Me$ | Me |
| B-1281 | 0 | H | $CH_2CH_2CH(Me)$ | H | $CH_2CF_3$ | $S(=O)_2Me$ | Me |
| B-1282 | 0 | H | $CH_2CH_2CH(Me)$ | Me | $CH_2CF_3$ | $S(=O)_2Me$ | Me |
| B-1283 | 0 | Me | $CH_2CH_2CH(Me)$ | H | $CH_2CF_3$ | $S(=O)_2Me$ | Me |
| B-1284 | 0 | Me | $CH_2CH_2CH(Me)$ | Me | $CH_2CF_3$ | $S(=O)_2Me$ | Me |
| B-1285 | 0 | H | $CH_2CH(Me)CH_2$ | H | $CH_2CF_3$ | $S(=O)_2Me$ | Me |
| B-1286 | 0 | H | $CH_2CH(Me)CH_2$ | Me | $CH_2CF_3$ | $S(=O)_2Me$ | Me |
| B-1287 | 0 | Me | $CH_2CH(Me)CH_2$ | H | $CH_2CF_3$ | $S(=O)_2Me$ | Me |
| B-1288 | 0 | Me | $CH_2CH(Me)CH_2$ | Ma | $CH_2CF_3$ | $S(=O)_2Me$ | Me |
| B-1289 | 0 | H | $CH(Me)CH_2CH_2$ | H | $CH_2CF_3$ | $S(=O)_2Me$ | Me |
| B-1290 | 0 | H | $CH(Me)CH_2CH_2$ | Me | $CH_2CF_3$ | $S(=O)_2Me$ | Me |
| B-1291 | 0 | Me | $CH(Me)CH_2CH_2$ | H | $CH_2CF_3$ | $S(=O)_2Me$ | Me |
| B-1292 | 0 | Me | $CH(Me)CH_2CH_2$ | Me | $CH_2CF_3$ | $S(=O)_2Me$ | Me |
| B-1293 | 0 | H | single bond | Me | $CH_2CF_3$ | $S(=O)_2CF_3$ | Cl |
| B-1294 | 0 | H | single bond | H | $CH_2CF_3$ | $S(=O)_2CF_3$ | Cl |
| B-1295 | 0 | Me | single bond | H | $CH_2CF_3$ | $S(=O)_2CF_3$ | Cl |
| B-1296 | 0 | Et | single bond | H | $CH_2CF_3$ | $S(=O)_2CF_3$ | Cl |
| B-1297 | 0 | Me | single bond | Me | $CH_2CF_3$ | $S(=O)_2CF_3$ | Cl |
| B-1298 | 0 | H | $CH_2$ | Me | $CH_2CF_3$ | $S(=O)_2CF_3$ | Cl |
| B-1299 | 0 | Me | $CH_2$ | H | $CH_2CF_3$ | $S(=O)_2CF_3$ | Cl |
| B-1300 | 0 | Me | $CH_2$ | Me | $CH_2CF_3$ | $S(=O)_2CF_3$ | Cl |
| B-1301 | 0 | H | CH(Me) | H | $CH_2CF_3$ | $S(=O)_2CF_3$ | Cl |
| B-1302 | 0 | H | CH(Me) | Me | $CH_2CF_3$ | $S(=O)_2CF_3$ | Cl |
| B-1303 | 0 | Me | CH(Me) | H | $CH_2CF_3$ | $S(=O)_2CF_3$ | Cl |
| B-1304 | 0 | Me | CH(Me) | Me | $CH_2CF_3$ | $S(=O)_2CF_3$ | Cl |
| B-1305 | 0 | H | $CH_2CH_2$ | Me | $CH_2CF_3$ | $S(=O)_2CF_3$ | Cl |
| B-1306 | 0 | Me | $CH_2CH_2$ | H | $CH_2CF_3$ | $S(=O)_2CF_3$ | Cl |
| B-1307 | 0 | Me | $CH_2CH_2$ | Me | $CH_2CF_3$ | $S(=O)_2CF_3$ | Cl |
| B-1308 | 0 | H | $CH_2CH(Me)$ | H | $CH_2CF_3$ | $S(=O)_2CF_3$ | Cl |
| B-1309 | 0 | H | $CH_2CH(Me)$ | Me | $CH_2CF_3$ | $S(=O)_2CF_3$ | Cl |
| B-1310 | 0 | Me | $CH_2CH(Me)$ | H | $CH_2CF_3$ | $S(=O)_2CF_3$ | Cl |
| B-1311 | 0 | Me | $CH_2CH(Me)$ | Me | $CH_2CF_3$ | $S(=O)_2CF_3$ | Cl |
| B-1312 | 0 | H | $CH(Me)CH_2$ | H | $CH_2CF_3$ | $S(=O)_2CF_3$ | Cl |
| B-1313 | 0 | H | $CH(Me)CH_2$ | Me | $CH_2CF_3$ | $S(=O)_2CF_3$ | Cl |
| B-1314 | 0 | Me | $CH(Me)CH_2$ | H | $CH_2CF_3$ | $S(=O)_2CF_3$ | Cl |

TABLE 194

| Compound Number | n | Y | W | Z | $R^1$ | $R^2$ | $R^3$ |
|---|---|---|---|---|---|---|---|
| B-1315 | 0 | Me | $CH(Me)CH_2$ | Me | $CH_2CF_3$ | $S(=O)_2CF_3$ | Cl |
| B-1316 | 0 | H | $CH_2CH_2CH_2$ | Me | $CH_2CF_3$ | $S(=O)_2CF_3$ | Cl |
| B-1317 | 0 | Me | $CH_2CH_2CH_2$ | H | $CH_2CF_3$ | $S(=O)_2CF_3$ | C |
| B-1318 | 0 | Me | $CH_2CH_2CH_2$ | Me | $CH_2CF_3$ | $S(=O)_2CF_3$ | Cl |
| B-1319 | 0 | H | $CH_2CH_2CH(Me)$ | H | $CH_2CF_3$ | $S(=O)_2CF_3$ | Cl |
| B-1320 | 0 | H | $CH_2CH_2CH(Me)$ | Me | $CH_2CF_3$ | $S(=O)_2CF_3$ | Cl |
| B-1321 | 0 | Me | $CH_2CH_2CH(Me)$ | H | $CH_2CF_3$ | $S(=O)_2CF_3$ | Cl |
| B-1322 | 0 | Me | $CH_2CH_2CH(Me)$ | Me | $CH_2CF_3$ | $S(=O)_2CF_3$ | Cl |
| B-1323 | 0 | H | $CH_2CH(Me)CH_2$ | H | $CH_2CF_3$ | $S(=O)_2CF_3$ | Cl |
| B-1324 | 0 | H | $CH_2CH(Me)CH_2$ | Me | $CH_2CF_3$ | $S(=O)_2CF_3$ | Cl |
| B-1325 | 0 | Me | $CH_2CH(Me)CH_2$ | H | $CH_2CF_3$ | $S(=O)_2CF_3$ | Cl |
| B-1326 | 0 | Me | $CH_2CH(Me)CH_2$ | Me | $CH_2CF_3$ | $S(=O)_2CF_3$ | Cl |
| B-1327 | 0 | H | $CH(Me)CH_2CH_2$ | H | $CH_2CF_3$ | $S(=O)_2CF_3$ | Cl |
| B-1328 | 0 | H | $CH(Me)CH_2CH_2$ | Me | $CH_2CF_3$ | $S(=O)_2CF_3$ | Cl |
| B-1329 | 0 | Me | $CH(Me)CH_2CH_2$ | H | $CH_2CF_3$ | $S(=O)_2CF_3$ | Cl |
| B-1330 | 0 | Me | $CH(Me)CH_2CH_2$ | Me | $CH_2CF_3$ | $S(=O)_2CF_3$ | Cl |
| B-1331 | 0 | H | single bond | Me | $CH_2CF_3$ | $S(=O)_2CF_3$ | Me |
| B-1332 | 0 | H | single bond | Et | $CH_2CF_3$ | $S(=O)_2CF_3$ | Me |
| B-1333 | 0 | Me | single bond | H | $CH_2CF_3$ | $S(=O)_2CF_3$ | Me |
| B-1334 | 0 | Et | single bond | H | $CH_2CF_3$ | $S(=O)_2CF_3$ | Me |
| B-1335 | 0 | Me | single bond | Me | $CH_2CF_3$ | $S(=O)_2CF_3$ | Me |
| B-1336 | 0 | H | $CH_2$ | Me | $CH_2CF_3$ | $S(=O)_2CF_3$ | Me |
| B-1337 | 0 | Me | $CH_2$ | H | $CH_2CF_3$ | $S(=O)_2CF_3$ | Me |
| B-1338 | 0 | Me | $CH_2$ | Me | $CH_2CF_3$ | $S(=O)_2CF_3$ | Me |
| B-1339 | 0 | H | CH(Me) | H | $CH_2CF_3$ | $S(=O)_2CF_3$ | Me |
| B-1340 | 0 | H | CH(Me) | Me | $CH_2CF_3$ | $S(=O)_2CF_3$ | Me |
| B-1341 | 0 | Me | CH(Me) | H | $CH_2CF_3$ | $S(=O)_2CF_3$ | Me |
| B-1342 | 0 | Me | CH(Me) | Me | $CH_2CF_3$ | $S(=O)_2CF_3$ | Me |
| B-1343 | 0 | H | $CH_2CH_2$ | Me | $CH_2CF_3$ | $S(=O)_2CF_3$ | Me |
| B-1344 | 0 | Me | $CH_2CH_2$ | H | $CH_2CF_3$ | $S(=O)_2CF_3$ | Me |
| B-1345 | 0 | Me | $CH_2CH_2$ | Me | $CH_2CF_3$ | $S(=O)_2CF_3$ | Me |
| B-1346 | 0 | H | $CH_2CH(Me)$ | H | $CH_2CF_3$ | $S(=O)_2CF_3$ | Me |
| B-1347 | 0 | H | $CH_2CH(Me)$ | Me | $CH_2CF_3$ | $S(=O)_2CF_3$ | Me |
| B-1348 | 0 | Me | $CH_2CH(Me)$ | H | $CH_2CF_3$ | $S(=O)_2CF_3$ | Me |
| B-1349 | 0 | Me | $CH_2CH(Me)$ | Me | $CH_2CF_3$ | $S(=O)_2CF_3$ | Me |
| B-1350 | 0 | H | $CH(Me)CH_2$ | H | $CH_2CF_3$ | $S(=O)_2CF_3$ | Me |
| B-1351 | 0 | H | $CH(Me)CH_2$ | Me | $CH_2CF_3$ | $S(=O)_2CF_3$ | Me |
| B-1352 | 0 | Me | $CH(Me)CH_2$ | H | $CH_2CF_3$ | $S(=O)_2CF_3$ | Me |
| B-1353 | 0 | Me | $CH(Me)CH_2$ | Me | $CH_2CF_3$ | $S(=O)_2CF_3$ | Me |
| B-1354 | 0 | H | $CH_2CH_2CH_2$ | Me | $CH_2CF_3$ | $S(=O)_2CF_3$ | Me |
| B-1355 | 0 | Me | $CH_2CH_2CH_2$ | H | $CH_2CF_3$ | $S(=O)_2CF_3$ | Me |
| B-1356 | 0 | Me | $CH_2CH_2CH_2$ | Me | $CH_2CF_3$ | $S(=O)_2CF_3$ | Me |
| B-1357 | 0 | H | $CH_2CH_2CH(Me)$ | H | $CH_2CF_3$ | $S(=O)_2CF_3$ | Me |
| B-1358 | 0 | H | $CH_2CH_2CH(Me)$ | Me | $CH_2CF_3$ | $S(=O)_2CF_3$ | Me |

TABLE 195

| Compound Number | n | Y | W | Z | $R^1$ | $R^2$ | $R^3$ |
|---|---|---|---|---|---|---|---|
| B-1359 | 0 | Me | $CH_2CH_2CH(Me)$ | H | $CH_2CF_3$ | $S(=O)_2CF_3$ | Me |
| B-1360 | 0 | Me | $CH_2CH_2CH(Me)$ | Me | $CH_2CF_3$ | $S(=O)_2CF_3$ | Me |
| B-1361 | 0 | H | $CH_2CH(Me)CH_2$ | H | $CH_2CF_3$ | $S(=O)_2CF_3$ | Me |
| B-1362 | 0 | H | $CH_2CH(Me)CH_2$ | Me | $CH_2CF_3$ | $S(=O)_2CF_3$ | Me |
| B-1363 | 0 | Me | $CH_2CH(Me)CH_2$ | H | $CH_2CF_3$ | $S(=O)_2CF_3$ | Me |
| B-1364 | 0 | Me | $CH_2CH(Me)CH_2$ | Me | $CH_2CF_3$ | $S(=O)_2CF_3$ | Me |
| B-1365 | 0 | H | $CH(Me)CH_2CH_2$ | H | $CH_2CF_3$ | $S(=O)_2CF_3$ | Me |
| B-1366 | 0 | H | $CH(Me)CH_2CH_2$ | Me | $CH_2CF_3$ | $S(=O)_2CF_3$ | Me |
| B-1367 | 0 | Me | $CH(Me)CH_2CH_2$ | H | $CH_2CF_3$ | $S(=O)_2CF_3$ | Me |
| B-1368 | 0 | Me | $CH(Me)CH_2CH_2$ | Me | $CH_2CF_3$ | $S(=O)_2CF_3$ | Me |
| B-1369 | 1 | H | single bond | Me | $CH_2CF_3$ | Me | Cl |
| B-1370 | 1 | H | single bond | Et | $CH_2CF_3$ | Me | Cl |
| B-1371 | 1 | Me | single bond | H | $CH_2CF_3$ | Me | Cl |
| B-1372 | 1 | Et | single bond | H | $CH_2CF_3$ | Me | Cl |
| B-1373 | 1 | Me | single bond | Me | $CH_2CF_3$ | Me | Cl |
| B-1374 | 1 | H | $CH_2$ | Me | $CH_2CF_3$ | Me | Cl |
| B-1375 | 1 | Me | $CH_2$ | H | $CH_2CF_3$ | Me | Cl |
| B-1376 | 1 | Me | $CH_2$ | Me | $CH_2CF_3$ | Me | Cl |
| B-1377 | 1 | H | CH(Me) | H | $CH_2CF_3$ | Me | Cl |
| B-1378 | 1 | H | CH(Me) | Me | $CH_2CF_3$ | Me | Cl |
| B-1379 | 1 | Me | CH(Me) | H | $CH_2CF_3$ | Me | Cl |
| B-1380 | 1 | Me | CH(Me) | Me | $CH_2CF_3$ | Me | Cl |
| B-1381 | 1 | H | $CH_2CH_2$ | Me | $CH_2CF_3$ | Me | Cl |
| B-1382 | 1 | Me | $CH_2CH_2$ | H | $CH_2CF_3$ | Me | Cl |

TABLE 195-continued

| Compound Number | n | Y | W | Z | $R^1$ | $R^2$ | $R^3$ |
|---|---|---|---|---|---|---|---|
| B-1383 | 1 | Me | $CH_2CH_2$ | Me | $CH_2CF_3$ | Me | Cl |
| B-1384 | 1 | H | $CH_2CH(Me)$ | H | $CH_2CF_3$ | Me | Cl |
| B-1385 | 1 | H | $CH_2CH(Me)$ | Me | $CH_2CF_3$ | Me | Cl |
| B-1386 | 1 | Me | $CH_2CH(Me)$ | H | $CH_2CF_3$ | Me | Cl |
| B-1387 | 1 | Me | $CH_2CH(Me)$ | Me | $CH_2CF_3$ | Me | Cl |
| B-1388 | 1 | H | $CH(Me)CH_2$ | H | $CH_2CF_3$ | Me | Cl |
| B-1389 | 1 | H | $CH(Me)CH_2$ | Me | $CH_2CF_3$ | Me | Cl |
| B-1390 | 1 | Me | $CH(Me)CH_2$ | H | $CH_2CF_3$ | Me | Cl |
| B-1391 | 1 | Me | $CH(Me)CH_2$ | Me | $CH_2CF_3$ | Me | Cl |
| B-1392 | 1 | H | $CH_2CH_2CH_2$ | Me | $CH_2CF_3$ | Me | Cl |
| B-1393 | 1 | Me | $CH_2CH_2CH_2$ | H | $CH_2CF_3$ | Me | Cl |
| B-1394 | 1 | Me | $CH_2CH_2CH_2$ | Me | $CH_2CF_3$ | Me | Cl |
| B-1395 | 1 | H | $CH_2CH_2CH(Me)$ | H | $CH_2CF_3$ | Me | Cl |
| B-1396 | 1 | H | $CH_2CH_2CH(Me)$ | Me | $CH_2CF_3$ | Me | Cl |
| B-1397 | 1 | Me | $CH_2CH_2CH(Me)$ | H | $CH_2CF_3$ | Me | Cl |
| B-1398 | 1 | Me | $CH_2CH_2CH(Me)$ | Me | $CH_2CF_3$ | Me | Cl |
| B-1399 | 1 | H | $CH_2CH(Me)CH_2$ | H | $CH_2CF_3$ | Me | Cl |
| B-1400 | 1 | H | $CH_2CH(Me)CH_2$ | Me | $CH_2CF_3$ | Me | Cl |
| B-1401 | 1 | Me | $CH_2CH(Me)CH_2$ | H | $CH_2CF_3$ | Me | Cl |
| B-1402 | 1 | Me | $CH_2CH(Me)CH_2$ | Me | $CH_2CF_3$ | Me | Cl |

TABLE 196

| Compound Number | n | Y | W | Z | $R^1$ | $R^2$ | $R^3$ |
|---|---|---|---|---|---|---|---|
| B-1403 | 1 | H | $CH(Me)CH_2CH_2$ | H | $CH_2CF_3$ | Me | Cl |
| B-1404 | 1 | H | $CH(Me)CH_2CH_2$ | Me | $CH_2CF_3$ | Me | Cl |
| B-1405 | 1 | Me | $CH(Me)CH_2CH_2$ | H | $CH_2CF_3$ | Me | Cl |
| B-1406 | 1 | Me | $CH(Me)CH_2CH_2$ | Me | $CH_2CF_3$ | Me | Cl |
| B-1407 | 1 | H | single bond | Me | $CH_2CF_3$ | Me | Me |
| B-1408 | 1 | H | single bond | Et | $CH_2CF_3$ | Me | Me |
| B-1409 | 1 | Me | single bond | H | $CH_2CF_3$ | Me | Me |
| B-1410 | 1 | Et | single bond | H | $CH_2CF_3$ | Me | Me |
| B-1411 | 1 | Me | single bond | Me | $CH_2CF_3$ | Me | Me |
| B-1412 | 1 | H | $CH_2$ | Me | $CH_2CF_3$ | Me | Me |
| B-1413 | 1 | Me | $CH_2$ | H | $CH_2CF_3$ | Me | Me |
| B-1414 | 1 | Me | $CH_2$ | Me | $CH_2CF_3$ | Me | Me |
| B-1415 | 1 | H | CH(Me) | H | $CH_2CF_3$ | Me | Me |
| B-1416 | 1 | H | CH(Me) | Me | $CH_2CF_3$ | Me | Me |
| B-1417 | 1 | Me | CH(Me) | H | $CH_2CF_3$ | Me | Me |
| B-1418 | 1 | Me | CH(Me) | Me | $CH_2CF_3$ | Me | Me |
| B-1419 | 1 | H | $CH_2CH_2$ | Me | $CH_2CF_3$ | Me | Me |
| B-1420 | 1 | Me | $CH_2CH_2$ | H | $CH_2CF_3$ | Me | Me |
| B-1421 | 1 | Me | $CH_2CH_2$ | Me | $CH_2CF_3$ | Me | Me |
| B-1422 | 1 | H | $CH_2CH(Me)$ | H | $CH_2CF_3$ | Me | Me |
| B-1423 | 1 | H | $CH_2CH(Me)$ | Me | $CH_2CF_3$ | Me | Me |
| B-1424 | 1 | Me | $CH_2CH(Me)$ | H | $CH_2CF_3$ | Me | Me |
| B-1425 | 1 | Me | $CH_2CH(Me)$ | Me | $CH_2CF_3$ | Me | Me |
| B-1426 | 1 | H | $CH(Me)CH_2$ | H | $CH_2CF_3$ | Me | Me |
| B-1427 | 1 | H | $CH(Me)CH_2$ | Me | $CH_2CF_3$ | Me | Me |
| B-1428 | 1 | Me | $CH(Me)CH_2$ | H | $CH_2CF_3$ | Me | Me |
| B-1429 | 1 | Me | $CH(Me)CH_2$ | Me | $CH_2CF_3$ | Me | Me |
| B-1430 | 1 | H | $CH_2CH_2CH_2$ | Me | $CH_2CF_3$ | Me | Me |
| B-1431 | 1 | Me | $CH_2CH_2CH_2$ | H | $CH_2CF_3$ | Me | Me |
| B-1432 | 1 | Me | $CH_2CH_2CH_2$ | Me | $CH_2CF_3$ | Me | Me |
| B-1433 | 1 | H | $CH_2CH_2CH(Me)$ | H | $CH_2CF_3$ | Me | Me |
| B-1434 | 1 | H | $CH_2CH_2CH(Me)$ | Me | $CH_2CF_3$ | Me | Me |
| B-1435 | 1 | Me | $CH_2CH_2CH(Me)$ | H | $CH_2CF_3$ | Me | Me |
| B-1436 | 1 | Me | $CH_2CH_2CH(Me)$ | Me | $CH_2CF_3$ | Me | Me |
| B-1437 | 1 | H | $CH_2CH(Me)CH_2$ | H | $CH_2CF_3$ | Me | Me |
| B-1438 | 1 | H | $CH_2CH(Me)CH_2$ | Me | $CH_2CF_3$ | Me | Me |
| B-1439 | 1 | Me | $CH_2CH(Me)CH_2$ | H | $CH_2CF_3$ | Me | Me |
| B-1440 | 1 | Me | $CH_2CH(Me)CH_2$ | Me | $CH_2CF_3$ | Me | Me |
| B-1441 | 1 | H | $CH(Me)CH_2CH_2$ | H | $CH_2CF_3$ | Me | Me |
| B-1442 | 1 | H | $CH(Me)CH_2CH_2$ | Me | $CH_2CF_3$ | Me | Me |
| B-1443 | 1 | Me | $CH(Me)CH_2CH_2$ | H | $CH_2CF_3$ | Me | Me |
| B-1444 | 1 | Me | $CH(Me)CH_2CH_2$ | Me | $CH_2CF_3$ | Me | Me |
| B-1445 | 1 | H | single bond | Me | $CH_2CF_3$ | Et | Cl |
| B-1446 | 1 | H | single bond | Et | $CH_2CF_3$ | Et | Cl |

TABLE 197

| Compound Number | n | Y | W | Z | $R^1$ | $R^2$ | $R^3$ |
|---|---|---|---|---|---|---|---|
| B-1447 | 1 | Me | single bond | H | $CH_2CF_3$ | Et | Cl |
| B-1448 | 1 | Et | single bond | H | $CH_2CF_3$ | Et | Cl |
| B-1449 | 1 | Me | single bond | Me | $CH_2CF_3$ | Et | Cl |
| B-1450 | 1 | H | $CH_2$ | Me | $CH_2CF_3$ | Et | Cl |
| B-1451 | 1 | Me | $CH_2$ | H | $CH_2CF_3$ | Et | Cl |
| B-1452 | 1 | Me | $CH_2$ | Me | $CH_2CF_3$ | Et | Cl |
| B-1453 | 1 | H | CH(Me) | H | $CH_2CF_3$ | Et | Cl |
| B-1454 | 1 | H | CH(Me) | Me | $CH_2CF_3$ | Et | Cl |
| B-1455 | 1 | Me | CH(Me) | H | $CH_2CF_3$ | Et | Cl |
| B-1456 | 1 | Me | CH(Me) | Me | $CH_2CF_3$ | Et | Cl |
| B-1457 | 1 | H | $CH_2CH_2$ | Me | $CH_2CF_3$ | Et | Cl |
| B-1458 | 1 | Me | $CH_2CH_2$ | H | $CH_2CF_3$ | Et | Cl |
| B-1459 | 1 | Me | $CH_2CH_2$ | Me | $CH_2CF_3$ | Et | Cl |
| B-1460 | 1 | H | $CH_2CH(Me)$ | H | $CH_2CF_3$ | Et | Cl |
| B-1461 | 1 | H | $CH_2CH(Me)$ | Me | $CH_2CF_3$ | Et | Cl |
| B-1462 | 1 | Me | $CH_2CH(Me)$ | H | $CH_2CF_3$ | Et | Cl |
| B-1463 | 1 | Me | $CH_2CH(Me)$ | Me | $CH_2CF_3$ | Et | Cl |
| B-1464 | 1 | H | $CH(Me)CH_2$ | H | $CH_2CF_3$ | Et | Cl |
| B-1465 | 1 | H | $CH(Me)CH_2$ | Me | $CH_2CF_3$ | Et | Cl |
| B-1466 | 1 | Me | $CH(Me)CH_2$ | H | $CH_2CF_3$ | Et | Cl |
| B-1467 | 1 | Me | $CH(Me)CH_2$ | Me | $CH_2CF_3$ | Et | Cl |
| B-1468 | 1 | H | $CH_2CH_2CH_2$ | Me | $CH_2CF_3$ | Et | Cl |
| B-1469 | 1 | Me | $CH_2CH_2CH_2$ | H | $CH_2CF_3$ | Et | Cl |
| B-1470 | 1 | Me | $CH_2CH_2CH_2$ | Me | $CH_2CF_3$ | Et | Cl |
| B-1471 | 1 | H | $CH_2CH_2CH(Me)$ | H | $CH_2CF_3$ | Et | Cl |
| B-1472 | 1 | H | $CH_2CH_2CH(Me)$ | Me | $CH_2CF_3$ | Et | Cl |
| B-1473 | 1 | Me | $CH_2CH_2CH(Me)$ | H | $CH_2CF_3$ | Et | Cl |
| B-1474 | 1 | Me | $CH_2CH_2CH(Me)$ | Me | $CH_2CF_3$ | Et | Cl |
| B-1475 | 1 | H | $CH_2CH(Me)CH_2$ | H | $CH_2CF_3$ | Et | Cl |
| B-1476 | 1 | H | $CH_2CH(Me)CH_2$ | Me | $CH_2CF_3$ | Et | Cl |
| B-1477 | 1 | Me | $CH_2CH(Me)CH_2$ | H | $CH_2CF_3$ | Et | Cl |
| B-1478 | 1 | Me | $CH_2CH(Me)CH_2$ | Me | $CH_2CF_3$ | Et | Cl |
| B-1479 | 1 | H | $CH(Me)CH_2CH_2$ | H | $CH_2CF_3$ | Et | Cl |
| B-1480 | 1 | H | $CH(Me)CH_2CH_2$ | Me | $CH_2CF_3$ | Et | Cl |
| B-1481 | 1 | Me | $CH(Me)CH_2CH_2$ | H | $CH_2CF_3$ | Et | Cl |
| B-1482 | 1 | Me | $CH(Me)CH_2CH_2$ | Me | $CH_2CF_3$ | Et | Cl |
| B-1483 | 1 | H | single bond | Me | $CH_2CF_3$ | Et | Me |
| B-1484 | 1 | H | single bond | Et | $CH_2CF_3$ | Et | Me |
| B-1485 | 1 | Me | single bond | H | $CH_2CF_3$ | Et | Me |
| B-1486 | 1 | Et | single bond | H | $CH_2CF_3$ | Et | Me |
| B-1487 | 1 | Me | single bond | Me | $CH_2CF_3$ | Et | Me |
| B-1488 | 1 | H | $CH_2$ | Me | $CH_2CF_3$ | Et | Me |
| B-1489 | 1 | Me | $CH_2$ | H | $CH_2CF_3$ | Et | Me |
| B-1490 | 1 | Me | $CH_2$ | Me | $CH_2CF_3$ | Et | Me |

TABLE 198

| Compound Number | n | Y | W | Z | $R^1$ | $R^2$ | $R^3$ |
|---|---|---|---|---|---|---|---|
| B-1491 | 1 | H | CH(Me) | H | $CH_2CF_3$ | Et | Me |
| B-1492 | 1 | H | CH(Me) | Me | $CH_2CF_3$ | Et | Me |
| B-1493 | 1 | Me | CH(Me) | H | $CH_2CF_3$ | Et | Me |
| B-1494 | 1 | Me | CH(Me) | Me | $CH_2CF_3$ | Et | Me |
| B-1495 | 1 | H | $CH_2CH_2$ | Me | $CH_2CF_3$ | Et | Me |
| B-1496 | 1 | Me | $CH_2CH_2$ | H | $CH_2CF_3$ | Et | Me |
| B-1497 | 1 | Me | $CH_2CH_2$ | Me | $CH_2CF_3$ | Et | Me |
| B-1498 | 1 | H | $CH_2CH(Me)$ | H | $CH_2CF_3$ | Et | Me |
| B-1499 | 1 | H | $CH_2CH(Me)$ | Me | $CH_2CF_3$ | Et | Me |
| B-1500 | 1 | Me | $CH_2CH(Me)$ | H | $CH_2CF_3$ | Et | Me |
| B-1501 | 1 | Me | $CH_2CH(Me)$ | Me | $CH_2CF_3$ | Et | Me |
| B-1502 | 1 | H | $CH(Me)CH_2$ | H | $CH_2CF_3$ | Et | Me |
| B-1503 | 1 | H | $CH(Me)CH_2$ | Me | $CH_2CF_3$ | Et | Me |
| B-1504 | 1 | Me | $CH(Me)CH_2$ | H | $CH_2CF_3$ | Et | Me |
| B-1505 | 1 | Me | $CH(Me)CH_2$ | Me | $CH_2CF_3$ | Et | Me |
| B-1506 | 1 | H | $CH_2CH_2CH_2$ | Me | $CH_2CF_3$ | Et | Me |
| B-1507 | 1 | Me | $CH_2CH_2CH_2$ | H | $CH_2CF_3$ | Et | Me |
| B-1508 | 1 | Me | $CH_2CH_2CH_2$ | Me | $CH_2CF_3$ | Et | Me |
| B-1509 | 1 | H | $CH_2CH_2CH(Me)$ | H | $CH_2CF_3$ | Et | Me |
| B-1510 | 1 | H | $CH_2CH_2CH(Me)$ | Me | $CH_2CF_3$ | Et | Me |
| B-1511 | 1 | Me | $CH_2CH_2CH(Me)$ | H | $CH_2CF_3$ | Et | Me |
| B-1512 | 1 | Me | $CH_2CH_2CH(Me)$ | Me | $CH_2CF_3$ | Et | Me |
| B-1513 | 1 | H | $CH_2CH(Me)CH_2$ | H | $CH_2CF_3$ | Et | Me |
| B-1514 | 1 | H | $CH_2CH(Me)CH_2$ | Me | $CH_2CF_3$ | Et | Me |

TABLE 198-continued

| Compound Number | n | Y | W | Z | $R^1$ | $R^2$ | $R^3$ |
|---|---|---|---|---|---|---|---|
| B-1515 | 1 | Me | $CH_2CH(Me)CH_2$ | H | $CH_2CF_3$ | Et | Me |
| B-1516 | 1 | Me | $CH_2CH(Me)CH_2$ | Me | $CH_2CF_3$ | Et | Me |
| B-1517 | 1 | H | $CH(Me)CH_2CH_2$ | H | $CH_2CF_3$ | Et | Me |
| B-1518 | 1 | H | $CH(Me)CH_2CH_2$ | Me | $CH_2CF_3$ | Et | Me |
| B-1519 | 1 | Me | $CH(Me)CH_2CH_2$ | H | $CH_2CF_3$ | Et | Me |
| B-1520 | 1 | Me | $CH(Me)CH_2CH_2$ | Me | $CH_2CF_3$ | Et | Me |
| B-1521 | 1 | H | single bond | Me | $CH_2CF_3$ | $CH_2OMe$ | Cl |
| B-1522 | 1 | H | single bond | Et | $CH_2CF_3$ | $CH_2OMe$ | Cl |
| B-1523 | 1 | Me | single bond | H | $CH_2CF_3$ | $CH_2OMe$ | Cl |
| B-1524 | 1 | Et | single bond | H | $CH_2CF_3$ | $CH_2OMe$ | Cl |
| B-1525 | 1 | Me | single bond | Me | $CH_2CF_3$ | $CH_2OMe$ | Cl |
| B-1526 | 1 | H | $CH_2$ | Me | $CH_2CF_3$ | $CH_2OMe$ | Cl |
| B-1527 | 1 | Me | $CH_2$ | H | $CH_2CF_3$ | $CH_2OMe$ | Cl |
| B-1528 | 1 | Me | $CH_2$ | Me | $CH_2CF_3$ | $CH_2OMe$ | Cl |
| B-1529 | 1 | H | CH(Me) | H | $CH_2CF_3$ | $CH_2OMe$ | Cl |
| B-1530 | 1 | H | CH(Me) | Me | $CH_2CF_3$ | $CH_2OMe$ | Cl |
| B-1531 | 1 | Me | CH(Me) | H | $CH_2CF_3$ | $CH_2OMe$ | Cl |
| B-1532 | 1 | Me | CH(Me) | Me | $CH_2CF_3$ | $CH_2OMe$ | Cl |
| B-1533 | 1 | H | $CH_2CH_2$ | Me | $CH_2CF_3$ | $CH_2OMe$ | Cl |
| B-1534 | 1 | Me | $CH_2CH_2$ | H | $CH_2CF_3$ | $CH_2OMe$ | Cl |

TABLE 199

| Compound Number | n | Y | W | Z | $R^1$ | $R^2$ | $R^3$ |
|---|---|---|---|---|---|---|---|
| B-1535 | 1 | Me | $CH_2CH_2$ | Me | $CH_2CF_3$ | $CH_2OMe$ | Cl |
| B-1536 | 1 | H | $CH_2CH(Me)$ | H | $CH_2CF_3$ | $CH_2OMe$ | Cl |
| B-1537 | 1 | H | $CH_2CH(Me)$ | Me | $CH_2CF_3$ | $CH_2OMe$ | Cl |
| B-1538 | 1 | Me | $CH_2CH(Me)$ | H | $CH_2CF_3$ | $CH_2OMe$ | Cl |
| B-1539 | 1 | Me | $CH_2CH(Me)$ | Me | $CH_2CF_3$ | $CH_2OMe$ | Cl |
| B-1540 | 1 | H | $CH(Me)CH_2$ | H | $CH_2CF_3$ | $CH_2OMe$ | Cl |
| B-1541 | 1 | H | $CH(Me)CH_2$ | Me | $CH_2CF_3$ | $CH_2OMe$ | Cl |
| B-1542 | 1 | Me | $CH(Me)CH_2$ | H | $CH_2CF_3$ | $CH_2OMe$ | Cl |
| B-1543 | 1 | Me | $CH(Me)CH_2$ | Me | $CH_2CF_3$ | $CH_2OMe$ | Cl |
| B-1544 | 1 | H | $CH_2CH_2CH_2$ | Me | $CH_2CF_3$ | $CH_2OMe$ | Cl |
| B-1545 | 1 | Me | $CH_2CH_2CH_2$ | H | $CH_2CF_3$ | $CH_2OMe$ | Cl |
| B-1546 | 1 | Me | $CH_2CH_2CH_2$ | Me | $CH_2CF_3$ | $CH_2OMe$ | Cl |
| B-1547 | 1 | H | $CH_2CH_2CH(Me)$ | H | $CH_2CF_3$ | $CH_2OMe$ | Cl |
| B-1548 | 1 | H | $CH_2CH_2CH(Me)$ | Me | $CH_2CF_3$ | $CH_2OMe$ | Cl |
| B-1549 | 1 | Me | $CH_2CH_2CH(Me)$ | H | $CH_2CF_3$ | $CH_2OMe$ | Cl |
| B-1550 | 1 | Me | $CH_2CH_2CH(Me)$ | Me | $CH_2CF_3$ | $CH_2OMe$ | Cl |
| B-1551 | 1 | H | $CH_2CH(Me)CH_2$ | H | $CH_2CF_3$ | $CH_2OMe$ | Cl |
| B-1552 | 1 | H | $CH_2CH(Me)CH_2$ | Me | $CH_2CF_3$ | $CH_2OMe$ | Cl |
| B-1553 | 1 | Me | $CH_2CH(Me)CH_2$ | H | $CH_2CF_3$ | $CH_2OMe$ | Cl |
| B-1554 | 1 | Me | $CH_2CH(Me)CH_2$ | Me | $CH_2CF_3$ | $CH_2OMe$ | Cl |
| B-1555 | 1 | H | $CH(Me)CH_2CH_2$ | H | $CH_2CF_3$ | $CH_2OMe$ | Cl |
| B-1556 | 1 | H | $CH(Me)CH_2CH_2$ | Me | $CH_2CF_3$ | $CH_2OMe$ | Cl |
| B-1557 | 1 | Me | $CH(Me)CH_2CH_2$ | H | $CH_2CF_3$ | $CH_2OMe$ | Cl |
| B-1558 | 1 | Me | $CH(Me)CH_2CH_2$ | Me | $CH_2CF_3$ | $CH_2OMe$ | Cl |
| B-1559 | 1 | H | single bond | Me | $CH_2CF_3$ | $CH_2OMe$ | Me |
| B-1560 | 1 | H | single bond | Et | $CH_2CF_3$ | $CH_2OMe$ | Me |
| B-1561 | 1 | Me | single bond | H | $CH_2CF_3$ | $CH_2OMe$ | Me |
| B-1562 | 1 | Et | single bond | H | $CH_2CF_3$ | $CH_2OMe$ | Me |
| B-1563 | 1 | Me | single bond | Me | $CH_2CF_3$ | $CH_2OMe$ | Me |
| B-1564 | 1 | H | $CH_2$ | Me | $CH_2CF_3$ | $CH_2OMe$ | Me |
| B-1565 | 1 | Me | $CH_2$ | H | $CH_2CF_3$ | $CH_2OMe$ | Me |
| B-1566 | 1 | Me | $CH_2$ | Me | $CH_2CF_3$ | $CH_2OMe$ | Me |
| B-1567 | 1 | H | CH(Me) | H | $CH_2CF_3$ | $CH_2OMe$ | Me |
| B-1568 | 1 | H | CH(Me) | Me | $CH_2CF_3$ | $CH_2OMe$ | Me |
| B-1569 | 1 | Me | CH(Me) | H | $CH_2CF_3$ | $CH_2OMe$ | Me |
| B-1570 | 1 | Me | CH(Me) | Me | $CH_2CF_3$ | $CH_2OMe$ | Me |
| B-1571 | 1 | H | $CH_2CH_2$ | Me | $CH_2CF_3$ | $CH_2OMe$ | Me |
| B-1572 | 1 | Me | $CH_2CH_2$ | H | $CH_2CF_3$ | $CH_2OMe$ | Me |
| B-1573 | 1 | Me | $CH_2CH_2$ | Me | $CH_2CF_3$ | $CH_2OMe$ | Me |
| B-1574 | 1 | H | $CH_2CH(Me)$ | H | $CH_2CF_3$ | $CH_2OMe$ | Me |
| B-1575 | 1 | H | $CH_2CH(Me)$ | Me | $CH_2CF_3$ | $CH_2OMe$ | Me |
| B-1576 | 1 | Me | $CH_2CH(Me)$ | H | $CH_2CF_3$ | $CH_2OMe$ | Me |
| B-1577 | 1 | Me | $CH_2CH(Me)$ | Me | $CH_2CF_3$ | $CH_2OMe$ | Me |
| B-1578 | 1 | H | $CH(Me)CH_2$ | H | $CH_2CF_3$ | $CH_2OMe$ | Me |

TABLE 200

| Compound Number | n | Y | W | Z | $R^1$ | $R^2$ | $R^3$ |
|---|---|---|---|---|---|---|---|
| B-1579 | 1 | H | $CH(Me)CH_2$ | Me | $CH_2CF_3$ | $CH_2OMe$ | Me |
| B-1580 | 1 | Me | $CH(Me)CH_2$ | H | $CH_2CF_3$ | $CH_2OMe$ | Me |
| B-1581 | 1 | Me | $CH(Me)CH_2$ | Me | $CH_2CF_3$ | $CH_2OMe$ | Me |
| B-1582 | 1 | H | $CH_2CH_2CH_2$ | Me | $CH_2CF_3$ | $CH_2OMe$ | Me |
| B-1583 | 1 | Me | $CH_2CH_2CH_2$ | H | $CH_2CF_3$ | $CH_2OMe$ | Me |
| B-1584 | 1 | Me | $CH_2CH_2CH_2$ | Me | $CH_2CF_3$ | $CH_2OMe$ | Me |
| B-1585 | 1 | H | $CH_2CH_2CH(Me)$ | H | $CH_2CF_3$ | $CH_2OMe$ | Me |
| B-1586 | 1 | H | $CH_2CH_2CH(Me)$ | Me | $CH_2CF_3$ | $CH_2OMe$ | Me |
| B-1587 | 1 | Me | $CH_2CH_2CH(Me)$ | H | $CH_2CF_3$ | $CH_2OMe$ | Me |
| B-1588 | 1 | Me | $CH_2CH_2CH(Me)$ | Me | $CH_2CF_3$ | $CH_2OMe$ | Me |
| B-1589 | 1 | H | $CH_2CH(Me)CH_2$ | H | $CH_2CF_3$ | $CH_2OMe$ | Me |
| B-1590 | 1 | H | $CH_2CH(Me)CH_2$ | Me | $CH_2CF_3$ | $CH_2OMe$ | Me |
| B-1591 | 1 | Me | $CH_2CH(Me)CH_2$ | H | $CH_2CF_3$ | $CH_2OMe$ | Me |
| B-1592 | 1 | Me | $CH_2CH(Me)CH_2$ | Me | $CH_2CF_3$ | $CH_2OMe$ | Me |
| B-1593 | 1 | H | $CH(Me)CH_2CH_2$ | H | $CH_2CF_3$ | $CH_2OMe$ | Me |
| B-1594 | 1 | H | $CH(Me)CH_2CH_2$ | Me | $CH_2CF_3$ | $CH_2OMe$ | Me |
| B-1595 | 1 | Me | $CH(Me)CH_2CH_2$ | H | $CH_2CF_3$ | $CH_2OMe$ | Me |
| B-1596 | 1 | Me | $CH(Me)CH_2CH_2$ | Me | $CH_2CF_3$ | $CH_2OMe$ | Me |
| B-1597 | 1 | H | single bond | Me | $CH_2CF_3$ | $CH_2CN$ | Cl |
| B-1598 | 1 | H | single bond | Et | $CH_2CF_3$ | $CH_2CN$ | Cl |
| B-1599 | 1 | Me | single bond | H | $CH_2CF_3$ | $CH_2CN$ | Cl |
| B-1600 | 1 | Et | single bond | H | $CH_2CF_3$ | $CH_2CN$ | Cl |
| B-1601 | 1 | Me | single bond | Me | $CH_2CF_3$ | $CH_2CN$ | Cl |
| B-1602 | 1 | H | $CH_2$ | Me | $CH_2CF_3$ | $CH_2CN$ | Cl |
| B-1603 | 1 | Me | $CH_2$ | H | $CH_2CF_3$ | $CH_2CN$ | Cl |
| B-1604 | 1 | Me | $CH_2$ | Me | $CH_2CF_3$ | $CH_2CN$ | Cl |
| B-1605 | 1 | H | CH(Me) | H | $CH_2CF_3$ | $CH_2CN$ | Cl |
| B-1606 | 1 | H | CH(Me) | Me | $CH_2CF_3$ | $CH_2CN$ | Cl |
| B-1607 | 1 | Me | CH(Me) | H | $CH_2CF_3$ | $CH_2CN$ | Cl |
| B-1608 | 1 | Me | CH(Me) | Me | $CH_2CF_3$ | $CH_2CN$ | Cl |
| B-1609 | 1 | H | $CH_2CH_2$ | Me | $CH_2CF_3$ | $CH_2CN$ | Cl |
| B-1610 | 1 | Me | $CH_2CH_2$ | H | $CH_2CF_3$ | $CH_2CN$ | Cl |
| B-1611 | 1 | Me | $CH_2CH_2$ | Me | $CH_2CF_3$ | $CH_2CN$ | Cl |
| B-1612 | 1 | H | $CH_2CH(Me)$ | H | $CH_2CF_3$ | $CH_2CN$ | Cl |
| B-1613 | 1 | H | $CH_2CH(Me)$ | Me | $CH_2CF_3$ | $CH_2CN$ | Cl |
| B-1614 | 1 | Me | $CH_2CH(Me)$ | H | $CH_2CF_3$ | $CH_2CN$ | Cl |
| B-1615 | 1 | Me | $CH_2CH(Me)$ | Me | $CH_2CF_3$ | $CH_2CN$ | Cl |
| B-1616 | 1 | H | $CH(Me)CH_2$ | H | $CH_2CF_3$ | $CH_2CN$ | Cl |
| B-1617 | 1 | H | $CH(Me)CH_2$ | Me | $CH_2CF_3$ | $CH_2CN$ | Cl |
| B-1618 | 1 | Me | $CH(Me)CH_2$ | H | $CH_2CF_3$ | $CH_2CN$ | Cl |
| B-1619 | 1 | Me | $CH(Me)CH_2$ | Me | $CH_2CF_3$ | $CH_2CN$ | Cl |
| B-1620 | 1 | H | $CH_2CH_2CH_2$ | Me | $CH_2CF_3$ | $CH_2CN$ | Cl |
| B-1621 | 1 | Me | $CH_2CH_2CH_2$ | H | $CH_2CF_3$ | $CH_2CN$ | Cl |
| B-1622 | 1 | Me | $CH_2CH_2CH_2$ | Me | $CH_2CF_3$ | $CH_2CN$ | Cl |

TABLE 201

| Compound Number | n | Y | W | Z | $R^1$ | $R^2$ | $R^3$ |
|---|---|---|---|---|---|---|---|
| B-1623 | 1 | H | $CH_2CH_2CH(Me)$ | H | $CH_2CF_3$ | $CH_2CN$ | Cl |
| B-1624 | 1 | H | $CH_2CH_2CH(Me)$ | Me | $CH_2CF_3$ | $CH_2CN$ | Cl |
| B-1625 | 1 | Me | $CH_2CH_2CH(Me)$ | H | $CH_2CF_3$ | $CH_2CN$ | Cl |
| B-1626 | 1 | Me | $CH_2CH_2CH(Me)$ | Me | $CH_2CF_3$ | $CH_2CN$ | Cl |
| B-1627 | 1 | H | $CH_2CH(Me)CH_2$ | H | $CH_2CF_3$ | $CH_2CN$ | Cl |
| B-1628 | 1 | H | $CH_2CH(Me)CH_2$ | Me | $CH_2CF_3$ | $CH_2CN$ | Cl |
| B-1629 | 1 | Me | $CH_2CH(Me)CH_2$ | H | $CH_2CF_3$ | $CH_2CN$ | Cl |
| B-1630 | 1 | Me | $CH_2CH(Me)CH_2$ | Me | $CH_2CF_3$ | $CH_2CN$ | Cl |
| B-1631 | 1 | H | $CH(Me)CH_2CH_2$ | H | $CH_2CF_3$ | $CH_2CN$ | Cl |
| B-1632 | 1 | H | $CH(Me)CH_2CH_2$ | Me | $CH_2CF_3$ | $CH_2CN$ | Cl |
| B-1633 | 1 | Me | $CH(Me)CH_2CH_2$ | H | $CH_2CF_3$ | $CH_2CN$ | Cl |
| B-1634 | 1 | Me | $CH(Me)CH_2CH_2$ | Me | $CH_2CF_3$ | $CH_2CN$ | Cl |
| B-1635 | 1 | H | single bond | Me | $CH_2CF_3$ | $CH_2CN$ | Me |
| B-1636 | 1 | H | single bond | Et | $CH_2CF_3$ | $CH_2CN$ | Me |
| B-1637 | 1 | Me | single bond | H | $CH_2CF_3$ | $CH_2CN$ | Me |
| B-1638 | 1 | Et | single bond | H | $CH_2CF_3$ | $CH_2CN$ | Me |
| B-1639 | 1 | Me | single bond | Me | $CH_2CF_3$ | $CH_2CN$ | Me |
| B-1640 | 1 | H | $CH_2$ | Me | $CH_2CF_3$ | $CH_2CN$ | Me |
| B-1641 | 1 | Me | $CH_2$ | H | $CH_2CF_3$ | $CH_2CN$ | Me |
| B-1642 | 1 | Me | $CH_2$ | Me | $CH_2CF_3$ | $CH_2CN$ | Me |
| B-1643 | 1 | H | CH(Me) | H | $CH_2CF_3$ | $CH_2CN$ | Me |
| B-1644 | 1 | H | CH(Me) | Me | $CH_2CF_3$ | $CH_2CN$ | Me |
| B-1645 | 1 | Me | CH(Me) | H | $CH_2CF_3$ | $CH_2CN$ | Me |
| B-1646 | 1 | Me | CH(Me) | Me | $CH_2CF_3$ | $CH_2CN$ | Me |

TABLE 201-continued

| Compound Number | n | Y | W | Z | $R^1$ | $R^2$ | $R^3$ |
|---|---|---|---|---|---|---|---|
| B-1647 | 1 | H | $CH_2CH_2$ | Me | $CH_2CF_3$ | $CH_2CN$ | Me |
| B-1648 | 1 | Me | $CH_2CH_2$ | H | $CH_2CF_3$ | $CH_2CN$ | Me |
| B-1649 | 1 | Me | $CH_2CH_2$ | Me | $CH_2CF_3$ | $CH_2CN$ | Me |
| B-1650 | 1 | H | $CH_2CH(Me)$ | H | $CH_2CF_3$ | $CH_2CN$ | Me |
| B-1651 | 1 | H | $CH_2CH(Me)$ | Me | $CH_2CF_3$ | $CH_2CN$ | Me |
| B-1652 | 1 | Me | $CH_2CH(Me)$ | H | $CH_2CF_3$ | $CH_2CN$ | Me |
| B-1653 | 1 | Me | $CH_2CH(Me)$ | Me | $CH_2CF_3$ | $CH_2CN$ | Me |
| B-1654 | 1 | H | $CH(Me)CH_2$ | H | $CH_2CF_3$ | $CH_2CN$ | Me |
| B-1655 | 1 | H | $CH(Me)CH_2$ | Me | $CH_2CF_3$ | $CH_2CN$ | Me |
| B-1656 | 1 | Me | $CH(Me)CH_2$ | H | $CH_2CF_3$ | $CH_2CN$ | Me |
| B-1657 | 1 | Me | $CH(Me)CH_2$ | Me | $CH_2CF_3$ | $CH_2CN$ | Me |
| B-1658 | 1 | H | $CH_2CH_2CH_2$ | Me | $CH_2CF_3$ | $CH_2CN$ | Me |
| B-1659 | 1 | Me | $CH_2CH_2CH_2$ | H | $CH_2CF_3$ | $CH_2CN$ | Me |
| B-1660 | 1 | Me | $CH_2CH_2CH_2$ | Me | $CH_2CF_3$ | $CH_2CN$ | Me |
| B-1661 | 1 | H | $CH_2CH_2CH(Me)$ | H | $CH_2CF_3$ | $CH_2CN$ | Me |
| B-1662 | 1 | H | $CH_2CH_2CH(Me)$ | Me | $CH_2CF_3$ | $CH_2CN$ | Me |
| B-1663 | 1 | Me | $CH_2CH_2CH(Me)$ | H | $CH_2CF_3$ | $CH_2CN$ | Me |
| B-1664 | 1 | Me | $CH_2CH_2CH(Me)$ | Me | $CH_2CF_3$ | $CH_2CN$ | Me |
| B-1665 | 1 | H | $CH_2CH(Me)CH_2$ | H | $CH_2CF_3$ | $CH_2CN$ | Me |
| B-1666 | 1 | H | $CH_2CH(Me)CH_2$ | Me | $CH_2CF_3$ | $CH_2CN$ | Me |

TABLE 202

| Compound Number | n | Y | W | Z | $R^1$ | $R^2$ | $R^3$ |
|---|---|---|---|---|---|---|---|
| B-1667 | 1 | Me | $CH_2CH(Me)CH_2$ | H | $CH_2CF_3$ | $CH_2CN$ | Me |
| B-1668 | 1 | Me | $CH_2CH(Me)CH_2$ | Me | $CH_2CF_3$ | $CH_2CN$ | Me |
| B-1669 | 1 | H | $CH(Me)CH_2CH_2$ | H | $CH_2CF_3$ | $CH_2CN$ | Me |
| B-1670 | 1 | H | $CH(Me)CH_2CH_2$ | Me | $CH_2CF_3$ | $CH_2CN$ | Me |
| B-1671 | 1 | Me | $CH(Me)CH_2CH_2$ | H | $CH_2CF_3$ | $CH_2CN$ | Me |
| B-1672 | 1 | Me | $CH(Me)CH_2CH_2$ | Me | $CH_2CF_3$ | $CH_2CN$ | Me |
| B-1673 | 1 | H | single bond | Me | $CH_2CF_3$ | C(=O)Me | Cl |
| B-1674 | 1 | H | single bond | Et | $CH_2CF_3$ | C(=O)Me | Cl |
| B-1675 | 1 | Me | single bond | H | $CH_2CF_3$ | C(=O)Me | Cl |
| B-1676 | 1 | Et | single bond | H | $CH_2CF_3$ | C(=O)Me | Cl |
| B-1677 | 1 | Me | single bond | Me | $CH_2CF_3$ | C(=O)Me | Cl |
| B-1678 | 1 | H | $CH_2$ | Me | $CH_2CF_3$ | C(=O)Me | Cl |
| B-1679 | 1 | Me | $CH_2$ | H | $CH_2CF_3$ | C(=O)Me | Cl |
| B-1680 | 1 | Me | $CH_2$ | Me | $CH_2CF_3$ | C(=O)Me | Cl |
| B-1681 | 1 | H | CH(Me) | H | $CH_2CF_3$ | C(=O)Me | Cl |
| B-1682 | 1 | H | CH(Me) | Me | $CH_2CF_3$ | C(=O)Me | Cl |
| B-1683 | 1 | Me | CH(Me) | H | $CH_2CF_3$ | C(=O)Me | Cl |
| B-1684 | 1 | Me | CH(Me) | Me | $CH_2CF_3$ | C(=O)Me | Cl |
| B-1685 | 1 | H | $CH_2CH_2$ | Me | $CH_2CF_3$ | C(=O)Me | Cl |
| B-1686 | 1 | Me | $CH_2CH_2$ | H | $CH_2CF_3$ | C(=O)Me | Cl |
| B-1687 | 1 | Me | $CH_2CH_2$ | Me | $CH_2CF_3$ | C(=O)Me | Cl |
| B-1688 | 1 | H | $CH_2CH(Me)$ | H | $CH_2CF_3$ | C(=O)Me | Cl |
| B-1689 | 1 | H | $CH_2CH(Me)$ | Me | $CH_2CF_3$ | C(=O)Me | Cl |
| B-1690 | 1 | Me | $CH_2CH(Me)$ | H | $CH_2CF_3$ | C(=O)Me | Cl |
| B-1691 | 1 | Me | $CH_2CH(Me)$ | Me | $CH_2CF_3$ | C(=O)Me | Cl |
| B-1692 | 1 | H | $CH(Me)CH_2$ | H | $CH_2CF_3$ | C(=O)Me | Cl |
| B-1693 | 1 | H | $CH(Me)CH_2$ | Me | $CH_2CF_3$ | C(=O)Me | Cl |
| B-1694 | 1 | Me | $CH(Me)CH_2$ | H | $CH_2CF_3$ | C(=O)Me | Cl |
| B-1695 | 1 | Me | $CH(Me)CH_2$ | Me | $CH_2CF_3$ | C(=O)Me | Cl |
| B-1696 | 1 | H | $CH_2CH_2CH_2$ | Me | $CH_2CF_3$ | C(=O)Me | Cl |
| B-1697 | 1 | Me | $CH_2CH_2CH_2$ | H | $CH_2CF_3$ | C(=O)Me | Cl |
| B-1698 | 1 | Me | $CH_2CH_2CH_2$ | Me | $CH_2CF_3$ | C(=O)Me | Cl |
| B-1699 | 1 | H | $CH_2CH_2CH(Me)$ | H | $CH_2CF_3$ | C(=O)Me | Cl |
| B-1700 | 1 | H | $CH_2CH_2CH(Me)$ | Me | $CH_2CF_3$ | C(=O)Me | Cl |
| B-1701 | 1 | Me | $CH_2CH_2CH(Me)$ | H | $CH_2CF_3$ | C(=O)Me | Cl |
| B-1702 | 1 | Me | $CH_2CH_2CH(Me)$ | Me | $CH_2CF_3$ | C(=O)Me | Cl |
| B-1703 | 1 | H | $CH_2CH(Me)CH_2$ | H | $CH_2CF_3$ | C(=O)Me | Cl |
| B-1704 | 1 | H | $CH_2CH(Me)CH_2$ | Me | $CH_2CF_3$ | C(=O)Me | Cl |
| B-1705 | 1 | Me | $CH_2CH(Me)CH_2$ | H | $CH_2CF_3$ | C(=O)Me | Cl |
| B-1706 | 1 | Me | $CH_2CH(Me)CH_2$ | Me | $CH_2CF_3$ | C(=O)Me | Cl |
| B-1707 | 1 | H | $CH(Me)CH_2CH_2$ | H | $CH_2CF_3$ | C(=O)Me | Cl |
| B-1708 | 1 | H | $CH(Me)CH_2CH_2$ | Me | $CH_2CF_3$ | C(=O)Me | Cl |
| B-1709 | 1 | Me | $CH(Me)CH_2CH_2$ | H | $CH_2CF_3$ | C(=O)Me | Cl |
| B-1710 | 1 | Me | $CH(Me)CH_2CH_2$ | Me | $CH_2CF_3$ | C(=O)Me | Cl |

TABLE 203

| Compound Number | n | Y | W | Z | $R^1$ | $R^2$ | $R^3$ |
|---|---|---|---|---|---|---|---|
| B-1711 | 1 | H | single bond | Me | $CH_2CF_3$ | C(=O)Me | Me |
| B-1712 | 1 | H | single bond | Et | $CH_2CF_3$ | C(=O)Me | Me |
| B-1713 | 1 | Me | single bond | H | $CH_2CF_3$ | C(=O)Me | Me |
| B-1714 | 1 | Et | single bond | H | $CH_2CF_3$ | C(=O)Me | Me |
| B-1715 | 1 | Me | single bond | Me | $CH_2CF_3$ | C(=O)Me | Me |
| B-1716 | 1 | H | $CH_2$ | Me | $CH_2CF_3$ | C(=O)Me | Me |
| B-1717 | 1 | Me | $CH_2$ | H | $CH_2CF_3$ | C(=O)Me | Me |
| B-1718 | 1 | Me | $CH_2$ | Me | $CH_2CF_3$ | C(=O)Me | Me |
| B-1719 | 1 | H | CH(Me) | H | $CH_2CF_3$ | C(=O)Me | Me |
| B-1720 | 1 | H | CH(Me) | Me | $CH_2CF_3$ | C(=O)Me | Me |
| B-1721 | 1 | Me | CH(Me) | H | $CH_2CF_3$ | C(=O)Me | Me |
| B-1722 | 1 | Me | CH(Me) | Me | $CH_2CF_3$ | C(=O)Me | Me |
| B-1723 | 1 | H | $CH_2CH_2$ | Me | $CH_2CF_3$ | C(=O)Me | Me |
| B-1724 | 1 | Me | $CH_2CH_2$ | H | $CH_2CF_3$ | C(=O)Me | Me |
| B-1725 | 1 | Me | $CH_2CH_2$ | Me | $CH_2CF_3$ | C(=O)Me | Me |
| B-1726 | 1 | H | $CH_2CH(Me)$ | H | $CH_2CF_3$ | C(=O)Me | Me |
| B-1727 | 1 | H | $CH_2CH(Me)$ | Me | $CH_2CF_3$ | C(=O)Me | Me |
| B-1728 | 1 | Me | $CH_2CH(Me)$ | H | $CH_2CF_3$ | C(=O)Me | Me |
| B-1729 | 1 | Me | $CH_2CH(Me)$ | Me | $CH_2CF_3$ | C(=O)Me | Me |
| B-1730 | 1 | H | $CH(Me)CH_2$ | H | $CH_2CF_3$ | C(=O)Me | Me |
| B-1731 | 1 | H | $CH(Me)CH_2$ | Me | $CH_2CF_3$ | C(=O)Me | Me |
| B-1732 | 1 | Me | $CH(Me)CH_2$ | H | $CH_2CF_3$ | C(=O)Me | Me |
| B-1733 | 1 | Me | $CH(Me)CH_2$ | Me | $CH_2CF_3$ | C(=O)Me | Me |
| B-1734 | 1 | H | $CH_2CH_2CH_2$ | Me | $CH_2CF_3$ | C(=O)Me | Me |
| B-1735 | 1 | Me | $CH_2CH_2CH_2$ | H | $CH_2CF_3$ | C(=O)Me | Me |
| B-1736 | 1 | Me | $CH_2CH_2CH_2$ | Me | $CH_2CF_3$ | C(=O)Me | Me |
| B-1737 | 1 | H | $CH_2CH_2CH(Me)$ | H | $CH_2CF_3$ | C(=O)Me | Me |
| B-1738 | 1 | H | $CH_2CH_2CH(Me)$ | Me | $CH_2CF_3$ | C(=O)Me | Me |
| B-1739 | 1 | Me | $CH_2CH_2CH(Me)$ | H | $CH_2CF_3$ | C(=O)Me | Me |
| B-1740 | 1 | Me | $CH_2CH_2CH(Me)$ | Me | $CH_2CF_3$ | C(=O)Me | Me |
| B-1741 | 1 | H | $CH_2CH(Me)CH_2$ | H | $CH_2CF_3$ | C(=O)Me | Me |
| B-1742 | 1 | H | $CH_2CH(Me)CH_2$ | Me | $CH_2CF_3$ | C(=O)Me | Me |
| B-1743 | 1 | Me | $CH_2CH(Me)CH_2$ | H | $CH_2CF_3$ | C(=O)Me | Me |
| B-1744 | 1 | Me | $CH_2CH(Me)CH_2$ | Me | $CH_2CF_3$ | C(=O)Me | Me |
| B-1745 | 1 | H | $CH(Me)CH_2CH_2$ | H | $CH_2CF_3$ | C(=O)Me | Me |
| B-1746 | 1 | H | $CH(Me)CH_2CH_2$ | Me | $CH_2CF_3$ | C(=O)Me | Me |
| B-1747 | 1 | Me | $CH(Me)CH_2CH_2$ | H | $CH_2CF_3$ | C(=O)Me | Me |
| B-1748 | 1 | Me | $CH(Me)CH_2CH_2$ | Me | $CH_2CF_3$ | C(=O)Me | Me |
| B-1749 | 1 | H | single bond | Me | $CH_2CF_3$ | C(=O)Ph | Cl |
| B-1750 | 1 | H | single bond | Et | $CH_2CF_3$ | C(=O)Ph | Cl |
| B-1751 | 1 | Me | single bond | H | $CH_2CF_3$ | C(=O)Ph | Cl |
| B-1752 | 1 | Et | single bond | H | $CH_2CF_3$ | C(=O)Ph | Cl |
| B-1753 | 1 | Me | single bond | Me | $CH_2CF_3$ | C(=O)Ph | Cl |
| B-1754 | 1 | H | $CH_2$ | Me | $CH_2CF_3$ | C(=O)Ph | Cl |

TABLE 204

| Compound Number | n | Y | W | Z | $R^1$ | $R^2$ | $R^3$ |
|---|---|---|---|---|---|---|---|
| B-1755 | 1 | Me | $CH_2$ | H | $CH_2CF_3$ | C(=O)Ph | Cl |
| B-1756 | 1 | Me | $CH_2$ | Me | $CH_2CF_3$ | C(=O)Ph | Cl |
| B-1757 | 1 | H | CH(Me) | H | $CH_2CF_3$ | C(=O)Ph | Cl |
| B-1758 | 1 | H | CH(Me) | Me | $CH_2CF_3$ | C(=O)Ph | Cl |
| B-1759 | 1 | Me | CH(Me) | H | $CH_2CF_3$ | C(=O)Ph | Cl |
| B-1760 | 1 | Me | CH(Me) | Me | $CH_2CF_3$ | C(=O)Ph | Cl |
| B-1761 | 1 | H | $CH_2CH_2$ | Me | $CH_2CF_3$ | C(=O)Ph | Cl |
| B-1762 | 1 | Me | $CH_2CH_2$ | H | $CH_2CF_3$ | C(=O)Ph | Cl |
| B-1763 | 1 | Me | $CH_2CH_2$ | Me | $CH_2CF_3$ | C(=O)Ph | Cl |
| B-1764 | 1 | H | $CH_2CH(Me)$ | H | $CH_2CF_3$ | C(=O)Ph | Cl |
| B-1765 | 1 | H | $CH_2CH(Me)$ | Me | $CH_2CF_3$ | C(=O)Ph | Cl |
| B-1766 | 1 | Me | $CH_2CH(Me)$ | H | $CH_2CF_3$ | C(=O)Ph | Cl |
| B-1767 | 1 | Me | $CH_2CH(Me)$ | Me | $CH_2CF_3$ | C(=O)Ph | Cl |
| B-1768 | 1 | H | $CH(Me)CH_2$ | H | $CH_2CF_3$ | C(=O)Ph | Cl |
| B-1769 | 1 | H | $CH(Me)CH_2$ | Me | $CH_2CF_3$ | C(=O)Ph | Cl |
| B-1770 | 1 | Me | $CH(Me)CH_2$ | H | $CH_2CF_3$ | C(=O)Ph | Cl |
| B-1771 | 1 | Me | $CH(Me)CH_2$ | Me | $CH_2CF_3$ | C(=O)Ph | Cl |
| B-1772 | 1 | H | $CH_2CH_2CH_2$ | Me | $CH_2CF_3$ | C(=O)Ph | Cl |
| B-1773 | 1 | Me | $CH_2CH_2CH_2$ | H | $CH_2CF_3$ | C(=O)Ph | Cl |
| B-1774 | 1 | Me | $CH_2CH_2CH_2$ | Me | $CH_2CF_3$ | C(=O)Ph | Cl |
| B-1775 | 1 | H | $CH_2CH_2CH(Me)$ | H | $CH_2CF_3$ | C(=O)Ph | Cl |
| B-1776 | 1 | H | $CH_2CH_2CH(Me)$ | Me | $CH_2CF_3$ | C(=O)Ph | Cl |
| B-1777 | 1 | Me | $CH_2CH_2CH(Me)$ | H | $CH_2CF_3$ | C(=O)Ph | Cl |
| B-1778 | 1 | Me | $CH_2CH_2CH(Me)$ | Me | $CH_2CF_3$ | C(=O)Ph | Cl |

TABLE 204-continued

| Compound Number | n | Y | W | Z | R1 | R2 | R3 |
|---|---|---|---|---|---|---|---|
| B-1779 | 1 | H | $CH_2CH(Me)CH_2$ | H | $CH_2CF_3$ | C(=O)Ph | Cl |
| B-1780 | 1 | H | $CH_2CH(Me)CH_2$ | Me | $CH_2CF_3$ | C(=O)Ph | Cl |
| B-1781 | 1 | Me | $CH_2CH(Me)CH_2$ | H | $CH_2CF_3$ | C(=O)Ph | Cl |
| B-1782 | 1 | Me | $CH_2CH(Me)CH_2$ | Me | $CH_2CF_3$ | C(=O)Ph | Cl |
| B-1783 | 1 | H | $CH(Me)CH_2CH_2$ | H | $CH_2CF_3$ | C(=O)Ph | Cl |
| B-1784 | 1 | H | $CH(Me)CH_2CH_2$ | Me | $CH_2CF_3$ | C(=O)Ph | Cl |
| B-1785 | 1 | Me | $CH(Me)CH_2CH_2$ | H | $CH_2CF_3$ | C(=O)Ph | Cl |
| B-1786 | 1 | Me | $CH(Me)CH_2CH_2$ | Me | $CH_2CF_3$ | C(=O)Ph | Cl |
| B-1787 | 1 | H | single bond | Me | $CH_2CF_3$ | C(=O)Ph | Me |
| B-1788 | 1 | H | single bond | Et | $CH_2CF_3$ | C(=O)Ph | Me |
| B-1789 | 1 | Me | single bond | H | $CH_2CF_3$ | C(=O)Ph | Me |
| B-1790 | 1 | Et | single bond | H | $CH_2CF_3$ | C(=O)Ph | Me |
| B-1791 | 1 | Me | single bond | Me | $CH_2CF_3$ | C(=O)Ph | Me |
| B-1792 | 1 | H | CH | Me | $CH_2CF_3$ | C(=O)Ph | Me |
| B-1793 | 1 | Me | $CH_2$ | H | $CH_2CF_3$ | C(=O)Ph | Me |
| B-1794 | 1 | Me | $CH_2$ | Me | $CH_2CF_3$ | C(=O)Ph | Me |
| B-1795 | 1 | H | CH(Me) | H | $CH_2CF_3$ | C(=O)Ph | Me |
| B-1796 | 1 | H | CH(Me) | Me | $CH_2CF_3$ | C(=O)Ph | Me |
| B-1797 | 1 | Me | CH(Me) | H | $CH_2CF_3$ | C(=O)Ph | Me |
| B-1798 | 1 | Me | CH(Me) | Me | $CH_2CF_3$ | C(=O)Ph | Me |

TABLE 205

| Compound Number | n | Y | W | Z | R1 | R2 | R3 |
|---|---|---|---|---|---|---|---|
| B-1799 | 1 | H | $CH_2CH_2$ | Me | $CH_2CF_3$ | C(=O)Ph | Me |
| B-1800 | 1 | Me | $CH_2CH_2$ | H | $CH_2CF_3$ | C(=O)Ph | Me |
| B-1801 | 1 | Me | $CH_2CH_2$ | Me | $CH_2CF_3$ | C(=O)Ph | Me |
| B-1802 | 1 | H | $CH_2CH(Me)$ | H | $CH_2CF_3$ | C(=O)Ph | Me |
| B-1803 | 1 | H | $CH_2CH(Me)$ | Me | $CH_2CF_3$ | C(=O)Ph | Me |
| B-1804 | 1 | Me | $CH_2CH(Me)$ | H | $CH_2CF_3$ | C(=O)Ph | Me |
| B-1805 | 1 | Me | $CH_2CH(Me)$ | Me | $CH_2CF_3$ | C(=O)Ph | Me |
| B-1806 | 1 | H | $CH(Me)CH_2$ | H | $CH_2CF_3$ | C(=O)Ph | Me |
| B-1807 | 1 | H | $CH(Me)CH_2$ | Me | $CH_2CF_3$ | C(=O)Ph | Me |
| B-1808 | 1 | Me | $CH(Me)CH_2$ | H | $CH_2CF_3$ | C(=O)Ph | Me |
| B-1809 | 1 | Me | $CH(Me)CH_2$ | Me | $CH_2CF_3$ | C(=O)Ph | Me |
| B-1810 | 1 | H | $CH_2CH_2CH_2$ | Me | $CH_2CF_3$ | C(=O)Ph | Me |
| B-1811 | 1 | Me | $CH_2CH_2CH_2$ | H | $CH_2CF_3$ | C(=O)Ph | Me |
| B-1812 | 1 | Me | $CH_2CH_2CH_2$ | Me | $CH_2CF_3$ | C(=O)Ph | Me |
| B-1813 | 1 | H | $CH_2CH_2CH(Me)$ | H | $CH_2CF_3$ | C(=O)Ph | Me |
| B-1814 | 1 | H | $CH_2CH_2CH(Me)$ | Me | $CH_2CF_3$ | C(=O)Ph | Me |
| B-1815 | 1 | Me | $CH_2CH_2CH(Me)$ | H | $CH_2CF_3$ | C(=O)Ph | Me |
| B-1816 | 1 | Me | $CH_2CH_2CH(Me)$ | Me | $CH_2CF_3$ | C(=O)Ph | Me |
| B-1817 | 1 | H | $CH_2CH(Me)CH_2$ | H | $CH_2CF_3$ | C(=O)Ph | Me |
| B-1818 | 1 | H | $CH_2CH(Me)CH_2$ | Me | $CH_2CF_3$ | C(=O)Ph | Me |
| B-1819 | 1 | Me | $CH_2CH(Me)CH_2$ | H | $CH_2CF_3$ | C(=O)Ph | Me |
| B-1820 | 1 | Me | $CH_2CH(Me)CH_2$ | Me | $CH_2CF_3$ | C(=O)Ph | Me |
| B-1821 | 1 | H | $CH(Me)CH_2CH_2$ | H | $CH_2CF_3$ | C(=O)Ph | Me |
| B-1822 | 1 | H | $CH(Me)CH_2CH_2$ | Me | $CH_2CF_3$ | C(=O)Ph | Me |
| B-1823 | 1 | Me | $CH(Me)CH_2CH_2$ | H | $CH_2CF_3$ | C(=O)Ph | Me |
| B-1824 | 1 | Me | $CH(Me)CH_2CH_2$ | Me | $CH_2CF_3$ | C(=O)Ph | Me |
| B-1825 | 1 | H | single bond | Me | $CH_2CF_3$ | C(=O)OEt | Cl |
| B-1826 | 1 | H | single bond | Et | $CH_2CF_3$ | C(=O)OEt | Cl |
| B-1827 | 1 | Me | single bond | H | $CH_2CF_3$ | C(=O)OEt | Cl |
| B-1828 | 1 | Et | single bond | H | $CH_2CF_3$ | C(=O)OEt | Cl |
| B-1829 | 1 | Me | single bond | Me | $CH_2CF_3$ | C(=O)OEt | Cl |
| B-1830 | 1 | H | $CH_2$ | Me | $CH_2CF_3$ | C(=O)OEt | Cl |
| B-1831 | 1 | Me | $CH_2$ | H | $CH_2CF_3$ | C(=O)OEt | Cl |
| B-1832 | 1 | Me | $CH_2$ | Me | $CH_2CF_3$ | C(=O)OEt | Cl |
| B-1833 | 1 | H | CH(Me) | H | $CH_2CF_3$ | C(=O)OEt | Cl |
| B-1834 | 1 | H | CH(Me) | Me | $CH_2CF_3$ | C(=O)OEt | Cl |
| B-1835 | 1 | Me | CH(Me) | H | $CH_2CF_3$ | C(=O)OEt | Cl |
| B-1836 | 1 | Me | CH(Me) | Me | $CH_2CF_3$ | C(=O)OEt | Cl |
| B-1837 | 1 | H | $CH_2CH_2$ | Me | $CH_2CF_3$ | C(=O)OEt | Cl |
| B-1838 | 1 | Me | $CH_2CH_2$ | H | $CH_2CF_3$ | C(=O)OEt | Cl |
| B-1839 | 1 | Me | $CH_2CH_2$ | Me | $CH_2CF_3$ | C(=O)OEt | Cl |
| B-1840 | 1 | H | $CH_2CH(Me)$ | H | $CH_2CF_3$ | C(=O)OEt | Cl |
| B-1841 | 1 | H | $CH_2CH(Me)$ | Me | $CH_2CF_3$ | C(=O)OEt | Cl |
| B-1842 | 1 | Me | $CH_2CH(Me)$ | H | $CH_2CF_3$ | C(=O)OEt | Cl |

TABLE 206

| Compound Number | n | Y | W | Z | R1 | R2 | R3 |
|---|---|---|---|---|---|---|---|
| B-1843 | 1 | Me | $CH_2CH(Me)$ | Me | $CH_2CF_3$ | C(=O)OEt | Cl |
| B-1844 | 1 | H | $CH(Me)CH_2$ | H | $CH_2CF_3$ | C(=O)OEt | Cl |
| B-1845 | 1 | H | $CH(Me)CH_2$ | Me | $CH_2CF_3$ | C(=O)OEt | Cl |
| B-1846 | 1 | Me | $CH(Me)CH_2$ | H | $CH_2CF_3$ | C(=O)OEt | Cl |
| B-1847 | 1 | Me | $CH(Me)CH_2$ | Me | $CH_2CF_3$ | C(=O)OEt | Cl |
| B-1848 | 1 | H | $CH_2CH_2CH_2$ | Me | $CH_2CF_3$ | C(=O)OEt | Cl |
| B-1849 | 1 | Me | $CH_2CH_2CH_2$ | H | $CH_2CF_3$ | C(=O)OEt | Cl |
| B-1850 | 1 | Me | $CH_2CH_2CH_2$ | Me | $CH_2CF_3$ | C(=O)OEt | Cl |
| B-1851 | 1 | H | $CH_2CH_2CH(Me)$ | H | $CH_2CF_3$ | C(=O)OEt | Cl |
| B-1852 | 1 | H | $CH_2CH_2CH(Me)$ | Me | $CH_2CF_3$ | C(=O)OEt | Cl |
| B-1853 | 1 | Me | $CH_2CH_2CH(Me)$ | H | $CH_2CF_3$ | C(=O)OEt | Cl |
| B-1854 | 1 | Me | $CH_2CH_2CH(Me)$ | Me | $CH_2CF_3$ | C(=O)OEt | Cl |
| B-1855 | 1 | H | $CH_2CH(Me)CH_2$ | H | $CH_2CF_3$ | C(=O)OEt | Cl |
| B-1856 | 1 | H | $CH_2CH(Me)CH_2$ | Me | $CH_2CF_3$ | C(=O)OEt | Cl |
| B-1857 | 1 | Me | $CH_2CH(Me)CH_2$ | H | $CH_2CF_3$ | C(=O)OEt | Cl |
| B-1858 | 1 | Me | $CH_2CH(Me)CH_2$ | Me | $CH_2CF_3$ | C(=O)OEt | Cl |
| B-1859 | 1 | H | $CH(Me)CH_2CH_2$ | H | $CH_2CF_3$ | C(=O)OEt | Cl |
| B-1860 | 1 | H | $CH(Me)CH_2CH_2$ | Me | $CH_2CF_3$ | C(=O)OEt | Cl |
| B-1861 | 1 | Me | $CH(Me)CH_2CH_2$ | H | $CH_2CF_3$ | C(=O)OEt | Cl |
| B-1862 | 1 | Me | $CH(Me)CH_2CH_2$ | Me | $CH_2CF_3$ | C(=O)OEt | Cl |
| B-1863 | 1 | H | single bond | Me | $CH_2CF_3$ | C(=O)OEt | Me |
| B-1864 | 1 | H | single bond | Et | $CH_2CF_3$ | C(=O)OEt | Me |
| B-1865 | 1 | Me | single bond | H | $CH_2CF_3$ | C(=O)OEt | Me |
| B-1866 | 1 | Et | single bond | H | $CH_2CF_3$ | C(=O)OEt | Me |
| B-1867 | 1 | Me | single bond | Me | $CH_2CF_3$ | C(=O)OEt | Me |
| B-1868 | 1 | H | $CH_2$ | Me | $CH_2CF_3$ | C(=O)OEt | Me |
| B-1869 | 1 | Me | $CH_2$ | H | $CH_2CF_3$ | C(=O)OEt | Me |
| B-1870 | 1 | Me | $CH_2$ | Me | $CH_2CF_3$ | C(=O)OEt | Me |
| B-1871 | 1 | H | CH(Me) | H | $CH_2CF_3$ | C(=O)OEt | Me |
| B-1872 | 1 | H | CH(Me) | Me | $CH_2CF_3$ | C(=O)OEt | Me |
| B-1873 | 1 | Me | CH(Me) | H | $CH_2CF_3$ | C(=O)OEt | Me |
| B-1874 | 1 | Me | CH(Me) | Me | $CH_2CF_3$ | C(=O)OEt | Me |
| B-1875 | 1 | H | $CH_2CH_2$ | Me | $CH_2CF_3$ | C(=O)OEt | Me |
| B-1876 | 1 | Me | $CH_2CH_2$ | H | $CH_2CF_3$ | C(=O)OEt | Me |
| B-1877 | 1 | Me | $CH_2CH_2$ | Me | $CH_2CF_3$ | C(=O)OEt | Me |
| B-1878 | 1 | H | $CH_2CH(Me)$ | H | $CH_2CF_3$ | C(=O)OEt | Me |
| B-1879 | 1 | H | $CH_2CH(Me)$ | Me | $CH_2CF_3$ | C(=O)OEt | Me |
| B-1880 | 1 | Me | $CH_2CH(Me)$ | H | $CH_2CF_3$ | C(=O)OEt | Me |
| B-1881 | 1 | Me | $CH_2CH(Me)$ | Me | $CH_2CF_3$ | C(=O)OEt | Me |
| B-1882 | 1 | H | $CH(Me)CH_2$ | H | $CH_2CF_3$ | C(=O)OEt | Me |
| B-1883 | 1 | H | $CH(Me)CH_2$ | Me | $CH_2CF_3$ | C(=O)OEt | Me |
| B-1884 | 1 | Me | $CH(Me)CH_2$ | H | $CH_2CF_3$ | C(=O)OEt | Me |
| B-1885 | 1 | Me | $CH(Me)CH_2$ | Me | $CH_2CF_3$ | C(=O)OEt | Me |
| B-1886 | 1 | H | $CH_2CH_2CH_2$ | Me | $CH_2CF_3$ | C(=O)OEt | Me |

TABLE 207

| Compound Number | n | Y | W | Z | R1 | R2 | R3 |
|---|---|---|---|---|---|---|---|
| B-1887 | 1 | Me | $CH_2CH_2CH_2$ | H | $CH_2CF_3$ | C(=O)OEt | Me |
| B-1888 | 1 | Me | $CH_2CH_2CH_2$ | Me | $CH_2CF_3$ | C(=O)OEt | Me |
| B-1889 | 1 | H | $CH_2CH_2CH(Me)$ | H | $CH_2CF_3$ | C(=O)OEt | Me |
| B-1890 | 1 | H | $CH_2CH_2CH(Me)$ | Me | $CH_2CF_3$ | C(=O)OEt | Me |
| B-1891 | 1 | Me | $CH_2CH_2CH(Me)$ | H | $CH_2CF_3$ | C(=O)OEt | Me |
| B-1892 | 1 | Me | $CH_2CH_2CH(Me)$ | Me | $CH_2CF_3$ | C(=O)OEt | Me |
| B-1893 | 1 | H | $CH_2CH(Me)CH_2$ | H | $CH_2CF_3$ | C(=O)OEt | Me |
| B-1894 | 1 | H | $CH_2CH(Me)CH_2$ | Me | $CH_2CF_3$ | C(=O)OEt | Me |
| B-1895 | 1 | Me | $CH_2CH(Me)CH_2$ | H | $CH_2CF_3$ | C(=O)OEt | Me |
| B-1896 | 1 | Me | $CH_2CH(Me)CH_2$ | Me | $CH_2CF_3$ | C(=O)OEt | Me |
| B-1897 | 1 | H | $CH(Me)CH_2CH_2$ | H | $CH_2CF_3$ | C(=O)OEt | Me |
| B-1898 | 1 | H | $CH(Me)CH_2CH_2$ | Me | $CH_2CF_3$ | C(=O)OEt | Me |
| B-1899 | 1 | Me | $CH(Me)CH_2CH_2$ | H | $CH_2CF_3$ | C(=O)OEt | Me |
| B-1900 | 1 | Me | $CH(Me)CH_2CH_2$ | Me | $CH_2CF_3$ | C(=O)OEt | Me |
| B-1901 | 1 | H | single bond | Me | $CH_2CF_3$ | $S(=O)_2Me$ | Cl |
| B-1902 | 1 | H | single bond | Et | $CH_2CF_3$ | $S(=O)_2Me$ | Cl |
| B-1903 | 1 | Me | single bond | H | $CH_2CF_3$ | $S(=O)_2Me$ | Cl |
| B-1904 | 1 | Et | single bond | H | $CH_2CF_3$ | $S(=O)_2Me$ | Cl |
| B-1905 | 1 | Me | single bond | Me | $CH_2CF_3$ | $S(=O)_2Me$ | Cl |
| B-1906 | 1 | H | $CH_2$ | Me | $CH_2CF_3$ | $S(=O)_2Me$ | Cl |
| B-1907 | 1 | Me | $CH_2$ | H | $CH_2CF_3$ | $S(=O)_2Me$ | Cl |
| B-1908 | 1 | Me | $CH_2$ | Me | $CH_2CF_3$ | $S(=O)_2Me$ | Cl |
| B-1909 | 1 | H | CH(Me) | H | $CH_2CF_3$ | $S(=O)_2Me$ | Cl |
| B-1910 | 1 | H | CH(Me) | Me | $CH_2CF_3$ | $S(=O)_2Me$ | Cl |

TABLE 207-continued

| Compound Number | n | Y | W | Z | R1 | R2 | R3 |
|---|---|---|---|---|---|---|---|
| B-1911 | 1 | Me | CH(Me) | H | $CH_2CF_3$ | $S(=O)_2Me$ | Cl |
| B-1912 | 1 | Me | CH(Me) | Me | $CH_2CF_3$ | $S(=O)_2Me$ | Cl |
| B-1913 | 1 | H | $CH_2CH_2$ | Me | $CH_2CF_3$ | $S(=O)_2Me$ | Cl |
| B-1914 | 1 | Me | $CH_2CH_2$ | H | $CH_2CF_3$ | $S(=O)_2Me$ | Cl |
| B-1915 | 1 | Me | $CH_2CH_2$ | Me | $CH_2CF_3$ | $S(=O)_2Me$ | Cl |
| B-1916 | 1 | H | $CH_2CH(Me)$ | H | $CH_2CF_3$ | $S(=O)_2Me$ | Cl |
| B-1917 | 1 | H | $CH_2CH(Me)$ | Me | $CH_2CF_3$ | $S(=O)_2Me$ | Cl |
| B-1918 | 1 | Me | $CH_2CH(Me)$ | H | $CH_2CF_3$ | $S(=O)_2Me$ | Cl |
| B-1919 | 1 | Me | $CH_2CH(Me)$ | Me | $CH_2CF_3$ | $S(=O)_2Me$ | Cl |
| B-1920 | 1 | H | $CH(Me)CH_2$ | H | $CH_2CF_3$ | $S(=O)_2Me$ | Cl |
| B-1921 | 1 | H | $CH(Me)CH_2$ | Me | $CH_2CF_3$ | $S(=O)_2Me$ | Cl |
| B-1922 | 1 | Me | $CH(Me)CH_2$ | H | $CH_2CF_3$ | $S(=O)_2Me$ | Cl |
| B-1923 | 1 | Me | $CH(Me)CH_2$ | Me | $CH_2CF_3$ | $S(=O)_2Me$ | Cl |
| B-1924 | 1 | H | $CH_2CH_2CH_2$ | Me | $CH_2CF_3$ | $S(=O)_2Me$ | Cl |
| B-1925 | 1 | Me | $CH_2CH_2CH_2$ | H | $CH_2CF_3$ | $S(=O)_2Me$ | Cl |
| B-1926 | 1 | Me | $CH_2CH_2CH_2$ | Me | $CH_2CF_3$ | $S(=O)_2Me$ | Cl |
| B-1927 | 1 | H | $CH_2CH_2CH(Me)$ | H | $CH_2CF_3$ | $S(=O)_2Me$ | Cl |
| B-1928 | 1 | H | $CH_2CH_2CH(Me)$ | Me | $CH_2CF_3$ | $S(=O)_2Me$ | Cl |
| B-1929 | 1 | Me | $CH_2CH_2CH(Me)$ | H | $CH_2CF_3$ | $S(=O)_2Me$ | Cl |
| B-1930 | 1 | Me | $CH_2CH_2CH(Me)$ | Me | $CH_2CF_3$ | $S(=O)_2Me$ | Cl |

TABLE 208

| Compound Number | n | Y | W | Z | R1 | R2 | R3 |
|---|---|---|---|---|---|---|---|
| B-1931 | 1 | H | $CH_2CH(Me)CH_2$ | H | $CH_2CF_3$ | $S(=O)_2Me$ | Cl |
| B-1932 | 1 | H | $CH_2CH(Me)CH_2$ | Me | $CH_2CF_3$ | $S(=O)_2Me$ | Cl |
| B-1933 | 1 | Me | $CH_2CH(Me)CH_2$ | H | $CH_2CF_3$ | $S(=O)_2Me$ | Cl |
| B-1934 | 1 | Me | $CH_2CH(Me)CH_2$ | Me | $CH_2CF_3$ | $S(=O)_2Me$ | Cl |
| B-1935 | 1 | H | $CH(Me)CH_2CH_2$ | H | $CH_2CF_3$ | $S(=O)_2Me$ | Cl |
| B-1936 | 1 | H | $CH(Me)CH_2CH_2$ | Me | $CH_2CF_3$ | $S(=O)_2Me$ | Cl |
| B-1937 | 1 | Me | $CH(Me)CH_2CH_2$ | H | $CH_2CF_3$ | $S(=O)_2Me$ | Cl |
| B-1938 | 1 | Me | $CH(Me)CH_2CH_2$ | Me | $CH_2CF_3$ | $S(=O)_2Me$ | Cl |
| B-1939 | 1 | H | single bond | Me | $CH_2CF_3$ | $S(=O)_2Me$ | Me |
| B-1940 | 1 | H | single bond | Et | $CH_2CF_3$ | $S(=O)_2Me$ | Me |
| B-1941 | 1 | Me | single bond | H | $CH_2CF_3$ | $S(=O)_2Me$ | Me |
| B-1942 | 1 | Et | single bond | H | $CH_2CF_3$ | $S(=O)_2Me$ | Me |
| B-1943 | 1 | Me | single bond | Me | $CH_2CF_3$ | $S(=O)_2Me$ | Me |
| B-1944 | 1 | H | $CH_2$ | Me | $CH_2CF_3$ | $S(=O)_2Me$ | Me |
| B-1945 | 1 | Me | $CH_2$ | H | $CH_2CF_3$ | $S(=O)_2Me$ | Me |
| B-1946 | 1 | Me | $CH_2$ | Me | $CH_2CF_3$ | $S(=O)_2Me$ | Me |
| B-1947 | 1 | H | CH(Me) | H | $CH_2CF_3$ | $S(=O)_2Me$ | Me |
| B-1948 | 1 | H | CH(Me) | Me | $CH_2CF_3$ | $S(=O)_2Me$ | Me |
| B-1949 | 1 | Me | CH(Me) | H | $CH_2CF_3$ | $S(=O)_2Me$ | Me |
| B-1950 | 1 | Me | CH(Me) | Me | $CH_2CF_3$ | $S(=O)_2Me$ | Me |
| B-1951 | 1 | H | $CH_2CH_2$ | Me | $CH_2CF_3$ | $S(=O)_2Me$ | Me |
| B-1952 | 1 | Me | $CH_2CH_2$ | H | $CH_2CF_3$ | $S(=O)_2Me$ | Me |
| B-1953 | 1 | Me | $CH_2CH_2$ | Me | $CH_2CF_3$ | $S(=O)_2Me$ | Me |
| B-1954 | 1 | H | $CH_2CH(Me)$ | H | $CH_2CF_3$ | $S(=O)_2Me$ | Me |
| B-1955 | 1 | H | $CH_2CH(Me)$ | Me | $CH_2CF_3$ | $S(=O)_2Me$ | Me |
| B-1956 | 1 | Me | $CH_2CH(Me)$ | H | $CH_2CF_3$ | $S(=O)_2Me$ | Me |
| B-1957 | 1 | Me | $CH_2CH(Me)$ | Me | $CH_2CF_3$ | $S(=O)_2Me$ | Me |
| B-1958 | 1 | H | $CH(Me)CH_2$ | H | $CH_2CF_3$ | $S(=O)_2Me$ | Me |
| B-1959 | 1 | H | $CH(Me)CH_2$ | Me | $CH_2CF_3$ | $S(=O)_2Me$ | Me |
| B-1960 | 1 | Me | $CH(Me)CH_2$ | H | $CH_2CF_3$ | $S(=O)_2Me$ | Me |
| B-1961 | 1 | Me | $CH(Me)CH_2$ | Me | $CH_2CF_3$ | $S(=O)_2Me$ | Me |
| B-1962 | 1 | H | $CH_2CH_2CH_2$ | Me | $CH_2CF_3$ | $S(=O)_2Me$ | Me |
| B-1963 | 1 | Me | $CH_2CH_2CH_2$ | H | $CH_2CF_3$ | $S(=O)_2Me$ | Me |
| B-1964 | 1 | Me | $CH_2CH_2CH_2$ | Me | $CH_2CF_3$ | $S(=O)_2Me$ | Me |
| B-1965 | 1 | H | $CH_2CH_2CH(Me)$ | H | $CH_2CF_3$ | $S(=O)_2Me$ | Me |
| B-1966 | 1 | H | $CH_2CH_2CH(Me)$ | Me | $CH_2CF_3$ | $S(=O)_2Me$ | Me |
| B-1967 | 1 | Me | $CH_2CH_2CH(Me)$ | H | $CH_2CF_3$ | $S(=O)_2Me$ | Me |
| B-1968 | 1 | Me | $CH_2CH_2CH(Me)$ | Me | $CH_2CF_3$ | $S(=O)_2Me$ | Me |
| B-1969 | 1 | H | $CH_2CH(Me)CH_2$ | H | $CH_2CF_3$ | $S(=O)_2Me$ | Me |
| B-1970 | 1 | H | $CH_2CH(Me)CH_2$ | Me | $CH_2CF_3$ | $S(=O)_2Me$ | Me |
| B-1971 | 1 | Me | $CH_2CH(Me)CH_2$ | H | $CH_2CF_3$ | $S(=O)_2Me$ | Me |
| B-1972 | 1 | Me | $CH_2CH(Me)CH_2$ | Me | $CH_2CF_3$ | $S(=O)_2Me$ | Me |
| B-1973 | 1 | H | $CH(Me)CH_2CH_2$ | H | $CH_2CF_3$ | $S(=O)_2Me$ | Me |
| B-1974 | 1 | H | $CH(Me)CH_2CH_2$ | Me | $CH_2CF_3$ | $S(=O)_2Me$ | Me |

| Compound Number | n | Y | W | Z | R1 | R2 | R3 |
|---|---|---|---|---|---|---|---|
| B-1975 | 1 | Me | $CH(Me)CH_2CH_2$ | H | $CH_2CF_3$ | $S(=O)_2Me$ | Me |
| B-1976 | 1 | Me | $CH(Me)CH_2CH_2$ | Me | $CH_2CF_3$ | $S(=O)_2Me$ | Me |
| B-1977 | 1 | H | single bond | Me | $CH_2CF_3$ | $S(=O)_2CF_3$ | Cl |
| B-1978 | 1 | H | single bond | Et | $CH_2CF_3$ | $S(=O)_2CF_3$ | Cl |
| B-1979 | 1 | Me | single bond | H | $CH_2CF_3$ | $S(=O)_2CF_3$ | Cl |
| B-1980 | 1 | Et | single bond | H | $CH_2CF_3$ | $S(=O)_2CF_3$ | Cl |
| B-1981 | 1 | Me | single bond | Me | $CH_2CF_3$ | $S(=O)_2CF_3$ | Cl |
| B-1982 | 1 | H | $CH_2$ | Me | $CH_2CF_3$ | $S(=O)_2CF_3$ | Cl |
| B-1983 | 1 | Me | $CH_2$ | H | $CH_2CF_3$ | $S(=O)_2CF_3$ | Cl |
| B-1984 | 1 | Me | $CH_2$ | Me | $CH_2CF_3$ | $S(=O)_2CF_3$ | Cl |
| B-1985 | 1 | H | CH(Me) | H | $CH_2CF_3$ | $S(=O)_2CF_3$ | Cl |
| B-1986 | 1 | H | CH(Me) | Me | $CH_2CF_3$ | $S(=O)_2CF_3$ | Cl |
| B-1987 | 1 | Me | CH(Me) | H | $CH_2CF_3$ | $S(=O)_2CF_3$ | Cl |
| B-1988 | 1 | Me | CH(Me) | Me | $CH_2CF_3$ | $S(=O)_2CF_3$ | Cl |
| B-1989 | 1 | H | $CH_2CH_2$ | Me | $CH_2CF_3$ | $S(=O)_2CF_3$ | Cl |
| B-1990 | 1 | Me | $CH_2CH_2$ | H | $CH_2CF_3$ | $S(=O)_2CF_3$ | Cl |
| B-1991 | 1 | Me | $CH_2CH_2$ | Me | $CH_2CF_3$ | $S(=O)_2CF_3$ | Cl |
| B-1992 | 1 | H | $CH_2CH(Me)$ | H | $CH_2CF_3$ | $S(=O)_2CF_3$ | Cl |
| B-1993 | 1 | H | $CH_2CH(Me)$ | Me | $CH_2CF_3$ | $S(=O)_2CF_3$ | Cl |
| B-1994 | 1 | Me | $CH_2CH(Me)$ | H | $CH_2CF_3$ | $S(=O)_2CF_3$ | Cl |
| B-1995 | 1 | Me | $CH_2CH(Me)$ | Me | $CH_2CF_3$ | $S(=O)_2CF_3$ | Cl |
| B-1996 | 1 | H | $CH(Me)CH_2$ | H | $CH_2CF_3$ | $S(=O)_2CF_3$ | Cl |
| B-1997 | 1 | H | $CH(Me)CH_2$ | Me | $CH_2CF_3$ | $S(=O)_2CF_3$ | Cl |
| B-1998 | 1 | Me | $CH(Me)CH_2$ | H | $CH_2CF_3$ | $S(=O)_2CF_3$ | Cl |
| B-1999 | 1 | Me | $CH(Me)CH_2$ | Me | $CH_2CF_3$ | $S(=O)_2CF_3$ | Cl |
| B-2000 | 1 | H | $CH_2CH_2CH_2$ | Me | $CH_2CF_3$ | $S(=O)_2CF_3$ | Cl |
| B-2001 | 1 | Me | $CH_2CH_2CH_2$ | H | $CH_2CF_3$ | $S(=O)_2CF_3$ | Cl |
| B-2002 | 1 | Me | $CH_2CH_2CH_2$ | Me | $CH_2CF_3$ | $S(=O)_2CF_3$ | Cl |
| B-2003 | 1 | H | $CH_2CH_2CH(Me)$ | H | $CH_2CF_3$ | $S(=O)_2CF_3$ | Cl |
| B-2004 | 1 | H | $CH_2CH_2CH(Me)$ | Me | $CH_2CF_3$ | $S(=O)_2CF_3$ | Cl |
| B-2005 | 1 | Me | $CH_2CH_2CH(Me)$ | H | $CH_2CF_3$ | $S(=O)_2CF_3$ | Cl |
| B-2006 | 1 | Me | $CH_2CH_2CH(Me)$ | Me | $CH_2CF_3$ | $S(=O)_2CF_3$ | Cl |
| B-2007 | 1 | H | $CH_2CH(Me)CH_2$ | H | $CH_2CF_3$ | $S(=O)_2CF_3$ | Cl |
| B-2008 | 1 | H | $CH_2CH(Me)CH_2$ | Me | $CH_2CF_3$ | $S(=O)_2CF_3$ | Cl |
| B-2009 | 1 | Me | $CH_2CH(Me)CH_2$ | H | $CH_2CF_3$ | $S(=O)_2CF_3$ | Cl |
| B-2010 | 1 | Me | $CH_2CH(Me)CH_2$ | Me | $CH_2CF_3$ | $S(=O)_2CF_3$ | Cl |
| B-2011 | 1 | H | $CH(Me)CH_2CH_2$ | H | $CH_2CF_3$ | $S(=O)_2CF_3$ | Cl |
| B-2012 | 1 | H | $CH(Me)CH_2CH_2$ | Me | $CH_2CF_3$ | $S(=O)_2CF_3$ | Cl |
| B-2013 | 1 | Me | $CH(Me)CH_2CH_2$ | H | $CH_2CF_3$ | $S(=O)_2CF_3$ | Cl |
| B-2014 | 1 | Me | $CH(Me)CH_2CH_2$ | Me | $CH_2CF_3$ | $S(=O)_2CF_3$ | Cl |
| B-2015 | 1 | H | single bond | Me | $CH_2CF_3$ | $S(=O)_2CF_3$ | Me |
| B-2016 | 1 | H | single bond | Et | $CH_2CF_3$ | $S(=O)_2CF_3$ | Me |
| B-2017 | 1 | Me | single bond | H | $CH_2CF_3$ | $S(=O)_2CF_3$ | Me |
| B-2018 | 1 | Et | single bond | H | $CH_2CF_3$ | $S(=O)_2CF_3$ | Me |

TABLE 210

| Compound Number | n | Y | W | Z | R1 | R2 | R3 |
|---|---|---|---|---|---|---|---|
| B-2019 | 1 | Me | single bond | Me | $CH_2CF_3$ | $S(=O)_2CF_3$ | Me |
| B-2020 | 1 | H | $CH_2$ | Me | $CH_2CF_3$ | $S(=O)_2CF_3$ | Me |
| B-2021 | 1 | Me | $CH_2$ | H | $CH_2CF_3$ | $S(=O)_2CF_3$ | Me |
| B-2022 | 1 | Me | $CH_2$ | Me | $CH_2CF_3$ | $S(=O)_2CF_3$ | Me |
| B-2023 | 1 | H | CH(Me) | H | $CH_2CF_3$ | $S(=O)_2CF_3$ | Me |
| B-2024 | 1 | H | CH(Me) | Me | $CH_2CF_3$ | $S(=O)_2CF_3$ | Me |
| B-2025 | 1 | Me | CH(Me) | H | $CH_2CF_3$ | $S(=O)_2CF_3$ | Me |
| B-2026 | 1 | Me | CH(Me) | Me | $CH_2CF_3$ | $S(=O)_2CF_3$ | Me |
| B-2027 | 1 | H | $CH_2CH_2$ | Me | $CH_2CF_3$ | $S(=O)_2CF_3$ | Me |
| B-2028 | 1 | Me | $CH_2CH_2$ | H | $CH_2CF_3$ | $S(=O)_2CF_3$ | Me |
| B-2029 | 1 | Me | $CH_2CH_2$ | Me | $CH_2CF_3$ | $S(=O)_2CF_3$ | Me |
| B-2030 | 1 | H | $CH_2CH(Me)$ | H | $CH_2CF_3$ | $S(=O)_2CF_3$ | Me |
| B-2031 | 1 | H | $CH_2CH(Me)$ | Me | $CH_2CF_3$ | $S(=O)_2CF_3$ | Me |
| B-2032 | 1 | Me | $CH_2CH(Me)$ | H | $CH_2CF_3$ | $S(=O)_2CF_3$ | Me |
| B-2033 | 1 | Me | $CH_2CH(Me)$ | Me | $CH_2CF_3$ | $S(=O)_2CF_3$ | Me |
| B-2034 | 1 | H | $CH(Me)CH_2$ | H | $CH_2CF_3$ | $S(=O)_2CF_3$ | Me |
| B-2035 | 1 | H | $CH(Me)CH_2$ | Me | $CH_2CF_3$ | $S(=O)_2CF_3$ | Me |
| B-2036 | 1 | Me | $CH(Me)CH_2$ | H | $CH_2CF_3$ | $S(=O)_2CF_3$ | Me |
| B-2037 | 1 | Me | $CH(Me)CH_2$ | Me | $CH_2CF_3$ | $S(=O)_2CF_3$ | Me |
| B-2038 | 1 | H | $CH_2CH_2CH_2$ | Me | $CH_2CF_3$ | $S(=O)_2CF_3$ | Me |
| B-2039 | 1 | Me | $CH_2CH_2CH_2$ | H | $CH_2CF_3$ | $S(=O)_2CF_3$ | Me |
| B-2040 | 1 | Me | $CH_2CH_2CH_2$ | Me | $CH_2CF_3$ | $S(=O)_2CF_3$ | Me |
| B-2041 | 1 | H | $CH_2CH_2CH(Me)$ | H | $CH_2CF_3$ | $S(=O)_2CF_3$ | Me |

TABLE 210-continued

| Compound Number | n | Y | W | Z | $R^1$ | $R^2$ | $R^3$ |
|---|---|---|---|---|---|---|---|
| B-2042 | 1 | H | $CH_2CH_2CH(Me)$ | Me | $CH_2CF_3$ | $S(=O)_2CF_3$ | Me |
| B-2043 | 1 | Me | $CH_2CH_2CH(Me)$ | H | $CH_2CF_3$ | $S(=O)_2CF_3$ | Me |
| B-2044 | 1 | Me | $CH_2CH_2CH(Me)$ | Me | $CH_2CF_3$ | $S(=O)_2CF_3$ | Me |
| B-2045 | 1 | H | $CH_2CH(Me)CH_2$ | H | $CH_2CF_3$ | $S(=O)_2CF_3$ | Me |
| B-2046 | 1 | H | $CH_2CH(Me)CH_2$ | Me | $CH_2CF_3$ | $S(=O)_2CF_3$ | Me |
| B-2047 | 1 | Me | $CH_2CH(Me)CH_2$ | H | $CH_2CF_3$ | $S(=O)_2CF_3$ | Me |
| B-2048 | 1 | Me | $CH_2CH(Me)CH_2$ | Me | $CH_2CF_3$ | $S(=O)_2CF_3$ | Me |
| B-2049 | 1 | H | $CH(Me)CH_2CH_2$ | H | $CH_2CF_3$ | $S(=O)_2CF_3$ | Me |
| B-2050 | 1 | H | $CH(Me)CH_2CH_2$ | Me | $CH_2CF_3$ | $S(=O)_2CF_3$ | Me |
| B-2051 | 1 | Me | $CH(Me)CH_2CH_2$ | H | $CH_2CF_3$ | $S(=O)_2CF_3$ | Me |
| B-2052 | 1 | Me | $CH(Me)CH_2CH_2$ | Me | $CH_2CF_3$ | $S(=O)_2CF_3$ | Me |
| B-2053 | 2 | H | single bond | Me | $CH_2CF_3$ | Me | Cl |
| B-2054 | 2 | H | single bond | Et | $CH_2CF_3$ | Me | Cl |
| B-2055 | 2 | Me | single bond | H | $CH_2CF_3$ | Me | Cl |
| B-2056 | 2 | Et | single bond | H | $CH_2CF_3$ | Me | Cl |
| B-2057 | 2 | Me | single bond | Me | $CH_2CF_3$ | Me | Cl |
| B-2058 | 2 | H | $CH_2$ | Me | $CH_2CF_3$ | Me | Cl |
| B-2059 | 2 | Me | $CH_2$ | H | $CH_2CF_3$ | Me | Cl |
| B-2060 | 2 | Me | $CH_2$ | Me | $CH_2CF_3$ | Me | Cl |
| B-2061 | 2 | H | CH(Me) | H | $CH_2CF_3$ | Me | Cl |
| B-2062 | 2 | H | CH(Me) | Me | $CH_2CF_3$ | Me | Cl |

TABLE 211

| Compound Number | n | Y | W | Z | $R^1$ | $R^2$ | $R^3$ |
|---|---|---|---|---|---|---|---|
| B-2063 | 2 | Me | CH(Me) | H | $CH_2CF_3$ | Me | Cl |
| B-2064 | 2 | Me | CH(Me) | Me | $CH_2CF_3$ | Me | Cl |
| B-2065 | 2 | H | $CH_2CH_2$ | Me | $CH_2CF_3$ | Me | Cl |
| B-2066 | 2 | Me | $CH_2CH_2$ | H | $CH_2CF_3$ | Me | Cl |
| B-2067 | 2 | Me | $CH_2CH_2$ | Me | $CH_2CF_3$ | Me | Cl |
| B-2068 | 2 | H | $CH_2CH(Me)$ | H | $CH_2CF_3$ | Me | Cl |
| B-2069 | 2 | H | $CH_2CH(Me)$ | Me | $CH_2CF_3$ | Me | Cl |
| B-2070 | 2 | Me | $CH_2CH(Me)$ | H | $CH_2CF_3$ | Me | Cl |
| B-2071 | 2 | Me | $CH_2CH(Me)$ | Me | $CH_2CF_3$ | Me | Cl |
| B-2072 | 2 | H | $CH(Me)CH_2$ | H | $CH_2CF_3$ | Me | Cl |
| B-2073 | 2 | H | $CH(Me)CH_2$ | Me | $CH_2CF_3$ | Me | Cl |
| B-2074 | 2 | Me | $CH(Me)CH_2$ | H | $CH_2CF_3$ | Me | Cl |
| B-2075 | 2 | Me | $CH(Me)CH_2$ | Me | $CH_2CF_3$ | Me | Cl |
| B-2076 | 2 | H | $CH_2CH_2CH_2$ | Me | $CH_2CF_3$ | Me | Cl |
| B-2077 | 2 | Me | $CH_2CH_2CH_2$ | H | $CH_2CF_3$ | Me | Cl |
| B-2078 | 2 | Me | $CH_2CH_2CH_2$ | Me | $CH_2CF_3$ | Me | Cl |
| B-2079 | 2 | H | $CH_2CH_2CH(Me)$ | H | $CH_2CF_3$ | Me | Cl |
| B-2080 | 2 | H | $CH_2CH_2CH(Me)$ | Me | $CH_2CF_3$ | Me | Cl |
| B-2081 | 2 | Me | $CH_2CH_2CH(Me)$ | H | $CH_2CF_3$ | Me | Cl |
| B-2082 | 2 | Me | $CH_2CH_2CH(Me)$ | Me | $CH_2CF_3$ | Me | Cl |
| B-2083 | 2 | H | $CH_2CH(Me)CH_2$ | H | $CH_2CF_3$ | Me | Cl |
| B-2084 | 2 | H | $CH_2CH(Me)CH_2$ | Me | $CH_2CF_3$ | Me | Cl |
| B-2085 | 2 | Me | $CH_2CH(Me)CH_2$ | H | $CH_2CF_3$ | Me | Cl |
| B-2086 | 2 | Me | $CH_2CH(Me)CH_2$ | Me | $CH_2CF_3$ | Me | Cl |
| B-2087 | 2 | H | $CH(Me)CH_2CH_2$ | H | $CH_2CF_3$ | Me | Cl |
| B-2088 | 2 | H | $CH(Me)CH_2CH_2$ | Me | $CH_2CF_3$ | Me | Cl |
| B-2089 | 2 | Me | $CH(Me)CH_2CH_2$ | H | $CH_2CF_3$ | Me | Cl |
| B-2090 | 2 | Me | $CH(Me)CH_2CH_2$ | Me | $CH_2CF_3$ | Me | Cl |
| B-2091 | 2 | H | single bond | Me | $CH_2CF_3$ | Me | Me |
| B-2092 | 2 | H | single bond | Et | $CH_2CF_3$ | Me | Me |
| B-2093 | 2 | Me | single bond | H | $CH_2CF_3$ | Me | Me |
| B-2094 | 2 | Et | single bond | H | $CH_2CF_3$ | Me | Me |
| B-2095 | 2 | Me | single bond | Me | $CH_2CF_3$ | Me | Me |
| B-2096 | 2 | H | $CH_2$ | Me | $CH_2CF_3$ | Me | Me |
| B-2097 | 2 | Me | $CH_2$ | H | $CH_2CF_3$ | Me | Me |
| B-2098 | 2 | Me | $CH_2$ | Me | $CH_2CF_3$ | Me | Me |
| B-2099 | 2 | H | CH(Me) | H | $CH_2CF_3$ | Me | Me |
| B-2100 | 2 | H | CH(Me) | Me | $CH_2CF_3$ | Me | Me |
| B-2101 | 2 | Me | CH(Me) | H | $CH_2CF_3$ | Me | Me |
| B-2102 | 2 | Me | CH(Me) | Me | $CH_2CF_3$ | Me | Me |
| B-2103 | 2 | H | $CH_2CH_2$ | Me | $CH_2CF_3$ | Me | Me |
| B-2104 | 2 | Me | $CH_2CH_2$ | H | $CH_2CF_3$ | Me | Me |
| B-2105 | 2 | Me | $CH_2CH_2$ | Me | $CH_2CF_3$ | Me | Me |
| B-2106 | 2 | H | $CH_2CH(Me)$ | H | $CH_2CF_3$ | Me | Me |

TABLE 212

| Compound Number | n | Y | W | Z | $R^1$ | $R^2$ | $R^3$ |
|---|---|---|---|---|---|---|---|
| B-2107 | 2 | H | $CH_2CH(Me)$ | Me | $CH_2CF_3$ | Me | Me |
| B-2108 | 2 | Me | $CH_2CH(Me)$ | H | $CH_2CF_3$ | Me | Me |
| B-2109 | 2 | Me | $CH_2CH(Me)$ | Me | $CH_2CF_3$ | Me | Me |
| B-2110 | 2 | H | $CH(Me)CH_2$ | H | $CH_2CF_3$ | Me | Me |
| B-2111 | 2 | H | $CH(Me)CH_2$ | Me | $CH_2CF_3$ | Me | Me |
| B-2112 | 2 | Me | $CH(Me)CH_2$ | H | $CH_2CF_3$ | Me | Me |
| B-2113 | 2 | Me | $CH(Me)CH_2$ | Me | $CH_2CF_3$ | Me | Me |
| B-2114 | 2 | H | $CH_2CH_2CH_2$ | Me | $CH_2CF_3$ | Me | Me |
| B-2115 | 2 | Me | $CH_2CH_2CH_2$ | H | $CH_2CF_3$ | Me | Me |
| B-2116 | 2 | Me | $CH_2CH_2CH_2$ | Me | $CH_2CF_3$ | Me | Me |
| B-2117 | 2 | H | $CH_2CH_2CH(Me)$ | H | $CH_2CF_3$ | Me | Me |
| B-2118 | 2 | H | $CH_2CH_2CH(Me)$ | Me | $CH_2CF_3$ | Me | Me |
| B-2119 | 2 | Me | $CH_2CH_2CH(Me)$ | H | $CH_2CF_3$ | Me | Me |
| B-2120 | 2 | Me | $CH_2CH_2CH(Me)$ | Me | $CH_2CF_3$ | Me | Me |
| B-2121 | 2 | H | $CH_2CH(Me)CH_2$ | H | $CH_2CF_3$ | Me | Me |
| B-2122 | 2 | H | $CH_2CH(Me)CH_2$ | Me | $CH_2CF_3$ | Me | Me |
| B-2123 | 2 | Me | $CH_2CH(Me)CH_2$ | H | $CH_2CF_3$ | Me | Me |
| B-2124 | 2 | Me | $CH_2CH(Me)CH_2$ | Me | $CH_2CF_3$ | Me | Me |
| B-2125 | 2 | H | $CH(Me)CH_2CH_2$ | H | $CH_2CF_3$ | Me | Me |
| B-2126 | 2 | H | $CH(Me)CH_2CH_2$ | Me | $CH_2CF_3$ | Me | Me |
| B-2127 | 2 | Me | $CH(Me)CH_2CH_2$ | H | $CH_2CF_3$ | Me | Me |
| B-2128 | 2 | Me | $CH(Me)CH_2CH_2$ | Me | $CH_2CF_3$ | Me | Me |
| B-2129 | 2 | H | single bond | Me | $CH_2CF_3$ | Et | Cl |
| B-2130 | 2 | H | single bond | Et | $CH_2CF_3$ | Et | Cl |
| B-2131 | 2 | Me | single bond | H | $CH_2CF_3$ | Et | Cl |
| B-2132 | 2 | Et | single bond | H | $CH_2CF_3$ | Et | Cl |
| B-2133 | 2 | Me | single bond | Me | $CH_2CF_3$ | Et | Cl |
| B-2134 | 2 | H | $CH_2$ | Me | $CH_2CF_3$ | Et | Cl |
| B-2135 | 2 | Me | $CH_2$ | H | $CH_2CF_3$ | Et | Cl |
| B-2136 | 2 | Me | $CH_2$ | Me | $CH_2CF_3$ | Et | Cl |
| B-2137 | 2 | H | CH(Me) | H | $CH_2CF_3$ | Et | Cl |
| B-2138 | 2 | H | CH(Me) | Me | $CH_2CF_3$ | Et | Cl |
| B-2139 | 2 | Me | CH(Me) | H | $CH_2CF_3$ | Et | Cl |
| B-2140 | 2 | Me | CH(Me) | Me | $CH_2CF_3$ | Et | Cl |
| B-2141 | 2 | H | $CH_2CH_2$ | Me | $CH_2CF_3$ | Et | Cl |
| B-2142 | 2 | Me | $CH_2CH_2$ | H | $CH_2CF_3$ | Et | Cl |
| B-2143 | 2 | Me | $CH_2CH_2$ | Me | $CH_2CF_3$ | Et | Cl |
| B-2144 | 2 | H | $CH_2CH(Me)$ | H | $CH_2CF_3$ | Et | Cl |
| B-2145 | 2 | H | $CH_2CH(Me)$ | Me | $CH_2CF_3$ | Et | Cl |
| B-2146 | 2 | Me | $CH_2CH(Me)$ | H | $CH_2CF_3$ | Et | Cl |
| B-2147 | 2 | Me | $CH_2CH(Me)$ | Me | $CH_2CF_3$ | Et | Cl |
| B-2148 | 2 | H | $CH(Me)CH_2$ | H | $CH_2CF_3$ | Et | Cl |
| B-2149 | 2 | H | $CH(Me)CH_2$ | Me | $CH_2CF_3$ | Et | Cl |
| B-2150 | 2 | Me | $CH(Me)CH_2$ | H | $CH_2CF_3$ | Et | Cl |

TABLE 213

| Compound Number | n | Y | W | Z | $R^1$ | $R^2$ | $R^3$ |
|---|---|---|---|---|---|---|---|
| B-2151 | 2 | Me | $CH(Me)CH_2$ | Me | $CH_2CF_3$ | Et | Cl |
| B-2152 | 2 | H | $CH_2CH_2CH_2$ | Me | $CH_2CF_3$ | Et | Cl |
| B-2153 | 2 | Me | $CH_2CH_2CH_2$ | H | $CH_2CF_3$ | Et | Cl |
| B-2154 | 2 | Me | $CH_2CH_2CH_2$ | Me | $CH_2CF_3$ | Et | Cl |
| B-2155 | 2 | H | $CH_2CH_2CH(Me)$ | H | $CH_2CF_3$ | Et | Cl |
| B-2156 | 2 | H | $CH_2CH_2CH(Me)$ | Me | $CH_2CF_3$ | Et | Cl |
| B-2157 | 2 | Me | $CH_2CH_2CH(Me)$ | H | $CH_2CF_3$ | Et | Cl |
| B-2158 | 2 | Me | $CH_2CH_2CH(Me)$ | Me | $CH_2CF_3$ | Et | Cl |
| B-2159 | 2 | H | $CH_2CH(Me)CH_2$ | H | $CH_2CF_3$ | Et | Cl |
| B-2160 | 2 | H | $CH_2CH(Me)CH_2$ | Me | $CH_2CF_3$ | Et | Cl |
| B-2161 | 2 | Me | $CH_2CH(Me)CH_2$ | H | $CH_2CF_3$ | Et | Cl |
| B-2162 | 2 | Me | $CH_2CH(Me)CH_2$ | Me | $CH_2CF_3$ | Et | Cl |
| B-2163 | 2 | H | $CH(Me)CH_2CH_2$ | H | $CH_2CF_3$ | Et | Cl |
| B-2164 | 2 | H | $CH(Me)CH_2CH_2$ | Me | $CH_2CF_3$ | Et | Cl |
| B-2165 | 2 | Me | $CH(Me)CH_2CH_2$ | H | $CH_2CF_3$ | Et | Cl |
| B-2166 | 2 | Me | $CH(Me)CH_2CH_2$ | Me | $CH_2CF_3$ | Et | Cl |
| B-2167 | 2 | H | single bond | Me | $CH_2CF_3$ | Et | Me |
| B-2168 | 2 | H | single bond | Et | $CH_2CF_3$ | Et | Me |
| B-2169 | 2 | Me | single bond | H | $CH_2CF_3$ | Et | Me |
| B-2170 | 2 | Et | single bond | H | $CH_2CF_3$ | Et | Me |
| B-2171 | 2 | Me | single bond | Me | $CH_2CF_3$ | Et | Me |
| B-2172 | 2 | H | $CH_2$ | Me | $CH_2CF_3$ | Et | Me |
| B-2173 | 2 | Me | $CH_2$ | H | $CH_2CF_3$ | Et | Me |
| B-2174 | 2 | Me | $CH_2$ | Me | $CH_2CF_3$ | Et | Me |

TABLE 213-continued

| Compound Number | n | Y | W | Z | $R^1$ | $R^2$ | $R^3$ |
|---|---|---|---|---|---|---|---|
| B-2175 | 2 | H | CH(Me) | H | $CH_2CF_3$ | Et | Me |
| B-2176 | 2 | H | CH(Me) | Me | $CH_2CF_3$ | Et | Me |
| B-2177 | 2 | Me | CH(Me) | H | $CH_2CF_3$ | Et | Me |
| B-2178 | 2 | Me | CH(Me) | Me | $CH_2CF_3$ | Et | Me |
| B-2179 | 2 | H | $CH_2CH_2$ | Me | $CH_2CF_3$ | Et | Me |
| B-2180 | 2 | Me | $CH_2CH_2$ | H | $CH_2CF_3$ | Et | Me |
| B-2181 | 2 | Me | $CH_2CH_2$ | Me | $CH_2CF_3$ | Et | Me |
| B-2182 | 2 | H | $CH_2CH(Me)$ | H | $CH_2CF_3$ | Et | Me |
| B-2183 | 2 | H | $CH_2CH(Me)$ | Me | $CH_2CF_3$ | Et | Me |
| B-2184 | 2 | Me | $CH_2CH(Me)$ | H | $CH_2CF_3$ | Et | Me |
| B-2185 | 2 | Me | $CH_2CH(Me)$ | Me | $CH_2CF_3$ | Et | Me |
| B-2186 | 2 | H | $CH(Me)CH_2$ | H | $CH_2CF_3$ | Et | Me |
| B-2187 | 2 | H | $CH(Me)CH_2$ | Me | $CH_2CF_3$ | Et | Me |
| B-2188 | 2 | Me | $CH(Me)CH_2$ | H | $CH_2CF_3$ | Et | Me |
| B-2189 | 2 | Me | $CH(Me)CH_2$ | Me | $CH_2CF_3$ | Et | Me |
| B-2190 | 2 | H | $CH_2CH_2CH_2$ | Me | $CH_2CF_3$ | Et | Me |
| B-2191 | 2 | Me | $CH_2CH_2CH_2$ | H | $CH_2CF_3$ | Et | Me |
| B-2192 | 2 | Me | $CH_2CH_2CH_2$ | Me | $CH_2CF_3$ | Et | Me |
| B-2193 | 2 | H | $CH_2CH_2CH(Me)$ | H | $CH_2CF_3$ | Et | Me |
| B-2194 | 2 | H | $CH_2CH_2CH(Me)$ | Me | $CH_2CF_3$ | Et | Me |

TABLE 214

| Compound Number | n | Y | W | Z | $R^1$ | $R^2$ | $R^3$ |
|---|---|---|---|---|---|---|---|
| B-2195 | 2 | Me | $CH_2CH_2CH(Me)$ | H | $CH_2CF_3$ | Et | Me |
| B-2196 | 2 | Me | $CH_2CH_2CH(Me)$ | Me | $CH_2CF_3$ | Et | Me |
| B-2197 | 2 | H | $CH_2CH(Me)CH_2$ | H | $CH_2CF_3$ | Et | Me |
| B-2198 | 2 | H | $CH_2CH(Me)CH_2$ | Me | $CH_2CF_3$ | Et | Me |
| B-2199 | 2 | Me | $CH_2CH(Me)CH_2$ | H | $CH_2CF_3$ | Et | Me |
| B-2200 | 2 | Me | $CH_2CH(Me)CH_2$ | Me | $CH_2CF_3$ | Et | Me |
| B-2201 | 2 | H | $CH(Me)CH_2CH_2$ | H | $CH_2CF_3$ | Et | Me |
| B-2202 | 2 | H | $CH(Me)CH_2CH_2$ | Me | $CH_2CF_3$ | Et | Me |
| B-2203 | 2 | Me | $CH(Me)CH_2CH_2$ | H | $CH_2CF_3$ | Et | Me |
| B-2204 | 2 | Me | $CH(Me)CH_2CH_2$ | Me | $CH_2CF_3$ | Et | Me |
| B-2205 | 2 | H | single bond | Me | $CH_2CF_3$ | $CH_2OMe$ | Cl |
| B-2206 | 2 | H | single bond | Et | $CH_2CF_3$ | $CH_2OMe$ | Cl |
| B-2207 | 2 | Me | single bond | H | $CH_2CF_3$ | $CH_2OMe$ | Cl |
| B-2208 | 2 | Et | single bond | H | $CH_2CF_3$ | $CH_2OMe$ | Cl |
| B-2209 | 2 | Me | single bond | Me | $CH_2CF_3$ | $CH_2OMe$ | Cl |
| B-2210 | 2 | H | $CH_2$ | Me | $CH_2CF_3$ | $CH_2OMe$ | Cl |
| B-2211 | 2 | Me | $CH_2$ | H | $CH_2CF_3$ | $CH_2OMe$ | Cl |
| B-2212 | 2 | Me | $CH_2$ | Me | $CH_2CF_3$ | $CH_2OMe$ | Cl |
| B-2213 | 2 | H | CH(Me) | H | $CH_2CF_3$ | $CH_2OMe$ | Cl |
| B-2214 | 2 | H | CH(Me) | Me | $CH_2CF_3$ | $CH_2OMe$ | Cl |
| B-2215 | 2 | Me | CH(Me) | H | $CH_2CF_3$ | $CH_2OMe$ | Cl |
| B-2216 | 2 | Me | CH(Me) | Me | $CH_2CF_3$ | $CH_2OMe$ | Cl |
| B-2217 | 2 | H | $CH_2CH_2$ | Me | $CH_2CF_3$ | $CH_2OMe$ | Cl |
| B-2218 | 2 | Me | $CH_2CH_2$ | H | $CH_2CF_3$ | $CH_2OMe$ | Cl |
| B-2219 | 2 | Me | $CH_2CH_2$ | Me | $CH_2CF_3$ | $CH_2OMe$ | Cl |
| B-2220 | 2 | H | $CH_2CH(Me)$ | H | $CH_2CF_3$ | $CH_2OMe$ | Cl |
| B-2221 | 2 | H | $CH_2CH(Me)$ | Me | $CH_2CF_3$ | $CH_2OMe$ | Cl |
| B-2222 | 2 | Me | $CH_2CH(Me)$ | H | $CH_2CF_3$ | $CH_2OMe$ | Cl |
| B-2223 | 2 | Me | $CH_2CH(Me)$ | Me | $CH_2CF_3$ | $CH_2OMe$ | Cl |
| B-2224 | 2 | H | $CH(Me)CH_2$ | H | $CH_2CF_3$ | $CH_2OMe$ | Cl |
| B-2225 | 2 | H | $CH(Me)CH_2$ | Me | $CH_2CF_3$ | $CH_2OMe$ | Cl |
| B-2226 | 2 | Me | $CH(Me)CH_2$ | H | $CH_2CF_3$ | $CH_2OMe$ | Cl |
| B-2227 | 2 | Me | $CH(Me)CH_2$ | Me | $CH_2CF_3$ | $CH_2OMe$ | Cl |
| B-2228 | 2 | H | $CH_2CH_2CH_2$ | Me | $CH_2CF_3$ | $CH_2OMe$ | Cl |
| B-2229 | 2 | Me | $CH_2CH_2CH_2$ | H | $CH_2CF_3$ | $CH_2OMe$ | Cl |
| B-2230 | 2 | Me | $CH_2CH_2CH_2$ | Me | $CH_2CF_3$ | $CH_2OMe$ | Cl |
| B-2231 | 2 | H | $CH_2CH_2CH(Me)$ | H | $CH_2CF_3$ | $CH_2OMe$ | Cl |
| B-2232 | 2 | H | $CH_2CH_2CH(Me)$ | Me | $CH_2CF_3$ | $CH_2OMe$ | Cl |
| B-2233 | 2 | Me | $CH_2CH_2CH(Me)$ | H | $CH_2CF_3$ | $CH_2OMe$ | Cl |
| B-2234 | 2 | Me | $CH_2CH_2CH(Me)$ | Me | $CH_2CF_3$ | $CH_2OMe$ | Cl |
| B-2235 | 2 | H | $CH_2CH(Me)CH_2$ | H | $CH_2CF_3$ | $CH_2OMe$ | Cl |
| B-2236 | 2 | H | $CH_2CH(Me)CH_2$ | Me | $CH_2CF_3$ | $CH_2OMe$ | Cl |
| B-2237 | 2 | Me | $CH_2CH(Me)CH_2$ | H | $CH_2CF_3$ | $CH_2OMe$ | Cl |
| B-2238 | 2 | Me | $CH_2CH(Me)CH_2$ | Me | $CH_2CF_3$ | $CH_2OMe$ | Cl |

TABLE 215

| Compound Number | n | Y | W | Z | $R^1$ | $R^2$ | $R^3$ |
|---|---|---|---|---|---|---|---|
| B-2239 | 2 | H | $CH(Me)CH_2CH_2$ | H | $CH_2CF_3$ | $CH_2OMe$ | Cl |
| B-2240 | 2 | H | $CH(Me)CH_2CH_2$ | Me | $CH_2CF_3$ | $CH_2OMe$ | Cl |
| B-2241 | 2 | Me | $CH(Me)CH_2CH_2$ | H | $CH_2CF_3$ | $CH_2OMe$ | Cl |
| B-2242 | 2 | Me | $CH(Me)CH_2CH_2$ | Me | $CH_2CF_3$ | $CH_2OMe$ | Cl |
| B-2243 | 2 | H | single bond | Me | $CH_2CF_3$ | $CH_2OMe$ | Me |
| B-2244 | 2 | H | single bond | Et | $CH_2CF_3$ | $CH_2OMe$ | Me |
| B-2245 | 2 | Me | single bond | H | $CH_2CF_3$ | $CH_2OMe$ | Me |
| B-2246 | 2 | Et | single bond | H | $CH_2CF_3$ | $CH_2OMe$ | Me |
| B-2247 | 2 | Me | single bond | Me | $CH_2CF_3$ | $CH_2OMe$ | Me |
| B-2248 | 2 | H | $CH_2$ | Me | $CH_2CF_3$ | $CH_2OMe$ | Me |
| B-2249 | 2 | Me | $CH_2$ | H | $CH_2CF_3$ | $CH_2OMe$ | Me |
| B-2250 | 2 | Me | $CH_2$ | Me | $CH_2CF_3$ | $CH_2OMe$ | Me |
| B-2251 | 2 | H | CH(Me) | H | $CH_2CF_3$ | $CH_2OMe$ | Me |
| B-2252 | 2 | H | CH(Me) | Me | $CH_2CF_3$ | $CH_2OMe$ | Me |
| B-2253 | 2 | Me | CH(Me) | H | $CH_2CF_3$ | $CH_2OMe$ | Me |
| B-2254 | 2 | Me | CH(Me) | Me | $CH_2CF_3$ | $CH_2OMe$ | Me |
| B-2255 | 2 | H | $CH_2CH_2$ | Me | $CH_2CF_3$ | $CH_2OMe$ | Me |
| B-2256 | 2 | Me | $CH_2CH_2$ | H | $CH_2CF_3$ | $CH_2OMe$ | Me |
| B-2257 | 2 | Me | $CH_2CH_2$ | Me | $CH_2CF_3$ | $CH_2OMe$ | Me |
| B-2258 | 2 | H | $CH_2CH(Me)$ | H | $CH_2CF_3$ | $CH_2OMe$ | Me |
| B-2259 | 2 | H | $CH_2CH(Me)$ | Me | $CH_2CF_3$ | $CH_2OMe$ | Me |
| B-2260 | 2 | Me | $CH_2CH(Me)$ | H | $CH_2CF_3$ | $CH_2OMe$ | Me |
| B-2261 | 2 | Me | $CH_2CH(Me)$ | Me | $CH_2CF_3$ | $CH_2OMe$ | Me |
| B-2262 | 2 | H | $CH(Me)CH_2$ | H | $CH_2CF_3$ | $CH_2OMe$ | Me |
| B-2263 | 2 | H | $CH(Me)CH_2$ | Me | $CH_2CF_3$ | $CH_2OMe$ | Me |
| B-2264 | 2 | Me | $CH(Me)CH_2$ | H | $CH_2CF_3$ | $CH_2OMe$ | Me |
| B-2265 | 2 | Me | $CH(Me)CH_2$ | Me | $CH_2CF_3$ | $CH_2OMe$ | Me |
| B-2266 | 2 | H | $CH_2CH_2CH_2$ | Me | $CH_2CF_3$ | $CH_2OMe$ | Me |
| B-2267 | 2 | Me | $CH_2CH_2CH_2$ | H | $CH_2CF_3$ | $CH_2OMe$ | Me |
| B-2268 | 2 | Me | $CH_2CH_2CH_2$ | Me | $CH_2CF_3$ | $CH_2OMe$ | Me |
| B-2269 | 2 | H | $CH_2CH_2CH(Me)$ | H | $CH_2CF_3$ | $CH_2OMe$ | Me |
| B-2270 | 2 | H | $CH_2CH_2CH(Me)$ | Me | $CH_2CF_3$ | $CH_2OMe$ | Me |
| B-2271 | 2 | Me | $CH_2CH_2CH(Me)$ | H | $CH_2CF_3$ | $CH_2OMe$ | Me |
| B-2272 | 2 | Me | $CH_2CH_2CH(Me)$ | Me | $CH_2CF_3$ | $CH_2OMe$ | Me |
| B-2273 | 2 | H | $CH_2CH(Me)CH_2$ | H | $CH_2CF_3$ | $CH_2OMe$ | Me |
| B-2274 | 2 | H | $CH_2CH(Me)CH_2$ | Me | $CH_2CF_3$ | $CH_2OMe$ | Me |
| B-2275 | 2 | Me | $CH_2CH(Me)CH_2$ | H | $CH_2CF_3$ | $CH_2OMe$ | Me |
| B-2276 | 2 | Me | $CH_2CH(Me)CH_2$ | Me | $CH_2CF_3$ | $CH_2OMe$ | Me |
| B-2277 | 2 | H | $CH(Me)CH_2CH_2$ | H | $CH_2CF_3$ | $CH_2OMe$ | Me |
| B-2278 | 2 | H | $CH(Me)CH_2CH_2$ | Me | $CH_2CF_3$ | $CH_2OMe$ | Me |
| B-2279 | 2 | Me | $CH(Me)CH_2CH_2$ | H | $CH_2CF_3$ | $CH_2OMe$ | Me |
| B-2280 | 2 | Me | $CH(Me)CH_2CH_2$ | Me | $CH_2CF_3$ | $CH_2OMe$ | Me |
| B-2281 | 2 | H | single bond | Me | $CH_2CF_3$ | $CH_2CN$ | Cl |
| B-2282 | 2 | H | single bond | Et | $CH_2CF_3$ | $CH_2CN$ | Cl |

TABLE 216

| Compound Number | n | Y | W | Z | $R^1$ | $R^2$ | $R^3$ |
|---|---|---|---|---|---|---|---|
| B-2283 | 2 | Me | single bond | H | $CH_2CF_3$ | $CH_2CN$ | Cl |
| B-2284 | 2 | Et | single bond | H | $CH_2CF_3$ | $CH_2CN$ | Cl |
| B-2285 | 2 | Me | single bond | Me | $CH_2CF_3$ | $CH_2CN$ | Cl |
| B-2286 | 2 | H | $CH_2$ | Me | $CH_2CF_3$ | $CH_2CN$ | Cl |
| B-2287 | 2 | Me | $CH_2$ | H | $CH_2CF_3$ | $CH_2CN$ | Cl |
| B-2288 | 2 | Me | $CH_2$ | Me | $CH_2CF_3$ | $CH_2CN$ | Cl |
| B-2289 | 2 | H | CH(Me) | H | $CH_2CF_3$ | $CH_2CN$ | Cl |
| B-2290 | 2 | H | CH(Me) | Me | $CH_2CF_3$ | $CH_2CN$ | Cl |
| B-2291 | 2 | Me | CH(Me) | H | $CH_2CF_3$ | $CH_2CN$ | Cl |
| B-2292 | 2 | Me | CH(Me) | Me | $CH_2CF_3$ | $CH_2CN$ | Cl |
| B-2293 | 2 | H | $CH_2CH_2$ | Me | $CH_2CF_3$ | $CH_2CN$ | Cl |
| B-2294 | 2 | Me | $CH_2CH_2$ | H | $CH_2CF_3$ | $CH_2CN$ | Cl |
| B-2295 | 2 | Me | $CH_2CH_2$ | Me | $CH_2CF_3$ | $CH_2CN$ | Cl |
| B-2296 | 2 | H | $CH_2CH(Me)$ | H | $CH_2CF_3$ | $CH_2CN$ | Cl |
| B-2297 | 2 | H | $CH_2CH(Me)$ | Me | $CH_2CF_3$ | $CH_2CN$ | Cl |
| B-2298 | 2 | Me | $CH_2CH(Me)$ | H | $CH_2CF_3$ | $CH_2CN$ | Cl |
| B-2299 | 2 | Me | $CH_2CH(Me)$ | Me | $CH_2CF_3$ | $CH_2CN$ | Cl |
| B-2300 | 2 | H | $CH(Me)CH_2$ | H | $CH_2CF_3$ | $CH_2CN$ | Cl |
| B-2301 | 2 | H | $CH(Me)CH_2$ | Me | $CH_2CF_3$ | $CH_2CN$ | Cl |
| B-2302 | 2 | Me | $CH(Me)CH_2$ | H | $CH_2CF_3$ | $CH_2CN$ | Cl |
| B-2303 | 2 | Me | $CH(Me)CH_2$ | Me | $CH_2CF_3$ | $CH_2CN$ | Cl |
| B-2304 | 2 | H | $CH_2CH_2CH_2$ | Me | $CH_2CF_3$ | $CH_2CN$ | Cl |
| B-2305 | 2 | Me | $CH_2CH_2CH_2$ | H | $CH_2CF_3$ | $CH_2CN$ | Cl |
| B-2306 | 2 | Me | $CH_2CH_2CH_2$ | Me | $CH_2CF_3$ | $CH_2CN$ | Cl |

TABLE 216-continued

| Compound Number | n | Y | W | Z | $R^1$ | $R^2$ | $R^3$ |
|---|---|---|---|---|---|---|---|
| B-2307 | 2 | H | $CH_2CH_2CH(Me)$ | H | $CH_2CF_3$ | $CH_2CN$ | Cl |
| B-2308 | 2 | H | $CH_2CH_2CH(Me)$ | Me | $CH_2CF_3$ | $CH_2CN$ | Cl |
| B-2309 | 2 | Me | $CH_2CH_2CH(Me)$ | H | $CH_2CF_3$ | $CH_2CN$ | Cl |
| B-2310 | 2 | Me | $CH_2CH_2CH(Me)$ | Me | $CH_2CF_3$ | $CH_2CN$ | Cl |
| B-2311 | 2 | H | $CH_2CH(Me)CH_2$ | H | $CH_2CF_3$ | $CH_2CN$ | Cl |
| B-2312 | 2 | H | $CH_2CH(Me)CH_2$ | Me | $CH_2CF_3$ | $CH_2CN$ | Cl |
| B-2313 | 2 | Me | $CH_2CH(Me)CH_2$ | H | $CH_2CF_3$ | $CH_2CN$ | Cl |
| B-2314 | 2 | Me | $CH_2CH(Me)CH_2$ | Me | $CH_2CF_3$ | $CH_2CN$ | Cl |
| B-2315 | 2 | H | $CH(Me)CH_2CH_2$ | H | $CH_2CF_3$ | $CH_2CN$ | Cl |
| B-2316 | 2 | H | $CH(Me)CH_2CH_2$ | Me | $CH_2CF_3$ | $CH_2CN$ | Cl |
| B-2317 | 2 | Me | $CH(Me)CH_2CH_2$ | H | $CH_2CF_3$ | $CH_2CN$ | Cl |
| B-2318 | 2 | Me | $CH(Me)CH_2CH_2$ | Me | $CH_2CF_3$ | $CH_2CN$ | Cl |
| B-2319 | 2 | H | single bond | Me | $CH_2CF_3$ | $CH_2CN$ | Me |
| B-2320 | 2 | H | single bond | Et | $CH_2CF_3$ | $CH_2CN$ | Me |
| B-2321 | 2 | Me | single bond | H | $CH_2CF_3$ | $CH_2CN$ | Me |
| B-2322 | 2 | Et | single bond | H | $CH_2CF_3$ | $CH_2CN$ | Me |
| B-2323 | 2 | Me | single bond | Me | $CH_2CF_3$ | $CH_2CN$ | Me |
| B-2324 | 2 | H | $CH_2$ | Me | $CH_2CF_3$ | $CH_2CN$ | Me |
| B-2325 | 2 | Me | $CH_2$ | H | $CH_2CF_3$ | $CH_2CN$ | Me |
| B-2326 | 2 | Me | $CH_2$ | Me | $CH_2CF_3$ | $CH_2CN$ | Me |

TABLE 217

| Compound Number | n | Y | W | Z | $R^1$ | $R^2$ | $R^3$ |
|---|---|---|---|---|---|---|---|
| B-2327 | 2 | H | CH(Me) | H | $CH_2CF_3$ | $CH_2CN$ | Me |
| B-2328 | 2 | H | CH(Me) | Me | $CH_2CF_3$ | $CH_2CN$ | Me |
| B-2329 | 2 | Me | CH(Me) | H | $CH_2CF_3$ | $CH_2CN$ | Me |
| B-2330 | 2 | Me | CH(Me) | Me | $CH_2CF_3$ | $CH_2CN$ | Me |
| B-2331 | 2 | H | $CH_2CH_2$ | Me | $CH_2CF_3$ | $CH_2CN$ | Me |
| B-2332 | 2 | Me | $CH_2CH_2$ | H | $CH_2CF_3$ | $CH_2CN$ | Me |
| B-2333 | 2 | Me | $CH_2CH_2$ | Me | $CH_2CF_3$ | $CH_2CN$ | Me |
| B-2334 | 2 | H | $CH_2CH(Me)$ | H | $CH_2CF_3$ | $CH_2CN$ | Me |
| B-2335 | 2 | H | $CH_2CH(Me)$ | Me | $CH_2CF_3$ | $CH_2CN$ | Me |
| B-2336 | 2 | Me | $CH_2CH(Me)$ | H | $CH_2CF_3$ | $CH_2CN$ | Me |
| B-2337 | 2 | Me | $CH_2CH(Me)$ | Me | $CH_2CF_3$ | $CH_2CN$ | Me |
| B-2338 | 2 | H | $CH(Me)CH_2$ | H | $CH_2CF_3$ | $CH_2CN$ | Me |
| B-2339 | 2 | H | $CH(Me)CH_2$ | Me | $CH_2CF_3$ | $CH_2CN$ | Me |
| B-2340 | 2 | Me | $CH(Me)CH_2$ | H | $CH_2CF_3$ | $CH_2CN$ | Me |
| B-2341 | 2 | Me | $CH(Me)CH_2$ | Me | $CH_2CF_3$ | $CH_2CN$ | Me |
| B-2342 | 2 | H | $CH_2CH_2CH_2$ | Me | $CH_2CF_3$ | $CH_2CN$ | Me |
| B-2343 | 2 | Me | $CH_2CH_2CH_2$ | H | $CH_2CF_3$ | $CH_2CN$ | Me |
| B-2344 | 2 | Me | $CH_2CH_2CH_2$ | Me | $CH_2CF_3$ | $CH_2CN$ | Me |
| B-2345 | 2 | H | $CH_2CH_2CH(Me)$ | H | $CH_2CF_3$ | $CH_2CN$ | Me |
| B-2346 | 2 | H | $CH_2CH_2CH(Me)$ | Me | $CH_2CF_3$ | $CH_2CN$ | Me |
| B-2347 | 2 | Me | $CH_2CH_2CH(Me)$ | H | $CH_2CF_3$ | $CH_2CN$ | Me |
| B-2348 | 2 | Me | $CH_2CH_2CH(Me)$ | Me | $CH_2CF_3$ | $CH_2CN$ | Me |
| B-2349 | 2 | H | $CH_2CH(Me)CH_2$ | H | $CH_2CF_3$ | $CH_2CN$ | Me |
| B-2350 | 2 | H | $CH_2CH(Me)CH_2$ | Me | $CH_2CF_3$ | $CH_2CN$ | Me |
| B-2351 | 2 | Me | $CH_2CH(Me)CH_2$ | H | $CH_2CF_3$ | $CH_2CN$ | Me |
| B-2352 | 2 | Me | $CH_2CH(Me)CH_2$ | Me | $CH_2CF_3$ | $CH_2CN$ | Me |
| B-2353 | 2 | H | $CH(Me)CH_2CH_2$ | H | $CH_2CF_3$ | $CH_2CN$ | Me |
| B-2354 | 2 | H | $CH(Me)CH_2CH_2$ | Me | $CH_2CF_3$ | $CH_2CN$ | Me |
| B-2355 | 2 | Me | $CH(Me)CH_2CH_2$ | H | $CH_2CF_3$ | $CH_2CN$ | Me |
| B-2356 | 2 | Me | $CH(Me)CH_2CH_2$ | Me | $CH_2CF_3$ | $CH_2CN$ | Me |
| B-2357 | 2 | H | single bond | Me | $CH_2CF_3$ | C(═O)Me | Cl |
| B-2358 | 2 | H | single bond | Et | $CH_2CF_3$ | C(═O)Me | Cl |
| B-2359 | 2 | Me | single bond | H | $CH_2CF_3$ | C(═O)Me | Cl |
| B-2360 | 2 | Et | single bond | H | $CH_2CF_3$ | C(═O)Me | Cl |
| B-2361 | 2 | Me | single bond | Me | $CH_2CF_3$ | C(═O)Me | Cl |
| B-2362 | 2 | H | $CH_2$ | Me | $CH_2CF_3$ | C(═O)Me | Cl |
| B-2363 | 2 | Me | $CH_2$ | H | $CH_2CF_3$ | C(═O)Me | Cl |
| B-2364 | 2 | Me | $CH_2$ | Me | $CH_2CF_3$ | C(═O)Me | Cl |
| B-2365 | 2 | H | CH(Me) | H | $CH_2CF_3$ | C(═O)Me | Cl |
| B-2366 | 2 | H | CH(Me) | Me | $CH_2CF_3$ | C(═O)Me | Cl |
| B-2367 | 2 | Me | CH(Me) | H | $CH_2CF_3$ | C(═O)Me | Cl |
| B-2368 | 2 | Me | CH(Me) | Me | $CH_2CF_3$ | C(═O)Me | Cl |
| B-2369 | 2 | H | $CH_2CH_2$ | Me | $CH_2CF_3$ | C(═O)Me | Cl |
| B-2370 | 2 | Me | $CH_2CH_2$ | H | $CH_2CF_3$ | C(═O)Me | Cl |

TABLE 218

| Compound Number | n | Y | W | Z | $R^1$ | $R^2$ | $R^3$ |
|---|---|---|---|---|---|---|---|
| B-2371 | 2 | Me | $CH_2CH_2$ | Me | $CH_2CF_3$ | C(═O)Me | Cl |
| B-2372 | 2 | H | $CH_2CH(Me)$ | H | $CH_2CF_3$ | C(═O)Me | Cl |
| B-2373 | 2 | H | $CH_2CH(Me)$ | Me | $CH_2CF_3$ | C(═O)Me | Cl |
| B-2374 | 2 | Me | $CH_2CH(Me)$ | H | $CH_2CF_3$ | C(═O)Me | Cl |
| B-2375 | 2 | Me | $CH_2CH(Me)$ | Me | $CH_2CF_3$ | C(═O)Me | Cl |
| B-2376 | 2 | H | $CH(Me)CH_2$ | H | $CH_2CF_3$ | C(═O)Me | Cl |
| B-2377 | 2 | H | $CH(Me)CH_2$ | Me | $CH_2CF_3$ | C(═O)Me | Cl |
| B-2378 | 2 | Me | $CH(Me)CH_2$ | H | $CH_2CF_3$ | C(═O)Me | Cl |
| B-2379 | 2 | Me | $CH(Me)CH_2$ | Me | $CH_2CF_3$ | C(═O)Me | Cl |
| B-2380 | 2 | H | $CH_2CH_2CH_2$ | Me | $CH_2CF_3$ | C(═O)Me | Cl |
| B-2381 | 2 | Me | $CH_2CH_2CH_2$ | H | $CH_2CF_3$ | C(═O)Me | Cl |
| B-2382 | 2 | Me | $CH_2CH_2CH_2$ | Me | $CH_2CF_3$ | C(═O)Me | Cl |
| B-2383 | 2 | H | $CH_2CH_2CH(Me)$ | H | $CH_2CF_3$ | C(═O)Me | Cl |
| B-2384 | 2 | H | $CH_2CH_2CH(Me)$ | Me | $CH_2CF_3$ | C(═O)Me | Cl |
| B-2385 | 2 | Me | $CH_2CH_2CH(Me)$ | H | $CH_2CF_3$ | C(═O)Me | Cl |
| B-2386 | 2 | Me | $CH_2CH_2CH(Me)$ | Me | $CH_2CF_3$ | C(═O)Me | Cl |
| B-2387 | 2 | H | $CH_2CH(Me)CH_2$ | H | $CH_2CF_3$ | C(═O)Me | Cl |
| B-2388 | 2 | H | $CH_2CH(Me)CH_2$ | Me | $CH_2CF_3$ | C(═O)Me | Cl |
| B-2389 | 2 | Me | $CH_2CH(Me)CH_2$ | H | $CH_2CF_3$ | C(═O)Me | Cl |
| B-2390 | 2 | Me | $CH_2CH(Me)CH_2$ | Me | $CH_2CF_3$ | C(═O)Me | Cl |
| B-2391 | 2 | H | $CH(Me)CH_2CH_2$ | H | $CH_2CF_3$ | C(═O)Me | Cl |
| B-2392 | 2 | H | $CH(Me)CH_2CH_2$ | Me | $CH_2CF_3$ | C(═O)Me | Cl |
| B-2393 | 2 | Me | $CH(Me)CH_2CH_2$ | H | $CH_2CF_3$ | C(═O)Me | Cl |
| B-2394 | 2 | Me | $CH(Me)CH_2CH_2$ | Me | $CH_2CF_3$ | C(═O)Me | Cl |
| B-2395 | 2 | H | single bond | Me | $CH_2CF_3$ | C(═O)Me | Me |
| B-2396 | 2 | H | single bond | Et | $CH_2CF_3$ | C(═O)Me | Me |
| B-2397 | 2 | Me | single bond | H | $CH_2CF_3$ | C(═O)Me | Me |
| B-2398 | 2 | Et | single bond | H | $CH_2CF_3$ | C(═O)Me | Me |
| B-2399 | 2 | Me | single bond | Me | $CH_2CF_3$ | C(═O)Me | Me |
| B-2400 | 2 | H | $CH_2$ | Me | $CH_2CF_3$ | C(═O)Me | Me |
| B-2401 | 2 | Me | $CH_2$ | H | $CH_2CF_3$ | C(═O)Me | Me |
| B-2402 | 2 | Me | $CH_2$ | Me | $CH_2CF_3$ | C(═O)Me | Me |
| B-2403 | 2 | H | CH(Me) | H | $CH_2CF_3$ | C(═O)Me | Me |
| B-2404 | 2 | H | CH(Me) | Me | $CH_2CF_3$ | C(═O)Me | Me |
| B-2405 | 2 | Me | CH(Me) | H | $CH_2CF_3$ | C(═O)Me | Me |
| B-2406 | 2 | Me | CH(Me) | Me | $CH_2CF_3$ | C(═O)Me | Me |
| B-2407 | 2 | H | $CH_2CH_2$ | Me | $CH_2CF_3$ | C(═O)Me | Me |
| B-2408 | 2 | Me | $CH_2CH_2$ | H | $CH_2CF_3$ | C(═O)Me | Me |
| B-2409 | 2 | Me | $CH_2CH_2$ | Me | $CH_2CF_3$ | C(═O)Me | Me |
| B-2410 | 2 | H | $CH_2CH(Me)$ | H | $CH_2CF_3$ | C(═O)Me | Me |
| B-2411 | 2 | H | $CH_2CH(Me)$ | Me | $CH_2CF_3$ | C(═O)Me | Me |
| B-2412 | 2 | Me | $CH_2CH(Me)$ | H | $CH_2CF_3$ | C(═O)Me | Me |
| B-2413 | 2 | Me | $CH_2CH(Me)$ | Me | $CH_2CF_3$ | C(═O)Me | Me |
| B-2414 | 2 | H | $CH(Me)CH_2$ | H | $CH_2CF_3$ | C(═O)Me | Me |

TABLE 219

| Compound Number | n | Y | W | Z | $R^1$ | $R^2$ | $R^3$ |
|---|---|---|---|---|---|---|---|
| B-2415 | 2 | H | $CH(Me)CH_2$ | Me | $CH_2CF_3$ | C(═O)Me | Me |
| B-2416 | 2 | Me | $CH(Me)CH_2$ | H | $CH_2CF_3$ | C(═O)Me | Me |
| B-2417 | 2 | Me | $CH(Me)CH_2$ | Me | $CH_2CF_3$ | C(═O)Me | Me |
| B-2418 | 2 | H | $CH_2CH_2CH_2$ | Me | $CH_2CF_3$ | C(═O)Me | Me |
| B-2419 | 2 | Me | $CH_2CH_2CH_2$ | H | $CH_2CF_3$ | C(═O)Me | Me |
| B-2420 | 2 | Me | $CH_2CH_2CH_2$ | Me | $CH_2CF_3$ | C(═O)Me | Me |
| B-2421 | 2 | H | $CH_2CH_2CH(Me)$ | H | $CH_2CF_3$ | C(═O)Me | Me |
| B-2422 | 2 | H | $CH_2CH_2CH(Me)$ | Me | $CH_2CF_3$ | C(═O)Me | Me |
| B-2423 | 2 | Me | $CH_2CH_2CH(Me)$ | H | $CH_2CF_3$ | C(═O)Me | Me |
| B-2424 | 2 | Me | $CH_2CH_2CH(Me)$ | Me | $CH_2CF_3$ | C(═O)Me | Me |
| B-2425 | 2 | H | $CH_2CH(Me)CH_2$ | H | $CH_2CF_3$ | C(═O)Me | Me |
| B-2426 | 2 | H | $CH_2CH(Me)CH_2$ | Me | $CH_2CF_3$ | C(═O)Me | Me |
| B-2427 | 2 | Me | $CH_2CH(Me)CH_2$ | H | $CH_2CF_3$ | C(═O)Me | Me |
| B-2428 | 2 | Me | $CH_2CH(Me)CH_2$ | Me | $CH_2CF_3$ | C(═O)Me | Me |
| B-2429 | 2 | H | $CH(Me)CH_2CH_2$ | H | $CH_2CF_3$ | C(═O)Me | Me |
| B-2430 | 2 | H | $CH(Me)CH_2CH_2$ | Me | $CH_2CF_3$ | C(═O)Me | Me |
| B-2431 | 2 | Me | $CH(Me)CH_2CH_2$ | H | $CH_2CF_3$ | C(═O)Me | Me |
| B-2432 | 2 | Me | $CH(Me)CH_2CH_2$ | Me | $CH_2CF_3$ | C(═O)Me | Me |
| B-2433 | 2 | H | single bond | Me | $CH_2CF_3$ | C(═O)Ph | Cl |
| B-2434 | 2 | H | single bond | Et | $CH_2CF_3$ | C(═O)Ph | Cl |
| B-2435 | 2 | Me | single bond | H | $CH_2CF_3$ | C(═O)Ph | Cl |
| B-2436 | 2 | Et | single bond | H | $CH_2CF_3$ | C(═O)Ph | Cl |
| B-2437 | 2 | Me | single bond | Me | $CH_2CF_3$ | C(═O)Ph | Cl |
| B-2438 | 2 | H | $CH_2$ | Me | $CH_2CF_3$ | C(═O)Ph | Cl |

TABLE 219-continued

| Compound Number | n | Y | W | Z | $R^1$ | $R^2$ | $R^3$ |
|---|---|---|---|---|---|---|---|
| B-2439 | 2 | Me | $CH_2$ | H | $CH_2CF_3$ | C(=O)Ph | Cl |
| B-2440 | 2 | Me | $CH_2$ | Me | $CH_2CF_3$ | C(=O)Ph | Cl |
| B-2441 | 2 | H | CH(Me) | H | $CH_2CF_3$ | C(=O)Ph | Cl |
| B-2442 | 2 | H | CH(Me) | Me | $CH_2CF_3$ | C(=O)Ph | Cl |
| B-2443 | 2 | Me | CH(Me) | H | $CH_2CF_3$ | C(=O)Ph | Cl |
| B-2444 | 2 | Me | CH(Me) | Me | $CH_2CF_3$ | C(=O)Ph | Cl |
| B-2445 | 2 | H | $CH_2CH_2$ | Me | $CH_2CF_3$ | C(=O)Ph | Cl |
| B-2446 | 2 | Me | $CH_2CH_2$ | H | $CH_2CF_3$ | C(=O)Ph | Cl |
| B-2447 | 2 | Me | $CH_2CH_2$ | Me | $CH_2CF_3$ | C(=O)Ph | Cl |
| B-2448 | 2 | H | $CH_2CH(Me)$ | H | $CH_2CF_3$ | C(=O)Ph | Cl |
| B-2449 | 2 | H | $CH_2CH(Me)$ | Me | $CH_2CF_3$ | C(=O)Ph | Cl |
| B-2450 | 2 | Me | $CH_2CH(Me)$ | H | $CH_2CF_3$ | C(=O)Ph | Cl |
| B-2451 | 2 | Me | $CH_2CH(Me)$ | Me | $CH_2CF_3$ | C(=O)Ph | Cl |
| B-2452 | 2 | H | $CH(Me)CH_2$ | H | $CH_2CF_3$ | C(=O)Ph | Cl |
| B-2453 | 2 | H | $CH(Me)CH_2$ | Me | $CH_2CF_3$ | C(=O)Ph | Cl |
| B-2454 | 2 | Me | $CH(Me)CH_2$ | H | $CH_2CF_3$ | C(=O)Ph | Cl |
| B-2455 | 2 | Me | $CH(Me)CH_2$ | Me | $CH_2CF_3$ | C(=O)Ph | Cl |
| B-2456 | 2 | H | $CH_2CH_2CH_2$ | Me | $CH_2CF_3$ | C(=O)Ph | Cl |
| B-2457 | 2 | Me | $CH_2CH_2CH_2$ | H | $CH_2CF_3$ | C(=O)Ph | Cl |
| B-2458 | 2 | Me | $CH_2CH_2CH_2$ | Me | $CH_2CF_3$ | C(=O)Ph | Cl |

TABLE 220

| Compound Number | n | Y | W | Z | $R^1$ | $R^2$ | $R^3$ |
|---|---|---|---|---|---|---|---|
| B-2459 | 2 | H | $CH_2CH_2CH(Me)$ | H | $CH_2CF_3$ | C(=O)Ph | Cl |
| B-2460 | 2 | H | $CH_2CH_2CH(Me)$ | Me | $CH_2CF_3$ | C(=O)Ph | Cl |
| B-2461 | 2 | Me | $CH_2CH_2CH(Me)$ | H | $CH_2CF_3$ | C(=O)Ph | Cl |
| B-2462 | 2 | Me | $CH_2CH_2CH(Me)$ | Me | $CH_2CF_3$ | C(=O)Ph | Cl |
| B-2463 | 2 | H | $CH_2CH(Me)CH_2$ | H | $CH_2CF_3$ | C(=O)Ph | Cl |
| B-2464 | 2 | H | $CH_2CH(Me)CH_2$ | Me | $CH_2CF_3$ | C(=O)Ph | Cl |
| B-2465 | 2 | Me | $CH_2CH(Me)CH_2$ | H | $CH_2CF_3$ | C(=O)Ph | Cl |
| B-2466 | 2 | Me | $CH_2CH(Me)CH_2$ | Me | $CH_2CF_3$ | C(=O)Ph | Cl |
| B-2467 | 2 | H | $CH(Me)CH_2CH_2$ | H | $CH_2CF_3$ | C(=O)Ph | Cl |
| B-2468 | 2 | H | $CH(Me)CH_2CH_2$ | Me | $CH_2CF_3$ | C(=O)Ph | Cl |
| B-2469 | 2 | Me | $CH(Me)CH_2CH_2$ | H | $CH_2CF_3$ | C(=O)Ph | Cl |
| B-2470 | 2 | Me | $CH(Me)CH_2CH_2$ | Me | $CH_2CF_3$ | C(=O)Ph | Cl |
| B-2471 | 2 | H | single bond | Me | $CH_2CF_3$ | C(=O)Ph | Me |
| B-2472 | 2 | H | single bond | Et | $CH_2CF_3$ | C(=O)Ph | Me |
| B-2473 | 2 | Me | single bond | H | $CH_2CF_3$ | C(=O)Ph | Me |
| B-2474 | 2 | Et | single bond | H | $CH_2CF_3$ | C(=O)Ph | Me |
| B-2475 | 2 | Me | single bond | Me | $CH_2CF_3$ | C(=O)Ph | Me |
| B-2476 | 2 | H | $CH_2$ | Me | $CH_2CF_3$ | C(=O)Ph | Me |
| B-2477 | 2 | Me | $CH_2$ | H | $CH_2CF_3$ | C(=O)Ph | Me |
| B-2478 | 2 | Me | $CH_2$ | Me | $CH_2CF_3$ | C(=O)Ph | Me |
| B-2479 | 2 | H | CH(Me) | H | $CH_2CF_3$ | C(=O)Ph | Me |
| B-2480 | 2 | H | CH(Me) | Me | $CH_2CF_3$ | C(=O)Ph | Me |
| B-2481 | 2 | Me | CH(Me) | H | $CH_2CF_3$ | C(=O)Ph | Me |
| B-2482 | 2 | Me | CH(Me) | Me | $CH_2CF_3$ | C(=O)Ph | Me |
| B-2483 | 2 | H | $CH_2CH_2$ | Me | $CH_2CF_3$ | C(=O)Ph | Me |
| B-2484 | 2 | Me | $CH_2CH_2$ | H | $CH_2CF_3$ | C(=O)Ph | Me |
| B-2485 | 2 | Me | $CH_2CH_2$ | Me | $CH_2CF_3$ | C(=O)Ph | Me |
| B-2486 | 2 | H | $CH_2CH(Me)$ | H | $CH_2CF_3$ | C(=O)Ph | Me |
| B-2487 | 2 | H | $CH_2CH(Me)$ | Me | $CH_2CF_3$ | C(=O)Ph | Me |
| B-2488 | 2 | Me | $CH_2CH(Me)$ | H | $CH_2CF_3$ | C(=O)Ph | Me |
| B-2489 | 2 | Me | $CH_2CH(Me)$ | Me | $CH_2CF_3$ | C(=O)Ph | Me |
| B-2490 | 2 | H | $CH(Me)CH_2$ | H | $CH_2CF_3$ | C(=O)Ph | Me |
| B-2491 | 2 | H | $CH(Me)CH_2$ | Me | $CH_2CF_3$ | C(=O)Ph | Me |
| B-2492 | 2 | Me | $CH(Me)CH_2$ | H | $CH_2CF_3$ | C(=O)Ph | Me |
| B-2493 | 2 | Me | $CH(Me)CH_2$ | Me | $CH_2CF_3$ | C(=O)Ph | Me |
| B-2494 | 2 | H | $CH_2CH_2CH_2$ | Me | $CH_2CF_3$ | C(=O)Ph | Me |
| B-2495 | 2 | Me | $CH_2CH_2CH_2$ | H | $CH_2CF_3$ | C(=O)Ph | Me |
| B-2496 | 2 | Me | $CH_2CH_2CH_2$ | Me | $CH_2CF_3$ | C(=O)Ph | Me |
| B-2497 | 2 | H | $CH_2CH_2CH(Me)$ | H | $CH_2CF_3$ | C(=O)Ph | Me |
| B-2498 | 2 | H | $CH_2CH_2CH(Me)$ | Me | $CH_2CF_3$ | C(=O)Ph | Me |
| B-2499 | 2 | Me | $CH_2CH_2CH(Me)$ | H | $CH_2CF_3$ | C(=O)Ph | Me |
| B-2500 | 2 | Me | $CH_2CH_2CH(Me)$ | Me | $CH_2CF_3$ | C(=O)Ph | Me |
| B-2501 | 2 | H | $CH_2CH(Me)CH_2$ | H | $CH_2CF_3$ | C(=O)Ph | Me |
| B-2502 | 2 | H | $CH_2CH(Me)CH_2$ | Me | $CH_2CF_3$ | C(=O)Ph | Me |

TABLE 221

| Compound Number | n | Y | W | Z | $R^1$ | $R^2$ | $R^3$ |
|---|---|---|---|---|---|---|---|
| B-2503 | 2 | Me | $CH_2CH(Me)CH_2$ | H | $CH_2CF_3$ | C(=O)Ph | Me |
| B-2504 | 2 | Me | $CH_2CH(Me)CH_2$ | Me | $CH_2CF_3$ | C(=O)Ph | Me |
| B-2505 | 2 | H | $CH(Me)CH_2CH_2$ | H | $CH_2CF_3$ | C(=O)Ph | Me |
| B-2506 | 2 | H | $CH(Me)CH_2CH_2$ | Me | $CH_2CF_3$ | C(=O)Ph | Me |
| B-2507 | 2 | Me | $CH(Me)CH_2CH_2$ | H | $CH_2CF_3$ | C(=O)Ph | Me |
| B-2508 | 2 | Me | $CH(Me)CH_2CH_2$ | Me | $CH_2CF_3$ | C(=O)Ph | Me |
| B-2509 | 2 | H | single bond | Me | $CH_2CF_3$ | C(=O)OEt | Cl |
| B-2510 | 2 | H | single bond | Et | $CH_2CF_3$ | C(=O)OEt | Cl |
| B-2511 | 2 | Me | single bond | H | $CH_2CF_3$ | C(=O)OEt | Cl |
| B-2512 | 2 | Et | single bond | H | $CH_2CF_3$ | C(=O)OEt | Cl |
| B-2513 | 2 | Me | single bond | Me | $CH_2CF_3$ | C(=O)OEt | Cl |
| B-2514 | 2 | H | CH | Me | $CH_2CF_3$ | C(=O)OEt | Cl |
| B-2515 | 2 | Me | $CH_2$ | H | $CH_2CF_3$ | C(=O)OEt | Cl |
| B-2516 | 2 | Me | $CH_2$ | Me | $CH_2CF_3$ | C(=O)OEt | Cl |
| B-2517 | 2 | H | CH(Me) | H | $CH_2CF_3$ | C(=O)OEt | Cl |
| B-2518 | 2 | H | CH(Me) | Me | $CH_2CF_3$ | C(=O)OEt | Cl |
| B-2519 | 2 | Me | CH(Me) | H | $CH_2CF_3$ | C(=O)OEt | Cl |
| B-2520 | 2 | Me | CH(Me) | Me | $CH_2CF_3$ | C(=O)OEt | Cl |
| B-2521 | 2 | H | $CH_2CH_2$ | Me | $CH_2CF_3$ | C(=O)OEt | Cl |
| B-2522 | 2 | Me | $CH_2CH_2$ | H | $CH_2CF_3$ | C(=O)OEt | Cl |
| B-2523 | 2 | Me | $CH_2CH_2$ | Me | $CH_2CF_3$ | C(=O)OEt | Cl |
| B-2524 | 2 | H | $CH_2CH(Me)$ | H | $CH_2CF_3$ | C(=O)OEt | Cl |
| B-2525 | 2 | H | $CH_2CH(Me)$ | Me | $CH_2CF_3$ | C(=O)OEt | Cl |
| B-2526 | 2 | Me | $CH_2CH(Me)$ | H | $CH_2CF_3$ | C(=O)OEt | Cl |
| B-2527 | 2 | Me | $CH_2CH(Me)$ | Me | $CH_2CF_3$ | C(=O)OEt | Cl |
| B-2528 | 2 | H | $CH(Me)CH_2$ | H | $CH_2CF_3$ | C(=O)OEt | Cl |
| B-2529 | 2 | H | $CH(Me)CH_2$ | Me | $CH_2CF_3$ | C(=O)OEt | Cl |
| B-2530 | 2 | Me | $CH(Me)CH_2$ | H | $CH_2CF_3$ | C(=O)OEt | Cl |
| B-2531 | 2 | Me | $CH(Me)CH_2$ | Me | $CH_2CF_3$ | C(=O)OEt | Cl |
| B-2532 | 2 | H | $CH_2CH_2CH_2$ | Me | $CH_2CF_3$ | C(=O)OEt | Cl |
| B-2533 | 2 | Me | $CH_2CH_2CH_2$ | H | $CH_2CF_3$ | C(=O)OEt | Cl |
| B-2534 | 2 | Me | $CH_2CH_2CH_2$ | Me | $CH_2CF_3$ | C(=O)OEt | Cl |
| B-2535 | 2 | H | $CH_2CH_2CH(Me)$ | H | $CH_2CF_3$ | C(=O)OEt | Cl |
| B-2536 | 2 | H | $CH_2CH_2CH(Me)$ | Me | $CH_2CF_3$ | C(=O)OEt | Cl |
| B-2537 | 2 | Me | $CH_2CH_2CH(Me)$ | H | $CH_2CF_3$ | C(=O)OEt | Cl |
| B-2538 | 2 | Me | $CH_2CH_2CH(Me)$ | Me | $CH_2CF_3$ | C(=O)OEt | Cl |
| B-2539 | 2 | H | $CH_2CH(Me)CH_2$ | H | $CH_2CF_3$ | C(=O)OEt | Cl |
| B-2540 | 2 | H | $CH_2CH(Me)CH_2$ | Me | $CH_2CF_3$ | C(=O)OEt | Cl |
| B-2541 | 2 | Me | $CH_2CH(Me)CH_2$ | H | $CH_2CF_3$ | C(=O)OEt | Cl |
| B-2542 | 2 | Me | $CH_2CH(Me)CH_2$ | Me | $CH_2CF_3$ | C(=O)OEt | Cl |
| B-2543 | 2 | H | $CH(Me)CH_2CH_2$ | H | $CH_2CF_3$ | C(=O)OEt | Cl |
| B-2544 | 2 | H | $CH(Me)CH_2CH_2$ | Me | $CH_2CF_3$ | C(=O)OEt | Cl |
| B-2545 | 2 | Me | $CH(Me)CH_2CH_2$ | H | $CH_2CF_3$ | C(=O)OEt | Cl |
| B-2546 | 2 | Me | $CH(Me)CH_2CH_2$ | Me | $CH_2CF_3$ | C(=O)OEt | Cl |

TABLE 222

| Compound Number | n | Y | W | Z | $R^1$ | $R^2$ | $R^3$ |
|---|---|---|---|---|---|---|---|
| B-2547 | 2 | H | single bond | Me | $CH_2CF_3$ | C(=O)OEt | Me |
| B-2548 | 2 | H | single bond | Et | $CH_2CF_3$ | C(=O)OEt | Me |
| B-2549 | 2 | Me | single bond | H | $CH_2CF_3$ | C(=O)OEt | Me |
| B-2550 | 2 | Et | single bond | H | $CH_2CF_3$ | C(=O)OEt | Me |
| B-2551 | 2 | Me | single bond | Me | $CH_2CF_3$ | C(=O)OEt | Me |
| B-2552 | 2 | H | $CH_2$ | Me | $CH_2CF_3$ | C(=O)OEt | Me |
| B-2553 | 2 | Me | $CH_2$ | H | $CH_2CF_3$ | C(=O)OEt | Me |
| B-2554 | 2 | Me | $CH_2$ | Me | $CH_2CF_3$ | C(=O)OEt | Me |
| B-2555 | 2 | H | CH(Me) | H | $CH_2CF_3$ | C(=O)OEt | Me |
| B-2556 | 2 | H | CH(Me) | Me | $CH_2CF_3$ | C(=O)OEt | Me |
| B-2557 | 2 | Me | CH(Me) | H | $CH_2CF_3$ | C(=O)OEt | Me |
| B-2558 | 2 | Me | CH(Me) | Me | $CH_2CF_3$ | C(=O)OEt | Me |
| B-2559 | 2 | H | $CH_2CH_2$ | Me | $CH_2CF_3$ | C(=O)OEt | Me |
| B-2560 | 2 | Me | $CH_2CH_2$ | H | $CH_2CF_3$ | C(=O)OEt | Me |
| B-2561 | 2 | Me | $CH_2CH_2$ | Me | $CH_2CF_3$ | C(=O)OEt | Me |
| B-2562 | 2 | H | $CH_2CH(Me)$ | H | $CH_2CF_3$ | C(=O)OEt | Me |
| B-2563 | 2 | H | $CH_2CH(Me)$ | Me | $CH_2CF_3$ | C(=O)OEt | Me |
| B-2564 | 2 | Me | $CH_2CH(Me)$ | H | $CH_2CF_3$ | C(=O)OEt | Me |
| B-2565 | 2 | Me | $CH_2CH(Me)$ | Me | $CH_2CF_3$ | C(=O)OEt | Me |
| B-2566 | 2 | H | $CH(Me)CH_2$ | H | $CH_2CF_3$ | C(=O)OEt | Me |
| B-2567 | 2 | H | $CH(Me)CH_2$ | Me | $CH_2CF_3$ | C(=O)OEt | Me |
| B-2568 | 2 | Me | $CH(Me)CH_2$ | H | $CH_2CF_3$ | C(=O)OEt | Me |
| B-2569 | 2 | Me | $CH(Me)CH_2$ | Me | $CH_2CF_3$ | C(=O)OEt | Me |
| B-2570 | 2 | H | $CH_2CH_2CH_2$ | Me | $CH_2CF_3$ | C(=O)OEt | Me |

TABLE 222-continued

| Compound Number | n | Y | W | Z | $R^1$ | $R^2$ | $R^3$ |
|---|---|---|---|---|---|---|---|
| B-2571 | 2 | Me | $CH_2CH_2CH_2$ | H | $CH_2CF_3$ | C(=O)OEt | Me |
| B-2572 | 2 | Me | $CH_2CH_2CH_2$ | Me | $CH_2CF_3$ | C(=O)OEt | Me |
| B-2573 | 2 | H | $CH_2CH_2CH(Me)$ | H | $CH_2CF_3$ | C(=O)OEt | Me |
| B-2574 | 2 | H | $CH_2CH_2CH(Me)$ | Me | $CH_2CF_3$ | C(=O)OEt | Me |
| B-2575 | 2 | Me | $CH_2CH_2CH(Me)$ | H | $CH_2CF_3$ | C(=O)OEt | Me |
| B-2576 | 2 | Me | $CH_2CH_2CH(Me)$ | Me | $CH_2CF_3$ | C(=O)OEt | Me |
| B-2577 | 2 | H | $CH_2CH(Me)CH_2$ | H | $CH_2CF_3$ | C(=O)OEt | Me |
| B-2578 | 2 | H | $CH_2CH(Me)CH_2$ | Me | $CH_2CF_3$ | C(=O)OEt | Me |
| B-2579 | 2 | Me | $CH_2CH(Me)CH_2$ | H | $CH_2CF_3$ | C(=O)OEt | Me |
| B-2580 | 2 | Me | $CH_2CH(Me)CH_2$ | Me | $CH_2CF_3$ | C(=O)OEt | Me |
| B-2581 | 2 | H | $CH(Me)CH_2CH_2$ | H | $CH_2CF_3$ | C(=O)OEt | Me |
| B-2582 | 2 | H | $CH(Me)CH_2CH_2$ | Me | $CH_2CF_3$ | C(=O)OEt | Me |
| B-2583 | 2 | Me | $CH(Me)CH_2CH_2$ | H | $CH_2CF_3$ | C(=O)OEt | Me |
| B-2584 | 2 | Me | $CH(Me)CH_2CH_2$ | Me | $CH_2CF_3$ | C(=O)OEt | Me |
| B-2585 | 2 | H | single bond | Me | $CH_2CF_3$ | $S(=O)_2Me$ | Cl |
| B-2586 | 2 | H | single bond | Et | $CH_2CF_3$ | $S(=O)_2Me$ | Cl |
| B-2587 | 2 | Me | single bond | H | $CH_2CF_3$ | $S(=O)_2Me$ | Cl |
| B-2588 | 2 | Et | single bond | H | $CH_2CF_3$ | $S(=O)_2Me$ | Cl |
| B-2589 | 2 | Me | single bond | Me | $CH_2CF_3$ | $S(=O)_2Me$ | Cl |
| B-2590 | 2 | H | $CH_2$ | Me | $CH_2CF_3$ | $S(=O)_2Me$ | Cl |

TABLE 223

| Compound Number | n | Y | W | Z | $R^1$ | $R^2$ | $R^3$ |
|---|---|---|---|---|---|---|---|
| B-2591 | 2 | Me | $CH_2$ | H | $CH_2CF_3$ | $S(=O)_2Me$ | Cl |
| B-2592 | 2 | Me | $CH_2$ | Me | $CH_2CF_3$ | $S(=O)_2Me$ | Cl |
| B-2593 | 2 | H | CH(Me) | H | $CH_2CF_3$ | $S(=O)_2Me$ | Cl |
| B-2594 | 2 | H | CH(Me) | Me | $CH_2CF_3$ | $S(=O)_2Me$ | Cl |
| B-2595 | 2 | Me | CH(Me) | H | $CH_2CF_3$ | $S(=O)_2Me$ | Cl |
| B-2596 | 2 | Me | CH(Me) | Me | $CH_2CF_3$ | $S(=O)_2Me$ | Cl |
| B-2597 | 2 | H | $CH_2CH_2$ | Me | $CH_2CF_3$ | $S(=O)_2Me$ | Cl |
| B-2598 | 2 | Me | $CH_2CH_2$ | H | $CH_2CF_3$ | $S(=O)_2Me$ | Cl |
| B-2599 | 2 | Me | $CH_2CH_2$ | Me | $CH_2CF_3$ | $S(=O)_2Me$ | Cl |
| B-2600 | 2 | H | $CH_2CH(Me)$ | H | $CH_2CF_3$ | $S(=O)_2Me$ | Cl |
| B-2601 | 2 | H | $CH_2CH(Me)$ | Me | $CH_2CF_3$ | $S(=O)_2Me$ | Cl |
| B-2602 | 2 | Me | $CH_2CH(Me)$ | H | $CH_2CF_3$ | $S(=O)_2Me$ | Cl |
| B-2603 | 2 | Me | $CH_2CH(Me)$ | Me | $CH_2CF_3$ | $S(=O)_2Me$ | Cl |
| B-2604 | 2 | H | $CH(Me)CH_2$ | H | $CH_2CF_3$ | $S(=O)_2Me$ | Cl |
| B-2605 | 2 | H | $CH(Me)CH_2$ | Me | $CH_2CF_3$ | $S(=O)_2Me$ | Cl |
| B-2606 | 2 | Me | $CH(Me)CH_2$ | H | $CH_2CF_3$ | $S(=O)_2Me$ | Cl |
| B-2607 | 2 | Me | $CH(Me)CH_2$ | Me | $CH_2CF_3$ | $S(=O)_2Me$ | Cl |
| B-2608 | 2 | H | $CH_2CH_2CH_2$ | Me | $CH_2CF_3$ | $S(=O)_2Me$ | Cl |
| B-2609 | 2 | Me | $CH_2CH_2CH_2$ | H | $CH_2CF_3$ | $S(=O)_2Me$ | Cl |
| B-2610 | 2 | Me | $CH_2CH_2CH_2$ | Me | $CH_2CF_3$ | $S(=O)_2Me$ | Cl |
| B-2611 | 2 | H | $CH_2CH_2CH(Me)$ | H | $CH_2CF_3$ | $S(=O)_2Me$ | Cl |
| B-2612 | 2 | H | $CH_2CH_2CH(Me)$ | Me | $CH_2CF_3$ | $S(=O)_2Me$ | Cl |
| B-2613 | 2 | Me | $CH_2CH_2CH(Me)$ | H | $CH_2CF_3$ | $S(=O)_2Me$ | Cl |
| B-2614 | 2 | Me | $CH_2CH_2CH(Me)$ | Me | $CH_2CF_3$ | $S(=O)_2Me$ | Cl |
| B-2615 | 2 | H | $CH_2CH(Me)CH_2$ | H | $CH_2CF_3$ | $S(=O)_2Me$ | Cl |
| B-2616 | 2 | H | $CH_2CH(Me)CH_2$ | Me | $CH_2CF_3$ | $S(=O)_2Me$ | Cl |
| B-2617 | 2 | Me | $CH_2CH(Me)CH_2$ | H | $CH_2CF_3$ | $S(=O)_2Me$ | Cl |
| B-2618 | 2 | Me | $CH_2CH(Me)CH_2$ | Me | $CH_2CF_3$ | $S(=O)_2Me$ | Cl |
| B-2619 | 2 | H | $CH(Me)CH_2CH_2$ | H | $CH_2CF_3$ | $S(=O)_2Me$ | Cl |
| B-2620 | 2 | H | $CH(Me)CH_2CH_2$ | Me | $CH_2CF_3$ | $S(=O)_2Me$ | Cl |
| B-2621 | 2 | Me | $CH(Me)CH_2CH_2$ | H | $CH_2CF_3$ | $S(=O)_2Me$ | Cl |
| B-2622 | 2 | Me | $CH(Me)CH_2CH_2$ | Me | $CH_2CF_3$ | $S(=O)_2Me$ | Cl |
| B-2623 | 2 | H | single bond | Me | $CH_2CF_3$ | $S(=O)_2Me$ | Me |
| B-2624 | 2 | H | single bond | Et | $CH_2CF_3$ | $S(=O)_2Me$ | Me |
| B-2625 | 2 | Me | single bond | H | $CH_2CF_3$ | $S(=O)_2Me$ | Me |
| B-2626 | 2 | Et | single bond | H | $CH_2CF_3$ | $S(=O)_2Me$ | Me |
| B-2627 | 2 | Me | single bond | Me | $CH_2CF_3$ | $S(=O)_2Me$ | Me |
| B-2628 | 2 | H | $CH_2$ | Me | $CH_2CF_3$ | $S(=O)_2Me$ | Me |
| B-2629 | 2 | Me | $CH_2$ | H | $CH_2CF_3$ | $S(=O)_2Me$ | Me |
| B-2630 | 2 | Me | $CH_2$ | Me | $CH_2CF_3$ | $S(=O)_2Me$ | Me |
| B-2631 | 2 | H | CH(Me) | H | $CH_2CF_3$ | $S(=O)_2Me$ | Me |
| B-2632 | 2 | H | CH(Me) | Me | $CH_2CF_3$ | $S(=O)_2Me$ | Me |
| B-2633 | 2 | Me | CH(Me) | H | $CH_2CF_3$ | $S(=O)_2Me$ | Me |
| B-2634 | 2 | Me | CH(Me) | Me | $CH_2CF_3$ | $S(=O)_2Me$ | Me |

TABLE 224

| Compound Number | n | Y | W | Z | $R^1$ | $R^2$ | $R^3$ |
|---|---|---|---|---|---|---|---|
| B-2635 | 2 | H | $CH_2CH_2$ | Me | $CH_2CF_3$ | $S(=O)_2Me$ | Me |
| B-2636 | 2 | Me | $CH_2CH_2$ | H | $CH_2CF_3$ | $S(=O)_2Me$ | Me |
| B-2637 | 2 | Me | $CH_2CH_2$ | Me | $CH_2CF_3$ | $S(=O)_2Me$ | Me |
| B-2638 | 2 | H | $CH_2CH(Me)$ | H | $CH_2CF_3$ | $S(=O)_2Me$ | Me |
| B-2639 | 2 | H | $CH_2CH(Me)$ | Me | $CH_2CF_3$ | $S(=O)_2Me$ | Me |
| B-2640 | 2 | Me | $CH_2CH(Me)$ | H | $CH_2CF_3$ | $S(=O)_2Me$ | Me |
| B-2641 | 2 | Me | $CH_2CH(Me)$ | Me | $CH_2CF_3$ | $S(=O)_2Me$ | Me |
| B-2642 | 2 | H | $CH(Me)CH_2$ | H | $CH_2CF_3$ | $S(=O)_2Me$ | Me |
| B-2643 | 2 | H | $CH(Me)CH_2$ | Me | $CH_2CF_3$ | $S(=O)_2Me$ | Me |
| B-2644 | 2 | Me | $CH(Me)CH_2$ | H | $CH_2CF_3$ | $S(=O)_2Me$ | Me |
| B-2645 | 2 | Me | $CH(Me)CH_2$ | Me | $CH_2CF_3$ | $S(=O)_2Me$ | Me |
| B-2646 | 2 | H | $CH_2CH_2CH_2$ | Me | $CH_2CF_3$ | $S(=O)_2Me$ | Me |
| B-2647 | 2 | Me | $CH_2CH_2CH_2$ | H | $CH_2CF_3$ | $S(=O)_2Me$ | Me |
| B-2648 | 2 | Me | $CH_2CH_2CH_2$ | Me | $CH_2CF_3$ | $S(=O)_2Me$ | Me |
| B-2649 | 2 | H | $CH_2CH_2CH(Me)$ | H | $CH_2CF_3$ | $S(=O)_2Me$ | Me |
| B-2650 | 2 | H | $CH_2CH_2CH(Me)$ | Me | $CH_2CF_3$ | $S(=O)_2Me$ | Me |
| B-2651 | 2 | Me | $CH_2CH_2CH(Me)$ | H | $CH_2CF_3$ | $S(=O)_2Me$ | Me |
| B-2652 | 2 | Me | $CH_2CH_2CH(Me)$ | Me | $CH_2CF_3$ | $S(=O)_2Me$ | Me |
| B-2653 | 2 | H | $CH_2CH(Me)CH_2$ | H | $CH_2CF_3$ | $S(=O)_2Me$ | Me |
| B-2654 | 2 | H | $CH_2CH(Me)CH_2$ | Me | $CH_2CF_3$ | $S(=O)_2Me$ | Me |
| B-2655 | 2 | Me | $CH_2CH(Me)CH_2$ | H | $CH_2CF_3$ | $S(=O)_2Me$ | Me |
| B-2656 | 2 | Me | $CH_2CH(Me)CH_2$ | Me | $CH_2CF_3$ | $S(=O)_2Me$ | Me |
| B-2657 | 2 | H | $CH(Me)CH_2CH_2$ | H | $CH_2CF_3$ | $S(=O)_2Me$ | Me |
| B-2658 | 2 | H | $CH(Me)CH_2CH_2$ | Me | $CH_2CF_3$ | $S(=O)_2Me$ | Me |
| B-2659 | 2 | Me | $CH(Me)CH_2CH_2$ | H | $CH_2CF_3$ | $S(=O)_2Me$ | Me |
| B-2660 | 2 | Me | $CH(Me)CH_2CH_2$ | Me | $CH_2CF_3$ | $S(=O)_2Me$ | Me |
| B-2661 | 2 | H | single bond | Me | $CH_2CF_3$ | $S(=O)_2CF_3$ | Cl |
| B-2662 | 2 | H | single bond | Et | $CH_2CF_3$ | $S(=O)_2CF_3$ | Cl |
| B-2663 | 2 | Me | single bond | H | $CH_2CF_3$ | $S(=O)_2CF_3$ | Cl |
| B-2664 | 2 | Et | single bond | H | $CH_2CF_3$ | $S(=O)_2CF_3$ | Cl |
| B-2665 | 2 | Me | single bond | Me | $CH_2CF_3$ | $S(=O)_2CF_3$ | Cl |
| B-2666 | 2 | H | $CH_2$ | Me | $CH_2CF_3$ | $S(=O)_2CF_3$ | Cl |
| B-2667 | 2 | Me | $CH_2$ | H | $CH_2CF_3$ | $S(=O)_2CF_3$ | Cl |
| B-2668 | 2 | Me | $CH_2$ | Me | $CH_2CF_3$ | $S(=O)_2CF_3$ | Cl |
| B-2669 | 2 | H | CH(Me) | H | $CH_2CF_3$ | $S(=O)_2CF_3$ | Cl |
| B-2670 | 2 | H | CH(Me) | Me | $CH_2CF_3$ | $S(=O)_2CF_3$ | Cl |
| B-2671 | 2 | Me | CH(Me) | H | $CH_2CF_3$ | $S(=O)_2CF_3$ | Cl |
| B-2672 | 2 | Me | CH(Me) | Me | $CH_2CF_3$ | $S(=O)_2CF_3$ | Cl |
| B-2673 | 2 | H | $CH_2CH_2$ | Me | $CH_2CF_3$ | $S(=O)_2CF_3$ | Cl |
| B-2674 | 2 | Me | $CH_2CH_2$ | H | $CH_2CF_3$ | $S(=O)_2CF_3$ | Cl |
| B-2675 | 2 | Me | $CH_2CH_2$ | Me | $CH_2CF_3$ | $S(=O)_2CF_3$ | Cl |
| B-2676 | 2 | H | $CH_2CH(Me)$ | H | $CH_2CF_3$ | $S(=O)_2CF_3$ | Cl |
| B-2677 | 2 | H | $CH_2CH(Me)$ | Me | $CH_2CF_3$ | $S(=O)_2CF_3$ | Cl |
| B-2678 | 2 | Me | $CH_2CH(Me)$ | H | $CH_2CF_3$ | $S(=O)_2CF_3$ | Cl |

TABLE 225

| Compound Number | n | Y | W | Z | $R^1$ | $R^2$ | $R^3$ |
|---|---|---|---|---|---|---|---|
| B-2679 | 2 | Me | $CH_2CH(Me)$ | Me | $CH_2CF_3$ | $S(=O)_2CF_3$ | Cl |
| B-2680 | 2 | H | $CH(Me)CH_2$ | H | $CH_2CF_3$ | $S(=O)_2CF_3$ | Cl |
| B-2681 | 2 | H | $CH(Me)CH_2$ | Me | $CH_2CF_3$ | $S(=O)_2CF_3$ | Cl |
| B-2682 | 2 | Me | $CH(Me)CH_2$ | H | $CH_2CF_3$ | $S(=O)_2CF_3$ | Cl |
| B-2683 | 2 | Me | $CH(Me)CH_2$ | Me | $CH_2CF_3$ | $S(=O)_2CF_3$ | Cl |
| B-2684 | 2 | H | $CH_2CH_2CH_2$ | Me | $CH_2CF_3$ | $S(=O)_2CF_3$ | Cl |
| B-2685 | 2 | Me | $CH_2CH_2CH_2$ | H | $CH_2CF_3$ | $S(=O)_2CF_3$ | Cl |
| B-2686 | 2 | Me | $CH_2CH_2CH_2$ | Me | $CH_2CF_3$ | $S(=O)_2CF_3$ | Cl |
| B-2687 | 2 | H | $CH_2CH_2CH(Me)$ | H | $CH_2CF_3$ | $S(=O)_2CF_3$ | Cl |
| B-2688 | 2 | H | $CH_2CH_2CH(Me)$ | Me | $CH_2CF_3$ | $S(=O)_2CF_3$ | Cl |
| B-2689 | 2 | Me | $CH_2CH_2CH(Me)$ | H | $CH_2CF_3$ | $S(=O)_2CF_3$ | Cl |
| B-2690 | 2 | Me | $CH_2CH_2CH(Me)$ | Me | $CH_2CF_3$ | $S(=O)_2CF_3$ | Cl |
| B-2691 | 2 | H | $CH_2CH(Me)CH_2$ | H | $CH_2CF_3$ | $S(=O)_2CF_3$ | Cl |
| B-2692 | 2 | H | $CH_2CH(Me)CH_2$ | Me | $CH_2CF_3$ | $S(=O)_2CF_3$ | Cl |
| B-2693 | 2 | Me | $CH_2CH(Me)CH_2$ | H | $CH_2CF_3$ | $S(=O)_2CF_3$ | Cl |
| B-2694 | 2 | Me | $CH_2CH(Me)CH_2$ | Me | $CH_2CF_3$ | $S(=O)_2CF_3$ | Cl |
| B-2695 | 2 | H | $CH(Me)CH_2CH_2$ | H | $CH_2CF_3$ | $S(=O)_2CF_3$ | Cl |
| B-2696 | 2 | H | $CH(Me)CH_2CH_2$ | Me | $CH_2CF_3$ | $S(=O)_2CF_3$ | Cl |
| B-2697 | 2 | Me | $CH(Me)CH_2CH_2$ | H | $CH_2CF_3$ | $S(=O)_2CF_3$ | Cl |
| B-2698 | 2 | Me | $CH(Me)CH_2CH_2$ | Me | $CH_2CF_3$ | $S(=O)_2CF_3$ | Cl |
| B-2699 | 2 | H | single bond | Me | $CH_2CF_3$ | $S(=O)_2CF_3$ | Me |
| B-2700 | 2 | H | single bond | Et | $CH_2CF_3$ | $S(=O)_2CF_3$ | Me |
| B-2701 | 2 | Me | single bond | H | $CH_2CF_3$ | $S(=O)_2CF_3$ | Me |
| B-2702 | 2 | Et | single bond | H | $CH_2CF_3$ | $S(=O)_2CF_3$ | Me |

TABLE 225-continued

| Compound Number | n | Y | W | Z | $R^1$ | $R^2$ | $R^3$ |
|---|---|---|---|---|---|---|---|
| B-2703 | 2 | Me | single bond | Me | $CH_2CF_3$ | $S(=O)_2CF_3Me$ | |
| B-2704 | 2 | H | $CH_2$ | Me | $CH_2CF_3$ | $S(=O)_2CF_3Me$ | |
| B-2705 | 2 | Me | $CH_2$ | H | $CH_2CF_3$ | $S(=O)_2CF_3Me$ | |
| B-2706 | 2 | Me | $CH_2$ | Me | $CH_2CF_3$ | $S(=O)_2CF_3Me$ | |
| B-2707 | 2 | H | CH(Me) | H | $CH_2CF_3$ | $S(=O)_2CF_3Me$ | |
| B-2708 | 2 | H | CH(Me) | Me | $CH_2CF_3$ | $S(=O)_2CF_3Me$ | |
| B-2709 | 2 | Me | CH(Me) | H | $CH_2CF_3$ | $S(=O)_2CF_3Me$ | |
| B-2710 | 2 | Me | CH(Me) | Me | $CH_2CF_3$ | $S(=O)_2CF_3Me$ | |
| B-2711 | 2 | H | $CH_2CH_2$ | Me | $CH_2CF_3$ | $S(=O)_2CF_3Me$ | |
| B-2712 | 2 | Me | $CH_2CH_2$ | H | $CH_2CF_3$ | $S(=O)_2CF_3Me$ | |
| B-2713 | 2 | Me | $CH_2CH_2$ | Me | $CH_2CF_3$ | $S(=O)_2CF_3Me$ | |
| B-2714 | 2 | H | $CH_2CH(Me)$ | H | $CH_2CF_3$ | $S(=O)_2CF_3Me$ | |
| B-2715 | 2 | H | $CH_2CH(Me)$ | Me | $CH_2CF_3$ | $S(=O)_2CF_3Me$ | |
| B-2716 | 2 | Me | $CH_2CH(Me)$ | H | $CH_2CF_3$ | $S(=O)_2CF_3Me$ | |
| B-2717 | 2 | Me | $CH_2CH(Me)$ | Me | $CH_2CF_3$ | $S(=O)_2CF_3Me$ | |
| B-2718 | 2 | H | $CH(Me)CH_2$ | H | $CH_2CF_3$ | $S(=O)_2CF_3Me$ | |
| B-2719 | 2 | H | $CH(Me)CH_2$ | Me | $CH_2CF_3$ | $S(=O)_2CF_3Me$ | |
| B-2720 | 2 | Me | $CH(Me)CH_2$ | H | $CH_2CF_3$ | $S(=O)_2CF_3Me$ | |
| B-2721 | 2 | Me | $CH(Me)CH_2$ | Me | $CH_2CF_3$ | $S(=O)_2CF_3Me$ | |
| B-2722 | 2 | H | $CH_2CH_2CH_2$ | Me | $CH_2CF_3$ | $S(=O)_2CF_3Me$ | |

TABLE 226

| Compound Number | n | Y | W | Z | $R^1$ | $R^2$ | $R^3$ |
|---|---|---|---|---|---|---|---|
| B-2723 | 2 | Me | $CH_2CH_2CH_2$ | H | $CH_2CF_3$ | $S(=O)_2CF_3Me$ | |
| B-2724 | 2 | Me | $CH_2CH_2CH_2$ | Me | $CH_2CF_3$ | $S(=O)_2CF_3Me$ | |
| B-2725 | 2 | H | $CH_2CH_2CH(Me)$ | H | $CH_2CF_3$ | $S(=O)_2CF_3Me$ | |
| B-2726 | 2 | H | $CH_2CH_2CH(Me)$ | Me | $CH_2CF_3$ | $S(=O)_2CF_3Me$ | |
| B-2727 | 2 | Me | $CH_2CH_2CH(Me)$ | H | $CH_2CF_3$ | $S(=O)_2CF_3Me$ | |
| B-2728 | 2 | Me | $CH_2CH_2CH(Me)$ | Me | $CH_2CF_3$ | $S(=O)_2CF_3Me$ | |
| B-2729 | 2 | H | $CH_2CH(Me)CH_2$ | H | $CH_2CF_3$ | $S(=O)_2CF_3Me$ | |
| B-2730 | 2 | H | $CH_2CH(Me)CH_2$ | Me | $CH_2CF_3$ | $S(=O)_2CF_3Me$ | |
| B-2731 | 2 | Me | $CH_2CH(Me)CH_2$ | H | $CH_2CF_3$ | $S(=O)_2CF_3Me$ | |
| B-2732 | 2 | Me | $CH_2CH(Me)CH_2$ | Me | $CH_2CF_3$ | $S(=O)_2CF_3Me$ | |
| B-2733 | 2 | H | $CH(Me)CH_2CH_2$ | H | $CH_2CF_3$ | $S(=O)_2CF_3Me$ | |
| B-2734 | 2 | H | $CH(Me)CH_2CH_2$ | Me | $CH_2CF_3$ | $S(=O)_2CF_3Me$ | |
| B-2735 | 2 | Me | $CH(Me)CH_2CH_2$ | H | $CH_2CF_3$ | $S(=O)_2CF_3Me$ | |
| B-2736 | 2 | Me | $CH(Me)CH_2CH_2$ | Me | $CH_2CF_3$ | $S(=O)_2CF_3Me$ | |

TABLE 227

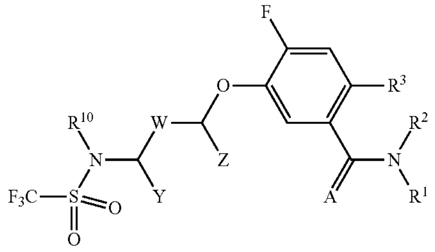

| Compound Number | Y | W | Z | $R^1$ | $R^2$ | $R^3$ | $R^{10}$ | A |
|---|---|---|---|---|---|---|---|---|
| C-0001 | H | single bond | Me | $CH_2CF_3$ | H | Cl | H | O |
| C-0002 | H | single bond | Et | $CH_2CF_3$ | H | Cl | H | O |
| C-0003 | H | single bond | i-Pr | $CH_2CF_3$ | H | Cl | H | O |
| C-0004 | Me | single bond | H | $CH_2CF_3$ | H | Cl | H | O |
| C-0005 | Me(R) | single bond | H | $CH_2CF_3$ | H | Cl | H | O |
| C-0006 | Me(S) | single bond | H | $CH_2CF_3$ | H | Cl | H | O |
| C-0007 | Me | single bond | H | $CH_2CF_3$ | H | Cl | H | S |
| C-0008 | Me(R) | single bond | H | $CH_2CF_3$ | H | Cl | H | S |
| C-0009 | Me(S) | single bond | H | $CH_2CF_3$ | H | Cl | H | S |
| C-0010 | Et | single bond | H | $CH_2CF_3$ | H | Cl | H | O |
| C-0011 | i-Pr | single bond | H | $CH_2CF_3$ | H | Cl | H | O |
| C-0012 | CF3 | single bond | H | $CH_2CF_3$ | H | Cl | H | O |
| C-0013 | Me | single bond | Me | $CH_2CF_3$ | H | Cl | H | O |
| C-0014 | H | $CH_2$ | Me | $CH_2CF_3$ | H | Cl | H | O |

TABLE 227-continued

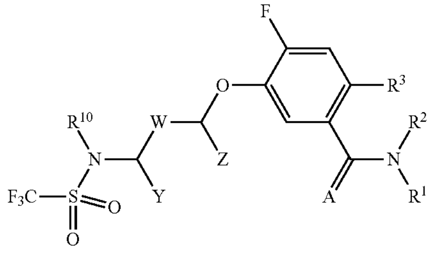

| Compound Number | Y | W | Z | $R^1$ | $R^2$ | $R^3$ | $R^{10}$ | A |
|---|---|---|---|---|---|---|---|---|
| C-0015 | Me | $CH_2$ | H | $CH_2CF_3$ | H | Cl | H | O |
| C-0016 | Me | $CH_2$ | Me | $CH_2CF_3$ | H | Cl | H | O |
| C-0017 | H | CH(Me) | H | $CH_2CF_3$ | H | Cl | H | O |
| C-0018 | H | CH(Me) | Me | $CH_2CF_3$ | H | Cl | H | O |
| C-0019 | Me | CH(Me) | H | $CH_2CF_3$ | H | Cl | H | O |
| C-0020 | Me | CH(Me) | Me | $CH_2CF_3$ | H | Cl | H | O |
| C-0021 | H | $CH_2CH_2$ | Me | $CH_2CF_3$ | H | Cl | H | O |
| C-0022 | Me | $CH_2CH_2$ | H | $CH_2CF_3$ | H | Cl | H | O |
| C-0023 | Me | $CH_2CH_2$ | Me | $CH_2CF_3$ | H | Cl | H | O |
| C-0024 | H | $CH_2CH(Me)$ | H | $CH_2CF_3$ | H | Cl | H | O |
| C-0025 | H | $CH_2CH(Me)$ | Me | $CH_2CF_3$ | H | Cl | H | O |
| C-0026 | Me | $CH_2CH(Me)$ | H | $CH_2CF_3$ | H | Cl | H | O |
| C-0027 | Me | $CH_2CH(Me)$ | Me | $CH_2CF_3$ | H | Cl | H | O |
| C-0028 | H | $CH(Me)CH_2$ | H | $CH_2CF_3$ | H | Cl | H | O |
| C-0029 | H | $CH(Me)CH_2$ | Me | $CH_2CF_3$ | H | Cl | H | O |
| C-0030 | Me | $CH(Me)CH_2$ | H | $CH_2CF_3$ | H | Cl | H | O |
| C-0031 | Me | $CH(Me)CH_2$ | Me | $CH_2CF_3$ | H | Cl | H | O |
| C-0032 | H | single bond | Me | $CH_2CF_3$ | H | Me | H | O |
| C-0033 | H | single bond | Et | $CH_2CF_3$ | H | Me | H | O |
| C-0034 | H | single bond | i-Pr | $CH_2CF_3$ | H | Me | H | O |
| C-0035 | Me | single bond | H | $CH_2CF_3$ | H | Me | H | O |
| C-0036 | Me(R) | single bond | H | $CH_2CF_3$ | H | Me | H | O |
| C-0037 | Me(S) | single bond | H | $CH_2CF_3$ | H | Me | H | O |
| C-0038 | Me | single bond | H | $CH_2CF_3$ | H | Me | H | S |

TABLE 228

| Compound Number | n | Y | W | Z | $R^1$ | $R^2$ | $R^3$ | A |
|---|---|---|---|---|---|---|---|---|
| C-0039 | Me(R) | single bond | H | $CH_2CF_3$ | H | Me | H | S |
| C-0040 | Me(S) | single bond | H | $CH_2CF_3$ | H | Me | H | S |
| C-0041 | Et | single bond | H | $CH_2CF_3$ | H | Me | H | O |
| C-0042 | i-Pr | single bond | H | $CH_2CF_3$ | H | Me | H | O |
| C-0043 | $CF_3$ | single bond | H | $CH_2CF_3$ | H | Me | H | O |
| C-0044 | Me | single bond | Me | $CH_2CF_3$ | H | Me | H | O |
| C-0045 | H | $CH_2$ | Me | $CH_2CF_3$ | H | Me | H | O |
| C-0046 | Me | $CH_2$ | H | $CH_2CF_3$ | H | Me | H | O |
| C-0047 | Me | $CH_2$ | Me | $CH_2CF_3$ | H | Me | H | O |
| C-0048 | H | CH(Me) | H | $CH_2CF_3$ | H | Me | H | O |
| C-0049 | H | CH(Me) | Me | $CH_2CF_3$ | H | Me | H | O |
| C-0050 | Me | CH(Me) | H | $CH_2CF_3$ | H | Me | H | O |
| C-0051 | Me | CH(Me) | Me | $CH_2CF_3$ | H | Me | H | O |
| C-0052 | H | $CH_2CH_2$ | Me | $CH_2CF_3$ | H | Me | H | O |
| C-0053 | Me | $CH_2CH_2$ | H | $CH_2CF_3$ | H | Me | H | O |
| C-0054 | Me | $CH_2CH_2$ | Me | $CH_2CF_3$ | H | Me | H | O |
| C-0055 | H | $CH_2CH(Me)$ | H | $CH_2CF_3$ | H | Me | H | O |
| C-0056 | H | $CH_2CH(Me)$ | Me | $CH_2CF_3$ | H | Me | H | O |
| C-0057 | Me | $CH_2CH(Me)$ | H | $CH_2CF_3$ | H | Me | H | O |
| C-0058 | Me | $CH_2CH(Me)$ | Me | $CH_2CF_3$ | H | Me | H | O |
| C-0059 | H | $CH(Me)CH_2$ | H | $CH_2CF_3$ | H | Me | H | O |
| C-0060 | H | $CH(Me)CH_2$ | Me | $CH_2CF_3$ | H | Me | H | O |
| C-0061 | Me | $CH(Me)CH_2$ | H | $CH_2CF_3$ | H | Me | H | O |
| C-0062 | Me | $CH(Me)CH_2$ | Me | $CH_2CF_3$ | H | Me | H | O |
| C-0063 | H | single bond | Me | Et | H | Cl | H | O |
| C-0064 | H | single bond | Et | Et | H | Cl | H | O |
| C-0065 | H | single bond | i-Pr | Et | H | Cl | H | O |
| C-0066 | Me | single bond | H | Et | H | Cl | H | O |
| C-0067 | Me(R) | single bond | H | Et | H | Cl | H | O |
| C-0068 | Me(S) | single bond | H | Et | H | Cl | H | O |
| C-0069 | Me | single bond | H | Et | H | Cl | H | S |
| C-0070 | Me(R) | single bond | H | Et | H | Cl | H | S |

TABLE 228-continued

| Compound Number | n | Y | W | Z | $R^1$ | $R^2$ | $R^3$ | A |
|---|---|---|---|---|---|---|---|---|
| C-0071 | Me(S) | single bond | H | Et | H | Cl | H | S |
| C-0072 | Et | single bond | H | Et | H | Cl | H | O |
| C-0073 | i-Pr | single bond | H | Et | H | Cl | H | O |
| C-0074 | $CF_3$ | single bond | H | Et | H | Cl | H | O |
| C-0075 | Me | single bond | Me | Et | H | Cl | H | O |
| C-0076 | H | $CH_2$ | Me | Et | H | Cl | H | O |
| C-0077 | Me | $CH_2$ | H | Et | H | Cl | H | O |
| C-0078 | Me | $CH_2$ | Me | Et | H | Cl | H | O |
| C-0079 | H | CH(Me) | H | Et | H | Cl | H | O |
| C-0080 | H | CH(Me) | Me | Et | H | Cl | H | O |
| C-0081 | Me | CH(Me) | H | Et | H | Cl | H | O |
| C-0082 | Me | CH(Me) | Me | Et | H | Cl | H | O |

TABLE 229

| Compound Number | n | Y | W | Z | $R^1$ | $R^2$ | $R^3$ | A |
|---|---|---|---|---|---|---|---|---|
| C-0083 | H | $CH_2CH_2$ | Me | Et | H | Cl | H | O |
| C-0084 | Me | $CH_2CH_2$ | H | Et | H | Cl | H | O |
| C-0085 | Me | $CH_2CH_2$ | Me | Et | H | Cl | H | O |
| C-0086 | H | $CH_2CH(Me)$ | H | Et | H | Cl | H | O |
| C-0087 | H | $CH_2CH(Me)$ | Me | Et | H | Cl | H | O |
| C-0088 | Me | $CH_2CH(Me)$ | H | Et | H | Cl | H | O |
| C-0089 | Me | $CH_2CH(Me)$ | Me | Et | H | Cl | H | O |
| C-0090 | H | $CH(Me)CH_2$ | H | Et | H | Cl | H | O |
| C-0091 | H | $CH(Me)CH_2$ | Me | Et | H | Cl | H | O |
| C-0092 | Me | $CH(Me)CH_2$ | H | Et | H | Cl | H | O |
| C-0093 | Me | $CH(Me)CH_2$ | Me | Et | H | Cl | H | O |
| C-0094 | H | single bond | Me | Et | H | Me | H | O |
| C-0095 | H | single bond | Et | Et | H | Me | H | O |
| C-0096 | H | single bond | i-Pr | Et | H | Me | H | O |
| C-0097 | Me | single bond | H | Et | H | Me | H | O |
| C-0098 | Me(R) | single bond | H | Et | H | Me | H | O |
| C-0099 | Me(S) | single bond | H | Et | H | Me | H | O |
| C-0100 | Me | single bond | H | Et | H | Me | H | S |
| C-0101 | Me(R) | single bond | H | Et | H | Me | H | S |
| C-0102 | Me(S) | single bond | H | Et | H | Me | H | S |
| C-0103 | Et | single bond | H | Et | H | Me | H | O |
| C-0104 | i-Pr | single bond | H | Et | H | Me | H | O |
| C-0105 | $CF_3$ | single bond | H | Et | H | Me | H | O |
| C-0106 | Me | single bond | Me | Et | H | Me | H | O |
| C-0107 | H | $CH_2$ | Me | Et | H | Me | H | O |
| C-0108 | Me | $CH_2$ | H | Et | H | Me | H | O |
| C-0109 | Me | $CH_2$ | Me | Et | H | Me | H | O |
| C-0110 | H | CH(Me) | H | Et | H | Me | H | O |
| C-0111 | H | CH(Me) | Me | Et | H | Me | H | O |
| C-0112 | Me | CH(Me) | H | Et | H | Me | H | O |
| C-0113 | Me | CH(Me) | Me | Et | H | Me | H | O |
| C-0114 | H | $CH_2CH_2$ | Me | Et | H | Me | H | O |
| C-0115 | Me | $CH_2CH_2$ | H | Et | H | Me | H | O |
| C-0116 | Me | $CH_2CH_2$ | Me | Et | H | Me | H | O |
| C-0117 | H | $CH_2CH(Me)$ | H | Et | H | Me | H | O |
| C-0118 | H | $CH_2CH(Me)$ | Me | Et | H | Me | H | O |
| C-0119 | Me | $CH_2CH(Me)$ | H | Et | H | Me | H | O |
| C-0120 | Me | $CH_2CH(Me)$ | Me | Et | H | Me | H | O |
| C-0121 | H | $CH(Me)CH_2$ | H | Et | H | Me | H | O |
| C-0122 | H | $CH(Me)CH_2$ | Me | Et | H | Me | H | O |
| C-0123 | Me | $CH(Me)CH_2$ | H | Et | H | Me | H | O |
| C-0124 | Me | $CH(Me)CH_2$ | Me | Et | H | Me | H | O |
| C-0125 | H | single bond | Me | c-Pr | H | Cl | H | O |
| C-0126 | H | single bond | Et | c-Pr | H | Cl | H | O |

TABLE 230

| Compound Number | n | Y | W | Z | $R^1$ | $R^2$ | $R^3$ | A |
|---|---|---|---|---|---|---|---|---|
| C-0127 | H | single bond | i-Pr | c-Pr | H | Cl | H | O |
| C-0128 | Me | single bond | H | c-Pr | H | Cl | H | O |
| C-0129 | Me(R) | single bond | H | c-Pr | H | Cl | H | O |
| C-0130 | Me(S) | single bond | H | c-Pr | H | Cl | H | O |

TABLE 230-continued

| Compound Number | n | Y | W | Z | $R^1$ | $R^2$ | $R^3$ | A |
|---|---|---|---|---|---|---|---|---|
| C-0131 | Me | single bond | H | c-Pr | H | Cl | H | S |
| C-0132 | Me(R) | single bond | H | c-Pr | H | Cl | H | S |
| C-0133 | Me(S) | single bond | H | c-Pr | H | Cl | H | S |
| C-0134 | Et | single bond | H | c-Pr | H | Cl | H | O |
| C-0135 | i-Pr | single bond | H | c-Pr | H | Cl | H | O |
| C-0136 | $CF_3$ | single bond | H | c-Pr | H | Cl | H | O |
| C-0137 | Me | single bond | Me | c-Pr | H | Cl | H | O |
| C-0138 | H | $CH_2$ | Me | c-Pr | H | Cl | H | O |
| C-0139 | Me | $CH_2$ | H | c-Pr | H | Cl | H | O |
| C-0140 | Me | $CH_2$ | Me | c-Pr | H | Cl | H | O |
| C-0141 | H | CH(Me) | H | c-Pr | H | Cl | H | O |
| C-0142 | H | CH(Me) | Me | c-Pr | H | Cl | H | O |
| C-0143 | Me | CH(Me) | H | c-Pr | H | Cl | H | O |
| C-0144 | Me | CH(Me) | Me | c-Pr | H | Cl | H | O |
| C-0145 | H | $CH_2CH_2$ | Me | c-Pr | H | Cl | H | O |
| C-0146 | Me | $CH_2CH_2$ | H | c-Pr | H | Cl | H | O |
| C-0147 | Me | $CH_2CH_2$ | Me | c-Pr | H | Cl | H | O |
| C-0148 | H | $CH_2CH(Me)$ | H | c-Pr | H | Cl | H | O |
| C-0149 | H | $CH_2CH(Me)$ | Me | c-Pr | H | Cl | H | O |
| C-0150 | Me | $CH_2CH(Me)$ | H | c-Pr | H | Cl | H | O |
| C-0151 | Me | $CH_2CH(Me)$ | Me | c-Pr | H | Cl | H | O |
| C-0152 | H | $CH(Me)CH_2$ | H | c-Pr | H | Cl | H | O |
| C-0153 | H | $CH(Me)CH_2$ | Me | c-Pr | H | Cl | H | O |
| C-0154 | Me | $CH(Me)CH_2$ | H | c-Pr | H | Cl | H | O |
| C-0155 | Me | $CH(Me)CH_2$ | Me | c-Pr | H | Cl | H | O |
| C-0156 | H | single bond | Me | c-Pr | H | Me | H | O |
| C-0157 | H | single bond | Et | c-Pr | H | Me | H | O |
| C-0158 | H | single bond | i-Pr | c-Pr | H | Me | H | O |
| C-0159 | Me | single bond | H | c-Pr | H | Me | H | O |
| C-0160 | Me(R) | single bond | H | c-Pr | H | Me | H | O |
| C-0161 | Me(S) | single bond | H | c-Pr | H | Me | H | O |
| C-0162 | Me | single bond | H | c-Pr | H | Me | H | S |
| C-0163 | Me(R) | single bond | H | c-Pr | H | Me | H | S |
| C-0164 | Me(S) | single bond | H | c-Pr | H | Me | H | S |
| C-0165 | Et | single bond | H | c-Pr | H | Me | H | O |
| C-0166 | i-Pr | single bond | H | c-Pr | H | Me | H | O |
| C-0167 | $CF_3$ | single bond | H | c-Pr | H | Me | H | O |
| C-0168 | Me | single bond | Me | c-Pr | H | Me | H | O |
| C-0169 | H | $CH_2$ | Me | c-Pr | H | Me | H | O |
| C-0170 | Me | $CH_2$ | H | c-Pr | H | Me | H | O |

TABLE 231

| Compound Number | Y | W | Z | $R^1$ | $R^2$ | $R^3$ | $R^{10}$ | A |
|---|---|---|---|---|---|---|---|---|
| C-0171 | Me | $CH_2$ | Me | c-Pr | H | Me | H | O |
| C-0172 | H | CH(Me) | H | c-Pr | H | Me | H | O |
| C-0173 | H | CH(Me) | Me | c-Pr | H | Me | H | O |
| C-0174 | Me | CH(Me) | H | c-Pr | H | Me | H | O |
| C-0175 | Me | CH(Me) | Me | c-Pr | H | Me | H | O |
| C-0176 | H | $CH_2CH_2$ | Me | c-Pr | H | Me | H | O |
| C-0177 | Me | $CH_2CH_2$ | H | c-Pr | H | Me | H | O |
| C-0178 | Me | $CH_2CH_2$ | Me | c-Pr | H | Me | H | O |
| C-0179 | H | $CH_2CH(Me)$ | H | c-Pr | H | Me | H | O |
| C-0180 | H | $CH_2CH(Me)$ | Me | c-Pr | H | Me | H | O |
| C-0181 | Me | $CH_2CH(Me)$ | H | c-Pr | H | Me | H | O |
| C-0182 | Me | $CH_2CH(Me)$ | Me | c-Pr | H | Me | H | O |
| C-0183 | H | $CH(Me)CH_2$ | H | c-Pr | H | Me | H | O |
| C-0184 | H | $CH(Me)CH_2$ | Me | c-Pr | H | Me | H | O |
| C-0185 | Me | $CH(Me)CH_2$ | H | c-Pr | H | Me | H | O |
| C-0186 | Me | $CH(Me)CH_2$ | Me | c-Pr | H | Me | H | O |
| C-0187 | H | single bond | Me | $CH_2CF_3$ | H | Cl | Me | O |
| C-0188 | H | single bond | Et | $CH_2CF_3$ | H | Cl | Me | O |
| C-0189 | H | single bond | i-Pr | $CH_2CF_3$ | H | Cl | Me | O |
| C-0190 | Me | single bond | H | $CH_2CF_3$ | H | Cl | Me | O |
| C-0191 | Me (R) | single bond | H | $CH_2CF_3$ | H | Cl | Me | O |
| C-0192 | Me (S) | single bond | H | $CH_2CF_3$ | H | Cl | Me | O |
| C-0193 | Me | single bond | H | $CH_2CF_3$ | H | Cl | Me | S |
| C-0194 | Me(R) | single bond | H | $CH_2CF_3$ | H | Cl | Me | S |
| C-0195 | Me(S) | single bond | H | $CH_2CF_3$ | H | Cl | Me | S |
| C-0196 | Et | single bond | H | $CH_2CF_3$ | H | Cl | Me | O |
| C-0197 | i-Pr | single bond | H | $CH_2CF_3$ | H | Cl | Me | O |
| C-0198 | $CF_3$ | single bond | H | $CH_2CF_3$ | H | Cl | Me | O |

TABLE 231-continued

| Compound Number | Y | W | Z | $R^1$ | $R^2$ | $R^3$ | $R^{10}$ | A |
|---|---|---|---|---|---|---|---|---|
| C-0199 | Me | single bond | Me | $CH_2CF_3$ | H | Cl | Me | O |
| C-0200 | H | $CH_2$ | Me | $CH_2CF_3$ | H | Cl | Me | O |
| C-0201 | Me | $CH_2$ | H | $CH_2CF_3$ | H | Cl | Me | O |
| C-0202 | Me | $CH_2$ | Me | $CH_2CF_3$ | H | Cl | Me | O |
| C-0203 | H | CH(Me) | H | $CH_2CF_3$ | H | Cl | Me | O |
| C-0204 | H | CH(Me) | Me | $CH_2CF_3$ | H | Cl | Me | O |
| C-0205 | Me | CH(Me) | H | $CH_2CF_3$ | H | Cl | Me | O |
| C-0206 | Me | CH(Me) | Me | $CH_2CF_3$ | H | Cl | Me | O |
| C-0207 | H | $CH_2CH_2$ | Me | $CH_2CF_3$ | H | Cl | Me | O |
| C-0208 | Me | $CH_2CH_2$ | H | $CH_2CF_3$ | H | Cl | Me | O |
| C-0209 | Me | $CH_2CH_2$ | Me | $CH_2CF_3$ | H | Cl | Me | O |
| C-0210 | H | $CH_2CH(Me)$ | H | $CH_2CF_3$ | H | Cl | Me | O |
| C-0211 | H | $CH_2CH(Me)$ | Me | $CH_2CF_3$ | H | Cl | Me | O |
| C-0212 | Me | $CH_2CH(Me)$ | H | $CH_2CF_3$ | H | Cl | Me | O |
| C-0213 | Me | $CH_2CH(Me)$ | Me | $CH_2CF_3$ | H | Cl | Me | O |
| C-0214 | H | $CH(Me)CH_2$ | H | $CH_2CF_3$ | H | Cl | Me | O |

TABLE 232

| Compound Number | Y | W | Z | $R^1$ | $R^2$ | $R^3$ | $R^{10}$ | A |
|---|---|---|---|---|---|---|---|---|
| C-0215 | H | $CH(Me)CH_2$ | Me | $CH_2CF_3$ | H | Cl | Me | O |
| C-0216 | Me | $CH(Me)CH_2$ | H | $CH_2CF_3$ | H | Cl | Me | O |
| C-0217 | Me | $CH(Me)CH_2$ | Me | $CH_2CF_3$ | H | Cl | Me | O |
| C-0218 | H | single bond | Me | $CH_2CF_3$ | H | Me | Me | O |
| C-0219 | H | single bond | Et | $CH_2CF_3$ | H | Me | Me | O |
| C-0220 | H | single bond | i-Pr | $CH_2CF_3$ | H | Me | Me | O |
| C-0221 | Me | single bond | H | $CH_2CF_3$ | H | Me | Me | O |
| C-0222 | Me(R) | single bond | H | $CH_2CF_3$ | H | Me | Me | O |
| C-0223 | Me(S) | single bond | H | $CH_2CF_3$ | H | Me | Me | O |
| C-0224 | Me | single bond | H | $CH_2CF_3$ | H | Me | Me | S |
| C-0225 | Me(R) | single bond | H | $CH_2CF_3$ | H | Me | Me | S |
| C-0226 | Me(S) | single bond | H | $CH_2CF_3$ | H | Me | Me | S |
| C-0227 | Et | single bond | H | $CH_2CF_3$ | H | Me | Me | O |
| C-0228 | i-Pr | single bond | H | $CH_2CF_3$ | H | Me | Me | O |
| C-0229 | $CF_3$ | single bond | H | $CH_2CF_3$ | H | Me | Me | O |
| C-0230 | Me | single bond | Me | $CH_2CF_3$ | H | Me | Me | O |
| C-0231 | H | $CH_2$ | Me | $CH_2CF_3$ | H | Me | Me | O |
| C-0232 | Me | $CH_2$ | H | $CH_2CF_3$ | H | Me | Me | O |
| C-0233 | Me | $CH_2$ | Me | $CH_2CF_3$ | H | Me | Me | O |
| C-0234 | H | CH(Me) | H | $CH_2CF_3$ | H | Me | Me | O |
| C-0235 | H | CH(Me) | Me | $CH_2CF_3$ | H | Me | Me | O |
| C-0236 | Me | CH(Me) | H | $CH_2CF_3$ | H | Me | Me | O |
| C-0237 | Me | CH(Me) | Me | $CH_2CF_3$ | H | Me | Me | O |
| C-0238 | H | $CH_2CH_2$ | Me | $CH_2CF_3$ | H | Me | Me | O |
| C-0239 | Me | $CH_2CH_2$ | H | $CH_2CF_3$ | H | Me | Me | O |
| C-0240 | Me | $CH_2CH_2$ | Me | $CH_2CF_3$ | H | Me | Me | O |
| C-0241 | H | $CH_2CH(Me)$ | H | $CH_2CF_3$ | H | Me | Me | O |
| C-0242 | H | $CH_2CH(Me)$ | Me | $CH_2CF_3$ | H | Me | Me | O |
| C-0243 | Me | $CH_2CH(Me)$ | H | $CH_2CF_3$ | H | Me | Me | O |
| C-0244 | Me | $CH_2CH(Me)$ | Me | $CH_2CF_3$ | H | Me | Me | O |
| C-0245 | H | $CH(Me)CH_2$ | H | $CH_2CF_3$ | H | Me | Me | O |
| C-0246 | H | $CH(Me)CH_2$ | Me | $CH_2CF_3$ | H | Me | Me | O |
| C-0247 | Me | $CH(Me)CH_2$ | H | $CH_2CF_3$ | H | Me | Me | O |
| C-0248 | Me | $CH(Me)CH_2$ | Me | $CH_2CF_3$ | H | Me | Me | O |
| C-0249 | H | single bond | Me | Et | H | Cl | Me | O |
| C-0250 | H | single bond | Et | Et | H | Cl | Me | O |
| C-0251 | H | single bond | i-Pr | Et | H | Cl | Me | O |
| C-0252 | Me | single bond | H | Et | H | Cl | Me | O |
| C-0253 | Me(R) | single bond | H | Et | H | Cl | Me | O |
| C-0254 | Me(S) | single bond | H | Et | H | Cl | Me | O |
| C-0255 | Me | single bond | H | Et | H | Cl | Me | S |
| C-0256 | Me(R) | single bond | H | Et | H | Cl | Me | S |
| C-0257 | Me(S) | single bond | H | Et | H | Cl | Me | S |
| C-0258 | Et | single bond | H | Et | H | Cl | Me | O |

TABLE 233

| Compound Number | Y | W | Z | $R^1$ | $R^2$ | $R^3$ | $R^{10}$ | A |
|---|---|---|---|---|---|---|---|---|
| C-0259 | i-Pr | single bond | H | Et | H | Cl | Me | O |
| C-0260 | $CF_3$ | single bond | H | Et | H | Cl | Me | O |
| C-0261 | Me | single bond | Me | Et | H | Cl | Me | O |
| C-0262 | H | $CH_2$ | Me | Et | H | Cl | Me | O |
| C-0263 | Me | $CH_2$ | H | Et | H | Cl | Me | O |
| C-0264 | Me | $CH_2$ | Me | Et | H | Cl | Me | O |
| C-0265 | H | CH(Me) | H | Et | H | Cl | Me | O |
| C-0266 | H | CH(Me) | Me | Et | H | Cl | Me | O |
| C-0267 | Me | CH(Me) | H | Et | H | Cl | Me | O |
| C-0268 | Me | CH(Me) | Me | Et | H | Cl | Me | O |
| C-0269 | H | $CH_2CH_2$ | Me | Et | H | Cl | Me | O |
| C-0270 | Me | $CH_2CH_2$ | H | Et | H | Cl | Me | O |
| C-0271 | Me | $CH_2CH_2$ | Me | Et | H | Cl | Me | O |
| C-0272 | H | $CH_2CH(Me)$ | H | Et | H | Cl | Me | O |
| C-0273 | H | $CH_2CH(Me)$ | Me | Et | H | Cl | Me | O |
| C-0274 | Me | $CH_2CH(Me)$ | H | Et | H | Cl | Me | O |
| C-0275 | Me | $CH_2CH(Me)$ | Me | Et | H | Cl | Me | O |
| C-0276 | H | $CH(Me)CH_2$ | H | Et | H | Cl | Me | O |
| C-0277 | H | $CH(Me)CH_2$ | Me | Et | H | Cl | Me | O |
| C-0278 | Me | $CH(Me)CH_2$ | H | Et | H | Cl | Me | O |
| C-0279 | Me | $CH(Me)CH_2$ | Me | Et | H | Cl | Me | O |
| C-0280 | H | single bond | Me | Et | H | Me | Me | O |
| C-0281 | H | single bond | Et | Et | H | Me | Me | O |
| C-0282 | H | single bond | i-Pr | Et | H | Me | Me | O |
| C-0283 | Me | single bond | H | Et | H | Me | Me | O |
| C-0284 | Me(R) | single bond | H | Et | H | Me | Me | O |
| C-0285 | Me(S) | single bond | H | Et | H | Me | Me | O |
| C-0286 | Me | single bond | H | Et | H | Me | Me | S |
| C-0287 | Me(R) | single bond | H | Et | H | Me | Me | S |
| C-0288 | Me(S) | single bond | H | Et | H | Me | Me | S |
| C-0289 | Et | single bond | H | Et | H | Me | Me | O |
| C-0290 | i-Pr | single bond | H | Et | H | Me | Me | O |
| C-0291 | $CF_3$ | single bond | H | Et | H | Me | Me | O |
| C-0292 | Me | single bond | Me | Et | H | Me | Me | O |
| C-0293 | H | $CH_2$ | Me | Et | H | Me | Me | O |
| C-0294 | Me | $CH_2$ | H | Et | H | Me | Me | O |
| C-0295 | Me | $CH_2$ | Me | Et | H | Me | Me | O |
| C-0296 | H | CH(Me) | H | Et | H | Me | Me | O |
| C-0297 | H | CH(Me) | Me | Et | H | Me | Me | O |
| C-0298 | Me | CH(Me) | H | Et | H | Me | Me | O |
| C-0299 | Me | CH(Me) | Me | Et | H | Me | Me | O |
| C-0300 | H | $CH_2CH_2$ | Me | Et | H | Me | Me | O |
| C-0301 | Me | $CH_2CH_2$ | H | Et | H | Me | Me | O |
| C-0302 | Me | $CH_2CH_2$ | Me | Et | H | Me | Me | O |

TABLE 234

| Compound Number | Y | W | Z | $R^1$ | $R^2$ | $R^3$ | $R^{10}$ | A |
|---|---|---|---|---|---|---|---|---|
| C-0303 | H | $CH_2CH(Me)$ | H | Et | H | Me | Me | O |
| C-0304 | H | $CH_2CH(Me)$ | Me | Et | H | Me | Me | O |
| C-0305 | Me | $CH_2CH(Me)$ | H | Et | H | Me | Me | O |
| C-0306 | Me | $CH_2CH(Me)$ | Me | Et | H | Me | Me | O |
| C-0307 | H | $CH(Me)CH_2$ | H | Et | H | Me | Me | O |
| C-0308 | H | $CH(Me)CH_2$ | Me | Et | H | Me | Me | O |
| C-0309 | Me | $CH(Me)CH_2$ | H | Et | H | Me | Me | O |
| C-0310 | Me | $CH(Me)CH_2$ | Me | Et | H | Me | Me | O |
| C-0311 | H | single bond | Me | c-Pr | H | Cl | Me | O |
| C-0312 | H | single bond | Et | c-Pr | H | Cl | Me | O |
| C-0313 | H | single bond | i-Pr | c-Pr | H | Cl | Me | O |
| C-0314 | Me | single bond | H | c-Pr | H | Cl | Me | O |
| C-0315 | Me(R) | single bond | H | c-Pr | H | Cl | Me | O |
| C-0316 | Me(S) | single bond | H | c-Pr | H | Cl | Me | O |
| C-0317 | Me | single bond | H | c-Pr | H | Cl | Me | S |
| C-0318 | Me(R) | single bond | H | c-Pr | H | Cl | Me | S |
| C-0319 | Me(S) | single bond | H | c-Pr | H | Cl | Me | S |
| C-0320 | Et | single bond | H | c-Pr | H | Cl | Me | O |
| C-0321 | i-Pr | single bond | H | c-Pr | H | Cl | Me | O |
| C-0322 | $CF_3$ | single bond | H | c-Pr | H | Cl | Me | O |
| C-0323 | Me | single bond | Me | c-Pr | H | Cl | Me | O |
| C-0324 | H | $CH_2$ | Me | c-Pr | H | Cl | Me | O |
| C-0325 | Me | $CH_2$ | H | c-Pr | H | Cl | Me | O |
| C-0326 | Me | $CH_2$ | Me | c-Pr | H | Cl | Me | O |

TABLE 234-continued

| Compound Number | Y | W | Z | $R^1$ | $R^2$ | $R^3$ | $R^{10}$ | A |
|---|---|---|---|---|---|---|---|---|
| C-0327 | H | CH(Me) | H | c-Pr | H | Cl | Me | O |
| C-0328 | H | CH(Me) | Me | c-Pr | H | Cl | Me | O |
| C-0329 | Me | CH(Me) | H | c-Pr | H | Cl | Me | O |
| C-0330 | Me | CH(Me) | Me | c-Pr | H | Cl | Me | O |
| C-0331 | H | $CH_2CH_2$ | Me | c-Pr | H | Cl | Me | O |
| C-0332 | Me | $CH_2CH_2$ | H | c-Pr | H | Cl | Me | O |
| C-0333 | Me | $CH_2CH_2$ | Me | c-Pr | H | Cl | Me | O |
| C-0334 | H | $CH_2CH(Me)$ | H | c-Pr | H | Cl | Me | O |
| C-0335 | H | $CH_2CH(Me)$ | Me | c-Pr | H | Cl | Me | O |
| C-0336 | Me | $CH_2CH(Me)$ | H | c-Pr | H | Cl | Me | O |
| C-0337 | Me | $CH_2CH(Me)$ | Me | c-Pr | H | Cl | Me | O |
| C-0338 | H | $CH(Me)CH_2$ | H | c-Pr | H | Cl | Me | O |
| C-0339 | H | $CH(Me)CH_2$ | Me | c-Pr | H | Cl | Me | O |
| C-0340 | Me | $CH(Me)CH_2$ | H | c-Pr | H | Cl | Me | O |
| C-0341 | Me | $CH(Me)CH_2$ | Me | c-Pr | H | Cl | Me | O |
| C-0342 | H | single bond | Me | c-Pr | H | Me | Me | O |
| C-0343 | H | single bond | Et | c-Pr | H | Me | Me | O |
| C-0344 | H | single bond | i-Pr | c-Pr | H | Me | Me | O |
| C-0345 | Me | single bond | H | c-Pr | H | Me | Me | O |
| C-0346 | Me(R) | single bond | H | c-Pr | H | Me | Me | O |

TABLE 235

| Compound Number | Y | W | Z | $R^1$ | $R^2$ | $R^3$ | $R^{10}$ | A |
|---|---|---|---|---|---|---|---|---|
| C-0347 | Me(S) | single bond | H | c-Pr | H | Me | Me | O |
| C-0348 | Me | single bond | H | c-Pr | H | Me | Me | S |
| C-0349 | Me(R) | single bond | H | c-Pr | H | Me | Me | S |
| C-0350 | Me(S) | single bond | H | c-Pr | H | Me | Me | S |
| C-0351 | Et | single bond | H | c-Pr | H | Me | Me | O |
| C-0352 | i-Pr | single bond | H | c-Pr | H | Me | Me | O |
| C-0353 | $CF_3$ | single bond | H | c-Pr | H | Me | Me | O |
| C-0354 | Me | single bond | Me | c-Pr | H | Me | Me | O |
| C-0355 | H | $CH_2$ | Me | c-Pr | H | Me | Me | O |
| C-0356 | Me | $CH_2$ | H | c-Pr | H | Me | Me | O |
| C-0357 | Me | $CH_2$ | Me | c-Pr | H | Me | Me | O |
| C-0358 | H | CH(Me) | H | c-Pr | H | Me | Me | O |
| C-0359 | H | CH(Me) | Me | c-Pr | H | Me | Me | O |
| C-0360 | Me | CH(Me) | H | c-Pr | H | Me | Me | O |
| C-0361 | Me | CH(Me) | Me | c-Pr | H | Me | Me | O |
| C-0362 | H | $CH_2CH_2$ | Me | c-Pr | H | Me | Me | O |
| C-0363 | Me | $CH_2CH_2$ | H | c-Pr | H | Me | Me | O |
| C-0364 | Me | $CH_2CH_2$ | Me | c-Pr | H | Me | Me | O |
| C-0365 | H | $CH_2CH(Me)$ | H | c-Pr | H | Me | Me | O |
| C-0366 | H | $CH_2CH(Me)$ | Me | c-Pr | H | Me | Me | O |
| C-0367 | Me | $CH_2CH(Me)$ | H | c-Pr | H | Me | Me | O |
| C-0368 | Me | $CH_2CH(Me)$ | Me | c-Pr | H | Me | Me | O |
| C-0369 | H | $CH(Me)CH_2$ | H | c-Pr | H | Me | Me | O |
| C-0370 | H | $CH(Me)CH_2$ | Me | c-Pr | H | Me | Me | O |
| C-0371 | Me | $CH(Me)CH_2$ | H | c-Pr | H | Me | Me | O |
| C-0372 | Me | $CH(Me)CH_2$ | Me | c-Pr | H | Me | Me | O |
| C-0373 | H | single bond | Me | $CH_2CF_3$ | H | Cl | Et | O |
| C-0374 | Me | single bond | H | $CH_2CF_3$ | H | Cl | Et | O |
| C-0375 | Me(R) | single bond | H | $CH_2CF_3$ | H | Cl | Et | O |
| C-0376 | Me(S) | single bond | H | $CH_2CF_3$ | H | Cl | Et | O |
| C-0377 | Me | single bond | H | $CH_2CF_3$ | H | Cl | Et | S |
| C-0378 | Me(R) | single bond | H | $CH_2CF_3$ | H | Cl | Et | S |
| C-0379 | Me(S) | single bond | H | $CH_2CF_3$ | H | Cl | Et | S |
| C-0380 | Me | single bond | Me | $CH_2CF_3$ | H | Cl | Et | O |
| C-0381 | H | $CH_2$ | Me | $CH_2CF_3$ | H | Cl | Et | O |
| C-0382 | Me | $CH_2$ | H | $CH_2CF_3$ | H | Cl | Et | O |
| C-0383 | Me | $CH_2$ | Me | $CH_2CF_3$ | H | Cl | Et | O |
| C-0384 | H | CH(Me) | H | $CH_2CF_3$ | H | Cl | Et | O |
| C-0385 | H | CH(Me) | Me | $CH_2CF_3$ | H | Cl | Et | O |
| C-0386 | Me | CH(Me) | H | $CH_2CF_3$ | H | Cl | Et | O |
| C-0387 | Me | CH(Me) | Me | $CH_2CF_3$ | H | Cl | Et | O |
| C-0388 | H | $CH_2CH_2$ | Me | $CH_2CF_3$ | H | Cl | Et | O |
| C-0389 | Me | $CH_2CH_2$ | H | $CH_2CF_3$ | H | Cl | Et | O |
| C-0390 | Me | $CH_2CH_2$ | Me | $CH_2CF_3$ | H | Cl | Et | O |

TABLE 236

| Compound Number | Y | W | Z | $R^1$ | $R^2$ | $R^3$ | $R^{10}$ | A |
|---|---|---|---|---|---|---|---|---|
| C-0391 | H | single bond | Me | $CH_2CF_3$ | H | Me | Et | O |
| C-0392 | Me | single bond | H | $CH_2CF_3$ | H | Me | Et | O |
| C-0393 | Me(R) | single bond | H | $CH_2CF_3$ | H | Me | Et | O |
| C-0394 | Me(S) | single bond | H | $CH_2CF_3$ | H | Me | Et | O |
| C-0395 | Me | single bond | H | $CH_2CF_3$ | H | Me | Et | S |
| C-0396 | Me(R) | single bond | H | $CH_2CF_3$ | H | Me | Et | S |
| C-0397 | Me(S) | single bond | H | $CH_2CF_3$ | H | Me | Et | S |
| C-0398 | Me | single bond | Me | $CH_2CF_3$ | H | Me | Et | O |
| C-0399 | H | $CH_2$ | Me | $CH_2CF_3$ | H | Me | Et | O |
| C-0400 | Me | $CH_2$ | H | $CH_2CF_3$ | H | Me | Et | O |
| C-0401 | Me | $CH_2$ | Me | $CH_2CF_3$ | H | Me | Et | O |
| C-0402 | H | CH(Me) | H | $CH_2CF_3$ | H | Me | Et | O |
| C-0403 | H | CH(Me) | Me | $CH_2CF_3$ | H | Me | Et | O |
| C-0404 | Me | CH(Me) | H | $CH_2CF_3$ | H | Me | Et | O |
| C-0405 | Me | CH(Me) | Me | $CH_2CF_3$ | H | Me | Et | O |
| C-0406 | H | $CH_2CH_2$ | Me | $CH_2CF_3$ | H | Me | Et | O |
| C-0407 | Me | $CH_2CH_2$ | H | $CH_2CF_3$ | H | Me | Et | O |
| C-0408 | Me | $CH_2CH_2$ | Me | $CH_2CF_3$ | H | Me | Et | O |
| C-0409 | H | single bond | Me | Et | H | Cl | Et | O |
| C-0410 | Me | single bond | H | Et | H | Cl | Et | O |
| C-0411 | Me(R) | single bond | H | Et | H | Cl | Et | O |
| C-0412 | Me(S) | single bond | H | Et | H | Cl | Et | O |
| C-0413 | Me | single bond | H | Et | H | Cl | Et | S |
| C-0414 | Me(R) | single bond | H | Et | H | Cl | Et | S |
| C-0415 | Me(S) | single bond | H | Et | H | Cl | Et | S |
| C-0416 | Me | single bond | Me | Et | H | Cl | Et | O |
| C-0417 | H | $CH_2$ | Me | Et | H | Cl | Et | O |
| C-0418 | Me | $CH_2$ | H | Et | H | Cl | Et | O |
| C-0419 | Me | $CH_2$ | Me | Et | H | Cl | Et | O |
| C-0420 | H | CH(Me) | H | Et | H | Cl | Et | O |
| C-0421 | H | CH(Me) | Me | Et | H | Cl | Et | O |
| C-0422 | Me | CH(Me) | H | Et | H | Cl | Et | O |
| C-0423 | Me | CH(Me) | Me | Et | H | Cl | Et | O |
| C-0424 | H | $CH_2CH_2$ | Me | Et | H | Cl | Et | O |
| C-0425 | Me | $CH_2CH_2$ | H | Et | H | Cl | Et | O |
| C-0426 | Me | $CH_2CH_2$ | Me | Et | H | Cl | Et | O |
| C-0427 | H | single bond | Me | Et | H | Me | Et | O |
| C-0428 | Me | single bond | H | Et | H | Me | Et | O |
| C-0429 | Me(R) | single bond | H | Et | H | Me | Et | O |
| C-0430 | Me(S) | single bond | H | Et | H | Me | Et | O |
| C-0431 | Me | single bond | H | Et | H | Me | Et | S |
| C-0432 | Me(R) | single bond | H | Et | H | Me | Et | S |
| C-0433 | Me(S) | single bond | H | Et | H | Me | Et | S |
| C-0434 | Me | single bond | Me | Et | H | Me | Et | O |

TABLE 237

| Compound Number | Y | W | Z | $R^1$ | $R^2$ | $R^3$ | $R^{10}$ | A |
|---|---|---|---|---|---|---|---|---|
| C-0435 | H | $CH_2$ | Me | Et | H | Me | Et | O |
| C-0436 | Me | $CH_2$ | H | Et | H | Me | Et | O |
| C-0437 | Me | $CH_2$ | Me | Et | H | Me | Et | O |
| C-0438 | H | CH(Me) | H | Et | H | Me | Et | O |
| C-0439 | H | CH(Me) | Me | Et | H | Me | Et | O |
| C-0440 | Me | CH(Me) | H | Et | H | Me | Et | O |
| C-0441 | Me | CH(Me) | Me | Et | H | Me | Et | O |
| C-0442 | H | $CH_2CH_2$ | Me | Et | H | Me | Et | O |
| C-0443 | Me | $CH_2CH_2$ | H | Et | H | Me | Et | O |
| C-0444 | Me | $CH_2CH_2$ | Me | Et | H | Me | Et | O |
| C-0445 | H | single bond | Me | c-Pr | H | Cl | Et | O |
| C-0446 | Me | single bond | H | c-Pr | H | Cl | Et | O |
| C-0447 | Me(R) | single bond | H | c-Pr | H | Cl | Et | O |
| C-0448 | Me(S) | single bond | H | c-Pr | H | Cl | Et | O |
| C-0449 | Me | single bond | H | c-Pr | H | Cl | Et | S |
| C-0450 | Me(R) | single bond | H | c-Pr | H | Cl | Et | S |
| C-0451 | Me(S) | single bond | H | c-Pr | H | Cl | Et | S |
| C-0452 | Me | single bond | Me | c-Pr | H | Cl | Et | O |
| C-0453 | H | $CH_2$ | Me | c-Pr | H | Cl | Et | O |
| C-0454 | Me | $CH_2$ | H | c-Pr | H | Cl | Et | O |
| C-0455 | Me | $CH_2$ | Me | c-Pr | H | Cl | Et | O |
| C-0456 | H | CH(Me) | H | c-Pr | H | Cl | Et | O |
| C-0457 | H | CH(Me) | Me | c-Pr | H | Cl | Et | O |
| C-0458 | Me | CH(Me) | H | c-Pr | H | Cl | Et | O |

TABLE 237-continued

| Compound Number | Y | W | Z | $R^1$ | $R^2$ | $R^3$ | $R^{10}$ | A |
|---|---|---|---|---|---|---|---|---|
| C-0459 | Me | CH(Me) | Me | c-Pr | H | Cl | Et | O |
| C-0460 | H | $CH_2CH_2$ | Me | c-Pr | H | Cl | Et | O |
| C-0461 | Me | $CH_2CH_2$ | H | c-Pr | H | Cl | Et | O |
| C-0462 | Me | $CH_2CH_2$ | Me | c-Pr | H | Cl | Et | O |
| C-0463 | H | single bond | Me | c-Pr | H | Me | Et | O |
| C-0464 | Me | single bond | H | c-Pr | H | Me | Et | O |
| C-0465 | Me(R) | single bond | H | c-Pr | H | Me | Et | O |
| C-0466 | Me(S) | single bond | H | c-Pr | H | Me | Et | O |
| C-0467 | Me | single bond | H | c-Pr | H | Me | Et | S |
| C-0468 | Me(R) | single bond | H | c-Pr | H | Me | Et | S |
| C-0469 | Me(S) | single bond | H | c-Pr | H | Me | Et | S |
| C-0470 | Me | single bond | Me | c-Pr | H | Me | Et | O |
| C-0471 | H | $CH_2$ | Me | c-Pr | H | Me | Et | O |
| C-0472 | Me | $CH_2$ | H | c-Pr | H | Me | Et | O |
| C-0473 | Me | $CH_2$ | Me | c-Pr | H | Me | Et | O |
| C-0474 | H | CH(Me) | H | c-Pr | H | Me | Et | O |
| C-0475 | H | CH(Me) | Me | c-Pr | H | Me | Et | O |
| C-0476 | Me | CH(Me) | H | c-Pr | H | Me | Et | O |
| C-0477 | Me | CH(Me) | Me | c-Pr | H | Me | Et | O |
| C-0478 | H | $CH_2CH_2$ | Me | c-Pr | H | Me | Et | O |

TABLE 238

| Compound Number | Y | W | Z | $R^1$ | $R^2$ | $R^3$ | $R^{10}$ | A |
|---|---|---|---|---|---|---|---|---|
| C-0479 | Me | $CH_2CH_2$ | H | c-Pr | H | Me | Et | O |
| C-0480 | Me | $CH_2CH_2$ | Me | c-Pr | H | Me | Et | O |
| C-0481 | H | single bond | Me | $CH_2CF_3$ | H | Cl | $CH_2CF_3$ | O |
| C-0482 | Me | single bond | H | $CH_2CF_3$ | H | Cl | $CH_2CF_3$ | O |
| C-0483 | Me(R) | single bond | H | $CH_2CF_3$ | H | Cl | $CH_2CF_3$ | O |
| C-0484 | Me(S) | single bond | H | $CH_2CF_3$ | H | Cl | $CH_2CF_3$ | O |
| C-0485 | Me | single bond | H | $CH_2CF_3$ | H | Cl | $CH_2CF_3$ | S |
| C-0486 | Me(R) | single bond | H | $CH_2CF_3$ | H | Cl | $CH_2CF_3$ | S |
| C-0487 | Me(S) | single bond | H | $CH_2CF_3$ | H | Cl | $CH_2CF_3$ | S |
| C-0488 | Me | single bond | Me | $CH_2CF_3$ | H | Cl | $CH_2CF_3$ | O |
| C-0489 | H | $CH_2$ | Me | $CH_2CF_3$ | H | Cl | $CH_2CF_3$ | O |
| C-0490 | Me | $CH_2$ | H | $CH_2CF_3$ | H | Cl | $CH_2CF_3$ | O |
| C-0491 | Me | $CH_2$ | Me | $CH_2CF_3$ | H | Cl | $CH_2CF_3$ | O |
| C-0492 | H | CH(Me) | H | $CH_2CF_3$ | H | Cl | $CH_2CF_3$ | O |
| C-0493 | H | CH(Me) | Me | $CH_2CF_3$ | H | Cl | $CH_2CF_3$ | O |
| C-0494 | Me | CH(Me) | H | $CH_2CF_3$ | H | Cl | $CH_2CF_3$ | O |
| C-0495 | Me | CH(Me) | Me | $CH_2CF_3$ | H | Cl | $CH_2CF_3$ | O |
| C-0496 | H | $CH_2CH_2$ | Me | $CH_2CF_3$ | H | Cl | $CH_2CF_3$ | O |
| C-0497 | Me | $CH_2CH_2$ | H | $CH_2CF_3$ | H | Cl | $CH_2CF_3$ | O |
| C-0498 | Me | $CH_2CH_2$ | Me | $CH_2CF_3$ | H | Cl | $CH_2CF_3$ | O |
| C-0499 | H | single bond | Me | $CH_2CF_3$ | H | Me | $CH_2CF_3$ | O |
| C-0500 | Me | single bond | H | $CH_2CF_3$ | H | Me | $CH_2CF_3$ | O |
| C-0501 | Me(R) | single bond | H | $CH_2CF_3$ | H | Me | $CH_2CF_3$ | O |
| C-0502 | Me(S) | single bond | H | $CH_2CF_3$ | H | Me | $CH_2CF_3$ | O |
| C-0503 | Me | single bond | H | $CH_2CF_3$ | H | Me | $CH_2CF_3$ | S |
| C-0504 | Me(R) | single bond | H | $CH_2CF_3$ | H | Me | $CH_2CF_3$ | S |
| C-0505 | Me(S) | single bond | H | $CH_2CF_3$ | H | Me | $CH_2CF_3$ | S |
| C-0506 | Me | single bond | Me | $CH_2CF_3$ | H | Me | $CH_2CF_3$ | O |
| C-0507 | H | $CH_2$ | Me | $CH_2CF_3$ | H | Me | $CH_2CF_3$ | O |
| C-0508 | Me | $CH_2$ | H | $CH_2CF_3$ | H | Me | $CH_2CF_3$ | O |
| C-0509 | Me | $CH_2$ | Me | $CH_2CF_3$ | H | Me | $CH_2CF_3$ | O |
| C-0510 | H | CH(Me) | H | $CH_2CF_3$ | H | Me | $CH_2CF_3$ | O |
| C-0511 | H | CH(Me) | Me | $CH_2CF_3$ | H | Me | $CH_2CF_3$ | O |
| C-0512 | Me | CH(Me) | H | $CH_2CF_3$ | H | Me | $CH_2CF_3$ | O |
| C-0513 | Me | CH(Me) | Me | $CH_2CF_3$ | H | Me | $CH_2CF_3$ | O |
| C-0514 | H | $CH_2CH_2$ | Me | $CH_2CF_3$ | H | Me | $CH_2CF_3$ | O |
| C-0515 | Me | $CH_2CH_2$ | H | $CH_2CF_3$ | H | Me | $CH_2CF_3$ | O |
| C-0516 | Me | $CH_2CH_2$ | Me | $CH_2CF_3$ | H | Me | $CH_2CF_3$ | O |
| C-0517 | H | single bond | Me | Et | H | Cl | $CH_2CF_3$ | O |
| C-0518 | Me | single bond | H | Et | H | Cl | $CH_2CF_3$ | O |
| C-0519 | Me(R) | single bond | H | Et | H | Cl | $CH_2CF_3$ | O |
| C-0520 | Me(S) | single bond | H | Et | H | Cl | $CH_2CF_3$ | O |
| C-0521 | Me | single bond | H | Et | H | Cl | $CH_2CF_3$ | S |
| C-0522 | Me(R) | single bond | H | Et | H | Cl | $CH_2CF_3$ | S |

TABLE 239

| Compound Number | Y | W | Z | $R^1$ | $R^2$ | $R^3$ | $R^{10}$ | A |
|---|---|---|---|---|---|---|---|---|
| C-0523 | Me(S) | single bond | H | Et | H | Cl | $CH_2CF_3$ | S |
| C-0524 | Me | single bond | Me | Et | H | Cl | $CH_2CF_3$ | O |
| C-0525 | H | $CH_2$ | Me | Et | H | Cl | $CH_2CF_3$ | O |
| C-0526 | Me | $CH_2$ | H | Et | H | Cl | $CH_2CF_3$ | O |
| C-0527 | Me | $CH_2$ | Me | Et | H | Cl | $CH_2CF_3$ | O |
| C-0528 | H | CH(Me) | H | Et | H | Cl | $CH_2CF_3$ | O |
| C-0529 | H | CH(Me) | Me | Et | H | Cl | $CH_2CF_3$ | O |
| C-0530 | Me | CH(Me) | H | Et | H | Cl | $CH_2CF_3$ | O |
| C-0531 | Me | CH(Me) | Me | Et | H | Cl | $CH_2CF_3$ | O |
| C-0532 | H | $CH_2CH_2$ | Me | Et | H | Cl | $CH_2CF_3$ | O |
| C-0533 | Me | $CH_2CH_2$ | H | Et | H | Cl | $CH_2CF_3$ | O |
| C-0534 | Me | $CH_2CH_2$ | Me | Et | H | Cl | $CH_2CF_3$ | O |
| C-0535 | H | single bond | Me | Et | H | Me | $CH_2CF_3$ | O |
| C-0536 | Me | single bond | H | Et | H | Me | $CH_2CF_3$ | O |
| C-0537 | Me(R) | single bond | H | Et | H | Me | $CH_2CF_3$ | O |
| C-0538 | Me(S) | single bond | H | Et | H | Me | $CH_2CF_3$ | O |
| C-0539 | Me | single bond | H | Et | H | Me | $CH_2CF_3$ | S |
| C-0540 | Me(R) | single bond | H | Et | H | Me | $CH_2CF_3$ | S |
| C-0541 | Me(S) | single bond | H | Et | H | Me | $CH_2CF_3$ | S |
| C-0542 | Me | single bond | Me | Et | H | Me | $CH_2CF_3$ | O |
| C-0543 | H | $CH_2$ | Me | Et | H | Me | $CH_2CF_3$ | O |
| C-0544 | Me | $CH_2$ | H | Et | H | Me | $CH_2CF_3$ | O |
| C-0545 | Me | $CH_2$ | Me | Et | H | Me | $CH_2CF_3$ | O |
| C-0546 | H | CH(Me) | H | Et | H | Me | $CH_2CF_3$ | O |
| C-0547 | H | CH(Me) | Me | Et | H | Me | $CH_2CF_3$ | O |
| C-0548 | Me | CH(Me) | H | Et | H | Me | $CH_2CF_3$ | O |
| C-0549 | Me | CH(Me) | Me | Et | H | Me | $CH_2CF_3$ | O |
| C-0550 | H | $CH_2CH_2$ | Me | Et | H | Me | $CH_2CF_3$ | O |
| C-0551 | Me | $CH_2CH_2$ | H | Et | H | Me | $CH_2CF_3$ | O |
| C-0552 | Me | $CH_2CH_2$ | Me | Et | H | Me | $CH_2CF_3$ | O |
| C-0553 | H | single bond | Me | c-Pr | H | Cl | $CH_2CF_3$ | O |
| C-0554 | Me | single bond | H | c-Pr | H | Cl | $CH_2CF_3$ | O |
| C-0555 | Me(R) | single bond | H | c-Pr | H | Cl | $CH_2CF_3$ | O |
| C-0556 | Me(S) | single bond | H | c-Pr | H | Cl | $CH_2CF_3$ | O |
| C-0557 | Me | single bond | H | c-Pr | H | Cl | $CH_2CF_3$ | S |
| C-0558 | Me(R) | single bond | H | c-Pr | H | Cl | $CH_2CF_3$ | S |
| C-0559 | Me(S) | single bond | H | c-Pr | H | Cl | $CH_2CF_3$ | S |
| C-0560 | Me | single bond | Me | c-Pr | H | Cl | $CH_2CF_3$ | O |
| C-0561 | H | $CH_2$ | Me | c-Pr | H | Cl | $CH_2CF_3$ | O |
| C-0562 | Me | $CH_2$ | H | c-Pr | H | Cl | $CH_2CF_3$ | O |
| C-0563 | Me | $CH_2$ | Me | c-Pr | H | Cl | $CH_2CF_3$ | O |
| C-0564 | H | CH(Me) | H | c-Pr | H | Cl | $CH_2CF_3$ | O |
| C-0565 | H | CH(Me) | Me | c-Pr | H | Cl | $CH_2CF_3$ | O |
| C-0566 | Me | CH(Me) | H | c-Pr | H | Cl | $CH_2CF_3$ | O |

TABLE 240

| Compound Number | Y | W | Z | $R^1$ | $R^2$ | $R^3$ | $R^{10}$ | A |
|---|---|---|---|---|---|---|---|---|
| C-0567 | Me | CH(Me) | Me | c-Pr | H | Cl | $CH_2CF_3$ | O |
| C-0568 | H | $CH_2CH_2$ | Me | c-Pr | H | Cl | $CH_2CF_3$ | O |
| C-0569 | Me | $CH_2CH_2$ | H | c-Pr | H | Cl | $CH_2CF_3$ | O |
| C-0570 | Me | $CH_2CH_2$ | Me | c-Pr | H | Cl | $CH_2CF_3$ | O |
| C-0571 | H | single bond | Me | c-Pr | H | Me | $CH_2CF_3$ | O |
| C-0572 | Me | single bond | H | c-Pr | H | Me | $CH_2CF_3$ | O |
| C-0573 | Me(R) | single bond | H | c-Pr | H | Me | $CH_2CF_3$ | O |
| C-0574 | Me(S) | single bond | H | c-Pr | H | Me | $CH_2CF_3$ | O |
| C-0575 | Me | single bond | H | c-Pr | H | Me | $CH_2CF_3$ | S |
| C-0576 | Me(R) | single bond | H | c-Pr | H | Me | $CH_2CF_3$ | S |
| C-0577 | Me(S) | single bond | H | c-Pr | H | Me | $CH_2CF_3$ | S |
| C-0578 | Me | single bond | Me | c-Pr | H | Me | $CH_2CF_3$ | O |
| C-0579 | H | $CH_2$ | Me | c-Pr | H | Me | $CH_2CF_3$ | O |
| C-0580 | Me | $CH_2$ | H | c-Pr | H | Me | $CH_2CF_3$ | O |
| C-0581 | Me | $CH_2$ | Me | c-Pr | H | Me | $CH_2CF_3$ | O |
| C-0582 | H | CH(Me) | H | c-Pr | H | Me | $CH_2CF_3$ | O |
| C-0583 | H | CH(Me) | Me | c-Pr | H | Me | $CH_2CF_3$ | O |
| C-0584 | Me | CH(Me) | H | c-Pr | H | Me | $CH_2CF_3$ | O |
| C-0585 | Me | CH(Me) | Me | c-Pr | H | Me | $CH_2CF_3$ | O |
| C-0586 | H | $CH_2CH_2$ | Me | c-Pr | H | Me | $CH_2CF_3$ | O |
| C-0587 | Me | $CH_2CH_2$ | H | c-Pr | H | Me | $CH_2CF_3$ | O |
| C-0588 | Me | $CH_2CH_2$ | Me | c-Pr | H | Me | $CH_2CF_3$ | O |
| C-0589 | H | single bond | Me | $CH_2CF_3$ | H | Cl | $CH_2OMe$ | O |
| C-0590 | Me | single bond | H | $CH_2CF_3$ | H | Cl | $CH_2OMe$ | O |

TABLE 240-continued

| Compound Number | Y | W | Z | $R^1$ | $R^2$ | $R^3$ | $R^{10}$ | A |
|---|---|---|---|---|---|---|---|---|
| C-0591 | Me(R) | single bond | H | $CH_2CF_3$ | H | Cl | $CH_2OMe$ | O |
| C-0592 | Me(S) | single bond | H | $CH_2CF_3$ | H | Cl | $CH_2OMe$ | O |
| C-0593 | Me | single bond | H | $CH_2CF_3$ | H | Cl | $CH_2OMe$ | S |
| C-0594 | Me(R) | single bond | H | $CH_2CF_3$ | H | Cl | $CH_2OMe$ | S |
| C-0595 | Me(S) | single bond | H | $CH_2CF_3$ | H | Cl | $CH_2OMe$ | S |
| C-0596 | Me | single bond | Me | $CH_2CF_3$ | H | Cl | $CH_2OMe$ | O |
| C-0597 | H | $CH_2$ | Me | $CH_2CF_3$ | H | Cl | $CH_2OMe$ | O |
| C-0598 | Me | $CH_2$ | H | $CH_2CF_3$ | H | Cl | $CH_2OMe$ | O |
| C-0599 | Me | $CH_2$ | Me | $CH_2CF_3$ | H | Cl | $CH_2OMe$ | O |
| C-0600 | H | CH(Me) | H | $CH_2CF_3$ | H | Cl | $CH_2OMe$ | O |
| C-0601 | H | CH(Me) | Me | $CH_2CF_3$ | H | Cl | $CH_2OMe$ | O |
| C-0602 | Me | CH(Me) | H | $CH_2CF_3$ | H | Cl | $CH_2OMe$ | O |
| C-0603 | Me | CH(Me) | Me | $CH_2CF_3$ | H | Cl | $CH_2OMe$ | O |
| C-0604 | H | $CH_2CH_2$ | Me | $CH_2CF_3$ | H | Cl | $CH_2OMe$ | O |
| C-0605 | Me | $CH_2CH_2$ | H | $CH_2CF_3$ | H | Cl | $CH_2OMe$ | O |
| C-0606 | Me | $CH_2CH_2$ | Me | $CH_2CF_3$ | H | Cl | $CH_2OMe$ | O |
| C-0607 | H | single bond | Me | $CH_2CF_3$ | H | Me | $CH_2OMe$ | O |
| C-0608 | Me | single bond | H | $CH_2CF_3$ | H | Me | $CH_2OMe$ | O |
| C-0609 | Me(R) | single bond | H | $CH_2CF_3$ | H | Me | $CH_2OMe$ | O |
| C-0610 | Me(S) | single bond | H | $CH_2CF_3$ | H | Me | $CH_2OMe$ | O |

TABLE 241

| Compound Number | Y | W | Z | $R^1$ | $R^2$ | $R^3$ | $R^{10}$ | A |
|---|---|---|---|---|---|---|---|---|
| C-0611 | Me | single bond | H | $CH_2CF_3$ | H | Me | $CH_2OMe$ | S |
| C-0612 | Me(R) | single bond | H | $CH_2CF_3$ | H | Me | $CH_2OMe$ | S |
| C-0613 | Me(S) | single bond | H | $CH_2CF_3$ | H | Me | $CH_2OMe$ | S |
| C-0614 | Me | single bond | Me | $CH_2CF_3$ | H | Me | $CH_2OMe$ | O |
| C-0615 | H | $CH_2$ | Me | $CH_2CF_3$ | H | Me | $CH_2OMe$ | O |
| C-0616 | Me | $CH_2$ | H | $CH_2CF_3$ | H | Me | $CH_2OMe$ | O |
| C-0617 | Me | $CH_2$ | Me | $CH_2CF_3$ | H | Me | $CH_2OMe$ | O |
| C-0618 | H | CH(Me) | H | $CH_2CF_3$ | H | Me | $CH_2OMe$ | O |
| C-0619 | H | CH(Me) | Me | $CH_2CF_3$ | H | Me | $CH_2OMe$ | O |
| C-0620 | Me | CH(Me) | H | $CH_2CF_3$ | H | Me | $CH_2OMe$ | O |
| C-0621 | Me | CH(Me) | Me | $CH_2CF_3$ | H | Me | $CH_2OMe$ | O |
| C-0622 | H | $CH_2CH_2$ | Me | $CH_2CF_3$ | H | Me | $CH_2OMe$ | O |
| C-0623 | Me | $CH_2CH_2$ | H | $CH_2CF_3$ | H | Me | $CH_2OMe$ | O |
| C-0624 | Me | $CH_2CH_2$ | Me | $CH_2CF_3$ | H | Me | $CH_2OMe$ | O |
| C-0625 | H | single bond | Me | Et | H | Cl | $CH_2OMe$ | O |
| C-0626 | Me | single bond | H | Et | H | Cl | $CH_2OMe$ | O |
| C-0627 | Me(R) | single bond | H | Et | H | Cl | $CH_2OMe$ | O |
| C-0628 | Me(S) | single bond | H | Et | H | Cl | $CH_2OMe$ | O |
| C-0629 | Me | single bond | H | Et | H | Cl | $CH_2OMe$ | S |
| C-0630 | Me(R) | single bond | H | Et | H | Cl | $CH_2OMe$ | S |
| C-0631 | Me(S) | single bond | H | Et | H | Cl | $CH_2OMe$ | S |
| C-0632 | Me | single bond | Me | Et | H | Cl | $CH_2OMe$ | O |
| C-0633 | H | $CH_2$ | Me | Et | H | Cl | $CH_2OMe$ | O |
| C-0634 | Me | $CH_2$ | H | Et | H | Cl | $CH_2OMe$ | O |
| C-0635 | Me | $CH_2$ | Me | Et | H | Cl | $CH_2OMe$ | O |
| C-0636 | H | CH(Me) | H | Et | H | Cl | $CH_2OMe$ | O |
| C-0637 | H | CH(Me) | Me | Et | H | Cl | $CH_2OMe$ | O |
| C-0638 | Me | CH(Me) | H | Et | H | Cl | $CH_2OMe$ | O |
| C-0639 | Me | CH(Me) | Me | Et | H | Cl | $CH_2OMe$ | O |
| C-0640 | H | $CH_2CH_2$ | Me | Et | H | Cl | $CH_2OMe$ | O |
| C-0641 | Me | $CH_2CH_2$ | H | Et | H | Cl | $CH_2OMe$ | O |
| C-0642 | Me | $CH_2CH_2$ | Me | Et | H | Cl | $CH_2OMe$ | O |
| C-0643 | H | single bond | Me | Et | H | Me | $CH_2OMe$ | O |
| C-0644 | Me | single bond | H | Et | H | Me | $CH_2OMe$ | O |
| C-0645 | Me(R) | single bond | H | Et | H | Me | $CH_2OMe$ | O |
| C-0646 | Me(S) | single bond | H | Et | H | Me | $CH_2OMe$ | O |
| C-0647 | Me | single bond | H | Et | H | Me | $CH_2OMe$ | S |
| C-0648 | Me(R) | single bond | H | Et | H | Me | $CH_2OMe$ | S |
| C-0649 | Me(S) | single bond | H | Et | H | Me | $CH_2OMe$ | S |
| C-0650 | Me | single bond | Me | Et | H | Me | $CH_2OMe$ | O |
| C-0651 | H | $CH_2$ | Me | Et | H | Me | $CH_2OMe$ | O |
| C-0652 | Me | $CH_2$ | H | Et | H | Me | $CH_2OMe$ | O |
| C-0653 | Me | $CH_2$ | Me | Et | H | Me | $CH_2OMe$ | O |
| C-0654 | H | CH(Me) | H | Et | H | Me | $CH_2OMe$ | O |

TABLE 242

| Compound Number | Y | W | Z | $R^1$ | $R^2$ | $R^3$ | $R^{10}$ | A |
|---|---|---|---|---|---|---|---|---|
| C-0655 | H | CH(Me) | Me | Et | H | Me | $CH_2OMe$ | O |
| C-0656 | Me | CH(Me) | H | Et | H | Me | $CH_2OMe$ | O |
| C-0657 | Me | CH(Me) | Me | Et | H | Me | $CH_2OMe$ | O |
| C-0658 | H | $CH_2CH_2$ | Me | Et | H | Me | $CH_2OMe$ | O |
| C-0659 | Me | $CH_2CH_2$ | H | Et | H | Me | $CH_2OMe$ | O |
| C-0660 | Me | $CH_2CH_2$ | Me | Et | H | Me | $CH_2OMe$ | O |
| C-0661 | H | single bond | Me | c-Pr | H | Cl | $CH_2OMe$ | O |
| C-0662 | Me | single bond | H | c-Pr | H | Cl | $CH_2OMe$ | O |
| C-0663 | Me(R) | single bond | H | c-Pr | H | Cl | $CH_2OMe$ | O |
| C-0664 | Me(S) | single bond | H | c-Pr | H | Cl | $CH_2OMe$ | O |
| C-0665 | Me | single bond | H | c-Pr | H | Cl | $CH_2OMe$ | S |
| C-0666 | Me(R) | single bond | H | c-Pr | H | Cl | $CH_2OMe$ | S |
| C-0667 | Me(S) | single bond | H | c-Pr | H | Cl | $CH_2OMe$ | S |
| C-0668 | Me | single bond | Me | c-Pr | H | Cl | $CH_2OMe$ | O |
| C-0669 | H | $CH_2$ | Me | c-Pr | H | Cl | $CH_2OMe$ | O |
| C-0670 | Me | $CH_2$ | H | c-Pr | H | Cl | $CH_2OMe$ | O |
| C-0671 | Me | $CH_2$ | Me | c-Pr | H | Cl | $CH_2OMe$ | O |
| C-0672 | H | CH(Me) | H | c-Pr | H | Cl | $CH_2OMe$ | O |
| C-0673 | H | CH(Me) | Me | c-Pr | H | Cl | $CH_2OMe$ | O |
| C-0674 | Me | CH(Me) | H | c-Pr | H | Cl | $CH_2OMe$ | O |
| C-0675 | Me | CH(Me) | Me | c-Pr | H | Cl | $CH_2OMe$ | O |
| C-0676 | H | $CH_2CH_2$ | Me | c-Pr | H | Cl | $CH_2OMe$ | O |
| C-0677 | Me | $CH_2CH_2$ | H | c-Pr | H | Cl | $CH_2OMe$ | O |
| C-0678 | Me | $CH_2CH_2$ | Me | c-Pr | H | Cl | $CH_2OMe$ | O |
| C-0679 | H | single bond | Me | c-Pr | H | Me | $CH_2OMe$ | O |
| C-0680 | Me | single bond | H | c-Pr | H | Me | $CH_2OMe$ | O |
| C-0681 | Me(R) | single bond | H | c-Pr | H | Me | $CH_2OMe$ | O |
| C-0682 | Me(S) | single bond | H | c-Pr | H | Me | $CH_2OMe$ | O |
| C-0683 | Me | single bond | H | c-Pr | H | Me | $CH_2OMe$ | S |
| C-0684 | Me(R) | single bond | H | c-Pr | H | Me | $CH_2OMe$ | S |
| C-0685 | Me(S) | single bond | H | c-Pr | H | Me | $CH_2OMe$ | S |
| C-0686 | Me | single bond | Me | c-Pr | H | Me | $CH_2OMe$ | O |
| C-0687 | H | $CH_2$ | Me | c-Pr | H | Me | $CH_2OMe$ | O |
| C-0688 | Me | $CH_2$ | H | c-Pr | H | Me | $CH_2OMe$ | O |
| C-0689 | Me | $CH_2$ | Me | c-Pr | H | Me | $CH_2OMe$ | O |
| C-0690 | H | CH(Me) | H | c-Pr | H | Me | $CH_2OMe$ | O |
| C-0691 | H | CH(Me) | Me | c-Pr | H | Me | $CH_2OMe$ | O |
| C-0692 | Me | CH(Me) | H | c-Pr | H | Me | $CH_2OMe$ | O |
| C-0693 | Me | CH(Me) | Me | c-Pr | H | Me | $CH_2OMe$ | O |
| C-0694 | H | $CH_2CH_2$ | Me | c-Pr | H | Me | $CH_2OMe$ | O |
| C-0695 | Me | $CH_2CH_2$ | H | c-Pr | H | Me | $CH_2OMe$ | O |
| C-0696 | Me | $CH_2CH_2$ | Me | c-Pr | H | Me | $CH_2OMe$ | O |
| C-0697 | H | single bond | Me | $CH_2CF_3$ | H | Cl | $CH_2CN$ | O |
| C-0698 | Me | single bond | H | $CH_2CF_3$ | H | Cl | $CH_2CN$ | O |

TABLE 243

| Compound Number | Y | W | Z | $R^1$ | $R^2$ | $R^3$ | $R^{10}$ | A |
|---|---|---|---|---|---|---|---|---|
| C-0699 | Me(R) | single bond | H | $CH_2CF_3$ | H | Cl | $CH_2CN$ | O |
| C-0700 | Me(S) | single bond | H | $CH_2CF_3$ | H | Cl | $CH_2CN$ | O |
| C-0701 | Me | single bond | H | $CH_2CF_3$ | H | Cl | $CH_2CN$ | S |
| C-0702 | Me(R) | single bond | H | $CH_2CF_3$ | H | Cl | $CH_2CN$ | S |
| C-0703 | Me(S) | single bond | H | $CH_2CF_3$ | H | Cl | $CH_2CN$ | S |
| C-0704 | Me | single bond | Me | $CH_2CF_3$ | H | Cl | $CH_2CN$ | O |
| C-0705 | H | $CH_2$ | Me | $CH_2CF_3$ | H | Cl | $CH_2CN$ | O |
| C-0706 | Me | $CH_2$ | H | $CH_2CF_3$ | H | Cl | $CH_2CN$ | O |
| C-0707 | Me | $CH_2$ | Me | $CH_2CF_3$ | H | Cl | $CH_2CN$ | O |
| C-0708 | H | CH(Me) | H | $CH_2CF_3$ | H | Cl | $CH_2CN$ | O |
| C-0709 | H | CH(Me) | Me | $CH_2CF_3$ | H | Cl | $CH_2CN$ | O |
| C-0710 | Me | CH(Me) | H | $CH_2CF_3$ | H | Cl | $CH_2CN$ | O |
| C-0711 | Me | CH(Me) | Me | $CH_2CF_3$ | H | Cl | $CH_2CN$ | O |
| C-0712 | H | $CH_2CH_2$ | Me | $CH_2CF_3$ | H | Cl | $CH_2CN$ | O |
| C-0713 | Me | $CH_2CH_2$ | H | $CH_2CF_3$ | H | Cl | $CH_2CN$ | O |
| C-0714 | Me | $CH_2CH_2$ | Me | $CH_2CF_3$ | H | Cl | $CH_2CN$ | O |
| C-0715 | H | single bond | Me | $CH_2CF_3$ | H | Me | $CH_2CN$ | O |
| C-0716 | Me | single bond | H | $CH_2CF_3$ | H | Me | $CH_2CN$ | O |
| C-0717 | Me(R) | single bond | H | $CH_2CF_3$ | H | Me | $CH_2CN$ | O |
| C-0718 | Me(S) | single bond | H | $CH_2CF_3$ | H | Me | $CH_2CN$ | O |
| C-0719 | Me | single bond | H | $CH_2CF_3$ | H | Me | $CH_2CN$ | S |
| C-0720 | Me(R) | single bond | H | $CH_2CF_3$ | H | Me | $CH_2CN$ | S |
| C-0721 | Me(S) | single bond | H | $CH_2CF_3$ | H | Me | $CH_2CN$ | S |
| C-0722 | Me | single bond | Me | $CH_2CF_3$ | H | Me | $CH_2CN$ | O |

TABLE 243-continued

| Compound Number | Y | W | Z | $R^1$ | $R^2$ | $R^3$ | $R^{10}$ | A |
|---|---|---|---|---|---|---|---|---|
| C-0723 | H | $CH_2$ | Me | $CH_2CF_3$ | H | Me | $CH_2CN$ | O |
| C-0724 | Me | $CH_2$ | H | $CH_2CF_3$ | H | Me | $CH_2CN$ | O |
| C-0725 | Me | $CH_2$ | Me | $CH_2CF_3$ | H | Me | $CH_2CN$ | O |
| C-0726 | H | CH(Me) | H | $CH_2CF_3$ | H | Me | $CH_2CN$ | O |
| C-0727 | H | CH(Me) | Me | $CH_2CF_3$ | H | Me | $CH_2CN$ | O |
| C-0728 | Me | CH(Me) | H | $CH_2CF_3$ | H | Me | $CH_2CN$ | O |
| C-0729 | Me | CH(Me) | Me | $CH_2CF_3$ | H | Me | $CH_2CN$ | O |
| C-0730 | H | $CH_2CH_2$ | Me | $CH_2CF_3$ | H | Me | $CH_2CN$ | O |
| C-0731 | Me | $CH_2CH_2$ | H | $CH_2CF_3$ | H | Me | $CH_2CN$ | O |
| C-0732 | Me | $CH_2CH_2$ | Me | $CH_2CF_3$ | H | Me | $CH_2CN$ | O |
| C-0733 | H | single bond | Me | Et | H | Cl | $CH_2CN$ | O |
| C-0734 | Me | single bond | H | Et | H | Cl | $CH_2CN$ | O |
| C-0735 | Me(R) | single bond | H | Et | H | Cl | $CH_2CN$ | O |
| C-0736 | Me(S) | single bond | H | Et | H | Cl | $CH_2CN$ | O |
| C-0737 | Me | single bond | H | Et | H | Cl | $CH_2CN$ | S |
| C-0738 | Me(R) | single bond | H | Et | H | Cl | $CH_2CN$ | S |
| C-0739 | Me(S) | single bond | H | Et | H | Cl | $CH_2CN$ | S |
| C-0740 | Me | single bond | Me | Et | H | Cl | $CH_2CN$ | O |
| C-0741 | H | $CH_2$ | Me | Et | H | Cl | $CH_2CN$ | O |
| C-0742 | Me | $CH_2$ | H | Et | H | Cl | $CH_2CN$ | O |

TABLE 244

| Compound Number | Y | W | Z | $R^1$ | $R^2$ | $R^3$ | $R^{10}$ | A |
|---|---|---|---|---|---|---|---|---|
| C-0743 | Me | $CH_2$ | Me | Et | H | Cl | $CH_2CN$ | O |
| C-0744 | H | CH(Me) | H | Et | H | Cl | $CH_2CN$ | O |
| C-0745 | H | CH(Me) | Me | Et | H | Cl | $CH_2CN$ | O |
| C-0746 | Me | CH(Me) | H | Et | H | Cl | $CH_2CN$ | O |
| C-0747 | Me | CH(Me) | Me | Et | H | Cl | $CH_2CN$ | O |
| C-0748 | H | $CH_2CH_2$ | Me | Et | H | Cl | $CH_2CN$ | O |
| C-0749 | Me | $CH_2CH_2$ | H | Et | H | Cl | $CH_2CN$ | O |
| C-0750 | Me | $CH_2CH_2$ | Me | Et | H | Cl | $CH_2CN$ | O |
| C-0751 | H | single bond | Me | Et | H | Me | $CH_2CN$ | O |
| C-0752 | Me | single bond | H | Et | H | Me | $CH_2CN$ | O |
| C-0753 | Me(R) | single bond | H | Et | H | Me | $CH_2CN$ | O |
| C-0754 | Me(S) | single bond | H | Et | H | Me | $CH_2CN$ | O |
| C-0755 | Me | single bond | H | Et | H | Me | $CH_2CN$ | S |
| C-0756 | Me(R) | single bond | H | Et | H | Me | $CH_2CN$ | S |
| C-0757 | Me(S) | single bond | H | Et | H | Me | $CH_2CN$ | S |
| C-0758 | Me | single bond | Me | Et | H | Me | $CH_2CN$ | O |
| C-0759 | H | $CH_2$ | Me | Et | H | Me | $CH_2CN$ | O |
| C-0760 | Me | $CH_2$ | H | Et | H | Me | $CH_2CN$ | O |
| C-0761 | Me | $CH_2$ | Me | Et | H | Me | $CH_2CN$ | O |
| C-0762 | H | CH(Me) | H | Et | H | Me | $CH_2CN$ | O |
| C-0763 | H | CH(Me) | Me | Et | H | Me | $CH_2CN$ | O |
| C-0764 | Me | CH(Me) | H | Et | H | Me | $CH_2CN$ | O |
| C-0765 | Me | CH(Me) | Me | Et | H | Me | $CH_2CN$ | O |
| C-0766 | H | $CH_2CH_2$ | Me | Et | H | Me | $CH_2CN$ | O |
| C-0767 | Me | $CH_2CH_2$ | H | Et | H | Me | $CH_2CN$ | O |
| C-0768 | Me | $CH_2CH_2$ | Me | Et | H | Me | $CH_2CN$ | O |
| C-0769 | H | single bond | Me | c-Pr | H | Cl | $CH_2CN$ | O |
| C-0770 | Me | single bond | H | c-Pr | H | Cl | $CH_2CN$ | O |
| C-0771 | Me(R) | single bond | H | c-Pr | H | Cl | $CH_2CN$ | O |
| C-0772 | Me(S) | single bond | H | c-Pr | H | Cl | $CH_2CN$ | O |
| C-0773 | Me | single bond | H | c-Pr | H | Cl | $CH_2CN$ | S |
| C-0774 | Me(R) | single bond | H | c-Pr | H | Cl | $CH_2CN$ | S |
| C-0775 | Me(S) | single bond | H | c-Pr | H | Cl | $CH_2CN$ | S |
| C-0776 | Me | single bond | Me | c-Pr | H | Cl | $CH_2CN$ | O |
| C-0777 | H | $CH_2$ | Me | c-Pr | H | Cl | $CH_2CN$ | O |
| C-0778 | Me | $CH_2$ | H | c-Pr | H | Cl | $CH_2CN$ | O |
| C-0779 | Me | $CH_2$ | Me | c-Pr | H | Cl | $CH_2CN$ | O |
| C-0780 | H | CH(Me) | H | c-Pr | H | Cl | $CH_2CN$ | O |
| C-0781 | H | CH(Me) | Me | c-Pr | H | Cl | $CH_2CN$ | O |
| C-0782 | Me | CH(Me) | H | c-Pr | H | Cl | $CH_2CN$ | O |
| C-0783 | Me | CH(Me) | Me | c-Pr | H | Cl | $CH_2CN$ | O |
| C-0784 | H | $CH_2CH_2$ | Me | c-Pr | H | Cl | $CH_2CN$ | O |
| C-0785 | Me | $CH_2CH_2$ | H | c-Pr | H | Cl | $CH_2CN$ | O |
| C-0786 | Me | $CH_2CH_2$ | Me | c-Pr | H | Cl | $CH_2CN$ | O |

TABLE 245

| Compound Number | Y | W | Z | $R^1$ | $R^2$ | $R^3$ | $R^{10}$ | A |
|---|---|---|---|---|---|---|---|---|
| C-0787 | H | single bond | Me | c-Pr | H | Me | $CH_2CN$ | O |
| C-0788 | Me | single bond | H | c-Pr | H | Me | $CH_2CN$ | O |
| C-0789 | Me(R) | single bond | H | c-Pr | H | Me | $CH_2CN$ | O |
| C-0790 | Me(S) | single bond | H | c-Pr | H | Me | $CH_2CN$ | O |
| C-0791 | Me | single bond | H | c-Pr | H | Me | $CH_2CN$ | S |
| C-0792 | Me(R) | single bond | H | c-Pr | H | Me | $CH_2CN$ | S |
| C-0793 | Me(S) | single bond | H | c-Pr | H | Me | $CH_2CN$ | S |
| C-0794 | Me | single bond | Me | c-Pr | H | Me | $CH_2CN$ | O |
| C-0795 | H | $CH_2$ | Me | c-Pr | H | Me | $CH_2CN$ | O |
| C-0796 | Me | $CH_2$ | H | c-Pr | H | Me | $CH_2CN$ | O |
| C-0797 | Me | $CH_2$ | Me | c-Pr | H | Me | $CH_2CN$ | O |
| C-0798 | H | CH(Me) | H | c-Pr | H | Me | $CH_2CN$ | O |
| C-0799 | H | CH(Me) | Me | c-Pr | H | Me | $CH_2CN$ | O |
| C-0800 | Me | CH(Me) | H | c-Pr | H | Me | $CH_2CN$ | O |
| C-0801 | Me | CH(Me) | Me | c-Pr | H | Me | $CH_2CN$ | O |
| C-0802 | H | $CH_2CH_2$ | Me | c-Pr | H | Me | $CH_2CN$ | O |
| C-0803 | Me | $CH_2CH_2$ | H | c-Pr | H | Me | $CH_2CN$ | O |
| C-0804 | Me | $CH_2CH_2$ | Me | c-Pr | H | Me | $CH_2CN$ | O |
| C-0805 | H | single bond | Me | $CH_2CF_3$ | H | Cl | C(=O)Me | O |
| C-0806 | Me | single bond | H | $CH_2CF_3$ | H | Cl | C(=O)Me | O |
| C-0807 | Me(R) | single bond | H | $CH_2CF_3$ | H | Cl | C(=O)Me | O |
| C-0808 | Me(S) | single bond | H | $CH_2CF_3$ | H | Cl | C(=O)Me | O |
| C-0809 | Me | single bond | H | $CH_2CF_3$ | H | Cl | C(=O)Me | S |
| C-0810 | Me(R) | single bond | H | $CH_2CF_3$ | H | Cl | C(=O)Me | S |
| C-0811 | Me(S) | single bond | H | $CH_2CF_3$ | H | Cl | C(=O)Me | S |
| C-0812 | Me | single bond | Me | $CH_2CF_3$ | H | Cl | C(=O)Me | O |
| C-0813 | H | $CH_2$ | Me | $CH_2CF_3$ | H | Cl | C(=O)Me | O |
| C-0814 | Me | $CH_2$ | H | $CH_2CF_3$ | H | Cl | C(=O)Me | O |
| C-0815 | Me | $CH_2$ | Me | $CH_2CF_3$ | H | Cl | C(=O)Me | O |
| C-0816 | H | CH(Me) | H | $CH_2CF_3$ | H | Cl | C(=O)Me | O |
| C-0817 | H | CH(Me) | Me | $CH_2CF_3$ | H | Cl | C(=O)Me | O |
| C-0818 | Me | CH(Me) | H | $CH_2CF_3$ | H | Cl | C(=O)Me | O |
| C-0819 | Me | CH(Me) | Me | $CH_2CF_3$ | H | Cl | C(=O)Me | O |
| C-0820 | H | $CH_2CH_2$ | Me | $CH_2CF_3$ | H | Cl | C(=O)Me | O |
| C-0821 | Me | $CH_2CH_2$ | H | $CH_2CF_3$ | H | Cl | C(=O)Me | O |
| C-0822 | Me | $CH_2CH_2$ | Me | $CH_2CF_3$ | H | Cl | C(=O)Me | O |
| C-0823 | H | single bond | Me | $CH_2CF_3$ | H | Me | C(=O)Me | O |
| C-0824 | Me | single bond | H | $CH_2CF_3$ | H | Me | C(=O)Me | O |
| C-0825 | Me(R) | single bond | H | $CH_2CF_3$ | H | Me | C(=O)Me | O |
| C-0826 | Me(S) | single bond | H | $CH_2CF_3$ | H | Me | C(=O)Me | O |
| C-0827 | Me | single bond | H | $CH_2CF_3$ | H | Me | C(=O)Me | S |
| C-0828 | Me(R) | single bond | H | $CH_2CF_3$ | H | Me | C(=O)Me | S |
| C-0829 | Me(S) | single bond | H | $CH_2CF_3$ | H | Me | C(=O)Me | S |
| C-0830 | Me | single bond | Me | $CH_2CF_3$ | H | Me | C(=O)Me | O |

TABLE 246

| Compound Number | Y | W | Z | $R^1$ | $R^2$ | $R^3$ | $R^{10}$ | A |
|---|---|---|---|---|---|---|---|---|
| C-0831 | H | $CH_2$ | Me | $CH_2CF_3$ | H | Me | C(=O)Me | O |
| C-0832 | Me | $CH_2$ | H | $CH_2CF_3$ | H | Me | C(=O)Me | O |
| C-0833 | Me | $CH_2$ | Me | $CH_2CF_3$ | H | Me | C(=O)Me | O |
| C-0834 | H | CH(Me) | H | $CH_2CF_3$ | H | Me | C(=O)Me | O |
| C-0835 | H | CH(Me) | Me | $CH_2CF_3$ | H | Me | C(=O)Me | O |
| C-0836 | Me | CH(Me) | H | $CH_2CF_3$ | H | Me | C(=O)Me | O |
| C-0837 | Me | CH(Me) | Me | $CH_2CF_3$ | H | Me | C(=O)Me | O |
| C-0838 | H | $CH_2CH_2$ | Me | $CH_2CF_3$ | H | Me | C(=O)Me | O |
| C-0839 | Me | $CH_2CH_2$ | H | $CH_2CF_3$ | H | Me | C(=O)Me | O |
| C-0840 | Me | $CH_2CH_2$ | Me | $CH_2CF_3$ | H | Me | C(=O)Me | O |
| C-0841 | H | single bond | Me | Et | H | Cl | C(=O)Me | O |
| C-0842 | Me | single bond | H | Et | H | Cl | C(=O)Me | O |
| C-0843 | Me(R) | single bond | H | Et | H | Cl | C(=O)Me | O |
| C-0844 | Me(S) | single bond | H | Et | H | Cl | C(=O)Me | O |
| C-0845 | Me | single bond | H | Et | H | Cl | C(=O)Me | S |
| C-0846 | Me(R) | single bond | H | Et | H | Cl | C(=O)Me | S |
| C-0847 | Me(S) | single bond | H | Et | H | Cl | C(=O)Me | S |
| C-0848 | Me | single bond | Me | Et | H | Cl | C(=O)Me | O |
| C-0849 | H | $CH_2$ | Me | Et | H | Cl | C(=O)Me | O |
| C-0850 | Me | $CH_2$ | H | Et | H | Cl | C(=O)Me | O |
| C-0851 | Me | $CH_2$ | Me | Et | H | Cl | C(=O)Me | O |
| C-0852 | H | CH(Me) | H | Et | H | Cl | C(=O)Me | O |
| C-0853 | H | CH(Me) | Me | Et | H | Cl | C(=O)Me | O |
| C-0854 | Me | CH(Me) | H | Et | H | Cl | C(=O)Me | O |

TABLE 246-continued

| Compound Number | Y | W | Z | $R^1$ | $R^2$ | $R^3$ | $R^{10}$ | A |
|---|---|---|---|---|---|---|---|---|
| C-0855 | Me | CH(Me) | Me | Et | H | Cl | C(=O)Me | O |
| C-0856 | H | $CH_2CH_2$ | Me | Et | H | Cl | C(=O)Me | O |
| C-0857 | Me | $CH_2CH_2$ | H | Et | H | Cl | C(=O)Me | O |
| C-0858 | Me | $CH_2CH_2$ | Me | Et | H | Cl | C(=O)Me | O |
| C-0859 | H | single bond | Me | Et | H | Me | C(=O)Me | O |
| C-0860 | Me | single bond | H | Et | H | Me | C(=O)Me | O |
| C-0861 | Me(R) | single bond | H | Et | H | Me | C(=O)Me | O |
| C-0862 | Me(S) | single bond | H | Et | H | Me | C(=O)Me | O |
| C-0863 | Me | single bond | H | Et | H | Me | C(=O)Me | S |
| C-0864 | Me(R) | single bond | H | Et | H | Me | C(=O)Me | S |
| C-0865 | Me(S) | single bond | H | Et | H | Me | C(=O)Me | S |
| C-0866 | Me | single bond | Me | Et | H | Me | C(=O)Me | O |
| C-0867 | H | $CH_2$ | Me | Et | H | Me | C(=O)Me | O |
| C-0868 | Me | $CH_2$ | H | Et | H | Me | C(=O)Me | O |
| C-0869 | Me | $CH_2$ | Me | Et | H | Me | C(=O)Me | O |
| C-0870 | H | CH(Me) | H | Et | H | Me | C(=O)Me | O |
| C-0871 | H | CH(Me) | Me | Et | H | Me | C(=O)Me | O |
| C-0872 | Me | CH(Me) | H | Et | H | Me | C(=O)Me | O |
| C-0873 | Me | CH(Me) | Me | Et | H | Me | C(=O)Me | O |
| C-0874 | H | $CH_2CH_2$ | Me | Et | H | Me | C(=O)Me | O |

TABLE 247

| Compound Number | Y | W | Z | $R^1$ | $R^2$ | $R^3$ | $R^{10}$ | A |
|---|---|---|---|---|---|---|---|---|
| C-0875 | Me | $CH_2CH_2$ | H | Et | H | Me | C(=O)Me | O |
| C-0876 | Me | $CH_2CH_2$ | Me | Et | H | Me | C(=O)Me | O |
| C-0877 | H | single bond | Me | c-Pr | H | Cl | C(=O)Me | O |
| C-0878 | Me | single bond | H | c-Pr | H | Cl | C(=O)Me | O |
| C-0879 | Me(R) | single bond | H | c-Pr | H | Cl | C(=O)Me | O |
| C-0880 | Me(S) | single bond | H | c-Pr | H | Cl | C(=O)Me | O |
| C-0881 | Me | single bond | H | c-Pr | H | Cl | C(=O)Me | S |
| C-0882 | Me(R) | single bond | H | c-Pr | H | Cl | C(=O)Me | S |
| C-0883 | Me(S) | single bond | H | c-Pr | H | Cl | C(=O)Me | S |
| C-0884 | Me | single bond | Me | c-Pr | H | Cl | C(=O)Me | O |
| C-0885 | H | $CH_2$ | Me | c-Pr | H | Cl | C(=O)Me | O |
| C-0886 | Me | $CH_2$ | H | c-Pr | H | Cl | C(=O)Me | O |
| C-0887 | Me | $CH_2$ | Me | c-Pr | H | Cl | C(=O)Me | O |
| C-0888 | H | CH(Me) | H | c-Pr | H | Cl | C(=O)Me | O |
| C-0889 | H | CH(Me) | Me | c-Pr | H | Cl | C(=O)Me | O |
| C-0890 | Me | CH(Me) | H | c-Pr | H | Cl | C(=O)Me | O |
| C-0891 | Me | CH(Me) | Me | c-Pr | H | Cl | C(=O)Me | O |
| C-0892 | H | $CH_2CH_2$ | Me | c-Pr | H | Cl | C(=O)Me | O |
| C-0893 | Me | $CH_2CH_2$ | H | c-Pr | H | Cl | C(=O)Me | O |
| C-0894 | Me | $CH_2CH_2$ | Me | c-Pr | H | Cl | C(=O)Me | O |
| C-0895 | H | single bond | Me | c-Pr | H | Me | C(=O)Me | O |
| C-0896 | Me | single bond | H | c-Pr | H | Me | C(=O)Me | O |
| C-0897 | Me(R) | single bond | H | c-Pr | H | Me | C(=O)Me | O |
| C-0898 | Me(S) | single bond | H | c-Pr | H | Me | C(=O)Me | O |
| C-0899 | Me | single bond | H | c-Pr | H | Me | C(=O)Me | S |
| C-0900 | Me(R) | single bond | H | c-Pr | H | Me | C(=O)Me | S |
| C-0901 | Me(S) | single bond | H | c-Pr | H | Me | C(=O)Me | S |
| C-0902 | Me | single bond | Me | c-Pr | H | Me | C(=O)Me | O |
| C-0903 | H | $CH_2$ | Me | c-Pr | H | Me | C(=O)Me | O |
| C-0904 | Me | $CH_2$ | H | c-Pr | H | Me | C(=O)Me | O |
| C-0905 | Me | $CH_2$ | Me | c-Pr | H | Me | C(=O)Me | O |
| C-0906 | H | CH(Me) | H | c-Pr | H | Me | C(=O)Me | O |
| C-0907 | H | CH(Me) | Me | c-Pr | H | Me | C(=O)Me | O |
| C-0908 | Me | CH(Me) | H | c-Pr | H | Me | C(=O)Me | O |
| C-0909 | Me | CH(Me) | Me | c-Pr | H | Me | C(=O)Me | O |
| C-0910 | H | $CH_2CH_2$ | Me | c-Pr | H | Me | C(=O)Me | O |
| C-0911 | Me | $CH_2CH_2$ | H | c-Pr | H | Me | C(=O)Me | O |
| C-0912 | Me | $CH_2CH_2$ | Me | c-Pr | H | Me | C(=O)Me | O |
| C-0913 | H | single bond | Me | $CH_2CF_3$ | H | Cl | C(=O)OEt | O |
| C-0914 | Me | single bond | H | $CH_2CF_3$ | H | Cl | C(=O)OEt | O |
| C-0915 | Me(R) | single bond | H | $CH_2CF_3$ | H | Cl | C(=O)OEt | O |
| C-0916 | Me(S) | single bond | H | $CH_2CF_3$ | H | Cl | C(=O)OEt | O |
| C-0917 | Me | single bond | H | $CH_2CF_3$ | H | Cl | C(=O)OEt | S |
| C-0918 | Me(R) | single bond | H | $CH_2CF_3$ | H | Cl | C(=O)OEt | S |

TABLE 248

| Compound Number | Y | W | Z | $R^1$ | $R^2$ | $R^3$ | $R^{10}$ | A |
|---|---|---|---|---|---|---|---|---|
| C-0919 | Me(S) | single bond | H | $CH_2CF_3$ | H | Cl | C(=O)OEt | S |
| C-0920 | Me | single bond | Me | $CH_2CF_3$ | H | Cl | C(=O)OEt | O |
| C-0921 | H | $CH_2$ | Me | $CH_2CF_3$ | H | Cl | C(=O)OEt | O |
| C-0922 | Me | $CH_2$ | H | $CH_2CF_3$ | H | Cl | C(=O)OEt | O |
| C-0923 | Me | $CH_2$ | Me | $CH_2CF_3$ | H | Cl | C(=O)OEt | O |
| C-0924 | H | CH(Me) | H | $CH_2CF_3$ | H | Cl | C(=O)OEt | O |
| C-0925 | H | CH(Me) | Me | $CH_2CF_3$ | H | Cl | C(=O)OEt | O |
| C-0926 | Me | CH(Me) | H | $CH_2CF_3$ | H | Cl | C(=O)OEt | O |
| C-0927 | Me | CH(Me) | Me | $CH_2CF_3$ | H | Cl | C(=O)OEt | O |
| C-0928 | H | $CH_2CH_2$ | Me | $CH_2CF_3$ | H | Cl | C(=O)OEt | O |
| C-0929 | Me | $CH_2CH_2$ | H | $CH_2CF_3$ | H | Cl | C(=O)OEt | O |
| C-0930 | Me | $CH_2CH_2$ | Me | $CH_2CF_3$ | H | Cl | C(=O)OEt | O |
| C-0931 | H | single bond | Me | $CH_2CF_3$ | H | Me | C(=O)OEt | O |
| C-0932 | Me | single bond | H | $CH_2CF_3$ | H | Me | C(=O)OEt | O |
| C-0933 | Me(R) | single bond | H | $CH_2CF_3$ | H | Me | C(=O)OEt | O |
| C-0934 | Me(S) | single bond | H | $CH_2CF_3$ | H | Me | C(=O)OEt | O |
| C-0935 | Me | single bond | H | $CH_2CF_3$ | H | Me | C(=O)OEt | S |
| C-0936 | Me(R) | single bond | H | $CH_2CF_3$ | H | Me | C(=O)OEt | S |
| C-0937 | Me(S) | single bond | H | $CH_2CF_3$ | H | Me | C(=O)OEt | S |
| C-0938 | Me | single bond | Me | $CH_2CF_3$ | H | Me | C(=O)OEt | O |
| C-0939 | H | $CH_2$ | Me | $CH_2CF_3$ | H | Me | C(=O)OEt | O |
| C-0940 | Me | $CH_2$ | H | $CH_2CF_3$ | H | Me | C(=O)OEt | O |
| C-0941 | Me | $CH_2$ | Me | $CH_2CF_3$ | H | Me | C(=O)OEt | O |
| C-0942 | H | CH(Me) | H | $CH_2CF_3$ | H | Me | C(=O)OEt | O |
| C-0943 | H | CH(Me) | Me | $CH_2CF_3$ | H | Me | C(=O)OEt | O |
| C-0944 | Me | CH(Me) | H | $CH_2CF_3$ | H | Me | C(=O)OEt | O |
| C-0945 | Me | CH(Me) | Me | $CH_2CF_3$ | H | Me | C(=O)OEt | O |
| C-0946 | H | $CH_2CH_2$ | Me | $CH_2CF_3$ | H | Me | C(=O)OEt | O |
| C-0947 | Me | $CH_2CH_2$ | H | $CH_2CF_3$ | H | Me | C(=O)OEt | O |
| C-0948 | Me | $CH_2CH_2$ | Me | $CH_2CF_3$ | H | Me | C(=O)OEt | O |
| C-0949 | H | single bond | Me | Et | H | Cl | C(=O)OEt | O |
| C-0950 | Me | single bond | H | Et | H | Cl | C(=O)OEt | O |
| C-0951 | Me(R) | single bond | H | Et | H | Cl | C(=O)OEt | O |
| C-0952 | Me(S) | single bond | H | Et | H | Cl | C(=O)OEt | O |
| C-0953 | Me | single bond | H | Et | H | Cl | C(=O)OEt | S |
| C-0954 | Me(R) | single bond | H | Et | H | Cl | C(=O)OEt | S |
| C-0955 | Me(S) | single bond | H | Et | H | Cl | C(=O)OEt | S |
| C-0956 | Me | single bond | Me | Et | H | Cl | C(=O)OEt | O |
| C-0957 | H | $CH_2$ | Me | Et | H | Cl | C(=O)OEt | O |
| C-0958 | Me | $CH_2$ | H | Et | H | Cl | C(=O)OEt | O |
| C-0959 | Me | $CH_2$ | Me | Et | H | Cl | C(=O)OEt | O |
| C-0960 | H | CH(Me) | H | Et | H | Cl | C(=O)OEt | O |
| C-0961 | H | CH(Me) | Me | Et | H | Cl | C(=O)OEt | O |
| C-0962 | Me | CH(Me) | H | Et | H | Cl | C(=O)OEt | O |

TABLE 249

| Compound Number | Y | W | Z | $R^1$ | $R^2$ | $R^3$ | $R^{10}$ | A |
|---|---|---|---|---|---|---|---|---|
| C-0963 | Me | CH(Me) | Me | Et | H | Cl | C(=O)OEt | O |
| C-0964 | H | $CH_2CH_2$ | Me | Et | H | Cl | C(=O)OEt | O |
| C-0965 | Me | $CH_2CH_2$ | H | Et | H | Cl | C(=O)OEt | O |
| C-0966 | Me | $CH_2CH_2$ | Me | Et | H | Cl | C(=O)OEt | O |
| C-0967 | H | single bond | Me | Et | H | Me | C(=O)OEt | O |
| C-0968 | Me | single bond | H | Et | H | Me | C(=O)OEt | O |
| C-0969 | Me(R) | single bond | H | Et | H | Me | C(=O)OEt | O |
| C-0970 | Me(S) | single bond | H | Et | H | Me | C(=O)OEt | O |
| C-0971 | Me | single bond | H | Et | H | Me | C(=O)OEt | S |
| C-0972 | Me(R) | single bond | H | Et | H | Me | C(=O)OEt | S |
| C-0973 | Me(S) | single bond | H | Et | H | Me | C(=O)OEt | S |
| C-0974 | Me | single bond | Me | Et | H | Me | C(=O)OEt | O |
| C-0975 | H | $CH_2$ | Me | Et | H | Me | C(=O)OEt | O |
| C-0976 | Me | $CH_2$ | H | Et | H | Me | C(=O)OEt | O |
| C-0977 | Me | $CH_2$ | Me | Et | H | Me | C(=O)OEt | O |
| C-0978 | H | CH(Me) | H | Et | H | Me | C(=O)OEt | O |
| C-0979 | H | CH(Me) | Me | Et | H | Me | C(=O)OEt | O |
| C-0980 | Me | CH(Me) | H | Et | H | Me | C(=O)OEt | O |
| C-0981 | Me | CH(Me) | Me | Et | H | Me | C(=O)OEt | O |
| C-0982 | H | $CH_2CH_2$ | Me | Et | H | Me | C(=O)OEt | O |
| C-0983 | Me | $CH_2CH_2$ | H | Et | H | Me | C(=O)OEt | O |
| C-0984 | Me | $CH_2CH_2$ | Me | Et | H | Me | C(=O)OEt | O |
| C-0985 | H | single bond | Me | c-Pr | H | Cl | C(=O)OEt | O |
| C-0986 | Me | single bond | H | c-Pr | H | Cl | C(=O)OEt | O |

TABLE 249-continued

| Compound Number | Y | W | Z | $R^1$ | $R^2$ | $R^3$ | $R^{10}$ | A |
|---|---|---|---|---|---|---|---|---|
| C-0987 | Me(R) | single bond | H | c-Pr | H | Cl | C(=O)OEt | O |
| C-0988 | Me(S) | single bond | H | c-Pr | H | Cl | C(=O)OEt | O |
| C-0989 | Me | single bond | H | c-Pr | H | Cl | C(=O)OEt | S |
| C-0990 | Me(R) | single bond | H | c-Pr | H | Cl | C(=O)OEt | S |
| C-0991 | Me(S) | single bond | H | c-Pr | H | Cl | C(=O)OEt | S |
| C-0992 | Me | single bond | Me | c-Pr | H | Cl | C(=O)OEt | O |
| C-0993 | H | $CH_2$ | Me | c-Pr | H | Cl | C(=O)OEt | O |
| C-0994 | Me | $CH_2$ | H | c-Pr | H | Cl | C(=O)OEt | O |
| C-0995 | Me | $CH_2$ | Me | c-Pr | H | Cl | C(=O)OEt | O |
| C-0996 | H | CH(Me) | H | c-Pr | H | Cl | C(=O)OEt | O |
| C-0997 | H | CH(Me) | Me | c-Pr | H | Cl | C(=O)OEt | O |
| C-0998 | Me | CH(Me) | H | c-Pr | H | Cl | C(=O)OEt | O |
| C-0999 | Me | CH(Me) | Me | c-Pr | H | Cl | C(=O)OEt | O |
| C-1000 | H | $CH_2CH_2$ | Me | c-Pr | H | Cl | C(=O)OEt | O |
| C-1001 | Me | $CH_2CH_2$ | H | c-Pr | H | Cl | C(=O)OEt | O |
| C-1002 | Me | $CH_2CH_2$ | Me | c-Pr | H | Cl | C(=O)OEt | O |
| C-1003 | H | single bond | Me | c-Pr | H | Me | C(=O)OEt | O |
| C-1004 | Me | single bond | H | c-Pr | H | Me | C(=O)OEt | O |
| C-1005 | Me(R) | single bond | H | c-Pr | H | Me | C(=O)OEt | O |
| C-1006 | Me(S) | single bond | H | c-Pr | H | Me | C(=O)OEt | O |

TABLE 250

| Compound Number | Y | W | Z | $R^1$ | $R^2$ | $R^3$ | $R^{10}$ | A |
|---|---|---|---|---|---|---|---|---|
| C-1007 | Me | single bond | H | c-Pr | H | Me | C(=O)OEt | S |
| C-1008 | Me(R) | single bond | H | c-Pr | H | Me | C(=O)OEt | S |
| C-1009 | Me(S) | single bond | H | c-Pr | H | Me | C(=O)OEt | S |
| C-1010 | Me | single bond | Me | c-Pr | H | Me | C(=O)OEt | O |
| C-1011 | H | $CH_2$ | Me | c-Pr | H | Me | C(=O)OEt | O |
| C-1012 | Me | $CH_2$ | H | c-Pr | H | Me | C(=O)OEt | O |
| C-1013 | Me | $CH_2$ | Me | c-Pr | H | Me | C(=O)OEt | O |
| C-1014 | H | CH(Me) | H | c-Pr | H | Me | C(=O)OEt | O |
| C-1015 | H | CH(Me) | Me | c-Pr | H | Me | C(=O)OEt | O |
| C-1016 | Me | CH(Me) | H | c-Pr | H | Me | C(=O)OEt | O |
| C-1017 | Me | CH(Me) | Me | c-Pr | H | Me | C(=O)OEt | O |
| C-1018 | H | $CH_2CH_2$ | Me | c-Pr | H | Me | C(=O)OEt | O |
| C-1019 | Me | $CH_2CH_2$ | H | c-Pr | H | Me | C(=O)OEt | O |
| C-1020 | Me | $CH_2CH_2$ | Me | c-Pr | H | Me | C(=O)OEt | O |
| C-1021 | H | single bond | Me | $CH_2CF_3$ | Me | Cl | Me | O |
| C-1022 | H | single bond | Et | $CH_2CF_3$ | Me | Cl | Me | O |
| C-1023 | Me | single bond | H | $CH_2CF_3$ | Me | Cl | Me | O |
| C-1024 | Me(R) | single bond | H | $CH_2CF_3$ | Me | Cl | Me | O |
| C-1025 | Me(S) | single bond | H | $CH_2CF_3$ | Me | Cl | Me | O |
| C-1026 | H | $CH_2$ | Me | $CH_2CF_3$ | Me | Cl | Me | O |
| C-1027 | Me | $CH_2$ | H | $CH_2CF_3$ | Me | Cl | Me | O |
| C-1028 | H | CH(Me) | H | $CH_2CF_3$ | Me | Cl | Me | O |
| C-1029 | H | $CH_2CH_2$ | Me | $CH_2CF_3$ | Me | Cl | Me | O |
| C-1030 | Me | $CH_2CH_2$ | H | $CH_2CF_3$ | Me | Cl | Me | O |
| C-1031 | H | single bond | Me | $CH_2CF_3$ | Me | Me | Me | O |
| C-1032 | Me | single bond | H | $CH_2CF_3$ | Me | Me | Me | O |
| C-1033 | Me(R) | single bond | H | $CH_2CF_3$ | Me | Me | Me | O |
| C-1034 | Me(S) | single bond | H | $CH_2CF_3$ | Me | Me | Me | O |
| C-1035 | H | $CH_2$ | Me | $CH_2CF_3$ | Me | Me | Me | O |
| C-1036 | Me | $CH_2$ | H | $CH_2CF_3$ | Me | Me | Me | O |
| C-1037 | H | CH(Me) | H | $CH_2CF_3$ | Me | Me | Me | O |
| C-1038 | H | $CH_2CH_2$ | Me | $CH_2CF_3$ | Me | Me | Me | O |
| C-1039 | Me | $CH_2CH_2$ | H | $CH_2CF_3$ | Me | Me | Me | O |
| C-1040 | H | single bond | Me | $CH_2CF_3$ | Me | Cl | Et | O |
| C-1041 | Me | single bond | H | $CH_2CF_3$ | Me | Cl | Et | O |

TABLE 250-continued

| Compound Number | Y | W | Z | $R^1$ | $R^2$ | $R^3$ | $R^{10}$ | A |
|---|---|---|---|---|---|---|---|---|
| C-1042 | Me(R) | single bond | H | $CH_2CF_3$ | Me | Cl | Et | O |
| C-1043 | Me(S) | single bond | H | $CH_2CF_3$ | Me | Cl | Et | O |
| C-1044 | H | $CH_2$ | Me | $CH_2CF_3$ | Me | Cl | Et | O |
| C-1045 | Me | $CH_2$ | H | $CH_2CF_3$ | Me | Cl | Et | O |
| C-1046 | H | CH(Me) | H | $CH_2CF_3$ | Me | Cl | Et | O |
| C-1047 | H | $CH_2CH_2$ | Me | $CH_2CF_3$ | Me | Cl | Et | O |
| C-1048 | Me | $CH_2CH_2$ | H | $CH_2CF_3$ | Me | Cl | Et | O |
| C-1049 | H | single bond | Me | $CH_2CF_3$ | Me | Me | Et | O |
| C-1050 | Me | single bond | H | $CH_2CF_3$ | Me | Me | Et | O |

TABLE 251

| Compound Number | Y | W | Z | $R^1$ | $R^2$ | $R^3$ | $R^{10}$ | A |
|---|---|---|---|---|---|---|---|---|
| C-1051 | Me(R) | single bond | H | $CH_2CF_3$ | Me | Me | Et | O |
| C-1052 | Me(S) | single bond | H | $CH_2CF_3$ | Me | Me | Et | O |
| C-1053 | H | $CH_2$ | Me | $CH_2CF_3$ | Me | Me | Et | O |
| C-1054 | Me | $CH_2$ | H | $CH_2CF_3$ | Me | Me | Et | O |
| C-1055 | H | CH(Me) | H | $CH_2CF_3$ | Me | Me | Et | O |
| C-1056 | H | $CH_2CH_2$ | Me | $CH_2CF_3$ | Me | Me | Et | O |
| C-1057 | Me | $CH_2CH_2$ | H | $CH_2CF_3$ | Me | Me | Et | O |
| C-1058 | H | single bond | Me | $CH_2CF_3$ | Me | Cl | $CH_2CF_3$ | O |
| C-1059 | Me | single bond | H | $CH_2CF_3$ | Me | Cl | $CH_2CF_3$ | O |
| C-1060 | Me(R) | single bond | H | $CH_2CF_3$ | Me | Cl | $CH_2CF_3$ | O |
| C-1061 | Me(S) | single bond | H | $CH_2CF_3$ | Me | Cl | $CH_2CF_3$ | O |
| C-1062 | H | $CH_2$ | Me | $CH_2CF_3$ | Me | Cl | $CH_2CF_3$ | O |
| C-1063 | Me | $CH_2$ | H | $CH_2CF_3$ | Me | Cl | $CH_2CF_3$ | O |
| C-1064 | H | CH(Me) | H | $CH_2CF_3$ | Me | Cl | $CH_2CF_3$ | O |
| C-1065 | H | $CH_2CH_2$ | Me | $CH_2CF_3$ | Me | Cl | $CH_2CF_3$ | O |
| C-1066 | Me | $CH_2CH_2$ | H | $CH_2CF_3$ | Me | Cl | $CH_2CF_3$ | O |
| C-1067 | H | single bond | Me | $CH_2CF_3$ | Me | Me | $CH_2CF_3$ | O |
| C-1068 | Me | single bond | H | $CH_2CF_3$ | Me | Me | $CH_2CF_3$ | O |
| C-1069 | Me(R) | single bond | H | $CH_2CF_3$ | Me | Me | $CH_2CF_3$ | O |
| C-1070 | Me(S) | single bond | H | $CH_2CF_3$ | Me | Me | $CH_2CF_3$ | O |
| C-1071 | H | $CH_2$ | Me | $CH_2CF_3$ | Me | Me | $CH_2CF_3$ | O |
| C-1072 | Me | $CH_2$ | H | $CH_2CF_3$ | Me | Me | $CH_2CF_3$ | O |
| C-1073 | H | CH(Me) | H | $CH_2CF_3$ | Me | Me | $CH_2CF_3$ | O |
| C-1074 | H | $CH_2CH_2$ | Me | $CH_2CF_3$ | Me | Me | $CH_2CF_3$ | O |
| C-1075 | Me | $CH_2CH_2$ | H | $CH_2CF_3$ | Me | Me | $CH_2CF_3$ | O |
| C-1076 | H | single bond | Me | $CH_2CF_3$ | Me | Cl | $CH_2OMe$ | O |
| C-1077 | Me | single bond | H | $CH_2CF_3$ | Me | Cl | $CH_2OMe$ | O |
| C-1078 | Me(R) | single bond | H | $CH_2CF_3$ | Me | Cl | $CH_2OMe$ | O |
| C-1079 | Me(S) | single bond | H | $CH_2CF_3$ | Me | Cl | $CH_2OMe$ | O |
| C-1080 | H | $CH_2$ | Me | $CH_2CF_3$ | Me | Cl | $CH_2OMe$ | O |
| C-1081 | Me | $CH_2$ | H | $CH_2CF_3$ | Me | Cl | $CH_2OMe$ | O |
| C-1082 | H | CH(Me) | H | $CH_2CF_3$ | Me | Cl | $CH_2OMe$ | O |
| C-1083 | H | $CH_2CH_2$ | Me | $CH_2CF_3$ | Me | Cl | $CH_2OMe$ | O |
| C-1084 | Me | $CH_2CH_2$ | H | $CH_2CF_3$ | Me | Cl | $CH_2OMe$ | O |
| C-1085 | H | single bond | Me | $CH_2CF_3$ | Me | Me | $CH_2OMe$ | O |
| C-1086 | Me | single bond | H | $CH_2CF_3$ | Me | Me | $CH_2OMe$ | O |
| C-1087 | Me(R) | single bond | H | $CH_2CF_3$ | Me | Me | $CH_2OMe$ | O |
| C-1088 | Me(S) | single bond | H | $CH_2CF_3$ | Me | Me | $CH_2OMe$ | O |
| C-1089 | H | $CH_2$ | Me | $CH_2CF_3$ | Me | Me | $CH_2OMe$ | O |
| C-1090 | Me | $CH_2$ | H | $CH_2CF_3$ | Me | Me | $CH_2OMe$ | O |
| C-1091 | H | CH(Me) | H | $CH_2CF_3$ | Me | Me | $CH_2OMe$ | O |
| C-1092 | H | $CH_2CH_2$ | Me | $CH_2CF_3$ | Me | Me | $CH_2OMe$ | O |
| C-1093 | Me | $CH_2CH_2$ | H | $CH_2CF_3$ | Me | Me | $CH_2OMe$ | O |
| C-1094 | H | single bond | Me | $CH_2CF_3$ | Me | Cl | $CH_2CN$ | O |

TABLE 252

| Compound Number | Y | W | Z | $R^1$ | $R^2$ | $R^3$ | $R^{10}$ | A |
|---|---|---|---|---|---|---|---|---|
| C-1095 | Me | single bond | H | $CH_2CF_3$ | Me | Cl | $CH_2CN$ | O |
| C-1096 | Me(R) | single bond | H | $CH_2CF_3$ | Me | Cl | $CH_2CN$ | O |
| C-1097 | Me(S) | single bond | H | $CH_2CF_3$ | Me | Cl | $CH_2CN$ | O |
| C-1098 | H | $CH_2$ | Me | $CH_2CF_3$ | Me | Cl | $CH_2CN$ | O |
| C-1099 | Me | $CH_2$ | H | $CH_2CF_3$ | Me | Cl | $CH_2CN$ | O |
| C-1100 | H | CH(Me) | H | $CH_2CF_3$ | Me | Cl | $CH_2CN$ | O |

TABLE 252-continued

| Compound Number | Y | W | Z | $R^1$ | $R^2$ | $R^3$ | $R^{10}$ | A |
|---|---|---|---|---|---|---|---|---|
| C-1101 | H | $CH_2CH_2$ | Me | $CH_2CF_3$ | Me | Cl | $CH_2CN$ | O |
| C-1102 | Me | $CH_2CH_2$ | H | $CH_2CF_3$ | Me | Cl | $CH_2CN$ | O |
| C-1103 | H | single bond | Me | $CH_2CF_3$ | Me | Me | $CH_2CN$ | O |
| C-1104 | Me | single bond | H | $CH_2CF_3$ | Me | Me | $CH_2CN$ | O |
| C-1105 | Me(R) | single bond | H | $CH_2CF_3$ | Me | Me | $CH_2CN$ | O |
| C-1106 | Me(S) | single bond | H | $CH_2CF_3$ | Me | Me | $CH_2CN$ | O |
| C-1107 | H | $CH_2$ | Me | $CH_2CF_3$ | Me | Me | $CH_2CN$ | O |
| C-1108 | Me | $CH_2$ | H | $CH_2CF_3$ | Me | Me | $CH_2CN$ | O |
| C-1109 | H | CH(Me) | H | $CH_2CF_3$ | Me | Me | $CH_2CN$ | O |
| C-1110 | H | $CH_2CH_2$ | Me | $CH_2CF_3$ | Me | Me | $CH_2CN$ | O |
| C-1111 | Me | $CH_2CH_2$ | H | $CH_2CF_3$ | Me | Me | $CH_2CN$ | O |
| C-1112 | H | single bond | Me | $CH_2CF_3$ | Me | Cl | C(═O)Me | O |
| C-1113 | Me | single bond | H | $CH_2CF_3$ | Me | Cl | C(═O)Me | O |
| C-1114 | Me(R) | single bond | H | $CH_2CF_3$ | Me | Cl | C(═O)Me | O |
| C-1115 | Me(S) | single bond | H | $CH_2CF_3$ | Me | Cl | C(═O)Me | O |
| C-1116 | H | $CH_2$ | Me | $CH_2CF_3$ | Me | Cl | C(═O)Me | O |
| C-1117 | Me | $CH_2$ | H | $CH_2CF_3$ | Me | Cl | C(═O)Me | O |
| C-1118 | H | CH(Me) | H | $CH_2CF_3$ | Me | Cl | C(═O)Me | O |
| C-1119 | H | $CH_2CH_2$ | Me | $CH_2CF_3$ | Me | Cl | C(═O)Me | O |
| C-1120 | Me | $CH_2CH_2$ | H | $CH_2CF_3$ | Me | Cl | C(═O)Me | O |
| C-1121 | H | single bond | Me | $CH_2CF_3$ | Me | Me | C(═O)Me | O |
| C-1122 | Me | single bond | H | $CH_2CF_3$ | Me | Me | C(═O)Me | O |
| C-1123 | Me(R) | single bond | H | $CH_2CF_3$ | Me | Me | C(═O)Me | O |
| C-1124 | Me(S) | single bond | H | $CH_2CF_3$ | Me | Me | C(═O)Me | O |
| C-1125 | H | $CH_2$ | Me | $CH_2CF_3$ | Me | Me | C(═O)Me | O |
| C-1126 | Me | $CH_2$ | H | $CH_2CF_3$ | Me | Me | C(═O)Me | O |
| C-1127 | H | CH(Me) | H | $CH_2CF_3$ | Me | Me | C(═O)Me | O |
| C-1128 | H | $CH_2CH_2$ | Me | $CH_2CF_3$ | Me | Me | C(═O)Me | O |
| C-1129 | Me | $CH_2CH_2$ | H | $CH_2CF_3$ | Me | Me | C(═O)Me | O |
| C-1130 | H | single bond | Me | $CH_2CF_3$ | $CH_2OMe$ | Cl | Me | O |
| C-1131 | H | single bond | Et | $CH_2CF_3$ | $CH_2OMe$ | Cl | Me | O |
| C-1132 | Me | single bond | H | $CH_2CF_3$ | $CH_2OMe$ | Cl | Me | O |
| C-1133 | Me(R) | single bond | H | $CH_2CF_3$ | $CH_2OMe$ | Cl | Me | O |
| C-1134 | Me(S) | single bond | H | $CH_2CF_3$ | $CH_2OMe$ | Cl | Me | O |
| C-1135 | H | $CH_2$ | Me | $CH_2CF_3$ | $CH_2OMe$ | Cl | Me | O |
| C-1136 | Me | $CH_2$ | H | $CH_2CF_3$ | $CH_2OMe$ | Cl | Me | O |
| C-1137 | H | CH(Me) | H | $CH_2CF_3$ | $CH_2OMe$ | Cl | Me | O |
| C-1138 | H | $CH_2CH_2$ | Me | $CH_2CF_3$ | $CH_2OMe$ | Cl | Me | O |

TABLE 253

| Compound Number | Y | W | Z | $R^1$ | $R^2$ | $R^3$ | $R^{10}$ | A |
|---|---|---|---|---|---|---|---|---|
| C-1139 | Me | $CH_2CH_2$ | H | $CH_2CF_3$ | $CH_2OMe$ | Cl | Me | O |
| C-1140 | H | single bond | Me | $CH_2CF_3$ | $CH_2OMe$ | Me | Me | O |
| C-1141 | Me | single bond | H | $CH_2CF_3$ | $CH_2OMe$ | Me | Me | O |
| C-1142 | Me(R) | single bond | H | $CH_2CF_3$ | $CH_2OMe$ | Me | Me | O |
| C-1143 | Me(S) | single bond | H | $CH_2CF_3$ | $CH_2OMe$ | Me | Me | O |
| C-1144 | H | $CH_2$ | Me | $CH_2CF_3$ | $CH_2OMe$ | Me | Me | O |
| C-1145 | Me | $CH_2$ | H | $CH_2CF_3$ | $CH_2OMe$ | Me | Me | O |
| C-1146 | H | CH(Me) | H | $CH_2CF_3$ | $CH_2OMe$ | Me | Me | O |
| C-1147 | H | $CH_2CH_2$ | Me | $CH_2CF_3$ | $CH_2OMe$ | Me | Me | O |
| C-1148 | Me | $CH_2CH_2$ | H | $CH_2CF_3$ | $CH_2OMe$ | Me | Me | O |
| C-1149 | H | single bond | Me | $CH_2CF_3$ | $CH_2OMe$ | Cl | Et | O |
| C-1150 | Me | single bond | H | $CH_2CF_3$ | $CH_2OMe$ | Cl | Et | O |
| C-1151 | Me(R) | single bond | H | $CH_2CF_3$ | $CH_2OMe$ | Cl | Et | O |
| C-1152 | Me(S) | single bond | H | $CH_2CF_3$ | $CH_2OMe$ | Cl | Et | O |
| C-1153 | H | $CH_2$ | Me | $CH_2CF_3$ | $CH_2OMe$ | Cl | Et | O |
| C-1154 | Me | $CH_2$ | H | $CH_2CF_3$ | $CH_2OMe$ | Cl | Et | O |
| C-1155 | H | CH(Me) | H | $CH_2CF_3$ | $CH_2OMe$ | Cl | Et | O |
| C-1156 | H | $CH_2CH_2$ | Me | $CH_2CF_3$ | $CH_2OMe$ | Cl | Et | O |
| C-1157 | Me | $CH_2CH_2$ | H | $CH_2CF_3$ | $CH_2OMe$ | Cl | Et | O |
| C-1158 | H | single bond | Me | $CH_2CF_3$ | $CH_2OMe$ | Me | Et | O |
| C-1159 | Me | single bond | H | $CH_2CF_3$ | $CH_2OMe$ | Me | Et | O |
| C-1160 | Me(R) | single bond | H | $CH_2CF_3$ | $CH_2OMe$ | Me | Et | O |
| C-1161 | Me(S) | single bond | H | $CH_2CF_3$ | $CH_2OMe$ | Me | Et | O |
| C-1162 | H | $CH_2$ | Me | $CH_2CF_3$ | $CH_2OMe$ | Me | Et | O |
| C-1163 | Me | $CH_2$ | H | $CH_2CF_3$ | $CH_2OMe$ | Me | Et | O |
| C-1164 | H | CH(Me) | H | $CH_2CF_3$ | $CH_2OMe$ | Me | Et | O |
| C-1165 | H | $CH_2CH_2$ | Me | $CH_2CF_3$ | $CH_2OMe$ | Me | Et | O |
| C-1166 | Me | $CH_2CH_2$ | H | $CH_2CF_3$ | $CH_2OMe$ | Me | Et | O |
| C-1167 | H | single bond | Me | $CH_2CF_3$ | $CH_2OMe$ | Cl | $CH_2CF_3$ | O |

TABLE 253-continued

| Compound Number | Y | W | Z | $R^1$ | $R^2$ | $R^3$ | $R^{10}$ | A |
|---|---|---|---|---|---|---|---|---|
| C-1168 | Me | single bond | H | $CH_2CF_3$ | $CH_2OMe$ | Cl | $CH_2CF_3$ | O |
| C-1169 | Me(R) | single bond | H | $CH_2CF_3$ | $CH_2OMe$ | Cl | $CH_2CF_3$ | O |
| C-1170 | Me(S) | single bond | H | $CH_2CF_3$ | $CH_2OMe$ | Cl | $CH_2CF_3$ | O |
| C-1171 | H | $CH_2$ | Me | $CH_2CF_3$ | $CH_2OMe$ | Cl | $CH_2CF_3$ | O |
| C-1172 | Me | $CH_2$ | H | $CH_2CF_3$ | $CH_2OMe$ | Cl | $CH_2CF_3$ | O |
| C-1173 | H | CH(Me) | H | $CH_2CF_3$ | $CH_2OMe$ | Cl | $CH_2CF_3$ | O |
| C-1174 | H | $CH_2CH_2$ | Me | $CH_2CF_3$ | $CH_2OMe$ | Cl | $CH_2CF_3$ | O |
| C-1175 | Me | $CH_2CH_2$ | H | $CH_2CF_3$ | $CH_2OMe$ | Cl | $CH_2CF_3$ | O |
| C-1176 | H | single bond | Me | $CH_2CF_3$ | $CH_2OMe$ | Me | $CH_2CF_3$ | O |
| C-1177 | Me | single bond | H | $CH_2CF_3$ | $CH_2OMe$ | Me | $CH_2CF_3$ | O |
| C-1178 | Me(R) | single bond | H | $CH_2CF_3$ | $CH_2OMe$ | Me | $CH_2CF_3$ | O |
| C-1179 | Me(S) | single bond | H | $CH_2CF_3$ | $CH_2OMe$ | Me | $CH_2CF_3$ | O |
| C-1180 | H | $CH_2$ | Me | $CH_2CF_3$ | $CH_2OMe$ | Me | $CH_2CF_3$ | O |
| C-1181 | Me | $CH_2$ | H | $CH_2CF_3$ | $CH_2OMe$ | Me | $CH_2CF_3$ | O |
| C-1182 | H | CH(Me) | H | $CH_2CF_3$ | $CH_2OMe$ | Me | $CH_2CF_3$ | O |

TABLE 254

| Compound Number | Y | W | Z | $R^1$ | $R^2$ | $R^3$ | $R^{10}$ | A |
|---|---|---|---|---|---|---|---|---|
| C-1183 | H | $CH_2CH_2$ | Me | $CH_2CF_3$ | $CH_2OMe$ | Me | $CH_2CF_3$ | O |
| C-1184 | Me | $CH_2CH_2$ | H | $CH_2CF_3$ | $CH_2OMe$ | Me | $CH_2CF_3$ | O |
| C-1185 | H | single bond | Me | $CH_2CF_3$ | $CH_2OMe$ | Cl | $CH_2OMe$ | O |
| C-1186 | Me | single bond | H | $CH_2CF_3$ | $CH_2OMe$ | Cl | $CH_2OMe$ | O |
| C-1187 | Me(R) | single bond | H | $CH_2CF_3$ | $CH_2OMe$ | Cl | $CH_2OMe$ | O |
| C-1188 | Me(S) | single bond | H | $CH_2CF_3$ | $CH_2OMe$ | Cl | $CH_2OMe$ | O |
| C-1189 | H | $CH_2$ | Me | $CH_2CF_3$ | $CH_2OMe$ | Cl | $CH_2OMe$ | O |
| C-1190 | Me | $CH_2$ | H | $CH_2CF_3$ | $CH_2OMe$ | Cl | $CH_2OMe$ | O |
| C-1191 | H | CH(Me) | H | $CH_2CF_3$ | $CH_2OMe$ | Cl | $CH_2OMe$ | O |
| C-1192 | H | $CH_2CH_2$ | Me | $CH_2CF_3$ | $CH_2OMe$ | Cl | $CH_2OMe$ | O |
| C-1193 | Me | $CH_2CH_2$ | H | $CH_2CF_3$ | $CH_2OMe$ | Cl | $CH_2OMe$ | O |
| C-1194 | H | single bond | Me | $CH_2CF_3$ | $CH_2OMe$ | Me | $CH_2OMe$ | O |
| C-1195 | Me | single bond | H | $CH_2CF_3$ | $CH_2OMe$ | Me | $CH_2OMe$ | O |
| C-1196 | Me(R) | single bond | H | $CH_2CF_3$ | $CH_2OMe$ | Me | $CH_2OMe$ | O |
| C-1197 | Me(S) | single bond | H | $CH_2CF_3$ | $CH_2OMe$ | Me | $CH_2OMe$ | O |
| C-1198 | H | $CH_2$ | Me | $CH_2CF_3$ | $CH_2OMe$ | Me | $CH_2OMe$ | O |
| C-1199 | Me | $CH_2$ | H | $CH_2CF_3$ | $CH_2OMe$ | Me | $CH_2OMe$ | O |
| C-1200 | H | CH(Me) | H | $CH_2CF_3$ | $CH_2OMe$ | Me | $CH_2OMe$ | O |
| C-1201 | H | $CH_2CH_2$ | Me | $CH_2CF_3$ | $CH_2OMe$ | Me | $CH_2OMe$ | O |
| C-1202 | Me | $CH_2CH_2$ | H | $CH_2CF_3$ | $CH_2OMe$ | Me | $CH_2OMe$ | O |
| C-1203 | H | single bond | Me | $CH_2CF_3$ | $CH_2OMe$ | Cl | $CH_2CN$ | O |
| C-1204 | Me | single bond | H | $CH_2CF_3$ | $CH_2OMe$ | Cl | $CH_2CN$ | O |
| C-1205 | Me(R) | single bond | H | $CH_2CF_3$ | $CH_2OMe$ | Cl | $CH_2CN$ | O |
| C-1206 | Me(S) | single bond | H | $CH_2CF_3$ | $CH_2OMe$ | Cl | $CH_2CN$ | O |
| C-1207 | H | $CH_2$ | Me | $CH_2CF_3$ | $CH_2OMe$ | Cl | $CH_2CN$ | O |
| C-1208 | Me | $CH_2$ | H | $CH_2CF_3$ | $CH_2OMe$ | Cl | $CH_2CN$ | O |
| C-1209 | H | CH(Me) | H | $CH_2CF_3$ | $CH_2OMe$ | Cl | $CH_2CN$ | O |
| C-1210 | H | $CH_2CH_2$ | Me | $CH_2CF_3$ | $CH_2OMe$ | Cl | $CH_2CN$ | O |
| C-1211 | Me | $CH_2CH_2$ | H | $CH_2CF_3$ | $CH_2OMe$ | Cl | $CH_2CN$ | O |
| C-1212 | H | single bond | Me | $CH_2CF_3$ | $CH_2OMe$ | Me | $CH_2CN$ | O |
| C-1213 | Me | single bond | H | $CH_2CF_3$ | $CH_2OMe$ | Me | $CH_2CN$ | O |
| C-1214 | Me(R) | single bond | H | $CH_2CF_3$ | $CH_2OMe$ | Me | $CH_2CN$ | O |
| C-1215 | Me(S) | single bond | H | $CH_2CF_3$ | $CH_2OMe$ | Me | $CH_2CN$ | O |
| C-1216 | H | $CH_2$ | Me | $CH_2CF_3$ | $CH_2OMe$ | Me | $CH_2CN$ | O |
| C-1217 | Me | $CH_2$ | H | $CH_2CF_3$ | $CH_2OMe$ | Me | $CH_2CN$ | O |
| C-1218 | H | CH(Me) | H | $CH_2CF_3$ | $CH_2OMe$ | Me | $CH_2CN$ | O |
| C-1219 | H | $CH_2CH_2$ | Me | $CH_2CF_3$ | $CH_2OMe$ | Me | $CH_2CN$ | O |
| C-1220 | Me | $CH_2CH_2$ | H | $CH_2CF_3$ | $CH_2OMe$ | Me | $CH_2CN$ | O |
| C-1221 | H | single bond | Me | $CH_2CF_3$ | $CH_2OMe$ | Cl | C(═O)Me | O |
| C-1222 | Me | single bond | H | $CH_2CF_3$ | $CH_2OMe$ | Cl | C(═O)Me | O |
| C-1223 | Me(R) | single bond | H | $CH_2CF_3$ | $CH_2OMe$ | Cl | C(═O)Me | O |
| C-1224 | Me(S) | single bond | H | $CH_2CF_3$ | $CH_2OMe$ | Cl | C(═O)Me | O |
| C-1225 | H | $CH_2$ | Me | $CH_2CF_3$ | $CH_2OMe$ | Cl | C(═O)Me | O |
| C-1226 | Me | $CH_2$ | H | $CH_2CF_3$ | $CH_2OMe$ | Cl | C(═O)Me | O |

TABLE 255

| Compound Number | Y | W | Z | $R^1$ | $R^2$ | $R^3$ | $R^{10}$ | A |
|---|---|---|---|---|---|---|---|---|
| C-1227 | H | CH(Me) | H | $CH_2CF_3$ | $CH_2OMe$ | Cl | C(=O)Me | O |
| C-1228 | H | $CH_2CH_2$ | Me | $CH_2CF_3$ | $CH_2OMe$ | Cl | C(=O)Me | O |
| C-1229 | Me | $CH_2CH_2$ | H | $CH_2CF_3$ | $CH_2OMe$ | Cl | C(=O)Me | O |
| C-1230 | H | single bond | Me | $CH_2CF_3$ | $CH_2OMe$ | Me | C(=O)Me | O |
| C-1231 | Me | single bond | H | $CH_2CF_3$ | $CH_2OMe$ | Me | C(=O)Me | O |
| C-1232 | Me(R) | single bond | H | $CH_2CF_3$ | $CH_2OMe$ | Me | C(=O)Me | O |
| C-1233 | Me(S) | single bond | H | $CH_2CF_3$ | $CH_2OMe$ | Me | C(=O)Me | O |
| C-1234 | H | $CH_2$ | Me | $CH_2CF_3$ | $CH_2OMe$ | Me | C(=O)Me | O |
| C-1235 | Me | $CH_2$ | H | $CH_2CF_3$ | $CH_2OMe$ | Me | C(=O)Me | O |
| C-1236 | H | CH(Me) | H | $CH_2CF_3$ | $CH_2OMe$ | Me | C(=O)Me | O |
| C-1237 | H | $CH_2CH_2$ | Me | $CH_2CF_3$ | $CH_2OMe$ | Me | C(=O)Me | O |
| C-1238 | Me | $CH_2CH_2$ | H | $CH_2CF_3$ | $CH_2OMe$ | Me | C(=O)Me | O |
| C-1239 | H | single bond | Me | $CH_2CF_3$ | $CH_2CN$ | Cl | Me | O |
| C-1240 | H | single bond | Et | $CH_2CF_3$ | $CH_2CN$ | Cl | Me | O |
| C-1241 | Me | single bond | H | $CH_2CF_3$ | $CH_2CN$ | Cl | Me | O |
| C-1242 | Me(R) | single bond | H | $CH_2CF_3$ | $CH_2CN$ | Cl | Me | O |
| C-1243 | Me(S) | single bond | H | $CH_2CF_3$ | $CH_2CN$ | Cl | Me | O |
| C-1244 | H | $CH_2$ | Me | $CH_2CF_3$ | $CH_2CN$ | Cl | Me | O |
| C-1245 | Me | $CH_2$ | H | $CH_2CF_3$ | $CH_2CN$ | Cl | Me | O |
| C-1246 | H | CH(Me) | H | $CH_2CF_3$ | $CH_2CN$ | Cl | Me | O |
| C-1247 | H | $CH_2CH_2$ | Me | $CH_2CF_3$ | $CH_2CN$ | Cl | Me | O |
| C-1248 | Me | $CH_2CH_2$ | H | $CH_2CF_3$ | $CH_2CN$ | Cl | Me | O |
| C-1249 | H | single bond | Me | $CH_2CF_3$ | $CH_2CN$ | Me | Me | O |
| C-1250 | Me | single bond | H | $CH_2CF_3$ | $CH_2CN$ | Me | Me | O |
| C-1251 | Me(R) | single bond | H | $CH_2CF_3$ | $CH_2CN$ | Me | Me | O |
| C-1252 | Me(S) | single bond | H | $CH_2CF_3$ | $CH_2CN$ | Me | Me | O |
| C-1253 | H | $CH_2$ | Me | $CH_2CF_3$ | $CH_2CN$ | Me | Me | O |
| C-1254 | Me | $CH_2$ | H | $CH_2CF_3$ | $CH_2CN$ | Me | Me | O |
| C-1255 | H | CH(Me) | H | $CH_2CF_3$ | $CH_2CN$ | Me | Me | O |
| C-1256 | H | $CH_2CH_2$ | Me | $CH_2CF_3$ | $CH_2CN$ | Me | Me | O |
| C-1257 | Me | $CH_2CH_2$ | H | $CH_2CF_3$ | $CH_2CN$ | Me | Me | O |
| C-1258 | H | single bond | Me | $CH_2CF_3$ | $CH_2CN$ | Cl | Et | O |
| C-1259 | Me | single bond | H | $CH_2CF_3$ | $CH_2CN$ | Cl | Et | O |
| C-1260 | Me(R) | single bond | H | $CH_2CF_3$ | $CH_2CN$ | Cl | Et | O |
| C-1261 | Me(S) | single bond | H | $CH_2CF_3$ | $CH_2CN$ | Cl | Et | O |
| C-1262 | H | $CH_2$ | Me | $CH_2CF_3$ | $CH_2CN$ | Cl | Et | O |
| C-1263 | Me | $CH_2$ | H | $CH_2CF_3$ | $CH_2CN$ | Cl | Et | O |
| C-1264 | H | CH(Me) | H | $CH_2CF_3$ | $CH_2CN$ | Cl | Et | O |
| C-1265 | H | $CH_2CH_2$ | Me | $CH_2CF_3$ | $CH_2CN$ | Cl | Et | O |
| C-1266 | Me | $CH_2CH_2$ | H | $CH_2CF_3$ | $CH_2CN$ | Cl | Et | O |
| C-1267 | H | single bond | Me | $CH_2CF_3$ | $CH_2CN$ | Me | Et | O |
| C-1268 | Me | single bond | H | $CH_2CF_3$ | $CH_2CN$ | Me | Et | O |
| C-1269 | Me(R) | single bond | H | $CH_2CF_3$ | $CH_2CN$ | Me | Et | O |
| C-1270 | Me(S) | single bond | H | $CH_2CF_3$ | $CH_2CN$ | Me | Et | O |

TABLE 256

| Compound Number | Y | W | Z | $R^1$ | $R^2$ | $R^3$ | $R^{10}$ | A |
|---|---|---|---|---|---|---|---|---|
| C-1271 | H | $CH_2$ | Me | $CH_2CF_3$ | $CH_2CN$ | Me | Et | O |
| C-1272 | Me | $CH_2$ | H | $CH_2CF_3$ | $CH_2CN$ | Me | Et | O |
| C-1273 | H | CH(Me) | H | $CH_2CF_3$ | $CH_2CN$ | Me | Et | O |
| C-1274 | H | $CH_2CH_2$ | Me | $CH_2CF_3$ | $CH_2CN$ | Me | Et | O |
| C-1275 | Me | $CH_2CH_2$ | H | $CH_2CF_3$ | $CH_2CN$ | Me | Et | O |
| C-1276 | H | single bond | Me | $CH_2CF_3$ | $CH_2CN$ | Cl | $CH_2CF_3$ | O |
| C-1277 | Me | single bond | H | $CH_2CF_3$ | $CH_2CN$ | Cl | $CH_2CF_3$ | O |
| C-1278 | Me(R) | single bond | H | $CH_2CF_3$ | $CH_2CN$ | Cl | $CH_2CF_3$ | O |
| C-1279 | Me(S) | single bond | H | $CH_2CF_3$ | $CH_2CN$ | Cl | $CH_2CF_3$ | O |
| C-1280 | H | $CH_2$ | Me | $CH_2CF_3$ | $CH_2CN$ | Cl | $CH_2CF_3$ | O |
| C-1281 | Me | $CH_2$ | H | $CH_2CF_3$ | $CH_2CN$ | Cl | $CH_2CF_3$ | O |
| C-1282 | H | CH(Me) | H | $CH_2CF_3$ | $CH_2CN$ | Cl | $CH_2CF_3$ | O |
| C-1283 | H | $CH_2CH_2$ | Me | $CH_2CF_3$ | $CH_2CN$ | Cl | $CH_2CF_3$ | O |
| C-1284 | Me | $CH_2CH_2$ | H | $CH_2CF_3$ | $CH_2CN$ | Cl | $CH_2CF_3$ | O |
| C-1285 | H | single bond | Me | $CH_2CF_3$ | $CH_2CN$ | Me | $CH_2CF_3$ | O |
| C-1286 | Me | single bond | H | $CH_2CF_3$ | $CH_2CN$ | Me | $CH_2CF_3$ | O |
| C-1287 | Me(R) | single bond | H | $CH_2CF_3$ | $CH_2CN$ | Me | $CH_2CF_3$ | O |
| C-1288 | Me(S) | single bond | H | $CH_2CF_3$ | $CH_2CN$ | Me | $CH_2CF_3$ | O |
| C-1289 | H | $CH_2$ | Me | $CH_2CF_3$ | $CH_2CN$ | Me | $CH_2CF_3$ | O |
| C-1290 | Me | $CH_2$ | H | $CH_2CF_3$ | $CH_2CN$ | Me | $CH_2CF_3$ | O |
| C-1291 | H | CH(Me) | H | $CH_2CF_3$ | $CH_2CN$ | Me | $CH_2CF_3$ | O |
| C-1292 | H | $CH_2CH_2$ | Me | $CH_2CF_3$ | $CH_2CN$ | Me | $CH_2CF_3$ | O |
| C-1293 | Me | $CH_2CH_2$ | H | $CH_2CF_3$ | $CH_2CN$ | Me | $CH_2CF_3$ | O |

TABLE 256-continued

| Compound Number | Y | W | Z | $R^1$ | $R^2$ | $R^3$ | $R^{10}$ | A |
|---|---|---|---|---|---|---|---|---|
| C-1294 | H | single bond | Me | $CH_2CF_3$ | $CH_2CN$ | Cl | $CH_2OMe$ | O |
| C-1295 | Me | single bond | H | $CH_2CF_3$ | $CH_2CN$ | Cl | $CH_2OMe$ | O |
| C-1296 | Me(R) | single bond | H | $CH_2CF_3$ | $CH_2CN$ | Cl | $CH_2OMe$ | O |
| C-1297 | Me(S) | single bond | H | $CH_2CF_3$ | $CH_2CN$ | Cl | $CH_2OMe$ | O |
| C-1298 | H | $CH_2$ | Me | $CH_2CF_3$ | $CH_2CN$ | Cl | $CH_2OMe$ | O |
| C-1299 | Me | $CH_2$ | H | $CH_2CF_3$ | $CH_2CN$ | Cl | $CH_2OMe$ | O |
| C-1300 | H | CH(Me) | H | $CH_2CF_3$ | $CH_2CN$ | Cl | $CH_2OMe$ | O |
| C-1301 | H | $CH_2CH_2$ | Me | $CH_2CF_3$ | $CH_2CN$ | Cl | $CH_2OMe$ | O |
| C-1302 | Me | $CH_2CH_2$ | H | $CH_2CF_3$ | $CH_2CN$ | Cl | $CH_2OMe$ | O |
| C-1303 | H | single bond | Me | $CH_2CF_3$ | $CH_2CN$ | Me | $CH_2OMe$ | O |
| C-1304 | Me | single bond | H | $CH_2CF_3$ | $CH_2CN$ | Me | $CH_2OMe$ | O |
| C-1305 | Me(R) | single bond | H | $CH_2CF_3$ | $CH_2CN$ | Me | $CH_2OMe$ | O |
| C-1306 | Me(S) | single bond | H | $CH_2CF_3$ | $CH_2CN$ | Me | $CH_2OMe$ | O |
| C-1307 | H | $CH_2$ | Me | $CH_2CF_3$ | $CH_2CN$ | Me | $CH_2OMe$ | O |
| C-1308 | Me | $CH_2$ | H | $CH_2CF_3$ | $CH_2CN$ | Me | $CH_2OMe$ | O |
| C-1309 | H | CH(Me) | H | $CH_2CF_3$ | $CH_2CN$ | Me | $CH_2OMe$ | O |
| C-1310 | H | $CH_2CH_2$ | Me | $CH_2CF_3$ | $CH_2CN$ | Me | $CH_2OMe$ | O |
| C-1311 | Me | $CH_2CH_2$ | H | $CH_2CF_3$ | $CH_2CN$ | Me | $CH_2OMe$ | O |
| C-1312 | H | single bond | Me | $CH_2CF_3$ | $CH_2CN$ | Cl | $CH_2CN$ | O |
| C-1313 | Me | single bond | H | $CH_2CF_3$ | $CH_2CN$ | Cl | $CH_2CN$ | O |
| C-1314 | Me(R) | single bond | H | $CH_2CF_3$ | $CH_2CN$ | Cl | $CH_2CN$ | O |

TABLE 257

| Compound Number | Y | W | Z | $R^1$ | $R^2$ | $R^3$ | $R^{10}$ | A |
|---|---|---|---|---|---|---|---|---|
| C-1315 | Me(S) | single bond | H | $CH_2CF_3$ | $CH_2CN$ | Cl | $CH_2CN$ | O |
| C-1316 | H | $CH_2$ | Me | $CH_2CF_3$ | $CH_2CN$ | Cl | $CH_2CN$ | O |
| C-1317 | Me | $CH_2$ | H | $CH_2CF_3$ | $CH_2CN$ | Cl | $CH_2CN$ | O |
| C-1318 | H | CH(Me) | H | $CH_2CF_3$ | $CH_2CN$ | Cl | $CH_2CN$ | O |
| C-1319 | H | $CH_2CH_2$ | Me | $CH_2CF_3$ | $CH_2CN$ | Cl | $CH_2CN$ | O |
| C-1320 | Me | $CH_2CH_2$ | H | $CH_2CF_3$ | $CH_2CN$ | Cl | $CH_2CN$ | O |
| C-1321 | H | single bond | Me | $CH_2CF_3$ | $CH_2CN$ | Me | $CH_2CN$ | O |
| C-1322 | Me | single bond | H | $CH_2CF_3$ | $CH_2CN$ | Me | $CH_2CN$ | O |
| C-1323 | Me(R) | single bond | H | $CH_2CF_3$ | $CH_2CN$ | Me | $CH_2CN$ | O |
| C-1324 | Me(S) | single bond | H | $CH_2CF_3$ | $CH_2CN$ | Me | $CH_2CN$ | O |
| C-1325 | H | $CH_2$ | Me | $CH_2CF_3$ | $CH_2CN$ | Me | $CH_2CN$ | O |
| C-1326 | Me | $CH_2$ | H | $CH_2CF_3$ | $CH_2CN$ | Me | $CH_2CN$ | O |
| C-1327 | H | CH(Me) | H | $CH_2CF_3$ | $CH_2CN$ | Me | $CH_2CN$ | O |
| C-1328 | H | $CH_2CH_2$ | Me | $CH_2CF_3$ | $CH_2CN$ | Me | $CH_2CN$ | O |
| C-1329 | Me | $CH_2CH_2$ | H | $CH_2CF_3$ | $CH_2CN$ | Me | $CH_2CN$ | O |
| C-1330 | H | single bond | Me | $CH_2CF_3$ | $CH_2CN$ | Cl | C(=O)Me | O |
| C-1331 | Me | single bond | H | $CH_2CF_3$ | $CH_2CN$ | Cl | C(=O)Me | O |
| C-1332 | Me(R) | single bond | H | $CH_2CF_3$ | $CH_2CN$ | Cl | C(=O)Me | O |
| C-1333 | Me(S) | single bond | H | $CH_2CF_3$ | $CH_2CN$ | Cl | C(=O)Me | O |
| C-1334 | H | $CH_2$ | Me | $CH_2CF_3$ | $CH_2CN$ | Cl | C(=O)Me | O |
| C-1335 | Me | $CH_2$ | H | $CH_2CF_3$ | $CH_2CN$ | Cl | C(=O)Me | O |
| C-1336 | H | CH(Me) | H | $CH_2CF_3$ | $CH_2CN$ | Cl | C(=O)Me | O |
| C-1337 | H | $CH_2CH_2$ | Me | $CH_2CF_3$ | $CH_2CN$ | Cl | C(=O)Me | O |
| C-1338 | Me | $CH_2CH_2$ | H | $CH_2CF_3$ | $CH_2CN$ | Cl | C(=O)Me | O |
| C-1339 | H | single bond | Me | $CH_2CF_3$ | $CH_2CN$ | Me | C(=O)Me | O |
| C-1340 | Me | single bond | H | $CH_2CF_3$ | $CH_2CN$ | Me | C(=O)Me | O |
| C-1341 | Me(R) | single bond | H | $CH_2CF_3$ | $CH_2CN$ | Me | C(=O)Me | O |
| C-1342 | Me(S) | single bond | H | $CH_2CF_3$ | $CH_2CN$ | Me | C(=O)Me | O |
| C-1343 | H | $CH_2$ | Me | $CH_2CF_3$ | $CH_2CN$ | Me | C(=O)Me | O |
| C-1344 | Me | $CH_2$ | H | $CH_2CF_3$ | $CH_2CN$ | Me | C(=O)Me | O |
| C-1345 | H | CH(Me) | H | $CH_2CF_3$ | $CH_2CN$ | Me | C(=O)Me | O |
| C-1346 | H | $CH_2CH_2$ | Me | $CH_2CF_3$ | $CH_2CN$ | Me | C(=O)Me | O |
| C-1347 | Me | $CH_2CH_2$ | H | $CH_2CF_3$ | $CH_2CN$ | Me | C(=O)Me | O |
| C-1348 | H | single bond | Me | $CH_2CF_3$ | C(=O)Me | Cl | Me | O |
| C-1349 | Me | single bond | H | $CH_2CF_3$ | C(=O)Me | Cl | Me | O |
| C-1350 | Me(R) | single bond | H | $CH_2CF_3$ | C(=O)Me | Cl | Me | O |
| C-1351 | Me(S) | single bond | H | $CH_2CF_3$ | C(=O)Me | Cl | Me | O |
| C-1352 | H | $CH_2$ | Me | $CH_2CF_3$ | C(=O)Me | Cl | Me | O |
| C-1353 | Me | $CH_2$ | H | $CH_2CF_3$ | C(=O)Me | Cl | Me | O |
| C-1354 | H | CH(Me) | H | $CH_2CF_3$ | C(=O)Me | Cl | Me | O |
| C-1355 | H | $CH_2CH_2$ | Me | $CH_2CF_3$ | C(=O)Me | Cl | Me | O |
| C-1356 | Me | $CH_2CH_2$ | H | $CH_2CF_3$ | C(=O)Me | Cl | Me | O |
| C-1357 | H | single bond | Me | $CH_2CF_3$ | C(=O)Me | Me | Me | O |
| C-1358 | Me | single bond | H | $CH_2CF_3$ | C(=O)Me | Me | Me | O |

TABLE 258

| Compound Number | Y | W | Z | $R^1$ | $R^2$ | $R^3$ | $R^{10}$ | A |
|---|---|---|---|---|---|---|---|---|
| C-1359 | Me(R) | single bond | H | $CH_2CF_3$ | C(=O)Me | Me | Me | O |
| C-1360 | Me(S) | single bond | H | $CH_2CF_3$ | C(=O)Me | Me | Me | O |
| C-1361 | H | $CH_2$ | Me | $CH_2CF_3$ | C(=O)Me | Me | Me | O |
| C-1362 | Me | $CH_2$ | H | $CH_2CF_3$ | C(=O)Me | Me | Me | O |
| C-1363 | H | CH(Me) | H | $CH_2CF_3$ | C(=O)Me | Me | Me | O |
| C-1364 | H | $CH_2CH_2$ | Me | $CH_2CF_3$ | C(=O)Me | Me | Me | O |
| C-1365 | Me | $CH_2CH_2$ | H | $CH_2CF_3$ | C(=O)Me | Me | Me | O |
| C-1366 | H | single bond | Me | $CH_2CF_3$ | C(=O)Me | Cl | Et | O |
| C-1367 | Me | single bond | H | $CH_2CF_3$ | C(=O)Me | Cl | Et | O |
| C-1368 | Me(R) | single bond | H | $CH_2CF_3$ | C(=O)Me | Cl | Et | O |
| C-1369 | Me(S) | single bond | H | $CH_2CF_3$ | C(=O)Me | Cl | Et | O |
| C-1370 | H | $CH_2$ | Me | $CH_2CF_3$ | C(=O)Me | Cl | Et | O |
| C-1371 | Me | $CH_2$ | H | $CH_2CF_3$ | C(=O)Me | Cl | Et | O |
| C-1372 | H | CH(Me) | H | $CH_2CF_3$ | C(=O)Me | Cl | Et | O |
| C-1373 | H | $CH_2CH_2$ | Me | $CH_2CF_3$ | C(=O)Me | Cl | Et | O |
| C-1374 | Me | $CH_2CH_2$ | H | $CH_2CF_3$ | C(=O)Me | Cl | Et | O |
| C-1375 | H | single bond | Me | $CH_2CF_3$ | C(=O)Me | Me | Et | O |
| C-1376 | Me | single bond | H | $CH_2CF_3$ | C(=O)Me | Me | Et | O |
| C-1377 | Me(R) | single bond | H | $CH_2CF_3$ | C(=O)Me | Me | Et | O |
| C-1378 | Me(S) | single bond | H | $CH_2CF_3$ | C(=O)Me | Me | Et | O |
| C-1379 | H | $CH_2$ | Me | $CH_2CF_3$ | C(=O)Me | Me | Et | O |
| C-1380 | Me | $CH_2$ | H | $CH_2CF_3$ | C(=O)Me | Me | Et | O |
| C-1381 | H | CH(Me) | H | $CH_2CF_3$ | C(=O)Me | Me | Et | O |
| C-1382 | H | $CH_2CH_2$ | Me | $CH_2CF_3$ | C(=O)Me | Me | Et | O |
| C-1383 | Me | $CH_2CH_2$ | H | $CH_2CF_3$ | C(=O)Me | Me | Et | O |
| C-1384 | H | single bond | Me | $CH_2CF_3$ | C(=O)Me | Cl | $CH_2CF_3$ | O |
| C-1385 | Me | single bond | H | $CH_2CF_3$ | C(=O)Me | Cl | $CH_2CF_3$ | O |
| C-1386 | Me(R) | single bond | H | $CH_2CF_3$ | C(=O)Me | Cl | $CH_2CF_3$ | O |
| C-1387 | Me(S) | single bond | H | $CH_2CF_3$ | C(=O)Me | Cl | $CH_2CF_3$ | O |
| C-1388 | H | $CH_2$ | Me | $CH_2CF_3$ | C(=O)Me | Cl | $CH_2CF_3$ | O |
| C-1389 | Me | $CH_2$ | H | $CH_2CF_3$ | C(=O)Me | Cl | $CH_2CF_3$ | O |
| C-1390 | H | CH(Me) | H | $CH_2CF_3$ | C(=O)Me | Cl | $CH_2CF_3$ | O |
| C-1391 | H | $CH_2CH_2$ | Me | $CH_2CF_3$ | C(=O)Me | Cl | $CH_2CF_3$ | O |
| C-1392 | Me | $CH_2CH_2$ | H | $CH_2CF_3$ | C(=O)Me | Cl | $CH_2CF_3$ | O |
| C-1393 | H | single bond | Me | $CH_2CF_3$ | C(=O)Me | Me | $CH_2CF_3$ | O |
| C-1394 | Me | single bond | H | $CH_2CF_3$ | C(=O)Me | Me | $CH_2CF_3$ | O |
| C-1395 | Me(R) | single bond | H | $CH_2CF_3$ | C(=O)Me | Me | $CH_2CF_3$ | O |
| C-1396 | Me(S) | single bond | H | $CH_2CF_3$ | C(=O)Me | Me | $CH_2CF_3$ | O |
| C-1397 | H | $CH_2$ | Me | $CH_2CF_3$ | C(=O)Me | Me | $CH_2CF_3$ | O |
| C-1398 | Me | $CH_2$ | H | $CH_2CF_3$ | C(=O)Me | Me | $CH_2CF_3$ | O |
| C-1399 | H | CH(Me) | H | $CH_2CF_3$ | C(=O)Me | Me | $CH_2CF_3$ | O |
| C-1400 | H | $CH_2CH_2$ | Me | $CH_2CF_3$ | C(=O)Me | Me | $CH_2CF_3$ | O |
| C-1401 | Me | $CH_2CH_2$ | H | $CH_2CF_3$ | C(=O)Me | Me | $CH_2CF_3$ | O |
| C-1402 | H | single bond | Me | $CH_2CF_3$ | C(=O)Me | Cl | $CH_2OMe$ | O |

TABLE 259

| Compound Number | Y | W | Z | $R^1$ | $R^2$ | $R^3$ | $R^{10}$ | A |
|---|---|---|---|---|---|---|---|---|
| C-1403 | Me | single bond | H | $CH_2CF_3$ | C(=O)Me | Cl | $CH_2OMe$ | O |
| C-1404 | Me(R) | single bond | H | $CH_2CF_3$ | C(=O)Me | Cl | $CH_2OMe$ | O |
| C-1405 | Me(S) | single bond | H | $CH_2CF_3$ | C(=O)Me | Cl | $CH_2OMe$ | O |
| C-1406 | H | $CH_2$ | Me | $CH_2CF_3$ | C(=O)Me | Cl | $CH_2OMe$ | O |
| C-1407 | Me | $CH_2$ | H | $CH_2CF_3$ | C(=O)Me | Cl | $CH_2OMe$ | O |
| C-1408 | H | CH(Me) | H | $CH_2CF_3$ | C(=O)Me | Cl | $CH_2OMe$ | O |
| C-1409 | H | $CH_2CH_2$ | Me | $CH_2CF_3$ | C(=O)Me | Cl | $CH_2OMe$ | O |
| C-1410 | Me | $CH_2CH_2$ | H | $CH_2CF_3$ | C(=O)Me | Cl | $CH_2OMe$ | O |
| C-1411 | H | single bond | Me | $CH_2CF_3$ | C(=O)Me | Me | $CH_2OMe$ | O |
| C-1412 | Me | single bond | H | $CH_2CF_3$ | C(=O)Me | Me | $CH_2OMe$ | O |
| C-1413 | Me(R) | single bond | H | $CH_2CF_3$ | C(=O)Me | Me | $CH_2OMe$ | O |
| C-1414 | Me(S) | single bond | H | $CH_2CF_3$ | C(=O)Me | Me | $CH_2OMe$ | O |
| C-1415 | H | $CH_2$ | Me | $CH_2CF_3$ | C(=O)Me | Me | $CH_2OMe$ | O |
| C-1416 | Me | $CH_2$ | H | $CH_2CF_3$ | C(=O)Me | Me | $CH_2OMe$ | O |
| C-1417 | H | CH(Me) | H | $CH_2CF_3$ | C(=O)Me | Me | $CH_2OMe$ | O |
| C-1418 | H | $CH_2CH_2$ | Me | $CH_2CF_3$ | C(=O)Me | Me | $CH_2OMe$ | O |
| C-1419 | Me | $CH_2CH_2$ | H | $CH_2CF_3$ | C(=O)Me | Me | $CH_2OMe$ | O |
| C-1420 | H | single bond | Me | $CH_2CF_3$ | C(=O)Me | Cl | $CH_2CN$ | O |
| C-1421 | Me | single bond | H | $CH_2CF_3$ | C(=O)Me | Cl | $CH_2CN$ | O |
| C-1422 | Me(R) | single bond | H | $CH_2CF_3$ | C(=O)Me | Cl | $CH_2CN$ | O |
| C-1423 | Me(S) | single bond | H | $CH_2CF_3$ | C(=O)Me | Cl | $CH_2CN$ | O |

TABLE 259-continued

| Compound Number | Y | W | Z | $R^1$ | $R^2$ | $R^3$ | $R^{10}$ | A |
|---|---|---|---|---|---|---|---|---|
| C-1424 | H | $CH_2$ | Me | $CH_2CF_3$ | C(=O)Me | Cl | $CH_2CN$ | O |
| C-1425 | Me | $CH_2$ | H | $CH_2CF_3$ | C(=O)Me | Cl | $CH_2CN$ | O |
| C-1426 | H | CH(Me) | H | $CH_2CF_3$ | C(=O)Me | Cl | $CH_2CN$ | O |
| C-1427 | H | $CH_2CH_2$ | Me | $CH_2CF_3$ | C(=O)Me | Cl | $CH_2CN$ | O |
| C-1428 | Me | $CH_2CH_2$ | H | $CH_2CF_3$ | C(=O)Me | Cl | $CH_2CN$ | O |
| C-1429 | H | single bond | Me | $CH_2CF_3$ | C(=O)Me | Me | $CH_2CN$ | O |
| C-1430 | Me | single bond | H | $CH_2CF_3$ | C(=O)Me | Me | $CH_2CN$ | O |
| C-1431 | Me(R) | single bond | H | $CH_2CF_3$ | C(=O)Me | Me | $CH_2CN$ | O |
| C-1432 | Me(S) | single bond | H | $CH_2CF_3$ | C(=O)Me | Me | $CH_2CN$ | O |
| C-1433 | H | $CH_2$ | Me | $CH_2CF_3$ | C(=O)Me | Me | $CH_2CN$ | O |
| C-1434 | Me | $CH_2$ | H | $CH_2CF_3$ | C(=O)Me | Me | $CH_2CN$ | O |
| C-1435 | H | CH(Me) | H | $CH_2CF_3$ | C(=O)Me | Me | $CH_2CN$ | O |
| C-1436 | H | $CH_2CH_2$ | Me | $CH_2CF_3$ | C(=O)Me | Me | $CH_2CN$ | O |
| C-1437 | Me | $CH_2CH_2$ | H | $CH_2CF_3$ | C(=O)Me | Me | $CH_2CN$ | O |
| C-1438 | H | single bond | Me | $CH_2CF_3$ | C(=O)Me | Cl | C(=O)Me | O |
| C-1439 | Me | single bond | H | $CH_2CF_3$ | C(=O)Me | Cl | C(=O)Me | O |
| C-1440 | Me(R) | single bond | H | $CH_2CF_3$ | C(=O)Me | Cl | C(=O)Me | O |
| C-1441 | Me(S) | single bond | H | $CH_2CF_3$ | C(=O)Me | Cl | C(=O)Me | O |
| C-1442 | H | $CH_2$ | Me | $CH_2CF_3$ | C(=O)Me | Cl | C(=O)Me | O |
| C-1443 | Me | $CH_2$ | H | $CH_2CF_3$ | C(=O)Me | Cl | C(=O)Me | O |
| C-1444 | H | CH(Me) | H | $CH_2CF_3$ | C(=O)Me | Cl | C(=O)Me | O |
| C-1445 | H | $CH_2CH_2$ | Me | $CH_2CF_3$ | C(=O)Me | Cl | C(=O)Me | O |
| C-1446 | Me | $CH_2CH_2$ | H | $CH_2CF_3$ | C(=O)Me | Cl | C(=O)Me | O |

TABLE 260

| Compound Number | Y | W | Z | $R^1$ | $R^2$ | $R^3$ | $R^{10}$ | A |
|---|---|---|---|---|---|---|---|---|
| C-1447 | H | single bond | Me | $CH_2CF_3$ | C(=O)Me | Me | C(=O)Me | O |
| C-1448 | Me | single bond | H | $CH_2CF_3$ | C(=O)Me | Me | C(=O)Me | O |
| C-1449 | Me(R) | single bond | H | $CH_2CF_3$ | C(=O)Me | Me | C(=O)Me | O |
| C-1450 | Me(S) | single bond | H | $CH_2CF_3$ | C(=O)Me | Me | C(=O)Me | O |
| C-1451 | H | $CH_2$ | Me | $CH_2CF_3$ | C(=O)Me | Me | C(=O)Me | O |
| C-1452 | Me | $CH_2$ | H | $CH_2CF_3$ | C(=O)Me | Me | C(=O)Me | O |
| C-1453 | H | CH(Me) | H | $CH_2CF_3$ | C(=O)Me | Me | C(=O)Me | O |
| C-1454 | H | $CH_2CH_2$ | Me | $CH_2CF_3$ | C(=O)Me | Me | C(=O)Me | O |
| C-1455 | Me | $CH_2CH_2$ | H | $CH_2CF_3$ | C(=O)Me | Me | C(=O)Me | O |
| C-1456 | H | single bond | Me | $CH_2CF_3$ | C(=O)(i-Pr) | Cl | Me | O |
| C-1457 | Me | single bond | H | $CH_2CF_3$ | C(=O)(i-Pr) | Cl | Me | O |
| C-1458 | Me(R) | single bond | H | $CH_2CF_3$ | C(=O)(i-Pr) | Cl | Me | O |
| C-1459 | Me(S) | single bond | H | $CH_2CF_3$ | C(=O)(i-Pr) | Cl | Me | O |
| C-1460 | H | $CH_2$ | Me | $CH_2CF_3$ | C(=O)(i-Pr) | Cl | Me | O |
| C-1461 | Me | $CH_2$ | H | $CH_2CF_3$ | C(=O)(i-Pr) | Cl | Me | O |
| C-1462 | H | CH(Me) | H | $CH_2CF_3$ | C(=O)(i-Pr) | Cl | Me | O |
| C-1463 | H | $CH_2CH_2$ | Me | $CH_2CF_3$ | C(=O)(i-Pr) | Cl | Me | O |
| C-1464 | Me | $CH_2CH_2$ | H | $CH_2CF_3$ | C(=O)(i-Pr) | Cl | Me | O |
| C-1465 | H | single bond | Me | $CH_2CF_3$ | C(=O)(i-Pr) | Me | Me | O |
| C-1466 | Me | single bond | H | $CH_2CF_3$ | C(=O)(i-Pr) | Me | Me | O |
| C-1467 | Me(R) | single bond | H | $CH_2CF_3$ | C(=O)(i-Pr) | Me | Me | O |
| C-1468 | Me(S) | single bond | H | $CH_2CF_3$ | C(=O)(i-Pr) | Me | Me | O |
| C-1469 | H | $CH_2$ | Me | $CH_2CF_3$ | C(=O)(i-Pr) | Me | Me | O |
| C-1470 | Me | $CH_2$ | H | $CH_2CF_3$ | C(=O)(i-Pr) | Me | Me | O |
| C-1471 | H | CH(Me) | H | $CH_2CF_3$ | C(=O)(i-Pr) | Me | Me | O |
| C-1472 | H | $CH_2CH_2$ | Me | $CH_2CF_3$ | C(=O)(i-Pr) | Me | Me | O |
| C-1473 | Me | $CH_2CH_2$ | H | $CH_2CF_3$ | C(=O)(i-Pr) | Me | Me | O |
| C-1474 | H | single bond | Me | $CH_2CF_3$ | C(=O)(i-Pr) | Cl | Et | O |
| C-1475 | Me | single bond | H | $CH_2CF_3$ | C(=O)(i-Pr) | Cl | Et | O |
| C-1476 | Me(R) | single bond | H | $CH_2CF_3$ | C(=O)(i-Pr) | Cl | Et | O |
| C-1477 | Me(S) | single bond | H | $CH_2CF_3$ | C(=O)(i-Pr) | Cl | Et | O |
| C-1478 | H | $CH_2$ | Me | $CH_2CF_3$ | C(=O)(i-Pr) | Cl | Et | O |
| C-1479 | Me | $CH_2$ | H | $CH_2CF_3$ | C(=O)(i-Pr) | Cl | Et | O |
| C-1480 | H | CH(Me) | H | $CH_2CF_3$ | C(=O)(i-Pr) | Cl | Et | O |
| C-1481 | H | $CH_2CH_2$ | Me | $CH_2CF_3$ | C(=O)(i-Pr) | Cl | Et | O |
| C-1482 | Me | $CH_2CH_2$ | H | $CH_2CF_3$ | C(=O)(i-Pr) | Cl | Et | O |
| C-1483 | H | single bond | Me | $CH_2CF_3$ | C(=O)(i-Pr) | Me | Et | O |
| C-1484 | Me | single bond | H | $CH_2CF_3$ | C(=O)(i-Pr) | Me | Et | O |
| C-1485 | Me(R) | single bond | H | $CH_2CF_3$ | C(=O)(i-Pr) | Me | Et | O |
| C-1486 | Me(S) | single bond | H | $CH_2CF_3$ | C(=O)(i-Pr) | Me | Et | O |

TABLE 260-continued

| Compound Number | Y | W | Z | $R^1$ | $R^2$ | $R^3$ | $R^{10}$ | A |
|---|---|---|---|---|---|---|---|---|
| C-1487 | H | $CH_2$ | Me | $CH_2CF_3$ | C(=O)(i-Pr) | Me | Et | O |
| C-1488 | Me | $CH_2$ | H | $CH_2CF_3$ | C(=O)(i-Pr) | Me | Et | O |
| C-1489 | H | CH(Me) | H | $CH_2CF_3$ | C(=O)(i-Pr) | Me | Et | O |
| C-1490 | H | $CH_2CH_2$ | Me | $CH_2CF_3$ | C(=O)(i-Pr) | Me | Et | O |

TABLE 261

| Compound Number | Y | W | Z | $R^1$ | $R^2$ | $R^3$ | $R^{10}$ | A |
|---|---|---|---|---|---|---|---|---|
| C-1491 | Me | $CH_2CH_2$ | H | $CH_2CF_3$ | C(=O)(i-Pr) | Me | Et | O |
| C-1492 | H | single bond | Me | $CH_2CF_3$ | C(=O)(i-Pr) | Cl | $CH_2CF_3$ | O |
| C-1493 | Me | single bond | H | $CH_2CF_3$ | C(=O)(i-Pr) | Cl | $CH_2CF_3$ | O |
| C-1494 | Me(R) | single bond | H | $CH_2CF_3$ | C(=O)(i-Pr) | Cl | $CH_2CF_3$ | O |
| C-1495 | Me(S) | single bond | H | $CH_2CF_3$ | C(=O)(i-Pr) | Cl | $CH_2CF_3$ | O |
| C-1496 | H | $CH_2$ | Me | $CH_2CF_3$ | C(=O)(i-Pr) | Cl | $CH_2CF_3$ | O |
| C-1497 | Me | $CH_2$ | H | $CH_2CF_3$ | C(=O)(i-Pr) | Cl | $CH_2CF_3$ | O |
| C-1498 | H | CH(Me) | H | $CH_2CF_3$ | C(=O)(i-Pr) | Cl | $CH_2CF_3$ | O |
| C-1499 | H | $CH_2CH_2$ | Me | $CH_2CF_3$ | C(=O)(i-Pr) | Cl | $CH_2CF_3$ | O |
| C-1500 | Me | $CH_2CH_2$ | H | $CH_2CF_3$ | C(=O)(i-Pr) | Cl | $CH_2CF_3$ | O |
| C-1501 | H | single bond | Me | $CH_2CF_3$ | C(=O)(i-Pr) | Me | $CH_2CF_3$ | O |
| C-1502 | Me | single bond | H | $CH_2CF_3$ | C(=O)(i-Pr) | Me | $CH_2CF_3$ | O |
| C-1503 | Me(R) | single bond | H | $CH_2CF_3$ | C(=O)(i-Pr) | Me | $CH_2CF_3$ | O |
| C-1504 | Me(S) | single bond | H | $CH_2CF_3$ | C(=O)(i-Pr) | Me | $CH_2CF_3$ | O |
| C-1505 | H | $CH_2$ | Me | $CH_2CF_3$ | C(=O)(i-Pr) | Me | $CH_2CF_3$ | O |
| C-1506 | Me | $CH_2$ | H | $CH_2CF_3$ | C(=O)(i-Pr) | Me | $CH_2CF_3$ | O |
| C-1507 | H | CH(Me) | H | $CH_2CF_3$ | C(=O)(i-Pr) | Me | $CH_2CF_3$ | O |
| C-1508 | H | $CH_2CH_2$ | Me | $CH_2CF_3$ | C(=O)(i-Pr) | Me | $CH_2CF_3$ | O |
| C-1509 | Me | $CH_2CH_2$ | H | $CH_2CF_3$ | C(=O)(i-Pr) | Me | $CH_2CF_3$ | O |
| C-1510 | H | single bond | Me | $CH_2CF_3$ | C(=O)(i-Pr) | Cl | $CH_2OMe$ | O |
| C-1511 | Me | single bond | H | $CH_2CF_3$ | C(=O)(i-Pr) | Cl | $CH_2OMe$ | O |
| C-1512 | Me(R) | single bond | H | $CH_2CF_3$ | C(=O)(i-Pr) | Cl | $CH_2OMe$ | O |
| C-1513 | Me(S) | single bond | H | $CH_2CF_3$ | C(=O)(i-Pr) | Cl | $CH_2OMe$ | O |
| C-1514 | H | $CH_2$ | Me | $CH_2CF_3$ | C(=O)(i-Pr) | Cl | $CH_2OMe$ | O |
| C-1515 | Me | $CH_2$ | H | $CH_2CF_3$ | C(=O)(i-Pr) | Cl | $CH_2OMe$ | O |
| C-1516 | H | CH(Me) | H | $CH_2CF_3$ | C(=O)(i-Pr) | Cl | $CH_2OMe$ | O |
| C-1517 | H | $CH_2CH_2$ | Me | $CH_2CF_3$ | C(=O)(i-Pr) | Cl | $CH_2OMe$ | O |
| C-1518 | Me | $CH_2CH_2$ | H | $CH_2CF_3$ | C(=O)(i-Pr) | Cl | $CH_2OMe$ | O |
| C-1519 | H | single bond | Me | $CH_2CF_3$ | C(=O)(i-Pr) | Me | $CH_2OMe$ | O |
| C-1520 | Me | single bond | H | $CH_2CF_3$ | C(=O)(i-Pr) | Me | $CH_2OMe$ | O |
| C-1521 | Me(R) | single bond | H | $CH_2CF_3$ | C(=O)(i-Pr) | Me | $CH_2OMe$ | O |
| C-1522 | Me(S) | single bond | H | $CH_2CF_3$ | C(=O)(i-Pr) | Me | $CH_2OMe$ | O |
| C-1523 | H | $CH_2$ | Me | $CH_2CF_3$ | C(=O)(i-Pr) | Me | $CH_2OMe$ | O |
| C-1524 | Me | $CH_2$ | H | $CH_2CF_3$ | C(=O)(i-Pr) | Me | $CH_2OMe$ | O |
| C-1525 | H | CH(Me) | H | $CH_2CF_3$ | C(=O)(i-Pr) | Me | $CH_2OMe$ | O |
| C-1526 | H | $CH_2CH_2$ | Me | $CH_2CF_3$ | C(=O)(i-Pr) | Me | $CH_2OMe$ | O |
| C-1527 | Me | $CH_2CH_2$ | H | $CH_2CF_3$ | C(=O)(i-Pr) | Me | $CH_2OMe$ | O |
| C-1528 | H | single bond | Me | $CH_2CF_3$ | C(=O)(i-Pr) | Cl | $CH_2CN$ | O |
| C-1529 | Me | single bond | H | $CH_2CF_3$ | C(=O)(i-Pr) | Cl | $CH_2CN$ | O |
| C-1530 | Me(R) | single bond | H | $CH_2CF_3$ | C(=O)(i-Pr) | Cl | $CH_2CN$ | O |
| C-1531 | Me(S) | single bond | H | $CH_2CF_3$ | C(=O)(i-Pr) | Cl | $CH_2CN$ | O |
| C-1532 | H | $CH_2$ | Me | $CH_2CF_3$ | C(=O)(i-Pr) | Cl | $CH_2CN$ | O |
| C-1533 | Me | $CH_2$ | H | $CH_2CF_3$ | C(=O)(i-Pr) | Cl | $CH_2CN$ | O |
| C-1534 | H | CH(Me) | H | $CH_2CF_3$ | C(=O)(i-Pr) | Cl | $CH_2CN$ | O |

TABLE 262

| Compound Number | Y | W | Z | $R^1$ | $R^2$ | $R^3$ | $R^{10}$ | A |
|---|---|---|---|---|---|---|---|---|
| C-1535 | H | $CH_2CH_2$ | Me | $CH_2CF_3$ | C(=O)(i-Pr) | Cl | $CH_2CN$ | O |
| C-1536 | Me | $CH_2CH_2$ | H | $CH_2CF_3$ | C(=O)(i-Pr) | Cl | $CH_2CN$ | O |
| C-1537 | H | single bond | Me | $CH_2CF_3$ | C(=O)(i-Pr) | Me | $CH_2CN$ | O |
| C-1538 | Me | single bond | H | $CH_2CF_3$ | C(=O)(i-Pr) | Me | $CH_2CN$ | O |
| C-1539 | Me(R) | single bond | H | $CH_2CF_3$ | C(=O)(i-Pr) | Me | $CH_2CN$ | O |
| C-1540 | Me(S) | single bond | H | $CH_2CF_3$ | C(=O)(i-Pr) | Me | $CH_2CN$ | O |
| C-1541 | H | $CH_2$ | Me | $CH_2CF_3$ | C(=O)(i-Pr) | Me | $CH_2CN$ | O |
| C-1542 | Me | $CH_2$ | H | $CH_2CF_3$ | C(=O)(i-Pr) | Me | $CH_2CN$ | O |

TABLE 262-continued

| Compound Number | Y | W | Z | $R^1$ | $R^2$ | $R^3$ | $R^{10}$ | A |
|---|---|---|---|---|---|---|---|---|
| C-1543 | H | CH(Me) | H | $CH_2CF_3$ | C(=O)(i-Pr) | Me | $CH_2CN$ | O |
| C-1544 | H | $CH_2CH_2$ | Me | $CH_2CF_3$ | C(=O)(i-Pr) | Me | $CH_2CN$ | O |
| C-1545 | Me | $CH_2CH_2$ | H | $CH_2CF_3$ | C(=O)(i-Pr) | Me | $CH_2CN$ | O |
| C-1546 | H | single bond | Me | $CH_2CF_3$ | C(=O)(i-Pr) | Cl | C(=O)Me | O |
| C-1547 | Me | single bond | H | $CH_2CF_3$ | C(=O)(i-Pr) | Cl | C(=O)Me | O |
| C-1548 | Me(R) | single bond | H | $CH_2CF_3$ | C(=O)(i-Pr) | Cl | C(=O)Me | O |
| C-1549 | Me(S) | single bond | H | $CH_2CF_3$ | C(=O)(i-Pr) | Cl | C(=O)Me | O |
| C-1550 | H | $CH_2$ | Me | $CH_2CF_3$ | C(=O)(i-Pr) | Cl | C(=O)Me | O |
| C-1551 | Me | $CH_2$ | H | $CH_2CF_3$ | C(=O)(i-Pr) | Cl | C(=O)Me | O |
| C-1552 | H | CH(Me) | H | $CH_2CF_3$ | C(=O)(i-Pr) | Cl | C(=O)Me | O |
| C-1553 | H | $CH_2CH_2$ | Me | $CH_2CF_3$ | C(=O)(i-Pr) | Cl | C(=O)Me | O |
| C-1554 | Me | $CH_2CH_2$ | H | $CH_2CF_3$ | C(=O)(i-Pr) | Cl | C(=O)Me | O |
| C-1555 | H | single bond | Me | $CH_2CF_3$ | C(=O)(i-Pr) | Me | C(=O)Me | O |
| C-1556 | Me | single bond | H | $CH_2CF_3$ | C(=O)(i-Pr) | Me | C(=O)Me | O |
| C-1557 | Me(R) | single bond | H | $CH_2CF_3$ | C(=O)(i-Pr) | Me | C(=O)Me | O |
| C-1558 | Me(S) | single bond | H | $CH_2CF_3$ | C(=O)(i-Pr) | Me | C(=O)Me | O |
| C-1559 | H | $CH_2$ | Me | $CH_2CF_3$ | C(=O)(i-Pr) | Me | C(=O)Me | O |
| C-1560 | Me | $CH_2$ | H | $CH_2CF_3$ | C(=O)(i-Pr) | Me | C(=O)Me | O |
| C-1561 | H | CH(Me) | H | $CH_2CF_3$ | C(=O)(i-Pr) | Me | C(=O)Me | O |
| C-1562 | H | $CH_2CH_2$ | Me | $CH_2CF_3$ | C(=O)(i-Pr) | Me | C(=O)Me | O |
| C-1563 | Me | $CH_2CH_2$ | H | $CH_2CF_3$ | C(=O)(i-Pr) | Me | C(=O)Me | O |
| C-1564 | H | single bond | Me | $CH_2CF_3$ | C(=O)Ph | Cl | Me | O |
| C-1565 | Me | single bond | H | $CH_2CF_3$ | C(=O)Ph | Cl | Me | O |
| C-1566 | Me(R) | single bond | H | $CH_2CF_3$ | C(=O)Ph | Cl | Me | O |
| C-1567 | Me(S) | single bond | H | $CH_2CF_3$ | C(=O)Ph | Cl | Me | O |
| C-1568 | H | $CH_2$ | Me | $CH_2CF_3$ | C(=O)Ph | Cl | Me | O |
| C-1569 | Me | $CH_2$ | H | $CH_2CF_3$ | C(=O)Ph | Cl | Me | O |
| C-1570 | H | CH(Me) | H | $CH_2CF_3$ | C(=O)Ph | Cl | Me | O |
| C-1571 | H | $CH_2CH_2$ | Me | $CH_2CF_3$ | C(=O)Ph | Cl | Me | O |
| C-1572 | Me | $CH_2CH_2$ | H | $CH_2CF_3$ | C(=O)Ph | Cl | Me | O |
| C-1573 | H | single bond | Me | $CH_2CF_3$ | C(=O)Ph | Me | Me | O |
| C-1574 | Me | single bond | H | $CH_2CF_3$ | C(=O)Ph | Me | Me | O |
| C-1575 | Me(R) | single bond | H | $CH_2CF_3$ | C(=O)Ph | Me | Me | O |
| C-1576 | Me(S) | single bond | H | $CH_2CF_3$ | C(=O)Ph | Me | Me | O |
| C-1577 | H | $CH_2$ | Me | $CH_2CF_3$ | C(=O)Ph | Me | Me | O |
| C-1578 | Me | $CH_2$ | H | $CH_2CF_3$ | C(=O)Ph | Me | Me | O |

TABLE 263

| Compound Number | Y | W | Z | $R^1$ | $R^2$ | $R^3$ | $R^{10}$ | A |
|---|---|---|---|---|---|---|---|---|
| C-1579 | H | CH(Me) | H | $CH_2CF_3$ | C(=O)Ph | Me | Me | O |
| C-1580 | H | $CH_2CH_2$ | Me | $CH_2CF_3$ | C(=O)Ph | Me | Me | O |
| C-1581 | Me | $CH_2CH_2$ | H | $CH_2CF_3$ | C(=O)Ph | Me | Me | O |
| C-1582 | H | single bond | Me | $CH_2CF_3$ | C(=O)Ph | Cl | Et | O |
| C-1583 | Me | single bond | H | $CH_2CF_3$ | C(=O)Ph | Cl | Et | O |
| C-1584 | Me(R) | single bond | H | $CH_2CF_3$ | C(=O)Ph | Cl | Et | O |
| C-1585 | Me(S) | single bond | H | $CH_2CF_3$ | C(=O)Ph | Cl | Et | O |
| C-1586 | H | $CH_2$ | Me | $CH_2CF_3$ | C(=O)Ph | Cl | Et | O |
| C-1587 | Me | $CH_2$ | H | $CH_2CF_3$ | C(=O)Ph | Cl | Et | O |
| C-1588 | H | CH(Me) | H | $CH_2CF_3$ | C(=O)Ph | Cl | Et | O |
| C-1589 | H | $CH_2CH_2$ | Me | $CH_2CF_3$ | C(=O)Ph | Cl | Et | O |
| C-1590 | Me | $CH_2CH_2$ | H | $CH_2CF_3$ | C(=O)Ph | Cl | Et | O |
| C-1591 | H | single bond | Me | $CH_2CF_3$ | C(=O)Ph | Me | Et | O |
| C-1592 | Me | single bond | H | $CH_2CF_3$ | C(=O)Ph | Me | Et | O |
| C-1593 | Me(R) | single bond | H | $CH_2CF_3$ | C(=O)Ph | Me | Et | O |
| C-1594 | Me(S) | single bond | H | $CH_2CF_3$ | C(=O)Ph | Me | Et | O |
| C-1595 | H | $CH_2$ | Me | $CH_2CF_3$ | C(=O)Ph | Me | Et | O |
| C-1596 | Me | $CH_2$ | H | $CH_2CF_3$ | C(=O)Ph | Me | Et | O |
| C-1597 | H | CH(Me) | H | $CH_2CF_3$ | C(=O)Ph | Me | Et | O |
| C-1598 | H | $CH_2CH_2$ | Me | $CH_2CF_3$ | C(=O)Ph | Me | Et | O |
| C-1599 | Me | $CH_2CH_2$ | H | $CH_2CF_3$ | C(=O)Ph | Me | Et | O |
| C-1600 | H | single bond | Me | $CH_2CF_3$ | C(=O)Ph | Cl | $CH_2CF_3$ | O |
| C-1601 | Me | single bond | H | $CH_2CF_3$ | C(=O)Ph | Cl | $CH_2CF_3$ | O |
| C-1602 | Me(R) | single bond | H | $CH_2CF_3$ | C(=O)Ph | Cl | $CH_2CF_3$ | O |
| C-1603 | Me(S) | single bond | H | $CH_2CF_3$ | C(=O)Ph | Cl | $CH_2CF_3$ | O |
| C-1604 | H | $CH_2$ | Me | $CH_2CF_3$ | C(=O)Ph | Cl | $CH_2CF_3$ | O |
| C-1605 | Me | $CH_2$ | H | $CH_2CF_3$ | C(=O)Ph | Cl | $CH_2CF_3$ | O |
| C-1606 | H | CH(Me) | H | $CH_2CF_3$ | C(=O)Ph | Cl | $CH_2CF_3$ | O |
| C-1607 | H | $CH_2CH_2$ | Me | $CH_2CF_3$ | C(=O)Ph | Cl | $CH_2CF_3$ | O |
| C-1608 | Me | $CH_2CH_2$ | H | $CH_2CF_3$ | C(=O)Ph | Cl | $CH_2CF_3$ | O |
| C-1609 | H | single bond | Me | $CH_2CF_3$ | C(=O)Ph | Me | $CH_2CF_3$ | O |

TABLE 263-continued

| Compound Number | Y | W | Z | $R^1$ | $R^2$ | $R^3$ | $R^{10}$ | A |
|---|---|---|---|---|---|---|---|---|
| C-1610 | Me | single bond | H | $CH_2CF_3$ | C(=O)Ph | Me | $CH_2CF_3$ | O |
| C-1611 | Me(R) | single bond | H | $CH_2CF_3$ | C(=O)Ph | Me | $CH_2CF_3$ | O |
| C-1612 | Me(S) | single bond | H | $CH_2CF_3$ | C(=O)Ph | Me | $CH_2CF_3$ | O |
| C-1613 | H | $CH_2$ | Me | $CH_2CF_3$ | C(=O)Ph | Me | $CH_2CF_3$ | O |
| C-1614 | Me | $CH_2$ | H | $CH_2CF_3$ | C(=O)Ph | Me | $CH_2CF_3$ | O |
| C-1615 | H | CH(Me) | H | $CH_2CF_3$ | C(=O)Ph | Me | $CH_2CF_3$ | O |
| C-1616 | H | $CH_2CH_2$ | Me | $CH_2CF_3$ | C(=O)Ph | Me | $CH_2CF_3$ | O |
| C-1617 | Me | $CH_2CH_2$ | H | $CH_2CF_3$ | C(=O)Ph | Me | $CH_2CF_3$ | O |
| C-1618 | H | single bond | Me | $CH_2CF_3$ | C(=O)Ph | Cl | $CH_2OMe$ | O |
| C-1619 | Me | single bond | H | $CH_2CF_3$ | C(=O)Ph | Cl | $CH_2OMe$ | O |
| C-1620 | Me(R) | single bond | H | $CH_2CF_3$ | C(=O)Ph | Cl | $CH_2OMe$ | O |
| C-1621 | Me(S) | single bond | H | $CH_2CF_3$ | C(=O)Ph | Cl | $CH_2OMe$ | O |
| C-1622 | H | $CH_2$ | Me | $CH_2CF_3$ | C(=O)Ph | Cl | $CH_2OMe$ | O |

TABLE 264

| Compound Number | Y | W | Z | $R^1$ | $R^2$ | $R^3$ | $R^{10}$ | A |
|---|---|---|---|---|---|---|---|---|
| C-1623 | Me | $CH_2$ | H | $CH_2CF_3$ | C(=O)Ph | Cl | $CH_2OMe$ | O |
| C-1624 | H | CH(Me) | H | $CH_2CF_3$ | C(=O)Ph | Cl | $CH_2OMe$ | O |
| C-1625 | H | $CH_2CH_2$ | Me | $CH_2CF_3$ | C(=O)Ph | Cl | $CH_2OMe$ | O |
| C-1626 | Me | $CH_2CH_2$ | H | $CH_2CF_3$ | C(=O)Ph | Cl | $CH_2OMe$ | O |
| C-1627 | H | single bond | Me | $CH_2CF_3$ | C(=O)Ph | Me | $CH_2OMe$ | O |
| C-1628 | Me | single bond | H | $CH_2CF_3$ | C(=O)Ph | Me | $CH_2OMe$ | O |
| C-1629 | Me(R) | single bond | H | $CH_2CF_3$ | C(=O)Ph | Me | $CH_2OMe$ | O |
| C-1630 | Me(S) | single bond | H | $CH_2CF_3$ | C(=O)Ph | Me | $CH_2OMe$ | O |
| C-1631 | H | $CH_2$ | Me | $CH_2CF_3$ | C(=O)Ph | Me | $CH_2OMe$ | O |
| C-1632 | Me | $CH_2$ | H | $CH_2CF_3$ | C(=O)Ph | Me | $CH_2OMe$ | O |
| C-1633 | H | CH(Me) | H | $CH_2CF_3$ | C(=O)Ph | Me | $CH_2OMe$ | O |
| C-1634 | H | $CH_2CH_2$ | Me | $CH_2CF_3$ | C(=O)Ph | Me | $CH_2OMe$ | O |
| C-1635 | Me | $CH_2CH_2$ | H | $CH_2CF_3$ | C(=O)Ph | Me | $CH_2OMe$ | O |
| C-1636 | H | single bond | Me | $CH_2CF_3$ | C(=O)Ph | Cl | $CH_2CN$ | O |
| C-1637 | Me | single bond | H | $CH_2CF_3$ | C(=O)Ph | Cl | $CH_2CN$ | O |
| C-1638 | Me(R) | single bond | H | $CH_2CF_3$ | C(=O)Ph | Cl | $CH_2CN$ | O |
| C-1639 | Me(S) | single bond | H | $CH_2CF_3$ | C(=O)Ph | Cl | $CH_2CN$ | O |
| C-1640 | H | $CH_2$ | Me | $CH_2CF_3$ | C(=O)Ph | Cl | $CH_2CN$ | O |
| C-1641 | Me | $CH_2$ | H | $CH_2CF_3$ | C(=O)Ph | Cl | $CH_2CN$ | O |
| C-1642 | H | CH(Me) | H | $CH_2CF_3$ | C(=O)Ph | Cl | $CH_2CN$ | O |
| C-1643 | H | $CH_2CH_2$ | Me | $CH_2CF_3$ | C(=O)Ph | Cl | $CH_2CN$ | O |
| C-1644 | Me | $CH_2CH_2$ | H | $CH_2CF_3$ | C(=O)Ph | Cl | $CH_2CN$ | O |
| C-1645 | H | single bond | Me | $CH_2CF_3$ | C(=O)Ph | Me | $CH_2CN$ | O |
| C-1646 | Me | single bond | H | $CH_2CF_3$ | C(=O)Ph | Me | $CH_2CN$ | O |
| C-1647 | Me(R) | single bond | H | $CH_2CF_3$ | C(=O)Ph | Me | $CH_2CN$ | O |
| C-1648 | Me(S) | single bond | H | $CH_2CF_3$ | C(=O)Ph | Me | $CH_2CN$ | O |
| C-1649 | H | $CH_2$ | Me | $CH_2CF_3$ | C(=O)Ph | Me | $CH_2CN$ | O |
| C-1650 | Me | $CH_2$ | H | $CH_2CF_3$ | C(=O)Ph | Me | $CH_2CN$ | O |
| C-1651 | H | CH(Me) | H | $CH_2CF_3$ | C(=O)Ph | Me | $CH_2CN$ | O |
| C-1652 | H | $CH_2CH_2$ | Me | $CH_2CF_3$ | C(=O)Ph | Me | $CH_2CN$ | O |
| C-1653 | Me | $CH_2CH_2$ | H | $CH_2CF_3$ | C(=O)Ph | Me | $CH_2CN$ | O |
| C-1654 | H | single bond | Me | $CH_2CF_3$ | C(=O)Ph | Cl | C(=O)Me | O |
| C-1655 | Me | single bond | H | $CH_2CF_3$ | C(=O)Ph | Cl | C(=O)Me | O |
| C-1656 | Me(R) | single bond | H | $CH_2CF_3$ | C(=O)Ph | Cl | C(=O)Me | O |
| C-1657 | Me(S) | single bond | H | $CH_2CF_3$ | C(=O)Ph | Cl | C(=O)Me | O |
| C-1658 | H | $CH_2$ | Me | $CH_2CF_3$ | C(=O)Ph | Cl | C(=O)Me | O |
| C-1659 | Me | $CH_2$ | H | $CH_2CF_3$ | C(=O)Ph | Cl | C(=O)Me | O |
| C-1660 | H | CH(Me) | H | $CH_2CF_3$ | C(=O)Ph | Cl | C(=O)Me | O |
| C-1661 | H | $CH_2CH_2$ | Me | $CH_2CF_3$ | C(=O)Ph | Cl | C(=O)Me | O |
| C-1662 | Me | $CH_2CH_2$ | H | $CH_2CF_3$ | C(=O)Ph | Cl | C(=O)Me | O |
| C-1663 | H | single bond | Me | $CH_2CF_3$ | C(=O)Ph | Me | C(=O)Me | O |
| C-1664 | Me | single bond | H | $CH_2CF_3$ | C(=O)Ph | Me | C(=O)Me | O |
| C-1665 | Me(R) | single bond | H | $CH_2CF_3$ | C(=O)Ph | Me | C(=O)Me | O |
| C-1666 | Me(S) | single bond | H | $CH_2CF_3$ | C(=O)Ph | Me | C(=O)Me | O |

TABLE 265

| Compound Number | Y | W | Z | $R^1$ | $R^2$ | $R^3$ | $R^{10}$ | A |
|---|---|---|---|---|---|---|---|---|
| C-1667 | H | $CH_2$ | Me | $CH_2CF_3$ | C(=O)Ph | Me | C(=O)Me | O |
| C-1668 | Me | $CH_2$ | H | $CH_2CF_3$ | C(=O)Ph | Me | C(=O)Me | O |
| C-1669 | H | CH(Me) | H | $CH_2CF_3$ | C(=O)Ph | Me | C(=O)Me | O |
| C-1670 | H | $CH_2CH_2$ | Me | $CH_2CF_3$ | C(=O)Ph | Me | C(=O)Me | O |
| C-1671 | Me | $CH_2CH_2$ | H | $CH_2CF_3$ | C(=O)Ph | Me | C(=O)Me | O |
| C-1672 | H | single bond | Me | $CH_2CF_3$ | C(=O)OEt | Cl | Me | O |
| C-1673 | H | single bond | Et | $CH_2CF_3$ | C(=O)OEt | Cl | Me | O |
| C-1674 | Me | single bond | H | $CH_2CF_3$ | C(=O)OEt | Cl | Me | O |
| C-1675 | Me(R) | single bond | H | $CH_2CF_3$ | C(=O)OEt | Cl | Me | O |
| C-1676 | Me(S) | single bond | H | $CH_2CF_3$ | C(=O)OEt | Cl | Me | O |
| C-1677 | H | $CH_2$ | Me | $CH_2CF_3$ | C(=O)OEt | Cl | Me | O |
| C-1678 | Me | $CH_2$ | H | $CH_2CF_3$ | C(=O)OEt | Cl | Me | O |
| C-1679 | H | CH(Me) | H | $CH_2CF_3$ | C(=O)OEt | Cl | Me | O |
| C-1680 | H | $CH_2CH_2$ | Me | $CH_2CF_3$ | C(=O)OEt | Cl | Me | O |
| C-1681 | Me | $CH_2CH_2$ | H | $CH_2CF_3$ | C(=O)OEt | Cl | Me | O |
| C-1682 | H | single bond | Me | $CH_2CF_3$ | C(=O)OEt | Me | Me | O |
| C-1683 | Me | single bond | H | $CH_2CF_3$ | C(=O)OEt | Me | Me | O |
| C-1684 | Me(R) | single bond | H | $CH_2CF_3$ | C(=O)OEt | Me | Me | O |
| C-1685 | Me(S) | single bond | H | $CH_2CF_3$ | C(=O)OEt | Me | Me | O |
| C-1686 | H | $CH_2$ | Me | $CH_2CF_3$ | C(=O)OEt | Me | Me | O |
| C-1687 | Me | $CH_2$ | H | $CH_2CF_3$ | C(=O)OEt | Me | Me | O |
| C-1688 | H | CH(Me) | H | $CH_2CF_3$ | C(=O)OEt | Me | Me | O |
| C-1689 | H | $CH_2CH_2$ | Me | $CH_2CF_3$ | C(=O)OEt | Me | Me | O |
| C-1690 | Me | $CH_2CH_2$ | H | $CH_2CF_3$ | C(=O)OEt | Me | Me | O |
| C-1691 | H | single bond | Me | $CH_2CF_3$ | C(=O)OEt | Cl | Et | O |
| C-1692 | Me | single bond | H | $CH_2CF_3$ | C(=O)OEt | Cl | Et | O |
| C-1693 | Me(R) | single bond | H | $CH_2CF_3$ | C(=O)OEt | Cl | Et | O |
| C-1694 | Me(S) | single bond | H | $CH_2CF_3$ | C(=O)OEt | Cl | Et | O |
| C-1695 | H | $CH_2$ | Me | $CH_2CF_3$ | C(=O)OEt | Cl | Et | O |
| C-1696 | Me | $CH_2$ | H | $CH_2CF_3$ | C(=O)OEt | Cl | Et | O |
| C-1697 | H | CH(Me) | H | $CH_2CF_3$ | C(=O)OEt | Cl | Et | O |
| C-1698 | H | $CH_2CH_2$ | Me | $CH_2CF_3$ | C(=O)OEt | Cl | Et | O |
| C-1699 | Me | $CH_2CH_2$ | H | $CH_2CF_3$ | C(=O)OEt | Cl | Et | O |
| C-1700 | H | single bond | Me | $CH_2CF_3$ | C(=O)OEt | Me | Et | O |
| C-1701 | Me | single bond | H | $CH_2CF_3$ | C(=O)OEt | Me | Et | O |
| C-1702 | Me(R) | single bond | H | $CH_2CF_3$ | C(=O)OEt | Me | Et | O |
| C-1703 | Me(S) | single bond | H | $CH_2CF_3$ | C(=O)OEt | Me | Et | O |
| C-1704 | H | $CH_2$ | Me | $CH_2CF_3$ | C(=O)OEt | Me | Et | O |
| C-1705 | Me | $CH_2$ | H | $CH_2CF_3$ | C(=O)OEt | Me | Et | O |
| C-1706 | H | CH(Me) | H | $CH_2CF_3$ | C(=O)OEt | Me | Et | O |
| C-1707 | H | $CH_2CH_2$ | Me | $CH_2CF_3$ | C(=O)OEt | Me | Et | O |
| C-1708 | Me | $CH_2CH_2$ | H | $CH_2CF_3$ | C(=O)OEt | Me | Et | O |
| C-1709 | H | single bond | Me | $CH_2CF_3$ | C(=O)OEt | Cl | $CH_2CF_3$ | O |
| C-1710 | Me | single bond | H | $CH_2CF_3$ | C(=O)OEt | Cl | $CH_2CF_3$ | O |

TABLE 266

| Compound Number | Y | W | Z | $R^1$ | $R^2$ | $R^3$ | $R^{10}$ | A |
|---|---|---|---|---|---|---|---|---|
| C-1711 | Me(R) | single bond | H | $CH_2CF_3$ | C(=O)OEt | Cl | $CH_2CF_3$ | O |
| C-1712 | Me(S) | single bond | H | $CH_2CF_3$ | C(=O)OEt | Cl | $CH_2CF_3$ | O |
| C-1713 | H | $CH_2$ | Me | $CH_2CF_3$ | C(=O)OEt | Cl | $CH_2CF_3$ | O |
| C-1714 | Me | $CH_2$ | H | $CH_2CF_3$ | C(=O)OEt | Cl | $CH_2CF_3$ | O |
| C-1715 | H | CH(Me) | H | $CH_2CF_3$ | C(=O)OEt | Cl | $CH_2CF_3$ | O |
| C-1716 | H | $CH_2CH_2$ | Me | $CH_2CF_3$ | C(=O)OEt | Cl | $CH_2CF_3$ | O |
| C-1717 | Me | $CH_2CH_2$ | H | $CH_2CF_3$ | C(=O)OEt | Cl | $CH_2CF_3$ | O |
| C-1718 | H | single bond | Me | $CH_2CF_3$ | C(=O)OEt | Me | $CH_2CF_3$ | O |
| C-1719 | Me | single bond | H | $CH_2CF_3$ | C(=O)OEt | Me | $CH_2CF_3$ | O |
| C-1720 | Me(R) | single bond | H | $CH_2CF_3$ | C(=O)OEt | Me | $CH_2CF_3$ | O |
| C-1721 | Me(S) | single bond | H | $CH_2CF_3$ | C(=O)OEt | Me | $CH_2CF_3$ | O |
| C-1722 | H | $CH_2$ | Me | $CH_2CF_3$ | C(=O)OEt | Me | $CH_2CF_3$ | O |
| C-1723 | Me | $CH_2$ | H | $CH_2CF_3$ | C(=O)OEt | Me | $CH_2CF_3$ | O |
| C-1724 | H | CH(Me) | H | $CH_2CF_3$ | C(=O)OEt | Me | $CH_2CF_3$ | O |
| C-1725 | H | $CH_2CH_2$ | Me | $CH_2CF_3$ | C(=O)OEt | Me | $CH_2CF_3$ | O |
| C-1726 | Me | $CH_2CH_2$ | H | $CH_2CF_3$ | C(=O)OEt | Me | $CH_2CF_3$ | O |
| C-1727 | H | single bond | Me | $CH_2CF_3$ | C(=O)OEt | Cl | $CH_2OMe$ | O |
| C-1728 | Me | single bond | H | $CH_2CF_3$ | C(=O)OEt | Cl | $CH_2OMe$ | O |
| C-1729 | Me(R) | single bond | H | $CH_2CF_3$ | C(=O)OEt | Cl | $CH_2OMe$ | O |
| C-1730 | Me(S) | single bond | H | $CH_2CF_3$ | C(=O)OEt | Cl | $CH_2OMe$ | O |
| C-1731 | H | $CH_2$ | Me | $CH_2CF_3$ | C(=O)OEt | Cl | $CH_2OMe$ | O |
| C-1732 | Me | $CH_2$ | H | $CH_2CF_3$ | C(=O)OEt | Cl | $CH_2OMe$ | O |
| C-1733 | H | CH(Me) | H | $CH_2CF_3$ | C(=O)OEt | Cl | $CH_2OMe$ | O |

TABLE 266-continued

| Compound Number | Y | W | Z | $R^1$ | $R^2$ | $R^3$ | $R^{10}$ | A |
|---|---|---|---|---|---|---|---|---|
| C-1734 | H | $CH_2CH_2$ | Me | $CH_2CF_3$ | C(=O)OEt | Cl | $CH_2OMe$ | O |
| C-1735 | Me | $CH_2CH_2$ | H | $CH_2CF_3$ | C(=O)OEt | Cl | $CH_2OMe$ | O |
| C-1736 | H | single bond | Me | $CH_2CF_3$ | C(=O)OEt | Me | $CH_2OMe$ | O |
| C-1737 | Me | single bond | H | $CH_2CF_3$ | C(=O)OEt | Me | $CH_2OMe$ | O |
| C-1738 | Me(R) | single bond | H | $CH_2CF_3$ | C(=O)OEt | Me | $CH_2OMe$ | O |
| C-1739 | Me(S) | single bond | H | $CH_2CF_3$ | C(=O)OEt | Me | $CH_2OMe$ | O |
| C-1740 | H | $CH_2$ | Me | $CH_2CF_3$ | C(=O)OEt | Me | $CH_2OMe$ | O |
| C-1741 | Me | $CH_2$ | H | $CH_2CF_3$ | C(=O)OEt | Me | $CH_2OMe$ | O |
| C-1742 | H | CH(Me) | H | $CH_2CF_3$ | C(=O)OEt | Me | $CH_2OMe$ | O |
| C-1743 | H | $CH_2CH_2$ | Me | $CH_2CF_3$ | C(=O)OEt | Me | $CH_2OMe$ | O |
| C-1744 | Me | $CH_2CH_2$ | H | $CH_2CF_3$ | C(=O)OEt | Me | $CH_2OMe$ | O |
| C-1745 | H | single bond | Me | $CH_2CF_3$ | C(=O)OEt | Cl | $CH_2CN$ | O |
| C-1746 | Me | single bond | H | $CH_2CF_3$ | C(=O)OEt | Cl | $CH_2CN$ | O |
| C-1747 | Me(R) | single bond | H | $CH_2CF_3$ | C(=O)OEt | Cl | $CH_2CN$ | O |
| C-1748 | Me(S) | single bond | H | $CH_2CF_3$ | C(=O)OEt | Cl | $CH_2CN$ | O |
| C-1749 | H | $CH_2$ | Me | $CH_2CF_3$ | C(=O)OEt | Cl | $CH_2CN$ | O |
| C-1750 | Me | $CH_2$ | H | $CH_2CF_3$ | C(=O)OEt | Cl | $CH_2CN$ | O |
| C-1751 | H | CH(Me) | H | $CH_2CF_3$ | C(=O)OEt | Cl | $CH_2CN$ | O |
| C-1752 | H | $CH_2CH_2$ | Me | $CH_2CF_3$ | C(=O)OEt | Cl | $CH_2CN$ | O |
| C-1753 | Me | $CH_2CH_2$ | H | $CH_2CF_3$ | C(=O)OEt | Cl | $CH_2CN$ | O |
| C-1754 | H | single bond | Me | $CH_2CF_3$ | C(=O)OEt | Me | $CH_2CN$ | O |

TABLE 267

| Compound Number | Y | W | Z | $R^1$ | $R^2$ | $R^3$ | $R^{10}$ | A |
|---|---|---|---|---|---|---|---|---|
| C-1755 | Me | single bond | H | $CH_2CF_3$ | C(=O)OEt | Me | $CH_2CN$ | O |
| C-1756 | Me(R) | single bond | H | $CH_2CF_3$ | C(=O)OEt | Me | $CH_2CN$ | O |
| C-1757 | Me(S) | single bond | H | $CH_2CF_3$ | C(=O)OEt | Me | $CH_2CN$ | O |
| C-1758 | H | $CH_2$ | Me | $CH_2CF_3$ | C(=O)OEt | Me | $CH_2CN$ | O |
| C-1759 | Me | $CH_2$ | H | $CH_2CF_3$ | C(=O)OEt | Me | $CH_2CN$ | O |
| C-1760 | H | CH(Me) | H | $CH_2CF_3$ | C(=O)OEt | Me | $CH_2CN$ | O |
| C-1761 | H | $CH_2CH_2$ | Me | $CH_2CF_3$ | C(=O)OEt | Me | $CH_2CN$ | O |
| C-1762 | Me | $CH_2CH_2$ | H | $CH_2CF_3$ | C(=O)OEt | Me | $CH_2CN$ | O |
| C-1763 | H | single bond | Me | $CH_2CF_3$ | C(=O)OEt | Cl | C(=O)Me | O |
| C-1764 | Me | single bond | H | $CH_2CF_3$ | C(=O)OEt | Cl | C(=O)Me | O |
| C-1765 | Me(R) | single bond | H | $CH_2CF_3$ | C(=O)OEt | Cl | C(=O)Me | O |
| C-1766 | Me(S) | single bond | H | $CH_2CF_3$ | C(=O)OEt | Cl | C(=O)Me | O |
| C-1767 | H | $CH_2$ | Me | $CH_2CF_3$ | C(=O)OEt | Cl | C(=O)Me | O |
| C-1768 | Me | $CH_2$ | H | $CH_2CF_3$ | C(=O)OEt | Cl | C(=O)Me | O |
| C-1769 | H | CH(Me) | H | $CH_2CF_3$ | C(=O)OEt | Cl | C(=O)Me | O |
| C-1770 | H | $CH_2CH_2$ | Me | $CH_2CF_3$ | C(=O)OEt | Cl | C(=O)Me | O |
| C-1771 | Me | $CH_2CH_2$ | H | $CH_2CF_3$ | C(=O)OEt | Cl | C(=O)Me | O |
| C-1772 | H | single bond | Me | $CH_2CF_3$ | C(=O)OEt | Me | C(=O)Me | O |
| C-1773 | Me | single bond | H | $CH_2CF_3$ | C(=O)OEt | Me | C(=O)Me | O |
| C-1774 | Me(R) | single bond | H | $CH_2CF_3$ | C(=O)OEt | Me | C(=O)Me | O |
| C-1775 | Me(S) | single bond | H | $CH_2CF_3$ | C(=O)OEt | Me | C(=O)Me | O |
| C-1776 | H | $CH_2$ | Me | $CH_2CF_3$ | C(=O)OEt | Me | C(=O)Me | O |
| C-1777 | Me | $CH_2$ | H | $CH_2CF_3$ | C(=O)OEt | Me | C(=O)Me | O |
| C-1778 | H | CH(Me) | H | $CH_2CF_3$ | C(=O)OEt | Me | C(=O)Me | O |
| C-1779 | H | $CH_2CH_2$ | Me | $CH_2CF_3$ | C(=O)OEt | Me | C(=O)Me | O |
| C-1780 | Me | $CH_2CH_2$ | H | $CH_2CF_3$ | C(=O)OEt | Me | C(=O)Me | O |
| C-1781 | H | single bond | Me | $CH_2CF_3$ | $S(=O)_2Me$ | Cl | Me | O |
| C-1782 | H | single bond | Et | $CH_2CF_3$ | $S(=O)_2Me$ | Cl | Me | O |
| C-1783 | Me | single bond | H | $CH_2CF_3$ | $S(=O)_2Me$ | Cl | Me | O |
| C-1784 | Me(R) | single bond | H | $CH_2CF_3$ | $S(=O)_2Me$ | Cl | Me | O |
| C-1785 | Me(S) | single bond | H | $CH_2CF_3$ | $S(=O)_2Me$ | Cl | Me | O |
| C-1786 | H | $CH_2$ | Me | $CH_2CF_3$ | $S(=O)_2Me$ | Cl | Me | O |
| C-1787 | Me | $CH_2$ | H | $CH_2CF_3$ | $S(=O)_2Me$ | Cl | Me | O |
| C-1788 | H | CH(Me) | H | $CH_2CF_3$ | $S(=O)_2Me$ | Cl | Me | O |
| C-1789 | H | $CH_2CH_2$ | Me | $CH_2CF_3$ | $S(=O)_2Me$ | Cl | Me | O |
| C-1790 | Me | $CH_2CH_2$ | H | $CH_2CF_3$ | $S(=O)_2Me$ | Cl | Me | O |
| C-1791 | H | single bond | Me | $CH_2CF_3$ | $S(=O)_2Me$ | Me | Me | O |
| C-1792 | Me | single bond | H | $CH_2CF_3$ | $S(=O)_2Me$ | Me | Me | O |
| C-1793 | Me(R) | single bond | H | $CH_2CF_3$ | $S(=O)_2Me$ | Me | Me | O |
| C-1794 | Me(S) | single bond | H | $CH_2CF_3$ | $S(=O)_2Me$ | Me | Me | O |
| C-1795 | H | $CH_2$ | Me | $CH_2CF_3$ | $S(=O)_2Me$ | Me | Me | O |
| C-1796 | Me | $CH_2$ | H | $CH_2CF_3$ | $S(=O)_2Me$ | Me | Me | O |
| C-1797 | H | CH(Me) | H | $CH_2CF_3$ | $S(=O)_2Me$ | Me | Me | O |
| C-1798 | H | $CH_2CH_2$ | Me | $CH_2CF_3$ | $S(=O)_2Me$ | Me | Me | O |

TABLE 268

| Compound Number | Y | W | Z | $R^1$ | $R^2$ | $R^3$ | $R^{10}$ | A |
|---|---|---|---|---|---|---|---|---|
| C-1799 | Me | $CH_2CH_2$ | H | $CH_2CF_3$ | $S(=O)_2Me$ | Me | Me | O |
| C-1800 | H | single bond | Me | $CH_2CF_3$ | $S(=O)_2Me$ | Cl | Et | O |
| C-1801 | Me | single bond | H | $CH_2CF_3$ | $S(=O)_2Me$ | Cl | Et | O |
| C-1802 | Me(R) | single bond | H | $CH_2CF_3$ | $S(=O)_2Me$ | Cl | Et | O |
| C-1803 | Me(S) | single bond | H | $CH_2CF_3$ | $S(=O)_2Me$ | Cl | Et | O |
| C-1804 | H | $CH_2$ | Me | $CH_2CF_3$ | $S(=O)_2Me$ | Cl | Et | O |
| C-1805 | Me | $CH_2$ | H | $CH_2CF_3$ | $S(=O)_2Me$ | Cl | Et | O |
| C-1806 | H | CH(Me) | H | $CH_2CF_3$ | $S(=O)_2Me$ | Cl | Et | O |
| C-1807 | H | $CH_2CH_2$ | Me | $CH_2CF_3$ | $S(=O)_2Me$ | Cl | Et | O |
| C-1808 | Me | $CH_2CH_2$ | H | $CH_2CF_3$ | $S(=O)_2Me$ | Cl | Et | O |
| C-1809 | H | single bond | Me | $CH_2CF_3$ | $S(=O)_2Me$ | Me | Et | O |
| C-1810 | Me | single bond | H | $CH_2CF_3$ | $S(=O)_2Me$ | Me | Et | O |
| C-1811 | Me(R) | single bond | H | $CH_2CF_3$ | $S(=O)_2Me$ | Me | Et | O |
| C-1812 | Me(S) | single bond | H | $CH_2CF_3$ | $S(=O)_2Me$ | Me | Et | O |
| C-1813 | H | $CH_2$ | Me | $CH_2CF_3$ | $S(=O)_2Me$ | Me | Et | O |
| C-1814 | Me | $CH_2$ | H | $CH_2CF_3$ | $S(=O)_2Me$ | Me | Et | O |
| C-1815 | H | CH(Me) | H | $CH_2CF_3$ | $S(=O)_2Me$ | Me | Et | O |
| C-1816 | H | $CH_2CH_2$ | Me | $CH_2CF_3$ | $S(=O)_2Me$ | Me | Et | O |
| C-1817 | Me | $CH_2CH_2$ | H | $CH_2CF_3$ | $S(=O)_2Me$ | Me | Et | O |
| C-1818 | H | single bond | Me | $CH_2CF_3$ | $S(=O)_2Me$ | Cl | $CH_2CF_3$ | O |
| C-1819 | Me | single bond | H | $CH_2CF_3$ | $S(=O)_2Me$ | Cl | $CH_2CF_3$ | O |
| C-1820 | Me(R) | single bond | H | $CH_2CF_3$ | $S(=O)_2Me$ | Cl | $CH_2CF_3$ | O |
| C-1821 | Me(S) | single bond | H | $CH_2CF_3$ | $S(=O)_2Me$ | Cl | $CH_2CF_3$ | O |
| C-1822 | H | $CH_2$ | Me | $CH_2CF_3$ | $S(=O)_2Me$ | Cl | $CH_2CF_3$ | O |
| C-1823 | Me | $CH_2$ | H | $CH_2CF_3$ | $S(=O)_2Me$ | Cl | $CH_2CF_3$ | O |
| C-1824 | H | CH(Me) | H | $CH_2CF_3$ | $S(=O)_2Me$ | Cl | $CH_2CF_3$ | O |
| C-1825 | H | $CH_2CH_2$ | Me | $CH_2CF_3$ | $S(=O)_2Me$ | Cl | $CH_2CF_3$ | O |
| C-1826 | Me | $CH_2CH_2$ | H | $CH_2CF_3$ | $S(=O)_2Me$ | Cl | $CH_2CF_3$ | O |
| C-1827 | H | single bond | Me | $CH_2CF_3$ | $S(=O)_2Me$ | Me | $CH_2CF_3$ | O |
| C-1828 | Me | single bond | H | $CH_2CF_3$ | $S(=O)_2Me$ | Me | $CH_2CF_3$ | O |
| C-1829 | Me(R) | single bond | H | $CH_2CF_3$ | $S(=O)_2Me$ | Me | $CH_2CF_3$ | O |
| C-1830 | Me(S) | single bond | H | $CH_2CF_3$ | $S(=O)_2Me$ | Me | $CH_2CF_3$ | O |
| C-1831 | H | $CH_2$ | Me | $CH_2CF_3$ | $S(=O)_2Me$ | Me | $CH_2CF_3$ | O |
| C-1832 | Me | $CH_2$ | H | $CH_2CF_3$ | $S(=O)_2Me$ | Me | $CH_2CF_3$ | O |
| C-1833 | H | CH(Me) | H | $CH_2CF_3$ | $S(=O)_2Me$ | Me | $CH_2CF_3$ | O |
| C-1834 | H | $CH_2CH_2$ | Me | $CH_2CF_3$ | $S(=O)_2Me$ | Me | $CH_2CF_3$ | O |
| C-1835 | Me | $CH_2CH_2$ | H | $CH_2CF_3$ | $S(=O)_2Me$ | Me | $CH_2CF_3$ | O |
| C-1836 | H | single bond | Me | $CH_2CF_3$ | $S(=O)_2Me$ | Cl | $CH_2OMe$ | O |
| C-1837 | Me | single bond | H | $CH_2CF_3$ | $S(=O)_2Me$ | Cl | $CH_2OMe$ | O |
| C-1838 | Me(R) | single bond | H | $CH_2CF_3$ | $S(=O)_2Me$ | Cl | $CH_2OMe$ | O |
| C-1839 | Me(S) | single bond | H | $CH_2CF_3$ | $S(=O)_2Me$ | Cl | $CH_2OMe$ | O |
| C-1840 | H | $CH_2$ | Me | $CH_2CF_3$ | $S(=O)_2Me$ | Cl | $CH_2OMe$ | O |
| C-1841 | Me | $CH_2$ | H | $CH_2CF_3$ | $S(=O)_2Me$ | Cl | $CH_2OMe$ | O |
| C-1842 | H | CH(Me) | H | $CH_2CF_3$ | $S(=O)_2Me$ | Cl | $CH_2OMe$ | O |

TABLE 269

| Compound Number | Y | W | Z | $R^1$ | $R^2$ | $R^3$ | $R^{10}$ | A |
|---|---|---|---|---|---|---|---|---|
| C-1843 | H | $CH_2CH_2$ | Me | $CH_2CF_3$ | $S(=O)_2Me$ | Cl | $CH_2OMe$ | O |
| C-1844 | Me | $CH_2CH_2$ | H | $CH_2CF_3$ | $S(=O)_2Me$ | Cl | $CH_2OMe$ | O |
| C-1845 | H | single bond | Me | $CH_2CF_3$ | $S(=O)_2Me$ | Me | $CH_2OMe$ | O |
| C-1846 | Me | single bond | H | $CH_2CF_3$ | $S(=O)_2Me$ | Me | $CH_2OMe$ | O |
| C-1847 | Me(R) | single bond | H | $CH_2CF_3$ | $S(=O)_2Me$ | Me | $CH_2OMe$ | O |
| C-1848 | Me(S) | single bond | H | $CH_2CF_3$ | $S(=O)_2Me$ | Me | $CH_2OMe$ | O |
| C-1849 | H | $CH_2$ | Me | $CH_2CF_3$ | $S(=O)_2Me$ | Me | $CH_2OMe$ | O |
| C-1850 | Me | $CH_2$ | H | $CH_2CF_3$ | $S(=O)_2Me$ | Me | $CH_2OMe$ | O |
| C-1851 | H | CH(Me) | H | $CH_2CF_3$ | $S(=O)_2Me$ | Me | $CH_2OMe$ | O |
| C-1852 | H | $CH_2CH_2$ | Me | $CH_2CF_3$ | $S(=O)_2Me$ | Me | $CH_2OMe$ | O |
| C-1853 | Me | $CH_2CH_2$ | H | $CH_2CF_3$ | $S(=O)_2Me$ | Me | $CH_2OMe$ | O |
| C-1854 | H | single bond | Me | $CH_2CF_3$ | $S(=O)_2Me$ | Cl | $CH_2CN$ | O |
| C-1855 | Me | single bond | H | $CH_2CF_3$ | $S(=O)_2Me$ | Cl | $CH_2CN$ | O |
| C-1856 | Me(R) | single bond | H | $CH_2CF_3$ | $S(=O)_2Me$ | Cl | $CH_2CN$ | O |
| C-1857 | Me(S) | single bond | H | $CH_2CF_3$ | $S(=O)_2Me$ | Cl | $CH_2CN$ | O |
| C-1858 | H | $CH_2$ | Me | $CH_2CF_3$ | $S(=O)_2Me$ | Cl | $CH_2CN$ | O |
| C-1859 | Me | $CH_2$ | H | $CH_2CF_3$ | $S(=O)_2Me$ | Cl | $CH_2CN$ | O |
| C-1860 | H | CH(Me) | H | $CH_2CF_3$ | $S(=O)_2Me$ | Cl | $CH_2CN$ | O |
| C-1861 | H | $CH_2CH_2$ | Me | $CH_2CF_3$ | $S(=O)_2Me$ | Cl | $CH_2CN$ | O |
| C-1862 | Me | $CH_2CH_2$ | H | $CH_2CF_3$ | $S(=O)_2Me$ | Cl | $CH_2CN$ | O |
| C-1863 | H | single bond | Me | $CH_2CF_3$ | $S(=O)_2Me$ | Me | $CH_2CN$ | O |

TABLE 269-continued

| Compound Number | Y | W | Z | $R^1$ | $R^2$ | $R^3$ | $R^{10}$ | A |
|---|---|---|---|---|---|---|---|---|
| C-1864 | Me | single bond | H | $CH_2CF_3$ | $S(=O)_2Me$ | Me | $CH_2CN$ | O |
| C-1865 | Me(R) | single bond | H | $CH_2CF_3$ | $S(=O)_2Me$ | Me | $CH_2CN$ | O |
| C-1866 | Me(S) | single bond | H | $CH_2CF_3$ | $S(=O)_2Me$ | Me | $CH_2CN$ | O |
| C-1867 | H | $CH_2$ | Me | $CH_2CF_3$ | $S(=O)_2Me$ | Me | $CH_2CN$ | O |
| C-1868 | Me | $CH_2$ | H | $CH_2CF_3$ | $S(=O)_2Me$ | Me | $CH_2CN$ | O |
| C-1869 | H | CH(Me) | H | $CH_2CF_3$ | $S(=O)_2Me$ | Me | $CH_2CN$ | O |
| C-1870 | H | $CH_2CH_2$ | Me | $CH_2CF_3$ | $S(=O)_2Me$ | Me | $CH_2CN$ | O |
| C-1871 | Me | $CH_2CH_2$ | H | $CH_2CF_3$ | $S(=O)_2Me$ | Me | $CH_2CN$ | O |
| C-1872 | H | single bond | Me | $CH_2CF_3$ | $S(=O)_2Me$ | Cl | C(=O)Me | O |
| C-1873 | Me | single bond | H | $CH_2CF_3$ | $S(=O)_2Me$ | Cl | C(=O)Me | O |
| C-1874 | Me(R) | single bond | H | $CH_2CF_3$ | $S(=O)_2Me$ | Cl | C(=O)Me | O |
| C-1875 | Me(S) | single bond | H | $CH_2CF_3$ | $S(=O)_2Me$ | Cl | C(=O)Me | O |
| C-1876 | H | $CH_2$ | Me | $CH_2CF_3$ | $S(=O)_2Me$ | Cl | C(=O)Me | O |
| C-1877 | Me | $CH_2$ | H | $CH_2CF_3$ | $S(=O)_2Me$ | Cl | C(=O)Me | O |
| C-1878 | H | CH(Me) | H | $CH_2CF_3$ | $S(=O)_2Me$ | Cl | C(=O)Me | O |
| C-1879 | H | $CH_2CH_2$ | Me | $CH_2CF_3$ | $S(=O)_2Me$ | Cl | C(=O)Me | O |
| C-1880 | Me | $CH_2CH_2$ | H | $CH_2CF_3$ | $S(=O)_2Me$ | Cl | C(=O)Me | O |
| C-1881 | H | single bond | Me | $CH_2CF_3$ | $S(=O)_2Me$ | Me | C(=O)Me | O |
| C-1882 | Me | single bond | H | $CH_2CF_3$ | $S(=O)_2Me$ | Me | C(=O)Me | O |
| C-1883 | Me(R) | single bond | H | $CH_2CF_3$ | $S(=O)_2Me$ | Me | C(=O)Me | O |
| C-1884 | Me(S) | single bond | H | $CH_2CF_3$ | $S(=O)_2Me$ | Me | C(=O)Me | O |
| C-1885 | H | $CH_2$ | Me | $CH_2CF_3$ | $S(=O)_2Me$ | Me | C(=O)Me | O |
| C-1886 | Me | $CH_2$ | H | $CH_2CF_3$ | $S(=O)_2Me$ | Me | C(=O)Me | O |

TABLE 270

| Compound Number | Y | W | Z | $R^1$ | $R^2$ | $R^3$ | $R^{10}$ | A |
|---|---|---|---|---|---|---|---|---|
| C-1887 | H | CH(Me) | H | $CH_2CF_3$ | $S(=O)_2Me$ | Me | C(=O)Me | O |
| C-1888 | H | $CH_2CH_2$ | Me | $CH_2CF_3$ | $S(=O)_2Me$ | Me | C(=O)Me | O |
| C-1889 | Me | $CH_2CH_2$ | H | $CH_2CF_3$ | $S(=O)_2Me$ | Me | C(=O)Me | O |
| C-1890 | H | single bond | Me | $CH_2CF_3$ | $S(=O)_2CF_3$ | Cl | Me | O |
| C-1891 | H | single bond | Et | $CH_2CF_3$ | $S(=O)_2CF_3$ | Cl | Me | O |
| C-1892 | Me | single bond | H | $CH_2CF_3$ | $S(=O)_2CF_3$ | Cl | Me | O |
| C-1893 | Me(R) | single bond | H | $CH_2CF_3$ | $S(=O)_2CF_3$ | Cl | Me | O |
| C-1894 | Me(S) | single bond | H | $CH_2CF_3$ | $S(=O)_2CF_3$ | Cl | Me | O |
| C-1895 | H | $CH_2$ | Me | $CH_2CF_3$ | $S(=O)_2CF_3$ | Cl | Me | O |
| C-1896 | Me | $CH_2$ | H | $CH_2CF_3$ | $S(=O)_2CF_3$ | Cl | Me | O |
| C-1897 | H | CH(Me) | H | $CH_2CF_3$ | $S(=O)_2CF_3$ | Cl | Me | O |
| C-1898 | H | $CH_2CH_2$ | Me | $CH_2CF_3$ | $S(=O)_2CF_3$ | Cl | Me | O |
| C-1899 | Me | $CH_2CH_2$ | H | $CH_2CF_3$ | $S(=O)_2CF_3$ | Cl | Me | O |
| C-1900 | H | single bond | Me | $CH_2CF_3$ | $S(=O)_2CF_3$ | Me | Me | O |
| C-1901 | Me | single bond | H | $CH_2CF_3$ | $S(=O)_2CF_3$ | Me | Me | O |
| C-1902 | Me(R) | single bond | H | $CH_2CF_3$ | $S(=O)_2CF_3$ | Me | Me | O |
| C-1903 | Me(S) | single bond | H | $CH_2CF_3$ | $S(=O)_2CF_3$ | Me | Me | O |
| C-1904 | H | $CH_2$ | Me | $CH_2CF_3$ | $S(=O)_2CF_3$ | Me | Me | O |
| C-1905 | Me | $CH_2$ | H | $CH_2CF_3$ | $S(=O)_2CF_3$ | Me | Me | O |
| C-1906 | H | CH(Me) | H | $CH_2CF_3$ | $S(=O)_2CF_3$ | Me | Me | O |
| C-1907 | H | $CH_2CH_2$ | Me | $CH_2CF_3$ | $S(=O)_2CF_3$ | Me | Me | O |
| C-1908 | Me | $CH_2CH_2$ | H | $CH_2CF_3$ | $S(=O)_2CF_3$ | Me | Me | O |
| C-1909 | H | single bond | Me | $CH_2CF_3$ | $S(=O)_2CF_3$ | Cl | Et | O |
| C-1910 | Me | single bond | H | $CH_2CF_3$ | $S(=O)_2CF_3$ | Cl | Et | O |
| C-1911 | Me(R) | single bond | H | $CH_2CF_3$ | $S(=O)_2CF_3$ | Cl | Et | O |
| C-1912 | Me(S) | single bond | H | $CH_2CF_3$ | $S(=O)_2CF_3$ | Cl | Et | O |
| C-1913 | H | $CH_2$ | Me | $CH_2CF_3$ | $S(=O)_2CF_3$ | Cl | Et | O |
| C-1914 | Me | $CH_2$ | H | $CH_2CF_3$ | $S(=O)_2CF_3$ | Cl | Et | O |
| C-1915 | H | CH(Me) | H | $CH_2CF_3$ | $S(=O)_2CF_3$ | Cl | Et | O |
| C-1916 | H | $CH_2CH_2$ | Me | $CH_2CF_3$ | $S(=O)_2CF_3$ | Cl | Et | O |
| C-1917 | Me | $CH_2CH_2$ | H | $CH_2CF_3$ | $S(=O)_2CF_3$ | Cl | Et | O |
| C-1918 | H | single bond | Me | $CH_2CF_3$ | $S(=O)_2CF_3$ | Me | Et | O |
| C-1919 | Me | single bond | H | $CH_2CF_3$ | $S(=O)_2CF_3$ | Me | Et | O |
| C-1920 | Me(R) | single bond | H | $CH_2CF_3$ | $S(=O)_2CF_3$ | Me | Et | O |
| C-1921 | Me(S) | single bond | H | $CH_2CF_3$ | $S(=O)_2CF_3$ | Me | Et | O |
| C-1922 | H | $CH_2$ | Me | $CH_2CF_3$ | $S(=O)_2CF_3$ | Me | Et | O |
| C-1923 | Me | $CH_2$ | H | $CH_2CF_3$ | $S(=O)_2CF_3$ | Me | Et | O |
| C-1924 | H | CH(Me) | H | $CH_2CF_3$ | $S(=O)_2CF_3$ | Me | Et | O |
| C-1925 | H | $CH_2CH_2$ | Me | $CH_2CF_3$ | $S(=O)_2CF_3$ | Me | Et | O |
| C-1926 | Me | $CH_2CH_2$ | H | $CH_2CF_3$ | $S(=O)_2CF_3$ | Me | Et | O |
| C-1927 | H | single bond | Me | $CH_2CF_3$ | $S(=O)_2CF_3$ | Cl | $CH_2CF_3$ | O |
| C-1928 | Me | single bond | H | $CH_2CF_3$ | $S(=O)_2CF_3$ | Cl | $CH_2CF_3$ | O |
| C-1929 | Me(R) | single bond | H | $CH_2CF_3$ | $S(=O)_2CF_3$ | Cl | $CH_2CF_3$ | O |
| C-1930 | Me(S) | single bond | H | $CH_2CF_3$ | $S(=O)_2CF_3$ | Cl | $CH_2CF_3$ | O |

TABLE 271

| Compound Number | Y | W | Z | $R^1$ | $R^2$ | $R^3$ | $R^{10}$ | A |
|---|---|---|---|---|---|---|---|---|
| C-1931 | H | $CH_2$ | Me | $CH_2CF_3$ | $S(=O)_2CF_3$ | Cl | $CH_2CF_3$ | O |
| C-1932 | Me | $CH_2$ | H | $CH_2CF_3$ | $S(=O)_2CF_3$ | Cl | $CH_2CF_3$ | O |
| C-1933 | H | CH(Me) | H | $CH_2CF_3$ | $S(=O)_2CF_3$ | Cl | $CH_2CF_3$ | O |
| C-1934 | H | $CH_2CH_2$ | Me | $CH_2CF_3$ | $S(=O)_2CF_3$ | Cl | $CH_2CF_3$ | O |
| C-1935 | Me | $CH_2CH_2$ | H | $CH_2CF_3$ | $S(=O)_2CF_3$ | Cl | $CH_2CF_3$ | O |
| C-1936 | H | single bond | Me | $CH_2CF_3$ | $S(=O)_2CF_3$ | Me | $CH_2CF_3$ | O |
| C-1937 | Me | single bond | H | $CH_2CF_3$ | $S(=O)_2CF_3$ | Me | $CH_2CF_3$ | O |
| C-1938 | Me(R) | single bond | H | $CH_2CF_3$ | $S(=O)_2CF_3$ | Me | $CH_2CF_3$ | O |
| C-1939 | Me(S) | single bond | H | $CH_2CF_3$ | $S(=O)_2CF_3$ | Me | $CH_2CF_3$ | O |
| C-1940 | H | $CH_2$ | Me | $CH_2CF_3$ | $S(=O)_2CF_3$ | Me | $CH_2CF_3$ | O |
| C-1941 | Me | $CH_2$ | H | $CH_2CF_3$ | $S(=O)_2CF_3$ | Me | $CH_2CF_3$ | O |
| C-1942 | H | CH(Me) | H | $CH_2CF_3$ | $S(=O)_2CF_3$ | Me | $CH_2CF_3$ | O |
| C-1943 | H | $CH_2CH_2$ | Me | $CH_2CF_3$ | $S(=O)_2CF_3$ | Me | $CH_2CF_3$ | O |
| C-1944 | Me | $CH_2CH_2$ | H | $CH_2CF_3$ | $S(=O)_2CF_3$ | Me | $CH_2CF_3$ | O |
| C-1945 | H | single bond | Me | $CH_2CF_3$ | $S(=O)_2CF_3$ | Cl | $CH_2OMe$ | O |
| C-1946 | Me | single bond | H | $CH_2CF_3$ | $S(=O)_2CF_3$ | Cl | $CH_2OMe$ | O |
| C-1947 | Me(R) | single bond | H | $CH_2CF_3$ | $S(=O)_2CF_3$ | Cl | $CH_2OMe$ | O |
| C-1948 | Me(S) | single bond | H | $CH_2CF_3$ | $S(=O)_2CF_3$ | Cl | $CH_2OMe$ | O |
| C-1949 | H | $CH_2$ | Me | $CH_2CF_3$ | $S(=O)_2CF_3$ | Cl | $CH_2OMe$ | O |
| C-1950 | Me | $CH_2$ | H | $CH_2CF_3$ | $S(=O)_2CF_3$ | Cl | $CH_2OMe$ | O |
| C-1951 | H | CH(Me) | H | $CH_2CF_3$ | $S(=O)_2CF_3$ | Cl | $CH_2OMe$ | O |
| C-1952 | H | $CH_2CH_2$ | Me | $CH_2CF_3$ | $S(=O)_2CF_3$ | Cl | $CH_2OMe$ | O |
| C-1953 | Me | $CH_2CH_2$ | H | $CH_2CF_3$ | $S(=O)_2CF_3$ | Cl | $CH_2OMe$ | O |
| C-1954 | H | single bond | Me | $CH_2CF_3$ | $S(=O)_2CF_3$ | Me | $CH_2OMe$ | O |
| C-1955 | Me | single bond | H | $CH_2CF_3$ | $S(=O)_2CF_3$ | Me | $CH_2OMe$ | O |
| C-1956 | Me(R) | single bond | H | $CH_2CF_3$ | $S(=O)_2CF_3$ | Me | $CH_2OMe$ | O |
| C-1957 | Me(S) | single bond | H | $CH_2CF_3$ | $S(=O)_2CF_3$ | Me | $CH_2OMe$ | O |
| C-1958 | H | $CH_2$ | Me | $CH_2CF_3$ | $S(=O)_2CF_3$ | Me | $CH_2OMe$ | O |
| C-1959 | Me | $CH_2$ | H | $CH_2CF_3$ | $S(=O)_2CF_3$ | Me | $CH_2OMe$ | O |
| C-1960 | H | CH(Me) | H | $CH_2CF_3$ | $S(=O)_2CF_3$ | Me | $CH_2OMe$ | O |
| C-1961 | H | $CH_2CH_2$ | Me | $CH_2CF_3$ | $S(=O)_2CF_3$ | Me | $CH_2OMe$ | O |
| C-1962 | Me | $CH_2CH_2$ | H | $CH_2CF_3$ | $S(=O)_2CF_3$ | Me | $CH_2OMe$ | O |
| C-1963 | H | single bond | Me | $CH_2CF_3$ | $S(=O)_2CF_3$ | Cl | $CH_2CN$ | O |
| C-1964 | Me | single bond | H | $CH_2CF_3$ | $S(=O)_2CF_3$ | Cl | $CH_2CN$ | O |
| C-1965 | Me(R) | single bond | H | $CH_2CF_3$ | $S(=O)_2CF_3$ | Cl | $CH_2CN$ | O |
| C-1966 | Me(S) | single bond | H | $CH_2CF_3$ | $S(=O)_2CF_3$ | Cl | $CH_2CN$ | O |
| C-1967 | H | $CH_2$ | Me | $CH_2CF_3$ | $S(=O)_2CF_3$ | Cl | $CH_2CN$ | O |
| C-1968 | Me | $CH_2$ | H | $CH_2CF_3$ | $S(=O)_2CF_3$ | Cl | $CH_2CN$ | O |
| C-1969 | H | CH(Me) | H | $CH_2CF_3$ | $S(=O)_2CF_3$ | Cl | $CH_2CN$ | O |
| C-1970 | H | $CH_2CH_2$ | Me | $CH_2CF_3$ | $S(=O)_2CF_3$ | Cl | $CH_2CN$ | O |
| C-1971 | Me | $CH_2CH_2$ | H | $CH_2CF_3$ | $S(=O)_2CF_3$ | Cl | $CH_2CN$ | O |
| C-1972 | H | single bond | Me | $CH_2CF_3$ | $S(=O)_2CF_3$ | Me | $CH_2CN$ | O |
| C-1973 | Me | single bond | H | $CH_2CF_3$ | $S(=O)_2CF_3$ | Me | $CH_2CN$ | O |
| C-1974 | Me(R) | single bond | H | $CH_2CF_3$ | $S(=O)_2CF_3$ | Me | $CH_2CN$ | O |

TABLE 272

| Compound Number | Y | W | Z | $R^1$ | $R^2$ | $R^3$ | $R^{10}$ | A |
|---|---|---|---|---|---|---|---|---|
| C-1975 | Me(S) | single bond | H | $CH_2CF_3$ | $S(=O)_2CF_3$ | Me | $CH_2CN$ | O |
| C-1976 | H | $CH_2$ | Me | $CH_2CF_3$ | $S(=O)_2CF_3$ | Me | $CH_2CN$ | O |
| C-1977 | Me | $CH_2$ | H | $CH_2CF_3$ | $S(=O)_2CF_3$ | Me | $CH_2CN$ | O |
| C-1978 | H | CH(Me) | H | $CH_2CF_3$ | $S(=O)_2CF_3$ | Me | $CH_2CN$ | O |
| C-1979 | H | $CH_2CH_2$ | Me | $CH_2CF_3$ | $S(=O)_2CF_3$ | Me | $CH_2CN$ | O |
| C-1980 | Me | $CH_2CH_2$ | H | $CH_2CF_3$ | $S(=O)_2CF_3$ | Me | $CH_2CN$ | O |
| C-1981 | H | single bond | Me | $CH_2CF_3$ | $S(=O)_2CF_3$ | Cl | C(=O)Me | O |
| C-1982 | Me | single bond | H | $CH_2CF_3$ | $S(=O)_2CF_3$ | Cl | C(=O)Me | O |
| C-1983 | Me(R) | single bond | H | $CH_2CF_3$ | $S(=O)_2CF_3$ | Cl | C(=O)Me | O |
| C-1984 | Me(S) | single bond | H | $CH_2CF_3$ | $S(=O)_2CF_3$ | Cl | C(=O)Me | O |
| C-1985 | H | $CH_2$ | Me | $CH_2CF_3$ | $S(=O)_2CF_3$ | Cl | C(=O)Me | O |
| C-1986 | Me | $CH_2$ | H | $CH_2CF_3$ | $S(=O)_2CF_3$ | Cl | C(=O)Me | O |
| C-1987 | H | CH(Me) | H | $CH_2CF_3$ | $S(=O)_2CF_3$ | Cl | C(=O)Me | O |
| C-1988 | H | $CH_2CH_2$ | Me | $CH_2CF_3$ | $S(=O)_2CF_3$ | Cl | C(=O)Me | O |
| C-1989 | Me | $CH_2CH_2$ | H | $CH_2CF_3$ | $S(=O)_2CF_3$ | Cl | C(=O)Me | O |
| C-1990 | H | single bond | Me | $CH_2CF_3$ | $S(=O)_2CF_3$ | Me | C(=O)Me | O |
| C-1991 | Me | single bond | H | $CH_2CF_3$ | $S(=O)_2CF_3$ | Me | C(=O)Me | O |
| C-1992 | Me(R) | single bond | H | $CH_2CF_3$ | $S(=O)_2CF_3$ | Me | C(=O)Me | O |
| C-1993 | Me(S) | single bond | H | $CH_2CF_3$ | $S(=O)_2CF_3$ | Me | C(=O)Me | O |
| C-1994 | H | $CH_2$ | Me | $CH_2CF_3$ | $S(=O)_2CF_3$ | Me | C(=O)Me | O |
| C-1995 | Me | $CH_2$ | H | $CH_2CF_3$ | $S(=O)_2CF_3$ | Me | C(=O)Me | O |

TABLE 272-continued

| Compound Number | Y | W | Z | $R^1$ | $R^2$ | $R^3$ | $R^{10}$ | A |
|---|---|---|---|---|---|---|---|---|
| C-1996 | H | CH(Me) | H | $CH_2CF_3$ | $S(=O)_2CF_3$ | Me | C(=O)Me | O |
| C-1997 | H | $CH_2CH_2$ | Me | $CH_2CF_3$ | $S(=O)_2CF_3$ | Me | C(=O)Me | O |
| C-1998 | Me | $CH_2CH_2$ | H | $CH_2CF_3$ | $S(=O)_2CF_3$ | Me | C(=O)Me | O |
| C-1999 | H | single bond | Me | c-Pr | Me | Cl | Me | O |
| C-2000 | H | single bond | Et | c-Pr | Me | Cl | Me | O |
| C-2001 | Me | single bond | H | c-Pr | Me | Cl | Me | O |
| C-2002 | Me(R) | single bond | H | c-Pr | Me | Cl | Me | O |
| C-2003 | Me(S) | single bond | H | c-Pr | Me | Cl | Me | O |
| C-2004 | H | $CH_2$ | Me | c-Pr | Me | Cl | Me | O |
| C-2005 | Me | $CH_2$ | H | c-Pr | Me | Cl | Me | O |
| C-2006 | H | CH(Me) | H | c-Pr | Me | Cl | Me | O |
| C-2007 | H | $CH_2CH_2$ | Me | c-Pr | Me | Cl | Me | O |
| C-2008 | Me | $CH_2CH_2$ | H | c-Pr | Me | Cl | Me | O |
| C-2009 | H | single bond | Me | c-Pr | Me | Me | Me | O |
| C-2010 | Me | single bond | H | c-Pr | Me | Me | Me | O |
| C-2011 | Me(R) | single bond | H | c-Pr | Me | Me | Me | O |
| C-2012 | Me(S) | single bond | H | c-Pr | Me | Me | Me | O |
| C-2013 | H | $CH_2$ | Me | c-Pr | Me | Me | Me | O |
| C-2014 | Me | $CH_2$ | H | c-Pr | Me | Me | Me | O |
| C-2015 | H | CH(Me) | H | c-Pr | Me | Me | Me | O |
| C-2016 | H | $CH_2CH_2$ | Me | c-Pr | Me | Me | Me | O |
| C-2017 | Me | $CH_2CH_2$ | H | c-Pr | Me | Me | Me | O |
| C-2018 | H | single bond | Me | c-Pr | Me | Cl | Et | O |

TABLE 273

| Compound Number | Y | W | Z | $R^1$ | $R^2$ | $R^3$ | $R^{10}$ | A |
|---|---|---|---|---|---|---|---|---|
| C-2019 | Me | single bond | H | c-Pr | Me | Cl | Et | O |
| C-2020 | Me(R) | single bond | H | c-Pr | Me | Cl | Et | O |
| C-2021 | Me(S) | single bond | H | c-Pr | Me | Cl | Et | O |
| C-2022 | H | $CH_2$ | Me | c-Pr | Me | Cl | Et | O |
| C-2023 | Me | $CH_2$ | H | c-Pr | Me | Cl | Et | O |
| C-2024 | H | CH(Me) | H | c-Pr | Me | Cl | Et | O |
| C-2025 | H | $CH_2CH_2$ | Me | c-Pr | Me | Cl | Et | O |
| C-2026 | Me | $CH_2CH_2$ | H | c-Pr | Me | Cl | Et | O |
| C-2027 | H | single bond | Me | c-Pr | Me | Me | Et | O |
| C-2028 | Me | single bond | H | c-Pr | Me | Me | Et | O |
| C-2029 | Me(R) | single bond | H | c-Pr | Me | Me | Et | O |
| C-2030 | Me(S) | single bond | H | c-Pr | Me | Me | Et | O |
| C-2031 | H | $CH_2$ | Me | c-Pr | Me | Me | Et | O |
| C-2032 | Me | $CH_2$ | H | c-Pr | Me | Me | Et | O |
| C-2033 | H | CH(Me) | H | c-Pr | Me | Me | Et | O |
| C-2034 | H | $CH_2CH_2$ | Me | c-Pr | Me | Me | Et | O |
| C-2035 | Me | $CH_2CH_2$ | H | c-Pr | Me | Me | Et | O |
| C-2036 | H | single bond | Me | c-Pr | Me | Cl | $CH_2CF_3$ | O |
| C-2037 | Me | single bond | H | c-Pr | Me | Cl | $CH_2CF_3$ | O |
| C-2038 | Me(R) | single bond | H | c-Pr | Me | Cl | $CH_2CF_3$ | O |
| C-2039 | Me(S) | single bond | H | c-Pr | Me | Cl | $CH_2CF_3$ | O |
| C-2040 | H | $CH_2$ | Me | c-Pr | Me | Cl | $CH_2CF_3$ | O |
| C-2041 | Me | $CH_2$ | H | c-Pr | Me | Cl | $CH_2CF_3$ | O |
| C-2042 | H | CH(Me) | H | c-Pr | Me | Cl | $CH_2CF_3$ | O |
| C-2043 | H | $CH_2CH_2$ | Me | c-Pr | Me | Cl | $CH_2CF_3$ | O |
| C-2044 | Me | $CH_2CH_2$ | H | c-Pr | Me | Cl | $CH_2CF_3$ | O |
| C-2045 | H | single bond | Me | c-Pr | Me | Me | $CH_2CF_3$ | O |
| C-2046 | Me | single bond | H | c-Pr | Me | Me | $CH_2CF_3$ | O |
| C-2047 | Me(R) | single bond | H | c-Pr | Me | Me | $CH_2CF_3$ | O |
| C-2048 | Me(S) | single bond | H | c-Pr | Me | Me | $CH_2CF_3$ | O |
| C-2049 | H | $CH_2$ | Me | c-Pr | Me | Me | $CH_2CF_3$ | O |
| C-2050 | Me | $CH_2$ | H | c-Pr | Me | Me | $CH_2CF_3$ | O |
| C-2051 | H | CH(Me) | H | c-Pr | Me | Me | $CH_2CF_3$ | O |
| C-2052 | H | $CH_2CH_2$ | Me | c-Pr | Me | Me | $CH_2CF_3$ | O |
| C-2053 | Me | $CH_2CH_2$ | H | c-Pr | Me | Me | $CH_2CF_3$ | O |
| C-2054 | H | single bond | Me | c-Pr | Me | Cl | $CH_2OMe$ | O |
| C-2055 | Me | single bond | H | c-Pr | Me | Cl | $CH_2OMe$ | O |
| C-2056 | Me(R) | single bond | H | c-Pr | Me | Cl | $CH_2OMe$ | O |
| C-2057 | Me(S) | single bond | H | c-Pr | Me | Cl | $CH_2OMe$ | O |
| C-2058 | H | $CH_2$ | Me | c-Pr | Me | Cl | $CH_2OMe$ | O |
| C-2059 | Me | $CH_2$ | H | c-Pr | Me | Cl | $CH_2OMe$ | O |
| C-2060 | H | CH(Me) | H | c-Pr | Me | Cl | $CH_2OMe$ | O |
| C-2061 | H | $CH_2CH_2$ | Me | c-Pr | Me | Cl | $CH_2OMe$ | O |
| C-2062 | Me | $CH_2CH_2$ | H | c-Pr | Me | Cl | $CH_2OMe$ | O |

TABLE 274

| Compound Number | Y | W | Z | $R^1$ | $R^2$ | $R^3$ | $R^{10}$ | A |
|---|---|---|---|---|---|---|---|---|
| C-2063 | H | single bond | Me | c-Pr | Me | Me | $CH_2OMe$ | O |
| C-2064 | Me | single bond | H | c-Pr | Me | Me | $CH_2OMe$ | O |
| C-2065 | Me(R) | single bond | H | c-Pr | Me | Me | $CH_2OMe$ | O |
| C-2066 | Me(S) | single bond | H | c-Pr | Me | Me | $CH_2OMe$ | O |
| C-2067 | H | $CH_2$ | Me | c-Pr | Me | Me | $CH_2OMe$ | O |
| C-2068 | Me | $CH_2$ | H | c-Pr | Me | Me | $CH_2OMe$ | O |
| C-2069 | H | CH(Me) | H | c-Pr | Me | Me | $CH_2OMe$ | O |
| C-2070 | H | $CH_2CH_2$ | Me | c-Pr | Me | Me | $CH_2OMe$ | O |
| C-2071 | Me | $CH_2CH_2$ | H | c-Pr | Me | Me | $CH_2OMe$ | O |
| C-2072 | H | single bond | Me | c-Pr | Me | Cl | $CH_2CN$ | O |
| C-2073 | Me | single bond | H | c-Pr | Me | Cl | $CH_2CN$ | O |
| C-2074 | Me(R) | single bond | H | c-Pr | Me | Cl | $CH_2CN$ | O |
| C-2075 | Me(S) | single bond | H | c-Pr | Me | Cl | $CH_2CN$ | O |
| C-2076 | H | $CH_2$ | Me | c-Pr | Me | Cl | $CH_2CN$ | O |
| C-2077 | Me | $CH_2$ | H | c-Pr | Me | Cl | $CH_2CN$ | O |
| C-2078 | H | CH(Me) | H | c-Pr | Me | Cl | $CH_2CN$ | O |
| C-2079 | H | $CH_2CH_2$ | Me | c-Pr | Me | Cl | $CH_2CN$ | O |
| C-2080 | Me | $CH_2CH_2$ | H | c-Pr | Me | Cl | $CH_2CN$ | O |
| C-2081 | H | single bond | Me | c-Pr | Me | Me | $CH_2CN$ | O |
| C-2082 | Me | single bond | H | c-Pr | Me | Me | $CH_2CN$ | O |
| C-2083 | Me(R) | single bond | H | c-Pr | Me | Me | $CH_2CN$ | O |
| C-2084 | Me(S) | single bond | H | c-Pr | Me | Me | $CH_2CN$ | O |
| C-2085 | H | $CH_2$ | Me | c-Pr | Me | Me | $CH_2CN$ | O |
| C-2086 | Me | $CH_2$ | H | c-Pr | Me | Me | $CH_2CN$ | O |
| C-2087 | H | CH(Me) | H | c-Pr | Me | Me | $CH_2CN$ | O |
| C-2088 | H | $CH_2CH_2$ | Me | c-Pr | Me | Me | $CH_2CN$ | O |
| C-2089 | Me | $CH_2CH_2$ | H | c-Pr | Me | Me | $CH_2CN$ | O |
| C-2090 | H | single bond | Me | c-Pr | Me | Cl | C(=O)Me | O |
| C-2091 | Me | single bond | H | c-Pr | Me | Cl | C(=O)Me | O |
| C-2092 | Me(R) | single bond | H | c-Pr | Me | Cl | C(=O)Me | O |
| C-2093 | Me(S) | single bond | H | c-Pr | Me | Cl | C(=O)Me | O |
| C-2094 | H | $CH_2$ | Me | c-Pr | Me | Cl | C(=O)Me | O |
| C-2095 | Me | $CH_2$ | H | c-Pr | Me | Cl | C(=O)Me | O |
| C-2096 | H | CH(Me) | H | c-Pr | Me | Cl | C(=O)Me | O |
| C-2097 | H | $CH_2CH_2$ | Me | c-Pr | Me | Cl | C(=O)Me | O |
| C-2098 | Me | $CH_2CH_2$ | H | c-Pr | Me | Cl | C(=O)Me | O |
| C-2099 | H | single bond | Me | c-Pr | Me | Me | C(=O)Me | O |
| C-2100 | Me | single bond | H | c-Pr | Me | Me | C(=O)Me | O |
| C-2101 | Me(R) | single bond | H | c-Pr | Me | Me | C(=O)Me | O |
| C-2102 | Me(S) | single bond | H | c-Pr | Me | Me | C(=O)Me | O |
| C-2103 | H | $CH_2$ | Me | c-Pr | Me | Me | C(=O)Me | O |
| C-2104 | Me | $CH_2$ | H | c-Pr | Me | Me | C(=O)Me | O |
| C-2105 | H | CH(Me) | H | c-Pr | Me | Me | C(=O)Me | O |
| C-2106 | H | $CH_2CH_2$ | Me | c-Pr | Me | Me | C(=O)Me | O |

TABLE 275

| Compound Number | Y | W | Z | $R^1$ | $R^2$ | $R^3$ | $R^{10}$ | A |
|---|---|---|---|---|---|---|---|---|
| C-2107 | Me | $CH_2CH_2$ | H | c-Pr | Me | Me | C(=O)Me | O |
| C-2108 | H | single bond | Me | c-Pr | $CH_2OMe$ | Cl | Me | O |
| C-2109 | H | single bond | Et | c-Pr | $CH_2OMe$ | Cl | Me | O |
| C-2110 | Me | single bond | H | c-Pr | $CH_2OMe$ | Cl | Me | O |
| C-2111 | Me(R) | single bond | H | c-Pr | $CH_2OMe$ | Cl | Me | O |
| C-2112 | Me(S) | single bond | H | c-Pr | $CH_2OMe$ | Cl | Me | O |
| C-2113 | H | $CH_2$ | Me | c-Pr | $CH_2OMe$ | Cl | Me | O |
| C-2114 | Me | $CH_2$ | H | c-Pr | $CH_2OMe$ | Cl | Me | O |
| C-2115 | H | CH(Me) | H | c-Pr | $CH_2OMe$ | Cl | Me | O |
| C-2116 | H | $CH_2CH_2$ | Me | c-Pr | $CH_2OMe$ | Cl | Me | O |
| C-2117 | Me | $CH_2CH_2$ | H | c-Pr | $CH_2OMe$ | Cl | Me | O |
| C-2118 | H | single bond | Me | c-Pr | $CH_2OMe$ | Me | Me | O |
| C-2119 | Me | single bond | H | c-Pr | $CH_2OMe$ | Me | Me | O |
| C-2120 | Me(R) | single bond | H | c-Pr | $CH_2OMe$ | Me | Me | O |
| C-2121 | Me(S) | single bond | H | c-Pr | $CH_2OMe$ | Me | Me | O |
| C-2122 | H | $CH_2$ | Me | c-Pr | $CH_2OMe$ | Me | Me | O |
| C-2123 | Me | $CH_2$ | H | c-Pr | $CH_2OMe$ | Me | Me | O |
| C-2124 | H | CH(Me) | H | c-Pr | $CH_2OMe$ | Me | Me | O |
| C-2125 | H | $CH_2CH_2$ | Me | c-Pr | $CH_2OMe$ | Me | Me | O |
| C-2126 | Me | $CH_2CH_2$ | H | c-Pr | $CH_2OMe$ | Me | Me | O |
| C-2127 | H | single bond | Me | c-Pr | $CH_2OMe$ | Cl | Et | O |
| C-2128 | Me | single bond | H | c-Pr | $CH_2OMe$ | Cl | Et | O |
| C-2129 | Me(R) | single bond | H | c-Pr | $CH_2OMe$ | Cl | Et | O |
| C-2130 | Me(S) | single bond | H | c-Pr | $CH_2OMe$ | Cl | Et | O |
| C-2131 | H | $CH_2$ | Me | c-Pr | $CH_2OMe$ | Cl | Et | O |
| C-2132 | Me | $CH_2$ | H | c-Pr | $CH_2OMe$ | Cl | Et | O |
| C-2133 | H | CH(Me) | H | c-Pr | $CH_2OMe$ | Cl | Et | O |
| C-2134 | H | $CH_2CH_2$ | Me | c-Pr | $CH_2OMe$ | Cl | Et | O |
| C-2135 | Me | $CH_2CH_2$ | H | c-Pr | $CH_2OMe$ | Cl | Et | O |
| C-2136 | H | single bond | Me | c-Pr | $CH_2OMe$ | Me | Et | O |
| C-2137 | Me | single bond | H | c-Pr | $CH_2OMe$ | Me | Et | O |
| C-2138 | Me(R) | single bond | H | c-Pr | $CH_2OMe$ | Me | Et | O |
| C-2139 | Me(S) | single bond | H | c-Pr | $CH_2OMe$ | Me | Et | O |
| C-2140 | H | $CH_2$ | Me | c-Pr | $CH_2OMe$ | Me | Et | O |
| C-2141 | Me | $CH_2$ | H | c-Pr | $CH_2OMe$ | Me | Et | O |
| C-2142 | H | CH(Me) | H | c-Pr | $CH_2OMe$ | Me | Et | O |
| C-2143 | H | $CH_2CH_2$ | Me | c-Pr | $CH_2OMe$ | Me | Et | O |
| C-2144 | Me | $CH_2CH_2$ | H | c-Pr | $CH_2OMe$ | Me | Et | O |
| C-2145 | H | single bond | Me | c-Pr | $CH_2OMe$ | Cl | $CH_2CF_3$ | O |
| C-2146 | Me | single bond | H | c-Pr | $CH_2OMe$ | Cl | $CH_2CF_3$ | O |
| C-2147 | Me(R) | single bond | H | c-Pr | $CH_2OMe$ | Cl | $CH_2CF_3$ | O |
| C-2148 | Me(S) | single bond | H | c-Pr | $CH_2OMe$ | Cl | $CH_2CF_3$ | O |
| C-2149 | H | $CH_2$ | Me | c-Pr | $CH_2OMe$ | Cl | $CH_2CF_3$ | O |
| C-2150 | Me | $CH_2$ | H | c-Pr | $CH_2OMe$ | Cl | $CH_2CF_3$ | O |

TABLE 276

| Compound Number | Y | W | Z | $R^1$ | $R^2$ | $R^3$ | $R^{10}$ | A |
|---|---|---|---|---|---|---|---|---|
| C-2151 | H | CH(Me) | H | c-Pr | $CH_2OMe$ | Cl | $CH_2CF_3$ | O |
| C-2152 | H | $CH_2CH_2$ | Me | c-Pr | $CH_2OMe$ | Cl | $CH_2CF_3$ | O |
| C-2153 | Me | $CH_2CH_2$ | H | c-Pr | $CH_2OMe$ | Cl | $CH_2CF_3$ | O |
| C-2154 | H | single bond | Me | c-Pr | $CH_2OMe$ | Me | $CH_2CF_3$ | O |
| C-2155 | Me | single bond | H | c-Pr | $CH_2OMe$ | Me | $CH_2CF_3$ | O |
| C-2156 | Me(R) | single bond | H | c-Pr | $CH_2OMe$ | Me | $CH_2CF_3$ | O |
| C-2157 | Me(S) | single bond | H | c-Pr | $CH_2OMe$ | Me | $CH_2CF_3$ | O |
| C-2158 | H | $CH_2$ | Me | c-Pr | $CH_2OMe$ | Me | $CH_2CF_3$ | O |
| C-2159 | Me | $CH_2$ | H | c-Pr | $CH_2OMe$ | Me | $CH_2CF_3$ | O |
| C-2160 | H | CH(Me) | H | c-Pr | $CH_2OMe$ | Me | $CH_2CF_3$ | O |
| C-2161 | H | $CH_2CH_2$ | Me | c-Pr | $CH_2OMe$ | Me | $CH_2CF_3$ | O |
| C-2162 | Me | $CH_2CH_2$ | H | c-Pr | $CH_2OMe$ | Me | $CH_2CF_3$ | O |
| C-2163 | H | single bond | Me | c-Pr | $CH_2OMe$ | Cl | $CH_2OMe$ | O |
| C-2164 | Me | single bond | H | c-Pr | $CH_2OMe$ | Cl | $CH_2OMe$ | O |
| C-2165 | Me(R) | single bond | H | c-Pr | $CH_2OMe$ | Cl | $CH_2OMe$ | O |
| C-2166 | Me(S) | single bond | H | c-Pr | $CH_2OMe$ | Cl | $CH_2OMe$ | O |
| C-2167 | H | $CH_2$ | Me | c-Pr | $CH_2OMe$ | Cl | $CH_2OMe$ | O |
| C-2168 | Me | $CH_2$ | H | c-Pr | $CH_2OMe$ | Cl | $CH_2OMe$ | O |
| C-2169 | H | CH(Me) | H | c-Pr | $CH_2OMe$ | Cl | $CH_2OMe$ | O |
| C-2170 | H | $CH_2CH_2$ | Me | c-Pr | $CH_2OMe$ | Cl | $CH_2OMe$ | O |
| C-2171 | Me | $CH_2CH_2$ | H | c-Pr | $CH_2OMe$ | Cl | $CH_2OMe$ | O |
| C-2172 | H | single bond | Me | c-Pr | $CH_2OMe$ | Me | $CH_2OMe$ | O |
| C-2173 | Me | single bond | H | c-Pr | $CH_2OMe$ | Me | $CH_2OMe$ | O |

TABLE 276-continued

| Compound Number | Y | W | Z | $R^1$ | $R^2$ | $R^3$ | $R^{10}$ | A |
|---|---|---|---|---|---|---|---|---|
| C-2174 | Me(R) | single bond | H | c-Pr | $CH_2OMe$ | Me | $CH_2OMe$ | O |
| C-2175 | Me(S) | single bond | H | c-Pr | $CH_2OMe$ | Me | $CH_2OMe$ | O |
| C-2176 | H | $CH_2$ | Me | c-Pr | $CH_2OMe$ | Me | $CH_2OMe$ | O |
| C-2177 | Me | $CH_2$ | H | c-Pr | $CH_2OMe$ | Me | $CH_2OMe$ | O |
| C-2178 | H | CH(Me) | H | c-Pr | $CH_2OMe$ | Me | $CH_2OMe$ | O |
| C-2179 | H | $CH_2CH_2$ | Me | c-Pr | $CH_2OMe$ | Me | $CH_2OMe$ | O |
| C-2180 | Me | $CH_2CH_2$ | H | c-Pr | $CH_2OMe$ | Me | $CH_2OMe$ | O |
| C-2181 | H | single bond | Me | c-Pr | $CH_2OMe$ | Cl | $CH_2CN$ | O |
| C-2182 | Me | single bond | H | c-Pr | $CH_2OMe$ | Cl | $CH_2CN$ | O |
| C-2183 | Me(R) | single bond | H | c-Pr | $CH_2OMe$ | Cl | $CH_2CN$ | O |
| C-2184 | Me(S) | single bond | H | c-Pr | $CH_2OMe$ | Cl | $CH_2CN$ | O |
| C-2185 | H | $CH_2$ | Me | c-Pr | $CH_2OMe$ | Cl | $CH_2CN$ | O |
| C-2186 | Me | $CH_2$ | H | c-Pr | $CH_2OMe$ | Cl | $CH_2CN$ | O |
| C-2187 | H | CH(Me) | H | c-Pr | $CH_2OMe$ | Cl | $CH_2CN$ | O |
| C-2188 | H | $CH_2CH_2$ | Me | c-Pr | $CH_2OMe$ | Cl | $CH_2CN$ | O |
| C-2189 | Me | $CH_2CH_2$ | H | c-Pr | $CH_2OMe$ | Cl | $CH_2CN$ | O |
| C-2190 | H | single bond | Me | c-Pr | $CH_2OMe$ | Me | $CH_2CN$ | O |
| C-2191 | Me | single bond | H | c-Pr | $CH_2OMe$ | Me | $CH_2CN$ | O |
| C-2192 | Me(R) | single bond | H | c-Pr | $CH_2OMe$ | Me | $CH_2CN$ | O |
| C-2193 | Me(S) | single bond | H | c-Pr | $CH_2OMe$ | Me | $CH_2CN$ | O |
| C-2194 | H | $CH_2$ | Me | c-Pr | $CH_2OMe$ | Me | $CH_2CN$ | O |

TABLE 277

| Compound Number | Y | W | Z | $R^1$ | $R^2$ | $R^3$ | $R^{10}$ | A |
|---|---|---|---|---|---|---|---|---|
| C-2195 | Me | $CH_2$ | H | c-Pr | $CH_2OMe$ | Me | $CH_2CN$ | O |
| C-2196 | H | CH(Me) | H | c-Pr | $CH_2OMe$ | Me | $CH_2CN$ | O |
| C-2197 | H | $CH_2CH_2$ | Me | c-Pr | $CH_2OMe$ | Me | $CH_2CN$ | O |
| C-2198 | Me | $CH_2CH_2$ | H | c-Pr | $CH_2OMe$ | Me | $CH_2CN$ | O |
| C-2199 | H | single bond | Me | c-Pr | $CH_2OMe$ | Cl | C(=O)Me | O |
| C-2200 | Me | single bond | H | c-Pr | $CH_2OMe$ | Cl | C(=O)Me | O |
| C-2201 | Me(R) | single bond | H | c-Pr | $CH_2OMe$ | Cl | C(=O)Me | O |
| C-2202 | Me(S) | single bond | H | c-Pr | $CH_2OMe$ | Cl | C(=O)Me | O |
| C-2203 | H | $CH_2$ | Me | c-Pr | $CH_2OMe$ | Cl | C(=O)Me | O |
| C-2204 | Me | $CH_2$ | H | c-Pr | $CH_2OMe$ | Cl | C(=O)Me | O |
| C-2205 | H | CH(Me) | H | c-Pr | $CH_2OMe$ | Cl | C(=O)Me | O |
| C-2206 | H | $CH_2CH_2$ | Me | c-Pr | $CH_2OMe$ | Cl | C(=O)Me | O |
| C-2207 | Me | $CH_2CH_2$ | H | c-Pr | $CH_2OMe$ | Cl | C(=O)Me | O |
| C-2208 | H | single bond | Me | c-Pr | $CH_2OMe$ | Me | C(=O)Me | O |
| C-2209 | Me | single bond | H | c-Pr | $CH_2OMe$ | Me | C(=O)Me | O |
| C-2210 | Me(R) | single bond | H | c-Pr | $CH_2OMe$ | Me | C(=O)Me | O |
| C-2211 | Me(S) | single bond | H | c-Pr | $CH_2OMe$ | Me | C(=O)Me | O |
| C-2212 | H | $CH_2$ | Me | c-Pr | $CH_2OMe$ | Me | C(=O)Me | O |
| C-2213 | Me | $CH_2$ | H | c-Pr | $CH_2OMe$ | Me | C(=O)Me | O |
| C-2214 | H | CH(Me) | H | c-Pr | $CH_2OMe$ | Me | C(=O)Me | O |
| C-2215 | H | $CH_2CH_2$ | Me | c-Pr | $CH_2OMe$ | Me | C(=O)Me | O |
| C-2216 | Me | $CH_2CH_2$ | H | c-Pr | $CH_2OMe$ | Me | C(=O)Me | O |
| C-2217 | H | single bond | Me | c-Pr | $CH_2CN$ | Cl | Me | O |
| C-2218 | H | single bond | Et | c-Pr | $CH_2CN$ | Cl | Me | O |
| C-2219 | Me | single bond | H | c-Pr | $CH_2CN$ | Cl | Me | O |
| C-2220 | Me(R) | single bond | H | c-Pr | $CH_2CN$ | Cl | Me | O |
| C-2221 | Me(S) | single bond | H | c-Pr | $CH_2CN$ | Cl | Me | O |
| C-2222 | H | $CH_2$ | Me | c-Pr | $CH_2CN$ | Cl | Me | O |
| C-2223 | Me | $CH_2$ | H | c-Pr | $CH_2CN$ | Cl | Me | O |
| C-2224 | H | CH(Me) | H | c-Pr | $CH_2CN$ | Cl | Me | O |
| C-2225 | H | $CH_2CH_2$ | Me | c-Pr | $CH_2CN$ | Cl | Me | O |
| C-2226 | Me | $CH_2CH_2$ | H | c-Pr | $CH_2CN$ | Cl | Me | O |
| C-2227 | H | single bond | Me | c-Pr | $CH_2CN$ | Me | Me | O |
| C-2228 | Me | single bond | H | c-Pr | $CH_2CN$ | Me | Me | O |
| C-2229 | Me(R) | single bond | H | c-Pr | $CH_2CN$ | Me | Me | O |
| C-2230 | Me(S) | single bond | H | c-Pr | $CH_2CN$ | Me | Me | O |
| C-2231 | H | $CH_2$ | Me | c-Pr | $CH_2CN$ | Me | Me | O |
| C-2232 | Me | $CH_2$ | H | c-Pr | $CH_2CN$ | Me | Me | O |
| C-2233 | H | CH(Me) | H | c-Pr | $CH_2CN$ | Me | Me | O |
| C-2234 | H | $CH_2CH_2$ | Me | c-Pr | $CH_2CN$ | Me | Me | O |
| C-2235 | Me | $CH_2CH_2$ | H | c-Pr | $CH_2CN$ | Me | Me | O |
| C-2236 | H | single bond | Me | c-Pr | $CH_2CN$ | Cl | Et | O |
| C-2237 | Me | single bond | H | c-Pr | $CH_2CN$ | Cl | Et | O |
| C-2238 | Me(R) | single bond | H | c-Pr | $CH_2CN$ | Cl | Et | O |

TABLE 278

| Compound Number | Y | W | Z | $R^1$ | $R^2$ | $R^3$ | $R^{10}$ | A |
|---|---|---|---|---|---|---|---|---|
| C-2239 | Me(S) | single bond | H | c-Pr | $CH_2CN$ | Cl | Et | O |
| C-2240 | H | $CH_2$ | Me | c-Pr | $CH_2CN$ | Cl | Et | O |
| C-2241 | Me | $CH_2$ | H | c-Pr | $CH_2CN$ | Cl | Et | O |
| C-2242 | H | CH(Me) | H | c-Pr | $CH_2CN$ | Cl | Et | O |
| C-2243 | H | $CH_2CH_2$ | Me | c-Pr | $CH_2CN$ | Cl | Et | O |
| C-2244 | Me | $CH_2CH_2$ | H | c-Pr | $CH_2CN$ | Cl | Et | O |
| C-2245 | H | single bond | Me | c-Pr | $CH_2CN$ | Me | Et | O |
| C-2246 | Me | single bond | H | c-Pr | $CH_2CN$ | Me | Et | O |
| C-2247 | Me(R) | single bond | H | c-Pr | $CH_2CN$ | Me | Et | O |
| C-2248 | Me(S) | single bond | H | c-Pr | $CH_2CN$ | Me | Et | O |
| C-2249 | H | $CH_2$ | Me | c-Pr | $CH_2CN$ | Me | Et | O |
| C-2250 | Me | $CH_2$ | H | c-Pr | $CH_2CN$ | Me | Et | O |
| C-2251 | H | CH(Me) | H | c-Pr | $CH_2CN$ | Me | Et | O |
| C-2252 | H | $CH_2CH_2$ | Me | c-Pr | $CH_2CN$ | Me | Et | O |
| C-2253 | Me | $CH_2CH_2$ | H | c-Pr | $CH_2CN$ | Me | Et | O |
| C-2254 | H | single bond | Me | c-Pr | $CH_2CN$ | Cl | $CH_2CF_3$ | O |
| C-2255 | Me | single bond | H | c-Pr | $CH_2CN$ | Cl | $CH_2CF_3$ | O |
| C-2256 | Me(R) | single bond | H | c-Pr | $CH_2CN$ | Cl | $CH_2CF_3$ | O |
| C-2257 | Me(S) | single bond | H | c-Pr | $CH_2CN$ | Cl | $CH_2CF_3$ | O |
| C-2258 | H | $CH_2$ | Me | c-Pr | $CH_2CN$ | Cl | $CH_2CF_3$ | O |
| C-2259 | Me | $CH_2$ | H | c-Pr | $CH_2CN$ | Cl | $CH_2CF_3$ | O |
| C-2260 | H | CH(Me) | H | c-Pr | $CH_2CN$ | Cl | $CH_2CF_3$ | O |
| C-2261 | H | $CH_2CH_2$ | Me | c-Pr | $CH_2CN$ | Cl | $CH_2CF_3$ | O |
| C-2262 | Me | $CH_2CH_2$ | H | c-Pr | $CH_2CN$ | Cl | $CH_2CF_3$ | O |
| C-2263 | H | single bond | Me | c-Pr | $CH_2CN$ | Me | $CH_2CF_3$ | O |
| C-2264 | Me | single bond | H | c-Pr | $CH_2CN$ | Me | $CH_2CF_3$ | O |
| C-2265 | Me(R) | single bond | H | c-Pr | $CH_2CN$ | Me | $CH_2CF_3$ | O |
| C-2266 | Me(S) | single bond | H | c-Pr | $CH_2CN$ | Me | $CH_2CF_3$ | O |
| C-2267 | H | $CH_2$ | Me | c-Pr | $CH_2CN$ | Me | $CH_2CF_3$ | O |
| C-2268 | Me | $CH_2$ | H | c-Pr | $CH_2CN$ | Me | $CH_2CF_3$ | O |
| C-2269 | H | CH(Me) | H | c-Pr | $CH_2CN$ | Me | $CH_2CF_3$ | O |
| C-2270 | H | $CH_2CH_2$ | Me | c-Pr | $CH_2CN$ | Me | $CH_2CF_3$ | O |
| C-2271 | Me | $CH_2CH_2$ | H | c-Pr | $CH_2CN$ | Me | $CH_2CF_3$ | O |
| C-2272 | H | single bond | Me | c-Pr | $CH_2CN$ | Cl | $CH_2OMe$ | O |
| C-2273 | Me | single bond | H | c-Pr | $CH_2CN$ | Cl | $CH_2OMe$ | O |
| C-2274 | Me(R) | single bond | H | c-Pr | $CH_2CN$ | Cl | $CH_2OMe$ | O |
| C-2275 | Me(S) | single bond | H | c-Pr | $CH_2CN$ | Cl | $CH_2OMe$ | O |
| C-2276 | H | $CH_2$ | Me | c-Pr | $CH_2CN$ | Cl | $CH_2OMe$ | O |
| C-2277 | Me | $CH_2$ | H | c-Pr | $CH_2CN$ | Cl | $CH_2OMe$ | O |
| C-2278 | H | CH(Me) | H | c-Pr | $CH_2CN$ | Cl | $CH_2OMe$ | O |
| C-2279 | H | $CH_2CH_2$ | Me | c-Pr | $CH_2CN$ | Cl | $CH_2OMe$ | O |
| C-2280 | Me | $CH_2CH_2$ | H | c-Pr | $CH_2CN$ | Cl | $CH_2OMe$ | O |
| C-2281 | H | single bond | Me | c-Pr | $CH_2CN$ | Me | $CH_2OMe$ | O |
| C-2282 | Me | single bond | H | c-Pr | $CH_2CN$ | Me | $CH_2OMe$ | O |

TABLE 279

| Compound Number | Y | W | Z | $R^1$ | $R^2$ | $R^3$ | $R^{10}$ | A |
|---|---|---|---|---|---|---|---|---|
| C-2283 | Me(R) | single bond | H | c-Pr | $CH_2CN$ | Me | $CH_2OMe$ | O |
| C-2284 | Me(S) | single bond | H | c-Pr | $CH_2CN$ | Me | $CH_2OMe$ | O |
| C-2285 | H | $CH_2$ | Me | c-Pr | $CH_2CN$ | Me | $CH_2OMe$ | O |
| C-2286 | Me | $CH_2$ | H | c-Pr | $CH_2CN$ | Me | $CH_2OMe$ | O |
| C-2287 | H | CH(Me) | H | c-Pr | $CH_2CN$ | Me | $CH_2OMe$ | O |
| C-2288 | H | $CH_2CH_2$ | Me | c-Pr | $CH_2CN$ | Me | $CH_2OMe$ | O |
| C-2289 | Me | $CH_2CH_2$ | H | c-Pr | $CH_2CN$ | Me | $CH_2OMe$ | O |
| C-2290 | H | single bond | Me | c-Pr | $CH_2CN$ | Cl | $CH_2CN$ | O |
| C-2291 | Me | single bond | H | c-Pr | $CH_2CN$ | Cl | $CH_2CN$ | O |
| C-2292 | Me(R) | single bond | H | c-Pr | $CH_2CN$ | Cl | $CH_2CN$ | O |
| C-2293 | Me(S) | single bond | H | c-Pr | $CH_2CN$ | Cl | $CH_2CN$ | O |
| C-2294 | H | $CH_2$ | Me | c-Pr | $CH_2CN$ | Cl | $CH_2CN$ | O |
| C-2295 | Me | $CH_2$ | H | c-Pr | $CH_2CN$ | Cl | $CH_2CN$ | O |
| C-2296 | H | CH(Me) | H | c-Pr | $CH_2CN$ | Cl | $CH_2CN$ | O |
| C-2297 | H | $CH_2CH_2$ | Me | c-Pr | $CH_2CN$ | Cl | $CH_2CN$ | O |
| C-2298 | Me | $CH_2CH_2$ | H | c-Pr | $CH_2CN$ | Cl | $CH_2CN$ | O |
| C-2299 | H | single bond | Me | c-Pr | $CH_2CN$ | Me | $CH_2CN$ | O |
| C-2300 | Me | single bond | H | c-Pr | $CH_2CN$ | Me | $CH_2CN$ | O |
| C-2301 | Me(R) | single bond | H | c-Pr | $CH_2CN$ | Me | $CH_2CN$ | O |
| C-2302 | Me(S) | single bond | H | c-Pr | $CH_2CN$ | Me | $CH_2CN$ | O |
| C-2303 | H | $CH_2$ | Me | c-Pr | $CH_2CN$ | Me | $CH_2CN$ | O |

TABLE 279-continued

| Compound Number | Y | W | Z | $R^1$ | $R^2$ | $R^3$ | $R^{10}$ | A |
|---|---|---|---|---|---|---|---|---|
| C-2304 | Me | $CH_2$ | H | c-Pr | $CH_2CN$ | Me | $CH_2CN$ | O |
| C-2305 | H | CH(Me) | H | c-Pr | $CH_2CN$ | Me | $CH_2CN$ | O |
| C-2306 | H | $CH_2CH_2$ | Me | c-Pr | $CH_2CN$ | Me | $CH_2CN$ | O |
| C-2307 | Me | $CH_2CH_2$ | H | c-Pr | $CH_2CN$ | Me | $CH_2CN$ | O |
| C-2308 | H | single bond | Me | c-Pr | $CH_2CN$ | Cl | C(=O)Me | O |
| C-2309 | Me | single bond | H | c-Pr | $CH_2CN$ | Cl | C(=O)Me | O |
| C-2310 | Me(R) | single bond | H | c-Pr | $CH_2CN$ | Cl | C(=O)Me | O |
| C-2311 | Me(S) | single bond | H | c-Pr | $CH_2CN$ | Cl | C(=O)Me | O |
| C-2312 | H | $CH_2$ | Me | c-Pr | $CH_2CN$ | Cl | C(=O)Me | O |
| C-2313 | Me | $CH_2$ | H | c-Pr | $CH_2CN$ | Cl | C(=O)Me | O |
| C-2314 | H | CH(Me) | H | c-Pr | $CH_2CN$ | Cl | C(=O)Me | O |
| C-2315 | H | $CH_2CH_2$ | Me | c-Pr | $CH_2CN$ | Cl | C(=O)Me | O |
| C-2316 | Me | $CH_2CH_2$ | H | c-Pr | $CH_2CN$ | Cl | C(=O)Me | O |
| C-2317 | H | single bond | Me | c-Pr | $CH_2CN$ | Me | C(=O)Me | O |
| C-2318 | Me | single bond | H | c-Pr | $CH_2CN$ | Me | C(=O)Me | O |
| C-2319 | Me(R) | single bond | H | c-Pr | $CH_2CN$ | Me | C(=O)Me | O |
| C-2320 | Me(S) | single bond | H | c-Pr | $CH_2CN$ | Me | C(=O)Me | O |
| C-2321 | H | $CH_2$ | Me | c-Pr | $CH_2CN$ | Me | C(=O)Me | O |
| C-2322 | Me | $CH_2$ | H | c-Pr | $CH_2CN$ | Me | C(=O)Me | O |
| C-2323 | H | CH(Me) | H | c-Pr | $CH_2CN$ | Me | C(=O)Me | O |
| C-2324 | H | $CH_2CH_2$ | Me | c-Pr | $CH_2CN$ | Me | C(=O)Me | O |
| C-2325 | Me | $CH_2CH_2$ | H | c-Pr | $CH_2CN$ | Me | C(=O)Me | O |
| C-2326 | H | single bond | Me | c-Pr | C(=O)Me | Cl | Me | O |

TABLE 280

| Compound Number | Y | W | Z | $R^1$ | $R^2$ | $R^3$ | $R^{10}$ | A |
|---|---|---|---|---|---|---|---|---|
| C-2327 | Me | single bond | H | c-Pr | C(=O)Me | Cl | Me | O |
| C-2328 | Me(R) | single bond | H | c-Pr | C(=O)Me | Cl | Me | O |
| C-2329 | Me(S) | single bond | H | c-Pr | C(=O)Me | Cl | Me | O |
| C-2330 | H | $CH_2$ | Me | c-Pr | C(=O)Me | Cl | Me | O |
| C-2331 | Me | $CH_2$ | H | c-Pr | C(=O)Me | Cl | Me | O |
| C-2332 | H | CH(Me) | H | c-Pr | C(=O)Me | Cl | Me | O |
| C-2333 | H | $CH_2CH_2$ | Me | c-Pr | C(=O)Me | Cl | Me | O |
| C-2334 | Me | $CH_2CH_2$ | H | c-Pr | C(=O)Me | Cl | Me | O |
| C-2335 | H | single bond | Me | c-Pr | C(=O)Me | Me | Me | O |
| C-2336 | Me | single bond | H | c-Pr | C(=O)Me | Me | Me | O |
| C-2337 | Me(R) | single bond | H | c-Pr | C(=O)Me | Me | Me | O |
| C-2338 | Me(S) | single bond | H | c-Pr | C(=O)Me | Me | Me | O |
| C-2339 | H | $CH_2$ | Me | c-Pr | C(=O)Me | Me | Me | O |
| C-2340 | Me | $CH_2$ | H | c-Pr | C(=O)Me | Me | Me | O |
| C-2341 | H | CH(Me) | H | c-Pr | C(=O)Me | Me | Me | O |
| C-2342 | H | $CH_2CH_2$ | Me | c-Pr | C(=O)Me | Me | Me | O |
| C-2343 | Me | $CH_2CH_2$ | H | c-Pr | C(=O)Me | Me | Me | O |
| C-2344 | H | single bond | Me | c-Pr | C(=O)Me | Cl | Et | O |
| C-2345 | Me | single bond | H | c-Pr | C(=O)Me | Cl | Et | O |
| C-2346 | Me(R) | single bond | H | c-Pr | C(=O)Me | Cl | Et | O |
| C-2347 | Me(S) | single bond | H | c-Pr | C(=O)Me | Cl | Et | O |
| C-2348 | H | $CH_2$ | Me | c-Pr | C(=O)Me | Cl | Et | O |
| C-2349 | Me | $CH_2$ | H | c-Pr | C(=O)Me | Cl | Et | O |
| C-2350 | H | CH(Me) | H | c-Pr | C(=O)Me | Cl | Et | O |
| C-2351 | H | $CH_2CH_2$ | Me | c-Pr | C(=O)Me | Cl | Et | O |
| C-2352 | Me | $CH_2CH_2$ | H | c-Pr | C(=O)Me | Cl | Et | O |
| C-2353 | H | single bond | Me | c-Pr | C(=O)Me | Me | Et | O |
| C-2354 | Me | single bond | H | c-Pr | C(=O)Me | Me | Et | O |
| C-2355 | Me(R) | single bond | H | c-Pr | C(=O)Me | Me | Et | O |
| C-2356 | Me(S) | single bond | H | c-Pr | C(=O)Me | Me | Et | O |
| C-2357 | H | $CH_2$ | Me | c-Pr | C(=O)Me | Me | Et | O |
| C-2358 | Me | $CH_2$ | H | c-Pr | C(=O)Me | Me | Et | O |
| C-2359 | H | CH(Me) | H | c-Pr | C(=O)Me | Me | Et | O |
| C-2360 | H | $CH_2CH_2$ | Me | c-Pr | C(=O)Me | Me | Et | O |
| C-2361 | Me | $CH_2CH_2$ | H | c-Pr | C(=O)Me | Me | Et | O |
| C-2362 | H | single bond | Me | c-Pr | C(=O)Me | Cl | $CH_2CF_3$ | O |
| C-2363 | Me | single bond | H | c-Pr | C(=O)Me | Cl | $CH_2CF_3$ | O |
| C-2364 | Me(R) | single bond | H | c-Pr | C(=O)Me | Cl | $CH_2CF_3$ | O |
| C-2365 | Me(S) | single bond | H | c-Pr | C(=O)Me | Cl | $CH_2CF_3$ | O |
| C-2366 | H | $CH_2$ | Me | c-Pr | C(=O)Me | Cl | $CH_2CF_3$ | O |

TABLE 280-continued

| Compound Number | Y | W | Z | $R^1$ | $R^2$ | $R^3$ | $R^{10}$ | A |
|---|---|---|---|---|---|---|---|---|
| C-2367 | Me | $CH_2$ | H | c-Pr | C(═O)Me | Cl | $CH_2CF_3$ | O |
| C-2368 | H | CH(Me) | H | c-Pr | C(═O)Me | Cl | $CH_2CF_3$ | O |
| C-2369 | H | $CH_2CH_2$ | Me | c-Pr | C(═O)Me | Cl | $CH_2CF_3$ | O |
| C-2370 | Me | $CH_2CH_2$ | H | c-Pr | C(═O)Me | Cl | $CH_2CF_3$ | O |

TABLE 281

| Compound Number | Y | W | Z | $R^1$ | $R^2$ | $R^3$ | $R^{10}$ | A |
|---|---|---|---|---|---|---|---|---|
| C-2371 | H | single bond | Me | c-Pr | C(═O)Me | Me | $CH_2CF_3$ | O |
| C-2372 | Me | single bond | H | c-Pr | C(═O)Me | Me | $CH_2CF_3$ | O |
| C-2373 | Me(R) | single bond | H | c-Pr | C(═O)Me | Me | $CH_2CF_3$ | O |
| C-2374 | Me(S) | single bond | H | c-Pr | C(═O)Me | Me | $CH_2CF_3$ | O |
| C-2375 | H | $CH_2$ | Me | c-Pr | C(═O)Me | Me | $CH_2CF_3$ | O |
| C-2376 | Me | $CH_2$ | H | c-Pr | C(═O)Me | Me | $CH_2CF_3$ | O |
| C-2377 | H | CH(Me) | H | c-Pr | C(═O)Me | Me | $CH_2CF_3$ | O |
| C-2378 | H | $CH_2CH_2$ | Me | c-Pr | C(═O)Me | Me | $CH_2CF_3$ | O |
| C-2379 | Me | $CH_2CH_2$ | H | c-Pr | C(═O)Me | Me | $CH_2CF_3$ | O |
| C-2380 | H | single bond | Me | c-Pr | C(═O)Me | Cl | $CH_2OMe$ | O |
| C-2381 | Me | single bond | H | c-Pr | C(═O)Me | Cl | $CH_2OMe$ | O |
| C-2382 | Me(R) | single bond | H | c-Pr | C(═O)Me | Cl | $CH_2OMe$ | O |
| C-2383 | Me(S) | single bond | H | c-Pr | C(═O)Me | Cl | $CH_2OMe$ | O |
| C-2384 | H | $CH_2$ | Me | c-Pr | C(═O)Me | Cl | $CH_2OMe$ | O |
| C-2385 | Me | $CH_2$ | H | c-Pr | C(═O)Me | Cl | $CH_2OMe$ | O |
| C-2386 | H | CH(Me) | H | c-Pr | C(═O)Me | Cl | $CH_2OMe$ | O |
| C-2387 | H | $CH_2CH_2$ | Me | c-Pr | C(═O)Me | Cl | $CH_2OMe$ | O |
| C-2388 | Me | $CH_2CH_2$ | H | c-Pr | C(═O)Me | Cl | $CH_2OMe$ | O |
| C-2389 | H | single bond | Me | c-Pr | C(═O)Me | Me | $CH_2OMe$ | O |
| C-2390 | Me | single bond | H | c-Pr | C(═O)Me | Me | $CH_2OMe$ | O |
| C-2391 | Me(R) | single bond | H | c-Pr | C(═O)Me | Me | $CH_2OMe$ | O |
| C-2392 | Me(S) | single bond | H | c-Pr | C(═O)Me | Me | $CH_2OMe$ | O |
| C-2393 | H | $CH_2$ | Me | c-Pr | C(═O)Me | Me | $CH_2OMe$ | O |
| C-2394 | Me | $CH_2$ | H | c-Pr | C(═O)Me | Me | $CH_2OMe$ | O |
| C-2395 | H | CH(Me) | H | c-Pr | C(═O)Me | Me | $CH_2OMe$ | O |
| C-2396 | H | $CH_2CH_2$ | Me | c-Pr | C(═O)Me | Me | $CH_2OMe$ | O |
| C-2397 | Me | $CH_2CH_2$ | H | c-Pr | C(═O)Me | Me | $CH_2OMe$ | O |
| C-2398 | H | single bond | Me | c-Pr | C(═O)Me | Cl | $CH_2CN$ | O |
| C-2399 | Me | single bond | H | c-Pr | C(═O)Me | Cl | $CH_2CN$ | O |
| C-2400 | Me(R) | single bond | H | c-Pr | C(═O)Me | Cl | $CH_2CN$ | O |
| C-2401 | Me(S) | single bond | H | c-Pr | C(═O)Me | Cl | $CH_2CN$ | O |
| C-2402 | H | $CH_2$ | Me | c-Pr | C(═O)Me | Cl | $CH_2CN$ | O |
| C-2403 | Me | $CH_2$ | H | c-Pr | C(═O)Me | Cl | $CH_2CN$ | O |
| C-2404 | H | CH(Me) | H | c-Pr | C(═O)Me | Cl | $CH_2CN$ | O |
| C-2405 | H | $CH_2CH_2$ | Me | c-Pr | C(═O)Me | Cl | $CH_2CN$ | O |
| C-2406 | Me | $CH_2CH_2$ | H | c-Pr | C(═O)Me | Cl | $CH_2CN$ | O |
| C-2407 | H | single bond | Me | c-Pr | C(═O)Me | Me | $CH_2CN$ | O |
| C-2408 | Me | single bond | H | c-Pr | C(═O)Me | Me | $CH_2CN$ | O |
| C-2409 | Me(R) | single bond | H | c-Pr | C(═O)Me | Me | $CH_2CN$ | O |
| C-2410 | Me(S) | single bond | H | c-Pr | C(═O)Me | Me | $CH_2CN$ | O |
| C-2411 | H | $CH_2$ | Me | c-Pr | C(═O)Me | Me | $CH_2CN$ | O |
| C-2412 | Me | $CH_2$ | H | c-Pr | C(═O)Me | Me | $CH_2CN$ | O |
| C-2413 | H | CH(Me) | H | c-Pr | C(═O)Me | Me | $CH_2CN$ | O |
| C-2414 | H | $CH_2CH_2$ | Me | c-Pr | C(═O)Me | Me | $CH_2CN$ | O |

TABLE 282

| Compound Number | Y | W | Z | $R^1$ | $R^2$ | $R^3$ | $R^{10}$ | A |
|---|---|---|---|---|---|---|---|---|
| C-2415 | Me | $CH_2CH_2$ | H | c-Pr | C(═O)Me | Me | $CH_2CN$ | O |
| C-2416 | H | single bond | Me | c-Pr | C(═O)Me | Cl | C(═O)Me | O |
| C-2417 | Me | single bond | H | c-Pr | C(═O)Me | Cl | C(═O)Me | O |
| C-2418 | Me(R) | single bond | H | c-Pr | C(═O)Me | Cl | C(═O)Me | O |
| C-2419 | Me(S) | single bond | H | c-Pr | C(═O)Me | Cl | C(═O)Me | O |
| C-2420 | H | $CH_2$ | Me | c-Pr | C(═O)Me | Cl | C(═O)Me | O |
| C-2421 | Me | $CH_2$ | H | c-Pr | C(═O)Me | Cl | C(═O)Me | O |
| C-2422 | H | CH(Me) | H | c-Pr | C(═O)Me | Cl | C(═O)Me | O |

TABLE 282-continued

| Compound Number | Y | W | Z | $R^1$ | $R^2$ | $R^3$ | $R^{10}$ | A |
|---|---|---|---|---|---|---|---|---|
| C-2423 | H | $CH_2CH_2$ | Me | c-Pr | C(=O)Me | Cl | C(=O)Me | O |
| C-2424 | Me | $CH_2CH_2$ | H | c-Pr | C(=O)Me | Cl | C(=O)Me | O |
| C-2425 | H | single bond | Me | c-Pr | C(=O)Me | Me | C(=O)Me | O |
| C-2426 | Me | single bond | H | c-Pr | C(=O)Me | Me | C(=O)Me | O |
| C-2427 | Me(R) | single bond | H | c-Pr | C(=O)Me | Me | C(=O)Me | O |
| C-2428 | Me(S) | single bond | H | c-Pr | C(=O)Me | Me | C(=O)Me | O |
| C-2429 | H | $CH_2$ | Me | c-Pr | C(=O)Me | Me | C(=O)Me | O |
| C-2430 | Me | $CH_2$ | H | c-Pr | C(=O)Me | Me | C(=O)Me | O |
| C-2431 | H | CH(Me) | H | c-Pr | C(=O)Me | Me | C(=O)Me | O |
| C-2432 | H | $CH_2CH_2$ | Me | c-Pr | C(=O)Me | Me | C(=O)Me | O |
| C-2433 | Me | $CH_2CH_2$ | H | c-Pr | C(=O)Me | Me | C(=O)Me | O |
| C-2434 | H | single bond | Me | c-Pr | C(=O)(i-Pr) | Cl | Me | O |
| C-2435 | Me | single bond | H | c-Pr | C(=O)(i-Pr) | Cl | Me | O |
| C-2436 | Me(R) | single bond | H | c-Pr | C(=O)(i-Pr) | Cl | Me | O |
| C-2437 | Me(S) | single bond | H | c-Pr | C(=O)(i-Pr) | Cl | Me | O |
| C-2438 | H | $CH_2$ | Me | c-Pr | C(=O)(i-Pr) | Cl | Me | O |
| C-2439 | Me | $CH_2$ | H | c-Pr | C(=O)(i-Pr) | Cl | Me | O |
| C-2440 | H | CH(Me) | H | c-Pr | C(=O)(i-Pr) | Cl | Me | O |
| C-2441 | H | $CH_2CH_2$ | Me | c-Pr | C(=O)(i-Pr) | Cl | Me | O |
| C-2442 | Me | $CH_2CH_2$ | H | c-Pr | C(=O)(i-Pr) | Cl | Me | O |
| C-2443 | H | single bond | Me | c-Pr | C(=O)(i-Pr) | Me | Me | O |
| C-2444 | Me | single bond | H | c-Pr | C(=O)(i-Pr) | Me | Me | O |
| C-2445 | Me(R) | single bond | H | c-Pr | C(=O)(i-Pr) | Me | Me | O |
| C-2446 | Me(S) | single bond | H | c-Pr | C(=O)(i-Pr) | Me | Me | O |
| C-2447 | H | $CH_2$ | Me | c-Pr | C(=O)(i-Pr) | Me | Me | O |
| C-2448 | Me | $CH_2$ | H | c-Pr | C(=O)(i-Pr) | Me | Me | O |
| C-2449 | H | CH(Me) | H | c-Pr | C(=O)(i-Pr) | Me | Me | O |
| C-2450 | H | $CH_2CH_2$ | Me | c-Pr | C(=O)(i-Pr) | Me | Me | O |
| C-2451 | Me | $CH_2CH_2$ | H | c-Pr | C(=O)(i-Pr) | Me | Me | O |
| C-2452 | H | single bond | Me | c-Pr | C(=O)(i-Pr) | Cl | Et | O |
| C-2453 | Me | single bond | H | c-Pr | C(=O)(i-Pr) | Cl | Et | O |
| C-2454 | Me(R) | single bond | H | c-Pr | C(=O)(i-Pr) | Cl | Et | O |
| C-2455 | Me(S) | single bond | H | c-Pr | C(=O)(i-Pr) | Cl | Et | O |
| C-2456 | H | $CH_2$ | Me | c-Pr | C(=O)(i-Pr) | Cl | Et | O |
| C-2457 | Me | $CH_2$ | H | c-Pr | C(=O)(i-Pr) | Cl | Et | O |
| C-2458 | H | CH(Me) | H | c-Pr | C(=O)(i-Pr) | Cl | Et | O |

TABLE 283

| Compound Number | Y | W | Z | $R^1$ | $R^2$ | $R^3$ | $R^{10}$ | A |
|---|---|---|---|---|---|---|---|---|
| C-2459 | H | $CH_2CH_2$ | Me | c-Pr | C(=O)(i-Pr) | Cl | Et | O |
| C-2460 | Me | $CH_2CH_2$ | H | c-Pr | C(=O)(i-Pr) | Cl | Et | O |
| C-2461 | H | single bond | Me | c-Pr | C(=O)(i-Pr) | Me | Et | O |
| C-2462 | Me | single bond | H | c-Pr | C(=O)(i-Pr) | Me | Et | O |
| C-2463 | Me(R) | single bond | H | c-Pr | C(=O)(i-Pr) | Me | Et | O |
| C-2464 | Me(S) | single bond | H | c-Pr | C(=O)(i-Pr) | Me | Et | O |
| C-2465 | H | $CH_2$ | Me | c-Pr | C(=O)(i-Pr) | Me | Et | O |
| C-2466 | Me | $CH_2$ | H | c-Pr | C(=O)(i-Pr) | Me | Et | O |
| C-2467 | H | CH(Me) | H | c-Pr | C(=O)(i-Pr) | Me | Et | O |
| C-2468 | H | $CH_2CH_2$ | Me | c-Pr | C(=O)(i-Pr) | Me | Et | O |
| C-2469 | Me | $CH_2CH_2$ | H | c-Pr | C(=O)(i-Pr) | Me | Et | O |
| C-2470 | H | single bond | Me | c-Pr | C(=O)(i-Pr) | Cl | $CH_2CF_3$ | O |
| C-2471 | Me | single bond | H | c-Pr | C(=O)(i-Pr) | Cl | $CH_2CF_3$ | O |
| C-2472 | Me(R) | single bond | H | c-Pr | C(=O)(i-Pr) | Cl | $CH_2CF_3$ | O |
| C-2473 | Me(S) | single bond | H | c-Pr | C(=O)(i-Pr) | Cl | $CH_2CF_3$ | O |
| C-2474 | H | $CH_2$ | Me | c-Pr | C(=O)(i-Pr) | Cl | $CH_2CF_3$ | O |
| C-2475 | Me | $CH_2$ | H | c-Pr | C(=O)(i-Pr) | Cl | $CH_2CF_3$ | O |
| C-2476 | H | CH(Me) | H | c-Pr | C(=O)(i-Pr) | Cl | $CH_2CF_3$ | O |
| C-2477 | H | $CH_2CH_2$ | Me | c-Pr | C(=O)(i-Pr) | Cl | $CH_2CF_3$ | O |
| C-2478 | Me | $CH_2CH_2$ | H | c-Pr | C(=O)(i-Pr) | Cl | $CH_2CF_3$ | O |
| C-2479 | H | single bond | Me | c-Pr | C(=O)(i-Pr) | Me | $CH_2CF_3$ | O |
| C-2480 | Me | single bond | H | c-Pr | C(=O)(i-Pr) | Me | $CH_2CF_3$ | O |
| C-2481 | Me(R) | single bond | H | c-Pr | C(=O)(i-Pr) | Me | $CH_2CF_3$ | O |
| C-2482 | Me(S) | single bond | H | c-Pr | C(=O)(i-Pr) | Me | $CH_2CF_3$ | O |
| C-2483 | H | $CH_2$ | Me | c-Pr | C(=O)(i-Pr) | Me | $CH_2CF_3$ | O |
| C-2484 | Me | $CH_2$ | H | c-Pr | C(=O)(i-Pr) | Me | $CH_2CF_3$ | O |
| C-2485 | H | CH(Me) | H | c-Pr | C(=O)(i-Pr) | Me | $CH_2CF_3$ | O |
| C-2486 | H | $CH_2CH_2$ | Me | c-Pr | C(=O)(i-Pr) | Me | $CH_2CF_3$ | O |
| C-2487 | Me | $CH_2CH_2$ | H | c-Pr | C(=O)(i-Pr) | Me | $CH_2CF_3$ | O |
| C-2488 | H | single bond | Me | c-Pr | C(=O)(i-Pr) | Cl | $CH_2OMe$ | O |
| C-2489 | Me | single bond | H | c-Pr | C(=O)(i-Pr) | Cl | $CH_2OMe$ | O |

TABLE 283-continued

| Compound Number | Y | W | Z | $R^1$ | $R^2$ | $R^3$ | $R^{10}$ | A |
|---|---|---|---|---|---|---|---|---|
| C-2490 | Me(R) | single bond | H | c-Pr | C(=O)(i-Pr) | Cl | $CH_2OMe$ | O |
| C-2491 | Me(S) | single bond | H | c-Pr | C(=O)(i-Pr) | Cl | $CH_2OMe$ | O |
| C-2492 | H | $CH_2$ | Me | c-Pr | C(=O)(i-Pr) | Cl | $CH_2OMe$ | O |
| C-2493 | Me | $CH_2$ | H | c-Pr | C(=O)(i-Pr) | Cl | $CH_2OMe$ | O |
| C-2494 | H | CH(Me) | H | c-Pr | C(=O)(i-Pr) | Cl | $CH_2OMe$ | O |
| C-2495 | H | $CH_2CH_2$ | Me | c-Pr | C(=O)(i-Pr) | Cl | $CH_2OMe$ | O |
| C-2496 | Me | $CH_2CH_2$ | H | c-Pr | C(=O)(i-Pr) | Cl | $CH_2OMe$ | O |
| C-2497 | H | single bond | Me | c-Pr | C(=O)(i-Pr) | Me | $CH_2OMe$ | O |
| C-2498 | Me | single bond | H | c-Pr | C(=O)(i-Pr) | Me | $CH_2OMe$ | O |
| C-2499 | Me(R) | single bond | H | c-Pr | C(=O)(i-Pr) | Me | $CH_2OMe$ | O |
| C-2500 | Me(S) | single bond | H | c-Pr | C(=O)(i-Pr) | Me | $CH_2OMe$ | O |
| C-2501 | H | $CH_2$ | Me | c-Pr | C(=O)(i-Pr) | Me | $CH_2OMe$ | O |
| C-2502 | Me | $CH_2$ | H | c-Pr | C(=O)(i-Pr) | Me | $CH_2OMe$ | O |

TABLE 284

| Compound Number | Y | W | Z | $R^1$ | $R^2$ | $R^3$ | $R^{10}$ | A |
|---|---|---|---|---|---|---|---|---|
| C-2503 | H | CH(Me) | H | c-Pr | C(=O)(i-Pr) | Me | $CH_2OMe$ | O |
| C-2504 | H | $CH_2CH_2$ | Me | c-Pr | C(=O)(i-Pr) | Me | $CH_2OMe$ | O |
| C-2505 | Me | $CH_2CH_2$ | H | c-Pr | C(=O)(i-Pr) | Me | $CH_2OMe$ | O |
| C-2506 | H | single bond | Me | c-Pr | C(=O)(i-Pr) | Cl | $CH_2CN$ | O |
| C-2507 | Me | single bond | H | c-Pr | C(=O)(i-Pr) | Cl | $CH_2CN$ | O |
| C-2508 | Me(R) | single bond | H | c-Pr | C(=O)(i-Pr) | Cl | $CH_2CN$ | O |
| C-2509 | Me(S) | single bond | H | c-Pr | C(=O)(i-Pr) | Cl | $CH_2CN$ | O |
| C-2510 | H | $CH_2$ | Me | c-Pr | C(=O)(i-Pr) | Cl | $CH_2CN$ | O |
| C-2511 | Me | $CH_2$ | H | c-Pr | C(=O)(i-Pr) | Cl | $CH_2CN$ | O |
| C-2512 | H | CH(Me) | H | c-Pr | C(=O)(i-Pr) | Cl | $CH_2CN$ | O |
| C-2513 | H | $CH_2CH_2$ | Me | c-Pr | C(=O)(i-Pr) | Cl | $CH_2CN$ | O |
| C-2514 | Me | $CH_2CH_2$ | H | c-Pr | C(=O)(i-Pr) | Cl | $CH_2CN$ | O |
| C-2515 | H | single bond | Me | c-Pr | C(=O)(i-Pr) | Me | $CH_2CN$ | O |
| C-2516 | Me | single bond | H | c-Pr | C(=O)(i-Pr) | Me | $CH_2CN$ | O |
| C-2517 | Me(R) | single bond | H | c-Pr | C(=O)(i-Pr) | Me | $CH_2CN$ | O |
| C-2518 | Me(S) | single bond | H | c-Pr | C(=O)(i-Pr) | Me | $CH_2CN$ | O |
| C-2519 | H | $CH_2$ | Me | c-Pr | C(=O)(i-Pr) | Me | $CH_2CN$ | O |
| C-2520 | Me | $CH_2$ | H | c-Pr | C(=O)(i-Pr) | Me | $CH_2CN$ | O |
| C-2521 | H | CH(Me) | H | c-Pr | C(=O)(i-Pr) | Me | $CH_2CN$ | O |
| C-2522 | H | $CH_2CH_2$ | Me | c-Pr | C(=O)(i-Pr) | Me | $CH_2CN$ | O |
| C-2523 | Me | $CH_2CH_2$ | H | c-Pr | C(=O)(i-Pr) | Me | $CH_2CN$ | O |
| C-2524 | H | single bond | Me | c-Pr | C(=O)(i-Pr) | Cl | C(=O)Me | O |
| C-2525 | Me | single bond | H | c-Pr | C(=O)(i-Pr) | Cl | C(=O)Me | O |
| C-2526 | Me(R) | single bond | H | c-Pr | C(=O)(i-Pr) | Cl | C(=O)Me | O |
| C-2527 | Me(S) | single bond | H | c-Pr | C(=O)(i-Pr) | Cl | C(=O)Me | O |
| C-2528 | H | $CH_2$ | Me | c-Pr | C(=O)(i-Pr) | Cl | C(=O)Me | O |
| C-2529 | Me | $CH_2$ | H | c-Pr | C(=O)(i-Pr) | Cl | C(=O)Me | O |
| C-2530 | H | CH(Me) | H | c-Pr | C(=O)(i-Pr) | Cl | C(=O)Me | O |
| C-2531 | H | $CH_2CH_2$ | Me | c-Pr | C(=O)(i-Pr) | Cl | C(=O)Me | O |
| C-2532 | Me | $CH_2CH_2$ | H | c-Pr | C(=O)(i-Pr) | Cl | C(=O)Me | O |
| C-2533 | H | single bond | Me | c-Pr | C(=O)(i-Pr) | Me | C(=O)Me | O |
| C-2534 | Me | single bond | H | c-Pr | C(=O)(i-Pr) | Me | C(=O)Me | O |
| C-2535 | Me(R) | single bond | H | c-Pr | C(=O)(i-Pr) | Me | C(=O)Me | O |
| C-2536 | Me(S) | single bond | H | c-Pr | C(=O)(i-Pr) | Me | C(=O)Me | O |
| C-2537 | H | $CH_2$ | Me | c-Pr | C(=O)(i-Pr) | Me | C(=O)Me | O |
| C-2538 | Me | $CH_2$ | H | c-Pr | C(=O)(i-Pr) | Me | C(=O)Me | O |
| C-2539 | H | CH(Me) | H | c-Pr | C(=O)(i-Pr) | Me | C(=O)Me | O |
| C-2540 | H | $CH_2CH_2$ | Me | c-Pr | C(=O)(i-Pr) | Me | C(=O)Me | O |
| C-2541 | Me | $CH_2CH_2$ | H | c-Pr | C(=O)(i-Pr) | Me | C(=O)Me | O |
| C-2542 | H | single bond | Me | c-Pr | C(=O)Ph | Cl | Me | O |
| C-2543 | Me | single bond | H | c-Pr | C(=O)Ph | Cl | Me | O |
| C-2544 | Me(R) | single bond | H | c-Pr | C(=O)Ph | Cl | Me | O |
| C-2545 | Me(S) | single bond | H | c-Pr | C(=O)Ph | Cl | Me | O |
| C-2546 | H | $CH_2$ | Me | c-Pr | C(=O)Ph | Cl | Me | O |

TABLE 285

| Compound Number | Y | W | Z | $R^1$ | $R^2$ | $R^3$ | $R^{10}$ | A |
|---|---|---|---|---|---|---|---|---|
| C-2547 | Me | $CH_2$ | H | c-Pr | C(═O)Ph | Cl | Me | O |
| C-2548 | H | CH(Me) | H | c-Pr | C(═O)Ph | Cl | Me | O |
| C-2549 | H | $CH_2CH_2$ | Me | c-Pr | C(═O)Ph | Cl | Me | O |
| C-2550 | Me | $CH_2CH_2$ | H | c-Pr | C(═O)Ph | Cl | Me | O |
| C-2551 | H | single bond | Me | c-Pr | C(═O)Ph | Me | Me | O |
| C-2552 | Me | single bond | H | c-Pr | C(═O)Ph | Me | Me | O |
| C-2553 | Me(R) | single bond | H | c-Pr | C(═O)Ph | Me | Me | O |
| C-2554 | Me(S) | single bond | H | c-Pr | C(═O)Ph | Me | Me | O |
| C-2555 | H | $CH_2$ | Me | c-Pr | C(═O)Ph | Me | Me | O |
| C-2556 | Me | $CH_2$ | H | c-Pr | C(═O)Ph | Me | Me | O |
| C-2557 | H | CH(Me) | H | c-Pr | C(═O)Ph | Me | Me | O |
| C-2558 | H | $CH_2CH_2$ | Me | c-Pr | C(═O)Ph | Me | Me | O |
| C-2559 | Me | $CH_2CH_2$ | H | c-Pr | C(═O)Ph | Me | Me | O |
| C-2560 | H | single bond | Me | c-Pr | C(═O)Ph | Cl | Et | O |
| C-2561 | Me | single bond | H | c-Pr | C(═O)Ph | Cl | Et | O |
| C-2562 | Me(R) | single bond | H | c-Pr | C(═O)Ph | Cl | Et | O |
| C-2563 | Me(S) | single bond | H | c-Pr | C(═O)Ph | Cl | Et | O |
| C-2564 | H | $CH_2$ | Me | c-Pr | C(═O)Ph | Cl | Et | O |
| C-2565 | Me | $CH_2$ | H | c-Pr | C(═O)Ph | Cl | Et | O |
| C-2566 | H | CH(Me) | H | c-Pr | C(═O)Ph | Cl | Et | O |
| C-2567 | H | $CH_2CH_2$ | Me | c-Pr | C(═O)Ph | Cl | Et | O |
| C-2568 | Me | $CH_2CH_2$ | H | c-Pr | C(═O)Ph | Cl | Et | O |
| C-2569 | H | single bond | Me | c-Pr | C(═O)Ph | Me | Et | O |
| C-2570 | Me | single bono | H | c-Pr | C(═O)Ph | Me | Et | O |
| C-2571 | Me(R) | single bond | H | c-Pr | C(═O)Ph | Me | Et | O |
| C-2572 | Me(S) | single bond | H | c-Pr | C(═O)Ph | Me | Et | O |
| C-2573 | H | $CH_2$ | Me | c-Pr | C(═O)Ph | Me | Et | O |
| C-2574 | Me | $CH_2$ | H | c-Pr | C(═O)Ph | Me | Et | O |
| C-2575 | H | CH(Me) | H | c-Pr | C(═O)Ph | Me | Et | O |
| C-2576 | H | $CH_2CH_2$ | Me | c-Pr | C(═O)Ph | Me | Et | O |
| C-2577 | Me | $CH_2CH_2$ | H | c-Pr | C(═O)Ph | Me | Et | O |
| C-2578 | H | single bond | Me | c-Pr | C(═O)Ph | Cl | $CH_2CF_3$ | O |
| C-2579 | Me | single bond | H | c-Pr | C(═O)Ph | Cl | $CH_2CF_3$ | O |
| C-2580 | Me(R) | single bond | H | c-Pr | C(═O)Ph | Cl | $CH_2CF_3$ | O |
| C-2581 | Me(S) | single bond | H | c-Pr | C(═O)Ph | Cl | $CH_2CF_3$ | O |
| C-2582 | H | $CH_2$ | Me | c-Pr | C(═O)Ph | Cl | $CH_2CF_3$ | O |
| C-2583 | Me | $CH_2$ | H | c-Pr | C(═O)Ph | Cl | $CH_2CF_3$ | O |
| C-2584 | H | CH(Me) | H | c-Pr | C(═O)Ph | Cl | $CH_2CF_3$ | O |
| C-2585 | H | $CH_2CH_2$ | Me | c-Pr | C(═O)Ph | Cl | $CH_2CF_3$ | O |
| C-2586 | Me | $CH_2CH_2$ | H | c-Pr | C(═O)Ph | Cl | $CH_2CF_3$ | O |
| C-2587 | H | single bond | Me | c-Pr | C(═O)Ph | Me | $CH_2CF_3$ | O |
| C-2588 | Me | single bond | H | c-Pr | C(═O)Ph | Me | $CH_2CF_3$ | O |
| C-2589 | Me(R) | single bond | H | c-Pr | C(═O)Ph | Me | $CH_2CF_3$ | O |
| C-2590 | Me(S) | single bond | H | c-Pr | C(═O)Ph | Me | $CH_2CF_3$ | O |

TABLE 286

| Compound Number | Y | W | Z | $R^1$ | $R^2$ | $R^3$ | $R^{10}$ | A |
|---|---|---|---|---|---|---|---|---|
| C-2591 | H | $CH_2$ | Me | c-Pr | C(═O)Ph | Me | $CH_2CF_3$ | O |
| C-2592 | Me | $CH_2$ | H | c-Pr | C(═O)Ph | Me | $CH_2CF_3$ | O |
| C-2593 | H | CH(Me) | H | c-Pr | C(═O)Ph | Me | $CH_2CF_3$ | O |
| C-2594 | H | $CH_2CH_2$ | Me | c-Pr | C(═O)Ph | Me | $CH_2CF_3$ | O |
| C-2595 | Me | $CH_2CH_2$ | H | c-Pr | C(═O)Ph | Me | $CH_2CF_3$ | O |
| C-2596 | H | single bond | Me | c-Pr | C(═O)Ph | Cl | $CH_2OMe$ | O |
| C-2597 | Me | single bond | H | c-Pr | C(═O)Ph | Cl | $CH_2OMe$ | O |
| C-2598 | Me(R) | single bond | H | c-Pr | C(═O)Ph | Cl | $CH_2OMe$ | O |
| C-2599 | Me(S) | single bond | H | c-Pr | C(═O)Ph | Cl | $CH_2OMe$ | O |
| C-2600 | H | $CH_2$ | Me | c-Pr | C(═O)Ph | Cl | $CH_2OMe$ | O |
| C-2601 | Me | $CH_2$ | H | c-Pr | C(═O)Ph | Cl | $CH_2OMe$ | O |
| C-2602 | H | CH(Me) | H | c-Pr | C(═O)Ph | Cl | $CH_2OMe$ | O |
| C-2603 | H | $CH_2CH_2$ | Me | c-Pr | C(═O)Ph | Cl | $CH_2OMe$ | O |
| C-2604 | Me | $CH_2CH_2$ | H | c-Pr | C(═O)Ph | Cl | $CH_2OMe$ | O |
| C-2605 | H | single bond | Me | c-Pr | C(═O)Ph | Me | $CH_2OMe$ | O |
| C-2606 | Me | single bond | H | c-Pr | C(═O)Ph | Me | $CH_2OMe$ | O |
| C-2607 | Me(R) | single bond | H | c-Pr | C(═O)Ph | Me | $CH_2OMe$ | O |
| C-2608 | Me(S) | single bond | H | c-Pr | C(═O)Ph | Me | $CH_2OMe$ | O |
| C-2609 | H | $CH_2$ | Me | c-Pr | C(═O)Ph | Me | $CH_2OMe$ | O |
| C-2610 | Me | $CH_2$ | H | c-Pr | C(═O)Ph | Me | $CH_2OMe$ | O |
| C-2611 | H | CH(Me) | H | c-Pr | C(═O)Ph | Me | $CH_2OMe$ | O |
| C-2612 | H | $CH_2CH_2$ | Me | c-Pr | C(═O)Ph | Me | $CH_2OMe$ | O |
| C-2613 | Me | $CH_2CH_2$ | H | c-Pr | C(═O)Ph | Me | $CH_2OMe$ | O |

TABLE 286-continued

| Compound Number | Y | W | Z | $R^1$ | $R^2$ | $R^3$ | $R^{10}$ | A |
|---|---|---|---|---|---|---|---|---|
| C-2614 | H | single bond | Me | c-Pr | C(=O)Ph | Cl | $CH_2CN$ | O |
| C-2615 | Me | single bond | H | c-Pr | C(=O)Ph | Cl | $CH_2CN$ | O |
| C-2616 | Me(R) | single bond | H | c-Pr | C(=O)Ph | Cl | $CH_2CN$ | O |
| C-2617 | Me(S) | single bond | H | c-Pr | C(=O)Ph | Cl | $CH_2CN$ | O |
| C-2618 | H | $CH_2$ | Me | c-Pr | C(=O)Ph | Cl | $CH_2CN$ | O |
| C-2619 | Me | $CH_2$ | H | c-Pr | C(=O)Ph | Cl | $CH_2CN$ | O |
| C-2620 | H | CH(Me) | H | c-Pr | C(=O)Ph | Cl | $CH_2CN$ | O |
| C-2621 | H | $CH_2CH_2$ | Me | c-Pr | C(=O)Ph | Cl | $CH_2CN$ | O |
| C-2622 | Me | $CH_2CH_2$ | H | c-Pr | C(=O)Ph | Cl | $CH_2CN$ | O |
| C-2623 | H | single bond | Me | c-Pr | C(=O)Ph | Me | $CH_2CN$ | O |
| C-2624 | Me | single bond | H | c-Pr | C(=O)Ph | Me | $CH_2CN$ | O |
| C-2625 | Me(R) | single bond | H | c-Pr | C(=O)Ph | Me | $CH_2CN$ | O |
| C-2626 | Me(S) | single bond | H | c-Pr | C(=O)Ph | Me | $CH_2CN$ | O |
| C-2627 | H | $CH_2$ | Me | c-Pr | C(=O)Ph | Me | $CH_2CN$ | O |
| C-2628 | Me | $CH_2$ | H | c-Pr | C(=O)Ph | Me | $CH_2CN$ | O |
| C-2629 | H | CH(Me) | H | c-Pr | C(=O)Ph | Me | $CH_2CN$ | O |
| C-2630 | H | $CH_2CH_2$ | Me | c-Pr | C(=O)Ph | Me | $CH_2CN$ | O |
| C-2631 | Me | $CH_2CH_2$ | H | c-Pr | C(=O)Ph | Me | $CH_2CN$ | O |
| C-2632 | H | single bond | Me | c-Pr | C(=O)Ph | Cl | C(=O)Me | O |
| C-2633 | Me | single bond | H | c-Pr | C(=O)Ph | Cl | C(=O)Me | O |
| C-2634 | Me(R) | single bond | H | c-Pr | C(=O)Ph | Cl | C(=O)Me | O |

TABLE 287

| Compound Number | Y | W | Z | $R^1$ | $R^2$ | $R^3$ | $R^{10}$ | A |
|---|---|---|---|---|---|---|---|---|
| C-2635 | Me(S) | single bond | H | c-Pr | C(=O)Ph | Cl | C(=O)Me | O |
| C-2636 | H | $CH_2$ | Me | c-Pr | C(=O)Ph | Cl | C(=O)Me | O |
| C-2637 | Me | $CH_2$ | H | c-Pr | C(=O)Ph | Cl | C(=O)Me | O |
| C-2638 | H | CH(Me) | H | c-Pr | C(=O)Ph | Cl | C(=O)Me | O |
| C-2639 | H | $CH_2CH_2$ | Me | c-Pr | C(=O)Ph | Cl | C(=O)Me | O |
| C-2640 | Me | $CH_2CH_2$ | H | c-Pr | C(=O)Ph | Cl | C(=O)Me | O |
| C-2641 | H | single bond | Me | c-Pr | C(=O)Ph | Me | C(=O)Me | O |
| C-2642 | Me | single bond | H | c-Pr | C(=O)Ph | Me | C(=O)Me | O |
| C-2643 | Me(R) | single bond | H | c-Pr | C(=O)Ph | Me | C(=O)Me | O |
| C-2644 | Me(S) | single bond | H | c-Pr | C(=O)Ph | Me | C(=O)Me | O |
| C-2645 | H | $CH_2$ | Me | c-Pr | C(=O)Ph | Me | C(=O)Me | O |
| C-2646 | Me | $CH_2$ | H | c-Pr | C(=O)Ph | Me | C(=O)Me | O |
| C-2647 | H | CH(Me) | H | c-Pr | C(=O)Ph | Me | C(=O)Me | O |
| C-2648 | H | $CH_2CH_2$ | Me | c-Pr | C(=O)Ph | Me | C(=O)Me | O |
| C-2649 | Me | $CH_2CH_2$ | H | c-Pr | C(=O)Ph | Me | C(=O)Me | O |
| C-2650 | H | single bond | Me | c-Pr | C(=O)OEt | Cl | Me | O |
| C-2651 | H | single bond | Et | c-Pr | C(=O)OEt | Cl | Me | O |
| C-2652 | Me | single bond | H | c-Pr | C(=O)OEt | Cl | Me | O |
| C-2653 | Me(R) | single bond | H | c-Pr | C(=O)OEt | Cl | Me | O |
| C-2654 | Me(S) | single bond | H | c-Pr | C(=O)OEt | Cl | Me | O |
| C-2655 | H | $CH_2$ | Me | c-Pr | C(=O)OEt | Cl | Me | O |
| C-2656 | Me | $CH_2$ | H | c-Pr | C(=O)OEt | Cl | Me | O |
| C-2657 | H | CH(Me) | H | c-Pr | C(=O)OEt | Cl | Me | O |
| C-2658 | H | $CH_2CH_2$ | Me | c-Pr | C(=O)OEt | Cl | Me | O |
| C-2659 | Me | $CH_2CH_2$ | H | c-Pr | C(=O)OEt | Cl | Me | O |
| C-2660 | H | single bond | Me | c-Pr | C(=O)OEt | Me | Me | O |
| C-2661 | Me | single bond | H | c-Pr | C(=O)OEt | Me | Me | O |
| C-2662 | Me(R) | single bond | H | c-Pr | C(=O)OEt | Me | Me | O |
| C-2663 | Me(S) | single bond | H | c-Pr | C(=O)OEt | Me | Me | O |
| C-2664 | H | $CH_2$ | Me | c-Pr | C(=O)OEt | Me | Me | O |
| C-2665 | Me | $CH_2$ | H | c-Pr | C(=O)OEt | Me | Me | O |
| C-2666 | H | CH(Me) | H | c-Pr | C(=O)OEt | Me | Me | O |
| C-2667 | H | $CH_2CH_2$ | Me | c-Pr | C(=O)OEt | Me | Me | O |
| C-2668 | Me | $CH_2CH_2$ | H | c-Pr | C(=O)OEt | Me | Me | O |
| C-2669 | H | single bond | Me | c-Pr | C(=O)OEt | Cl | Et | O |
| C-2670 | Me | single bond | H | c-Pr | C(=O)OEt | Cl | Et | O |
| C-2671 | Me(R) | single bond | H | c-Pr | C(=O)OEt | Cl | Et | O |
| C-2672 | Me(S) | single bond | H | c-Pr | C(=O)OEt | Cl | Et | O |
| C-2673 | H | $CH_2$ | Me | c-Pr | C(=O)OEt | Cl | Et | O |
| C-2674 | Me | $CH_2$ | H | c-Pr | C(=O)OEt | Cl | Et | O |
| C-2675 | H | CH(Me) | H | c-Pr | C(=O)OEt | Cl | Et | O |
| C-2676 | H | $CH_2CH_2$ | Me | c-Pr | C(=O)OEt | Cl | Et | O |
| C-2677 | Me | $CH_2CH_2$ | H | c-Pr | C(=O)OEt | Cl | Et | O |
| C-2678 | H | single bond | Me | c-Pr | C(=O)OEt | Me | Et | O |

TABLE 288

| Compound Number | Y | W | Z | $R^1$ | $R^2$ | $R^3$ | $R^{10}$ | A |
|---|---|---|---|---|---|---|---|---|
| C-2679 | Me | single bond | H | c-Pr | C(=O)OEt | Me | Et | O |
| C-2680 | Me(R) | single bond | H | c-Pr | C(=O)OEt | Me | Et | O |
| C-2681 | Me(S) | single bond | H | c-Pr | C(=O)OEt | Me | Et | O |
| C-2682 | H | $CH_2$ | Me | c-Pr | C(=O)OEt | Me | Et | O |
| C-2683 | Me | $CH_2$ | H | c-Pr | C(=O)OEt | Me | Et | O |
| C-2684 | H | CH(Me) | H | c-Pr | C(=O)OEt | Me | Et | O |
| C-2685 | H | $CH_2CH_2$ | Me | c-Pr | C(=O)OEt | Me | Et | O |
| C-2686 | Me | $CH_2CH_2$ | H | c-Pr | C(=O)OEt | Me | Et | O |
| C-2687 | H | single bond | Me | c-Pr | C(=O)OEt | Cl | $CH_2CF_3$ | O |
| C-2688 | Me | single bond | H | c-Pr | C(=O)OEt | Cl | $CH_2CF_3$ | O |
| C-2689 | Me(R) | single bond | H | c-Pr | C(=O)OEt | Cl | $CH_2CF_3$ | O |
| C-2690 | Me(S) | single bond | H | c-Pr | C(=O)OEt | Cl | $CH_2CF_3$ | O |
| C-2691 | H | $CH_2$ | Me | c-Pr | C(=O)OEt | Cl | $CH_2CF_3$ | O |
| C-2692 | Me | $CH_2$ | H | c-Pr | C(=O)OEt | Cl | $CH_2CF_3$ | O |
| C-2693 | H | CH(Me) | H | c-Pr | C(=O)OEt | Cl | $CH_2CF_3$ | O |
| C-2694 | H | $CH_2CH_2$ | Me | c-Pr | C(=O)OEt | Cl | $CH_2CF_3$ | O |
| C-2695 | Me | $CH_2CH_2$ | H | c-Pr | C(=O)OEt | Cl | $CH_2CF_3$ | O |
| C-2696 | H | single bond | Me | c-Pr | C(=O)OEt | Me | $CH_2CF_3$ | O |
| C-2697 | Me | single bond | H | c-Pr | C(=O)OEt | Me | $CH_2CF_3$ | O |
| C-2698 | Me(R) | single bond | H | c-Pr | C(=O)OEt | Me | $CH_2CF_3$ | O |
| C-2699 | Me(S) | single bond | H | c-Pr | C(=O)OEt | Me | $CH_2CF_3$ | O |
| C-2700 | H | $CH_2$ | Me | c-Pr | C(=O)OEt | Me | $CH_2CF_3$ | O |
| C-2701 | Me | $CH_2$ | H | c-Pr | C(=O)OEt | Me | $CH_2CF_3$ | O |
| C-2702 | H | CH(Me) | H | c-Pr | C(=O)OEt | Me | $CH_2CF_3$ | O |
| C-2703 | H | $CH_2CH_2$ | Me | c-Pr | C(=O)OEt | Me | $CH_2CF_3$ | O |
| C-2704 | Me | $CH_2CH_2$ | H | c-Pr | C(=O)OEt | Me | $CH_2CF_3$ | O |
| C-2705 | H | single bond | Me | c-Pr | C(=O)OEt | Cl | $CH_2OMe$ | O |
| C-2706 | Me | single bond | H | c-Pr | C(=O)OEt | Cl | $CH_2OMe$ | O |
| C-2707 | Me(R) | single bond | H | c-Pr | C(=O)OEt | Cl | $CH_2OMe$ | O |
| C-2708 | Me(S) | single bond | H | c-Pr | C(=O)OEt | Cl | $CH_2OMe$ | O |
| C-2709 | H | $CH_2$ | Me | c-Pr | C(=O)OEt | Cl | $CH_2OMe$ | O |
| C-2710 | Me | $CH_2$ | H | c-Pr | C(=O)OEt | Cl | $CH_2OMe$ | O |
| C-2711 | H | CH(Me) | H | c-Pr | C(=O)OEt | Cl | $CH_2OMe$ | O |
| C-2712 | H | $CH_2CH_2$ | Me | c-Pr | C(=O)OEt | Cl | $CH_2OMe$ | O |
| C-2713 | Me | $CH_2CH_2$ | H | c-Pr | C(=O)OEt | Cl | $CH_2OMe$ | O |
| C-2714 | H | single bond | Me | c-Pr | C(=O)OEt | Me | $CH_2OMe$ | O |
| C-2715 | Me | single bond | H | c-Pr | C(=O)OEt | Me | $CH_2OMe$ | O |
| C-2716 | Me(R) | single bond | H | c-Pr | C(=O)OEt | Me | $CH_2OMe$ | O |
| C-2717 | Me(S) | single bond | H | c-Pr | C(=O)OEt | Me | $CH_2OMe$ | O |
| C-2718 | H | $CH_2$ | Me | c-Pr | C(=O)OEt | Me | $CH_2OMe$ | O |
| C-2719 | Me | $CH_2$ | H | c-Pr | C(=O)OEt | Me | $CH_2OMe$ | O |
| C-2720 | H | CH(Me) | H | c-Pr | C(=O)OEt | Me | $CH_2OMe$ | O |
| C-2721 | H | $CH_2CH_2$ | Me | c-Pr | C(=O)OEt | Me | $CH_2OMe$ | O |
| C-2722 | Me | $CH_2CH_2$ | H | c-Pr | C(=O)OEt | Me | $CH_2OMe$ | O |

TABLE 289

| Compound Number | Y | W | Z | $R^1$ | $R^2$ | $R^3$ | $R^{10}$ | A |
|---|---|---|---|---|---|---|---|---|
| C-2723 | H | single bond | Me | c-Pr | C(=O)OEt | Cl | $CH_2CN$ | O |
| C-2724 | Me | single bond | H | c-Pr | C(=O)OEt | Cl | $CH_2CN$ | O |
| C-2725 | Me(R) | single bond | H | c-Pr | C(=O)OEt | Cl | $CH_2CN$ | O |
| C-2726 | Me(S) | single bond | H | c-Pr | C(=O)OEt | Cl | $CH_2CN$ | O |
| C-2727 | H | $CH_2$ | Me | c-Pr | C(=O)OEt | Cl | $CH_2CN$ | O |
| C-2728 | Me | $CH_2$ | H | c-Pr | C(=O)OEt | Cl | $CH_2CN$ | O |
| C-2729 | H | CH(Me) | H | c-Pr | C(=O)OEt | Cl | $CH_2CN$ | O |
| C-2730 | H | $CH_2CH_2$ | Me | c-Pr | C(=O)OEt | Cl | $CH_2CN$ | O |
| C-2731 | Me | $CH_2CH_2$ | H | c-Pr | C(=O)OEt | Cl | $CH_2CN$ | O |
| C-2732 | H | single bond | Me | c-Pr | C(=O)OEt | Me | $CH_2CN$ | O |
| C-2733 | Me | single bond | H | c-Pr | C(=O)OEt | Me | $CH_2CN$ | O |
| C-2734 | Me(R) | single bond | H | c-Pr | C(=O)OEt | Me | $CH_2CN$ | O |
| C-2735 | Me(S) | single bond | H | c-Pr | C(=O)OEt | Me | $CH_2CN$ | O |
| C-2736 | H | $CH_2$ | Me | c-Pr | C(=O)OEt | Me | $CH_2CN$ | O |
| C-2737 | Me | $CH_2$ | H | c-Pr | C(=O)OEt | Me | $CH_2CN$ | O |
| C-2738 | H | CH(Me) | H | c-Pr | C(=O)OEt | Me | $CH_2CN$ | O |
| C-2739 | H | $CH_2CH_2$ | Me | c-Pr | C(=O)OEt | Me | $CH_2CN$ | O |
| C-2740 | Me | $CH_2CH_2$ | H | c-Pr | C(=O)OEt | Me | $CH_2CN$ | O |
| C-2741 | H | single bond | Me | c-Pr | C(=O)OEt | Cl | C(=O)Me | O |
| C-2742 | Me | single bond | H | c-Pr | C(=O)OEt | Cl | C(=O)Me | O |
| C-2743 | Me(R) | single bond | H | c-Pr | C(=O)OEt | Cl | C(=O)Me | O |

TABLE 289-continued

| Compound Number | Y | W | Z | $R^1$ | $R^2$ | $R^3$ | $R^{10}$ | A |
|---|---|---|---|---|---|---|---|---|
| C-2744 | Me(S) | single bond | H | c-Pr | C(=O)OEt | Cl | C(=O)Me | O |
| C-2745 | H | $CH_2$ | Me | c-Pr | C(=O)OEt | Cl | C(=O)Me | O |
| C-2746 | Me | $CH_2$ | H | c-Pr | C(=O)OEt | Cl | C(=O)Me | O |
| C-2747 | H | CH(Me) | H | c-Pr | C(=O)OEt | Cl | C(=O)Me | O |
| C-2748 | H | $CH_2CH_2$ | Me | c-Pr | C(=O)OEt | Cl | C(=O)Me | O |
| C-2749 | Me | $CH_2CH_2$ | H | c-Pr | C(=O)OEt | Cl | C(=O)Me | O |
| C-2750 | H | single bond | Me | c-Pr | C(=O)OEt | Me | C(=O)Me | O |
| C-2751 | Me | single bond | H | c-Pr | C(=O)OEt | Me | C(=O)Me | O |
| C-2752 | Me(R) | single bond | H | c-Pr | C(=O)OEt | Me | C(=O)Me | O |
| C-2753 | Me(S) | single bond | H | c-Pr | C(=O)OEt | Me | C(=O)Me | O |
| C-2754 | H | $CH_2$ | Me | c-Pr | C(=O)OEt | Me | C(=O)Me | O |
| C-2755 | Me | $CH_2$ | H | c-Pr | C(=O)OEt | Me | C(=O)Me | O |
| C-2756 | H | CH(Me) | H | c-Pr | C(=O)OEt | Me | C(=O)Me | O |
| C-2757 | H | $CH_2CH_2$ | Me | c-Pr | C(=O)OEt | Me | C(=O)Me | O |
| C-2758 | Me | $CH_2CH_2$ | H | c-Pr | C(=O)OEt | Me | C(=O)Me | O |
| C-2759 | H | single bond | Me | c-Pr | $S(=O)_2Me$ | Cl | Me | O |
| C-2760 | H | single bond | Et | c-Pr | $S(=O)_2Me$ | Cl | Me | O |
| C-2761 | Me | single bond | H | c-Pr | $S(=O)_2Me$ | Cl | Me | O |
| C-2762 | Me(R) | single bond | H | c-Pr | $S(=O)_2Me$ | Cl | Me | O |
| C-2763 | Me(S) | single bond | H | c-Pr | $S(=O)_2Me$ | Cl | Me | O |
| C-2764 | H | $CH_2$ | Me | c-Pr | $S(=O)_2Me$ | Cl | Me | O |
| C-2765 | Me | $CH_2$ | H | c-Pr | $S(=O)_2Me$ | Cl | Me | O |
| C-2766 | H | CH(Me) | H | c-Pr | $S(=O)_2Me$ | Cl | Me | O |

TABLE 290

| Compound Number | Y | W | Z | $R^1$ | $R^2$ | $R^3$ | $R^{10}$ | A |
|---|---|---|---|---|---|---|---|---|
| C-2767 | H | $CH_2CH_2$ | Me | c-Pr | $S(=O)_2Me$ | Cl | Me | O |
| C-2768 | Me | $CH_2CH_2$ | H | c-Pr | $S(=O)_2Me$ | Cl | Me | O |
| C-2769 | H | single bond | Me | c-Pr | $S(=O)_2Me$ | Me | Me | O |
| C-2770 | Me | single bond | H | c-Pr | $S(=O)_2Me$ | Me | Me | O |
| C-2771 | Me(R) | single bond | H | c-Pr | $S(=O)_2Me$ | Me | Me | O |
| C-2772 | Me(S) | single bond | H | c-Pr | $S(=O)_2Me$ | Me | Me | O |
| C-2773 | H | $CH_2$ | Me | c-Pr | $S(=O)_2Me$ | Me | Me | O |
| C-2774 | Me | $CH_2$ | H | c-Pr | $S(=O)_2Me$ | Me | Me | O |
| C-2775 | H | CH(Me) | H | c-Pr | $S(=O)_2Me$ | Me | Me | O |
| C-2776 | H | $CH_2CH_2$ | Me | c-Pr | $S(=O)_2Me$ | Me | Me | O |
| C-2777 | Me | $CH_2CH_2$ | H | c-Pr | $S(=O)_2Me$ | Me | Me | O |
| C-2778 | H | single bond | Me | c-Pr | $S(=O)_2Me$ | Cl | Et | O |
| C-2779 | Me | single bond | H | c-Pr | $S(=O)_2Me$ | Cl | Et | O |
| C-2780 | Me(R) | single bond | H | c-Pr | $S(=O)_2Me$ | Cl | Et | O |
| C-2781 | Me(S) | single bond | H | c-Pr | $S(=O)_2Me$ | Cl | Et | O |
| C-2782 | H | $CH_2$ | Me | c-Pr | $S(=O)_2Me$ | Cl | Et | O |
| C-2783 | Me | $CH_2$ | H | c-Pr | $S(=O)_2Me$ | Cl | Et | O |
| C-2784 | H | CH(Me) | H | c-Pr | $S(=O)_2Me$ | Cl | Et | O |
| C-2785 | H | $CH_2CH_2$ | Me | c-Pr | $S(=O)_2Me$ | Cl | Et | O |
| C-2786 | Me | $CH_2CH_2$ | H | c-Pr | $S(=O)_2Me$ | Cl | Et | O |
| C-2787 | H | single bond | Me | c-Pr | $S(=O)_2Me$ | Me | Et | O |
| C-2788 | Me | single bond | H | c-Pr | $S(=O)_2Me$ | Me | Et | O |
| C-2789 | Me(R) | single bond | H | c-Pr | $S(=O)_2Me$ | Me | Et | O |
| C-2790 | Me(S) | single bond | H | c-Pr | $S(=O)_2Me$ | Me | Et | O |
| C-2791 | H | $CH_2$ | Me | c-Pr | $S(=O)_2Me$ | Me | Et | O |
| C-2792 | Me | $CH_2$ | H | c-Pr | $S(=O)_2Me$ | Me | Et | O |
| C-2793 | H | CH(Me) | H | c-Pr | $S(=O)_2Me$ | Me | Et | O |
| C-2794 | H | $CH_2CH_2$ | Me | c-Pr | $S(=O)_2Me$ | Me | Et | O |
| C-2795 | Me | $CH_2CH_2$ | H | c-Pr | $S(=O)_2Me$ | Me | Et | O |
| C-2796 | H | single bond | Me | c-Pr | $S(=O)_2Me$ | Cl | $CH_2CF_3$ | O |
| C-2797 | Me | single bond | H | c-Pr | $S(=O)_2Me$ | Cl | $CH_2CF_3$ | O |
| C-2798 | Me(R) | single bond | H | c-Pr | $S(=O)_2Me$ | Cl | $CH_2CF_3$ | O |
| C-2799 | Me(S) | single bond | H | c-Pr | $S(=O)_2Me$ | Cl | $CH_2CF_3$ | O |
| C-2800 | H | $CH_2$ | Me | c-Pr | $S(=O)_2Me$ | Cl | $CH_2CF_3$ | O |
| C-2801 | Me | $CH_2$ | H | c-Pr | $S(=O)_2Me$ | Cl | $CH_2CF_3$ | O |
| C-2802 | H | CH(Me) | H | c-Pr | $S(=O)_2Me$ | Cl | $CH_2CF_3$ | O |
| C-2803 | H | $CH_2CH_2$ | Me | c-Pr | $S(=O)_2Me$ | Cl | $CH_2CF_3$ | O |
| C-2804 | Me | $CH_2CH_2$ | H | c-Pr | $S(=O)_2Me$ | Cl | $CH_2CF_3$ | O |
| C-2805 | H | single bond | Me | c-Pr | $S(=O)_2Me$ | Me | $CH_2CF_3$ | O |
| C-2806 | Me | single bond | H | c-Pr | $S(=O)_2Me$ | Me | $CH_2CF_3$ | O |
| C-2807 | Me(R) | single bond | H | c-Pr | $S(=O)_2Me$ | Me | $CH_2CF_3$ | O |
| C-2808 | Me(S) | single bond | H | c-Pr | $S(=O)_2Me$ | Me | $CH_2CF_3$ | O |
| C-2809 | H | $CH_2$ | Me | c-Pr | $S(=O)_2Me$ | Me | $CH_2CF_3$ | O |
| C-2810 | Me | $CH_2$ | H | c-Pr | $S(=O)_2Me$ | Me | $CH_2CF_3$ | O |

TABLE 291

| Compound Number | Y | W | Z | $R^1$ | $R^2$ | $R^3$ | $R^{10}$ | A |
|---|---|---|---|---|---|---|---|---|
| C-2811 | H | CH(Me) | H | c-Pr | $S(=O)_2Me$ | Me | $CH_2CF_3$ | O |
| C-2812 | H | $CH_2CH_2$ | Me | c-Pr | $S(=O)_2Me$ | Me | $CH_2CF_3$ | O |
| C-2813 | Me | $CH_2CH_2$ | H | c-Pr | $S(=O)_2Me$ | Me | $CH_2CF_3$ | O |
| C-2814 | H | single bond | Me | c-Pr | $S(=O)_2Me$ | Cl | $CH_2OMe$ | O |
| C-2815 | Me | single bond | H | c-Pr | $S(=O)_2Me$ | Cl | $CH_2OMe$ | O |
| C-2816 | Me(R) | single bond | H | c-Pr | $S(=O)_2Me$ | Cl | $CH_2OMe$ | O |
| C-2817 | Me(S) | single bond | H | c-Pr | $S(=O)_2Me$ | Cl | $CH_2OMe$ | O |
| C-2818 | H | $CH_2$ | Me | c-Pr | $S(=O)_2Me$ | Cl | $CH_2OMe$ | O |
| C-2819 | Me | $CH_2$ | H | c-Pr | $S(=O)_2Me$ | Cl | $CH_2OMe$ | O |
| C-2820 | H | CH(Me) | H | c-Pr | $S(=O)_2Me$ | Cl | $CH_2OMe$ | O |
| C-2821 | H | $CH_2CH_2$ | Me | c-Pr | $S(=O)_2Me$ | Cl | $CH_2OMe$ | O |
| C-2822 | Me | $CH_2CH_2$ | H | c-Pr | $S(=O)_2Me$ | Cl | $CH_2OMe$ | O |
| C-2823 | H | single bond | Me | c-Pr | $S(=O)_2Me$ | Me | $CH_2OMe$ | O |
| C-2824 | Me | single bond | H | c-Pr | $S(=O)_2Me$ | Me | $CH_2OMe$ | O |
| C-2825 | Me(R) | single bond | H | c-Pr | $S(=O)_2Me$ | Me | $CH_2OMe$ | O |
| C-2826 | Me(S) | single bond | H | c-Pr | $S(=O)_2Me$ | Me | $CH_2OMe$ | O |
| C-2827 | H | $CH_2$ | Me | c-Pr | $S(=O)_2Me$ | Me | $CH_2OMe$ | O |
| C-2828 | Me | $CH_2$ | H | c-Pr | $S(=O)_2Me$ | Me | $CH_2OMe$ | O |
| C-2829 | H | CH(Me) | H | c-Pr | $S(=O)_2Me$ | Me | $CH_2OMe$ | O |
| C-2830 | H | $CH_2CH_2$ | Me | c-Pr | $S(=O)_2Me$ | Me | $CH_2OMe$ | O |
| C-2831 | Me | $CH_2CH_2$ | H | c-Pr | $S(=O)_2Me$ | Me | $CH_2OMe$ | O |
| C-2832 | H | single bond | Me | c-Pr | $S(=O)_2Me$ | Cl | $CH_2CN$ | O |
| C-2833 | Me | single bond | H | c-Pr | $S(=O)_2Me$ | Cl | $CH_2CN$ | O |
| C-2834 | Me(R) | single bond | H | c-Pr | $S(=O)_2Me$ | Cl | $CH_2CN$ | O |
| C-2835 | Me(S) | single bond | H | c-Pr | $S(=O)_2Me$ | Cl | $CH_2CN$ | O |
| C-2836 | H | $CH_2$ | Me | c-Pr | $S(=O)_2Me$ | Cl | $CH_2CN$ | O |
| C-2837 | Me | $CH_2$ | H | c-Pr | $S(=O)_2Me$ | Cl | $CH_2CN$ | O |
| C-2838 | H | CH(Me) | H | c-Pr | $S(=O)_2Me$ | Cl | $CH_2CN$ | O |
| C-2839 | H | $CH_2CH_2$ | Me | c-Pr | $S(=O)_2Me$ | Cl | $CH_2CN$ | O |
| C-2840 | Me | $CH_2CH_2$ | H | c-Pr | $S(=O)_2Me$ | Cl | $CH_2CN$ | O |
| C-2841 | H | single bond | Me | c-Pr | $S(=O)_2Me$ | Me | $CH_2CN$ | O |
| C-2842 | Me | single bond | H | c-Pr | $S(=O)_2Me$ | Me | $CH_2CN$ | O |
| C-2843 | Me(R) | single bond | H | c-Pr | $S(=O)_2Me$ | Me | $CH_2CN$ | O |
| C-2844 | Me(S) | single bond | H | c-Pr | $S(=O)_2Me$ | Me | $CH_2CN$ | O |
| C-2845 | H | $CH_2$ | Me | c-Pr | $S(=O)_2Me$ | Me | $CH_2CN$ | O |
| C-2846 | Me | $CH_2$ | H | c-Pr | $S(=O)_2Me$ | Me | $CH_2CN$ | O |
| C-2847 | H | CH(Me) | H | c-Pr | $S(=O)_2Me$ | Me | $CH_2CN$ | O |
| C-2848 | H | $CH_2CH_2$ | Me | c-Pr | $S(=O)_2Me$ | Me | $CH_2CN$ | O |
| C-2849 | Me | $CH_2CH_2$ | H | c-Pr | $S(=O)_2Me$ | Me | $CH_2CN$ | O |
| C-2850 | H | single bond | Me | c-Pr | $S(=O)_2Me$ | Cl | C(=O)Me | O |
| C-2851 | Me | single bond | H | c-Pr | $S(=O)_2Me$ | Cl | C(=O)Me | O |
| C-2852 | Me(R) | single bond | H | c-Pr | $S(=O)_2Me$ | Cl | C(=O)Me | O |
| C-2853 | Me(S) | single bond | H | c-Pr | $S(=O)_2Me$ | Cl | C(=O)Me | O |
| C-2854 | H | $CH_2$ | Me | c-Pr | $S(=O)_2Me$ | Cl | C(=O)Me | O |

TABLE 292

| Compound Number | Y | W | Z | $R^1$ | $R^2$ | $R^3$ | $R^{10}$ | A |
|---|---|---|---|---|---|---|---|---|
| C-2855 | Me | $CH_2$ | H | c-Pr | $S(=O)_2Me$ | Cl | C(=O)Me | O |
| C-2856 | H | CH(Me) | H | c-Pr | $S(=O)_2Me$ | Cl | C(=O)Me | O |
| C-2857 | H | $CH_2CH_2$ | Me | c-Pr | $S(=O)_2Me$ | Cl | C(=O)Me | O |
| C-2858 | Me | $CH_2CH_2$ | H | c-Pr | $S(=O)_2Me$ | Cl | C(=O)Me | O |
| C-2859 | H | single bond | Me | c-Pr | $S(=O)_2Me$ | Me | C(=O)Me | O |
| C-2860 | Me | single bond | H | c-Pr | $S(=O)_2Me$ | Me | C(=O)Me | O |
| C-2861 | Me(R) | single bond | H | c-Pr | $S(=O)_2Me$ | Me | C(=O)Me | O |
| C-2862 | Me(S) | single bond | H | c-Pr | $S(=O)_2Me$ | Me | C(=O)Me | O |
| C-2863 | H | $CH_2$ | Me | c-Pr | $S(=O)_2Me$ | Me | C(=O)Me | O |
| C-2864 | Me | $CH_2$ | H | c-Pr | $S(=O)_2Me$ | Me | C(=O)Me | O |
| C-2865 | H | CH(Me) | H | c-Pr | $S(=O)_2Me$ | Me | C(=O)Me | O |
| C-2866 | H | $CH_2CH_2$ | Me | c-Pr | $S(=O)_2Me$ | Me | C(=O)Me | O |
| C-2867 | Me | $CH_2CH_2$ | H | c-Pr | $S(=O)_2Me$ | Me | C(=O)Me | O |
| C-2868 | H | single bond | Me | c-Pr | $S(=O)_2CF_3$ | Cl | Me | O |
| C-2869 | H | single bond | Et | c-Pr | $S(=O)_2CF_3$ | Cl | Me | O |
| C-2870 | Me | single bond | H | c-Pr | $S(=O)_2CF_3$ | Cl | Me | O |
| C-2871 | Me(R) | single bond | H | c-Pr | $S(=O)_2CF_3$ | Cl | Me | O |
| C-2872 | Me(S) | single bond | H | c-Pr | $S(=O)_2CF_3$ | Cl | Me | O |
| C-2873 | H | $CH_2$ | Me | c-Pr | $S(=O)_2CF_3$ | Cl | Me | O |
| C-2874 | Me | $CH_2$ | H | c-Pr | $S(=O)_2CF_3$ | Cl | Me | O |
| C-2875 | H | CH(Me) | H | c-Pr | $S(=O)_2CF_3$ | Cl | Me | O |

TABLE 292-continued

| Compound Number | Y | W | Z | $R^1$ | $R^2$ | $R^3$ | $R^{10}$ | A |
|---|---|---|---|---|---|---|---|---|
| C-2876 | H | $CH_2CH_2$ | Me | c-Pr | $S(=O)_2CF_3$ | Cl | Me | O |
| C-2877 | Me | $CH_2CH_2$ | H | c-Pr | $S(=O)_2CF_3$ | Cl | Me | O |
| C-2878 | H | single bond | Me | c-Pr | $S(=O)_2CF_3$ | Me | Me | O |
| C-2879 | Me | single bond | H | c-Pr | $S(=O)_2CF_3$ | Me | Me | O |
| C-2880 | Me(R) | single bond | H | c-Pr | $S(=O)_2CF_3$ | Me | Me | O |
| C-2881 | Me(S) | single bond | H | c-Pr | $S(=O)_2CF_3$ | Me | Me | O |
| C-2882 | H | $CH_2$ | Me | c-Pr | $S(=O)_2CF_3$ | Me | Me | O |
| C-2883 | Me | $CH_2$ | H | c-Pr | $S(=O)_2CF_3$ | Me | Me | O |
| C-2884 | H | CH(Me) | H | c-Pr | $S(=O)_2CF_3$ | Me | Me | O |
| C-2885 | H | $CH_2CH_2$ | Me | c-Pr | $S(=O)_2CF_3$ | Me | Me | O |
| C-2886 | Me | $CH_2CH_2$ | H | c-Pr | $S(=O)_2CF_3$ | Me | Me | O |
| C-2887 | H | single bond | Me | c-Pr | $S(=O)_2CF_3$ | Cl | Et | O |
| C-2888 | Me | single bond | H | c-Pr | $S(=O)_2CF_3$ | Cl | Et | O |
| C-2889 | Me(R) | single bond | H | c-Pr | $S(=O)_2CF_3$ | Cl | Et | O |
| C-2890 | Me(S) | single bond | H | c-Pr | $S(=O)_2CF_3$ | Cl | Et | O |
| C-2891 | H | $CH_2$ | Me | c-Pr | $S(=O)_2CF_3$ | Cl | Et | O |
| C-2892 | Me | $CH_2$ | H | c-Pr | $S(=O)_2CF_3$ | Cl | Et | O |
| C-2893 | H | CH(Me) | H | c-Pr | $S(=O)_2CF_3$ | Cl | Et | O |
| C-2894 | H | $CH_2CH_2$ | Me | c-Pr | $S(=O)_2CF_3$ | Cl | Et | O |
| C-2895 | Me | $CH_2CH_2$ | H | c-Pr | $S(=O)_2CF_3$ | Cl | Et | O |
| C-2896 | H | single bond | Me | c-Pr | $S(=O)_2CF_3$ | Me | Et | O |
| C-2897 | Me | single bond | H | c-Pr | $S(=O)_2CF_3$ | Me | Et | O |
| C-2898 | Me(R) | single bond | H | c-Pr | $S(=O)_2CF_3$ | Me | Et | O |

TABLE 293

| Compound Number | Y | W | Z | $R^1$ | $R^2$ | $R^3$ | $R^{10}$ | A |
|---|---|---|---|---|---|---|---|---|
| C-2899 | Me(S) | single bond | H | c-Pr | $S(=O)_2CF_3$ | Me | Et | O |
| C-2900 | H | $CH_2$ | Me | c-Pr | $S(=O)_2CF_3$ | Me | Et | O |
| C-2901 | Me | $CH_2$ | H | c-Pr | $S(=O)_2CF_3$ | Me | Et | O |
| C-2902 | H | CH(Me) | H | c-Pr | $S(=O)_2CF_3$ | Me | Et | O |
| C-2903 | H | $CH_2CH_2$ | Me | c-Pr | $S(=O)_2CF_3$ | Me | Et | O |
| C-2904 | Me | $CH_2CH_2$ | H | c-Pr | $S(=O)_2CF_3$ | Me | Et | O |
| C-2905 | H | single bond | Me | c-Pr | $S(=O)_2CF_3$ | Cl | $CH_2CF_3$ | O |
| C-2906 | Me | single bond | H | c-Pr | $S(=O)_2CF_3$ | Cl | $CH_2CF_3$ | O |
| C-2907 | Me(R) | single bond | H | c-Pr | $S(=O)_2CF_3$ | Cl | $CH_2CF_3$ | O |
| C-2908 | Me(S) | single bond | H | c-Pr | $S(=O)_2CF_3$ | Cl | $CH_2CF_3$ | O |
| C-2909 | H | $CH_2$ | Me | c-Pr | $S(=O)_2CF_3$ | Cl | $CH_2CF_3$ | O |
| C-2910 | Me | $CH_2$ | H | c-Pr | $S(=O)_2CF_3$ | Cl | $CH_2CF_3$ | O |
| C-2911 | H | CH(Me) | H | c-Pr | $S(=O)_2CF_3$ | Cl | $CH_2CF_3$ | O |
| C-2912 | H | $CH_2CH_2$ | Me | c-Pr | $S(=O)_2CF_3$ | Cl | $CH_2CF_3$ | O |
| C-2913 | Me | $CH_2CH_2$ | H | c-Pr | $S(=O)_2CF_3$ | Cl | $CH_2CF_3$ | O |
| C-2914 | H | single bond | Me | c-Pr | $S(=O)_2CF_3$ | Me | $CH_2CF_3$ | O |
| C-2915 | Me | single bond | H | c-Pr | $S(=O)_2CF_3$ | Me | $CH_2CF_3$ | O |
| C-2916 | Me(R) | single bond | H | c-Pr | $S(=O)_2CF_3$ | Me | $CH_2CF_3$ | O |
| C-2917 | Me(S) | single bond | H | c-Pr | $S(=O)_2CF_3$ | Me | $CH_2CF_3$ | O |
| C-2918 | H | $CH_2$ | Me | c-Pr | $S(=O)_2CF_3$ | Me | $CH_2CF_3$ | O |
| C-2919 | Me | $CH_2$ | H | c-Pr | $S(=O)_2CF_3$ | Me | $CH_2CF_3$ | O |
| C-2920 | H | CH(Me) | H | c-Pr | $S(=O)_2CF_3$ | Me | $CH_2CF_3$ | O |
| C-2921 | H | $CH_2CH_2$ | Me | c-Pr | $S(=O)_2CF_3$ | Me | $CH_2CF_3$ | O |
| C-2922 | Me | $CH_2CH_2$ | H | c-Pr | $S(=O)_2CF_3$ | Me | $CH_2CF_3$ | O |
| C-2923 | H | single bond | Me | c-Pr | $S(=O)_2CF_3$ | Cl | $CH_2OMe$ | O |
| C-2924 | Me | single bond | H | c-Pr | $S(=O)_2CF_3$ | Cl | $CH_2OMe$ | O |
| C-2925 | Me(R) | single bond | H | c-Pr | $S(=O)_2CF_3$ | Cl | $CH_2OMe$ | O |
| C-2926 | Me(S) | single bond | H | c-Pr | $S(=O)_2CF_3$ | Cl | $CH_2OMe$ | O |
| C-2927 | H | $CH_2$ | Me | c-Pr | $S(=O)_2CF_3$ | Cl | $CH_2OMe$ | O |
| C-2928 | Me | $CH_2$ | H | c-Pr | $S(=O)_2CF_3$ | Cl | $CH_2OMe$ | O |
| C-2929 | H | CH(Me) | H | c-Pr | $S(=O)_2CF_3$ | Cl | $CH_2OMe$ | O |
| C-2930 | H | $CH_2CH_2$ | Me | c-Pr | $S(=O)_2CF_3$ | Cl | $CH_2OMe$ | O |
| C-2931 | Me | $CH_2CH_2$ | H | c-Pr | $S(=O)_2CF_3$ | Cl | $CH_2OMe$ | O |
| C-2932 | H | single bond | Me | c-Pr | $S(=O)_2CF_3$ | Me | $CH_2OMe$ | O |
| C-2933 | Me | single bond | H | c-Pr | $S(=O)_2CF_3$ | Me | $CH_2OMe$ | O |
| C-2934 | Me(R) | single bond | H | c-Pr | $S(=O)_2CF_3$ | Me | $CH_2OMe$ | O |
| C-2935 | Me(S) | single bond | H | c-Pr | $S(=O)_2CF_3$ | Me | $CH_2OMe$ | O |
| C-2936 | H | $CH_2$ | Me | c-Pr | $S(=O)_2CF_3$ | Me | $CH_2OMe$ | O |
| C-2937 | Me | $CH_2$ | H | c-Pr | $S(=O)_2CF_3$ | Me | $CH_2OMe$ | O |
| C-2938 | H | CH(Me) | H | c-Pr | $S(=O)_2CF_3$ | Me | $CH_2OMe$ | O |
| C-2939 | H | $CH_2CH_2$ | Me | c-Pr | $S(=O)_2CF_3$ | Me | $CH_2OMe$ | O |
| C-2940 | Me | $CH_2CH_2$ | H | c-Pr | $S(=O)_2CF_3$ | Me | $CH_2OMe$ | O |

TABLE 293-continued

| Compound Number | Y | W | Z | $R^1$ | $R^2$ | $R^3$ | $R^{10}$ | A |
|---|---|---|---|---|---|---|---|---|
| C-2941 | H | single bond | Me | c-Pr | $S(=O)_2CF_3$ | Cl | $CH_2CN$ | O |
| C-2942 | Me | single bond | H | c-Pr | $S(=O)_2CF_3$ | Cl | $CH_2CN$ | O |

TABLE 294

| Compound Number | Y | W | Z | $R^1$ | $R^2$ | $R^3$ | $R^{10}$ | A |
|---|---|---|---|---|---|---|---|---|
| C-2943 | Me(R) | single bond | H | c-Pr | $S(=O)_2CF_3$ | Cl | $CH_2CN$ | O |
| C-2944 | Me(S) | single bond | H | c-Pr | $S(=O)_2CF_3$ | Cl | $CH_2CN$ | O |
| C-2945 | H | $CH_2$ | Me | c-Pr | $S(=O)_2CF_3$ | Cl | $CH_2CN$ | O |
| C-2946 | Me | $CH_2$ | H | c-Pr | $S(=O)_2CF_3$ | Cl | $CH_2CN$ | O |
| C-2947 | H | CH(Me) | H | c-Pr | $S(=O)_2CF_3$ | Cl | $CH_2CN$ | O |
| C-2948 | H | $CH_2CH_2$ | Me | c-Pr | $S(=O)_2CF_3$ | Cl | $CH_2CN$ | O |
| C-2949 | Me | $CH_2CH_2$ | H | c-Pr | $S(=O)_2CF_3$ | Cl | $CH_2CN$ | O |
| C-2950 | H | single bond | Me | c-Pr | $S(=O)_2CF_3$ | Me | $CH_2CN$ | O |
| C-2951 | Me | single bond | H | c-Pr | $S(=O)_2CF_3$ | Me | $CH_2CN$ | O |
| C-2952 | Me(R) | single bond | H | c-Pr | $S(=O)_2CF_3$ | Me | $CH_2CN$ | O |
| C-2953 | Me(S) | single bond | H | c-Pr | $S(=O)_2CF_3$ | Me | $CH_2CN$ | O |
| C-2954 | H | $CH_2$ | Me | c-Pr | $S(=O)_2CF_3$ | Me | $CH_2CN$ | O |
| C-2955 | Me | $CH_2$ | H | c-Pr | $S(=O)_2CF_3$ | Me | $CH_2CN$ | O |
| C-2956 | H | CH(Me) | H | c-Pr | $S(=O)_2CF_3$ | Me | $CH_2CN$ | O |
| C-2957 | H | $CH_2CH_2$ | Me | c-Pr | $S(=O)_2CF_3$ | Me | $CH_2CN$ | O |
| C-2958 | Me | $CH_2CH_2$ | H | c-Pr | $S(=O)_2CF_3$ | Me | $CH_2CN$ | O |
| C-2959 | H | single bond | Me | c-Pr | $S(=O)_2CF_3$ | Cl | C(=O)Me | O |
| C-2960 | Me | single bond | H | c-Pr | $S(=O)_2CF_3$ | Cl | C(=O)Me | O |
| C-2961 | Me(R) | single bond | H | c-Pr | $S(=O)_2CF_3$ | Cl | C(=O)Me | O |
| C-2962 | Me(S) | single bond | H | c-Pr | $S(=O)_2CF_3$ | Cl | C(=O)Me | O |
| C-2963 | H | $CH_2$ | Me | c-Pr | $S(=O)_2CF_3$ | Cl | C(=O)Me | O |
| C-2964 | Me | $CH_2$ | H | c-Pr | $S(=O)_2CF_3$ | Cl | C(=O)Me | O |
| C-2965 | H | CH(Me) | H | c-Pr | $S(=O)_2CF_3$ | Cl | C(=O)Me | O |
| C-2966 | H | $CH_2CH_2$ | Me | c-Pr | $S(=O)_2CF_3$ | Cl | C(=O)Me | O |
| C-2967 | Me | $CH_2CH_2$ | H | c-Pr | $S(=O)_2CF_3$ | Cl | C(=O)Me | O |
| C-2968 | H | single bond | Me | c-Pr | $S(=O)_2CF_3$ | Me | C(=O)Me | O |
| C-2969 | Me | single bond | H | c-Pr | $S(=O)_2CF_3$ | Me | C(=O)Me | O |
| C-2970 | Me(R) | single bond | H | c-Pr | $S(=O)_2CF_3$ | Me | C(=O)Me | O |
| C-2971 | Me(S) | single bond | H | c-Pr | $S(=O)_2CF_3$ | Me | C(=O)Me | O |
| C-2972 | H | $CH_2$ | Me | c-Pr | $S(=O)_2CF_3$ | Me | C(=O)Me | O |
| C-2973 | Me | $CH_2$ | H | c-Pr | $S(=O)_2CF_3$ | Me | C(=O)Me | O |
| C-2974 | H | CH(Me) | H | c-Pr | $S(=O)_2CF_3$ | Me | C(=O)Me | O |
| C-2975 | H | $CH_2CH_2$ | Me | c-Pr | $S(=O)_2CF_3$ | Me | C(=O)Me | O |
| C-2976 | Me | $CH_2CH_2$ | H | c-Pr | $S(=O)_2CF_3$ | Me | C(=O)Me | O |
| C-2977 | H | single bond | Me | c-Pr(1-CN) | H | Cl | H | O |
| C-2978 | Me | single bond | H | c-Pr(1-CN) | H | Cl | H | O |
| C-2979 | Me(R) | single bond | H | c-Pr(1-CN) | H | Cl | H | O |
| C-2980 | Me(S) | single bond | H | c-Pr(1-CN) | H | Cl | H | O |
| C-2981 | Me | single bond | H | c-Pr(1-CN) | H | Cl | H | S |
| C-2982 | Me(R) | single bond | H | c-Pr(1-CN) | H | Cl | H | S |
| C-2983 | Me(S) | single bond | H | c-Pr(1-CN) | H | Cl | H | S |
| C-2984 | H | $CH_2$ | Me | c-Pr(1-CN) | H | Cl | H | O |
| C-2985 | Me | $CH_2$ | H | c-Pr(1-CN) | H | Cl | H | O |
| C-2986 | H | CH(Me) | H | c-Pr(1-CN) | H | Cl | H | O |

TABLE 295

| Compound Number | Y | W | Z | $R^1$ | $R^2$ | $R^3$ | $R^{10}$ | A |
|---|---|---|---|---|---|---|---|---|
| C-2987 | H | $CH_2CH_2$ | Me | c-Pr(1-CN) | H | Cl | H | O |
| C-2988 | Me | $CH_2CH_2$ | H | c-Pr(1-CN) | H | Cl | H | O |
| C-2989 | H | single bond | Me | c-Pr(1-CN) | H | Me | H | O |
| C-2990 | Me | single bond | H | c-Pr(1-CN) | H | Me | H | O |
| C-2991 | Me(R) | single bond | H | c-Pr(1-CN) | H | Me | H | O |
| C-2992 | Me(S) | single bond | H | c-Pr(1-CN) | H | Me | H | O |
| C-2993 | Me | single bond | H | c-Pr(1-CN) | H | Me | H | S |
| C-2994 | Me(R) | single bond | H | c-Pr(1-CN) | H | Me | H | S |
| C-2995 | Me(S) | single bond | H | c-Pr(1-CN) | H | Me | H | S |
| C-2996 | H | $CH_2$ | Me | c-Pr(1-CN) | H | Me | H | O |
| C-2997 | Me | $CH_2$ | H | c-Pr(1-CN) | H | Me | H | O |
| C-2998 | H | CH(Me) | H | c-Pr(1-CN) | H | Me | H | O |

TABLE 295-continued

| Compound Number | Y | W | Z | $R^1$ | $R^2$ | $R^3$ | $R^{10}$ | A |
|---|---|---|---|---|---|---|---|---|
| C-2999 | H | $CH_2CH_2$ | Me | c-Pr(1-CN) | H | Me | H | O |
| C-3000 | Me | $CH_2CH_2$ | H | c-Pr(1-CN) | H | Me | H | O |
| C-3001 | H | single bond | Me | c-Pr(1-CN) | H | Cl | Me | O |
| C-3002 | Me | single bond | H | c-Pr(1-CN) | H | Cl | Me | O |
| C-3003 | Me(R) | single bond | H | c-Pr(1-CN) | H | Cl | Me | O |
| C-3004 | Me(S) | single bond | H | c-Pr(1-CN) | H | Cl | Me | O |
| C-3005 | Me | single bond | H | c-Pr(1-CN) | H | Cl | Me | S |
| C-3006 | Me(R) | single bond | H | c-Pr(1-CN) | H | Cl | Me | S |
| C-3007 | Me(S) | single bond | H | c-Pr(1-CN) | H | Cl | Me | S |
| C-3008 | H | $CH_2$ | Me | c-Pr(1-CN) | H | Cl | Me | O |
| C-3009 | Me | $CH_2$ | H | c-Pr(1-CN) | H | Cl | Me | O |
| C-3010 | H | CH(Me) | H | c-Pr(1-CN) | H | Cl | Me | O |

TABLE 295-continued

| Compound Number | Y | W | Z | $R^1$ | $R^2$ | $R^3$ | $R^{10}$ | A |
|---|---|---|---|---|---|---|---|---|
| C-3011 | H | $CH_2CH_2$ | Me | c-Pr(1-CN) | H | Cl | Me | O |
| C-3012 | Me | $CH_2CH_2$ | H | c-Pr(1-CN) | H | Cl | Me | O |
| C-3013 | H | single bond | Me | c-Pr(1-CN) | H | Me | Me | O |
| C-3014 | Me | single bond | H | c-Pr(1-CN) | H | Me | Me | O |
| C-3015 | Me(R) | single bond | H | c-Pr(1-CN) | H | Me | Me | O |
| C-3016 | Me(S) | single bond | H | c-Pr(1-CN) | H | Me | Me | O |
| C-3017 | Me | single bond | H | c-Pr(1-CN) | H | Me | Me | S |
| C-3018 | Me(R) | single bond | H | c-Pr(1-CN) | H | Me | Me | S |
| C-3019 | Me(S) | single bond | H | c-Pr(1-CN) | H | Me | Me | S |
| C-3020 | H | $CH_2$ | Me | c-Pr(1-CN) | H | Me | Me | O |
| C-3021 | Me | $CH_2$ | H | c-Pr(1-CN) | H | Me | Me | O |

TABLE 295-continued

| Compound Number | Y | W | Z | $R^1$ | $R^2$ | $R^3$ | $R^{10}$ | A |
|---|---|---|---|---|---|---|---|---|
| C-3022 | H | CH(Me) | H | c-Pr(1-CN) | H | Me | Me | O |
| C-3023 | H | $CH_2CH_2$ | Me | c-Pr(1-CN) | H | Me | Me | O |
| C-3024 | Me | $CH_2CH_2$ | H | c-Pr(1-CN) | H | Me | Me | O |
| C-3025 | H | single bond | Me | c-Pr(1-CN) | H | Cl | Et | O |
| C-3026 | Me | single bond | H | c-Pr(1-CN) | H | Cl | Et | O |
| C-3027 | Me(R) | single bond | H | c-Pr(1-CN) | H | Cl | Et | O |
| C-3028 | Me(S) | single bond | H | c-Pr(1-CN) | H | Cl | Et | O |
| C-3029 | Me | single bond | H | c-Pr(1-CN) | H | Cl | Et | S |
| C-3030 | Me(R) | single bond | H | c-Pr(1-CN) | H | Cl | Et | S |

TABLE 296

| Compound Number | Y | W | Z | $R^1$ | $R^2$ | $R^3$ | $R^{10}$ | A |
|---|---|---|---|---|---|---|---|---|
| C-3031 | Me(S) | single bond | H | c-Pr(1-CN) | H | Cl | Et | S |
| C-3032 | H | $CH_2$ | Me | c-Pr(1-CN) | H | Cl | Et | O |
| C-3033 | Me | $CH_2$ | H | c-Pr(1-CN) | H | Cl | Et | O |
| C-3034 | H | CH(Me) | H | c-Pr(1-CN) | H | Cl | Et | O |
| C-3035 | H | $CH_2CH_2$ | Me | c-Pr(1-CN) | H | Cl | Et | O |
| C-3036 | Me | $CH_2CH_2$ | H | c-Pr(1-CN) | H | Cl | Et | O |
| C-3037 | H | single bond | Me | c-Pr(1-CN) | H | Me | Et | O |
| C-3038 | Me | single bond | H | c-Pr(1-CN) | H | Me | Et | O |
| C-3039 | Me(R) | single bond | H | c-Pr(1-CN) | H | Me | Et | O |
| C-3040 | Me(S) | single bond | H | c-Pr(1-CN) | H | Me | Et | O |
| C-3041 | Me | single bond | H | c-Pr(1-CN) | H | Me | Et | S |
| C-3042 | Me(R) | single bond | H | c-Pr(1-CN) | H | Me | Et | S |
| C-3043 | Me(S) | single bond | H | c-Pr(1-CN) | H | Me | Et | S |
| C-3044 | H | $CH_2$ | Me | c-Pr(1-CN) | H | Me | Et | O |
| C-3045 | Me | $CH_2$ | H | c-Pr(1-CN) | H | Me | Et | O |
| C-3046 | H | CH(Me) | H | c-Pr(1-CN) | H | Me | Et | O |
| C-3047 | H | $CH_2CH_2$ | Me | c-Pr(1-CN) | H | Me | Et | O |
| C-3048 | Me | $CH_2CH_2$ | H | c-Pr(1-CN) | H | Me | Et | O |
| C-3049 | H | single bond | Me | c-Pr(1-CN) | H | Cl | $CH_2CF_3$ | O |
| C-3050 | Me | single bond | H | c-Pr(1-CN) | H | Cl | $CH_2CF_3$ | O |
| C-3051 | Me(R) | single bond | H | c-Pr(1-CN) | H | Cl | $CH_2CF_3$ | O |
| C-3052 | Me(S) | single bond | H | c-Pr(1-CN) | H | Cl | $CH_2CF_3$ | O |
| C-3053 | Me | single bond | H | c-Pr(1-CN) | H | Cl | $CH_2CF_3$ | S |
| C-3054 | Me(R) | single bond | H | c-Pr(1-CN) | H | Cl | $CH_2CF_3$ | S |
| C-3055 | Me(S) | single bond | H | c-Pr(1-CN) | H | Cl | $CH_2CF_3$ | S |
| C-3056 | H | $CH_2$ | Me | c-Pr(1-CN) | H | Cl | $CH_2CF_3$ | O |
| C-3057 | Me | $CH_2$ | H | c-Pr(1-CN) | H | Cl | $CH_2CF_3$ | O |
| C-3058 | H | CH(Me) | H | c-Pr(1-CN) | H | Cl | $CH_2CF_3$ | O |
| C-3059 | H | $CH_2CH_2$ | Me | c-Pr(1-CN) | H | Cl | $CH_2CF_3$ | O |
| C-3060 | Me | $CH_2CH_2$ | H | c-Pr(1-CN) | H | Cl | $CH_2CF_3$ | O |
| C-3061 | H | single bond | Me | c-Pr(1-CN) | H | Me | $CH_2CF_3$ | O |
| C-3062 | Me | single bond | H | c-Pr(1-CN) | H | Me | $CH_2CF_3$ | O |
| C-3063 | Me(R) | single bond | H | c-Pr(1-CN) | H | Me | $CH_2CF_3$ | O |
| C-3064 | Me(S) | single bond | H | c-Pr(1-CN) | H | Me | $CH_2CF_3$ | O |
| C-3065 | Me | single bond | H | c-Pr(1-CN) | H | Me | $CH_2CF_3$ | S |
| C-3066 | Me(R) | single bond | H | c-Pr(1-CN) | H | Me | $CH_2CF_3$ | S |
| C-3067 | Me(S) | single bond | H | c-Pr(1-CN) | H | Me | $CH_2CF_3$ | S |
| C-3068 | H | $CH_2$ | Me | c-Pr(1-CN) | H | Me | $CH_2CF_3$ | O |
| C-3069 | Me | $CH_2$ | H | c-Pr(1-CN) | H | Me | $CH_2CF_3$ | O |
| C-3070 | H | CH(Me) | H | c-Pr(1-CN) | H | Me | $CH_2CF_3$ | O |
| C-3071 | H | $CH_2CH_2$ | Me | c-Pr(1-CN) | H | Me | $CH_2CF_3$ | O |
| C-3072 | Me | $CH_2CH_2$ | H | c-Pr(1-CN) | H | Me | $CH_2CF_3$ | O |
| C-3073 | H | single bond | Me | c-Pr(1-CN) | H | Cl | $CH_2OMe$ | O |
| C-3074 | Me | single bond | H | c-Pr(1-CN) | H | Cl | $CH_2OMe$ | O |

TABLE 297

| Compound Number | Y | W | Z | $R^1$ | $R^2$ | $R^3$ | $R^{10}$ | A |
|---|---|---|---|---|---|---|---|---|
| C-3075 | Me(R) | single bond | H | c-Pr(1-CN) | H | Cl | $CH_2OMe$ | O |
| C-3076 | Me(S) | single bond | H | c-Pr(1-CN) | H | Cl | $CH_2OMe$ | O |
| C-3077 | Me | single bond | H | c-Pr(1-CN) | H | Cl | $CH_2OMe$ | S |
| C-3078 | Me(R) | single bond | H | c-Pr(1-CN) | H | Cl | $CH_2OMe$ | S |

TABLE 297-continued

| Compound Number | Y | W | Z | $R^1$ | $R^2$ | $R^3$ | $R^{10}$ | A |
|---|---|---|---|---|---|---|---|---|
| C-3079 | Me(S) | single bond | H | c-Pr(1-CN) | H | Cl | $CH_2OMe$ | S |
| C-3080 | H | $CH_2$ | Me | c-Pr(1-CN) | H | Cl | $CH_2OMe$ | O |
| C-3081 | Me | $CH_2$ | H | c-Pr(1-CN) | H | Cl | $CH_2OMe$ | O |
| C-3082 | H | CH(Me) | H | c-Pr(1-CN) | H | Cl | $CH_2OMe$ | O |
| C-3083 | H | $CH_2CH_2$ | Me | c-Pr(1-CN) | H | Cl | $CH_2OMe$ | O |
| C-3084 | Me | $CH_2CH_2$ | H | c-Pr(1-CN) | H | Cl | $CH_2OMe$ | O |
| C-3085 | H | single bond | Me | c-Pr(1-CN) | H | Me | $CH_2OMe$ | O |
| C-3086 | Me | single bond | H | c-Pr(1-CN) | H | Me | $CH_2OMe$ | O |
| C-3087 | Me(R) | single bond | H | c-Pr(1-CN) | H | Me | $CH_2OMe$ | O |
| C-3088 | Me(S) | single bond | H | c-Pr(1-CN) | H | Me | $CH_2OMe$ | O |
| C-3089 | Me | single bond | H | c-Pr(1-CN) | H | Me | $CH_2OMe$ | S |
| C-3090 | Me(R) | single bond | H | c-Pr(1-CN) | H | Me | $CH_2OMe$ | S |
| C-3091 | Me(S) | single bond | H | c-Pr(1-CN) | H | Me | $CH_2OMe$ | S |
| C-3092 | H | $CH_2$ | Me | c-Pr(1-CN) | H | Me | $CH_2OMe$ | O |
| C-3093 | Me | $CH_2$ | H | c-Pr(1-CN) | H | Me | $CH_2OMe$ | O |
| C-3094 | H | CH(Me) | H | c-Pr(1-CN) | H | Me | $CH_2OMe$ | O |
| C-3095 | H | $CH_2CH_2$ | Me | c-Pr(1-CN) | H | Me | $CH_2OMe$ | O |
| C-3096 | Me | $CH_2CH_2$ | H | c-Pr(1-CN) | H | Me | $CH_2OMe$ | O |
| C-3097 | H | single bond | Me | c-Pr(1-CN) | H | Cl | $CH_2CN$ | O |
| C-3098 | Me | single bond | H | c-Pr(1-CN) | H | Cl | $CH_2CN$ | O |
| C-3099 | Me(R) | single bond | H | c-Pr(1-CN) | H | Cl | $CH_2CN$ | O |
| C-3100 | Me(S) | single bond | H | c-Pr(1-CN) | H | Cl | $CH_2CN$ | O |
| C-3101 | Me | single bond | H | c-Pr(1-CN) | H | Cl | $CH_2CN$ | S |
| C-3102 | Me(R) | single bond | H | c-Pr(1-CN) | H | Cl | $CH_2CN$ | S |
| C-3103 | Me(S) | single bond | H | c-Pr(1-CN) | H | Cl | $CH_2CN$ | S |
| C-3104 | H | $CH_2$ | Me | c-Pr(1-CN) | H | Cl | $CH_2CN$ | O |
| C-3105 | Me | $CH_2$ | H | c-Pr(1-CN) | H | Cl | $CH_2CN$ | O |
| C-3106 | H | CH(Me) | H | c-Pr(1-CN) | H | Cl | $CH_2CN$ | O |
| C-3107 | H | $CH_2CH_2$ | Me | c-Pr(1-CN) | H | Cl | $CH_2CN$ | O |
| C-3108 | Me | $CH_2CH_2$ | H | c-Pr(1-CN) | H | Cl | $CH_2CN$ | O |
| C-3109 | H | single bond | Me | c-Pr(1-CN) | H | Me | $CH_2CN$ | O |
| C-3110 | Me | single bond | H | c-Pr(1-CN) | H | Me | $CH_2CN$ | O |
| C-3111 | Me(R) | single bond | H | c-Pr(1-CN) | H | Me | $CH_2CN$ | O |
| C-3112 | Me(S) | single bond | H | c-Pr(1-CN) | H | Me | $CH_2CN$ | O |
| C-3113 | Me | single bond | H | c-Pr(1-CN) | H | Me | $CH_2CN$ | S |
| C-3114 | Me(R) | single bond | H | c-Pr(1-CN) | H | Me | $CH_2CN$ | S |
| C-3115 | Me(S) | single bond | H | c-Pr(1-CN) | H | Me | $CH_2CN$ | S |
| C-3116 | H | $CH_2$ | Me | c-Pr(1-CN) | H | Me | $CH_2CN$ | O |
| C-3117 | Me | $CH_2$ | H | c-Pr(1-CN) | H | Me | $CH_2CN$ | O |
| C-3118 | H | CH(Me) | H | c-Pr(1-CN) | H | Me | $CH_2CN$ | C |

TABLE 298

| Compound Number | Y | W | Z | $R^1$ | $R^2$ | $R^3$ | $R^{10}$ | A |
|---|---|---|---|---|---|---|---|---|
| C-3119 | H | $CH_2CH_2$ | Me | c-Pr(1-CN) | H | Me | $CH_2CN$ | O |
| C-3120 | Me | $CH_2CH_2$ | H | c-Pr(1-CN) | H | Me | $CH_2CN$ | O |
| C-3121 | H | single bond | Me | c-Pr(1-CN) | H | Cl | C(=O)Me | O |
| C-3122 | Me | single bond | H | c-Pr(1-CN) | H | Cl | C(=O)Me | O |
| C-3123 | Me(R) | single bond | H | c-Pr(1-CN) | H | Cl | C(=O)Me | O |
| C-3124 | Me(S) | single bond | H | c-Pr(1-CN) | H | Cl | C(=O)Me | O |
| C-3125 | Me | single bond | H | c-Pr(1-CN) | H | Cl | C(=O)Me | S |
| C-3126 | Me(R) | single bond | H | c-Pr(1-CN) | H | Cl | C(=O)Me | S |
| C-3127 | Me(S) | single bond | H | c-Pr(1-CN) | H | Cl | C(=O)Me | S |
| C-3128 | H | $CH_2$ | Me | c-Pr(1-CN) | H | Cl | C(=O)Me | O |
| C-3129 | Me | $CH_2$ | H | c-Pr(1-CN) | H | Cl | C(=O)Me | O |
| C-3130 | H | CH(Me) | H | c-Pr(1-CN) | H | Cl | C(=O)Me | O |
| C-3131 | H | $CH_2CH_2$ | Me | c-Pr(1-CN) | H | Cl | C(=O)Me | O |
| C-3132 | Me | $CH_2CH_2$ | H | c-Pr(1-CN) | H | Cl | C(=O)Me | O |
| C-3133 | H | single bond | Me | c-Pr(1-CN) | H | Me | C(=O)Me | O |
| C-3134 | Me | single bond | H | c-Pr(1-CN) | H | Me | C(=O)Me | O |
| C-3135 | Me(R) | single bond | H | c-Pr(1-CN) | H | Me | C(=O)Me | O |
| C-3136 | Me(S) | single bond | H | c-Pr(1-CN) | H | Me | C(=O)Me | O |
| C-3137 | Me | single bond | H | c-Pr(1-CN) | H | Me | C(=O)Me | S |
| C-3138 | Me(R) | single bond | H | c-Pr(1-CN) | H | Me | C(=O)Me | S |
| C-3139 | Me(S) | single bond | H | c-Pr(1-CN) | H | Me | C(=O)Me | S |
| C-3140 | H | $CH_2$ | Me | c-Pr(1-CN) | H | Me | C(=O)Me | O |
| C-3141 | Me | $CH_2$ | H | c-Pr(1-CN) | H | Me | C(=O)Me | O |
| C-3142 | H | CH(Me) | H | c-Pr(1-CN) | H | Me | C(=O)Me | O |
| C-3143 | H | $CH_2CH_2$ | Me | c-Pr(1-CN) | H | Me | C(=O)Me | O |
| C-3144 | Me | $CH_2CH_2$ | H | c-Pr(1-CN) | H | Me | C(=O)Me | O |
| C-3145 | H | single bond | Me | c-Pr(1-CN) | H | Cl | C(=O)OEt | O |

TABLE 298-continued

| Compound Number | Y | W | Z | $R^1$ | $R^2$ | $R^3$ | $R^{10}$ | A |
|---|---|---|---|---|---|---|---|---|
| C-3146 | Me | single bond | H | c-Pr(1-CN) | H | Cl | C(=O)OEt | O |
| C-3147 | Me(R) | single bond | H | c-Pr(1-CN) | H | Cl | C(=O)OEt | O |
| C-3148 | Me(S) | single bond | H | c-Pr(1-CN) | H | Cl | C(=O)OEt | O |
| C-3149 | Me | single bond | H | c-Pr(1-CN) | H | Cl | C(=O)OEt | S |
| C-3150 | Me(R) | single bond | H | c-Pr(1-CN) | H | Cl | C(=O)OEt | S |
| C-3151 | Me(S) | single bond | H | c-Pr(1-CN) | H | Cl | C(=O)OEt | S |
| C-3152 | H | $CH_2$ | Me | c-Pr(1-CN) | H | Cl | C(=O)OEt | O |
| C-3153 | Me | $CH_2$ | H | c-Pr(1-CN) | H | Cl | C(=O)OEt | O |
| C-3154 | H | CH(Me) | H | c-Pr(1-CN) | H | Cl | C(=O)OEt | O |
| C-3155 | H | $CH_2CH_2$ | Me | c-Pr(1-CN) | H | Cl | C(=O)OEt | O |
| C-3156 | Me | $CH_2CH_2$ | H | c-Pr(1-CN) | H | Cl | C(=O)OEt | O |
| C-3157 | H | single bond | Me | c-Pr(1-CN) | H | Me | C(=O)OEt | O |
| C-3158 | Me | single bond | H | c-Pr(1-CN) | H | Me | C(=O)OEt | O |
| C-3159 | Me(R) | single bond | H | c-Pr(1-CN) | H | Me | C(=O)OEt | O |
| C-3160 | Me(S) | single bond | H | c-Pr(1-CN) | H | Me | C(=O)OEt | O |
| C-3161 | Me | single bond | H | c-Pr(1-CN) | H | Me | C(=O)OEt | S |
| C-3162 | Me(R) | single bond | H | c-Pr(1-CN) | H | Me | C(=O)OEt | S |

TABLE 299

| Compound Number | Y | W | Z | $R^1$ | $R^2$ | $R^3$ | $R^{10}$ | A |
|---|---|---|---|---|---|---|---|---|
| C-3163 | Me(S) | single bond | H | c-Pr(1-CN) | H | Me | C(=O)OEt | S |
| C-3164 | H | $CH_2$ | Me | c-Pr(1-CN) | H | Me | C(=O)OEt | O |
| C-3165 | Me | $CH_2$ | H | c-Pr(1-CN) | H | Me | C(=O)OEt | O |
| C-3166 | H | CH(Me) | H | c-Pr(1-CN) | H | Me | C(=O)OEt | O |
| C-3167 | H | $CH_2CH_2$ | Me | c-Pr(1-CN) | H | Me | C(=O)OEt | O |
| C-3168 | Me | $CH_2CH_2$ | H | c-Pr(1-CN) | H | Me | C(=O)OEt | O |
| C-3169 | H | single bond | Me | c-Pr(1-CN) | Me | Cl | Me | O |
| C-3170 | Me | single bond | H | c-Pr(1-CN) | Me | Cl | Me | O |
| C-3171 | Me(R) | single bond | H | c-Pr(1-CN) | Me | Cl | Me | O |
| C-3172 | Me(S) | single bond | H | c-Pr(1-CN) | Me | Cl | Me | O |
| C-3173 | H | $CH_2$ | Me | c-Pr(1-CN) | Me | Cl | Me | O |
| C-3174 | Me | $CH_2$ | H | c-Pr(1-CN) | Me | Cl | Me | O |
| C-3175 | H | CH(Me) | H | c-Pr(1-CN) | Me | Cl | Me | O |
| C-3176 | H | $CH_2CH_2$ | Me | c-Pr(1-CN) | Me | Cl | Me | O |
| C-3177 | Me | $CH_2CH_2$ | H | c-Pr(1-CN) | Me | Cl | Me | O |
| C-3178 | H | single bond | Me | c-Pr(1-CN) | Me | Me | Me | O |
| C-3179 | Me | single bond | H | c-Pr(1-CN) | Me | Me | Me | O |
| C-3180 | Me(R) | single bond | H | c-Pr(1-CN) | Me | Me | Me | O |
| C-3181 | Me(S) | single bond | H | c-Pr(1-CN) | Me | Me | Me | O |
| C-3182 | H | $CH_2$ | Me | c-Pr(1-CN) | Me | Me | Me | O |
| C-3183 | Me | $CH_2$ | H | c-Pr(1-CN) | Me | Me | Me | O |
| C-3184 | H | CH(Me) | H | c-Pr(1-CN) | Me | Me | Me | O |
| C-3185 | H | $CH_2CH_2$ | Me | c-Pr(1-CN) | Me | Me | Me | O |
| C-3186 | Me | $CH_2CH_2$ | H | c-Pr(1-CN) | Me | Me | Me | O |
| C-3187 | H | single bond | Me | c-Pr(1-CN) | Me | Cl | Et | O |
| C-3188 | Me | single bond | H | c-Pr(1-CN) | Me | Cl | Et | O |
| C-3189 | Me(R) | single bond | H | c-Pr(1-CN) | Me | Cl | Et | O |
| C-3190 | Me(S) | single bond | H | c-Pr(1-CN) | Me | Cl | Et | O |
| C-3191 | H | $CH_2$ | Me | c-Pr(1-CN) | Me | Cl | Et | O |
| C-3192 | Me | $CH_2$ | H | c-Pr(1-CN) | Me | Cl | Et | O |
| C-3193 | H | CH(Me) | H | c-Pr(1-CN) | Me | Cl | Et | O |
| C-3194 | H | $CH_2CH_2$ | Me | c-Pr(1-CN) | Me | Cl | Et | O |
| C-3195 | Me | $CH_2CH_2$ | H | c-Pr(1-CN) | Me | Cl | Et | O |
| C-3196 | H | single bond | Me | c-Pr(1-CN) | Me | Me | Et | O |
| C-3197 | Me | single bond | H | c-Pr(1-CN) | Me | Me | Et | O |
| C-3198 | Me(R) | single bond | H | c-Pr(1-CN) | Me | Me | Et | O |
| C-3199 | Me(S) | single bond | H | c-Pr(1-CN) | Me | Me | Et | O |
| C-3200 | H | $CH_2$ | Me | c-Pr(1-CN) | Me | Me | Et | O |
| C-3201 | Me | $CH_2$ | H | c-Pr(1-CN) | Me | Me | Et | O |
| C-3202 | H | CH(Me) | H | c-Pr(1-CN) | Me | Me | Et | O |
| C-3203 | H | $CH_2CH_2$ | Me | c-Pr(1-CN) | Me | Me | Et | O |
| C-3204 | Me | $CH_2CH_2$ | H | c-Pr(1-CN) | Me | Me | Et | O |
| C-3205 | H | single bond | Me | c-Pr(1-CN) | Me | Cl | $CH_2CF_3$ | O |
| C-3206 | Me | single bond | H | c-Pr(1-CN) | Me | Cl | $CH_2CF_3$ | O |

TABLE 300

| Compound Number | Y | W | Z | $R^1$ | $R^2$ | $R^3$ | $R^{10}$ | A |
|---|---|---|---|---|---|---|---|---|
| C-3207 | Me(R) | single bond | H | c-Pr(1-CN) | Me | Cl | $CH_2CF_3$ | O |
| C-3208 | Me(S) | single bond | H | c-Pr(1-CN) | Me | Cl | $CH_2CF_3$ | O |
| C-3209 | H | $CH_2$ | Me | c-Pr(1-CN) | Me | Cl | $CH_2CF_3$ | O |
| C-3210 | Me | $CH_2$ | H | c-Pr(1-CN) | Me | Cl | $CH_2CF_3$ | O |
| C-3211 | H | CH(Me) | H | c-Pr(1-CN) | Me | Cl | $CH_2CF_3$ | O |
| C-3212 | H | $CH_2CH_2$ | Me | c-Pr(1-CN) | Me | Cl | $CH_2CF_3$ | O |
| C-3213 | Me | $CH_2CH_2$ | H | c-Pr(1-CN) | Me | Cl | $CH_2CF_3$ | O |
| C-3214 | H | single bond | Me | c-Pr(1-CN) | Me | Me | $CH_2CF_3$ | O |
| C-3215 | Me | single bond | H | c-Pr(1-CN) | Me | Me | $CH_2CF_3$ | O |
| C-3216 | Me(R) | single bond | H | c-Pr(1-CN) | Me | Me | $CH_2CF_3$ | O |
| C-3217 | Me(S) | single bond | H | c-Pr(1-CN) | Me | Me | $CH_2CF_3$ | O |
| C-3218 | H | $CH_2$ | Me | c-Pr(1-CN) | Me | Me | $CH_2CF_3$ | O |
| C-3219 | Me | $CH_2$ | H | c-Pr(1-CN) | Me | Me | $CH_2CF_3$ | O |
| C-3220 | H | CH(Me) | H | c-Pr(1-CN) | Me | Me | $CH_2CF_3$ | O |
| C-3221 | H | $CH_2CH_2$ | Me | c-Pr(1-CN) | Me | Me | $CH_2CF_3$ | O |
| C-3222 | Me | $CH_2CH_2$ | H | c-Pr(1-CN) | Me | Me | $CH_2CF_3$ | O |
| C-3223 | H | single bond | Me | c-Pr(1-CN) | Me | Cl | $CH_2OMe$ | O |
| C-3224 | Me | single bond | H | c-Pr(1-CN) | Me | Cl | $CH_2OMe$ | O |
| C-3225 | Me(R) | single bond | H | c-Pr(1-CN) | Me | Cl | $CH_2OMe$ | O |
| C-3226 | Me(S) | single bond | H | c-Pr(1-CN) | Me | Cl | $CH_2OMe$ | O |
| C-3227 | H | $CH_2$ | Me | c-Pr(1-CN) | Me | Cl | $CH_2OMe$ | O |
| C-3228 | Me | $CH_2$ | H | c-Pr(1-CN) | Me | Cl | $CH_2OMe$ | O |
| C-3229 | H | CH(Me) | H | c-Pr(1-CN) | Me | Cl | $CH_2OMe$ | O |
| C-3230 | H | $CH_2CH_2$ | Me | c-Pr(1-CN) | Me | Cl | $CH_2OMe$ | O |
| C-3231 | Me | $CH_2CH_2$ | H | c-Pr(1-CN) | Me | Cl | $CH_2OMe$ | O |
| C-3232 | H | single bond | Me | c-Pr(1-CN) | Me | Me | $CH_2OMe$ | O |
| C-3233 | Me | single bond | H | c-Pr(1-CN) | Me | Me | $CH_2OMe$ | O |
| C-3234 | Me(R) | single bond | H | c-Pr(1-CN) | Me | Me | $CH_2OMe$ | O |
| C-3235 | Me(S) | single bond | H | c-Pr(1-CN) | Me | Me | $CH_2OMe$ | O |
| C-3236 | H | $CH_2$ | Me | c-Pr(1-CN) | Me | Me | $CH_2OMe$ | O |
| C-3237 | Me | $CH_2$ | H | c-Pr(1-CN) | Me | Me | $CH_2OMe$ | O |
| C-3238 | H | CH(Me) | H | c-Pr(1-CN) | Me | Me | $CH_2OMe$ | O |
| C-3239 | H | $CH_2CH_2$ | Me | c-Pr(1-CN) | Me | Me | $CH_2OMe$ | O |
| C-3240 | Me | $CH_2CH_2$ | H | c-Pr(1-CN) | Me | Me | $CH_2OMe$ | O |
| C-3241 | H | single bond | Me | c-Pr(1-CN) | Me | Cl | $CH_2CN$ | O |
| C-3242 | Me | single bond | H | c-Pr(1-CN) | Me | Cl | $CH_2CN$ | O |
| C-3243 | Me(R) | single bond | H | c-Pr(1-CN) | Me | Cl | $CH_2CN$ | O |
| C-3244 | Me(S) | single bond | H | c-Pr(1-CN) | Me | Cl | $CH_2CN$ | O |
| C-3245 | H | $CH_2$ | Me | c-Pr(1-CN) | Me | Cl | $CH_2CN$ | O |
| C-3246 | Me | $CH_2$ | H | c-Pr(1-CN) | Me | Cl | $CH_2CN$ | O |
| C-3247 | H | CH(Me) | H | c-Pr(1-CN) | Me | Cl | $CH_2CN$ | O |
| C-3248 | H | $CH_2CH_2$ | Me | c-Pr(1-CN) | Me | Cl | $CH_2CN$ | O |
| C-3249 | Me | $CH_2CH_2$ | H | c-Pr(1-CN) | Me | Cl | $CH_2CN$ | O |
| C-3250 | H | single bond | Me | c-Pr(1-CN) | Me | Me | $CH_2CN$ | O |

TABLE 301

| Compound Number | Y | W | Z | $R^1$ | $R^2$ | $R^3$ | $R^{10}$ | A |
|---|---|---|---|---|---|---|---|---|
| C-3251 | Me | single bond | H | c-Pr(1-CN) | Me | Me | $CH_2CN$ | O |
| C-3252 | Me(R) | single bond | H | c-Pr(1-CN) | Me | Me | $CH_2CN$ | O |
| C-3253 | Me(S) | single bond | H | c-Pr(1-CN) | Me | Me | $CH_2CN$ | O |
| C-3254 | H | $CH_2$ | Me | c-Pr(1-CN) | Me | Me | $CH_2CN$ | O |
| C-3255 | Me | $CH_2$ | H | c-Pr(1-CN) | Me | Me | $CH_2CN$ | O |
| C-3256 | H | CH(Me) | H | c-Pr(1-CN) | Me | Me | $CH_2CN$ | O |
| C-3257 | H | $CH_2CH_2$ | Me | c-Pr(1-CN) | Me | Me | $CH_2CN$ | O |
| C-3258 | Me | $CH_2CH_2$ | H | c-Pr(1-CN) | Me | Me | $CH_2CN$ | O |
| C-3259 | H | single bond | Me | c-Pr(1-CN) | Me | Cl | C(=O)Me | O |
| C-3260 | Me | single bond | H | c-Pr(1-CN) | Me | Cl | C(=O)Me | O |
| C-3261 | Me(R) | single bond | H | c-Pr(1-CN) | Me | Cl | C(=O)Me | O |
| C-3262 | Me(S) | single bond | H | c-Pr(1-CN) | Me | Cl | C(=O)Me | O |
| C-3263 | H | $CH_2$ | Me | c-Pr(1-CN) | Me | Cl | C(=O)Me | O |
| C-3264 | Me | $CH_2$ | H | c-Pr(1-CN) | Me | Cl | C(=O)Me | O |
| C-3265 | H | CH(Me) | H | c-Pr(1-CN) | Me | Cl | C(=O)Me | O |
| C-3266 | H | $CH_2CH_2$ | Me | c-Pr(1-CN) | Me | Cl | C(=O)Me | O |
| C-3267 | Me | $CH_2CH_2$ | H | c-Pr(1-CN) | Me | Cl | C(=O)Me | O |
| C-3268 | H | single bond | Me | c-Pr(1-CN) | Me | Me | C(=O)Me | O |
| C-3269 | Me | single bond | H | c-Pr(1-CN) | Me | Me | C(=O)Me | O |
| C-3270 | Me(R) | single bond | H | c-Pr(1-CN) | Me | Me | C(=O)Me | O |
| C-3271 | Me(S) | single bond | H | c-Pr(1-CN) | Me | Me | C(=O)Me | O |
| C-3272 | H | $CH_2$ | Me | c-Pr(1-CN) | Me | Me | C(=O)Me | O |
| C-3273 | Me | $CH_2$ | H | c-Pr(1-CN) | Me | Me | C(=O)Me | O |

TABLE 301-continued

| Compound Number | Y | W | Z | $R^1$ | $R^2$ | $R^3$ | $R^{10}$ | A |
|---|---|---|---|---|---|---|---|---|
| C-3274 | H | CH(Me) | H | c-Pr(1-CN) | Me | Me | C(=O)Me | O |
| C-3275 | H | $CH_2CH_2$ | Me | c-Pr(1-CN) | Me | Me | C(=O)Me | O |
| C-3276 | Me | $CH_2CH_2$ | H | c-Pr(1-CN) | Me | Me | C(=O)Me | O |
| C-3277 | H | single bond | Me | c-Pr(1-CN) | $CH_2OMe$ | Cl | Me | O |
| C-3278 | Me | single bond | H | c-Pr(1-CN) | $CH_2OMe$ | Cl | Me | O |
| C-3279 | Me(R) | single bond | H | c-Pr(1-CN) | $CH_2OMe$ | Cl | Me | O |
| C-3280 | Me(S) | single bond | H | c-Pr(1-CN) | $CH_2OMe$ | Cl | Me | O |
| C-3281 | H | $CH_2$ | Me | c-Pr(1-CN) | $CH_2OMe$ | Cl | Me | O |
| C-3282 | Me | $CH_2$ | H | c-Pr(1-CN) | $CH_2OMe$ | Cl | Me | O |
| C-3283 | H | CH(Me) | H | c-Pr(1-CN) | $CH_2OMe$ | Cl | Me | O |
| C-3284 | H | $CH_2CH_2$ | Me | c-Pr(1-CN) | $CH_2OMe$ | Cl | Me | O |
| C-3285 | Me | $CH_2CH_2$ | H | c-Pr(1-CN) | $CH_2OMe$ | Cl | Me | O |
| C-3286 | H | single bond | Me | c-Pr(1-CN) | $CH_2OMe$ | Me | Me | O |
| C-3287 | Me | single bond | H | c-Pr(1-CN) | $CH_2OMe$ | Me | Me | O |
| C-3288 | Me(R) | single bond | H | c-Pr(1-CN) | $CH_2OMe$ | Me | Me | O |
| C-3289 | Me(S) | single bond | H | c-Pr(1-CN) | $CH_2OMe$ | Me | Me | O |
| C-3290 | H | $CH_2$ | Me | c-Pr(1-CN) | $CH_2OMe$ | Me | Me | O |
| C-3291 | Me | $CH_2$ | H | c-Pr(1-CN) | $CH_2OMe$ | Me | Me | O |
| C-3292 | H | CH(Me) | H | c-Pr(1-CN) | $CH_2OMe$ | Me | Me | O |
| C-3293 | H | $CH_2CH_2$ | Me | c-Pr(1-CN) | $CH_2OMe$ | Me | Me | O |
| C-3294 | Me | $CH_2CH_2$ | H | c-Pr(1-CN) | $CH_2OMe$ | Me | Me | O |

TABLE 302

| Compound Number | Y | W | Z | $R^1$ | $R^2$ | $R^3$ | $R^{10}$ | A |
|---|---|---|---|---|---|---|---|---|
| C-3295 | H | single bond | Me | c-Pr(1-CN) | $CH_2OMe$ | Cl | Et | O |
| C-3296 | Me | single bond | H | c-Pr(1-CN) | $CH_2OMe$ | Cl | Et | O |
| C-3297 | Me(R) | single bond | H | c-Pr(1-CN) | $CH_2OMe$ | Cl | Et | O |
| C-3298 | Me(S) | single bond | H | c-Pr(1-CN) | $CH_2OMe$ | Cl | Et | O |
| C-3299 | H | $CH_2$ | Me | c-Pr(1-CN) | $CH_2OMe$ | Cl | Et | O |
| C-3300 | Me | $CH_2$ | H | c-Pr(1-CN) | $CH_2OMe$ | Cl | Et | O |
| C-3301 | H | CH(Me) | H | c-Pr(1-CN) | $CH_2OMe$ | Cl | Et | O |
| C-3302 | H | $CH_2CH_2$ | Me | c-Pr(1-CN) | $CH_2OMe$ | Cl | Et | O |
| C-3303 | Me | $CH_2CH_2$ | H | c-Pr(1-CN) | $CH_2OMe$ | Cl | Et | O |
| C-3304 | H | single bond | Me | c-Pr(1-CN) | $CH_2OMe$ | Me | Et | O |
| C-3305 | Me | single bond | H | c-Pr(1-CN) | $CH_2OMe$ | Me | Et | O |
| C-3306 | Me(R) | single bond | H | c-Pr(1-CN) | $CH_2OMe$ | Me | Et | O |
| C-3307 | Me(S) | single bond | H | c-Pr(1-CN) | $CH_2OMe$ | Me | Et | O |
| C-3308 | H | $CH_2$ | Me | c-Pr(1-CN) | $CH_2OMe$ | Me | Et | O |
| C-3309 | Me | $CH_2$ | H | c-Pr(1-CN) | $CH_2OMe$ | Me | Et | O |
| C-3310 | H | CH(Me) | H | c-Pr(1-CN) | $CH_2OMe$ | Me | Et | O |
| C-3311 | H | $CH_2CH_2$ | Me | c-Pr(1-CN) | $CH_2OMe$ | Me | Et | O |
| C-3312 | Me | $CH_2CH_2$ | H | c-Pr(1-CN) | $CH_2OMe$ | Me | Et | O |
| C-3313 | H | single bond | Me | c-Pr(1-CN) | $CH_2OMe$ | Cl | $CH_2CF_3$ | O |
| C-3314 | Me | single bond | H | c-Pr(1-CN) | $CH_2OMe$ | Cl | $CH_2CF_3$ | O |
| C-3315 | Me(R) | single bond | H | c-Pr(1-CN) | $CH_2OMe$ | Cl | $CH_2CF_3$ | O |
| C-3316 | Me(S) | single bond | H | c-Pr(1-CN) | $CH_2OMe$ | Cl | $CH_2CF_3$ | O |
| C-3317 | H | $CH_2$ | Me | c-Pr(1-CN) | $CH_2OMe$ | Cl | $CH_2CF_3$ | O |
| C-3318 | Me | $CH_2$ | H | c-Pr(1-CN) | $CH_2OMe$ | Cl | $CH_2CF_3$ | O |
| C-3319 | H | CH(Me) | H | c-Pr(1-CN) | $CH_2OMe$ | Cl | $CH_2CF_3$ | O |
| C-3320 | H | $CH_2CH_2$ | Me | c-Pr(1-CN) | $CH_2OMe$ | Cl | $CH_2CF_3$ | O |
| C-3321 | Me | $CH_2CH_2$ | H | c-Pr(1-CN) | $CH_2OMe$ | Cl | $CH_2CF_3$ | O |
| C-3322 | H | single bond | Me | c-Pr(1-CN) | $CH_2OMe$ | Me | $CH_2CF_3$ | O |
| C-3323 | Me | single bond | H | c-Pr(1-CN) | $CH_2OMe$ | Me | $CH_2CF_3$ | O |
| C-3324 | Me(R) | single bond | H | c-Pr(1-CN) | $CH_2OMe$ | Me | $CH_2CF_3$ | O |
| C-3325 | Me(S) | single bond | H | c-Pr(1-CN) | $CH_2OMe$ | Me | $CH_2CF_3$ | O |
| C-3326 | H | $CH_2$ | Me | c-Pr(1-CN) | $CH_2OMe$ | Me | $CH_2CF_3$ | O |
| C-3327 | Me | $CH_2$ | H | c-Pr(1-CN) | $CH_2OMe$ | Me | $CH_2CF_3$ | O |
| C-3328 | H | CH(Me) | H | c-Pr(1-CN) | $CH_2OMe$ | Me | $CH_2CF_3$ | O |
| C-3329 | H | $CH_2CH_2$ | Me | c-Pr(1-CN) | $CH_2OMe$ | Me | $CH_2CF_3$ | O |
| C-3330 | Me | $CH_2CH_2$ | H | c-Pr(1-CN) | $CH_2OMe$ | Me | $CH_2CF_3$ | O |
| C-3331 | H | single bond | Me | c-Pr(1-CN) | $CH_2OMe$ | Cl | $CH_2OMe$ | O |
| C-3332 | Me | single bond | H | c-Pr(1-CN) | $CH_2OMe$ | Cl | $CH_2OMe$ | O |
| C-3333 | Me(R) | single bond | H | c-Pr(1-CN) | $CH_2OMe$ | Cl | $CH_2OMe$ | O |
| C-3334 | Me(S) | single bond | H | c-Pr(1-CN) | $CH_2OMe$ | Cl | $CH_2OMe$ | O |
| C-3335 | H | $CH_2$ | Me | c-Pr(1-CN) | $CH_2OMe$ | Cl | $CH_2OMe$ | O |
| C-3336 | Me | $CH_2$ | H | c-Pr(1-CN) | $CH_2OMe$ | Cl | $CH_2OMe$ | O |
| C-3337 | H | CH(Me) | H | c-Pr(1-CN) | $CH_2OMe$ | Cl | $CH_2OMe$ | O |
| C-3338 | H | $CH_2CH_2$ | Me | c-Pr(1-CN) | $CH_2OMe$ | Cl | $CH_2OMe$ | O |

TABLE 303

| Compound Number | Y | W | Z | $R^1$ | $R^2$ | $R^3$ | $R^{10}$ | A |
|---|---|---|---|---|---|---|---|---|
| C-3339 | Me | $CH_2CH_2$ | H | c-Pr(1-CN) | $CH_2OMe$ | Cl | $CH_2OMe$ | O |
| C-3340 | H | single bond | Me | c-Pr(1-CN) | $CH_2OMe$ | Me | $CH_2OMe$ | O |
| C-3341 | Me | single bond | H | c-Pr(1-CN) | $CH_2OMe$ | Me | $CH_2OMe$ | O |
| C-3342 | Me(R) | single bond | H | c-Pr(1-CN) | $CH_2OMe$ | Me | $CH_2OMe$ | O |
| C-3343 | Me(S) | single bond | H | c-Pr(1-CN) | $CH_2OMe$ | Me | $CH_2OMe$ | O |
| C-3344 | H | $CH_2$ | Me | c-Pr(1-CN) | $CH_2OMe$ | Me | $CH_2OMe$ | O |
| C-3345 | Me | $CH_2$ | H | c-Pr(1-CN) | $CH_2OMe$ | Me | $CH_2OMe$ | O |
| C-3346 | H | CH(Me) | H | c-Pr(1-CN) | $CH_2OMe$ | Me | $CH_2OMe$ | O |
| C-3347 | H | $CH_2CH_2$ | Me | c-Pr(1-CN) | $CH_2OMe$ | Me | $CH_2OMe$ | O |
| C-3348 | Me | $CH_2CH_2$ | H | c-Pr(1-CN) | $CH_2OMe$ | Me | $CH_2OMe$ | O |
| C-3349 | H | single bond | Me | c-Pr(1-CN) | $CH_2OMe$ | Cl | $CH_2CN$ | O |
| C-3350 | Me | single bond | H | c-Pr(1-CN) | $CH_2OMe$ | Cl | $CH_2CN$ | O |
| C-3351 | Me(R) | single bond | H | c-Pr(1-CN) | $CH_2OMe$ | Cl | $CH_2CN$ | O |
| C-3352 | Me(S) | single bond | H | c-Pr(1-CN) | $CH_2OMe$ | Cl | $CH_2CN$ | O |
| C-3353 | H | $CH_2$ | Me | c-Pr(1-CN) | $CH_2OMe$ | Cl | $CH_2CN$ | O |
| C-3354 | Me | $CH_2$ | H | c-Pr(1-CN) | $CH_2OMe$ | Cl | $CH_2CN$ | O |
| C-3355 | H | CH(Me) | H | c-Pr(1-CN) | $CH_2OMe$ | Cl | $CH_2CN$ | O |
| C-3356 | H | $CH_2CH_2$ | Me | c-Pr(1-CN) | $CH_2OMe$ | Cl | $CH_2CN$ | O |
| C-3357 | Me | $CH_2CH_2$ | H | c-Pr(1-CN) | $CH_2OMe$ | Cl | $CH_2CN$ | O |
| C-3358 | H | single bond | Me | c-Pr(1-CN) | $CH_2OMe$ | Me | $CH_2CN$ | O |
| C-3359 | Me | single bond | H | c-Pr(1-CN) | $CH_2OMe$ | Me | $CH_2CN$ | O |
| C-3360 | Me(R) | single bond | H | c-Pr(1-CN) | $CH_2OMe$ | Me | $CH_2CN$ | O |
| C-3361 | Me(S) | single bond | H | c-Pr(1-CN) | $CH_2OMe$ | Me | $CH_2CN$ | O |
| C-3362 | H | $CH_2$ | Me | c-Pr(1-CN) | $CH_2OMe$ | Me | $CH_2CN$ | O |
| C-3363 | Me | $CH_2$ | H | c-Pr(1-CN) | $CH_2OMe$ | Me | $CH_2CN$ | O |
| C-3364 | H | CH(Me) | H | c-Pr(1-CN) | $CH_2OMe$ | Me | $CH_2CN$ | O |
| C-3365 | H | $CH_2CH_2$ | Me | c-Pr(1-CN) | $CH_2OMe$ | Me | $CH_2CN$ | O |
| C-3366 | Me | $CH_2CH_2$ | H | c-Pr(1-CN) | $CH_2OMe$ | Me | $CH_2CN$ | O |
| C-3367 | H | single bond | Me | c-Pr(1-CN) | $CH_2OMe$ | Cl | C(═O)Me | O |
| C-3368 | Me | single bond | H | c-Pr(1-CN) | $CH_2OMe$ | Cl | C(═O)Me | O |
| C-3369 | Me(R) | single bond | H | c-Pr(1-CN) | $CH_2OMe$ | Cl | C(═O)Me | O |
| C-3370 | Me(S) | single bond | H | c-Pr(1-CN) | $CH_2OMe$ | Cl | C(═O)Me | O |
| C-3371 | H | $CH_2$ | Me | c-Pr(1-CN) | $CH_2OMe$ | Cl | C(═O)Me | O |
| C-3372 | Me | $CH_2$ | H | c-Pr(1-CN) | $CH_2OMe$ | Cl | C(═O)Me | O |
| C-3373 | H | CH(Me) | H | c-Pr(1-CN) | $CH_2OMe$ | Cl | C(═O)Me | O |
| C-3374 | H | $CH_2CH_2$ | Me | c-Pr(1-CN) | $CH_2OMe$ | Cl | C(═O)Me | O |
| C-3375 | Me | $CH_2CH_2$ | H | c-Pr(1-CN) | $CH_2OMe$ | Cl | C(═O)Me | O |
| C-3376 | H | single bond | Me | c-Pr(1-CN) | $CH_2OMe$ | Me | C(═O)Me | O |
| C-3377 | Me | single bond | H | c-Pr(1-CN) | $CH_2OMe$ | Me | C(═O)Me | O |
| C-3378 | Me(R) | single bond | H | c-Pr(1-CN) | $CH_2OMe$ | Me | C(═O)Me | O |
| C-3379 | Me(S) | single bond | H | c-Pr(1-CN) | $CH_2OMe$ | Me | C(═O)Me | O |
| C-3380 | H | $CH_2$ | Me | c-Pr(1-CN) | $CH_2OMe$ | Me | C(═O)Me | O |
| C-3381 | Me | $CH_2$ | H | c-Pr(1-CN) | $CH_2OMe$ | Me | C(═O)Me | O |
| C-3382 | H | CH(Me) | H | c-Pr(1-CN) | $CH_2OMe$ | Me | C(═O)Me | O |

TABLE 304

| Compound Number | Y | W | Z | $R^1$ | $R^2$ | $R^3$ | $R^{10}$ | A |
|---|---|---|---|---|---|---|---|---|
| C-3383 | H | $CH_2CH_2$ | Me | c-Pr(1-CN) | $CH_2OMe$ | Me | C(═O)Me | O |
| C-3384 | Me | $CH_2CH_2$ | H | c-Pr(1-CN) | $CH_2OMe$ | Me | C(═O)Me | O |
| C-3385 | H | single bond | Me | c-Pr(1-CN) | $CH_2CN$ | Cl | Me | O |
| C-3386 | Me | single bond | H | c-Pr(1-CN) | $CH_2CN$ | Cl | Me | O |
| C-3387 | Me(R) | single bond | H | c-Pr(1-CN) | $CH_2CN$ | Cl | Me | O |
| C-3388 | Me(S) | single bond | H | c-Pr(1-CN) | $CH_2CN$ | Cl | Me | O |
| C-3389 | H | $CH_2$ | Me | c-Pr(1-CN) | $CH_2CN$ | Cl | Me | O |
| C-3390 | Me | $CH_2$ | H | c-Pr(1-CN) | $CH_2CN$ | Cl | Me | O |
| C-3391 | H | CH(Me) | H | c-Pr(1-CN) | $CH_2CN$ | Cl | Me | O |
| C-3392 | H | $CH_2CH_2$ | Me | c-Pr(1-CN) | $CH_2CN$ | Cl | Me | O |
| C-3393 | Me | $CH_2CH_2$ | H | c-Pr(1-CN) | $CH_2CN$ | Cl | Me | O |
| C-3394 | H | single bond | Me | c-Pr(1-CN) | $CH_2CN$ | Me | Me | O |
| C-3395 | Me | single bond | H | c-Pr(1-CN) | $CH_2CN$ | Me | Me | O |
| C-3396 | Me(R) | single bond | H | c-Pr(1-CN) | $CH_2CN$ | Me | Me | O |
| C-3397 | Me(S) | single bond | H | c-Pr(1-CN) | $CH_2CN$ | Me | Me | O |
| C-3398 | H | $CH_2$ | Me | c-Pr(1-CN) | $CH_2CN$ | Me | Me | O |
| C-3399 | Me | $CH_2$ | H | c-Pr(1-CN) | $CH_2CN$ | Me | Me | O |
| C-3400 | H | CH(Me) | H | c-Pr(1-CN) | $CH_2CN$ | Me | Me | O |
| C-3401 | H | $CH_2CH_2$ | Me | c-Pr(1-CN) | $CH_2CN$ | Me | Me | O |
| C-3402 | Me | $CH_2CH_2$ | H | c-Pr(1-CN) | $CH_2CN$ | Me | Me | O |
| C-3403 | H | single bond | Me | c-Pr(1-CN) | $CH_2CN$ | Cl | Et | O |

TABLE 304-continued

| Compound Number | Y | W | Z | $R^1$ | $R^2$ | $R^3$ | $R^{10}$ | A |
|---|---|---|---|---|---|---|---|---|
| C-3404 | Me | single bond | H | c-Pr(1-CN) | $CH_2CN$ | Cl | Et | O |
| C-3405 | Me(R) | single bond | H | c-Pr(1-CN) | $CH_2CN$ | Cl | Et | O |
| C-3406 | Me(S) | single bond | H | c-Pr(1-CN) | $CH_2CN$ | Cl | Et | O |
| C-3407 | H | $CH_2$ | Me | c-Pr(1-CN) | $CH_2CN$ | Cl | Et | O |
| C-3408 | Me | $CH_2$ | H | c-Pr(1-CN) | $CH_2CN$ | Cl | Et | O |
| C-3409 | H | CH(Me) | H | c-Pr(1-CN) | $CH_2CN$ | Cl | Et | O |
| C-3410 | H | $CH_2CH_2$ | Me | c-Pr(1-CN) | $CH_2CN$ | Cl | Et | O |
| C-3411 | Me | $CH_2CH_2$ | H | c-Pr(1-CN) | $CH_2CN$ | Cl | Et | O |
| C-3412 | H | single bond | Me | c-Pr(1-CN) | $CH_2CN$ | Me | Et | O |
| C-3413 | Me | single bond | H | c-Pr(1-CN) | $CH_2CN$ | Me | Et | O |
| C-3414 | Me(R) | single bond | H | c-Pr(1-CN) | $CH_2CN$ | Me | Et | O |
| C-3415 | Me(S) | single bond | H | c-Pr(1-CN) | $CH_2CN$ | Me | Et | O |
| C-3416 | H | $CH_2$ | Me | c-Pr(1-CN) | $CH_2CN$ | Me | Et | O |
| C-3417 | Me | $CH_2$ | H | c-Pr(1-CN) | $CH_2CN$ | Me | Et | O |
| C-3418 | H | CH(Me) | H | c-Pr(1-CN) | $CH_2CN$ | Me | Et | O |
| C-3419 | H | $CH_2CH_2$ | Me | c-Pr(1-CN) | $CH_2CN$ | Me | Et | O |
| C-3420 | Me | $CH_2CH_2$ | H | c-Pr(1-CN) | $CH_2CN$ | Me | Et | O |
| C-3421 | H | single bond | Me | c-Pr(1-CN) | $CH_2CN$ | Cl | $CH_2CF_3$ | O |
| C-3422 | Me | single bond | H | c-Pr(1-CN) | $CH_2CN$ | Cl | $CH_2CF_3$ | O |
| C-3423 | Me(R) | single bond | H | c-Pr(1-CN) | $CH_2CN$ | Cl | $CH_2CF_3$ | O |
| C-3424 | Me(S) | single bond | H | c-Pr(1-CN) | $CH_2CN$ | Cl | $CH_2CF_3$ | O |
| C-3425 | H | $CH_2$ | Me | c-Pr(1-CN) | $CH_2CN$ | Cl | $CH_2CF_3$ | O |
| C-3426 | Me | $CH_2$ | H | c-Pr(1-CN) | $CH_2CN$ | Cl | $CH_2CF_3$ | O |

TABLE 305

| Compound Number | Y | W | Z | $R^1$ | $R^2$ | $R^3$ | $R^{10}$ | A |
|---|---|---|---|---|---|---|---|---|
| C-3427 | H | CH(Me) | H | c-Pr(1-CN) | $CH_2CN$ | Cl | $CH_2CF_3$ | O |
| C-3428 | H | $CH_2CH_2$ | Me | c-Pr(1-CN) | $CH_2CN$ | Cl | $CH_2CF_3$ | O |
| C-3429 | Me | $CH_2CH_2$ | H | c-Pr(1-CN) | $CH_2CN$ | Cl | $CH_2CF_3$ | O |
| C-3430 | H | single bond | Me | c-Pr(1-CN) | $CH_2CN$ | Me | $CH_2CF_3$ | O |
| C-3431 | Me | single bond | H | c-Pr(1-CN) | $CH_2CN$ | Me | $CH_2CF_3$ | O |
| C-3432 | Me(R) | single bond | H | c-Pr(1-CN) | $CH_2CN$ | Me | $CH_2CF_3$ | O |
| C-3433 | Me(S) | single bond | H | c-Pr(1-CN) | $CH_2CN$ | Me | $CH_2CF_3$ | O |
| C-3434 | H | $CH_2$ | Me | c-Pr(1-CN) | $CH_2CN$ | Me | $CH_2CF_3$ | O |
| C-3435 | Me | $CH_2$ | H | c-Pr(1-CN) | $CH_2CN$ | Me | $CH_2CF_3$ | O |
| C-3436 | H | CH(Me) | H | c-Pr(1-CN) | $CH_2CN$ | Me | $CH_2CF_3$ | O |
| C-3437 | H | $CH_2CH_2$ | Me | c-Pr(1-CN) | $CH_2CN$ | Me | $CH_2CF_3$ | O |
| C-3438 | Me | $CH_2CH_2$ | H | c-Pr(1-CN) | $CH_2CN$ | Me | $CH_2CF_3$ | O |
| C-3439 | H | single bond | Me | c-Pr(1-CN) | $CH_2CN$ | Cl | $CH_2OMe$ | O |
| C-3440 | Me | single bond | H | c-Pr(1-CN) | $CH_2CN$ | Cl | $CH_2OMe$ | O |
| C-3441 | Me(R) | single bond | H | c-Pr(1-CN) | $CH_2CN$ | Cl | $CH_2OMe$ | O |
| C-3442 | Me(S) | single bond | H | c-Pr(1-CN) | $CH_2CN$ | Cl | $CH_2OMe$ | O |
| C-3443 | H | $CH_2$ | Me | c-Pr(1-CN) | $CH_2CN$ | Cl | $CH_2OMe$ | O |
| C-3444 | Me | $CH_2$ | H | c-Pr(1-CN) | $CH_2CN$ | Cl | $CH_2OMe$ | O |
| C-3445 | H | CH(Me) | H | c-Pr(1-CN) | $CH_2CN$ | Cl | $CH_2OMe$ | O |
| C-3446 | H | $CH_2CH_2$ | Me | c-Pr(1-CN) | $CH_2CN$ | Cl | $CH_2OMe$ | O |
| C-3447 | Me | $CH_2CH_2$ | H | c-Pr(1-CN) | $CH_2CN$ | Cl | $CH_2OMe$ | O |
| C-3448 | H | single bond | Me | c-Pr(1-CN) | $CH_2CN$ | Me | $CH_2OMe$ | O |
| C-3449 | Me | single bond | H | c-Pr(1-CN) | $CH_2CN$ | Me | $CH_2OMe$ | O |
| C-3450 | Me(R) | single bond | H | c-Pr(1-CN) | $CH_2CN$ | Me | $CH_2OMe$ | O |
| C-3451 | Me(S) | single bond | H | c-Pr(1-CN) | $CH_2CN$ | Me | $CH_2OMe$ | O |
| C-3452 | H | $CH_2$ | Me | c-Pr(1-CN) | $CH_2CN$ | Me | $CH_2OMe$ | O |
| C-3453 | Me | $CH_2$ | H | c-Pr(1-CN) | $CH_2CN$ | Me | $CH_2OMe$ | O |
| C-3454 | H | CH(Me) | H | c-Pr(1-CN) | $CH_2CN$ | Me | $CH_2OMe$ | O |
| C-3455 | H | $CH_2CH_2$ | Me | c-Pr(1-CN) | $CH_2CN$ | Me | $CH_2OMe$ | O |
| C-3456 | Me | $CH_2CH_2$ | H | c-Pr(1-CN) | $CH_2CN$ | Me | $CH_2OMe$ | O |
| C-3457 | H | single bond | Me | c-Pr(1-CN) | $CH_2CN$ | Cl | $CH_2CN$ | O |
| C-3458 | Me | single bond | H | c-Pr(1-CN) | $CH_2CN$ | Cl | $CH_2CN$ | O |
| C-3459 | Me(R) | single bond | H | c-Pr(1-CN) | $CH_2CN$ | Cl | $CH_2CN$ | O |
| C-3460 | Me(S) | single bond | H | c-Pr(1-CN) | $CH_2CN$ | Cl | $CH_2CN$ | O |
| C-3461 | H | $CH_2$ | Me | c-Pr(1-CN) | $CH_2CN$ | Cl | $CH_2CN$ | O |
| C-3462 | Me | $CH_2$ | H | c-Pr(1-CN) | $CH_2CN$ | Cl | $CH_2CN$ | O |
| C-3463 | H | CH(Me) | H | c-Pr(1-CN) | $CH_2CN$ | Cl | $CH_2CN$ | O |
| C-3464 | H | $CH_2CH_2$ | Me | c-Pr(1-CN) | $CH_2CN$ | Cl | $CH_2CN$ | O |
| C-3465 | Me | $CH_2CH_2$ | H | c-Pr(1-CN) | $CH_2CN$ | Cl | $CH_2CN$ | O |
| C-3466 | H | single bond | Me | c-Pr(1-CN) | $CH_2CN$ | Me | $CH_2CN$ | O |

TABLE 305-continued

| Compound Number | Y | W | Z | $R^1$ | $R^2$ | $R^3$ | $R^{10}$ | A |
|---|---|---|---|---|---|---|---|---|
| C-3467 | Me | single bond | H | c-Pr(1-CN) | $CH_2CN$ | Me | $CH_2CN$ | O |
| C-3468 | Me(R) | single bond | H | c-Pr(1-CN) | $CH_2CN$ | Me | $CH_2CN$ | O |
| C-3469 | Me(S) | single bond | H | c-Pr(1-CN) | $CH_2CN$ | Me | $CH_2CN$ | O |
| C-3470 | H | $CH_2$ | Me | c-Pr(1-CN) | $CH_2CN$ | Me | $CH_2CN$ | O |

TABLE 306

| Compound Number | Y | W | Z | $R^1$ | $R^2$ | $R^3$ | $R^{10}$ | A |
|---|---|---|---|---|---|---|---|---|
| C-3471 | Me | $CH_2$ | H | c-Pr(1-CN) | $CH_2CN$ | Me | $CH_2CN$ | O |
| C-3472 | H | CH(Me) | H | c-Pr(1-CN) | $CH_2CN$ | Me | $CH_2CN$ | O |
| C-3473 | H | $CH_2CH_2$ | Me | c-Pr(1-CN) | $CH_2CN$ | Me | $CH_2CN$ | O |
| C-3474 | Me | $CH_2CH_2$ | H | c-Pr(1-CN) | $CH_2CN$ | Me | $CH_2CN$ | O |
| C-3475 | H | single bond | Me | c-Pr(1-CN) | $CH_2CN$ | Cl | C(=O)Me | O |
| C-3476 | Me | single bond | H | c-Pr(1-CN) | $CH_2CN$ | Cl | C(=O)Me | O |
| C-3477 | Me(R) | single bond | H | c-Pr(1-CN) | $CH_2CN$ | Cl | C(=O)Me | O |
| C-3478 | Me(S) | single bond | H | c-Pr(1-CN) | $CH_2CN$ | Cl | C(=O)Me | O |
| C-3479 | H | $CH_2$ | Me | c-Pr(1-CN) | $CH_2CN$ | Cl | C(=O)Me | O |
| C-3480 | Me | $CH_2$ | H | c-Pr(1-CN) | $CH_2CN$ | Cl | C(=O)Me | O |
| C-3481 | H | CH(Me) | H | c-Pr(1-CN) | $CH_2CN$ | Cl | C(=O)Me | O |
| C-3482 | H | $CH_2CH_2$ | Me | c-Pr(1-CN) | $CH_2CN$ | Cl | C(=O)Me | O |
| C-3483 | Me | $CH_2CH_2$ | H | c-Pr(1-CN) | $CH_2CN$ | Cl | C(=O)Me | O |
| C-3484 | H | single bond | Me | c-Pr(1-CN) | $CH_2CN$ | Me | C(=O)Me | O |
| C-3485 | Me | single bond | H | c-Pr(1-CN) | $CH_2CN$ | Me | C(=O)Me | O |
| C-3486 | Me(R) | single bond | H | c-Pr(1-CN) | $CH_2CN$ | Me | C(=O)Me | O |
| C-3487 | Me(S) | single bond | H | c-Pr(1-CN) | $CH_2CN$ | Me | C(=O)Me | O |
| C-3488 | H | $CH_2$ | Me | c-Pr(1-CN) | $CH_2CN$ | Me | C(=O)Me | O |
| C-3489 | Me | $CH_2$ | H | c-Pr(1-CN) | $CH_2CN$ | Me | C(=O)Me | O |
| C-3490 | H | CH(Me) | H | c-Pr(1-CN) | $CH_2CN$ | Me | C(=O)Me | O |
| C-3491 | H | $CH_2CH_2$ | Me | c-Pr(1-CN) | $CH_2CN$ | Me | C(=O)Me | O |
| C-3492 | Me | $CH_2CH_2$ | H | c-Pr(1-CN) | $CH_2CN$ | Me | C(=O)Me | O |
| C-3493 | H | single bond | Me | c-Pr(1-CN) | C(=O)Me | Cl | Me | O |
| C-3494 | Me | single bond | H | c-Pr(1-CN) | C(=O)Me | Cl | Me | O |
| C-3495 | Me(R) | single bond | H | c-Pr(1-CN) | C(=O)Me | Cl | Me | O |
| C-3496 | Me(S) | single bond | H | c-Pr(1-CN) | C(=O)Me | Cl | Me | O |
| C-3497 | H | $CH_2$ | Me | c-Pr(1-CN) | C(=O)Me | Cl | Me | O |
| C-3498 | Me | $CH_2$ | H | c-Pr(1-CN) | C(=O)Me | Cl | Me | O |
| C-3499 | H | CH(Me) | H | c-Pr(1-CN) | C(=O)Me | Cl | Me | O |
| C-3500 | H | $CH_2CH_2$ | Me | c-Pr(1-CN) | C(=O)Me | Cl | Me | O |
| C-3501 | Me | $CH_2CH_2$ | H | c-Pr(1-CN) | C(=O)Me | Cl | Me | O |
| C-3502 | H | single bond | Me | c-Pr(1-CN) | C(=O)Me | Me | Me | O |
| C-3503 | Me | single bond | H | c-Pr(1-CN) | C(=O)Me | Me | Me | O |
| C-3504 | Me(R) | single bond | H | c-Pr(1-CN) | C(=O)Me | Me | Me | O |
| C-3505 | Me(S) | single bond | H | c-Pr(1-CN) | C(=O)Me | Me | Me | O |
| C-3506 | H | $CH_2$ | Me | c-Pr(1-CN) | C(=O)Me | Me | Me | O |
| C-3507 | Me | $CH_2$ | H | c-Pr(1-CN) | C(=O)Me | Me | Me | O |
| C-3508 | H | CH(Me) | H | c-Pr(1-CN) | C(=O)Me | Me | Me | O |
| C-3509 | H | $CH_2CH_2$ | Me | c-Pr(1-CN) | C(=O)Me | Me | Me | O |
| C-3510 | Me | $CH_2CH_2$ | H | c-Pr(1-CN) | C(=O)Me | Me | Me | O |
| C-3511 | H | single bond | Me | c-Pr(1-CN) | C(=O)Me | Cl | Et | O |
| C-3512 | Me | single bond | H | c-Pr(1-CN) | C(=O)Me | Cl | Et | O |
| C-3513 | Me(R) | single bond | H | c-Pr(1-CN) | C(=O)Me | Cl | Et | O |
| C-3514 | Me(S) | single bond | H | c-Pr(1-CN) | C(=O)Me | Cl | Et | O |

TABLE 307

| Compound Number | Y | W | Z | $R^1$ | $R^2$ | $R^3$ | $R^{10}$ | A |
|---|---|---|---|---|---|---|---|---|
| C-3515 | H | $CH_2$ | Me | c-Pr(1-CN) | C(=O)Me | Cl | Et | O |
| C-3516 | Me | $CH_2$ | H | c-Pr(1-CN) | C(=O)Me | Cl | Et | O |
| C-3517 | H | CH(Me) | H | c-Pr(1-CN) | C(=O)Me | Cl | Et | O |
| C-3518 | H | $CH_2CH_2$ | Me | c-Pr(1-CN) | C(=O)Me | Cl | Et | O |
| C-3519 | Me | $CH_2CH_2$ | H | c-Pr(1-CN) | C(=O)Me | Cl | Et | O |
| C-3520 | H | single bond | Me | c-Pr(1-CN) | C(=O)Me | Me | Et | O |
| C-3521 | Me | single bond | H | c-Pr(1-CN) | C(=O)Me | Me | Et | O |
| C-3522 | Me(R) | single bond | H | c-Pr(1-CN) | C(=O)Me | Me | Et | O |

TABLE 307-continued

| Compound Number | Y | W | Z | $R^1$ | $R^2$ | $R^3$ | $R^{10}$ | A |
|---|---|---|---|---|---|---|---|---|
| C-3523 | Me(S) | single bond | H | c-Pr(1-CN) | C(=O)Me | Me | Et | O |
| C-3524 | H | $CH_2$ | Me | c-Pr(1-CN) | C(=O)Me | Me | Et | O |
| C-3525 | Me | $CH_2$ | H | c-Pr(1-CN) | C(=O)Me | Me | Et | O |
| C-3526 | H | CH(Me) | H | c-Pr(1-CN) | C(=O)Me | Me | Et | O |
| C-3527 | H | $CH_2CH_2$ | Me | c-Pr(1-CN) | C(=O)Me | Me | Et | O |
| C-3528 | Me | $CH_2CH_2$ | H | c-Pr(1-CN) | C(=O)Me | Me | Et | O |
| C-3529 | H | single bond | Me | c-Pr(1-CN) | C(=O)Me | Cl | $CH_2CF_3$ | O |
| C-3530 | Me | single bond | H | c-Pr(1-CN) | C(=O)Me | Cl | $CH_2CF_3$ | O |
| C-3531 | Me(R) | single bond | H | c-Pr(1-CN) | C(=O)Me | Cl | $CH_2CF_3$ | O |
| C-3532 | Me(S) | single bond | H | c-Pr(1-CN) | C(=O)Me | Cl | $CH_2CF_3$ | O |
| C-3533 | H | $CH_2$ | Me | c-Pr(1-CN) | C(=O)Me | Cl | $CH_2CF_3$ | O |
| C-3534 | Me | $CH_2$ | H | c-Pr(1-CN) | C(=O)Me | Cl | $CH_2CF_3$ | O |
| C-3535 | H | CH(Me) | H | c-Pr(1-CN) | C(=O)Me | Cl | $CH_2CF_3$ | O |
| C-3536 | H | $CH_2CH_2$ | Me | c-Pr(1-CN) | C(=O)Me | Cl | $CH_2CF_3$ | O |
| C-3537 | Me | $CH_2CH_2$ | H | c-Pr(1-CN) | C(=O)Me | Cl | $CH_2CF_3$ | O |
| C-3538 | H | single bond | Me | c-Pr(1-CN) | C(=O)Me | Me | $CH_2CF_3$ | O |
| C-3539 | Me | single bond | H | c-Pr(1-CN) | C(=O)Me | Me | $CH_2CF_3$ | O |
| C-3540 | Me(R) | single bond | H | c-Pr(1-CN) | C(=O)Me | Me | $CH_2CF_3$ | O |
| C-3541 | Me(S) | single bond | H | c-Pr(1-CN) | C(=O)Me | Me | $CH_2CF_3$ | O |
| C-3542 | H | $CH_2$ | Me | c-Pr(1-CN) | C(=O)Me | Me | $CH_2CF_3$ | O |
| C-3543 | Me | $CH_2$ | H | c-Pr(1-CN) | C(=O)Me | Me | $CH_2CF_3$ | O |
| C-3544 | H | CH(Me) | H | c-Pr(1-CN) | C(=O)Me | Me | $CH_2CF_3$ | O |
| C-3545 | H | $CH_2CH_2$ | Me | c-Pr(1-CN) | C(=O)Me | Me | $CH_2CF_3$ | O |
| C-3546 | Me | $CH_2CH_2$ | H | c-Pr(1-CN) | C(=O)Me | Me | $CH_2CF_3$ | O |
| C-3547 | H | single bond | Me | c-Pr(1-CN) | C(=O)Me | Cl | $CH_2OMe$ | O |
| C-3548 | Me | single bond | H | c-Pr(1-CN) | C(=O)Me | Cl | $CH_2OMe$ | O |
| C-3549 | Me(R) | single bond | H | c-Pr(1-CN) | C(=O)Me | Cl | $CH_2OMe$ | O |
| C-3550 | Me(S) | single bond | H | c-Pr(1-CN) | C(=O)Me | Cl | $CH_2OMe$ | O |
| C-3551 | H | $CH_2$ | Me | c-Pr(1-CN) | C(=O)Me | Cl | $CH_2OMe$ | O |
| C-3552 | Me | $CH_2$ | H | c-Pr(1-CN) | C(=O)Me | Cl | $CH_2OMe$ | O |
| C-3553 | H | CH(Me) | H | c-Pr(1-CN) | C(=O)Me | Cl | $CH_2OMe$ | O |
| C-3554 | H | $CH_2CH_2$ | Me | c-Pr(1-CN) | C(=O)Me | Cl | $CH_2OMe$ | O |
| C-3555 | Me | $CH_2CH_2$ | H | c-Pr(1-CN) | C(=O)Me | Cl | $CH_2OMe$ | O |
| C-3556 | H | single bond | Me | c-Pr(1-CN) | C(=O)Me | Me | $CH_2OMe$ | O |
| C-3557 | Me | single bond | H | c-Pr(1-CN) | C(=O)Me | Me | $CH_2OMe$ | O |
| C-3558 | Me(R) | single bond | H | c-Pr(1-CN) | C(=O)Me | Me | $CH_2OMe$ | O |

TABLE 308

| Compound Number | Y | W | Z | $R^1$ | $R^2$ | $R^3$ | $R^{10}$ | A |
|---|---|---|---|---|---|---|---|---|
| C-3559 | Me(S) | single bond | H | c-Pr(1-CN) | C(=O)Me | Me | $CH_2OMe$ | O |
| C-3560 | H | $CH_2$ | Me | c-Pr(1-CN) | C(=O)Me | Me | $CH_2OMe$ | O |
| C-3561 | Me | $CH_2$ | H | c-Pr(1-CN) | C(=O)Me | Me | $CH_2OMe$ | O |
| C-3562 | H | CH(Me) | H | c-Pr(1-CN) | C(=O)Me | Me | $CH_2OMe$ | O |
| C-3563 | H | $CH_2CH_2$ | Me | c-Pr(1-CN) | C(=O)Me | Me | $CH_2OMe$ | O |
| C-3564 | Me | $CH_2CH_2$ | H | c-Pr(1-CN) | C(=O)Me | Me | $CH_2OMe$ | O |
| C-3565 | H | single bond | Me | c-Pr(1-CN) | C(=O)Me | Cl | $CH_2CN$ | O |
| C-3566 | Me | single bond | H | c-Pr(1-CN) | C(=O)Me | Cl | $CH_2CN$ | O |
| C-3567 | Me(R) | single bond | H | c-Pr(1-CN) | C(=O)Me | Cl | $CH_2CN$ | O |
| C-3568 | Me(S) | single bond | H | c-Pr(1-CN) | C(=O)Me | Cl | $CH_2CN$ | O |
| C-3569 | H | $CH_2$ | Me | c-Pr(1-CN) | C(=O)Me | Cl | $CH_2CN$ | O |
| C-3570 | Me | $CH_2$ | H | c-Pr(1-CN) | C(=O)Me | Cl | $CH_2CN$ | O |
| C-3571 | H | CH(Me) | H | c-Pr(1-CN) | C(=O)Me | Cl | $CH_2CN$ | O |
| C-3572 | H | $CH_2CH_2$ | Me | c-Pr(1-CN) | C(=O)Me | Cl | $CH_2CN$ | O |
| C-3573 | Me | $CH_2CH_2$ | H | c-Pr(1-CN) | C(=O)Me | Cl | $CH_2CN$ | O |
| C-3574 | H | single bond | Me | c-Pr(1-CN) | C(=O)Me | Me | $CH_2CN$ | O |
| C-3575 | Me | single bond | H | c-Pr(1-CN) | C(=O)Me | Me | $CH_2CN$ | O |
| C-3576 | Me(R) | single bond | H | c-Pr(1-CN) | C(=O)Me | Me | $CH_2CN$ | O |
| C-3577 | Me(S) | single bond | H | c-Pr(1-CN) | C(=O)Me | Me | $CH_2CN$ | O |
| C-3578 | H | $CH_2$ | Me | c-Pr(1-CN) | C(=O)Me | Me | $CH_2CN$ | O |
| C-3579 | Me | $CH_2$ | H | c-Pr(1-CN) | C(=O)Me | Me | $CH_2CN$ | O |
| C-3580 | H | CH(Me) | H | c-Pr(1-CN) | C(=O)Me | Me | $CH_2CN$ | O |
| C-3581 | H | $CH_2CH_2$ | Me | c-Pr(1-CN) | C(=O)Me | Me | $CH_2CN$ | O |
| C-3582 | Me | $CH_2CH_2$ | H | c-Pr(1-CN) | C(=O)Me | Me | $CH_2CN$ | O |
| C-3583 | H | single bond | Me | c-Pr(1-CN) | C(=O)Me | Cl | C(=O)Me | O |
| C-3584 | Me | single bond | H | c-Pr(1-CN) | C(=O)Me | Cl | C(=O)Me | O |
| C-3585 | Me(R) | single bond | H | c-Pr(1-CN) | C(=O)Me | Cl | C(=O)Me | O |
| C-3586 | Me(S) | single bond | H | c-Pr(1-CN) | C(=O)Me | Cl | C(=O)Me | O |
| C-3587 | H | $CH_2$ | Me | c-Pr(1-CN) | C(=O)Me | Cl | C(=O)Me | O |
| C-3588 | Me | $CH_2$ | H | c-Pr(1-CN) | C(=O)Me | Cl | C(=O)Me | O |
| C-3589 | H | CH(Me) | H | c-Pr(1-CN) | C(=O)Me | Cl | C(=O)Me | O |

TABLE 308-continued

| Compound Number | Y | W | Z | $R^1$ | $R^2$ | $R^3$ | $R^{10}$ | A |
|---|---|---|---|---|---|---|---|---|
| C-3590 | H | $CH_2CH_2$ | Me | c-Pr(1-CN) | C(=O)Me | Cl | C(=O)Me | O |
| C-3591 | Me | $CH_2CH_2$ | H | c-Pr(1-CN) | C(=O)Me | Cl | C(=O)Me | O |
| C-3592 | H | single bond | Me | c-Pr(1-CN) | C(=O)Me | Me | C(=O)Me | O |
| C-3593 | Me | single bond | H | c-Pr(1-CN) | C(=O)Me | Me | C(=O)Me | O |
| C-3594 | Me(R) | single bond | H | c-Pr(1-CN) | C(=O)Me | Me | C(=O)Me | O |
| C-3595 | Me(S) | single bond | H | c-Pr(1-CN) | C(=O)Me | Me | C(=O)Me | O |
| C-3596 | H | $CH_2$ | Me | c-Pr(1-CN) | C(=O)Me | Me | C(=O)Me | O |
| C-3597 | Me | $CH_2$ | H | c-Pr(1-CN) | C(=O)Me | Me | C(=O)Me | O |
| C-3598 | H | CH(Me) | H | c-Pr(1-CN) | C(=O)Me | Me | C(=O)Me | O |
| C-3599 | H | $CH_2CH_2$ | Me | c-Pr(1-CN) | C(=O)Me | Me | C(=O)Me | O |
| C-3600 | Me | $CH_2CH_2$ | H | c-Pr(1-CN) | C(=O)Me | Me | C(=O)Me | O |
| C-3601 | H | single bond | Me | c-Pr(1-CN) | C(=O)(i-Pr) | Cl | Me | O |
| C-3602 | Me | single bond | H | c-Pr(1-CN) | C(=O)(i-Pr) | Cl | Me | O |

TABLE 309

| Compound Number | Y | W | Z | $R^1$ | $R^2$ | $R^3$ | $R^{10}$ | A |
|---|---|---|---|---|---|---|---|---|
| C-3603 | Me(R) | single bond | H | c-Pr(1-CN) | C(=O)(i-Pr) | Cl | Me | O |
| C-3604 | Me(S) | single bond | H | c-Pr(1-CN) | C(=O)(i-Pr) | Cl | Me | O |
| C-3605 | H | $CH_2$ | Me | c-Pr(1-CN) | C(=O)(i-Pr) | Cl | Me | O |
| C-3606 | Me | $CH_2$ | H | c-Pr(1-CN) | C(=O)(i-Pr) | Cl | Me | O |
| C-3607 | H | CH(Me) | H | c-Pr(1-CN) | C(=O)(i-Pr) | Cl | Me | O |
| C-3608 | H | $CH_2CH_2$ | Me | c-Pr(1-CN) | C(=O)(i-Pr) | Cl | Me | O |
| C-3609 | Me | $CH_2CH_2$ | H | c-Pr(1-CN) | C(=O)(i-Pr) | Cl | Me | O |
| C-3610 | H | single bond | Me | c-Pr(1-CN) | C(=O)(i-Pr) | Me | Me | O |
| C-3611 | Me | single bond | H | c-Pr(1-CN) | C(=O)(i-Pr) | Me | Me | O |
| C-3612 | Me(R) | single bond | H | c-Pr(1-CN) | C(=O)(i-Pr) | Me | Me | O |
| C-3613 | Me(S) | single bond | H | c-Pr(1-CN) | C(=O)(i-Pr) | Me | Me | O |
| C-3614 | H | $CH_2$ | Me | c-Pr(1-CN) | C(=O)(i-Pr) | Me | Me | O |
| C-3615 | Me | $CH_2$ | H | c-Pr(1-CN) | C(=O)(i-Pr) | Me | Me | O |
| C-3616 | H | CH(Me) | H | c-Pr(1-CN) | C(=O)(i-Pr) | Me | Me | O |
| C-3617 | H | $CH_2CH_2$ | Me | c-Pr(1-CN) | C(=O)(i-Pr) | Me | Me | O |
| C-3618 | Me | $CH_2CH_2$ | H | c-Pr(1-CN) | C(=O)(i-Pr) | Me | Me | O |
| C-3619 | H | single bond | Me | c-Pr(1-CN) | C(=O)(i-Pr) | Cl | Et | O |
| C-3620 | Me | single bond | H | c-Pr(1-CN) | C(=O)(i-Pr) | Cl | Et | O |
| C-3621 | Me(R) | single bond | H | c-Pr(1-CN) | C(=O)(i-Pr) | Cl | Et | O |
| C-3622 | Me(S) | single bond | H | c-Pr(1-CN) | C(=O)(i-Pr) | Cl | Et | O |
| C-3623 | H | $CH_2$ | Me | c-Pr(1-CN) | C(=O)(i-Pr) | Cl | Et | O |
| C-3624 | Me | $CH_2$ | H | c-Pr(1-CN) | C(=O)(i-Pr) | Cl | Et | O |
| C-3625 | H | CH(Me) | H | c-Pr(1-CN) | C(=O)(i-Pr) | Cl | Et | O |
| C-3626 | H | $CH_2CH_2$ | Me | c-Pr(1-CN) | C(=O)(i-Pr) | Cl | Et | O |
| C-3627 | Me | $CH_2CH_2$ | H | c-Pr(1-CN) | C(=O)(i-Pr) | Cl | Et | O |
| C-3628 | H | single bond | Me | c-Pr(1-CN) | C(=O)(i-Pr) | Me | Et | O |
| C-3629 | Me | single bond | H | c-Pr(1-CN) | C(=O)(i-Pr) | Me | Et | O |
| C-3630 | Me(R) | single bond | H | c-Pr(1-CN) | C(=O)(i-Pr) | Me | Et | O |
| C-3631 | Me(S) | single bond | H | c-Pr(1-CN) | C(=O)(i-Pr) | Me | Et | O |
| C-3632 | H | $CH_2$ | Me | c-Pr(1-CN) | C(=O)(i-Pr) | Me | Et | O |
| C-3633 | Me | $CH_2$ | H | c-Pr(1-CN) | C(=O)(i-Pr) | Me | Et | O |
| C-3634 | H | CH(Me) | H | c-Pr(1-CN) | C(=O)(i-Pr) | Me | Et | O |
| C-3635 | H | $CH_2CH_2$ | Me | c-Pr(1-CN) | C(=O)(i-Pr) | Me | Et | O |
| C-3636 | Me | $CH_2CH_2$ | H | c-Pr(1-CN) | C(=O)(i-Pr) | Me | Et | O |
| C-3637 | H | single bond | Me | c-Pr(1-CN) | C(=O)(i-Pr) | Cl | $CH_2CF_3$ | O |
| C-3638 | Me | single bond | H | c-Pr(1-CN) | C(=O)(i-Pr) | Cl | $CH_2CF_3$ | O |
| C-3639 | Me(R) | single bond | H | c-Pr(1-CN) | C(=O)(i-Pr) | Cl | $CH_2CF_3$ | O |
| C-3640 | Me(S) | single bond | H | c-Pr(1-CN) | C(=O)(i-Pr) | Cl | $CH_2CF_3$ | O |
| C-3641 | H | $CH_2$ | Me | c-Pr(1-CN) | C(=O)(i-Pr) | Cl | $CH_2CF_3$ | O |
| C-3642 | Me | $CH_2$ | H | c-Pr(1-CN) | C(=O)(i-Pr) | Cl | $CH_2CF_3$ | O |
| C-3643 | H | CH(Me) | H | c-Pr(1-CN) | C(=O)(i-Pr) | Cl | $CH_2CF_3$ | O |
| C-3644 | H | $CH_2CH_2$ | Me | c-Pr(1-CN) | C(=O)(i-Pr) | Cl | $CH_2CF_3$ | O |
| C-3645 | Me | $CH_2CH_2$ | H | c-Pr(1-CN) | C(=O)(i-Pr) | Cl | $CH_2CF_3$ | O |
| C-3646 | H | single bond | Me | c-Pr(1-CN) | C(=O)(i-Pr) | Me | $CH_2CF_3$ | O |

TABLE 310

| Compound Number | Y | W | Z | $R^1$ | $R^2$ | $R^3$ | $R^{10}$ | A |
|---|---|---|---|---|---|---|---|---|
| C-3647 | Me | single bond | H | c-Pr(1-CN) | C(=O)(i-Pr) | Me | $CH_2CF_3$ | O |
| C-3648 | Me(R) | single bond | H | c-Pr(1-CN) | C(=O)(i-Pr) | Me | $CH_2CF_3$ | O |
| C-3649 | Me(S) | single bond | H | c-Pr(1-CN) | C(=O)(i-Pr) | Me | $CH_2CF_3$ | O |
| C-3650 | H | $CH_2$ | Me | c-Pr(1-CN) | C(=O)(i-Pr) | Me | $CH_2CF_3$ | O |
| C-3651 | Me | $CH_2$ | H | c-Pr(1-CN) | C(=O)(i-Pr) | Me | $CH_2CF_3$ | O |
| C-3652 | H | CH(Me) | H | c-Pr(1-CN) | C(=O)(i-Pr) | Me | $CH_2CF_3$ | O |
| C-3653 | H | $CH_2CH_2$ | Me | c-Pr(1-CN) | C(=O)(i-Pr) | Me | $CH_2CF_3$ | O |
| C-3654 | Me | $CH_2CH_2$ | H | c-Pr(1-CN) | C(=O)(i-Pr) | Me | $CH_2CF_3$ | O |
| C-3655 | H | single bond | Me | c-Pr(1-CN) | C(=O)(i-Pr) | Cl | $CH_2OMe$ | O |
| C-3656 | Me | single bond | H | c-Pr(1-CN) | C(=O)(i-Pr) | Cl | $CH_2OMe$ | O |
| C-3657 | Me(R) | single bond | H | c-Pr(1-CN) | C(=O)(i-Pr) | Cl | $CH_2OMe$ | O |
| C-3658 | Me(S) | single bond | H | c-Pr(1-CN) | C(=O)(i-Pr) | Cl | $CH_2OMe$ | O |
| C-3659 | H | $CH_2$ | Me | c-Pr(1-CN) | C(=O)(i-Pr) | Cl | $CH_2OMe$ | O |
| C-3660 | Me | $CH_2$ | H | c-Pr(1-CN) | C(=O)(i-Pr) | Cl | $CH_2OMe$ | O |
| C-3661 | H | CH(Me) | H | c-Pr(1-CN) | C(=O)(i-Pr) | Cl | $CH_2OMe$ | O |
| C-3662 | H | $CH_2CH_2$ | Me | c-Pr(1-CN) | C(=O)(i-Pr) | Cl | $CH_2OMe$ | O |
| C-3663 | Me | $CH_2CH_2$ | H | c-Pr(1-CN) | C(=O)(i-Pr) | Cl | $CH_2OMe$ | O |
| C-3664 | H | single bond | Me | c-Pr(1-CN) | C(=O)(i-Pr) | Me | $CH_2OMe$ | O |
| C-3665 | Me | single bond | H | c-Pr(1-CN) | C(=O)(i-Pr) | Me | $CH_2OMe$ | O |
| C-3666 | Me(R) | single bond | H | c-Pr(1-CN) | C(=O)(i-Pr) | Me | $CH_2OMe$ | O |
| C-3667 | Me(S) | single bond | H | c-Pr(1-CN) | C(=O)(i-Pr) | Me | $CH_2OMe$ | O |
| C-3668 | H | $CH_2$ | Me | c-Pr(1-CN) | C(=O)(i-Pr) | Me | $CH_2OMe$ | O |
| C-3669 | Me | $CH_2$ | H | c-Pr(1-CN) | C(=O)(i-Pr) | Me | $CH_2OMe$ | O |
| C-3670 | H | CH(Me) | H | c-Pr(1-CN) | C(=O)(i-Pr) | Me | $CH_2OMe$ | O |
| C-3671 | H | $CH_2CH_2$ | Me | c-Pr(1-CN) | C(=O)(i-Pr) | Me | $CH_2OMe$ | O |
| C-3672 | Me | $CH_2CH_2$ | H | c-Pr(1-CN) | C(=O)(i-Pr) | Me | $CH_2OMe$ | O |
| C-3673 | H | single bond | Me | c-Pr(1-CN) | C(=O)(i-Pr) | Cl | $CH_2CN$ | O |
| C-3674 | Me | single bond | H | c-Pr(1-CN) | C(=O)(i-Pr) | Cl | $CH_2CN$ | O |
| C-3675 | Me(R) | single bond | H | c-Pr(1-CN) | C(=O)(i-Pr) | Cl | $CH_2CN$ | O |
| C-3676 | Me(S) | single bond | H | c-Pr(1-CN) | C(=O)(i-Pr) | Cl | $CH_2CN$ | O |
| C-3677 | H | $CH_2$ | Me | c-Pr(1-CN) | C(=O)(i-Pr) | Cl | $CH_2CN$ | O |
| C-3678 | Me | $CH_2$ | H | c-Pr(1-CN) | C(=O)(i-Pr) | Cl | $CH_2CN$ | O |
| C-3679 | H | CH(Me) | H | c-Pr(1-CN) | C(=O)(i-Pr) | Cl | $CH_2CN$ | O |
| C-3680 | H | $CH_2CH_2$ | Me | c-Pr(1-CN) | C(=O)(i-Pr) | Cl | $CH_2CN$ | O |
| C-3681 | Me | $CH_2CH_2$ | H | c-Pr(1-CN) | C(=O)(i-Pr) | Cl | $CH_2CN$ | O |
| C-3682 | H | single bond | Me | c-Pr(1-CN) | C(=O)(i-Pr) | Me | $CH_2CN$ | O |
| C-3683 | Me | single bond | H | c-Pr(1-CN) | C(=O)(i-Pr) | Me | $CH_2CN$ | O |
| C-3684 | Me(R) | single bond | H | c-Pr(1-CN) | C(=O)(i-Pr) | Me | $CH_2CN$ | O |
| C-3685 | Me(S) | single bond | H | c-Pr(1-CN) | C(=O)(i-Pr) | Me | $CH_2CN$ | O |
| C-3686 | H | $CH_2$ | Me | c-Pr(1-CN) | C(=O)(i-Pr) | Me | $CH_2CN$ | O |
| C-3687 | Me | $CH_2$ | H | c-Pr(1-CN) | C(=O)(i-Pr) | Me | $CH_2CN$ | O |
| C-3688 | H | CH(Me) | H | c-Pr(1-CN) | C(=O)(i-Pr) | Me | $CH_2CN$ | O |
| C-3689 | H | $CH_2CH_2$ | Me | c-Pr(1-CN) | C(=O)(i-Pr) | Me | $CH_2CN$ | O |
| C-3690 | Me | $CH_2CH_2$ | H | c-Pr(1-CN) | C(=O)(i-Pr) | Me | $CH_2CN$ | O |

TABLE 311

| Compound Number | Y | W | Z | $R^1$ | $R^2$ | $R^3$ | $R^{10}$ | A |
|---|---|---|---|---|---|---|---|---|
| C-3691 | H | single bond | Me | c-Pr(1-CN) | C(=O)(i-Pr) | Cl | C(=O)Me | O |
| C-3692 | Me | single bond | H | c-Pr(1-CN) | C(=O)(i-Pr) | Cl | C(=O)Me | O |
| C-3693 | Me(R) | single bond | H | c-Pr(1-CN) | C(=O)(i-Pr) | Cl | C(=O)Me | O |
| C-3694 | Me(S) | single bond | H | c-Pr(1-CN) | C(=O)(i-Pr) | Cl | C(=O)Me | O |
| C-3695 | H | $CH_2$ | Me | c-Pr(1-CN) | C(=O)(i-Pr) | Cl | C(=O)Me | O |
| C-3696 | Me | $CH_2$ | H | c-Pr(1-CN) | C(=O)(i-Pr) | Cl | C(=O)Me | O |
| C-3697 | H | CH(Me) | H | c-Pr(1-CN) | C(=O)(i-Pr) | Cl | C(=O)Me | O |
| C-3698 | H | $CH_2CH_2$ | Me | c-Pr(1-CN) | C(=O)(i-Pr) | Cl | C(=O)Me | O |
| C-3699 | Me | $CH_2CH_2$ | H | c-Pr(1-CN) | C(=O)(i-Pr) | Cl | C(=O)Me | O |
| C-3700 | H | single bond | Me | c-Pr(1-CN) | C(=O)(i-Pr) | Me | C(=O)Me | O |
| C-3701 | Me | single bond | H | c-Pr(1-CN) | C(=O)(i-Pr) | Me | C(=O)Me | O |
| C-3702 | Me(R) | single bond | H | c-Pr(1-CN) | C(=O)(i-Pr) | Me | C(=O)Me | O |
| C-3703 | Me(S) | single bond | H | c-Pr(1-CN) | C(=O)(i-Pr) | Me | C(=O)Me | O |
| C-3704 | H | $CH_2$ | Me | c-Pr(1-CN) | C(=O)(i-Pr) | Me | C(=O)Me | O |
| C-3705 | Me | $CH_2$ | H | c-Pr(1-CN) | C(=O)(i-Pr) | Me | C(=O)Me | O |
| C-3706 | H | CH(Me) | H | c-Pr(1-CN) | C(=O)(i-Pr) | Me | C(=O)Me | O |
| C-3707 | H | $CH_2CH_2$ | Me | c-Pr(1-CN) | C(=O)(i-Pr) | Me | C(=O)Me | O |
| C-3708 | Me | $CH_2CH_2$ | H | c-Pr(1-CN) | C(=O)(i-Pr) | Me | C(=O)Me | O |
| C-3709 | H | single bond | Me | c-Pr(1-CN) | C(=O)Ph | Cl | Me | O |
| C-3710 | Me | single bond | H | c-Pr(1-CN) | C(=O)Ph | Cl | Me | O |
| C-3711 | Me(R) | single bond | H | c-Pr(1-CN) | C(=O)Ph | Cl | Me | O |
| C-3712 | Me(S) | single bond | H | c-Pr(1-CN) | C(=O)Ph | Cl | Me | O |
| C-3713 | H | $CH_2$ | Me | c-Pr(1-CN) | C(=O)Ph | Cl | Me | O |

TABLE 311-continued

| Compound Number | Y | W | Z | $R^1$ | $R^2$ | $R^3$ | $R^{10}$ | A |
|---|---|---|---|---|---|---|---|---|
| C-3714 | Me | $CH_2$ | H | c-Pr(1-CN) | C(=O)Ph | Cl | Me | O |
| C-3715 | H | CH(Me) | H | c-Pr(1-CN) | C(=O)Ph | Cl | Me | O |
| C-3716 | H | $CH_2CH_2$ | Me | c-Pr(1-CN) | C(=O)Ph | Cl | Me | O |
| C-3717 | Me | $CH_2CH_2$ | H | c-Pr(1-CN) | C(=O)Ph | Cl | Me | O |
| C-3718 | H | single bond | Me | c-Pr(1-CN) | C(=O)Ph | Me | Me | O |
| C-3719 | Me | single bond | H | c-Pr(1-CN) | C(=O)Ph | Me | Me | O |
| C-3720 | Me(R) | single bond | H | c-Pr(1-CN) | C(=O)Ph | Me | Me | O |
| C-3721 | Me(S) | single bond | H | c-Pr(1-CN) | C(=O)Ph | Me | Me | O |
| C-3722 | H | $CH_2$ | Me | c-Pr(1-CN) | C(=O)Ph | Me | Me | O |
| C-3723 | Me | $CH_2$ | H | c-Pr(1-CN) | C(=O)Ph | Me | Me | O |
| C-3724 | H | CH(Me) | H | c-Pr(1-CN) | C(=O)Ph | Me | Me | O |
| C-3725 | H | $CH_2CH_2$ | Me | c-Pr(1-CN) | C(=O)Ph | Me | Me | O |
| C-3726 | Me | $CH_2CH_2$ | H | c-Pr(1-CN) | C(=O)Ph | Me | Me | O |
| C-3727 | H | single bond | Me | c-Pr(1-CN) | C(=O)Ph | Cl | Et | O |
| C-3728 | Me | single bond | H | c-Pr(1-CN) | C(=O)Ph | Cl | Et | O |
| C-3729 | Me(R) | single bond | H | c-Pr(1-CN) | C(=O)Ph | Cl | Et | O |
| C-3730 | Me(S) | single bond | H | c-Pr(1-CN) | C(=O)Ph | Cl | Et | O |
| C-3731 | H | $CH_2$ | Me | c-Pr(1-CN) | C(=O)Ph | Cl | Et | O |
| C-3732 | Me | $CH_2$ | H | c-Pr(1-CN) | C(=O)Ph | Cl | Et | O |
| C-3733 | H | CH(Me) | H | c-Pr(1-CN) | C(=O)Ph | Cl | Et | O |
| C-3734 | H | $CH_2CH_2$ | Me | c-Pr(1-CN) | C(=O)Ph | Cl | Et | O |

TABLE 312

| Compound Number | Y | W | Z | $R^1$ | $R^2$ | $R^3$ | $R^{10}$ | A |
|---|---|---|---|---|---|---|---|---|
| C-3735 | Me | $CH_2CH_2$ | H | c-Pr(1-CN) | C(=O)Ph | Cl | Et | O |
| C-3736 | H | single bond | Me | c-Pr(1-CN) | C(=O)Ph | Me | Et | O |
| C-3737 | Me | single bond | H | c-Pr(1-CN) | C(=O)Ph | Me | Et | O |
| C-3738 | Me(R) | single bond | H | c-Pr(1-CN) | C(=O)Ph | Me | Et | O |
| C-3739 | Me(S) | single bond | H | c-Pr(1-CN) | C(=O)Ph | Me | Et | O |
| C-3740 | H | $CH_2$ | Me | c-Pr(1-CN) | C(=O)Ph | Me | Et | O |
| C-3741 | Me | $CH_2$ | H | c-Pr(1-CN) | C(=O)Ph | Me | Et | O |
| C-3742 | H | CH(Me) | H | c-Pr(1-CN) | C(=O)Ph | Me | Et | O |
| C-3743 | H | $CH_2CH_2$ | Me | c-Pr(1-CN) | C(=O)Ph | Me | Et | O |
| C-3744 | Me | $CH_2CH_2$ | H | c-Pr(1-CN) | C(=O)Ph | Me | Et | O |
| C-3745 | H | single bond | Me | c-Pr(1-CN) | C(=O)Ph | Cl | $CH_2CF_3$ | O |
| C-3746 | Me | single bond | H | c-Pr(1-CN) | C(=O)Ph | Cl | $CH_2CF_3$ | O |
| C-3747 | Me(R) | single bond | H | c-Pr(1-CN) | C(=O)Ph | Cl | $CH_2CF_3$ | O |
| C-3748 | Me(S) | single bond | H | c-Pr(1-CN) | C(=O)Ph | Cl | $CH_2CF_3$ | O |
| C-3749 | H | $CH_2$ | Me | c-Pr(1-CN) | C(=O)Ph | Cl | $CH_2CF_3$ | O |
| C-3750 | Me | $CH_2$ | H | c-Pr(1-CN) | C(=O)Ph | Cl | $CH_2CF_3$ | O |
| C-3751 | H | CH(Me) | H | c-Pr(1-CN) | C(=O)Ph | Cl | $CH_2CF_3$ | O |
| C-3752 | H | $CH_2CH_2$ | Me | c-Pr(1-CN) | C(=O)Ph | Cl | $CH_2CF_3$ | O |
| C-3753 | Me | $CH_2CH_2$ | H | c-Pr(1-CN) | C(=O)Ph | Cl | $CH_2CF_3$ | O |
| C-3754 | H | single bond | Me | c-Pr(1-CN) | C(=O)Ph | Me | $CH_2CF_3$ | O |
| C-3755 | Me | single bond | H | c-Pr(1-CN) | C(=O)Ph | Me | $CH_2CF_3$ | O |
| C-3756 | Me(R) | single bond | H | c-Pr(1-CN) | C(=O)Ph | Me | $CH_2CF_3$ | O |
| C-3757 | Me(S) | single bond | H | c-Pr(1-CN) | C(=O)Ph | Me | $CH_2CF_3$ | O |
| C-3758 | H | $CH_2$ | Me | c-Pr(1-CN) | C(=O)Ph | Me | $CH_2CF_3$ | O |
| C-3759 | Me | $CH_2$ | H | c-Pr(1-CN) | C(=O)Ph | Me | $CH_2CF_3$ | O |
| C-3760 | H | CH(Me) | H | c-Pr(1-CN) | C(=O)Ph | Me | $CH_2CF_3$ | O |
| C-3761 | H | $CH_2CH_2$ | Me | c-Pr(1-CN) | C(=O)Ph | Me | $CH_2CF_3$ | O |
| C-3762 | Me | $CH_2CH_2$ | H | c-Pr(1-CN) | C(=O)Ph | Me | $CH_2CF_3$ | O |
| C-3763 | H | single bond | Me | c-Pr(1-CN) | C(=O)Ph | Cl | $CH_2OMe$ | O |
| C-3764 | Me | single bond | H | c-Pr(1-CN) | C(=O)Ph | Cl | $CH_2OMe$ | O |
| C-3765 | Me(R) | single bond | H | c-Pr(1-CN) | C(=O)Ph | Cl | $CH_2OMe$ | O |
| C-3766 | Me(S) | single bond | H | c-Pr(1-CN) | C(=O)Ph | Cl | $CH_2OMe$ | O |
| C-3767 | H | $CH_2$ | Me | c-Pr(1-CN) | C(=O)Ph | Cl | $CH_2OMe$ | O |
| C-3768 | Me | $CH_2$ | H | c-Pr(1-CN) | C(=O)Ph | Cl | $CH_2OMe$ | O |
| C-3769 | H | CH(Me) | H | c-Pr(1-CN) | C(=O)Ph | Cl | $CH_2OMe$ | O |
| C-3770 | H | $CH_2CH_2$ | Me | c-Pr(1-CN) | C(=O)Ph | Cl | $CH_2OMe$ | O |
| C-3771 | Me | $CH_2CH_2$ | H | c-Pr(1-CN) | C(=O)Ph | Cl | $CH_2OMe$ | O |
| C-3772 | H | single bond | Me | c-Pr(1-CN) | C(=O)Ph | Me | $CH_2OMe$ | O |
| C-3773 | Me | single bond | H | c-Pr(1-CN) | C(=O)Ph | Me | $CH_2OMe$ | O |
| C-3774 | Me(R) | single bond | H | c-Pr(1-CN) | C(=O)Ph | Me | $CH_2OMe$ | O |
| C-3775 | Me(S) | single bond | H | c-Pr(1-CN) | C(=O)Ph | Me | $CH_2OMe$ | O |
| C-3776 | H | $CH_2$ | Me | c-Pr(1-CN) | C(=O)Ph | Me | $CH_2OMe$ | O |
| C-3777 | Me | $CH_2$ | H | c-Pr(1-CN) | C(=O)Ph | Me | $CH_2OMe$ | O |
| C-3778 | H | CH(Me) | H | c-Pr(1-CN) | C(=O)Ph | Me | $CH_2OMe$ | O |

TABLE 313

| Compound Number | Y | W | Z | $R^1$ | $R^2$ | $R^3$ | $R^{10}$ | A |
|---|---|---|---|---|---|---|---|---|
| C-3779 | H | $CH_2CH_2$ | Me | c-Pr(1-CN) | C(=O)Ph | Me | $CH_2OMe$ | O |
| C-3780 | Me | $CH_2CH_2$ | H | c-Pr(1-CN) | C(=O)Ph | Me | $CH_2OMe$ | O |
| C-3781 | H | single bond | Me | c-Pr(1-CN) | C(=O)Ph | Cl | $CH_2CN$ | O |
| C-3782 | Me | single bond | H | c-Pr(1-CN) | C(=O)Ph | Cl | $CH_2CN$ | O |
| C-3783 | Me(R) | single bond | H | c-Pr(1-CN) | C(=O)Ph | Cl | $CH_2CN$ | O |
| C-3784 | Me(S) | single bond | H | c-Pr(1-CN) | C(=O)Ph | Cl | $CH_2CN$ | O |
| C-3785 | H | $CH_2$ | Me | c-Pr(1-CN) | C(=O)Ph | Cl | $CH_2CN$ | O |
| C-3786 | Me | $CH_2$ | H | c-Pr(1-CN) | C(=O)Ph | Cl | $CH_2CN$ | O |
| C-3787 | H | CH(Me) | H | c-Pr(1-CN) | C(=O)Ph | Cl | $CH_2CN$ | O |
| C-3788 | H | $CH_2CH_2$ | Me | c-Pr(1-CN) | C(=O)Ph | Cl | $CH_2CN$ | O |
| C-3789 | Me | $CH_2CH_2$ | H | c-Pr(1-CN) | C(=O)Ph | Cl | $CH_2CN$ | O |
| C-3790 | H | single bond | Me | c-Pr(1-CN) | C(=O)Ph | Me | $CH_2CN$ | O |
| C-3791 | Me | single bond | H | c-Pr(1-CN) | C(=O)Ph | Me | $CH_2CN$ | O |
| C-3792 | Me(R) | single bond | H | c-Pr(1-CN) | C(=O)Ph | Me | $CH_2CN$ | O |
| C-3793 | Me(S) | single bond | H | c-Pr(1-CN) | C(=O)Ph | Me | $CH_2CN$ | O |
| C-3794 | H | $CH_2$ | Me | c-Pr(1-CN) | C(=O)Ph | Me | $CH_2CN$ | O |
| C-3795 | Me | $CH_2$ | H | c-Pr(1-CN) | C(=O)Ph | Me | $CH_2CN$ | O |
| C-3796 | H | CH(Me) | H | c-Pr(1-CN) | C(=O)Ph | Me | $CH_2CN$ | O |
| C-3797 | H | $CH_2CH_2$ | Me | c-Pr(1-CN) | C(=O)Ph | Me | $CH_2CN$ | O |
| C-3798 | Me | $CH_2CH_2$ | H | c-Pr(1-CN) | C(=O)Ph | Me | $CH_2CN$ | O |
| C-3799 | H | single bond | Me | c-Pr(1-CN) | C(=O)Ph | Cl | C(=O)Me | O |
| C-3800 | Me | single bond | H | c-Pr(1-CN) | C(=O)Ph | Cl | C(=O)Me | O |
| C-3801 | Me(R) | single bond | H | c-Pr(1-CN) | C(=O)Ph | Cl | C(=O)Me | O |
| C-3802 | Me(S) | single bond | H | c-Pr(1-CN) | C(=O)Ph | Cl | C(=O)Me | O |
| C-3803 | H | $CH_2$ | Me | c-Pr(1-CN) | C(=O)Ph | Cl | C(=O)Me | O |
| C-3804 | Me | $CH_2$ | H | c-Pr(1-CN) | C(=O)Ph | Cl | C(=O)Me | O |
| C-3805 | H | CH(Me) | H | c-Pr(1-CN) | C(=O)Ph | Cl | C(=O)Me | O |
| C-3806 | H | $CH_2CH_2$ | Me | c-Pr(1-CN) | C(=O)Ph | Cl | C(=O)Me | O |
| C-3807 | Me | $CH_2CH_2$ | H | c-Pr(1-CN) | C(=O)Ph | Cl | C(=O)Me | O |
| C-3808 | H | single bond | Me | c-Pr(1-CN) | C(=O)Ph | Me | C(=O)Me | O |
| C-3809 | Me | single bond | H | c-Pr(1-CN) | C(=O)Ph | Me | C(=O)Me | O |
| C-3810 | Me(R) | single bond | H | c-Pr(1-CN) | C(=O)Ph | Me | C(=O)Me | O |
| C-3811 | Me(S) | single bond | H | c-Pr(1-CN) | C(=O)Ph | Me | C(=O)Me | O |
| C-3812 | H | $CH_2$ | Me | c-Pr(1-CN) | C(=O)Ph | Me | C(=O)Me | O |
| C-3813 | Me | $CH_2$ | H | c-Pr(1-CN) | C(=O)Ph | Me | C(=O)Me | O |
| C-3814 | H | CH(Me) | H | c-Pr(1-CN) | C(=O)Ph | Me | C(=O)Me | O |
| C-3815 | H | $CH_2CH_2$ | Me | c-Pr(1-CN) | C(=O)Ph | Me | C(=O)Me | O |
| C-3816 | Me | $CH_2CH_2$ | H | c-Pr(1-CN) | C(=O)Ph | Me | C(=O)Me | O |
| C-3817 | H | single bond | Me | c-Pr(1-CN) | C(=O)OEt | Cl | Me | O |
| C-3818 | Me | single bond | H | c-Pr(1-CN) | C(=O)OEt | Cl | Me | O |
| C-3819 | Me(R) | single bond | H | c-Pr(1-CN) | C(=O)OEt | Cl | Me | O |
| C-3820 | Me(S) | single bond | H | c-Pr(1-CN) | C(=O)OEt | Cl | Me | O |
| C-3821 | H | $CH_2$ | Me | c-Pr(1-CN) | C(=O)OEt | Cl | Me | O |
| C-3822 | Me | $CH_2$ | H | c-Pr(1-CN) | C(=O)OEt | Cl | Me | O |

TABLE 314

| Compound Number | Y | W | Z | $R^1$ | $R^2$ | $R^3$ | $R^{10}$ | A |
|---|---|---|---|---|---|---|---|---|
| C-3823 | H | CH(Me) | H | c-Pr(1-CN) | C(=O)OEt | Cl | Me | O |
| C-3824 | H | $CH_2CH_2$ | Me | c-Pr(1-CN) | C(=O)OEt | Cl | Me | O |
| C-3825 | Me | $CH_2CH_2$ | H | c-Pr(1-CN) | C(=O)OEt | Cl | Me | O |
| C-3826 | H | single bond | Me | c-Pr(1-CN) | C(=O)OEt | Me | Me | O |
| C-3827 | Me | single bond | H | c-Pr(1-CN) | C(=O)OEt | Me | Me | O |
| C-3828 | Me(R) | single bond | H | c-Pr(1-CN) | C(=O)OEt | Me | Me | O |
| C-3829 | Me(S) | single bond | H | c-Pr(1-CN) | C(=O)OEt | Me | Me | O |
| C-3830 | H | $CH_2$ | Me | c-Pr(1-CN) | C(=O)OEt | Me | Me | O |
| C-3831 | Me | $CH_2$ | H | c-Pr(1-CN) | C(=O)OEt | Me | Me | O |
| C-3832 | H | CH(Me) | H | c-Pr(1-CN) | C(=O)OEt | Me | Me | O |
| C-3833 | H | $CH_2CH_2$ | Me | c-Pr(1-CN) | C(=O)OEt | Me | Me | O |
| C-3834 | Me | $CH_2CH_2$ | H | c-Pr(1-CN) | C(=O)OEt | Me | Me | O |
| C-3835 | H | single bond | Me | c-Pr(1-CN) | C(=O)OEt | Cl | Et | O |
| C-3836 | Me | single bond | H | c-Pr(1-CN) | C(=O)OEt | Cl | Et | O |
| C-3837 | Me(R) | single bond | H | c-Pr(1-CN) | C(=O)OEt | Cl | Et | O |
| C-3838 | Me(S) | single bond | H | c-Pr(1-CN) | C(=O)OEt | Cl | Et | O |
| C-3839 | H | $CH_2$ | Me | c-Pr(1-CN) | C(=O)OEt | Cl | Et | O |
| C-3840 | Me | $CH_2$ | H | c-Pr(1-CN) | C(=O)OEt | Cl | Et | O |
| C-3841 | H | CH(Me) | H | c-Pr(1-CN) | C(=O)OEt | Cl | Et | O |
| C-3842 | H | $CH_2CH_2$ | Me | c-Pr(1-CN) | C(=O)OEt | Cl | Et | O |
| C-3843 | Me | $CH_2CH_2$ | H | c-Pr(1-CN) | C(=O)OEt | Cl | Et | O |

TABLE 314-continued

| Compound Number | Y | W | Z | $R^1$ | $R^2$ | $R^3$ | $R^{10}$ | A |
|---|---|---|---|---|---|---|---|---|
| C-3844 | H | single bond | Me | c-Pr(1-CN) | C(=O)OEt | Me | Et | O |
| C-3845 | Me | single bond | H | c-Pr(1-CN) | C(=O)OEt | Me | Et | O |
| C-3846 | Me(R) | single bond | H | c-Pr(1-CN) | C(=O)OEt | Me | Et | O |
| C-3847 | Me(S) | single bond | H | c-Pr(1-CN) | C(=O)OEt | Me | Et | O |
| C-3848 | H | $CH_2$ | Me | c-Pr(1-CN) | C(=O)OEt | Me | Et | O |
| C-3849 | Me | $CH_2$ | H | c-Pr(1-CN) | C(=O)OEt | Me | Et | O |
| C-3850 | H | CH(Me) | H | c-Pr(1-CN) | C(=O)OEt | Me | Et | O |
| C-3851 | H | $CH_2CH_2$ | Me | c-Pr(1-CN) | C(=O)OEt | Me | Et | O |
| C-3852 | Me | $CH_2CH_2$ | H | c-Pr(1-CN) | C(=O)OEt | Me | Et | O |
| C-3853 | H | single bond | Me | c-Pr(1-CN) | C(=O)OEt | Cl | $CH_2CF_3$ | O |
| C-3854 | Me | single bond | H | c-Pr(1-CN) | C(=O)OEt | Cl | $CH_2CF_3$ | O |
| C-3855 | Me(R) | single bond | H | c-Pr(1-CN) | C(=O)OEt | Cl | $CH_2CF_3$ | O |
| C-3856 | Me(S) | single bond | H | c-Pr(1-CN) | C(=O)OEt | Cl | $CH_2CF_3$ | O |
| C-3857 | H | $CH_2$ | Me | c-Pr(1-CN) | C(=O)OEt | Cl | $CH_2CF_3$ | O |
| C-3858 | Me | $CH_2$ | H | c-Pr(1-CN) | C(=O)OEt | Cl | $CH_2CF_3$ | O |
| C-3859 | H | CH(Me) | H | c-Pr(1-CN) | C(=O)OEt | Cl | $CH_2CF_3$ | O |
| C-3860 | H | $CH_2CH_2$ | Me | c-Pr(1-CN) | C(=O)OEt | Cl | $CH_2CF_3$ | O |
| C-3861 | Me | $CH_2CH_2$ | H | c-Pr(1-CN) | C(=O)OEt | Cl | $CH_2CF_3$ | O |
| C-3862 | H | single bond | Me | c-Pr(1-CN) | C(=O)OEt | Me | $CH_2CF_3$ | O |
| C-3863 | Me | single bond | H | c-Pr(1-CN) | C(=O)OEt | Me | $CH_2CF_3$ | O |
| C-3864 | Me(R) | single bond | H | c-Pr(1-CN) | C(=O)OEt | Me | $CH_2CF_3$ | O |
| C-3865 | Me(S) | single bond | H | c-Pr(1-CN) | C(=O)OEt | Me | $CH_2CF_3$ | O |
| C-3866 | H | $CH_2$ | Me | c-Pr(1-CN) | C(=O)OEt | Me | $CH_2CF_3$ | O |

TABLE 315

| Compound Number | Y | W | Z | $R^1$ | $R^2$ | $R^3$ | $R^{10}$ | A |
|---|---|---|---|---|---|---|---|---|
| C-3867 | Me | $CH_2$ | H | c-Pr(1-CN) | C(=O)OEt | Me | $CH_2CF_3$ | O |
| C-3868 | H | CH(Me) | H | c-Pr(1-CN) | C(=O)OEt | Me | $CH_2CF_3$ | O |
| C-3869 | H | $CH_2CH_2$ | Me | c-Pr(1-CN) | C(=O)OEt | Me | $CH_2CF_3$ | O |
| C-3870 | Me | $CH_2CH_2$ | H | c-Pr(1-CN) | C(=O)OEt | Me | $CH_2CF_3$ | O |
| C-3871 | H | single bond | Me | c-Pr(1-CN) | C(=O)OEt | Cl | $CH_2OMe$ | O |
| C-3872 | Me | single bond | H | c-Pr(1-CN) | C(=O)OEt | Cl | $CH_2OMe$ | O |
| C-3873 | Me(R) | single bond | H | c-Pr(1-CN) | C(=O)OEt | Cl | $CH_2OMe$ | O |
| C-3874 | Me(S) | single bond | H | c-Pr(1-CN) | C(=O)OEt | Cl | $CH_2OMe$ | O |
| C-3875 | H | $CH_2$ | Me | c-Pr(1-CN) | C(=O)OEt | Cl | $CH_2OMe$ | O |
| C-3876 | Me | $CH_2$ | H | c-Pr(1-CN) | C(=O)OEt | Cl | $CH_2OMe$ | O |
| C-3877 | H | CH(Me) | H | c-Pr(1-CN) | C(=O)OEt | Cl | $CH_2OMe$ | O |
| C-3878 | H | $CH_2CH_2$ | Me | c-Pr(1-CN) | C(=O)OEt | Cl | $CH_2OMe$ | O |
| C-3879 | Me | $CH_2CH_2$ | H | c-Pr(1-CN) | C(=O)OEt | Cl | $CH_2OMe$ | O |
| C-3880 | H | single bond | Me | c-Pr(1-CN) | C(=O)OEt | Me | $CH_2OMe$ | O |
| C-3881 | Me | single bond | H | c-Pr(1-CN) | C(=O)OEt | Me | $CH_2OMe$ | O |
| C-3882 | Me(R) | single bond | H | c-Pr(1-CN) | C(=O)OEt | Me | $CH_2OMe$ | O |
| C-3883 | Me(S) | single bond | H | c-Pr(1-CN) | C(=O)OEt | Me | $CH_2OMe$ | O |
| C-3884 | H | $CH_2$ | Me | c-Pr(1-CN) | C(=O)OEt | Me | $CH_2OMe$ | O |
| C-3885 | Me | $CH_2$ | H | c-Pr(1-CN) | C(=O)OEt | Me | $CH_2OMe$ | O |
| C-3886 | H | CH(Me) | H | c-Pr(1-CN) | C(=O)OEt | Me | $CH_2OMe$ | O |
| C-3887 | H | $CH_2CH_2$ | Me | c-Pr(1-CN) | C(=O)OEt | Me | $CH_2OMe$ | O |
| C-3888 | Me | $CH_2CH_2$ | H | c-Pr(1-CN) | C(=O)OEt | Me | $CH_2OMe$ | O |
| C-3889 | H | single bond | Me | c-Pr(1-CN) | C(=O)OEt | Cl | $CH_2CN$ | O |
| C-3890 | Me | single bond | H | c-Pr(1-CN) | C(=O)OEt | Cl | $CH_2CN$ | O |
| C-3891 | Me(R) | single bond | H | c-Pr(1-CN) | C(=O)OEt | Cl | $CH_2CN$ | O |
| C-3892 | Me(S) | single bond | H | c-Pr(1-CN) | C(=O)OEt | Cl | $CH_2CN$ | O |
| C-3893 | H | $CH_2$ | Me | c-Pr(1-CN) | C(=O)OEt | Cl | $CH_2CN$ | O |
| C-3894 | Me | $CH_2$ | H | c-Pr(1-CN) | C(=O)OEt | Cl | $CH_2CN$ | O |
| C-3895 | H | CH(Me) | H | c-Pr(1-CN) | C(=O)OEt | Cl | $CH_2CN$ | O |
| C-3896 | H | $CH_2CH_2$ | Me | c-Pr(1-CN) | C(=O)OEt | Cl | $CH_2CN$ | O |
| C-3897 | Me | $CH_2CH_2$ | H | c-Pr(1-CN) | C(=O)OEt | Cl | $CH_2CN$ | O |
| C-3898 | H | single bond | Me | c-Pr(1-CN) | C(=O)OEt | Me | $CH_2CN$ | O |
| C-3899 | Me | single bond | H | c-Pr(1-CN) | C(=O)OEt | Me | $CH_2CN$ | O |
| C-3900 | Me(R) | single bond | H | c-Pr(1-CN) | C(=O)OEt | Me | $CH_2CN$ | O |
| C-3901 | Me(S) | single bond | H | c-Pr(1-CN) | C(=O)OEt | Me | $CH_2CN$ | O |
| C-3902 | H | $CH_2$ | Me | c-Pr(1-CN) | C(=O)OEt | Me | $CH_2CN$ | O |
| C-3903 | Me | $CH_2$ | H | c-Pr(1-CN) | C(=O)OEt | Me | $CH_2CN$ | O |
| C-3904 | H | CH(Me) | H | c-Pr(1-CN) | C(=O)OEt | Me | $CH_2CN$ | O |
| C-3905 | H | $CH_2CH_2$ | Me | c-Pr(1-CN) | C(=O)OEt | Me | $CH_2CN$ | O |
| C-3906 | Me | $CH_2CH_2$ | H | c-Pr(1-CN) | C(=O)OEt | Me | $CH_2CN$ | O |
| C-3907 | H | single bond | Me | c-Pr(1-CN) | C(=O)OEt | Cl | C(=O)Me | O |
| C-3908 | Me | single bond | H | c-Pr(1-CN) | C(=O)OEt | Cl | C(=O)Me | O |
| C-3909 | Me(R) | single bond | H | c-Pr(1-CN) | C(=O)OEt | Cl | C(=O)Me | O |
| C-3910 | Me(S) | single bond | H | c-Pr(1-CN) | C(=O)OEt | Cl | C(=O)Me | O |

TABLE 316

| Compound Number | Y | W | Z | $R^1$ | $R^2$ | $R^3$ | $R^{10}$ | A |
|---|---|---|---|---|---|---|---|---|
| C-3911 | H | $CH_2$ | Me | c-Pr(1-CN) | C(=O)OEt | Cl | C(=O)Me | O |
| C-3912 | Me | $CH_2$ | H | c-Pr(1-CN) | C(=O)OEt | Cl | C(=O)Me | O |
| C-3913 | H | CH(Me) | H | c-Pr(1-CN) | C(=O)OEt | Cl | C(=O)Me | O |
| C-3914 | H | $CH_2CH_2$ | Me | c-Pr(1-CN) | C(=O)OEt | Cl | C(=O)Me | O |
| C-3915 | Me | $CH_2CH_2$ | H | c-Pr(1-CN) | C(=O)OEt | Cl | C(=O)Me | O |
| C-3916 | H | single bond | Me | c-Pr(1-CN) | C(=O)OEt | Me | C(=O)Me | O |
| C-3917 | Me | single bond | H | c-Pr(1-CN) | C(=O)OEt | Me | C(=O)Me | O |
| C-3918 | Me(R) | single bond | H | c-Pr(1-CN) | C(=O)OEt | Me | C(=O)Me | O |
| C-3919 | Me(S) | single bond | H | c-Pr(1-CN) | C(=O)OEt | Me | C(=O)Me | O |
| C-3920 | H | $CH_2$ | Me | c-Pr(1-CN) | C(=O)OEt | Me | C(=O)Me | O |
| C-3921 | Me | $CH_2$ | H | c-Pr(1-CN) | C(=O)OEt | Me | C(=O)Me | O |
| C-3922 | H | CH(Me) | H | c-Pr(1-CN) | C(=O)OEt | Me | C(=O)Me | O |
| C-3923 | H | $CH_2CH_2$ | Me | c-Pr(1-CN) | C(=O)OEt | Me | C(=O)Me | O |
| C-3924 | Me | $CH_2CH_2$ | H | c-Pr(1-CN) | C(=O)OEt | Me | C(=O)Me | O |
| C-3925 | H | single bond | Me | c-Pr(1-CN) | $S(=O)_2Me$ | Cl | Me | O |
| C-3926 | Me | single bond | H | c-Pr(1-CN) | $S(=O)_2Me$ | Cl | Me | O |
| C-3927 | Me(R) | single bond | H | c-Pr(1-CN) | $S(=O)_2Me$ | Cl | Me | O |
| C-3928 | Me(S) | single bond | H | c-Pr(1-CN) | $S(=O)_2Me$ | Cl | Me | O |
| C-3929 | H | $CH_2$ | Me | c-Pr(1-CN) | $S(=O)_2Me$ | Cl | Me | O |
| C-3930 | Me | $CH_2$ | H | c-Pr(1-CN) | $S(=O)_2Me$ | Cl | Me | O |
| C-3931 | H | CH(Me) | H | c-Pr(1-CN) | $S(=O)_2Me$ | Cl | Me | O |
| C-3932 | H | $CH_2CH_2$ | Me | c-Pr(1-CN) | $S(=O)_2Me$ | Cl | Me | O |
| C-3933 | Me | $CH_2CH_2$ | H | c-Pr(1-CN) | $S(=O)_2Me$ | Cl | Me | O |
| C-3934 | H | single bond | Me | c-Pr(1-CN) | $S(=O)_2Me$ | Me | Me | O |
| C-3935 | Me | single bond | H | c-Pr(1-CN) | $S(=O)_2Me$ | Me | Me | O |
| C-3936 | Me(R) | single bond | H | c-Pr(1-CN) | $S(=O)_2Me$ | Me | Me | O |
| C-3937 | Me(S) | single bond | H | c-Pr(1-CN) | $S(=O)_2Me$ | Me | Me | O |
| C-3938 | H | $CH_2$ | Me | c-Pr(1-CN) | $S(=O)_2Me$ | Me | Me | O |
| C-3939 | Me | $CH_2$ | H | c-Pr(1-CN) | $S(=O)_2Me$ | Me | Me | O |
| C-3940 | H | CH(Me) | H | c-Pr(1-CN) | $S(=O)_2Me$ | Me | Me | O |
| C-3941 | H | $CH_2CH_2$ | Me | c-Pr(1-CN) | $S(=O)_2Me$ | Me | Me | O |
| C-3942 | Me | $CH_2CH_2$ | H | c-Pr(1-CN) | $S(=O)_2Me$ | Me | Me | O |
| C-3943 | H | single bond | Me | c-Pr(1-CN) | $S(=O)_2Me$ | Cl | Et | O |
| C-3944 | Me | single bond | H | c-Pr(1-CN) | $S(=O)_2Me$ | Cl | Et | O |
| C-3945 | Me(R) | single bond | H | c-Pr(1-CN) | $S(=O)_2Me$ | Cl | Et | O |
| C-3946 | Me(S) | single bond | H | c-Pr(1-CN) | $S(=O)_2Me$ | Cl | Et | O |
| C-3947 | H | $CH_2$ | Me | c-Pr(1-CN) | $S(=O)_2Me$ | Cl | Et | O |
| C-3948 | Me | $CH_2$ | H | c-Pr(1-CN) | $S(=O)_2Me$ | Cl | Et | O |
| C-3949 | H | CH(Me) | H | c-Pr(1-CN) | $S(=O)_2Me$ | Cl | Et | O |
| C-3950 | H | $CH_2CH_2$ | Me | c-Pr(1-CN) | $S(=O)_2Me$ | Cl | Et | O |
| C-3951 | Me | $CH_2CH_2$ | H | c-Pr(1-CN) | $S(=O)_2Me$ | Cl | Et | O |
| C-3952 | H | single bond | Me | c-Pr(1-CN) | $S(=O)_2Me$ | Me | Et | O |
| C-3953 | Me | single bond | H | c-Pr(1-CN) | $S(=O)_2Me$ | Me | Et | O |
| C-3954 | Me(R) | single bond | H | c-Pr(1-CN) | $S(=O)_2Me$ | Me | Et | O |

TABLE 317

| Compound Number | Y | W | Z | $R^1$ | $R^2$ | $R^3$ | $R^{10}$ | A |
|---|---|---|---|---|---|---|---|---|
| C-3955 | Me(S) | single bond | H | c-Pr(1-CN) | $S(=O)_2Me$ | Me | Et | O |
| C-3956 | H | $CH_2$ | Me | c-Pr(1-CN) | $S(=O)_2Me$ | Me | Et | O |
| C-3957 | Me | $CH_2$ | H | c-Pr(1-CN) | $S(=O)_2Me$ | Me | Et | O |
| C-3958 | H | CH(Me) | H | c-Pr(1-CN) | $S(=O)_2Me$ | Me | Et | O |
| C-3959 | H | $CH_2CH_2$ | Me | c-Pr(1-CN) | $S(=O)_2Me$ | Me | Et | O |
| C-3960 | Me | $CH_2CH_2$ | H | c-Pr(1-CN) | $S(=O)_2Me$ | Me | Et | O |
| C-3961 | H | single bond | Me | c-Pr(1-CN) | $S(=O)_2Me$ | Cl | $CH_2CF_3$ | O |
| C-3962 | Me | single bond | H | c-Pr(1-CN) | $S(=O)_2Me$ | Cl | $CH_2CF_3$ | O |
| C-3963 | Me(R) | single bond | H | c-Pr(1-CN) | $S(=O)_2Me$ | Cl | $CH_2CF_3$ | O |
| C-3964 | Me(S) | single bond | H | c-Pr(1-CN) | $S(=O)_2Me$ | Cl | $CH_2CF_3$ | O |
| C-3965 | H | $CH_2$ | Me | c-Pr(1-CN) | $S(=O)_2Me$ | Cl | $CH_2CF_3$ | O |
| C-3966 | Me | $CH_2$ | H | c-Pr(1-CN) | $S(=O)_2Me$ | Cl | $CH_2CF_3$ | O |
| C-3967 | H | CH(Me) | H | c-Pr(1-CN) | $S(=O)_2Me$ | Cl | $CH_2CF_3$ | O |
| C-3968 | H | $CH_2CH_2$ | Me | c-Pr(1-CN) | $S(=O)_2Me$ | Cl | $CH_2CF_3$ | O |
| C-3969 | Me | $CH_2CH_2$ | H | c-Pr(1-CN) | $S(=O)_2Me$ | Cl | $CH_2CF_3$ | O |
| C-3970 | H | single bond | Me | c-Pr(1-CN) | $S(=O)_2Me$ | Me | $CH_2CF_3$ | O |
| C-3971 | Me | single bond | H | c-Pr(1-CN) | $S(=O)_2Me$ | Me | $CH_2CF_3$ | O |
| C-3972 | Me(R) | single bond | H | c-Pr(1-CN) | $S(=O)_2Me$ | Me | $CH_2CF_3$ | O |
| C-3973 | Me(S) | single bond | H | c-Pr(1-CN) | $S(=O)_2Me$ | Me | $CH_2CF_3$ | O |
| C-3974 | H | $CH_2$ | Me | c-Pr(1-CN) | $S(=O)_2Me$ | Me | $CH_2CF_3$ | O |
| C-3975 | Me | $CH_2$ | H | c-Pr(1-CN) | $S(=O)_2Me$ | Me | $CH_2CF_3$ | O |

TABLE 317-continued

| Compound Number | Y | W | Z | $R^1$ | $R^2$ | $R^3$ | $R^{10}$ | A |
|---|---|---|---|---|---|---|---|---|
| C-3976 | H | CH(Me) | H | c-Pr(1-CN) | $S(=O)_2Me$ | Me | $CH_2CF_3$ | O |
| C-3977 | H | $CH_2CH_2$ | Me | c-Pr(1-CN) | $S(=O)_2Me$ | Me | $CH_2CF_3$ | O |
| C-3978 | Me | $CH_2CH_2$ | H | c-Pr(1-CN) | $S(=O)_2Me$ | Me | $CH_2CF_3$ | O |
| C-3979 | H | single bond | Me | c-Pr(1-CN) | $S(=O)_2Me$ | Cl | $CH_2OMe$ | O |
| C-3980 | Me | single bond | H | c-Pr(1-CN) | $S(=O)_2Me$ | Cl | $CH_2OMe$ | O |
| C-3981 | Me(R) | single bond | H | c-Pr(1-CN) | $S(=O)_2Me$ | Cl | $CH_2OMe$ | O |
| C-3982 | Me(S) | single bond | H | c-Pr(1-CN) | $S(=O)_2Me$ | Cl | $CH_2OMe$ | O |
| C-3983 | H | $CH_2$ | Me | c-Pr(1-CN) | $S(=O)_2Me$ | Cl | $CH_2OMe$ | O |
| C-3984 | Me | $CH_2$ | H | c-Pr(1-CN) | $S(=O)_2Me$ | Cl | $CH_2OMe$ | O |
| C-3985 | H | CH(Me) | H | c-Pr(1-CN) | $S(=O)_2Me$ | Cl | $CH_2OMe$ | O |
| C-3986 | H | $CH_2CH_2$ | Me | c-Pr(1-CN) | $S(=O)_2Me$ | Cl | $CH_2OMe$ | O |
| C-3987 | Me | $CH_2CH_2$ | H | c-Pr(1-CN) | $S(=O)_2Me$ | Cl | $CH_2OMe$ | O |
| C-3988 | H | single bond | Me | c-Pr(1-CN) | $S(=O)_2Me$ | Me | $CH_2OMe$ | O |
| C-3989 | Me | single bond | H | c-Pr(1-CN) | $S(=O)_2Me$ | Me | $CH_2OMe$ | O |
| C-3990 | Me(R) | single bond | H | c-Pr(1-CN) | $S(=O)_2Me$ | Me | $CH_2OMe$ | O |
| C-3991 | Me(S) | single bond | H | c-Pr(1-CN) | $S(=O)_2Me$ | Me | $CH_2OMe$ | O |
| C-3992 | H | $CH_2$ | Me | c-Pr(1-CN) | $S(=O)_2Me$ | Me | $CH_2OMe$ | O |
| C-3993 | Me | $CH_2$ | H | c-Pr(1-CN) | $S(=O)_2Me$ | Me | $CH_2OMe$ | O |
| C-3994 | H | CH(Me) | H | c-Pr(1-CN) | $S(=O)_2Me$ | Me | $CH_2OMe$ | O |
| C-3995 | H | $CH_2CH_2$ | Me | c-Pr(1-CN) | $S(=O)_2Me$ | Me | $CH_2OMe$ | O |
| C-3996 | Me | $CH_2CH_2$ | H | c-Pr(1-CN) | $S(=O)_2Me$ | Me | $CH_2OMe$ | O |
| C-3997 | H | single bond | Me | c-Pr(1-CN) | $S(=O)_2Me$ | Cl | $CH_2CN$ | O |
| C-3998 | Me | single bond | H | c-Pr(1-CN) | $S(=O)_2Me$ | Cl | $CH_2CN$ | O |

TABLE 318

| Compound Number | Y | W | Z | $R^1$ | $R^2$ | $R^3$ | $R^{10}$ | A |
|---|---|---|---|---|---|---|---|---|
| C-3999 | Me(R) | single bond | H | c-Pr(1-CN) | $S(=O)_2Me$ | Cl | $CH_2CN$ | O |
| C-4000 | Me(S) | single bond | H | c-Pr(1-CN) | $S(=O)_2Me$ | Cl | $CH_2CN$ | O |
| C-4001 | H | $CH_2$ | Me | c-Pr(1-CN) | $S(=O)_2Me$ | Cl | $CH_2CN$ | O |
| C-4002 | Me | $CH_2$ | H | c-Pr(1-CN) | $S(=O)_2Me$ | Cl | $CH_2CN$ | O |
| C-4003 | H | CH(Me) | H | c-Pr(1-CN) | $S(=O)_2Me$ | Cl | $CH_2CN$ | O |
| C-4004 | H | $CH_2CH_2$ | Me | c-Pr(1-CN) | $S(=O)_2Me$ | Cl | $CH_2CN$ | O |
| C-4005 | Me | $CH_2CH_2$ | H | c-Pr(1-CN) | $S(=O)_2Me$ | Cl | $CH_2CN$ | O |
| C-4006 | H | single bond | Me | c-Pr(1-CN) | $S(=O)_2Me$ | Me | $CH_2CN$ | O |
| C-4007 | Me | single bond | H | c-Pr(1-CN) | $S(=O)_2Me$ | Me | $CH_2CN$ | O |
| C-4008 | Me(R) | single bond | H | c-Pr(1-CN) | $S(=O)_2Me$ | Me | $CH_2CN$ | O |
| C-4009 | Me(S) | single bond | H | c-Pr(1-CN) | $S(=O)_2Me$ | Me | $CH_2CN$ | O |
| C-4010 | H | $CH_2$ | Me | c-Pr(1-CN) | $S(=O)_2Me$ | Me | $CH_2CN$ | O |
| C-4011 | Me | $CH_2$ | H | c-Pr(1-CN) | $S(=O)_2Me$ | Me | $CH_2CN$ | O |
| C-4012 | H | CH(Me) | H | c-Pr(1-CN) | $S(=O)_2Me$ | Me | $CH_2CN$ | O |
| C-4013 | H | $CH_2CH_2$ | Me | c-Pr(1-CN) | $S(=O)_2Me$ | Me | $CH_2CN$ | O |
| C-4014 | Me | $CH_2CH_2$ | H | c-Pr(1-CN) | $S(=O)_2Me$ | Me | $CH_2CN$ | O |
| C-4015 | H | single bond | Me | c-Pr(1-CN) | $S(=O)_2Me$ | Cl | C(=O)Me | O |
| C-4016 | Me | single bond | H | c-Pr(1-CN) | $S(=O)_2Me$ | Cl | C(=O)Me | O |
| C-4017 | Me(R) | single bond | H | c-Pr(1-CN) | $S(=O)_2Me$ | Cl | C(=O)Me | O |
| C-4018 | Me(S) | single bond | H | c-Pr(1-CN) | $S(=O)_2Me$ | Cl | C(=O)Me | O |
| C-4019 | H | $CH_2$ | Me | c-Pr(1-CN) | $S(=O)_2Me$ | Cl | C(=O)Me | O |
| C-4020 | Me | $CH_2$ | H | c-Pr(1-CN) | $S(=O)_2Me$ | Cl | C(=O)Me | O |
| C-4021 | H | CH(Me) | H | c-Pr(1-CN) | $S(=O)_2Me$ | Cl | C(=O)Me | O |
| C-4022 | H | $CH_2CH_2$ | Me | c-Pr(1-CN) | $S(=O)_2Me$ | Cl | C(=O)Me | O |
| C-4023 | Me | $CH_2CH_2$ | H | c-Pr(1-CN) | $S(=O)_2Me$ | Cl | C(=O)Me | O |
| C-4024 | H | single bond | Me | c-Pr(1-CN) | $S(=O)_2Me$ | Me | C(=O)Me | O |
| C-4025 | Me | single bond | H | c-Pr(1-CN) | $S(=O)_2Me$ | Me | C(=O)Me | O |
| C-4026 | Me(R) | single bond | H | c-Pr(1-CN) | $S(=O)_2Me$ | Me | C(=O)Me | O |
| C-4027 | Me(S) | single bond | H | c-Pr(1-CN) | $S(=O)_2Me$ | Me | C(=O)Me | O |
| C-4028 | H | $CH_2$ | Me | c-Pr(1-CN) | $S(=O)_2Me$ | Me | C(=O)Me | O |
| C-4029 | Me | $CH_2$ | H | c-Pr(1-CN) | $S(=O)_2Me$ | Me | C(=O)Me | O |
| C-4030 | H | CH(Me) | H | c-Pr(1-CN) | $S(=O)_2Me$ | Me | C(=O)Me | O |
| C-4031 | H | $CH_2CH_2$ | Me | c-Pr(1-CN) | $S(=O)_2Me$ | Me | C(=O)Me | O |
| C-4032 | Me | $CH_2CH_2$ | H | c-Pr(1-CN) | $S(=O)_2Me$ | Me | C(=O)Me | O |
| C-4033 | H | single bond | Me | c-Pr(1-CN) | $S(=O)_2CF_3$ | Cl | Me | O |
| C-4034 | Me | single bond | H | c-Pr(1-CN) | $S(=O)_2CF_3$ | Cl | Me | O |
| C-4035 | Me(R) | single bond | H | c-Pr(1-CN) | $S(=O)_2CF_3$ | Cl | Me | O |
| C-4036 | Me(S) | single bond | H | c-Pr(1-CN) | $S(=O)_2CF_3$ | Cl | Me | O |
| C-4037 | H | $CH_2$ | Me | c-Pr(1-CN) | $S(=O)_2CF_3$ | Cl | Me | O |
| C-4038 | Me | $CH_2$ | H | c-Pr(1-CN) | $S(=O)_2CF_3$ | Cl | Me | O |
| C-4039 | H | CH(Me) | H | c-Pr(1-CN) | $S(=O)_2CF_3$ | Cl | Me | O |

TABLE 318-continued

| Compound Number | Y | W | Z | $R^1$ | $R^2$ | $R^3$ | $R^{10}$ | A |
|---|---|---|---|---|---|---|---|---|
| C-4040 | H | $CH_2CH_2$ | Me | c-Pr(1-CN) | $S(=O)_2CF_3$ | Cl | Me | O |
| C-4041 | Me | $CH_2CH_2$ | H | c-Pr(1-CN) | $S(=O)_2CF_3$ | Cl | Me | O |
| C-4042 | H | single bond | Me | c-Pr(1-CN) | $S(=O)_2CF_3$ | Me | Me | O |

TABLE 319

| Compound Number | Y | W | Z | $R^1$ | $R^2$ | $R^3$ | $R^{10}$ | A |
|---|---|---|---|---|---|---|---|---|
| C-4043 | Me | single bond | H | c-Pr(1-CN) | $S(=O)_2CF_3$ | Me | Me | O |
| C-4044 | Me(R) | single bond | H | c-Pr(1-CN) | $S(=O)_2CF_3$ | Me | Me | O |
| C-4045 | Me(S) | single bond | H | c-Pr(1-CN) | $S(=O)_2CF_3$ | Me | Me | O |
| C-4046 | H | $CH_2$ | Me | c-Pr(1-CN) | $S(=O)_2CF_3$ | Me | Me | O |
| C-4047 | Me | $CH_2$ | H | c-Pr(1-CN) | $S(=O)_2CF_3$ | Me | Me | O |
| C-4048 | H | CH(Me) | H | c-Pr(1-CN) | $S(=O)_2CF_3$ | Me | Me | O |
| C-4049 | H | $CH_2CH_2$ | Me | c-Pr(1-CN) | $S(=O)_2CF_3$ | Me | Me | O |
| C-4050 | Me | $CH_2CH_2$ | H | c-Pr(1-CN) | $S(=O)_2CF_3$ | Me | Me | O |
| C-4051 | H | single bond | Me | c-Pr(1-CN) | $S(=O)_2CF_3$ | Cl | Et | O |
| C-4052 | Me | single bond | H | c-Pr(1-CN) | $S(=O)_2CF_3$ | Cl | Et | O |
| C-4053 | Me(R) | single bond | H | c-Pr(1-CN) | $S(=O)_2CF_3$ | Cl | Et | O |
| C-4054 | Me(S) | single bond | H | c-Pr(1-CN) | $S(=O)_2CF_3$ | Cl | Et | O |
| C-4055 | H | $CH_2$ | Me | c-Pr(1-CN) | $S(=O)_2CF_3$ | Cl | Et | O |
| C-4056 | Me | $CH_2$ | H | c-Pr(1-CN) | $S(=O)_2CF_3$ | Cl | Et | O |
| C-4057 | H | CH(Me) | H | c-Pr(1-CN) | $S(=O)_2CF_3$ | Cl | Et | O |
| C-4058 | H | $CH_2CH_2$ | Me | c-Pr(1-CN) | $S(=O)_2CF_3$ | Cl | Et | O |
| C-4059 | Me | $CH_2CH_2$ | H | c-Pr(1-CN) | $S(=O)_2CF_3$ | Cl | Et | O |
| C-4060 | H | single bond | Me | c-Pr(1-CN) | $S(=O)_2CF_3$ | Me | Et | O |
| C-4061 | Me | single bond | H | c-Pr(1-CN) | $S(=O)_2CF_3$ | Me | Et | O |
| C-4062 | Me(R) | single bond | H | c-Pr(1-CN) | $S(=O)_2CF_3$ | Me | Et | O |
| C-4063 | Me(S) | single bond | H | c-Pr(1-CN) | $S(=O)_2CF_3$ | Me | Et | O |
| C-4064 | H | $CH_2$ | Me | c-Pr(1-CN) | $S(=O)_2CF_3$ | Me | Et | O |
| C-4065 | Me | $CH_2$ | H | c-Pr(1-CN) | $S(=O)_2CF_3$ | Me | Et | O |
| C-4066 | H | CH(Me) | H | c-Pr(1-CN) | $S(=O)_2CF_3$ | Me | Et | O |
| C-4067 | H | $CH_2CH_2$ | Me | c-Pr(1-CN) | $S(=O)_2CF_3$ | Me | Et | O |
| C-4068 | Me | $CH_2CH_2$ | H | c-Pr(1-CN) | $S(=O)_2CF_3$ | Me | Et | O |
| C-4069 | H | single bond | Me | c-Pr(1-CN) | $S(=O)_2CF_3$ | Cl | $CH_2CF_3$ | O |
| C-4070 | Me | single bond | H | c-Pr(1-CN) | $S(=O)_2CF_3$ | Cl | $CH_2CF_3$ | O |
| C-4071 | Me(R) | single bond | H | c-Pr(1-CN) | $S(=O)_2CF_3$ | Cl | $CH_2CF_3$ | O |
| C-4072 | Me(S) | single bond | H | c-Pr(1-CN) | $S(=O)_2CF_3$ | Cl | $CH_2CF_3$ | O |
| C-4073 | H | $CH_2$ | Me | c-Pr(1-CN) | $S(=O)_2CF_3$ | Cl | $CH_2CF_3$ | O |
| C-4074 | Me | $CH_2$ | H | c-Pr(1-CN) | $S(=O)_2CF_3$ | Cl | $CH_2CF_3$ | O |
| C-4075 | H | CH(Me) | H | c-Pr(1-CN) | $S(=O)_2CF_3$ | Cl | $CH_2CF_3$ | O |
| C-4076 | H | $CH_2CH_2$ | Me | c-Pr(1-CN) | $S(=O)_2CF_3$ | Cl | $CH_2CF_3$ | O |
| C-4077 | Me | $CH_2CH_2$ | H | c-Pr(1-CN) | $S(=O)_2CF_3$ | Cl | $CH_2CF_3$ | O |
| C-4078 | H | single bond | Me | c-Pr(1-CN) | $S(=O)_2CF_3$ | Me | $CH_2CF_3$ | O |
| C-4079 | Me | single bond | H | c-Pr(1-CN) | $S(=O)_2CF_3$ | Me | $CH_2CF_3$ | O |
| C-4080 | Me(R) | single bond | H | c-Pr(1-CN) | $S(=O)_2CF_3$ | Me | $CH_2CF_3$ | O |
| C-4081 | Me(S) | single bond | H | c-Pr(1-CN) | $S(=O)_2CF_3$ | Me | $CH_2CF_3$ | O |
| C-4082 | H | $CH_2$ | Me | c-Pr(1-CN) | $S(=O)_2CF_3$ | Me | $CH_2CF_3$ | O |
| C-4083 | Me | $CH_2$ | H | c-Pr(1-CN) | $S(=O)_2CF_3$ | Me | $CH_2CF_3$ | O |
| C-4084 | H | CH(Me) | H | c-Pr(1-CN) | $S(=O)_2CF_3$ | Me | $CH_2CF_3$ | O |
| C-4085 | H | $CH_2CH_2$ | Me | c-Pr(1-CN) | $S(=O)_2CF_3$ | Me | $CH_2CF_3$ | O |
| C-4086 | Me | $CH_2CH_2$ | H | c-Pr(1-CN) | $S(=O)_2CF_3$ | Me | $CH_2CF_3$ | O |

TABLE 320

| Compound Number | Y | W | Z | $R^1$ | $R^2$ | $R^3$ | $R^{10}$ | A |
|---|---|---|---|---|---|---|---|---|
| C-4087 | H | single bond | Me | c-Pr(1-CN) | $S(=O)_2CF_3$ | Cl | $CH_2OMe$ | O |
| C-4088 | Me | single bond | H | c-Pr(1-CN) | $S(=O)_2CF_3$ | Cl | $CH_2OMe$ | O |
| C-4089 | Me(R) | single bond | H | c-Pr(1-CN) | $S(=O)_2CF_3$ | Cl | $CH_2OMe$ | O |
| C-4090 | Me(S) | single bond | H | c-Pr(1-CN) | $S(=O)_2CF_3$ | Cl | $CH_2OMe$ | O |
| C-4091 | H | $CH_2$ | Me | c-Pr(1-CN) | $S(=O)_2CF_3$ | Cl | $CH_2OMe$ | O |
| C-4092 | Me | $CH_2$ | H | c-Pr(1-CN) | $S(=O)_2CF_3$ | Cl | $CH_2OMe$ | O |
| C-4093 | H | CH(Me) | H | c-Pr(1-CN) | $S(=O)_2CF_3$ | Cl | $CH_2OMe$ | O |
| C-4094 | H | $CH_2CH_2$ | Me | c-Pr(1-CN) | $S(=O)_2CF_3$ | Cl | $CH_2OMe$ | O |
| C-4095 | Me | $CH_2CH_2$ | H | c-Pr(1-CN) | $S(=O)_2CF_3$ | Cl | $CH_2OMe$ | O |

TABLE 320-continued

| Compound Number | Y | W | Z | $R^1$ | $R^2$ | $R^3$ | $R^{10}$ | A |
|---|---|---|---|---|---|---|---|---|
| C-4096 | H | single bond | Me | c-Pr(1-CN) | $S(=O)_2CF_3$ | Me | $CH_2OMe$ | O |
| C-4097 | Me | single bond | H | c-Pr(1-CN) | $S(=O)_2CF_3$ | Me | $CH_2OMe$ | O |
| C-4098 | Me(R) | single bond | H | c-Pr(1-CN) | $S(=O)_2CF_3$ | Me | $CH_2OMe$ | O |
| C-4099 | Me(S) | single bond | H | c-Pr(1-CN) | $S(=O)_2CF_3$ | Me | $CH_2OMe$ | O |
| C-4100 | H | $CH_2$ | Me | c-Pr(1-CN) | $S(=O)_2CF_3$ | Me | $CH_2OMe$ | O |
| C-4101 | Me | $CH_2$ | H | c-Pr(1-CN) | $S(=O)_2CF_3$ | Me | $CH_2OMe$ | O |
| C-4102 | H | CH(Me) | H | c-Pr(1-CN) | $S(=O)_2CF_3$ | Me | $CH_2OMe$ | O |
| C-4103 | H | $CH_2CH_2$ | Me | c-Pr(1-CN) | $S(=O)_2CF_3$ | Me | $CH_2OMe$ | O |
| C-4104 | Me | $CH_2CH_2$ | H | c-Pr(1-CN) | $S(=O)_2CF_3$ | Me | $CH_2OMe$ | O |
| C-4105 | H | single bond | Me | c-Pr(1-CN) | $S(=O)_2CF_3$ | Cl | $CH_2CN$ | O |
| C-4106 | Me | single bond | H | c-Pr(1-CN) | $S(=O)_2CF_3$ | Cl | $CH_2CN$ | O |
| C-4107 | Me(R) | single bond | H | c-Pr(1-CN) | $S(=O)_2CF_3$ | Cl | $CH_2CN$ | O |
| C-4108 | Me(S) | single bond | H | c-Pr(1-CN) | $S(=O)_2CF_3$ | Cl | $CH_2CN$ | O |
| C-4109 | H | $CH_2$ | Me | c-Pr(1-CN) | $S(=O)_2CF_3$ | Cl | $CH_2CN$ | O |
| C-4110 | Me | $CH_2$ | H | c-Pr(1-CN) | $S(=O)_2CF_3$ | Cl | $CH_2CN$ | O |
| C-4111 | H | CH(Me) | H | c-Pr(1-CN) | $S(=O)_2CF_3$ | Cl | $CH_2CN$ | O |
| C-4112 | H | $CH_2CH_2$ | Me | c-Pr(1-CN) | $S(=O)_2CF_3$ | Cl | $CH_2CN$ | O |
| C-4113 | Me | $CH_2CH_2$ | H | c-Pr(1-CN) | $S(=O)_2CF_3$ | Cl | $CH_2CN$ | O |
| C-4114 | H | single bond | Me | c-Pr(1-CN) | $S(=O)_2CF_3$ | Me | $CH_2CN$ | O |
| C-4115 | Me | single bond | H | c-Pr(1-CN) | $S(=O)_2CF_3$ | Me | $CH_2CN$ | O |
| C-4116 | Me(R) | single bond | H | c-Pr(1-CN) | $S(=O)_2CF_3$ | Me | $CH_2CN$ | O |
| C-4117 | Me(S) | single bond | H | c-Pr(1-CN) | $S(=O)_2CF_3$ | Me | $CH_2CN$ | O |
| C-4118 | H | $CH_2$ | Me | c-Pr(1-CN) | $S(=O)_2CF_3$ | Me | $CH_2CN$ | O |
| C-4119 | Me | $CH_2$ | H | c-Pr(1-CN) | $S(=O)_2CF_3$ | Me | $CH_2CN$ | O |
| C-4120 | H | CH(Me) | H | c-Pr(1-CN) | $S(=O)_2CF_3$ | Me | $CH_2CN$ | O |
| C-4121 | H | $CH_2CH_2$ | Me | c-Pr(1-CN) | $S(=O)_2CF_3$ | Me | $CH_2CN$ | O |
| C-4122 | Me | $CH_2CH_2$ | H | c-Pr(1-CN) | $S(=O)_2CF_3$ | Me | $CH_2CN$ | O |
| C-4123 | H | single bond | Me | c-Pr(1-CN) | $S(=O)_2CF_3$ | Cl | C(=O)Me | O |
| C-4124 | Me | single bond | H | c-Pr(1-CN) | $S(=O)_2CF_3$ | Cl | C(=O)Me | O |
| C-4125 | Me(R) | single bond | H | c-Pr(1-CN) | $S(=O)_2CF_3$ | Cl | C(=O)Me | O |
| C-4126 | Me(S) | single bond | H | c-Pr(1-CN) | $S(=O)_2CF_3$ | Cl | C(=O)Me | O |
| C-4127 | H | $CH_2$ | Me | c-Pr(1-CN) | $S(=O)_2CF_3$ | Cl | C(=O)Me | O |
| C-4128 | Me | $CH_2$ | H | c-Pr(1-CN) | $S(=O)_2CF_3$ | Cl | C(=O)Me | O |
| C-4129 | H | CH(Me) | H | c-Pr(1-CN) | $S(=O)_2CF_3$ | Cl | C(=O)Me | O |
| C-4130 | H | $CH_2CH_2$ | Me | c-Pr(1-CN) | $S(=O)_2CF_3$ | Cl | C(=O)Me | O |

TABLE 321

| Compound Number | Y | W | Z | $R^1$ | $R^2$ | $R^3$ | $R^{10}$ | A |
|---|---|---|---|---|---|---|---|---|
| C-4131 | Me | $CH_2CH_2$ | H | c-Pr(1-CN) | $S(=Ol)_2CF_3$ | Cl | C(=O)Me | O |
| C-4132 | H | single bond | Me | c-Pr(1-CN) | $S(=O)_2CF_3$ | Me | C(=O)Me | O |
| C-4133 | Me | single bond | H | c-Pr(1-CN) | $S(=O)_2CF_3$ | Me | C(=O)Me | O |
| C-4134 | Me(R) | single bond | H | c-Pr(1-CN) | $S(=O)_2CF_3$ | Me | C(=O)Me | O |
| C-4135 | Me(S) | single bond | H | c-Pr(1-CN) | $S(=O)_2CF_3$ | Me | C(=O)Me | O |
| C-4136 | H | $CH_2$ | Me | c-Pr(1-CN) | $S(=O)_2CF_3$ | Me | C(=O)Me | O |
| C-4137 | Me | $CH_2$ | H | c-Pr(1-CN) | $S(=O)_2CF_3$ | Me | C(=O)Me | O |
| C-4138 | H | CH(Me) | H | c-Pr(1-CN) | $S(=O)_2CF_3$ | Me | C(=O)Me | O |
| C-4139 | H | $CH_2CH_2$ | Me | c-Pr(1-CN) | $S(=O)_2CF_3$ | Me | C(=O)Me | O |
| C-4140 | Me | $CH_2CH_2$ | H | c-Pr(1-CN) | $S(=O)_2CF_3$ | Me | C(=O)Me | O |
| C-4141 | H | single bond | Me | $CH_2CF_3$ | Me | Cl | H | O |
| C-4142 | Me | single bond | H | $CH_2CF_3$ | Me | Cl | H | O |
| C-4143 | Me(R) | single bond | H | $CH_2CF_3$ | Me | Cl | H | O |
| C-4144 | Me(S) | single bond | H | $CH_2CF_3$ | Me | Cl | H | O |
| C-4145 | H | $CH_2$ | Me | $CH_2CF_3$ | Me | Cl | H | O |
| C-4146 | Me | $CH_2$ | H | $CH_2CF_3$ | Me | Cl | H | O |
| C-4147 | H | CH(Me) | H | $CH_2CF_3$ | Me | Cl | H | O |
| C-4148 | H | $CH_2CH_2$ | Me | $CH_2CF_3$ | Me | Cl | H | O |
| C-4149 | Me | $CH_2CH_2$ | H | $CH_2CF_3$ | Me | Cl | H | O |
| C-4150 | H | single bond | Me | Et | Me | Cl | H | O |
| C-4151 | Me | single bond | H | Et | Me | Cl | H | O |
| C-4152 | Me(R) | single bond | H | Et | Me | Cl | H | O |
| C-4153 | Me(S) | single bond | H | Et | Me | Cl | H | O |
| C-4154 | H | $CH_2$ | Me | Et | Me | Cl | H | O |
| C-4155 | Me | $CH_2$ | H | Et | Me | Cl | H | O |
| C-4156 | H | CH(Me) | H | Et | Me | Cl | H | O |
| C-4157 | H | $CH_2CH_2$ | Me | Et | Me | Cl | H | O |
| C-4158 | Me | $CH_2CH_2$ | H | Et | Me | Cl | H | O |
| C-4159 | H | single bond | Me | c-Pr | Me | Cl | H | O |
| C-4160 | Me | single bond | H | c-Pr | Me | Cl | H | O |
| C-4161 | Me(R) | single bond | H | c-Pr | Me | Cl | H | O |
| C-4162 | Me(S) | single bond | H | c-Pr | Me | Cl | H | O |

TABLE 321-continued

| Compound Number | Y | W | Z | $R^1$ | $R^2$ | $R^3$ | $R^{10}$ | A |
|---|---|---|---|---|---|---|---|---|
| C-4163 | H | $CH_2$ | Me | c-Pr | Me | Cl | H | O |
| C-4164 | Me | $CH_2$ | H | c-Pr | Me | Cl | H | O |
| C-4165 | H | CH(Me) | H | c-Pr | Me | Cl | H | O |
| C-4166 | H | $CH_2CH_2$ | Me | c-Pr | Me | Cl | H | O |
| C-4167 | Me | $CH_2CH_2$ | H | c-Pr | Me | Cl | H | O |
| C-4168 | H | single bond | Me | c-Pr(1-CN) | Me | Cl | H | O |
| C-4169 | Me | single bond | H | c-Pr(1-CN) | Me | Cl | H | O |
| C-4170 | Me(R) | single bond | H | c-Pr(1-CN) | Me | Cl | H | O |
| C-4171 | Me(S) | single bond | H | c-Pr(1-CN) | Me | Cl | H | O |
| C-4172 | H | $CH_2$ | Me | c-Pr(1-CN) | Me | Cl | H | O |
| C-4173 | Me | $CH_2$ | H | c-Pr(1-CN) | Me | Cl | H | O |
| C-4174 | H | CH(Me) | H | c-Pr(1-CN) | Me | Cl | H | O |

TABLE 322

| Compound Number | Y | W | Z | $R^1$ | $R^2$ | $R^3$ | $R^{10}$ | A |
|---|---|---|---|---|---|---|---|---|
| C-4175 | H | $CH_2CH_2$ | Me | c-Pr(1-CN) | Me | Cl | H | O |
| C-4176 | Me | $CH_2CH_2$ | H | c-Pr(1-CN) | Me | Cl | H | O |
| C-4177 | H | single bond | Me | $CH_2CF_3$ | Me | Me | H | O |
| C-4178 | Me | single bond | H | $CH_2CF_3$ | Me | Me | H | O |
| C-4179 | Me(R) | single bond | H | $CH_2CF_3$ | Me | Me | H | O |
| C-4180 | Me(S) | single bond | H | $CH_2CF_3$ | Me | Me | H | O |
| C-4181 | H | $CH_2$ | Me | $CH_2CF_3$ | Me | Me | H | O |
| C-4182 | Me | $CH_2$ | H | $CH_2CF_3$ | Me | Me | H | O |
| C-4183 | H | CH(Me) | H | $CH_2CF_3$ | Me | Me | H | O |
| C-4184 | H | $CH_2CH_2$ | Me | $CH_2CF_3$ | Me | Me | H | O |
| C-4185 | Me | $CH_2CH_2$ | H | $CH_2CF_3$ | Me | Me | H | O |
| C-4186 | H | single bond | Me | Et | Me | Me | H | O |
| C-4187 | Me | single bond | H | Et | Me | Me | H | O |
| C-4188 | Me(R) | single bond | H | Et | Me | Me | H | O |
| C-4189 | Me(S) | single bond | H | Et | Me | Me | H | O |
| C-4190 | H | $CH_2$ | Me | Et | Me | Me | H | O |
| C-4191 | Me | $CH_2$ | H | Et | Me | Me | H | O |
| C-4192 | H | CH(Me) | H | Et | Me | Me | H | O |
| C-4193 | H | $CH_2CH_2$ | Me | Et | Me | Me | H | O |
| C-4194 | Me | $CH_2CH_2$ | H | Et | Me | Me | H | O |
| C-4195 | H | single bond | Me | c-Pr | Me | Me | H | O |
| C-4196 | Me | single bond | H | c-Pr | Me | Me | H | O |
| C-4197 | Me(R) | single bond | H | c-Pr | Me | Me | H | O |
| C-4198 | Me(S) | single bond | H | c-Pr | Me | Me | H | O |
| C-4199 | H | $CH_2$ | Me | c-Pr | Me | Me | H | O |
| C-4200 | Me | $CH_2$ | H | c-Pr | Me | Me | H | O |
| C-4201 | H | CH(Me) | H | c-Pr | Me | Me | H | O |
| C-4202 | H | $CH_2CH_2$ | Me | c-Pr | Me | Me | H | O |
| C-4203 | Me | $CH_2CH_2$ | H | c-Pr | Me | Me | H | O |
| C-4204 | H | single bond | Me | c-Pr(1-CN) | Me | Me | H | O |
| C-4205 | Me | single bond | H | c-Pr(1-CN) | Me | Me | H | O |
| C-4206 | Me(R) | single bond | H | c-Pr(1-CN) | Me | Me | H | O |
| C-4207 | Me(S) | single bond | H | c-Pr(1-CN) | Me | Me | H | O |
| C-4208 | H | $CH_2$ | Me | c-Pr(1-CN) | Me | Me | H | O |
| C-4209 | Me | $CH_2$ | H | c-Pr(1-CN) | Me | Me | H | O |
| C-4210 | H | CH(Me) | H | c-Pr(1-CN) | Me | Me | H | O |
| C-4211 | H | $CH_2CH_2$ | Me | c-Pr(1-CN) | Me | Me | H | O |
| C-4212 | Me | $CH_2CH_2$ | H | c-Pr(1-CN) | Me | Me | H | O |
| C-4213 | H | single bond | Me | $CH_2CF_3$ | C(=O)Me | Cl | H | O |
| C-4214 | Me | single bond | H | $CH_2CF_3$ | C(=O)Me | Cl | H | O |
| C-4215 | Me(R) | single bond | H | $CH_2CF_3$ | C(=O)Me | Cl | H | O |
| C-4216 | Me(S) | single bond | H | $CH_2CF_3$ | C(=O)Me | Cl | H | O |
| C-4217 | H | $CH_2$ | Me | $CH_2CF_3$ | C(=O)Me | Cl | H | O |
| C-4218 | Me | $CH_2$ | H | $CH_2CF_3$ | C(=O)Me | Cl | H | O |

TABLE 323

| Compound Number | Y | W | Z | $R^1$ | $R^2$ | $R^3$ | $R^{10}$ | A |
|---|---|---|---|---|---|---|---|---|
| C-4219 | H | CH(Me) | H | $CH_2CF_3$ | C(=O)Me | Cl | H | O |
| C-4220 | H | $CH_2CH_2$ | Me | $CH_2CF_3$ | C(=O)Me | Cl | H | O |
| C-4221 | Me | $CH_2CH_2$ | H | $CH_2CF_3$ | C(=O)Me | Cl | H | O |
| C-4222 | H | single bond | Me | Et | C(=O)Me | Cl | H | O |
| C-4223 | Me | single bond | H | Et | C(=O)Me | Cl | H | O |
| C-4224 | Me(R) | single bond | H | Et | C(=O)Me | Cl | H | O |
| C-4225 | Me(S) | single bond | H | Et | C(=O)Me | Cl | H | O |
| C-4226 | H | $CH_2$ | Me | Et | C(=O)Me | Cl | H | O |
| C-4227 | Me | $CH_2$ | H | Et | C(=O)Me | Cl | H | O |
| C-4228 | H | CH(Me) | H | Et | C(=O)Me | Cl | H | O |
| C-4229 | H | $CH_2CH_2$ | Me | Et | C(=O)Me | Cl | H | O |
| C-4230 | Me | $CH_2CH_2$ | H | Et | C(=O)Me | Cl | H | O |
| C-4231 | H | single bond | Me | c-Pr | C(=O)Me | Cl | H | O |
| C-4232 | Me | single bond | H | c-Pr | C(=O)Me | Cl | H | O |
| C-4233 | Me(R) | single bond | H | c-Pr | C(=O)Me | Cl | H | O |
| C-4234 | Me(S) | single bond | H | c-Pr | C(=O)Me | Cl | H | O |
| C-4235 | H | $CH_2$ | Me | c-Pr | C(=O)Me | Cl | H | O |
| C-4236 | Me | $CH_2$ | H | c-Pr | C(=O)Me | Cl | H | O |
| C-4237 | H | CH(Me) | H | c-Pr | C(=O)Me | Cl | H | O |
| C-4238 | H | $CH_2CH_2$ | Me | c-Pr | C(=O)Me | Cl | H | O |
| C-4239 | Me | $CH_2CH_2$ | H | c-Pr | C(=O)Me | Cl | H | O |
| C-4240 | H | single bond | Me | c-Pr(1-CN) | C(=O)Me | Cl | H | O |
| C-4241 | Me | single bond | H | c-Pr(1-CN) | C(=O)Me | Cl | H | O |
| C-4242 | Me(R) | single bond | H | c-Pr(1-CN) | C(=O)Me | Cl | H | O |
| C-4243 | Me(S) | single bond | H | c-Pr(1-CN) | C(=O)Me | Cl | H | O |
| C-4244 | H | $CH_2$ | Me | c-Pr(1-CN) | C(=O)Me | Cl | H | O |
| C-4245 | Me | $CH_2$ | H | c-Pr(1-CN) | C(=O)Me | Cl | H | O |
| C-4246 | H | CH(Me) | H | c-Pr(1-CN) | C(=O)Me | Cl | H | O |
| C-4247 | H | $CH_2CH_2$ | Me | c-Pr(1-CN) | C(=O)Me | Cl | H | O |
| C-4248 | Me | $CH_2CH_2$ | H | c-Pr(1-CN) | C(=O)Me | Cl | H | O |
| C-4249 | H | single bond | Me | $CH_2CF_3$ | C(=O)Me | Me | H | O |
| C-4250 | Me | single bond | H | $CH_2CF_3$ | C(=O)Me | Me | H | O |
| C-4251 | Me(R) | single bond | H | $CH_2CF_3$ | C(=O)Me | Me | H | O |
| C-4252 | Me(S) | single bond | H | $CH_2CF_3$ | C(=O)Me | Me | H | O |
| C-4253 | H | $CH_2$ | Me | $CH_2CF_3$ | C(=O)Me | Me | H | O |
| C-4254 | Me | $CH_2$ | H | $CH_2CF_3$ | C(=O)Me | Me | H | O |
| C-4255 | H | CH(Me) | H | $CH_2CF_3$ | C(=O)Me | Me | H | O |
| C-4256 | H | $CH_2CH_2$ | Me | $CH_2CF_3$ | C(=O)Me | Me | H | O |
| C-4257 | Me | $CH_2CH_2$ | H | $CH_2CF_3$ | C(=O)Me | Me | H | O |
| C-4258 | H | single bond | Me | Et | C(=O)Me | Me | H | O |
| C-4259 | Me | single bond | H | Et | C(=O)Me | Me | H | O |
| C-4260 | Me(R) | single bond | H | Et | C(=O)Me | Me | H | O |
| C-4261 | Me(S) | single bond | H | Et | C(=O)Me | Me | H | O |
| C-4262 | H | $CH_2$ | Me | Et | C(=O)Me | Me | H | O |

TABLE 324

| Compound Number | Y | W | Z | $R^1$ | $R^2$ | $R^3$ | $R^{10}$ | A |
|---|---|---|---|---|---|---|---|---|
| C-4263 | Me | $CH_2$ | H | Et | C(=O)Me | Me | H | O |
| C-4264 | H | CH(Me) | H | Et | C(=O)Me | Me | H | O |
| C-4265 | H | $CH_2CH_2$ | Me | Et | C(=O)Me | Me | H | O |
| C-4266 | Me | $CH_2CH_2$ | H | Et | C(=O)Me | Me | H | O |
| C-4267 | H | single bond | Me | c-Pr | C(=O)Me | Me | H | O |
| C-4268 | Me | single bond | H | c-Pr | C(=O)Me | Me | H | O |
| C-4269 | Me(R) | single bond | H | c-Pr | C(=O)Me | Me | H | O |
| C-4270 | Me(S) | single bond | H | c-Pr | C(=O)Me | Me | H | O |
| C-4271 | H | $CH_2$ | Me | c-Pr | C(=O)Me | Me | H | O |
| C-4272 | Me | $CH_2$ | H | c-Pr | C(=O)Me | Me | H | O |
| C-4273 | H | CH(Me) | H | c-Pr | C(=O)Me | Me | H | O |
| C-4274 | H | $CH_2CH_2$ | Me | c-Pr | C(=O)Me | Me | H | O |
| C-4275 | Me | $CH_2CH_2$ | H | c-Pr | C(=O)Me | Me | H | O |
| C-4276 | H | single bond | Me | c-Pr(1-CN) | C(=O)Me | Me | H | O |
| C-4277 | Me | single bond | H | c-Pr(1-CN) | C(=O)Me | Me | H | O |
| C-4278 | Me(R) | single bond | H | c-Pr(1-CN) | C(=O)Me | Me | H | O |
| C-4279 | Me(S) | single bond | H | c-Pr(1-CN) | C(=O)Me | Me | H | O |
| C-4280 | H | $CH_2$ | Me | c-Pr(1-CN) | C(=O)Me | Me | H | O |
| C-4281 | Me | $CH_2$ | H | c-Pr(1-CN) | C(=O)Me | Me | H | O |
| C-4282 | H | CH(Me) | H | c-Pr(1-CN) | C(=O)Me | Me | H | O |
| C-4283 | H | $CH_2CH_2$ | Me | c-Pr(1-CN) | C(=O)Me | Me | H | O |
| C-4284 | Me | $CH_2CH_2$ | H | c-Pr(1-CN) | C(=O)Me | Me | H | O |
| C-4285 | H | single bond | Me | $CH_2CF_3$ | C(=O)(i-Pr) | Cl | H | O |

TABLE 324-continued

| Compound Number | Y | W | Z | $R^1$ | $R^2$ | $R^3$ | $R^{10}$ | A |
|---|---|---|---|---|---|---|---|---|
| C-4286 | Me | single bond | H | $CH_2CF_3$ | C(=O)(i-Pr) | Cl | H | O |
| C-4287 | Me(R) | single bond | H | $CH_2CF_3$ | C(=O)(i-Pr) | Cl | H | O |
| C-4288 | Me(S) | single bond | H | $CH_2CF_3$ | C(=O)(i-Pr) | Cl | H | O |
| C-4289 | H | $CH_2$ | Me | $CH_2CF_3$ | C(=O)(i-Pr) | Cl | H | O |
| C-4290 | Me | $CH_2$ | H | $CH_2CF_3$ | C(=O)(i-Pr) | Cl | H | O |
| C-4291 | H | CH(Me) | H | $CH_2CF_3$ | C(=O)(i-Pr) | Cl | H | O |
| C-4292 | H | $CH_2CH_2$ | Me | $CH_2CF_3$ | C(=O)(i-Pr) | Cl | H | O |
| C-4293 | Me | $CH_2CH_2$ | H | $CH_2CF_3$ | C(=O)(i-Pr) | Cl | H | O |
| C-4294 | H | single bond | Me | Et | C(=O)(i-Pr) | Cl | H | O |
| C-4295 | Me | single bond | H | Et | C(=O)(i-Pr) | Cl | H | O |
| C-4296 | Me(R) | single bond | H | Et | C(=O)(i-Pr) | Cl | H | O |
| C-4297 | Me(S) | single bond | H | Et | C(=O)(i-Pr) | Cl | H | O |
| C-4298 | H | $CH_2$ | Me | Et | C(=O)(i-Pr) | Cl | H | O |
| C-4299 | Me | $CH_2$ | H | Et | C(=O)(i-Pr) | Cl | H | O |
| C-4300 | H | CH(Me) | H | Et | C(=O)(i-Pr) | Cl | H | O |
| C-4301 | H | $CH_2CH_2$ | Me | Et | C(=O)(i-Pr) | Cl | H | O |
| C-4302 | Me | $CH_2CH_2$ | H | Et | C(=O)(i-Pr) | Cl | H | O |
| C-4303 | H | single bond | Me | c-Pr | C(=O)(i-Pr) | Cl | H | O |
| C-4304 | Me | single bond | H | c-Pr | C(=O)(i-Pr) | Cl | H | O |
| C-4305 | Me(R) | single bond | H | c-Pr | C(=O)(i-Pr) | Cl | H | O |
| C-4306 | Me(S) | single bond | H | c-Pr | C(=O)(i-Pr) | Cl | H | O |

TABLE 325

| Compound Number | Y | W | Z | $R^1$ | $R^2$ | $R^3$ | $R^{10}$ | A |
|---|---|---|---|---|---|---|---|---|
| C-4307 | H | $CH_2$ | Me | c-Pr | C(=O)(i-Pr) | Cl | H | O |
| C-4308 | Me | $CH_2$ | H | c-Pr | C(=O)(i-Pr) | Cl | H | O |
| C-4309 | H | CH(Me) | H | c-Pr | C(=O)(i-Pr) | Cl | H | O |
| C-4310 | H | $CH_2CH_2$ | Me | c-Pr | C(=O)(i-Pr) | Cl | H | O |
| C-4311 | Me | $CH_2CH_2$ | H | c-Pr | C(=O)(i-Pr) | Cl | H | O |
| C-4312 | H | single bond | Me | c-Pr(1-CN) | C(=O)(i-Pr) | Cl | H | O |
| C-4313 | Me | single bond | H | c-Pr(1-CN) | C(=O)(i-Pr) | Cl | H | O |
| C-4314 | Me(R) | single bond | H | c-Pr(1-CN) | C(=O)(i-Pr) | Cl | H | O |
| C-4315 | Me(S) | single bond | H | c-Pr(1-CN) | C(=O)(i-Pr) | Cl | H | O |
| C-4316 | H | $CH_2$ | Me | c-Pr(1-CN) | C(=O)(i-Pr) | Cl | H | O |
| C-4317 | Me | $CH_2$ | H | c-Pr(1-CN) | C(=O)(i-Pr) | Cl | H | O |
| C-4318 | H | CH(Me) | H | c-Pr(1-CN) | C(=O)(i-Pr) | Cl | H | O |
| C-4319 | H | $CH_2CH_2$ | Me | c-Pr(1-CN) | C(=O)(i-Pr) | Cl | H | O |
| C-4320 | Me | $CH_2CH_2$ | H | c-Pr(1-CN) | C(=O)(i-Pr) | Cl | H | O |
| C-4321 | H | single bond | Me | $CH_2CF_3$ | C(=O)(i-Pr) | Me | H | O |
| C-4322 | Me | single bond | H | $CH_2CF_3$ | C(=O)(i-Pr) | Me | H | O |
| C-4323 | Me(R) | single bond | H | $CH_2CF_3$ | C(=O)(i-Pr) | Me | H | O |
| C-4324 | Me(S) | single bond | H | $CH_2CF_3$ | C(=O)(i-Pr) | Me | H | O |
| C-4325 | H | $CH_2$ | Me | $CH_2CF_3$ | C(=O)(i-Pr) | Me | H | O |
| C-4326 | Me | $CH_2$ | H | $CH_2CF_3$ | C(=O)(i-Pr) | Me | H | O |
| C-4327 | H | CH(Me) | H | $CH_2CF_3$ | C(=O)(i-Pr) | Me | H | O |
| C-4328 | H | $CH_2CH_2$ | Me | $CH_2CF_3$ | C(=O)(i-Pr) | Me | H | O |
| C-4329 | Me | $CH_2CH_2$ | H | $CH_2CF_3$ | C(=O)(i-Pr) | Me | H | O |
| C-4330 | H | single bond | Me | Et | C(=O)(i-Pr) | Me | H | O |
| C-4331 | Me | single bond | H | Et | C(=O)(i-Pr) | Me | H | O |
| C-4332 | Me(R) | single bond | H | Et | C(=O)(i-Pr) | Me | H | O |
| C-4333 | Me(S) | single bond | H | Et | C(=O)(i-Pr) | Me | H | O |
| C-4334 | H | $CH_2$ | Me | Et | C(=O)(i-Pr) | Me | H | O |
| C-4335 | Me | $CH_2$ | H | Et | C(=O)(i-Pr) | Me | H | O |
| C-4336 | H | CH(Me) | H | Et | C(=O)(i-Pr) | Me | H | O |
| C-4337 | H | $CH_2CH_2$ | Me | Et | C(=O)(i-Pr) | Me | H | O |
| C-4338 | Me | $CH_2CH_2$ | H | Et | C(=O)(i-Pr) | Me | H | O |
| C-4339 | H | single bond | Me | c-Pr | C(=O)(i-Pr) | Me | H | O |
| C-4340 | Me | single bond | H | c-Pr | C(=O)(i-Pr) | Me | H | O |
| C-4341 | Me(R) | single bond | H | c-Pr | C(=O)(i-Pr) | Me | H | O |
| C-4342 | Me(S) | single bond | H | c-Pr | C(=O)(i-Pr) | Me | H | O |
| C-4343 | H | $CH_2$ | Me | c-Pr | C(=O)(i-Pr) | Me | H | O |
| C-4344 | Me | $CH_2$ | H | c-Pr | C(=O)(i-Pr) | Me | H | O |
| C-4345 | H | CH(Me) | H | c-Pr | C(=O)(i-Pr) | Me | H | O |
| C-4346 | H | $CH_2CH_2$ | Me | c-Pr | C(=O)(i-Pr) | Me | H | O |
| C-4347 | Me | $CH_2CH_2$ | H | c-Pr | C(=O)(i-Pr) | Me | H | O |
| C-4348 | H | single bond | Me | c-Pr(1-CN) | C(=O)(i-Pr) | Me | H | O |
| C-4349 | Me | single bond | H | c-Pr(1-CN) | C(=O)(i-Pr) | Me | H | O |
| C-4350 | Me(R) | single bond | H | c-Pr(1-CN) | C(=O)(i-Pr) | Me | H | O |

TABLE 326

| Compound Number | Y | W | Z | $R^1$ | $R^2$ | $R^3$ | $R^{10}$ | A |
|---|---|---|---|---|---|---|---|---|
| C-4351 | Me(S) | single bond | H | c-Pr(1-CN) | C(=O)(i-Pr) | Me | H | O |
| C-4352 | H | $CH_2$ | Me | c-Pr(1-CN) | C(=O)(i-Pr) | Me | H | O |
| C-4353 | Me | $CH_2$ | H | c-Pr(1-CN) | C(=O)(i-Pr) | Me | H | O |
| C-4354 | H | CH(Me) | H | c-Pr(1-CN) | C(=O)(i-Pr) | Me | H | O |
| C-4355 | H | $CH_2CH_2$ | Me | c-Pr(1-CN) | C(=O)(i-Pr) | Me | H | O |
| C-4356 | Me | $CH_2CH_2$ | H | c-Pr(1-CN) | C(=O)(i-Pr) | Me | H | O |
| C-4357 | H | single bond | Me | $CH_2CF_3$ | H | Br | H | O |
| C-4358 | Me | single bond | H | $CH_2CF_3$ | H | Br | H | O |
| C-4359 | Me(R) | single bond | H | $CH_2CF_3$ | H | Br | H | O |
| C-4360 | Me(S) | single bond | H | $CH_2CF_3$ | H | Br | H | O |
| C-4361 | H | $CH_2$ | Me | $CH_2CF_3$ | H | Br | H | O |
| C-4362 | Me | $CH_2$ | H | $CH_2CF_3$ | H | Br | H | O |
| C-4363 | H | CH(Me) | H | $CH_2CF_3$ | H | Br | H | O |
| C-4364 | H | $CH_2CH_2$ | Me | $CH_2CF_3$ | H | Br | H | O |
| C-4365 | Me | $CH_2CH_2$ | H | $CH_2CF_3$ | H | Br | H | O |
| C-4366 | H | single bond | Me | Et | H | Br | H | O |
| C-4367 | Me | single bond | H | Et | H | Br | H | O |
| C-4368 | Me(R) | single bond | H | Et | H | Br | H | O |
| C-4369 | Me(S) | single bond | H | Et | H | Br | H | O |
| C-4370 | H | $CH_2$ | Me | Et | H | Br | H | O |
| C-4371 | Me | $CH_2$ | H | Et | H | Br | H | O |
| C-4372 | H | CH(Me) | H | Et | H | Br | H | O |
| C-4373 | H | $CH_2CH_2$ | Me | Et | H | Br | H | O |
| C-4374 | Me | $CH_2CH_2$ | H | Et | H | Br | H | O |
| C-4375 | H | single bond | Me | c-Pr | H | Br | H | O |
| C-4376 | Me | single bond | H | c-Pr | H | Br | H | O |
| C-4377 | Me(R) | single bond | H | c-Pr | H | Br | H | O |
| C-4378 | Me(S) | single bond | H | c-Pr | H | Br | H | O |
| C-4379 | H | $CH_2$ | Me | c-Pr | H | Br | H | O |
| C-4380 | Me | $CH_2$ | H | c-Pr | H | Br | H | O |
| C-4381 | H | CH(Me) | H | c-Pr | H | Br | H | O |
| C-4382 | H | $CH_2CH_2$ | Me | c-Pr | H | Br | H | O |
| C-4383 | Me | $CH_2CH_2$ | H | c-Pr | H | Br | H | O |
| C-4384 | H | single bond | Me | c-Pr(1-CN) | H | Br | H | O |
| C-4385 | Me | single bond | H | c-Pr(1-CN) | H | Br | H | O |
| C-4386 | Me(R) | single bond | H | c-Pr(1-CN) | H | Br | H | O |
| C-4387 | Me(S) | single bond | H | c-Pr(1-CN) | H | Br | H | O |
| C-4388 | H | $CH_2$ | Me | c-Pr(1-CN) | H | Br | H | O |
| C-4389 | Me | $CH_2$ | H | c-Pr(1-CN) | H | Br | H | O |
| C-4390 | H | CH(Me) | H | c-Pr(1-CN) | H | Br | H | O |
| C-4391 | H | $CH_2CH_2$ | Me | c-Pr(1-CN) | H | Br | H | O |
| C-4392 | Me | $CH_2CH_2$ | H | c-Pr(1-CN) | H | Br | H | O |
| C-4393 | H | single bond | Me | $CH_2CF_3$ | H | $CF_3$ | H | C |
| C-4394 | Me | single bond | H | $CH_2CF_3$ | H | $CF_3$ | H | O |

TABLE 327

| Compound Number | Y | W | Z | $R^1$ | $R^2$ | $R^3$ | $R^{10}$ | A |
|---|---|---|---|---|---|---|---|---|
| C-4395 | Me(R) | single bond | H | $CH_2CF_3$ | H | $CF_3$ | H | O |
| C-4396 | Me(S) | single bond | H | $CH_2CF_3$ | H | $CF_3$ | H | O |
| C-4397 | H | $CH_2$ | Me | $CH_2CF_3$ | H | $CF_3$ | H | O |
| C-4398 | Me | $CH_2$ | H | $CH_2CF_3$ | H | $CF_3$ | H | O |
| C-4399 | H | CH(Me) | H | $CH_2CF_3$ | H | $CF_3$ | H | O |
| C-4400 | H | $CH_2CH_2$ | Me | $CH_2CF_3$ | H | $CF_3$ | H | O |
| C-4401 | Me | $CH_2CH_2$ | H | $CH_2CF_3$ | H | $CF_3$ | H | O |
| C-4402 | H | single bond | Me | Et | H | $CF_3$ | H | O |
| C-4403 | Me | single bond | H | Et | H | $CF_3$ | H | O |
| C-4404 | Me(R) | single bond | H | Et | H | $CF_3$ | H | O |
| C-4405 | Me(S) | single bond | H | Et | H | $CF_3$ | H | O |
| C-4406 | H | $CH_2$ | Me | Et | H | $CF_3$ | H | O |
| C-4407 | Me | $CH_2$ | H | Et | H | $CF_3$ | H | O |
| C-4408 | H | CH(Me) | H | Et | H | $CF_3$ | H | O |
| C-4409 | H | $CH_2CH_2$ | Me | Et | H | $CF_3$ | H | O |
| C-4410 | Me | $CH_2CH_2$ | H | Et | H | $CF_3$ | H | O |
| C-4411 | H | single bond | Me | c-Pr | H | $CF_3$ | H | O |
| C-4412 | Me | single bond | H | c-Pr | H | $CF_3$ | H | O |
| C-4413 | Me(R) | single bond | H | c-Pr | H | $CF_3$ | H | O |
| C-4414 | Me(S) | single bond | H | c-Pr | H | $CF_3$ | H | O |
| C-4415 | H | $CH_2$ | Me | c-Pr | H | $CF_3$ | H | O |
| C-4416 | Me | $CH_2$ | H | c-Pr | H | $CF_3$ | H | O |
| C-4417 | H | CH(Me) | H | c-Pr | H | $CF_3$ | H | O |
| C-4418 | H | $CH_2CH_2$ | Me | c-Pr | H | $CF_3$ | H | O |

TABLE 327-continued

| Compound Number | Y | W | Z | $R^1$ | $R^2$ | $R^3$ | $R^{10}$ | A |
|---|---|---|---|---|---|---|---|---|
| C-4419 | Me | $CH_2CH_2$ | H | c-Pr | H | $CF_3$ | H | O |
| C-4420 | H | single bond | Me | c-Pr(1-CN) | H | $CF_3$ | H | O |
| C-4421 | Me | single bond | H | c-Pr(1-CN) | H | $CF_3$ | H | O |
| C-4422 | Me(R) | single bond | H | c-Pr(1-CN) | H | $CF_3$ | H | O |
| C-4423 | Me(S) | single bond | H | c-Pr(1-CN) | H | $CF_3$ | H | O |
| C-4424 | H | $CH_2$ | Me | c-Pr(1-CN) | H | $CF_3$ | H | O |
| C-4425 | Me | $CH_2$ | H | c-Pr(1-CN) | H | $CF_3$ | H | O |
| C-4426 | H | CH(Me) | H | c-Pr(1-CN) | H | $CF_3$ | H | O |
| C-4427 | H | $CH_2CH_2$ | Me | c-Pr(1-CN) | H | $CF_3$ | H | O |
| C-4428 | Me | $CH_2CH_2$ | H | c-Pr(1-CN) | H | $CF_3$ | H | O |
| C-4429 | H | single bond | Me | $CH_2CF_3$ | H | OMe | H | O |
| C-4430 | Me | single bond | H | $CH_2CF_3$ | H | OMe | H | O |
| C-4431 | Me(R) | single bond | H | $CH_2CF_3$ | H | OMe | H | O |
| C-4432 | Me(S) | single bond | H | $CH_2CF_3$ | H | OMe | H | O |
| C-4433 | H | $CH_2$ | Me | $CH_2CF_3$ | H | OMe | H | O |
| C-4434 | Me | $CH_2$ | H | $CH_2CF_3$ | H | OMe | H | O |
| C-4435 | H | CH(Me) | H | $CH_2CF_3$ | H | OMe | H | O |
| C-4436 | H | $CH_2CH_2$ | Me | $CH_2CF_3$ | H | OMe | H | O |
| C-4437 | Me | $CH_2CH_2$ | H | $CH_2CF_3$ | H | OMe | H | O |
| C-4438 | H | single bond | Me | Et | H | OMe | H | O |

TABLE 328

| Compound Number | Y | W | Z | $R^1$ | $R^2$ | $R^3$ | $R^{10}$ | A |
|---|---|---|---|---|---|---|---|---|
| C-4439 | Me | single bond | H | Et | H | OMe | H | O |
| C-4440 | Me(R) | single bond | H | Et | H | OMe | H | O |
| C-4441 | Me(S) | single bond | H | Et | H | OMe | H | O |
| C-4442 | H | $CH_2$ | Me | Et | H | OMe | H | O |
| C-4443 | Me | $CH_2$ | H | Et | H | OMe | H | O |
| C-4444 | H | CH(Me) | H | Et | H | OMe | H | O |
| C-4445 | H | $CH_2CH_2$ | Me | Et | H | OMe | H | O |
| C-4446 | Me | $CH_2CH_2$ | H | Et | H | OMe | H | O |
| C-4447 | H | single bond | Me | c-Pr | H | OMe | H | O |
| C-4448 | Me | single bond | H | c-Pr | H | OMe | H | O |
| C-4449 | Me(R) | single bond | H | c-Pr | H | OMe | H | O |
| C-4450 | Me(S) | single bond | H | c-Pr | H | OMe | H | O |
| C-4451 | H | $CH_2$ | Me | c-Pr | H | OMe | H | O |
| C-4452 | Me | $CH_2$ | H | c-Pr | H | OMe | H | O |
| C-4453 | H | CH(Me) | H | c-Pr | H | OMe | H | O |
| C-4454 | H | $CH_2CH_2$ | Me | c-Pr | H | OMe | H | O |
| C-4455 | Me | $CH_2CH_2$ | H | c-Pr | H | OMe | H | O |
| C-4456 | H | single bond | Me | c-Pr(1-CN) | H | OMe | H | O |
| C-4457 | Me | single bond | H | c-Pr(1-CN) | H | OMe | H | O |
| C-4458 | Me(R) | single bond | H | c-Pr(1-CN) | H | OMe | H | O |
| C-4459 | Me(S) | single bond | H | c-Pr(1-CN) | H | OMe | H | O |
| C-4460 | H | $CH_2$ | Me | c-Pr(1-CN) | H | OMe | H | O |
| C-4461 | Me | $CH_2$ | H | c-Pr(1-CN) | H | OMe | H | O |
| C-4462 | H | CH(Me) | H | c-Pr(1-CN) | H | OMe | H | O |
| C-4463 | H | $CH_2CH_2$ | Me | c-Pr(1-CN) | H | OMe | H | O |
| C-4464 | Me | $CH_2CH_2$ | H | c-Pr(1-CN) | H | OMe | H | O |
| C-4465 | H | single bond | Me | $CH_2CF_3$ | H | $OCF_3$ | H | O |
| C-4466 | Me | single bond | H | $CH_2CF_3$ | H | $OCF_3$ | H | O |
| C-4467 | Me(R) | single bond | H | $CH_2CF_3$ | H | $OCF_3$ | H | O |
| C-4468 | Me(S) | single bond | H | $CH_2CF_3$ | H | $OCF_3$ | H | O |
| C-4469 | H | $CH_2$ | Me | $CH_2CF_3$ | H | $OCF_3$ | H | O |
| C-4470 | Me | $CH_2$ | H | $CH_2CF_3$ | H | OCF | H | O |
| C-4471 | H | CH(Me) | H | $CH_2CF_3$ | H | $OCF_3$ | H | O |
| C-4472 | H | $CH_2CH_2$ | Me | $CH_2CF_3$ | H | $OCF_3$ | H | O |
| C-4473 | Me | $CH_2CH_2$ | H | $CH_2CF_3$ | H | $OCF_3$ | H | O |
| C-4474 | H | single bond | Me | Et | H | $OCF_3$ | H | O |
| C-4475 | Me | single bond | H | Et | H | $OCF_3$ | H | O |
| C-4476 | Me(R) | single bond | H | Et | H | $OCF_3$ | H | O |
| C-4477 | Me(S) | single bond | H | Et | H | $OCF_3$ | H | O |
| C-4478 | H | $CH_2$ | Me | Et | H | $OCF_3$ | H | O |
| C-4479 | Me | $CH_2$ | H | Et | H | OCF | H | O |
| C-4480 | H | CH(Me) | H | Et | H | $OCF_3$ | H | O |
| C-4481 | H | $CH_2CH_2$ | Me | Et | H | $OCF_3$ | H | O |
| C-4482 | Me | $CH_2CH_2$ | H | Et | H | $OCF_3$ | H | O |

TABLE 329

| Compound Number | Y | W | Z | $R^1$ | $R^2$ | $R^3$ | $R^{10}$ | A |
|---|---|---|---|---|---|---|---|---|
| C-4483 | H | single bond | Me | c-Pr | H | $OCF_3$ | H | O |
| C-4484 | Me | single bond | H | c-Pr | H | $OCF_3$ | H | O |
| C-4485 | Me(R) | single bond | H | c-Pr | H | $OCF_3$ | H | O |
| C-4486 | Me(S) | single bond | H | c-Pr | H | $OCF_3$ | H | O |
| C-4487 | H | CH | Me | c-Pr | H | $OCF_3$ | H | O |
| C-4488 | Me | $CH_2$ | H | c-Pr | H | $OCF_3$ | H | O |
| C-4489 | H | CH(Me) | H | c-Pr | H | $OCF_3$ | H | O |
| C-4490 | H | $CH_2CH_2$ | Me | c-Pr | H | $OCF_3$ | H | O |
| C-4491 | Me | $CH_2CH_2$ | H | c-Pr | H | $OCF_3$ | H | O |
| C-4492 | H | single bond | Me | c-Pr(1-CN) | H | $OCF_3$ | H | O |
| C-4493 | Me | single bond | H | c-Pr(1-CN) | H | $OCF_3$ | H | O |
| C-4494 | Me(R) | single bond | H | c-Pr(1-CN) | H | $OCF_3$ | H | O |
| C-4495 | Me(S) | single bond | H | c-Pr(1-CN) | H | $OCF_3$ | H | O |
| C-4496 | H | $CH_2$ | Me | c-Pr(1-CN) | H | $OCF_3$ | H | O |
| C-4497 | Me | $CH_2$ | H | c-Pr(1-CN) | H | $OCF_3$ | H | O |
| C-4498 | H | CH(Me) | H | c-Pr(1-CN) | H | $OCF_3$ | H | O |
| C-4499 | H | $CH_2CH_2$ | Me | c-Pr(1-CN) | H | $OCF_3$ | H | O |
| C-4500 | Me | $CH_2CH_2$ | H | c-Pr(1-CN) | H | $OCF_3$ | H | O |
| C-4501 | H | single bond | Me | $CH_2CF_3$ | H | Br | Me | O |
| C-4502 | Me | single bond | H | $CH_2CF_3$ | H | Br | Me | O |
| C-4503 | Me(R) | single bond | H | $CH_2CF_3$ | H | Br | Me | O |
| C-4504 | Me(S) | single bond | H | $CH_2CF_3$ | H | Br | Me | O |
| C-4505 | H | $CH_2$ | Me | $CH_2CF_3$ | H | Br | Me | O |
| C-4506 | Me | $CH_2$ | H | $CH_2CF_3$ | H | Br | Me | O |

TABLE 329-continued

| Compound Number | Y | W | Z | $R^1$ | $R^2$ | $R^3$ | $R^{10}$ | A |
|---|---|---|---|---|---|---|---|---|
| C-4507 | H | CH(Me) | H | $CH_2CF_3$ | H | Br | Me | O |
| C-4508 | H | $CH_2CH_2$ | Me | $CH_2CF_3$ | H | Br | Me | O |
| C-4509 | Me | $CH_2CH_2$ | H | $CH_2CF_3$ | H | Br | Me | O |
| C-4510 | H | single bond | Me | Et | H | Br | Me | O |
| C-4511 | Me | single bond | H | Et | H | Br | Me | O |
| C-4512 | Me(R) | single bond | H | Et | H | Br | Me | O |
| C-4513 | Me(S) | single bond | H | Et | H | Br | Me | O |
| C-4514 | H | $CH_2$ | Me | Et | H | Br | Me | O |
| C-4515 | Me | $CH_2$ | H | Et | H | Br | Me | O |
| C-4516 | H | CH(Me) | H | Et | H | Br | Me | O |
| C-4517 | H | $CH_2CH_2$ | Me | Et | H | Br | Me | O |
| C-4518 | Me | $CH_2CH_2$ | H | Et | H | Br | Me | O |
| C-4519 | H | single bond | Me | c-Pr | H | Br | Me | O |
| C-4520 | Me | single bond | H | c-Pr | H | Br | Me | O |
| C-4521 | Me(R) | single bond | H | c-Pr | H | Br | Me | O |
| C-4522 | Me(S) | single bond | H | c-Pr | H | Br | Me | O |
| C-4523 | H | $CH_2$ | Me | c-Pr | H | Br | Me | O |
| C-4524 | Me | $CH_2$ | H | c-Pr | H | Br | Me | O |
| C-4525 | H | CH(Me) | H | c-Pr | H | Br | Me | O |
| C-4526 | H | $CH_2CH_2$ | Me | c-Pr | H | Br | Me | O |

TABLE 330

| Compound Number | Y | W | Z | $R^1$ | $R^2$ | $R^3$ | $R^{10}$ | A |
|---|---|---|---|---|---|---|---|---|
| C-4527 | Me | $CH_2CH_2$ | H | c-Pr | H | Br | Me | O |
| C-4528 | H | single bond | Me | c-Pr(1-CN) | H | Br | Me | O |
| C-4529 | Me | single bond | H | c-Pr(1-CN) | H | Br | Me | O |
| C-4530 | Me(R) | single bond | H | c-Pr(1-CN) | H | Br | Me | O |
| C-4531 | Me(S) | single bond | H | c-Pr(1-CN) | H | Br | Me | O |
| C-4532 | H | $CH_2$ | Me | c-Pr(1-CN) | H | Br | Me | O |
| C-4533 | Me | $CH_2$ | H | c-Pr(1-CN) | H | Br | Me | O |
| C-4534 | H | CH(Me) | H | c-Pr(1-CN) | H | Br | Me | O |
| C-4535 | H | $CH_2CH_2$ | Me | c-Pr(1-CN) | H | Br | Me | O |
| C-4536 | Me | $CH_2CH_2$ | H | c-Pr(1-CN) | H | Br | Me | O |
| C-4537 | H | single bond | Me | $CH_2CF_3$ | H | $CF_3$ | Me | O |
| C-4538 | Me | single bond | H | $CH_2CF_3$ | H | CF | Me | O |
| C-4539 | Me(R) | single bond | H | $CH_2CF_3$ | H | $CF_3$ | Me | O |
| C-4540 | Me(S) | single bond | H | $CH_2CF_3$ | H | $CF_3$ | Me | O |
| C-4541 | H | $CH_2$ | Me | $CH_2CF_3$ | H | $CF_3$ | Me | O |
| C-4542 | Me | $CH_2$ | H | $CH_2CF_3$ | H | $CF_3$ | Me | O |
| C-4543 | H | CH(Me) | H | $CH_2CF_3$ | H | $CF_3$ | Me | O |
| C-4544 | H | $CH_2CH_2$ | Me | $CH_2CF_3$ | H | $CF_3$ | Me | O |
| C-4545 | Me | $CH_2CH_2$ | H | $CH_2CF_3$ | H | $CF_3$ | Me | O |
| C-4546 | H | single bond | Me | Et | H | $CF_3$ | Me | O |
| C-4547 | Me | single bond | H | Et | H | $CF_3$ | Me | O |
| C-4548 | Me(R) | single bond | H | Et | H | $CF_3$ | Me | O |
| C-4549 | Me(S) | single bond | H | Et | H | $CF_3$ | Me | O |
| C-4550 | H | $CH_2$ | Me | Et | H | $CF_3$ | Me | O |
| C-4551 | Me | $CH_2$ | H | Et | H | $CF_3$ | Me | O |
| C-4552 | H | CH(Me) | H | Et | H | $CF_3$ | Me | O |
| C-4553 | H | $CH_2CH_2$ | Me | Et | H | $CF_3$ | Me | O |
| C-4554 | Me | $CH_2CH_2$ | H | Et | H | CF | Me | O |
| C-4555 | H | single bond | Me | c-Pr | H | $CF_3$ | Me | O |
| C-4556 | Me | single bond | H | c-Pr | H | CF | Me | O |
| C-4557 | Me(R) | single bond | H | c-Pr | H | $CF_3$ | Me | O |
| C-4558 | Me(S) | single bond | H | c-Pr | H | $CF_3$ | Me | O |
| C-4559 | H | $CH_2$ | Me | c-Pr | H | $CF_3$ | Me | O |
| C-4560 | Me | $CH_2$ | H | c-Pr | H | $CF_3$ | Me | O |
| C-4561 | H | CH(Me) | H | c-Pr | H | $CF_3$ | Me | O |
| C-4562 | H | $CH_2CH_2$ | Me | c-Pr | H | $CF_3$ | Me | O |
| C-4563 | Me | $CH_2CH_2$ | H | c-Pr | H | $CF_3$ | Me | O |
| C-4564 | H | single bond | Me | c-Pr(1-CN) | H | $CF_3$ | Me | O |
| C-4565 | Me | single bond | H | c-Pr(1-CN) | H | $CF_3$ | Me | O |
| C-4566 | Me(R) | single bond | H | c-Pr(1-CN) | H | $CF_3$ | Me | O |
| C-4567 | Me(S) | single bond | H | c-Pr(1-CN) | H | $CF_3$ | Me | O |
| C-4568 | H | $CH_2$ | Me | c-Pr(1-CN) | H | $CF_3$ | Me | O |
| C-4569 | Me | $CH_2$ | H | c-Pr(1-CN) | H | $CF_3$ | Me | O |
| C-4570 | H | CH(Me) | H | c-Pr(1-CN) | H | $CF_3$ | Me | O |

TABLE 331

| Compound Number | Y | W | Z | $R^1$ | $R^2$ | $R^3$ | $R^{10}$ | A |
|---|---|---|---|---|---|---|---|---|
| C-4571 | H | $CH_2CH_2$ | Me | c-Pr(1-CN) | H | $CF_3$ | Me | O |
| C-4572 | Me | $CH_2CH_2$ | H | c-Pr(1-CN) | H | $CF_3$ | Me | O |
| C-4573 | H | single bond | Me | $CH_2CF_3$ | H | OMe | Me | O |
| C-4574 | Me | single bond | H | $CH_2CF_3$ | H | OMe | Me | O |
| C-4575 | Me(R) | single bond | H | $CH_2CF_3$ | H | OMe | Me | O |
| C-4576 | Me(S) | single bond | H | $CH_2CF_3$ | H | OMe | Me | O |
| C-4577 | H | $CH_2$ | Me | $CH_2CF_3$ | H | OMe | Me | O |
| C-4578 | Me | $CH_2$ | H | $CH_2CF_3$ | H | OMe | Me | O |
| C-4579 | H | CH(Me) | H | $CH_2CF_3$ | H | OMe | Me | O |
| C-4580 | H | $CH_2CH_2$ | Me | $CH_2CF_3$ | H | OMe | Me | O |
| C-4581 | Me | $CH_2CH_2$ | H | $CH_2CF_3$ | H | OMe | Me | O |
| C-4582 | H | single bond | Me | Et | H | OMe | Me | O |
| C-4583 | Me | single bond | H | Et | H | OMe | Me | O |
| C-4584 | Me(R) | single bond | H | Et | H | OMe | Me | O |
| C-4585 | Me(S) | single bond | H | Et | H | OMe | Me | O |
| C-4586 | H | $CH_2$ | Me | Et | H | OMe | Me | O |
| C-4587 | Me | $CH_2$ | H | Et | H | OMe | Me | O |
| C-4588 | H | CH(Me) | H | Et | H | OMe | Me | O |
| C-4589 | H | $CH_2CH_2$ | Me | Et | H | OMe | Me | O |
| C-4590 | Me | $CH_2CH_2$ | H | Et | H | OMe | Me | O |
| C-4591 | H | single bond | Me | c-Pr | H | OMe | Me | O |
| C-4592 | Me | single bond | H | c-Pr | H | OMe | Me | O |
| C-4593 | Me(R) | single bond | H | c-Pr | H | OMe | Me | O |

TABLE 331-continued

| Compound Number | Y | W | Z | $R^1$ | $R^2$ | $R^3$ | $R^{10}$ | A |
|---|---|---|---|---|---|---|---|---|
| C-4594 | Me(S) | single bond | H | c-Pr | H | OMe | Me | O |
| C-4595 | H | $CH_2$ | Me | c-Pr | H | OMe | Me | O |
| C-4596 | Me | $CH_2$ | H | c-Pr | H | OMe | Me | O |
| C-4597 | H | CH(Me) | H | c-Pr | H | OMe | Me | O |
| C-4598 | H | $CH_2CH_2$ | Me | c-Pr | H | OMe | Me | O |
| C-4599 | Me | $CH_2CH_2$ | H | c-Pr | H | OMe | Me | O |
| C-4600 | H | single bond | Me | c-Pr(1-CN) | H | OMe | Me | O |
| C-4601 | Me | single bond | H | c-Pr(1-CN) | H | OMe | Me | O |
| C-4602 | Me(R) | single bond | H | c-Pr(1-CN) | H | OMe | Me | O |
| C-4603 | Me(S) | single bond | H | c-Pr(1-CN) | H | OMe | Me | O |
| C-4604 | H | $CH_2$ | Me | c-Pr(1-CN) | H | OMe | Me | O |
| C-4605 | Me | $CH_2$ | H | c-Pr(1-CN) | H | OMe | Me | O |
| C-4606 | H | CH(Me) | H | c-Pr(1-CN) | H | OMe | Me | O |
| C-4607 | H | $CH_2CH_2$ | Me | c-Pr(1-CN) | H | OMe | Me | O |
| C-4608 | Me | $CH_2CH_2$ | H | c-Pr(1-CN) | H | OMe | Me | O |
| C-4609 | H | single bond | Me | $CH_2CF_3$ | H | $OCF_3$ | Me | O |
| C-4610 | Me | single bond | H | $CH_2CF_3$ | H | $OCF_3$ | Me | O |
| C-4611 | Me(R) | single bond | H | $CH_2CF_3$ | H | $OCF_3$ | Me | O |
| C-4612 | Me(S) | single bond | H | $CH_2CF_3$ | H | $OCF_3$ | Me | O |
| C-4613 | H | $CH_2$ | Me | $CH_2CF_3$ | H | $OCF_3$ | Me | O |
| C-4614 | Me | $CH_2$ | H | $CH_2CF_3$ | H | $OCF_3$ | Me | O |

TABLE 332

| Compound Number | Y | W | Z | $R^1$ | $R^2$ | $R^3$ | $R^{10}$ | A |
|---|---|---|---|---|---|---|---|---|
| C-4615 | H | CH(Me) | H | $CH_2CF_3$ | H | $OCF_3$ | Me | O |
| C-4616 | H | $CH_2CH_2$ | Me | $CH_2CF_3$ | H | $OCF_3$ | Me | O |
| C-4617 | Me | $CH_2CH_2$ | H | $CH_2CF_3$ | H | $OCF_3$ | Me | O |
| C-4618 | H | single bond | Me | Et | H | $OCF_3$ | Me | O |
| C-4619 | Me | single bond | H | Et | H | $OCF_3$ | Me | O |
| C-4620 | Me(R) | single bond | H | Et | H | $OCF_3$ | Me | O |
| C-4621 | Me(S) | single bond | H | Et | H | $OCF_3$ | Me | O |
| C-4622 | H | $CH_2$ | Me | Et | H | $OCF_3$ | Me | O |
| C-4623 | Me | $CH_2$ | H | Et | H | $OCF_3$ | Me | O |
| C-4624 | H | CH(Me) | H | Et | H | $OCF_3$ | Me | O |
| C-4625 | H | $CH_2CH_2$ | Me | Et | H | $OCF_3$ | Me | O |
| C-4626 | Me | $CH_2CH_2$ | H | Et | H | $OCF_3$ | Me | O |
| C-4627 | H | single bond | Me | c-Pr | H | $OCF_3$ | Me | O |
| C-4628 | Me | single bond | H | c-Pr | H | $OCF_3$ | Me | O |
| C-4629 | Me(R) | single bond | H | c-Pr | H | $OCF_3$ | Me | O |
| C-4630 | Me(S) | single bond | H | c-Pr | H | $OCF_3$ | Me | O |
| C-4631 | H | $CH_2$ | Me | c-Pr | H | $OCF_3$ | Me | O |
| C-4632 | Me | $CH_2$ | H | c-Pr | H | $OCF_3$ | Me | O |
| C-4633 | H | CH(Me) | H | c-Pr | H | $OCF_3$ | Me | O |
| C-4634 | H | $CH_2CH_2$ | Me | c-Pr | H | $OCF_3$ | Me | O |
| C-4635 | Me | $CH_2CH_2$ | H | c-Pr | H | $OCF_3$ | Me | O |
| C-4636 | H | single bond | Me | c-Pr(1-CN) | H | $OCF_3$ | Me | O |
| C-4637 | Me | single bond | H | c-Pr(1-CN) | H | $OCF_3$ | Me | O |
| C-4638 | Me(R) | single bond | H | c-Pr(1-CN) | H | $OCF_3$ | Me | O |
| C-4639 | Me(S) | single bond | H | c-Pr(1-CN) | H | $OCF_3$ | Me | O |
| C-4640 | H | $CH_2$ | Me | c-Pr(1-CN) | H | $OCF_3$ | Me | O |
| C-4641 | Me | $CH_2$ | H | c-Pr(1-CN) | H | $OCF_3$ | Me | O |
| C-4642 | H | CH(Me) | H | c-Pr(1-CN) | H | $OCF_3$ | Me | O |
| C-4643 | H | $CH_2CH_2$ | Me | c-Pr(1-CN) | H | $OCF_3$ | Me | O |
| C-4644 | Me | $CH_2CH_2$ | H | c-Pr(1-CN) | H | $OCF_3$ | Me | O |
| C-4645 | H | single bond | Me | $CH_2CF_3$ | H | Br | $CH_2OMe$ | O |
| C-4646 | Me | single bond | H | $CH_2CF_3$ | H | Br | $CH_2OMe$ | O |
| C-4647 | Me(R) | single bond | H | $CH_2CF_3$ | H | Br | $CH_2OMe$ | O |
| C-4648 | Me(S) | single bond | H | $CH_2CF_3$ | H | Br | $CH_2OMe$ | O |
| C-4649 | H | $CH_2$ | Me | $CH_2CF_3$ | H | Br | $CH_2OMe$ | O |
| C-4650 | Me | $CH_2$ | H | $CH_2CF_3$ | H | Br | $CH_2OMe$ | O |
| C-4651 | H | CH(Me) | H | $CH_2CF_3$ | H | Br | $CH_2OMe$ | O |
| C-4652 | H | $CH_2CH_2$ | Me | $CH_2CF_3$ | H | Br | $CH_2OMe$ | O |
| C-4653 | Me | $CH_2CH_2$ | H | $CH_2CF_3$ | H | Br | $CH_2OMe$ | O |
| C-4654 | H | single bond | Me | Et | H | Br | $CH_2OMe$ | O |
| C-4655 | Me | single bond | H | Et | H | Br | $CH_2OMe$ | O |
| C-4656 | Me(R) | single bond | H | Et | H | Br | $CH_2OMe$ | O |
| C-4657 | Me(S) | single bond | H | Et | H | Br | $CH_2OMe$ | O |
| C-4658 | H | $CH_2$ | Me | Et | H | Br | $CH_2OMe$ | O |

TABLE 333

| Compound Number | Y | W | Z | $R^1$ | $R^2$ | $R^3$ | $R^{10}$ | A |
|---|---|---|---|---|---|---|---|---|
| C-4659 | Me | $CH_2$ | H | Et | H | Br | $CH_2OMe$ | O |
| C-4660 | H | CH(Me) | H | Et | H | Br | $CH_2OMe$ | O |
| C-4661 | H | $CH_2CH_2$ | Me | Et | H | Br | $CH_2OMe$ | O |
| C-4662 | Me | $CH_2CH_2$ | H | Et | H | Br | $CH_2OMe$ | O |
| C-4663 | H | single bond | Me | c-Pr | H | Br | $CH_2OMe$ | O |
| C-4664 | Me | single bond | H | c-Pr | H | Br | $CH_2OMe$ | O |
| C-4665 | Me(R) | single bond | H | c-Pr | H | Br | $CH_2OMe$ | O |
| C-4666 | Me(S) | single bond | H | c-Pr | H | Br | $CH_2OMe$ | O |
| C-4667 | H | $CH_2$ | Me | c-Pr | H | Br | $CH_2OMe$ | O |
| C-4668 | Me | $CH_2$ | H | c-Pr | H | Br | $CH_2OMe$ | O |
| C-4669 | H | CH(Me) | H | c-Pr | H | Br | $CH_2OMe$ | O |
| C-4670 | H | $CH_2CH_2$ | Me | c-Pr | H | Br | $CH_2OMe$ | O |
| C-4671 | Me | $CH_2CH_2$ | H | c-Pr | H | Br | $CH_2OMe$ | O |
| C-4672 | H | single bond | Me | c-Pr(1-CN) | H | Br | $CH_2OMe$ | O |
| C-4673 | Me | single bond | H | c-Pr(1-CN) | H | Br | $CH_2OMe$ | O |
| C-4674 | Me(R) | single bond | H | c-Pr(1-CN) | H | Br | $CH_2OMe$ | O |
| C-4675 | Me(S) | single bond | H | c-Pr(1-CN) | H | Br | $CH_2OMe$ | O |
| C-4676 | H | $CH_2$ | Me | c-Pr(1-CN) | H | Br | $CH_2OMe$ | O |
| C-4677 | Me | $CH_2$ | H | c-Pr(1-CN) | H | Br | $CH_2OMe$ | O |
| C-4678 | H | CH(Me) | H | c-Pr(1-CN) | H | Br | $CH_2OMe$ | O |
| C-4679 | H | $CH_2CH_2$ | Me | c-Pr(1-CN) | H | Br | $CH_2OMe$ | O |
| C-4680 | Me | $CH_2CH_2$ | H | c-Pr(1-CN) | H | Br | $CH_2OMe$ | O |
| C-4681 | H | single bond | Me | $CH_2CF_3$ | H | $CF_3$ | $CH_2OMe$ | O |
| C-4682 | Me | single bond | H | $CH_2CF_3$ | H | $CF_3$ | $CH_2OMe$ | O |
| C-4683 | Me(R) | single bond | H | $CH_2CF_3$ | H | $CF_3$ | $CH_2OMe$ | O |
| C-4684 | Me(S) | single bond | H | $CH_2CF_3$ | H | $CF_3$ | $CH_2OMe$ | O |
| C-4685 | H | $CH_2$ | Me | $CH_2CF_3$ | H | $CF_3$ | $CH_2OMe$ | O |
| C-4686 | Me | $CH_2$ | H | $CH_2CF_3$ | H | $CF_3$ | $CH_2OMe$ | O |
| C-4687 | H | CH(Me) | H | $CH_2CF_3$ | H | $CF_3$ | $CH_2OMe$ | O |
| C-4688 | H | $CH_2CH_2$ | Me | $CH_2CF_3$ | H | $CF_3$ | $CH_2OMe$ | O |
| C-4689 | Me | $CH_2CH_2$ | H | $CH_2CF_3$ | H | $CF_3$ | $CH_2OMe$ | O |
| C-4690 | H | single bond | Me | Et | H | $CF_3$ | $CH_2OMe$ | O |
| C-4691 | Me | single bond | H | Et | H | $CF_3$ | $CH_2OMe$ | O |
| C-4692 | Me(R) | single bond | H |  | H | $CF_3$ | $CH_2OMe$ | O |
| C-4693 | Me(S) | single bond | H | Et | H | $CF_3$ | $CH_2OMe$ | O |
| C-4694 | H | $CH_2$ | Me | Et | H | $CF_3$ | $CH_2OMe$ | O |
| C-4695 | Me | $CH_2$ | H | Et | H | $CF_3$ | $CH_2OMe$ | O |
| C-4696 | H | CH(Me) | H | Et | H | $CF_3$ | $CH_2OMe$ | O |
| C-4697 | H | $CH_2CH_2$ | Me | Et | H | $CF_3$ | $CH_2OMe$ | O |
| C-4698 | Me | $CH_2CH_2$ | H | Et | H | $CF_3$ | $CH_2OMe$ | O |
| C-4699 | H | single bond | Me | c-Pr | H | $CF_3$ | $CH_2OMe$ | O |
| C-4700 | Me | single bond | H | c-Pr | H | $CF_3$ | $CH_2OMe$ | O |
| C-4701 | Me(R) | single bond | H | c-Pr | H | $CF_3$ | $CH_2OMe$ | O |
| C-4702 | Me(S) | single bond | H | c-Pr | H | $CF_3$ | $CH_2OMe$ | O |

TABLE 334

| Compound Number | Y | W | Z | $R^1$ | $R^2$ | $R^3$ | $R^{10}$ | A |
|---|---|---|---|---|---|---|---|---|
| C-4703 | H | $CH_2$ | Me | c-Pr | H | $CF_3$ | $CH_2OMe$ | O |
| C-4704 | Me | $CH_2$ | H | c-Pr | H | $CF_3$ | $CH_2OMe$ | O |
| C-4705 | H | CH(Me) | H | c-Pr | H | $CF_3$ | $CH_2OMe$ | O |
| C-4706 | H | $CH_2CH_2$ | Me | c-Pr | H | $CF_3$ | $CH_2OMe$ | O |
| C-4707 | Me | $CH_2CH_2$ | H | c-Pr | H | $CF_3$ | $CH_2OMe$ | O |
| C-4708 | H | single bond | Me | c-Pr(1-CN) | H | $CF_3$ | $CH_2OMe$ | O |
| C-4709 | Me | single bond | H | c-Pr(1-CN) | H | $CF_3$ | $CH_2OMe$ | O |
| C-4710 | Me(R) | single bond | H | c-Pr(1-CN) | H | $CF_3$ | $CH_2OMe$ | O |
| C-4711 | Me(S) | single bond | H | c-Pr(1-CN) | H | $CF_3$ | $CH_2OMe$ | O |
| C-4712 | H | $CH_2$ | Me | c-Pr(1-CN) | H | $CF_3$ | $CH_2OMe$ | O |
| C-4713 | Me | $CH_2$ | H | c-Pr(1-CN) | H | $CF_3$ | $CH_2OMe$ | O |
| C-4714 | H | CH(Me) | H | c-Pr(1-CN) | H | $CF_3$ | $CH_2OMe$ | O |
| C-4715 | H | $CH_2CH_2$ | Me | c-Pr(1-CN) | H | $CF_3$ | $CH_2OMe$ | O |
| C-4716 | Me | $CH_2CH_2$ | H | c-Pr(1-CN) | H | $CF_3$ | $CH_2OMe$ | O |
| C-4717 | H | single bond | Me | $CH_2CF_3$ | H | OMe | $CH_2OMe$ | O |
| C-4718 | Me | single bond | H | $CH_2CF_3$ | H | OMe | $CH_2OMe$ | O |
| C-4719 | Me(R) | single bond | H | $CH_2CF_3$ | H | OMe | $CH_2OMe$ | O |
| C-4720 | Me(S) | single bond | H | $CH_2CF_3$ | H | OMe | $CH_2OMe$ | O |
| C-4721 | H | $CH_2$ | Me | $CH_2CF_3$ | H | OMe | $CH_2OMe$ | O |
| C-4722 | Me | $CH_2$ | H | $CH_2CF_3$ | H | OMe | $CH_2OMe$ | O |
| C-4723 | H | CH(Me) | H | $CH_2CF_3$ | H | OMe | $CH_2OMe$ | O |
| C-4724 | H | $CH_2CH_2$ | Me | $CH_2CF_3$ | H | OMe | $CH_2OMe$ | O |
| C-4725 | Me | $CH_2CH_2$ | H | $CH_2CF_3$ | H | OMe | $CH_2OMe$ | O |

TABLE 334-continued

| Compound Number | Y | W | Z | $R^1$ | $R^2$ | $R^3$ | $R^{10}$ | A |
|---|---|---|---|---|---|---|---|---|
| C-4726 | H | single bond | Me | Et | H | OMe | $CH_2OMe$ | O |
| C-4727 | Me | single bond | H | Et | H | OMe | $CH_2OMe$ | O |
| C-4728 | Me(R) | single bond | H | Et | H | OMe | $CH_2OMe$ | O |
| C-4729 | Me(S) | single bond | H | Et | H | OMe | $CH_2OMe$ | O |
| C-4730 | H | $CH_2$ | Me | Et | H | OMe | $CH_2OMe$ | O |
| C-4731 | Me | $CH_2$ | H | Et | H | OMe | $CH_2OMe$ | O |
| C-4732 | H | CH(Me) | H | Et | H | OMe | $CH_2OMe$ | O |
| C-4733 | H | $CH_2CH_2$ | Me | Et | H | OMe | $CH_2OMe$ | O |
| C-4734 | Me | $CH_2CH_2$ | H | Et | H | OMe | $CH_2OMe$ | O |
| C-4735 | H | single bond | Me | c-Pr | H | OMe | $CH_2OMe$ | O |
| C-4736 | Me | single bond | H | c-Pr | H | OMe | $CH_2OMe$ | O |
| C-4737 | Me(R) | single bond | H | c-Pr | H | OMe | $CH_2OMe$ | O |
| C-4738 | Me(S) | single bond | H | c-Pr | H | OMe | $CH_2OMe$ | O |
| C-4739 | H | $CH_2$ | Me | c-Pr | H | OMe | $CH_2OMe$ | O |
| C-4740 | Me | $CH_2$ | H | c-Pr | H | OMe | $CH_2OMe$ | O |
| C-4741 | H | CH(Me) | H | c-Pr | H | OMe | $CH_2OMe$ | O |
| C-4742 | H | $CH_2CH_2$ | Me | c-Pr | H | OMe | $CH_2OMe$ | O |
| C-4743 | Me | $CH_2CH_2$ | H | c-Pr | H | OMe | $CH_2OMe$ | O |
| C-4744 | H | single bond | Me | c-Pr(1-CN) | H | OMe | $CH_2OMe$ | O |
| C-4745 | Me | single bond | H | c-Pr(1-CN) | H | OMe | $CH_2OMe$ | O |
| C-4746 | Me(R) | single bond | H | c-Pr(1-CN) | H | OMe | $CH_2OMe$ | O |

TABLE 335

| Compound Number | Y | W | Z | $R^1$ | $R^2$ | $R^3$ | $R^{10}$ | A |
|---|---|---|---|---|---|---|---|---|
| C-4747 | Me(S) | single bond | H | c-Pr(1-CN) | H | OMe | $CH_2OMe$ | O |
| C-4748 | H | $CH_2$ | Me | c-Pr(1-CN) | H | OMe | $CH_2OMe$ | O |
| C-4749 | Me | $CH_2$ | H | c-Pr(1-CN) | H | OMe | $CH_2OMe$ | O |
| C-4750 | H | CH(Me) | H | c-Pr(1-CN) | H | OMe | $CH_2OMe$ | O |
| C-4751 | H | $CH_2CH_2$ | Me | c-Pr(1-CN) | H | OMe | $CH_2OMe$ | O |
| C-4752 | Me | $CH_2CH_2$ | H | c-Pr(1-CN) | H | OMe | $CH_2OMe$ | O |
| C-4753 | H | single bond | Me | $CH_2CF_3$ | H | $OCF_3$ | $CH_2OMe$ | O |
| C-4754 | Me | single bond | H | $CH_2CF_3$ | H | $OCF_3$ | $CH_2OMe$ | O |
| C-4755 | Me(R) | single bond | H | $CH_2CF_3$ | H | $OCF_3$ | $CH_2OMe$ | O |
| C-4756 | Me(S) | single bond | H | $CH_2CF_3$ | H | $OCF_3$ | $CH_2OMe$ | O |
| C-4757 | H | $CH_2$ | Me | $CH_2CF_3$ | H | $OCF_3$ | $CH_2OMe$ | O |
| C-4758 | Me | $CH_2$ | H | $CH_2CF_3$ | H | $OCF_3$ | $CH_2OMe$ | O |
| C-4759 | H | CH(Me) | H | $CH_2CF_3$ | H | $OCF_3$ | $CH_2OMe$ | O |
| C-4760 | H | $CH_2CH_2$ | Me | $CH_2CF_3$ | H | $OCF_3$ | $CH_2OMe$ | O |
| C-4761 | Me | $CH_2CH_2$ | H | $CH_2CF_3$ | H | $OCF_3$ | $CH_2OMe$ | O |
| C-4762 | H | single bond | Me | Et | H | $OCF_3$ | $CH_2OMe$ | O |
| C-4763 | Me | single bond | H | Et | H | $OCF_3$ | $CH_2OMe$ | O |
| C-4764 | Me(R) | single bond | H | Et | H | $OCF_3$ | $CH_2OMe$ | O |
| C-4765 | Me(S) | single bond | H | Et | H | $OCF_3$ | $CH_2OMe$ | O |
| C-4766 | H | $CH_2$ | Me | Et | H | $OCF_3$ | $CH_2OMe$ | O |
| C-4767 | Me | $CH_2$ | H | Et | H | $OCF_3$ | $CH_2OMe$ | O |
| C-4768 | H | CH(Me) | H | Et | H | $OCF_3$ | $CH_2OMe$ | O |
| C-4769 | H | $CH_2CH_2$ | Me | Et | H | $OCF_3$ | $CH_2OMe$ | O |
| C-4770 | Me | $CH_2CH_2$ | H | Et | H | $OCF_3$ | $CH_2OMe$ | O |
| C-4771 | H | single bond | Me | c-Pr | H | $OCF_3$ | $CH_2OMe$ | O |
| C-4772 | Me | single bond | H | c-Pr | H | $OCF_3$ | $CH_2OMe$ | O |
| C-4773 | Me(R) | single bond | H | c-Pr | H | $OCF_3$ | $CH_2OMe$ | O |
| C-4774 | Me(S) | single bond | H | c-Pr | H | $OCF_3$ | $CH_2OMe$ | O |
| C-4775 | H | $CH_2$ | Me | c-Pr | H | $OCF_3$ | $CH_2OMe$ | O |
| C-4776 | Me | $CH_2$ | H | c-Pr | H | $OCF_3$ | $CH_2OMe$ | O |
| C-4777 | H | CH(Me) | H | c-Pr | H | $OCF_3$ | $CH_2OMe$ | O |
| C-4778 | H | $CH_2CH_2$ | Me | c-Pr | H | $OCF_3$ | $CH_2OMe$ | O |
| C-4779 | Me | $CH_2CH_2$ | H | c-Pr | H | $OCF_3$ | $CH_2OMe$ | O |
| C-4780 | H | single bond | Me | c-Pr(1-CN) | H | $OCF_3$ | $CH_2OMe$ | O |
| C-4781 | Me | single bond | H | c-Pr(1-CN) | H | $OCF_3$ | $CH_2OMe$ | O |
| C-4782 | Me(R) | single bond | H | c-Pr(1-CN) | H | $OCF_3$ | $CH_2OMe$ | O |
| C-4783 | Me(S) | single bond | H | c-Pr(1-CN) | H | $OCF_3$ | $CH_2OMe$ | O |
| C-4784 | H | $CH_2$ | Me | c-Pr(1-CN) | H | $OCF_3$ | $CH_2OMe$ | O |
| C-4785 | Me | $CH_2$ | H | c-Pr(1-CN) | H | $OCF_3$ | $CH_2OMe$ | O |
| C-4786 | H | CH(Me) | H | c-Pr(1-CN) | H | $OCF_3$ | $CH_2OMe$ | O |
| C-4787 | H | $CH_2CH_2$ | Me | c-Pr(1-CN) | H | $OCF_3$ | $CH_2OMe$ | O |
| C-4788 | Me | $CH_2CH_2$ | H | c-Pr(1-CN) | H | $OCF_3$ | $CH_2OMe$ | O |
| C-4789 | H | single bond | Me | $CH_2CF_3$ | H | Br | $CH_2CN$ | O |
| C-4790 | Me | single bond | H | $CH_2CF_3$ | H | Br | $CH_2CN$ | O |

TABLE 336

| Compound Number | Y | W | Z | $R^1$ | $R^2$ | $R^3$ | $R^{10}$ | A |
|---|---|---|---|---|---|---|---|---|
| C-4791 | Me(R) | single bond | H | $CH_2CF_3$ | H | Br | $CH_2CN$ | O |
| C-4792 | Me(S) | single bond | H | $CH_2CF_3$ | H | Br | $CH_2CN$ | O |
| C-4793 | H | $CH_2$ | Me | $CH_2CF_3$ | H | Br | $CH_2CN$ | O |
| C-4794 | Me | $CH_2$ | H | $CH_2CF_3$ | H | Br | $CH_2CN$ | O |
| C-4795 | H | CH(Me) | H | $CH_2CF_3$ | H | Br | $CH_2CN$ | O |
| C-4796 | H | $CH_2CH_2$ | Me | $CH_2CF_3$ | H | Br | $CH_2CN$ | O |
| C-4797 | Me | $CH_2CH_2$ | H | $CH_2CF_3$ | H | Br | $CH_2CN$ | O |
| C-4798 | H | single bond | Me | Et | H | Br | $CH_2CN$ | O |
| C-4799 | Me | single bond | H | Et | H | Br | $CH_2CN$ | O |
| C-4800 | Me(R) | single bond | H | Et | H | Br | $CH_2CN$ | O |
| C-4801 | Me(S) | single bond | H | Et | H | Br | $CH_2CN$ | O |
| C-4802 | H | $CH_2$ | Me | Et | H | Br | $CH_2CN$ | O |
| C-4803 | Me | $CH_2$ | H | Et | H | Br | $CH_2CN$ | O |
| C-4804 | H | CH(Me) | H | Et | H | Br | $CH_2CN$ | O |
| C-4805 | H | $CH_2CH_2$ | Me | Et | H | Br | $CH_2CN$ | O |
| C-4806 | Me | $CH_2CH_2$ | H | Et | H | Br | $CH_2CN$ | O |
| C-4807 | H | single bond | Me | c-Pr | H | Br | $CH_2CN$ | O |
| C-4808 | Me | single bond | H | c-Pr | H | Br | $CH_2CN$ | O |
| C-4809 | Me(R) | single bond | H | c-Pr | H | Br | $CH_2CN$ | O |
| C-4810 | Me(S) | single bond | H | c-Pr | H | Br | $CH_2CN$ | O |
| C-4811 | H | $CH_2$ | Me | c-Pr | H | Br | $CH_2CN$ | O |
| C-4812 | Me | $CH_2$ | H | c-Pr | H | Br | $CH_2CN$ | O |
| C-4813 | H | CH(Me) | H | c-Pr | H | Br | $CH_2CN$ | O |
| C-4814 | H | $CH_2CH_2$ | Me | c-Pr | H | Br | $CH_2CN$ | O |
| C-4815 | Me | $CH_2CH_2$ | H | c-Pr | H | Br | $CH_2CN$ | O |
| C-4816 | H | single bond | Me | c-Pr(1-CN) | H | Br | $CH_2CN$ | O |
| C-4817 | Me | single bond | H | c-Pr(1-CN) | H | Br | $CH_2CN$ | O |
| C-4818 | Me(R) | single bond | H | c-Pr(1-CN) | H | Br | $CH_2CN$ | O |
| C-4819 | Me(S) | single bond | H | c-Pr(1-CN) | H | Br | $CH_2CN$ | O |
| C-4820 | H | $CH_2$ | Me | c-Pr(1-CN) | H | Br | $CH_2CN$ | O |
| C-4821 | Me | $CH_2$ | H | c-Pr(1-CN) | H | Br | $CH_2CN$ | O |
| C-4822 | H | CH(Me) | H | c-Pr(1-CN) | H | Br | $CH_2CN$ | O |
| C-4823 | H | $CH_2CH_2$ | Me | c-Pr(1-CN) | H | Br | $CH_2CN$ | O |
| C-4824 | Me | $CH_2CH_2$ | H | c-Pr(1-CN) | H | Br | $CH_2CN$ | O |
| C-4825 | H | single bond | Me | $CH_2CF_3$ | H | $CF_3$ | $CH_2CN$ | O |
| C-4826 | Me | single bond | H | $CH_2CF_3$ | H | $CF_3$ | $CH_2CN$ | O |
| C-4827 | Me(R) | single bond | H | $CH_2CF_3$ | H | $CF_3$ | $CH_2CN$ | O |
| C-4828 | Me(S) | single bond | H | $CH_2CF_3$ | H | $CF_3$ | $CH_2CN$ | O |
| C-4829 | H | $CH_2$ | Me | $CH_2CF_3$ | H | $CF_3$ | $CH_2CN$ | O |
| C-4830 | Me | $CH_2$ | H | $CH_2CF_3$ | H | $CF_3$ | $CH_2CN$ | O |
| C-4831 | H | CH(Me) | H | $CH_2CF_3$ | H | $CF_3$ | $CH_2CN$ | O |
| C-4832 | H | $CH_2CH_2$ | Me | $CH_2CF_3$ | H | $CF_3$ | $CH_2CN$ | O |
| C-4833 | Me | $CH_2CH_2$ | H | $CH_2CF_3$ | H | $CF_3$ | $CH_2CN$ | O |
| C-4834 | H | single bond | Me | Et | H | $CF_3$ | $CH_2CN$ | O |

TABLE 337

| Compound Number | Y | W | Z | $R^1$ | $R^2$ | $R^3$ | $R^{10}$ | A |
|---|---|---|---|---|---|---|---|---|
| C-4835 | Me | single bond | H | Et | H | $CF_3$ | $CH_2CN$ | O |
| C-4836 | Me(R) | single bond | H | Et | H | $CF_3$ | $CH_2CN$ | O |
| C-4837 | Me(S) | single bond | H | Et | H | $CF_3$ | $CH_2CN$ | O |
| C-4838 | H | $CH_2$ | Me | Et | H | $CF_3$ | $CH_2CN$ | O |
| C-4839 | Me | $CH_2$ | H | Et | H | $CF_3$ | $CH_2CN$ | O |
| C-4840 | H | CH(Me) | H | Et | H | $CF_3$ | $CH_2CN$ | O |
| C-4841 | H | $CH_2CH_2$ | Me | Et | H | $CF_3$ | $CH_2CN$ | O |
| C-4842 | Me | $CH_2CH_2$ | H | Et | H | $CF_3$ | $CH_2CN$ | O |
| C-4843 | H | single bond | Me | c-Pr | H | $CF_3$ | $CH_2CN$ | O |
| C-4844 | Me | single bond | H | c-Pr | H | $CF_3$ | $CH_2CN$ | O |
| C-4845 | Me(R) | single bond | H | c-Pr | H | $CF_3$ | $CH_2CN$ | O |
| C-4846 | Me(S) | single bond | H | c-Pr | H | $CF_3$ | $CH_2CN$ | O |
| C-4847 | H | $CH_2$ | Me | c-Pr | H | $CF_3$ | $CH_2CN$ | O |
| C-4848 | Me | $CH_2$ | H | c-Pr | H | $CF_3$ | $CH_2CN$ | O |
| C-4849 | H | CH(Me) | H | c-Pr | H | $CF_3$ | $CH_2CN$ | O |
| C-4850 | H | $CH_2CH_2$ | Me | c-Pr | H | $CF_3$ | $CH_2CN$ | O |
| C-4851 | Me | $CH_2CH_2$ | H | c-Pr | H | $CF_3$ | $CH_2CN$ | O |
| C-4852 | H | single bond | Me | c-Pr(1-CN) | H | $CF_3$ | $CH_2CN$ | O |
| C-4853 | Me | single bond | H | c-Pr(1-CN) | H | $CF_3$ | $CH_2CN$ | O |
| C-4854 | Me(R) | single bond | H | c-Pr(1-CN) | H | $CF_3$ | $CH_2CN$ | O |
| C-4855 | Me(S) | single bond | H | c-Pr(1-CN) | H | $CF_3$ | $CH_2CN$ | O |

TABLE 337-continued

| Compound Number | Y | W | Z | $R^1$ | $R^2$ | $R^3$ | $R^{10}$ | A |
|---|---|---|---|---|---|---|---|---|
| C-4856 | H | $CH_2$ | Me | c-Pr(1-CN) | H | $CF_3$ | $CH_2CN$ | O |
| C-4857 | Me | $CH_2$ | H | c-Pr(1-CN) | H | $CF_3$ | $CH_2CN$ | O |
| C-4858 | H | CH(Me) | H | c-Pr(1-CN) | H | $CF_3$ | $CH_2CN$ | O |
| C-4859 | H | $CH_2CH_2$ | Me | c-Pr(1-CN) | H | $CF_3$ | $CH_2CN$ | O |
| C-4860 | Me | $CH_2CH_2$ | H | c-Pr(1-CN) | H | $CF_3$ | $CH_2CN$ | O |
| C-4861 | H | single bond | Me | $CH_2CF_3$ | H | OMe | $CH_2CN$ | O |
| C-4862 | Me | single bond | H | $CH_2CF_3$ | H | OMe | $CH_2CN$ | O |
| C-4863 | Me(R) | single bond | H | $CH_2CF_3$ | H | OMe | $CH_2CN$ | O |
| C-4864 | Me(S) | single bond | H | $CH_2CF_3$ | H | OMe | $CH_2CN$ | O |
| C-4865 | H | $CH_2$ | Me | $CH_2CF_3$ | H | OMe | $CH_2CN$ | O |
| C-4866 | Me | $CH_2$ | H | $CH_2CF_3$ | H | OMe | $CH_2CN$ | O |
| C-4867 | H | CH(Me) | H | $CH_2CF_3$ | H | OMe | $CH_2CN$ | O |
| C-4868 | H | $CH_2CH_2$ | Me | $CH_2CF_3$ | H | OMe | $CH_2CN$ | O |
| C-4869 | Me | $CH_2CH_2$ | H | $CH_2CF_3$ | H | OMe | $CH_2CN$ | O |
| C-4870 | H | single bond | Me | Et | H | OMe | $CH_2CN$ | O |
| C-4871 | Me | single bond | H | Et | H | OMe | $CH_2CN$ | O |
| C-4872 | Me(R) | single bond | H | Et | H | OMe | $CH_2CN$ | O |
| C-4873 | Me(S) | single bond | H | Et | H | OMe | $CH_2CN$ | O |
| C-4874 | H | $CH_2$ | Me | Et | H | OMe | $CH_2CN$ | O |
| C-4875 | Me | $CH_2$ | H | Et | H | OMe | $CH_2CN$ | O |
| C-4876 | H | CH(Me) | H | Et | H | OMe | $CH_2CN$ | O |
| C-4877 | H | $CH_2CH_2$ | Me | Et | H | OMe | $CH_2CN$ | O |
| C-4878 | Me | $CH_2CH_2$ | H | Et | H | OMe | $CH_2CN$ | O |

TABLE 338

| Compound Number | Y | W | Z | $R^1$ | $R^2$ | $R^3$ | $R^{10}$ | A |
|---|---|---|---|---|---|---|---|---|
| C-4879 | H | single bond | Me | c-Pr | H | OMe | $CH_2CN$ | O |
| C-4880 | Me | single bond | H | c-Pr | H | OMe | $CH_2CN$ | O |
| C-4881 | Me(R) | single bond | H | c-Pr | H | OMe | $CH_2CN$ | O |
| C-4882 | Me(S) | single bond | H | c-Pr | H | OMe | $CH_2CN$ | O |
| C-4883 | H | $CH_2$ | Me | c-Pr | H | OMe | $CH_2CN$ | O |
| C-4884 | Me | $CH_2$ | H | c-Pr | H | OMe | $CH_2CN$ | O |
| C-4885 | H | CH(Me) | H | c-Pr | H | OMe | $CH_2CN$ | O |
| C-4886 | H | $CH_2CH_2$ | Me | c-Pr | H | OMe | $CH_2CN$ | O |
| C-4887 | Me | $CH_2CH_2$ | H | c-Pr | H | OMe | $CH_2CN$ | O |
| C-4888 | H | single bond | Me | c-Pr(1-CN) | H | OMe | $CH_2CN$ | O |
| C-4889 | Me | single bond | H | c-Pr(1-CN) | H | OMe | $CH_2CN$ | O |
| C-4890 | Me(R) | single bond | H | c-Pr(1-CN) | H | OMe | $CH_2CN$ | O |
| C-4891 | Me(S) | single bond | H | c-Pr(1-CN) | H | OMe | $CH_2CN$ | O |
| C-4892 | H | $CH_2$ | Me | c-Pr(1-CN) | H | OMe | $CH_2CN$ | O |
| C-4893 | Me | $CH_2$ | H | c-Pr(1-CN) | H | OMe | $CH_2CN$ | O |
| C-4894 | H | CH(Me) | H | c-Pr(1-CN) | H | OMe | $CH_2CN$ | O |
| C-4895 | H | $CH_2CH_2$ | Me | c-Pr(1-CN) | H | OMe | $CH_2CN$ | O |
| C-4896 | Me | $CH_2CH_2$ | H | c-Pr(1-CN) | H | OMe | $CH_2CN$ | O |
| C-4897 | H | single bond | Me | $CH_2CF_3$ | H | $OCF_3$ | $CH_2CN$ | O |
| C-4898 | Me | single bond | H | $CH_2CF_3$ | H | $OCF_3$ | $CH_2CN$ | O |
| C-4899 | Me(R) | single bond | H | $CH_2CF_3$ | H | $OCF_3$ | $CH_2CN$ | O |
| C-4900 | Me(S) | single bond | H | $CH_2CF_3$ | H | $OCF_3$ | $CH_2CN$ | O |
| C-4901 | H | $CH_2$ | Me | $CH_2CF_3$ | H | $OCF_3$ | $CH_2CN$ | O |
| C-4902 | Me | $CH_2$ | H | $CH_2CF_3$ | H | $OCF_3$ | $CH_2CN$ | O |
| C-4903 | H | CH(Me) | H | $CH_2CF_3$ | H | $OCF_3$ | $CH_2CN$ | O |
| C-4904 | H | $CH_2CH_2$ | Me | $CH_2CF_3$ | H | $OCF_3$ | $CH_2CN$ | O |
| C-4905 | Me | $CH_2CH_2$ | H | $CH_2CF_3$ | H | $OCF_3$ | $CH_2CN$ | O |
| C-4906 | H | single bond | Me | Et | H | $OCF_3$ | $CH_2CN$ | O |
| C-4907 | Me | single bond | H | Et | H | $OCF_3$ | $CH_2CN$ | O |
| C-4908 | Me(R) | single bond | H | Et | H | $OCF_3$ | $CH_2CN$ | O |
| C-4909 | Me(S) | single bond | H | Et | H | $OCF_3$ | $CH_2CN$ | O |
| C-4910 | H | $CH_2$ | Me | Et | H | $OCF_3$ | $CH_2CN$ | O |
| C-4911 | Me | $CH_2$ | H | Et | H | $OCF_3$ | $CH_2CN$ | O |
| C-4912 | H | CH(Me) | H | Et | H | $OCF_3$ | $CH_2CN$ | O |
| C-4913 | H | $CH_2CH_2$ | Me | Et | H | $OCF_3$ | $CH_2CN$ | O |
| C-4914 | Me | $CH_2CH_2$ | H | Et | H | $OCF_3$ | $CH_2CN$ | O |
| C-4915 | H | single bond | Me | c-Pr | H | $OCF_3$ | $CH_2CN$ | O |
| C-4916 | Me | single bond | H | c-Pr | H | $OCF_3$ | $CH_2CN$ | O |
| C-4917 | Me(R) | single bond | H | c-Pr | H | $OCF_3$ | $CH_2CN$ | O |
| C-4918 | Me(S) | single bond | H | c-Pr | H | $OCF_3$ | $CH_2CN$ | O |

TABLE 338-continued

| Compound Number | Y | W | Z | $R^1$ | $R^2$ | $R^3$ | $R^{10}$ | A |
|---|---|---|---|---|---|---|---|---|
| C-4919 | H | $CH_2$ | Me | c-Pr | H | $OCF_3$ | $CH_2CN$ | O |
| C-4920 | Me | $CH_2$ | H | c-Pr | H | $OCF_3$ | $CH_2CN$ | O |
| C-4921 | H | CH(Me) | H | c-Pr | H | $OCF_3$ | $CH_2CN$ | O |
| C-4922 | H | $CH_2CH_2$ | Me | c-Pr | H | $OCF_3$ | $CH_2CN$ | O |

TABLE 339

| Compound Number | Y | W | Z | $R^1$ | $R^2$ | $R^3$ | $R^{10}$ | A |
|---|---|---|---|---|---|---|---|---|
| C-4923 | Me | $CH_2CH_2$ | H | c-Pr | H | $OCF_3$ | $CH_2CN$ | O |
| C-4924 | H | single bond | Me | c-Pr(1-CN) | H | $OCF_3$ | $CH_2CN$ | O |
| C-4925 | Me | single bond | H | c-Pr(1-CN) | H | $OCF_3$ | $CH_2CN$ | O |
| C-4926 | Me(R) | single bond | H | c-Pr(1-CN) | H | $OCF_3$ | $CH_2CN$ | O |
| C-4927 | Me(S) | single bond | H | c-Pr(1-CN) | H | $OCF_3$ | $CH_2CN$ | O |
| C-4928 | H | $CH_2$ | Me | c-Pr(1-CN) | H | $OCF_3$ | $CH_2CN$ | O |
| C-4929 | Me | $CH_2$ | H | c-Pr(1-CN) | H | $OCF_3$ | $CH_2CN$ | O |
| C-4930 | H | CH(Me) | H | c-Pr(1-CN) | H | $OCF_3$ | $CH_2CN$ | O |
| C-4931 | H | $CH_2CH_2$ | Me | c-Pr(1-CN) | H | $OCF_3$ | $CH_2CN$ | O |
| C-4932 | Me | $CH_2CH_2$ | H | c-Pr(1-CN) | H | $OCF_3$ | $CH_2CN$ | O |
| C-4933 | H | single bond | Me | $CH_2CF_3$ | Me | Br | H | O |
| C-4934 | Me | single bond | H | $CH_2CF_3$ | Me | Br | H | O |
| C-4935 | Me(R) | single bond | H | $CH_2CF_3$ | Me | Br | H | O |
| C-4936 | Me(S) | single bond | H | $CH_2CF_3$ | Me | Br | H | O |
| C-4937 | H | $CH_2$ | Me | $CH_2CF_3$ | Me | Br | H | O |
| C-4938 | Me | $CH_2$ | H | $CH_2CF_3$ | Me | Br | H | O |
| C-4939 | H | CH(Me) | H | $CH_2CF_3$ | Me | Br | H | O |
| C-4940 | H | $CH_2CH_2$ | Me | $CH_2CF_3$ | Me | Br | H | O |
| C-4941 | Me | $CH_2CH_2$ | H | $CH_2CF_3$ | Me | Br | H | O |
| C-4942 | H | single bond | Me | Et | Me | Br | H | O |
| C-4943 | Me | single bond | H | Et | Me | Br | H | O |
| C-4944 | Me(R) | single bond | H | Et | Me | Br | H | O |
| C-4945 | Me(S) | single bond | H | Et | Me | Br | H | O |
| C-4946 | H | $CH_2$ | Me | Et | Me | Br | H | O |
| C-4947 | Me | $CH_2$ | H | Et | Me | Br | H | O |
| C-4948 | H | CH(Me) | H | Et | Me | Br | H | O |
| C-4949 | H | $CH_2CH_2$ | Me | Et | Me | Br | H | O |
| C-4950 | Me | $CH_2CH_2$ | H | Et | Me | Br | H | O |
| C-4951 | H | single bond | Me | c-Pr | Me | Br | H | O |
| C-4952 | Me | single bond | H | c-Pr | Me | Br | H | O |
| C-4953 | Me(R) | single bond | H | c-Pr | Me | Br | H | O |
| C-4954 | Me(S) | single bond | H | c-Pr | Me | Br | H | O |
| C-4955 | H | $CH_2$ | Me | c-Pr | Me | Br | H | O |
| C-4956 | Me | $CH_2$ | H | c-Pr | Me | Br | H | O |
| C-4957 | H | CH(Me) | H | c-Pr | Me | Br | H | O |
| C-4958 | H | $CH_2CH_2$ | Me | c-Pr | Me | Br | H | O |
| C-4959 | Me | $CH_2CH_2$ | H | c-Pr | Me | Br | H | O |
| C-4960 | H | single bond | Me | c-Pr(1-CN) | Me | Br | H | O |
| C-4961 | Me | single bond | H | c-Pr(1-CN) | Me | Br | H | O |
| C-4962 | Me(R) | single bond | H | c-Pr(1-CN) | Me | Br | H | O |
| C-4963 | Me(S) | single bond | H | c-Pr(1-CN) | Me | Br | H | O |
| C-4964 | H | $CH_2$ | Me | c-Pr(1-CN) | Me | Br | H | O |
| C-4965 | Me | $CH_2$ | H | c-Pr(1-CN) | Me | Br | H | O |
| C-4966 | H | CH(Me) | H | c-Pr(1-CN) | Me | Br | H | O |

TABLE 340

| Compound Number | Y | W | Z | $R^1$ | $R^2$ | $R^3$ | $R^{10}$ | A |
|---|---|---|---|---|---|---|---|---|
| C-4967 | H | $CH_2CH_2$ | Me | c-Pr(1-CN) | Me | Br | H | O |
| C-4968 | Me | $CH_2CH_2$ | H | c-Pr(1-CN) | Me | Br | H | O |
| C-4969 | H | single bond | Me | $CH_2CF_3$ | Me | $CF_3$ | H | O |
| C-4970 | Me | single bond | H | $CH_2CF_3$ | Me | $CF_3$ | H | O |
| C-4971 | Me(R) | single bond | H | $CH_2CF_3$ | Me | $CF_3$ | H | O |
| C-4972 | Me(S) | single bond | H | $CH_2CF_3$ | Me | $CF_3$ | H | O |
| C-4973 | H | $CH_2$ | Me | $CH_2CF_3$ | Me | $CF_3$ | H | O |
| C-4974 | Me | $CH_2$ | H | $CH_2CF_3$ | Me | $CF_3$ | H | O |
| C-4975 | H | CH(Me) | H | $CH_2CF_3$ | Me | $CF_3$ | H | O |
| C-4976 | H | $CH_2CH_2$ | Me | $CH_2CF_3$ | Me | $CF_3$ | H | O |

TABLE 340-continued

| Compound Number | Y | W | Z | $R^1$ | $R^2$ | $R^3$ | $R^{10}$ | A |
|---|---|---|---|---|---|---|---|---|
| C-4977 | Me | $CH_2CH_2$ | H | $CH_2CF_3$ | Me | $CF_3$ | H | O |
| C-4978 | H | single bond | Me | Et | Me | $CF_3$ | H | O |
| C-4979 | Me | single bond | H | Et | Me | $CF_3$ | H | O |
| C-4980 | Me(R) | single bond | H | Et | Me | $CF_3$ | H | O |
| C-4981 | Me(S) | single bond | H | Et | Me | $CF_3$ | H | O |
| C-4982 | H | $CH_2$ | Me | Et | Me | $CF_3$ | H | O |
| C-4983 | Me | $CH_2$ | H | Et | Me | $CF_3$ | H | O |
| C-4984 | H | CH(Me) | H | Et | Me | $CF_3$ | H | O |
| C-4985 | H | $CH_2CH_2$ | Me | Et | Me | $CF_3$ | H | O |
| C-4986 | Me | $CH_2CH_2$ | H | Et | Me | $CF_3$ | H | O |

TABLE 340-continued

| Compound Number | Y | W | Z | $R^1$ | $R^2$ | $R^3$ | $R^{10}$ | A |
|---|---|---|---|---|---|---|---|---|
| C-4987 | H | single bond | Me | c-Pr | Me | $CF_3$ | H | O |
| C-4988 | Me | single bond | H | c-Pr | Me | $CF_3$ | H | O |
| C-4989 | Me(R) | single bond | H | c-Pr | Me | $CF_3$ | H | O |
| C-4990 | Me(S) | single bond | H | c-Pr | Me | $CF_3$ | H | O |
| C-4991 | H | $CH_2$ | Me | c-Pr | Me | $CF_3$ | H | O |
| C-4992 | Me | $CH_2$ | H | c-Pr | Me | $CF_3$ | H | O |
| C-4993 | H | CH(Me) | H | c-Pr | Me | $CF_3$ | H | O |
| C-4994 | H | $CH_2CH_2$ | Me | c-Pr | Me | $CF_3$ | H | O |
| C-4995 | Me | $CH_2CH_2$ | H | c-Pr | Me | $CF_3$ | H | O |
| C-4996 | H | single bond | Me | c-Pr(1-CN) | Me | $CF_3$ | H | O |
| C-4997 | Me | single bond | H | c-Pr(1-CN) | Me | $CF_3$ | H | O |
| C-4998 | Me(R) | single bond | H | c-Pr(1-CN) | Me | $CF_3$ | H | O |
| C-4999 | Me(S) | single bond | H | c-Pr(1-CN) | Me | $CF_3$ | H | O |
| C-5000 | H | $CH_2$ | Me | c-Pr(1-CN) | Me | $CF_3$ | H | O |
| C-5001 | Me | $CH_2$ | H | c-Pr(1-CN) | Me | $CF_3$ | H | O |
| C-5002 | H | CH(Me) | H | c-Pr(1-CN) | Me | $CF_3$ | H | O |
| C-5003 | H | $CH_2CH_2$ | Me | c-Pr(1-CN) | Me | $CF_3$ | H | O |
| C-5004 | Me | $CH_2CH_2$ | H | c-Pr(1-CN) | Me | $CF_3$ | H | O |
| C-5005 | H | single bond | Me | $CH_2CF_3$ | Me | OMe | H | O |
| C-5006 | Me | single bond | H | $CH_2CF_3$ | Me | OMe | H | O |
| C-5007 | Me(R) | single bond | H | $CH_2CF_3$ | Me | OMe | H | O |
| C-5008 | Me(S) | single bond | H | $CH_2CF_3$ | Me | OMe | H | O |
| C-5009 | H | $CH_2$ | Me | $CH_2CF_3$ | Me | OMe | H | O |
| C-5010 | Me | $CH_2$ | H | $CH_2CF_3$ | Me | OMe | H | O |

TABLE 341

| Compound Number | Y | W | Z | $R^1$ | $R^2$ | $R^3$ | $R^{10}$ | A |
|---|---|---|---|---|---|---|---|---|
| C-5011 | H | CH(Me) | H | $CH_2CF_3$ | Me | OMe | H | O |
| C-5012 | H | $CH_2CH_2$ | Me | $CH_2CF_3$ | Me | OMe | H | O |
| C-5013 | Me | $CH_2CH_2$ | H | $CH_2CF_3$ | Me | OMe | H | O |
| C-5014 | H | single bond | Me | Et | Me | OMe | H | O |
| C-5015 | Me | single bond | H | Et | Me | OMe | H | O |
| C-5016 | Me(R) | single bond | H | Et | Me | OMe | H | O |
| C-5017 | Me(S) | single bond | H | Et | Me | OMe | H | O |
| C-5018 | H | $CH_2$ | Me | Et | Me | OMe | H | O |
| C-5019 | Me | $CH_2$ | H | Et | Me | OMe | H | O |
| C-5020 | H | CH(Me) | H | Et | Me | OMe | H | O |
| C-5021 | H | $CH_2CH_2$ | Me | Et | Me | OMe | H | O |
| C-5022 | Me | $CH_2CH_2$ | H | Et | Me | OMe | H | O |
| C-5023 | H | single bond | Me | c-Pr | Me | OMe | H | O |
| C-5024 | Me | single bond | H | c-Pr | Me | OMe | H | O |
| C-5025 | Me(R) | single bond | H | c-Pr | Me | OMe | H | O |
| C-5026 | Me(S) | single bond | H | c-Pr | Me | OMe | H | O |
| C-5027 | H | $CH_2$ | Me | c-Pr | Me | OMe | H | O |
| C-5028 | Me | $CH_2$ | H | c-Pr | Me | OMe | H | O |
| C-5029 | H | CH(Me) | H | c-Pr | Me | OMe | H | O |
| C-5030 | H | $CH_2CH_2$ | Me | c-Pr | Me | OMe | H | O |
| C-5031 | Me | $CH_2CH_2$ | H | c-Pr | Me | OMe | H | O |
| C-5032 | H | single bond | Me | c-Pr(1-CN) | Me | OMe | H | O |
| C-5033 | Me | single bond | H | c-Pr(1-CN) | Me | OMe | H | O |
| C-5034 | Me(R) | single bond | H | c-Pr(1-CN) | Me | OMe | H | O |
| C-5035 | Me(S) | single bond | H | c-Pr(1-CN) | Me | OMe | H | O |
| C-5036 | H | $CH_2$ | Me | c-Pr(1-CN) | Me | OMe | H | O |
| C-5037 | Me | $CH_2$ | H | c-Pr(1-CN) | Me | OMe | H | O |
| C-5038 | H | CH(Me) | H | c-Pr(1-CN) | Me | OMe | H | O |
| C-5039 | H | $CH_2CH_2$ | Me | c-Pr(1-CN) | Me | OMe | H | O |
| C-5040 | Me | $CH_2CH_2$ | H | c-Pr(1-CN) | Me | OMe | H | O |
| C-5041 | H | single bond | Me | $CH_2CF_3$ | Me | $OCF_3$ | H | O |
| C-5042 | Me | single bond | H | $CH_2CF_3$ | Me | $OCF_3$ | H | O |
| C-5043 | Me(R) | single bond | H | $CH_2CF_3$ | Me | $OCF_3$ | H | O |
| C-5044 | Me(S) | single bond | H | $CH_2CF_3$ | Me | $OCF_3$ | H | O |
| C-5045 | H | $CH_2$ | Me | $CH_2CF_3$ | Me | $OCF_3$ | H | O |
| C-5046 | Me | $CH_2$ | H | $CH_2CF_3$ | Me | $OCF_3$ | H | O |
| C-5047 | H | CH(Me) | H | $CH_2CF_3$ | Me | $OCF_3$ | H | O |
| C-5048 | H | $CH_2CH_2$ | Me | $CH_2CF_3$ | Me | $OCF_3$ | H | O |
| C-5049 | Me | $CH_2CH_2$ | H | $CH_2CF_3$ | Me | $OCF_3$ | H | O |
| C-5050 | H | single bond | Me | Et | Me | $OCF_3$ | H | O |
| C-5051 | Me | single bond | H | Et | Me | $OCF_3$ | H | O |
| C-5052 | Me(R) | single bond | H | Et | Me | $OCF_3$ | H | O |

TABLE 341-continued

| Compound Number | Y | W | Z | $R^1$ | $R^2$ | $R^3$ | $R^{10}$ | A |
|---|---|---|---|---|---|---|---|---|
| C-5053 | Me(S) | single bond | H | Et | Me | $OCF_3$ | H | O |
| C-5054 | H | $CH_2$ | Me | Et | Me | $OCF_3$ | H | O |

TABLE 342

| Compound Number | Y | W | Z | $R^1$ | $R^2$ | $R^3$ | $R^{10}$ | A |
|---|---|---|---|---|---|---|---|---|
| C-5055 | Me | $CH_2$ | H | Et | Me | $OCF_3$ | H | O |
| C-5056 | H | CH(Me) | H | Et | Me | $OCF_3$ | H | O |
| C-5057 | H | $CH_2CH_2$ | Me | Et | Me | $OCF_3$ | H | O |
| C-5058 | Me | $CH_2CH_2$ | H | Et | Me | $OCF_3$ | H | O |
| C-5059 | H | single bond | Me | c-Pr | Me | $OCF_3$ | H | O |
| C-5060 | Me | single bond | H | c-Pr | Me | $OCF_3$ | H | O |
| C-5061 | Me(R) | single bond | H | c-Pr | Me | $OCF_3$ | H | O |
| C-5062 | Me(S) | single bond | H | c-Pr | Me | $OCF_3$ | H | O |
| C-5063 | H | $CH_2$ | Me | c-Pr | Me | $OCF_3$ | H | O |
| C-5064 | Me | $CH_2$ | H | c-Pr | Me | $OCF_3$ | H | O |
| C-5065 | H | CH(Me) | H | c-Pr | Me | $OCF_3$ | H | O |
| C-5066 | H | $CH_2CH_2$ | Me | c-Pr | Me | $OCF_3$ | H | O |
| C-5067 | Me | $CH_2CH_2$ | H | c-Pr | Me | $OCF_3$ | H | O |
| C-5068 | H | single bond | Me | c-Pr(1-CN) | Me | $OCF_3$ | H | O |
| C-5069 | Me | single bond | H | c-Pr(1-CN) | Me | $OCF_3$ | H | O |
| C-5070 | Me(R) | single bond | H | c-Pr(1-CN) | Me | $OCF_3$ | H | O |
| C-5071 | Me(S) | single bond | H | c-Pr(1-CN) | Me | $OCF_3$ | H | O |
| C-5072 | H | $CH_2$ | Me | c-Pr(1-CN) | Me | $OCF_3$ | H | O |
| C-5073 | Me | $CH_2$ | H | c-Pr(1-CN) | Me | $OCF_3$ | H | O |
| C-5074 | H | CH(Me) | H | c-Pr(1-CN) | Me | $OCF_3$ | H | O |
| C-5075 | H | $CH_2CH_2$ | Me | c-Pr(1-CN) | Me | $OCF_3$ | H | O |
| C-5076 | Me | $CH_2CH_2$ | H | c-Pr(1-CN) | Me | $OCF_3$ | H | O |
| C-5077 | H | single bond | Me | $CH_2CF_3$ | Me | Br | Me | O |
| C-5078 | Me | single bond | H | $CH_2CF_3$ | Me | Br | Me | O |
| C-5079 | Me(R) | single bond | H | $CH_2CF_3$ | Me | Br | Me | O |
| C-5080 | Me(S) | single bond | H | $CH_2CF_3$ | Me | Br | Me | O |
| C-5081 | H | $CH_2$ | Me | $CH_2CF_3$ | Me | Br | Me | O |
| C-5082 | Me | $CH_2$ | H | $CH_2CF_3$ | Me | Br | Me | O |
| C-5083 | H | CH(Me) | H | $CH_2CF_3$ | Me | Br | Me | O |
| C-5084 | H | $CH_2CH_2$ | Me | $CH_2CF_3$ | Me | Br | Me | O |
| C-5085 | Me | $CH_2CH_2$ | H | $CH_2CF_3$ | Me | Br | Me | O |
| C-5086 | H | single bond | Me | Et | Me | Br | Me | O |
| C-5087 | Me | single bond | H | Et | Me | Br | Me | O |
| C-5088 | Me(R) | single bond | H | Et | Me | Br | Me | O |
| C-5089 | Me(S) | single bond | H | Et | Me | Br | Me | O |
| C-5090 | H | $CH_2$ | Me | Et | Me | Br | Me | O |
| C-5091 | Me | $CH_2$ | H | Et | Me | Br | Me | O |
| C-5092 | H | CH(Me) | H | Et | Me | Br | Me | O |
| C-5093 | H | $CH_2CH_2$ | Me | Et | Me | Br | Me | O |
| C-5094 | Me | $CH_2CH_2$ | H | Et | Me | Br | Me | O |
| C-5095 | H | single bond | Me | c-Pr | Me | Br | Me | O |
| C-5096 | Me | single bond | H | c-Pr | Me | Br | Me | O |
| C-5097 | Me(R) | single bond | H | c-Pr | Me | Br | Me | O |
| C-5098 | Me(S) | single bond | H | c-Pr | Me | Br | Me | O |

TABLE 343

| Compound Number | Y | W | Z | $R^1$ | $R^2$ | $R^3$ | $R^{10}$ | A |
|---|---|---|---|---|---|---|---|---|
| C-5099 | H | $CH_2$ | Me | c-Pr | Me | Br | Me | O |
| C-5100 | Me | $CH_2$ | H | c-Pr | Me | Br | Me | O |
| C-5101 | H | CH(Me) | H | c-Pr | Me | Br | Me | O |
| C-5102 | H | $CH_2CH_2$ | Me | c-Pr | Me | Br | Me | O |
| C-5103 | Me | $CH_2CH_2$ | H | c-Pr | Me | Br | Me | O |
| C-5104 | H | single bond | Me | c-Pr(1-CN) | Me | Br | Me | O |
| C-5105 | Me | single bond | H | c-Pr(1-CN) | Me | Br | Me | O |
| C-5106 | Me(R) | single bond | H | c-Pr(1-CN) | Me | Br | Me | O |
| C-5107 | Me(S) | single bond | H | c-Pr(1-CN) | Me | Br | Me | O |
| C-5108 | H | $CH_2$ | Me | c-Pr(1-CN) | Me | Br | Me | O |
| C-5109 | Me | $CH_2$ | H | c-Pr(1-CN) | Me | Br | Me | O |
| C-5110 | H | CH(Me) | H | c-Pr(1-CN) | Me | Br | Me | O |
| C-5111 | H | $CH_2CH_2$ | Me | c-Pr(1-CN) | Me | Br | Me | O |
| C-5112 | Me | $CH_2CH_2$ | H | c-Pr(1-CN) | Me | Br | Me | O |

TABLE 343-continued

| Compound Number | Y | W | Z | $R^1$ | $R^2$ | $R^3$ | $R^{10}$ | A |
|---|---|---|---|---|---|---|---|---|
| C-5113 | H | single bond | Me | $CH_2CF_3$ | Me | $CF_3$ | Me | O |
| C-5114 | Me | single bond | H | $CH_2CF_3$ | Me | $CF_3$ | Me | O |
| C-5115 | Me(R) | single bond | H | $CH_2CF_3$ | Me | $CF_3$ | Me | O |
| C-5116 | Me(S) | single bond | H | $CH_2CF_3$ | Me | $CF_3$ | Me | O |
| C-5117 | H | $CH_2$ | Me | $CH_2CF_3$ | Me | $CF_3$ | Me | O |
| C-5118 | Me | $CH_2$ | H | $CH_2CF_3$ | Me | $CF_3$ | Me | O |
| C-5119 | H | CH(Me) | H | $CH_2CF_3$ | Me | $CF_3$ | Me | O |
| C-5120 | H | $CH_2CH_2$ | Me | $CH_2CF_3$ | Me | $CF_3$ | Me | O |
| C-5121 | Me | $CH_2CH_2$ | H | $CH_2CF_3$ | Me | $CF_3$ | Me | O |
| C-5122 | H | single bond | Me | Et | Me | $CF_3$ | Me | O |
| C-5123 | Me | single bond | H | Et | Me | $CF_3$ | Me | O |
| C-5124 | Me(R) | single bond | H | Et | Me | $CF_3$ | Me | O |
| C-5125 | Me(S) | single bond | H | Et | Me | $CF_3$ | Me | O |
| C-5126 | H | $CH_2$ | Me | Et | Me | $CF_3$ | Me | O |
| C-5127 | Me | $CH_2$ | H | Et | Me | $CF_3$ | Me | O |
| C-5128 | H | CH(Me) | H | Et | Me | $CF_3$ | Me | O |
| C-5129 | H | $CH_2CH_2$ | Me | Et | Me | $CF_3$ | Me | O |
| C-5130 | Me | $CH_2CH_2$ | H | Et | Me | $CF_3$ | Me | O |
| C-5131 | H | single bond | Me | c-Pr | Me | $CF_3$ | Me | O |
| C-5132 | Me | single bond | H | c-Pr | Me | $CF_3$ | Me | O |
| C-5133 | Me(R) | single bond | H | c-Pr | Me | $CF_3$ | Me | O |
| C-5134 | Me(S) | single bond | H | c-Pr | Me | $CF_3$ | Me | O |
| C-5135 | H | $CH_2$ | Me | c-Pr | Me | $CF_3$ | Me | O |
| C-5136 | Me | $CH_2$ | H | c-Pr | Me | $CF_3$ | Me | O |
| C-5137 | H | CH(Me) | H | c-Pr | Me | $CF_3$ | Me | O |
| C-5138 | H | $CH_2CH_2$ | Me | c-Pr | Me | $CF_3$ | Me | O |
| C-5139 | Me | $CH_2CH_2$ | H | c-Pr | Me | $CF_3$ | Me | O |
| C-5140 | H | single bond | Me | c-Pr(1-CN) | Me | $CF_3$ | Me | O |
| C-5141 | Me | single bond | H | c-Pr(1-CN) | Me | $CF_3$ | Me | O |
| C-5142 | Me(R) | single bond | H | c-Pr(1-CN) | Me | $CF_3$ | Me | O |

TABLE 344

| Compound Number | Y | W | Z | $R^1$ | $R^2$ | $R^3$ | $R^{10}$ | A |
|---|---|---|---|---|---|---|---|---|
| C-5143 | Me(S) | single bond | H | c-Pr(1-CN) | Me | $CF_3$ | Me | O |
| C-5144 | H | $CH_2$ | Me | c-Pr(1-CN) | Me | $CF_3$ | Me | O |
| C-5145 | Me | $CH_2$ | H | c-Pr(1-CN) | Me | $CF_3$ | Me | O |
| C-5146 | H | CH(Me) | H | c-Pr(1-CN) | Me | $CF_3$ | Me | O |

TABLE 344-continued

| Compound Number | Y | W | Z | $R^1$ | $R^2$ | $R^3$ | $R^{10}$ | A |
|---|---|---|---|---|---|---|---|---|
| C-5147 | H | $CH_2CH_2$ | Me | c-Pr(1-CN) | Me | $CF_3$ | Me | O |
| C-5148 | Me | $CH_2CH_2$ | H | c-Pr(1-CN) | Me | $CF_3$ | Me | O |
| C-5149 | H | single bond | Me | $CH_2CF_3$ | Me | OMe | Me | O |
| C-5150 | Me | single bond | H | $CH_2CF_3$ | Me | OMe | Me | O |
| C-5151 | Me(R) | single bond | H | $CH_2CF_3$ | Me | OMe | Me | O |
| C-5152 | Me(S) | single bond | H | $CH_2CF_3$ | Me | OMe | Me | O |
| C-5153 | H | $CH_2$ | Me | $CH_2CF_3$ | Me | OMe | Me | O |
| C-5154 | Me | $CH_2$ | H | $CH_2CF_3$ | Me | OMe | Me | O |
| C-5155 | H | CH(Me) | H | $CH_2CF_3$ | Me | OMe | Me | O |
| C-5156 | H | $CH_2CH_2$ | Me | $CH_2CF_3$ | Me | OMe | Me | O |
| C-5157 | Me | $CH_2CH_2$ | H | $CH_2CF_3$ | Me | OMe | Me | O |
| C-5158 | H | single bond | Me | Et | Me | OMe | Me | O |
| C-5159 | Me | single bond | H | Et | Me | OMe | Me | O |
| C-5160 | Me(R) | single bond | H | Et | Me | OMe | Me | O |
| C-5161 | Me(S) | single bond | H | Et | Me | OMe | Me | O |
| C-5162 | H | $CH_2$ | Me | Et | Me | OMe | Me | O |
| C-5163 | Me | $CH_2$ | H | Et | Me | OMe | Me | O |
| C-5164 | H | CH(Me) | H | Et | Me | OMe | Me | O |
| C-5165 | H | $CH_2CH_2$ | Me | Et | Me | OMe | Me | O |
| C-5166 | Me | $CH_2CH_2$ | H | Et | Me | OMe | Me | O |
| C-5167 | H | single bond | Me | c-Pr | Me | OMe | Me | O |
| C-5168 | Me | single bond | H | c-Pr | Me | OMe | Me | O |
| C-5169 | Me(R) | single bond | H | c-Pr | Me | OMe | Me | O |
| C-5170 | Me(S) | single bond | H | c-Pr | Me | OMe | Me | O |
| C-5171 | H | $CH_2$ | Me | c-Pr | Me | OMe | Me | O |
| C-5172 | Me | $CH_2$ | H | c-Pr | Me | OMe | Me | O |
| C-5173 | H | CH(Me) | H | c-Pr | Me | OMe | Me | O |
| C-5174 | H | $CH_2CH_2$ | Me | c-Pr | Me | OMe | Me | O |
| C-5175 | Me | $CH_2CH_2$ | H | c-Pr | Me | OMe | Me | O |
| C-5176 | H | single bond | Me | c-Pr(1-CN) | Me | OMe | Me | O |
| C-5177 | Me | single bond | H | c-Pr(1-CN) | Me | OMe | Me | O |
| C-5178 | Me(R) | single bond | H | c-Pr(1-CN) | Me | OMe | Me | O |
| C-5179 | Me(S) | single bond | H | c-Pr(1-CN) | Me | OMe | Me | O |
| C-5180 | H | $CH_2$ | Me | c-Pr(1-CN) | Me | OMe | Me | O |
| C-5181 | Me | $CH_2$ | H | c-Pr(1-CN) | Me | OMe | Me | O |
| C-5182 | H | CH(Me) | H | c-Pr(1-CN) | Me | OMe | Me | O |
| C-5183 | H | $CH_2CH_2$ | Me | c-Pr(1-CN) | Me | OMe | Me | O |
| C-5184 | Me | $CH_2CH_2$ | H | c-Pr(1-CN) | Me | OMe | Me | O |
| C-5185 | H | single bond | Me | $CH_2CF_3$ | Me | $OCF_3$ | Me | O |
| C-5186 | Me | single bond | H | $CH_2CF_3$ | Me | $OCF_3$ | Me | O |

TABLE 345

| Compound Number | Y | W | Z | $R^1$ | $R^2$ | $R^3$ | $R^{10}$ | A |
|---|---|---|---|---|---|---|---|---|
| C-5187 | Me(R) | single bond | H | $CH_2CF_3$ | Me | $OCF_3$ | Me | O |
| C-5188 | Me(S) | single bond | H | $CH_2CF_3$ | Me | $OCF_3$ | Me | O |
| C-5189 | H | $CH_2$ | Me | $CH_2CF_3$ | Me | $OCF_3$ | Me | O |
| C-5190 | Me | $CH_2$ | H | $CH_2CF_3$ | Me | $OCF_3$ | Me | O |
| C-5191 | H | CH(Me) | H | $CH_2CF_3$ | Me | $OCF_3$ | Me | O |
| C-5192 | H | $CH_2CH_2$ | Me | $CH_2CF_3$ | Me | $OCF_3$ | Me | O |
| C-5193 | Me | $CH_2CH_2$ | H | $CH_2CF_3$ | Me | $OCF_3$ | Me | O |
| C-5194 | H | single bond | Me | Et | Me | $OCF_3$ | Me | O |
| C-5195 | Me | single bond | H | Et | Me | $OCF_3$ | Me | O |
| C-5196 | Me(R) | single bond | H | Et | Me | $OCF_3$ | Me | O |
| C-5197 | Me(S) | single bond | H | Et | Me | $OCF_3$ | Me | O |
| C-5198 | H | $CH_2$ | Me | Et | Me | $OCF_3$ | Me | O |
| C-5199 | Me | $CH_2$ | H | Et | Me | $OCF_3$ | Me | O |
| C-5200 | H | CH(Me) | H | Et | Me | $OCF_3$ | Me | O |
| C-5201 | H | $CH_2CH_2$ | Me | Et | Me | $OCF_3$ | Me | O |
| C-5202 | Me | $CH_2CH_2$ | H | Et | Me | $OCF_3$ | Me | O |
| C-5203 | H | single bond | Me | c-Pr | Me | $OCF_3$ | Me | O |
| C-5204 | Me | single bond | H | c-Pr | Me | $OCF_3$ | Me | O |
| C-5205 | Me(R) | single bond | H | c-Pr | Me | $OCF_3$ | Me | O |
| C-5206 | Me(S) | single bond | H | c-Pr | Me | $OCF_3$ | Me | O |
| C-5207 | H | $CH_2$ | Me | c-Pr | Me | $OCF_3$ | Me | O |
| C-5208 | Me | $CH_2$ | H | c-Pr | Me | $OCF_3$ | Me | O |
| C-5209 | H | CH(Me) | H | c-Pr | Me | $OCF_3$ | Me | O |
| C-5210 | H | $CH_2CH_2$ | Me | c-Pr | Me | $OCF_3$ | Me | O |
| C-5211 | Me | $CH_2CH_2$ | H | c-Pr | Me | $OCF_3$ | Me | O |
| C-5212 | H | single bond | Me | c-Pr(1-CN) | Me | $OCF_3$ | Me | O |
| C-5213 | Me | single bond | H | c-Pr(1-CN) | Me | $OCF_3$ | Me | O |

TABLE 345-continued

| Compound Number | Y | W | Z | $R^1$ | $R^2$ | $R^3$ | $R^{10}$ | A |
|---|---|---|---|---|---|---|---|---|
| C-5214 | Me(R) | single bond | H | c-Pr(1-CN) | Me | $OCF_3$ | Me | O |
| C-5215 | Me(S) | single bond | H | c-Pr(1-CN) | Me | $OCF_3$ | Me | O |
| C-5216 | H | $CH_2$ | Me | c-Pr(1-CN) | Me | $OCF_3$ | Me | O |
| C-5217 | Me | $CH_2$ | H | c-Pr(1-CN) | Me | $OCF_3$ | Me | O |
| C-5218 | H | CH(Me) | H | c-Pr(1-CN) | Me | $OCF_3$ | Me | O |
| C-5219 | H | $CH_2CH_2$ | Me | c-Pr(1-CN) | Me | $OCF_3$ | Me | O |
| C-5220 | Me | $CH_2CH_2$ | H | c-Pr(1-CN) | Me | $OCF_3$ | Me | O |
| C-5221 | H | single bond | Me | $CH_2CF_3$ | Me | Br | $CH_2OMe$ | O |
| C-5222 | Me | single bond | H | $CH_2CF_3$ | Me | Br | $CH_2OMe$ | O |
| C-5223 | Me(R) | single bond | H | $CH_2CF_3$ | Me | Br | $CH_2OMe$ | O |
| C-5224 | Me(S) | single bond | H | $CH_2CF_3$ | Me | Br | $CH_2OMe$ | O |
| C-5225 | H | $CH_2$ | Me | $CH_2CF_3$ | Me | Br | $CH_2OMe$ | O |
| C-5226 | Me | $CH_2$ | H | $CH_2CF_3$ | Me | Br | $CH_2OMe$ | O |
| C-5227 | H | CH(Me) | H | $CH_2CF_3$ | Me | Br | $CH_2OMe$ | O |
| C-5228 | H | $CH_2CH_2$ | Me | $CH_2CF_3$ | Me | Br | $CH_2OMe$ | O |
| C-5229 | Me | $CH_2CH_2$ | H | $CH_2CF_3$ | Me | Br | $CH_2OMe$ | O |
| C-5230 | H | single bond | Me | Et | Me | Br | $CH_2OMe$ | O |

TABLE 346

| Compound Number | Y | W | Z | $R^1$ | $R^2$ | $R^3$ | $R^{10}$ | A |
|---|---|---|---|---|---|---|---|---|
| C-5231 | Me | single bond | H | Et | Me | Br | $CH_2OMe$ | O |
| C-5232 | Me(R) | single bond | H | Et | Me | Br | $CH_2OMe$ | O |
| C-5233 | Me(S) | single bond | H | Et | Me | Br | $CH_2OMe$ | O |
| C-5234 | H | $CH_2$ | Me | Et | Me | Br | $CH_2OMe$ | O |
| C-5235 | Me | $CH_2$ | H | Et | Me | Br | $CH_2OMe$ | O |
| C-5236 | H | CH(Me) | H | Et | Me | Br | $CH_2OMe$ | O |
| C-5237 | H | $CH_2CH_2$ | Me | Et | Me | Br | $CH_2OMe$ | O |
| C-5238 | Me | $CH_2CH_2$ | H | Et | Me | Br | $CH_2OMe$ | O |
| C-5239 | H | single bond | Me | c-Pr | Me | Br | $CH_2OMe$ | O |
| C-5240 | Me | single bond | H | c-Pr | Me | Br | $CH_2OMe$ | O |
| C-5241 | Me(R) | single bond | H | c-Pr | Me | Br | $CH_2OMe$ | O |
| C-5242 | Me(S) | single bond | H | c-Pr | Me | Br | $CH_2OMe$ | O |
| C-5243 | H | $CH_2$ | Me | c-Pr | Me | Br | $CH_2OMe$ | O |
| C-5244 | Me | $CH_2$ | H | c-Pr | Me | Br | $CH_2OMe$ | O |
| C-5245 | H | CH(Me) | H | c-Pr | Me | Br | $CH_2OMe$ | O |
| C-5246 | H | $CH_2CH_2$ | Me | c-Pr | Me | Br | $CH_2OMe$ | O |
| C-5247 | Me | $CH_2CH_2$ | H | c-Pr | Me | Br | $CH_2OMe$ | O |
| C-5248 | H | single bond | Me | c-Pr(1-CN) | Me | Br | $CH_2OMe$ | O |
| C-5249 | Me | single bond | H | c-Pr(1-CN) | Me | Br | $CH_2OMe$ | O |
| C-5250 | Me(R) | single bond | H | c-Pr(1-CN) | Me | Br | $CH_2OMe$ | O |
| C-5251 | Me(S) | single bond | H | c-Pr(1-CN) | Me | Br | $CH_2OMe$ | O |
| C-5252 | H | $CH_2$ | Me | c-Pr(1-CN) | Me | Br | $CH_2OMe$ | O |
| C-5253 | Me | $CH_2$ | H | c-Pr(1-CN) | Me | Br | $CH_2OMe$ | O |
| C-5254 | H | CH(Me) | H | c-Pr(1-CN) | Me | Br | $CH_2OMe$ | O |
| C-5255 | H | $CH_2CH_2$ | Me | c-Pr(1-CN) | Me | Br | $CH_2OMe$ | O |
| C-5256 | Me | $CH_2CH_2$ | H | c-Pr(1-CN) | Me | Br | $CH_2OMe$ | O |
| C-5257 | H | single bond | Me | $CH_2CF_3$ | Me | $CF_3$ | $CH_2OMe$ | O |
| C-5258 | Me | single bond | H | $CH_2CF_3$ | Me | $CF_3$ | $CH_2OMe$ | O |
| C-5259 | Me(R) | single bond | H | $CH_2CF_3$ | Me | $CF_3$ | $CH_2OMe$ | O |
| C-5260 | Me(S) | single bond | H | $CH_2CF_3$ | Me | $CF_3$ | $CH_2OMe$ | O |
| C-5261 | H | $CH_2$ | Me | $CH_2CF_3$ | Me | $CF_3$ | $CH_2OMe$ | O |
| C-5262 | Me | $CH_2$ | H | $CH_2CF_3$ | Me | $CF_3$ | $CH_2OMe$ | O |
| C-5263 | H | CH(Me) | H | $CH_2CF_3$ | Me | $CF_3$ | $CH_2OMe$ | O |
| C-5264 | H | $CH_2CH_2$ | Me | $CH_2CF_3$ | Me | $CF_3$ | $CH_2OMe$ | O |
| C-5265 | Me | $CH_2CH_2$ | H | $CH_2CF_3$ | Me | $CF_3$ | $CH_2OMe$ | O |
| C-5266 | H | single bond | Me | Et | Me | $CF_3$ | $CH_2OMe$ | O |
| C-5267 | Me | single bond | H | Et | Me | $CF_3$ | $CH_2OMe$ | O |
| C-5268 | Me(R) | single bond | H | Et | Me | $CF_3$ | $CH_2OMe$ | O |
| C-5269 | Me(S) | single bond | H | Et | Me | $CF_3$ | $CH_2OMe$ | O |
| C-5270 | H | $CH_2$ | Me | Et | Me | $CF_3$ | $CH_2OMe$ | O |
| C-5271 | Me | $CH_2$ | H | Et | Me | $CF_3$ | $CH_2OMe$ | O |
| C-5272 | H | CH(Me) | H | Et | Me | $CF_3$ | $CH_2OMe$ | O |
| C-5273 | H | $CH_2CH_2$ | Me | Et | Me | $CF_3$ | $CH_2OMe$ | O |
| C-5274 | Me | $CH_2CH_2$ | H | Et | Me | $CF_3$ | $CH_2OMe$ | O |

TABLE 347

| Compound Number | Y | W | Z | $R^1$ | $R^2$ | $R^3$ | $R^{10}$ | A |
|---|---|---|---|---|---|---|---|---|
| C-5275 | H | single bond | Me | c-Pr | Me | $CF_3$ | $CH_2OMe$ | O |
| C-5276 | Me | single bond | H | c-Pr | Me | $CF_3$ | $CH_2OMe$ | O |
| C-5277 | Me(R) | single bond | H | c-Pr | Me | $CF_3$ | $CH_2OMe$ | O |
| C-5278 | Me(S) | single bond | H | c-Pr | Me | $CF_3$ | $CH_2OMe$ | O |
| C-5279 | H | $CH_2$ | Me | c-Pr | Me | $CF_3$ | $CH_2OMe$ | O |
| C-5280 | Me | $CH_2$ | H | c-Pr | Me | $CF_3$ | $CH_2OMe$ | O |
| C-5281 | H | CH(Me) | H | c-Pr | Me | $CF_3$ | $CH_2OMe$ | O |
| C-5282 | H | $CH_2CH_2$ | Me | c-Pr | Me | $CF_3$ | $CH_2OMe$ | O |
| C-5283 | Me | $CH_2CH_2$ | H | c-Pr | Me | $CF_3$ | $CH_2OMe$ | O |
| C-5284 | H | single bond | Me | c-Pr(1-CN) | Me | $CF_3$ | $CH_2OMe$ | O |
| C-5285 | Me | single bond | H | c-Pr(1-CN) | Me | $CF_3$ | $CH_2OMe$ | O |
| C-5286 | Me(R) | single bond | H | c-Pr(1-CN) | Me | $CF_3$ | $CH_2OMe$ | O |
| C-5287 | Me(S) | single bond | H | c-Pr(1-CN) | Me | $CF_3$ | $CH_2OMe$ | O |
| C-5288 | H | $CH_2$ | Me | c-Pr(1-CN) | Me | $CF_3$ | $CH_2OMe$ | O |
| C-5289 | Me | $CH_2$ | H | c-Pr(1-CN) | Me | $CF_3$ | $CH_2OMe$ | O |
| C-5290 | H | CH(Me) | H | c-Pr(1-CN) | Me | $CF_3$ | $CH_2OMe$ | O |
| C-5291 | H | $CH_2CH_2$ | Me | c-Pr(1-CN) | Me | $CF_3$ | $CH_2OMe$ | O |
| C-5292 | Me | $CH_2CH_2$ | H | c-Pr(1-CN) | Me | $CF_3$ | $CH_2OMe$ | O |
| C-5293 | H | single bond | Me | $CH_2CF_3$ | Me | OMe | $CH_2OMe$ | O |
| C-5294 | Me | single bond | H | $CH_2CF_3$ | Me | OMe | $CH_2OMe$ | O |
| C-5295 | Me(R) | single bond | H | $CH_2CF_3$ | Me | OMe | $CH_2OMe$ | O |
| C-5296 | Me(S) | single bond | H | $CH_2CF_3$ | Me | OMe | $CH_2OMe$ | O |
| C-5297 | H | $CH_2$ | Me | $CH_2CF_3$ | Me | OMe | $CH_2OMe$ | O |
| C-5298 | Me | $CH_2$ | H | $CH_2CF_3$ | Me | OMe | $CH_2OMe$ | O |
| C-5299 | H | CH(Me) | H | $CH_2CF_3$ | Me | OMe | $CH_2OMe$ | O |
| C-5300 | H | $CH_2CH_2$ | Me | $CH_2CF_3$ | Me | OMe | $CH_2OMe$ | O |
| C-5301 | Me | $CH_2CH_2$ | H | $CH_2CF_3$ | Me | OMe | $CH_2OMe$ | O |
| C-5302 | H | single bond | Me | Et | Me | OMe | $CH_2OMe$ | O |
| C-5303 | Me | single bond | H | Et | Me | OMe | $CH_2OMe$ | O |
| C-5304 | Me(R) | single bond | H | Et | Me | OMe | $CH_2OMe$ | O |
| C-5305 | Me(S) | single bond | H | Et | Me | OMe | $CH_2OMe$ | O |
| C-5306 | H | $CH_2$ | Me | Et | Me | OMe | $CH_2OMe$ | O |
| C-5307 | Me | $CH_2$ | H | Et | Me | OMe | $CH_2OMe$ | O |
| C-5308 | H | CH(Me) | H | Et | Me | OMe | $CH_2OMe$ | O |
| C-5309 | H | $CH_2CH_2$ | Me | Et | Me | OMe | $CH_2OMe$ | O |
| C-5310 | Me | $CH_2CH_2$ | H | Et | Me | OMe | $CH_2OMe$ | O |
| C-5311 | H | single bond | Me | c-Pr | Me | OMe | $CH_2OMe$ | O |
| C-5312 | Me | single bond | H | c-Pr | Me | OMe | $CH_2OMe$ | O |
| C-5313 | Me(R) | single bond | H | c-Pr | Me | OMe | $CH_2OMe$ | O |
| C-5314 | Me(S) | single bond | H | c-Pr | Me | OMe | $CH_2OMe$ | O |
| C-5315 | H | $CH_2$ | Me | c-Pr | Me | OMe | $CH_2OMe$ | O |
| C-5316 | Me | $CH_2$ | H | c-Pr | Me | OMe | $CH_2OMe$ | O |
| C-5317 | H | CH(Me) | H | c-Pr | Me | OMe | $CH_2OMe$ | O |
| C-5318 | H | $CH_2CH_2$ | Me | c-Pr | Me | OMe | $CH_2OMe$ | O |

TABLE 348

| Compound Number | Y | W | Z | $R^1$ | $R^2$ | $R^3$ | $R^{10}$ | A |
|---|---|---|---|---|---|---|---|---|
| C-5319 | Me | $CH_2CH_2$ | H | c-Pr | Me | OMe | $CH_2OMe$ | O |
| C-5320 | H | single bond | Me | c-Pr(1-CN) | Me | OMe | $CH_2OMe$ | O |
| C-5321 | Me | single bond | H | c-Pr(1-CN) | Me | OMe | $CH_2OMe$ | O |
| C-5322 | Me(R) | single bond | H | c-Pr(1-CN) | Me | OMe | $CH_2OMe$ | O |
| C-5323 | Me(S) | single bond | H | c-Pr(1-CN) | Me | OMe | $CH_2OMe$ | O |
| C-5324 | H | $CH_2$ | Me | c-Pr(1-CN) | Me | OMe | $CH_2OMe$ | O |
| C-5325 | Me | $CH_2$ | H | c-Pr(1-CN) | Me | OMe | $CH_2OMe$ | O |
| C-5326 | H | CH(Me) | H | c-Pr(1-CN) | Me | OMe | $CH_2OMe$ | O |
| C-5327 | H | $CH_2CH_2$ | Me | c-Pr(1-CN) | Me | OMe | $CH_2OMe$ | O |
| C-5328 | Me | $CH_2CH_2$ | H | c-Pr(1-CN) | Me | OMe | $CH_2OMe$ | O |
| C-5329 | H | single bond | Me | $CH_2CF_3$ | Me | $OCF_3$ | $CH_2OMe$ | O |
| C-5330 | Me | single bond | H | $CH_2CF_3$ | Me | $OCF_3$ | $CH_2OMe$ | O |
| C-5331 | Me(R) | single bond | H | $CH_2CF_3$ | Me | $OCF_3$ | $CH_2OMe$ | O |
| C-5332 | Me(S) | single bond | H | $CH_2CF_3$ | Me | $OCF_3$ | $CH_2OMe$ | O |
| C-5333 | H | $CH_2$ | Me | $CH_2CF_3$ | Me | $OCF_3$ | $CH_2OMe$ | O |
| C-5334 | Me | $CH_2$ | H | $CH_2CF_3$ | Me | $OCF_3$ | $CH_2OMe$ | O |
| C-5335 | H | CH(Me) | H | $CH_2CF_3$ | Me | $OCF_3$ | $CH_2OMe$ | O |
| C-5336 | H | $CH_2CH_2$ | Me | $CH_2CF_3$ | Me | $OCF_3$ | $CH_2OMe$ | O |
| C-5337 | Me | $CH_2CH_2$ | H | $CH_2CF_3$ | Me | $OCF_3$ | $CH_2OMe$ | O |
| C-5338 | H | single bond | Me | Et | Me | $OCF_3$ | $CH_2OMe$ | O |
| C-5339 | Me | single bond | H | Et | Me | $OCF_3$ | $CH_2OMe$ | O |
| C-5340 | Me(R) | single bond | H | Et | Me | $OCF_3$ | $CH_2OMe$ | O |
| C-5341 | Me(S) | single bond | H | Et | Me | $OCF_3$ | $CH_2OMe$ | O |

TABLE 348-continued

| Compound Number | Y | W | Z | $R^1$ | $R^2$ | $R^3$ | $R^{10}$ | A |
|---|---|---|---|---|---|---|---|---|
| C-5342 | H | $CH_2$ | Me | Et | Me | $OCF_3$ | $CH_2OMe$ | O |
| C-5343 | Me | $CH_2$ | H | Et | Me | $OCF_3$ | $CH_2OMe$ | O |
| C-5344 | H | CH(Me) | H | Et | Me | $OCF_3$ | $CH_2OMe$ | O |
| C-5345 | H | $CH_2CH_2$ | Me | Et | Me | $OCF_3$ | $CH_2OMe$ | O |
| C-5346 | Me | $CH_2CH_2$ | H | Et | Me | $OCF_3$ | $CH_2OMe$ | O |
| C-5347 | H | single bond | Me | c-Pr | Me | $OCF_3$ | $CH_2OMe$ | O |
| C-5348 | Me | single bond | H | c-Pr | Me | $OCF_3$ | $CH_2OMe$ | O |
| C-5349 | Me(R) | single bond | H | c-Pr | Me | $OCF_3$ | $CH_2OMe$ | O |
| C-5350 | Me(S) | single bond | H | c-Pr | Me | $OCF_3$ | $CH_2OMe$ | O |
| C-5351 | H | $CH_2$ | Me | c-Pr | Me | $OCF_3$ | $CH_2OMe$ | O |
| C-5352 | Me | $CH_2$ | H | c-Pr | Me | $OCF_3$ | $CH_2OMe$ | O |
| C-5353 | H | CH(Me) | H | c-Pr | Me | $OCF_3$ | $CH_2OMe$ | O |
| C-5354 | H | $CH_2CH_2$ | Me | c-Pr | Me | $OCF_3$ | $CH_2OMe$ | O |
| C-5355 | Me | $CH_2CH_2$ | H | c-Pr | Me | $OCF_3$ | $CH_2OMe$ | O |
| C-5356 | H | single bond | Me | c-Pr(1-CN) | Me | $OCF_3$ | $CH_2OMe$ | O |
| C-5357 | Me | single bond | H | c-Pr(1-CN) | Me | $OCF_3$ | $CH_2OMe$ | O |
| C-5358 | Me(R) | single bond | H | c-Pr(1-CN) | Me | $OCF_3$ | $CH_2OMe$ | O |
| C-5359 | Me(S) | single bond | H | c-Pr(1-CN) | Me | $OCF_3$ | $CH_2OMe$ | O |
| C-5360 | H | $CH_2$ | Me | c-Pr(1-CN) | Me | $OCF_3$ | $CH_2OMe$ | O |
| C-5361 | Me | $CH_2$ | H | c-Pr(1-CN) | Me | $OCF_3$ | $CH_2OMe$ | O |
| C-5362 | H | CH(Me) | H | c-Pr(1-CN) | Me | $OCF_3$ | $CH_2OMe$ | O |

TABLE 349

| Compound Number | Y | W | Z | $R^1$ | $R^2$ | $R^3$ | $R^{10}$ | A |
|---|---|---|---|---|---|---|---|---|
| C-5363 | H | $CH_2CH_2$ | Me | c-Pr(1-CN) | Me | $OCF_3$ | $CH_2OMe$ | O |
| C-5364 | Me | $CH_2CH_2$ | H | c-Pr(1-CN) | Me | $OCF_3$ | $CH_2OMe$ | O |
| C-5365 | H | single bond | Me | $CH_2CF_3$ | Me | Br | $CH_2CN$ | O |
| C-5366 | Me | single bond | H | $CH_2CF_3$ | Me | Br | $CH_2CN$ | O |
| C-5367 | Me(R) | single bond | H | $CH_2CF_3$ | Me | Br | $CH_2CN$ | O |
| C-5368 | Me(S) | single bond | H | $CH_2CF_3$ | Me | Br | $CH_2CN$ | O |
| C-5369 | H | $CH_2$ | Me | $CH_2CF_3$ | Me | Br | $CH_2CN$ | O |
| C-5370 | Me | $CH_2$ | H | $CH_2CF_3$ | Me | Br | $CH_2CN$ | O |
| C-5371 | H | CH(Me) | H | $CH_2CF_3$ | Me | Br | $CH_2CN$ | O |
| C-5372 | H | $CH_2CH_2$ | Me | $CH_2CF_3$ | Me | Br | $CH_2CN$ | O |
| C-5373 | Me | $CH_2CH_2$ | H | $CH_2CF_3$ | Me | Br | $CH_2CN$ | O |
| C-5374 | H | single bond | Me | Et | Me | Br | $CH_2CN$ | O |
| C-5375 | Me | single bond | H | Et | Me | Br | $CH_2CN$ | O |
| C-5376 | Me(R) | single bond | H | Et | Me | Br | $CH_2CN$ | O |
| C-5377 | Me(S) | single bond | H | Et | Me | Br | $CH_2CN$ | O |
| C-5378 | H | $CH_2$ | Me | Et | Me | Br | $CH_2CN$ | O |
| C-5379 | Me | $CH_2$ | H | Et | Me | Br | $CH_2CN$ | O |
| C-5380 | H | CH(Me) | H | Et | Me | Br | $CH_2CN$ | O |
| C-5381 | H | $CH_2CH_2$ | Me | Et | Me | Br | $CH_2CN$ | O |
| C-5382 | Me | $CH_2CH_2$ | H | Et | Me | Br | $CH_2CN$ | O |
| C-5383 | H | single bond | Me | c-Pr | Me | Br | $CH_2CN$ | O |
| C-5384 | Me | single bond | H | c-Pr | Me | Br | $CH_2CN$ | O |
| C-5385 | Me(R) | single bond | H | c-Pr | Me | Br | $CH_2CN$ | O |
| C-5386 | Me(S) | single bond | H | c-Pr | Me | Br | $CH_2CN$ | O |
| C-5387 | H | $CH_2$ | Me | c-Pr | Me | Br | $CH_2CN$ | O |
| C-5388 | Me | $CH_2$ | H | c-Pr | Me | Br | $CH_2CN$ | O |
| C-5389 | H | CH(Me) | H | c-Pr | Me | Br | $CH_2CN$ | O |
| C-5390 | H | $CH_2CH_2$ | Me | c-Pr | Me | Br | $CH_2CN$ | O |
| C-5391 | Me | $CH_2CH_2$ | H | c-Pr | Me | Br | $CH_2CN$ | O |
| C-5392 | H | single bond | Me | c-Pr(1-CN) | Me | Br | $CH_2CN$ | O |
| C-5393 | Me | single bond | H | c-Pr(1-CN) | Me | Br | $CH_2CN$ | O |
| C-5394 | Me(R) | single bond | H | c-Pr(1-CN) | Me | Br | $CH_2CN$ | O |
| C-5395 | Me(S) | single bond | H | c-Pr(1-CN) | Me | Br | $CH_2CN$ | O |
| C-5396 | H | $CH_2$ | Me | c-Pr(1-CN) | Me | Br | $CH_2CN$ | O |
| C-5397 | Me | $CH_2$ | H | c-Pr(1-CN) | Me | Br | $CH_2CN$ | O |
| C-5398 | H | CH(Me) | H | c-Pr(1-CN) | Me | Br | $CH_2CN$ | O |
| C-5399 | H | $CH_2CH_2$ | Me | c-Pr(1-CN) | Me | Br | $CH_2CN$ | O |
| C-5400 | Me | $CH_2CH_2$ | H | c-Pr(1-CN) | Me | Br | $CH_2CN$ | O |
| C-5401 | H | single bond | Me | $CH_2CF_3$ | Me | $CF_3$ | $CH_2CN$ | O |
| C-5402 | Me | single bond | H | $CH_2CF_3$ | Me | $CF_3$ | $CH_2CN$ | O |
| C-5403 | Me(R) | single bond | H | $CH_2CF_3$ | Me | $CF_3$ | $CH_2CN$ | O |
| C-5404 | Me(S) | single bond | H | $CH_2CF_3$ | Me | $CF_3$ | $CH_2CN$ | O |
| C-5405 | H | $CH_2$ | Me | $CH_2CF_3$ | Me | $CF_3$ | $CH_2CN$ | O |
| C-5406 | Me | $CH_2$ | H | $CH_2CF_3$ | Me | $CF_3$ | $CH_2CN$ | O |

TABLE 350

| Compound Number | Y | W | Z | $R^1$ | $R^2$ | $R^3$ | $R^{10}$ | A |
|---|---|---|---|---|---|---|---|---|
| C-5407 | H | CH(Me) | H | $CH_2CF_3$ | Me | $CF_3$ | $CH_2CN$ | O |
| C-5408 | H | $CH_2CH_2$ | Me | $CH_2CF_3$ | Me | $CF_3$ | $CH_2CN$ | O |
| C-5409 | Me | $CH_2CH_2$ | H | $CH_2CF_3$ | Me | $CF_3$ | $CH_2CN$ | O |
| C-5410 | H | single bond | Me | Et | Me | $CF_3$ | $CH_2CN$ | O |
| C-5411 | Me | single bond | H | Et | Me | $CF_3$ | $CH_2CN$ | O |
| C-5412 | Me(R) | single bond | H | Et | Me | $CF_3$ | $CH_2CN$ | O |
| C-5413 | Me(S) | single bond | H | Et | Me | $CF_3$ | $CH_2CN$ | O |
| C-5414 | H | $CH_2$ | Me | Et | Me | $CF_3$ | $CH_2CN$ | O |
| C-5415 | Me | $CH_2$ | H | Et | Me | $CF_3$ | $CH_2CN$ | O |
| C-5416 | H | CH(Me) | H | Et | Me | $CF_3$ | $CH_2CN$ | O |
| C-5417 | H | $CH_2CH_2$ | Me | Et | Me | $CF_3$ | $CH_2CN$ | O |
| C-5418 | Me | $CH_2CH_2$ | H | Et | Me | $CF_3$ | $CH_2CN$ | O |
| C-5419 | H | single bond | Me | c-Pr | Me | $CF_3$ | $CH_2CN$ | O |
| C-5420 | Me | single bond | H | c-Pr | Me | $CF_3$ | $CH_2CN$ | O |
| C-5421 | Me(R) | single bond | H | c-Pr | Me | $CF_3$ | $CH_2CN$ | O |
| C-5422 | Me(S) | single bond | H | c-Pr | Me | $CF_3$ | $CH_2CN$ | O |
| C-5423 | H | $CH_2$ | Me | c-Pr | Me | $CF_3$ | $CH_2CN$ | O |
| C-5424 | Me | $CH_2$ | H | c-Pr | Me | $CF_3$ | $CH_2CN$ | O |
| C-5425 | H | CH(Me) | H | c-Pr | Me | $CF_3$ | $CH_2CN$ | O |
| C-5426 | H | $CH_2CH_2$ | Me | c-Pr | Me | $CF_3$ | $CH_2CN$ | O |
| C-5427 | Me | $CH_2CH_2$ | H | c-Pr | Me | $CF_3$ | $CH_2CN$ | O |
| C-5428 | H | single bond | Me | c-Pr(1-CN) | Me | $CF_3$ | $CH_2CN$ | O |
| C-5429 | Me | single bond | H | c-Pr(1-CN) | Me | $CF_3$ | $CH_2CN$ | O |
| C-5430 | Me(R) | single bond | H | c-Pr(1-CN) | Me | $CF_3$ | $CH_2CN$ | O |
| C-5431 | Me(S) | single bond | H | c-Pr(1-CN) | Me | $CF_3$ | $CH_2CN$ | O |
| C-5432 | H | $CH_2$ | Me | c-Pr(1-CN) | Me | $CF_3$ | $CH_2CN$ | O |
| C-5433 | Me | $CH_2$ | H | c-Pr(1-CN) | Me | $CF_3$ | $CH_2CN$ | O |
| C-5434 | H | CH(Me) | H | c-Pr(1-CN) | Me | $CF_3$ | $CH_2CN$ | O |
| C-5435 | H | $CH_2CH_2$ | Me | c-Pr(1-CN) | Me | $CF_3$ | $CH_2CN$ | O |
| C-5436 | Me | $CH_2CH_2$ | H | c-Pr(1-CN) | Me | $CF_3$ | $CH_2CN$ | O |
| C-5437 | H | single bond | Me | $CH_2CF_3$ | Me | OMe | $CH_2CN$ | O |
| C-5438 | Me | single bond | H | $CH_2CF_3$ | Me | OMe | $CH_2CN$ | O |
| C-5439 | Me(R) | single bond | H | $CH_2CF_3$ | Me | OMe | $CH_2CN$ | O |
| C-5440 | Me(S) | single bond | H | $CH_2CF_3$ | Me | OMe | $CH_2CN$ | O |
| C-5441 | H | $CH_2$ | Me | $CH_2CF_3$ | Me | OMe | $CH_2CN$ | O |
| C-5442 | Me | $CH_2$ | H | $CH_2CF_3$ | Me | OMe | $CH_2CN$ | O |
| C-5443 | H | CH(Me) | H | $CH_2CF_3$ | Me | OMe | $CH_2CN$ | O |
| C-5444 | H | $CH_2CH_2$ | Me | $CH_2CF_3$ | Me | OMe | $CH_2CN$ | O |
| C-5445 | Me | $CH_2CH_2$ | H | $CH_2CF_3$ | Me | OMe | $CH_2CN$ | O |
| C-5446 | H | single bond | Me | Et | Me | OMe | $CH_2CN$ | O |
| C-5447 | Me | single bond | H | Et | Me | OMe | $CH_2CN$ | O |
| C-5448 | Me(R) | single bond | H | Et | Me | OMe | $CH_2CN$ | O |
| C-5449 | Me(S) | single bond | H | Et | Me | OMe | $CH_2CN$ | O |
| C-5450 | H | $CH_2$ | Me | Et | Me | OMe | $CH_2CN$ | O |

TABLE 351

| Compound Number | Y | W | Z | $R^1$ | $R^2$ | $R^3$ | $R^{10}$ | A |
|---|---|---|---|---|---|---|---|---|
| C-5451 | Me | $CH_2$ | H | Et | Me | OMe | $CH_2CN$ | O |
| C-5452 | H | CH(Me) | H | Et | Me | OMe | $CH_2CN$ | O |
| C-5453 | H | $CH_2CH_2$ | Me | Et | Me | OMe | $CH_2CN$ | O |
| C-5454 | Me | $CH_2CH_2$ | H | Et | Me | OMe | $CH_2CN$ | O |
| C-5455 | H | single bond | Me | c-Pr | Me | OMe | $CH_2CN$ | O |
| C-5456 | Me | single bond | H | c-Pr | Me | OMe | $CH_2CN$ | O |
| C-5457 | Me(R) | single bond | H | c-Pr | Me | OMe | $CH_2CN$ | O |
| C-5458 | Me(S) | single bond | H | c-Pr | Me | OMe | $CH_2CN$ | O |
| C-5459 | H | $CH_2$ | Me | c-Pr | Me | OMe | $CH_2CN$ | O |
| C-5460 | Me | $CH_2$ | H | c-Pr | Me | OMe | $CH_2CN$ | O |
| C-5461 | H | CH(Me) | H | c-Pr | Me | OMe | $CH_2CN$ | O |
| C-5462 | H | $CH_2CH_2$ | Me | c-Pr | Me | OMe | $CH_2CN$ | O |
| C-5463 | Me | $CH_2CH_2$ | H | c-Pr | Me | OMe | $CH_2CN$ | O |
| C-5464 | H | single bond | Me | c-Pr(1-CN) | Me | OMe | $CH_2CN$ | O |
| C-5465 | Me | single bond | H | c-Pr(1-CN) | Me | OMe | $CH_2CN$ | O |
| C-5466 | Me(R) | single bond | H | c-Pr(1-CN) | Me | OMe | $CH_2CN$ | O |
| C-5467 | Me(S) | single bond | H | c-Pr(1-CN) | Me | OMe | $CH_2CN$ | O |
| C-5468 | H | $CH_2$ | Me | c-Pr(1-CN) | Me | OMe | $CH_2CN$ | O |
| C-5469 | Me | $CH_2$ | H | c-Pr(1-CN) | Me | OMe | $CH_2CN$ | O |
| C-5470 | H | CH(Me) | H | c-Pr(1-CN) | Me | OMe | $CH_2CN$ | O |
| C-5471 | H | $CH_2CH_2$ | Me | c-Pr(1-CN) | Me | OMe | $CH_2CN$ | O |

TABLE 351-continued

| Compound Number | Y | W | Z | $R^1$ | $R^2$ | $R^3$ | $R^{10}$ | A |
|---|---|---|---|---|---|---|---|---|
| C-5472 | Me | $CH_2CH_2$ | H | c-Pr(1-CN) | Me | OMe | $CH_2CN$ | O |
| C-5473 | H | single bond | Me | $CH_2CF_3$ | Me | $OCF_3$ | $CH_2CN$ | O |
| C-5474 | Me | single bond | H | $CH_2CF_3$ | Me | $OCF_3$ | $CH_2CN$ | O |
| C-5475 | Me(R) | single bond | H | $CH_2CF_3$ | Me | $OCF_3$ | $CH_2CN$ | O |
| C-5476 | Me(S) | single bond | H | $CH_2CF_3$ | Me | $OCF_3$ | $CH_2CN$ | O |
| C-5477 | H | $CH_2$ | Me | $CH_2CF_3$ | Me | $OCF_3$ | $CH_2CN$ | O |
| C-5478 | Me | $CH_2$ | H | $CH_2CF_3$ | Me | $OCF_3$ | $CH_2CN$ | O |
| C-5479 | H | CH(Me) | H | $CH_2CF_3$ | Me | $OCF_3$ | $CH_2CN$ | O |
| C-5480 | H | $CH_2CH_2$ | Me | $CH_2CF_3$ | Me | $OCF_3$ | $CH_2CN$ | O |
| C-5481 | Me | $CH_2CH_2$ | H | $CH_2CF_3$ | Me | $OCF_3$ | $CH_2CN$ | O |
| C-5482 | H | single bond | Me | Et | Me | $OCF_3$ | $CH_2CN$ | O |
| C-5483 | Me | single bond | H | Et | Me | $OCF_3$ | $CH_2CN$ | O |
| C-5484 | Me(R) | single bond | H | Et | Me | $OCF_3$ | $CH_2CN$ | O |
| C-5485 | Me(S) | single bond | H | Et | Me | $OCF_3$ | $CH_2CN$ | O |
| C-5486 | H | $CH_2$ | Me | Et | Me | $OCF_3$ | $CH_2CN$ | O |
| C-5487 | Me | $CH_2$ | H | Et | Me | $OCF_3$ | $CH_2CN$ | O |
| C-5488 | H | CH(Me) | H | Et | Me | $OCF_3$ | $CH_2CN$ | O |
| C-5489 | H | $CH_2CH_2$ | Me | Et | Me | $OCF_3$ | $CH_2CN$ | O |
| C-5490 | Me | $CH_2CH_2$ | H | Et | Me | $OCF_3$ | $CH_2CN$ | O |
| C-5491 | H | single bond | Me | c-Pr | Me | $OCF_3$ | $CH_2CN$ | O |
| C-5492 | Me | single bond | H | c-Pr | Me | $OCF_3$ | $CH_2CN$ | O |
| C-5493 | Me(R) | single bond | H | c-Pr | Me | $OCF_3$ | $CH_2CN$ | O |
| C-5494 | Me(S) | single bond | H | c-Pr | Me | $OCF_3$ | $CH_2CN$ | O |

TABLE 352

| Compound Number | Y | W | Z | $R^1$ | $R^2$ | $R^3$ | $R^{10}$ | A |
|---|---|---|---|---|---|---|---|---|
| C-5495 | H | $CH_2$ | Me | c-Pr | Me | $OCF_3$ | $CH_2CN$ | O |
| C-5496 | Me | $CH_2$ | H | c-Pr | Me | $OCF_3$ | $CH_2CN$ | O |
| C-5497 | H | CH(Me) | H | c-Pr | Me | $OCF_3$ | $CH_2CN$ | O |
| C-5498 | H | $CH_2CH_2$ | Me | c-Pr | Me | $OCF_3$ | $CH_2CN$ | O |
| C-5499 | Me | $CH_2CH_2$ | H | c-Pr | Me | $OCF_3$ | $CH_2CN$ | O |
| C-5500 | H | single bond | Me | c-Pr(1-CN) | Me | $OCF_3$ | $CH_2CN$ | O |
| C-5501 | Me | single bond | H | c-Pr(1-CN) | Me | $OCF_3$ | $CH_2CN$ | O |
| C-5502 | Me(R) | single bond | H | c-Pr(1-CN) | Me | $OCF_3$ | $CH_2CN$ | O |
| C-5503 | Me(S) | single bond | H | c-Pr(1-CN) | Me | $OCF_3$ | $CH_2CN$ | O |
| C-5504 | H | $CH_2$ | Me | c-Pr(1-CN) | Me | $OCF_3$ | $CH_2CN$ | O |
| C-5505 | Me | $CH_2$ | H | c-Pr(1-CN) | Me | $OCF_3$ | $CH_2CN$ | O |
| C-5506 | H | CH(Me) | H | c-Pr(1-CN) | Me | $OCF_3$ | $CH_2CN$ | O |
| C-5507 | H | $CH_2CH_2$ | Me | c-Pr(1-CN) | Me | $OCF_3$ | $CH_2CN$ | O |
| C-5508 | Me | $CH_2CH_2$ | H | c-Pr(1-CN) | Me | $OCF_3$ | $CH_2CN$ | O |
| C-5509 | H | single bond | Me | $CH_2CF_3$ | C(=O)Me | Br | H | O |
| C-5510 | Me | single bond | H | $CH_2CF_3$ | C(=O)Me | Br | H | O |
| C-5511 | Me(R) | single bond | H | $CH_2CF_3$ | C(=O)Me | Br | H | O |
| C-5512 | Me(S) | single bond | H | $CH_2CF_3$ | C(=O)Me | Br | H | O |
| C-5513 | H | $CH_2$ | Me | $CH_2CF_3$ | C(=O)Me | Br | H | O |
| C-5514 | Me | $CH_2$ | H | $CH_2CF_3$ | C(=O)Me | Br | H | O |
| C-5515 | H | CH(Me) | H | $CH_2CF_3$ | C(=O)Me | Br | H | O |
| C-5516 | H | $CH_2CH_2$ | Me | $CH_2CF_3$ | C(=O)Me | Br | H | O |
| C-5517 | Me | $CH_2CH_2$ | H | $CH_2CF_3$ | C(=O)Me | Br | H | O |
| C-5518 | H | single bond | Me | Et | C(=O)Me | Br | H | O |
| C-5519 | Me | single bond | H | Et | C(=O)Me | Br | H | O |
| C-5520 | Me(R) | single bond | H | Et | C(=O)Me | Br | H | O |
| C-5521 | Me(S) | single bond | H | Et | C(=O)Me | Br | H | O |
| C-5522 | H | $CH_2$ | Me | Et | C(=O)Me | Br | H | O |
| C-5523 | Me | $CH_2$ | H | Et | C(=O)Me | Br | H | O |
| C-5524 | H | CH(Me) | H | Et | C(=O)Me | Br | H | O |
| C-5525 | H | $CH_2CH_2$ | Me | Et | C(=O)Me | Br | H | O |
| C-5526 | Me | $CH_2CH_2$ | H | Et | C(=O)Me | Br | H | O |
| C-5527 | H | single bond | Me | c-Pr | C(=O)Me | Br | H | O |
| C-5528 | Me | single bond | H | c-Pr | C(=O)Me | Br | H | O |
| C-5529 | Me(R) | single bond | H | c-Pr | C(=O)Me | Br | H | O |
| C-5530 | Me(S) | single bond | H | c-Pr | C(=O)Me | Br | H | O |
| C-5531 | H | $CH_2$ | Me | c-Pr | C(=O)Me | Br | H | O |
| C-5532 | Me | $CH_2$ | H | c-Pr | C(=O)Me | Br | H | O |
| C-5533 | H | CH(Me) | H | c-Pr | C(=O)Me | Br | H | O |
| C-5534 | H | $CH_2CH_2$ | Me | c-Pr | C(=O)Me | Br | H | O |
| C-5535 | Me | $CH_2CH_2$ | H | c-Pr | C(=O)Me | Br | H | O |
| C-5536 | H | single bond | Me | c-Pr(1-CN) | C(=O)Me | Br | H | O |

TABLE 352-continued

| Compound Number | Y | W | Z | $R^1$ | $R^2$ | $R^3$ | $R^{10}$ | A |
|---|---|---|---|---|---|---|---|---|
| C-5537 | Me | single bond | H | c-Pr(1-CN) | C(=O)Me | Br | H | O |
| C-5538 | Me(R) | single bond | H | c-Pr(1-CN) | C(=O)Me | Br | H | O |

TABLE 353

| Compound Number | Y | W | Z | $R^1$ | $R^2$ | $R^3$ | $R^{10}$ | A |
|---|---|---|---|---|---|---|---|---|
| C-5539 | Me(S) | single bond | H | c-Pr(1-CN) | C(=O)Me | Br | H | O |
| C-5540 | H | $CH_2$ | Me | c-Pr(1-CN) | C(=O)Me | Br | H | O |
| C-5541 | Me | $CH_2$ | H | c-Pr(1-CN) | C(=O)Me | Br | H | O |
| C-5542 | H | CH(Me) | H | c-Pr(1-CN) | C(=O)Me | Br | H | O |
| C-5543 | H | $CH_2CH_2$ | Me | c-Pr(1-CN) | C(=O)Me | Br | H | O |
| C-5544 | Me | $CH_2CH_2$ | H | c-Pr(1-CN) | C(=O)Me | Br | H | O |
| C-5545 | H | single bond | Me | $CH_2CF_3$ | C(=O)Me | $CF_3$ | H | O |
| C-5546 | Me | single bond | H | $CH_2CF_3$ | C(=O)Me | $CF_3$ | H | O |
| C-5547 | Me(R) | single bond | H | $CH_2CF_3$ | C(=O)Me | $CF_3$ | H | O |
| C-5548 | Me(S) | single bond | H | $CH_2CF_3$ | C(=O)Me | $CF_3$ | H | O |
| C-5549 | H | $CH_2$ | Me | $CH_2CF_3$ | C(=O)Me | $CF_3$ | H | O |
| C-5550 | Me | $CH_2$ | H | $CH_2CF_3$ | C(=O)Me | $CF_3$ | H | O |
| C-5551 | H | CH(Me) | H | $CH_2CF_3$ | C(=O)Me | $CF_3$ | H | O |
| C-5552 | H | $CH_2CH_2$ | Me | $CH_2CF_3$ | C(=O)Me | $CF_3$ | H | O |
| C-5553 | Me | $CH_2CH_2$ | H | $CH_2CF_3$ | C(=O)Me | $CF_3$ | H | O |
| C-5554 | H | single bond | Me | Et | C(=O)Me | $CF_3$ | H | O |
| C-5555 | Me | single bond | H | Et | C(=O)Me | $CF_3$ | H | O |
| C-5556 | Me(R) | single bond | H | Et | C(=O)Me | $CF_3$ | H | O |
| C-5557 | Me(S) | single bond | H | Et | C(=O)Me | $CF_3$ | H | O |
| C-5558 | H | $CH_2$ | Me | Et | C(=O)Me | $CF_3$ | H | O |
| C-5559 | Me | $CH_2$ | H | Et | C(=O)Me | $CF_3$ | H | O |
| C-5560 | H | CH(Me) | H | Et | C(=O)Me | $CF_3$ | H | O |
| C-5561 | H | $CH_2CH_2$ | Me | Et | C(=O)Me | $CF_3$ | H | O |
| C-5562 | Me | $CH_2CH_2$ | H | Et | C(=O)Me | $CF_3$ | H | O |
| C-5563 | H | single bond | Me | c-Pr | C(=O)Me | $CF_3$ | H | O |
| C-5564 | Me | single bond | H | c-Pr | C(=O)Me | $CF_3$ | H | O |
| C-5565 | Me(R) | single bond | H | c-Pr | C(=O)Me | $CF_3$ | H | O |
| C-5566 | Me(S) | single bond | H | c-Pr | C(=O)Me | $CF_3$ | H | O |
| C-5567 | H | $CH_2$ | Me | c-Pr | C(=O)Me | $CF_3$ | H | O |
| C-5568 | Me | $CH_2$ | H | c-Pr | C(=O)Me | $CF_3$ | H | O |
| C-5569 | H | CH(Me) | H | c-Pr | C(=O)Me | $CF_3$ | H | O |
| C-5570 | H | $CH_2CH_2$ | Me | c-Pr | C(=O)Me | $CF_3$ | H | O |
| C-5571 | Me | $CH_2CH_2$ | H | c-Pr | C(=O)Me | $CF_3$ | H | O |
| C-5572 | H | single bond | Me | c-Pr(1-CN) | C(=O)Me | $CF_3$ | H | O |
| C-5573 | Me | single bond | H | c-Pr(1-CN) | C(=O)Me | $CF_3$ | H | O |
| C-5574 | Me(R) | single bond | H | c-Pr(1-CN) | C(=O)Me | $CF_3$ | H | O |
| C-5575 | Me(S) | single bond | H | c-Pr(1-CN) | C(=O)Me | $CF_3$ | H | O |
| C-5576 | H | $CH_2$ | Me | c-Pr(1-CN) | C(=O)Me | $CF_3$ | H | O |
| C-5577 | Me | $CH_2$ | H | c-Pr(1-CN) | C(=O)Me | $CF_3$ | H | O |
| C-5578 | H | CH(Me) | H | c-Pr(1-CN) | C(=O)Me | $CF_3$ | H | O |
| C-5579 | H | $CH_2CH_2$ | Me | c-Pr(1-CN) | C(=O)Me | $CF_3$ | H | O |
| C-5580 | Me | $CH_2CH_2$ | H | c-Pr(1-CN) | C(=O)Me | $CF_3$ | H | O |
| C-5581 | H | single bond | Me | $CH_2CF_3$ | C(=O)Me | OMe | H | O |
| C-5582 | Me | single bond | H | $CH_2CF_3$ | C(=O)Me | OMe | H | O |

TABLE 354

| Compound Number | Y | W | Z | $R^1$ | $R^2$ | $R^3$ | $R^{10}$ | A |
|---|---|---|---|---|---|---|---|---|
| C-5583 | Me(R) | single bond | H | $CH_2CF_3$ | C(=O)Me | OMe | H | O |
| C-5584 | Me(S) | single bond | H | $CH_2CF_3$ | C(=O)Me | OMe | H | O |
| C-5585 | H | $CH_2$ | Me | $CH_2CF_3$ | C(=O)Me | OMe | H | O |
| C-5586 | Me | $CH_2$ | H | $CH_2CF_3$ | C(=O)Me | OMe | H | O |
| C-5587 | H | CH(Me) | H | $CH_2CF_3$ | C(=O)Me | OMe | H | O |
| C-5588 | H | $CH_2CH_2$ | Me | $CH_2CF_3$ | C(=O)Me | OMe | H | O |
| C-5589 | Me | $CH_2CH_2$ | H | $CH_2CF_3$ | C(=O)Me | OMe | H | O |
| C-5590 | H | single bond | Me | Et | C(=O)Me | OMe | H | O |
| C-5591 | Me | single bond | H | Et | C(=O)Me | OMe | H | O |
| C-5592 | Me(R) | single bond | H | Et | C(=O)Me | OMe | H | O |
| C-5593 | Me(S) | single bond | H | Et | C(=O)Me | OMe | H | O |
| C-5594 | H | $CH_2$ | Me | Et | C(=O)Me | OMe | H | O |

TABLE 354-continued

| Compound Number | Y | W | Z | $R^1$ | $R^2$ | $R^3$ | $R^{10}$ | A |
|---|---|---|---|---|---|---|---|---|
| C-5595 | Me | $CH_2$ | H | Et | C(=O)Me | OMe | H | O |
| C-5596 | H | CH(Me) | H | Et | C(=O)Me | OMe | H | O |
| C-5597 | H | $CH_2CH_2$ | Me | Et | C(=O)Me | OMe | H | O |
| C-5598 | Me | $CH_2CH_2$ | H | Et | C(=O)Me | OMe | H | O |
| C-5599 | H | single bond | Me | c-Pr | C(=O)Me | OMe | H | O |
| C-5600 | Me | single bond | H | c-Pr | C(=O)Me | OMe | H | O |
| C-5601 | Me(R) | single bond | H | c-Pr | C(=O)Me | OMe | H | O |
| C-5602 | Me(S) | single bond | H | c-Pr | C(=O)Me | OMe | H | O |
| C-5603 | H | $CH_2$ | Me | c-Pr | C(=O)Me | OMe | H | O |
| C-5604 | Me | $CH_2$ | H | c-Pr | C(=O)Me | OMe | H | O |
| C-5605 | H | CH(Me) | H | c-Pr | C(=O)Me | OMe | H | O |
| C-5606 | H | $CH_2CH_2$ | Me | c-Pr | C(=O)Me | OMe | H | O |
| C-5607 | Me | $CH_2CH_2$ | H | c-Pr | C(=O)Me | OMe | H | O |
| C-5608 | H | single bond | Me | c-Pr(1-CN) | C(=O)Me | OMe | H | O |
| C-5609 | Me | single bond | H | c-Pr(1-CN) | C(=O)Me | OMe | H | O |
| C-5610 | Me(R) | single bond | H | c-Pr(1-CN) | C(=O)Me | OMe | H | O |
| C-5611 | Me(S) | single bond | H | c-Pr(1-CN) | C(=O)Me | OMe | H | O |
| C-5612 | H | $CH_2$ | Me | c-Pr(1-CN) | C(=O)Me | OMe | H | O |
| C-5613 | Me | $CH_2$ | H | c-Pr(1-CN) | C(=O)Me | OMe | H | O |
| C-5614 | H | CH(Me) | H | c-Pr(1-CN) | C(=O)Me | OMe | H | O |
| C-5615 | H | $CH_2CH_2$ | Me | c-Pr(1-CN) | C(=O)Me | OMe | H | O |
| C-5616 | Me | $CH_2CH_2$ | H | c-Pr(1-CN) | C(=O)Me | OMe | H | O |
| C-5617 | H | single bond | Me | $CH_2CF_3$ | C(=O)Me | $OCF_3$ | H | O |
| C-5618 | Me | single bond | H | $CH_2CF_3$ | C(=O)Me | $OCF_3$ | H | O |
| C-5619 | Me(R) | single bond | H | $CH_2CF_3$ | C(=O)Me | $OCF_3$ | H | O |
| C-5620 | Me(S) | single bond | H | $CH_2CF_3$ | C(=O)Me | $OCF_3$ | H | O |
| C-5621 | H | $CH_2$ | Me | $CH_2CF_3$ | C(=O)Me | $OCF_3$ | H | O |
| C-5622 | Me | $CH_2$ | H | $CH_2CF_3$ | C(=O)Me | $OCF_3$ | H | O |
| C-5623 | H | CH(Me) | H | $CH_2CF_3$ | C(=O)Me | $OCF_3$ | H | O |
| C-5624 | H | $CH_2CH_2$ | Me | $CH_2CF_3$ | C(=O)Me | $OCF_3$ | H | O |
| C-5625 | Me | $CH_2CH_2$ | H | $CH_2CF_3$ | C(=O)Me | $OCF_3$ | H | O |
| C-5626 | H | single bond | Me | Et | C(=O)Me | $OCF_3$ | H | O |

TABLE 355

| Compound Number | Y | W | Z | $R^1$ | $R^2$ | $R^3$ | $R^{10}$ | A |
|---|---|---|---|---|---|---|---|---|
| C-5627 | Me | single bond | H | Et | C(=O)Me | $OCF_3$ | H | O |
| C-5628 | Me(R) | single bond | H | Et | C(=O)Me | $OCF_3$ | H | O |
| C-5629 | Me(S) | single bond | H | Et | C(=O)Me | $OCF_3$ | H | O |
| C-5630 | H | $CH_2$ | Me | Et | C(=O)Me | $OCF_3$ | H | O |
| C-5631 | Me | $CH_2$ | H | Et | C(=O)Me | $OCF_3$ | H | O |
| C-5632 | H | CH(Me) | H | Et | C(=O)Me | $OCF_3$ | H | O |
| C-5633 | H | $CH_2CH_2$ | Me | Et | C(=O)Me | $OCF_3$ | H | O |
| C-5634 | Me | $CH_2CH_2$ | H | Et | C(=O)Me | $OCF_3$ | H | O |
| C-5635 | H | single bond | Me | c-Pr | C(=O)Me | $OCF_3$ | H | O |
| C-5636 | Me | single bond | H | c-Pr | C(=O)Me | $OCF_3$ | H | O |
| C-5637 | Me(R) | single bond | H | c-Pr | C(=O)Me | $OCF_3$ | H | O |
| C-5638 | Me(S) | single bond | H | c-Pr | C(=O)Me | $OCF_3$ | H | O |
| C-5639 | H | $CH_2$ | Me | c-Pr | C(=O)Me | $OCF_3$ | H | O |
| C-5640 | Me | $CH_2$ | H | c-Pr | C(=O)Me | $OCF_3$ | H | O |
| C-5641 | H | CH(Me) | H | c-Pr | C(=O)Me | $OCF_3$ | H | O |
| C-5642 | H | $CH_2CH_2$ | Me | c-Pr | C(=O)Me | $OCF_3$ | H | O |
| C-5643 | Me | $CH_2CH_2$ | H | c-Pr | C(=O)Me | $OCF_3$ | H | O |
| C-5644 | H | single bond | Me | c-Pr(1-CN) | C(=O)Me | $OCF_3$ | H | O |
| C-5645 | Me | single bond | H | c-Pr(1-CN) | C(=O)Me | $OCF_3$ | H | O |
| C-5646 | Me(R) | single bond | H | c-Pr(1-CN) | C(=O)Me | $OCF_3$ | H | O |
| C-5647 | Me(S) | single bond | H | c-Pr(1-CN) | C(=O)Me | $OCF_3$ | H | O |
| C-5648 | H | $CH_2$ | Me | c-Pr(1-CN) | C(=O)Me | $OCF_3$ | H | O |
| C-5649 | Me | $CH_2$ | H | c-Pr(1-CN) | C(=O)Me | $OCF_3$ | H | O |
| C-5650 | H | CH(Me) | H | c-Pr(1-CN) | C(=O)Me | $OCF_3$ | H | O |
| C-5651 | H | $CH_2CH_2$ | Me | c-Pr(1-CN) | C(=O)Me | $OCF_3$ | H | O |
| C-5652 | Me | $CH_2CH_2$ | H | c-Pr(1-CN) | C(=O)Me | $OCF_3$ | H | O |
| C-5653 | H | single bond | Me | $CH_2CF_3$ | C(=O)Me | Br | Me | O |
| C-5654 | Me | single bond | H | $CH_2CF_3$ | C(=O)Me | Br | Me | O |
| C-5655 | Me(R) | single bond | H | $CH_2CF_3$ | C(=O)Me | Br | Me | O |
| C-5656 | Me(S) | single bond | H | $CH_2CF_3$ | C(=O)Me | Br | Me | O |
| C-5657 | H | $CH_2$ | Me | $CH_2CF_3$ | C(=O)Me | Br | Me | O |
| C-5658 | Me | $CH_2$ | H | $CH_2CF_3$ | C(=O)Me | Br | Me | O |
| C-5659 | H | CH(Me) | H | $CH_2CF_3$ | C(=O)Me | Br | Me | O |
| C-5660 | H | $CH_2CH_2$ | Me | $CH_2CF_3$ | C(=O)Me | Br | Me | O |
| C-5661 | Me | $CH_2CH_2$ | H | $CH_2CF_3$ | C(=O)Me | Br | Me | O |

TABLE 355-continued

| Compound Number | Y | W | Z | $R^1$ | $R^2$ | $R^3$ | $R^{10}$ | A |
|---|---|---|---|---|---|---|---|---|
| C-5662 | H | single bond | Me | Et | C(=O)Me | Br | Me | O |
| C-5663 | Me | single bond | H | Et | C(=O)Me | Br | Me | O |
| C-5664 | Me(R) | single bond | H | Et | C(=O)Me | Br | Me | O |
| C-5665 | Me(S) | single bond | H | Et | C(=O)Me | Br | Me | O |
| C-5666 | H | $CH_2$ | Me | Et | C(=O)Me | Br | Me | O |
| C-5667 | Me | $CH_2$ | H | Et | C(=O)Me | Br | Me | O |
| C-5668 | H | CH(Me) | H | Et | C(=O)Me | Br | Me | O |
| C-5669 | H | $CH_2CH_2$ | Me | Et | C(=O)Me | Br | Me | O |
| C-5670 | Me | $CH_2CH_2$ | H | Et | C(=O)Me | Br | Me | O |

TABLE 356

| Compound Number | Y | W | Z | $R^1$ | $R^2$ | $R^3$ | $R^{10}$ | A |
|---|---|---|---|---|---|---|---|---|
| C-5671 | H | single bond | Me | c-Pr | C(=O)Me | Br | Me | O |
| C-5672 | Me | single bond | H | c-Pr | C(=O)Me | Br | Me | O |
| C-5673 | Me(R) | single bond | H | c-Pr | C(=O)Me | Br | Me | O |
| C-5674 | Me(S) | single bond | H | c-Pr | C(=O)Me | Br | Me | O |
| C-5675 | H | $CH_2$ | Me | c-Pr | C(=O)Me | Br | Me | O |
| C-5676 | Me | $CH_2$ | H | c-Pr | C(=O)Me | Br | Me | O |
| C-5677 | H | CH(Me) | H | c-Pr | C(=O)Me | Br | Me | O |
| C-5678 | H | $CH_2CH_2$ | Me | c-Pr | C(=O)Me | Br | Me | O |
| C-5679 | Me | $CH_2CH_2$ | H | c-Pr | C(=O)Me | Br | Me | O |
| C-5680 | H | single bond | Me | c-Pr(1-CN) | C(=O)Me | Br | Me | O |
| C-5681 | Me | single bond | H | c-Pr(1-CN) | C(=O)Me | Br | Me | O |
| C-5682 | Me(R) | single bond | H | c-Pr(1-CN) | C(=O)Me | Br | Me | O |
| C-5683 | Me(S) | single bond | H | c-Pr(1-CN) | C(=O)Me | Br | Me | O |
| C-5684 | H | $CH_2$ | Me | c-Pr(1-CN) | C(=O)Me | Br | Me | O |
| C-5685 | Me | $CH_2$ | H | c-Pr(1-CN) | C(=O)Me | Br | Me | O |
| C-5686 | H | CH(Me) | H | c-Pr(1-CN) | C(=O)Me | Br | Me | O |
| C-5687 | H | $CH_2CH_2$ | Me | c-Pr(1-CN) | C(=O)Me | Br | Me | O |
| C-5688 | Me | $CH_2CH_2$ | H | c-Pr(1-CN) | C(=O)Me | Br | Me | O |
| C-5689 | H | single bond | Me | $CH_2CF_3$ | C(=O)Me | $CF_3$ | Me | O |
| C-5690 | Me | single bond | H | $CH_2CF_3$ | C(=O)Me | $CF_3$ | Me | O |
| C-5691 | Me(R) | single bond | H | $CH_2CF_3$ | C(=O)Me | $CF_3$ | Me | O |
| C-5692 | Me(S) | single bond | H | $CH_2CF_3$ | C(=O)Me | $CF_3$ | Me | O |
| C-5693 | H | $CH_2$ | Me | $CH_2CF_3$ | C(=O)Me | $CF_3$ | Me | O |
| C-5694 | Me | $CH_2$ | H | $CH_2CF_3$ | C(=O)Me | $CF_3$ | Me | O |
| C-5695 | H | CH(Me) | H | $CH_2CF_3$ | C(=O)Me | $CF_3$ | Me | O |
| C-5696 | H | $CH_2CH_2$ | Me | $CH_2CF_3$ | C(=O)Me | $CF_3$ | Me | O |
| C-5697 | Me | $CH_2CH_2$ | H | $CH_2CF_3$ | C(=O)Me | $CF_3$ | Me | O |
| C-5698 | H | single bond | Me | Et | C(=O)Me | $CF_3$ | Me | O |
| C-5699 | Me | single bond | H | Et | C(=O)Me | $CF_3$ | Me | O |
| C-5700 | Me(R) | single bond | H | Et | C(=O)Me | $CF_3$ | Me | O |
| C-5701 | Me(S) | single bond | H | Et | C(=O)Me | $CF_3$ | Me | O |
| C-5702 | H | $CH_2$ | Me | Et | C(=O)Me | $CF_3$ | Me | O |
| C-5703 | Me | $CH_2$ | H | Et | C(=O)Me | $CF_3$ | Me | O |
| C-5704 | H | CH(Me) | H | Et | C(=O)Me | $CF_3$ | Me | O |
| C-5705 | H | $CH_2CH_2$ | Me | Et | C(=O)Me | $CF_3$ | Me | O |
| C-5706 | Me | $CH_2CH_2$ | H | Et | C(=O)Me | $CF_3$ | Me | O |
| C-5707 | H | single bond | Me | c-Pr | C(=O)Me | $CF_3$ | Me | O |
| C-5708 | Me | single bond | H | c-Pr | C(=O)Me | $CF_3$ | Me | O |
| C-5709 | Me(R) | single bond | H | c-Pr | C(=O)Me | $CF_3$ | Me | O |
| C-5710 | Me(S) | single bond | H | c-Pr | C(=O)Me | $CF_3$ | Me | O |
| C-5711 | H | $CH_2$ | Me | c-Pr | C(=O)Me | $CF_3$ | Me | O |
| C-5712 | Me | $CH_2$ | H | c-Pr | C(=O)Me | $CF_3$ | Me | O |
| C-5713 | H | CH(Me) | H | c-Pr | C(=O)Me | $CF_3$ | Me | O |
| C-5714 | H | $CH_2CH_2$ | Me | c-Pr | C(=O)Me | $CF_3$ | Me | O |

TABLE 357

| Compound Number | Y | W | Z | $R^1$ | $R^2$ | $R^3$ | $R^{10}$ | A |
|---|---|---|---|---|---|---|---|---|
| C-5715 | Me | $CH_2CH_2$ | H | c-Pr | C(=O)Me | $CF_3$ | Me | O |
| C-5716 | H | single bond | Me | c-Pr(1-CN) | C(=O)Me | $CF_3$ | Me | O |
| C-5717 | Me | single bond | H | c-Pr(1-CN) | C(=O)Me | $CF_3$ | Me | O |

TABLE 357-continued

| Compound Number | Y | W | Z | $R^1$ | $R^2$ | $R^3$ | $R^{10}$ | A |
|---|---|---|---|---|---|---|---|---|
| C-5718 | Me(R) | single bond | H | c-Pr(1-CN) | C(=O)Me | $CF_3$ | Me | O |
| C-5719 | Me(S) | single bond | H | c-Pr(1-CN) | C(=O)Me | $CF_3$ | Me | O |
| C-5720 | H | $CH_2$ | Me | c-Pr(1-CN) | C(=O)Me | $CF_3$ | Me | O |
| C-5721 | Me | $CH_2$ | H | c-Pr(1-CN) | C(=O)Me | $CF_3$ | Me | O |
| C-5722 | H | CH(Me) | H | c-Pr(1-CN) | C(=O)Me | $CF_3$ | Me | O |
| C-5723 | H | $CH_2CH_2$ | Me | c-Pr(1-CN) | C(=O)Me | $CF_3$ | Me | O |
| C-5724 | Me | $CH_2CH_2$ | H | c-Pr(1-CN) | C(=O)Me | $CF_3$ | Me | O |
| C-5725 | H | single bond | Me | $CH_2CF_3$ | C(=O)Me | OMe | Me | O |
| C-5726 | Me | single bond | H | $CH_2CF_3$ | C(=O)Me | OMe | Me | O |
| C-5727 | Me(R) | single bond | H | $CH_2CF_3$ | C(=O)Me | OMe | Me | O |
| C-5728 | Me(S) | single bond | H | $CH_2CF_3$ | C(=O)Me | OMe | Me | O |
| C-5729 | H | $CH_2$ | Me | $CH_2CF_3$ | C(=O)Me | OMe | Me | O |
| C-5730 | Me | $CH_2$ | H | $CH_2CF_3$ | C(=O)Me | OMe | Me | O |
| C-5731 | H | CH(Me) | H | $CH_2CF_3$ | C(=O)Me | OMe | Me | O |
| C-5732 | H | $CH_2CH_2$ | Me | $CH_2CF_3$ | C(=O)Me | OMe | Me | O |
| C-5733 | Me | $CH_2CH_2$ | H | $CH_2CF_3$ | C(=O)Me | OMe | Me | O |
| C-5734 | H | single bond | Me | Et | C(=O)Me | OMe | Me | O |
| C-5735 | Me | single bond | H | Et | C(=O)Me | OMe | Me | O |
| C-5736 | Me(R) | single bond | H | Et | C(=O)Me | OMe | Me | O |
| C-5737 | Me(S) | single bond | H | Et | C(=O)Me | OMe | Me | O |
| C-5738 | H | $CH_2$ | Me | Et | C(=O)Me | OMe | Me | O |
| C-5739 | Me | $CH_2$ | H | Et | C(=O)Me | OMe | Me | O |
| C-5740 | H | CH(Me) | H | Et | C(=O)Me | OMe | Me | O |
| C-5741 | H | $CH_2CH_2$ | Me | Et | C(=O)Me | OMe | Me | O |
| C-5742 | Me | $CH_2CH_2$ | H | Et | C(=O)Me | OMe | Me | O |
| C-5743 | H | single bond | Me | c-Pr | C(=O)Me | OMe | Me | O |
| C-5744 | Me | single bond | H | c-Pr | C(=O)Me | OMe | Me | O |
| C-5745 | Me(R) | single bond | H | c-Pr | C(=O)Me | OMe | Me | O |
| C-5746 | Me(S) | single bond | H | c-Pr | C(=O)Me | OMe | Me | O |
| C-5747 | H | $CH_2$ | Me | c-Pr | C(=O)Me | OMe | Me | O |
| C-5748 | Me | $CH_2$ | H | c-Pr | C(=O)Me | OMe | Me | O |
| C-5749 | H | CH(Me) | H | c-Pr | C(=O)Me | OMe | Me | O |
| C-5750 | H | $CH_2CH_2$ | Me | c-Pr | C(=O)Me | OMe | Me | O |
| C-5751 | Me | $CH_2CH_2$ | H | c-Pr | C(=O)Me | OMe | Me | O |
| C-5752 | H | single bond | Me | c-Pr(1-CN) | C(=O)Me | OMe | Me | O |
| C-5753 | Me | single bond | H | c-Pr(1-CN) | C(=O)Me | OMe | Me | O |
| C-5754 | Me(R) | single bond | H | c-Pr(1-CN) | C(=O)Me | OMe | Me | O |
| C-5755 | Me(S) | single bond | H | c-Pr(1-CN) | C(=O)Me | OMe | Me | O |
| C-5756 | H | $CH_2$ | Me | c-Pr(1-CN) | C(=O)Me | OMe | Me | O |
| C-5757 | Me | $CH_2$ | H | c-Pr(1-CN) | C(=O)Me | OMe | Me | O |
| C-5758 | H | CH(Me) | H | c-Pr(1-CN) | C(=O)Me | OMe | Me | O |

TABLE 358

| Compound Number | Y | W | Z | $R^1$ | $R^2$ | $R^3$ | $R^{10}$ | A |
|---|---|---|---|---|---|---|---|---|
| C-5759 | H | $CH_2CH_2$ | Me | c-Pr(1-CN) | C(=O)Me | OMe | Me | O |
| C-5760 | Me | $CH_2CH_2$ | H | c-Pr(1-CN) | C(=O)Me | OMe | Me | O |
| C-5761 | H | single bond | Me | $CH_2CF_3$ | C(=O)Me | $OCF_3$ | Me | O |
| C-5762 | Me | single bond | H | $CH_2CF_3$ | C(=O)Me | $OCF_3$ | Me | O |
| C-5763 | Me(R) | single bond | H | $CH_2CF_3$ | C(=O)Me | $OCF_3$ | Me | O |
| C-5764 | Me(S) | single bond | H | $CH_2CF_3$ | C(=O)Me | $OCF_3$ | Me | O |
| C-5765 | H | $CH_2$ | Me | $CH_2CF_3$ | C(=O)Me | $OCF_3$ | Me | O |
| C-5766 | Me | $CH_2$ | H | $CH_2CF_3$ | C(=O)Me | $OCF_3$ | Me | O |
| C-5767 | H | CH(Me) | H | $CH_2CF_3$ | C(=O)Me | $OCF_3$ | Me | O |
| C-5768 | H | $CH_2CH_2$ | Me | $CH_2CF_3$ | C(=O)Me | $OCF_3$ | Me | O |
| C-5769 | Me | $CH_2CH_2$ | H | $CH_2CF_3$ | C(=O)Me | $OCF_3$ | Me | O |
| C-5770 | H | single bond | Me | Et | C(=O)Me | $OCF_3$ | Me | O |
| C-5771 | Me | single bond | H | Et | C(=O)Me | $OCF_3$ | Me | O |
| C-5772 | Me(R) | single bond | H | Et | C(=O)Me | $OCF_3$ | Me | O |
| C-5773 | Me(S) | single bond | H | Et | C(=O)Me | $OCF_3$ | Me | O |
| C-5774 | H | $CH_2$ | Me | Et | C(=O)Me | $OCF_3$ | Me | O |
| C-5775 | Me | $CH_2$ | H | Et | C(=O)Me | $OCF_3$ | Me | O |
| C-5776 | H | CH(Me) | H | Et | C(=O)Me | $OCF_3$ | Me | O |
| C-5777 | H | $CH_2CH_2$ | Me | Et | C(=O)Me | $OCF_3$ | Me | O |
| C-5778 | Me | $CH_2CH_2$ | H | Et | C(=O)Me | $OCF_3$ | Me | O |
| C-5779 | H | single bond | Me | c-Pr | C(=O)Me | $OCF_3$ | Me | O |
| C-5780 | Me | single bond | H | c-Pr | C(=O)Me | $OCF_3$ | Me | O |
| C-5781 | Me(R) | single bond | H | c-Pr | C(=O)Me | $OCF_3$ | Me | O |
| C-5782 | Me(S) | single bond | H | c-Pr | C(=O)Me | $OCF_3$ | Me | O |
| C-5783 | H | $CH_2$ | Me | c-Pr | C(=O)Me | $OCF_3$ | Me | O |
| C-5784 | Me | $CH_2$ | H | c-Pr | C(=O)Me | $OCF_3$ | Me | O |

TABLE 358-continued

| Compound Number | Y | W | Z | $R^1$ | $R^2$ | $R^3$ | $R^{10}$ | A |
|---|---|---|---|---|---|---|---|---|
| C-5785 | H | CH(Me) | H | c-Pr | C(=O)Me | $OCF_3$ | Me | O |
| C-5786 | H | $CH_2CH_2$ | Me | c-Pr | C(=O)Me | $OCF_3$ | Me | O |
| C-5787 | Me | $CH_2CH_2$ | H | c-Pr | C(=O)Me | $OCF_3$ | Me | O |
| C-5788 | H | single bond | Me | c-Pr(1-CN) | C(=O)Me | $OCF_3$ | Me | O |
| C-5789 | Me | single bond | H | c-Pr(1-CN) | C(=O)Me | $OCF_3$ | Me | O |
| C-5790 | Me(R) | single bond | H | c-Pr(1-CN) | C(=O)Me | $OCF_3$ | Me | O |
| C-5791 | Me(S) | single bond | H | c-Pr(1-CN) | C(=O)Me | $OCF_3$ | Me | O |
| C-5792 | H | $CH_2$ | Me | c-Pr(1-CN) | C(=O)Me | $OCF_3$ | Me | O |
| C-5793 | Me | $CH_2$ | H | c-Pr(1-CN) | C(=O)Me | $OCF_3$ | Me | O |
| C-5794 | H | CH(Me) | H | c-Pr(1-CN) | C(=O)Me | $OCF_3$ | Me | O |
| C-5795 | H | $CH_2CH_2$ | Me | c-Pr(1-CN) | C(=O)Me | $OCF_3$ | Me | O |
| C-5796 | Me | $CH_2CH_2$ | H | c-Pr(1-CN) | C(=O)Me | $OCF_3$ | Me | O |
| C-5797 | H | single bond | Me | $CH_2CF_3$ | C(=O)Me | Br | $CH_2OMe$ | O |
| C-5798 | Me | single bond | H | $CH_2CF_3$ | C(=O)Me | Br | $CH_2OMe$ | O |
| C-5799 | Me(R) | single bond | H | $CH_2CF_3$ | C(=O)Me | Br | $CH_2OMe$ | O |
| C-5800 | Me(S) | single bond | H | $CH_2CF_3$ | C(=O)Me | Br | $CH_2OMe$ | O |
| C-5801 | H | $CH_2$ | Me | $CH_2CF_3$ | C(=O)Me | Br | $CH_2OMe$ | O |
| C-5802 | Me | $CH_2$ | H | $CH_2CF_3$ | C(=O)Me | Br | $CH_2OMe$ | O |

TABLE 359

| Compound Number | Y | W | Z | $R^1$ | $R^2$ | $R^3$ | $R^{10}$ | A |
|---|---|---|---|---|---|---|---|---|
| C-5803 | H | CH(Me) | H | $CH_2CF_3$ | C(=O)Me | Br | $CH_2OMe$ | O |
| C-5804 | H | $CH_2CH_2$ | Me | $CH_2CF_3$ | C(=O)Me | Br | $CH_2OMe$ | O |
| C-5805 | Me | $CH_2CH_2$ | H | $CH_2CF_3$ | C(=O)Me | Br | $CH_2OMe$ | O |
| C-5806 | H | single bond | Me | Et | C(=O)Me | Br | $CH_2OMe$ | O |
| C-5807 | Me | single bond | H | Et | C(=O)Me | Br | $CH_2OMe$ | O |
| C-5808 | Me(R) | single bond | H | Et | C(=O)Me | Br | $CH_2OMe$ | O |
| C-5809 | Me(S) | single bond | H | Et | C(=O)Me | Br | $CH_2OMe$ | O |
| C-5810 | H | $CH_2$ | Me | Et | C(=O)Me | Br | $CH_2OMe$ | O |
| C-5811 | Me | $CH_2$ | H | Et | C(=O)Me | Br | $CH_2OMe$ | O |
| C-5812 | H | CH(Me) | H | Et | C(=O)Me | Br | $CH_2OMe$ | O |
| C-5813 | H | $CH_2CH_2$ | Me | Et | C(=O)Me | Br | $CH_2OMe$ | O |
| C-5814 | Me | $CH_2CH_2$ | H | Et | C(=O)Me | Br | $CH_2OMe$ | O |
| C-5815 | H | single bond | Me | c-Pr | C(=O)Me | Br | $CH_2OMe$ | O |
| C-5816 | Me | single bond | H | c-Pr | C(=O)Me | Br | $CH_2OMe$ | O |
| C-5817 | Me(R) | single bond | H | c-Pr | C(=O)Me | Br | $CH_2OMe$ | O |
| C-5818 | Me(S) | single bond | H | c-Pr | C(=O)Me | Br | $CH_2OMe$ | O |
| C-5819 | H | $CH_2$ | Me | c-Pr | C(=O)Me | Br | $CH_2OMe$ | O |
| C-5820 | Me | $CH_2$ | H | c-Pr | C(=O)Me | Br | $CH_2OMe$ | O |
| C-5821 | H | CH(Me) | H | c-Pr | C(=O)Me | Br | $CH_2OMe$ | O |
| C-5822 | H | $CH_2CH_2$ | Me | c-Pr | C(=O)Me | Br | $CH_2OMe$ | O |
| C-5823 | Me | $CH_2CH_2$ | H | c-Pr | C(=O)Me | Br | $CH_2OMe$ | O |
| C-5824 | H | single bond | Me | c-Pr(1-CN) | C(=O)Me | Br | $CH_2OMe$ | O |
| C-5825 | Me | single bond | H | c-Pr(1-CN) | C(=O)Me | Br | $CH_2OMe$ | O |
| C-5826 | Me(R) | single bond | H | c-Pr(1-CN) | C(=O)Me | Br | $CH_2OMe$ | O |
| C-5827 | Me(S) | single bond | H | c-Pr(1-CN) | C(=O)Me | Br | $CH_2OMe$ | O |
| C-5828 | H | $CH_2$ | Me | c-Pr(1-CN) | C(=O)Me | Br | $CH_2OMe$ | O |
| C-5829 | Me | $CH_2$ | H | c-Pr(1-CN) | C(=O)Me | Br | $CH_2OMe$ | O |
| C-5830 | H | CH(Me) | H | c-Pr(1-CN) | C(=O)Me | Br | $CH_2OMe$ | O |
| C-5831 | H | $CH_2CH_2$ | Me | c-Pr(1-CN) | C(=O)Me | Br | $CH_2OMe$ | O |
| C-5832 | Me | $CH_2CH_2$ | H | c-Pr(1-CN) | C(=O)Me | Br | $CH_2OMe$ | O |
| C-5833 | H | single bond | Me | $CH_2CF_3$ | C(=O)Me | $CF_3$ | $CH_2OMe$ | O |
| C-5834 | Me | single bond | H | $CH_2CF_3$ | C(=O)Me | $CF_3$ | $CH_2OMe$ | O |
| C-5835 | Me(R) | single bond | H | $CH_2CF_3$ | C(=O)Me | $CF_3$ | $CH_2OMe$ | O |
| C-5836 | Me(S) | single bond | H | $CH_2CF_3$ | C(=O)Me | $CF_3$ | $CH_2OMe$ | O |
| C-5837 | H | $CH_2$ | Me | $CH_2CF_3$ | C(=O)Me | $CF_3$ | $CH_2OMe$ | O |
| C-5838 | Me | $CH_2$ | H | $CH_2CF_3$ | C(=O)Me | $CF_3$ | $CH_2OMe$ | O |
| C-5839 | H | CH(Me) | H | $CH_2CF_3$ | C(=O)Me | $CF_3$ | $CH_2OMe$ | O |
| C-5840 | H | $CH_2CH_2$ | Me | $CH_2CF_3$ | C(=O)Me | $CF_3$ | $CH_2OMe$ | O |
| C-5841 | Me | $CH_2CH_2$ | H | $CH_2CF_3$ | C(=O)Me | $CF_3$ | $CH_2OMe$ | O |
| C-5842 | H | single bond | Me | Et | C(=O)Me | $CF_3$ | $CH_2OMe$ | O |
| C-5843 | Me | single bond | H | Et | C(=O)Me | $CF_3$ | $CH_2OMe$ | O |
| C-5844 | Me(R) | single bond | H | Et | C(=O)Me | $CF_3$ | $CH_2OMe$ | O |
| C-5845 | Me(S) | single bond | H | Et | C(=O)Me | $CF_3$ | $CH_2OMe$ | O |
| C-5846 | H | $CH_2$ | Me | Et | C(=O)Me | $CF_3$ | $CH_2OMe$ | O |

TABLE 360

| Compound Number | Y | W | Z | $R^1$ | $R^2$ | $R^3$ | $R^{10}$ | A |
|---|---|---|---|---|---|---|---|---|
| C-5847 | Me | $CH_2$ | H | Et | C(=O)Me | $CF_3$ | $CH_2OMe$ | O |
| C-5848 | H | CH(Me) | H | Et | C(=O)Me | $CF_3$ | $CH_2OMe$ | O |
| C-5849 | H | $CH_2CH_2$ | Me | Et | C(=O)Me | $CF_3$ | $CH_2OMe$ | O |
| C-5850 | Me | $CH_2CH_2$ | H | Et | C(=O)Me | $CF_3$ | $CH_2OMe$ | O |
| C-5851 | H | single bond | Me | c-Pr | C(=O)Me | $CF_3$ | $CH_2OMe$ | O |
| C-5852 | Me | single bond | H | c-Pr | C(=O)Me | $CF_3$ | $CH_2OMe$ | O |
| C-5853 | Me(R) | single bond | H | c-Pr | C(=O)Me | $CF_3$ | $CH_2OMe$ | O |
| C-5854 | Me(S) | single bond | H | c-Pr | C(=O)Me | $CF_3$ | $CH_2OMe$ | O |
| C-5855 | H | $CH_2$ | Me | c-Pr | C(=O)Me | $CF_3$ | $CH_2OMe$ | O |
| C-5856 | Me | $CH_2$ | H | c-Pr | C(=O)Me | $CF_3$ | $CH_2OMe$ | O |
| C-5857 | H | CH(Me) | H | c-Pr | C(=O)Me | $CF_3$ | $CH_2OMe$ | O |
| C-5858 | H | $CH_2CH_2$ | Me | c-Pr | C(=O)Me | $CF_3$ | $CH_2OMe$ | O |
| C-5859 | Me | $CH_2CH_2$ | H | c-Pr | C(=O)Me | $CF_3$ | $CH_2OMe$ | O |
| C-5860 | H | single bond | Me | c-Pr(1-CN) | C(=O)Me | $CF_3$ | $CH_2OMe$ | O |
| C-5861 | Me | single bond | H | c-Pr(1-CN) | C(=O)Me | $CF_3$ | $CH_2OMe$ | O |
| C-5862 | Me(R) | single bond | H | c-Pr(1-CN) | C(=O)Me | $CF_3$ | $CH_2OMe$ | O |
| C-5863 | Me(S) | single bond | H | c-Pr(1-CN) | C(=O)Me | $CF_3$ | $CH_2OMe$ | O |
| C-5864 | H | $CH_2$ | Me | c-Pr(1-CN) | C(=O)Me | $CF_3$ | $CH_2OMe$ | O |
| C-5865 | Me | $CH_2$ | H | c-Pr(1-CN) | C(=O)Me | $CF_3$ | $CH_2OMe$ | O |
| C-5866 | H | CH(Me) | H | c-Pr(1-CN) | C(=O)Me | $CF_3$ | $CH_2OMe$ | O |
| C-5867 | H | $CH_2CH_2$ | Me | c-Pr(1-CN) | C(=O)Me | $CF_3$ | $CH_2OMe$ | O |
| C-5868 | Me | $CH_2CH_2$ | H | c-Pr(1-CN) | C(=O)Me | $CF_3$ | $CH_2OMe$ | O |
| C-5869 | H | single bond | Me | $CH_2CF_3$ | C(=O)Me | OMe | $CH_2OMe$ | O |
| C-5870 | Me | single bond | H | $CH_2CF_3$ | C(=O)Me | OMe | $CH_2OMe$ | O |
| C-5871 | Me(R) | single bond | H | $CH_2CF_3$ | C(=O)Me | OMe | $CH_2OMe$ | O |
| C-5872 | Me(S) | single bond | H | $CH_2CF_3$ | C(=O)Me | OMe | $CH_2OMe$ | O |
| C-5873 | H | $CH_2$ | Me | $CH_2CF_3$ | C(=O)Me | OMe | $CH_2OMe$ | O |
| C-5874 | Me | $CH_2$ | H | $CH_2CF_3$ | C(=O)Me | OMe | $CH_2OMe$ | O |
| C-5875 | H | CH(Me) | H | $CH_2CF_3$ | C(=O)Me | OMe | $CH_2OMe$ | O |
| C-5876 | H | $CH_2CH_2$ | Me | $CH_2CF_3$ | C(=O)Me | OMe | $CH_2OMe$ | O |
| C-5877 | Me | $CH_2CH_2$ | H | $CH_2CF_3$ | C(=O)Me | OMe | $CH_2OMe$ | O |
| C-5878 | H | single bond | Me | Et | C(=O)Me | OMe | $CH_2OMe$ | O |
| C-5879 | Me | single bond | H | Et | C(=O)Me | OMe | $CH_2OMe$ | O |
| C-5880 | Me(R) | single bond | H | Et | C(=O)Me | OMe | $CH_2OMe$ | O |
| C-5881 | Me(S) | single bond | H | Et | C(=O)Me | OMe | $CH_2OMe$ | O |
| C-5882 | H | $CH_2$ | Me | Et | C(=O)Me | OMe | $CH_2OMe$ | O |
| C-5883 | Me | $CH_2$ | H | Et | C(=O)Me | OMe | $CH_2OMe$ | O |
| C-5884 | H | CH(Me) | H | Et | C(=O)Me | OMe | $CH_2OMe$ | O |
| C-5885 | H | $CH_2CH_2$ | Me | Et | C(=O)Me | OMe | $CH_2OMe$ | O |
| C-5886 | Me | $CH_2CH_2$ | H | Et | C(=O)Me | OMe | $CH_2OMe$ | O |
| C-5887 | H | single bond | Me | c-Pr | C(=O)Me | OMe | $CH_2OMe$ | O |
| C-5888 | Me | single bond | H | c-Pr | C(=O)Me | OMe | $CH_2OMe$ | O |
| C-5889 | Me(R) | single bond | H | c-Pr | C(=O)Me | OMe | $CH_2OMe$ | O |
| C-5890 | Me(S) | single bond | H | c-Pr | C(=O)Me | OMe | $CH_2OMe$ | O |

TABLE 361

| Compound Number | Y | W | Z | $R^1$ | $R^2$ | $R^3$ | $R^{10}$ | A |
|---|---|---|---|---|---|---|---|---|
| C-5891 | H | $CH_2$ | Me | c-Pr | C(=O)Me | OMe | $CH_2OMe$ | O |
| C-5892 | Me | $CH_2$ | H | c-Pr | C(=O)Me | OMe | $CH_2OMe$ | O |
| C-5893 | H | CH(Me) | H | c-Pr | C(=O)Me | OMe | $CH_2OMe$ | O |
| C-5894 | H | $CH_2CH_2$ | Me | c-Pr | C(=O)Me | OMe | $CH_2OMe$ | O |
| C-5895 | Me | $CH_2CH_2$ | H | c-Pr | C(=O)Me | OMe | $CH_2OMe$ | O |
| C-5896 | H | single bond | Me | c-Pr(1-CN) | C(=O)Me | OMe | $CH_2OMe$ | O |
| C-5897 | Me | single bond | H | c-Pr(1-CN) | C(=O)Me | OMe | $CH_2OMe$ | O |
| C-5898 | Me(R) | single bond | H | c-Pr(1-CN) | C(=O)Me | OMe | $CH_2OMe$ | O |
| C-5899 | Me(S) | single bond | H | c-Pr(1-CN) | C(=O)Me | OMe | $CH_2OMe$ | O |
| C-5900 | H | $CH_2$ | Me | c-Pr(1-CN) | C(=O)Me | OMe | $CH_2OMe$ | O |
| C-5901 | Me | $CH_2$ | H | c-Pr(1-CN) | C(=O)Me | OMe | $CH_2OMe$ | O |
| C-5902 | H | CH(Me) | H | c-Pr(1-CN) | C(=O)Me | OMe | $CH_2OMe$ | O |
| C-5903 | H | $CH_2CH_2$ | Me | c-Pr(1-CN) | C(=O)Me | OMe | $CH_2OMe$ | O |
| C-5904 | Me | $CH_2CH_2$ | H | c-Pr(1-CN) | C(=O)Me | OMe | $CH_2OMe$ | O |
| C-5905 | H | single bond | Me | $CH_2CF_3$ | C(=O)Me | $OCF_3$ | $CH_2OMe$ | O |
| C-5906 | Me | single bond | H | $CH_2CF_3$ | C(=O)Me | $OCF_3$ | $CH_2OMe$ | O |
| C-5907 | Me(R) | single bond | H | $CH_2CF_3$ | C(=O)Me | $OCF_3$ | $CH_2OMe$ | O |
| C-5908 | Me(S) | single bond | H | $CH_2CF_3$ | C(=O)Me | $OCF_3$ | $CH_2OMe$ | O |
| C-5909 | H | $CH_2$ | Me | $CH_2CF_3$ | C(=O)Me | $OCF_3$ | $CH_2OMe$ | O |
| C-5910 | Me | $CH_2$ | H | $CH_2CF_3$ | C(=O)Me | $OCF_3$ | $CH_2OMe$ | O |
| C-5911 | H | CH(Me) | H | $CH_2CF_3$ | C(=O)Me | $OCF_3$ | $CH_2OMe$ | O |
| C-5912 | H | $CH_2CH_2$ | Me | $CH_2CF_3$ | C(=O)Me | $OCF_3$ | $CH_2OMe$ | O |
| C-5913 | Me | $CH_2CH_2$ | H | $CH_2CF_3$ | C(=O)Me | $OCF_3$ | $CH_2OMe$ | O |

TABLE 361-continued

| Compound Number | Y | W | Z | $R^1$ | $R^2$ | $R^3$ | $R^{10}$ | A |
|---|---|---|---|---|---|---|---|---|
| C-5914 | H | single bond | Me | Et | C(=O)Me | $OCF_3$ | $CH_2OMe$ | O |
| C-5915 | Me | single bond | H | Et | C(=O)Me | $OCF_3$ | $CH_2OMe$ | O |
| C-5916 | Me(R) | single bond | H | Et | C(=O)Me | $OCF_3$ | $CH_2OMe$ | O |
| C-5917 | Me(S) | single bond | H | Et | C(=O)Me | $OCF_3$ | $CH_2OMe$ | O |
| C-5918 | H | $CH_2$ | Me | Et | C(=O)Me | $OCF_3$ | $CH_2OMe$ | O |
| C-5919 | Me | $CH_2$ | H | Et | C(=O)Me | $OCF_3$ | $CH_2OMe$ | O |
| C-5920 | H | CH(Me) | H | Et | C(=O)Me | $OCF_3$ | $CH_2OMe$ | O |
| C-5921 | H | $CH_2CH_2$ | Me | Et | C(=O)Me | $OCF_3$ | $CH_2OMe$ | O |
| C-5922 | Me | $CH_2CH_2$ | H | Et | C(=O)Me | $OCF_3$ | $CH_2OMe$ | O |
| C-5923 | H | single bond | Me | c-Pr | C(=O)Me | $OCF_3$ | $CH_2OMe$ | O |
| C-5924 | Me | single bond | H | c-Pr | C(=O)Me | $OCF_3$ | $CH_2OMe$ | O |
| C-5925 | Me(R) | single bond | H | c-Pr | C(=O)Me | $OCF_3$ | $CH_2OMe$ | O |
| C-5926 | Me(S) | single bond | H | c-Pr | C(=O)Me | $OCF_3$ | $CH_2OMe$ | O |
| C-5927 | H | $CH_2$ | Me | c-Pr | C(=O)Me | $OCF_3$ | $CH_2OMe$ | O |
| C-5928 | Me | $CH_2$ | H | c-Pr | C(=O)Me | $OCF_3$ | $CH_2OMe$ | O |
| C-5929 | H | CH(Me) | H | c-Pr | C(=O)Me | $OCF_3$ | $CH_2OMe$ | O |
| C-5930 | H | $CH_2CH_2$ | Me | c-Pr | C(=O)Me | $OCF_3$ | $CH_2OMe$ | O |
| C-5931 | Me | $CH_2CH_2$ | H | c-Pr | C(=O)Me | $OCF_3$ | $CH_2OMe$ | O |
| C-5932 | H | single bond | Me | c-Pr(1-CN) | C(=O)Me | $OCF_3$ | $CH_2OMe$ | O |
| C-5933 | Me | single bond | H | c-Pr(1-CN) | C(=O)Me | $OCF_3$ | $CH_2OMe$ | O |
| C-5934 | Me(R) | single bond | H | c-Pr(1-CN) | C(=O)Me | $OCF_3$ | $CH_2OMe$ | O |

TABLE 362

| Compound Number | Y | W | Z | $R^1$ | $R^2$ | $R^3$ | $R^{10}$ | A |
|---|---|---|---|---|---|---|---|---|
| C-5935 | Me(S) | single bond | H | c-Pr(1-CN) | C(=O)Me | $OCF_3$ | $CH_2OMe$ | O |
| C-5936 | H | $CH_2$ | Me | c-Pr(1-CN) | C(=O)Me | $OCF_3$ | $CH_2OMe$ | O |
| C-5937 | Me | $CH_2$ | H | c-Pr(1-CN) | C(=O)Me | $OCF_3$ | $CH_2OMe$ | O |
| C-5938 | H | CH(Me) | H | c-Pr(1-CN) | C(=O)Me | $OCF_3$ | $CH_2OMe$ | O |
| C-5939 | H | $CH_2CH_2$ | Me | c-Pr(1-CN) | C(=O)Me | $OCF_3$ | $CH_2OMe$ | O |
| C-5940 | Me | $CH_2CH_2$ | H | c-Pr(1-CN) | C(=O)Me | $OCF_3$ | $CH_2OMe$ | O |
| C-5941 | H | single bond | Me | $CH_2CF_3$ | C(=O)Me | Br | $CH_2CN$ | O |
| C-5942 | Me | single bond | H | $CH_2CF_3$ | C(=O)Me | Br | $CH_2CN$ | O |
| C-5943 | Me(R) | single bond | H | $CH_2CF_3$ | C(=O)Me | Br | $CH_2CN$ | O |
| C-5944 | Me(S) | single bond | H | $CH_2CF_3$ | C(=O)Me | Br | $CH_2CN$ | O |
| C-5945 | H | $CH_2$ | Me | $CH_2CF_3$ | C(=O)Me | Br | $CH_2CN$ | O |
| C-5946 | Me | $CH_2$ | H | $CH_2CF_3$ | C(=O)Me | Br | $CH_2CN$ | O |
| C-5947 | H | CH(Me) | H | $CH_2CF_3$ | C(=O)Me | Br | $CH_2CN$ | O |
| C-5948 | H | $CH_2CH_2$ | Me | $CH_2CF_3$ | C(=O)Me | Br | $CH_2CN$ | O |
| C-5949 | Me | $CH_2CH_2$ | H | $CH_2CF_3$ | C(=O)Me | Br | $CH_2CN$ | O |
| C-5950 | H | single bond | Me | Et | C(=O)Me | Br | $CH_2CN$ | O |
| C-5951 | Me | single bond | H | Et | C(=O)Me | Br | $CH_2CN$ | O |
| C-5952 | Me(R) | single bond | H | Et | C(=O)Me | Br | $CH_2CN$ | O |
| C-5953 | Me(S) | single bond | H | Et | C(=O)Me | Br | $CH_2CN$ | O |
| C-5954 | H | $CH_2$ | Me | Et | C(=O)Me | Br | $CH_2CN$ | O |
| C-5955 | Me | $CH_2$ | H | Et | C(=O)Me | Br | $CH_2CN$ | O |
| C-5956 | H | CH(Me) | H | Et | C(=O)Me | Br | $CH_2CN$ | O |
| C-5957 | H | $CH_2CH_2$ | Me | Et | C(=O)Me | Br | $CH_2CN$ | O |
| C-5958 | Me | $CH_2CH_2$ | H | Et | C(=O)Me | Br | $CH_2CN$ | O |
| C-5959 | H | single bond | Me | c-Pr | C(=O)Me | Br | $CH_2CN$ | O |
| C-5960 | Me | single bond | H | c-Pr | C(=O)Me | Br | $CH_2CN$ | O |
| C-5961 | Me(R) | single bond | H | c-Pr | C(=O)Me | Br | $CH_2CN$ | O |
| C-5962 | Me(S) | single bond | H | c-Pr | C(=O)Me | Br | $CH_2CN$ | O |
| C-5963 | H | $CH_2$ | Me | c-Pr | C(=O)Me | Br | $CH_2CN$ | O |
| C-5964 | Me | $CH_2$ | H | c-Pr | C(=O)Me | Br | $CH_2CN$ | O |
| C-5965 | H | CH(Me) | H | c-Pr | C(=O)Me | Br | $CH_2CN$ | O |
| C-5966 | H | $CH_2CH_2$ | Me | c-Pr | C(=O)Me | Br | $CH_2CN$ | O |
| C-5967 | Me | $CH_2CH_2$ | H | c-Pr | C(=O)Me | Br | $CH_2CN$ | O |
| C-5968 | H | single bond | Me | c-Pr(1-CN) | C(=O)Me | Br | $CH_2CN$ | O |
| C-5969 | Me | single bond | H | c-Pr(1-CN) | C(=O)Me | Br | $CH_2CN$ | O |
| C-5970 | Me(R) | single bond | H | c-Pr(1-CN) | C(=O)Me | Br | $CH_2CN$ | O |
| C-5971 | Me(S) | single bond | H | c-Pr(1-CN) | C(=O)Me | Br | $CH_2CN$ | O |
| C-5972 | H | $CH_2$ | Me | c-Pr(1-CN) | C(=O)Me | Br | $CH_2CN$ | O |
| C-5973 | Me | $CH_2$ | H | c-Pr(1-CN) | C(=O)Me | Br | $CH_2CN$ | O |
| C-5974 | H | CH(Me) | H | c-Pr(1-CN) | C(=O)Me | Br | $CH_2CN$ | O |
| C-5975 | H | $CH_2CH_2$ | Me | c-Pr(1-CN) | C(=O)Me | Br | $CH_2CN$ | O |
| C-5976 | Me | $CH_2CH_2$ | H | c-Pr(1-CN) | C(=O)Me | Br | $CH_2CN$ | O |
| C-5977 | H | single bond | Me | $CH_2CF_3$ | C(=O)Me | $CF_3$ | $CH_2CN$ | O |
| C-5978 | Me | single bond | H | $CH_2CF_3$ | C(=O)Me | $CF_3$ | $CH_2CN$ | O |

TABLE 363

| Compound Number | Y | W | Z | $R^1$ | $R^2$ | $R^3$ | $R^{10}$ | A |
|---|---|---|---|---|---|---|---|---|
| C-5979 | Me(R) | single bond | H | $CH_2CF_3$ | C(=O)Me | $CF_3$ | $CH_2CN$ | O |
| C-5980 | Me(S) | single bond | H | $CH_2CF_3$ | C(=O)Me | $CF_3$ | $CH_2CN$ | O |
| C-5981 | H | $CH_2$ | Me | $CH_2CF_3$ | C(=O)Me | $CF_3$ | $CH_2CN$ | O |
| C-5982 | Me | $CH_2$ | H | $CH_2CF_3$ | C(=O)Me | $CF_3$ | $CH_2CN$ | O |
| C-5983 | H | CH(Me) | H | $CH_2CF_3$ | C(=O)Me | $CF_3$ | $CH_2CN$ | O |
| C-5984 | H | $CH_2CH_2$ | Me | $CH_2CF_3$ | C(=O)Me | $CF_3$ | $CH_2CN$ | O |
| C-5985 | Me | $CH_2CH_2$ | H | $CH_2CF_3$ | C(=O)Me | $CF_3$ | $CH_2CN$ | O |
| C-5986 | H | single bond | Me | Et | C(=O)Me | $CF_3$ | $CH_2CN$ | O |
| C-5987 | Me | single bond | H | Et | C(=O)Me | $CF_3$ | $CH_2CN$ | O |
| C-5988 | Me(R) | single bond | H | Et | C(=O)Me | $CF_3$ | $CH_2CN$ | O |
| C-5989 | Me(S) | single bond | H | Et | C(=O)Me | $CF_3$ | $CH_2CN$ | O |
| C-5990 | H | $CH_2$ | Me | Et | C(=O)Me | $CF_3$ | $CH_2CN$ | O |
| C-5991 | Me | $CH_2$ | H | Et | C(=O)Me | $CF_3$ | $CH_2CN$ | O |
| C-5992 | H | CH(Me) | H | Et | C(=O)Me | $CF_3$ | $CH_2CN$ | O |
| C-5993 | H | $CH_2CH_2$ | Me | Et | C(=O)Me | $CF_3$ | $CH_2CN$ | O |
| C-5994 | Me | $CH_2CH_2$ | H | Et | C(=O)Me | $CF_3$ | $CH_2CN$ | O |
| C-5995 | H | single bond | Me | c-Pr | C(=O)Me | $CF_3$ | $CH_2CN$ | O |
| C-5996 | Me | single bond | H | c-Pr | C(=O)Me | $CF_3$ | $CH_2CN$ | O |
| C-5997 | Me(R) | single bond | H | c-Pr | C(=O)Me | $CF_3$ | $CH_2CN$ | O |
| C-5998 | Me(S) | single bond | H | c-Pr | C(=O)Me | $CF_3$ | $CH_2CN$ | O |
| C-5999 | H | $CH_2$ | Me | c-Pr | C(=O)Me | $CF_3$ | $CH_2CN$ | O |
| C-6000 | Me | $CH_2$ | H | c-Pr | C(=O)Me | $CF_3$ | $CH_2CN$ | O |
| C-6001 | H | CH(Me) | H | c-Pr | C(=O)Me | $CF_3$ | $CH_2CN$ | O |
| C-6002 | H | $CH_2CH_2$ | Me | c-Pr | C(=O)Me | $CF_3$ | $CH_2CN$ | O |
| C-6003 | Me | $CH_2CH_2$ | H | c-Pr | C(=O)Me | $CF_3$ | $CH_2CN$ | O |
| C-6004 | H | single bond | Me | c-Pr(1-CN) | C(=O)Me | $CF_3$ | $CH_2CN$ | O |
| C-6005 | Me | single bond | H | c-Pr(1-CN) | C(=O)Me | $CF_3$ | $CH_2CN$ | O |
| C-6006 | Me(R) | single bond | H | c-Pr(1-CN) | C(=O)Me | $CF_3$ | $CH_2CN$ | O |
| C-6007 | Me(S) | single bond | H | c-Pr(1-CN) | C(=O)Me | $CF_3$ | $CH_2CN$ | O |
| C-6008 | H | $CH_2$ | Me | c-Pr(1-CN) | C(=O)Me | $CF_3$ | $CH_2CN$ | O |
| C-6009 | Me | $CH_2$ | H | c-Pr(1-CN) | C(=O)Me | $CF_3$ | $CH_2CN$ | O |
| C-6010 | H | CH(Me) | H | c-Pr(1-CN) | C(=O)Me | $CF_3$ | $CH_2CN$ | O |
| C-6011 | H | $CH_2CH_2$ | Me | c-Pr(1-CN) | C(=O)Me | $CF_3$ | $CH_2CN$ | O |
| C-6012 | Me | $CH_2CH_2$ | H | c-Pr(1-CN) | C(=O)Me | $CF_3$ | $CH_2CN$ | O |
| C-6013 | H | single bond | Me | $CH_2CF_3$ | C(=O)Me | OMe | $CH_2CN$ | O |
| C-6014 | Me | single bond | H | $CH_2CF_3$ | C(=O)Me | OMe | $CH_2CN$ | O |
| C-6015 | Me(R) | single bond | H | $CH_2CF_3$ | C(=O)Me | OMe | $CH_2CN$ | O |
| C-6016 | Me(S) | single bond | H | $CH_2CF_3$ | C(=O)Me | OMe | $CH_2CN$ | O |
| C-6017 | H | $CH_2$ | Me | $CH_2CF_3$ | C(=O)Me | OMe | $CH_2CN$ | O |
| C-6018 | Me | $CH_2$ | H | $CH_2CF_3$ | C(=O)Me | OMe | $CH_2CN$ | O |
| C-6019 | H | CH(Me) | H | $CH_2CF_3$ | C(=O)Me | OMe | $CH_2CN$ | O |
| C-6020 | H | $CH_2CH_2$ | Me | $CH_2CF_3$ | C(=O)Me | OMe | $CH_2CN$ | O |
| C-6021 | Me | $CH_2CH_2$ | H | $CH_2CF_3$ | C(=O)Me | OMe | $CH_2CN$ | O |
| C-6022 | H | single bond | Me | Et | C(=O)Me | OMe | $CH_2CN$ | O |

TABLE 364

| Compound Number | Y | W | Z | $R^1$ | $R^2$ | $R^3$ | $R^{10}$ | A |
|---|---|---|---|---|---|---|---|---|
| C-6023 | Me | single bond | H | Et | C(=O)Me | OMe | $CH_2CN$ | O |
| C-6024 | Me(R) | single bond | H | Et | C(=O)Me | OMe | $CH_2CN$ | O |
| C-6025 | Me(S) | single bond | H | Et | C(=O)Me | OMe | $CH_2CN$ | O |
| C-6026 | H | $CH_2$ | Me | Et | C(=O)Me | OMe | $CH_2CN$ | O |
| C-6027 | Me | $CH_2$ | H | Et | C(=O)Me | OMe | $CH_2CN$ | O |
| C-6028 | H | CH(Me) | H | Et | C(=O)Me | OMe | $CH_2CN$ | O |
| C-6029 | H | $CH_2CH_2$ | Me | Et | C(=O)Me | OMe | $CH_2CN$ | O |
| C-6030 | Me | $CH_2CH_2$ | H | Et | C(=O)Me | OMe | $CH_2CN$ | O |
| C-6031 | H | single bond | Me | c-Pr | C(=O)Me | OMe | $CH_2CN$ | O |
| C-6032 | Me | single bond | H | c-Pr | C(=O)Me | OMe | $CH_2CN$ | O |
| C-6033 | Me(R) | single bond | H | c-Pr | C(=O)Me | OMe | $CH_2CN$ | O |
| C-6034 | Me(S) | single bond | H | c-Pr | C(=O)Me | OMe | $CH_2CN$ | O |
| C-6035 | H | $CH_2$ | Me | c-Pr | C(=O)Me | OMe | $CH_2CN$ | O |
| C-6036 | Me | $CH_2$ | H | c-Pr | C(=O)Me | OMe | $CH_2CN$ | O |
| C-6037 | H | CH(Me) | H | c-Pr | C(=O)Me | OMe | $CH_2CN$ | O |
| C-6038 | H | $CH_2CH_2$ | Me | c-Pr | C(=O)Me | OMe | $CH_2CN$ | O |
| C-6039 | Me | $CH_2CH_2$ | H | c-Pr | C(=O)Me | OMe | $CH_2CN$ | O |
| C-6040 | H | single bond | Me | c-Pr(1-CN) | C(=O)Me | OMe | $CH_2CN$ | O |
| C-6041 | Me | single bond | H | c-Pr(1-CN) | C(=O)Me | OMe | $CH_2CN$ | O |
| C-6042 | Me(R) | single bond | H | c-Pr(1-CN) | C(=O)Me | OMe | $CH_2CN$ | O |
| C-6043 | Me(S) | single bond | H | c-Pr(1-CN) | C(=O)Me | OMe | $CH_2CN$ | O |

TABLE 364-continued

| Compound Number | Y | W | Z | $R^1$ | $R^2$ | $R^3$ | $R^{10}$ | A |
|---|---|---|---|---|---|---|---|---|
| C-6044 | H | $CH_2$ | Me | c-Pr(1-CN) | C(=O)Me | OMe | $CH_2CN$ | O |
| C-6045 | Me | $CH_2$ | H | c-Pr(1-CN) | C(=O)Me | OMe | $CH_2CN$ | O |
| C-6046 | H | CH(Me) | H | c-Pr(1-CN) | C(=O)Me | OMe | $CH_2CN$ | O |
| C-6047 | H | $CH_2CH_2$ | Me | c-Pr(1-CN) | C(=O)Me | OMe | $CH_2CN$ | O |
| C-6048 | Me | $CH_2CH_2$ | H | c-Pr(1-CN) | C(=O)Me | OMe | $CH_2CN$ | O |
| C-6049 | H | single bond | Me | $CH_2CF_3$ | C(=O)Me | $OCF_3$ | $CH_2CN$ | O |
| C-6050 | Me | single bond | H | $CH_2CF_3$ | C(=O)Me | $OCF_3$ | $CH_2CN$ | O |
| C-6051 | Me(R) | single bond | H | $CH_2CF_3$ | C(=O)Me | $OCF_3$ | $CH_2CN$ | O |
| C-6052 | Me(S) | single bond | H | $CH_2CF_3$ | C(=O)Me | $OCF_3$ | $CH_2CN$ | O |
| C-6053 | H | $CH_2$ | Me | $CH_2CF_3$ | C(=O)Me | $OCF_3$ | $CH_2CN$ | O |
| C-6054 | Me | $CH_2$ | H | $CH_2CF_3$ | C(=O)Me | $OCF_3$ | $CH_2CN$ | O |
| C-6055 | H | CH(Me) | H | $CH_2CF_3$ | C(=O)Me | $OCF_3$ | $CH_2CN$ | O |
| C-6056 | H | $CH_2CH_2$ | Me | $CH_2CF_3$ | C(=O)Me | $OCF_3$ | $CH_2CN$ | O |
| C-6057 | Me | $CH_2CH_2$ | H | $CH_2CF_3$ | C(=O)Me | $OCF_3$ | $CH_2CN$ | O |
| C-6058 | H | single bond | Me | Et | C(=O)Me | $OCF_3$ | $CH_2CN$ | O |
| C-6059 | Me | single bond | H | Et | C(=O)Me | $OCF_3$ | $CH_2CN$ | O |
| C-6060 | Me(R) | single bond | H | Et | C(=O)Me | $OCF_3$ | $CH_2CN$ | O |
| C-6061 | Me(S) | single bond | H | Et | C(=O)Me | $OCF_3$ | $CH_2CN$ | O |
| C-6062 | H | $CH_2$ | Me | Et | C(=O)Me | $OCF_3$ | $CH_2CN$ | O |
| C-6063 | Me | $CH_2$ | H | Et | C(=O)Me | $OCF_3$ | $CH_2CN$ | O |
| C-6064 | H | CH(Me) | H | Et | C(=O)Me | $OCF_3$ | $CH_2CN$ | O |
| C-6065 | H | $CH_2CH_2$ | Me | Et | C(=O)Me | $OCF_3$ | $CH_2CN$ | O |
| C-6066 | Me | $CH_2CH_2$ | H | Et | C(=O)Me | $OCF_3$ | $CH_2CN$ | O |

TABLE 365

| Compound Number | Y | W | Z | $R^1$ | $R^2$ | $R^3$ | $R^{10}$ | A |
|---|---|---|---|---|---|---|---|---|
| C-6067 | H | single bond | Me | c-Pr | C(=O)Me | $OCF_3$ | $CH_2CN$ | O |
| C-6068 | Me | single bond | H | c-Pr | C(=O)Me | $OCF_3$ | $CH_2CN$ | O |
| C-6069 | Me(R) | single bond | H | c-Pr | C(=O)Me | $OCF_3$ | $CH_2CN$ | O |
| C-6070 | Me(S) | single bond | H | c-Pr | C(=O)Me | $OCF_3$ | $CH_2CN$ | O |
| C-6071 | H | $CH_2$ | Me | c-Pr | C(=O)Me | $OCF_3$ | $CH_2CN$ | O |
| C-6072 | Me | $CH_2$ | H | c-Pr | C(=O)Me | $OCF_3$ | $CH_2CN$ | O |
| C-6073 | H | CH(Me) | H | c-Pr | C(=O)Me | $OCF_3$ | $CH_2CN$ | O |
| C-6074 | H | $CH_2CH_2$ | Me | c-Pr | C(=O)Me | $OCF_3$ | $CH_2CN$ | O |
| C-6075 | Me | $CH_2CH_2$ | H | c-Pr | C(=O)Me | $OCF_3$ | $CH_2CN$ | O |
| C-6076 | H | single bond | Me | c-Pr(1-CN) | C(=O)Me | $OCF_3$ | $CH_2CN$ | O |
| C-6077 | Me | single bond | H | c-Pr(1-CN) | C(=O)Me | $OCF_3$ | $CH_2CN$ | O |
| C-6078 | Me(R) | single bond | H | c-Pr(1-CN) | C(=O)Me | $OCF_3$ | $CH_2CN$ | O |
| C-6079 | Me(S) | single bond | H | c-Pr(1-CN) | C(=O)Me | $OCF_3$ | $CH_2CN$ | O |
| C-6080 | H | $CH_2$ | Me | c-Pr(1-CN) | C(=O)Me | $OCF_3$ | $CH_2CN$ | O |
| C-6081 | Me | $CH_2$ | H | c-Pr(1-CN) | C(=O)Me | $OCF_3$ | $CH_2CN$ | O |
| C-6082 | H | CH(Me) | H | c-Pr(1-CN) | C(=O)Me | $OCF_3$ | $CH_2CN$ | O |
| C-6083 | H | $CH_2CH_2$ | Me | c-Pr(1-CN) | C(=O)Me | $OCF_3$ | $CH_2CN$ | O |
| C-6084 | Me | $CH_2CH_2$ | H | c-Pr(1-CN) | C(=O)Me | $OCF_3$ | $CH_2CN$ | O |

TABLE 366

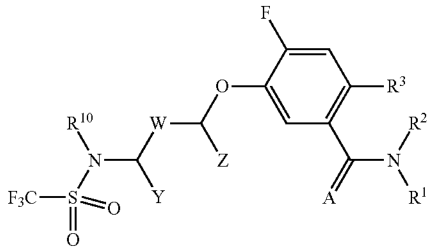

| Compound Number | Y | W | Z | $R^1$ | $R^2$ | $R^3$ | $R^{10}$ | A |
|---|---|---|---|---|---|---|---|---|
| C-6085 | H | single bond | Me | $CH_2CF_3$ | $C(=O)OCH_2CH=CH_2$ | Cl | H | O |
| C-6086 | Me | single bond | H | $CH_2CF_3$ | $C(=O)OCH_2CH=CH_2$ | Cl | H | O |
| C-6087 | Me(R) | single bond | H | $CH_2CF_3$ | $C(=O)OCH_2CH=CH_2$ | Cl | H | O |

TABLE 366-continued

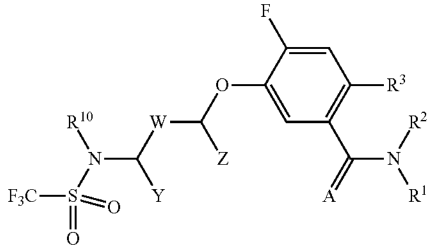

| Compound Number | Y | W | Z | $R^1$ | $R^2$ | $R^3$ | $R^{10}$ | A |
|---|---|---|---|---|---|---|---|---|
| C-6088 | Me(S) | single bond | H | $CH_2CF_3$ | $C(=O)OCH_2CH=CH_2$ | Cl | H | O |
| C-6089 | H | $CH_2$ | Me | $CH_2CF_3$ | $C(=O)OCH_2CH=CH_2$ | Cl | H | O |
| C-6090 | Me | $CH_2$ | H | $CH_2CF_3$ | $C(=O)OCH_2CH=CH_2$ | Cl | H | O |
| C-6091 | H | CH(Me) | H | $CH_2CF_3$ | $C(=O)OCH_2CH=CH_2$ | Cl | H | O |
| C-6092 | H | $CH_2CH_2$ | Me | $CH_2CF_3$ | $C(=O)OCH_2CH=CH_2$ | Cl | H | O |
| C-6093 | Me | $CH_2CH_2$ | H | $CH_2CF_3$ | $C(=O)OCH_2CH=CH_2$ | Cl | H | O |
| C-6094 | H | single bond | Me | $CH_2CF_3$ | $C(=O)OCH_2CH=CH_2$ | Me | H | O |
| C-6095 | Me | single bond | H | $CH_2CF_3$ | $C(=O)OCH_2CH=CH_2$ | Me | H | O |
| C-6096 | Me(R) | single bond | H | $CH_2CF_3$ | $C(=O)OCH_2CH=CH_2$ | Me | H | O |
| C-6097 | Me(S) | single bond | H | $CH_2CF_3$ | $C(=O)OCH_2CH=CH_2$ | Me | H | O |
| C-6098 | H | $CH_2$ | Me | $CH_2CF_3$ | $C(=O)OCH_2CH=CH_2$ | Me | H | O |
| C-6099 | Me | $CH_2$ | H | $CH_2CF_3$ | $C(=O)OCH_2CH=CH_2$ | Me | H | O |
| C-6100 | H | $CH_2$ | H | $CH_2CF_3$ | $C(=O)OCH_2CH=CH_2$ | Me | H | O |
| C-6101 | H | $CH_2CH_2$ | Me | $CH_2CF_3$ | $C(=O)OCH_2CH=CH_2$ | Me | H | O |
| C-6102 | Me | $CH_2CH_2$ | H | $CH_2CF_3$ | $C(=O)OCH_2CH=CH_2$ | Me | H | O |
| C-6103 | H | single bond | Me | $CH_2CF_3$ | $C(=O)OCH_2CCl_3$ | Cl | H | O |
| C-6104 | Me | single bond | H | $CH_2CF_3$ | $C(=O)OCH_2CCl_3$ | Cl | H | O |
| C-6105 | Me(R) | single bond | H | $CH_2CF_3$ | $C(=O)OCH_2CCl_3$ | Cl | H | O |
| C-6106 | Me(S) | single bond | H | $CH_2CF_3$ | $C(=O)OCH_2CCl_3$ | Cl | H | O |
| C-6107 | H | $CH_2$ | Me | $CH_2CF_3$ | $C(=O)OCH_2CCl_3$ | Cl | H | O |
| C-6108 | Me | $CH_2$ | H | $CH_2CF_3$ | $C(=O)OCH_2CCl_3$ | Cl | H | O |
| C-6109 | H | CH(Me) | H | $CH_2CF_3$ | $C(=O)OCH_2CCl_3$ | Cl | H | O |
| C-6110 | H | $CH_2CH_2$ | Me | $CH_2CF_3$ | $C(=O)OCH_2CCl_3$ | Cl | H | O |
| C-6111 | Me | $CH_2CH_2$ | H | $CH_2CF_3$ | $C(=O)OCH_2CCl_3$ | Cl | H | O |
| C-6112 | H | single bond | Me | $CH_2CF_3$ | $C(=O)OCH_2CCl_3$ | Me | H | O |
| C-6113 | Me | single bond | H | $CH_2CF_3$ | $C(=O)OCH_2CCl_3$ | Me | H | O |
| C-6114 | Me(R) | single bond | H | $CH_2CF_3$ | $C(=O)OCH_2CCl_3$ | Me | H | O |
| C-6115 | Me(S) | single bond | H | $CH_2CF_3$ | $C(=O)OCH_2CCl_3$ | Me | H | O |
| C-6116 | H | $CH_2$ | Me | $CH_2CF_3$ | $C(=O)OCH_2CCl_3$ | Me | H | O |
| C-6117 | Me | $CH_2$ | H | $CH_2CF_3$ | $C(=O)OCH_2CCl_3$ | Me | H | O |
| C-6118 | H | CH(Me) | H | $CH_2CF_3$ | $C(=O)OCH_2CCl_3$ | Me | H | O |
| C-6119 | H | $CH_2CH_2$ | Me | $CH_2CF_3$ | $C(=O)OCH_2CCl_3$ | Me | H | O |
| C-6120 | Me | $CH_2CH_2$ | H | $CH_2CF_3$ | $C(=O)OCH_2CCl_3$ | Me | H | O |
| C-6121 | H | single bond | Me | $CH_2CF_3$ | $C(=O)N(Me)_2$ | Cl | H | O |
| C-6122 | Me | single bond | H | $CH_2CF_3$ | $C(=O)N(Me)_2$ | Cl | H | O |

TABLE 367

| Compound Number | Y | W | Z | $R^1$ | $R^2$ | $R^3$ | $R^{10}$ | A |
|---|---|---|---|---|---|---|---|---|
| C-6123 | Me(R) | single bond | H | $CH_2CF_3$ | $C(=O)N(Me)_2$ | Cl | H | O |
| C-6124 | Me(S) | single bond | H | $CH_2CF_3$ | $C(=O)N(Me)_2$ | Cl | H | O |
| C-6125 | H | $CH_2$ | Me | $CH_2CF_3$ | $C(=O)N(Me)_2$ | Cl | H | O |
| C-6126 | Me | $CH_2$ | H | $CH_2CF_3$ | $C(=O)N(Me)_2$ | Cl | H | O |
| C-6127 | H | CH(Me) | H | $CH_2CF_3$ | $C(=O)N(Me)_2$ | Cl | H | O |
| C-6128 | H | $CH_2CH_2$ | Me | $CH_2CF_3$ | $C(=O)N(Me)_2$ | Cl | H | O |
| C-6129 | Me | $CH_2CH_2$ | H | $CH_2CF_3$ | $C(=O)N(Me)_2$ | Cl | H | O |
| C-6130 | H | single bond | Me | $CH_2CF_3$ | $C(=O)N(Me)_2$ | Me | H | O |
| C-6131 | Me | single bond | H | $CH_2CF_3$ | $C(=O)N(Me)_2$ | Me | H | O |
| C-6132 | Me(R) | single bond | H | $CH_2CF_3$ | $C(=O)N(Me)_2$ | Me | H | O |
| C-6133 | Me(S) | single bond | H | $CH_2CF_3$ | $C(=O)N(Me)_2$ | Me | H | O |
| C-6134 | H | $CH_2$ | Me | $CH_2CF_3$ | $C(=O)N(Me)_2$ | Me | H | O |
| C-6135 | Me | $CH_2$ | H | $CH_2CF_3$ | $C(=O)N(Me)_2$ | Me | H | O |
| C-6136 | H | CH(Me) | H | $CH_2CF_3$ | $C(=O)N(Me)_2$ | Me | H | O |
| C-6137 | H | $CH_2CH_2$ | Me | $CH_2CF_3$ | $C(=O)N(Me)_2$ | Me | H | O |
| C-6138 | Me | $CH_2CH_2$ | H | $CH_2CF_3$ | $C(=O)N(Me)_2$ | Me | H | O |
| C-6139 | H | single bond | Me | $CH_2CF_3$ | $CH_2OC(=O)Me$ | Cl | H | O |
| C-6140 | Me | single bond | H | $CH_2CF_3$ | $CH_2OC(=O)Me$ | Cl | H | O |
| C-6141 | Me(R) | single bond | H | $CH_2CF_3$ | $CH_2OC(=O)Me$ | Cl | H | O |

TABLE 367-continued

| Compound Number | Y | W | Z | $R^1$ | $R^2$ | $R^3$ | $R^{10}$ | A |
|---|---|---|---|---|---|---|---|---|
| C-6142 | Me(S) | single bond | H | $CH_2CF_3$ | $CH_2OC({=}O)Me$ | Cl | H | O |
| C-6143 | H | $CH_2$ | Me | $CH_2CF_3$ | $CH_2OC({=}O)Me$ | Cl | H | O |
| C-6144 | Me | $CH_2$ | H | $CH_2CF_3$ | $CH_2OC({=}O)Me$ | Cl | H | O |
| C-6145 | H | CH(Me) | H | $CH_2CF_3$ | $CH_2OC({=}O)Me$ | Cl | H | O |
| C-6146 | H | $CH_2CH_2$ | Me | $CH_2CF_3$ | $CH_2OC({=}O)Me$ | Cl | H | O |
| C-6147 | Me | $CH_2CH_2$ | H | $CH_2CF_3$ | $CH_2OC({=}O)Me$ | Cl | H | O |
| C-6148 | H | single bond | Me | $CH_2CF_3$ | $CH_2OC({=}O)Me$ | Me | H | O |
| C-6149 | Me | single bond | H | $CH_2CF_3$ | $CH_2OC({=}O)Me$ | Me | H | O |
| C-6150 | Me(R) | single bond | H | $CH_2CF_3$ | $CH_2OC({=}O)Me$ | Me | H | O |
| C-6151 | Me(S) | single bond | H | $CH_2CF_3$ | $CH_2OC({=}O)Me$ | Me | H | O |
| C-6152 | H | $CH_2$ | Me | $CH_2CF_3$ | $CH_2OC({=}O)Me$ | Me | H | O |
| C-6153 | Me | $CH_2$ | H | $CH_2CF_3$ | $CH_2OC({=}O)Me$ | Me | H | O |
| C-6154 | H | CH(Me) | H | $CH_2CF_3$ | $CH_2OC({=}O)Me$ | Me | H | O |
| C-6155 | H | $CH_2CH_2$ | Me | $CH_2CF_3$ | $CH_2OC({=}O)Me$ | Me | H | O |
| C-6156 | Me | $CH_2CH_2$ | H | $CH_2CF_3$ | $CH_2OC({=}O)Me$ | Me | H | O |
| C-6157 | H | single bond | Me | $CH_2CF_3$ | $CH_2OC({=}O)(i\text{-}Pr)$ | Cl | H | O |
| C-6158 | Me | single bond | H | $CH_2CF_3$ | $CH_2OC({=}O)(i\text{-}Pr)$ | Cl | H | O |
| C-6159 | Me(R) | single bond | H | $CH_2CF_3$ | $CH_2OC({=}O)(i\text{-}Pr)$ | Cl | H | O |
| C-6160 | Me(S) | single bond | H | $CH_2CF_3$ | $CH_2OC({=}O)(i\text{-}Pr)$ | Cl | H | O |
| C-6161 | H | $CH_2$ | Me | $CH_2CF_3$ | $CH_2OC({=}O)(i\text{-}Pr)$ | Cl | H | O |
| C-6162 | Me | $CH_2$ | H | $CH_2CF_3$ | $CH_2OC({=}O)(i\text{-}Pr)$ | Cl | H | O |
| C-6163 | H | CH(Me) | H | $CH_2CF_3$ | $CH_2OC({=}O)(i\text{-}Pr)$ | Cl | H | O |
| C-6164 | H | $CH_2CH_2$ | Me | $CH_2CF_3$ | $CH_2OC({=}O)(i\text{-}Pr)$ | Cl | H | O |
| C-6165 | Me | $CH_2CH_2$ | H | $CH_2CF_3$ | $CH_2OC({=}O)(i\text{-}Pr)$ | Cl | H | O |
| C-6166 | H | single bond | Me | $CH_2CF_3$ | $CH_2OC({=}O)(i\text{-}Pr)$ | Me | H | O |

TABLE 368

| Compound Number | Y | W | Z | $R^1$ | $R^2$ | $R^3$ | $R^{10}$ | A |
|---|---|---|---|---|---|---|---|---|
| C-6167 | Me | single bond | H | $CH_2CF_3$ | $CH_2OC({=}O)(i\text{-}Pr)$ | Me | H | O |
| C-6168 | Me(R) | single bond | H | $CH_2CF_3$ | $CH_2OC({=}O)(i\text{-}Pr)$ | Me | H | O |
| C-6169 | Me(S) | single bond | H | $CH_2CF_3$ | $CH_2OC({=}O)(i\text{-}Pr)$ | Me | H | O |
| C-6170 | H | $CH_2$ | Me | $CH_2CF_3$ | $CH_2OC({=}O)(i\text{-}Pr)$ | Me | H | O |
| C-6171 | Me | $CH_2$ | H | $CH_2CF_3$ | $CH_2OC({=}O)(i\text{-}Pr)$ | Me | H | O |
| C-6172 | H | CH(Me) | H | $CH_2CF_3$ | $CH_2OC({=}O)(i\text{-}Pr)$ | Me | H | O |
| C-6173 | H | $CH_2CH_2$ | Me | $CH_2CF_3$ | $CH_2OC({=}O)(i\text{-}Pr)$ | Me | H | O |
| C-6174 | Me | $CH_2CH_2$ | H | $CH_2CF_3$ | $CH_2OC({=}O)(i\text{-}Pr)$ | Me | H | O |
| C-6175 | H | single bond | Me | $CH_2CF_3$ | $CH_2OC({=}O)(t\text{-}Bu)$ | Cl | H | O |
| C-6176 | Me | single bond | H | $CH_2CF_3$ | $CH_2OC({=}O)(t\text{-}Bu)$ | Cl | H | O |
| C-6177 | Me(R) | single bond | H | $CH_2CF_3$ | $CH_2OC({=}O)(t\text{-}Bu)$ | Cl | H | O |
| C-6178 | Me(S) | single bond | H | $CH_2CF_3$ | $CH_2OC({=}O)(t\text{-}Bu)$ | Cl | H | O |
| C-6179 | H | $CH_2$ | Me | $CH_2CF_3$ | $CH_2OC({=}O)(t\text{-}Bu)$ | Cl | H | O |
| C-6180 | Me | $CH_2$ | H | $CH_2CF_3$ | $CH_2OC({=}O)(t\text{-}Bu)$ | Cl | H | O |
| C-6181 | H | CH(Me) | H | $CH_2CF_3$ | $CH_2OC({=}O)(t\text{-}Bu)$ | Cl | H | O |
| C-6182 | H | $CH_2CH_2$ | Me | $CH_2CF_3$ | $CH_2OC({=}O)(t\text{-}Bu)$ | Cl | H | O |
| C-6183 | Me | $CH_2CH_2$ | H | $CH_2CF_3$ | $CH_2OC({=}O)(t\text{-}Bu)$ | Cl | H | O |
| C-6184 | H | single bond | Me | $CH_2CF_3$ | $CH_2OC({=}O)(t\text{-}Bu)$ | Me | H | O |
| C-6185 | Me | single bond | H | $CH_2CF_3$ | $CH_2OC({=}O)(t\text{-}Bu)$ | Me | H | O |
| C-6186 | Me(R) | single bond | H | $CH_2CF_3$ | $CH_2OC({=}O)(t\text{-}Bu)$ | Me | H | O |
| C-6187 | Me(S) | single bond | H | $CH_2CF_3$ | $CH_2OC({=}O)(t\text{-}Bu)$ | Me | H | O |
| C-6188 | H | $CH_2$ | Me | $CH_2CF_3$ | $CH_2OC({=}O)(t\text{-}Bu)$ | Me | H | O |
| C-6189 | Me | $CH_2$ | H | $CH_2CF_3$ | $CH_2OC({=}O)(t\text{-}Bu)$ | Me | H | O |
| C-6190 | H | CH(Me) | H | $CH_2CF_3$ | $CH_2OC({=}O)(t\text{-}Bu)$ | Me | H | O |
| C-6191 | H | $CH_2CH_2$ | Me | $CH_2CF_3$ | $CH_2OC({=}O)(t\text{-}Bu)$ | Me | H | O |
| C-6192 | Me | $CH_2CH_2$ | H | $CH_2CF_3$ | $CH_2OC({=}O)(t\text{-}Bu)$ | Me | H | O |
| C-6193 | H | single bond | Me | $CH_2CF_3$ | $CH_2OC({=}O)OEt$ | Cl | H | O |
| C-6194 | Me | single bond | H | $CH_2CF_3$ | $CH_2OC({=}O)OEt$ | Cl | H | O |
| C-6195 | Me(R) | single bond | H | $CH_2CF_3$ | $CH_2OC({=}O)OEt$ | Cl | H | O |
| C-6196 | Me(S) | single bond | H | $CH_2CF_3$ | $CH_2OC({=}O)OEt$ | Cl | H | O |
| C-6197 | H | $CH_2$ | Me | $CH_2CF_3$ | $CH_2OC({=}O)OEt$ | Cl | H | O |
| C-6198 | Me | $CH_2$ | H | $CH_2CF_3$ | $CH_2OC({=}O)OEt$ | Cl | H | O |
| C-6199 | H | CH(Me) | H | $CH_2CF_3$ | $CH_2OC({=}O)OEt$ | Cl | H | O |
| C-6200 | H | $CH_2CH_2$ | Me | $CH_2CF_3$ | $CH_2OC({=}O)OEt$ | Cl | H | O |
| C-6201 | Me | $CH_2CH_2$ | H | $CH_2CF_3$ | $CH_2OC({=}O)OEt$ | Cl | H | O |
| C-6202 | H | single bond | Me | $CH_2CF_3$ | $CH_2OC({=}O)OEt$ | Me | H | O |
| C-6203 | Me | single bond | H | $CH_2CF_3$ | $CH_2OC({=}O)OEt$ | Me | H | O |
| C-6204 | Me(R) | single bond | H | $CH_2CF_3$ | $CH_2OC({=}O)OEt$ | Me | H | O |
| C-6205 | Me(S) | single bond | H | $CH_2CF_3$ | $CH_2OC({=}O)OEt$ | Me | H | O |
| C-6206 | H | $CH_2$ | Me | $CH_2CF_3$ | $CH_2OC({=}O)OEt$ | Me | H | O |
| C-6207 | Me | $CH_2$ | H | $CH_2CF_3$ | $CH_2OC({=}O)OEt$ | Me | H | O |
| C-6208 | H | CH(Me) | H | $CH_2CF_3$ | $CH_2OC({=}O)OEt$ | Me | H | O |

TABLE 368-continued

| Compound Number | Y | W | Z | $R^1$ | $R^2$ | $R^3$ | $R^{10}$ | A |
|---|---|---|---|---|---|---|---|---|
| C-6209 | H | $CH_2CH_2$ | Me | $CH_2CF_3$ | $CH_2OC(=O)OEt$ | Me | H | O |
| C-6210 | Me | $CH_2CH_2$ | H | $CH_2CF_3$ | $CH_2OC(=O)OEt$ | Me | H | O |

TABLE 369

| Compound Number | Y | W | Z | $R^1$ | $R^2$ | $R^3$ | $R^{10}$ | A |
|---|---|---|---|---|---|---|---|---|
| C-6211 | H | single bond | Me | $CH_2CF_3$ | $CH_2OC(=O)O(i\text{-}Pr)$ | Cl | H | O |
| C-6212 | Me | single bond | H | $CH_2CF_3$ | $CH_2OC(=O)O(i\text{-}Pr)$ | Cl | H | O |
| C-6213 | Me(R) | single bond | H | $CH_2CF_3$ | $CH_2OC(=O)O(i\text{-}Pr)$ | Cl | H | O |
| C-6214 | Me(S) | single bond | H | $CH_2CF_3$ | $CH_2OC(=O)O(i\text{-}Pr)$ | Cl | H | O |
| C-6215 | H | $CH_2$ | Me | $CH_2CF_3$ | $CH_2OC(=O)O(i\text{-}Pr)$ | Cl | H | O |
| C-6216 | Me | $CH_2$ | H | $CH_2CF_3$ | $CH_2OC(=O)O(i\text{-}Pr)$ | Cl | H | O |
| C-6217 | H | CH(Me) | H | $CH_2CF_3$ | $CH_2OC(=O)O(i\text{-}Pr)$ | Cl | H | O |
| C-6218 | H | $CH_2CH_2$ | Me | $CH_2CF_3$ | $CH_2OC(=O)O(i\text{-}Pr)$ | Cl | H | O |
| C-6219 | Me | $CH_2CH_2$ | H | $CH_2CF_3$ | $CH_2OC(=O)O(i\text{-}Pr)$ | Cl | H | O |
| C-6220 | H | single bond | Me | $CH_2CF_3$ | $CH_2OC(=O)O(i\text{-}Pr)$ | Me | H | O |
| C-6221 | Me | single bond | H | $CH_2CF_3$ | $CH_2OC(=O)O(i\text{-}Pr)$ | Me | H | O |
| C-6222 | Me(R) | single bond | H | $CH_2CF_3$ | $CH_2OC(=O)O(i\text{-}Pr)$ | Me | H | O |
| C-6223 | Me(S) | single bond | H | $CH_2CF_3$ | $CH_2OC(=O)O(i\text{-}Pr)$ | Me | H | O |
| C-6224 | H | $CH_2$ | Me | $CH_2CF_3$ | $CH_2OC(=O)O(i\text{-}Pr)$ | Me | H | O |
| C-6225 | Me | $CH_2$ | H | $CH_2CF_3$ | $CH_2OC(=O)O(i\text{-}Pr)$ | Me | H | O |
| C-6226 | H | CH(Me) | H | $CH_2CF_3$ | $CH_2OC(=O)O(i\text{-}Pr)$ | Me | H | O |
| C-6227 | H | $CH_2CH_2$ | Me | $CH_2CF_3$ | $CH_2OC(=O)O(i\text{-}Pr)$ | Me | H | O |
| C-6228 | Me | $CH_2CH_2$ | H | $CH_2CF_3$ | $CH_2OC(=O)O(i\text{-}Pr)$ | Me | H | O |
| C-6229 | H | single bond | Me | $CH_2CF_3$ | $CH_2N(Me)C(=O)OMe$ | Cl | H | O |
| C-6230 | Me | single bond | H | $CH_2CF_3$ | $CH_2N(Me)C(=O)OMe$ | Cl | H | O |
| C-6231 | Me(R) | single bond | H | $CH_2CF_3$ | $CH_2N(Me)C(=O)OMe$ | Cl | H | O |
| C-6232 | Me(S) | single bond | H | $CH_2CF_3$ | $CH_2N(Me)C(=O)OMe$ | Cl | H | O |
| C-6233 | H | $CH_2$ | Me | $CH_2CF_3$ | $CH_2N(Me)C(=O)OMe$ | Cl | H | O |
| C-6234 | Me | $CH_2$ | H | $CH_2CF_3$ | $CH_2N(Me)C(=O)OMe$ | Cl | H | O |
| C-6235 | H | CH(Me) | H | $CH_2CF_3$ | $CH_2N(Me)C(=O)OMe$ | Cl | H | O |
| C-6236 | H | $CH_2CH_2$ | Me | $CH_2CF_3$ | $CH_2N(Me)C(=O)OMe$ | Cl | H | O |
| C-6237 | Me | $CH_2CH_2$ | H | $CH_2CF_3$ | $CH_2N(Me)C(=O)OMe$ | Cl | H | O |
| C-6238 | H | single bond | Me | $CH_2CF_3$ | $CH_2N(Me)C(=O)OMe$ | Me | H | O |
| C-6239 | Me | single bond | H | $CH_2CF_3$ | $CH_2N(Me)C(=O)OMe$ | Me | H | O |
| C-6240 | Me(R) | single bond | H | $CH_2CF_3$ | $CH_2N(Me)C(=O)OMe$ | Me | H | O |
| C-6241 | Me(S) | single bond | H | $CH_2CF_3$ | $CH_2N(Me)C(=O)OMe$ | Me | H | O |
| C-6242 | H | $CH_2$ | Me | $CH_2CF_3$ | $CH_2N(Me)C(=O)OMe$ | Me | H | O |
| C-6243 | Me | $CH_2$ | H | $CH_2CF_3$ | $CH_2N(Me)C(=O)OMe$ | Me | H | O |
| C-6244 | H | CH(Me) | H | $CH_2CF_3$ | $CH_2N(Me)C(=O)OMe$ | Me | H | O |
| C-6245 | H | $CH_2CH_2$ | Me | $CH_2CF_3$ | $CH_2N(Me)C(=O)OMe$ | Me | H | O |
| C-6246 | Me | $CH_2CH_2$ | H | $CH_2CF_3$ | $CH_2N(Me)C(=O)OMe$ | Me | H | O |
| C-6247 | H | single bond | Me | $CH_2CF_3$ | $C(=O)OCH_2CH=CH_2$ | Cl | Me | O |
| C-6248 | Me | single bond | H | $CH_2CF_3$ | $C(=O)OCH_2CH=CH_2$ | Cl | Me | O |
| C-6249 | Me(R) | single bond | H | $CH_2CF_3$ | $C(=O)OCH_2CH=CH_2$ | Cl | Me | O |
| C-6250 | Me(S) | single bond | H | $CH_2CF_3$ | $C(=O)OCH_2CH=CH_2$ | Cl | Me | O |
| C-6251 | H | $CH_2$ | Me | $CH_2CF_3$ | $C(=O)OCH_2CH=CH_2$ | Cl | Me | O |
| C-6252 | Me | $CH_2$ | H | $CH_2CF_3$ | $C(=O)OCH_2CH=CH_2$ | Cl | Me | O |
| C-6253 | H | CH(Me) | H | $CH_2CF_3$ | $C(=O)OCH_2CH=CH_2$ | Cl | Me | O |
| C-6254 | H | $CH_2CH_2$ | Me | $CH_2CF_3$ | $C(=O)OCH_2CH=CH_2$ | Cl | Me | O |

TABLE 370

| Compound Number | Y | W | Z | $R^1$ | $R^2$ | $R^3$ | $R^{10}$ | A |
|---|---|---|---|---|---|---|---|---|
| C-6255 | Me | $CH_2CH_2$ | H | $CH_2CF_3$ | $C(=O)OCH_2CH=CH_2$ | Cl | Me | O |
| C-6256 | H | single bond | Me | $CH_2CF_3$ | $C(=O)OCH_2CH=CH_2$ | Me | Me | O |
| C-6257 | Me | single bond | H | $CH_2CF_3$ | $C(=O)OCH_2CH=CH_2$ | Me | Me | O |
| C-6258 | Me(R) | single bond | H | $CH_2CF_3$ | $C(=O)OCH_2CH=CH_2$ | Me | Me | O |
| C-6259 | Me(S) | single bond | H | $CH_2CF_3$ | $C(=O)OCH_2CH=CH_2$ | Me | Me | O |
| C-6260 | H | $CH_2$ | Me | $CH_2CF_3$ | $C(=O)OCH_2CH=CH_2$ | Me | Me | O |
| C-6261 | Me | $CH_2$ | H | $CH_2CF_3$ | $C(=O)OCH_2CH=CH_2$ | Me | Me | O |
| C-6262 | H | CH(Me) | H | $CH_2CF_3$ | $C(=O)OCH_2CH=CH_2$ | Me | Me | O |
| C-6263 | H | $CH_2CH_2$ | Me | $CH_2CF_3$ | $C(=O)OCH_2CH=CH_2$ | Me | Me | O |
| C-6264 | Me | $CH_2CH_2$ | H | $CH_2CF_3$ | $C(=O)OCH_2CH=CH_2$ | Me | Me | O |

TABLE 370-continued

| Compound Number | Y | W | Z | $R^1$ | $R^2$ | $R^3$ | $R^{10}$ | A |
|---|---|---|---|---|---|---|---|---|
| C-6265 | H | single bond | Me | $CH_2CF_3$ | $C(=O)OCH_2CCl_3$ | Cl | Me | O |
| C-6266 | Me | single bond | H | $CH_2CF_3$ | $C(=O)OCH_2CCl_3$ | Cl | Me | O |
| C-6267 | Me(R) | single bond | H | $CH_2CF_3$ | $C(=O)OCH_2CCl_3$ | Cl | Me | O |
| C-6268 | Me(S) | single bond | H | $CH_2CF_3$ | $C(=O)OCH_2CCl_3$ | Cl | Me | O |
| C-6269 | H | $CH_2$ | Me | $CH_2CF_3$ | $C(=O)OCH_2CCl_3$ | Cl | Me | O |
| C-6270 | Me | $CH_2$ | H | $CH_2CF_3$ | $C(=O)OCH_2CCl_3$ | Cl | Me | O |
| C-6271 | H | CH(Me) | H | $CH_2CF_3$ | $C(=O)OCH_2CCl_3$ | Cl | Me | O |
| C-6272 | H | $CH_2CH_2$ | Me | $CH_2CF_3$ | $C(=O)OCH_2CCl_3$ | Cl | Me | O |
| C-6273 | Me | $CH_2CH_2$ | H | $CH_2CF_3$ | $C(=O)OCH_2CCl_3$ | Cl | Me | O |
| C-6274 | H | single bond | Me | $CH_2CF_3$ | $C(=O)OCH_2CCl_3$ | Me | Me | O |
| C-6275 | Me | single bond | H | $CH_2CF_3$ | $C(=O)OCH_2CCl_3$ | Me | Me | O |
| C-6276 | Me(R) | single bond | H | $CH_2CF_3$ | $C(=O)OCH_2CCl_3$ | Me | Me | O |
| C-6277 | Me(S) | single bond | H | $CH_2CF_3$ | $C(=O)OCH_2CCl_3$ | Me | Me | O |
| C-6278 | H | $CH_2$ | Me | $CH_2CF_3$ | $C(=O)OCH_2CCl_3$ | Me | Me | O |
| C-6279 | Me | $CH_2$ | H | $CH_2CF_3$ | $C(=O)OCH_2CCl_3$ | Me | Me | O |
| C-6280 | H | CH(Me) | H | $CH_2CF_3$ | $C(=O)OCH_2CCl_3$ | Me | Me | O |
| C-6281 | H | $CH_2CH_2$ | Me | $CH_2CF_3$ | $C(=O)OCH_2CCl_3$ | Me | Me | O |
| C-6282 | Me | $CH_2CH_2$ | H | $CH_2CF_3$ | $C(=O)OCH_2CCl_3$ | Me | Me | O |
| C-6283 | H | single bond | Me | $CH_2CF_3$ | $C(=O)N(Me)_2$ | Cl | Me | O |
| C-6284 | Me | single bond | H | $CH_2CF_3$ | $C(=O)N(Me)_2$ | Cl | Me | O |
| C-6285 | Me(R) | single bond | H | $CH_2CF_3$ | $C(=O)N(Me)_2$ | Cl | Me | O |
| C-6286 | Me(S) | single bond | H | $CH_2CF_3$ | $C(=O)N(Me)_2$ | Cl | Me | O |
| C-6287 | H | $CH_2$ | Me | $CH_2CF_3$ | $C(=O)N(Me)_2$ | Cl | Me | O |
| C-6288 | Me | $CH_2$ | H | $CH_2CF_3$ | $C(=O)N(Me)_2$ | Cl | Me | O |
| C-6289 | H | CH(Me) | H | $CH_2CF_3$ | $C(=O)N(Me)_2$ | Cl | Me | O |
| C-6290 | H | $CH_2CH_2$ | Me | $CH_2CF_3$ | $C(=O)N(Me)_2$ | Cl | Me | O |
| C-6291 | Me | $CH_2CH_2$ | H | $CH_2CF_3$ | $C(=O)N(Me)_2$ | Cl | Me | O |
| C-6292 | H | single bond | Me | $CH_2CF_3$ | $C(=O)N(Me)_2$ | Me | Me | O |
| C-6293 | Me | single bond | H | $CH_2CF_3$ | $C(=O)N(Me)_2$ | Me | Me | O |
| C-6294 | Me(R) | single bond | H | $CH_2CF_3$ | $C(=O)N(Me)_2$ | Me | Me | O |
| C-6295 | Me(S) | single bond | H | $CH_2CF_3$ | $C(=O)N(Me)_2$ | Me | Me | O |
| C-6296 | H | $CH_2$ | Me | $CH_2CF_3$ | $C(=O)N(Me)_2$ | Me | Me | O |
| C-6297 | Me | $CH_2$ | H | $CH_2CF_3$ | $C(=O)N(Me)_2$ | Me | Me | O |
| C-6298 | H | CH(Me) | H | $CH_2CF_3$ | $C(=O)N(Me)_2$ | Me | Me | O |

TABLE 371

| Compound Number | Y | W | Z | $R^1$ | $R^2$ | $R^3$ | $R^{10}$ | A |
|---|---|---|---|---|---|---|---|---|
| C-6299 | H | $CH_2CH_2$ | Me | $CH_2CF_3$ | $C(=O)N(Me)_2$ | Me | Me | O |
| C-6300 | Me | $CH_2CH_2$ | H | $CH_2CF_3$ | $C(=O)N(Me)_2$ | Me | Me | O |
| C-6301 | H | single bond | Me | $CH_2CF_3$ | $CH_2OC(=O)Me$ | Cl | Me | O |
| C-6302 | Me | single bond | H | $CH_2CF_3$ | $CH_2OC(=O)Me$ | Cl | Me | O |
| C-6303 | Me(R) | single bond | H | $CH_2CF_3$ | $CH_2OC(=O)Me$ | Cl | Me | O |
| C-6304 | Me(S) | single bond | H | $CH_2CF_3$ | $CH_2OC(=O)Me$ | Cl | Me | O |
| C-6305 | H | $CH_2$ | Me | $CH_2CF_3$ | $CH_2OC(=O)Me$ | Cl | Me | O |
| C-6306 | Me | $CH_2$ | H | $CH_2CF_3$ | $CH_2OC(=O)Me$ | Cl | Me | O |
| C-6307 | H | CH(Me) | H | $CH_2CF_3$ | $CH_2OC(=O)Me$ | Cl | Me | O |
| C-6308 | H | $CH_2CH_2$ | Me | $CH_2CF_3$ | $CH_2OC(=O)Me$ | Cl | Me | O |
| C-6309 | Me | $CH_2CH_2$ | H | $CH_2CF_3$ | $CH_2OC(=O)Me$ | Cl | Me | O |
| C-6310 | H | single bond | Me | $CH_2CF_3$ | $CH_2OC(=O)Me$ | Me | Me | O |
| C-6311 | Me | single bond | H | $CH_2CF_3$ | $CH_2OC(=O)Me$ | Me | Me | O |
| C-6312 | Me(R) | single bond | H | $CH_2CF_3$ | $CH_2OC(=O)Me$ | Me | Me | O |
| C-6313 | Me(S) | single bond | H | $CH_2CF_3$ | $CH_2OC(=O)Me$ | Me | Me | O |
| C-6314 | H | $CH_2$ | Me | $CH_2CF_3$ | $CH_2OC(=O)Me$ | Me | Me | O |
| C-6315 | Me | $CH_2$ | H | $CH_2CF_3$ | $CH_2OC(=O)Me$ | Me | Me | O |
| C-6316 | H | CH(Me) | H | $CH_2CF_3$ | $CH_2OC(=O)Me$ | Me | Me | O |
| C-6317 | H | $CH_2CH_2$ | Me | $CH_2CF_3$ | $CH_2OC(=O)Me$ | Me | Me | O |
| C-6318 | Me | $CH_2CH_2$ | H | $CH_2CF_3$ | $CH_2OC(=O)Me$ | Me | Me | O |
| C-6319 | H | single bond | Me | $CH_2CF_3$ | $CH_2OC(=O)(i-Pr)$ | Cl | Me | O |
| C-6320 | Me | single bond | H | $CH_2CF_3$ | $CH_2OC(=O)(i-Pr)$ | Cl | Me | O |
| C-6321 | Me(R) | single bond | H | $CH_2CF_3$ | $CH_2OC(=O)(i-Pr)$ | Cl | Me | O |
| C-6322 | Me(S) | single bond | H | $CH_2CF_3$ | $CH_2OC(=O)(i-Pr)$ | Cl | Me | O |
| C-6323 | H | $CH_2$ | Me | $CH_2CF_3$ | $CH_2OC(=O)(i-Pr)$ | Cl | Me | O |
| C-6324 | Me | $CH_2$ | H | $CH_2CF_3$ | $CH_2OC(=O)(i-Pr)$ | Cl | Me | O |
| C-6325 | H | CH(Me) | H | $CH_2CF_3$ | $CH_2OC(=O)(i-Pr)$ | Cl | Me | O |
| C-6326 | H | $CH_2CH_2$ | Me | $CH_2CF_3$ | $CH_2OC(=O)(i-Pr)$ | Cl | Me | O |
| C-6327 | Me | $CH_2CH_2$ | H | $CH_2CF_3$ | $CH_2OC(=O)(i-Pr)$ | Cl | Me | O |
| C-6328 | H | single bond | Me | $CH_2CF_3$ | $CH_2OC(=O)(i-Pr)$ | Me | Me | O |
| C-6329 | Me | single bond | H | $CH_2CF_3$ | $CH_2OC(=O)(i-Pr)$ | Me | Me | O |
| C-6330 | Me(R) | single bond | H | $CH_2CF_3$ | $CH_2OC(=O)(i-Pr)$ | Me | Me | O |
| C-6331 | Me(S) | single bond | H | $CH_2CF_3$ | $CH_2OC(=O)(i-Pr)$ | Me | Me | O |

TABLE 371-continued

| Compound Number | Y | W | Z | $R^1$ | $R^2$ | $R^3$ | $R^{10}$ | A |
|---|---|---|---|---|---|---|---|---|
| C-6332 | H | $CH_2$ | Me | $CH_2CF_3$ | $CH_2OC(=O)$(i-Pr) | Me | Me | O |
| C-6333 | Me | $CH_2$ | H | $CH_2CF_3$ | $CH_2OC(=O)$(i-Pr) | Me | Me | O |
| C-6334 | H | CH(Me) | H | $CH_2CF_3$ | $CH_2OC(=O)$(i-Pr) | Me | Me | O |
| C-6335 | H | $CH_2CH_2$ | Me | $CH_2CF_3$ | $CH_2OC(=O)$(i-Pr) | Me | Me | O |
| C-6336 | Me | $CH_2CH_2$ | H | $CH_2CF_3$ | $CH_2OC(=O)$(i-Pr) | Me | Me | O |
| C-6337 | H | single bond | Me | $CH_2CF_3$ | $CH_2OC(=O)$(t-Bu) | Cl | Me | O |
| C-6338 | Me | single bond | H | $CH_2CF_3$ | $CH_2OC(=O)$(t-Bu) | Cl | Me | O |
| C-6339 | Me(R) | single bond | H | $CH_2CF_3$ | $CH_2OC(=O)$(t-Bu) | Cl | Me | O |
| C-6340 | Me(S) | single bond | H | $CH_2CF_3$ | $CH_2OC(=O)$(t-Bu) | Cl | Me | O |
| C-6341 | H | $CH_2$ | Me | $CH_2CF_3$ | $CH_2OC(=O)$(t-Bu) | Cl | Me | O |
| C-6342 | Me | $CH_2$ | H | $CH_2CF_3$ | $CH_2OC(=O)$(t-Bu) | Cl | Me | O |

TABLE 372

| Compound Number | Y | W | Z | $R^1$ | $R^2$ | $R^3$ | $R^{10}$ | A |
|---|---|---|---|---|---|---|---|---|
| C-6343 | H | CH(Me) | H | $CH_2CF_3$ | $CH_2OC(=O)$(t-Bu) | Cl | Me | O |
| C-6344 | H | $CH_2CH_2$ | Me | $CH_2CF_3$ | $CH_2OC(=O)$(t-Bu) | Cl | Me | O |
| C-6345 | Me | $CH_2CH_2$ | H | $CH_2CF_3$ | $CH_2OC(=O)$(t-Bu) | Cl | Me | O |
| C-6346 | H | single bond | Me | $CH_2CF_3$ | $CH_2OC(=O)$(t-Bu) | Me | Me | O |
| C-6347 | Me | single bond | H | $CH_2CF_3$ | $CH_2OC(=O)$(t-Bu) | Me | Me | O |
| C-6348 | Me(R) | single bond | H | $CH_2CF_3$ | $CH_2OC(=O)$(t-Bu) | Me | Me | O |
| C-6349 | Me(S) | single bond | H | $CH_2CF_3$ | $CH_2OC(=O)$(t-Bu) | Me | Me | O |
| C-6350 | H | $CH_2$ | Me | $CH_2CF_3$ | $CH_2OC(=O)$(t-Bu) | Me | Me | O |
| C-6351 | Me | $CH_2$ | H | $CH_2CF_3$ | $CH_2OC(=O)$(t-Bu) | Me | Me | O |
| C-6352 | H | CH(Me) | H | $CH_2CF_3$ | $CH_2OC(=O)$(t-Bu) | Me | Me | O |
| C-6353 | H | $CH_2CH_2$ | Me | $CH_2CF_3$ | $CH_2OC(=O)$(t-Bu) | Me | Me | O |
| C-6354 | Me | $CH_2CH_2$ | H | $CH_2CF_3$ | $CH_2OC(=O)$(t-Bu) | Me | Me | O |
| C-6355 | H | single bond | Me | $CH_2CF_3$ | $CH_2OC(=O)OEt$ | Cl | Me | O |
| C-6356 | Me | single bond | H | $CH_2CF_3$ | $CH_2OC(=O)OEt$ | Cl | Me | O |
| C-6357 | Me(R) | single bond | H | $CH_2CF_3$ | $CH_2OC(=O)OEt$ | Cl | Me | O |
| C-6358 | Me(S) | single bond | H | $CH_2CF_3$ | $CH_2OC(=O)OEt$ | Cl | Me | O |
| C-6359 | H | $CH_2$ | Me | $CH_2CF_3$ | $CH_2OC(=O)OEt$ | Cl | Me | O |
| C-6360 | Me | $CH_2$ | H | $CH_2CF_3$ | $CH_2OC(=O)OEt$ | Cl | Me | O |
| C-6361 | H | CH(Me) | H | $CH_2CF_3$ | $CH_2OC(=O)OEt$ | Cl | Me | O |
| C-6362 | H | $CH_2CH_2$ | Me | $CH_2CF_3$ | $CH_2OC(=O)OEt$ | Cl | Me | O |
| C-6363 | Me | $CH_2CH_2$ | H | $CH_2CF_3$ | $CH_2OC(=O)OEt$ | Cl | Me | O |
| C-6364 | H | single bond | Me | $CH_2CF_3$ | $CH_2OC(=O)OEt$ | Me | Me | O |
| C-6365 | Me | single bond | H | $CH_2CF_3$ | $CH_2OC(=O)OEt$ | Me | Me | O |
| C-6366 | Me(R) | single bond | H | $CH_2CF_3$ | $CH_2OC(=O)OEt$ | Me | Me | O |
| C-6367 | Me(S) | single bond | H | $CH_2CF_3$ | $CH_2OC(=O)OEt$ | Me | Me | O |
| C-6368 | H | $CH_2$ | Me | $CH_2CF_3$ | $CH_2OC(=O)OEt$ | Me | Me | O |
| C-6369 | Me | $CH_2$ | H | $CH_2CF_3$ | $CH_2OC(=O)OEt$ | Me | Me | O |
| C-6370 | H | CH(Me) | H | $CH_2CF_3$ | $CH_2OC(=O)OEt$ | Me | Me | O |
| C-6371 | H | $CH_2CH_2$ | Me | $CH_2CF_3$ | $CH_2OC(=O)OEt$ | Me | Me | O |
| C-6372 | Me | $CH_2CH_2$ | H | $CH_2CF_3$ | $CH_2OC(=O)OEt$ | Me | Me | O |
| C-6373 | H | single bond | Me | $CH_2CF_3$ | $CH_2OC(=O)O$(i-Pr) | Cl | Me | O |
| C-6374 | Me | single bond | H | $CH_2CF_3$ | $CH_2OC(=O)O$(i-Pr) | Cl | Me | O |
| C-6375 | Me(R) | single bond | H | $CH_2CF_3$ | $CH_2OC(=O)O$(i-Pr) | Cl | Me | O |
| C-6376 | Me(S) | single bond | H | $CH_2CF_3$ | $CH_2OC(=O)O$(i-Pr) | Cl | Me | O |
| C-6377 | H | $CH_2$ | Me | $CH_2CF_3$ | $CH_2OC(=O)O$(i-Pr) | Cl | Me | O |
| C-6378 | Me | $CH_2$ | H | $CH_2CF_3$ | $CH_2OC(=O)O$(i-Pr) | Cl | Me | O |
| C-6379 | H | CH(Me) | H | $CH_2CF_3$ | $CH_2OC(=O)O$(i-Pr) | Cl | Me | O |
| C-6380 | H | $CH_2CH_2$ | Me | $CH_2CF_3$ | $CH_2OC(=O)O$(i-Pr) | Cl | Me | O |
| C-6381 | Me | $CH_2CH_2$ | H | $CH_2CF_3$ | $CH_2OC(=O)O$(i-Pr) | Cl | Me | O |
| C-6382 | H | single bond | Me | $CH_2CF_3$ | $CH_2OC(=O)O$(i-Pr) | Me | Me | O |
| C-6383 | Me | single bond | H | $CH_2CF_3$ | $CH_2OC(=O)O$(i-Pr) | Me | Me | O |
| C-6384 | Me(R) | single bond | H | $CH_2CF_3$ | $CH_2OC(=O)O$(i-Pr) | Me | Me | O |
| C-6385 | Me(S) | single bond | H | $CH_2CF_3$ | $CH_2OC(=O)O$(i-Pr) | Me | Me | O |
| C-6386 | H | $CH_2$ | Me | $CH_2CF_3$ | $CH_2OC(=O)O$(i-Pr) | Me | Me | O |

TABLE 373

| Compound Number | Y | W | Z | $R^1$ | $R^2$ | $R^3$ | $R^{10}$ | A |
|---|---|---|---|---|---|---|---|---|
| C-6387 | Me | $CH_2$ | H | $CH_2CF_3$ | $CH_2OC(=O)O$(i-Pr) | Me | Me | O |
| C-6388 | H | CH(Me) | H | $CH_2CF_3$ | $CH_2OC(=O)O$(i-Pr) | Me | Me | O |

TABLE 373-continued

| Compound Number | Y | W | Z | $R^1$ | $R^2$ | $R^3$ | $R^{10}$ | A |
|---|---|---|---|---|---|---|---|---|
| C-6389 | H | $CH_2CH_2$ | Me | $CH_2CF_3$ | $CH_2OC(=O)O(i-Pr)$ | Me | Me | O |
| C-6390 | Me | $CH_2CH_2$ | H | $CH_2CF_3$ | $CH_2OC(=O)O(i-Pr)$ | Me | Me | O |
| C-6391 | H | single bond | Me | $CH_2CF_3$ | $CH_2N(Me)C(=O)OMe$ | Cl | Me | O |
| C-6392 | Me | single bond | H | $CH_2CF_3$ | $CH_2N(Me)C(=O)OMe$ | Cl | Me | O |
| C-6393 | Me(R) | single bond | H | $CH_2CF_3$ | $CH_2N(Me)C(=O)OMe$ | Cl | Me | O |
| C-6394 | Me(S) | single bond | H | $CH_2CF_3$ | $CH_2N(Me)C(=O)OMe$ | Cl | Me | O |
| C-6395 | H | $CH_2$ | Me | $CH_2CF_3$ | $CH_2N(Me)C(=O)OMe$ | Cl | Me | O |
| C-6396 | Me | $CH_2$ | H | $CH_2CF_3$ | $CH_2N(Me)C(=O)OMe$ | Cl | Me | O |
| C-6397 | H | CH(Me) | H | $CH_2CF_3$ | $CH_2N(Me)C(=O)OMe$ | Cl | Me | O |
| C-6398 | H | $CH_2CH_2$ | Me | $CH_2CF_3$ | $CH_2N(Me)C(=O)OMe$ | Cl | Me | O |
| C-6399 | Me | $CH_2CH_2$ | H | $CH_2CF_3$ | $CH_2N(Me)C(=O)OMe$ | Cl | Me | O |
| C-6400 | H | single bond | Me | $CH_2CF_3$ | $CH_2N(Me)C(=O)OMe$ | Me | Me | O |
| C-6401 | Me | single bond | H | $CH_2CF_3$ | $CH_2N(Me)C(=O)OMe$ | Me | Me | O |
| C-6402 | Me(R) | single bond | H | $CH_2CF_3$ | $CH_2N(Me)C(=O)OMe$ | Me | Me | O |
| C-6403 | Me(S) | single bond | H | $CH_2CF_3$ | $CH_2N(Me)C(=O)OMe$ | Me | Me | O |
| C-6404 | H | $CH_2$ | Me | $CH_2CF_3$ | $CH_2N(Me)C(=O)OMe$ | Me | Me | O |
| C-6405 | Me | $CH_2$ | H | $CH_2CF_3$ | $CH_2N(Me)C(=O)OMe$ | Me | Me | O |
| C-6406 | H | CH(Me) | H | $CH_2CF_3$ | $CH_2N(Me)C(=O)OMe$ | Me | Me | O |
| C-6407 | H | $CH_2CH_2$ | Me | $CH_2CF_3$ | $CH_2N(Me)C(=O)OMe$ | Me | Me | O |
| C-6408 | Me | $CH_2CH_2$ | H | $CH_2CF_3$ | $CH_2N(Me)C(=O)OMe$ | Me | Me | O |
| C-6409 | H | single bond | Me | $CH_2CF_3$ | $C(=O)OCH_2CH=CH_2$ | Cl | $CH_2OMe$ | O |
| C-6410 | Me | single bond | H | $CH_2CF_3$ | $C(=O)OCH_2CH=CH_2$ | Cl | $CH_2OMe$ | O |
| C-6411 | Me(R) | single bond | H | $CH_2CF_3$ | $C(=O)OCH_2CH=CH_2$ | Cl | $CH_2OMe$ | O |
| C-6412 | Me(S) | single bond | H | $CH_2CF_3$ | $C(=O)OCH_2CH=CH_2$ | Cl | $CH_2OMe$ | O |
| C-6413 | H | $CH_2$ | Me | $CH_2CF_3$ | $C(=O)OCH_2CH=CH_2$ | Cl | $CH_2OMe$ | O |
| C-6414 | Me | $CH_2$ | H | $CH_2CF_3$ | $C(=O)OCH_2CH=CH_2$ | Cl | $CH_2OMe$ | O |
| C-6415 | H | CH(Me) | H | $CH_2CF_3$ | $C(=O)OCH_2CH=CH_2$ | Cl | $CH_2OMe$ | O |
| C-6416 | H | $CH_2CH_2$ | Me | $CH_2CF_3$ | $C(=O)OCH_2CH=CH_2$ | Cl | $CH_2OMe$ | O |
| C-6417 | Me | $CH_2CH_2$ | H | $CH_2CF_3$ | $C(=O)OCH_2CH=CH_2$ | Cl | $CH_2OMe$ | O |
| C-6418 | H | single bond | Me | $CH_2CF_3$ | $C(=O)OCH_2CH=CH_2$ | Me | $CH_2OMe$ | O |
| C-6419 | Me | single bond | H | $CH_2CF_3$ | $C(=O)OCH_2CH=CH_2$ | Me | $CH_2OMe$ | O |
| C-6420 | Me(R) | single bond | H | $CH_2CF_3$ | $C(=O)OCH_2CH=CH_2$ | Me | $CH_2OMe$ | O |
| C-6421 | Me(S) | single bond | H | $CH_2CF_3$ | $C(=O)OCH_2CH=CH_2$ | Me | $CH_2OMe$ | O |
| C-6422 | H | $CH_2$ | Me | $CH_2CF_3$ | $C(=O)OCH_2CH=CH_2$ | Me | $CH_2OMe$ | O |
| C-6423 | Me | $CH_2$ | H | $CH_2CF_3$ | $C(=O)OCH_2CH=CH_2$ | Me | $CH_2OMe$ | O |
| C-6424 | H | CH(Me) | H | $CH_2CF_3$ | $C(=O)OCH_2CH=CH_2$ | Me | $CH_2OMe$ | O |
| C-6425 | H | $CH_2CH_2$ | Me | $CH_2CF_3$ | $C(=O)OCH_2CH=CH_2$ | Me | $CH_2OMe$ | O |
| C-6426 | Me | $CH_2CH_2$ | H | $CH_2CF_3$ | $C(=O)OCH_2CH=CH_2$ | Me | $CH_2OMe$ | O |
| C-6427 | H | single bond | Me | $CH_2CF_3$ | $C(=O)OCH_2CCl_3$ | Cl | $CH_2OMe$ | O |
| C-6428 | Me | single bond | H | $CH_2CF_3$ | $C(=O)OCH_2CCl_3$ | Cl | $CH_2OMe$ | O |
| C-6429 | Me(R) | single bond | H | $CH_2CF_3$ | $C(=O)OCH_2CCl_3$ | Cl | $CH_2OMe$ | O |
| C-6430 | Me(S) | single bond | H | $CH_2CF_3$ | $C(=O)OCH_2CCl_3$ | Cl | $CH_2OMe$ | O |

TABLE 374

| Compound Number | Y | W | Z | $R^1$ | $R^2$ | $R^3$ | $R^{10}$ | A |
|---|---|---|---|---|---|---|---|---|
| C-6431 | H | $CH_2$ | Me | $CH_2CF_3$ | $C(=O)OCH_2CCl_3$ | Cl | $CH_2OMe$ | O |
| C-6432 | Me | $CH_2$ | H | $CH_2CF_3$ | $C(=O)OCH_2CCl_3$ | Cl | $CH_2OMe$ | O |
| C-6433 | H | CH(Me) | H | $CH_2CF_3$ | $C(=O)OCH_2CCl_3$ | Cl | $CH_2OMe$ | O |
| C-6434 | H | $CH_2CH_2$ | Me | $CH_2CF_3$ | $C(=O)OCH_2CCl_3$ | Cl | $CH_2OMe$ | O |
| C-6435 | Me | $CH_2CH_2$ | H | $CH_2CF_3$ | $C(=O)OCH_2CCl_3$ | Cl | $CH_2OMe$ | O |
| C-6436 | H | single bond | Me | $CH_2CF_3$ | $C(=O)OCH_2CCl_3$ | Me | $CH_2OMe$ | O |
| C-6437 | Me | single bond | H | $CH_2CF_3$ | $C(=O)OCH_2CCl_3$ | Me | $CH_2OMe$ | O |
| C-6438 | Me(R) | single bond | H | $CH_2CF_3$ | $C(=O)OCH_2CCl_3$ | Me | $CH_2OMe$ | O |
| C-6439 | Me(S) | single bond | H | $CH_2CF_3$ | $C(=O)OCH_2CCl_3$ | Me | $CH_2OMe$ | O |
| C-6440 | H | $CH_2$ | Me | $CH_2CF_3$ | $C(=O)OCH_2CCl_3$ | Me | $CH_2OMe$ | O |
| C-6441 | Me | $CH_2$ | H | $CH_2CF_3$ | $C(=O)OCH_2CCl_3$ | Me | $CH_2OMe$ | O |
| C-6442 | H | CH(Me) | H | $CH_2CF_3$ | $C(=O)OCH_2CCl_3$ | Me | $CH_2OMe$ | O |
| C-6443 | H | $CH_2CH_2$ | Me | $CH_2CF_3$ | $C(=O)OCH_2CCl_3$ | Me | $CH_2OMe$ | O |
| C-6444 | Me | $CH_2CH_2$ | H | $CH_2CF_3$ | $C(=O)OCH_2CCl_3$ | Me | $CH_2OMe$ | O |
| C-6445 | H | single bond | Me | $CH_2CF_3$ | $C(=O)N(Me)_2$ | Cl | $CH_2OMe$ | O |
| C-6446 | Me | single bond | H | $CH_2CF_3$ | $C(=O)N(Me)_2$ | Cl | $CH_2OMe$ | O |
| C-6447 | Me(R) | single bond | H | $CH_2CF_3$ | $C(=O)N(Me)_2$ | Cl | $CH_2OMe$ | O |
| C-6448 | Me(S) | single bond | H | $CH_2CF_3$ | $C(=O)N(Me)_2$ | Cl | $CH_2OMe$ | O |
| C-6449 | H | $CH_2$ | Me | $CH_2CF_3$ | $C(=O)N(Me)_2$ | Cl | $CH_2OMe$ | O |
| C-6450 | Me | $CH_2$ | H | $CH_2CF_3$ | $C(=O)N(Me)_2$ | Cl | $CH_2OMe$ | O |
| C-6451 | H | CH(Me) | H | $CH_2CF_3$ | $C(=O)N(Me)_2$ | Cl | $CH_2OMe$ | O |
| C-6452 | H | $CH_2CH_2$ | Me | $CH_2CF_3$ | $C(=O)N(Me)_2$ | Cl | $CH_2OMe$ | O |
| C-6453 | Me | $CH_2CH_2$ | H | $CH_2CF_3$ | $C(=O)N(Me)_2$ | Cl | $CH_2OMe$ | O |
| C-6454 | H | single bond | Me | $CH_2CF_3$ | $C(=O)N(Me)_2$ | Me | $CH_2OMe$ | O |

TABLE 374-continued

| Compound Number | Y | W | Z | $R^1$ | $R^2$ | $R^3$ | $R^{10}$ | A |
|---|---|---|---|---|---|---|---|---|
| C-6455 | Me | single bond | H | $CH_2CF_3$ | C(=O)N(Me)$_2$ | Me | $CH_2OMe$ | O |
| C-6456 | Me(R) | single bond | H | $CH_2CF_3$ | C(=O)N(Me)$_2$ | Me | $CH_2OMe$ | O |
| C-6457 | Me(S) | single bond | H | $CH_2CF_3$ | C(=O)N(Me)$_2$ | Me | $CH_2OMe$ | O |
| C-6458 | H | $CH_2$ | Me | $CH_2CF_3$ | C(=O)N(Me)$_2$ | Me | $CH_2OMe$ | O |
| C-6459 | Me | $CH_2$ | H | $CH_2CF_3$ | C(=O)N(Me)$_2$ | Me | $CH_2OMe$ | O |
| C-6460 | H | CH(Me) | H | $CH_2CF_3$ | C(=O)N(Me)$_2$ | Me | $CH_2OMe$ | O |
| C-6461 | H | $CH_2CH_2$ | Me | $CH_2CF_3$ | C(=O)N(Me)$_2$ | Me | $CH_2OMe$ | O |
| C-6462 | Me | $CH_2CH_2$ | H | $CH_2CF_3$ | C(=O)N(Me)$_2$ | Me | $CH_2OMe$ | O |
| C-6463 | H | single bond | Me | $CH_2CF_3$ | $CH_2$OC(=O)Me | Cl | $CH_2OMe$ | O |
| C-6464 | Me | single bond | H | $CH_2CF_3$ | $CH_2$OC(=O)Me | Cl | $CH_2OMe$ | O |
| C-6465 | Me(R) | single bond | H | $CH_2CF_3$ | $CH_2$OC(=O)Me | Cl | $CH_2OMe$ | O |
| C-6466 | Me(S) | single bond | H | $CH_2CF_3$ | $CH_2$OC(=O)Me | Cl | $CH_2OMe$ | O |
| C-6467 | H | $CH_2$ | Me | $CH_2CF_3$ | $CH_2$OC(=O)Me | Cl | $CH_2OMe$ | O |
| C-6468 | Me | $CH_2$ | H | $CH_2CF_3$ | $CH_2$OC(=O)Me | Cl | $CH_2OMe$ | O |
| C-6469 | H | CH(Me) | H | $CH_2CF_3$ | $CH_2$OC(=O)Me | Cl | $CH_2OMe$ | O |
| C-6470 | H | $CH_2CH_2$ | Me | $CH_2CF_3$ | $CH_2$OC(=O)Me | Cl | $CH_2OMe$ | O |
| C-6471 | Me | $CH_2CH_2$ | H | $CH_2CF_3$ | $CH_2$OC(=O)Me | Cl | $CH_2OMe$ | O |
| C-6472 | H | single bond | Me | $CH_2CF_3$ | $CH_2$OC(=O)Me | Me | $CH_2OMe$ | O |
| C-6473 | Me | single bond | H | $CH_2CF_3$ | $CH_2$OC(=O)Me | Me | $CH_2OMe$ | O |
| C-6474 | Me(R) | single bond | H | $CH_2CF_3$ | $CH_2$OC(=O)Me | Me | $CH_2OMe$ | O |

TABLE 375

| Compound Number | Y | W | Z | $R^1$ | $R^2$ | $R^3$ | $R^{10}$ | A |
|---|---|---|---|---|---|---|---|---|
| C-6475 | Me(S) | single bond | H | $CH_2CF_3$ | $CH_2$OC(=O)Me | Me | $CH_2OMe$ | O |
| C-6476 | H | $CH_2$ | Me | $CH_2CF_3$ | $CH_2$OC(=O)Me | Me | $CH_2OMe$ | O |
| C-6477 | Me | $CH_2$ | H | $CH_2CF_3$ | $CH_2$OC(=O)Me | Me | $CH_2OMe$ | O |
| C-6478 | H | CH(Me) | H | $CH_2CF_3$ | $CH_2$OC(=O)Me | Me | $CH_2OMe$ | O |
| C-6479 | H | $CH_2CH_2$ | Me | $CH_2CF_3$ | $CH_2$OC(=O)Me | Me | $CH_2OMe$ | O |
| C-6480 | Me | $CH_2CH_2$ | H | $CH_2CF_3$ | $CH_2$OC(=O)Me | Me | $CH_2OMe$ | O |
| C-6481 | H | single bond | Me | $CH_2CF_3$ | $CH_2$OC(=O)(i-Pr) | Cl | $CH_2OMe$ | O |
| C-6482 | Me | single bond | H | $CH_2CF_3$ | $CH_2$OC(=O)(i-Pr) | Cl | $CH_2OMe$ | O |
| C-6483 | Me(R) | single bond | H | $CH_2CF_3$ | $CH_2$OC(=O)(i-Pr) | Cl | $CH_2OMe$ | O |
| C-6484 | Me(S) | single bond | H | $CH_2CF_3$ | $CH_2$OC(=O)(i-Pr) | Cl | $CH_2OMe$ | O |
| C-6485 | H | $CH_2$ | Me | $CH_2CF_3$ | $CH_2$OC(=O)(i-Pr) | Cl | $CH_2OMe$ | O |
| C-6486 | Me | $CH_2$ | H | $CH_2CF_3$ | $CH_2$OC(=O)(i-Pr) | Cl | $CH_2OMe$ | O |
| C-6487 | H | CH(Me) | H | $CH_2CF_3$ | $CH_2$OC(=O)(i-Pr) | Cl | $CH_2OMe$ | O |
| C-6488 | H | $CH_2CH_2$ | Me | $CH_2CF_3$ | $CH_2$OC(=O)(i-Pr) | Cl | $CH_2OMe$ | O |
| C-6489 | Me | $CH_2CH_2$ | H | $CH_2CF_3$ | $CH_2$OC(=O)(i-Pr) | Cl | $CH_2OMe$ | O |
| C-6490 | H | single bond | Me | $CH_2CF_3$ | $CH_2$OC(=O)(i-Pr) | Me | $CH_2OMe$ | O |
| C-6491 | Me | single bond | H | $CH_2CF_3$ | $CH_2$OC(=O)(i-Pr) | Me | $CH_2OMe$ | O |
| C-6492 | Me(R) | single bond | H | $CH_2CF_3$ | $CH_2$OC(=O)(i-Pr) | Me | $CH_2OMe$ | O |
| C-6493 | Me(S) | single bond | H | $CH_2CF_3$ | $CH_2$OC(=O)(i-Pr) | Me | $CH_2OMe$ | O |
| C-6494 | H | $CH_2$ | Me | $CH_2CF_3$ | $CH_2$OC(=O)(i-Pr) | Me | $CH_2OMe$ | O |
| C-6495 | Me | $CH_2$ | H | $CH_2CF_3$ | $CH_2$OC(=O)(i-Pr) | Me | $CH_2OMe$ | O |
| C-6496 | H | CH(Me) | H | $CH_2CF_3$ | $CH_2$OC(=O)(i-Pr) | Me | $CH_2OMe$ | O |
| C-6497 | H | $CH_2CH_2$ | Me | $CH_2CF_3$ | $CH_2$OC(=O)(i-Pr) | Me | $CH_2OMe$ | O |
| C-6498 | Me | $CH_2CH_2$ | H | $CH_2CF_3$ | $CH_2$OC(=O)(i-Pr) | Me | $CH_2OMe$ | O |
| C-6499 | H | single bond | Me | $CH_2CF_3$ | $CH_2$OC(=O)(t-Bu) | Cl | $CH_2OMe$ | O |
| C-6500 | Me | single bond | H | $CH_2CF_3$ | $CH_2$OC(=O)(t-Bu) | Cl | $CH_2OMe$ | O |
| C-6501 | Me(R) | single bond | H | $CH_2CF_3$ | $CH_2$OC(=O)(t-Bu) | Cl | $CH_2OMe$ | O |
| C-6502 | Me(S) | single bond | H | $CH_2CF_3$ | $CH_2$OC(=O)(t-Bu) | Cl | $CH_2OMe$ | O |
| C-6503 | H | $CH_2$ | Me | $CH_2CF_3$ | $CH_2$OC(=O)(t-Bu) | Cl | $CH_2OMe$ | O |
| C-6504 | Me | $CH_2$ | H | $CH_2CF_3$ | $CH_2$OC(=O)(t-Bu) | Cl | $CH_2OMe$ | O |
| C-6505 | H | CH(Me) | H | $CH_2CF_3$ | $CH_2$OC(=O)(t-Bu) | Cl | $CH_2OMe$ | O |
| C-6506 | H | $CH_2CH_2$ | Me | $CH_2CF_3$ | $CH_2$OC(=O)(t-Bu) | Cl | $CH_2OMe$ | O |
| C-6507 | Me | $CH_2CH_2$ | H | $CH_2CF_3$ | $CH_2$OC(=O)(t-Bu) | Cl | $CH_2OMe$ | O |
| C-6508 | H | single bond | Me | $CH_2CF_3$ | $CH_2$OC(=O)(t-Bu) | Me | $CH_2OMe$ | O |
| C-6509 | Me | single bond | H | $CH_2CF_3$ | $CH_2$OC(=O)(t-Bu) | Me | $CH_2OMe$ | O |
| C-6510 | Me(R) | single bond | H | $CH_2CF_3$ | $CH_2$OC(=O)(t-Bu) | Me | $CH_2OMe$ | O |
| C-6511 | Me(S) | single bond | H | $CH_2CF_3$ | $CH_2$OC(=O)(t-Bu) | Me | $CH_2OMe$ | O |
| C-6512 | H | $CH_2$ | Me | $CH_2CF_3$ | $CH_2$OC(=O)(t-Bu) | Me | $CH_2OMe$ | O |
| C-6513 | Me | $CH_2$ | H | $CH_2CF_3$ | $CH_2$OC(=O)(t-Bu) | Me | $CH_2OMe$ | O |
| C-6514 | H | CH(Me) | H | $CH_2CF_3$ | $CH_2$OC(=O)(t-Bu) | Me | $CH_2OMe$ | O |
| C-6515 | H | $CH_2CH_2$ | Me | $CH_2CF_3$ | $CH_2$OC(=O)(t-Bu) | Me | $CH_2OMe$ | O |
| C-6516 | Me | $CH_2CH_2$ | H | $CH_2CF_3$ | $CH_2$OC(=O)(t-Bu) | Me | $CH_2OMe$ | O |
| C-6517 | H | single bond | Me | $CH_2CF_3$ | $CH_2$OC(=O)OEt | Cl | $CH_2OMe$ | O |
| C-6518 | Me | single bond | H | $CH_2CF_3$ | $CH_2$OC(=O)OEt | Cl | $CH_2OMe$ | O |

TABLE 376

| Compound Number | Y | W | Z | $R^1$ | $R^2$ | $R^3$ | $R^{10}$ | A |
|---|---|---|---|---|---|---|---|---|
| C-6519 | Me(R) | single bond | H | $CH_2CF_3$ | $CH_2OC(=O)OEt$ | Cl | $CH_2OMe$ | O |
| C-6520 | Me(S) | single bond | H | $CH_2CF_3$ | $CH_2OC(=O)OEt$ | Cl | $CH_2OMe$ | O |
| C-6521 | H | $CH_2$ | Me | $CH_2CF_3$ | $CH_2OC(=O)OEt$ | Cl | $CH_2OMe$ | O |
| C-6522 | Me | $CH_2$ | H | $CH_2CF_3$ | $CH_2OC(=O)OEt$ | Cl | $CH_2OMe$ | O |
| C-6523 | H | CH(Me) | H | $CH_2CF_3$ | $CH_2OC(=O)OEt$ | Cl | $CH_2OMe$ | O |
| C-6524 | H | $CH_2CH_2$ | Me | $CH_2CF_3$ | $CH_2OC(=O)OEt$ | Cl | $CH_2OMe$ | O |
| C-6525 | Me | $CH_2CH_2$ | H | $CH_2CF_3$ | $CH_2OC(=O)OEt$ | Cl | $CH_2OMe$ | O |
| C-6526 | H | single bond | Me | $CH_2CF_3$ | $CH_2OC(=O)OEt$ | Me | $CH_2OMe$ | O |
| C-6527 | Me | single bond | H | $CH_2CF_3$ | $CH_2OC(=O)OEt$ | Me | $CH_2OMe$ | O |
| C-6528 | Me(R) | single bond | H | $CH_2CF_3$ | $CH_2OC(=O)OEt$ | Me | $CH_2OMe$ | O |
| C-6529 | Me(S) | single bond | H | $CH_2CF_3$ | $CH_2OC(=O)OEt$ | Me | $CH_2OMe$ | O |
| C-6530 | H | $CH_2$ | Me | $CH_2CF_3$ | $CH_2OC(=O)OEt$ | Me | $CH_2OMe$ | O |
| C-6531 | Me | $CH_2$ | H | $CH_2CF_3$ | $CH_2OC(=O)OEt$ | Me | $CH_2OMe$ | O |
| C-6532 | H | CH(Me) | H | $CH_2CF_3$ | $CH_2OC(=O)OEt$ | Me | $CH_2OMe$ | O |
| C-6533 | H | $CH_2CH_2$ | Me | $CH_2CF_3$ | $CH_2OC(=O)OEt$ | Me | $CH_2OMe$ | O |
| C-6534 | Me | $CH_2CH_2$ | H | $CH_2CF_3$ | $CH_2OC(=O)OEt$ | Me | $CH_2OMe$ | O |
| C-6535 | H | single bond | Me | $CH_2CF_3$ | $CH_2OC(=O)O(i\text{-}Pr)$ | Cl | $CH_2OMe$ | O |
| C-6536 | Me | single bond | H | $CH_2CF_3$ | $CH_2OC(=O)O(i\text{-}Pr)$ | Cl | $CH_2OMe$ | O |
| C-6537 | Me(R) | single bond | H | $CH_2CF_3$ | $CH_2OC(=O)O(i\text{-}Pr)$ | Cl | $CH_2OMe$ | O |
| C-6538 | Me(S) | single bond | H | $CH_2CF_3$ | $CH_2OC(=O)O(i\text{-}Pr)$ | Cl | $CH_2OMe$ | O |
| C-6539 | H | $CH_2$ | Me | $CH_2CF_3$ | $CH_2OC(=O)O(i\text{-}Pr)$ | Cl | $CH_2OMe$ | O |
| C-6540 | Me | $CH_2$ | H | $CH_2CF_3$ | $CH_2OC(=O)O(i\text{-}Pr)$ | Cl | $CH_2OMe$ | O |
| C-6541 | H | CH(Me) | H | $CH_2CF_3$ | $CH_2OC(=O)O(i\text{-}Pr)$ | Cl | $CH_2OMe$ | O |
| C-6542 | H | $CH_2CH_2$ | Me | $CH_2CF_3$ | $CH_2OC(=O)O(i\text{-}Pr)$ | Cl | $CH_2OMe$ | O |
| C-6543 | Me | $CH_2CH_2$ | H | $CH_2CF_3$ | $CH_2OC(=O)O(i\text{-}Pr)$ | Cl | $CH_2OMe$ | O |
| C-6544 | H | single bond | Me | $CH_2CF_3$ | $CH_2OC(=O)O(i\text{-}Pr)$ | Me | $CH_2OMe$ | O |
| C-6545 | Me | single bond | H | $CH_2CF_3$ | $CH_2OC(=O)O(i\text{-}Pr)$ | Me | $CH_2OMe$ | O |
| C-6546 | Me(R) | single bond | H | $CH_2CF_3$ | $CH_2OC(=O)O(i\text{-}Pr)$ | Me | $CH_2OMe$ | O |
| C-6547 | Me(S) | single bond | H | $CH_2CF_3$ | $CH_2OC(=O)O(i\text{-}Pr)$ | Me | $CH_2OMe$ | O |
| C-6548 | H | $CH_2$ | Me | $CH_2CF_3$ | $CH_2OC(=O)O(i\text{-}Pr)$ | Me | $CH_2OMe$ | O |
| C-6549 | Me | $CH_2$ | H | $CH_2CF_3$ | $CH_2OC(=O)O(i\text{-}Pr)$ | Me | $CH_2OMe$ | O |
| C-6550 | H | CH(Me) | H | $CH_2CF_3$ | $CH_2OC(=O)O(i\text{-}Pr)$ | Me | $CH_2OMe$ | O |
| C-6551 | H | $CH_2CH_2$ | Me | $CH_2CF_3$ | $CH_2OC(=O)O(i\text{-}Pr)$ | Me | $CH_2OMe$ | O |
| C-6552 | Me | $CH_2CH_2$ | H | $CH_2CF_3$ | $CH_2OC(=O)O(i\text{-}Pr)$ | Me | $CH_2OMe$ | O |
| C-6553 | H | single bond | Me | $CH_2CF_3$ | $CH_2N(Me)C(=O)OMe$ | Cl | $CH_2OMe$ | O |
| C-6554 | Me | single bond | H | $CH_2CF_3$ | $CH_2N(Me)C(=O)OMe$ | Cl | $CH_2OMe$ | O |
| C-6555 | Me(R) | single bond | H | $CH_2CF_3$ | $CH_2N(Me)C(=O)OMe$ | Cl | $CH_2OMe$ | O |
| C-6556 | Me(S) | single bond | H | $CH_2CF_3$ | $CH_2N(Me)C(=O)OMe$ | Cl | $CH_2OMe$ | O |
| C-6557 | H | $CH_2$ | Me | $CH_2CF_3$ | $CH_2N(Me)C(=O)OMe$ | Cl | $CH_2OMe$ | O |
| C-6558 | Me | $CH_2$ | H | $CH_2CF_3$ | $CH_2N(Me)C(=O)OMe$ | Cl | $CH_2OMe$ | O |
| C-6559 | H | CH(Me) | H | $CH_2CF_3$ | $CH_2N(Me)C(=O)OMe$ | Cl | $CH_2OMe$ | O |
| C-6560 | H | $CH_2CH_2$ | Me | $CH_2CF_3$ | $CH_2N(Me)C(=O)OMe$ | Cl | $CH_2OMe$ | O |
| C-6561 | Me | $CH_2CH_2$ | H | $CH_2CF_3$ | $CH_2N(Me)C(=O)OMe$ | Cl | $CH_2OMe$ | O |
| C-6562 | H | single bond | Me | $CH_2CF_3$ | $CH_2N(Me)C(=O)OMe$ | Me | $CH_2OMe$ | O |

TABLE 377

| Compound Number | Y | W | Z | $R^1$ | $R^2$ | $R^3$ | $R^{10}$ | A |
|---|---|---|---|---|---|---|---|---|
| C-6563 | Me | single bond | H | $CH_2CF_3$ | $CH_2N(Me)C(=O)OMe$ | Me | $CH_2OMe$ | O |
| C-6564 | Me(R) | single bond | H | $CH_2CF_3$ | $CH_2N(Me)C(=O)OMe$ | Me | $CH_2OMe$ | O |
| C-6565 | Me(S) | single bond | H | $CH_2CF_3$ | $CH_2N(Me)C(=O)OMe$ | Me | $CH_2OMe$ | O |
| C-6566 | H | $CH_2$ | Me | $CH_2CF_3$ | $CH_2N(Me)C(=O)OMe$ | Me | $CH_2OMe$ | O |
| C-6567 | Me | $CH_2$ | H | $CH_2CF_3$ | $CH_2N(Me)C(=O)OMe$ | Me | $CH_2OMe$ | O |
| C-6568 | H | CH(Me) | H | $CH_2CF_3$ | $CH_2N(Me)C(=O)OMe$ | Me | $CH_2OMe$ | O |
| C-6569 | H | $CH_2CH_2$ | Me | $CH_2CF_3$ | $CH_2N(Me)C(=O)OMe$ | Me | $CH_2OMe$ | O |
| C-6570 | Me | $CH_2CH_2$ | H | $CH_2CF_3$ | $CH_2N(Me)C(=O)OMe$ | Me | $CH_2OMe$ | O |
| C-6571 | H | single bond | Me | $CH_2CF_3$ | $C(=O)OCH_2CH=CH_2$ | Cl | $CH_2CN$ | O |
| C-6572 | Me | single bond | H | $CH_2CF_3$ | $C(=O)OCH_2CH=CH_2$ | Cl | $CH_2CN$ | O |
| C-6573 | Me(R) | single bond | H | $CH_2CF_3$ | $C(=O)OCH_2CH=CH_2$ | Cl | $CH_2CN$ | O |
| C-6574 | Me(S) | single bond | H | $CH_2CF_3$ | $C(=O)OCH_2CH=CH_2$ | Cl | $CH_2CN$ | O |
| C-6575 | H | $CH_2$ | Me | $CH_2CF_3$ | $C(=O)OCH_2CH=CH_2$ | Cl | $CH_2CN$ | O |
| C-6576 | Me | $CH_2$ | H | $CH_2CF_3$ | $C(=O)OCH_2CH=CH_2$ | Cl | $CH_2CN$ | O |
| C-6577 | H | CH(Me) | H | $CH_2CF_3$ | $C(=O)OCH_2CH=CH_2$ | Cl | $CH_2CN$ | O |
| C-6578 | H | $CH_2CH_2$ | Me | $CH_2CF_3$ | $C(=O)OCH_2CH=CH_2$ | Cl | $CH_2CN$ | O |
| C-6579 | Me | $CH_2CH_2$ | H | $CH_2CF_3$ | $C(=O)OCH_2CH=CH_2$ | Cl | $CH_2CN$ | O |
| C-6580 | H | single bond | Me | $CH_2CF_3$ | $C(=O)OCH_2CH=CH_2$ | Me | $CH_2CN$ | O |
| C-6581 | Me | single bond | H | $CH_2CF_3$ | $C(=O)OCH_2CH=CH_2$ | Me | $CH_2CN$ | O |
| C-6582 | Me(R) | single bond | H | $CH_2CF_3$ | $C(=O)OCH_2CH=CH_2$ | Me | $CH_2CN$ | O |
| C-6583 | Me(S) | single bond | H | $CH_2CF_3$ | $C(=O)OCH_2CH=CH_2$ | Me | $CH_2CN$ | O |
| C-6584 | H | $CH_2$ | Me | $CH_2CF_3$ | $C(=O)OCH_2CH=CH_2$ | Me | $CH_2CN$ | O |
| C-6585 | Me | $CH_2$ | H | $CH_2CF_3$ | $C(=O)OCH_2CH=CH_2$ | Me | $CH_2CN$ | O |

TABLE 377-continued

| Compound Number | Y | W | Z | $R^1$ | $R^2$ | $R^3$ | $R^{10}$ | A |
|---|---|---|---|---|---|---|---|---|
| C-6586 | H | CH(Me) | H | $CH_2CF_3$ | $C(=O)OCH_2CH=CH_2$ | Me | $CH_2CN$ | O |
| C-6587 | H | $CH_2CH_2$ | Me | $CH_2CF_3$ | $C(=O)OCH_2CH=CH_2$ | Me | $CH_2CN$ | O |
| C-6588 | Me | $CH_2CH_2$ | H | $CH_2CF_3$ | $C(=O)OCH_2CH=CH_2$ | Me | $CH_2CN$ | O |
| C-6589 | H | single bond | Me | $CH_2CF_3$ | $C(=O)OCH_2CCl_3$ | Cl | $CH_2CN$ | O |
| C-6590 | Me | single bond | H | $CH_2CF_3$ | $C(=O)OCH_2CCl_3$ | Cl | $CH_2CN$ | O |
| C-6591 | Me(R) | single bond | H | $CH_2CF_3$ | $C(=O)OCH_2CCl_3$ | Cl | $CH_2CN$ | O |
| C-6592 | Me(S) | single bond | H | $CH_2CF_3$ | $C(=O)OCH_2CCl_3$ | Cl | $CH_2CN$ | O |
| C-6593 | H | $CH_2$ | Me | $CH_2CF_3$ | $C(=O)OCH_2CCl_3$ | Cl | $CH_2CN$ | O |
| C-6594 | Me | $CH_2$ | H | $CH_2CF_3$ | $C(=O)OCH_2CCl_3$ | Cl | $CH_2CN$ | O |
| C-6595 | H | CH(Me) | H | $CH_2CF_3$ | $C(=O)OCH_2CCl_3$ | Cl | $CH_2CN$ | O |
| C-6596 | H | $CH_2CH_2$ | Me | $CH_2CF_3$ | $C(=O)OCH_2CCl_3$ | Cl | $CH_2CN$ | O |
| C-6597 | Me | $CH_2CH_2$ | H | $CH_2CF_3$ | $C(=O)OCH_2CCl_3$ | Cl | $CH_2CN$ | O |
| C-6598 | H | single bond | Me | $CH_2CF_3$ | $C(=O)OCH_2CCl_3$ | Me | $CH_2CN$ | O |
| C-6599 | Me | single bond | H | $CH_2CF_3$ | $C(=O)OCH_2CCl_3$ | Me | $CH_2CN$ | O |
| C-6600 | Me(R) | single bond | H | $CH_2CF_3$ | $C(=O)OCH_2CCl_3$ | Me | $CH_2CN$ | O |
| C-6601 | Me(S) | single bond | H | $CH_2CF_3$ | $C(=O)OCH_2CCl_3$ | Me | $CH_2CN$ | O |
| C-6602 | H | $CH_2$ | Me | $CH_2CF_3$ | $C(=O)OCH_2CCl_3$ | Me | $CH_2CN$ | O |
| C-6603 | Me | $CH_2$ | H | $CH_2CF_3$ | $C(=O)OCH_2CCl_3$ | Me | $CH_2CN$ | O |
| C-6604 | H | CH(Me) | H | $CH_2CF_3$ | $C(=O)OCH_2CCl_3$ | Me | $CH_2CN$ | O |
| C-6605 | H | $CH_2CH_2$ | Me | $CH_2CF_3$ | $C(=O)OCH_2CCl_3$ | Me | $CH_2CN$ | O |
| C-6606 | Me | $CH_2CH_2$ | H | $CH_2CF_3$ | $C(=O)OCH_2CCl_3$ | Me | $CH_2CN$ | O |

TABLE 378

| Compound Number | Y | W | Z | $R^1$ | $R^2$ | $R^3$ | $R^{10}$ | A |
|---|---|---|---|---|---|---|---|---|
| C-6607 | H | single bond | Me | $CH_2CF_3$ | $C(=O)N(Me)_2$ | Cl | $CH_2CN$ | O |
| C-6608 | Me | single bond | H | $CH_2CF_3$ | $C(=O)N(Me)_2$ | Cl | $CH_2CN$ | O |
| C-6609 | Me(R) | single bond | H | $CH_2CF_3$ | $C(=O)N(Me)_2$ | Cl | $CH_2CN$ | O |
| C-6610 | Me(S) | single bond | H | $CH_2CF_3$ | $C(=O)N(Me)_2$ | Cl | $CH_2CN$ | O |
| C-6611 | H | $CH_2$ | Me | $CH_2CF_3$ | $C(=O)N(Me)_2$ | Cl | $CH_2CN$ | O |
| C-6612 | Me | $CH_2$ | H | $CH_2CF_3$ | $C(=O)N(Me)_2$ | Cl | $CH_2CN$ | O |
| C-6613 | H | CH(Me) | H | $CH_2CF_3$ | $C(=O)N(Me)_2$ | Cl | $CH_2CN$ | O |
| C-6614 | H | $CH_2CH_2$ | Me | $CH_2CF_3$ | $C(=O)N(Me)_2$ | Cl | $CH_2CN$ | O |
| C-6615 | Me | $CH_2CH_2$ | H | $CH_2CF_3$ | $C(=O)N(Me)_2$ | Cl | $CH_2CN$ | O |
| C-6616 | H | single bond | Me | $CH_2CF_3$ | $C(=O)N(Me)_2$ | Me | $CH_2CN$ | O |
| C-6617 | Me | single bond | H | $CH_2CF_3$ | $C(=O)N(Me)_2$ | Me | $CH_2CN$ | O |
| C-6618 | Me(R) | single bond | H | $CH_2CF_3$ | $C(=O)N(Me)_2$ | Me | $CH_2CN$ | O |
| C-6619 | Me(S) | single bond | H | $CH_2CF_3$ | $C(=O)N(Me)_2$ | Me | $CH_2CN$ | O |
| C-6620 | H | $CH_2$ | Me | $CH_2CF_3$ | $C(=O)N(Me)_2$ | Me | $CH_2CN$ | O |
| C-6621 | Me | $CH_2$ | H | $CH_2CF_3$ | $C(=O)N(Me)_2$ | Me | $CH_2CN$ | O |
| C-6622 | H | CH(Me) | H | $CH_2CF_3$ | $C(=O)N(Me)_2$ | Me | $CH_2CN$ | O |
| C-6623 | H | $CH_2CH_2$ | Me | $CH_2CF_3$ | $C(=O)N(Me)_2$ | Me | $CH_2CN$ | O |
| C-6624 | Me | $CH_2CH_2$ | H | $CH_2CF_3$ | $C(=O)N(Me)_2$ | Me | $CH_2CN$ | O |
| C-6625 | H | single bond | Me | $CH_2CF_3$ | $CH_2OC(=O)Me$ | Cl | $CH_2CN$ | O |
| C-6626 | Me | single bond | H | $CH_2CF_3$ | $CH_2OC(=O)Me$ | Cl | $CH_2CN$ | O |
| C-6627 | Me(R) | single bond | H | $CH_2CF_3$ | $CH_2OC(=O)Me$ | Cl | $CH_2CN$ | O |
| C-6628 | Me(S) | single bond | H | $CH_2CF_3$ | $CH_2OC(=O)Me$ | Cl | $CH_2CN$ | O |
| C-6629 | H | $CH_2$ | Me | $CH_2CF_3$ | $CH_2OC(=O)Me$ | Cl | $CH_2CN$ | O |
| C-6630 | Me | $CH_2$ | H | $CH_2CF_3$ | $CH_2OC(=O)Me$ | Cl | $CH_2CN$ | O |
| C-6631 | H | CH(Me) | H | $CH_2CF_3$ | $CH_2OC(=O)Me$ | Cl | $CH_2CN$ | O |
| C-6632 | H | $CH_2CH_2$ | Me | $CH_2CF_3$ | $CH_2OC(=O)Me$ | Cl | $CH_2CN$ | O |
| C-6633 | Me | $CH_2CH_2$ | H | $CH_2CF_3$ | $CH_2OC(=O)Me$ | Cl | $CH_2CN$ | O |
| C-6634 | H | single bond | Me | $CH_2CF_3$ | $CH_2OC(=O)Me$ | Me | $CH_2CN$ | O |
| C-6635 | Me | single bond | H | $CH_2CF_3$ | $CH_2OC(=O)Me$ | Me | $CH_2CN$ | O |
| C-6636 | Me(R) | single bond | H | $CH_2CF_3$ | $CH_2OC(=O)Me$ | Me | $CH_2CN$ | O |
| C-6637 | Me(S) | single bond | H | $CH_2CF_3$ | $CH_2OC(=O)Me$ | Me | $CH_2CN$ | O |
| C-6638 | H | $CH_2$ | Me | $CH_2CF_3$ | $CH_2OC(=O)Me$ | Me | $CH_2CN$ | O |
| C-6639 | Me | $CH_2$ | H | $CH_2CF_3$ | $CH_2OC(=O)Me$ | Me | $CH_2CN$ | O |
| C-6640 | H | CH(Me) | H | $CH_2CF_3$ | $CH_2OC(=O)Me$ | Me | $CH_2CN$ | O |
| C-6641 | H | $CH_2CH_2$ | Me | $CH_2CF_3$ | $CH_2OC(=O)Me$ | Me | $CH_2CN$ | O |
| C-6642 | Me | $CH_2CH_2$ | H | $CH_2CF_3$ | $CH_2OC(=O)Me$ | Me | $CH_2CN$ | O |
| C-6643 | H | single bond | Me | $CH_2CF_3$ | $CH_2OC(=O)(i\text{-}Pr)$ | Cl | $CH_2CN$ | O |
| C-6644 | Me | single bond | H | $CH_2CF_3$ | $CH_2OC(=O)(i\text{-}Pr)$ | Cl | $CH_2CN$ | O |
| C-6645 | Me(R) | single bond | H | $CH_2CF_3$ | $CH_2OC(=O)(i\text{-}Pr)$ | Cl | $CH_2CN$ | O |
| C-6646 | Me(S) | single bond | H | $CH_2CF_3$ | $CH_2OC(=O)(i\text{-}Pr)$ | Cl | $CH_2CN$ | O |
| C-6647 | H | $CH_2$ | Me | $CH_2CF_3$ | $CH_2OC(=O)(i\text{-}Pr)$ | Cl | $CH_2CN$ | O |
| C-6648 | Me | $CH_2$ | H | $CH_2CF_3$ | $CH_2OC(=O)(i\text{-}Pr)$ | Cl | $CH_2CN$ | O |
| C-6649 | H | CH(Me) | H | $CH_2CF_3$ | $CH_2OC(=O)(i\text{-}Pr)$ | Cl | $CH_2CN$ | O |
| C-6650 | H | $CH_2CH_2$ | Me | $CH_2CF_3$ | $CH_2OC(=O)(i\text{-}Pr)$ | Cl | $CH_2CN$ | O |

TABLE 379

| Compound Number | Y | W | Z | $R^1$ | $R^2$ | $R^3$ | $R^{10}$ | A |
|---|---|---|---|---|---|---|---|---|
| C-6651 | Me | $CH_2CH_2$ | H | $CH_2CF_3$ | $CH_2OC(=O)(i-Pr)$ | Cl | $CH_2CN$ | O |
| C-6652 | H | single bond | Me | $CH_2CF_3$ | $CH_2OC(=O)(i-Pr)$ | Me | $CH_2CN$ | O |
| C-6653 | Me | single bond | H | $CH_2CF_3$ | $CH_2OC(=O)(i-Pr)$ | Me | $CH_2CN$ | O |
| C-6654 | Me(R) | single bond | H | $CH_2CF_3$ | $CH_2OC(=O)(i-Pr)$ | Me | $CH_2CN$ | O |
| C-6655 | Me(S) | single bond | H | $CH_2CF_3$ | $CH_2OC(=O)(i-Pr)$ | Me | $CH_2CN$ | O |
| C-6656 | H | $CH_2$ | Me | $CH_2CF_3$ | $CH_2OC(=O)(i-Pr)$ | Me | $CH_2CN$ | O |
| C-6657 | Me | $CH_2$ | H | $CH_2CF_3$ | $CH_2OC(=O)(i-Pr)$ | Me | $CH_2CN$ | O |
| C-6658 | H | CH(Me) | H | $CH_2CF_3$ | $CH_2OC(=O)(i-Pr)$ | Me | $CH_2CN$ | O |
| C-6659 | H | $CH_2CH_2$ | Me | $CH_2CF_3$ | $CH_2OC(=O)(i-Pr)$ | Me | $CH_2CN$ | O |
| C-6660 | Me | $CH_2CH_2$ | H | $CH_2CF_3$ | $CH_2OC(=O)(i-Pr)$ | Me | $CH_2CN$ | O |
| C-6661 | H | single bond | Me | $CH_2CF_3$ | $CH_2OC(=O)(t-Bu)$ | Cl | $CH_2CN$ | O |
| C-6662 | Me | single bond | H | $CH_2CF_3$ | $CH_2OC(=O)(t-Bu)$ | Cl | $CH_2CN$ | O |
| C-6663 | Me(R) | single bond | H | $CH_2CF_3$ | $CH_2OC(=O)(t-Bu)$ | Cl | $CH_2CN$ | O |
| C-6664 | Me(S) | single bond | H | $CH_2CF_3$ | $CH_2OC(=O)(t-Bu)$ | Cl | $CH_2CN$ | O |
| C-6665 | H | $CH_2$ | Me | $CH_2CF_3$ | $CH_2OC(=O)(t-Bu)$ | Cl | $CH_2CN$ | O |
| C-6666 | Me | $CH_2$ | H | $CH_2CF_3$ | $CH_2OC(=O)(t-Bu)$ | Cl | $CH_2CN$ | O |
| C-6667 | H | CH(Me) | H | $CH_2CF_3$ | $CH_2OC(=O)(t-Bu)$ | Cl | $CH_2CN$ | O |
| C-6668 | H | $CH_2CH_2$ | Me | $CH_2CF_3$ | $CH_2OC(=O)(t-Bu)$ | Cl | $CH_2CN$ | O |
| C-6669 | Me | $CH_2CH_2$ | H | $CH_2CF_3$ | $CH_2OC(=O)(t-Bu)$ | Cl | $CH_2CN$ | O |
| C-6670 | H | single bond | Me | $CH_2CF_3$ | $CH_2OC(=O)(t-Bu)$ | Me | $CH_2CN$ | O |
| C-6671 | Me | single bond | H | $CH_2CF_3$ | $CH_2OC(=O)(t-Bu)$ | Me | $CH_2CN$ | O |
| C-6672 | Me(R) | single bond | H | $CH_2CF_3$ | $CH_2OC(=O)(t-Bu)$ | Me | $CH_2CN$ | O |
| C-6673 | Me(S) | single bond | H | $CH_2CF_3$ | $CH_2OC(=O)(t-Bu)$ | Me | $CH_2CN$ | O |
| C-6674 | H | $CH_2$ | Me | $CH_2CF_3$ | $CH_2OC(=O)(t-Bu)$ | Me | $CH_2CN$ | O |
| C-6675 | Me | $CH_2$ | H | $CH_2CF_3$ | $CH_2OC(=O)(t-Bu)$ | Me | $CH_2CN$ | O |
| C-6676 | H | CH(Me) | H | $CH_2CF_3$ | $CH_2OC(=O)(t-Bu)$ | Me | $CH_2CN$ | O |
| C-6677 | H | $CH_2CH_2$ | Me | $CH_2CF_3$ | $CH_2OC(=O)(t-Bu)$ | Me | $CH_2CN$ | O |
| C-6678 | Me | $CH_2CH_2$ | H | $CH_2CF_3$ | $CH_2OC(=O)(t-Bu)$ | Me | $CH_2CN$ | O |
| C-6679 | H | single bond | Me | $CH_2CF_3$ | $CH_2OC(=O)OEt$ | Cl | $CH_2CN$ | O |
| C-6680 | Me | single bond | H | $CH_2CF_3$ | $CH_2OC(=O)OEt$ | Cl | $CH_2CN$ | O |
| C-6681 | Me(R) | single bond | H | $CH_2CF_3$ | $CH_2OC(=O)OEt$ | Cl | $CH_2CN$ | O |
| C-6682 | Me(S) | single bond | H | $CH_2CF_3$ | $CH_2OC(=O)OEt$ | Cl | $CH_2CN$ | O |
| C-6683 | H | $CH_2$ | Me | $CH_2CF_3$ | $CH_2OC(=O)OEt$ | Cl | $CH_2CN$ | O |
| C-6684 | Me | $CH_2$ | H | $CH_2CF_3$ | $CH_2OC(=O)OEt$ | Cl | $CH_2CN$ | O |
| C-6685 | H | CH(Me) | H | $CH_2CF_3$ | $CH_2OC(=O)OEt$ | Cl | $CH_2CN$ | O |
| C-6686 | H | $CH_2CH_2$ | Me | $CH_2CF_3$ | $CH_2OC(=O)OEt$ | Cl | $CH_2CN$ | O |
| C-6687 | Me | $CH_2CH_2$ | H | $CH_2CF_3$ | $CH_2OC(=O)OEt$ | Cl | $CH_2CN$ | O |
| C-6688 | H | single bond | Me | $CH_2CF_3$ | $CH_2OC(=O)OEt$ | Me | $CH_2CN$ | O |
| C-6689 | Me | single bond | H | $CH_2CF_3$ | $CH_2OC(=O)OEt$ | Me | $CH_2CN$ | O |
| C-6690 | Me(R) | single bond | H | $CH_2CF_3$ | $CH_2OC(=O)OEt$ | Me | $CH_2CN$ | O |
| C-6691 | Me(S) | single bond | H | $CH_2CF_3$ | $CH_2OC(=O)OEt$ | Me | $CH_2CN$ | O |
| C-6692 | H | $CH_2$ | Me | $CH_2CF_3$ | $CH_2OC(=O)OEt$ | Me | $CH_2CN$ | O |
| C-6693 | Me | $CH_2$ | H | $CH_2CF_3$ | $CH_2OC(=O)OEt$ | Me | $CH_2CN$ | O |
| C-6694 | H | CH(Me) | H | $CH_2CF_3$ | $CH_2OC(=O)OEt$ | Me | $CH_2CN$ | O |

TABLE 380

| Compound Number | Y | W | Z | $R^1$ | $R^2$ | $R^3$ | $R^{10}$ | A |
|---|---|---|---|---|---|---|---|---|
| C-6695 | H | $CH_2CH_2$ | Me | $CH_2CF_3$ | $CH_2OC(=O)OEt$ | Me | $CH_2CN$ | O |
| C-6696 | Me | $CH_2CH_2$ | H | $CH_2CF_3$ | $CH_2OC(=O)OEt$ | Me | $CH_2CN$ | O |
| C-6697 | H | single bond | Me | $CH_2CF_3$ | $CH_2OC(=O)O(i-Pr)$ | Cl | $CH_2CN$ | O |
| C-6698 | Me | single bond | H | $CH_2CF_3$ | $CH_2OC(=O)O(i-Pr)$ | Cl | $CH_2CN$ | O |
| C-6699 | Me(R) | single bond | H | $CH_2CF_3$ | $CH_2OC(=O)O(i-Pr)$ | Cl | $CH_2CN$ | O |
| C-6700 | Me(S) | single bond | H | $CH_2CF_3$ | $CH_2OC(=O)O(i-Pr)$ | Cl | $CH_2CN$ | O |
| C-6701 | H | $CH_2$ | Me | $CH_2CF_3$ | $CH_2OC(=O)O(i-Pr)$ | Cl | $CH_2CN$ | O |
| C-6702 | Me | $CH_2$ | H | $CH_2CF_3$ | $CH_2OC(=O)O(i-Pr)$ | Cl | $CH_2CN$ | O |
| C-6703 | H | CH(Me) | H | $CH_2CF_3$ | $CH_2OC(=O)O(i-Pr)$ | Cl | $CH_2CN$ | O |
| C-6704 | H | $CH_2CH_2$ | Me | $CH_2CF_3$ | $CH_2OC(=O)O(i-Pr)$ | Cl | $CH_2CN$ | O |
| C-6705 | Me | $CH_2CH_2$ | H | $CH_2CF_3$ | $CH_2OC(=O)O(i-Pr)$ | Cl | $CH_2CN$ | O |
| C-6706 | H | single bond | Me | $CH_2CF_3$ | $CH_2OC(=O)O(i-Pr)$ | Me | $CH_2CN$ | O |
| C-6707 | Me | single bond | H | $CH_2CF_3$ | $CH_2OC(=O)O(i-Pr)$ | Me | $CH_2CN$ | O |
| C-6708 | Me(R) | single bond | H | $CH_2CF_3$ | $CH_2OC(=O)O(i-Pr)$ | Me | $CH_2CN$ | O |
| C-6709 | Me(S) | single bond | H | $CH_2CF_3$ | $CH_2OC(=O)O(i-Pr)$ | Me | $CH_2CN$ | O |
| C-6710 | H | $CH_2$ | Me | $CH_2CF_3$ | $CH_2OC(=O)O(i-Pr)$ | Me | $CH_2CN$ | O |
| C-6711 | Me | $CH_2$ | H | $CH_2CF_3$ | $CH_2OC(=O)O(i-Pr)$ | Me | $CH_2CN$ | O |
| C-6712 | H | CH(Me) | H | $CH_2CF_3$ | $CH_2OC(=O)O(i-Pr)$ | Me | $CH_2CN$ | O |
| C-6713 | H | $CH_2CH_2$ | Me | $CH_2CF_3$ | $CH_2OC(=O)O(i-Pr)$ | Me | $CH_2CN$ | O |
| C-6714 | Me | $CH_2CH_2$ | H | $CH_2CF_3$ | $CH_2OC(=O)O(i-Pr)$ | Me | $CH_2CN$ | O |
| C-6715 | H | single bond | Me | $CH_2CF_3$ | $CH_2N(Me)C(=O)OMe$ | Cl | $CH_2CN$ | O |

TABLE 380-continued

| Compound Number | Y | W | Z | $R^1$ | $R^2$ | $R^3$ | $R^{10}$ | A |
|---|---|---|---|---|---|---|---|---|
| C-6716 | Me | single bond | H | $CH_2CF_3$ | $CH_2N(Me)C(=O)OMe$ | Cl | $CH_2CN$ | O |
| C-6717 | Me(R) | single bond | H | $CH_2CF_3$ | $CH_2N(Me)C(=O)OMe$ | Cl | $CH_2CN$ | O |
| C-6718 | Me(S) | single bond | H | $CH_2CF_3$ | $CH_2N(Me)C(=O)OMe$ | Cl | $CH_2CN$ | O |
| C-6719 | H | $CH_2$ | Me | $CH_2CF_3$ | $CH_2N(Me)C(=O)OMe$ | Cl | $CH_2CN$ | O |
| C-6720 | Me | $CH_2$ | H | $CH_2CF_3$ | $CH_2N(Me)C(=O)OMe$ | Cl | $CH_2CN$ | O |
| C-6721 | H | CH(Me) | H | $CH_2CF_3$ | $CH_2N(Me)C(=O)OMe$ | Cl | $CH_2CN$ | O |
| C-6722 | H | $CH_2CH_2$ | Me | $CH_2CF_3$ | $CH_2N(Me)C(=O)OMe$ | Cl | $CH_2CN$ | O |
| C-6723 | Me | $CH_2CH_2$ | H | $CH_2CF_3$ | $CH_2N(Me)C(=O)OMe$ | Cl | $CH_2CN$ | O |
| C-6724 | H | single bond | Me | $CH_2CF_3$ | $CH_2N(Me)C(=O)OMe$ | Me | $CH_2CN$ | O |
| C-6725 | Me | single bond | H | $CH_2CF_3$ | $CH_2N(Me)C(=O)OMe$ | Me | $CH_2CN$ | O |
| C-6726 | Me(R) | single bond | H | $CH_2CF_3$ | $CH_2N(Me)C(=O)OMe$ | Me | $CH_2CN$ | O |
| C-6727 | Me(S) | single bond | H | $CH_2CF_3$ | $CH_2N(Me)C(=O)OMe$ | Me | $CH_2CN$ | O |
| C-6728 | H | $CH_2$ | Me | $CH_2CF_3$ | $CH_2N(Me)C(=O)OMe$ | Me | $CH_2CN$ | O |
| C-6729 | Me | $CH_2$ | H | $CH_2CF_3$ | $CH_2N(Me)C(=O)OMe$ | Me | $CH_2CN$ | O |
| C-6730 | H | CH(Me) | H | $CH_2CF_3$ | $CH_2N(Me)C(=O)OMe$ | Me | $CH_2CN$ | O |
| C-6731 | H | $CH_2CH_2$ | Me | $CH_2CF_3$ | $CH_2N(Me)C(=O)OMe$ | Me | $CH_2CN$ | O |
| C-6732 | Me | $CH_2CH_2$ | H | $CH_2CF_3$ | $CH_2N(Me)C(=O)OMe$ | Me | $CH_2CN$ | O |
| C-6733 | H | single bond | Me | $CH_2CF_3$ | $C(=O)OCH_2CH=CH_2$ | Cl | C(=O)Me | O |
| C-6734 | Me | single bond | H | $CH_2CF_3$ | $C(=O)OCH_2CH=CH_2$ | Cl | C(=O)Me | O |
| C-6735 | Me(R) | single bond | H | $CH_2CF_3$ | $C(=O)OCH_2CH=CH_2$ | Cl | C(=O)Me | O |
| C-6736 | Me(S) | single bond | H | $CH_2CF_3$ | $C(=O)OCH_2CH=CH_2$ | Cl | C(=O)Me | O |
| C-6737 | H | $CH_2$ | Me | $CH_2CF_3$ | $C(=O)OCH_2CH=CH_2$ | Cl | C(=O)Me | O |
| C-6738 | Me | $CH_2$ | H | $CH_2CF_3$ | $C(=O)OCH_2CH=CH_2$ | Cl | C(=O)Me | O |

TABLE 381

| Compound Number | Y | W | Z | $R^1$ | $R^2$ | $R^3$ | $R^{10}$ | A |
|---|---|---|---|---|---|---|---|---|
| C-6739 | H | CH(Me) | H | $CH_2CF_3$ | $C(=O)OCH_2CH=CH_2$ | Cl | C(=O)Me | O |
| C-6740 | H | $CH_2CH_2$ | Me | $CH_2CF_3$ | $C(=O)OCH_2CH=CH_2$ | Cl | C(=O)Me | O |
| C-6741 | Me | $CH_2CH_2$ | H | $CH_2CF_3$ | $C(=O)OCH_2CH=CH_2$ | Cl | C(=O)Me | O |
| C-6742 | H | single bond | Me | $CH_2CF_3$ | $C(=O)OCH_2CH=CH_2$ | Me | C(=O)Me | O |
| C-6743 | Me | single bond | H | $CH_2CF_3$ | $C(=O)OCH_2CH=CH_2$ | Me | C(=O)Me | O |
| C-6744 | Me(R) | single bond | H | $CH_2CF_3$ | $C(=O)OCH_2CH=CH_2$ | Me | C(=O)Me | O |
| C-6745 | Me(S) | single bond | H | $CH_2CF_3$ | $C(=O)OCH_2CH=CH_2$ | Me | C(=O)Me | O |
| C-6746 | H | $CH_2$ | Me | $CH_2CF_3$ | $C(=O)OCH_2CH=CH_2$ | Me | C(=O)Me | O |
| C-6747 | Me | $CH_2$ | H | $CH_2CF_3$ | $C(=O)OCH_2CH=CH_2$ | Me | C(=O)Me | O |
| C-6748 | H | CH(Me) | H | $CH_2CF_3$ | $C(=O)OCH_2CH=CH_2$ | Me | C(=O)Me | O |
| C-6749 | H | $CH_2CH_2$ | Me | $CH_2CF_3$ | $C(=O)OCH_2CH=CH_2$ | Me | C(=O)Me | O |
| C-6750 | Me | $CH_2CH_2$ | H | $CH_2CF_3$ | $C(=O)OCH_2CH=CH_2$ | Me | C(=O)Me | O |
| C-6751 | H | single bond | Me | $CH_2CF_3$ | $C(=O)OCH_2CCl_3$ | Cl | C(=O)Me | O |
| C-6752 | Me | single bond | H | $CH_2CF_3$ | $C(=O)OCH_2CCl_3$ | Cl | C(=O)Me | O |
| C-6753 | Me(R) | single bond | H | $CH_2CF_3$ | $C(=O)OCH_2CCl_3$ | Cl | C(=O)Me | O |
| C-6754 | Me(S) | single bond | H | $CH_2CF_3$ | $C(=O)OCH_2CCl_3$ | Cl | C(=O)Me | O |
| C-6755 | H | $CH_2$ | Me | $CH_2CF_3$ | $C(=O)OCH_2CCl_3$ | Cl | C(=O)Me | O |
| C-6756 | Me | $CH_2$ | H | $CH_2CF_3$ | $C(=O)OCH_2CCl_3$ | Cl | C(=O)Me | O |
| C-6757 | H | CH(Me) | H | $CH_2CF_3$ | $C(=O)OCH_2CCl_3$ | Cl | C(=O)Me | O |
| C-6758 | H | $CH_2CH_2$ | Me | $CH_2CF_3$ | $C(=O)OCH_2CCl_3$ | Cl | C(=O)Me | O |
| C-6759 | Me | $CH_2CH_2$ | H | $CH_2CF_3$ | $C(=O)OCH_2CCl_3$ | Cl | C(=O)Me | O |
| C-6760 | H | single bond | Me | $CH_2CF_3$ | $C(=O)OCH_2CCl_3$ | Me | C(=O)Me | O |
| C-6761 | Me | single bond | H | $CH_2CF_3$ | $C(=O)OCH_2CCl_3$ | Me | C(=O)Me | O |
| C-6762 | Me(R) | single bond | H | $CH_2CF_3$ | $C(=O)OCH_2CCl_3$ | Me | C(=O)Me | O |
| C-6763 | Me(S) | single bond | H | $CH_2CF_3$ | $C(=O)OCH_2CCl_3$ | Me | C(=O)Me | O |
| C-6764 | H | $CH_2$ | Me | $CH_2CF_3$ | $C(=O)OCH_2CCl_3$ | Me | C(=O)Me | O |
| C-6765 | Me | $CH_2$ | H | $CH_2CF_3$ | $C(=O)OCH_2CCl_3$ | Me | C(=O)Me | O |
| C-6766 | H | CH(Me) | H | $CH_2CF_3$ | $C(=O)OCH_2CCl_3$ | Me | C(=O)Me | O |
| C-6767 | H | $CH_2CH_2$ | Me | $CH_2CF_3$ | $C(=O)OCH_2CCl_3$ | Me | C(=O)Me | O |
| C-6768 | Me | $CH_2CH_2$ | H | $CH_2CF_3$ | $C(=O)OCH_2CCl_3$ | Me | C(=O)Me | O |
| C-6769 | H | single bond | Me | $CH_2CF_3$ | $C(=O)N(Me)_2$ | Cl | C(=O)Me | O |
| C-6770 | Me | single bond | H | $CH_2CF_3$ | $C(=O)N(Me)_2$ | Cl | C(=O)Me | O |
| C-6771 | Me(R) | single bond | H | $CH_2CF_3$ | $C(=O)N(Me)_2$ | Cl | C(=O)Me | O |
| C-6772 | Me(S) | single bond | H | $CH_2CF_3$ | $C(=O)N(Me)_2$ | Cl | C(=O)Me | O |
| C-6773 | H | $CH_2$ | Me | $CH_2CF_3$ | $C(=O)N(Me)_2$ | Cl | C(=O)Me | O |
| C-6774 | Me | $CH_2$ | H | $CH_2CF_3$ | $C(=O)N(Me)_2$ | Cl | C(=O)Me | O |
| C-6775 | H | CH(Me) | H | $CH_2CF_3$ | $C(=O)N(Me)_2$ | Cl | C(=O)Me | O |
| C-6776 | H | $CH_2CH_2$ | Me | $CH_2CF_3$ | $C(=O)N(Me)_2$ | Cl | C(=O)Me | O |
| C-6777 | Me | $CH_2CH_2$ | H | $CH_2CF_3$ | $C(=O)N(Me)_2$ | Cl | C(=O)Me | O |
| C-6778 | H | single bond | Me | $CH_2CF_3$ | $C(=O)N(Me)_2$ | Me | C(=O)Me | O |
| C-6779 | Me | single bond | H | $CH_2CF_3$ | $C(=O)N(Me)_2$ | Me | C(=O)Me | O |
| C-6780 | Me(R) | single bond | H | $CH_2CF_3$ | $C(=O)N(Me)_2$ | Me | C(=O)Me | O |

TABLE 381-continued

| Compound Number | Y | W | Z | $R^1$ | $R^2$ | $R^3$ | $R^{10}$ | A |
|---|---|---|---|---|---|---|---|---|
| C-6781 | Me(S) | single bond | H | $CH_2CF_3$ | C(═O)N(Me)$_2$ | Me | C(═O)Me | O |
| C-6782 | H | $CH_2$ | Me | $CH_2CF_3$ | C(═O)N(Me)$_2$ | Me | C(═O)Me | O |

TABLE 382

| Compound Number | Y | W | Z | $R^1$ | $R^2$ | $R^3$ | $R^{10}$ | A |
|---|---|---|---|---|---|---|---|---|
| C-6783 | Me | $CH_2$ | H | $CH_2CF_3$ | C(═O)N(Me)$_2$ | Me | C(═O)Me | O |
| C-6784 | H | CH(Me) | H | $CH_2CF_3$ | C(═O)N(Me)$_2$ | Me | C(═O)Me | O |
| C-6785 | H | $CH_2CH_2$ | Me | $CH_2CF_3$ | C(═O)N(Me)$_2$ | Me | C(═O)Me | O |
| C-6786 | Me | $CH_2CH_2$ | H | $CH_2CF_3$ | C(═O)N(Me)$_2$ | Me | C(═O)Me | O |
| C-6787 | H | single bond | Me | $CH_2CF_3$ | $CH_2$OC(═O)Me | Cl | C(═O)Me | O |
| C-6788 | Me | single bond | H | $CH_2CF_3$ | $CH_2$OC(═O)Me | Cl | C(═O)Me | O |
| C-6789 | Me(R) | single bond | H | $CH_2CF_3$ | $CH_2$OC(═O)Me | Cl | C(═O)Me | O |
| C-6790 | Me(S) | single bond | H | $CH_2CF_3$ | $CH_2$OC(═O)Me | Cl | C(═O)Me | O |
| C-6791 | H | $CH_2$ | Me | $CH_2CF_3$ | $CH_2$OC(═O)Me | Cl | C(═O)Me | O |
| C-6792 | Me | $CH_2$ | H | $CH_2CF_3$ | $CH_2$OC(═O)Me | Cl | C(═O)Me | O |
| C-6793 | H | CH(Me) | H | $CH_2CF_3$ | $CH_2$OC(═O)Me | Cl | C(═O)Me | O |
| C-6794 | H | $CH_2CH_2$ | Me | $CH_2CF_3$ | $CH_2$OC(═O)Me | Cl | C(═O)Me | O |
| C-6795 | Me | $CH_2CH_2$ | H | $CH_2CF_3$ | $CH_2$OC(═O)Me | Cl | C(═O)Me | O |
| C-6796 | H | single bond | Me | $CH_2CF_3$ | $CH_2$OC(═O)Me | Me | C(═O)Me | O |
| C-6797 | Me | single bond | H | $CH_2CF_3$ | $CH_2$OC(═O)Me | Me | C(═O)Me | O |
| C-6798 | Me(R) | single bond | H | $CH_2CF_3$ | $CH_2$OC(═O)Me | Me | C(═O)Me | O |
| C-6799 | Me(S) | single bond | H | $CH_2CF_3$ | $CH_2$OC(═O)Me | Me | C(═O)Me | O |
| C-6800 | H | $CH_2$ | Me | $CH_2CF_3$ | $CH_2$OC(═O)Me | Me | C(═O)Me | O |
| C-6801 | Me | $CH_2$ | H | $CH_2CF_3$ | $CH_2$OC(═O)Me | Me | C(═O)Me | O |
| C-6802 | H | CH(Me) | H | $CH_2CF_3$ | $CH_2$OC(═O)Me | Me | C(═O)Me | O |
| C-6803 | H | $CH_2CH_2$ | Me | $CH_2CF_3$ | $CH_2$OC(═O)Me | Me | C(═O)Me | O |
| C-6804 | Me | $CH_2CH_2$ | H | $CH_2CF_3$ | $CH_2$OC(═O)Me | Me | C(═O)Me | O |
| C-6805 | H | single bond | Me | $CH_2CF_3$ | $CH_2$OC(═O)(i-Pr) | Cl | C(═O)Me | O |
| C-6806 | Me | single bond | H | $CH_2CF_3$ | $CH_2$OC(═O)(i-Pr) | Cl | C(═O)Me | O |
| C-6807 | Me(R) | single bond | H | $CH_2CF_3$ | $CH_2$OC(═O)(i-Pr) | Cl | C(═O)Me | O |
| C-6808 | Me(S) | single bond | H | $CH_2CF_3$ | $CH_2$OC(═O)(i-Pr) | Cl | C(═O)Me | O |
| C-6809 | H | $CH_2$ | Me | $CH_2CF_3$ | $CH_2$OC(═O)(i-Pr) | Cl | C(═O)Me | O |
| C-6810 | Me | $CH_2$ | H | $CH_2CF_3$ | $CH_2$OC(═O)(i-Pr) | Cl | C(═O)Me | O |
| C-6811 | H | CH(Me) | H | $CH_2CF_3$ | $CH_2$OC(═O)(i-Pr) | Cl | C(═O)Me | O |
| C-6812 | H | $CH_2CH_2$ | Me | $CH_2CF_3$ | $CH_2$OC(═O)(i-Pr) | Cl | C(═O)Me | O |
| C-6813 | Me | $CH_2CH_2$ | H | $CH_2CF_3$ | $CH_2$OC(═O)(i-Pr) | Cl | C(═O)Me | O |
| C-6814 | H | single bond | Me | $CH_2CF_3$ | $CH_2$OC(═O)(i-Pr) | Me | C(═O)Me | O |
| C-6815 | Me | single bond | H | $CH_2CF_3$ | $CH_2$OC(═O)(i-Pr) | Me | C(═O)Me | O |
| C-6816 | Me(R) | single bond | H | $CH_2CF_3$ | $CH_2$OC(═O)(i-Pr) | Me | C(═O)Me | O |
| C-6817 | Me(S) | single bond | H | $CH_2CF_3$ | $CH_2$OC(═O)(i-Pr) | Me | C(═O)Me | O |
| C-6818 | H | $CH_2$ | Me | $CH_2CF_3$ | $CH_2$OC(═O)(i-Pr) | Me | C(═O)Me | O |
| C-6819 | Me | $CH_2$ | H | $CH_2CF_3$ | $CH_2$OC(═O)(i-Pr) | Me | C(═O)Me | O |
| C-6820 | H | CH(Me) | H | $CH_2CF_3$ | $CH_2$OC(═O)(i-Pr) | Me | C(═O)Me | O |
| C-6821 | H | $CH_2CH_2$ | Me | $CH_2CF_3$ | $CH_2$OC(═O)(i-Pr) | Me | C(═O)Me | O |
| C-6822 | Me | $CH_2CH_2$ | H | $CH_2CF_3$ | $CH_2$OC(═O)(i-Pr) | Me | C(═O)Me | O |
| C-6823 | H | single bond | Me | $CH_2CF_3$ | $CH_2$OC(═O)(t-Bu) | Cl | C(═O)Me | O |
| C-6824 | Me | single bond | H | $CH_2CF_3$ | $CH_2$OC(═O)(t-Bu) | Cl | C(═O)Me | O |
| C-6825 | Me(R) | single bond | H | $CH_2CF_3$ | $CH_2$OC(═O)(t-Bu) | Cl | C(═O)Me | O |
| C-6826 | Me(S) | single bond | H | $CH_2CF_3$ | $CH_2$OC(═O)(t-Bu) | Cl | C(═O)Me | O |

TABLE 383

| Compound Number | Y | W | Z | $R^1$ | $R^2$ | $R^3$ | $R^{10}$ | A |
|---|---|---|---|---|---|---|---|---|
| C-6827 | H | $CH_2$ | Me | $CH_2CF_3$ | $CH_2$OC(═O)(t-Bu) | Cl | C(═O)Me | O |
| C-6828 | Me | $CH_2$ | H | $CH_2CF_3$ | $CH_2$OC(═O)(t-Bu) | Cl | C(═O)Me | O |
| C-6829 | H | CH(Me) | H | $CH_2CF_3$ | $CH_2$OC(═O)(t-Bu) | Cl | C(═O)Me | O |
| C-6830 | H | $CH_2CH_2$ | Me | $CH_2CF_3$ | $CH_2$OC(═O)(t-Bu) | Cl | C(═O)Me | O |
| C-6831 | Me | $CH_2CH_2$ | H | $CH_2CF_3$ | $CH_2$OC(═O)(t-Bu) | Cl | C(═O)Me | O |
| C-6832 | H | single bond | Me | $CH_2CF_3$ | $CH_2$OC(═O)(t-Bu) | Me | C(═O)Me | O |
| C-6833 | Me | single bond | H | $CH_2CF_3$ | $CH_2$OC(═O)(t-Bu) | Me | C(═O)Me | O |
| C-6834 | Me(R) | single bond | H | $CH_2CF_3$ | $CH_2$OC(═O)(t-Bu) | Me | C(═O)Me | O |
| C-6835 | Me(S) | single bond | H | $CH_2CF_3$ | $CH_2$OC(═O)(t-Bu) | Me | C(═O)Me | O |
| C-6836 | H | $CH_2$ | Me | $CH_2CF_3$ | $CH_2$OC(═O)(t-Bu) | Me | C(═O)Me | O |
| C-6837 | Me | $CH_2$ | H | $CH_2CF_3$ | $CH_2$OC(═O)(t-Bu) | Me | C(═O)Me | O |
| C-6838 | H | CH(Me) | H | $CH_2CF_3$ | $CH_2$OC(═O)(t-Bu) | Me | C(═O)Me | O |

TABLE 383-continued

| Compound Number | Y | W | Z | $R^1$ | $R^2$ | $R^3$ | $R^{10}$ | A |
|---|---|---|---|---|---|---|---|---|
| C-6839 | H | $CH_2CH_2$ | Me | $CH_2CF_3$ | $CH_2OC(=O)(t\text{-}Bu)$ | Me | C(=O)Me | O |
| C-6840 | Me | $CH_2CH_2$ | H | $CH_2CF_3$ | $CH_2OC(=O)(t\text{-}Bu)$ | Me | C(=O)Me | O |
| C-6841 | H | single bond | Me | $CH_2CF_3$ | $CH_2OC(=O)OEt$ | Cl | C(=O)Me | O |
| C-6842 | Me | single bond | H | $CH_2CF_3$ | $CH_2OC(=O)OEt$ | Cl | C(=O)Me | O |
| C-6843 | Me(R) | single bond | H | $CH_2CF_3$ | $CH_2OC(=O)OEt$ | Cl | C(=O)Me | O |
| C-6844 | Me(S) | single bond | H | $CH_2CF_3$ | $CH_2OC(=O)OEt$ | Cl | C(=O)Me | O |
| C-6845 | H | $CH_2$ | Me | $CH_2CF_3$ | $CH_2OC(=O)OEt$ | Cl | C(=O)Me | O |
| C-6846 | Me | $CH_2$ | H | $CH_2CF_3$ | $CH_2OC(=O)OEt$ | Cl | C(=O)Me | O |
| C-6847 | H | CH(Me) | H | $CH_2CF_3$ | $CH_2OC(=O)OEt$ | Cl | C(=O)Me | O |
| C-6848 | H | $CH_2CH_2$ | Me | $CH_2CF_3$ | $CH_2OC(=O)OEt$ | Cl | C(=O)Me | O |
| C-6849 | Me | $CH_2CH_2$ | H | $CH_2CF_3$ | $CH_2OC(=O)OEt$ | Cl | C(=O)Me | O |
| C-6850 | H | single bond | Me | $CH_2CF_3$ | $CH_2OC(=O)OEt$ | Me | C(=O)Me | O |
| C-6851 | Me | single bond | H | $CH_2CF_3$ | $CH_2OC(=O)OEt$ | Me | C(=O)Me | O |
| C-6852 | Me(R) | single bond | H | $CH_2CF_3$ | $CH_2OC(=O)OEt$ | Me | C(=O)Me | O |
| C-6853 | Me(S) | single bond | H | $CH_2CF_3$ | $CH_2OC(=O)OEt$ | Me | C(=O)Me | O |
| C-6854 | H | $CH_2$ | Me | $CH_2CF_3$ | $CH_2OC(=O)OEt$ | Me | C(=O)Me | O |
| C-6855 | Me | $CH_2$ | H | $CH_2CF_3$ | $CH_2OC(=O)OEt$ | Me | C(=O)Me | O |
| C-6856 | H | CH(Me) | H | $CH_2CF_3$ | $CH_2OC(=O)OEt$ | Me | C(=O)Me | O |
| C-6857 | H | $CH_2CH_2$ | Me | $CH_2CF_3$ | $CH_2OC(=O)OEt$ | Me | C(=O)Me | O |
| C-6858 | Me | $CH_2CH_2$ | H | $CH_2CF_3$ | $CH_2OC(=O)OEt$ | Me | C(=O)Me | O |
| C-6859 | H | single bond | Me | $CH_2CF_3$ | $CH_2OC(=O)O(i\text{-}Pr)$ | Cl | C(=O)Me | O |
| C-6860 | Me | single bond | H | $CH_2CF_3$ | $CH_2OC(=O)O(i\text{-}Pr)$ | Cl | C(=O)Me | O |
| C-6861 | Me(R) | single bond | H | $CH_2CF_3$ | $CH_2OC(=O)O(i\text{-}Pr)$ | Cl | C(=O)Me | O |
| C-6862 | Me(S) | single bond | H | $CH_2CF_3$ | $CH_2OC(=O)O(i\text{-}Pr)$ | Cl | C(=O)Me | O |
| C-6863 | H | $CH_2$ | Me | $CH_2CF_3$ | $CH_2OC(=O)O(i\text{-}Pr)$ | Cl | C(=O)Me | O |
| C-6864 | Me | $CH_2$ | H | $CH_2CF_3$ | $CH_2OC(=O)O(i\text{-}Pr)$ | Cl | C(=O)Me | O |
| C-6865 | H | CH(Me) | H | $CH_2CF_3$ | $CH_2OC(=O)O(i\text{-}Pr)$ | Cl | C(=O)Me | O |
| C-6866 | H | $CH_2CH_2$ | Me | $CH_2CF_3$ | $CH_2OC(=O)O(i\text{-}Pr)$ | Cl | C(=O)Me | O |
| C-6867 | Me | $CH_2CH_2$ | H | $CH_2CF_3$ | $CH_2OC(=O)O(i\text{-}Pr)$ | Cl | C(=O)Me | O |
| C-6868 | H | single bond | Me | $CH_2CF_3$ | $CH_2OC(=O)O(i\text{-}Pr)$ | Me | C(=O)Me | O |
| C-6869 | Me | single bond | H | $CH_2CF_3$ | $CH_2OC(=O)O(i\text{-}Pr)$ | Me | C(=O)Me | O |
| C-6870 | Me(R) | single bond | H | $CH_2CF_3$ | $CH_2OC(=O)O(i\text{-}Pr)$ | Me | C(=O)Me | O |

TABLE 384

| Compound Number | Y | W | Z | $R^1$ | $R^2$ | $R^3$ | $R^{10}$ | A |
|---|---|---|---|---|---|---|---|---|
| C-6871 | Me(S) | single bond | H | $CH_2CF_3$ | $CH_2OC(=O)O(i\text{-}Pr)$ | Me | C(=O)Me | O |
| C-6872 | H | $CH_2$ | Me | $CH_2CF_3$ | $CH_2OC(=O)O(i\text{-}Pr)$ | Me | C(=O)Me | O |
| C-6873 | Me | $CH_2$ | H | $CH_2CF_3$ | $CH_2OC(=O)O(i\text{-}Pr)$ | Me | C(=O)Me | O |
| C-6874 | H | CH(Me) | H | $CH_2CF_3$ | $CH_2OC(=O)O(i\text{-}Pr)$ | Me | C(=O)Me | O |
| C-6875 | H | $CH_2CH_2$ | Me | $CH_2CF_3$ | $CH_2OC(=O)O(i\text{-}Pr)$ | Me | C(=O)Me | O |
| C-6876 | Me | $CH_2CH_2$ | H | $CH_2CF_3$ | $CH_2OC(=O)O(i\text{-}Pr)$ | Me | C(=O)Me | O |
| C-6877 | H | single bond | Me | $CH_2CF_3$ | $CH_2N(Me)C(=O)OMe$ | Cl | C(=O)Me | O |
| C-6878 | Me | single bond | H | $CH_2CF_3$ | $CH_2N(Me)C(=O)OMe$ | Cl | C(=O)Me | O |
| C-6879 | Me(R) | single bond | H | $CH_2CF_3$ | $CH_2N(Me)C(=O)OMe$ | Cl | C(=O)Me | O |
| C-6880 | Me(S) | single bond | H | $CH_2CF_3$ | $CH_2N(Me)C(=O)OMe$ | Cl | C(=O)Me | O |
| C-6881 | H | $CH_2$ | Me | $CH_2CF_3$ | $CH_2N(Me)C(=O)OMe$ | Cl | C(=O)Me | O |
| C-6882 | Me | $CH_2$ | H | $CH_2CF_3$ | $CH_2N(Me)C(=O)OMe$ | Cl | C(=O)Me | O |
| C-6883 | H | CH(Me) | H | $CH_2CF_3$ | $CH_2N(Me)C(=O)OMe$ | Cl | C(=O)Me | O |
| C-6884 | H | $CH_2CH_2$ | Me | $CH_2CF_3$ | $CH_2N(Me)C(=O)OMe$ | Cl | C(=O)Me | O |
| C-6885 | Me | $CH_2CH_2$ | H | $CH_2CF_3$ | $CH_2N(Me)C(=O)OMe$ | Cl | C(=O)Me | O |
| C-6886 | H | single bond | Me | $CH_2CF_3$ | $CH_2N(Me)C(=O)OMe$ | Me | C(=O)Me | O |
| C-6887 | Me | single bond | H | $CH_2CF_3$ | $CH_2N(Me)C(=O)OMe$ | Me | C(=O)Me | O |
| C-6888 | Me(R) | single bond | H | $CH_2CF_3$ | $CH_2N(Me)C(=O)OMe$ | Me | C(=O)Me | O |
| C-6889 | Me(S) | single bond | H | $CH_2CF_3$ | $CH_2N(Me)C(=O)OMe$ | Me | C(=O)Me | O |
| C-6890 | H | $CH_2$ | Me | $CH_2CF_3$ | $CH_2N(Me)C(=O)OMe$ | Me | C(=O)Me | O |
| C-6891 | Me | $CH_2$ | H | $CH_2CF_3$ | $CH_2N(Me)C(=O)OMe$ | Me | C(=O)Me | O |
| C-6892 | H | CH(Me) | H | $CH_2CF_3$ | $CH_2N(Me)C(=O)OMe$ | Me | C(=O)Me | O |
| C-6893 | H | $CH_2CH_2$ | Me | $CH_2CF_3$ | $CH_2N(Me)C(=O)OMe$ | Me | C(=O)Me | O |
| C-6894 | Me | $CH_2CH_2$ | H | $CH_2CF_3$ | $CH_2N(Me)C(=O)OMe$ | Me | C(=O)Me | O |
| C-6895 | H | single bond | Me | Et | $C(=O)OCH_2CH=CH_2$ | Cl | H | O |
| C-6896 | Me | single bond | H | Et | $C(=O)OCH_2CH=CH_2$ | Cl | H | O |
| C-6897 | Me(R) | single bond | H | Et | $C(=O)OCH_2CH=CH_2$ | Cl | H | O |
| C-6898 | Me(S) | single bond | H | Et | $C(=O)OCH_2CH=CH_2$ | Cl | H | O |
| C-6899 | H | $CH_2$ | Me | Et | $C(=O)OCH_2CH=CH_2$ | Cl | H | O |
| C-6900 | Me | $CH_2$ | H | Et | $C(=O)OCH_2CH=CH_2$ | Cl | H | O |
| C-6901 | H | CH(Me) | H | Et | $C(=O)OCH_2CH=CH_2$ | Cl | H | O |
| C-6902 | H | $CH_2CH_2$ | Me | Et | $C(=O)OCH_2CH=CH_2$ | Cl | H | O |
| C-6903 | Me | $CH_2CH_2$ | H | Et | $C(=O)OCH_2CH=CH_2$ | Cl | H | O |
| C-6904 | H | single bond | Me | Et | $C(=O)OCH_2CH=CH_2$ | Me | H | O |
| C-6905 | Me | single bond | H | Et | $C(=O)OCH_2CH=CH_2$ | Me | H | O |

TABLE 384-continued

| Compound Number | Y | W | Z | $R^1$ | $R^2$ | $R^3$ | $R^{10}$ | A |
|---|---|---|---|---|---|---|---|---|
| C-6906 | Me(R) | single bond | H | Et | $C(=O)OCH_2CH=CH_2$ | Me | H | O |
| C-6907 | Me(S) | single bond | H | Et | $C(=O)OCH_2CH=CH_2$ | Me | H | O |
| C-6908 | H | $CH_2$ | Me | Et | $C(=O)OCH_2CH=CH_2$ | Me | H | O |
| C-6909 | Me | $CH_2$ | H | Et | $C(=O)OCH_2CH=CH_2$ | Me | H | O |
| C-6910 | H | CH(Me) | H | Et | $C(=O)OCH_2CH=CH_2$ | Me | H | O |
| C-6911 | H | $CH_2CH_2$ | Me | Et | $C(=O)OCH_2CH=CH_2$ | Me | H | O |
| C-6912 | Me | $CH_2CH_2$ | H | Et | $C(=O)OCH_2CH=CH_2$ | Me | H | O |
| C-6913 | H | single bond | Me | Et | $C(=O)OCH_2CCl_3$ | Cl | H | O |
| C-6914 | Me | single bond | H | Et | $C(=O)OCH_2CCl_3$ | Cl | H | O |

TABLE 385

| Compound Number | Y | W | Z | $R^1$ | $R^2$ | $R^3$ | $R^{10}$ | A |
|---|---|---|---|---|---|---|---|---|
| C-6915 | Me(R) | single bond | H | Et | $C(=O)OCH_2CCl_3$ | Cl | H | O |
| C-6916 | Me(S) | single bond | H | Et | $C(=O)OCH_2CCl_3$ | Cl | H | O |
| C-6917 | H | $CH_2$ | Me | Et | $C(=O)OCH_2CCl_3$ | Cl | H | O |
| C-6918 | Me | $CH_2$ | H | Et | $C(=O)OCH_2CCl_3$ | Cl | H | O |
| C-6919 | H | CH(Me) | H | Et | $C(=O)OCH_2CCl_3$ | Cl | H | O |
| C-6920 | H | $CH_2CH_2$ | Me | Et | $C(=O)OCH_2CCl_3$ | Cl | H | O |
| C-6921 | Me | $CH_2CH_2$ | H | Et | $C(=O)OCH_2CCl_3$ | Cl | H | O |
| C-6922 | H | single bond | Me | Et | $C(=O)OCH_2CCl_3$ | Me | H | O |
| C-6923 | Me | single bond | H | Et | $C(=O)OCH_2CCl_3$ | Me | H | O |
| C-6924 | Me(R) | single bond | H | Et | $C(=O)OCH_2CCl_3$ | Me | H | O |
| C-6925 | Me(S) | single bond | H | Et | $C(=O)OCH_2CCl_3$ | Me | H | O |
| C-6926 | H | $CH_2$ | Me | Et | $C(=O)OCH_2CCl_3$ | Me | H | O |
| C-6927 | Me | $CH_2$ | H | Et | $C(=O)OCH_2CCl_3$ | Me | H | O |
| C-6928 | H | CH(Me) | H | Et | $C(=O)OCH_2CCl_3$ | Me | H | O |
| C-6929 | H | $CH_2CH_2$ | Me | Et | $C(=O)OCH_2CCl_3$ | Me | H | O |
| C-6930 | Me | $CH_2CH_2$ | H | Et | $C(=O)OCH_2CCl_3$ | Me | H | O |
| C-6931 | H | single bond | Me | Et | $C(=O)N(Me)_2$ | Cl | H | O |
| C-6932 | Me | single bond | H | Et | $C(=O)N(Me)_2$ | Cl | H | O |
| C-6933 | Me(R) | single bond | H | Et | $C(=O)N(Me)_2$ | Cl | H | O |
| C-6934 | Me(S) | single bond | H | Et | $C(=O)N(Me)_2$ | Cl | H | O |
| C-6935 | H | $CH_2$ | Me | Et | $C(=O)N(Me)_2$ | Cl | H | O |
| C-6936 | Me | $CH_2$ | H | Et | $C(=O)N(Me)_2$ | Cl | H | O |
| C-6937 | H | CH(Me) | H | Et | $C(=O)N(Me)_2$ | Cl | H | O |
| C-6938 | H | $CH_2CH_2$ | Me | Et | $C(=O)N(Me)_2$ | Cl | H | O |
| C-6939 | Me | $CH_2CH_2$ | H | Et | $C(=O)N(Me)_2$ | Cl | H | O |
| C-6940 | H | single bond | Me | Et | $C(=O)N(Me)_2$ | Me | H | O |
| C-6941 | Me | single bond | H | Et | $C(=O)N(Me)_2$ | Me | H | O |
| C-6942 | Me(R) | single bond | H | Et | $C(=O)N(Me)_2$ | Me | H | O |
| C-6943 | Me(S) | single bond | H | Et | $C(=O)N(Me)_2$ | Me | H | O |
| C-6944 | H | $CH_2$ | Me | Et | $C(=O)N(Me)_2$ | Me | H | O |
| C-6945 | Me | $CH_2$ | H | Et | $C(=O)N(Me)_2$ | Me | H | O |
| C-6946 | H | CH(Me) | H | Et | $C(=O)N(Me)_2$ | Me | H | O |
| C-6947 | H | $CH_2CH_2$ | Me | Et | $C(=O)N(Me)_2$ | Me | H | O |
| C-6948 | Me | $CH_2CH_2$ | H | Et | $C(=O)N(Me)_2$ | Me | H | O |
| C-6949 | H | single bond | Me | Et | $CH_2OC(=O)Me$ | Cl | H | O |
| C-6950 | Me | single bond | H | Et | $CH_2OC(=O)Me$ | Cl | H | O |
| C-6951 | Me(R) | single bond | H | Et | $CH_2OC(=O)Me$ | Cl | H | O |
| C-6952 | Me(S) | single bond | H | Et | $CH_2OC(=O)Me$ | Cl | H | O |
| C-6953 | H | $CH_2$ | Me | Et | $CH_2OC(=O)Me$ | Cl | H | O |
| C-6954 | Me | $CH_2$ | H | Et | $CH_2OC(=O)Me$ | Cl | H | O |
| C-6955 | H | CH(Me) | H | Et | $CH_2OC(=O)Me$ | Cl | H | O |
| C-6956 | H | $CH_2CH_2$ | Me | Et | $CH_2OC(=O)Me$ | Cl | H | O |
| C-6957 | Me | $CH_2CH_2$ | H | Et | $CH_2OC(=O)Me$ | Cl | H | O |
| C-6958 | H | single bond | Me | Et | $CH_2OC(=O)Me$ | Me | H | O |

TABLE 386

| Compound Number | Y | W | Z | $R^1$ | $R^2$ | $R^3$ | $R^{10}$ | A |
|---|---|---|---|---|---|---|---|---|
| C-6959 | Me | single bond | H | Et | $CH_2OC(=O)Me$ | Me | H | O |
| C-6960 | Me(R) | single bond | I | Et | $CH_2OC(=O)Me$ | Me | H | O |
| C-6961 | Me(S) | single bond | H | Et | $CH_2OC(=O)Me$ | Me | H | O |

TABLE 386-continued

| Compound Number | Y | W | Z | $R^1$ | $R^2$ | $R^3$ | $R^{10}$ | A |
|---|---|---|---|---|---|---|---|---|
| C-6962 | H | $CH_2$ | Me | Et | $CH_2OC(=O)Me$ | Me | H | O |
| C-6963 | Me | $CH_2$ | H | Et | $CH_2OC(=O)Me$ | Me | H | O |
| C-6964 | H | CH(Me) | H | Et | $CH_2OC(=O)Me$ | Me | H | O |
| C-6965 | H | $CH_2CH_2$ | Me | Et | $CH_2OC(=O)Me$ | Me | H | O |
| C-6966 | Me | $CH_2CH_2$ | H | Et | $CH_2OC(=O)Me$ | Me | H | O |
| C-6967 | H | single bond | Me | Et | $CH_2OC(=O)$(i-Pr) | Cl | H | O |
| C-6968 | Me | single bond | H | Et | $CH_2OC(=O)$(i-Pr) | Cl | H | O |
| C-6969 | Me(R) | single bond | H | Et | $CH_2OC(=O)$(i-Pr) | Cl | H | O |
| C-6970 | Me(S) | single bond | H | Et | $CH_2OC(=O)$(i-Pr) | Cl | H | O |
| C-6971 | H | $CH_2$ | Me | Et | $CH_2OC(=O)$(i-Pr) | Cl | H | O |
| C-6972 | Me | $CH_2$ | H | Et | $CH_2OC(=O)$(i-Pr) | Cl | H | O |
| C-6973 | H | CH(Me) | H | Et | $CH_2OC(=O)$(i-Pr) | Cl | H | O |
| C-6974 | H | $CH_2CH_2$ | Me | Et | $CH_2OC(=O)$(i-Pr) | Cl | H | O |
| C-6975 | Me | $CH_2CH_2$ | H | Et | $CH_2OC(=O)$(i-Pr) | Cl | H | O |
| C-6976 | H | single bond | Me | Et | $CH_2OC(=O)$(i-Pr) | Me | H | O |
| C-6977 | Me | single bond | H | Et | $CH_2OC(=O)$(i-Pr) | Me | H | O |
| C-6978 | Me(R) | single bond | H | Et | $CH_2OC(=O)$(i-Pr) | Me | H | O |
| C-6979 | Me(S) | single bond | H | Et | $CH_2OC(=O)$(i-Pr) | Me | H | O |
| C-6980 | H | $CH_2$ | Me | Et | $CH_2OC(=O)$(i-Pr) | Me | H | O |
| C-6981 | Me | $CH_2$ | H | Et | $CH_2OC(=O)$(i-Pr) | Me | H | O |
| C-6982 | H | CH(Me) | H | Et | $CH_2OC(=O)$(i-Pr) | Me | H | O |
| C-6983 | H | $CH_2CH_2$ | Me | Et | $CH_2OC(=O)$(i-Pr) | Me | H | O |
| C-6984 | Me | $CH_2CH_2$ | H | Et | $CH_2OC(=O)$(i-Pr) | Me | H | O |
| C-6985 | H | single bond | Me | Et | $CH_2OC(=O)$(t-Bu) | Cl | H | O |
| C-6986 | Me | single bond | H | Et | $CH_2OC(=O)$(t-Bu) | Cl | H | O |
| C-6987 | Me(R) | single bond | H | Et | $CH_2OC(=O)$(t-Bu) | Cl | H | O |
| C-6988 | Me(S) | single bond | H | Et | $CH_2OC(=O)$(t-Bu) | Cl | H | O |
| C-6989 | H | $CH_2$ | Me | Et | $CH_2OC(=O)$(t-Bu) | Cl | H | O |
| C-6990 | Me | $CH_2$ | H | Et | $CH_2OC(=O)$(t-Bu) | Cl | H | O |
| C-6991 | H | CH(Me) | H | Et | $CH_2OC(=O)$(t-Bu) | Cl | H | O |
| C-6992 | H | $CH_2CH_2$ | Me | Et | $CH_2OC(=O)$(t-Bu) | Cl | H | O |
| C-6993 | Me | $CH_2CH_2$ | H | Et | $CH_2OC(=O)$(t-Bu) | Cl | H | O |
| C-6994 | H | single bond | Me | Et | $CH_2OC(=O)$(t-Bu) | Me | H | O |
| C-6995 | Me | single bond | H | Et | $CH_2OC(=O)$(t-Bu) | Me | H | O |
| C-6996 | Me(R) | single bond | H | Et | $CH_2OC(=O)$(t-Bu) | Me | H | O |
| C-6997 | Me(S) | single bond | H | Et | $CH_2OC(=O)$(t-Bu) | Me | H | O |
| C-6998 | H | $CH_2$ | Me | Et | $CH_2OC(=O)$(t-Bu) | Me | H | O |
| C-6999 | Me | $CH_2$ | H | Et | $CH_2OC(=O)$(t-Bu) | Me | H | O |
| C-7000 | H | CH(Me) | H | Et | $CH_2OC(=O)$(t-Bu) | Me | H | O |
| C-7001 | H | $CH_2CH_2$ | Me | Et | $CH_2OC(=O)$(t-Bu) | Me | H | O |
| C-7002 | Me | $CH_2CH_2$ | H | Et | $CH_2OC(=O)$(t-Bu) | Me | H | O |

TABLE 387

| Compound Number | Y | W | Z | $R^1$ | $R^2$ | $R^3$ | $R^{10}$ | A |
|---|---|---|---|---|---|---|---|---|
| C-7003 | H | single bond | Me | Et | $CH_2OC(=O)OEt$ | Cl | H | O |
| C-7004 | Me | single bond | H | Et | $CH_2OC(=O)OEt$ | Cl | H | O |
| C-7005 | Me(R) | single bond | H | Et | $CH_2OC(=O)OEt$ | Cl | H | O |
| C-7006 | Me(S) | single bond | H | Et | $CH_2OC(=O)OEt$ | Cl | H | O |
| C-7007 | H | $CH_2$ | Me | Et | $CH_2OC(=O)OEt$ | Cl | H | O |
| C-7008 | Me | $CH_2$ | H | Et | $CH_2OC(=O)OEt$ | Cl | H | O |
| C-7009 | H | CH(Me) | H | Et | $CH_2OC(=O)OEt$ | Cl | H | O |
| C-7010 | H | $CH_2CH_2$ | Me | Et | $CH_2OC(=O)OEt$ | Cl | H | O |
| C-7011 | Me | $CH_2CH_2$ | H | Et | $CH_2OC(=O)OEt$ | Cl | H | O |
| C-7012 | H | single bond | Me | Et | $CH_2OC(=O)OEt$ | Me | H | O |
| C-7013 | Me | single bond | H | Et | $CH_2OC(=O)OEt$ | Me | H | O |
| C-7014 | Me(R) | single bond | H | Et | $CH_2OC(=O)OEt$ | Me | H | O |
| C-7015 | Me(S) | single bond | H | Et | $CH_2OC(=O)OEt$ | Me | H | O |
| C-7016 | H | $CH_2$ | Me | Et | $CH_2OC(=O)OEt$ | Me | H | O |
| C-7017 | Me | $CH_2$ | H | Et | $CH_2OC(=O)OEt$ | Me | H | O |
| C-7018 | H | CH(Me) | H | Et | $CH_2OC(=O)OEt$ | Me | H | O |
| C-7019 | H | $CH_2CH_2$ | Me | Et | $CH_2OC(=O)OEt$ | Me | H | O |
| C-7020 | Me | $CH_2CH_2$ | H | Et | $CH_2OC(=O)OEt$ | Me | H | O |
| C-7021 | H | single bond | Me | Et | $CH_2OC(=O)O$(i-Pr) | Cl | H | O |
| C-7022 | Me | single bond | H | Et | $CH_2OC(=O)O$(i-Pr) | Cl | H | O |
| C-7023 | Me(R) | single bond | H | Et | $CH_2OC(=O)O$(i-Pr) | Cl | H | O |
| C-7024 | Me(S) | single bond | H | Et | $CH_2OC(=O)O$(i-Pr) | Cl | H | O |
| C-7025 | H | $CH_2$ | Me | Et | $CH_2OC(=O)O$(i-Pr) | Cl | H | O |
| C-7026 | Me | $CH_2$ | H | Et | $CH_2OC(=O)O$(i-Pr) | Cl | H | O |
| C-7027 | H | CH(Me) | H | Et | $CH_2OC(=O)O$(i-Pr) | Cl | H | O |
| C-7028 | H | $CH_2CH_2$ | Me | Et | $CH_2OC(=O)O$(i-Pr) | Cl | H | O |

TABLE 387-continued

| Compound Number | Y | W | Z | $R^1$ | $R^2$ | $R^3$ | $R^{10}$ | A |
|---|---|---|---|---|---|---|---|---|
| C-7029 | Me | $CH_2CH_2$ | H | Et | $CH_2OC(=O)O(i\text{-}Pr)$ | Cl | H | O |
| C-7030 | H | single bond | Me | Et | $CH_2OC(=O)O(i\text{-}Pr)$ | Me | H | O |
| C-7031 | Me | single bond | H | Et | $CH_2OC(=O)O(i\text{-}Pr)$ | Me | H | O |
| C-7032 | Me(R) | single bond | H | Et | $CH_2OC(=O)O(i\text{-}Pr)$ | Me | H | O |
| C-7033 | Me(S) | single bond | H | Et | $CH_2OC(=O)O(i\text{-}Pr)$ | Me | H | O |
| C-7034 | H | $CH_2$ | Me | Et | $CH_2OC(=O)O(i\text{-}Pr)$ | Me | H | O |
| C-7035 | Me | $CH_2$ | H | Et | $CH_2OC(=O)O(i\text{-}Pr)$ | Me | H | O |
| C-7036 | H | CH(Me) | H | Et | $CH_2OC(=O)O(i\text{-}Pr)$ | Me | H | O |
| C-7037 | H | $CH_2CH_2$ | Me | Et | $CH_2OC(=O)O(i\text{-}Pr)$ | Me | H | O |
| C-7038 | Me | $CH_2CH_2$ | H | Et | $CH_2OC(=O)O(i\text{-}Pr)$ | Me | H | O |
| C-7039 | H | single bond | Me | Et | $CH_2N(Me)C(=O)OMe$ | Cl | H | O |
| C-7040 | Me | single bond | H | Et | $CH_2N(Me)C(=O)OMe$ | Cl | H | O |
| C-7041 | Me(R) | single bond | H | Et | $CH_2N(Me)C(=O)OMe$ | Cl | H | O |
| C-7042 | Me(S) | single bond | H | Et | $CH_2N(Me)C(=O)OMe$ | Cl | H | O |
| C-7043 | H | $CH_2$ | Me | Et | $CH_2N(Me)C(=O)OMe$ | Cl | H | O |
| C-7044 | Me | $CH_2$ | H | Et | $CH_2N(Me)C(=O)OMe$ | Cl | H | O |
| C-7045 | H | CH(Me) | H | Et | $CH_2N(Me)C(=O)OMe$ | Cl | H | O |
| C-7046 | H | $CH_2CH_2$ | Me | Et | $CH_2N(Me)C(=O)OMe$ | Cl | H | O |

TABLE 388

| Compound Number | Y | W | Z | $R^1$ | $R^2$ | $R^3$ | $R^{10}$ | A |
|---|---|---|---|---|---|---|---|---|
| C-7047 | Me | $CH_2CH_2$ | H | Et | $CH_2N(Me)C(=O)OMe$ | Cl | H | O |
| C-7048 | H | single bond | Me | Et | $CH_2N(Me)C(=O)OMe$ | Me | H | O |
| C-7049 | Me | single bond | H | Et | $CH_2N(Me)C(=O)OMe$ | Me | H | O |
| C-7050 | Me(R) | single bond | H | Et | $CH_2N(Me)C(=O)OMe$ | Me | H | O |
| C-7051 | Me(S) | single bond | H | Et | $CH_2N(Me)C(=O)OMe$ | Me | H | O |
| C-7052 | H | $CH_2$ | Me | Et | $CH_2N(Me)C(=O)OMe$ | Me | H | O |
| C-7053 | Me | $CH_2$ | H | Et | $CH_2N(Me)C(=O)OMe$ | Me | H | O |
| C-7054 | H | CH(Me) | H | Et | $CH_2N(Me)C(=O)OMe$ | Me | H | O |
| C-7055 | H | $CH_2CH_2$ | Me | Et | $CH_2N(Me)C(=O)OMe$ | Me | H | O |
| C-7056 | Me | $CH_2CH_2$ | H | Et | $CH_2N(Me)C(=O)OMe$ | Me | H | O |
| C-7057 | H | single bond | Me | Et | $C(=O)OCH_2CH=CH_2$ | Cl | Me | O |
| C-7058 | Me | single bond | H | Et | $C(=O)OCH_2CH=CH_2$ | Cl | Me | O |
| C-7059 | Me(R) | single bond | H | Et | $C(=O)OCH_2CH=CH_2$ | Cl | Me | O |
| C-7060 | Me(S) | single bond | H | Et | $C(=O)OCH_2CH=CH_2$ | Cl | Me | O |
| C-7061 | H | $CH_2$ | Me | Et | $C(=O)OCH_2CH=CH_2$ | Cl | Me | O |
| C-7062 | Me | $CH_2$ | H | Et | $C(=O)OCH_2CH=CH_2$ | Cl | Me | O |
| C-7063 | H | CH(Me) | H | Et | $C(=O)OCH_2CH=CH_2$ | Cl | Me | O |
| C-7064 | H | $CH_2CH_2$ | Me | Et | $C(=O)OCH_2CH=CH_2$ | Cl | Me | O |
| C-7065 | Me | $CH_2CH_2$ | H | Et | $C(=O)OCH_2CH=CH_2$ | Cl | Me | O |
| C-7066 | H | single bond | Me | Et | $C(=O)OCH_2CH=CH_2$ | Me | Me | O |
| C-7067 | Me | single bond | H | Et | $C(=O)OCH_2CH=CH_2$ | Me | Me | O |
| C-7068 | Me(R) | single bond | H | Et | $C(=O)OCH_2CH=CH_2$ | Me | Me | O |
| C-7069 | Me(S) | single bond | H | Et | $C(=O)OCH_2CH=CH_2$ | Me | Me | O |
| C-7070 | H | $CH_2$ | Me | Et | $C(=O)OCH_2CH=CH_2$ | Me | Me | O |
| C-7071 | Me | $CH_2$ | H | Et | $C(=O)OCH_2CH=CH_2$ | Me | Me | O |
| C-7072 | H | CH(Me) | H | Et | $C(=O)OCH_2CH=CH_2$ | Me | Me | O |
| C-7073 | H | $CH_2CH_2$ | Me | Et | $C(=O)OCH_2CH=CH_2$ | Me | Me | O |
| C-7074 | Me | $CH_2CH_2$ | H | Et | $C(=O)OCH_2CH=CH_2$ | Me | Me | O |
| C-7075 | H | single bond | Me | Et | $C(=O)OCH_2CCl_3$ | Cl | Me | O |
| C-7076 | Me | single bond | H | Et | $C(=O)OCH_2CCl_3$ | Cl | Me | O |
| C-7077 | Me(R) | single bond | H | Et | $C(=O)OCH_2CCl_3$ | Cl | Me | O |
| C-7078 | Me(S) | single bond | H | Et | $C(=O)OCH_2CCl_3$ | Cl | Me | O |
| C-7079 | H | $CH_2$ | Me | Et | $C(=O)OCH_2CCl_3$ | Cl | Me | O |
| C-7080 | Me | $CH_2$ | H | Et | $C(=O)OCH_2CCl_3$ | Cl | Me | O |
| C-7081 | H | CH(Me) | H | Et | $C(=O)OCH_2CCl_3$ | Cl | Me | O |
| C-7082 | H | $CH_2CH_2$ | Me | Et | $C(=O)OCH_2CCl_3$ | Cl | Me | O |
| C-7083 | Me | $CH_2CH_2$ | H | Et | $C(=O)OCH_2CCl_3$ | Cl | Me | O |
| C-7084 | H | single bond | Me | Et | $C(=O)OCH_2CCl_3$ | Me | Me | O |
| C-7085 | Me | single bond | H | Et | $C(=O)OCH_2CCl_3$ | Me | Me | O |
| C-7086 | Me(R) | single bond | H | Et | $C(=O)OCH_2CCl_3$ | Me | Me | O |
| C-7087 | Me(S) | single bond | H | Et | $C(=O)OCH_2CCl_3$ | Me | Me | O |
| C-7088 | H | $CH_2$ | Me | Et | $C(=O)OCH_2CCl_3$ | Me | Me | O |
| C-7089 | Me | $CH_2$ | H | Et | $C(=O)OCH_2CCl_3$ | Me | Me | O |
| C-7090 | H | CH(Me) | H | Et | $C(=O)OCH_2CCl_3$ | Me | Me | O |

TABLE 389

| Compound Number | Y | W | Z | $R^1$ | $R^2$ | $R^3$ | $R^{10}$ | A |
|---|---|---|---|---|---|---|---|---|
| C-7091 | H | $CH_2CH_2$ | Me | Et | $C(=O)OCH_2CCl_3$ | Me | Me | O |
| C-7092 | Me | $CH_2CH_2$ | H | Et | $C(=O)OCH_2CCl_3$ | Me | Me | O |
| C-7093 | H | single bond | Me | Et | $C(=O)N(Me)_2$ | Cl | Me | O |
| C-7094 | Me | single bond | H | Et | $C(=O)N(Me)_2$ | Cl | Me | O |
| C-7095 | Me(R) | single bond | H | Et | $C(=O)N(Me)_2$ | Cl | Me | O |
| C-7096 | Me(S) | single bond | H | Et | $C(=O)N(Me)_2$ | Cl | Me | O |
| C-7097 | H | $CH_2$ | Me | Et | $C(=O)N(Me)_2$ | Cl | Me | O |
| C-7098 | Me | $CH_2$ | H | Et | $C(=O)N(Me)_2$ | Cl | Me | O |
| C-7099 | H | CH(Me) | H | Et | $C(=O)N(Me)_2$ | Cl | Me | O |
| C-7100 | H | $CH_2CH_2$ | Me | Et | $C(=O)N(Me)_2$ | Cl | Me | O |
| C-7101 | Me | $CH_2CH_2$ | H | Et | $C(=O)N(Me)_2$ | Cl | Me | O |
| C-7102 | H | single bond | Me | Et | $C(=O)N(Me)_2$ | Me | Me | O |
| C-7103 | Me | single bond | H | Et | $C(=O)N(Me)_2$ | Me | Me | O |
| C-7104 | Me(R) | single bond | H | Et | $C(=O)N(Me)_2$ | Me | Me | O |
| C-7105 | Me(S) | single bond | H | Et | $C(=O)N(Me)_2$ | Me | Me | O |
| C-7106 | H | $CH_2$ | Me | Et | $C(=O)N(Me)_2$ | Me | Me | O |
| C-7107 | Me | $CH_2$ | H | Et | $C(=O)N(Me)_2$ | Me | Me | O |
| C-7108 | H | CH(Me) | H | Et | $C(=O)N(Me)_2$ | Me | Me | O |
| C-7109 | H | $CH_2CH_2$ | Me | Et | $C(=O)N(Me)_2$ | Me | Me | O |
| C-7110 | Me | $CH_2CH_2$ | H | Et | $C(=O)N(Me)_2$ | Me | Me | O |
| C-7111 | H | single bond | Me | Et | $CH_2OC(=O)Me$ | Cl | Me | O |
| C-7112 | Me | single bond | H | Et | $CH_2OC(=O)Me$ | Cl | Me | O |
| C-7113 | Me(R) | single bond | H | Et | $CH_2OC(=O)Me$ | Cl | Me | O |
| C-7114 | Me(S) | single bond | H | Et | $CH_2OC(=O)Me$ | Cl | Me | O |
| C-7115 | H | $CH_2$ | Me | Et | $CH_2OC(=O)Me$ | Cl | Me | O |
| C-7116 | Me | $CH_2$ | H | Et | $CH_2OC(=O)Me$ | Cl | Me | O |
| C-7117 | H | CH(Me) | H | Et | $CH_2OC(=O)Me$ | Cl | Me | O |
| C-7118 | H | $CH_2CH_2$ | Me | Et | $CH_2OC(=O)Me$ | Cl | Me | O |
| C-7119 | Me | $CH_2CH_2$ | H | Et | $CH_2OC(=O)Me$ | Cl | Me | O |
| C-7120 | H | single bond | Me | Et | $CH_2OC(=O)Me$ | Me | Me | O |
| C-7121 | Me | single bond | H | Et | $CH_2OC(=O)Me$ | Me | Me | O |
| C-7122 | Me(R) | single bond | H | Et | $CH_2OC(=O)Me$ | Me | Me | O |
| C-7123 | Me(S) | single bond | H | Et | $CH_2OC(=O)Me$ | Me | Me | O |
| C-7124 | H | $CH_2$ | Me | Et | $CH_2OC(=O)Me$ | Me | Me | O |
| C-7125 | Me | $CH_2$ | H | Et | $CH_2OC(=O)Me$ | Me | Me | O |
| C-7126 | H | CH(Me) | H | Et | $CH_2OC(=O)Me$ | Me | Me | O |
| C-7127 | H | $CH_2CH_2$ | Me | Et | $CH_2OC(=O)Me$ | Me | Me | O |
| C-7128 | Me | $CH_2CH_2$ | H | Et | $CH_2OC(=O)Me$ | Me | Me | O |
| C-7129 | H | single bond | Me | Et | $CH_2OC(=O)$(i-Pr) | Cl | Me | O |
| C-7130 | Me | single bond | H | Et | $CH_2OC(=O)$(i-Pr) | Cl | Me | O |
| C-7131 | Me(R) | single bond | H | Et | $CH_2OC(=O)$(i-Pr) | Cl | Me | O |
| C-7132 | Me(S) | single bond | H | Et | $CH_2OC(=O)$(i-Pr) | Cl | Me | O |
| C-7133 | H | $CH_2$ | Me | Et | $CH_2OC(=O)$(i-Pr) | Cl | Me | O |
| C-7134 | Me | $CH_2$ | H | Et | $CH_2OC(=O)$(i-Pr) | Cl | Me | O |

TABLE 390

| Compound Number | Y | W | Z | $R^1$ | $R^2$ | $R^3$ | $R^{10}$ | A |
|---|---|---|---|---|---|---|---|---|
| C-7135 | H | CH(Me) | H | Et | $CH_2OC(=O)$(i-Pr) | Cl | Me | O |
| C-7136 | H | $CH_2CH_2$ | Me | Et | $CH_2OC(=O)$(i-Pr) | Cl | Me | O |
| C-7137 | Me | $CH_2CH_2$ | H | Et | $CH_2OC(=O)$(i-Pr) | Cl | Me | O |
| C-7138 | H | single bond | Me | Et | $CH_2OC(=O)$(i-Pr) | Me | Me | O |
| C-7139 | Me | single bond | H | Et | $CH_2OC(=O)$(i-Pr) | Me | Me | O |
| C-7140 | Me(R) | single bond | H | Et | $CH_2OC(=O)$(i-Pr) | Me | Me | O |
| C-7141 | Me(S) | single bond | H | Et | $CH_2OC(=O)$(i-Pr) | Me | Me | O |
| C-7142 | H | $CH_2$ | Me | Et | $CH_2OC(=O)$(i-Pr) | Me | Me | O |
| C-7143 | Me | $CH_2$ | H | Et | $CH_2OC(=O)$(i-Pr) | Me | Me | O |
| C-7144 | H | CH(Me) | H | Et | $CH_2OC(=O)$(i-Pr) | Me | Me | O |
| C-7145 | H | $CH_2CH_2$ | Me | Et | $CH_2OC(=O)$(i-Pr) | Me | Me | O |
| C-7146 | Me | $CH_2CH_2$ | H | Et | $CH_2OC(=O)$(i-Pr) | Me | Me | O |
| C-7147 | H | single bond | Me | Et | $CH_2OC(=O)$(t-Bu) | Cl | Me | O |
| C-7148 | Me | single bond | H | Et | $CH_2OC(=O)$(t-Bu) | Cl | Me | O |
| C-7149 | Me(R) | single bond | H | Et | $CH_2OC(=O)$(t-Bu) | Cl | Me | O |
| C-7150 | Me(S) | single bond | H | Et | $CH_2OC(=O)$(t-Bu) | Cl | Me | O |
| C-7151 | H | $CH_2$ | Me | Et | $CH_2OC(=O)$(t-Bu) | Cl | Me | O |
| C-7152 | Me | $CH_2$ | H | Et | $CH_2OC(=O)$(t-Bu) | Cl | Me | O |
| C-7153 | H | CH(Me) | H | Et | $CH_2OC(=O)$(t-Bu) | Cl | Me | O |
| C-7154 | H | $CH_2CH_2$ | Me | Et | $CH_2OC(=O)$(t-Bu) | Cl | Me | O |
| C-7155 | Me | $CH_2CH_2$ | H | Et | $CH_2OC(=O)$(t-Bu) | Cl | Me | O |
| C-7156 | H | single bond | Me | Et | $CH_2OC(=O)$(t-Bu) | Me | Me | O |
| C-7157 | Me | single bond | H | Et | $CH_2OC(=O)$(t-Bu) | Me | Me | O |

TABLE 390-continued

| Compound Number | Y | W | Z | $R^1$ | $R^2$ | $R^3$ | $R^{10}$ | A |
|---|---|---|---|---|---|---|---|---|
| C-7158 | Me(R) | single bond | H | Et | $CH_2OC(=O)(t\text{-}Bu)$ | Me | Me | O |
| C-7159 | Me(S) | single bond | H | Et | $CH_2OC(=O)(t\text{-}Bu)$ | Me | Me | O |
| C-7160 | H | $CH_2$ | Me | Et | $CH_2OC(=O)(t\text{-}Bu)$ | Me | Me | O |
| C-7161 | Me | $CH_2$ | H | Et | $CH_2OC(=O)(t\text{-}Bu)$ | Me | Me | O |
| C-7162 | H | CH(Me) | H | Et | $CH_2OC(=O)(t\text{-}Bu)$ | Me | Me | O |
| C-7163 | H | $CH_2CH_2$ | Me | Et | $CH_2OC(=O)(t\text{-}Bu)$ | Me | Me | O |
| C-7164 | Me | $CH_2CH_2$ | H | Et | $CH_2OC(=O)(t\text{-}Bu)$ | Me | Me | O |
| C-7165 | H | single bond | Me | Et | $CH_2OC(=O)OEt$ | Cl | Me | O |
| C-7166 | Me | single bond | H | Et | $CH_2OC(=O)OEt$ | Cl | Me | O |
| C-7167 | Me(R) | single bond | H | Et | $CH_2OC(=O)OEt$ | Cl | Me | O |
| C-7168 | Me(S) | single bond | H | Et | $CH_2OC(=O)OEt$ | Cl | Me | O |
| C-7169 | H | $CH_2$ | Me | Et | $CH_2OC(=O)OEt$ | Cl | Me | O |
| C-7170 | Me | $CH_2$ | H | Et | $CH_2OC(=O)OEt$ | Cl | Me | O |
| C-7171 | H | CH(Me) | H | Et | $CH_2OC(=O)OEt$ | Cl | Me | O |
| C-7172 | H | $CH_2CH_2$ | Me | Et | $CH_2OC(=O)OEt$ | Cl | Me | O |
| C-7173 | Me | $CH_2CH_2$ | H | Et | $CH_2OC(=O)OEt$ | Cl | Me | O |
| C-7174 | H | single bond | Me | Et | $CH_2OC(=O)OEt$ | Me | Me | O |
| C-7175 | Me | single bond | H | Et | $CH_2OC(=O)OEt$ | Me | Me | O |
| C-7176 | Me(R) | single bond | H | Et | $CH_2OC(=O)OEt$ | Me | Me | O |
| C-7177 | Me(S) | single bond | H | Et | $CH_2OC(=O)OEt$ | Me | Me | O |
| C-7178 | H | $CH_2$ | Me | Et | $CH_2OC(=O)OEt$ | Me | Me | O |

TABLE 391

| Compound Number | Y | W | Z | $R^1$ | $R^2$ | $R^3$ | $R^{10}$ | A |
|---|---|---|---|---|---|---|---|---|
| C-7179 | Me | $CH_2$ | H | Et | $CH_2OC(=O)OEt$ | Me | Me | O |
| C-7180 | H | CH(Me) | H | Et | $CH_2OC(=O)OEt$ | Me | Me | O |
| C-7181 | H | $CH_2CH_2$ | Me | Et | $CH_2OC(=O)OEt$ | Me | Me | O |
| C-7182 | Me | $CH_2CH_2$ | H | Et | $CH_2OC(=O)OEt$ | Me | Me | O |
| C-7183 | H | single bond | Me | Et | $CH_2OC(=O)O(i\text{-}Pr)$ | Cl | Me | O |
| C-7184 | Me | single bond | H | Et | $CH_2OC(=O)O(i\text{-}Pr)$ | Cl | Me | O |
| C-7185 | Me(R) | single bond | H | Et | $CH_2OC(=O)O(i\text{-}Pr)$ | Cl | Me | O |
| C-7186 | Me(S) | single bond | H | Et | $CH_2OC(=O)O(i\text{-}Pr)$ | Cl | Me | O |
| C-7187 | H | $CH_2$ | Me | Et | $CH_2OC(=O)O(i\text{-}Pr)$ | Cl | Me | O |
| C-7188 | Me | $CH_2$ | H | Et | $CH_2OC(=O)O(i\text{-}Pr)$ | Cl | Me | O |
| C-7189 | H | CH(Me) | H | Et | $CH_2OC(=O)O(i\text{-}Pr)$ | Cl | Me | O |
| C-7190 | H | $CH_2CH_2$ | Me | Et | $CH_2OC(=O)O(i\text{-}Pr)$ | Cl | Me | O |
| C-7191 | Me | $CH_2CH_2$ | H | Et | $CH_2OC(=O)O(i\text{-}Pr)$ | Cl | Me | O |
| C-7192 | H | single bond | Me | Et | $CH_2OC(=O)O(i\text{-}Pr)$ | Me | Me | O |
| C-7193 | Me | single bond | H | Et | $CH_2OC(=O)O(i\text{-}Pr)$ | Me | Me | O |
| C-7194 | Me(R) | single bond | H | Et | $CH_2OC(=O)O(i\text{-}Pr)$ | Me | Me | O |
| C-7195 | Me(S) | single bond | H | Et | $CH_2OC(=O)O(i\text{-}Pr)$ | Me | Me | O |
| C-7196 | H | $CH_2$ | Me | Et | $CH_2OC(=O)O(i\text{-}Pr)$ | Me | Me | O |
| C-7197 | Me | $CH_2$ | H | Et | $CH_2OC(=O)O(i\text{-}Pr)$ | Me | Me | O |
| C-7198 | H | CH(Me) | H | Et | $CH_2OC(=O)O(i\text{-}Pr)$ | Me | Me | O |
| C-7199 | H | $CH_2CH_2$ | Me | Et | $CH_2OC(=O)O(i\text{-}Pr)$ | Me | Me | O |
| C-7200 | Me | $CH_2CH_2$ | H | Et | $CH_2OC(=O)O(i\text{-}Pr)$ | Me | Me | O |
| C-7201 | H | single bond | Me | Et | $CH_2N(Me)C(=O)OMe$ | Cl | Me | O |
| C-7202 | Me | single bond | H | Et | $CH_2N(Me)C(=O)OMe$ | Cl | Me | O |
| C-7203 | Me(R) | single bond | H | Et | $CH_2N(Me)C(=O)OMe$ | Cl | Me | O |
| C-7204 | Me(S) | single bond | H | Et | $CH_2N(Me)C(=O)OMe$ | Cl | Me | O |
| C-7205 | H | $CH_2$ | Me | Et | $CH_2N(Me)C(=O)OMe$ | Cl | Me | O |
| C-7206 | Me | $CH_2$ | H | Et | $CH_2N(Me)C(=O)OMe$ | Cl | Me | O |
| C-7207 | H | CH(Me) | H | Et | $CH_2N(Me)C(=O)OMe$ | Cl | Me | O |
| C-7208 | H | $CH_2CH_2$ | Me | Et | $CH_2N(Me)C(=O)OMe$ | Cl | Me | O |
| C-7209 | Me | $CH_2CH_2$ | H | Et | $CH_2N(Me)C(=O)OMe$ | Cl | Me | O |
| C-7210 | H | single bond | Me | Et | $CH_2N(Me)C(=O)OMe$ | Me | Me | O |
| C-7211 | Me | single bond | H | Et | $CH_2N(Me)C(=O)OMe$ | Me | Me | O |
| C-7212 | Me(R) | single bond | H | Et | $CH_2N(Me)C(=O)OMe$ | Me | Me | O |
| C-7213 | Me(S) | single bond | H | Et | $CH_2N(Me)C(=O)OMe$ | Me | Me | O |
| C-7214 | H | $CH_2$ | Me | Et | $CH_2N(Me)C(=O)OMe$ | Me | Me | O |
| C-7215 | Me | $CH_2$ | H | Et | $CH_2N(Me)C(=O)OMe$ | Me | Me | O |
| C-7216 | H | CH(Me) | H | Et | $CH_2N(Me)C(=O)OMe$ | Me | Me | O |
| C-7217 | H | $CH_2CH_2$ | Me | Et | $CH_2N(Me)C(=O)OMe$ | Me | Me | O |
| C-7218 | Me | $CH_2CH_2$ | H | Et | $CH_2N(Me)C(=O)OMe$ | Me | Me | O |
| C-7219 | H | single bond | Me | Et | $C(=O)OCH_2CH=CH_2$ | Cl | $CH_2OMe$ | O |
| C-7220 | Me | single bond | H | Et | $C(=O)OCH_2CH=CH_2$ | Cl | $CH_2OMe$ | O |
| C-7221 | Me(R) | single bond | H | Et | $C(=O)OCH_2CH=CH_2$ | Cl | $CH_2OMe$ | O |
| C-7222 | Me(S) | single bond | H | Et | $C(=O)OCH_2CH=CH_2$ | C | $CH_2OMe$ | O |

TABLE 392

| Compound Number | Y | W | Z | $R^1$ | $R^2$ | $R^3$ | $R^{10}$ | A |
|---|---|---|---|---|---|---|---|---|
| C-7223 | H | $CH_2$ | Me | Et | $C(=O)OCH_2CH=CH_2$ | Cl | $CH_2OMe$ | O |
| C-7224 | Me | $CH_2$ | H | Et | $C(=O)OCH_2CH=CH_2$ | Cl | $CH_2OMe$ | O |
| C-7225 | H | CH(Me) | H | Et | $C(=O)OCH_2CH=CH_2$ | Cl | $CH_2OMe$ | O |
| C-7226 | H | $CH_2CH_2$ | Me | Et | $C(=O)OCH_2CH=CH_2$ | Cl | $CH_2OMe$ | O |
| C-7227 | Me | $CH_2CH_2$ | H | Et | $C(=O)OCH_2CH=CH_2$ | Cl | $CH_2OMe$ | O |
| C-7228 | H | single bond | Me | Et | $C(=O)OCH_2CH=CH_2$ | Me | $CH_2OMe$ | O |
| C-7229 | Me | single bond | H | Et | $C(=O)OCH_2CH=CH_2$ | Me | $CH_2OMe$ | O |
| C-7230 | Me(R) | single bond | H | Et | $C(=O)OCH_2CH=CH_2$ | Me | $CH_2OMe$ | O |
| C-7231 | Me(S) | single bond | H | Et | $C(=O)OCH_2CH=CH_2$ | Me | $CH_2OMe$ | O |
| C-7232 | H | $CH_2$ | Me | Et | $C(=O)OCH_2CH=CH_2$ | Me | $CH_2OMe$ | O |
| C-7233 | Me | $CH_2$ | H | Et | $C(=O)OCH_2CH=CH_2$ | Me | $CH_2OMe$ | O |
| C-7234 | H | CH(Me) | H | Et | $C(=O)OCH_2CH=CH_2$ | Me | $CH_2OMe$ | O |
| C-7235 | H | $CH_2CH_2$ | Me | Et | $C(=O)OCH_2CH=CH_2$ | Me | $CH_2OMe$ | O |
| C-7236 | Me | $CH_2CH_2$ | H | Et | $C(=O)OCH_2CH=CH_2$ | Me | $CH_2OMe$ | O |
| C-7237 | H | single bond | Me | Et | $C(=O)OCH_2CCl_3$ | Cl | $CH_2OMe$ | O |
| C-7238 | Me | single bond | H | Et | $C(=O)OCH_2CCl_3$ | Cl | $CH_2OMe$ | O |
| C-7239 | Me(R) | single bond | H | Et | $C(=O)OCH_2CCl_3$ | Cl | $CH_2OMe$ | O |
| C-7240 | Me(S) | single bond | H | Et | $C(=O)OCH_2CCl_3$ | Cl | $CH_2OMe$ | O |
| C-7241 | H | $CH_2$ | Me | Et | $C(=O)OCH_2CCl_3$ | Cl | $CH_2OMe$ | O |
| C-7242 | Me | $CH_2$ | H | Et | $C(=O)OCH_2CCl_3$ | Cl | $CH_2OMe$ | O |
| C-7243 | H | CH(Me) | H | Et | $C(=O)OCH_2CCl_3$ | Cl | $CH_2OMe$ | O |
| C-7244 | H | $CH_2CH_2$ | Me | Et | $C(=O)OCH_2CCl_3$ | Cl | $CH_2OMe$ | O |
| C-7245 | Me | $CH_2CH_2$ | H | Et | $C(=O)OCH_2CCl_3$ | Cl | $CH_2OMe$ | O |
| C-7246 | H | single bond | Me | Et | $C(=O)OCH_2CCl_3$ | Me | $CH_2OMe$ | O |
| C-7247 | Me | single bond | H | Et | $C(=O)OCH_2CCl_3$ | Me | $CH_2OMe$ | O |
| C-7248 | Me(R) | single bond | H | Et | $C(=O)OCH_2CCl_3$ | Me | $CH_2OMe$ | O |
| C-7249 | Me(S) | single bond | H | Et | $C(=O)OCH_2CCl_3$ | Me | $CH_2OMe$ | O |
| C-7250 | H | $CH_2$ | Me | Et | $C(=O)OCH_2CCl_3$ | Me | $CH_2OMe$ | O |
| C-7251 | Me | $CH_2$ | H | Et | $C(=O)OCH_2CCl_3$ | Me | $CH_2OMe$ | O |
| C-7252 | H | CH(Me) | H | Et | $C(=O)OCH_2CCl_3$ | Me | $CH_2OMe$ | O |
| C-7253 | H | $CH_2CH_2$ | Me | Et | $C(=O)OCH_2CCl_3$ | Me | $CH_2OMe$ | O |
| C-7254 | Me | $CH_2CH_2$ | H | Et | $C(=O)OCH_2CCl_3$ | Me | $CH_2OMe$ | O |
| C-7255 | H | single bond | Me | Et | $C(=O)N(Me)_2$ | Cl | $CH_2OMe$ | O |
| C-7256 | Me | single bond | H | Et | $C(=O)N(Me)_2$ | Cl | $CH_2OMe$ | O |
| C-7257 | Me(R) | single bond | H | Et | $C(=O)N(Me)_2$ | Cl | $CH_2OMe$ | O |
| C-7258 | Me(S) | single bond | H | Et | $C(=O)N(Me)_2$ | Cl | $CH_2OMe$ | O |
| C-7259 | H | $CH_2$ | Me | Et | $C(=O)N(Me)_2$ | Cl | $CH_2OMe$ | O |
| C-7260 | Me | $CH_2$ | H | Et | $C(=O)N(Me)_2$ | Cl | $CH_2OMe$ | O |
| C-7261 | H | CH(Me) | H | Et | $C(=O)N(Me)_2$ | Cl | $CH_2OMe$ | O |
| C-7262 | H | $CH_2CH_2$ | Me | Et | $C(=O)N(Me)_2$ | Cl | $CH_2OMe$ | O |
| C-7263 | Me | $CH_2CH_2$ | H | Et | $C(=O)N(Me)_2$ | Cl | $CH_2OMe$ | O |
| C-7264 | H | single bond | Me | Et | $C(=O)N(Me)_2$ | Me | $CH_2OMe$ | O |
| C-7265 | Me | single bond | H | Et | $C(=O)N(Me)_2$ | Me | $CH_2OMe$ | O |
| C-7266 | Me(R) | single bond | H | Et | $C(=O)N(Me)_2$ | Me | $CH_2OMe$ | O |

TABLE 393

| Compound Number | Y | W | Z | $R^1$ | $R^2$ | $R^3$ | $R^{10}$ | A |
|---|---|---|---|---|---|---|---|---|
| C-7267 | Me(S) | single bond | H | Et | $C(=O)N(Me)_2$ | Me | $CH_2OMe$ | O |
| C-7268 | H | $CH_2$ | Me | Et | $C(=O)N(Me)_2$ | Me | $CH_2OMe$ | O |
| C-7269 | Me | $CH_2$ | H | Et | $C(=O)N(Me)_2$ | Me | $CH_2OMe$ | O |
| C-7270 | H | CH(Me) | H | Et | $C(=O)N(Me)_2$ | Me | $CH_2OMe$ | O |
| C-7271 | H | $CH_2CH_2$ | Me | Et | $C(=O)N(Me)_2$ | Me | $CH_2OMe$ | O |
| C-7272 | Me | $CH_2CH_2$ | H | Et | $C(=O)N(Me)_2$ | Me | $CH_2OMe$ | O |
| C-7273 | H | single bond | Me | Et | $CH_2OC(=O)Me$ | Cl | $CH_2OMe$ | O |
| C-7274 | Me | single bond | H | Et | $CH_2OC(=O)Me$ | Cl | $CH_2OMe$ | O |
| C-7275 | Me(R) | single bond | H | Et | $CH_2OC(=O)Me$ | Cl | $CH_2OMe$ | O |
| C-7276 | Me(S) | single bond | H | Et | $CH_2OC(=O)Me$ | Cl | $CH_2OMe$ | O |
| C-7277 | H | $CH_2$ | Me | Et | $CH_2OC(=O)Me$ | Cl | $CH_2OMe$ | O |
| C-7278 | Me | $CH_2$ | H | Et | $CH_2OC(=O)Me$ | Cl | $CH_2OMe$ | O |
| C-7279 | H | CH(Me) | H | Et | $CH_2OC(=O)Me$ | Cl | $CH_2OMe$ | O |
| C-7280 | H | $CH_2CH_2$ | Me | Et | $CH_2OC(=O)Me$ | Cl | $CH_2OMe$ | O |
| C-7281 | Me | $CH_2CH_2$ | H | Et | $CH_2OC(=O)Me$ | Cl | $CH_2OMe$ | O |
| C-7282 | H | single bond | Me | Et | $CH_2OC(=O)Me$ | Me | $CH_2OMe$ | O |
| C-7283 | Me | single bond | H | Et | $CH_2OC(=O)Me$ | Me | $CH_2OMe$ | O |
| C-7284 | Me(R) | single bond | H | Et | $CH_2OC(=O)Me$ | Me | $CH_2OMe$ | O |
| C-7285 | Me(S) | single bond | H | Et | $CH_2OC(=O)Me$ | Me | $CH_2OMe$ | O |
| C-7286 | H | $CH_2$ | Me | Et | $CH_2OC(=O)Me$ | Me | $CH_2OMe$ | O |
| C-7287 | Me | $CH_2$ | H | Et | $CH_2OC(=O)Me$ | Me | $CH_2OMe$ | O |

TABLE 393-continued

| Compound Number | Y | W | Z | $R^1$ | $R^2$ | $R^3$ | $R^{10}$ | A |
|---|---|---|---|---|---|---|---|---|
| C-7288 | H | CH(Me) | H | Et | $CH_2OC(=O)Me$ | Me | $CH_2OMe$ | O |
| C-7289 | H | $CH_2CH_2$ | Me | Et | $CH_2OC(=O)Me$ | Me | $CH_2OMe$ | O |
| C-7290 | Me | $CH_2CH_2$ | H | Et | $CH_2OC(=O)Me$ | Me | $CH_2OMe$ | O |
| C-7291 | H | single bond | Me | Et | $CH_2OC(=O)$(i-Pr) | Cl | $CH_2OMe$ | O |
| C-7292 | Me | single bond | H | Et | $CH_2OC(=O)$(i-Pr) | Cl | $CH_2OMe$ | O |
| C-7293 | Me(R) | single bond | H | Et | $CH_2OC(=O)$(i-Pr) | Cl | $CH_2OMe$ | O |
| C-7294 | Me(S) | single bond | H | Et | $CH_2OC(=O)$(i-Pr) | Cl | $CH_2OMe$ | O |
| C-7295 | H | $CH_2$ | Me | Et | $CH_2OC(=O)$(i-Pr) | Cl | $CH_2OMe$ | O |
| C-7296 | Me | $CH_2$ | H | Et | $CH_2OC(=O)$(i-Pr) | Cl | $CH_2OMe$ | O |
| C-7297 | H | CH(Me) | H | Et | $CH_2OC(=O)$(i-Pr) | Cl | $CH_2OMe$ | O |
| C-7298 | H | $CH_2CH_2$ | Me | Et | $CH_2OC(=O)$(i-Pr) | Cl | $CH_2OMe$ | O |
| C-7299 | Me | $CH_2CH_2$ | H | Et | $CH_2OC(=O)$(i-Pr) | Cl | $CH_2OMe$ | O |
| C-7300 | H | single bond | Me | Et | $CH_2OC(=O)$(i-Pr) | Me | $CH_2OMe$ | O |
| C-7301 | Me | single bond | H | Et | $CH_2OC(=O)$(i-Pr) | Me | $CH_2OMe$ | O |
| C-7302 | Me(R) | single bond | H | Et | $CH_2OC(=O)$(i-Pr) | Me | $CH_2OMe$ | O |
| C-7303 | Me(S) | single bond | H | Et | $CH_2OC(=O)$(i-Pr) | Me | $CH_2OMe$ | O |
| C-7304 | H | $CH_2$ | Me | Et | $CH_2OC(=O)$(i-Pr) | Me | $CH_2OMe$ | O |
| C-7305 | Me | $CH_2$ | H | Et | $CH_2OC(=O)$(i-Pr) | Me | $CH_2OMe$ | O |
| C-7306 | H | CH(Me) | H | Et | $CH_2OC(=O)$(i-Pr) | Me | $CH_2OMe$ | O |
| C-7307 | H | $CH_2CH_2$ | Me | Et | $CH_2OC(=O)$(i-Pr) | Me | $CH_2OMe$ | O |
| C-7308 | Me | $CH_2CH_2$ | H | Et | $CH_2OC(=O)$(i-Pr) | Me | $CH_2OMe$ | O |
| C-7309 | H | single bond | Me | Et | $CH_2OC(=O)$(t-Bu) | Cl | $CH_2OMe$ | O |
| C-7310 | Me | single bond | H | Et | $CH_2OC(=O)$(t-Bu) | Cl | $CH_2OMe$ | O |

TABLE 394

| Compound Number | Y | W | Z | $R^1$ | $R^2$ | $R^3$ | $R^{10}$ | A |
|---|---|---|---|---|---|---|---|---|
| C-7311 | Me(R) | single bond | H | Et | $CH_2OC(=O)$(t-Bu) | Cl | $CH_2OMe$ | O |
| C-7312 | Me(S) | single bond | H | Et | $CH_2OC(=O)$(t-Bu) | Cl | $CH_2OMe$ | O |
| C-7313 | H | $CH_2$ | Me | Et | $CH_2OC(=O)$(t-Bu) | Cl | $CH_2OMe$ | O |
| C-7314 | Me | $CH_2$ | H | Et | $CH_2OC(=O)$(t-Bu) | Cl | $CH_2OMe$ | O |
| C-7315 | H | CH(Me) | H | Et | $CH_2OC(=O)$(t-Bu) | Cl | $CH_2OMe$ | O |
| C-7316 | H | $CH_2CH_2$ | Me | Et | $CH_2OC(=O)$(t-Bu) | Cl | $CH_2OMe$ | O |
| C-7317 | Me | $CH_2CH_2$ | H | Et | $CH_2OC(=O)$(t-Bu) | Cl | $CH_2OMe$ | O |
| C-7318 | H | single bond | Me | Et | $CH_2OC(=O)$(t-Bu) | Me | $CH_2OMe$ | O |
| C-7319 | Me | single bond | H | Et | $CH_2OC(=O)$(t-Bu) | Me | $CH_2OMe$ | O |
| C-7320 | Me(R) | single bond | H | Et | $CH_2OC(=O)$(t-Bu) | Me | $CH_2OMe$ | O |
| C-7321 | Me(S) | single bond | H | Et | $CH_2OC(=O)$(t-Bu) | Me | $CH_2OMe$ | O |
| C-7322 | H | $CH_2$ | Me | Et | $CH_2OC(=O)$(t-Bu) | Me | $CH_2OMe$ | O |
| C-7323 | Me | $CH_2$ | H | Et | $CH_2OC(=O)$(t-Bu) | Me | $CH_2OMe$ | O |
| C-7324 | H | CH(Me) | H | Et | $CH_2OC(=O)$(t-Bu) | Me | $CH_2OMe$ | O |
| C-7325 | H | $CH_2CH_2$ | Me | Et | $CH_2OC(=O)$(t-Bu) | Me | $CH_2OMe$ | O |
| C-7326 | Me | $CH_2CH_2$ | H | Et | $CH_2OC(=O)$(t-Bu) | Me | $CH_2OMe$ | O |
| C-7327 | H | single bond | Me | Et | $CH_2OC(=O)OEt$ | Cl | $CH_2OMe$ | O |
| C-7328 | Me | single bond | H | Et | $CH_2OC(=O)OEt$ | Cl | $CH_2OMe$ | O |
| C-7329 | Me(R) | single bond | H | Et | $CH_2OC(=O)OEt$ | Cl | $CH_2OMe$ | O |
| C-7330 | Me(S) | single bond | H | Et | $CH_2OC(=O)OEt$ | Cl | $CH_2OMe$ | O |
| C-7331 | H | $CH_2$ | Me | Et | $CH_2OC(=O)OEt$ | Cl | $CH_2OMe$ | O |
| C-7332 | Me | $CH_2$ | H | Et | $CH_2OC(=O)OEt$ | Cl | $CH_2OMe$ | O |
| C-7333 | H | CH(Me) | H | Et | $CH_2OC(=O)OEt$ | Cl | $CH_2OMe$ | O |
| C-7334 | H | $CH_2CH_2$ | Me | Et | $CH_2OC(=O)OEt$ | Cl | $CH_2OMe$ | O |
| C-7335 | Me | $CH_2CH_2$ | H | Et | $CH_2OC(=O)OEt$ | Cl | $CH_2OMe$ | O |
| C-7336 | H | single bond | Me | Et | $CH_2OC(=O)OEt$ | Me | $CH_2OMe$ | O |
| C-7337 | Me | single bond | H | Et | $CH_2OC(=O)OEt$ | Me | $CH_2OMe$ | O |
| C-7338 | Me(R) | single bond | H | Et | $CH_2OC(=O)OEt$ | Me | $CH_2OMe$ | O |
| C-7339 | Me(S) | single bond | H | Et | $CH_2OC(=O)OEt$ | Me | $CH_2OMe$ | O |
| C-7340 | H | $CH_2$ | Me | Et | $CH_2OC(=O)OEt$ | Me | $CH_2OMe$ | O |
| C-7341 | Me | $CH_2$ | H | Et | $CH_2OC(=O)OEt$ | Me | $CH_2OMe$ | O |
| C-7342 | H | CH(Me) | H | Et | $CH_2OC(=O)OEt$ | Me | $CH_2OMe$ | O |
| C-7343 | H | $CH_2CH_2$ | Me | Et | $CH_2OC(=O)OEt$ | Me | $CH_2OMe$ | O |
| C-7344 | Me | $CH_2CH_2$ | H | Et | $CH_2OC(=O)OEt$ | Me | $CH_2OMe$ | O |
| C-7345 | H | single bond | Me | Et | $CH_2OC(=O)O$(i-Pr) | Cl | $CH_2OMe$ | O |
| C-7346 | Me | single bond | H | Et | $CH_2OC(=O)O$(i-Pr) | Cl | $CH_2OMe$ | O |
| C-7347 | Me(R) | single bond | H | Et | $CH_2OC(=O)O$(i-Pr) | Cl | $CH_2OMe$ | O |
| C-7348 | Me(S) | single bond | H | Et | $CH_2OC(=O)O$(i-Pr) | Cl | $CH_2OMe$ | O |
| C-7349 | H | $CH_2$ | Me | Et | $CH_2OC(=O)O$(i-Pr) | Cl | $CH_2OMe$ | O |
| C-7350 | Me | $CH_2$ | H | Et | $CH_2OC(=O)O$(i-Pr) | Cl | $CH_2OMe$ | O |
| C-7351 | H | CH(Me) | H | Et | $CH_2OC(=O)O$(i-Pr) | Cl | $CH_2OMe$ | O |
| C-7352 | H | $CH_2CH_2$ | Me | Et | $CH_2OC(=O)O$(i-Pr) | Cl | $CH_2OMe$ | O |

TABLE 394-continued

| Compound Number | Y | W | Z | $R^1$ | $R^2$ | $R^3$ | $R^{10}$ | A |
|---|---|---|---|---|---|---|---|---|
| C-7353 | Me | $CH_2CH_2$ | H | Et | $CH_2OC(=O)O(i-Pr)$ | Cl | $CH_2OMe$ | O |
| C-7354 | H | single bond | Me | Et | $CH_2OC(=O)O(i-Pr)$ | Me | $CH_2OMe$ | O |

TABLE 395

| Compound Number | Y | W | Z | $R^1$ | $R^2$ | $R^3$ | $R^{10}$ | A |
|---|---|---|---|---|---|---|---|---|
| C-7355 | Me | single bond | H | Et | $CH_2OC(=O)O(i-Pr)$ | Me | $CH_2OMe$ | O |
| C-7356 | Me(R) | single bond | H | Et | $CH_2OC(=O)O(i-Pr)$ | Me | $CH_2OMe$ | O |
| C-7357 | Me(S) | single bond | H | Et | $CH_2OC(=O)O(i-Pr)$ | Me | $CH_2OMe$ | O |
| C-7358 | H | $CH_2$ | Me | Et | $CH_2OC(=O)O(i-Pr)$ | Me | $CH_2OMe$ | O |
| C-7359 | Me | $CH_2$ | H | Et | $CH_2OC(=O)O(i-Pr)$ | Me | $CH_2OMe$ | O |
| C-7360 | H | CH(Me) | H | Et | $CH_2OC(=O)O(i-Pr)$ | Me | $CH_2OMe$ | O |
| C-7361 | H | $CH_2CH_2$ | Me | Et | $CH_2OC(=O)O(i-Pr)$ | Me | $CH_2OMe$ | O |
| C-7362 | Me | $CH_2CH_2$ | H | Et | $CH_2OC(=O)O(i-Pr)$ | Me | $CH_2OMe$ | O |
| C-7363 | H | single bond | Me | Et | $CH_2N(Me)C(=O)OMe$ | Cl | $CH_2OMe$ | O |
| C-7364 | Me | single bond | H | Et | $CH_2N(Me)C(=O)OMe$ | Cl | $CH_2OMe$ | O |
| C-7365 | Me(R) | single bond | H | Et | $CH_2N(Me)C(=O)OMe$ | Cl | $CH_2OMe$ | O |
| C-7366 | Me(S) | single bond | H | Et | $CH_2N(Me)C(=O)OMe$ | Cl | $CH_2OMe$ | O |
| C-7367 | H | $CH_2$ | Me | Et | $CH_2N(Me)C(=O)OMe$ | Cl | $CH_2OMe$ | O |
| C-7368 | Me | $CH_2$ | H | Et | $CH_2N(Me)C(=O)OMe$ | Cl | $CH_2OMe$ | O |
| C-7369 | H | CH(Me) | H | Et | $CH_2N(Me)C(=O)OMe$ | Cl | $CH_2OMe$ | O |
| C-7370 | H | $CH_2CH_2$ | Me | Et | $CH_2N(Me)C(=O)OMe$ | Cl | $CH_2OMe$ | O |
| C-7371 | Me | $CH_2CH_2$ | H | Et | $CH_2N(Me)C(=O)OMe$ | Cl | $CH_2OMe$ | O |
| C-7372 | H | single bond | Me | Et | $CH_2N(Me)C(=O)OMe$ | Me | $CH_2OMe$ | O |
| C-7373 | Me | single bond | H | Et | $CH_2N(Me)C(=O)OMe$ | Me | $CH_2OMe$ | O |
| C-7374 | Me(R) | single bond | H | Et | $CH_2N(Me)C(=O)OMe$ | Me | $CH_2OMe$ | O |
| C-7375 | Me(S) | single bond | H | Et | $CH_2N(Me)C(=O)OMe$ | Me | $CH_2OMe$ | O |
| C-7376 | H | $CH_2$ | Me | Et | $CH_2N(Me)C(=O)OMe$ | Me | $CH_2OMe$ | O |
| C-7377 | Me | $CH_2$ | H | Et | $CH_2N(Me)C(=O)OMe$ | Me | $CH_2OMe$ | O |
| C-7378 | H | CH(Me) | H | Et | $CH_2N(Me)C(=O)OMe$ | Me | $CH_2OMe$ | O |
| C-7379 | H | $CH_2CH_2$ | Me | Et | $CH_2N(Me)C(=O)OMe$ | Me | $CH_2OMe$ | O |
| C-7380 | Me | $CH_2CH_2$ | H | Et | $CH_2N(Me)C(=O)OMe$ | Me | $CH_2OMe$ | O |
| C-7381 | H | single bond | Me | Et | $C(=O)OCH_2CH=CH_2$ | Cl | $CH_2CN$ | O |
| C-7382 | Me | single bond | H | Et | $C(=O)OCH_2CH=CH_2$ | Cl | $CH_2CN$ | O |
| C-7383 | Me(R) | single bond | H | Et | $C(=O)OCH_2CH=CH_2$ | Cl | $CH_2CN$ | O |
| C-7384 | Me(S) | single bond | H | Et | $C(=O)OCH_2CH=CH_2$ | Cl | $CH_2CN$ | O |
| C-7385 | H | $CH_2$ | Me | Et | $C(=O)OCH_2CH=CH_2$ | Cl | $CH_2CN$ | O |
| C-7386 | Me | $CH_2$ | H | Et | $C(=O)OCH_2CH=CH_2$ | Cl | $CH_2CN$ | O |
| C-7387 | H | CH(Me) | H | Et | $C(=O)OCH_2CH=CH_2$ | Cl | $CH_2CN$ | O |
| C-7388 | H | $CH_2CH_2$ | Me | Et | $C(=O)OCH_2CH=CH_2$ | Cl | $CH_2CN$ | O |
| C-7389 | Me | $CH_2CH_2$ | H | Et | $C(=O)OCH_2CH=CH_2$ | Cl | $CH_2CN$ | O |
| C-7390 | H | single bond | Me | Et | $C(=O)OCH_2CH=CH_2$ | Me | $CH_2CN$ | O |
| C-7391 | Me | single bond | H | Et | $C(=O)OCH_2CH=CH_2$ | Me | $CH_2CN$ | O |
| C-7392 | Me(R) | single bond | H | Et | $C(=O)OCH_2CH=CH_2$ | Me | $CH_2CN$ | O |
| C-7393 | Me(S) | single bond | H | Et | $C(=O)OCH_2CH=CH_2$ | Me | $CH_2CN$ | O |
| C-7394 | H | $CH_2$ | Me | Et | $C(=O)OCH_2CH=CH_2$ | Me | $CH_2CN$ | O |
| C-7395 | Me | $CH_2$ | H | Et | $C(=O)OCH_2CH=CH_2$ | Me | $CH_2CN$ | O |
| C-7396 | H | CH(Me) | H | Et | $C(=O)OCH_2CH=CH_2$ | Me | $CH_2CN$ | O |
| C-7397 | H | $CH_2CH_2$ | Me | Et | $C(=O)OCH_2CH=CH_2$ | Me | $CH_2CN$ | O |
| C-7398 | Me | $CH_2CH_2$ | H | Et | $C(=O)OCH_2CH=CH_2$ | Me | $CH_2CN$ | O |

TABLE 396

| Compound Number | Y | W | Z | $R^1$ | $R^2$ | $R^3$ | $R^{10}$ | A |
|---|---|---|---|---|---|---|---|---|
| C-7399 | H | single bond | Me | Et | $C(=O)OCH_2CCl_3$ | Cl | $CH_2CN$ | O |
| C-7400 | Me | single bond | H | Et | $C(=O)OCH_2CCl_3$ | Cl | $CH_2CN$ | O |
| C-7401 | Me(R) | single bond | H | Et | $C(=O)OCH_2CCl_3$ | Cl | $CH_2CN$ | O |
| C-7402 | Me(S) | single bond | H | Et | $C(=O)OCH_2CCl_3$ | Cl | $CH_2CN$ | O |
| C-7403 | H | $CH_2$ | Me | Et | $C(=O)OCH_2CCl_3$ | Cl | $CH_2CN$ | O |
| C-7404 | Me | $CH_2$ | H | Et | $C(=O)OCH_2CCl_3$ | Cl | $CH_2CN$ | O |
| C-7405 | H | CH(Me) | H | Et | $C(=O)OCH_2CCl_3$ | Cl | $CH_2CN$ | O |
| C-7406 | H | $CH_2CH_2$ | Me | Et | $C(=O)OCH_2CCl_3$ | Cl | $CH_2CN$ | O |
| C-7407 | Me | $CH_2CH_2$ | H | Et | $C(=O)OCH_2CCl_3$ | Cl | $CH_2CN$ | O |
| C-7408 | H | single bond | Me | Et | $C(=O)OCH_2CCl_3$ | Me | $CH_2CN$ | O |
| C-7409 | Me | single bond | H | Et | $C(=O)OCH_2CCl_3$ | Me | $CH_2CN$ | O |
| C-7410 | Me(R) | single bond | H | Et | $C(=O)OCH_2CCl_3$ | Me | $CH_2CN$ | O |

TABLE 396-continued

| Compound Number | Y | W | Z | $R^1$ | $R^2$ | $R^3$ | $R^{10}$ | A |
|---|---|---|---|---|---|---|---|---|
| C-7411 | Me(S) | single bond | H | Et | $C(=O)OCH_2CCl_3$ | Me | $CH_2CN$ | O |
| C-7412 | H | $CH_2$ | Me | Et | $C(=O)OCH_2CCl_3$ | Me | $CH_2CN$ | O |
| C-7413 | Me | $CH_2$ | H | Et | $C(=O)OCH_2CCl_3$ | Me | $CH_2CN$ | O |
| C-7414 | H | CH(Me) | H | Et | $C(=O)OCH_2CCl_3$ | Me | $CH_2CN$ | O |
| C-7415 | H | $CH_2CH_2$ | Me | Et | $C(=O)OCH_2CCl_3$ | Me | $CH_2CN$ | O |
| C-7416 | Me | $CH_2CH_2$ | H | Et | $C(=O)OCH_2CCl_3$ | Me | $CH_2CN$ | O |
| C-7417 | H | single bond | Me | Et | $C(=O)N(Me)_2$ | Cl | $CH_2CN$ | O |
| C-7418 | Me | single bond | H | Et | $C(=O)N(Me)_2$ | Cl | $CH_2CN$ | O |
| C-7419 | Me(R) | single bond | H | Et | $C(=O)N(Me)_2$ | Cl | $CH_2CN$ | O |
| C-7420 | Me(S) | single bond | H | Et | $C(=O)N(Me)_2$ | Cl | $CH_2CN$ | O |
| C-7421 | H | $CH_2$ | Me | Et | $C(=O)N(Me)_2$ | Cl | $CH_2CN$ | O |
| C-7422 | Me | $CH_2$ | H | Et | $C(=O)N(Me)_2$ | Cl | $CH_2CN$ | O |
| C-7423 | H | CH(Me) | H | Et | $C(=O)N(Me)_2$ | Cl | $CH_2CN$ | O |
| C-7424 | H | $CH_2CH_2$ | Me | Et | $C(=O)N(Me)_2$ | Cl | $CH_2CN$ | O |
| C-7425 | Me | $CH_2CH_2$ | H | Et | $C(=O)N(Me)_2$ | Cl | $CH_2CN$ | O |
| C-7426 | H | single bond | Me | Et | $C(=O)N(Me)_2$ | Me | $CH_2CN$ | O |
| C-7427 | Me | single bond | H | Et | $C(=O)N(Me)_2$ | Me | $CH_2CN$ | O |
| C-7428 | Me(R) | single bond | H | Et | $C(=O)N(Me)_2$ | Me | $CH_2CN$ | O |
| C-7429 | Me(S) | single bond | H | Et | $C(=O)N(Me)_2$ | Me | $CH_2CN$ | O |
| C-7430 | H | $CH_2$ | Me | Et | $C(=O)N(Me)_2$ | Me | $CH_2CN$ | O |
| C-7431 | Me | $CH_2$ | H | Et | $C(=O)N(Me)_2$ | Me | $CH_2CN$ | O |
| C-7432 | H | CH(Me) | H | Et | $C(=O)N(Me)_2$ | Me | $CH_2CN$ | O |
| C-7433 | H | $CH_2CH_2$ | Me | Et | $C(=O)N(Me)_2$ | Me | $CH_2CN$ | O |
| C-7434 | Me | $CH_2CH_2$ | H | Et | $C(=O)N(Me)_2$ | Me | $CH_2CN$ | O |
| C-7435 | H | single bond | Me | Et | $CH_2OC(=O)Me$ | Cl | $CH_2CN$ | O |
| C-7436 | Me | single bond | H | Et | $CH_2OC(=O)Me$ | Cl | $CH_2CN$ | O |
| C-7437 | Me(R) | single bond | H | Et | $CH_2OC(=O)Me$ | Cl | $CH_2CN$ | O |
| C-7438 | Me(S) | single bond | H | Et | $CH_2OC(=O)Me$ | Cl | $CH_2CN$ | O |
| C-7439 | H | $CH_2$ | Me | Et | $CH_2OC(=O)Me$ | Cl | $CH_2CN$ | O |
| C-7440 | Me | $CH_2$ | H | Et | $CH_2OC(=O)Me$ | Cl | $CH_2CN$ | O |
| C-7441 | H | CH(Me) | H | Et | $CH_2OC(=O)Me$ | Cl | $CH_2CN$ | O |
| C-7442 | H | $CH_2CH_2$ | Me | Et | $CH_2OC(=O)Me$ | Cl | $CH_2CN$ | O |

TABLE 397

| Compound Number | Y | W | Z | $R^1$ | $R^2$ | $R^3$ | $R^{10}$ | A |
|---|---|---|---|---|---|---|---|---|
| C-7443 | Me | $CH_2CH_2$ | H | Et | $CH_2OC(=O)Me$ | Cl | $CH_2CN$ | O |
| C-7444 | H | single bond | Me | Et | $CH_2OC(=O)Me$ | Me | $CH_2CN$ | O |
| C-7445 | Me | single bond | H | Et | $CH_2OC(=O)Me$ | Me | $CH_2CN$ | O |
| C-7446 | Me(R) | single bond | H | Et | $CH_2OC(=O)Me$ | Me | $CH_2CN$ | O |
| C-7447 | Me(S) | single bond | H | Et | $CH_2OC(=O)Me$ | Me | $CH_2CN$ | O |
| C-7448 | H | $CH_2$ | Me | Et | $CH_2OC(=O)Me$ | Me | $CH_2CN$ | O |
| C-7449 | Me | $CH_2$ | H | Et | $CH_2OC(=O)Me$ | Me | $CH_2CN$ | O |
| C-7450 | H | CH(Me) | H | Et | $CH_2OC(=O)Me$ | Me | $CH_2CN$ | O |
| C-7451 | H | $CH_2CH_2$ | Me | Et | $CH_2OC(=O)Me$ | Me | $CH_2CN$ | O |
| C-7452 | Me | $CH_2CH_2$ | H | Et | $CH_2OC(=O)Me$ | Me | $CH_2CN$ | O |
| C-7453 | H | single bond | Me | Et | $CH_2OC(=O)$(i-Pr) | Cl | $CH_2CN$ | O |
| C-7454 | Me | single bond | H | Et | $CH_2OC(=O)$(i-Pr) | Cl | $CH_2CN$ | O |
| C-7455 | Me(R) | single bond | H | Et | $CH_2OC(=O)$(i-Pr) | Cl | $CH_2CN$ | O |
| C-7456 | Me(S) | single bond | H | Et | $CH_2OC(=O)$(i-Pr) | Cl | $CH_2CN$ | O |
| C-7457 | H | $CH_2$ | Me | Et | $CH_2OC(=O)$(i-Pr) | Cl | $CH_2CN$ | O |
| C-7458 | Me | $CH_2$ | H | Et | $CH_2OC(=O)$(i-Pr) | Cl | $CH_2CN$ | O |
| C-7459 | H | CH(Me) | H | Et | $CH_2OC(=O)$(i-Pr) | Cl | $CH_2CN$ | O |
| C-7460 | H | $CH_2CH_2$ | Me | Et | $CH_2OC(=O)$(i-Pr) | Cl | $CH_2CN$ | O |
| C-7461 | Me | $CH_2CH_2$ | H | Et | $CH_2OC(=O)$(i-Pr) | Cl | $CH_2CN$ | O |
| C-7462 | H | single bond | Me | Et | $CH_2OC(=O)$(i-Pr) | Me | $CH_2CN$ | O |
| C-7463 | Me | single bond | H | Et | $CH_2OC(=O)$(i-Pr) | Me | $CH_2CN$ | O |
| C-7464 | Me(R) | single bond | H | Et | $CH_2OC(=O)$(i-Pr) | Me | $CH_2CN$ | O |
| C-7465 | Me(S) | single bond | H | Et | $CH_2OC(=O)$(i-Pr) | Me | $CH_2CN$ | O |
| C-7466 | H | $CH_2$ | Me | Et | $CH_2OC(=O)$(i-Pr) | Me | $CH_2CN$ | O |
| C-7467 | Me | $CH_2$ | H | Et | $CH_2OC(=O)$(i-Pr) | Me | $CH_2CN$ | O |
| C-7468 | H | CH(Me) | H | Et | $CH_2OC(=O)$(i-Pr) | Me | $CH_2CN$ | O |
| C-7469 | H | $CH_2CH_2$ | Me | Et | $CH_2OC(=O)$(i-Pr) | Me | $CH_2CN$ | O |
| C-7470 | Me | $CH_2CH_2$ | H | Et | $CH_2OC(=O)$(i-Pr) | Me | $CH_2CN$ | O |
| C-7471 | H | single bond | Me | Et | $CH_2OC(=O)$(t-Bu) | Cl | $CH_2CN$ | O |
| C-7472 | Me | single bond | H | Et | $CH_2OC(=O)$(t-Bu) | Cl | $CH_2CN$ | O |
| C-7473 | Me(R) | single bond | H | Et | $CH_2OC(=O)$(t-Bu) | Cl | $CH_2CN$ | O |
| C-7474 | Me(S) | single bond | H | Et | $CH_2OC(=O)$(t-Bu) | Cl | $CH_2CN$ | O |
| C-7475 | H | $CH_2$ | Me | Et | $CH_2OC(=O)$(t-Bu) | Cl | $CH_2CN$ | O |
| C-7476 | Me | $CH_2$ | H | Et | $CH_2OC(=O)$(t-Bu) | Cl | $CH_2CN$ | O |
| C-7477 | H | CH(Me) | H | Et | $CH_2OC(=O)$(t-Bu) | Cl | $CH_2CN$ | O |

TABLE 397-continued

| Compound Number | Y | W | Z | $R^1$ | $R^2$ | $R^3$ | $R^{10}$ | A |
|---|---|---|---|---|---|---|---|---|
| C-7478 | H | $CH_2CH_2$ | Me | Et | $CH_2OC(=O)(t-Bu)$ | Cl | $CH_2CN$ | O |
| C-7479 | Me | $CH_2CH_2$ | H | Et | $CH_2OC(=O)(t-Bu)$ | Cl | $CH_2CN$ | O |
| C-7480 | H | single bond | Me | Et | $CH_2OC(=O)(t-Bu)$ | Me | $CH_2CN$ | O |
| C-7481 | Me | single bond | H | Et | $CH_2OC(=O)(t-Bu)$ | Me | $CH_2CN$ | O |
| C-7482 | Me(R) | single bond | H | Et | $CH_2OC(=O)(t-Bu)$ | Me | $CH_2CN$ | O |
| C-7483 | Me(S) | single bond | H | Et | $CH_2OC(=O)(t-Bu)$ | Me | $CH_2CN$ | O |
| C-7484 | H | $CH_2$ | Me | Et | $CH_2OC(=O)(t-Bu)$ | Me | $CH_2CN$ | O |
| C-7485 | Me | $CH_2$ | H | Et | $CH_2OC(=O)(t-Bu)$ | Me | $CH_2CN$ | O |
| C-7486 | H | CH(Me) | H | Et | $CH_2OC(=O)(t-Bu)$ | Me | $CH_2CN$ | O |

TABLE 398

| Compound Number | Y | W | Z | $R^1$ | $R^2$ | $R^3$ | $R^{10}$ | A |
|---|---|---|---|---|---|---|---|---|
| C-7487 | H | $CH_2CH_2$ | Me | Et | $CH_2OC(=O)(t-Bu)$ | Me | $CH_2CN$ | O |
| C-7488 | Me | $CH_2CH_2$ | H | Et | $CH_2OC(=O)(t-Bu)$ | Me | $CH_2CN$ | O |
| C-7489 | H | single bond | Me | Et | $CH_2OC(=O)OEt$ | Cl | $CH_2CN$ | O |
| C-7490 | Me | single bond | H | Et | $CH_2OC(=O)OEt$ | Cl | $CH_2CN$ | O |
| C-7491 | Me(R) | single bond | H | Et | $CH_2OC(=O)OEt$ | Cl | $CH_2CN$ | O |
| C-7492 | Me(S) | single bond | H | Et | $CH_2OC(=O)OEt$ | Cl | $CH_2CN$ | O |
| C-7493 | H | $CH_2$ | Me | Et | $CH_2OC(=O)OEt$ | Cl | $CH_2CN$ | O |
| C-7494 | Me | $CH_2$ | H | Et | $CH_2OC(=O)OEt$ | Cl | $CH_2CN$ | O |
| C-7495 | H | CH(Me) | H | Et | $CH_2OC(=O)OEt$ | Cl | $CH_2CN$ | O |
| C-7496 | H | $CH_2CH_2$ | Me | Et | $CH_2OC(=O)OEt$ | Cl | $CH_2CN$ | O |
| C-7497 | Me | $CH_2CH_2$ | H | Et | $CH_2OC(=O)OEt$ | Cl | $CH_2CN$ | O |
| C-7498 | H | single bond | Me | Et | $CH_2OC(=O)OEt$ | Me | $CH_2CN$ | O |
| C-7499 | Me | single bond | H | Et | $CH_2OC(=O)OEt$ | Me | $CH_2CN$ | O |
| C-7500 | Me(R) | single bond | H | Et | $CH_2OC(=O)OEt$ | Me | $CH_2CN$ | O |
| C-7501 | Me(S) | single bond | H | Et | $CH_2OC(=O)OEt$ | Me | $CH_2CN$ | O |
| C-7502 | H | $CH_2$ | Me | Et | $CH_2OC(=O)OEt$ | Me | $CH_2CN$ | O |
| C-7503 | Me | $CH_2$ | H | Et | $CH_2OC(=O)OEt$ | Me | $CH_2CN$ | O |
| C-7504 | H | CH(Me) | H | Et | $CH_2OC(=O)OEt$ | Me | $CH_2CN$ | O |
| C-7505 | H | $CH_2CH_2$ | Me | Et | $CH_2OC(=O)OEt$ | Me | $CH_2CN$ | O |
| C-7506 | Me | $CH_2CH_2$ | H | Et | $CH_2OC(=O)OEt$ | Me | $CH_2CN$ | O |
| C-7507 | H | single bond | Me | Et | $CH_2OC(=O)O(i-Pr)$ | Cl | $CH_2CN$ | O |
| C-7508 | Me | single bond | H | Et | $CH_2OC(=O)O(i-Pr)$ | Cl | $CH_2CN$ | O |
| C-7509 | Me(R) | single bond | H | Et | $CH_2OC(=O)O(i-Pr)$ | Cl | $CH_2CN$ | O |
| C-7510 | Me(S) | single bond | H | Et | $CH_2OC(=O)O(i-Pr)$ | Cl | $CH_2CN$ | O |
| C-7511 | H | $CH_2$ | Me | Et | $CH_2OC(=O)O(i-Pr)$ | Cl | $CH_2CN$ | O |
| C-7512 | Me | $CH_2$ | H | Et | $CH_2OC(=O)O(i-Pr)$ | Cl | $CH_2CN$ | O |
| C-7513 | H | CH(Me) | H | Et | $CH_2OC(=O)O(i-Pr)$ | Cl | $CH_2CN$ | O |
| C-7514 | H | $CH_2CH_2$ | Me | Et | $CH_2OC(=O)O(i-Pr)$ | Cl | $CH_2CN$ | O |
| C-7515 | Me | $CH_2CH_2$ | H | Et | $CH_2OC(=O)O(i-Pr)$ | Cl | $CH_2CN$ | O |
| C-7516 | H | single bond | Me | Et | $CH_2OC(=O)O(i-Pr)$ | Me | $CH_2CN$ | O |
| C-7517 | Me | single bond | H | Et | $CH_2OC(=O)O(i-Pr)$ | Me | $CH_2CN$ | O |
| C-7518 | Me(R) | single bond | H | Et | $CH_2OC(=O)O(i-Pr)$ | Me | $CH_2CN$ | O |
| C-7519 | Me(S) | single bond | H | Et | $CH_2OC(=O)O(i-Pr)$ | Me | $CH_2CN$ | O |
| C-7520 | H | $CH_2$ | Me | Et | $CH_2OC(=O)O(i-Pr)$ | Me | $CH_2CN$ | O |
| C-7521 | Me | $CH_2$ | H | Et | $CH_2OC(=O)O(i-Pr)$ | Me | $CH_2CN$ | O |
| C-7522 | H | CH(Me) | H | Et | $CH_2OC(=O)O(i-Pr)$ | Me | $CH_2CN$ | O |
| C-7523 | H | $CH_2CH_2$ | Me | Et | $CH_2OC(=O)O(i-Pr)$ | Me | $CH_2CN$ | O |
| C-7524 | Me | $CH_2CH_2$ | H | Et | $CH_2OC(=O)O(i-Pr)$ | Me | $CH_2CN$ | O |
| C-7525 | H | single bond | Me | Et | $CH_2N(Me)C(=O)OMe$ | Cl | $CH_2CN$ | O |
| C-7526 | Me | single bond | H | Et | $CH_2N(Me)C(=O)OMe$ | Cl | $CH_2CN$ | O |
| C-7527 | Me(R) | single bond | H | Et | $CH_2N(Me)C(=O)OMe$ | Cl | $CH_2CN$ | O |
| C-7528 | Me(S) | single bond | H | Et | $CH_2N(Me)C(=O)OMe$ | Cl | $CH_2CN$ | O |
| C-7529 | H | $CH_2$ | Me | Et | $CH_2N(Me)C(=O)OMe$ | Cl | $CH_2CN$ | O |
| C-7530 | Me | $CH_2$ | H | Et | $CH_2N(Me)C(=O)OMe$ | Cl | $CH_2CN$ | O |

TABLE 399

| Compound Number | Y | W | Z | $R^1$ | $R^2$ | $R^3$ | $R^{10}$ | A |
|---|---|---|---|---|---|---|---|---|
| C-7531 | H | CH(Me) | H | Et | $CH_2N(Me)C(=O)OMe$ | Cl | $CH_2CN$ | O |
| C-7532 | H | $CH_2CH_2$ | Me | Et | $CH_2N(Me)C(=O)OMe$ | Cl | $CH_2CN$ | O |
| C-7533 | Me | $CH_2CH_2$ | H | Et | $CH_2N(Me)C(=O)OMe$ | Cl | $CH_2CN$ | O |

TABLE 399-continued

| Compound Number | Y | W | Z | $R^1$ | $R^2$ | $R^3$ | $R^{10}$ | A |
|---|---|---|---|---|---|---|---|---|
| C-7534 | H | single bond | Me | Et | $CH_2N(Me)C(=O)OMe$ | Me | $CH_2CN$ | O |
| C-7535 | Me | single bond | H | Et | $CH_2N(Me)C(=O)OMe$ | Me | $CH_2CN$ | O |
| C-7536 | Me(R) | single bond | H | Et | $CH_2N(Me)C(=O)OMe$ | Me | $CH_2CN$ | O |
| C-7537 | Me(S) | single bond | H | Et | $CH_2N(Me)C(=O)OMe$ | Me | $CH_2CN$ | O |
| C-7538 | H | $CH_2$ | Me | Et | $CH_2N(Me)C(=O)OMe$ | Me | $CH_2CN$ | O |
| C-7539 | Me | $CH_2$ | H | Et | $CH_2N(Me)C(=O)OMe$ | Me | $CH_2CN$ | O |
| C-7540 | H | CH(Me) | H | Et | $CH_2N(Me)C(=O)OMe$ | Me | $CH_2CN$ | O |
| C-7541 | H | $CH_2CH_2$ | Me | Et | $CH_2N(Me)C(=O)OMe$ | Me | $CH_2CN$ | O |
| C-7542 | Me | $CH_2CH_2$ | H | Et | $CH_2N(Me)C(=O)OMe$ | Me | $CH_2CN$ | O |
| C-7543 | H | single bond | Me | Et | $C(=O)OCH_2CH=CH_2$ | Cl | C(=O)Me | O |
| C-7544 | Me | single bond | H | Et | $C(=O)OCH_2CH=CH_2$ | Cl | C(=O)Me | O |
| C-7545 | Me(R) | single bond | H | Et | $C(=O)OCH_2CH=CH_2$ | Cl | C(=O)Me | O |
| C-7546 | Me(S) | single bond | H | Et | $C(=O)OCH_2CH=CH_2$ | Cl | C(=O)Me | O |
| C-7547 | H | $CH_2$ | Me | Et | $C(=O)OCH_2CH=CH_2$ | Cl | C(=O)Me | O |
| C-7548 | Me | $CH_2$ | H | Et | $C(=O)OCH_2CH=CH_2$ | Cl | C(=O)Me | O |
| C-7549 | H | CH(Me) | H | Et | $C(=O)OCH_2CH=CH_2$ | Cl | C(=O)Me | O |
| C-7550 | H | $CH_2CH_2$ | Me | Et | $C(=O)OCH_2CH=CH_2$ | Cl | C(=O)Me | O |
| C-7551 | Me | $CH_2CH_2$ | H | Et | $C(=O)OCH_2CH=CH_2$ | Cl | C(=O)Me | O |
| C-7552 | H | single bond | Me | Et | $C(=O)OCH_2CH=CH_2$ | Me | C(=O)Me | O |
| C-7553 | Me | single bond | H | Et | $C(=O)OCH_2CH=CH_2$ | Me | C(=O)Me | O |
| C-7554 | Me(R) | single bond | H | Et | $C(=O)OCH_2CH=CH_2$ | Me | C(=O)Me | O |
| C-7555 | Me(S) | single bond | H | Et | $C(=O)OCH_2CH=CH_2$ | Me | C(=O)Me | O |
| C-7556 | H | $CH_2$ | Me | Et | $C(=O)OCH_2CH=CH_2$ | Me | C(=O)Me | O |
| C-7557 | Me | $CH_2$ | H | Et | $C(=O)OCH_2CH=CH_2$ | Me | C(=O)Me | O |
| C-7558 | H | CH(Me) | H | Et | $C(=O)OCH_2CH=CH_2$ | Me | C(=O)Me | O |
| C-7559 | H | $CH_2CH_2$ | Me | Et | $C(=O)OCH_2CH=CH_2$ | Me | C(=O)Me | O |
| C-7560 | Me | $CH_2CH_2$ | H | Et | $C(=O)OCH_2CH=CH_2$ | Me | C(=O)Me | O |
| C-7561 | H | single bond | Me | Et | $C(=O)OCH_2CCl_3$ | Cl | C(=O)Me | O |
| C-7562 | Me | single bond | H | Et | $C(=O)OCH_2CCl_3$ | Cl | C(=O)Me | O |
| C-7563 | Me(R) | single bond | H | Et | $C(=O)OCH_2CCl_3$ | Cl | C(=O)Me | O |
| C-7564 | Me(S) | single bond | H | Et | $C(=O)OCH_2CCl_3$ | Cl | C(=O)Me | O |
| C-7565 | H | $CH_2$ | Me | Et | $C(=O)OCH_2CCl_3$ | Cl | C(=O)Me | O |
| C-7566 | Me | $CH_2$ | H | Et | $C(=O)OCH_2CCl_3$ | Cl | C(=O)Me | O |
| C-7567 | H | CH(Me) | H | Et | $C(=O)OCH_2CCl_3$ | Cl | C(=O)Me | O |
| C-7568 | H | $CH_2CH_2$ | Me | Et | $C(=O)OCH_2CCl_3$ | Cl | C(=O)Me | O |
| C-7569 | Me | $CH_2CH_2$ | H | Et | $C(=O)OCH_2CCl_3$ | Cl | C(=O)Me | O |
| C-7570 | H | single bond | Me | Et | $C(=O)OCH_2CCl_3$ | Me | C(=O)Me | O |
| C-7571 | Me | single bond | H | Et | $C(=O)OCH_2CCl_3$ | Me | C(=O)Me | O |
| C-7572 | Me(R) | single bond | H | Et | $C(=O)OCH_2CCl_3$ | Me | C(=O)Me | O |
| C-7573 | Me(S) | single bond | H | Et | $C(=O)OCH_2CCl_3$ | Me | C(=O)Me | O |
| C-7574 | H | $CH_2$ | Me | Et | $C(=O)OCH_2CCl_3$ | Me | C(=O)Me | O |

TABLE 400

| Compound Number | Y | W | Z | $R^1$ | $R^2$ | $R^3$ | $R^{10}$ | A |
|---|---|---|---|---|---|---|---|---|
| C-7575 | Me | $CH_2$ | H | Et | $C(=O)OCH_2CCl_3$ | Me | C(=O)Me | O |
| C-7576 | H | CH(Me) | H | Et | $C(=O)OCH_2CCl_3$ | Me | C(=O)Me | O |
| C-7577 | H | $CH_2CH_2$ | Me | Et | $C(=O)OCH_2CCl_3$ | Me | C(=O)Me | O |
| C-7578 | Me | $CH_2CH_2$ | H | Et | $C(=O)OCH_2CCl_3$ | Me | C(=O)Me | O |
| C-7579 | H | single bond | Me | Et | $C(=O)N(Me)_2$ | Cl | C(=O)Me | O |
| C-7580 | Me | single bond | H | Et | $C(=O)N(Me)_2$ | Cl | C(=O)Me | O |
| C-7581 | Me(R) | single bond | H | Et | $C(=O)N(Me)_2$ | Cl | C(=O)Me | O |
| C-7582 | Me(S) | single bond | H | Et | $C(=O)N(Me)_2$ | Cl | C(=O)Me | O |
| C-7583 | H | $CH_2$ | Me | Et | $C(=O)N(Me)_2$ | Cl | C(=O)Me | O |
| C-7584 | Me | $CH_2$ | H | Et | $C(=O)N(Me)_2$ | Cl | C(=O)Me | O |
| C-7585 | H | CH(Me) | H | Et | $C(=O)N(Me)_2$ | Cl | C(=O)Me | O |
| C-7586 | H | $CH_2CH_2$ | Me | Et | $C(=O)N(Me)_2$ | Cl | C(=O)Me | O |
| C-7587 | Me | $CH_2CH_2$ | H | Et | $C(=O)N(Me)_2$ | Cl | C(=O)Me | O |
| C-7588 | H | single bond | Me | Et | $C(=O)N(Me)_2$ | Me | C(=O)Me | O |
| C-7589 | Me | single bond | H | Et | $C(=O)N(Me)_2$ | Me | C(=O)Me | O |
| C-7590 | Me(R) | single bond | H | Et | $C(=O)N(Me)_2$ | Me | C(=O)Me | O |
| C-7591 | Me(S) | single bond | H | Et | $C(=O)N(Me)_2$ | Me | C(=O)Me | O |
| C-7592 | H | $CH_2$ | Me | Et | $C(=O)N(Me)_2$ | Me | C(=O)Me | O |
| C-7593 | Me | $CH_2$ | H | Et | $C(=O)N(Me)_2$ | Me | C(=O)Me | O |
| C-7594 | H | CH(Me) | H | Et | $C(=O)N(Me)_2$ | Me | C(=O)Me | O |
| C-7595 | H | $CH_2CH_2$ | Me | Et | $C(=O)N(Me)_2$ | Me | C(=O)Me | O |
| C-7596 | Me | $CH_2CH_2$ | H | Et | $C(=O)N(Me)_2$ | Me | C(=O)Me | O |
| C-7597 | H | single bond | Me | Et | $CH_2OC(=O)Me$ | Cl | C(=O)Me | O |
| C-7598 | Me | single bond | H | Et | $CH_2OC(=O)Me$ | Cl | C(=O)Me | O |
| C-7599 | Me(R) | single bond | H | Et | $CH_2OC(=O)Me$ | Cl | C(=O)Me | O |
| C-7600 | Me(S) | single bond | H | Et | $CH_2OC(=O)Me$ | Cl | C(=O)Me | O |

TABLE 400-continued

| Compound Number | Y | W | Z | $R^1$ | $R^2$ | $R^3$ | $R^{10}$ | A |
|---|---|---|---|---|---|---|---|---|
| C-7601 | H | $CH_2$ | Me | Et | $CH_2OC(=O)Me$ | Cl | C(=O)Me | O |
| C-7602 | Me | $CH_2$ | H | Et | $CH_2OC(=O)Me$ | Cl | C(=O)Me | O |
| C-7603 | H | CH(Me) | H | Et | $CH_2OC(=O)Me$ | Cl | C(=O)Me | O |
| C-7604 | H | $CH_2CH_2$ | Me | Et | $CH_2OC(=O)Me$ | Cl | C(=O)Me | O |
| C-7605 | Me | $CH_2CH_2$ | H | Et | $CH_2OC(=O)Me$ | Cl | C(=O)Me | O |
| C-7606 | H | single bond | Me | Et | $CH_2OC(=O)Me$ | Me | C(=O)Me | O |
| C-7607 | Me | single bond | H | Et | $CH_2OC(=O)Me$ | Me | C(=O)Me | O |
| C-7608 | Me(R) | single bond | H | Et | $CH_2OC(=O)Me$ | Me | C(=O)Me | O |
| C-7609 | Me(S) | single bond | H | Et | $CH_2OC(=O)Me$ | Me | C(=O)Me | O |
| C-7610 | H | $CH_2$ | Me | Et | $CH_2OC(=O)Me$ | Me | C(=O)Me | O |
| C-7611 | Me | $CH_2$ | H | Et | $CH_2OC(=O)Me$ | Me | C(=O)Me | O |
| C-7612 | H | CH(Me) | H | Et | $CH_2OC(=O)Me$ | Me | C(=O)Me | O |
| C-7613 | H | $CH_2CH_2$ | Me | Et | $CH_2OC(=O)Me$ | Me | C(=O)Me | O |
| C-7614 | Me | $CH_2CH_2$ | H | Et | $CH_2OC(=O)Me$ | Me | C(=O)Me | O |
| C-7615 | H | single bond | Me | Et | $CH_2OC(=O)$(i-Pr) | Cl | C(=O)Me | O |
| C-7616 | Me | single bond | H | Et | $CH_2OC(=O)$(i-Pr) | Cl | C(=O)Me | O |
| C-7617 | Me(R) | single bond | H | Et | $CH_2OC(=O)$(i-Pr) | Cl | C(=O)Me | O |
| C-7618 | Me(S) | single bond | H | Et | $CH_2OC(=O)$(i-Pr) | Cl | C(=O)Me | O |

TABLE 401

| Compound Number | Y | W | Z | $R^1$ | $R^2$ | $R^3$ | $R^{10}$ | A |
|---|---|---|---|---|---|---|---|---|
| C-7619 | H | $CH_2$ | Me | Et | $CH_2OC(=O)$(i-Pr) | Cl | C(=O)Me | O |
| C-7620 | Me | $CH_2$ | H | Et | $CH_2OC(=O)$(i-Pr) | Cl | C(=O)Me | O |
| C-7621 | H | CH(Me) | H | Et | $CH_2OC(=O)$(i-Pr) | Cl | C(=O)Me | O |
| C-7622 | H | $CH_2CH_2$ | Me | Et | $CH_2OC(=O)$(i-Pr) | Cl | C(=O)Me | O |
| C-7623 | Me | $CH_2CH_2$ | H | Et | $CH_2OC(=O)$(i-Pr) | Cl | C(=O)Me | O |
| C-7624 | H | single bond | Me | Et | $CH_2OC(=O)$(i-Pr) | Me | C(=O)Me | O |
| C-7625 | Me | single bond | H | Et | $CH_2OC(=O)$(i-Pr) | Me | C(=O)Me | O |
| C-7626 | Me(R) | single bond | H | Et | $CH_2OC(=O)$(i-Pr) | Me | C(=O)Me | O |
| C-7627 | Me(S) | single bond | H | Et | $CH_2OC(=O)$(i-Pr) | Me | C(=O)Me | O |
| C-7628 | H | $CH_2$ | Me | Et | $CH_2OC(=O)$(i-Pr) | Me | C(=O)Me | O |
| C-7629 | Me | $CH_2$ | H | Et | $CH_2OC(=O)$(i-Pr) | Me | C(=O)Me | O |
| C-7630 | H | CH(Me) | H | Et | $CH_2OC(=O)$(i-Pr) | Me | C(=O)Me | O |
| C-7631 | H | $CH_2CH_2$ | Me | Et | $CH_2OC(=O)$(i-Pr) | Me | C(=O)Me | O |
| C-7632 | Me | $CH_2CH_2$ | H | Et | $CH_2OC(=O)$(i-Pr) | Me | C(=O)Me | O |
| C-7633 | H | single bond | Me | Et | $CH_2OC(=O)$(t-Bu) | Cl | C(=O)Me | O |
| C-7634 | Me | single bond | H | Et | $CH_2OC(=O)$(t-Bu) | Cl | C(=O)Me | O |
| C-7635 | Me(R) | single bond | H | Et | $CH_2OC(=O)$(t-Bu) | Cl | C(=O)Me | O |
| C-7636 | Me(S) | single bond | H | Et | $CH_2OC(=O)$(t-Bu) | Cl | C(=O)Me | O |
| C-7637 | H | $CH_2$ | Me | Et | $CH_2OC(=O)$(t-Bu) | Cl | C(=O)Me | O |
| C-7638 | Me | $CH_2$ | H | Et | $CH_2OC(=O)$(t-Bu) | Cl | C(=O)Me | O |
| C-7639 | H | CH(Me) | H | Et | $CH_2OC(=O)$(t-Bu) | Cl | C(=O)Me | O |
| C-7640 | H | $CH_2CH_2$ | Me | Et | $CH_2OC(=O)$(t-Bu) | Cl | C(=O)Me | O |
| C-7641 | Me | $CH_2CH_2$ | H | Et | $CH_2OC(=O)$(t-Bu) | Cl | C(=O)Me | O |
| C-7642 | H | single bond | Me | Et | $CH_2OC(=O)$(t-Bu) | Me | C(=O)Me | O |
| C-7643 | Me | single bond | H | Et | $CH_2OC(=O)$(t-Bu) | Me | C(=O)Me | O |
| C-7644 | Me(R) | single bond | H | Et | $CH_2OC(=O)$(t-Bu) | Me | C(=O)Me | O |
| C-7645 | Me(S) | single bond | H | Et | $CH_2OC(=O)$(t-Bu) | Me | C(=O)Me | O |
| C-7646 | H | $CH_2$ | Me | Et | $CH_2OC(=O)$(t-Bu) | Me | C(=O)Me | O |
| C-7647 | Me | $CH_2$ | H | Et | $CH_2OC(=O)$(t-Bu) | Me | C(=O)Me | O |
| C-7648 | H | CH(Me) | H | Et | $CH_2OC(=O)$(t-Bu) | Me | C(=O)Me | O |
| C-7649 | H | $CH_2CH_2$ | Me | Et | $CH_2OC(=O)$(t-Bu) | Me | C(=O)Me | O |
| C-7650 | Me | $CH_2CH_2$ | H | Et | $CH_2OC(=O)$(t-Bu) | Me | C(=O)Me | O |
| C-7651 | H | single bond | Me | Et | $CH_2OC(=O)OEt$ | Cl | C(=O)Me | O |
| C-7652 | Me | single bond | H | Et | $CH_2OC(=O)OEt$ | Cl | C(=O)Me | O |
| C-7653 | Me(R) | single bond | H | Et | $CH_2OC(=O)OEt$ | Cl | C(=O)Me | O |
| C-7654 | Me(S) | single bond | H | Et | $CH_2OC(=O)OEt$ | Cl | C(=O)Me | O |
| C-7655 | H | $CH_2$ | Me | Et | $CH_2OC(=O)OEt$ | Cl | C(=O)Me | O |
| C-7656 | Me | $CH_2$ | H | Et | $CH_2OC(=O)OEt$ | Cl | C(=O)Me | O |
| C-7657 | H | CH(Me) | H | Et | $CH_2OC(=O)OEt$ | Cl | C(=O)Me | O |
| C-7658 | H | $CH_2CH_2$ | Me | Et | $CH_2OC(=O)OEt$ | Cl | C(=O)Me | O |
| C-7659 | Me | $CH_2CH_2$ | H | Et | $CH_2OC(=O)OEt$ | Cl | C(=O)Me | O |
| C-7660 | H | single bond | Me | Et | $CH_2OC(=O)OEt$ | Me | C(=O)Me | O |
| C-7661 | Me | single bond | H | Et | $CH_2OC(=O)OEt$ | Me | C(=O)Me | O |
| C-7662 | Me(R) | single bond | H | Et | $CH_2OC(=O)OEt$ | Me | C(=O)Me | O |

TABLE 402

| Compound Number | Y | W | Z | $R^1$ | $R^2$ | $R^3$ | $R^{10}$ | A |
|---|---|---|---|---|---|---|---|---|
| C-7663 | Me(S) | single bond | H | Et | $CH_2OC(=O)OEt$ | Me | C(=O)Me | O |
| C-7664 | H | $CH_2$ | Me | Et | $CH_2OC(=O)OEt$ | Me | C(=O)Me | O |
| C-7665 | Me | $CH_2$ | H | Et | $CH_2OC(=O)OEt$ | Me | C(=O)Me | O |
| C-7666 | H | CH(Me) | H | Et | $CH_2OC(=O)OEt$ | Me | C(=O)Me | O |
| C-7667 | H | $CH_2CH_2$ | Me | Et | $CH_2OC(=O)OEt$ | Me | C(=O)Me | O |
| C-7668 | Me | $CH_2CH_2$ | H | Et | $CH_2OC(=O)OEt$ | Me | C(=O)Me | O |
| C-7669 | H | single bond | Me | Et | $CH_2OC(=O)O(i-Pr)$ | Cl | C(=O)Me | O |
| C-7670 | Me | single bond | H | Et | $CH_2OC(=O)O(i-Pr)$ | Cl | C(=O)Me | O |
| C-7671 | Me(R) | single bond | H | Et | $CH_2OC(=O)O(i-Pr)$ | Cl | C(=O)Me | O |
| C-7672 | Me(S) | single bond | H | Et | $CH_2OC(=O)O(i-Pr)$ | Cl | C(=O)Me | O |
| C-7673 | H | $CH_2$ | Me | Et | $CH_2OC(=O)O(i-Pr)$ | Cl | C(=O)Me | O |
| C-7674 | Me | $CH_2$ | H | Et | $CH_2OC(=O)O(i-Pr)$ | Cl | C(=O)Me | O |
| C-7675 | H | CH(Me) | H | Et | $CH_2OC(=O)O(i-Pr)$ | Cl | C(=O)Me | O |
| C-7676 | H | $CH_2CH_2$ | Me | Et | $CH_2OC(=O)O(i-Pr)$ | Cl | C(=O)Me | O |
| C-7677 | Me | $CH_2CH_2$ | H | Et | $CH_2OC(=O)O(i-Pr)$ | Cl | C(=O)Me | O |
| C-7678 | H | single bond | Me | Et | $CH_2OC(=O)O(i-Pr)$ | Me | C(=O)Me | O |
| C-7679 | Me | single bond | H | Et | $CH_2OC(=O)O(i-Pr)$ | Me | C(=O)Me | O |
| C-7680 | Me(R) | single bond | H | Et | $CH_2OC(=O)O(i-Pr)$ | Me | C(=O)Me | O |
| C-7681 | Me(S) | single bond | H | Et | $CH_2OC(=O)O(i-Pr)$ | Me | C(=O)Me | O |
| C-7682 | H | $CH_2$ | Me | Et | $CH_2OC(=O)O(i-Pr)$ | Me | C(=O)Me | O |
| C-7683 | Me | $CH_2$ | H | Et | $CH_2OC(=O)O(i-Pr)$ | Me | C(=O)Me | O |
| C-7684 | H | CH(Me) | H | Et | $CH_2OC(=O)O(i-Pr)$ | Me | C(=O)Me | O |
| C-7685 | H | $CH_2CH_2$ | Me | Et | $CH_2OC(=O)O(i-Pr)$ | Me | C(=O)Me | O |
| C-7686 | Me | $CH_2CH_2$ | H | Et | $CH_2OC(=O)O(i-Pr)$ | Me | C(=O)Me | O |
| C-7687 | H | single bond | Me | Et | $CH_2N(Me)C(=O)OMe$ | Cl | C(=O)Me | O |
| C-7688 | Me | single bond | H | Et | $CH_2N(Me)C(=O)OMe$ | Cl | C(=O)Me | O |
| C-7689 | Me(R) | single bond | H | Et | $CH_2N(Me)C(=O)OMe$ | Cl | C(=O)Me | O |
| C-7690 | Me(S) | single bond | H | Et | $CH_2N(Me)C(=O)OMe$ | Cl | C(=O)Me | O |
| C-7691 | H | $CH_2$ | Me | Et | $CH_2N(Me)C(=O)OMe$ | Cl | C(=O)Me | O |
| C-7692 | Me | $CH_2$ | H | Et | $CH_2N(Me)C(=O)OMe$ | Cl | C(=O)Me | O |
| C-7693 | H | CH(Me) | H | Et | $CH_2N(Me)C(=O)OMe$ | Cl | C(=O)Me | O |
| C-7694 | H | $CH_2CH_2$ | Me | Et | $CH_2N(Me)C(=O)OMe$ | Cl | C(=O)Me | O |
| C-7695 | Me | $CH_2CH_2$ | H | Et | $CH_2N(Me)C(=O)OMe$ | Cl | C(=O)Me | O |
| C-7696 | H | single bond | Me | Et | $CH_2N(Me)C(=O)OMe$ | Me | C(=O)Me | O |
| C-7697 | Me | single bond | H | Et | $CH_2N(Me)C(=O)OMe$ | Me | C(=O)Me | O |
| C-7698 | Me(R) | single bond | H | Et | $CH_2N(Me)C(=O)OMe$ | Me | C(=O)Me | O |
| C-7699 | Me(S) | single bond | H | Et | $CH_2N(Me)C(=O)OMe$ | Me | C(=O)Me | O |
| C-7700 | H | $CH_2$ | Me | Et | $CH_2N(Me)C(=O)OMe$ | Me | C(=O)Me | O |
| C-7701 | Me | $CH_2$ | H | Et | $CH_2N(Me)C(=O)OMe$ | Me | C(=O)Me | O |
| C-7702 | H | CH(Me) | H | Et | $CH_2N(Me)C(=O)OMe$ | Me | C(=O)Me | O |
| C-7703 | H | $CH_2CH_2$ | Me | Et | $CH_2N(Me)C(=O)OMe$ | Me | C(=O)Me | O |
| C-7704 | Me | $CH_2CH_2$ | H | Et | $CH_2N(Me)C(=O)OMe$ | Me | C(=O)Me | O |
| C-7705 | H | single bond | Me | c-Pr | $C(=O)OCH_2CH=CH_2$ | Cl | H | O |
| C-7706 | Me | single bond | H | c-Pr | $C(=O)OCH_2CH=CH_2$ | Cl | H | O |

TABLE 403

| Compound Number | Y | W | Z | $R^1$ | $R^2$ | $R^3$ | $R^{10}$ | A |
|---|---|---|---|---|---|---|---|---|
| C-7707 | Me(R) | single bond | H | c-Pr | $C(=O)OCH_2CH=CH_2$ | Cl | H | O |
| C-7708 | Me(S) | single bond | H | c-Pr | $C(=O)OCH_2CH=CH_2$ | Cl | H | O |
| C-7709 | H | $CH_2$ | Me | c-Pr | $C(=O)OCH_2CH=CH_2$ | Cl | H | O |
| C-7710 | Me | $CH_2$ | H | c-Pr | $C(=O)OCH_2CH=CH_2$ | Cl | H | O |
| C-7711 | H | CH(Me) | H | c-Pr | $C(=O)OCH_2CH=CH_2$ | Cl | H | O |
| C-7712 | H | $CH_2CH_2$ | Me | c-Pr | $C(=O)OCH_2CH=CH_2$ | Cl | H | O |
| C-7713 | Me | $CH_2CH_2$ | H | c-Pr | $C(=O)OCH_2CH=CH_2$ | Cl | H | O |
| C-7714 | H | single bond | Me | c-Pr | $C(=O)OCH_2CH=CH_2$ | Me | H | O |
| C-7715 | Me | single bond | H | c-Pr | $C(=O)OCH_2CH=CH_2$ | Me | H | O |
| C-7716 | Me(R) | single bond | H | c-Pr | $C(=O)OCH_2CH=CH_2$ | Me | H | O |
| C-7717 | Me(S) | single bond | H | c-Pr | $C(=O)OCH_2CH=CH_2$ | Me | H | O |
| C-7718 | H | $CH_2$ | Me | c-Pr | $C(=O)OCH_2CH=CH_2$ | Me | H | O |
| C-7719 | Me | $CH_2$ | H | c-Pr | $C(=O)OCH_2CH=CH_2$ | Me | H | O |
| C-7720 | H | CH(Me) | H | c-Pr | $C(=O)OCH_2CH=CH_2$ | Me | H | O |
| C-7721 | H | $CH_2CH_2$ | Me | c-Pr | $C(=O)OCH_2CH=CH_2$ | Me | H | O |
| C-7722 | Me | $CH_2CH_2$ | H | c-Pr | $C(=O)OCH_2CH=CH_2$ | Me | H | O |
| C-7723 | H | single bond | Me | c-Pr | $C(=O)OCH_2CCl_3$ | Cl | H | O |
| C-7724 | Me | single bond | H | c-Pr | $C(=O)OCH_2CCl_3$ | Cl | H | O |
| C-7725 | Me(R) | single bond | H | c-Pr | $C(=O)OCH_2CCl_3$ | Cl | H | O |
| C-7726 | Me(S) | single bond | H | c-Pr | $C(=O)OCH_2CCl_3$ | Cl | H | O |
| C-7727 | H | $CH_2$ | Me | c-Pr | $C(=O)OCH_2CCl_3$ | Cl | H | O |
| C-7728 | Me | $CH_2$ | H | c-Pr | $C(=O)OCH_2CCl_3$ | Cl | H | O |
| C-7729 | H | CH(Me) | H | c-Pr | $C(=O)OCH_2CCl_3$ | Cl | H | O |

TABLE 403-continued

| Compound Number | Y | W | Z | $R^1$ | $R^2$ | $R^3$ | $R^{10}$ | A |
|---|---|---|---|---|---|---|---|---|
| C-7730 | H | $CH_2CH_2$ | Me | c-Pr | $C(=O)OCH_2CCl_3$ | Cl | H | O |
| C-7731 | Me | $CH_2CH_2$ | H | c-Pr | $C(=O)OCH_2CCl_3$ | Cl | H | O |
| C-7732 | H | single bond | Me | c-Pr | $C(=O)OCH_2CCl_3$ | Me | H | O |
| C-7733 | Me | single bond | H | c-Pr | $C(=O)OCH_2CCl_3$ | Me | H | O |
| C-7734 | Me(R) | single bond | H | c-Pr | $C(=O)OCH_2CCl_3$ | Me | H | O |
| C-7735 | Me(S) | single bond | H | c-Pr | $C(=O)OCH_2CCl_3$ | Me | H | O |
| C-7736 | H | $CH_2$ | Me | c-Pr | $C(=O)OCH_2CCl_3$ | Me | H | O |
| C-7737 | Me | $CH_2$ | H | c-Pr | $C(=O)OCH_2CCl_3$ | Me | H | O |
| C-7738 | H | CH(Me) | H | c-Pr | $C(=O)OCH_2CCl_3$ | Me | H | O |
| C-7739 | H | $CH_2CH_2$ | Me | c-Pr | $C(=O)OCH_2CCl_3$ | Me | H | O |
| C-7740 | Me | $CH_2CH_2$ | H | c-Pr | $C(=O)OCH_2CCl_3$ | Me | H | O |
| C-7741 | H | single bond | Me | c-Pr | $C(=O)N(Me)_2$ | Cl | H | O |
| C-7742 | Me | single bond | H | c-Pr | $C(=O)N(Me)_2$ | Cl | H | O |
| C-7743 | Me(R) | single bond | H | c-Pr | $C(=O)N(Me)_2$ | Cl | H | O |
| C-7744 | Me(S) | single bond | H | c-Pr | $C(=O)N(Me)_2$ | Cl | H | O |
| C-7745 | H | $CH_2$ | Me | c-Pr | $C(=O)N(Me)_2$ | Cl | H | O |
| C-7746 | Me | $CH_2$ | H | c-Pr | $C(=O)N(Me)_2$ | Cl | H | O |
| C-7747 | H | CH(Me) | H | c-Pr | $C(=O)N(Me)_2$ | Cl | H | O |
| C-7748 | H | $CH_2CH_2$ | Me | c-Pr | $C(=O)N(Me)_2$ | Cl | H | O |
| C-7749 | Me | $CH_2CH_2$ | H | c-Pr | $C(=O)N(Me)_2$ | Cl | H | O |
| C-7750 | H | single bond | Me | c-Pr | $C(=O)N(Me)_2$ | Me | H | O |

TABLE 404

| Compound Number | Y | W | Z | $R^1$ | $R^2$ | $R^3$ | $R^{10}$ | A |
|---|---|---|---|---|---|---|---|---|
| C-7751 | Me | single bond | H | c-Pr | $C(=O)N(Me)_2$ | Me | H | O |
| C-7752 | Me(R) | single bond | H | c-Pr | $C(=O)N(Me)_2$ | Me | H | O |
| C-7753 | Me(S) | single bond | H | c-Pr | $C(=O)N(Me)_2$ | Me | H | O |
| C-7754 | H | $CH_2$ | Me | c-Pr | $C(=O)N(Me)_2$ | Me | H | O |
| C-7755 | Me | $CH_2$ | H | c-Pr | $C(=O)N(Me)_2$ | Me | H | O |
| C-7756 | H | CH(Me) | H | c-Pr | $C(=O)N(Me)_2$ | Me | H | O |
| C-7757 | H | $CH_2CH_2$ | Me | c-Pr | $C(=O)N(Me)_2$ | Me | H | O |
| C-7758 | Me | $CH_2CH_2$ | H | c-Pr | $C(=O)N(Me)_2$ | Me | H | O |
| C-7759 | H | single bond | Me | c-Pr | $CH_2OC(=O)Me$ | Cl | H | O |
| C-7760 | Me | single bond | H | c-Pr | $CH_2OC(=O)Me$ | Cl | H | O |
| C-7761 | Me(R) | single bond | H | c-Pr | $CH_2OC(=O)Me$ | Cl | H | O |
| C-7762 | Me(S) | single bond | H | c-Pr | $CH_2OC(=O)Me$ | Cl | H | O |
| C-7763 | H | $CH_2$ | Me | c-Pr | $CH_2OC(=O)Me$ | Cl | H | O |
| C-7764 | Me | $CH_2$ | H | c-Pr | $CH_2OC(=O)Me$ | Cl | H | O |
| C-7765 | H | CH(Me) | H | c-Pr | $CH_2OC(=O)Me$ | Cl | H | O |
| C-7766 | H | $CH_2CH_2$ | Me | c-Pr | $CH_2OC(=O)Me$ | Cl | H | O |
| C-7767 | Me | $CH_2CH_2$ | H | c-Pr | $CH_2OC(=O)Me$ | Cl | H | O |
| C-7768 | H | single bond | Me | c-Pr | $CH_2OC(=O)Me$ | Me | H | O |
| C-7769 | Me | single bond | H | c-Pr | $CH_2OC(=O)Me$ | Me | H | O |
| C-7770 | Me(R) | single bond | H | c-Pr | $CH_2OC(=O)Me$ | Me | H | O |
| C-7771 | Me(S) | single bond | H | c-Pr | $CH_2OC(=O)Me$ | Me | H | O |
| C-7772 | H | $CH_2$ | Me | c-Pr | $CH_2OC(=O)Me$ | Me | H | O |
| C-7773 | Me | $CH_2$ | H | c-Pr | $CH_2OC(=O)Me$ | Me | H | O |
| C-7774 | H | CH(Me) | H | C-Pr | $CH_2OC(=O)Me$ | Me | H | O |
| C-7775 | H | $CH_2CH_2$ | Me | c-Pr | $CH_2OC(=O)Me$ | Me | H | O |
| C-7776 | Me | $CH_2CH_2$ | H | c-Pr | $CH_2OC(=O)Me$ | Me | H | O |
| C-7777 | H | single bond | Me | c-Pr | $CH_2OC(=O)(i-Pr)$ | Cl | H | O |
| C-7778 | Me | single bond | H | c-Pr | $CH_2OC(=O)(i-Pr)$ | Cl | H | O |
| C-7779 | Me(R) | single bond | H | c-Pr | $CH_2OC(=O)(i-Pr)$ | Cl | H | O |
| C-7780 | Me(S) | single bond | H | c-Pr | $CH_2OC(=O)(i-Pr)$ | Cl | H | O |
| C-7781 | H | $CH_2$ | Me | c-Pr | $CH_2OC(=O)(i-Pr)$ | Cl | H | O |
| C-7782 | Me | $CH_2$ | H | c-Pr | $CH_2OC(=O)(i-Pr)$ | Cl | H | O |
| C-7783 | H | CH(Me) | H | c-Pr | $CH_2OC(=O)(i-Pr)$ | Cl | H | O |
| C-7784 | H | $CH_2CH_2$ | Me | c-Pr | $CH_2OC(=O)(i-Pr)$ | Cl | H | O |
| C-7785 | Me | $CH_2CH_2$ | H | c-Pr | $CH_2OC(=O)(i-Pr)$ | Cl | H | O |
| C-7786 | H | single bond | Me | c-Pr | $CH_2OC(=O)(i-Pr)$ | Me | H | O |
| C-7787 | Me | single bond | H | c-Pr | $CH_2OC(=O)(i-Pr)$ | Me | H | O |
| C-7788 | Me(R) | single bond | H | c-Pr | $CH_2OC(=O)(i-Pr)$ | Me | H | O |
| C-7789 | Me(S) | single bond | H | c-Pr | $CH_2OC(=O)(i-Pr)$ | Me | H | O |
| C-7790 | H | $CH_2$ | Me | c-Pr | $CH_2OC(=O)(i-Pr)$ | Me | H | O |
| C-7791 | Me | $CH_2$ | H | c-Pr | $CH_2OC(=O)(i-Pr)$ | Me | H | O |
| C-7792 | H | CH(Me) | H | c-Pr | $CH_2OC(=O)(i-Pr)$ | Me | H | O |
| C-7793 | H | $CH_2CH_2$ | Me | c-Pr | $CH_2OC(=O)(i-Pr)$ | Me | H | O |
| C-7794 | Me | $CH_2CH_2$ | H | c-Pr | $CH_2OC(=O)(i-Pr)$ | Me | H | O |

TABLE 405

| Compound Number | Y | W | Z | $R^1$ | $R^2$ | $R^3$ | $R^{10}$ | A |
|---|---|---|---|---|---|---|---|---|
| C-7795 | H | single bond | Me | c-Pr | $CH_2OC(=O)(t-Bu)$ | Cl | H | O |
| C-7796 | Me | single bond | H | c-Pr | $CH_2OC(=O)(t-Bu)$ | Cl | H | O |
| C-7797 | Me(R) | single bond | H | c-Pr | $CH_2OC(=O)(t-Bu)$ | Cl | H | O |
| C-7798 | Me(S) | single bond | H | c-Pr | $CH_2OC(=O)(t-Bu)$ | Cl | H | O |
| C-7799 | H | $CH_2$ | Me | c-Pr | $CH_2OC(=O)(t-Bu)$ | Cl | H | O |
| C-7800 | Me | $CH_2$ | H | c-Pr | $CH_2OC(=O)(t-Bu)$ | Cl | H | O |
| C-7801 | H | CH(Me) | H | c-Pr | $CH_2OC(=O)(t-Bu)$ | Cl | H | O |
| C-7802 | H | $CH_2CH_2$ | Me | c-Pr | $CH_2OC(=O)(t-Bu)$ | Cl | H | O |
| C-7803 | Me | $CH_2CH_2$ | H | c-Pr | $CH_2OC(=O)(t-Bu)$ | Cl | H | O |
| C-7804 | H | single bond | Me | c-Pr | $CH_2OC(=O)(t-Bu)$ | Me | H | O |
| C-7805 | Me | single bond | H | c-Pr | $CH_2OC(=O)(t-Bu)$ | Me | H | O |
| C-7806 | Me(R) | single bond | H | c-Pr | $CH_2OC(=O)(t-Bu)$ | Me | H | O |
| C-7807 | Me(S) | single bond | H | c-Pr | $CH_2OC(=O)(t-Bu)$ | Me | H | O |
| C-7808 | H | $CH_2$ | Me | c-Pr | $CH_2OC(=O)(t-Bu)$ | Me | H | O |
| C-7809 | Me | $CH_2$ | H | c-Pr | $CH_2OC(=O)(t-Bu)$ | Me | H | O |
| C-7810 | H | CH(Me) | H | c-Pr | $CH_2OC(=O)(t-Bu)$ | Me | H | O |
| C-7811 | H | $CH_2CH_2$ | Me | c-Pr | $CH_2OC(=O)(t-Bu)$ | Me | H | O |
| C-7812 | Me | $CH_2CH_2$ | H | c-Pr | $CH_2OC(=O)(t-Bu)$ | Me | H | O |
| C-7813 | H | single bond | Me | c-Pr | $CH_2OC(=O)OEt$ | Cl | H | O |
| C-7814 | Me | single bond | H | c-Pr | $CH_2OC(=O)OEt$ | Cl | H | O |
| C-7815 | Me(R) | single bond | H | c-Pr | $CH_2OC(=O)OEt$ | Cl | H | O |
| C-7816 | Me(S) | single bond | H | c-Pr | $CH_2OC(=O)OEt$ | Cl | H | O |
| C-7817 | H | $CH_2$ | Me | c-Pr | $CH_2OC(=O)OEt$ | Cl | H | O |
| C-7818 | Me | $CH_2$ | H | c-Pr | $CH_2OC(=O)OEt$ | Cl | H | O |
| C-7819 | H | CH(Me) | H | c-Pr | $CH_2OC(=O)OEt$ | Cl | H | O |
| C-7820 | H | $CH_2CH_2$ | Me | c-Pr | $CH_2OC(=O)OEt$ | Cl | H | O |
| C-7821 | Me | $CH_2CH_2$ | H | c-Pr | $CH_2OC(=O)OEt$ | Cl | H | O |
| C-7822 | H | single bond | Me | c-Pr | $CH_2OC(=O)OEt$ | Me | H | O |
| C-7823 | Me | single bond | H | c-Pr | $CH_2OC(=O)OEt$ | Me | H | O |
| C-7824 | Me(R) | single bond | H | c-Pr | $CH_2OC(=O)OEt$ | Me | H | O |
| C-7825 | Me(S) | single bond | H | c-Pr | $CH_2OC(=O)OEt$ | Me | H | O |
| C-7826 | H | $CH_2$ | Me | c-Pr | $CH_2OC(=O)OEt$ | Me | H | O |
| C-7827 | Me | $CH_2$ | H | c-Pr | $CH_2OC(=O)OEt$ | Me | H | O |
| C-7828 | H | CH(Me) | H | c-Pr | $CH_2OC(=O)OEt$ | Me | H | O |
| C-7829 | H | $CH_2CH_2$ | Me | c-Pr | $CH_2OC(=O)OEt$ | Me | H | O |
| C-7830 | Me | $CH_2CH_2$ | H | c-Pr | $CH_2OC(=O)OEt$ | Me | H | O |
| C-7831 | H | single bond | Me | c-Pr | $CH_2OC(=O)O(i-Pr)$ | Cl | H | O |
| C-7832 | Me | single bond | H | c-Pr | $CH_2OC(=O)O(i-Pr)$ | Cl | H | O |
| C-7833 | Me(R) | single bond | H | c-Pr | $CH_2OC(=O)O(i-Pr)$ | Cl | H | O |
| C-7834 | Me(S) | single bond | H | c-Pr | $CH_2OC(=O)O(i-Pr)$ | Cl | H | O |
| C-7835 | H | $CH_2$ | Me | c-Pr | $CH_2OC(=O)O(i-Pr)$ | Cl | H | O |
| C-7836 | Me | $CH_2$ | H | c-Pr | $CH_2OC(=O)O(i-Pr)$ | Cl | H | O |
| C-7837 | H | CH(Me) | H | c-Pr | $CH_2OC(=O)O(i-Pr)$ | Cl | H | O |
| C-7838 | H | $CH_2CH_2$ | Me | c-Pr | $CH_2OC(=O)O(i-Pr)$ | Cl | H | O |

TABLE 406

| Compound Number | Y | W | Z | $R^1$ | $R^2$ | $R^3$ | $R^{10}$ | A |
|---|---|---|---|---|---|---|---|---|
| C-7839 | Me | $CH_2CH_2$ | H | c-Pr | $CH_2OC(=O)O(i-Pr)$ | Cl | H | O |
| C-7840 | H | single bond | Me | c-Pr | $CH_2OC(=O)O(i-Pr)$ | Me | H | O |
| C-7841 | Me | single bond | H | c-Pr | $CH_2OC(=O)O(i-Pr)$ | Me | H | O |
| C-7842 | Me(R) | single bond | H | c-Pr | $CH_2OC(=O)O(i-Pr)$ | Me | H | O |
| C-7843 | Me(S) | single bond | H | c-Pr | $CH_2OC(=O)O(i-Pr)$ | Me | H | O |
| C-7844 | H | $CH_2$ | Me | c-Pr | $CH_2OC(=O)O(i-Pr)$ | Me | H | O |
| C-7845 | Me | $CH_2$ | H | c-Pr | $CH_2OC(=O)O(i-Pr)$ | Me | H | O |
| C-7846 | H | CH(Me) | H | c-Pr | $CH_2OC(=O)O(i-Pr)$ | Me | H | O |
| C-7847 | H | $CH_2CH_2$ | Me | c-Pr | $CH_2OC(=O)O(i-Pr)$ | Me | H | O |
| C-7848 | Me | $CH_2CH_2$ | H | c-Pr | $CH_2OC(=O)O(i-Pr)$ | Me | H | O |
| C-7849 | H | single bond | Me | c-Pr | $CH_2N(Me)C(=O)OMe$ | Cl | H | O |
| C-7850 | Me | single bond | H | c-Pr | $CH_2N(Me)C(=O)OMe$ | Cl | H | O |
| C-7851 | Me(R) | single bond | H | c-Pr | $CH_2N(Me)C(=O)OMe$ | Cl | H | O |
| C-7852 | Me(S) | single bond | H | c-Pr | $CH_2N(Me)C(=O)OMe$ | Cl | H | O |
| C-7853 | H | $CH_2$ | Me | c-Pr | $CH_2N(Me)C(=O)OMe$ | Cl | H | O |
| C-7854 | Me | $CH_2$ | H | c-Pr | $CH_2N(Me)C(=O)OMe$ | Cl | H | O |
| C-7855 | H | CH(Me) | H | c-Pr | $CH_2N(Me)C(=O)OMe$ | Cl | H | O |
| C-7856 | H | $CH_2CH_2$ | Me | c-Pr | $CH_2N(Me)C(=O)OMe$ | Cl | H | O |
| C-7857 | Me | $CH_2CH_2$ | H | c-Pr | $CH_2N(Me)C(=O)OMe$ | Cl | H | O |
| C-7858 | H | single bond | Me | c-Pr | $CH_2N(Me)C(=O)OMe$ | Me | H | O |
| C-7859 | Me | single bond | H | c-Pr | $CH_2N(Me)C(=O)OMe$ | Me | H | O |

TABLE 406-continued

| Compound Number | Y | W | Z | $R^1$ | $R^2$ | $R^3$ | $R^{10}$ | A |
|---|---|---|---|---|---|---|---|---|
| C-7860 | Me(R) | single bond | H | c-Pr | $CH_2N(Me)C(=O)OMe$ | Me | H | O |
| C-7861 | Me(S) | single bond | H | c-Pr | $CH_2N(Me)C(=O)OMe$ | Me | H | O |
| C-7862 | H | $CH_2$ | Me | c-Pr | $CH_2N(Me)C(=O)OMe$ | Me | H | O |
| C-7863 | Me | $CH_2$ | H | c-Pr | $CH_2N(Me)C(=O)OMe$ | Me | H | O |
| C-7864 | H | CH(Me) | H | c-Pr | $CH_2N(Me)C(=O)OMe$ | Me | H | O |
| C-7865 | H | $CH_2CH_2$ | Me | c-Pr | $CH_2N(Me)C(=O)OMe$ | Me | H | O |
| C-7866 | Me | $CH_2CH_2$ | H | c-Pr | $CH_2N(Me)C(=O)OMe$ | Me | H | O |
| C-7867 | H | single bond | Me | c-Pr | $C(=O)OCH_2CH=CH_2$ | Cl | Me | O |
| C-7868 | Me | single bond | H | c-Pr | $C(=O)OCH_2CH=CH_2$ | Cl | Me | O |
| C-7869 | Me(R) | single bond | H | c-Pr | $C(=O)OCH_2CH=CH_2$ | Cl | Me | O |
| C-7870 | Me(S) | single bond | H | c-Pr | $C(=O)OCH_2CH=CH_2$ | Cl | Me | O |
| C-7871 | H | $CH_2$ | Me | c-Pr | $C(=O)OCH_2CH=CH_2$ | Cl | Me | O |
| C-7872 | Me | $CH_2$ | H | c-Pr | $C(=O)OCH_2CH=CH_2$ | Cl | Me | O |
| C-7873 | H | CH(Me) | H | c-Pr | $C(=O)OCH_2CH=CH_2$ | Cl | Me | O |
| C-7874 | H | $CH_2CH_2$ | Me | c-Pr | $C(=O)OCH_2CH=CH_2$ | Cl | Me | O |
| C-7875 | Me | $CH_2CH_2$ | H | c-Pr | $C(=O)OCH_2CH=CH_2$ | Cl | Me | O |
| C-7876 | H | single bond | Me | c-Pr | $C(=O)OCH_2CH=CH_2$ | Me | Me | O |
| C-7877 | Me | single bond | H | c-Pr | $C(=O)OCH_2CH=CH_2$ | Me | Me | O |
| C-7878 | Me(R) | single bond | H | c-Pr | $C(=O)OCH_2CH=CH_2$ | Me | Me | O |
| C-7879 | Me(S) | single bond | H | c-Pr | $C(=O)OCH_2CH=CH_2$ | Me | Me | O |
| C-7880 | H | $CH_2$ | Me | c-Pr | $C(=O)OCH_2CH=CH_2$ | Me | Me | O |
| C-7881 | Me | $CH_2$ | H | c-Pr | $C(=O)OCH_2CH=CH_2$ | Me | Me | O |
| C-7882 | H | CH(Me) | H | c-Pr | $C(=O)OCH_2CH=CH_2$ | Me | Me | O |

TABLE 407

| Compound Number | Y | W | Z | $R^1$ | $R^2$ | $R^3$ | $R^{10}$ | A |
|---|---|---|---|---|---|---|---|---|
| C-7883 | H | $CH_2CH_2$ | Me | c-Pr | $C(=O)OCH_2CH=CH_2$ | Me | Me | O |
| C-7884 | Me | $CH_2CH_2$ | H | c-Pr | $C(=O)OCH_2CH=CH_2$ | Me | Me | O |
| C-7885 | H | single bond | Me | c-Pr | $C(=O)OCH_2CCl_3$ | Cl | Me | O |
| C-7886 | Me | single bond | H | c-Pr | $C(=O)OCH_2CCl_3$ | Cl | Me | O |
| C-7887 | Me(R) | single bond | H | c-Pr | $C(=O)OCH_2CCl_3$ | Cl | Me | O |
| C-7888 | Me(S) | single bond | H | c-Pr | $C(=O)OCH_2CCl_3$ | Cl | Me | O |
| C-7889 | H | $CH_2$ | Me | c-Pr | $C(=O)OCH_2CCl_3$ | Cl | Me | O |
| C-7890 | Me | $CH_2$ | H | c-Pr | $C(=O)OCH_2CCl_3$ | Cl | Me | O |
| C-7891 | H | CH(Me) | H | c-Pr | $C(=O)OCH_2CCl_3$ | Cl | Me | O |
| C-7892 | H | $CH_2CH_2$ | Me | c-Pr | $C(=O)OCH_2CCl_3$ | Cl | Me | O |
| C-7893 | Me | $CH_2CH_2$ | H | c-Pr | $C(=O)OCH_2CCl_3$ | Cl | Me | O |
| C-7894 | H | single bond | Me | c-Pr | $C(=O)OCH_2CCl_3$ | Me | Me | O |
| C-7895 | Me | single bond | H | c-Pr | $C(=O)OCH_2CCl_3$ | Me | Me | O |
| C-7896 | Me(R) | single bond | H | c-Pr | $C(=O)OCH_2CCl_3$ | Me | Me | O |
| C-7897 | Me(S) | single bond | H | c-Pr | $C(=O)OCH_2CCl_3$ | Me | Me | O |
| C-7898 | H | $CH_2$ | Me | c-Pr | $C(=O)OCH_2CCl_3$ | Me | Me | O |
| C-7899 | Me | $CH_2$ | H | c-Pr | $C(=O)OCH_2CCl_3$ | Me | Me | O |
| C-7900 | H | CH(Me) | H | c-Pr | $C(=O)OCH_2CCl_3$ | Me | Me | O |
| C-7901 | H | $CH_2CH_2$ | Me | c-Pr | $C(=O)OCH_2CCl_3$ | Me | Me | O |
| C-7902 | Me | $CH_2CH_2$ | H | c-Pr | $C(=O)OCH_2CCl_3$ | Me | Me | O |
| C-7903 | H | single bond | Me | c-Pr | $C(=O)N(Me)_2$ | Cl | Me | O |
| C-7904 | Me | single bond | H | c-Pr | $C(=O)N(Me)_2$ | Cl | Me | O |
| C-7905 | Me(R) | single bond | H | c-Pr | $C(=O)N(Me)_2$ | Cl | Me | O |
| C-7906 | Me(S) | single bond | H | c-Pr | $C(=O)N(Me)_2$ | Cl | Me | O |
| C-7907 | H | $CH_2$ | Me | c-Pr | $C(=O)N(Me)_2$ | Cl | Me | O |
| C-7908 | Me | $CH_2$ | H | c-Pr | $C(=O)N(Me)_2$ | Cl | Me | O |
| C-7909 | H | CH(Me) | H | c-Pr | $C(=O)N(Me)_2$ | Cl | Me | O |
| C-7910 | H | $CH_2CH_2$ | Me | c-Pr | $C(=O)N(Me)_2$ | Cl | Me | O |
| C-7911 | Me | $CH_2CH_2$ | H | c-Pr | $C(=O)N(Me)_2$ | Cl | Me | O |
| C-7912 | H | single bond | Me | c-Pr | $C(=O)N(Me)_2$ | Me | Me | O |
| C-7913 | Me | single bond | H | c-Pr | $C(=O)N(Me)_2$ | Me | Me | O |
| C-7914 | Me(R) | single bond | H | c-Pr | $C(=O)N(Me)_2$ | Me | Me | O |
| C-7915 | Me(S) | single bond | H | c-Pr | $C(=O)N(Me)_2$ | Me | Me | O |
| C-7916 | H | $CH_2$ | Me | c-Pr | $C(=O)N(Me)_2$ | Me | Me | O |
| C-7917 | Me | $CH_2$ | H | c-Pr | $C(=O)N(Me)_2$ | Me | Me | O |
| C-7918 | H | CH(Me) | H | c-Pr | $C(=O)N(Me)_2$ | Me | Me | O |
| C-7919 | H | $CH_2CH_2$ | Me | c-Pr | $C(=O)N(Me)_2$ | Me | Me | O |
| C-7920 | Me | $CH_2CH_2$ | H | c-Pr | $C(=O)N(Me)_2$ | Me | Me | O |
| C-7921 | H | single bond | Me | c-Pr | $CH_2OC(=O)Me$ | Cl | Me | O |
| C-7922 | Me | single bond | H | c-Pr | $CH_2OC(=O)Me$ | Cl | Me | O |
| C-7923 | Me(R) | single bond | H | c-Pr | $CH_2OC(=O)Me$ | Cl | Me | O |
| C-7924 | Me(S) | single bond | H | c-Pr | $CH_2OC(=O)Me$ | Cl | Me | O |

TABLE 407-continued

| Compound Number | Y | W | Z | $R^1$ | $R^2$ | $R^3$ | $R^{10}$ | A |
|---|---|---|---|---|---|---|---|---|
| C-7925 | H | $CH_2$ | Me | c-Pr | $CH_2OC(=O)Me$ | Cl | Me | O |
| C-7926 | Me | $CH_2$ | H | c-Pr | $CH_2OC(=O)Me$ | Cl | Me | O |

TABLE 408

| Compound Number | Y | W | Z | $R^1$ | $R^2$ | $R^3$ | $R^{10}$ | A |
|---|---|---|---|---|---|---|---|---|
| C-7927 | H | CH(Me) | H | c-Pr | $CH_2OC(=O)Me$ | Cl | Me | O |
| C-7928 | H | $CH_2CH_2$ | Me | c-Pr | $CH_2OC(=O)Me$ | Cl | Me | O |
| C-7929 | Me | $CH_2CH_2$ | H | c-Pr | $CH_2OC(=O)Me$ | Cl | Me | O |
| C-7930 | H | single bond | Me | c-Pr | $CH_2OC(=O)Me$ | Me | Me | O |
| C-7931 | Me | single bond | H | c-Pr | $CH_2OC(=O)Me$ | Me | Me | O |
| C-7932 | Me(R) | single bond | H | c-Pr | $CH_2OC(=O)Me$ | Me | Me | O |
| C-7933 | Me(S) | single bond | H | c-Pr | $CH_2OC(=O)Me$ | Me | Me | O |
| C-7934 | H | $CH_2$ | Me | c-Pr | $CH_2OC(=O)Me$ | Me | Me | O |
| C-7935 | Me | $CH_2$ | H | c-Pr | $CH_2OC(=O)Me$ | Me | Me | O |
| C-7936 | H | CH(Me) | H | c-Pr | $CH_2OC(=O)Me$ | Me | Me | O |
| C-7937 | H | $CH_2CH_2$ | Me | c-Pr | $CH_2OC(=O)Me$ | Me | Me | O |
| C-7938 | Me | $CH_2CH_2$ | H | c-Pr | $CH_2OC(=O)Me$ | Me | Me | O |
| C-7939 | H | single bond | Me | c-Pr | $CH_2OC(=O)(i-Pr)$ | Cl | Me | O |
| C-7940 | Me | single bond | H | c-Pr | $CH_2OC(=O)(i-Pr)$ | Cl | Me | O |
| C-7941 | Me(R) | single bond | H | c-Pr | $CH_2OC(=O)(i-Pr)$ | Cl | Me | O |
| C-7942 | Me(S) | single bond | H | c-Pr | $CH_2OC(=O)(i-Pr)$ | Cl | Me | O |
| C-7943 | H | $CH_2$ | Me | c-Pr | $CH_2OC(=O)(i-Pr)$ | Cl | Me | O |
| C-7944 | Me | $CH_2$ | H | c-Pr | $CH_2OC(=O)(i-Pr)$ | Cl | Me | O |
| C-7945 | H | CH(Me) | H | c-Pr | $CH_2OC(=O)(i-Pr)$ | Cl | Me | O |
| C-7946 | H | $CH_2CH_2$ | Me | c-Pr | $CH_2OC(=O)(i-Pr)$ | Cl | Me | O |
| C-7947 | Me | $CH_2CH_2$ | H | c-Pr | $CH_2OC(=O)(i-Pr)$ | Cl | Me | O |
| C-7948 | H | single bond | Me | c-Pr | $CH_2OC(=O)(i-Pr)$ | Me | Me | O |
| C-7949 | Me | single bond | H | c-Pr | $CH_2OC(=O)(i-Pr)$ | Me | Me | O |
| C-7950 | Me(R) | single bond | H | c-Pr | $CH_2OC(=O)(i-Pr)$ | Me | Me | O |
| C-7951 | Me(S) | single bond | H | c-Pr | $CH_2OC(=O)(i-Pr)$ | Me | Me | O |
| C-7952 | H | $CH_2$ | Me | c-Pr | $CH_2OC(=O)(i-Pr)$ | Me | Me | O |
| C-7953 | Me | $CH_2$ | H | c-Pr | $CH_2OC(=O)(i-Pr)$ | Me | Me | O |
| C-7954 | H | CH(Me) | H | c-Pr | $CH_2OC(=O)(i-Pr)$ | Me | Me | O |
| C-7955 | H | $CH_2CH_2$ | Me | c-Pr | $CH_2OC(=O)(i-Pr)$ | Me | Me | O |
| C-7956 | Me | $CH_2CH_2$ | H | c-Pr | $CH_2OC(=O)(i-Pr)$ | Me | Me | O |
| C-7957 | H | single bond | Me | c-Pr | $CH_2OC(=O)(t-Bu)$ | Cl | Me | O |
| C-7958 | Me | single bond | H | c-Pr | $CH_2OC(=O)(t-Bu)$ | Cl | Me | O |
| C-7959 | Me(R) | single bond | H | c-Pr | $CH_2OC(=O)(t-Bu)$ | Cl | Me | O |
| C-7960 | Me(S) | single bond | H | c-Pr | $CH_2OC(=O)(t-Bu)$ | Cl | Me | O |
| C-7961 | H | $CH_2$ | Me | c-Pr | $CH_2OC(=O)(t-Bu)$ | Cl | Me | O |
| C-7962 | Me | $CH_2$ | H | c-Pr | $CH_2OC(=O)(t-Bu)$ | Cl | Me | O |
| C-7963 | H | CH(Me) | H | c-Pr | $CH_2OC(=O)(t-Bu)$ | Cl | Me | O |
| C-7964 | H | $CH_2CH_2$ | Me | c-Pr | $CH_2OC(=O)(t-Bu)$ | Cl | Me | O |
| C-7965 | Me | $CH_2CH_2$ | H | c-Pr | $CH_2OC(=O)(t-Bu)$ | Cl | Me | O |
| C-7966 | H | single bond | Me | c-Pr | $CH_2OC(=O)(t-Bu)$ | Me | Me | O |
| C-7967 | Me | single bond | H | c-Pr | $CH_2OC(=O)(t-Bu)$ | Me | Me | O |
| C-7968 | Me(R) | single bond | H | c-Pr | $CH_2OC(=O)(t-Bu)$ | Me | Me | O |
| C-7969 | Me(S) | single bond | H | c-Pr | $CH_2OC(=O)(t-Bu)$ | Me | Me | O |
| C-7970 | H | $CH_2$ | Me | c-Pr | $CH_2OC(=O)(t-Bu)$ | Me | Me | O |

TABLE 409

| Compound Number | Y | W | Z | $R^1$ | $R^2$ | $R^3$ | $R^{10}$ | A |
|---|---|---|---|---|---|---|---|---|
| C-7971 | Me | $CH_2$ | H | c-Pr | $CH_2OC(=O)(t-Bu)$ | Me | Me | O |
| C-7972 | H | CH(Me) | H | c-Pr | $CH_2OC(=O)(t-Bu)$ | Me | Me | O |
| C-7973 | H | $CH_2CH_2$ | Me | c-Pr | $CH_2OC(=O)(t-Bu)$ | Me | Me | O |
| C-7974 | Me | $CH_2CH_2$ | H | c-Pr | $CH_2OC(=O)(t-Bu)$ | Me | Me | O |
| C-7975 | H | single bond | Me | c-Pr | $CH_2OC(=O)OEt$ | Cl | Me | O |
| C-7976 | Me | single bond | H | c-Pr | $CH_2OC(=O)OEt$ | Cl | Me | O |
| C-7977 | Me(R) | single bond | H | c-Pr | $CH_2OC(=O)OEt$ | Cl | Me | O |
| C-7978 | Me(S) | single bond | H | c-Pr | $CH_2OC(=O)OEt$ | Cl | Me | O |
| C-7979 | H | $CH_2$ | Me | c-Pr | $CH_2OC(=O)OEt$ | Cl | Me | O |
| C-7980 | Me | $CH_2$ | H | c-Pr | $CH_2OC(=O)OEt$ | Cl | Me | O |
| C-7981 | H | CH(Me) | H | c-Pr | $CH_2OC(=O)OEt$ | Cl | Me | O |
| C-7982 | H | $CH_2CH_2$ | Me | c-Pr | $CH_2OC(=O)OEt$ | Cl | Me | O |

TABLE 409-continued

| Compound Number | Y | W | Z | $R^1$ | $R^2$ | $R^3$ | $R^{10}$ | A |
|---|---|---|---|---|---|---|---|---|
| C-7983 | Me | $CH_2CH_2$ | H | c-Pr | $CH_2OC(=O)OEt$ | Cl | Me | O |
| C-7984 | H | single bond | Me | c-Pr | $CH_2OC(=O)OEt$ | Me | Me | O |
| C-7985 | Me | single bond | H | c-Pr | $CH_2OC(=O)OEt$ | Me | Me | O |
| C-7986 | Me(R) | single bond | H | c-Pr | $CH_2OC(=O)OEt$ | Me | Me | O |
| C-7987 | Me(S) | single bond | H | c-Pr | $CH_2OC(=O)OEt$ | Me | Me | O |
| C-7988 | H | $CH_2$ | Me | c-Pr | $CH_2OC(=O)OEt$ | Me | Me | O |
| C-7989 | Me | $CH_2$ | H | c-Pr | $CH_2OC(=O)OEt$ | Me | Me | O |
| C-7990 | H | CH(Me) | H | c-Pr | $CH_2OC(=O)OEt$ | Me | Me | O |
| C-7991 | H | $CH_2CH_2$ | Me | c-Pr | $CH_2OC(=O)OEt$ | Me | Me | O |
| C-7992 | Me | $CH_2CH_2$ | H | c-Pr | $CH_2OC(=O)OEt$ | Me | Me | O |
| C-7993 | H | single bond | Me | c-Pr | $CH_2OC(=O)O(i-Pr)$ | Cl | Me | O |
| C-7994 | Me | single bond | H | c-Pr | $CH_2OC(=O)O(i-Pr)$ | Cl | Me | O |
| C-7995 | Me(R) | single bond | H | c-Pr | $CH_2OC(=O)O(i-Pr)$ | Cl | Me | O |
| C-7996 | Me(S) | single bond | H | c-Pr | $CH_2OC(=O)O(i-Pr)$ | Cl | Me | O |
| C-7997 | H | $CH_2$ | Me | c-Pr | $CH_2OC(=O)O(i-Pr)$ | Cl | Me | O |
| C-7998 | Me | $CH_2$ | H | c-Pr | $CH_2OC(=O)O(i-Pr)$ | Cl | Me | O |
| C-7999 | H | CH(Me) | H | c-Pr | $CH_2OC(=O)O(i-Pr)$ | Cl | Me | O |
| C-8000 | H | $CH_2CH_2$ | Me | c-Pr | $CH_2OC(=O)O(i-Pr)$ | Cl | Me | O |
| C-8001 | Me | $CH_2CH_2$ | H | c-Pr | $CH_2OC(=O)O(i-Pr)$ | Cl | Me | O |
| C-8002 | H | single bond | Me | c-Pr | $CH_2OC(=O)O(i-Pr)$ | Me | Me | O |
| C-8003 | Me | single bond | H | c-Pr | $CH_2OC(=O)O(i-Pr)$ | Me | Me | O |
| C-8004 | Me(R) | single bond | H | c-Pr | $CH_2OC(=O)O(i-Pr)$ | Me | Me | O |
| C-8005 | Me(S) | single bond | H | c-Pr | $CH_2OC(=O)O(i-Pr)$ | Me | Me | O |
| C-8006 | H | $CH_2$ | Me | c-Pr | $CH_2OC(=O)O(i-Pr)$ | Me | Me | O |
| C-8007 | Me | $CH_2$ | H | c-Pr | $CH_2OC(=O)O(i-Pr)$ | Me | Me | O |
| C-8008 | H | CH(Me) | H | c-Pr | $CH_2OC(=O)O(i-Pr)$ | Me | Me | O |
| C-8009 | H | $CH_2CH_2$ | Me | c-Pr | $CH_2OC(=O)O(i-Pr)$ | Me | Me | O |
| C-8010 | Me | $CH_2CH_2$ | H | c-Pr | $CH_2OC(=O)O(i-Pr)$ | Me | Me | O |
| C-8011 | H | single bond | Me | c-Pr | $CH_2N(Me)C(=O)OMe$ | Cl | Me | O |
| C-8012 | Me | single bond | H | c-Pr | $CH_2N(Me)C(=O)OMe$ | Cl | Me | O |
| C-8013 | Me(R) | single bond | H | c-Pr | $CH_2N(Me)C(=O)OMe$ | Cl | Me | O |
| C-8014 | Me(S) | single bond | H | c-Pr | $CH_2N(Me)C(=O)OMe$ | Cl | Me | O |

TABLE 410

| Compound Number | Y | W | Z | $R^1$ | $R^2$ | $R^3$ | $R^{10}$ | A |
|---|---|---|---|---|---|---|---|---|
| C-8015 | H | $CH_2$ | Me | c-Pr | $CH_2N(Me)C(=O)OMe$ | Cl | Me | O |
| C-8016 | Me | $CH_2$ | H | c-Pr | $CH_2N(Me)C(=O)OMe$ | Cl | Me | O |
| C-8017 | H | CH(Me) | H | c-Pr | $CH_2N(Me)C(=O)OMe$ | Cl | Me | O |
| C-8018 | H | $CH_2CH_2$ | Me | c-Pr | $CH_2N(Me)C(=O)OMe$ | Cl | Me | O |
| C-8019 | Me | $CH_2CH_2$ | H | c-Pr | $CH_2N(Me)C(=O)OMe$ | Cl | Me | O |
| C-8020 | H | single bond | Me | c-Pr | $CH_2N(Me)C(=O)OMe$ | Me | Me | O |
| C-8021 | Me | single bond | H | c-Pr | $CH_2N(Me)C(=O)OMe$ | Me | Me | O |
| C-8022 | Me(R) | single bond | H | c-Pr | $CH_2N(Me)C(=O)OMe$ | Me | Me | O |
| C-8023 | Me(S) | single bond | H | c-Pr | $CH_2N(Me)C(=O)OMe$ | Me | Me | O |
| C-8024 | H | $CH_2$ | Me | c-Pr | $CH_2N(Me)C(=O)OMe$ | Me | Me | O |
| C-8025 | Me | $CH_2$ | H | c-Pr | $CH_2N(Me)C(=O)OMe$ | Me | Me | O |
| C-8026 | H | CH(Me) | H | c-Pr | $CH_2N(Me)C(=O)OMe$ | Me | Me | O |
| C-8027 | H | $CH_2CH_2$ | Me | c-Pr | $CH_2N(Me)C(=O)OMe$ | Me | Me | O |
| C-8028 | Me | $CH_2CH_2$ | H | c-Pr | $CH_2N(Me)C(=O)OMe$ | Me | Me | O |
| C-8029 | H | single bond | Me | c-Pr | $C(=O)OCH_2CH=CH_2$ | Cl | $CH_2OMe$ | O |
| C-8030 | Me | single bond | H | c-Pr | $C(=O)OCH_2CH=CH_2$ | Cl | $CH_2OMe$ | O |
| C-8031 | Me(R) | single bond | H | c-Pr | $C(=O)OCH_2CH=CH_2$ | Cl | $CH_2OMe$ | O |
| C-8032 | Me(S) | single bond | H | c-Pr | $C(=O)OCH_2CH=CH_2$ | Cl | $CH_2OMe$ | O |
| C-8033 | H | $CH_2$ | Me | c-Pr | $C(=O)OCH_2CH=CH_2$ | Cl | $CH_2OMe$ | O |
| C-8034 | Me | $CH_2$ | H | c-Pr | $C(=O)OCH_2CH=CH_2$ | Cl | $CH_2OMe$ | O |
| C-8035 | H | CH(Me) | H | c-Pr | $C(=O)OCH_2CH=CH_2$ | Cl | $CH_2OMe$ | O |
| C-8036 | H | $CH_2CH_2$ | Me | c-Pr | $C(=O)OCH_2CH=CH_2$ | Cl | $CH_2OMe$ | O |
| C-8037 | Me | $CH_2CH_2$ | H | c-Pr | $C(=O)OCH_2CH=CH_2$ | Cl | $CH_2OMe$ | O |
| C-8038 | H | single bond | Me | c-Pr | $C(=O)OCH_2CH=CH_2$ | Me | $CH_2OMe$ | O |
| C-8039 | Me | single bond | H | c-Pr | $C(=O)OCH_2CH=CH_2$ | Me | $CH_2OMe$ | O |
| C-8040 | Me(R) | single bond | H | c-Pr | $C(=O)OCH_2CH=CH_2$ | Me | $CH_2OMe$ | O |
| C-8041 | Me(S) | single bond | H | c-Pr | $C(=O)OCH_2CH=CH_2$ | Me | $CH_2OMe$ | O |
| C-8042 | H | $CH_2$ | Me | c-Pr | $C(=O)OCH_2CH=CH_2$ | Me | $CH_2OMe$ | O |
| C-8043 | Me | $CH_2$ | H | c-Pr | $C(=O)OCH_2CH=CH_2$ | Me | $CH_2OMe$ | O |
| C-8044 | H | CH(Me) | H | c-Pr | $C(=O)OCH_2CH=CH_2$ | Me | $CH_2OMe$ | O |
| C-8045 | H | $CH_2CH_2$ | Me | c-Pr | $C(=O)OCH_2CH=CH_2$ | Me | $CH_2OMe$ | O |
| C-8046 | Me | $CH_2CH_2$ | H | c-Pr | $C(=O)OCH_2CH=CH_2$ | Me | $CH_2OMe$ | O |
| C-8047 | H | single bond | Me | c-Pr | $C(=O)OCH_2CCl_3$ | Cl | $CH_2OMe$ | O |
| C-8048 | Me | single bond | H | c-Pr | $C(=O)OCH_2CCl_3$ | Cl | $CH_2OMe$ | O |
| C-8049 | Me(R) | single bond | H | c-Pr | $C(=O)OCH_2CCl_3$ | Cl | $CH_2OMe$ | O |

TABLE 410-continued

| Compound Number | Y | W | Z | $R^1$ | $R^2$ | $R^3$ | $R^{10}$ | A |
|---|---|---|---|---|---|---|---|---|
| C-8050 | Me(S) | single bond | H | c-Pr | C(═O)OCH$_2$CCl$_3$ | Cl | CH$_2$OMe | O |
| C-8051 | H | CH$_2$ | Me | c-Pr | C(═O)OCH$_2$CCl$_3$ | Cl | CH$_2$OMe | O |
| C-8052 | Me | CH$_2$ | H | c-Pr | C(═O)OCH$_2$CCl$_3$ | Cl | CH$_2$OMe | O |
| C-8053 | H | CH(Me) | H | c-Pr | C(═O)OCH$_2$CCl$_3$ | Cl | CH$_2$OMe | O |
| C-8054 | H | CH$_2$CH$_2$ | Me | c-Pr | C(═O)OCH$_2$CCl$_3$ | Cl | CH$_2$OMe | O |
| C-8055 | Me | CH$_2$CH$_2$ | H | c-Pr | C(═O)OCH$_2$CCl$_3$ | Cl | CH$_2$OMe | O |
| C-8056 | H | single bond | Me | c-Pr | C(═O)OCH$_2$CCl$_3$ | Me | CH$_2$OMe | O |
| C-8057 | Me | single bond | H | c-Pr | C(═O)OCH$_2$CCl$_3$ | Me | CH$_2$OMe | O |
| C-8058 | Me(R) | single bond | H | c-Pr | C(═O)OCH$_2$CCl$_3$ | Me | CH$_2$OMe | O |

TABLE 411

| Compound Number | Y | W | Z | $R^1$ | $R^2$ | $R^3$ | $R^{10}$ | A |
|---|---|---|---|---|---|---|---|---|
| C-8059 | Me(S) | single bond | H | c-Pr | C(═O)OCH$_2$CCl$_3$ | Me | CH$_2$OMe | O |
| C-8060 | H | CH$_2$ | Me | c-Pr | C(═O)OCH$_2$CCl$_3$ | Me | CH$_2$OMe | O |
| C-8061 | Me | CH$_2$ | H | c-Pr | C(═O)OCH$_2$CCl$_3$ | Me | CH$_2$OMe | O |
| C-8062 | H | CH(Me) | H | c-Pr | C(═O)OCH$_2$CCl$_3$ | Me | CH$_2$OMe | O |
| C-8063 | H | CH$_2$CH$_2$ | Me | c-Pr | C(═O)OCH$_2$CCl$_3$ | Me | CH$_2$OMe | O |
| C-8064 | Me | CH$_2$CH$_2$ | H | c-Pr | C(═O)OCH$_2$CCl$_3$ | Me | CH$_2$OMe | O |
| C-8065 | H | single bond | Me | c-Pr | C(═O)N(Me)$_2$ | Cl | CH$_2$OMe | O |
| C-8066 | Me | single bond | H | c-Pr | C(═O)N(Me)$_2$ | Cl | CH$_2$OMe | O |
| C-8067 | Me(R) | single bond | H | c-Pr | C(═O)N(Me)$_2$ | Cl | CH$_2$OMe | O |
| C-8068 | Me(S) | single bond | H | c-Pr | C(═O)N(Me)$_2$ | Cl | CH$_2$OMe | O |
| C-8069 | H | CH$_2$ | Me | c-Pr | C(═O)N(Me)$_2$ | Cl | CH$_2$OMe | O |
| C-8070 | Me | CH$_2$ | H | c-Pr | C(═O)N(Me)$_2$ | Cl | CH$_2$OMe | O |
| C-8071 | H | CH(Me) | H | c-Pr | C(═O)N(Me)$_2$ | Cl | CH$_2$OMe | O |
| C-8072 | H | CH$_2$CH$_2$ | Me | c-Pr | C(═O)N(Me)$_2$ | Cl | CH$_2$OMe | O |
| C-8073 | Me | CH$_2$CH$_2$ | H | c-Pr | C(═O)N(Me)$_2$ | Cl | CH$_2$OMe | O |
| C-8074 | H | single bond | Me | c-Pr | C(═O)N(Me)$_2$ | Me | CH$_2$OMe | O |
| C-8075 | Me | single bond | H | c-Pr | C(═O)N(Me)$_2$ | Me | CH$_2$OMe | O |
| C-8076 | Me(R) | single bond | H | c-Pr | C(═O)N(Me)$_2$ | Me | CH$_2$OMe | O |
| C-8077 | Me(S) | single bond | H | c-Pr | C(═O)N(Me)$_2$ | Me | CH$_2$OMe | O |
| C-8078 | H | CH$_2$ | Me | c-Pr | C(═O)N(Me)$_2$ | Me | CH$_2$OMe | O |
| C-8079 | Me | CH$_2$ | H | c-Pr | C(═O)N(Me)$_2$ | Me | CH$_2$OMe | O |
| C-8080 | H | CH(Me) | H | c-Pr | C(═O)N(Me)$_2$ | Me | CH$_2$OMe | O |
| C-8081 | H | CH$_2$CH$_2$ | Me | c-Pr | C(═O)N(Me)$_2$ | Me | CH$_2$OMe | O |
| C-8082 | Me | CH$_2$CH$_2$ | H | c-Pr | C(═O)N(Me)$_2$ | Me | CH$_2$OMe | O |
| C-8083 | H | single bond | Me | c-Pr | CH$_2$OC(═O)Me | Cl | CH$_2$OMe | O |
| C-8084 | Me | single bond | H | c-Pr | CH$_2$OC(═O)Me | Cl | CH$_2$OMe | O |
| C-8085 | Me(R) | single bond | H | c-Pr | CH$_2$OC(═O)Me | Cl | CH$_2$OMe | O |
| C-8086 | Me(S) | single bond | H | c-Pr | CH$_2$OC(═O)Me | Cl | CH$_2$OMe | O |
| C-8087 | H | CH$_2$ | Me | c-Pr | CH$_2$OC(═O)Me | Cl | CH$_2$OMe | O |
| C-8088 | Me | CH$_2$ | H | c-Pr | CH$_2$OC(═O)Me | Cl | CH$_2$OMe | O |
| C-8089 | H | CH(Me) | H | c-Pr | CH$_2$OC(═O)Me | Cl | CH$_2$OMe | O |
| C-8090 | H | CH$_2$CH$_2$ | Me | c-Pr | CH$_2$OC(═O)Me | Cl | CH$_2$OMe | O |
| C-8091 | Me | CH$_2$CH$_2$ | H | c-Pr | CH$_2$OC(═O)Me | Cl | CH$_2$OMe | O |
| C-8092 | H | single bond | Me | c-Pr | CH$_2$OC(═O)Me | Me | CH$_2$OMe | O |
| C-8093 | Me | single bond | H | c-Pr | CH$_2$OC(═O)Me | Me | CH$_2$OMe | O |
| C-8094 | Me(R) | single bond | H | c-Pr | CH$_2$OC(═O)Me | Me | CH$_2$OMe | O |
| C-8095 | Me(S) | single bond | H | c-Pr | CH$_2$OC(═O)Me | Me | CH$_2$OMe | O |
| C-8096 | H | CH2 | Me | c-Pr | CH$_2$OC(═O)Me | Me | CH$_2$OMe | O |
| C-8097 | Me | CH2 | H | c-Pr | CH$_2$OC(═O)Me | Me | CH$_2$OMe | O |
| C-8098 | H | CH(Me) | H | c-Pr | CH$_2$OC(═O)Me | Me | CH$_2$OMe | O |
| C-8099 | H | CH$_2$CH$_2$ | Me | c-Pr | CH$_2$OC(═O)Me | Me | CH$_2$OMe | O |
| C-8100 | Me | CH$_2$CH$_2$ | H | c-Pr | CH$_2$OC(═O)Me | Me | CH$_2$OMe | O |
| C-8101 | H | single bond | Me | c-Pr | CH$_2$OC(═O)(i-Pr) | Cl | CH$_2$OMe | O |
| C-8102 | Me | single bond | H | c-Pr | CH$_2$OC(═O)(i-Pr) | Cl | CH$_2$OMe | O |

TABLE 412

| Compound Number | Y | W | Z | $R^1$ | $R^2$ | $R^3$ | $R^{10}$ | A |
|---|---|---|---|---|---|---|---|---|
| C-8103 | Me(R) | single bond | H | c-Pr | CH$_2$OC(═O)(i-Pr) | Cl | CH$_2$OMe | O |
| C-8104 | Me(S) | single bond | H | c-Pr | CH$_2$OC(═O)(i-Pr) | Cl | CH$_2$OMe | O |
| C-8105 | H | CH$_2$ | Me | c-Pr | CH$_2$OC(═O)(i-Pr) | Cl | CH$_2$OMe | O |

TABLE 412-continued

| Compound Number | Y | W | Z | $R^1$ | $R^2$ | $R^3$ | $R^{10}$ | A |
|---|---|---|---|---|---|---|---|---|
| C-8106 | Me | $CH_2$ | H | c-Pr | $CH_2OC(=O)(i-Pr)$ | Cl | $CH_2OMe$ | O |
| C-8107 | H | CH(Me) | H | c-Pr | $CH_2OC(=O)(i-Pr)$ | Cl | $CH_2OMe$ | O |
| C-8108 | H | $CH_2CH_2$ | Me | c-Pr | $CH_2OC(=O)(i-Pr)$ | Cl | $CH_2OMe$ | O |
| C-8109 | Me | $CH_2CH_2$ | H | c-Pr | $CH_2OC(=O)(i-Pr)$ | Cl | $CH_2OMe$ | O |
| C-8110 | H | single bond | Me | c-Pr | $CH_2OC(=O)(i-Pr)$ | Me | $CH_2OMe$ | O |
| C-8111 | Me | single bond | H | c-Pr | $CH_2OC(=O)(i-Pr)$ | Me | $CH_2OMe$ | O |
| C-8112 | Me(R) | single bond | H | c-Pr | $CH_2OC(=O)(i-Pr)$ | Me | $CH_2OMe$ | O |
| C-8113 | Me(S) | single bond | H | c-Pr | $CH_2OC(=O)(i-Pr)$ | Me | $CH_2OMe$ | O |
| C-8114 | H | $CH_2$ | Me | c-Pr | $CH_2OC(=O)(i-Pr)$ | Me | $CH_2OMe$ | O |
| C-8115 | Me | $CH_2$ | H | c-Pr | $CH_2OC(=O)(i-Pr)$ | Me | $CH_2OMe$ | O |
| C-8116 | H | CH(Me) | H | c-Pr | $CH_2OC(=O)(i-Pr)$ | Me | $CH_2OMe$ | O |
| C-8117 | H | $CH_2CH_2$ | Me | c-Pr | $CH_2OC(=O)(i-Pr)$ | Me | $CH_2OMe$ | O |
| C-8118 | Me | $CH_2CH_2$ | H | c-Pr | $CH_2OC(=O)(i-Pr)$ | Me | $CH_2OMe$ | O |
| C-8119 | H | single bond | Me | c-Pr | $CH_2OC(=O)(t-Bu)$ | Cl | $CH_2OMe$ | O |
| C-8120 | Me | single bond | H | c-Pr | $CH_2OC(=O)(t-Bu)$ | Cl | $CH_2OMe$ | O |
| C-8121 | Me(R) | single bond | H | c-Pr | $CH_2OC(=O)(t-Bu)$ | Cl | $CH_2OMe$ | O |
| C-8122 | Me(S) | single bond | H | c-Pr | $CH_2OC(=O)(t-Bu)$ | Cl | $CH_2OMe$ | O |
| C-8123 | H | $CH_2$ | Me | c-Pr | $CH_2OC(=O)(t-Bu)$ | Cl | $CH_2OMe$ | O |
| C-8124 | Me | $CH_2$ | H | c-Pr | $CH_2OC(=O)(t-Bu)$ | Cl | $CH_2OMe$ | O |
| C-8125 | H | CH(Me) | H | c-Pr | $CH_2OC(=O)(t-Bu)$ | Cl | $CH_2OMe$ | O |
| C-8126 | H | $CH_2CH_2$ | Me | c-Pr | $CH_2OC(=O)(t-Bu)$ | Cl | $CH_2OMe$ | O |
| C-8127 | Me | $CH_2CH_2$ | H | c-Pr | $CH_2OC(=O)(t-Bu)$ | Cl | $CH_2OMe$ | O |
| C-8128 | H | single bond | Me | c-Pr | $CH_2OC(=O)(t-Bu)$ | Me | $CH_2OMe$ | O |
| C-8129 | Me | single bond | H | c-Pr | $CH_2OC(=O)(t-Bu)$ | Me | $CH_2OMe$ | O |
| C-8130 | Me(R) | single bond | H | c-Pr | $CH_2OC(=O)(t-Bu)$ | Me | $CH_2OMe$ | O |
| C-8131 | Me(S) | single bond | H | c-Pr | $CH_2OC(=O)(t-Bu)$ | Me | $CH_2OMe$ | O |
| C-8132 | H | $CH_2$ | Me | c-Pr | $CH_2OC(=O)(t-Bu)$ | Me | $CH_2OMe$ | O |
| C-8133 | Me | $CH_2$ | H | c-Pr | $CH_2OC(=O)(t-Bu)$ | Me | $CH_2OMe$ | O |
| C-8134 | H | CH(Me) | H | c-Pr | $CH_2OC(=O)(t-Bu)$ | Me | $CH_2OMe$ | O |
| C-8135 | H | $CH_2CH_2$ | Me | c-Pr | $CH_2OC(=O)(t-Bu)$ | Me | $CH_2OMe$ | O |
| C-8136 | Me | $CH_2CH_2$ | H | c-Pr | $CH_2OC(=O)(t-Bu)$ | Me | $CH_2OMe$ | O |
| C-8137 | H | single bond | Me | c-Pr | $CH_2OC(=O)OEt$ | Cl | $CH_2OMe$ | O |
| C-8138 | Me | single bond | H | c-Pr | $CH_2OC(=O)OEt$ | Cl | $CH_2OMe$ | O |
| C-8139 | Me(R) | single bond | H | c-Pr | $CH_2OC(=O)OEt$ | Cl | $CH_2OMe$ | O |
| C-8140 | Me(S) | single bond | H | c-Pr | $CH_2OC(=O)OEt$ | Cl | $CH_2OMe$ | O |
| C-8141 | H | $CH_2$ | Me | c-Pr | $CH_2OC(=O)OEt$ | Cl | $CH_2OMe$ | O |
| C-8142 | Me | $CH_2$ | H | c-Pr | $CH_2OC(=O)OEt$ | Cl | $CH_2OMe$ | O |
| C-8143 | H | CH(Me) | H | c-Pr | $CH_2OC(=O)OEt$ | Cl | $CH_2OMe$ | O |
| C-8144 | H | $CH_2CH_2$ | Me | c-Pr | $CH_2OC(=O)OEt$ | Cl | $CH_2OMe$ | O |
| C-8145 | Me | $CH_2CH_2$ | H | c-Pr | $CH_2OC(=O)OEt$ | Cl | $CH_2OMe$ | O |
| C-8146 | H | single bond | Me | c-Pr | $CH_2OC(=O)OEt$ | Me | $CH_2OMe$ | O |

TABLE 413

| Compound Number | Y | W | Z | $R^1$ | $R^2$ | $R^3$ | $R^{10}$ | A |
|---|---|---|---|---|---|---|---|---|
| C-8147 | Me | single bond | H | c-Pr | $CH_2OC(=O)OEt$ | Me | $CH_2OMe$ | O |
| C-8148 | Me(R) | single bond | H | c-Pr | $CH_2OC(=O)OEt$ | Me | $CH_2OMe$ | O |
| C-8149 | Me(S) | single bond | H | c-Pr | $CH_2OC(=O)OEt$ | Me | $CH_2OMe$ | O |
| C-8150 | H | $CH_2$ | Me | c-Pr | $CH_2OC(=O)OEt$ | Me | $CH_2OMe$ | O |
| C-8151 | Me | $CH_2$ | H | c-Pr | $CH_2OC(=O)OEt$ | Me | $CH_2OMe$ | O |
| C-8152 | H | CH(Me) | H | c-Pr | $CH_2OC(=O)OEt$ | Me | $CH_2OMe$ | O |
| C-8153 | H | $CH_2CH_2$ | Me | c-Pr | $CH_2OC(=O)OEt$ | Me | $CH_2OMe$ | O |
| C-8154 | Me | $CH_2CH_2$ | H | c-Pr | $CH_2OC(=O)OEt$ | Me | $CH_2OMe$ | O |
| C-8155 | H | single bond | Me | c-Pr | $CH_2OC(=O)O(i-Pr)$ | Cl | $CH_2OMe$ | O |
| C-8156 | Me | single bond | H | c-Pr | $CH_2OC(=O)O(i-Pr)$ | Cl | $CH_2OMe$ | O |
| C-8157 | Me(R) | single bond | H | c-Pr | $CH_2OC(=O)O(i-Pr)$ | Cl | $CH_2OMe$ | O |
| C-8158 | Me(S) | single bond | H | c-Pr | $CH_2OC(=O)O(i-Pr)$ | Cl | $CH_2OMe$ | O |
| C-8159 | H | $CH_2$ | Me | c-Pr | $CH_2OC(=O)O(i-Pr)$ | Cl | $CH_2OMe$ | O |
| C-8160 | Me | $CH_2$ | H | c-Pr | $CH_2OC(=O)O(i-Pr)$ | Cl | $CH_2OMe$ | O |
| C-8161 | H | CH(Me) | H | c-Pr | $CH_2OC(=O)O(i-Pr)$ | Cl | $CH_2OMe$ | O |
| C-8162 | H | $CH_2CH_2$ | Me | c-Pr | $CH_2OC(=O)O(i-Pr)$ | Cl | $CH_2OMe$ | O |
| C-8163 | Me | $CH_2CH_2$ | H | c-Pr | $CH_2OC(=O)O(i-Pr)$ | Cl | $CH_2OMe$ | O |
| C-8164 | H | single bond | Me | c-Pr | $CH_2OC(=O)O(i-Pr)$ | Me | $CH_2OMe$ | O |
| C-8165 | Me | single bond | H | c-Pr | $CH_2OC(=O)O(i-Pr)$ | Me | $CH_2OMe$ | O |
| C-8166 | Me(R) | single bond | H | c-Pr | $CH_2OC(=O)O(i-Pr)$ | Me | $CH_2OMe$ | O |
| C-8167 | Me(S) | single bond | H | c-Pr | $CH_2OC(=O)O(i-Pr)$ | Me | $CH_2OMe$ | O |
| C-8168 | H | $CH_2$ | Me | c-Pr | $CH_2OC(=O)O(i-Pr)$ | Me | $CH_2OMe$ | O |
| C-8169 | Me | $CH_2$ | H | c-Pr | $CH_2OC(=O)O(i-Pr)$ | Me | $CH_2OMe$ | O |
| C-8170 | H | CH(Me) | H | c-Pr | $CH_2OC(=O)O(i-Pr)$ | Me | $CH_2OMe$ | O |
| C-8171 | H | $CH_2CH_2$ | Me | c-Pr | $CH_2OC(=O)O(i-Pr)$ | Me | $CH_2OMe$ | O |
| C-8172 | Me | $CH_2CH_2$ | H | c-Pr | $CH_2OC(=O)O(i-Pr)$ | Me | $CH_2OMe$ | O |

TABLE 413-continued

| Compound Number | Y | W | Z | $R^1$ | $R^2$ | $R^3$ | $R^{10}$ | A |
|---|---|---|---|---|---|---|---|---|
| C-8173 | H | single bond | Me | c-Pr | $CH_2N(Me)C(=O)OMe$ | Cl | $CH_2OMe$ | O |
| C-8174 | Me | single bond | H | c-Pr | $CH_2N(Me)C(=O)OMe$ | Cl | $CH_2OMe$ | O |
| C-8175 | Me(R) | single bond | H | c-Pr | $CH_2N(Me)C(=O)OMe$ | Cl | $CH_2OMe$ | O |
| C-8176 | Me(S) | single bond | H | c-Pr | $CH_2N(Me)C(=O)OMe$ | Cl | $CH_2OMe$ | O |
| C-8177 | H | $CH_2$ | Me | c-Pr | $CH_2N(Me)C(=O)OMe$ | Cl | $CH_2OMe$ | O |
| C-8178 | Me | $CH_2$ | H | c-Pr | $CH_2N(Me)C(=O)OMe$ | Cl | $CH_2OMe$ | O |
| C-8179 | H | CH(Me) | H | c-Pr | $CH_2N(Me)C(=O)OMe$ | Cl | $CH_2OMe$ | O |
| C-8180 | H | $CH_2CH_2$ | Me | c-Pr | $CH_2N(Me)C(=O)OMe$ | Cl | $CH_2OMe$ | O |
| C-8181 | Me | $CH_2CH_2$ | H | c-Pr | $CH_2N(Me)C(=O)OMe$ | Cl | $CH_2OMe$ | O |
| C-8182 | H | single bond | Me | c-Pr | $CH_2N(Me)C(=O)OMe$ | Me | $CH_2OMe$ | O |
| C-8183 | Me | single bond | H | c-Pr | $CH_2N(Me)C(=O)OMe$ | Me | $CH_2OMe$ | O |
| C-8184 | Me(R) | single bond | H | c-Pr | $CH_2N(Me)C(=O)OMe$ | Me | $CH_2OMe$ | O |
| C-8185 | Me(S) | single bond | H | c-Pr | $CH_2N(Me)C(=O)OMe$ | Me | $CH_2OMe$ | O |
| C-8186 | H | $CH_2$ | Me | c-Pr | $CH_2N(Me)C(=O)OMe$ | Me | $CH_2OMe$ | O |
| C-8187 | Me | $CH_2$ | H | c-Pr | $CH_2N(Me)C(=O)OMe$ | Me | $CH_2OMe$ | O |
| C-8188 | H | CH(Me) | H | c-Pr | $CH_2N(Me)C(=O)OMe$ | Me | $CH_2OMe$ | O |
| C-8189 | H | $CH_2CH_2$ | Me | c-Pr | $CH_2N(Me)C(=O)OMe$ | Me | $CH_2OMe$ | O |
| C-8190 | Me | $CH_2CH_2$ | H | c-Pr | $CH_2N(Me)C(=O)OMe$ | Me | $CH_2OMe$ | O |

TABLE 414

| Compound Number | Y | W | Z | $R^1$ | $R^2$ | $R^3$ | $R^{10}$ | A |
|---|---|---|---|---|---|---|---|---|
| C-8191 | H | single bond | Me | c-Pr | $C(=O)OCH_2CH=CH_2$ | Cl | $CH_2CN$ | O |
| C-8192 | Me | single bond | H | c-Pr | $C(=O)OCH_2CH=CH_2$ | Cl | $CH_2CN$ | O |
| C-8193 | Me(R) | single bond | H | c-Pr | $C(=O)OCH_2CH=CH_2$ | Cl | $CH_2CN$ | O |
| C-8194 | Me(S) | single bond | H | c-Pr | $C(=O)OCH_2CH=CH_2$ | Cl | $CH_2CN$ | O |
| C-8195 | H | $CH_2$ | Me | c-Pr | $C(=O)OCH_2CH=CH_2$ | Cl | $CH_2CN$ | O |
| C-8196 | Me | $CH_2$ | H | c-Pr | $C(=O)OCH_2CH=CH_2$ | Cl | $CH_2CN$ | O |
| C-8197 | H | CH(Me) | H | c-Pr | $C(=O)OCH_2CH=CH_2$ | Cl | $CH_2CN$ | O |
| C-8198 | H | $CH_2CH_2$ | Me | c-Pr | $C(=O)OCH_2CH=CH_2$ | Cl | $CH_2CN$ | O |
| C-8199 | Me | $CH_2CH_2$ | H | c-Pr | $C(=O)OCH_2CH=CH_2$ | Cl | $CH_2CN$ | O |
| C-8200 | H | single bond | Me | c-Pr | $C(=O)OCH_2CH=CH_2$ | Me | $CH_2CN$ | O |
| C-8201 | Me | single bond | H | c-Pr | $C(=O)OCH_2CH=CH_2$ | Me | $CH_2CN$ | O |
| C-8202 | Me(R) | single bond | H | c-Pr | $C(=O)OCH_2CH=CH_2$ | Me | $CH_2CN$ | O |
| C-8203 | Me(S) | single bond | H | c-Pr | $C(=O)OCH_2CH=CH_2$ | Me | $CH_2CN$ | O |
| C-8204 | H | $CH_2$ | Me | c-Pr | $C(=O)OCH_2CH=CH_2$ | Me | $CH_2CN$ | O |
| C-8205 | Me | $CH_2$ | H | c-Pr | $C(=O)OCH_2CH=CH_2$ | Me | $CH_2CN$ | O |
| C-8206 | H | CH(Me) | H | c-Pr | $C(=O)OCH_2CH=CH_2$ | Me | $CH_2CN$ | O |
| C-8207 | H | $CH_2CH_2$ | Me | c-Pr | $C(=O)OCH_2CH=CH_2$ | Me | $CH_2CN$ | O |
| C-8208 | Me | $CH_2CH_2$ | H | c-Pr | $C(=O)OCH_2CH=CH_2$ | Me | $CH_2CN$ | O |
| C-8209 | H | single bond | Me | c-Pr | $C(=O)OCH_2CCl_3$ | Cl | $CH_2CN$ | O |
| C-8210 | Me | single bond | H | c-Pr | $C(=O)OCH_2CCl_3$ | Cl | $CH_2CN$ | O |
| C-8211 | Me(R) | single bond | H | c-Pr | $C(=O)OCH_2CCl_3$ | Cl | $CH_2CN$ | O |
| C-8212 | Me(S) | single bond | H | c-Pr | $C(=O)OCH_2CCl_3$ | Cl | $CH_2CN$ | O |
| C-8213 | H | $CH_2$ | Me | c-Pr | $C(=O)OCH_2CCl_3$ | Cl | $CH_2CN$ | O |
| C-8214 | Me | $CH_2$ | H | c-Pr | $C(=O)OCH_2CCl_3$ | Cl | $CH_2CN$ | O |
| C-8215 | H | CH(Me) | H | c-Pr | $C(=O)OCH_2CCl_3$ | Cl | $CH_2CN$ | O |
| C-8216 | H | $CH_2CH_2$ | Me | c-Pr | $C(=O)OCH_2CCl_3$ | Cl | $CH_2CN$ | O |
| C-8217 | Me | $CH_2CH_2$ | H | c-Pr | $C(=O)OCH_2CCl_3$ | Cl | $CH_2CN$ | O |
| C-8218 | H | single bond | Me | c-Pr | $C(=O)OCH_2CCl_3$ | Me | $CH_2CN$ | O |
| C-8219 | Me | single bond | H | c-Pr | $C(=O)OCH_2CCl_3$ | Me | $CH_2CN$ | O |
| C-8220 | Me(R) | single bond | H | c-Pr | $C(=O)OCH_2CCl_3$ | Me | $CH_2CN$ | O |
| C-8221 | Me(S) | single bond | H | c-Pr | $C(=O)OCH_2CCl_3$ | Me | $CH_2CN$ | O |
| C-8222 | H | $CH_2$ | Me | c-Pr | $C(=O)OCH_2CCl_3$ | Me | $CH_2CN$ | O |
| C-8223 | Me | $CH_2$ | H | c-Pr | $C(=O)OCH_2CCl_3$ | Me | $CH_2CN$ | O |
| C-8224 | H | CH(Me) | H | c-Pr | $C(=O)OCH_2CCl_3$ | Me | $CH_2CN$ | O |
| C-8225 | H | $CH_2CH_2$ | Me | c-Pr | $C(=O)OCH_2CCl_3$ | Me | $CH_2CN$ | O |
| C-8226 | Me | $CH_2CH_2$ | H | c-Pr | $C(=O)OCH_2CCl_3$ | Me | $CH_2CN$ | O |
| C-8227 | H | single bond | Me | c-Pr | $C(=O)N(Me)_2$ | Cl | $CH_2CN$ | O |
| C-8228 | Me | single bond | H | c-Pr | $C(=O)N(Me)_2$ | Cl | $CH_2CN$ | O |
| C-8229 | Me(R) | single bond | H | c-Pr | $C(=O)N(Me)_2$ | Cl | $CH_2CN$ | O |
| C-8230 | Me(S) | single bond | H | c-Pr | $C(=O)N(Me)_2$ | Cl | $CH_2CN$ | O |
| C-8231 | H | $CH_2$ | Me | c-Pr | $C(=O)N(Me)_2$ | Cl | $CH_2CN$ | O |
| C-8232 | Me | $CH_2$ | H | c-Pr | $C(=O)N(Me)_2$ | Cl | $CH_2CN$ | O |
| C-8233 | H | CH(Me) | H | c-Pr | $C(=O)N(Me)_2$ | Cl | $CH_2CN$ | O |
| C-8234 | H | $CH_2CH_2$ | Me | c-Pr | $C(=O)N(Me)_2$ | Cl | $CH_2CN$ | O |

TABLE 415

| Compound Number | Y | W | Z | $R^1$ | $R^2$ | $R^3$ | $R^{10}$ | A |
|---|---|---|---|---|---|---|---|---|
| C-8235 | Me | $CH_2CH_2$ | H | c-Pr | C(=O)N(Me)$_2$ | Cl | $CH_2CN$ | O |
| C-8236 | H | single bond | Me | c-Pr | C(=O)N(Me)$_2$ | Me | $CH_2CN$ | O |
| C-8237 | Me | single bond | H | c-Pr | C(=O)N(Me)$_2$ | Me | $CH_2CN$ | O |
| C-8238 | Me(R) | single bond | H | c-Pr | C(=O)N(Me)$_2$ | Me | $CH_2CN$ | O |
| C-8239 | Me(S) | single bond | H | c-Pr | C(=O)N(Me)$_2$ | Me | $CH_2CN$ | O |
| C-8240 | H | $CH_2$ | Me | c-Pr | C(=O)N(Me)$_2$ | Me | $CH_2CN$ | O |
| C-8241 | Me | $CH_2$ | H | c-Pr | C(=O)N(Me)$_2$ | Me | $CH_2CN$ | O |
| C-8242 | H | CH(Me) | H | c-Pr | C(=O)N(Me)$_2$ | Me | $CH_2CN$ | O |
| C-8243 | H | $CH_2CH_2$ | Me | c-Pr | C(=O)N(Me)$_2$ | Me | $CH_2CN$ | O |
| C-8244 | Me | $CH_2CH_2$ | H | c-Pr | C(=O)N(Me)$_2$ | Me | $CH_2CN$ | O |
| C-8245 | H | single bond | Me | c-Pr | $CH_2$OC(=O)Me | Cl | $CH_2CN$ | O |
| C-8246 | Me | single bond | H | c-Pr | $CH_2$OC(=O)Me | Cl | $CH_2CN$ | O |
| C-8247 | Me(R) | single bond | H | c-Pr | $CH_2$OC(=O)Me | Cl | $CH_2CN$ | O |
| C-8248 | Me(S) | single bond | H | c-Pr | $CH_2$OC(=O)Me | Cl | $CH_2CN$ | O |
| C-8249 | H | $CH_2$ | Me | c-Pr | $CH_2$OC(=O)Me | Cl | $CH_2CN$ | O |
| C-8250 | Me | $CH_2$ | H | c-Pr | $CH_2$OC(=O)Me | Cl | $CH_2CN$ | O |
| C-8251 | H | CH(Me) | H | c-Pr | $CH_2$OC(=O)Me | Cl | $CH_2CN$ | O |
| C-8252 | H | $CH_2CH_2$ | Me | c-Pr | $CH_2$OC(=O)Me | Cl | $CH_2CN$ | O |
| C-8253 | Me | $CH_2CH_2$ | H | c-Pr | $CH_2$OC(=O)Me | Cl | $CH_2CN$ | O |
| C-8254 | H | single bond | Me | c-Pr | $CH_2$OC(=O)Me | Me | $CH_2CN$ | O |
| C-8255 | Me | single bond | H | c-Pr | $CH_2$OC(=O)Me | Me | $CH_2CN$ | O |
| C-8256 | Me(R) | single bond | H | c-Pr | $CH_2$OC(=O)Me | Me | $CH_2CN$ | O |
| C-8257 | Me(S) | single bond | H | c-Pr | $CH_2$OC(=O)Me | Me | $CH_2CN$ | O |
| C-8258 | H | $CH_2$ | Me | c-Pr | $CH_2$OC(=O)Me | Me | $CH_2CN$ | O |
| C-8259 | Me | $CH_2$ | H | c-Pr | $CH_2$OC(=O)Me | Me | $CH_2CN$ | O |
| C-8260 | H | CH(Me) | H | c-Pr | $CH_2$OC(=O)Me | Me | $CH_2CN$ | O |
| C-8261 | H | $CH_2CH_2$ | Me | c-Pr | $CH_2$OC(=O)Me | Me | $CH_2CN$ | O |
| C-8262 | Me | $CH_2CH_2$ | H | c-Pr | $CH_2$OC(=O)Me | Me | $CH_2CN$ | O |
| C-8263 | H | single bond | Me | c-Pr | $CH_2$OC(=O)(i-Pr) | Cl | $CH_2CN$ | O |
| C-8264 | Me | single bond | H | c-Pr | $CH_2$OC(=O)(i-Pr) | Cl | $CH_2CN$ | O |
| C-8265 | Me(R) | single bond | H | c-Pr | $CH_2$OC(=O)(i-Pr) | Cl | $CH_2CN$ | O |
| C-8266 | Me(S) | single bond | H | c-Pr | $CH_2$OC(=O)(i-Pr) | Cl | $CH_2CN$ | O |
| C-8267 | H | $CH_2$ | Me | c-Pr | $CH_2$OC(=O)(i-Pr) | Cl | $CH_2CN$ | O |
| C-8268 | Me | $CH_2$ | H | c-Pr | $CH_2$OC(=O)(i-Pr) | Cl | $CH_2CN$ | O |
| C-8269 | H | CH(Me) | H | c-Pr | $CH_2$OC(=O)(i-Pr) | Cl | $CH_2CN$ | O |
| C-8270 | H | $CH_2CH_2$ | Me | c-Pr | $CH_2$OC(=O)(i-Pr) | Cl | $CH_2CN$ | O |
| C-8271 | Me | $CH_2CH_2$ | H | c-Pr | $CH_2$OC(=O)(i-Pr) | Cl | $CH_2CN$ | O |
| C-8272 | H | single bond | Me | c-Pr | $CH_2$OC(=O)(i-Pr) | Me | $CH_2CN$ | O |
| C-8273 | Me | single bond | H | c-Pr | $CH_2$OC(=O)(i-Pr) | Me | $CH_2CN$ | O |
| C-8274 | Me(R) | single bond | H | c-Pr | $CH_2$OC(=O)(i-Pr) | Me | $CH_2CN$ | O |
| C-8275 | Me(S) | single bond | H | c-Pr | $CH_2$OC(=O)(i-Pr) | Me | $CH_2CN$ | O |
| C-8276 | H | $CH_2$ | Me | c-Pr | $CH_2$OC(=O)(i-Pr) | Me | $CH_2CN$ | O |
| C-8277 | Me | $CH_2$ | H | c-Pr | $CH_2$OC(=O)(i-Pr) | Me | $CH_2CN$ | O |
| C-8278 | H | CH(Me) | H | c-Pr | $CH_2$OC(=O)(i-Pr) | Me | $CH_2CN$ | O |

TABLE 416

| Compound Number | Y | W | Z | $R^1$ | $R^2$ | $R^3$ | $R^{10}$ | A |
|---|---|---|---|---|---|---|---|---|
| C-8279 | H | $CH_2CH_2$ | Me | c-Pr | $CH_2$OC(=O)(i-Pr) | Me | $CH_2CN$ | O |
| C-8280 | Me | $CH_2CH_2$ | H | c-Pr | $CH_2$OC(=O)(i-Pr) | Me | $CH_2CN$ | O |
| C-8281 | H | single bond | Me | c-Pr | $CH_2$OC(=O)(t-Bu) | Cl | $CH_2CN$ | O |
| C-8282 | Me | single bond | H | c-Pr | $CH_2$OC(=O)(t-Bu) | Cl | $CH_2CN$ | O |
| C-8283 | Me(R) | single bond | H | c-Pr | $CH_2$OC(=O)(t-Bu) | Cl | $CH_2CN$ | O |
| C-8284 | Me(S) | single bond | H | c-Pr | $CH_2$OC(=O)(t-Bu) | Cl | $CH_2CN$ | O |
| C-8285 | H | $CH_2$ | Me | c-Pr | $CH_2$OC(=O)(t-Bu) | Cl | $CH_2CN$ | O |
| C-8286 | Me | $CH_2$ | H | c-Pr | $CH_2$OC(=O)(t-Bu) | Cl | $CH_2CN$ | O |
| C-8287 | H | CH(Me) | H | c-Pr | $CH_2$OC(=O)(t-Bu) | Cl | $CH_2CN$ | O |
| C-8288 | H | $CH_2CH_2$ | Me | c-Pr | $CH_2$OC(=O)(t-Bu) | Cl | $CH_2CN$ | O |
| C-8289 | Me | $CH_2CH_2$ | H | c-Pr | $CH_2$OC(=O)(t-Bu) | Cl | $CH_2CN$ | O |
| C-8290 | H | single bond | Me | c-Pr | $CH_2$OC(=O)(t-Bu) | Me | $CH_2CN$ | O |
| C-8291 | Me | single bond | H | c-Pr | $CH_2$OC(=O)(t-Bu) | Me | $CH_2CN$ | O |
| C-8292 | Me(R) | single bond | H | c-Pr | $CH_2$OC(=O)(t-Bu) | Me | $CH_2CN$ | O |
| C-8293 | Me(S) | single bond | H | c-Pr | $CH_2$OC(=O)(t-Bu) | Me | $CH_2CN$ | O |
| C-8294 | H | $CH_2$ | Me | c-Pr | $CH_2$OC(=O)(t-Bu) | Me | $CH_2CN$ | O |
| C-8295 | Me | $CH_2$ | H | c-Pr | $CH_2$OC(=O)(t-Bu) | Me | $CH_2CN$ | O |
| C-8296 | H | CH(Me) | H | c-Pr | $CH_2$OC(=O)(t-Bu) | Me | $CH_2CN$ | O |
| C-8297 | H | $CH_2CH_2$ | Me | c-Pr | $CH_2$OC(=O)(t-Bu) | Me | $CH_2CN$ | O |
| C-8298 | Me | $CH_2CH_2$ | H | c-Pr | $CH_2$OC(=O)(t-Bu) | Me | $CH_2CN$ | O |
| C-8299 | H | single bond | Me | c-Pr | $CH_2$OC(=O)OEt | Cl | $CH_2CN$ | O |
| C-8300 | Me | single bond | H | c-Pr | $CH_2$OC(=O)OEt | Cl | $CH_2CN$ | O |
| C-8301 | Me(R) | single bond | H | c-Pr | $CH_2$OC(=O)OEt | Cl | $CH_2CN$ | O |

TABLE 416-continued

| Compound Number | Y | W | Z | $R^1$ | $R^2$ | $R^3$ | $R^{10}$ | A |
|---|---|---|---|---|---|---|---|---|
| C-8302 | Me(S) | single bond | H | c-Pr | $CH_2OC(=O)OEt$ | Cl | $CH_2CN$ | O |
| C-8303 | H | $CH_2$ | Me | c-Pr | $CH_2OC(=O)OEt$ | Cl | $CH_2CN$ | O |
| C-8304 | Me | $CH_2$ | H | c-Pr | $CH_2OC(=O)OEt$ | Cl | $CH_2CN$ | O |
| C-8305 | H | CH(Me) | H | c-Pr | $CH_2OC(=O)OEt$ | Cl | $CH_2CN$ | O |
| C-8306 | H | $CH_2CH_2$ | Me | c-Pr | $CH_2OC(=O)OEt$ | Cl | $CH_2CN$ | O |
| C-8307 | Me | $CH_2CH_2$ | H | c-Pr | $CH_2OC(=O)OEt$ | Cl | $CH_2CN$ | O |
| C-8308 | H | single bond | Me | c-Pr | $CH_2OC(=O)OEt$ | Me | $CH_2CN$ | O |
| C-8309 | Me | single bond | H | c-Pr | $CH_2OC(=O)OEt$ | Me | $CH_2CN$ | O |
| C-8310 | Me(R) | single bond | H | c-Pr | $CH_2OC(=O)OEt$ | Me | $CH_2CN$ | O |
| C-8311 | Me(S) | single bond | H | c-Pr | $CH_2OC(=O)OEt$ | Me | $CH_2CN$ | O |
| C-8312 | H | $CH_2$ | Me | c-Pr | $CH_2OC(=O)OEt$ | Me | $CH_2CN$ | O |
| C-8313 | Me | $CH_2$ | H | c-Pr | $CH_2OC(=O)OEt$ | Me | $CH_2CN$ | O |
| C-8314 | H | CH(Me) | H | c-Pr | $CH_2OC(=O)OEt$ | Me | $CH_2CN$ | O |
| C-8315 | H | $CH_2CH_2$ | Me | c-Pr | $CH_2OC(=O)OEt$ | Me | $CH_2CN$ | O |
| C-8316 | Me | $CH_2CH_2$ | H | c-Pr | $CH_2OC(=O)OEt$ | Me | $CH_2CN$ | O |
| C-8317 | H | single bond | Me | c-Pr | $CH_2OC(=O)O(i-Pr)$ | Cl | $CH_2CN$ | O |
| C-8318 | Me | single bond | H | c-Pr | $CH_2OC(=O)O(i-Pr)$ | Cl | $CH_2CN$ | O |
| C-8319 | Me(R) | single bond | H | c-Pr | $CH_2OC(=O)O(i-Pr)$ | Cl | $CH_2CN$ | O |
| C-8320 | Me(S) | single bond | H | c-Pr | $CH_2OC(=O)O(i-Pr)$ | Cl | $CH_2CN$ | O |
| C-8321 | H | $CH_2$ | Me | c-Pr | $CH_2OC(=O)O(i-Pr)$ | Cl | $CH_2CN$ | O |
| C-8322 | Me | $CH_2$ | H | c-Pr | $CH_2OC(=O)O(i-Pr)$ | Cl | $CH_2CN$ | O |

TABLE 417

| Compound Number | Y | W | Z | $R^1$ | $R^2$ | $R^3$ | $R^{10}$ | A |
|---|---|---|---|---|---|---|---|---|
| C-8323 | H | CH(Me) | H | c-Pr | $CH_2OC(=O)O(i-Pr)$ | Cl | $CH_2CN$ | O |
| C-8324 | H | $CH_2CH_2$ | Me | c-Pr | $CH_2OC(=O)O(i-Pr)$ | Cl | $CH_2CN$ | O |
| C-8325 | Me | $CH_2CH_2$ | H | c-Pr | $CH_2OC(=O)O(i-Pr)$ | Cl | $CH_2CN$ | O |
| C-8326 | H | single bond | Me | c-Pr | $CH_2OC(=O)O(i-Pr)$ | Me | $CH_2CN$ | O |
| C-8327 | Me | single bond | H | c-Pr | $CH_2OC(=O)O(i-Pr)$ | Me | $CH_2CN$ | O |
| C-8328 | Me(R) | single bond | H | c-Pr | $CH_2OC(=O)O(i-Pr)$ | Me | $CH_2CN$ | O |
| C-8329 | Me(S) | single bond | H | c-Pr | $CH_2OC(=O)O(i-Pr)$ | Me | $CH_2CN$ | O |
| C-8330 | H | $CH_2$ | Me | c-Pr | $CH_2OC(=O)O(i-Pr)$ | Me | $CH_2CN$ | O |
| C-8331 | Me | $CH_2$ | H | c-Pr | $CH_2OC(=O)O(i-Pr)$ | Me | $CH_2CN$ | O |
| C-8332 | H | CH(Me) | H | c-Pr | $CH_2OC(=O)O(i-Pr)$ | Me | $CH_2CN$ | O |
| C-8333 | H | $CH_2CH_2$ | Me | c-Pr | $CH_2OC(=O)O(i-Pr)$ | Me | $CH_2CN$ | O |
| C-8334 | Me | $CH_2CH_2$ | H | c-Pr | $CH_2OC(=O)O(i-Pr)$ | Me | $CH_2CN$ | O |
| C-8335 | H | single bond | Me | c-Pr | $CH_2N(Me)C(=O)OMe$ | Cl | $CH_2CN$ | O |
| C-8336 | Me | single bond | H | c-Pr | $CH_2N(Me)C(=O)OMe$ | Cl | $CH_2CN$ | O |
| C-8337 | Me(R) | single bond | H | c-Pr | $CH_2N(Me)C(=O)OMe$ | Cl | $CH_2CN$ | O |
| C-8338 | Me(S) | single bond | H | c-Pr | $CH_2N(Me)C(=O)OMe$ | Cl | $CH_2CN$ | O |
| C-8339 | H | $CH_2$ | Me | c-Pr | $CH_2N(Me)C(=O)OMe$ | Cl | $CH_2CN$ | O |
| C-8340 | Me | $CH_2$ | H | c-Pr | $CH_2N(Me)C(=O)OMe$ | Cl | $CH_2CN$ | O |
| C-8341 | H | CH(Me) | H | c-Pr | $CH_2N(Me)C(=O)OMe$ | Cl | $CH_2CN$ | O |
| C-8342 | H | $CH_2CH_2$ | Me | c-Pr | $CH_2N(Me)C(=O)OMe$ | Cl | $CH_2CN$ | O |
| C-8343 | Me | $CH_2CH_2$ | H | c-Pr | $CH_2N(Me)C(=O)OMe$ | Cl | $CH_2CN$ | O |
| C-8344 | H | single bond | Me | c-Pr | $CH_2N(Me)C(=O)OMe$ | Me | $CH_2CN$ | O |
| C-8345 | Me | single bond | H | c-Pr | $CH_2N(Me)C(=O)OMe$ | Me | $CH_2CN$ | O |
| C-8346 | Me(R) | single bond | H | c-Pr | $CH_2N(Me)C(=O)OMe$ | Me | $CH_2CN$ | O |
| C-8347 | Me(S) | single bond | H | c-Pr | $CH_2N(Me)C(=O)OMe$ | Me | $CH_2CN$ | O |
| C-8348 | H | $CH_2$ | Me | c-Pr | $CH_2N(Me)C(=O)OMe$ | Me | $CH_2CN$ | O |
| C-8349 | Me | $CH_2$ | H | c-Pr | $CH_2N(Me)C(=O)OMe$ | Me | $CH_2CN$ | O |
| C-8350 | H | CH(Me) | H | c-Pr | $CH_2N(Me)C(=O)OMe$ | Me | $CH_2CN$ | O |
| C-8351 | H | $CH_2CH_2$ | Me | c-Pr | $CH_2N(Me)C(=O)OMe$ | Me | $CH_2CN$ | O |
| C-8352 | Me | $CH_2CH_2$ | H | c-Pr | $CH_2N(Me)C(=O)OMe$ | Me | $CH_2CN$ | O |
| C-8353 | H | single bond | Me | c-Pr | $C(=O)OCH_2CH=CH_2$ | Cl | $C(=O)Me$ | O |
| C-8354 | Me | single bond | H | c-Pr | $C(=O)OCH_2CH=CH_2$ | Cl | $C(=O)Me$ | O |
| C-8355 | Me(R) | single bond | H | c-Pr | $C(=O)OCH_2CH=CH_2$ | Cl | $C(=O)Me$ | O |
| C-8356 | Me(S) | single bond | H | c-Pr | $C(=O)OCH_2CH=CH_2$ | Cl | $C(=O)Me$ | O |
| C-8357 | H | $CH_2$ | Me | c-Pr | $C(=O)OCH_2CH=CH_2$ | Cl | $C(=O)Me$ | O |
| C-8358 | Me | $CH_2$ | H | c-Pr | $C(=O)OCH_2CH=CH_2$ | Cl | $C(=O)Me$ | O |
| C-8359 | H | CH(Me) | H | c-Pr | $C(=O)OCH_2CH=CH_2$ | Cl | $C(=O)Me$ | O |
| C-8360 | H | $CH_2CH_2$ | Me | c-Pr | $C(=O)OCH_2CH=CH_2$ | Cl | $C(=O)Me$ | O |
| C-8361 | Me | $CH_2CH_2$ | H | c-Pr | $C(=O)OCH_2CH=CH_2$ | Cl | $C(=O)Me$ | O |
| C-8362 | H | single bond | Me | c-Pr | $C(=O)OCH_2CH=CH_2$ | Me | $C(=O)Me$ | O |
| C-8363 | Me | single bond | H | c-Pr | $C(=O)OCH_2CH=CH_2$ | Me | $C(=O)Me$ | O |
| C-8364 | Me(R) | single bond | H | c-Pr | $C(=O)OCH_2CH=CH_2$ | Me | $C(=O)Me$ | O |
| C-8365 | Me(S) | single bond | H | c-Pr | $C(=O)OCH_2CH=CH_2$ | Me | $C(=O)Me$ | O |
| C-8366 | H | $CH_2$ | Me | c-Pr | $C(=O)OCH_2CH=CH_2$ | Me | $C(=O)Me$ | O |

TABLE 418

| Compound Number | Y | W | Z | $R^1$ | $R^2$ | $R^3$ | $R^{10}$ | A |
|---|---|---|---|---|---|---|---|---|
| C-8367 | Me | $CH_2$ | H | c-Pr | $C(=O)OCH_2CH=CH_2$ | Me | C(=O)Me | O |
| C-8368 | H | CH(Me) | H | c-Pr | $C(=O)OCH_2CH=CH_2$ | Me | C(=O)Me | O |
| C-8369 | H | $CH_2CH_2$ | Me | c-Pr | $C(=O)OCH_2CH=CH_2$ | Me | C(=O)Me | O |
| C-8370 | Me | $CH_2CH_2$ | H | c-Pr | $C(=O)OCH_2CH=CH_2$ | Me | C(=O)Me | O |
| C-8371 | H | single bond | Me | c-Pr | $C(=O)OCH_2CCl_3$ | Cl | C(=O)Me | O |
| C-8372 | Me | single bond | H | c-Pr | $C(=O)OCH_2CCl_3$ | Cl | C(=O)Me | O |
| C-8373 | Me(R) | single bond | H | c-Pr | $C(=O)OCH_2CCl_3$ | Cl | C(=O)Me | O |
| C-8374 | Me(S) | single bond | H | c-Pr | $C(=O)OCH_2CCl_3$ | Cl | C(=O)Me | O |
| C-8375 | H | $CH_2$ | Me | c-Pr | $C(=O)OCH_2CCl_3$ | Cl | C(=O)Me | O |
| C-8376 | Me | $CH_2$ | H | c-Pr | $C(=O)OCH_2CCl_3$ | Cl | C(=O)Me | O |
| C-8377 | H | CH(Me) | H | c-Pr | $C(=O)OCH_2CCl_3$ | Cl | C(=O)Me | O |
| C-8378 | H | $CH_2CH_2$ | Me | c-Pr | $C(=O)OCH_2CCl_3$ | Cl | C(=O)Me | O |
| C-8379 | Me | $CH_2CH_2$ | H | c-Pr | $C(=O)OCH_2CCl_3$ | Cl | C(=O)Me | O |
| C-8380 | H | single bond | Me | c-Pr | $C(=O)OCH_2CCl_3$ | Me | C(=O)Me | O |
| C-8381 | Me | single bond | H | c-Pr | $C(=O)OCH_2CCl_3$ | Me | C(=O)Me | O |
| C-8382 | Me(R) | single bond | H | c-Pr | $C(=O)OCH_2CCl_3$ | Me | C(=O)Me | O |
| C-8383 | Me(S) | single bond | H | c-Pr | $C(=O)OCH_2CCl_3$ | Me | C(=O)Me | O |
| C-8384 | H | $CH_2$ | Me | c-Pr | $C(=O)OCH_2CCl_3$ | Me | C(=O)Me | O |
| C-8385 | Me | $CH_2$ | H | c-Pr | $C(=O)OCH_2CCl_3$ | Me | C(=O)Me | O |
| C-8386 | H | CH(Me) | H | c-Pr | $C(=O)OCH_2CCl_3$ | Me | C(=O)Me | O |
| C-8387 | H | $CH_2CH_2$ | Me | c-Pr | $C(=O)OCH_2CCl_3$ | Me | C(=O)Me | O |
| C-8388 | Me | $CH_2CH_2$ | H | c-Pr | $C(=O)OCH_2CCl_3$ | Me | C(=O)Me | O |
| C-8389 | H | single bond | Me | c-Pr | $C(=O)N(Me)_2$ | Cl | C(=O)Me | O |
| C-8390 | Me | single bond | H | c-Pr | $C(=O)N(Me)_2$ | Cl | C(=O)Me | O |
| C-8391 | Me(R) | single bond | H | c-Pr | $C(=O)N(Me)_2$ | Cl | C(=O)Me | O |
| C-8392 | Me(S) | single bond | H | c-Pr | $C(=O)N(Me)_2$ | Cl | C(=O)Me | O |
| C-8393 | H | $CH_2$ | Me | c-Pr | $C(=O)N(Me)_2$ | Cl | C(=O)Me | O |
| C-8394 | Me | $CH_2$ | H | c-Pr | $C(=O)N(Me)_2$ | Cl | C(=O)Me | O |
| C-8395 | H | CH(Me) | H | c-Pr | $C(=O)N(Me)_2$ | Cl | C(=O)Me | O |
| C-8396 | H | $CH_2CH_2$ | Me | c-Pr | $C(=O)N(Me)_2$ | Cl | C(=O)Me | O |
| C-8397 | Me | $CH_2CH_2$ | H | c-Pr | $C(=O)N(Me)_2$ | Cl | C(=O)Me | O |
| C-8398 | H | single bond | Me | c-Pr | $C(=O)N(Me)_2$ | Me | C(=O)Me | O |
| C-8399 | Me | single bond | H | c-Pr | $C(=O)N(Me)_2$ | Me | C(=O)Me | O |
| C-8400 | Me(R) | single bond | H | c-Pr | $C(=O)N(Me)_2$ | Me | C(=O)Me | O |
| C-8401 | Me(S) | single bond | H | c-Pr | $C(=O)N(Me)_2$ | Me | C(=O)Me | O |
| C-8402 | H | $CH_2$ | Me | c-Pr | $C(=O)N(Me)_2$ | Me | C(=O)Me | O |
| C-8403 | Me | $CH_2$ | H | c-Pr | $C(=O)N(Me)_2$ | Me | C(=O)Me | O |
| C-8404 | H | CH(Me) | H | c-Pr | $C(=O)N(Me)_2$ | Me | C(=O)Me | O |
| C-8405 | H | $CH_2CH_2$ | Me | c-Pr | $C(=O)N(Me)_2$ | Me | C(=O)Me | O |
| C-8406 | Me | $CH_2CH_2$ | H | c-Pr | $C(=O)N(Me)_2$ | Me | C(=O)Me | O |
| C-8407 | H | single bond | Me | c-Pr | $CH_2OC(=O)Me$ | Cl | C(=O)Me | O |
| C-8408 | Me | single bond | H | c-Pr | $CH_2OC(=O)Me$ | Cl | C(=O)Me | O |
| C-8409 | Me(R) | single bond | H | c-Pr | $CH_2OC(=O)Me$ | Cl | C(=O)Me | O |
| C-8410 | Me(S) | single bond | H | c-Pr | $CH_2OC(=O)Me$ | Cl | C(=O)Me | O |

TABLE 419

| Compound Number | Y | W | Z | $R^1$ | $R^2$ | $R^3$ | $R^{10}$ | A |
|---|---|---|---|---|---|---|---|---|
| C-8411 | H | $CH_2$ | Me | c-Pr | $CH_2OC(=O)Me$ | Cl | C(=O)Me | O |
| C-8412 | Me | $CH_2$ | H | c-Pr | $CH_2OC(=O)Me$ | Cl | C(=O)Me | O |
| C-8413 | H | CH(Me) | H | c-Pr | $CH_2OC(=O)Me$ | Cl | C(=O)Me | O |
| C-8414 | H | $CH_2CH_2$ | Me | c-Pr | $CH_2OC(=O)Me$ | Cl | C(=O)Me | O |
| C-8415 | Me | $CH_2CH_2$ | H | c-Pr | $CH_2OC(=O)Me$ | Cl | C(=O)Me | O |
| C-8416 | H | single bond | Me | c-Pr | $CH_2OC(=O)Me$ | Me | C(=O)Me | O |
| C-8417 | Me | single bond | H | c-Pr | $CH_2OC(=O)Me$ | Me | C(=O)Me | O |
| C-8418 | Me(R) | single bond | H | c-Pr | $CH_2OC(=O)Me$ | Me | C(=O)Me | O |
| C-8419 | Me(S) | single bond | H | c-Pr | $CH_2OC(=O)Me$ | Me | C(=O)Me | O |
| C-8420 | H | $CH_2$ | Me | c-Pr | $CH_2OC(=O)Me$ | Me | C(=O)Me | O |
| C-8421 | Me | $CH_2$ | H | c-Pr | $CH_2OC(=O)Me$ | Me | C(=O)Me | O |
| C-8422 | H | CH(Me) | H | c-Pr | $CH_2OC(=O)Me$ | Me | C(=O)Me | O |
| C-8423 | H | $CH_2CH_2$ | Me | c-Pr | $CH_2OC(=O)Me$ | Me | C(=O)Me | O |
| C-8424 | Me | $CH_2CH_2$ | H | c-Pr | $CH_2OC(=O)Me$ | Me | C(=O)Me | O |
| C-8425 | H | single bond | Me | c-Pr | $CH_2OC(=O)(i-Pr)$ | Cl | C(=O)Me | O |
| C-8426 | Me | single bond | H | c-Pr | $CH_2OC(=O)(i-Pr)$ | Cl | C(=O)Me | O |
| C-8427 | Me(R) | single bond | H | c-Pr | $CH_2OC(=O)(i-Pr)$ | Cl | C(=O)Me | O |
| C-8428 | Me(S) | single bond | H | c-Pr | $CH_2OC(=O)(i-Pr)$ | Cl | C(=O)Me | O |
| C-8429 | H | $CH_2$ | Me | c-Pr | $CH_2OC(=O)(i-Pr)$ | Cl | C(=O)Me | O |
| C-8430 | Me | $CH_2$ | H | c-Pr | $CH_2OC(=O)(i-Pr)$ | Cl | C(=O)Me | O |
| C-8431 | H | CH(Me) | H | c-Pr | $CH_2OC(=O)(i-Pr)$ | Cl | C(=O)Me | O |

TABLE 419-continued

| Compound Number | Y | W | Z | $R^1$ | $R^2$ | $R^3$ | $R^{10}$ | A |
|---|---|---|---|---|---|---|---|---|
| C-8432 | H | $CH_2CH_2$ | Me | c-Pr | $CH_2OC({=}O)(i\text{-}Pr)$ | Cl | C(=O)Me | O |
| C-8433 | Me | $CH_2CH_2$ | H | c-Pr | $CH_2OC({=}O)(i\text{-}Pr)$ | Cl | C(=O)Me | O |
| C-8434 | H | single bond | Me | c-Pr | $CH_2OC({=}O)(i\text{-}Pr)$ | Me | C(=O)Me | O |
| C-8435 | Me | single bond | H | c-Pr | $CH_2OC({=}O)(i\text{-}Pr)$ | Me | C(=O)Me | O |
| C-8436 | Me(R) | single bond | H | c-Pr | $CH_2OC({=}O)(i\text{-}Pr)$ | Me | C(=O)Me | O |
| C-8437 | Me(S) | single bond | H | c-Pr | $CH_2OC({=}O)(i\text{-}Pr)$ | Me | C(=O)Me | O |
| C-8438 | H | $CH_2$ | Me | c-Pr | $CH_2OC({=}O)(i\text{-}Pr)$ | Me | C(=O)Me | O |
| C-8439 | Me | $CH_2$ | H | c-Pr | $CH_2OC({=}O)(i\text{-}Pr)$ | Me | C(=O)Me | O |
| C-8440 | H | CH(Me) | H | c-Pr | $CH_2OC({=}O)(i\text{-}Pr)$ | Me | C(=O)Me | O |
| C-8441 | H | $CH_2CH_2$ | Me | c-Pr | $CH_2OC({=}O)(i\text{-}Pr)$ | Me | C(=O)Me | O |
| C-8442 | Me | $CH_2CH_2$ | H | c-Pr | $CH_2OC({=}O)(i\text{-}Pr)$ | Me | C(=O)Me | O |
| C-8443 | H | single bond | Me | c-Pr | $CH_2OC({=}O)(t\text{-}Bu)$ | Cl | C(=O)Me | O |
| C-8444 | Me | single bond | H | c-Pr | $CH_2OC({=}O)(t\text{-}Bu)$ | Cl | C(=O)Me | O |
| C-8445 | Me(R) | single bond | H | c-Pr | $CH_2OC({=}O)(t\text{-}Bu)$ | Cl | C(=O)Me | O |
| C-8446 | Me(S) | single bond | H | c-Pr | $CH_2OC({=}O)(t\text{-}Bu)$ | Cl | C(=O)Me | O |
| C-8447 | H | $CH_2$ | Me | c-Pr | $CH_2OC({=}O)(t\text{-}Bu)$ | Cl | C(=O)Me | O |
| C-8448 | Me | $CH_2$ | H | c-Pr | $CH_2OC({=}O)(t\text{-}Bu)$ | Cl | C(=O)Me | O |
| C-8449 | H | CH(Me) | H | c-Pr | $CH_2OC({=}O)(t\text{-}Bu)$ | Cl | C(=O)Me | O |
| C-8450 | H | $CH_2CH_2$ | Me | c-Pr | $CH_2OC({=}O)(t\text{-}Bu)$ | Cl | C(=O)Me | O |
| C-8451 | Me | $CH_2CH_2$ | H | c-Pr | $CH_2OC({=}O)(t\text{-}Bu)$ | Cl | C(=O)Me | O |
| C-8452 | H | single bond | Me | c-Pr | $CH_2OC({=}O)(t\text{-}Bu)$ | Me | C(=O)Me | O |
| C-8453 | Me | single bond | H | c-Pr | $CH_2OC({=}O)(t\text{-}Bu)$ | Me | C(=O)Me | O |
| C-8454 | Me(R) | single bond | H | c-Pr | $CH_2OC({=}O)(t\text{-}Bu)$ | Me | C(=O)Me | O |

TABLE 420

| Compound Number | Y | W | Z | $R^1$ | $R^2$ | $R^3$ | $R^{10}$ | A |
|---|---|---|---|---|---|---|---|---|
| C-8455 | Me(S) | single bond | H | c-Pr | $CH_2OC({=}O)(t\text{-}Bu)$ | Me | C(=O)Me | O |
| C-8456 | H | $CH_2$ | Me | c-Pr | $CH_2OC({=}O)(t\text{-}Bu)$ | Me | C(=O)Me | O |
| C-8457 | Me | $CH_2$ | H | c-Pr | $CH_2OC({=}O)(t\text{-}Bu)$ | Me | C(=O)Me | O |
| C-8458 | H | CH(Me) | H | c-Pr | $CH_2OC({=}O)(t\text{-}Bu)$ | Me | C(=O)Me | O |
| C-8459 | H | $CH_2CH_2$ | Me | c-Pr | $CH_2OC({=}O)(t\text{-}Bu)$ | Me | C(=O)Me | O |
| C-8460 | Me | $CH_2CH_2$ | H | c-Pr | $CH_2OC({=}O)(t\text{-}Bu)$ | Me | C(=O)Me | O |
| C-8461 | H | single bond | Me | c-Pr | $CH_2OC({=}O)OEt$ | Cl | C(=O)Me | O |
| C-8462 | Me | single bond | H | c-Pr | $CH_2OC({=}O)OEt$ | Cl | C(=O)Me | O |
| C-8463 | Me(R) | single bond | H | c-Pr | $CH_2OC({=}O)OEt$ | Cl | C(=O)Me | O |
| C-8464 | Me(S) | single bond | H | c-Pr | $CH_2OC({=}O)OEt$ | Cl | C(=O)Me | O |
| C-8465 | H | $CH_2$ | Me | c-Pr | $CH_2OC({=}O)OEt$ | Cl | C(=O)Me | O |
| C-8466 | Me | $CH_2$ | H | c-Pr | $CH_2OC({=}O)OEt$ | Cl | C(=O)Me | O |
| C-8467 | H | CH(Me) | H | c-Pr | $CH_2OC({=}O)OEt$ | Cl | C(=O)Me | O |
| C-8468 | H | $CH_2CH_2$ | Me | c-Pr | $CH_2OC({=}O)OEt$ | Cl | C(=O)Me | O |
| C-8469 | Me | $CH_2CH_2$ | H | c-Pr | $CH_2OC({=}O)OEt$ | Cl | C(=O)Me | O |
| C-8470 | H | single bond | Me | c-Pr | $CH_2OC({=}O)OEt$ | Me | C(=O)Me | O |
| C-8471 | Me | single bond | H | c-Pr | $CH_2OC({=}O)OEt$ | Me | C(=O)Me | O |
| C-8472 | Me(R) | single bond | H | c-Pr | $CH_2OC({=}O)OEt$ | Me | C(=O)Me | O |
| C-8473 | Me(S) | single bond | H | c-Pr | $CH_2OC({=}O)OEt$ | Me | C(=O)Me | O |
| C-8474 | H | $CH_2$ | Me | c-Pr | $CH_2OC({=}O)OEt$ | Me | C(=O)Me | O |
| C-8475 | Me | $CH_2$ | H | c-Pr | $CH_2OC({=}O)OEt$ | Me | C(=O)Me | O |
| C-8476 | H | CH(Me) | H | c-Pr | $CH_2OC({=}O)OEt$ | Me | C(=O)Me | O |
| C-8477 | H | $CH_2CH_2$ | Me | c-Pr | $CH_2OC({=}O)OEt$ | Me | C(=O)Me | O |
| C-8478 | Me | $CH_2CH_2$ | H | c-Pr | $CH_2OC({=}O)OEt$ | Me | C(=O)Me | O |
| C-8479 | H | single bond | Me | c-Pr | $CH_2OC({=}O)O(i\text{-}Pr)$ | Cl | C(=O)Me | O |
| C-8480 | Me | single bond | H | c-Pr | $CH_2OC({=}O)O(i\text{-}Pr)$ | Cl | C(=O)Me | O |
| C-8481 | Me(R) | single bond | H | c-Pr | $CH_2OC({=}O)O(i\text{-}Pr)$ | Cl | C(=O)Me | O |
| C-8482 | Me(S) | single bond | H | c-Pr | $CH_2OC({=}O)O(i\text{-}Pr)$ | Cl | C(=O)Me | O |
| C-8483 | H | $CH_2$ | Me | c-Pr | $CH_2OC({=}O)O(i\text{-}Pr)$ | Cl | C(=O)Me | O |
| C-8484 | Me | $CH_2$ | H | c-Pr | $CH_2OC({=}O)O(i\text{-}Pr)$ | Cl | C(=O)Me | O |
| C-8485 | H | CH(Me) | H | c-Pr | $CH_2OC({=}O)O(i\text{-}Pr)$ | Cl | C(=O)Me | O |
| C-8486 | H | $CH_2CH_2$ | Me | c-Pr | $CH_2OC({=}O)O(i\text{-}Pr)$ | Cl | C(=O)Me | O |
| C-8487 | Me | $CH_2CH_2$ | H | c-Pr | $CH_2OC({=}O)O(i\text{-}Pr)$ | Cl | C(=O)Me | O |
| C-8488 | H | single bond | Me | c-Pr | $CH_2OC({=}O)O(i\text{-}Pr)$ | Me | C(=O)Me | O |
| C-8489 | Me | single bond | H | c-Pr | $CH_2OC({=}O)O(i\text{-}Pr)$ | Me | C(=O)Me | O |
| C-8490 | Me(R) | single bond | H | c-Pr | $CH_2OC({=}O)O(i\text{-}Pr)$ | Me | C(=O)Me | O |
| C-8491 | Me(S) | single bond | H | c-Pr | $CH_2OC({=}O)O(i\text{-}Pr)$ | Me | C(=O)Me | O |
| C-8492 | H | $CH_2$ | Me | c-Pr | $CH_2OC({=}O)O(i\text{-}Pr)$ | Me | C(=O)Me | O |
| C-8493 | Me | $CH_2$ | H | c-Pr | $CH_2OC({=}O)O(i\text{-}Pr)$ | Me | C(=O)Me | O |
| C-8494 | H | CH(Me) | H | c-Pr | $CH_2OC({=}O)O(i\text{-}Pr)$ | Me | C(=O)Me | O |
| C-8495 | H | $CH_2CH_2$ | Me | c-Pr | $CH_2OC({=}O)O(i\text{-}Pr)$ | Me | C(=O)Me | O |
| C-8496 | Me | $CH_2CH_2$ | H | c-Pr | $CH_2OC({=}O)O(i\text{-}Pr)$ | Me | C(=O)Me | O |

TABLE 420-continued

| Compound Number | Y | W | Z | $R^1$ | $R^2$ | $R^3$ | $R^{10}$ | A |
|---|---|---|---|---|---|---|---|---|
| C-8497 | H | single bond | Me | c-Pr | $CH_2N(Me)C({=}O)OMe$ | Cl | $C({=}O)Me$ | O |
| C-8498 | Me | single bond | H | c-Pr | $CH_2N(Me)C({=}O)OMe$ | Cl | $C({=}O)Me$ | O |

TABLE 421

| Compound Number | Y | W | Z | $R^1$ | $R^2$ | $R^3$ | $R^{10}$ | A |
|---|---|---|---|---|---|---|---|---|
| C-8499 | Me(R) | single bond | H | c-Pr | $CH_2N(Me)C({=}O)OMe$ | Cl | $C({=}O)Me$ | O |
| C-8500 | Me(S) | single bond | H | c-Pr | $CH_2N(Me)C({=}O)OMe$ | Cl | $C({=}O)Me$ | O |
| C-8501 | H | $CH_2$ | Me | c-Pr | $CH_2N(Me)C({=}O)OMe$ | Cl | $C({=}O)Me$ | O |
| C-8502 | Me | $CH_2$ | H | c-Pr | $CH_2N(Me)C({=}O)OMe$ | Cl | $C({=}O)Me$ | O |
| C-8503 | H | CH(Me) | H | c-Pr | $CH_2N(Me)C({=}O)OMe$ | Cl | $C({=}O)Me$ | O |
| C-8504 | H | $CH_2CH_2$ | Me | c-Pr | $CH_2N(Me)C({=}O)OMe$ | Cl | $C({=}O)Me$ | O |
| C-8505 | Me | $CH_2CH_2$ | H | c-Pr | $CH_2N(Me)C({=}O)OMe$ | Cl | $C({=}O)Me$ | O |
| C-8506 | H | single bond | Me | c-Pr | $CH_2N(Me)C({=}O)OMe$ | Me | $C({=}O)Me$ | O |
| C-8507 | Me | single bond | H | c-Pr | $CH_2N(Me)C({=}O)OMe$ | Me | $C({=}O)Me$ | O |
| C-8508 | Me(R) | single bond | H | c-Pr | $CH_2N(Me)C({=}O)OMe$ | Me | $C({=}O)Me$ | O |
| C-8509 | Me(S) | single bond | H | c-Pr | $CH_2N(Me)C({=}O)OMe$ | Me | $C({=}O)Me$ | O |
| C-8510 | H | $CH_2$ | Me | c-Pr | $CH_2N(Me)C({=}O)OMe$ | Me | $C({=}O)Me$ | O |
| C-8511 | Me | $CH_2$ | H | c-Pr | $CH_2N(Me)C({=}O)OMe$ | Me | $C({=}O)Me$ | O |
| C-8512 | H | CH(Me) | H | c-Pr | $CH_2N(Me)C({=}O)OMe$ | Me | $C({=}O)Me$ | O |
| C-8513 | H | $CH_2CH_2$ | Me | c-Pr | $CH_2N(Me)C({=}O)OMe$ | Me | $C({=}O)Me$ | O |
| C-8514 | Me | $CH_2CH_2$ | H | c-Pr | $CH_2N(Me)C({=}O)OMe$ | Me | $C({=}O)Me$ | O |
| C-8515 | H | single bond | Me | c-Pr(1-CN) | $C({=}O)OCH_2CH{=}CH_2$ | Cl | H | O |
| C-8516 | Me | single bond | H | c-Pr(1-CN) | $C({=}O)OCH_2CH{=}CH_2$ | Cl | H | O |
| C-8517 | Me(R) | single bond | H | c-Pr(1-CN) | $C({=}O)OCH_2CH{=}CH_2$ | Cl | H | O |
| C-8518 | Me(S) | single bond | H | c-Pr(1-CN) | $C({=}O)OCH_2CH{=}CH_2$ | Cl | H | O |
| C-8519 | H | $CH_2$ | Me | c-Pr(1-CN) | $C({=}O)OCH_2CH{=}CH_2$ | Cl | H | O |
| C-8520 | Me | $CH_2$ | H | c-Pr(1-CN) | $C({=}O)OCH_2CH{=}CH_2$ | Cl | H | O |
| C-8521 | H | CH(Me) | H | c-Pr(1-CN) | $C({=}O)OCH_2CH{=}CH_2$ | Cl | H | O |
| C-8522 | H | $CH_2CH_2$ | Me | c-Pr(1-CN) | $C({=}O)OCH_2CH{=}CH_2$ | Cl | H | O |
| C-8523 | Me | $CH_2CH_2$ | H | c-Pr(1-CN) | $C({=}O)OCH_2CH{=}CH_2$ | Cl | H | O |
| C-8524 | H | single bond | Me | c-Pr(1-CN) | $C({=}O)OCH_2CH{=}CH_2$ | Me | H | O |
| C-8525 | Me | single bond | H | c-Pr(1-CN) | $C({=}O)OCH_2CH{=}CH_2$ | Me | H | O |
| C-8526 | Me(R) | single bond | H | c-Pr(1-CN) | $C({=}O)OCH_2CH{=}CH_2$ | Me | H | O |
| C-8527 | Me(S) | single bond | H | c-Pr(1-CN) | $C({=}O)OCH_2CH{=}CH_2$ | Me | H | O |
| C-8528 | H | $CH_2$ | Me | c-Pr(1-CN) | $C({=}O)OCH_2CH{=}CH_2$ | Me | H | O |
| C-8529 | Me | $CH_2$ | H | c-Pr(1-CN) | $C({=}O)OCH_2CH{=}CH_2$ | Me | H | O |
| C-8530 | H | CH(Me) | H | c-Pr(1-CN) | $C({=}O)OCH_2CH{=}CH_2$ | Me | H | O |
| C-8531 | H | $CH_2CH_2$ | Me | c-Pr(1-CN) | $C({=}O)OCH_2CH{=}CH_2$ | Me | H | O |
| C-8532 | Me | $CH_2CH_2$ | H | c-Pr(1-CN) | $C({=}O)OCH_2CH{=}CH_2$ | Me | H | O |
| C-8533 | H | single bond | Me | c-Pr(1-CN) | $C({=}O)OCH_2CCl_3$ | Cl | H | O |
| C-8534 | Me | single bond | H | c-Pr(1-CN) | $C({=}O)OCH_2CCl_3$ | Cl | H | O |
| C-8535 | Me(R) | single bond | H | c-Pr(1-CN) | $C({=}O)OCH_2CCl_3$ | Cl | H | O |
| C-8536 | Me(S) | single bond | H | c-Pr(1-CN) | $C({=}O)OCH_2CCl_3$ | Cl | H | O |
| C-8537 | H | $CH_2$ | Me | c-Pr(1-CN) | $C({=}O)OCH_2CCl_3$ | Cl | H | O |
| C-8538 | Me | $CH_2$ | H | c-Pr(1-CN) | $C({=}O)OCH_2CCl_3$ | Cl | H | O |
| C-8539 | H | CH(Me) | H | c-Pr(1-CN) | $C({=}O)OCH_2CCl_3$ | Cl | H | O |
| C-8540 | H | $CH_2CH_2$ | Me | c-Pr(1-CN) | $C({=}O)OCH_2CCl_3$ | Cl | H | O |
| C-8541 | Me | $CH_2CH_2$ | H | c-Pr(1-CN) | $C({=}O)OCH_2CCl_3$ | Cl | H | O |
| C-8542 | H | single bond | Me | c-Pr(1-CN) | $C({=}O)OCH_2CCl_3$ | Me | H | O |

TABLE 422

| Compound Number | Y | W | Z | $R^1$ | $R^2$ | $R^3$ | $R^{10}$ | A |
|---|---|---|---|---|---|---|---|---|
| C-8543 | Me | single bond | H | c-Pr(1-CN) | $C({=}O)OCH_2CCl_3$ | Me | H | O |
| C-8544 | Me(R) | single bond | H | c-Pr(1-CN) | $C({=}O)OCH_2CCl_3$ | Me | H | O |
| C-8545 | Me(S) | single bond | H | c-Pr(1-CN) | $C({=}O)OCH_2CCl_3$ | Me | H | O |
| C-8546 | H | $CH_2$ | Me | c-Pr(1-CN) | $C({=}O)OCH_2CCl_3$ | Me | H | O |
| C-8547 | Me | $CH_2$ | H | c-Pr(1-CN) | $C({=}O)OCH_2CCl_3$ | Me | H | O |
| C-8548 | H | CH(Me) | H | c-Pr(1-CN) | $C({=}O)OCH_2CCl_3$ | Me | H | O |
| C-8549 | H | $CH_2CH_2$ | Me | c-Pr(1-CN) | $C({=}O)OCH_2CCl_3$ | Me | H | O |
| C-8550 | Me | $CH_2CH_2$ | H | c-Pr(1-CN) | $C({=}O)OCH_2CCl_3$ | Me | H | O |
| C-8551 | H | single bond | Me | c-Pr(1-CN) | $C({=}O)N(Me)_2$ | Cl | H | O |
| C-8552 | Me | single bond | H | c-Pr(1-CN) | $C({=}O)N(Me)_2$ | Cl | H | O |

TABLE 422-continued

| Compound Number | Y | W | Z | $R^1$ | $R^2$ | $R^3$ | $R^{10}$ | A |
|---|---|---|---|---|---|---|---|---|
| C-8553 | Me(R) | single bond | H | c-Pr(1-CN) | C(=O)N(Me)$_2$ | Cl | H | O |
| C-8554 | Me(S) | single bond | H | c-Pr(1-CN) | C(=O)N(Me)$_2$ | Cl | H | O |
| C-8555 | H | $CH_2$ | Me | c-Pr(1-CN) | C(=O)N(Me)$_2$ | Cl | H | O |
| C-8556 | Me | $CH_2$ | H | c-Pr(1-CN) | C(=O)N(Me)$_2$ | Cl | H | O |
| C-8557 | H | CH(Me) | H | c-Pr(1-CN) | C(=O)N(Me)$_2$ | Cl | H | O |
| C-8558 | H | $CH_2CH_2$ | Me | c-Pr(1-CN) | C(=O)N(Me)$_2$ | Cl | H | O |
| C-8559 | Me | $CH_2CH_2$ | H | c-Pr(1-CN) | C(=O)N(Me)$_2$ | Cl | H | O |
| C-8560 | H | single bond | Me | c-Pr(1-CN) | C(=O)N(Me)$_2$ | Me | H | O |
| C-8561 | Me | single bond | H | c-Pr(1-CN) | C(=O)N(Me)$_2$ | Me | H | O |
| C-8562 | Me(R) | single bond | H | c-Pr(1-CN) | C(=O)N(Me)$_2$ | Me | H | O |
| C-8563 | Me(S) | single bond | H | c-Pr(1-CN) | C(=O)N(Me)$_2$ | Me | H | O |
| C-8564 | H | $CH_2$ | Me | c-Pr(1-CN) | C(=O)N(Me)$_2$ | Me | H | O |
| C-8565 | Me | $CH_2$ | H | c-Pr(1-CN) | C(=O)N(Me)$_2$ | Me | H | O |
| C-8566 | H | CH(Me) | H | c-Pr(1-CN) | C(=O)N(Me)$_2$ | Me | H | O |
| C-8567 | H | $CH_2CH_2$ | Me | c-Pr(1-CN) | C(=O)N(Me)$_2$ | Me | H | O |
| C-8568 | Me | $CH_2CH_2$ | H | c-Pr(1-CN) | C(=O)N(Me)$_2$ | Me | H | O |
| C-8569 | H | single bond | Me | c-Pr(1-CN) | $CH_2$OC(=O)Me | Cl | H | O |
| C-8570 | Me | single bond | H | c-Pr(1-CN) | $CH_2$OC(=O)Me | Cl | H | O |
| C-8571 | Me(R) | single bond | H | c-Pr(1-CN) | $CH_2$OC(=O)Me | Cl | H | O |
| C-8572 | Me(S) | single bond | H | c-Pr(1-CN) | $CH_2$OC(=O)Me | Cl | H | O |
| C-8573 | H | $CH_2$ | Me | c-Pr(1-CN) | $CH_2$OC(=O)Me | Cl | H | O |
| C-8574 | Me | $CH_2$ | H | c-Pr(1-CN) | $CH_2$OC(=O)Me | Cl | H | O |
| C-8575 | H | CH(Me) | H | c-Pr(1-CN) | $CH_2$OC(=O)Me | Cl | H | O |
| C-8576 | H | $CH_2CH_2$ | Me | c-Pr(1-CN) | $CH_2$OC(=O)Me | Cl | H | O |
| C-8577 | Me | $CH_2CH_2$ | H | c-Pr(1-CN) | $CH_2$OC(=O)Me | Cl | H | O |
| C-8578 | H | single bond | Me | c-Pr(1-CN) | $CH_2$OC(=O)Me | Me | H | O |
| C-8579 | Me | single bond | H | c-Pr(1-CN) | $CH_2$OC(=O)Me | Me | H | O |
| C-8580 | Me(R) | single bond | H | c-Pr(1-CN) | $CH_2$OC(=O)Me | Me | H | O |
| C-8581 | Me(S) | single bond | H | c-Pr(1-CN) | $CH_2$OC(=O)Me | Me | H | O |
| C-8582 | H | $CH_2$ | Me | c-Pr(1-CN) | $CH_2$OC(=O)Me | Me | H | O |
| C-8583 | Me | $CH_2$ | H | c-Pr(1-CN) | $CH_2$OC(=O)Me | Me | H | O |
| C-8584 | H | CH(Me) | H | c-Pr(1-CN) | $CH_2$OC(=O)Me | Me | H | O |
| C-8585 | H | $CH_2CH_2$ | Me | c-Pr(1-CN) | $CH_2$OC(=O)Me | Me | H | O |
| C-8586 | Me | $CH_2CH_2$ | H | c-Pr(1-CN) | $CH_2$OC(=O)Me | Me | H | O |

TABLE 423

| Compound Number | Y | W | Z | $R^1$ | $R^2$ | $R^3$ | $R^{10}$ | A |
|---|---|---|---|---|---|---|---|---|
| C-8587 | H | single bond | Me | c-Pr(1-CN) | $CH_2$OC(=O)(i-Pr) | Cl | H | O |
| C-8588 | Me | single bond | H | c-Pr(1-CN) | $CH_2$OC(=O)(i-Pr) | Cl | H | O |
| C-8589 | Me(R) | single bond | H | c-Pr(1-CN) | $CH_2$OC(=O)(i-Pr) | Cl | H | O |
| C-8590 | Me(S) | single bond | H | c-Pr(1-CN) | $CH_2$OC(=O)(i-Pr) | Cl | H | O |
| C-8591 | H | $CH_2$ | Me | c-Pr(1-CN) | $CH_2$OC(=O)(i-Pr) | Cl | H | O |
| C-8592 | Me | $CH_2$ | H | c-Pr(1-CN) | $CH_2$OC(=O)(i-Pr) | Cl | H | O |
| C-8593 | H | CH(Me) | H | c-Pr(1-CN) | $CH_2$OC(=O)(i-Pr) | Cl | H | O |
| C-8594 | H | $CH_2CH_2$ | Me | c-Pr(1-CN) | $CH_2$OC(=O)(i-Pr) | Cl | H | O |
| C-8595 | Me | $CH_2CH_2$ | H | c-Pr(1-CN) | $CH_2$OC(=O)(i-Pr) | Cl | H | O |
| C-8596 | H | single bond | Me | c-Pr(1-CN) | $CH_2$OC(=O)(i-Pr) | Me | H | O |
| C-8597 | Me | single bond | H | c-Pr(1-CN) | $CH_2$OC(=O)(i-Pr) | Me | H | O |
| C-8598 | Me(R) | single bond | H | c-Pr(1-CN) | $CH_2$OC(=O)(i-Pr) | Me | H | O |
| C-8599 | Me(S) | single bond | H | c-Pr(1-CN) | $CH_2$OC(=O)(i-Pr) | Me | H | O |
| C-8600 | H | $CH_2$ | Me | c-Pr(1-CN) | $CH_2$OC(=O)(i-Pr) | Me | H | O |
| C-8601 | Me | $CH_2$ | H | c-Pr(1-CN) | $CH_2$OC(=O)(i-Pr) | Me | H | O |
| C-8602 | H | CH(Me) | H | c-Pr(1-CN) | $CH_2$OC(=O)(i-Pr) | Me | H | O |
| C-8603 | H | $CH_2CH_2$ | Me | c-Pr(1-CN) | $CH_2$OC(=O)(i-Pr) | Me | H | O |
| C-8604 | Me | $CH_2CH_2$ | H | c-Pr(1-CN) | $CH_2$OC(=O)(i-Pr) | Me | H | O |
| C-8605 | H | single bond | Me | c-Pr(1-CN) | $CH_2$OC(=O)(t-Bu) | Cl | H | O |
| C-8606 | Me | single bond | H | c-Pr(1-CN) | $CH_2$OC(=O)(t-Bu) | Cl | H | O |
| C-8607 | Me(R) | single bond | H | c-Pr(1-CN) | $CH_2$OC(=O)(t-Bu) | Cl | H | O |
| C-8608 | Me(S) | single bond | H | c-Pr(1-CN) | $CH_2$OC(=O)(t-Bu) | Cl | H | O |
| C-8609 | H | $CH_2$ | Me | c-Pr(1-CN) | $CH_2$OC(=O)(t-Bu) | Cl | H | O |
| C-8610 | Me | $CH_2$ | H | c-Pr(1-CN) | $CH_2$OC(=O)(t-Bu) | Cl | H | O |
| C-8611 | H | CH(Me) | H | c-Pr(1-CN) | $CH_2$OC(=O)(t-Bu) | Cl | H | O |
| C-8612 | H | $CH_2CH_2$ | Me | c-Pr(1-CN) | $CH_2$OC(=O)(t-Bu) | Cl | H | O |
| C-8613 | Me | $CH_2CH_2$ | H | c-Pr(1-CN) | $CH_2$OC(=O)(t-Bu) | Cl | H | O |
| C-8614 | H | single bond | Me | c-Pr(1-CN) | $CH_2$OC(=O)(t-Bu) | Me | H | O |
| C-8615 | Me | single bond | H | c-Pr(1-CN) | $CH_2$OC(=O)(t-Bu) | Me | H | O |
| C-8616 | Me(R) | single bond | H | c-Pr(1-CN) | $CH_2$OC(=O)(t-Bu) | Me | H | O |
| C-8617 | Me(S) | single bond | H | c-Pr(1-CN) | $CH_2$OC(=O)(t-Bu) | Me | H | O |
| C-8618 | H | $CH_2$ | Me | c-Pr(1-CN) | $CH_2$OC(=O)(t-Bu) | Me | H | O |
| C-8619 | Me | $CH_2$ | H | c-Pr(1-CN) | $CH_2$OC(=O)(t-Bu) | Me | H | O |

TABLE 423-continued

| Compound Number | Y | W | Z | $R^1$ | $R^2$ | $R^3$ | $R^{10}$ | A |
|---|---|---|---|---|---|---|---|---|
| C-8620 | H | CH(Me) | H | c-Pr(1-CN) | $CH_2OC({=}O)$(t-Bu) | Me | H | O |
| C-8621 | H | $CH_2CH_2$ | Me | c-Pr(1-CN) | $CH_2OC({=}O)$(t-Bu) | Me | H | O |
| C-8622 | Me | $CH_2CH_2$ | H | c-Pr(1-CN) | $CH_2OC({=}O)$(t-Bu) | Me | H | O |
| C-8623 | H | single bond | Me | c-Pr(1-CN) | $CH_2OC({=}O)OEt$ | Cl | H | O |
| C-8624 | Me | single bond | H | c-Pr(1-CN) | $CH_2OC({=}O)OEt$ | Cl | H | O |
| C-8625 | Me(R) | single bond | H | c-Pr(1-CN) | $CH_2OC({=}O)OEt$ | Cl | H | O |
| C-8626 | Me(S) | single bond | H | c-Pr(1-CN) | $CH_2OC({=}O)OEt$ | Cl | H | O |
| C-8627 | H | $CH_2$ | Me | c-Pr(1-CN) | $CH_2OC({=}O)OEt$ | Cl | H | O |
| C-8628 | Me | $CH_2$ | H | c-Pr(1-CN) | $CH_2OC({=}O)OEt$ | Cl | H | O |
| C-8629 | H | CH(Me) | H | c-Pr(1-CN) | $CH_2OC({=}O)OEt$ | Cl | H | O |
| C-8630 | H | $CH_2CH_2$ | Me | c-Pr(1-CN) | $CH_2OC({=}O)OEt$ | Cl | H | O |

TABLE 424

| Compound Number | Y | W | Z | $R^1$ | $R^2$ | $R^3$ | $R^{10}$ | A |
|---|---|---|---|---|---|---|---|---|
| C-8631 | Me | $CH_2CH_2$ | H | c-Pr(1-CN) | $CH_2OC({=}O)OEt$ | Cl | H | O |
| C-8632 | H | single bond | Me | c-Pr(1-CN) | $CH_2OC({=}O)OEt$ | Me | H | O |
| C-8633 | Me | single bond | H | c-Pr(1-CN) | $CH_2OC({=}O)OEt$ | Me | H | O |
| C-8634 | Me(R) | single bond | H | c-Pr(1-CN) | $CH_2OC({=}O)OEt$ | Me | H | O |
| C-8635 | Me(S) | single bond | H | c-Pr(1-CN) | $CH_2OC({=}O)OEt$ | Me | H | O |
| C-8636 | H | $CH_2$ | Me | c-Pr(1-CN) | $CH_2OC({=}O)OEt$ | Me | H | O |
| C-8637 | Me | $CH_2$ | H | c-Pr(1-CN) | $CH_2OC({=}O)OEt$ | Me | H | O |
| C-8638 | H | CH(Me) | H | c-Pr(1-CN) | $CH_2OC({=}O)OEt$ | Me | H | O |
| C-8639 | H | $CH_2CH_2$ | Me | c-Pr(1-CN) | $CH_2OC({=}O)OEt$ | Me | H | O |
| C-8640 | Me | $CH_2CH_2$ | H | c-Pr(1-CN) | $CH_2OC({=}O)OEt$ | Me | H | O |
| C-8641 | H | single bond | Me | c-Pr(1-CN) | $CH_2OC({=}O)O$(i-Pr) | Cl | H | O |
| C-8642 | Me | single bond | H | c-Pr(1-CN) | $CH_2OC({=}O)O$(i-Pr) | Cl | H | O |
| C-8643 | Me(R) | single bond | H | c-Pr(1-CN) | $CH_2OC({=}O)O$(i-Pr) | Cl | H | O |
| C-8644 | Me(S) | single bond | H | c-Pr(1-CN) | $CH_2OC({=}O)O$(i-Pr) | Cl | H | O |
| C-8645 | H | $CH_2$ | Me | c-Pr(1-CN) | $CH_2OC({=}O)O$(i-Pr) | Cl | H | O |
| C-8646 | Me | $CH_2$ | H | c-Pr(1-CN) | $CH_2OC({=}O)O$(i-Pr) | Cl | H | O |
| C-8647 | H | CH(Me) | H | c-Pr(1-CN) | $CH_2OC({=}O)O$(i-Pr) | Cl | H | O |
| C-8648 | H | $CH_2CH_2$ | Me | c-Pr(1-CN) | $CH_2OC({=}O)O$(i-Pr) | Cl | H | O |
| C-8649 | Me | $CH_2CH_2$ | H | c-Pr(1-CN) | $CH_2OC({=}O)O$(i-Pr) | Cl | H | O |
| C-8650 | H | single bond | Me | c-Pr(1-CN) | $CH_2OC({=}O)O$(i-Pr) | Me | H | O |
| C-8651 | Me | single bond | H | c-Pr(1-CN) | $CH_2OC({=}O)O$(i-Pr) | Me | H | O |
| C-8652 | Me(R) | single bond | H | c-Pr(1-CN) | $CH_2OC({=}O)O$(i-Pr) | Me | H | O |
| C-8653 | Me(S) | single bond | H | c-Pr(1-CN) | $CH_2OC({=}O)O$(i-Pr) | Me | H | O |
| C-8654 | H | $CH_2$ | Me | c-Pr(1-CN) | $CH_2OC({=}O)O$(i-Pr) | Me | H | O |
| C-8655 | Me | $CH_2$ | H | c-Pr(1-CN) | $CH_2OC({=}O)O$(i-Pr) | Me | H | O |
| C-8656 | H | CH(Me) | H | c-Pr(1-CN) | $CH_2OC({=}O)O$(i-Pr) | Me | H | O |
| C-8657 | H | $CH_2CH_2$ | Me | c-Pr(1-CN) | $CH_2OC({=}O)O$(i-Pr) | Me | H | O |
| C-8658 | Me | $CH_2CH_2$ | H | c-Pr(1-CN) | $CH_2OC({=}O)O$(i-Pr) | Me | H | O |
| C-8659 | H | single bond | Me | c-Pr(1-CN) | $CH_2N(Me)C({=}O)OMe$ | Cl | H | O |
| C-8660 | Me | single bond | H | c-Pr(1-CN) | $CH_2N(Me)C({=}O)OMe$ | Cl | H | O |
| C-8661 | Me(R) | single bond | H | c-Pr(1-CN) | $CH_2N(Me)C({=}O)OMe$ | Cl | H | O |
| C-8662 | Me(S) | single bond | H | c-Pr(1-CN) | $CH_2N(Me)C({=}O)OMe$ | Cl | H | O |
| C-8663 | H | $CH_2$ | Me | c-Pr(1-CN) | $CH_2N(Me)C({=}O)OMe$ | Cl | H | O |
| C-8664 | Me | $CH_2$ | H | c-Pr(1-CN) | $CH_2N(Me)C({=}O)OMe$ | Cl | H | O |
| C-8665 | H | CH(Me) | H | c-Pr(1-CN) | $CH_2N(Me)C({=}O)OMe$ | Cl | H | O |
| C-8666 | H | $CH_2CH_2$ | Me | c-Pr(1-CN) | $CH_2N(Me)C({=}O)OMe$ | Cl | H | O |
| C-8667 | Me | $CH_2CH_2$ | H | c-Pr(1-CN) | $CH_2N(Me)C({=}O)OMe$ | Cl | H | O |
| C-8668 | H | single bond | Me | c-Pr(1-CN) | $CH_2N(Me)C({=}O)OMe$ | Me | H | O |
| C-8669 | Me | single bond | H | c-Pr(1-CN) | $CH_2N(Me)C({=}O)OMe$ | Me | H | O |
| C-8670 | Me(R) | single bond | H | c-Pr(1-CN) | $CH_2N(Me)C({=}O)OMe$ | Me | H | O |
| C-8671 | Me(S) | single bond | H | c-Pr(1-CN) | $CH_2N(Me)C({=}O)OMe$ | Me | H | O |
| C-8672 | H | $CH_2$ | Me | c-Pr(1-CN) | $CH_2N(Me)C({=}O)OMe$ | Me | H | O |
| C-8673 | Me | $CH_2$ | H | c-Pr(1-CN) | $CH_2N(Me)C({=}O)OMe$ | Me | H | O |
| C-8674 | H | CH(Me) | H | c-Pr(1-CN) | $CH_2N(Me)C({=}O)OMe$ | Me | H | O |

TABLE 425

| Compound Number | Y | W | Z | $R^1$ | $R^2$ | $R^3$ | $R^{10}$ | A |
|---|---|---|---|---|---|---|---|---|
| C-8675 | H | $CH_2CH_2$ | Me | c-Pr(1-CN) | $CH_2N(Me)C({=}O)OMe$ | Me | H | O |
| C-8676 | Me | $CH_2CH_2$ | H | c-Pr(1-CN) | $CH_2N(Me)C({=}O)OMe$ | Me | H | O |
| C-8677 | H | single bond | Me | c-Pr(1-CN) | $C({=}O)OCH_2CH{=}CH_2$ | Cl | Me | O |

TABLE 425-continued

| Compound Number | Y | W | Z | $R^1$ | $R^2$ | $R^3$ | $R^{10}$ | A |
|---|---|---|---|---|---|---|---|---|
| C-8678 | Me | single bond | H | c-Pr(1-CN) | C(=O)OCH$_2$CH=CH$_2$ | Cl | Me | O |
| C-8679 | Me(R) | single bond | H | c-Pr(1-CN) | C(=O)OCH$_2$CH=CH$_2$ | Cl | Me | O |
| C-8680 | Me(S) | single bond | H | c-Pr(1-CN) | C(=O)OCH$_2$CH=CH$_2$ | Cl | Me | O |
| C-8681 | H | CH$_2$ | Me | c-Pr(1-CN) | C(=O)OCH$_2$CH=CH$_2$ | Cl | Me | O |
| C-8682 | Me | CH$_2$ | H | c-Pr(1-CN) | C(=O)OCH$_2$CH=CH$_2$ | Cl | Me | O |
| C-8683 | H | CH(Me) | H | c-Pr(1-CN) | C(=O)OCH$_2$CH=CH$_2$ | Cl | Me | O |
| C-8684 | H | CH$_2$CH$_2$ | Me | c-Pr(1-CN) | C(=O)OCH$_2$CH=CH$_2$ | Cl | Me | O |
| C-8685 | Me | CH$_2$CH$_2$ | H | c-Pr(1-CN) | C(=O)OCH$_2$CH=CH$_2$ | Cl | Me | O |
| C-8686 | H | single bond | Me | c-Pr(1-CN) | C(=O)OCH$_2$CH=CH$_2$ | Me | Me | O |
| C-8687 | Me | single bond | H | c-Pr(1-CN) | C(=O)OCH$_2$CH=CH$_2$ | Me | Me | O |
| C-8688 | Me(R) | single bond | H | c-Pr(1-CN) | C(=O)OCH$_2$CH=CH$_2$ | Me | Me | O |
| C-8689 | Me(S) | single bond | H | c-Pr(1-CN) | C(=O)OCH$_2$CH=CH$_2$ | Me | Me | O |
| C-8690 | H | CH$_2$ | Me | c-Pr(1-CN) | C(=O)OCH$_2$CH=CH$_2$ | Me | Me | O |
| C-8691 | Me | CH$_2$ | H | c-Pr(1-CN) | C(=O)OCH$_2$CH=CH$_2$ | Me | Me | O |
| C-8692 | H | CH(Me) | H | c-Pr(1-CN) | C(=O)OCH$_2$CH=CH$_2$ | Me | Me | O |
| C-8693 | H | CH$_2$CH$_2$ | Me | c-Pr(1-CN) | C(=O)OCH$_2$CH=CH$_2$ | Me | Me | O |
| C-8694 | Me | CH$_2$CH$_2$ | H | c-Pr(1-CN) | C(=O)OCH$_2$CH=CH$_2$ | Me | Me | O |
| C-8695 | H | single bond | Me | c-Pr(1-CN) | C(=O)OCH$_2$CCl$_3$ | Cl | Me | O |
| C-8696 | Me | single bond | H | c-Pr(1-CN) | C(=O)OCH$_2$CCl$_3$ | Cl | Me | O |
| C-8697 | Me(R) | single bond | H | c-Pr(1-CN) | C(=O)OCH$_2$CCl$_3$ | Cl | Me | O |
| C-8698 | Me(S) | single bond | H | c-Pr(1-CN) | C(=O)OCH$_2$CCl$_3$ | Cl | Me | O |
| C-8699 | H | CH$_2$ | Me | c-Pr(1-CN) | C(=O)OCH$_2$CCl$_3$ | Cl | Me | O |
| C-8700 | Me | CH$_2$ | H | c-Pr(1-CN) | C(=O)OCH$_2$CCl$_3$ | Cl | Me | O |
| C-8701 | H | CH(Me) | H | c-Pr(1-CN) | C(=O)OCH$_2$CCl$_3$ | Cl | Me | O |
| C-8702 | H | CH$_2$CH$_2$ | Me | c-Pr(1-CN) | C(=O)OCH$_2$CCl$_3$ | Cl | Me | O |
| C-8703 | Me | CH$_2$CH$_2$ | H | c-Pr(1-CN) | C(=O)OCH$_2$CCl$_3$ | Cl | Me | O |
| C-8704 | H | single bond | Me | c-Pr(1-CN) | C(=O)OCH$_2$CCl$_3$ | Me | Me | O |
| C-8705 | Me | single bond | H | c-Pr(1-CN) | C(=O)OCH$_2$CCl$_3$ | Me | Me | O |
| C-8706 | Me(R) | single bond | H | c-Pr(1-CN) | C(=O)OCH$_2$CCl$_3$ | Me | Me | O |
| C-8707 | Me(S) | single bond | H | c-Pr(1-CN) | C(=O)OCH$_2$CCl$_3$ | Me | Me | O |
| C-8708 | H | CH$_2$ | Me | c-Pr(1-CN) | C(=O)OCH$_2$CCl$_3$ | Me | Me | O |
| C-8709 | Me | CH$_2$ | H | c-Pr(1-CN) | C(=O)OCH$_2$CCl$_3$ | Me | Me | O |
| C-8710 | H | CH(Me) | H | c-Pr(1-CN) | C(=O)OCH$_2$CCl$_3$ | Me | Me | O |
| C-8711 | H | CH$_2$CH$_2$ | Me | c-Pr(1-CN) | C(=O)OCH$_2$CCl$_3$ | Me | Me | O |
| C-8712 | Me | CH$_2$CH$_2$ | H | c-Pr(1-CN) | C(=O)OCH$_2$CCl$_3$ | Me | Me | O |
| C-8713 | H | single bond | Me | c-Pr(1-CN) | C(=O)N(Me)$_2$ | Cl | Me | O |
| C-8714 | Me | single bond | H | c-Pr(1-CN) | C(=O)N(Me)$_2$ | Cl | Me | O |
| C-8715 | Me(R) | single bond | H | c-Pr(1-CN) | C(=O)N(Me)$_2$ | Cl | Me | O |
| C-8716 | Me(S) | single bond | H | c-Pr(1-CN) | C(=O)N(Me)$_2$ | Cl | Me | O |
| C-8717 | H | CH$_2$ | Me | c-Pr(1-CN) | C(=O)N(Me)$_2$ | Cl | Me | O |
| C-8718 | Me | CH$_2$ | H | c-Pr(1-CN) | C(=O)N(Me)$_2$ | Cl | Me | O |

TABLE 426

| Compound Number | Y | W | Z | $R^1$ | $R^2$ | $R^3$ | $R^{10}$ | A |
|---|---|---|---|---|---|---|---|---|
| C-8719 | H | CH(Me) | H | c-Pr(1-CN) | C(=O)N(Me)$_2$ | Cl | Me | O |
| C-8720 | H | CH$_2$CH$_2$ | Me | c-Pr(1-CN) | C(=O)N(Me)$_2$ | Cl | Me | O |
| C-8721 | Me | CH$_2$CH$_2$ | H | c-Pr(1-CN) | C(=O)N(Me)$_2$ | Cl | Me | O |
| C-8722 | H | single bond | Me | c-Pr(1-CN) | C(=O)N(Me)$_2$ | Me | Me | O |
| C-8723 | Me | single bond | H | c-Pr(1-CN) | C(=O)N(Me)$_2$ | Me | Me | O |
| C-8724 | Me(R) | single bond | H | c-Pr(1-CN) | C(=O)N(Me)$_2$ | Me | Me | O |
| C-8725 | Me(S) | single bond | H | c-Pr(1-CN) | C(=O)N(Me)$_2$ | Me | Me | O |
| C-8726 | H | CH$_2$ | Me | c-Pr(1-CN) | C(=O)N(Me)$_2$ | Me | Me | O |
| C-8727 | Me | CH$_2$ | H | c-Pr(1-CN) | C(=O)N(Me)$_2$ | Me | Me | O |
| C-8728 | H | CH(Me) | H | c-Pr(1-CN) | C(=O)N(Me)$_2$ | Me | Me | O |
| C-8729 | H | CH$_2$CH$_2$ | Me | c-Pr(1-CN) | C(=O)N(Me)$_2$ | Me | Me | O |
| C-8730 | Me | CH$_2$CH$_2$ | H | c-Pr(1-CN) | C(=O)N(Me)$_2$ | Me | Me | O |
| C-8731 | H | single bond | Me | c-Pr(1-CN) | CH$_2$OC(=O)Me | Cl | Me | O |
| C-8732 | Me | single bond | H | c-Pr(1-CN) | CH$_2$OC(=O)Me | Cl | Me | O |
| C-8733 | Me(R) | single bond | H | c-Pr(1-CN) | CH$_2$OC(=O)Me | Cl | Me | O |
| C-8734 | Me(S) | single bond | H | c-Pr(1-CN) | CH$_2$OC(=O)Me | Cl | Me | O |
| C-8735 | H | CH$_2$ | Me | c-Pr(1-CN) | CH$_2$OC(=O)Me | Cl | Me | O |
| C-8736 | Me | CH$_2$ | H | c-Pr(1-CN) | CH$_2$OC(=O)Me | Cl | Me | O |
| C-8737 | H | CH(Me) | H | c-Pr(1-CN) | CH$_2$OC(=O)Me | Cl | Me | O |
| C-8738 | H | CH$_2$CH$_2$ | Me | c-Pr(1-CN) | CH$_2$OC(=O)Me | Cl | Me | O |
| C-8739 | Me | CH$_2$CH$_2$ | H | c-Pr(1-CN) | CH$_2$OC(=O)Me | Cl | Me | O |
| C-8740 | H | single bond | Me | c-Pr(1-CN) | CH$_2$OC(=O)Me | Me | Me | O |
| C-8741 | Me | single bond | H | c-Pr(1-CN) | CH$_2$OC(=O)Me | Me | Me | O |
| C-8742 | Me(R) | single bond | H | c-Pr(1-CN) | CH$_2$OC(=O)Me | Me | Me | O |
| C-8743 | Me(S) | single bond | H | c-Pr(1-CN) | CH$_2$OC(=O)Me | Me | Me | O |
| C-8744 | H | CH$_2$ | Me | c-Pr(1-CN) | CH$_2$OC(=O)Me | Me | Me | O |

TABLE 426-continued

| Compound Number | Y | W | Z | $R^1$ | $R^2$ | $R^3$ | $R^{10}$ | A |
|---|---|---|---|---|---|---|---|---|
| C-8745 | Me | $CH_2$ | H | c-Pr(1-CN) | $CH_2OC({=}O)Me$ | Me | Me | O |
| C-8746 | H | CH(Me) | H | c-Pr(1-CN) | $CH_2OC({=}O)Me$ | Me | Me | O |
| C-8747 | H | $CH_2CH_2$ | Me | c-Pr(1-CN) | $CH_2OC({=}O)Me$ | Me | Me | O |
| C-8748 | Me | $CH_2CH_2$ | H | c-Pr(1-CN) | $CH_2OC({=}O)Me$ | Me | Me | O |
| C-8749 | H | single bond | Me | c-Pr(1-CN) | $CH_2OC({=}O)$(i-Pr) | Cl | Me | O |
| C-8750 | Me | single bond | H | c-Pr(1-CN) | $CH_2OC({=}O)$(i-Pr) | Cl | Me | O |
| C-8751 | Me(R) | single bond | H | c-Pr(1-CN) | $CH_2OC({=}O)$(i-Pr) | Cl | Me | O |
| C-8752 | Me(S) | single bond | H | c-Pr(1-CN) | $CH_2OC({=}O)$(i-Pr) | Cl | Me | O |
| C-8753 | H | $CH_2$ | Me | c-Pr(1-CN) | $CH_2OC({=}O)$(i-Pr) | Cl | Me | O |
| C-8754 | Me | $CH_2$ | H | c-Pr(1-CN) | $CH_2OC({=}O)$(i-Pr) | Cl | Me | O |
| C-8755 | H | CH(Me) | H | c-Pr(1-CN) | $CH_2OC({=}O)$(i-Pr) | Cl | Me | O |
| C-8756 | H | $CH_2CH_2$ | Me | c-Pr(1-CN) | $CH_2OC({=}O)$(i-Pr) | Cl | Me | O |
| C-8757 | Me | $CH_2CH_2$ | H | c-Pr(1-CN) | $CH_2OC({=}O)$(i-Pr) | Cl | Me | O |
| C-8758 | H | single bond | Me | c-Pr(1-CN) | $CH_2OC({=}O)$(i-Pr) | Me | Me | O |
| C-8759 | Me | single bond | H | c-Pr(1-CN) | $CH_2OC({=}O)$(i-Pr) | Me | Me | O |
| C-8760 | Me(R) | single bond | H | c-Pr(1-CN) | $CH_2OC({=}O)$(i-Pr) | Me | Me | O |
| C-8761 | Me(S) | single bond | H | c-Pr(1-CN) | $CH_2OC({=}O)$(i-Pr) | Me | Me | O |
| C-8762 | H | $CH_2$ | Me | c-Pr(1-CN) | $CH_2OC({=}O)$(i-Pr) | Me | Me | O |

TABLE 427

| Compound Number | Y | W | Z | $R^1$ | $R^2$ | $R^3$ | $R^{10}$ | A |
|---|---|---|---|---|---|---|---|---|
| C-8763 | Me | $CH_2$ | H | c-Pr(1-CN) | $CH_2OC({=}O)$(i-Pr) | Me | Me | O |
| C-8764 | H | CH(Me) | H | c-Pr(1-CN) | $CH_2OC({=}O)$(i-Pr) | Me | Me | O |
| C-8765 | H | $CH_2CH_2$ | Me | c-Pr(1-CN) | $CH_2OC({=}O)$(i-Pr) | Me | Me | O |
| C-8766 | Me | $CH_2CH_2$ | H | c-Pr(1-CN) | $CH_2OC({=}O)$(i-Pr) | Me | Me | O |
| C-8767 | H | single bond | Me | c-Pr(1-CN) | $CH_2OC({=}O)$(t-Bu) | Cl | Me | O |
| C-8768 | Me | single bond | H | c-Pr(1-CN) | $CH_2OC({=}O)$(t-Bu) | Cl | Me | O |
| C-8769 | Me(R) | single bond | H | c-Pr(1-CN) | $CH_2OC({=}O)$(t-Bu) | Cl | Me | O |
| C-8770 | Me(S) | single bond | H | c-Pr(1-CN) | $CH_2OC({=}O)$(t-Bu) | Cl | Me | O |
| C-8771 | H | $CH_2$ | Me | c-Pr(1-CN) | $CH_2OC({=}O)$(t-Bu) | Cl | Me | O |
| C-8772 | Me | $CH_2$ | H | c-Pr(1-CN) | $CH_2OC({=}O)$(t-Bu) | Cl | Me | O |
| C-8773 | H | CH(Me) | H | c-Pr(1-CN) | $CH_2OC({=}O)$(t-Bu) | Cl | Me | O |
| C-8774 | H | $CH_2CH_2$ | Me | c-Pr(1-CN) | $CH_2OC({=}O)$(t-Bu) | Cl | Me | O |
| C-8775 | Me | $CH_2CH_2$ | H | c-Pr(1-CN) | $CH_2OC({=}O)$(t-Bu) | Cl | Me | O |
| C-8776 | H | single bond | Me | c-Pr(1-CN) | $CH_2OC({=}O)$(t-Bu) | Me | Me | O |
| C-8777 | Me | single bond | H | c-Pr(1-CN) | $CH_2OC({=}O)$(t-Bu) | Me | Me | O |
| C-8778 | Me(R) | single bond | H | c-Pr(1-CN) | $CH_2OC({=}O)$(t-Bu) | Me | Me | O |
| C-8779 | Me(S) | single bond | H | c-Pr(1-CN) | $CH_2OC({=}O)$(t-Bu) | Me | Me | O |
| C-8780 | H | $CH_2$ | Me | c-Pr(1-CN) | $CH_2OC({=}O)$(t-Bu) | Me | Me | O |
| C-8781 | Me | $CH_2$ | H | c-Pr(1-CN) | $CH_2OC({=}O)$(t-Bu) | Me | Me | O |
| C-8782 | H | CH(Me) | H | c-Pr(1-CN) | $CH_2OC({=}O)$(t-Bu) | Me | Me | O |
| C-8783 | H | $CH_2CH_2$ | Me | c-Pr(1-CN) | $CH_2OC({=}O)$(t-Bu) | Me | Me | O |
| C-8784 | Me | $CH_2CH_2$ | H | c-Pr(1-CN) | $CH_2OC({=}O)$(t-Bu) | Me | Me | O |
| C-8785 | H | single bond | Me | c-Pr(1-CN) | $CH_2OC({=}O)OEt$ | Cl | Me | O |
| C-8786 | Me | single bond | H | c-Pr(1-CN) | $CH_2OC({=}O)OEt$ | Cl | Me | O |
| C-8787 | Me(R) | single bond | H | c-Pr(1-CN) | $CH_2OC({=}O)OEt$ | Cl | Me | O |
| C-8788 | Me(S) | single bond | H | c-Pr(1-CN) | $CH_2OC({=}O)OEt$ | Cl | Me | O |
| C-8789 | H | $CH_2$ | Me | c-Pr(1-CN) | $CH_2OC({=}O)OEt$ | Cl | Me | O |
| C-8790 | Me | $CH_2$ | H | c-Pr(1-CN) | $CH_2OC({=}O)OEt$ | Cl | Me | O |
| C-8791 | H | CH(Me) | H | c-Pr(1-CN) | $CH_2OC({=}O)OEt$ | Cl | Me | O |
| C-8792 | H | $CH_2CH_2$ | Me | c-Pr(1-CN) | $CH_2OC({=}O)OEt$ | Cl | Me | O |
| C-8793 | Me | $CH_2CH_2$ | H | c-Pr(1-CN) | $CH_2OC({=}O)OEt$ | Cl | Me | O |
| C-8794 | H | single bond | Me | c-Pr(1-CN) | $CH_2OC({=}O)OEt$ | Me | Me | O |
| C-8795 | Me | single bond | H | c-Pr(1-CN) | $CH_2OC({=}O)OEt$ | Me | Me | O |
| C-8796 | Me(R) | single bond | H | c-Pr(1-CN) | $CH_2OC({=}O)OEt$ | Me | Me | O |
| C-8797 | Me(S) | single bond | H | c-Pr(1-CN) | $CH_2OC({=}O)OEt$ | Me | Me | O |
| C-8798 | H | $CH_2$ | Me | c-Pr(1-CN) | $CH_2OC({=}O)OEt$ | Me | Me | O |
| C-8799 | Me | $CH_2$ | H | c-Pr(1-CN) | $CH_2OC({=}O)OEt$ | Me | Me | O |
| C-8800 | H | CH(Me) | H | c-Pr(1-CN) | $CH_2OC({=}O)OEt$ | Me | Me | O |
| C-8801 | H | $CH_2CH_2$ | Me | c-Pr(1-CN) | $CH_2OC({=}O)OEt$ | Me | Me | O |
| C-8802 | Me | $CH_2CH_2$ | H | c-Pr(1-CN) | $CH_2OC({=}O)OEt$ | Me | Me | O |
| C-8803 | H | single bond | Me | c-Pr(1-CN) | $CH_2OC({=}O)O$(i-Pr) | Cl | Me | O |
| C-8804 | Me | single bond | H | c-Pr(1-CN) | $CH_2OC({=}O)O$(i-Pr) | Cl | Me | O |
| C-8805 | Me(R) | single bond | H | c-Pr(1-CN) | $CH_2OC({=}O)O$(i-Pr) | Cl | Me | O |
| C-8806 | Me(S) | single bond | H | c-Pr(1-CN) | $CH_2OC({=}O)O$(i-Pr) | Cl | Me | O |

TABLE 428

| Compound Number | Y | W | Z | $R^1$ | $R^2$ | $R^3$ | $R^{10}$ | A |
|---|---|---|---|---|---|---|---|---|
| C-8807 | H | $CH_2$ | Me | c-Pr(1-CN) | $CH_2OC(=O)O(i\text{-}Pr)$ | Cl | Me | O |
| C-8808 | Me | $CH_2$ | H | c-Pr(1-CN) | $CH_2OC(=O)O(i\text{-}Pr)$ | Cl | Me | O |
| C-8809 | H | CH(Me) | H | c-Pr(1-CN) | $CH_2OC(=O)O(i\text{-}Pr)$ | Cl | Me | O |
| C-8810 | H | $CH_2CH_2$ | Me | c-Pr(1-CN) | $CH_2OC(=O)O(i\text{-}Pr)$ | Cl | Me | O |
| C-8811 | Me | $CH_2CH_2$ | H | c-Pr(1-CN) | $CH_2OC(=O)O(i\text{-}Pr)$ | Cl | Me | O |
| C-8812 | H | single bond | Me | c-Pr(1-CN) | $CH_2OC(=O)O(i\text{-}Pr)$ | Me | Me | O |
| C-8813 | Me | single bond | H | c-Pr(1-CN) | $CH_2OC(=O)O(i\text{-}Pr)$ | Me | Me | O |
| C-8814 | Me(R) | single bond | H | c-Pr(1-CN) | $CH_2OC(=O)O(i\text{-}Pr)$ | Me | Me | O |
| C-8815 | Me(S) | single bond | H | c-Pr(1-CN) | $CH_2OC(=O)O(i\text{-}Pr)$ | Me | Me | O |
| C-8816 | H | $CH_2$ | Me | c-Pr(1-CN) | $CH_2OC(=O)O(i\text{-}Pr)$ | Me | Me | O |
| C-8817 | Me | $CH_2$ | H | c-Pr(1-CN) | $CH_2OC(=O)O(i\text{-}Pr)$ | Me | Me | O |
| C-8818 | H | CH(Me) | H | c-Pr(1-CN) | $CH_2OC(=O)O(i\text{-}Pr)$ | Me | Me | O |
| C-8819 | H | $CH_2CH_2$ | Me | c-Pr(1-CN) | $CH_2OC(=O)O(i\text{-}Pr)$ | Me | Me | O |
| C-8820 | Me | $CH_2CH_2$ | H | c-Pr(1-CN) | $CH_2OC(=O)O(i\text{-}Pr)$ | Me | Me | O |
| C-8821 | H | single bond | Me | c-Pr(1-CN) | $CH_2N(Me)C(=O)OMe$ | Cl | Me | O |
| C-8822 | Me | single bond | H | c-Pr(1-CN) | $CH_2N(Me)C(=O)OMe$ | Cl | Me | O |
| C-8823 | Me(R) | single bond | H | c-Pr(1-CN) | $CH_2N(Me)C(=O)OMe$ | Cl | Me | O |
| C-8824 | Me(S) | single bond | H | c-Pr(1-CN) | $CH_2N(Me)C(=O)OMe$ | Cl | Me | O |
| C-8825 | H | $CH_2$ | Me | c-Pr(1-CN) | $CH_2N(Me)C(=O)OMe$ | Cl | Me | O |
| C-8826 | Me | $CH_2$ | H | c-Pr(1-CN) | $CH_2N(Me)C(=O)OMe$ | Cl | Me | O |
| C-8827 | H | CH(Me) | H | c-Pr(1-CN) | $CH_2N(Me)C(=O)OMe$ | Cl | Me | O |
| C-8828 | H | $CH_2CH_2$ | Me | c-Pr(1-CN) | $CH_2N(Me)C(=O)OMe$ | Cl | Me | O |
| C-8829 | Me | $CH_2CH_2$ | H | c-Pr(1-CN) | $CH_2N(Me)C(=O)OMe$ | Cl | Me | O |
| C-8830 | H | single bond | Me | c-Pr(1-CN) | $CH_2N(Me)C(=O)OMe$ | Me | Me | O |
| C-8831 | Me | single bond | H | c-Pr(1-CN) | $CH_2N(Me)C(=O)OMe$ | Me | Me | O |
| C-8832 | Me(R) | single bond | H | c-Pr(1-CN) | $CH_2N(Me)C(=O)OMe$ | Me | Me | O |
| C-8833 | Me(S) | single bond | H | c-Pr(1-CN) | $CH_2N(Me)C(=O)OMe$ | Me | Me | O |
| C-8834 | H | $CH_2$ | Me | c-Pr(1-CN) | $CH_2N(Me)C(=O)OMe$ | Me | Me | O |
| C-8835 | Me | $CH_2$ | H | c-Pr(1-CN) | $CH_2N(Me)C(=O)OMe$ | Me | Me | O |
| C-8836 | H | CH(Me) | H | c-Pr(1-CN) | $CH_2N(Me)C(=O)OMe$ | Me | Me | O |
| C-8837 | H | $CH_2CH_2$ | Me | c-Pr(1-CN) | $CH_2N(Me)C(=O)OMe$ | Me | Me | O |
| C-8838 | Me | $CH_2CH_2$ | H | c-Pr(1-CN) | $CH_2N(Me)C(=O)OMe$ | Me | Me | O |
| C-8839 | H | single bond | Me | c-Pr(1-CN) | $C(=O)OCH_2CH=CH_2$ | Cl | $CH_2OMe$ | O |
| C-8840 | Me | single bond | H | c-Pr(1-CN) | $C(=O)OCH_2CH=CH_2$ | Cl | $CH_2OMe$ | O |
| C-8841 | Me(R) | single bond | H | c-Pr(1-CN) | $C(=O)OCH_2CH=CH_2$ | Cl | $CH_2OMe$ | O |
| C-8842 | Me(S) | single bond | H | c-Pr(1-CN) | $C(=O)OCH_2CH=CH_2$ | Cl | $CH_2OMe$ | O |
| C-8843 | H | $CH_2$ | Me | c-Pr(1-CN) | $C(=O)OCH_2CH=CH_2$ | Cl | $CH_2OMe$ | O |
| C-8844 | Me | $CH_2$ | H | c-Pr(1-CN) | $C(=O)OCH_2CH=CH_2$ | Cl | $CH_2OMe$ | O |
| C-8845 | H | CH(Me) | H | c-Pr(1-CN) | $C(=O)OCH_2CH=CH_2$ | Cl | $CH_2OMe$ | O |
| C-8846 | H | $CH_2CH_2$ | Me | c-Pr(1-CN) | $C(=O)OCH_2CH=CH_2$ | Cl | $CH_2OMe$ | O |
| C-8847 | Me | $CH_2CH_2$ | H | c-Pr(1-CN) | $C(=O)OCH_2CH=CH_2$ | Cl | $CH_2OMe$ | O |
| C-8848 | H | single bond | Me | c-Pr(1-CN) | $C(=O)OCH_2CH=CH_2$ | Me | $CH_2OMe$ | O |
| C-8849 | Me | single bond | H | c-Pr(1-CN) | $C(=O)OCH_2CH=CH_2$ | Me | $CH_2OMe$ | O |
| C-8850 | Me(R) | single bond | H | c-Pr(1-CN) | $C(=O)OCH_2CH=CH_2$ | Me | $CH_2OMe$ | O |

TABLE 429

| Compound Number | Y | W | Z | $R^1$ | $R^2$ | $R^3$ | $R^{10}$ | A |
|---|---|---|---|---|---|---|---|---|
| C-8851 | Me(S) | single bond | H | c-Pr(1-CN) | $C(=O)OCH_2CH=CH_2$ | Me | $CH_2OMe$ | O |
| C-8852 | H | $CH_2$ | Me | c-Pr(1-CN) | $C(=O)OCH_2CH=CH_2$ | Me | $CH_2OMe$ | O |
| C-8853 | Me | $CH_2$ | H | c-Pr(1-CN) | $C(=O)OCH_2CH=CH_2$ | Me | $CH_2OMe$ | O |
| C-8854 | H | CH(Me) | H | c-Pr(1-CN) | $C(=O)OCH_2CH=CH_2$ | Me | $CH_2OMe$ | O |
| C-8855 | H | $CH_2CH_2$ | Me | c-Pr(1-CN) | $C(=O)OCH_2CH=CH_2$ | Me | $CH_2OMe$ | O |
| C-8856 | Me | $CH_2CH_2$ | H | c-Pr(1-CN) | $C(=O)OCH_2CH=CH_2$ | Me | $CH_2OMe$ | O |
| C-8857 | H | single bond | Me | c-Pr(1-CN) | $C(=O)OCH_2CCl_3$ | Cl | $CH_2OMe$ | O |
| C-8858 | Me | single bond | H | c-Pr(1-CN) | $C(=O)OCH_2CCl_3$ | Cl | $CH_2OMe$ | O |
| C-8859 | Me(R) | single bond | H | c-Pr(1-CN) | $C(=O)OCH_2CCl_3$ | Cl | $CH_2OMe$ | O |
| C-8860 | Me(S) | single bond | H | c-Pr(1-CN) | $C(=O)OCH_2CCl_3$ | Cl | $CH_2OMe$ | O |
| C-8861 | H | $CH_2$ | Me | c-Pr(1-CN) | $C(=O)OCH_2CCl_3$ | Cl | $CH_2OMe$ | O |
| C-8862 | Me | $CH_2$ | H | c-Pr(1-CN) | $C(=O)OCH_2CCl_3$ | Cl | $CH_2OMe$ | O |
| C-8863 | H | CH(Me) | H | c-Pr(1-CN) | $C(=O)OCH_2CCl_3$ | Cl | $CH_2OMe$ | O |
| C-8864 | H | $CH_2CH_2$ | Me | c-Pr(1-CN) | $C(=O)OCH_2CCl_3$ | Cl | $CH_2OMe$ | O |
| C-8865 | Me | $CH_2CH_2$ | H | c-Pr(1-CN) | $C(=O)OCH_2CCl_3$ | Cl | $CH_2OMe$ | O |
| C-8866 | H | single bond | Me | c-Pr(1-CN) | $C(=O)OCH_2CCl_3$ | Me | $CH_2OMe$ | O |
| C-8867 | Me | single bond | H | c-Pr(1-CN) | $C(=O)OCH_2CCl_3$ | Me | $CH_2OMe$ | O |
| C-8868 | Me(R) | single bond | H | c-Pr(1-CN) | $C(=O)OCH_2CCl_3$ | Me | $CH_2OMe$ | O |
| C-8869 | Me(S) | single bond | H | c-Pr(1-CN) | $C(=O)OCH_2CCl_3$ | Me | $CH_2OMe$ | O |
| C-8870 | H | $CH_2$ | Me | c-Pr(1-CN) | $C(=O)OCH_2CCl_3$ | Me | $CH_2OMe$ | O |
| C-8871 | Me | $CH_2$ | H | c-Pr(1-CN) | $C(=O)OCH_2CCl_3$ | Me | $CH_2OMe$ | O |
| C-8872 | H | CH(Me) | H | c-Pr(1-CN) | $C(=O)OCH_2CCl_3$ | Me | $CH_2OMe$ | O |
| C-8873 | H | $CH_2CH_2$ | Me | c-Pr(1-CN) | $C(=O)OCH_2CCl_3$ | Me | $CH_2OMe$ | O |

TABLE 429-continued

| Compound Number | Y | W | Z | $R^1$ | $R^2$ | $R^3$ | $R^{10}$ | A |
|---|---|---|---|---|---|---|---|---|
| C-8874 | Me | $CH_2CH_2$ | H | c-Pr(1-CN) | C(═O)OCH$_2$CCl$_3$ | Me | $CH_2OMe$ | O |
| C-8875 | H | single bond | Me | c-Pr(1-CN) | C(═O)N(Me)$_2$ | Cl | $CH_2OMe$ | O |
| C-8876 | Me | single bond | H | c-Pr(1-CN) | C(═O)N(Me)$_2$ | Cl | $CH_2OMe$ | O |
| C-8877 | Me(R) | single bond | H | c-Pr(1-CN) | C(═O)N(Me)$_2$ | Cl | $CH_2OMe$ | O |
| C-8878 | Me(S) | single bond | H | c-Pr(1-CN) | C(═O)N(Me)$_2$ | Cl | $CH_2OMe$ | O |
| C-8879 | H | $CH_2$ | Me | c-Pr(1-CN) | C(═O)N(Me)$_2$ | Cl | $CH_2OMe$ | O |
| C-8880 | Me | $CH_2$ | H | c-Pr(1-CN) | C(═O)N(Me)$_2$ | Cl | $CH_2OMe$ | O |
| C-8881 | H | CH(Me) | H | c-Pr(1-CN) | C(═O)N(Me)$_2$ | Cl | $CH_2OMe$ | O |
| C-8882 | H | $CH_2CH_2$ | Me | c-Pr(1-CN) | C(═O)N(Me)$_2$ | Cl | $CH_2OMe$ | O |
| C-8883 | Me | $CH_2CH_2$ | H | c-Pr(1-CN) | C(═O)N(Me)$_2$ | Cl | $CH_2OMe$ | O |
| C-8884 | H | single bond | Me | c-Pr(1-CN) | C(═O)N(Me)$_2$ | Me | $CH_2OMe$ | O |
| C-8885 | Me | single bond | H | c-Pr(1-CN) | C(═O)N(Me)$_2$ | Me | $CH_2OMe$ | O |
| C-8886 | Me(R) | single bond | H | c-Pr(1-CN) | C(═O)N(Me)$_2$ | Me | $CH_2OMe$ | O |
| C-8887 | Me(S) | single bond | H | c-Pr(1-CN) | C(═O)N(Me)$_2$ | Me | $CH_2OMe$ | O |
| C-8888 | H | $CH_2$ | Me | c-Pr(1-CN) | C(═O)N(Me)$_2$ | Me | $CH_2OMe$ | O |
| C-8889 | Me | $CH_2$ | H | c-Pr(1-CN) | C(═O)N(Me)$_2$ | Me | $CH_2OMe$ | O |
| C-8890 | H | CH(Me) | H | c-Pr(1-CN) | C(═O)N(Me)$_2$ | Me | $CH_2OMe$ | O |
| C-8891 | H | $CH_2CH_2$ | Me | c-Pr(1-CN) | C(═O)N(Me)$_2$ | Me | $CH_2OMe$ | O |
| C-8892 | Me | $CH_2CH_2$ | H | c-Pr(1-CN) | C(═O)N(Me)$_2$ | Me | $CH_2OMe$ | O |
| C-8893 | H | single bond | Me | c-Pr(1-CN) | $CH_2$OC(═O)Me | Cl | $CH_2OMe$ | O |
| C-8894 | Me | single bond | H | c-Pr(1-CN) | $CH_2$OC(═O)Me | Cl | $CH_2OMe$ | O |

TABLE 430

| Compound Number | Y | W | Z | $R^1$ | $R^2$ | $R^3$ | $R^{10}$ | A |
|---|---|---|---|---|---|---|---|---|
| C-8895 | Me(R) | single bond | H | c-Pr(1-CN) | $CH_2$OC(═O)Me | Cl | $CH_2OMe$ | O |
| C-8896 | Me(S) | single bond | H | c-Pr(1-CN) | $CH_2$OC(═O)Me | Cl | $CH_2OMe$ | O |
| C-8897 | H | $CH_2$ | Me | c-Pr(1-CN) | $CH_2$OC(═O)Me | Cl | $CH_2OMe$ | O |
| C-8898 | Me | $CH_2$ | H | c-Pr(1-CN) | $CH_2$OC(═O)Me | Cl | $CH_2OMe$ | O |
| C-8899 | H | CH(Me) | H | c-Pr(1-CN) | $CH_2$OC(═O)Me | Cl | $CH_2OMe$ | O |
| C-8900 | H | $CH_2CH_2$ | Me | c-Pr(1-CN) | $CH_2$OC(═O)Me | Cl | $CH_2OMe$ | O |
| C-8901 | Me | $CH_2CH_2$ | H | c-Pr(1-CN) | $CH_2$OC(═O)Me | Cl | $CH_2OMe$ | O |
| C-8902 | H | single bond | Me | c-Pr(1-CN) | $CH_2$OC(═O)Me | Me | $CH_2OMe$ | O |
| C-8903 | Me | single bond | H | c-Pr(1-CN) | $CH_2$OC(═O)Me | Me | $CH_2OMe$ | O |
| C-8904 | Me(R) | single bond | H | c-Pr(1-CN) | $CH_2$OC(═O)Me | Me | $CH_2OMe$ | O |
| C-8905 | Me(S) | single bond | H | c-Pr(1-CN) | $CH_2$OC(═O)Me | Me | $CH_2OMe$ | O |
| C-8906 | H | $CH_2$ | Me | c-Pr(1-CN) | $CH_2$OC(═O)Me | Me | $CH_2OMe$ | O |
| C-8907 | Me | $CH_2$ | H | c-Pr(1-CN) | $CH_2$OC(═O)Me | Me | $CH_2OMe$ | O |
| C-8908 | H | CH(Me) | H | c-Pr(1-CN) | $CH_2$OC(═O)Me | Me | $CH_2OMe$ | O |
| C-8909 | H | $CH_2CH_2$ | Me | c-Pr(1-CN) | $CH_2$OC(═O)Me | Me | $CH_2OMe$ | O |
| C-8910 | Me | $CH_2CH_2$ | H | c-Pr(1-CN) | $CH_2$OC(═O)Me | Me | $CH_2OMe$ | O |
| C-8911 | H | single bond | Me | c-Pr(1-CN) | $CH_2$OC(═O)(i-Pr) | Cl | $CH_2OMe$ | O |
| C-8912 | Me | single bond | H | c-Pr(1-CN) | $CH_2$OC(═O)(i-Pr) | Cl | $CH_2OMe$ | O |
| C-8913 | Me(R) | single bond | H | c-Pr(1-CN) | $CH_2$OC(═O)(i-Pr) | Cl | $CH_2OMe$ | O |
| C-8914 | Me(S) | single bond | H | c-Pr(1-CN) | $CH_2$OC(═O)(i-Pr) | Cl | $CH_2OMe$ | O |
| C-8915 | H | $CH_2$ | Me | c-Pr(1-CN) | $CH_2$OC(═O)(i-Pr) | Cl | $CH_2OMe$ | O |
| C-8916 | Me | $CH_2$ | H | c-Pr(1-CN) | $CH_2$OC(═O)(i-Pr) | Cl | $CH_2OMe$ | O |
| C-8917 | H | CH(Me) | H | c-Pr(1-CN) | $CH_2$OC(═O)(i-Pr) | Cl | $CH_2OMe$ | O |
| C-8918 | H | $CH_2CH_2$ | Me | c-Pr(1-CN) | $CH_2$OC(═O)(i-Pr) | Cl | $CH_2OMe$ | O |
| C-8919 | Me | $CH_2CH_2$ | H | c-Pr(1-CN) | $CH_2$OC(═O)(i-Pr) | Cl | $CH_2OMe$ | O |
| C-8920 | H | single bond | Me | c-Pr(1-CN) | $CH_2$OC(═O)(i-Pr) | Me | $CH_2OMe$ | O |
| C-8921 | Me | single bond | H | c-Pr(1-CN) | $CH_2$OC(═O)(i-Pr) | Me | $CH_2OMe$ | O |
| C-8922 | Me(R) | single bond | H | c-Pr(1-CN) | $CH_2$OC(═O)(i-Pr) | Me | $CH_2OMe$ | O |
| C-8923 | Me(S) | single bond | H | c-Pr(1-CN) | $CH_2$OC(═O)(i-Pr) | Me | $CH_2OMe$ | O |
| C-8924 | H | $CH_2$ | Me | c-Pr(1-CN) | $CH_2$OC(═O)(i-Pr) | Me | $CH_2OMe$ | O |
| C-8925 | Me | $CH_2$ | H | c-Pr(1-CN) | $CH_2$OC(═O)(i-Pr) | Me | $CH_2OMe$ | O |
| C-8926 | H | CH(Me) | H | c-Pr(1-CN) | $CH_2$OC(═O)(i-Pr) | Me | $CH_2OMe$ | O |
| C-8927 | H | $CH_2CH_2$ | Me | c-Pr(1-CN) | $CH_2$OC(═O)(i-Pr) | Me | $CH_2OMe$ | O |
| C-8928 | Me | $CH_2CH_2$ | H | c-Pr(1-CN) | $CH_2$OC(═O)(i-Pr) | Me | $CH_2OMe$ | O |
| C-8929 | H | single bond | Me | c-Pr(1-CN) | $CH_2$OC(═O)(t-Bu) | Cl | $CH_2OMe$ | O |
| C-8930 | Me | single bond | H | c-Pr(1-CN) | $CH_2$OC(═O)(t-Bu) | Cl | $CH_2OMe$ | O |
| C-8931 | Me(R) | single bond | H | c-Pr(1-CN) | $CH_2$OC(═O)(t-Bu) | Cl | $CH_2OMe$ | O |
| C-8932 | Me(S) | single bond | H | c-Pr(1-CN) | $CH_2$OC(═O)(t-Bu) | Cl | $CH_2OMe$ | O |
| C-8933 | H | $CH_2$ | Me | c-Pr(1-CN) | $CH_2$OC(═O)(t-Bu) | Cl | $CH_2OMe$ | O |
| C-8934 | Me | $CH_2$ | H | c-Pr(1-CN) | $CH_2$OC(═O)(t-Bu) | Cl | $CH_2OMe$ | O |
| C-8935 | H | CH(Me) | H | c-Pr(1-CN) | $CH_2$OC(═O)(t-Bu) | Cl | $CH_2OMe$ | O |
| C-8936 | H | $CH_2CH_2$ | Me | c-Pr(1-CN) | $CH_2$OC(═O)(t-Bu) | Cl | $CH_2OMe$ | O |
| C-8937 | Me | $CH_2CH_2$ | H | c-Pr(1-CN) | $CH_2$OC(═O)(t-Bu) | Cl | $CH_2OMe$ | O |
| C-8938 | H | single bond | Me | c-Pr(1-CN) | $CH_2$OC(═O)(t-Bu) | Me | $CH_2OMe$ | O |

TABLE 431

| Compound Number | Y | W | Z | $R^1$ | $R^2$ | $R^3$ | $R^{10}$ | A |
|---|---|---|---|---|---|---|---|---|
| C-8939 | Me | single bond | H | c-Pr(1-CN) | $CH_2OC(=O)(t\text{-}Bu)$ | Me | $CH_2OMe$ | O |
| C-8940 | Me(R) | single bond | H | c-Pr(1-CN) | $CH_2OC(=O)(t\text{-}Bu)$ | Me | $CH_2OMe$ | O |
| C-8941 | Me(S) | single bond | H | c-Pr(1-CN) | $CH_2OC(=O)(t\text{-}Bu)$ | Me | $CH_2OMe$ | O |
| C-8942 | H | $CH_2$ | Me | c-Pr(1-CN) | $CH_2OC(=O)(t\text{-}Bu)$ | Me | $CH_2OMe$ | O |
| C-8943 | Me | $CH_2$ | H | c-Pr(1-CN) | $CH_2OC(=O)(t\text{-}Bu)$ | Me | $CH_2OMe$ | O |
| C-8944 | H | CH(Me) | H | c-Pr(1-CN) | $CH_2OC(=O)(t\text{-}Bu)$ | Me | $CH_2OMe$ | O |
| C-8945 | H | $CH_2CH_2$ | Me | c-Pr(1-CN) | $CH_2OC(=O)(t\text{-}Bu)$ | Me | $CH_2OMe$ | O |
| C-8946 | Me | $CH_2CH_2$ | H | c-Pr(1-CN) | $CH_2OC(=O)(t\text{-}Bu)$ | Me | $CH_2OMe$ | O |
| C-8947 | H | single bond | Me | c-Pr(1-CN) | $CH_2OC(=O)OEt$ | Cl | $CH_2OMe$ | O |
| C-8948 | Me | single bond | H | c-Pr(1-CN) | $CH_2OC(=O)OEt$ | Cl | $CH_2OMe$ | O |
| C-8949 | Me(R) | single bond | H | c-Pr(1-CN) | $CH_2OC(=O)OEt$ | Cl | $CH_2OMe$ | O |
| C-8950 | Me(S) | single bond | H | c-Pr(1-CN) | $CH_2OC(=O)OEt$ | Cl | $CH_2OMe$ | O |
| C-8951 | H | $CH_2$ | Me | c-Pr(1-CN) | $CH_2OC(=O)OEt$ | Cl | $CH_2OMe$ | O |
| C-8952 | Me | $CH_2$ | H | c-Pr(1-CN) | $CH_2OC(=O)OEt$ | Cl | $CH_2OMe$ | O |
| C-8953 | H | CH(Me) | H | c-Pr(1-CN) | $CH_2OC(=O)OEt$ | Cl | $CH_2OMe$ | O |
| C-8954 | H | $CH_2CH_2$ | Me | c-Pr(1-CN) | $CH_2OC(=O)OEt$ | Cl | $CH_2OMe$ | O |
| C-8955 | Me | $CH_2CH_2$ | H | c-Pr(1-CN) | $CH_2OC(=O)OEt$ | Cl | $CH_2OMe$ | O |
| C-8956 | H | single bond | Me | c-Pr(1-CN) | $CH_2OC(=O)OEt$ | Me | $CH_2OMe$ | O |
| C-8957 | Me | single bond | H | c-Pr(1-CN) | $CH_2OC(=O)OEt$ | Me | $CH_2OMe$ | O |
| C-8958 | Me(R) | single bond | H | c-Pr(1-CN) | $CH_2OC(=O)OEt$ | Me | $CH_2OMe$ | O |
| C-8959 | Me(S) | single bond | H | c-Pr(1-CN) | $CH_2OC(=O)OEt$ | Me | $CH_2OMe$ | O |
| C-8960 | H | $CH_2$ | Me | c-Pr(1-CN) | $CH_2OC(=O)OEt$ | Me | $CH_2OMe$ | O |
| C-8961 | Me | $CH_2$ | H | c-Pr(1-CN) | $CH_2OC(=O)OEt$ | Me | $CH_2OMe$ | O |
| C-8962 | H | CH(Me) | H | c-Pr(1-CN) | $CH_2OC(=O)OEt$ | Me | $CH_2OMe$ | O |
| C-8963 | H | $CH_2CH_2$ | Me | c-Pr(1-CN) | $CH_2OC(=O)OEt$ | Me | $CH_2OMe$ | O |
| C-8964 | Me | $CH_2CH_2$ | H | c-Pr(1-CN) | $CH_2OC(=O)OEt$ | Me | $CH_2OMe$ | O |
| C-8965 | H | single bond | Me | c-Pr(1-CN) | $CH_2OC(=O)O(i\text{-}Pr)$ | Cl | $CH_2OMe$ | O |
| C-8966 | Me | single bond | H | c-Pr(1-CN) | $CH_2OC(=O)O(i\text{-}Pr)$ | Cl | $CH_2OMe$ | O |
| C-8967 | Me(R) | single bond | H | c-Pr(1-CN) | $CH_2OC(=O)O(i\text{-}Pr)$ | Cl | $CH_2OMe$ | O |
| C-8968 | Me(S) | single bond | H | c-Pr(1-CN) | $CH_2OC(=O)O(i\text{-}Pr)$ | Cl | $CH_2OMe$ | O |
| C-8969 | H | $CH_2$ | Me | c-Pr(1-CN) | $CH_2OC(=O)O(i\text{-}Pr)$ | Cl | $CH_2OMe$ | O |
| C-8970 | Me | $CH_2$ | H | c-Pr(1-CN) | $CH_2OC(=O)O(i\text{-}Pr)$ | Cl | $CH_2OMe$ | O |
| C-8971 | H | CH(Me) | H | c-Pr(1-CN) | $CH_2OC(=O)O(i\text{-}Pr)$ | Cl | $CH_2OMe$ | O |
| C-8972 | H | $CH_2CH_2$ | Me | c-Pr(1-CN) | $CH_2OC(=O)O(i\text{-}Pr)$ | Cl | $CH_2OMe$ | O |
| C-8973 | Me | $CH_2CH_2$ | H | c-Pr(1-CN) | $CH_2OC(=O)O(i\text{-}Pr)$ | Cl | $CH_2OMe$ | O |
| C-8974 | H | single bond | Me | c-Pr(1-CN) | $CH_2OC(=O)O(i\text{-}Pr)$ | Me | $CH_2OMe$ | O |
| C-8975 | Me | single bond | H | c-Pr(1-CN) | $CH_2OC(=O)O(i\text{-}Pr)$ | Me | $CH_2OMe$ | O |
| C-8976 | Me(R) | single bond | H | c-Pr(1-CN) | $CH_2OC(=O)O(i\text{-}Pr)$ | Me | $CH_2OMe$ | O |
| C-8977 | Me(S) | single bond | H | c-Pr(1-CN) | $CH_2OC(=O)O(i\text{-}Pr)$ | Me | $CH_2OMe$ | O |
| C-8978 | H | $CH_2$ | Me | c-Pr(1-CN) | $CH_2OC(=O)O(i\text{-}Pr)$ | Me | $CH_2OMe$ | O |
| C-8979 | Me | $CH_2$ | H | c-Pr(1-CN) | $CH_2OC(=O)O(i\text{-}Pr)$ | Me | $CH_2OMe$ | O |
| C-8980 | H | CH(Me) | H | c-Pr(1-CN) | $CH_2OC(=O)O(i\text{-}Pr)$ | Me | $CH_2OMe$ | O |
| C-8981 | H | $CH_2CH_2$ | Me | c-Pr(1-CN) | $CH_2OC(=O)O(i\text{-}Pr)$ | Me | $CH_2OMe$ | O |
| C-8982 | Me | $CH_2CH_2$ | H | c-Pr(1-CN) | $CH_2OC(=O)O(i\text{-}Pr)$ | Me | $CH_2OMe$ | O |

TABLE 432

| Compound Number | Y | W | Z | $R^1$ | $R^2$ | $R^3$ | $R^{10}$ | A |
|---|---|---|---|---|---|---|---|---|
| C-8983 | H | single bond | Me | c-Pr(1-CN) | $CH_2N(Me)C(=O)OMe$ | Cl | $CH_2OMe$ | O |
| C-8984 | Me | single bond | H | c-Pr(1-CN) | $CH_2N(Me)C(=O)OMe$ | Cl | $CH_2OMe$ | O |
| C-8985 | Me(R) | single bond | H | c-Pr(1-CN) | $CH_2N(Me)C(=O)OMe$ | Cl | $CH_2OMe$ | O |
| C-8986 | Me(S) | single bond | H | c-Pr(1-CN) | $CH_2N(Me)C(=O)OMe$ | Cl | $CH_2OMe$ | O |
| C-8987 | H | $CH_2$ | Me | c-Pr(1-CN) | $CH_2N(Me)C(=O)OMe$ | Cl | $CH_2OMe$ | O |
| C-8988 | Me | $CH_2$ | H | c-Pr(1-CN) | $CH_2N(Me)C(=O)OMe$ | Cl | $CH_2OMe$ | O |
| C-8989 | H | CH(Me) | H | c-Pr(1-CN) | $CH_2N(Me)C(=O)OMe$ | Cl | $CH_2OMe$ | O |
| C-8990 | H | $CH_2CH_2$ | Me | c-Pr(1-CN) | $CH_2N(Me)C(=O)OMe$ | Cl | $CH_2OMe$ | O |
| C-8991 | Me | $CH_2CH_2$ | H | c-Pr(1-CN) | $CH_2N(Me)C(=O)OMe$ | Cl | $CH_2OMe$ | O |
| C-8992 | H | single bond | Me | c-Pr(1-CN) | $CH_2N(Me)C(=O)OMe$ | Me | $CH_2OMe$ | O |
| C-8993 | Me | single bond | H | c-Pr(1-CN) | $CH_2N(Me)C(=O)OMe$ | Me | $CH_2OMe$ | O |
| C-8994 | Me(R) | single bond | H | c-Pr(1-CN) | $CH_2N(Me)C(=O)OMe$ | Me | $CH_2OMe$ | O |
| C-8995 | Me(S) | single bond | H | c-Pr(1-CN) | $CH_2N(Me)C(=O)OMe$ | Me | $CH_2OMe$ | O |
| C-8996 | H | $CH_2$ | Me | c-Pr(1-CN) | $CH_2N(Me)C(=O)OMe$ | Me | $CH_2OMe$ | O |
| C-8997 | Me | $CH_2$ | H | c-Pr(1-CN) | $CH_2N(Me)C(=O)OMe$ | Me | $CH_2OMe$ | O |
| C-8998 | H | CH(Me) | H | c-Pr(1-CN) | $CH_2N(Me)C(=O)OMe$ | Me | $CH_2OMe$ | O |
| C-8999 | H | $CH_2CH_2$ | Me | c-Pr(1-CN) | $CH_2N(Me)C(=O)OMe$ | Me | $CH_2OMe$ | O |
| C-9000 | Me | $CH_2CH_2$ | H | c-Pr(1-CN) | $CH_2N(Me)C(=O)OMe$ | Me | $CH_2OMe$ | O |
| C-9001 | H | single bond | Me | c-Pr(1-CN) | $C(=O)OCH_2CH=CH_2$ | Cl | $CH_2CN$ | O |
| C-9002 | Me | single bond | H | c-Pr(1-CN) | $C(=O)OCH_2CH=CH_2$ | Cl | $CH_2CN$ | O |
| C-9003 | Me(R) | single bond | H | c-Pr(1-CN) | $C(=O)OCH_2CH=CH_2$ | Cl | $CH_2CN$ | O |

TABLE 432-continued

| Compound Number | Y | W | Z | $R^1$ | $R^2$ | $R^3$ | $R^{10}$ | A |
|---|---|---|---|---|---|---|---|---|
| C-9004 | Me(S) | single bond | H | c-Pr(1-CN) | C(=O)OCH$_2$CH=CH$_2$ | Cl | CH$_2$CN | O |
| C-9005 | H | CH$_2$ | Me | c-Pr(1-CN) | C(=O)OCH$_2$CH=CH$_2$ | Cl | CH$_2$CN | O |
| C-9006 | Me | CH$_2$ | H | c-Pr(1-CN) | C(=O)OCH$_2$CH=CH$_2$ | Cl | CH$_2$CN | O |
| C-9007 | H | CH(Me) | H | c-Pr(1-CN) | C(=O)OCH$_2$CH=CH$_2$ | Cl | CH$_2$CN | O |
| C-9008 | H | CH$_2$CH$_2$ | Me | c-Pr(1-CN) | C(=O)OCH$_2$CH=CH$_2$ | Cl | CH$_2$CN | O |
| C-9009 | Me | CH$_2$CH$_2$ | H | c-Pr(1-CN) | C(=O)OCH$_2$CH=CH$_2$ | Cl | CH$_2$CN | O |
| C-9010 | H | single bond | Me | c-Pr(1-CN) | C(=O)OCH$_2$CH=CH$_2$ | Me | CH$_2$CN | O |
| C-9011 | Me | single bond | H | c-Pr(1-CN) | C(=O)OCH$_2$CH=CH$_2$ | Me | CH$_2$CN | O |
| C-9012 | Me(R) | single bond | H | c-Pr(1-CN) | C(=O)OCH$_2$CH=CH$_2$ | Me | CH$_2$CN | O |
| C-9013 | Me(S) | single bond | H | c-Pr(1-CN) | C(=O)OCH$_2$CH=CH$_2$ | Me | CH$_2$CN | O |
| C-9014 | H | CH$_2$ | Me | c-Pr(1-CN) | C(=O)OCH$_2$CH=CH$_2$ | Me | CH$_2$CN | O |
| C-9015 | Me | CH$_2$ | H | c-Pr(1-CN) | C(=O)OCH$_2$CH=CH$_2$ | Me | CH$_2$CN | O |
| C-9016 | H | CH(Me) | H | c-Pr(1-CN) | C(=O)OCH$_2$CH=CH$_2$ | Me | CH$_2$CN | O |
| C-9017 | H | CH$_2$CH$_2$ | Me | c-Pr(1-CN) | C(=O)OCH$_2$CH=CH$_2$ | Me | CH$_2$CN | O |
| C-9018 | Me | CH$_2$CH$_2$ | H | c-Pr(1-CN) | C(=O)OCH$_2$CH=CH$_2$ | Me | CH$_2$CN | O |
| C-9019 | H | single bond | Me | c-Pr(1-CN) | C(=O)OCH$_2$CCl$_3$ | Cl | CH$_2$CN | O |
| C-9020 | Me | single bond | H | c-Pr(1-CN) | C(=O)OCH$_2$CCl$_3$ | Cl | CH$_2$CN | O |
| C-9021 | Me(R) | single bond | H | c-Pr(1-CN) | C(=O)OCH$_2$CCl$_3$ | Cl | CH$_2$CN | O |
| C-9022 | Me(S) | single bond | H | c-Pr(1-CN) | C(=O)OCH$_2$CCl$_3$ | Cl | CH$_2$CN | O |
| C-9023 | H | CH$_2$ | Me | c-Pr(1-CN) | C(=O)OCH$_2$CCl$_3$ | Cl | CH$_2$CN | O |
| C-9024 | Me | CH$_2$ | H | c-Pr(1-CN) | C(=O)OCH$_2$CCl$_3$ | Cl | CH$_2$CN | O |
| C-9025 | H | CH(Me) | H | c-Pr(1-CN) | C(=O)OCH$_2$CCl$_3$ | Cl | CH$_2$CN | O |
| C-9026 | H | CH$_2$CH$_2$ | Me | c-Pr(1-CN) | C(=O)OCH$_2$CCl$_3$ | Cl | CH$_2$CN | O |

TABLE 433

| Compound Number | Y | W | Z | $R^1$ | $R^2$ | $R^3$ | $R^{10}$ | A |
|---|---|---|---|---|---|---|---|---|
| C-9027 | Me | CH$_2$CH$_2$ | H | c-Pr(1-CN) | C(=O)OCH$_2$CCl$_3$ | Cl | CH$_2$CN | O |
| C-9028 | H | single bond | Me | c-Pr(1-CN) | C(=O)OCH$_2$CCl$_3$ | Me | CH$_2$CN | O |
| C-9029 | Me | single bond | H | c-Pr(1-CN) | C(=O)OCH$_2$CCl$_3$ | Me | CH$_2$CN | O |
| C-9030 | Me(R) | single bond | H | c-Pr(1-CN) | C(=O)OCH$_2$CCl$_3$ | Me | CH$_2$CN | O |
| C-9031 | Me(S) | single bond | H | c-Pr(1-CN) | C(=O)OCH$_2$CCl$_3$ | Me | CH$_2$CN | O |
| C-9032 | H | CH$_2$ | Me | c-Pr(1-CN) | C(=O)OCH$_2$CCl$_3$ | Me | CH$_2$CN | O |
| C-9033 | Me | CH$_2$ | H | c-Pr(1-CN) | C(=O)OCH$_2$CCl$_3$ | Me | CH$_2$CN | O |
| C-9034 | H | CH(Me) | H | c-Pr(1-CN) | C(=O)OCH$_2$CCl$_3$ | Me | CH$_2$CN | O |
| C-9035 | H | CH$_2$CH$_2$ | Me | c-Pr(1-CN) | C(=O)OCH$_2$CCl$_3$ | Me | CH$_2$CN | O |
| C-9036 | Me | CH$_2$CH$_2$ | H | c-Pr(1-CN) | C(=O)OCH$_2$CCl$_3$ | Me | CH$_2$CN | O |
| C-9037 | H | single bond | Me | c-Pr(1-CN) | C(=O)N(Me)$_2$ | Cl | CH$_2$CN | O |
| C-9038 | Me | single bond | H | c-Pr(1-CN) | C(=O)N(Me)$_2$ | Cl | CH$_2$CN | O |
| C-9039 | Me(R) | single bond | H | c-Pr(1-CN) | C(=O)N(Me)$_2$ | Cl | CH$_2$CN | O |
| C-9040 | Me(S) | single bond | H | c-Pr(1-CN) | C(=O)N(Me)$_2$ | Cl | CH$_2$CN | O |
| C-9041 | H | CH$_2$ | Me | c-Pr(1-CN) | C(=O)N(Me)$_2$ | Cl | CH$_2$CN | O |
| C-9042 | Me | CH$_2$ | H | c-Pr(1-CN) | C(=O)N(Me)$_2$ | Cl | CH$_2$CN | O |
| C-9043 | H | CH(Me) | H | c-Pr(1-CN) | C(=O)N(Me)$_2$ | Cl | CH$_2$CN | O |
| C-9044 | H | CH$_2$CH$_2$ | Me | c-Pr(1-CN) | C(=O)N(Me)$_2$ | Cl | CH$_2$CN | O |
| C-9045 | Me | CH$_2$CH$_2$ | H | c-Pr(1-CN) | C(=O)N(Me)$_2$ | Cl | CH$_2$CN | O |
| C-9046 | H | single bond | Me | c-Pr(1-CN) | C(=O)N(Me)$_2$ | Me | CH$_2$CN | O |
| C-9047 | Me | single bond | H | c-Pr(1-CN) | C(=O)N(Me)$_2$ | Me | CH$_2$CN | O |
| C-9048 | Me(R) | single bond | H | c-Pr(1-CN) | C(=O)N(Me)$_2$ | Me | CH$_2$CN | O |
| C-9049 | Me(S) | single bond | H | c-Pr(1-CN) | C(=O)N(Me)$_2$ | Me | CH$_2$CN | O |
| C-9050 | H | CH$_2$ | Me | c-Pr(1-CN) | C(=O)N(Me)$_2$ | Me | CH$_2$CN | O |
| C-9051 | Me | CH$_2$ | H | c-Pr(1-CN) | C(=O)N(Me)$_2$ | Me | CH$_2$CN | O |
| C-9052 | H | CH(Me) | H | c-Pr(1-CN) | C(=O)N(Me)$_2$ | Me | CH$_2$CN | O |
| C-9053 | H | CH$_2$CH$_2$ | Me | c-Pr(1-CN) | C(=O)N(Me)$_2$ | Me | CH$_2$CN | O |
| C-9054 | Me | CH$_2$CH$_2$ | H | c-Pr(1-CN) | C(=O)N(Me)$_2$ | Me | CH$_2$CN | O |
| C-9055 | H | single bond | Me | c-Pr(1-CN) | CH$_2$OC(=O)Me | Cl | CH$_2$CN | O |
| C-9056 | Me | single bond | H | c-Pr(1-CN) | CH$_2$OC(=O)Me | Cl | CH$_2$CN | O |
| C-9057 | Me(R) | single bond | H | c-Pr(1-CN) | CH$_2$OC(=O)Me | Cl | CH$_2$CN | O |
| C-9058 | Me(S) | single bond | H | c-Pr(1-CN) | CH$_2$OC(=O)Me | Cl | CH$_2$CN | O |
| C-9059 | H | CH$_2$ | Me | c-Pr(1-CN) | CH$_2$OC(=O)Me | Cl | CH$_2$CN | O |
| C-9060 | Me | CH$_2$ | H | c-Pr(1-CN) | CH$_2$OC(=O)Me | Cl | CH$_2$CN | O |
| C-9061 | H | CH(Me) | H | c-Pr(1-CN) | CH$_2$OC(=O)Me | Cl | CH$_2$CN | O |
| C-9062 | H | CH$_2$CH$_2$ | Me | c-Pr(1-CN) | CH$_2$OC(=O)Me | Cl | CH$_2$CN | O |
| C-9063 | Me | CH$_2$CH$_2$ | H | c-Pr(1-CN) | CH$_2$OC(=O)Me | Cl | CH$_2$CN | O |
| C-9064 | H | single bond | Me | c-Pr(1-CN) | CH$_2$OC(=O)Me | Me | CH$_2$CN | O |
| C-9065 | Me | single bond | H | c-Pr(1-CN) | CH$_2$OC(=O)Me | Me | CH$_2$CN | O |
| C-9066 | Me(R) | single bond | H | c-Pr(1-CN) | CH$_2$OC(=O)Me | Me | CH$_2$CN | O |
| C-9067 | Me(S) | single bond | H | c-Pr(1-CN) | CH$_2$OC(=O)Me | Me | CH$_2$CN | O |
| C-9068 | H | CH$_2$ | Me | c-Pr(1-CN) | CH$_2$OC(=O)Me | Me | CH$_2$CN | O |

TABLE 433-continued

| Compound Number | Y | W | Z | $R^1$ | $R^2$ | $R^3$ | $R^{10}$ | A |
|---|---|---|---|---|---|---|---|---|
| C-9069 | Me | $CH_2$ | H | c-Pr(1-CN) | $CH_2OC(=O)Me$ | Me | $CH_2CN$ | O |
| C-9070 | H | CH(Me) | H | c-Pr(1-CN) | $CH_2OC(=O)Me$ | Me | $CH_2CN$ | O |

TABLE 434

| Compound Number | Y | W | Z | $R^1$ | $R^2$ | $R^3$ | $R^{10}$ | A |
|---|---|---|---|---|---|---|---|---|
| C-9071 | H | $CH_2CH_2$ | Me | c-Pr(1-CN) | $CH_2OC(=O)Me$ | Me | $CH_2CN$ | O |
| C-9072 | Me | $CH_2CH_2$ | H | c-Pr(1-CN) | $CH_2OC(=O)Me$ | Me | $CH_2CN$ | O |
| C-9073 | H | single bond | Me | c-Pr(1-CN) | $CH_2OC(=O)(i\text{-}Pr)$ | Cl | $CH_2CN$ | O |
| C-9074 | Me | single bond | H | c-Pr(1-CN) | $CH_2OC(=O)(i\text{-}Pr)$ | Cl | $CH_2CN$ | O |
| C-9075 | Me(R) | single bond | H | c-Pr(1-CN) | $CH_2OC(=O)(i\text{-}Pr)$ | Cl | $CH_2CN$ | O |
| C-9076 | Me(S) | single bond | H | c-Pr(1-CN) | $CH_2OC(=O)(i\text{-}Pr)$ | Cl | $CH_2CN$ | O |
| C-9077 | H | $CH_2$ | Me | c-Pr(1-CN) | $CH_2OC(=O)(i\text{-}Pr)$ | Cl | $CH_2CN$ | O |
| C-9078 | Me | $CH_2$ | H | c-Pr(1-CN) | $CH_2OC(=O)(i\text{-}Pr)$ | Cl | $CH_2CN$ | O |
| C-9079 | H | CH(Me) | H | c-Pr(1-CN) | $CH_2OC(=O)(i\text{-}Pr)$ | Cl | $CH_2CN$ | O |
| C-9080 | H | $CH_2CH_2$ | Me | c-Pr(1-CN) | $CH_2OC(=O)(i\text{-}Pr)$ | Cl | $CH_2CN$ | O |
| C-9081 | Me | $CH_2CH_2$ | H | c-Pr(1-CN) | $CH_2OC(=O)(i\text{-}Pr)$ | Cl | $CH_2CN$ | O |
| C-9082 | H | single bond | Me | c-Pr(1-CN) | $CH_2OC(=O)(i\text{-}Pr)$ | Me | $CH_2CN$ | O |
| C-9083 | Me | single bond | H | c-Pr(1-CN) | $CH_2OC(=O)(i\text{-}Pr)$ | Me | $CH_2CN$ | O |
| C-9084 | Me(R) | single bond | H | c-Pr(1-CN) | $CH_2OC(=O)(i\text{-}Pr)$ | Me | $CH_2CN$ | O |
| C-9085 | Me(S) | single bond | H | c-Pr(1-CN) | $CH_2OC(=O)(i\text{-}Pr)$ | Me | $CH_2CN$ | O |
| C-9086 | H | $CH_2$ | Me | c-Pr(1-CN) | $CH_2OC(=O)(i\text{-}Pr)$ | Me | $CH_2CN$ | O |
| C-9087 | Me | $CH_2$ | H | c-Pr(1-CN) | $CH_2OC(=O)(i\text{-}Pr)$ | Me | $CH_2CN$ | O |
| C-9088 | H | CH(Me) | H | c-Pr(1-CN) | $CH_2OC(=O)(i\text{-}Pr)$ | Me | $CH_2CN$ | O |
| C-9089 | H | $CH_2CH_2$ | Me | c-Pr(1-CN) | $CH_2OC(=O)(i\text{-}Pr)$ | Me | $CH_2CN$ | O |
| C-9090 | Me | $CH_2CH_2$ | H | c-Pr(1-CN) | $CH_2OC(=O)(i\text{-}Pr)$ | Me | $CH_2CN$ | O |
| C-9091 | H | single bond | Me | c-Pr(1-CN) | $CH_2OC(=O)(t\text{-}Bu)$ | Cl | $CH_2CN$ | O |
| C-9092 | Me | single bond | H | c-Pr(1-CN) | $CH_2OC(=O)(t\text{-}Bu)$ | Cl | $CH_2CN$ | O |
| C-9093 | Me(R) | single bond | H | c-Pr(1-CN) | $CH_2OC(=O)(t\text{-}Bu)$ | Cl | $CH_2CN$ | O |
| C-9094 | Me(S) | single bond | H | c-Pr(1-CN) | $CH_2OC(=O)(t\text{-}Bu)$ | Cl | $CH_2CN$ | O |
| C-9095 | H | $CH_2$ | Me | c-Pr(1-CN) | $CH_2OC(=O)(t\text{-}Bu)$ | Cl | $CH_2CN$ | O |
| C-9096 | Me | $CH_2$ | H | c-Pr(1-CN) | $CH_2OC(=O)(t\text{-}Bu)$ | Cl | $CH_2CN$ | O |
| C-9097 | H | CH(Me) | H | c-Pr(1-CN) | $CH_2OC(=O)(t\text{-}Bu)$ | Cl | $CH_2CN$ | O |
| C-9098 | H | $CH_2CH_2$ | Me | c-Pr(1-CN) | $CH_2OC(=O)(t\text{-}Bu)$ | Cl | $CH_2CN$ | O |
| C-9099 | Me | $CH_2CH_2$ | H | c-Pr(1-CN) | $CH_2OC(=O)(t\text{-}Bu)$ | Cl | $CH_2CN$ | O |
| C-9100 | H | single bond | Me | c-Pr(1-CN) | $CH_2OC(=O)(t\text{-}Bu)$ | Me | $CH_2CN$ | O |
| C-9101 | Me | single bond | H | c-Pr(1-CN) | $CH_2OC(=O)(t\text{-}Bu)$ | Me | $CH_2CN$ | O |
| C-9102 | Me(R) | single bond | H | c-Pr(1-CN) | $CH_2OC(=O)(t\text{-}Bu)$ | Me | $CH_2CN$ | O |
| C-9103 | Me(S) | single bond | H | c-Pr(1-CN) | $CH_2OC(=O)(t\text{-}Bu)$ | Me | $CH_2CN$ | O |
| C-9104 | H | $CH_2$ | Me | c-Pr(1-CN) | $CH_2OC(=O)(t\text{-}Bu)$ | Me | $CH_2CN$ | O |
| C-9105 | Me | $CH_2$ | H | c-Pr(1-CN) | $CH_2OC(=O)(t\text{-}Bu)$ | Me | $CH_2CN$ | O |
| C-9106 | H | CH(Me) | H | c-Pr(1-CN) | $CH_2OC(=O)(t\text{-}Bu)$ | Me | $CH_2CN$ | O |
| C-9107 | H | $CH_2CH_2$ | Me | c-Pr(1-CN) | $CH_2OC(=O)(t\text{-}Bu)$ | Me | $CH_2CN$ | O |
| C-9108 | Me | $CH_2CH_2$ | H | c-Pr(1-CN) | $CH_2OC(=O)(t\text{-}Bu)$ | Me | $CH_2CN$ | O |
| C-9109 | H | single bond | Me | c-Pr(1-CN) | $CH_2OC(=O)OEt$ | Cl | $CH_2CN$ | O |
| C-9110 | Me | single bond | H | c-Pr(1-CN) | $CH_2OC(=O)OEt$ | Cl | $CH_2CN$ | O |
| C-9111 | Me(R) | single bond | H | c-Pr(1-CN) | $CH_2OC(=O)OEt$ | Cl | $CH_2CN$ | O |
| C-9112 | Me(S) | single bond | H | c-Pr(1-CN) | $CH_2OC(=O)OEt$ | Cl | $CH_2CN$ | O |
| C-9113 | H | $CH_2$ | Me | c-Pr(1-CN) | $CH_2OC(=O)OEt$ | Cl | $CH_2CN$ | O |
| C-9114 | Me | $CH_2$ | H | c-Pr(1-CN) | $CH_2OC(=O)OEt$ | Cl | $CH_2CN$ | O |

TABLE 435

| Compound Number | Y | W | Z | $R^1$ | $R^2$ | $R^3$ | $R^{10}$ | A |
|---|---|---|---|---|---|---|---|---|
| C-9115 | H | CH(Me) | H | c-Pr(1-CN) | $CH_2OC(=O)OEt$ | Cl | $CH_2CN$ | O |
| C-9116 | H | $CH_2CH_2$ | Me | c-Pr(1-CN) | $CH_2OC(=O)OEt$ | Cl | $CH_2CN$ | O |
| C-9117 | Me | $CH_2CH_2$ | H | c-Pr(1-CN) | $CH_2OC(=O)OEt$ | Cl | $CH_2CN$ | O |
| C-9118 | H | single bond | Me | c-Pr(1-CN) | $CH_2OC(=O)OEt$ | Me | $CH_2CN$ | O |
| C-9119 | Me | single bond | H | c-Pr(1-CN) | $CH_2OC(=O)OEt$ | Me | $CH_2CN$ | O |
| C-9120 | Me(R) | single bond | H | c-Pr(1-CN) | $CH_2OC(=O)OEt$ | Me | $CH_2CN$ | O |
| C-9121 | Me(S) | single bond | H | c-Pr(1-CN) | $CH_2OC(=O)OEt$ | Me | $CH_2CN$ | O |
| C-9122 | H | $CH_2$ | Me | c-Pr(1-CN) | $CH_2OC(=O)OEt$ | Me | $CH_2CN$ | O |
| C-9123 | Me | $CH_2$ | H | c-Pr(1-CN) | $CH_2OC(=O)OEt$ | Me | $CH_2CN$ | O |
| C-9124 | H | CH(Me) | H | c-Pr(1-CN) | $CH_2OC(=O)OEt$ | Me | $CH_2CN$ | O |

TABLE 435-continued

| Compound Number | Y | W | Z | $R^1$ | $R^2$ | $R^3$ | $R^{10}$ | A |
|---|---|---|---|---|---|---|---|---|
| C-9125 | H | $CH_2CH_2$ | Me | c-Pr(1-CN) | $CH_2OC(=O)OEt$ | Me | $CH_2CN$ | O |
| C-9126 | Me | $CH_2CH_2$ | H | c-Pr(1-CN) | $CH_2OC(=O)OEt$ | Me | $CH_2CN$ | O |
| C-9127 | H | single bond | Me | c-Pr(1-CN) | $CH_2OC(=O)O(i-Pr)$ | Cl | $CH_2CN$ | O |
| C-9128 | Me | single bond | H | c-Pr(1-CN) | $CH_2OC(=O)O(i-Pr)$ | Cl | $CH_2CN$ | O |
| C-9129 | Me(R) | single bond | H | c-Pr(1-CN) | $CH_2OC(=O)O(i-Pr)$ | Cl | $CH_2CN$ | O |
| C-9130 | Me(S) | single bond | H | c-Pr(1-CN) | $CH_2OC(=O)O(i-Pr)$ | Cl | $CH_2CN$ | O |
| C-9131 | H | $CH_2$ | Me | c-Pr(1-CN) | $CH_2OC(=O)O(i-Pr)$ | Cl | $CH_2CN$ | O |
| C-9132 | Me | $CH_2$ | H | c-Pr(1-CN) | $CH_2OC(=O)O(i-Pr)$ | Cl | $CH_2CN$ | O |
| C-9133 | H | CH(Me) | H | c-Pr(1-CN) | $CH_2OC(=O)O(i-Pr)$ | Cl | $CH_2CN$ | O |
| C-9134 | H | $CH_2CH_2$ | Me | c-Pr(1-CN) | $CH_2OC(=O)O(i-Pr)$ | Cl | $CH_2CN$ | O |
| C-9135 | Me | $CH_2CH_2$ | H | c-Pr(1-CN) | $CH_2OC(=O)O(i-Pr)$ | Cl | $CH_2CN$ | O |
| C-9136 | H | single bond | Me | c-Pr(1-CN) | $CH_2OC(=O)O(i-Pr)$ | Me | $CH_2CN$ | O |
| C-9137 | Me | single bond | H | c-Pr(1-CN) | $CH_2OC(=O)O(i-Pr)$ | Me | $CH_2CN$ | O |
| C-9138 | Me(R) | single bond | H | c-Pr(1-CN) | $CH_2OC(=O)O(i-Pr)$ | Me | $CH_2CN$ | O |
| C-9139 | Me(S) | single bond | H | c-Pr(1-CN) | $CH_2OC(=O)O(i-Pr)$ | Me | $CH_2CN$ | O |
| C-9140 | H | $CH_2$ | Me | c-Pr(1-CN) | $CH_2OC(=O)O(i-Pr)$ | Me | $CH_2CN$ | O |
| C-9141 | Me | $CH_2$ | H | c-Pr(1-CN) | $CH_2OC(=O)O(i-Pr)$ | Me | $CH_2CN$ | O |
| C-9142 | H | CH(Me) | H | c-Pr(1-CN) | $CH_2OC(=O)O(i-Pr)$ | Me | $CH_2CN$ | O |
| C-9143 | H | $CH_2CH_2$ | Me | c-Pr(1-CN) | $CH_2OC(=O)O(i-Pr)$ | Me | $CH_2CN$ | O |
| C-9144 | Me | $CH_2CH_2$ | H | c-Pr(1-CN) | $CH_2OC(=O)O(i-Pr)$ | Me | $CH_2CN$ | O |
| C-9145 | H | single bond | Me | c-Pr(1-CN) | $CH_2N(Me)C(=O)OMe$ | Cl | $CH_2CN$ | O |
| C-9146 | Me | single bond | H | c-Pr(1-CN) | $CH_2N(Me)C(=O)OMe$ | Cl | $CH_2CN$ | O |
| C-9147 | Me(R) | single bond | H | c-Pr(1-CN) | $CH_2N(Me)C(=O)OMe$ | Cl | $CH_2CN$ | O |
| C-9148 | Me(S) | single bond | H | c-Pr(1-CN) | $CH_2N(Me)C(=O)OMe$ | Cl | $CH_2CN$ | O |
| C-9149 | H | $CH_2$ | Me | c-Pr(1-CN) | $CH_2N(Me)C(=O)OMe$ | Cl | $CH_2CN$ | O |
| C-9150 | Me | $CH_2$ | H | c-Pr(1-CN) | $CH_2N(Me)C(=O)OMe$ | Cl | $CH_2CN$ | O |
| C-9151 | H | CH(Me) | H | c-Pr(1-CN) | $CH_2N(Me)C(=O)OMe$ | Cl | $CH_2CN$ | O |
| C-9152 | H | $CH_2CH_2$ | Me | c-Pr(1-CN) | $CH_2N(Me)C(=O)OMe$ | Cl | $CH_2CN$ | O |
| C-9153 | Me | $CH_2CH_2$ | H | c-Pr(1-CN) | $CH_2N(Me)C(=O)OMe$ | Cl | $CH_2CN$ | O |
| C-9154 | H | single bond | Me | c-Pr(1-CN) | $CH_2N(Me)C(=O)OMe$ | Me | $CH_2CN$ | O |
| C-9155 | Me | single bond | H | c-Pr(1-CN) | $CH_2N(Me)C(=O)OMe$ | Me | $CH_2CN$ | O |
| C-9156 | Me(R) | single bond | H | c-Pr(1-CN) | $CH_2N(Me)C(=O)OMe$ | Me | $CH_2CN$ | O |
| C-9157 | Me(S) | single bond | H | c-Pr(1-CN) | $CH_2N(Me)C(=O)OMe$ | Me | $CH_2CN$ | O |
| C-9158 | H | $CH_2$ | Me | c-Pr(1-CN) | $CH_2N(Me)C(=O)OMe$ | Me | $CH_2CN$ | O |

TABLE 436

| Compound Number | Y | W | Z | $R^1$ | $R^2$ | $R^3$ | $R^{10}$ | A |
|---|---|---|---|---|---|---|---|---|
| C-9159 | Me | $CH_2$ | H | c-Pr(1-CN) | $CH_2N(Me)C(=O)OMe$ | Me | $CH_2CN$ | O |
| C-9160 | H | CH(Me) | H | c-Pr(1-CN) | $CH_2N(Me)C(=O)OMe$ | Me | $CH_2CN$ | O |
| C-9161 | H | $CH_2CH_2$ | Me | c-Pr(1-CN) | $CH_2N(Me)C(=O)OMe$ | Me | $CH_2CN$ | O |
| C-9162 | Me | $CH_2CH_2$ | H | c-Pr(1-CN) | $CH_2N(Me)C(=O)OMe$ | Me | $CH_2CN$ | O |
| C-9163 | H | single bond | Me | c-Pr(1-CN) | $C(=O)OCH_2CH=CH_2$ | Cl | $C(=O)Me$ | O |
| C-9164 | Me | single bond | H | c-Pr(1-CN) | $C(=O)OCH_2CH=CH_2$ | Cl | $C(=O)Me$ | O |
| C-9165 | Me(R) | single bond | H | c-Pr(1-CN) | $C(=O)OCH_2CH=CH_2$ | Cl | $C(=O)Me$ | O |
| C-9166 | Me(S) | single bond | H | c-Pr(1-CN) | $C(=O)OCH_2CH=CH_2$ | Cl | $C(=O)Me$ | O |
| C-9167 | H | $CH_2$ | Me | c-Pr(1-CN) | $C(=O)OCH_2CH=CH_2$ | Cl | $C(=O)Me$ | O |
| C-9168 | Me | $CH_2$ | H | c-Pr(1-CN) | $C(=O)OCH_2CH=CH_2$ | Cl | $C(=O)Me$ | O |
| C-9169 | H | CH(Me) | H | c-Pr(1-CN) | $C(=O)OCH_2CH=CH_2$ | Cl | $C(=O)Me$ | O |
| C-9170 | H | $CH_2CH_2$ | Me | c-Pr(1-CN) | $C(=O)OCH_2CH=CH_2$ | Cl | $C(=O)Me$ | O |
| C-9171 | Me | $CH_2CH_2$ | H | c-Pr(1-CN) | $C(=O)OCH_2CH=CH_2$ | Cl | $C(=O)Me$ | O |
| C-9172 | H | single bond | Me | c-Pr(1-CN) | $C(=O)OCH_2CH=CH_2$ | Me | $C(=O)Me$ | O |
| C-9173 | Me | single bond | H | c-Pr(1-CN) | $C(=O)OCH_2CH=CH_2$ | Me | $C(=O)Me$ | O |
| C-9174 | Me(R) | single bond | H | c-Pr(1-CN) | $C(=O)OCH_2CH=CH_2$ | Me | $C(=O)Me$ | O |
| C-9175 | Me(S) | single bond | H | c-Pr(1-CN) | $C(=O)OCH_2CH=CH_2$ | Me | $C(=O)Me$ | O |
| C-9176 | H | $CH_2$ | Me | c-Pr(1-CN) | $C(=O)OCH_2CH=CH_2$ | Me | $C(=O)Me$ | O |
| C-9177 | Me | $CH_2$ | H | c-Pr(1-CN) | $C(=O)OCH_2CH=CH_2$ | Me | $C(=O)Me$ | O |
| C-9178 | H | CH(Me) | H | c-Pr(1-CN) | $C(=O)OCH_2CH=CH_2$ | Me | $C(=O)Me$ | O |
| C-9179 | H | $CH_2CH_2$ | Me | c-Pr(1-CN) | $C(=O)OCH_2CH=CH_2$ | Me | $C(=O)Me$ | O |
| C-9180 | Me | $CH_2CH_2$ | H | c-Pr(1-CN) | $C(=O)OCH_2CH=CH_2$ | Me | $C(=O)Me$ | O |
| C-9181 | H | single bond | Me | c-Pr(1-CN) | $C(=O)OCH_2CCl_3$ | Cl | $C(=O)Me$ | O |
| C-9182 | Me | single bond | H | c-Pr(1-CN) | $C(=O)OCH_2CCl_3$ | Cl | $C(=O)Me$ | O |
| C-9183 | Me(R) | single bond | H | c-Pr(1-CN) | $C(=O)OCH_2CCl_3$ | Cl | $C(=O)Me$ | O |
| C-9184 | Me(S) | single bond | H | c-Pr(1-CN) | $C(=O)OCH_2CCl_3$ | Cl | $C(=O)Me$ | O |
| C-9185 | H | $CH_2$ | Me | c-Pr(1-CN) | $C(=O)OCH_2CCl_3$ | Cl | $C(=O)Me$ | O |
| C-9186 | Me | $CH_2$ | H | c-Pr(1-CN) | $C(=O)OCH_2CCl_3$ | Cl | $C(=O)Me$ | O |
| C-9187 | H | CH(Me) | H | c-Pr(1-CN) | $C(=O)OCH_2CCl_3$ | Cl | $C(=O)Me$ | O |
| C-9188 | H | $CH_2CH_2$ | Me | c-Pr(1-CN) | $C(=O)OCH_2CCl_3$ | Cl | $C(=O)Me$ | O |
| C-9189 | Me | $CH_2CH_2$ | H | c-Pr(1-CN) | $C(=O)OCH_2CCl_3$ | Cl | $C(=O)Me$ | O |
| C-9190 | H | single bond | Me | c-Pr(1-CN) | $C(=O)OCH_2CCl_3$ | Me | $C(=O)Me$ | O |
| C-9191 | Me | single bond | H | c-Pr(1-CN) | $C(=O)OCH_2CCl_3$ | Me | $C(=O)Me$ | O |

TABLE 436-continued

| Compound Number | Y | W | Z | $R^1$ | $R^2$ | $R^3$ | $R^{10}$ | A |
|---|---|---|---|---|---|---|---|---|
| C-9192 | Me(R) | single bond | H | c-Pr(1-CN) | C(=O)OCH$_2$CCl$_3$ | Me | C(=O)Me | O |
| C-9193 | Me(S) | single bond | H | c-Pr(1-CN) | C(=O)OCH$_2$CCl$_3$ | Me | C(=O)Me | O |
| C-9194 | H | CH$_2$ | Me | c-Pr(1-CN) | C(=O)OCH$_2$CCl$_3$ | Me | C(=O)Me | O |
| C-9195 | Me | CH$_2$ | H | c-Pr(1-CN) | C(=O)OCH$_2$CCl$_3$ | Me | C(=O)Me | O |
| C-9196 | H | CH(Me) | H | c-Pr(1-CN) | C(=O)OCH$_2$CCl$_3$ | Me | C(=O)Me | O |
| C-9197 | H | CH$_2$CH$_2$ | Me | c-Pr(1-CN) | C(=O)OCH$_2$CCl$_3$ | Me | C(=O)Me | O |
| C-9198 | Me | CH$_2$CH$_2$ | H | c-Pr(1-CN) | C(=O)OCH$_2$CCl$_3$ | Me | C(=O)Me | O |
| C-9199 | H | single bond | Me | c-Pr(1-CN) | C(=O)N(Me)$_2$ | Cl | C(=O)Me | O |
| C-9200 | Me | single bond | H | c-Pr(1-CN) | C(=O)N(Me)$_2$ | Cl | C(=O)Me | O |
| C-9201 | Me(R) | single bond | H | c-Pr(1-CN) | C(=O)N(Me)$_2$ | Cl | C(=O)Me | O |
| C-9202 | Me(S) | single bond | H | c-Pr(1-CN) | C(=O)N(Me)$_2$ | Cl | C(=O)Me | O |

TABLE 437

| Compound Number | Y | W | Z | $R^1$ | $R^2$ | $R^3$ | $R^{10}$ | A |
|---|---|---|---|---|---|---|---|---|
| C-9203 | H | CH$_2$ | Me | c-Pr(1-CN) | C(=O)N(Me)$_2$ | Cl | C(=O)Me | O |
| C-9204 | Me | CH$_2$ | H | c-Pr(1-CN) | C(=O)N(Me)$_2$ | Cl | C(=O)Me | O |
| C-9205 | H | CH(Me) | H | c-Pr(1-CN) | C(=O)N(Me)$_2$ | Cl | C(=O)Me | O |
| C-9206 | H | CH$_2$CH$_2$ | Me | c-Pr(1-CN) | C(=O)N(Me)$_2$ | Cl | C(=O)Me | O |
| C-9207 | Me | CH$_2$CH$_2$ | H | c-Pr(1-CN) | C(=O)N(Me)$_2$ | Cl | C(=O)Me | O |
| C-9208 | H | single bond | Me | c-Pr(1-CN) | C(=O)N(Me)$_2$ | Me | C(=O)Me | O |
| C-9209 | Me | single bond | H | c-Pr(1-CN) | C(=O)N(Me)$_2$ | Me | C(=O)Me | O |
| C-9210 | Me(R) | single bond | H | c-Pr(1-CN) | C(=O)N(Me)$_2$ | Me | C(=O)Me | O |
| C-9211 | Me(S) | single bond | H | c-Pr(1-CN) | C(=O)N(Me)$_2$ | Me | C(=O)Me | O |
| C-9212 | H | CH$_2$ | Me | c-Pr(1-CN) | C(=O)N(Me)$_2$ | Me | C(=O)Me | O |
| C-9213 | Me | CH$_2$ | H | c-Pr(1-CN) | C(=O)N(Me)$_2$ | Me | C(=O)Me | O |
| C-9214 | H | CH(Me) | H | c-Pr(1-CN) | C(=O)N(Me)$_2$ | Me | C(=O)Me | O |
| C-9215 | H | CH$_2$CH$_2$ | Me | c-Pr(1-CN) | C(=O)N(Me)$_2$ | Me | C(=O)Me | O |
| C-9216 | Me | CH$_2$CH$_2$ | H | c-Pr(1-CN) | C(=O)N(Me)$_2$ | Me | C(=O)Me | O |
| C-9217 | H | single bond | Me | c-Pr(1-CN) | CH$_2$OC(=O)Me | Cl | C(=O)Me | O |
| C-9218 | Me | single bond | H | c-Pr(1-CN) | CH$_2$OC(=O)Me | Cl | C(=O)Me | O |
| C-9219 | Me(R) | single bond | H | c-Pr(1-CN) | CH$_2$OC(=O)Me | Cl | C(=O)Me | O |
| C-9220 | Me(S) | single bond | H | c-Pr(1-CN) | CH$_2$OC(=O)Me | Cl | C(=O)Me | O |
| C-9221 | H | CH$_2$ | Me | c-Pr(1-CN) | CH$_2$OC(=O)Me | Cl | C(=O)Me | O |
| C-9222 | Me | CH$_2$ | H | c-Pr(1-CN) | CH$_2$OC(=O)Me | Cl | C(=O)Me | O |
| C-9223 | H | CH(Me) | H | c-Pr(1-CN) | CH$_2$OC(=O)Me | Cl | C(=O)Me | O |
| C-9224 | H | CH$_2$CH$_2$ | Me | c-Pr(1-CN) | CH$_2$OC(=O)Me | Cl | C(=O)Me | O |
| C-9225 | Me | CH$_2$CH$_2$ | H | c-Pr(1-CN) | CH$_2$OC(=O)Me | Cl | C(=O)Me | O |
| C-9226 | H | single bond | Me | c-Pr(1-CN) | CH$_2$OC(=O)Me | Me | C(=O)Me | O |
| C-9227 | Me | single bond | H | c-Pr(1-CN) | CH$_2$OC(=O)Me | Me | C(=O)Me | O |
| C-9228 | Me(R) | single bond | H | c-Pr(1-CN) | CH$_2$OC(=O)Me | Me | C(=O)Me | O |
| C-9229 | Me(S) | single bond | H | c-Pr(1-CN) | CH$_2$OC(=O)Me | Me | C(=O)Me | O |
| C-9230 | H | CH$_2$ | Me | c-Pr(1-CN) | CH$_2$OC(=O)Me | Me | C(=O)Me | O |
| C-9231 | Me | CH$_2$ | H | c-Pr(1-CN) | CH$_2$OC(=O)Me | Me | C(=O)Me | O |
| C-9232 | H | CH(Me) | H | c-Pr(1-CN) | CH$_2$OC(=O)Me | Me | C(=O)Me | O |
| C-9233 | H | CH$_2$CH$_2$ | Me | c-Pr(1-CN) | CH$_2$OC(=O)Me | Me | C(=O)Me | O |
| C-9234 | Me | CH$_2$CH$_2$ | H | c-Pr(1-CN) | CH$_2$OC(=O)Me | Me | C(=O)Me | O |
| C-9235 | H | single bond | Me | c-Pr(1-CN) | CH$_2$OC(=O)(i-Pr) | Cl | C(=O)Me | O |
| C-9236 | Me | single bond | H | c-Pr(1-CN) | CH$_2$OC(=O)(i-Pr) | Cl | C(=O)Me | O |
| C-9237 | Me(R) | single bond | H | c-Pr(1-CN) | CH$_2$OC(=O)(i-Pr) | Cl | C(=O)Me | O |
| C-9238 | Me(S) | single bond | H | c-Pr(1-CN) | CH$_2$OC(=O)(i-Pr) | Cl | C(=O)Me | O |
| C-9239 | H | CH$_2$ | Me | c-Pr(1-CN) | CH$_2$OC(=O)(i-Pr) | Cl | C(=O)Me | O |
| C-9240 | Me | CH$_2$ | H | c-Pr(1-CN) | CH$_2$OC(=O)(i-Pr) | Cl | C(=O)Me | O |
| C-9241 | H | CH(Me) | H | c-Pr(1-CN) | CH$_2$OC(=O)(i-Pr) | Cl | C(=O)Me | O |
| C-9242 | H | CH$_2$CH$_2$ | Me | c-Pr(1-CN) | CH$_2$OC(=O)(i-Pr) | Cl | C(=O)Me | O |
| C-9243 | Me | CH$_2$CH$_2$ | H | c-Pr(1-CN) | CH$_2$OC(=O)(i-Pr) | Cl | C(=O)Me | O |
| C-9244 | H | single bond | Me | c-Pr(1-CN) | CH$_2$OC(=O)(i-Pr) | Me | C(=O)Me | O |
| C-9245 | Me | single bond | H | c-Pr(1-CN) | CH$_2$OC(=O)(i-Pr) | Me | C(=O)Me | O |
| C-9246 | Me(R) | single bond | H | c-Pr(1-CN) | CH$_2$OC(=O)(i-Pr) | Me | C(=O)Me | O |

TABLE 438

| Compound Number | Y | W | Z | $R^1$ | $R^2$ | $R^3$ | $R^{10}$ | A |
|---|---|---|---|---|---|---|---|---|
| C-9247 | Me(S) | single bond | H | c-Pr(1-CN) | CH$_2$OC(=O)(i-Pr) | Me | C(=O)Me | O |
| C-9248 | H | CH$_2$ | Me | c-Pr(1-CN) | CH$_2$OC(=O)(i-Pr) | Me | C(=O)Me | O |
| C-9249 | Me | CH$_2$ | H | c-Pr(1-CN) | CH$_2$OC(=O)(i-Pr) | Me | C(=O)Me | O |

TABLE 438-continued

| Compound Number | Y | W | Z | $R^1$ | $R^2$ | $R^3$ | $R^{10}$ | A |
|---|---|---|---|---|---|---|---|---|
| C-9250 | H | CH(Me) | H | c-Pr(1-CN) | $CH_2OC(=O)(i\text{-}Pr)$ | Me | C(=O)Me | O |
| C-9251 | H | $CH_2CH_2$ | Me | c-Pr(1-CN) | $CH_2OC(=O)(i\text{-}Pr)$ | Me | C(=O)Me | O |
| C-9252 | Me | $CH_2CH_2$ | H | c-Pr(1-CN) | $CH_2OC(=O)(i\text{-}Pr)$ | Me | C(=O)Me | O |
| C-9253 | H | single bond | Me | c-Pr(1-CN) | $CH_2OC(=O)(t\text{-}Bu)$ | Cl | C(=O)Me | O |
| C-9254 | Me | single bond | H | c-Pr(1-CN) | $CH_2OC(=O)(t\text{-}Bu)$ | Cl | C(=O)Me | O |
| C-9255 | Me(R) | single bond | H | c-Pr(1-CN) | $CH_2OC(=O)(t\text{-}Bu)$ | Cl | C(=O)Me | O |
| C-9256 | Me(S) | single bond | H | c-Pr(1-CN) | $CH_2OC(=O)(t\text{-}Bu)$ | Cl | C(=O)Me | O |
| C-9257 | H | $CH_2$ | Me | c-Pr(1-CN) | $CH_2OC(=O)(t\text{-}Bu)$ | Cl | C(=O)Me | O |
| C-9258 | Me | $CH_2$ | H | c-Pr(1-CN) | $CH_2OC(=O)(t\text{-}Bu)$ | Cl | C(=O)Me | O |
| C-9259 | H | CH(Me) | H | c-Pr(1-CN) | $CH_2OC(=O)(t\text{-}Bu)$ | Cl | C(=O)Me | O |
| C-9260 | H | $CH_2CH_2$ | Me | c-Pr(1-CN) | $CH_2OC(=O)(t\text{-}Bu)$ | Cl | C(=O)Me | O |
| C-9261 | Me | $CH_2CH_2$ | H | c-Pr(1-CN) | $CH_2OC(=O)(t\text{-}Bu)$ | Cl | C(=O)Me | O |
| C-9262 | H | single bond | Me | c-Pr(1-CN) | $CH_2OC(=O)(t\text{-}Bu)$ | Me | C(=O)Me | O |
| C-9263 | Me | single bond | H | c-Pr(1-CN) | $CH_2OC(=O)(t\text{-}Bu)$ | Me | C(=O)Me | O |
| C-9264 | Me(R) | single bond | H | c-Pr(1-CN) | $CH_2OC(=O)(t\text{-}Bu)$ | Me | C(=O)Me | O |
| C-9265 | Me(S) | single bond | H | c-Pr(1-CN) | $CH_2OC(=O)(t\text{-}Bu)$ | Me | C(=O)Me | O |
| C-9266 | H | $CH_2$ | Me | c-Pr(1-CN) | $CH_2OC(=O)(t\text{-}Bu)$ | Me | C(=O)Me | O |
| C-9267 | Me | $CH_2$ | H | c-Pr(1-CN) | $CH_2OC(=O)(t\text{-}Bu)$ | Me | C(=O)Me | O |
| C-9268 | H | CH(Me) | H | c-Pr(1-CN) | $CH_2OC(=O)(t\text{-}Bu)$ | Me | C(=O)Me | O |
| C-9269 | H | $CH_2CH_2$ | Me | c-Pr(1-CN) | $CH_2OC(=O)(t\text{-}Bu)$ | Me | C(=O)Me | O |
| C-9270 | Me | $CH_2CH_2$ | H | c-Pr(1-CN) | $CH_2OC(=O)(t\text{-}Bu)$ | Me | C(=O)Me | O |
| C-9271 | H | single bond | Me | c-Pr(1-CN) | $CH_2OC(=O)OEt$ | Cl | C(=O)Me | O |
| C-9272 | Me | single bond | H | c-Pr(1-CN) | $CH_2OC(=O)OEt$ | Cl | C(=O)Me | O |
| C-9273 | Me(R) | single bond | H | c-Pr(1-CN) | $CH_2OC(=O)OEt$ | Cl | C(=O)Me | O |
| C-9274 | Me(S) | single bond | H | c-Pr(1-CN) | $CH_2OC(=O)OEt$ | Cl | C(=O)Me | O |
| C-9275 | H | $CH_2$ | Me | c-Pr(1-CN) | $CH_2OC(=O)OEt$ | Cl | C(=O)Me | O |
| C-9276 | Me | $CH_2$ | H | c-Pr(1-CN) | $CH_2OC(=O)OEt$ | Cl | C(=O)Me | O |
| C-9277 | H | CH(Me) | H | c-Pr(1-CN) | $CH_2OC(=O)OEt$ | Cl | C(=O)Me | O |
| C-9278 | H | $CH_2CH_2$ | Me | c-Pr(1-CN) | $CH_2OC(=O)OEt$ | Cl | C(=O)Me | O |
| C-9279 | Me | $CH_2CH_2$ | H | c-Pr(1-CN) | $CH_2OC(=O)OEt$ | Cl | C(=O)Me | O |
| C-9280 | H | single bond | Me | c-Pr(1-CN) | $CH_2OC(=O)OEt$ | Me | C(=O)Me | O |
| C-9281 | Me | single bond | H | c-Pr(1-CN) | $CH_2OC(=O)OEt$ | Me | C(=O)Me | O |
| C-9282 | Me(R) | single bond | H | c-Pr(1-CN) | $CH_2OC(=O)OEt$ | Me | C(=O)Me | O |
| C-9283 | Me(S) | single bond | H | c-Pr(1-CN) | $CH_2OC(=O)OEt$ | Me | C(=O)Me | O |
| C-9284 | H | $CH_2$ | Me | c-Pr(1-CN) | $CH_2OC(=O)OEt$ | Me | C(=O)Me | O |
| C-9285 | Me | $CH_2$ | H | c-Pr(1-CN) | $CH_2OC(=O)OEt$ | Me | C(=O)Me | O |
| C-9286 | H | CH(Me) | H | c-Pr(1-CN) | $CH_2OC(=O)OEt$ | Me | C(=O)Me | O |
| C-9287 | H | $CH_2CH_2$ | Me | c-Pr(1-CN) | $CH_2OC(=O)OEt$ | Me | C(=O)Me | O |
| C-9288 | Me | $CH_2CH_2$ | H | c-Pr(1-CN) | $CH_2OC(=O)OEt$ | Me | C(=O)Me | O |
| C-9289 | H | single bond | Me | c-Pr(1-CN) | $CH_2OC(=O)O(i\text{-}Pr)$ | Cl | C(=O)Me | O |
| C-9290 | Me | single bond | H | c-Pr(1-CN) | $CH_2OC(=O)O(i\text{-}Pr)$ | Cl | C(=O)Me | O |

TABLE 439

| Compound Number | Y | W | Z | $R^1$ | $R^2$ | $R^3$ | $R^{10}$ | A |
|---|---|---|---|---|---|---|---|---|
| C-9291 | Me(R) | single bond | H | c-Pr(1-CN) | $CH_2OC(=O)O(i\text{-}Pr)$ | Cl | C(=O)Me | O |
| C-9292 | Me(S) | single bond | H | c-Pr(1-CN) | $CH_2OC(=O)O(i\text{-}Pr)$ | Cl | C(=O)Me | O |
| C-9293 | H | $CH_2$ | Me | c-Pr(1-CN) | $CH_2OC(=O)O(i\text{-}Pr)$ | Cl | C(=O)Me | O |
| C-9294 | Me | $CH_2$ | H | c-Pr(1-CN) | $CH_2OC(=O)O(i\text{-}Pr)$ | Cl | C(=O)Me | O |
| C-9295 | H | CH(Me) | H | c-Pr(1-CN) | $CH_2OC(=O)O(i\text{-}Pr)$ | Cl | C(=O)Me | O |
| C-9296 | H | $CH_2CH_2$ | Me | c-Pr(1-CN) | $CH_2OC(=O)O(i\text{-}Pr)$ | Cl | C(=O)Me | O |
| C-9297 | Me | $CH_2CH_2$ | H | c-Pr(1-CN) | $CH_2OC(=O)O(i\text{-}Pr)$ | Cl | C(=O)Me | O |
| C-9298 | H | single bond | Me | c-Pr(1-CN) | $CH_2OC(=O)O(i\text{-}Pr)$ | Me | C(=O)Me | O |
| C-9299 | Me | single bond | H | c-Pr(1-CN) | $CH_2OC(=O)O(i\text{-}Pr)$ | Me | C(=O)Me | O |
| C-9300 | Me(R) | single bond | H | c-Pr(1-CN) | $CH_2OC(=O)O(i\text{-}Pr)$ | Me | C(=O)Me | O |
| C-9301 | Me(S) | single bond | H | c-Pr(1-CN) | $CH_2OC(=O)O(i\text{-}Pr)$ | Me | C(=O)Me | O |
| C-9302 | H | $CH_2$ | Me | c-Pr(1-CN) | $CH_2OC(=O)O(i\text{-}Pr)$ | Me | C(=O)Me | O |
| C-9303 | Me | $CH_2$ | H | c-Pr(1-CN) | $CH_2OC(=O)O(i\text{-}Pr)$ | Me | C(=O)Me | O |
| C-9304 | H | CH(Me) | H | c-Pr(1-CN) | $CH_2OC(=O)O(i\text{-}Pr)$ | Me | C(=O)Me | O |
| C-9305 | H | $CH_2CH_2$ | Me | c-Pr(1-CN) | $CH_2OC(=O)O(i\text{-}Pr)$ | Me | C(=O)Me | O |
| C-9306 | Me | $CH_2CH_2$ | H | c-Pr(1-CN) | $CH_2OC(=O)O(i\text{-}Pr)$ | Me | C(=O)Me | O |
| C-9307 | H | single bond | Me | c-Pr(1-CN) | $CH_2N(Me)C(=O)OMe$ | Cl | C(=O)Me | O |
| C-9308 | Me | single bond | H | c-Pr(1-CN) | $CH_2N(Me)C(=O)OMe$ | Cl | C(=O)Me | O |
| C-9309 | Me(R) | single bond | H | c-Pr(1-CN) | $CH_2N(Me)C(=O)OMe$ | Cl | C(=O)Me | O |
| C-9310 | Me(S) | single bond | H | c-Pr(1-CN) | $CH_2N(Me)C(=O)OMe$ | Cl | C(=O)Me | O |
| C-9311 | H | $CH_2$ | Me | c-Pr(1-CN) | $CH_2N(Me)C(=O)OMe$ | Cl | C(=O)Me | O |
| C-9312 | Me | $CH_2$ | H | c-Pr(1-CN) | $CH_2N(Me)C(=O)OMe$ | Cl | C(=O)Me | O |
| C-9313 | H | CH(Me) | H | c-Pr(1-CN) | $CH_2N(Me)C(=O)OMe$ | Cl | C(=O)Me | O |
| C-9314 | H | $CH_2CH_2$ | Me | c-Pr(1-CN) | $CH_2N(Me)C(=O)OMe$ | Cl | C(=O)Me | O |
| C-9315 | Me | $CH_2CH_2$ | H | c-Pr(1-CN) | $CH_2N(Me)C(=O)OMe$ | Cl | C(=O)Me | O |
| C-9316 | H | single bond | Me | c-Pr(1-CN) | $CH_2N(Me)C(=O)OMe$ | Me | C(=O)Me | O |

TABLE 439-continued

| Compound Number | Y | W | Z | $R^1$ | $R^2$ | $R^3$ | $R^{10}$ | A |
|---|---|---|---|---|---|---|---|---|
| C-9317 | Me | single bond | H | c-Pr(1-CN) | $CH_2N(Me)C(=O)OMe$ | Me | C(=O)Me | O |
| C-9318 | Me(R) | single bond | H | c-Pr(1-CN) | $CH_2N(Me)C(=O)OMe$ | Me | C(=O)Me | O |
| C-9319 | Me(S) | single bond | H | c-Pr(1-CN) | $CH_2N(Me)C(=O)OMe$ | Me | C(=O)Me | O |
| C-9320 | H | $CH_2$ | Me | c-Pr(1-CN) | $CH_2N(Me)C(=O)OMe$ | Me | C(=O)Me | O |
| C-9321 | Me | $CH_2$ | H | c-Pr(1-CN) | $CH_2N(Me)C(=O)OMe$ | Me | C(=O)Me | O |
| C-9322 | H | CH(Me) | H | c-Pr(1-CN) | $CH_2N(Me)C(=O)OMe$ | Me | C(=O)Me | O |
| C-9323 | H | $CH_2CH_2$ | Me | c-Pr(1-CN) | $CH_2N(Me)C(=O)OMe$ | Me | C(=O)Me | O |
| C-9324 | Me | $CH_2CH_2$ | H | c-Pr(1-CN) | $CH_2N(Me)C(=O)OMe$ | Me | C(=O)Me | O |

TABLE 440

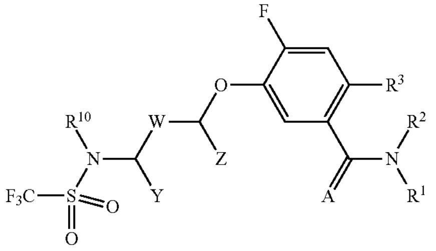

| Compound Number | Y | W | Z | $R^1$ | $R^2$ | $R^3$ | $R^{10}$ | A |
|---|---|---|---|---|---|---|---|---|
| C-9325 | H | single bond | Me | $CH_2CF_3$ | H | Cl | c-Pr | O |
| C-9326 | Me | single bond | H | $CH_2CF_3$ | H | Cl | c-Pr | O |
| C-9327 | Me(R) | single bond | H | $CH_2CF_3$ | H | Cl | c-Pr | O |
| C-9328 | Me(S) | single bond | H | $CH_2CF_3$ | H | Cl | c-Pr | O |
| C-9329 | H | single bond | Me | Et | H | Cl | c-Pr | O |
| C-9330 | Me | single bond | H | Et | H | Cl | c-Pr | O |
| C-9331 | Me(R) | single bond | H | Et | H | Cl | c-Pr | O |
| C-9332 | Me(S) | single bond | H | Et | H | Cl | c-Pr | O |
| C-9333 | H | single bond | Me | c-Pr | H | Cl | c-Pr | O |
| C-9334 | Me | single bond | H | c-Pr | H | Cl | c-Pr | O |
| C-9335 | Me(R) | single bond | H | c-Pr | H | Cl | c-Pr | O |
| C-9336 | Me(S) | single bond | H | c-Pr | H | Cl | c-Pr | O |
| C-9337 | H | single bond | Me | c-Pr(1-CN) | H | Cl | c-Pr | O |
| C-9338 | Me | single bond | H | c-Pr(1-CN) | H | Cl | c-Pr | O |
| C-9339 | Me(R) | single bond | H | c-Pr(1-CN) | H | Cl | c-Pr | O |
| C-9340 | Me(S) | single bond | H | c-Pr(1-CN) | H | Cl | c-Pr | O |
| C-9341 | H | single bond | Me | $CH_2CF_3$ | H | Me | c-Pr | O |
| C-9342 | Me | single bond | H | $CH_2CF_3$ | H | Me | c-Pr | O |
| C-9343 | Me(R) | single bond | H | $CH_2CF_3$ | H | Me | c-Pr | O |
| C-9344 | Me(S) | single bond | H | $CH_2CF_3$ | H | Me | c-Pr | O |

TABLE 440-continued

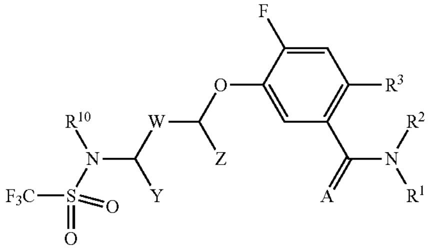

| Compound Number | Y | W | Z | $R^1$ | $R^2$ | $R^3$ | $R^{10}$ | A |
|---|---|---|---|---|---|---|---|---|
| C-9345 | H | single bond | Me | Et | H | Me | c-Pr | O |
| C-9346 | Me | single bond | H | Et | H | Me | c-Pr | O |
| C-9347 | Me(R) | single bond | H | Et | H | Me | c-Pr | O |
| C-9348 | Me(S) | single bond | H | Et | H | Me | c-Pr | O |
| C-9349 | H | single bond | Me | c-Pr | H | Me | c-Pr | O |
| C-9350 | Me | single bond | H | c-Pr | H | Me | c-Pr | O |
| C-9351 | Me(R) | single bond | H | c-Pr | H | Me | c-Pr | O |
| C-9352 | Me(S) | single bond | H | c-Pr | H | Me | c-Pr | O |
| C-9353 | H | single bond | Me | c-Pr(1-CN) | H | Me | c-Pr | O |
| C-9354 | Me | single bond | H | c-Pr(1-CN) | H | Me | c-Pr | O |
| C-9355 | Me(R) | single bond | H | c-Pr(1-CN) | H | Me | c-Pr | O |
| C-9356 | Me(S) | single bond | H | c-Pr(1-CN) | H | Me | c-Pr | O |
| C-9357 | H | single bond | Me | $CH_2CF_3$ | H | Cl | OMe | O |
| C-9358 | Me | single bond | H | $CH_2CF_3$ | H | Cl | OMe | O |
| C-9359 | Me(R) | single bond | H | $CH_2CF_3$ | H | Cl | OMe | O |
| C-9360 | Me(S) | single bond | H | $CH_2CF_3$ | H | Cl | OMe | O |
| C-9361 | H | single bond | Me | Et | H | Cl | OMe | O |
| C-9362 | Me | single bond | H | Et | H | Cl | OMe | O |

TABLE 441

| Compound Number | Y | W | Z | $R^1$ | $R^2$ | $R^3$ | $R^{10}$ | A |
|---|---|---|---|---|---|---|---|---|
| C-9363 | Me(R) | single bond | H | Et | H | Cl | OMe | O |
| C-9364 | Me(S) | single bond | H | Et | H | Cl | OMe | O |
| C-9365 | H | single bond | Me | c-Pr | H | Cl | OMe | O |
| C-9366 | Me | single bond | H | c-Pr | H | Cl | OMe | O |
| C-9367 | Me(R) | single bond | H | c-Pr | H | Cl | OMe | O |
| C-9368 | Me(S) | single bond | H | c-Pr | H | Cl | OMe | O |
| C-9369 | H | single bond | Me | c-Pr(1-CN) | H | Cl | OMe | O |
| C-9370 | Me | single bond | H | c-Pr(1-CN) | H | Cl | OMe | O |
| C-9371 | Me(R) | single bond | H | c-Pr(1-CN) | H | Cl | OMe | O |
| C-9372 | Me(S) | single bond | H | c-Pr(1-CN) | H | Cl | OMe | O |
| C-9373 | H | single bond | Me | $CH_2CF_3$ | H | Me | OMe | O |
| C-9374 | Me | single bond | H | $CH_2CF_3$ | H | Me | OMe | O |
| C-9375 | Me(R) | single bond | H | $CH_2CF_3$ | H | Me | OMe | O |
| C-9376 | Me(S) | single bond | H | $CH_2CF_3$ | H | Me | OMe | O |
| C-9377 | H | single bond | Me | Et | H | Me | OMe | O |
| C-9378 | Me | single bond | H | Et | H | Me | OMe | O |
| C-9379 | Me(R) | single bond | H | Et | H | Me | OMe | O |
| C-9380 | Me(S) | single bond | H | Et | H | Me | OMe | O |
| C-9381 | H | single bond | Me | c-Pr | H | Me | OMe | O |
| C-9382 | Me | single bond | H | c-Pr | H | Me | OMe | O |
| C-9383 | Me(R) | single bond | H | c-Pr | H | Me | OMe | O |

TABLE 441-continued

| Compound Number | Y | W | Z | $R^1$ | $R^2$ | $R^3$ | $R^{10}$ | A |
|---|---|---|---|---|---|---|---|---|
| C-9384 | Me(S) | single bond | H | c-Pr | H | Me | OMe | O |
| C-9385 | H | single bond | Me | c-Pr(1-CN) | H | Me | OMe | O |
| C-9386 | Me | single bond | H | c-Pr(1-CN) | H | Me | OMe | O |
| C-9387 | Me(R) | single bond | H | c-Pr(1-CN) | H | Me | OMe | O |
| C-9388 | Me(S) | single bond | H | c-Pr(1-CN) | H | Me | OMe | O |
| C-9389 | H | single bond | Me | $CH_2CF_3$ | H | Cl | C(=O)(i-Pr) | O |
| C-9390 | Me | single bond | H | $CH_2CF_3$ | H | Cl | C(=O)(i-Pr) | O |
| C-9391 | Me(R) | single bond | H | $CH_2CF_3$ | H | Cl | C(=O)(i-Pr) | O |
| C-9392 | Me(S) | single bond | H | $CH_2CF_3$ | H | Cl | C(=O)(i-Pr) | O |
| C-9393 | H | single bond | Me | Et | H | Cl | C(=O)(i-Pr) | O |
| C-9394 | Me | single bond | H | Et | H | Cl | C(=O)(i-Pr) | O |
| C-9395 | Me(R) | single bond | H | Et | H | Cl | C(=O)(i-Pr) | O |
| C-9396 | Me(S) | single bond | H | Et | H | Cl | C(=O)(i-Pr) | O |
| C-9397 | H | single bond | Me | c-Pr | H | Cl | C(=O)(i-Pr) | O |
| C-9398 | Me | single bond | H | c-Pr | H | Cl | C(=O)(i-Pr) | O |
| C-9399 | Me(R) | single bond | H | c-Pr | H | Cl | C(=O)(i-Pr) | O |
| C-9400 | Me(S) | single bond | H | c-Pr | H | Cl | C(=O)(i-Pr) | O |
| C-9401 | H | single bond | Me | c-Pr(1-CN) | H | Cl | C(=O)(i-Pr) | O |
| C-9402 | Me | single bond | H | c-Pr(1-CN) | H | Cl | C(=O)(i-Pr) | O |
| C-9403 | Me(R) | single bond | H | c-Pr(1-CN) | H | Cl | C(=O)(i-Pr) | O |
| C-9404 | Me(S) | single bond | H | c-Pr(1-CN) | H | Cl | C(=O)(i-Pr) | O |
| C-9405 | H | single bond | Me | $CH_2CF_3$ | H | Me | C(=O)(i-Pr) | O |
| C-9406 | Me | single bond | H | $CH_2CF_3$ | H | Me | C(=O)(i-Pr) | O |

TABLE 442

| Compound Number | Y | W | Z | $R^1$ | $R^2$ | $R^3$ | $R^{10}$ | A |
|---|---|---|---|---|---|---|---|---|
| C-9407 | Me(R) | single bond | H | $CH_2CF_3$ | H | Me | C(=O)(i-Pr) | O |
| C-9408 | Me(S) | single bond | H | $CH_2CF_3$ | H | Me | C(=O)(i-Pr) | O |
| C-9409 | H | single bond | Me | Et | H | Me | C(=O)(i-Pr) | O |
| C-9410 | Me | single bond | H | Et | H | Me | C(=O)(i-Pr) | O |
| C-9411 | Me(R) | single bond | H | Et | H | Me | C(=O)(i-Pr) | O |
| C-9412 | Me(S) | single bond | H | Et | H | Me | C(=O)(i-Pr) | O |
| C-9413 | H | single bond | Me | c-Pr | H | Me | C(=O)(i-Pr) | O |
| C-9414 | Me | single bond | H | c-Pr | H | Me | C(=O)(i-Pr) | O |
| C-9415 | Me(R) | single bond | H | c-Pr | H | Me | C(=O)(i-Pr) | O |
| C-9416 | Me(S) | single bond | H | c-Pr | H | Me | C(=O)(i-Pr) | O |
| C-9417 | H | single bond | Me | c-Pr(1-CN) | H | Me | C(=O)(i-Pr) | O |
| C-9418 | Me | single bond | H | c-Pr(1-CN) | H | Me | C(=O)(i-Pr) | O |
| C-9419 | Me(R) | single bond | H | c-Pr(1-CN) | H | Me | C(=O)(i-Pr) | O |
| C-9420 | Me(S) | single bond | H | c-Pr(1-CN) | H | Me | C(=O)(i-Pr) | O |
| C-9421 | H | single bond | Me | $CH_2CF_3$ | H | Cl | C(=O)O(t-Bu) | O |
| C-9422 | Me | single bond | H | $CH_2CF_3$ | H | Cl | C(=O)O(t-Bu) | O |
| C-9423 | Me(R) | single bond | H | $CH_2CF_3$ | H | Cl | C(=O)O(t-Bu) | O |
| C-9424 | Me(S) | single bond | H | $CH_2CF_3$ | H | Cl | C(=O)O(t-Bu) | O |
| C-9425 | H | single bond | Me | Et | H | Cl | C(=O)O(t-Bu) | O |
| C-9426 | Me | single bond | H | Et | H | Cl | C(=O)O(t-Bu) | O |
| C-9427 | Me(R) | single bond | H | Et | H | Cl | C(=O)O(t-Bu) | O |
| C-9428 | Me(S) | single bond | H | Et | H | Cl | C(=O)O(t-Bu) | O |
| C-9429 | H | single bond | Me | c-Pr | H | Cl | C(=O)O(t-Bu) | O |
| C-9430 | Me | single bond | H | c-Pr | H | Cl | C(=O)O(t-Bu) | O |
| C-9431 | Me(R) | single bond | H | c-Pr | H | Cl | C(=O)O(t-Bu) | O |
| C-9432 | Me(S) | single bond | H | c-Pr | H | Cl | C(=O)O(t-Bu) | O |
| C-9433 | H | single bond | Me | c-Pr(1-CN) | H | Cl | C(=O)O(t-Bu) | O |
| C-9434 | Me | single bond | H | c-Pr(1-CN) | H | Cl | C(=O)O(t-Bu) | O |
| C-9435 | Me(R) | single bond | H | c-Pr(1-CN) | H | Cl | C(=O)O(t-Bu) | O |
| C-9436 | Me(S) | single bond | H | c-Pr(1-CN) | H | Cl | C(=O)O(t-Bu) | O |
| C-9437 | H | single bond | Me | $CH_2CF_3$ | H | Me | C(=O)O(t-Bu) | O |
| C-9438 | Me | single bond | H | $CH_2CF_3$ | H | Me | C(=O)O(t-Bu) | O |
| C-9439 | Me(R) | single bond | H | $CH_2CF_3$ | H | Me | C(=O)O(t-Bu) | O |
| C-9440 | Me(S) | single bond | H | $CH_2CF_3$ | H | Me | C(=O)O(t-Bu) | O |
| C-9441 | H | single bond | Me | Et | H | Me | C(=O)O(t-Bu) | O |
| C-9442 | Me | single bond | H | Et | H | Me | C(=O)O(t-Bu) | O |
| C-9443 | Me(R) | single bond | H | Et | H | Me | C(=O)O(t-Bu) | O |
| C-9444 | Me(S) | single bond | H | Et | H | Me | C(=O)O(t-Bu) | O |
| C-9445 | H | single bond | Me | c-Pr | H | Me | C(=O)O(t-Bu) | O |
| C-9446 | Me | single bond | H | c-Pr | H | Me | C(=O)O(t-Bu) | O |
| C-9447 | Me(R) | single bond | H | c-Pr | H | Me | C(=O)O(t-Bu) | O |
| C-9448 | Me(S) | single bond | H | c-Pr | H | Me | C(=O)O(t-Bu) | O |

TABLE 442-continued

| Compound Number | Y | W | Z | $R^1$ | $R^2$ | $R^3$ | $R^{10}$ | A |
|---|---|---|---|---|---|---|---|---|
| C-9449 | H | single bond | Me | c-Pr(1-CN) | H | Me | C(═O)O(t-Bu) | O |
| C-9450 | Me | single bond | H | c-Pr(1-CN) | H | Me | C(═O)O(t-Bu) | O |

TABLE 443

| Compound Number | Y | W | Z | $R^1$ | $R^2$ | $R^3$ | $R^{10}$ | A |
|---|---|---|---|---|---|---|---|---|
| C-9451 | Me(R) | single bond | H | c-Pr(1-CN) | H | Me | C(═O)O(t-Bu) | O |
| C-9452 | Me(S) | single bond | H | c-Pr(1-CN) | H | Me | C(═O)O(t-Bu) | O |
| C-9453 | H | single bond | Me | $CH_2CF_3$ | H | Cl | $CH_2OEt$ | O |
| C-9454 | Me | single bond | H | $CH_2CF_3$ | H | Cl | $CH_2OEt$ | O |
| C-9455 | Me(R) | single bond | H | $CH_2CF_3$ | H | Cl | $CH_2OEt$ | O |
| C-9456 | Me(S) | single bond | H | $CH_2CF_3$ | H | Cl | $CH_2OEt$ | O |
| C-9457 | H | single bond | Me | Et | H | Cl | $CH_2OEt$ | O |
| C-9458 | Me | single bond | H | Et | H | Cl | $CH_2OEt$ | O |
| C-9459 | Me(R) | single bond | H | Et | H | Cl | $CH_2OEt$ | O |
| C-9460 | Me(S) | single bond | H | Et | H | Cl | $CH_2OEt$ | O |
| C-9461 | H | single bond | Me | c-Pr | H | Cl | $CH_2OEt$ | O |
| C-9462 | Me | single bond | H | c-Pr | H | Cl | $CH_2OEt$ | O |
| C-9463 | Me(R) | single bond | H | c-Pr | H | Cl | $CH_2OEt$ | O |
| C-9464 | Me(S) | single bond | H | c-Pr | H | Cl | $CH_2OEt$ | O |
| C-9465 | H | single bond | Me | c-Pr(1-CN) | H | Cl | $CH_2OEt$ | O |
| C-9466 | Me | single bond | H | c-Pr(1-CN) | H | Cl | $CH_2OEt$ | O |
| C-9467 | Me(R) | single bond | H | c-Pr(1-CN) | H | Cl | $CH_2OEt$ | O |
| C-9468 | Me(S) | single bond | H | c-Pr(1-CN) | H | Cl | $CH_2OEt$ | O |
| C-9469 | H | single bond | Me | $CH_2CF_3$ | H | Me | $CH_2OEt$ | O |
| C-9470 | Me | single bond | H | $CH_2CF_3$ | H | Me | $CH_2OEt$ | O |
| C-9471 | Me(R) | single bond | H | $CH_2CF_3$ | H | Me | $CH_2OEt$ | O |
| C-9472 | Me(S) | single bond | H | $CH_2CF_3$ | H | Me | $CH_2OEt$ | O |
| C-9473 | H | single bond | Me | Et | H | Me | $CH_2OEt$ | O |
| C-9474 | Me | single bond | H | Et | H | Me | $CH_2OEt$ | O |
| C-9475 | Me(R) | single bond | H | Et | H | Me | $CH_2OEt$ | O |
| C-9476 | Me(S) | single bond | H | Et | H | Me | $CH_2OEt$ | O |
| C-9477 | H | single bond | Me | c-Pr | H | Me | $CH_2OEt$ | O |
| C-9478 | Me | single bond | H | c-Pr | H | Me | $CH_2OEt$ | O |
| C-9479 | Me(R) | single bond | H | c-Pr | H | Me | $CH_2OEt$ | O |
| C-9480 | Me(S) | single bond | H | c-Pr | H | Me | $CH_2OEt$ | O |
| C-9481 | H | single bond | Me | c-Pr(1-CN) | H | Me | $CH_2OEt$ | O |
| C-9482 | Me | single bond | H | c-Pr(1-CN) | H | Me | $CH_2OEt$ | O |
| C-9483 | Me(R) | single bond | H | c-Pr(1-CN) | H | Me | $CH_2OEt$ | O |
| C-9484 | Me(S) | single bond | H | c-Pr(1-CN) | H | Me | $CH_2OEt$ | O |
| C-9485 | H | single bond | Me | $CH_2CF_3$ | H | Cl | $CH_2SMe$ | O |
| C-9486 | Me | single bond | H | $CH_2CF_3$ | H | Cl | $CH_2SMe$ | O |
| C-9487 | Me(R) | single bond | H | $CH_2CF_3$ | H | Cl | $CH_2SMe$ | O |
| C-9488 | Me(S) | single bond | H | $CH_2CF_3$ | H | Cl | $CH_2SMe$ | O |
| C-9489 | H | single bond | Me | Et | H | Cl | $CH_2SMe$ | O |
| C-9490 | Me | single bond | H | Et | H | Cl | $CH_2SMe$ | O |
| C-9491 | Me(R) | single bond | H | Et | H | Cl | $CH_2SMe$ | O |
| C-9492 | Me(S) | single bond | H | Et | H | Cl | $CH_2SMe$ | O |
| C-9493 | H | single bond | Me | c-Pr | H | Cl | $CH_2SMe$ | O |
| C-9494 | Me | single bond | H | c-Pr | H | Cl | $CH_2SMe$ | O |

TABLE 444

| Compound Number | Y | W | Z | $R^1$ | $R^2$ | $R^3$ | $R^{10}$ | A |
|---|---|---|---|---|---|---|---|---|
| C-9495 | Me(R) | single bond | H | c-Pr | H | Cl | $CH_2SMe$ | O |
| C-9496 | Me(S) | single bond | H | c-Pr | H | Cl | $CH_2SMe$ | O |
| C-9497 | H | single bond | Me | c-Pr(1-CN) | H | Cl | $CH_2SMe$ | O |
| C-9498 | Me | single bond | H | c-Pr(1-CN) | H | Cl | $CH_2SMe$ | O |
| C-9499 | Me(R) | single bond | H | c-Pr(1-CN) | H | Cl | $CH_2SMe$ | O |
| C-9500 | Me(S) | single bond | H | c-Pr(1-CN) | H | Cl | $CH_2SMe$ | O |
| C-9501 | H | single bond | Me | $CH_2CF_3$ | H | Me | $CH_2SMe$ | O |
| C-9502 | Me | single bond | H | $CH_2CF_3$ | H | Me | $CH_2SMe$ | O |
| C-9503 | Me(R) | single bond | H | $CH_2CF_3$ | H | Me | $CH_2SMe$ | O |
| C-9504 | Me(S) | single bond | H | $CH_2CF_3$ | H | Me | $CH_2SMe$ | O |
| C-9505 | H | single bond | Me | Et | H | Me | $CH_2SMe$ | O |
| C-9506 | Me | single bond | H | Et | H | Me | $CH_2SMe$ | O |

TABLE 444-continued

| Compound Number | Y | W | Z | $R^1$ | $R^2$ | $R^3$ | $R^{10}$ | A |
|---|---|---|---|---|---|---|---|---|
| C-9507 | Me(R) | single bond | H | Et | H | Me | $CH_2SMe$ | O |
| C-9508 | Me(S) | single bond | H | Et | H | Me | $CH_2SMe$ | O |
| C-9509 | H | single bond | Me | c-Pr | H | Me | $CH_2SMe$ | O |
| C-9510 | Me | single bond | H | c-Pr | H | Me | $CH_2SMe$ | O |
| C-9511 | Me(R) | single bond | H | c-Pr | H | Me | $CH_2SMe$ | O |
| C-9512 | Me(S) | single bond | H | c-Pr | H | Me | $CH_2SMe$ | O |
| C-9513 | H | single bond | Me | c-Pr(1-CN) | H | Me | $CH_2SMe$ | O |
| C-9514 | Me | single bond | H | c-Pr(1-CN) | H | Me | $CH_2SMe$ | O |
| C-9515 | Me(R) | single bond | H | c-Pr(1-CN) | H | Me | $CH_2SMe$ | O |
| C-9516 | Me(S) | single bond | H | c-Pr(1-CN) | H | Me | $CH_2SMe$ | O |
| C-9517 | H | single bond | Me | $CH_2CF_3$ | H | Cl | $CH_2S({=}O)_2Me$ | O |
| C-9518 | Me | single bond | H | $CH_2CF_3$ | H | Cl | $CH_2S({=}O)_2Me$ | O |
| C-9519 | Me(R) | single bond | H | $CH_2CF_3$ | H | Cl | $CH_2S({=}O)_2Me$ | O |
| C-9520 | Me(S) | single bond | H | $CH_2CF_3$ | H | Cl | $CH_2S({=}O)_2Me$ | O |
| C-9521 | H | single bond | Me | Et | H | Cl | $CH_2S({=}O)_2Me$ | O |
| C-9522 | Me | single bond | H | Et | H | Cl | $CH_2S({=}O)_2Me$ | O |
| C-9523 | Me(R) | single bond | H | Et | H | Cl | $CH_2S({=}O)_2Me$ | O |
| C-9524 | Me(S) | single bond | H | Et | H | Cl | $CH_2S({=}O)_2Me$ | O |
| C-9525 | H | single bond | Me | c-Pr | H | Cl | $CH_2S({=}O)_2Me$ | O |
| C-9526 | Me | single bond | H | c-Pr | H | Cl | $CH_2S({=}O)_2Me$ | O |
| C-9527 | Me(R) | single bond | H | c-Pr | H | Cl | $CH_2S({=}O)_2Me$ | O |
| C-9528 | Me(S) | single bond | H | c-Pr | H | Cl | $CH_2S({=}O)_2Me$ | O |
| C-9529 | H | single bond | Me | c-Pr(1-CN) | H | Cl | $CH_2S({=}O)_2Me$ | O |
| C-9530 | Me | single bond | H | c-Pr(1-CN) | H | Cl | $CH_2S({=}O)_2Me$ | O |
| C-9531 | Me(R) | single bond | H | c-Pr(1-CN) | H | Cl | $CH_2S({=}O)_2Me$ | O |
| C-9532 | Me(S) | single bond | H | c-Pr(1-CN) | H | Cl | $CH_2S({=}O)_2Me$ | O |
| C-9533 | H | single bond | Me | $CH_2CF_3$ | H | Me | $CH_2S({=}O)_2Me$ | O |
| C-9534 | Me | single bond | H | $CH_2CF_3$ | H | Me | $CH_2S({=}O)_2Me$ | O |
| C-9535 | Me(R) | single bond | H | $CH_2CF_3$ | H | Me | $CH_2S({=}O)_2Me$ | O |
| C-9536 | Me(S) | single bond | H | $CH_2CF_3$ | H | Me | $CH_2S({=}O)_2Me$ | O |
| C-9537 | H | single bond | Me | Et | H | Me | $CH_2S({=}O)_2Me$ | O |
| C-9538 | Me | single bond | H | Et | H | Me | $CH_2S({=}O)_2Me$ | O |

TABLE 445

| Compound Number | Y | W | Z | $R^1$ | $R^2$ | $R^3$ | $R^{10}$ | A |
|---|---|---|---|---|---|---|---|---|
| C-9539 | Me(R) | single bond | H | Et | H | Me | $CH_2S({=}O)_2Me$ | O |
| C-9540 | Me(S) | single bond | H | Et | H | Me | $CH_2S({=}O)_2Me$ | O |
| C-9541 | H | single bond | Me | c-Pr | H | Me | $CH_2S({=}O)_2Me$ | O |
| C-9542 | Me | single bond | H | c-Pr | H | Me | $CH_2S({=}O)_2Me$ | O |
| C-9543 | Me(R) | single bond | H | c-Pr | H | Me | $CH_2S({=}O)_2Me$ | O |
| C-9544 | Me(S) | single bond | H | c-Pr | H | Me | $CH_2S({=}O)_2Me$ | O |
| C-9545 | H | single bond | Me | c-Pr(1-CN) | H | Me | $CH_2S({=}O)_2Me$ | O |
| C-9546 | Me | single bond | H | c-Pr(1-CN) | H | Me | $CH_2S({=}O)_2Me$ | O |
| C-9547 | Me(R) | single bond | H | c-Pr(1-CN) | H | Me | $CH_2S({=}O)_2Me$ | O |
| C-9548 | Me(S) | single bond | H | c-Pr(1-CN) | H | Me | $CH_2S({=}O)_2Me$ | O |
| C-9549 | H | single bond | Me | $CH_2CF_3$ | H | Cl | $CH_2C({=}O)Me$ | O |
| C-9550 | Me | single bond | H | $CH_2CF_3$ | H | Cl | $CH_2C({=}O)Me$ | O |
| C-9551 | Me(R) | single bond | H | $CH_2CF_3$ | H | Cl | $CH_2C({=}O)Me$ | O |
| C-9552 | Me(S) | single bond | H | $CH_2CF_3$ | H | Cl | $CH_2C({=}O)Me$ | O |
| C-9553 | H | single bond | Me | Et | H | Cl | $CH_2C({=}O)Me$ | O |
| C-9554 | Me | single bond | H | Et | H | Cl | $CH_2C({=}O)Me$ | O |
| C-9555 | Me(R) | single bond | H | Et | H | Cl | $CH_2C({=}O)Me$ | O |
| C-9556 | Me(S) | single bond | H | Et | H | Cl | $CH_2C({=}O)Me$ | O |
| C-9557 | H | single bond | Me | c-Pr | H | Cl | $CH_2C({=}O)Me$ | O |
| C-9558 | Me | single bond | H | c-Pr | H | Cl | $CH_2C({=}O)Me$ | O |
| C-9559 | Me(R) | single bond | H | c-Pr | H | Cl | $CH_2C({=}O)Me$ | O |
| C-9560 | Me(S) | single bond | H | c-Pr | H | Cl | $CH_2C({=}O)Me$ | O |
| C-9561 | H | single bond | Me | c-Pr(1-CN) | H | Cl | $CH_2C({=}O)Me$ | O |
| C-9562 | Me | single bond | H | c-Pr(1-CN) | H | Cl | $CH_2C({=}O)Me$ | O |
| C-9563 | Me(R) | single bond | H | c-Pr(1-CN) | H | Cl | $CH_2C({=}O)Me$ | O |
| C-9564 | Me(S) | single bond | H | c-Pr(1-CN) | H | Cl | $CH_2C({=}O)Me$ | O |
| C-9565 | H | single bond | Me | $CH_2CF_3$ | H | Me | $CH_2C({=}O)Me$ | O |
| C-9566 | Me | single bond | H | $CH_2CF_3$ | H | Me | $CH_2C({=}O)Me$ | O |
| C-9567 | Me(R) | single bond | H | $CH_2CF_3$ | H | Me | $CH_2C({=}O)Me$ | O |
| C-9568 | Me(S) | single bond | H | $CH_2CF_3$ | H | Me | $CH_2C({=}O)Me$ | O |
| C-9569 | H | single bond | Me | Et | H | Me | $CH_2C({=}O)Me$ | O |
| C-9570 | Me | single bond | H | Et | H | Me | $CH_2C({=}O)Me$ | O |
| C-9571 | Me(R) | single bond | H | Et | H | Me | $CH_2C({=}O)Me$ | O |
| C-9572 | Me(S) | single bond | H | Et | H | Me | $CH_2C({=}O)Me$ | O |
| C-9573 | H | single bond | Me | c-Pr | H | Me | $CH_2C({=}O)Me$ | O |

TABLE 445-continued

| Compound Number | Y | W | Z | $R^1$ | $R^2$ | $R^3$ | $R^{10}$ | A |
|---|---|---|---|---|---|---|---|---|
| C-9574 | Me | single bond | H | c-Pr | H | Me | $CH_2C({=}O)Me$ | O |
| C-9575 | Me(R) | single bond | H | c-Pr | H | Me | $CH_2C({=}O)Me$ | O |
| C-9576 | Me(S) | single bond | H | c-Pr | H | Me | $CH_2C({=}O)Me$ | O |
| C-9577 | H | single bond | Me | c-Pr(1-CN) | H | Me | $CH_2C({=}O)Me$ | O |
| C-9578 | Me | single bond | H | c-Pr(1-CN) | H | Me | $CH_2C({=}O)Me$ | O |
| C-9579 | Me(R) | single bond | H | c-Pr(1-CN) | H | Me | $CH_2C({=}O)Me$ | O |
| C-9580 | Me(S) | single bond | H | c-Pr(1-CN) | H | Me | $CH_2C({=}O)Me$ | O |
| C-9581 | H | single bond | Me | $CH_2CF_3$ | H | Cl | $CH_2C({=}O)OMe$ | O |
| C-9582 | Me | single bond | H | $CH_2CF_3$ | H | Cl | $CH_2C({=}O)OMe$ | O |

TABLE 446

| Compound Number | Y | W | Z | $R^1$ | $R^2$ | $R^3$ | $R^{10}$ | A |
|---|---|---|---|---|---|---|---|---|
| C-9583 | Me(R) | single bond | H | $CH_2CF_3$ | H | Cl | $CH_2C({=}O)OMe$ | O |
| C-9584 | Me(S) | single bond | H | $CH_2CF_3$ | H | Cl | $CH_2C({=}O)OMe$ | O |
| C-9585 | H | single bond | Me | Et | H | Cl | $CH_2C({=}O)OMe$ | O |
| C-9586 | Me | single bond | H | Et | H | Cl | $CH_2C({=}O)OMe$ | O |
| C-9587 | Me(R) | single bond | H | Et | H | Cl | $CH_2C({=}O)OMe$ | O |
| C-9588 | Me(S) | single bond | H | Et | H | Cl | $CH_2C({=}O)OMe$ | O |
| C-9589 | H | single bond | Me | c-Pr | H | Cl | $CH_2C({=}O)OMe$ | O |
| C-9590 | Me | single bond | H | c-Pr | H | Cl | $CH_2C({=}O)OMe$ | O |
| C-9591 | Me(R) | single bond | H | c-Pr | H | Cl | $CH_2C({=}O)OMe$ | O |
| C-9592 | Me(S) | single bond | H | c-Pr | H | Cl | $CH_2C({=}O)OMe$ | O |
| C-9593 | H | single bond | Me | c-Pr(1-CN) | H | Cl | $CH_2C({=}O)OMe$ | O |
| C-9594 | Me | single bond | H | c-Pr(1-CN) | H | Cl | $CH_2C({=}O)OMe$ | O |
| C-9595 | Me(R) | single bond | H | c-Pr(1-CN) | H | Cl | $CH_2C({=}O)OMe$ | O |
| C-9596 | Me(S) | single bond | H | c-Pr(1-CN) | H | Cl | $CH_2C({=}O)OMe$ | O |
| C-9597 | H | single bond | Me | $CH_2CF_3$ | H | Me | $CH_2C({=}O)OMe$ | O |
| C-9598 | Me | single bond | H | $CH_2CF_3$ | H | Me | $CH_2C({=}O)OMe$ | O |
| C-9599 | Me(R) | single bond | H | $CH_2CF_3$ | H | Me | $CH_2C({=}O)OMe$ | O |
| C-9600 | Me(S) | single bond | H | $CH_2CF_3$ | H | Me | $CH_2C({=}O)OMe$ | O |
| C-9601 | H | single bond | Me | Et | H | Me | $CH_2C({=}O)OMe$ | O |
| C-9602 | Me | single bond | H | Et | H | Me | $CH_2C({=}O)OMe$ | O |
| C-9603 | Me(R) | single bond | H | Et | H | Me | $CH_2C({=}O)OMe$ | O |
| C-9604 | Me(S) | single bond | H | Et | H | Me | $CH_2C({=}O)OMe$ | O |
| C-9605 | H | single bond | Me | c-Pr | H | Me | $CH_2C({=}O)OMe$ | O |
| C-9606 | Me | single bond | H | c-Pr | H | Me | $CH_2C({=}O)OMe$ | O |
| C-9607 | Me(R) | single bond | H | c-Pr | H | Me | $CH_2C({=}O)OMe$ | O |
| C-9608 | Me(S) | single bond | H | c-Pr | H | Me | $CH_2C({=}O)OMe$ | O |
| C-9609 | H | single bond | Me | c-Pr(1-CN) | H | Me | $CH_2C({=}O)OMe$ | O |
| C-9610 | Me | single bond | H | c-Pr(1-CN) | H | Me | $CH_2C({=}O)OMe$ | O |
| C-9611 | Me(R) | single bond | H | c-Pr(1-CN) | H | Me | $CH_2C({=}O)OMe$ | O |
| C-9612 | Me(S) | single bond | H | c-Pr(1-CN) | H | Me | $CH_2C({=}O)OMe$ | O |
| C-9613 | H | single bond | Me | $CH_2CF_3$ | H | Cl | $CH_2C({=}O)NHMe$ | O |
| C-9614 | Me | single bond | H | $CH_2CF_3$ | H | Cl | $CH_2C({=}O)NHMe$ | O |
| C-9615 | Me(R) | single bond | H | $CH_2CF_3$ | H | Cl | $CH_2C({=}O)NHMe$ | O |
| C-9616 | Me(S) | single bond | H | $CH_2CF_3$ | H | Cl | $CH_2C({=}O)NHMe$ | O |
| C-9617 | H | single bond | Me | Et | H | Cl | $CH_2C({=}O)NHMe$ | O |
| C-9618 | Me | single bond | H | Et | H | Cl | $CH_2C({=}O)NHMe$ | O |
| C-9619 | Me(R) | single bond | H | Et | H | Cl | $CH_2C({=}O)NHMe$ | O |
| C-9620 | Me(S) | single bond | H | Et | H | Cl | $CH_2C({=}O)NHMe$ | O |
| C-9621 | H | single bond | Me | c-Pr | H | Cl | $CH_2C({=}O)NHMe$ | O |
| C-9622 | Me | single bond | H | c-Pr | H | Cl | $CH_2C({=}O)NHMe$ | O |
| C-9623 | Me(R) | single bond | H | c-Pr | H | Cl | $CH_2C({=}O)NHMe$ | O |
| C-9624 | Me(S) | single bond | H | c-Pr | H | Cl | $CH_2C({=}O)NHMe$ | O |
| C-9625 | H | single bond | Me | c-Pr(1-CN) | H | Cl | $CH_2C({=}O)NHMe$ | O |
| C-9626 | Me | single bond | H | c-Pr(1-CN) | H | Cl | $CH_2C({=}O)NHMe$ | O |

TABLE 447

| Compound Number | Y | W | Z | $R^1$ | $R^2$ | $R^3$ | $R^{10}$ | A |
|---|---|---|---|---|---|---|---|---|
| C-9627 | Me(R) | single bond | H | c-Pr(1-CN) | H | Cl | $CH_2C({=}O)NHMe$ | O |
| C-9628 | Me(S) | single bond | H | c-Pr(1-CN) | H | Cl | $CH_2C({=}O)NHMe$ | O |
| C-9629 | H | single bond | Me | $CH_2CF_3$ | H | Me | $CH_2C({=}O)NHMe$ | O |

TABLE 447-continued

| Compound Number | Y | W | Z | $R^1$ | $R^2$ | $R^3$ | $R^{10}$ | A |
|---|---|---|---|---|---|---|---|---|
| C-9630 | Me | single bond | H | $CH_2CF_3$ | H | Me | $CH_2C(=O)NHMe$ | O |
| C-9631 | Me(R) | single bond | H | $CH_2CF_3$ | H | Me | $CH_2C(=O)NHMe$ | O |
| C-9632 | Me(S) | single bond | H | $CH_2CF_3$ | H | Me | $CH_2C(=O)NHMe$ | O |
| C-9633 | H | single bond | Me | Et | H | Me | $CH_2C(=O)NHMe$ | O |
| C-9634 | Me | single bond | H | Et | H | Me | $CH_2C(=O)NHMe$ | O |
| C-9635 | Me(R) | single bond | H | Et | H | Me | $CH_2C(=O)NHMe$ | O |
| C-9636 | Me(S) | single bond | H | Et | H | Me | $CH_2C(=O)NHMe$ | O |
| C-9637 | H | single bond | Me | c-Pr | H | Me | $CH_2C(=O)NHMe$ | O |
| C-9638 | Me | single bond | H | c-Pr | H | Me | $CH_2C(=O)NHMe$ | O |
| C-9639 | Me(R) | single bond | H | c-Pr | H | Me | $CH_2C(=O)NHMe$ | O |
| C-9640 | Me(S) | single bond | H | c-Pr | H | Me | $CH_2C(=O)NHMe$ | O |
| C-9641 | H | single bond | Me | c-Pr(1-CN) | H | Me | $CH_2C(=O)NHMe$ | O |
| C-9642 | Me | single bond | H | c-Pr(1-CN) | H | Me | $CH_2C(=O)NHMe$ | O |
| C-9643 | Me(R) | single bond | H | c-Pr(1-CN) | H | Me | $CH_2C(=O)NHMe$ | O |
| C-9644 | Me(S) | single bond | H | c-Pr(1-CN) | H | Me | $CH_2C(=O)NHMe$ | O |
| C-9645 | H | single bond | Me | $CH_2CF_3$ | H | Cl | $CH_2OC(=O)Me$ | O |
| C-9646 | Me | single bond | H | $CH_2CF_3$ | H | Cl | $CH_2OC(=O)Me$ | O |
| C-9647 | Me(R) | single bond | H | $CH_2CF_3$ | H | Cl | $CH_2OC(=O)Me$ | O |
| C-9648 | Me(S) | single bond | H | $CH_2CF_3$ | H | Cl | $CH_2OC(=O)Me$ | O |
| C-9649 | H | single bond | Me | Et | H | Cl | $CH_2OC(=O)Me$ | O |
| C-9650 | Me | single bond | H | Et | H | Cl | $CH_2OC(=O)Me$ | O |
| C-9651 | Me(R) | single bond | H | Et | H | Cl | $CH_2OC(=O)Me$ | O |
| C-9652 | Me(S) | single bond | H | Et | H | Cl | $CH_2OC(=O)Me$ | O |
| C-9653 | H | single bond | Me | c-Pr | H | Cl | $CH_2OC(=O)Me$ | O |
| C-9654 | Me | single bond | H | c-Pr | H | Cl | $CH_2OC(=O)Me$ | O |
| C-9655 | Me(R) | single bond | H | c-Pr | H | Cl | $CH_2OC(=O)Me$ | O |
| C-9656 | Me(S) | single bond | H | c-Pr | H | Cl | $CH_2OC(=O)Me$ | O |
| C-9657 | H | single bond | Me | c-Pr(1-CN) | H | Cl | $CH_2OC(=O)Me$ | O |
| C-9658 | Me | single bond | H | c-Pr(1-CN) | H | Cl | $CH_2OC(=O)Me$ | O |
| C-9659 | Me(R) | single bond | H | c-Pr(1-CN) | H | Cl | $CH_2OC(=O)Me$ | O |
| C-9660 | Me(S) | single bond | H | c-Pr(1-CN) | H | Cl | $CH_2OC(=O)Me$ | O |
| C-9661 | H | single bond | Me | $CH_2CF_3$ | H | Me | $CH_2OC(=O)Me$ | O |
| C-9662 | Me | single bond | H | $CH_2CF_3$ | H | Me | $CH_2OC(=O)Me$ | O |
| C-9663 | Me(R) | single bond | H | $CH_2CF_3$ | H | Me | $CH_2OC(=O)Me$ | O |
| C-9664 | Me(S) | single bond | H | $CH_2CF_3$ | H | Me | $CH_2OC(=O)Me$ | O |
| C-9665 | H | single bond | Me | Et | H | Me | $CH_2OC(=O)Me$ | O |
| C-9666 | Me | single bond | H | Et | H | Me | $CH_2OC(=O)Me$ | O |
| C-9667 | Me(R) | single bond | H | Et | H | Me | $CH_2OC(=O)Me$ | O |
| C-9668 | Me(S) | single bond | H | Et | H | Me | $CH_2OC(=O)Me$ | O |
| C-9669 | H | single bond | Me | c-Pr | H | Me | $CH_2OC(=O)Me$ | O |
| C-9670 | Me | single bond | H | c-Pr | H | Me | $CH_2OC(=O)Me$ | O |

TABLE 448

| Compound Number | Y | W | Z | $R^1$ | $R^2$ | $R^3$ | $R^{10}$ | A |
|---|---|---|---|---|---|---|---|---|
| C-9671 | Me(R) | single bond | H | c-Pr | H | Me | $CH_2OC(=O)Me$ | O |
| C-9672 | Me(S) | single bond | H | c-Pr | H | Me | $CH_2OC(=O)Me$ | O |
| C-9673 | H | single bond | Me | c-Pr(1-CN) | H | Me | $CH_2OC(=O)Me$ | O |
| C-9674 | Me | single bond | H | c-Pr(1-CN) | H | Me | $CH_2OC(=O)Me$ | O |
| C-9675 | Me(R) | single bond | H | c-Pr(1-CN) | H | Me | $CH_2OC(=O)Me$ | O |
| C-9676 | Me(S) | single bond | H | c-Pr(1-CN) | H | Me | $CH_2OC(=O)Me$ | O |
| C-9677 | H | single bond | Me | $CH_2CF_3$ | H | Cl | $CH_2OC(=O)$(i-Pr) | O |
| C-9678 | Me | single bond | H | $CH_2CF_3$ | H | Cl | $CH_2OC(=O)$(i-Pr) | O |
| C-9679 | Me(R) | single bond | H | $CH_2CF_3$ | H | Cl | $CH_2OC(=O)$(i-Pr) | O |
| C-9680 | Me(S) | single bond | H | $CH_2CF_3$ | H | Cl | $CH_2OC(=O)$(i-Pr) | O |
| C-9681 | H | single bond | Me | Et | H | Cl | $CH_2OC(=O)$(i-Pr) | O |
| C-9682 | Me | single bond | H | Et | H | Cl | $CH_2OC(=O)$(i-Pr) | O |
| C-9683 | Me(R) | single bond | H | Et | H | Cl | $CH_2OC(=O)$(i-Pr) | O |
| C-9684 | Me(S) | single bond | H | Et | H | Cl | $CH_2OC(=O)$(i-Pr) | O |
| C-9685 | H | single bond | Me | c-Pr | H | Cl | $CH_2OC(=O)$(i-Pr) | O |
| C-9686 | Me | single bond | H | c-Pr | H | Cl | $CH_2OC(=O)$(i-Pr) | O |
| C-9687 | Me(R) | single bond | H | c-Pr | H | Cl | $CH_2OC(=O)$(i-Pr) | O |
| C-9688 | Me(S) | single bond | H | c-Pr | H | Cl | $CH_2OC(=O)$(i-Pr) | O |
| C-9689 | H | single bond | Me | c-Pr(1-CN) | H | Cl | $CH_2OC(=O)$(i-Pr) | O |
| C-9690 | Me | single bond | H | c-Pr(1-CN) | H | Cl | $CH_2OC(=O)$(i-Pr) | O |
| C-9691 | Me(R) | single bond | H | c-Pr(1-CN) | H | Cl | $CH_2OC(=O)$(i-Pr) | O |
| C-9692 | Me(S) | single bond | H | c-Pr(1-CN) | H | Cl | $CH_2OC(=O)$(i-Pr) | O |
| C-9693 | H | single bond | Me | $CH_2CF_3$ | H | Me | $CH_2OC(=O)$(i-Pr) | O |
| C-9694 | Me | single bond | H | $CH_2CF_3$ | H | Me | $CH_2OC(=O)$(i-Pr) | O |
| C-9695 | Me(R) | single bond | H | $CH_2CF_3$ | H | Me | $CH_2OC(=O)$(i-Pr) | O |
| C-9696 | Me(S) | single bond | H | $CH_2CF_3$ | H | Me | $CH_2OC(=O)$(i-Pr) | O |

TABLE 448-continued

| Compound Number | Y | W | Z | $R^1$ | $R^2$ | $R^3$ | $R^{10}$ | A |
|---|---|---|---|---|---|---|---|---|
| C-9697 | H | single bond | Me | Et | H | Me | $CH_2OC(=O)(i-Pr)$ | O |
| C-9698 | Me | single bond | H | Et | H | Me | $CH_2OC(=O)(i-Pr)$ | O |
| C-9699 | Me(R) | single bond | H | Et | H | Me | $CH_2OC(=O)(i-Pr)$ | O |
| C-9700 | Me(S) | single bond | H | Et | H | Me | $CH_2OC(=O)(i-Pr)$ | O |
| C-9701 | H | single bond | Me | c-Pr | H | Me | $CH_2OC(=O)(i-Pr)$ | O |
| C-9702 | Me | single bond | H | c-Pr | H | Me | $CH_2OC(=O)(i-Pr)$ | O |
| C-9703 | Me(R) | single bond | H | c-Pr | H | Me | $CH_2OC(=O)(i-Pr)$ | O |
| C-9704 | Me(S) | single bond | H | c-Pr | H | Me | $CH_2OC(=O)(i-Pr)$ | O |
| C-9705 | H | single bond | Me | c-Pr(1-CN) | H | Me | $CH_2OC(=O)(i-Pr)$ | O |
| C-9706 | Me | single bond | H | c-Pr(1-CN) | H | Me | $CH_2OC(=O)(i-Pr)$ | O |
| C-9707 | Me(R) | single bond | H | c-Pr(1-CN) | H | Me | $CH_2OC(=O)(i-Pr)$ | O |
| C-9708 | Me(S) | single bond | H | c-Pr(1-CN) | H | Me | $CH_2OC(=O)(i-Pr)$ | O |
| C-9709 | H | single bond | Me | $CH_2CF_3$ | H | Cl | $CH_2OC(=O)(t-Bu)$ | O |
| C-9710 | Me | single bond | H | $CH_2CF_3$ | H | Cl | $CH_2OC(=O)(t-Bu)$ | O |
| C-9711 | Me(R) | single bond | H | $CH_2CF_3$ | H | Cl | $CH_2OC(=O)(t-Bu)$ | O |
| C-9712 | Me(S) | single bond | H | $CH_2CF_3$ | H | Cl | $CH_2OC(=O)(t-Bu)$ | O |
| C-9713 | H | single bond | Me | Et | H | Cl | $CH_2OC(=O)(t-Bu)$ | O |
| C-9714 | Me | single bond | H | Et | H | Cl | $CH_2OC(=O)(t-Bu)$ | O |

TABLE 449

| Compound Number | Y | W | Z | $R^1$ | $R^2$ | $R^3$ | $R^{10}$ | A |
|---|---|---|---|---|---|---|---|---|
| C-9715 | Me(R) | single bond | H | Et | H | Cl | $CH_2OC(=O)(t-Bu)$ | O |
| C-9716 | Me(S) | single bond | H | Et | H | Cl | $CH_2OC(=O)(t-Bu)$ | O |
| C-9717 | H | single bond | Me | c-Pr | H | Cl | $CH_2OC(=O)(t-Bu)$ | O |
| C-9718 | Me | single bond | H | c-Pr | H | Cl | $CH_2OC(=O)(t-Bu)$ | O |
| C-9719 | Me(R) | single bond | H | c-Pr | H | Cl | $CH_2OC(=O)(t-Bu)$ | O |
| C-9720 | Me(S) | single bond | H | c-Pr | H | Cl | $CH_2OC(=O)(t-Bu)$ | O |
| C-9721 | H | single bond | Me | c-Pr(1-CN) | H | Cl | $CH_2OC(=O)(t-Bu)$ | O |
| C-9722 | Me | single bond | H | c-Pr(1-CN) | H | Cl | $CH_2OC(=O)(t-Bu)$ | O |
| C-9723 | Me(R) | single bond | H | c-Pr(1-CN) | H | Cl | $CH_2OC(=O)(t-Bu)$ | O |
| C-9724 | Me(S) | single bond | H | c-Pr(1-CN) | H | Cl | $CH_2OC(=O)(t-Bu)$ | O |
| C-9725 | H | single bond | Me | $CH_2CF_3$ | H | Me | $CH_2OC(=O)(t-Bu)$ | O |
| C-9726 | Me | single bond | H | $CH_2CF_3$ | H | Me | $CH_2OC(=O)(t-Bu)$ | O |
| C-9727 | Me(R) | single bond | H | $CH_2CF_3$ | H | Me | $CH_2OC(=O)(t-Bu)$ | O |
| C-9728 | Me(S) | single bond | H | $CH_2CF_3$ | H | Me | $CH_2OC(=O)(t-Bu)$ | O |
| C-9729 | H | single bond | Me | Et | H | Me | $CH_2OC(=O)(t-Bu)$ | O |
| C-9730 | Me | single bond | H | Et | H | Me | $CH_2OC(=O)(t-Bu)$ | O |
| C-9731 | Me(R) | single bond | H | Et | H | Me | $CH_2OC(=O)(t-Bu)$ | O |
| C-9732 | Me(S) | single bond | H | Et | H | Me | $CH_2OC(=O)(t-Bu)$ | O |
| C-9733 | H | single bond | Me | c-Pr | H | Me | $CH_2OC(=O)(t-Bu)$ | O |
| C-9734 | Me | single bond | H | c-Pr | H | Me | $CH_2OC(=O)(t-Bu)$ | O |
| C-9735 | Me(R) | single bond | H | c-Pr | H | Me | $CH_2OC(=O)(t-Bu)$ | O |
| C-9736 | Me(S) | single bond | H | c-Pr | H | Me | $CH_2OC(=O)(t-Bu)$ | O |
| C-9737 | H | single bond | Me | c-Pr(1-CN) | H | Me | $CH_2OC(=O)(t-Bu)$ | O |
| C-9738 | Me | single bond | H | c-Pr(1-CN) | H | Me | $CH_2OC(=O)(t-Bu)$ | O |
| C-9739 | Me(R) | single bond | H | c-Pr(1-CN) | H | Me | $CH_2OC(=O)(t-Bu)$ | O |
| C-9740 | Me(S) | single bond | H | c-Pr(1-CN) | H | Me | $CH_2OC(=O)(t-Bu)$ | O |
| C-9741 | H | single bond | Me | $CH_2CF_3$ | H | Cl | $CH_2OC(=O)OEt$ | O |
| C-9742 | Me | single bond | H | $CH_2CF_3$ | H | Cl | $CH_2OC(=O)OEt$ | O |
| C-9743 | Me(R) | single bond | H | $CH_2CF_3$ | H | Cl | $CH_2OC(=O)OEt$ | O |
| C-9744 | Me(S) | single bond | H | $CH_2CF_3$ | H | Cl | $CH_2OC(=O)OEt$ | O |
| C-9745 | H | single bond | Me | Et | H | Cl | $CH_2OC(=O)OEt$ | O |
| C-9746 | Me | single bond | H | Et | H | Cl | $CH_2OC(=O)OEt$ | O |
| C-9747 | Me(R) | single bond | H | Et | H | Cl | $CH_2OC(=O)OEt$ | O |
| C-9748 | Me(S) | single bond | H | Et | H | Cl | $CH_2OC(=O)OEt$ | O |
| C-9749 | H | single bond | Me | c-Pr | H | Cl | $CH_2OC(=O)OEt$ | O |
| C-9750 | Me | single bond | H | c-Pr | H | Cl | $CH_2OC(=O)OEt$ | O |
| C-9751 | Me(R) | single bond | H | c-Pr | H | Cl | $CH_2OC(=O)OEt$ | O |
| C-9752 | Me(S) | single bond | H | c-Pr | H | Cl | $CH_2OC(=O)OEt$ | O |
| C-9753 | H | single bond | Me | c-Pr(1-CN) | H | Cl | $CH_2OC(=O)OEt$ | O |
| C-9754 | Me | single bond | H | c-Pr(1-CN) | H | Cl | $CH_2OC(=O)OEt$ | O |
| C-9755 | Me(R) | single bond | H | c-Pr(1-CN) | H | Cl | $CH_2OC(=O)OEt$ | O |
| C-9756 | Me(S) | single bond | H | c-Pr(1-CN) | H | Cl | $CH_2OC(=O)OEt$ | O |
| C-9757 | H | single bond | Me | $CH_2CF_3$ | H | Me | $CH_2OC(=O)OEt$ | O |
| C-9758 | Me | single bond | H | $CH_2CF_3$ | H | Me | $CH_2OC(=O)OEt$ | O |

TABLE 450

| Compound Number | Y | W | Z | $R^1$ | $R^2$ | $R^3$ | $R^{10}$ | A |
|---|---|---|---|---|---|---|---|---|
| C-9759 | Me(R) | single bond | H | $CH_2CF_3$ | H | Me | $CH_2OC(=O)OEt$ | O |
| C-9760 | Me(S) | single bond | H | $CH_2CF_3$ | H | Me | $CH_2OC(=O)OEt$ | O |
| C-9761 | H | single bond | Me | Et | H | Me | $CH_2OC(=O)OEt$ | O |
| C-9762 | Me | single bond | H | Et | H | Me | $CH_2OC(=O)OEt$ | O |
| C-9763 | Me(R) | single bond | H | Et | H | Me | $CH_2OC(=O)OEt$ | O |
| C-9764 | Me(S) | single bond | H | Et | H | Me | $CH_2OC(=O)OEt$ | O |
| C-9765 | H | single bond | Me | c-Pr | H | Me | $CH_2OC(=O)OEt$ | O |
| C-9766 | Me | single bond | H | c-Pr | H | Me | $CH_2OC(=O)OEt$ | O |
| C-9767 | Me(R) | single bond | H | c-Pr | H | Me | $CH_2OC(=O)OEt$ | O |
| C-9768 | Me(S) | single bond | H | c-Pr | H | Me | $CH_2OC(=O)OEt$ | O |
| C-9769 | H | single bond | Me | c-Pr(1-CN) | H | Me | $CH_2OC(=O)OEt$ | O |
| C-9770 | Me | single bond | H | c-Pr(1-CN) | H | Me | $CH_2OC(=O)OEt$ | O |
| C-9771 | Me(R) | single bond | H | c-Pr(1-CN) | H | Me | $CH_2OC(=O)OEt$ | O |
| C-9772 | Me(S) | single bond | H | c-Pr(1-CN) | H | Me | $CH_2OC(=O)OEt$ | O |
| C-9773 | H | single bond | Me | $CH_2CF_3$ | H | Cl | $CH_2OC(=O)O(i-Pr)$ | O |
| C-9774 | Me | single bond | H | $CH_2CF_3$ | H | Cl | $CH_2OC(=O)O(i-Pr)$ | O |
| C-9775 | Me(R) | single bond | H | $CH_2CF_3$ | H | Cl | $CH_2OC(=O)O(i-Pr)$ | O |
| C-9776 | Me(S) | single bond | H | $CH_2CF_3$ | H | Cl | $CH_2OC(=O)O(i-Pr)$ | O |
| C-9777 | H | single bond | Me | Et | H | Cl | $CH_2OC(=O)O(i-Pr)$ | O |
| C-9778 | Me | single bond | H | Et | H | Cl | $CH_2OC(=O)O(i-Pr)$ | O |
| C-9779 | Me(R) | single bond | H | Et | H | Cl | $CH_2OC(=O)O(i-Pr)$ | O |
| C-9780 | Me(S) | single bond | H | Et | H | Cl | $CH_2OC(=O)O(i-Pr)$ | O |
| C-9781 | H | single bond | Me | c-Pr | H | Cl | $CH_2OC(=O)O(i-Pr)$ | O |
| C-9782 | Me | single bond | H | c-Pr | H | Cl | $CH_2OC(=O)O(i-Pr)$ | O |
| C-9783 | Me(R) | single bond | H | c-Pr | H | Cl | $CH_2OC(=O)O(i-Pr)$ | O |
| C-9784 | Me(S) | single bond | H | c-Pr | H | Cl | $CH_2OC(=O)O(i-Pr)$ | O |
| C-9785 | H | single bond | Me | c-Pr(1-CN) | H | Cl | $CH_2OC(=O)O(i-Pr)$ | O |
| C-9786 | Me | single bond | H | c-Pr(1-CN) | H | Cl | $CH_2OC(=O)O(i-Pr)$ | O |
| C-9787 | Me(R) | single bond | H | c-Pr(1-CN) | H | Cl | $CH_2OC(=O)O(i-Pr)$ | O |
| C-9788 | Me(S) | single bond | H | c-Pr(1-CN) | H | Cl | $CH_2OC(=O)O(i-Pr)$ | O |
| C-9789 | H | single bond | Me | $CH_2CF_3$ | H | Me | $CH_2OC(=O)O(i-Pr)$ | O |
| C-9790 | Me | single bond | H | $CH_2CF_3$ | H | Me | $CH_2OC(=O)O(i-Pr)$ | O |
| C-9791 | Me(R) | single bond | H | $CH_2CF_3$ | H | Me | $CH_2OC(=O)O(i-Pr)$ | O |
| C-9792 | Me(S) | single bond | H | $CH_2CF_3$ | H | Me | $CH_2OC(=O)O(i-Pr)$ | O |
| C-9793 | H | single bond | Me | Et | H | Me | $CH_2OC(=O)O(i-Pr)$ | O |
| C-9794 | Me | single bond | H | Et | H | Me | $CH_2OC(=O)O(i-Pr)$ | O |
| C-9795 | Me(R) | single bond | H | Et | H | Me | $CH_2OC(=O)O(i-Pr)$ | O |
| C-9796 | Me(S) | single bond | H | Et | H | Me | $CH_2OC(=O)O(i-Pr)$ | O |
| C-9797 | H | single bond | Me | c-Pr | H | Me | $CH_2OC(=O)O(i-Pr)$ | O |
| C-9798 | Me | single bond | H | c-Pr | H | Me | $CH_2OC(=O)O(i-Pr)$ | O |
| C-9799 | Me(R) | single bond | H | c-Pr | H | Me | $CH_2OC(=O)O(i-Pr)$ | O |
| C-9800 | Me(S) | single bond | H | c-Pr | H | Me | $CH_2OC(=O)O(i-Pr)$ | O |
| C-9801 | H | single bond | Me | c-Pr(1-CN) | H | Me | $CH_2OC(=O)O(i-Pr)$ | O |
| C-9802 | Me | single bond | H | c-Pr(1-CN) | H | Me | $CH_2OC(=O)O(i-Pr)$ | O |

TABLE 451

| Compound Number | Y | W | Z | $R^1$ | $R^2$ | $R^3$ | $R^{10}$ | A |
|---|---|---|---|---|---|---|---|---|
| C-9803 | Me(R) | single bond | H | c-Pr(1-CN) | H | Me | $CH_2OC(=O)O(i-Pr)$ | O |
| C-9804 | Me(S) | single bond | H | c-Pr(1-CN) | H | Me | $CH_2OC(=O)O(i-Pr)$ | O |
| C-9805 | H | single bond | Me | $CH_2CF_3$ | H | Cl | $CH_2N(Me)C(=O)OMe$ | O |
| C-9806 | Me | single bond | H | $CH_2CF_3$ | H | Cl | $CH_2N(Me)C(=O)OMe$ | O |
| C-9807 | Me(R) | single bond | H | $CH_2CF_3$ | H | Cl | $CH_2N(Me)C(=O)OMe$ | O |
| C-9808 | Me(S) | single bond | H | $CH_2CF_3$ | H | Cl | $CH_2N(Me)C(=O)OMe$ | O |
| C-9809 | H | single bond | Me | Et | H | Cl | $CH_2N(Me)C(=O)OMe$ | O |
| C-9810 | Me | single bond | H | Et | H | Cl | $CH_2N(Me)C(=O)OMe$ | O |
| C-9811 | Me(R) | single bond | H | Et | H | Cl | $CH_2N(Me)C(=O)OMe$ | O |
| C-9812 | Me(S) | single bond | H | Et | H | Cl | $CH_2N(Me)C(=O)OMe$ | O |
| C-9813 | H | single bond | Me | c-Pr | H | Cl | $CH_2N(Me)C(=O)OMe$ | O |
| C-9814 | Me | single bond | H | c-Pr | H | Cl | $CH_2N(Me)C(=O)OMe$ | O |
| C-9815 | Me(R) | single bond | H | c-Pr | H | Cl | $CH_2N(Me)C(=O)OMe$ | O |
| C-9816 | Me(S) | single bond | H | c-Pr | H | Cl | $CH_2N(Me)C(=O)OMe$ | O |
| C-9817 | H | single bond | Me | c-Pr(1-CN) | H | Cl | $CH_2N(Me)C(=O)OMe$ | O |
| C-9818 | Me | single bond | H | c-Pr(1-CN) | H | Cl | $CH_2N(Me)C(=O)OMe$ | O |
| C-9819 | Me(R) | single bond | H | c-Pr(1-CN) | H | Cl | $CH_2N(Me)C(=O)OMe$ | O |
| C-9820 | Me(S) | single bond | H | c-Pr(1-CN) | H | Cl | $CH_2N(Me)C(=O)OMe$ | O |
| C-9821 | H | single bond | Me | $CH_2CF_3$ | H | Me | $CH_2N(Me)C(=O)OMe$ | O |
| C-9822 | Me | single bond | H | $CH_2CF_3$ | H | Me | $CH_2N(Me)C(=O)OMe$ | O |
| C-9823 | Me(R) | single bond | H | $CH_2CF_3$ | H | Me | $CH_2N(Me)C(=O)OMe$ | O |
| C-9824 | Me(S) | single bond | H | $CH_2CF_3$ | H | Me | $CH_2N(Me)C(=O)OMe$ | O |
| C-9825 | H | single bond | Me | Et | H | Me | $CH_2N(Me)C(=O)OMe$ | O |

TABLE 451-continued

| Compound Number | Y | W | Z | $R^1$ | $R^2$ | $R^3$ | $R^{10}$ | A |
|---|---|---|---|---|---|---|---|---|
| C-9826 | Me | single bond | H | Et | H | Me | $CH_2N(Me)C({=}O)OMe$ | O |
| C-9827 | Me(R) | single bond | H | Et | H | Me | $CH_2N(Me)C({=}O)OMe$ | O |
| C-9828 | Me(S) | single bond | H | Et | H | Me | $CH_2N(Me)C({=}O)OMe$ | O |
| C-9829 | H | single bond | Me | c-Pr | H | Me | $CH_2N(Me)C({=}O)OMe$ | O |
| C-9830 | Me | single bond | H | c-Pr | H | Me | $CH_2N(Me)C({=}O)OMe$ | O |
| C-9831 | Me(R) | single bond | H | c-Pr | H | Me | $CH_2N(Me)C({=}O)OMe$ | O |
| C-9832 | Me(S) | single bond | H | c-Pr | H | Me | $CH_2N(Me)C({=}O)OMe$ | O |
| C-9833 | H | single bond | Me | c-Pr(1-CN) | H | Me | $CH_2N(Me)C({=}O)OMe$ | O |
| C-9834 | Me | single bond | H | c-Pr(1-CN) | H | Me | $CH_2N(Me)C({=}O)OMe$ | O |
| C-9835 | Me(R) | single bond | H | c-Pr(1-CN) | H | Me | $CH_2N(Me)C({=}O)OMe$ | O |
| C-9836 | Me(S) | single bond | H | c-Pr(1-CN) | H | Me | $CH_2N(Me)C({=}O)OMe$ | O |
| C-9837 | H | single bond | Me | $CH_2CF_3$ | H | Cl | $CH_2OCH_2CH_2OMe$ | O |
| C-9838 | Me | single bond | H | $CH_2CF_3$ | H | Cl | $CH_2OCH_2CH_2OMe$ | O |
| C-9839 | Me(R) | single bond | H | $CH_2CF_3$ | H | Cl | $CH_2OCH_2CH_2OMe$ | O |
| C-9840 | Me(S) | single bond | H | $CH_2CF_3$ | H | Cl | $CH_2OCH_2CH_2OMe$ | O |
| C-9841 | H | single bond | Me | Et | H | Cl | $CH_2OCH_2CH_2OMe$ | O |
| C-9842 | Me | single bond | H | Et | H | Cl | $CH_2OCH_2CH_2OMe$ | O |
| C-9843 | Me(R) | single bond | H | Et | H | Cl | $CH_2OCH_2CH_2OMe$ | O |
| C-9844 | Me(S) | single bond | H | Et | H | Cl | $CH_2OCH_2CH_2OMe$ | O |
| C-9845 | H | single bond | Me | c-Pr | H | Cl | $CH_2OCH_2CH_2OMe$ | O |
| C-9846 | Me | single bond | H | c-Pr | H | Cl | $CH_2OCH_2CH_2OMe$ | O |

TABLE 452

| Compound Number | Y | W | Z | $R^1$ | $R^2$ | $R^3$ | $R^{10}$ | A |
|---|---|---|---|---|---|---|---|---|
| C-9847 | Me(R) | single bond | H | c-Pr | H | Cl | $CH_2OCH_2CH_2OMe$ | O |
| C-9848 | Me(S) | single bond | H | c-Pr | H | Cl | $CH_2OCH_2CH_2OMe$ | O |
| C-9849 | H | single bond | Me | c-Pr(1-CN) | H | Cl | $CH_2OCH_2CH_2OMe$ | O |
| C-9850 | Me | single bond | H | c-Pr(1-CN) | H | Cl | $CH_2OCH_2CH_2OMe$ | O |
| C-9851 | Me(R) | single bond | H | c-Pr(1-CN) | H | Cl | $CH_2OCH_2CH_2OMe$ | O |
| C-9852 | Me(S) | single bond | H | c-Pr(1-CN) | H | Cl | $CH_2OCH_2CH_2OMe$ | O |
| C-9853 | H | single bond | Me | $CH_2CF_3$ | H | Me | $CH_2OCH_2CH_2OMe$ | O |
| C-9854 | Me | single bond | H | $CH_2CF_3$ | H | Me | $CH_2OCH_2CH_2OMe$ | O |
| C-9855 | Me(R) | single bond | H | $CH_2CF_3$ | H | Me | $CH_2OCH_2CH_2OMe$ | O |
| C-9856 | Me(S) | single bond | H | $CH_2CF_3$ | H | Me | $CH_2OCH_2CH_2OMe$ | O |
| C-9857 | H | single bond | Me | Et | H | Me | $CH_2OCH_2CH_2OMe$ | O |
| C-9858 | Me | single bond | H | Et | H | Me | $CH_2OCH_2CH_2OMe$ | O |
| C-9859 | Me(R) | single bond | H | Et | H | Me | $CH_2OCH_2CH_2OMe$ | O |
| C-9860 | Me(S) | single bond | H | Et | H | Me | $CH_2OCH_2CH_2OMe$ | O |
| C-9861 | H | single bond | Me | c-Pr | H | Me | $CH_2OCH_2CH_2OMe$ | O |
| C-9862 | Me | single bond | H | c-Pr | H | Me | $CH_2OCH_2CH_2OMe$ | O |
| C-9863 | Me(R) | single bond | H | c-Pr | H | Me | $CH_2OCH_2CH_2OMe$ | O |
| C-9864 | Me(S) | single bond | H | c-Pr | H | Me | $CH_2OCH_2CH_2OMe$ | O |
| C-9865 | H | single bond | Me | c-Pr(1-CN) | H | Me | $CH_2OCH_2CH_2OMe$ | O |
| C-9866 | Me | single bond | H | c-Pr(1-CN) | H | Me | $CH_2OCH_2CH_2OMe$ | O |
| C-9867 | Me(R) | single bond | H | c-Pr(1-CN) | H | Me | $CH_2OCH_2CH_2OMe$ | O |
| C-9868 | Me(S) | single bond | H | c-Pr(1-CN) | H | Me | $CH_2OCH_2CH_2OMe$ | O |
| C-9869 | H | single bond | Me | $CH_2CF_3$ | H | Cl | $CH_2OCH_2CH_2CN$ | O |
| C-9870 | Me | single bond | H | $CH_2CF_3$ | H | Cl | $CH_2OCH_2CH_2CN$ | O |
| C-9871 | Me(R) | single bond | H | $CH_2CF_3$ | H | Cl | $CH_2OCH_2CH_2CN$ | O |
| C-9872 | Me(S) | single bond | H | $CH_2CF_3$ | H | Cl | $CH_2OCH_2CH_2CN$ | O |
| C-9873 | H | single bond | Me | Et | H | Cl | $CH_2OCH_2CH_2CN$ | O |
| C-9874 | Me | single bond | H | Et | H | Cl | $CH_2OCH_2CH_2CN$ | O |
| C-9875 | Me(R) | single bond | H | Et | H | Cl | $CH_2OCH_2CH_2CN$ | O |
| C-9876 | Me(S) | single bond | H | Et | H | Cl | $CH_2OCH_2CH_2CN$ | O |
| C-9877 | H | single bond | Me | c-Pr | H | Cl | $CH_2OCH_2CH_2CN$ | O |
| C-9878 | Me | single bond | H | c-Pr | H | Cl | $CH_2OCH_2CH_2CN$ | O |
| C-9879 | Me(R) | single bond | H | c-Pr | H | Cl | $CH_2OCH_2CH_2CN$ | O |
| C-9880 | Me(S) | single bond | H | c-Pr | H | Cl | $CH_2OCH_2CH_2CN$ | O |
| C-9881 | H | single bond | Me | c-Pr(1-CN) | H | Cl | $CH_2OCH_2CH_2CN$ | O |
| C-9882 | Me | single bond | H | c-Pr(1-CN) | H | Cl | $CH_2OCH_2CH_2CN$ | O |
| C-9883 | Me(R) | single bond | H | c-Pr(1-CN) | H | Cl | $CH_2OCH_2CH_2CN$ | O |
| C-9884 | Me(S) | single bond | H | c-Pr(1-CN) | H | Cl | $CH_2OCH_2CH_2CN$ | O |
| C-9885 | H | single bond | Me | $CH_2CF_3$ | H | Me | $CH_2OCH_2CH_2CN$ | O |
| C-9886 | Me | single bond | H | $CH_2CF_3$ | H | Me | $CH_2OCH_2CH_2CN$ | O |
| C-9887 | Me(R) | single bond | H | $CH_2CF_3$ | H | Me | $CH_2OCH_2CH_2CN$ | O |
| C-9888 | Me(S) | single bond | H | $CH_2CF_3$ | H | Me | $CH_2OCH_2CH_2CN$ | O |
| C-9889 | H | single bond | Me | Et | H | Me | $CH_2OCH_2CH_2CN$ | O |
| C-9890 | Me | single bond | H | Et | H | Me | $CH_2OCH_2CH_2CN$ | O |

TABLE 453

| Compound Number | Y | W | Z | $R^1$ | $R^2$ | $R^3$ | $R^{10}$ | A |
|---|---|---|---|---|---|---|---|---|
| C-9891 | Me(R) | single bond | H | Et | H | Me | $CH_2OCH_2CH_2CN$ | O |
| C-9892 | Me(S) | single bond | H | Et | H | Me | $CH_2OCH_2CH_2CN$ | O |
| C-9893 | H | single bond | Me | c-Pr | H | Me | $CH_2OCH_2CH_2CN$ | O |
| C-9894 | Me | single bond | H | c-Pr | H | Me | $CH_2OCH_2CH_2CN$ | O |
| C-9895 | Me(R) | single bond | H | c-Pr | H | Me | $CH_2OCH_2CH_2CN$ | O |
| C-9896 | Me(S) | single bond | H | c-Pr | H | Me | $CH_2OCH_2CH_2CN$ | O |
| C-9897 | H | single bond | Me | c-Pr(1-CN) | H | Me | $CH_2OCH_2CH_2CN$ | O |
| C-9898 | Me | single bond | H | c-Pr(1-CN) | H | Me | $CH_2OCH_2CH_2CN$ | O |
| C-9899 | Me(R) | single bond | H | c-Pr(1-CN) | H | Me | $CH_2OCH_2CH_2CN$ | O |
| C-9900 | Me(S) | single bond | H | c-Pr(1-CN) | H | Me | $CH_2OCH_2CH_2CN$ | O |
| C-9901 | H | single bond | Me | $CH_2CF_3$ | H | Cl | $CH_2OCH_2CH_2S(=O)_2Me$ | O |
| C-9902 | Me | single bond | H | $CH_2CF_3$ | H | Cl | $CH_2OCH_2CH_2S(=O)_2Me$ | O |
| C-9903 | Me(R) | single bond | H | $CH_2CF_3$ | H | Cl | $CH_2OCH_2CH_2S(=O)_2Me$ | O |
| C-9904 | Me(S) | single bond | H | $CH_2CF_3$ | H | Cl | $CH_2OCH_2CH_2S(=O)_2Me$ | O |
| C-9905 | H | single bond | Me | Et | H | Cl | $CH_2OCH_2CH_2S(=O)_2Me$ | O |
| C-9906 | Me | single bond | H | Et | H | Cl | $CH_2OCH_2CH_2S(=O)_2Me$ | O |
| C-9907 | Me(R) | single bond | H | Et | H | Cl | $CH_2OCH_2CH_2S(=O)_2Me$ | O |
| C-9908 | Me(S) | single bond | H | Et | H | Cl | $CH_2OCH_2CH_2S(=O)_2Me$ | O |
| C-9909 | H | single bond | Me | c-Pr | H | Cl | $CH_2OCH_2CH_2S(=O)_2Me$ | O |
| C-9910 | Me | single bond | H | c-Pr | H | Cl | $CH_2OCH_2CH_2S(=O)_2Me$ | O |
| C-9911 | Me(R) | single bond | H | c-Pr | H | Cl | $CH_2OCH_2CH_2S(=O)_2Me$ | O |
| C-9912 | Me(S) | single bond | H | c-Pr | H | Cl | $CH_2OCH_2CH_2S(=O)_2Me$ | O |
| C-9913 | H | single bond | Me | c-Pr(1-CN) | H | Cl | $CH_2OCH_2CH_2S(=O)_2Me$ | O |
| C-9914 | Me | single bond | H | c-Pr(1-CN) | H | Cl | $CH_2OCH_2CH_2S(=O)_2Me$ | O |
| C-9915 | Me(R) | single bond | H | c-Pr(1-CN) | H | Cl | $CH_2OCH_2CH_2S(=O)_2Me$ | O |
| C-9916 | Me(S) | single bond | H | c-Pr(1-CN) | H | Cl | $CH_2OCH_2CH_2S(=O)_2Me$ | O |
| C-9917 | H | single bond | Me | $CH_2CF_3$ | H | Me | $CH_2OCH_2CH_2S(=O)_2Me$ | O |
| C-9918 | Me | single bond | H | $CH_2CF_3$ | H | Me | $CH_2OCH_2CH_2S(=O)_2Me$ | O |
| C-9919 | Me(R) | single bond | H | $CH_2CF_3$ | H | Me | $CH_2OCH_2CH_2S(=O)_2Me$ | O |
| C-9920 | Me(S) | single bond | H | $CH_2CF_3$ | H | Me | $CH_2OCH_2CH_2S(=O)_2Me$ | O |
| C-9921 | H | single bond | Me | Et | H | Me | $CH_2OCH_2CH_2S(=O)_2Me$ | O |
| C-9922 | Me | single bond | H | Et | H | Me | $CH_2OCH_2CH_2S(=O)_2Me$ | O |
| C-9923 | Me(R) | single bond | H | Et | H | Me | $CH_2OCH_2CH_2S(=O)_2Me$ | O |
| C-9924 | Me(S) | single bond | H | Et | H | Me | $CH_2OCH_2CH_2S(=O)_2Me$ | O |
| C-9925 | H | single bond | Me | c-Pr | H | Me | $CH_2OCH_2CH_2S(=O)_2Me$ | O |
| C-9926 | Me | single bond | H | c-Pr | H | Me | $CH_2OCH_2CH_2S(=O)_2Me$ | O |
| C-9927 | Me(R) | single bond | H | c-Pr | H | Me | $CH_2OCH_2CH_2S(=O)_2Me$ | O |
| C-9928 | Me(S) | single bond | H | c-Pr | H | Me | $CH_2OCH_2CH_2S(=O)_2Me$ | O |
| C-9929 | H | single bond | Me | c-Pr(1-CN) | H | Me | $CH_2OCH_2CH_2S(=O)_2Me$ | O |
| C-9930 | Me | single bond | H | c-Pr(1-CN) | H | Me | $CH_2OCH_2CH_2S(=O)_2Me$ | O |
| C-9931 | Me(R) | single bond | H | c-Pr(1-CN) | H | Me | $CH_2OCH_2CH_2S(=O)_2Me$ | O |
| C-9932 | Me(S) | single bond | H | c-Pr(1-CN) | H | Me | $CH_2OCH_2CH_2S(=O)_2Me$ | O |
| C-9933 | H | single bond | Me | $CH_2CF_3$ | H | Cl | CH2(5-Me-1,3-dioxol-2-one-4-yl) | O |
| C-9934 | Me | single bond | H | $CH_2CF_3$ | H | Cl | CH2(5-Me-1,3-dioxol-2-one-4-yl) | O |

TABLE 454

| Compound Number | Y | W | Z | $R^1$ | $R^2$ | $R^3$ | $R^{10}$ | A |
|---|---|---|---|---|---|---|---|---|
| C-9935 | Me(R) | single bond | H | $CH_2CF_3$ | H | C | $CH_2$(5-Me-1,3-dioxol-2-one-4-yl) | O |
| C-9936 | Me(S) | single bond | H | $CH_2CF_3$ | H | Cl | $CH_2$(5-Me-1,3-dioxol-2-one-4-yl) | O |
| C-9937 | H | single bond | Me | Et | H | Cl | $CH_2$(5-Me-1,3-dioxol-2-one-4-yl) | O |
| C-9938 | Me | single bond | H | Et | H | Cl | $CH_2$(5-Me-1,3-dioxol-2-one-4-yl) | O |
| C-9939 | Me(R) | single bond | H | Et | H | Cl | $CH_2$(5-Me-1,3-dioxol-2-one-4-yl) | O |
| C-9940 | Me(S) | single bond | H | Et | H | Cl | $CH_2$(5-Me-1,3-dioxol-2-one-4-yl) | O |
| C-9941 | H | single bond | Me | c-Pr | H | Cl | $CH_2$(5-Me-1,3-dioxol-2-one-4-yl) | O |
| C-9942 | Me | single bond | H | c-Pr | H | Cl | $CH_2$(5-Me-1,3-dioxol-2-one-4-yl) | O |
| C-9943 | Me(R) | single bond | H | c-Pr | H | Cl | $CH_2$(5-Me-1,3-dioxol-2-one-4-yl) | O |
| C-9944 | Me(S) | single bond | H | c-Pr | H | Cl | $CH_2$(5-Me-1,3-dioxol-2-one-4-yl) | O |
| C-9945 | H | single bond | Me | c-Pr(1-CN) | H | Cl | $CH_2$(5-Me-1,3-dioxol-2-one-4-yl) | O |
| C-9946 | Me | single bond | H | c-Pr(1-CN) | H | Cl | $CH_2$(5-Me-1,3-dioxol-2-one-4-yl) | O |
| C-9947 | Me(R) | single bond | H | c-Pr(1-CN) | H | Cl | $CH_2$(5-Me-1,3-dioxol-2-one-4-yl) | O |
| C-9948 | Me(S) | single bond | H | c-Pr(1-CN) | H | Cl | $CH_2$(5-Me-1,3-dioxol-2-one-4-yl) | O |
| C-9949 | H | single bond | Me | $CH_2CF_3$ | H | Me | $CH_2$(5-Me-1,3-dioxol-2-one-4-yl) | O |
| C-9950 | Me | single bond | H | $CH_2CF_3$ | H | Me | $CH_2$(5-Me-1,3-dioxol-2-one-4-yl) | O |
| C-9951 | Me(R) | single bond | H | $CH_2CF_3$ | H | Me | $CH_2$(5-Me-1,3-dioxol-2-one-4-yl) | O |
| C-9952 | Me(S) | single bond | H | $CH_2CF_3$ | H | Me | $CH_2$(5-Me-1,3-dioxol-2-one-4-yl) | O |
| C-9953 | H | single bond | Me | Et | H | Me | $CH_2$(5-Me-1,3-dioxol-2-one-4-yl) | O |
| C-9954 | Me | single bond | H | Et | H | Me | $CH_2$(5-Me-1,3-dioxol-2-one-4-yl) | O |
| C-9955 | Me(R) | single bond | H | Et | H | Me | $CH_2$(5-Me-1,3-dioxol-2-one-4-yl) | O |

TABLE 454-continued

| Compound Number | Y | W | Z | $R^1$ | $R^2$ | $R^3$ | $R^{10}$ | A |
|---|---|---|---|---|---|---|---|---|
| C-9956 | Me(S) | single bond | H | Et | H | Me | $CH_2$(5-Me-1,3-dioxol-2-one-4-yl) | O |
| C-9957 | H | single bond | Me | c-Pr | H | Me | $CH_2$(5-Me-1,3-dioxol-2-one-4-yl) | O |
| C-9958 | Me | single bond | H | c-Pr | H | Me | $CH_2$(5-Me-1,3-dioxol-2-one-4-yl) | O |
| C-9959 | Me(R) | single bond | H | c-Pr | H | Me | $CH_2$(5-Me-1,3-dioxol-2-one-4-yl) | O |
| C-9960 | Me(S) | single bond | H | c-Pr | H | Me | $CH_2$(5-Me-1,3-dioxol-2-one-4-yl) | O |
| C-9961 | H | single bond | Me | c-Pr(1-CN) | H | Me | $CH_2$(5-Me-1,3-dioxol-2-one-4-yl) | O |
| C-9962 | Me | single bond | H | c-Pr(1-CN) | H | Me | $CH_2$(5-Me-1,3-dioxol-2-one-4-yl) | O |
| C-9963 | Me(R) | single bond | H | c-Pr(1-CN) | H | Me | $CH_2$(5-Me-1,3-dioxol-2-one-4-yl) | O |
| C-9964 | Me(S) | single bond | H | c-Pr(1-CN) | H | Me | $CH_2$(5-Me-1,3-dioxol-2-one-4-yl) | O |
| C-9965 | H | single bond | Me | $CH_2CF_3$ | Me | Cl | c-Pr | O |
| C-9966 | Me | single bond | H | $CH_2CF_3$ | Me | Cl | c-Pr | O |
| C-9967 | Me(R) | single bond | H | $CH_2CF_3$ | Me | Cl | c-Pr | O |
| C-9968 | Me(S) | single bond | H | $CH_2CF_3$ | Me | Cl | c-Pr | O |
| C-9969 | H | single bond | Me | Et | Me | Cl | c-Pr | O |
| C-9970 | Me | single bond | H | Et | Me | Cl | c-Pr | O |
| C-9971 | Me(R) | single bond | H | Et | Me | Cl | c-Pr | O |
| C-9972 | Me(S) | single bond | H | Et | Me | Cl | c-Pr | O |
| C-9973 | H | single bond | Me | c-Pr | Me | Cl | c-Pr | O |
| C-9974 | Me | single bond | H | c-Pr | Me | Cl | c-Pr | O |
| C-9975 | Me(R) | single bond | H | c-Pr | Me | Cl | c-Pr | O |
| C-9976 | Me(S) | single bond | H | c-Pr | Me | Cl | c-Pr | O |
| C-9977 | H | single bond | Me | c-Pr(1-CN) | Me | Cl | c-Pr | O |
| C-9978 | Me | single bond | H | c-Pr(1-CN) | Me | Cl | c-Pr | O |

TABLE 455

| Compound Number | Y | W | Z | $R^1$ | $R^2$ | $R^3$ | $R^{10}$ | A |
|---|---|---|---|---|---|---|---|---|
| C-9979 | Me(R) | single bond | H | c-Pr(1-CN) | Me | Cl | c-Pr | O |
| C-9980 | Me(S) | single bond | H | c-Pr(1-CN) | Me | Cl | c-Pr | O |
| C-9981 | H | single bond | Me | $CH_2CF_3$ | Me | Me | c-Pr | O |
| C-9982 | Me | single bond | H | $CH_2CF_3$ | Me | Me | c-Pr | O |
| C-9983 | Me(R) | single bond | H | $CH_2CF_3$ | Me | Me | c-Pr | O |
| C-9984 | Me(S) | single bond | H | $CH_2CF_3$ | Me | Me | c-Pr | O |
| C-9985 | H | single bond | Me | Et | Me | Me | c-Pr | O |
| C-9986 | Me | single bond | H | Et | Me | Me | c-Pr | O |
| C-9987 | Me(R) | single bond | H | Et | Me | Me | c-Pr | O |
| C-9988 | Me(S) | single bond | H | Et | Me | Me | c-Pr | O |
| C-9989 | H | single bond | Me | c-Pr | Me | Me | c-Pr | O |
| C-9990 | Me | single bond | H | c-Pr | Me | Me | c-Pr | O |
| C-9991 | Me(R) | single bond | H | c-Pr | Me | Me | c-Pr | O |
| C-9992 | Me(S) | single bond | H | c-Pr | Me | Me | c-Pr | O |
| C-9993 | H | single bond | Me | c-Pr(1-CN) | Me | Me | c-Pr | O |
| C-9994 | Me | single bond | H | c-Pr(1-CN) | Me | Me | c-Pr | O |
| C-9995 | Me(R) | single bond | H | c-Pr(1-CN) | Me | Me | c-Pr | O |
| C-9996 | Me(S) | single bond | H | c-Pr(1-CN) | Me | Me | c-Pr | O |
| C-9997 | H | single bond | Me | $CH_2CF_3$ | Me | Cl | OMe | O |
| C-9998 | Me | single bond | H | $CH_2CF_3$ | Me | Cl | OMe | O |
| C-9999 | Me(R) | single bond | H | $CH_2CF_3$ | Me | Cl | OMe | O |
| C-10000 | Me(S) | single bond | H | $CH_2CF_3$ | Me | Cl | OMe | O |
| C-10001 | H | single bond | Me | Et | Me | Cl | OMe | O |

TABLE 455-continued

| Compound Number | Y | W | Z | $R^1$ | $R^2$ | $R^3$ | $R^{10}$ | A |
|---|---|---|---|---|---|---|---|---|
| C-10002 | Me | single bond | H | Et | Me | Cl | OMe | O |
| C-10003 | Me(R) | single bond | H | Et | Me | Cl | OMe | O |
| C-10004 | Me(S) | single bond | H | Et | Me | Cl | OMe | O |
| C-10005 | H | single bond | Me | c-Pr | Me | Cl | OMe | O |
| C-10006 | Me | single bond | H | c-Pr | Me | Cl | OMe | O |
| C-10007 | Me(R) | single bond | H | c-Pr | Me | Cl | OMe | O |
| C-10008 | Me(S) | single bond | H | c-Pr | Me | Cl | OMe | O |
| C-10009 | H | single bond | Me | c-Pr(1-CN) | Me | Cl | OMe | O |
| C-10010 | Me | single bond | H | c-Pr(1-CN) | Me | Cl | OMe | O |
| C-10011 | Me(R) | single bond | H | c-Pr(1-CN) | Me | Cl | OMe | O |
| C-10012 | Me(S) | single bond | H | c-Pr(1-CN) | Me | Cl | OMe | O |
| C-10013 | H | single bond | Me | $CH_2CF_3$ | Me | Me | OMe | O |
| C-10014 | Me | single bond | H | $CH_2CF_3$ | Me | Me | OMe | O |
| C-10015 | Me(R) | single bond | H | $CH_2CF_3$ | Me | Me | OMe | O |
| C-10016 | Me(S) | single bond | H | $CH_2CF_3$ | Me | Me | OMe | O |
| C-10017 | H | single bond | Me | Et | Me | Me | OMe | O |
| C-10018 | Me | single bond | H | Et | Me | Me | OMe | O |
| C-10019 | Me(R) | single bond | H | Et | Me | Me | OMe | O |
| C-10020 | Me(S) | single bond | H | Et | Me | Me | OMe | O |
| C-10021 | H | single bond | Me | c-Pr | Me | Me | OMe | O |
| C-10022 | Me | single bond | H | c-Pr | Me | Me | OMe | O |

TABLE 456

| Compound Number | Y | W | Z | $R^1$ | $R^2$ | $R^3$ | $R^{10}$ | A |
|---|---|---|---|---|---|---|---|---|
| C-10023 | Me(R) | single bond | H | c-Pr | Me | Me | OMe | O |
| C-10024 | Me(S) | single bond | H | c-Pr | Me | Me | OMe | O |
| C-10025 | H | single bond | Me | c-Pr(1-CN) | Me | Me | OMe | O |
| C-10026 | Me | single bond | H | c-Pr(1-CN) | Me | Me | OMe | O |
| C-10027 | Me(R) | single bond | H | c-Pr(1-CN) | Me | Me | OMe | O |
| C-10028 | Me(S) | single bond | H | c-Pr(1-CN) | Me | Me | OMe | O |
| C-10029 | H | single bond | Me | $CH_2CF_3$ | Me | Cl | C(═O)(i-Pr) | O |
| C-10030 | Me | single bond | H | $CH_2CF_3$ | Me | Cl | C(═O)(i-Pr) | O |
| C-10031 | Me(R) | single bond | H | $CH_2CF_3$ | Me | Cl | C(═O)(i-Pr) | O |
| C-10032 | Me(S) | single bond | H | $CH_2CF_3$ | Me | Cl | C(═O)(i-Pr) | O |
| C-10033 | H | single bond | Me | Et | Me | Cl | C(═O)(i-Pr) | O |
| C-10034 | Me | single bond | H | Et | Me | Cl | C(═O)(i-Pr) | O |
| C-10035 | Me(R) | single bond | H | Et | Me | Cl | C(═O)(i-Pr) | O |
| C-10036 | Me(S) | single bond | H | Et | Me | Cl | C(═O)(i-Pr) | O |
| C-10037 | H | single bond | Me | c-Pr | Me | Cl | C(═O)(i-Pr) | O |

TABLE 456-continued

| Compound Number | Y | W | Z | $R^1$ | $R^2$ | $R^3$ | $R^{10}$ | A |
|---|---|---|---|---|---|---|---|---|
| C-10038 | Me | single bond | H | c-Pr | Me | Cl | C(=O)(i-Pr) | O |
| C-10039 | Me(R) | single bond | H | c-Pr | Me | Cl | C(=O)(i-Pr) | O |
| C-10040 | Me(S) | single bond | H | c-Pr | Me | Cl | C(=O)(i-Pr) | O |
| C-10041 | H | single bond | Me | c-Pr(1-CN) | Me | Cl | C(=O)(i-Pr) | O |
| C-10042 | Me | single bond | H | c-Pr(1-CN) | Me | Cl | C(=O)(i-Pr) | O |
| C-10043 | Me(R) | single bond | H | c-Pr(1-CN) | Me | Cl | C(=O)(i-Pr) | O |
| C-10044 | Me(S) | single bond | H | c-Pr(1-CN) | Me | Cl | C(=O)(i-Pr) | O |
| C-10045 | H | single bond | Me | $CH_2CF_3$ | Me | Me | C(=O)(i-Pr) | O |
| C-10046 | Me | single bond | H | $CH_2CF_3$ | Me | Me | C(=O)(i-Pr) | O |
| C-10047 | Me(R) | single bond | H | $CH_2CF_3$ | Me | Me | C(=O)(i-Pr) | O |
| C-10048 | Me(S) | single bond | H | $CH_2CF_3$ | Me | Me | C(=O)(i-Pr) | O |
| C-10049 | H | single bond | Me | Et | Me | Me | C(=O)(i-Pr) | O |
| C-10050 | Me | single bond | H | Et | Me | Me | C(=O)(i-Pr) | O |
| C-10051 | Me(R) | single bond | H | Et | Me | Me | C(=O)(i-Pr) | O |
| C-10052 | Me(S) | single bond | H | Et | Me | Me | C(=O)(i-Pr) | O |
| C-10053 | H | single bond | Me | c-Pr | Me | Me | C(=O)(i-Pr) | O |
| C-10054 | Me | single bond | H | c-Pr | Me | Me | C(=O)(i-Pr) | O |
| C-10055 | Me(R) | single bond | H | c-Pr | Me | Me | C(=O)(i-Pr) | O |
| C-10056 | Me(S) | single bond | H | c-Pr | Me | Me | C(=O)(i-Pr) | O |
| C-10057 | H | single bond | Me | c-Pr(1-CN) | Me | Me | C(=O)(i-Pr) | O |
| C-10058 | Me | single bond | H | c-Pr(1-CN) | Me | Me | C(=O)(i-Pr) | O |
| C-10059 | Me(R) | single bond | H | c-Pr(1-CN) | Me | Me | C(=O)(i-Pr) | O |
| C-10060 | Me(S) | single bond | H | c-Pr(1-CN) | Me | Me | C(=O)(i-Pr) | O |
| C-10061 | H | single bond | Me | $CH_2CF_3$ | Me | Cl | C(=O)O(t-Bu) | O |
| C-10062 | Me | single bond | H | $CH_2CF_3$ | Me | Cl | C(=O)O(t-Bu) | O |
| C-10063 | Me(R) | single bond | H | $CH_2CF_3$ | Me | Cl | C(=O)O(t-Bu) | O |
| C-10064 | Me(S) | single bond | H | $CH_2CF_3$ | Me | Cl | C(=O)O(t-Bu) | O |
| C-10065 | H | single bond | Me | Et | Me | Cl | C(=O)O(t-Bu) | O |
| C-10066 | Me | single bond | H | Et | Me | Cl | C(=O)O(t-Bu) | O |

TABLE 457

| Compound Number | Y | W | Z | $R^1$ | $R^2$ | $R^3$ | $R^{10}$ | A |
|---|---|---|---|---|---|---|---|---|
| C-10067 | Me(R) | single bond | H | Et | Me | Cl | C(=O)O(t-Bu) | O |
| C-10068 | Me(S) | single bond | H | Et | Me | Cl | C(=O)O(t-Bu) | O |
| C-10069 | H | single bond | Me | c-Pr | Me | Cl | C(=O)O(t-Bu) | O |
| C-10070 | Me | single bond | H | c-Pr | Me | Cl | C(=O)O(t-Bu) | O |
| C-10071 | Me(R) | single bond | H | c-Pr | Me | Cl | C(=O)O(t-Bu) | O |
| C-10072 | Me(S) | single bond | H | c-Pr | Me | Cl | C(=O)O(t-Bu) | O |
| C-10073 | H | single bond | Me | c-Pr(1-CN) | Me | Cl | C(=O)O(t-Bu) | O |
| C-10074 | Me | single bond | H | c-Pr(1-CN) | Me | Cl | C(=O)O(t-Bu) | O |
| C-10075 | Me(R) | single bond | H | c-Pr(1-CN) | Me | Cl | C(=O)O(t-Bu) | O |
| C-10076 | Me(S) | single bond | H | c-Pr(1-CN) | Me | Cl | C(=O)O(t-Bu) | O |
| C-10077 | H | single bond | Me | $CH_2CF_3$ | Me | Me | C(=O)O(t-Bu) | O |
| C-10078 | Me | single bond | H | $CH_2CF_3$ | Me | Me | C(=O)O(t-Bu) | O |
| C-10079 | Me(R) | single bond | H | $CH_2CF_3$ | Me | Me | C(=O)O(t-Bu) | O |
| C-10080 | Me(S) | single bond | H | $CH_2CF_3$ | Me | Me | C(=O)O(t-Bu) | O |
| C-10081 | H | single bond | Me | Et | Me | Me | C(=O)O(t-Bu) | O |
| C-10082 | Me | single bond | H | Et | Me | Me | C(=O)O(t-Bu) | O |
| C-10083 | Me(R) | single bond | H | Et | Me | Me | C(=O)O(t-Bu) | O |
| C-10084 | Me(S) | single bond | H | Et | Me | Me | C(=O)O(t-Bu) | O |
| C-10085 | H | single bond | Me | c-Pr | Me | Me | C(=O)O(t-Bu) | O |
| C-10086 | Me | single bond | H | c-Pr | Me | Me | C(=O)O(t-Bu) | O |
| C-10087 | Me(R) | single bond | H | c-Pr | Me | Me | C(=O)O(t-Bu) | O |
| C-10088 | Me(S) | single bond | H | c-Pr | Me | Me | C(=O)O(t-Bu) | O |
| C-10089 | H | single bond | Me | c-Pr(1-CN) | Me | Me | C(=O)O(t-Bu) | O |
| C-10090 | Me | single bond | H | c-Pr(1-CN) | Me | Me | C(=O)O(t-Bu) | O |
| C-10091 | Me(R) | single bond | H | c-Pr(1-CN) | Me | Me | C(=O)O(t-Bu) | O |
| C-10092 | Me(S) | single bond | H | c-Pr(1-CN) | Me | Me | C(=O)O(t-Bu) | O |
| C-10093 | H | single bond | Me | $CH_2CF_3$ | Me | Cl | $CH_2OEt$ | O |
| C-10094 | Me | single bond | H | $CH_2CF_3$ | Me | Cl | $CH_2OEt$ | O |
| C-10095 | Me(R) | single bond | H | $CH_2CF_3$ | Me | Cl | $CH_2OEt$ | O |
| C-10096 | Me(S) | single bond | H | $CH_2CF_3$ | Me | Cl | $CH_2OEt$ | O |
| C-10097 | H | single bond | Me | Et | Me | Cl | $CH_2OEt$ | O |
| C-10098 | Me | single bond | H | Et | Me | Cl | $CH_2OEt$ | O |
| C-10099 | Me(R) | single bond | H | Et | Me | Cl | $CH_2OEt$ | O |
| C-10100 | Me(S) | single bond | H | Et | Me | Cl | $CH_2OEt$ | O |
| C-10101 | H | single bond | Me | c-Pr | Me | Cl | $CH_2OEt$ | O |
| C-10102 | Me | single bond | H | c-Pr | Me | Cl | $CH_2OEt$ | O |
| C-10103 | Me(R) | single bond | H | c-Pr | Me | Cl | $CH_2OEt$ | O |
| C-10104 | Me(S) | single bond | H | c-Pr | Me | Cl | $CH_2OEt$ | O |

TABLE 457-continued

| Compound Number | Y | W | Z | $R^1$ | $R^2$ | $R^3$ | $R^{10}$ | A |
|---|---|---|---|---|---|---|---|---|
| C-10105 | H | single bond | Me | c-Pr(1-CN) | Me | Cl | $CH_2OEt$ | O |
| C-10106 | Me | single bond | H | c-Pr(1-CN) | Me | Cl | $CH_2OEt$ | O |
| C-10107 | Me(R) | single bond | H | c-Pr(1-CN) | Me | Cl | $CH_2OEt$ | O |
| C-10108 | Me(S) | single bond | H | c-Pr(1-CN) | Me | Cl | $CH_2OEt$ | O |
| C-10109 | H | single bond | Me | $CH_2CF_3$ | Me | Me | $CH_2OEt$ | O |
| C-10110 | Me | single bond | H | $CH_2CF_3$ | Me | Me | $CH_2OEt$ | O |

TABLE 458

| Compound Number | Y | W | Z | $R^1$ | $R^2$ | $R^3$ | $R^{10}$ | A |
|---|---|---|---|---|---|---|---|---|
| C-10111 | Me(R) | single bond | H | $CH_2CF_3$ | Me | Me | $CH_2OEt$ | O |
| C-10112 | Me(S) | single bond | H | $CH_2CF_3$ | Me | Me | $CH_2OEt$ | O |
| C-10113 | H | single bond | Me | Et | Me | Me | $CH_2OEt$ | O |
| C-10114 | Me | single bond | H | Et | Me | Me | $CH_2OEt$ | O |
| C-10115 | Me(R) | single bond | H | Et | Me | Me | $CH_2OEt$ | O |
| C-10116 | Me(S) | single bond | H | Et | Me | Me | $CH_2OEt$ | O |
| C-10117 | H | single bond | Me | c-Pr | Me | Me | $CH_2OEt$ | O |
| C-10118 | Me | single bond | H | c-Pr | Me | Me | $CH_2OEt$ | O |
| C-10119 | Me(R) | single bond | H | c-Pr | Me | Me | $CH_2OEt$ | O |
| C-10120 | Me(S) | single bond | H | c-Pr | Me | Me | $CH_2OEt$ | O |
| C-10121 | H | single bond | Me | c-Pr(1-CN) | Me | Me | $CH_2OEt$ | O |
| C-10122 | Me | single bond | H | c-Pr(1-CN) | Me | Me | $CH_2OEt$ | O |
| C-10123 | Me(R) | single bond | H | c-Pr(1-CN) | Me | Me | $CH_2OEt$ | O |
| C-10124 | Me(S) | single bond | H | c-Pr(1-CN) | Me | Me | $CH_2OEt$ | O |
| C-10125 | H | single bond | Me | $CH_2CF_3$ | Me | Cl | $CH_2SMe$ | O |
| C-10126 | Me | single bond | H | $CH_2CF_3$ | Me | Cl | $CH_2SMe$ | O |
| C-10127 | Me(R) | single bond | H | $CH_2CF_3$ | Me | Cl | $CH_2SMe$ | O |
| C-10128 | Me(S) | single bond | H | $CH_2CF_3$ | Me | Cl | $CH_2SMe$ | O |
| C-10129 | H | single bond | Me | Et | Me | Cl | $CH_2SMe$ | O |
| C-10130 | Me | single bond | H | Et | Me | Cl | $CH_2SMe$ | O |
| C-10131 | Me(R) | single bond | H | Et | Me | Cl | $CH_2SMe$ | O |
| C-10132 | Me(S) | single bond | H | Et | Me | Cl | $CH_2SMe$ | O |
| C-10133 | H | single bond | Me | c-Pr | Me | Cl | $CH_2SMe$ | O |
| C-10134 | Me | single bond | H | c-Pr | Me | Cl | $CH_2SMe$ | O |
| C-10135 | Me(R) | single bond | H | c-Pr | Me | Cl | $CH_2SMe$ | O |
| C-10136 | Me(S) | single bond | H | c-Pr | Me | Cl | $CH_2SMe$ | O |
| C-10137 | H | single bond | Me | c-Pr(1-CN) | Me | Cl | $CH_2SMe$ | O |
| C-10138 | Me | single bond | H | c-Pr(1-CN) | Me | Cl | $CH_2SMe$ | O |
| C-10139 | Me(R) | single bond | H | c-Pr(1-CN) | Me | Cl | $CH_2SMe$ | O |
| C-10140 | Me(S) | single bond | H | c-Pr(1-CN) | Me | Cl | $CH_2SMe$ | O |
| C-10141 | H | single bond | Me | $CH_2CF_3$ | Me | Me | $CH_2SMe$ | O |
| C-10142 | Me | single bond | H | $CH_2CF_3$ | Me | Me | $CH_2SMe$ | O |
| C-10143 | Me(R) | single bond | H | $CH_2CF_3$ | Me | Me | $CH_2SMe$ | O |
| C-10144 | Me(S) | single bond | H | $CH_2CF_3$ | Me | Me | $CH_2SMe$ | O |
| C-10145 | H | single bond | Me | Et | Me | Me | $CH_2SMe$ | O |
| C-10146 | Me | single bond | H | Et | Me | Me | $CH_2SMe$ | O |
| C-10147 | Me(R) | single bond | H | Et | Me | Me | $CH_2SMe$ | O |
| C-10148 | Me(S) | single bond | H | Et | Me | Me | $CH_2SMe$ | O |
| C-10149 | H | single bond | Me | c-Pr | Me | Me | $CH_2SMe$ | O |
| C-10150 | Me | single bond | H | c-Pr | Me | Me | $CH_2SMe$ | O |
| C-10151 | Me(R) | single bond | H | c-Pr | Me | Me | $CH_2SMe$ | O |
| C-10152 | Me(S) | single bond | H | c-Pr | Me | Me | $CH_2SMe$ | O |
| C-10153 | H | single bond | Me | c-Pr(1-CN) | Me | Me | $CH_2SMe$ | O |
| C-10154 | Me | single bond | H | c-Pr(1-CN) | Me | Me | $CH_2SMe$ | O |

TABLE 459

| Compound Number | Y | W | Z | $R^1$ | $R^2$ | $R^3$ | $R^{10}$ | A |
|---|---|---|---|---|---|---|---|---|
| C-10155 | Me(R) | single bond | H | c-Pr(1-CN) | Me | Me | $CH_2SMe$ | O |
| C-10156 | Me(S) | single bond | H | c-Pr(1-CN) | Me | Me | $CH_2SMe$ | O |
| C-10157 | H | single bond | Me | $CH_2CF_3$ | Me | Cl | $CH_2S(=O)_2Me$ | O |
| C-10158 | Me | single bond | H | $CH_2CF_3$ | Me | Cl | $CH_2S(=O)_2Me$ | O |
| C-10159 | Me(R) | single bond | H | $CH_2CF_3$ | Me | Cl | $CH_2S(=O)_2Me$ | O |
| C-10160 | Me(S) | single bond | H | $CH_2CF_3$ | Me | Cl | $CH_2S(=O)_2Me$ | O |

TABLE 459-continued

| Compound Number | Y | W | Z | $R^1$ | $R^2$ | $R^3$ | $R^{10}$ | A |
|---|---|---|---|---|---|---|---|---|
| C-10161 | H | single bond | Me | Et | Me | Cl | $CH_2S(=O)_2Me$ | O |
| C-10162 | Me | single bond | H | Et | Me | Cl | $CH_2S(=O)_2Me$ | O |
| C-10163 | Me(R) | single bond | H | Et | Me | Cl | $CH_2S(=O)_2Me$ | O |
| C-10164 | Me(S) | single bond | H | Et | Me | Cl | $CH_2S(=O)_2Me$ | O |
| C-10165 | H | single bond | Me | c-Pr | Me | Cl | $CH_2S(=O)_2Me$ | O |
| C-10166 | Me | single bond | H | c-Pr | Me | Cl | $CH_2S(=O)_2Me$ | O |
| C-10167 | Me(R) | single bond | H | c-Pr | Me | Cl | $CH_2S(=O)_2Me$ | O |
| C-10168 | Me(S) | single bond | H | c-Pr | Me | Cl | $CH_2S(=O)_2Me$ | O |
| C-10169 | H | single bond | Me | c-Pr(1-CN) | Me | Cl | $CH_2S(=O)_2Me$ | O |
| C-10170 | Me | single bond | H | c-Pr(1-CN) | Me | Cl | $CH_2S(=O)_2Me$ | O |
| C-10171 | Me(R) | single bond | H | c-Pr(1-CN) | Me | Cl | $CH_2S(=O)_2Me$ | O |
| C-10172 | Me(S) | single bond | H | c-Pr(1-CN) | Me | Cl | $CH_2S(=O)_2Me$ | O |
| C-10173 | H | single bond | Me | $CH_2CF_3$ | Me | Me | $CH_2S(=O)_2Me$ | O |
| C-10174 | Me | single bond | H | $CH_2CF_3$ | Me | Me | $CH_2S(=O)_2Me$ | O |
| C-10175 | Me(R) | single bond | H | $CH_2CF_3$ | Me | Me | $CH_2S(=O)_2Me$ | O |
| C-10176 | Me(S) | single bond | H | $CH_2CF_3$ | Me | Me | $CH_2S(=O)_2Me$ | O |
| C-10177 | H | single bond | Me | Et | Me | Me | $CH_2S(=O)_2Me$ | O |
| C-10178 | Me | single bond | H | Et | Me | Me | $CH_2S(=O)_2Me$ | O |
| C-10179 | Me(R) | single bond | H | Et | Me | Me | $CH_2S(=O)_2Me$ | O |
| C-10180 | Me(S) | single bond | H | Et | Me | Me | $CH_2S(=O)_2Me$ | O |
| C-10181 | H | single bond | Me | c-Pr | Me | Me | $CH_2S(=O)_2Me$ | O |
| C-10182 | Me | single bond | H | c-Pr | Me | Me | $CH_2S(=O)_2Me$ | O |
| C-10183 | Me(R) | single bond | H | c-Pr | Me | Me | $CH_2S(=O)_2Me$ | O |
| C-10184 | Me(S) | single bond | H | c-Pr | Me | Me | $CH_2S(=O)_2Me$ | O |
| C-10185 | H | single bond | Me | c-Pr(1-CN) | Me | Me | $CH_2S(=O)_2Me$ | O |
| C-10186 | Me | single bond | H | c-Pr(1-CN) | Me | Me | $CH_2S(=O)_2Me$ | O |
| C-10187 | Me(R) | single bond | H | c-Pr(1-CN) | Me | Me | $CH_2S(=O)_2Me$ | O |
| C-10188 | Me(S) | single bond | H | c-Pr(1-CN) | Me | Me | $CH_2S(=O)_2Me$ | O |
| C-10189 | H | single bond | Me | $CH_2CF_3$ | Me | Cl | $CH_2C(=O)Me$ | O |
| C-10190 | Me | single bond | H | $CH_2CF_3$ | Me | Cl | $CH_2C(=O)Me$ | O |
| C-10191 | Me(R) | single bond | H | $CH_2CF_3$ | Me | Cl | $CH_2C(=O)Me$ | O |
| C-10192 | Me(S) | single bond | H | $CH_2CF_3$ | Me | Cl | $CH_2C(=O)Me$ | O |
| C-10193 | H | single bond | Me | Et | Me | Cl | $CH_2C(=O)Me$ | O |
| C-10194 | Me | single bond | H | Et | Me | Cl | $CH_2C(=O)Me$ | O |
| C-10195 | Me(R) | single bond | H | Et | Me | Cl | $CH_2C(=O)Me$ | O |
| C-10196 | Me(S) | single bond | H | Et | Me | Cl | $CH_2C(=O)Me$ | O |
| C-10197 | H | single bond | Me | c-Pr | Me | Cl | $CH_2C(=O)Me$ | O |
| C-10198 | Me | single bond | H | c-Pr | Me | Cl | $CH_2C(=O)Me$ | O |

TABLE 460

| Compound Number | Y | W | Z | $R^1$ | $R^2$ | $R^3$ | $R^{10}$ | A |
|---|---|---|---|---|---|---|---|---|
| C-10199 | Me(R) | single bond | H | c-Pr | Me | Cl | $CH_2C(=O)Me$ | O |
| C-10200 | Me(S) | single bond | H | c-Pr | Me | Cl | $CH_2C(=O)Me$ | O |
| C-10201 | H | single bond | Me | c-Pr(1-CN) | Me | Cl | $CH_2C(=O)Me$ | O |
| C-10202 | Me | single bond | H | c-Pr(1-CN) | Me | Cl | $CH_2C(=O)Me$ | O |
| C-10203 | Me(R) | single bond | H | c-Pr(1-CN) | Me | Cl | $CH_2C(=O)Me$ | O |
| C-10204 | Me(S) | single bond | H | c-Pr(1-CN) | Me | Cl | $CH_2C(=O)Me$ | O |
| C-10205 | H | single bond | Me | $CH_2CF_3$ | Me | Me | $CH_2C(=O)Me$ | O |
| C-10206 | Me | single bond | H | $CH_2CF_3$ | Me | Me | $CH_2C(=O)Me$ | O |
| C-10207 | Me(R) | single bond | H | $CH_2CF_3$ | Me | Me | $CH_2C(=O)Me$ | O |
| C-10208 | Me(S) | single bond | H | $CH_2CF_3$ | Me | Me | $CH_2C(=O)Me$ | O |
| C-10209 | H | single bond | Me | Et | Me | Me | $CH_2C(=O)Me$ | O |
| C-10210 | Me | single bond | H | Et | Me | Me | $CH_2C(=O)Me$ | O |
| C-10211 | Me(R) | single bond | H | Et | Me | Me | $CH_2C(=O)Me$ | O |
| C-10212 | Me(S) | single bond | H | Et | Me | Me | $CH_2C(=O)Me$ | O |
| C-10213 | H | single bond | Me | c-Pr | Me | Me | $CH_2C(=O)Me$ | O |
| C-10214 | Me | single bond | H | c-Pr | Me | Me | $CH_2C(=O)Me$ | O |
| C-10215 | Me(R) | single bond | H | c-Pr | Me | Me | $CH_2C(=O)Me$ | O |
| C-10216 | Me(S) | single bond | H | c-Pr | Me | Me | $CH_2C(=O)Me$ | O |
| C-10217 | H | single bond | Me | c-Pr(1-CN) | Me | Me | $CH_2C(=O)Me$ | O |
| C-10218 | Me | single bond | H | c-Pr(1-CN) | Me | Me | $CH_2C(=O)Me$ | O |
| C-10219 | Me(R) | single bond | H | c-Pr(1-CN) | Me | Me | $CH_2C(=O)Me$ | O |
| C-10220 | Me(S) | single bond | H | c-Pr(1-CN) | Me | Me | $CH_2C(=O)Me$ | O |
| C-10221 | H | single bond | Me | $CH_2CF_3$ | Me | Cl | $CH_2C(=O)OMe$ | O |
| C-10222 | Me | single bond | H | $CH_2CF_3$ | Me | Cl | $CH_2C(=O)OMe$ | O |
| C-10223 | Me(R) | single bond | H | $CH_2CF_3$ | Me | Cl | $CH_2C(=O)OMe$ | O |
| C-10224 | Me(S) | single bond | H | $CH_2CF_3$ | Me | Cl | $CH_2C(=O)OMe$ | O |
| C-10225 | H | single bond | Me | Et | Me | Cl | $CH_2C(=O)OMe$ | O |
| C-10226 | Me | single bond | H | Et | Me | Cl | $CH_2C(=O)OMe$ | O |
| C-10227 | Me(R) | single bond | H | Et | Me | Cl | $CH_2C(=O)OMe$ | O |

TABLE 460-continued

| Compound Number | Y | W | Z | $R^1$ | $R^2$ | $R^3$ | $R^{10}$ | A |
|---|---|---|---|---|---|---|---|---|
| C-10228 | Me(S) | single bond | H | Et | Me | Cl | $CH_2C(=O)OMe$ | O |
| C-10229 | H | single bond | Me | c-Pr | Me | Cl | $CH_2C(=O)OMe$ | O |
| C-10230 | Me | single bond | H | c-Pr | Me | Cl | $CH_2C(=O)OMe$ | O |
| C-10231 | Me(R) | single bond | H | c-Pr | Me | Cl | $CH_2C(=O)OMe$ | O |
| C-10232 | Me(S) | single bond | H | c-Pr | Me | Cl | $CH_2C(=O)OMe$ | O |
| C-10233 | H | single bond | Me | c-Pr(1-CN) | Me | Cl | $CH_2C(=O)OMe$ | O |
| C-10234 | Me | single bond | H | c-Pr(1-CN) | Me | Cl | $CH_2C(=O)OMe$ | O |
| C-10235 | Me(R) | single bond | H | c-Pr(1-CN) | Me | Cl | $CH_2C(=O)OMe$ | O |
| C-10236 | Me(S) | single bond | H | c-Pr(1-CN) | Me | Cl | $CH_2C(=O)OMe$ | O |
| C-10237 | H | single bond | Me | $CH_2CF_3$ | Me | Me | $CH_2C(=O)OMe$ | O |
| C-10238 | Me | single bond | H | $CH_2CF_3$ | Me | Me | $CH_2C(=O)OMe$ | O |
| C-10239 | Me(R) | single bond | H | $CH_2CF_3$ | Me | Me | $CH_2C(=O)OMe$ | O |
| C-10240 | Me(S) | single bond | H | $CH_2CF_3$ | Me | Me | $CH_2C(=O)OMe$ | O |
| C-10241 | H | single bond | Me | Et | Me | Me | $CH_2C(=O)OMe$ | O |
| C-10242 | Me | single bond | H | Et | Me | Me | $CH_2C(=O)OMe$ | O |

TABLE 461

| Compound Number | Y | W | Z | $R^1$ | $R^2$ | $R^3$ | $R^{10}$ | A |
|---|---|---|---|---|---|---|---|---|
| C-10243 | Me(R) | single bond | H | Et | Me | Me | $CH_2C(=O)OMe$ | O |
| C-10244 | Me(S) | single bond | H | Et | Me | Me | $CH_2C(=O)OMe$ | O |
| C-10245 | H | single bond | Me | c-Pr | Me | Me | $CH_2C(=O)OMe$ | O |
| C-10246 | Me | single bond | H | c-Pr | Me | Me | $CH_2C(=O)OMe$ | O |
| C-10247 | Me(R) | single bond | H | c-Pr | Me | Me | $CH_2C(=O)OMe$ | O |
| C-10248 | Me(S) | single bond | H | c-Pr | Me | Me | $CH_2C(=O)OMe$ | O |
| C-10249 | H | single bond | Me | c-Pr(1-CN) | Me | Me | $CH_2C(=O)OMe$ | O |
| C-10250 | Me | single bond | H | c-Pr(1-CN) | Me | Me | $CH_2C(=O)OMe$ | O |
| C-10251 | Me(R) | single bond | H | c-Pr(1-CN) | Me | Me | $CH_2C(=O)OMe$ | O |
| C-10252 | Me(S) | single bond | H | c-Pr(1-CN) | Me | Me | $CH_2C(=O)OMe$ | O |
| C-10253 | H | single bond | Me | $CH_2CF_3$ | Me | Cl | $CH_2C(=O)NHMe$ | O |
| C-10254 | Me | single bond | H | $CH_2CF_3$ | Me | Cl | $CH_2C(=O)NHMe$ | O |
| C-10255 | Me(R) | single bond | H | $CH_2CF_3$ | Me | Cl | $CH_2C(=O)NHMe$ | O |
| C-10256 | Me(S) | single bond | H | $CH_2CF_3$ | Me | Cl | $CH_2C(=O)NHMe$ | O |
| C-10257 | H | single bond | Me | Et | Me | Cl | $CH_2C(=O)NHMe$ | O |
| C-10258 | Me | single bond | H | Et | Me | Cl | $CH_2C(=O)NHMe$ | O |
| C-10259 | Me(R) | single bond | H | Et | Me | Cl | $CH_2C(=O)NHMe$ | O |
| C-10260 | Me(S) | single bond | H | Et | Me | Cl | $CH_2C(=O)NHMe$ | O |
| C-10261 | H | single bond | Me | c-Pr | Me | Cl | $CH_2C(=O)NHMe$ | O |
| C-10262 | Me | single bond | H | c-Pr | Me | Cl | $CH_2C(=O)NHMe$ | O |
| C-10263 | Me(R) | single bond | H | c-Pr | Me | Cl | $CH_2C(=O)NHMe$ | O |
| C-10264 | Me(S) | single bond | H | c-Pr | Me | Cl | $CH_2C(=O)NHMe$ | O |
| C-10265 | H | single bond | Me | c-Pr(1-CN) | Me | Cl | $CH_2C(=O)NHMe$ | O |
| C-10266 | Me | single bond | H | c-Pr(1-CN) | Me | Cl | $CH_2C(=O)NHMe$ | O |
| C-10267 | Me(R) | single bond | H | c-Pr(1-CN) | Me | Cl | $CH_2C(=O)NHMe$ | O |
| C-10268 | Me(S) | single bond | H | c-Pr(1-CN) | Me | Cl | $CH_2C(=O)NHMe$ | O |
| C-10269 | H | single bond | Me | $CH_2CF_3$ | Me | Me | $CH_2C(=O)NHMe$ | O |
| C-10270 | Me | single bond | H | $CH_2CF_3$ | Me | Me | $CH_2C(=O)NHMe$ | O |
| C-10271 | Me(R) | single bond | H | $CH_2CF_3$ | Me | Me | $CH_2C(=O)NHMe$ | O |
| C-10272 | Me(S) | single bond | H | $CH_2CF_3$ | Me | Me | $CH_2C(=O)NHMe$ | O |
| C-10273 | H | single bond | Me | Et | Me | Me | $CH_2C(=O)NHMe$ | O |
| C-10274 | Me | single bond | H | Et | Me | Me | $CH_2C(=O)NHMe$ | O |
| C-10275 | Me(R) | single bond | H | Et | Me | Me | $CH_2C(=O)NHMe$ | O |
| C-10276 | Me(S) | single bond | H | Et | Me | Me | $CH_2C(=O)NHMe$ | O |
| C-10277 | H | single bond | Me | c-Pr | Me | Me | $CH_2C(=O)NHMe$ | O |
| C-10278 | Me | single bond | H | c-Pr | Me | Me | $CH_2C(=O)NHMe$ | O |
| C-10279 | Me(R) | single bond | H | c-Pr | Me | Me | $CH_2C(=O)NHMe$ | O |
| C-10280 | Me(S) | single bond | H | c-Pr | Me | Me | $CH_2C(=O)NHMe$ | O |
| C-10281 | H | single bond | Me | c-Pr(1-CN) | Me | Me | $CH_2C(=O)NHMe$ | O |
| C-10282 | Me | single bond | H | c-Pr(1-CN) | Me | Me | $CH_2C(=O)NHMe$ | O |
| C-10283 | Me(R) | single bond | H | c-Pr(1-CN) | Me | Me | $CH_2C(=O)NHMe$ | O |
| C-10284 | Me(S) | single bond | H | c-Pr(1-CN) | Me | Me | $CH_2C(=O)NHMe$ | O |
| C-10285 | H | single bond | Me | $CH_2CF_3$ | Me | Cl | $CH_2OC(=O)Me$ | O |
| C-10286 | Me | single bond | H | $CH_2CF_3$ | Me | Cl | $CH_2OC(=O)Me$ | O |

TABLE 462

| Compound Number | Y | W | Z | $R^1$ | $R^2$ | $R^3$ | $R^{10}$ | A |
|---|---|---|---|---|---|---|---|---|
| C-10287 | Me(R) | single bond | H | $CH_2CF_3$ | Me | Cl | $CH_2OC(=O)Me$ | O |
| C-10288 | Me(S) | single bond | H | $CH_2CF_3$ | Me | Cl | $CH_2OC(=O)Me$ | O |
| C-10289 | H | single bond | Me | Et | Me | Cl | $CH_2OC(=O)Me$ | O |
| C-10290 | Me | single bond | H | Et | Me | Cl | $CH_2OC(=O)Me$ | O |
| C-10291 | Me(R) | single bond | H | Et | Me | Cl | $CH_2OC(=O)Me$ | O |
| C-10292 | Me(S) | single bond | H | Et | Me | Cl | $CH_2OC(=O)Me$ | O |
| C-10293 | H | single bond | Me | c-Pr | Me | Cl | $CH_2OC(=O)Me$ | O |
| C-10294 | Me | single bond | H | c-Pr | Me | Cl | $CH_2OC(=O)Me$ | O |
| C-10295 | Me(R) | single bond | H | c-Pr | Me | Cl | $CH_2OC(=O)Me$ | O |
| C-10296 | Me(S) | single bond | H | c-Pr | Me | Cl | $CH_2OC(=O)Me$ | O |
| C-10297 | H | single bond | Me | c-Pr(1-CN) | Me | Cl | $CH_2OC(=O)Me$ | O |
| C-10298 | Me | single bond | H | c-Pr(1-CN) | Me | Cl | $CH_2OC(=O)Me$ | O |
| C-10299 | Me(R) | single bond | H | c-Pr(1-CN) | Me | Cl | $CH_2OC(=O)Me$ | O |
| C-10300 | Me(S) | single bond | H | c-Pr(1-CN) | Me | Cl | $CH_2OC(=O)Me$ | O |
| C-10301 | H | single bond | Me | $CH_2CF_3$ | Me | Me | $CH_2OC(=O)Me$ | O |
| C-10302 | Me | single bond | H | $CH_2CF_3$ | Me | Me | $CH_2OC(=O)Me$ | O |
| C-10303 | Me(R) | single bond | H | $CH_2CF_3$ | Me | Me | $CH_2OC(=O)Me$ | O |
| C-10304 | Me(S) | single bond | H | $CH_2CF_3$ | Me | Me | $CH_2OC(=O)Me$ | O |
| C-10305 | H | single bond | Me | Et | Me | Me | $CH_2OC(=O)Me$ | O |
| C-10306 | Me | single bond | H | Et | Me | Me | $CH_2OC(=O)Me$ | O |
| C-10307 | Me(R) | single bond | H | Et | Me | Me | $CH_2OC(=O)Me$ | O |
| C-10308 | Me(S) | single bond | H | Et | Me | Me | $CH_2OC(=O)Me$ | O |
| C-10309 | H | single bond | Me | c-Pr | Me | Me | $CH_2OC(=O)Me$ | O |
| C-10310 | Me | single bond | H | c-Pr | Me | Me | $CH_2OC(=O)Me$ | O |
| C-10311 | Me(R) | single bond | H | c-Pr | Me | Me | $CH_2OC(=O)Me$ | O |
| C-10312 | Me(S) | single bond | H | c-Pr | Me | Me | $CH_2OC(=O)Me$ | O |
| C-10313 | H | single bond | Me | c-Pr(1-CN) | Me | Me | $CH_2OC(=O)Me$ | O |
| C-10314 | Me | single bond | H | c-Pr(1-CN) | Me | Me | $CH_2OC(=O)Me$ | O |
| C-10315 | Me(R) | single bond | H | c-Pr(1-CN) | Me | Me | $CH_2OC(=O)Me$ | O |
| C-10316 | Me(S) | single bond | H | c-Pr(1-CN) | Me | Me | $CH_2OC(=O)Me$ | O |
| C-10317 | H | single bond | Me | $CH_2CF_3$ | Me | Cl | $CH_2OC(=O)(i-Pr)$ | O |
| C-10318 | Me | single bond | H | $CH_2CF_3$ | Me | Cl | $CH_2OC(=O)(i-Pr)$ | O |
| C-10319 | Me(R) | single bond | H | $CH_2CF_3$ | Me | Cl | $CH_2OC(=O)(i-Pr)$ | O |
| C-10320 | Me(S) | single bond | H | $CH_2CF_3$ | Me | Cl | $CH_2OC(=O)(i-Pr)$ | O |
| C-10321 | H | single bond | Me | Et | Me | Cl | $CH_2OC(=O)(i-Pr)$ | O |
| C-10322 | Me | single bond | H | Et | Me | Cl | $CH_2OC(=O)(i-Pr)$ | O |
| C-10323 | Me(R) | single bond | H | Et | Me | Cl | $CH_2OC(=O)(i-Pr)$ | O |
| C-10324 | Me(S) | single bond | H | Et | Me | Cl | $CH_2OC(=O)(i-Pr)$ | O |
| C-10325 | H | single bond | Me | c-Pr | Me | Cl | $CH_2OC(=O)(i-Pr)$ | O |
| C-10326 | Me | single bond | H | c-Pr | Me | Cl | $CH_2OC(=O)(i-Pr)$ | O |
| C-10327 | Me(R) | single bond | H | c-Pr | Me | Cl | $CH_2OC(=O)(i-Pr)$ | O |
| C-10328 | Me(S) | single bond | H | c-Pr | Me | Cl | $CH_2OC(=O)(i-Pr)$ | O |
| C-10329 | H | single bond | Me | c-Pr(1-CN) | Me | Cl | $CH_2OC(=O)(i-Pr)$ | O |
| C-10330 | Me | single bond | H | c-Pr(1-CN) | Me | Cl | $CH_2OC(=O)(i-Pr)$ | O |

TABLE 463

| Compound Number | Y | W | Z | $R^1$ | $R^2$ | $R^3$ | $R^{10}$ | A |
|---|---|---|---|---|---|---|---|---|
| C-10331 | Me(R) | single bond | H | c-Pr(1-CN) | Me | Cl | $CH_2OC(=O)(i-Pr)$ | O |
| C-10332 | Me(S) | single bond | H | c-Pr(1-CN) | Me | Cl | $CH_2OC(=O)(i-Pr)$ | O |
| C-10333 | H | single bond | Me | $CH_2CF_3$ | Me | Me | $CH_2OC(=O)(i-Pr)$ | O |
| C-10334 | Me | single bond | H | $CH_2CF_3$ | Me | Me | $CH_2OC(=O)(i-Pr)$ | O |
| C-10335 | Me(R) | single bond | H | $CH_2CF_3$ | Me | Me | $CH_2OC(=O)(i-Pr)$ | O |
| C-10336 | Me(S) | single bond | H | $CH_2CF_3$ | Me | Me | $CH_2OC(=O)(i-Pr)$ | O |
| C-10337 | H | single bond | Me | Et | Me | Me | $CH_2OC(=O)(i-Pr)$ | O |
| C-10338 | Me | single bond | H | Et | Me | Me | $CH_2OC(=O)(i-Pr)$ | O |
| C-10339 | Me(R) | single bond | H | Et | Me | Me | $CH_2OC(=O)(i-Pr)$ | O |
| C-10340 | Me(S) | single bond | H | Et | Me | Me | $CH_2OC(=O)(i-Pr)$ | O |
| C-10341 | H | single bond | Me | c-Pr | Me | Me | $CH_2OC(=O)(i-Pr)$ | O |
| C-10342 | Me | single bond | H | c-Pr | Me | Me | $CH_2OC(=O)(i-Pr)$ | O |
| C-10343 | Me(R) | single bond | H | c-Pr | Me | Me | $CH_2OC(=O)(i-Pr)$ | O |
| C-10344 | Me(S) | single bond | H | c-Pr | Me | Me | $CH_2OC(=O)(i-Pr)$ | O |
| C-10345 | H | single bond | Me | c-Pr(1-CN) | Me | Me | $CH_2OC(=O)(i-Pr)$ | O |
| C-10346 | Me | single bond | H | c-Pr(1-CN) | Me | Me | $CH_2OC(=O)(i-Pr)$ | O |
| C-10347 | Me(R) | single bond | H | c-Pr(1-CN) | Me | Me | $CH_2OC(=O)(i-Pr)$ | O |
| C-10348 | Me(S) | single bond | H | c-Pr(1-CN) | Me | Me | $CH_2OC(=O)(i-Pr)$ | O |
| C-10349 | H | single bond | Me | $CH_2CF_3$ | Me | Cl | $CH_2OC(=O)(t-Bu)$ | O |
| C-10350 | Me | single bond | H | $CH_2CF_3$ | Me | Cl | $CH_2OC(=O)(t-Bu)$ | O |
| C-10351 | Me(R) | single bond | H | $CH_2CF_3$ | Me | Cl | $CH_2OC(=O)(t-Bu)$ | O |
| C-10352 | Me(S) | single bond | H | $CH_2CF_3$ | Me | Cl | $CH_2OC(=O)(t-Bu)$ | O |
| C-10353 | H | single bond | Me | Et | Me | Cl | $CH_2OC(=O)(t-Bu)$ | O |

TABLE 463-continued

| Compound Number | Y | W | Z | $R^1$ | $R^2$ | $R^3$ | $R^{10}$ | A |
|---|---|---|---|---|---|---|---|---|
| C-10354 | Me | single bond | H | Et | Me | Cl | $CH_2OC(=O)(t\text{-}Bu)$ | O |
| C-10355 | Me(R) | single bond | H | Et | Me | Cl | $CH_2OC(=O)(t\text{-}Bu)$ | O |
| C-10356 | Me(S) | single bond | H | Et | Me | Cl | $CH_2OC(=O)(t\text{-}Bu)$ | O |
| C-10357 | H | single bond | Me | c-Pr | Me | Cl | $CH_2OC(=O)(t\text{-}Bu)$ | O |
| C-10358 | Me | single bond | H | c-Pr | Me | Cl | $CH_2OC(=O)(t\text{-}Bu)$ | O |
| C-10359 | Me(R) | single bond | H | c-Pr | Me | Cl | $CH_2OC(=O)(t\text{-}Bu)$ | O |
| C-10360 | Me(S) | single bond | H | c-Pr | Me | Cl | $CH_2OC(=O)(t\text{-}Bu)$ | O |
| C-10361 | H | single bond | Me | c-Pr(1-CN) | Me | Cl | $CH_2OC(=O)(t\text{-}Bu)$ | O |
| C-10362 | Me | single bond | H | c-Pr(1-CN) | Me | Cl | $CH_2OC(=O)(t\text{-}Bu)$ | O |
| C-10363 | Me(R) | single bond | H | c-Pr(1-CN) | Me | Cl | $CH_2OC(=O)(t\text{-}Bu)$ | O |
| C-10364 | Me(S) | single bond | H | c-Pr(1-CN) | Me | Cl | $CH_2OC(=O)(t\text{-}Bu)$ | O |
| C-10365 | H | single bond | Me | $CH_2CF_3$ | Me | Me | $CH_2OC(=O)(t\text{-}Bu)$ | O |
| C-10366 | Me | single bond | H | $CH_2CF_3$ | Me | Me | $CH_2OC(=O)(t\text{-}Bu)$ | O |
| C-10367 | Me(R) | single bond | H | $CH_2CF_3$ | Me | Me | $CH_2OC(=O)(t\text{-}Bu)$ | O |
| C-10368 | Me(S) | single bond | H | $CH_2CF_3$ | Me | Me | $CH_2OC(=O)(t\text{-}Bu)$ | O |
| C-10369 | H | single bond | Me | Et | Me | Me | $CH_2OC(=O)(t\text{-}Bu)$ | O |
| C-10370 | Me | single bond | H | Et | Me | Me | $CH_2OC(=O)(t\text{-}Bu)$ | O |
| C-10371 | Me(R) | single bond | H | Et | Me | Me | $CH_2OC(=O)(t\text{-}Bu)$ | O |
| C-10372 | Me(S) | single bond | H | Et | Me | Me | $CH_2OC(=O)(t\text{-}Bu)$ | O |
| C-10373 | H | single bond | Me | c-Pr | Me | Me | $CH_2OC(=O)(t\text{-}Bu)$ | O |
| C-10374 | Me | single bond | H | c-Pr | Me | Me | $CH_2OC(=O)(t\text{-}Bu)$ | O |

TABLE 464

| Compound Number | Y | W | Z | $R^1$ | $R^2$ | $R^3$ | $R^{10}$ | A |
|---|---|---|---|---|---|---|---|---|
| C-10375 | Me(R) | single bond | H | c-Pr | Me | Me | $CH_2OC(=O)(t\text{-}Bu)$ | O |
| C-10376 | Me(S) | single bond | H | c-Pr | Me | Me | $CH_2OC(=O)(t\text{-}Bu)$ | O |
| C-10377 | H | single bond | Me | c-Pr(1-CN) | Me | Me | $CH_2OC(=O)(t\text{-}Bu)$ | O |
| C-10378 | Me | single bond | H | c-Pr(1-CN) | Me | Me | $CH_2OC(=O)(t\text{-}Bu)$ | O |
| C-10379 | Me(R) | single bond | H | c-Pr(1-CN) | Me | Me | $CH_2OC(=O)(t\text{-}Bu)$ | O |
| C-10380 | Me(S) | single bond | H | c-Pr(1-CN) | Me | Me | $CH_2OC(=O)(t\text{-}Bu)$ | O |
| C-10381 | H | single bond | Me | $CH_2CF_3$ | Me | Cl | $CH_2OC(=O)OEt$ | O |
| C-10382 | Me | single bond | H | $CH_2CF_3$ | Me | Cl | $CH_2OC(=O)OEt$ | O |
| C-10383 | Me(R) | single bond | H | $CH_2CF_3$ | Me | Cl | $CH_2OC(=O)OEt$ | O |
| C-10384 | Me(S) | single bond | H | $CH_2CF_3$ | Me | Cl | $CH_2OC(=O)OEt$ | O |
| C-10385 | H | single bond | Me | Et | Me | Cl | $CH_2OC(=O)OEt$ | O |
| C-10386 | Me | single bond | H | Et | Me | Cl | $CH_2OC(=O)OEt$ | O |
| C-10387 | Me(R) | single bond | H | Et | Me | Cl | $CH_2OC(=O)OEt$ | O |
| C-10388 | Me(S) | single bond | H | Et | Me | Cl | $CH_2OC(=O)OEt$ | O |
| C-10389 | H | single bond | Me | c-Pr | Me | Cl | $CH_2OC(=O)OEt$ | O |
| C-10390 | Me | single bond | H | c-Pr | Me | Cl | $CH_2OC(=O)OEt$ | O |
| C-10391 | Me(R) | single bond | H | c-Pr | Me | Cl | $CH_2OC(=O)OEt$ | O |
| C-10392 | Me(S) | single bond | H | c-Pr | Me | Cl | $CH_2OC(=O)OEt$ | O |
| C-10393 | H | single bond | Me | c-Pr(1-CN) | Me | Cl | $CH_2OC(=O)OEt$ | O |
| C-10394 | Me | single bond | H | c-Pr(1-CN) | Me | Cl | $CH_2OC(=O)OEt$ | O |
| C-10395 | Me(R) | single bond | H | c-Pr(1-CN) | Me | Cl | $CH_2OC(=O)OEt$ | O |
| C-10396 | Me(S) | single bond | H | c-Pr(1-CN) | Me | Cl | $CH_2OC(=O)OEt$ | O |
| C-10397 | H | single bond | Me | $CH_2CF_3$ | Me | Me | $CH_2OC(=O)OEt$ | O |
| C-10398 | Me | single bond | H | $CH_2CF_3$ | Me | Me | $CH_2OC(=O)OEt$ | O |
| C-10399 | Me(R) | single bond | H | $CH_2CF_3$ | Me | Me | $CH_2OC(=O)OEt$ | O |
| C-10400 | Me(S) | single bond | H | $CH_2CF_3$ | Me | Me | $CH_2OC(=O)OEt$ | O |
| C-10401 | H | single bond | Me | Et | Me | Me | $CH_2OC(=O)OEt$ | O |
| C-10402 | Me | single bond | H | Et | Me | Me | $CH_2OC(=O)OEt$ | O |
| C-10403 | Me(R) | single bond | H | Et | Me | Me | $CH_2OC(=O)OEt$ | O |
| C-10404 | Me(S) | single bond | H | Et | Me | Me | $CH_2OC(=O)OEt$ | O |
| C-10405 | H | single bond | Me | c-Pr | Me | Me | $CH_2OC(=O)OEt$ | O |
| C-10406 | Me | single bond | H | c-Pr | Me | Me | $CH_2OC(=O)OEt$ | O |
| C-10407 | Me(R) | single bond | H | c-Pr | Me | Me | $CH_2OC(=O)OEt$ | O |
| C-10408 | Me(S) | single bond | H | c-Pr | Me | Me | $CH_2OC(=O)OEt$ | O |
| C-10409 | H | single bond | Me | c-Pr(1-CN) | Me | Me | $CH_2OC(=O)OEt$ | O |
| C-10410 | Me | single bond | H | c-Pr(1-CN) | Me | Me | $CH_2OC(=O)OEt$ | O |
| C-10411 | Me(R) | single bond | H | c-Pr(1-CN) | Me | Me | $CH_2OC(=O)OEt$ | O |
| C-10412 | Me(S) | single bond | H | c-Pr(1-CN) | Me | Me | $CH_2OC(=O)OEt$ | O |
| C-10413 | H | single bond | Me | $CH_2CF_3$ | Me | Cl | $CH_2OC(=O)O(i\text{-}Pr)$ | O |
| C-10414 | Me | single bond | H | $CH_2CF_3$ | Me | Cl | $CH_2OC(=O)O(i\text{-}Pr)$ | O |
| C-10415 | Me(R) | single bond | H | $CH_2CF_3$ | Me | Cl | $CH_2OC(=O)O(i\text{-}Pr)$ | O |
| C-10416 | Me(S) | single bond | H | $CH_2CF_3$ | Me | Cl | $CH_2OC(=O)O(i\text{-}Pr)$ | O |
| C-10417 | H | single bond | Me | Et | Me | Cl | $CH_2OC(=O)O(i\text{-}Pr)$ | O |
| C-10418 | Me | single bond | H | Et | Me | Cl | $CH_2OC(=O)O(i\text{-}Pr)$ | O |

TABLE 465

| Compound Number | Y | W | Z | $R^1$ | $R^2$ | $R^3$ | $R^{10}$ | A |
|---|---|---|---|---|---|---|---|---|
| C-10419 | Me(R) | single bond | H | Et | Me | Cl | $CH_2OC(=O)O(i-Pr)$ | O |
| C-10420 | Me(S) | single bond | H | Et | Me | Cl | $CH_2OC(=O)O(i-Pr)$ | O |
| C-10421 | H | single bond | Me | c-Pr | Me | Cl | $CH_2OC(=O)O(i-Pr)$ | O |
| C-10422 | Me | single bond | H | c-Pr | Me | Cl | $CH_2OC(=O)O(i-Pr)$ | O |
| C-10423 | Me(R) | single bond | H | c-Pr | Me | Cl | $CH_2OC(=O)O(i-Pr)$ | O |
| C-10424 | Me(S) | single bond | H | c-Pr | Me | Cl | $CH_2OC(=O)O(i-Pr)$ | O |
| C-10425 | H | single bond | Me | c-Pr(1-CN) | Me | Cl | $CH_2OC(=O)O(i-Pr)$ | O |
| C-10426 | Me | single bond | H | c-Pr(1-CN) | Me | Cl | $CH_2OC(=O)O(i-Pr)$ | O |
| C-10427 | Me(R) | single bond | H | c-Pr(1-CN) | Me | Cl | $CH_2OC(=O)O(i-Pr)$ | O |
| C-10428 | Me(S) | single bond | H | c-Pr(1-CN) | Me | Cl | $CH_2OC(=O)O(i-Pr)$ | O |
| C-10429 | H | single bond | Me | $CH_2CF_3$ | Me | Me | $CH_2OC(=O)O(i-Pr)$ | O |
| C-10430 | Me | single bond | H | $CH_2CF_3$ | Me | Me | $CH_2OC(=O)O(i-Pr)$ | O |
| C-10431 | Me(R) | single bond | H | $CH_2CF_3$ | Me | Me | $CH_2OC(=O)O(i-Pr)$ | O |
| C-10432 | Me(S) | single bond | H | $CH_2CF_3$ | Me | Me | $CH_2OC(=O)O(i-Pr)$ | O |
| C-10433 | H | single bond | Me | Et | Me | Me | $CH_2OC(=O)O(i-Pr)$ | O |
| C-10434 | Me | single bond | H | Et | Me | Me | $CH_2OC(=O)O(i-Pr)$ | O |
| C-10435 | Me(R) | single bond | H | Et | Me | Me | $CH_2OC(=O)O(i-Pr)$ | O |
| C-10436 | Me(S) | single bond | H | Et | Me | Me | $CH_2OC(=O)O(i-Pr)$ | O |
| C-10437 | H | single bond | Me | c-Pr | Me | Me | $CH_2OC(=O)O(i-Pr)$ | O |
| C-10438 | Me | single bond | H | c-Pr | Me | Me | $CH_2OC(=O)O(i-Pr)$ | O |
| C-10439 | Me(R) | single bond | H | c-Pr | Me | Me | $CH_2OC(=O)O(i-Pr)$ | O |
| C-10440 | Me(S) | single bond | H | c-Pr | Me | Me | $CH_2OC(=O)O(i-Pr)$ | O |
| C-10441 | H | single bond | Me | c-Pr(1-CN) | Me | Me | $CH_2OC(=O)O(i-Pr)$ | O |
| C-10442 | Me | single bond | H | c-Pr(1-CN) | Me | Me | $CH_2OC(=O)O(i-Pr)$ | O |
| C-10443 | Me(R) | single bond | H | c-Pr(1-CN) | Me | Me | $CH_2OC(=O)O(i-Pr)$ | O |
| C-10444 | Me(S) | single bond | H | c-Pr(1-CN) | Me | Me | $CH_2OC(=O)O(i-Pr)$ | O |
| C-10445 | H | single bond | Me | $CH_2CF_3$ | Me | Cl | $CH_2N(Me)C(=O)OMe$ | O |
| C-10446 | Me | single bond | H | $CH_2CF_3$ | Me | Cl | $CH_2N(Me)C(=O)OMe$ | O |
| C-10447 | Me(R) | single bond | H | $CH_2CF_3$ | Me | Cl | $CH_2N(Me)C(=O)OMe$ | O |
| C-10448 | Me(S) | single bond | H | $CH_2CF_3$ | Me | Cl | $CH_2N(Me)C(=O)OMe$ | O |
| C-10449 | H | single bond | Me | Et | Me | Cl | $CH_2N(Me)C(=O)OMe$ | O |
| C-10450 | Me | single bond | H | Et | Me | Cl | $CH_2N(Me)C(=O)OMe$ | O |
| C-10451 | Me(R) | single bond | H | Et | Me | Cl | $CH_2N(Me)C(=O)OMe$ | O |
| C-10452 | Me(S) | single bond | H | Et | Me | Cl | $CH_2N(Me)C(=O)OMe$ | O |
| C-10453 | H | single bond | Me | c-Pr | Me | Cl | $CH_2N(Me)C(=O)OMe$ | O |
| C-10454 | Me | single bond | H | c-Pr | Me | Cl | $CH_2N(Me)C(=O)OMe$ | O |
| C-10455 | Me(R) | single bond | H | c-Pr | Me | Cl | $CH_2N(Me)C(=O)OMe$ | O |
| C-10456 | Me(S) | single bond | H | c-Pr | Me | Cl | $CH_2N(Me)C(=O)OMe$ | O |
| C-10457 | H | single bond | Me | c-Pr(1-CN) | Me | Cl | $CH_2N(Me)C(=O)OMe$ | O |
| C-10458 | Me | single bond | H | c-Pr(1-CN) | Me | Cl | $CH_2N(Me)C(=O)OMe$ | O |
| C-10459 | Me(R) | single bond | H | c-Pr(1-CN) | Me | Cl | $CH_2N(Me)C(=O)OMe$ | O |
| C-10460 | Me(S) | single bond | H | c-Pr(1-CN) | Me | Cl | $CH_2N(Me)C(=O)OMe$ | O |
| C-10461 | H | single bond | Me | $CH_2CF_3$ | Me | Me | $CH_2N(Me)C(=O)OMe$ | O |
| C-10462 | Me | single bond | H | $CH_2CF_3$ | Me | Me | $CH_2N(Me)C(=O)OMe$ | O |

TABLE 466

| Compound Number | Y | W | Z | $R^1$ | $R^2$ | $R^3$ | $R^{10}$ | A |
|---|---|---|---|---|---|---|---|---|
| C-10463 | Me(R) | single bond | H | $CH_2CF_3$ | Me | Me | $CH_2N(Me)C(=O)OMe$ | O |
| C-10464 | Me(S) | single bond | H | $CH_2CF_3$ | Me | Me | $CH_2N(Me)C(=O)OMe$ | O |
| C-10465 | H | single bond | Me | Et | Me | Me | $CH_2N(Me)C(=O)OMe$ | O |
| C-10466 | Me | single bond | H | Et | Me | Me | $CH_2N(Me)C(=O)OMe$ | O |
| C-10467 | Me(R) | single bond | H | Et | Me | Me | $CH_2N(Me)C(=O)OMe$ | O |
| C-10468 | Me(S) | single bond | H | Et | Me | Me | $CH_2N(Me)C(=O)OMe$ | O |
| C-10469 | H | single bond | Me | c-Pr | Me | Me | $CH_2N(Me)C(=O)OMe$ | O |
| C-10470 | Me | single bond | H | c-Pr | Me | Me | $CH_2N(Me)C(=O)OMe$ | O |
| C-10471 | Me(R) | single bond | H | c-Pr | Me | Me | $CH_2N(Me)C(=O)OMe$ | O |
| C-10472 | Me(S) | single bond | H | c-Pr | Me | Me | $CH_2N(Me)C(=O)OMe$ | O |
| C-10473 | H | single bond | Me | c-Pr(1-CN) | Me | Me | $CH_2N(Me)C(=O)OMe$ | O |
| C-10474 | Me | single bond | H | c-Pr(1-CN) | Me | Me | $CH_2N(Me)C(=O)OMe$ | O |
| C-10475 | Me(R) | single bond | H | c-Pr(1-CN) | Me | Me | $CH_2N(Me)C(=O)OMe$ | O |
| C-10476 | Me(S) | single bond | H | c-Pr(1-CN) | Me | Me | $CH_2N(Me)C(=O)OMe$ | O |
| C-10477 | H | single bond | Me | $CH_2CF_3$ | Me | Cl | $CH_2OCH_2CH_2OMe$ | O |
| C-10478 | Me | single bond | H | $CH_2CF_3$ | Me | Cl | $CH_2OCH_2CH_2OMe$ | O |
| C-10479 | Me(R) | single bond | H | $CH_2CF_3$ | Me | Cl | $CH_2OCH_2CH_2OMe$ | O |
| C-10480 | Me(S) | single bond | H | $CH_2CF_3$ | Me | Cl | $CH_2OCH_2CH_2OMe$ | O |
| C-10481 | H | single bond | Me | Et | Me | Cl | $CH_2OCH_2CH_2OMe$ | O |
| C-10482 | Me | single bond | H | Et | Me | Cl | $CH_2OCH_2CH_2OMe$ | O |
| C-10483 | Me(R) | single bond | H | Et | Me | Cl | $CH_2OCH_2CH_2OMe$ | O |

TABLE 466-continued

| Compound Number | Y | W | Z | $R^1$ | $R^2$ | $R^3$ | $R^{10}$ | A |
|---|---|---|---|---|---|---|---|---|
| C-10484 | Me(S) | single bond | H | Et | Me | Cl | $CH_2OCH_2CH_2OMe$ | O |
| C-10485 | H | single bond | Me | c-Pr | Me | Cl | $CH_2OCH_2CH_2OMe$ | O |
| C-10486 | Me | single bond | H | c-Pr | Me | Cl | $CH_2OCH_2CH_2OMe$ | O |
| C-10487 | Me(R) | single bond | H | c-Pr | Me | Cl | $CH_2OCH_2CH_2OMe$ | O |
| C-10488 | Me(S) | single bond | H | c-Pr | Me | Cl | $CH_2OCH_2CH_2OMe$ | O |
| C-10489 | H | single bond | Me | c-Pr(1-CN) | Me | Cl | $CH_2OCH_2CH_2OMe$ | O |
| C-10490 | Me | single bond | H | c-Pr(1-CN) | Me | Cl | $CH_2OCH_2CH_2OMe$ | O |
| C-10491 | Me(R) | single bond | H | c-Pr(1-CN) | Me | Cl | $CH_2OCH_2CH_2OMe$ | O |
| C-10492 | Me(S) | single bond | H | c-Pr(1-CN) | Me | Cl | $CH_2OCH_2CH_2OMe$ | O |
| C-10493 | H | single bond | Me | $CH_2CF_3$ | Me | Me | $CH_2OCH_2CH_2OMe$ | O |
| C-10494 | Me | single bond | H | $CH_2CF_3$ | Me | Me | $CH_2OCH_2CH_2OMe$ | O |
| C-10495 | Me(R) | single bond | H | $CH_2CF_3$ | Me | Me | $CH_2OCH_2CH_2OMe$ | O |
| C-10496 | Me(S) | single bond | H | $CH_2CF_3$ | Me | Me | $CH_2OCH_2CH_2OMe$ | O |
| C-10497 | H | single bond | Me | Et | Me | Me | $CH_2OCH_2CH_2OMe$ | O |
| C-10498 | Me | single bond | H | Et | Me | Me | $CH_2OCH_2CH_2OMe$ | O |
| C-10499 | Me(R) | single bond | H | Et | Me | Me | $CH_2OCH_2CH_2OMe$ | O |
| C-10500 | Me(S) | single bond | H | Et | Me | Me | $CH_2OCH_2CH_2OMe$ | O |
| C-10501 | H | single bond | Me | c-Pr | Me | Me | $CH_2OCH_2CH_2OMe$ | O |
| C-10502 | Me | single bond | H | c-Pr | Me | Me | $CH_2OCH_2CH_2OMe$ | O |
| C-10503 | Me(R) | single bond | H | c-Pr | Me | Me | $CH_2OCH_2CH_2OMe$ | O |
| C-10504 | Me(S) | single bond | H | c-Pr | Me | Me | $CH_2OCH_2CH_2OMe$ | O |
| C-10505 | H | single bond | Me | c-Pr(1-CN) | Me | Me | $CH_2OCH_2CH_2OMe$ | O |
| C-10506 | Me | single bond | H | c-Pr(1-CN) | Me | Me | $CH_2OCH_2CH_2OMe$ | O |

TABLE 467

| Compound Number | Y | W | Z | $R^1$ | $R^2$ | $R^3$ | $R^{10}$ | A |
|---|---|---|---|---|---|---|---|---|
| C-10507 | Me(R) | single bond | H | c-Pr(1-CN) | Me | Me | $CH_2OCH_2CH_2OMe$ | O |
| C-10508 | Me(S) | single bond | H | c-Pr(1-CN) | Me | Me | $CH_2OCH_2CH_2OMe$ | O |
| C-10509 | H | single bond | Me | $CH_2CF_3$ | Me | Cl | $CH_2OCH_2CH_2CN$ | O |
| C-10510 | Me | single bond | H | $CH_2CF_3$ | Me | Cl | $CH_2OCH_2CH_2CN$ | O |
| C-10511 | Me(R) | single bond | H | $CH_2CF_3$ | Me | Cl | $CH_2OCH_2CH_2CN$ | O |
| C-10512 | Me(S) | single bond | H | $CH_2CF_3$ | Me | Cl | $CH_2OCH_2CH_2CN$ | O |
| C-10513 | H | single bond | Me | Et | Me | Cl | $CH_2OCH_2CH_2CN$ | O |
| C-10514 | Me | single bond | H | Et | Me | Cl | $CH_2OCH_2CH_2CN$ | O |
| C-10515 | Me(R) | single bond | H | Et | Me | Cl | $CH_2OCH_2CH_2CN$ | O |
| C-10516 | Me(S) | single bond | H | Et | Me | Cl | $CH_2OCH_2CH_2CN$ | O |
| C-10517 | H | single bond | Me | c-Pr | Me | Cl | $CH_2OCH_2CH_2CN$ | O |
| C-10518 | Me | single bond | H | c-Pr | Me | Cl | $CH_2OCH_2CH_2CN$ | O |
| C-10519 | Me(R) | single bond | H | c-Pr | Me | Cl | $CH_2OCH_2CH_2CN$ | O |
| C-10520 | Me(S) | single bond | H | c-Pr | Me | Cl | $CH_2OCH_2CH_2CN$ | O |
| C-10521 | H | single bond | Me | c-Pr(1-CN) | Me | Cl | $CH_2OCH_2CH_2CN$ | O |
| C-10522 | Me | single bond | H | c-Pr(1-CN) | Me | Cl | $CH_2OCH_2CH_2CN$ | O |
| C-10523 | Me(R) | single bond | H | c-Pr(1-CN) | Me | Cl | $CH_2OCH_2CH_2CN$ | O |
| C-10524 | Me(S) | single bond | H | c-Pr(1-CN) | Me | Cl | $CH_2OCH_2CH_2CN$ | O |
| C-10525 | H | single bond | Me | $CH_2CF_3$ | Me | Me | $CH_2OCH_2CH_2CN$ | O |
| C-10526 | Me | single bond | H | $CH_2CF_3$ | Me | Me | $CH_2OCH_2CH_2CN$ | O |
| C-10527 | Me(R) | single bond | H | $CH_2CF_3$ | Me | Me | $CH_2OCH_2CH_2CN$ | O |
| C-10528 | Me(S) | single bond | H | $CH_2CF_3$ | Me | Me | $CH_2OCH_2CH_2CN$ | O |
| C-10529 | H | single bond | Me | Et | Me | Me | $CH_2OCH_2CH_2CN$ | O |
| C-10530 | Me | single bond | H | Et | Me | Me | $CH_2OCH_2CH_2CN$ | O |
| C-10531 | Me(R) | single bond | H | Et | Me | Me | $CH_2OCH_2CH_2CN$ | O |
| C-10532 | Me(S) | single bond | H | Et | Me | Me | $CH_2OCH_2CH_2CN$ | O |
| C-10533 | H | single bond | Me | c-Pr | Me | Me | $CH_2OCH_2CH_2CN$ | O |
| C-10534 | Me | single bond | H | c-Pr | Me | Me | $CH_2OCH_2CH_2CN$ | O |
| C-10535 | Me(R) | single bond | H | c-Pr | Me | Me | $CH_2OCH_2CH_2CN$ | O |
| C-10536 | Me(S) | single bond | H | c-Pr | Me | Me | $CH_2OCH_2CH_2CN$ | O |
| C-10537 | H | single bond | Me | c-Pr(1-CN) | Me | Me | $CH_2OCH_2CH_2CN$ | O |
| C-10538 | Me | single bond | H | c-Pr(1-CN) | Me | Me | $CH_2OCH_2CH_2CN$ | O |
| C-10539 | Me(R) | single bond | H | c-Pr(1-CN) | Me | Me | $CH_2OCH_2CH_2CN$ | O |
| C-10540 | Me(S) | single bond | H | c-Pr(1-CN) | Me | Me | $CH_2OCH_2CH_2CN$ | O |
| C-10541 | H | single bond | Me | $CH_2CF_3$ | Me | Cl | $CH_2OCH_2CH_2S(=O)_2Me$ | O |
| C-10542 | Me | single bond | H | $CH_2CF_3$ | Me | Cl | $CH_2OCH_2CH_2S(=O)_2Me$ | O |
| C-10543 | Me(R) | single bond | H | $CH_2CF_3$ | Me | Cl | $CH_2OCH_2CH_2S(=O)_2Me$ | O |
| C-10544 | Me(S) | single bond | H | $CH_2CF_3$ | Me | Cl | $CH_2OCH_2CH_2S(=O)_2Me$ | O |
| C-10545 | H | single bond | Me | Et | Me | Cl | $CH_2OCH_2CH_2S(=O)_2Me$ | O |
| C-10546 | Me | single bond | H | Et | Me | Cl | $CH_2OCH_2CH_2S(=O)_2Me$ | O |
| C-10547 | Me(R) | single bond | H | Et | Me | Cl | $CH_2OCH_2CH_2S(=O)_2Me$ | O |
| C-10548 | Me(S) | single bond | H | Et | Me | Cl | $CH_2OCH_2CH_2S(=O)_2Me$ | O |

TABLE 467-continued

| Compound Number | Y | W | Z | $R^1$ | $R^2$ | $R^3$ | $R^{10}$ | A |
|---|---|---|---|---|---|---|---|---|
| C-10549 | H | single bond | Me | c-Pr | Me | Cl | $CH_2OCH_2CH_2S(=O)_2Me$ | O |
| C-10550 | Me | single bond | H | c-Pr | Me | Cl | $CH_2OCH_2CH_2S(=O)_2Me$ | O |

TABLE 468

| Compound Number | Y | W | Z | $R^1$ | $R^2$ | $R^3$ | $R^{10}$ | A |
|---|---|---|---|---|---|---|---|---|
| C-10551 | Me(R) | single bond | H | c-Pr | Me | Cl | $CH_2OCH_2CH_2S(=O)_2Me$ | O |
| C-10552 | Me(S) | single bond | H | c-Pr | Me | Cl | $CH_2OCH_2CH_2S(=O)_2Me$ | O |
| C-10553 | H | single bond | Me | c-Pr(1-CN) | Me | Cl | $CH_2OCH_2CH_2S(=O)_2Me$ | O |
| C-10554 | Me | single bond | H | c-Pr(1-CN) | Me | Cl | $CH_2OCH_2CH_2S(=O)_2Me$ | O |
| C-10555 | Me(R) | single bond | H | c-Pr(1-CN) | Me | Cl | $CH_2OCH_2CH_2S(=O)_2Me$ | O |
| C-10556 | Me(S) | single bond | H | c-Pr(1-CN) | Me | Cl | $CH_2OCH_2CH_2S(=O)_2Me$ | O |
| C-10557 | H | single bond | Me | $CH_2CF_3$ | Me | Me | $CH_2OCH_2CH_2S(=O)_2Me$ | O |
| C-10558 | Me | single bond | H | $CH_2CF_3$ | Me | Me | $CH_2OCH_2CH_2S(=O)_2Me$ | O |
| C-10559 | Me(R) | single bond | H | $CH_2CF_3$ | Me | Me | $CH_2OCH_2CH_2S(=O)_2Me$ | O |
| C-10560 | Me(S) | single bond | H | $CH_2CF_3$ | Me | Me | $CH_2OCH_2CH_2S(=O)_2Me$ | O |
| C-10561 | H | single bond | Me | Et | Me | Me | $CH_2OCH_2CH_2S(=O)_2Me$ | O |
| C-10562 | Me | single bond | H | Et | Me | Me | $CH_2OCH_2CH_2S(=O)_2Me$ | O |
| C-10563 | Me(R) | single bond | H | Et | Me | Me | $CH_2OCH_2CH_2S(=O)_2Me$ | O |
| C-10564 | Me(S) | single bond | H | Et | Me | Me | $CH_2OCH_2CH_2S(=O)_2Me$ | O |
| C-10565 | H | single bond | Me | c-Pr | Me | Me | $CH_2OCH_2CH_2S(=O)_2Me$ | O |
| C-10566 | Me | single bond | H | c-Pr | Me | Me | $CH_2OCH_2CH_2S(=O)_2Me$ | O |
| C-10567 | Me(R) | single bond | H | c-Pr | Me | Me | $CH_2OCH_2CH_2S(=O)_2Me$ | O |
| C-10568 | Me(S) | single bond | H | c-Pr | Me | Me | $CH_2OCH_2CH_2S(=O)_2Me$ | O |
| C-10569 | H | single bond | Me | c-Pr(1-CN) | Me | Me | $CH_2OCH_2CH_2S(=O)_2Me$ | O |
| C-10570 | Me | single bond | H | c-Pr(1-CN) | Me | Me | $CH_2OCH_2CH_2S(=O)_2Me$ | O |
| C-10571 | Me(R) | single bond | H | c-Pr(1-CN) | Me | Me | $CH_2OCH_2CH_2S(=O)_2Me$ | O |
| C-10572 | Me(S) | single bond | H | c-Pr(1-CN) | Me | Me | $CH_2OCH_2CH_2S(=O)_2Me$ | O |
| C-10573 | H | single bond | Me | $CH_2CF_3$ | Me | Cl | $CH_2$(5-Me-1,3-dioxol-2-one-4-yl) | O |
| C-10574 | Me | single bond | H | $CH_2CF_3$ | Me | Cl | $CH_2$(5-Me-1,3-dioxol-2-one-4-yl) | O |
| C-10575 | Me(R) | single bond | H | $CH_2CF_3$ | Me | Cl | $CH_2$(5-Me-1,3-dioxol-2-one-4-yl) | O |
| C-10576 | Me(S) | single bond | H | $CH_2CF_3$ | Me | Cl | $CH_2$(5-Me-1,3-dioxol-2-one-4-yl) | O |
| C-10577 | H | single bond | Me | Et | Me | Cl | $CH_2$(5-Me-1,3-dioxol-2-one-4-yl) | O |
| C-10578 | Me | single bond | H | Et | Me | Cl | $CH_2$(5-Me-1,3-dioxol-2-one-4-yl) | O |
| C-10579 | Me(R) | single bond | H | Et | Me | Cl | $CH_2$(5-Me-1,3-dioxol-2-one-4-yl) | O |
| C-10580 | Me(S) | single bond | H | Et | Me | Cl | $CH_2$(5-Me-1,3-dioxol-2-one-4-yl) | O |
| C-10581 | H | single bond | Me | c-Pr | Me | Cl | $CH_2$(5-Me-1,3-dioxol-2-one-4-yl) | O |
| C-10582 | Me | single bond | H | c-Pr | Me | Cl | $CH_2$(5-Me-1,3-dioxol-2-one-4-yl) | O |
| C-10583 | Me(R) | single bond | H | c-Pr | Me | Cl | $CH_2$(5-Me-1,3-dioxol-2-one-4-yl) | O |
| C-10584 | Me(S) | single bond | H | c-Pr | Me | Cl | $CH_2$(5-Me-1,3-dioxol-2-one-4-yl) | O |
| C-10585 | H | single bond | Me | c-Pr(1-CN) | Me | Cl | $CH_2$(5-Me-1,3-dioxol-2-one-4-yl) | O |
| C-10586 | Me | single bond | H | c-Pr(1-CN) | Me | Cl | $CH_2$(5-Me-1,3-dioxol-2-one-4-yl) | O |
| C-10587 | Me(R) | single bond | H | c-Pr(1-CN) | Me | Cl | $CH_2$(5-Me-1,3-dioxol-2-one-4-yl) | O |
| C-10588 | Me(S) | single bond | H | c-Pr(1-CN) | Me | Cl | $CH_2$(5-Me-1,3-dioxol-2-one-4-yl) | O |
| C-10589 | H | single bond | Me | $CH_2CF_3$ | Me | Me | $CH_2$(5-Me-1,3-dioxol-2-one-4-yl) | O |
| C-10590 | Me | single bond | H | $CH_2CF_3$ | Me | Me | $CH_2$(5-Me-1,3-dioxol-2-one-4-yl) | O |
| C-10591 | Me(R) | single bond | H | $CH_2CF_3$ | Me | Me | $CH_2$(5-Me-1,3-dioxol-2-one-4-yl) | O |
| C-10592 | Me(S) | single bond | H | $CH_2CF_3$ | Me | Me | $CH_2$(5-Me-1,3-dioxol-2-one-4-yl) | O |
| C-10593 | H | single bond | Me | Et | Me | Me | $CH_2$(5-Me-1,3-dioxol-2-one-4-yl) | O |
| C-10594 | Me | single bond | H | Et | Me | Me | $CH_2$(5-Me-1,3-dioxol-2-one-4-yl) | O |

TABLE 469

| Compound Number | Y | W | Z | $R^1$ | $R^2$ | $R^3$ | $R^{10}$ | A |
|---|---|---|---|---|---|---|---|---|
| C-10595 | Me(R) | single bond | H | Et | Me | Me | $CH_2$(5-Me-1,3-dioxol-2-one-4-yl) | O |
| C-10596 | Me(S) | single bond | H | Et | Me | Me | $CH_2$(5-Me-1,3-dioxol-2-one-4-yl) | O |
| C-10597 | H | single bond | Me | c-Pr | Me | Me | $CH_2$(5-Me-1,3-dioxol-2-one-4-yl) | O |
| C-10598 | Me | single bond | H | c-Pr | Me | Me | $CH_2$(5-Me-1,3-dioxol-2-one-4-yl) | O |
| C-10599 | Me(R) | single bond | H | c-Pr | Me | Me | $CH_2$(5-Me-1,3-dioxol-2-one-4-yl) | O |
| C-10600 | Me(S) | single bond | H | c-Pr | Me | Me | $CH_2$(5-Me-1,3-dioxol-2-one-4-yl) | O |
| C-10601 | H | single bond | Me | c-Pr(1-CN) | Me | Me | $CH_2$(5-Me-1,3-dioxol-2-one-4-yl) | O |
| C-10602 | Me | single bond | H | c-Pr(1-CN) | Me | Me | $CH_2$(5-Me-1,3-dioxol-2-one-4-yl) | O |
| C-10603 | Me(R) | single bond | H | c-Pr(1-CN) | Me | Me | $CH_2$(5-Me-1,3-dioxol-2-one-4-yl) | O |
| C-10604 | Me(S) | single bond | H | c-Pr(1-CN) | Me | Me | $CH_2$(5-Me-1,3-dioxol-2-one-4-yl) | O |
| C-10605 | H | single bond | Me | $CH_2CF_3$ | C(=O)Me | Cl | c-Pr | O |
| C-10606 | Me | single bond | H | $CH_2CF_3$ | C(=O)Me | Cl | c-Pr | O |

TABLE 469-continued

| Compound Number | Y | W | Z | $R^1$ | $R^2$ | $R^3$ | $R^{10}$ | A |
|---|---|---|---|---|---|---|---|---|
| C-10607 | Me(R) | single bond | H | $CH_2CF_3$ | C(=O)Me | Cl | c-Pr | O |
| C-10608 | Me(S) | single bond | H | $CH_2CF_3$ | C(=O)Me | Cl | c-Pr | O |
| C-10609 | H | single bond | Me | Et | C(=O)Me | Cl | c-Pr | O |
| C-10610 | Me | single bond | H | Et | C(=O)Me | Cl | c-Pr | O |
| C-10611 | Me(R) | single bond | H | Et | C(=O)Me | Cl | c-Pr | O |
| C-10612 | Me(S) | single bond | H | Et | C(=O)Me | Cl | c-Pr | O |
| C-10613 | H | single bond | Me | c-Pr | C(=O)Me | Cl | c-Pr | O |
| C-10614 | Me | single bond | H | c-Pr | C(=O)Me | Cl | c-Pr | O |
| C-10615 | Me(R) | single bond | H | c-Pr | C(=O)Me | Cl | c-Pr | O |
| C-10616 | Me(S) | single bond | H | c-Pr | C(=O)Me | Cl | c-Pr | O |
| C-10617 | H | single bond | Me | c-Pr(1-CN) | C(=O)Me | Cl | c-Pr | O |
| C-10618 | Me | single bond | H | c-Pr(1-CN) | C(=O)Me | Cl | c-Pr | O |
| C-10619 | Me(R) | single bond | H | c-Pr(1-CN) | C(=O)Me | Cl | c-Pr | O |
| C-10620 | Me(S) | single bond | H | c-Pr(1-CN) | C(=O)Me | Cl | c-Pr | O |
| C-10621 | H | single bond | Me | $CH_2CF_3$ | C(=O)Me | Me | c-Pr | O |
| C-10622 | Me | single bond | H | $CH_2CF_3$ | C(=O)Me | Me | c-Pr | O |
| C-10623 | Me(R) | single bond | H | $CH_2CF_3$ | C(=O)Me | Me | c-Pr | O |
| C-10624 | Me(S) | single bond | H | $CH_2CF_3$ | C(=O)Me | Me | c-Pr | O |
| C-10625 | H | single bond | Me | Et | C(=O)Me | Me | c-Pr | O |
| C-10626 | Me | single bond | H | Et | C(=O)Me | Me | c-Pr | O |
| C-10627 | Me(R) | single bond | H | Et | C(=O)Me | Me | c-Pr | O |
| C-10628 | Me(S) | single bond | H | Et | C(=O)Me | Me | c-Pr | O |
| C-10629 | H | single bond | Me | c-Pr | C(=O)Me | Me | c-Pr | O |
| C-10630 | Me | single bond | H | c-Pr | C(=O)Me | Me | c-Pr | O |
| C-10631 | Me(R) | single bond | H | c-Pr | C(=O)Me | Me | c-Pr | O |
| C-10632 | Me(S) | single bond | H | c-Pr | C(=O)Me | Me | c-Pr | O |
| C-10633 | H | single bond | Me | c-Pr(1-CN) | C(=O)Me | Me | c-Pr | O |
| C-10634 | Me | single bond | H | c-Pr(1-CN) | C(=O)Me | Me | c-Pr | O |
| C-10635 | Me(R) | single bond | H | c-Pr(1-CN) | C(=O)Me | Me | c-Pr | O |
| C-10636 | Me(S) | single bond | H | c-Pr(1-CN) | C(=O)Me | Me | c-Pr | O |
| C-10637 | H | single bond | Me | $CH_2CF_3$ | C(=O)Me | Cl | OMe | O |
| C-10638 | Me | single bond | H | $CH_2CF_3$ | C(=O)Me | Cl | OMe | O |

TABLE 470

| Compound Number | Y | W | Z | $R^1$ | $R^2$ | $R^3$ | $R^{10}$ | A |
|---|---|---|---|---|---|---|---|---|
| C-10639 | Me(R) | single bond | H | $CH_2CF_3$ | C(=O)Me | Cl | OMe | O |
| C-10640 | Me(S) | single bond | H | $CH_2CF_3$ | C(=O)Me | Cl | OMe | O |
| C-10641 | H | single bond | Me | Et | C(=O)Me | Cl | OMe | O |
| C-10642 | Me | single bond | H | Et | C(=O)Me | Cl | OMe | O |
| C-10643 | Me(R) | single bond | H | Et | C(=O)Me | Cl | OMe | O |
| C-10644 | Me(S) | single bond | H | Et | C(=O)Me | Cl | OMe | O |
| C-10645 | H | single bond | Me | c-Pr | C(=O)Me | Cl | OMe | O |
| C-10646 | Me | single bond | H | c-Pr | C(=O)Me | Cl | OMe | O |
| C-10647 | Me(R) | single bond | H | c-Pr | C(=O)Me | Cl | OMe | O |
| C-10648 | Me(S) | single bond | H | c-Pr | C(=O)Me | Cl | OMe | O |
| C-10649 | H | single bond | Me | c-Pr(1-CN) | C(=O)Me | Cl | OMe | O |
| C-10650 | Me | single bond | H | c-Pr(1-CN) | C(=O)Me | Cl | OMe | O |
| C-10651 | Me(R) | single bond | H | c-Pr(1-CN) | C(=O)Me | Cl | OMe | O |
| C-10652 | Me(S) | single bond | H | c-Pr(1-CN) | C(=O)Me | Cl | OMe | O |
| C-10653 | H | single bond | Me | $CH_2CF_3$ | C(=O)Me | Me | OMe | O |
| C-10654 | Me | single bond | H | $CH_2CF_3$ | C(=O)Me | Me | OMe | O |
| C-10655 | Me(R) | single bond | H | $CH_2CF_3$ | C(=O)Me | Me | OMe | O |
| C-10656 | Me(S) | single bond | H | $CH_2CF_3$ | C(=O)Me | Me | OMe | O |
| C-10657 | H | single bond | Me | Et | C(=O)Me | Me | OMe | O |
| C-10658 | Me | single bond | H | Et | C(=O)Me | Me | OMe | O |
| C-10659 | Me(R) | single bond | H | Et | C(=O)Me | Me | OMe | O |
| C-10660 | Me(S) | single bond | H | Et | C(=O)Me | Me | OMe | O |
| C-10661 | H | single bond | Me | c-Pr | C(=O)Me | Me | OMe | O |
| C-10662 | Me | single bond | H | c-Pr | C(=O)Me | Me | OMe | O |
| C-10663 | Me(R) | single bond | H | c-Pr | C(=O)Me | Me | OMe | O |
| C-10664 | Me(S) | single bond | H | c-Pr | C(=O)Me | Me | OMe | O |
| C-10665 | H | single bond | Me | c-Pr(1-CN) | C(=O)Me | Me | OMe | O |
| C-10666 | Me | single bond | H | c-Pr(1-CN) | C(=O)Me | Me | OMe | O |
| C-10667 | Me(R) | single bond | H | c-Pr(1-CN) | C(=O)Me | Me | OMe | O |
| C-10668 | Me(S) | single bond | H | c-Pr(1-CN) | C(=O)Me | Me | OMe | O |
| C-10669 | H | single bond | Me | $CH_2CF_3$ | C(=O)Me | Cl | C(=O)(i-Pr) | O |
| C-10670 | Me | single bond | H | $CH_2CF_3$ | C(=O)Me | Cl | C(=O)(i-Pr) | O |
| C-10671 | Me(R) | single bond | H | $CH_2CF_3$ | C(=O)Me | Cl | C(=O)(i-Pr) | O |
| C-10672 | Me(S) | single bond | H | $CH_2CF_3$ | C(=O)Me | Cl | C(=O)(i-Pr) | O |
| C-10673 | H | single bond | Me | Et | C(=O)Me | Cl | C(=O)(i-Pr) | O |

TABLE 470-continued

| Compound Number | Y | W | Z | $R^1$ | $R^2$ | $R^3$ | $R^{10}$ | A |
|---|---|---|---|---|---|---|---|---|
| C-10674 | Me | single bond | H | Et | C(=O)Me | Cl | C(=O)(i-Pr) | O |
| C-10675 | Me(R) | single bond | H | Et | C(=O)Me | Cl | C(=O)(i-Pr) | O |
| C-10676 | Me(S) | single bond | H | Et | C(=O)Me | Cl | C(=O)(i-Pr) | O |
| C-10677 | H | single bond | Me | c-Pr | C(=O)Me | Cl | C(=O)(i-Pr) | O |
| C-10678 | Me | single bond | H | c-Pr | C(=O)Me | Cl | C(=O)(i-Pr) | O |
| C-10679 | Me(R) | single bond | H | c-Pr | C(=O)Me | Cl | C(=O)(i-Pr) | O |
| C-10680 | Me(S) | single bond | H | c-Pr | C(=O)Me | Cl | C(=O)(i-Pr) | O |
| C-10681 | H | single bond | Me | c-Pr(1-CN) | C(=O)Me | Cl | C(=O)(i-Pr) | O |
| C-10682 | Me | single bond | H | c-Pr(1-CN) | C(=O)Me | Cl | C(=O)(i-Pr) | O |

TABLE 471

| Compound Number | Y | W | Z | $R^1$ | $R^2$ | $R^3$ | $R^{10}$ | A |
|---|---|---|---|---|---|---|---|---|
| C-10683 | Me(R) | single bond | H | c-Pr(1-CN) | C(=O)Me | Cl | C(=O)(i-Pr) | O |
| C-10684 | Me(S) | single bond | H | c-Pr(1-CN) | C(=O)Me | Cl | C(=O)(i-Pr) | O |
| C-10685 | H | single bond | Me | $CH_2CF_3$ | C(=O)Me | Me | C(=O)(i-Pr) | O |
| C-10686 | Me | single bond | H | $CH_2CF_3$ | C(=O)Me | Me | C(=O)(i-Pr) | O |
| C-10687 | Me(R) | single bond | H | $CH_2CF_3$ | C(=O)Me | Me | C(=O)(i-Pr) | O |
| C-10688 | Me(S) | single bond | H | $CH_2CF_3$ | C(=O)Me | Me | C(=O)(i-Pr) | O |
| C-10689 | H | single bond | Me | Et | C(=O)Me | Me | C(=O)(i-Pr) | O |
| C-10690 | Me | single bond | H | Et | C(=O)Me | Me | C(=O)(i-Pr) | O |
| C-10691 | Me(R) | single bond | H | Et | C(=O)Me | Me | C(=O)(i-Pr) | O |
| C-10692 | Me(S) | single bond | H | Et | C(=O)Me | Me | C(=O)(i-Pr) | O |
| C-10693 | H | single bond | Me | c-Pr | C(=O)Me | Me | C(=O)(i-Pr) | O |
| C-10694 | Me | single bond | H | c-Pr | C(=O)Me | Me | C(=O)(i-Pr) | O |
| C-10695 | Me(R) | single bond | H | c-Pr | C(=O)Me | Me | C(=O)(i-Pr) | O |
| C-10696 | Me(S) | single bond | H | c-Pr | C(=O)Me | Me | C(=O)(i-Pr) | O |
| C-10697 | H | single bond | Me | c-Pr(1-CN) | C(=O)Me | Me | C(=O)(i-Pr) | O |
| C-10698 | Me | single bond | H | c-Pr(1-CN) | C(=O)Me | Me | C(=O)(i-Pr) | O |
| C-10699 | Me(R) | single bond | H | c-Pr(1-CN) | C(=O)Me | Me | C(=O)(i-Pr) | O |
| C-10700 | Me(S) | single bond | H | c-Pr(1-CN) | C(=O)Me | Me | C(=O)(i-Pr) | O |
| C-10701 | H | single bond | Me | $CH_2CF_3$ | C(=O)Me | Cl | C(=O)O(t-Bu) | O |
| C-10702 | Me | single bond | H | $CH_2CF_3$ | C(=O)Me | Cl | C(=O)O(t-Bu) | O |
| C-10703 | Me(R) | single bond | H | $CH_2CF_3$ | C(=O)Me | Cl | C(=O)O(t-Bu) | O |
| C-10704 | Me(S) | single bond | H | $CH_2CF_3$ | C(=O)Me | Cl | C(=O)O(t-Bu) | O |
| C-10705 | H | single bond | Me | Et | C(=O)Me | Cl | C(=O)O(t-Bu) | O |
| C-10706 | Me | single bond | H | Et | C(=O)Me | Cl | C(=O)O(t-Bu) | O |
| C-10707 | Me(R) | single bond | H | Et | C(=O)Me | Cl | C(=O)O(t-Bu) | O |
| C-10708 | Me(S) | single bond | H | Et | C(=O)Me | Cl | C(=O)O(t-Bu) | O |
| C-10709 | H | single bond | Me | c-Pr | C(=O)Me | Cl | C(=O)O(t-Bu) | O |
| C-10710 | Me | single bond | H | c-Pr | C(=O)Me | Cl | C(=O)O(t-Bu) | O |
| C-10711 | Me(R) | single bond | H | c-Pr | C(=O)Me | Cl | C(=O)O(t-Bu) | O |
| C-10712 | Me(S) | single bond | H | c-Pr | C(=O)Me | Cl | C(=O)O(t-Bu) | O |
| C-10713 | H | single bond | Me | c-Pr(1-CN) | C(=O)Me | Cl | C(=O)O(t-Bu) | O |
| C-10714 | Me | single bond | H | c-Pr(1-CN) | C(=O)Me | Cl | C(=O)O(t-Bu) | O |
| C-10715 | Me(R) | single bond | H | c-Pr(1-CN) | C(=O)Me | Cl | C(=O)O(t-Bu) | O |
| C-10716 | Me(S) | single bond | H | c-Pr(1-CN) | C(=O)Me | Cl | C(=O)O(t-Bu) | O |
| C-10717 | H | single bond | Me | $CH_2CF_3$ | C(=O)Me | Me | C(=O)O(t-Bu) | O |
| C-10718 | Me | single bond | H | $CH_2CF_3$ | C(=O)Me | Me | C(=O)O(t-Bu) | O |
| C-10719 | Me(R) | single bond | H | $CH_2CF_3$ | C(=O)Me | Me | C(=O)O(t-Bu) | O |
| C-10720 | Me(S) | single bond | H | $CH_2CF_3$ | C(=O)Me | Me | C(=O)O(t-Bu) | O |
| C-10721 | H | single bond | Me | Et | C(=O)Me | Me | C(=O)O(t-Bu) | O |
| C-10722 | Me | single bond | H | Et | C(=O)Me | Me | C(=O)O(t-Bu) | O |
| C-10723 | Me(R) | single bond | H | Et | C(=O)Me | Me | C(=O)O(t-Bu) | O |
| C-10724 | Me(S) | single bond | H | Et | C(=O)Me | Me | C(=O)O(t-Bu) | O |
| C-10725 | H | single bond | Me | c-Pr | C(=O)Me | Me | C(=O)O(t-Bu) | O |
| C-10726 | Me | single bond | H | c-Pr | C(=O)Me | Me | C(=O)O(t-Bu) | O |

TABLE 472

| Compound Number | Y | W | Z | $R^1$ | $R^2$ | $R^3$ | $R^{10}$ | A |
|---|---|---|---|---|---|---|---|---|
| C-10727 | Me(R) | single bond | H | c-Pr | C(=O)Me | Me | C(=O)O(t-Bu) | O |
| C-10728 | Me(S) | single bond | H | c-Pr | C(=O)Me | Me | C(=O)O(t-Bu) | O |
| C-10729 | H | single bond | Me | c-Pr(1-CN) | C(=O)Me | Me | C(=O)O(t-Bu) | O |

TABLE 472-continued

| Compound Number | Y | W | Z | $R^1$ | $R^2$ | $R^3$ | $R^{10}$ | A |
|---|---|---|---|---|---|---|---|---|
| C-10730 | Me | single bond | H | c-Pr(1-CN) | C(=O)Me | Me | C(=O)O(t-Bu) | O |
| C-10731 | Me(R) | single bond | H | c-Pr(1-CN) | C(=O)Me | Me | C(=O)O(t-Bu) | O |
| C-10732 | Me(S) | single bond | H | c-Pr(1-CN) | C(=O)Me | Me | C(=O)O(t-Bu) | O |
| C-10733 | H | single bond | Me | $CH_2CF_3$ | C(=O)Me | Cl | $CH_2OEt$ | O |
| C-10734 | Me | single bond | H | $CH_2CF_3$ | C(=O)Me | Cl | $CH_2OEt$ | O |
| C-10735 | Me(R) | single bond | H | $CH_2CF_3$ | C(=O)Me | Cl | $CH_2OEt$ | O |
| C-10736 | Me(S) | single bond | H | $CH_2CF_3$ | C(=O)Me | Cl | $CH_2OEt$ | O |
| C-10737 | H | single bond | Me | Et | C(=O)Me | Cl | $CH_2OEt$ | O |
| C-10738 | Me | single bond | H | Et | C(=O)Me | Cl | $CH_2OEt$ | O |
| C-10739 | Me(R) | single bond | H | Et | C(=O)Me | Cl | $CH_2OEt$ | O |
| C-10740 | Me(S) | single bond | H | Et | C(=O)Me | Cl | $CH_2OEt$ | O |
| C-10741 | H | single bond | Me | c-Pr | C(=O)Me | Cl | $CH_2OEt$ | O |
| C-10742 | Me | single bond | H | c-Pr | C(=O)Me | Cl | $CH_2OEt$ | O |
| C-10743 | Me(R) | single bond | H | c-Pr | C(=O)Me | Cl | $CH_2OEt$ | O |
| C-10744 | Me(S) | single bond | H | c-Pr | C(=O)Me | Cl | $CH_2OEt$ | O |
| C-10745 | H | single bond | Me | c-Pr(1-CN) | C(=O)Me | Cl | $CH_2OEt$ | O |
| C-10746 | Me | single bond | H | c-Pr(1-CN) | C(=O)Me | Cl | $CH_2OEt$ | O |
| C-10747 | Me(R) | single bond | H | c-Pr(1-CN) | C(=O)Me | Cl | $CH_2OEt$ | O |
| C-10748 | Me(S) | single bond | H | c-Pr(1-CN) | C(=O)Me | Cl | $CH_2OEt$ | O |
| C-10749 | H | single bond | Me | $CH_2CF_3$ | C(=O)Me | Me | $CH_2OEt$ | O |
| C-10750 | Me | single bond | H | $CH_2CF_3$ | C(=O)Me | Me | $CH_2OEt$ | O |
| C-10751 | Me(R) | single bond | H | $CH_2CF_3$ | C(=O)Me | Me | $CH_2OEt$ | O |
| C-10752 | Me(S) | single bond | H | $CH_2CF_3$ | C(=O)Me | Me | $CH_2OEt$ | O |
| C-10753 | H | single bond | Me | Et | C(=O)Me | Me | $CH_2OEt$ | O |
| C-10754 | Me | single bond | H | Et | C(=O)Me | Me | $CH_2OEt$ | O |
| C-10755 | Me(R) | single bond | H | Et | C(=O)Me | Me | $CH_2OEt$ | O |
| C-10756 | Me(S) | single bond | H | Et | C(=O)Me | Me | $CH_2OEt$ | O |
| C-10757 | H | single bond | Me | c-Pr | C(=O)Me | Me | $CH_2OEt$ | O |
| C-10758 | Me | single bond | H | c-Pr | C(=O)Me | Me | $CH_2OEt$ | O |
| C-10759 | Me(R) | single bond | H | c-Pr | C(=O)Me | Me | $CH_2OEt$ | O |
| C-10760 | Me(S) | single bond | H | c-Pr | C(=O)Me | Me | $CH_2OEt$ | O |
| C-10761 | H | single bond | Me | c-Pr(1-CN) | C(=O)Me | Me | $CH_2OEt$ | O |
| C-10762 | Me | single bond | H | c-Pr(1-CN) | C(=O)Me | Me | $CH_2OEt$ | O |
| C-10763 | Me(R) | single bond | H | c-Pr(1-CN) | C(=O)Me | Me | $CH_2OEt$ | O |
| C-10764 | Me(S) | single bond | H | c-Pr(1-CN) | C(=O)Me | Me | $CH_2OEt$ | O |
| C-10765 | H | single bond | Me | $CH_2CF_3$ | C(=O)Me | Cl | $CH_2SMe$ | O |
| C-10766 | Me | single bond | H | $CH_2CF_3$ | C(=O)Me | Cl | $CH_2SMe$ | O |
| C-10767 | Me(R) | single bond | H | $CH_2CF_3$ | C(=O)Me | Cl | $CH_2SMe$ | O |
| C-10768 | Me(S) | single bond | H | $CH_2CF_3$ | C(=O)Me | Cl | $CH_2SMe$ | O |
| C-10769 | H | single bond | Me | Et | C(=O)Me | Cl | $CH_2SMe$ | O |
| C-10770 | Me | single bond | H | Et | C(=O)Me | Cl | $CH_2SMe$ | O |

TABLE 473

| Compound Number | Y | W | Z | $R^1$ | $R^2$ | $R^3$ | $R^{10}$ | A |
|---|---|---|---|---|---|---|---|---|
| C-10771 | Me(R) | single bond | H | Et | C(=O)Me | Cl | $CH_2SMe$ | O |
| C-10772 | Me(S) | single bond | H | Et | C(=O)Me | Cl | $CH_2SMe$ | O |
| C-10773 | H | single bond | Me | c-Pr | C(=O)Me | Cl | $CH_2SMe$ | O |
| C-10774 | Me | single bond | H | c-Pr | C(=O)Me | Cl | $CH_2SMe$ | O |
| C-10775 | Me(R) | single bond | H | c-Pr | C(=O)Me | Cl | $CH_2SMe$ | O |
| C-10776 | Me(S) | single bond | H | c-Pr | C(=O)Me | Cl | $CH_2SMe$ | O |
| C-10777 | H | single bond | Me | c-Pr(1-CN) | C(=O)Me | Cl | $CH_2SMe$ | O |
| C-10778 | Me | single bond | H | c-Pr(1-CN) | C(=O)Me | Cl | $CH_2SMe$ | O |
| C-10779 | Me(R) | single bond | H | c-Pr(1-CN) | C(=O)Me | Cl | $CH_2SMe$ | O |
| C-10780 | Me(S) | single bond | H | c-Pr(1-CN) | C(=O)Me | Cl | $CH_2SMe$ | O |
| C-10781 | H | single bond | Me | $CH_2CF_3$ | C(=O)Me | Me | $CH_2SMe$ | O |
| C-10782 | Me | single bond | H | $CH_2CF_3$ | C(=O)Me | Me | $CH_2SMe$ | O |
| C-10783 | Me(R) | single bond | H | $CH_2CF_3$ | C(=O)Me | Me | $CH_2SMe$ | O |
| C-10784 | Me(S) | single bond | H | $CH_2CF_3$ | C(=O)Me | Me | $CH_2SMe$ | O |
| C-10785 | H | single bond | Me | Et | C(=O)Me | Me | $CH_2SMe$ | O |
| C-10786 | Me | single bond | H | Et | C(=O)Me | Me | $CH_2SMe$ | O |
| C-10787 | Me(R) | single bond | H | Et | C(=O)Me | Me | $CH_2SMe$ | O |
| C-10788 | Me(S) | single bond | H | Et | C(=O)Me | Me | $CH_2SMe$ | O |
| C-10789 | H | single bond | Me | c-Pr | C(=O)Me | Me | $CH_2SMe$ | O |
| C-10790 | Me | single bond | H | c-Pr | C(=O)Me | Me | $CH_2SMe$ | O |
| C-10791 | Me(R) | single bond | H | c-Pr | C(=O)Me | Me | $CH_2SMe$ | O |
| C-10792 | Me(S) | single bond | H | c-Pr | C(=O)Me | Me | $CH_2SMe$ | O |
| C-10793 | H | single bond | Me | c-Pr(1-CN) | C(=O)Me | Me | $CH_2SMe$ | O |
| C-10794 | Me | single bond | H | c-Pr(1-CN) | C(=O)Me | Me | $CH_2SMe$ | O |
| C-10795 | Me(R) | single bond | H | c-Pr(1-CN) | C(=O)Me | Me | $CH_2SMe$ | O |
| C-10796 | Me(S) | single bond | H | c-Pr(1-CN) | C(=O)Me | Me | $CH_2SMe$ | O |

TABLE 473-continued

| Compound Number | Y | W | Z | $R^1$ | $R^2$ | $R^3$ | $R^{10}$ | A |
|---|---|---|---|---|---|---|---|---|
| C-10797 | H | single bond | Me | $CH_2CF_3$ | C(=O)Me | Cl | $CH_2S(=O)_2Me$ | O |
| C-10798 | Me | single bond | H | $CH_2CF_3$ | C(=O)Me | Cl | $CH_2S(=O)_2Me$ | O |
| C-10799 | Me(R) | single bond | H | $CH_2CF_3$ | C(=O)Me | Cl | $CH_2S(=O)_2Me$ | O |
| C-10800 | Me(S) | single bond | H | $CH_2CF_3$ | C(=O)Me | Cl | $CH_2S(=O)_2Me$ | O |
| C-10801 | H | single bond | Me | Et | C(=O)Me | Cl | $CH_2S(=O)_2Me$ | O |
| C-10802 | Me | single bond | H | Et | C(=O)Me | Cl | $CH_2S(=O)_2Me$ | O |
| C-10803 | Me(R) | single bond | H | Et | C(=O)Me | Cl | $CH_2S(=O)_2Me$ | O |
| C-10804 | Me(S) | single bond | H | Et | C(=O)Me | Cl | $CH_2S(=O)_2Me$ | O |
| C-10805 | H | single bond | Me | c-Pr | C(=O)Me | Cl | $CH_2S(=O)_2Me$ | O |
| C-10806 | Me | single bond | H | c-Pr | C(=O)Me | Cl | $CH_2S(=O)_2Me$ | O |
| C-10807 | Me(R) | single bond | H | c-Pr | C(=O)Me | Cl | $CH_2S(=O)_2Me$ | O |
| C-10808 | Me(S) | single bond | H | c-Pr | C(=O)Me | Cl | $CH_2S(=O)_2Me$ | O |
| C-10809 | H | single bond | Me | c-Pr(1-CN) | C(=O)Me | Cl | $CH_2S(=O)_2Me$ | O |
| C-10810 | Me | single bond | H | c-Pr(1-CN) | C(=O)Me | Cl | $CH_2S(=O)_2Me$ | O |
| C-10811 | Me(R) | single bond | H | c-Pr(1-CN) | C(=O)Me | Cl | $CH_2S(=O)_2Me$ | O |
| C-10812 | Me(S) | single bond | H | c-Pr(1-CN) | C(=O)Me | Cl | $CH_2S(=O)_2Me$ | O |
| C-10813 | H | single bond | Me | $CH_2CF_3$ | C(=O)Me | Me | $CH_2S(=O)_2Me$ | O |
| C-10814 | Me | single bond | H | $CH_2CF_3$ | C(=O)Me | Me | $CH_2S(=O)_2Me$ | O |

TABLE 474

| Compound Number | Y | W | Z | $R^1$ | $R^2$ | $R^3$ | $R^{10}$ | A |
|---|---|---|---|---|---|---|---|---|
| C-10815 | Me(R) | single bond | H | $CH_2CF_3$ | C(=O)Me | Me | $CH_2S(=O)_2Me$ | O |
| C-10816 | Me(S) | single bond | H | $CH_2CF_3$ | C(=O)Me | Me | $CH_2S(=O)_2Me$ | O |
| C-10817 | H | single bond | Me | Et | C(=O)Me | Me | $CH_2S(=O)_2Me$ | O |
| C-10818 | Me | single bond | H | Et | C(=O)Me | Me | $CH_2S(=O)_2Me$ | O |
| C-10819 | Me(R) | single bond | H | Et | C(=O)Me | Me | $CH_2S(=O)_2Me$ | O |
| C-10820 | Me(S) | single bond | H | Et | C(=O)Me | Me | $CH_2S(=O)_2Me$ | O |
| C-10821 | H | single bond | Me | c-Pr | C(=O)Me | Me | $CH_2S(=O)_2Me$ | O |
| C-10822 | Me | single bond | H | c-Pr | C(=O)Me | Me | $CH_2S(=O)_2Me$ | O |
| C-10823 | Me(R) | single bond | H | c-Pr | C(=O)Me | Me | $CH_2S(=O)_2Me$ | O |
| C-10824 | Me(S) | single bond | H | c-Pr | C(=O)Me | Me | $CH_2S(=O)_2Me$ | O |
| C-10825 | H | single bond | Me | c-Pr(1-CN) | C(=O)Me | Me | $CH_2S(=O)_2Me$ | O |
| C-10826 | Me | single bond | H | c-Pr(1-CN) | C(=O)Me | Me | $CH_2S(=O)_2Me$ | O |
| C-10827 | Me(R) | single bond | H | c-Pr(1-CN) | C(=O)Me | Me | $CH_2S(=O)_2Me$ | O |
| C-10828 | Me(S) | single bond | H | c-Pr(1-CN) | C(=O)Me | Me | $CH_2S(=O)_2Me$ | O |
| C-10829 | H | single bond | Me | $CH_2CF_3$ | C(=O)Me | Cl | $CH_2C(=O)Me$ | O |
| C-10830 | Me | single bond | H | $CH_2CF_3$ | C(=O)Me | Cl | $CH_2C(=O)Me$ | O |
| C-10831 | Me(R) | single bond | H | $CH_2CF_3$ | C(=O)Me | Cl | $CH_2C(=O)Me$ | O |
| C-10832 | Me(S) | single bond | H | $CH_2CF_3$ | C(=O)Me | Cl | $CH_2C(=O)Me$ | O |
| C-10833 | H | single bond | Me | Et | C(=O)Me | Cl | $CH_2C(=O)Me$ | O |
| C-10834 | Me | single bond | H | Et | C(=O)Me | Cl | $CH_2C(=O)Me$ | O |
| C-10835 | Me(R) | single bond | H | Et | C(=O)Me | Cl | $CH_2C(=O)Me$ | O |
| C-10836 | Me(S) | single bond | H | Et | C(=O)Me | Cl | $CH_2C(=O)Me$ | O |
| C-10837 | H | single bond | Me | c-Pr | C(=O)Me | Cl | $CH_2C(=O)Me$ | O |
| C-10838 | Me | single bond | H | c-Pr | C(=O)Me | Cl | $CH_2C(=O)Me$ | O |
| C-10839 | Me(R) | single bond | H | c-Pr | C(=O)Me | Cl | $CH_2C(=O)Me$ | O |
| C-10840 | Me(S) | single bond | H | c-Pr | C(=O)Me | Cl | $CH_2C(=O)Me$ | O |
| C-10841 | H | single bond | Me | c-Pr(1-CN) | C(=O)Me | Cl | $CH_2C(=O)Me$ | O |
| C-10842 | Me | single bond | H | c-Pr(1-CN) | C(=O)Me | Cl | $CH_2C(=O)Me$ | O |
| C-10843 | Me(R) | single bond | H | c-Pr(1-CN) | C(=O)Me | Cl | $CH_2C(=O)Me$ | O |
| C-10844 | Me(S) | single bond | H | c-Pr(1-CN) | C(=O)Me | Cl | $CH_2C(=O)Me$ | O |
| C-10845 | H | single bond | Me | $CH_2CF_3$ | C(=O)Me | Me | $CH_2C(=O)Me$ | O |
| C-10846 | Me | single bond | H | $CH_2CF_3$ | C(=O)Me | Me | $CH_2C(=O)Me$ | O |
| C-10847 | Me(R) | single bond | H | $CH_2CF_3$ | C(=O)Me | Me | $CH_2C(=O)Me$ | O |
| C-10848 | Me(S) | single bond | H | $CH_2CF_3$ | C(=O)Me | Me | $CH_2C(=O)Me$ | O |
| C-10849 | H | single bond | Me | Et | C(=O)Me | Me | $CH_2C(=O)Me$ | O |
| C-10850 | Me | single bond | H | Et | C(=O)Me | Me | $CH_2C(=O)Me$ | O |
| C-10851 | Me(R) | single bond | H | Et | C(=O)Me | Me | $CH_2C(=O)Me$ | O |
| C-10852 | Me(S) | single bond | H | Et | C(=O)Me | Me | $CH_2C(=O)Me$ | O |
| C-10853 | H | single bond | Me | c-Pr | C(=O)Me | Me | $CH_2C(=O)Me$ | O |
| C-10854 | Me | single bond | H | c-Pr | C(=O)Me | Me | $CH_2C(=O)Me$ | O |
| C-10855 | Me(R) | single bond | H | c-Pr | C(=O)Me | Me | $CH_2C(=O)Me$ | O |
| C-10856 | Me(S) | single bond | H | c-Pr | C(=O)Me | Me | $CH_2C(=O)Me$ | O |
| C-10857 | H | single bond | Me | c-Pr(1-CN) | C(=O)Me | Me | $CH_2C(=O)Me$ | O |
| C-10858 | Me | single bond | H | c-Pr(1-CN) | C(=O)Me | Me | $CH_2C(=O)Me$ | O |

TABLE 475

| Compound Number | Y | W | Z | $R^1$ | $R^2$ | $R^3$ | $R^{10}$ | A |
|---|---|---|---|---|---|---|---|---|
| C-10859 | Me(R) | single bond | H | c-Pr(1-CN) | C(=O)Me | Me | $CH_2C(=O)Me$ | O |
| C-10860 | Me(S) | single bond | H | c-Pr(1-CN) | C(=O)Me | Me | $CH_2C(=O)Me$ | O |
| C-10861 | H | single bond | Me | $CH_2CF_3$ | C(=O)Me | Cl | $CH_2C(=O)OMe$ | O |
| C-10862 | Me | single bond | H | $CH_2CF_3$ | C(=O)Me | Cl | $CH_2C(=O)OMe$ | O |
| C-10863 | Me(R) | single bond | H | $CH_2CF_3$ | C(=O)Me | Cl | $CH_2C(=O)OMe$ | O |
| C-10864 | Me(S) | single bond | H | $CH_2CF_3$ | C(=O)Me | Cl | $CH_2C(=O)OMe$ | O |
| C-10865 | H | single bond | Me | Et | C(=O)Me | Cl | $CH_2C(=O)OMe$ | O |
| C-10866 | Me | single bond | H | Et | C(=O)Me | Cl | $CH_2C(=O)OMe$ | O |
| C-10867 | Me(R) | single bond | H | Et | C(=O)Me | Cl | $CH_2C(=O)OMe$ | O |
| C-10868 | Me(S) | single bond | H | Et | C(=O)Me | Cl | $CH_2C(=O)OMe$ | O |
| C-10869 | H | single bond | Me | c-Pr | C(=O)Me | Cl | $CH_2C(=O)OMe$ | O |
| C-10870 | Me | single bond | H | c-Pr | C(=O)Me | Cl | $CH_2C(=O)OMe$ | O |
| C-10871 | Me(R) | single bond | H | c-Pr | C(=O)Me | Cl | $CH_2C(=O)OMe$ | O |
| C-10872 | Me(S) | single bond | H | c-Pr | C(=O)Me | Cl | $CH_2C(=O)OMe$ | O |
| C-10873 | H | single bond | Me | c-Pr(1-CN) | C(=O)Me | Cl | $CH_2C(=O)OMe$ | O |
| C-10874 | Me | single bond | H | c-Pr(1-CN) | C(=O)Me | Cl | $CH_2C(=O)OMe$ | O |
| C-10875 | Me(R) | single bond | H | c-Pr(1-CN) | C(=O)Me | Cl | $CH_2C(=O)OMe$ | O |
| C-10876 | Me(S) | single bond | H | c-Pr(1-CN) | C(=O)Me | Cl | $CH_2C(=O)OMe$ | O |
| C-10877 | H | single bond | Me | $CH_2CF_3$ | C(=O)Me | Me | $CH_2C(=O)OMe$ | O |
| C-10878 | Me | single bond | H | $CH_2CF_3$ | C(=O)Me | Me | $CH_2C(=O)OMe$ | O |
| C-10879 | Me(R) | single bond | H | $CH_2CF_3$ | C(=O)Me | Me | $CH_2C(=O)OMe$ | O |
| C-10880 | Me(S) | single bond | H | $CH_2CF_3$ | C(=O)Me | Me | $CH_2C(=O)OMe$ | O |
| C-10881 | H | single bond | Me | Et | C(=O)Me | Me | $CH_2C(=O)OMe$ | O |
| C-10882 | Me | single bond | H | Et | C(=O)Me | Me | $CH_2C(=O)OMe$ | O |
| C-10883 | Me(R) | single bond | H | Et | C(=O)Me | Me | $CH_2C(=O)OMe$ | O |
| C-10884 | Me(S) | single bond | H | Et | C(=O)Me | Me | $CH_2C(=O)OMe$ | O |
| C-10885 | H | single bond | Me | c-Pr | C(=O)Me | Me | $CH_2C(=O)OMe$ | O |
| C-10886 | Me | single bond | H | c-Pr | C(=O)Me | Me | $CH_2C(=O)OMe$ | O |
| C-10887 | Me(R) | single bond | H | c-Pr | C(=O)Me | Me | $CH_2C(=O)OMe$ | O |
| C-10888 | Me(S) | single bond | H | c-Pr | C(=O)Me | Me | $CH_2C(=O)OMe$ | O |
| C-10889 | H | single bond | Me | c-Pr(1-CN) | C(=O)Me | Me | $CH_2C(=O)OMe$ | O |
| C-10890 | Me | single bond | H | c-Pr(1-CN) | C(=O)Me | Me | $CH_2C(=O)OMe$ | O |
| C-10891 | Me(R) | single bond | H | c-Pr(1-CN) | C(=O)Me | Me | $CH_2C(=O)OMe$ | O |
| C-10892 | Me(S) | single bond | H | c-Pr(1-CN) | C(=O)Me | Me | $CH_2C(=O)OMe$ | O |
| C-10893 | H | single bond | Me | $CH_2CF_3$ | C(=O)Me | Cl | $CH_2C(=O)NHMe$ | O |
| C-10894 | Me | single bond | H | $CH_2CF_3$ | C(=O)Me | Cl | $CH_2C(=O)NHMe$ | O |
| C-10895 | Me(R) | single bond | H | $CH_2CF_3$ | C(=O)Me | Cl | $CH_2C(=O)NHMe$ | O |
| C-10896 | Me(S) | single bond | H | $CH_2CF_3$ | C(=O)Me | Cl | $CH_2C(=O)NHMe$ | O |
| C-10897 | H | single bond | Me | Et | C(=O)Me | Cl | $CH_2C(=O)NHMe$ | O |
| C-10898 | Me | single bond | H | Et | C(=O)Me | Cl | $CH_2C(=O)NHMe$ | O |
| C-10899 | Me(R) | single bond | H | Et | C(=O)Me | Cl | $CH_2C(=O)NHMe$ | O |
| C-10900 | Me(S) | single bond | H | Et | C(=O)Me | Cl | $CH_2C(=O)NHMe$ | O |
| C-10901 | H | single bond | Me | c-Pr | C(=O)Me | Cl | $CH_2C(=O)NHMe$ | O |
| C-10902 | Me | single bond | H | c-Pr | C(=O)Me | Cl | $CH_2C(=O)NHMe$ | O |

TABLE 476

| Compound Number | Y | W | Z | $R^1$ | $R^2$ | $R^3$ | $R^{10}$ | A |
|---|---|---|---|---|---|---|---|---|
| C-10903 | Me(R) | single bond | H | c-Pr | C(=O)Me | Cl | $CH_2C(=O)NHMe$ | O |
| C-10904 | Me(S) | single bond | H | c-Pr | C(=O)Me | Cl | $CH_2C(=O)NHMe$ | O |
| C-10905 | H | single bond | Me | c-Pr(1-CN) | C(=O)Me | Cl | $CH_2C(=O)NHMe$ | O |
| C-10906 | Me | single bond | H | c-Pr(1-CN) | C(=O)Me | Cl | $CH_2C(=O)NHMe$ | O |
| C-10907 | Me(R) | single bond | H | c-Pr(1-CN) | C(=O)Me | Cl | $CH_2C(=O)NHMe$ | O |
| C-10908 | Me(S) | single bond | H | c-Pr(1-CN) | C(=O)Me | Cl | $CH_2C(=O)NHMe$ | O |
| C-10909 | H | single bond | Me | $CH_2CF_3$ | C(=O)Me | Me | $CH_2C(=O)NHMe$ | O |
| C-10910 | Me | single bond | H | $CH_2CF_3$ | C(=O)Me | Me | $CH_2C(=O)NHMe$ | O |
| C-10911 | Me(R) | single bond | H | $CH_2CF_3$ | C(=O)Me | Me | $CH_2C(=O)NHMe$ | O |
| C-10912 | Me(S) | single bond | H | $CH_2CF_3$ | C(=O)Me | Me | $CH_2C(=O)NHMe$ | O |
| C-10913 | H | single bond | Me | Et | C(=O)Me | Me | $CH_2C(=O)NHMe$ | O |
| C-10914 | Me | single bond | H | Et | C(=O)Me | Me | $CH_2C(=O)NHMe$ | O |
| C-10915 | Me(R) | single bond | H | Et | C(=O)Me | Me | $CH_2C(=O)NHMe$ | O |
| C-10916 | Me(S) | single bond | H | Et | C(=O)Me | Me | $CH_2C(=O)NHMe$ | O |
| C-10917 | H | single bond | Me | c-Pr | C(=O)Me | Me | $CH_2C(=O)NHMe$ | O |
| C-10918 | Me | single bond | H | c-Pr | C(=O)Me | Me | $CH_2C(=O)NHMe$ | O |
| C-10919 | Me(R) | single bond | H | c-Pr | C(=O)Me | Me | $CH_2C(=O)NHMe$ | O |
| C-10920 | Me(S) | single bond | H | c-Pr | C(=O)Me | Me | $CH_2C(=O)NHMe$ | O |
| C-10921 | H | single bond | Me | c-Pr(1-CN) | C(=O)Me | Me | $CH_2C(=O)NHMe$ | O |
| C-10922 | Me | single bond | H | c-Pr(1-CN) | C(=O)Me | Me | $CH_2C(=O)NHMe$ | O |
| C-10923 | Me(R) | single bond | H | c-Pr(1-CN) | C(=O)Me | Me | $CH_2C(=O)NHMe$ | O |
| C-10924 | Me(S) | single bond | H | c-Pr(1-CN) | C(=O)Me | Me | $CH_2C(=O)NHMe$ | O |
| C-10925 | H | single bond | Me | $CH_2CF_3$ | C(=O)Me | Cl | $CH_2OC(=O)Me$ | O |

TABLE 476-continued

| Compound Number | Y | W | Z | $R^1$ | $R^2$ | $R^3$ | $R^{10}$ | A |
|---|---|---|---|---|---|---|---|---|
| C-10926 | Me | single bond | H | $CH_2CF_3$ | C(=O)Me | Cl | $CH_2OC(=O)Me$ | O |
| C-10927 | Me(R) | single bond | H | $CH_2CF_3$ | C(=O)Me | Cl | $CH_2OC(=O)Me$ | O |
| C-10928 | Me(S) | single bond | H | $CH_2CF_3$ | C(=O)Me | Cl | $CH_2OC(=O)Me$ | O |
| C-10929 | H | single bond | Me | Et | C(=O)Me | Cl | $CH_2OC(=O)Me$ | O |
| C-10930 | Me | single bond | H | Et | C(=O)Me | Cl | $CH_2OC(=O)Me$ | O |
| C-10931 | Me(R) | single bond | H | Et | C(=O)Me | Cl | $CH_2OC(=O)Me$ | O |
| C-10932 | Me(S) | single bond | H | Et | C(=O)Me | Cl | $CH_2OC(=O)Me$ | O |
| C-10933 | H | single bond | Me | c-Pr | C(=O)Me | Cl | $CH_2OC(=O)Me$ | O |
| C-10934 | Me | single bond | H | c-Pr | C(=O)Me | Cl | $CH_2OC(=O)Me$ | O |
| C-10935 | Me(R) | single bond | H | c-Pr | C(=O)Me | Cl | $CH_2OC(=O)Me$ | O |
| C-10936 | Me(S) | single bond | H | c-Pr | C(=O)Me | Cl | $CH_2OC(=O)Me$ | O |
| C-10937 | H | single bond | Me | c-Pr(1-CN) | C(=O)Me | Cl | $CH_2OC(=O)Me$ | O |
| C-10938 | Me | single bond | H | c-Pr(1-CN) | C(=O)Me | Cl | $CH_2OC(=O)Me$ | O |
| C-10939 | Me(R) | single bond | H | c-Pr(1-CN) | C(=O)Me | Cl | $CH_2OC(=O)Me$ | O |
| C-10940 | Me(S) | single bond | H | c-Pr(1-CN) | C(=O)Me | Cl | $CH_2OC(=O)Me$ | O |
| C-10941 | H | single bond | Me | $CH_2CF_3$ | C(=O)Me | Me | $CH_2OC(=O)Me$ | O |
| C-10942 | Me | single bond | H | $CH_2CF_3$ | C(=O)Me | Me | $CH_2OC(=O)Me$ | O |
| C-10943 | Me(R) | single bond | H | $CH_2CF_3$ | C(=O)Me | Me | $CH_2OC(=O)Me$ | O |
| C-10944 | Me(S) | single bond | H | $CH_2CF_3$ | C(=O)Me | Me | $CH_2OC(=O)Me$ | O |
| C-10945 | H | single bond | Me | Et | C(=O)Me | Me | $CH_2OC(=O)Me$ | O |
| C-10946 | Me | single bond | H | Et | C(=O)Me | Me | $CH_2OC(=O)Me$ | O |

TABLE 477

| Compound Number | Y | W | Z | $R^1$ | $R^2$ | $R^3$ | $R^{10}$ | A |
|---|---|---|---|---|---|---|---|---|
| C-10947 | Me(R) | single bond | H | Et | C(=O)Me | Me | $CH_2OC(=O)Me$ | O |
| C-10948 | Me(S) | single bond | H | Et | C(=O)Me | Me | $CH_2OC(=O)Me$ | O |
| C-10949 | H | single bond | Me | c-Pr | C(=O)Me | Me | $CH_2OC(=O)Me$ | O |
| C-10950 | Me | single bond | H | c-Pr | C(=O)Me | Me | $CH_2OC(=O)Me$ | O |
| C-10951 | Me(R) | single bond | H | c-Pr | C(=O)Me | Me | $CH_2OC(=O)Me$ | O |
| C-10952 | Me(S) | single bond | H | c-Pr | C(=O)Me | Me | $CH_2OC(=O)Me$ | O |
| C-10953 | H | single bond | Me | c-Pr(1-CN) | C(=O)Me | Me | $CH_2OC(=O)Me$ | O |
| C-10954 | Me | single bond | H | c-Pr(1-CN) | C(=O)Me | Me | $CH_2OC(=O)Me$ | O |
| C-10955 | Me(R) | single bond | H | c-Pr(1-CN) | C(=O)Me | Me | $CH_2OC(=O)Me$ | O |
| C-10956 | Me(S) | single bond | H | c-Pr(1-CN) | C(=O)Me | Me | $CH_2OC(=O)Me$ | O |
| C-10957 | H | single bond | Me | $CH_2CF_3$ | C(=O)Me | Cl | $CH_2OC(=O)(i-Pr)$ | O |
| C-10958 | Me | single bond | H | $CH_2CF_3$ | C(=O)Me | Cl | $CH_2OC(=O)(i-Pr)$ | O |
| C-10959 | Me(R) | single bond | H | $CH_2CF_3$ | C(=O)Me | Cl | $CH_2OC(=O)(i-Pr)$ | O |
| C-10960 | Me(S) | single bond | H | $CH_2CF_3$ | C(=O)Me | Cl | $CH_2OC(=O)(i-Pr)$ | O |
| C-10961 | H | single bond | Me | Et | C(=O)Me | Cl | $CH_2OC(=O)(i-Pr)$ | O |
| C-10962 | Me | single bond | H | Et | C(=O)Me | Cl | $CH_2OC(=O)(i-Pr)$ | O |
| C-10963 | Me(R) | single bond | H | Et | C(=O)Me | Cl | $CH_2OC(=O)(i-Pr)$ | O |
| C-10964 | Me(S) | single bond | H | Et | C(=O)Me | Cl | $CH_2OC(=O)(i-Pr)$ | O |
| C-10965 | H | single bond | Me | c-Pr | C(=O)Me | Cl | $CH_2OC(=O)(i-Pr)$ | O |
| C-10966 | Me | single bond | H | c-Pr | C(=O)Me | Cl | $CH_2OC(=O)(i-Pr)$ | O |
| C-10967 | Me(R) | single bond | H | c-Pr | C(=O)Me | Cl | $CH_2OC(=O)(i-Pr)$ | O |
| C-10968 | Me(S) | single bond | H | c-Pr | C(=O)Me | Cl | $CH_2OC(=O)(i-Pr)$ | O |
| C-10969 | H | single bond | Me | c-Pr(1-CN) | C(=O)Me | Cl | $CH_2OC(=O)(i-Pr)$ | O |
| C-10970 | Me | single bond | H | c-Pr(1-CN) | C(=O)Me | Cl | $CH_2OC(=O)(i-Pr)$ | O |
| C-10971 | Me(R) | single bond | H | c-Pr(1-CN) | C(=O)Me | Cl | $CH_2OC(=O)(i-Pr)$ | O |
| C-10972 | Me(S) | single bond | H | c-Pr(1-CN) | C(=O)Me | Cl | $CH_2OC(=O)(i-Pr)$ | O |
| C-10973 | H | single bond | Me | $CH_2CF_3$ | C(=O)Me | Me | $CH_2OC(=O)(i-Pr)$ | O |
| C-10974 | Me | single bond | H | $CH_2CF_3$ | C(=O)Me | Me | $CH_2OC(=O)(i-Pr)$ | O |
| C-10975 | Me(R) | single bond | H | $CH_2CF_3$ | C(=O)Me | Me | $CH_2OC(=O)(i-Pr)$ | O |
| C-10976 | Me(S) | single bond | H | $CH_2CF_3$ | C(=O)Me | Me | $CH_2OC(=O)(i-Pr)$ | O |
| C-10977 | H | single bond | Me | Et | C(=O)Me | Me | $CH_2OC(=O)(i-Pr)$ | O |
| C-10978 | Me | single bond | H | Et | C(=O)Me | Me | $CH_2OC(=O)(i-Pr)$ | O |
| C-10979 | Me(R) | single bond | H | Et | C(=O)Me | Me | $CH_2OC(=O)(i-Pr)$ | O |
| C-10980 | Me(S) | single bond | H | Et | C(=O)Me | Me | $CH_2OC(=O)(i-Pr)$ | O |
| C-10981 | H | single bond | Me | c-Pr | C(=O)Me | Me | $CH_2OC(=O)(i-Pr)$ | O |
| C-10982 | Me | single bond | H | c-Pr | C(=O)Me | Me | $CH_2OC(=O)(i-Pr)$ | O |
| C-10983 | Me(R) | single bond | H | c-Pr | C(=O)Me | Me | $CH_2OC(=O)(i-Pr)$ | O |
| C-10984 | Me(S) | single bond | H | c-Pr | C(=O)Me | Me | $CH_2OC(=O)(i-Pr)$ | O |
| C-10985 | H | single bond | Me | c-Pr(1-CN) | C(=O)Me | Me | $CH_2OC(=O)(i-Pr)$ | O |
| C-10986 | Me | single bond | H | c-Pr(1-CN) | C(=O)Me | Me | $CH_2OC(=O)(i-Pr)$ | O |
| C-10987 | Me(R) | single bond | H | c-Pr(1-CN) | C(=O)Me | Me | $CH_2OC(=O)(i-Pr)$ | O |
| C-10988 | Me(S) | single bond | H | c-Pr(1-CN) | C(=O)Me | Me | $CH_2OC(=O)(i-Pr)$ | O |
| C-10989 | H | single bond | Me | $CH_2CF_3$ | C(=O)Me | Cl | $CH_2OC(=O)(t-Bu)$ | O |
| C-10990 | Me | single bond | H | $CH_2CF_3$ | C(=O)Me | Cl | $CH_2OC(=O)(t-Bu)$ | O |

TABLE 478

| Compound Number | Y | W | Z | $R^1$ | $R^2$ | $R^3$ | $R^{10}$ | A |
|---|---|---|---|---|---|---|---|---|
| C-10991 | Me(R) | single bond | H | $CH_2CF_3$ | C(=O)Me | Cl | $CH_2OC(=O)(t-Bu)$ | O |
| C-10992 | Me(S) | single bond | H | $CH_2CF_3$ | C(=O)Me | Cl | $CH_2OC(=O)(t-Bu)$ | O |
| C-10993 | H | single bond | Me | Et | C(=O)Me | Cl | $CH_2OC(=O)(t-Bu)$ | O |
| C-10994 | Me | single bond | H | Et | C(=O)Me | Cl | $CH_2OC(=O)(t-Bu)$ | O |
| C-10995 | Me(R) | single bond | H | Et | C(=O)Me | Cl | $CH_2OC(=O)(t-Bu)$ | O |
| C-10996 | Me(S) | single bond | H | Et | C(=O)Me | Cl | $CH_2OC(=O)(t-Bu)$ | O |
| C-10997 | H | single bond | Me | c-Pr | C(=O)Me | Cl | $CH_2OC(=O)(t-Bu)$ | O |
| C-10998 | Me | single bond | H | c-Pr | C(=O)Me | Cl | $CH_2OC(=O)(t-Bu)$ | O |
| C-10999 | Me(R) | single bond | H | c-Pr | C(=O)Me | Cl | $CH_2OC(=O)(t-Bu)$ | O |
| C-11000 | Me(S) | single bond | H | c-Pr | C(=O)Me | Cl | $CH_2OC(=O)(t-Bu)$ | O |
| C-11001 | H | single bond | Me | c-Pr(1-CN) | C(=O)Me | Cl | $CH_2OC(=O)(t-Bu)$ | O |
| C-11002 | Me | single bond | H | c-Pr(1-CN) | C(=O)Me | Cl | $CH_2OC(=O)(t-Bu)$ | O |
| C-11003 | Me(R) | single bond | H | c-Pr(1-CN) | C(=O)Me | Cl | $CH_2OC(=O)(t-Bu)$ | O |
| C-11004 | Me(S) | single bond | H | c-Pr(1-CN) | C(=O)Me | Cl | $CH_2OC(=O)(t-Bu)$ | O |
| C-11005 | H | single bond | Me | $CH_2CF_3$ | C(=O)Me | Me | $CH_2OC(=O)(t-Bu)$ | O |
| C-11006 | Me | single bond | H | $CH_2CF_3$ | C(=O)Me | Me | $CH_2OC(=O)(t-Bu)$ | O |
| C-11007 | Me(R) | single bond | H | $CH_2CF_3$ | C(=O)Me | Me | $CH_2OC(=O)(t-Bu)$ | O |
| C-11008 | Me(S) | single bond | H | $CH_2CF_3$ | C(=O)Me | Me | $CH_2OC(=O)(t-Bu)$ | O |
| C-11009 | H | single bond | Me | Et | C(=O)Me | Me | $CH_2OC(=O)(t-Bu)$ | O |
| C-11010 | Me | single bond | H | Et | C(=O)Me | Me | $CH_2OC(=O)(t-Bu)$ | O |
| C-11011 | Me(R) | single bond | H | Et | C(=O)Me | Me | $CH_2OC(=O)(t-Bu)$ | O |
| C-11012 | Me(S) | single bond | H | Et | C(=O)Me | Me | $CH_2OC(=O)(t-Bu)$ | O |
| C-11013 | H | single bond | Me | c-Pr | C(=O)Me | Me | $CH_2OC(=O)(t-Bu)$ | O |
| C-11014 | Me | single bond | H | c-Pr | C(=O)Me | Me | $CH_2OC(=O)(t-Bu)$ | O |
| C-11015 | Me(R) | single bond | H | c-Pr | C(=O)Me | Me | $CH_2OC(=O)(t-Bu)$ | O |
| C-11016 | Me(S) | single bond | H | c-Pr | C(=O)Me | Me | $CH_2OC(=O)(t-Bu)$ | O |
| C-11017 | H | single bond | Me | c-Pr(1-CN) | C(=O)Me | Me | $CH_2OC(=O)(t-Bu)$ | O |
| C-11018 | Me | single bond | H | c-Pr(1-CN) | C(=O)Me | Me | $CH_2OC(=O)(t-Bu)$ | O |
| C-11019 | Me(R) | single bond | H | c-Pr(1-CN) | C(=O)Me | Me | $CH_2OC(=O)(t-Bu)$ | O |
| C-11020 | Me(S) | single bond | H | c-Pr(1-CN) | C(=O)Me | Me | $CH_2OC(=O)(t-Bu)$ | O |
| C-11021 | H | single bond | Me | $CH_2CF_3$ | C(=O)Me | Cl | $CH_2OC(=O)OEt$ | O |
| C-11022 | Me | single bond | H | $CH_2CF_3$ | C(=O)Me | Cl | $CH_2OC(=O)OEt$ | O |
| C-11023 | Me(R) | single bond | H | $CH_2CF_3$ | C(=O)Me | Cl | $CH_2OC(=O)OEt$ | O |
| C-11024 | Me(S) | single bond | H | $CH_2CF_3$ | C(=O)Me | Cl | $CH_2OC(=O)OEt$ | O |
| C-11025 | H | single bond | Me | Et | C(=O)Me | Cl | $CH_2OC(=O)OEt$ | O |
| C-11026 | Me | single bond | H | Et | C(=O)Me | Cl | $CH_2OC(=O)OEt$ | O |
| C-11027 | Me(R) | single bond | H | Et | C(=O)Me | Cl | $CH_2OC(=O)OEt$ | O |
| C-11028 | Me(S) | single bond | H | Et | C(=O)Me | Cl | $CH_2OC(=O)OEt$ | O |
| C-11029 | H | single bond | Me | c-Pr | C(=O)Me | Cl | $CH_2OC(=O)OEt$ | O |
| C-11030 | Me | single bond | H | c-Pr | C(=O)Me | Cl | $CH_2OC(=O)OEt$ | O |
| C-11031 | Me(R) | single bond | H | c-Pr | C(=O)Me | Cl | $CH_2OC(=O)OEt$ | O |
| C-11032 | Me(S) | single bond | H | c-Pr | C(=O)Me | Cl | $CH_2OC(=O)OEt$ | O |
| C-11033 | H | single bond | Me | c-Pr(1-CN) | C(=O)Me | Cl | $CH_2OC(=O)OEt$ | O |
| C-11034 | Me | single bond | H | c-Pr(1-CN) | C(=O)Me | Cl | $CH_2OC(=O)OEt$ | O |

TABLE 479

| Compound Number | Y | W | Z | $R^1$ | $R^2$ | $R^3$ | $R^{10}$ | A |
|---|---|---|---|---|---|---|---|---|
| C-11035 | Me(R) | single bond | H | c-Pr(1-CN) | C(=O)Me | Cl | $CH_2OC(=O)OEt$ | O |
| C-11036 | Me(S) | single bond | H | c-Pr(1-CN) | C(=O)Me | Cl | $CH_2OC(=O)OEt$ | O |
| C-11037 | H | single bond | Me | $CH_2CF_3$ | C(=O)Me | Me | $CH_2OC(=O)OEt$ | O |
| C-11038 | Me | single bond | H | $CH_2CF_3$ | C(=O)Me | Me | $CH_2OC(=O)OEt$ | O |
| C-11039 | Me(R) | single bond | H | $CH_2CF_3$ | C(=O)Me | Me | $CH_2OC(=O)OEt$ | O |
| C-11040 | Me(S) | single bond | H | $CH_2CF_3$ | C(=O)Me | Me | $CH_2OC(=O)OEt$ | O |
| C-11041 | H | single bond | Me | Et | C(=O)Me | Me | $CH_2OC(=O)OEt$ | O |
| C-11042 | Me | single bond | H | Et | C(=O)Me | Me | $CH_2OC(=O)OEt$ | O |
| C-11043 | Me(R) | single bond | H | Et | C(=O)Me | Me | $CH_2OC(=O)OEt$ | O |
| C-11044 | Me(S) | single bond | H | Et | C(=O)Me | Me | $CH_2OC(=O)OEt$ | O |
| C-11045 | H | single bond | Me | c-Pr | C(=O)Me | Me | $CH_2OC(=O)OEt$ | O |
| C-11046 | Me | single bond | H | c-Pr | C(=O)Me | Me | $CH_2OC(=O)OEt$ | O |
| C-11047 | Me(R) | single bond | H | c-Pr | C(=O)Me | Me | $CH_2OC(=O)OEt$ | O |
| C-11048 | Me(S) | single bond | H | c-Pr | C(=O)Me | Me | $CH_2OC(=O)OEt$ | O |
| C-11049 | H | single bond | Me | c-Pr(1-CN) | C(=O)Me | Me | $CH_2OC(=O)OEt$ | O |
| C-11050 | Me | single bond | H | c-Pr(1-CN) | C(=O)Me | Me | $CH_2OC(=O)OEt$ | O |
| C-11051 | Me(R) | single bond | H | c-Pr(1-CN) | C(=O)Me | Me | $CH_2OC(=O)OEt$ | O |
| C-11052 | Me(S) | single bond | H | c-Pr(1-CN) | C(=O)Me | Me | $CH_2OC(=O)OEt$ | O |
| C-11053 | H | single bond | Me | $CH_2CF_3$ | C(=O)Me | Cl | $CH_2OC(=O)O(i-Pr)$ | O |
| C-11054 | Me | single bond | H | $CH_2CF_3$ | C(=O)Me | Cl | $CH_2OC(=O)O(i-Pr)$ | O |
| C-11055 | Me(R) | single bond | H | $CH_2CF_3$ | C(=O)Me | Cl | $CH_2OC(=O)O(i-Pr)$ | O |

TABLE 479-continued

| Compound Number | Y | W | Z | $R^1$ | $R^2$ | $R^3$ | $R^{10}$ | A |
|---|---|---|---|---|---|---|---|---|
| C-11056 | Me(S) | single bond | H | $CH_2CF_3$ | C(=O)Me | Cl | $CH_2OC(=O)O(i\text{-}Pr)$ | C |
| C-11057 | H | single bond | Me | Et | C(=O)Me | Cl | $CH_2OC(=O)O(i\text{-}Pr)$ | O |
| C-11058 | Me | single bond | H | Et | C(=O)Me | Cl | $CH_2OC(=O)O(i\text{-}Pr)$ | O |
| C-11059 | Me(R) | single bond | H | Et | C(=O)Me | Cl | $CH_2OC(=O)O(i\text{-}Pr)$ | O |
| C-11060 | Me(S) | single bond | H | Et | C(=O)Me | Cl | $CH_2OC(=O)O(i\text{-}Pr)$ | O |
| C-11061 | H | single bond | Me | c-Pr | C(=O)Me | Cl | $CH_2OC(=O)O(i\text{-}Pr)$ | O |
| C-11062 | Me | single bond | H | c-Pr | C(=O)Me | Cl | $CH_2OC(=O)O(i\text{-}Pr)$ | O |
| C-11063 | Me(R) | single bond | H | c-Pr | C(=O)Me | Cl | $CH_2OC(=O)O(i\text{-}Pr)$ | O |
| C-11064 | Me(S) | single bond | H | c-Pr | C(=O)Me | Cl | $CH_2OC(=O)O(i\text{-}Pr)$ | O |
| C-11065 | H | single bond | Me | c-Pr(1-CN) | C(=O)Me | Cl | $CH_2OC(=O)O(i\text{-}Pr)$ | O |
| C-11066 | Me | single bond | H | c-Pr(1-CN) | C(=O)Me | Cl | $CH_2OC(=O)O(i\text{-}Pr)$ | O |
| C-11067 | Me(R) | single bond | H | c-Pr(1-CN) | C(=O)Me | Cl | $CH_2OC(=O)O(i\text{-}Pr)$ | O |
| C-11068 | Me(S) | single bond | H | c-Pr(1-CN) | C(=O)Me | Cl | $CH_2OC(=O)O(i\text{-}Pr)$ | O |
| C-11069 | H | single bond | Me | $CH_2CF_3$ | C(=O)Me | Me | $CH_2OC(=O)O(i\text{-}Pr)$ | O |
| C-11070 | Me | single bond | H | $CH_2CF_3$ | C(=O)Me | Me | $CH_2OC(=O)O(i\text{-}Pr)$ | O |
| C-11071 | Me(R) | single bond | H | $CH_2CF_3$ | C(=O)Me | Me | $CH_2OC(=O)O(i\text{-}Pr)$ | O |
| C-11072 | Me(S) | single bond | H | $CH_2CF_3$ | C(=O)Me | Me | $CH_2OC(=O)O(i\text{-}Pr)$ | O |
| C-11073 | H | single bond | Me | Et | C(=O)Me | Me | $CH_2OC(=O)O(i\text{-}Pr)$ | O |
| C-11074 | Me | single bond | H | Et | C(=O)Me | Me | $CH_2OC(=O)O(i\text{-}Pr)$ | O |
| C-11075 | Me(R) | single bond | H | Et | C(=O)Me | Me | $CH_2OC(=O)O(i\text{-}Pr)$ | O |
| C-11076 | Me(S) | single bond | H | Et | C(=O)Me | Me | $CH_2OC(=O)O(i\text{-}Pr)$ | O |
| C-11077 | H | single bond | Me | c-Pr | C(=O)Me | Me | $CH_2OC(=O)O(i\text{-}Pr)$ | O |
| C-11078 | Me | single bond | H | c-Pr | C(=O)Me | Me | $CH_2OC(=O)O(i\text{-}Pr)$ | O |

TABLE 480

| Compound Number | Y | W | Z | $R^1$ | $R^2$ | $R^3$ | $R^{10}$ | A |
|---|---|---|---|---|---|---|---|---|
| C-11079 | Me(R) | single bond | H | c-Pr | C(=O)Me | Me | $CH_2OC(=O)O(i\text{-}Pr)$ | O |
| C-11080 | Me(S) | single bond | H | c-Pr | C(=O)Me | Me | $CH_2OC(=O)O(i\text{-}Pr)$ | O |
| C-11081 | H | single bond | Me | c-Pr(1-CN) | C(=O)Me | Me | $CH_2OC(=O)O(i\text{-}Pr)$ | O |
| C-11082 | Me | single bond | H | c-Pr(1-CN) | C(=O)Me | Me | $CH_2OC(=O)O(i\text{-}Pr)$ | O |
| C-11083 | Me(R) | single bond | H | c-Pr(1-CN) | C(=O)Me | Me | $CH_2OC(=O)O(i\text{-}Pr)$ | O |
| C-11084 | Me(S) | single bond | H | c-Pr(1-CN) | C(=O)Me | Me | $CH_2OC(=O)O(i\text{-}Pr)$ | O |
| C-11085 | H | single bond | Me | $CH_2CF_3$ | C(=O)Me | Cl | $CH_2N(Me)C(=O)OMe$ | O |
| C-11086 | Me | single bond | H | $CH_2CF_3$ | C(=O)Me | Cl | $CH_2N(Me)C(=O)OMe$ | O |
| C-11087 | Me(R) | single bond | H | $CH_2CF_3$ | C(=O)Me | Cl | $CH_2N(Me)C(=O)OMe$ | O |
| C-11088 | Me(S) | single bond | H | $CH_2CF_3$ | C(=O)Me | Cl | $CH_2N(Me)C(=O)OMe$ | O |
| C-11089 | H | single bond | Me | Et | C(=O)Me | Cl | $CH_2N(Me)C(=O)OMe$ | O |
| C-11090 | Me | single bond | H | Et | C(=O)Me | Cl | $CH_2N(Me)C(=O)OMe$ | O |
| C-11091 | Me(R) | single bond | H | Et | C(=O)Me | Cl | $CH_2N(Me)C(=O)OMe$ | O |
| C-11092 | Me(S) | single bond | H | Et | C(=O)Me | Cl | $CH_2N(Me)C(=O)OMe$ | O |
| C-11093 | H | single bond | Me | c-Pr | C(=O)Me | Cl | $CH_2N(Me)C(=O)OMe$ | O |
| C-11094 | Me | single bond | H | c-Pr | C(=O)Me | Cl | $CH_2N(Me)C(=O)OMe$ | O |
| C-11095 | Me(R) | single bond | H | c-Pr | C(=O)Me | Cl | $CH_2N(Me)C(=O)OMe$ | O |
| C-11096 | Me(S) | single bond | H | c-Pr | C(=O)Me | Cl | $CH_2N(Me)C(=O)OMe$ | O |
| C-11097 | H | single bond | Me | c-Pr(1-CN) | C(=O)Me | Cl | $CH_2N(Me)C(=O)OMe$ | O |
| C-11098 | Me | single bond | H | c-Pr(1-CN) | C(=O)Me | Cl | $CH_2N(Me)C(=O)OMe$ | O |
| C-11099 | Me(R) | single bond | H | c-Pr(1-CN) | C(=O)Me | Cl | $CH_2N(Me)C(=O)OMe$ | O |
| C-11100 | Me(S) | single bond | H | c-Pr(1-CN) | C(=O)Me | Cl | $CH_2N(Me)C(=O)OMe$ | O |
| C-11101 | H | single bond | Me | $CH_2CF_3$ | C(=O)Me | Me | $CH_2N(Me)C(=O)OMe$ | O |
| C-11102 | Me | single bond | H | $CH_2CF_3$ | C(=O)Me | Me | $CH_2N(Me)C(=O)OMe$ | O |
| C-11103 | Me(R) | single bond | H | $CH_2CF_3$ | C(=O)Me | Me | $CH_2N(Me)C(=O)OMe$ | O |
| C-11104 | Me(S) | single bond | H | $CH_2CF_3$ | C(=O)Me | Me | $CH_2N(Me)C(=O)OMe$ | O |
| C-11105 | H | single bond | Me | Et | C(=O)Me | Me | $CH_2N(Me)C(=O)OMe$ | O |
| C-11106 | Me | single bond | H | Et | C(=O)Me | Me | $CH_2N(Me)C(=O)OMe$ | O |
| C-11107 | Me(R) | single bond | H | Et | C(=O)Me | Me | $CH_2N(Me)C(=O)OMe$ | O |
| C-11108 | Me(S) | single bond | H | Et | C(=O)Me | Me | $CH_2N(Me)C(=O)OMe$ | O |
| C-11109 | H | single bond | Me | c-Pr | C(=O)Me | Me | $CH_2N(Me)C(=O)OMe$ | O |
| C-11110 | Me | single bond | H | c-Pr | C(=O)Me | Me | $CH_2N(Me)C(=O)OMe$ | O |
| C-11111 | Me(R) | single bond | H | c-Pr | C(=O)Me | Me | $CH_2N(Me)C(=O)OMe$ | O |
| C-11112 | Me(S) | single bond | H | c-Pr | C(=O)Me | Me | $CH_2N(Me)C(=O)OMe$ | O |
| C-11113 | H | single bond | Me | c-Pr(1-CN) | C(=O)Me | Me | $CH_2N(Me)C(=O)OMe$ | O |
| C-11114 | Me | single bond | H | c-Pr(1-CN) | C(=O)Me | Me | $CH_2N(Me)C(=O)OMe$ | O |
| C-11115 | Me(R) | single bond | H | c-Pr(1-CN) | C(=O)Me | Me | $CH_2N(Me)C(=O)OMe$ | O |
| C-11116 | Me(S) | single bond | H | c-Pr(1-CN) | C(=O)Me | Me | $CH_2N(Me)C(=O)OMe$ | O |
| C-11117 | H | single bond | Me | $CH_2CF_3$ | C(=O)Me | Cl | $CH_2OCH_2CH_2OMe$ | O |
| C-11118 | Me | single bond | H | $CH_2CF_3$ | C(=O)Me | Cl | $CH_2OCH_2CH_2OMe$ | O |
| C-11119 | Me(R) | single bond | H | $CH_2CF_3$ | C(=O)Me | Cl | $CH_2OCH_2CH_2OMe$ | O |
| C-11120 | Me(S) | single bond | H | $CH_2CF_3$ | C(=O)Me | Cl | $CH_2OCH_2CH_2OMe$ | O |

TABLE 480-continued

| Compound Number | Y | W | Z | $R^1$ | $R^2$ | $R^3$ | $R^{10}$ | A |
|---|---|---|---|---|---|---|---|---|
| C-11121 | H | single bond | Me | Et | C(=O)Me | Cl | $CH_2OCH_2CH_2OMe$ | O |
| C-11122 | Me | single bond | H | Et | C(=O)Me | Cl | $CH_2OCH_2CH_2OMe$ | O |

TABLE 481

| Compound Number | Y | W | Z | $R^1$ | $R^2$ | $R^3$ | $R^{10}$ | A |
|---|---|---|---|---|---|---|---|---|
| C-11123 | Me(R) | single bond | H | Et | C(=O)Me | Cl | $CH_2OCH_2CH_2OMe$ | O |
| C-11124 | Me(S) | single bond | H | Et | C(=O)Me | Cl | $CH_2OCH_2CH_2OMe$ | O |
| C-11125 | H | single bond | Me | c-Pr | C(=O)Me | Cl | $CH_2OCH_2CH_2OMe$ | O |
| C-11126 | Me | single bond | H | c-Pr | C(=O)Me | Cl | $CH_2OCH_2CH_2OMe$ | O |
| C-11127 | Me(R) | single bond | H | c-Pr | C(=O)Me | Cl | $CH_2OCH_2CH_2OMe$ | O |
| C-11128 | Me(S) | single bond | H | c-Pr | C(=O)Me | Cl | $CH_2OCH_2CH_2OMe$ | O |
| C-11129 | H | single bond | Me | c-Pr(1-CN) | C(=O)Me | Cl | $CH_2OCH_2CH_2OMe$ | O |
| C-11130 | Me | single bond | H | c-Pr(1-CN) | C(=O)Me | Cl | $CH_2OCH_2CH_2OMe$ | O |
| C-11131 | Me(R) | single bond | H | c-Pr(1-CN) | C(=O)Me | Cl | $CH_2OCH_2CH_2OMe$ | O |
| C-11132 | Me(S) | single bond | H | c-Pr(1-CN) | C(=O)Me | Cl | $CH_2OCH_2CH_2OMe$ | O |
| C-11133 | H | single bond | Me | $CH_2CF_3$ | C(=O)Me | Me | $CH_2OCH_2CH_2OMe$ | O |
| C-11134 | Me | single bond | H | $CH_2CF_3$ | C(=O)Me | Me | $CH_2OCH_2CH_2OMe$ | O |
| C-11135 | Me(R) | single bond | H | $CH_2CF_3$ | C(=O)Me | Me | $CH_2OCH_2CH_2OMe$ | O |
| C-11136 | Me(S) | single bond | H | $CH_2CF_3$ | C(=O)Me | Me | $CH_2OCH_2CH_2OMe$ | O |
| C-11137 | H | single bond | Me | Et | C(=O)Me | Me | $CH_2OCH_2CH_2OMe$ | O |
| C-11138 | Me | single bond | H | Et | C(=O)Me | Me | $CH_2OCH_2CH_2OMe$ | O |
| C-11139 | Me(R) | single bond | H | Et | C(=O)Me | Me | $CH_2OCH_2CH_2OMe$ | O |
| C-11140 | Me(S) | single bond | H | Et | C(=O)Me | Me | $CH_2OCH_2CH_2OMe$ | O |
| C-11141 | H | single bond | Me | c-Pr | C(=O)Me | Me | $CH_2OCH_2CH_2OMe$ | O |
| C-11142 | Me | single bond | H | c-Pr | C(=O)Me | Me | $CH_2OCH_2CH_2OMe$ | O |
| C-11143 | Me(R) | single bond | H | c-Pr | C(=O)Me | Me | $CH_2OCH_2CH_2OMe$ | O |
| C-11144 | Me(S) | single bond | H | c-Pr | C(=O)Me | Me | $CH_2OCH_2CH_2OMe$ | O |
| C-11145 | H | single bond | Me | c-Pr(1-CN) | C(=O)Me | Me | $CH_2OCH_2CH_2OMe$ | O |
| C-11146 | Me | single bond | H | c-Pr(1-CN) | C(=O)Me | Me | $CH_2OCH_2CH_2OMe$ | O |
| C-11147 | Me(R) | single bond | H | c-Pr(1-CN) | C(=O)Me | Me | $CH_2OCH_2CH_2OMe$ | O |
| C-11148 | Me(S) | single bond | H | c-Pr(1-CN) | C(=O)Me | Me | $CH_2OCH_2CH_2OMe$ | O |
| C-11149 | H | single bond | Me | $CH_2CF_3$ | C(=O)Me | Cl | $CH_2OCH_2CH_2CN$ | O |
| C-11150 | Me | single bond | H | $CH_2CF_3$ | C(=O)Me | Cl | $CH_2OCH_2CH_2CN$ | O |
| C-11151 | Me(R) | single bond | H | $CH_2CF_3$ | C(=O)Me | Cl | $CH_2OCH_2CH_2CN$ | O |
| C-11152 | Me(S) | single bond | H | $CH_2CF_3$ | C(=O)Me | Cl | $CH_2OCH_2CH_2CN$ | O |
| C-11153 | H | single bond | Me | Et | C(=O)Me | Cl | $CH_2OCH_2CH_2CN$ | O |
| C-11154 | Me | single bond | H | Et | C(=O)Me | Cl | $CH_2OCH_2CH_2CN$ | O |
| C-11155 | Me(R) | single bond | H | Et | C(=O)Me | Cl | $CH_2OCH_2CH_2CN$ | O |
| C-11156 | Me(S) | single bond | H | Et | C(=O)Me | Cl | $CH_2OCH_2CH_2CN$ | O |
| C-11157 | H | single bond | Me | c-Pr | C(=O)Me | Cl | $CH_2OCH_2CH_2CN$ | O |
| C-11158 | Me | single bond | H | c-Pr | C(=O)Me | Cl | $CH_2OCH_2CH_2CN$ | O |
| C-11159 | Me(R) | single bond | H | c-Pr | C(=O)Me | Cl | $CH_2OCH_2CH_2CN$ | O |
| C-11160 | Me(S) | single bond | H | c-Pr | C(=O)Me | Cl | $CH_2OCH_2CH_2CN$ | O |
| C-11161 | H | single bond | Me | c-Pr(1-CN) | C(=O)Me | Cl | $CH_2OCH_2CH_2CN$ | O |
| C-11162 | Me | single bond | H | c-Pr(1-CN) | C(=O)Me | Cl | $CH_2OCH_2CH_2CN$ | O |
| C-11163 | Me(R) | single bond | H | c-Pr(1-CN) | C(=O)Me | Cl | $CH_2OCH_2CH_2CN$ | O |
| C-11164 | Me(S) | single bond | H | c-Pr(1-CN) | C(=O)Me | Cl | $CH_2OCH_2CH_2CN$ | O |
| C-11165 | H | single bond | Me | $CH_2CF_3$ | C(=O)Me | Me | $CH_2OCH_2CH_2CN$ | O |
| C-11166 | Me | single bond | H | $CH_2CF_3$ | C(=O)Me | Me | $CH_2OCH_2CH_2CN$ | O |

TABLE 482

| Compound Number | Y | W | Z | $R^1$ | $R^2$ | $R^3$ | $R^{10}$ | A |
|---|---|---|---|---|---|---|---|---|
| C-11167 | Me(R) | single bond | H | $CH_2CF_3$ | C(=O)Me | Me | $CH_2OCH_2CH_2CN$ | O |
| C-11168 | Me(S) | single bond | H | $CH_2CF_3$ | C(=O)Me | Me | $CH_2OCH_2CH_2CN$ | O |
| C-11169 | H | single bond | Me | Et | C(=O)Me | Me | $CH_2OCH_2CH_2CN$ | O |
| C-11170 | Me | single bond | H | Et | C(=O)Me | Me | $CH_2OCH_2CH_2CN$ | O |
| C-11171 | Me(R) | single bond | H | Et | C(=O)Me | Me | $CH_2OCH_2CH_2CN$ | O |
| C-11172 | Me(S) | single bond | H | Et | C(=O)Me | Me | $CH_2OCH_2CH_2CN$ | O |
| C-11173 | H | single bond | Me | c-Pr | C(=O)Me | Me | $CH_2OCH_2CH_2CN$ | O |
| C-11174 | Me | single bond | H | c-Pr | C(=O)Me | Me | $CH_2OCH_2CH_2CN$ | O |
| C-11175 | Me(R) | single bond | H | c-Pr | C(=O)Me | Me | $CH_2OCH_2CH_2CN$ | O |
| C-11176 | Me(S) | single bond | H | c-Pr | C(=O)Me | Me | $CH_2OCH_2CH_2CN$ | O |
| C-11177 | H | single bond | Me | c-Pr(1-CN) | C(=O)Me | Me | $CH_2OCH_2CH_2CN$ | O |
| C-11178 | Me | single bond | H | c-Pr(1-CN) | C(=O)Me | Me | $CH_2OCH_2CH_2CN$ | O |

TABLE 482-continued

| Compound Number | Y | W | Z | $R^1$ | $R^2$ | $R^3$ | $R^{10}$ | A |
|---|---|---|---|---|---|---|---|---|
| C-11179 | Me(R) | single bond | H | c-Pr(1-CN) | C(=O)Me | Me | $CH_2OCH_2CH_2CN$ | O |
| C-11180 | Me(S) | single bond | H | c-Pr(1-CN) | C(=O)Me | Me | $CH_2OCH_2CH_2CN$ | O |
| C-11181 | H | single bond | Me | $CH_2CF_3$ | C(=O)Me | Cl | $CH_2OCH_2CH_2S(=O)_2Me$ | O |
| C-11182 | Me | single bond | H | $CH_2CF_3$ | C(=O)Me | Cl | $CH_2OCH_2CH_2S(=O)_2Me$ | O |
| C-11183 | Me(R) | single bond | H | $CH_2CF_3$ | C(=O)Me | Cl | $CH_2OCH_2CH_2S(=O)_2Me$ | O |
| C-11184 | Me(S) | single bond | H | $CH_2CF_3$ | C(=O)Me | Cl | $CH_2OCH_2CH_2S(=O)_2Me$ | O |
| C-11185 | H | single bond | Me | Et | C(=O)Me | Cl | $CH_2OCH_2CH_2S(=O)_2Me$ | O |
| C-11186 | Me | single bond | H | Et | C(=O)Me | Cl | $CH_2OCH_2CH_2S(=O)_2Me$ | O |
| C-11187 | Me(R) | single bond | H | Et | C(=O)Me | Cl | $CH_2OCH_2CH_2S(=O)_2Me$ | O |
| C-11188 | Me(S) | single bond | H | Et | C(=O)Me | Cl | $CH_2OCH_2CH_2S(=O)_2Me$ | O |
| C-11189 | H | single bond | Me | c-Pr | C(=O)Me | Cl | $CH_2OCH_2CH_2S(=O)_2Me$ | O |
| C-11190 | Me | single bond | H | c-Pr | C(=O)Me | Cl | $CH_2OCH_2CH_2S(=O)_2Me$ | O |
| C-11191 | Me(R) | single bond | H | c-Pr | C(=O)Me | Cl | $CH_2OCH_2CH_2S(=O)_2Me$ | O |
| C-11192 | Me(S) | single bond | H | c-Pr | C(=O)Me | Cl | $CH_2OCH_2CH_2S(=O)_2Me$ | O |
| C-11193 | H | single bond | Me | c-Pr(1-CN) | C(=O)Me | Cl | $CH_2OCH_2CH_2S(=O)_2Me$ | O |
| C-11194 | Me | single bond | H | c-Pr(1-CN) | C(=O)Me | Cl | $CH_2OCH_2CH_2S(=O)_2Me$ | O |
| C-11195 | Me(R) | single bond | H | c-Pr(1-CN) | C(=O)Me | Cl | $CH_2OCH_2CH_2S(=O)_2Me$ | O |
| C-11196 | Me(S) | single bond | H | c-Pr(1-CN) | C(=O)Me | Cl | $CH_2OCH_2CH_2S(=O)_2Me$ | O |
| C-11197 | H | single bond | Me | $CH_2CF_3$ | C(=O)Me | Me | $CH_2OCH_2CH_2S(=O)_2Me$ | O |
| C-11198 | Me | single bond | H | $CH_2CF_3$ | C(=O)Me | Me | $CH_2OCH_2CH_2S(=O)_2Me$ | O |
| C-11199 | Me(R) | single bond | H | $CH_2CF_3$ | C(=O)Me | Me | $CH_2OCH_2CH_2S(=O)_2Me$ | O |
| C-11200 | Me(S) | single bond | H | $CH_2CF_3$ | C(=O)Me | Me | $CH_2OCH_2CH_2S(=O)_2Me$ | O |
| C-11201 | H | single bond | Me | Et | C(=O)Me | Me | $CH_2OCH_2CH_2S(=O)_2Me$ | O |
| C-11202 | Me | single bond | H | Et | C(=O)Me | Me | $CH_2OCH_2CH_2S(=O)_2Me$ | O |
| C-11203 | Me(R) | single bond | H | Et | C(=O)Me | Me | $CH_2OCH_2CH_2S(=O)_2Me$ | O |
| C-11204 | Me(S) | single bond | H | Et | C(=O)Me | Me | $CH_2OCH_2CH_2S(=O)_2Me$ | O |
| C-11205 | H | single bond | Me | c-Pr | C(=O)Me | Me | $CH_2OCH_2CH_2S(=O)_2Me$ | O |
| C-11206 | Me | single bond | H | c-Pr | C(=O)Me | Me | $CH_2OCH_2CH_2S(=O)_2Me$ | O |
| C-11207 | Me(R) | single bond | H | c-Pr | C(=O)Me | Me | $CH_2OCH_2CH_2S(=O)_2Me$ | O |
| C-11208 | Me(S) | single bond | H | c-Pr | C(=O)Me | Me | $CH_2OCH_2CH_2S(=O)_2Me$ | O |
| C-11209 | H | single bond | Me | c-Pr(1-CN) | C(=O)Me | Me | $CH_2OCH_2CH_2S(=O)_2Me$ | O |
| C-11210 | Me | single bond | H | c-Pr(1-CN) | C(=O)Me | Me | $CH_2OCH_2CH_2S(=O)_2Me$ | O |

TABLE 483

| Compound Number | Y | W | Z | $R^1$ | $R^2$ | $R^3$ | $R^{10}$ | A |
|---|---|---|---|---|---|---|---|---|
| C-11211 | Me(R) | single bond | H | c-Pr(1-CN) | C(=O)Me | Me | $CH_2OCH_2CH_2S(=O)_2Me$ | O |
| C-11212 | Me(S) | single bond | H | c-Pr(1-CN) | C(=O)Me | Me | $CH_2OCH_2CH_2S(=O)_2Me$ | O |
| C-11213 | H | single bond | Me | $CH_2CF_3$ | C(=O)Me | Cl | $CH_2$(5-Me-1,3-dioxol-2-one-4-yl) | O |
| C-11214 | Me | single bond | H | $CH_2CF_3$ | C(=O)Me | Cl | $CH_2$(5-Me-1,3-dioxol-2-one-4-yl) | O |
| C-11215 | Me(R) | single bond | H | $CH_2CF_3$ | C(=O)Me | Cl | $CH_2$(5-Me-1,3-dioxol-2-one-4-yl) | O |
| C-11216 | Me(S) | single bond | H | $CH_2CF_3$ | C(=O)Me | Cl | $CH_2$(5-Me-1,3-dioxol-2-one-4-yl) | O |
| C-11217 | H | single bond | Me | Et | C(=O)Me | Cl | $CH_2$(5-Me-1,3-dioxol-2-one-4-yl) | O |
| C-11218 | Me | single bond | H | Et | C(=O)Me | Cl | $CH_2$(5-Me-1,3-dioxol-2-one-4-yl) | O |
| C-11219 | Me(R) | single bond | H | Et | C(=O)Me | Cl | $CH_2$(5-Me-1,3-dioxol-2-one-4-yl) | O |
| C-11220 | Me(S) | single bond | H | Et | C(=O)Me | Cl | $CH_2$(5-Me-1,3-dioxol-2-one-4-yl) | O |
| C-11221 | H | single bond | Me | c-Pr | C(=O)Me | Cl | $CH_2$(5-Me-1,3-dioxol-2-one-4-yl) | O |
| C-11222 | Me | single bond | H | c-Pr | C(=O)Me | Cl | $CH_2$(5-Me-1,3-dioxol-2-one-4-yl) | O |
| C-11223 | Me(R) | single bond | H | c-Pr | C(=O)Me | Cl | $CH_2$(5-Me-1,3-dioxol-2-one-4-yl) | O |
| C-11224 | Me(S) | single bond | H | c-Pr | C(=O)Me | Cl | $CH_2$(5-Me-1,3-dioxol-2-one-4-yl) | O |
| C-11225 | H | single bond | Me | c-Pr(1-CN) | C(=O)Me | Cl | $CH_2$(5-Me-1,3-dioxol-2-one-4-yl) | O |
| C-11226 | Me | single bond | H | c-Pr(1-CN) | C(=O)Me | Cl | $CH_2$(5-Me-1,3-dioxol-2-one-4-yl) | O |
| C-11227 | Me(R) | single bond | H | c-Pr(1-CN) | C(=O)Me | Cl | $CH_2$(5-Me-1,3-dioxol-2-one-4-yl) | O |
| C-11228 | Me(S) | single bond | H | c-Pr(1-CN) | C(=O)Me | Cl | $CH_2$(5-Me-1,3-dioxol-2-one-4-yl) | O |
| C-11229 | H | single bond | Me | $CH_2CF_3$ | C(=O)Me | Me | $CH_2$(5-Me-1,3-dioxol-2-one-4-yl) | O |
| C-11230 | Me | single bond | H | $CH_2CF_3$ | C(=O)Me | Me | $CH_2$(5-Me-1,3-dioxol-2-one-4-yl) | O |
| C-11231 | Me(R) | single bond | H | $CH_2CF_3$ | C(=O)Me | Me | $CH_2$(5-Me-1,3-dioxol-2-one-4-yl) | O |
| C-11232 | Me(S) | single bond | H | $CH_2CF_3$ | C(=O)Me | Me | $CH_2$(5-Me-1,3-dioxol-2-one-4-yl) | O |
| C-11233 | H | single bond | Me | Et | C(=O)Me | Me | $CH_2$(5-Me-1,3-dioxol-2-one-4-yl) | O |
| C-11234 | Me | single bond | H | Et | C(=O)Me | Me | $CH_2$(5-Me-1,3-dioxol-2-one-4-yl) | O |
| C-11235 | Me(R) | single bond | H | Et | C(=O)Me | Me | $CH_2$(5-Me-1,3-dioxol-2-one-4-yl) | O |
| C-11236 | Me(S) | single bond | H | Et | C(=O)Me | Me | $CH_2$(5-Me-1,3-dioxol-2-one-4-yl) | O |
| C-11237 | H | single bond | Me | c-Pr | C(=O)Me | Me | $CH_2$(5-Me-1,3-dioxol-2-one-4-yl) | O |
| C-11238 | Me | single bond | H | c-Pr | C(=O)Me | Me | $CH_2$(5-Me-1,3-dioxol-2-one-4-yl) | O |
| C-11239 | Me(R) | single bond | H | c-Pr | C(=O)Me | Me | $CH_2$(5-Me-1,3-dioxol-2-one-4-yl) | O |
| C-11240 | Me(S) | single bond | H | c-Pr | C(=O)Me | Me | $CH_2$(5-Me-1,3-dioxol-2-one-4-yl) | O |
| C-11241 | H | single bond | Me | c-Pr(1-CN) | C(=O)Me | Me | $CH_2$(5-Me-1,3-dioxol-2-one-4-yl) | O |
| C-11242 | Me | single bond | H | c-Pr(1-CN) | C(=O)Me | Me | $CH_2$(5-Me-1,3-dioxol-2-one-4-yl) | O |
| C-11243 | Me(R) | single bond | H | c-Pr(1-CN) | C(=O)Me | Me | $CH_2$(5-Me-1,3-dioxol-2-one-4-yl) | O |
| C-11244 | Me(S) | single bond | H | c-Pr(1-CN) | C(=O)Me | Me | $CH_2$(5-Me-1,3-dioxol-2-one-4-yl) | O |

TABLE 484

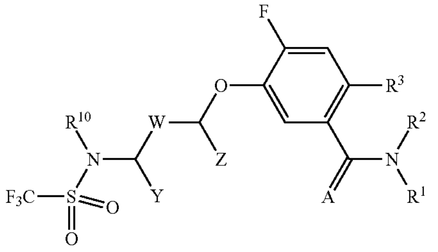

| Compound Number | Y | W | Z | $R^1$ | $R^2$ | $R^3$ | $R^{10}$ | A |
|---|---|---|---|---|---|---|---|---|
| C-11245 | H | single bond | Me | Me | H | Cl | H | O |
| C-11246 | Me | single bond | H | Me | H | Cl | H | O |
| C-11247 | Me(R) | single bond | H | Me | H | Cl | H | O |
| C-11248 | Me(S) | single bond | H | Me | H | Cl | H | O |
| C-11249 | H | single bond | Me | Me | H | Me | H | O |
| C-11250 | Me | single bond | H | Me | H | Me | H | O |
| C-11251 | Me(R) | single bond | H | Me | H | Me | H | O |
| C-11252 | Me(S) | single bond | H | Me | H | Me | H | O |
| C-11253 | H | single bond | Me | $CH_2CHF_2$ | H | Cl | H | O |
| C-11254 | Me | single bond | H | $CH_2CHF_2$ | H | Cl | H | O |
| C-11255 | Me(R) | single bond | H | $CH_2CHF_2$ | H | Cl | H | O |
| C-11256 | Me(S) | single bond | H | $CH_2CHF_2$ | H | Cl | H | O |
| C-11257 | H | single bond | Me | $CH_2CHF_2$ | H | Me | H | O |
| C-11258 | Me | single bond | H | $CH_2CHF_2$ | H | Me | H | O |
| C-11259 | Me(R) | single bond | H | $CH_2CHF_2$ | H | Me | H | O |
| C-11260 | Me(S) | single bond | H | $CH_2CHF_2$ | H | Me | H | O |
| C-11261 | H | single bond | Me | n-Pr | H | Cl | H | O |
| C-11262 | Me | single bond | H | n-Pr | H | Cl | H | O |
| C-11263 | Me(R) | single bond | H | n-Pr | H | Cl | H | O |
| C-11264 | Me(S) | single bond | H | n-Pr | H | Cl | H | O |

TABLE 484-continued

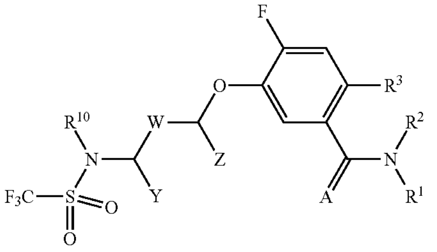

| Compound Number | Y | W | Z | $R^1$ | $R^2$ | $R^3$ | $R^{10}$ | A |
|---|---|---|---|---|---|---|---|---|
| C-11265 | H | single bond | Me | n-Pr | H | Me | H | O |
| C-11266 | Me | single bond | H | n-Pr | H | Me | H | O |
| C-11267 | Me(R) | single bond | H | n-Pr | H | Me | H | O |
| C-11268 | Me(S) | single bond | H | n-Pr | H | Me | H | O |
| C-11269 | H | single bond | Me | i-Pr | H | Cl | H | O |
| C-11270 | Me | single bond | H | i-Pr | H | Cl | H | O |
| C-11271 | Me(R) | single bond | H | i-Pr | H | Cl | H | O |
| C-11272 | Me(S) | single bond | H | i-Pr | H | Cl | H | O |
| C-11273 | H | single bond | Me | i-Pr | H | Me | H | O |
| C-11274 | Me | single bond | H | i-Pr | H | Me | H | O |
| C-11275 | Me(R) | single bond | H | i-Pr | H | Me | H | O |
| C-11276 | Me(S) | single bond | H | i-Pr | H | Me | H | O |
| C-11277 | H | single bond | Me | c-Pr(1-F) | H | Cl | H | O |
| C-11278 | Me | single bond | H | c-Pr(1-F) | H | Cl | H | O |
| C-11279 | Me(R) | single bond | H | c-Pr(1-F) | H | Cl | H | O |
| C-11280 | Me(S) | single bond | H | c-Pr(1-F) | H | Cl | H | O |
| C-11281 | H | single bond | Me | c-Pr(1-F) | H | Me | H | O |
| C-11282 | Me | single bond | H | c-Pr(1-F) | H | Me | H | O |

TABLE 485

| Compound Number | Y | W | Z | $R^1$ | $R^2$ | $R^3$ | $R^{10}$ | A |
|---|---|---|---|---|---|---|---|---|
| C-11283 | Me(R) | single bond | H | c-Pr(1-F) | H | Me | H | O |
| C-11284 | Me(S) | single bond | H | c-Pr(1-F) | H | Me | H | O |
| C-11285 | H | single bond | Me | c-Pr(2,2-$F_2$) | H | Cl | H | O |
| C-11286 | Me | single bond | H | c-Pr(2,2-$F_2$) | H | Cl | H | O |
| C-11287 | Me(R) | single bond | H | c-Pr(2,2-$F_2$) | H | Cl | H | O |
| C-11288 | Me(S) | single bond | H | c-Pr(2,2-$F_2$) | H | Cl | H | O |
| C-11289 | H | single bond | Me | c-Pr(2,2-$F_2$) | H | Me | H | O |
| C-11290 | Me | single bond | H | c-Pr(2,2-$F_2$) | H | Me | H | O |
| C-11291 | Me(R) | single bond | H | c-Pr(2,2-$F_2$) | H | Me | H | O |
| C-11292 | Me(S) | single bond | H | c-Pr(2,2-$F_2$) | H | Me | H | O |
| C-11293 | H | single bond | Me | c-Pr(1-Cl) | H | Cl | H | O |
| C-11294 | Me | single bond | H | c-Pr(1-Cl) | H | Cl | H | O |
| C-11295 | Me(R) | single bond | H | c-Pr(1-Cl) | H | Cl | H | O |
| C-11296 | Me(S) | single bond | H | c-Pr(1-Cl) | H | Cl | H | O |
| C-11297 | H | single bond | Me | c-Pr(1-Cl) | H | Me | H | O |
| C-11298 | Me | single bond | H | c-Pr(1-Cl) | H | Me | H | O |
| C-11299 | Me(R) | single bond | H | c-Pr(1-Cl) | H | Me | H | O |
| C-11300 | Me(S) | single bond | H | c-Pr(1-Cl) | H | Me | H | O |
| C-11301 | H | single bond | Me | c-Pr(1-Br) | H | Cl | H | O |
| C-11302 | Me | single bond | H | c-Pr(1-Br) | H | Cl | H | O |
| C-11303 | Me(R) | single bond | H | c-Pr(1-Br) | H | Cl | H | O |
| C-11304 | Me(S) | single bond | H | c-Pr(1-Br) | H | Cl | H | O |
| C-11305 | H | single bond | Me | c-Pr(1-Br) | H | Me | H | O |
| C-11306 | Me | single bond | H | c-Pr(1-Br) | H | Me | H | O |
| C-11307 | Me(R) | single bond | H | c-Pr(1-Br) | H | Me | H | O |
| C-11308 | Me(S) | single bond | H | c-Pr(1-Br) | H | Me | H | O |
| C-11309 | H | single bond | Me | c-Pr(1-Me) | H | Cl | H | O |
| C-11310 | Me | single bond | H | c-Pr(1-Me) | H | Cl | H | O |
| C-11311 | Me(R) | single bond | H | c-Pr(1-Me) | H | Cl | H | O |
| C-11312 | Me(S) | single bond | H | c-Pr(1-Me) | H | Cl | H | O |
| C-11313 | H | single bond | Me | c-Pr(1-Me) | H | Me | H | O |
| C-11314 | Me | single bond | H | c-Pr(1-Me) | H | Me | H | O |
| C-11315 | Me(R) | single bond | H | c-Pr(1-Me) | H | Me | H | O |
| C-11316 | Me(S) | single bond | H | c-Pr(1-Me) | H | Me | H | O |
| C-11317 | H | single bond | Me | c-Pr(1-$CH_2OH$) | H | Cl | H | O |
| C-11318 | Me | single bond | H | c-Pr(1-$CH_2OH$) | H | Cl | H | O |
| C-11319 | Me(R) | single bond | H | c-Pr(1-$CH_2OH$) | H | Cl | H | O |

TABLE 485-continued

| Compound Number | Y | W | Z | $R^1$ | $R^2$ | $R^3$ | $R^{10}$ | A |
|---|---|---|---|---|---|---|---|---|
| C-11320 | Me(S) | single bond | H | c-Pr(1-$CH_2$OH) | H | Cl | H | O |
| C-11321 | H | single bond | Me | c-Pr(1-$CH_2$OH) | H | Me | H | O |
| C-11322 | Me | single bond | H | c-Pr(1-$CH_2$OH) | H | Me | H | O |
| C-11323 | Me(R) | single bond | H | c-Pr(1-$CH_2$OH) | H | Me | H | O |
| C-11324 | Me(S) | single bond | H | c-Pr(1-$CH_2$OH) | H | Me | H | O |
| C-11325 | H | single bond | Me | c-Pr[1-$CH_2$OS(═O)$_2$Me] | H | Cl | H | O |
| C-11326 | Me | single bond | H | c-Pr[1-$CH_2$OS(═O)$_2$Me] | H | Cl | H | O |

TABLE 486

| Compound Number | Y | W | Z | $R^1$ | $R^2$ | $R^3$ | $R^{10}$ | A |
|---|---|---|---|---|---|---|---|---|
| C-11327 | Me(R) | single bond | H | c-Pr[1-$CH_2$OS(═O)$_2$Me] | H | Cl | H | O |
| C-11328 | Me(S) | single bond | H | c-Pr[1-$CH_2$OS(═O)$_2$Me] | H | Cl | H | O |
| C-11329 | H | single bond | Me | c-Pr[1-$CH_2$OS(═O)$_2$Me] | H | Me | H | O |
| C-11330 | Me | single bond | H | c-Pr[1-$CH_2$OS(═O)$_2$Me] | H | Me | H | O |
| C-11331 | Me(R) | single bond | H | c-Pr[1-$CH_2$OS(═O)$_2$Me] | H | Me | H | O |
| C-11332 | Me(S) | single bond | H | c-Pr[1-$CH_2$OS(═O)$_2$Me] | H | Me | H | O |
| C-11333 | H | single bond | Me | c-Pr(1-$CH_2$OMe) | H | Cl | H | O |
| C-11334 | Me | single bond | H | c-Pr(1-$CH_2$OMe) | H | Cl | H | O |
| C-11335 | Me(R) | single bond | H | c-Pr(1-$CH_2$OMe) | H | Cl | H | O |
| C-11336 | Me(S) | single bond | H | c-Pr(1-$CH_2$OMe) | H | Cl | H | O |
| C-11337 | H | single bond | Me | c-Pr(1-$CH_2$OMe) | H | Me | H | O |
| C-11338 | Me | single bond | H | c-Pr(1-$CH_2$OMe) | H | Me | H | O |
| C-11339 | Me(R) | single bond | H | c-Pr(1-$CH_2$OMe) | H | Me | H | O |
| C-11340 | Me(S) | single bond | H | c-Pr(1-$CH_2$OMe) | H | Me | H | O |
| C-11341 | H | single bond | Me | c-Pr(1-$CH_2$CN) | H | Cl | H | O |
| C-11342 | Me | single bond | H | c-Pr(1-$CH_2$CN) | H | Cl | H | O |
| C-11343 | Me(R) | single bond | H | c-Pr(1-$CH_2$CN) | H | Cl | H | O |
| C-11344 | Me(S) | single bond | H | c-Pr(1-$CH_2$CN) | H | Cl | H | O |
| C-11345 | H | single bond | Me | c-Pr(1-$CH_2$CN) | H | Me | H | O |
| C-11346 | Me | single bond | H | c-Pr(1-$CH_2$CN) | H | Me | H | O |
| C-11347 | Me(R) | single bond | H | c-Pr(1-$CH_2$CN) | H | Me | H | O |
| C-11348 | Me(S) | single bond | H | c-Pr(1-$CH_2$CN) | H | Me | H | O |
| C-11349 | H | single bond | Me | c-Pr(1-$CH_2$SMe) | H | Cl | H | O |
| C-11350 | Me | single bond | H | c-Pr(1-$CH_2$SMe) | H | Cl | H | O |
| C-11351 | Me(R) | single bond | H | c-Pr(1-$CH_2$SMe) | H | Cl | H | O |
| C-11352 | Me(S) | single bond | H | c-Pr(1-$CH_2$SMe) | H | Cl | H | O |
| C-11353 | H | single bond | Me | c-Pr(1-$CH_2$SMe) | H | Me | H | O |
| C-11354 | Me | single bond | H | c-Pr(1-$CH_2$SMe) | H | Me | H | O |
| C-11355 | Me(R) | single bond | H | c-Pr(1-$CH_2$SMe) | H | Me | H | O |
| C-11356 | Me(S) | single bond | H | c-Pr(1-$CH_2$SMe) | H | Me | H | O |
| C-11357 | H | single bond | Me | c-Pr[1-$CH_2$S(═O)Me] | H | Cl | H | O |
| C-11358 | Me | single bond | H | c-Pr[1-$CH_2$S(═O)Me] | H | Cl | H | O |
| C-11359 | Me(R) | single bond | H | c-Pr[1-$CH_2$S(═O)Me] | H | Cl | H | O |
| C-11360 | Me(S) | single bond | H | c-Pr[1-$CH_2$S(═O)Me] | H | Cl | H | O |
| C-11361 | H | single bond | Me | c-Pr[1-$CH_2$S(═O)Me] | H | Me | H | O |
| C-11362 | Me | single bond | H | c-Pr[1-$CH_2$S(═O)Me] | H | Me | H | O |
| C-11363 | Me(R) | single bond | H | c-Pr[1-$CH_2$S(═O)Me] | H | Me | H | O |
| C-11364 | Me(S) | single bond | H | c-Pr[1-$CH_2$S(═O)Me] | H | Me | H | O |
| C-11365 | H | single bond | Me | c-Pr[1-$CH_2$S(═O)$_2$Me] | H | Cl | H | O |
| C-11366 | Me | single bond | H | c-Pr[1-$CH_2$S(═O)$_2$Me] | H | Cl | H | O |
| C-11367 | Me(R) | single bond | H | c-Pr[1-$CH_2$S(═O)$_2$Me] | H | Cl | H | O |
| C-11368 | Me(S) | single bond | H | c-Pr[1-$CH_2$S(═O)$_2$Me] | H | Cl | H | O |
| C-11369 | H | single bond | Me | c-Pr[1-$CH_2$S(═O)$_2$Me] | H | Me | H | O |
| C-11370 | Me | single bond | H | c-Pr[1-$CH_2$S(═O)$_2$Me] | H | Me | H | O |

TABLE 487

| Compound Number | Y | W | Z | $R^1$ | $R^2$ | $R^3$ | $R^{10}$ | A |
|---|---|---|---|---|---|---|---|---|
| C-11371 | Me(R) | single bond | H | c-Pr[1-$CH_2$S(═O)$_2$Me] | H | Me | H | O |
| C-11372 | Me(S) | single bond | H | c-Pr[1-$CH_2$S(═O)$_2$Me] | H | Me | H | O |
| C-11373 | H | single bond | Me | c-Pr(1-$CH_2$F) | H | Cl | H | O |
| C-11374 | Me | single bond | H | c-Pr(1-$CH_2$F) | H | Cl | H | O |
| C-11375 | Me(R) | single bond | H | c-Pr(1-$CH_2$F) | H | Cl | H | O |

TABLE 487-continued

| Compound Number | Y | W | Z | $R^1$ | $R^2$ | $R^3$ | $R^{10}$ | A |
|---|---|---|---|---|---|---|---|---|
| C-11376 | Me(S) | single bond | H | c-Pr(1-$CH_2F$) | H | Cl | H | O |
| C-11377 | H | single bond | Me | c-Pr(1-$CH_2F$) | H | Me | H | O |
| C-11378 | Me | single bond | H | c-Pr(1-$CH_2F$) | H | Me | H | O |
| C-11379 | Me(R) | single bond | H | c-Pr(1-$CH_2F$) | H | Me | H | O |
| C-11380 | Me(S) | single bond | H | c-Pr(1-$CH_2F$) | H | Me | H | O |
| C-11381 | H | single bond | Me | c-Pr(1-$CHF_2$) | H | Cl | H | O |
| C-11382 | Me | single bond | H | c-Pr(1-$CHF_2$) | H | Cl | H | O |
| C-11383 | Me(R) | single bond | H | c-Pr(1-$CHF_2$) | H | Cl | H | O |
| C-11384 | Me(S) | single bond | H | c-Pr(1-$CHF_2$) | H | Cl | H | O |
| C-11385 | H | single bond | Me | c-Pr(1-$CHF_2$) | H | Me | H | O |
| C-11386 | Me | single bond | H | c-Pr(1-$CHF_2$) | H | Me | H | O |
| C-11387 | Me(R) | single bond | H | c-Pr(1-$CHF_2$) | H | Me | H | O |
| C-11388 | Me(S) | single bond | H | c-Pr(1-$CHF_2$) | H | Me | H | O |
| C-11389 | H | single bond | Me | c-Pr(1-$CF_3$) | H | Cl | H | O |
| C-11390 | Me | single bond | H | c-Pr(1-$CF_3$) | H | Cl | H | O |
| C-11391 | Me(R) | single bond | H | c-Pr(1-$CF_3$) | H | Cl | H | O |
| C-11392 | Me(S) | single bond | H | c-Pr(1-$CF_3$) | H | Cl | H | O |
| C-11393 | H | single bond | Me | c-Pr(1-$CF_3$) | H | Me | H | O |
| C-11394 | Me | single bond | H | c-Pr(1-$CF_3$) | H | Me | H | O |
| C-11395 | Me(R) | single bond | H | c-Pr(1-$CF_3$) | H | Me | H | O |
| C-11396 | Me(S) | single bond | H | c-Pr(1-$CF_3$) | H | Me | H | O |
| C-11397 | H | single bond | Me | c-Pr(1-C≡CH) | H | Cl | H | O |
| C-11398 | Me | single bond | H | c-Pr(1-C≡CH) | H | Cl | H | O |
| C-11399 | Me(R) | single bond | H | c-Pr(1-C≡CH) | H | Cl | H | O |
| C-11400 | Me(S) | single bond | H | c-Pr(1-C≡CH) | H | Cl | H | O |
| C-11401 | H | single bond | Me | c-Pr(1-C≡CH) | H | Me | H | O |
| C-11402 | Me | single bond | H | c-Pr(1-C≡CH) | H | Me | H | O |
| C-11403 | Me(R) | single bond | H | c-Pr(1-C≡CH) | H | Me | H | O |
| C-11404 | Me(S) | single bond | H | c-Pr(1-C≡CH) | H | Me | H | O |
| C-11405 | H | single bond | Me | c-Pr[1-C(═O)OEt] | H | Cl | H | O |
| C-11406 | Me | single bond | H | c-Pr[1-C(═O)OEt] | H | Cl | H | O |
| C-11407 | Me(R) | single bond | H | c-Pr[1-C(═O)OEt] | H | Cl | H | O |
| C-11408 | Me(S) | single bond | H | c-Pr[1-C(═O)OEt] | H | Cl | H | O |
| C-11409 | H | single bond | Me | c-Pr[1-C(═O)OEt] | H | Me | H | O |
| C-11410 | Me | single bond | H | c-Pr[1-C(═O)OEt] | H | Me | H | O |
| C-11411 | Me(R) | single bond | H | c-Pr[1-C(═O)OEt] | H | Me | H | O |
| C-11412 | Me(S) | single bond | H | c-Pr[1-C(═O)OEt] | H | Me | H | O |
| C-11413 | H | single bond | Me | c-Pr[1-C(═O)OH] | H | Cl | H | O |
| C-11414 | Me | single bond | H | c-Pr[1-C(═O)OH] | H | Cl | H | O |

TABLE 488

| Compound Number | Y | W | Z | $R^1$ | $R^2$ | $R^3$ | $R^{10}$ | A |
|---|---|---|---|---|---|---|---|---|
| C-11415 | Me(R) | single bond | H | c-Pr[1-C(═O)OH] | H | Cl | H | O |
| C-11416 | Me(S) | single bond | H | c-Pr[1-C(═O)OH] | H | Cl | H | O |
| C-11417 | H | single bond | Me | c-Pr[1-C(═O)OH] | H | Me | H | O |
| C-11418 | Me | single bond | H | c-Pr[1-C(═O)OH] | H | Me | H | O |
| C-11419 | Me(R) | single bond | H | c-Pr[1-C(═O)OH] | H | Me | H | O |
| C-11420 | Me(S) | single bond | H | c-Pr[1-C(═O)OH] | H | Me | H | O |
| C-11421 | H | single bond | Me | c-Pr[1-C(═O)$NH_2$] | H | Cl | H | O |
| C-11422 | Me | single bond | H | c-Pr[1-C(═O)$NH_2$] | H | Cl | H | O |
| C-11423 | Me(R) | single bond | H | c-Pr[1-C(═O)$NH_2$] | H | Cl | H | O |
| C-11424 | Me(S) | single bond | H | c-Pr[1-C(═O)$NH_2$] | H | Cl | H | O |
| C-11425 | H | single bond | Me | c-Pr[1-C(═O)$NH_2$] | H | Me | H | O |
| C-11426 | Me | single bond | H | c-Pr[1-C(═O)$NH_2$] | H | Me | H | O |
| C-11427 | Me(R) | single bond | H | c-Pr[1-C(═O)$NH_2$] | H | Me | H | O |
| C-11428 | Me(S) | single bond | H | c-Pr[1-C(═O)$NH_2$] | H | Me | H | O |
| C-11429 | H | single bond | Me | c-Pr(1-OMe) | H | Cl | H | O |
| C-11430 | Me | single bond | H | c-Pr(1-OMe) | H | Cl | H | O |
| C-11431 | Me(R) | single bond | H | c-Pr(1-OMe) | H | Cl | H | O |
| C-11432 | Me(S) | single bond | H | c-Pr(1-OMe) | H | Cl | H | O |
| C-11433 | H | single bond | Me | c-Pr(1-OMe) | H | Me | H | O |
| C-11434 | Me | single bond | H | c-Pr(1-OMe) | H | Me | H | O |
| C-11435 | Me(R) | single bond | H | c-Pr(1-OMe) | H | Me | H | O |
| C-11436 | Me(S) | single bond | H | c-Pr(1-OMe) | H | Me | H | O |
| C-11437 | H | single bond | Me | c-Pr(1-SMe) | H | Cl | H | O |
| C-11438 | Me | single bond | H | c-Pr(1-SMe) | H | Cl | H | O |
| C-11439 | Me(R) | single bond | H | c-Pr(1-SMe) | H | Cl | H | O |
| C-11440 | Me(S) | single bond | H | c-Pr(1-SMe) | H | Cl | H | O |
| C-11441 | H | single bond | Me | c-Pr(1-SMe) | H | Me | H | O |
| C-11442 | Me | single bond | H | c-Pr(1-SMe) | H | Me | H | O |

TABLE 488-continued

| Compound Number | Y | W | Z | $R^1$ | $R^2$ | $R^3$ | $R^{10}$ | A |
|---|---|---|---|---|---|---|---|---|
| C-11443 | Me(R) | single bond | H | c-Pr(1-SMe) | H | Me | H | O |
| C-11444 | Me(S) | single bond | H | c-Pr(1-SMe) | H | Me | H | O |
| C-11445 | H | single bond | Me | c-Pr[1-S(═O)Me] | H | Cl | H | O |
| C-11446 | Me | single bond | H | c-Pr[1-S(═O)Me] | H | Cl | H | O |
| C-11447 | Me(R) | single bond | H | c-Pr[1-S(═O)Me] | H | Cl | H | O |
| C-11448 | Me(S) | single bond | H | c-Pr[1-S(═O)Me] | H | Cl | H | O |
| C-11449 | H | single bond | Me | c-Pr[1-S(═O)Me] | H | Me | H | O |
| C-11450 | Me | single bond | H | c-Pr[1-S(═O)Me] | H | Me | H | O |
| C-11451 | Me(R) | single bond | H | c-Pr[1-S(═O)Me] | H | Me | H | O |
| C-11452 | Me(S) | single bond | H | c-Pr[1-S(═O)Me] | H | Me | H | O |
| C-11453 | H | single bond | Me | c-Pr[1-S(═O)$_2$Me] | H | Cl | H | O |
| C-11454 | Me | single bond | H | c-Pr[1-S(═O)$_2$Me] | H | Cl | H | O |
| C-11455 | Me(R) | single bond | H | c-Pr[1-S(═O)$_2$Me] | H | Cl | H | O |
| C-11456 | Me(S) | single bond | H | c-Pr[1-S(═O)$_2$Me] | H | Cl | H | O |
| C-11457 | H | single bond | Me | c-Pr[1-S(═O)$_2$Me] | H | Me | H | O |
| C-11458 | Me | single bond | H | c-Pr[1-S(═O)$_2$Me] | H | Me | H | O |

TABLE 489

| Compound Number | Y | W | Z | $R^1$ | $R^2$ | $R^3$ | $R^{10}$ | A |
|---|---|---|---|---|---|---|---|---|
| C-11459 | Me(R) | single bond | H | c-Pr[1-S(═O)$_2$Me] | H | Me | H | O |
| C-11460 | Me(S) | single bond | H | c-Pr[1-S(═O)$_2$Me] | H | Me | H | O |
| C-11461 | H | single bond | Me | c-Pr[1-S(═O)$_2$CHF$_2$] | H | Cl | H | O |
| C-11462 | Me | single bond | H | c-Pr[1-S(═O)$_2$CHF$_2$] | H | Cl | H | O |
| C-11463 | Me(R) | single bond | H | c-Pr[1-S(═O)$_2$CHF$_2$] | H | Cl | H | O |
| C-11464 | Me(S) | single bond | H | c-Pr[1-S(═O)$_2$CHF$_2$] | H | Cl | H | O |
| C-11465 | H | single bond | Me | c-Pr[1-S(═O)$_2$CHF$_2$] | H | Me | H | O |
| C-11466 | Me | single bond | H | c-Pr[1-S(═O)$_2$CHF$_2$] | H | Me | H | O |
| C-11467 | Me(R) | single bond | H | c-Pr[1-S(═O)$_2$CHF$_2$] | H | Me | H | O |
| C-11468 | Me(S) | single bond | H | c-Pr[1-S(═O)$_2$CHF$_2$] | H | Me | H | O |
| C-11469 | H | single bond | Me | c-Pr[1-S(═O)$_2$CF$_3$] | H | Cl | H | O |
| C-11470 | Me | single bond | H | c-Pr[1-S(═O)$_2$CF$_3$] | H | Cl | H | O |
| C-11471 | Me(R) | single bond | H | c-Pr[1-S(═O)$_2$CF$_3$] | H | Cl | H | O |
| C-11472 | Me(S) | single bond | H | c-Pr[1-S(═O)$_2$CF$_3$] | H | Cl | H | O |
| C-11473 | H | single bond | Me | c-Pr[1-S(═O)$_2$CF$_3$] | H | Me | H | O |
| C-11474 | Me | single bond | H | c-Pr[1-S(═O)$_2$CF$_3$] | H | Me | H | O |
| C-11475 | Me(R) | single bond | H | c-Pr[1-S(═O)$_2$CF$_3$] | H | Me | H | O |
| C-11476 | Me(S) | single bond | H | c-Pr[1-S(═O)$_2$CF$_3$] | H | Me | H | O |
| C-11477 | H | single bond | Me | c-Pr[1-(5,6-dihydro-1,4,2-dioxazin-3-yl)] | H | Cl | H | O |
| C-11478 | Me | single bond | H | c-Pr[1-(5,6-dihydro-1,4,2-dioxazin-3-yl)] | H | Cl | H | O |
| C-11479 | Me(R) | single bond | H | c-Pr[1-(5,6-dihydro-1,4,2-dioxazin-3-yl)] | H | Cl | H | O |
| C-11480 | Me(S) | single bond | H | c-Pr[1-(5,6-dihydro-1,4,2-dioxazin-3-yl)] | H | Cl | H | O |
| C-11481 | H | single bond | Me | c-Pr[1-(5,6-dihydro-1,4,2-dioxazin-3-yl)] | H | Me | H | O |
| C-11482 | Me | single bond | H | c-Pr[1-(5,6-dihydro-1,4,2-dioxazin-3-yl)] | H | Me | H | O |
| C-11483 | Me(R) | single bond | H | c-Pr[1-(5,6-dihydro-1,4,2-dioxazin-3-yl)] | H | Me | H | O |
| C-11484 | Me(S) | single bond | H | c-Pr[1-(5,6-dihydro-1,4,2-dioxazin-3-yl)] | H | Me | H | O |
| C-11485 | H | single bond | Me | c-Pr[1-(5-hydroxy-1,3,4-oxadiazol-2-yl)] | H | Cl | H | O |
| C-11486 | Me | single bond | H | c-Pr[1-(5-hydroxy-1,3,4-oxadiazol-2-yl)] | H | Cl | H | O |
| C-11487 | Me(R) | single bond | H | c-Pr[1-(5-hydroxy-1,3,4-oxadiazol-2-yl)] | H | Cl | H | O |
| C-11488 | Me(S) | single bond | H | c-Pr[1-(5-hydroxy-1,3,4-oxadiazol-2-yl)] | H | Cl | H | O |
| C-11489 | H | single bond | Me | c-Pr[1-(5-hydroxy-1,3,4-oxadiazol-2-yl)] | H | Me | H | O |
| C-11490 | Me | single bond | H | c-Pr[1-(5-hydroxy-1,3,4-oxadiazol-2-yl)] | H | Me | H | O |
| C-11491 | Me(R) | single bond | H | c-Pr[1-(5-hydroxy-1,3,4-oxadiazol-2-yl)] | H | Me | H | O |
| C-11492 | Me(S) | single bond | H | c-Pr[1-(5-hydroxy-1,3,4-oxadiazol-2-yl)] | H | Me | H | O |
| C-11493 | H | single bond | Me | c-Pr[1-(pyrimidin-2-yl)] | H | Cl | H | O |
| C-11494 | Me | single bond | H | c-Pr[1-(pyrimidin-2-yl)] | H | Cl | H | O |
| C-11495 | Me(R) | single bond | H | c-Pr[1-(pyrimidin-2-yl)] | H | Cl | H | O |
| C-11496 | Me(S) | single bond | H | c-Pr[1-(pyrimidin-2-yl)] | H | Cl | H | O |
| C-11497 | H | single bond | Me | c-Pr[1-(pyrimidin-2-yl)] | H | Me | H | O |
| C-11498 | Me | single bond | H | c-Pr[1-(pyrimidin-2-yl)] | H | Me | H | O |
| C-11499 | Me(R) | single bond | H | c-Pr[1-(pyrimidin-2-yl)] | H | Me | H | O |
| C-11500 | Me(S) | single bond | H | c-Pr[1-(pyrimidin-2-yl)] | H | Me | H | O |
| C-11501 | H | single bond | Me | t-Bu | H | Cl | H | O |
| C-11502 | Me | single bond | H | t-Bu | H | Cl | H | O |

TABLE 490

| Compound Number | Y | W | Z | $R^1$ | $R^2$ | $R^3$ | $R^{10}$ | A |
|---|---|---|---|---|---|---|---|---|
| C-11503 | Me(R) | single bond | H | t-Bu | H | Cl | H | O |
| C-11504 | Me(S) | single bond | H | t-Bu | H | Cl | H | O |
| C-11505 | H | single bond | Me | t-Bu | H | Me | H | O |
| C-11506 | Me | single bond | H | t-Bu | H | Me | H | O |
| C-11507 | Me(R) | single bond | H | t-Bu | H | Me | H | O |
| C-11508 | Me(S) | single bond | H | t-Bu | H | Me | H | O |
| C-11509 | H | single bond | Me | c-Bu | H | Cl | H | O |
| C-11510 | Me | single bond | H | c-Bu | H | Cl | H | O |
| C-11511 | Me(R) | single bond | H | c-Bu | H | Cl | H | O |
| C-11512 | Me(S) | single bond | H | c-Bu | H | Cl | H | O |
| C-11513 | H | single bond | Me | c-Bu | H | Me | H | O |
| C-11514 | Me | single bond | H | c-Bu | H | Me | H | O |
| C-11515 | Me(R) | single bond | H | c-Bu | H | Me | H | O |
| C-11516 | Me(S) | single bond | H | c-Bu | H | Me | H | O |
| C-11517 | H | single bond | Me | c-Bu(1-CN) | H | Cl | H | O |
| C-11518 | Me | single bond | H | c-Bu(1-CN) | H | Cl | H | O |
| C-11519 | Me(R) | single bond | H | c-Bu(1-CN) | H | Cl | H | O |
| C-11520 | Me(S) | single bond | H | c-Bu(1-CN) | H | Cl | H | O |
| C-11521 | H | single bond | Me | c-Bu(1-CN) | H | Me | H | O |
| C-11522 | Me | single bond | H | c-Bu(1-CN) | H | Me | H | O |
| C-11523 | Me(R) | single bond | H | c-Bu(1-CN) | H | Me | H | O |
| C-11524 | Me(S) | single bond | H | c-Bu(1-CN) | H | Me | H | O |
| C-11525 | H | single bond | Me | c-Bu(3,3-$F_2$) | H | Cl | H | O |
| C-11526 | Me | single bond | H | c-Bu(3,3-$F_2$) | H | Cl | H | O |
| C-11527 | Me(R) | single bond | H | c-Bu(3,3-$F_2$) | H | Cl | H | O |
| C-11528 | Me(S) | single bond | H | c-Bu(3,3-$F_2$) | H | Cl | H | O |
| C-11529 | H | single bond | Me | c-Bu(3,3-$F_2$) | H | Me | H | O |
| C-11530 | Me | single bond | H | c-Bu(3,3-$F_2$) | H | Me | H | O |
| C-11531 | Me(R) | single bond | H | c-Bu(3,3-$F_2$) | H | Me | H | O |
| C-11532 | Me(S) | single bond | H | c-Bu(3,3-$F_2$) | H | Me | H | O |
| C-11533 | H | single bond | Me | oxetan-3-yl | H | Cl | H | O |
| C-11534 | Me | single bond | H | oxetan-3-yl | H | Cl | H | O |
| C-11535 | Me(R) | single bond | H | oxetan-3-yl | H | Cl | H | O |
| C-11536 | Me(S) | single bond | H | oxetan-3-yl | H | Cl | H | O |
| C-11537 | H | single bond | Me | oxetan-3-yl | H | Me | H | O |
| C-11538 | Me | single bond | H | oxetan-3-yl | H | Me | H | O |
| C-11539 | Me(R) | single bond | H | oxetan-3-yl | H | Me | H | O |
| C-11540 | Me(S) | single bond | H | oxetan-3-yl | H | Me | H | O |
| C-11541 | H | single bond | Me | oxetan(3-CN)-3-yl | H | Cl | H | O |
| C-11542 | Me | single bond | H | oxetan(3-CN)-3-yl | H | Cl | H | O |
| C-11543 | Me(R) | single bond | H | oxetan(3-CN)-3-yl | H | Cl | H | O |
| C-11544 | Me(S) | single bond | H | oxetan(3-CN)-3-yl | H | Cl | H | O |
| C-11545 | H | single bond | Me | oxetan(3-CN)-3-yl | H | Me | H | O |
| C-11546 | Me | single bond | H | oxetan(3-CN)-3-yl | H | Me | H | O |

TABLE 491

| Compound Number | Y | W | Z | $R^1$ | $R^2$ | $R^3$ | $R^{10}$ | A |
|---|---|---|---|---|---|---|---|---|
| C-11547 | Me(R) | single bond | H | oxetan(3-CN)-3-yl | H | Me | H | O |
| C-11548 | Me(S) | single bond | H | oxetan(3-CN)-3-yl | H | Me | H | O |
| C-11549 | H | single bond | Me | azetidin[1-C(═O)Me]-3-yl | H | Cl | H | O |
| C-11550 | Me | single bond | H | azetidin[1-C(═O)Me]-3-yl | H | Cl | H | O |
| C-11551 | Me(R) | single bond | H | azetidin[1-C(═O)Me]-3-yl | H | Cl | H | O |
| C-11552 | Me(S) | single bond | H | azetidin[1-C(═O)Me]-3-yl | H | Cl | H | O |
| C-11553 | H | single bond | Me | azetidin[1-C(═O)Me]-3-yl | H | Me | H | O |
| C-11554 | Me | single bond | H | azetidin[1-C(═O)Me]-3-yl | H | Me | H | O |
| C-11555 | Me(R) | single bond | H | azetidin[1-C(═O)Me]-3-yl | H | Me | H | O |
| C-11556 | Me(S) | single bond | H | azetidin[1-C(═O)Me]-3-yl | H | Me | H | O |
| C-11557 | H | single bond | Me | azetidin[1-S(═O)$_2$Me]-3-yl | H | Cl | H | O |
| C-11558 | Me | single bond | H | azetidin[1-S(═O)$_2$Me]-3-yl | H | Cl | H | O |
| C-11559 | Me(R) | single bond | H | azetidin[1-S(═O)$_2$Me]-3-yl | H | Cl | H | O |
| C-11560 | Me(S) | single bond | H | azetidin[1-S(═O)$_2$Me]-3-yl | H | Cl | H | O |
| C-11561 | H | single bond | Me | azetidin[1-S(═O)$_2$Me]-3-yl | H | Me | H | O |
| C-11562 | Me | single bond | H | azetidin[1-S(═O)$_2$Me]-3-yl | H | Me | H | O |
| C-11563 | Me(R) | single bond | H | azetidin[1-S(═O)$_2$Me]-3-yl | H | Me | H | O |
| C-11564 | Me(S) | single bond | H | azetidin[1-S(═O)$_2$Me]-3-yl | H | Me | H | O |
| C-11565 | H | single bond | Me | azetidin[1-S(═O)$_2$CHF$_2$]-3-yl | H | Cl | H | O |
| C-11566 | Me | single bond | H | azetidin[1-S(═O)$_2$CHF$_2$]-3-yl | H | Cl | H | O |
| C-11567 | Me(R) | single bond | H | azetidin[1-S(═O)$_2$CHF$_2$]-3-yl | H | Cl | H | O |
| C-11568 | Me(S) | single bond | H | azetidin[1-S(═O)$_2$CHF$_2$]-3-yl | H | Cl | H | O |
| C-11569 | H | single bond | Me | azetidin[1-S(═O)$_2$CHF$_2$]-3-yl | H | Me | H | O |

TABLE 491-continued

| Compound Number | Y | W | Z | $R^1$ | $R^2$ | $R^3$ | $R^{10}$ | A |
|---|---|---|---|---|---|---|---|---|
| C-11570 | Me | single bond | H | azetidin[1-S(═O)$_2$CHF$_2$]-3-yl | H | Me | H | O |
| C-11571 | Me(R) | single bond | H | azetidin[1-S(═O)$_2$CHF$_2$]-3-yl | H | Me | H | O |
| C-11572 | Me(S) | single bond | H | azetidin[1-S(═O)$_2$CHF$_2$]-3-yl | H | Me | H | O |
| C-11573 | H | single bond | Me | c-Pen | H | Cl | H | O |
| C-11574 | Me | single bond | H | c-Pen | H | Cl | H | O |
| C-11575 | Me(R) | single bond | H | c-Pen | H | Cl | H | O |
| C-11576 | Me(S) | single bond | H | c-Pen | H | Cl | H | O |
| C-11577 | H | single bond | Me | c-Pen | H | Me | H | O |
| C-11578 | Me | single bond | H | c-Pen | H | Me | H | O |
| C-11579 | Me(R) | single bond | H | c-Pen | H | Me | H | O |
| C-11580 | Me(S) | single bond | H | c-Pen | H | Me | H | O |
| C-11581 | H | single bond | Me | tetrahydrofuran-3-yl | H | Cl | H | O |
| C-11582 | Me | single bond | H | tetrahydrofuran-3-yl | H | Cl | H | O |
| C-11583 | Me(R) | single bond | H | tetrahydrofuran-3-yl | H | Cl | H | O |
| C-11584 | Me(S) | single bond | H | tetrahydrofuran-3-yl | H | Cl | H | O |
| C-11585 | H | single bond | Me | tetrahydrofuran-3-yl | H | Me | H | O |
| C-11586 | Me | single bond | H | tetrahydrofuran-3-yl | H | Me | H | O |
| C-11587 | Me(R) | single bond | H | tetrahydrofuran-3-yl | H | Me | H | O |
| C-11588 | Me(S) | single bond | H | tetrahydrofuran-3-yl | H | Me | H | O |
| C-11589 | H | single bond | Me | tetrahydrothiophen-3-yl | H | Cl | H | O |
| C-11590 | Me | single bond | H | tetrahydrothiophen-3-yl | H | Cl | H | O |

TABLE 492

| Compound Number | Y | W | Z | $R^1$ | $R^2$ | $R^3$ | $R^{10}$ | A |
|---|---|---|---|---|---|---|---|---|
| C-11591 | Me(R) | single bond | H | tetrahydrothiophen-3-yl | H | Cl | H | O |
| C-11592 | Me(S) | single bond | H | tetrahydrothiophen-3-yl | H | Cl | H | O |
| C-11593 | H | single bond | Me | tetrahydrothiophen-3-yl | H | Me | H | O |
| C-11594 | Me | single bond | H | tetrahydrothiophen-3-yl | H | Me | H | O |
| C-11595 | Me(R) | single bond | H | tetrahydrothiophen-3-yl | H | Me | H | O |
| C-11596 | Me(S) | single bond | H | tetrahydrothiophen-3-yl | H | Me | H | O |
| C-11597 | H | single bond | Me | c-Pen(1-CN) | H | Cl | H | O |
| C-11598 | Me | single bond | H | c-Pen(1-CN) | H | Cl | H | O |
| C-11599 | Me(R) | single bond | H | c-Pen(1-CN) | H | Cl | H | O |
| C-11600 | Me(S) | single bond | H | c-Pen(1-CN) | H | Cl | H | O |
| C-11601 | H | single bond | Me | c-Pen(1-CN) | H | Me | H | O |
| C-11602 | Me | single bond | H | c-Pen(1-CN) | H | Me | H | O |
| C-11603 | Me(R) | single bond | H | c-Pen(1-CN) | H | Me | H | O |
| C-11604 | Me(S) | single bond | H | c-Pen(1-CN) | H | Me | H | O |
| C-11605 | H | single bond | Me | tetrahydrofuran(3-CN)-3-yl | H | Cl | H | O |
| C-11606 | Me | single bond | H | tetrahydrofuran(3-CN)-3-yl | H | Cl | H | O |
| C-11607 | Me(R) | single bond | H | tetrahydrofuran(3-CN)-3-yl | H | Cl | H | O |
| C-11608 | Me(S) | single bond | H | tetrahydrofuran(3-CN)-3-yl | H | Cl | H | O |
| C-11609 | H | single bond | Me | tetrahydrofuran(3-CN)-3-yl | H | Me | H | O |
| C-11610 | Me | single bond | H | tetrahydrofuran(3-CN)-3-yl | H | Me | H | O |
| C-11611 | Me(R) | single bond | H | tetrahydrofuran(3-CN)-3-yl | H | Me | H | O |
| C-11612 | Me(S) | single bond | H | tetrahydrofuran(3-CN)-3-yl | H | Me | H | O |
| C-11613 | H | single bond | Me | tetrahydrothiophen(3-CN)-3-yl | H | Cl | H | O |
| C-11614 | Me | single bond | H | tetrahydrothiophen(3-CN)-3-yl | H | Cl | H | O |
| C-11615 | Me(R) | single bond | H | tetrahydrothiophen(3-CN)-3-yl | H | Cl | H | O |
| C-11616 | Me(S) | single bond | H | tetrahydrothiophen(3-CN)-3-yl | H | Cl | H | O |
| C-11617 | H | single bond | Me | tetrahydrothiophen(3-CN)-3-yl | H | Me | H | O |
| C-11618 | Me | single bond | H | tetrahydrothiophen(3-CN)-3-yl | H | Me | H | O |
| C-11619 | Me(R) | single bond | H | tetrahydrothiophen(3-CN)-3-yl | H | Me | H | O |
| C-11620 | Me(S) | single bond | H | tetrahydrothiophen(3-CN)-3-yl | H | Me | H | O |
| C-11621 | H | single bond | Me | bicyclo[1.1.1]pentan-1-yl | H | Cl | H | O |
| C-11622 | Me | single bond | H | bicyclo[1.1.1]pentan-1-yl | H | Cl | H | O |
| C-11623 | Me(R) | single bond | H | bicyclo[1.1.1]pentan-1-yl | H | Cl | H | O |
| C-11624 | Me(S) | single bond | H | bicyclo[1.1.1]pentan-1-yl | H | Cl | H | O |
| C-11625 | H | single bond | Me | bicyclo[1.1.1]pentan-1-yl | H | Me | H | O |
| C-11626 | Me | single bond | H | bicyclo[1.1.1]pentan-1-yl | H | Me | H | O |
| C-11627 | Me(R) | single bond | H | bicyclo[1.1.1]pentan-1-yl | H | Me | H | O |
| C-11628 | Me(S) | single bond | H | bicyclo[1.1.1]pentan-1-yl | H | Me | H | O |
| C-11629 | H | single bond | Me | c-Hex | H | Cl | H | O |
| C-11630 | Me | single bond | H | c-Hex | H | Cl | H | O |
| C-11631 | Me(R) | single bond | H | c-Hex | H | Cl | H | O |
| C-11632 | Me(S) | single bond | H | c-Hex | H | Cl | H | O |
| C-11633 | H | single bond | Me | c-Hex | H | Me | H | O |
| C-11634 | Me | single bond | H | c-Hex | H | Me | H | O |

TABLE 493

| Compound Number | Y | W | Z | $R^1$ | $R^2$ | $R^3$ | $R^{10}$ | A |
|---|---|---|---|---|---|---|---|---|
| C-11635 | Me(R) | single bond | H | c-Hex | H | Me | H | O |
| C-11636 | Me(S) | single bond | H | c-Hex | H | Me | H | O |
| C-11637 | H | single bond | Me | tetrahydropyran-4-yl | H | Cl | H | O |
| C-11638 | Me | single bond | H | tetrahydropyran-4-yl | H | Cl | H | O |
| C-11639 | Me(R) | single bond | H | tetrahydropyran-4-yl | H | Cl | H | O |
| C-11640 | Me(S) | single bond | H | tetrahydropyran-4-yl | H | Cl | H | O |
| C-11641 | H | single bond | Me | tetrahydropyran-4-yl | H | Me | H | O |
| C-11642 | Me | single bond | H | tetrahydropyran-4-yl | H | Me | H | O |
| C-11643 | Me(R) | single bond | H | tetrahydropyran-4-yl | H | Me | H | O |
| C-11644 | Me(S) | single bond | H | tetrahydropyran-4-yl | H | Me | H | O |
| C-11645 | H | single bond | Me | tetrahydrothiopyran-4-yl | H | Cl | H | O |
| C-11646 | Me | single bond | H | tetrahydrothiopyran-4-yl | H | Cl | H | O |
| C-11647 | Me(R) | single bond | H | tetrahydrothiopyran-4-yl | H | Cl | H | O |
| C-11648 | Me(S) | single bond | H | tetrahydrothiopyran-4-yl | H | Cl | H | O |
| C-11649 | H | single bond | Me | tetrahydrothiopyran-4-yl | H | Me | H | O |
| C-11650 | Me | single bond | H | tetrahydrothiopyran-4-yl | H | Me | H | O |
| C-11651 | Me(R) | single bond | H | tetrahydrothiopyran-4-yl | H | Me | H | O |
| C-11652 | Me(S) | single bond | H | tetrahydrothiopyran-4-yl | H | Me | H | O |
| C-11653 | H | single bond | Me | c-Hex(1-CN) | H | Cl | H | O |
| C-11654 | Me | single bond | H | c-Hex(1-CN) | H | Cl | H | O |
| C-11655 | Me(R) | single bond | H | c-Hex(1-CN) | H | Cl | H | O |
| C-11656 | Me(S) | single bond | H | c-Hex(1-CN) | H | Cl | H | O |
| C-11657 | H | single bond | Me | c-Hex(1-CN) | H | Me | H | O |
| C-11658 | Me | single bond | H | c-Hex(1-CN) | H | Me | H | O |
| C-11659 | Me(R) | single bond | H | c-Hex(1-CN) | H | Me | H | O |
| C-11660 | Me(S) | single bond | H | c-Hex(1-CN) | H | Me | H | O |
| C-11661 | H | single bond | Me | tetrahydropyran(4-CN)-4-yl | H | Cl | H | O |
| C-11662 | Me | single bond | H | tetrahydropyran(4-CN)-4-yl | H | Cl | H | O |
| C-11663 | Me(R) | single bond | H | tetrahydropyran(4-CN)-4-yl | H | Cl | H | O |
| C-11664 | Me(S) | single bond | H | tetrahydropyran(4-CN)-4-yl | H | Cl | H | O |
| C-11665 | H | single bond | Me | tetrahydropyran(4-CN)-4-yl | H | Me | H | O |
| C-11666 | Me | single bond | H | tetrahydropyran(4-CN)-4-yl | H | Me | H | O |
| C-11667 | Me(R) | single bond | H | tetrahydropyran(4-CN)-4-yl | H | Me | H | O |
| C-11668 | Me(S) | single bond | H | tetrahydropyran(4-CN)-4-yl | H | Me | H | O |
| C-11669 | H | single bond | Me | tetrahydrothiopyran(4-CN)-4-yl | H | Cl | H | O |
| C-11670 | Me | single bond | H | tetrahydrothiopyran(4-CN)-4-yl | H | Cl | H | O |
| C-11671 | Me(R) | single bond | H | tetrahydrothiopyran(4-CN)-4-yl | H | Cl | H | O |
| C-11672 | Me(S) | single bond | H | tetrahydrothiopyran(4-CN)-4-yl | H | Cl | H | O |
| C-11673 | H | single bond | Me | tetrahydrothiopyran(4-CN)-4-yl | H | Me | H | O |
| C-11674 | Me | single bond | H | tetrahydrothiopyran(4-CN)-4-yl | H | Me | H | O |
| C-11675 | Me(R) | single bond | H | tetrahydrothiopyran(4-CN)-4-yl | H | Me | H | O |
| C-11676 | Me(S) | single bond | H | tetrahydrothiopyran(4-CN)-4-yl | H | Me | H | O |
| C-11677 | H | single bond | Me | $CH_2$(c-Pr) | H | Cl | H | O |
| C-11678 | Me | single bond | H | $CH_2$(c-Pr) | H | Cl | H | O |

TABLE 494

| Compound Number | Y | W | Z | $R^1$ | $R^2$ | $R^3$ | $R^{10}$ | A |
|---|---|---|---|---|---|---|---|---|
| C-11679 | Me(R) | single bond | H | $CH_2$(c-Pr) | H | Cl | H | O |
| C-11680 | Me(S) | single bond | H | $CH_2$(c-Pr) | H | Cl | H | O |
| C-11681 | H | single bond | Me | $CH_2$(c-Pr) | H | Me | H | O |
| C-11682 | Me | single bond | H | $CH_2$(c-Pr) | H | Me | H | O |
| C-11683 | Me(R) | single bond | H | $CH_2$(c-Pr) | H | Me | H | O |
| C-11684 | Me(S) | single bond | H | $CH_2$(c-Pr) | H | Me | H | O |
| C-11685 | H | single bond | Me | $CH_2$[c-Pr(1-CN)] | H | Cl | H | O |
| C-11686 | Me | single bond | H | $CH_2$[c-Pr(1-CN)] | H | Cl | H | O |
| C-11687 | Me(R) | single bond | H | $CH_2$[c-Pr(1-CN)] | H | Cl | H | O |
| C-11688 | Me(S) | single bond | H | $CH_2$[c-Pr(1-CN)] | H | Cl | H | O |
| C-11689 | H | single bond | Me | $CH_2$[c-Pr(1-CN)] | H | Me | H | O |
| C-11690 | Me | single bond | H | $CH_2$[c-Pr(1-CN)] | H | Me | H | O |
| C-11691 | Me(R) | single bond | H | $CH_2$[c-Pr(1-CN)] | H | Me | H | O |
| C-11692 | Me(S) | single bond | H | $CH_2$[c-Pr(1-CN)] | H | Me | H | O |
| C-11693 | H | single bond | Me | CH(Me)(c-Pr) | H | Cl | H | O |
| C-11694 | Me | single bond | H | CH(Me)(c-Pr) | H | Cl | H | O |
| C-11695 | Me(R) | single bond | H | CH(Me)(c-Pr) | H | Cl | H | O |
| C-11696 | Me(S) | single bond | H | CH(Me)(c-Pr) | H | Cl | H | O |
| C-11697 | H | single bond | Me | CH(Me)(c-Pr) | H | Me | H | O |
| C-11698 | Me | single bond | H | CH(Me)(c-Pr) | H | Me | H | O |
| C-11699 | Me(R) | single bond | H | CH(Me)(c-Pr) | H | Me | H | O |
| C-11700 | Me(S) | single bond | H | CH(Me)(c-Pr) | H | Me | H | O |
| C-11701 | H | single bond | Me | CH(Me)$CH_2$OMe | H | Cl | H | O |
| C-11702 | Me | single bond | H | CH(Me)$CH_2$OMe | H | Cl | H | O |
| C-11703 | Me(R) | single bond | H | CH(Me)$CH_2$OMe | H | Cl | H | O |
| C-11704 | Me(S) | single bond | H | CH(Me)$CH_2$OMe | H | Cl | H | O |
| C-11705 | H | single bond | Me | CH(Me)$CH_2$OMe | H | Me | H | O |
| C-11706 | Me | single bond | H | CH(Me)$CH_2$OMe | H | Me | H | O |
| C-11707 | Me(R) | single bond | H | CH(Me)$CH_2$OMe | H | Me | H | O |
| C-11708 | Me(S) | single bond | H | CH(Me)$CH_2$OMe | H | Me | H | O |
| C-11709 | H | single bond | Me | $CH_2CH{=}CH_2$ | H | Cl | H | O |
| C-11710 | Me | single bond | H | $CH_2CH{=}CH_2$ | H | Cl | H | O |
| C-11711 | Me(R) | single bond | H | $CH_2CH{=}CH_2$ | H | Cl | H | O |
| C-11712 | Me(S) | single bond | H | $CH_2CH{=}CH_2$ | H | Cl | H | O |
| C-11713 | H | single bond | Me | $CH_2CH{=}CH_2$ | H | Me | H | O |
| C-11714 | Me | single bond | H | $CH_2CH{=}CH_2$ | H | Me | H | O |
| C-11715 | Me(R) | single bond | H | $CH_2CH{=}CH_2$ | H | Me | H | O |
| C-11716 | Me(S) | single bond | H | $CH_2CH{=}CH_2$ | H | Me | H | O |
| C-11717 | H | single bond | Me | $CH_2C{\equiv}CH$ | H | Cl | H | O |
| C-11718 | Me | single bond | H | $CH_2C{\equiv}CH$ | H | Cl | H | O |
| C-11719 | Me(R) | single bond | H | $CH_2C{\equiv}CH$ | H | Cl | H | O |
| C-11720 | Me(S) | single bond | H | $CH_2C{\equiv}CH$ | H | Cl | H | O |

TABLE 494-continued

| Compound Number | Y | W | Z | $R^1$ | $R^2$ | $R^3$ | $R^{10}$ | A |
|---|---|---|---|---|---|---|---|---|
| C-11721 | H | single bond | Me | $CH_2C≡CH$ | H | Me | H | O |
| C-11722 | Me | single bond | H | $CH_2C≡CH$ | H | Me | H | O |

TABLE 495

| Compound Number | Y | W | Z | $R^1$ | $R^2$ | $R^3$ | $R^{10}$ | A |
|---|---|---|---|---|---|---|---|---|
| C-11723 | Me(R) | single bond | H | $CH_2C≡CH$ | H | Me | H | O |
| C-11724 | Me(S) | single bond | H | $CH_2C≡CH$ | H | Me | H | O |
| C-11725 | H | single bond | Me | $CH_2CN$ | H | Cl | H | O |
| C-11726 | Me | single bond | H | $CH_2CN$ | H | Cl | H | O |
| C-11727 | Me(R) | single bond | H | $CH_2CN$ | H | Cl | H | O |
| C-11728 | Me(S) | single bond | H | $CH_2CN$ | H | Cl | H | O |
| C-11729 | H | single bond | Me | $CH_2CN$ | H | Me | H | O |
| C-11730 | Me | single bond | H | $CH_2CN$ | H | Me | H | O |
| C-11731 | Me(R) | single bond | H | $CH_2CN$ | H | Me | H | O |
| C-11732 | Me(S) | single bond | H | $CH_2CN$ | H | Me | H | O |
| C-11733 | H | single bond | Me | CH(Me)CN | H | Cl | H | O |
| C-11734 | Me | single bond | H | CH(Me)CN | H | Cl | H | O |
| C-11735 | Me(R) | single bond | H | CH(Me)CN | H | Cl | H | O |
| C-11736 | Me(S) | single bond | H | CH(Me)CN | H | Cl | H | O |
| C-11737 | H | single bond | Me | CH(Me)CN | H | Me | H | O |
| C-11738 | Me | single bond | H | CH(Me)CN | H | Me | H | O |
| C-11739 | Me(R) | single bond | H | CH(Me)CN | H | Me | H | O |

TABLE 495-continued

| Compound Number | Y | W | Z | $R^1$ | $R^2$ | $R^3$ | $R^{10}$ | A |
|---|---|---|---|---|---|---|---|---|
| C-11740 | Me(S) | single bond | H | CH(Me)CN | H | Me | H | O |
| C-11741 | H | single bond | Me | $C(Me)_2CN$ | H | Cl | H | O |
| C-11742 | Me | single bond | H | $C(Me)_2CN$ | H | Cl | H | O |
| C-11743 | Me(R) | single bond | H | $C(Me)_2CN$ | H | Cl | H | O |
| C-11744 | Me(S) | single bond | H | $C(Me)_2CN$ | H | Cl | H | O |
| C-11745 | H | single bond | Me | $C(Me)_2CN$ | H | Me | H | O |
| C-11746 | Me | single bond | H | $C(Me)_2CN$ | H | Me | H | O |
| C-11747 | Me(R) | single bond | H | $C(Me)_2CN$ | H | Me | H | O |
| C-11748 | Me(S) | single bond | H | $C(Me)_2CN$ | H | Me | H | O |
| C-11749 | H | single bond | Me | C(Me)(i-Pr)CN | H | Cl | H | O |
| C-11750 | Me | single bond | H | C(Me)(i-Pr)CN | H | Cl | H | O |
| C-11751 | Me(R) | single bond | H | C(Me)(i-Pr)CN | H | Cl | H | O |
| C-11752 | Me(S) | single bond | H | C(Me)(i-Pr)CN | H | Cl | H | O |
| C-11753 | H | single bond | Me | C(Me)(i-Pr)CN | H | Me | H | O |
| C-11754 | Me | single bond | H | C(Me)(i-Pr)CN | H | Me | H | O |
| C-11755 | Me(R) | single bond | H | C(Me)(i-Pr)CN | H | Me | H | O |
| C-11756 | Me(S) | single bond | H | C(Me)(i-Pr)CN | H | Me | H | O |
| C-11757 | H | single bond | Me | OMe | H | Cl | H | O |
| C-11758 | Me | single bond | H | OMe | H | Cl | H | O |
| C-11759 | Me(R) | single bond | H | OMe | H | Cl | H | O |
| C-11760 | Me(S) | single bond | H | OMe | H | Cl | H | O |
| C-11761 | H | single bond | Me | OMe | H | Me | H | O |
| C-11762 | Me | single bond | H | OMe | H | Me | H | O |
| C-11763 | Me(R) | single bond | H | OMe | H | Me | H | O |
| C-11764 | Me(S) | single bond | H | OMe | H | Me | H | O |
| C-11765 | H | single bond | Me | CH═NOMe | H | Cl | H | O |
| C-11766 | Me | single bond | H | CH═NOMe | H | Cl | H | O |

TABLE 496

| Compound Number | Y | W | Z | $R^1$ | $R^2$ | $R^3$ | $R^{10}$ | A |
|---|---|---|---|---|---|---|---|---|
| C-11767 | Me(R) | single bond | H | CH═NOMe | H | Cl | H | O |
| C-11768 | Me(S) | single bond | H | CH═NOMe | H | Cl | H | O |
| C-11769 | H | single bond | Me | CH═NOMe | H | Me | H | O |
| C-11770 | Me | single bond | H | CH═NOMe | H | Me | H | O |
| C-11771 | Me(R) | single bond | H | CH═NOMe | H | Me | H | O |
| C-11772 | Me(S) | single bond | H | CH═NOMe | H | Me | H | O |
| C-11773 | H | single bond | Me | morpholin-4-yl | H | Cl | H | O |
| C-11774 | Me | single bond | H | morpholin-4-yl | H | Cl | H | O |
| C-11775 | Me(R) | single bond | H | morpholin-4-yl | H | Cl | H | O |
| C-11776 | Me(S) | single bond | H | morpholin-4-yl | H | Cl | H | O |
| C-11777 | H | single bond | Me | morpholin-4-yl | H | Me | H | O |
| C-11778 | Me | single bond | H | morpholin-4-yl | H | Me | H | O |
| C-11779 | Me(R) | single bond | H | morpholin-4-yl | H | Me | H | O |
| C-11780 | Me(S) | single bond | H | morpholin-4-yl | H | Me | H | O |
| C-11781 | H | single bond | Me | Ph | H | Cl | H | O |
| C-11782 | Me | single bond | H | Ph | H | Cl | H | O |
| C-11783 | Me(R) | single bond | H | Ph | H | Cl | H | O |
| C-11784 | Me(S) | single bond | H | Ph | H | Cl | H | O |
| C-11785 | H | single bond | Me | Ph | H | Me | H | O |
| C-11786 | Me | single bond | H | Ph | H | Me | H | O |
| C-11787 | Me(R) | single bond | H | Ph | H | Me | H | O |
| C-11788 | Me(S) | single bond | H | Ph | H | Me | H | O |
| C-11789 | H | single bond | Me | $CH_2Ph$ | H | Cl | H | O |
| C-11790 | Me | single bond | H | $CH_2Ph$ | H | Cl | H | O |
| C-11791 | Me(R) | single bond | H | $CH_2Ph$ | H | Cl | H | O |
| C-11792 | Me(S) | single bond | H | $CH_2Ph$ | H | Cl | H | O |
| C-11793 | H | single bond | Me | $CH_2Ph$ | H | Me | H | O |
| C-11794 | Me | single bond | H | $CH_2Ph$ | H | Me | H | O |
| C-11795 | Me(R) | single bond | H | $CH_2Ph$ | H | Me | H | O |
| C-11796 | Me(S) | single bond | H | $CH_2Ph$ | H | Me | H | O |
| C-11797 | H | single bond | Me | thiazole-2-yl | H | Cl | H | O |
| C-11798 | Me | single bond | H | thiazole-2-yl | H | Cl | H | O |
| C-11799 | Me(R) | single bond | H | thiazole-2-yl | H | Cl | H | O |
| C-11800 | Me(S) | single bond | H | thiazole-2-yl | H | Cl | H | O |
| C-11801 | H | single bond | Me | thiazole-2-yl | H | Me | H | O |
| C-11802 | Me | single bond | H | thiazole-2-yl | H | Me | H | O |
| C-11803 | Me(R) | single bond | H | thiazole-2-yl | H | Me | H | O |
| C-11804 | Me(S) | single bond | H | thiazole-2-yl | H | Me | H | O |
| C-11805 | H | single bond | Me | 1-Me-pyrazol-3-yl | H | Cl | H | O |
| C-11806 | Me | single bond | H | 1-Me-pyrazol-3-yl | H | Cl | H | O |
| C-11807 | Me(R) | single bond | H | 1-Me-pyrazol-3-yl | H | Cl | H | O |

TABLE 496-continued

| Compound Number | Y | W | Z | $R^1$ | $R^2$ | $R^3$ | $R^{10}$ | A |
|---|---|---|---|---|---|---|---|---|
| C-11808 | Me(S) | single bond | H | 1-Me-pyrazol-3-yl | H | Cl | H | O |
| C-11809 | H | single bond | Me | 1-Me-pyrazol-3-yl | H | Me | H | O |
| C-11810 | Me | single bond | H | 1-Me-pyrazol-3-yl | H | Me | H | O |

TABLE 497

| Compound Number | Y | W | Z | $R^1$ | $R^2$ | $R^3$ | $R^{10}$ | A |
|---|---|---|---|---|---|---|---|---|
| C-11811 | Me(R) | single bond | H | 1-Me-pyrazol-3-yl | H | Me | H | O |
| C-11812 | Me(S) | single bond | H | 1-Me-pyrazol-3-yl | H | Me | H | O |
| C-11813 | H | single bond | Me | 1-Me-pyrazol-5-yl | H | Cl | H | O |
| C-11814 | Me | single bond | H | 1-Me-pyrazol-5-yl | H | Cl | H | O |
| C-11815 | Me(R) | single bond | H | 1-Me-pyrazol-5-yl | H | Cl | H | O |
| C-11816 | Me(S) | single bond | H | 1-Me-pyrazol-5-yl | H | Cl | H | O |
| C-11817 | H | single bond | Me | 1-Me-pyrazol-5-yl | H | Me | H | O |
| C-11818 | Me | single bond | H | 1-Me-pyrazol-5-yl | H | Me | H | O |
| C-11819 | Me(R) | single bond | H | 1-Me-pyrazol-5-yl | H | Me | H | O |
| C-11820 | Me(S) | single bond | H | 1-Me-pyrazol-5-yl | H | Me | H | O |
| C-11821 | H | single bond | Me | $CH_2$(pyrimidin-2-yl) | H | Cl | H | O |
| C-11822 | Me | single bond | H | $CH_2$(pyrimidin-2-yl) | H | Cl | H | O |
| C-11823 | Me(R) | single bond | H | $CH_2$(pyrimidin-2-yl) | H | Cl | H | O |
| C-11824 | Me(S) | single bond | H | $CH_2$(pyrimidin-2-yl) | H | Cl | H | O |
| C-11825 | H | single bond | Me | $CH_2$(pyrimidin-2-yl) | H | Me | H | O |
| C-11826 | Me | single bond | H | $CH_2$(pyrimidin-2-yl) | H | Me | H | O |
| C-11827 | Me(R) | single bond | H | $CH_2$(pyrimidin-2-yl) | H | Me | H | O |
| C-11828 | Me(S) | single bond | H | $CH_2$(pyrimidin-2-yl) | H | Me | H | O |
| C-11829 | H | single bond | Me | $—CH_2CH_2CH_2—$ | | Cl | H | O |
| C-11830 | Me | single bond | H | $—CH_2CH_2CH_2—$ | | Cl | H | O |
| C-11831 | Me(R) | single bond | H | $—CH_2CH_2CH_2—$ | | Cl | H | O |
| C-11832 | Me(S) | single bond | H | $—CH_2CH_2CH_2—$ | | Cl | H | O |
| C-11833 | H | single bond | Me | $—CH_2CH_2CH_2—$ | | Me | H | O |
| C-11834 | Me | single bond | H | $—CH_2CH_2CH_2—$ | | Me | H | O |
| C-11835 | Me(R) | single bond | H | $—CH_2CH_2CH_2—$ | | Me | H | O |
| C-11836 | Me(S) | single bond | H | $—CH_2CH_2CH_2—$ | | Me | H | O |
| C-11837 | H | single bond | Me | $—CH_2CH_2OCH_2CH_2—$ | | Cl | H | O |
| C-11838 | Me | single bond | H | $—CH_2CH_2OCH_2CH_2—$ | | Cl | H | O |
| C-11839 | Me(R) | single bond | H | $—CH_2CH_2OCH_2CH_2—$ | | Cl | H | O |
| C-11840 | Me(S) | single bond | H | $—CH_2CH_2OCH_2CH_2—$ | | Cl | H | O |
| C-11841 | H | single bond | Me | $—CH_2CH_2OCH_2CH_2—$ | | Me | H | O |
| C-11842 | Me | single bond | H | $—CH_2CH_2OCH_2CH_2—$ | | Me | H | O |
| C-11843 | Me(R) | single bond | H | $—CH_2CH_2OCH_2CH_2—$ | | Me | H | O |
| C-11844 | Me(S) | single bond | H | $—CH_2CH_2OCH_2CH_2—$ | | Me | H | O |
| C-11845 | H | single bond | Me | Me | H | Cl | Me | O |
| C-11846 | Me | single bond | H | Me | H | Cl | Me | O |
| C-11847 | Me(R) | single bond | H | Me | H | Cl | Me | O |
| C-11848 | Me(S) | single bond | H | Me | H | Cl | Me | O |
| C-11849 | H | single bond | Me | Me | H | Me | Me | O |
| C-11850 | Me | single bond | H | Me | H | Me | Me | O |
| C-11851 | Me(R) | single bond | H | Me | H | Me | Me | O |
| C-11852 | Me(S) | single bond | H | Me | H | Me | Me | O |
| C-11853 | H | single bond | Me | $CH_2CHF_2$ | H | Cl | Me | O |
| C-11854 | Me | single bond | H | $CH_2CHF_2$ | H | Cl | Me | O |

TABLE 498

| Compound Number | Y | W | Z | $R^1$ | $R^2$ | $R^3$ | $R^{10}$ | A |
|---|---|---|---|---|---|---|---|---|
| C-11855 | Me(R) | single bond | H | $CH_2CHF_2$ | H | Cl | Me | O |
| C-11856 | Me(S) | single bond | H | $CH_2CHF_2$ | H | Cl | Me | O |
| C-11857 | H | single bond | Me | $CH_2CHF_2$ | H | Me | Me | O |
| C-11858 | Me | single bond | H | $CH_2CHF_2$ | H | Me | Me | O |
| C-11859 | Me(R) | single bond | H | $CH_2CHF_2$ | H | Me | Me | O |
| C-11860 | Me(S) | single bond | H | $CH_2CHF_2$ | H | Me | Me | O |
| C-11861 | H | single bond | Me | n-Pr | H | Cl | Me | O |
| C-11862 | Me | single bond | H | n-Pr | H | Cl | Me | O |
| C-11863 | Me(R) | single bond | H | n-Pr | H | Cl | Me | O |
| C-11864 | Me(S) | single bond | H | n-Pr | H | Cl | Me | O |
| C-11865 | H | single bond | Me | n-Pr | H | Me | Me | O |

TABLE 498-continued

| Compound Number | Y | W | Z | $R^1$ | $R^2$ | $R^3$ | $R^{10}$ | A |
|---|---|---|---|---|---|---|---|---|
| C-11866 | Me | single bond | H | n-Pr | H | Me | Me | O |
| C-11867 | Me(R) | single bond | H | n-Pr | H | Me | Me | O |
| C-11868 | Me(S) | single bond | H | n-Pr | H | Me | Me | O |
| C-11869 | H | single bond | Me | i-Pr | H | Cl | Me | O |
| C-11870 | Me | single bond | H | i-Pr | H | Cl | Me | O |
| C-11871 | Me(R) | single bond | H | i-Pr | H | Cl | Me | O |
| C-11872 | Me(S) | single bond | H | i-Pr | H | Cl | Me | O |
| C-11873 | H | single bond | Me | i-Pr | H | Me | Me | O |
| C-11874 | Me | single bond | H | i-Pr | H | Me | Me | O |
| C-11875 | Me(R) | single bond | H | i-Pr | H | Me | Me | O |
| C-11876 | Me(S) | single bond | H | i-Pr | H | Me | Me | O |

TABLE 498-continued

| Compound Number | Y | W | Z | R¹ | R² | R³ | R¹⁰ | A |
|---|---|---|---|---|---|---|---|---|
| C-11877 | H | single bond | Me | c-Pr(1-F) | H | Cl | Me | O |
| C-11878 | Me | single bond | H | c-Pr(1-F) | H | Cl | Me | O |
| C-11879 | Me(R) | single bond | H | c-Pr(1-F) | H | Cl | Me | O |
| C-11880 | Me(S) | single bond | H | c-Pr(1-F) | H | Cl | Me | O |
| C-11881 | H | single bond | Me | c-Pr(1-F) | H | Me | Me | O |
| C-11882 | Me | single bond | H | c-Pr(1-F) | H | Me | Me | O |
| C-11883 | Me(R) | single bond | H | c-Pr(1-F) | H | Me | Me | O |
| C-11884 | Me(S) | single bond | H | c-Pr(1-F) | H | Me | Me | O |
| C-11885 | H | single bond | Me | c-Pr(2,2-$F_2$) | H | Cl | Me | O |
| C-11886 | Me | single bond | H | c-Pr(2,2-$F_2$) | H | Cl | Me | O |
| C-11887 | Me(R) | single bond | H | c-Pr(2,2-$F_2$) | H | Cl | Me | O |
| C-11888 | Me(S) | single bond | H | c-Pr(2,2-$F_2$) | H | Cl | Me | O |
| C-11889 | H | single bond | Me | c-Pr(2,2-$F_2$) | H | Me | Me | O |
| C-11890 | Me | single bond | H | c-Pr(2,2-$F_2$) | H | Me | Me | O |
| C-11891 | Me(R) | single bond | H | c-Pr(2,2-$F_2$) | H | Me | Me | O |
| C-11892 | Me(S) | single bond | H | c-Pr(2,2-$F_2$) | H | Me | Me | O |
| C-11893 | H | single bond | Me | c-Pr(1-Cl) | H | Cl | Me | O |
| C-11894 | Me | single bond | H | c-Pr(1-Cl) | H | Cl | Me | O |
| C-11895 | Me(R) | single bond | H | c-Pr(1-Cl) | H | Cl | Me | O |
| C-11896 | Me(S) | single bond | H | c-Pr(1-Cl) | H | Cl | Me | O |
| C-11897 | H | single bond | Me | c-Pr(1-Cl) | H | Me | Me | O |
| C-11898 | Me | single bond | H | c-Pr(1-Cl) | H | Me | Me | O |

TABLE 499

| Compound Number | Y | W | Z | R¹ | R² | R³ | R¹⁰ | A |
|---|---|---|---|---|---|---|---|---|
| C-11899 | Me(R) | single bond | H | c-Pr(1-Cl) | H | Me | Me | O |
| C-11900 | Me(S) | single bond | H | c-Pr(1-Cl) | H | Me | Me | O |
| C-11901 | H | single bond | Me | c-Pr(1-Br) | H | Cl | Me | O |
| C-11902 | Me | single bond | H | c-Pr(1-Br) | H | Cl | Me | O |
| C-11903 | Me(R) | single bond | H | c-Pr(1-Br) | H | Cl | Me | O |
| C-11904 | Me(S) | single bond | H | c-Pr(1-Br) | H | Cl | Me | O |
| C-11905 | H | single bond | Me | c-Pr(1-Br) | H | Me | Me | O |
| C-11906 | Me | single bond | H | c-Pr(1-Br) | H | Me | Me | O |
| C-11907 | Me(R) | single bond | H | c-Pr(1-Br) | H | Me | Me | O |
| C-11908 | Me(S) | single bond | H | c-Pr(1-Br) | H | Me | Me | O |
| C-11909 | H | single bond | Me | c-Pr(1-Me) | H | Cl | Me | O |
| C-11910 | Me | single bond | H | c-Pr(1-Me) | H | Cl | Me | O |
| C-11911 | Me(R) | single bond | H | c-Pr(1-Me) | H | Cl | Me | O |
| C-11912 | Me(S) | single bond | H | c-Pr(1-Me) | H | Cl | Me | O |
| C-11913 | H | single bond | Me | c-Pr(1-Me) | H | Me | Me | O |
| C-11914 | Me | single bond | H | c-Pr(1-Me) | H | Me | Me | O |
| C-11915 | Me(R) | single bond | H | c-Pr(1-Me) | H | Me | Me | O |
| C-11916 | Me(S) | single bond | H | c-Pr(1-Me) | H | Me | Me | O |
| C-11917 | H | single bond | Me | c-Pr(1-$CH_2OH$) | H | Cl | Me | O |
| C-11918 | Me | single bond | H | c-Pr(1-$CH_2OH$) | H | Cl | Me | O |
| C-11919 | Me(R) | single bond | H | c-Pr(1-$CH_2OH$) | H | Cl | Me | O |
| C-11920 | Me(S) | single bond | H | c-Pr(1-$CH_2OH$) | H | Cl | Me | O |
| C-11921 | H | single bond | Me | c-Pr(1-$CH_2OH$) | H | Me | Me | O |
| C-11922 | Me | single bond | H | c-Pr(1-$CH_2OH$) | H | Me | Me | O |
| C-11923 | Me(R) | single bond | H | c-Pr(1-$CH_2OH$) | H | Me | Me | O |
| C-11924 | Me(S) | single bond | H | c-Pr(1-$CH_2OH$) | H | Me | Me | O |
| C-11925 | H | single bond | Me | c-Pr[1-$CH_2OS(=O)_2Me$] | H | Cl | Me | O |
| C-11926 | Me | single bond | H | c-Pr[1-$CH_2OS(=O)_2Me$] | H | Cl | Me | O |
| C-11927 | Me(R) | single bond | H | c-Pr[1-$CH_2OS(=O)_2Me$] | H | Cl | Me | O |
| C-11928 | Me(S) | single bond | H | c-Pr[1-$CH_2OS(=O)_2Me$] | H | Cl | Me | O |
| C-11929 | H | single bond | Me | c-Pr[1-$CH_2OS(=O)_2Me$] | H | Me | Me | O |
| C-11930 | Me | single bond | H | c-Pr[1-$CH_2OS(=O)_2Me$] | H | Me | Me | O |
| C-11931 | Me(R) | single bond | H | c-Pr[1-$CH_2OS(=O)_2Me$] | H | Me | Me | O |
| C-11932 | Me(S) | single bond | H | c-Pr[1-$CH_2OS(=O)_2Me$] | H | Me | Me | O |
| C-11933 | H | single bond | Me | c-Pr(1-$CH_2OMe$) | H | Cl | Me | O |
| C-11934 | Me | single bond | H | c-Pr(1-$CH_2OMe$) | H | Cl | Me | O |
| C-11935 | Me(R) | single bond | H | c-Pr(1-$CH_2OMe$) | H | Cl | Me | O |
| C-11936 | Me(S) | single bond | H | c-Pr(1-$CH_2OMe$) | H | Cl | Me | O |
| C-11937 | H | single bond | Me | c-Pr(1-$CH_2OMe$) | H | Me | Me | O |
| C-11938 | Me | single bond | H | c-Pr(1-$CH_2OMe$) | H | Me | Me | O |
| C-11939 | Me(R) | single bond | H | c-Pr(1-$CH_2OMe$) | H | Me | Me | O |
| C-11940 | Me(S) | single bond | H | c-Pr(1-$CH_2OMe$) | H | Me | Me | O |
| C-11941 | H | single bond | Me | c-Pr(1-$CH_2CN$) | H | Cl | Me | O |
| C-11942 | Me | single bond | H | c-Pr(1-$CH_2CN$) | H | Cl | Me | O |

TABLE 500

| Compound Number | Y | W | Z | R¹ | R² | R³ | R¹⁰ | A |
|---|---|---|---|---|---|---|---|---|
| C-11943 | Me(R) | single bond | H | c-Pr(1-$CH_2CN$) | H | Cl | Me | O |
| C-11944 | Me(S) | single bond | H | c-Pr(1-$CH_2CN$) | H | Cl | Me | O |
| C-11945 | H | single bond | Me | c-Pr(1-$CH_2CN$) | H | Me | Me | O |

TABLE 500-continued

| Compound Number | Y | W | Z | $R^1$ | $R^2$ | $R^3$ | $R^{10}$ | A |
|---|---|---|---|---|---|---|---|---|
| C-11946 | Me | single bond | H | c-Pr(1-$CH_2$CN) | H | Me | Me | O |
| C-11947 | Me(R) | single bond | H | c-Pr(1-$CH_2$CN) | H | Me | Me | O |
| C-11948 | Me(S) | single bond | H | c-Pr(1-$CH_2$CN) | H | Me | Me | O |
| C-11949 | H | single bond | Me | c-Pr(1-$CH_2$SMe) | H | Cl | Me | O |
| C-11950 | Me | single bond | H | c-Pr(1-$CH_2$SMe) | H | Cl | Me | O |
| C-11951 | Me(R) | single bond | H | c-Pr(1-$CH_2$SMe) | H | Cl | Me | O |
| C-11952 | Me(S) | single bond | H | c-Pr(1-$CH_2$SMe) | H | Cl | Me | O |
| C-11953 | H | single bond | Me | c-Pr(1-$CH_2$SMe) | H | Me | Me | O |
| C-11954 | Me | single bond | H | c-Pr(1-$CH_2$SMe) | H | Me | Me | O |
| C-11955 | Me(R) | single bond | H | c-Pr(1-$CH_2$SMe) | H | Me | Me | O |
| C-11956 | Me(S) | single bond | H | c-Pr(1-$CH_2$SMe) | H | Me | Me | O |
| C-11957 | H | single bond | Me | c-Pr[1-$CH_2$S(═O)Me] | H | Cl | Me | O |
| C-11958 | Me | single bond | H | c-Pr[1-$CH_2$S(═O)Me] | H | Cl | Me | O |
| C-11959 | Me(R) | single bond | H | c-Pr[1-$CH_2$S(═O)Me] | H | Cl | Me | O |
| C-11960 | Me(S) | single bond | H | c-Pr[1-$CH_2$S(═O)Me] | H | Cl | Me | O |
| C-11961 | H | single bond | Me | c-Pr[1-$CH_2$S(═O)Me] | H | Me | Me | O |
| C-11962 | Me | single bond | H | c-Pr[1-$CH_2$S(═O)Me] | H | Me | Me | O |
| C-11963 | Me(R) | single bond | H | c-Pr[1-$CH_2$S(═O)Me] | H | Me | Me | O |
| C-11964 | Me(S) | single bond | H | c-Pr[1-$CH_2$S(═O)Me] | H | Me | Me | O |
| C-11965 | H | single bond | Me | c-Pr[1-$CH_2$S(═O)$_2$Me] | H | Cl | Me | O |
| C-11966 | Me | single bond | H | c-Pr[1-$CH_2$S(═O)$_2$Me] | H | Cl | Me | O |
| C-11967 | Me(R) | single bond | H | c-Pr[1-$CH_2$S(═O)$_2$Me] | H | Cl | Me | O |
| C-11968 | Me(S) | single bond | H | c-Pr[1-$CH_2$S(═O)$_2$Me] | H | Cl | Me | O |
| C-11969 | H | single bond | Me | c-Pr[1-$CH_2$S(═O)$_2$Me] | H | Me | Me | O |
| C-11970 | Me | single bond | H | c-Pr[1-$CH_2$S(═O)$_2$Me] | H | Me | Me | O |
| C-11971 | Me(R) | single bond | H | c-Pr[1-$CH_2$S(═O)$_2$Me] | H | Me | Me | O |
| C-11972 | Me(S) | single bond | H | c-Pr[1-$CH_2$S(═O)$_2$Me] | H | Me | Me | O |
| C-11973 | H | single bond | Me | c-Pr(1-$CH_2$F) | H | Cl | Me | O |
| C-11974 | Me | single bond | H | c-Pr(1-$CH_2$F) | H | Cl | Me | O |
| C-11975 | Me(R) | single bond | H | c-Pr(1-$CH_2$F) | H | Cl | Me | O |
| C-11976 | Me(S) | single bond | H | c-Pr(1-$CH_2$F) | H | Cl | Me | O |
| C-11977 | H | single bond | Me | c-Pr(1-$CH_2$F) | H | Me | Me | O |
| C-11978 | Me | single bond | H | c-Pr(1-$CH_2$F) | H | Me | Me | O |
| C-11979 | Me(R) | single bond | H | c-Pr(1-$CH_2$F) | H | Me | Me | O |
| C-11980 | Me(S) | single bond | H | c-Pr(1-$CH_2$F) | H | Me | Me | O |
| C-11981 | H | single bond | Me | c-Pr(1-$CHF_2$) | H | Cl | Me | O |
| C-11982 | Me | single bond | H | c-Pr(1-$CHF_2$) | H | Cl | Me | O |
| C-11983 | Me(R) | single bond | H | c-Pr(1-$CHF_2$) | H | Cl | Me | O |
| C-11984 | Me(S) | single bond | H | c-Pr(1-$CHF_2$) | H | Cl | Me | O |
| C-11985 | H | single bond | Me | c-Pr(1-$CHF_2$) | H | Me | Me | O |
| C-11986 | Me | single bond | H | c-Pr(1-$CHF_2$) | H | Me | Me | O |

TABLE 501

| Compound Number | Y | W | Z | $R^1$ | $R^2$ | $R^3$ | $R^{10}$ | A |
|---|---|---|---|---|---|---|---|---|
| C-11987 | Me(R) | single bond | H | c-Pr(1-$CHF_2$) | H | Me | Me | O |
| C-11988 | Me(S) | single bond | H | c-Pr(1-$CHF_2$) | H | Me | Me | O |
| C-11989 | H | single bond | Me | c-Pr(1-$CF_3$) | H | Cl | Me | O |
| C-11990 | Me | single bond | H | c-Pr(1-$CF_3$) | H | Cl | Me | O |
| C-11991 | Me(R) | single bond | H | c-Pr(1-$CF_3$) | H | Cl | Me | O |
| C-11992 | Me(S) | single bond | H | c-Pr(1-$CF_3$) | H | Cl | Me | O |
| C-11993 | H | single bond | Me | c-Pr(1-$CF_3$) | H | Me | Me | O |
| C-11994 | Me | single bond | H | c-Pr(1-$CF_3$) | H | Me | Me | O |
| C-11995 | Me(R) | single bond | H | c-Pr(1-$CF_3$) | H | Me | Me | O |
| C-11996 | Me(S) | single bond | H | c-Pr(1-$CF_3$) | H | Me | Me | O |
| C-11997 | H | single bond | Me | c-Pr(1-C≡CH) | H | Cl | Me | O |
| C-11998 | Me | single bond | H | c-Pr(1-C≡CH) | H | Cl | Me | O |
| C-11999 | Me(R) | single bond | H | c-Pr(1-C≡CH) | H | Cl | Me | O |
| C-12000 | Me(S) | single bond | H | c-Pr(1-C≡CH) | H | Cl | Me | O |
| C-12001 | H | single bond | Me | c-Pr(1-C≡CH) | H | Me | Me | O |
| C-12002 | Me | single bond | H | c-Pr(1-C≡CH) | H | Me | Me | O |
| C-12003 | Me(R) | single bond | H | c-Pr(1-C≡CH) | H | Me | Me | O |
| C-12004 | Me(S) | single bond | H | c-Pr(1-C≡CH) | H | Me | Me | O |
| C-12005 | H | single bond | Me | c-Pr[1-C(═O)OEt] | H | Cl | Me | O |
| C-12006 | Me | single bond | H | c-Pr[1-C(═O)OEt] | H | Cl | Me | O |
| C-12007 | Me(R) | single bond | H | c-Pr[1-C(═O)OEt] | H | Cl | Me | O |
| C-12008 | Me(S) | single bond | H | c-Pr[1-C(═O)OEt] | H | Cl | Me | O |
| C-12009 | H | single bond | Me | c-Pr[1-C(═O)OEt] | H | Me | Me | O |
| C-12010 | Me | single bond | H | c-Pr[1-C(═O)OEt] | H | Me | Me | O |
| C-12011 | Me(R) | single bond | H | c-Pr[1-C(═O)OEt] | H | Me | Me | O |
| C-12012 | Me(S) | single bond | H | c-Pr[1-C(═O)OEt] | H | Me | Me | O |

TABLE 501-continued

| Compound Number | Y | W | Z | $R^1$ | $R^2$ | $R^3$ | $R^{10}$ | A |
|---|---|---|---|---|---|---|---|---|
| C-12013 | H | single bond | Me | c-Pr[1-C(=O)OH] | H | Cl | Me | O |
| C-12014 | Me | single bond | H | c-Pr[1-C(=O)OH] | H | Cl | Me | O |
| C-12015 | Me(R) | single bond | H | c-Pr[1-C(=O)OH] | H | Cl | Me | O |
| C-12016 | Me(S) | single bond | H | c-Pr[1-C(=O)OH] | H | Cl | Me | O |
| C-12017 | H | single bond | Me | c-Pr[1-C(=O)OH] | H | Me | Me | O |
| C-12018 | Me | single bond | H | c-Pr[1-C(=O)OH] | H | Me | Me | O |
| C-12019 | Me(R) | single bond | H | c-Pr[1-C(=O)OH] | H | Me | Me | O |
| C-12020 | Me(S) | single bond | H | c-Pr[1-C(=O)OH] | H | Me | Me | O |
| C-12021 | H | single bond | Me | c-Pr[1-C(=O)$NH_2$] | H | Cl | Me | O |
| C-12022 | Me | single bond | H | c-Pr[1-C(=O)$NH_2$] | H | Cl | Me | O |
| C-12023 | Me(R) | single bond | H | c-Pr[1-C(=O)$NH_2$] | H | Cl | Me | O |
| C-12024 | Me(S) | single bond | H | c-Pr[1-C(=O)$NH_2$] | H | Cl | Me | O |
| C-12025 | H | single bond | Me | c-Pr[1-C(=O)$NH_2$] | H | Me | Me | O |
| C-12026 | Me | single bond | H | c-Pr[1-C(=O)$NH_2$] | H | Me | Me | O |
| C-12027 | Me(R) | single bond | H | c-Pr[1-C(=O)$NH_2$] | H | Me | Me | O |
| C-12028 | Me(S) | single bond | H | c-Pr[1-C(=O)$NH_2$] | H | Me | Me | O |
| C-12029 | H | single bond | Me | c-Pr(1-OMe) | H | Cl | Me | O |
| C-12030 | Me | single bond | H | c-Pr(1-OMe) | H | Cl | Me | O |

TABLE 502

| Compound Number | Y | W | Z | $R^1$ | $R^2$ | $R^3$ | $R^{10}$ | A |
|---|---|---|---|---|---|---|---|---|
| C-12031 | Me(R) | single bond | H | c-Pr(1-OMe) | H | Cl | Me | O |
| C-12032 | Me(S) | single bond | H | c-Pr(1-OMe) | H | Cl | Me | O |
| C-12033 | H | single bond | Me | c-Pr(1-OMe) | H | Me | Me | O |
| C-12034 | Me | single bond | H | c-Pr(1-OMe) | H | Me | Me | O |
| C-12035 | Me(R) | single bond | H | c-Pr(1-OMe) | H | Me | Me | O |
| C-12036 | Me(S) | single bond | H | c-Pr(1-OMe) | H | Me | Me | O |
| C-12037 | H | single bond | Me | c-Pr(1-SMe) | H | Cl | Me | O |
| C-12038 | Me | single bond | H | c-Pr(1-SMe) | H | Cl | Me | O |
| C-12039 | Me(R) | single bond | H | c-Pr(1-SMe) | H | Cl | Me | O |
| C-12040 | Me(S) | single bond | H | c-Pr(1-SMe) | H | Cl | Me | O |
| C-12041 | H | single bond | Me | c-Pr(1-SMe) | H | Me | Me | O |
| C-12042 | Me | single bond | H | c-Pr(1-SMe) | H | Me | Me | O |
| C-12043 | Me(R) | single bond | H | c-Pr(1-SMe) | H | Me | Me | O |
| C-12044 | Me(S) | single bond | H | c-Pr(1-SMe) | H | Me | Me | O |
| C-12045 | H | single bond | Me | c-Pr[1-S(=O)Me] | H | Cl | Me | O |
| C-12046 | Me | single bond | H | c-Pr[1-S(=O)Me] | H | Cl | Me | O |
| C-12047 | Me(R) | single bond | H | c-Pr[1-S(=O)Me] | H | Cl | Me | O |
| C-12048 | Me(S) | single bond | H | c-Pr[1-S(=O)Me] | H | Cl | Me | O |
| C-12049 | H | single bond | Me | c-Pr[1-S(=O)Me] | H | Me | Me | O |
| C-12050 | Me | single bond | H | c-Pr[1-S(=O)Me] | H | Me | Me | O |
| C-12051 | Me(R) | single bond | H | c-Pr[1-S(=O)Me] | H | Me | Me | O |
| C-12052 | Me(S) | single bond | H | c-Pr[1-S(=O)Me] | H | Me | Me | O |
| C-12053 | H | single bond | Me | c-Pr[1-S(=O)$_2$Me] | H | Cl | Me | O |
| C-12054 | Me | single bond | H | c-Pr[1-S(=O)$_2$Me] | H | Cl | Me | O |
| C-12055 | Me(R) | single bond | H | c-Pr[1-S(=O)$_2$Me] | H | Cl | Me | O |
| C-12056 | Me(S) | single bond | H | c-Pr[1-S(=O)$_2$Me] | H | Cl | Me | O |
| C-12057 | H | single bond | Me | c-Pr[1-S(=O)$_2$Me] | H | Me | Me | O |
| C-12058 | Me | single bond | H | c-Pr[1-S(=O)$_2$Me] | H | Me | Me | O |
| C-12059 | Me(R) | single bond | H | c-Pr[1-S(=O)$_2$Me] | H | Me | Me | O |
| C-12060 | Me(S) | single bond | H | c-Pr[1-S(=O)$_2$Me] | H | Me | Me | O |
| C-12061 | H | single bond | Me | c-Pr[1-S(=O)$_2$$CHF_2$] | H | Cl | Me | O |
| C-12062 | Me | single bond | H | c-Pr[1-S(=O)$_2$$CHF_2$] | H | Cl | Me | O |
| C-12063 | Me(R) | single bond | H | c-Pr[1-S(=O)$_2$$CHF_2$] | H | Cl | Me | O |
| C-12064 | Me(S) | single bond | H | c-Pr[1-S(=O)$_2$$CHF_2$] | H | Cl | Me | O |
| C-12065 | H | single bond | Me | c-Pr[1-S(=O)$_2$$CHF_2$] | H | Me | Me | O |
| C-12066 | Me | single bond | H | c-Pr[1-S(=O)$_2$$CHF_2$] | H | Me | Me | O |
| C-12067 | Me(R) | single bond | H | c-Pr[1-S(=O)$_2$$CHF_2$] | H | Me | Me | O |
| C-12068 | Me(S) | single bond | H | c-Pr[1-S(=O)$_2$$CHF_2$] | H | Me | Me | O |
| C-12069 | H | single bond | Me | c-Pr[1-S(=O)$_2$$CF_3$] | H | Cl | Me | O |
| C-12070 | Me | single bond | H | c-Pr[1-S(=O)$_2$$CF_3$] | H | Cl | Me | O |
| C-12071 | Me(R) | single bond | H | c-Pr[1-S(=O)$_2$$CF_3$] | H | Cl | Me | O |
| C-12072 | Me(S) | single bond | H | c-Pr[1-S(=O)$_2$$CF_3$] | H | Cl | Me | O |
| C-12073 | H | single bond | Me | c-Pr[1-S(=O)$_2$$CF_3$] | H | Me | Me | O |
| C-12074 | Me | single bond | H | c-Pr[1-S(=O)$_2$$CF_3$] | H | Me | Me | O |

TABLE 503

| Compound Number | Y | W | Z | $R^1$ | $R^2$ | $R^3$ | $R^{10}$ | A |
|---|---|---|---|---|---|---|---|---|
| C-12075 | Me(R) | single bond | H | c-Pr[1-S(=O)$_2$CF$_3$] | H | Me | Me | O |
| C-12076 | Me(S) | single bond | H | c-Pr[1-S(=O)$_2$CF$_3$] | H | Me | Me | O |
| C-12077 | H | single bond | Me | c-Pr[1-(5,6-dihydro-1,4,2-dioxazin-3-yl)] | H | Cl | Me | O |
| C-12078 | Me | single bond | H | c-Pr[1-(5,6-dihydro-1,4,2-dioxazin-3-yl)] | H | Cl | Me | O |
| C-12079 | Me(R) | single bond | H | c-Pr[1-(5,6-dihydro-1,4,2-dioxazin-3-yl)] | H | Cl | Me | O |
| C-12080 | Me(S) | single bond | H | c-Pr[1-(5,6-dihydro-1,4,2-dioxazin-3-yl)] | H | Cl | Me | O |
| C-12081 | H | single bond | Me | c-Pr[1-(5,6-dihydro-1,4,2-dioxazin-3-yl)] | H | Me | Me | O |
| C-12082 | Me | single bond | H | c-Pr[1-(5,6-dihydro-1,4,2-dioxazin-3-yl)] | H | Me | Me | O |
| C-12083 | Me(R) | single bond | H | c-Pr[1-(5,6-dihydro-1,4,2-dioxazin-3-yl)] | H | Me | Me | O |
| C-12084 | Me(S) | single bond | H | c-Pr[1-(5,6-dihydro-1,4,2-dioxazin-3-yl)] | H | Me | Me | O |
| C-12085 | H | single bond | Me | c-Pr[1-(5-hydroxy-1,3,4-oxadiazol-2-yl)] | H | Cl | Me | O |
| C-12086 | Me | single bond | H | c-Pr[1-(5-hydroxy-1,3,4-oxadiazol-2-yl)] | H | Cl | Me | O |
| C-12087 | Me(R) | single bond | H | c-Pr[1-(5-hydroxy-1,3,4-oxadiazol-2-yl)] | H | Cl | Me | O |
| C-12088 | Me(S) | single bond | H | c-Pr[1-(5-hydroxy-1,3,4-oxadiazol-2-yl)] | H | Cl | Me | O |
| C-12089 | H | single bond | Me | c-Pr[1-(5-hydroxy-1,3,4-oxadiazol-2-yl)] | H | Me | Me | O |
| C-12090 | Me | single bond | H | c-Pr[1-(5-hydroxy-1,3,4-oxadiazol-2-yl)] | H | Me | Me | O |
| C-12091 | Me(R) | single bond | H | c-Pr[1-(5-hydroxy-1,3,4-oxadiazol-2-yl)] | H | Me | Me | O |
| C-12092 | Me(S) | single bond | H | c-Pr[1-(5-hydroxy-1,3,4-oxadiazol-2-yl)] | H | Me | Me | O |
| C-12093 | H | single bond | Me | c-Pr[1-(pyrimidin-2-yl)] | H | Cl | Me | O |
| C-12094 | Me | single bond | H | c-Pr[1-(pyrimidin-2-yl)] | H | Cl | Me | O |
| C-12095 | Me(R) | single bond | H | c-Pr[1-(pyrimidin-2-yl)] | H | Cl | Me | O |
| C-12096 | Me(S) | single bond | H | c-Pr[1-(pyrimidin-2-yl)] | H | Cl | Me | O |
| C-12097 | H | single bond | Me | c-Pr[1-(pyrimidin-2-yl)] | H | Me | Me | O |
| C-12098 | Me | single bond | H | c-Pr[1-(pyrimidin-2-yl)] | H | Me | Me | O |
| C-12099 | Me(R) | single bond | H | c-Pr[1-(pyrimidin-2-yl)] | H | Me | Me | O |
| C-12100 | Me(S) | single bond | H | c-Pr[1-(pyrimidin-2-yl)] | H | Me | Me | O |
| C-12101 | H | single bond | Me | t-Bu | H | Cl | Me | O |
| C-12102 | Me | single bond | H | t-Bu | H | Cl | Me | O |
| C-12103 | Me(R) | single bond | H | t-Bu | H | Cl | Me | O |
| C-12104 | Me(S) | single bond | H | t-Bu | H | Cl | Me | O |
| C-12105 | H | single bond | Me | t-Bu | H | Me | Me | O |
| C-12106 | Me | single bond | H | t-Bu | H | Me | Me | O |
| C-12107 | Me(R) | single bond | H | t-Bu | H | Me | Me | O |
| C-12108 | Me(S) | single bond | H | t-Bu | H | Me | Me | O |
| C-12109 | H | single bond | Me | c-Bu | H | Cl | Me | O |
| C-12110 | Me | single bond | H | c-Bu | H | Cl | Me | O |
| C-12111 | Me(R) | single bond | H | c-Bu | H | Cl | Me | O |
| C-12112 | Me(S) | single bond | H | c-Bu | H | Cl | Me | O |
| C-12113 | H | single bond | Me | c-Bu | H | Me | Me | O |
| C-12114 | Me | single bond | H | c-Bu | H | Me | Me | O |
| C-12115 | Me(R) | single bond | H | c-Bu | H | Me | Me | O |
| C-12116 | Me(S) | single bond | H | c-Bu | H | Me | Me | O |
| C-12117 | H | single bond | Me | c-Bu(1-CN) | H | Cl | Me | O |
| C-12118 | Me | single bond | H | c-Bu(1-CN) | H | Cl | Me | O |

TABLE 504

| Compound Number | Y | W | Z | $R^1$ | $R^2$ | $R^3$ | $R^{10}$ | A |
|---|---|---|---|---|---|---|---|---|
| C-12119 | Me(R) | single bond | H | c-Bu(1-CN) | H | Cl | Me | O |
| C-12120 | Me(S) | single bond | H | c-Bu(1-CN) | H | Cl | Me | O |
| C-12121 | H | single bond | Me | c-Bu(1-CN) | H | Me | Me | O |
| C-12122 | Me | single bond | H | c-Bu(1-CN) | H | Me | Me | O |
| C-12123 | Me(R) | single bond | H | c-Bu(1-CN) | H | Me | Me | O |
| C-12124 | Me(S) | single bond | H | c-Bu(1-CN) | H | Me | Me | O |
| C-12125 | H | single bond | Me | c-Bu(3,3-F)$_2$ | H | Cl | Me | O |
| C-12126 | Me | single bond | H | c-Bu(3,3-F)$_2$ | H | Cl | Me | O |
| C-12127 | Me(R) | single bond | H | c-Bu(3,3-F)$_2$ | H | Cl | Me | O |
| C-12128 | Me(S) | single bond | H | c-Bu(3,3-F)$_2$ | H | Cl | Me | O |
| C-12129 | H | single bond | Me | c-Bu(3,3-F)$_2$ | H | Me | Me | O |
| C-12130 | Me | single bond | H | c-Bu(3,3-F)$_2$ | H | Me | Me | O |
| C-12131 | Me(R) | single bond | H | c-Bu(3,3-F)$_2$ | H | Me | Me | O |
| C-12132 | Me(S) | single bond | H | c-Bu(3,3-F)$_2$ | H | Me | Me | O |
| C-12133 | H | single bond | Me | oxetan-3-yl | H | Cl | Me | O |
| C-12134 | Me | single bond | H | oxetan-3-yl | H | Cl | Me | O |
| C-12135 | Me(R) | single bond | H | oxetan-3-yl | H | Cl | Me | O |
| C-12136 | Me(S) | single bond | H | oxetan-3-yl | H | Cl | Me | O |
| C-12137 | H | single bond | Me | oxetan-3-yl | H | Me | Me | O |
| C-12138 | Me | single bond | H | oxetan-3-yl | H | Me | Me | O |
| C-12139 | Me(R) | single bond | H | oxetan-3-yl | H | Me | Me | O |
| C-12140 | Me(S) | single bond | H | oxetan-3-yl | H | Me | Me | O |
| C-12141 | H | single bond | Me | oxetan(3-CN)-3-yl | H | Cl | Me | O |

TABLE 504-continued

| Compound Number | Y | W | Z | $R^1$ | $R^2$ | $R^3$ | $R^{10}$ | A |
|---|---|---|---|---|---|---|---|---|
| C-12142 | Me | single bond | H | oxetan(3-CN)-3-yl | H | Cl | Me | O |
| C-12143 | Me(R) | single bond | H | oxetan(3-CN)-3-yl | H | Cl | Me | O |
| C-12144 | Me(S) | single bond | H | oxetan(3-CN)-3-yl | H | Cl | Me | O |
| C-12145 | H | single bond | Me | oxetan(3-CN)-3-yl | H | Me | Me | O |
| C-12146 | Me | single bond | H | oxetan(3-CN)-3-yl | H | Me | Me | O |
| C-12147 | Me(R) | single bond | H | oxetan(3-CN)-3-yl | H | Me | Me | O |
| C-12148 | Me(S) | single bond | H | oxetan(3-CN)-3-yl | H | Me | Me | O |
| C-12149 | H | single bond | Me | azetidin[1-C(═O)Me]-3-yl | H | Cl | Me | O |
| C-12150 | Me | single bond | H | azetidin[1-C(═O)Me]-3-yl | H | Cl | Me | O |
| C-12151 | Me(R) | single bond | H | azetidin[1-C(═O)Me]-3-yl | H | Cl | Me | O |
| C-12152 | Me(S) | single bond | H | azetidin[1-C(═O)Me]-3-yl | H | Cl | Me | O |
| C-12153 | H | single bond | Me | azetidin[1-C(═O)Me]-3-yl | H | Me | Me | O |
| C-12154 | Me | single bond | H | azetidin[1-C(═O)Me]-3-yl | H | Me | Me | O |
| C-12155 | Me(R) | single bond | H | azetidin[1-C(═O)Me]-3-yl | H | Me | Me | O |
| C-12156 | Me(S) | single bond | H | azetidin[1-C(═O)Me]-3-yl | H | Me | Me | O |
| C-12157 | H | single bond | Me | azetidin[1-S(═O)$_2$Me]-3-yl | H | Cl | Me | O |
| C-12158 | Me | single bond | H | azetidin[1-S(═O)$_2$Me]-3-yl | H | Cl | Me | O |
| C-12159 | Me(R) | single bond | H | azetidin[1-S(═O)$_2$Me]-3-yl | H | Cl | Me | O |
| C-12160 | Me(S) | single bond | H | azetidin[1-S(═O)$_2$Me]-3-yl | H | Cl | Me | O |
| C-12161 | H | single bond | Me | azetidin[1-S(═O)$_2$Me]-3-yl | H | Me | Me | O |
| C-12162 | Me | single bond | H | azetidin[1-S(═O)$_2$Me]-3-yl | H | Me | Me | O |

TABLE 505

| Compound Number | Y | W | Z | $R^1$ | $R^2$ | $R^3$ | $R^{10}$ | A |
|---|---|---|---|---|---|---|---|---|
| C-12163 | Me(R) | single bond | H | azetidin[1-S(═O)$_2$Me]-3-yl | H | Me | Me | O |
| C-12164 | Me(S) | single bond | H | azetidin[1-S(═O)$_2$Me]-3-yl | H | Me | Me | O |
| C-12165 | H | single bond | Me | azetidin[1-S(═O)$_2$CHF$_2$]-3-yl | H | Cl | Me | O |
| C-12166 | Me | single bond | H | azetidin[1-S(═O)$_2$CHF$_2$]-3-yl | H | Cl | Me | O |
| C-12167 | Me(R) | single bond | H | azetidin[1-S(═O)$_2$CHF$_2$]-3-yl | H | Cl | Me | O |
| C-12168 | Me(S) | single bond | H | azetidin[1-S(═O)$_2$CHF$_2$]-3-yl | H | Cl | Me | O |
| C-12169 | H | single bond | Me | azetidin[1-S(═O)$_2$CHF$_2$]-3-yl | H | Me | Me | O |
| C-12170 | Me | single bond | H | azetidin[1-S(═O)$_2$CHF$_2$]-3-yl | H | Me | Me | O |
| C-12171 | Me(R) | single bond | H | azetidin[1-S(═O)$_2$CHF$_2$]-3-yl | H | Me | Me | O |
| C-12172 | Me(S) | single bond | H | azetidin[1-S(═O)$_2$CHF$_2$]-3-yl | H | Me | Me | O |
| C-12173 | H | single bond | Me | -Pen | H | Cl | Me | O |
| C-12174 | Me | single bond | H | c-Pen | H | Cl | Me | O |
| C-12175 | Me(R) | single bond | H | c-Pen | H | Cl | Me | O |
| C-12176 | Me(S) | single bond | H | c-Pen | H | Cl | Me | O |
| C-12177 | H | single bond | Me | c-Pen | H | Me | Me | O |
| C-12178 | Me | single bond | H | c-Pen | H | Me | Me | O |
| C-12179 | Me(R) | single bond | H | c-Pen | H | Me | Me | O |
| C-12180 | Me(S) | single bond | H | c-Pen | H | Me | Me | O |
| C-12181 | H | single bond | Me | tetrahydrofuran-3-yl | H | Cl | Me | O |
| C-12182 | Me | single bond | H | tetrahydrofuran-3-yl | H | Cl | Me | O |
| C-12183 | Me(R) | single bond | H | tetrahydrofuran-3-yl | H | Cl | Me | O |
| C-12184 | Me(S) | single bond | H | tetrahydrofuran-3-yl | H | Cl | Me | O |
| C-12185 | H | single bond | Me | tetrahydrofuran-3-yl | H | Me | Me | O |
| C-12186 | Me | single bond | H | tetrahydrofuran-3-yl | H | Me | Me | O |
| C-12187 | Me(R) | single bond | H | tetrahydrofuran-3-yl | H | Me | Me | O |
| C-12188 | Me(S) | single bond | H | tetrahydrofuran-3-yl | H | Me | Me | O |
| C-12189 | H | single bond | Me | tetrahydrothiophen-3-yl | H | Cl | Me | O |
| C-12190 | Me | single bond | H | tetrahydrothiophen-3-yl | H | Cl | Me | O |
| C-12191 | Me(R) | single bond | H | tetrahydrothiophen-3-yl | H | Cl | Me | O |
| C-12192 | Me(S) | single bond | H | tetrahydrothiophen-3-yl | H | Cl | Me | O |
| C-12193 | H | single bond | Me | tetrahydrothiophen-3-yl | H | Me | Me | O |
| C-12194 | Me | single bond | H | tetrahydrothiophen-3-yl | H | Me | Me | O |
| C-12195 | Me(R) | single bond | H | tetrahydrothiophen-3-yl | H | Me | Me | O |
| C-12196 | Me(S) | single bond | H | tetrahydrothiophen-3-yl | H | Me | Me | O |
| C-12197 | H | single bond | Me | c-Pen(1-CN) | H | Cl | Me | O |
| C-12198 | Me | single bond | H | c-Pen(1-CN) | H | Cl | Me | O |
| C-12199 | Me(R) | single bond | H | c-Pen(1-CN) | H | Cl | Me | O |
| C-12200 | Me(S) | single bond | H | c-Pen(1-CN) | H | Cl | Me | O |
| C-12201 | H | single bond | Me | c-Pen(1-CN) | H | Me | Me | O |
| C-12202 | Me | single bond | H | c-Pen(1-CN) | H | Me | Me | O |
| C-12203 | Me(R) | single bond | H | c-Pen(1-CN) | H | Me | Me | O |
| C-12204 | Me(S) | single bond | H | c-Pen(1-CN) | H | Me | Me | O |
| C-12205 | H | single bond | Me | tetrahydrofuran(3-CN)-3-yl | H | Cl | Me | O |
| C-12206 | Me | single bond | H | tetrahydrofuran(3-CN)-3-yl | H | Cl | Me | O |

TABLE 506

| Compound Number | Y | W | Z | $R^1$ | $R^2$ | $R^3$ | $R^{10}$ | A |
|---|---|---|---|---|---|---|---|---|
| C-12207 | Me(R) | single bond | H | tetrahydrofuran(3-CN)-3-yl | H | Cl | Me | O |
| C-12208 | Me(S) | single bond | H | tetrahydrofuran(3-CN)-3-yl | H | Cl | Me | O |
| C-12209 | H | single bond | Me | tetrahydrofuran(3-CN)-3-yl | H | Me | Me | O |
| C-12210 | Me | single bond | H | tetrahydrofuran(3-CN)-3-yl | H | Me | Me | O |
| C-12211 | Me(R) | single bond | H | tetrahydrofuran(3-CN)-3-yl | H | Me | Me | O |
| C-12212 | Me(S) | single bond | H | tetrahydrofuran(3-CN)-3-yl | H | Me | Me | O |
| C-12213 | H | single bond | Me | tetrahydrothiophen(3-CN)-3-yl | H | Cl | Me | O |
| C-12214 | Me | single bond | H | tetrahydrothiophen(3-CN)-3-yl | H | Cl | Me | O |
| C-12215 | Me(R) | single bond | H | tetrahydrothiophen(3-CN)-3-yl | H | Cl | Me | O |
| C-12216 | Me(S) | single bond | H | tetrahydrothiophen(3-CN)-3-yl | H | Cl | Me | O |
| C-12217 | H | single bond | Me | tetrahydrothiophen(3-CN)-3-yl | H | Me | Me | O |
| C-12218 | Me | single bond | H | tetrahydrothiophen(3-CN)-3-yl | H | Me | Me | O |
| C-12219 | Me(R) | single bond | H | tetrahydrothiophen(3-CN)-3-yl | H | Me | Me | O |
| C-12220 | Me(S) | single bond | H | tetrahydrothiophen(3-CN)-3-yl | H | Me | Me | O |
| C-12221 | H | single bond | Me | bicyclo[1.1.1]pentan-1-yl | H | Cl | Me | O |
| C-12222 | Me | single bond | H | bicyclo[1.1.1]pentan-1-yl | H | Cl | Me | O |
| C-12223 | Me(R) | single bond | H | bicyclo[1.1.1]pentan-1-yl | H | Cl | Me | O |
| C-12224 | Me(S) | single bond | H | bicyclo[1.1.1]pentan-1-yl | H | Cl | Me | O |
| C-12225 | H | single bond | Me | bicyclo[1.1.1]pentan-1-yl | H | Me | Me | O |
| C-12226 | Me | single bond | H | bicyclo[1.1.1]pentan-1-yl | H | Me | Me | O |
| C-12227 | Me(R) | single bond | H | bicyclo[1.1.1]pentan-1-yl | H | Me | Me | O |
| C-12228 | Me(S) | single bond | H | bicyclo[1.1.1]pentan-1-yl | H | Me | Me | O |
| C-12229 | H | single bond | Me | c-Hex | H | Cl | Me | O |
| C-12230 | Me | single bond | H | c-Hex | H | Cl | Me | O |
| C-12231 | Me(R) | single bond | H | c-Hex | H | Cl | Me | O |
| C-12232 | Me(S) | single bond | H | c-Hex | H | Cl | Me | O |
| C-12233 | H | single bond | Me | c-Hex | H | Me | Me | O |
| C-12234 | Me | single bond | H | c-Hex | H | Me | Me | O |
| C-12235 | Me(R) | single bond | H | c-Hex | H | Me | Me | O |
| C-12236 | Me(S) | single bond | H | c-Hex | H | Me | Me | O |
| C-12237 | H | single bond | Me | tetrahydropyran-4-yl | H | Cl | Me | O |
| C-12238 | Me | single bond | H | tetrahydropyran-4-yl | H | Cl | Me | O |
| C-12239 | Me(R) | single bond | H | tetrahydropyran-4-yl | H | Cl | Me | O |
| C-12240 | Me(S) | single bond | H | tetrahydropyran-4-yl | H | Cl | Me | O |
| C-12241 | H | single bond | Me | tetrahydropyran-4-yl | H | Me | Me | O |
| C-12242 | Me | single bond | H | tetrahydropyran-4-yl | H | Me | Me | O |
| C-12243 | Me(R) | single bond | H | tetrahydropyran-4-yl | H | Me | Me | O |
| C-12244 | Me(S) | single bond | H | tetrahydropyran-4-yl | H | Me | Me | O |
| C-12245 | H | single bond | Me | tetrahydrothiopyran-4-yl | H | Cl | Me | O |
| C-12246 | Me | single bond | H | tetrahydrothiopyran-4-yl | H | Cl | Me | O |
| C-12247 | Me(R) | single bond | H | tetrahydrothiopyran-4-yl | H | Cl | Me | O |
| C-12248 | Me(S) | single bond | H | tetrahydrothiopyran-4-yl | H | Cl | Me | O |
| C-12249 | H | single bond | Me | tetrahydrothiopyran-4-yl | H | Me | Me | O |
| C-12250 | Me | single bond | H | tetrahydrothiopyran-4-yl | H | Me | Me | O |

TABLE 507

| Compound Number | Y | W | Z | $R^1$ | $R^2$ | $R^3$ | $R^{10}$ | A |
|---|---|---|---|---|---|---|---|---|
| C-12251 | Me(R) | single bond | H | tetrahydrothiopyran-4-yl | H | Me | Me | O |
| C-12252 | Me(S) | single bond | H | tetrahydrothiopyran-4-yl | H | Me | Me | O |
| C-12253 | H | single bond | Me | c-Hex(1-CN) | H | Cl | Me | O |
| C-12254 | Me | single bond | H | c-Hex(1-CN) | H | Cl | Me | O |
| C-12255 | Me(R) | single bond | H | c-Hex(1-CN) | H | Cl | Me | O |
| C-12256 | Me(S) | single bond | H | c-Hex(1-CN) | H | Cl | Me | O |
| C-12257 | H | single bond | Me | c-Hex(1-CN) | H | Me | Me | O |
| C-12258 | Me | single bond | H | c-Hex(1-CN) | H | Me | Me | O |
| C-12259 | Me(R) | single bond | H | c-Hex(1-CN) | H | Me | Me | O |
| C-12260 | Me(S) | single bond | H | c-Hex(1-CN) | H | Me | Me | O |
| C-12261 | H | single bond | Me | tetrahydropyran(4-CN)-4-yl | H | Cl | Me | O |
| C-12262 | Me | single bond | H | tetrahydropyran(4-CN)-4-yl | H | Cl | Me | O |
| C-12263 | Me(R) | single bond | H | tetrahydropyran(4-CN)-4-yl | H | Cl | Me | O |
| C-12264 | Me(S) | single bond | H | tetrahydropyran(4-CN)-4-yl | H | Cl | Me | O |
| C-12265 | H | single bond | Me | tetrahydropyran(4-CN)-4-yl | H | Me | Me | O |
| C-12266 | Me | single bond | H | tetrahydropyran(4-CN)-4-yl | H | Me | Me | O |
| C-12267 | Me(R) | single bond | H | tetrahydropyran(4-CN)-4-yl | H | Me | Me | O |
| C-12268 | Me(S) | single bond | H | tetrahydropyran(4-CN)-4-yl | H | Me | Me | O |
| C-12269 | H | single bond | Me | tetrahydrothiopyran(4-CN)-4-yl | H | Cl | Me | O |
| C-12270 | Me | single bond | H | tetrahydrothiopyran(4-CN)-4-yl | H | Cl | Me | O |
| C-12271 | Me(R) | single bond | H | tetrahydrothiopyran(4-CN)-4-yl | H | Cl | Me | O |

TABLE 507-continued

| Compound Number | Y | W | Z | $R^1$ | $R^2$ | $R^3$ | $R^{10}$ | A |
|---|---|---|---|---|---|---|---|---|
| C-12272 | Me(S) | single bond | H | tetrahydrothiopyran(4-CN)-4-yl | H | Cl | Me | O |
| C-12273 | H | single bond | Me | tetrahydrothiopyran(4-CN)-4-yl | H | Me | Me | O |
| C-12274 | Me | single bond | H | tetrahydrothiopyran(4-CN)-4-yl | H | Me | Me | O |
| C-12275 | Me(R) | single bond | H | tetrahydrothiopyran(4-CN)-4-yl | H | Me | Me | O |
| C-12276 | Me(S) | single bond | H | tetrahydrothiopyran(4-CN)-4-yl | H | Me | Me | O |
| C-12277 | H | single bond | Me | $CH_2$(c-Pr) | H | Cl | Me | O |
| C-12278 | Me | single bond | H | $CH_2$(c-Pr) | H | Cl | Me | O |
| C-12279 | Me(R) | single bond | H | $CH_2$(c-Pr) | H | Cl | Me | O |
| C-12280 | Me(S) | single bond | H | $CH_2$(c-Pr) | H | Cl | Me | O |
| C-12281 | H | single bond | Me | $CH_2$(c-Pr) | H | Me | Me | O |
| C-12282 | Me | single bond | H | $CH_2$(c-Pr) | H | Me | Me | O |
| C-12283 | Me(R) | single bond | H | $CH_2$(c-Pr) | H | Me | Me | O |
| C-12284 | Me(S) | single bond | H | $CH_2$(c-Pr) | H | Me | Me | O |
| C-12285 | H | single bond | Me | $CH_2$[c-Pr(1-CN)] | H | Cl | Me | O |
| C-12286 | Me | single bond | H | $CH_2$[c-Pr(1-CN)] | H | Cl | Me | O |
| C-12287 | Me(R) | single bond | H | $CH_2$[c-Pr(1-CN)] | H | Cl | Me | O |
| C-12288 | Me(S) | single bond | H | $CH_2$[c-Pr(1-CN)] | H | Cl | Me | O |
| C-12289 | H | single bond | Me | $CH_2$[c-Pr(1-CN)] | H | Me | Me | O |
| C-12290 | Me | single bond | H | $CH_2$[c-Pr(1-CN)] | H | Me | Me | O |
| C-12291 | Me(R) | single bond | H | $CH_2$[c-Pr(1-CN)] | H | Me | Me | O |
| C-12292 | Me(S) | single bond | H | $CH_2$[c-Pr(1-CN)] | H | Me | Me | O |
| C-12293 | H | single bond | Me | CH(Me)(c-Pr) | H | Cl | Me | O |
| C-12294 | Me | single bond | H | CH(Me)(c-Pr) | H | Cl | Me | O |

TABLE 508

| Compound Number | Y | W | Z | $R^1$ | $R^2$ | $R^3$ | $R^{10}$ | A |
|---|---|---|---|---|---|---|---|---|
| C-12295 | Me(R) | single bond | H | CH(Me)(c-Pr) | H | Cl | Me | O |
| C-12296 | Me(S) | single bond | H | CH(Me)(c-Pr) | H | Cl | Me | O |
| C-12297 | H | single bond | Me | CH(Me)(c-Pr) | H | Me | Me | O |
| C-12298 | Me | single bond | H | CH(Me)(c-Pr) | H | Me | Me | O |
| C-12299 | Me(R) | single bond | H | CH(Me)(c-Pr) | H | Me | Me | O |
| C-12300 | Me(S) | single bond | H | CH(Me)(c-Pr) | H | Me | Me | O |
| C-12301 | H | single bond | Me | CH(Me)$CH_2$OMe | H | Cl | Me | O |
| C-12302 | Me | single bond | H | CH(Me)$CH_2$OMe | H | Cl | Me | O |
| C-12303 | Me(R) | single bond | H | CH(Me)$CH_2$OMe | H | Cl | Me | O |
| C-12304 | Me(S) | single bond | H | CH(Me)$CH_2$OMe | H | Cl | Me | O |
| C-12305 | H | single bond | Me | CH(Me)$CH_2$OMe | H | Me | Me | O |
| C-12306 | Me | single bond | H | CH(Me)$CH_2$OMe | H | Me | Me | O |
| C-12307 | Me(R) | single bond | H | CH(Me)$CH_2$OMe | H | Me | Me | O |
| C-12308 | Me(S) | single bond | H | CH(Me)$CH_2$OMe | H | Me | Me | O |
| C-12309 | H | single bond | Me | $CH_2CH{=}CH_2$ | H | Cl | Me | O |
| C-12310 | Me | single bond | H | $CH_2CH{=}CH_2$ | H | Cl | Me | O |
| C-12311 | Me(R) | single bond | H | $CH_2CH{=}CH_2$ | H | Cl | Me | O |
| C-12312 | Me(S) | single bond | H | $CH_2CH{=}CH_2$ | H | Cl | Me | O |
| C-12313 | H | single bond | Me | $CH_2CH{=}CH_2$ | H | Me | Me | O |
| C-12314 | Me | single bond | H | $CH_2CH{=}CH_2$ | H | Me | Me | O |
| C-12315 | Me(R) | single bond | H | $CH_2CH{=}CH_2$ | H | Me | Me | O |
| C-12316 | Me(S) | single bond | H | $CH_2CH{=}CH_2$ | H | Me | Me | O |
| C-12317 | H | single bond | Me | $CH_2C{\equiv}CH$ | H | Cl | Me | O |
| C-12318 | Me | single bond | H | $CH_2C{\equiv}CH$ | H | Cl | Me | O |
| C-12319 | Me(R) | single bond | H | $CH_2C{\equiv}CH$ | H | Cl | Me | O |
| C-12320 | Me(S) | single bond | H | $CH_2C{\equiv}CH$ | H | Cl | Me | O |
| C-12321 | H | single bond | Me | $CH_2C{\equiv}CH$ | H | Me | Me | O |
| C-12322 | Me | single bond | H | $CH_2C{\equiv}CH$ | H | Me | Me | O |
| C-12323 | Me(R) | single bond | H | $CH_2C{\equiv}CH$ | H | Me | Me | O |
| C-12324 | Me(S) | single bond | H | $CH_2C{\equiv}CH$ | H | Me | Me | O |
| C-12325 | H | single bond | Me | $CH_2CN$ | H | Cl | Me | O |
| C-12326 | Me | single bond | H | $CH_2CN$ | H | Cl | Me | O |
| C-12327 | Me(R) | single bond | H | $CH_2CN$ | H | Cl | Me | O |
| C-12328 | Me(S) | single bond | H | $CH_2CN$ | H | Cl | Me | O |
| C-12329 | H | single bond | Me | $CH_2CN$ | H | Me | Me | O |
| C-12330 | Me | single bond | H | $CH_2CN$ | H | Me | Me | O |
| C-12331 | Me(R) | single bond | H | $CH_2CN$ | H | Me | Me | O |
| C-12332 | Me(S) | single bond | H | $CH_2CN$ | H | Me | Me | O |
| C-12333 | H | single bond | Me | CH(Me)CN | H | Cl | Me | O |
| C-12334 | Me | single bond | H | CH(Me)CN | H | Cl | Me | O |
| C-12335 | Me(R) | single bond | H | CH(Me)CN | H | Cl | Me | O |
| C-12336 | Me(S) | single bond | H | CH(Me)CN | H | Cl | Me | O |

TABLE 508-continued

| Compound Number | Y | W | Z | $R^1$ | $R^2$ | $R^3$ | $R^{10}$ | A |
|---|---|---|---|---|---|---|---|---|
| C-12337 | H | single bond | Me | CH(Me)CN | H | Me | Me | O |
| C-12338 | Me | single bond | H | CH(Me)CN | H | Me | Me | O |

TABLE 509

| Compound Number | Y | W | Z | $R^1$ | $R^2$ | $R^3$ | $R^{10}$ | A |
|---|---|---|---|---|---|---|---|---|
| C-12339 | Me(R) | single bond | H | CH(Me)CN | H | Me | Me | O |
| C-12340 | Me(S) | single bond | H | CH(Me)CN | H | Me | Me | O |
| C-12341 | H | single bond | Me | $C(Me)_2CN$ | H | Cl | Me | O |
| C-12342 | Me | single bond | H | $C(Me)_2CN$ | H | Cl | Me | O |
| C-12343 | Me(R) | single bond | H | $C(Me)_2CN$ | H | Cl | Me | O |
| C-12344 | Me(S) | single bond | H | $C(Me)_2CN$ | H | Cl | Me | O |
| C-12345 | H | single bond | Me | $C(Me)_2CN$ | H | Me | Me | O |
| C-12346 | Me | single bond | H | $C(Me)_2CN$ | H | Me | Me | O |
| C-12347 | Me(R) | single bond | H | $C(Me)_2CN$ | H | Me | Me | O |
| C-12348 | Me(S) | single bond | H | $C(Me)_2CN$ | H | Me | Me | O |
| C-12349 | H | single bond | Me | C(Me)(i-Pr)CN | H | Cl | Me | O |
| C-12350 | Me | single bond | H | C(Me)(i-Pr)CN | H | Cl | Me | O |
| C-12351 | Me(R) | single bond | H | C(Me)(i-Pr)CN | H | Cl | Me | O |
| C-12352 | Me(S) | single bond | H | C(Me)(i-Pr)CN | H | Cl | Me | O |
| C-12353 | H | single bond | Me | C(Me)(i-Pr)CN | H | Me | Me | O |
| C-12354 | Me | single bond | H | C(Me)(i-Pr)CN | H | Me | Me | O |
| C-12355 | Me(R) | single bond | H | C(Me)(i-Pr)CN | H | Me | Me | O |
| C-12356 | Me(S) | single bond | H | C(Me)(i-Pr)CN | H | Me | Me | O |
| C-12357 | H | single bond | Me | OMe | H | Cl | Me | O |
| C-12358 | Me | single bond | H | OMe | H | Cl | Me | O |
| C-12359 | Me(R) | single bond | H | OMe | H | Cl | Me | O |
| C-12360 | Me(S) | single bond | H | OMe | H | Cl | Me | O |
| C-12361 | H | single bond | Me | OMe | H | Me | Me | O |

TABLE 509-continued

| Compound Number | Y | W | Z | $R^1$ | $R^2$ | $R^3$ | $R^{10}$ | A |
|---|---|---|---|---|---|---|---|---|
| C-12362 | Me | single bond | H | OMe | H | Me | Me | O |
| C-12363 | Me(R) | single bond | H | OMe | H | Me | Me | O |
| C-12364 | Me(S) | single bond | H | OMe | H | Me | Me | O |
| C-12365 | H | single bond | Me | CH═NOMe | H | Cl | Me | O |
| C-12366 | Me | single bond | H | CH═NOMe | H | Cl | Me | O |
| C-12367 | Me(R) | single bond | H | CH═NOMe | H | Cl | Me | O |
| C-12368 | Me(S) | single bond | H | CH═NOMe | H | Cl | Me | O |
| C-12369 | H | single bond | Me | CH═NOMe | H | Me | Me | O |
| C-12370 | Me | single bond | H | CH═NOMe | H | Me | Me | O |
| C-12371 | Me(R) | single bond | H | CH═NOMe | H | Me | Me | O |
| C-12372 | Me(S) | single bond | H | CH═NOMe | H | Me | Me | O |
| C-12373 | H | single bond | Me | morpholin-4-yl | H | Cl | Me | O |
| C-12374 | Me | single bond | H | morpholin-4-yl | H | Cl | Me | O |
| C-12375 | Me(R) | single bond | H | morpholin-4-yl | H | Cl | Me | O |
| C-12376 | Me(S) | single bond | H | morpholin-4-yl | H | Cl | Me | O |
| C-12377 | H | single bond | Me | morpholin-4-yl | H | Me | Me | O |
| C-12378 | Me | single bond | H | morpholin-4-yl | H | Me | Me | O |
| C-12379 | Me(R) | single bond | H | morpholin-4-yl | H | Me | Me | O |
| C-12380 | Me(S) | single bond | H | morpholin-4-yl | H | Me | Me | O |
| C-12381 | H | single bond | Me | Ph | H | Cl | Me | O |
| C-12382 | Me | single bond | H | Ph | H | Cl | Me | O |

TABLE 510

| Compound Number | Y | W | Z | $R^1$ | $R^2$ | $R^3$ | $R^{10}$ | A |
|---|---|---|---|---|---|---|---|---|
| C-12383 | Me(R) | single bond | H | Ph | H | Cl | Me | O |
| C-12384 | Me(S) | single bond | H | Ph | H | Cl | Me | O |
| C-12385 | H | single bond | Me | Ph | H | Me | Me | O |
| C-12386 | Me | single bond | H | Ph | H | Me | Me | O |
| C-12387 | Me(R) | single bond | H | Ph | H | Me | Me | O |
| C-12388 | Me(S) | single bond | H | Ph | H | Me | Me | O |
| C-12389 | H | single bond | Me | $CH_2Ph$ | H | Cl | Me | O |
| C-12390 | Me | single bond | H | $CH_2Ph$ | H | Cl | Me | O |
| C-12391 | Me(R) | single bond | H | $CH_2Ph$ | H | Cl | Me | O |
| C-12392 | Me(S) | single bond | H | $CH_2Ph$ | H | Cl | Me | O |
| C-12393 | H | single bond | Me | $CH_2Ph$ | H | Me | Me | O |
| C-12394 | Me | single bond | H | $CH_2Ph$ | H | Me | Me | O |
| C-12395 | Me(R) | single bond | H | $CH_2Ph$ | H | Me | Me | O |
| C-12396 | Me(S) | single bond | H | $CH_2Ph$ | H | Me | Me | O |
| C-12397 | H | single bond | Me | thiazole-2-yl | H | Cl | Me | O |
| C-12398 | Me | single bond | H | thiazole-2-yl | H | Cl | Me | O |
| C-12399 | Me(R) | single bond | H | thiazole-2-yl | H | Cl | Me | O |
| C-12400 | Me(S) | single bond | H | thiazole-2-yl | H | Cl | Me | O |
| C-12401 | H | single bond | Me | thiazole-2-yl | H | Me | Me | O |
| C-12402 | Me | single bond | H | thiazole-2-yl | H | Me | Me | O |
| C-12403 | Me(R) | single bond | H | thiazole-2-yl | H | Me | Me | O |
| C-12404 | Me(S) | single bond | H | thiazole-2-yl | H | Me | Me | O |
| C-12405 | H | single bond | Me | 1-Me-pyrazol-3-yl | H | Cl | Me | O |
| C-12406 | Me | single bond | H | 1-Me-pyrazol-3-yl | H | Cl | Me | O |
| C-12407 | Me(R) | single bond | H | 1-Me-pyrazol-3-yl | H | Cl | Me | O |
| C-12408 | Me(S) | single bond | H | 1-Me-pyrazol-3-yl | H | Cl | Me | O |
| C-12409 | H | single bond | Me | 1-Me-pyrazol-3-yl | H | Me | Me | O |
| C-12410 | Me | single bond | H | 1-Me-pyrazol-3-yl | H | Me | Me | O |
| C-12411 | Me(R) | single bond | H | 1-Me-pyrazol-3-yl | H | Me | Me | O |
| C-12412 | Me(S) | single bond | H | 1-Me-pyrazol-3-yl | H | Me | Me | O |
| C-12413 | H | single bond | Me | 1-Me-pyrazol-5-yl | H | Cl | Me | O |
| C-12414 | Me | single bond | H | 1-Me-pyrazol-5-yl | H | Cl | Me | O |
| C-12415 | Me(R) | single bond | H | 1-Me-pyrazol-5-yl | H | Cl | Me | O |
| C-12416 | Me(S) | single bond | H | 1-Me-pyrazol-5-yl | H | Cl | Me | O |
| C-12417 | H | single bond | Me | 1-Me-pyrazol-5-yl | H | Me | Me | O |
| C-12418 | Me | single bond | H | 1-Me-pyrazol-5-yl | H | Me | Me | O |

TABLE 510-continued

| Compound Number | Y | W | Z | $R^1$ | $R^2$ | $R^3$ | $R^{10}$ | A |
|---|---|---|---|---|---|---|---|---|
| C-12419 | Me(R) | single bond | H | 1-Me-pyrazol-5-yl | H | Me | Me | O |
| C-12420 | Me(S) | single bond | H | 1-Me-pyrazol-5-yl | H | Me | Me | O |
| C-12421 | H | single bond | Me | $CH_2$(pyrimidin-2-yl) | H | Cl | Me | O |
| C-12422 | Me | single bond | H | $CH_2$(pyrimidin-2-yl) | H | Cl | Me | O |
| C-12423 | Me(R) | single bond | H | $CH_2$(pyrimidin-2-yl) | H | Cl | Me | O |
| C-12424 | Me(S) | single bond | H | $CH_2$(pyrimidin-2-yl) | H | Cl | Me | O |
| C-12425 | H | single bond | Me | $CH_2$(pyrimidin-2-yl) | H | Me | Me | O |
| C-12426 | Me | single bond | H | $CH_2$(pyrimidin-2-yl) | H | Me | Me | O |

TABLE 511

| Compound Number | Y | W | Z | $R^1$ | $R^2$ | $R^3$ | $R^{10}$ | A |
|---|---|---|---|---|---|---|---|---|
| C-12427 | Me(R) | single bond | H | $CH_2$(pyrimidin-2-yl) | H | Me | Me | O |
| C-12428 | Me(S) | single bond | H | $CH_2$(pyrimidin-2-yl) | H | Me | Me | O |
| C-12429 | H | single bond | Me | $—CH_2CH_2CH_2—$ | | Cl | Me | O |
| C-12430 | Me | single bond | H | $—CH_2CH_2CH_2—$ | | Cl | Me | O |
| C-12431 | Me(R) | single bond | H | $—CH_2CH_2CH_2—$ | | Cl | Me | O |
| C-12432 | Me(S) | single bond | H | $—CH_2CH_2CH_2—$ | | Cl | Me | O |
| C-12433 | H | single bond | Me | $—CH_2CH_2CH_2—$ | | Me | Me | O |
| C-12434 | Me | single bond | H | $—CH_2CH_2CH_2—$ | | Me | Me | O |
| C-12435 | Me(R) | single bond | H | $—CH_2CH_2CH_2—$ | | Me | Me | O |
| C-12436 | Me(S) | single bond | H | $—CH_2CH_2CH_2—$ | | Me | Me | O |
| C-12437 | H | single bond | Me | $—CH_2CH_2OCH_2CH_2—$ | | Cl | Me | O |
| C-12438 | Me | single bond | H | $—CH_2CH_2OCH_2CH_2—$ | | Cl | Me | O |
| C-12439 | Me(R) | single bond | H | $—CH_2CH_2OCH_2CH_2—$ | | Cl | Me | O |
| C-12440 | Me(S) | single bond | H | $—CH_2CH_2OCH_2CH_2—$ | | Cl | Me | O |
| C-12441 | H | single bond | Me | $—CH_2CH_2OCH_2CH_2—$ | | Me | Me | O |
| C-12442 | Me | single bond | H | $—CH_2CH_2OCH_2CH_2—$ | | Me | Me | O |
| C-12443 | Me(R) | single bond | H | $—CH_2CH_2OCH_2CH_2—$ | | Me | Me | O |
| C-12444 | Me(S) | single bond | H | $—CH_2CH_2OCH_2CH_2—$ | | Me | Me | O |
| C-12445 | H | single bond | Me | Me | H | Cl | $CH_2OMe$ | O |
| C-12446 | Me | single bond | H | Me | H | Cl | $CH_2OMe$ | O |
| C-12447 | Me(R) | single bond | H | Me | H | Cl | $CH_2OMe$ | O |
| C-12448 | Me(S) | single bond | H | Me | H | Cl | $CH_2OMe$ | O |
| C-12449 | H | single bond | Me | Me | H | Me | $CH_2OMe$ | O |
| C-12450 | Me | single bond | H | Me | H | Me | $CH_2OMe$ | O |
| C-12451 | Me(R) | single bond | H | Me | H | Me | $CH_2OMe$ | O |
| C-12452 | Me(S) | single bond | H | Me | H | Me | $CH_2OMe$ | O |
| C-12453 | H | single bond | Me | $CH_2CHF_2$ | H | Cl | $CH_2OMe$ | O |
| C-12454 | Me | single bond | H | $CH_2CHF_2$ | H | Cl | $CH_2OMe$ | O |
| C-12455 | Me(R) | single bond | H | $CH_2CHF_2$ | H | Cl | $CH_2OMe$ | O |
| C-12456 | Me(S) | single bond | H | $CH_2CHF_2$ | H | Cl | $CH_2OMe$ | O |
| C-12457 | H | single bond | Me | $CH_2CHF_2$ | H | Me | $CH_2OMe$ | O |
| C-12458 | Me | single bond | H | $CH_2CHF_2$ | H | Me | $CH_2OMe$ | O |
| C-12459 | Me(R) | single bond | H | $CH_2CHF_2$ | H | Me | $CH_2OMe$ | O |
| C-12460 | Me(S) | single bond | H | $CH_2CHF_2$ | H | Me | $CH_2OMe$ | O |
| C-12461 | H | single bond | Me | n-Pr | H | Cl | $CH_2OMe$ | O |
| C-12462 | Me | single bond | H | n-Pr | H | Cl | $CH_2OMe$ | O |
| C-12463 | Me(R) | single bond | H | n-Pr | H | Cl | $CH_2OMe$ | O |
| C-12464 | Me(S) | single bond | H | n-Pr | H | Cl | $CH_2OMe$ | O |
| C-12465 | H | single bond | Me | n-Pr | H | Me | $CH_2OMe$ | O |
| C-12466 | Me | single bond | H | n-Pr | H | Me | $CH_2OMe$ | O |
| C-12467 | Me(R) | single bond | H | n-Pr | H | Me | $CH_2OMe$ | O |
| C-12468 | Me(S) | single bond | H | n-Pr | H | Me | $CH_2OMe$ | O |
| C-12469 | H | single bond | Me | i-Pr | H | Cl | $CH_2OMe$ | O |
| C-12470 | Me | single bond | H | i-Pr | H | Cl | $CH_2OMe$ | O |

TABLE 512

| Compound Number | Y | W | Z | $R^1$ | $R^2$ | $R^3$ | $R^{10}$ | A |
|---|---|---|---|---|---|---|---|---|
| C-12471 | Me(R) | single bond | H | i-Pr | H | Cl | $CH_2OMe$ | O |
| C-12472 | Me(S) | single bond | H | i-Pr | H | Cl | $CH_2OMe$ | O |
| C-12473 | H | single bond | Me | i-Pr | H | Me | $CH_2OMe$ | O |
| C-12474 | Me | single bond | H | i-Pr | H | Me | $CH_2OMe$ | O |
| C-12475 | Me(R) | single bond | H | i-Pr | H | Me | $CH_2OMe$ | O |
| C-12476 | Me(S) | single bond | H | i-Pr | H | Me | $CH_2OMe$ | O |

TABLE 512-continued

| Compound Number | Y | W | Z | $R^1$ | $R^2$ | $R^3$ | $R^{10}$ | A |
|---|---|---|---|---|---|---|---|---|
| C-12477 | H | single bond | Me | c-Pr(1-F) | H | Cl | $CH_2OMe$ | O |
| C-12478 | Me | single bond | H | c-Pr(1-F) | H | Cl | $CH_2OMe$ | O |
| C-12479 | Me(R) | single bond | H | c-Pr(1-F) | H | Cl | $CH_2OMe$ | O |
| C-12480 | Me(S) | single bond | H | c-Pr(1-F) | H | Cl | $CH_2OMe$ | O |
| C-12481 | H | single bond | Me | c-Pr(1-F) | H | Me | $CH_2OMe$ | O |
| C-12482 | Me | single bond | H | c-Pr(1-F) | H | Me | $CH_2OMe$ | O |
| C-12483 | Me(R) | single bond | H | c-Pr(1-F) | H | Me | $CH_2OMe$ | O |
| C-12484 | Me(S) | single bond | H | c-Pr(1-F) | H | Me | $CH_2OMe$ | O |
| C-12485 | H | single bond | Me | c-Pr(2,2-F)$_2$ | H | Cl | $CH_2OMe$ | O |
| C-12486 | Me | single bond | H | c-Pr(2,2-F)$_2$ | H | Cl | $CH_2OMe$ | O |
| C-12487 | Me(R) | single bond | H | c-Pr(2,2-F)$_2$ | H | Cl | $CH_2OMe$ | O |
| C-12488 | Me(S) | single bond | H | c-Pr(2,2-F)$_2$ | H | Cl | $CH_2OMe$ | O |
| C-12489 | H | single bond | Me | c-Pr(2,2-F)$_2$ | H | Me | $CH_2OMe$ | O |
| C-12490 | Me | single bond | H | c-Pr(2,2-F)$_2$ | H | Me | $CH_2OMe$ | O |
| C-12491 | Me(R) | single bond | H | c-Pr(2,2-F)$_2$ | H | Me | $CH_2OMe$ | O |
| C-12492 | Me(S) | single bond | H | c-Pr(2,2-F)$_2$ | H | Me | $CH_2OMe$ | O |
| C-12493 | H | single bond | Me | c-Pr(1-Cl) | H | Cl | $CH_2OMe$ | O |
| C-12494 | Me | single bond | H | c-Pr(1-Cl) | H | Cl | $CH_2OMe$ | O |
| C-12495 | Me(R) | single bond | H | c-Pr(1-Cl) | H | Cl | $CH_2OMe$ | O |
| C-12496 | Me(S) | single bond | H | c-Pr(1-Cl) | H | Cl | $CH_2OMe$ | O |
| C-12497 | H | single bond | Me | c-Pr(1-Cl) | H | Me | $CH_2OMe$ | O |
| C-12498 | Me | single bond | H | c-Pr(1-Cl) | H | Me | $CH_2OMe$ | O |
| C-12499 | Me(R) | single bond | H | c-Pr(1-Cl) | H | Me | $CH_2OMe$ | O |
| C-12500 | Me(S) | single bond | H | c-Pr(1-Cl) | H | Me | $CH_2OMe$ | O |
| C-12501 | H | single bond | Me | c-Pr(1-Br) | H | Cl | $CH_2OMe$ | O |
| C-12502 | Me | single bond | H | c-Pr(1-Br) | H | Cl | $CH_2OMe$ | O |
| C-12503 | Me(R) | single bond | H | c-Pr(1-Br) | H | Cl | $CH_2OMe$ | O |
| C-12504 | Me(S) | single bond | H | c-Pr(1-Br) | H | Cl | $CH_2OMe$ | O |
| C-12505 | H | single bond | Me | c-Pr(1-Br) | H | Me | $CH_2OMe$ | O |
| C-12506 | Me | single bond | H | c-Pr(1-Br) | H | Me | $CH_2OMe$ | O |
| C-12507 | Me(R) | single bond | H | c-Pr(1-Br) | H | Me | $CH_2OMe$ | O |
| C-12508 | Me(S) | single bond | H | c-Pr(1-Br) | H | Me | $CH_2OMe$ | O |
| C-12509 | H | single bond | Me | c-Pr(1-Me) | H | Cl | $CH_2OMe$ | O |
| C-12510 | Me | single bond | H | c-Pr(1-Me) | H | Cl | $CH_2OMe$ | O |
| C-12511 | Me(R) | single bond | H | c-Pr(1-Me) | H | Cl | $CH_2OMe$ | O |
| C-12512 | Me(S) | single bond | H | c-Pr(1-Me) | H | Cl | $CH_2OMe$ | O |
| C-12513 | H | single bond | Me | c-Pr(1-Me) | H | Me | $CH_2OMe$ | O |
| C-12514 | Me | single bond | H | c-Pr(1-Me) | H | Me | $CH_2OMe$ | O |

TABLE 513

| Compound Number | Y | W | Z | $R^1$ | $R^2$ | $R^3$ | $R^{10}$ | A |
|---|---|---|---|---|---|---|---|---|
| C-12515 | Me(R) | single bond | H | c-Pr(1-Me) | H | Me | $CH_2OMe$ | O |
| C-12516 | Me(S) | single bond | H | c-Pr(1-Me) | H | Me | $CH_2OMe$ | O |
| C-12517 | H | single bond | Me | c-Pr(1-$CH_2OH$) | H | Cl | $CH_2OMe$ | O |
| C-12518 | Me | single bond | H | c-Pr(1-$CH_2OH$) | H | Cl | $CH_2OMe$ | O |
| C-12519 | Me(R) | single bond | H | c-Pr(1-$CH_2OH$) | H | Cl | $CH_2OMe$ | O |
| C-12520 | Me(S) | single bond | H | c-Pr(1-$CH_2OH$) | H | Cl | $CH_2OMe$ | O |
| C-12521 | H | single bond | Me | c-Pr(1-$CH_2OH$) | H | Me | $CH_2OMe$ | O |
| C-12522 | Me | single bond | H | c-Pr(1-$CH_2OH$) | H | Me | $CH_2OMe$ | O |
| C-12523 | Me(R) | single bond | H | c-Pr(1-$CH_2OH$) | H | Me | $CH_2OMe$ | O |
| C-12524 | Me(S) | single bond | H | c-Pr(1-$CH_2OH$) | H | Me | $CH_2OMe$ | O |
| C-12525 | H | single bond | Me | c-Pr[1-$CH_2OS(=O)_2Me$] | H | Cl | $CH_2OMe$ | O |
| C-12526 | Me | single bond | H | c-Pr[1-$CH_2OS(=O)_2Me$] | H | Cl | $CH_2OMe$ | O |
| C-12527 | Me(R) | single bond | H | c-Pr[1-$CH_2OS(=O)_2Me$] | H | Cl | $CH_2OMe$ | O |
| C-12528 | Me(S) | single bond | H | c-Pr[1-$CH_2OS(=O)_2Me$] | H | Cl | $CH_2OMe$ | O |
| C-12529 | H | single bond | Me | c-Pr[1-$CH_2OS(=O)_2Me$] | H | Me | $CH_2OMe$ | O |
| C-12530 | Me | single bond | H | c-Pr[1-$CH_2OS(=O)_2Me$] | H | Me | $CH_2OMe$ | O |
| C-12531 | Me(R) | single bond | H | c-Pr[1-$CH_2OS(=O)_2Me$] | H | Me | $CH_2OMe$ | O |
| C-12532 | Me(S) | single bond | H | c-Pr[1-$CH_2OS(=O)_2Me$] | H | Me | $CH_2OMe$ | O |
| C-12533 | H | single bond | Me | c-Pr(1-$CH_2OMe$) | H | Cl | $CH_2OMe$ | O |
| C-12534 | Me | single bond | H | c-Pr(1-$CH_2OMe$) | H | Cl | $CH_2OMe$ | O |
| C-12535 | Me(R) | single bond | H | c-Pr(1-$CH_2OMe$) | H | Cl | $CH_2OMe$ | O |
| C-12536 | Me(S) | single bond | H | c-Pr(1-$CH_2OMe$) | H | Cl | $CH_2OMe$ | O |
| C-12537 | H | single bond | Me | c-Pr(1-$CH_2OMe$) | H | Me | $CH_2OMe$ | O |
| C-12538 | Me | single bond | H | c-Pr(1-$CH_2OMe$) | H | Me | $CH_2OMe$ | O |
| C-12539 | Me(R) | single bond | H | c-Pr(1-$CH_2OMe$) | H | Me | $CH_2OMe$ | O |
| C-12540 | Me(S) | single bond | H | c-Pr(1-$CH_2OMe$) | H | Me | $CH_2OMe$ | O |
| C-12541 | H | single bond | Me | c-Pr(1-$CH_2CN$) | H | Cl | $CH_2OMe$ | O |
| C-12542 | Me | single bond | H | c-Pr(1-$CH_2CN$) | H | Cl | $CH_2OMe$ | O |
| C-12543 | Me(R) | single bond | H | c-Pr(1-$CH_2CN$) | H | Cl | $CH_2OMe$ | O |

TABLE 513-continued

| Compound Number | Y | W | Z | $R^1$ | $R^2$ | $R^3$ | $R^{10}$ | A |
|---|---|---|---|---|---|---|---|---|
| C-12544 | Me(S) | single bond | H | c-Pr(1-$CH_2$CN) | H | Cl | $CH_2$OMe | O |
| C-12545 | H | single bond | Me | c-Pr(1-$CH_2$CN) | H | Me | $CH_2$OMe | O |
| C-12546 | Me | single bond | H | c-Pr(1-$CH_2$CN) | H | Me | $CH_2$OMe | O |
| C-12547 | Me(R) | single bond | H | c-Pr(1-$CH_2$CN) | H | Me | $CH_2$OMe | O |
| C-12548 | Me(S) | single bond | H | c-Pr(1-$CH_2$CN) | H | Me | $CH_2$OMe | O |
| C-12549 | H | single bond | Me | c-Pr(1-$CH_2$SMe) | H | Cl | $CH_2$OMe | O |
| C-12550 | Me | single bond | H | c-Pr(1-$CH_2$SMe) | H | Cl | $CH_2$OMe | O |
| C-12551 | Me(R) | single bond | H | c-Pr(1-$CH_2$SMe) | H | Cl | $CH_2$OMe | O |
| C-12552 | Me(S) | single bond | H | c-Pr(1-$CH_2$SMe) | H | Cl | $CH_2$OMe | O |
| C-12553 | H | single bond | Me | c-Pr(1-$CH_2$SMe) | H | Me | $CH_2$OMe | O |
| C-12554 | Me | single bond | H | c-Pr(1-$CH_2$SMe) | H | Me | $CH_2$OMe | O |
| C-12555 | Me(R) | single bond | H | c-Pr(1-$CH_2$SMe) | H | Me | $CH_2$OMe | O |
| C-12556 | Me(S) | single bond | H | c-Pr(1-$CH_2$SMe) | H | Me | $CH_2$OMe | O |
| C-12557 | H | single bond | Me | c-Pr[1-$CH_2$S(=O)Me] | H | Cl | $CH_2$OMe | O |
| C-12558 | Me | single bond | H | c-Pr[1-$CH_2$S(=O)Me] | H | Cl | $CH_2$OMe | O |

TABLE 514

| Compound Number | Y | W | Z | $R^1$ | $R^2$ | $R^3$ | $R^{10}$ | A |
|---|---|---|---|---|---|---|---|---|
| C-12559 | Me(R) | single bond | H | c-Pr[1-$CH_2$S(=O)Me] | H | Cl | $CH_2$OMe | O |
| C-12560 | Me(S) | single bond | H | c-Pr[1-$CH_2$S(=O)Me] | H | Cl | $CH_2$OMe | O |
| C-12561 | H | single bond | Me | c-Pr[1-$CH_2$S(=O)Me] | H | Me | $CH_2$OMe | O |
| C-12562 | Me | single bond | H | c-Pr[1-$CH_2$S(=O)Me] | H | Me | $CH_2$OMe | O |
| C-12563 | Me(R) | single bond | H | c-Pr[1-$CH_2$S(=O)Me] | H | Me | $CH_2$OMe | O |
| C-12564 | Me(S) | single bond | H | c-Pr[1-$CH_2$S(=O)Me] | H | Me | $CH_2$OMe | O |
| C-12565 | H | single bond | Me | c-Pr[1-$CH_2$S(=O)$_2$Me] | H | Cl | $CH_2$OMe | O |
| C-12566 | Me | single bond | H | c-Pr[1-$CH_2$S(=O)$_2$Me] | H | Cl | $CH_2$OMe | O |
| C-12567 | Me(R) | single bond | H | c-Pr[1-$CH_2$S(=O)$_2$Me] | H | Cl | $CH_2$OMe | O |
| C-12568 | Me(S) | single bond | H | c-Pr[1-$CH_2$S(=O)$_2$Me] | H | Cl | $CH_2$OMe | O |
| C-12569 | H | single bond | Me | c-Pr[1-$CH_2$S(=O)$_2$Me] | H | Me | $CH_2$OMe | O |
| C-12570 | Me | single bond | H | c-Pr[1-$CH_2$S(=O)$_2$Me] | H | Me | $CH_2$OMe | O |
| C-12571 | Me(R) | single bond | H | c-Pr[1-$CH_2$S(=O)$_2$Me] | H | Me | $CH_2$OMe | O |
| C-12572 | Me(S) | single bond | H | c-Pr[1-$CH_2$S(=O)$_2$Me] | H | Me | $CH_2$OMe | O |
| C-12573 | H | single bond | Me | c-Pr(1-$CH_2$F) | H | Cl | $CH_2$OMe | O |
| C-12574 | Me | single bond | H | c-Pr(1-$CH_2$F) | H | Cl | $CH_2$OMe | O |
| C-12575 | Me(R) | single bond | H | c-Pr(1-$CH_2$F) | H | Cl | $CH_2$OMe | O |
| C-12576 | Me(S) | single bond | H | c-Pr(1-$CH_2$F) | H | Cl | $CH_2$OMe | O |
| C-12577 | H | single bond | Me | c-Pr(1-$CH_2$F) | H | Me | $CH_2$OMe | O |
| C-12578 | Me | single bond | H | c-Pr(1-$CH_2$F) | H | Me | $CH_2$OMe | O |
| C-12579 | Me(R) | single bond | H | c-Pr(1-$CH_2$F) | H | Me | $CH_2$OMe | O |
| C-12580 | Me(S) | single bond | H | c-Pr(1-$CH_2$F) | H | Me | $CH_2$OMe | O |
| C-12581 | H | single bond | Me | c-Pr(1-CHF)$_2$ | H | Cl | $CH_2$OMe | O |
| C-12582 | Me | single bond | H | c-Pr(1-CHF)$_2$ | H | Cl | $CH_2$OMe | O |
| C-12583 | Me(R) | single bond | H | c-Pr(1-CHF)$_2$ | H | Cl | $CH_2$OMe | O |
| C-12584 | Me(S) | single bond | H | c-Pr(1-CHF)$_2$ | H | Cl | $CH_2$OMe | O |
| C-12585 | H | single bond | Me | c-Pr(1-CHF)$_2$ | H | Me | $CH_2$OMe | O |
| C-12586 | Me | single bond | H | c-Pr(1-CHF)$_2$ | H | Me | $CH_2$OMe | O |
| C-12587 | Me(R) | single bond | H | c-Pr(1-CHF)$_2$ | H | Me | $CH_2$OMe | O |
| C-12588 | Me(S) | single bond | H | c-Pr(1-CHF)$_2$ | H | Me | $CH_2$OMe | O |
| C-12589 | H | single bond | Me | c-Pr(1-$CF_3$) | H | Cl | $CH_2$OMe | O |
| C-12590 | Me | single bond | H | c-Pr(1-$CF_3$) | H | Cl | $CH_2$OMe | O |
| C-12591 | Me(R) | single bond | H | c-Pr(1-$CF_3$) | H | Cl | $CH_2$OMe | O |
| C-12592 | Me(S) | single bond | H | c-Pr(1-$CF_3$) | H | Cl | $CH_2$OMe | O |
| C-12593 | H | single bond | Me | c-Pr(1-$CF_3$) | H | Me | $CH_2$OMe | O |
| C-12594 | Me | single bond | H | c-Pr(1-$CF_3$) | H | Me | $CH_2$OMe | O |
| C-12595 | Me(R) | single bond | H | c-Pr(1-$CF_3$) | H | Me | $CH_2$OMe | O |
| C-12596 | Me(S) | single bond | H | c-Pr(1-$CF_3$) | H | Me | $CH_2$OMe | O |
| C-12597 | H | single bond | Me | c-Pr(1-C≡CH) | H | Cl | $CH_2$OMe | O |
| C-12598 | Me | single bond | H | c-Pr(1-C≡CH) | H | Cl | $CH_2$OMe | O |
| C-12599 | Me(R) | single bond | H | c-Pr(1-C≡CH) | H | Cl | $CH_2$OMe | O |
| C-12600 | Me(S) | single bond | H | c-Pr(1-C≡CH) | H | Cl | $CH_2$OMe | O |
| C-12601 | H | single bond | Me | c-Pr(1-C≡CH) | H | Me | $CH_2$OMe | O |
| C-12602 | Me | single bond | H | c-Pr(1-C≡CH) | H | Me | $CH_2$OMe | O |

TABLE 515

| Compound Number | Y | W | Z | $R^1$ | $R^2$ | $R^3$ | $R^{10}$ | A |
|---|---|---|---|---|---|---|---|---|
| C-12603 | Me(R) | single bond | H | c-Pr(1-C≡CH) | H | Me | $CH_2OMe$ | O |
| C-12604 | Me(S) | single bond | H | c-Pr(1-C≡CH) | H | Me | $CH_2OMe$ | O |
| C-12605 | H | single bond | Me | c-Pr[1-C(═O)OEt] | H | Cl | $CH_2OMe$ | O |
| C-12606 | Me | single bond | H | c-Pr[1-C(═O)OEt] | H | Cl | $CH_2OMe$ | O |
| C-12607 | Me(R) | single bond | H | c-Pr[1-C(═O)OEt] | H | Cl | $CH_2OMe$ | O |
| C-12608 | Me(S) | single bond | H | c-Pr[1-C(═O)OEt] | H | Cl | $CH_2OMe$ | O |
| C-12609 | H | single bond | Me | c-Pr[1-C(═O)OEt] | H | Me | $CH_2OMe$ | O |
| C-12610 | Me | single bond | H | c-Pr[1-C(═O)OEt] | H | Me | $CH_2OMe$ | O |
| C-12611 | Me(R) | single bond | H | c-Pr[1-C(═O)OEt] | H | Me | $CH_2OMe$ | O |
| C-12612 | Me(S) | single bond | H | c-Pr[1-C(═O)OEt] | H | Me | $CH_2OMe$ | O |
| C-12613 | H | single bond | Me | c-Pr[1-C(═O)OH] | H | Cl | $CH_2OMe$ | O |
| C-12614 | Me | single bond | H | c-Pr[1-C(═O)OH] | H | Cl | $CH_2OMe$ | O |
| C-12615 | Me(R) | single bond | H | c-Pr[1-C(═O)OH] | H | Cl | $CH_2OMe$ | O |
| C-12616 | Me(S) | single bond | H | c-Pr[1-C(═O)OH] | H | Cl | $CH_2OMe$ | O |
| C-12617 | H | single bond | Me | c-Pr[1-C(═O)OH] | H | Me | $CH_2OMe$ | O |
| C-12618 | Me | single bond | H | c-Pr[1-C(═O)OH] | H | Me | $CH_2OMe$ | O |
| C-12619 | Me(R) | single bond | H | c-Pr[1-C(═O)OH] | H | Me | $CH_2OMe$ | O |
| C-12620 | Me(S) | single bond | H | c-Pr[1-C(═O)OH] | H | Me | $CH_2OMe$ | O |
| C-12621 | H | single bond | Me | c-Pr[1-C(═O)$NH_2$] | H | Cl | $CH_2OMe$ | O |
| C-12622 | Me | single bond | H | c-Pr[1-C(═O)$NH_2$] | H | Cl | $CH_2OMe$ | O |
| C-12623 | Me(R) | single bond | H | c-Pr[1-C(═O)$NH_2$] | H | Cl | $CH_2OMe$ | O |
| C-12624 | Me(S) | single bond | H | c-Pr[1-C(═O)$NH_2$] | H | Cl | $CH_2OMe$ | O |
| C-12625 | H | single bond | Me | c-Pr[1-C(═O)$NH_2$] | H | Me | $CH_2OMe$ | O |
| C-12626 | Me | single bond | H | c-Pr[1-C(═O)$NH_2$] | H | Me | $CH_2OMe$ | O |
| C-12627 | Me(R) | single bond | H | c-Pr[1-C(═O)$NH_2$] | H | Me | $CH_2OMe$ | O |
| C-12628 | Me(S) | single bond | H | c-Pr[1-C(═O)$NH_2$] | H | Me | $CH_2OMe$ | O |
| C-12629 | H | single bond | Me | c-Pr(1-OMe) | H | Cl | $CH_2OMe$ | O |
| C-12630 | Me | single bond | H | c-Pr(1-OMe) | H | Cl | $CH_2OMe$ | O |
| C-12631 | Me(R) | single bond | H | c-Pr(1-OMe) | H | Cl | $CH_2OMe$ | O |
| C-12632 | Me(S) | single bond | H | c-Pr(1-OMe) | H | Cl | $CH_2OMe$ | O |
| C-12633 | H | single bond | Me | c-Pr(1-OMe) | H | Me | $CH_2OMe$ | O |
| C-12634 | Me | single bond | H | c-Pr(1-OMe) | H | Me | $CH_2OMe$ | O |
| C-12635 | Me(R) | single bond | H | c-Pr(1-OMe) | H | Me | $CH_2OMe$ | O |
| C-12636 | Me(S) | single bond | H | c-Pr(1-OMe) | H | Me | $CH_2OMe$ | O |
| C-12637 | H | single bond | Me | c-Pr(1-SMe) | H | Cl | $CH_2OMe$ | O |
| C-12638 | Me | single bond | H | c-Pr(1-SMe) | H | Cl | $CH_2OMe$ | O |
| C-12639 | Me(R) | single bond | H | c-Pr(1-SMe) | H | Cl | $CH_2OMe$ | O |
| C-12640 | Me(S) | single bond | H | c-Pr(1-SMe) | H | Cl | $CH_2OMe$ | O |
| C-12641 | H | single bond | Me | c-Pr(1-SMe) | H | Me | $CH_2OMe$ | O |
| C-12642 | Me | single bond | H | c-Pr(1-SMe) | H | Me | $CH_2OMe$ | O |
| C-12643 | Me(R) | single bond | H | c-Pr(1-SMe) | H | Me | $CH_2OMe$ | O |
| C-12644 | Me(S) | single bond | H | c-Pr(1-SMe) | H | Me | $CH_2OMe$ | O |
| C-12645 | H | single bond | Me | c-Pr[1-S(═O)Me] | H | Cl | $CH_2OMe$ | O |
| C-12646 | Me | single bond | H | c-Pr[1-S(═O)Me] | H | Cl | $CH_2OMe$ | O |

TABLE 516

| Compound Number | Y | W | Z | $R^1$ | $R^2$ | $R^3$ | $R^{10}$ | A |
|---|---|---|---|---|---|---|---|---|
| C-12647 | Me(R) | single bond | H | c-Pr[1-S(═O)Me] | H | Cl | $CH_2OMe$ | O |
| C-12648 | Me(S) | single bond | H | c-Pr[1-S(═O)Me] | H | Cl | $CH_2OMe$ | O |
| C-12649 | H | single bond | Me | c-Pr[1-S(═O)Me] | H | Me | $CH_2OMe$ | O |
| C-12650 | Me | single bond | H | c-Pr[1-S(═O)Me] | H | Me | $CH_2OMe$ | O |
| C-12651 | Me(R) | single bond | H | c-Pr[1-S(═O)Me] | H | Me | $CH_2OMe$ | O |
| C-12652 | Me(S) | single bond | H | c-Pr[1-S(═O)Me] | H | Me | $CH_2OMe$ | O |
| C-12653 | H | single bond | Me | c-Pr[1-S(═O)$_2$Me] | H | Cl | $CH_2OMe$ | O |
| C-12654 | Me | single bond | H | c-Pr[1-S(═O)$_2$Me] | H | Cl | $CH_2OMe$ | O |
| C-12655 | Me(R) | single bond | H | c-Pr[1-S(═O)$_2$Me] | H | Cl | $CH_2OMe$ | O |
| C-12656 | Me(S) | single bond | H | c-Pr[1-S(═O)$_2$Me] | H | Cl | $CH_2OMe$ | O |
| C-12657 | H | single bond | Me | c-Pr[1-S(═O)$_2$Me] | H | Me | $CH_2OMe$ | O |
| C-12658 | Me | single bond | H | c-Pr[1-S(═O)$_2$Me] | H | Me | $CH_2OMe$ | O |
| C-12659 | Me(R) | single bond | H | c-Pr[1-S(═O)$_2$Me] | H | Me | $CH_2OMe$ | O |
| C-12660 | Me(S) | single bond | H | c-Pr[1-S(═O)$_2$Me] | H | Me | $CH_2OMe$ | O |
| C-12661 | H | single bond | Me | c-Pr[1-S(═O)$_2$$CHF_2$] | H | Cl | $CH_2OMe$ | O |
| C-12662 | Me | single bond | H | c-Pr[1-S(═O)$_2$$CHF_2$] | H | Cl | $CH_2OMe$ | O |
| C-12663 | Me(R) | single bond | H | c-Pr[1-S(═O)$_2$$CHF_2$] | H | Cl | $CH_2OMe$ | O |
| C-12664 | Me(S) | single bond | H | c-Pr[1-S(═O)$_2$$CHF_2$] | H | Cl | $CH_2OMe$ | O |
| C-12665 | H | single bond | Me | c-Pr[1-S(═O)$_2$$CHF_2$] | H | Me | $CH_2OMe$ | O |
| C-12666 | Me | single bond | H | c-Pr[1-S(═O)$_2$$CHF_2$] | H | Me | $CH_2OMe$ | O |
| C-12667 | Me(R) | single bond | H | c-Pr[1-S(═O)$_2$$CHF_2$] | H | Me | $CH_2OMe$ | O |
| C-12668 | Me(S) | single bond | H | c-Pr[1-S(═O)$_2$$CHF_2$] | H | Me | $CH_2OMe$ | O |
| C-12669 | H | single bond | Me | c-Pr[1-S(═O)$_2$CF 3] | H | Cl | $CH_2OMe$ | O |

TABLE 516-continued

| Compound Number | Y | W | Z | $R^1$ | $R^2$ | $R^3$ | $R^{10}$ | A |
|---|---|---|---|---|---|---|---|---|
| C-12670 | Me | single bond | H | c-Pr[1-S(=O)$_2$CF3] | H | Cl | $CH_2OMe$ | O |
| C-12671 | Me(R) | single bond | H | c-Pr[1-S(=O)$_2$CF3] | H | Cl | $CH_2OMe$ | O |
| C-12672 | Me(S) | single bond | H | c-Pr[1-S(=O)$_2$CF3] | H | Cl | $CH_2OMe$ | O |
| C-12673 | H | single bond | Me | c-Pr[1-S(=O)$_2$CF3] | H | Me | $CH_2OMe$ | O |
| C-12674 | Me | single bond | H | c-Pr[1-S(=O)$_2$CF3] | H | Me | $CH_2OMe$ | O |
| C-12675 | Me(R) | single bond | H | c-Pr[1-S(=O)$_2$CF3] | H | Me | $CH_2OMe$ | O |
| C-12676 | Me(S) | single bond | H | c-Pr[1-S(=O)$_2$CF3] | H | Me | $CH_2OMe$ | O |
| C-12677 | H | single bond | Me | c-Pr[1-(5,6-dihydro-1,4,2-dioxazin-3-yl)] | H | Cl | $CH_2OMe$ | O |
| C-12678 | Me | single bond | H | c-Pr[1-(5,6-dihydro-1,4,2-dioxazin-3-yl)] | H | Cl | $CH_2OMe$ | O |
| C-12679 | Me(R) | single bond | H | c-Pr[1-(5,6-dihydro-1,4,2-dioxazin-3-yl)] | H | Cl | $CH_2OMe$ | O |
| C-12680 | Me(S) | single bond | H | c-Pr[1-(5,6-dihydro-1,4,2-dioxazin-3-yl)] | H | Cl | $CH_2OMe$ | O |
| C-12681 | H | single bond | Me | c-Pr[1-(5,6-dihydro-1,4,2-dioxazin-3-yl)] | H | Me | $CH_2OMe$ | O |
| C-12682 | Me | single bond | H | c-Pr[1-(5,6-dihydro-1,4,2-dioxazin-3-yl)] | H | Me | $CH_2OMe$ | O |
| C-12683 | Me(R) | single bond | H | c-Pr[1-(5,6-dihydro-1,4,2-dioxazin-3-yl)] | H | Me | $CH_2OMe$ | O |
| C-12684 | Me(S) | single bond | H | c-Pr[1-(5,6-dihydro-1,4,2-dioxazin-3-yl)] | H | Me | $CH_2OMe$ | O |
| C-12685 | H | single bond | Me | c-Pr[1-(5-hydroxy-1,3,4-oxadiazol-2-yl)] | H | Cl | $CH_2OMe$ | O |
| C-12686 | Me | single bond | H | c-Pr[1-(5-hydroxy-1,3,4-oxadiazol-2-yl)] | H | Cl | $CH_2OMe$ | O |
| C-12687 | Me(R) | single bond | H | c-Pr[1-(5-hydroxy-1,3,4-oxadiazol-2-yl)] | H | Cl | $CH_2OMe$ | O |
| C-12688 | Me(S) | single bond | H | c-Pr[1-(5-hydroxy-1,3,4-oxadiazol-2-yl)] | H | Cl | $CH_2OMe$ | O |
| C-12689 | H | single bond | Me | c-Pr[1-(5-hydroxy-1,3,4-oxadiazol-2-yl)] | H | Me | $CH_2OMe$ | O |
| C-12690 | Me | single bond | H | c-Pr[1-(5-hydroxy-1,3,4-oxadiazol-2-yl)] | H | Me | $CH_2OMe$ | O |

TABLE 517

| Compound Number | Y | W | Z | $R^1$ | $R^2$ | $R^3$ | $R^{10}$ | A |
|---|---|---|---|---|---|---|---|---|
| C-12691 | Me(R) | single bond | H | c-Pr[1-(5-hydroxy-1,3,4-oxadiazol-2-yl)] | H | Me | $CH_2OMe$ | O |
| C-12692 | Me(S) | single bond | H | c-Pr[1-(5-hydroxy-1,3,4-oxadiazol-2-yl)] | H | Me | $CH_2OMe$ | O |
| C-12693 | H | single bond | Me | c-Pr[1-(pyrimidin-2-yl)] | H | Cl | $CH_2OMe$ | O |
| C-12694 | Me | single bond | H | c-Pr[1-(pyrimidin-2-yl)] | H | Cl | $CH_2OMe$ | O |
| C-12695 | Me(R) | single bond | H | c-Pr[1-(pyrimidin-2-yl)] | H | Cl | $CH_2OMe$ | O |
| C-12696 | Me(S) | single bond | H | c-Pr[1-(pyrimidin-2-yl)] | H | Cl | $CH_2OMe$ | O |
| C-12697 | H | single bond | Me | c-Pr[1-(pyrimidin-2-yl)] | H | Me | $CH_2OMe$ | O |
| C-12698 | Me | single bond | H | c-Pr[1-(pyrimidin-2-yl)] | H | Me | $CH_2OMe$ | O |
| C-12699 | Me(R) | single bond | H | c-Pr[1-(pyrimidin-2-yl)] | H | Me | $CH_2OMe$ | O |
| C-12700 | Me(S) | single bond | H | c-Pr[1-(pyrimidin-2-yl)] | H | Me | $CH_2OMe$ | O |
| C-12701 | H | single bond | Me | t-Bu | H | Cl | $CH_2OMe$ | O |
| C-12702 | Me | single bond | H | t-Bu | H | Cl | $CH_2OMe$ | O |
| C-12703 | Me(R) | single bond | H | t-Bu | H | Cl | $CH_2OMe$ | O |
| C-12704 | Me(S) | single bond | H | t-Bu | H | Cl | $CH_2OMe$ | O |
| C-12705 | H | single bond | Me | t-Bu | H | Me | $CH_2OMe$ | O |
| C-12706 | Me | single bond | H | t-Bu | H | Me | $CH_2OMe$ | O |
| C-12707 | Me(R) | single bond | H | t-Bu | H | Me | $CH_2OMe$ | O |
| C-12708 | Me(S) | single bond | H | t-Bu | H | Me | $CH_2OMe$ | O |
| C-12709 | H | single bond | Me | c-Bu | H | Cl | $CH_2OMe$ | O |
| C-12710 | Me | single bond | H | c-Bu | H | Cl | $CH_2OMe$ | O |
| C-12711 | Me(R) | single bond | H | c-Bu | H | Cl | $CH_2OMe$ | O |
| C-12712 | Me(S) | single bond | H | c-Bu | H | Cl | $CH_2OMe$ | O |
| C-12713 | H | single bond | Me | c-Bu | H | Me | $CH_2OMe$ | O |
| C-12714 | Me | single bond | H | c-Bu | H | Me | $CH_2OMe$ | O |
| C-12715 | Me(R) | single bond | H | c-Bu | H | Me | $CH_2OMe$ | O |
| C-12716 | Me(S) | single bond | H | c-Bu | H | Me | $CH_2OMe$ | O |
| C-12717 | H | single bond | Me | c-Bu(1-CN) | H | Cl | $CH_2OMe$ | O |
| C-12718 | Me | single bond | H | c-Bu(1-CN) | H | Cl | $CH_2OMe$ | O |
| C-12719 | Me(R) | single bond | H | c-Bu(1-CN) | H | Cl | $CH_2OMe$ | O |
| C-12720 | Me(S) | single bond | H | c-Bu(1-CN) | H | Cl | $CH_2OMe$ | O |
| C-12721 | H | single bond | Me | c-Bu(1-CN) | H | Me | $CH_2OMe$ | O |
| C-12722 | Me | single bond | H | c-Bu(1-CN) | H | Me | $CH_2OMe$ | O |
| C-12723 | Me(R) | single bond | H | c-Bu(1-CN) | H | Me | $CH_2OMe$ | O |
| C-12724 | Me(S) | single bond | H | c-Bu(1-CN) | H | Me | $CH_2OMe$ | O |
| C-12725 | H | single bond | Me | c-Bu(3,3-F)$_2$ | H | Cl | $CH_2OMe$ | O |
| C-12726 | Me | single bond | H | c-Bu(3,3-F)$_2$ | H | Cl | $CH_2OMe$ | O |
| C-12727 | Me(R) | single bond | H | c-Bu(3,3-F)$_2$ | H | C | $CH_2OMe$ | O |
| C-12728 | Me(S) | single bond | H | c-Bu(3,3-F)$_2$ | H | Cl | $CH_2OMe$ | O |
| C-12729 | H | single bond | Me | c-Bu(3,3-F)$_2$ | H | Me | $CH_2OMe$ | O |
| C-12730 | Me | single bond | H | c-Bu(3,3-F)$_2$ | H | Me | $CH_2OMe$ | O |
| C-12731 | Me(R) | single bond | H | c-Bu(3,3-F)$_2$ | H | Me | $CH_2OMe$ | O |
| C-12732 | Me(S) | single bond | H | c-Bu(3,3-F)$_2$ | H | Me | $CH_2OMe$ | O |
| C-12733 | H | single bond | Me | oxetan-3-yl | H | Cl | $CH_2OMe$ | O |
| C-12734 | Me | single bond | H | oxetan-3-yl | H | Cl | $CH_2OMe$ | O |

TABLE 518

| Compound Number | Y | W | Z | $R^1$ | $R^2$ | $R^3$ | $R^{10}$ | A |
|---|---|---|---|---|---|---|---|---|
| C-12735 | Me(R) | single bond | H | oxetan-3-yl | H | Cl | $CH_2OMe$ | O |
| C-12736 | Me(S) | single bond | H | oxetan-3-yl | H | Cl | $CH_2OMe$ | O |
| C-12737 | H | single bond | Me | oxetan-3-yl | H | Me | $CH_2OMe$ | O |
| C-12738 | Me | single bond | H | oxetan-3-yl | H | Me | $CH_2OMe$ | O |
| C-12739 | Me(R) | single bond | H | oxetan-3-yl | H | Me | $CH_2OMe$ | O |
| C-12740 | Me(S) | single bond | H | oxetan-3-yl | H | Me | $CH_2OMe$ | O |
| C-12741 | H | single bond | Me | oxetan(3-CN)-3-yl | H | Cl | $CH_2OMe$ | O |
| C-12742 | Me | single bond | H | oxetan(3-CN)-3-yl | H | Cl | $CH_2OMe$ | O |
| C-12743 | Me(R) | single bond | H | oxetan(3-CN)-3-yl | H | Cl | $CH_2OMe$ | O |
| C-12744 | Me(S) | single bond | H | oxetan(3-CN)-3-yl | H | Cl | $CH_2OMe$ | O |
| C-12745 | H | single bond | Me | oxetan(3-CN)-3-yl | H | Me | $CH_2OMe$ | O |
| C-12746 | Me | single bond | H | oxetan(3-CN)-3-yl | H | Me | $CH_2OMe$ | O |
| C-12747 | Me(R) | single bond | H | oxetan(3-CN)-3-yl | H | Me | $CH_2OMe$ | O |
| C-12748 | Me(S) | single bond | H | oxetan(3-CN)-3-yl | H | Me | $CH_2OMe$ | O |
| C-12749 | H | single bond | Me | azetidin[1-C(═O)Me]-3-yl | H | Cl | $CH_2OMe$ | O |
| C-12750 | Me | single bond | H | azetidin[1-C(═O)Me]-3-yl | H | Cl | $CH_2OMe$ | O |
| C-12751 | Me(R) | single bond | H | azetidin[1-C(═O)Me]-3-yl | H | Cl | $CH_2OMe$ | O |
| C-12752 | Me(S) | single bond | H | azetidin[1-C(═O)Me]-3-yl | H | Cl | $CH_2OMe$ | O |
| C-12753 | H | single bond | Me | azetidin[1-C(═O)Me]-3-yl | H | Me | $CH_2OMe$ | O |
| C-12754 | Me | single bond | H | azetidin[1-C(═O)Me]-3-yl | H | Me | $CH_2OMe$ | O |
| C-12755 | Me(R) | single bond | H | azetidin[1-C(═O)Me]-3-yl | H | Me | $CH_2OMe$ | O |
| C-12756 | Me(S) | single bond | H | azetidin[1-C(═O)Me]-3-yl | H | Me | $CH_2OMe$ | O |
| C-12757 | H | single bond | Me | azetidin[1-S(═O)$_2$Me]-3-yl | H | Cl | $CH_2OMe$ | O |
| C-12758 | Me | single bond | H | azetidin[1-S(═O)$_2$Me]-3-yl | H | Cl | $CH_2OMe$ | O |
| C-12759 | Me(R) | single bond | H | azetidin[1-S(═O)$_2$Me]-3-yl | H | Cl | $CH_2OMe$ | O |
| C-12760 | Me(S) | single bond | H | azetidin[1-S(═O)$_2$Me]-3-yl | H | Cl | $CH_2OMe$ | O |
| C-12761 | H | single bond | Me | azetidin[1-S(═O)$_2$Me]-3-yl | H | Me | $CH_2OMe$ | O |
| C-12762 | Me | single bond | H | azetidin[1-S(═O)$_2$Me]-3-yl | H | Me | $CH_2OMe$ | O |
| C-12763 | Me(R) | single bond | H | azetidin[1-S(═O)$_2$Me]-3-yl | H | Me | $CH_2OMe$ | O |
| C-12764 | Me(S) | single bond | H | azetidin[1-S(═O)$_2$Me]-3-yl | H | Me | $CH_2OMe$ | O |
| C-12765 | H | single bond | Me | azetidin[1-S(═O)$_2$CHF$_2$]-3-yl | H | Cl | $CH_2OMe$ | O |
| C-12766 | Me | single bond | H | azetidin[1-S(═O)$_2$CHF$_2$]-3-yl | H | Cl | $CH_2OMe$ | O |
| C-12767 | Me(R) | single bond | H | azetidin[1-S(═O)$_2$CHF$_2$]-3-yl | H | Cl | $CH_2OMe$ | O |
| C-12768 | Me(S) | single bond | H | azetidin[1-S(═O)$_2$CHF$_2$]-3-yl | H | Cl | $CH_2OMe$ | O |
| C-12769 | H | single bond | Me | azetidin[1-S(═O)$_2$CHF$_2$]-3-yl | H | Me | $CH_2OMe$ | O |
| C-12770 | Me | single bond | H | azetidin[1-S(═O)$_2$CHF$_2$]-3-yl | H | Me | $CH_2OMe$ | O |
| C-12771 | Me(R) | single bond | H | azetidin[1-S(═O)$_2$CHF$_2$]-3-yl | H | Me | $CH_2OMe$ | O |
| C-12772 | Me(S) | single bond | H | azetidin[1-S(═O)$_2$CHF$_2$]-3-yl | H | Me | $CH_2OMe$ | O |
| C-12773 | H | single bond | Me | c-Pen | H | Cl | $CH_2OMe$ | O |
| C-12774 | Me | single bond | H | c-Pen | H | Cl | $CH_2OMe$ | O |
| C-12775 | Me(R) | single bond | H | c-Pen | H | Cl | $CH_2OMe$ | O |
| C-12776 | Me(S) | single bond | H | c-Pen | H | Cl | $CH_2OMe$ | O |
| C-12777 | H | single bond | Me | c-Pen | H | Me | $CH_2OMe$ | O |
| C-12778 | Me | single bond | H | c-Pen | H | Me | $CH_2OMe$ | O |

TABLE 519

| Compound Number | Y | W | Z | $R^1$ | $R^2$ | $R^3$ | $R^{10}$ | A |
|---|---|---|---|---|---|---|---|---|
| C-12779 | Me(R) | single bond | H | c-Pen | H | Me | $CH_2OMe$ | O |
| C-12780 | Me(S) | single bond | H | c-Pen | H | Me | $CH_2OMe$ | O |
| C-12781 | H | single bond | Me | tetrahydrofuran-3-yl | H | Cl | $CH_2OMe$ | O |
| C-12782 | Me | single bond | H | tetrahydrofuran-3-yl | H | Cl | $CH_2OMe$ | O |
| C-12783 | Me(R) | single bond | H | tetrahydrofuran-3-yl | H | Cl | $CH_2OMe$ | O |
| C-12784 | Me(S) | single bond | H | tetrahydrofuran-3-yl | H | Cl | $CH_2OMe$ | O |
| C-12785 | H | single bond | Me | tetrahydrofuran-3-yl | H | Me | $CH_2OMe$ | O |
| C-12786 | Me | single bond | H | tetrahydrofuran-3-yl | H | Me | $CH_2OMe$ | O |
| C-12787 | Me(R) | single bond | H | tetrahydrofuran-3-yl | H | Me | $CH_2OMe$ | O |
| C-12788 | Me(S) | single bond | H | tetrahydrofuran-3-yl | H | Me | $CH_2OMe$ | O |
| C-12789 | H | single bond | Me | tetrahydrothiophen-3-yl | H | Cl | $CH_2OMe$ | O |
| C-12790 | Me | single bond | H | tetrahydrothiophen-3-yl | H | Cl | $CH_2OMe$ | O |
| C-12791 | Me(R) | single bond | H | tetrahydrothiophen-3-yl | H | Cl | $CH_2OMe$ | O |
| C-12792 | Me(S) | single bond | H | tetrahydrothiophen-3-yl | H | Cl | $CH_2OMe$ | O |
| C-12793 | H | single bond | Me | tetrahydrothiophen-3-yl | H | Me | $CH_2OMe$ | O |
| C-12794 | Me | single bond | H | tetrahydrothiophen-3-yl | H | Me | $CH_2OMe$ | O |
| C-12795 | Me(R) | single bond | H | tetrahydrothiophen-3-yl | H | Me | $CH_2OMe$ | O |
| C-12796 | Me(S) | single bond | H | tetrahydrothiophen-3-yl | H | Me | $CH_2OMe$ | O |
| C-12797 | H | single bond | Me | c-Pen(1-CN) | H | Cl | $CH_2OMe$ | O |
| C-12798 | Me | single bond | H | c-Pen(1-CN) | H | Cl | $CH_2OMe$ | O |
| C-12799 | Me(R) | single bond | H | c-Pen(1-CN) | H | Cl | $CH_2OMe$ | O |

TABLE 519-continued

| Compound Number | Y | W | Z | $R^1$ | $R^2$ | $R^3$ | $R^{10}$ | A |
|---|---|---|---|---|---|---|---|---|
| C-12800 | Me(S) | single bond | H | c-Pen(1-CN) | H | Cl | $CH_2OMe$ | O |
| C-12801 | H | single bond | Me | c-Pen(1-CN) | H | Me | $CH_2OMe$ | O |
| C-12802 | Me | single bond | H | c-Pen(1-CN) | H | Me | $CH_2OMe$ | O |
| C-12803 | Me(R) | single bond | H | c-Pen(1-CN) | H | Me | $CH_2OMe$ | O |
| C-12804 | Me(S) | single bond | H | c-Pen(1-CN) | H | Me | $CH_2OMe$ | O |
| C-12805 | H | single bond | Me | tetrahydrofuran(3-CN)-3-yl | H | Cl | $CH_2OMe$ | O |
| C-12806 | Me | single bond | H | tetrahydrofuran(3-CN)-3-yl | H | Cl | $CH_2OMe$ | O |
| C-12807 | Me(R) | single bond | H | tetrahydrofuran(3-CN)-3-yl | H | Cl | $CH_2OMe$ | O |
| C-12808 | Me(S) | single bond | H | tetrahydrofuran(3-CN)-3-yl | H | Cl | $CH_2OMe$ | O |
| C-12809 | H | single bond | Me | tetrahydrofuran(3-CN)-3-yl | H | Me | $CH_2OMe$ | O |
| C-12810 | Me | single bond | H | tetrahydrofuran(3-CN)-3-yl | H | Me | $CH_2OMe$ | O |
| C-12811 | Me(R) | single bond | H | tetrahydrofuran(3-CN)-3-yl | H | Me | $CH_2OMe$ | O |
| C-12812 | Me(S) | single bond | H | tetrahydrofuran(3-CN)-3-yl | H | Me | $CH_2OMe$ | O |
| C-12813 | H | single bond | Me | tetrahydrothiophen(3-CN)-3-yl | H | Cl | $CH_2OMe$ | O |
| C-12814 | Me | single bond | H | tetrahydrothiophen(3-CN)-3-yl | H | Cl | $CH_2OMe$ | O |
| C-12815 | Me(R) | single bond | H | tetrahydrothiophen(3-CN)-3-yl | H | Cl | $CH_2OMe$ | O |
| C-12816 | Me(S) | single bond | H | tetrahydrothiophen(3-CN)-3-yl | H | Cl | $CH_2OMe$ | O |
| C-12817 | H | single bond | Me | tetrahydrothiophen(3-CN)-3-yl | H | Me | $CH_2OMe$ | O |
| C-12818 | Me | single bond | H | tetrahydrothiophen(3-CN)-3-yl | H | Me | $CH_2OMe$ | O |
| C-12819 | Me(R) | single bond | H | tetrahydrothiophen(3-CN)-3-yl | H | Me | $CH_2OMe$ | O |
| C-12820 | Me(S) | single bond | H | tetrahydrothiophen(3-CN)-3-yl | H | Me | $CH_2OMe$ | O |
| C-12821 | H | single bond | Me | bicyclo[1.1.1]]pentan-1-yl | H | Cl | $CH_2OMe$ | O |
| C-12822 | Me | single bond | H | bicyclo[1.1.1]]pentan-1-yl | H | Cl | $CH_2OMe$ | O |

TABLE 520

| Compound Number | Y | W | Z | $R^1$ | $R^2$ | $R^3$ | $R^{10}$ | A |
|---|---|---|---|---|---|---|---|---|
| C-12823 | Me(R) | single bond | H | bicyclo[1.1.1]]pentan-1-yl | H | Cl | $CH_2OMe$ | O |
| C-12824 | Me(S) | single bond | H | bicyclo[1.1.1]]pentan-1-yl | H | Cl | $CH_2OMe$ | O |
| C-12825 | H | single bond | Me | bicyclo[1.1.1]]pentan-1-yl | H | Me | $CH_2OMe$ | O |
| C-12826 | Me | single bond | H | bicyclo[1.1.1]]pentan-1-yl | H | Me | $CH_2OMe$ | O |
| C-12827 | Me(R) | single bond | H | bicyclo[1.1.1]pentan-1-yl | H | Me | $CH_2OMe$ | O |
| C-12828 | Me(S) | single bond | H | bicyclo[1.1.1]]pentan-1-yl | H | Me | $CH_2OMe$ | O |
| C-12829 | H | single bond | Me | c-Hex | H | Cl | $CH_2OMe$ | O |
| C-12830 | Me | single bond | H | c-Hex | H | Cl | $CH_2OMe$ | O |
| C-12831 | Me(R) | single bond | H | c-Hex | H | Cl | $CH_2OMe$ | O |
| C-12832 | Me(S) | single bond | H | c-Hex | H | Cl | $CH_2OMe$ | O |
| C-12833 | H | single bond | Me | c-Hex | H | Me | $CH_2OMe$ | O |
| C-12834 | Me | single bond | H | c-Hex | H | Me | $CH_2OMe$ | O |
| C-12835 | Me(R) | single bond | H | c-Hex | H | Me | $CH_2OMe$ | O |
| C-12836 | Me(S) | single bond | H | c-Hex | H | Me | $CH_2OMe$ | O |
| C-12837 | H | single bond | Me | tetrahydropyran-4-yl | H | Cl | $CH_2OMe$ | O |
| C-12838 | Me | single bond | H | tetrahydropyran-4-yl | H | Cl | $CH_2OMe$ | O |
| C-12839 | Me(R) | single bond | H | tetrahydropyran-4-yl | H | Cl | $CH_2OMe$ | O |
| C-12840 | Me(S) | single bond | H | tetrahydropyran-4-yl | H | Cl | $CH_2OMe$ | O |
| C-12841 | H | single bond | Me | tetrahydropyran-4-yl | H | Me | $CH_2OMe$ | O |
| C-12842 | Me | single bond | H | tetrahydropyran-4-yl | H | Me | $CH_2OMe$ | O |
| C-12843 | Me(R) | single bond | H | tetrahydropyran-4-yl | H | Me | $CH_2OMe$ | O |
| C-12844 | Me(S) | single bond | H | tetrahydropyran-4-yl | H | Me | $CH_2OMe$ | O |
| C-12845 | H | single bond | Me | tetrahydrothiopyran-4-yl | H | Cl | $CH_2OMe$ | O |
| C-12846 | Me | single bond | H | tetrahydrothiopyran-4-yl | H | Cl | $CH_2OMe$ | O |
| C-12847 | Me(R) | single bond | H | tetrahydrothiopyran-4-yl | H | Cl | $CH_2OMe$ | O |
| C-12848 | Me(S) | single bond | H | tetrahydrothiopyran-4-yl | H | Cl | $CH_2OMe$ | O |
| C-12849 | H | single bond | Me | tetrahydrothiopyran-4-yl | H | Me | $CH_2OMe$ | O |
| C-12850 | Me | single bond | H | tetrahydrothiopyran-4-yl | H | Me | $CH_2OMe$ | O |
| C-12851 | Me(R) | single bond | H | tetrahydrothiopyran-4-yl | H | Me | $CH_2OMe$ | O |
| C-12852 | Me(S) | single bond | H | tetrahydrothiopyran-4-yl | H | Me | $CH_2OMe$ | O |
| C-12853 | H | single bond | Me | c-Hex(1-CN) | H | Cl | $CH_2OMe$ | O |
| C-12854 | Me | single bond | H | c-Hex(1-CN) | H | Cl | $CH_2OMe$ | O |
| C-12855 | Me(R) | single bond | H | c-Hex(1-CN) | H | Cl | $CH_2OMe$ | O |
| C-12856 | Me(S) | single bond | H | c-Hex(1-CN) | H | Cl | $CH_2OMe$ | O |
| C-12857 | H | single bond | Me | c-Hex(1-CN) | H | Me | $CH_2OMe$ | O |
| C-12858 | Me | single bond | H | c-Hex(1-CN) | H | Me | $CH_2OMe$ | O |
| C-12859 | Me(R) | single bond | H | c-Hex(1-CN) | H | Me | $CH_2OMe$ | O |
| C-12860 | Me(S) | single bond | H | c-Hex(1-CN) | H | Me | $CH_2OMe$ | O |
| C-12861 | H | single bond | Me | tetrahydropyran(4-CN)-4-yl | H | Cl | $CH_2OMe$ | O |
| C-12862 | Me | single bond | H | tetrahydropyran(4-CN)-4-yl | H | Cl | $CH_2OMe$ | O |
| C-12863 | Me(R) | single bond | H | tetrahydropyran(4-CN)-4-yl | H | Cl | $CH_2OMe$ | O |
| C-12864 | Me(S) | single bond | H | tetrahydropyran(4-CN)-4-yl | H | Cl | $CH_2OMe$ | O |

TABLE 520-continued

| Compound Number | Y | W | Z | $R^1$ | $R^2$ | $R^3$ | $R^{10}$ | A |
|---|---|---|---|---|---|---|---|---|
| C-12865 | H | single bond | Me | tetrahydropyran(4-CN)-4-yl | H | Me | $CH_2OMe$ | O |
| C-12866 | Me | single bond | H | tetrahydropyran(4-CN)-4-yl | H | Me | $CH_2OMe$ | O |

TABLE 521

| Compound Number | Y | W | Z | $R^1$ | $R^2$ | $R^3$ | $R^{10}$ | A |
|---|---|---|---|---|---|---|---|---|
| C-12867 | Me(R) | single bond | H | tetrahydropyran(4-CN)-4-yl | H | Me | $CH_2OMe$ | O |
| C-12868 | Me(S) | single bond | H | tetrahydropyran(4-CN)-4-yl | H | Me | $CH_2OMe$ | O |
| C-12869 | H | single bond | Me | tetrahydrothiopyran(4-CN)-4-yl | H | Cl | $CH_2OMe$ | O |
| C-12870 | Me | single bond | H | tetrahydrothiopyran(4-CN)-4-yl | H | Cl | $CH_2OMe$ | O |
| C-12871 | Me(R) | single bond | H | tetrahydrothiopyran(4-CN)-4-yl | H | Cl | $CH_2OMe$ | O |
| C-12872 | Me(S) | single bond | H | tetrahydrothiopyran(4-CN)-4-yl | H | Cl | $CH_2OMe$ | O |
| C-12873 | H | single bond | Me | tetrahydrothiopyran(4-CN)-4-yl | H | Me | $CH_2OMe$ | O |
| C-12874 | Me | single bond | H | tetrahydrothiopyran(4-CN)-4-yl | H | Me | $CH_2OMe$ | O |
| C-12875 | Me(R) | single bond | H | tetrahydrothiopyran(4-CN)-4-yl | H | Me | $CH_2OMe$ | O |
| C-12876 | Me(S) | single bond | H | tetrahydrothiopyran(4-CN)-4-yl | H | Me | $CH_2OMe$ | O |
| C-12877 | H | single bond | Me | $CH_2$(c-Pr) | H | Cl | $CH_2OMe$ | O |
| C-12878 | Me | single bond | H | $CH_2$(c-Pr) | H | Cl | $CH_2OMe$ | O |
| C-12879 | Me(R) | single bond | H | $CH_2$(c-Pr) | H | Cl | $CH_2OMe$ | O |
| C-12880 | Me(S) | single bond | H | $CH_2$(c-Pr) | H | Cl | $CH_2OMe$ | O |
| C-12881 | H | single bond | Me | $CH_2$(c-Pr) | H | Me | $CH_2OMe$ | O |
| C-12882 | Me | single bond | H | $CH_2$(c-Pr) | H | Me | $CH_2OMe$ | O |
| C-12883 | Me(R) | single bond | H | $CH_2$(c-Pr) | H | Me | $CH_2OMe$ | O |
| C-12884 | Me(S) | single bond | H | $CH_2$(c-Pr) | H | Me | $CH_2OMe$ | O |
| C-12885 | H | single bond | Me | $CH_2$[c-Pr(1-CN)] | H | Cl | $CH_2OMe$ | O |
| C-12886 | Me | single bond | H | $CH_2$[c-Pr(1-CN)] | H | Cl | $CH_2OMe$ | O |
| C-12887 | Me(R) | single bond | H | $CH_2$[c-Pr(1-CN)] | H | Cl | $CH_2OMe$ | O |
| C-12888 | Me(S) | single bond | H | $CH_2$[c-Pr(1-CN)] | H | Cl | $CH_2OMe$ | O |
| C-12889 | H | single bond | Me | $CH_2$[c-Pr(1-CN)] | H | Me | $CH_2OMe$ | O |
| C-12890 | Me | single bond | H | $CH_2$[c-Pr(1-CN)] | H | Me | $CH_2OMe$ | O |
| C-12891 | Me(R) | single bond | H | $CH_2$[c-Pr(1-CN)] | H | Me | $CH_2OMe$ | O |
| C-12892 | Me(S) | single bond | H | $CH_2$[c-Pr(1-CN)] | H | Me | $CH_2OMe$ | O |
| C-12893 | H | single bond | Me | CH(Me)(c-Pr) | H | Cl | $CH_2OMe$ | O |
| C-12894 | Me | single bond | H | CH(Me)(c-Pr) | H | Cl | $CH_2OMe$ | O |
| C-12895 | Me(R) | single bond | H | CH(Me)(c-Pr) | H | Cl | $CH_2OMe$ | O |
| C-12896 | Me(S) | single bond | H | CH(Me)(c-Pr) | H | Cl | $CH_2OMe$ | O |
| C-12897 | H | single bond | Me | CH(Me)(c-Pr) | H | Me | $CH_2OMe$ | O |
| C-12898 | Me | single bond | H | CH(Me)(c-Pr) | H | Me | $CH_2OMe$ | O |
| C-12899 | Me(R) | single bond | H | CH(Me)(c-Pr) | H | Me | $CH_2OMe$ | O |
| C-12900 | Me(S) | single bond | H | CH(Me)(c-Pr) | H | Me | $CH_2OMe$ | O |
| C-12901 | H | single bond | Me | CH(Me)$CH_2OMe$ | H | Cl | $CH_2OMe$ | O |
| C-12902 | Me | single bond | H | CH(Me)$CH_2OMe$ | H | Cl | $CH_2OMe$ | O |
| C-12903 | Me(R) | single bond | H | CH(Me)$CH_2OMe$ | H | Cl | $CH_2OMe$ | O |
| C-12904 | Me(S) | single bond | H | CH(Me)$CH_2OMe$ | H | Cl | $CH_2OMe$ | O |
| C-12905 | H | single bond | Me | CH(Me)$CH_2OMe$ | H | Me | $CH_2OMe$ | O |
| C-12906 | Me | single bond | H | CH(Me)$CH_2OMe$ | H | Me | $CH_2OMe$ | O |
| C-12907 | Me(R) | single bond | H | CH(Me)$CH_2OMe$ | H | Me | $CH_2OMe$ | O |
| C-12908 | Me(S) | single bond | H | CH(Me)$CH_2OMe$ | H | Me | $CH_2OMe$ | O |
| C-12909 | H | single bond | Me | $CH_2CH{=}CH_2$ | H | Cl | $CH_2OMe$ | O |
| C-12910 | Me | single bond | H | $CH_2CH{=}CH_2$ | H | Cl | $CH_2OMe$ | O |

TABLE 522

| Compound Number | Y | W | Z | $R^1$ | $R^2$ | $R^3$ | $R^{10}$ | A |
|---|---|---|---|---|---|---|---|---|
| C-12911 | Me(R) | single bond | H | $CH_2CH{=}CH_2$ | H | Cl | $CH_2OMe$ | O |
| C-12912 | Me(S) | single bond | H | $CH_2CH{=}CH_2$ | H | Cl | $CH_2OMe$ | O |
| C-12913 | H | single bond | Me | $CH_2CH{=}CH_2$ | H | Me | $CH_2OMe$ | O |
| C-12914 | Me | single bond | H | $CH_2CH{=}CH_2$ | H | Me | $CH_2OMe$ | O |
| C-12915 | Me(R) | single bond | H | $CH_2CH{=}CH_2$ | H | Me | $CH_2OMe$ | O |
| C-12916 | Me(S) | single bond | H | $CH_2CH{=}CH_2$ | H | Me | $CH_2OMe$ | O |
| C-12917 | H | single bond | Me | $CH_2C{\equiv}CH$ | H | Cl | $CH_2OMe$ | O |
| C-12918 | Me | single bond | H | $CH_2C{\equiv}CH$ | H | Cl | $CH_2OMe$ | O |
| C-12919 | Me(R) | single bond | H | $CH_2C{\equiv}CH$ | H | Cl | $CH_2OMe$ | O |
| C-12920 | Me(S) | single bond | H | $CH_2C{\equiv}CH$ | H | Cl | $CH_2OMe$ | O |
| C-12921 | H | single bond | Me | $CH_2C{\equiv}CH$ | H | Me | $CH_2OMe$ | O |
| C-12922 | Me | single bond | H | $CH_2C{\equiv}CH$ | H | Me | $CH_2OMe$ | O |

TABLE 522-continued

| Compound Number | Y | W | Z | $R^1$ | $R^2$ | $R^3$ | $R^{10}$ | A |
|---|---|---|---|---|---|---|---|---|
| C-12923 | Me(R) | single bond | H | $CH_2C≡CH$ | H | Me | $CH_2OMe$ | O |
| C-12924 | Me(S) | single bond | H | $CH_2C≡CH$ | H | Me | $CH_2OMe$ | O |
| C-12925 | H | single bond | Me | $CH_2CN$ | H | Cl | $CH_2OMe$ | O |
| C-12926 | Me | single bond | H | $CH_2CN$ | H | Cl | $CH_2OMe$ | O |
| C-12927 | Me(R) | single bond | H | $CH_2CN$ | H | Cl | $CH_2OMe$ | O |
| C-12928 | Me(S) | single bond | H | $CH_2CN$ | H | Cl | $CH_2OMe$ | O |
| C-12929 | H | single bond | Me | $CH_2CN$ | H | Me | $CH_2OMe$ | O |
| C-12930 | Me | single bond | H | $CH_2CN$ | H | Me | $CH_2OMe$ | O |
| C-12931 | Me(R) | single bond | H | $CH_2CN$ | H | Me | $CH_2OMe$ | O |
| C-12932 | Me(S) | single bond | H | $CH_2CN$ | H | Me | $CH_2OMe$ | O |
| C-12933 | H | single bond | Me | CH(Me)CN | H | Cl | $CH_2OMe$ | O |
| C-12934 | Me | single bond | H | CH(Me)CN | H | Cl | $CH_2OMe$ | O |
| C-12935 | Me(R) | single bond | H | CH(Me)CN | H | Cl | $CH_2OMe$ | O |
| C-12936 | Me(S) | single bond | H | CH(Me)CN | H | Cl | $CH_2OMe$ | O |
| C-12937 | H | single bond | Me | CH(Me)CN | H | Me | $CH_2OMe$ | O |
| C-12938 | Me | single bond | H | CH(Me)CN | H | Me | $CH_2OMe$ | O |
| C-12939 | Me(R) | single bond | H | CH(Me)CN | H | Me | $CH_2OMe$ | O |
| C-12940 | Me(S) | single bond | H | CH(Me)CN | H | Me | $CH_2OMe$ | O |
| C-12941 | H | single bond | Me | $C(Me)_2CN$ | H | Cl | $CH_2OMe$ | O |
| C-12942 | Me | single bond | H | $C(Me)_2CN$ | H | Cl | $CH_2OMe$ | O |
| C-12943 | Me(R) | single bond | H | $C(Me)_2CN$ | H | Cl | $CH_2OMe$ | O |
| C-12944 | Me(S) | single bond | H | $C(Me)_2CN$ | H | Cl | $CH_2OMe$ | O |
| C-12945 | H | single bond | Me | $C(Me)_2CN$ | H | Me | $CH_2OMe$ | O |
| C-12946 | Me | single bond | H | $C(Me)_2CN$ | H | Me | $CH_2OMe$ | O |
| C-12947 | Me(R) | single bond | H | $C(Me)_2CN$ | H | Me | $CH_2OMe$ | O |
| C-12948 | Me(S) | single bond | H | $C(Me)_2CN$ | H | Me | $CH_2OMe$ | O |
| C-12949 | H | single bond | Me | C(Me)(i-Pr)CN | H | Cl | $CH_2OMe$ | O |
| C-12950 | Me | single bond | H | C(Me)(i-Pr)CN | H | Cl | $CH_2OMe$ | O |
| C-12951 | Me(R) | single bond | H | C(Me)(i-Pr)CN | H | Cl | $CH_2OMe$ | O |
| C-12952 | Me(S) | single bond | H | C(Me)(i-Pr)CN | H | Cl | $CH_2OMe$ | O |
| C-12953 | H | single bond | Me | C(Me)(i-Pr)CN | H | Me | $CH_2OMe$ | O |
| C-12954 | Me | single bond | H | C(Me)(i-Pr)CN | H | Me | $CH_2OMe$ | O |

TABLE 523

| Compound Number | Y | W | Z | $R^1$ | $R^2$ | $R^3$ | $R^{10}$ | A |
|---|---|---|---|---|---|---|---|---|
| C-12955 | Me(R) | single bond | H | C(Me)(i-Pr)CN | H | Me | $CH_2OMe$ | O |
| C-12956 | Me(S) | single bond | H | C(Me)(i-Pr)CN | H | Me | $CH_2OMe$ | O |
| C-12957 | H | single bond | Me | OMe | H | Cl | $CH_2OMe$ | O |
| C-12958 | Me | single bond | H | OMe | H | Cl | $CH_2OMe$ | O |
| C-12959 | Me(R) | single bond | H | OMe | H | Cl | $CH_2OMe$ | O |
| C-12960 | Me(S) | single bond | H | OMe | H | Cl | $CH_2OMe$ | O |
| C-12961 | H | single bond | Me | OMe | H | Me | $CH_2OMe$ | O |
| C-12962 | Me | single bond | H | OMe | H | Me | $CH_2OMe$ | O |
| C-12963 | Me(R) | single bond | H | OMe | H | Me | $CH_2OMe$ | O |
| C-12964 | Me(S) | single bond | H | OMe | H | Me | $CH_2OMe$ | O |
| C-12965 | H | single bond | Me | CH═NOMe | H | Cl | $CH_2OMe$ | O |
| C-12966 | Me | single bond | H | CH═NOMe | H | Cl | $CH_2OMe$ | O |
| C-12967 | Me(R) | single bond | H | CH═NOMe | H | Cl | $CH_2OMe$ | O |
| C-12968 | Me(S) | single bond | H | CH═NOMe | H | Cl | $CH_2OMe$ | O |
| C-12969 | H | single bond | Me | CH═NOMe | H | Me | $CH_2OMe$ | O |
| C-12970 | Me | single bond | H | CH═NOMe | H | Me | $CH_2OMe$ | O |
| C-12971 | Me(R) | single bond | H | CH═NOMe | H | Me | $CH_2OMe$ | O |
| C-12972 | Me(S) | single bond | H | CH═NOMe | H | Me | $CH_2OMe$ | O |
| C-12973 | H | single bond | Me | morpholin-4-yl | H | Cl | $CH_2OMe$ | O |
| C-12974 | Me | single bond | H | morpholin-4-yl | H | Cl | $CH_2OMe$ | O |
| C-12975 | Me(R) | single bond | H | morpholin-4-yl | H | Cl | $CH_2OMe$ | O |
| C-12976 | Me(S) | single bond | H | morpholin-4-yl | H | Cl | $CH_2OMe$ | O |
| C-12977 | H | single bond | Me | morpholin-4-yl | H | Me | $CH_2OMe$ | O |
| C-12978 | Me | single bond | H | morpholin-4-yl | H | Me | $CH_2OMe$ | O |
| C-12979 | Me(R) | single bond | H | morpholin-4-yl | H | Me | $CH_2OMe$ | O |
| C-12980 | Me(S) | single bond | H | morpholin-4-yl | H | Me | $CH_2OMe$ | O |
| C-12981 | H | single bond | Me | Ph | H | Cl | $CH_2OMe$ | O |
| C-12982 | Me | single bond | H | Ph | H | Cl | $CH_2OMe$ | O |
| C-12983 | Me(R) | single bond | H | Ph | H | Cl | $CH_2OMe$ | O |
| C-12984 | Me(S) | single bond | H | Ph | H | Cl | $CH_2OMe$ | O |
| C-12985 | H | single bond | Me | Ph | H | Me | $CH_2OMe$ | O |
| C-12986 | Me | single bond | H | Ph | H | Me | $CH_2OMe$ | O |
| C-12987 | Me(R) | single bond | H | Ph | H | Me | $CH_2OMe$ | O |
| C-12988 | Me(S) | single bond | H | Ph | H | Me | $CH_2OMe$ | O |
| C-12989 | H | single bond | Me | $CH_2Ph$ | H | Cl | $CH_2OMe$ | O |

TABLE 523-continued

| Compound Number | Y | W | Z | $R^1$ | $R^2$ | $R^3$ | $R^{10}$ | A |
|---|---|---|---|---|---|---|---|---|
| C-12990 | Me | single bond | H | $CH_2Ph$ | H | Cl | $CH_2OMe$ | O |
| C-12991 | Me(R) | single bond | H | $CH_2Ph$ | H | Cl | $CH_2OMe$ | O |
| C-12992 | Me(S) | single bond | H | $CH_2Ph$ | H | Cl | $CH_2OMe$ | O |
| C-12993 | H | single bond | Me | $CH_2Ph$ | H | Me | $CH_2OMe$ | O |
| C-12994 | Me | single bond | H | $CH_2Ph$ | H | Me | $CH_2OMe$ | O |
| C-12995 | Me(R) | single bond | H | $CH_2Ph$ | H | Me | $CH_2OMe$ | O |
| C-12996 | Me(S) | single bond | H | $CH_2Ph$ | H | Me | $CH_2OMe$ | O |
| C-12997 | H | single bond | Me | thiazole-2-yl | H | Cl | $CH_2OMe$ | O |
| C-12998 | Me | single bond | H | thiazole-2-yl | H | Cl | $CH_2OMe$ | O |

TABLE 524

| Compound Number | Y | W | Z | $R^1$ | $R^2$ | $R^3$ | $R^{10}$ | A |
|---|---|---|---|---|---|---|---|---|
| C-12999 | Me(R) | single bond | H | thiazole-2-yl | H | Cl | $CH_2OMe$ | O |
| C-13000 | Me(S) | single bond | H | thiazole-2-yl | H | Cl | $CH_2OMe$ | O |
| C-13001 | H | single bond | Me | thiazole-2-yl | H | Me | $CH_2OMe$ | O |
| C-13002 | Me | single bond | H | thiazole-2-yl | H | Me | $CH_2OMe$ | O |
| C-13003 | Me(R) | single bond | H | thiazole-2-yl | H | Me | $CH_2OMe$ | O |
| C-13004 | Me(S) | single bond | H | thiazole-2-yl | H | Me | $CH_2OMe$ | O |
| C-13005 | H | single bond | Me | 1-Me-pyrazol-3-yl | H | Cl | $CH_2OMe$ | O |
| C-13006 | Me | single bond | H | 1-Me-pyrazol-3-yl | H | Cl | $CH_2OMe$ | O |
| C-13007 | Me(R) | single bond | H | 1-Me-pyrazol-3-yl | H | Cl | $CH_2OMe$ | O |
| C-13008 | Me(S) | single bond | H | 1-Me-pyrazol-3-yl | H | Cl | $CH_2OMe$ | O |
| C-13009 | H | single bond | Me | 1-Me-pyrazol-3-yl | H | Me | $CH_2OMe$ | O |
| C-13010 | Me | single bond | H | 1-Me-pyrazol-3-yl | H | Me | $CH_2OMe$ | O |
| C-13011 | Me(R) | single bond | H | 1-Me-pyrazol-3-yl | H | Me | $CH_2OMe$ | O |
| C-13012 | Me(S) | single bond | H | 1-Me-pyrazol-3-yl | H | Me | $CH_2OMe$ | O |
| C-13013 | H | single bond | Me | 1-Me-pyrazol-5-yl | H | Cl | $CH_2OMe$ | O |
| C-13014 | Me | single bond | H | 1-Me-pyrazol-5-yl | H | Cl | $CH_2OMe$ | O |
| C-13015 | Me(R) | single bond | H | 1-Me-pyrazol-5-yl | H | Cl | $CH_2OMe$ | O |
| C-13016 | Me(S) | single bond | H | 1-Me-pyrazol-5-yl | H | Cl | $CH_2OMe$ | O |
| C-13017 | H | single bond | Me | 1-Me-pyrazol-5-yl | H | Me | $CH_2OMe$ | O |
| C-13018 | Me | single bond | H | 1-Me-pyrazol-5-yl | H | Me | $CH_2OMe$ | O |
| C-13019 | Me(R) | single bond | H | 1-Me-pyrazol-5-yl | H | Me | $CH_2OMe$ | O |
| C-13020 | Me(S) | single bond | H | 1-Me-pyrazol-5-yl | H | Me | $CH_2OMe$ | O |
| C-13021 | H | single bond | Me | $CH_2$(pyrimidin-2-yl) | H | Cl | $CH_2OMe$ | O |
| C-13022 | Me | single bond | H | $CH_2$(pyrimidin-2-yl) | H | Cl | $CH_2OMe$ | O |
| C-13023 | Me(R) | single bond | H | $CH_2$(pyrimidin-2-yl) | H | Cl | $CH_2OMe$ | O |
| C-13024 | Me(S) | single bond | H | $CH_2$(pyrimidin-2-yl) | H | Cl | $CH_2OMe$ | O |
| C-13025 | H | single bond | Me | $CH_2$(pyrimidin-2-yl) | H | Me | $CH_2OMe$ | O |
| C-13026 | Me | single bond | H | $CH_2$(pyrimidin-2-yl) | H | Me | $CH_2OMe$ | O |
| C-13027 | Me(R) | single bond | H | $CH_2$(pyrimidin-2-yl) | H | Me | $CH_2OMe$ | O |
| C-13028 | Me(S) | single bond | H | $CH_2$(pyrimidin-2-yl) | H | Me | $CH_2OMe$ | O |
| C-13029 | H | single bond | Me | $—CH_2CH_2CH_2—$ | | Cl | $CH_2OMe$ | O |
| C-13030 | Me | single bond | H | $—CH_2CH_2CH_2—$ | | Cl | $CH_2OMe$ | O |
| C-13031 | Me(R) | single bond | H | $—CH_2CH_2CH_2—$ | | Cl | $CH_2OMe$ | O |
| C-13032 | Me(S) | single bond | H | $—CH_2CH_2CH_2—$ | | Cl | $CH_2OMe$ | O |
| C-13033 | H | single bond | Me | $—CH_2CH_2CH_2—$ | | Me | $CH_2OMe$ | O |
| C-13034 | Me | single bond | H | $—CH_2CH_2CH_2—$ | | Me | $CH_2OMe$ | O |
| C-13035 | Me(R) | single bond | H | $—CH_2CH_2CH_2—$ | | Me | $CH_2OMe$ | O |
| C-13036 | Me(S) | single bond | H | $—CH_2CH_2CH_2—$ | | Me | $CH_2OMe$ | O |
| C-13037 | H | single bond | Me | $—CH_2CH_2OCH_2CH_2—$ | | Cl | $CH_2OMe$ | O |
| C-13038 | Me | single bond | H | $—CH_2CH_2OCH_2CH_2—$ | | Cl | $CH_2OMe$ | O |
| C-13039 | Me(R) | single bond | H | $—CH_2CH_2OCH_2CH_2—$ | | Cl | $CH_2OMe$ | O |
| C-13040 | Me(S) | single bond | H | $—CH_2CH_2OCH_2CH_2—$ | | Cl | $CH_2OMe$ | O |
| C-13041 | H | single bond | Me | $—CH_2CH_2OCH_2CH_2—$ | | Me | $CH_2OMe$ | O |
| C-13042 | Me | single bond | H | $—CH_2CH_2OCH_2CH_2—$ | | Me | $CH_2OMe$ | O |

TABLE 525

| Compound Number | Y | W | Z | $R^1$ | $R^2$ | $R^3$ | $R^{10}$ | A |
|---|---|---|---|---|---|---|---|---|
| C-13043 | Me(R) | single bond | H | $—CH_2CH_2OCH_2CH_2—$ | H | Me | $CH_2OMe$ | O |
| C-13044 | Me(S) | single bond | H | $—CH_2CH_2OCH_2CH_2—$ | H | Me | $CH_2OMe$ | O |
| C-13045 | H | single bond | Me | Me | H | Cl | C(=O)Me | O |

TABLE 525-continued

| Compound Number | Y | W | Z | $R^1$ | $R^2$ | $R^3$ | $R^{10}$ | A |
|---|---|---|---|---|---|---|---|---|
| C-13046 | Me | single bond | H | Me | H | Cl | C(=O)Me | O |
| C-13047 | Me(R) | single bond | H | Me | H | Cl | C(=O)Me | O |
| C-13048 | Me(S) | single bond | H | Me | H | Cl | C(=O)Me | O |
| C-13049 | H | single bond | Me | Me | H | Me | C(=O)Me | O |
| C-13050 | Me | single bond | H | Me | H | Me | C(=O)Me | O |
| C-13051 | Me(R) | single bond | H | Me | H | Me | C(=O)Me | O |
| C-13052 | Me(S) | single bond | H | Me | H | Me | C(=O)Me | O |
| C-13053 | H | single bond | Me | $CH_2CHF_2$ | H | Cl | C(=O)Me | O |
| C-13054 | Me | single bond | H | $CH_2CHF_2$ | H | Cl | C(=O)Me | O |
| C-13055 | Me(R) | single bond | H | $CH_2CHF_2$ | H | Cl | C(=O)Me | O |
| C-13056 | Me(S) | single bond | H | $CH_2CHF_2$ | H | Cl | C(=O)Me | O |
| C-13057 | H | single bond | Me | $CH_2CHF_2$ | H | Me | C(=O)Me | O |
| C-13058 | Me | single bond | H | $CH_2CHF_2$ | H | Me | C(=O)Me | O |
| C-13059 | Me(R) | single bond | H | $CH_2CHF_2$ | H | Me | C(=O)Me | O |
| C-13060 | Me(S) | single bond | H | $CH_2CHF_2$ | H | Me | C(=O)Me | O |
| C-13061 | H | single bond | Me | n-Pr | H | Cl | C(=O)Me | O |
| C-13062 | Me | single bond | H | n-Pr | H | Cl | C(=O)Me | O |
| C-13063 | Me(R) | single bond | H | n-Pr | H | Cl | C(=O)Me | O |
| C-13064 | Me(S) | single bond | H | n-Pr | H | Cl | C(=O)Me | O |
| C-13065 | H | single bond | Me | n-Pr | H | Me | C(=O)Me | O |
| C-13066 | Me | single bond | H | n-Pr | H | Me | C(=O)Me | O |
| C-13067 | Me(R) | single bond | H | n-Pr | H | Me | C(=O)Me | O |
| C-13068 | Me(S) | single bond | H | n-Pr | H | Me | C(=O)Me | O |
| C-13069 | H | single bond | Me | i-Pr | H | Cl | C(=O)Me | O |
| C-13070 | Me | single bond | H | i-Pr | H | Cl | C(=O)Me | O |
| C-13071 | Me(R) | single bond | H | i-Pr | H | Cl | C(=O)Me | O |
| C-13072 | Me(S) | single bond | H | i-Pr | H | Cl | C(=O)Me | O |
| C-13073 | H | single bond | Me | i-Pr | H | Me | C(=O)Me | O |
| C-13074 | Me | single bond | H | i-Pr | H | Me | C(=O)Me | O |
| C-13075 | Me(R) | single bond | H | i-Pr | H | Me | C(=O)Me | O |
| C-13076 | Me(S) | single bond | H | i-Pr | H | Me | C(=O)Me | O |
| C-13077 | H | single bond | Me | c-Pr(1-F) | H | Cl | C(=O)Me | O |
| C-13078 | Me | single bond | H | c-Pr(1-F) | H | Cl | C(=O)Me | O |
| C-13079 | Me(R) | single bond | H | c-Pr(1-F) | H | Cl | C(=O)Me | O |
| C-13080 | Me(S) | single bond | H | c-Pr(1-F) | H | Cl | C(=O)Me | O |
| C-13081 | H | single bond | Me | c-Pr(1-F) | H | Me | C(=O)Me | O |
| C-13082 | Me | single bond | H | c-Pr(1-F) | H | Me | C(=O)Me | O |
| C-13083 | Me(R) | single bond | H | c-Pr(1-F) | H | Me | C(=O)Me | O |
| C-13084 | Me(S) | single bond | H | c-Pr(1-F) | H | Me | C(=O)Me | O |
| C-13085 | H | single bond | Me | c-Pr(2,2-$F_2$) | H | Cl | C(=O)Me | O |
| C-13086 | Me | single bond | H | c-Pr(2,2-$F_2$) | H | Cl | C(=O)Me | O |

TABLE 526

| Compound Number | Y | W | Z | $R^1$ | $R^2$ | $R^3$ | $R^{10}$ | A |
|---|---|---|---|---|---|---|---|---|
| C-13087 | Me(R) | single bond | H | c-Pr(2,2-$F_2$) | H | Cl | C(=O)Me | O |
| C-13088 | Me(S) | single bond | H | c-Pr(2,2-$F_2$) | H | Cl | C(=O)Me | O |
| C-13089 | H | single bond | Me | c-Pr(2,2-$F_2$) | H | Me | C(=O)Me | O |
| C-13090 | Me | single bond | H | c-Pr(2,2-$F_2$) | H | Me | C(=O)Me | O |
| C-13091 | Me(R) | single bond | H | c-Pr(2,2-$F_2$) | H | Me | C(=O)Me | O |
| C-13092 | Me(S) | single bond | H | c-Pr(2,2-$F_2$) | H | Me | C(=O)Me | O |
| C-13093 | H | single bond | Me | c-Pr(1-Cl) | H | Cl | C(=O)Me | O |
| C-13094 | Me | single bond | H | c-Pr(1-Cl) | H | Cl | C(=O)Me | O |
| C-13095 | Me(R) | single bond | H | c-Pr(1-Cl) | H | Cl | C(=O)Me | O |
| C-13096 | Me(S) | single bond | H | c-Pr(1-Cl) | H | Cl | C(=O)Me | O |
| C-13097 | H | single bond | Me | c-Pr(1-Cl) | H | Me | C(=O)Me | O |
| C-13098 | Me | single bond | H | c-Pr(1-Cl) | H | Me | C(=O)Me | O |
| C-13099 | Me(R) | single bond | H | c-Pr(1-Cl) | H | Me | C(=O)Me | O |
| C-13100 | Me(S) | single bond | H | c-Pr(1-Cl) | H | Me | C(=O)Me | O |
| C-13101 | H | single bond | Me | c-Pr(1-Br) | H | Cl | C(=O)Me | O |
| C-13102 | Me | single bond | H | c-Pr(1-Br) | H | Cl | C(=O)Me | O |
| C-13103 | Me(R) | single bond | H | c-Pr(1-Br) | H | Cl | C(=O)Me | O |
| C-13104 | Me(S) | single bond | H | c-Pr(1-Br) | H | Cl | C(=O)Me | O |
| C-13105 | H | single bond | Me | c-Pr(1-Br) | H | Me | C(=O)Me | O |
| C-13106 | Me | single bond | H | c-Pr(1-Br) | H | Me | C(=O)Me | O |
| C-13107 | Me(R) | single bond | H | c-Pr(1-Br) | H | Me | C(=O)Me | O |
| C-13108 | Me(S) | single bond | H | c-Pr(1-Br) | H | Me | C(=O)Me | O |
| C-13109 | H | single bond | Me | c-Pr(1-Me) | H | Cl | C(=O)Me | O |
| C-13110 | Me | single bond | H | c-Pr(1-Me) | H | Cl | C(=O)Me | O |
| C-13111 | Me(R) | single bond | H | c-Pr(1-Me) | H | Cl | C(=O)Me | O |
| C-13112 | Me(S) | single bond | H | c-Pr(1-Me) | H | Cl | C(=O)Me | O |

TABLE 526-continued

| Compound Number | Y | W | Z | $R^1$ | $R^2$ | $R^3$ | $R^{10}$ | A |
|---|---|---|---|---|---|---|---|---|
| C-13113 | H | single bond | Me | c-Pr(1-Me) | H | Me | C(═O)Me | O |
| C-13114 | Me | single bond | H | c-Pr(1-Me) | H | Me | C(═O)Me | O |
| C-13115 | Me(R) | single bond | H | c-Pr(1-Me) | H | Me | C(═O)Me | O |
| C-13116 | Me(S) | single bond | H | c-Pr(1-Me) | H | Me | C(═O)Me | O |
| C-13117 | H | single bond | Me | c-Pr(1-$CH_2OH$) | H | Cl | C(═O)Me | O |
| C-13118 | Me | single bond | H | c-Pr(1-$CH_2OH$) | H | Cl | C(═O)Me | O |
| C-13119 | Me(R) | single bond | H | c-Pr(1-$CH_2OH$) | H | Cl | C(═O)Me | O |
| C-13120 | Me(S) | single bond | H | c-Pr(1-$CH_2OH$) | H | Cl | C(═O)Me | O |
| C-13121 | H | single bond | Me | c-Pr(1-$CH_2OH$) | H | Me | C(═O)Me | O |
| C-13122 | Me | single bond | H | c-Pr(1-$CH_2OH$) | H | Me | C(═O)Me | O |
| C-13123 | Me(R) | single bond | H | c-Pr(1-$CH_2OH$) | H | Me | C(═O)Me | O |
| C-13124 | Me(S) | single bond | H | c-Pr(1-$CH_2OH$) | H | Me | C(═O)Me | O |
| C-13125 | H | single bond | Me | c-Pr[1-$CH_2OS(═O)_2Me$] | H | Cl | C(═O)Me | O |
| C-13126 | Me | single bond | H | c-Pr[1-$CH_2OS(═O)_2Me$] | H | Cl | C(═O)Me | O |
| C-13127 | Me(R) | single bond | H | c-Pr[1-$CH_2OS(═O)_2Me$] | H | Cl | C(═O)Me | O |
| C-13128 | Me(S) | single bond | H | c-Pr[1-$CH_2OS(═O)_2Me$] | H | Cl | C(═O)Me | O |
| C-13129 | H | single bond | Me | c-Pr[1-$CH_2OS(═O)_2Me$] | H | Me | C(═O)Me | O |
| C-13130 | Me | single bond | H | c-Pr[1-$CH_2OS(═O)_2Me$] | H | Me | C(═O)Me | O |

TABLE 527

| Compound Number | Y | W | Z | $R^1$ | $R^2$ | $R^3$ | $R^{10}$ | A |
|---|---|---|---|---|---|---|---|---|
| C-13131 | Me(R) | single bond | H | c-Pr[1-$CH_2OS(═O)_2Me$] | H | Me | C(═O)Me | O |
| C-13132 | Me(S) | single bond | H | c-Pr[1-$CH_2OS(═O)_2Me$] | H | Me | C(═O)Me | O |
| C-13133 | H | single bond | Me | c-Pr(1-$CH_2OMe$) | H | Cl | C(═O)Me | O |
| C-13134 | Me | single bond | H | c-Pr(1-$CH_2OMe$) | H | Cl | C(═O)Me | O |
| C-13135 | Me(R) | single bond | H | c-Pr(1-$CH_2OMe$) | H | Cl | C(═O)Me | O |
| C-13136 | Me(S) | single bond | H | c-Pr(1-$CH_2OMe$) | H | Cl | C(═O)Me | O |
| C-13137 | H | single bond | Me | c-Pr(1-$CH_2OMe$) | H | Me | C(═O)Me | O |
| C-13138 | Me | single bond | H | c-Pr(1-$CH_2OMe$) | H | Me | C(═O)Me | O |
| C-13139 | Me(R) | single bond | H | c-Pr(1-$CH_2OMe$) | H | Me | C(═O)Me | O |
| C-13140 | Me(S) | single bond | H | c-Pr(1-$CH_2OMe$) | H | Me | C(═O)Me | O |
| C-13141 | H | single bond | Me | c-Pr(1-$CH_2CN$) | H | Cl | C(═O)Me | O |
| C-13142 | Me | single bond | H | c-Pr(1-$CH_2CN$) | H | Cl | C(═O)Me | O |
| C-13143 | Me(R) | single bond | H | c-Pr(1-$CH_2CN$) | H | Cl | C(═O)Me | O |
| C-13144 | Me(S) | single bond | H | c-Pr(1-$CH_2CN$) | H | Cl | C(═O)Me | O |
| C-13145 | H | single bond | Me | c-Pr(1-$CH_2CN$) | H | Me | C(═O)Me | O |
| C-13146 | Me | single bond | H | c-Pr(1-$CH_2CN$) | H | Me | C(═O)Me | O |
| C-13147 | Me(R) | single bond | H | c-Pr(1-$CH_2CN$) | H | Me | C(═O)Me | O |
| C-13148 | Me(S) | single bond | H | c-Pr(1-$CH_2CN$) | H | Me | C(═O)Me | O |
| C-13149 | H | single bond | Me | c-Pr(1-$CH_2SMe$) | H | Cl | C(═O)Me | O |
| C-13150 | Me | single bond | H | c-Pr(1-$CH_2SMe$) | H | Cl | C(═O)Me | O |
| C-13151 | Me(R) | single bond | H | c-Pr(1-$CH_2SMe$) | H | Cl | C(═O)Me | O |
| C-13152 | Me(S) | single bond | H | c-Pr(1-$CH_2SMe$) | H | Cl | C(═O)Me | O |
| C-13153 | H | single bond | Me | c-Pr(1-$CH_2SMe$) | H | Me | C(═O)Me | O |
| C-13154 | Me | single bond | H | c-Pr(1-$CH_2SMe$) | H | Me | C(═O)Me | O |
| C-13155 | Me(R) | single bond | H | c-Pr(1-$CH_2SMe$) | H | Me | C(═O)Me | O |
| C-13156 | Me(S) | single bond | H | c-Pr(1-$CH_2SMe$) | H | Me | C(═O)Me | O |
| C-13157 | H | single bond | Me | c-Pr[1-$CH_2S(═O)Me$] | H | Cl | C(═O)Me | O |
| C-13158 | Me | single bond | H | c-Pr[1-$CH_2S(═O)Me$] | H | Cl | C(═O)Me | O |
| C-13159 | Me(R) | single bond | H | c-Pr[1-$CH_2S(═O)Me$] | H | Cl | C(═O)Me | O |
| C-13160 | Me(S) | single bond | H | c-Pr[1-$CH_2S(═O)Me$] | H | Cl | C(═O)Me | O |
| C-13161 | H | single bond | Me | c-Pr[1-$CH_2S(═O)Me$] | H | Me | C(═O)Me | O |
| C-13162 | Me | single bond | H | c-Pr[1-$CH_2S(═O)Me$] | H | Me | C(═O)Me | O |
| C-13163 | Me(R) | single bond | H | c-Pr[1-$CH_2S(═O)Me$] | H | Me | C(═O)Me | O |
| C-13164 | Me(S) | single bond | H | c-Pr[1-$CH_2S(═O)Me$] | H | Me | C(═O)Me | O |
| C-13165 | H | single bond | Me | c-Pr[1-$CH_2S(═O)_2Me$] | H | Cl | C(═O)Me | O |
| C-13166 | Me | single bond | H | c-Pr[1-$CH_2S(═O)_2Me$] | H | Cl | C(═O)Me | O |
| C-13167 | Me(R) | single bond | H | c-Pr[1-$CH_2S(═O)_2Me$] | H | Cl | C(═O)Me | O |
| C-13168 | Me(S) | single bond | H | c-Pr[1-$CH_2S(═O)_2Me$] | H | Cl | C(═O)Me | O |
| C-13169 | H | single bond | Me | c-Pr[1-$CH_2S(═O)_2Me$] | H | Me | C(═O)Me | O |
| C-13170 | Me | single bond | H | c-Pr[1-$CH_2S(═O)_2Me$] | H | Me | C(═O)Me | O |
| C-13171 | Me(R) | single bond | H | c-Pr[1-$CH_2S(═O)_2Me$] | H | Me | C(═O)Me | O |
| C-13172 | Me(S) | single bond | H | c-Pr[1-$CH_2S(═O)_2Me$] | H | Me | C(═O)Me | O |
| C-13173 | H | single bond | Me | c-Pr(1-$CH_2F$) | H | Cl | C(═O)Me | O |
| C-13174 | Me | single bond | H | c-Pr(1-$CH_2F$) | H | Cl | C(═O)Me | O |

TABLE 528

| Compound Number | Y | W | Z | $R^1$ | $R^2$ | $R^3$ | $R^{10}$ | A |
|---|---|---|---|---|---|---|---|---|
| C-13175 | Me(R) | single bond | H | c-Pr(1-$CH_2F$) | H | Cl | C(=O)Me | O |
| C-13176 | Me(S) | single bond | H | c-Pr(1-$CH_2F$) | H | Cl | C(=O)Me | O |
| C-13177 | H | single bond | Me | c-Pr(1-$CH_2F$) | H | Me | C(=O)Me | O |
| C-13178 | Me | single bond | H | c-Pr(1-$CH_2F$) | H | Me | C(=O)Me | O |
| C-13179 | Me(R) | single bond | H | c-Pr(1-$CH_2F$) | H | Me | C(=O)Me | O |
| C-13180 | Me(S) | single bond | H | c-Pr(1-$CH_2F$) | H | Me | C(=O)Me | O |
| C-13181 | H | single bond | Me | c-Pr(1-$CHF_2$) | H | Cl | C(=O)Me | O |
| C-13182 | Me | single bond | H | c-Pr(1-$CHF_2$) | H | Cl | C(=O)Me | O |
| C-13183 | Me(R) | single bond | H | c-Pr(1-$CHF_2$) | H | Cl | C(=O)Me | O |
| C-13184 | Me(S) | single bond | H | c-Pr(1-$CHF_2$) | H | Cl | C(=O)Me | O |
| C-13185 | H | single bond | Me | c-Pr(1-$CHF_2$) | H | Me | C(=O)Me | O |
| C-13186 | Me | single bond | H | c-Pr(1-$CHF_2$) | H | Me | C(=O)Me | O |
| C-13187 | Me(R) | single bond | H | c-Pr(1-$CHF_2$) | H | Me | C(=O)Me | O |
| C-13188 | Me(S) | single bond | H | c-Pr(1-$CHF_2$) | H | Me | C(=O)Me | O |
| C-13189 | H | single bond | Me | c-Pr(1-$CF_3$) | H | Cl | C(=O)Me | O |
| C-13190 | Me | single bond | H | c-Pr(1-$CF_3$) | H | Cl | C(=O)Me | O |
| C-13191 | Me(R) | single bond | H | c-Pr(1-$CF_3$) | H | Cl | C(=O)Me | O |
| C-13192 | Me(S) | single bond | H | c-Pr(1-$CF_3$) | H | Cl | C(=O)Me | O |
| C-13193 | H | single bond | Me | c-Pr(1-$CF_3$) | H | Me | C(=O)Me | O |
| C-13194 | Me | single bond | H | c-Pr(1-$CF_3$) | H | Me | C(=O)Me | O |
| C-13195 | Me(R) | single bond | H | c-Pr(1-$CF_3$) | H | Me | C(=O)Me | O |
| C-13196 | Me(S) | single bond | H | c-Pr(1-$CF_3$) | H | Me | C(=O)Me | O |
| C-13197 | H | single bond | Me | c-Pr(1-C≡CH) | H | Cl | C(=O)Me | O |
| C-13198 | Me | single bond | H | c-Pr(1-C≡CH) | H | Cl | C(=O)Me | O |
| C-13199 | Me(R) | single bond | H | c-Pr(1-C≡CH) | H | Cl | C(=O)Me | O |
| C-13200 | Me(S) | single bond | H | c-Pr(1-C≡CH) | H | Cl | C(=O)Me | O |
| C-13201 | H | single bond | Me | c-Pr(1-C≡CH) | H | Me | C(=O)Me | O |
| C-13202 | Me | single bond | H | c-Pr(1-C≡CH) | H | Me | C(=O)Me | O |
| C-13203 | Me(R) | single bond | H | c-Pr(1-C≡CH) | H | Me | C(=O)Me | O |
| C-13204 | Me(S) | single bond | H | c-Pr(1-C≡CH) | H | Me | C(=O)Me | O |
| C-13205 | H | single bond | Me | c-Pr[1-C(=O)OEt] | H | Cl | C(=O)Me | O |
| C-13206 | Me | single bond | H | c-Pr[1-C(=O)OEt] | H | Cl | C(=O)Me | O |
| C-13207 | Me(R) | single bond | H | c-Pr[1-C(=O)OEt] | H | Cl | C(=O)Me | O |
| C-13208 | Me(S) | single bond | H | c-Pr[1-C(=O)OEt] | H | Cl | C(=O)Me | O |
| C-13209 | H | single bond | Me | c-Pr[1-C(=O)OEt] | H | Me | C(=O)Me | O |
| C-13210 | Me | single bond | H | c-Pr[1-C(=O)OEt] | H | Me | C(=O)Me | O |
| C-13211 | Me(R) | single bond | H | c-Pr[1-C(=O)OEt] | H | Me | C(=O)Me | O |
| C-13212 | Me(S) | single bond | H | c-Pr[1-C(=O)OEt] | H | Me | C(=O)Me | O |
| C-13213 | H | single bond | Me | c-Pr[1-C(=O)OH] | H | Cl | C(=O)Me | O |
| C-13214 | Me | single bond | H | c-Pr[1-C(=O)OH] | H | Cl | C(=O)Me | O |
| C-13215 | Me(R) | single bond | H | c-Pr[1-C(=O)OH] | H | Cl | C(=O)Me | O |
| C-13216 | Me(S) | single bond | H | c-Pr[1-C(=O)OH] | H | Cl | C(=O)Me | O |
| C-13217 | H | single bond | Me | c-Pr[1-C(=O)OH] | H | Me | C(=O)Me | O |
| C-13218 | Me | single bond | H | c-Pr[1-C(=O)OH] | H | Me | C(=O)Me | O |

TABLE 529

| Compound Number | Y | W | Z | $R^1$ | $R^2$ | $R^3$ | $R^{10}$ | A |
|---|---|---|---|---|---|---|---|---|
| C-13219 | Me(R) | single bond | H | c-Pr[1-C(=O)OH] | H | Me | C(=O)Me | O |
| C-13220 | Me(S) | single bond | H | c-Pr[1-C(=O)OH] | H | Me | C(=O)Me | O |
| C-13221 | H | single bond | Me | c-Pr[1-C(=O)$NH_2$] | H | Cl | C(=O)Me | O |
| C-13222 | Me | single bond | H | c-Pr[1-C(=O)$NH_2$] | H | Cl | C(=O)Me | O |
| C-13223 | Me(R) | single bond | H | c-Pr[1-C(=O)$NH_2$] | H | Cl | C(=O)Me | O |
| C-13224 | Me(S) | single bond | H | c-Pr[1-C(=O)$NH_2$] | H | Cl | C(=O)Me | O |
| C-13225 | H | single bond | Me | c-Pr[1-C(=O)$NH_2$] | H | Me | C(=O)Me | O |
| C-13226 | Me | single bond | H | c-Pr[1-C(=O)$NH_2$] | H | Me | C(=O)Me | O |
| C-13227 | Me(R) | single bond | H | c-Pr[1-C(=O)$NH_2$] | H | Me | C(=O)Me | O |
| C-13228 | Me(S) | single bond | H | c-Pr[1-C(=O)$NH_2$] | H | Me | C(=O)Me | O |
| C-13229 | H | single bond | Me | c-Pr(1-OMe) | H | Cl | C(=O)Me | O |
| C-13230 | Me | single bond | H | c-Pr(1-OMe) | H | Cl | C(=O)Me | O |
| C-13231 | Me(R) | single bond | H | c-Pr(1-OMe) | H | Cl | C(=O)Me | O |
| C-13232 | Me(S) | single bond | H | c-Pr(1-OMe) | H | Cl | C(=O)Me | O |
| C-13233 | H | single bond | Me | c-Pr(1-OMe) | H | Me | C(=O)Me | O |
| C-13234 | Me | single bond | H | c-Pr(1-OMe) | H | Me | C(=O)Me | O |
| C-13235 | Me(R) | single bond | H | c-Pr(1-OMe) | H | Me | C(=O)Me | O |
| C-13236 | Me(S) | single bond | H | c-Pr(1-OMe) | H | Me | C(=O)Me | O |
| C-13237 | H | single bond | Me | c-Pr(1-SMe) | H | Cl | C(=O)Me | O |
| C-13238 | Me | single bond | H | c-Pr(1-SMe) | H | Cl | C(=O)Me | O |
| C-13239 | Me(R) | single bond | H | c-Pr(1-SMe) | H | Cl | C(=O)Me | O |
| C-13240 | Me(S) | single bond | H | c-Pr(1-SMe) | H | Cl | C(=O)Me | O |
| C-13241 | H | single bond | Me | c-Pr(1-SMe) | H | Me | C(=O)Me | O |

TABLE 529-continued

| Compound Number | Y | W | Z | $R^1$ | $R^2$ | $R^3$ | $R^{10}$ | A |
|---|---|---|---|---|---|---|---|---|
| C-13242 | Me | single bond | H | c-Pr(1-SMe) | H | Me | C(=O)Me | O |
| C-13243 | Me(R) | single bond | H | c-Pr(1-SMe) | H | Me | C(=O)Me | O |
| C-13244 | Me(S) | single bond | H | c-Pr(1-SMe) | H | Me | C(=O)Me | O |
| C-13245 | H | single bond | Me | c-Pr[1-S(=O)Me] | H | Cl | C(=O)Me | O |
| C-13246 | Me | single bond | H | c-Pr[1-S(=O)Me] | H | Cl | C(=O)Me | O |
| C-13247 | Me(R) | single bond | H | c-Pr[1-S(=O)Me] | H | Cl | C(=O)Me | O |
| C-13248 | Me(S) | single bond | H | c-Pr[1-S(=O)Me] | H | Cl | C(=O)Me | O |
| C-13249 | H | single bond | Me | c-Pr[1-S(=O)Me] | H | Me | C(=O)Me | O |
| C-13250 | Me | single bond | H | c-Pr[1-S(=O)Me] | H | Me | C(=O)Me | O |
| C-13251 | Me(R) | single bond | H | c-Pr[1-S(=O)Me] | H | Me | C(=O)Me | O |
| C-13252 | Me(S) | single bond | H | c-Pr[1-S(=O)Me] | H | Me | C(=O)Me | O |
| C-13253 | H | single bond | Me | c-Pr[1-S(=O)$_2$Me] | H | Cl | C(=O)Me | O |
| C-13254 | Me | single bond | H | c-Pr[1-S(=O)$_2$Me] | H | Cl | C(=O)Me | O |
| C-13255 | Me(R) | single bond | H | c-Pr[1-S(=O)$_2$Me] | H | Cl | C(=O)Me | O |
| C-13256 | Me(S) | single bond | H | c-Pr[1-S(=O)$_2$Me] | H | Cl | C(=O)Me | O |
| C-13257 | H | single bond | Me | c-Pr[1-S(=O)$_2$Me] | H | Me | C(=O)Me | O |
| C-13258 | Me | single bond | H | c-Pr[1-S(=O)$_2$Me] | H | Me | C(=O)Me | O |
| C-13259 | Me(R) | single bond | H | c-Pr[1-S(=O)$_2$Me] | H | Me | C(=O)Me | O |
| C-13260 | Me(S) | single bond | H | c-Pr[1-S(=O)$_2$Me] | H | Me | C(=O)Me | O |
| C-13261 | H | single bond | Me | c-Pr[1-S(=O)$_2$CHF$_2$] | H | Cl | C(=O)Me | O |
| C-13262 | Me | single bond | H | c-Pr[1-S(=O)$_2$CHF$_2$] | H | Cl | C(=O)Me | O |

TABLE 530

| Compound Number | Y | W | Z | $R^1$ | $R^2$ | $R^3$ | $R^{10}$ | A |
|---|---|---|---|---|---|---|---|---|
| C-13263 | Me(R) | single bond | H | c-Pr[1-S(=O)$_2$CHF$_2$] | H | Cl | C(=O)Me | O |
| C-13264 | Me(S) | single bond | H | c-Pr[1-S(=O)$_2$CHF$_2$] | H | Cl | C(=O)Me | O |
| C-13265 | H | single bond | Me | c-Pr[1-S(=O)$_2$CHF$_2$] | H | Me | C(=O)Me | O |
| C-13266 | Me | single bond | H | c-Pr[1-S(=O)$_2$CHF$_2$] | H | Me | C(=O)Me | O |
| C-13267 | Me(R) | single bond | H | c-Pr[1-S(=O)$_2$CHF$_2$] | H | Me | C(=O)Me | O |
| C-13268 | Me(S) | single bond | H | c-Pr[1-S(=O)$_2$CHF$_2$] | H | Me | C(=O)Me | O |
| C-13269 | H | single bond | Me | c-Pr[1-S(=O)$_2$CF$_3$] | H | Cl | C(=O)Me | O |
| C-13270 | Me | single bond | H | c-Pr[1-S(=O)$_2$CF$_3$] | H | Cl | C(=O)Me | O |
| C-13271 | Me(R) | single bond | H | c-Pr[1-S(=O)$_2$CF$_3$] | H | Cl | C(=O)Me | O |
| C-13272 | Me(S) | single bond | H | c-Pr[1-S(=O)$_2$CF$_3$] | H | Cl | C(=O)Me | O |
| C-13273 | H | single bond | Me | c-Pr[1-S(=O)$_2$CF$_3$] | H | Me | C(=O)Me | O |
| C-13274 | Me | single bond | H | c-Pr[1-S(=O)$_2$CF$_3$] | H | Me | C(=O)Me | O |
| C-13275 | Me(R) | single bond | H | c-Pr[1-S(=O)$_2$CF$_3$] | H | Me | C(=O)Me | O |
| C-13276 | Me(S) | single bond | H | c-Pr[1-S(=O)$_2$CF$_3$] | H | Me | C(=O)Me | O |
| C-13277 | H | single bond | Me | c-Pr[1-(5,6-dihydro-1,4,2-dioxazin-3-yl)] | H | Cl | C(=O)Me | O |
| C-13278 | Me | single bond | H | c-Pr[1-(5,6-dihydro-1,4,2-dioxazin-3-yl)] | H | Cl | C(=O)Me | O |
| C-13279 | Me(R) | single bond | H | c-Pr[1-(5,6-dihydro-1,4,2-dioxazin-3-yl)] | H | Cl | C(=O)Me | O |
| C-13280 | Me(S) | single bond | H | c-Pr[1-(5,6-dihydro-1,4,2-dioxazin-3-yl)] | H | Cl | C(=O)Me | O |
| C-13281 | H | single bond | Me | c-Pr[1-(5,6-dihydro-1,4,2-dioxazin-3-yl)] | H | Me | C(=O)Me | O |
| C-13282 | Me | single bond | H | c-Pr[1-(5,6-dihydro-1,4,2-dioxazin-3-yl)] | H | Me | C(=O)Me | O |
| C-13283 | Me(R) | single bond | H | c-Pr[1-(5,6-dihydro-1,4,2-dioxazin-3-yl)] | H | Me | C(=O)Me | O |
| C-13284 | Me(S) | single bond | H | c-Pr[1-(5,6-dihydro-1,4,2-dioxazin-3-yl)] | H | Me | C(=O)Me | O |
| C-13285 | H | single bond | Me | c-Pr[1-(5-hydroxy-1,3,4-oxadiazol-2-yl)] | H | Cl | C(=O)Me | O |
| C-13286 | Me | single bond | H | c-Pr[1-(5-hydroxy-1,3,4-oxadiazol-2-yl)] | H | Cl | C(=O)Me | O |
| C-13287 | Me(R) | single bond | H | c-Pr[1-(5-hydroxy-1,3,4-oxadiazol-2-yl)] | H | Cl | C(=O)Me | O |
| C-13288 | Me(S) | single bond | H | c-Pr[1-(5-hydroxy-1,3,4-oxadiazol-2-yl)] | H | Cl | C(=O)Me | O |
| C-13289 | H | single bond | Me | c-Pr[1-(5-hydroxy-1,3,4-oxadiazol-2-yl)] | H | Me | C(=O)Me | O |
| C-13290 | Me | single bond | H | c-Pr[1-(5-hydroxy-1,3,4-oxadiazol-2-yl)] | H | Me | C(=O)Me | O |
| C-13291 | Me(R) | single bond | H | c-Pr[1-(5-hydroxy-1,3,4-oxadiazol-2-yl)] | H | Me | C(=O)Me | O |
| C-13292 | Me(S) | single bond | H | c-Pr[1-(5-hydroxy-1,3,4-oxadiazol-2-yl)] | H | Me | C(=O)Me | O |
| C-13293 | H | single bond | Me | c-Pr[1-(pyrimidin-2-yl)] | H | Cl | C(=O)Me | O |
| C-13294 | Me | single bond | H | c-Pr[1-(pyrimidin-2-yl)] | H | Cl | C(=O)Me | O |
| C-13295 | Me(R) | single bond | H | c-Pr[1-(pyrimidin-2-yl)] | H | Cl | C(=O)Me | O |
| C-13296 | Me(S) | single bond | H | c-Pr[1-(pyrimidin-2-yl)] | H | Cl | C(=O)Me | O |
| C-13297 | H | single bond | Me | c-Pr[1-(pyrimidin-2-yl)] | H | Me | C(=O)Me | O |
| C-13298 | Me | single bond | H | c-Pr[1-(pyrimidin-2-yl)] | H | Me | C(=O)Me | O |
| C-13299 | Me(R) | single bond | H | c-Pr[1-(pyrimidin-2-yl)] | H | Me | C(=O)Me | O |
| C-13300 | Me(S) | single bond | H | c-Pr[1-(pyrimidin-2-yl)] | H | Me | C(=O)Me | O |
| C-13301 | H | single bond | Me | t-Bu | H | Cl | C(=O)Me | O |
| C-13302 | Me | single bond | H | t-Bu | H | Cl | C(=O)Me | O |
| C-13303 | Me(R) | single bond | H | t-Bu | H | Cl | C(=O)Me | O |
| C-13304 | Me(S) | single bond | H | t-Bu | H | Cl | C(=O)Me | O |
| C-13305 | H | single bond | Me | t-Bu | H | Me | C(=O)Me | O |
| C-13306 | Me | single bond | H | t-Bu | H | Me | C(=O)Me | O |

TABLE 531

| Compound Number | Y | W | Z | $R^1$ | $R^2$ | $R^3$ | $R^{10}$ | A |
|---|---|---|---|---|---|---|---|---|
| C-13307 | Me(R) | single bond | H | t-Bu | H | Me | C(=O)Me | O |
| C-13308 | Me(S) | single bond | H | t-Bu | H | Me | C(=O)Me | O |
| C-13309 | H | single bond | Me | c-Bu | H | Cl | C(=O)Me | O |
| C-13310 | Me | single bond | H | c-Bu | H | Cl | C(=O)Me | O |
| C-13311 | Me(R) | single bond | H | c-Bu | H | Cl | C(=O)Me | O |
| C-13312 | Me(S) | single bond | H | c-Bu | H | Cl | C(=O)Me | O |
| C-13313 | H | single bond | Me | c-Bu | H | Me | C(=O)Me | O |
| C-13314 | Me | single bond | H | c-Bu | H | Me | C(=O)Me | O |
| C-13315 | Me(R) | single bond | H | c-Bu | H | Me | C(=O)Me | O |
| C-13316 | Me(S) | single bond | H | c-Bu | H | Me | C(=O)Me | O |
| C-13317 | H | single bond | Me | c-Bu(1-CN) | H | Cl | C(=O)Me | O |
| C-13318 | Me | single bond | H | c-Bu(1-CN) | H | Cl | C(=O)Me | O |
| C-13319 | Me(R) | single bond | H | c-Bu(1-CN) | H | Cl | C(=O)Me | O |
| C-13320 | Me(S) | single bond | H | c-Bu(1-CN) | H | Cl | C(=O)Me | O |
| C-13321 | H | single bond | Me | c-Bu(1-CN) | H | Me | C(=O)Me | O |
| C-13322 | Me | single bond | H | c-Bu(1-CN) | H | Me | C(=O)Me | O |
| C-13323 | Me(R) | single bond | H | c-Bu(1-CN) | H | Me | C(=O)Me | O |
| C-13324 | Me(S) | single bond | H | c-Bu(1-CN) | H | Me | C(=O)Me | O |
| C-13325 | H | single bond | Me | c-Bu(3,3-$F_2$) | H | Cl | C(=O)Me | O |
| C-13326 | Me | single bond | H | c-Bu(3,3-$F_2$) | H | Cl | C(=O)Me | O |
| C-13327 | Me(R) | single bond | H | c-Bu(3,3-$F_2$) | H | Cl | C(=O)Me | O |
| C-13328 | Me(S) | single bond | H | c-Bu(3,3-$F_2$) | H | Cl | C(=O)Me | O |
| C-13329 | H | single bond | Me | c-Bu(3,3-$F_2$) | H | Me | C(=O)Me | O |
| C-13330 | Me | single bond | H | c-Bu(3,3-$F_2$) | H | Me | C(=O)Me | O |
| C-13331 | Me(R) | single bond | H | c-Bu(3,3-$F_2$) | H | Me | C(=O)Me | O |
| C-13332 | Me(S) | single bond | H | c-Bu(3,3-$F_2$) | H | Me | C(=O)Me | O |
| C-13333 | H | single bond | Me | oxetan-3-yl | H | Cl | C(=O)Me | O |
| C-13334 | Me | single bond | H | oxetan-3-yl | H | Cl | C(=O)Me | O |
| C-13335 | Me(R) | single bond | H | oxetan-3-yl | H | Cl | C(=O)Me | O |
| C-13336 | Me(S) | single bond | H | oxetan-3-yl | H | Cl | C(=O)Me | O |
| C-13337 | H | single bond | Me | oxetan-3-yl | H | Me | C(=O)Me | O |
| C-13338 | Me | single bond | H | oxetan-3-yl | H | Me | C(=O)Me | O |
| C-13339 | Me(R) | single bond | H | oxetan-3-yl | H | Me | C(=O)Me | O |
| C-13340 | Me(S) | single bond | H | oxetan-3-yl | H | Me | C(=O)Me | O |
| C-13341 | H | single bond | Me | oxetan(3-CN)-3-yl | H | Cl | C(=O)Me | O |
| C-13342 | Me | single bond | H | oxetan(3-CN)-3-yl | H | Cl | C(=O)Me | O |
| C-13343 | Me(R) | single bond | H | oxetan(3-CN)-3-yl | H | Cl | C(=O)Me | O |
| C-13344 | Me(S) | single bond | H | oxetan(3-CN)-3-yl | H | Cl | C(=O)Me | O |
| C-13345 | H | single bond | Me | oxetan(3-CN)-3-yl | H | Me | C(=O)Me | O |
| C-13346 | Me | single bond | H | oxetan(3-CN)-3-yl | H | Me | C(=O)Me | O |
| C-13347 | Me(R) | single bond | H | oxetan(3-CN)-3-yl | H | Me | C(=O)Me | O |
| C-13348 | Me(S) | single bond | H | oxetan(3-CN)-3-yl | H | Me | C(=O)Me | O |
| C-13349 | H | single bond | Me | azetidin[1-C(=O)Me]-3-yl | H | Cl | C(=O)Me | O |
| C-13350 | Me | single bond | H | azetidin[1-C(=O)Me]-3-yl | H | Cl | C(=O)Me | O |

TABLE 532

| Compound Number | Y | W | Z | $R^1$ | $R^2$ | $R^3$ | $R^{10}$ | A |
|---|---|---|---|---|---|---|---|---|
| C-13351 | Me(R) | single bond | H | azetidin[1-C(=O)Me]-3-yl | H | Cl | C(=O)Me | O |
| C-13352 | Me(S) | single bond | H | azetidin[1-C(=O)Me]-3-yl | H | Cl | C(=O)Me | O |
| C-13353 | H | single bond | Me | azetidin[1-C(=O)Me]-3-yl | H | Me | C(=O)Me | O |
| C-13354 | Me | single bond | H | azetidin[1-C(=O)Me]-3-yl | H | Me | C(=O)Me | O |
| C-13355 | Me(R) | single bond | H | azetidin[1-C(=O)Me]-3-yl | H | Me | C(=O)Me | O |
| C-13356 | Me(S) | single bond | H | azetidin[1-C(=O)Me]-3-yl | H | Me | C(=O)Me | O |
| C-13357 | H | single bond | Me | azetidin[1-S(=O)$_2$Me]-3-yl | H | Cl | C(=O)Me | O |
| C-13358 | Me | single bond | H | azetidin[1-S(=O)$_2$Me]-3-yl | H | Cl | C(=O)Me | O |
| C-13359 | Me(R) | single bond | H | azetidin[1-S(=O)$_2$Me]-3-yl | H | Cl | C(=O)Me | O |
| C-13360 | Me(S) | single bond | H | azetidin[1-S(=O)$_2$Me]-3-yl | H | Cl | C(=O)Me | O |
| C-13361 | H | single bond | Me | azetidin[1-S(=O)$_2$Me]-3-yl | H | Me | C(=O)Me | O |
| C-13362 | Me | single bond | H | azetidin[1-S(=O)$_2$Me]-3-yl | H | Me | C(=O)Me | O |
| C-13363 | Me(R) | single bond | H | azetidin[1-S(=O)$_2$Me]-3-yl | H | Me | C(=O)Me | O |
| C-13364 | Me(S) | single bond | H | azetidin[1-S(=O)$_2$Me]-3-yl | H | Me | C(=O)Me | O |
| C-13365 | H | single bond | Me | azetidin[1-S(=O)$_2$CHF$_2$]-3-yl | H | Cl | C(=O)Me | O |
| C-13366 | Me | single bond | H | azetidin[1-S(=O)$_2$CHF$_2$]-3-yl | H | Cl | C(=O)Me | O |
| C-13367 | Me(R) | single bond | H | azetidin[1-S(=O)$_2$CHF$_2$]-3-yl | H | Cl | C(=O)Me | O |
| C-13368 | Me(S) | single bond | H | azetidin[1-S(=O)$_2$CHF$_2$]-3-yl | H | Cl | C(=O)Me | O |
| C-13369 | H | single bond | Me | azetidin[1-S(=O)$_2$CHF$_2$]-3-yl | H | Me | C(=O)Me | O |
| C-13370 | Me | single bond | H | azetidin[1-S(=O)$_2$CHF$_2$]-3-yl | H | Me | C(=O)Me | O |
| C-13371 | Me(R) | single bond | H | azetidin[1-S(=O)$_2$CHF$_2$]-3-yl | H | Me | C(=O)Me | O |

TABLE 532-continued

| Compound Number | Y | W | Z | $R^1$ | $R^2$ | $R^3$ | $R^{10}$ | A |
|---|---|---|---|---|---|---|---|---|
| C-13372 | Me(S) | single bond | H | azetidin[1-S(=O)$_2$CHF$_2$]-3-yl | H | Me | C(=O)Me | O |
| C-13373 | H | single bond | Me | c-Pen | H | Cl | C(=O)Me | O |
| C-13374 | Me | single bond | H | c-Pen | H | Cl | C(=O)Me | O |
| C-13375 | Me(R) | single bond | H | c-Pen | H | Cl | C(=O)Me | O |
| C-13376 | Me(S) | single bond | H | c-Pen | H | Cl | C(=O)Me | O |
| C-13377 | H | single bond | Me | c-Pen | H | Me | C(=O)Me | O |
| C-13378 | Me | single bond | H | c-Pen | H | Me | C(=O)Me | O |
| C-13379 | Me(R) | single bond | H | c-Pen | H | Me | C(=O)Me | O |
| C-13380 | Me(S) | single bond | H | c-Pen | H | Me | C(=O)Me | O |
| C-13381 | H | single bond | Me | tetrahydrofuran-3-yl | H | Cl | C(=O)Me | O |
| C-13382 | Me | single bond | H | tetrahydrofuran-3-yl | H | Cl | C(=O)Me | O |
| C-13383 | Me(R) | single bond | H | tetrahydrofuran-3-yl | H | Cl | C(=O)Me | O |
| C-13384 | Me(S) | single bond | H | tetrahydrofuran-3-yl | H | Cl | C(=O)Me | O |
| C-13385 | H | single bond | Me | tetrahydrofuran-3-yl | H | Me | C(=O)Me | O |
| C-13386 | Me | single bond | H | tetrahydrofuran-3-yl | H | Me | C(=O)Me | O |
| C-13387 | Me(R) | single bond | H | tetrahydrofuran-3-yl | H | Me | C(=O)Me | O |
| C-13388 | Me(S) | single bond | H | tetrahydrofuran-3-yl | H | Me | C(=O)Me | O |
| C-13389 | H | single bond | Me | tetrahydrothiophen-3-yl | H | Cl | C(=O)Me | O |
| C-13390 | Me | single bond | H | tetrahydrothiophen-3-yl | H | Cl | C(=O)Me | O |
| C-13391 | Me(R) | single bond | H | tetrahydrothiophen-3-yl | H | Cl | C(=O)Me | O |
| C-13392 | Me(S) | single bond | H | tetrahydrothiophen-3-yl | H | Cl | C(=O)Me | O |
| C-13393 | H | single bond | Me | tetrahydrothiophen-3-yl | H | Me | C(=O)Me | O |
| C-13394 | Me | single bond | H | tetrahydrothiophen-3-yl | H | Me | C(=O)Me | O |

TABLE 533

| Compound Number | Y | W | Z | $R^1$ | $R^2$ | $R^3$ | $R^{10}$ | A |
|---|---|---|---|---|---|---|---|---|
| C-13395 | Me(R) | single bond | H | tetrahydrothiophen-3-yl | H | Me | C(=O)Me | O |
| C-13396 | Me(S) | single bond | H | tetrahydrothiophen-3-yl | H | Me | C(=O)Me | O |
| C-13397 | H | single bond | Me | c-Pen(1-CN) | H | Cl | C(=O)Me | O |
| C-13398 | Me | single bond | H | c-Pen(1-CN) | H | Cl | C(=O)Me | O |
| C-13399 | Me(R) | single bond | H | c-Pen(1-CN) | H | Cl | C(=O)Me | O |
| C-13400 | Me(S) | single bond | H | c-Pen(1-CN) | H | Cl | C(=O)Me | O |
| C-13401 | H | single bond | Me | c-Pen(1-CN) | H | Me | C(=O)Me | O |
| C-13402 | Me | single bond | H | c-Pen(1-CN) | H | Me | C(=O)Me | O |
| C-13403 | Me(R) | single bond | H | c-Pen(1-CN) | H | Me | C(=O)Me | O |
| C-13404 | Me(S) | single bond | H | c-Pen(1-CN) | H | Me | C(=O)Me | O |
| C-13405 | H | single bond | Me | tetrahydrofuran(3-CN)-3-yl | H | Cl | C(=O)Me | O |
| C-13406 | Me | single bond | H | tetrahydrofuran(3-CN)-3-yl | H | Cl | C(=O)Me | O |
| C-13407 | Me(R) | single bond | H | tetrahydrofuran(3-CN)-3-yl | H | Cl | C(=O)Me | O |
| C-13408 | Me(S) | single bond | H | tetrahydrofuran(3-CN)-3-yl | H | Cl | C(=O)Me | O |
| C-13409 | H | single bond | Me | tetrahydrofuran(3-CN)-3-yl | H | Me | C(=O)Me | O |
| C-13410 | Me | single bond | H | tetrahydrofuran(3-CN)-3-yl | H | Me | C(=O)Me | O |
| C-13411 | Me(R) | single bond | H | tetrahydrofuran(3-CN)-3-yl | H | Me | C(=O)Me | O |
| C-13412 | Me(S) | single bond | H | tetrahydrofuran(3-CN)-3-yl | H | Me | C(=O)Me | O |
| C-13413 | H | single bond | Me | tetrahydrothiophen(3-CN)-3-yl | H | Cl | C(=O)Me | O |
| C-13414 | Me | single bond | H | tetrahydrothiophen(3-CN)-3-yl | H | Cl | C(=O)Me | O |
| C-13415 | Me(R) | single bond | H | tetrahydrothiophen(3-CN)-3-yl | H | Cl | C(=O)Me | O |
| C-13416 | Me(S) | single bond | H | tetrahydrothiophen(3-CN)-3-yl | H | Cl | C(=O)Me | O |
| C-13417 | H | single bond | Me | tetrahydrothiophen(3-CN)-3-yl | H | Me | C(=O)Me | O |
| C-13418 | Me | single bond | H | tetrahydrothiophen(3-CN)-3-yl | H | Me | C(=O)Me | O |
| C-13419 | Me(R) | single bond | H | tetrahydrothiophen(3-CN)-3-yl | H | Me | C(=O)Me | O |
| C-13420 | Me(S) | single bond | H | tetrahydrothiophen(3-CN)-3-yl | H | Me | C(=O)Me | O |
| C-13421 | H | single bond | Me | bicyclo[1.1.1]]pentan-1-yl | H | Cl | C(=O)Me | O |
| C-13422 | Me | single bond | H | bicyclo[1.1.1]]pentan-1-yl | H | Cl | C(=O)Me | O |
| C-13423 | Me(R) | single bond | H | bicyclo[1.1.1]]pentan-1-yl | H | Cl | C(=O)Me | O |
| C-13424 | Me(S) | single bond | H | bicyclo[1.1.1]]pentan-1-yl | H | Cl | C(=O)Me | O |
| C-13425 | H | single bond | Me | bicyclo[1.1.1]pentan-1-yl | H | Me | C(=O)Me | O |
| C-13426 | Me | single bond | H | bicyclo[1.1.1]]pentan-1-yl | H | Me | C(=O)Me | O |
| C-13427 | Me(R) | single bond | H | bicyclo[1.1.1]]pentan-1-yl | H | Me | C(=O)Me | O |
| C-13428 | Me(S) | single bond | H | bicyclo[1.1.1]]pentan-1-yl | H | Me | C(=O)Me | O |
| C-13429 | H | single bond | Me | c-Hex | H | Cl | C(=O)Me | O |
| C-13430 | Me | single bond | H | c-Hex | H | Cl | C(=O)Me | O |
| C-13431 | Me(R) | single bond | H | c-Hex | H | Cl | C(=O)Me | O |
| C-13432 | Me(S) | single bond | H | c-Hex | H | Cl | C(=O)Me | O |
| C-13433 | H | single bond | Me | c-Hex | H | Me | C(=O)Me | O |
| C-13434 | Me | single bond | H | c-Hex | H | Me | C(=O)Me | O |
| C-13435 | Me(R) | single bond | H | c-Hex | H | Me | C(=O)Me | O |
| C-13436 | Me(S) | single bond | H | c-Hex | H | Me | C(=O)Me | O |

TABLE 533-continued

| Compound Number | Y | W | Z | $R^1$ | $R^2$ | $R^3$ | $R^{10}$ | A |
|---|---|---|---|---|---|---|---|---|
| C-13437 | H | single bond | Me | tetrahydropyran-4-yl | H | Cl | C(=O)Me | O |
| C-13438 | Me | single bond | H | tetrahydropyran-4-yl | H | Cl | C(=O)Me | O |

TABLE 534

| Compound Number | Y | W | Z | $R^1$ | $R^2$ | $R^3$ | $R^{10}$ | A |
|---|---|---|---|---|---|---|---|---|
| C-13439 | Me(R) | single bond | H | tetrahydropyran-4-yl | H | Cl | C(=O)Me | O |
| C-13440 | Me(S) | single bond | H | tetrahydropyran-4-yl | H | Cl | C(=O)Me | O |
| C-13441 | H | single bond | Me | tetrahydropyran-4-yl | H | Me | C(=O)Me | O |
| C-13442 | Me | single bond | H | tetrahydropyran-4-yl | H | Me | C(=O)Me | O |
| C-13443 | Me(R) | single bond | H | tetrahydropyran-4-yl | H | Me | C(=O)Me | O |
| C-13444 | Me(S) | single bond | H | tetrahydropyran-4-yl | H | Me | C(=O)Me | O |
| C-13445 | H | single bond | Me | tetrahydrothiopyran-4-yl | H | Cl | C(=O)Me | O |
| C-13446 | Me | single bond | H | tetrahydrothiopyran-4-yl | H | Cl | C(=O)Me | O |
| C-13447 | Me(R) | single bond | H | tetrahydrothiopyran-4-yl | H | Cl | C(=O)Me | O |
| C-13448 | Me(S) | single bond | H | tetrahydrothiopyran-4-yl | H | Cl | C(=O)Me | O |
| C-13449 | H | single bond | Me | tetrahydrothiopyran-4-yl | H | Me | C(=O)Me | O |
| C-13450 | Me | single bond | H | tetrahydrothiopyran-4-yl | H | Me | C(=O)Me | O |
| C-13451 | Me(R) | single bond | H | tetrahydrothiopyran-4-yl | H | Me | C(=O)Me | O |
| C-13452 | Me(S) | single bond | H | tetrahydrothiopyran-4-yl | H | Me | C(=O)Me | O |
| C-13453 | H | single bond | Me | c-Hex(1-CN) | H | Cl | C(=O)Me | O |
| C-13454 | Me | single bond | H | c-Hex(1-CN) | H | Cl | C(=O)Me | O |
| C-13455 | Me(R) | single bond | H | c-Hex(1-CN) | H | Cl | C(=O)Me | O |
| C-13456 | Me(S) | single bond | H | c-Hex(1-CN) | H | Cl | C(=O)Me | O |
| C-13457 | H | single bond | Me | c-Hex(1-CN) | H | Me | C(=O)Me | O |
| C-13458 | Me | single bond | H | c-Hex(1-CN) | H | Me | C(=O)Me | O |
| C-13459 | Me(R) | single bond | H | c-Hex(1-CN) | H | Me | C(=O)Me | O |
| C-13460 | Me(S) | single bond | H | c-Hex(1-CN) | H | Me | C(=O)Me | O |
| C-13461 | H | single bond | Me | tetrahydropyran(4-CN)-4-yl | H | Cl | C(=O)Me | O |
| C-13462 | Me | single bond | H | tetrahydropyran(4-CN)-4-yl | H | Cl | C(=O)Me | O |
| C-13463 | Me(R) | single bond | H | tetrahydropyran(4-CN)-4-yl | H | Cl | C(=O)Me | O |
| C-13464 | Me(S) | single bond | H | tetrahydropyran(4-CN)-4-yl | H | Cl | C(=O)Me | O |
| C-13465 | H | single bond | Me | tetrahydropyran(4-CN)-4-yl | H | Me | C(=O)Me | O |
| C-13466 | Me | single bond | H | tetrahydropyran(4-CN)-4-yl | H | Me | C(=O)Me | O |
| C-13467 | Me(R) | single bond | H | tetrahydropyran(4-CN)-4-yl | H | Me | C(=O)Me | O |
| C-13468 | Me(S) | single bond | H | tetrahydropyran(4-CN)-4-yl | H | Me | C(=O)Me | O |
| C-13469 | H | single bond | Me | tetrahydrothiopyran(4-CN)-4-yl | H | Cl | C(=O)Me | O |
| C-13470 | Me | single bond | H | tetrahydrothiopyran(4-CN)-4-yl | H | Cl | C(=O)Me | O |
| C-13471 | Me(R) | single bond | H | tetrahydrothiopyran(4-CN)-4-yl | H | Cl | C(=O)Me | O |
| C-13472 | Me(S) | single bond | H | tetrahydrothiopyran(4-CN)-4-yl | H | Cl | C(=O)Me | O |
| C-13473 | H | single bond | Me | tetrahydrothiopyran(4-CN)-4-yl | H | Me | C(=O)Me | O |
| C-13474 | Me | single bond | H | tetrahydrothiopyran(4-CN)-4-yl | H | Me | C(=O)Me | O |
| C-13475 | Me(R) | single bond | H | tetrahydrothiopyran(4-CN)-4-yl | H | Me | C(=O)Me | O |
| C-13476 | Me(S) | single bond | H | tetrahydrothiopyran(4-CN)-4-yl | H | Me | C(=O)Me | O |
| C-13477 | H | single bond | Me | $CH_2$(c-Pr) | H | Cl | C(=O)Me | O |
| C-13478 | Me | single bond | H | $CH_2$(c-Pr) | H | Cl | C(=O)Me | O |
| C-13479 | Me(R) | single bond | H | $CH_2$(c-Pr) | H | Cl | C(=O)Me | O |
| C-13480 | Me(S) | single bond | H | $CH_2$(c-Pr) | H | Cl | C(=O)Me | O |
| C-13481 | H | single bond | Me | $CH_2$(c-Pr) | H | Me | C(=O)Me | O |
| C-13482 | Me | single bond | H | $CH_2$(c-Pr) | H | Me | C(=O)Me | O |

TABLE 535

| Compound Number | Y | W | Z | $R^1$ | $R^2$ | $R^3$ | $R^{10}$ | A |
|---|---|---|---|---|---|---|---|---|
| C-13483 | Me(R) | single bond | H | $CH_2$(c-Pr) | H | Me | C(=O)Me | O |
| C-13484 | Me(S) | single bond | H | $CH_2$(c-Pr) | H | Me | C(=O)Me | O |
| C-13485 | H | single bond | Me | $CH_2$[c-Pr(1-CN)] | H | Cl | C(=O)Me | O |
| C-13486 | Me | single bond | H | $CH_2$[c-Pr(1-CN)] | H | Cl | C(=O)Me | O |
| C-13487 | Me(R) | single bond | H | $CH_2$[c-Pr(1-CN)] | H | Cl | C(=O)Me | O |
| C-13488 | Me(S) | single bond | H | $CH_2$[c-Pr(1-CN)] | H | Cl | C(=O)Me | O |
| C-13489 | H | single bond | Me | $CH_2$[c-Pr(1-CN)] | H | Me | C(=O)Me | O |
| C-13490 | Me | single bond | H | $CH_2$[c-Pr(1-CN)] | H | Me | C(=O)Me | O |
| C-13491 | Me(R) | single bond | H | $CH_2$[c-Pr(1-CN)] | H | Me | C(=O)Me | O |
| C-13492 | Me(S) | single bond | H | $CH_2$[c-Pr(1-CN)] | H | Me | C(=O)Me | O |
| C-13493 | H | single bond | Me | CH(Me)(c-Pr) | H | Cl | C(=O)Me | O |
| C-13494 | Me | single bond | H | CH(Me)(c-Pr) | H | Cl | C(=O)Me | O |

TABLE 535-continued

| Compound Number | Y | W | Z | $R^1$ | $R^2$ | $R^3$ | $R^{10}$ | A |
|---|---|---|---|---|---|---|---|---|
| C-13495 | Me(R) | single bond | H | CH(Me)(c-Pr) | H | Cl | C(=O)Me | O |
| C-13496 | Me(S) | single bond | H | CH(Me)(c-Pr) | H | Cl | C(=O)Me | O |
| C-13497 | H | single bond | Me | CH(Me)(c-Pr) | H | Me | C(=O)Me | O |
| C-13498 | Me | single bond | H | CH(Me)(c-Pr) | H | Me | C(=O)Me | O |
| C-13499 | Me(R) | single bond | H | CH(Me)(c-Pr) | H | Me | C(=O)Me | O |
| C-13500 | Me(S) | single bond | H | CH(Me)(c-Pr) | H | Me | C(=O)Me | O |
| C-13501 | H | single bond | Me | $CH(Me)CH_2OMe$ | H | Cl | C(=O)Me | O |
| C-13502 | Me | single bond | H | $CH(Me)CH_2OMe$ | H | Cl | C(=O)Me | O |
| C-13503 | Me(R) | single bond | H | $CH(Me)CH_2OMe$ | H | Cl | C(=O)Me | O |
| C-13504 | Me(S) | single bond | H | $CH(Me)CH_2OMe$ | H | Cl | C(=O)Me | O |
| C-13505 | H | single bond | Me | $CH(Me)CH_2OMe$ | H | Me | C(=O)Me | O |
| C-13506 | Me | single bond | H | $CH(Me)CH_2OMe$ | H | Me | C(=O)Me | O |
| C-13507 | Me(R) | single bond | H | $CH(Me)CH_2OMe$ | H | Me | C(=O)Me | O |
| C-13508 | Me(S) | single bond | H | $CH(Me)CH_2OMe$ | H | Me | C(=O)Me | O |
| C-13509 | H | single bond | Me | $CH_2CH{=}CH_2$ | H | Cl | C(=O)Me | O |
| C-13510 | Me | single bond | H | $CH_2CH{=}CH_2$ | H | Cl | C(=O)Me | O |
| C-13511 | Me(R) | single bond | H | $CH_2CH{=}CH_2$ | H | Cl | C(=O)Me | O |
| C-13512 | Me(S) | single bond | H | $CH_2CH{=}CH_2$ | H | Cl | C(=O)Me | O |
| C-13513 | H | single bond | Me | $CH_2CH{=}CH_2$ | H | Me | C(=O)Me | O |
| C-13514 | Me | single bond | H | $CH_2CH{=}CH_2$ | H | Me | C(=O)Me | O |
| C-13515 | Me(R) | single bond | H | $CH_2CH{=}CH_2$ | H | Me | C(=O)Me | O |
| C-13516 | Me(S) | single bond | H | $CH_2CH{=}CH_2$ | H | Me | C(=O)Me | O |
| C-13517 | H | single bond | Me | $CH_2C{\equiv}CH$ | H | Cl | C(=O)Me | O |
| C-13518 | Me | single bond | H | $CH_2C{\equiv}CH$ | H | Cl | C(=O)Me | O |
| C-13519 | Me(R) | single bond | H | $CH_2C{\equiv}CH$ | H | Cl | C(=O)Me | O |
| C-13520 | Me(S) | single bond | H | $CH_2C{\equiv}CH$ | H | Cl | C(=O)Me | O |
| C-13521 | H | single bond | Me | $CH_2C{\equiv}CH$ | H | Me | C(=O)Me | O |
| C-13522 | Me | single bond | H | $CH_2C{\equiv}CH$ | H | Me | C(=O)Me | O |
| C-13523 | Me(R) | single bond | H | $CH_2C{\equiv}CH$ | H | Me | C(=O)Me | O |
| C-13524 | Me(S) | single bond | H | $CH_2C{\equiv}CH$ | H | Me | C(=O)Me | O |
| C-13525 | H | single bond | Me | $CH_2CN$ | H | Cl | C(=O)Me | O |
| C-13526 | Me | single bond | H | $CH_2CN$ | H | Cl | C(=O)Me | O |

TABLE 536

| Compound Number | Y | W | Z | $R^1$ | $R^2$ | $R^3$ | $R^{10}$ | A |
|---|---|---|---|---|---|---|---|---|
| C-13527 | Me(R) | single bond | H | $CH_2CN$ | H | Cl | C(=O)Me | O |
| C-13528 | Me(S) | single bond | H | $CH_2CN$ | H | Cl | C(=O)Me | O |
| C-13529 | H | single bond | Me | $CH_2CN$ | H | Me | C(=O)Me | O |
| C-13530 | Me | single bond | H | $CH_2CN$ | H | Me | C(=O)Me | O |
| C-13531 | Me(R) | single bond | H | $CH_2CN$ | H | Me | C(=O)Me | O |
| C-13532 | Me(S) | single bond | H | $CH_2CN$ | H | Me | C(=O)Me | O |
| C-13533 | H | single bond | Me | CH(Me)CN | H | Cl | C(=O)Me | O |
| C-13534 | Me | single bond | H | CH(Me)CN | H | Cl | C(=O)Me | O |
| C-13535 | Me(R) | single bond | H | CH(Me)CN | H | Cl | C(=O)Me | O |
| C-13536 | Me(S) | single bond | H | CH(Me)CN | H | Cl | C(=O)Me | O |
| C-13537 | H | single bond | Me | CH(Me)CN | H | Me | C(=O)Me | O |
| C-13538 | Me | single bond | H | CH(Me)CN | H | Me | C(=O)Me | O |
| C-13539 | Me(R) | single bond | H | CH(Me)CN | H | Me | C(=O)Me | O |
| C-13540 | Me(S) | single bond | H | CH(Me)CN | H | Me | C(=O)Me | O |
| C-13541 | H | single bond | Me | $C(Me)_2CN$ | H | Cl | C(=O)Me | O |
| C-13542 | Me | single bond | H | $C(Me)_2CN$ | H | Cl | C(=O)Me | O |
| C-13543 | Me(R) | single bond | H | $C(Me)_2CN$ | H | Cl | C(=O)Me | O |
| C-13544 | Me(S) | single bond | H | $C(Me)_2CN$ | H | Cl | C(=O)Me | O |
| C-13545 | H | single bond | Me | $C(Me)_2CN$ | H | Me | C(=O)Me | O |
| C-13546 | Me | single bond | H | $C(Me)_2CN$ | H | Me | C(=O)Me | O |
| C-13547 | Me(R) | single bond | H | $C(Me)_2CN$ | H | Me | C(=O)Me | O |
| C-13548 | Me(S) | single bond | H | $C(Me)_2CN$ | H | Me | C(=O)Me | O |
| C-13549 | H | single bond | Me | C(Me)(i-Pr)CN | H | Cl | C(=O)Me | O |
| C-13550 | Me | single bond | H | C(Me)(i-Pr)CN | H | Cl | C(=O)Me | O |
| C-13551 | Me(R) | single bond | H | C(Me)(i-Pr)CN | H | Cl | C(=O)Me | O |
| C-13552 | Me(S) | single bond | H | C(Me)(i-Pr)CN | H | Cl | C(=O)Me | O |
| C-13553 | H | single bond | Me | C(Me)(i-Pr)CN | H | Me | C(=O)Me | O |
| C-13554 | Me | single bond | H | C(Me)(i-Pr)CN | H | Me | C(=O)Me | O |
| C-13555 | Me(R) | single bond | H | C(Me)(i-Pr)CN | H | Me | C(=O)Me | O |
| C-13556 | Me(S) | single bond | H | C(Me)(i-Pr)CN | H | Me | C(=O)Me | O |
| C-13557 | H | single bond | Me | OMe | H | Cl | C(=O)Me | O |
| C-13558 | Me | single bond | H | OMe | H | Cl | C(=O)Me | O |
| C-13559 | Me(R) | single bond | H | OMe | H | Cl | C(=O)Me | O |
| C-13560 | Me(S) | single bond | H | OMe | H | Cl | C(=O)Me | O |
| C-13561 | H | single bond | Me | OMe | H | Me | C(=O)Me | O |

TABLE 536-continued

| Compound Number | Y | W | Z | $R^1$ | $R^2$ | $R^3$ | $R^{10}$ | A |
|---|---|---|---|---|---|---|---|---|
| C-13562 | Me | single bond | H | OMe | H | Me | C(=O)Me | O |
| C-13563 | Me(R) | single bond | H | OMe | H | Me | C(=O)Me | O |
| C-13564 | Me(S) | single bond | H | OMe | H | Me | C(=O)Me | O |
| C-13565 | H | single bond | Me | CH=NOMe | H | Cl | C(=O)Me | O |
| C-13566 | Me | single bond | H | CH=NOMe | H | Cl | C(=O)Me | O |
| C-13567 | Me(R) | single bond | H | CH=NOMe | H | Cl | C(=O)Me | O |
| C-13568 | Me(S) | single bond | H | CH=NOMe | H | Cl | C(=O)Me | O |
| C-13569 | H | single bond | Me | CH=NOMe | H | Me | C(=O)Me | O |
| C-13570 | Me | single bond | H | CH=NOMe | H | Me | C(=O)Me | O |

TABLE 537

| Compound Number | Y | W | Z | $R^1$ | $R^2$ | $R^3$ | $R^{10}$ | A |
|---|---|---|---|---|---|---|---|---|
| C-13571 | Me(R) | single bond | H | CH=NOMe | H | Me | C(=O)Me | O |
| C-13572 | Me(S) | single bond | H | CH=NOMe | H | Me | C(=O)Me | O |
| C-13573 | H | single bond | Me | morpholin-4-yl | H | Cl | C(=O)Me | O |
| C-13574 | Me | single bond | H | morpholin-4-yl | H | Cl | C(=O)Me | O |
| C-13575 | Me(R) | single bond | H | morpholin-4-yl | H | Cl | C(=O)Me | O |
| C-13576 | Me(S) | single bond | H | morpholin-4-yl | H | Cl | C(=O)Me | O |
| C-13577 | H | single bond | Me | morpholin-4-yl | H | Me | C(=O)Me | O |
| C-13578 | Me | single bond | H | morpholin-4-yl | H | Me | C(=O)Me | O |
| C-13579 | Me(R) | single bond | H | morpholin-4-yl | H | Me | C(=O)Me | O |
| C-13580 | Me(S) | single bond | H | morpholin-4-yl | H | Me | C(=O)Me | O |
| C-13581 | H | single bond | Me | Ph | H | Cl | C(=O)Me | O |
| C-13582 | Me | single bond | H | Ph | H | Cl | C(=O)Me | O |
| C-13583 | Me(R) | single bond | H | Ph | H | Cl | C(=O)Me | O |
| C-13584 | Me(S) | single bond | H | Ph | H | Cl | C(=O)Me | O |
| C-13585 | H | single bond | Me | Ph | H | Me | C(=O)Me | O |
| C-13586 | Me | single bond | H | Ph | H | Me | C(=O)Me | O |
| C-13587 | Me(R) | single bond | H | Ph | H | Me | C(=O)Me | O |
| C-13588 | Me(S) | single bond | H | Ph | H | Me | C(=O)Me | O |
| C-13589 | H | single bond | Me | $CH_2Ph$ | H | Cl | C(=O)Me | O |
| C-13590 | Me | single bond | H | $CH_2Ph$ | H | Cl | C(=O)Me | O |
| C-13591 | Me(R) | single bond | H | $CH_2Ph$ | H | Cl | C(=O)Me | O |
| C-13592 | Me(S) | single bond | H | $CH_2Ph$ | H | Cl | C(=O)Me | O |
| C-13593 | H | single bond | Me | $CH_2Ph$ | H | Me | C(=O)Me | O |
| C-13594 | Me | single bond | H | $CH_2Ph$ | H | Me | C(=O)Me | O |
| C-13595 | Me(R) | single bond | H | $CH_2Ph$ | H | Me | C(=O)Me | O |
| C-13596 | Me(S) | single bond | H | $CH_2Ph$ | H | Me | C(=O)Me | O |
| C-13597 | H | single bond | Me | thiazole-2-yl | H | Cl | C(=O)Me | O |
| C-13598 | Me | single bond | H | thiazole-2-yl | H | Cl | C(=O)Me | O |
| C-13599 | Me(R) | single bond | H | thiazole-2-yl | H | Cl | C(=O)Me | O |
| C-13600 | Me(S) | single bond | H | thiazole-2-yl | H | Cl | C(=O)Me | O |
| C-13601 | H | single bond | Me | thiazole-2-yl | H | Me | C(=O)Me | O |
| C-13602 | Me | single bond | H | thiazole-2-yl | H | Me | C(=O)Me | O |
| C-13603 | Me(R) | single bond | H | thiazole-2-yl | H | Me | C(=O)Me | O |
| C-13604 | Me(S) | single bond | H | thiazole-2-yl | H | Me | C(=O)Me | O |
| C-13605 | H | single bond | Me | 1-Me-pyrazol-3-yl | H | Cl | C(=O)Me | O |
| C-13606 | Me | single bond | H | 1-Me-pyrazol-3-yl | H | Cl | C(=O)Me | O |
| C-13607 | Me(R) | single bond | H | 1-Me-pyrazol-3-yl | H | Cl | C(=O)Me | O |
| C-13608 | Me(S) | single bond | H | 1-Me-pyrazol-3-yl | H | Cl | C(=O)Me | O |
| C-13609 | H | single bond | Me | 1-Me-pyrazol-3-yl | H | Me | C(=O)Me | O |
| C-13610 | Me | single bond | H | 1-Me-pyrazol-3-yl | H | Me | C(=O)Me | O |
| C-13611 | Me(R) | single bond | H | 1-Me-pyrazol-3-yl | H | Me | C(=O)Me | O |
| C-13612 | Me(S) | single bond | H | 1-Me-pyrazol-3-yl | H | Me | C(=O)Me | O |
| C-13613 | H | single bond | Me | 1-Me-pyrazol-5-yl | H | Cl | C(=O)Me | O |
| C-13614 | Me | single bond | H | 1-Me-pyrazol-5-yl | H | Cl | C(=O)Me | O |

TABLE 538

| Compound Number | Y | W | Z | $R^1$ | $R^2$ | $R^3$ | $R^{10}$ | A |
|---|---|---|---|---|---|---|---|---|
| C-13615 | Me(R) | single bond | H | 1-Me-pyrazol-5-yl | H | Cl | C(=O)Me | O |
| C-13616 | Me(S) | single bond | H | 1-Me-pyrazol-5-yl | H | Cl | C(=O)Me | O |
| C-13617 | H | single bond | Me | 1-Me-pyrazol-5-yl | H | Me | C(=O)Me | O |

TABLE 538-continued

| Compound Number | Y | W | Z | $R^1$ | $R^2$ | $R^3$ | $R^{10}$ | A |
|---|---|---|---|---|---|---|---|---|
| C-13618 | Me | single bond | H | 1-Me-pyrazol-5-yl | H | Me | C(=O)Me | O |
| C-13619 | Me(R) | single bond | H | 1-Me-pyrazol-5-yl | H | Me | C(=O)Me | O |
| C-13620 | Me(S) | single bond | H | 1-Me-pyrazol-5-yl | H | Me | C(=O)Me | O |
| C-13621 | H | single bond | Me | $CH_2$(pyrimidin-2-yl) | H | Cl | C(=O)Me | O |
| C-13622 | Me | single bond | H | $CH_2$(pyrimidin-2-yl) | H | Cl | C(=O)Me | O |
| C-13623 | Me(R) | single bond | H | $CH_2$(pyrimidin-2-yl) | H | Cl | C(=O)Me | O |
| C-13624 | Me(S) | single bond | H | $CH_2$(pyrimidin-2-yl) | H | Cl | C(=O)Me | O |
| C-13625 | H | single bond | Me | $CH_2$(pyrimidin-2-yl) | H | Me | C(=O)Me | O |
| C-13626 | Me | single bond | H | $CH_2$(pyrimidin-2-yl) | H | Me | C(=O)Me | O |
| C-13627 | Me(R) | single bond | H | $CH_2$(pyrimidin-2-yl) | H | Me | C(=O)Me | O |
| C-13628 | Me(S) | single bond | H | $CH_2$(pyrimidin-2-yl) | H | Me | C(=O)Me | O |
| C-13629 | H | single bond | Me | $—CH_2CH_2CH_2—$ | | Cl | C(=O)Me | O |
| C-13630 | Me | single bond | H | $—CH_2CH_2CH_2—$ | | Cl | C(=O)Me | O |
| C-13631 | Me(R) | single bond | H | $—CH_2CH_2CH_2—$ | | Cl | C(=O)Me | O |
| C-13632 | Me(S) | single bond | H | $—CH_2CH_2CH_2—$ | | Cl | C(=O)Me | O |
| C-13633 | H | single bond | Me | $—CH_2CH_2CH_2—$ | | Me | C(=O)Me | O |
| C-13634 | Me | single bond | H | $—CH_2CH_2CH_2—$ | | Me | C(=O)Me | O |
| C-13635 | Me(R) | single bond | H | $—CH_2CH_2CH_2—$ | | Me | C(=O)Me | O |
| C-13636 | Me(S) | single bond | H | $—CH_2CH_2CH_2—$ | | Me | C(=O)Me | O |
| C-13637 | H | single bond | Me | $—CH_2CH_2OCH_2CH_2—$ | | Cl | C(=O)Me | O |
| C-13638 | Me | single bond | H | $—CH_2CH_2OCH_2CH_2—$ | | Cl | C(=O)Me | O |
| C-13639 | Me(R) | single bond | H | $—CH_2CH_2OCH_2CH_2—$ | | Cl | C(=O)Me | O |
| C-13640 | Me(S) | single bond | H | $—CH_2CH_2OCH_2CH_2—$ | | Cl | C(=O)Me | O |
| C-13641 | H | single bond | Me | $—CH_2CH_2OCH_2CH_2—$ | | Me | C(=O)Me | O |
| C-13642 | Me | single bond | H | $—CH_2CH_2OCH_2CH_2—$ | | Me | C(=O)Me | O |
| C-13643 | Me(R) | single bond | H | $—CH_2CH_2OCH_2CH_2—$ | | Me | C(=O)Me | O |
| C-13644 | Me(S) | single bond | H | $—CH_2CH_2OCH_2CH_2—$ | | Me | C(=O)Me | O |
| C-13645 | H | single bond | Me | Me | Me | Cl | H | O |
| C-13646 | Me | single bond | H | Me | Me | Cl | H | O |
| C-13647 | Me(R) | single bond | H | Me | Me | Cl | H | O |
| C-13648 | Me(S) | single bond | H | Me | Me | Cl | H | O |
| C-13649 | H | single bond | Me | Me | Me | Me | H | O |
| C-13650 | Me | single bond | H | Me | Me | Me | H | O |
| C-13651 | Me(R) | single bond | H | Me | Me | Me | H | O |
| C-13652 | Me(S) | single bond | H | Me | Me | Me | H | O |
| C-13653 | H | single bond | Me | $CH_2CHF_2$ | Me | Cl | H | O |
| C-13654 | Me | single bond | H | $CH_2CHF_2$ | Me | Cl | H | O |
| C-13655 | Me(R) | single bond | H | $CH_2CHF_2$ | Me | Cl | H | O |
| C-13656 | Me(S) | single bond | H | $CH_2CHF_2$ | Me | Cl | H | O |
| C-13657 | H | single bond | Me | $CH_2CHF_2$ | Me | Me | H | O |
| C-13658 | Me | single bond | H | $CH_2CHF_2$ | Me | Me | H | O |

TABLE 539

| Compound Number | Y | W | Z | $R^1$ | $R^2$ | $R^3$ | $R^{10}$ | A |
|---|---|---|---|---|---|---|---|---|
| C-13659 | Me(R) | single bond | H | $CH_2CHF_2$ | Me | Me | H | O |
| C-13660 | Me(S) | single bond | H | $CH_2CHF_2$ | Me | Me | H | O |
| C-13661 | H | single bond | Me | n-Pr | Me | Cl | H | O |
| C-13662 | Me | single bond | H | n-Pr | Me | Cl | H | O |
| C-13663 | Me(R) | single bond | H | n-Pr | Me | Cl | H | O |
| C-13664 | Me(S) | single bond | H | n-Pr | Me | Cl | H | O |
| C-13665 | H | single bond | Me | n-Pr | Me | Me | H | O |
| C-13666 | Me | single bond | H | n-Pr | Me | Me | H | O |
| C-13667 | Me(R) | single bond | H | n-Pr | Me | Me | H | O |
| C-13668 | Me(S) | single bond | H | n-Pr | Me | Me | H | O |
| C-13669 | H | single bond | Me | i-Pr | Me | Cl | H | O |
| C-13670 | Me | single bond | H | i-Pr | Me | Cl | H | O |
| C-13671 | Me(R) | single bond | H | i-Pr | Me | Cl | H | O |
| C-13672 | Me(S) | single bond | H | i-Pr | Me | Cl | H | O |
| C-13673 | H | single bond | Me | i-Pr | Me | Me | H | O |
| C-13674 | Me | single bond | H | i-Pr | Me | Me | H | O |
| C-13675 | Me(R) | single bond | H | i-Pr | Me | Me | H | O |
| C-13676 | Me(S) | single bond | H | i-Pr | Me | Me | H | O |
| C-13677 | H | single bond | Me | c-Pr(1-F) | Me | Cl | H | O |
| C-13678 | Me | single bond | H | c-Pr(1-F) | Me | Cl | H | O |
| C-13679 | Me(R) | single bond | H | c-Pr(1-F) | Me | Cl | H | O |
| C-13680 | Me(S) | single bond | H | c-Pr(1-F) | Me | Cl | H | O |
| C-13681 | H | single bond | Me | c-Pr(1-F) | Me | Me | H | O |
| C-13682 | Me | single bond | H | c-Pr(1-F) | Me | Me | H | O |
| C-13683 | Me(R) | single bond | H | c-Pr(1-F) | Me | Me | H | O |
| C-13684 | Me(S) | single bond | H | c-Pr(1-F) | Me | Me | H | O |
| C-13685 | H | single bond | Me | c-Pr(2,2-$F_2$) | Me | Cl | H | O |
| C-13686 | Me | single bond | H | c-Pr(2,2-$F_2$) | Me | Cl | H | O |
| C-13687 | Me(R) | single bond | H | c-Pr(2,2-$F_2$) | Me | Cl | H | O |
| C-13688 | Me(S) | single bond | H | c-Pr(2,2-$F_2$) | Me | Cl | H | O |
| C-13689 | H | single bond | Me | c-Pr(2,2-$F_2$) | Me | Me | H | O |
| C-13690 | Me | single bond | H | c-Pr(2,2-$F_2$) | Me | Me | H | O |
| C-13691 | Me(R) | single bond | H | c-Pr(2,2-$F_2$) | Me | Me | H | O |
| C-13692 | Me(S) | single bond | H | c-Pr(2,2-$F_2$) | Me | Me | H | O |
| C-13693 | H | single bond | Me | c-Pr(1-Cl) | Me | Cl | H | O |
| C-13694 | Me | single bond | H | c-Pr(1-Cl) | Me | Cl | H | O |
| C-13695 | Me(R) | single bond | H | c-Pr(1-Cl) | Me | Cl | H | O |
| C-13696 | Me(S) | single bond | H | c-Pr(1-Cl) | Me | Cl | H | O |
| C-13697 | H | single bond | Me | c-Pr(1-Cl) | Me | Me | H | O |
| C-13698 | Me | single bond | H | c-Pr(1-Cl) | Me | Me | H | O |
| C-13699 | Me(R) | single bond | H | c-Pr(1-Cl) | Me | Me | H | O |
| C-13700 | Me(S) | single bond | H | c-Pr(1-Cl) | Me | Me | H | O |
| C-13701 | H | single bond | Me | c-Pr(1-Br) | Me | Cl | H | O |
| C-13702 | Me | single bond | H | c-Pr(1-Br) | Me | Cl | H | O |

TABLE 540

| Compound Number | Y | W | Z | $R^1$ | $R^2$ | $R^3$ | $R^{10}$ | A |
|---|---|---|---|---|---|---|---|---|
| C-13703 | Me(R) | single bond | H | c-Pr(1-Br) | Me | Cl | H | O |
| C-13704 | Me(S) | single bond | H | c-Pr(1-Br) | Me | Cl | H | O |
| C-13705 | H | single bond | Me | c-Pr(1-Br) | Me | Me | H | O |
| C-13706 | Me | single bond | H | c-Pr(1-Br) | Me | Me | H | O |
| C-13707 | Me(R) | single bond | H | c-Pr(1-Br) | Me | Me | H | O |
| C-13708 | Me(S) | single bond | H | c-Pr(1-Br) | Me | Me | H | O |
| C-13709 | H | single bond | Me | c-Pr(1-Me) | Me | Cl | H | O |
| C-13710 | Me | single bond | H | c-Pr(1-Me) | Me | Cl | H | O |
| C-13711 | Me(R) | single bond | H | c-Pr(1-Me) | Me | Cl | H | O |
| C-13712 | Me(S) | single bond | H | c-Pr(1-Me) | Me | Cl | H | O |
| C-13713 | H | single bond | Me | c-Pr(1-Me) | Me | Me | H | O |
| C-13714 | Me | single bond | H | c-Pr(1-Me) | Me | Me | H | O |
| C-13715 | Me(R) | single bond | H | c-Pr(1-Me) | Me | Me | H | O |
| C-13716 | Me(S) | single bond | H | c-Pr(1-Me) | Me | Me | H | O |
| C-13717 | H | single bond | Me | c-Pr(1-$CH_2$OH) | Me | Cl | H | O |
| C-13718 | Me | single bond | H | c-Pr(1-$CH_2$OH) | Me | Cl | H | O |
| C-13719 | Me(R) | single bond | H | c-Pr(1-$CH_2$OH) | Me | Cl | H | O |
| C-13720 | Me(S) | single bond | H | c-Pr(1-$CH_2$OH) | Me | Cl | H | O |
| C-13721 | H | single bond | Me | c-Pr(1-$CH_2$OH) | Me | Me | H | O |
| C-13722 | Me | single bond | H | c-Pr(1-$CH_2$OH) | Me | Me | H | O |
| C-13723 | Me(R) | single bond | H | c-Pr(1-$CH_2$OH) | Me | Me | H | O |
| C-13724 | Me(S) | single bond | H | c-Pr(1-$CH_2$OH) | Me | Me | H | O |
| C-13725 | H | single bond | Me | c-Pr[1-$CH_2$OS(═O)$_2$Me] | Me | Cl | H | O |
| C-13726 | Me | single bond | H | c-Pr[1-$CH_2$OS(═O)$_2$Me] | Me | Cl | H | O |
| C-13727 | Me(R) | single bond | H | c-Pr[1-$CH_2$OS(═O)$_2$Me] | Me | Cl | H | O |
| C-13728 | Me(S) | single bond | H | c-Pr[1-$CH_2$OS(═O)$_2$Me] | Me | Cl | H | O |
| C-13729 | H | single bond | Me | c-Pr[1-$CH_2$OS(═O)$_2$Me] | Me | Me | H | O |
| C-13730 | Me | single bond | H | c-Pr[1-$CH_2$OS(═O)$_2$Me] | Me | Me | H | O |
| C-13731 | Me(R) | single bond | H | c-Pr[1-$CH_2$OS(═O)$_2$Me] | Me | Me | H | O |
| C-13732 | Me(S) | single bond | H | c-Pr[1-$CH_2$OS(═O)$_2$Me] | Me | Me | H | O |
| C-13733 | H | single bond | Me | c-Pr(1-$CH_2$OMe) | Me | Cl | H | O |
| C-13734 | Me | single bond | H | c-Pr(1-$CH_2$OMe) | Me | Cl | H | O |
| C-13735 | Me(R) | single bond | H | c-Pr(1-$CH_2$OMe) | Me | Cl | H | O |
| C-13736 | Me(S) | single bond | H | c-Pr(1-$CH_2$OMe) | Me | Cl | H | O |
| C-13737 | H | single bond | Me | c-Pr(1-$CH_2$OMe) | Me | Me | H | O |
| C-13738 | Me | single bond | H | c-Pr(1-$CH_2$OMe) | Me | Me | H | O |
| C-13739 | Me(R) | single bond | H | c-Pr(1-$CH_2$OMe) | Me | Me | H | O |
| C-13740 | Me(S) | single bond | H | c-Pr(1-$CH_2$OMe) | Me | Me | H | O |
| C-13741 | H | single bond | Me | c-Pr(1-$CH_2$CN) | Me | Cl | H | O |
| C-13742 | Me | single bond | H | c-Pr(1-$CH_2$CN) | Me | Cl | H | O |
| C-13743 | Me(R) | single bond | H | c-Pr(1-$CH_2$CN) | Me | Cl | H | O |
| C-13744 | Me(S) | single bond | H | c-Pr(1-$CH_2$CN) | Me | Cl | H | O |
| C-13745 | H | single bond | Me | c-Pr(1-$CH_2$CN) | Me | Me | H | O |
| C-13746 | Me | single bond | H | c-Pr(1-$CH_2$CN) | Me | Me | H | O |

TABLE 541

| Compound Number | Y | W | Z | $R^1$ | $R^2$ | $R^3$ | $R^{10}$ | A |
|---|---|---|---|---|---|---|---|---|
| C-13747 | Me(R) | single bond | H | c-Pr(1-$CH_2$CN) | Me | Me | H | O |
| C-13748 | Me(S) | single bond | H | c-Pr(1-$CH_2$CN) | Me | Me | H | O |
| C-13749 | H | single bond | Me | c-Pr(1-$CH_2$SMe) | Me | Cl | H | O |
| C-13750 | Me | single bond | H | c-Pr(1-$CH_2$SMe) | Me | Cl | H | O |
| C-13751 | Me(R) | single bond | H | c-Pr(1-$CH_2$SMe) | Me | Cl | H | O |
| C-13752 | Me(S) | single bond | H | c-Pr(1-$CH_2$SMe) | Me | Cl | H | O |
| C-13753 | H | single bond | Me | c-Pr(1-$CH_2$SMe) | Me | Me | H | O |
| C-13754 | Me | single bond | H | c-Pr(1-$CH_2$SMe) | Me | Me | H | O |
| C-13755 | Me(R) | single bond | H | c-Pr(1-$CH_2$SMe) | Me | Me | H | O |
| C-13756 | Me(S) | single bond | H | c-Pr(1-$CH_2$SMe) | Me | Me | H | O |
| C-13757 | H | single bond | Me | c-Pr[1-$CH_2$S(═O)Me] | Me | Cl | H | O |
| C-13758 | Me | single bond | H | c-Pr[1-$CH_2$S(═O)Me] | Me | Cl | H | O |
| C-13759 | Me(R) | single bond | H | c-Pr[1-$CH_2$S(═O)Me] | Me | Cl | H | O |
| C-13760 | Me(S) | single bond | H | c-Pr[1-$CH_2$S(═O)Me] | Me | Cl | H | O |
| C-13761 | H | single bond | Me | c-Pr[1-$CH_2$S(═O)Me] | Me | Me | H | O |
| C-13762 | Me | single bond | H | c-Pr[1-$CH_2$S(═O)Me] | Me | Me | H | O |
| C-13763 | Me(R) | single bond | H | c-Pr[1-$CH_2$S(═O)Me] | Me | Me | H | O |
| C-13764 | Me(S) | single bond | H | c-Pr[1-$CH_2$S(═O)Me] | Me | Me | H | O |
| C-13765 | H | single bond | Me | c-Pr[1-$CH_2$S(═O)$_2$Me] | Me | Cl | H | O |
| C-13766 | Me | single bond | H | c-Pr[1-$CH_2$S(═O)$_2$Me] | Me | Cl | H | O |
| C-13767 | Me(R) | single bond | H | c-Pr[1-$CH_2$S(═O)$_2$Me] | Me | Cl | H | O |
| C-13768 | Me(S) | single bond | H | c-Pr[1-$CH_2$S(═O)$_2$Me] | Me | Cl | H | O |
| C-13769 | H | single bond | Me | c-Pr[1-$CH_2$S(═O)$_2$Me] | Me | Me | H | O |

TABLE 541-continued

| Compound Number | Y | W | Z | $R^1$ | $R^2$ | $R^3$ | $R^{10}$ | A |
|---|---|---|---|---|---|---|---|---|
| C-13770 | Me | single bond | H | c-Pr[1-$CH_2S(=O)_2Me$] | Me | Me | H | O |
| C-13771 | Me(R) | single bond | H | c-Pr[1-$CH_2S(=O)_2Me$] | Me | Me | H | O |
| C-13772 | Me(S) | single bond | H | c-Pr[1-$CH_2S(=O)_2Me$] | Me | Me | H | O |
| C-13773 | H | single bond | Me | c-Pr(1-$CH_2F$) | Me | Cl | H | O |
| C-13774 | Me | single bond | H | c-Pr(1-$CH_2F$) | Me | Cl | H | O |
| C-13775 | Me(R) | single bond | H | c-Pr(1-$CH_2F$) | Me | Cl | H | O |
| C-13776 | Me(S) | single bond | H | c-Pr(1-$CH_2F$) | Me | Cl | H | O |
| C-13777 | H | single bond | Me | c-Pr(1-$CH_2F$) | Me | Me | H | O |
| C-13778 | Me | single bond | H | c-Pr(1-$CH_2F$) | Me | Me | H | O |
| C-13779 | Me(R) | single bond | H | c-Pr(1-$CH_2F$) | Me | Me | H | O |
| C-13780 | Me(S) | single bond | H | c-Pr(1-$CH_2F$) | Me | Me | H | O |
| C-13781 | H | single bond | Me | c-Pr(1-$CHF_2$) | Me | Cl | H | O |
| C-13782 | Me | single bond | H | c-Pr(1-$CHF_2$) | Me | Cl | H | O |
| C-13783 | Me(R) | single bond | H | c-Pr(1-$CHF_2$) | Me | Cl | H | O |
| C-13784 | Me(S) | single bond | H | c-Pr(1-$CHF_2$) | Me | Cl | H | O |
| C-13785 | H | single bond | Me | c-Pr(1-$CHF_2$) | Me | Me | H | O |
| C-13786 | Me | single bond | H | c-Pr(1-$CHF_2$) | Me | Me | H | O |
| C-13787 | Me(R) | single bond | H | c-Pr(1-$CHF_2$) | Me | Me | H | O |
| C-13788 | Me(S) | single bond | H | c-Pr(1-$CHF_2$) | Me | Me | H | O |
| C-13789 | H | single bond | Me | c-Pr(1-$CF_3$) | Me | Cl | H | O |
| C-13790 | Me | single bond | H | c-Pr(1-$CF_3$) | Me | Cl | H | O |

TABLE 542

| Compound Number | Y | W | Z | $R^1$ | $R^2$ | $R^3$ | $R^{10}$ | A |
|---|---|---|---|---|---|---|---|---|
| C-13791 | Me(R) | single bond | H | c-Pr(1-$CF_3$) | Me | Cl | H | O |
| C-13792 | Me(S) | single bond | H | c-Pr(1-$CF_3$) | Me | Cl | H | O |
| C-13793 | H | single bond | Me | c-Pr(1-$CF_3$) | Me | Me | H | O |
| C-13794 | Me | single bond | H | c-Pr(1-$CF_3$) | Me | Me | H | O |
| C-13795 | Me(R) | single bond | H | c-Pr(1-$CF_3$) | Me | Me | H | O |
| C-13796 | Me(S) | single bond | H | c-Pr(1-$CF_3$) | Me | Me | H | O |
| C-13797 | H | single bond | Me | c-Pr(1-C≡CH) | Me | Cl | H | O |
| C-13798 | Me | single bond | H | c-Pr(1-C≡CH) | Me | Cl | H | O |
| C-13799 | Me(R) | single bond | H | c-Pr(1-C≡CH) | Me | Cl | H | O |
| C-13800 | Me(S) | single bond | H | c-Pr(1-C≡CH) | Me | Cl | H | O |
| C-13801 | H | single bond | Me | c-Pr(1-C≡CH) | Me | Me | H | O |
| C-13802 | Me | single bond | H | c-Pr(1-C≡CH) | Me | Me | H | O |
| C-13803 | Me(R) | single bond | H | c-Pr(1-C≡CH) | Me | Me | H | O |
| C-13804 | Me(S) | single bond | H | c-Pr(1-C≡CH) | Me | Me | H | O |
| C-13805 | H | single bond | Me | c-Pr[1-C(=O)OEt] | Me | Cl | H | O |
| C-13806 | Me | single bond | H | c-Pr[1-C(=O)OEt] | Me | Cl | H | O |
| C-13807 | Me(R) | single bond | H | c-Pr[1-C(=O)OEt] | Me | Cl | H | O |
| C-13808 | Me(S) | single bond | H | c-Pr[1-C(=O)OEt] | Me | Cl | H | O |
| C-13809 | H | single bond | Me | c-Pr[1-C(=O)OEt] | Me | Me | H | O |
| C-13810 | Me | single bond | H | c-Pr[1-C(=O)OEt] | Me | Me | H | O |
| C-13811 | Me(R) | single bond | H | c-Pr[1-C(=O)OEt] | Me | Me | H | O |
| C-13812 | Me(S) | single bond | H | c-Pr[1-C(=O)OEt] | Me | Me | H | O |
| C-13813 | H | single bond | Me | c-Pr[1-C(=O)OH] | Me | Cl | H | O |
| C-13814 | Me | single bond | H | c-Pr[1-C(=O)OH] | Me | Cl | H | O |
| C-13815 | Me(R) | single bond | H | c-Pr[1-C(=O)OH] | Me | Cl | H | O |
| C-13816 | Me(S) | single bond | H | c-Pr[1-C(=O)OH] | Me | Cl | H | O |
| C-13817 | H | single bond | Me | c-Pr[1-C(=O)OH] | Me | Me | H | O |
| C-13818 | Me | single bond | H | c-Pr[1-C(=O)OH] | Me | Me | H | O |
| C-13819 | Me(R) | single bond | H | c-Pr[1-C(=O)OH] | Me | Me | H | O |
| C-13820 | Me(S) | single bond | H | c-Pr[1-C(=O)OH] | Me | Me | H | O |
| C-13821 | H | single bond | Me | c-Pr[1-C(=O)$NH_2$] | Me | Cl | H | O |
| C-13822 | Me | single bond | H | c-Pr[1-C(=O)$NH_2$] | Me | Cl | H | O |
| C-13823 | Me(R) | single bond | H | c-Pr[1-C(=O)$NH_2$] | Me | Cl | H | O |
| C-13824 | Me(S) | single bond | H | c-Pr[1-C(=O)$NH_2$] | Me | Cl | H | O |
| C-13825 | H | single bond | Me | c-Pr[1-C(=O)$NH_2$] | Me | Me | H | O |
| C-13826 | Me | single bond | H | c-Pr[1-C(=O)$NH_2$] | Me | Me | H | O |
| C-13827 | Me(R) | single bond | H | c-Pr[1-C(=O)$NH_2$] | Me | Me | H | O |
| C-13828 | Me(S) | single bond | H | c-Pr[1-C(=O)$NH_2$] | Me | Me | H | O |
| C-13829 | H | single bond | Me | c-Pr(1-OMe) | Me | Cl | H | O |
| C-13830 | Me | single bond | H | c-Pr(1-OMe) | Me | Cl | H | O |
| C-13831 | Me(R) | single bond | H | c-Pr(1-OMe) | Me | Cl | H | O |
| C-13832 | Me(S) | single bond | H | c-Pr(1-OMe) | Me | Cl | H | O |
| C-13833 | H | single bond | Me | c-Pr(1-OMe) | Me | Me | H | O |
| C-13834 | Me | single bond | H | c-Pr(1-OMe) | Me | Me | H | O |

TABLE 543

| Compound Number | Y | W | Z | $R^1$ | $R^2$ | $R^3$ | $R^{10}$ | A |
|---|---|---|---|---|---|---|---|---|
| C-13835 | Me(R) | single bond | H | c-Pr(1-OMe) | Me | Me | H | O |
| C-13836 | Me(S) | single bond | H | c-Pr(1-OMe) | Me | Me | H | O |
| C-13837 | H | single bond | Me | c-Pr(1-SMe) | Me | Cl | H | O |
| C-13838 | Me | single bond | H | c-Pr(1-SMe) | Me | Cl | H | O |
| C-13839 | Me(R) | single bond | H | c-Pr(1-SMe) | Me | Cl | H | O |
| C-13840 | Me(S) | single bond | H | c-Pr(1-SMe) | Me | Cl | H | O |
| C-13841 | H | single bond | Me | c-Pr(1-SMe) | Me | Me | H | O |
| C-13842 | Me | single bond | H | c-Pr(1-SMe) | Me | Me | H | O |
| C-13843 | Me(R) | single bond | H | c-Pr(1-SMe) | Me | Me | H | O |
| C-13844 | Me(S) | single bond | H | c-Pr(1-SMe) | Me | Me | H | O |
| C-13845 | H | single bond | Me | c-Pr[1-S(=O)Me] | Me | Cl | H | O |
| C-13846 | Me | single bond | H | c-Pr[1-S(=O)Me] | Me | Cl | H | O |
| C-13847 | Me(R) | single bond | H | c-Pr[1-S(=O)Me] | Me | Cl | H | O |
| C-13848 | Me(S) | single bond | H | c-Pr[1-S(=O)Me] | Me | Cl | H | O |
| C-13849 | H | single bond | Me | c-Pr[1-S(=O)Me] | Me | Me | H | O |
| C-13850 | Me | single bond | H | c-Pr[1-S(=O)Me] | Me | Me | H | O |
| C-13851 | Me(R) | single bond | H | c-Pr[1-S(=O)Me] | Me | Me | H | O |
| C-13852 | Me(S) | single bond | H | c-Pr[1-S(=O)Me] | Me | Me | H | O |
| C-13853 | H | single bond | Me | c-Pr[1-S(=O)$_2$Me] | Me | Cl | H | O |
| C-13854 | Me | single bond | H | c-Pr[1-S(=O)$_2$Me] | Me | Cl | H | O |
| C-13855 | Me(R) | single bond | H | c-Pr[1-S(=O)$_2$Me] | Me | Cl | H | O |
| C-13856 | Me(S) | single bond | H | c-Pr[1-S(=O)$_2$Me] | Me | Cl | H | O |
| C-13857 | H | single bond | Me | c-Pr[1-S(=O)$_2$Me] | Me | Me | H | O |
| C-13858 | Me | single bond | H | c-Pr[1-S(=O)$_2$Me] | Me | Me | H | O |
| C-13859 | Me(R) | single bond | H | c-Pr[1-S(=O)$_2$Me] | Me | Me | H | O |
| C-13860 | Me(S) | single bond | H | c-Pr[1-S(=O)$_2$Me] | Me | Me | H | O |
| C-13861 | H | single bond | Me | c-Pr[1-S(=O)$_2$CHF$_2$] | Me | Cl | H | O |
| C-13862 | Me | single bond | H | c-Pr[1-S(=O)$_2$CHF$_2$] | Me | Cl | H | O |
| C-13863 | Me(R) | single bond | H | c-Pr[1-S(=O)$_2$CHF$_2$] | Me | Cl | H | O |
| C-13864 | Me(S) | single bond | H | c-Pr[1-S(=O)$_2$CHF$_2$] | Me | Cl | H | O |
| C-13865 | H | single bond | Me | c-Pr[1-S(=O)$_2$CHF$_2$] | Me | Me | H | O |
| C-13866 | Me | single bond | H | c-Pr[1-S(=O)$_2$CHF$_2$] | Me | Me | H | O |
| C-13867 | Me(R) | single bond | H | c-Pr[1-S(=O)$_2$CHF$_2$] | Me | Me | H | O |
| C-13868 | Me(S) | single bond | H | c-Pr[1-S(=O)$_2$CHF$_2$] | Me | Me | H | O |
| C-13869 | H | single bond | Me | c-Pr[1-S(=O)$_2$CF$_3$] | Me | Cl | H | O |
| C-13870 | Me | single bond | H | c-Pr[1-S(=O)$_2$CF$_3$] | Me | Cl | H | O |
| C-13871 | Me(R) | single bond | H | c-Pr[1-S(=O)$_2$CF$_3$] | Me | Cl | H | O |
| C-13872 | Me(S) | single bond | H | c-Pr[1-S(=O)$_2$CF$_3$] | Me | Cl | H | O |
| C-13873 | H | single bond | Me | c-Pr[1-S(=O)$_2$CF$_3$] | Me | Me | H | O |
| C-13874 | Me | single bond | H | c-Pr[1-S(=O)$_2$CF$_3$] | Me | Me | H | O |
| C-13875 | Me(R) | single bond | H | c-Pr[1-S(=O)$_2$CF$_3$] | Me | Me | H | O |
| C-13876 | Me(S) | single bond | H | c-Pr[1-S(=O)$_2$CF$_3$] | Me | Me | H | O |
| C-13877 | H | single bond | Me | c-Pr[1-(5,6-dihydro-1,4,2-dioxazin-3-yl)] | Me | Cl | H | O |
| C-13878 | Me | single bond | H | c-Pr[1-(5,6-dihydro-1,4,2-dioxazin-3-yl)] | Me | Cl | H | O |

TABLE 544

| Compound Number | Y | W | Z | $R^1$ | $R^2$ | $R^3$ | $R^{10}$ | A |
|---|---|---|---|---|---|---|---|---|
| C-13879 | Me(R) | single bond | H | c-Pr[1-(5,6-dihydro-1,4,2-dioxazin-3-yl)] | Me | Cl | H | O |
| C-13880 | Me(S) | single bond | H | c-Pr[1-(5,6-dihydro-1,4,2-dioxazin-3-yl)] | Me | Cl | H | O |
| C-13881 | H | single bond | Me | c-Pr[1-(5,6-dihydro-1,4,2-dioxazin-3-yl)] | Me | Me | H | O |
| C-13882 | Me | single bond | H | c-Pr[1-(5,6-dihydro-1,4,2-dioxazin-3-yl)] | Me | Me | H | O |
| C-13883 | Me(R) | single bond | H | c-Pr[1-(5,6-dihydro-1,4,2-dioxazin-3-yl)] | Me | Me | H | O |
| C-13884 | Me(S) | single bond | H | c-Pr[1-(5,6-dihydro-1,4,2-dioxazin-3-yl)] | Me | Me | H | O |
| C-13885 | H | single bond | Me | c-Pr[1-(5-hydroxy-1,3,4-oxadiazol-2-yl)] | Me | Cl | H | O |
| C-13886 | Me | single bond | H | c-Pr[1-(5-hydroxy-1,3,4-oxadiazol-2-yl)] | Me | Cl | H | O |
| C-13887 | Me(R) | single bond | H | c-Pr[1-(5-hydroxy-1,3,4-oxadiazol-2-yl)] | Me | Cl | H | O |
| C-13888 | Me(S) | single bond | H | c-Pr[1-(5-hydroxy-1,3,4-oxadiazol-2-yl)] | Me | Cl | H | O |
| C-13889 | H | single bond | Me | c-Pr[1-(5-hydroxy-1,3,4-oxadiazol-2-yl)] | Me | Me | H | O |
| C-13890 | Me | single bond | H | c-Pr[1-(5-hydroxy-1,3,4-oxadiazol-2-yl)] | Me | Me | H | O |
| C-13891 | Me(R) | single bond | H | c-Pr[1-(5-hydroxy-1,3,4-oxadiazol-2-yl)] | Me | Me | H | O |
| C-13892 | Me(S) | single bond | H | c-Pr[1-(5-hydroxy-1,3,4-oxadiazol-2-yl)] | Me | Me | H | O |
| C-13893 | H | single bond | Me | c-Pr[1-(pyrimidin-2-yl)] | Me | Cl | H | O |
| C-13894 | Me | single bond | H | c-Pr[1-(pyrimidin-2-yl)] | Me | Cl | H | O |
| C-13895 | Me(R) | single bond | H | c-Pr[1-(pyrimidin-2-yl)] | Me | Cl | H | O |
| C-13896 | Me(S) | single bond | H | c-Pr[1-(pyrimidin-2-yl)] | Me | Cl | H | O |
| C-13897 | H | single bond | Me | c-Pr[1-(pyrimidin-2-yl)] | Me | Me | H | O |
| C-13898 | Me | single bond | H | c-Pr[1-(pyrimidin-2-yl)] | Me | Me | H | O |
| C-13899 | Me(R) | single bond | H | c-Pr[1-(pyrimidin-2-yl)] | Me | Me | H | O |

TABLE 544-continued

| Compound Number | Y | W | Z | $R^1$ | $R^2$ | $R^3$ | $R^{10}$ | A |
|---|---|---|---|---|---|---|---|---|
| C-13900 | Me(S) | single bond | H | c-Pr[1-(pyrimidin-2-yl)] | Me | Me | H | O |
| C-13901 | H | single bond | Me | t-Bu | Me | Cl | H | O |
| C-13902 | Me | single bond | H | t-Bu | Me | Cl | H | O |
| C-13903 | Me(R) | single bond | H | t-Bu | Me | Cl | H | O |
| C-13904 | Me(S) | single bond | H | t-Bu | Me | Cl | H | O |
| C-13905 | H | single bond | Me | t-Bu | Me | Me | H | O |
| C-13906 | Me | single bond | H | t-Bu | Me | Me | H | O |
| C-13907 | Me(R) | single bond | H | t-Bu | Me | Me | H | O |
| C-13908 | Me(S) | single bond | H | t-Bu | Me | Me | H | O |
| C-13909 | H | single bond | Me | c-Bu | Me | Cl | H | O |
| C-13910 | Me | single bond | H | c-Bu | Me | Cl | H | O |
| C-13911 | Me(R) | single bond | H | c-Bu | Me | Cl | H | O |
| C-13912 | Me(S) | single bond | H | c-Bu | Me | Cl | H | O |
| C-13913 | H | single bond | Me | c-Bu | Me | Me | H | O |
| C-13914 | Me | single bond | H | c-Bu | Me | Me | H | O |
| C-13915 | Me(R) | single bond | H | c-Bu | Me | Me | H | O |
| C-13916 | Me(S) | single bond | H | c-Bu | Me | Me | H | O |
| C-13917 | H | single bond | Me | c-Bu(1-CN) | Me | Cl | H | O |
| C-13918 | Me | single bond | H | c-Bu(1-CN) | Me | Cl | H | O |
| C-13919 | Me(R) | single bond | H | c-Bu(1-CN) | Me | Cl | H | O |
| C-13920 | Me(S) | single bond | H | c-Bu(1-CN) | Me | Cl | H | O |
| C-13921 | H | single bond | Me | c-Bu(1-CN) | Me | Me | H | O |
| C-13922 | Me | single bond | H | c-Bu(1-CN) | Me | Me | H | O |

TABLE 545

| Compound Number | Y | W | Z | $R^1$ | $R^2$ | $R^3$ | $R^{10}$ | A |
|---|---|---|---|---|---|---|---|---|
| C-13923 | Me(R) | single bond | H | c-Bu(1-CN) | Me | Me | H | O |
| C-13924 | Me(S) | single bond | H | c-Bu(1-CN) | Me | Me | H | O |
| C-13925 | H | single bond | Me | c-Bu(3,3-$F_2$) | Me | Cl | H | O |
| C-13926 | Me | single bond | H | c-Bu(3,3-$F_2$) | Me | Cl | H | O |
| C-13927 | Me(R) | single bond | H | c-Bu(3,3-$F_2$) | Me | Cl | H | O |
| C-13928 | Me(S) | single bond | H | c-Bu(3,3-$F_2$) | Me | Cl | H | O |
| C-13929 | H | single bond | Me | c-Bu(3,3-$F_2$) | Me | Me | H | O |
| C-13930 | Me | single bond | H | c-Bu(3,3-$F_2$) | Me | Me | H | O |
| C-13931 | Me(R) | single bond | H | c-Bu(3,3-$F_2$) | Me | Me | H | O |
| C-13932 | Me(S) | single bond | H | c-Bu(3,3-$F_2$) | Me | Me | H | O |
| C-13933 | H | single bond | Me | oxetan-3-yl | Me | Cl | H | O |
| C-13934 | Me | single bond | H | oxetan-3-yl | Me | Cl | H | O |
| C-13935 | Me(R) | single bond | H | oxetan-3-yl | Me | Cl | H | O |
| C-13936 | Me(S) | single bond | H | oxetan-3-yl | Me | Cl | H | O |
| C-13937 | H | single bond | Me | oxetan-3-yl | Me | Me | H | O |
| C-13938 | Me | single bond | H | oxetan-3-yl | Me | Me | H | O |
| C-13939 | Me(R) | single bond | H | oxetan-3-yl | Me | Me | H | O |
| C-13940 | Me(S) | single bond | H | oxetan-3-yl | Me | Me | H | O |
| C-13941 | H | single bond | Me | oxetan(3-CN)-3-yl | Me | Cl | H | O |
| C-13942 | Me | single bond | H | oxetan(3-CN)-3-yl | Me | Cl | H | O |
| C-13943 | Me(R) | single bond | H | oxetan(3-CN)-3-yl | Me | Cl | H | O |
| C-13944 | Me(S) | single bond | H | oxetan(3-CN)-3-yl | Me | Cl | H | O |
| C-13945 | H | single bond | Me | oxetan(3-CN)-3-yl | Me | Me | H | O |
| C-13946 | Me | single bond | I | oxetan(3-CN)-3-yl | Me | Me | H | O |
| C-13947 | Me(R) | single bond | H | oxetan(3-CN)-3-yl | Me | Me | H | O |
| C-13948 | Me(S) | single bond | H | oxetan(3-CN)-3-yl | Me | Me | H | O |
| C-13949 | H | single bond | Me | azetidin[1-C(═O)Me]-3-yl | Me | Cl | H | O |
| C-13950 | Me | single bond | H | azetidin[1-C(═O)Me]-3-yl | Me | Cl | H | O |
| C-13951 | Me(R) | single bond | H | azetidin[1-C(═O)Me]-3-yl | Me | Cl | H | O |
| C-13952 | Me(S) | single bond | H | azetidin[1-C(═O)Me]-3-yl | Me | Cl | H | O |
| C-13953 | H | single bond | Me | azetidin[1-C(═O)Me]-3-yl | Me | Me | H | O |
| C-13954 | Me | single bond | H | azetidin[1-C(═O)Me]-3-yl | Me | Me | H | O |
| C-13955 | Me(R) | single bond | H | azetidin[1-C(═O)Me]-3-yl | Me | Me | H | O |
| C-13956 | Me(S) | single bond | H | azetidin[1-C(═O)Me]-3-yl | Me | Me | H | O |
| C-13957 | H | single bond | Me | azetidin[1-S(═O)$_2$Me]-3-yl | Me | Cl | H | O |
| C-13958 | Me | single bond | H | azetidin[1-S(═O)$_2$Me]-3-yl | Me | Cl | H | O |
| C-13959 | Me(R) | single bond | H | azetidin[1-S(═O)$_2$Me]-3-yl | Me | Cl | H | O |
| C-13960 | Me(S) | single bond | H | azetidin[1-S(═O)$_2$Me]-3-yl | Me | Cl | H | O |
| C-13961 | H | single bond | Me | azetidin[1-S(═O)$_2$Me]-3-yl | Me | Me | H | O |
| C-13962 | Me | single bond | H | azetidin[1-S(═O)$_2$Me]-3-yl | Me | Me | H | O |
| C-13963 | Me(R) | single bond | H | azetidin[1-S(═O)$_2$Me]-3-yl | Me | Me | H | O |
| C-13964 | Me(S) | single bond | H | azetidin[1-S(═O)$_2$Me]-3-yl | Me | Me | H | O |

TABLE 545-continued

| Compound Number | Y | W | Z | $R^1$ | $R^2$ | $R^3$ | $R^{10}$ | A |
|---|---|---|---|---|---|---|---|---|
| C-13965 | H | single bond | Me | azetidin[1-S(=O)$_2$CHF$_2$]-3-yl | Me | Cl | H | O |
| C-13966 | Me | single bond | H | azetidin[1-S(=O)$_2$CHF$_2$]-3-yl | Me | Cl | H | O |

TABLE 546

| Compound Number | Y | W | Z | $R^1$ | $R^2$ | $R^3$ | $R^{10}$ | A |
|---|---|---|---|---|---|---|---|---|
| C-13967 | Me(R) | single bond | H | azetidin[1-S(=O)$_2$CHF$_2$]-3-yl | Me | Cl | H | O |
| C-13968 | Me(S) | single bond | H | azetidin[1-S(=O)$_2$CHF$_2$]-3-yl | Me | Cl | H | O |
| C-13969 | H | single bond | Me | azetidin[1-S(=O)$_2$CHF$_2$]-3-yl | Me | Me | H | O |
| C-13970 | Me | single bond | H | azetidin[1-S(=O)$_2$CHF$_2$]-3-yl | Me | Me | H | O |
| C-13971 | Me(R) | single bond | H | azetidin[1-S(=O)$_2$CHF$_2$]-3-yl | Me | Me | H | O |
| C-13972 | Me(S) | single bond | H | azetidin[1-S(=O)$_2$CHF$_2$]-3-yl | Me | Me | H | O |
| C-13973 | H | single bond | Me | c-Pen | Me | Cl | H | O |
| C-13974 | Me | single bond | H | c-Pen | Me | Cl | H | O |
| C-13975 | Me(R) | single bond | H | c-Pen | Me | Cl | H | O |
| C-13976 | Me(S) | single bond | H | c-Pen | Me | Cl | H | O |
| C-13977 | H | single bond | Me | c-Pen | Me | Me | H | O |
| C-13978 | Me | single bond | H | c-Pen | Me | Me | H | O |
| C-13979 | Me(R) | single bond | H | c-Pen | Me | Me | H | O |
| C-13980 | Me(S) | single bond | H | c-Pen | Me | Me | H | O |
| C-13981 | H | single bond | Me | tetrahydrofuran-3-yl | Me | Cl | H | O |
| C-13982 | Me | single bond | H | tetrahydrofuran-3-yl | Me | Cl | H | O |
| C-13983 | Me(R) | single bond | H | tetrahydrofuran-3-yl | Me | Cl | H | O |
| C-13984 | Me(S) | single bond | H | tetrahydrofuran-3-yl | Me | Cl | H | O |
| C-13985 | H | single bond | Me | tetrahydrofuran-3-yl | Me | Me | H | O |
| C-13986 | Me | single bond | H | tetrahydrofuran-3-yl | Me | Me | H | O |
| C-13987 | Me(R) | single bond | H | tetrahydrofuran-3-yl | Me | Me | H | O |
| C-13988 | Me(S) | single bond | H | tetrahydrofuran-3-yl | Me | Me | H | O |
| C-13989 | H | single bond | Me | tetrahydrothiophen-3-yl | Me | Cl | H | O |
| C-13990 | Me | single bond | H | tetrahydrothiophen-3-yl | Me | Cl | H | O |
| C-13991 | Me(R) | single bond | H | tetrahydrothiophen-3-yl | Me | Cl | H | O |
| C-13992 | Me(S) | single bond | H | tetrahydrothiophen-3-yl | Me | Cl | H | O |
| C-13993 | H | single bond | Me | tetrahydrothiophen-3-yl | Me | Me | H | O |
| C-13994 | Me | single bond | H | tetrahydrothiophen-3-yl | Me | Me | H | O |
| C-13995 | Me(R) | single bond | H | tetrahydrothiophen-3-yl | Me | Me | H | O |
| C-13996 | Me(S) | single bond | H | tetrahydrothiophen-3-yl | Me | Me | H | O |
| C-13997 | H | single bond | Me | c-Pen(1-CN) | Me | Cl | H | O |
| C-13998 | Me | single bond | H | c-Pen(1-CN) | Me | Cl | H | O |
| C-13999 | Me(R) | single bond | H | c-Pen(1-CN) | Me | Cl | H | O |
| C-14000 | Me(S) | single bond | H | c-Pen(1-CN) | Me | Cl | H | O |
| C-14001 | H | single bond | Me | c-Pen(1-CN) | Me | Me | H | O |
| C-14002 | Me | single bond | H | c-Pen(1-CN) | Me | Me | H | O |
| C-14003 | Me(R) | single bond | H | c-Pen(1-CN) | Me | Me | H | O |
| C-14004 | Me(S) | single bond | H | c-Pen(1-CN) | Me | Me | H | O |
| C-14005 | H | single bond | Me | tetrahydrofuran(3-CN)-3-yl | Me | Cl | H | O |
| C-14006 | Me | single bond | H | tetrahydrofuran(3-CN)-3-yl | Me | Cl | H | O |
| C-14007 | Me(R) | single bond | H | tetrahydrofuran(3-CN)-3-yl | Me | Cl | H | O |
| C-14008 | Me(S) | single bond | H | tetrahydrofuran(3-CN)-3-yl | Me | Cl | H | O |
| C-14009 | H | single bond | Me | tetrahydrofuran(3-CN)-3-yl | Me | Me | H | O |
| C-14010 | Me | single bond | H | tetrahydrofuran(3-CN)-3-yl | Me | Me | H | O |

TABLE 547

| Compound Number | Y | W | Z | $R^1$ | $R^2$ | $R^3$ | $R^{10}$ | A |
|---|---|---|---|---|---|---|---|---|
| C-14011 | Me(R) | single bond | H | tetrahydrofuran(3-CN)-3-yl | Me | Me | H | O |
| C-14012 | Me(S) | single bond | H | tetrahydrofuran(3-CN)-3-yl | Me | Me | H | O |
| C-14013 | H | single bond | Me | tetrahydrothiophen(3-CN)-3-yl | Me | Cl | H | O |
| C-14014 | Me | single bond | H | tetrahydrothiophen(3-CN)-3-yl | Me | Cl | H | O |
| C-14015 | Me(R) | single bond | H | tetrahydrothiophen(3-CN)-3-yl | Me | Cl | H | O |
| C-14016 | Me(S) | single bond | H | tetrahydrothiophen(3-CN)-3-yl | Me | Cl | H | O |
| C-14017 | H | single bond | Me | tetrahydrothiophen(3-CN)-3-yl | Me | Me | H | O |
| C-14018 | Me | single bond | H | tetrahydrothiophen(3-CN)-3-yl | Me | Me | H | O |
| C-14019 | Me(R) | single bond | H | tetrahydrothiophen(3-CN)-3-yl | Me | Me | H | O |
| C-14020 | Me(S) | single bond | H | tetrahydrothiophen(3-CN)-3-yl | Me | Me | H | O |
| C-14021 | H | single bond | Me | bicyclo[1.1.1]pentan-1-yl | Me | Cl | H | O |
| C-14022 | Me | single bond | H | bicyclo[1.1.1]pentan-1-yl | Me | Cl | H | O |

TABLE 547-continued

| Compound Number | Y | W | Z | $R^1$ | $R^2$ | $R^3$ | $R^{10}$ | A |
|---|---|---|---|---|---|---|---|---|
| C-14023 | Me(R) | single bond | H | bicyclo[1.1.1]pentan-1-yl | Me | Cl | H | O |
| C-14024 | Me(S) | single bond | H | bicyclo[1.1.1]pentan-1-yl | Me | Cl | H | O |
| C-14025 | H | single bond | Me | bicyclo[1.1.1]pentan-1-yl | Me | Me | H | O |
| C-14026 | Me | single bond | H | bicyclo[1.1.1]pentan-1-yl | Me | Me | H | O |
| C-14027 | Me(R) | single bond | H | bicyclo[1.1.1]pentan-1-yl | Me | Me | H | O |
| C-14028 | Me(S) | single bond | H | bicyclo[1.1.1]pentan-1-yl | Me | Me | H | O |
| C-14029 | H | single bond | Me | c-Hex | Me | Cl | H | O |
| C-14030 | Me | single bond | H | c-Hex | Me | Cl | H | O |
| C-14031 | Me(R) | single bond | H | c-Hex | Me | Cl | H | O |
| C-14032 | Me(S) | single bond | H | c-Hex | Me | Cl | H | O |
| C-14033 | H | single bond | Me | c-Hex | Me | Me | H | O |
| C-14034 | Me | single bond | H | c-Hex | Me | Me | H | O |
| C-14035 | Me(R) | single bond | H | c-Hex | Me | Me | H | O |
| C-14036 | Me(S) | single bond | H | c-Hex | Me | Me | H | O |
| C-14037 | H | single bond | Me | tetrahydropyran-4-yl | Me | Cl | H | O |
| C-14038 | Me | single bond | H | tetrahydropyran-4-yl | Me | Cl | H | O |
| C-14039 | Me(R) | single bond | H | tetrahydropyran-4-yl | Me | Cl | H | O |
| C-14040 | Me(S) | single bond | H | tetrahydropyran-4-yl | Me | Cl | H | O |
| C-14041 | H | single bond | Me | tetrahydropyran-4-yl | Me | Me | H | O |
| C-14042 | Me | single bond | H | tetrahydropyran-4-yl | Me | Me | H | O |
| C-14043 | Me(R) | single bond | H | tetrahydropyran-4-yl | Me | Me | H | O |
| C-14044 | Me(S) | single bond | H | tetrahydropyran-4-yl | Me | Me | H | O |
| C-14045 | H | single bond | Me | tetrahydrothiopyran-4-yl | Me | Cl | H | O |
| C-14046 | Me | single bond | H | tetrahydrothiopyran-4-yl | Me | Cl | H | O |
| C-14047 | Me(R) | single bond | H | tetrahydrothiopyran-4-yl | Me | Cl | H | O |
| C-14048 | Me(S) | single bond | H | tetrahydrothiopyran-4-yl | Me | Cl | H | O |
| C-14049 | H | single bond | Me | tetrahydrothiopyran-4-yl | Me | Me | H | O |
| C-14050 | Me | single bond | H | tetrahydrothiopyran-4-yl | Me | Me | H | O |
| C-14051 | Me(R) | single bond | H | tetrahydrothiopyran-4-yl | Me | Me | H | O |
| C-14052 | Me(S) | single bond | H | tetrahydrothiopyran-4-yl | Me | Me | H | O |
| C-14053 | H | single bond | Me | c-Hex(1-CN) | Me | Cl | H | O |
| C-14054 | Me | single bond | H | c-Hex(1-CN) | Me | Cl | H | O |

TABLE 548

| Compound Number | Y | W | Z | $R^1$ | $R^2$ | $R^3$ | $R^{10}$ | A |
|---|---|---|---|---|---|---|---|---|
| C-14055 | Me(R) | single bond | H | c-Hex(1-CN) | Me | Cl | H | O |
| C-14056 | Me(S) | single bond | H | c-Hex(1-CN) | Me | Cl | H | O |
| C-14057 | H | single bond | Me | c-Hex(1-CN) | Me | Me | H | O |
| C-14058 | Me | single bond | H | c-Hex(1-CN) | Me | Me | H | O |
| C-14059 | Me(R) | single bond | H | c-Hex(1-CN) | Me | Me | H | O |
| C-14060 | Me(S) | single bond | H | c-Hex(1-CN) | Me | Me | H | O |
| C-14061 | H | single bond | Me | tetrahydropyran(4-CN)-4-yl | Me | Cl | H | O |
| C-14062 | Me | single bond | H | tetrahydropyran(4-CN)-4-yl | Me | Cl | H | O |
| C-14063 | Me(R) | single bond | H | tetrahydropyran(4-CN)-4-yl | Me | Cl | H | O |
| C-14064 | Me(S) | single bond | H | tetrahydropyran(4-CN)-4-yl | Me | Cl | H | O |
| C-14065 | H | single bond | Me | tetrahydropyran(4-CN)-4-yl | Me | Me | H | O |
| C-14066 | Me | single bond | H | tetrahydropyran(4-CN)-4-yl | Me | Me | H | O |
| C-14067 | Me(R) | single bond | H | tetrahydropyran(4-CN)-4-yl | Me | Me | H | O |
| C-14068 | Me(S) | single bond | H | tetrahydropyran(4-CN)-4-yl | Me | Me | H | O |
| C-14069 | H | single bond | Me | tetrahydrothiopyran(4-CN)-4-yl | Me | Cl | H | O |
| C-14070 | Me | single bond | H | tetrahydrothiopyran(4-CN)-4-yl | Me | Cl | H | O |
| C-14071 | Me(R) | single bond | H | tetrahydrothiopyran(4-CN)-4-yl | Me | Cl | H | O |
| C-14072 | Me(S) | single bond | H | tetrahydrothiopyran(4-CN)-4-yl | Me | Cl | H | O |
| C-14073 | H | single bond | Me | tetrahydrothiopyran(4-CN)-4-yl | Me | Me | H | O |
| C-14074 | Me | single bond | H | tetrahydrothiopyran(4-CN)-4-yl | Me | Me | H | O |
| C-14075 | Me(R) | single bond | H | tetrahydrothiopyran(4-CN)-4-yl | Me | Me | H | O |
| C-14076 | Me(S) | single bond | H | tetrahydrothiopyran(4-CN)-4-yl | Me | Me | H | O |
| C-14077 | H | single bond | Me | $CH_2$(c-Pr) | Me | Cl | H | O |
| C-14078 | Me | single bond | H | $CH_2$(c-Pr) | Me | Cl | H | O |
| C-14079 | Me(R) | single bond | H | $CH_2$(c-Pr) | Me | Cl | H | O |
| C-14080 | Me(S) | single bond | H | $CH_2$(c-Pr) | Me | Cl | H | O |
| C-14081 | H | single bond | Me | $CH_2$(c-Pr) | Me | Me | H | O |
| C-14082 | Me | single bond | H | $CH_2$(c-Pr) | Me | Me | H | O |
| C-14083 | Me(R) | single bond | H | $CH_2$(c-Pr) | Me | Me | H | O |
| C-14084 | Me(S) | single bond | H | $CH_2$(c-Pr) | Me | Me | H | O |
| C-14085 | H | single bond | Me | $CH_2$[c-Pr(1-CN)] | Me | Cl | H | O |
| C-14086 | Me | single bond | H | $CH_2$[c-Pr(1-CN)] | Me | Cl | H | O |
| C-14087 | Me(R) | single bond | H | $CH_2$[c-Pr(1-CN)] | Me | Cl | H | O |
| C-14088 | Me(S) | single bond | H | $CH_2$[c-Pr(1-CN)] | Me | Cl | H | O |
| C-14089 | H | single bond | Me | $CH_2$[c-Pr(1-CN)] | Me | Me | H | O |

TABLE 548-continued

| Compound Number | Y | W | Z | $R^1$ | $R^2$ | $R^3$ | $R^{10}$ | A |
|---|---|---|---|---|---|---|---|---|
| C-14090 | Me | single bond | H | $CH_2$[c-Pr(1-CN)] | Me | Me | H | O |
| C-14091 | Me(R) | single bond | H | $CH_2$[c-Pr(1-CN)] | Me | Me | H | O |
| C-14092 | Me(S) | single bond | H | $CH_2$[c-Pr(1-CN)] | Me | Me | H | O |
| C-14093 | H | single bond | Me | CH(Me)(c-Pr) | Me | Cl | H | O |
| C-14094 | Me | single bond | H | CH(Me)(c-Pr) | Me | Cl | H | O |
| C-14095 | Me(R) | single bond | H | CH(Me)(c-Pr) | Me | Cl | H | O |
| C-14096 | Me(S) | single bond | H | CH(Me)(c-Pr) | Me | Cl | H | O |
| C-14097 | H | single bond | Me | CH(Me)(c-Pr) | Me | Me | H | O |
| C-14098 | Me | single bond | H | CH(Me)(c-Pr) | Me | Me | H | O |

TABLE 549

| Compound Number | Y | W | Z | $R^1$ | $R^2$ | $R^3$ | $R^{10}$ | A |
|---|---|---|---|---|---|---|---|---|
| C-14099 | Me(R) | single bond | H | CH(Me)(c-Pr) | Me | Me | H | O |
| C-14100 | Me(S) | single bond | H | CH(Me)(c-Pr) | Me | Me | H | O |
| C-14101 | H | single bond | Me | $CH(Me)CH_2OMe$ | Me | Cl | H | O |
| C-14102 | Me | single bond | H | $CH(Me)CH_2OMe$ | Me | Cl | H | O |
| C-14103 | Me(R) | single bond | H | $CH(Me)CH_2OMe$ | Me | Cl | H | O |
| C-14104 | Me(S) | single bond | H | $CH(Me)CH_2OMe$ | Me | Cl | H | O |
| C-14105 | H | single bond | Me | $CH(Me)CH_2OMe$ | Me | Me | H | O |
| C-14106 | Me | single bond | H | $CH(Me)CH_2OMe$ | Me | Me | H | O |
| C-14107 | Me(R) | single bond | H | $CH(Me)CH_2OMe$ | Me | Me | H | O |
| C-14108 | Me(S) | single bond | H | $CH(Me)CH_2OMe$ | Me | Me | H | O |
| C-14109 | H | single bond | Me | $CH_2CH{=}CH_2$ | Me | Cl | H | O |
| C-14110 | Me | single bond | H | $CH_2CH{=}CH_2$ | Me | Cl | H | O |
| C-14111 | Me(R) | single bond | H | $CH_2CH{=}CH_2$ | Me | Cl | H | O |
| C-14112 | Me(S) | single bond | H | $CH_2CH{=}CH_2$ | Me | Cl | H | O |
| C-14113 | H | single bond | Me | $CH_2CH{=}CH_2$ | Me | Me | H | O |
| C-14114 | Me | single bond | H | $CH_2CH{=}CH_2$ | Me | Me | H | O |
| C-14115 | Me(R) | single bond | H | $CH_2CH{=}CH_2$ | Me | Me | H | O |
| C-14116 | Me(S) | single bond | H | $CH_2CH{=}CH_2$ | Me | Me | H | O |
| C-14117 | H | single bond | Me | $CH_2C{\equiv}CH$ | Me | Cl | H | O |
| C-14118 | Me | single bond | H | $CH_2C{\equiv}CH$ | Me | Cl | H | O |
| C-14119 | Me(R) | single bond | H | $CH_2C{\equiv}CH$ | Me | Cl | H | O |
| C-14120 | Me(S) | single bond | H | $CH_2C{\equiv}CH$ | Me | Cl | H | O |
| C-14121 | H | single bond | Me | $CH_2C{\equiv}CH$ | Me | Me | H | O |
| C-14122 | Me | single bond | H | $CH_2C{\equiv}CH$ | Me | Me | H | O |
| C-14123 | Me(R) | single bond | H | $CH_2C{\equiv}CH$ | Me | Me | H | O |
| C-14124 | Me(S) | single bond | H | $CH_2C{\equiv}CH$ | Me | Me | H | O |
| C-14125 | H | single bond | Me | $CH_2CN$ | Me | Cl | H | O |
| C-14126 | Me | single bond | H | $CH_2CN$ | Me | Cl | H | O |
| C-14127 | Me(R) | single bond | H | $CH_2CN$ | Me | Cl | H | O |
| C-14128 | Me(S) | single bond | H | $CH_2CN$ | Me | Cl | H | O |
| C-14129 | H | single bond | Me | $CH_2CN$ | Me | Me | H | O |
| C-14130 | Me | single bond | H | $CH_2CN$ | Me | Me | H | O |
| C-14131 | Me(R) | single bond | H | $CH_2CN$ | Me | Me | H | O |
| C-14132 | Me(S) | single bond | H | $CH_2CN$ | Me | Me | H | O |
| C-14133 | H | single bond | Me | CH(Me)CN | Me | Cl | H | O |
| C-14134 | Me | single bond | H | CH(Me)CN | Me | Cl | H | O |
| C-14135 | Me(R) | single bond | H | CH(Me)CN | Me | Cl | H | O |
| C-14136 | Me(S) | single bond | H | CH(Me)CN | Me | Cl | H | O |
| C-14137 | H | single bond | Me | CH(Me)CN | Me | Me | H | O |
| C-14138 | Me | single bond | H | CH(Me)CN | Me | Me | H | O |
| C-14139 | Me(R) | single bond | H | CH(Me)CN | Me | Me | H | O |
| C-14140 | Me(S) | single bond | H | CH(Me)CN | Me | Me | H | O |
| C-14141 | H | single bond | Me | $C(Me)_2CN$ | Me | Cl | H | O |
| C-14142 | Me | single bond | H | $C(Me)_2CN$ | Me | Cl | H | O |

TABLE 550

| Compound Number | Y | W | Z | $R^1$ | $R^2$ | $R^3$ | $R^{10}$ | A |
|---|---|---|---|---|---|---|---|---|
| C-14143 | Me(R) | single bond | H | $C(Me)_2CN$ | Me | Cl | H | O |
| C-14144 | Me(S) | single bond | H | $C(Me)_2CN$ | Me | Cl | H | O |
| C-14145 | H | single bond | Me | $C(Me)_2CN$ | Me | Me | H | O |
| C-14146 | Me | single bond | H | $C(Me)_2CN$ | Me | Me | H | O |
| C-14147 | Me(R) | single bond | H | $C(Me)_2CN$ | Me | Me | H | O |

TABLE 550-continued

| Compound Number | Y | W | Z | $R^1$ | $R^2$ | $R^3$ | $R^{10}$ | A |
|---|---|---|---|---|---|---|---|---|
| C-14148 | Me(S) | single bond | H | $C(Me)_2CN$ | Me | Me | H | O |
| C-14149 | H | single bond | Me | C(Me)(i-Pr)CN | Me | Cl | H | O |
| C-14150 | Me | single bond | H | C(Me)(i-Pr)CN | Me | Cl | H | O |
| C-14151 | Me(R) | single bond | H | C(Me)(i-Pr)CN | Me | Cl | H | O |
| C-14152 | Me(S) | single bond | H | C(Me)(i-Pr)CN | Me | Cl | H | O |

TABLE 550-continued

| Compound Number | Y | W | Z | $R^1$ | $R^2$ | $R^3$ | $R^{10}$ | A |
|---|---|---|---|---|---|---|---|---|
| C-14153 | H | single bond | Me | C(Me)(i-Pr)CN | Me | Me | H | O |
| C-14154 | Me | single bond | H | C(Me)(i-Pr)CN | Me | Me | H | O |
| C-14155 | Me(R) | single bond | H | C(Me)(i-Pr)CN | Me | Me | H | O |
| C-14156 | Me(S) | single bond | H | C(Me)(i-Pr)CN | Me | Me | H | O |
| C-14157 | H | single bond | Me | OMe | Me | Cl | H | O |
| C-14158 | Me | single bond | H | OMe | Me | Cl | H | O |
| C-14159 | Me(R) | single bond | H | OMe | Me | Cl | H | O |
| C-14160 | Me(S) | single bond | H | OMe | Me | Cl | H | O |
| C-14161 | H | single bond | Me | OMe | Me | Me | H | O |
| C-14162 | Me | single bond | H | OMe | Me | Me | H | O |
| C-14163 | Me(R) | single bond | H | OMe | Me | Me | H | O |
| C-14164 | Me(S) | single bond | H | OMe | Me | Me | H | O |
| C-14165 | H | single bond | Me | CH═NOMe | Me | Cl | H | O |
| C-14166 | Me | single bond | H | CH═NOMe | Me | Cl | H | O |
| C-14167 | Me(R) | single bond | H | CH═NOMe | Me | Cl | H | O |
| C-14168 | Me(S) | single bond | H | CH═NOMe | Me | Cl | H | O |
| C-14169 | H | single bond | Me | CH═NOMe | Me | Me | H | O |
| C-14170 | Me | single bond | H | CH═NOMe | Me | Me | H | O |
| C-14171 | Me(R) | single bond | H | CH═NOMe | Me | Me | H | O |
| C-14172 | Me(S) | single bond | H | CH═NOMe | Me | Me | H | O |
| C-14173 | H | single bond | Me | morpholin-4-yl | Me | Cl | H | O |
| C-14174 | Me | single bond | H | morpholin-4-yl | Me | Cl | H | O |
| C-14175 | Me(R) | single bond | H | morpholin-4-yl | Me | Cl | H | O |
| C-14176 | Me(S) | single bond | H | morpholin-4-yl | Me | Cl | H | O |
| C-14177 | H | single bond | Me | morpholin-4-yl | Me | Me | H | O |
| C-14178 | Me | single bond | H | morpholin-4-yl | Me | Me | H | O |
| C-14179 | Me(R) | single bond | H | morpholin-4-yl | Me | Me | H | O |
| C-14180 | Me(S) | single bond | H | morpholin-4-yl | Me | Me | H | O |
| C-14181 | H | single bond | Me | Ph | Me | Cl | H | O |
| C-14182 | Me | single bond | H | Ph | Me | Cl | H | O |
| C-14183 | Me(R) | single bond | H | Ph | Me | Cl | H | O |
| C-14184 | Me(S) | single bond | H | Ph | Me | Cl | H | O |
| C-14185 | H | single bond | Me | Ph | Me | Me | H | O |
| C-14186 | Me | single bond | H | Ph | Me | Me | H | O |

TABLE 551

| Compound Number | Y | W | Z | $R^1$ | $R^2$ | $R^3$ | $R^{10}$ | A |
|---|---|---|---|---|---|---|---|---|
| C-14187 | Me(R) | single bond | H | Ph | Me | Me | H | O |
| C-14188 | Me(S) | single bond | H | Ph | Me | Me | H | O |
| C-14189 | H | single bond | Me | $CH_2Ph$ | Me | Cl | H | O |
| C-14190 | Me | single bond | H | $CH_2Ph$ | Me | Cl | H | O |
| C-14191 | Me(R) | single bond | H | $CH_2Ph$ | Me | Cl | H | O |
| C-14192 | Me(S) | single bond | H | $CH_2Ph$ | Me | Cl | H | O |
| C-14193 | H | single bond | Me | $CH_2Ph$ | Me | Me | H | O |
| C-14194 | Me | single bond | H | $CH_2Ph$ | Me | Me | H | O |
| C-14195 | Me(R) | single bond | H | $CH_2Ph$ | Me | Me | H | O |
| C-14196 | Me(S) | single bond | H | $CH_2Ph$ | Me | Me | H | O |
| C-14197 | H | single bond | Me | thiazole-2-yl | Me | Cl | H | O |
| C-14198 | Me | single bond | H | thiazole-2-yl | Me | Cl | H | O |
| C-14199 | Me(R) | single bond | H | thiazole-2-yl | Me | Cl | H | O |
| C-14200 | Me(S) | single bond | H | thiazole-2-yl | Me | Cl | H | O |
| C-14201 | H | single bond | Me | thiazole-2-yl | Me | Me | H | O |
| C-14202 | Me | single bond | H | thiazole-2-yl | Me | Me | H | O |
| C-14203 | Me(R) | single bond | H | thiazole-2-yl | Me | Me | H | O |
| C-14204 | Me(S) | single bond | H | thiazole-2-yl | Me | Me | H | O |
| C-14205 | H | single bond | Me | 1-Me-pyrazol-3-yl | Me | Cl | H | O |
| C-14206 | Me | single bond | H | 1-Me-pyrazol-3-yl | Me | Cl | H | O |
| C-14207 | Me(R) | single bond | H | 1-Me-pyrazol-3-yl | Me | Cl | H | O |
| C-14208 | Me(S) | single bond | H | 1-Me-pyrazol-3-yl | Me | Cl | H | O |
| C-14209 | H | single bond | Me | 1-Me-pyrazol-3-yl | Me | Me | H | O |
| C-14210 | Me | single bond | H | 1-Me-pyrazol-3-yl | Me | Me | H | O |
| C-14211 | Me(R) | single bond | H | 1-Me-pyrazol-3-yl | Me | Me | H | O |
| C-14212 | Me(S) | single bond | H | 1-Me-pyrazol-3-yl | Me | Me | H | O |
| C-14213 | H | single bond | Me | 1-Me-pyrazol-5-yl | Me | Cl | H | O |
| C-14214 | Me | single bond | H | 1-Me-pyrazol-5-yl | Me | Cl | H | O |
| C-14215 | Me(R) | single bond | H | 1-Me-pyrazol-5-yl | Me | Cl | H | O |
| C-14216 | Me(S) | single bond | H | 1-Me-pyrazol-5-yl | Me | Cl | H | O |
| C-14217 | H | single bond | Me | 1-Me-pyrazol-5-yl | Me | Me | H | O |
| C-14218 | Me | single bond | H | 1-Me-pyrazol-5-yl | Me | Me | H | O |
| C-14219 | Me(R) | single bond | H | 1-Me-pyrazol-5-yl | Me | Me | H | O |
| C-14220 | Me(S) | single bond | H | 1-Me-pyrazol-5-yl | Me | Me | H | O |
| C-14221 | H | single bond | Me | $CH_2$(pyrimidin-2-yl) | Me | Cl | H | O |
| C-14222 | Me | single bond | H | $CH_2$(pyrimidin-2-yl) | Me | Cl | H | O |
| C-14223 | Me(R) | single bond | H | $CH_2$(pyrimidin-2-yl) | Me | Cl | H | O |
| C-14224 | Me(S) | single bond | H | $CH_2$(pyrimidin-2-yl) | Me | Cl | H | O |
| C-14225 | H | single bond | Me | $CH_2$(pyrimidin-2-yl) | Me | Me | H | O |
| C-14226 | Me | single bond | H | $CH_2$(pyrimidin-2-yl) | Me | Me | H | O |
| C-14227 | Me(R) | single bond | H | $CH_2$(pyrimidin-2-yl) | Me | Me | H | O |
| C-14228 | Me(S) | single bond | H | $CH_2$(pyrimidin-2-yl) | Me | Me | H | O |
| C-14229 | H | single bond | Me | Me | Me | Cl | Me | O |
| C-14230 | Me | single bond | H | Me | Me | Cl | Me | O |

TABLE 552

| Compound Number | Y | W | Z | $R^1$ | $R^2$ | $R^3$ | $R^{10}$ | A |
|---|---|---|---|---|---|---|---|---|
| C-14231 | Me(R) | single bond | H | Me | Me | Cl | Me | O |
| C-14232 | Me(S) | single bond | H | Me | Me | Cl | Me | O |
| C-14233 | H | single bond | Me | Me | Me | Me | Me | O |
| C-14234 | Me | single bond | H | Me | Me | Me | Me | O |
| C-14235 | Me(R) | single bond | H | Me | Me | Me | Me | O |
| C-14236 | Me(S) | single bond | H | Me | Me | Me | Me | O |
| C-14237 | H | single bond | Me | $CH_2CHF_2$ | Me | Cl | Me | O |
| C-14238 | Me | single bond | H | $CH_2CHF_2$ | Me | Cl | Me | O |
| C-14239 | Me(R) | single bond | H | $CH_2CHF_2$ | Me | Cl | Me | O |
| C-14240 | Me(S) | single bond | H | $CH_2CHF_2$ | Me | Cl | Me | O |
| C-14241 | H | single bond | Me | $CH_2CHF_2$ | Me | Me | Me | O |
| C-14242 | Me | single bond | H | $CH_2CHF_2$ | Me | Me | Me | O |
| C-14243 | Me(R) | single bond | H | $CH_2CHF_2$ | Me | Me | Me | O |
| C-14244 | Me(S) | single bond | H | $CH_2CHF_2$ | Me | Me | Me | O |
| C-14245 | H | single bond | Me | n-Pr | Me | Cl | Me | O |
| C-14246 | Me | single bond | H | n-Pr | Me | Cl | Me | O |
| C-14247 | Me(R) | single bond | H | n-Pr | Me | Cl | Me | O |
| C-14248 | Me(S) | single bond | H | n-Pr | Me | Cl | Me | O |
| C-14249 | H | single bond | Me | n-Pr | Me | Me | Me | O |
| C-14250 | Me | single bond | H | n-Pr | Me | Me | Me | O |
| C-14251 | Me(R) | single bond | H | n-Pr | Me | Me | Me | O |
| C-14252 | Me(S) | single bond | H | n-Pr | Me | Me | Me | O |
| C-14253 | H | single bond | Me | i-Pr | Me | Cl | Me | O |

TABLE 552-continued

| Compound Number | Y | W | Z | $R^1$ | $R^2$ | $R^3$ | $R^{10}$ | A |
|---|---|---|---|---|---|---|---|---|
| C-14254 | Me | single bond | H | i-Pr | Me | Cl | Me | O |
| C-14255 | Me(R) | single bond | H | i-Pr | Me | Cl | Me | O |
| C-14256 | Me(S) | single bond | H | i-Pr | Me | Cl | Me | O |
| C-14257 | H | single bond | Me | i-Pr | Me | Me | Me | O |
| C-14258 | Me | single bond | H | i-Pr | Me | Me | Me | O |
| C-14259 | Me(R) | single bond | H | i-Pr | Me | Me | Me | O |
| C-14260 | Me(S) | single bond | H | i-Pr | Me | Me | Me | O |
| C-14261 | H | single bond | Me | c-Pr(1-F) | Me | Cl | Me | O |
| C-14262 | Me | single bond | H | c-Pr(1-F) | Me | Cl | Me | O |
| C-14263 | Me(R) | single bond | H | c-Pr(1-F) | Me | Cl | Me | O |
| C-14264 | Me(S) | single bond | H | c-Pr(1-F) | Me | Cl | Me | O |
| C-14265 | H | single bond | Me | c-Pr(1-F) | Me | Me | Me | O |
| C-14266 | Me | single bond | H | c-Pr(1-F) | Me | Me | Me | O |
| C-14267 | Me(R) | single bond | H | c-Pr(1-F) | Me | Me | Me | O |
| C-14268 | Me(S) | single bond | H | c-Pr(1-F) | Me | Me | Me | O |
| C-14269 | H | single bond | Me | c-Pr(2,2-$F_2$) | Me | Cl | Me | O |
| C-14270 | Me | single bond | H | c-Pr(2,2-$F_2$) | Me | Cl | Me | O |
| C-14271 | Me(R) | single bond | H | c-Pr(2,2-$F_2$) | Me | Cl | Me | O |
| C-14272 | Me(S) | single bond | H | c-Pr(2,2-$F_2$) | Me | Cl | Me | O |
| C-14273 | H | single bond | Me | c-Pr(2,2-$F_2$) | Me | Me | Me | O |
| C-14274 | Me | single bond | H | c-Pr(2,2-$F_2$) | Me | Me | Me | O |

TABLE 553

| Compound Number | Y | W | Z | $R^1$ | $R^2$ | $R^3$ | $R^{10}$ | A |
|---|---|---|---|---|---|---|---|---|
| C-14275 | Me(R) | single bond | H | c-Pr(2,2-$F_2$) | Me | Me | Me | O |
| C-14276 | Me(S) | single bond | H | c-Pr(2,2-$F_2$) | Me | Me | Me | O |
| C-14277 | H | single bond | Me | c-Pr(1-Cl) | Me | Cl | Me | O |
| C-14278 | Me | single bond | H | c-Pr(1-Cl) | Me | Cl | Me | O |
| C-14279 | Me(R) | single bond | H | c-Pr(1-Cl) | Me | Cl | Me | O |
| C-14280 | Me(S) | single bond | H | c-Pr(1-Cl) | Me | Cl | Me | O |
| C-14281 | H | single bond | Me | c-Pr(1-Cl) | Me | Me | Me | O |
| C-14282 | Me | single bond | H | c-Pr(1-Cl) | Me | Me | Me | O |
| C-14283 | Me(R) | single bond | H | c-Pr(1-Cl) | Me | Me | Me | O |
| C-14284 | Me(S) | single bond | H | c-Pr(1-Cl) | Me | Me | Me | O |
| C-14285 | H | single bond | Me | c-Pr(1-Br) | Me | Cl | Me | O |
| C-14286 | Me | single bond | H | c-Pr(1-Br) | Me | Cl | Me | O |
| C-14287 | Me(R) | single bond | H | c-Pr(1-Br) | Me | Cl | Me | O |
| C-14288 | Me(S) | single bond | H | c-Pr(1-Br) | Me | Cl | Me | O |
| C-14289 | H | single bond | Me | c-Pr(1-Br) | Me | Me | Me | O |
| C-14290 | Me | single bond | H | c-Pr(1-Br) | Me | Me | Me | O |
| C-14291 | Me(R) | single bond | H | c-Pr(1-Br) | Me | Me | Me | O |
| C-14292 | Me(S) | single bond | H | c-Pr(1-Br) | Me | Me | Me | O |
| C-14293 | H | single bond | Me | c-Pr(1-Me) | Me | Cl | Me | O |
| C-14294 | Me | single bond | H | c-Pr(1-Me) | Me | Cl | Me | O |
| C-14295 | Me(R) | single bond | H | c-Pr(1-Me) | Me | Cl | Me | O |
| C-14296 | Me(S) | single bond | H | c-Pr(1-Me) | Me | Cl | Me | O |
| C-14297 | H | single bond | Me | c-Pr(1-Me) | Me | Me | Me | O |
| C-14298 | Me | single bond | H | c-Pr(1-Me) | Me | Me | Me | O |
| C-14299 | Me(R) | single bond | H | c-Pr(1-Me) | Me | Me | Me | O |
| C-14300 | Me(S) | single bond | H | c-Pr(1-Me) | Me | Me | Me | O |
| C-14301 | H | single bond | Me | c-Pr(1-$CH_2OH$) | Me | Cl | Me | O |
| C-14302 | Me | single bond | H | c-Pr(1-$CH_2OH$) | Me | Cl | Me | O |
| C-14303 | Me(R) | single bond | H | c-Pr(1-$CH_2OH$) | Me | Cl | Me | O |
| C-14304 | Me(S) | single bond | H | c-Pr(1-$CH_2OH$) | Me | Cl | Me | O |
| C-14305 | H | single bond | Me | c-Pr(1-$CH_2OH$) | Me | Me | Me | O |
| C-14306 | Me | single bond | H | c-Pr(1-$CH_2OH$) | Me | Me | Me | O |
| C-14307 | Me(R) | single bond | H | c-Pr(1-$CH_2OH$) | Me | Me | Me | O |
| C-14308 | Me(S) | single bond | H | c-Pr(1-$CH_2OH$) | Me | Me | Me | O |
| C-14309 | H | single bond | Me | c-Pr[1-$CH_2OS(=O)_2Me$] | Me | Cl | Me | O |
| C-14310 | Me | single bond | H | c-Pr[1-$CH_2OS(=O)_2Me$] | Me | Cl | Me | O |
| C-14311 | Me(R) | single bond | H | c-Pr[1-$CH_2OS(=O)_2Me$] | Me | Cl | Me | O |
| C-14312 | Me(S) | single bond | H | c-Pr[1-$CH_2OS(=O)_2Me$] | Me | Cl | Me | O |
| C-14313 | H | single bond | Me | c-Pr[1-$CH_2OS(=O)_2Me$] | Me | Me | Me | O |
| C-14314 | Me | single bond | H | c-Pr[1-$CH_2OS(=O)_2Me$] | Me | Me | Me | O |
| C-14315 | Me(R) | single bond | H | c-Pr[1-$CH_2OS(=O)_2Me$] | Me | Me | Me | O |
| C-14316 | Me(S) | single bond | H | c-Pr[1-$CH_2OS(=O)_2Me$] | Me | Me | Me | O |
| C-14317 | H | single bond | Me | c-Pr(1-$CH_2OMe$) | Me | Cl | Me | O |
| C-14318 | Me | single bond | H | c-Pr(1-$CH_2OMe$) | Me | Cl | Me | O |

TABLE 554

| Compound Number | Y | W | Z | $R^1$ | $R^2$ | $R^3$ | $R^{10}$ | A |
|---|---|---|---|---|---|---|---|---|
| C-14319 | Me(R) | single bond | H | c-Pr(1-$CH_2$OMe) | Me | Cl | Me | O |
| C-14320 | Me(S) | single bond | H | c-Pr(1-$CH_2$OMe) | Me | Cl | Me | O |
| C-14321 | H | single bond | Me | c-Pr(1-$CH_2$OMe) | Me | Me | Me | O |
| C-14322 | Me | single bond | H | c-Pr(1-$CH_2$OMe) | Me | Me | Me | O |
| C-14323 | Me(R) | single bond | H | c-Pr(1-$CH_2$OMe) | Me | Me | Me | O |
| C-14324 | Me(S) | single bond | H | c-Pr(1-$CH_2$OMe) | Me | Me | Me | O |
| C-14325 | H | single bond | Me | c-Pr(1-$CH_2$CN) | Me | Cl | Me | O |
| C-14326 | Me | single bond | H | c-Pr(1-$CH_2$CN) | Me | Cl | Me | O |
| C-14327 | Me(R) | single bond | H | c-Pr(1-$CH_2$CN) | Me | Cl | Me | O |
| C-14328 | Me(S) | single bond | H | c-Pr(1-$CH_2$CN) | Me | Cl | Me | O |
| C-14329 | H | single bond | Me | c-Pr(1-$CH_2$CN) | Me | Me | Me | O |
| C-14330 | Me | single bond | H | c-Pr(1-$CH_2$CN) | Me | Me | Me | O |
| C-14331 | Me(R) | single bond | H | c-Pr(1-$CH_2$CN) | Me | Me | Me | O |
| C-14332 | Me(S) | single bond | H | c-Pr(1-$CH_2$CN) | Me | Me | Me | O |
| C-14333 | H | single bond | Me | c-Pr(1-$CH_2$SMe) | Me | Cl | Me | O |
| C-14334 | Me | single bond | H | c-Pr(1-$CH_2$SMe) | Me | Cl | Me | O |
| C-14335 | Me(R) | single bond | H | c-Pr(1-$CH_2$SMe) | Me | Cl | Me | O |
| C-14336 | Me(S) | single bond | H | c-Pr(1-$CH_2$SMe) | Me | Cl | Me | O |
| C-14337 | H | single bond | Me | c-Pr(1-$CH_2$SMe) | Me | Me | Me | O |
| C-14338 | Me | single bond | H | c-Pr(1-$CH_2$SMe) | Me | Me | Me | O |
| C-14339 | Me(R) | single bond | H | c-Pr(1-$CH_2$SMe) | Me | Me | Me | O |
| C-14340 | Me(S) | single bond | H | c-Pr(1-$CH_2$SMe) | Me | Me | Me | O |
| C-14341 | H | single bond | Me | c-Pr[1-$CH_2$S(═O)Me] | Me | Cl | Me | O |
| C-14342 | Me | single bond | H | c-Pr[1-$CH_2$S(═O)Me] | Me | Cl | Me | O |
| C-14343 | Me(R) | single bond | H | c-Pr[1-$CH_2$S(═O)Me] | Me | Cl | Me | O |
| C-14344 | Me(S) | single bond | H | c-Pr[1-$CH_2$S(═O)Me] | Me | Cl | Me | O |
| C-14345 | H | single bond | Me | c-Pr[1-$CH_2$S(═O)Me] | Me | Me | Me | O |
| C-14346 | Me | single bond | H | c-Pr[1-$CH_2$S(═O)Me] | Me | Me | Me | O |
| C-14347 | Me(R) | single bond | H | c-Pr[1-$CH_2$S(═O)Me] | Me | Me | Me | O |
| C-14348 | Me(S) | single bond | H | c-Pr[1-$CH_2$S(═O)Me] | Me | Me | Me | O |
| C-14349 | H | single bond | Me | c-Pr[1-$CH_2$S(═O)$_2$Me] | Me | Cl | Me | O |
| C-14350 | Me | single bond | H | c-Pr[1-$CH_2$S(═O)$_2$Me] | Me | Cl | Me | O |
| C-14351 | Me(R) | single bond | H | c-Pr[1-$CH_2$S(═O)$_2$Me] | Me | Cl | Me | O |
| C-14352 | Me(S) | single bond | H | c-Pr[1-$CH_2$S(═O)$_2$Me] | Me | Cl | Me | O |
| C-14353 | H | single bond | Me | c-Pr[1-$CH_2$S(═O)$_2$Me] | Me | Me | Me | O |
| C-14354 | Me | single bond | H | c-Pr[1-$CH_2$S(═O)$_2$Me] | Me | Me | Me | O |
| C-14355 | Me(R) | single bond | H | c-Pr[1-$CH_2$S(═O)$_2$Me] | Me | Me | Me | O |
| C-14356 | Me(S) | single bond | H | c-Pr[1-$CH_2$S(═O)$_2$Me] | Me | Me | Me | O |
| C-14357 | H | single bond | Me | c-Pr(1-$CH_2$F) | Me | Cl | Me | O |
| C-14358 | Me | single bond | H | c-Pr(1-$CH_2$F) | Me | Cl | Me | O |
| C-14359 | Me(R) | single bond | H | c-Pr(1-$CH_2$F) | Me | Cl | Me | O |
| C-14360 | Me(S) | single bond | H | c-Pr(1-$CH_2$F) | Me | Cl | Me | O |
| C-14361 | H | single bond | Me | c-Pr(1-$CH_2$F) | Me | Me | Me | O |
| C-14362 | Me | single bond | H | c-Pr(1-$CH_2$F) | Me | Me | Me | O |

TABLE 555

| Compound Number | Y | W | Z | $R^1$ | $R^2$ | $R^3$ | $R^{10}$ | A |
|---|---|---|---|---|---|---|---|---|
| C-14363 | Me(R) | single bond | H | c-Pr(1-$CH_2$F) | Me | Me | Me | O |
| C-14364 | Me(S) | single bond | H | c-Pr(1-$CH_2$F) | Me | Me | Me | O |
| C-14365 | H | single bond | Me | c-Pr(1-$CH_2$F) | Me | Cl | Me | O |
| C-14366 | Me | single bond | H | c-Pr(1-$CH_2$F) | Me | Cl | Me | O |
| C-14367 | Me(R) | single bond | H | c-Pr(1-$CH_2$F) | Me | Cl | Me | O |
| C-14368 | Me(S) | single bond | H | c-Pr(1-$CH_2$F) | Me | Cl | Me | O |
| C-14369 | H | single bond | Me | c-Pr(1-$CH_2$F) | Me | Me | Me | O |
| C-14370 | Me | single bond | H | c-Pr(1-$CH_2$F) | Me | Me | Me | O |
| C-14371 | Me(R) | single bond | H | c-Pr(1-$CH_2$F) | Me | Me | Me | O |
| C-14372 | Me(S) | single bond | H | c-Pr(1-$CH_2$F) | Me | Me | Me | O |
| C-14373 | H | single bond | Me | c-Pr(1-$CF_3$) | Me | Cl | Me | O |
| C-14374 | Me | single bond | H | c-Pr(1-$CF_3$) | Me | Cl | Me | O |
| C-14375 | Me(R) | single bond | H | c-Pr(1-$CF_3$) | Me | Cl | Me | O |
| C-14376 | Me(S) | single bond | H | c-Pr(1-$CF_3$) | Me | Cl | Me | O |
| C-14377 | H | single bond | Me | c-Pr(1-$CF_3$) | Me | Me | Me | O |
| C-14378 | Me | single bond | H | c-Pr(1-$CF_3$) | Me | Me | Me | O |
| C-14379 | Me(R) | single bond | H | c-Pr(1-$CF_3$) | Me | Me | Me | O |
| C-14380 | Me(S) | single bond | H | c-Pr(1-$CF_3$) | Me | Me | Me | O |
| C-14381 | H | single bond | Me | c-Pr(1-C≡CH) | Me | Cl | Me | O |
| C-14382 | Me | single bond | H | c-Pr(1-C≡CH) | Me | Cl | Me | O |
| C-14383 | Me(R) | single bond | H | c-Pr(1-C≡CH) | Me | Cl | Me | O |
| C-14384 | Me(S) | single bond | H | c-Pr(1-C≡CH) | Me | Cl | Me | O |
| C-14385 | H | single bond | Me | c-Pr(1-C≡CH) | Me | Me | Me | O |

TABLE 555-continued

| Compound Number | Y | W | Z | $R^1$ | $R^2$ | $R^3$ | $R^{10}$ | A |
|---|---|---|---|---|---|---|---|---|
| C-14386 | Me | single bond | H | c-Pr(1-C≡CH) | Me | Me | Me | O |
| C-14387 | Me(R) | single bond | H | c-Pr(1-C≡CH) | Me | Me | Me | O |
| C-14388 | Me(S) | single bond | H | c-Pr(1-C≡CH) | Me | Me | Me | O |
| C-14389 | H | single bond | Me | c-Pr[1-C(═O)OEt] | Me | Cl | Me | O |
| C-14390 | Me | single bond | H | c-Pr[1-C(═O)OEt] | Me | Cl | Me | O |
| C-14391 | Me(R) | single bond | H | c-Pr[1-C(═O)OEt] | Me | Cl | Me | O |
| C-14392 | Me(S) | single bond | H | c-Pr[1-C(═O)OEt] | Me | Cl | Me | O |
| C-14393 | H | single bond | Me | c-Pr[1-C(═O)OEt] | Me | Me | Me | O |
| C-14394 | Me | single bond | H | c-Pr[1-C(═O)OEt] | Me | Me | Me | O |
| C-14395 | Me(R) | single bond | H | c-Pr[1-C(═O)OEt] | Me | Me | Me | O |
| C-14396 | Me(S) | single bond | H | c-Pr[1-C(═O)OEt] | Me | Me | Me | O |
| C-14397 | H | single bond | Me | c-Pr[1-C(═O)OH] | Me | Cl | Me | O |
| C-14398 | Me | single bond | H | c-Pr[1-C(═O)OH] | Me | Cl | Me | O |
| C-14399 | Me(R) | single bond | H | c-Pr[1-C(═O)OH] | Me | Cl | Me | O |
| C-14400 | Me(S) | single bond | H | c-Pr[1-C(═O)OH] | Me | Cl | Me | O |
| C-14401 | H | single bond | Me | c-Pr[1-C(═O)OH] | Me | Me | Me | O |
| C-14402 | Me | single bond | H | c-Pr[1-C(═O)OH] | Me | Me | Me | O |
| C-14403 | Me(R) | single bond | H | c-Pr[1-C(═O)OH] | Me | Me | Me | O |
| C-14404 | Me(S) | single bond | H | c-Pr[1-C(═O)OH] | Me | Me | Me | O |
| C-14405 | H | single bond | Me | c-Pr[1-C(═O)$NH_2$] | Me | Cl | Me | O |
| C-14406 | Me | single bond | H | c-Pr[1-C(═O)$NH_2$] | Me | Cl | Me | O |

TABLE 556

| Compound Number | Y | W | Z | $R^1$ | $R^2$ | $R^3$ | $R^{10}$ | A |
|---|---|---|---|---|---|---|---|---|
| C-14407 | Me(R) | single bond | H | c-Pr[1-C(═O)$NH_2$] | Me | Cl | Me | O |
| C-14408 | Me(S) | single bond | H | c-Pr[1-C(═O)$NH_2$] | Me | Cl | Me | O |
| C-14409 | H | single bond | Me | c-Pr[1-C(═O)$NH_2$] | Me | Me | Me | O |
| C-14410 | Me | single bond | H | c-Pr[1-C(═O)$NH_2$] | Me | Me | Me | O |
| C-14411 | Me(R) | single bond | H | c-Pr[1-C(═O)$NH_2$] | Me | Me | Me | O |
| C-14412 | Me(S) | single bond | H | c-Pr[1-C(═O)$NH_2$] | Me | Me | Me | O |
| C-14413 | H | single bond | Me | c-Pr(1-OMe) | Me | Cl | Me | O |
| C-14414 | Me | single bond | H | c-Pr(1-OMe) | Me | Cl | Me | O |
| C-14415 | Me(R) | single bond | H | c-Pr(1-OMe) | Me | Cl | Me | O |
| C-14416 | Me(S) | single bond | H | c-Pr(1-OMe) | Me | Cl | Me | O |
| C-14417 | H | single bond | Me | c-Pr(1-OMe) | Me | Me | Me | O |
| C-14418 | Me | single bond | H | c-Pr(1-OMe) | Me | Me | Me | O |
| C-14419 | Me(R) | single bond | H | c-Pr(1-OMe) | Me | Me | Me | O |
| C-14420 | Me(S) | single bond | H | c-Pr(1-OMe) | Me | Me | Me | O |
| C-14421 | H | single bond | Me | c-Pr(1-SMe) | Me | Cl | Me | O |
| C-14422 | Me | single bond | H | c-Pr(1-SMe) | Me | Cl | Me | O |
| C-14423 | Me(R) | single bond | H | c-Pr(1-SMe) | Me | Cl | Me | O |
| C-14424 | Me(S) | single bond | H | c-Pr(1-SMe) | Me | Cl | Me | O |
| C-14425 | H | single bond | Me | c-Pr(1-SMe) | Me | Me | Me | O |
| C-14426 | Me | single bond | H | c-Pr(1-SMe) | Me | Me | Me | O |
| C-14427 | Me(R) | single bond | H | c-Pr(1-SMe) | Me | Me | Me | O |
| C-14428 | Me(S) | single bond | H | c-Pr(1-SMe) | Me | Me | Me | O |
| C-14429 | H | single bond | Me | c-Pr[1-S(═O)Me] | Me | Cl | Me | O |
| C-14430 | Me | single bond | H | c-Pr[1-S(═O)Me] | Me | Cl | Me | O |
| C-14431 | Me(R) | single bond | H | c-Pr[1-S(═O)Me] | Me | Cl | Me | O |
| C-14432 | Me(S) | single bond | H | c-Pr[1-S(═O)Me] | Me | Cl | Me | O |
| C-14433 | H | single bond | Me | c-Pr[1-S(═O)Me] | Me | Me | Me | O |
| C-14434 | Me | single bond | H | c-Pr[1-S(═O)Me] | Me | Me | Me | O |
| C-14435 | Me(R) | single bond | H | c-Pr[1-S(═O)Me] | Me | Me | Me | O |
| C-14436 | Me(S) | single bond | H | c-Pr[1-S(═O)Me] | Me | Me | Me | O |
| C-14437 | H | single bond | Me | c-Pr[1-S(═O)$_2$Me] | Me | Cl | Me | O |
| C-14438 | Me | single bond | H | c-Pr[1-S(═O)$_2$Me] | Me | Cl | Me | O |
| C-14439 | Me(R) | single bond | H | c-Pr[1-S(═O)$_2$Me] | Me | Cl | Me | O |
| C-14440 | Me(S) | single bond | H | c-Pr[1-S(═O)$_2$Me] | Me | Cl | Me | O |
| C-14441 | H | single bond | Me | c-Pr[1-S(═O)$_2$Me] | Me | Me | Me | O |
| C-14442 | Me | single bond | H | c-Pr[1-S(═O)$_2$Me] | Me | Me | Me | O |
| C-14443 | Me(R) | single bond | H | c-Pr[1-S(═O)$_2$Me] | Me | Me | Me | O |
| C-14444 | Me(S) | single bond | H | c-Pr[1-S(═O)$_2$Me] | Me | Me | Me | O |
| C-14445 | H | single bond | Me | c-Pr[1-S(═O)$_2$$CHF_2$] | Me | Cl | Me | O |
| C-14446 | Me | single bond | H | c-Pr[1-S(═O)$_2$$CHF_2$] | Me | Cl | Me | O |
| C-14447 | Me(R) | single bond | H | c-Pr[1-S(═O)$_2$$CHF_2$] | Me | Cl | Me | O |
| C-14448 | Me(S) | single bond | H | c-Pr[1-S(═O)$_2$$CHF_2$] | Me | Cl | Me | O |
| C-14449 | H | single bond | Me | c-Pr[1-S(═O)$_2$$CHF_2$] | Me | Me | Me | O |
| C-14450 | Me | single bond | H | c-Pr[1-S(═O)$_2$$CHF_2$] | Me | Me | Me | O |

TABLE 557

| Compound Number | Y | W | Z | $R^1$ | $R^2$ | $R^3$ | $R^{10}$ | A |
|---|---|---|---|---|---|---|---|---|
| C-14451 | Me(R) | single bond | H | c-Pr[1-S(=O)$_2$CHF$_2$] | Me | Me | Me | O |
| C-14452 | Me(S) | single bond | H | c-Pr[1-S(=O)$_2$CHF$_2$] | Me | Me | Me | O |
| C-14453 | H | single bond | Me | c-Pr[1-S(=O)$_2$CF$_3$] | Me | Cl | Me | O |
| C-14454 | Me | single bond | H | c-Pr[1-S(=O)$_2$CF$_3$] | Me | Cl | Me | O |
| C-14455 | Me(R) | single bond | H | c-Pr[1-S(=O)$_2$CF$_3$] | Me | Cl | Me | O |
| C-14456 | Me(S) | single bond | H | c-Pr[1-S(=O)$_2$CF$_3$] | Me | Cl | Me | O |
| C-14457 | H | single bond | Me | c-Pr[1-S(=O)$_2$CF$_3$] | Me | Me | Me | O |
| C-14458 | Me | single bond | H | c-Pr[1-S(=O)$_2$CF$_3$] | Me | Me | Me | O |
| C-14459 | Me(R) | single bond | H | c-Pr[1-S(=O)$_2$CF$_3$] | Me | Me | Me | O |
| C-14460 | Me(S) | single bond | H | c-Pr[1-S(=O)$_2$CF$_3$] | Me | Me | Me | O |
| C-14461 | H | single bond | Me | c-Pr[1-(5,6-dihydro-1,4,2-dioxazin-3-yl)] | Me | Cl | Me | O |
| C-14462 | Me | single bond | H | c-Pr[1-(5,6-dihydro-1,4,2-dioxazin-3-yl)] | Me | Cl | Me | O |
| C-14463 | Me(R) | single bond | H | c-Pr[1-(5,6-dihydro-1,4,2-dioxazin-3-yl)] | Me | Cl | Me | O |
| C-14464 | Me(S) | single bond | H | c-Pr[1-(5,6-dihydro-1,4,2-dioxazin-3-yl)] | Me | Cl | Me | O |
| C-14465 | H | single bond | Me | c-Pr[1-(5,6-dihydro-1,4,2-dioxazin-3-yl)] | Me | Me | Me | O |
| C-14466 | Me | single bond | H | c-Pr[1-(5,6-dihydro-1,4,2-dioxazin-3-yl)] | Me | Me | Me | O |
| C-14467 | Me(R) | single bond | H | c-Pr[1-(5,6-dihydro-1,4,2-dioxazin-3-yl)] | Me | Me | Me | O |
| C-14468 | Me(S) | single bond | H | c-Pr[1-(5,6-dihydro-1,4,2-dioxazin-3-yl)] | Me | Me | Me | O |
| C-14469 | H | single bond | Me | c-Pr[1-(5-hydroxy-1,3,4-oxadiazol-2-yl)] | Me | Cl | Me | O |
| C-14470 | Me | single bond | H | c-Pr[1-(5-hydroxy-1,3,4-oxadiazol-2-yl)] | Me | Cl | Me | O |
| C-14471 | Me(R) | single bond | H | c-Pr[1-(5-hydroxy-1,3,4-oxadiazol-2-yl)] | Me | Cl | Me | O |
| C-14472 | Me(S) | single bond | H | c-Pr[1-(5-hydroxy-1,3,4-oxadiazol-2-yl)] | Me | Cl | Me | O |
| C-14473 | H | single bond | Me | c-Pr[1-(5-hydroxy-1,3,4-oxadiazol-2-yl)] | Me | Me | Me | O |
| C-14474 | Me | single bond | H | c-Pr[1-(5-hydroxy-1,3,4-oxadiazol-2-yl)] | Me | Me | Me | O |
| C-14475 | Me(R) | single bond | H | c-Pr[1-(5-hydroxy-1,3,4-oxadiazol-2-yl)] | Me | Me | Me | O |
| C-14476 | Me(S) | single bond | H | c-Pr[1-(5-hydroxy-1,3,4-oxadiazol-2-yl)] | Me | Me | Me | O |
| C-14477 | H | single bond | Me | c-Pr[1-(pyrimidin-2-yl)] | Me | Cl | Me | O |
| C-14478 | Me | single bond | H | c-Pr[1-(pyrimidin-2-yl)] | Me | Cl | Me | O |
| C-14479 | Me(R) | single bond | H | c-Pr[1-(pyrimidin-2-yl)] | Me | Cl | Me | O |
| C-14480 | Me(S) | single bond | H | c-Pr[1-(pyrimidin-2-yl)] | Me | Cl | Me | O |
| C-14481 | H | single bond | Me | c-Pr[1-(pyrimidin-2-yl)] | Me | Me | Me | O |
| C-14482 | Me | single bond | H | c-Pr[1-(pyrimidin-2-yl)] | Me | Me | Me | O |
| C-14483 | Me(R) | single bond | H | c-Pr[1-(pyrimidin-2-yl)] | Me | Me | Me | O |
| C-14484 | Me(S) | single bond | H | c-Pr[1-(pyrimidin-2-yl)] | Me | Me | Me | O |
| C-14485 | H | single bond | Me | t-Bu | Me | Cl | Me | O |
| C-14486 | Me | single bond | H | t-Bu | Me | Cl | Me | O |
| C-14487 | Me(R) | single bond | H | t-Bu | Me | Cl | Me | O |
| C-14488 | Me(S) | single bond | H | t-Bu | Me | Cl | Me | O |
| C-14489 | H | single bond | Me | t-Bu | Me | Me | Me | O |
| C-14490 | Me | single bond | H | t-Bu | Me | Me | Me | O |
| C-14491 | Me(R) | single bond | H | t-Bu | Me | Me | Me | O |
| C-14492 | Me(S) | single bond | H | t-Bu | Me | Me | Me | O |
| C-14493 | H | single bond | Me | c-Bu | Me | Cl | Me | O |
| C-14494 | Me | single bond | H | c-Bu | Me | Cl | Me | O |

TABLE 558

| Compound Number | Y | W | Z | $R^1$ | $R^2$ | $R^3$ | $R^{10}$ | A |
|---|---|---|---|---|---|---|---|---|
| C-14495 | Me(R) | single bond | H | c-Bu | Me | Cl | Me | O |
| C-14496 | Me(S) | single bond | H | c-Bu | Me | Cl | Me | O |
| C-14497 | H | single bond | Me | c-Bu | Me | Me | Me | O |
| C-14498 | Me | single bond | H | c-Bu | Me | Me | Me | O |
| C-14499 | Me(R) | single bond | H | c-Bu | Me | Me | Me | O |
| C-14500 | Me(S) | single bond | H | c-Bu | Me | Me | Me | O |
| C-14501 | H | single bond | Me | c-Bu(1-CN) | Me | Cl | Me | O |
| C-14502 | Me | single bond | H | c-Bu(1-CN) | Me | Cl | Me | O |
| C-14503 | Me(R) | single bond | H | c-Bu(1-CN) | Me | Cl | Me | O |
| C-14504 | Me(S) | single bond | H | c-Bu(1-CN) | Me | Cl | Me | O |
| C-14505 | H | single bond | Me | c-Bu(1-CN) | Me | Me | Me | O |
| C-14506 | Me | single bond | H | c-Bu(1-CN) | Me | Me | Me | O |
| C-14507 | Me(R) | single bond | H | c-Bu(1-CN) | Me | Me | Me | O |
| C-14508 | Me(S) | single bond | H | c-Bu(1-CN) | Me | Me | Me | O |
| C-14509 | H | single bond | Me | c-Bu(3,3-F$_2$) | Me | Cl | Me | O |
| C-14510 | Me | single bond | H | c-Bu(3,3-F$_2$) | Me | Cl | Me | O |
| C-14511 | Me(R) | single bond | I H | c-Bu(3,3-F$_2$) | Me | Cl | Me | O |
| C-14512 | Me(S) | single bond | H | c-Bu(3,3-F$_2$) | Me | Cl | Me | O |
| C-14513 | H | single bond | Me | c-Bu(3,3-F$_2$) | Me | Me | Me | O |
| C-14514 | Me | single bond | H | c-Bu(3,3-F$_2$) | Me | Me | Me | O |
| C-14515 | Me(R) | single bond | H | c-Bu(3,3-F$_2$) | Me | Me | Me | O |

TABLE 558-continued

| Compound Number | Y | W | Z | $R^1$ | $R^2$ | $R^3$ | $R^{10}$ | A |
|---|---|---|---|---|---|---|---|---|
| C-14516 | Me(S) | single bond | H | c-Bu(3,3-$F_2$) | Me | Me | Me | O |
| C-14517 | H | single bond | Me | oxetan-3-yl | Me | Cl | Me | O |
| C-14518 | Me | single bond | H | oxetan-3-yl | Me | Cl | Me | O |
| C-14519 | Me(R) | single bond | H | oxetan-3-yl | Me | Cl | Me | O |
| C-14520 | Me(S) | single bond | H | oxetan-3-yl | Me | Cl | Me | O |
| C-14521 | H | single bond | Me | oxetan-3-yl | Me | Me | Me | O |
| C-14522 | Me | single bond | H | oxetan-3-yl | Me | Me | Me | O |
| C-14523 | Me(R) | single bond | H | oxetan-3-yl | Me | Me | Me | O |
| C-14524 | Me(S) | single bond | H | oxetan-3-yl | Me | Me | Me | O |
| C-14525 | H | single bond | Me | oxetan(3-CN)-3-yl | Me | Cl | Me | O |
| C-14526 | Me | single bond | H | oxetan(3-CN)-3-yl | Me | Cl | Me | O |
| C-14527 | Me(R) | single bond | H | oxetan(3-CN)-3-yl | Me | Cl | Me | O |
| C-14528 | Me(S) | single bond | H | oxetan(3-CN)-3-yl | Me | Cl | Me | O |
| C-14529 | H | single bond | Me | oxetan(3-CN)-3-yl | Me | Me | Me | O |
| C-14530 | Me | single bond | H | oxetan(3-CN)-3-yl | Me | Me | Me | O |
| C-14531 | Me(R) | single bond | H | oxetan(3-CN)-3-yl | Me | Me | Me | O |
| C-14532 | Me(S) | single bond | H | oxetan(3-CN)-3-yl | Me | Me | Me | O |
| C-14533 | H | single bond | Me | azetidin[1-C(═O)Me]-3-yl | Me | Cl | Me | O |
| C-14534 | Me | single bond | H | azetidin[1-C(═O)Me]-3-yl | Me | Cl | Me | O |
| C-14535 | Me(R) | single bond | H | azetidin[1-C(═O)Me]-3-yl | Me | Cl | Me | O |
| C-14536 | Me(S) | single bond | H | azetidin[1-C(═O)Me]-3-yl | Me | Cl | Me | O |
| C-14537 | H | single bond | Me | azetidin[1-C(═O)Me]-3-yl | Me | Me | Me | O |
| C-14538 | Me | single bond | H | azetidin[1-C(═O)Me]-3-yl | Me | Me | Me | O |

TABLE 559

| Compound Number | Y | W | Z | $R^1$ | $R^2$ | $R^3$ | $R^{10}$ | A |
|---|---|---|---|---|---|---|---|---|
| C-14539 | Me(R) | single bond | H | azetidin[1-C(═O)Me]-3-yl | Me | Me | Me | O |
| C-14540 | Me(S) | single bond | H | azetidin[1-C(═O)Me]-3-yl | Me | Me | Me | O |
| C-14541 | H | single bond | Me | azetidin[1-S(═O)$_2$Me]-3-yl | Me | Cl | Me | O |
| C-14542 | Me | single bond | H | azetidin[1-S(═O)$_2$Me]-3-yl | Me | Cl | Me | O |
| C-14543 | Me(R) | single bond | H | azetidin[1-S(═O)$_2$Me]-3-yl | Me | Cl | Me | O |
| C-14544 | Me(S) | single bond | H | azetidin[1-S(═O)$_2$Me]-3-yl | Me | Cl | Me | O |
| C-14545 | H | single bond | Me | azetidin[1-S(═O)$_2$Me]-3-yl | Me | Me | Me | O |
| C-14546 | Me | single bond | H | azetidin[1-S(═O)$_2$Me]-3-yl | Me | Me | Me | O |
| C-14547 | Me(R) | single bond | H | azetidin[1-S(═O)$_2$Me]-3-yl | Me | Me | Me | O |
| C-14548 | Me(S) | single bond | H | azetidin[1-S(═O)$_2$Me]-3-yl | Me | Me | Me | O |
| C-14549 | H | single bond | Me | azetidin[1-S(═O)$_2$CHF$_2$]-3-yl | Me | Cl | Me | O |
| C-14550 | Me | single bond | H | azetidin[1-S(═O)$_2$CHF$_2$]-3-yl | Me | Cl | Me | O |
| C-14551 | Me(R) | single bond | H | azetidin[1-S(═O)$_2$CHF$_2$]-3-yl | Me | Cl | Me | O |
| C-14552 | Me(S) | single bond | H | azetidin[1-S(═O)$_2$CHF$_2$]-3-yl | Me | Cl | Me | O |
| C-14553 | H | single bond | Me | azetidin[1-S(═O)$_2$CHF$_2$]-3-yl | Me | Me | Me | O |
| C-14554 | Me | single bond | H | azetidin[1-S(═O)$_2$CHF$_2$]-3-yl | Me | Me | Me | O |
| C-14555 | Me(R) | single bond | H | azetidin[1-S(═O)$_2$CHF$_2$]-3-yl | Me | Me | Me | O |
| C-14556 | Me(S) | single bond | H | azetidin[1-S(═O)$_2$CHF$_2$]-3-yl | Me | Me | Me | O |
| C-14557 | H | single bond | Me | c-Pen | Me | Cl | Me | O |
| C-14558 | Me | single bond | H | c-Pen | Me | Cl | Me | O |
| C-14559 | Me(R) | single bond | H | c-Pen | Me | Cl | Me | O |
| C-14560 | Me(S) | single bond | H | c-Pen | Me | Cl | Me | O |
| C-14561 | H | single bond | Me | c-Pen | Me | Me | Me | O |
| C-14562 | Me | single bond | H | c-Pen | Me | Me | Me | O |
| C-14563 | Me(R) | single bond | H | c-Pen | Me | Me | Me | O |
| C-14564 | Me(S) | single bond | H | c-Pen | Me | Me | Me | O |
| C-14565 | H | single bond | Me | tetrahydrofuran-3-yl | Me | Cl | Me | O |
| C-14566 | Me | single bond | H | tetrahydrofuran-3-yl | Me | Cl | Me | O |
| C-14567 | Me(R) | single bond | H | tetrahydrofuran-3-yl | Me | Cl | Me | O |
| C-14568 | Me(S) | single bond | H | tetrahydrofuran-3-yl | Me | Cl | Me | O |
| C-14569 | H | single bond | Me | tetrahydrofuran-3-yl | Me | Me | Me | O |
| C-14570 | Me | single bond | H | tetrahydrofuran-3-yl | Me | Me | Me | O |
| C-14571 | Me(R) | single bond | H | tetrahydrofuran-3-yl | Me | Me | Me | O |
| C-14572 | Me(S) | single bond | H | tetrahydrofuran-3-yl | Me | Me | Me | O |
| C-14573 | H | single bond | Me | tetrahydrothiophen-3-yl | Me | Cl | Me | O |
| C-14574 | Me | single bond | H | tetrahydrothiophen-3-yl | Me | Cl | Me | O |
| C-14575 | Me(R) | single bond | H | tetrahydrothiophen-3-yl | Me | Cl | Me | O |
| C-14576 | Me(S) | single bond | H | tetrahydrothiophen-3-yl | Me | Cl | Me | O |
| C-14577 | H | single bond | Me | tetrahydrothiophen-3-yl | Me | Me | Me | O |
| C-14578 | Me | single bond | H | tetrahydrothiophen-3-yl | Me | Me | Me | O |
| C-14579 | Me(R) | single bond | H | tetrahydrothiophen-3-yl | Me | Me | Me | O |
| C-14580 | Me(S) | single bond | H | tetrahydrothiophen-3-yl | Me | Me | Me | O |

TABLE 559-continued

| Compound Number | Y | W | Z | $R^1$ | $R^2$ | $R^3$ | $R^{10}$ | A |
|---|---|---|---|---|---|---|---|---|
| C-14581 | H | single bond | Me | c-Pen(1-CN) | Me | Cl | Me | O |
| C-14582 | Me | single bond | H | c-Pen(1-CN) | Me | Cl | Me | O |

TABLE 560

| Compound Number | Y | W | Z | $R^1$ | $R^2$ | $R^3$ | $R^{10}$ | A |
|---|---|---|---|---|---|---|---|---|
| C-14583 | Me(R) | single bond | H | c-Pen(1-CN) | Me | Cl | Me | O |
| C-14584 | Me(S) | single bond | H | c-Pen(1-CN) | Me | Cl | Me | O |
| C-14585 | H | single bond | Me | c-Pen(1-CN) | Me | Me | Me | O |
| C-14586 | Me | single bond | H | c-Pen(1-CN) | Me | Me | Me | O |
| C-14587 | Me(R) | single bond | H | c-Pen(1-CN) | Me | Me | Me | O |
| C-14588 | Me(S) | single bond | H | c-Pen(1-CN) | Me | Me | Me | O |
| C-14589 | H | single bond | Me | tetrahydrofuran(3-CN)-3-yl | Me | Cl | Me | O |
| C-14590 | Me | single bond | H | tetrahydrofuran(3-CN)-3-yl | Me | Cl | Me | O |
| C-14591 | Me(R) | single bond | H | tetrahydrofuran(3-CN)-3-yl | Me | Cl | Me | O |
| C-14592 | Me(S) | single bond | H | tetrahydrofuran(3-CN)-3-yl | Me | Cl | Me | O |
| C-14593 | H | single bond | Me | tetrahydrofuran(3-CN)-3-yl | Me | Me | Me | O |
| C-14594 | Me | single bond | H | tetrahydrofuran(3-CN)-3-yl | Me | Me | Me | O |
| C-14595 | Me(R) | single bond | H | tetrahydrofuran(3-CN)-3-yl | Me | Me | Me | O |
| C-14596 | Me(S) | single bond | H | tetrahydrofuran(3-CN)-3-yl | Me | Me | Me | O |
| C-14597 | H | single bond | Me | tetrahydrothiophen(3-CN)-3-yl | Me | Cl | Me | O |
| C-14598 | Me | single bond | H | tetrahydrothiophen(3-CN)-3-yl | Me | Cl | Me | O |
| C-14599 | Me(R) | single bond | H | tetrahydrothiophen(3-CN)-3-yl | Me | Cl | Me | O |
| C-14600 | Me(S) | single bond | H | tetrahydrothiophen(3-CN)-3-yl | Me | Cl | Me | O |
| C-14601 | H | single bond | Me | tetrahydrothiophen(3-CN)-3-yl | Me | Me | Me | O |
| C-14602 | Me | single bond | H | tetrahydrothiophen(3-CN)-3-yl | Me | Me | Me | O |
| C-14603 | Me(R) | single bond | H | tetrahydrothiophen(3-CN)-3-yl | Me | Me | Me | O |
| C-14604 | Me(S) | single bond | H | tetrahydrothiophen(3-CN)-3-yl | Me | Me | Me | O |
| C-14605 | H | single bond | Me | bicyclo[1.1.1]pentan-1-yl | Me | Cl | Me | O |
| C-14606 | Me | single bond | H | bicyclo[1.1.1]pentan-1-yl | Me | Cl | Me | O |
| C-14607 | Me(R) | single bond | H | bicyclo[1.1.1]pentan-1-yl | Me | Cl | Me | O |
| C-14608 | Me(S) | single bond | H | bicyclo[1.1.1]pentan-1-yl | Me | Cl | Me | O |
| C-14609 | H | single bond | Me | bicyclo[1.1.1]pentan-1-yl | Me | Me | Me | O |
| C-14610 | Me | single bond | H | bicyclo[1.1.1]pentan-1-yl | Me | Me | Me | O |
| C-14611 | Me(R) | single bond | H | bicyclo[1.1.1]pentan-1-yl | Me | Me | Me | O |
| C-14612 | Me(S) | single bond | H | bicyclo[1.1.1]pentan-1-yl | Me | Me | Me | O |
| C-14613 | H | single bond | Me | c-Hex | Me | Cl | Me | O |
| C-14614 | Me | single bond | H | c-Hex | Me | Cl | Me | O |
| C-14615 | Me(R) | single bond | H | c-Hex | Me | Cl | Me | O |
| C-14616 | Me(S) | single bond | H | c-Hex | Me | Cl | Me | O |
| C-14617 | H | single bond | Me | c-Hex | Me | Me | Me | O |
| C-14618 | Me | single bond | H | c-Hex | Me | Me | Me | O |
| C-14619 | Me(R) | single bond | H | c-Hex | Me | Me | Me | O |
| C-14620 | Me(S) | single bond | H | c-Hex | Me | Me | Me | O |
| C-14621 | H | single bond | Me | tetrahydropyran-4-yl | Me | Cl | Me | O |
| C-14622 | Me | single bond | H | tetrahydropyran-4-yl | Me | Cl | Me | O |
| C-14623 | Me(R) | single bond | H | tetrahydropyran-4-yl | Me | Cl | Me | O |
| C-14624 | Me(S) | single bond | H | tetrahydropyran-4-yl | Me | Cl | Me | O |
| C-14625 | H | single bond | Me | tetrahydropyran-4-yl | Me | Me | Me | O |
| C-14626 | Me | single bond | H | tetrahydropyran-4-yl | Me | Me | Me | O |

TABLE 561

| Compound Number | Y | W | Z | $R^1$ | $R^2$ | $R^3$ | $R^{10}$ | A |
|---|---|---|---|---|---|---|---|---|
| C-14627 | Me(R) | single bond | H | tetrahydropyran-4-yl | Me | Me | Me | O |
| C-14628 | Me(S) | single bond | H | tetrahydropyran-4-yl | Me | Me | Me | O |
| C-14629 | H | single bond | Me | tetrahydrothiopyran-4-yl | Me | Cl | Me | O |
| C-14630 | Me | single bond | H | tetrahydrothiopyran-4-yl | Me | Cl | Me | O |
| C-14631 | Me(R) | single bond | H | tetrahydrothiopyran-4-yl | Me | Cl | Me | O |
| C-14632 | Me(S) | single bond | H | tetrahydrothiopyran-4-yl | Me | Cl | Me | O |
| C-14633 | H | single bond | Me | tetrahydrothiopyran-4-yl | Me | Me | Me | O |
| C-14634 | Me | single bond | H | tetrahydrothiopyran-4-yl | Me | Me | Me | O |
| C-14635 | Me(R) | single bond | H | tetrahydrothiopyran-4-yl | Me | Me | Me | O |
| C-14636 | Me(S) | single bond | H | tetrahydrothiopyran-4-yl | Me | Me | Me | O |
| C-14637 | H | single bond | Me | c-Hex(1-CN) | Me | Cl | Me | O |
| C-14638 | Me | single bond | H | c-Hex(1-CN) | Me | Cl | Me | O |

TABLE 561-continued

| Compound Number | Y | W | Z | $R^1$ | $R^2$ | $R^3$ | $R^{10}$ | A |
|---|---|---|---|---|---|---|---|---|
| C-14639 | Me(R) | single bond | H | c-Hex(1-CN) | Me | Cl | Me | O |
| C-14640 | Me(S) | single bond | H | c-Hex(1-CN) | Me | Cl | Me | O |
| C-14641 | H | single bond | Me | c-Hex(1-CN) | Me | Me | Me | O |
| C-14642 | Me | single bond | H | c-Hex(1-CN) | Me | Me | Me | O |
| C-14643 | Me(R) | single bond | H | c-Hex(1-CN) | Me | Me | Me | O |
| C-14644 | Me(S) | single bond | H | c-Hex(1-CN) | Me | Me | Me | O |
| C-14645 | H | single bond | Me | tetrahydropyran(4-CN)-4-yl | Me | Cl | Me | O |
| C-14646 | Me | single bond | H | tetrahydropyran(4-CN)-4-yl | Me | Cl | Me | O |
| C-14647 | Me(R) | single bond | H | tetrahydropyran(4-CN)-4-yl | Me | Cl | Me | O |
| C-14648 | Me(S) | single bond | H | tetrahydropyran(4-CN)-4-yl | Me | Cl | Me | O |
| C-14649 | H | single bond | Me | tetrahydropyran(4-CN)-4-yl | Me | Me | Me | O |
| C-14650 | Me | single bond | H | tetrahydropyran(4-CN)-4-yl | Me | Me | Me | O |
| C-14651 | Me(R) | single bond | H | tetrahydropyran(4-CN)-4-yl | Me | Me | Me | O |
| C-14652 | Me(S) | single bond | H | tetrahydropyran(4-CN)-4-yl | Me | Me | Me | O |
| C-14653 | H | single bond | Me | tetrahydrothiopyran(4-CN)-4-yl | Me | Cl | Me | O |
| C-14654 | Me | single bond | H | tetrahydrothiopyran(4-CN)-4-yl | Me | Cl | Me | O |
| C-14655 | Me(R) | single bond | H | tetrahydrothiopyran(4-CN)-4-yl | Me | Cl | Me | O |
| C-14656 | Me(S) | single bond | H | tetrahydrothiopyran(4-CN)-4-yl | Me | Cl | Me | O |
| C-14657 | H | single bond | Me | tetrahydrothiopyran(4-CN)-4-yl | Me | Me | Me | O |
| C-14658 | Me | single bond | H | tetrahydrothiopyran(4-CN)-4-yl | Me | Me | Me | O |
| C-14659 | Me(R) | single bond | H | tetrahydrothiopyran(4-CN)-4-yl | Me | Me | Me | O |
| C-14660 | Me(S) | single bond | H | tetrahydrothiopyran(4-CN)-4-yl | Me | Me | Me | O |
| C-14661 | H | single bond | Me | $CH_2$(c-Pr) | Me | Cl | Me | O |
| C-14662 | Me | single bond | H | $CH_2$(c-Pr) | Me | Cl | Me | O |
| C-14663 | Me(R) | single bond | H | $CH_2$(c-Pr) | Me | Cl | Me | O |
| C-14664 | Me(S) | single bond | H | $CH_2$(c-Pr) | Me | Cl | Me | O |
| C-14665 | H | single bond | Me | $CH_2$(c-Pr) | Me | Me | Me | O |
| C-14666 | Me | single bond | H | $CH_2$(c-Pr) | Me | Me | Me | O |
| C-14667 | Me(R) | single bond | H | $CH_2$(c-Pr) | Me | Me | Me | O |
| C-14668 | Me(S) | single bond | H | $CH_2$(c-Pr) | Me | Me | Me | O |
| C-14669 | H | single bond | Me | $CH_2$[c-Pr(1-CN)] | Me | Cl | Me | O |
| C-14670 | Me | single bond | H | $CH_2$[C-Pr(1-CN)] | Me | Cl | Me | O |

TABLE 562

| Compound Number | Y | W | Z | $R^1$ | $R^2$ | $R^3$ | $R^{10}$ | A |
|---|---|---|---|---|---|---|---|---|
| C-14671 | Me(R) | single bond | H | $CH_2$[c-Pr(1-CN)] | Me | Cl | Me | O |
| C-14672 | Me(S) | single bond | H | $CH_2$[c-Pr(1-CN)] | Me | Cl | Me | O |
| C-14673 | H | single bond | Me | $CH_2$[c-Pr(1-CN)] | Me | Me | Me | O |
| C-14674 | Me | single bond | H | $CH_2$[c-Pr(1-CN)] | Me | Me | Me | O |
| C-14675 | Me(R) | single bond | H | $CH_2$[c-Pr(1-CN)] | Me | Me | Me | O |
| C-14676 | Me(S) | single bond | H | $CH_2$[c-Pr(1-CN)] | Me | Me | Me | O |
| C-14677 | H | single bond | Me | CH(Me)(c-Pr) | Me | Cl | Me | O |
| C-14678 | Me | single bond | H | CH(Me)(c-Pr) | Me | Cl | Me | O |
| C-14679 | Me(R) | single bond | H | CH(Me)(c-Pr) | Me | Cl | Me | O |
| C-14680 | Me(S) | single bond | H | CH(Me)(c-Pr) | Me | Cl | Me | O |
| C-14681 | H | single bond | Me | CH(Me)(c-Pr) | Me | Me | Me | O |
| C-14682 | Me | single bond | H | CH(Me)(c-Pr) | Me | Me | Me | O |
| C-14683 | Me(R) | single bond | H | CH(Me)(c-Pr) | Me | Me | Me | O |
| C-14684 | Me(S) | single bond | H | CH(Me)(c-Pr) | Me | Me | Me | O |
| C-14685 | H | single bond | Me | CH(Me)$CH_2$OMe | Me | Cl | Me | O |
| C-14686 | Me | single bond | H | CH(Me)$CH_2$OMe | Me | Cl | Me | O |
| C-14687 | Me(R) | single bond | H | CH(Me)$CH_2$OMe | Me | Cl | Me | O |
| C-14688 | Me(S) | single bond | H | CH(Me)$CH_2$OMe | Me | Cl | Me | O |
| C-14689 | H | single bond | Me | CH(Me)$CH_2$OMe | Me | Me | Me | O |
| C-14690 | Me | single bond | H | CH(Me)$CH_2$OMe | Me | Me | Me | O |
| C-14691 | Me(R) | single bond | H | CH(Me)$CH_2$OMe | Me | Me | Me | O |
| C-14692 | Me(S) | single bond | H | CH(Me)$CH_2$OMe | Me | Me | Me | O |
| C-14693 | H | single bond | Me | $CH_2CH{=}CH_2$ | Me | Cl | Me | O |
| C-14694 | Me | single bond | H | $CH_2CH{=}CH_2$ | Me | Cl | Me | O |
| C-14695 | Me(R) | single bond | H | $CH_2CH{=}CH_2$ | Me | Cl | Me | O |
| C-14696 | Me(S) | single bond | H | $CH_2CH{=}CH_2$ | Me | Cl | Me | O |
| C-14697 | H | single bond | Me | $CH_2CH{=}CH_2$ | Me | Me | Me | O |
| C-14698 | Me | single bond | H | $CH_2CH{=}CH_2$ | Me | Me | Me | O |
| C-14699 | Me(R) | single bond | H | $CH_2CH{=}CH_2$ | Me | Me | Me | O |
| C-14700 | Me(S) | single bond | H | $CH_2CH{=}CH_2$ | Me | Me | Me | O |
| C-14701 | H | single bond | Me | $CH_2C{\equiv}CH$ | Me | Cl | Me | O |
| C-14702 | Me | single bond | H | $CH_2C{\equiv}CH$ | Me | Cl | Me | O |
| C-14703 | Me(R) | single bond | H | $CH_2C{\equiv}CH$ | Me | Cl | Me | O |
| C-14704 | Me(S) | single bond | H | $CH_2C{\equiv}CH$ | Me | Cl | Me | O |
| C-14705 | H | single bond | Me | $CH_2C{\equiv}CH$ | Me | Me | Me | O |

TABLE 562-continued

| Compound Number | Y | W | Z | $R^1$ | $R^2$ | $R^3$ | $R^{10}$ | A |
|---|---|---|---|---|---|---|---|---|
| C-14706 | Me | single bond | H | $CH_2C{\equiv}CH$ | Me | Me | Me | O |
| C-14707 | Me(R) | single bond | H | $CH_2C{\equiv}CH$ | Me | Me | Me | O |
| C-14708 | Me(S) | single bond | H | $CH_2C{\equiv}CH$ | Me | Me | Me | O |
| C-14709 | H | single bond | Me | $CH_2CN$ | Me | Cl | Me | O |
| C-14710 | Me | single bond | H | $CH_2CN$ | Me | Cl | Me | O |
| C-14711 | Me(R) | single bond | H | $CH_2CN$ | Me | Cl | Me | O |
| C-14712 | Me(S) | single bond | H | $CH_2CN$ | Me | Cl | Me | O |
| C-14713 | H | single bond | Me | $CH_2CN$ | Me | Me | Me | O |
| C-14714 | Me | single bond | H | $CH_2CN$ | Me | Me | Me | O |

TABLE 563

| Compound Number | Y | W | Z | $R^1$ | $R^2$ | $R^3$ | $R^{10}$ | A |
|---|---|---|---|---|---|---|---|---|
| C-14715 | Me(R) | single bond | H | $CH_2CN$ | Me | Me | Me | O |
| C-14716 | Me(S) | single bond | H | $CH_2CN$ | Me | Me | Me | O |
| C-14717 | H | single bond | Me | CH(Me)CN | Me | Cl | Me | O |
| C-14718 | Me | single bond | H | CH(Me)CN | Me | Cl | Me | O |
| C-14719 | Me(R) | single bond | H | CH(Me)CN | Me | Cl | Me | O |
| C-14720 | Me(S) | single bond | H | CH(Me)CN | Me | Cl | Me | O |
| C-14721 | H | single bond | Me | CH(Me)CN | Me | Me | Me | O |
| C-14722 | Me | single bond | H | CH(Me)CN | Me | Me | Me | O |
| C-14723 | Me(R) | single bond | H | CH(Me)CN | Me | Me | Me | O |
| C-14724 | Me(S) | single bond | H | CH(Me)CN | Me | Me | Me | O |
| C-14725 | H | single bond | Me | $C(Me)_2CN$ | Me | Cl | Me | O |
| C-14726 | Me | single bond | H | $C(Me)_2CN$ | Me | Cl | Me | O |
| C-14727 | Me(R) | single bond | H | $C(Me)_2CN$ | Me | Cl | Me | O |
| C-14728 | Me(S) | single bond | H | $C(Me)_2CN$ | Me | Cl | Me | O |
| C-14729 | H | single bond | Me | $C(Me)_2CN$ | Me | Me | Me | O |
| C-14730 | Me | single bond | H | $C(Me)_2CN$ | Me | Me | Me | O |
| C-14731 | Me(R) | single bond | H | $C(Me)_2CN$ | Me | Me | Me | O |
| C-14732 | Me(S) | single bond | H | $C(Me)_2CN$ | Me | Me | Me | O |
| C-14733 | H | single bond | Me | C(Me)(i-Pr)CN | Me | Cl | Me | O |
| C-14734 | Me | single bond | H | C(Me)(i-Pr)CN | Me | Cl | Me | O |
| C-14735 | Me(R) | single bond | H | C(Me)(i-Pr)CN | Me | Cl | Me | O |
| C-14736 | Me(S) | single bond | H | C(Me)(i-Pr)CN | Me | Cl | Me | O |
| C-14737 | H | single bond | Me | C(Me)(i-Pr)CN | Me | Me | Me | O |

TABLE 563-continued

| Compound Number | Y | W | Z | $R^1$ | $R^2$ | $R^3$ | $R^{10}$ | A |
|---|---|---|---|---|---|---|---|---|
| C-14738 | Me | single bond | H | C(Me)(i-Pr)CN | Me | Me | Me | O |
| C-14739 | Me(R) | single bond | H | C(Me)(i-Pr)CN | Me | Me | Me | O |
| C-14740 | Me(S) | single bond | H | C(Me)(i-Pr)CN | Me | Me | Me | O |
| C-14741 | H | single bond | Me | OMe | Me | Cl | Me | O |
| C-14742 | Me | single bond | H | OMe | Me | Cl | Me | O |
| C-14743 | Me(R) | single bond | H | OMe | Me | Cl | Me | O |
| C-14744 | Me(S) | single bond | H | OMe | Me | Cl | Me | O |
| C-14745 | H | single bond | Me | OMe | Me | Me | Me | O |
| C-14746 | Me | single bond | H | OMe | Me | Me | Me | O |
| C-14747 | Me(R) | single bond | H | OMe | Me | Me | Me | O |
| C-14748 | Me(S) | single bond | H | OMe | Me | Me | Me | O |
| C-14749 | H | single bond | Me | CH═NOMe | Me | Cl | Me | O |
| C-14750 | Me | single bond | H | CH═NOMe | Me | Cl | Me | O |
| C-14751 | Me(R) | single bond | H | CH═NOMe | Me | Cl | Me | O |
| C-14752 | Me(S) | single bond | H | CH═NOMe | Me | Cl | Me | O |
| C-14753 | H | single bond | Me | CH═NOMe | Me | Me | Me | O |
| C-14754 | Me | single bond | H | CH═NOMe | Me | Me | Me | O |
| C-14755 | Me(R) | single bond | H | CH═NOMe | Me | Me | Me | O |
| C-14756 | Me(S) | single bond | H | CH═NOMe | Me | Me | Me | O |
| C-14757 | H | single bond | Me | morpholin-4-yl | Me | Cl | Me | O |
| C-14758 | Me | single bond | H | morpholin-4-yl | Me | Cl | Me | O |

TABLE 564

| Compound Number | Y | W | Z | $R^1$ | $R^2$ | $R^3$ | $R^{10}$ | A |
|---|---|---|---|---|---|---|---|---|
| C-14759 | Me(R) | single bond | H | morpholin-4-yl | Me | Cl | Me | O |
| C-14760 | Me(S) | single bond | H | morpholin-4-yl | Me | Cl | Me | O |
| C-14761 | H | single bond | Me | morpholin-4-yl | Me | Me | Me | O |
| C-14762 | Me | single bond | H | morpholin-4-yl | Me | Me | Me | O |
| C-14763 | Me(R) | single bond | H | morpholin-4-yl | Me | Me | Me | O |
| C-14764 | Me(S) | single bond | H | morpholin-4-yl | Me | Me | Me | O |
| C-14765 | H | single bond | Me | Ph | Me | Cl | Me | O |
| C-14766 | Me | single bond | H | Ph | Me | Cl | Me | O |
| C-14767 | Me(R) | single bond | H | Ph | Me | Cl | Me | O |
| C-14768 | Me(S) | single bond | H | Ph | Me | Cl | Me | O |
| C-14769 | H | single bond | Me | Ph | Me | Me | Me | O |
| C-14770 | Me | single bond | H | Ph | Me | Me | Me | O |
| C-14771 | Me(R) | single bond | H | Ph | Me | Me | Me | O |
| C-14772 | Me(S) | single bond | H | Ph | Me | Me | Me | O |
| C-14773 | H | single bond | Me | $CH_2Ph$ | Me | Cl | Me | O |
| C-14774 | Me | single bond | H | $CH_2Ph$ | Me | Cl | Me | O |
| C-14775 | Me(R) | single bond | H | $CH_2Ph$ | Me | Cl | Me | O |
| C-14776 | Me(S) | single bond | H | $CH_2Ph$ | Me | Cl | Me | O |
| C-14777 | H | single bond | Me | $CH_2Ph$ | Me | Me | Me | O |
| C-14778 | Me | single bond | H | $CH_2Ph$ | Me | Me | Me | O |
| C-14779 | Me(R) | single bond | H | $CH_2Ph$ | Me | Me | Me | O |
| C-14780 | Me(S) | single bond | H | $CH_2Ph$ | Me | Me | Me | O |
| C-14781 | H | single bond | Me | thiazole-2-yl | Me | Cl | Me | O |
| C-14782 | Me | single bond | H | thiazole-2-yl | Me | Cl | Me | O |
| C-14783 | Me(R) | single bond | H | thiazole-2-yl | Me | Cl | Me | O |
| C-14784 | Me(S) | single bond | H | thiazole-2-yl | Me | Cl | Me | O |
| C-14785 | H | single bond | Me | thiazole-2-yl | Me | Me | Me | O |
| C-14786 | Me | single bond | H | thiazole-2-yl | Me | Me | Me | O |
| C-14787 | Me(R) | single bond | H | thiazole-2-yl | Me | Me | Me | O |

TABLE 564-continued

| Compound Number | Y | W | Z | $R^1$ | $R^2$ | $R^3$ | $R^{10}$ | A |
|---|---|---|---|---|---|---|---|---|
| C-14788 | Me(S) | single bond | H | thiazole-2-yl | Me | Me | Me | O |
| C-14789 | H | single bond | Me | 1-Me-pyrazol-3-yl | Me | Cl | Me | O |
| C-14790 | Me | single bond | H | 1-Me-pyrazol-3-yl | Me | Cl | Me | O |
| C-14791 | Me(R) | single bond | H | 1-Me-pyrazol-3-yl | Me | Cl | Me | O |
| C-14792 | Me(S) | single bond | H | 1-Me-pyrazol-3-yl | Me | Cl | Me | O |
| C-14793 | H | single bond | Me | 1-Me-pyrazol-3-yl | Me | Me | Me | O |
| C-14794 | Me | single bond | H | 1-Me-pyrazol-3-yl | Me | Me | Me | O |
| C-14795 | Me(R) | single bond | H | 1-Me-pyrazol-3-yl | Me | Me | Me | O |
| C-14796 | Me(S) | single bond | H | 1-Me-pyrazol-3-yl | Me | Me | Me | O |
| C-14797 | H | single bond | Me | 1-Me-pyrazol-5-yl | Me | Cl | Me | O |
| C-14798 | Me | single bond | H | 1-Me-pyrazol-5-yl | Me | Cl | Me | O |
| C-14799 | Me(R) | single bond | H | 1-Me-pyrazol-5-yl | Me | Cl | Me | O |
| C-14800 | Me(S) | single bond | H | 1-Me-pyrazol-5-yl | Me | Cl | Me | O |
| C-14801 | H | single bond | Me | 1-Me-pyrazol-5-yl | Me | Me | Me | O |
| C-14802 | Me | single bond | H | 1-Me-pyrazol-5-yl | Me | Me | Me | O |

TABLE 565

| Compound Number | Y | W | Z | $R^1$ | $R^2$ | $R^3$ | $R^{10}$ | A |
|---|---|---|---|---|---|---|---|---|
| C-14803 | Me(R) | single bond | H | 1-Me-pyrazol-5-yl | Me | Me | Me | O |
| C-14804 | Me(S) | single bond | H | 1-Me-pyrazol-5-yl | Me | Me | Me | O |
| C-14805 | H | single bond | Me | $CH_2$(pyrimidin-2-yl) | Me | Cl | Me | O |
| C-14806 | Me | single bond | H | $CH_2$(pyrimidin-2-yl) | Me | Cl | Me | O |
| C-14807 | Me(R) | single bond | H | $CH_2$(pyrimidin-2-yl) | Me | Cl | Me | O |
| C-14808 | Me(S) | single bond | H | $CH_2$(pyrimidin-2-yl) | Me | Cl | Me | O |
| C-14809 | H | single bond | Me | $CH_2$(pyrimidin-2-yl) | Me | Me | Me | O |
| C-14810 | Me | single bond | H | $CH_2$(pyrimidin-2-yl) | Me | Me | Me | O |
| C-14811 | Me(R) | single bond | H | $CH_2$(pyrimidin-2-yl) | Me | Me | Me | O |
| C-14812 | Me(S) | single bond | H | $CH_2$(pyrimidin-2-yl) | Me | Me | Me | O |
| C-14813 | H | single bond | Me | Me | Me | Cl | $CH_2OMe$ | O |
| C-14814 | Me | single bond | H | Me | Me | Cl | $CH_2OMe$ | O |
| C-14815 | Me(R) | single bond | H | Me | Me | Cl | $CH_2OMe$ | O |
| C-14816 | Me(S) | single bond | H | Me | Me | Cl | $CH_2OMe$ | O |
| C-14817 | H | single bond | Me | Me | Me | Me | $CH_2OMe$ | O |
| C-14818 | Me | single bond | H | Me | Me | Me | $CH_2OMe$ | O |
| C-14819 | Me(R) | single bond | H | Me | Me | Me | $CH_2OMe$ | O |
| C-14820 | Me(S) | single bond | H | Me | Me | Me | $CH_2OMe$ | O |
| C-14821 | H | single bond | Me | $CH_2CHF_2$ | Me | Cl | $CH_2OMe$ | O |
| C-14822 | Me | single bond | H | $CH_2CHF_2$ | Me | Cl | $CH_2OMe$ | O |
| C-14823 | Me(R) | single bond | H | $CH_2CHF_2$ | Me | Cl | $CH_2OMe$ | O |
| C-14824 | Me(S) | single bond | H | $CH_2CHF_2$ | Me | Cl | $CH_2OMe$ | O |
| C-14825 | H | single bond | Me | $CH_2CHF_2$ | Me | Me | $CH_2OMe$ | O |
| C-14826 | Me | single bond | H | $CH_2CHF_2$ | Me | Me | $CH_2OMe$ | O |
| C-14827 | Me(R) | single bond | H | $CH_2CHF_2$ | Me | Me | $CH_2OMe$ | O |
| C-14828 | Me(S) | single bond | H | $CH_2CHF_2$ | Me | Me | $CH_2OMe$ | O |
| C-14829 | H | single bond | Me | n-Pr | Me | Cl | $CH_2OMe$ | O |
| C-14830 | Me | single bond | H | n-Pr | Me | Cl | $CH_2OMe$ | O |
| C-14831 | Me(R) | single bond | H | n-Pr | Me | Cl | $CH_2OMe$ | O |
| C-14832 | Me(S) | single bond | H | n-Pr | Me | Cl | $CH_2OMe$ | O |
| C-14833 | H | single bond | Me | n-Pr | Me | Me | $CH_2OMe$ | O |
| C-14834 | Me | single bond | H | n-Pr | Me | Me | $CH_2OMe$ | O |
| C-14835 | Me(R) | single bond | H | n-Pr | Me | Me | $CH_2OMe$ | O |
| C-14836 | Me(S) | single bond | H | n-Pr | Me | Me | $CH_2OMe$ | O |
| C-14837 | H | single bond | Me | i-Pr | Me | Cl | $CH_2OMe$ | O |
| C-14838 | Me | single bond | H | i-Pr | Me | Cl | $CH_2OMe$ | O |
| C-14839 | Me(R) | single bond | H | i-Pr | Me | Cl | $CH_2OMe$ | O |
| C-14840 | Me(S) | single bond | H | i-Pr | Me | Cl | $CH_2OMe$ | O |
| C-14841 | H | single bond | Me | i-Pr | Me | Me | $CH_2OMe$ | O |
| C-14842 | Me | single bond | H | i-Pr | Me | Me | $CH_2OMe$ | O |
| C-14843 | Me(R) | single bond | H | i-Pr | Me | Me | $CH_2OMe$ | O |
| C-14844 | Me(S) | single bond | H | i-Pr | Me | Me | $CH_2OMe$ | O |
| C-14845 | H | single bond | Me | c-Pr(1-F) | Me | Cl | $CH_2OMe$ | O |
| C-14846 | Me | single bond | H | c-Pr(1-F) | Me | Cl | $CH_2OMe$ | O |

TABLE 566

| Compound Number | Y | W | Z | $R^1$ | $R^2$ | $R^3$ | $R^{10}$ | A |
|---|---|---|---|---|---|---|---|---|
| C-14847 | Me(R) | single bond | H | c-Pr(1-F) | Me | Cl | $CH_2OMe$ | O |
| C-14848 | Me(S) | single bond | H | c-Pr(1-F) | Me | Cl | $CH_2OMe$ | O |
| C-14849 | H | single bond | Me | c-Pr(1-F) | Me | Me | $CH_2OMe$ | O |
| C-14850 | Me | single bond | H | c-Pr(1-F) | Me | Me | $CH_2OMe$ | O |
| C-14851 | Me(R) | single bond | H | c-Pr(1-F) | Me | Me | $CH_2OMe$ | O |
| C-14852 | Me(S) | single bond | H | c-Pr(1-F) | Me | Me | $CH_2OMe$ | O |
| C-14853 | H | single bond | Me | c-Pr(2,2-$F_2$) | Me | Cl | $CH_2OMe$ | O |
| C-14854 | Me | single bond | H | c-Pr(2,2-$F_2$) | Me | Cl | $CH_2OMe$ | O |
| C-14855 | Me(R) | single bond | H | c-Pr(2,2-$F_2$) | Me | Cl | $CH_2OMe$ | O |
| C-14856 | Me(S) | single bond | H | c-Pr(2,2-$F_2$) | Me | Cl | $CH_2OMe$ | O |
| C-14857 | H | single bond | Me | c-Pr(2,2-$F_2$) | Me | Me | $CH_2OMe$ | O |
| C-14858 | Me | single bond | H | c-Pr(2,2-$F_2$) | Me | Me | $CH_2OMe$ | O |
| C-14859 | Me(R) | single bond | H | c-Pr(2,2-$F_2$) | Me | Me | $CH_2OMe$ | O |
| C-14860 | Me(S) | single bond | H | c-Pr(2,2-$F_2$) | Me | Me | $CH_2OMe$ | O |
| C-14861 | H | single bond | Me | c-Pr(1-Cl) | Me | Cl | $CH_2OMe$ | O |
| C-14862 | Me | single bond | H | c-Pr(1-Cl) | Me | Cl | $CH_2OMe$ | O |
| C-14863 | Me(R) | single bond | H | c-Pr(1-Cl) | Me | Cl | $CH_2OMe$ | O |
| C-14864 | Me(S) | single bond | H | c-Pr(1-Cl) | Me | Cl | $CH_2OMe$ | O |
| C-14865 | H | single bond | Me | c-Pr(1-Cl) | Me | Me | $CH_2OMe$ | O |
| C-14866 | Me | single bond | H | c-Pr(1-Cl) | Me | Me | $CH_2OMe$ | O |
| C-14867 | Me(R) | single bond | H | c-Pr(1-Cl) | Me | Me | $CH_2OMe$ | O |
| C-14868 | Me(S) | single bond | H | c-Pr(1-Cl) | Me | Me | $CH_2OMe$ | O |
| C-14869 | H | single bond | Me | c-Pr(1-Br) | Me | Cl | $CH_2OMe$ | O |
| C-14870 | Me | single bond | H | c-Pr(1-Br) | Me | Cl | $CH_2OMe$ | O |
| C-14871 | Me(R) | single bond | H | c-Pr(1-Br) | Me | Cl | $CH_2OMe$ | O |
| C-14872 | Me(S) | single bond | H | c-Pr(1-Br) | Me | Cl | $CH_2OMe$ | O |
| C-14873 | H | single bond | Me | c-Pr(1-Br) | Me | Me | $CH_2OMe$ | O |
| C-14874 | Me | single bond | H | c-Pr(1-Br) | Me | Me | $CH_2OMe$ | O |
| C-14875 | Me(R) | single bond | H | c-Pr(1-Br) | Me | Me | $CH_2OMe$ | O |
| C-14876 | Me(S) | single bond | H | c-Pr(1-Br) | Me | Me | $CH_2OMe$ | O |
| C-14877 | H | single bond | Me | c-Pr(1-Me) | Me | Cl | $CH_2OMe$ | O |
| C-14878 | Me | single bond | H | c-Pr(1-Me) | Me | Cl | $CH_2OMe$ | O |
| C-14879 | Me(R) | single bond | H | c-Pr(1-Me) | Me | Cl | $CH_2OMe$ | O |
| C-14880 | Me(S) | single bond | H | c-Pr(1-Me) | Me | Cl | $CH_2OMe$ | O |
| C-14881 | H | single bond | Me | c-Pr(1-Me) | Me | Me | $CH_2OMe$ | O |
| C-14882 | Me | single bond | H | c-Pr(1-Me) | Me | Me | $CH_2OMe$ | O |
| C-14883 | Me(R) | single bond | H | c-Pr(1-Me) | Me | Me | $CH_2OMe$ | O |
| C-14884 | Me(S) | single bond | H | c-Pr(1-Me) | Me | Me | $CH_2OMe$ | O |
| C-14885 | H | single bond | Me | c-Pr(1-$CH_2OH$) | Me | Cl | $CH_2OMe$ | O |
| C-14886 | Me | single bond | H | c-Pr(1-$CH_2OH$) | Me | Cl | $CH_2OMe$ | O |
| C-14887 | Me(R) | single bond | H | c-Pr(1-$CH_2OH$) | Me | Cl | $CH_2OMe$ | O |
| C-14888 | Me(S) | single bond | H | c-Pr(1-$CH_2OH$) | Me | Cl | $CH_2OMe$ | O |
| C-14889 | H | single bond | Me | c-Pr(1-$CH_2OH$) | Me | Me | $CH_2OMe$ | O |
| C-14890 | Me | single bond | H | c-Pr(1-$CH_2OH$) | Me | Me | $CH_2OMe$ | O |

TABLE 567

| Compound Number | Y | W | Z | $R^1$ | $R^2$ | $R^3$ | $R^{10}$ | A |
|---|---|---|---|---|---|---|---|---|
| C-14891 | Me(R) | single bond | H | c-Pr(1-$CH_2OH$) | Me | Me | $CH_2OMe$ | O |
| C-14892 | Me(S) | single bond | H | c-Pr(1-$CH_2OH$) | Me | Me | $CH_2OMe$ | O |
| C-14893 | H | single bond | Me | c-Pr[1-$CH_2OS({=}O)_2Me$] | Me | Cl | $CH_2OMe$ | O |
| C-14894 | Me | single bond | H | c-Pr[1-$CH_2OS({=}O)_2Me$] | Me | Cl | $CH_2OMe$ | O |
| C-14895 | Me(R) | single bond | H | c-Pr[1-$CH_2OS({=}O)_2Me$] | Me | Cl | $CH_2OMe$ | O |
| C-14896 | Me(S) | single bond | H | c-Pr[1-$CH_2OS({=}O)_2Me$] | Me | Cl | $CH_2OMe$ | O |
| C-14897 | H | single bond | Me | c-Pr[1-$CH_2OS({=}O)_2Me$] | Me | Me | $CH_2OMe$ | O |
| C-14898 | Me | single bond | H | c-Pr[1-$CH_2OS({=}O)_2Me$] | Me | Me | $CH_2OMe$ | O |
| C-14899 | Me(R) | single bond | H | c-Pr[1-$CH_2OS({=}O)_2Me$] | Me | Me | $CH_2OMe$ | O |
| C-14900 | Me(S) | single bond | H | c-Pr[1-$CH_2OS({=}O)_2Me$] | Me | Me | $CH_2OMe$ | O |
| C-14901 | H | single bond | Me | c-Pr(1-$CH_2OMe$) | Me | Cl | $CH_2OMe$ | O |
| C-14902 | Me | single bond | H | c-Pr(1-$CH_2OMe$) | Me | Cl | $CH_2OMe$ | O |
| C-14903 | Me(R) | single bond | H | c-Pr(1-$CH_2OMe$) | Me | Cl | $CH_2OMe$ | O |
| C-14904 | Me(S) | single bond | H | c-Pr(1-$CH_2OMe$) | Me | Cl | $CH_2OMe$ | O |
| C-14905 | H | single bond | Me | c-Pr(1-$CH_2OMe$) | Me | Me | $CH_2OMe$ | O |
| C-14906 | Me | single bond | H | c-Pr(1-$CH_2OMe$) | Me | Me | $CH_2OMe$ | O |
| C-14907 | Me(R) | single bond | H | c-Pr(1-$CH_2OMe$) | Me | Me | $CH_2OMe$ | O |
| C-14908 | Me(S) | single bond | H | c-Pr(1-$CH_2OMe$) | Me | Me | $CH_2OMe$ | O |
| C-14909 | H | single bond | Me | c-Pr(1-$CH_2CN$) | Me | Cl | $CH_2OMe$ | O |
| C-14910 | Me | single bond | H | c-Pr(1-$CH_2CN$) | Me | Cl | $CH_2OMe$ | O |
| C-14911 | Me(R) | single bond | H | c-Pr(1-$CH_2CN$) | Me | Cl | $CH_2OMe$ | O |
| C-14912 | Me(S) | single bond | H | c-Pr(1-$CH_2CN$) | Me | Cl | $CH_2OMe$ | O |
| C-14913 | H | single bond | Me | c-Pr(1-$CH_2CN$) | Me | Me | $CH_2OMe$ | O |

TABLE 567-continued

| Compound Number | Y | W | Z | $R^1$ | $R^2$ | $R^3$ | $R^{10}$ | A |
|---|---|---|---|---|---|---|---|---|
| C-14914 | Me | single bond | H | c-Pr(1-$CH_2$CN) | Me | Me | $CH_2$OMe | O |
| C-14915 | Me(R) | single bond | H | c-Pr(1-$CH_2$CN) | Me | Me | $CH_2$OMe | O |
| C-14916 | Me(S) | single bond | H | c-Pr(1-$CH_2$CN) | Me | Me | $CH_2$OMe | O |
| C-14917 | H | single bond | Me | c-Pr(1-$CH_2$SMe) | Me | Cl | $CH_2$OMe | O |
| C-14918 | Me | single bond | H | c-Pr(1-$CH_2$SMe) | Me | Cl | $CH_2$OMe | O |
| C-14919 | Me(R) | single bond | H | c-Pr(1-$CH_2$SMe) | Me | Cl | $CH_2$OMe | O |
| C-14920 | Me(S) | single bond | H | c-Pr(1-$CH_2$SMe) | Me | Cl | $CH_2$OMe | O |
| C-14921 | H | single bond | Me | c-Pr(1-$CH_2$SMe) | Me | Me | $CH_2$OMe | O |
| C-14922 | Me | single bond | H | c-Pr(1-$CH_2$SMe) | Me | Me | $CH_2$OMe | O |
| C-14923 | Me(R) | single bond | H | c-Pr(1-$CH_2$SMe) | Me | Me | $CH_2$OMe | O |
| C-14924 | Me(S) | single bond | H | c-Pr(1-$CH_2$SMe) | Me | Me | $CH_2$OMe | O |
| C-14925 | H | single bond | Me | c-Pr[1-$CH_2$S(=O)Me] | Me | Cl | $CH_2$OMe | O |
| C-14926 | Me | single bond | H | c-Pr[1-$CH_2$S(=O)Me] | Me | Cl | $CH_2$OMe | O |
| C-14927 | Me(R) | single bond | H | c-Pr[1-$CH_2$S(=O)Me] | Me | Cl | $CH_2$OMe | O |
| C-14928 | Me(S) | single bond | H | c-Pr[1-$CH_2$S(=O)Me] | Me | Cl | $CH_2$OMe | O |
| C-14929 | H | single bond | Me | c-Pr[1-$CH_2$S(=O)Me] | Me | Me | $CH_2$OMe | O |
| C-14930 | Me | single bond | H | c-Pr[1-$CH_2$S(=O)Me] | Me | Me | $CH_2$OMe | O |
| C-14931 | Me(R) | single bond | H | c-Pr[1-$CH_2$S(=O)Me] | Me | Me | $CH_2$OMe | O |
| C-14932 | Me(S) | single bond | H | c-Pr[1-$CH_2$S(=O)Me] | Me | Me | $CH_2$OMe | O |
| C-14933 | H | single bond | Me | c-Pr[1-$CH_2$S(=O)$_2$Me] | Me | Cl | $CH_2$OMe | O |
| C-14934 | Me | single bond | H | c-Pr[1-$CH_2$S(=O)$_2$Me] | Me | Cl | $CH_2$OMe | O |

TABLE 568

| Compound Number | Y | W | Z | $R^1$ | $R^2$ | $R^3$ | $R^{10}$ | A |
|---|---|---|---|---|---|---|---|---|
| C-14935 | Me(R) | single bond | H | c-Pr[1-$CH_2$S(=O)$_2$Me] | Me | Cl | $CH_2$OMe | O |
| C-14936 | Me(S) | single bond | H | c-Pr[1-$CH_2$S(=O)$_2$Me] | Me | Cl | $CH_2$OMe | O |
| C-14937 | H | single bond | Me | c-Pr[1-$CH_2$S(=O)$_2$Me] | Me | Me | $CH_2$OMe | O |
| C-14938 | Me | single bond | H | c-Pr[1-$CH_2$S(=O)$_2$Me] | Me | Me | $CH_2$OMe | O |
| C-14939 | Me(R) | single bond | H | c-Pr[1-$CH_2$S(=O)$_2$Me] | Me | Me | $CH_2$OMe | O |
| C-14940 | Me(S) | single bond | H | c-Pr[1-$CH_2$S(=O)$_2$Me] | Me | Me | $CH_2$OMe | O |
| C-14941 | H | single bond | Me | c-Pr(1-$CH_2$F) | Me | Cl | $CH_2$OMe | O |
| C-14942 | Me | single bond | H | c-Pr(1-$CH_2$F) | Me | Cl | $CH_2$OMe | O |
| C-14943 | Me(R) | single bond | H | c-Pr(1-$CH_2$F) | Me | Cl | $CH_2$OMe | O |
| C-14944 | Me(S) | single bond | H | c-Pr(1-$CH_2$F) | Me | Cl | $CH_2$OMe | O |
| C-14945 | H | single bond | Me | c-Pr(1-$CH_2$F) | Me | Me | $CH_2$OMe | O |
| C-14946 | Me | single bond | H | c-Pr(1-$CH_2$F) | Me | Me | $CH_2$OMe | O |
| C-14947 | Me(R) | single bond | H | c-Pr(1-$CH_2$F) | Me | Me | $CH_2$OMe | O |
| C-14948 | Me(S) | single bond | H | c-Pr(1-$CH_2$F) | Me | Me | $CH_2$OMe | O |
| C-14949 | H | single bond | Me | c-Pr(1-$CHF_2$) | Me | Cl | $CH_2$OMe | O |
| C-14950 | Me | single bond | H | c-Pr(1-$CHF_2$) | Me | Cl | $CH_2$OMe | O |
| C-14951 | Me(R) | single bond | H | c-Pr(1-$CHF_2$) | Me | Cl | $CH_2$OMe | O |
| C-14952 | Me(S) | single bond | H | c-Pr(1-$CHF_2$) | Me | Cl | $CH_2$OMe | O |
| C-14953 | H | single bond | Me | c-Pr(1-$CHF_2$) | Me | Me | $CH_2$OMe | O |
| C-14954 | Me | single bond | H | c-Pr(1-$CHF_2$) | Me | Me | $CH_2$OMe | O |
| C-14955 | Me(R) | single bond | H | c-Pr(1-$CHF_2$) | Me | Me | $CH_2$OMe | O |
| C-14956 | Me(S) | single bond | H | c-Pr(1-$CHF_2$) | Me | Me | $CH_2$OMe | O |
| C-14957 | H | single bond | Me | c-Pr(1-$CF_3$) | Me | Cl | $CH_2$OMe | O |
| C-14958 | Me | single bond | H | c-Pr(1-$CF_3$) | Me | Cl | $CH_2$OMe | O |
| C-14959 | Me(R) | single bond | H | c-Pr(1-$CF_3$) | Me | Cl | $CH_2$OMe | O |
| C-14960 | Me(S) | single bond | H | c-Pr(1-$CF_3$) | Me | Cl | $CH_2$OMe | O |
| C-14961 | H | single bond | Me | c-Pr(1-$CF_3$) | Me | Me | $CH_2$OMe | O |
| C-14962 | Me | single bond | H | c-Pr(1-$CF_3$) | Me | Me | $CH_2$OMe | O |
| C-14963 | Me(R) | single bond | H | c-Pr(1-$CF_3$) | Me | Me | $CH_2$OMe | O |
| C-14964 | Me(S) | single bond | H | c-Pr(1-$CF_3$) | Me | Me | $CH_2$OMe | O |
| C-14965 | H | single bond | Me | c-Pr(1-C≡CH) | Me | Cl | $CH_2$OMe | O |
| C-14966 | Me | single bond | H | c-Pr(1-C≡CH) | Me | Cl | $CH_2$OMe | O |
| C-14967 | Me(R) | single bond | H | c-Pr(1-C≡CH) | Me | Cl | $CH_2$OMe | O |
| C-14968 | Me(S) | single bond | H | c-Pr(1-C≡CH) | Me | Cl | $CH_2$OMe | O |
| C-14969 | H | single bond | Me | c-Pr(1-C≡CH) | Me | Me | $CH_2$OMe | O |
| C-14970 | Me | single bond | H | c-Pr(1-C≡CH) | Me | Me | $CH_2$OMe | O |
| C-14971 | Me(R) | single bond | H | c-Pr(1-C≡CH) | Me | Me | $CH_2$OMe | O |
| C-14972 | Me(S) | single bond | H | c-Pr(1-C≡CH) | Me | Me | $CH_2$OMe | O |
| C-14973 | H | single bond | Me | c-Pr[1-C(=O)OEt] | Me | Cl | $CH_2$OMe | O |
| C-14974 | Me | single bond | H | c-Pr[1-C(=O)OEt] | Me | Cl | $CH_2$OMe | O |
| C-14975 | Me(R) | single bond | H | c-Pr[1-C(=O)OEt] | Me | Cl | $CH_2$OMe | O |
| C-14976 | Me(S) | single bond | H | c-Pr[1-C(=O)OEt] | Me | Cl | $CH_2$OMe | O |
| C-14977 | H | single bond | Me | c-Pr[1-C(=O)OEt] | Me | Me | $CH_2$OMe | O |
| C-14978 | Me | single bond | H | c-Pr[1-C(=O)OEt] | Me | Me | $CH_2$OMe | O |

TABLE 569

| Compound Number | Y | W | Z | $R^1$ | $R^2$ | $R^3$ | $R^{10}$ | A |
|---|---|---|---|---|---|---|---|---|
| C-14979 | Me(R) | single bond | H | c-Pr[1-C(=O)OEt] | Me | Me | $CH_2OMe$ | O |
| C-14980 | Me(S) | single bond | H | c-Pr[1-C(=O)OEt] | Me | Me | $CH_2OMe$ | O |
| C-14981 | H | single bond | Me | c-Pr[1-C(=O)OH] | Me | Cl | $CH_2OMe$ | O |
| C-14982 | Me | single bond | H | c-Pr[1-C(=O)OH] | Me | Cl | $CH_2OMe$ | O |
| C-14983 | Me(R) | single bond | H | c-Pr[1-C(=O)OH] | Me | Cl | $CH_2OMe$ | O |
| C-14984 | Me(S) | single bond | H | c-Pr[1-C(=O)OH] | Me | Cl | $CH_2OMe$ | O |
| C-14985 | H | single bond | Me | c-Pr[1-C(=O)OH] | Me | Me | $CH_2OMe$ | O |
| C-14986 | Me | single bond | H | c-Pr[1-C(=O)OH] | Me | Me | $CH_2OMe$ | O |
| C-14987 | Me(R) | single bond | H | c-Pr[1-C(=O)OH] | Me | Me | $CH_2OMe$ | O |
| C-14988 | Me(S) | single bond | H | c-Pr[1-C(=O)OH] | Me | Me | $CH_2OMe$ | O |
| C-14989 | H | single bond | Me | c-Pr[1-C(=O)$NH_2$] | Me | Cl | $CH_2OMe$ | O |
| C-14990 | Me | single bond | H | c-Pr[1-C(=O)$NH_2$] | Me | Cl | $CH_2OMe$ | O |
| C-14991 | Me(R) | single bond | H | c-Pr[1-C(=O)$NH_2$] | Me | Cl | $CH_2OMe$ | O |
| C-14992 | Me(S) | single bond | H | c-Pr[1-C(=O)$NH_2$] | Me | Cl | $CH_2OMe$ | O |
| C-14993 | H | single bond | Me | c-Pr[1-C(=O)$NH_2$] | Me | Me | $CH_2OMe$ | O |
| C-14994 | Me | single bond | H | c-Pr[1-C(=O)$NH_2$] | Me | Me | $CH_2OMe$ | O |
| C-14995 | Me(R) | single bond | H | c-Pr[1-C(=O)$NH_2$] | Me | Me | $CH_2OMe$ | O |
| C-14996 | Me(S) | single bond | H | c-Pr[1-C(=O)$NH_2$] | Me | Me | $CH_2OMe$ | O |
| C-14997 | H | single bond | Me | c-Pr(1-OMe) | Me | Cl | $CH_2OMe$ | O |
| C-14998 | Me | single bond | H | c-Pr(1-OMe) | Me | Cl | $CH_2OMe$ | O |
| C-14999 | Me(R) | single bond | H | c-Pr(1-OMe) | Me | Cl | $CH_2OMe$ | O |
| C-15000 | Me(S) | single bond | H | c-Pr(1-OMe) | Me | Cl | $CH_2OMe$ | O |
| C-15001 | H | single bond | Me | c-Pr(1-OMe) | Me | Me | $CH_2OMe$ | O |
| C-15002 | Me | single bond | H | c-Pr(1-OMe) | Me | Me | $CH_2OMe$ | O |
| C-15003 | Me(R) | single bond | H | c-Pr(1-OMe) | Me | Me | $CH_2OMe$ | O |
| C-15004 | Me(S) | single bond | H | c-Pr(1-OMe) | Me | Me | $CH_2OMe$ | O |
| C-15005 | H | single bond | Me | c-Pr(1-SMe) | Me | Cl | $CH_2OMe$ | O |
| C-15006 | Me | single bond | H | c-Pr(1-SMe) | Me | Cl | $CH_2OMe$ | O |
| C-15007 | Me(R) | single bond | H | c-Pr(1-SMe) | Me | Cl | $CH_2OMe$ | O |
| C-15008 | Me(S) | single bond | H | c-Pr(1-SMe) | Me | Cl | $CH_2OMe$ | O |
| C-15009 | H | single bond | Me | c-Pr(1-SMe) | Me | Me | $CH_2OMe$ | O |
| C-15010 | Me | single bond | H | c-Pr(1-SMe) | Me | Me | $CH_2OMe$ | O |
| C-15011 | Me(R) | single bond | H | c-Pr(1-SMe) | Me | Me | $CH_2OMe$ | O |
| C-15012 | Me(S) | single bond | H | c-Pr(1-SMe) | Me | Me | $CH_2OMe$ | O |
| C-15013 | H | single bond | Me | c-Pr[1-S(=O)Me] | Me | Cl | $CH_2OMe$ | O |
| C-15014 | Me | single bond | H | c-Pr[1-S(=O)Me] | Me | Cl | $CH_2OMe$ | O |
| C-15015 | Me(R) | single bond | H | c-Pr[1-S(=O)Me] | Me | Cl | $CH_2OMe$ | O |
| C-15016 | Me(S) | single bond | H | c-Pr[1-S(=O)Me] | Me | Cl | $CH_2OMe$ | O |
| C-15017 | H | single bond | Me | c-Pr[1-S(=O)Me] | Me | Me | $CH_2OMe$ | O |
| C-15018 | Me | single bond | H | c-Pr[1-S(=O)Me] | Me | Me | $CH_2OMe$ | O |
| C-15019 | Me(R) | single bond | H | c-Pr[1-S(=O)Me] | Me | Me | $CH_2OMe$ | O |
| C-15020 | Me(S) | single bond | H | c-Pr[1-S(=O)Me] | Me | Me | $CH_2OMe$ | O |
| C-15021 | H | single bond | Me | c-Pr[1-S(=O)$_2$Me] | Me | Cl | $CH_2OMe$ | O |
| C-15022 | Me | single bond | H | c-Pr[1-S(=O)$_2$Me] | Me | Cl | $CH_2OMe$ | O |

TABLE 570

| Compound Number | Y | W | Z | $R^1$ | $R^2$ | $R^3$ | $R^{10}$ | A |
|---|---|---|---|---|---|---|---|---|
| C-15023 | Me(R) | single bond | H | c-Pr[1-S(=O)$_2$Me] | Me | Cl | $CH_2OMe$ | O |
| C-15024 | Me(S) | single bond | H | c-Pr[1-S(=O)$_2$Me] | Me | Cl | $CH_2OMe$ | O |
| C-15025 | H | single bond | Me | c-Pr[1-S(=O)$_2$Me] | Me | Me | $CH_2OMe$ | O |
| C-15026 | Me | single bond | H | c-Pr[1-S(=O)$_2$Me] | Me | Me | $CH_2OMe$ | O |
| C-15027 | Me(R) | single bond | H | c-Pr[1-S(=O)$_2$Me] | Me | Me | $CH_2OMe$ | O |
| C-15028 | Me(S) | single bond | H | c-Pr[1-S(=O)$_2$Me] | Me | Me | $CH_2OMe$ | O |
| C-15029 | H | single bond | Me | c-Pr[1-S(=O)$_2$$CHF_2$] | Me | Cl | $CH_2OMe$ | O |
| C-15030 | Me | single bond | H | c-Pr[1-S(=O)$_2$$CHF_2$] | Me | Cl | $CH_2OMe$ | O |
| C-15031 | Me(R) | single bond | H | c-Pr[1-S(=O)$_2$$CHF_2$] | Me | Cl | $CH_2OMe$ | O |
| C-15032 | Me(S) | single bond | H | c-Pr[1-S(=O)$_2$$CHF_2$] | Me | Cl | $CH_2OMe$ | O |
| C-15033 | H | single bond | Me | c-Pr[1-S(=O)$_2$$CHF_2$] | Me | Me | $CH_2OMe$ | O |
| C-15034 | Me | single bond | H | c-Pr[1-S(=O)$_2$$CHF_2$] | Me | Me | $CH_2OMe$ | O |
| C-15035 | Me(R) | single bond | H | c-Pr[1-S(=O)$_2$$CHF_2$] | Me | Me | $CH_2OMe$ | O |
| C-15036 | Me(S) | single bond | H | c-Pr[1-S(=O)$_2$$CHF_2$] | Me | Me | $CH_2OMe$ | O |
| C-15037 | H | single bond | Me | c-Pr[1-S(=O)$_2$CF3] | Me | Cl | $CH_2OMe$ | O |
| C-15038 | Me | single bond | H | c-Pr[1-S(=O)$_2$CF3] | Me | Cl | $CH_2OMe$ | O |
| C-15039 | Me(R) | single bond | H | c-Pr[1-S(=O)$_2$CF3] | Me | Cl | $CH_2OMe$ | O |
| C-15040 | Me(S) | single bond | H | c-Pr[1-S(=O)$_2$CF3] | Me | Cl | $CH_2OMe$ | O |
| C-15041 | H | single bond | Me | c-Pr[1-S(=O)$_2$CF3] | Me | Me | $CH_2OMe$ | O |
| C-15042 | Me | single bond | H | c-Pr[1-S(=O)$_2$CF3] | Me | Me | $CH_2OMe$ | O |
| C-15043 | Me(R) | single bond | H | c-Pr[1-S(=O)$_2$CF3] | Me | Me | $CH_2OMe$ | O |

TABLE 570-continued

| Compound Number | Y | W | Z | $R^1$ | $R^2$ | $R^3$ | $R^{10}$ | A |
|---|---|---|---|---|---|---|---|---|
| C-15044 | Me(S) | single bond | H | c-Pr[1-S(=O)$_2$CF3] | Me | Me | $CH_2OMe$ | O |
| C-15045 | H | single bond | Me | c-Pr[1-(5,6-dihydro-1,4,2-dioxazin-3-yl)] | Me | Cl | $CH_2OMe$ | O |
| C-15046 | Me | single bond | H | c-Pr[1-(5,6-dihydro-1,4,2-dioxazin-3-yl)] | Me | Cl | $CH_2OMe$ | O |
| C-15047 | Me(R) | single bond | H | c-Pr[1-(5,6-dihydro-1,4,2-dioxazin-3-yl)] | Me | Cl | $CH_2OMe$ | O |
| C-15048 | Me(S) | single bond | H | c-Pr[1-(5,6-dihydro-1,4,2-dioxazin-3-yl)] | Me | Cl | $CH_2OMe$ | O |
| C-15049 | H | single bond | Me | c-Pr[1-(5,6-dihydro-1,4,2-dioxazin-3-yl)] | Me | Me | $CH_2OMe$ | O |
| C-15050 | Me | single bond | H | c-Pr[1-(5,6-dihydro-1,4,2-dioxazin-3-yl)] | Me | Me | $CH_2OMe$ | O |
| C-15051 | Me(R) | single bond | H | c-Pr[1-(5,6-dihydro-1,4,2-dioxazin-3-yl)] | Me | Me | $CH_2OMe$ | O |
| C-15052 | Me(S) | single bond | H | c-Pr[1-(5,6-dihydro-1,4,2-dioxazin-3-yl)] | Me | Me | $CH_2OMe$ | O |
| C-15053 | H | single bond | Me | c-Pr[1-(5-hydroxy-1,3,4-oxadiazol-2-yl)] | Me | Cl | $CH_2OMe$ | O |
| C-15054 | Me | single bond | H | c-Pr[1-(5-hydroxy-1,3,4-oxadiazol-2-yl)] | Me | Cl | $CH_2OMe$ | O |
| C-15055 | Me(R) | single bond | H | c-Pr[1-(5-hydroxy-1,3,4-oxadiazol-2-yl)] | Me | Cl | $CH_2OMe$ | O |
| C-15056 | Me(S) | single bond | H | c-Pr[1-(5-hydroxy-1,3,4-oxadiazol-2-yl)] | Me | Cl | $CH_2OMe$ | O |
| C-15057 | H | single bond | Me | c-Pr[1-(5-hydroxy-1,3,4-oxadiazol-2-yl)] | Me | Me | $CH_2OMe$ | O |
| C-15058 | Me | single bond | H | c-Pr[1-(5-hydroxy-1,3,4-oxadiazol-2-yl)] | Me | Me | $CH_2OMe$ | O |
| C-15059 | Me(R) | single bond | H | c-Pr[1-(5-hydroxy-1,3,4-oxadiazol-2-yl)] | Me | Me | $CH_2OMe$ | O |
| C-15060 | Me(S) | single bond | H | c-Pr[1-(5-hydroxy-1,3,4-oxadiazol-2-yl)] | Me | Me | $CH_2OMe$ | O |
| C-15061 | H | single bond | Me | c-Pr[1-(pyrimidin-2-yl)] | Me | Cl | $CH_2OMe$ | O |
| C-15062 | Me | single bond | H | c-Pr[1-(pyrimidin-2-yl)] | Me | Cl | $CH_2OMe$ | O |
| C-15063 | Me(R) | single bond | H | c-Pr[1-(pyrimidin-2-yl)] | Me | Cl | $CH_2OMe$ | O |
| C-15064 | Me(S) | single bond | H | c-Pr[1-(pyrimidin-2-yl)] | Me | Cl | $CH_2OMe$ | O |
| C-15065 | H | single bond | Me | c-Pr[1-(pyrimidin-2-yl)] | Me | Me | $CH_2OMe$ | O |
| C-15066 | Me | single bond | H | c-Pr[1-(pyrimidin-2-yl)] | Me | Me | $CH_2OMe$ | O |

TABLE 571

| Compound Number | Y | W | Z | $R^1$ | $R^2$ | $R^3$ | $R^{10}$ | A |
|---|---|---|---|---|---|---|---|---|
| C-15067 | Me(R) | single bond | H | c-Pr[1-(pyrimidin-2-yl)] | Me | Me | $CH_2OMe$ | O |
| C-15068 | Me(S) | single bond | H | c-Pr[1-(pyrimidin-2-yl)] | Me | Me | $CH_2OMe$ | O |
| C-15069 | H | single bond | Me | t-Bu | Me | Cl | $CH_2OMe$ | O |
| C-15070 | Me | single bond | H | t-Bu | Me | Cl | $CH_2OMe$ | O |
| C-15071 | Me(R) | single bond | H | t-Bu | Me | Cl | $CH_2OMe$ | O |
| C-15072 | Me(S) | single bond | H | t-Bu | Me | Cl | $CH_2OMe$ | O |
| C-15073 | H | single bond | Me | t-Bu | Me | Me | $CH_2OMe$ | O |
| C-15074 | Me | single bond | H | t-Bu | Me | Me | $CH_2OMe$ | O |
| C-15075 | Me(R) | single bond | H | t-Bu | Me | Me | $CH_2OMe$ | O |
| C-15076 | Me(S) | single bond | H | t-Bu | Me | Me | $CH_2OMe$ | O |
| C-15077 | H | single bond | Me | c-Bu | Me | Cl | $CH_2OMe$ | O |
| C-15078 | Me | single bond | H | c-Bu | Me | Cl | $CH_2OMe$ | O |
| C-15079 | Me(R) | single bond | H | c-Bu | Me | Cl | $CH_2OMe$ | O |
| C-15080 | Me(S) | single bond | H | c-Bu | Me | Cl | $CH_2OMe$ | O |
| C-15081 | H | single bond | Me | c-Bu | Me | Me | $CH_2OMe$ | O |
| C-15082 | Me | single bond | H | c-Bu | Me | Me | $CH_2OMe$ | O |
| C-15083 | Me(R) | single bond | H | c-Bu | Me | Me | $CH_2OMe$ | O |
| C-15084 | Me(S) | single bond | H | c-Bu | Me | Me | $CH_2OMe$ | O |
| C-15085 | H | single bond | Me | c-Bu(1-CN) | Me | Cl | $CH_2OMe$ | O |
| C-15086 | Me | single bond | H | c-Bu(1-CN) | Me | Cl | $CH_2OMe$ | O |
| C-15087 | Me(R) | single bond | H | c-Bu(1-CN) | Me | Cl | $CH_2OMe$ | O |
| C-15088 | Me(S) | single bond | H | c-Bu(1-CN) | Me | Cl | $CH_2OMe$ | O |
| C-15089 | H | single bond | Me | c-Bu(1-CN) | Me | Me | $CH_2OMe$ | O |
| C-15090 | Me | single bond | H | c-Bu(1-CN) | Me | Me | $CH_2OMe$ | O |
| C-15091 | Me(R) | single bond | H | c-Bu(1-CN) | Me | Me | $CH_2OMe$ | O |
| C-15092 | Me(S) | single bond | H | c-Bu(1-CN) | Me | Me | $CH_2OMe$ | O |
| C-15093 | H | single bond | Me | c-Bu(3,3-$F_2$) | Me | Cl | $CH_2OMe$ | O |
| C-15094 | Me | single bond | H | c-Bu(3,3-$F_2$) | Me | Cl | $CH_2OMe$ | O |
| C-15095 | Me(R) | single bond | H | c-Bu(3,3-$F_2$) | Me | Cl | $CH_2OMe$ | O |
| C-15096 | Me(S) | single bond | H | c-Bu(3,3-$F_2$) | Me | Cl | $CH_2OMe$ | O |
| C-15097 | H | single bond | Me | c-Bu(3,3-$F_2$) | Me | Me | $CH_2OMe$ | O |
| C-15098 | Me | single bond | H | c-Bu(3,3-$F_2$) | Me | Me | $CH_2OMe$ | O |
| C-15099 | Me(R) | single bond | H | c-Bu(3,3-$F_2$) | Me | Me | $CH_2OMe$ | O |
| C-15100 | Me(S) | single bond | H | c-Bu(3,3-$F_2$) | Me | Me | $CH_2OMe$ | O |
| C-15101 | H | single bond | Me | oxetan-3-yl | Me | Cl | $CH_2OMe$ | O |
| C-15102 | Me | single bond | H | oxetan-3-yl | Me | Cl | $CH_2OMe$ | O |
| C-15103 | Me(R) | single bond | H | oxetan-3-yl | Me | Cl | $CH_2OMe$ | O |
| C-15104 | Me(S) | single bond | H | oxetan-3-yl | Me | Cl | $CH_2OMe$ | O |
| C-15105 | H | single bond | Me | oxetan-3-yl | Me | Me | $CH_2OMe$ | O |
| C-15106 | Me | single bond | H | oxetan-3-yl | Me | Me | $CH_2OMe$ | O |
| C-15107 | Me(R) | single bond | H | oxetan-3-yl | Me | Me | $CH_2OMe$ | O |
| C-15108 | Me(S) | single bond | H | oxetan-3-yl | Me | Me | $CH_2OMe$ | O |

TABLE 571-continued

| Compound Number | Y | W | Z | $R^1$ | $R^2$ | $R^3$ | $R^{10}$ | A |
|---|---|---|---|---|---|---|---|---|
| C-15109 | H | single bond | Me | oxetan(3-CN)-3-yl | Me | Cl | $CH_2OMe$ | O |
| C-15110 | Me | single bond | H | oxetan(3-CN)-3-yl | Me | Cl | $CH_2OMe$ | O |

TABLE 572

| Compound Number | Y | W | Z | $R^1$ | $R^2$ | $R^3$ | $R^{10}$ | A |
|---|---|---|---|---|---|---|---|---|
| C-15111 | Me(R) | single bond | H | oxetan(3-CN)-3-yl | Me | Cl | $CH_2OMe$ | O |
| C-15112 | Me(S) | single bond | H | oxetan(3-CN)-3-yl | Me | Cl | $CH_2OMe$ | O |
| C-15113 | H | single bond | Me | oxetan(3-CN)-3-yl | Me | Me | $CH_2OMe$ | O |
| C-15114 | Me | single bond | H | oxetan(3-CN)-3-yl | Me | Me | $CH_2OMe$ | O |
| C-15115 | Me(R) | single bond | H | oxetan(3-CN)-3-yl | Me | Me | $CH_2OMe$ | O |
| C-15116 | Me(S) | single bond | H | oxetan(3-CN)-3-yl | Me | Me | $CH_2OMe$ | O |
| C-15117 | H | single bond | Me | azetidin[1-C(═O)Me]-3-yl | Me | Cl | $CH_2OMe$ | O |
| C-15118 | Me | single bond | H | azetidin[1-C(═O)Me]-3-yl | Me | Cl | $CH_2OMe$ | O |
| C-15119 | Me(R) | single bond | H | azetidin[1-C(═O)Me]-3-yl | Me | Cl | $CH_2OMe$ | O |
| C-15120 | Me(S) | single bond | H | azetidin[1-C(═O)Me]-3-yl | Me | Cl | $CH_2OMe$ | O |
| C-15121 | H | single bond | Me | azetidin[1-C(═O)Me]-3-yl | Me | Me | $CH_2OMe$ | O |
| C-15122 | Me | single bond | H | azetidin[1-C(═O)Me]-3-yl | Me | Me | $CH_2OMe$ | O |
| C-15123 | Me(R) | single bond | H | azetidin[1-C(═O)Me]-3-yl | Me | Me | $CH_2OMe$ | O |
| C-15124 | Me(S) | single bond | H | azetidin[1-C(═O)Me]-3-yl | Me | Me | $CH_2OMe$ | O |
| C-15125 | H | single bond | Me | azetidin[1-S(═O)$_2$Me]-3-yl | Me | Cl | $CH_2OMe$ | O |
| C-15126 | Me | single bond | H | azetidin[1-S(═O)$_2$Me]-3-yl | Me | Cl | $CH_2OMe$ | O |
| C-15127 | Me(R) | single bond | H | azetidin[1-S(═O)$_2$Me]-3-yl | Me | Cl | $CH_2OMe$ | O |
| C-15128 | Me(S) | single bond | H | azetidin[1-S(═O)$_2$Me]-3-yl | Me | Cl | $CH_2OMe$ | O |
| C-15129 | H | single bond | Me | azetidin[1-S(═O)$_2$Me]-3-yl | Me | Me | $CH_2OMe$ | O |
| C-15130 | Me | single bond | H | azetidin[1-S(═O)$_2$Me]-3-yl | Me | Me | $CH_2OMe$ | O |
| C-15131 | Me(R) | single bond | H | azetidin[1-S(═O)$_2$Me]-3-yl | Me | Me | $CH_2OMe$ | O |
| C-15132 | Me(S) | single bond | H | azetidin[1-S(═O)$_2$Me]-3-yl | Me | Me | $CH_2OMe$ | O |
| C-15133 | H | single bond | Me | azetidin[1-S(═O)$_2$CHF$_2$]-3-yl | Me | Cl | $CH_2OMe$ | O |
| C-15134 | Me | single bond | H | azetidin[1-S(═O)$_2$CHF$_2$]-3-yl | Me | Cl | $CH_2OMe$ | O |
| C-15135 | Me(R) | single bond | H | azetidin[1-S(═O)$_2$CHF$_2$]-3-yl | Me | Cl | $CH_2OMe$ | O |
| C-15136 | Me(S) | single bond | H | azetidin[1-S(═O)$_2$CHF$_2$]-3-yl | Me | Cl | $CH_2OMe$ | O |
| C-15137 | H | single bond | Me | azetidin[1-S(═O)$_2$CHF$_2$]-3-yl | Me | Me | $CH_2OMe$ | O |
| C-15138 | Me | single bond | H | azetidin[1-S(═O)$_2$CHF$_2$]-3-yl | Me | Me | $CH_2OMe$ | O |
| C-15139 | Me(R) | single bond | H | azetidin[1-S(═O)$_2$CHF$_2$]-3-yl | Me | Me | $CH_2OMe$ | O |
| C-15140 | Me(S) | single bond | H | azetidin[1-S(═O)$_2$CHF$_2$]-3-yl | Me | Me | $CH_2OMe$ | O |
| C-15141 | H | single bond | Me | c-Pen | Me | Cl | $CH_2OMe$ | O |
| C-15142 | Me | single bond | H | c-Pen | Me | Cl | $CH_2OMe$ | O |
| C-15143 | Me(R) | single bond | H | c-Pen | Me | Cl | $CH_2OMe$ | O |
| C-15144 | Me(S) | single bond | H | c-Pen | Me | Cl | $CH_2OMe$ | O |
| C-15145 | H | single bond | Me | c-Pen | Me | Me | $CH_2OMe$ | O |
| C-15146 | Me | single bond | H | c-Pen | Me | Me | $CH_2OMe$ | O |
| C-15147 | Me(R) | single bond | H | c-Pen | Me | Me | $CH_2OMe$ | O |
| C-15148 | Me(S) | single bond | H | c-Pen | Me | Me | $CH_2OMe$ | O |
| C-15149 | H | single bond | Me | tetrahydrofuran-3-yl | Me | Cl | $CH_2OMe$ | O |
| C-15150 | Me | single bond | H | tetrahydrofuran-3-yl | Me | Cl | $CH_2OMe$ | O |
| C-15151 | Me(R) | single bond | H | tetrahydrofuran-3-yl | Me | Cl | $CH_2OMe$ | O |
| C-15152 | Me(S) | single bond | H | tetrahydrofuran-3-yl | Me | Cl | $CH_2OMe$ | O |
| C-15153 | H | single bond | Me | tetrahydrofuran-3-yl | Me | Me | $CH_2OMe$ | O |
| C-15154 | Me | single bond | H | tetrahydrofuran-3-yl | Me | Me | $CH_2OMe$ | O |

TABLE 573

| Compound Number | Y | W | Z | $R^1$ | $R^2$ | $R^3$ | $R^{10}$ | A |
|---|---|---|---|---|---|---|---|---|
| C-15155 | Me(R) | single bond | H | tetrahydrofuran-3-yl | Me | Me | $CH_2OMe$ | O |
| C-15156 | Me(S) | single bond | H | tetrahydrofuran-3-yl | Me | Me | $CH_2OMe$ | O |
| C-15157 | H | single bond | Me | tetrahydrothiophen-3-yl | Me | Cl | $CH_2OMe$ | O |
| C-15158 | Me | single bond | H | tetrahydrothiophen-3-yl | Me | Cl | $CH_2OMe$ | O |
| C-15159 | Me(R) | single bond | H | tetrahydrothiophen-3-yl | Me | Cl | $CH_2OMe$ | O |
| C-15160 | Me(S) | single bond | H | tetrahydrothiophen-3-yl | Me | Cl | $CH_2OMe$ | O |
| C-15161 | H | single bond | Me | tetrahydrothiophen-3-yl | Me | Me | $CH_2OMe$ | O |
| C-15162 | Me | single bond | H | tetrahydrothiophen-3-yl | Me | Me | $CH_2OMe$ | O |
| C-15163 | Me(R) | single bond | H | tetrahydrothiophen-3-yl | Me | Me | $CH_2OMe$ | O |
| C-15164 | Me(S) | single bond | H | tetrahydrothiophen-3-yl | Me | Me | $CH_2OMe$ | O |
| C-15165 | H | single bond | Me | c-Pen(1-CN) | Me | Cl | $CH_2OMe$ | O |
| C-15166 | Me | single bond | H | c-Pen(1-CN) | Me | Cl | $CH_2OMe$ | O |

TABLE 573-continued

| Compound Number | Y | W | Z | $R^1$ | $R^2$ | $R^3$ | $R^{10}$ | A |
|---|---|---|---|---|---|---|---|---|
| C-15167 | Me(R) | single bond | H | c-Pen(1-CN) | Me | Cl | $CH_2OMe$ | O |
| C-15168 | Me(S) | single bond | H | c-Pen(1-CN) | Me | Cl | $CH_2OMe$ | O |
| C-15169 | H | single bond | Me | c-Pen(1-CN) | Me | Me | $CH_2OMe$ | O |
| C-15170 | Me | single bond | H | c-Pen(1-CN) | Me | Me | $CH_2OMe$ | O |
| C-15171 | Me(R) | single bond | H | c-Pen(1-CN) | Me | Me | $CH_2OMe$ | O |
| C-15172 | Me(S) | single bond | H | c-Pen(1-CN) | Me | Me | $CH_2OMe$ | O |
| C-15173 | H | single bond | Me | tetrahydrofuran(3-CN)-3-yl | Me | Cl | $CH_2OMe$ | O |
| C-15174 | Me | single bond | H | tetrahydrofuran(3-CN)-3-yl | Me | Cl | $CH_2OMe$ | O |
| C-15175 | Me(R) | single bond | H | tetrahydrofuran(3-CN)-3-yl | Me | Cl | $CH_2OMe$ | O |
| C-15176 | Me(S) | single bond | H | tetrahydrofuran(3-CN)-3-yl | Me | Cl | $CH_2OMe$ | O |
| C-15177 | H | single bond | Me | tetrahydrofuran(3-CN)-3-yl | Me | Me | $CH_2OMe$ | O |
| C-15178 | Me | single bond | H | tetrahydrofuran(3-CN)-3-yl | Me | Me | $CH_2OMe$ | O |
| C-15179 | Me(R) | single bond | H | tetrahydrofuran(3-CN)-3-yl | Me | Me | $CH_2OMe$ | O |
| C-15180 | Me(S) | single bond | H | tetrahydrofuran(3-CN)-3-yl | Me | Me | $CH_2OMe$ | O |
| C-15181 | H | single bond | Me | tetrahydrothiophen(3-CN)-3-yl | Me | Cl | $CH_2OMe$ | O |
| C-15182 | Me | single bond | H | tetrahydrothiophen(3-CN)-3-yl | Me | Cl | $CH_2OMe$ | O |
| C-15183 | Me(R) | single bond | H | tetrahydrothiophen(3-CN)-3-yl | Me | Cl | $CH_2OMe$ | O |
| C-15184 | Me(S) | single bond | H | tetrahydrothiophen(3-CN)-3-yl | Me | Cl | $CH_2OMe$ | O |
| C-15185 | H | single bond | Me | tetrahydrothiophen(3-CN)-3-yl | Me | Me | $CH_2OMe$ | O |
| C-15186 | Me | single bond | H | tetrahydrothiophen(3-CN)-3-yl | Me | Me | $CH_2OMe$ | O |
| C-15187 | Me(R) | single bond | H | tetrahydrothiophen(3-CN)-3-yl | Me | Me | $CH_2OMe$ | O |
| C-15188 | Me(S) | single bond | H | tetrahydrothiophen(3-CN)-3-yl | Me | Me | $CH_2OMe$ | O |
| C-15189 | H | single bond | Me | bicyclo[1.1.1]pentan-1-yl | Me | Cl | $CH_2OMe$ | O |
| C-15190 | Me | single bond | H | bicyclo[1.1.1]pentan-1-yl | Me | Cl | $CH_2OMe$ | O |
| C-15191 | Me(R) | single bond | H | bicyclo[1.1.1]pentan-1-yl | Me | Cl | $CH_2OMe$ | O |
| C-15192 | Me(S) | single bond | H | bicyclo[1.1.1]pentan-1-yl | Me | Cl | $CH_2OMe$ | O |
| C-15193 | H | single bond | Me | bicyclo[1.1.1]pentan-1-yl | Me | Me | $CH_2OMe$ | O |
| C-15194 | Me | single bond | H | bicyclo[1.1.1]pentan-1-yl | Me | Me | $CH_2OMe$ | O |
| C-15195 | Me(R) | single bond | H | bicyclo[1.1.1]pentan-1-yl | Me | Me | $CH_2OMe$ | O |
| C-15196 | Me(S) | single bond | H | bicyclo[1.1.1]pentan-1-yl | Me | Me | $CH_2OMe$ | O |
| C-15197 | H | single bond | Me | c-Hex | Me | Cl | $CH_2OMe$ | O |
| C-15198 | Me | single bond | H | c-Hex | Me | Cl | $CH_2OMe$ | O |

TABLE 574

| Compound Number | Y | W | Z | $R^1$ | $R^2$ | $R^3$ | $R^{10}$ | A |
|---|---|---|---|---|---|---|---|---|
| C-15199 | Me(R) | single bond | H | c-Hex | Me | Cl | $CH_2OMe$ | O |
| C-15200 | Me(S) | single bond | H | c-Hex | Me | Cl | $CH_2OMe$ | O |
| C-15201 | H | single bond | Me | c-Hex | Me | Me | $CH_2OMe$ | O |
| C-15202 | Me | single bond | H | c-Hex | Me | Me | $CH_2OMe$ | O |
| C-15203 | Me(R) | single bond | H | c-Hex | Me | Me | $CH_2OMe$ | O |
| C-15204 | Me(S) | single bond | H | c-Hex | Me | Me | $CH_2OMe$ | O |
| C-15205 | H | single bond | Me | tetrahydropyran-4-yl | Me | Cl | $CH_2OMe$ | O |
| C-15206 | Me | single bond | H | tetrahydropyran-4-yl | Me | Cl | $CH_2OMe$ | O |
| C-15207 | Me(R) | single bond | H | tetrahydropyran-4-yl | Me | Cl | $CH_2OMe$ | O |
| C-15208 | Me(S) | single bond | H | tetrahydropyran-4-yl | Me | Cl | $CH_2OMe$ | O |
| C-15209 | H | single bond | Me | tetrahydropyran-4-yl | Me | Me | $CH_2OMe$ | O |
| C-15210 | Me | single bond | H | tetrahydropyran-4-yl | Me | Me | $CH_2OMe$ | O |
| C-15211 | Me(R) | single bond | H | tetrahydropyran-4-yl | Me | Me | $CH_2OMe$ | O |
| C-15212 | Me(S) | single bond | H | tetrahydropyran-4-yl | Me | Me | $CH_2OMe$ | O |
| C-15213 | H | single bond | Me | tetrahydrothiopyran-4-yl | Me | Cl | $CH_2OMe$ | O |
| C-15214 | Me | single bond | H | tetrahydrothiopyran-4-yl | Me | Cl | $CH_2OMe$ | O |
| C-15215 | Me(R) | single bond | H | tetrahydrothiopyran-4-yl | Me | Cl | $CH_2OMe$ | O |
| C-15216 | Me(S) | single bond | H | tetrahydrothiopyran-4-yl | Me | Cl | $CH_2OMe$ | O |
| C-15217 | H | single bond | Me | tetrahydrothiopyran-4-yl | Me | Me | $CH_2OMe$ | O |
| C-15218 | Me | single bond | H | tetrahydrothiopyran-4-yl | Me | Me | $CH_2OMe$ | O |
| C-15219 | Me(R) | single bond | H | tetrahydrothiopyran-4-yl | Me | Me | $CH_2OMe$ | O |
| C-15220 | Me(S) | single bond | H | tetrahydrothiopyran-4-yl | Me | Me | $CH_2OMe$ | O |
| C-15221 | H | single bond | Me | c-Hex(1-CN) | Me | Cl | $CH_2OMe$ | O |
| C-15222 | Me | single bond | H | c-Hex(1-CN) | Me | Cl | $CH_2OMe$ | O |
| C-15223 | Me(R) | single bond | H | c-Hex(1-CN) | Me | Cl | $CH_2OMe$ | O |
| C-15224 | Me(S) | single bond | H | c-Hex(1-CN) | Me | Cl | $CH_2OMe$ | O |
| C-15225 | H | single bond | Me | c-Hex(1-CN) | Me | Me | $CH_2OMe$ | O |
| C-15226 | Me | single bond | H | c-Hex(1-CN) | Me | Me | $CH_2OMe$ | O |
| C-15227 | Me(R) | single bond | H | c-Hex(1-CN) | Me | Me | $CH_2OMe$ | O |
| C-15228 | Me(S) | single bond | H | c-Hex(1-CN) | Me | Me | $CH_2OMe$ | O |
| C-15229 | H | single bond | Me | tetrahydropyran(4-CN)-4-yl | Me | Cl | $CH_2OMe$ | O |
| C-15230 | Me | single bond | H | tetrahydropyran(4-CN)-4-yl | Me | Cl | $CH_2OMe$ | O |
| C-15231 | Me(R) | single bond | H | tetrahydropyran(4-CN)-4-yl | Me | Cl | $CH_2OMe$ | O |
| C-15232 | Me(S) | single bond | H | tetrahydropyran(4-CN)-4-yl | Me | Cl | $CH_2OMe$ | O |
| C-15233 | H | single bond | Me | tetrahydropyran(4-CN)-4-yl | Me | Me | $CH_2OMe$ | O |

TABLE 574-continued

| Compound Number | Y | W | Z | $R^1$ | $R^2$ | $R^3$ | $R^{10}$ | A |
|---|---|---|---|---|---|---|---|---|
| C-15234 | Me | single bond | H | tetrahydropyran(4-CN)-4-yl | Me | Me | $CH_2OMe$ | O |
| C-15235 | Me(R) | single bond | H | tetrahydropyran(4-CN)-4-yl | Me | Me | $CH_2OMe$ | O |
| C-15236 | Me(S) | single bond | H | tetrahydropyran(4-CN)-4-yl | Me | Me | $CH_2OMe$ | O |
| C-15237 | H | single bond | Me | tetrahydrothiopyran(4-CN)-4-yl | Me | Cl | $CH_2OMe$ | O |
| C-15238 | Me | single bond | H | tetrahydrothiopyran(4-CN)-4-yl | Me | Cl | $CH_2OMe$ | O |
| C-15239 | Me(R) | single bond | H | tetrahydrothiopyran(4-CN)-4-yl | Me | Cl | $CH_2OMe$ | O |
| C-15240 | Me(S) | single bond | H | tetrahydrothiopyran(4-CN)-4-yl | Me | Cl | $CH_2OMe$ | O |
| C-15241 | H | single bond | Me | tetrahydrothiopyran(4-CN)-4-yl | Me | Me | $CH_2OMe$ | O |
| C-15242 | Me | single bond | H | tetrahydrothiopyran(4-CN)-4-yl | Me | Me | $CH_2OMe$ | O |

TABLE 575

| Compound Number | Y | W | Z | $R^1$ | $R^2$ | $R^3$ | $R^{10}$ | A |
|---|---|---|---|---|---|---|---|---|
| C-15243 | Me(R) | single bond | H | tetrahydrothiopyran(4-CN)-4-yl | Me | Me | $CH_2OMe$ | O |
| C-15244 | Me(S) | single bond | H | tetrahydrothiopyran(4-CN)-4-yl | Me | Me | $CH_2OMe$ | O |
| C-15245 | H | single bond | Me | $CH_2$(c-Pr) | Me | Cl | $CH_2OMe$ | O |
| C-15246 | Me | single bond | H | $CH_2$(c-Pr) | Me | Cl | $CH_2OMe$ | O |
| C-15247 | Me(R) | single bond | H | $CH_2$(c-Pr) | Me | Cl | $CH_2OMe$ | O |
| C-15248 | Me(S) | single bond | H | $CH_2$(c-Pr) | Me | Cl | $CH_2OMe$ | O |
| C-15249 | H | single bond | Me | $CH_2$(c-Pr) | Me | Me | $CH_2OMe$ | O |
| C-15250 | Me | single bond | H | $CH_2$(c-Pr) | Me | Me | $CH_2OMe$ | O |
| C-15251 | Me(R) | single bond | H | $CH_2$(c-Pr) | Me | Me | $CH_2OMe$ | O |
| C-15252 | Me(S) | single bond | H | $CH_2$(c-Pr) | Me | Me | $CH_2OMe$ | O |
| C-15253 | H | single bond | Me | $CH_2$[c-Pr(1-CN)] | Me | Cl | $CH_2OMe$ | O |
| C-15254 | Me | single bond | H | $CH_2$[c-Pr(1-CN)] | Me | Cl | $CH_2OMe$ | O |
| C-15255 | Me(R) | single bond | H | $CH_2$[c-Pr(1-CN)] | Me | Cl | $CH_2OMe$ | O |
| C-15256 | Me(S) | single bond | H | $CH_2$[c-Pr(1-CN)] | Me | Cl | $CH_2OMe$ | O |
| C-15257 | H | single bond | Me | $CH_2$[c-Pr(1-CN)] | Me | Me | $CH_2OMe$ | O |
| C-15258 | Me | single bond | H | $CH_2$[c-Pr(1-CN)] | Me | Me | $CH_2OMe$ | O |
| C-15259 | Me(R) | single bond | H | $CH_2$[c-Pr(1-CN)] | Me | Me | $CH_2OMe$ | O |
| C-15260 | Me(S) | single bond | H | $CH_2$[c-Pr(1-CN)] | Me | Me | $CH_2OMe$ | O |
| C-15261 | H | single bond | Me | CH(Me)(c-Pr) | Me | Cl | $CH_2OMe$ | O |
| C-15262 | Me | single bond | H | CH(Me)(c-Pr) | Me | Cl | $CH_2OMe$ | O |
| C-15263 | Me(R) | single bond | H | CH(Me)(c-Pr) | Me | Cl | $CH_2OMe$ | O |
| C-15264 | Me(S) | single bond | H | CH(Me)(c-Pr) | Me | Cl | $CH_2OMe$ | O |
| C-15265 | H | single bond | Me | CH(Me)(c-Pr) | Me | Me | $CH_2OMe$ | O |
| C-15266 | Me | single bond | H | CH(Me)(c-Pr) | Me | Me | $CH_2OMe$ | O |
| C-15267 | Me(R) | single bond | H | CH(Me)(c-Pr) | Me | Me | $CH_2OMe$ | O |
| C-15268 | Me(S) | single bond | H | CH(Me)(c-Pr) | Me | Me | $CH_2OMe$ | O |
| C-15269 | H | single bond | Me | $CH(Me)CH_2OMe$ | Me | Cl | $CH_2OMe$ | O |
| C-15270 | Me | single bond | H | $CH(Me)CH_2OMe$ | Me | Cl | $CH_2OMe$ | O |
| C-15271 | Me(R) | single bond | H | $CH(Me)CH_2OMe$ | Me | Cl | $CH_2OMe$ | O |
| C-15272 | Me(S) | single bond | H | $CH(Me)CH_2OMe$ | Me | Cl | $CH_2OMe$ | O |
| C-15273 | H | single bond | Me | $CH(Me)CH_2OMe$ | Me | Me | $CH_2OMe$ | O |
| C-15274 | Me | single bond | H | $CH(Me)CH_2OMe$ | Me | Me | $CH_2OMe$ | O |
| C-15275 | Me(R) | single bond | H | $CH(Me)CH_2OMe$ | Me | Me | $CH_2OMe$ | O |
| C-15276 | Me(S) | single bond | H | $CH(Me)CH_2OMe$ | Me | Me | $CH_2OMe$ | O |
| C-15277 | H | single bond | Me | $CH_2CH{=}CH_2$ | Me | Cl | $CH_2OMe$ | O |
| C-15278 | Me | single bond | H | $CH_2CH{=}CH_2$ | Me | Cl | $CH_2OMe$ | O |
| C-15279 | Me(R) | single bond | H | $CH_2CH{=}CH_2$ | Me | Cl | $CH_2OMe$ | O |
| C-15280 | Me(S) | single bond | H | $CH_2CH{=}CH_2$ | Me | Cl | $CH_2OMe$ | O |
| C-15281 | H | single bond | Me | $CH_2CH{=}CH_2$ | Me | Me | $CH_2OMe$ | O |
| C-15282 | Me | single bond | H | $CH_2CH{=}CH_2$ | Me | Me | $CH_2OMe$ | O |
| C-15283 | Me(R) | single bond | H | $CH_2CH{=}CH_2$ | Me | Me | $CH_2OMe$ | O |
| C-15284 | Me(S) | single bond | H | $CH_2CH{=}CH_2$ | Me | Me | $CH_2OMe$ | O |
| C-15285 | H | single bond | Me | $CH_2C{\equiv}CH$ | Me | Cl | $CH_2OMe$ | O |
| C-15286 | Me | single bond | H | $CH_2C{\equiv}CH$ | Me | Cl | $CH_2OMe$ | O |

TABLE 576

| Compound Number | Y | W | Z | $R^1$ | $R^2$ | $R^3$ | $R^{10}$ | A |
|---|---|---|---|---|---|---|---|---|
| C-15287 | Me(R) | single bond | H | $CH_2C{\equiv}CH$ | Me | Cl | $CH_2OMe$ | O |
| C-15288 | Me(S) | single bond | H | $CH_2C{\equiv}CH$ | Me | Cl | $CH_2OMe$ | O |
| C-15289 | H | single bond | Me | $CH_2C{\equiv}CH$ | Me | Me | $CH_2OMe$ | O |

TABLE 576-continued

| Compound Number | Y | W | Z | $R^1$ | $R^2$ | $R^3$ | $R^{10}$ | A |
|---|---|---|---|---|---|---|---|---|
| C-15290 | Me | single bond | H | $CH_2C{\equiv}CH$ | Me | Me | $CH_2OMe$ | O |
| C-15291 | Me(R) | single bond | H | $CH_2C{\equiv}CH$ | Me | Me | $CH_2OMe$ | O |
| C-15292 | Me(S) | single bond | H | $CH_2C{\equiv}CH$ | Me | Me | $CH_2OMe$ | O |
| C-15293 | H | single bond | Me | $CH_2CN$ | Me | Cl | $CH_2OMe$ | O |
| C-15294 | Me | single bond | H | $CH_2CN$ | Me | Cl | $CH_2OMe$ | O |
| C-15295 | Me(R) | single bond | H | $CH_2CN$ | Me | Cl | $CH_2OMe$ | O |
| C-15296 | Me(S) | single bond | H | $CH_2CN$ | Me | Cl | $CH_2OMe$ | O |
| C-15297 | H | single bond | Me | $CH_2CN$ | Me | Me | $CH_2OMe$ | O |
| C-15298 | Me | single bond | H | $CH_2CN$ | Me | Me | $CH_2OMe$ | O |
| C-15299 | Me(R) | single bond | H | $CH_2CN$ | Me | Me | $CH_2OMe$ | O |
| C-15300 | Me(S) | single bond | H | $CH_2CN$ | Me | Me | $CH_2OMe$ | O |
| C-15301 | H | single bond | Me | CH(Me)CN | Me | Cl | $CH_2OMe$ | O |
| C-15302 | Me | single bond | H | CH(Me)CN | Me | Cl | $CH_2OMe$ | O |
| C-15303 | Me(R) | single bond | H | CH(Me)CN | Me | Cl | $CH_2OMe$ | O |
| C-15304 | Me(S) | single bond | H | CH(Me)CN | Me | Cl | $CH_2OMe$ | O |
| C-15305 | H | single bond | Me | CH(Me)CN | Me | Me | $CH_2OMe$ | O |
| C-15306 | Me | single bond | H | CH(Me)CN | Me | Me | $CH_2OMe$ | O |
| C-15307 | Me(R) | single bond | H | CH(Me)CN | Me | Me | $CH_2OMe$ | O |
| C-15308 | Me(S) | single bond | H | CH(Me)CN | Me | Me | $CH_2OMe$ | O |
| C-15309 | H | single bond | Me | $C(Me)_2CN$ | Me | Cl | $CH_2OMe$ | O |
| C-15310 | Me | single bond | H | $C(Me)_2CN$ | Me | Cl | $CH_2OMe$ | O |
| C-15311 | Me(R) | single bond | H | $C(Me)_2CN$ | Me | Cl | $CH_2OMe$ | O |
| C-15312 | Me(S) | single bond | H | $C(Me)_2CN$ | Me | Cl | $CH_2OMe$ | O |
| C-15313 | H | single bond | Me | $C(Me)_2CN$ | Me | Me | $CH_2OMe$ | O |
| C-15314 | Me | single bond | H | $C(Me)_2CN$ | Me | Me | $CH_2OMe$ | O |
| C-15315 | Me(R) | single bond | H | $C(Me)_2CN$ | Me | Me | $CH_2OMe$ | O |
| C-15316 | Me(S) | single bond | H | $C(Me)_2CN$ | Me | Me | $CH_2OMe$ | O |
| C-15317 | H | single bond | Me | C(Me)(i-Pr)CN | Me | Cl | $CH_2OMe$ | O |
| C-15318 | Me | single bond | H | C(Me)(i-Pr)CN | Me | Cl | $CH_2OMe$ | O |
| C-15319 | Me(R) | single bond | H | C(Me)(i-Pr)CN | Me | Cl | $CH_2OMe$ | O |
| C-15320 | Me(S) | single bond | H | C(Me)(i-Pr)CN | Me | Cl | $CH_2OMe$ | O |
| C-15321 | H | single bond | Me | C(Me)(i-Pr)CN | Me | Me | $CH_2OMe$ | O |
| C-15322 | Me | single bond | H | C(Me)(i-Pr)CN | Me | Me | $CH_2OMe$ | O |
| C-15323 | Me(R) | single bond | H | C(Me)(i-Pr)CN | Me | Me | $CH_2OMe$ | O |
| C-15324 | Me(S) | single bond | H | C(Me)(i-Pr)CN | Me | Me | $CH_2OMe$ | O |
| C-15325 | H | single bond | Me | OMe | Me | Cl | $CH_2OMe$ | O |
| C-15326 | Me | single bond | H | OMe | Me | Cl | $CH_2OMe$ | O |
| C-15327 | Me(R) | single bond | H | OMe | Me | Cl | $CH_2OMe$ | O |
| C-15328 | Me(S) | single bond | H | OMe | Me | Cl | $CH_2OMe$ | O |
| C-15329 | H | single bond | Me | OMe | Me | Me | $CH_2OMe$ | O |
| C-15330 | Me | single bond | H | OMe | Me | Me | $CH_2OMe$ | O |

TABLE 577

| Compound Number | Y | W | Z | $R^1$ | $R^2$ | $R^3$ | $R^{10}$ | A |
|---|---|---|---|---|---|---|---|---|
| C-15331 | Me(R) | single bond | H | OMe | Me | Me | $CH_2OMe$ | O |
| C-15332 | Me(S) | single bond | H | OMe | Me | Me | $CH_2OMe$ | O |
| C-15333 | H | single bond | Me | CH=NOMe | Me | Cl | $CH_2OMe$ | O |
| C-15334 | Me | single bond | H | CH=NOMe | Me | Cl | $CH_2OMe$ | O |
| C-15335 | Me(R) | single bond | H | CH=NOMe | Me | Cl | $CH_2OMe$ | O |
| C-15336 | Me(S) | single bond | H | CH=NOMe | Me | Cl | $CH_2OMe$ | O |
| C-15337 | H | single bond | Me | CH=NOMe | Me | Me | $CH_2OMe$ | O |
| C-15338 | Me | single bond | H | CH=NOMe | Me | Me | $CH_2OMe$ | O |
| C-15339 | Me(R) | single bond | H | CH=NOMe | Me | Me | $CH_2OMe$ | O |
| C-15340 | Me(S) | single bond | H | CH=NOMe | Me | Me | $CH_2OMe$ | O |
| C-15341 | H | single bond | Me | morpholin-4-yl | Me | Cl | $CH_2OMe$ | O |
| C-15342 | Me | single bond | H | morpholin-4-yl | Me | Cl | $CH_2OMe$ | O |
| C-15343 | Me(R) | single bond | H | morpholin-4-yl | Me | Cl | $CH_2OMe$ | O |
| C-15344 | Me(S) | single bond | H | morpholin-4-yl | Me | Cl | $CH_2OMe$ | O |
| C-15345 | H | single bond | Me | morpholin-4-yl | Me | Me | $CH_2OMe$ | O |
| C-15346 | Me | single bond | H | morpholin-4-yl | Me | Me | $CH_2OMe$ | O |
| C-15347 | Me(R) | single bond | H | morpholin-4-yl | Me | Me | $CH_2OMe$ | O |
| C-15348 | Me(S) | single bond | H | morpholin-4-yl | Me | Me | $CH_2OMe$ | O |
| C-15349 | H | single bond | Me | Ph | Me | Cl | $CH_2OMe$ | O |
| C-15350 | Me | single bond | H | Ph | Me | Cl | $CH_2OMe$ | O |
| C-15351 | Me(R) | single bond | H | Ph | Me | Cl | $CH_2OMe$ | O |
| C-15352 | Me(S) | single bond | H | Ph | Me | Cl | $CH_2OMe$ | O |
| C-15353 | H | single bond | Me | Ph | Me | Me | $CH_2OMe$ | O |
| C-15354 | Me | single bond | H | Ph | Me | Me | $CH_2OMe$ | O |
| C-15355 | Me(R) | single bond | H | Ph | Me | Me | $CH_2OMe$ | O |
| C-15356 | Me(S) | single bond | H | Ph | Me | Me | $CH_2OMe$ | O |

TABLE 577-continued

| Compound Number | Y | W | Z | $R^1$ | $R^2$ | $R^3$ | $R^{10}$ | A |
|---|---|---|---|---|---|---|---|---|
| C-15357 | H | single bond | Me | $CH_2Ph$ | Me | Cl | $CH_2OMe$ | O |
| C-15358 | Me | single bond | H | $CH_2Ph$ | Me | Cl | $CH_2OMe$ | O |
| C-15359 | Me(R) | single bond | H | $CH_2Ph$ | Me | Cl | $CH_2OMe$ | O |
| C-15360 | Me(S) | single bond | H | $CH_2Ph$ | Me | Cl | $CH_2OMe$ | O |
| C-15361 | H | single bond | Me | $CH_2Ph$ | Me | Me | $CH_2OMe$ | O |
| C-15362 | Me | single bond | H | $CH_2Ph$ | Me | Me | $CH_2OMe$ | O |
| C-15363 | Me(R) | single bond | H | $CH_2Ph$ | Me | Me | $CH_2OMe$ | O |
| C-15364 | Me(S) | single bond | H | $CH_2Ph$ | Me | Me | $CH_2OMe$ | O |
| C-15365 | H | single bond | Me | thiazole-2-yl | Me | Cl | $CH_2OMe$ | O |
| C-15366 | Me | single bond | H | thiazole-2-yl | Me | Cl | $CH_2OMe$ | O |
| C-15367 | Me(R) | single bond | H | thiazole-2-yl | Me | Cl | $CH_2OMe$ | O |
| C-15368 | Me(S) | single bond | H | thiazole-2-yl | Me | Cl | $CH_2OMe$ | O |
| C-15369 | H | single bond | Me | thiazole-2-yl | Me | Me | $CH_2OMe$ | O |
| C-15370 | Me | single bond | H | thiazole-2-yl | Me | Me | $CH_2OMe$ | O |
| C-15371 | Me(R) | single bond | H | thiazole-2-yl | Me | Me | $CH_2OMe$ | O |
| C-15372 | Me(S) | single bond | H | thiazole-2-yl | Me | Me | $CH_2OMe$ | O |
| C-15373 | H | single bond | Me | 1-Me-pyrazol-3-yl | Me | Cl | $CH_2OMe$ | O |
| C-15374 | Me | single bond | H | 1-Me-pyrazol-3-yl | Me | Cl | $CH_2OMe$ | O |

TABLE 578

| Compound Number | Y | W | Z | $R^1$ | $R^2$ | $R^3$ | $R^{10}$ | A |
|---|---|---|---|---|---|---|---|---|
| C-15375 | Me(R) | single bond | H | 1-Me-pyrazol-3-yl | Me | Cl | $CH_2OMe$ | O |
| C-15376 | Me(S) | single bond | H | 1-Me-pyrazol-3-yl | Me | Cl | $CH_2OMe$ | O |
| C-15377 | H | single bond | Me | 1-Me-pyrazol-3-yl | Me | Me | $CH_2OMe$ | O |
| C-15378 | Me | single bond | H | 1-Me-pyrazol-3-yl | Me | Me | $CH_2OMe$ | O |
| C-15379 | Me(R) | single bond | H | 1-Me-pyrazol-3-yl | Me | Me | $CH_2OMe$ | O |
| C-15380 | Me(S) | single bond | H | 1-Me-pyrazol-3-yl | Me | Me | $CH_2OMe$ | O |
| C-15381 | H | single bond | Me | 1-Me-pyrazol-5-yl | Me | Cl | $CH_2OMe$ | O |
| C-15382 | Me | single bond | H | 1-Me-pyrazol-5-yl | Me | Cl | $CH_2OMe$ | O |
| C-15383 | Me(R) | single bond | H | 1-Me-pyrazol-5-yl | Me | Cl | $CH_2OMe$ | O |
| C-15384 | Me(S) | single bond | H | 1-Me-pyrazol-5-yl | Me | Cl | $CH_2OMe$ | O |
| C-15385 | H | single bond | Me | 1-Me-pyrazol-5-yl | Me | Me | $CH_2OMe$ | O |
| C-15386 | Me | single bond | H | 1-Me-pyrazol-5-yl | Me | Me | $CH_2OMe$ | O |
| C-15387 | Me(R) | single bond | H | 1-Me-pyrazol-5-yl | Me | Me | $CH_2OMe$ | O |
| C-15388 | Me(S) | single bond | H | 1-Me-pyrazol-5-yl | Me | Me | $CH_2OMe$ | O |
| C-15389 | H | single bond | Me | $CH_2$(pyrimidin-2-yl) | Me | Cl | $CH_2OMe$ | O |
| C-15390 | Me | single bond | H | $CH_2$(pyrimidin-2-yl) | Me | Cl | $CH_2OMe$ | O |
| C-15391 | Me(R) | single bond | H | $CH_2$(pyrimidin-2-yl) | Me | Cl | $CH_2OMe$ | O |
| C-15392 | Me(S) | single bond | H | $CH_2$(pyrimidin-2-yl) | Me | Cl | $CH_2OMe$ | O |
| C-15393 | H | single bond | Me | $CH_2$(pyrimidin-2-yl) | Me | Me | $CH_2OMe$ | O |
| C-15394 | Me | single bond | H | $CH_2$(pyrimidin-2-yl) | Me | Me | $CH_2OMe$ | O |
| C-15395 | Me(R) | single bond | H | $CH_2$(pyrimidin-2-yl) | Me | Me | $CH_2OMe$ | O |
| C-15396 | Me(S) | single bond | H | $CH_2$(pyrimidin-2-yl) | Me | Me | $CH_2OMe$ | O |
| C-15397 | H | single bond | Me | Me | Me | Cl | C(═O)Me | O |
| C-15398 | Me | single bond | H | Me | Me | Cl | C(═O)Me | O |
| C-15399 | Me(R) | single bond | H | Me | Me | Cl | C(═O)Me | O |
| C-15400 | Me(S) | single bond | H | Me | Me | Cl | C(═O)Me | O |
| C-15401 | H | single bond | Me | Me | Me | Me | C(═O)Me | O |
| C-15402 | Me | single bond | H | Me | Me | Me | C(═O)Me | O |
| C-15403 | Me(R) | single bond | H | Me | Me | Me | C(═O)Me | O |
| C-15404 | Me(S) | single bond | H | Me | Me | Me | C(═O)Me | O |
| C-15405 | H | single bond | Me | $CH_2CHF_2$ | Me | Cl | C(═O)Me | O |
| C-15406 | Me | single bond | H | $CH_2CHF_2$ | Me | Cl | C(═O)Me | O |
| C-15407 | Me(R) | single bond | H | $CH_2CHF_2$ | Me | Cl | C(═O)Me | O |
| C-15408 | Me(S) | single bond | H | $CH_2CHF_2$ | Me | Cl | C(═O)Me | O |
| C-15409 | H | single bond | Me | $CH_2CHF_2$ | Me | Me | C(═O)Me | O |
| C-15410 | Me | single bond | H | $CH_2CHF_2$ | Me | Me | C(═O)Me | O |
| C-15411 | Me(R) | single bond | H | $CH_2CHF_2$ | Me | Me | C(═O)Me | O |
| C-15412 | Me(S) | single bond | H | $CH_2CHF_2$ | Me | Me | C(═O)Me | O |
| C-15413 | H | single bond | Me | n-Pr | Me | Cl | C(═O)Me | O |
| C-15414 | Me | single bond | H | n-Pr | Me | Cl | C(═O)Me | O |
| C-15415 | Me(R) | single bond | H | n-Pr | Me | Cl | C(═O)Me | O |
| C-15416 | Me(S) | single bond | H | n-Pr | Me | Cl | C(═O)Me | O |
| C-15417 | H | single bond | Me | n-Pr | Me | Me | C(═O)Me | O |
| C-15418 | Me | single bond | H | n-Pr | Me | Me | C(═O)Me | O |

TABLE 579

| Compound Number | Y | W | Z | $R^1$ | $R^2$ | $R^3$ | $R^{10}$ | A |
|---|---|---|---|---|---|---|---|---|
| C-15419 | Me(R) | single bond | H | n-Pr | Me | Me | C(=O)Me | O |
| C-15420 | Me(S) | single bond | H | n-Pr | Me | Me | C(=O)Me | O |
| C-15421 | H | single bond | Me | i-Pr | Me | Cl | C(=O)Me | O |
| C-15422 | Me | single bond | H | i-Pr | Me | Cl | C(=O)Me | O |
| C-15423 | Me(R) | single bond | H | i-Pr | Me | Cl | C(=O)Me | O |
| C-15424 | Me(S) | single bond | H | i-Pr | Me | Cl | C(=O)Me | O |
| C-15425 | H | single bond | Me | i-Pr | Me | Me | C(=O)Me | O |
| C-15426 | Me | single bond | H | i-Pr | Me | Me | C(=O)Me | O |
| C-15427 | Me(R) | single bond | H | i-Pr | Me | Me | C(=O)Me | O |
| C-15428 | Me(S) | single bond | H | i-Pr | Me | Me | C(=O)Me | O |
| C-15429 | H | single bond | Me | c-Pr(1-F) | Me | Cl | C(=O)Me | O |
| C-15430 | Me | single bond | H | c-Pr(1-F) | Me | Cl | C(=O)Me | O |
| C-15431 | Me(R) | single bond | H | c-Pr(1-F) | Me | Cl | C(=O)Me | O |
| C-15432 | Me(S) | single bond | H | c-Pr(1-F) | Me | Cl | C(=O)Me | O |
| C-15433 | H | single bond | Me | c-Pr(1-F) | Me | Me | C(=O)Me | O |
| C-15434 | Me | single bond | H | c-Pr(1-F) | Me | Me | C(=O)Me | O |
| C-15435 | Me(R) | single bond | H | c-Pr(1-F) | Me | Me | C(=O)Me | O |
| C-15436 | Me(S) | single bond | H | c-Pr(1-F) | Me | Me | C(=O)Me | O |
| C-15437 | H | single bond | Me | c-Pr(2,2-$F_2$) | Me | Cl | C(=O)Me | O |
| C-15438 | Me | single bond | H | c-Pr(2,2-$F_2$) | Me | Cl | C(=O)Me | O |
| C-15439 | Me(R) | single bond | H | c-Pr(2,2-$F_2$) | Me | Cl | C(=O)Me | O |
| C-15440 | Me(S) | single bond | H | c-Pr(2,2-$F_2$) | Me | Cl | C(=O)Me | O |
| C-15441 | H | single bond | Me | c-Pr(2,2-$F_2$) | Me | Me | C(=O)Me | O |
| C-15442 | Me | single bond | H | c-Pr(2,2-$F_2$) | Me | Me | C(=O)Me | O |
| C-15443 | Me(R) | single bond | H | c-Pr(2,2-$F_2$) | Me | Me | C(=O)Me | O |
| C-15444 | Me(S) | single bond | H | c-Pr(2,2-$F_2$) | Me | Me | C(=O)Me | O |
| C-15445 | H | single bond | Me | c-Pr(1-Cl) | Me | Cl | C(=O)Me | O |
| C-15446 | Me | single bond | H | c-Pr(1-Cl) | Me | Cl | C(=O)Me | O |
| C-15447 | Me(R) | single bond | H | c-Pr(1-Cl) | Me | Cl | C(=O)Me | O |
| C-15448 | Me(S) | single bond | H | c-Pr(1-Cl) | Me | Cl | C(=O)Me | O |
| C-15449 | H | single bond | Me | c-Pr(1-Cl) | Me | Me | C(=O)Me | O |
| C-15450 | Me | single bond | H | c-Pr(1-Cl) | Me | Me | C(=O)Me | O |
| C-15451 | Me(R) | single bond | H | c-Pr(1-Cl) | Me | Me | C(=O)Me | O |
| C-15452 | Me(S) | single bond | H | c-Pr(1-Cl) | Me | Me | C(=O)Me | O |
| C-15453 | H | single bond | Me | c-Pr(1-Br) | Me | Cl | C(=O)Me | O |
| C-15454 | Me | single bond | H | c-Pr(1-Br) | Me | Cl | C(=O)Me | O |
| C-15455 | Me(R) | single bond | H | c-Pr(1-Br) | Me | Cl | C(=O)Me | O |
| C-15456 | Me(S) | single bond | H | c-Pr(1-Br) | Me | Cl | C(=O)Me | O |
| C-15457 | H | single bond | Me | c-Pr(1-Br) | Me | Me | C(=O)Me | O |
| C-15458 | Me | single bond | H | c-Pr(1-Br) | Me | Me | C(=O)Me | O |
| C-15459 | Me(R) | single bond | H | c-Pr(1-Br) | Me | Me | C(=O)Me | O |
| C-15460 | Me(S) | single bond | H | c-Pr(1-Br) | Me | Me | C(=O)Me | O |
| C-15461 | H | single bond | Me | c-Pr(1-Me) | Me | Cl | C(=O)Me | O |
| C-15462 | Me | single bond | H | c-Pr(1-Me) | Me | Cl | C(=O)Me | O |

TABLE 580

| Compound Number | Y | W | Z | $R^1$ | $R^2$ | $R^3$ | $R^{10}$ | A |
|---|---|---|---|---|---|---|---|---|
| C-15463 | Me(R) | single bond | H | c-Pr(1-Me) | Me | Cl | C(=O)Me | O |
| C-15464 | Me(S) | single bond | H | c-Pr(1-Me) | Me | Cl | C(=O)Me | O |
| C-15465 | H | single bond | Me | c-Pr(1-Me) | Me | Me | C(=O)Me | O |
| C-15466 | Me | single bond | H | c-Pr(1-Me) | Me | Me | C(=O)Me | O |
| C-15467 | Me(R) | single bond | H | c-Pr(1-Me) | Me | Me | C(=O)Me | O |
| C-15468 | Me(S) | single bond | H | c-Pr(1-Me) | Me | Me | C(=O)Me | O |
| C-15469 | H | single bond | Me | c-Pr(1-$CH_2OH$) | Me | Cl | C(=O)Me | O |
| C-15470 | Me | single bond | H | c-Pr(1-$CH_2OH$) | Me | Cl | C(=O)Me | O |
| C-15471 | Me(R) | single bond | H | c-Pr(1-$CH_2OH$) | Me | Cl | C(=O)Me | O |
| C-15472 | Me(S) | single bond | H | c-Pr(1-$CH_2OH$) | Me | Cl | C(=O)Me | O |
| C-15473 | H | single bond | Me | c-Pr(1-$CH_2OH$) | Me | Me | C(=O)Me | O |
| C-15474 | Me | single bond | H | c-Pr(1-$CH_2OH$) | Me | Me | C(=O)Me | O |
| C-15475 | Me(R) | single bond | H | c-Pr(1-$CH_2OH$) | Me | Me | C(=O)Me | O |
| C-15476 | Me(S) | single bond | H | c-Pr(1-$CH_2OH$) | Me | Me | C(=O)Me | O |
| C-15477 | H | single bond | Me | c-Pr[1-$CH_2OS(=O)_2Me$] | Me | Cl | C(=O)Me | O |
| C-15478 | Me | single bond | H | c-Pr[1-$CH_2OS(=O)_2Me$] | Me | Cl | C(=O)Me | O |
| C-15479 | Me(R) | single bond | H | c-Pr[1-$CH_2OS(=O)_2Me$] | Me | Cl | C(=O)Me | O |
| C-15480 | Me(S) | single bond | H | c-Pr[1-$CH_2OS(=O)_2Me$] | Me | Cl | C(=O)Me | O |
| C-15481 | H | single bond | Me | c-Pr[1-$CH_2OS(=O)_2Me$] | Me | Me | C(=O)Me | O |
| C-15482 | Me | single bond | H | c-Pr[1-$CH_2OS(=O)_2Me$] | Me | Me | C(=O)Me | O |
| C-15483 | Me(R) | single bond | H | c-Pr[1-$CH_2OS(=O)_2Me$] | Me | Me | C(=O)Me | O |
| C-15484 | Me(S) | single bond | H | c-Pr[1-$CH_2OS(=O)_2Me$] | Me | Me | C(=O)Me | O |
| C-15485 | H | single bond | Me | c-Pr(1-$CH_2OMe$) | Me | Cl | C(=O)Me | O |

TABLE 580-continued

| Compound Number | Y | W | Z | $R^1$ | $R^2$ | $R^3$ | $R^{10}$ | A |
|---|---|---|---|---|---|---|---|---|
| C-15486 | Me | single bond | H | c-Pr(1-$CH_2$OMe) | Me | Cl | C(═O)Me | O |
| C-15487 | Me(R) | single bond | H | c-Pr(1-$CH_2$OMe) | Me | Cl | C(═O)Me | O |
| C-15488 | Me(S) | single bond | H | c-Pr(1-$CH_2$OMe) | Me | Cl | C(═O)Me | O |
| C-15489 | H | single bond | Me | c-Pr(1-$CH_2$OMe) | Me | Me | C(═O)Me | O |
| C-15490 | Me | single bond | H | c-Pr(1-$CH_2$OMe) | Me | Me | C(═O)Me | O |
| C-15491 | Me(R) | single bond | H | c-Pr(1-$CH_2$OMe) | Me | Me | C(═O)Me | O |
| C-15492 | Me(S) | single bond | H | c-Pr(1-$CH_2$OMe) | Me | Me | C(═O)Me | O |
| C-15493 | H | single bond | Me | c-Pr(1-$CH_2$CN) | Me | Cl | C(═O)Me | O |
| C-15494 | Me | single bond | H | c-Pr(1-$CH_2$CN) | Me | Cl | C(═O)Me | O |
| C-15495 | Me(R) | single bond | H | c-Pr(1-$CH_2$CN) | Me | Cl | C(═O)Me | O |
| C-15496 | Me(S) | single bond | H | c-Pr(1-$CH_2$CN) | Me | Cl | C(═O)Me | O |
| C-15497 | H | single bond | Me | c-Pr(1-$CH_2$CN) | Me | Me | C(═O)Me | O |
| C-15498 | Me | single bond | H | c-Pr(1-$CH_2$CN) | Me | Me | C(═O)Me | O |
| C-15499 | Me(R) | single bond | H | c-Pr(1-$CH_2$CN) | Me | Me | C(═O)Me | O |
| C-15500 | Me(S) | single bond | H | c-Pr(1-$CH_2$CN) | Me | Me | C(═O)Me | O |
| C-15501 | H | single bond | Me | c-Pr(1-$CH_2$SMe) | Me | Cl | C(═O)Me | O |
| C-15502 | Me | single bond | H | c-Pr(1-$CH_2$SMe) | Me | Cl | C(═O)Me | O |
| C-15503 | Me(R) | single bond | H | c-Pr(1-$CH_2$SMe) | Me | Cl | C(═O)Me | O |
| C-15504 | Me(S) | single bond | H | c-Pr(1-$CH_2$SMe) | Me | Cl | C(═O)Me | O |
| C-15505 | H | single bond | Me | c-Pr(1-$CH_2$SMe) | Me | Me | C(═O)Me | O |
| C-15506 | Me | single bond | H | c-Pr(1-$CH_2$SMe) | Me | Me | C(═O)Me | O |

TABLE 581

| Compound Number | Y | W | Z | $R^1$ | $R^2$ | $R^3$ | $R^{10}$ | A |
|---|---|---|---|---|---|---|---|---|
| C-15507 | Me(R) | single bond | H | c-Pr(1-$CH_2$SMe) | Me | Me | C(═O)Me | O |
| C-15508 | Me(S) | single bond | H | c-Pr(1-$CH_2$SMe) | Me | Me | C(═O)Me | O |
| C-15509 | H | single bond | Me | c-Pr[1-$CH_2$S(═O)Me] | Me | Cl | C(═O)Me | O |
| C-15510 | Me | single bond | H | c-Pr[1-$CH_2$S(═O)Me] | Me | Cl | C(═O)Me | O |
| C-15511 | Me(R) | single bond | H | c-Pr[1-$CH_2$S(═O)Me] | Me | Cl | C(═O)Me | O |
| C-15512 | Me(S) | single bond | H | c-Pr[1-$CH_2$S(═O)Me] | Me | Cl | C(═O)Me | O |
| C-15513 | H | single bond | Me | c-Pr[1-$CH_2$S(═O)Me] | Me | Me | C(═O)Me | O |
| C-15514 | Me | single bond | H | c-Pr[1-$CH_2$S(═O)Me] | Me | Me | C(═O)Me | O |
| C-15515 | Me(R) | single bond | H | c-Pr[1-$CH_2$S(═O)Me] | Me | Me | C(═O)Me | O |
| C-15516 | Me(S) | single bond | H | c-Pr[1-$CH_2$S(═O)Me] | Me | Me | C(═O)Me | O |
| C-15517 | H | single bond | Me | c-Pr[1-$CH_2$S(═O)$_2$Me] | Me | Cl | C(═O)Me | O |
| C-15518 | Me | single bond | H | c-Pr[1-$CH_2$S(═O)$_2$Me] | Me | Cl | C(═O)Me | O |
| C-15519 | Me(R) | single bond | H | c-Pr[1-$CH_2$S(═O)$_2$Me] | Me | Cl | C(═O)Me | O |
| C-15520 | Me(S) | single bond | H | c-Pr[1-$CH_2$S(═O)$_2$Me] | Me | Cl | C(═O)Me | O |
| C-15521 | H | single bond | Me | c-Pr[1-$CH_2$S(═O)$_2$Me] | Me | Me | C(═O)Me | O |
| C-15522 | Me | single bond | H | c-Pr[1-$CH_2$S(═O)$_2$Me] | Me | Me | C(═O)Me | O |
| C-15523 | Me(R) | single bond | H | c-Pr[1-$CH_2$S(═O)$_2$Me] | Me | Me | C(═O)Me | O |
| C-15524 | Me(S) | single bond | H | c-Pr[1-$CH_2$S(═O)$_2$Me] | Me | Me | C(═O)Me | O |
| C-15525 | H | single bond | Me | c-Pr(1-$CH_2$F) | Me | Cl | C(═O)Me | O |
| C-15526 | Me | single bond | H | c-Pr(1-$CH_2$F) | Me | Cl | C(═O)Me | O |
| C-15527 | Me(R) | single bond | H | c-Pr(1-$CH_2$F) | Me | Cl | C(═O)Me | O |
| C-15528 | Me(S) | single bond | H | c-Pr(1-$CH_2$F) | Me | Cl | C(═O)Me | O |
| C-15529 | H | single bond | Me | c-Pr(1-$CH_2$F) | Me | Me | C(═O)Me | O |
| C-15530 | Me | single bond | H | c-Pr(1-$CH_2$F) | Me | Me | C(═O)Me | O |
| C-15531 | Me(R) | single bond | H | c-Pr(1-$CH_2$F) | Me | Me | C(═O)Me | O |
| C-15532 | Me(S) | single bond | H | c-Pr(1-$CH_2$F) | Me | Me | C(═O)Me | O |
| C-15533 | H | single bond | Me | c-Pr(1-$CHF_2$) | Me | Cl | C(═O)Me | O |
| C-15534 | Me | single bond | H | c-Pr(1-$CHF_2$) | Me | Cl | C(═O)Me | O |
| C-15535 | Me(R) | single bond | H | c-Pr(1-$CHF_2$) | Me | Cl | C(═O)Me | O |
| C-15536 | Me(S) | single bond | H | c-Pr(1-$CHF_2$) | Me | Cl | C(═O)Me | O |
| C-15537 | H | single bond | Me | c-Pr(1-$CHF_2$) | Me | Me | C(═O)Me | O |
| C-15538 | Me | single bond | H | c-Pr(1-$CHF_2$) | Me | Me | C(═O)Me | O |
| C-15539 | Me(R) | single bond | H | c-Pr(1-$CHF_2$) | Me | Me | C(═O)Me | O |
| C-15540 | Me(S) | single bond | H | c-Pr(1-$CHF_2$) | Me | Me | C(═O)Me | O |
| C-15541 | H | single bond | Me | c-Pr(1-$CF_3$) | Me | Cl | C(═O)Me | O |
| C-15542 | Me | single bond | H | c-Pr(1-$CF_3$) | Me | Cl | C(═O)Me | O |
| C-15543 | Me(R) | single bond | H | c-Pr(1-$CF_3$) | Me | Cl | C(═O)Me | O |
| C-15544 | Me(S) | single bond | H | c-Pr(1-$CF_3$) | Me | Cl | C(═O)Me | O |
| C-15545 | H | single bond | Me | c-Pr(1-$CF_3$) | Me | Me | C(═O)Me | O |
| C-15546 | Me | single bond | H | c-Pr(1-$CF_3$) | Me | Me | C(═O)Me | O |
| C-15547 | Me(R) | single bond | H | c-Pr(1-$CF_3$) | Me | Me | C(═O)Me | O |
| C-15548 | Me(S) | single bond | H | c-Pr(1-$CF_3$) | Me | Me | C(═O)Me | O |
| C-15549 | H | single bond | Me | c-Pr(1-C≡CH) | Me | Cl | C(═O)Me | O |
| C-15550 | Me | single bond | H | c-Pr(1-C≡CH) | Me | Cl | C(═O)Me | O |

TABLE 582

| Compound Number | Y | W | Z | $R^1$ | $R^2$ | $R^3$ | $R^{10}$ | A |
|---|---|---|---|---|---|---|---|---|
| C-15551 | Me(R) | single bond | H | c-Pr(1-C≡CH) | Me | Cl | C(=O)Me | O |
| C-15552 | Me(S) | single bond | H | c-Pr(1-C≡CH) | Me | Cl | C(=O)Me | O |
| C-15553 | H | single bond | Me | c-Pr(1-C≡CH) | Me | Me | C(=O)Me | O |
| C-15554 | Me | single bond | H | c-Pr(1-C≡CH) | Me | Me | C(=O)Me | O |
| C-15555 | Me(R) | single bond | H | c-Pr(1-C≡CH) | Me | Me | C(=O)Me | O |
| C-15556 | Me(S) | single bond | H | c-Pr(1-C≡CH) | Me | Me | C(=O)Me | O |
| C-15557 | H | single bond | Me | c-Pr[1-C(=O)OEt] | Me | Cl | C(=O)Me | O |
| C-15558 | Me | single bond | H | c-Pr[1-C(=O)OEt] | Me | Cl | C(=O)Me | O |
| C-15559 | Me(R) | single bond | H | c-Pr[1-C(=O)OEt] | Me | Cl | C(=O)Me | O |
| C-15560 | Me(S) | single bond | H | c-Pr[1-C(=O)OEt] | Me | Cl | C(=O)Me | O |
| C-15561 | H | single bond | Me | c-Pr[1-C(=O)OEt] | Me | Me | C(=O)Me | O |
| C-15562 | Me | single bond | H | c-Pr[1-C(=O)OEt] | Me | Me | C(=O)Me | O |
| C-15563 | Me(R) | single bond | H | c-Pr[1-C(=O)OEt] | Me | Me | C(=O)Me | O |
| C-15564 | Me(S) | single bond | H | c-Pr[1-C(=O)OEt] | Me | Me | C(=O)Me | O |
| C-15565 | H | single bond | Me | c-Pr[1-C(=O)OH] | Me | Cl | C(=O)Me | O |
| C-15566 | Me | single bond | H | c-Pr[1-C(=O)OH] | Me | Cl | C(=O)Me | O |
| C-15567 | Me(R) | single bond | H | c-Pr[1-C(=O)OH] | Me | Cl | C(=O)Me | O |
| C-15568 | Me(S) | single bond | H | c-Pr[1-C(=O)OH] | Me | Cl | C(=O)Me | O |
| C-15569 | H | single bond | Me | c-Pr[1-C(=O)OH] | Me | Me | C(=O)Me | O |
| C-15570 | Me | single bond | H | c-Pr[1-C(=O)OH] | Me | Me | C(=O)Me | O |
| C-15571 | Me(R) | single bond | H | c-Pr[1-C(=O)OH] | Me | Me | C(=O)Me | O |
| C-15572 | Me(S) | single bond | H | c-Pr[1-C(=O)OH] | Me | Me | C(=O)Me | O |
| C-15573 | H | single bond | Me | c-Pr[1-C(=O)$NH_2$] | Me | Cl | C(=O)Me | O |
| C-15574 | Me | single bond | H | c-Pr[1-C(=O)$NH_2$] | Me | Cl | C(=O)Me | O |
| C-15575 | Me(R) | single bond | H | c-Pr[1-C(=O)$NH_2$] | Me | Cl | C(=O)Me | O |
| C-15576 | Me(S) | single bond | H | c-Pr[1-C(=O)$NH_2$] | Me | Cl | C(=O)Me | O |
| C-15577 | H | single bond | Me | c-Pr[1-C(=O)$NH_2$] | Me | Me | C(=O)Me | O |
| C-15578 | Me | single bond | H | c-Pr[1-C(=O)$NH_2$] | Me | Me | C(=O)Me | O |
| C-15579 | Me(R) | single bond | H | c-Pr[1-C(=O)$NH_2$] | Me | Me | C(=O)Me | O |
| C-15580 | Me(S) | single bond | H | c-Pr[1-C(=O)$NH_2$] | Me | Me | C(=O)Me | O |
| C-15581 | H | single bond | Me | c-Pr(1-OMe) | Me | Cl | C(=O)Me | O |
| C-15582 | Me | single bond | H | c-Pr(1-OMe) | Me | Cl | C(=O)Me | O |
| C-15583 | Me(R) | single bond | H | c-Pr(1-OMe) | Me | Cl | C(=O)Me | O |
| C-15584 | Me(S) | single bond | H | c-Pr(1-OMe) | Me | Cl | C(=O)Me | O |
| C-15585 | H | single bond | Me | c-Pr(1-OMe) | Me | Me | C(=O)Me | O |
| C-15586 | Me | single bond | H | c-Pr(1-OMe) | Me | Me | C(=O)Me | O |
| C-15587 | Me(R) | single bond | H | c-Pr(1-OMe) | Me | Me | C(=O)Me | O |
| C-15588 | Me(S) | single bond | H | c-Pr(1-OMe) | Me | Me | C(=O)Me | O |
| C-15589 | H | single bond | Me | c-Pr(1-SMe) | Me | Cl | C(=O)Me | O |
| C-15590 | Me | single bond | H | c-Pr(1-SMe) | Me | Cl | C(=O)Me | O |
| C-15591 | Me(R) | single bond | H | c-Pr(1-SMe) | Me | Cl | C(=O)Me | O |
| C-15592 | Me(S) | single bond | H | c-Pr(1-SMe) | Me | Cl | C(=O)Me | O |
| C-15593 | H | single bond | Me | c-Pr(1-SMe) | Me | Me | C(=O)Me | O |
| C-15594 | Me | single bond | H | c-Pr(1-SMe) | Me | Me | C(=O)Me | O |

TABLE 583

| Compound Number | Y | W | Z | $R^1$ | $R^2$ | $R^3$ | $R^{10}$ | A |
|---|---|---|---|---|---|---|---|---|
| C-15595 | Me(R) | single bond | H | c-Pr(1-SMe) | Me | Me | C(=O)Me | O |
| C-15596 | Me(S) | single bond | H | c-Pr(1-SMe) | Me | Me | C(=O)Me | O |
| C-15597 | H | single bond | Me | c-Pr[1-S(=O)Me] | Me | Cl | C(=O)Me | O |
| C-15598 | Me | single bond | H | c-Pr[1-S(=O)Me] | Me | Cl | C(=O)Me | O |
| C-15599 | Me(R) | single bond | H | c-Pr[1-S(=O)Me] | Me | Cl | C(=O)Me | O |
| C-15600 | Me(S) | single bond | H | c-Pr[1-S(=O)Me] | Me | Cl | C(=O)Me | O |
| C-15601 | H | single bond | Me | c-Pr[1-S(=O)Me] | Me | Me | C(=O)Me | O |
| C-15602 | Me | single bond | H | c-Pr[1-S(=O)Me] | Me | Me | C(=O)Me | O |
| C-15603 | Me(R) | single bond | H | c-Pr[1-S(=O)Me] | Me | Me | C(=O)Me | O |
| C-15604 | Me(S) | single bond | H | c-Pr[1-S(=O)Me] | Me | Me | C(=O)Me | O |
| C-15605 | H | single bond | Me | c-Pr[1-S(=O)$_2$Me] | Me | Cl | C(=O)Me | O |
| C-15606 | Me | single bond | H | c-Pr[1-S(=O)$_2$Me] | Me | Cl | C(=O)Me | O |
| C-15607 | Me(R) | single bond | H | c-Pr[1-S(=O)$_2$Me] | Me | Cl | C(=O)Me | O |
| C-15608 | Me(S) | single bond | H | c-Pr[1-S(=O)$_2$Me] | Me | Cl | C(=O)Me | O |
| C-15609 | H | single bond | Me | c-Pr[1-S(=O)$_2$Me] | Me | Me | C(=O)Me | O |
| C-15610 | Me | single bond | H | c-Pr[1-S(=O)$_2$Me] | Me | Me | C(=O)Me | O |
| C-15611 | Me(R) | single bond | H | c-Pr[1-S(=O)$_2$Me] | Me | Me | C(=O)Me | O |
| C-15612 | Me(S) | single bond | H | c-Pr[1-S(=O)$_2$Me] | Me | Me | C(=O)Me | O |
| C-15613 | H | single bond | Me | c-Pr[1-S(=O)$_2$$CHF_2$] | Me | Cl | C(=O)Me | O |
| C-15614 | Me | single bond | H | c-Pr[1-S(=O)$_2$$CHF_2$] | Me | Cl | C(=O)Me | O |
| C-15615 | Me(R) | single bond | H | c-Pr[1-S(=O)$_2$$CHF_2$] | Me | Cl | C(=O)Me | O |

TABLE 583-continued

| Compound Number | Y | W | Z | $R^1$ | $R^2$ | $R^3$ | $R^{10}$ | A |
|---|---|---|---|---|---|---|---|---|
| C-15616 | Me(S) | single bond | H | c-Pr[1-S(=O)$_2$CHF$_2$] | Me | Cl | C(=O)Me | O |
| C-15617 | H | single bond | Me | c-Pr[1-S(=O)$_2$CHF$_2$] | Me | Me | C(=O)Me | O |
| C-15618 | Me | single bond | H | c-Pr[1-S(=O)$_2$CHF$_2$] | Me | Me | C(=O)Me | O |
| C-15619 | Me(R) | single bond | H | c-Pr[1-S(=O)$_2$CHF$_2$] | Me | Me | C(=O)Me | O |
| C-15620 | Me(S) | single bond | H | c-Pr[1-S(=O)$_2$CHF$_2$] | Me | Me | C(=O)Me | O |
| C-15621 | H | single bond | Me | c-Pr[1-S(=O)$_2$CF$_3$] | Me | Cl | C(=O)Me | O |
| C-15622 | Me | single bond | H | c-Pr[1-S(=O)$_2$CF$_3$] | Me | Cl | C(=O)Me | O |
| C-15623 | Me(R) | single bond | H | c-Pr[1-S(=O)$_2$CF$_3$] | Me | Cl | C(=O)Me | O |
| C-15624 | Me(S) | single bond | H | c-Pr[1-S(=O)$_2$CF$_3$] | Me | Cl | C(=O)Me | O |
| C-15625 | H | single bond | Me | c-Pr[1-S(=O)$_2$CF$_3$] | Me | Me | C(=O)Me | O |
| C-15626 | Me | single bond | H | c-Pr[1-S(=O)$_2$CF$_3$] | Me | Me | C(=O)Me | O |
| C-15627 | Me(R) | single bond | H | c-Pr[1-S(=O)$_2$CF$_3$] | Me | Me | C(=O)Me | O |
| C-15628 | Me(S) | single bond | H | c-Pr[1-S(=O)$_2$CF$_3$] | Me | Me | C(=O)Me | O |
| C-15629 | H | single bond | Me | c-Pr[1-(5,6-dihydro-1,4,2-dioxazin-3-yl)] | Me | Cl | C(=O)Me | O |
| C-15630 | Me | single bond | H | c-Pr[1-(5,6-dihydro-1,4,2-dioxazin-3-yl)] | Me | Cl | C(=O)Me | O |
| C-15631 | Me(R) | single bond | H | c-Pr[1-(5,6-dihydro-1,4,2-dioxazin-3-yl)] | Me | Cl | C(=O)Me | O |
| C-15632 | Me(S) | single bond | H | c-Pr[1-(5,6-dihydro-1,4,2-dioxazin-3-yl)] | Me | Cl | C(=O)Me | O |
| C-15633 | H | single bond | Me | c-Pr[1-(5,6-dihydro-1,4,2-dioxazin-3-yl)] | Me | Me | C(=O)Me | O |
| C-15634 | Me | single bond | H | c-Pr[1-(5,6-dihydro-1,4,2-dioxazin-3-yl)] | Me | Me | C(=O)Me | O |
| C-15635 | Me(R) | single bond | H | c-Pr[1-(5,6-dihydro-1,4,2-dioxazin-3-yl)] | Me | Me | C(=O)Me | O |
| C-15636 | Me(S) | single bond | H | c-Pr[1-(5,6-dihydro-1,4,2-dioxazin-3-yl)] | Me | Me | C(=O)Me | O |
| C-15637 | H | single bond | Me | c-Pr[1-(5-hydroxy-1,3,4-oxadiazol-2-yl)] | Me | Cl | C(=O)Me | O |
| C-15638 | Me | single bond | H | c-Pr[1-(5-hydroxy-1,3,4-oxadiazol-2-yl)] | Me | Cl | C(=O)Me | O |

25

TABLE 584

| Compound Number | Y | W | Z | $R^1$ | $R^2$ | $R^3$ | $R^{10}$ | A |
|---|---|---|---|---|---|---|---|---|
| C-15639 | Me(R) | single bond | H | c-Pr[1-(5-hydroxy-1,3,4-oxadiazol-2-yl)] | Me | Cl | C(=O)Me | O |
| C-15640 | Me(S) | single bond | H | c-Pr[1-(5-hydroxy-1,3,4-oxadiazol-2-yl)] | Me | Cl | C(=O)Me | O |
| C-15641 | H | single bond | Me | c-Pr[1-(5-hydroxy-1,3,4-oxadiazol-2-yl)] | Me | Me | C(=O)Me | O |
| C-15642 | Me | single bond | H | c-Pr[1-(5-hydroxy-1,3,4-oxadiazol-2-yl)] | Me | Me | C(=O)Me | O |
| C-15643 | Me(R) | single bond | H | c-Pr[1-(5-hydroxy-1,3,4-oxadiazol-2-yl)] | Me | Me | C(=O)Me | O |
| C-15644 | Me(S) | single bond | H | c-Pr[1-(5-hydroxy-1,3,4-oxadiazol-2-yl)] | Me | Me | C(=O)Me | O |
| C-15645 | H | single bond | Me | c-Pr[1-(pyrimidin-2-yl)] | Me | Cl | C(=O)Me | O |
| C-15646 | Me | single bond | H | c-Pr[1-(pyrimidin-2-yl)] | Me | Cl | C(=O)Me | O |
| C-15647 | Me(R) | single bond | H | c-Pr[1-(pyrimidin-2-yl)] | Me | Cl | C(=O)Me | O |
| C-15648 | Me(S) | single bond | H | c-Pr[1-(pyrimidin-2-yl)] | Me | Cl | C(=O)Me | O |
| C-15649 | H | single bond | Me | c-Pr[1-(pyrimidin-2-yl)] | Me | Me | C(=O)Me | O |
| C-15650 | Me | single bond | H | c-Pr[1-(pyrimidin-2-yl)] | Me | Me | C(=O)Me | O |
| C-15651 | Me(R) | single bond | H | c-Pr[1-(pyrimidin-2-yl)] | Me | Me | C(=O)Me | O |
| C-15652 | Me(S) | single bond | H | c-Pr[1-(pyrimidin-2-yl)] | Me | Me | C(=O)Me | O |
| C-15653 | H | single bond | Me | t-Bu | Me | Cl | C(=O)Me | O |
| C-15654 | Me | single bond | H | t-Bu | Me | Cl | C(=O)Me | O |
| C-15655 | Me(R) | single bond | H | t-Bu | Me | Cl | C(=O)Me | O |
| C-15656 | Me(S) | single bond | H | t-Bu | Me | Cl | C(=O)Me | O |
| C-15657 | H | single bond | Me | t-Bu | Me | Me | C(=O)Me | O |
| C-15658 | Me | single bond | H | t-Bu | Me | Me | C(=O)Me | O |
| C-15659 | Me(R) | single bond | H | t-Bu | Me | Me | C(=O)Me | O |
| C-15660 | Me(S) | single bond | H | t-Bu | Me | Me | C(=O)Me | O |
| C-15661 | H | single bond | Me | c-Bu | Me | Cl | C(=O)Me | O |
| C-15662 | Me | single bond | H | c-Bu | Me | Cl | C(=O)Me | O |
| C-15663 | Me(R) | single bond | H | c-Bu | Me | Cl | C(=O)Me | O |
| C-15664 | Me(S) | single bond | H | c-Bu | Me | Cl | C(=O)Me | O |
| C-15665 | H | single bond | Me | c-Bu | Me | Me | C(=O)Me | O |
| C-15666 | Me | single bond | H | c-Bu | Me | Me | C(=O)Me | O |
| C-15667 | Me(R) | single bond | H | c-Bu | Me | Me | C(=O)Me | O |
| C-15668 | Me(S) | single bond | H | c-Bu | Me | Me | C(=O)Me | O |
| C-15669 | H | single bond | Me | c-Bu(1-CN) | Me | Cl | C(=O)Me | O |
| C-15670 | Me | single bond | H | c-Bu(1-CN) | Me | Cl | C(=O)Me | O |
| C-15671 | Me(R) | single bond | H | c-Bu(1-CN) | Me | Cl | C(=O)Me | O |
| C-15672 | Me(S) | single bond | H | c-Bu(1-CN) | Me | Cl | C(=O)Me | O |
| C-15673 | H | single bond | Me | c-Bu(1-CN) | Me | Me | C(=O)Me | O |
| C-15674 | Me | single bond | H | c-Bu(1-CN) | Me | Me | C(=O)Me | O |
| C-15675 | Me(R) | single bond | H | c-Bu(1-CN) | Me | Me | C(=O)Me | O |
| C-15676 | Me(S) | single bond | H | c-Bu(1-CN) | Me | Me | C(=O)Me | O |
| C-15677 | H | single bond | Me | c-Bu(3,3-F$_2$) | Me | Cl | C(=O)Me | O |
| C-15678 | Me | single bond | H | c-Bu(3,3-F$_2$) | Me | Cl | C(=O)Me | O |
| C-15679 | Me(R) | single bond | H | c-Bu(3,3-F$_2$) | Me | Cl | C(=O)Me | O |
| C-15680 | Me(S) | single bond | H | c-Bu(3,3-F$_2$) | Me | Cl | C(=O)Me | O |

TABLE 584-continued

| Compound Number | Y | W | Z | $R^1$ | $R^2$ | $R^3$ | $R^{10}$ | A |
|---|---|---|---|---|---|---|---|---|
| C-15681 | H | single bond | Me | c-Bu(3,3-$F_2$) | Me | Me | C(═O)Me | O |
| C-15682 | Me | single bond | H | c-Bu(3,3-$F_2$) | Me | Me | C(═O)Me | O |

TABLE 585

| Compound Number | Y | W | Z | $R^1$ | $R^2$ | $R^3$ | $R^{10}$ | A |
|---|---|---|---|---|---|---|---|---|
| C-15683 | Me(R) | single bond | H | c-Bu(3,3-$F_2$) | Me | Me | C(═O)Me | O |
| C-15684 | Me(S) | single bond | H | c-Bu(3,3-$F_2$) | Me | Me | C(═O)Me | O |
| C-15685 | H | single bond | Me | oxetan-3-yl | Me | Cl | C(═O)Me | O |
| C-15686 | Me | single bond | H | oxetan-3-yl | Me | Cl | C(═O)Me | O |
| C-15687 | Me(R) | single bond | H | oxetan-3-yl | Me | Cl | C(═O)Me | O |
| C-15688 | Me(S) | single bond | H | oxetan-3-yl | Me | Cl | C(═O)Me | O |
| C-15689 | H | single bond | Me | oxetan-3-yl | Me | Me | C(═O)Me | O |
| C-15690 | Me | single bond | H | oxetan-3-yl | Me | Me | C(═O)Me | O |
| C-15691 | Me(R) | single bond | H | oxetan-3-yl | Me | Me | C(═O)Me | O |
| C-15692 | Me(S) | single bond | H | oxetan-3-yl | Me | Me | C(═O)Me | O |
| C-15693 | H | single bond | Me | oxetan(3-CN)-3-yl | Me | Cl | C(═O)Me | O |
| C-15694 | Me | single bond | H | oxetan(3-CN)-3-yl | Me | Cl | C(═O)Me | O |
| C-15695 | Me(R) | single bond | H | oxetan(3-CN)-3-yl | Me | Cl | C(═O)Me | O |
| C-15696 | Me(S) | single bond | H | oxetan(3-CN)-3-yl | Me | Cl | C(═O)Me | O |
| C-15697 | H | single bond | Me | oxetan(3-CN)-3-yl | Me | Me | C(═O)Me | O |
| C-15698 | Me | single bond | H | oxetan(3-CN)-3-yl | Me | Me | C(═O)Me | O |
| C-15699 | Me(R) | single bond | H | oxetan(3-CN)-3-yl | Me | Me | C(═O)Me | O |
| C-15700 | Me(S) | single bond | H | oxetan(3-CN)-3-yl | Me | Me | C(═O)Me | O |
| C-15701 | H | single bond | Me | azetidin[1-C(═O)Me]-3-yl | Me | Cl | C(═O)Me | O |
| C-15702 | Me | single bond | H | azetidin[1-C(═O)Me]-3-yl | Me | Cl | C(═O)Me | O |
| C-15703 | Me(R) | single bond | H | azetidin[1-C(═O)Me]-3-yl | Me | Cl | C(═O)Me | O |
| C-15704 | Me(S) | single bond | H | azetidin[1-C(═O)Me]-3-yl | Me | Cl | C(═O)Me | O |
| C-15705 | H | single bond | Me | azetidin[1-C(═O)Me]-3-yl | Me | Me | C(═O)Me | O |
| C-15706 | Me | single bond | H | azetidin[1-C(═O)Me]-3-yl | Me | Me | C(═O)Me | O |
| C-15707 | Me(R) | single bond | H | azetidin[1-C(═O)Me]-3-yl | Me | Me | C(═O)Me | O |
| C-15708 | Me(S) | single bond | H | azetidin[1-C(═O)Me]-3-yl | Me | Me | C(═O)Me | O |
| C-15709 | H | single bond | Me | azetidin[1-S(═O)$_2$Me]-3-yl | Me | Cl | C(═O)Me | O |
| C-15710 | Me | single bond | H | azetidin[1-S(═O)$_2$Me]-3-yl | Me | Cl | C(═O)Me | O |
| C-15711 | Me(R) | single bond | H | azetidin[1-S(═O)$_2$Me]-3-yl | Me | Cl | C(═O)Me | O |
| C-15712 | Me(S) | single bond | H | azetidin[1-S(═O)$_2$Me]-3-yl | Me | Cl | C(═O)Me | O |
| C-15713 | H | single bond | Me | azetidin[1-S(═O)$_2$Me]-3-yl | Me | Me | C(═O)Me | O |
| C-15714 | Me | single bond | H | azetidin[1-S(═O)$_2$Me]-3-yl | Me | Me | C(═O)Me | O |
| C-15715 | Me(R) | single bond | H | azetidin[1-S(═O)$_2$Me]-3-yl | Me | Me | C(═O)Me | O |
| C-15716 | Me(S) | single bond | H | azetidin[1-S(═O)$_2$Me]-3-yl | Me | Me | C(═O)Me | O |
| C-15717 | H | single bond | Me | azetidin[1-S(═O)$_2$CHF$_2$]-3-yl | Me | Cl | C(═O)Me | O |
| C-15718 | Me | single bond | H | azetidin[1-S(═O)$_2$CHF$_2$]-3-yl | Me | Cl | C(═O)Me | O |
| C-15719 | Me(R) | single bond | H | azetidin[1-S(═O)$_2$CHF$_2$]-3-yl | Me | Cl | C(═O)Me | O |
| C-15720 | Me(S) | single bond | H | azetidin[1-S(═O)$_2$CHF$_2$]-3-yl | Me | Cl | C(═O)Me | O |
| C-15721 | H | single bond | Me | azetidin[1-S(═O)$_2$CHF$_2$]-3-yl | Me | Me | C(═O)Me | O |
| C-15722 | Me | single bond | H | azetidin[1-S(═O)$_2$CHF$_2$]-3-yl | Me | Me | C(═O)Me | O |
| C-15723 | Me(R) | single bond | H | azetidin[1-S(═O)$_2$CHF$_2$]-3-yl | Me | Me | C(═O)Me | O |
| C-15724 | Me(S) | single bond | H | azetidin[1-S(═O)$_2$CHF$_2$]-3-yl | Me | Me | C(═O)Me | O |
| C-15725 | H | single bond | Me | c-Pen | Me | Cl | C(═O)Me | O |
| C-15726 | Me | single bond | H | c-Pen | Me | Cl | C(═O)Me | O |

TABLE 586

| Compound Number | Y | W | Z | $R^1$ | $R^2$ | $R^3$ | $R^{10}$ | A |
|---|---|---|---|---|---|---|---|---|
| C-15727 | Me(R) | single bond | H | c-Pen | Me | Cl | C(═O)Me | O |
| C-15728 | Me(S) | single bond | H | c-Pen | Me | Cl | C(═O)Me | O |
| C-15729 | H | single bond | Me | c-Pen | Me | Me | C(═O)Me | O |
| C-15730 | Me | single bond | H | c-Pen | Me | Me | C(═O)Me | O |
| C-15731 | Me(R) | single bond | H | c-Pen | Me | Me | C(═O)Me | O |
| C-15732 | Me(S) | single bond | H | c-Pen | Me | Me | C(═O)Me | O |
| C-15733 | H | single bond | Me | tetrahydrofuran-3-yl | Me | Cl | C(═O)Me | O |
| C-15734 | Me | single bond | H | tetrahydrofuran-3-yl | Me | Cl | C(═O)Me | O |
| C-15735 | Me(R) | single bond | H | tetrahydrofuran-3-yl | Me | Cl | C(═O)Me | O |
| C-15736 | Me(S) | single bond | H | tetrahydrofuran-3-yl | Me | Cl | C(═O)Me | O |
| C-15737 | H | single bond | Me | tetrahydrofuran-3-yl | Me | Me | C(═O)Me | O |
| C-15738 | Me | single bond | H | tetrahydrofuran-3-yl | Me | Me | C(═O)Me | O |

TABLE 586-continued

| Compound Number | Y | W | Z | $R^1$ | $R^2$ | $R^3$ | $R^{10}$ | A |
|---|---|---|---|---|---|---|---|---|
| C-15739 | Me(R) | single bond | H | tetrahydrofuran-3-yl | Me | Me | C(=O)Me | O |
| C-15740 | Me(S) | single bond | H | tetrahydrofuran-3-yl | Me | Me | C(=O)Me | O |
| C-15741 | H | single bond | Me | tetrahydrothiophen-3-yl | Me | Cl | C(=O)Me | O |
| C-15742 | Me | single bond | H | tetrahydrothiophen-3-yl | Me | Cl | C(=O)Me | O |
| C-15743 | Me(R) | single bond | H | tetrahydrothiophen-3-yl | Me | Cl | C(=O)Me | O |
| C-15744 | Me(S) | single bond | H | tetrahydrothiophen-3-yl | Me | Cl | C(=O)Me | O |
| C-15745 | H | single bond | Me | tetrahydrothiophen-3-yl | Me | Me | C(=O)Me | O |
| C-15746 | Me | single bond | H | tetrahydrothiophen-3-yl | Me | Me | C(=O)Me | O |
| C-15747 | Me(R) | single bond | H | tetrahydrothiophen-3-yl | Me | Me | C(=O)Me | O |
| C-15748 | Me(S) | single bond | H | tetrahydrothiophen-3-yl | Me | Me | C(=O)Me | O |
| C-15749 | H | single bond | Me | c-Pen(1-CN) | Me | Cl | C(=O)Me | O |
| C-15750 | Me | single bond | H | c-Pen(1-CN) | Me | Cl | C(=O)Me | O |
| C-15751 | Me(R) | single bond | H | c-Pen(1-CN) | Me | Cl | C(=O)Me | O |
| C-15752 | Me(S) | single bond | H | c-Pen(1-CN) | Me | Cl | C(=O)Me | O |
| C-15753 | H | single bond | Me | c-Pen(1-CN) | Me | Me | C(=O)Me | O |
| C-15754 | Me | single bond | H | c-Pen(1-CN) | Me | Me | C(=O)Me | O |
| C-15755 | Me(R) | single bond | H | c-Pen(1-CN) | Me | Me | C(=O)Me | O |
| C-15756 | Me(S) | single bond | H | c-Pen(1-CN) | Me | Me | C(=O)Me | O |
| C-15757 | H | single bond | Me | tetrahydrofuran(3-CN)-3-yl | Me | Cl | C(=O)Me | O |
| C-15758 | Me | single bond | H | tetrahydrofuran(3-CN)-3-yl | Me | Cl | C(=O)Me | O |
| C-15759 | Me(R) | single bond | H | tetrahydrofuran(3-CN)-3-yl | Me | Cl | C(=O)Me | O |
| C-15760 | Me(S) | single bond | H | tetrahydrofuran(3-CN)-3-yl | Me | Cl | C(=O)Me | O |
| C-15761 | H | single bond | Me | tetrahydrofuran(3-CN)-3-yl | Me | Me | C(=O)Me | O |
| C-15762 | Me | single bond | H | tetrahydrofuran(3-CN)-3-yl | Me | Me | C(=O)Me | O |
| C-15763 | Me(R) | single bond | H | tetrahydrofuran(3-CN)-3-yl | Me | Me | C(=O)Me | O |
| C-15764 | Me(S) | single bond | H | tetrahydrofuran(3-CN)-3-yl | Me | Me | C(=O)Me | O |
| C-15765 | H | single bond | Me | tetrahydrothiophen(3-CN)-3-yl | Me | Cl | C(=O)Me | O |
| C-15766 | Me | single bond | H | tetrahydrothiophen(3-CN)-3-yl | Me | Cl | C(=O)Me | O |
| C-15767 | Me(R) | single bond | H | tetrahydrothiophen(3-CN)-3-yl | Me | Cl | C(=O)Me | O |
| C-15768 | Me(S) | single bond | H | tetrahydrothiophen(3-CN)-3-yl | Me | Cl | C(=O)Me | O |
| C-15769 | H | single bond | Me | tetrahydrothiophen(3-CN)-3-yl | Me | Me | C(=O)Me | O |
| C-15770 | Me | single bond | H | tetrahydrothiophen(3-CN)-3-yl | Me | Me | C(=O)Me | O |

TABLE 587

| Compound Number | Y | W | Z | $R^1$ | $R^2$ | $R^3$ | $R^{10}$ | A |
|---|---|---|---|---|---|---|---|---|
| C-15771 | Me(R) | single bond | H | tetrahydrothiophen(3-CN)-3-yl | Me | Me | C(=O)Me | O |
| C-15772 | Me(S) | single bond | H | tetrahydrothiophen(3-CN)-3-yl | Me | Me | C(=O)Me | O |
| C-15773 | H | single bond | Me | bicyclo[1.1.1]pentan-1-yl | Me | Cl | C(=O)Me | O |
| C-15774 | Me | single bond | H | bicyclo[1.1.1]pentan-1-yl | Me | Cl | C(=O)Me | O |
| C-15775 | Me(R) | single bond | H | bicyclo[1.1.1]pentan-1-yl | Me | Cl | C(=O)Me | O |
| C-15776 | Me(S) | single bond | H | bicyclo[1.1.1]pentan-1-yl | Me | Cl | C(=O)Me | O |
| C-15777 | H | single bond | Me | bicyclo[1.1.1]pentan-1-yl | Me | Me | C(=O)Me | O |
| C-15778 | Me | single bond | H | bicyclo[1.1.1]pentan-1-yl | Me | Me | C(=O)Me | O |
| C-15779 | Me(R) | single bond | H | bicyclo[1.1.1]pentan-1-yl | Me | Me | C(=O)Me | O |
| C-15780 | Me(S) | single bond | H | bicyclo[1.1.1]pentan-1-yl | Me | Me | C(=O)Me | O |
| C-15781 | H | single bond | Me | c-Hex | Me | Cl | C(=O)Me | O |
| C-15782 | Me | single bond | H | c-Hex | Me | Cl | C(=O)Me | O |
| C-15783 | Me(R) | single bond | H | c-Hex | Me | Cl | C(=O)Me | O |
| C-15784 | Me(S) | single bond | H | c-Hex | Me | Cl | C(=O)Me | O |
| C-15785 | H | single bond | Me | c-Hex | Me | Me | C(=O)Me | O |
| C-15786 | Me | single bond | H | c-Hex | Me | Me | C(=O)Me | O |
| C-15787 | Me(R) | single bond | H | c-Hex | Me | Me | C(=O)Me | O |
| C-15788 | Me(S) | single bond | H | c-Hex | Me | Me | C(=O)Me | O |
| C-15789 | H | single bond | Me | tetrahydropyran-4-yl | Me | Cl | C(=O)Me | O |
| C-15790 | Me | single bond | H | tetrahydropyran-4-yl | Me | Cl | C(=O)Me | O |
| C-15791 | Me(R) | single bond | H | tetrahydropyran-4-yl | Me | Cl | C(=O)Me | O |
| C-15792 | Me(S) | single bond | H | tetrahydropyran-4-yl | Me | Cl | C(=O)Me | O |
| C-15793 | H | single bond | Me | tetrahydropyran-4-yl | Me | Me | C(=O)Me | O |
| C-15794 | Me | single bond | H | tetrahydropyran-4-yl | Me | Me | C(=O)Me | O |
| C-15795 | Me(R) | single bond | H | tetrahydropyran-4-yl | Me | Me | C(=O)Me | O |
| C-15796 | Me(S) | single bond | H | tetrahydropyran-4-yl | Me | Me | C(=O)Me | O |
| C-15797 | H | single bond | Me | tetrahydrothiopyran-4-yl | Me | Cl | C(=O)Me | O |
| C-15798 | Me | single bond | H | tetrahydrothiopyran-4-yl | Me | Cl | C(=O)Me | O |
| C-15799 | Me(R) | single bond | H | tetrahydrothiopyran-4-yl | Me | Cl | C(=O)Me | O |
| C-15800 | Me(S) | single bond | H | tetrahydrothiopyran-4-yl | Me | Cl | C(=O)Me | O |
| C-15801 | H | single bond | Me | tetrahydrothiopyran-4-yl | Me | Me | C(=O)Me | O |
| C-15802 | Me | single bond | H | tetrahydrothiopyran-4-yl | Me | Me | C(=O)Me | O |
| C-15803 | Me(R) | single bond | H | tetrahydrothiopyran-4-yl | Me | Me | C(=O)Me | O |
| C-15804 | Me(S) | single bond | H | tetrahydrothiopyran-4-yl | Me | Me | C(=O)Me | O |
| C-15805 | H | single bond | Me | c-Hex(1-CN) | Me | Cl | C(=O)Me | O |

TABLE 587-continued

| Compound Number | Y | W | Z | $R^1$ | $R^2$ | $R^3$ | $R^{10}$ | A |
|---|---|---|---|---|---|---|---|---|
| C-15806 | Me | single bond | H | c-Hex(1-CN) | Me | Cl | C(=O)Me | O |
| C-15807 | Me(R) | single bond | H | c-Hex(1-CN) | Me | Cl | C(=O)Me | O |
| C-15808 | Me(S) | single bond | H | c-Hex(1-CN) | Me | Cl | C(=O)Me | O |
| C-15809 | H | single bond | Me | c-Hex(1-CN) | Me | Me | C(=O)Me | O |
| C-15810 | Me | single bond | H | c-Hex(1-CN) | Me | Me | C(=O)Me | O |
| C-15811 | Me(R) | single bond | H | c-Hex(1-CN) | Me | Me | C(=O)Me | O |
| C-15812 | Me(S) | single bond | H | c-Hex(1-CN) | Me | Me | C(=O)Me | O |
| C-15813 | H | single bond | Me | tetrahydropyran(4-CN)-4-yl | Me | Cl | C(=O)Me | O |
| C-15814 | Me | single bond | H | tetrahydropyran(4-CN)-4-yl | Me | Cl | C(=O)Me | O |

TABLE 588

| Compound Number | Y | W | Z | $R^1$ | $R^2$ | $R^3$ | $R^{10}$ | A |
|---|---|---|---|---|---|---|---|---|
| C-15815 | Me(R) | single bond | H | tetrahydropyran(4-CN)-4-yl | Me | Cl | C(=O)Me | O |
| C-15816 | Me(S) | single bond | H | tetrahydropyran(4-CN)-4-yl | Me | Cl | C(=O)Me | O |
| C-15817 | H | single bond | Me | tetrahydropyran(4-CN)-4-yl | Me | Me | C(=O)Me | O |
| C-15818 | Me | single bond | H | tetrahydropyran(4-CN)-4-yl | Me | Me | C(=O)Me | O |
| C-15819 | Me(R) | single bond | H | tetrahydropyran(4-CN)-4-yl | Me | Me | C(=O)Me | O |
| C-15820 | Me(S) | single bond | H | tetrahydropyran(4-CN)-4-yl | Me | Me | C(=O)Me | O |
| C-15821 | H | single bond | Me | tetrahydrothiopyran(4-CN)-4-yl | Me | Cl | C(=O)Me | O |
| C-15822 | Me | single bond | H | tetrahydrothiopyran(4-CN)-4-yl | Me | Cl | C(=O)Me | O |
| C-15823 | Me(R) | single bond | H | tetrahydrothiopyran(4-CN)-4-yl | Me | Cl | C(=O)Me | O |
| C-15824 | Me(S) | single bond | H | tetrahydrothiopyran(4-CN)-4-yl | Me | Cl | C(=O)Me | O |
| C-15825 | H | single bond | Me | tetrahydrothiopyran(4-CN)-4-yl | Me | Me | C(=O)Me | O |
| C-15826 | Me | single bond | H | tetrahydrothiopyran(4-CN)-4-yl | Me | Me | C(=O)Me | O |
| C-15827 | Me(R) | single bond | H | tetrahydrothiopyran(4-CN)-4-yl | Me | Me | C(=O)Me | O |
| C-15828 | Me(S) | single bond | H | tetrahydrothiopyran(4-CN)-4-yl | Me | Me | C(=O)Me | O |
| C-15829 | H | single bond | Me | $CH_2$(c-Pr) | Me | Cl | C(=O)Me | O |
| C-15830 | Me | single bond | H | $CH_2$(c-Pr) | Me | Cl | C(=O)Me | O |
| C-15831 | Me(R) | single bond | H | $CH_2$(c-Pr) | Me | Cl | C(=O)Me | O |
| C-15832 | Me(S) | single bond | H | $CH_2$(c-Pr) | Me | Cl | C(=O)Me | O |
| C-15833 | H | single bond | Me | $CH_2$(c-Pr) | Me | Me | C(=O)Me | O |
| C-15834 | Me | single bond | H | $CH_2$(c-Pr) | Me | Me | C(=O)Me | O |
| C-15835 | Me(R) | single bond | H | $CH_2$(c-Pr) | Me | Me | C(=O)Me | O |
| C-15836 | Me(S) | single bond | H | $CH_2$(c-Pr) | Me | Me | C(=O)Me | O |
| C-15837 | H | single bond | Me | $CH_2$[c-Pr(1-CN)] | Me | Cl | C(=O)Me | O |
| C-15838 | Me | single bond | H | $CH_2$[c-Pr(1-CN)] | Me | Cl | C(=O)Me | O |
| C-15839 | Me(R) | single bond | H | $CH_2$[c-Pr(1-CN)] | Me | Cl | C(=O)Me | O |
| C-15840 | Me(S) | single bond | H | $CH_2$[c-Pr(1-CN)] | Me | Cl | C(=O)Me | O |
| C-15841 | H | single bond | Me | $CH_2$[c-Pr(1-CN)] | Me | Me | C(=O)Me | O |
| C-15842 | Me | single bond | H | $CH_2$[c-Pr(1-CN)] | Me | Me | C(=O)Me | O |
| C-15843 | Me(R) | single bond | H | $CH_2$[c-Pr(1-CN)] | Me | Me | C(=O)Me | O |
| C-15844 | Me(S) | single bond | H | $CH_2$[c-Pr(1-CN)] | Me | Me | C(=O)Me | O |
| C-15845 | H | single bond | Me | CH(Me)(c-Pr) | Me | Cl | C(=O)Me | O |
| C-15846 | Me | single bond | H | CH(Me)(c-Pr) | Me | Cl | C(=O)Me | O |
| C-15847 | Me(R) | single bond | H | CH(Me)(c-Pr) | Me | Cl | C(=O)Me | O |
| C-15848 | Me(S) | single bond | H | CH(Me)(c-Pr) | Me | Cl | C(=O)Me | O |
| C-15849 | H | single bond | Me | CH(Me)(c-Pr) | Me | Me | C(=O)Me | O |
| C-15850 | Me | single bond | H | CH(Me)(c-Pr) | Me | Me | C(=O)Me | O |
| C-15851 | Me(R) | single bond | H | CH(Me)(c-Pr) | Me | Me | C(=O)Me | O |
| C-15852 | Me(S) | single bond | H | CH(Me)(c-Pr) | Me | Me | C(=O)Me | O |
| C-15853 | H | single bond | Me | CH(Me)$CH_2$OMe | Me | Cl | C(=O)Me | O |
| C-15854 | Me | single bond | H | CH(Me)$CH_2$OMe | Me | Cl | C(=O)Me | O |
| C-15855 | Me(R) | single bond | H | CH(Me)$CH_2$OMe | Me | Cl | C(=O)Me | O |
| C-15856 | Me(S) | single bond | H | CH(Me)$CH_2$OMe | Me | Cl | C(=O)Me | O |
| C-15857 | H | single bond | Me | CH(Me)$CH_2$OMe | Me | Me | C(=O)Me | O |
| C-15858 | Me | single bond | H | CH(Me)$CH_2$OMe | Me | Me | C(=O)Me | O |

TABLE 589

| Compound Number | Y | W | Z | $R^1$ | $R^2$ | $R^3$ | $R^{10}$ | A |
|---|---|---|---|---|---|---|---|---|
| C-15859 | Me(R) | single bond | H | CH(Me)$CH_2$OMe | Me | Me | C(=O)Me | O |
| C-15860 | Me(S) | single bond | H | CH(Me)$CH_2$OMe | Me | Me | C(=O)Me | O |
| C-15861 | H | single bond | Me | $CH_2CH{=}CH_2$ | Me | Cl | C(=O)Me | O |

TABLE 589-continued

| Compound Number | Y | W | Z | $R^1$ | $R^2$ | $R^3$ | $R^{10}$ | A |
|---|---|---|---|---|---|---|---|---|
| C-15862 | Me | single bond | H | $CH_2CH{=}CH_2$ | Me | Cl | C(=O)Me | O |
| C-15863 | Me(R) | single bond | H | $CH_2CH{=}CH_2$ | Me | Cl | C(=O)Me | O |
| C-15864 | Me(S) | single bond | H | $CH_2CH{=}CH_2$ | Me | Cl | C(=O)Me | O |
| C-15865 | H | single bond | Me | $CH_2CH{=}CH_2$ | Me | Me | C(=O)Me | O |
| C-15866 | Me | single bond | H | $CH_2CH{=}CH_2$ | Me | Me | C(=O)Me | O |
| C-15867 | Me(R) | single bond | H | $CH_2CH{=}CH_2$ | Me | Me | C(=O)Me | O |
| C-15868 | Me(S) | single bond | H | $CH_2CH{=}CH_2$ | Me | Me | C(=O)Me | O |
| C-15869 | H | single bond | Me | $CH_2C{\equiv}CH$ | Me | Cl | C(=O)Me | O |
| C-15870 | Me | single bond | H | $CH_2C{\equiv}CH$ | Me | Cl | C(=O)Me | O |
| C-15871 | Me(R) | single bond | H | $CH_2C{\equiv}CH$ | Me | Cl | C(=O)Me | O |
| C-15872 | Me(S) | single bond | H | $CH_2C{\equiv}CH$ | Me | Cl | C(=O)Me | O |
| C-15873 | H | single bond | Me | $CH_2C{\equiv}CH$ | Me | Me | C(=O)Me | O |
| C-15874 | Me | single bond | H | $CH_2C{\equiv}CH$ | Me | Me | C(=O)Me | O |
| C-15875 | Me(R) | single bond | H | $CH_2C{\equiv}CH$ | Me | Me | C(=O)Me | O |
| C-15876 | Me(S) | single bond | H | $CH_2C{\equiv}CH$ | Me | Me | C(=O)Me | O |
| C-15877 | H | single bond | Me | $CH_2CN$ | Me | Cl | C(=O)Me | O |
| C-15878 | Me | single bond | H | $CH_2CN$ | Me | Cl | C(=O)Me | O |
| C-15879 | Me(R) | single bond | H | $CH_2CN$ | Me | Cl | C(=O)Me | O |
| C-15880 | Me(S) | single bond | H | $CH_2CN$ | Me | Cl | C(=O)Me | O |
| C-15881 | H | single bond | Me | $CH_2CN$ | Me | Me | C(=O)Me | O |
| C-15882 | Me | single bond | H | $CH_2CN$ | Me | Me | C(=O)Me | O |
| C-15883 | Me(R) | single bond | H | $CH_2CN$ | Me | Me | C(=O)Me | O |
| C-15884 | Me(S) | single bond | H | $CH_2CN$ | Me | Me | C(=O)Me | O |
| C-15885 | H | single bond | Me | CH(Me)CN | Me | Cl | C(=O)Me | O |
| C-15886 | Me | single bond | H | CH(Me)CN | Me | Cl | C(=O)Me | O |
| C-15887 | Me(R) | single bond | H | CH(Me)CN | Me | Cl | C(=O)Me | O |
| C-15888 | Me(S) | single bond | H | CH(Me)CN | Me | Cl | C(=O)Me | O |
| C-15889 | H | single bond | Me | CH(Me)CN | Me | Me | C(=O)Me | O |
| C-15890 | Me | single bond | H | CH(Me)CN | Me | Me | C(=O)Me | O |
| C-15891 | Me(R) | single bond | H | CH(Me)CN | Me | Me | C(=O)Me | O |
| C-15892 | Me(S) | single bond | H | CH(Me)CN | Me | Me | C(=O)Me | O |
| C-15893 | H | single bond | Me | $C(Me)_2CN$ | Me | Cl | C(=O)Me | O |
| C-15894 | Me | single bond | H | $C(Me)_2CN$ | Me | Cl | C(=O)Me | O |
| C-15895 | Me(R) | single bond | H | $C(Me)_2CN$ | Me | Cl | C(=O)Me | O |
| C-15896 | Me(S) | single bond | H | $C(Me)_2CN$ | Me | Cl | C(=O)Me | O |
| C-15897 | H | single bond | Me | $C(Me)_2CN$ | Me | Me | C(=O)Me | O |
| C-15898 | Me | single bond | H | $C(Me)_2CN$ | Me | Me | C(=O)Me | O |
| C-15899 | Me(R) | single bond | H | $C(Me)_2CN$ | Me | Me | C(=O)Me | O |
| C-15900 | Me(S) | single bond | H | $C(Me)_2CN$ | Me | Me | C(=O)Me | O |
| C-15901 | H | single bond | Me | C(Me)(i-Pr)CN | Me | Cl | C(=O)Me | O |
| C-15902 | Me | single bond | H | C(Me)(i-Pr)CN | Me | Cl | C(=O)Me | O |

TABLE 590

| Compound Number | Y | W | Z | $R^1$ | $R^2$ | $R^3$ | $R^{10}$ | A |
|---|---|---|---|---|---|---|---|---|
| C-15903 | Me(R) | single bond | H | C(Me)(i-Pr)CN | Me | Cl | C(=O)Me | O |
| C-15904 | Me(S) | single bond | H | C(Me)(i-Pr)CN | Me | Cl | C(=O)Me | O |
| C-15905 | H | single bond | Me | C(Me)(i-Pr)CN | Me | Me | C(=O)Me | O |
| C-15906 | Me | single bond | H | C(Me)(i-Pr)CN | Me | Me | C(=O)Me | O |
| C-15907 | Me(R) | single bond | H | C(Me)(i-Pr)CN | Me | Me | C(=O)Me | O |
| C-15908 | Me(S) | single bond | H | C(Me)(i-Pr)CN | Me | Me | C(=O)Me | O |
| C-15909 | H | single bond | Me | OMe | Me | Cl | C(=O)Me | O |
| C-15910 | Me | single bond | H | OMe | Me | Cl | C(=O)Me | O |
| C-15911 | Me(R) | single bond | H | OMe | Me | Cl | C(=O)Me | O |
| C-15912 | Me(S) | single bond | H | OMe | Me | Cl | C(=O)Me | O |
| C-15913 | H | single bond | Me | OMe | Me | Me | C(=O)Me | O |
| C-15914 | Me | single bond | H | OMe | Me | Me | C(=O)Me | O |
| C-15915 | Me(R) | single bond | H | OMe | Me | Me | C(=O)Me | O |
| C-15916 | Me(S) | single bond | H | OMe | Me | Me | C(=O)Me | O |
| C-15917 | H | single bond | Me | CH=NOMe | Me | Cl | C(=O)Me | O |
| C-15918 | Me | single bond | H | CH=NOMe | Me | Cl | C(=O)Me | O |
| C-15919 | Me(R) | single bond | H | CH=NOMe | Me | Cl | C(=O)Me | O |
| C-15920 | Me(S) | single bond | H | CH=NOMe | Me | Cl | C(=O)Me | O |
| C-15921 | H | single bond | Me | CH=NOMe | Me | Me | C(=O)Me | O |
| C-15922 | Me | single bond | H | CH=NOMe | Me | Me | C(=O)Me | O |
| C-15923 | Me(R) | single bond | H | CH=NOMe | Me | Me | C(=O)Me | O |
| C-15924 | Me(S) | single bond | H | CH=NOMe | Me | Me | C(=O)Me | O |
| C-15925 | H | single bond | Me | morpholin-4-yl | Me | Cl | C(=O)Me | O |
| C-15926 | Me | single bond | H | morpholin-4-yl | Me | Cl | C(=O)Me | O |
| C-15927 | Me(R) | single bond | H | morpholin-4-yl | Me | Cl | C(=O)Me | O |
| C-15928 | Me(S) | single bond | H | morpholin-4-yl | Me | Cl | C(=O)Me | O |

TABLE 590-continued

| Compound Number | Y | W | Z | $R^1$ | $R^2$ | $R^3$ | $R^{10}$ | A |
|---|---|---|---|---|---|---|---|---|
| C-15929 | H | single bond | Me | morpholin-4-yl | Me | Me | C(=O)Me | O |
| C-15930 | Me | single bond | H | morpholin-4-yl | Me | Me | C(=O)Me | O |
| C-15931 | Me(R) | single bond | H | morpholin-4-yl | Me | Me | C(=O)Me | O |
| C-15932 | Me(S) | single bond | H | morpholin-4-yl | Me | Me | C(=O)Me | O |
| C-15933 | H | single bond | Me | Ph | Me | Cl | C(=O)Me | O |
| C-15934 | Me | single bond | H | Ph | Me | Cl | C(=O)Me | O |
| C-15935 | Me(R) | single bond | H | Ph | Me | Cl | C(=O)Me | O |
| C-15936 | Me(S) | single bond | H | Ph | Me | Cl | C(=O)Me | O |
| C-15937 | H | single bond | Me | Ph | Me | Me | C(=O)Me | O |
| C-15938 | Me | single bond | H | Ph | Me | Me | C(=O)Me | O |
| C-15939 | Me(R) | single bond | H | Ph | Me | Me | C(=O)Me | O |
| C-15940 | Me(S) | single bond | H | Ph | Me | Me | C(=O)Me | O |
| C-15941 | H | single bond | Me | $CH_2Ph$ | Me | Cl | C(=O)Me | O |
| C-15942 | Me | single bond | H | $CH_2Ph$ | Me | Cl | C(=O)Me | O |
| C-15943 | Me(R) | single bond | H | $CH_2Ph$ | Me | Cl | C(=O)Me | O |
| C-15944 | Me(S) | single bond | H | $CH_2Ph$ | Me | Cl | C(=O)Me | O |
| C-15945 | H | single bond | Me | $CH_2Ph$ | Me | Me | C(=O)Me | O |
| C-15946 | Me | single bond | H | $CH_2Ph$ | Me | Me | C(=O)Me | O |

TABLE 591

| Compound Number | Y | W | Z | $R^1$ | $R^2$ | $R^3$ | $R^{10}$ | A |
|---|---|---|---|---|---|---|---|---|
| C-15947 | Me(R) | single bond | H | $CH_2Ph$ | Me | Me | C(=O)Me | O |
| C-15948 | Me(S) | single bond | H | $CH_2Ph$ | Me | Me | C(=O)Me | O |
| C-15949 | H | single bond | Me | thiazole-2-yl | Me | Cl | C(=O)Me | O |
| C-15950 | Me | single bond | H | thiazole-2-yl | Me | Cl | C(=O)Me | O |
| C-15951 | Me(R) | single bond | H | thiazole-2-yl | Me | Cl | C(=O)Me | O |
| C-15952 | Me(S) | single bond | H | thiazole-2-yl | Me | Cl | C(=O)Me | O |
| C-15953 | H | single bond | Me | thiazole-2-yl | Me | Me | C(=O)Me | O |
| C-15954 | Me | single bond | H | thiazole-2-yl | Me | Me | C(=O)Me | O |
| C-15955 | Me(R) | single bond | H | thiazole-2-yl | Me | Me | C(=O)Me | O |
| C-15956 | Me(S) | single bond | H | thiazole-2-yl | Me | Me | C(=O)Me | O |
| C-15957 | H | single bond | Me | 1-Me-pyrazol-3-yl | Me | Cl | C(=O)Me | O |
| C-15958 | Me | single bond | H | 1-Me-pyrazol-3-yl | Me | Cl | C(=O)Me | O |
| C-15959 | Me(R) | single bond | H | 1-Me-pyrazol-3-yl | Me | Cl | C(=O)Me | O |
| C-15960 | Me(S) | single bond | H | 1-Me-pyrazol-3-yl | Me | Cl | C(=O)Me | O |
| C-15961 | H | single bond | Me | 1-Me-pyrazol-3-yl | Me | Me | C(=O)Me | O |
| C-15962 | Me | single bond | H | 1-Me-pyrazol-3-yl | Me | Me | C(=O)Me | O |
| C-15963 | Me(R) | single bond | H | 1-Me-pyrazol-3-yl | Me | Me | C(=O)Me | O |
| C-15964 | Me(S) | single bond | H | 1-Me-pyrazol-3-yl | Me | Me | C(=O)Me | O |
| C-15965 | H | single bond | Me | 1-Me-pyrazol-5-yl | Me | Cl | C(=O)Me | O |
| C-15966 | Me | single bond | H | 1-Me-pyrazol-5-yl | Me | Cl | C(=O)Me | O |
| C-15967 | Me(R) | single bond | H | 1-Me-pyrazol-5-yl | Me | Cl | C(=O)Me | O |
| C-15968 | Me(S) | single bond | H | 1-Me-pyrazol-5-yl | Me | Cl | C(=O)Me | O |
| C-15969 | H | single bond | Me | 1-Me-pyrazol-5-yl | Me | Me | C(=O)Me | O |
| C-15970 | Me | single bond | H | 1-Me-pyrazol-5-yl | Me | Me | C(=O)Me | O |
| C-15971 | Me(R) | single bond | H | 1-Me-pyrazol-5-yl | Me | Me | C(=O)Me | O |
| C-15972 | Me(S) | single bond | H | 1-Me-pyrazol-5-yl | Me | Me | C(=O)Me | O |
| C-15973 | H | single bond | Me | $CH_2$(pyrimidin-2-yl) | Me | Cl | C(=O)Me | O |
| C-15974 | Me | single bond | H | $CH_2$(pyrimidin-2-yl) | Me | Cl | C(=O)Me | O |
| C-15975 | Me(R) | single bond | H | $CH_2$(pyrimidin-2-yl) | Me | Cl | C(=O)Me | O |
| C-15976 | Me(S) | single bond | H | $CH_2$(pyrimidin-2-yl) | Me | Cl | C(=O)Me | O |
| C-15977 | H | single bond | Me | $CH_2$(pyrimidin-2-yl) | Me | Me | C(=O)Me | O |
| C-15978 | Me | single bond | H | $CH_2$(pyrimidin-2-yl) | Me | Me | C(=O)Me | O |
| C-15979 | Me(R) | single bond | H | $CH_2$(pyrimidin-2-yl) | Me | Me | C(=O)Me | O |
| C-15980 | Me(S) | single bond | H | $CH_2$(pyrimidin-2-yl) | Me | Me | C(=O)Me | O |
| C-15981 | H | single bond | Me | Me | C(=O)Me | Cl | H | O |
| C-15982 | Me | single bond | H | Me | C(=O)Me | Cl | H | O |
| C-15983 | Me(R) | single bond | H | Me | C(=O)Me | Cl | H | O |
| C-15984 | Me(S) | single bond | H | Me | C(=O)Me | Cl | H | O |
| C-15985 | H | single bond | Me | Me | C(=O)Me | Me | H | O |
| C-15986 | Me | single bond | H | Me | C(=O)Me | Me | H | O |
| C-15987 | Me(R) | single bond | H | Me | C(=O)Me | Me | H | O |
| C-15988 | Me(S) | single bond | H | Me | C(=O)Me | Me | H | O |
| C-15989 | H | single bond | Me | $CH_2CHF_2$ | C(=O)Me | Cl | H | O |
| C-15990 | Me | single bond | H | $CH_2CHF_2$ | C(=O)Me | Cl | H | O |

TABLE 592

| Compound Number | Y | W | Z | $R^1$ | $R^2$ | $R^3$ | $R^{10}$ | A |
|---|---|---|---|---|---|---|---|---|
| C-15991 | Me(R) | single bond | H | $CH_2CHF_2$ | C(═O)Me | Cl | H | O |
| C-15992 | Me(S) | single bond | H | $CH_2CHF_2$ | C(═O)Me | Cl | H | O |
| C-15993 | H | single bond | Me | $CH_2CHF_2$ | C(═O)Me | Me | H | O |
| C-15994 | Me | single bond | H | $CH_2CHF_2$ | C(═O)Me | Me | H | O |
| C-15995 | Me(R) | single bond | H | $CH_2CHF_2$ | C(═O)Me | Me | H | O |
| C-15996 | Me(S) | single bond | H | $CH_2CHF_2$ | C(═O)Me | Me | H | O |
| C-15997 | H | single bond | Me | n-Pr | C(═O)Me | Cl | H | O |
| C-15998 | Me | single bond | H | n-Pr | C(═O)Me | Cl | H | O |
| C-15999 | Me(R) | single bond | H | n-Pr | C(═O)Me | Cl | H | O |
| C-16000 | Me(S) | single bond | H | n-Pr | C(═O)Me | Cl | H | O |
| C-16001 | H | single bond | Me | n-Pr | C(═O)Me | Me | H | O |
| C-16002 | Me | single bond | H | n-Pr | C(═O)Me | Me | H | O |
| C-16003 | Me(R) | single bond | H | n-Pr | C(═O)Me | Me | H | O |
| C-16004 | Me(S) | single bond | H | n-Pr | C(═O)Me | Me | H | O |
| C-16005 | H | single bond | Me | i-Pr | C(═O)Me | Cl | H | O |
| C-16006 | Me | single bond | H | i-Pr | C(═O)Me | Cl | H | O |
| C-16007 | Me(R) | single bond | H | i-Pr | C(═O)Me | Cl | H | O |
| C-16008 | Me(S) | single bond | H | i-Pr | C(═O)Me | Cl | H | O |
| C-16009 | H | single bond | Me | i-Pr | C(═O)Me | Me | H | O |
| C-16010 | Me | single bond | H | i-Pr | C(═O)Me | Me | H | O |
| C-16011 | Me(R) | single bond | H | i-Pr | C(═O)Me | Me | H | O |
| C-16012 | Me(S) | single bond | H | i-Pr | C(═O)Me | Me | H | O |
| C-16013 | H | single bond | Me | c-Pr(1-F) | C(═O)Me | Cl | H | O |
| C-16014 | Me | single bond | H | c-Pr(1-F) | C(═O)Me | Cl | H | O |
| C-16015 | Me(R) | single bond | H | c-Pr(1-F) | C(═O)Me | Cl | H | O |
| C-16016 | Me(S) | single bond | H | c-Pr(1-F) | C(═O)Me | Cl | H | O |
| C-16017 | H | single bond | Me | c-Pr(1-F) | C(═O)Me | Me | H | O |
| C-16018 | Me | single bond | H | c-Pr(1-F) | C(═O)Me | Me | H | O |
| C-16019 | Me(R) | single bond | H | c-Pr(1-F) | C(═O)Me | Me | H | O |
| C-16020 | Me(S) | single bond | H | c-Pr(1-F) | C(═O)Me | Me | H | O |
| C-16021 | H | single bond | Me | c-Pr(2,2-$F_2$) | C(═O)Me | Cl | H | O |
| C-16022 | Me | single bond | H | c-Pr(2,2-$F_2$) | C(═O)Me | Cl | H | O |
| C-16023 | Me(R) | single bond | H | c-Pr(2,2-$F_2$) | C(═O)Me | Cl | H | O |
| C-16024 | Me(S) | single bond | H | c-Pr(2,2-$F_2$) | C(═O)Me | Cl | H | O |
| C-16025 | H | single bond | Me | c-Pr(2,2-$F_2$) | C(═O)Me | Me | H | O |
| C-16026 | Me | single bond | H | c-Pr(2,2-$F_2$) | C(═O)Me | Me | H | O |
| C-16027 | Me(R) | single bond | H | c-Pr(2,2-$F_2$) | C(═O)Me | Me | H | O |
| C-16028 | Me(S) | single bond | H | c-Pr(2,2-$F_2$) | C(═O)Me | Me | H | O |
| C-16029 | H | single bond | Me | c-Pr(1-Cl) | C(═O)Me | Cl | H | O |
| C-16030 | Me | single bond | H | c-Pr(1-Cl) | C(═O)Me | Cl | H | O |
| C-16031 | Me(R) | single bond | H | c-Pr(1-Cl) | C(═O)Me | Cl | H | O |
| C-16032 | Me(S) | single bond | H | c-Pr(1-Cl) | C(═O)Me | Cl | H | O |
| C-16033 | H | single bond | Me | c-Pr(1-Cl) | C(═O)Me | Me | H | O |
| C-16034 | Me | single bond | H | c-Pr(1-Cl) | C(═O)Me | Me | H | O |

TABLE 593

| Compound Number | Y | W | Z | $R^1$ | $R^2$ | $R^3$ | $R^{10}$ | A |
|---|---|---|---|---|---|---|---|---|
| C-16035 | Me(R) | single bond | H | c-Pr(1-Cl) | C(═O)Me | Me | H | O |
| C-16036 | Me(S) | single bond | H | c-Pr(1-Cl) | C(═O)Me | Me | H | O |
| C-16037 | H | single bond | Me | c-Pr(1-Br) | C(═O)Me | Cl | H | O |
| C-16038 | Me | single bond | H | c-Pr(1-Br) | C(═O)Me | Cl | H | O |
| C-16039 | Me(R) | single bond | H | c-Pr(1-Br) | C(═O)Me | Cl | H | O |
| C-16040 | Me(S) | single bond | H | c-Pr(1-Br) | C(═O)Me | Cl | H | O |
| C-16041 | H | single bond | Me | c-Pr(1-Br) | C(═O)Me | Me | H | O |
| C-16042 | Me | single bond | H | c-Pr(1-Br) | C(═O)Me | Me | H | O |
| C-16043 | Me(R) | single bond | H | c-Pr(1-Br) | C(═O)Me | Me | H | O |
| C-16044 | Me(S) | single bond | H | c-Pr(1-Br) | C(═O)Me | Me | H | O |
| C-16045 | H | single bond | Me | c-Pr(1-Me) | C(═O)Me | Cl | H | O |
| C-16046 | Me | single bond | H | c-Pr(1-Me) | C(═O)Me | Cl | H | O |
| C-16047 | Me(R) | single bond | H | c-Pr(1-Me) | C(═O)Me | Cl | H | O |
| C-16048 | Me(S) | single bond | H | c-Pr(1-Me) | C(═O)Me | Cl | H | O |
| C-16049 | H | single bond | Me | c-Pr(1-Me) | C(═O)Me | Me | H | O |
| C-16050 | Me | single bond | H | c-Pr(1-Me) | C(═O)Me | Me | H | O |
| C-16051 | Me(R) | single bond | H | c-Pr(1-Me) | C(═O)Me | Me | H | O |
| C-16052 | Me(S) | single bond | H | c-Pr(1-Me) | C(═O)Me | Me | H | O |
| C-16053 | H | single bond | Me | c-Pr(1-$CH_2OH$) | C(═O)Me | Cl | H | O |
| C-16054 | Me | single bond | H | c-Pr(1-$CH_2OH$) | C(═O)Me | Cl | H | O |
| C-16055 | Me(R) | single bond | H | c-Pr(1-$CH_2OH$) | C(═O)Me | Cl | H | O |
| C-16056 | Me(S) | single bond | H | c-Pr(1-$CH_2OH$) | C(═O)Me | Cl | H | O |
| C-16057 | H | single bond | Me | c-Pr(1-$CH_2OH$) | C(═O)Me | Me | H | O |

TABLE 593-continued

| Compound Number | Y | W | Z | $R^1$ | $R^2$ | $R^3$ | $R^{10}$ | A |
|---|---|---|---|---|---|---|---|---|
| C-16058 | Me | single bond | H | c-Pr(1-$CH_2$OH) | C(=O)Me | Me | H | O |
| C-16059 | Me(R) | single bond | H | c-Pr(1-$CH_2$OH) | C(=O)Me | Me | H | O |
| C-16060 | Me(S) | single bond | H | c-Pr(1-$CH_2$OH) | C(=O)Me | Me | H | O |
| C-16061 | H | single bond | Me | c-Pr[1-$CH_2$OS(=O)$_2$Me] | C(=O)Me | Cl | H | O |
| C-16062 | Me | single bond | H | c-Pr[1-$CH_2$OS(=O)$_2$Me] | C(=O)Me | Cl | H | O |
| C-16063 | Me(R) | single bond | H | c-Pr[1-$CH_2$OS(=O)$_2$Me] | C(=O)Me | Cl | H | O |
| C-16064 | Me(S) | single bond | H | c-Pr[1-$CH_2$OS(=O)$_2$Me] | C(=O)Me | Cl | H | O |
| C-16065 | H | single bond | Me | c-Pr[1-$CH_2$OS(=O)$_2$Me] | C(=O)Me | Me | H | O |
| C-16066 | Me | single bond | H | c-Pr[1-$CH_2$OS(=O)$_2$Me] | C(=O)Me | Me | H | O |
| C-16067 | Me(R) | single bond | H | c-Pr[1-$CH_2$OS(=O)$_2$Me] | C(=O)Me | Me | H | O |
| C-16068 | Me(S) | single bond | H | c-Pr[1-$CH_2$OS(=O)$_2$Me] | C(=O)Me | Me | H | O |
| C-16069 | H | single bond | Me | c-Pr(1-$CH_2$OMe) | C(=O)Me | Cl | H | O |
| C-16070 | Me | single bond | H | c-Pr(1-$CH_2$OMe) | C(=O)Me | Cl | H | O |
| C-16071 | Me(R) | single bond | H | c-Pr(1-$CH_2$OMe) | C(=O)Me | Cl | H | O |
| C-16072 | Me(S) | single bond | H | c-Pr(1-$CH_2$OMe) | C(=O)Me | Cl | H | O |
| C-16073 | H | single bond | Me | c-Pr(1-$CH_2$OMe) | C(=O)Me | Me | H | O |
| C-16074 | Me | single bond | H | c-Pr(1-$CH_2$OMe) | C(=O)Me | Me | H | O |
| C-16075 | Me(R) | single bond | H | c-Pr(1-$CH_2$OMe) | C(=O)Me | Me | H | O |
| C-16076 | Me(S) | single bond | H | c-Pr(1-$CH_2$OMe) | C(=O)Me | Me | H | O |
| C-16077 | H | single bond | Me | c-Pr(1-$CH_2$CN) | C(=O)Me | Cl | H | O |
| C-16078 | Me | single bond | H | c-Pr(1-$CH_2$CN) | C(=O)Me | Cl | H | O |

TABLE 594

| Compound Number | Y | W | Z | $R^1$ | $R^2$ | $R^3$ | $R^{10}$ | A |
|---|---|---|---|---|---|---|---|---|
| C-16079 | Me(R) | single bond | H | c-Pr(1-$CH_2$CN) | C(=O)Me | Cl | H | O |
| C-16080 | Me(S) | single bond | H | c-Pr(1-$CH_2$CN) | C(=O)Me | Cl | H | O |
| C-16081 | H | single bond | Me | c-Pr(1-$CH_2$CN) | C(=O)Me | Me | H | O |
| C-16082 | Me | single bond | H | c-Pr(1-$CH_2$CN) | C(=O)Me | Me | H | O |
| C-16083 | Me(R) | single bond | H | c-Pr(1-$CH_2$CN) | C(=O)Me | Me | H | O |
| C-16084 | Me(S) | single bond | H | c-Pr(1-$CH_2$CN) | C(=O)Me | Me | H | O |
| C-16085 | H | single bond | Me | c-Pr(1-$CH_2$SMe) | C(=O)Me | Cl | H | O |
| C-16086 | Me | single bond | H | c-Pr(1-$CH_2$SMe) | C(=O)Me | Cl | H | O |
| C-16087 | Me(R) | single bond | H | c-Pr(1-$CH_2$SMe) | C(=O)Me | Cl | H | O |
| C-16088 | Me(S) | single bond | H | c-Pr(1-$CH_2$SMe) | C(=O)Me | Cl | H | O |
| C-16089 | H | single bond | Me | c-Pr(1-$CH_2$SMe) | C(=O)Me | Me | H | O |
| C-16090 | Me | single bond | H | c-Pr(1-$CH_2$SMe) | C(=O)Me | Me | H | O |
| C-16091 | Me(R) | single bond | H | c-Pr(1-$CH_2$SMe) | C(=O)Me | Me | H | O |
| C-16092 | Me(S) | single bond | H | c-Pr(1-$CH_2$SMe) | C(=O)Me | Me | H | O |
| C-16093 | H | single bond | Me | c-Pr[1-$CH_2$S(=O)Me] | C(=O)Me | Cl | H | O |
| C-16094 | Me | single bond | H | c-Pr[1-$CH_2$S(=O)Me] | C(=O)Me | Cl | H | O |
| C-16095 | Me(R) | single bond | H | c-Pr[1-$CH_2$S(=O)Me] | C(=O)Me | Cl | H | O |
| C-16096 | Me(S) | single bond | H | c-Pr[1-$CH_2$S(=O)Me] | C(=O)Me | Cl | H | O |
| C-16097 | H | single bond | Me | c-Pr[1-$CH_2$S(=O)Me] | C(=O)Me | Me | H | O |
| C-16098 | Me | single bond | H | c-Pr[1-$CH_2$S(=O)Me] | C(=O)Me | Me | H | O |
| C-16099 | Me(R) | single bond | H | c-Pr[1-$CH_2$S(=O)Me] | C(=O)Me | Me | H | O |
| C-16100 | Me(S) | single bond | H | c-Pr[1-$CH_2$S(=O)Me] | C(=O)Me | Me | H | O |
| C-16101 | H | single bond | Me | c-Pr[1-$CH_2$S(=O)$_2$Me] | C(=O)Me | Cl | H | O |
| C-16102 | Me | single bond | H | c-Pr[1-$CH_2$S(=O)$_2$Me] | C(=O)Me | Cl | H | O |
| C-16103 | Me(R) | single bond | H | c-Pr[1-$CH_2$S(=O)$_2$Me] | C(=O)Me | Cl | H | O |
| C-16104 | Me(S) | single bond | H | c-Pr[1-$CH_2$S(=O)$_2$Me] | C(=O)Me | Cl | H | O |
| C-16105 | H | single bond | Me | c-Pr[1-$CH_2$S(=O)$_2$Me] | C(=O)Me | Me | H | O |
| C-16106 | Me | single bond | H | c-Pr[1-$CH_2$S(=O)$_2$Me] | C(=O)Me | Me | H | O |
| C-16107 | Me(R) | single bond | H | c-Pr[1-$CH_2$S(=O)$_2$Me] | C(=O)Me | Me | H | O |
| C-16108 | Me(S) | single bond | H | c-Pr[1-$CH_2$S(=O)$_2$Me] | C(=O)Me | Me | H | O |
| C-16109 | H | single bond | Me | c-Pr(1-$CH_2$F) | C(=O)Me | Cl | H | O |
| C-16110 | Me | single bond | H | c-Pr(1-$CH_2$F) | C(=O)Me | Cl | H | O |
| C-16111 | Me(R) | single bond | H | c-Pr(1-$CH_2$F) | C(=O)Me | Cl | H | O |
| C-16112 | Me(S) | single bond | H | c-Pr(1-$CH_2$F) | C(=O)Me | Cl | H | O |
| C-16113 | H | single bond | Me | c-Pr(1-$CH_2$F) | C(=O)Me | Me | H | O |
| C-16114 | Me | single bond | H | c-Pr(1-$CH_2$F) | C(=O)Me | Me | H | O |
| C-16115 | Me(R) | single bond | H | c-Pr(1-$CH_2$F) | C(=O)Me | Me | H | O |
| C-16116 | Me(S) | single bond | H | c-Pr(1-$CH_2$F) | C(=O)Me | Me | H | O |
| C-16117 | H | single bond | Me | c-Pr(1-$CHF_2$) | C(=O)Me | Cl | H | O |
| C-16118 | Me | single bond | H | c-Pr(1-$CHF_2$) | C(=O)Me | Cl | H | O |
| C-16119 | Me(R) | single bond | H | c-Pr(1-$CHF_2$) | C(=O)Me | Cl | H | O |
| C-16120 | Me(S) | single bond | H | c-Pr(1-$CHF_2$) | C(=O)Me | Cl | H | O |
| C-16121 | H | single bond | Me | c-Pr(1-$CHF_2$) | C(=O)Me | Me | H | O |
| C-16122 | Me | single bond | H | c-Pr(1-$CHF_2$) | C(=O)Me | Me | H | O |

TABLE 595

| Compound Number | Y | W | Z | $R^1$ | $R^2$ | $R^3$ | $R^{10}$ | A |
|---|---|---|---|---|---|---|---|---|
| C-16123 | Me(R) | single bond | H | c-Pr(1-$CHF_2$) | C(=O)Me | Me | H | O |
| C-16124 | Me(S) | single bond | H | c-Pr(1-$CHF_2$) | C(=O)Me | Me | H | O |
| C-16125 | H | single bond | Me | c-Pr(1-CF3) | C(=O)Me | Cl | H | O |
| C-16126 | Me | single bond | H | c-Pr(1-CF3) | C(=O)Me | Cl | H | O |
| C-16127 | Me(R) | single bond | H | c-Pr(1-CF3) | C(=O)Me | Cl | H | O |
| C-16128 | Me(S) | single bond | H | c-Pr(1-CF3) | C(=O)Me | Cl | H | O |
| C-16129 | H | single bond | Me | c-Pr(1-CF3) | C(=O)Me | Me | H | O |
| C-16130 | Me | single bond | H | c-Pr(1-CF3) | C(=O)Me | Me | H | O |
| C-16131 | Me(R) | single bond | H | c-Pr(1-CF3) | C(=O)Me | Me | H | O |
| C-16132 | Me(S) | single bond | H | c-Pr(1-CF3) | C(=O)Me | Me | H | O |
| C-16133 | H | single bond | Me | c-Pr(1-C≡ CH) | C(=O)Me | Cl | H | O |
| C-16134 | Me | single bond | H | c-Pr(1-C≡ CH) | C(=O)Me | Cl | H | O |
| C-16135 | Me(R) | single bond | H | c-Pr(1-C≡ CH) | C(=O)Me | Cl | H | O |
| C-16136 | Me(S) | single bond | H | c-Pr(1-C≡ CH) | C(=O)Me | Cl | H | O |
| C-16137 | H | single bond | Me | c-Pr(1-C≡ CH) | C(=O)Me | Me | H | O |
| C-16138 | Me | single bond | H | c-Pr(1-C≡ CH) | C(=O)Me | Me | H | O |
| C-16139 | Me(R) | single bond | H | c-Pr(1-C≡ CH) | C(=O)Me | Me | H | O |
| C-16140 | Me(S) | single bond | H | c-Pr(1-C≡ CH) | C(=O)Me | Me | H | O |
| C-16141 | H | single bond | Me | c-Pr[1-C(=O)OEt] | C(=O)Me | Cl | H | O |
| C-16142 | Me | single bond | H | c-Pr[1-C(=O)OEt] | C(=O)Me | Cl | H | O |
| C-16143 | Me(R) | single bond | H | c-Pr[1-C(=O)OEt] | C(=O)Me | Cl | H | O |
| C-16144 | Me(S) | single bond | H | c-Pr[1-C(=O)OEt] | C(=O)Me | Cl | H | O |
| C-16145 | H | single bond | Me | c-Pr[1-C(=O)OEt] | C(=O)Me | Me | H | O |
| C-16146 | Me | single bond | H | c-Pr[1-C(=O)OEt] | C(=O)Me | Me | H | O |
| C-16147 | Me(R) | single bond | H | c-Pr[1-C(=O)OEt] | C(=O)Me | Me | H | O |
| C-16148 | Me(S) | single bond | H | c-Pr[1-C(=O)OEt] | C(=O)Me | Me | H | O |
| C-16149 | H | single bond | Me | c-Pr[1-C(=O)OH] | C(=O)Me | Cl | H | O |
| C-16150 | Me | single bond | H | c-Pr[1-C(=O)OH] | C(=O)Me | Cl | H | O |
| C-16151 | Me(R) | single bond | H | c-Pr[1-C(=O)OH] | C(=O)Me | Cl | H | O |
| C-16152 | Me(S) | single bond | H | c-Pr[1-C(=O)OH] | C(=O)Me | Cl | H | O |
| C-16153 | H | single bond | Me | c-Pr[1-C(=O)OH] | C(=O)Me | Me | H | O |
| C-16154 | Me | single bond | H | c-Pr[1-C(=O)OH] | C(=O)Me | Me | H | O |
| C-16155 | Me(R) | single bond | H | c-Pr[1-C(=O)OH] | C(=O)Me | Me | H | O |
| C-16156 | Me(S) | single bond | H | c-Pr[1-C(=O)OH] | C(=O)Me | Me | H | O |
| C-16157 | H | single bond | Me | c-Pr[1-C(=O)$NH_2$] | C(=O)Me | Cl | H | O |
| C-16158 | Me | single bond | H | c-Pr[1-C(=O)$NH_2$] | C(=O)Me | Cl | H | O |
| C-16159 | Me(R) | single bond | H | c-Pr[1-C(=O)$NH_2$] | C(=O)Me | Cl | H | O |
| C-16160 | Me(S) | single bond | H | c-Pr[1-C(=O)$NH_2$] | C(=O)Me | Cl | H | O |
| C-16161 | H | single bond | Me | c-Pr[1-C(=O)$NH_2$] | C(=O)Me | Me | H | O |
| C-16162 | Me | single bond | H | c-Pr[1-C(=O)$NH_2$] | C(=O)Me | Me | H | O |
| C-16163 | Me(R) | single bond | H | c-Pr[1-C(=O)$NH_2$] | C(=O)Me | Me | H | O |
| C-16164 | Me(S) | single bond | H | c-Pr[1-C(=O)$NH_2$] | C(=O)Me | Me | H | O |
| C-16165 | H | single bond | Me | c-Pr(1-OMe) | C(=O)Me | Cl | H | O |
| C-16166 | Me | single bond | H | c-Pr(1-OMe) | C(=O)Me | Cl | H | O |

TABLE 596

| Compound Number | Y | W | Z | $R^1$ | $R^2$ | $R^3$ | $R^{10}$ | A |
|---|---|---|---|---|---|---|---|---|
| C-16167 | Me(R) | single bond | H | c-Pr(1-OMe) | C(=O)Me | Cl | H | O |
| C-16168 | Me(S) | single bond | H | c-Pr(1-OMe) | C(=O)Me | Cl | H | O |
| C-16169 | H | single bond | Me | c-Pr(1-OMe) | C(=O)Me | Me | H | O |
| C-16170 | Me | single bond | H | c-Pr(1-OMe) | C(=O)Me | Me | H | O |
| C-16171 | Me(R) | single bond | H | c-Pr(1-OMe) | C(=O)Me | Me | H | O |
| C-16172 | Me(S) | single bond | H | c-Pr(1-OMe) | C(=O)Me | Me | H | O |
| C-16173 | H | single bond | Me | c-Pr(1-SMe) | C(=O)Me | Cl | H | O |
| C-16174 | Me | single bond | H | c-Pr(1-SMe) | C(=O)Me | Cl | H | O |
| C-16175 | Me(R) | single bond | H | c-Pr(1-SMe) | C(=O)Me | Cl | H | O |
| C-16176 | Me(S) | single bond | H | c-Pr(1-SMe) | C(=O)Me | Cl | H | O |
| C-16177 | H | single bond | Me | c-Pr(1-SMe) | C(=O)Me | Me | H | O |
| C-16178 | Me | single bond | H | c-Pr(1-SMe) | C(=O)Me | Me | H | O |
| C-16179 | Me(R) | single bond | H | c-Pr(1-SMe) | C(=O)Me | Me | H | O |
| C-16180 | Me(S) | single bond | H | c-Pr(1-SMe) | C(=O)Me | Me | H | O |
| C-16181 | H | single bond | Me | c-Pr[1-S(=O)Me] | C(=O)Me | Cl | H | O |
| C-16182 | Me | single bond | H | c-Pr[1-S(=O)Me] | C(=O)Me | Cl | H | O |
| C-16183 | Me(R) | single bond | H | c-Pr[1-S(=O)Me] | C(=O)Me | Cl | H | O |
| C-16184 | Me(S) | single bond | H | c-Pr[1-S(=O)Me] | C(=O)Me | Cl | H | O |
| C-16185 | H | single bond | Me | c-Pr[1-S(=O)Me] | C(=O)Me | Me | H | O |
| C-16186 | Me | single bond | H | c-Pr[1-S(=O)Me] | C(=O)Me | Me | H | O |
| C-16187 | Me(R) | single bond | H | c-Pr[1-S(=O)Me] | C(=O)Me | Me | H | O |

TABLE 596-continued

| Compound Number | Y | W | Z | $R^1$ | $R^2$ | $R^3$ | $R^{10}$ | A |
|---|---|---|---|---|---|---|---|---|
| C-16188 | Me(S) | single bond | H | c-Pr[1-S(=O)Me] | C(=O)Me | Me | H | O |
| C-16189 | H | single bond | Me | c-Pr[1-S(=O)$_2$Me] | C(=O)Me | Cl | H | O |
| C-16190 | Me | single bond | H | c-Pr[1-S(=O)$_2$Me] | C(=O)Me | Cl | H | O |
| C-16191 | Me(R) | single bond | H | c-Pr[1-S(=O)$_2$Me] | C(=O)Me | Cl | H | O |
| C-16192 | Me(S) | single bond | H | c-Pr[1-S(=O)$_2$Me] | C(=O)Me | Cl | H | O |
| C-16193 | H | single bond | Me | c-Pr[1-S(=O)$_2$Me] | C(=O)Me | Me | H | O |
| C-16194 | Me | single bond | H | c-Pr[1-S(=O)$_2$Me] | C(=O)Me | Me | H | O |
| C-16195 | Me(R) | single bond | H | c-Pr[1-S(=O)$_2$Me] | C(=O)Me | Me | H | O |
| C-16196 | Me(S) | single bond | H | c-Pr[1-S(=O)$_2$Me] | C(=O)Me | Me | H | O |
| C-16197 | H | single bond | Me | c-Pr[1-S(=O)$_2$CHF$_2$] | C(=O)Me | Cl | H | O |
| C-16198 | Me | single bond | H | c-Pr[1-S(=O)$_2$CHF$_2$] | C(=O)Me | Cl | H | O |
| C-16199 | Me(R) | single bond | H | c-Pr[1-S(=O)$_2$CHF$_2$] | C(=O)Me | Cl | H | O |
| C-16200 | Me(S) | single bond | H | c-Pr[1-S(=O)$_2$CHF$_2$] | C(=O)Me | Cl | H | O |
| C-16201 | H | single bond | Me | c-Pr[1-S(=O)$_2$CHF$_2$] | C(=O)Me | Me | H | O |
| C-16202 | Me | single bond | H | c-Pr[1-S(=O)$_2$CHF$_2$] | C(=O)Me | Me | H | O |
| C-16203 | Me(R) | single bond | H | c-Pr[1-S(=O)$_2$CHF$_2$] | C(=O)Me | Me | H | O |
| C-16204 | Me(S) | single bond | H | c-Pr[1-S(=O)$_2$CHF$_2$] | C(=O)Me | Me | H | O |
| C-16205 | H | single bond | Me | c-Pr[1-S(=O)$_2$CF$_3$] | C(=O)Me | Cl | H | O |
| C-16206 | Me | single bond | H | c-Pr[1-S(=O)$_2$CF$_3$] | C(=O)Me | Cl | H | O |
| C-16207 | Me(R) | single bond | H | c-Pr[1-S(=O)$_2$CF$_3$] | C(=O)Me | Cl | H | O |
| C-16208 | Me(S) | single bond | H | c-Pr[1-S(=O)$_2$CF$_3$] | C(=O)Me | Cl | H | O |
| C-16209 | H | single bond | Me | c-Pr[1-S(=O)$_2$CF$_3$] | C(=O)Me | Me | H | O |
| C-16210 | Me | single bond | H | c-Pr[1-S(=O)$_2$CF$_3$] | C(=O)Me | Me | H | O |

TABLE 597

| Compound Number | Y | W | Z | $R^1$ | $R^2$ | $R^3$ | $R^{10}$ | A |
|---|---|---|---|---|---|---|---|---|
| C-16211 | Me(R) | single bond | H | c-Pr[1-S(=O)$_2$CF$_3$] | C(=O)Me | Me | H | O |
| C-16212 | Me(S) | single bond | H | c-Pr[1-S(=O)$_2$CF$_3$] | C(=O)Me | Me | H | O |
| C-16213 | H | single bond | Me | c-Pr[1-(5,6-dihydro-1,4,2-dioxazin-3-yl)] | C(=O)Me | Cl | H | O |
| C-16214 | Me | single bond | H | c-Pr[1-(5,6-dihydro-1,4,2-dioxazin-3-yl)] | C(=O)Me | Cl | H | O |
| C-16215 | Me(R) | single bond | H | c-Pr[1-(5,6-dihydro-1,4,2-dioxazin-3-yl)] | C(=O)Me | Cl | H | O |
| C-16216 | Me(S) | single bond | H | c-Pr[1-(5,6-dihydro-1,4,2-dioxazin-3-yl)] | C(=O)Me | Cl | H | O |
| C-16217 | H | single bond | Me | c-Pr[1-(5,6-dihydro-1,4,2-dioxazin-3-yl)] | C(=O)Me | Me | H | O |
| C-16218 | Me | single bond | H | c-Pr[1-(5,6-dihydro-1,4,2-dioxazin-3-yl)] | C(=O)Me | Me | H | O |
| C-16219 | Me(R) | single bond | H | c-Pr[1-(5,6-dihydro-1,4,2-dioxazin-3-yl)] | C(=O)Me | Me | H | O |
| C-16220 | Me(S) | single bond | H | c-Pr[1-(5,6-dihydro-1,4,2-dioxazin-3-yl)] | C(=O)Me | Me | H | O |
| C-16221 | H | single bond | Me | c-Pr[1-(5-hydroxy-1,3,4-oxadiazol-2-yl)] | C(=O)Me | Cl | H | O |
| C-16222 | Me | single bond | H | c-Pr[1-(5-hydroxy-1,3,4-oxadiazol-2-yl)] | C(=O)Me | Cl | H | O |
| C-16223 | Me(R) | single bond | H | c-Pr[1-(5-hydroxy-1,3,4-oxadiazol-2-yl)] | C(=O)Me | Cl | H | O |
| C-16224 | Me(S) | single bond | H | c-Pr[1-(5-hydroxy-1,3,4-oxadiazol-2-yl)] | C(=O)Me | Cl | H | O |
| C-16225 | H | single bond | Me | c-Pr[1-(5-hydroxy-1,3,4-oxadiazol-2-yl)] | C(=O)Me | Me | H | O |
| C-16226 | Me | single bond | H | c-Pr[1-(5-hydroxy-1,3,4-oxadiazol-2-yl)] | C(=O)Me | Me | H | O |
| C-16227 | Me(R) | single bond | H | c-Pr[1-(5-hydroxy-1,3,4-oxadiazol-2-yl)] | C(=O)Me | Me | H | O |
| C-16228 | Me(S) | single bond | H | c-Pr[1-(5-hydroxy-1,3,4-oxadiazol-2-yl)] | C(=O)Me | Me | H | O |
| C-16229 | H | single bond | Me | c-Pr[1-(pyrimidin-2-yl)] | C(=O)Me | Cl | H | O |
| C-16230 | Me | single bond | H | c-Pr[1-(pyrimidin-2-yl)] | C(=O)Me | Cl | H | O |
| C-16231 | Me(R) | single bond | H | c-Pr[1-(pyrimidin-2-yl)] | C(=O)Me | Cl | H | O |
| C-16232 | Me(S) | single bond | H | c-Pr[1-(pyrimidin-2-yl)] | C(=O)Me | Cl | H | O |
| C-16233 | H | single bond | Me | c-Pr[1-(pyrimidin-2-yl)] | C(=O)Me | Me | H | O |
| C-16234 | Me | single bond | H | c-Pr[1-(pyrimidin-2-yl)] | C(=O)Me | Me | H | O |
| C-16235 | Me(R) | single bond | H | c-Pr[1-(pyrimidin-2-yl)] | C(=O)Me | Me | H | O |
| C-16236 | Me(S) | single bond | H | c-Pr[1-(pyrimidin-2-yl)] | C(=O)Me | Me | H | O |
| C-16237 | H | single bond | Me | t-Bu | C(=O)Me | Cl | H | O |
| C-16238 | Me | single bond | H | t-Bu | C(=O)Me | Cl | H | O |
| C-16239 | Me(R) | single bond | H | t-Bu | C(=O)Me | Cl | H | O |
| C-16240 | Me(S) | single bond | H | t-Bu | C(=O)Me | Cl | H | O |
| C-16241 | H | single bond | Me | t-Bu | C(=O)Me | Me | H | O |
| C-16242 | Me | single bond | H | t-Bu | C(=O)Me | Me | H | O |
| C-16243 | Me(R) | single bond | H | t-Bu | C(=O)Me | Me | H | O |
| C-16244 | Me(S) | single bond | H | t-Bu | C(=O)Me | Me | H | O |
| C-16245 | H | single bond | Me | c-Bu | C(=O)Me | Cl | H | O |
| C-16246 | Me | single bond | H | c-Bu | C(=O)Me | Cl | H | O |
| C-16247 | Me(R) | single bond | H | c-Bu | C(=O)Me | Cl | H | O |
| C-16248 | Me(S) | single bond | H | C-Bu | C(=O)Me | Cl | H | O |
| C-16249 | H | single bond | Me | C-Bu | C(=O)Me | Me | H | O |
| C-16250 | Me | single bond | H | c-Bu | C(=O)Me | Me | H | O |
| C-16251 | Me(R) | single bond | H | c-Bu | C(=O)Me | Me | H | O |
| C-16252 | Me(S) | single bond | H | c-Bu | C(=O)Me | Me | H | O |

TABLE 597-continued

| Compound Number | Y | W | Z | $R^1$ | $R^2$ | $R^3$ | $R^{10}$ | A |
|---|---|---|---|---|---|---|---|---|
| C-16253 | H | single bond | Me | c-Bu(1-CN) | C(=O)Me | Cl | H | O |
| C-16254 | Me | single bond | H | c-Bu(1-CN) | C(=O)Me | Cl | H | O |

TABLE 598

| Compound Number | Y | W | Z | $R^1$ | $R^2$ | $R^3$ | $R^{10}$ | A |
|---|---|---|---|---|---|---|---|---|
| C-16255 | Me(R) | single bond | H | c-Bu(1-CN) | C(=O)Me | Cl | H | O |
| C-16256 | Me(S) | single bond | H | c-Bu(1-CN) | C(=O)Me | Cl | H | O |
| C-16257 | H | single bond | Me | c-Bu(1-CN) | C(=O)Me | Me | H | O |
| C-16258 | Me | single bond | H | c-Bu(1-CN) | C(=O)Me | Me | H | O |
| C-16259 | Me(R) | single bond | H | c-Bu(1-CN) | C(=O)Me | Me | H | O |
| C-16260 | Me(S) | single bond | H | c-Bu(1-CN) | C(=O)Me | Me | H | O |
| C-16261 | H | single bond | Me | c-Bu(3,3-$F_2$) | C(=O)Me | Cl | H | O |
| C-16262 | Me | single bond | H | c-Bu(3,3-$F_2$) | C(=O)Me | Cl | H | O |
| C-16263 | Me(R) | single bond | H | c-Bu(3,3-$F_2$) | C(=O)Me | Cl | H | O |
| C-16264 | Me(S) | single bond | H | c-Bu(3,3-$F_2$) | C(=O)Me | Cl | H | O |
| C-16265 | H | single bond | Me | c-Bu(3,3-$F_2$) | C(=O)Me | Me | H | 0 |
| C-16266 | Me | single bond | H | c-Bu(3,3-$F_2$) | C(=O)Me | Me | H | 0 |
| C-16267 | Me(R) | single bond | H | c-Bu(3,3-$F_2$) | C(=O)Me | Me | H | O |
| C-16268 | Me(S) | single bond | H | c-Bu(3,3-$F_2$) | C(=O)Me | Me | H | O |
| C-16269 | H | single bond | Me | oxetan-3-yl | C(=O)Me | Cl | H | O |
| C-16270 | Me | single bond | H | oxetan-3-yl | C(=O)Me | Cl | H | O |
| C-16271 | Me(R) | single bond | H | oxetan-3-yl | C(=O)Me | Cl | H | O |
| C-16272 | Me(S) | single bond | H | oxetan-3-yl | C(=O)Me | Cl | H | 0 |
| C-16273 | H | single bond | Me | oxetan-3-yl | C(=O)Me | Me | H | O |
| C-16274 | Me | single bond | H | oxetan-3-yl | C(=O)Me | Me | H | 0 |
| C-16275 | Me(R) | single bond | H | oxetan-3-yl | C(=O)Me | Me | H | O |
| C-16276 | Me(S) | single bond | H | oxetan-3-yl | C(=O)Me | Me | H | O |
| C-16277 | H | single bond | Me | oxetan(3-CN)-3-yl | C(=O)Me | Cl | H | 0 |
| C-16278 | Me | single bond | H | oxetan(3-CN)-3-yl | C(=O)Me | Cl | H | O |
| C-16279 | Me(R) | single bond | H | oxetan(3-CN)-3-yl | C(=O)Me | Cl | H | O |
| C-16280 | Me(S) | single bond | H | oxetan(3-CN)-3-yl | C(=O)Me | Cl | H | O |
| C-16281 | H | single bond | Me | oxetan(3-CN)-3-yl | C(=O)Me | Me | H | O |
| C-16282 | Me | single bond | H | oxetan(3-CN)-3-yl | C(=O)Me | Me | H | 0 |
| C-16283 | Me(R) | single bond | H | oxetan(3-CN)-3-yl | C(=O)Me | Me | H | O |
| C-16284 | Me(S) | single bond | H | oxetan(3-CN)-3-yl | C(=O)Me | Me | H | 0 |
| C-16285 | H | single bond | Me | azetidin[1-C(=O)Me]-3-yl | C(=O)Me | Cl | H | O |
| C-16286 | Me | single bond | H | azetidin[1-C(=O)Me]-3-yl | C(=O)Me | Cl | H | O |
| C-16287 | Me(R) | single bond | H | azetidin[1-C(=O)Me]-3-yl | C(=O)Me | Cl | H | O |
| C-16288 | Me(S) | single bond | H | azetidin[1-C(=O)Me]-3-yl | C(=O)Me | Cl | H | O |
| C-16289 | H | single bond | Me | azetidin[1-C(=O)Me]-3-yl | C(=O)Me | Me | H | 0 |
| C-16290 | Me | single bond | H | azetidin[1-C(=O)Me]-3-yl | C(=O)Me | Me | H | O |
| C-16291 | Me(R) | single bond | H | azetidin[1-C(=O)Me]-3-yl | C(=O)Me | Me | H | O |
| C-16292 | Me(S) | single bond | H | azetidin[1-C(=O)Me]-3-yl | C(=O)Me | Me | H | O |
| C-16293 | H | single bond | Me | azetidin[1-S(=O)$_2$Me]-3-yl | C(=O)Me | Cl | H | O |
| C-16294 | Me | single bond | H | azetidin[1-S(=O)$_2$Me]-3-yl | C(=O)Me | Cl | H | O |
| C-16295 | Me(R) | single bond | H | azetidin[1-S(=O)$_2$Me]-3-yl | C(=O)Me | Cl | H | O |
| C-16296 | Me(S) | single bond | H | azetidin[1-S(=O)$_2$Me]-3-yl | C(=O)Me | Cl | H | O |
| C-16297 | H | single bond | Me | azetidin[1-S(=O)$_2$Me]-3-yl | C(=O)Me | Me | H | O |
| C-16298 | Me | single bond | H | azetidin[1-S(=O)$_2$Me]-3-yl | C(=O)Me | Me | H | O |

TABLE 599

| Compound Number | Y | W | Z | $R^1$ | $R^2$ | $R^3$ | $R^{10}$ | A |
|---|---|---|---|---|---|---|---|---|
| C-16299 | Me(R) | single bond | H | azetidin[1-S(=O)$_2$Me]-3-yl | C(=O)Me | Me | H | O |
| C-16300 | Me(S) | single bond | H | azetidin[1-S(=O)$_2$Me]-3-yl | C(=O)Me | Me | H | O |
| C-16301 | H | single bond | Me | azetidin[1-S(=O)$_2$CHF$_2$]-3-yl | C(=O)Me | Cl | H | O |
| C-16302 | Me | single bond | H | azetidin[1-S(=O)$_2$CHF$_2$]-3-yl | C(=O)Me | Cl | H | O |
| C-16303 | Me(R) | single bond | H | azetidin[1-S(=O)$_2$CHF$_2$]-3-yl | C(=O)Me | Cl | H | O |
| C-16304 | Me(S) | single bond | H | azetidin[1-S(=O)$_2$CHF$_2$]-3-yl | C(=O)Me | Cl | H | O |
| C-16305 | H | single bond | Me | azetidin[1-S(=O)$_2$CHF$_2$]-3-yl | C(=O)Me | Me | H | O |
| C-16306 | Me | single bond | H | azetidin[1-S(=O)$_2$CHF$_2$]-3-yl | C(=O)Me | Me | H | O |
| C-16307 | Me(R) | single bond | H | azetidin[1-S(=O)$_2$CHF$_2$]-3-yl | C(=O)Me | Me | H | O |
| C-16308 | Me(S) | single bond | H | azetidin[1-S(=O)$_2$CHF$_2$]-3-yl | C(=O)Me | Me | H | O |
| C-16309 | H | single bond | Me | c-Pen | C(=O)Me | Cl | H | O |
| C-16310 | Me | single bond | H | c-Pen | C(=O)Me | Cl | H | O |

TABLE 599-continued

| Compound Number | Y | W | Z | $R^1$ | $R^2$ | $R^3$ | $R^{10}$ | A |
|---|---|---|---|---|---|---|---|---|
| C-16311 | Me(R) | single bond | H | c-Pen | C(=O)Me | Cl | H | O |
| C-16312 | Me(S) | single bond | H | c-Pen | C(=O)Me | Cl | H | O |
| C-16313 | H | single bond | Me | c-Pen | C(=O)Me | Me | H | O |
| C-16314 | Me | single bond | H | c-Pen | C(=O)Me | Me | H | O |
| C-16315 | Me(R) | single bond | H | c-Pen | C(=O)Me | Me | H | O |
| C-16316 | Me(S) | single bond | H | c-Pen | C(=O)Me | Me | H | O |
| C-16317 | H | single bond | Me | tetrahydrofuran-3-yl | C(=O)Me | Cl | H | O |
| C-16318 | Me | single bond | H | tetrahydrofuran-3-yl | C(=O)Me | Cl | H | O |
| C-16319 | Me(R) | single bond | H | tetrahydrofuran-3-yl | C(=O)Me | Cl | H | O |
| C-16320 | Me(S) | single bond | H | tetrahydrofuran-3-yl | C(=O)Me | Cl | H | O |
| C-16321 | H | single bond | Me | tetrahydrofuran-3-yl | C(=O)Me | Me | H | O |
| C-16322 | Me | single bond | H | tetrahydrofuran-3-yl | C(=O)Me | Me | H | O |
| C-16323 | Me(R) | single bond | H | tetrahydrofuran-3-yl | C(=O)Me | Me | H | O |
| C-16324 | Me(S) | single bond | H | tetrahydrofuran-3-yl | C(=O)Me | Me | H | O |
| C-16325 | H | single bond | Me | tetrahydrothiophen-3-yl | C(=O)Me | Cl | H | O |
| C-16326 | Me | single bond | H | tetrahydrothiophen-3-yl | C(=O)Me | Cl | H | O |
| C-16327 | Me(R) | single bond | H | tetrahydrothiophen-3-yl | C(=O)Me | Cl | H | O |
| C-16328 | Me(S) | single bond | H | tetrahydrothiophen-3-yl | C(=O)Me | Cl | H | O |
| C-16329 | H | single bond | Me | tetrahydrothiophen-3-yl | C(=O)Me | Me | H | O |
| C-16330 | Me | single bond | H | tetrahydrothiophen-3-yl | C(=O)Me | Me | H | O |
| C-16331 | Me(R) | single bond | H | tetrahydrothiophen-3-yl | C(=O)Me | Me | H | O |
| C-16332 | Me(S) | single bond | H | tetrahydrothiophen-3-yl | C(=O)Me | Me | H | O |
| C-16333 | H | single bond | Me | c-Pen(1-CN) | C(=O)Me | Cl | H | O |
| C-16334 | Me | single bond | H | c-Pen(1-CN) | C(=O)Me | Cl | H | O |
| C-16335 | Me(R) | single bond | H | c-Pen(1-CN) | C(=O)Me | Cl | H | O |
| C-16336 | Me(S) | single bond | H | c-Pen(1-CN) | C(=O)Me | Cl | H | O |
| C-16337 | H | single bond | Me | c-Pen(1-CN) | C(=O)Me | Me | H | O |
| C-16338 | Me | single bond | H | c-Pen(1-CN) | C(=O)Me | Me | H | O |
| C-16339 | Me(R) | single bond | H | c-Pen(1-CN) | C(=O)Me | Me | H | O |
| C-16340 | Me(S) | single bond | H | c-Pen(1-CN) | C(=O)Me | Me | H | O |
| C-16341 | H | single bond | Me | tetrahydrofuran(3-CN)-3-yl | C(=O)Me | Cl | H | O |
| C-16342 | Me | single bond | H | tetrahydrofuran(3-CN)-3-yl | C(=O)Me | Cl | H | O |

TABLE 600

| Compound Number | Y | W | Z | $R^1$ | $R^2$ | $R^3$ | $R^{10}$ | A |
|---|---|---|---|---|---|---|---|---|
| C-16343 | Me(R) | single bond | H | tetrahydrofuran(3-CN)-3-yl | C(=O)Me | Cl | H | O |
| C-16344 | Me(S) | single bond | H | tetrahydrofuran(3-CN)-3-yl | C(=O)Me | Cl | H | O |
| C-16345 | H | single bond | Me | tetrahydrofuran(3-CN)-3-yl | C(=O)Me | Me | H | O |
| C-16346 | Me | single bond | H | tetrahydrofuran(3-CN)-3-yl | C(=O)Me | Me | H | O |
| C-16347 | Me(R) | single bond | H | tetrahydrofuran(3-CN)-3-yl | C(=O)Me | Me | H | O |
| C-16348 | Me(S) | single bond | H | tetrahydrofuran(3-CN)-3-yl | C(=O)Me | Me | H | O |
| C-16349 | H | single bond | Me | tetrahydrothiophen(3-CN)-3-yl | C(=O)Me | Cl | H | O |
| C-16350 | Me | single bond | H | tetrahydrothiophen(3-CN)-3-yl | C(=O)Me | Cl | H | O |
| C-16351 | Me(R) | single bond | H | tetrahydrothiophen(3-CN)-3-yl | C(=O)Me | Cl | H | O |
| C-16352 | Me(S) | single bond | H | tetrahydrothiophen(3-CN)-3-yl | C(=O)Me | Cl | H | O |
| C-16353 | H | single bond | Me | tetrahydrothiophen(3-CN)-3-yl | C(=O)Me | Me | H | O |
| C-16354 | Me | single bond | H | tetrahydrothiophen(3-CN)-3-yl | C(=O)Me | Me | H | O |
| C-16355 | Me(R) | single bond | H | tetrahydrothiophen(3-CN)-3-yl | C(=O)Me | Me | H | O |
| C-16356 | Me(S) | single bond | H | tetrahydrothiophen(3-CN)-3-yl | C(=O)Me | Me | H | O |
| C-16357 | H | single bond | Me | bicyclo[1.1.1]pentan-1-yl | C(=O)Me | Cl | H | O |
| C-16358 | Me | single bond | H | bicyclo[1.1.1]pentan-1-yl | C(=O)Me | Cl | H | O |
| C-16359 | Me(R) | single bond | H | bicyclo[1.1.1]pentan-1-yl | C(=O)Me | Cl | H | O |
| C-16360 | Me(S) | single bond | H | bicyclo[1.1.1]pentan-1-yl | C(=O)Me | Cl | H | O |
| C-16361 | H | single bond | Me | bicyclo[1.1.1]pentan-1-yl | C(=O)Me | Me | H | O |
| C-16362 | Me | single bond | H | bicyclo[1.1.1]pentan-1-yl | C(=O)Me | Me | H | O |
| C-16363 | Me(R) | single bond | H | bicyclo[1.1.1]pentan-1-yl | C(=O)Me | Me | H | O |
| C-16364 | Me(S) | single bond | H | bicyclo[1.1.1]pentan-1-yl | C(=O)Me | Me | H | O |
| C-16365 | H | single bond | Me | c-Hex | C(=O)Me | Cl | H | O |
| C-16366 | Me | single bond | H | c-Hex | C(=O)Me | Cl | H | O |
| C-16367 | Me(R) | single bond | H | c-Hex | C(=O)Me | Cl | H | O |
| C-16368 | Me(S) | single bond | H | c-Hex | C(=O)Me | Cl | H | O |
| C-16369 | H | single bond | Me | c-Hex | C(=O)Me | Me | H | O |
| C-16370 | Me | single bond | H | c-Hex | C(=O)Me | Me | H | O |
| C-16371 | Me(R) | single bond | H | c-Hex | C(=O)Me | Me | H | O |
| C-16372 | Me(S) | single bond | H | c-Hex | C(=O)Me | Me | H | O |
| C-16373 | H | single bond | Me | tetrahydropyran-4-yl | C(=O)Me | Cl | H | O |
| C-16374 | Me | single bond | H | tetrahydropyran-4-yl | C(=O)Me | Cl | H | O |
| C-16375 | Me(R) | single bond | H | tetrahydropyran-4-yl | C(=O)Me | Cl | H | O |
| C-16376 | Me(S) | single bond | H | tetrahydropyran-4-yl | C(=O)Me | Cl | H | O |
| C-16377 | H | single bond | Me | tetrahydropyran-4-yl | C(=O)Me | Me | H | O |

TABLE 600-continued

| Compound Number | Y | W | Z | $R^1$ | $R^2$ | $R^3$ | $R^{10}$ | A |
|---|---|---|---|---|---|---|---|---|
| C-16378 | Me | single bond | H | tetrahydropyran-4-yl | C(=O)Me | Me | H | O |
| C-16379 | Me(R) | single bond | H | tetrahydropyran-4-yl | C(=O)Me | Me | H | O |
| C-16380 | Me(S) | single bond | H | tetrahydropyran-4-yl | C(=O)Me | Me | H | O |
| C-16381 | H | single bond | Me | tetrahydrothiopyran-4-yl | C(=O)Me | Cl | H | O |
| C-16382 | Me | single bond | H | tetrahydrothiopyran-4-yl | C(=O)Me | Cl | H | O |
| C-16383 | Me(R) | single bond | H | tetrahydrothiopyran-4-yl | C(=O)Me | Cl | H | O |
| C-16384 | Me(S) | single bond | H | tetrahydrothiopyran-4-yl | C(=O)Me | Cl | H | O |
| C-16385 | H | single bond | Me | tetrahydrothiopyran-4-yl | C(=O)Me | Me | H | O |
| C-16386 | Me | single bond | H | tetrahydrothiopyran-4-yl | C(=O)Me | Me | H | O |

TABLE 601

| Compound Number | Y | W | Z | $R^1$ | $R^2$ | $R^3$ | $R^{10}$ | A |
|---|---|---|---|---|---|---|---|---|
| C-16387 | Me(R) | single bond | H | tetrahydrothiopyran-4-yl | C(=O)Me | Me | H | O |
| C-16388 | Me(S) | single bond | H | tetrahydrothiopyran-4-yl | C(=O)Me | Me | H | O |
| C-16389 | H | single bond | Me | c-Hex(1-CN) | C(=O)Me | Cl | H | O |
| C-16390 | Me | single bond | H | c-Hex(1-CN) | C(=O)Me | Cl | H | O |
| C-16391 | Me(R) | single bond | H | c-Hex(1-CN) | C(=O)Me | Cl | H | O |
| C-16392 | Me(S) | single bond | H | c-Hex(1-CN) | C(=O)Me | Cl | H | O |
| C-16393 | H | single bond | Me | c-Hex(1-CN) | C(=O)Me | Me | H | O |
| C-16394 | Me | single bond | H | c-Hex(1-CN) | C(=O)Me | Me | H | O |
| C-16395 | Me(R) | single bond | H | c-Hex(1-CN) | C(=O)Me | Me | H | O |
| C-16396 | Me(S) | single bond | H | c-Hex(1-CN) | C(=O)Me | Me | H | O |
| C-16397 | H | single bond | Me | tetrahydropyran(4-CN)-4-yl | C(=O)Me | Cl | H | O |
| C-16398 | Me | single bond | H | tetrahydropyran(4-CN)-4-yl | C(=O)Me | Cl | H | O |
| C-16399 | Me(R) | single bond | H | tetrahydropyran(4-CN)-4-yl | C(=O)Me | Cl | H | O |
| C-16400 | Me(S) | single bond | H | tetrahydropyran(4-CN)-4-yl | C(=O)Me | Cl | H | O |
| C-16401 | H | single bond | Me | tetrahydropyran(4-CN)-4-yl | C(=O)Me | Me | H | O |
| C-16402 | Me | single bond | H | tetrahydropyran(4-CN)-4-yl | C(=O)Me | Me | H | O |
| C-16403 | Me(R) | single bond | H | tetrahydropyran(4-CN)-4-yl | C(=O)Me | Me | H | O |
| C-16404 | Me(S) | single bond | H | tetrahydropyran(4-CN)-4-yl | C(=O)Me | Me | H | O |
| C-16405 | H | single bond | Me | tetrahydrothiopyran(4-CN)-4-yl | C(=O)Me | Cl | H | O |
| C-16406 | Me | single bond | H | tetrahydrothiopyran(4-CN)-4-yl | C(=O)Me | Cl | H | O |
| C-16407 | Me(R) | single bond | H | tetrahydrothiopyran(4-CN)-4-yl | C(=O)Me | Cl | H | O |
| C-16408 | Me(S) | single bond | H | tetrahydrothiopyran(4-CN)-4-yl | C(=O)Me | Cl | H | O |
| C-16409 | H | single bond | Me | tetrahydrothiopyran(4-CN)-4-yl | C(=O)Me | Me | H | O |
| C-16410 | Me | single bond | H | tetrahydrothiopyran(4-CN)-4-yl | C(=O)Me | Me | H | O |
| C-16411 | Me(R) | single bond | H | tetrahydrothiopyran(4-CN)-4-yl | C(=O)Me | Me | H | O |
| C-16412 | Me(S) | single bond | H | tetrahydrothiopyran(4-CN)-4-yl | C(=O)Me | Me | H | O |
| C-16413 | H | single bond | Me | $CH_2$(c-Pr) | C(=O)Me | Cl | H | O |
| C-16414 | Me | single bond | H | $CH_2$(c-Pr) | C(=O)Me | Cl | H | O |
| C-16415 | Me(R) | single bond | H | $CH_2$(c-Pr) | C(=O)Me | Cl | H | O |
| C-16416 | Me(S) | single bond | H | $CH_2$(c-Pr) | C(=O)Me | Cl | H | O |
| C-16417 | H | single bond | Me | $CH_2$(c-Pr) | C(=O)Me | Me | H | O |
| C-16418 | Me | single bond | H | $CH_2$(c-Pr) | C(=O)Me | Me | H | O |
| C-16419 | Me(R) | single bond | H | $CH_2$(c-Pr) | C(=O)Me | Me | H | O |
| C-16420 | Me(S) | single bond | H | $CH_2$(c-Pr) | C(=O)Me | Me | H | O |
| C-16421 | H | single bond | Me | $CH_2$[c-Pr(1-CN)] | C(=O)Me | Cl | H | O |
| C-16422 | Me | single bond | H | $CH_2$[c-Pr(1-CN)] | C(=O)Me | Cl | H | O |
| C-16423 | Me(R) | single bond | H | $CH_2$[c-Pr(1-CN)] | C(=O)Me | Cl | H | O |
| C-16424 | Me(S) | single bond | H | $CH_2$[c-Pr(1-CN)] | C(=O)Me | Cl | H | O |
| C-16425 | H | single bond | Me | $CH_2$[c-Pr(1-CN)] | C(=O)Me | Me | H | O |
| C-16426 | Me | single bond | H | $CH_2$[c-Pr(1-CN)] | C(=O)Me | Me | H | O |
| C-16427 | Me(R) | single bond | H | $CH_2$[c-Pr(1-CN)] | C(=O)Me | Me | H | O |
| C-16428 | Me(S) | single bond | H | $CH_2$[c-Pr(1-CN)] | C(=O)Me | Me | H | O |
| C-16429 | H | single bond | Me | CH(Me)(c-Pr) | C(=O)Me | Cl | H | O |
| C-16430 | Me | single bond | H | CH(Me)(c-Pr) | C(=O)Me | Cl | H | O |

TABLE 602

| Compound Number | Y | W | Z | $R^1$ | $R^2$ | $R^3$ | $R^{10}$ | A |
|---|---|---|---|---|---|---|---|---|
| C-16431 | Me(R) | single bond | H | CH(Me)(c-Pr) | C(=O)Me | Cl | H | O |
| C-16432 | Me(S) | single bond | H | CH(Me)(c-Pr) | C(=O)Me | Cl | H | O |
| C-16433 | H | single bond | Me | CH(Me)(c-Pr) | C(=O)Me | Me | H | O |

TABLE 602-continued

| Compound Number | Y | W | Z | $R^1$ | $R^2$ | $R^3$ | $R^{10}$ | A |
|---|---|---|---|---|---|---|---|---|
| C-16434 | Me | single bond | H | CH(Me)(c-Pr) | C(=O)Me | Me | H | O |
| C-16435 | Me(R) | single bond | H | CH(Me)(c-Pr) | C(=O)Me | Me | H | O |
| C-16436 | Me(S) | single bond | H | CH(Me)(c-Pr) | C(=O)Me | Me | H | O |
| C-16437 | H | single bond | Me | $CH(Me)CH_2OMe$ | C(=O)Me | Cl | H | O |
| C-16438 | Me | single bond | H | $CH(Me)CH_2OMe$ | C(=O)Me | Cl | H | O |
| C-16439 | Me(R) | single bond | H | $CH(Me)CH_2OMe$ | C(=O)Me | Cl | H | O |
| C-16440 | Me(S) | single bond | H | $CH(Me)CH_2OMe$ | C(=O)Me | Cl | H | O |
| C-16441 | H | single bond | Me | $CH(Me)CH_2OMe$ | C(=O)Me | Me | H | O |
| C-16442 | Me | single bond | H | $CH(Me)CH_2OMe$ | C(=O)Me | Me | H | O |
| C-16443 | Me(R) | single bond | H | $CH(Me)CH_2OMe$ | C(=O)Me | Me | H | O |
| C-16444 | Me(S) | single bond | H | $CH(Me)CH_2OMe$ | C(=O)Me | Me | H | O |
| C-16445 | H | single bond | Me | $CH_2CH=CH_2$ | C(=O)Me | Cl | H | O |
| C-16446 | Me | single bond | H | $CH_2CH=CH_2$ | C(=O)Me | Cl | H | O |
| C-16447 | Me(R) | single bond | H | $CH_2CH=CH_2$ | C(=O)Me | Cl | H | O |
| C-16448 | Me(S) | single bond | H | $CH_2CH=CH_2$ | C(=O)Me | Cl | H | O |
| C-16449 | H | single bond | Me | $CH_2CH=CH_2$ | C(=O)Me | Me | H | O |
| C-16450 | Me | single bond | H | $CH_2CH=CH_2$ | C(=O)Me | Me | H | O |
| C-16451 | Me(R) | single bond | H | $CH_2CH=CH_2$ | C(=O)Me | Me | H | O |
| C-16452 | Me(S) | single bond | H | $CH_2CH=CH_2$ | C(=O)Me | Me | H | O |
| C-16453 | H | single bond | Me | CH2C≡CH | C(=O)Me | Cl | H | O |
| C-16454 | Me | single bond | H | CH2C≡CH | C(=O)Me | Cl | H | O |
| C-16455 | Me(R) | single bond | H | CH2C≡CH | C(=O)Me | Cl | H | O |
| C-16456 | Me(S) | single bond | H | CH2C≡CH | C(=O)Me | Cl | H | O |
| C-16457 | H | single bond | Me | CH2C≡CH | C(=O)Me | Me | H | O |
| C-16458 | Me | single bond | H | CH2C≡CH | C(=O)Me | Me | H | O |
| C-16459 | Me(R) | single bond | H | CH2C≡CH | C(=O)Me | Me | H | O |
| C-16460 | Me(S) | single bond | H | CH2C≡CH | C(=O)Me | Me | H | O |
| C-16461 | H | single bond | Me | $CH_2CN$ | C(=O)Me | Cl | H | O |
| C-16462 | Me | single bond | H | $CH_2CN$ | C(=O)Me | Cl | H | O |
| C-16463 | Me(R) | single bond | H | $CH_2CN$ | C(=O)Me | Cl | H | O |
| C-16464 | Me(S) | single bond | H | $CH_2CN$ | C(=O)Me | Cl | H | O |
| C-16465 | H | single bond | Me | $CH_2CN$ | C(=O)Me | Me | H | O |
| C-16466 | Me | single bond | H | $CH_2CN$ | C(=O)Me | Me | H | O |
| C-16467 | Me(R) | single bond | H | $CH_2CN$ | C(=O)Me | Me | H | O |
| C-16468 | Me(S) | single bond | H | $CH_2CN$ | C(=O)Me | Me | H | O |
| C-16469 | H | single bond | Me | CH(Me)CN | C(=O)Me | Cl | H | O |
| C-16470 | Me | single bond | H | CH(Me)CN | C(=O)Me | Cl | H | O |
| C-16471 | Me(R) | single bond | H | CH(Me)CN | C(=O)Me | Cl | H | O |
| C-16472 | Me(S) | single bond | H | CH(Me)CN | C(=O)Me | Cl | H | O |
| C-16473 | H | single bond | Me | CH(Me)CN | C(=O)Me | Me | H | O |
| C-16474 | Me | single bond | H | CH(Me)CN | C(=O)Me | Me | H | O |

TABLE 603

| Compound Number | Y | W | Z | $R^1$ | $R^2$ | $R^3$ | $R^{10}$ | A |
|---|---|---|---|---|---|---|---|---|
| C-16475 | Me(R) | single bond | H | CH(Me)CN | C(=O)Me | Me | H | O |
| C-16476 | Me(S) | single bond | H | CH(Me)CN | C(=O)Me | Me | H | O |
| C-16477 | H | single bond | Me | $C(Me)_2CN$ | C(=O)Me | Cl | H | O |
| C-16478 | Me | single bond | H | $C(Me)_2CN$ | C(=O)Me | Cl | H | O |
| C-16479 | Me(R) | single bond | H | $C(Me)_2CN$ | C(=O)Me | Cl | H | O |
| C-16480 | Me(S) | single bond | H | $C(Me)_2CN$ | C(=O)Me | Cl | H | O |
| C-16481 | H | single bond | Me | $C(Me)_2CN$ | C(=O)Me | Me | H | O |
| C-16482 | Me | single bond | H | $C(Me)_2CN$ | C(=O)Me | Me | H | O |
| C-16483 | Me(R) | single bond | H | $C(Me)_2CN$ | C(=O)Me | Me | H | O |
| C-16484 | Me(S) | single bond | H | $C(Me)_2CN$ | C(=O)Me | Me | H | O |
| C-16485 | H | single bond | Me | C(Me)(i-Pr)CN | C(=O)Me | Cl | H | O |
| C-16486 | Me | single bond | H | C(Me)(i-Pr)CN | C(=O)Me | Cl | H | O |
| C-16487 | Me(R) | single bond | H | C(Me)(i-Pr)CN | C(=O)Me | Cl | H | O |
| C-16488 | Me(S) | single bond | H | C(Me)(i-Pr)CN | C(=O)Me | Cl | H | O |
| C-16489 | H | single bond | Me | C(Me)(i-Pr)CN | C(=O)Me | Me | H | O |
| C-16490 | Me | single bond | H | C(Me)(i-Pr)CN | C(=O)Me | Me | H | O |
| C-16491 | Me(R) | single bond | H | C(Me)(i-Pr)CN | C(=O)Me | Me | H | O |
| C-16492 | Me(S) | single bond | H | C(Me)(i-Pr)CN | C(=O)Me | Me | H | O |
| C-16493 | H | single bond | Me | OMe | C(=O)Me | Cl | H | O |
| C-16494 | Me | single bond | H | OMe | C(=O)Me | Cl | H | O |
| C-16495 | Me(R) | single bond | H | OMe | C(=O)Me | Cl | H | O |
| C-16496 | Me(S) | single bond | H | OMe | C(=O)Me | Cl | H | O |
| C-16497 | H | single bond | Me | OMe | C(=O)Me | Me | H | O |
| C-16498 | Me | single bond | H | OMe | C(=O)Me | Me | H | O |
| C-16499 | Me(R) | single bond | H | OMe | C(=O)Me | Me | H | O |
| C-16500 | Me(S) | single bond | H | OMe | C(=O)Me | Me | H | O |

TABLE 603-continued

| Compound Number | Y | W | Z | $R^1$ | $R^2$ | $R^3$ | $R^{10}$ | A |
|---|---|---|---|---|---|---|---|---|
| C-16501 | H | single bond | Me | CH═NOMe | C(═O)Me | Cl | H | O |
| C-16502 | Me | single bond | H | CH═NOMe | C(═O)Me | Cl | H | O |
| C-16503 | Me(R) | single bond | H | CH═NOMe | C(═O)Me | Cl | H | O |
| C-16504 | Me(S) | single bond | H | CH═NOMe | C(═O)Me | Cl | H | O |
| C-16505 | H | single bond | Me | CH═NOMe | C(═O)Me | Me | H | O |
| C-16506 | Me | single bond | H | CH═NOMe | C(═O)Me | Me | H | O |
| C-16507 | Me(R) | single bond | H | CH═NOMe | C(═O)Me | Me | H | O |
| C-16508 | Me(S) | single bond | H | CH═NOMe | C(═O)Me | Me | H | O |
| C-16509 | H | single bond | Me | morpholin-4-yl | C(═O)Me | Cl | H | O |
| C-16510 | Me | single bond | H | morpholin-4-yl | C(═O)Me | Cl | H | O |
| C-16511 | Me(R) | single bond | H | morpholin-4-yl | C(═O)Me | Cl | H | O |
| C-16512 | Me(S) | single bond | H | morpholin-4-yl | C(═O)Me | Cl | H | O |
| C-16513 | H | single bond | Me | morpholin-4-yl | C(═O)Me | Me | H | O |
| C-16514 | Me | single bond | H | morpholin-4-yl | C(═O)Me | Me | H | O |
| C-16515 | Me(R) | single bond | H | morpholin-4-yl | C(═O)Me | Me | H | O |
| C-16516 | Me(S) | single bond | H | morpholin-4-yl | C(═O)Me | Me | H | O |
| C-16517 | H | single bond | Me | Ph | C(═O)Me | Cl | H | O |
| C-16518 | Me | single bond | H | Ph | C(═O)Me | Cl | H | O |

TABLE 604

| Compound Number | Y | W | Z | $R^1$ | $R^2$ | $R^3$ | $R^{10}$ | A |
|---|---|---|---|---|---|---|---|---|
| C-16519 | Me(R) | single bond | H | Ph | C(═O)Me | Cl | H | O |
| C-16520 | Me(S) | single bond | H | Ph | C(═O)Me | Cl | H | O |
| C-16521 | H | single bond | Me | Ph | C(═O)Me | Me | H | O |
| C-16522 | Me | single bond | H | Ph | C(═O)Me | Me | H | O |
| C-16523 | Me(R) | single bond | H | Ph | C(═O)Me | Me | H | O |
| C-16524 | Me(S) | single bond | H | Ph | C(═O)Me | Me | H | O |
| C-16525 | H | single bond | Me | $CH_2Ph$ | C(═O)Me | Cl | H | O |
| C-16526 | Me | single bond | H | $CH_2Ph$ | C(═O)Me | Cl | H | O |
| C-16527 | Me(R) | single bond | H | $CH_2Ph$ | C(═O)Me | Cl | H | O |
| C-16528 | Me(S) | single bond | H | $CH_2Ph$ | C(═O)Me | Cl | H | O |
| C-16529 | H | single bond | Me | $CH_2Ph$ | C(═O)Me | Me | H | O |
| C-16530 | Me | single bond | H | $CH_2Ph$ | C(═O)Me | Me | H | O |
| C-16531 | Me(R) | single bond | H | $CH_2Ph$ | C(═O)Me | Me | H | O |
| C-16532 | Me(S) | single bond | H | $CH_2Ph$ | C(═O)Me | Me | H | O |
| C-16533 | H | single bond | Me | thiazole-2-yl | C(═O)Me | Cl | H | O |
| C-16534 | Me | single bond | H | thiazole-2-yl | C(═O)Me | Cl | H | O |
| C-16535 | Me(R) | single bond | H | thiazole-2-yl | C(═O)Me | Cl | H | O |
| C-16536 | Me(S) | single bond | H | thiazole-2-yl | C(═O)Me | Cl | H | O |
| C-16537 | H | single bond | Me | thiazole-2-yl | C(═O)Me | Me | H | O |
| C-16538 | Me | single bond | H | thiazole-2-yl | C(═O)Me | Me | H | O |
| C-16539 | Me(R) | single bond | H | thiazole-2-yl | C(═O)Me | Me | H | O |
| C-16540 | Me(S) | single bond | H | thiazole-2-yl | C(═O)Me | Me | H | O |
| C-16541 | H | single bond | Me | 1-Me-pyrazol-3-yl | C(═O)Me | Cl | H | O |
| C-16542 | Me | single bond | H | 1-Me-pyrazol-3-yl | C(═O)Me | Cl | H | O |
| C-16543 | Me(R) | single bond | H | 1-Me-pyrazol-3-yl | C(═O)Me | Cl | H | O |
| C-16544 | Me(S) | single bond | H | 1-Me-pyrazol-3-yl | C(═O)Me | Cl | H | O |
| C-16545 | H | single bond | Me | 1-Me-pyrazol-3-yl | C(═O)Me | Me | H | O |
| C-16546 | Me | single bond | H | 1-Me-pyrazol-3-yl | C(═O)Me | Me | H | O |
| C-16547 | Me(R) | single bond | H | 1-Me-pyrazol-3-yl | C(═O)Me | Me | H | O |
| C-16548 | Me(S) | single bond | H | 1-Me-pyrazol-3-yl | C(═O)Me | Me | H | O |
| C-16549 | H | single bond | Me | 1-Me-pyrazol-5-yl | C(═O)Me | Cl | H | O |
| C-16550 | Me | single bond | H | 1-Me-pyrazol-5-yl | C(═O)Me | Cl | H | O |
| C-16551 | Me(R) | single bond | H | 1-Me-pyrazol-5-yl | C(═O)Me | Cl | H | O |
| C-16552 | Me(S) | single bond | H | 1-Me-pyrazol-5-yl | C(═O)Me | Cl | H | O |
| C-16553 | H | single bond | Me | 1-Me-pyrazol-5-yl | C(═O)Me | Me | H | O |
| C-16554 | Me | single bond | H | 1-Me-pyrazol-5-yl | C(═O)Me | Me | H | O |
| C-16555 | Me(R) | single bond | H | 1-Me-pyrazol-5-yl | C(═O)Me | Me | H | O |
| C-16556 | Me(S) | single bond | H | 1-Me-pyrazol-5-yl | C(═O)Me | Me | H | O |
| C-16557 | H | single bond | Me | $CH_2$(pyrimidin-2-yl) | C(═O)Me | Cl | H | O |
| C-16558 | Me | single bond | H | $CH_2$(pyrimidin-2-yl) | C(═O)Me | Cl | H | O |
| C-16559 | Me(R) | single bond | H | $CH_2$(pyrimidin-2-yl) | C(═O)Me | Cl | H | O |
| C-16560 | Me(S) | single bond | H | $CH_2$(pyrimidin-2-yl) | C(═O)Me | Cl | H | O |
| C-16561 | H | single bond | Me | $CH_2$(pyrimidin-2-yl) | C(═O)Me | Me | H | O |
| C-16562 | Me | single bond | H | $CH_2$(pyrimidin-2-yl) | C(═O)Me | Me | H | O |

TABLE 605

| Compound Number | Y | W | Z | $R^1$ | $R^2$ | $R^3$ | $R^{10}$ | A |
|---|---|---|---|---|---|---|---|---|
| C-16563 | Me(R) | single bond | H | $CH_2$(pyrimidin-2-yl) | C(=O)Me | Me | H | O |
| C-16564 | Me(S) | single bond | H | $CH_2$(pyrimidin-2-yl) | C(=O)Me | Me | H | O |
| C-16565 | H | single bond | Me | Me | C(=O)Me | Cl | Me | O |
| C-16566 | Me | single bond | H | Me | C(=O)Me | Cl | Me | O |
| C-16567 | Me(R) | single bond | H | Me | C(=O)Me | Cl | Me | O |
| C-16568 | Me(S) | single bond | H | Me | C(=O)Me | Cl | Me | O |
| C-16569 | H | single bond | Me | Me | C(=O)Me | Me | Me | O |
| C-16570 | Me | single bond | H | Me | C(=O)Me | Me | Me | O |
| C-16571 | Me(R) | single bond | H | Me | C(=O)Me | Me | Me | O |
| C-16572 | Me(S) | single bond | H | Me | C(=O)Me | Me | Me | O |
| C-16573 | H | single bond | Me | $CH_2CHF_2$ | C(=O)Me | Cl | Me | O |
| C-16574 | Me | single bond | H | $CH_2CHF_2$ | C(=O)Me | Cl | Me | O |
| C-16575 | Me(R) | single bond | H | $CH_2CHF_2$ | C(=O)Me | Cl | Me | O |
| C-16576 | Me(S) | single bond | H | $CH_2CHF_2$ | C(=O)Me | Cl | Me | O |
| C-16577 | H | single bond | Me | $CH_2CHF_2$ | C(=O)Me | Me | Me | O |
| C-16578 | Me | single bond | H | $CH_2CHF_2$ | C(=O)Me | Me | Me | O |
| C-16579 | Me(R) | single bond | H | $CH_2CHF_2$ | C(=O)Me | Me | Me | O |
| C-16580 | Me(S) | single bond | H | $CH_2CHF_2$ | C(=O)Me | Me | Me | O |
| C-16581 | H | single bond | Me | n-Pr | C(=O)Me | Cl | Me | O |
| C-16582 | Me | single bond | H | n-Pr | C(=O)Me | Cl | Me | O |
| C-16583 | Me(R) | single bond | H | n-Pr | C(=O)Me | Cl | Me | O |
| C-16584 | Me(S) | single bond | H | n-Pr | C(=O)Me | Cl | Me | O |
| C-16585 | H | single bond | Me | n-Pr | C(=O)Me | Me | Me | O |
| C-16586 | Me | single bond | H | n-Pr | C(=O)Me | Me | Me | O |
| C-16587 | Me(R) | single bond | H | n-Pr | C(=O)Me | Me | Me | O |
| C-16588 | Me(S) | single bond | H | n-Pr | C(=O)Me | Me | Me | O |
| C-16589 | H | single bond | Me | i-Pr | C(=O)Me | Cl | Me | O |
| C-16590 | Me | single bond | H | i-Pr | C(=O)Me | Cl | Me | O |
| C-16591 | Me(R) | single bond | H | i-Pr | C(=O)Me | Cl | Me | O |
| C-16592 | Me(S) | single bond | H | i-Pr | C(=O)Me | Cl | Me | O |
| C-16593 | H | single bond | Me | i-Pr | C(=O)Me | Me | Me | O |
| C-16594 | Me | single bond | H | i-Pr | C(=O)Me | Me | Me | O |
| C-16595 | Me(R) | single bond | H | i-Pr | C(=O)Me | Me | Me | O |
| C-16596 | Me(S) | single bond | H | i-Pr | C(=O)Me | Me | Me | O |
| C-16597 | H | single bond | Me | c-Pr(1-F) | C(=O)Me | Cl | Me | O |
| C-16598 | Me | single bond | H | c-Pr(1-F) | C(=O)Me | Cl | Me | O |
| C-16599 | Me(R) | single bond | H | c-Pr(1-F) | C(=O)Me | Cl | Me | O |
| C-16600 | Me(S) | single bond | H | c-Pr(1-F) | C(=O)Me | Cl | Me | O |
| C-16601 | H | single bond | Me | c-Pr(1-F) | C(=O)Me | Me | Me | O |
| C-16602 | Me | single bond | H | c-Pr(1-F) | C(=O)Me | Me | Me | O |
| C-16603 | Me(R) | single bond | H | c-Pr(1-F) | C(=O)Me | Me | Me | O |
| C-16604 | Me(S) | single bond | H | c-Pr(1-F) | C(=O)Me | Me | Me | O |
| C-16605 | H | single bond | Me | c-Pr(2,2-$F_2$) | C(=O)Me | Cl | Me | O |
| C-16606 | Me | single bond | H | c-Pr(2,2-$F_2$) | C(=O)Me | Cl | Me | O |

TABLE 606

| Compound Number | Y | W | Z | $R^1$ | $R^2$ | $R^3$ | $R^{10}$ | A |
|---|---|---|---|---|---|---|---|---|
| C-16607 | Me(R) | single bond | H | c-Pr(2,2-$F_2$) | C(=O)Me | Cl | Me | O |
| C-16608 | Me(S) | single bond | H | c-Pr(2,2-$F_2$) | C(=O)Me | Cl | Me | O |
| C-16609 | H | single bond | Me | c-Pr(2,2-$F_2$) | C(=O)Me | Me | Me | O |
| C-16610 | Me | single bond | H | c-Pr(2,2-$F_2$) | C(=O)Me | Me | Me | O |
| C-16611 | Me(R) | single bond | H | c-Pr(2,2-$F_2$) | C(=O)Me | Me | Me | O |
| C-16612 | Me(S) | single bond | H | c-Pr(2,2-$F_2$) | C(=O)Me | Me | Me | O |
| C-16613 | H | single bond | Me | c-Pr(1-Cl) | C(=O)Me | Cl | Me | O |
| C-16614 | Me | single bond | H | c-Pr(1-Cl) | C(=O)Me | Cl | Me | O |
| C-16615 | Me(R) | single bond | H | c-Pr(1-Cl) | C(=O)Me | Cl | Me | O |
| C-16616 | Me(S) | single bond | H | c-Pr(1-Cl) | C(=O)Me | Cl | Me | O |
| C-16617 | H | single bond | Me | c-Pr(1-Cl) | C(=O)Me | Me | Me | O |
| C-16618 | Me | single bond | H | c-Pr(1-Cl) | C(=O)Me | Me | Me | O |
| C-16619 | Me(R) | single bond | H | c-Pr(1-Cl) | C(=O)Me | Me | Me | O |
| C-16620 | Me(S) | single bond | H | c-Pr(1-Cl) | C(=O)Me | Me | Me | O |
| C-16621 | H | single bond | Me | c-Pr(1-Br) | C(=O)Me | Cl | Me | O |
| C-16622 | Me | single bond | H | c-Pr(1-Br) | C(=O)Me | Cl | Me | O |
| C-16623 | Me(R) | single bond | H | c-Pr(1-Br) | C(=O)Me | Cl | Me | O |
| C-16624 | Me(S) | single bond | H | c-Pr(1-Br) | C(=O)Me | Cl | Me | O |
| C-16625 | H | single bond | Me | c-Pr(1-Br) | C(=O)Me | Me | Me | O |
| C-16626 | Me | single bond | H | c-Pr(1-Br) | C(=O)Me | Me | Me | O |
| C-16627 | Me(R) | single bond | H | c-Pr(1-Br) | C(=O)Me | Me | Me | O |
| C-16628 | Me(S) | single bond | H | c-Pr(1-Br) | C(=O)Me | Me | Me | O |
| C-16629 | H | single bond | Me | c-Pr(1-Me) | C(=O)Me | Cl | Me | O |

TABLE 606-continued

| Compound Number | Y | W | Z | $R^1$ | $R^2$ | $R^3$ | $R^{10}$ | A |
|---|---|---|---|---|---|---|---|---|
| C-16630 | Me | single bond | H | c-Pr(1-Me) | C(=O)Me | Cl | Me | O |
| C-16631 | Me(R) | single bond | H | c-Pr(1-Me) | C(=O)Me | Cl | Me | O |
| C-16632 | Me(S) | single bond | H | c-Pr(1-Me) | C(=O)Me | Cl | Me | O |
| C-16633 | H | single bond | Me | c-Pr(1-Me) | C(=O)Me | Me | Me | O |
| C-16634 | Me | single bond | H | c-Pr(1-Me) | C(=O)Me | Me | Me | O |
| C-16635 | Me(R) | single bond | H | c-Pr(1-Me) | C(=O)Me | Me | Me | O |
| C-16636 | Me(S) | single bond | H | c-Pr(1-Me) | C(=O)Me | Me | Me | O |
| C-16637 | H | single bond | Me | c-Pr(1-$CH_2$OH) | C(=O)Me | Cl | Me | O |
| C-16638 | Me | single bond | H | c-Pr(1-$CH_2$OH) | C(=O)Me | Cl | Me | O |
| C-16639 | Me(R) | single bond | H | c-Pr(1-$CH_2$OH) | C(=O)Me | Cl | Me | O |
| C-16640 | Me(S) | single bond | H | c-Pr(1-$CH_2$OH) | C(=O)Me | Cl | Me | O |
| C-16641 | H | single bond | Me | c-Pr(1-$CH_2$OH) | C(=O)Me | Me | Me | O |
| C-16642 | Me | single bond | H | c-Pr(1-$CH_2$OH) | C(=O)Me | Me | Me | O |
| C-16643 | Me(R) | single bond | H | c-Pr(1-$CH_2$OH) | C(=O)Me | Me | Me | O |
| C-16644 | Me(S) | single bond | H | c-Pr(1-$CH_2$OH) | C(=O)Me | Me | Me | O |
| C-16645 | H | single bond | Me | c-Pr[1-$CH_2$OS(=O)$_2$Me] | C(=O)Me | Cl | Me | O |
| C-16646 | Me | single bond | H | c-Pr[1-$CH_2$OS(=O)$_2$Me] | C(=O)Me | Cl | Me | O |
| C-16647 | Me(R) | single bond | H | c-Pr[1-$CH_2$OS(=O)$_2$Me] | C(=O)Me | Cl | Me | O |
| C-16648 | Me(S) | single bond | H | c-Pr[1-$CH_2$OS(=O)$_2$Me] | C(=O)Me | Cl | Me | O |
| C-16649 | H | single bond | Me | c-Pr[1-$CH_2$OS(=O)$_2$Me] | C(=O)Me | Me | Me | O |
| C-16650 | Me | single bond | H | c-Pr[1-$CH_2$OS(=O)$_2$Me] | C(=O)Me | Me | Me | O |

TABLE 607

| Compound Number | Y | W | Z | $R^1$ | $R^2$ | $R^3$ | $R^{10}$ | A |
|---|---|---|---|---|---|---|---|---|
| C-16651 | Me(R) | single bond | H | c-Pr[1-$CH_2$OS(=O)$_2$Me] | C(=O)Me | Me | Me | O |
| C-16652 | Me(S) | single bond | H | c-Pr[1-$CH_2$OS(=O)$_2$Me] | C(=O)Me | Me | Me | O |
| C-16653 | H | single bond | Me | c-Pr(1-$CH_2$OMe) | C(=O)Me | Cl | Me | O |
| C-16654 | Me | single bond | H | c-Pr(1-$CH_2$OMe) | C(=O)Me | Cl | Me | O |
| C-16655 | Me(R) | single bond | H | c-Pr(1-$CH_2$OMe) | C(=O)Me | Cl | Me | O |
| C-16656 | Me(S) | single bond | H | c-Pr(1-$CH_2$OMe) | C(=O)Me | Cl | Me | O |
| C-16657 | H | single bond | Me | c-Pr(1-$CH_2$OMe) | C(=O)Me | Me | Me | O |
| C-16658 | Me | single bond | H | c-Pr(1-$CH_2$OMe) | C(=O)Me | Me | Me | O |
| C-16659 | Me(R) | single bond | H | c-Pr(1-$CH_2$OMe) | C(=O)Me | Me | Me | O |
| C-16660 | Me(S) | single bond | H | c-Pr(1-$CH_2$OMe) | C(=O)Me | Me | Me | O |
| C-16661 | H | single bond | Me | c-Pr(1-$CH_2$CN) | C(=O)Me | Cl | Me | O |
| C-16662 | Me | single bond | H | c-Pr(1-$CH_2$CN) | C(=O)Me | Cl | Me | O |
| C-16663 | Me(R) | single bond | H | c-Pr(1-$CH_2$CN) | C(=O)Me | C | Me | O |
| C-16664 | Me(S) | single bond | H | c-Pr(1-$CH_2$CN) | C(=O)Me | Cl | Me | O |
| C-16665 | H | single bond | Me | c-Pr(1-$CH_2$CN) | C(=O)Me | Me | Me | O |
| C-16666 | Me | single bond | H | c-Pr(1-$CH_2$CN) | C(=O)Me | Me | Me | O |
| C-16667 | Me(R) | single bond | H | c-Pr(1-$CH_2$CN) | C(=O)Me | Me | Me | O |
| C-16668 | Me(S) | single bond | H | c-Pr(1-$CH_2$CN) | C(=O)Me | Me | Me | O |
| C-16669 | H | single bond | Me | c-Pr(1-$CH_2$SMe) | C(=O)Me | Cl | Me | O |
| C-16670 | Me | single bond | H | c-Pr(1-$CH_2$SMe) | C(=O)Me | Cl | Me | O |
| C-16671 | Me(R) | single bond | H | c-Pr(1-$CH_2$SMe) | C(=O)Me | C | Me | O |
| C-16672 | Me(S) | single bond | H | c-Pr(1-$CH_2$SMe) | C(=O)Me | Cl | Me | O |
| C-16673 | H | single bond | Me | c-Pr(1-$CH_2$SMe) | C(=O)Me | Me | Me | O |
| C-16674 | Me | single bond | H | c-Pr(1-$CH_2$SMe) | C(=O)Me | Me | Me | O |
| C-16675 | Me(R) | single bond | H | c-Pr(1-$CH_2$SMe) | C(=O)Me | Me | Me | O |
| C-16676 | Me(S) | single bond | H | c-Pr(1-$CH_2$SMe) | C(=O)Me | Me | Me | O |
| C-16677 | H | single bond | Me | c-Pr[1-$CH_2$S(=O)Me] | C(=O)Me | Cl | Me | O |
| C-16678 | Me | single bond | H | c-Pr[1-$CH_2$S(=O)Me] | C(=O)Me | C | Me | O |
| C-16679 | Me(R) | single bond | H | c-Pr[1-$CH_2$S(=O)Me] | C(=O)Me | Cl | Me | O |
| C-16680 | Me(S) | single bond | H | c-Pr[1-$CH_2$S(=O)Me] | C(=O)Me | Cl | Me | O |
| C-16681 | H | single bond | Me | c-Pr[1-$CH_2$S(=O)Me] | C(=O)Me | Me | Me | O |
| C-16682 | Me | single bond | H | c-Pr[1-$CH_2$S(=O)Me] | C(=O)Me | Me | Me | O |
| C-16683 | Me(R) | single bond | H | c-Pr[1-$CH_2$S(=O)Me] | C(=O)Me | Me | Me | O |
| C-16684 | Me(S) | single bond | H | c-Pr[1-$CH_2$S(=O)Me] | C(=O)Me | Me | Me | O |
| C-16685 | H | single bond | Me | c-Pr[1-$CH_2$S(=O)$_2$Me] | C(=O)Me | Cl | Me | O |
| C-16686 | Me | single bond | H | c-Pr[1-$CH_2$S(=O)$_2$Me] | C(=O)Me | C | Me | O |
| C-16687 | Me(R) | single bond | H | c-Pr[1-$CH_2$S(=O)$_2$Me] | C(=O)Me | Cl | Me | O |
| C-16688 | Me(S) | single bond | H | c-Pr[1-$CH_2$S(=O)$_2$Me] | C(=O)Me | Cl | Me | O |
| C-16689 | H | single bond | Me | c-Pr[1-$CH_2$S(=O)$_2$Me] | C(=O)Me | Me | Me | O |
| C-16690 | Me | single bond | H | c-Pr[1-$CH_2$S(=O)$_2$Me] | C(=O)Me | Me | Me | O |
| C-16691 | Me(R) | single bond | H | c-Pr[1-$CH_2$S(=O)$_2$Me] | C(=O)Me | Me | Me | O |
| C-16692 | Me(S) | single bond | H | c-Pr[1-$CH_2$S(=O)$_2$Me] | C(=O)Me | Me | Me | O |
| C-16693 | H | single bond | Me | c-Pr(1-$CH_2$F) | C(=O)Me | Cl | Me | O |
| C-16694 | Me | single bond | H | c-Pr(1-$CH_2$F) | C(=O)Me | C | Me | O |

TABLE 608

| Compound Number | Y | W | Z | $R^1$ | $R^2$ | $R^3$ | $R^{10}$ | A |
|---|---|---|---|---|---|---|---|---|
| C-16695 | Me(R) | single bond | H | c-Pr(1-$CH_2F$) | C(=O)Me | Cl | Me | O |
| C-16696 | Me(S) | single bond | H | c-Pr(1-$CH_2F$) | C(=O)Me | Cl | Me | O |
| C-16697 | H | single bond | Me | c-Pr(1-$CH_2F$) | C(=O)Me | Me | Me | O |
| C-16698 | Me | single bond | H | c-Pr(1-$CH_2F$) | C(=O)Me | Me | Me | O |
| C-16699 | Me(R) | single bond | H | c-Pr(1-$CH_2F$) | C(=O)Me | Me | Me | O |
| C-16700 | Me(S) | single bond | H | c-Pr(1-$CH_2F$) | C(=O)Me | Me | Me | O |
| C-16701 | H | single bond | Me | c-Pr(1-$CHF_2$) | C(=O)Me | Cl | Me | O |
| C-16702 | Me | single bond | H | c-Pr(1-$CHF_2$) | C(=O)Me | C | Me | O |
| C-16703 | Me(R) | single bond | H | c-Pr(1-$CHF_2$) | C(=O)Me | Cl | Me | O |
| C-16704 | Me(S) | single bond | H | c-Pr(1-$CHF_2$) | C(=O)Me | Cl | Me | O |
| C-16705 | H | single bond | Me | c-Pr(1-$CHF_2$) | C(=O)Me | Me | Me | O |
| C-16706 | Me | single bond | H | c-Pr(1-$CHF_2$) | C(=O)Me | Me | Me | O |
| C-16707 | Me(R) | single bond | H | c-Pr(1-$CHF_2$) | C(=O)Me | Me | Me | O |
| C-16708 | Me(S) | single bond | H | c-Pr(1-$CHF_2$) | C(=O)Me | Me | Me | O |
| C-16709 | H | single bond | Me | c-Pr(1-$CF_3$) | C(=O)Me | Cl | Me | O |
| C-16710 | Me | single bond | H | c-Pr(1-$CF_3$) | C(=O)Me | Cl | Me | O |
| C-16711 | Me(R) | single bond | H | c-Pr(1-$CF_3$) | C(=O)Me | Cl | Me | O |
| C-16712 | Me(S) | single bond | H | c-Pr(1-$CF_3$) | C(=O)Me | Cl | Me | O |
| C-16713 | H | single bond | Me | c-Pr(1-$CF_3$) | C(=O)Me | Me | Me | O |
| C-16714 | Me | single bond | H | c-Pr(1-$CF_3$) | C(=O)Me | Me | Me | O |
| C-16715 | Me(R) | single bond | H | c-Pr(1-$CF_3$) | C(=O)Me | Me | Me | O |
| C-16716 | Me(S) | single bond | H | c-Pr(1-$CF_3$) | C(=O)Me | Me | Me | O |
| C-16717 | H | single bond | Me | c-Pr(1-C≡CH) | C(=O)Me | Cl | Me | O |
| C-16718 | Me | single bond | H | c-Pr(1-C≡CH) | C(=O)Me | Cl | Me | O |
| C-16719 | Me(R) | single bond | H | c-Pr(1-C≡CH) | C(=O)Me | Cl | Me | O |
| C-16720 | Me(S) | single bond | H | c-Pr(1-C≡CH) | C(=O)Me | Cl | Me | O |
| C-16721 | H | single bond | Me | c-Pr(1-C≡CH) | C(=O)Me | Me | Me | O |
| C-16722 | Me | single bond | H | c-Pr(1-C≡CH) | C(=O)Me | Me | Me | O |
| C-16723 | Me(R) | single bond | H | c-Pr(1-C≡CH) | C(=O)Me | Me | Me | O |
| C-16724 | Me(S) | single bond | H | c-Pr(1-C≡CH) | C(=O)Me | Me | Me | O |
| C-16725 | H | single bond | Me | c-Pr[1-C(=O)OEt] | C(=O)Me | Cl | Me | O |
| C-16726 | Me | single bond | H | c-Pr[1-C(=O)OEt] | C(=O)Me | Cl | Me | O |
| C-16727 | Me(R) | single bond | H | c-Pr[1-C(=O)OEt] | C(=O)Me | Cl | Me | O |
| C-16728 | Me(S) | single bond | H | c-Pr[1-C(=O)OEt] | C(=O)Me | Cl | Me | O |
| C-16729 | H | single bond | Me | c-Pr[1-C(=O)OEt] | C(=O)Me | Me | Me | O |
| C-16730 | Me | single bond | H | c-Pr[1-C(=O)OEt] | C(=O)Me | Me | Me | O |
| C-16731 | Me(R) | single bond | H | c-Pr[1-C(=O)OEt] | C(=O)Me | Me | Me | O |
| C-16732 | Me(S) | single bond | H | c-Pr[1-C(=O)OEt] | C(=O)Me | Me | Me | O |
| C-16733 | H | single bond | Me | c-Pr[1-C(=O)OH] | C(=O)Me | Cl | Me | O |
| C-16734 | Me | single bond | H | c-Pr[1-C(=O)OH] | C(=O)Me | Cl | Me | O |
| C-16735 | Me(R) | single bond | H | c-Pr[1-C(=O)OH] | C(=O)Me | Cl | Me | O |
| C-16736 | Me(S) | single bond | H | c-Pr[1-C(=O)OH] | C(=O)Me | Cl | Me | O |
| C-16737 | H | single bond | Me | c-Pr[1-C(=O)OH] | C(=O)Me | Me | Me | O |
| C-16738 | Me | single bond | H | c-Pr[1-C(=O)OH] | C(=O)Me | Me | Me | O |

TABLE 609

| Compound Number | Y | W | Z | $R^1$ | $R^2$ | $R^3$ | $R^{10}$ | A |
|---|---|---|---|---|---|---|---|---|
| C-16739 | Me(R) | single bond | H | c-Pr[1-C(=O)OH] | C(=O)Me | Me | Me | O |
| C-16740 | Me(S) | single bond | H | c-Pr[1-C(=O)OH] | C(=O)Me | Me | Me | O |
| C-16741 | H | single bond | Me | c-Pr[1-C(=O)$NH_2$] | C(=O)Me | Cl | Me | O |
| C-16742 | Me | single bond | H | c-Pr[1-C(=O)$NH_2$] | C(=O)Me | Cl | Me | O |
| C-16743 | Me(R) | single bond | H | c-Pr[1-C(=O)$NH_2$] | C(=O)Me | Cl | Me | O |
| C-16744 | Me(S) | single bond | H | c-Pr[1-C(=O)$NH_2$] | C(=O)Me | Cl | Me | O |
| C-16745 | H | single bond | Me | c-Pr[1-C(=O)$NH_2$] | C(=O)Me | Me | Me | O |
| C-16746 | Me | single bond | H | c-Pr[1-C(=O)$NH_2$] | C(=O)Me | Me | Me | O |
| C-16747 | Me(R) | single bond | H | c-Pr[1-C(=O)$NH_2$] | C(=O)Me | Me | Me | O |
| C-16748 | Me(S) | single bond | H | c-Pr[1-C(=O)$NH_2$] | C(=O)Me | Me | Me | O |
| C-16749 | H | single bond | Me | c-Pr(1-OMe) | C(=O)Me | Cl | Me | O |
| C-16750 | Me | single bond | H | c-Pr(1-OMe) | C(=O)Me | Cl | Me | O |
| C-16751 | Me(R) | single bond | H | c-Pr(1-OMe) | C(=O)Me | Cl | Me | O |
| C-16752 | Me(S) | single bond | H | c-Pr(1-OMe) | C(=O)Me | Cl | Me | O |
| C-16753 | H | single bond | Me | c-Pr(1-OMe) | C(=O)Me | Me | Me | O |
| C-16754 | Me | single bond | H | c-Pr(1-OMe) | C(=O)Me | Me | Me | O |
| C-16755 | Me(R) | single bond | H | c-Pr(1-OMe) | C(=O)Me | Me | Me | O |
| C-16756 | Me(S) | single bond | H | c-Pr(1-OMe) | C(=O)Me | Me | Me | O |
| C-16757 | H | single bond | Me | c-Pr(1-SMe) | C(=O)Me | Cl | Me | O |
| C-16758 | Me | single bond | H | c-Pr(1-SMe) | C(=O)Me | Cl | Me | O |
| C-16759 | Me(R) | single bond | H | c-Pr(1-SMe) | C(=O)Me | Cl | Me | O |

TABLE 609-continued

| Compound Number | Y | W | Z | $R^1$ | $R^2$ | $R^3$ | $R^{10}$ | A |
|---|---|---|---|---|---|---|---|---|
| C-16760 | Me(S) | single bond | H | c-Pr(1-SMe) | C(═O)Me | Cl | Me | O |
| C-16761 | H | single bond | Me | c-Pr(1-SMe) | C(═O)Me | Me | Me | O |
| C-16762 | Me | single bond | H | c-Pr(1-SMe) | C(═O)Me | Me | Me | O |
| C-16763 | Me(R) | single bond | H | c-Pr(1-SMe) | C(═O)Me | Me | Me | O |
| C-16764 | Me(S) | single bond | H | c-Pr(1-SMe) | C(═O)Me | Me | Me | O |
| C-16765 | H | single bond | Me | c-Pr[1-S(═O)Me] | C(═O)Me | Cl | Me | O |
| C-16766 | Me | single bond | H | c-Pr[1-S(═O)Me] | C(═O)Me | Cl | Me | O |
| C-16767 | Me(R) | single bond | H | c-Pr[1-S(═O)Me] | C(═O)Me | Cl | Me | O |
| C-16768 | Me(S) | single bond | H | c-Pr[1-S(═O)Me] | C(═O)Me | C | Me | O |
| C-16769 | H | single bond | Me | c-Pr[1-S(═O)Me] | C(═O)Me | Me | Me | O |
| C-16770 | Me | single bond | H | c-Pr[1-S(═O)Me] | C(═O)Me | Me | Me | O |
| C-16771 | Me(R) | single bond | H | c-Pr[1-S(═O)Me] | C(═O)Me | Me | Me | O |
| C-16772 | Me(S) | single bond | H | c-Pr[1-S(═O)Me] | C(═O)Me | Me | Me | O |
| C-16773 | H | single bond | Me | c-Pr[1-S(═O)$_2$Me] | C(═O)Me | Cl | Me | O |
| C-16774 | Me | single bond | H | c-Pr[1-S(═O)$_2$Me] | C(═O)Me | Cl | Me | O |
| C-16775 | Me(R) | single bond | H | c-Pr[1-S(═O)$_2$Me] | C(═O)Me | Cl | Me | O |
| C-16776 | Me(S) | single bond | H | c-Pr[1-S(═O)$_2$Me] | C(═O)Me | Cl | Me | O |
| C-16777 | H | single bond | Me | c-Pr[1-S(═O)$_2$Me] | C(═O)Me | Me | Me | O |
| C-16778 | Me | single bond | H | c-Pr[1-S(═O)$_2$Me] | C(═O)Me | Me | Me | O |
| C-16779 | Me(R) | single bond | H | c-Pr[1-S(═O)$_2$Me] | C(═O)Me | Me | Me | O |
| C-16780 | Me(S) | single bond | H | c-Pr[1-S(═O)$_2$Me] | C(═O)Me | Me | Me | O |
| C-16781 | H | single bond | Me | c-Pr[1-S(═O)$_2$CHF$_2$] | C(═O)Me | Cl | Me | O |
| C-16782 | Me | single bond | H | c-Pr[1-S(═O)$_2$CHF$_2$] | C(═O)Me | Cl | Me | O |

TABLE 610

| Compound Number | Y | W | Z | $R^1$ | $R^2$ | $R^3$ | $R^{10}$ | A |
|---|---|---|---|---|---|---|---|---|
| C-16783 | Me(R) | single bond | H | c-Pr[1-S(═O)$_2$CHF$_2$] | C(═O)Me | Cl | Me | O |
| C-16784 | Me(S) | single bond | H | c-Pr[1-S(═O)$_2$CHF$_2$] | C(═O)Me | Cl | Me | O |
| C-16785 | H | single bond | Me | c-Pr[1-S(═O)$_2$CHF$_2$] | C(═O)Me | Me | Me | O |
| C-16786 | Me | single bond | H | c-Pr[1-S(═O)$_2$CHF$_2$] | C(═O)Me | Me | Me | O |
| C-16787 | Me(R) | single bond | H | c-Pr[1-S(═O)$_2$CHF$_2$] | C(═O)Me | Me | Me | O |
| C-16788 | Me(S) | single bond | H | c-Pr[1-S(═O)$_2$CHF$_2$] | C(═O)Me | Me | Me | O |
| C-16789 | H | single bond | Me | c-Pr[1-S(═O)$_2$CF$_3$] | C(═O)Me | Cl | Me | O |
| C-16790 | Me | single bond | H | c-Pr[1-S(═O)$_2$CF$_3$] | C(═O)Me | Cl | Me | O |
| C-16791 | Me(R) | single bond | H | c-Pr[1-S(═O)$_2$CF$_3$] | C(═O)Me | Cl | Me | O |
| C-16792 | Me(S) | single bond | H | c-Pr[1-S(═O)$_2$CF$_3$] | C(═O)Me | Cl | Me | O |
| C-16793 | H | single bond | Me | c-Pr[1-S(═O)$_2$CF$_3$] | C(═O)Me | Me | Me | O |
| C-16794 | Me | single bond | H | c-Pr[1-S(═O)$_2$CF$_3$] | C(═O)Me | Me | Me | O |
| C-16795 | Me(R) | single bond | H | c-Pr[1-S(═O)$_2$CF$_3$] | C(═O)Me | Me | Me | O |
| C-16796 | Me(S) | single bond | H | c-Pr[1-S(═O)$_2$CF$_3$] | C(═O)Me | Me | Me | O |
| C-16797 | H | single bond | Me | c-Pr[1-(5,6-dihydro-1,4,2-dioxazin-3-yl)] | C(═O)Me | Cl | Me | O |
| C-16798 | Me | single bond | H | c-Pr[1-(5,6-dihydro-1,4,2-dioxazin-3-yl)] | C(═O)Me | Cl | Me | O |
| C-16799 | Me(R) | single bond | H | c-Pr[1-(5,6-dihydro-1,4,2-dioxazin-3-yl)] | C(═O)Me | Cl | Me | O |
| C-16800 | Me(S) | single bond | H | c-Pr[1-(5,6-dihydro-1,4,2-dioxazin-3-yl)] | C(═O)Me | Cl | Me | O |
| C-16801 | H | single bond | Me | c-Pr[1-(5,6-dihydro-1,4,2-dioxazin-3-yl)] | C(═O)Me | Me | Me | O |
| C-16802 | Me | single bond | H | c-Pr[1-(5,6-dihydro-1,4,2-dioxazin-3-yl)] | C(═O)Me | Me | Me | O |
| C-16803 | Me(R) | single bond | H | c-Pr[1-(5,6-dihydro-1,4,2-dioxazin-3-yl)] | C(═O)Me | Me | Me | O |
| C-16804 | Me(S) | single bond | H | c-Pr[1-(5,6-dihydro-1,4,2-dioxazin-3-yl)] | C(═O)Me | Me | Me | O |
| C-16805 | H | single bond | Me | c-Pr[1-(5-hydroxy-1,3,4-oxadiazol-2-yl)] | C(═O)Me | Cl | Me | O |
| C-16806 | Me | single bond | H | c-Pr[1-(5-hydroxy-1,3,4-oxadiazol-2-yl)] | C(═O)Me | Cl | Me | O |
| C-16807 | Me(R) | single bond | H | c-Pr[1-(5-hydroxy-1,3,4-oxadiazol-2-yl)] | C(═O)Me | Cl | Me | O |
| C-16808 | Me(S) | single bond | H | c-Pr[1-(5-hydroxy-1,3,4-oxadiazol-2-yl)] | C(═O)Me | Cl | Me | O |
| C-16809 | H | single bond | Me | c-Pr[1-(5-hydroxy-1,3,4-oxadiazol-2-yl)] | C(═O)Me | Me | Me | O |
| C-16810 | Me | single bond | H | c-Pr[1-(5-hydroxy-1,3,4-oxadiazol-2-yl)] | C(═O)Me | Me | Me | O |
| C-16811 | Me(R) | single bond | H | c-Pr[1-(5-hydroxy-1,3,4-oxadiazol-2-yl)] | C(═O)Me | Me | Me | O |
| C-16812 | Me(S) | single bond | H | c-Pr[1-(5-hydroxy-1,3,4-oxadiazol-2-yl)] | C(═O)Me | Me | Me | O |
| C-16813 | H | single bond | Me | c-Pr[1-(pyrimidin-2-yl)] | C(═O)Me | Cl | Me | O |
| C-16814 | Me | single bond | H | c-Pr[1-(pyrimidin-2-yl)] | C(═O)Me | Cl | Me | O |
| C-16815 | Me(R) | single bond | H | c-Pr[1-(pyrimidin-2-yl)] | C(═O)Me | Cl | Me | O |
| C-16816 | Me(S) | single bond | H | c-Pr[1-(pyrimidin-2-yl)] | C(═O)Me | Cl | Me | O |
| C-16817 | H | single bond | Me | c-Pr[1-(pyrimidin-2-yl)] | C(═O)Me | Me | Me | O |
| C-16818 | Me | single bond | H | c-Pr[1-(pyrimidin-2-yl)] | C(═O)Me | Me | Me | O |
| C-16819 | Me(R) | single bond | H | c-Pr[1-(pyrimidin-2-yl)] | C(═O)Me | Me | Me | O |
| C-16820 | Me(S) | single bond | H | c-Pr[1-(pyrimidin-2-yl)] | C(═O)Me | Me | Me | O |
| C-16821 | H | single bond | Me | t-Bu | C(═O)Me | Cl | Me | O |
| C-16822 | Me | single bond | H | t-Bu | C(═O)Me | Cl | Me | O |
| C-16823 | Me(R) | single bond | H | t-Bu | C(═O)Me | Cl | Me | O |
| C-16824 | Me(S) | single bond | H | t-Bu | C(═O)Me | Cl | Me | O |

TABLE 610-continued

| Compound Number | Y | W | Z | $R^1$ | $R^2$ | $R^3$ | $R^{10}$ | A |
|---|---|---|---|---|---|---|---|---|
| C-16825 | H | single bond | Me | t-Bu | C(═O)Me | Me | Me | O |
| C-16826 | Me | single bond | H | t-Bu | C(═O)Me | Me | Me | O |

TABLE 611

| Compound Number | Y | W | Z | $R^1$ | $R^2$ | $R^3$ | $R^{10}$ | A |
|---|---|---|---|---|---|---|---|---|
| C-16827 | Me(R) | single bond | H | t-Bu | C(═O)Me | Me | Me | O |
| C-16828 | Me(S) | single bond | H | t-Bu | C(═O)Me | Me | Me | O |
| C-16829 | H | single bond | Me | c-Bu | C(═O)Me | Cl | Me | O |
| C-16830 | Me | single bond | H | c-Bu | C(═O)Me | Cl | Me | O |
| C-16831 | Me(R) | single bond | H | c-Bu | C(═O)Me | Cl | Me | O |
| C-16832 | Me(S) | single bond | H | c-Bu | C(═O)Me | Cl | Me | O |
| C-16833 | H | single bond | Me | c-Bu | C(═O)Me | Me | Me | O |
| C-16834 | Me | single bond | H | c-Bu | C(═O)Me | Me | Me | O |
| C-16835 | Me(R) | single bond | H | c-Bu | C(═O)Me | Me | Me | O |
| C-16836 | Me(S) | single bond | H | c-Bu | C(═O)Me | Me | Me | O |
| C-16837 | H | single bond | Me | c-Bu(1-CN) | C(═O)Me | Cl | Me | O |
| C-16838 | Me | single bond | H | c-Bu(1-CN) | C(═O)Me | Cl | Me | O |
| C-16839 | Me(R) | single bond | H | c-Bu(1-CN) | C(═O)Me | Cl | Me | O |
| C-16840 | Me(S) | single bond | H | c-Bu(1-CN) | C(═O)Me | Cl | Me | O |
| C-16841 | H | single bond | Me | c-Bu(1-CN) | C(═O)Me | Me | Me | O |
| C-16842 | Me | single bond | H | c-Bu(1-CN) | C(═O)Me | Me | Me | O |
| C-16843 | Me(R) | single bond | H | c-Bu(1-CN) | C(═O)Me | Me | Me | O |
| C-16844 | Me(S) | single bond | H | c-Bu(1-CN) | C(═O)Me | Me | Me | O |
| C-16845 | H | single bond | Me | c-Bu(3,3-$F_2$) | C(═O)Me | Cl | Me | O |
| C-16846 | Me | single bond | H | c-Bu(3,3-$F_2$) | C(═O)Me | Cl | Me | O |
| C-16847 | Me(R) | single bond | H | c-Bu(3,3-$F_2$) | C(═O)Me | Cl | Me | O |
| C-16848 | Me(S) | single bond | H | c-Bu(3,3-$F_2$) | C(═O)Me | Cl | Me | O |
| C-16849 | H | single bond | Me | c-Bu(3,3-$F_2$) | C(═O)Me | Me | Me | O |
| C-16850 | Me | single bond | H | c-Bu(3,3-$F_2$) | C(═O)Me | Me | Me | O |
| C-16851 | Me(R) | single bond | H | c-Bu(3,3-$F_2$) | C(═O)Me | Me | Me | O |
| C-16852 | Me(S) | single bond | H | c-Bu(3,3-$F_2$) | C(═O)Me | Me | Me | O |
| C-16853 | H | single bond | Me | oxetan-3-yl | C(═O)Me | Cl | Me | O |
| C-16854 | Me | single bond | H | oxetan-3-yl | C(═O)Me | Cl | Me | O |
| C-16855 | Me(R) | single bond | H | oxetan-3-yl | C(═O)Me | Cl | Me | O |
| C-16856 | Me(S) | single bond | H | oxetan-3-yl | C(═O)Me | Cl | Me | O |
| C-16857 | H | single bond | Me | oxetan-3-yl | C(═O)Me | Me | Me | O |
| C-16858 | Me | single bond | H | oxetan-3-yl | C(═O)Me | Me | Me | O |
| C-16859 | Me(R) | single bond | H | oxetan-3-yl | C(═O)Me | Me | Me | O |
| C-16860 | Me(S) | single bond | H | oxetan-3-yl | C(═O)Me | Me | Me | O |
| C-16861 | H | single bond | Me | oxetan(3-CN)-3-yl | C(═O)Me | Cl | Me | O |
| C-16862 | Me | single bond | H | oxetan(3-CN)-3-yl | C(═O)Me | Cl | Me | O |
| C-16863 | Me(R) | single bond | H | oxetan(3-CN)-3-yl | C(═O)Me | Cl | Me | O |
| C-16864 | Me(S) | single bond | H | oxetan(3-CN)-3-yl | C(═O)Me | Cl | Me | O |
| C-16865 | H | single bond | Me | oxetan(3-CN)-3-yl | C(═O)Me | Me | Me | O |
| C-16866 | Me | single bond | H | oxetan(3-CN)-3-yl | C(═O)Me | Me | Me | O |
| C-16867 | Me(R) | single bond | H | oxetan(3-CN)-3-yl | C(═O)Me | Me | Me | O |
| C-16868 | Me(S) | single bond | H | oxetan(3-CN)-3-yl | C(═O)Me | Me | Me | O |
| C-16869 | H | single bond | Me | azetidin[1-C(═O)Me]-3-yl | C(═O)Me | Cl | Me | O |
| C-16870 | Me | single bond | H | azetidin[1-C(═O)Me]-3-yl | C(═O)Me | Cl | Me | O |

TABLE 612

| Compound Number | Y | W | Z | $R^1$ | $R^2$ | $R^3$ | $R^{10}$ | A |
|---|---|---|---|---|---|---|---|---|
| C-16871 | Me(R) | single bond | H | azetidin[1-C(═O)Me]-3-yl | C(═O)Me | Cl | Me | O |
| C-16872 | Me(S) | single bond | H | azetidin[1-C(═O)Me]-3-yl | C(═O)Me | Cl | Me | O |
| C-16873 | H | single bond | Me | azetidin[1-C(═O)Me]-3-yl | C(═O)Me | Me | Me | O |
| C-16874 | Me | single bond | H | azetidin[1-C(═O)Me]-3-yl | C(═O)Me | Me | Me | O |
| C-16875 | Me(R) | single bond | H | azetidin[1-C(═O)Me]-3-yl | C(═O)Me | Me | Me | O |
| C-16876 | Me(S) | single bond | H | azetidin[1-C(═O)Me]-3-yl | C(═O)Me | Me | Me | O |
| C-16877 | H | single bond | Me | azetidin[1-S(═O)$_2$Me]-3-yl | C(═O)Me | Cl | Me | O |
| C-16878 | Me | single bond | H | azetidin[1-S(═O)$_2$Me]-3-yl | C(═O)Me | Cl | Me | O |
| C-16879 | Me(R) | single bond | H | azetidin[1-S(═O)$_2$Me]-3-yl | C(═O)Me | Cl | Me | O |
| C-16880 | Me(S) | single bond | H | azetidin[1-S(═O)$_2$Me]-3-yl | C(═O)Me | Cl | Me | O |
| C-16881 | H | single bond | Me | azetidin[1-S(═O)$_2$Me]-3-yl | C(═O)Me | Me | Me | O |
| C-16882 | Me | single bond | H | azetidin[1-S(═O)$_2$Me]-3-yl | C(═O)Me | Me | Me | O |

TABLE 612-continued

| Compound Number | Y | W | Z | $R^1$ | $R^2$ | $R^3$ | $R^{10}$ | A |
|---|---|---|---|---|---|---|---|---|
| C-16883 | Me(R) | single bond | H | azetidin[1-S(=O)$_2$Me]-3-yl | C(=O)Me | Me | Me | O |
| C-16884 | Me(S) | single bond | H | azetidin[1-S(=O)$_2$Me]-3-yl | C(=O)Me | Me | Me | O |
| C-16885 | H | single bond | Me | azetidin[1-S(=O)$_2$CHF$_2$]-3-yl | C(=O)Me | Cl | Me | O |
| C-16886 | Me | single bond | H | azetidin[1-S(=O)$_2$CHF$_2$]-3-yl | C(=O)Me | Cl | Me | O |
| C-16887 | Me(R) | single bond | H | azetidin[1-S(=O)$_2$CHF$_2$]-3-yl | C(=O)Me | Cl | Me | O |
| C-16888 | Me(S) | single bond | H | azetidin[1-S(=O)$_2$CHF$_2$]-3-yl | C(=O)Me | Cl | Me | O |
| C-16889 | H | single bond | Me | azetidin[1-S(=O)$_2$CHF$_2$]-3-yl | C(=O)Me | Me | Me | O |
| C-16890 | Me | single bond | H | azetidin[1-S(=O)$_2$CHF$_2$]-3-yl | C(=O)Me | Me | Me | O |
| C-16891 | Me(R) | single bond | H | azetidin[1-S(=O)$_2$CHF$_2$]-3-yl | C(=O)Me | Me | Me | O |
| C-16892 | Me(S) | single bond | H | azetidin[1-S(=O)$_2$CHF$_2$]-3-yl | C(=O)Me | Me | Me | O |
| C-16893 | H | single bond | Me | c-Pen | C(=O)Me | Cl | Me | O |
| C-16894 | Me | single bond | H | c-Pen | C(=O)Me | Cl | Me | O |
| C-16895 | Me(R) | single bond | H | c-Pen | C(=O)Me | Cl | Me | O |
| C-16896 | Me(S) | single bond | H | c-Pen | C(=O)Me | Cl | Me | O |
| C-16897 | H | single bond | Me | c-Pen | C(=O)Me | Me | Me | O |
| C-16898 | Me | single bond | H | c-Pen | C(=O)Me | Me | Me | O |
| C-16899 | Me(R) | single bond | H | c-Pen | C(=O)Me | Me | Me | O |
| C-16900 | Me(S) | single bond | H | c-Pen | C(=O)Me | Me | Me | O |
| C-16901 | H | single bond | Me | tetrahydrofuran-3-yl | C(=O)Me | Cl | Me | O |
| C-16902 | Me | single bond | H | tetrahydrofuran-3-yl | C(=O)Me | Cl | Me | O |
| C-16903 | Me(R) | single bond | H | tetrahydrofuran-3-yl | C(=O)Me | Cl | Me | O |
| C-16904 | Me(S) | single bond | H | tetrahydrofuran-3-yl | C(=O)Me | Cl | Me | O |
| C-16905 | H | single bond | Me | tetrahydrofuran-3-yl | C(=O)Me | Me | Me | O |
| C-16906 | Me | single bond | H | tetrahydrofuran-3-yl | C(=O)Me | Me | Me | O |
| C-16907 | Me(R) | single bond | H | tetrahydrofuran-3-yl | C(=O)Me | Me | Me | O |
| C-16908 | Me(S) | single bond | H | tetrahydrofuran-3-yl | C(=O)Me | Me | Me | O |
| C-16909 | H | single bond | Me | tetrahydrothiophen-3-yl | C(=O)Me | Cl | Me | O |
| C-16910 | Me | single bond | H | tetrahydrothiophen-3-yl | C(=O)Me | Cl | Me | O |
| C-16911 | Me(R) | single bond | H | tetrahydrothiophen-3-yl | C(=O)Me | Cl | Me | O |
| C-16912 | Me(S) | single bond | H | tetrahydrothiophen-3-yl | C(=O)Me | Cl | Me | O |
| C-16913 | H | single bond | Me | tetrahydrothiophen-3-yl | C(=O)Me | Me | Me | O |
| C-16914 | Me | single bond | H | tetrahydrothiophen-3-yl | C(=O)Me | Me | Me | O |

TABLE 613

| Compound Number | Y | W | Z | $R^1$ | $R^2$ | $R^3$ | $R^{10}$ | A |
|---|---|---|---|---|---|---|---|---|
| C-16915 | Me(R) | single bond | H | tetrahydrothiophen-3-yl | C(=O)Me | Me | Me | O |
| C-16916 | Me(S) | single bond | H | tetrahydrothiophen-3-yl | C(=O)Me | Me | Me | O |
| C-16917 | H | single bond | Me | c-Pen(1-CN) | C(=O)Me | Cl | Me | O |
| C-16918 | Me | single bond | H | c-Pen(1-CN) | C(=O)Me | Cl | Me | O |
| C-16919 | Me(R) | single bond | H | c-Pen(1-CN) | C(=O)Me | Cl | Me | O |
| C-16920 | Me(S) | single bond | H | c-Pen(1-CN) | C(=O)Me | Cl | Me | O |
| C-16921 | H | single bond | Me | c-Pen(1-CN) | C(=O)Me | Me | Me | O |
| C-16922 | Me | single bond | H | c-Pen(1-CN) | C(=O)Me | Me | Me | O |
| C-16923 | Me(R) | single bond | H | c-Pen(1-CN) | C(=O)Me | Me | Me | O |
| C-16924 | Me(S) | single bond | H | c-Pen(1-CN) | C(=O)Me | Me | Me | O |
| C-16925 | H | single bond | Me | tetrahydrofuran(3-CN)-3-yl | C(=O)Me | Cl | Me | O |
| C-16926 | Me | single bond | H | tetrahydrofuran(3-CN)-3-yl | C(=O)Me | Cl | Me | O |
| C-16927 | Me(R) | single bond | H | tetrahydrofuran(3-CN)-3-yl | C(=O)Me | Cl | Me | O |
| C-16928 | Me(S) | single bond | H | tetrahydrofuran(3-CN)-3-yl | C(=O)Me | Cl | Me | O |
| C-16929 | H | single bond | Me | tetrahydrofuran(3-CN)-3-yl | C(=O)Me | Me | Me | O |
| C-16930 | Me | single bond | H | tetrahydrofuran(3-CN)-3-yl | C(=O)Me | Me | Me | O |
| C-16931 | Me(R) | single bond | H | tetrahydrofuran(3-CN)-3-yl | C(=O)Me | Me | Me | O |
| C-16932 | Me(S) | single bond | H | tetrahydrofuran(3-CN)-3-yl | C(=O)Me | Me | Me | O |
| C-16933 | H | single bond | Me | tetrahydrothiophen(3-CN)-3-yl | C(=O)Me | Cl | Me | O |
| C-16934 | Me | single bond | H | tetrahydrothiophen(3-CN)-3-yl | C(=O)Me | Cl | Me | O |
| C-16935 | Me(R) | single bond | H | tetrahydrothiophen(3-CN)-3-yl | C(=O)Me | Cl | Me | O |
| C-16936 | Me(S) | single bond | H | tetrahydrothiophen(3-CN)-3-yl | C(=O)Me | Cl | Me | O |
| C-16937 | H | single bond | Me | tetrahydrothiophen(3-CN)-3-yl | C(=O)Me | Me | Me | O |
| C-16938 | Me | single bond | H | tetrahydrothiophen(3-CN)-3-yl | C(=O)Me | Me | Me | O |
| C-16939 | Me(R) | single bond | H | tetrahydrothiophen(3-CN)-3-yl | C(=O)Me | Me | Me | O |
| C-16940 | Me(S) | single bond | H | tetrahydrothiophen(3-CN)-3-yl | C(=O)Me | Me | Me | O |
| C-16941 | H | single bond | Me | bicyclo[1.1.1]pentan-1-yl | C(=O)Me | Cl | Me | O |
| C-16942 | Me | single bond | H | bicyclo[1.1.1]pentan-1-yl | C(=O)Me | Cl | Me | O |
| C-16943 | Me(R) | single bond | H | bicyclo[1.1.1]pentan-1-yl | C(=O)Me | Cl | Me | O |
| C-16944 | Me(S) | single bond | H | bicyclo[1.1.1]pentan-1-yl | C(=O)Me | Cl | Me | O |
| C-16945 | H | single bond | Me | bicyclo[1.1.1]pentan-1-yl | C(=O)Me | Me | Me | O |
| C-16946 | Me | single bond | H | bicyclo[1.1.1]pentan-1-yl | C(=O)Me | Me | Me | O |
| C-16947 | Me(R) | single bond | H | bicyclo[1.1.1]pentan-1-yl | C(=O)Me | Me | Me | O |
| C-16948 | Me(S) | single bond | H | bicyclo[1.1.1]pentan-1-yl | C(=O)Me | Me | Me | O |
| C-16949 | H | single bond | Me | c-Hex | C(=O)Me | Cl | Me | O |

TABLE 613-continued

| Compound Number | Y | W | Z | $R^1$ | $R^2$ | $R^3$ | $R^{10}$ | A |
|---|---|---|---|---|---|---|---|---|
| C-16950 | Me | single bond | H | c-Hex | C(=O)Me | Cl | Me | O |
| C-16951 | Me(R) | single bond | II | c-Hex | C(=O)Me | Cl | Me | O |
| C-16952 | Me(S) | single bond | H | c-Hex | C(=O)Me | Cl | Me | O |
| C-16953 | H | single bond | Me | c-Hex | C(=O)Me | Me | Me | O |
| C-16954 | Me | single bond | H | c-Hex | C(=O)Me | Me | Me | O |
| C-16955 | Me(R) | single bond | H | c-Hex | C(=O)Me | Me | Me | O |
| C-16956 | Me(S) | single bond | H | c-Hex | C(=O)Me | Me | Me | O |
| C-16957 | H | single bond | Me | tetrahydropyran-4-yl | C(=O)Me | Cl | Me | O |
| C-16958 | Me | single bond | H | tetrahydropyran-4-yl | C(=O)Me | Cl | Me | O |

TABLE 614

| Compound Number | Y | W | Z | $R^1$ | $R^2$ | $R^3$ | $R^{10}$ | A |
|---|---|---|---|---|---|---|---|---|
| C-16959 | Me(R) | single bond | H | tetrahydropyran-4-yl | C(=O)Me | Cl | Me | O |
| C-16960 | Me(S) | single bond | H | tetrahydropyran-4-yl | C(=O)Me | Cl | Me | O |
| C-16961 | H | single bond | Me | tetrahydropyran-4-yl | C(=O)Me | Me | Me | O |
| C-16962 | Me | single bond | H | tetrahydropyran-4-yl | C(=O)Me | Me | Me | O |
| C-16963 | Me(R) | single bond | H | tetrahydropyran-4-yl | C(=O)Me | Me | Me | O |
| C-16964 | Me(S) | single bond | H | tetrahydropyran-4-yl | C(=O)Me | Me | Me | O |
| C-16965 | H | single bond | Me | tetrahydrothiopyran-4-yl | C(=O)Me | Cl | Me | O |
| C-16966 | Me | single bond | H | tetrahydrothiopyran-4-yl | C(=O)Me | Cl | Me | O |
| C-16967 | Me(R) | single bond | H | tetrahydrothiopyran-4-yl | C(=O)Me | Cl | Me | O |
| C-16968 | Me(S) | single bond | H | tetrahydrothiopyran-4-yl | C(=O)Me | Cl | Me | O |
| C-16969 | H | single bond | Me | tetrahydrothiopyran-4-yl | C(=O)Me | Me | Me | O |
| C-16970 | Me | single bond | H | tetrahydrothiopyran-4-yl | C(=O)Me | Me | Me | O |
| C-16971 | Me(R) | single bond | H | tetrahydrothiopyran-4-yl | C(=O)Me | Me | Me | O |
| C-16972 | Me(S) | single bond | H | tetrahydrothiopyran-4-yl | C(=O)Me | Me | Me | O |
| C-16973 | H | single bond | Me | c-Hex(1-CN) | C(=O)Me | Cl | Me | O |
| C-16974 | Me | single bond | H | c-Hex(1-CN) | C(=O)Me | Cl | Me | O |
| C-16975 | Me(R) | single bond | H | c-Hex(1-CN) | C(=O)Me | Cl | Me | O |
| C-16976 | Me(S) | single bond | H | c-Hex(1-CN) | C(=O)Me | Cl | Me | O |
| C-16977 | H | single bond | Me | c-Hex(1-CN) | C(=O)Me | Me | Me | O |
| C-16978 | Me | single bond | H | c-Hex(1-CN) | C(=O)Me | Me | Me | O |
| C-16979 | Me(R) | single bond | H | c-Hex(1-CN) | C(=O)Me | Me | Me | O |
| C-16980 | Me(S) | single bond | H | c-Hex(1-CN) | C(=O)Me | Me | Me | O |
| C-16981 | H | single bond | Me | tetrahydropyran(4-CN)-4-yl | C(=O)Me | Cl | Me | O |
| C-16982 | Me | single bond | H | tetrahydropyran(4-CN)-4-yl | C(=O)Me | Cl | Me | O |
| C-16983 | Me(R) | single bond | H | tetrahydropyran(4-CN)-4-yl | C(=O)Me | Cl | Me | O |
| C-16984 | Me(S) | single bond | H | tetrahydropyran(4-CN)-4-yl | C(=O)Me | Cl | Me | O |
| C-16985 | H | single bond | Me | tetrahydropyran(4-CN)-4-yl | C(=O)Me | Me | Me | O |
| C-16986 | Me | single bond | H | tetrahydropyran(4-CN)-4-yl | C(=O)Me | Me | Me | O |
| C-16987 | Me(R) | single bond | H | tetrahydropyran(4-CN)-4-yl | C(=O)Me | Me | Me | O |
| C-16988 | Me(S) | single bond | H | tetrahydropyran(4-CN)-4-yl | C(=O)Me | Me | Me | O |
| C-16989 | H | single bond | Me | tetrahydrothiopyran(4-CN)-4-yl | C(=O)Me | Cl | Me | O |
| C-16990 | Me | single bond | H | tetrahydrothiopyran(4-CN)-4-yl | C(=O)Me | Cl | Me | O |
| C-16991 | Me(R) | single bond | H | tetrahydrothiopyran(4-CN)-4-yl | C(=O)Me | Cl | Me | O |
| C-16992 | Me(S) | single bond | H | tetrahydrothiopyran(4-CN)-4-yl | C(=O)Me | Cl | Me | O |
| C-16993 | H | single bond | Me | tetrahydrothiopyran(4-CN)-4-yl | C(=O)Me | Me | Me | O |
| C-16994 | Me | single bond | H | tetrahydrothiopyran(4-CN)-4-yl | C(=O)Me | Me | Me | O |
| C-16995 | Me(R) | single bond | H | tetrahydrothiopyran(4-CN)-4-yl | C(=O)Me | Me | Me | O |
| C-16996 | Me(S) | single bond | H | tetrahydrothiopyran(4-CN)-4-yl | C(=O)Me | Me | Me | O |
| C-16997 | H | single bond | Me | $CH_2$(c-Pr) | C(=O)Me | Cl | Me | O |
| C-16998 | Me | single bond | H | $CH_2$(c-Pr) | C(=O)Me | Cl | Me | O |
| C-16999 | Me(R) | single bond | H | $CH_2$(c-Pr) | C(=O)Me | Cl | Me | O |
| C-17000 | Me(S) | single bond | H | $CH_2$(c-Pr) | C(=O)Me | Cl | Me | O |
| C-17001 | H | single bond | Me | $CH_2$(c-Pr) | C(=O)Me | Me | Me | O |
| C-17002 | Me | single bond | H | $CH_2$(c-Pr) | C(=O)Me | Me | Me | O |

TABLE 615

| Compound Number | Y | W | Z | $R^1$ | $R^2$ | $R^3$ | $R^{10}$ | A |
|---|---|---|---|---|---|---|---|---|
| C-17003 | Me(R) | single bond | H | $CH_2$(c-Pr) | C(=O)Me | Me | Me | O |
| C-17004 | Me(S) | single bond | H | $CH_2$(c-Pr) | C(=O)Me | Me | Me | O |
| C-17005 | H | single bond | Me | $CH_2$[c-Pr(1-CN)] | C(=O)Me | Cl | Me | O |

TABLE 615-continued

| Compound Number | Y | W | Z | $R^1$ | $R^2$ | $R^3$ | $R^{10}$ | A |
|---|---|---|---|---|---|---|---|---|
| C-17006 | Me | single bond | H | $CH_2$[c-Pr(1-CN)] | C(=O)Me | Cl | Me | O |
| C-17007 | Me(R) | single bond | H | $CH_2$[c-Pr(1-CN)] | C(=O)Me | Cl | Me | O |
| C-17008 | Me(S) | single bond | H | $CH_2$[c-Pr(1-CN)] | C(=O)Me | Cl | Me | O |
| C-17009 | H | single bond | Me | $CH_2$[c-Pr(1-CN)] | C(=O)Me | Me | Me | O |
| C-17010 | Me | single bond | H | $CH_2$[c-Pr(1-CN)] | C(=O)Me | Me | Me | O |
| C-17011 | Me(R) | single bond | H | $CH_2$[c-Pr(1-CN)] | C(=O)Me | Me | Me | O |
| C-17012 | Me(S) | single bond | H | $CH_2$[c-Pr(1-CN)] | C(=O)Me | Me | Me | O |
| C-17013 | H | single bond | Me | CH(Me)(c-Pr) | C(=O)Me | Cl | Me | O |
| C-17014 | Me | single bond | H | CH(Me)(c-Pr) | C(=O)Me | Cl | Me | O |
| C-17015 | Me(R) | single bond | H | CH(Me)(c-Pr) | C(=O)Me | Cl | Me | O |
| C-17016 | Me(S) | single bond | H | CH(Me)(c-Pr) | C(=O)Me | Cl | Me | O |
| C-17017 | H | single bond | Me | CH(Me)(c-Pr) | C(=O)Me | Me | Me | O |
| C-17018 | Me | single bond | H | CH(Me)(c-Pr) | C(=O)Me | Me | Me | O |
| C-17019 | Me(R) | single bond | H | CH(Me)(c-Pr) | C(=O)Me | Me | Me | O |
| C-17020 | Me(S) | single bond | H | CH(Me)(c-Pr) | C(=O)Me | Me | Me | O |
| C-17021 | H | single bond | Me | CH(Me)$CH_2$OMe | C(=O)Me | Cl | Me | O |
| C-17022 | Me | single bond | H | CH(Me)$CH_2$OMe | C(=O)Me | Cl | Me | O |
| C-17023 | Me(R) | single bond | H | CH(Me)$CH_2$OMe | C(=O)Me | Cl | Me | O |
| C-17024 | Me(S) | single bond | H | CH(Me)$CH_2$OMe | C(=O)Me | Cl | Me | O |
| C-17025 | H | single bond | Me | CH(Me)$CH_2$OMe | C(=O)Me | Me | Me | O |
| C-17026 | Me | single bond | H | CH(Me)$CH_2$OMe | C(=O)Me | Me | Me | O |
| C-17027 | Me(R) | single bond | H | CH(Me)$CH_2$OMe | C(=O)Me | Me | Me | O |
| C-17028 | Me(S) | single bond | H | CH(Me)$CH_2$OMe | C(=O)Me | Me | Me | O |
| C-17029 | H | single bond | Me | $CH_2CH{=}CH_2$ | C(=O)Me | Cl | Me | O |
| C-17030 | Me | single bond | H | $CH_2CH{=}CH_2$ | C(=O)Me | Cl | Me | O |
| C-17031 | Me(R) | single bond | H | $CH_2CH{=}CH_2$ | C(=O)Me | Cl | Me | O |
| C-17032 | Me(S) | single bond | H | $CH_2CH{=}CH_2$ | C(=O)Me | Cl | Me | O |
| C-17033 | H | single bond | Me | $CH_2CH{=}CH_2$ | C(=O)Me | Me | Me | O |
| C-17034 | Me | single bond | H | $CH_2CH{=}CH_2$ | C(=O)Me | Me | Me | O |
| C-17035 | Me(R) | single bond | H | $CH_2CH{=}CH_2$ | C(=O)Me | Me | Me | O |
| C-17036 | Me(S) | single bond | H | $CH_2CH{=}CH_2$ | C(=O)Me | Me | Me | O |
| C-17037 | H | single bond | Me | $CH_2C{\equiv}CH$ | C(=O)Me | Cl | Me | O |
| C-17038 | Me | single bond | H | $CH_2C{\equiv}CH$ | C(=O)Me | Cl | Me | O |
| C-17039 | Me(R) | single bond | H | $CH_2C{\equiv}CH$ | C(=O)Me | Cl | Me | O |
| C-17040 | Me(S) | single bond | H | $CH_2C{\equiv}CH$ | C(=O)Me | Cl | Me | O |
| C-17041 | H | single bond | Me | $CH_2C{\equiv}CH$ | C(=O)Me | Me | Me | O |
| C-17042 | Me | single bond | H | $CH_2C{\equiv}CH$ | C(=O)Me | Me | Me | O |
| C-17043 | Me(R) | single bond | H | $CH_2C{\equiv}CH$ | C(=O)Me | Me | Me | O |
| C-17044 | Me(S) | single bond | H | $CH_2C{\equiv}CH$ | C(=O)Me | Me | Me | O |
| C-17045 | H | single bond | Me | $CH_2CN$ | C(=O)Me | Cl | Me | O |
| C-17046 | Me | single bond | H | $CH_2CN$ | C(=O)Me | Cl | Me | O |

TABLE 616

| Compound Number | Y | W | Z | $R^1$ | $R^2$ | $R^3$ | $R^{10}$ | A |
|---|---|---|---|---|---|---|---|---|
| C-17047 | Me(R) | single bond | H | $CH_2CN$ | C(=O)Me | Cl | Me | O |
| C-17048 | Me(S) | single bond | H | $CH_2CN$ | C(=O)Me | Cl | Me | O |
| C-17049 | H | single bond | Me | $CH_2CN$ | C(=O)Me | Me | Me | O |
| C-17050 | Me | single bond | H | $CH_2CN$ | C(=O)Me | Me | Me | O |
| C-17051 | Me(R) | single bond | H | $CH_2CN$ | C(=O)Me | Me | Me | O |
| C-17052 | Me(S) | single bond | H | $CH_2CN$ | C(=O)Me | Me | Me | O |
| C-17053 | H | single bond | Me | CH(Me)CN | C(=O)Me | Cl | Me | O |
| C-17054 | Me | single bond | H | CH(Me)CN | C(=O)Me | Cl | Me | O |
| C-17055 | Me(R) | single bond | H | CH(Me)CN | C(=O)Me | Cl | Me | O |
| C-17056 | Me(S) | single bond | H | CH(Me)CN | C(=O)Me | Cl | Me | O |
| C-17057 | H | single bond | Me | CH(Me)CN | C(=O)Me | Me | Me | O |
| C-17058 | Me | single bond | H | CH(Me)CN | C(=O)Me | Me | Me | O |
| C-17059 | Me(R) | single bond | H | CH(Me)CN | C(=O)Me | Me | Me | O |
| C-17060 | Me(S) | single bond | H | CH(Me)CN | C(=O)Me | Me | Me | O |
| C-17061 | H | single bond | Me | $C(Me)_2CN$ | C(=O)Me | Cl | Me | O |
| C-17062 | Me | single bond | H | $C(Me)_2CN$ | C(=O)Me | Cl | Me | O |
| C-17063 | Me(R) | single bond | H | $C(Me)_2CN$ | C(=O)Me | Cl | Me | O |
| C-17064 | Me(S) | single bond | H | $C(Me)_2CN$ | C(=O)Me | Cl | Me | O |
| C-17065 | H | single bond | Me | $C(Me)_2CN$ | C(=O)Me | Me | Me | O |
| C-17066 | Me | single bond | H | $C(Me)_2CN$ | C(=O)Me | Me | Me | O |
| C-17067 | Me(R) | single bond | H | $C(Me)_2CN$ | C(=O)Me | Me | Me | O |
| C-17068 | Me(S) | single bond | H | $C(Me)_2CN$ | C(=O)Me | Me | Me | O |
| C-17069 | H | single bond | Me | C(Me)(i-Pr)CN | C(=O)Me | Cl | Me | O |
| C-17070 | Me | single bond | H | C(Me)(i-Pr)CN | C(=O)Me | Cl | Me | O |
| C-17071 | Me(R) | single bond | H | C(Me)(i-Pr)CN | C(=O)Me | Cl | Me | O |
| C-17072 | Me(S) | single bond | H | C(Me)(i-Pr)CN | C(=O)Me | Cl | Me | O |

TABLE 616-continued

| Compound Number | Y | W | Z | $R^1$ | $R^2$ | $R^3$ | $R^{10}$ | A |
|---|---|---|---|---|---|---|---|---|
| C-17073 | H | single bond | Me | C(Me)(i-Pr)CN | C(═O)Me | Me | Me | O |
| C-17074 | Me | single bond | H | C(Me)(i-Pr)CN | C(═O)Me | Me | Me | O |
| C-17075 | Me(R) | single bond | H | C(Me)(i-Pr)CN | C(═O)Me | Me | Me | O |
| C-17076 | Me(S) | single bond | H | C(Me)(i-Pr)CN | C(═O)Me | Me | Me | O |
| C-17077 | H | single bond | Me | OMe | C(═O)Me | Cl | Me | O |
| C-17078 | Me | single bond | H | OMe | C(═O)Me | Cl | Me | O |
| C-17079 | Me(R) | single bond | H | OMe | C(═O)Me | Cl | Me | O |
| C-17080 | Me(S) | single bond | H | OMe | C(═O)Me | Cl | Me | O |
| C-17081 | H | single bond | Me | OMe | C(═O)Me | Me | Me | O |
| C-17082 | Me | single bond | H | OMe | C(═O)Me | Me | Me | O |
| C-17083 | Me(R) | single bond | H | OMe | C(═O)Me | Me | Me | O |
| C-17084 | Me(S) | single bond | H | OMe | C(═O)Me | Me | Me | O |
| C-17085 | H | single bond | Me | CH═NOMe | C(═O)Me | Cl | Me | O |
| C-17086 | Me | single bond | H | CH═NOMe | C(═O)Me | Cl | Me | O |
| C-17087 | Me(R) | single bond | H | CH═NOMe | C(═O)Me | Cl | Me | O |
| C-17088 | Me(S) | single bond | H | CH═NOMe | C(═O)Me | Cl | Me | O |
| C-17089 | H | single bond | Me | CH═NOMe | C(═O)Me | Me | Me | O |
| C-17090 | Me | single bond | H | CH═NOMe | C(═O)Me | Me | Me | O |

TABLE 617

| Compound Number | Y | W | Z | $R^1$ | $R^2$ | $R^3$ | $R^{10}$ | A |
|---|---|---|---|---|---|---|---|---|
| C-17091 | Me(R) | single bond | H | CH═NOMe | C(═O)Me | Me | Me | O |
| C-17092 | Me(S) | single bond | H | CH═NOMe | C(═O)Me | Me | Me | O |
| C-17093 | H | single bond | Me | morpholin-4-yl | C(═O)Me | Cl | Me | O |
| C-17094 | Me | single bond | H | morpholin-4-yl | C(═O)Me | Cl | Me | O |
| C-17095 | Me(R) | single bond | H | morpholin-4-yl | C(═O)Me | Cl | Me | O |
| C-17096 | Me(S) | single bond | H | morpholin-4-yl | C(═O)Me | Cl | Me | O |
| C-17097 | H | single bond | Me | morpholin-4-yl | C(═O)Me | Me | Me | O |
| C-17098 | Me | single bond | H | morpholin-4-yl | C(═O)Me | Me | Me | O |
| C-17099 | Me(R) | single bond | H | morpholin-4-yl | C(═O)Me | Me | Me | O |
| C-17100 | Me(S) | single bond | H | morpholin-4-yl | C(═O)Me | Me | Me | O |
| C-17101 | H | single bond | Me | Ph | C(═O)Me | Cl | Me | O |
| C-17102 | Me | single bond | H | Ph | C(═O)Me | Cl | Me | O |
| C-17103 | Me(R) | single bond | H | Ph | C(═O)Me | Cl | Me | O |
| C-17104 | Me(S) | single bond | H | Ph | C(═O)Me | Cl | Me | O |
| C-17105 | H | single bond | Me | Ph | C(═O)Me | Me | Me | O |
| C-17106 | Me | single bond | H | Ph | C(═O)Me | Me | Me | O |
| C-17107 | Me(R) | single bond | H | Ph | C(═O)Me | Me | Me | O |
| C-17108 | Me(S) | single bond | H | Ph | C(═O)Me | Me | Me | O |
| C-17109 | H | single bond | Me | $CH_2Ph$ | C(═O)Me | Cl | Me | O |
| C-17110 | Me | single bond | H | $CH_2Ph$ | C(═O)Me | Cl | Me | O |
| C-17111 | Me(R) | single bond | H | $CH_2Ph$ | C(═O)Me | Cl | Me | O |
| C-17112 | Me(S) | single bond | H | $CH_2Ph$ | C(═O)Me | Cl | Me | O |
| C-17113 | H | single bond | Me | $CH_2Ph$ | C(═O)Me | Me | Me | O |
| C-17114 | Me | single bond | H | $CH_2Ph$ | C(═O)Me | Me | Me | O |
| C-17115 | Me(R) | single bond | H | $CH_2Ph$ | C(═O)Me | Me | Me | O |
| C-17116 | Me(S) | single bond | H | $CH_2Ph$ | C(═O)Me | Me | Me | O |
| C-17117 | H | single bond | Me | thiazole-2-yl | C(═O)Me | Cl | Me | O |
| C-17118 | Me | single bond | H | thiazole-2-yl | C(═O)Me | Cl | Me | O |
| C-17119 | Me(R) | single bond | H | thiazole-2-yl | C(═O)Me | Cl | Me | O |
| C-17120 | Me(S) | single bond | H | thiazole-2-yl | C(═O)Me | Cl | Me | O |
| C-17121 | H | single bond | Me | thiazole-2-yl | C(═O)Me | Me | Me | O |
| C-17122 | Me | single bond | H | thiazole-2-yl | C(═O)Me | Me | Me | O |
| C-17123 | Me(R) | single bond | H | thiazole-2-yl | C(═O)Me | Me | Me | O |
| C-17124 | Me(S) | single bond | H | thiazole-2-yl | C(═O)Me | Me | Me | O |
| C-17125 | H | single bond | Me | 1-Me-pyrazol-3-yl | C(═O)Me | Cl | Me | O |
| C-17126 | Me | single bond | H | 1-Me-pyrazol-3-yl | C(═O)Me | Cl | Me | O |
| C-17127 | Me(R) | single bond | H | 1-Me-pyrazol-3-yl | C(═O)Me | Cl | Me | O |
| C-17128 | Me(S) | single bond | H | 1-Me-pyrazol-3-yl | C(═O)Me | Cl | Me | O |
| C-17129 | H | single bond | Me | 1-Me-pyrazol-3-yl | C(═O)Me | Me | Me | O |
| C-17130 | Me | single bond | H | 1-Me-pyrazol-3-yl | C(═O)Me | Me | Me | O |
| C-17131 | Me(R) | single bond | H | 1-Me-pyrazol-3-yl | C(═O)Me | Me | Me | O |
| C-17132 | Me(S) | single bond | H | 1-Me-pyrazol-3-yl | C(═O)Me | Me | Me | O |
| C-17133 | H | single bond | Me | 1-Me-pyrazol-5-yl | C(═O)Me | Cl | Me | O |
| C-17134 | Me | single bond | H | 1-Me-pyrazol-5-yl | C(═O)Me | Cl | Me | O |

TABLE 618

| Compound Number | Y | W | Z | $R^1$ | $R^2$ | $R^3$ | $R^{10}$ | A |
|---|---|---|---|---|---|---|---|---|
| C-17135 | Me(R) | single bond | H | 1-Me-pyrazol-5-yl | C(=O)Me | Cl | Me | O |
| C-17136 | Me(S) | single bond | H | 1-Me-pyrazol-5-yl | C(=O)Me | Cl | Me | O |
| C-17137 | H | single bond | Me | 1-Me-pyrazol-5-yl | C(=O)Me | Me | Me | O |
| C-17138 | Me | single bond | H | 1-Me-pyrazol-5-yl | C(=O)Me | Me | Me | O |
| C-17139 | Me(R) | single bond | H | 1-Me-pyrazol-5-yl | C(=O)Me | Me | Me | O |
| C-17140 | Me(S) | single bond | H | 1-Me-pyrazol-5-yl | C(=O)Me | Me | Me | O |
| C-17141 | H | single bond | Me | $CH_2$(pyrimidin-2-yl) | C(=O)Me | Cl | Me | O |
| C-17142 | Me | single bond | H | $CH_2$(pyrimidin-2-yl) | C(=O)Me | Cl | Me | O |
| C-17143 | Me(R) | single bond | H | $CH_2$(pyrimidin-2-yl) | C(=O)Me | Cl | Me | O |
| C-17144 | Me(S) | single bond | H | $CH_2$(pyrimidin-2-yl) | C(=O)Me | Cl | Me | O |
| C-17145 | H | single bond | Me | $CH_2$(pyrimidin-2-yl) | C(=O)Me | Me | Me | O |
| C-17146 | Me | single bond | H | $CH_2$(pyrimidin-2-yl) | C(=O)Me | Me | Me | O |
| C-17147 | Me(R) | single bond | H | $CH_2$(pyrimidin-2-yl) | C(=O)Me | Me | Me | O |
| C-17148 | Me(S) | single bond | H | $CH_2$(pyrimidin-2-yl) | C(=O)Me | Me | Me | O |
| C-17149 | H | single bond | Me | Me | C(=O)Me | Cl | $CH_2OMe$ | O |
| C-17150 | Me | single bond | H | Me | C(=O)Me | Cl | $CH_2OMe$ | O |
| C-17151 | Me(R) | single bond | H | Me | C(=O)Me | Cl | $CH_2OMe$ | O |
| C-17152 | Me(S) | single bond | H | Me | C(=O)Me | Cl | $CH_2OMe$ | O |
| C-17153 | H | single bond | Me | Me | C(=O)Me | Me | $CH_2OMe$ | O |
| C-17154 | Me | single bond | H | Me | C(=O)Me | Me | $CH_2OMe$ | O |
| C-17155 | Me(R) | single bond | H | Me | C(=O)Me | Me | $CH_2OMe$ | O |
| C-17156 | Me(S) | single bond | H | Me | C(=O)Me | Me | $CH_2OMe$ | O |
| C-17157 | H | single bond | Me | $CH_2CHF_2$ | C(=O)Me | Cl | $CH_2OMe$ | O |
| C-17158 | Me | single bond | H | $CH_2CHF_2$ | C(=O)Me | Cl | $CH_2OMe$ | O |
| C-17159 | Me(R) | single bond | H | $CH_2CHF_2$ | C(=O)Me | Cl | $CH_2OMe$ | O |
| C-17160 | Me(S) | single bond | H | $CH_2CHF_2$ | C(=O)Me | Cl | $CH_2OMe$ | O |
| C-17161 | H | single bond | Me | $CH_2CHF_2$ | C(=O)Me | Me | $CH_2OMe$ | O |
| C-17162 | Me | single bond | H | $CH_2CHF_2$ | C(=O)Me | Me | $CH_2OMe$ | O |
| C-17163 | Me(R) | single bond | H | $CH_2CHF_2$ | C(=O)Me | Me | $CH_2OMe$ | O |
| C-17164 | Me(S) | single bond | H | $CH_2CHF_2$ | C(=O)Me | Me | $CH_2OMe$ | O |
| C-17165 | H | single bond | Me | n-Pr | C(=O)Me | Cl | $CH_2OMe$ | O |
| C-17166 | Me | single bond | H | n-Pr | C(=O)Me | Cl | $CH_2OMe$ | O |
| C-17167 | Me(R) | single bond | H | n-Pr | C(=O)Me | Cl | $CH_2OMe$ | O |
| C-17168 | Me(S) | single bond | H | n-Pr | C(=O)Me | Cl | $CH_2OMe$ | O |
| C-17169 | H | single bond | Me | n-Pr | C(=O)Me | Me | $CH_2OMe$ | O |
| C-17170 | Me | single bond | H | n-Pr | C(=O)Me | Me | $CH_2OMe$ | O |
| C-17171 | Me(R) | single bond | H | n-Pr | C(=O)Me | Me | $CH_2OMe$ | O |
| C-17172 | Me(S) | single bond | H | n-Pr | C(=O)Me | Me | $CH_2OMe$ | O |
| C-17173 | H | single bond | Me | i-Pr | C(=O)Me | Cl | $CH_2OMe$ | O |
| C-17174 | Me | single bond | H | i-Pr | C(=O)Me | Cl | $CH_2OMe$ | O |
| C-17175 | Me(R) | single bond | H | i-Pr | C(=O)Me | Cl | $CH_2OMe$ | O |
| C-17176 | Me(S) | single bond | H | i-Pr | C(=O)Me | Cl | $CH_2OMe$ | O |
| C-17177 | H | single bond | Me | i-Pr | C(=O)Me | Me | $CH_2OMe$ | O |
| C-17178 | Me | single bond | H | i-Pr | C(=O)Me | Me | $CH_2OMe$ | O |

TABLE 619

| Compound Number | Y | W | Z | $R^1$ | $R^2$ | $R^3$ | $R^{10}$ | A |
|---|---|---|---|---|---|---|---|---|
| C-17179 | Me(R) | single bond | H | i-Pr | C(=O)Me | Me | $CH_2OMe$ | O |
| C-17180 | Me(S) | single bond | H | i-Pr | C(=O)Me | Me | $CH_2OMe$ | O |
| C-17181 | H | single bond | Me | c-Pr(1-F) | C(=O)Me | Cl | $CH_2OMe$ | O |
| C-17182 | Me | single bond | H | c-Pr(1-F) | C(=O)Me | Cl | $CH_2OMe$ | O |
| C-17183 | Me(R) | single bond | H | c-Pr(1-F) | C(=O)Me | Cl | $CH_2OMe$ | O |
| C-17184 | Me(S) | single bond | H | c-Pr(1-F) | C(=O)Me | Cl | $CH_2OMe$ | O |
| C-17185 | H | single bond | Me | c-Pr(1-F) | C(=O)Me | Me | $CH_2OMe$ | O |
| C-17186 | Me | single bond | H | c-Pr(1-F) | C(=O)Me | Me | $CH_2OMe$ | O |
| C-17187 | Me(R) | single bond | H | c-Pr(1-F) | C(=O)Me | Me | $CH_2OMe$ | O |
| C-17188 | Me(S) | single bond | H | c-Pr(1-F) | C(=O)Me | Me | $CH_2OMe$ | O |
| C-17189 | H | single bond | Me | c-Pr(2,2-$F_2$) | C(=O)Me | Cl | $CH_2OMe$ | O |
| C-17190 | Me | single bond | H | c-Pr(2,2-$F_2$) | C(=O)Me | Cl | $CH_2OMe$ | O |
| C-17191 | Me(R) | single bond | H | c-Pr(2,2-$F_2$) | C(=O)Me | Cl | $CH_2OMe$ | O |
| C-17192 | Me(S) | single bond | H | c-Pr(2,2-$F_2$) | C(=O)Me | Cl | $CH_2OMe$ | O |
| C-17193 | H | single bond | Me | c-Pr(2,2-$F_2$) | C(=O)Me | Me | $CH_2OMe$ | O |
| C-17194 | Me | single bond | H | c-Pr(2,2-$F_2$) | C(=O)Me | Me | $CH_2OMe$ | O |
| C-17195 | Me(R) | single bond | H | c-Pr(2,2-$F_2$) | C(=O)Me | Me | $CH_2OMe$ | O |
| C-17196 | Me(S) | single bond | H | c-Pr(2,2-$F_2$) | C(=O)Me | Me | $CH_2OMe$ | O |
| C-17197 | H | single bond | Me | c-Pr(1-Cl) | C(=O)Me | Cl | $CH_2OMe$ | O |
| C-17198 | Me | single bond | H | c-Pr(1-Cl) | C(=O)Me | Cl | $CH_2OMe$ | O |
| C-17199 | Me(R) | single bond | H | c-Pr(1-Cl) | C(=O)Me | Cl | $CH_2OMe$ | O |
| C-17200 | Me(S) | single bond | H | c-Pr(1-Cl) | C(=O)Me | Cl | $CH_2OMe$ | O |
| C-17201 | H | single bond | Me | c-Pr(1-Cl) | C(=O)Me | Me | $CH_2OMe$ | O |

TABLE 619-continued

| Compound Number | Y | W | Z | $R^1$ | $R^2$ | $R^3$ | $R^{10}$ | A |
|---|---|---|---|---|---|---|---|---|
| C-17202 | Me | single bond | H | c-Pr(1-Cl) | C(=O)Me | Me | $CH_2OMe$ | O |
| C-17203 | Me(R) | single bond | H | c-Pr(1-Cl) | C(=O)Me | Me | $CH_2OMe$ | O |
| C-17204 | Me(S) | single bond | H | c-Pr(1-Cl) | C(=O)Me | Me | $CH_2OMe$ | O |
| C-17205 | H | single bond | Me | c-Pr(1-Br) | C(=O)Me | Cl | $CH_2OMe$ | O |
| C-17206 | Me | single bond | H | c-Pr(1-Br) | C(=O)Me | Cl | $CH_2OMe$ | O |
| C-17207 | Me(R) | single bond | H | c-Pr(1-Br) | C(=O)Me | Cl | $CH_2OMe$ | O |
| C-17208 | Me(S) | single bond | H | c-Pr(1-Br) | C(=O)Me | Cl | $CH_2OMe$ | O |
| C-17209 | H | single bond | Me | c-Pr(1-Br) | C(=O)Me | Me | $CH_2OMe$ | O |
| C-17210 | Me | single bond | H | c-Pr(1-Br) | C(=O)Me | Me | $CH_2OMe$ | O |
| C-17211 | Me(R) | single bond | H | c-Pr(1-Br) | C(=O)Me | Me | $CH_2OMe$ | O |
| C-17212 | Me(S) | single bond | H | c-Pr(1-Br) | C(=O)Me | Me | $CH_2OMe$ | O |
| C-17213 | H | single bond | Me | c-Pr(1-Me) | C(=O)Me | Cl | $CH_2OMe$ | O |
| C-17214 | Me | single bond | H | c-Pr(1-Me) | C(=O)Me | Cl | $CH_2OMe$ | O |
| C-17215 | Me(R) | single bond | H | c-Pr(1-Me) | C(=O)Me | Cl | $CH_2OMe$ | O |
| C-17216 | Me(S) | single bond | H | c-Pr(1-Me) | C(=O)Me | Cl | $CH_2OMe$ | O |
| C-17217 | H | single bond | Me | c-Pr(1-Me) | C(=O)Me | Me | $CH_2OMe$ | O |
| C-17218 | Me | single bond | H | c-Pr(1-Me) | C(=O)Me | Me | $CH_2OMe$ | O |
| C-17219 | Me(R) | single bond | H | c-Pr(1-Me) | C(=O)Me | Me | $CH_2OMe$ | O |
| C-17220 | Me(S) | single bond | H | c-Pr(1-Me) | C(=O)Me | Me | $CH_2OMe$ | O |
| C-17221 | H | single bond | Me | c-Pr(1-$CH_2OH$) | C(=O)Me | Cl | $CH_2OMe$ | O |
| C-17222 | Me | single bond | H | c-Pr(1-$CH_2OH$) | C(=O)Me | Cl | $CH_2OMe$ | O |

TABLE 620

| Compound Number | Y | W | Z | $R^1$ | $R^2$ | $R^3$ | $R^{10}$ | A |
|---|---|---|---|---|---|---|---|---|
| C-17223 | Me(R) | single bond | H | c-Pr(1-$CH_2OH$) | C(=O)Me | Cl | $CH_2OMe$ | O |
| C-17224 | Me(S) | single bond | H | c-Pr(1-$CH_2OH$) | C(=O)Me | Cl | $CH_2OMe$ | O |
| C-17225 | H | single bond | Me | c-Pr(1-$CH_2OH$) | C(=O)Me | Me | $CH_2OMe$ | O |
| C-17226 | Me | single bond | H | c-Pr(1-$CH_2OH$) | C(=O)Me | Me | $CH_2OMe$ | O |
| C-17227 | Me(R) | single bond | H | c-Pr(1-$CH_2OH$) | C(=O)Me | Me | $CH_2OMe$ | O |
| C-17228 | Me(S) | single bond | H | c-Pr(1-$CH_2OH$) | C(=O)Me | Me | $CH_2OMe$ | O |
| C-17229 | H | single bond | Me | c-Pr[1-$CH_2OS(=O)_2Me$] | C(=O)Me | Cl | $CH_2OMe$ | O |
| C-17230 | Me | single bond | H | c-Pr[1-$CH_2OS(=O)_2Me$] | C(=O)Me | Cl | $CH_2OMe$ | O |
| C-17231 | Me(R) | single bond | H | c-Pr[1-$CH_2OS(=O)_2Me$] | C(=O)Me | Cl | $CH_2OMe$ | O |
| C-17232 | Me(S) | single bond | H | c-Pr[1-$CH_2OS(=O)_2Me$] | C(=O)Me | Cl | $CH_2OMe$ | O |
| C-17233 | H | single bond | Me | c-Pr[1-$CH_2OS(=O)_2Me$] | C(=O)Me | Me | $CH_2OMe$ | O |
| C-17234 | Me | single bond | H | c-Pr[1-$CH_2OS(=O)_2Me$] | C(=O)Me | Me | $CH_2OMe$ | O |
| C-17235 | Me(R) | single bond | H | c-Pr[1-$CH_2OS(=O)_2Me$] | C(=O)Me | Me | $CH_2OMe$ | O |
| C-17236 | Me(S) | single bond | H | c-Pr[1-$CH_2OS(=O)_2Me$] | C(=O)Me | Me | $CH_2OMe$ | O |
| C-17237 | H | single bond | Me | c-Pr(1-$CH_2OMe$) | C(=O)Me | Cl | $CH_2OMe$ | O |
| C-17238 | Me | single bond | H | c-Pr(1-$CH_2OMe$) | C(=O)Me | Cl | $CH_2OMe$ | O |
| C-17239 | Me(R) | single bond | H | c-Pr(1-$CH_2OMe$) | C(=O)Me | Cl | $CH_2OMe$ | O |
| C-17240 | Me(S) | single bond | H | c-Pr(1-$CH_2OMe$) | C(=O)Me | Cl | $CH_2OMe$ | O |
| C-17241 | H | single bond | Me | c-Pr(1-$CH_2OMe$) | C(=O)Me | Me | $CH_2OMe$ | O |
| C-17242 | Me | single bond | H | c-Pr(1-$CH_2OMe$) | C(=O)Me | Me | $CH_2OMe$ | O |
| C-17243 | Me(R) | single bond | H | c-Pr(1-$CH_2OMe$) | C(=O)Me | Me | $CH_2OMe$ | O |
| C-17244 | Me(S) | single bond | H | c-Pr(1-$CH_2OMe$) | C(=O)Me | Me | $CH_2OMe$ | O |
| C-17245 | H | single bond | Me | c-Pr(1-$CH_2CN$) | C(=O)Me | Cl | $CH_2OMe$ | O |
| C-17246 | Me | single bond | H | c-Pr(1-$CH_2CN$) | C(=O)Me | Cl | $CH_2OMe$ | O |
| C-17247 | Me(R) | single bond | H | c-Pr(1-$CH_2CN$) | C(=O)Me | Cl | $CH_2OMe$ | O |
| C-17248 | Me(S) | single bond | H | c-Pr(1-$CH_2CN$) | C(=O)Me | Cl | $CH_2OMe$ | O |
| C-17249 | H | single bond | Me | c-Pr(1-$CH_2CN$) | C(=O)Me | Me | $CH_2OMe$ | O |
| C-17250 | Me | single bond | H | c-Pr(1-$CH_2CN$) | C(=O)Me | Me | $CH_2OMe$ | O |
| C-17251 | Me(R) | single bond | H | c-Pr(1-$CH_2CN$) | C(=O)Me | Me | $CH_2OMe$ | O |
| C-17252 | Me(S) | single bond | H | c-Pr(1-$CH_2CN$) | C(=O)Me | Me | $CH_2OMe$ | O |
| C-17253 | H | single bond | Me | c-Pr(1-$CH_2SMe$) | C(=O)Me | Cl | $CH_2OMe$ | O |
| C-17254 | Me | single bond | H | c-Pr(1-$CH_2SMe$) | C(=O)Me | Cl | $CH_2OMe$ | O |
| C-17255 | Me(R) | single bond | H | c-Pr(1-$CH_2SMe$) | C(=O)Me | Cl | $CH_2OMe$ | O |
| C-17256 | Me(S) | single bond | H | c-Pr(1-$CH_2SMe$) | C(=O)Me | Cl | $CH_2OMe$ | O |
| C-17257 | H | single bond | Me | c-Pr(1-$CH_2SMe$) | C(=O)Me | Me | $CH_2OMe$ | O |
| C-17258 | Me | single bond | H | c-Pr(1-$CH_2SMe$) | C(=O)Me | Me | $CH_2OMe$ | O |
| C-17259 | Me(R) | single bond | H | c-Pr(1-$CH_2SMe$) | C(=O)Me | Me | $CH_2OMe$ | O |
| C-17260 | Me(S) | single bond | H | c-Pr(1-$CH_2SMe$) | C(=O)Me | Me | $CH_2OMe$ | O |
| C-17261 | H | single bond | Me | c-Pr[1-$CH_2S(=O)Me$] | C(=O)Me | Cl | $CH_2OMe$ | O |
| C-17262 | Me | single bond | H | c-Pr[1-$CH_2S(=O)Me$] | C(=O)Me | Cl | $CH_2OMe$ | O |
| C-17263 | Me(R) | single bond | H | c-Pr[1-$CH_2S(=O)Me$] | C(=O)Me | Cl | $CH_2OMe$ | O |
| C-17264 | Me(S) | single bond | H | c-Pr[1-$CH_2S(=O)Me$] | C(=O)Me | Cl | $CH_2OMe$ | O |
| C-17265 | H | single bond | Me | c-Pr[1-$CH_2S(=O)Me$] | C(=O)Me | Me | $CH_2OMe$ | O |
| C-17266 | Me | single bond | H | c-Pr[1-$CH_2S(=O)Me$] | C(=O)Me | Me | $CH_2OMe$ | O |

TABLE 621

| Compound Number | Y | W | Z | $R^1$ | $R^2$ | $R^3$ | $R^{10}$ | A |
|---|---|---|---|---|---|---|---|---|
| C-17267 | Me(R) | single bond | H | c-Pr[1-$CH_2$S(═O)Me] | C(═O)Me | Me | $CH_2$OMe | O |
| C-17268 | Me(S) | single bond | H | c-Pr[1-$CH_2$S(═O)Me] | C(═O)Me | Me | $CH_2$OMe | O |
| C-17269 | H | single bond | Me | c-Pr[1-$CH_2$S(═O)Me] | C(═O)Me | Cl | $CH_2$OMe | O |
| C-17270 | Me | single bond | H | c-Pr[1-$CH_2$S(═O)Me] | C(═O)Me | Cl | $CH_2$OMe | O |
| C-17271 | Me(R) | single bond | H | c-Pr[1-$CH_2$S(═O)Me] | C(═O)Me | Cl | $CH_2$OMe | O |
| C-17272 | Me(S) | single bond | H | c-Pr[1-$CH_2$S(═O)Me] | C(═O)Me | Cl | $CH_2$OMe | O |
| C-17273 | H | single bond | Me | c-Pr[1-$CH_2$S(═O)Me] | C(═O)Me | Me | $CH_2$OMe | O |
| C-17274 | Me | single bond | H | c-Pr[1-$CH_2$S(═O)Me] | C(═O)Me | Me | $CH_2$OMe | O |
| C-17275 | Me(R) | single bond | H | c-Pr[1-$CH_2$S(═O)Me] | C(═O)Me | Me | $CH_2$OMe | O |
| C-17276 | Me(S) | single bond | H | c-Pr[1-$CH_2$S(═O)Me] | C(═O)Me | Me | $CH_2$OMe | O |
| C-17277 | H | single bond | Me | c-Pr(1-$CH_2$F) | C(═O)Me | Cl | $CH_2$OMe | O |
| C-17278 | Me | single bond | H | c-Pr(1-$CH_2$F) | C(═O)Me | Cl | $CH_2$OMe | O |
| C-17279 | Me(R) | single bond | H | c-Pr(1-$CH_2$F) | C(═O)Me | Cl | $CH_2$OMe | O |
| C-17280 | Me(S) | single bond | H | c-Pr(1-$CH_2$F) | C(═O)Me | Cl | $CH_2$OMe | O |
| C-17281 | H | single bond | Me | c-Pr(1-$CH_2$F) | C(═O)Me | Me | $CH_2$OMe | O |
| C-17282 | Me | single bond | H | c-Pr(1-$CH_2$F) | C(═O)Me | Me | $CH_2$OMe | O |
| C-17283 | Me(R) | single bond | H | c-Pr(1-$CH_2$F) | C(═O)Me | Me | $CH_2$OMe | O |
| C-17284 | Me(S) | single bond | H | c-Pr(1-$CH_2$F) | C(═O)Me | Me | $CH_2$OMe | O |
| C-17285 | H | single bond | Me | c-Pr(1-$CH_2$F) | C(═O)Me | Cl | $CH_2$OMe | O |
| C-17286 | Me | single bond | H | c-Pr(1-$CH_2$F) | C(═O)Me | Cl | $CH_2$OMe | O |
| C-17287 | Me(R) | single bond | H | c-Pr(1-$CH_2$F) | C(═O)Me | Cl | $CH_2$OMe | O |
| C-17288 | Me(S) | single bond | H | c-Pr(1-$CH_2$F) | C(═O)Me | Cl | $CH_2$OMe | O |
| C-17289 | H | single bond | Me | c-Pr(1-$CH_2$F) | C(═O)Me | Me | $CH_2$OMe | O |
| C-17290 | Me | single bond | H | c-Pr(1-$CH_2$F) | C(═O)Me | Me | $CH_2$OMe | O |
| C-17291 | Me(R) | single bond | H | c-Pr(1-$CH_2$F) | C(═O)Me | Me | $CH_2$OMe | O |
| C-17292 | Me(S) | single bond | H | c-Pr(1-$CH_2$F) | C(═O)Me | Me | $CH_2$OMe | O |
| C-17293 | H | single bond | Me | c-Pr(1-$CF_3$) | C(═O)Me | Cl | $CH_2$OMe | O |
| C-17294 | Me | single bond | H | c-Pr(1-$CF_3$) | C(═O)Me | Cl | $CH_2$OMe | O |
| C-17295 | Me(R) | single bond | H | c-Pr(1-$CF_3$) | C(═O)Me | Cl | $CH_2$OMe | O |
| C-17296 | Me(S) | single bond | H | c-Pr(1-$CF_3$) | C(═O)Me | Cl | $CH_2$OMe | O |
| C-17297 | H | single bond | Me | c-Pr(1-$CF_3$) | C(═O)Me | Me | $CH_2$OMe | O |
| C-17298 | Me | single bond | H | c-Pr(1-$CF_3$) | C(═O)Me | Me | $CH_2$OMe | O |
| C-17299 | Me(R) | single bond | H | c-Pr(1-$CF_3$) | C(═O)Me | Me | $CH_2$OMe | O |
| C-17300 | Me(S) | single bond | H | c-Pr(1-$CF_3$) | C(═O)Me | Me | $CH_2$OMe | O |
| C-17301 | H | single bond | Me | c-Pr(1-C═CH) | C(═O)Me | Cl | $CH_2$OMe | O |
| C-17302 | Me | single bond | H | c-Pr(1-C═CH) | C(═O)Me | Cl | $CH_2$OMe | O |
| C-17303 | Me(R) | single bond | H | c-Pr(1-C═CH) | C(═O)Me | Cl | $CH_2$OMe | O |
| C-17304 | Me(S) | single bond | H | c-Pr(1-C═CH) | C(═O)Me | Cl | $CH_2$OMe | O |
| C-17305 | H | single bond | Me | c-Pr(1-C═CH) | C(═O)Me | Me | $CH_2$OMe | O |
| C-17306 | Me | single bond | H | c-Pr(1-C═CH) | C(═O)Me | Me | $CH_2$OMe | O |
| C-17307 | Me(R) | single bond | H | c-Pr(1-C═CH) | C(═O)Me | Me | $CH_2$OMe | O |
| C-17308 | Me(S) | single bond | H | c-Pr(1-C═CH) | C(═O)Me | Me | $CH_2$OMe | O |
| C-17309 | H | single bond | Me | c-Pr[1-C(═O)OEt] | C(═O)Me | Cl | $CH_2$OMe | O |
| C-17310 | Me | single bond | H | c-Pr[1-C(═O)OEt] | C(═O)Me | Cl | $CH_2$OMe | O |

TABLE 622

| Compound Number | Y | W | Z | $R^1$ | $R^2$ | $R^3$ | $R^{10}$ | A |
|---|---|---|---|---|---|---|---|---|
| C-17311 | Me(R) | single bond | H | c-Pr[1-C(═O)OEt] | C(═O)Me | Cl | $CH_2$OMe | O |
| C-17312 | Me(S) | single bond | H | c-Pr[1-C(═O)OEt] | C(═O)Me | Cl | $CH_2$OMe | O |
| C-17313 | H | single bond | Me | c-Pr[1-C(═O)OEt] | C(═O)Me | Me | $CH_2$OMe | O |
| C-17314 | Me | single bond | H | c-Pr[1-C(═O)OEt] | C(═O)Me | Me | $CH_2$OMe | O |
| C-17315 | Me(R) | single bond | H | c-Pr[1-C(═O)OEt] | C(═O)Me | Me | $CH_2$OMe | O |
| C-17316 | Me(S) | single bond | H | c-Pr[1-C(═O)OEt] | C(═O)Me | Me | $CH_2$OMe | O |
| C-17317 | H | single bond | Me | c-Pr[1-C(═O)OH] | C(═O)Me | Cl | $CH_2$OMe | O |
| C-17318 | Me | single bond | H | c-Pr[1-C(═O)OH] | C(═O)Me | Cl | $CH_2$OMe | O |
| C-17319 | Me(R) | single bond | H | c-Pr[1-C(═O)OH] | C(═O)Me | Cl | $CH_2$OMe | O |
| C-17320 | Me(S) | single bond | H | c-Pr[1-C(═O)OH] | C(═O)Me | Cl | $CH_2$OMe | O |
| C-17321 | H | single bond | Me | c-Pr[1-C(═O)OH] | C(═O)Me | Me | $CH_2$OMe | O |
| C-17322 | Me | single bond | H | c-Pr[1-C(═O)OH] | C(═O)Me | Me | $CH_2$OMe | O |
| C-17323 | Me(R) | single bond | H | c-Pr[1-C(═O)OH] | C(═O)Me | Me | $CH_2$OMe | O |
| C-17324 | Me(S) | single bond | H | c-Pr[1-C(═O)OH] | C(═O)Me | Me | $CH_2$OMe | O |
| C-17325 | H | single bond | Me | c-Pr[1-C(═O)$NH_2$] | C(═O)Me | Cl | $CH_2$OMe | O |
| C-17326 | Me | single bond | H | c-Pr[1-C(═O)$NH_2$] | C(═O)Me | Cl | $CH_2$OMe | O |
| C-17327 | Me(R) | single bond | H | c-Pr[1-C(═O)$NH_2$] | C(═O)Me | Cl | $CH_2$OMe | O |
| C-17328 | Me(S) | single bond | H | c-Pr[1-C(═O)$NH_2$] | C(═O)Me | Cl | $CH_2$OMe | O |
| C-17329 | H | single bond | Me | c-Pr[1-C(═O)$NH_2$] | C(═O)Me | Me | $CH_2$OMe | O |
| C-17330 | Me | single bond | H | c-Pr[1-C(═O)$NH_2$] | C(═O)Me | Me | $CH_2$OMe | O |
| C-17331 | Me(R) | single bond | H | c-Pr[1-C(═O)$NH_2$] | C(═O)Me | Me | $CH_2$OMe | O |

TABLE 622-continued

| Compound Number | Y | W | Z | $R^1$ | $R^2$ | $R^3$ | $R^{10}$ | A |
|---|---|---|---|---|---|---|---|---|
| C-17332 | Me(S) | single bond | H | c-Pr[1-C(=O)$NH_2$] | C(=O)Me | Me | $CH_2OMe$ | O |
| C-17333 | H | single bond | Me | c-Pr(1-OMe) | C(=O)Me | Cl | $CH_2OMe$ | O |
| C-17334 | Me | single bond | H | c-Pr(1-OMe) | C(=O)Me | Cl | $CH_2OMe$ | O |
| C-17335 | Me(R) | single bond | H | c-Pr(1-OMe) | C(=O)Me | Cl | $CH_2OMe$ | O |
| C-17336 | Me(S) | single bond | H | c-Pr(1-OMe) | C(=O)Me | Cl | $CH_2OMe$ | O |
| C-17337 | H | single bond | Me | c-Pr(1-OMe) | C(=O)Me | Me | $CH_2OMe$ | O |
| C-17338 | Me | single bond | H | c-Pr(1-OMe) | C(=O)Me | Me | $CH_2OMe$ | O |
| C-17339 | Me(R) | single bond | H | c-Pr(1-OMe) | C(=O)Me | Me | $CH_2OMe$ | O |
| C-17340 | Me(S) | single bond | H | c-Pr(1-OMe) | C(=O)Me | Me | $CH_2OMe$ | O |
| C-17341 | H | single bond | Me | c-Pr(1-SMe) | C(=O)Me | Cl | $CH_2OMe$ | O |
| C-17342 | Me | single bond | H | c-Pr(1-SMe) | C(=O)Me | Cl | $CH_2OMe$ | O |
| C-17343 | Me(R) | single bond | H | c-Pr(1-SMe) | C(=O)Me | Cl | $CH_2OMe$ | O |
| C-17344 | Me(S) | single bond | H | c-Pr(1-SMe) | C(=O)Me | Cl | $CH_2OMe$ | O |
| C-17345 | H | single bond | Me | c-Pr(1-SMe) | C(=O)Me | Me | $CH_2OMe$ | O |
| C-17346 | Me | single bond | H | c-Pr(1-SMe) | C(=O)Me | Me | $CH_2OMe$ | O |
| C-17347 | Me(R) | single bond | H | c-Pr(1-SMe) | C(=O)Me | Me | $CH_2OMe$ | O |
| C-17348 | Me(S) | single bond | H | c-Pr(1-SMe) | C(=O)Me | Me | $CH_2OMe$ | O |
| C-17349 | H | single bond | Me | c-Pr[1-S(=O)Me] | C(=O)Me | Cl | $CH_2OMe$ | O |
| C-17350 | Me | single bond | H | c-Pr[1-S(=O)Me] | C(=O)Me | Cl | $CH_2OMe$ | O |
| C-17351 | Me(R) | single bond | H | c-Pr[1-S(=O)Me] | C(=O)Me | Cl | $CH_2OMe$ | O |
| C-17352 | Me(S) | single bond | H | c-Pr[1-S(=O)Me] | C(=O)Me | Cl | $CH_2OMe$ | O |
| C-17353 | H | single bond | Me | c-Pr[1-S(=O)Me] | C(=O)Me | Me | $CH_2OMe$ | O |
| C-17354 | Me | single bond | H | c-Pr[1-S(=O)Me] | C(=O)Me | Me | $CH_2OMe$ | O |

25

TABLE 623

| Compound Number | Y | W | Z | $R^1$ | $R^2$ | $R^3$ | $R^{10}$ | A |
|---|---|---|---|---|---|---|---|---|
| C-17355 | Me(R) | single bond | H | c-Pr[1-S(=O)Me] | C(=O)Me | Me | $CH_2OMe$ | O |
| C-17356 | Me(S) | single bond | H | c-Pr[1-S(=O)Me] | C(=O)Me | Me | $CH_2OMe$ | O |
| C-17357 | H | single bond | Me | c-Pr[1-S(=O)$_2$Me] | C(=O)Me | Cl | $CH_2OMe$ | O |
| C-17358 | Me | single bond | H | c-Pr[1-S(=O)$_2$Me] | C(=O)Me | Cl | $CH_2OMe$ | O |
| C-17359 | Me(R) | single bond | H | c-Pr[1-S(=O)$_2$Me] | C(=O)Me | Cl | $CH_2OMe$ | O |
| C-17360 | Me(S) | single bond | H | c-Pr[1-S(=O)$_2$Me] | C(=O)Me | Cl | $CH_2OMe$ | O |
| C-17361 | H | single bond | Me | c-Pr[1-S(=O)$_2$Me] | C(=O)Me | Me | $CH_2OMe$ | O |
| C-17362 | Me | single bond | H | c-Pr[1-S(=O)$_2$Me] | C(=O)Me | Me | $CH_2OMe$ | O |
| C-17363 | Me(R) | single bond | H | c-Pr[1-S(=O)$_2$Me] | C(=O)Me | Me | $CH_2OMe$ | O |
| C-17364 | Me(S) | single bond | H | c-Pr[1-S(=O)$_2$Me] | C(=O)Me | Me | $CH_2OMe$ | O |
| C-17365 | H | single bond | Me | c-Pr[1-S(=O)$_2$$CHF_2$] | C(=O)Me | Cl | $CH_2OMe$ | O |
| C-17366 | Me | single bond | H | c-Pr[1-S(=O)$_2$$CHF_2$] | C(=O)Me | Cl | $CH_2OMe$ | O |
| C-17367 | Me(R) | single bond | H | c-Pr[1-S(=O)$_2$$CHF_2$] | C(=O)Me | Cl | $CH_2OMe$ | O |
| C-17368 | Me(S) | single bond | H | c-Pr[1-S(=O)$_2$$CHF_2$] | C(=O)Me | Cl | $CH_2OMe$ | O |
| C-17369 | H | single bond | Me | c-Pr[1-S(=O)$_2$$CHF_2$] | C(=O)Me | Me | $CH_2OMe$ | O |
| C-17370 | Me | single bond | H | c-Pr[1-S(=O)$_2$$CHF_2$] | C(=O)Me | Me | $CH_2OMe$ | O |
| C-17371 | Me(R) | single bond | H | c-Pr[1-S(=O)$_2$$CHF_2$] | C(=O)Me | Me | $CH_2OMe$ | O |
| C-17372 | Me(S) | single bond | H | c-Pr[1-S(=O)$_2$$CHF_2$] | C(=O)Me | Me | $CH_2OMe$ | O |
| C-17373 | H | single bond | Me | c-Pr[1-S(=O)$_2$$CF_3$] | C(=O)Me | Cl | $CH_2OMe$ | O |
| C-17374 | Me | single bond | H | c-Pr[1-S(=O)$_2$$CF_3$] | C(=O)Me | Cl | $CH_2OMe$ | O |
| C-17375 | Me(R) | single bond | H | c-Pr[1-S(=O)$_2$$CF_3$] | C(=O)Me | Cl | $CH_2OMe$ | O |
| C-17376 | Me(S) | single bond | H | c-Pr[1-S(=O)$_2$$CF_3$] | C(=O)Me | Cl | $CH_2OMe$ | O |
| C-17377 | H | single bond | Me | c-Pr[1-S(=O)$_2$$CF_3$] | C(=O)Me | Me | $CH_2OMe$ | O |
| C-17378 | Me | single bond | H | c-Pr[1-S(=O)$_2$$CF_3$] | C(=O)Me | Me | $CH_2OMe$ | O |
| C-17379 | Me(R) | single bond | H | c-Pr[1-S(=O)$_2$$CF_3$] | C(=O)Me | Me | $CH_2OMe$ | O |
| C-17380 | Me(S) | single bond | H | c-Pr[1-S(=O)$_2$$CF_3$] | C(=O)Me | Me | $CH_2OMe$ | O |
| C-17381 | H | single bond | Me | c-Pr[1-(5,6-dihydro-1,4,2-dioxazin-3-yl)] | C(=O)Me | Cl | $CH_2OMe$ | O |
| C-17382 | Me | single bond | H | c-Pr[1-(5,6-dihydro-1,4,2-dioxazin-3-yl)] | C(=O)Me | Cl | $CH_2OMe$ | O |
| C-17383 | Me(R) | single bond | H | c-Pr[1-(5,6-dihydro-1,4,2-dioxazin-3-yl)] | C(=O)Me | Cl | $CH_2OMe$ | O |
| C-17384 | Me(S) | single bond | H | c-Pr[1-(5,6-dihydro-1,4,2-dioxazin-3-yl)] | C(=O)Me | Cl | $CH_2OMe$ | O |
| C-17385 | H | single bond | Me | c-Pr[1-(5,6-dihydro-1,4,2-dioxazin-3-yl)] | C(=O)Me | Me | $CH_2OMe$ | O |
| C-17386 | Me | single bond | H | c-Pr[1-(5,6-dihydro-1,4,2-dioxazin-3-yl)] | C(=O)Me | Me | $CH_2OMe$ | O |
| C-17387 | Me(R) | single bond | H | c-Pr[1-(5,6-dihydro-1,4,2-dioxazin-3-yl)] | C(=O)Me | Me | $CH_2OMe$ | O |
| C-17388 | Me(S) | single bond | H | c-Pr[1-(5,6-dihydro-1,4,2-dioxazin-3-yl)] | C(=O)Me | Me | $CH_2OMe$ | O |
| C-17389 | H | single bond | Me | c-Pr[1-(5-hydroxy-1,3,4-oxadiazol-2-yl)] | C(=O)Me | Cl | $CH_2OMe$ | O |
| C-17390 | Me | single bond | H | c-Pr[1-(5-hydroxy-1,3,4-oxadiazol-2-yl)] | C(=O)Me | Cl | $CH_2OMe$ | O |
| C-17391 | Me(R) | single bond | H | c-Pr[1-(5-hydroxy-1,3,4-oxadiazol-2-yl)] | C(=O)Me | Cl | $CH_2OMe$ | O |
| C-17392 | Me(S) | single bond | H | c-Pr[1-(5-hydroxy-1,3,4-oxadiazol-2-yl)] | C(=O)Me | Cl | $CH_2OMe$ | O |
| C-17393 | H | single bond | Me | c-Pr[1-(5-hydroxy-1,3,4-oxadiazol-2-yl)] | C(=O)Me | Me | $CH_2OMe$ | O |
| C-17394 | Me | single bond | H | c-Pr[1-(5-hydroxy-1,3,4-oxadiazol-2-yl)] | C(=O)Me | Me | $CH_2OMe$ | O |
| C-17395 | Me(R) | single bond | H | c-Pr[1-(5-hydroxy-1,3,4-oxadiazol-2-yl)] | C(=O)Me | Me | $CH_2OMe$ | O |
| C-17396 | Me(S) | single bond | H | c-Pr[1-(5-hydroxy-1,3,4-oxadiazol-2-yl)] | C(=O)Me | Me | $CH_2OMe$ | O |

TABLE 623-continued

| Compound Number | Y | W | Z | $R^1$ | $R^2$ | $R^3$ | $R^{10}$ | A |
|---|---|---|---|---|---|---|---|---|
| C-17397 | H | single bond | Me | c-Pr[1-(pyrimidin-2-yl)] | C(=O)Me | Cl | $CH_2OMe$ | O |
| C-17398 | Me | single bond | H | c-Pr[1-(pyrimidin-2-yl)] | C(=O)Me | Cl | $CH_2OMe$ | O |

TABLE 624

| Compound Number | Y | W | Z | $R^1$ | $R^2$ | $R^3$ | $R^{10}$ | A |
|---|---|---|---|---|---|---|---|---|
| C-17399 | Me(R) | single bond | H | c-Pr[1-(pyrimidin-2-yl)] | C(=O)Me | Cl | $CH_2OMe$ | O |
| C-17400 | Me(S) | single bond | H | c-Pr[1-(pyrimidin-2-yl)] | C(=O)Me | Cl | $CH_2OMe$ | O |
| C-17401 | H | single bond | Me | c-Pr[1-(pyrimidin-2-yl)] | C(=O)Me | Me | $CH_2OMe$ | O |
| C-17402 | Me | single bond | H | c-Pr[1-(pyrimidin-2-yl)] | C(=O)Me | Me | $CH_2OMe$ | O |
| C-17403 | Me(R) | single bond | H | c-Pr[1-(pyrimidin-2-yl)] | C(=O)Me | Me | $CH_2OMe$ | O |
| C-17404 | Me(S) | single bond | H | c-Pr[1-(pyrimidin-2-yl)] | C(=O)Me | Me | $CH_2OMe$ | O |
| C-17405 | H | single bond | Me | t-Bu | C(=O)Me | Cl | $CH_2OMe$ | O |
| C-17406 | Me | single bond | H | t-Bu | C(=O)Me | Cl | $CH_2OMe$ | O |
| C-17407 | Me(R) | single bond | H | t-Bu | C(=O)Me | Cl | $CH_2OMe$ | O |
| C-17408 | Me(S) | single bond | H | t-Bu | C(=O)Me | Cl | $CH_2OMe$ | O |
| C-17409 | H | single bond | Me | t-Bu | C(=O)Me | Me | $CH_2OMe$ | O |
| C-17410 | Me | single bond | H | t-Bu | C(=O)Me | Me | $CH_2OMe$ | O |
| C-17411 | Me(R) | single bond | H | t-Bu | C(=O)Me | Me | $CH_2OMe$ | O |
| C-17412 | Me(S) | single bond | H | t-Bu | C(=O)Me | Me | $CH_2OMe$ | O |
| C-17413 | H | single bond | Me | c-Bu | C(=O)Me | Cl | $CH_2OMe$ | O |
| C-17414 | Me | single bond | H | c-Bu | C(=O)Me | Cl | $CH_2OMe$ | O |
| C-17415 | Me(R) | single bond | H | c-Bu | C(=O)Me | Cl | $CH_2OMe$ | O |
| C-17416 | Me(S) | single bond | H | c-Bu | C(=O)Me | Cl | $CH_2OMe$ | O |
| C-17417 | H | single bond | Me | c-Bu | C(=O)Me | Me | $CH_2OMe$ | O |
| C-17418 | Me | single bond | H | c-Bu | C(=O)Me | Me | $CH_2OMe$ | O |
| C-17419 | Me(R) | single bond | H | c-Bu | C(=O)Me | Me | $CH_2OMe$ | O |
| C-17420 | Me(S) | single bond | H | c-Bu | C(=O)Me | Me | $CH_2OMe$ | O |
| C-17421 | H | single bond | Me | c-Bu(1-CN) | C(=O)Me | Cl | $CH_2OMe$ | O |
| C-17422 | Me | single bond | H | c-Bu(1-CN) | C(=O)Me | Cl | $CH_2OMe$ | O |
| C-17423 | Me(R) | single bond | H | c-Bu(1-CN) | C(=O)Me | Cl | $CH_2OMe$ | O |
| C-17424 | Me(S) | single bond | H | c-Bu(1-CN) | C(=O)Me | Cl | $CH_2OMe$ | O |
| C-17425 | H | single bond | Me | c-Bu(1-CN) | C(=O)Me | Me | $CH_2OMe$ | O |
| C-17426 | Me | single bond | H | c-Bu(1-CN) | C(=O)Me | Me | $CH_2OMe$ | O |
| C-17427 | Me(R) | single bond | H | c-Bu(1-CN) | C(=O)Me | Me | $CH_2OMe$ | O |
| C-17428 | Me(S) | single bond | H | c-Bu(1-CN) | C(=O)Me | Me | $CH_2OMe$ | O |
| C-17429 | H | single bond | Me | c-Bu(3,3-$F_2$) | C(=O)Me | Cl | $CH_2OMe$ | O |
| C-17430 | Me | single bond | H | c-Bu(3,3-$F_2$) | C(=O)Me | Cl | $CH_2OMe$ | O |
| C-17431 | Me(R) | single bond | H | c-Bu(3,3-$F_2$) | C(=O)Me | Cl | $CH_2OMe$ | O |
| C-17432 | Me(S) | single bond | H | c-Bu(3,3-$F_2$) | C(=O)Me | Cl | $CH_2OMe$ | O |
| C-17433 | H | single bond | Me | c-Bu(3,3-$F_2$) | C(=O)Me | Me | $CH_2OMe$ | O |
| C-17434 | Me | single bond | H | c-Bu(3,3-$F_2$) | C(=O)Me | Me | $CH_2OMe$ | O |
| C-17435 | Me(R) | single bond | H | c-Bu(3,3-$F_2$) | C(=O)Me | Me | $CH_2OMe$ | O |
| C-17436 | Me(S) | single bond | H | c-Bu(3,3-$F_2$) | C(=O)Me | Me | $CH_2OMe$ | O |
| C-17437 | H | single bond | Me | oxetan-3-yl | C(=O)Me | Cl | $CH_2OMe$ | O |
| C-17438 | Me | single bond | H | oxetan-3-yl | C(=O)Me | Cl | $CH_2OMe$ | O |
| C-17439 | Me(R) | single bond | H | oxetan-3-yl | C(=O)Me | Cl | $CH_2OMe$ | O |
| C-17440 | Me(S) | single bond | H | oxetan-3-yl | C(=O)Me | Cl | $CH_2OMe$ | O |
| C-17441 | H | single bond | Me | oxetan-3-yl | C(=O)Me | Me | $CH_2OMe$ | O |
| C-17442 | Me | single bond | H | oxetan-3-yl | C(=O)Me | Me | $CH_2OMe$ | O |

TABLE 625

| Compound Number | Y | W | Z | $R^1$ | $R^2$ | $R^3$ | $R^{10}$ | A |
|---|---|---|---|---|---|---|---|---|
| C-17443 | Me(R) | single bond | H | oxetan-3-yl | C(=O)Me | Me | $CH_2OMe$ | O |
| C-17444 | Me(S) | single bond | H | oxetan-3-yl | C(=O)Me | Me | $CH_2OMe$ | O |
| C-17445 | H | single bond | Me | oxetan(3-CN)-3-yl | C(=O)Me | Cl | $CH_2OMe$ | O |
| C-17446 | Me | single bond | H | oxetan(3-CN)-3-yl | C(=O)Me | Cl | $CH_2OMe$ | O |
| C-17447 | Me(R) | single bond | H | oxetan(3-CN)-3-yl | C(=O)Me | Cl | $CH_2OMe$ | O |
| C-17448 | Me(S) | single bond | H | oxetan(3-CN)-3-yl | C(=O)Me | Cl | $CH_2OMe$ | O |
| C-17449 | H | single bond | Me | oxetan(3-CN)-3-yl | C(=O)Me | Me | $CH_2OMe$ | O |
| C-17450 | Me | single bond | H | oxetan(3-CN)-3-yl | C(=O)Me | Me | $CH_2OMe$ | O |
| C-17451 | Me(R) | single bond | H | oxetan(3-CN)-3-yl | C(=O)Me | Me | $CH_2OMe$ | O |
| C-17452 | Me(S) | single bond | H | oxetan(3-CN)-3-yl | C(=O)Me | Me | $CH_2OMe$ | O |

TABLE 625-continued

| Compound Number | Y | W | Z | $R^1$ | $R^2$ | $R^3$ | $R^{10}$ | A |
|---|---|---|---|---|---|---|---|---|
| C-17453 | H | single bond | Me | azetidin[1-C(═O)Me]-3-yl | C(═O)Me | Cl | $CH_2OMe$ | O |
| C-17454 | Me | single bond | H | azetidin[1-C(═O)Me]-3-yl | C(═O)Me | Cl | $CH_2OMe$ | O |
| C-17455 | Me(R) | single bond | H | azetidin[1-C(═O)Me]-3-yl | C(═O)Me | Cl | $CH_2OMe$ | O |
| C-17456 | Me(S) | single bond | H | azetidin[1-C(═O)Me]-3-yl | C(═O)Me | Cl | $CH_2OMe$ | O |
| C-17457 | H | single bond | Me | azetidin[1-C(═O)Me]-3-yl | C(═O)Me | Me | $CH_2OMe$ | O |
| C-17458 | Me | single bond | H | azetidin[1-C(═O)Me]-3-yl | C(═O)Me | Me | $CH_2OMe$ | O |
| C-17459 | Me(R) | single bond | H | azetidin[1-C(═O)Me]-3-yl | C(═O)Me | Me | $CH_2OMe$ | O |
| C-17460 | Me(S) | single bond | H | azetidin[1-C(═O)Me]-3-yl | C(═O)Me | Me | $CH_2OMe$ | O |
| C-17461 | H | single bond | Me | azetidin[1-S(═O)$_2$Me]-3-yl | C(═O)Me | Cl | $CH_2OMe$ | O |
| C-17462 | Me | single bond | H | azetidin[1-S(═O)$_2$Me]-3-yl | C(═O)Me | Cl | $CH_2OMe$ | O |
| C-17463 | Me(R) | single bond | H | azetidin[1-S(═O)$_2$Me]-3-yl | C(═O)Me | Cl | $CH_2OMe$ | O |
| C-17464 | Me(S) | single bond | H | azetidin[1-S(═O)$_2$Me]-3-yl | C(═O)Me | Cl | $CH_2OMe$ | O |
| C-17465 | H | single bond | Me | azetidin[1-S(═O)$_2$Me]-3-yl | C(═O)Me | Me | $CH_2OMe$ | O |
| C-17466 | Me | single bond | H | azetidin[1-S(═O)$_2$Me]-3-yl | C(═O)Me | Me | $CH_2OMe$ | O |
| C-17467 | Me(R) | single bond | H | azetidin[1-S(═O)$_2$Me]-3-yl | C(═O)Me | Me | $CH_2OMe$ | O |
| C-17468 | Me(S) | single bond | H | azetidin[1-S(═O)$_2$Me]-3-yl | C(═O)Me | Me | $CH_2OMe$ | O |
| C-17469 | H | single bond | Me | azetidin[1-S(═O)$_2$CHF$_2$]-3-yl | C(═O)Me | Cl | $CH_2OMe$ | O |
| C-17470 | Me | single bond | H | azetidin[1-S(═O)$_2$CHF$_2$]-3-yl | C(═O)Me | Cl | $CH_2OMe$ | O |
| C-17471 | Me(R) | single bond | H | azetidin[1-S(═O)$_2$CHF$_2$]-3-yl | C(═O)Me | Cl | $CH_2OMe$ | O |
| C-17472 | Me(S) | single bond | H | azetidin[1-S(═O)$_2$CHF$_2$]-3-yl | C(═O)Me | Cl | $CH_2OMe$ | O |
| C-17473 | H | single bond | Me | azetidin[1-S(═O)$_2$CHF$_2$]-3-yl | C(═O)Me | Me | $CH_2OMe$ | O |
| C-17474 | Me | single bond | H | azetidin[1-S(═O)$_2$CHF$_2$]-3-yl | C(═O)Me | Me | $CH_2OMe$ | O |
| C-17475 | Me(R) | single bond | H | azetidin[1-S(═O)$_2$CHF$_2$]-3-yl | C(═O)Me | Me | $CH_2OMe$ | O |
| C-17476 | Me(S) | single bond | H | azetidin[1-S(═O)$_2$CHF$_2$]-3-yl | C(═O)Me | Me | $CH_2OMe$ | O |
| C-17477 | H | single bond | Me | c-Pen | C(═O)Me | Cl | $CH_2OMe$ | O |
| C-17478 | Me | single bond | H | c-Pen | C(═O)Me | Cl | $CH_2OMe$ | O |
| C-17479 | Me(R) | single bond | H | c-Pen | C(═O)Me | Cl | $CH_2OMe$ | O |
| C-17480 | Me(S) | single bond | H | c-Pen | C(═O)Me | Cl | $CH_2OMe$ | O |
| C-17481 | H | single bond | Me | c-Pen | C(═O)Me | Me | $CH_2OMe$ | O |
| C-17482 | Me | single bond | H | c-Pen | C(═O)Me | Me | $CH_2OMe$ | O |
| C-17483 | Me(R) | single bond | H | c-Pen | C(═O)Me | Me | $CH_2OMe$ | O |
| C-17484 | Me(S) | single bond | H | c-Pen | C(═O)Me | Me | $CH_2OMe$ | O |
| C-17485 | H | single bond | Me | tetrahydrofuran-3-yl | C(═O)Me | Cl | $CH_2OMe$ | O |
| C-17486 | Me | single bond | H | tetrahydrofuran-3-yl | C(═O)Me | Cl | $CH_2OMe$ | O |

TABLE 626

| Compound Number | Y | W | Z | $R^1$ | $R^2$ | $R^3$ | $R^{10}$ | A |
|---|---|---|---|---|---|---|---|---|
| C-17487 | Me(R) | single bond | H | tetrahydrofuran-3-yl | C(═O)Me | Cl | $CH_2OMe$ | O |
| C-17488 | Me(S) | single bond | H | tetrahydrofuran-3-yl | C(═O)Me | Cl | $CH_2OMe$ | O |
| C-17489 | H | single bond | Me | tetrahydrofuran-3-yl | C(═O)Me | Me | $CH_2OMe$ | O |
| C-17490 | Me | single bond | H | tetrahydrofuran-3-yl | C(═O)Me | Me | $CH_2OMe$ | O |
| C-17491 | Me(R) | single bond | H | tetrahydrofuran-3-yl | C(═O)Me | Me | $CH_2OMe$ | O |
| C-17492 | Me(S) | single bond | H | tetrahydrofuran-3-yl | C(═O)Me | Me | $CH_2OMe$ | O |
| C-17493 | H | single bond | Me | tetrahydrothiophen-3-yl | C(═O)Me | Cl | $CH_2OMe$ | O |
| C-17494 | Me | single bond | H | tetrahydrothiophen-3-yl | C(═O)Me | Cl | $CH_2OMe$ | O |
| C-17495 | Me(R) | single bond | H | tetrahydrothiophen-3-yl | C(═O)Me | Cl | $CH_2OMe$ | O |
| C-17496 | Me(S) | single bond | H | tetrahydrothiophen-3-yl | C(═O)Me | Cl | $CH_2OMe$ | O |
| C-17497 | H | single bond | Me | tetrahydrothiophen-3-yl | C(═O)Me | Me | $CH_2OMe$ | O |
| C-17498 | Me | single bond | H | tetrahydrothiophen-3-yl | C(═O)Me | Me | $CH_2OMe$ | O |
| C-17499 | Me(R) | single bond | H | tetrahydrothiophen-3-yl | C(═O)Me | Me | $CH_2OMe$ | O |
| C-17500 | Me(S) | single bond | H | tetrahydrothiophen-3-yl | C(═O)Me | Me | $CH_2OMe$ | O |
| C-17501 | H | single bond | Me | c-Pen(1-CN) | C(═O)Me | Cl | $CH_2OMe$ | O |
| C-17502 | Me | single bond | H | c-Pen(1-CN) | C(═O)Me | Cl | $CH_2OMe$ | O |
| C-17503 | Me(R) | single bond | H | c-Pen(1-CN) | C(═O)Me | Cl | $CH_2OMe$ | O |
| C-17504 | Me(S) | single bond | H | c-Pen(1-CN) | C(═O)Me | Cl | $CH_2OMe$ | O |
| C-17505 | H | single bond | Me | c-Pen(1-CN) | C(═O)Me | Me | $CH_2OMe$ | O |
| C-17506 | Me | single bond | H | c-Pen(1-CN) | C(═O)Me | Me | $CH_2OMe$ | O |
| C-17507 | Me(R) | single bond | H | c-Pen(1-CN) | C(═O)Me | Me | $CH_2OMe$ | O |
| C-17508 | Me(S) | single bond | H | c-Pen(1-CN) | C(═O)Me | Me | $CH_2OMe$ | O |
| C-17509 | H | single bond | Me | tetrahydrofuran(3-CN)-3-yl | C(═O)Me | Cl | $CH_2OMe$ | O |
| C-17510 | Me | single bond | H | tetrahydrofuran(3-CN)-3-yl | C(═O)Me | Cl | $CH_2OMe$ | O |
| C-17511 | Me(R) | single bond | H | tetrahydrofuran(3-CN)-3-yl | C(═O)Me | Cl | $CH_2OMe$ | O |
| C-17512 | Me(S) | single bond | H | tetrahydrofuran(3-CN)-3-yl | C(═O)Me | Cl | $CH_2OMe$ | O |
| C-17513 | H | single bond | Me | tetrahydrofuran(3-CN)-3-yl | C(═O)Me | Me | $CH_2OMe$ | O |
| C-17514 | Me | single bond | H | tetrahydrofuran(3-CN)-3-yl | C(═O)Me | Me | $CH_2OMe$ | O |
| C-17515 | Me(R) | single bond | H | tetrahydrofuran(3-CN)-3-yl | C(═O)Me | Me | $CH_2OMe$ | O |
| C-17516 | Me(S) | single bond | H | tetrahydrofuran(3-CN)-3-yl | C(═O)Me | Me | $CH_2OMe$ | O |
| C-17517 | H | single bond | Me | tetrahydrothiophen(3-CN)-3-yl | C(═O)Me | Cl | $CH_2OMe$ | O |
| C-17518 | Me | single bond | H | tetrahydrothiophen(3-CN)-3-yl | C(═O)Me | Cl | $CH_2OMe$ | O |
| C-17519 | Me(R) | single bond | H | tetrahydrothiophen(3-CN)-3-yl | C(═O)Me | Cl | $CH_2OMe$ | O |

TABLE 626-continued

| Compound Number | Y | W | Z | $R^1$ | $R^2$ | $R^3$ | $R^{10}$ | A |
|---|---|---|---|---|---|---|---|---|
| C-17520 | Me(S) | single bond | H | tetrahydrothiophen(3-CN)-3-yl | C(═O)Me | Cl | $CH_2OMe$ | O |
| C-17521 | H | single bond | Me | tetrahydrothiophen(3-CN)-3-yl | C(═O)Me | Me | $CH_2OMe$ | O |
| C-17522 | Me | single bond | H | tetrahydrothiophen(3-CN)-3-yl | C(═O)Me | Me | $CH_2OMe$ | O |
| C-17523 | Me(R) | single bond | H | tetrahydrothiophen(3-CN)-3-yl | C(═O)Me | Me | $CH_2OMe$ | O |
| C-17524 | Me(S) | single bond | H | tetrahydrothiophen(3-CN)-3-yl | C(═O)Me | Me | $CH_2OMe$ | O |
| C-17525 | H | single bond | Me | bicyclo[1.1.1]pentan-1-yl | C(═O)Me | Cl | $CH_2OMe$ | O |
| C-17526 | Me | single bond | H | bicyclo[1.1.1]pentan-1-yl | C(═O)Me | Cl | $CH_2OMe$ | O |
| C-17527 | Me(R) | single bond | H | bicyclo[1.1.1]pentan-1-yl | C(═O)Me | Cl | $CH_2OMe$ | O |
| C-17528 | Me(S) | single bond | H | bicyclo[1.1.1]pentan-1-yl | C(═O)Me | Cl | $CH_2OMe$ | O |
| C-17529 | H | single bond | Me | bicyclo[1.1.1]pentan-1-yl | C(═O)Me | Me | $CH_2OMe$ | O |
| C-17530 | Me | single bond | H | bicyclo[1.1.1]pentan-1-yl | C(═O)Me | Me | $CH_2OMe$ | O |

TABLE 627

| Compound Number | Y | W | Z | $R^1$ | $R^2$ | $R^3$ | $R^{10}$ | A |
|---|---|---|---|---|---|---|---|---|
| C-17531 | Me(R) | single bond | H | bicyclo[1.1.1]pentan-1-yl | C(═O)Me | Me | $CH_2OMe$ | O |
| C-17532 | Me(S) | single bond | H | bicyclo[1.1.1]pentan-1-yl | C(═O)Me | Me | $CH_2OMe$ | O |
| C-17533 | H | single bond | Me | c-Hex | C(═O)Me | Cl | $CH_2OMe$ | O |
| C-17534 | Me | single bond | H | c-Hex | C(═O)Me | Cl | $CH_2OMe$ | O |
| C-17535 | Me(R) | single bond | H | c-Hex | C(═O)Me | Cl | $CH_2OMe$ | O |
| C-17536 | Me(S) | single bond | H | c-Hex | C(═O)Me | Cl | $CH_2OMe$ | O |
| C-17537 | H | single bond | Me | c-Hex | C(═O)Me | Me | $CH_2OMe$ | O |
| C-17538 | Me | single bond | H | c-Hex | C(═O)Me | Me | $CH_2OMe$ | O |
| C-17539 | Me(R) | single bond | H | c-Hex | C(═O)Me | Me | $CH_2OMe$ | O |
| C-17540 | Me(S) | single bond | H | c-Hex | C(═O)Me | Me | $CH_2OMe$ | O |
| C-17541 | H | single bond | Me | tetrahydropyran-4-yl | C(═O)Me | Cl | $CH_2OMe$ | O |
| C-17542 | Me | single bond | H | tetrahydropyran-4-yl | C(═O)Me | Cl | $CH_2OMe$ | O |
| C-17543 | Me(R) | single bond | H | tetrahydropyran-4-yl | C(═O)Me | Cl | $CH_2OMe$ | O |
| C-17544 | Me(S) | single bond | H | tetrahydropyran-4-yl | C(═O)Me | Cl | $CH_2OMe$ | O |
| C-17545 | H | single bond | Me | tetrahydropyran-4-yl | C(═O)Me | Me | $CH_2OMe$ | O |
| C-17546 | Me | single bond | H | tetrahydropyran-4-yl | C(═O)Me | Me | $CH_2OMe$ | O |
| C-17547 | Me(R) | single bond | H | tetrahydropyran-4-yl | C(═O)Me | Me | $CH_2OMe$ | O |
| C-17548 | Me(S) | single bond | H | tetrahydropyran-4-yl | C(═O)Me | Me | $CH_2OMe$ | O |
| C-17549 | H | single bond | Me | tetrahydrothiopyran-4-yl | C(═O)Me | Cl | $CH_2OMe$ | O |
| C-17550 | Me | single bond | H | tetrahydrothiopyran-4-yl | C(═O)Me | Cl | $CH_2OMe$ | O |
| C-17551 | Me(R) | single bond | H | tetrahydrothiopyran-4-yl | C(═O)Me | Cl | $CH_2OMe$ | O |
| C-17552 | Me(S) | single bond | H | tetrahydrothiopyran-4-yl | C(═O)Me | Cl | $CH_2OMe$ | O |
| C-17553 | H | single bond | Me | tetrahydrothiopyran-4-yl | C(═O)Me | Me | $CH_2OMe$ | O |
| C-17554 | Me | single bond | H | tetrahydrothiopyran-4-yl | C(═O)Me | Me | $CH_2OMe$ | O |
| C-17555 | Me(R) | single bond | H | tetrahydrothiopyran-4-yl | C(═O)Me | Me | $CH_2OMe$ | O |
| C-17556 | Me(S) | single bond | H | tetrahydrothiopyran-4-yl | C(═O)Me | Me | $CH_2OMe$ | O |
| C-17557 | H | single bond | Me | c-Hex(1-CN) | C(═O)Me | Cl | $CH_2OMe$ | O |
| C-17558 | Me | single bond | H | c-Hex(1-CN) | C(═O)Me | Cl | $CH_2OMe$ | O |
| C-17559 | Me(R) | single bond | H | c-Hex(1-CN) | C(═O)Me | Cl | $CH_2OMe$ | O |
| C-17560 | Me(S) | single bond | H | c-Hex(1-CN) | C(═O)Me | Cl | $CH_2OMe$ | O |
| C-17561 | H | single bond | Me | c-Hex(1-CN) | C(═O)Me | Me | $CH_2OMe$ | O |
| C-17562 | Me | single bond | H | c-Hex(1-CN) | C(═O)Me | Me | $CH_2OMe$ | O |
| C-17563 | Me(R) | single bond | H | c-Hex(1-CN) | C(═O)Me | Me | $CH_2OMe$ | O |
| C-17564 | Me(S) | single bond | H | c-Hex(1-CN) | C(═O)Me | Me | $CH_2OMe$ | O |
| C-17565 | H | single bond | Me | tetrahydropyran(4-CN)-4-yl | C(═O)Me | Cl | $CH_2OMe$ | O |
| C-17566 | Me | single bond | H | tetrahydropyran(4-CN)-4-yl | C(═O)Me | Cl | $CH_2OMe$ | O |
| C-17567 | Me(R) | single bond | H | tetrahydropyran(4-CN)-4-yl | C(═O)Me | Cl | $CH_2OMe$ | O |
| C-17568 | Me(S) | single bond | H | tetrahydropyran(4-CN)-4-yl | C(═O)Me | Cl | $CH_2OMe$ | O |
| C-17569 | H | single bond | Me | tetrahydropyran(4-CN)-4-yl | C(═O)Me | Me | $CH_2OMe$ | O |
| C-17570 | Me | single bond | H | tetrahydropyran(4-CN)-4-yl | C(═O)Me | Me | $CH_2OMe$ | O |
| C-17571 | Me(R) | single bond | H | tetrahydropyran(4-CN)-4-yl | C(═O)Me | Me | $CH_2OMe$ | O |
| C-17572 | Me(S) | single bond | H | tetrahydropyran(4-CN)-4-yl | C(═O)Me | Me | $CH_2OMe$ | O |
| C-17573 | H | single bond | Me | tetrahydrothiopyran(4-CN)-4-yl | C(═O)Me | Cl | $CH_2OMe$ | O |
| C-17574 | Me | single bond | H | tetrahydrothiopyran(4-CN)-4-yl | C(═O)Me | Cl | $CH_2OMe$ | O |

TABLE 628

| Compound Number | Y | W | Z | $R^1$ | $R^2$ | $R^3$ | $R^{10}$ | A |
|---|---|---|---|---|---|---|---|---|
| C-17575 | Me(R) | single bond | H | tetrahydrothiopyran(4-CN)-4-yl | C(═O)Me | Cl | $CH_2OMe$ | O |
| C-17576 | Me(S) | single bond | H | tetrahydrothiopyran(4-CN)-4-yl | C(═O)Me | Cl | $CH_2OMe$ | O |
| C-17577 | H | single bond | Me | tetrahydrothiopyran(4-CN)-4-yl | C(═O)Me | Me | $CH_2OMe$ | O |

TABLE 628-continued

| Compound Number | Y | W | Z | $R^1$ | $R^2$ | $R^3$ | $R^{10}$ | A |
|---|---|---|---|---|---|---|---|---|
| C-17578 | Me | single bond | H | tetrahydrothiopyran(4-CN)-4-yl | C(=O)Me | Me | $CH_2OMe$ | O |
| C-17579 | Me(R) | single bond | H | tetrahydrothiopyran(4-CN)-4-yl | C(=O)Me | Me | $CH_2OMe$ | O |
| C-17580 | Me(S) | single bond | H | tetrahydrothiopyran(4-CN)-4-yl | C(=O)Me | Me | $CH_2OMe$ | O |
| C-17581 | H | single bond | Me | $CH_2$(c-Pr) | C(=O)Me | Cl | $CH_2OMe$ | O |
| C-17582 | Me | single bond | H | $CH_2$(c-Pr) | C(=O)Me | Cl | $CH_2OMe$ | O |
| C-17583 | Me(R) | single bond | H | $CH_2$(c-Pr) | C(=O)Me | Cl | $CH_2OMe$ | O |
| C-17584 | Me(S) | single bond | H | $CH_2$(c-Pr) | C(=O)Me | Cl | $CH_2OMe$ | O |
| C-17585 | H | single bond | Me | $CH_2$(c-Pr) | C(=O)Me | Me | $CH_2OMe$ | O |
| C-17586 | Me | single bond | H | $CH_2$(c-Pr) | C(=O)Me | Me | $CH_2OMe$ | O |
| C-17587 | Me(R) | single bond | H | $CH_2$(c-Pr) | C(=O)Me | Me | $CH_2OMe$ | O |
| C-17588 | Me(S) | single bond | H | $CH_2$(c-Pr) | C(=O)Me | Me | $CH_2OMe$ | O |
| C-17589 | H | single bond | Me | $CH_2$[c-Pr(1-CN)] | C(=O)Me | Cl | $CH_2OMe$ | O |
| C-17590 | Me | single bond | H | $CH_2$[c-Pr(1-CN)] | C(=O)Me | Cl | $CH_2OMe$ | O |
| C-17591 | Me(R) | single bond | H | $CH_2$[c-Pr(1-CN)] | C(=O)Me | Cl | $CH_2OMe$ | O |
| C-17592 | Me(S) | single bond | H | $CH_2$[c-Pr(1-CN)] | C(=O)Me | Cl | $CH_2OMe$ | O |
| C-17593 | H | single bond | Me | $CH_2$[c-Pr(1-CN)] | C(=O)Me | Me | $CH_2OMe$ | O |
| C-17594 | Me | single bond | H | $CH_2$[c-Pr(1-CN)] | C(=O)Me | Me | $CH_2OMe$ | O |
| C-17595 | Me(R) | single bond | H | $CH_2$[c-Pr(1-CN)] | C(=O)Me | Me | $CH_2OMe$ | O |
| C-17596 | Me(S) | single bond | H | $CH_2$[c-Pr(1-CN)] | C(=O)Me | Me | $CH_2OMe$ | O |
| C-17597 | H | single bond | Me | CH(Me)(c-Pr) | C(=O)Me | Cl | $CH_2OMe$ | O |
| C-17598 | Me | single bond | H | CH(Me)(c-Pr) | C(=O)Me | Cl | $CH_2OMe$ | O |
| C-17599 | Me(R) | single bond | H | CH(Me)(c-Pr) | C(=O)Me | Cl | $CH_2OMe$ | O |
| C-17600 | Me(S) | single bond | H | CH(Me)(c-Pr) | C(=O)Me | Cl | $CH_2OMe$ | O |
| C-17601 | H | single bond | Me | CH(Me)(c-Pr) | C(=O)Me | Me | $CH_2OMe$ | O |
| C-17602 | Me | single bond | H | CH(Me)(c-Pr) | C(=O)Me | Me | $CH_2OMe$ | O |
| C-17603 | Me(R) | single bond | H | CH(Me)(c-Pr) | C(=O)Me | Me | $CH_2OMe$ | O |
| C-17604 | Me(S) | single bond | H | CH(Me)(c-Pr) | C(=O)Me | Me | $CH_2OMe$ | O |
| C-17605 | H | single bond | Me | CH(Me)$CH_2OMe$ | C(=O)Me | Cl | $CH_2OMe$ | O |
| C-17606 | Me | single bond | H | CH(Me)$CH_2OMe$ | C(=O)Me | Cl | $CH_2OMe$ | O |
| C-17607 | Me(R) | single bond | H | CH(Me)$CH_2OMe$ | C(=O)Me | Cl | $CH_2OMe$ | O |
| C-17608 | Me(S) | single bond | H | CH(Me)$CH_2OMe$ | C(=O)Me | Cl | $CH_2OMe$ | O |
| C-17609 | H | single bond | Me | CH(Me)$CH_2OMe$ | C(=O)Me | Me | $CH_2OMe$ | O |
| C-17610 | Me | single bond | H | CH(Me)$CH_2OMe$ | C(=O)Me | Me | $CH_2OMe$ | O |
| C-17611 | Me(R) | single bond | H | CH(Me)$CH_2OMe$ | C(=O)Me | Me | $CH_2OMe$ | O |
| C-17612 | Me(S) | single bond | H | CH(Me)$CH_2OMe$ | C(=O)Me | Me | $CH_2OMe$ | O |
| C-17613 | H | single bond | Me | $CH_2CH=CH_2$ | C(=O)Me | Cl | $CH_2OMe$ | O |
| C-17614 | Me | single bond | H | $CH_2CH=CH_2$ | C(=O)Me | Cl | $CH_2OMe$ | O |
| C-17615 | Me(R) | single bond | H | $CH_2CH=CH_2$ | C(=O)Me | Cl | $CH_2OMe$ | O |
| C-17616 | Me(S) | single bond | H | $CH_2CH=CH_2$ | C(=O)Me | Cl | $CH_2OMe$ | O |
| C-17617 | H | single bond | Me | $CH_2CH=CH_2$ | C(=O)Me | Me | $CH_2OMe$ | O |
| C-17618 | Me | single bond | H | $CH_2CH=CH_2$ | C(=O)Me | Me | $CH_2OMe$ | O |

TABLE 629

| Compound Number | Y | W | Z | $R^1$ | $R^2$ | $R^3$ | $R^{10}$ | A |
|---|---|---|---|---|---|---|---|---|
| C-17619 | Me(R) | single bond | H | $CH_2CH=CH_2$ | C(=O)Me | Me | $CH_2OMe$ | O |
| C-17620 | Me(S) | single bond | H | $CH_2CH=CH_2$ | C(=O)Me | Me | $CH_2OMe$ | O |
| C-17621 | H | single bond | Me | $CH_2C{\equiv}CH$ | C(=O)Me | Cl | $CH_2OMe$ | O |
| C-17622 | Me | single bond | H | $CH_2C{\equiv}CH$ | C(=O)Me | Cl | $CH_2OMe$ | O |
| C-17623 | Me(R) | single bond | H | $CH_2C{\equiv}CH$ | C(=O)Me | Cl | $CH_2OMe$ | O |
| C-17624 | Me(S) | single bond | H | $CH_2C{\equiv}CH$ | C(=O)Me | Cl | $CH_2OMe$ | O |
| C-17625 | H | single bond | Me | $CH_2C{\equiv}CH$ | C(=O)Me | Me | $CH_2OMe$ | O |
| C-17626 | Me | single bond | H | $CH_2C{\equiv}CH$ | C(=O)Me | Me | $CH_2OMe$ | O |
| C-17627 | Me(R) | single bond | H | $CH_2C{\equiv}CH$ | C(=O)Me | Me | $CH_2OMe$ | O |
| C-17628 | Me(S) | single bond | H | $CH_2C{\equiv}CH$ | C(=O)Me | Me | $CH_2OMe$ | O |
| C-17629 | H | single bond | Me | $CH_2CN$ | C(=O)Me | Cl | $CH_2OMe$ | O |
| C-17630 | Me | single bond | H | $CH_2CN$ | C(=O)Me | Cl | $CH_2OMe$ | O |
| C-17631 | Me(R) | single bond | H | $CH_2CN$ | C(=O)Me | Cl | $CH_2OMe$ | O |
| C-17632 | Me(S) | single bond | H | $CH_2CN$ | C(=O)Me | Cl | $CH_2OMe$ | O |
| C-17633 | H | single bond | Me | $CH_2CN$ | C(=O)Me | Me | $CH_2OMe$ | O |
| C-17634 | Me | single bond | H | $CH_2CN$ | C(=O)Me | Me | $CH_2OMe$ | O |
| C-17635 | Me(R) | single bond | H | $CH_2CN$ | C(=O)Me | Me | $CH_2OMe$ | O |
| C-17636 | Me(S) | single bond | H | $CH_2CN$ | C(=O)Me | Me | $CH_2OMe$ | O |
| C-17637 | H | single bond | Me | CH(Me)CN | C(=O)Me | C | $CH_2OMe$ | O |
| C-17638 | Me | single bond | H | CH(Me)CN | C(=O)Me | Cl | $CH_2OMe$ | O |
| C-17639 | Me(R) | single bond | H | CH(Me)CN | C(=O)Me | Cl | $CH_2OMe$ | O |
| C-17640 | Me(S) | single bond | H | CH(Me)CN | C(=O)Me | Cl | $CH_2OMe$ | O |
| C-17641 | H | single bond | Me | CH(Me)CN | C(=O)Me | Me | $CH_2OMe$ | O |
| C-17642 | Me | single bond | H | CH(Me)CN | C(=O)Me | Me | $CH_2OMe$ | O |

TABLE 629-continued

| Compound Number | Y | W | Z | $R^1$ | $R^2$ | $R^3$ | $R^{10}$ | A |
|---|---|---|---|---|---|---|---|---|
| C-17643 | Me(R) | single bond | H | CH(Me)CN | C(=O)Me | Me | $CH_2OMe$ | O |
| C-17644 | Me(S) | single bond | H | CH(Me)CN | C(=O)Me | Me | $CH_2OMe$ | O |
| C-17645 | H | single bond | Me | $C(Me)_2CN$ | C(=O)Me | Cl | $CH_2OMe$ | O |
| C-17646 | Me | single bond | H | $C(Me)_2CN$ | C(=O)Me | Cl | $CH_2OMe$ | O |
| C-17647 | Me(R) | single bond | H | $C(Me)_2CN$ | C(=O)Me | Cl | $CH_2OMe$ | O |
| C-17648 | Me(S) | single bond | H | $C(Me)_2CN$ | C(=O)Me | Cl | $CH_2OMe$ | O |
| C-17649 | H | single bond | Me | $C(Me)_2CN$ | C(=O)Me | Me | $CH_2OMe$ | O |
| C-17650 | Me | single bond | H | $C(Me)_2CN$ | C(=O)Me | Me | $CH_2OMe$ | O |
| C-17651 | Me(R) | single bond | H | $C(Me)_2CN$ | C(=O)Me | Me | $CH_2OMe$ | O |
| C-17652 | Me(S) | single bond | H | $C(Me)_2CN$ | C(=O)Me | Me | $CH_2OMe$ | O |
| C-17653 | H | single bond | Me | C(Me)(i-Pr)CN | C(=O)Me | Cl | $CH_2OMe$ | O |
| C-17654 | Me | single bond | H | C(Me)(i-Pr)CN | C(=O)Me | Cl | $CH_2OMe$ | O |
| C-17655 | Me(R) | single bond | H | C(Me)(i-Pr)CN | C(=O)Me | Cl | $CH_2OMe$ | O |
| C-17656 | Me(S) | single bond | H | C(Me)(i-Pr)CN | C(=O)Me | Cl | $CH_2OMe$ | O |
| C-17657 | H | single bond | Me | C(Me)(i-Pr)CN | C(=O)Me | Me | $CH_2OMe$ | O |
| C-17658 | Me | single bond | H | C(Me)(i-Pr)CN | C(=O)Me | Me | $CH_2OMe$ | O |
| C-17659 | Me(R) | single bond | H | C(Me)(i-Pr)CN | C(=O)Me | Me | $CH_2OMe$ | O |
| C-17660 | Me(S) | single bond | H | C(Me)(i-Pr)CN | C(=O)Me | Me | $CH_2OMe$ | O |
| C-17661 | H | single bond | Me | OMe | C(=O)Me | Cl | $CH_2OMe$ | O |
| C-17662 | Me | single bond | H | OMe | C(=O)Me | Cl | $CH_2OMe$ | O |

TABLE 630

| Compound Number | Y | W | Z | $R^1$ | $R^2$ | $R^3$ | $R^{10}$ | A |
|---|---|---|---|---|---|---|---|---|
| C-17663 | Me(R) | single bond | H | OMe | C(=O)Me | Cl | $CH_2OMe$ | O |
| C-17664 | Me(S) | single bond | H | OMe | C(=O)Me | Cl | $CH_2OMe$ | O |
| C-17665 | H | single bond | Me | OMe | C(=O)Me | Me | $CH_2OMe$ | O |
| C-17666 | Me | single bond | H | OMe | C(=O)Me | Me | $CH_2OMe$ | O |
| C-17667 | Me(R) | single bond | H | OMe | C(=O)Me | Me | $CH_2OMe$ | O |
| C-17668 | Me(S) | single bond | H | OMe | C(=O)Me | Me | $CH_2OMe$ | O |
| C-17669 | H | single bond | Me | CH=NOMe | C(=O)Me | Cl | $CH_2OMe$ | O |
| C-17670 | Me | single bond | H | CH=NOMe | C(=O)Me | Cl | $CH_2OMe$ | O |
| C-17671 | Me(R) | single bond | H | CH=NOMe | C(=O)Me | Cl | $CH_2OMe$ | O |
| C-17672 | Me(S) | single bond | H | CH=NOMe | C(=O)Me | Cl | $CH_2OMe$ | O |
| C-17673 | H | single bond | Me | CH=NOMe | C(=O)Me | Me | $CH_2OMe$ | O |
| C-17674 | Me | single bond | H | CH=NOMe | C(=O)Me | Me | $CH_2OMe$ | O |
| C-17675 | Me(R) | single bond | H | CH=NOMe | C(=O)Me | Me | $CH_2OMe$ | O |
| C-17676 | Me(S) | single bond | H | CH=NOMe | C(=O)Me | Me | $CH_2OMe$ | O |
| C-17677 | H | single bond | Me | morpholin-4-yl | C(=O)Me | Cl | $CH_2OMe$ | O |
| C-17678 | Me | single bond | H | morpholin-4-yl | C(=O)Me | Cl | $CH_2OMe$ | O |
| C-17679 | Me(R) | single bond | H | morpholin-4-yl | C(=O)Me | Cl | $CH_2OMe$ | O |
| C-17680 | Me(S) | single bond | H | morpholin-4-yl | C(=O)Me | Cl | $CH_2OMe$ | O |
| C-17681 | H | single bond | Me | morpholin-4-yl | C(=O)Me | Me | $CH_2OMe$ | O |
| C-17682 | Me | single bond | H | morpholin-4-yl | C(=O)Me | Me | $CH_2OMe$ | O |
| C-17683 | Me(R) | single bond | H | morpholin-4-yl | C(=O)Me | Me | $CH_2OMe$ | O |
| C-17684 | Me(S) | single bond | H | morpholin-4-yl | C(=O)Me | Me | $CH_2OMe$ | O |
| C-17685 | H | single bond | Me | Ph | C(=O)Me | Cl | $CH_2OMe$ | O |
| C-17686 | Me | single bond | H | Ph | C(=O)Me | Cl | $CH_2OMe$ | O |
| C-17687 | Me(R) | single bond | H | Ph | C(=O)Me | Cl | $CH_2OMe$ | O |
| C-17688 | Me(S) | single bond | H | Ph | C(=O)Me | Cl | $CH_2OMe$ | O |
| C-17689 | H | single bond | Me | Ph | C(=O)Me | Me | $CH_2OMe$ | O |
| C-17690 | Me | single bond | H | Ph | C(=O)Me | Me | $CH_2OMe$ | O |
| C-17691 | Me(R) | single bond | H | Ph | C(=O)Me | Me | $CH_2OMe$ | O |
| C-17692 | Me(S) | single bond | H | Ph | C(=O)Me | Me | $CH_2OMe$ | O |
| C-17693 | H | single bond | Me | $CH_2Ph$ | C(=O)Me | Cl | $CH_2OMe$ | O |
| C-17694 | Me | single bond | H | $CH_2Ph$ | C(=O)Me | Cl | $CH_2OMe$ | O |
| C-17695 | Me(R) | single bond | H | $CH_2Ph$ | C(=O)Me | Cl | $CH_2OMe$ | O |
| C-17696 | Me(S) | single bond | H | $CH_2Ph$ | C(=O)Me | Cl | $CH_2OMe$ | O |
| C-17697 | H | single bond | Me | $CH_2Ph$ | C(=O)Me | Me | $CH_2OMe$ | O |
| C-17698 | Me | single bond | H | $CH_2Ph$ | C(=O)Me | Me | $CH_2OMe$ | O |
| C-17699 | Me(R) | single bond | H | $CH_2Ph$ | C(=O)Me | Me | $CH_2OMe$ | O |
| C-17700 | Me(S) | single bond | H | $CH_2Ph$ | C(=O)Me | Me | $CH_2OMe$ | O |
| C-17701 | H | single bond | Me | thiazole-2-yl | C(=O)Me | Cl | $CH_2OMe$ | O |
| C-17702 | Me | single bond | H | thiazole-2-yl | C(=O)Me | Cl | $CH_2OMe$ | O |
| C-17703 | Me(R) | single bond | H | thiazole-2-yl | C(=O)Me | Cl | $CH_2OMe$ | O |
| C-17704 | Me(S) | single bond | H | thiazole-2-yl | C(=O)Me | Cl | $CH_2OMe$ | O |
| C-17705 | H | single bond | Me | thiazole-2-yl | C(=O)Me | Me | $CH_2OMe$ | O |
| C-17706 | Me | single bond | H | thiazole-2-yl | C(=O)Me | Me | $CH_2OMe$ | O |

TABLE 631

| Compound Number | Y | W | Z | $R^1$ | $R^2$ | $R^3$ | $R^{10}$ | A |
|---|---|---|---|---|---|---|---|---|
| C-17707 | Me(R) | single bond | H | thiazole-2-yl | C(═O)Me | Me | $CH_2OMe$ | O |
| C-17708 | Me(S) | single bond | H | thiazole-2-yl | C(═O)Me | Me | $CH_2OMe$ | O |
| C-17709 | H | single bond | Me | 1-Me-pyrazol-3-yl | C(═O)Me | Cl | $CH_2OMe$ | O |
| C-17710 | Me | single bond | H | 1-Me-pyrazol-3-yl | C(═O)Me | Cl | $CH_2OMe$ | O |
| C-17711 | Me(R) | single bond | H | 1-Me-pyrazol-3-yl | C(═O)Me | Cl | $CH_2OMe$ | O |
| C-17712 | Me(S) | single bond | H | 1-Me-pyrazol-3-yl | C(═O)Me | Cl | $CH_2OMe$ | O |
| C-17713 | H | single bond | Me | 1-Me-pyrazol-3-yl | C(═O)Me | Me | $CH_2OMe$ | O |
| C-17714 | Me | single bond | H | 1-Me-pyrazol-3-yl | C(═O)Me | Me | $CH_2OMe$ | O |
| C-17715 | Me(R) | single bond | H | 1-Me-pyrazol-3-yl | C(═O)Me | Me | $CH_2OMe$ | O |
| C-17716 | Me(S) | single bond | H | 1-Me-pyrazol-3-yl | C(═O)Me | Me | $CH_2OMe$ | O |
| C-17717 | H | single bond | Me | 1-Me-pyrazol-5-yl | C(═O)Me | Cl | $CH_2OMe$ | O |
| C-17718 | Me | single bond | H | 1-Me-pyrazol-5-yl | C(═O)Me | Cl | $CH_2OMe$ | O |
| C-17719 | Me(R) | single bond | H | 1-Me-pyrazol-5-yl | C(═O)Me | Cl | $CH_2OMe$ | O |
| C-17720 | Me(S) | single bond | H | 1-Me-pyrazol-5-yl | C(═O)Me | Cl | $CH_2OMe$ | O |
| C-17721 | H | single bond | Me | 1-Me-pyrazol-5-yl | C(═O)Me | Me | $CH_2OMe$ | O |
| C-17722 | Me | single bond | H | 1-Me-pyrazol-5-yl | C(═O)Me | Me | $CH_2OMe$ | O |
| C-17723 | Me(R) | single bond | H | 1-Me-pyrazol-5-yl | C(═O)Me | Me | $CH_2OMe$ | O |
| C-17724 | Me(S) | single bond | H | 1-Me-pyrazol-5-yl | C(═O)Me | Me | $CH_2OMe$ | O |
| C-17725 | H | single bond | Me | $CH_2$(pyrimidin-2-yl) | C(═O)Me | Cl | $CH_2OMe$ | O |
| C-17726 | Me | single bond | H | $CH_2$(pyrimidin-2-yl) | C(═O)Me | Cl | $CH_2OMe$ | O |
| C-17727 | Me(R) | single bond | H | $CH_2$(pyrimidin-2-yl) | C(═O)Me | Cl | $CH_2OMe$ | O |
| C-17728 | Me(S) | single bond | H | $CH_2$(pyrimidin-2-yl) | C(═O)Me | Cl | $CH_2OMe$ | O |
| C-17729 | H | single bond | Me | $CH_2$(pyrimidin-2-yl) | C(═O)Me | Me | $CH_2OMe$ | O |
| C-17730 | Me | single bond | H | $CH_2$(pyrimidin-2-yl) | C(═O)Me | Me | $CH_2OMe$ | O |
| C-17731 | Me(R) | single bond | H | $CH_2$(pyrimidin-2-yl) | C(═O)Me | Me | $CH_2OMe$ | O |
| C-17732 | Me(S) | single bond | H | $CH_2$(pyrimidin-2-yl) | C(═O)Me | Me | $CH_2OMe$ | O |
| C-17733 | H | single bond | Me | Me | C(═O)Me | Cl | C(═O)Me | O |
| C-17734 | Me | single bond | H | Me | C(═O)Me | Cl | C(═O)Me | O |
| C-17735 | Me(R) | single bond | H | Me | C(═O)Me | Cl | C(═O)Me | O |
| C-17736 | Me(S) | single bond | H | Me | C(═O)Me | Cl | C(═O)Me | O |
| C-17737 | H | single bond | Me | Me | C(═O)Me | Me | C(═O)Me | O |
| C-17738 | Me | single bond | H | Me | C(═O)Me | Me | C(═O)Me | O |
| C-17739 | Me(R) | single bond | H | Me | C(═O)Me | Me | C(═O)Me | O |
| C-17740 | Me(S) | single bond | H | Me | C(═O)Me | Me | C(═O)Me | O |
| C-17741 | H | single bond | Me | $CH_2CHF_2$ | C(═O)Me | Cl | C(═O)Me | O |
| C-17742 | Me | single bond | H | $CH_2CHF_2$ | C(═O)Me | Cl | C(═O)Me | O |
| C-17743 | Me(R) | single bond | H | $CH_2CHF_2$ | C(═O)Me | Cl | C(═O)Me | O |
| C-17744 | Me(S) | single bond | H | $CH_2CHF_2$ | C(═O)Me | Cl | C(═O)Me | O |
| C-17745 | H | single bond | Me | $CH_2CHF_2$ | C(═O)Me | Me | C(═O)Me | O |
| C-17746 | Me | single bond | H | $CH_2CHF_2$ | C(═O)Me | Me | C(═O)Me | O |
| C-17747 | Me(R) | single bond | H | $CH_2CHF_2$ | C(═O)Me | Me | C(═O)Me | O |
| C-17748 | Me(S) | single bond | H | $CH_2CHF_2$ | C(═O)Me | Me | C(═O)Me | O |
| C-17749 | H | single bond | Me | n-Pr | C(═O)Me | Cl | C(═O)Me | O |
| C-17750 | Me | single bond | H | n-Pr | C(═O)Me | Cl | C(═O)Me | O |

TABLE 632

| Compound Number | Y | W | Z | $R^1$ | $R^2$ | $R^3$ | $R^{10}$ | A |
|---|---|---|---|---|---|---|---|---|
| C-17751 | Me(R) | single bond | H | n-Pr | C(═O)Me | Cl | C(═O)Me | O |
| C-17752 | Me(S) | single bond | H | n-Pr | C(═O)Me | Cl | C(═O)Me | O |
| C-17753 | H | single bond | Me | n-Pr | C(═O)Me | Me | C(═O)Me | O |
| C-17754 | Me | single bond | H | n-Pr | C(═O)Me | Me | C(═O)Me | O |
| C-17755 | Me(R) | single bond | H | n-Pr | C(═O)Me | Me | C(═O)Me | O |
| C-17756 | Me(S) | single bond | H | n-Pr | C(═O)Me | Me | C(═O)Me | O |
| C-17757 | H | single bond | Me | i-Pr | C(═O)Me | Cl | C(═O)Me | O |
| C-17758 | Me | single bond | H | i-Pr | C(═O)Me | Cl | C(═O)Me | O |
| C-17759 | Me(R) | single bond | H | i-Pr | C(═O)Me | Cl | C(═O)Me | O |
| C-17760 | Me(S) | single bond | H | i-Pr | C(═O)Me | Cl | C(═O)Me | O |
| C-17761 | H | single bond | Me | i-Pr | C(═O)Me | Me | C(═O)Me | O |
| C-17762 | Me | single bond | H | i-Pr | C(═O)Me | Me | C(═O)Me | O |
| C-17763 | Me(R) | single bond | H | i-Pr | C(═O)Me | Me | C(═O)Me | O |
| C-17764 | Me(S) | single bond | H | i-Pr | C(═O)Me | Me | C(═O)Me | O |
| C-17765 | H | single bond | Me | c-Pr(1-F) | C(═O)Me | Cl | C(═O)Me | O |
| C-17766 | Me | single bond | H | c-Pr(1-F) | C(═O)Me | Cl | C(═O)Me | O |
| C-17767 | Me(R) | single bond | H | c-Pr(1-F) | C(═O)Me | Cl | C(═O)Me | O |
| C-17768 | Me(S) | single bond | H | c-Pr(1-F) | C(═O)Me | Cl | C(═O)Me | O |
| C-17769 | H | single bond | Me | c-Pr(1-F) | C(═O)Me | Me | C(═O)Me | O |
| C-17770 | Me | single bond | H | c-Pr(1-F) | C(═O)Me | Me | C(═O)Me | O |
| C-17771 | Me(R) | single bond | H | c-Pr(1-F) | C(═O)Me | Me | C(═O)Me | O |
| C-17772 | Me(S) | single bond | H | c-Pr(1-F) | C(═O)Me | Me | C(═O)Me | O |
| C-17773 | H | single bond | Me | c-Pr(2,2-$F_2$) | C(═O)Me | Cl | C(═O)Me | O |

TABLE 632-continued

| Compound Number | Y | W | Z | $R^1$ | $R^2$ | $R^3$ | $R^{10}$ | A |
|---|---|---|---|---|---|---|---|---|
| C-17774 | Me | single bond | H | c-Pr(2,2-$F_2$) | C(═O)Me | Cl | C(═O)Me | O |
| C-17775 | Me(R) | single bond | H | c-Pr(2,2-$F_2$) | C(═O)Me | Cl | C(═O)Me | O |
| C-17776 | Me(S) | single bond | H | c-Pr(2,2-$F_2$) | C(═O)Me | Cl | C(═O)Me | O |
| C-17777 | H | single bond | Me | c-Pr(2,2-$F_2$) | C(═O)Me | Me | C(═O)Me | O |
| C-17778 | Me | single bond | H | c-Pr(2,2-$F_2$) | C(═O)Me | Me | C(═O)Me | O |
| C-17779 | Me(R) | single bond | H | c-Pr(2,2-$F_2$) | C(═O)Me | Me | C(═O)Me | O |
| C-17780 | Me(S) | single bond | H | c-Pr(2,2-$F_2$) | C(═O)Me | Me | C(═O)Me | O |
| C-17781 | H | single bond | Me | c-Pr(1-Cl) | C(═O)Me | Cl | C(═O)Me | O |
| C-17782 | Me | single bond | H | c-Pr(1-Cl) | C(═O)Me | Cl | C(═O)Me | O |
| C-17783 | Me(R) | single bond | H | c-Pr(1-Cl) | C(═O)Me | Cl | C(═O)Me | O |
| C-17784 | Me(S) | single bond | H | c-Pr(1-Cl) | C(═O)Me | Cl | C(═O)Me | O |
| C-17785 | H | single bond | Me | c-Pr(1-Cl) | C(═O)Me | Me | C(═O)Me | O |
| C-17786 | Me | single bond | H | c-Pr(1-Cl) | C(═O)Me | Me | C(═O)Me | O |
| C-17787 | Me(R) | single bond | H | c-Pr(1-Cl) | C(═O)Me | Me | C(═O)Me | O |
| C-17788 | Me(S) | single bond | H | c-Pr(1-Cl) | C(═O)Me | Me | C(═O)Me | O |
| C-17789 | H | single bond | Me | c-Pr(1-Br) | C(═O)Me | Cl | C(═O)Me | O |
| C-17790 | Me | single bond | H | c-Pr(1-Br) | C(═O)Me | Cl | C(═O)Me | O |
| C-17791 | Me(R) | single bond | H | c-Pr(1-Br) | C(═O)Me | Cl | C(═O)Me | O |
| C-17792 | Me(S) | single bond | H | c-Pr(1-Br) | C(═O)Me | Cl | C(═O)Me | O |
| C-17793 | H | single bond | Me | c-Pr(1-Br) | C(═O)Me | Me | C(═O)Me | O |
| C-17794 | Me | single bond | H | c-Pr(1-Br) | C(═O)Me | Me | C(═O)Me | O |

TABLE 633

| Compound Number | Y | W | Z | $R^1$ | $R^2$ | $R^3$ | $R^{10}$ | A |
|---|---|---|---|---|---|---|---|---|
| C-17795 | Me(R) | single bond | H | c-Pr(1-Br) | C(═O)Me | Me | C(═O)Me | O |
| C-17796 | Me(S) | single bond | H | c-Pr(1-Br) | C(═O)Me | Me | C(═O)Me | O |
| C-17797 | H | single bond | Me | c-Pr(1-Me) | C(═O)Me | Cl | C(═O)Me | O |
| C-17798 | Me | single bond | H | c-Pr(1-Me) | C(═O)Me | Cl | C(═O)Me | O |
| C-17799 | Me(R) | single bond | H | c-Pr(1-Me) | C(═O)Me | Cl | C(═O)Me | O |
| C-17800 | Me(S) | single bond | H | c-Pr(1-Me) | C(═O)Me | Cl | C(═O)Me | O |
| C-17801 | H | single bond | Me | c-Pr(1-Me) | C(═O)Me | Me | C(═O)Me | O |
| C-17802 | Me | single bond | H | c-Pr(1-Me) | C(═O)Me | Me | C(═O)Me | O |
| C-17803 | Me(R) | single bond | H | c-Pr(1-Me) | C(═O)Me | Me | C(═O)Me | O |
| C-17804 | Me(S) | single bond | H | c-Pr(1-Me) | C(═O)Me | Me | C(═O)Me | O |
| C-17805 | H | single bond | Me | c-Pr(1-$CH_2$OH) | C(═O)Me | Cl | C(═O)Me | O |
| C-17806 | Me | single bond | H | c-Pr(1-$CH_2$OH) | C(═O)Me | Cl | C(═O)Me | O |
| C-17807 | Me(R) | single bond | H | c-Pr(1-$CH_2$OH) | C(═O)Me | Cl | C(═O)Me | O |
| C-17808 | Me(S) | single bond | H | c-Pr(1-$CH_2$OH) | C(═O)Me | Cl | C(═O)Me | O |
| C-17809 | H | single bond | Me | c-Pr(1-$CH_2$OH) | C(═O)Me | Me | C(═O)Me | O |
| C-17810 | Me | single bond | H | c-Pr(1-$CH_2$OH) | C(═O)Me | Me | C(═O)Me | O |
| C-17811 | Me(R) | single bond | H | c-Pr(1-$CH_2$OH) | C(═O)Me | Me | C(═O)Me | O |
| C-17812 | Me(S) | single bond | H | c-Pr(1-$CH_2$OH) | C(═O)Me | Me | C(═O)Me | O |
| C-17813 | H | single bond | Me | c-Pr[1-$CH_2$OS(═O)$_2$Me] | C(═O)Me | Cl | C(═O)Me | O |
| C-17814 | Me | single bond | H | c-Pr[1-$CH_2$OS(═O)$_2$Me] | C(═O)Me | Cl | C(═O)Me | O |
| C-17815 | Me(R) | single bond | H | c-Pr[1-$CH_2$OS(═O)$_2$Me] | C(═O)Me | Cl | C(═O)Me | O |
| C-17816 | Me(S) | single bond | H | c-Pr[1-$CH_2$OS(═O)$_2$Me] | C(═O)Me | Cl | C(═O)Me | O |
| C-17817 | H | single bond | Me | c-Pr[1-$CH_2$OS(═O)$_2$Me] | C(═O)Me | Me | C(═O)Me | O |
| C-17818 | Me | single bond | H | c-Pr[1-$CH_2$OS(═O)$_2$Me] | C(═O)Me | Me | C(═O)Me | O |
| C-17819 | Me(R) | single bond | H | c-Pr[1-$CH_2$OS(═O)$_2$Me] | C(═O)Me | Me | C(═O)Me | O |
| C-17820 | Me(S) | single bond | H | c-Pr[1-$CH_2$OS(═O)$_2$Me] | C(═O)Me | Me | C(═O)Me | O |
| C-17821 | H | single bond | Me | c-Pr(1-$CH_2$OMe) | C(═O)Me | Cl | C(═O)Me | O |
| C-17822 | Me | single bond | H | c-Pr(1-$CH_2$OMe) | C(═O)Me | Cl | C(═O)Me | O |
| C-17823 | Me(R) | single bond | H | c-Pr(1-$CH_2$OMe) | C(═O)Me | Cl | C(═O)Me | O |
| C-17824 | Me(S) | single bond | H | c-Pr(1-$CH_2$OMe) | C(═O)Me | Cl | C(═O)Me | O |
| C-17825 | H | single bond | Me | c-Pr(1-$CH_2$OMe) | C(═O)Me | Me | C(═O)Me | O |
| C-17826 | Me | single bond | H | c-Pr(1-$CH_2$OMe) | C(═O)Me | Me | C(═O)Me | O |
| C-17827 | Me(R) | single bond | H | c-Pr(1-$CH_2$OMe) | C(═O)Me | Me | C(═O)Me | O |
| C-17828 | Me(S) | single bond | H | c-Pr(1-$CH_2$OMe) | C(═O)Me | Me | C(═O)Me | O |
| C-17829 | H | single bond | Me | c-Pr(1-$CH_2$CN) | C(═O)Me | Cl | C(═O)Me | O |
| C-17830 | Me | single bond | H | c-Pr(1-$CH_2$CN) | C(═O)Me | Cl | C(═O)Me | O |
| C-17831 | Me(R) | single bond | H | c-Pr(1-$CH_2$CN) | C(═O)Me | Cl | C(═O)Me | O |
| C-17832 | Me(S) | single bond | H | c-Pr(1-$CH_2$CN) | C(═O)Me | Cl | C(═O)Me | O |
| C-17833 | H | single bond | Me | c-Pr(1-$CH_2$CN) | C(═O)Me | Me | C(═O)Me | O |
| C-17834 | Me | single bond | H | c-Pr(1-$CH_2$CN) | C(═O)Me | Me | C(═O)Me | O |
| C-17835 | Me(R) | single bond | H | c-Pr(1-$CH_2$CN) | C(═O)Me | Me | C(═O)Me | O |
| C-17836 | Me(S) | single bond | H | c-Pr(1-$CH_2$CN) | C(═O)Me | Me | C(═O)Me | O |
| C-17837 | H | single bond | Me | c-Pr(1-$CH_2$SMe) | C(═O)Me | Cl | C(═O)Me | O |
| C-17838 | Me | single bond | H | c-Pr(1-$CH_2$SMe) | C(═O)Me | Cl | C(═O)Me | O |

TABLE 634

| Compound Number | Y | W | Z | $R^1$ | $R^2$ | $R^3$ | $R^{10}$ | A |
|---|---|---|---|---|---|---|---|---|
| C-17839 | Me(R) | single bond | H | c-Pr(1-$CH_2$SMe) | C(═O)Me | Cl | C(═O)Me | O |
| C-17840 | Me(S) | single bond | H | c-Pr(1-$CH_2$SMe) | C(═O)Me | Cl | C(═O)Me | O |
| C-17841 | H | single bond | Me | c-Pr(1-$CH_2$SMe) | C(═O)Me | Me | C(═O)Me | O |
| C-17842 | Me | single bond | H | c-Pr(1-$CH_2$SMe) | C(═O)Me | Me | C(═O)Me | O |
| C-17843 | Me(R) | single bond | H | c-Pr(1-$CH_2$SMe) | C(═O)Me | Me | C(═O)Me | O |
| C-17844 | Me(S) | single bond | H | c-Pr(1-$CH_2$SMe) | C(═O)Me | Me | C(═O)Me | O |
| C-17845 | H | single bond | Me | c-Pr[1-$CH_2$S(═O)Me] | C(═O)Me | Cl | C(═O)Me | O |
| C-17846 | Me | single bond | H | c-Pr[1-$CH_2$S(═O)Me] | C(═O)Me | Cl | C(═O)Me | O |
| C-17847 | Me(R) | single bond | H | c-Pr[1-$CH_2$S(═O)Me] | C(═O)Me | Cl | C(═O)Me | O |
| C-17848 | Me(S) | single bond | H | c-Pr[1-$CH_2$S(═O)Me] | C(═O)Me | Cl | C(═O)Me | O |
| C-17849 | H | single bond | Me | c-Pr[1-$CH_2$S(═O)Me] | C(═O)Me | Me | C(═O)Me | O |
| C-17850 | Me | single bond | H | c-Pr[1-$CH_2$S(═O)Me] | C(═O)Me | Me | C(═O)Me | O |
| C-17851 | Me(R) | single bond | H | c-Pr[1-$CH_2$S(═O)Me] | C(═O)Me | Me | C(═O)Me | O |
| C-17852 | Me(S) | single bond | H | c-Pr[1-$CH_2$S(═O)Me] | C(═O)Me | Me | C(═O)Me | O |
| C-17853 | H | single bond | Me | c-Pr[1-$CH_2$S(═O)$_2$Me] | C(═O)Me | Cl | C(═O)Me | O |
| C-17854 | Me | single bond | H | c-Pr[1-$CH_2$S(═O)$_2$Me] | C(═O)Me | Cl | C(═O)Me | O |
| C-17855 | Me(R) | single bond | H | c-Pr[1-$CH_2$S(═O)$_2$Me] | C(═O)Me | Cl | C(═O)Me | O |
| C-17856 | Me(S) | single bond | H | c-Pr[1-$CH_2$S(═O)$_2$Me] | C(═O)Me | Cl | C(═O)Me | O |
| C-17857 | H | single bond | Me | c-Pr[1-$CH_2$S(═O)$_2$Me] | C(═O)Me | Me | C(═O)Me | O |
| C-17858 | Me | single bond | H | c-Pr[1-$CH_2$S(═O)$_2$Me] | C(═O)Me | Me | C(═O)Me | O |
| C-17859 | Me(R) | single bond | \|? | c-Pr[1-$CH_2$S(═O)$_2$Me] | C(═O)Me | Me | C(═O)Me | O |
| C-17860 | Me(S) | single bond | ? | c-Pr[1-$CH_2$S(═O)$_2$Me] | C(═O)Me | Me | C(═O)Me | O |
| C-17861 | H | single bond | Me | c-Pr(1-$CH_2$F) | C(═O)Me | Cl | C(═O)Me | O |
| C-17862 | Me | single bond | H | c-Pr(1-$CH_2$F) | C(═O)Me | Cl | C(═O)Me | O |
| C-17863 | Me(R) | single bond | H | c-Pr(1-$CH_2$F) | C(═O)Me | Cl | C(═O)Me | O |
| C-17864 | Me(S) | single bond | H | c-Pr(1-$CH_2$F) | C(═O)Me | Cl | C(═O)Me | O |
| C-17865 | H | single bond | Me | c-Pr(1-$CH_2$F) | C(═O)Me | Me | C(═O)Me | O |
| C-17866 | Me | single bond | H | c-Pr(1-$CH_2$F) | C(═O)Me | Me | C(═O)Me | O |
| C-17867 | Me(R) | single bond | H | c-Pr(1-$CH_2$F) | C(═O)Me | Me | C(═O)Me | O |
| C-17868 | Me(S) | single bond | H | c-Pr(1-$CH_2$F) | C(═O)Me | Me | C(═O)Me | O |
| C-17869 | H | single bond | Me | c-Pr(1-$CHF_2$) | C(═O)Me | Cl | C(═O)Me | O |
| C-17870 | Me | single bond | H | c-Pr(1-$CHF_2$) | C(═O)Me | Cl | C(═O)Me | O |
| C-17871 | Me(R) | single bond | H | c-Pr(1-$CHF_2$) | C(═O)Me | Cl | C(═O)Me | O |
| C-17872 | Me(S) | single bond | H | c-Pr(1-$CHF_2$) | C(═O)Me | Cl | C(═O)Me | O |
| C-17873 | H | single bond | Me | c-Pr(1-$CHF_2$) | C(═O)Me | Me | C(═O)Me | O |
| C-17874 | Me | single bond | H | c-Pr(1-$CHF_2$) | C(═O)Me | Me | C(═O)Me | O |
| C-17875 | Me(R) | single bond | H | c-Pr(1-$CHF_2$) | C(═O)Me | Me | C(═O)Me | O |
| C-17876 | Me(S) | single bond | H | c-Pr(1-$CHF_2$) | C(═O)Me | Me | C(═O)Me | O |
| C-17877 | H | single bond | Me | c-Pr(1-$CF_3$) | C(═O)Me | Cl | C(═O)Me | O |
| C-17878 | Me | single bond | H | c-Pr(1-$CF_3$) | C(═O)Me | Cl | C(═O)Me | O |
| C-17879 | Me(R) | single bond | H | c-Pr(1-$CF_3$) | C(═O)Me | Cl | C(═O)Me | O |
| C-17880 | Me(S) | single bond | H | c-Pr(1-$CF_3$) | C(═O)Me | Cl | C(═O)Me | O |
| C-17881 | H | single bond | Me | c-Pr(1-$CF_3$) | C(═O)Me | Me | C(═O)Me | O |
| C-17882 | Me | single bond | H | c-Pr(1-$CF_3$) | C(═O)Me | Me | C(═O)Me | O |

TABLE 635

| Compound Number | Y | W | Z | $R^1$ | $R^2$ | $R^3$ | $R^{10}$ | A |
|---|---|---|---|---|---|---|---|---|
| C-17883 | Me(R) | single bond | H | c-Pr(1-$CF_3$) | C(═O)Me | Me | C(═O)Me | O |
| C-17884 | Me(S) | single bond | H | c-Pr(1-$CF_3$) | C(═O)Me | Me | C(═O)Me | O |
| C-17885 | H | single bond | Me | c-Pr(1-C≡CH) | C(═O)Me | Cl | C(═O)Me | O |
| C-17886 | Me | single bond | H | c-Pr(1-C≡CH) | C(═O)Me | Cl | C(═O)Me | O |
| C-17887 | Me(R) | single bond | H | c-Pr(1-C≡CH) | C(═O)Me | Cl | C(═O)Me | O |
| C-17888 | Me(S) | single bond | H | c-Pr(1-C≡CH) | C(═O)Me | Cl | C(═O)Me | O |
| C-17889 | H | single bond | Me | c-Pr(1-C≡CH) | C(═O)Me | Me | C(═O)Me | O |
| C-17890 | Me | single bond | H | c-Pr(1-C≡CH) | C(═O)Me | Me | C(═O)Me | O |
| C-17891 | Me(R) | single bond | H | c-Pr(1-C≡CH) | C(═O)Me | Me | C(═O)Me | O |
| C-17892 | Me(S) | single bond | H | c-Pr(1-C≡CH) | C(═O)Me | Me | C(═O)Me | O |
| C-17893 | H | single bond | Me | c-Pr[1-C(═O)OEt] | C(═O)Me | Cl | C(═O)Me | O |
| C-17894 | Me | single bond | H | c-Pr[1-C(═O)OEt] | C(═O)Me | Cl | C(═O)Me | O |
| C-17895 | Me(R) | single bond | | c-Pr[1-C(═O)OEt] | C(═O)Me | Cl | C(═O)Me | O |
| C-17896 | Me(S) | single bond | H | c-Pr[1-C(═O)OEt] | C(═O)Me | Cl | C(═O)Me | O |
| C-17897 | H | single bond | Me | c-Pr[1-C(═O)OEt] | C(═O)Me | Me | C(═O)Me | O |
| C-17898 | Me | single bond | H | c-Pr[1-C(═O)OEt] | C(═O)Me | Me | C(═O)Me | O |
| C-17899 | Me(R) | single bond | H | c-Pr[1-C(═O)OEt] | C(═O)Me | Me | C(═O)Me | O |
| C-17900 | Me(S) | single bond | H | c-Pr[1-C(═O)OEt] | C(═O)Me | Me | C(═O)Me | O |
| C-17901 | H | single bond | Me | c-Pr[1-C(═O)OH] | C(═O)Me | Cl | C(═O)Me | O |
| C-17902 | Me | single bond | H | c-Pr[1-C(═O)OH] | C(═O)Me | Cl | C(═O)Me | O |
| C-17903 | Me(R) | single bond | H | c-Pr[1-C(═O)OH] | C(═O)Me | Cl | C(═O)Me | O |

TABLE 635-continued

| Compound Number | Y | W | Z | $R^1$ | $R^2$ | $R^3$ | $R^{10}$ | A |
|---|---|---|---|---|---|---|---|---|
| C-17904 | Me(S) | single bond | H | c-Pr[1-C(=O)OH] | C(=O)Me | Cl | C(=O)Me | O |
| C-17905 | H | single bond | Me | c-Pr[1-C(=O)OH] | C(=O)Me | Me | C(=O)Me | O |
| C-17906 | Me | single bond | H | c-Pr[1-C(=O)OH] | C(=O)Me | Me | C(=O)Me | O |
| C-17907 | Me(R) | single bond | H | c-Pr[1-C(=O)OH] | C(=O)Me | Me | C(=O)Me | O |
| C-17908 | Me(S) | single bond | H | c-Pr[1-C(=O)OH] | C(=O)Me | Me | C(=O)Me | O |
| C-17909 | H | single bond | Me | c-Pr[1-C(=O)$NH_2$] | C(=O)Me | Cl | C(=O)Me | O |
| C-17910 | Me | single bond | H | c-Pr[1-C(=O)$NH_2$] | C(=O)Me | Cl | C(=O)Me | O |
| C-17911 | Me(R) | single bond | H | c-Pr[1-C(=O)$NH_2$] | C(=O)Me | Cl | C(=O)Me | O |
| C-17912 | Me(S) | single bond | H | c-Pr[1-C(=O)$NH_2$] | C(=O)Me | Cl | C(=O)Me | O |
| C-17913 | H | single bond | Me | c-Pr[1-C(=O)$NH_2$] | C(=O)Me | Me | C(=O)Me | O |
| C-17914 | Me | single bond | H | c-Pr[1-C(=O)$NH_2$] | C(=O)Me | Me | C(=O)Me | O |
| C-17915 | Me(R) | single bond | H | c-Pr[1-C(=O)$NH_2$] | C(=O)Me | Me | C(=O)Me | O |
| C-17916 | Me(S) | single bond | H | c-Pr[1-C(=O)$NH_2$] | C(=O)Me | Me | C(=O)Me | O |
| C-17917 | H | single bond | Me | c-Pr(1-OMe) | C(=O)Me | Cl | C(=O)Me | O |
| C-17918 | Me | single bond | H | c-Pr(1-OMe) | C(=O)Me | Cl | C(=O)Me | O |
| C-17919 | Me(R) | single bond | H | c-Pr(1-OMe) | C(=O)Me | Cl | C(=O)Me | O |
| C-17920 | Me(S) | single bond | H | c-Pr(1-OMe) | C(=O)Me | Cl | C(=O)Me | O |
| C-17921 | H | single bond | Me | c-Pr(1-OMe) | C(=O)Me | Me | C(=O)Me | O |
| C-17922 | Me | single bond | H | c-Pr(1-OMe) | C(=O)Me | Me | C(=O)Me | O |
| C-17923 | Me(R) | single bond | H | c-Pr(1-OMe) | C(=O)Me | Me | C(=O)Me | O |
| C-17924 | Me(S) | single bond | H | c-Pr(1-OMe) | C(=O)Me | Me | C(=O)Me | O |
| C-17925 | H | single bond | Me | c-Pr(1-SMe) | C(=O)Me | Cl | C(=O)Me | O |
| C-17926 | Me | single bond | H | c-Pr(1-SMe) | C(=O)Me | Cl | C(=O)Me | O |

TABLE 636

| Compound Number | Y | W | Z | $R^1$ | $R^2$ | $R^3$ | $R^{10}$ | A |
|---|---|---|---|---|---|---|---|---|
| C-17927 | Me(R) | single bond | H | c-Pr(1-SMe) | C(=O)Me | Cl | C(=O)Me | O |
| C-17928 | Me(S) | single bond | H | c-Pr(1-SMe) | C(=O)Me | Cl | C(=O)Me | O |
| C-17929 | H | single bond | Me | c-Pr(1-SMe) | C(=O)Me | Me | C(=O)Me | O |
| C-17930 | Me | single bond | H | c-Pr(1-SMe) | C(=O)Me | Me | C(=O)Me | O |
| C-17931 | Me(R) | single bond | H | c-Pr(1-SMe) | C(=O)Me | Me | C(=O)Me | O |
| C-17932 | Me(S) | single bond | H | c-Pr(1-SMe) | C(=O)Me | Me | C(=O)Me | O |
| C-17933 | H | single bond | Me | c-Pr[1-S(=O)Me] | C(=O)Me | Cl | C(=O)Me | O |
| C-17934 | Me | single bond | H | c-Pr[1-S(=O)Me] | C(=O)Me | Cl | C(=O)Me | O |
| C-17935 | Me(R) | single bond | H | c-Pr[1-S(=O)Me] | C(=O)Me | Cl | C(=O)Me | O |
| C-17936 | Me(S) | single bond | H | c-Pr[1-S(=O)Me] | C(=O)Me | Cl | C(=O)Me | O |
| C-17937 | H | single bond | Me | c-Pr[1-S(=O)Me] | C(=O)Me | Me | C(=O)Me | O |
| C-17938 | Me | single bond | H | c-Pr[1-S(=O)Me] | C(=O)Me | Me | C(=O)Me | O |
| C-17939 | Me(R) | single bond | H | c-Pr[1-S(=O)Me] | C(=O)Me | Me | C(=O)Me | O |
| C-17940 | Me(S) | single bond | H | c-Pr[1-S(=O)Me] | C(=O)Me | Me | C(=O)Me | O |
| C-17941 | H | single bond | Me | c-Pr[1-S(=O)$_2$Me] | C(=O)Me | Cl | C(=O)Me | O |
| C-17942 | Me | single bond | H | c-Pr[1-S(=O)$_2$Me] | C(=O)Me | Cl | C(=O)Me | O |
| C-17943 | Me(R) | single bond | H | c-Pr[1-S(=O)$_2$Me] | C(=O)Me | Cl | C(=O)Me | O |
| C-17944 | Me(S) | single bond | H | c-Pr[1-S(=O)$_2$Me] | C(=O)Me | Cl | C(=O)Me | O |
| C-17945 | H | single bond | Me | c-Pr[1-S(=O)$_2$Me] | C(=O)Me | Me | C(=O)Me | O |
| C-17946 | Me | single bond | H | c-Pr[1-S(=O)$_2$Me] | C(=O)Me | Me | C(=O)Me | O |
| C-17947 | Me(R) | single bond | H | c-Pr[1-S(=O)$_2$Me] | C(=O)Me | Me | C(=O)Me | O |
| C-17948 | Me(S) | single bond | H | c-Pr[1-S(=O)$_2$Me] | C(=O)Me | Me | C(=O)Me | O |
| C-17949 | H | single bond | Me | c-Pr[1-S(=O)$_2$$CHF_2$] | C(=O)Me | Cl | C(=O)Me | O |
| C-17950 | Me | single bond | H | c-Pr[1-S(=O)$_2$$CHF_2$] | C(=O)Me | Cl | C(=O)Me | O |
| C-17951 | Me(R) | single bond | H | c-Pr[1-S(=O)$_2$$CHF_2$] | C(=O)Me | Cl | C(=O)Me | O |
| C-17952 | Me(S) | single bond | H | c-Pr[1-S(=O)$_2$$CHF_2$] | C(=O)Me | Cl | C(=O)Me | O |
| C-17953 | H | single bond | Me | c-Pr[1-S(=O)$_2$$CHF_2$] | C(=O)Me | Me | C(=O)Me | O |
| C-17954 | Me | single bond | H | c-Pr[1-S(=O)$_2$$CHF_2$] | C(=O)Me | Me | C(=O)Me | O |
| C-17955 | Me(R) | single bond | H | c-Pr[1-S(=O)$_2$$CHF_2$] | C(=O)Me | Me | C(=O)Me | O |
| C-17956 | Me(S) | single bond | H | c-Pr[1-S(=O)$_2$$CHF_2$] | C(=O)Me | Me | C(=O)Me | O |
| C-17957 | H | single bond | Me | c-Pr[1-S(=O)$_2$$CF_3$] | C(=O)Me | Cl | C(=O)Me | O |
| C-17958 | Me | single bond | H | c-Pr[1-S(=O)$_2$$CF_3$] | C(=O)Me | Cl | C(=O)Me | O |
| C-17959 | Me(R) | single bond | H | c-Pr[1-S(=O)$_2$$CF_3$] | C(=O)Me | Cl | C(=O)Me | O |
| C-17960 | Me(S) | single bond | H | c-Pr[1-S(=O)$_2$$CF_3$] | C(=O)Me | Cl | C(=O)Me | O |
| C-17961 | H | single bond | Me | c-Pr[1-S(=O)$_2$$CF_3$] | C(=O)Me | Me | C(=O)Me | O |
| C-17962 | Me | single bond | H | c-Pr[1-S(=O)$_2$$CF_3$] | C(=O)Me | Me | C(=O)Me | O |
| C-17963 | Me(R) | single bond | H | c-Pr[1-S(=O)$_2$$CF_3$] | C(=O)Me | Me | C(=O)Me | O |
| C-17964 | Me(S) | single bond | H | c-Pr[1-S(=O)$_2$$CF_3$] | C(=O)Me | Me | C(=O)Me | O |
| C-17965 | H | single bond | Me | c-Pr[1-(5,6-dihydro-1,4,2-dioxazin-3-yl)] | C(=O)Me | Cl | C(=O)Me | O |
| C-17966 | Me | single bond | H | c-Pr[1-(5,6-dihydro-1,4,2-dioxazin-3-yl)] | C(=O)Me | Cl | C(=O)Me | O |
| C-17967 | Me(R) | single bond | H | c-Pr[1-(5,6-dihydro-1,4,2-dioxazin-3-yl)] | C(=O)Me | Cl | C(=O)Me | O |
| C-17968 | Me(S) | single bond | H | c-Pr[1-(5,6-dihydro-1,4,2-dioxazin-3-yl)] | C(=O)Me | Cl | C(=O)Me | O |

TABLE 636-continued

| Compound Number | Y | W | Z | $R^1$ | $R^2$ | $R^3$ | $R^{10}$ | A |
|---|---|---|---|---|---|---|---|---|
| C-17969 | H | single bond | Me | c-Pr[1-(5,6-dihydro-1,4,2-dioxazin-3-yl)] | C(═O)Me | Me | C(═O)Me | O |
| C-17970 | Me | single bond | H | c-Pr[1-(5,6-dihydro-1,4,2-dioxazin-3-yl)] | C(═O)Me | Me | C(═O)Me | O |

TABLE 637

| Compound Number | Y | W | Z | $R^1$ | $R^2$ | $R^3$ | $R^{10}$ | A |
|---|---|---|---|---|---|---|---|---|
| C-17971 | Me(R) | single bond | H | c-Pr[1-(5,6-dihydro-1,4,2-dioxazin-3-yl)] | C(═O)Me | Me | C(═O)Me | O |
| C-17972 | Me(S) | single bond | H | c-Pr[1-(5,6-dihydro-1,4,2-dioxazin-3-yl)] | C(═O)Me | Me | C(═O)Me | O |
| C-17973 | H | single bond | Me | c-Pr[1-(5-hydroxy-1,3,4-oxadiazol-2-yl)] | C(═O)Me | Cl | C(═O)Me | O |
| C-17974 | Me | single bond | H | c-Pr[1-(5-hydroxy-1,3,4-oxadiazol-2-yl)] | C(═O)Me | Cl | C(═O)Me | O |
| C-17975 | Me(R) | single bond | H | c-Pr[1-(5-hydroxy-1,3,4-oxadiazol-2-yl)] | C(═O)Me | Cl | C(═O)Me | O |
| C-17976 | Me(S) | single bond | H | c-Pr[1-(5-hydroxy-1,3,4-oxadiazol-2-yl)] | C(═O)Me | Cl | C(═O)Me | O |
| C-17977 | H | single bond | Me | c-Pr[1-(5-hydroxy-1,3,4-oxadiazol-2-yl)] | C(═O)Me | Me | C(═O)Me | O |
| C-17978 | Me | single bond | H | c-Pr[1-(5-hydroxy-1,3,4-oxadiazol-2-yl)] | C(═O)Me | Me | C(═O)Me | O |
| C-17979 | Me(R) | single bond | H | c-Pr[1-(5-hydroxy-1,3,4-oxadiazol-2-yl)] | C(═O)Me | Me | C(═O)Me | O |
| C-17980 | Me(S) | single bond | H | c-Pr[1-(5-hydroxy-1,3,4-oxadiazol-2-yl)] | C(═O)Me | Me | C(═O)Me | O |
| C-17981 | H | single bond | Me | c-Pr[1-(pyrimidin-2-yl)] | C(═O)Me | Cl | C(═O)Me | O |
| C-17982 | Me | single bond | H | c-Pr[1-(pyrimidin-2-yl)] | C(═O)Me | Cl | C(═O)Me | O |
| C-17983 | Me(R) | single bond | H | c-Pr[1-(pyrimidin-2-yl)] | C(═O)Me | Cl | C(═O)Me | O |
| C-17984 | Me(S) | single bond | H | c-Pr[1-(pyrimidin-2-yl)] | C(═O)Me | Cl | C(═O)Me | O |
| C-17985 | H | single bond | Me | c-Pr[1-(pyrimidin-2-yl)] | C(═O)Me | Me | C(═O)Me | O |
| C-17986 | Me | single bond | H | c-Pr[1-(pyrimidin-2-yl)] | C(═O)Me | Me | C(═O)Me | O |
| C-17987 | Me(R) | single bond | H | c-Pr[1-(pyrimidin-2-yl)] | C(═O)Me | Me | C(═O)Me | O |
| C-17988 | Me(S) | single bond | H | c-Pr[1-(pyrimidin-2-yl)] | C(═O)Me | Me | C(═O)Me | O |
| C-17989 | H | single bond | Me | t-Bu | C(═O)Me | Cl | C(═O)Me | O |
| C-17990 | Me | single bond | H | t-Bu | C(═O)Me | Cl | C(═O)Me | O |
| C-17991 | Me(R) | single bond | H | t-Bu | C(═O)Me | Cl | C(═O)Me | O |
| C-17992 | Me(S) | single bond | H | t-Bu | C(═O)Me | Cl | C(═O)Me | O |
| C-17993 | H | single bond | Me | t-Bu | C(═O)Me | Me | C(═O)Me | O |
| C-17994 | Me | single bond | H | t-Bu | C(═O)Me | Me | C(═O)Me | O |
| C-17995 | Me(R) | single bond | H | t-Bu | C(═O)Me | Me | C(═O)Me | O |
| C-17996 | Me(S) | single bond | H | t-Bu | C(═O)Me | Me | C(═O)Me | O |
| C-17997 | H | single bond | Me | c-Bu | C(═O)Me | Cl | C(═O)Me | O |
| C-17998 | Me | single bond | H | c-Bu | C(═O)Me | Cl | C(═O)Me | O |
| C-17999 | Me(R) | single bond | H | c-Bu | C(═O)Me | Cl | C(═O)Me | O |
| C-18000 | Me(S) | single bond | H | c-Bu | C(═O)Me | Cl | C(═O)Me | O |
| C-18001 | H | single bond | Me | c-Bu | C(═O)Me | Me | C(═O)Me | O |
| C-18002 | Me | single bond | H | c-Bu | C(═O)Me | Me | C(═O)Me | O |
| C-18003 | Me(R) | single bond | H | c-Bu | C(═O)Me | Me | C(═O)Me | O |
| C-18004 | Me(S) | single bond | H | c-Bu | C(═O)Me | Me | C(═O)Me | O |
| C-18005 | H | single bond | Me | c-Bu(1-CN) | C(═O)Me | Cl | C(═O)Me | O |
| C-18006 | Me | single bond | H | c-Bu(1-CN) | C(═O)Me | Cl | C(═O)Me | O |
| C-18007 | Me(R) | single bond | H | c-Bu(1-CN) | C(═O)Me | Cl | C(═O)Me | O |
| C-18008 | Me(S) | single bond | H | c-Bu(1-CN) | C(═O)Me | Cl | C(═O)Me | O |
| C-18009 | H | single bond | Me | c-Bu(1-CN) | C(═O)Me | Me | C(═O)Me | O |
| C-18010 | Me | single bond | H | c-Bu(1-CN) | C(═O)Me | Me | C(═O)Me | O |
| C-18011 | Me(R) | single bond | H | c-Bu(1-CN) | C(═O)Me | Me | C(═O)Me | O |
| C-18012 | Me(S) | single bond | H | c-Bu(1-CN) | C(═O)Me | Me | C(═O)Me | O |
| C-18013 | H | single bond | Me | c-Bu(3,3-$F_2$) | C(═O)Me | Cl | C(═O)Me | O |
| C-18014 | Me | single bond | H | c-Bu(3,3-$F_2$) | C(═O)Me | Cl | C(═O)Me | O |

TABLE 638

| Compound Number | Y | W | Z | $R^1$ | $R^2$ | $R^3$ | $R^{10}$ | A |
|---|---|---|---|---|---|---|---|---|
| C-18015 | Me(R) | single bond | H | c-Bu(3,3-$F_2$) | C(═O)Me | Cl | C(═O)Me | O |
| C-18016 | Me(S) | single bond | H | c-Bu(3,3-$F_2$) | C(═O)Me | Cl | C(═O)Me | O |
| C-18017 | H | single bond | Me | c-Bu(3,3-$F_2$) | C(═O)Me | Me | C(═O)Me | O |
| C-18018 | Me | single bond | H | c-Bu(3,3-$F_2$) | C(═O)Me | Me | C(═O)Me | O |
| C-18019 | Me(R) | single bond | H | c-Bu(3,3-$F_2$) | C(═O)Me | Me | C(═O)Me | O |
| C-18020 | Me(S) | single bond | H | c-Bu(3,3-$F_2$) | C(═O)Me | Me | C(═O)Me | O |
| C-18021 | H | single bond | Me | oxetan-3-yl | C(═O)Me | Cl | C(═O)Me | O |
| C-18022 | Me | single bond | H | oxetan-3-yl | C(═O)Me | Cl | C(═O)Me | O |
| C-18023 | Me(R) | single bond | H | oxetan-3-yl | C(═O)Me | Cl | C(═O)Me | O |
| C-18024 | Me(S) | single bond | H | oxetan-3-yl | C(═O)Me | Cl | C(═O)Me | O |
| C-18025 | H | single bond | Me | oxetan-3-yl | C(═O)Me | Me | C(═O)Me | O |
| C-18026 | Me | single bond | H | oxetan-3-yl | C(═O)Me | Me | C(═O)Me | O |

TABLE 638-continued

| Compound Number | Y | W | Z | $R^1$ | $R^2$ | $R^3$ | $R^{10}$ | A |
|---|---|---|---|---|---|---|---|---|
| C-18027 | Me(R) | single bond | H | oxetan-3-yl | C(═O)Me | Me | C(═O)Me | O |
| C-18028 | Me(S) | single bond | H | oxetan-3-yl | C(═O)Me | Me | C(═O)Me | O |
| C-18029 | H | single bond | Me | oxetan(3-CN)-3-yl | C(═O)Me | Cl | C(═O)Me | O |
| C-18030 | Me | single bond | H | oxetan(3-CN)-3-yl | C(═O)Me | Cl | C(═O)Me | O |
| C-18031 | Me(R) | single bond | H | oxetan(3-CN)-3-yl | C(═O)Me | Cl | C(═O)Me | O |
| C-18032 | Me(S) | single bond | H | oxetan(3-CN)-3-yl | C(═O)Me | Cl | C(═O)Me | O |
| C-18033 | H | single bond | Me | oxetan(3-CN)-3-yl | C(═O)Me | Me | C(═O)Me | O |
| C-18034 | Me | single bond | H | oxetan(3-CN)-3-yl | C(═O)Me | Me | C(═O)Me | O |
| C-18035 | Me(R) | single bond | H | oxetan(3-CN)-3-yl | C(═O)Me | Me | C(═O)Me | O |
| C-18036 | Me(S) | single bond | H | oxetan(3-CN)-3-yl | C(═O)Me | Me | C(═O)Me | O |
| C-18037 | H | single bond | Me | azetidin[1-C(═O)Me]-3-yl | C(═O)Me | Cl | C(═O)Me | O |
| C-18038 | Me | single bond | H | azetidin[1-C(═O)Me]-3-yl | C(═O)Me | Cl | C(═O)Me | O |
| C-18039 | Me(R) | single bond | H | azetidin[1-C(═O)Me]-3-yl | C(═O)Me | Cl | C(═O)Me | O |
| C-18040 | Me(S) | single bond | H | azetidin[1-C(═O)Me]-3-yl | C(═O)Me | Cl | C(═O)Me | O |
| C-18041 | H | single bond | Me | azetidin[1-C(═O)Me]-3-yl | C(═O)Me | Me | C(═O)Me | O |
| C-18042 | Me | single bond | H | azetidin[1-C(═O)Me]-3-yl | C(═O)Me | Me | C(═O)Me | O |
| C-18043 | Me(R) | single bond | H | azetidin[1-C(═O)Me]-3-yl | C(═O)Me | Me | C(═O)Me | O |
| C-18044 | Me(S) | single bond | H | azetidin[1-C(═O)Me]-3-yl | C(═O)Me | Me | C(═O)Me | O |
| C-18045 | H | single bond | Me | azetidin[1-S(═O)$_2$Me]-3-yl | C(═O)Me | Cl | C(═O)Me | O |
| C-18046 | Me | single bond | H | azetidin[1-S(═O)$_2$Me]-3-yl | C(═O)Me | Cl | C(═O)Me | O |
| C-18047 | Me(R) | single bond | H | azetidin[1-S(═O)$_2$Me]-3-yl | C(═O)Me | Cl | C(═O)Me | O |
| C-18048 | Me(S) | single bond | H | azetidin[1-S(═O)$_2$Me]-3-yl | C(═O)Me | Cl | C(═O)Me | O |
| C-18049 | H | single bond | Me | azetidin[1-S(═O)$_2$Me]-3-yl | C(═O)Me | Me | C(═O)Me | O |
| C-18050 | Me | single bond | H | azetidin[1-S(═O)$_2$Me]-3-yl | C(═O)Me | Me | C(═O)Me | O |
| C-18051 | Me(R) | single bond | H | azetidin[1-S(═O)$_2$Me]-3-yl | C(═O)Me | Me | C(═O)Me | O |
| C-18052 | Me(S) | single bond | H | azetidin[1-S(═O)$_2$Me]-3-yl | C(═O)Me | Me | C(═O)Me | O |
| C-18053 | H | single bond | Me | azetidin[1-S(═O)$_2$CHF$_2$]-3-yl | C(═O)Me | Cl | C(═O)Me | O |
| C-18054 | Me | single bond | H | azetidin[1-S(═O)$_2$CHF$_2$]-3-yl | C(═O)Me | Cl | C(═O)Me | O |
| C-18055 | Me(R) | single bond | H | azetidin[1-S(═O)$_2$CHF$_2$]-3-yl | C(═O)Me | Cl | C(═O)Me | O |
| C-18056 | Me(S) | single bond | H | azetidin[1-S(═O)$_2$CHF$_2$]-3-yl | C(═O)Me | Cl | C(═O)Me | O |
| C-18057 | H | single bond | Me | azetidin[1-S(═O)$_2$CHF$_2$]-3-yl | C(═O)Me | Me | C(═O)Me | O |
| C-18058 | Me | single bond | H | azetidin[1-S(═O)$_2$CHF$_2$]-3-yl | C(═O)Me | Me | C(═O)Me | O |

TABLE 639

| Compound Number | Y | W | Z | $R^1$ | $R^2$ | $R^3$ | $R^{10}$ | A |
|---|---|---|---|---|---|---|---|---|
| C-18059 | Me(R) | single bond | H | azetidin[1-S(═O)$_2$CHF$_2$]-3-yl | C(═O)Me | Me | C(═O)Me | O |
| C-18060 | Me(S) | single bond | H | azetidin[1-S(═O)$_2$CHF$_2$]-3-yl | C(═O)Me | Me | C(═O)Me | O |
| C-18061 | H | single bond | Me | c-Pen | C(═O)Me | Cl | C(═O)Me | O |
| C-18062 | Me | single bond | H | c-Pen | C(═O)Me | Cl | C(═O)Me | O |
| C-18063 | Me(R) | single bond | H | c-Pen | C(═O)Me | Cl | C(═O)Me | O |
| C-18064 | Me(S) | single bond | H | c-Pen | C(═O)Me | Cl | C(═O)Me | O |
| C-18065 | H | single bond | Me | c-Pen | C(═O)Me | Me | C(═O)Me | O |
| C-18066 | Me | single bond | H | c-Pen | C(═O)Me | Me | C(═O)Me | O |
| C-18067 | Me(R) | single bond | H | c-Pen | C(═O)Me | Me | C(═O)Me | O |
| C-18068 | Me(S) | single bond | H | c-Pen | C(═O)Me | Me | C(═O)Me | O |
| C-18069 | H | single bond | Me | tetrahydrofuran-3-yl | C(═O)Me | Cl | C(═O)Me | O |
| C-18070 | Me | single bond | H | tetrahydrofuran-3-yl | C(═O)Me | Cl | C(═O)Me | O |
| C-18071 | Me(R) | single bond | H | tetrahydrofuran-3-yl | C(═O)Me | Cl | C(═O)Me | O |
| C-18072 | Me(S) | single bond | H | tetrahydrofuran-3-yl | C(═O)Me | Cl | C(═O)Me | O |
| C-18073 | H | single bond | Me | tetrahydrofuran-3-yl | C(═O)Me | Me | C(═O)Me | O |
| C-18074 | Me | single bond | H | tetrahydrofuran-3-yl | C(═O)Me | Me | C(═O)Me | O |
| C-18075 | Me(R) | single bond | H | tetrahydrofuran-3-yl | C(═O)Me | Me | C(═O)Me | O |
| C-18076 | Me(S) | single bond | H | tetrahydrofuran-3-yl | C(═O)Me | Me | C(═O)Me | O |
| C-18077 | H | single bond | Me | tetrahydrothiophen-3-yl | C(═O)Me | Cl | C(═O)Me | O |
| C-18078 | Me | single bond | H | tetrahydrothiophen-3-yl | C(═O)Me | Cl | C(═O)Me | O |
| C-18079 | Me(R) | single bond | H | tetrahydrothiophen-3-yl | C(═O)Me | Cl | C(═O)Me | O |
| C-18080 | Me(S) | single bond | H | tetrahydrothiophen-3-yl | C(═O)Me | Cl | C(═O)Me | O |
| C-18081 | H | single bond | Me | tetrahydrothiophen-3-yl | C(═O)Me | Me | C(═O)Me | O |
| C-18082 | Me | single bond | H | tetrahydrothiophen-3-yl | C(═O)Me | Me | C(═O)Me | O |
| C-18083 | Me(R) | single bond | H | tetrahydrothiophen-3-yl | C(═O)Me | Me | C(═O)Me | O |
| C-18084 | Me(S) | single bond | H | tetrahydrothiophen-3-yl | C(═O)Me | Me | C(═O)Me | O |
| C-18085 | H | single bond | Me | c-Pen(1-CN) | C(═O)Me | Cl | C(═O)Me | O |
| C-18086 | Me | single bond | H | c-Pen(1-CN) | C(═O)Me | Cl | C(═O)Me | O |
| C-18087 | Me(R) | single bond | H | c-Pen(1-CN) | C(═O)Me | Cl | C(═O)Me | O |
| C-18088 | Me(S) | single bond | H | c-Pen(1-CN) | C(═O)Me | Cl | C(═O)Me | O |
| C-18089 | H | single bond | Me | c-Pen(1-CN) | C(═O)Me | Me | C(═O)Me | O |
| C-18090 | Me | single bond | H | c-Pen(1-CN) | C(═O)Me | Me | C(═O)Me | O |
| C-18091 | Me(R) | single bond | H | c-Pen(1-CN) | C(═O)Me | Me | C(═O)Me | O |
| C-18092 | Me(S) | single bond | H | c-Pen(1-CN) | C(═O)Me | Me | C(═O)Me | O |
| C-18093 | H | single bond | Me | tetrahydrofuran(3-CN)-3-yl | C(═O)Me | Cl | C(═O)Me | O |

TABLE 639-continued

| Compound Number | Y | W | Z | $R^1$ | $R^2$ | $R^3$ | $R^{10}$ | A |
|---|---|---|---|---|---|---|---|---|
| C-18094 | Me | single bond | H | tetrahydrofuran(3-CN)-3-yl | C(=O)Me | Cl | C(=O)Me | O |
| C-18095 | Me(R) | single bond | H | tetrahydrofuran(3-CN)-3-yl | C(=O)Me | Cl | C(=O)Me | O |
| C-18096 | Me(S) | single bond | H | tetrahydrofuran(3-CN)-3-yl | C(=O)Me | Cl | C(=O)Me | O |
| C-18097 | H | single bond | Me | tetrahydrofuran(3-CN)-3-yl | C(=O)Me | Me | C(=O)Me | O |
| C-18098 | Me | single bond | H | tetrahydrofuran(3-CN)-3-yl | C(=O)Me | Me | C(=O)Me | O |
| C-18099 | Me(R) | single bond | H | tetrahydrofuran(3-CN)-3-yl | C(=O)Me | Me | C(=O)Me | O |
| C-18100 | Me(S) | single bond | H | tetrahydrofuran(3-CN)-3-yl | C(=O)Me | Me | C(=O)Me | O |
| C-18101 | H | single bond | Me | tetrahydrothiophen(3-CN)-3-yl | C(=O)Me | Cl | C(=O)Me | O |
| C-18102 | Me | single bond | H | tetrahydrothiophen(3-CN)-3-yl | C(=O)Me | Cl | C(=O)Me | O |

TABLE 640

| Compound Number | Y | W | Z | $R^1$ | $R^2$ | $R^3$ | $R^{10}$ | A |
|---|---|---|---|---|---|---|---|---|
| C-18103 | Me(R) | single bond | H | tetrahydrothiophen(3-CN)-3-yl | C(=O)Me | Cl | C(=O)Me | O |
| C-18104 | Me(S) | single bond | H | tetrahydrothiophen(3-CN)-3-yl | C(=O)Me | Cl | C(=O)Me | O |
| C-18105 | H | single bond | Me | tetrahydrothiophen(3-CN)-3-yl | C(=O)Me | Me | C(=O)Me | O |
| C-18106 | Me | single bond | H | tetrahydrothiophen(3-CN)-3-yl | C(=O)Me | Me | C(=O)Me | O |
| C-18107 | Me(R) | single bond | H | tetrahydrothiophen(3-CN)-3-yl | C(=O)Me | Me | C(=O)Me | O |
| C-18108 | Me(S) | single bond | H | tetrahydrothiophen(3-CN)-3-yl | C(=O)Me | Me | C(=O)Me | O |
| C-18109 | H | single bond | Me | bicyclo[1.1.1]pentan-1-yl | C(=O)Me | Cl | C(=O)Me | O |
| C-18110 | Me | single bond | H | bicyclo[1.1.1]pentan-1-yl | C(=O)Me | Cl | C(=O)Me | O |
| C-18111 | Me(R) | single bond | H | bicyclo[1.1.1]pentan-1-yl | C(=O)Me | Cl | C(=O)Me | O |
| C-18112 | Me(S) | single bond | H | bicyclo[1.1.1]pentan-1-yl | C(=O)Me | Cl | C(=O)Me | O |
| C-18113 | H | single bond | Me | bicyclo[1.1.1]pentan-1-yl | C(=O)Me | Me | C(=O)Me | O |
| C-18114 | Me | single bond | H | bicyclo[1.1.1]pentan-1-yl | C(=O)Me | Me | C(=O)Me | O |
| C-18115 | Me(R) | single bond | H | bicyclo[1.1.1]pentan-1-yl | C(=O)Me | Me | C(=O)Me | O |
| C-18116 | Me(S) | single bond | H | bicyclo[1.1.1]pentan-1-yl | C(=O)Me | Me | C(=O)Me | O |
| C-18117 | H | single bond | Me | c-Hex | C(=O)Me | Cl | C(=O)Me | O |
| C-18118 | Me | single bond | H | c-Hex | C(=O)Me | Cl | C(=O)Me | O |
| C-18119 | Me(R) | single bond | H | c-Hex | C(=O)Me | Cl | C(=O)Me | O |
| C-18120 | Me(S) | single bond | H | c-Hex | C(=O)Me | Cl | C(=O)Me | O |
| C-18121 | H | single bond | Me | c-Hex | C(=O)Me | Me | C(=O)Me | O |
| C-18122 | Me | single bond | H | c-Hex | C(=O)Me | Me | C(=O)Me | O |
| C-18123 | Me(R) | single bond | H | c-Hex | C(=O)Me | Me | C(=O)Me | O |
| C-18124 | Me(S) | single bond | H | c-Hex | C(=O)Me | Me | C(=O)Me | O |
| C-18125 | H | single bond | Me | tetrahydropyran-4-yl | C(=O)Me | Cl | C(=O)Me | O |
| C-18126 | Me | single bond | H | tetrahydropyran-4-yl | C(=O)Me | Cl | C(=O)Me | O |
| C-18127 | Me(R) | single bond | H | tetrahydropyran-4-yl | C(=O)Me | Cl | C(=O)Me | O |
| C-18128 | Me(S) | single bond | H | tetrahydropyran-4-yl | C(=O)Me | Cl | C(=O)Me | O |
| C-18129 | H | single bond | Me | tetrahydropyran-4-yl | C(=O)Me | Me | C(=O)Me | O |
| C-18130 | Me | single bond | H | tetrahydropyran-4-yl | C(=O)Me | Me | C(=O)Me | O |
| C-18131 | Me(R) | single bond | H | tetrahydropyran-4-yl | C(=O)Me | Me | C(=O)Me | O |
| C-18132 | Me(S) | single bond | H | tetrahydropyran-4-yl | C(=O)Me | Me | C(=O)Me | O |
| C-18133 | H | single bond | Me | tetrahydrothiopyran-4-yl | C(=O)Me | Cl | C(=O)Me | O |
| C-18134 | Me | single bond | H | tetrahydrothiopyran-4-yl | C(=O)Me | Cl | C(=O)Me | O |
| C-18135 | Me(R) | single bond | H | tetrahydrothiopyran-4-yl | C(=O)Me | Cl | C(=O)Me | O |
| C-18136 | Me(S) | single bond | H | tetrahydrothiopyran-4-yl | C(=O)Me | Cl | C(=O)Me | O |
| C-18137 | H | single bond | Me | tetrahydrothiopyran-4-yl | C(=O)Me | Me | C(=O)Me | O |
| C-18138 | Me | single bond | H | tetrahydrothiopyran-4-yl | C(=O)Me | Me | C(=O)Me | O |
| C-18139 | Me(R) | single bond | H | tetrahydrothiopyran-4-yl | C(=O)Me | Me | C(=O)Me | O |
| C-18140 | Me(S) | single bond | H | tetrahydrothiopyran-4-yl | C(=O)Me | Me | C(=O)Me | O |
| C-18141 | H | single bond | Me | c-Hex(1-CN) | C(=O)Me | Cl | C(=O)Me | O |
| C-18142 | Me | single bond | H | c-Hex(1-CN) | C(=O)Me | Cl | C(=O)Me | O |
| C-18143 | Me(R) | single bond | H | c-Hex(1-CN) | C(=O)Me | Cl | C(=O)Me | O |
| C-18144 | Me(S) | single bond | H | c-Hex(1-CN) | C(=O)Me | Cl | C(=O)Me | O |
| C-18145 | H | single bond | Me | c-Hex(1-CN) | C(=O)Me | Me | C(=O)Me | O |
| C-18146 | Me | single bond | H | c-Hex(1-CN) | C(=O)Me | Me | C(=O)Me | O |

TABLE 641

| Compound Number | Y | W | Z | $R^1$ | $R^2$ | $R^3$ | $R^{10}$ | A |
|---|---|---|---|---|---|---|---|---|
| C-18147 | Me(R) | single bond | H | c-Hex(1-CN) | C(=O)Me | Me | C(=O)Me | O |
| C-18148 | Me(S) | single bond | H | c-Hex(1-CN) | C(=O)Me | Me | C(=O)Me | O |
| C-18149 | H | single bond | Me | tetrahydropyran(4-CN)-4-yl | C(=O)Me | Cl | C(=O)Me | O |

TABLE 641-continued

| Compound Number | Y | W | Z | $R^1$ | $R^2$ | $R^3$ | $R^{10}$ | A |
|---|---|---|---|---|---|---|---|---|
| C-18150 | Me | single bond | H | tetrahydropyran(4-CN)-4-yl | C(=O)Me | Cl | C(=O)Me | O |
| C-18151 | Me(R) | single bond | H | tetrahydropyran(4-CN)-4-yl | C(=O)Me | Cl | C(=O)Me | O |
| C-18152 | Me(S) | single bond | H | tetrahydropyran(4-CN)-4-yl | C(=O)Me | Cl | C(=O)Me | O |
| C-18153 | H | single bond | Me | tetrahydropyran(4-CN)-4-yl | C(=O)Me | Me | C(=O)Me | O |
| C-18154 | Me | single bond | H | tetrahydropyran(4-CN)-4-yl | C(=O)Me | Me | C(=O)Me | O |
| C-18155 | Me(R) | single bond | H | tetrahydropyran(4-CN)-4-yl | C(=O)Me | Me | C(=O)Me | O |
| C-18156 | Me(S) | single bond | H | tetrahydropyran(4-CN)-4-yl | C(=O)Me | Me | C(=O)Me | O |
| C-18157 | H | single bond | Me | tetrahydrothiopyran(4-CN)-4-yl | C(=O)Me | Cl | C(=O)Me | O |
| C-18158 | Me | single bond | H | tetrahydrothiopyran(4-CN)-4-yl | C(=O)Me | Cl | C(=O)Me | O |
| C-18159 | Me(R) | single bond | H | tetrahydrothiopyran(4-CN)-4-yl | C(=O)Me | Cl | C(=O)Me | O |
| C-18160 | Me(S) | single bond | H | tetrahydrothiopyran(4-CN)-4-yl | C(=O)Me | Cl | C(=O)Me | O |
| C-18161 | H | single bond | Me | tetrahydrothiopyran(4-CN)-4-yl | C(=O)Me | Me | C(=O)Me | O |
| C-18162 | Me | single bond | H | tetrahydrothiopyran(4-CN)-4-yl | C(=O)Me | Me | C(=O)Me | O |
| C-18163 | Me(R) | single bond | H | tetrahydrothiopyran(4-CN)-4-yl | C(=O)Me | Me | C(=O)Me | O |
| C-18164 | Me(S) | single bond | H | tetrahydrothiopyran(4-CN)-4-yl | C(=O)Me | Me | C(=O)Me | O |
| C-18165 | H | single bond | Me | $CH_2$(c-Pr) | C(=O)Me | Cl | C(=O)Me | O |
| C-18166 | Me | single bond | H | $CH_2$(c-Pr) | C(=O)Me | Cl | C(=O)Me | O |
| C-18167 | Me(R) | single bond | H | $CH_2$(c-Pr) | C(=O)Me | Cl | C(=O)Me | O |
| C-18168 | Me(S) | single bond | H | $CH_2$(c-Pr) | C(=O)Me | Cl | C(=O)Me | O |
| C-18169 | H | single bond | Me | $CH_2$(c-Pr) | C(=O)Me | Me | C(=O)Me | O |
| C-18170 | Me | single bond | H | $CH_2$(c-Pr) | C(=O)Me | Me | C(=O)Me | O |
| C-18171 | Me(R) | single bond | H | $CH_2$(c-Pr) | C(=O)Me | Me | C(=O)Me | O |
| C-18172 | Me(S) | single bond | H | $CH_2$(c-Pr) | C(=O)Me | Me | C(=O)Me | O |
| C-18173 | H | single bond | Me | $CH_2$[c-Pr(1-CN)] | C(=O)Me | Cl | C(=O)Me | O |
| C-18174 | Me | single bond | H | $CH_2$[c-Pr(1-CN)] | C(=O)Me | Cl | C(=O)Me | O |
| C-18175 | Me(R) | single bond | H | $CH_2$[c-Pr(1-CN)] | C(=O)Me | Cl | C(=O)Me | O |
| C-18176 | Me(S) | single bond | H | $CH_2$[c-Pr(1-CN)] | C(=O)Me | Cl | C(=O)Me | O |
| C-18177 | H | single bond | Me | $CH_2$[c-Pr(1-CN)] | C(=O)Me | Me | C(=O)Me | O |
| C-18178 | Me | single bond | H | $CH_2$[c-Pr(1-CN)] | C(=O)Me | Me | C(=O)Me | O |
| C-18179 | Me(R) | single bond | H | $CH_2$[c-Pr(1-CN)] | C(=O)Me | Me | C(=O)Me | O |
| C-18180 | Me(S) | single bond | H | $CH_2$[c-Pr(1-CN)] | C(=O)Me | Me | C(=O)Me | O |
| C-18181 | H | single bond | Me | CH(Me)(c-Pr) | C(=O)Me | Cl | C(=O)Me | O |
| C-18182 | Me | single bond | H | CH(Me)(c-Pr) | C(=O)Me | Cl | C(=O)Me | O |
| C-18183 | Me(R) | single bond | H | CH(Me)(c-Pr) | C(=O)Me | Cl | C(=O)Me | O |
| C-18184 | Me(S) | single bond | H | CH(Me)(c-Pr) | C(=O)Me | Cl | C(=O)Me | O |
| C-18185 | H | single bond | Me | CH(Me)(c-Pr) | C(=O)Me | Me | C(=O)Me | O |
| C-18186 | Me | single bond | H | CH(Me)(c-Pr) | C(=O)Me | Me | C(=O)Me | O |
| C-18187 | Me(R) | single bond | H | CH(Me)(c-Pr) | C(=O)Me | Me | C(=O)Me | O |
| C-18188 | Me(S) | single bond | H | CH(Me)(c-Pr) | C(=O)Me | Me | C(=O)Me | O |
| C-18189 | H | single bond | Me | CH(Me)$CH_2$OMe | C(=O)Me | Cl | C(=O)Me | O |
| C-18190 | Me | single bond | H | CH(Me)$CH_2$OMe | C(=O)Me | Cl | C(=O)Me | O |

TABLE 642

| Compound Number | Y | W | Z | $R^1$ | $R^2$ | $R^3$ | $R^{10}$ | A |
|---|---|---|---|---|---|---|---|---|
| C-18191 | Me(R) | single bond | H | CH(Me)$CH_2$OMe | C(=O)Me | Cl | C(=O)Me | O |
| C-18192 | Me(S) | single bond | H | CH(Me)$CH_2$OMe | C(=O)Me | Cl | C(=O)Me | O |
| C-18193 | H | single bond | Me | CH(Me)$CH_2$OMe | C(=O)Me | Me | C(=O)Me | O |
| C-18194 | Me | single bond | H | CH(Me)$CH_2$OMe | C(=O)Me | Me | C(=O)Me | O |
| C-18195 | Me(R) | single bond | H | CH(Me)$CH_2$OMe | C(=O)Me | Me | C(=O)Me | O |
| C-18196 | Me(S) | single bond | H | CH(Me)$CH_2$OMe | C(=O)Me | Me | C(=O)Me | O |
| C-18197 | H | single bond | Me | $CH_2CH{=}CH_2$ | C(=O)Me | Cl | C(=O)Me | O |
| C-18198 | Me | single bond | H | $CH_2CH{=}CH_2$ | C(=O)Me | Cl | C(=O)Me | O |
| C-18199 | Me(R) | single bond | H | $CH_2CH{=}CH_2$ | C(=O)Me | Cl | C(=O)Me | O |
| C-18200 | Me(S) | single bond | H | $CH_2CH{=}CH_2$ | C(=O)Me | Cl | C(=O)Me | O |
| C-18201 | H | single bond | Me | $CH_2CH{=}CH_2$ | C(=O)Me | Me | C(=O)Me | O |
| C-18202 | Me | single bond | H | $CH_2CH{=}CH_2$ | C(=O)Me | Me | C(=O)Me | O |
| C-18203 | Me(R) | single bond | H | $CH_2CH{=}CH_2$ | C(=O)Me | Me | C(=O)Me | O |
| C-18204 | Me(S) | single bond | H | $CH_2CH{=}CH_2$ | C(=O)Me | Me | C(=O)Me | O |
| C-18205 | H | single bond | Me | $CH_2C{\equiv}CH$ | C(=O)Me | Cl | C(=O)Me | O |
| C-18206 | Me | single bond | H | $CH_2C{\equiv}CH$ | C(=O)Me | Cl | C(=O)Me | O |
| C-18207 | Me(R) | single bond | H | $CH_2C{\equiv}CH$ | C(=O)Me | Cl | C(=O)Me | O |
| C-18208 | Me(S) | single bond | H | $CH_2C{\equiv}CH$ | C(=O)Me | Cl | C(=O)Me | O |
| C-18209 | H | single bond | Me | $CH_2C{\equiv}CH$ | C(=O)Me | Me | C(=O)Me | O |
| C-18210 | Me | single bond | H | $CH_2C{\equiv}CH$ | C(=O)Me | Me | C(=O)Me | O |
| C-18211 | Me(R) | single bond | H | $CH_2C{\equiv}CH$ | C(=O)Me | Me | C(=O)Me | O |
| C-18212 | Me(S) | single bond | H | $CH_2C{\equiv}CH$ | C(=O)Me | Me | C(=O)Me | O |
| C-18213 | H | single bond | Me | $CH_2CN$ | C(=O)Me | Cl | C(=O)Me | O |
| C-18214 | Me | single bond | H | $CH_2CN$ | C(=O)Me | Cl | C(=O)Me | O |
| C-18215 | Me(R) | single bond | H | $CH_2CN$ | C(=O)Me | Cl | C(=O)Me | O |
| C-18216 | Me(S) | single bond | H | $CH_2CN$ | C(=O)Me | Cl | C(=O)Me | O |

TABLE 642-continued

| Compound Number | Y | W | Z | $R^1$ | $R^2$ | $R^3$ | $R^{10}$ | A |
|---|---|---|---|---|---|---|---|---|
| C-18217 | H | single bond | Me | $CH_2CN$ | C(═O)Me | Me | C(═O)Me | O |
| C-18218 | Me | single bond | H | $CH_2CN$ | C(═O)Me | Me | C(═O)Me | O |
| C-18219 | Me(R) | single bond | H | $CH_2CN$ | C(═O)Me | Me | C(═O)Me | O |
| C-18220 | Me(S) | single bond | H | $CH_2CN$ | C(═O)Me | Me | C(═O)Me | O |
| C-18221 | H | single bond | Me | CH(Me)CN | C(═O)Me | Cl | C(═O)Me | O |
| C-18222 | Me | single bond | H | CH(Me)CN | C(═O)Me | Cl | C(═O)Me | O |
| C-18223 | Me(R) | single bond | H | CH(Me)CN | C(═O)Me | Cl | C(═O)Me | O |
| C-18224 | Me(S) | single bond | H | CH(Me)CN | C(═O)Me | Cl | C(═O)Me | O |
| C-18225 | H | single bond | Me | CH(Me)CN | C(═O)Me | Me | C(═O)Me | O |
| C-18226 | Me | single bond | H | CH(Me)CN | C(═O)Me | Me | C(═O)Me | O |
| C-18227 | Me(R) | single bond | H | CH(Me)CN | C(═O)Me | Me | C(═O)Me | O |
| C-18228 | Me(S) | single bond | H | CH(Me)CN | C(═O)Me | Me | C(═O)Me | O |
| C-18229 | H | single bond | Me | $C(Me)_2CN$ | C(═O)Me | Cl | C(═O)Me | O |
| C-18230 | Me | single bond | H | $C(Me)_2CN$ | C(═O)Me | Cl | C(═O)Me | O |
| C-18231 | Me(R) | single bond | H | $C(Me)_2CN$ | C(═O)Me | Cl | C(═O)Me | O |
| C-18232 | Me(S) | single bond | H | $C(Me)_2CN$ | C(═O)Me | Cl | C(═O)Me | O |
| C-18233 | H | single bond | Me | $C(Me)_2CN$ | C(═O)Me | Me | C(═O)Me | O |
| C-18234 | Me | single bond | H | $C(Me)_2CN$ | C(═O)Me | Me | C(═O)Me | O |

TABLE 643

| Compound Number | Y | W | Z | $R^1$ | $R^2$ | $R^3$ | $R^{10}$ | A |
|---|---|---|---|---|---|---|---|---|
| C-18235 | Me(R) | single bond | H | $C(Me)_2CN$ | C(═O)Me | Me | C(═O)Me | O |
| C-18236 | Me(S) | single bond | H | $C(Me)_2CN$ | C(═O)Me | Me | C(═O)Me | O |
| C-18237 | H | single bond | Me | C(Me)(i-Pr)CN | C(═O)Me | Cl | C(═O)Me | O |
| C-18238 | Me | single bond | H | C(Me)(i-Pr)CN | C(═O)Me | Cl | C(═O)Me | O |
| C-18239 | Me(R) | single bond | H | C(Me)(i-Pr)CN | C(═O)Me | Cl | C(═O)Me | O |
| C-18240 | Me(S) | single bond | H | C(Me)(i-Pr)CN | C(═O)Me | Cl | C(═O)Me | O |
| C-18241 | H | single bond | Me | C(Me)(i-Pr)CN | C(═O)Me | Me | C(═O)Me | O |
| C-18242 | Me | single bond | H | C(Me)(i-Pr)CN | C(═O)Me | Me | C(═O)Me | O |
| C-18243 | Me(R) | single bond | H | C(Me)(i-Pr)CN | C(═O)Me | Me | C(═O)Me | O |
| C-18244 | Me(S) | single bond | H | C(Me)(i-Pr)CN | C(═O)Me | Me | C(═O)Me | O |
| C-18245 | H | single bond | Me | OMe | C(═O)Me | Cl | C(═O)Me | O |
| C-18246 | Me | single bond | H | OMe | C(═O)Me | Cl | C(═O)Me | O |
| C-18247 | Me(R) | single bond | H | OMe | C(═O)Me | Cl | C(═O)Me | O |
| C-18248 | Me(S) | single bond | H | OMe | C(═O)Me | Cl | C(═O)Me | O |
| C-18249 | H | single bond | Me | OMe | C(═O)Me | Me | C(═O)Me | O |
| C-18250 | Me | single bond | H | OMe | C(═O)Me | Me | C(═O)Me | O |
| C-18251 | Me(R) | single bond | H | OMe | C(═O)Me | Me | C(═O)Me | O |
| C-18252 | Me(S) | single bond | H | OMe | C(═O)Me | Me | C(═O)Me | O |
| C-18253 | H | single bond | Me | CH═NOMe | C(═O)Me | Cl | C(═O)Me | O |
| C-18254 | Me | single bond | H | CH═NOMe | C(═O)Me | Cl | C(═O)Me | O |
| C-18255 | Me(R) | single bond | H | CH═NOMe | C(═O)Me | Cl | C(═O)Me | O |
| C-18256 | Me(S) | single bond | H | CH═NOMe | C(═O)Me | Cl | C(═O)Me | O |
| C-18257 | H | single bond | Me | CH═NOMe | C(═O)Me | Me | C(═O)Me | O |
| C-18258 | Me | single bond | H | CH═NOMe | C(═O)Me | Me | C(═O)Me | O |
| C-18259 | Me(R) | single bond | H | CH═NOMe | C(═O)Me | Me | C(═O)Me | O |
| C-18260 | Me(S) | single bond | H | CH═NOMe | C(═O)Me | Me | C(═O)Me | O |
| C-18261 | H | single bond | Me | morpholin-4-yl | C(═O)Me | Cl | C(═O)Me | O |
| C-18262 | Me | single bond | H | morpholin-4-yl | C(═O)Me | Cl | C(═O)Me | O |
| C-18263 | Me(R) | single bond | H | morpholin-4-yl | C(═O)Me | Cl | C(═O)Me | O |
| C-18264 | Me(S) | single bond | H | morpholin-4-yl | C(═O)Me | Cl | C(═O)Me | O |
| C-18265 | H | single bond | Me | morpholin-4-yl | C(═O)Me | Me | C(═O)Me | O |
| C-18266 | Me | single bond | H | morpholin-4-yl | C(═O)Me | Me | C(═O)Me | O |
| C-18267 | Me(R) | single bond | H | morpholin-4-yl | C(═O)Me | Me | C(═O)Me | O |
| C-18268 | Me(S) | single bond | H | morpholin-4-yl | C(═O)Me | Me | C(═O)Me | O |
| C-18269 | H | single bond | Me | Ph | C(═O)Me | Cl | C(═O)Me | O |
| C-18270 | Me | single bond | H | Ph | C(═O)Me | Cl | C(═O)Me | O |
| C-18271 | Me(R) | single bond | H | Ph | C(═O)Me | Cl | C(═O)Me | O |
| C-18272 | Me(S) | single bond | H | Ph | C(═O)Me | Cl | C(═O)Me | O |
| C-18273 | H | single bond | Me | Ph | C(═O)Me | Me | C(═O)Me | O |
| C-18274 | Me | single bond | H | Ph | C(═O)Me | Me | C(═O)Me | O |
| C-18275 | Me(R) | single bond | H | Ph | C(═O)Me | Me | C(═O)Me | O |
| C-18276 | Me(S) | single bond | H | Ph | C(═O)Me | Me | C(═O)Me | O |
| C-18277 | H | single bond | Me | $CH_2Ph$ | C(═O)Me | Cl | C(═O)Me | O |
| C-18278 | Me | single bond | H | $CH_2Ph$ | C(═O)Me | Cl | C(═O)Me | O |

TABLE 644

| Compound Number | Y | W | Z | $R^1$ | $R^2$ | $R^3$ | $R^{10}$ | A |
|---|---|---|---|---|---|---|---|---|
| C-18279 | Me(R) | single bond | H | $CH_2Ph$ | C(=O)Me | Cl | C(=O)Me | O |
| C-18280 | Me(S) | single bond | H | $CH_2Ph$ | C(=O)Me | Cl | C(=O)Me | O |
| C-18281 | H | single bond | Me | $CH_2Ph$ | C(=O)Me | Me | C(=O)Me | O |
| C-18282 | Me | single bond | H | $CH_2Ph$ | C(=O)Me | Me | C(=O)Me | O |
| C-18283 | Me(R) | single bond | H | $CH_2Ph$ | C(=O)Me | Me | C(=O)Me | O |
| C-18284 | Me(S) | single bond | H | $CH_2Ph$ | C(=O)Me | Me | C(=O)Me | O |
| C-18285 | H | single bond | Me | thiazole-2-yl | C(=O)Me | Cl | C(=O)Me | O |
| C-18286 | Me | single bond | H | thiazole-2-yl | C(=O)Me | Cl | C(=O)Me | O |
| C-18287 | Me(R) | single bond | H | thiazole-2-yl | C(=O)Me | Cl | C(=O)Me | O |
| C-18288 | Me(S) | single bond | H | thiazole-2-yl | C(=O)Me | Cl | C(=O)Me | O |
| C-18289 | H | single bond | Me | thiazole-2-yl | C(=O)Me | Me | C(=O)Me | O |
| C-18290 | Me | single bond | H | thiazole-2-yl | C(=O)Me | Me | C(=O)Me | O |
| C-18291 | Me(R) | single bond | H | thiazole-2-yl | C(=O)Me | Me | C(=O)Me | O |
| C-18292 | Me(S) | single bond | H | thiazole-2-yl | C(=O)Me | Me | C(=O)Me | O |
| C-18293 | H | single bond | Me | 1-Me-pyrazol-3-yl | C(=O)Me | Cl | C(=O)Me | O |
| C-18294 | Me | single bond | H | 1-Me-pyrazol-3-yl | C(=O)Me | Cl | C(=O)Me | O |
| C-18295 | Me(R) | single bond | H | 1-Me-pyrazol-3-yl | C(=O)Me | Cl | C(=O)Me | O |
| C-18296 | Me(S) | single bond | H | 1-Me-pyrazol-3-yl | C(=O)Me | Cl | C(=O)Me | O |
| C-18297 | H | single bond | Me | 1-Me-pyrazol-3-yl | C(=O)Me | Me | C(=O)Me | O |
| C-18298 | Me | single bond | H | 1-Me-pyrazol-3-yl | C(=O)Me | Me | C(=O)Me | O |
| C-18299 | Me(R) | single bond | H | 1-Me-pyrazol-3-yl | C(=O)Me | Me | C(=O)Me | O |
| C-18300 | Me(S) | single bond | H | 1-Me-pyrazol-3-yl | C(=O)Me | Me | C(=O)Me | O |
| C-18301 | H | single bond | Me | 1-Me-pyrazol-5-yl | C(=O)Me | Cl | C(=O)Me | O |
| C-18302 | Me | single bond | H | 1-Me-pyrazol-5-yl | C(=O)Me | Cl | C(=O)Me | O |
| C-18303 | Me(R) | single bond | H | 1-Me-pyrazol-5-yl | C(=O)Me | Cl | C(=O)Me | O |
| C-18304 | Me(S) | single bond | H | 1-Me-pyrazol-5-yl | C(=O)Me | Cl | C(=O)Me | O |
| C-18305 | H | single bond | Me | 1-Me-pyrazol-5-yl | C(=O)Me | Me | C(=O)Me | O |
| C-18306 | Me | single bond | H | 1-Me-pyrazol-5-yl | C(=O)Me | Me | C(=O)Me | O |
| C-18307 | Me(R) | single bond | H | 1-Me-pyrazol-5-yl | C(=O)Me | Me | C(=O)Me | O |
| C-18308 | Me(S) | single bond | H | 1-Me-pyrazol-5-yl | C(=O)Me | Me | C(=O)Me | O |
| C-18309 | H | single bond | Me | $CH_2$(pyrimidin-2-yl) | C(=O)Me | Cl | C(=O)Me | O |
| C-18310 | Me | single bond | H | $CH_2$(pyrimidin-2-yl) | C(=O)Me | Cl | C(=O)Me | O |
| C-18311 | Me(R) | single bond | H | $CH_2$(pyrimidin-2-yl) | C(=O)Me | Cl | C(=O)Me | O |
| C-18312 | Me(S) | single bond | H | $CH_2$(pyrimidin-2-yl) | C(=O)Me | Cl | C(=O)Me | O |
| C-18313 | H | single bond | Me | $CH_2$(pyrimidin-2-yl) | C(=O)Me | Me | C(=O)Me | O |
| C-18314 | Me | single bond | H | $CH_2$(pyrimidin-2-yl) | C(=O)Me | Me | C(=O)Me | O |
| C-18315 | Me(R) | single bond | H | $CH_2$(pyrimidin-2-yl) | C(=O)Me | Me | C(=O)Me | O |
| C-18316 | Me(S) | single bond | H | $CH_2$(pyrimidin-2-yl) | C(=O)Me | Me | C(=O)Me | O |

TABLE 645

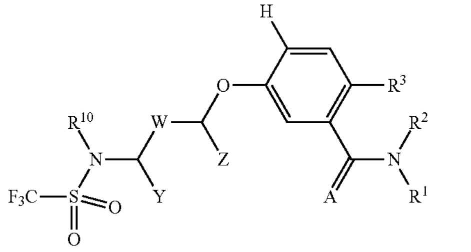

| Compound Number | Y | W | Z | $R^1$ | $R^2$ | $R^3$ | $R^{10}$ | A |
|---|---|---|---|---|---|---|---|---|
| D-0001 | H | single bond | Me | $CH_2CF_3$ | H | Cl | H | O |
| D-0002 | H | single bond | Et | $CH_2CF_3$ | H | Cl | H | O |
| D-0003 | H | single bond | i-Pr | $CH_2CF_3$ | H | Cl | H | O |
| D-0004 | Me | single bond | H | $CH_2CF_3$ | H | Cl | H | O |
| D-0005 | Me(R) | single bond | H | $CH_2CF_3$ | H | Cl | H | O |
| D-0006 | Me(S) | single bond | H | $CH_2CF_3$ | H | Cl | H | O |
| D-0007 | Me | single bond | H | $CH_2CF_3$ | H | Cl | H | O |
| D-0008 | Me(R) | single bond | H | $CH_2CF_3$ | H | Cl | H | O |
| D-0009 | Me(S) | single bond | H | $CH_2CF_3$ | H | Cl | H | O |
| D-0010 | Et | single bond | H | $CH_2CF_3$ | H | Cl | H | O |
| D-0011 | i-Pr | single bond | H | $CH_2CF_3$ | H | Cl | H | O |
| D-0012 | CF3 | single bond | H | $CH_2CF_3$ | H | Cl | H | O |
| D-0013 | Me | single bond | Me | $CH_2CF_3$ | H | Cl | H | O |
| D-0014 | H | $CH_2$ | Me | $CH_2CF_3$ | H | Cl | H | O |
| D-0015 | Me | $CH_2$ | H | $CH_2CF_3$ | H | Cl | H | O |
| D-0016 | Me | $CH_2$ | Me | $CH_2CF_3$ | H | Cl | H | O |
| D-0017 | H | CH(Me) | H | $CH_2CF_3$ | H | Cl | H | O |
| D-0018 | H | CH(Me) | Me | $CH_2CF_3$ | H | Cl | H | O |

TABLE 645-continued

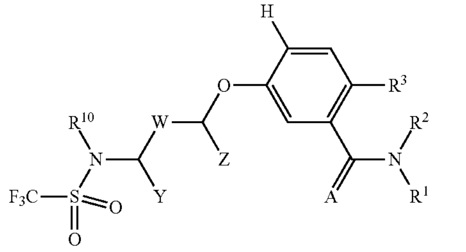

| Compound Number | Y | W | Z | $R^1$ | $R^2$ | $R^3$ | $R^{10}$ | A |
|---|---|---|---|---|---|---|---|---|
| D-0019 | Me | CH(Me) | H | $CH_2CF_3$ | H | Cl | H | O |
| D-0020 | Me | CH(Me) | Me | $CH_2CF_3$ | H | Cl | H | O |
| D-0021 | H | $CH_2CH_2$ | Me | $CH_2CF_3$ | H | Cl | H | O |
| D-0022 | Me | $CH_2CH_2$ | H | $CH_2CF_3$ | H | Cl | H | O |
| D-0023 | Me | $CH_2CH_2$ | Me | $CH_2CF_3$ | H | Cl | H | O |
| D-0024 | H | $CH_2$CH(Me) | H | $CH_2CF_3$ | H | Cl | H | O |
| D-0025 | H | $CH_2$CH(Me) | Me | $CH_2CF_3$ | H | Cl | H | O |
| D-0026 | Me | $CH_2$CH(Me) | H | $CH_2CF_3$ | H | Cl | H | O |
| D-0027 | Me | $CH_2$CH(Me) | Me | $CH_2CF_3$ | H | Cl | H | O |
| D-0028 | H | CH(Me)$CH_2$ | H | $CH_2CF_3$ | H | Cl | H | O |
| D-0029 | H | CH(Me)$CH_2$ | Me | $CH_2CF_3$ | H | Cl | H | O |
| D-0030 | Me | CH(Me)$CH_2$ | H | $CH_2CF_3$ | H | Cl | H | O |
| D-0031 | Me | CH(Me)$CH_2$ | Me | $CH_2CF_3$ | H | Cl | H | O |
| D-0032 | H | single bond | Me | $CH_2CF_3$ | H | Me | H | O |
| D-0033 | H | single bond | Et | $CH_2CF_3$ | H | Me | H | O |
| D-0034 | H | single bond | i-Pr | $CH_2CF_3$ | H | Me | H | O |
| D-0035 | Me | single bond | H | $CH_2CF_3$ | H | Me | H | O |
| D-0036 | Me(R) | single bond | H | $CH_2CF_3$ | H | Me | H | O |

TABLE 645-continued

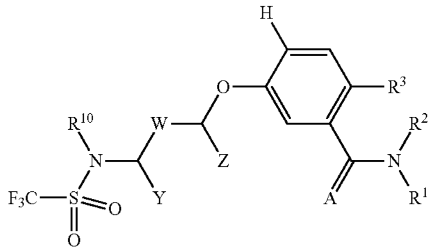

| Compound Number | Y | W | Z | $R^1$ | $R^2$ | $R^3$ | $R^{10}$ | A |
|---|---|---|---|---|---|---|---|---|
| D-0037 | Me(S) | single bond | H | $CH_2CF_3$ | H | Me | H | O |
| D-0038 | Me | single bond | H | $CH_2CF_3$ | H | Me | H | S |

TABLE 646

| Compound Number | Y | W | Z | $R^1$ | $R^2$ | $R^3$ | $R^{10}$ | A |
|---|---|---|---|---|---|---|---|---|
| D-0039 | Me(R) | single bond | H | $CH_2CF_3$ | H | Me | H | S |
| D-0040 | Me(S) | single bond | H | $CH_2CF_3$ | H | Me | H | S |
| D-0041 | Et | single bond | H | $CH_2CF_3$ | H | Me | H | O |
| D-0042 | i-Pr | single bond | H | $CH_2CF_3$ | H | Me | H | O |
| D-0043 | $CF_3$ | single bond | H | $CH_2CF_3$ | H | Me | H | O |
| D-0044 | Me | single bond | Me | $CH_2CF_3$ | H | Me | H | O |
| D-0045 | H | $CH_2$ | Me | $CH_2CF_3$ | H | Me | H | O |
| D-0046 | Me | $CH_2$ | H | $CH_2CF_3$ | H | Me | H | O |
| D-0047 | Me | $CH_2$ | Me | $CH_2CF_3$ | H | Me | H | O |
| D-0048 | H | CH(Me) | H | $CH_2CF_3$ | H | Me | H | O |
| D-0049 | H | CH(Me) | Me | $CH_2CF_3$ | H | Me | H | O |
| D-0050 | Me | CH(Me) | H | $CH_2CF_3$ | H | Me | H | O |
| D-0051 | Me | CH(Me) | Me | $CH_2CF_3$ | H | Me | H | O |
| D-0052 | H | $CH_2CH_2$ | Me | $CH_2CF_3$ | H | Me | H | O |
| D-0053 | Me | $CH_2CH_2$ | H | $CH_2CF_3$ | H | Me | H | O |
| D-0054 | Me | $CH_2CH_2$ | Me | $CH_2CF_3$ | H | Me | H | O |
| D-0055 | H | $CH_2CH(Me)$ | H | $CH_2CF_3$ | H | Me | H | O |
| D-0056 | H | $CH_2CH(Me)$ | Me | $CH_2CF_3$ | H | Me | H | O |
| D-0057 | Me | $CH_2CH(Me)$ | H | $CH_2CF_3$ | H | Me | H | O |
| D-0058 | Me | $CH_2CH(Me)$ | Me | $CH_2CF_3$ | H | Me | H | O |
| D-0059 | H | $CH(Me)CH_2$ | H | $CH_2CF_3$ | H | Me | H | O |
| D-0060 | H | $CH(Me)CH_2$ | Me | $CH_2CF_3$ | H | Me | H | O |
| D-0061 | Me | $CH(Me)CH_2$ | H | $CH_2CF_3$ | H | Me | H | O |
| D-0062 | Me | $CH(Me)CH_2$ | Me | $CH_2CF_3$ | H | Me | H | O |
| D-0063 | H | single bond | Me | Et | H | Cl | H | O |
| D-0064 | H | single bond | Et | Et | H | Cl | H | O |
| D-0065 | H | single bond | i-Pr | Et | H | Cl | H | O |
| D-0066 | Me | single bond | H | Et | H | Cl | H | O |
| D-0067 | Me(R) | single bond | H | Et | H | Cl | H | O |
| D-0068 | Me(S) | single bond | H | Et | H | Cl | H | O |
| D-0069 | Me | single bond | H | Et | H | Cl | H | S |
| D-0070 | Me(R) | single bond | H | Et | H | Cl | H | S |
| D-0071 | Me(S) | single bond | H | Et | H | Cl | H | S |
| D-0072 | Et | single bond | H | Et | H | Cl | H | O |
| D-0073 | i-Pr | single bond | H | Et | H | Cl | H | O |
| D-0074 | $CF_3$ | single bond | H | Et | H | Cl | H | O |
| D-0075 | Me | single bond | Me | Et | H | C | H | O |
| D-0076 | H | $CH_2$ | Me | Et | H | Cl | H | O |
| D-0077 | Me | $CH_2$ | H | Et | H | Cl | H | O |
| D-0078 | Me | $CH_2$ | Me | Et | H | C | H | O |
| D-0079 | H | CH(Me) | H | Et | H | Cl | H | O |
| D-0080 | H | CH(Me) | Me | Et | H | Cl | H | O |
| D-0081 | Me | CH(Me) | H | Et | H | Cl | H | O |
| D-0082 | Me | CH(Me) | Me | Et | H | C | H | O |

TABLE 647

| Compound Number | Y | W | Z | $R^1$ | $R^2$ | $R^3$ | $R^{10}$ | A |
|---|---|---|---|---|---|---|---|---|
| D-0083 | H | $CH_2CH_2$ | Me | Et | H | Cl | H | O |
| D-0084 | Me | $CH_2CH_2$ | H | Et | H | Cl | H | O |
| D-0085 | Me | $CH_2CH_2$ | Me | Et | H | Cl | H | O |

TABLE 647-continued

| Compound Number | Y | W | Z | $R^1$ | $R^2$ | $R^3$ | $R^{10}$ | A |
|---|---|---|---|---|---|---|---|---|
| D-0086 | H | $CH_2CH(Me)$ | H | Et | H | Cl | H | O |
| D-0087 | H | $CH_2CH(Me)$ | Me | Et | H | Cl | H | O |
| D-0088 | Me | $CH_2CH(Me)$ | H | Et | H | Cl | H | O |
| D-0089 | Me | $CH_2CH(Me)$ | Me | Et | H | Cl | H | O |
| D-0090 | H | $CH(Me)CH_2$ | H | Et | H | Cl | H | O |
| D-0091 | H | $CH(Me)CH_2$ | Me | Et | H | Cl | H | O |
| D-0092 | Me | $CH(Me)CH_2$ | H | Et | H | Cl | H | O |
| D-0093 | Me | $CH(Me)CH_2$ | Me | Et | H | Cl | H | O |
| D-0094 | H | single bond | Me | Et | H | Me | H | O |
| D-0095 | H | single bond | Et | Et | H | Me | H | O |
| D-0096 | H | single bond | i-Pr | Et | H | Me | H | O |
| D-0097 | Me | single bond | H | Et | H | Me | H | O |
| D-0098 | Me(R) | single bond | H | Et | H | Me | H | O |
| D-0099 | Me(S) | single bond | H | Et | H | Me | H | O |
| D-0100 | Me | single bond | H | Et | H | Me | H | S |
| D-0101 | Me(R) | single bond | H | Et | H | Me | H | S |
| D-0102 | Me(S) | single bond | H | Et | H | Me | H | S |
| D-0103 | Et | single bond | H | Et | H | Me | H | O |
| D-0104 | i-Pr | single bond | H | Et | H | Me | H | O |
| D-0105 | $CF_3$ | single bond | H | Et | H | Me | H | O |
| D-0106 | Me | single bond | Me | Et | H | Me | H | O |
| D-0107 | H | $CH_2$ | Me | Et | H | Me | H | O |
| D-0108 | Me | $CH_2$ | H | Et | H | Me | H | O |
| D-0109 | Me | $CH_2$ | Me | Et | H | Me | H | O |
| D-0110 | H | CH(Me) | H | Et | H | Me | H | O |
| D-0111 | H | CH(Me) | Me | Et | H | Me | H | O |
| D-0112 | Me | CH(Me) | H | Et | H | Me | H | O |
| D-0113 | Me | CH(Me) | Me | Et | H | Me | H | O |
| D-0114 | H | $CH_2CH_2$ | Me | Et | H | Me | H | O |
| D-0115 | Me | $CH_2CH_2$ | H | Et | H | Me | H | O |
| D-0116 | Me | $CH_2CH_2$ | Me | Et | H | Me | H | O |
| D-0117 | H | $CH_2CH(Me)$ | H | Et | H | Me | H | O |
| D-0118 | H | $CH_2CH(Me)$ | Me | Et | H | Me | H | O |
| D-0119 | Me | $CH_2CH(Me)$ | H | Et | H | Me | H | O |
| D-0120 | Me | $CH_2CH(Me)$ | Me | Et | H | Me | H | O |
| D-0121 | H | $CH(Me)CH_2$ | H | Et | H | Me | H | O |
| D-0122 | H | $CH(Me)CH_2$ | Me | Et | H | Me | H | O |
| D-0123 | Me | $CH(Me)CH_2$ | H | Et | H | Me | H | O |
| D-0124 | Me | $CH(Me)CH_2$ | Me | Et | H | Me | H | O |
| D-0125 | H | single bond | Me | c-Pr | H | Cl | H | O |
| D-0126 | H | single bond | Et | c-Pr | H | Cl | H | O |

TABLE 648

| Compound Number | Y | W | Z | $R^1$ | $R^2$ | $R^3$ | $R^{10}$ | A |
|---|---|---|---|---|---|---|---|---|
| D-0127 | H | single bond | i-Pr | c-Pr | H | Cl | H | O |
| D-0128 | Me | single bond | H | c-Pr | H | Cl | H | O |
| D-0129 | Me(R) | single bond | H | c-Pr | H | Cl | H | O |
| D-0130 | Me(S) | single bond | H | c-Pr | H | Cl | H | O |
| D-0131 | Me | single bond | H | c-Pr | H | Cl | H | S |
| D-0132 | Me(R) | single bond | H | c-Pr | H | Cl | H | S |
| D-0133 | Me(S) | single bond | H | c-Pr | H | Cl | H | S |
| D-0134 | Et | single bond | H | c-Pr | H | Cl | H | O |
| D-0135 | i-Pr | single bond | H | c-Pr | H | Cl | H | O |
| D-0136 | $CF_3$ | single bond | H | c-Pr | H | Cl | H | O |
| D-0137 | Me | single bond | Me | c-Pr | H | Cl | H | O |
| D-0138 | H | $CH_2$ | Me | c-Pr | H | Cl | H | O |
| D-0139 | Me | $CH_2$ | H | c-Pr | H | Cl | H | O |
| D-0140 | Me | $CH_2$ | Me | c-Pr | H | Cl | H | O |
| D-0141 | H | CH(Me) | H | c-Pr | H | Cl | H | O |
| D-0142 | H | CH(Me) | Me | c-Pr | H | Cl | H | O |
| D-0143 | Me | CH(Me) | H | c-Pr | H | Cl | H | O |
| D-0144 | Me | CH(Me) | Me | c-Pr | H | Cl | H | O |
| D-0145 | H | $CH_2CH_2$ | Me | c-Pr | H | Cl | H | O |
| D-0146 | Me | $CH_2CH_2$ | H | c-Pr | H | Cl | H | O |
| D-0147 | Me | $CH_2CH_2$ | Me | c-Pr | H | Cl | H | O |
| D-0148 | H | $CH_2CH(Me)$ | H | c-Pr | H | Cl | H | O |
| D-0149 | H | $CH_2CH(Me)$ | Me | c-Pr | H | Cl | H | O |
| D-0150 | Me | $CH_2CH(Me)$ | H | c-Pr | H | Cl | H | O |
| D-0151 | Me | $CH_2CH(Me)$ | Me | c-Pr | H | Cl | H | O |

TABLE 648-continued

| Compound Number | Y | W | Z | $R^1$ | $R^2$ | $R^3$ | $R^{10}$ | A |
|---|---|---|---|---|---|---|---|---|
| D-0152 | H | $CH(Me)CH_2$ | H | c-Pr | H | Cl | H | O |
| D-0153 | H | $CH(Me)CH_2$ | Me | c-Pr | H | Cl | H | O |
| D-0154 | Me | $CH(Me)CH_2$ | H | c-Pr | H | Cl | H | O |
| D-0155 | Me | $CH(Me)CH_2$ | Me | c-Pr | H | Cl | H | O |
| D-0156 | H | single bond | Me | c-Pr | H | Me | H | O |
| D-0157 | H | single bond | Et | c-Pr | H | Me | H | O |
| D-0158 | H | single bond | i-Pr | c-Pr | H | Me | H | O |
| D-0159 | Me | single bond | H | c-Pr | H | Me | H | O |
| D-0160 | Me(R) | single bond | H | c-Pr | H | Me | H | O |
| D-0161 | Me(S) | single bond | H | c-Pr | H | Me | H | O |
| D-0162 | Me | single bond | H | c-Pr | H | Me | H | S |
| D-0163 | Me(R) | single bond | H | c-Pr | H | Me | H | S |
| D-0164 | Me(S) | single bond | H | c-Pr | H | Me | H | S |
| D-0165 | Et | single bond | H | c-Pr | H | Me | H | O |
| D-0166 | i-Pr | single bond | H | c-Pr | H | Me | H | O |
| D-0167 | $CF_3$ | single bond | H | c-Pr | H | Me | H | O |
| D-0168 | Me | single bond | Me | c-Pr | H | Me | H | O |
| D-0169 | H | $CH_2$ | Me | c-Pr | H | Me | H | O |
| D-0170 | Me | $CH_2$ | H | c-Pr | H | Me | H | O |

TABLE 649

| Compound Number | Y | W | Z | $R^1$ | $R^2$ | $R^3$ | $R^{10}$ | A |
|---|---|---|---|---|---|---|---|---|
| D-0171 | Me | $CH_2$ | Me | c-Pr | H | Me | H | O |
| D-0172 | H | CH(Me) | H | c-Pr | H | Me | H | O |
| D-0173 | H | CH(Me) | Me | c-Pr | H | Me | H | O |
| D-0174 | Me | CH(Me) | H | c-Pr | H | Me | H | O |
| D-0175 | Me | CH(Me) | Me | c-Pr | H | Me | H | O |
| D-0176 | H | $CH_2CH_2$ | Me | c-Pr | H | Me | H | O |
| D-0177 | Me | $CH_2CH_2$ | H | c-Pr | H | Me | H | O |
| D-0178 | Me | $CH_2CH_2$ | Me | c-Pr | H | Me | H | O |
| D-0179 | H | $CH_2CH(Me)$ | H | c-Pr | H | Me | H | O |
| D-0180 | H | $CH_2CH(Me)$ | Me | c-Pr | H | Me | H | O |
| D-0181 | Me | $CH_2CH(Me)$ | H | c-Pr | H | Me | H | O |
| D-0182 | Me | $CH_2CH(Me)$ | Me | c-Pr | H | Me | H | O |
| D-0183 | H | $CH(Me)CH_2$ | H | c-Pr | H | Me | H | O |
| D-0184 | H | $CH(Me)CH_2$ | Me | c-Pr | H | Me | H | O |
| D-0185 | Me | $CH(Me)CH_2$ | H | c-Pr | H | Me | H | O |
| D-0186 | Me | $CH(Me)CH_2$ | Me | c-Pr | H | Me | H | O |
| D-0187 | H | single bond | Me | c-Pr | H | Cl | Me | O |
| D-0188 | H | single bond | Et | c-Pr | H | Cl | Me | O |
| D-0189 | H | single bond | i-Pr | c-Pr | H | Cl | Me | O |
| D-0190 | Me | single bond | H | c-Pr | H | Cl | Me | O |
| D-0191 | Me(R) | single bond | H | c-Pr | H | Cl | Me | O |
| D-0192 | Me(S) | single bond | H | c-Pr | H | Cl | Me | O |
| D-0193 | Me | single bond | H | c-Pr | H | Cl | Me | S |
| D-0194 | Me(R) | single bond | H | c-Pr | H | Cl | Me | S |
| D-0195 | Me(S) | single bond | H | c-Pr | H | Cl | Me | S |
| D-0196 | Et | single bond | H | c-Pr | H | Cl | Me | O |
| D-0197 | i-Pr | single bond | H | c-Pr | H | Cl | Me | O |
| D-0198 | $CF_3$ | single bond | H | c-Pr | H | Cl | Me | O |
| D-0199 | Me | single bond | Me | c-Pr | H | Cl | Me | O |
| D-0200 | H | $CH_2$ | Me | c-Pr | H | Cl | Me | O |
| D-0201 | Me | $CH_2$ | H | c-Pr | H | Cl | Me | O |
| D-0202 | Me | $CH_2$ | Me | c-Pr | H | Cl | Me | O |
| D-0203 | H | CH(Me) | H | c-Pr | H | Cl | Me | O |
| D-0204 | H | CH(Me) | Me | c-Pr | H | Cl | Me | O |
| D-0205 | Me | CH(Me) | H | c-Pr | H | Cl | Me | O |
| D-0206 | Me | CH(Me) | Me | c-Pr | H | Cl | Me | O |
| D-0207 | H | $CH_2CH_2$ | Me | c-Pr | H | Cl | Me | O |
| D-0208 | Me | $CH_2CH_2$ | H | c-Pr | H | Cl | Me | O |
| D-0209 | Me | $CH_2CH_2$ | Me | c-Pr | H | Cl | Me | O |
| D-0210 | H | $CH_2CH(Me)$ | H | c-Pr | H | Cl | Me | O |
| D-0211 | H | $CH_2CH(Me)$ | Me | c-Pr | H | Cl | Me | O |
| D-0212 | Me | $CH_2CH(Me)$ | H | c-Pr | H | Cl | Me | O |
| D-0213 | Me | $CH_2CH(Me)$ | Me | c-Pr | H | Cl | Me | O |
| D-0214 | H | $CH(Me)CH_2$ | H | c-Pr | H | Cl | Me | O |

TABLE 650

| Compound Number | Y | W | Z | $R^1$ | $R^2$ | $R^3$ | $R^{10}$ | A |
|---|---|---|---|---|---|---|---|---|
| D-0215 | H | $CH(Me)CH_2$ | Me | c-Pr | H | Cl | Me | O |
| D-0216 | Me | $CH(Me)CH_2$ | H | c-Pr | H | Cl | Me | O |
| D-0217 | Me | $CH(Me)CH_2$ | Me | c-Pr | H | Cl | Me | O |
| D-0218 | H | single bond | Me | c-Pr | H | Me | Me | O |
| D-0219 | H | single bond | Et | c-Pr | H | Me | Me | O |
| D-0220 | H | single bond | i-Pr | c-Pr | H | Me | Me | O |
| D-0221 | Me | single bond | H | c-Pr | H | Me | Me | O |
| D-0222 | Me(R) | single bond | H | c-Pr | H | Me | Me | O |
| D-0223 | Me(S) | single bond | H | c-Pr | H | Me | Me | O |
| D-0224 | Me | single bond | H | c-Pr | H | Me | Me | S |
| D-0225 | Me(R) | single bond | H | c-Pr | H | Me | Me | S |
| D-0226 | Me(S) | single bond | H | c-Pr | H | Me | Me | S |
| D-0227 | Et | single bond | H | c-Pr | H | Me | Me | O |
| D-0228 | i-Pr | single bond | H | c-Pr | H | Me | Me | O |
| D-0229 | $CF_3$ | single bond | H | c-Pr | H | Me | Me | O |
| D-0230 | Me | single bond | Me | c-Pr | H | Me | Me | O |
| D-0231 | H | $CH_2$ | Me | c-Pr | H | Me | Me | O |
| D-0232 | Me | $CH_2$ | H | c-Pr | H | Me | Me | O |
| D-0233 | Me | $CH_2$ | Me | c-Pr | H | Me | Me | O |
| D-0234 | H | CH(Me) | H | c-Pr | H | Me | Me | O |
| D-0235 | H | CH(Me) | Me | c-Pr | H | Me | Me | O |
| D-0236 | Me | CH(Me) | H | c-Pr | H | Me | Me | O |
| D-0237 | Me | CH(Me) | Me | c-Pr | H | Me | Me | O |
| D-0238 | H | $CH_2CH_2$ | Me | c-Pr | H | Me | Me | O |
| D-0239 | Me | $CH_2CH_2$ | H | c-Pr | H | Me | Me | O |
| D-0240 | Me | $CH_2CH_2$ | Me | c-Pr | H | Me | Me | O |
| D-0241 | H | $CH_2CH(Me)$ | H | c-Pr | H | Me | Me | O |
| D-0242 | H | $CH_2CH(Me)$ | Me | c-Pr | H | Me | Me | O |
| D-0243 | Me | $CH_2CH(Me)$ | H | c-Pr | H | Me | Me | O |
| D-0244 | Me | $CH_2CH(Me)$ | Me | c-Pr | H | Me | Me | O |
| D-0245 | H | $CH(Me)CH_2$ | H | c-Pr | H | Me | Me | O |
| D-0246 | H | $CH(Me)CH_2$ | Me | c-Pr | H | Me | Me | O |
| D-0247 | Me | $CH(Me)CH_2$ | H | c-Pr | H | Me | Me | O |
| D-0248 | Me | $CH(Me)CH_2$ | Me | c-Pr | H | Me | Me | O |
| D-0249 | H | single bond | Me | c-Pr | H | Cl | Me | O |
| D-0250 | H | single bond | Et | c-Pr | H | Cl | Me | O |
| D-0251 | H | single bond | i-Pr | c-Pr | H | Cl | Me | O |
| D-0252 | Me | single bond | H | c-Pr | H | Cl | Me | O |
| D-0253 | Me(R) | single bond | H | c-Pr | H | Cl | Me | O |
| D-0254 | Me(S) | single bond | H | c-Pr | H | Cl | Me | O |
| D-0255 | Me | single bond | H | c-Pr | H | Cl | Me | S |
| D-0256 | Me(R) | single bond | H | c-Pr | H | Cl | Me | S |
| D-0257 | Me(S) | single bond | H | c-Pr | H | Cl | Me | S |
| D-0258 | Et | single bond | H | c-Pr | H | Cl | Me | O |

TABLE 651

| Compound Number | Y | W | Z | $R^1$ | $R^2$ | $R^3$ | $R^{10}$ | A |
|---|---|---|---|---|---|---|---|---|
| D-0259 | i-Pr | single bond | H | c-Pr | H | Cl | Me | O |
| D-0260 | $CF_3$ | single bond | H | c-Pr | H | Cl | Me | O |
| D-0261 | Me | single bond | Me | c-Pr | H | Cl | Me | O |
| D-0262 | H | $CH_2$ | Me | c-Pr | H | Cl | Me | O |
| D-0263 | Me | $CH_2$ | H | c-Pr | H | Cl | Me | O |
| D-0264 | Me | $CH_2$ | Me | c-Pr | H | Cl | Me | O |
| D-0265 | H | CH(Me) | H | c-Pr | H | Cl | Me | O |
| D-0266 | H | CH(Me) | Me | c-Pr | H | Cl | Me | O |
| D-0267 | Me | CH(Me) | H | c-Pr | H | Cl | Me | O |
| D-0268 | Me | CH(Me) | Me | c-Pr | H | Cl | Me | O |
| D-0269 | H | $CH_2CH_2$ | Me | c-Pr | H | Cl | Me | O |
| D-0270 | Me | $CH_2CH_2$ | H | c-Pr | H | Cl | Me | O |
| D-0271 | Me | $CH_2CH_2$ | Me | c-Pr | H | Cl | Me | O |
| D-0272 | H | $CH_2CH(Me)$ | H | c-Pr | H | Cl | Me | O |
| D-0273 | H | $CH_2CH(Me)$ | Me | c-Pr | H | Cl | Me | O |
| D-0274 | Me | $CH_2CH(Me)$ | H | c-Pr | H | Cl | Me | O |
| D-0275 | Me | $CH_2CH(Me)$ | Me | c-Pr | H | Cl | Me | O |
| D-0276 | H | $CH(Me)CH_2$ | H | c-Pr | H | Cl | Me | O |
| D-0277 | H | $CH(Me)CH_2$ | Me | c-Pr | H | Cl | Me | O |
| D-0278 | Me | $CH(Me)CH_2$ | H | c-Pr | H | Cl | Me | O |
| D-0279 | Me | $CH(Me)CH_2$ | Me | c-Pr | H | Cl | Me | O |
| D-0280 | H | single bond | Me | c-Pr | H | Me | Me | O |
| D-0281 | H | single bond | Et | c-Pr | H | Me | Me | O |
| D-0282 | H | single bond | i-Pr | c-Pr | H | Me | Me | O |

TABLE 651-continued

| Compound Number | Y | W | Z | $R^1$ | $R^2$ | $R^3$ | $R^{10}$ | A |
|---|---|---|---|---|---|---|---|---|
| D-0283 | Me | single bond | H | c-Pr | H | Me | Me | O |
| D-0284 | Me(R) | single bond | H | c-Pr | H | Me | Me | O |
| D-0285 | Me(S) | single bond | H | c-Pr | H | Me | Me | O |
| D-0286 | Me | single bond | H | c-Pr | H | Me | Me | S |
| D-0287 | Me(R) | single bond | H | c-Pr | H | Me | Me | S |
| D-0288 | Me(S) | single bond | H | c-Pr | H | Me | Me | S |
| D-0289 | Et | single bond | H | c-Pr | H | Me | Me | O |
| D-0290 | i-Pr | single bond | H | c-Pr | H | Me | Me | O |
| D-0291 | $CF_3$ | single bond | H | c-Pr | H | Me | Me | O |
| D-0292 | Me | single bond | Me | c-Pr | H | Me | Me | O |
| D-0293 | H | $CH_2$ | Me | c-Pr | H | Me | Me | O |
| D-0294 | Me | $CH_2$ | H | c-Pr | H | Me | Me | O |
| D-0295 | Me | $CH_2$ | Me | c-Pr | H | Me | Me | O |
| D-0296 | H | CH(Me) | H | c-Pr | H | Me | Me | O |
| D-0297 | H | CH(Me) | Me | c-Pr | H | Me | Me | O |
| D-0298 | Me | CH(Me) | H | c-Pr | H | Me | Me | O |
| D-0299 | Me | CH(Me) | Me | c-Pr | H | Me | Me | O |
| D-0300 | H | $CH_2CH_2$ | Me | c-Pr | H | Me | Me | O |
| D-0301 | Me | $CH_2CH_2$ | H | c-Pr | H | Me | Me | O |
| D-0302 | Me | $CH_2CH_2$ | Me | c-Pr | H | Me | Me | O |

TABLE 652

| Compound Number | Y | W | Z | $R^1$ | $R^2$ | $R^3$ | $R^{10}$ | A |
|---|---|---|---|---|---|---|---|---|
| D-0303 | H | $CH_2CH(Me)$ | H | c-Pr | H | Me | Me | O |
| D-0304 | H | $CH_2CH(Me)$ | Me | c-Pr | H | Me | Me | O |
| D-0305 | Me | $CH_2CH(Me)$ | H | c-Pr | H | Me | Me | O |
| D-0306 | Me | $CH_2CH(Me)$ | Me | c-Pr | H | Me | Me | O |
| D-0307 | H | $CH(Me)CH_2$ | H | c-Pr | H | Me | Me | O |
| D-0308 | H | $CH(Me)CH_2$ | Me | c-Pr | H | Me | Me | O |
| D-0309 | Me | $CH(Me)CH_2$ | H | c-Pr | H | Me | Me | O |
| D-0310 | Me | $CH(Me)CH_2$ | Me | c-Pr | H | Me | Me | O |
| D-0311 | H | single bond | Me | c-Pr | H | Cl | Me | O |
| D-0312 | H | single bond | Et | c-Pr | H | Cl | Me | O |
| D-0313 | H | single bond | i-Pr | c-Pr | H | Cl | Me | O |
| D-0314 | Me | single bond | H | c-Pr | H | Cl | Me | O |
| D-0315 | Me(R) | single bond | H | c-Pr | H | Cl | Me | O |
| D-0316 | Me(S) | single bond | H | c-Pr | H | Cl | Me | O |
| D-0317 | Me | single bond | H | c-Pr | H | Cl | Me | S |
| D-0318 | Me(R) | single bond | H | c-Pr | H | Cl | Me | S |
| D-0319 | Me(S) | single bond | H | c-Pr | H | Cl | Me | S |
| D-0320 | Et | single bond | H | c-Pr | H | Cl | Me | O |
| D-0321 | i-Pr | single bond | H | c-Pr | H | Cl | Me | O |
| D-0322 | $CF_3$ | single bond | H | c-Pr | H | Cl | Me | O |
| D-0323 | Me | single bond | Me | c-Pr | H | Cl | Me | O |
| D-0324 | H | $CH_2$ | Me | c-Pr | H | Cl | Me | O |
| D-0325 | Me | $CH_2$ | H | c-Pr | H | Cl | Me | O |
| D-0326 | Me | $CH_2$ | Me | c-Pr | H | Cl | Me | O |
| D-0327 | H | CH(Me) | H | c-Pr | H | Cl | Me | O |
| D-0328 | H | CH(Me) | Me | c-Pr | H | Cl | Me | O |
| D-0329 | Me | CH(Me) | H | c-Pr | H | Cl | Me | O |
| D-0330 | Me | CH(Me) | Me | c-Pr | H | Cl | Me | O |
| D-0331 | H | $CH_2CH_2$ | Me | c-Pr | H | Cl | Me | O |
| D-0332 | Me | $CH_2CH_2$ | H | c-Pr | H | Cl | Me | O |
| D-0333 | Me | $CH_2CH_2$ | Me | c-Pr | H | Cl | Me | O |
| D-0334 | H | $CH_2CH(Me)$ | H | c-Pr | H | Cl | Me | O |
| D-0335 | H | $CH_2CH(Me)$ | Me | c-Pr | H | Cl | Me | O |
| D-0336 | Me | $CH_2CH(Me)$ | H | c-Pr | H | Cl | Me | O |
| D-0337 | Me | $CH_2CH(Me)$ | Me | c-Pr | H | Cl | Me | O |
| D-0338 | H | $CH(Me)CH_2$ | H | c-Pr | H | Cl | Me | O |
| D-0339 | H | $CH(Me)CH_2$ | Me | c-Pr | H | Cl | Me | O |
| D-0340 | Me | $CH(Me)CH_2$ | H | c-Pr | H | Cl | Me | O |
| D-0341 | Me | $CH(Me)CH_2$ | Me | c-Pr | H | Cl | Me | O |
| D-0342 | H | single bond | Me | c-Pr | H | Me | Me | O |
| D-0343 | H | single bond | Et | c-Pr | H | Me | Me | O |
| D-0344 | H | single bond | i-Pr | c-Pr | H | Me | Me | O |
| D-0345 | Me | single bond | H | c-Pr | H | Me | Me | O |
| D-0346 | Me(R) | single bond | H | c-Pr | H | Me | Me | O |

TABLE 653

| Compound Number | Y | W | Z | $R^1$ | $R^2$ | $R^3$ | $R^{10}$ | A |
|---|---|---|---|---|---|---|---|---|
| D-0347 | Me(S) | single bond | H | c-Pr | H | Me | Me | O |
| D-0348 | Me | single bond | H | c-Pr | H | Me | Me | S |
| D-0349 | Me(R) | single bond | H | c-Pr | H | Me | Me | S |
| D-0350 | Me(S) | single bond | H | c-Pr | H | Me | Me | S |
| D-0351 | Et | single bond | H | c-Pr | H | Me | Me | O |
| D-0352 | i-Pr | single bond | H | c-Pr | H | Me | Me | O |
| D-0353 | $CF_3$ | single bond | H | c-Pr | H | Me | Me | O |
| D-0354 | Me | single bond | Me | c-Pr | H | Me | Me | O |
| D-0355 | H | $CH_2$ | Me | c-Pr | H | Me | Me | O |
| D-0356 | Me | $CH_2$ | H | c-Pr | H | Me | Me | O |
| D-0357 | Me | $CH_2$ | Me | c-Pr | H | Me | Me | O |
| D-0358 | H | CH(Me) | H | c-Pr | H | Me | Me | O |
| D-0359 | H | CH(Me) | Me | c-Pr | H | Me | Me | O |
| D-0360 | Me | CH(Me) | H | c-Pr | H | Me | Me | O |
| D-0361 | Me | CH(Me) | Me | c-Pr | H | Me | Me | O |
| D-0362 | H | $CH_2CH_2$ | Me | c-Pr | H | Me | Me | O |
| D-0363 | Me | $CH_2CH_2$ | H | c-Pr | H | Me | Me | O |
| D-0364 | Me | $CH_2CH_2$ | Me | c-Pr | H | Me | Me | O |
| D-0365 | H | $CH_2CH(Me)$ | H | c-Pr | H | Me | Me | O |
| D-0366 | H | $CH_2CH(Me)$ | Me | c-Pr | H | Me | Me | O |
| D-0367 | Me | $CH_2CH(Me)$ | H | c-Pr | H | Me | Me | O |
| D-0368 | Me | $CH_2CH(Me)$ | Me | c-Pr | H | Me | Me | O |
| D-0369 | H | $CH(Me)CH_2$ | H | c-Pr | H | Me | Me | O |
| D-0370 | H | $CH(Me)CH_2$ | Me | c-Pr | H | Me | Me | O |
| D-0371 | Me | $CH(Me)CH_2$ | H | c-Pr | H | Me | Me | O |
| D-0372 | Me | $CH(Me)CH_2$ | Me | c-Pr | H | Me | Me | O |
| D-0373 | H | single bond | Me | c-Pr | H | Cl | Et | O |
| D-0374 | Me | single bond | H | c-Pr | H | Cl | Et | O |
| D-0375 | Me(R) | single bond | H | c-Pr | H | Cl | Et | O |
| D-0376 | Me(S) | single bond | H | c-Pr | H | Cl | Et | O |
| D-0377 | Me | single bond | H | c-Pr | H | Cl | Et | S |
| D-0378 | Me(R) | single bond | H | c-Pr | H | Cl | Et | S |
| D-0379 | Me(S) | single bond | H | c-Pr | H | Cl | Et | S |
| D-0380 | Me | single bond | Me | c-Pr | H | Cl | Et | O |
| D-0381 | H | $CH_2$ | Me | c-Pr | H | Cl | Et | O |
| D-0382 | Me | $CH_2$ | H | c-Pr | H | Cl | Et | O |
| D-0383 | Me | $CH_2$ | Me | c-Pr | H | Cl | Et | O |
| D-0384 | H | CH(Me) | H | c-Pr | H | Cl | Et | O |
| D-0385 | H | CH(Me) | Me | c-Pr | H | Cl | Et | O |
| D-0386 | Me | CH(Me) | H | c-Pr | H | Cl | Et | O |
| D-0387 | Me | CH(Me) | Me | c-Pr | H | Cl | Et | O |
| D-0388 | H | $CH_2CH_2$ | Me | c-Pr | H | Cl | Et | O |
| D-0389 | Me | $CH_2CH_2$ | H | c-Pr | H | Cl | Et | O |
| D-0390 | Me | $CH_2CH_2$ | Me | c-Pr | H | Cl | Et | O |

TABLE 654

| Compound Number | Y | W | Z | $R^1$ | $R^2$ | $R^3$ | $R^{10}$ | A |
|---|---|---|---|---|---|---|---|---|
| D-0391 | H | single bond | Me | c-Pr | H | Me | Et | O |
| D-0392 | Me | single bond | H | c-Pr | H | Me | Et | O |
| D-0393 | Me(R) | single bond | H | c-Pr | H | Me | Et | O |
| D-0394 | Me(S) | single bond | H | c-Pr | H | Me | Et | O |
| D-0395 | Me | single bond | H | c-Pr | H | Me | Et | S |
| D-0396 | Me(R) | single bond | H | c-Pr | H | Me | Et | S |
| D-0397 | Me(S) | single bond | H | c-Pr | H | Me | Et | S |
| D-0398 | Me | single bond | Me | c-Pr | H | Me | Et | O |
| D-0399 | H | $CH_2$ | Me | c-Pr | H | Me | Et | O |
| D-0400 | Me | $CH_2$ | H | c-Pr | H | Me | Et | O |
| D-0401 | Me | $CH_2$ | Me | c-Pr | H | Me | Et | O |
| D-0402 | H | CH(Me) | H | c-Pr | H | Me | Et | O |
| D-0403 | H | CH(Me) | Me | c-Pr | H | Me | Et | O |
| D-0404 | Me | CH(Me) | H | c-Pr | H | Me | Et | O |
| D-0405 | Me | CH(Me) | Me | c-Pr | H | Me | Et | O |
| D-0406 | H | $CH_2CH_2$ | Me | c-Pr | H | Me | Et | O |
| D-0407 | Me | $CH_2CH_2$ | H | c-Pr | H | Me | Et | O |
| D-0408 | Me | $CH_2CH_2$ | Me | c-Pr | H | Me | Et | O |
| D-0409 | H | single bond | Me | c-Pr | H | Cl | Et | O |
| D-0410 | Me | single bond | H | c-Pr | H | Cl | Et | O |
| D-0411 | Me(R) | single bond | H | c-Pr | H | Cl | Et | O |
| D-0412 | Me(S) | single bond | H | c-Pr | H | Cl | Et | O |
| D-0413 | Me | single bond | H | c-Pr | H | Cl | Et | S |
| D-0414 | Me(R) | single bond | H | c-Pr | H | Cl | Et | S |

TABLE 654-continued

| Compound Number | Y | W | Z | $R^1$ | $R^2$ | $R^3$ | $R^{10}$ | A |
|---|---|---|---|---|---|---|---|---|
| D-0415 | Me(S) | single bond | H | c-Pr | H | Cl | Et | S |
| D-0416 | Me | single bond | Me | c-Pr | H | Cl | Et | O |
| D-0417 | H | $CH_2$ | Me | C-Pr | H | Cl | Et | O |
| D-0418 | Me | $CH_2$ | H | c-Pr | H | Cl | Et | O |
| D-0419 | Me | $CH_2$ | Me | c-Pr | H | Cl | Et | O |
| D-0420 | H | CH(Me) | H | c-Pr | H | Cl | Et | O |
| D-0421 | H | CH(Me) | Me | c-Pr | H | Cl | Et | O |
| D-0422 | Me | CH(Me) | H | c-Pr | H | Cl | Et | O |
| D-0423 | Me | CH(Me) | Me | c-Pr | H | Cl | Et | O |
| D-0424 | H | $CH_2CH_2$ | Me | c-Pr | H | Cl | Et | O |
| D-0425 | Me | $CH_2CH_2$ | H | c-Pr | H | Cl | Et | O |
| D-0426 | Me | $CH_2CH_2$ | Me | c-Pr | H | Cl | Et | O |
| D-0427 | H | single bond | Me | c-Pr | H | Me | Et | O |
| D-0428 | Me | single bond | H | c-Pr | H | Me | Et | O |
| D-0429 | Me(R) | single bond | H | c-Pr | H | Me | Et | O |
| D-0430 | Me(S) | single bond | H | c-Pr | H | Me | Et | O |
| D-0431 | Me | single bond | H | c-Pr | H | Me | Et | S |
| D-0432 | Me(R) | single bond | H | c-Pr | H | Me | Et | S |
| D-0433 | Me(S) | single bond | H | c-Pr | H | Me | Et | S |
| D-0434 | Me | single bond | Me | c-Pr | H | Me | Et | O |

TABLE 655

| Compound Number | Y | W | Z | $R^1$ | $R^2$ | $R^3$ | $R^{10}$ | A |
|---|---|---|---|---|---|---|---|---|
| D-0435 | H | $CH_2$ | Me | c-Pr | H | Me | Et | O |
| D-0436 | Me | $CH_2$ | H | c-Pr | H | Me | Et | O |
| D-0437 | Me | $CH_2$ | Me | c-Pr | H | Me | Et | O |
| D-0438 | H | CH(Me) | H | c-Pr | H | Me | Et | O |
| D-0439 | H | CH(Me) | Me | c-Pr | H | Me | Et | O |
| D-0440 | Me | CH(Me) | H | c-Pr | H | Me | Et | O |
| D-0441 | Me | CH(Me) | Me | c-Pr | H | Me | Et | O |
| D-0442 | H | $CH_2CH_2$ | Me | c-Pr | H | Me | Et | O |
| D-0443 | Me | $CH_2CH_2$ | H | c-Pr | H | Me | Et | O |
| D-0444 | Me | $CH_2CH_2$ | Me | c-Pr | H | Me | Et | O |
| D-0445 | H | single bond | Me | c-Pr | H | Cl | Et | O |
| D-0446 | Me | single bond | H | c-Pr | H | Cl | Et | O |
| D-0447 | Me(R) | single bond | H | c-Pr | H | Cl | Et | O |
| D-0448 | Me(S) | single bond | H | c-Pr | H | Cl | Et | O |
| D-0449 | Me | single bond | H | c-Pr | H | Cl | Et | O |
| D-0450 | Me(R) | single bond | H | c-Pr | H | Cl | Et | O |
| D-0451 | Me(S) | single bond | H | c-Pr | H | Cl | Et | O |
| D-0452 | Me | single bond | Me | c-Pr | H | Cl | Et | O |
| D-0453 | H | $CH_2$ | Me | c-Pr | H | Cl | Et | O |
| D-0454 | Me | $CH_2$ | H | c-Pr | H | Cl | Et | O |
| D-0455 | Me | $CH_2$ | Me | c-Pr | H | Cl | Et | O |
| D-0456 | H | CH(Me) | H | c-Pr | H | Cl | Et | O |
| D-0457 | H | CH(Me) | Me | c-Pr | H | Cl | Et | O |
| D-0458 | Me | CH(Me) | H | c-Pr | H | Cl | Et | O |
| D-0459 | Me | CH(Me) | Me | c-Pr | H | Cl | Et | O |
| D-0460 | H | $CH_2CH_2$ | Me | c-Pr | H | Cl | Et | O |
| D-0461 | Me | $CH_2CH_2$ | H | c-Pr | H | Cl | Et | O |
| D-0462 | Me | $CH_2CH_2$ | Me | c-Pr | H | Cl | Et | O |
| D-0463 | H | single bond | Me | c-Pr | H | Me | Et | O |
| D-0464 | Me | single bond | H | c-Pr | H | Me | Et | O |
| D-0465 | Me(R) | single bond | H | c-Pr | H | Me | Et | O |
| D-0466 | Me(S) | single bond | H | c-Pr | H | Me | Et | O |
| D-0467 | Me | single bond | H | c-Pr | H | Me | Et | O |
| D-0468 | Me(R) | single bond | H | c-Pr | H | Me | Et | O |
| D-0469 | Me(S) | single bond | H | c-Pr | H | Me | Et | O |
| D-0470 | Me | single bond | Me | c-Pr | H | Me | Et | O |
| D-0471 | H | $CH_2$ | Me | c-Pr | H | Me | Et | O |
| D-0472 | Me | $CH_2$ | H | c-Pr | H | Me | Et | O |
| D-0473 | Me | $CH_2$ | Me | c-Pr | H | Me | Et | O |
| D-0474 | H | CH(Me) | H | c-Pr | H | Me | Et | O |
| D-0475 | H | CH(Me) | Me | c-Pr | H | Me | Et | O |
| D-0476 | Me | CH(Me) | H | c-Pr | H | Me | Et | O |
| D-0477 | Me | CH(Me) | Me | c-Pr | H | Me | Et | O |
| D-0478 | H | $CH_2CH_2$ | Me | c-Pr | H | Me | Et | O |

TABLE 656

| Compound Number | Y | W | Z | $R^1$ | $R^2$ | $R^3$ | $R^{10}$ | A |
|---|---|---|---|---|---|---|---|---|
| D-0479 | Me | $CH_2CH_2$ | H | c-Pr | H | Me | Et | O |
| D-0480 | Me | $CH_2CH_2$ | Me | c-Pr | H | Me | Et | O |
| D-0481 | H | single bond | Me | c-Pr | H | Cl | $CH_2CF_3$ | O |
| D-0482 | Me | single bond | H | c-Pr | H | Cl | $CH_2CF_3$ | O |
| D-0483 | Me(R) | single bond | H | c-Pr | H | Cl | $CH_2CF_3$ | O |
| D-0484 | Me(S) | single bond | H | c-Pr | H | Cl | $CH_2CF_3$ | O |
| D-0485 | Me | single bond | H | c-Pr | H | Cl | $CH_2CF_3$ | S |
| D-0486 | Me(R) | single bond | H | c-Pr | H | Cl | $CH_2CF_3$ | S |
| D-0487 | Me(S) | single bond | H | c-Pr | H | Cl | $CH_2CF_3$ | S |
| D-0488 | Me | single bond | Me | c-Pr | H | Cl | $CH_2CF_3$ | O |
| D-0489 | H | $CH_2$ | Me | c-Pr | H | Cl | $CH_2CF_3$ | O |
| D-0490 | Me | $CH_2$ | H | c-Pr | H | Cl | $CH_2CF_3$ | O |
| D-0491 | Me | $CH_2$ | Me | c-Pr | H | Cl | $CH_2CF_3$ | O |
| D-0492 | H | CH(Me) | H | c-Pr | H | Cl | $CH_2CF_3$ | O |
| D-0493 | H | CH(Me) | Me | c-Pr | H | Cl | $CH_2CF_3$ | O |
| D-0494 | Me | CH(Me) | H | c-Pr | H | Cl | $CH_2CF_3$ | O |
| D-0495 | Me | CH(Me) | Me | c-Pr | H | Cl | $CH_2CF_3$ | O |
| D-0496 | H | $CH_2CH_2$ | Me | c-Pr | H | Cl | $CH_2CF_3$ | O |
| D-0497 | Me | $CH_2CH_2$ | H | c-Pr | H | Cl | $CH_2CF_3$ | O |
| D-0498 | Me | $CH_2CH_2$ | Me | c-Pr | H | Cl | $CH_2CF_3$ | O |
| D-0499 | H | single bond | Me | c-Pr | H | Me | $CH_2CF_3$ | O |
| D-0500 | Me | single bond | H | c-Pr | H | Me | $CH_2CF_3$ | O |
| D-0501 | Me(R) | single bond | H | c-Pr | H | Me | $CH_2CF_3$ | O |
| D-0502 | Me(S) | single bond | H | c-Pr | H | Me | $CH_2CF_3$ | O |
| D-0503 | Me | single bond | H | c-Pr | H | Me | $CH_2CF_3$ | S |
| D-0504 | Me(R) | single bond | H | c-Pr | H | Me | $CH_2CF_3$ | S |
| D-0505 | Me(S) | single bond | H | c-Pr | H | Me | $CH_2CF_3$ | S |
| D-0506 | Me | single bond | Me | c-Pr | H | Me | $CH_2CF_3$ | O |
| D-0507 | H | $CH_2$ | Me | c-Pr | H | Me | $CH_2CF_3$ | O |
| D-0508 | Me | $CH_2$ | H | c-Pr | H | Me | $CH_2CF_3$ | O |
| D-0509 | Me | $CH_2$ | Me | c-Pr | H | Me | $CH_2CF_3$ | O |
| D-0510 | H | CH(Me) | H | c-Pr | H | Me | $CH_2CF_3$ | O |
| D-0511 | H | CH(Me) | Me | c-Pr | H | Me | $CH_2CF_3$ | O |
| D-0512 | Me | CH(Me) | H | c-Pr | H | Me | $CH_2CF_3$ | O |
| D-0513 | Me | CH(Me) | Me | c-Pr | H | Me | $CH_2CF_3$ | O |
| D-0514 | H | $CH_2CH_2$ | Me | c-Pr | H | Me | $CH_2CF_3$ | O |
| D-0515 | Me | $CH_2CH_2$ | H | c-Pr | H | Me | $CH_2CF_3$ | O |
| D-0516 | Me | $CH_2CH_2$ | Me | c-Pr | H | Me | $CH_2CF_3$ | O |
| D-0517 | H | single bond | Me | c-Pr | H | Cl | $CH_2CF_3$ | O |
| D-0518 | Me | single bond | H | c-Pr | H | Cl | $CH_2CF_3$ | O |
| D-0519 | Me(R) | single bond | H | c-Pr | H | Cl | $CH_2CF_3$ | O |
| D-0520 | Me(S) | single bond | H | c-Pr | H | Cl | $CH_2CF_3$ | O |
| D-0521 | Me | single bond | H | c-Pr | H | Cl | $CH_2CF_3$ | S |
| D-0522 | Me(R) | single bond | H | c-Pr | H | Cl | $CH_2CF_3$ | S |

TABLE 657

| Compound Number | Y | W | Z | $R^1$ | $R^2$ | $R^3$ | $R^{10}$ | A |
|---|---|---|---|---|---|---|---|---|
| D-0523 | Me(S) | single bond | H | c-Pr | H | Cl | $CH_2CF_3$ | S |
| D-0524 | Me | single bond | Me | c-Pr | H | Cl | $CH_2CF_3$ | O |
| D-0525 | H | $CH_2$ | Me | c-Pr | H | Cl | $CH_2CF_3$ | O |
| D-0526 | Me | $CH_2$ | H | c-Pr | H | Cl | $CH_2CF_3$ | O |
| D-0527 | Me | $CH_2$ | Me | c-Pr | H | Cl | $CH_2CF_3$ | O |
| D-0528 | H | CH(Me) | H | c-Pr | H | Cl | $CH_2CF_3$ | O |
| D-0529 | H | CH(Me) | Me | c-Pr | H | Cl | $CH_2CF_3$ | O |
| D-0530 | Me | CH(Me) | H | c-Pr | H | Cl | $CH_2CF_3$ | O |
| D-0531 | Me | CH(Me) | Me | c-Pr | H | Cl | $CH_2CF_3$ | O |
| D-0532 | H | $CH_2CH_2$ | Me | c-Pr | H | Cl | $CH_2CF_3$ | O |
| D-0533 | Me | $CH_2CH_2$ | H | c-Pr | H | Cl | $CH_2CF_3$ | O |
| D-0534 | Me | $CH_2CH_2$ | Me | c-Pr | H | Cl | $CH_2CF_3$ | O |
| D-0535 | H | single bond | Me | c-Pr | H | Me | $CH_2CF_3$ | O |
| D-0536 | Me | single bond | H | c-Pr | H | Me | $CH_2CF_3$ | O |
| D-0537 | Me(R) | single bond | H | c-Pr | H | Me | $CH_2CF_3$ | O |
| D-0538 | Me(S) | single bond | H | c-Pr | H | Me | $CH_2CF_3$ | O |
| D-0539 | Me | single bond | H | c-Pr | H | Me | $CH_2CF_3$ | S |
| D-0540 | Me(R) | single bond | H | c-Pr | H | Me | $CH_2CF_3$ | S |
| D-0541 | Me(S) | single bond | H | c-Pr | H | Me | $CH_2CF_3$ | S |
| D-0542 | Me | single bond | Me | c-Pr | H | Me | $CH_2CF_3$ | O |
| D-0543 | H | $CH_2$ | Me | c-Pr | H | Me | $CH_2CF_3$ | O |
| D-0544 | Me | $CH_2$ | H | c-Pr | H | Me | $CH_2CF_3$ | O |
| D-0545 | Me | $CH_2$ | Me | c-Pr | H | Me | $CH_2CF_3$ | O |
| D-0546 | H | CH(Me) | H | c-Pr | H | Me | $CH_2CF_3$ | O |

TABLE 657-continued

| Compound Number | Y | W | Z | $R^1$ | $R^2$ | $R^3$ | $R^{10}$ | A |
|---|---|---|---|---|---|---|---|---|
| D-0547 | H | CH(Me) | Me | c-Pr | H | Me | $CH_2CF_3$ | O |
| D-0548 | Me | CH(Me) | H | c-Pr | H | Me | $CH_2CF_3$ | O |
| D-0549 | Me | CH(Me) | Me | c-Pr | H | Me | $CH_2CF_3$ | O |
| D-0550 | H | $CH_2CH_2$ | Me | c-Pr | H | Me | $CH_2CF_3$ | O |
| D-0551 | Me | $CH_2CH_2$ | H | c-Pr | H | Me | $CH_2CF_3$ | O |
| D-0552 | Me | $CH_2CH_2$ | Me | c-Pr | H | Me | $CH_2CF_3$ | O |
| D-0553 | H | single bond | Me | c-Pr | H | Cl | $CH_2CF_3$ | O |
| D-0554 | Me | single bond | H | c-Pr | H | Cl | $CH_2CF_3$ | O |
| D-0555 | Me(R) | single bond | H | c-Pr | H | Cl | $CH_2CF_3$ | O |
| D-0556 | Me(S) | single bond | H | c-Pr | H | Cl | $CH_2CF_3$ | O |
| D-0557 | Me | single bond | H | c-Pr | H | Cl | $CH_2CF_3$ | S |
| D-0558 | Me(R) | single bond | H | c-Pr | H | Cl | $CH_2CF_3$ | S |
| D-0559 | Me(S) | single bond | H | c-Pr | H | Cl | $CH_2CF_3$ | S |
| D-0560 | Me | single bond | Me | c-Pr | H | Cl | $CH_2CF_3$ | O |
| D-0561 | H | $CH_2$ | Me | c-Pr | H | Cl | $CH_2CF_3$ | O |
| D-0562 | Me | $CH_2$ | H | c-Pr | H | Cl | $CH_2CF_3$ | O |
| D-0563 | Me | $CH_2$ | Me | c-Pr | H | Cl | $CH_2CF_3$ | O |
| D-0564 | H | CH(Me) | H | c-Pr | H | Cl | $CH_2CF_3$ | O |
| D-0565 | H | CH(Me) | Me | c-Pr | H | Cl | $CH_2CF_3$ | O |
| D-0566 | Me | CH(Me) | H | c-Pr | H | Cl | $CH_2CF_3$ | O |

TABLE 658

| Compound Number | Y | W | Z | $R^1$ | $R^2$ | $R^3$ | $R^{10}$ | A |
|---|---|---|---|---|---|---|---|---|
| D-0567 | Me | CH(Me) | Me | c-Pr | H | Cl | $CH_2CF_3$ | O |
| D-0568 | H | $CH_2CH_2$ | Me | c-Pr | H | Cl | $CH_2CF_3$ | O |
| D-0569 | Me | $CH_2CH_2$ | H | c-Pr | H | Cl | $CH_2CF_3$ | O |
| D-0570 | Me | $CH_2CH_2$ | Me | c-Pr | H | Cl | $CH_2CF_3$ | O |
| D-0571 | H | single bond | Me | c-Pr | H | Me | $CH_2CF_3$ | O |
| D-0572 | Me | single bond | H | c-Pr | H | Me | $CH_2CF_3$ | O |
| D-0573 | Me(R) | single bond | H | c-Pr | H | Me | $CH_2CF_3$ | O |
| D-0574 | Me(S) | single bond | H | c-Pr | H | Me | $CH_2CF_3$ | O |
| D-0575 | Me | single bond | H | c-Pr | H | Me | $CH_2CF_3$ | S |
| D-0576 | Me(R) | single bond | H | c-Pr | H | Me | $CH_2CF_3$ | S |
| D-0577 | Me(S) | single bond | H | c-Pr | H | Me | $CH_2CF_3$ | S |
| D-0578 | Me | single bond | Me | c-Pr | H | Me | $CH_2CF_3$ | O |
| D-0579 | H | $CH_2$ | Me | c-Pr | H | Me | $CH_2CF_3$ | O |
| D-0580 | Me | $CH_2$ | H | c-Pr | H | Me | $CH_2CF_3$ | O |
| D-0581 | Me | $CH_2$ | Me | c-Pr | H | Me | $CH_2CF_3$ | O |
| D-0582 | H | CH(Me) | H | c-Pr | H | Me | $CH_2CF_3$ | O |
| D-0583 | H | CH(Me) | Me | c-Pr | H | Me | $CH_2CF_3$ | O |
| D-0584 | Me | CH(Me) | H | c-Pr | H | Me | $CH_2CF_3$ | O |
| D-0585 | Me | CH(Me) | Me | c-Pr | H | Me | $CH_2CF_3$ | O |
| D-0586 | H | $CH_2CH_2$ | Me | c-Pr | H | Me | $CH_2CF_3$ | O |
| D-0587 | Me | $CH_2CH_2$ | H | c-Pr | H | Me | $CH_2CF_3$ | O |
| D-0588 | Me | $CH_2CH_2$ | Me | c-Pr | H | Me | $CH_2CF_3$ | O |
| D-0589 | H | single bond | Me | c-Pr | H | Cl | $CH_2OMe$ | O |
| D-0590 | Me | single bond | H | c-Pr | H | Cl | $CH_2OMe$ | O |
| D-0591 | Me(R) | single bond | H | c-Pr | H | Cl | $CH_2OMe$ | O |
| D-0592 | Me(S) | single bond | H | c-Pr | H | Cl | $CH_2OMe$ | O |
| D-0593 | Me | single bond | H | c-Pr | H | Cl | $CH_2OMe$ | S |
| D-0594 | Me(R) | single bond | H | c-Pr | H | Cl | $CH_2OMe$ | S |
| D-0595 | Me(S) | single bond | H | c-Pr | H | Cl | $CH_2OMe$ | S |
| D-0596 | Me | single bond | Me | c-Pr | H | Cl | $CH_2OMe$ | O |
| D-0597 | H | $CH_2$ | Me | c-Pr | H | Cl | $CH_2OMe$ | O |
| D-0598 | Me | $CH_2$ | H | c-Pr | H | Cl | $CH_2OMe$ | O |
| D-0599 | Me | $CH_2$ | Me | c-Pr | H | Cl | $CH_2OMe$ | O |
| D-0600 | H | CH(Me) | H | c-Pr | H | Cl | $CH_2OMe$ | O |
| D-0601 | H | CH(Me) | Me | c-Pr | H | Cl | $CH_2OMe$ | O |
| D-0602 | Me | CH(Me) | H | c-Pr | H | Cl | $CH_2OMe$ | O |
| D-0603 | Me | CH(Me) | Me | c-Pr | H | Cl | $CH_2OMe$ | O |
| D-0604 | H | $CH_2CH_2$ | Me | c-Pr | H | Cl | $CH_2OMe$ | O |
| D-0605 | Me | $CH_2CH_2$ | H | c-Pr | H | Cl | $CH_2OMe$ | O |
| D-0606 | Me | $CH_2CH_2$ | Me | c-Pr | H | Cl | $CH_2OMe$ | O |
| D-0607 | H | single bond | Me | c-Pr | H | Me | $CH_2OMe$ | O |
| D-0608 | Me | single bond | H | c-Pr | H | Me | $CH_2OMe$ | O |
| D-0609 | Me(R) | single bond | H | c-Pr | H | Me | $CH_2OMe$ | O |
| D-0610 | Me(S) | single bond | H | c-Pr | H | Me | $CH_2OMe$ | O |

TABLE 659

| Compound Number | Y | W | Z | $R^1$ | $R^2$ | $R^3$ | $R^{10}$ | A |
|---|---|---|---|---|---|---|---|---|
| D-0611 | Me | single bond | H | c-Pr | H | Me | $CH_2OMe$ | S |
| D-0612 | Me(R) | single bond | H | c-Pr | H | Me | $CH_2OMe$ | S |
| D-0613 | Me(S) | single bond | H | c-Pr | H | Me | $CH_2OMe$ | S |
| D-0614 | Me | single bond | Me | c-Pr | H | Me | $CH_2OMe$ | O |
| D-0615 | H | $CH_2$ | Me | c-Pr | H | Me | $CH_2OMe$ | O |
| D-0616 | Me | $CH_2$ | H | c-Pr | H | Me | $CH_2OMe$ | O |
| D-0617 | Me | $CH_2$ | Me | c-Pr | H | Me | $CH_2OMe$ | O |
| D-0618 | H | CH(Me) | H | c-Pr | H | Me | $CH_2OMe$ | O |
| D-0619 | H | CH(Me) | Me | c-Pr | H | Me | $CH_2OMe$ | O |
| D-0620 | Me | CH(Me) | H | c-Pr | H | Me | $CH_2OMe$ | O |
| D-0621 | Me | CH(Me) | Me | c-Pr | H | Me | $CH_2OMe$ | O |
| D-0622 | H | $CH_2CH_2$ | Me | c-Pr | H | Me | $CH_2OMe$ | O |
| D-0623 | Me | $CH_2CH_2$ | H | c-Pr | H | Me | $CH_2OMe$ | O |
| D-0624 | Me | $CH_2CH_2$ | Me | c-Pr | H | Me | $CH_2OMe$ | O |
| D-0625 | H | single bond | Me | c-Pr | H | Cl | $CH_2OMe$ | O |
| D-0626 | Me | single bond | H | c-Pr | H | Cl | $CH_2OMe$ | O |
| D-0627 | Me(R) | single bond | H | c-Pr | H | Cl | $CH_2OMe$ | O |
| D-0628 | Me(S) | single bond | H | c-Pr | H | Cl | $CH_2OMe$ | O |
| D-0629 | Me | single bond | H | c-Pr | H | Cl | $CH_2OMe$ | S |
| D-0630 | Me(R) | single bond | H | c-Pr | H | Cl | $CH_2OMe$ | S |
| D-0631 | Me(S) | single bond | H | c-Pr | H | Cl | $CH_2OMe$ | S |
| D-0632 | Me | single bond | Me | c-Pr | H | Cl | $CH_2OMe$ | O |
| D-0633 | H | $CH_2$ | Me | c-Pr | H | Cl | $CH_2OMe$ | O |
| D-0634 | Me | $CH_2$ | H | c-Pr | H | Cl | $CH_2OMe$ | O |
| D-0635 | Me | $CH_2$ | Me | c-Pr | H | Cl | $CH_2OMe$ | O |
| D-0636 | H | CH(Me) | H | c-Pr | H | Cl | $CH_2OMe$ | O |
| D-0637 | H | CH(Me) | Me | c-Pr | H | Cl | $CH_2OMe$ | O |
| D-0638 | Me | CH(Me) | H | c-Pr | H | Cl | $CH_2OMe$ | O |
| D-0639 | Me | CH(Me) | Me | c-Pr | H | Cl | $CH_2OMe$ | O |
| D-0640 | H | $CH_2CH_2$ | Me | c-Pr | H | Cl | $CH_2OMe$ | O |
| D-0641 | Me | $CH_2CH_2$ | H | c-Pr | H | Cl | $CH_2OMe$ | O |
| D-0642 | Me | $CH_2CH_2$ | Me | c-Pr | H | Cl | $CH_2OMe$ | O |
| D-0643 | H | single bond | Me | c-Pr | H | Me | $CH_2OMe$ | O |
| D-0644 | Me | single bond | H | c-Pr | H | Me | $CH_2OMe$ | O |
| D-0645 | Me(R) | single bond | H | c-Pr | H | Me | $CH_2OMe$ | O |
| D-0646 | Me(S) | single bond | H | c-Pr | H | Me | $CH_2OMe$ | O |
| D-0647 | Me | single bond | H | c-Pr | H | Me | $CH_2OMe$ | S |
| D-0648 | Me(R) | single bond | H | c-Pr | H | Me | $CH_2OMe$ | S |
| D-0649 | Me(S) | single bond | H | c-Pr | H | Me | $CH_2OMe$ | S |
| D-0650 | Me | single bond | Me | c-Pr | H | Me | $CH_2OMe$ | O |
| D-0651 | H | $CH_2$ | Me | c-Pr | H | Me | $CH_2OMe$ | O |
| D-0652 | Me | $CH_2$ | H | c-Pr | H | Me | $CH_2OMe$ | O |
| D-0653 | Me | $CH_2$ | Me | c-Pr | H | Me | $CH_2OMe$ | O |
| D-0654 | H | CH(Me) | H | c-Pr | H | Me | $CH_2OMe$ | O |

TABLE 660

| Compound Number | Y | W | Z | $R^1$ | $R^2$ | $R^3$ | $R^{10}$ | A |
|---|---|---|---|---|---|---|---|---|
| D-0655 | H | CH(Me) | Me | c-Pr | H | Me | $CH_2OMe$ | O |
| D-0656 | Me | CH(Me) | H | c-Pr | H | Me | $CH_2OMe$ | O |
| D-0657 | Me | CH(Me) | Me | c-Pr | H | Me | $CH_2OMe$ | O |
| D-0658 | H | $CH_2CH_2$ | Me | c-Pr | H | Me | $CH_2OMe$ | O |
| D-0659 | Me | $CH_2CH_2$ | H | c-Pr | H | Me | $CH_2OMe$ | O |
| D-0660 | Me | $CH_2CH_2$ | Me | c-Pr | H | Me | $CH_2OMe$ | O |
| D-0661 | H | single bond | Me | c-Pr | H | Cl | $CH_2OMe$ | O |
| D-0662 | Me | single bond | H | c-Pr | H | Cl | $CH_2OMe$ | O |
| D-0663 | Me(R) | single bond | H | c-Pr | H | Cl | $CH_2OMe$ | O |
| D-0664 | Me(S) | single bond | H | c-Pr | H | Cl | $CH_2OMe$ | O |
| D-0665 | Me | single bond | H | c-Pr | H | Cl | $CH_2OMe$ | S |
| D-0666 | Me(R) | single bond | H | c-Pr | H | Cl | $CH_2OMe$ | S |
| D-0667 | Me(S) | single bond | H | c-Pr | H | Cl | $CH_2OMe$ | S |
| D-0668 | Me | single bond | Me | c-Pr | H | Cl | $CH_2OMe$ | O |
| D-0669 | H | $CH_2$ | Me | c-Pr | H | Cl | $CH_2OMe$ | O |
| D-0670 | Me | $CH_2$ | H | c-Pr | H | Cl | $CH_2OMe$ | O |
| D-0671 | Me | $CH_2$ | Me | c-Pr | H | Cl | $CH_2OMe$ | O |
| D-0672 | H | CH(Me) | H | c-Pr | H | Cl | $CH_2OMe$ | O |
| D-0673 | H | CH(Me) | Me | c-Pr | H | Cl | $CH_2OMe$ | O |
| D-0674 | Me | CH(Me) | H | c-Pr | H | Cl | $CH_2OMe$ | O |
| D-0675 | Me | CH(Me) | Me | c-Pr | H | Cl | $CH_2OMe$ | O |
| D-0676 | H | $CH_2CH_2$ | Me | c-Pr | H | Cl | $CH_2OMe$ | O |
| D-0677 | Me | $CH_2CH_2$ | H | c-Pr | H | Cl | $CH_2OMe$ | O |
| D-0678 | Me | $CH_2CH_2$ | Me | c-Pr | H | Cl | $CH_2OMe$ | O |

TABLE 660-continued

| Compound Number | Y | W | Z | $R^1$ | $R^2$ | $R^3$ | $R^{10}$ | A |
|---|---|---|---|---|---|---|---|---|
| D-0679 | H | single bond | Me | c-Pr | H | Me | $CH_2OMe$ | O |
| D-0680 | Me | single bond | H | c-Pr | H | Me | $CH_2OMe$ | O |
| D-0681 | Me(R) | single bond | H | c-Pr | H | Me | $CH_2OMe$ | O |
| D-0682 | Me(S) | single bond | H | c-Pr | H | Me | $CH_2OMe$ | O |
| D-0683 | Me | single bond | H | c-Pr | H | Me | $CH_2OMe$ | S |
| D-0684 | Me(R) | single bond | H | c-Pr | H | Me | $CH_2OMe$ | S |
| D-0685 | Me(S) | single bond | H | c-Pr | H | Me | $CH_2OMe$ | S |
| D-0686 | Me | single bond | Me | c-Pr | H | Me | $CH_2OMe$ | O |
| D-0687 | H | $CH_2$ | Me | c-Pr | H | Me | $CH_2OMe$ | O |
| D-0688 | Me | $CH_2$ | H | c-Pr | H | Me | $CH_2OMe$ | O |
| D-0689 | Me | $CH_2$ | Me | c-Pr | H | Me | $CH_2OMe$ | O |
| D-0690 | H | CH(Me) | H | c-Pr | H | Me | $CH_2OMe$ | O |
| D-0691 | H | CH(Me) | Me | c-Pr | H | Me | $CH_2OMe$ | O |
| D-0692 | Me | CH(Me) | H | c-Pr | H | Me | $CH_2OMe$ | O |
| D-0693 | Me | CH(Me) | Me | c-Pr | H | Me | $CH_2OMe$ | O |
| D-0694 | H | $CH_2CH_2$ | Me | c-Pr | H | Me | $CH_2OMe$ | O |
| D-0695 | Me | $CH_2CH_2$ | H | c-Pr | H | Me | $CH_2OMe$ | O |
| D-0696 | Me | $CH_2CH_2$ | Me | c-Pr | H | Me | $CH_2OMe$ | O |
| D-0697 | H | single bond | Me | c-Pr | H | Cl | $CH_2CN$ | O |
| D-0698 | Me | single bond | H | c-Pr | H | Cl | $CH_2CN$ | O |

TABLE 661

| Compound Number | Y | W | Z | $R^1$ | $R^2$ | $R^3$ | $R^{10}$ | A |
|---|---|---|---|---|---|---|---|---|
| D-0699 | Me(R) | single bond | H | c-Pr | H | Cl | $CH_2CN$ | O |
| D-0700 | Me(S) | single bond | H | c-Pr | H | Cl | $CH_2CN$ | O |
| D-0701 | Me | single bond | H | c-Pr | H | Cl | $CH_2CN$ | S |
| D-0702 | Me(R) | single bond | H | c-Pr | H | Cl | $CH_2CN$ | S |
| D-0703 | Me(S) | single bond | H | c-Pr | H | Cl | $CH_2CN$ | S |
| D-0704 | Me | single bond | Me | c-Pr | H | Cl | $CH_2CN$ | O |
| D-0705 | H | $CH_2$ | Me | c-Pr | H | Cl | $CH_2CN$ | O |
| D-0706 | Me | $CH_2$ | H | c-Pr | H | Cl | $CH_2CN$ | O |
| D-0707 | Me | $CH_2$ | Me | c-Pr | H | Cl | $CH_2CN$ | O |
| D-0708 | H | CH(Me) | H | c-Pr | H | Cl | $CH_2CN$ | O |
| D-0709 | H | CH(Me) | Me | c-Pr | H | Cl | $CH_2CN$ | O |
| D-0710 | Me | CH(Me) | H | c-Pr | H | Cl | $CH_2CN$ | O |
| D-0711 | Me | CH(Me) | Me | c-Pr | H | Cl | $CH_2CN$ | O |
| D-0712 | H | $CH_2CH_2$ | Me | c-Pr | H | Cl | $CH_2CN$ | O |
| D-0713 | Me | $CH_2CH_2$ | H | c-Pr | H | Cl | $CH_2CN$ | O |
| D-0714 | Me | $CH_2CH_2$ | Me | c-Pr | H | Cl | $CH_2CN$ | O |
| D-0715 | H | single bond | Me | c-Pr | H | Me | $CH_2CN$ | O |
| D-0716 | Me | single bond | H | c-Pr | H | Me | $CH_2CN$ | O |
| D-0717 | Me(R) | single bond | H | c-Pr | H | Me | $CH_2CN$ | O |
| D-0718 | Me(S) | single bond | H | c-Pr | H | Me | $CH_2CN$ | O |
| D-0719 | Me | single bond | H | c-Pr | H | Me | $CH_2CN$ | S |
| D-0720 | Me(R) | single bond | H | c-Pr | H | Me | $CH_2CN$ | S |
| D-0721 | Me(S) | single bond | H | c-Pr | H | Me | $CH_2CN$ | S |
| D-0722 | Me | single bond | Me | c-Pr | H | Me | $CH_2CN$ | O |
| D-0723 | H | $CH_2$ | Me | c-Pr | H | Me | $CH_2CN$ | O |
| D-0724 | Me | $CH_2$ | H | c-Pr | H | Me | $CH_2CN$ | O |
| D-0725 | Me | $CH_2$ | Me | c-Pr | H | Me | $CH_2CN$ | O |
| D-0726 | H | CH(Me) | H | c-Pr | H | Me | $CH_2CN$ | O |
| D-0727 | H | CH(Me) | Me | c-Pr | H | Me | $CH_2CN$ | O |
| D-0728 | Me | CH(Me) | H | c-Pr | H | Me | $CH_2CN$ | 0 |
| D-0729 | Me | CH(Me) | Me | c-Pr | H | Me | $CH_2CN$ | O |
| D-0730 | H | $CH_2CH_2$ | Me | c-Pr | H | Me | $CH_2CN$ | O |
| D-0731 | Me | $CH_2CH_2$ | H | c-Pr | H | Me | $CH_2CN$ | O |
| D-0732 | Me | $CH_2CH_2$ | Me | c-Pr | H | Me | $CH_2CN$ | O |
| D-0733 | H | single bond | Me | c-Pr | H | Cl | $CH_2CN$ | O |
| D-0734 | Me | single bond | H | c-Pr | H | Cl | $CH_2CN$ | O |
| D-0735 | Me(R) | single bond | H | c-Pr | H | Cl | $CH_2CN$ | O |
| D-0736 | Me(S) | single bond | H | c-Pr | H | Cl | $CH_2CN$ | O |
| D-0737 | Me | single bond | H | c-Pr | H | Cl | $CH_2CN$ | S |
| D-0738 | Me(R) | single bond | H | c-Pr | H | Cl | $CH_2CN$ | S |
| D-0739 | Me(S) | single bond | H | c-Pr | H | Cl | $CH_2CN$ | S |
| D-0740 | Me | single bond | Me | c-Pr | H | Cl | $CH_2CN$ | O |
| D-0741 | H | $CH_2$ | Me | c-Pr | H | Cl | $CH_2CN$ | O |
| D-0742 | Me | $CH_2$ | H | c-Pr | H | Cl | $CH_2CN$ | O |

TABLE 662

| Compound Number | Y | W | Z | $R^1$ | $R^2$ | $R^3$ | $R^{10}$ | A |
|---|---|---|---|---|---|---|---|---|
| D-0743 | Me | $CH_2$ | Me | c-Pr | H | Cl | $CH_2CN$ | O |
| D-0744 | H | CH(Me) | H | c-Pr | H | Cl | $CH_2CN$ | O |
| D-0745 | H | CH(Me) | Me | c-Pr | H | Cl | $CH_2CN$ | O |
| D-0746 | Me | CH(Me) | H | c-Pr | H | Cl | $CH_2CN$ | O |
| D-0747 | Me | CH(Me) | Me | c-Pr | H | Cl | $CH_2CN$ | O |
| D-0748 | H | $CH_2CH_2$ | Me | c-Pr | H | Cl | $CH_2CN$ | O |
| D-0749 | Me | $CH_2CH_2$ | H | c-Pr | H | Cl | $CH_2CN$ | O |
| D-0750 | Me | $CH_2CH_2$ | Me | c-Pr | H | Cl | $CH_2CN$ | O |
| D-0751 | H | single bond | Me | c-Pr | H | Me | $CH_2CN$ | O |
| D-0752 | Me | single bond | H | c-Pr | H | Me | $CH_2CN$ | O |
| D-0753 | Me(R) | single bond | H | c-Pr | H | Me | $CH_2CN$ | O |
| D-0754 | Me(S) | single bond | H | c-Pr | H | Me | $CH_2CN$ | O |
| D-0755 | Me | single bond | H | c-Pr | H | Me | $CH_2CN$ | S |
| D-0756 | Me(R) | single bond | H | c-Pr | H | Me | $CH_2CN$ | S |
| D-0757 | Me(S) | single bond | H | c-Pr | H | Me | $CH_2CN$ | S |
| D-0758 | Me | single bond | Me | c-Pr | H | Me | $CH_2CN$ | O |
| D-0759 | H | $CH_2$ | Me | c-Pr | H | Me | $CH_2CN$ | O |
| D-0760 | Me | $CH_2$ | H | c-Pr | H | Me | $CH_2CN$ | O |
| D-0761 | Me | $CH_2$ | Me | c-Pr | H | Me | $CH_2CN$ | O |
| D-0762 | H | CH(Me) | H | c-Pr | H | Me | $CH_2CN$ | O |
| D-0763 | H | CH(Me) | Me | c-Pr | H | Me | $CH_2CN$ | O |
| D-0764 | Me | CH(Me) | H | c-Pr | H | Me | $CH_2CN$ | O |
| D-0765 | Me | CH(Me) | Me | c-Pr | H | Me | $CH_2CN$ | O |
| D-0766 | H | $CH_2CH_2$ | Me | c-Pr | H | Me | $CH_2CN$ | O |
| D-0767 | Me | $CH_2CH_2$ | H | c-Pr | H | Me | $CH_2CN$ | O |
| D-0768 | Me | $CH_2CH_2$ | Me | c-Pr | H | Me | $CH_2CN$ | O |
| D-0769 | H | single bond | Me | c-Pr | H | Cl | $CH_2CN$ | O |
| D-0770 | Me | single bond | H | c-Pr | H | Cl | $CH_2CN$ | O |
| D-0771 | Me(R) | single bond | H | c-Pr | H | Cl | $CH_2CN$ | O |
| D-0772 | Me(S) | single bond | H | c-Pr | H | Cl | $CH_2CN$ | O |
| D-0773 | Me | single bond | H | c-Pr | H | Cl | $CH_2CN$ | S |
| D-0774 | Me(R) | single bond | H | c-Pr | H | Cl | $CH_2CN$ | S |
| D-0775 | Me(S) | single bond | H | c-Pr | H | Cl | $CH_2CN$ | S |
| D-0776 | Me | single bond | Me | c-Pr | H | Cl | $CH_2CN$ | O |
| D-0777 | H | $CH_2$ | Me | c-Pr | H | Cl | $CH_2CN$ | O |
| D-0778 | Me | $CH_2$ | H | c-Pr | H | Cl | $CH_2CN$ | O |
| D-0779 | Me | $CH_2$ | Me | c-Pr | H | Cl | $CH_2CN$ | O |
| D-0780 | H | CH(Me) | H | c-Pr | H | Cl | $CH_2CN$ | O |
| D-0781 | H | CH(Me) | Me | c-Pr | H | Cl | $CH_2CN$ | O |
| D-0782 | Me | CH(Me) | H | c-Pr | H | Cl | $CH_2CN$ | O |
| D-0783 | Me | CH(Me) | Me | c-Pr | H | Cl | $CH_2CN$ | O |
| D-0784 | H | $CH_2CH_2$ | Me | c-Pr | H | Cl | $CH_2CN$ | O |
| D-0785 | Me | $CH_2CH_2$ | H | c-Pr | H | Cl | $CH_2CN$ | O |
| D-0786 | Me | $CH_2CH_2$ | Me | c-Pr | H | Cl | $CH_2CN$ | O |

TABLE 663

| Compound Number | Y | W | Z | $R^1$ | $R^2$ | $R^3$ | $R^{10}$ | A |
|---|---|---|---|---|---|---|---|---|
| D-0787 | H | single bond | Me | c-Pr | H | Me | $CH_2CN$ | O |
| D-0788 | Me | single bond | H | c-Pr | H | Me | $CH_2CN$ | O |
| D-0789 | Me(R) | single bond | H | c-Pr | H | Me | $CH_2CN$ | O |
| D-0790 | Me(S) | single bond | H | c-Pr | H | Me | $CH_2CN$ | O |
| D-0791 | Me | single bond | H | c-Pr | H | Me | $CH_2CN$ | S |
| D-0792 | Me(R) | single bond | H | c-Pr | H | Me | $CH_2CN$ | S |
| D-0793 | Me(S) | single bond | H | c-Pr | H | Me | $CH_2CN$ | S |
| D-0794 | Me | single bond | Me | c-Pr | H | Me | $CH_2CN$ | O |
| D-0795 | H | $CH_2$ | Me | c-Pr | H | Me | $CH_2CN$ | O |
| D-0796 | Me | $CH_2$ | H | c-Pr | H | Me | $CH_2CN$ | O |
| D-0797 | Me | $CH_2$ | Me | c-Pr | H | Me | $CH_2CN$ | O |
| D-0798 | H | CH(Me) | H | c-Pr | H | Me | $CH_2CN$ | O |
| D-0799 | H | CH(Me) | Me | c-Pr | H | Me | $CH_2CN$ | O |
| D-0800 | Me | CH(Me) | H | c-Pr | H | Me | $CH_2CN$ | O |
| D-0801 | Me | CH(Me) | Me | c-Pr | H | Me | $CH_2CN$ | O |
| D-0802 | H | $CH_2CH_2$ | Me | c-Pr | H | Me | $CH_2CN$ | O |
| D-0803 | Me | $CH_2CH_2$ | H | c-Pr | H | Me | $CH_2CN$ | O |
| D-0804 | Me | $CH_2CH_2$ | Me | c-Pr | H | Me | $CH_2CN$ | O |
| D-0805 | H | single bond | Me | c-Pr | H | Cl | C(=O)Me | O |
| D-0806 | Me | single bond | H | c-Pr | H | Cl | C(=O)Me | O |
| D-0807 | Me(R) | single bond | H | c-Pr | H | Cl | C(=O)Me | O |
| D-0808 | Me(S) | single bond | H | c-Pr | H | Cl | C(=O)Me | O |
| D-0809 | Me | single bond | H | c-Pr | H | Cl | C(=O)Me | S |
| D-0810 | Me(R) | single bond | H | c-Pr | H | Cl | C(=O)Me | S |

TABLE 663-continued

| Compound Number | Y | W | Z | $R^1$ | $R^2$ | $R^3$ | $R^{10}$ | A |
|---|---|---|---|---|---|---|---|---|
| D-0811 | Me(S) | single bond | H | c-Pr | H | Cl | C(=O)Me | S |
| D-0812 | Me | single bond | Me | c-Pr | H | Cl | C(=O)Me | O |
| D-0813 | H | $CH_2$ | Me | c-Pr | H | Cl | C(=O)Me | O |
| D-0814 | Me | $CH_2$ | H | c-Pr | H | Cl | C(=O)Me | O |
| D-0815 | Me | $CH_2$ | Me | c-Pr | H | Cl | C(=O)Me | O |
| D-0816 | H | CH(Me) | H | c-Pr | H | Cl | C(=O)Me | O |
| D-0817 | H | CH(Me) | Me | c-Pr | H | Cl | C(=O)Me | O |
| D-0818 | Me | CH(Me) | H | c-Pr | H | Cl | C(=O)Me | O |
| D-0819 | Me | CH(Me) | Me | c-Pr | H | Cl | C(=O)Me | O |
| D-0820 | H | $CH_2CH_2$ | Me | c-Pr | H | Cl | C(=O)Me | O |
| D-0821 | Me | $CH_2CH_2$ | H | c-Pr | H | Cl | C(=O)Me | O |
| D-0822 | Me | $CH_2CH_2$ | Me | c-Pr | H | Cl | C(=O)Me | O |
| D-0823 | H | single bond | Me | c-Pr | H | Me | C(=O)Me | O |
| D-0824 | Me | single bond | H | c-Pr | H | Me | C(=O)Me | O |
| D-0825 | Me(R) | single bond | H | c-Pr | H | Me | C(=O)Me | O |
| D-0826 | Me(S) | single bond | H | c-Pr | H | Me | C(=O)Me | O |
| D-0827 | Me | single bond | H | c-Pr | H | Me | C(=O)Me | S |
| D-0828 | Me(R) | single bond | H | c-Pr | H | Me | C(=O)Me | S |
| D-0829 | Me(S) | single bond | H | c-Pr | H | Me | C(=O)Me | S |
| D-0830 | Me | single bond | Me | c-Pr | H | Me | C(=O)Me | O |

TABLE 664

| Compound Number | Y | W | Z | $R^1$ | $R^2$ | $R^3$ | $R^{10}$ | A |
|---|---|---|---|---|---|---|---|---|
| D-0831 | H | $CH_2$ | Me | c-Pr | H | Me | C(=O)Me | O |
| D-0832 | Me | $CH_2$ | H | c-Pr | H | Me | C(=O)Me | O |
| D-0833 | Me | $CH_2$ | Me | c-Pr | H | Me | C(=O)Me | O |
| D-0834 | H | CH(Me) | H | c-Pr | H | Me | C(=O)Me | O |
| D-0835 | H | CH(Me) | Me | c-Pr | H | Me | C(=O)Me | O |
| D-0836 | Me | CH(Me) | H | c-Pr | H | Me | C(=O)Me | O |
| D-0837 | Me | CH(Me) | Me | c-Pr | H | Me | C(=O)Me | O |
| D-0838 | H | $CH_2CH_2$ | Me | c-Pr | H | Me | C(=O)Me | O |
| D-0839 | Me | $CH_2CH_2$ | H | c-Pr | H | Me | C(=O)Me | O |
| D-0840 | Me | $CH_2CH_2$ | Me | c-Pr | H | Me | C(=O)Me | O |
| D-0841 | H | single bond | Me | c-Pr | H | Cl | C(=O)Me | O |
| D-0842 | Me | single bond | H | c-Pr | H | Cl | C(=O)Me | O |
| D-0843 | Me(R) | single bond | H | c-Pr | H | Cl | C(=O)Me | O |
| D-0844 | Me(S) | single bond | H | c-Pr | H | Cl | C(=O)Me | O |
| D-0845 | Me | single bond | H | c-Pr | H | Cl | C(=O)Me | S |
| D-0846 | Me(R) | single bond | H | c-Pr | H | Cl | C(=O)Me | S |
| D-0847 | Me(S) | single bond | H | c-Pr | H | Cl | C(=O)Me | S |
| D-0848 | Me | single bond | Me | c-Pr | H | Cl | C(=O)Me | O |
| D-0849 | H | $CH_2$ | Me | c-Pr | H | Cl | C(=O)Me | O |
| D-0850 | Me | $CH_2$ | H | c-Pr | H | Cl | C(=O)Me | O |
| D-0851 | Me | $CH_2$ | Me | c-Pr | H | Cl | C(=O)Me | O |
| D-0852 | H | CH(Me) | H | c-Pr | H | Cl | C(=O)Me | O |
| D-0853 | H | CH(Me) | Me | c-Pr | H | Cl | C(=O)Me | O |
| D-0854 | Me | CH(Me) | H | c-Pr | H | Cl | C(=O)Me | O |
| D-0855 | Me | CH(Me) | Me | c-Pr | H | Cl | C(=O)Me | O |
| D-0856 | H | $CH_2CH_2$ | Me | c-Pr | H | Cl | C(=O)Me | O |
| D-0857 | Me | $CH_2CH_2$ | H | c-Pr | H | Cl | C(=O)Me | O |
| D-0858 | Me | $CH_2CH_2$ | Me | c-Pr | H | Cl | C(=O)Me | O |
| D-0859 | H | single bond | Me | c-Pr | H | Me | C(=O)Me | O |
| D-0860 | Me | single bond | H | c-Pr | H | Me | C(=O)Me | O |
| D-0861 | Me(R) | single bond | H | c-Pr | H | Me | C(=O)Me | O |
| D-0862 | Me(S) | single bond | H | c-Pr | H | Me | C(=O)Me | O |
| D-0863 | Me | single bond | H | c-Pr | H | Me | C(=O)Me | S |
| D-0864 | Me(R) | single bond | H | c-Pr | H | Me | C(=O)Me | S |
| D-0865 | Me(S) | single bond | H | c-Pr | H | Me | C(=O)Me | S |
| D-0866 | Me | single bond | Me | c-Pr | H | Me | C(=O)Me | O |
| D-0867 | H | $CH_2$ | Me | c-Pr | H | Me | C(=O)Me | O |
| D-0868 | Me | $CH_2$ | H | c-Pr | H | Me | C(=O)Me | O |
| D-0869 | Me | $CH_2$ | Me | c-Pr | H | Me | C(=O)Me | O |
| D-0870 | H | CH(Me) | H | c-Pr | H | Me | C(=O)Me | O |
| D-0871 | H | CH(Me) | Me | c-Pr | H | Me | C(=O)Me | O |
| D-0872 | Me | CH(Me) | H | c-Pr | H | Me | C(=O)Me | O |
| D-0873 | Me | CH(Me) | Me | c-Pr | H | Me | C(=O)Me | O |
| D-0874 | H | $CH_2CH_2$ | Me | c-Pr | H | Me | C(=O)Me | O |

TABLE 665

| Compound Number | Y | W | Z | $R^1$ | $R^2$ | $R^3$ | $R^{10}$ | A |
|---|---|---|---|---|---|---|---|---|
| D-0875 | Me | $CH_2CH_2$ | H | c-Pr | H | Me | C(=O)Me | O |
| D-0876 | Me | $CH_2CH_2$ | Me | c-Pr | H | Me | C(=O)Me | O |
| D-0877 | H | single bond | Me | c-Pr | H | Cl | C(=O)Me | O |
| D-0878 | Me | single bond | H | c-Pr | H | Cl | C(=O)Me | O |
| D-0879 | Me(R) | single bond | H | c-Pr | H | Cl | C(=O)Me | O |
| D-0880 | Me(S) | single bond | H | c-Pr | H | Cl | C(=O)Me | O |
| D-0881 | Me | single bond | H | c-Pr | H | Cl | C(=O)Me | S |
| D-0882 | Me(R) | single bond | H | c-Pr | H | Cl | C(=O)Me | S |
| D-0883 | Me(S) | single bond | H | c-Pr | H | Cl | C(=O)Me | S |
| D-0884 | Me | single bond | Me | c-Pr | H | Cl | C(=O)Me | O |
| D-0885 | H | $CH_2$ | Me | c-Pr | H | Cl | C(=O)Me | O |
| D-0886 | Me | $CH_2$ | H | c-Pr | H | Cl | C(=O)Me | O |
| D-0887 | Me | $CH_2$ | Me | c-Pr | H | Cl | C(=O)Me | O |
| D-0888 | H | CH(Me) | H | c-Pr | H | Cl | C(=O)Me | O |
| D-0889 | H | CH(Me) | Me | c-Pr | H | Cl | C(=O)Me | O |
| D-0890 | Me | CH(Me) | H | c-Pr | H | Cl | C(=O)Me | O |
| D-0891 | Me | CH(Me) | Me | c-Pr | H | Cl | C(=O)Me | O |
| D-0892 | H | $CH_2CH_2$ | Me | c-Pr | H | Cl | C(=O)Me | O |
| D-0893 | Me | $CH_2CH_2$ | H | c-Pr | H | Cl | C(=O)Me | O |
| D-0894 | Me | $CH_2CH_2$ | Me | c-Pr | H | Cl | C(=O)Me | O |
| D-0895 | H | single bond | Me | c-Pr | H | Me | C(=O)Me | O |
| D-0896 | Me | single bond | H | c-Pr | H | Me | C(=O)Me | O |
| D-0897 | Me(R) | single bond | H | c-Pr | H | Me | C(=O)Me | O |
| D-0898 | Me(S) | single bond | H | c-Pr | H | Me | C(=O)Me | O |
| D-0899 | Me | single bond | H | c-Pr | H | Me | C(=O)Me | S |
| D-0900 | Me(R) | single bond | H | c-Pr | H | Me | C(=O)Me | S |
| D-0901 | Me(S) | single bond | H | c-Pr | H | Me | C(=O)Me | S |
| D-0902 | Me | single bond | Me | c-Pr | H | Me | C(=O)Me | O |
| D-0903 | H | $CH_2$ | Me | c-Pr | H | Me | C(=O)Me | O |
| D-0904 | Me | $CH_2$ | H | c-Pr | H | Me | C(=O)Me | O |
| D-0905 | Me | $CH_2$ | Me | c-Pr | H | Me | C(=O)Me | O |
| D-0906 | H | CH(Me) | H | c-Pr | H | Me | C(=O)Me | O |
| D-0907 | H | CH(Me) | Me | c-Pr | H | Me | C(=O)Me | O |
| D-0908 | Me | CH(Me) | H | c-Pr | H | Me | C(=O)Me | O |
| D-0909 | Me | CH(Me) | Me | c-Pr | H | Me | C(=O)Me | O |
| D-0910 | H | $CH_2CH_2$ | Me | c-Pr | H | Me | C(=O)Me | O |
| D-0911 | Me | $CH_2CH_2$ | H | c-Pr | H | Me | C(=O)Me | O |
| D-0912 | Me | $CH_2CH_2$ | Me | c-Pr | H | Me | C(=O)Me | O |
| D-0913 | H | single bond | Me | c-Pr | H | Cl | C(=O)OEt | O |
| D-0914 | Me | single bond | H | c-Pr | H | Cl | C(=O)OEt | O |
| D-0915 | Me(R) | single bond | H | c-Pr | H | Cl | C(=O)OEt | O |
| D-0916 | Me(S) | single bond | H | c-Pr | H | Cl | C(=O)OEt | O |
| D-0917 | Me | single bond | H | c-Pr | H | Cl | C(=O)OEt | S |
| D-0918 | Me(R) | single bond | H | c-Pr | H | Cl | C(=O)OEt | S |

TABLE 666

| Compound Number | Y | W | Z | $R^1$ | $R^2$ | $R^3$ | $R^{10}$ | A |
|---|---|---|---|---|---|---|---|---|
| D-0919 | Me(S) | single bond | H | c-Pr | H | Cl | C(=O)OEt | S |
| D-0920 | Me | single bond | Me | c-Pr | H | Cl | C(=O)OEt | O |
| D-0921 | H | $CH_2$ | Me | c-Pr | H | Cl | C(=O)OEt | O |
| D-0922 | Me | $CH_2$ | H | c-Pr | H | Cl | C(=O)OEt | O |
| D-0923 | Me | $CH_2$ | Me | c-Pr | H | Cl | C(=O)OEt | O |
| D-0924 | H | CH(Me) | H | c-Pr | H | Cl | C(=O)OEt | O |
| D-0925 | H | CH(Me) | Me | c-Pr | H | Cl | C(=O)OEt | O |
| D-0926 | Me | CH(Me) | H | c-Pr | H | Cl | C(=O)OEt | O |
| D-0927 | Me | CH(Me) | Me | c-Pr | H | Cl | C(=O)OEt | O |
| D-0928 | H | $CH_2CH_2$ | Me | c-Pr | H | Cl | C(=O)OEt | O |
| D-0929 | Me | $CH_2CH_2$ | H | c-Pr | H | Cl | C(=O)OEt | O |
| D-0930 | Me | $CH_2CH_2$ | Me | c-Pr | H | Cl | C(=O)OEt | O |
| D-0931 | H | single bond | Me | c-Pr | H | Me | C(=O)OEt | O |
| D-0932 | Me | single bond | H | c-Pr | H | Me | C(=O)OEt | O |
| D-0933 | Me(R) | single bond | H | c-Pr | H | Me | C(=O)OEt | O |
| D-0934 | Me(S) | single bond | H | c-Pr | H | Me | C(=O)OEt | O |
| D-0935 | Me | single bond | H | c-Pr | H | Me | C(=O)OEt | S |
| D-0936 | Me(R) | single bond | H | c-Pr | H | Me | C(=O)OEt | S |
| D-0937 | Me(S) | single bond | H | c-Pr | H | Me | C(=O)OEt | S |
| D-0938 | Me | single bond | Me | c-Pr | H | Me | C(=O)OEt | O |
| D-0939 | H | $CH_2$ | Me | c-Pr | H | Me | C(=O)OEt | O |
| D-0940 | Me | $CH_2$ | H | c-Pr | H | Me | C(=O)OEt | O |
| D-0941 | Me | $CH_2$ | Me | c-Pr | H | Me | C(=O)OEt | O |
| D-0942 | H | CH(Me) | H | c-Pr | H | Me | C(=O)OEt | O |

TABLE 666-continued

| Compound Number | Y | W | Z | $R^1$ | $R^2$ | $R^3$ | $R^{10}$ | A |
|---|---|---|---|---|---|---|---|---|
| D-0943 | H | CH(Me) | Me | c-Pr | H | Me | C(=O)OEt | O |
| D-0944 | Me | CH(Me) | H | c-Pr | H | Me | C(=O)OEt | O |
| D-0945 | Me | CH(Me) | Me | c-Pr | H | Me | C(=O)OEt | O |
| D-0946 | H | $CH_2CH_2$ | Me | c-Pr | H | Me | C(=O)OEt | O |
| D-0947 | Me | $CH_2CH_2$ | H | c-Pr | H | Me | C(=O)OEt | O |
| D-0948 | Me | $CH_2CH_2$ | Me | c-Pr | H | Me | C(=O)OEt | O |
| D-0949 | H | single bond | Me | c-Pr | H | Cl | C(=O)OEt | O |
| D-0950 | Me | single bond | H | c-Pr | H | Cl | C(=O)OEt | O |
| D-0951 | Me(R) | single bond | H | c-Pr | H | Cl | C(=O)OEt | O |
| D-0952 | Me(S) | single bond | H | c-Pr | H | Cl | C(=O)OEt | O |
| D-0953 | Me | single bond | H | c-Pr | H | Cl | C(=O)OEt | S |
| D-0954 | Me(R) | single bond | H | c-Pr | H | Cl | C(=O)OEt | S |
| D-0955 | Me(S) | single bond | H | c-Pr | H | Cl | C(=O)OEt | S |
| D-0956 | Me | single bond | Me | c-Pr | H | Cl | C(=O)OEt | O |
| D-0957 | H | $CH_2$ | Me | c-Pr | H | Cl | C(=O)OEt | O |
| D-0958 | Me | $CH_2$ | H | c-Pr | H | Cl | C(=O)OEt | O |
| D-0959 | Me | $CH_2$ | Me | c-Pr | H | Cl | C(=O)OEt | O |
| D-0960 | H | CH(Me) | H | c-Pr | H | Cl | C(=O)OEt | O |
| D-0961 | H | CH(Me) | Me | c-Pr | H | Cl | C(=O)OEt | O |
| D-0962 | Me | CH(Me) | H | c-Pr | H | Cl | C(=O)OEt | O |

TABLE 667

| Compound Number | Y | W | Z | $R^1$ | $R^2$ | $R^3$ | $R^{10}$ | A |
|---|---|---|---|---|---|---|---|---|
| D-0963 | Me | CH(Me) | Me | c-Pr | H | Cl | C(=O)OEt | O |
| D-0964 | H | $CH_2CH_2$ | Me | c-Pr | H | Cl | C(=O)OEt | O |
| D-0965 | Me | $CH_2CH_2$ | H | c-Pr | H | Cl | C(=O)OEt | O |
| D-0966 | Me | $CH_2CH_2$ | Me | c-Pr | H | Cl | C(=O)OEt | O |
| D-0967 | H | single bond | Me | c-Pr | H | Me | C(=O)OEt | O |
| D-0968 | Me | single bond | H | c-Pr | H | Me | C(=O)OEt | O |
| D-0969 | Me(R) | single bond | H | c-Pr | H | Me | C(=O)OEt | O |
| D-0970 | Me(S) | single bond | H | c-Pr | H | Me | C(=O)OEt | O |
| D-0971 | Me | single bond | H | c-Pr | H | Me | C(=O)OEt | S |
| D-0972 | Me(R) | single bond | H | c-Pr | H | Me | C(=O)OEt | S |
| D-0973 | Me(S) | single bond | H | c-Pr | H | Me | C(=O)OEt | S |
| D-0974 | Me | single bond | Me | c-Pr | H | Me | C(=O)OEt | O |
| D-0975 | H | $CH_2$ | Me | c-Pr | H | Me | C(=O)OEt | O |
| D-0976 | Me | $CH_2$ | H | c-Pr | H | Me | C(=O)OEt | O |
| D-0977 | Me | $CH_2$ | Me | c-Pr | H | Me | C(=O)OEt | O |
| D-0978 | H | CH(Me) | H | c-Pr | H | Me | C(=O)OEt | O |
| D-0979 | H | CH(Me) | Me | c-Pr | H | Me | C(=O)OEt | O |
| D-0980 | Me | CH(Me) | H | c-Pr | H | Me | C(=O)OEt | O |
| D-0981 | Me | CH(Me) | Me | c-Pr | H | Me | C(=O)OEt | O |
| D-0982 | H | $CH_2CH_2$ | Me | c-Pr | H | Me | C(=O)OEt | O |
| D-0983 | Me | $CH_2CH_2$ | H | c-Pr | H | Me | C(=O)OEt | O |
| D-0984 | Me | $CH_2CH_2$ | Me | c-Pr | H | Me | C(=O)OEt | O |
| D-0985 | H | single bond | Me | c-Pr | H | Cl | C(=O)OEt | O |
| D-0986 | Me | single bond | H | c-Pr | H | Cl | C(=O)OEt | O |
| D-0987 | Me(R) | single bond | H | c-Pr | H | Cl | C(=O)OEt | O |
| D-0988 | Me(S) | single bond | H | c-Pr | H | Cl | C(=O)OEt | O |
| D-0989 | Me | single bond | H | c-Pr | H | Cl | C(=O)OEt | S |
| D-0990 | Me(R) | single bond | H | c-Pr | H | Cl | C(=O)OEt | S |
| D-0991 | Me(S) | single bond | H | c-Pr | H | Cl | C(=O)OEt | S |
| D-0992 | Me | single bond | Me | c-Pr | H | Cl | C(=O)OEt | O |
| D-0993 | H | $CH_2$ | Me | c-Pr | H | Cl | C(=O)OEt | O |
| D-0994 | Me | $CH_2$ | H | c-Pr | H | Cl | C(=O)OEt | O |
| D-0995 | Me | $CH_2$ | Me | c-Pr | H | Cl | C(=O)OEt | O |
| D-0996 | H | CH(Me) | H | c-Pr | H | Cl | C(=O)OEt | O |
| D-0997 | H | CH(Me) | Me | c-Pr | H | Cl | C(=O)OEt | O |
| D-0998 | Me | CH(Me) | H | c-Pr | H | Cl | C(=O)OEt | O |
| D-0999 | Me | CH(Me) | Me | c-Pr | H | Cl | C(=O)OEt | O |
| D-1000 | H | $CH_2CH_2$ | Me | c-Pr | H | Cl | C(=O)OEt | O |
| D-1001 | Me | $CH_2CH_2$ | H | c-Pr | H | Cl | C(=O)OEt | O |
| D-1002 | Me | $CH_2CH_2$ | Me | c-Pr | H | Cl | C(=O)OEt | O |
| D-1003 | H | single bond | Me | c-Pr | H | Me | C(=O)OEt | O |
| D-1004 | Me | single bond | H | c-Pr | H | Me | C(=O)OEt | O |
| D-1005 | Me(R) | single bond | H | c-Pr | H | Me | C(=O)OEt | O |
| D-1006 | Me(S) | single bond | H | c-Pr | H | Me | C(=O)OEt | O |

TABLE 668

| Compound Number | Y | W | Z | $R^1$ | $R^2$ | $R^3$ | $R^{10}$ | A |
|---|---|---|---|---|---|---|---|---|
| D-1007 | Me | single bond | H | c-Pr | H | Me | C(=O)OEt | S |
| D-1008 | Me(R) | single bond | H | c-Pr | H | Me | C(=O)OEt | S |
| D-1009 | Me(S) | single bond | H | c-Pr | H | Me | C(=O)OEt | S |
| D-1010 | Me | single bond | Me | c-Pr | H | Me | C(=O)OEt | O |
| D-1011 | H | $CH_2$ | Me | c-Pr | H | Me | C(=O)OEt | O |
| D-1012 | Me | $CH_2$ | H | c-Pr | H | Me | C(=O)OEt | O |
| D-1013 | Me | $CH_2$ | Me | c-Pr | H | Me | C(=O)OEt | O |
| D-1014 | H | CH(Me) | H | c-Pr | H | Me | C(=O)OEt | O |
| D-1015 | H | CH(Me) | Me | c-Pr | H | Me | C(=O)OEt | O |
| D-1016 | Me | CH(Me) | H | c-Pr | H | Me | C(=O)OEt | O |
| D-1017 | Me | CH(Me) | Me | c-Pr | H | Me | C(=O)OEt | O |
| D-1018 | H | $CH_2CH_2$ | Me | c-Pr | H | Me | C(=O)OEt | O |
| D-1019 | Me | $CH_2CH_2$ | H | c-Pr | H | Me | C(=O)OEt | O |
| D-1020 | Me | $CH_2CH_2$ | Me | c-Pr | H | Me | C(=O)OEt | O |
| D-1021 | H | single bond | Me | c-Pr | Me | Cl | Me | O |
| D-1022 | H | single bond | Et | c-Pr | Me | Cl | Me | O |
| D-1023 | Me | single bond | H | c-Pr | Me | Cl | Me | O |
| D-1024 | Me(R) | single bond | H | c-Pr | Me | Cl | Me | O |
| D-1025 | Me(S) | single bond | H | c-Pr | Me | Cl | Me | O |
| D-1026 | H | $CH_2$ | Me | c-Pr | Me | Cl | Me | O |
| D-1027 | Me | $CH_2$ | H | c-Pr | Me | Cl | Me | O |
| D-1028 | H | CH(Me) | H | c-Pr | Me | Cl | Me | O |
| D-1029 | H | $CH_2CH_2$ | Me | c-Pr | Me | Cl | Me | O |
| D-1030 | Me | $CH_2CH_2$ | H | c-Pr | Me | Cl | Me | O |
| D-1031 | H | single bond | Me | c-Pr | Me | Me | Me | O |
| D-1032 | Me | single bond | H | c-Pr | Me | Me | Me | O |
| D-1033 | Me(R) | single bond | H | c-Pr | Me | Me | Me | O |
| D-1034 | Me(S) | single bond | H | c-Pr | Me | Me | Me | O |
| D-1035 | H | $CH_2$ | Me | c-Pr | Me | Me | Me | O |
| D-1036 | Me | $CH_2$ | H | c-Pr | Me | Me | Me | O |
| D-1037 | H | CH(Me) | H | c-Pr | Me | Me | Me | O |
| D-1038 | H | $CH_2CH_2$ | Me | c-Pr | Me | Me | Me | O |
| D-1039 | Me | $CH_2CH_2$ | H | c-Pr | Me | Me | Me | O |
| D-1040 | H | single bond | Me | c-Pr | Me | Cl | Et | O |
| D-1041 | Me | single bond | H | c-Pr | Me | Cl | Et | O |
| D-1042 | Me(R) | single bond | H | c-Pr | Me | Cl | Et | O |
| D-1043 | Me(S) | single bond | H | c-Pr | Me | Cl | Et | O |
| D-1044 | H | $CH_2$ | Me | c-Pr | Me | Cl | Et | O |
| D-1045 | Me | $CH_2$ | H | c-Pr | Me | Cl | Et | O |
| D-1046 | H | CH(Me) | H | c-Pr | Me | Cl | Et | O |
| D-1047 | H | $CH_2CH_2$ | Me | c-Pr | Me | Cl | Et | O |
| D-1048 | Me | $CH_2CH_2$ | H | c-Pr | Me | Cl | Et | O |
| D-1049 | H | single bond | Me | c-Pr | Me | Me | Et | O |
| D-1050 | Me | single bond | H | c-Pr | Me | Me | Et | O |

TABLE 669

| Compound Number | Y | W | Z | $R^1$ | $R^2$ | $R^3$ | $R^{10}$ | A |
|---|---|---|---|---|---|---|---|---|
| D-1051 | Me(R) | single bond | H | c-Pr | Me | Me | Et | O |
| D-1052 | Me(S) | single bond | H | c-Pr | Me | Me | Et | O |
| D-1053 | H | $CH_2$ | Me | c-Pr | Me | Me | Et | O |
| D-1054 | Me | $CH_2$ | H | c-Pr | Me | Me | Et | O |
| D-1055 | H | CH(Me) | H | c-Pr | Me | Me | Et | O |
| D-1056 | H | $CH_2CH_2$ | Me | c-Pr | Me | Me | Et | O |
| D-1057 | Me | $CH_2CH_2$ | H | c-Pr | Me | Me | Et | O |
| D-1058 | H | single bond | Me | c-Pr | Me | Cl | $CH_2CF_3$ | O |
| D-1059 | Me | single bond | H | c-Pr | Me | Cl | $CH_2CF_3$ | O |
| D-1060 | Me(R) | single bond | H | c-Pr | Me | Cl | $CH_2CF_3$ | O |
| D-1061 | Me(S) | single bond | H | c-Pr | Me | Cl | $CH_2CF_3$ | O |
| D-1062 | H | $CH_2$ | Me | c-Pr | Me | Cl | $CH_2CF_3$ | O |
| D-1063 | Me | $CH_2$ | H | c-Pr | Me | Cl | $CH_2CF_3$ | O |
| D-1064 | H | CH(Me) | H | c-Pr | Me | Cl | $CH_2CF_3$ | O |
| D-1065 | H | $CH_2CH_2$ | Me | c-Pr | Me | Cl | $CH_2CF_3$ | O |
| D-1066 | Me | $CH_2CH_2$ | H | c-Pr | Me | Cl | $CH_2CF_3$ | O |
| D-1067 | H | single bond | Me | c-Pr | Me | Me | $CH_2CF_3$ | O |
| D-1068 | Me | single bond | H | c-Pr | Me | Me | $CH_2CF_3$ | O |
| D-1069 | Me(R) | single bond | H | c-Pr | Me | Me | $CH_2CF_3$ | O |
| D-1070 | Me(S) | single bond | H | c-Pr | Me | Me | $CH_2CF_3$ | O |
| D-1071 | H | $CH_2$ | Me | c-Pr | Me | Me | $CH_2CF_3$ | O |
| D-1072 | Me | $CH_2$ | H | c-Pr | Me | Me | $CH_2CF_3$ | O |
| D-1073 | H | CH(Me) | H | c-Pr | Me | Me | $CH_2CF_3$ | O |
| D-1074 | H | $CH_2CH_2$ | Me | c-Pr | Me | Me | $CH_2CF_3$ | O |

TABLE 669-continued

| Compound Number | Y | W | Z | $R^1$ | $R^2$ | $R^3$ | $R^{10}$ | A |
|---|---|---|---|---|---|---|---|---|
| D-1075 | Me | $CH_2CH_2$ | H | c-Pr | Me | Me | $CH_2CF_3$ | O |
| D-1076 | H | single bond | Me | c-Pr | Me | Cl | $CH_2OMe$ | O |
| D-1077 | Me | single bond | H | c-Pr | Me | Cl | $CH_2OMe$ | O |
| D-1078 | Me(R) | single bond | H | c-Pr | Me | Cl | $CH_2OMe$ | O |
| D-1079 | Me(S) | single bond | H | c-Pr | Me | Cl | $CH_2OMe$ | O |
| D-1080 | H | $CH_2$ | Me | c-Pr | Me | Cl | $CH_2OMe$ | O |
| D-1081 | Me | $CH_2$ | H | c-Pr | Me | Cl | $CH_2OMe$ | O |
| D-1082 | H | CH(Me) | H | c-Pr | Me | Cl | $CH_2OMe$ | O |
| D-1083 | H | $CH_2CH_2$ | Me | c-Pr | Me | Cl | $CH_2OMe$ | O |
| D-1084 | Me | $CH_2CH_2$ | H | c-Pr | Me | Cl | $CH_2OMe$ | O |
| D-1085 | H | single bond | Me | c-Pr | Me | Me | $CH_2OMe$ | O |
| D-1086 | Me | single bond | H | c-Pr | Me | Me | $CH_2OMe$ | O |
| D-1087 | Me(R) | single bond | H | c-Pr | Me | Me | $CH_2OMe$ | O |
| D-1088 | Me(S) | single bond | H | c-Pr | Me | Me | $CH_2OMe$ | O |
| D-1089 | H | $CH_2$ | Me | c-Pr | Me | Me | $CH_2OMe$ | O |
| D-1090 | Me | $CH_2$ | H | c-Pr | Me | Me | $CH_2OMe$ | O |
| D-1091 | H | CH(Me) | H | c-Pr | Me | Me | $CH_2OMe$ | O |
| D-1092 | H | $CH_2CH_2$ | Me | c-Pr | Me | Me | $CH_2OMe$ | O |
| D-1093 | Me | $CH_2CH_2$ | H | c-Pr | Me | Me | $CH_2OMe$ | O |
| D-1094 | H | single bond | Me | c-Pr | Me | Cl | $CH_2CN$ | O |

TABLE 670

| Compound Number | Y | W | Z | $R^1$ | $R^2$ | $R^3$ | $R^{10}$ | A |
|---|---|---|---|---|---|---|---|---|
| D-1095 | Me | single bond | H | c-Pr | Me | Cl | $CH_2CN$ | O |
| D-1096 | Me(R) | single bond | H | c-Pr | Me | Cl | $CH_2CN$ | O |
| D-1097 | Me(S) | single bond | H | c-Pr | Me | Cl | $CH_2CN$ | O |
| D-1098 | H | $CH_2$ | Me | c-Pr | Me | Cl | $CH_2CN$ | O |
| D-1099 | Me | $CH_2$ | H | c-Pr | Me | Cl | $CH_2CN$ | O |
| D-1100 | H | CH(Me) | H | c-Pr | Me | Cl | $CH_2CN$ | O |
| D-1101 | H | $CH_2CH_2$ | Me | c-Pr | Me | Cl | $CH_2CN$ | O |
| D-1102 | Me | $CH_2CH_2$ | H | c-Pr | Me | Cl | $CH_2CN$ | O |
| D-1103 | H | single bond | Me | c-Pr | Me | Me | $CH_2CN$ | O |
| D-1104 | Me | single bond | H | c-Pr | Me | Me | $CH_2CN$ | O |
| D-1105 | Me(R) | single bond | H | c-Pr | Me | Me | $CH_2CN$ | O |
| D-1106 | Me(S) | single bond | H | c-Pr | Me | Me | $CH_2CN$ | O |
| D-1107 | H | $CH_2$ | Me | c-Pr | Me | Me | $CH_2CN$ | O |
| D-1108 | Me | $CH_2$ | H | c-Pr | Me | Me | $CH_2CN$ | O |
| D-1109 | H | CH(Me) | H | c-Pr | Me | Me | $CH_2CN$ | O |
| D-1110 | H | $CH_2CH_2$ | Me | c-Pr | Me | Me | $CH_2CN$ | O |
| D-1111 | Me | $CH_2CH_2$ | H | c-Pr | Me | Me | $CH_2CN$ | O |
| D-1112 | H | single bond | Me | c-Pr | Me | Cl | C(=O)Me | O |
| D-1113 | Me | single bond | H | c-Pr | Me | Cl | C(=O)Me | O |
| D-1114 | Me(R) | single bond | H | c-Pr | Me | Cl | C(=O)Me | O |
| D-1115 | Me(S) | single bond | H | c-Pr | Me | Cl | C(=O)Me | O |
| D-1116 | H | $CH_2$ | Me | c-Pr | Me | Cl | C(=O)Me | O |
| D-1117 | Me | $CH_2$ | H | c-Pr | Me | Cl | C(=O)Me | O |
| D-1118 | H | CH(Me) | H | c-Pr | Me | Cl | C(=O)Me | O |
| D-1119 | H | $CH_2CH_2$ | Me | c-Pr | Me | Cl | C(=O)Me | O |
| D-1120 | Me | $CH_2CH_2$ | H | c-Pr | Me | Cl | C(=O)Me | O |
| D-1121 | H | single bond | Me | c-Pr | Me | Me | C(=O)Me | O |
| D-1122 | Me | single bond | H | c-Pr | Me | Me | C(=O)Me | O |
| D-1123 | Me(R) | single bond | H | c-Pr | Me | Me | C(=O)Me | O |
| D-1124 | Me(S) | single bond | H | c-Pr | Me | Me | C(=O)Me | O |
| D-1125 | H | $CH_2$ | Me | c-Pr | Me | Me | C(=O)Me | O |
| D-1126 | Me | $CH_2$ | H | c-Pr | Me | Me | C(=O)Me | O |
| D-1127 | H | CH(Me) | H | c-Pr | Me | Me | C(=O)Me | O |
| D-1128 | H | $CH_2CH_2$ | Me | c-Pr | Me | Me | C(=O)Me | O |
| D-1129 | Me | $CH_2CH_2$ | H | c-Pr | Me | Me | C(=O)Me | O |
| D-1130 | H | single bond | Me | c-Pr | $CH_2OMe$ | Cl | Me | O |
| D-1131 | H | single bond | Et | c-Pr | $CH_2OMe$ | Cl | Me | O |
| D-1132 | Me | single bond | H | c-Pr | $CH_2OMe$ | Cl | Me | O |
| D-1133 | Me(R) | single bond | H | c-Pr | $CH_2OMe$ | Cl | Me | O |
| D-1134 | Me(S) | single bond | H | c-Pr | $CH_2OMe$ | Cl | Me | O |
| D-1135 | H | $CH_2$ | Me | c-Pr | $CH_2OMe$ | Cl | Me | O |
| D-1136 | Me | $CH_2$ | H | c-Pr | $CH_2OMe$ | Cl | Me | O |
| D-1137 | H | CH(Me) | H | c-Pr | $CH_2OMe$ | Cl | Me | O |
| D-1138 | H | $CH_2CH_2$ | Me | c-Pr | $CH_2OMe$ | Cl | Me | O |

TABLE 671

| Compound Number | Y | W | Z | $R^1$ | $R^2$ | $R^3$ | $R^{10}$ | A |
|---|---|---|---|---|---|---|---|---|
| D-1139 | Me | $CH_2CH_2$ | H | c-Pr | $CH_2OMe$ | Cl | Me | O |
| D-1140 | H | single bond | Me | c-Pr | $CH_2OMe$ | Me | Me | O |
| D-1141 | Me | single bond | H | c-Pr | $CH_2OMe$ | Me | Me | O |
| D-1142 | Me(R) | single bond | H | c-Pr | $CH_2OMe$ | Me | Me | O |

TABLE 671-continued

| Compound Number | Y | W | Z | $R^1$ | $R^2$ | $R^3$ | $R^{10}$ | A |
|---|---|---|---|---|---|---|---|---|
| D-1143 | Me(S) | single bond | H | c-Pr | $CH_2OMe$ | Me | Me | O |
| D-1144 | H | $CH_2$ | Me | c-Pr | $CH_2OMe$ | Me | Me | O |
| D-1145 | Me | $CH_2$ | H | c-Pr | $CH_2OMe$ | Me | Me | O |
| D-1146 | H | CH(Me) | H | c-Pr | $CH_2OMe$ | Me | Me | O |
| D-1147 | H | $CH_2CH_2$ | Me | c-Pr | $CH_2OMe$ | Me | Me | O |
| D-1148 | Me | $CH_2CH_2$ | H | c-Pr | $CH_2OMe$ | Me | Me | O |
| D-1149 | H | single bond | Me | c-Pr | $CH_2OMe$ | Cl | Et | O |
| D-1150 | Me | single bond | H | c-Pr | $CH_2OMe$ | Cl | Et | O |
| D-1151 | Me(R) | single bond | H | c-Pr | $CH_2OMe$ | Cl | Et | O |
| D-1152 | Me(S) | single bond | H | c-Pr | $CH_2OMe$ | Cl | Et | O |
| D-1153 | H | $CH_2$ | Me | c-Pr | $CH_2OMe$ | Cl | Et | O |
| D-1154 | Me | $CH_2$ | H | c-Pr | $CH_2OMe$ | Cl | Et | O |
| D-1155 | H | CH(Me) | H | c-Pr | $CH_2OMe$ | Cl | Et | O |
| D-1156 | H | $CH_2CH_2$ | Me | c-Pr | $CH_2OMe$ | Cl | Et | O |
| D-1157 | Me | $CH_2CH_2$ | H | c-Pr | $CH_2OMe$ | Cl | Et | O |
| D-1158 | H | single bond | Me | c-Pr | $CH_2OMe$ | Me | Et | O |
| D-1159 | Me | single bond | H | c-Pr | $CH_2OMe$ | Me | Et | O |
| D-1160 | Me(R) | single bond | H | c-Pr | $CH_2OMe$ | Me | Et | O |
| D-1161 | Me(S) | single bond | H | c-Pr | $CH_2OMe$ | Me | Et | O |
| D-1162 | H | $CH_2$ | Me | c-Pr | $CH_2OMe$ | Me | Et | O |
| D-1163 | Me | $CH_2$ | H | c-Pr | $CH_2OMe$ | Me | Et | O |
| D-1164 | H | CH(Me) | H | c-Pr | $CH_2OMe$ | Me | Et | O |
| D-1165 | H | $CH_2CH_2$ | Me | c-Pr | $CH_2OMe$ | Me | Et | O |
| D-1166 | Me | $CH_2CH_2$ | H | c-Pr | $CH_2OMe$ | Me | Et | O |
| D-1167 | H | single bond | Me | c-Pr | $CH_2OMe$ | Cl | $CH_2CF_3$ | O |
| D-1168 | Me | single bond | H | c-Pr | $CH_2OMe$ | Cl | $CH_2CF_3$ | O |
| D-1169 | Me(R) | single bond | H | c-Pr | $CH_2OMe$ | Cl | $CH_2CF_3$ | O |
| D-1170 | Me(S) | single bond | H | c-Pr | $CH_2OMe$ | Cl | $CH_2CF_3$ | O |
| D-1171 | H | $CH_2$ | Me | c-Pr | $CH_2OMe$ | Cl | $CH_2CF_3$ | O |
| D-1172 | Me | $CH_2$ | H | c-Pr | $CH_2OMe$ | Cl | $CH_2CF_3$ | O |
| D-1173 | H | CH(Me) | H | c-Pr | $CH_2OMe$ | Cl | $CH_2CF_3$ | O |
| D-1174 | H | $CH_2CH_2$ | Me | c-Pr | $CH_2OMe$ | Cl | $CH_2CF_3$ | O |
| D-1175 | Me | $CH_2CH_2$ | H | c-Pr | $CH_2OMe$ | Cl | $CH_2CF_3$ | O |
| D-1176 | H | single bond | Me | c-Pr | $CH_2OMe$ | Me | $CH_2CF_3$ | O |
| D-1177 | Me | single bond | H | c-Pr | $CH_2OMe$ | Me | $CH_2CF_3$ | O |
| D-1178 | Me(R) | single bond | H | c-Pr | $CH_2OMe$ | Me | $CH_2CF_3$ | O |
| D-1179 | Me(S) | single bond | H | c-Pr | $CH_2OMe$ | Me | $CH_2CF_3$ | O |
| D-1180 | H | $CH_2$ | Me | c-Pr | $CH_2OMe$ | Me | $CH_2CF_3$ | O |
| D-1181 | Me | $CH_2$ | H | c-Pr | $CH_2OMe$ | Me | $CH_2CF_3$ | O |
| D-1182 | H | CH(Me) | H | c-Pr | $CH_2OMe$ | Me | $CH_2CF_3$ | O |

TABLE 672

| Compound Number | Y | W | Z | $R^1$ | $R^2$ | $R^3$ | $R^{10}$ | A |
|---|---|---|---|---|---|---|---|---|
| D-1183 | H | $CH_2CH_2$ | Me | c-Pr | $CH_2OMe$ | Me | $CH_2CF_3$ | O |
| D-1184 | Me | $CH_2CH_2$ | H | c-Pr | $CH_2OMe$ | Me | $CH_2CF_3$ | O |
| D-1185 | H | single bond | Me | c-Pr | $CH_2OMe$ | Cl | $CH_2OMe$ | O |
| D-1186 | Me | single bond | H | c-Pr | $CH_2OMe$ | Cl | $CH_2OMe$ | O |
| D-1187 | Me(R) | single bond | H | c-Pr | $CH_2OMe$ | Cl | $CH_2OMe$ | O |
| D-1188 | Me(S) | single bond | H | c-Pr | $CH_2OMe$ | Cl | $CH_2OMe$ | O |
| D-1189 | H | $CH_2$ | Me | c-Pr | $CH_2OMe$ | Cl | $CH_2OMe$ | O |
| D-1190 | Me | $CH_2$ | H | c-Pr | $CH_2OMe$ | Cl | $CH_2OMe$ | O |
| D-1191 | H | CH(Me) | H | c-Pr | $CH_2OMe$ | Cl | $CH_2OMe$ | O |
| D-1192 | H | $CH_2CH_2$ | Me | c-Pr | $CH_2OMe$ | Cl | $CH_2OMe$ | O |
| D-1193 | Me | $CH_2CH_2$ | H | c-Pr | $CH_2OMe$ | Cl | $CH_2OMe$ | O |
| D-1194 | H | single bond | Me | c-Pr | $CH_2OMe$ | Me | $CH_2OMe$ | O |
| D-1195 | Me | single bond | H | c-Pr | $CH_2OMe$ | Me | $CH_2OMe$ | O |
| D-1196 | Me(R) | single bond | H | c-Pr | $CH_2OMe$ | Me | $CH_2OMe$ | O |
| D-1197 | Me(S) | single bond | H | c-Pr | $CH_2OMe$ | Me | $CH_2OMe$ | O |
| D-1198 | H | $CH_2$ | Me | c-Pr | $CH_2OMe$ | Me | $CH_2OMe$ | O |
| D-1199 | Me | $CH_2$ | H | c-Pr | $CH_2OMe$ | Me | $CH_2OMe$ | O |
| D-1200 | H | CH(Me) | H | c-Pr | $CH_2OMe$ | Me | $CH_2OMe$ | O |
| D-1201 | H | $CH_2CH_2$ | Me | c-Pr | $CH_2OMe$ | Me | $CH_2OMe$ | O |
| D-1202 | Me | $CH_2CH_2$ | H | c-Pr | $CH_2OMe$ | Me | $CH_2OMe$ | O |
| D-1203 | H | single bond | Me | c-Pr | $CH_2OMe$ | Cl | $CH_2CN$ | O |
| D-1204 | Me | single bond | H | c-Pr | $CH_2OMe$ | Cl | $CH_2CN$ | O |
| D-1205 | Me(R) | single bond | H | c-Pr | $CH_2OMe$ | Cl | $CH_2CN$ | O |
| D-1206 | Me(S) | single bond | H | c-Pr | $CH_2OMe$ | Cl | $CH_2CN$ | O |
| D-1207 | H | $CH_2$ | Me | c-Pr | $CH_2OMe$ | Cl | $CH_2CN$ | O |
| D-1208 | Me | $CH_2$ | H | c-Pr | $CH_2OMe$ | Cl | $CH_2CN$ | O |
| D-1209 | H | CH(Me) | H | c-Pr | $CH_2OMe$ | Cl | $CH_2CN$ | O |

TABLE 672-continued

| Compound Number | Y | W | Z | $R^1$ | $R^2$ | $R^3$ | $R^{10}$ | A |
|---|---|---|---|---|---|---|---|---|
| D-1210 | H | $CH_2CH_2$ | Me | c-Pr | $CH_2OMe$ | Cl | $CH_2CN$ | O |
| D-1211 | Me | $CH_2CH_2$ | H | c-Pr | $CH_2OMe$ | Cl | $CH_2CN$ | O |
| D-1212 | H | single bond | Me | c-Pr | $CH_2OMe$ | Me | $CH_2CN$ | O |
| D-1213 | Me | single bond | H | c-Pr | $CH_2OMe$ | Me | $CH_2CN$ | O |
| D-1214 | Me(R) | single bond | H | c-Pr | $CH_2OMe$ | Me | $CH_2CN$ | O |
| D-1215 | Me(S) | single bond | H | c-Pr | $CH_2OMe$ | Me | $CH_2CN$ | O |
| D-1216 | H | $CH_2$ | Me | c-Pr | $CH_2OMe$ | Me | $CH_2CN$ | O |
| D-1217 | Me | $CH_2$ | H | c-Pr | $CH_2OMe$ | Me | $CH_2CN$ | O |
| D-1218 | H | CH(Me) | H | c-Pr | $CH_2OMe$ | Me | $CH_2CN$ | O |
| D-1219 | H | $CH_2CH_2$ | Me | c-Pr | $CH_2OMe$ | Me | $CH_2CN$ | O |
| D-1220 | Me | $CH_2CH_2$ | H | c-Pr | $CH_2OMe$ | Me | $CH_2CN$ | O |
| D-1221 | H | single bond | Me | c-Pr | $CH_2OMe$ | Cl | C(═O)Me | O |
| D-1222 | Me | single bond | H | c-Pr | $CH_2OMe$ | Cl | C(═O)Me | O |
| D-1223 | Me(R) | single bond | H | c-Pr | $CH_2OMe$ | Cl | C(═O)Me | O |
| D-1224 | Me(S) | single bond | H | c-Pr | $CH_2OMe$ | Cl | C(═O)Me | O |
| D-1225 | H | $CH_2$ | Me | c-Pr | $CH_2OMe$ | Cl | C(═O)Me | O |
| D-1226 | Me | $CH_2$ | H | c-Pr | $CH_2OMe$ | Cl | C(═O)Me | O |

TABLE 673

| Compound Number | Y | W | Z | $R^1$ | $R^2$ | $R^3$ | $R^{10}$ | A |
|---|---|---|---|---|---|---|---|---|
| D-1227 | H | CH(Me) | H | c-Pr | $CH_2OMe$ | Cl | C(═O)Me | O |
| D-1228 | H | $CH_2CH_2$ | Me | c-Pr | $CH_2OMe$ | Cl | C(═O)Me | O |
| D-1229 | Me | $CH_2CH_2$ | H | c-Pr | $CH_2OMe$ | Cl | C(═O)Me | O |
| D-1230 | H | single bond | Me | c-Pr | $CH_2OMe$ | Me | C(═O)Me | O |
| D-1231 | Me | single bond | H | c-Pr | $CH_2OMe$ | Me | C(═O)Me | O |
| D-1232 | Me(R) | single bond | H | c-Pr | $CH_2OMe$ | Me | C(═O)Me | O |
| D-1233 | Me(S) | single bond | H | c-Pr | $CH_2OMe$ | Me | C(═O)Me | O |
| D-1234 | H | $CH_2$ | Me | c-Pr | $CH_2OMe$ | Me | C(═O)Me | O |
| D-1235 | Me | $CH_2$ | H | c-Pr | $CH_2OMe$ | Me | C(═O)Me | O |
| D-1236 | H | CH(Me) | H | c-Pr | $CH_2OMe$ | Me | C(═O)Me | O |
| D-1237 | H | $CH_2CH_2$ | Me | c-Pr | $CH_2OMe$ | Me | C(═O)Me | O |
| D-1238 | Me | $CH_2CH_2$ | H | c-Pr | $CH_2OMe$ | Me | C(═O)Me | O |
| D-1239 | H | single bond | Me | c-Pr | $CH_2CN$ | Cl | Me | O |
| D-1240 | H | single bond | Et | c-Pr | $CH_2CN$ | Cl | Me | O |
| D-1241 | Me | single bond | H | c-Pr | $CH_2CN$ | Cl | Me | O |
| D-1242 | Me(R) | single bond | H | c-Pr | $CH_2CN$ | Cl | Me | O |
| D-1243 | Me(S) | single bond | H | c-Pr | $CH_2CN$ | Cl | Me | O |
| D-1244 | H | $CH_2$ | Me | c-Pr | $CH_2CN$ | Cl | Me | O |
| D-1245 | Me | $CH_2$ | H | c-Pr | $CH_2CN$ | Cl | Me | O |
| D-1246 | H | CH(Me) | H | c-Pr | $CH_2CN$ | Cl | Me | O |
| D-1247 | H | $CH_2CH_2$ | Me | c-Pr | $CH_2CN$ | Cl | Me | O |
| D-1248 | Me | $CH_2CH_2$ | H | c-Pr | $CH_2CN$ | Cl | Me | O |
| D-1249 | H | single bond | Me | c-Pr | $CH_2CN$ | Me | Me | O |
| D-1250 | Me | single bond | H | c-Pr | $CH_2CN$ | Me | Me | O |
| D-1251 | Me(R) | single bond | H | c-Pr | $CH_2CN$ | Me | Me | O |
| D-1252 | Me(S) | single bond | H | c-Pr | $CH_2CN$ | Me | Me | O |
| D-1253 | H | $CH_2$ | Me | c-Pr | $CH_2CN$ | Me | Me | O |
| D-1254 | Me | $CH_2$ | H | c-Pr | $CH_2CN$ | Me | Me | O |
| D-1255 | H | CH(Me) | H | c-Pr | $CH_2CN$ | Me | Me | O |
| D-1256 | H | $CH_2CH_2$ | Me | c-Pr | $CH_2CN$ | Me | Me | O |
| D-1257 | Me | $CH_2CH_2$ | H | c-Pr | $CH_2CN$ | Me | Me | O |
| D-1258 | H | single bond | Me | c-Pr | $CH_2CN$ | Cl | Et | O |
| D-1259 | Me | single bond | H | c-Pr | $CH_2CN$ | Cl | Et | O |
| D-1260 | Me(R) | single bond | H | c-Pr | $CH_2CN$ | Cl | Et | O |
| D-1261 | Me(S) | single bond | H | c-Pr | $CH_2CN$ | Cl | Et | O |
| D-1262 | H | $CH_2$ | Me | c-Pr | $CH_2CN$ | Cl | Et | O |
| D-1263 | Me | $CH_2$ | H | c-Pr | $CH_2CN$ | Cl | Et | O |
| D-1264 | H | CH(Me) | H | c-Pr | $CH_2CN$ | Cl | Et | O |
| D-1265 | H | $CH_2CH_2$ | Me | c-Pr | $CH_2CN$ | Cl | Et | O |
| D-1266 | Me | $CH_2CH_2$ | H | c-Pr | $CH_2CN$ | Cl | Et | O |
| D-1267 | H | single bond | Me | c-Pr | $CH_2CN$ | Me | Et | O |
| D-1268 | Me | single bond | H | c-Pr | $CH_2CN$ | Me | Et | O |
| D-1269 | Me(R) | single bond | H | c-Pr | $CH_2CN$ | Me | Et | O |
| D-1270 | Me(S) | single bond | H | c-Pr | $CH_2CN$ | Me | Et | O |

TABLE 674

| Compound Number | Y | W | Z | $R^1$ | $R^2$ | $R^3$ | $R^{10}$ | A |
|---|---|---|---|---|---|---|---|---|
| D-1271 | H | $CH_2$ | Me | c-Pr | $CH_2CN$ | Me | Et | O |
| D-1272 | Me | $CH_2$ | H | c-Pr | $CH_2CN$ | Me | Et | O |
| D-1273 | H | CH(Me) | H | c-Pr | $CH_2CN$ | Me | Et | O |
| D-1274 | H | $CH_2CH_2$ | Me | c-Pr | $CH_2CN$ | Me | Et | O |
| D-1275 | Me | $CH_2CH_2$ | H | c-Pr | $CH_2CN$ | Me | Et | O |
| D-1276 | H | single bond | Me | c-Pr | $CH_2CN$ | Cl | $CH_2CF_3$ | O |
| D-1277 | Me | single bond | H | c-Pr | $CH_2CN$ | Cl | $CH_2CF_3$ | O |
| D-1278 | Me(R) | single bond | H | c-Pr | $CH_2CN$ | Cl | $CH_2CF_3$ | O |
| D-1279 | Me(S) | single bond | H | c-Pr | $CH_2CN$ | Cl | $CH_2CF_3$ | O |
| D-1280 | H | $CH_2$ | Me | c-Pr | $CH_2CN$ | Cl | $CH_2CF_3$ | O |
| D-1281 | Me | $CH_2$ | H | c-Pr | $CH_2CN$ | Cl | $CH_2CF_3$ | O |
| D-1282 | H | CH(Me) | H | c-Pr | $CH_2CN$ | Cl | $CH_2CF_3$ | O |
| D-1283 | H | $CH_2CH_2$ | Me | c-Pr | $CH_2CN$ | Cl | $CH_2CF_3$ | O |
| D-1284 | Me | $CH_2CH_2$ | H | c-Pr | $CH_2CN$ | Cl | $CH_2CF_3$ | O |
| D-1285 | H | single bond | Me | c-Pr | $CH_2CN$ | Me | $CH_2CF_3$ | O |
| D-1286 | Me | single bond | H | c-Pr | $CH_2CN$ | Me | $CH_2CF_3$ | O |
| D-1287 | Me(R) | single bond | H | c-Pr | $CH_2CN$ | Me | $CH_2CF_3$ | O |
| D-1288 | Me(S) | single bond | H | c-Pr | $CH_2CN$ | Me | $CH_2CF_3$ | O |
| D-1289 | H | $CH_2$ | Me | c-Pr | $CH_2CN$ | Me | $CH_2CF_3$ | O |
| D-1290 | Me | $CH_2$ | H | c-Pr | $CH_2CN$ | Me | $CH_2CF_3$ | O |
| D-1291 | H | CH(Me) | H | c-Pr | $CH_2CN$ | Me | $CH_2CF_3$ | O |
| D-1292 | H | $CH_2CH_2$ | Me | c-Pr | $CH_2CN$ | Me | $CH_2CF_3$ | O |
| D-1293 | Me | $CH_2CH_2$ | H | c-Pr | $CH_2CN$ | Me | $CH_2CF_3$ | O |
| D-1294 | H | single bond | Me | c-Pr | $CH_2CN$ | Cl | $CH_2OMe$ | O |
| D-1295 | Me | single bond | H | c-Pr | $CH_2CN$ | Cl | $CH_2OMe$ | O |
| D-1296 | Me(R) | single bond | H | c-Pr | $CH_2CN$ | Cl | $CH_2OMe$ | O |
| D-1297 | Me(S) | single bond | H | c-Pr | $CH_2CN$ | Cl | $CH_2OMe$ | O |
| D-1298 | H | $CH_2$ | Me | c-Pr | $CH_2CN$ | Cl | $CH_2OMe$ | O |
| D-1299 | Me | $CH_2$ | H | c-Pr | $CH_2CN$ | Cl | $CH_2OMe$ | O |
| D-1300 | H | CH(Me) | H | c-Pr | $CH_2CN$ | Cl | $CH_2OMe$ | O |
| D-1301 | H | $CH_2CH_2$ | Me | c-Pr | $CH_2CN$ | Cl | $CH_2OMe$ | O |
| D-1302 | Me | $CH_2CH_2$ | H | c-Pr | $CH_2CN$ | Cl | $CH_2OMe$ | O |
| D-1303 | H | single bond | Me | c-Pr | $CH_2CN$ | Me | $CH_2OMe$ | O |
| D-1304 | Me | single bond | H | c-Pr | $CH_2CN$ | Me | $CH_2OMe$ | O |
| D-1305 | Me(R) | single bond | H | c-Pr | $CH_2CN$ | Me | $CH_2OMe$ | O |
| D-1306 | Me(S) | single bond | H | c-Pr | $CH_2CN$ | Me | $CH_2OMe$ | O |
| D-1307 | H | $CH_2$ | Me | c-Pr | $CH_2CN$ | Me | $CH_2OMe$ | O |
| D-1308 | Me | $CH_2$ | H | c-Pr | $CH_2CN$ | Me | $CH_2OMe$ | O |
| D-1309 | H | CH(Me) | H | c-Pr | $CH_2CN$ | Me | $CH_2OMe$ | O |
| D-1310 | H | $CH_2CH_2$ | Me | c-Pr | $CH_2CN$ | Me | $CH_2OMe$ | O |
| D-1311 | Me | $CH_2CH_2$ | H | c-Pr | $CH_2CN$ | Me | $CH_2OMe$ | O |
| D-1312 | H | single bond | Me | c-Pr | $CH_2CN$ | Cl | $CH_2CN$ | O |
| D-1313 | Me | single bond | H | c-Pr | $CH_2CN$ | Cl | $CH_2CN$ | O |
| D-1314 | Me(R) | single bond | H | c-Pr | $CH_2CN$ | Cl | $CH_2CN$ | O |

TABLE 675

| Compound Number | Y | W | Z | $R^1$ | $R^2$ | $R^3$ | $R^{10}$ | A |
|---|---|---|---|---|---|---|---|---|
| D-1315 | Me(S) | single bond | H | c-Pr | $CH_2CN$ | Cl | $CH_2CN$ | O |
| D-1316 | H | $CH_2$ | Me | c-Pr | $CH_2CN$ | Cl | $CH_2CN$ | O |
| D-1317 | Me | $CH_2$ | H | c-Pr | $CH_2CN$ | Cl | $CH_2CN$ | O |
| D-1318 | H | CH(Me) | H | c-Pr | $CH_2CN$ | Cl | $CH_2CN$ | O |
| D-1319 | H | $CH_2CH_2$ | Me | c-Pr | $CH_2CN$ | Cl | $CH_2CN$ | O |
| D-1320 | Me | $CH_2CH_2$ | H | c-Pr | $CH_2CN$ | Cl | $CH_2CN$ | O |
| D-1321 | H | single bond | Me | c-Pr | $CH_2CN$ | Me | $CH_2CN$ | O |
| D-1322 | Me | single bond | H | c-Pr | $CH_2CN$ | Me | $CH_2CN$ | O |
| D-1323 | Me(R) | single bond | H | c-Pr | $CH_2CN$ | Me | $CH_2CN$ | O |
| D-1324 | Me(S) | single bond | H | c-Pr | $CH_2CN$ | Me | $CH_2CN$ | O |
| D-1325 | H | $CH_2$ | Me | c-Pr | $CH_2CN$ | Me | $CH_2CN$ | O |
| D-1326 | Me | $CH_2$ | H | c-Pr | $CH_2CN$ | Me | $CH_2CN$ | O |
| D-1327 | H | CH(Me) | H | c-Pr | $CH_2CN$ | Me | $CH_2CN$ | O |
| D-1328 | H | $CH_2CH_2$ | Me | c-Pr | $CH_2CN$ | Me | $CH_2CN$ | O |
| D-1329 | Me | $CH_2CH_2$ | H | c-Pr | $CH_2CN$ | Me | $CH_2CN$ | O |
| D-1330 | H | single bond | Me | c-Pr | $CH_2CN$ | Cl | C(=O)Me | O |
| D-1331 | Me | single bond | H | c-Pr | $CH_2CN$ | Cl | C(=O)Me | O |
| D-1332 | Me(R) | single bond | H | c-Pr | $CH_2CN$ | Cl | C(=O)Me | O |
| D-1333 | Me(S) | single bond | H | c-Pr | $CH_2CN$ | Cl | C(=O)Me | O |
| D-1334 | H | $CH_2$ | Me | c-Pr | $CH_2CN$ | Cl | C(=O)Me | O |
| D-1335 | Me | $CH_2$ | H | c-Pr | $CH_2CN$ | Cl | C(=O)Me | O |
| D-1336 | H | CH(Me) | H | c-Pr | $CH_2CN$ | Cl | C(=O)Me | O |
| D-1337 | H | $CH_2CH_2$ | Me | c-Pr | $CH_2CN$ | Cl | C(=O)Me | O |

TABLE 675-continued

| Compound Number | Y | W | Z | $R^1$ | $R^2$ | $R^3$ | $R^{10}$ | A |
|---|---|---|---|---|---|---|---|---|
| D-1338 | Me | $CH_2CH_2$ | H | c-Pr | $CH_2CN$ | Cl | C(=O)Me | O |
| D-1339 | H | single bond | Me | c-Pr | $CH_2CN$ | Me | C(=O)Me | O |
| D-1340 | Me | single bond | H | c-Pr | $CH_2CN$ | Me | C(=O)Me | O |
| D-1341 | Me(R) | single bond | H | c-Pr | $CH_2CN$ | Me | C(=O)Me | O |
| D-1342 | Me(S) | single bond | H | c-Pr | $CH_2CN$ | Me | C(=O)Me | O |
| D-1343 | H | $CH_2$ | Me | c-Pr | $CH_2CN$ | Me | C(=O)Me | O |
| D-1344 | Me | $CH_2$ | H | c-Pr | $CH_2CN$ | Me | C(=O)Me | O |
| D-1345 | H | CH(Me) | H | c-Pr | $CH_2CN$ | Me | C(=O)Me | O |
| D-1346 | H | $CH_2CH_2$ | Me | c-Pr | $CH_2CN$ | Me | C(=O)Me | O |
| D-1347 | Me | $CH_2CH_2$ | H | c-Pr | $CH_2CN$ | Me | C(=O)Me | O |
| D-1348 | H | single bond | Me | c-Pr | C(=O)Me | Cl | Me | O |
| D-1349 | Me | single bond | H | c-Pr | C(=O)Me | Cl | Me | O |
| D-1350 | Me(R) | single bond | H | c-Pr | C(=O)Me | Cl | Me | O |
| D-1351 | Me(S) | single bond | H | c-Pr | C(=O)Me | Cl | Me | O |
| D-1352 | H | $CH_2$ | Me | c-Pr | C(=O)Me | Cl | Me | O |
| D-1353 | Me | $CH_2$ | H | c-Pr | C(=O)Me | Cl | Me | O |
| D-1354 | H | CH(Me) | H | c-Pr | C(=O)Me | Cl | Me | O |
| D-1355 | H | $CH_2CH_2$ | Me | c-Pr | C(=O)Me | Cl | Me | O |
| D-1356 | Me | $CH_2CH_2$ | H | c-Pr | C(=O)Me | Cl | Me | O |
| D-1357 | H | single bond | Me | c-Pr | C(=O)Me | Me | Me | O |
| D-1358 | Me | single bond | H | c-Pr | C(=O)Me | Me | Me | O |

TABLE 676

| Compound Number | Y | W | Z | $R^1$ | $R^2$ | $R^3$ | $R^{10}$ | A |
|---|---|---|---|---|---|---|---|---|
| D-1359 | Me(R) | single bond | H | c-Pr | C(=O)Me | Me | Me | O |
| D-1360 | Me(S) | single bond | H | c-Pr | C(=O)Me | Me | Me | O |
| D-1361 | H | $CH_2$ | Me | c-Pr | C(=O)Me | Me | Me | O |
| D-1362 | Me | $CH_2$ | H | c-Pr | C(=O)Me | Me | Me | O |
| D-1363 | H | CH(Me) | H | c-Pr | C(=O)Me | Me | Me | O |
| D-1364 | H | $CH_2CH_2$ | Me | c-Pr | C(=O)Me | Me | Me | O |
| D-1365 | Me | $CH_2CH_2$ | H | c-Pr | C(=O)Me | Me | Me | O |
| D-1366 | H | single bond | Me | c-Pr | C(=O)Me | Cl | Et | O |
| D-1367 | Me | single bond | H | c-Pr | C(=O)Me | Cl | Et | O |
| D-1368 | Me(R) | single bond | H | c-Pr | C(=O)Me | Cl | Et | O |
| D-1369 | Me(S) | single bond | H | c-Pr | C(=O)Me | Cl | Et | O |
| D-1370 | H | $CH_2$ | Me | c-Pr | C(=O)Me | Cl | Et | O |
| D-1371 | Me | $CH_2$ | H | c-Pr | C(=O)Me | Cl | Et | O |
| D-1372 | H | CH(Me) | H | c-Pr | C(=O)Me | Cl | Et | O |
| D-1373 | H | $CH_2CH_2$ | Me | c-Pr | C(=O)Me | Cl | Et | O |
| D-1374 | Me | $CH_2CH_2$ | H | c-Pr | C(=O)Me | Cl | Et | O |
| D-1375 | H | single bond | Me | c-Pr | C(=O)Me | Me | Et | O |
| D-1376 | Me | single bond | H | c-Pr | C(=O)Me | Me | Et | O |
| D-1377 | Me(R) | single bond | H | c-Pr | C(=O)Me | Me | Et | O |
| D-1378 | Me(S) | single bond | H | c-Pr | C(=O)Me | Me | Et | O |
| D-1379 | H | $CH_2$ | Me | c-Pr | C(=O)Me | Me | Et | O |
| D-1380 | Me | $CH_2$ | H | c-Pr | C(=O)Me | Me | Et | O |
| D-1381 | H | CH(Me) | H | c-Pr | C(=O)Me | Me | Et | O |
| D-1382 | H | $CH_2CH_2$ | Me | c-Pr | C(=O)Me | Me | Et | O |
| D-1383 | Me | $CH_2CH_2$ | H | c-Pr | C(=O)Me | Me | Et | O |
| D-1384 | H | single bond | Me | c-Pr | C(=O)Me | Cl | $CH_2CF_3$ | O |
| D-1385 | Me | single bond | H | c-Pr | C(=O)Me | Cl | $CH_2CF_3$ | O |
| D-1386 | Me(R) | single bond | H | c-Pr | C(=O)Me | Cl | $CH_2CF_3$ | O |
| D-1387 | Me(S) | single bond | H | c-Pr | C(=O)Me | Cl | $CH_2CF_3$ | O |
| D-1388 | H | $CH_2$ | Me | c-Pr | C(=O)Me | Cl | $CH_2CF_3$ | O |
| D-1389 | Me | $CH_2$ | H | c-Pr | C(=O)Me | Cl | $CH_2CF_3$ | O |
| D-1390 | H | CH(Me) | H | c-Pr | C(=O)Me | Cl | $CH_2CF_3$ | O |
| D-1391 | H | $CH_2CH_2$ | Me | c-Pr | C(=O)Me | Cl | $CH_2CF_3$ | O |
| D-1392 | Me | $CH_2CH_2$ | H | c-Pr | C(=O)Me | Cl | $CH_2CF_3$ | O |
| D-1393 | H | single bond | Me | c-Pr | C(=O)Me | Me | $CH_2CF_3$ | O |
| D-1394 | Me | single bond | H | c-Pr | C(=O)Me | Me | $CH_2CF_3$ | O |
| D-1395 | Me(R) | single bond | H | c-Pr | C(=O)Me | Me | $CH_2CF_3$ | O |
| D-1396 | Me(S) | single bond | H | c-Pr | C(=O)Me | Me | $CH_2CF_3$ | O |
| D-1397 | H | $CH_2$ | Me | c-Pr | C(=O)Me | Me | $CH_2CF_3$ | O |
| D-1398 | Me | $CH_2$ | H | c-Pr | C(=O)Me | Me | $CH_2CF_3$ | O |
| D-1399 | H | CH(Me) | H | c-Pr | C(=O)Me | Me | $CH_2CF_3$ | O |
| D-1400 | H | $CH_2CH_2$ | Me | c-Pr | C(=O)Me | Me | $CH_2CF_3$ | O |
| D-1401 | Me | $CH_2CH_2$ | H | c-Pr | C(=O)Me | Me | $CH_2CF_3$ | O |
| D-1402 | H | single bond | Me | c-Pr | C(=O)Me | Cl | $CH_2OMe$ | O |

TABLE 677

| Compound Number | Y | W | Z | $R^1$ | $R^2$ | $R^3$ | $R^{10}$ | A |
|---|---|---|---|---|---|---|---|---|
| D-1403 | Me | single bond | H | c-Pr | C(═O)Me | Cl | $CH_2OMe$ | O |
| D-1404 | Me(R) | single bond | H | c-Pr | C(═O)Me | Cl | $CH_2OMe$ | O |
| D-1405 | Me(S) | single bond | H | c-Pr | C(═O)Me | Cl | $CH_2OMe$ | O |
| D-1406 | H | $CH_2$ | Me | c-Pr | C(═O)Me | Cl | $CH_2OMe$ | O |
| D-1407 | Me | $CH_2$ | H | c-Pr | C(═O)Me | Cl | $CH_2OMe$ | O |
| D-1408 | H | CH(Me) | H | c-Pr | C(═O)Me | Cl | $CH_2OMe$ | O |
| D-1409 | H | $CH_2CH_2$ | Me | c-Pr | C(═O)Me | Cl | $CH_2OMe$ | O |
| D-1410 | Me | $CH_2CH_2$ | H | c-Pr | C(═O)Me | Cl | $CH_2OMe$ | O |
| D-1411 | H | single bond | Me | c-Pr | C(═O)Me | Me | $CH_2OMe$ | O |
| D-1412 | Me | single bond | H | c-Pr | C(═O)Me | Me | $CH_2OMe$ | O |
| D-1413 | Me(R) | single bond | H | c-Pr | C(═O)Me | Me | $CH_2OMe$ | O |
| D-1414 | Me(S) | single bond | H | c-Pr | C(═O)Me | Me | $CH_2OMe$ | O |
| D-1415 | H | $CH_2$ | Me | c-Pr | C(═O)Me | Me | $CH_2OMe$ | O |
| D-1416 | Me | $CH_2$ | H | c-Pr | C(═O)Me | Me | $CH_2OMe$ | O |
| D-1417 | H | CH(Me) | H | c-Pr | C(═O)Me | Me | $CH_2OMe$ | O |
| D-1418 | H | $CH_2CH_2$ | Me | c-Pr | C(═O)Me | Me | $CH_2OMe$ | O |
| D-1419 | Me | $CH_2CH_2$ | H | c-Pr | C(═O)Me | Me | $CH_2OMe$ | O |
| D-1420 | H | single bond | Me | c-Pr | C(═O)Me | Cl | $CH_2CN$ | O |
| D-1421 | Me | single bond | H | c-Pr | C(═O)Me | Cl | $CH_2CN$ | O |
| D-1422 | Me(R) | single bond | H | c-Pr | C(═O)Me | Cl | $CH_2CN$ | O |
| D-1423 | Me(S) | single bond | H | c-Pr | C(═O)Me | Cl | $CH_2CN$ | O |
| D-1424 | H | $CH_2$ | Me | c-Pr | C(═O)Me | Cl | $CH_2CN$ | O |
| D-1425 | Me | $CH_2$ | H | c-Pr | C(═O)Me | Cl | $CH_2CN$ | O |
| D-1426 | H | CH(Me) | H | c-Pr | C(═O)Me | Cl | $CH_2CN$ | O |
| D-1427 | H | $CH_2CH_2$ | Me | c-Pr | C(═O)Me | Cl | $CH_2CN$ | O |
| D-1428 | Me | $CH_2CH_2$ | H | c-Pr | C(═O)Me | Cl | $CH_2CN$ | O |
| D-1429 | H | single bond | Me | c-Pr | C(═O)Me | Me | $CH_2CN$ | O |
| D-1430 | Me | single bond | H | c-Pr | C(═O)Me | Me | $CH_2CN$ | O |
| D-1431 | Me(R) | single bond | H | c-Pr | C(═O)Me | Me | $CH_2CN$ | O |
| D-1432 | Me(S) | single bond | H | c-Pr | C(═O)Me | Me | $CH_2CN$ | O |
| D-1433 | H | $CH_2$ | Me | c-Pr | C(═O)Me | Me | $CH_2CN$ | O |
| D-1434 | Me | $CH_2$ | H | c-Pr | C(═O)Me | Me | $CH_2CN$ | O |
| D-1435 | H | CH(Me) | H | c-Pr | C(═O)Me | Me | $CH_2CN$ | O |
| D-1436 | H | $CH_2CH_2$ | Me | c-Pr | C(═O)Me | Me | $CH_2CN$ | O |
| D-1437 | Me | $CH_2CH_2$ | H | c-Pr | C(═O)Me | Me | $CH_2CN$ | O |
| D-1438 | H | single bond | Me | c-Pr | C(═O)Me | Cl | C(═O)Me | O |
| D-1439 | Me | single bond | H | c-Pr | C(═O)Me | Cl | C(═O)Me | O |
| D-1440 | Me(R) | single bond | H | c-Pr | C(═O)Me | Cl | C(═O)Me | O |
| D-1441 | Me(S) | single bond | H | c-Pr | C(═O)Me | Cl | C(═O)Me | O |
| D-1442 | H | $CH_2$ | Me | c-Pr | C(═O)Me | Cl | C(═O)Me | O |
| D-1443 | Me | $CH_2$ | H | c-Pr | C(═O)Me | Cl | C(═O)Me | O |
| D-1444 | H | CH(Me) | H | c-Pr | C(═O)Me | Cl | C(═O)Me | O |
| D-1445 | H | $CH_2CH_2$ | Me | c-Pr | C(═O)Me | Cl | C(═O)Me | O |
| D-1446 | Me | $CH_2CH_2$ | H | c-Pr | C(═O)Me | Cl | C(═O)Me | O |

TABLE 678

| Compound Number | Y | W | Z | $R^1$ | $R^2$ | $R^3$ | $R^{10}$ | A |
|---|---|---|---|---|---|---|---|---|
| D-1447 | H | single bond | Me | c-Pr | C(═O)Me | Me | C(═O)Me | O |
| D-1448 | Me | single bond | H | c-Pr | C(═O)Me | Me | C(═O)Me | O |
| D-1449 | Me(R) | single bond | H | c-Pr | C(═O)Me | Me | C(═O)Me | O |
| D-1450 | Me(S) | single bond | H | c-Pr | C(═O)Me | Me | C(═O)Me | O |
| D-1451 | H | $CH_2$ | Me | c-Pr | C(═O)Me | Me | C(═O)Me | O |
| D-1452 | Me | $CH_2$ | H | c-Pr | C(═O)Me | Me | C(═O)Me | O |
| D-1453 | H | CH(Me) | H | c-Pr | C(═O)Me | Me | C(═O)Me | O |
| D-1454 | H | $CH_2CH_2$ | Me | c-Pr | C(═O)Me | Me | C(═O)Me | O |
| D-1455 | Me | $CH_2CH_2$ | H | c-Pr | C(═O)Me | Me | C(═O)Me | O |
| D-1456 | H | single bond | Me | c-Pr | C(═O)(i-Pr) | Cl | Me | O |
| D-1457 | Me | single bond | H | c-Pr | C(═O)(i-Pr) | Cl | Me | O |
| D-1458 | Me(R) | single bond | H | c-Pr | C(═O)(i-Pr) | Cl | Me | O |
| D-1459 | Me(S) | single bond | H | c-Pr | C(═O)(i-Pr) | Cl | Me | O |
| D-1460 | H | $CH_2$ | Me | c-Pr | C(═O)(i-Pr) | Cl | Me | O |
| D-1461 | Me | $CH_2$ | H | c-Pr | C(═O)(i-Pr) | Cl | Me | O |
| D-1462 | H | CH(Me) | H | c-Pr | C(═O)(i-Pr) | Cl | Me | O |
| D-1463 | H | $CH_2CH_2$ | Me | c-Pr | C(═O)(i-Pr) | Cl | Me | O |
| D-1464 | Me | $CH_2CH_2$ | H | c-Pr | C(═O)(i-Pr) | Cl | Me | O |
| D-1465 | H | single bond | Me | c-Pr | C(═O)(i-Pr) | Me | Me | O |
| D-1466 | Me | single bond | H | c-Pr | C(═O)(i-Pr) | Me | Me | O |
| D-1467 | Me(R) | single bond | H | c-Pr | C(═O)(i-Pr) | Me | Me | O |

TABLE 678-continued

| Compound Number | Y | W | Z | $R^1$ | $R^2$ | $R^3$ | $R^{10}$ | A |
|---|---|---|---|---|---|---|---|---|
| D-1468 | Me(S) | single bond | H | c-Pr | C(=O)(i-Pr) | Me | Me | O |
| D-1469 | H | $CH_2$ | Me | c-Pr | C(=O)(i-Pr) | Me | Me | O |
| D-1470 | Me | $CH_2$ | H | c-Pr | C(=O)(i-Pr) | Me | Me | O |
| D-1471 | H | CH(Me) | H | c-Pr | C(=O)(i-Pr) | Me | Me | O |
| D-1472 | H | $CH_2CH_2$ | Me | c-Pr | C(=O)(i-Pr) | Me | Me | O |
| D-1473 | Me | $CH_2CH_2$ | H | c-Pr | C(=O)(i-Pr) | Me | Me | O |
| D-1474 | H | single bond | Me | c-Pr | C(=O)(i-Pr) | Cl | Et | O |
| D-1475 | Me | single bond | H | c-Pr | C(=O)(i-Pr) | Cl | Et | O |
| D-1476 | Me(R) | single bond | H | c-Pr | C(=O)(i-Pr) | Cl | Et | O |
| D-1477 | Me(S) | single bond | H | c-Pr | C(=O)(i-Pr) | Cl | Et | O |
| D-1478 | H | $CH_2$ | Me | c-Pr | C(=O)(i-Pr) | Cl | Et | O |
| D-1479 | Me | $CH_2$ | H | c-Pr | C(=O)(i-Pr) | Cl | Et | O |
| D-1480 | H | CH(Me) | H | c-Pr | C(=O)(i-Pr) | Cl | Et | O |
| D-1481 | H | $CH_2CH_2$ | Me | c-Pr | C(=O)(i-Pr) | Cl | Et | O |
| D-1482 | Me | $CH_2CH_2$ | H | c-Pr | C(=O)(i-Pr) | Cl | Et | O |
| D-1483 | H | single bond | Me | c-Pr | C(=O)(i-Pr) | Me | Et | O |
| D-1484 | Me | single bond | H | c-Pr | C(=O)(i-Pr) | Me | Et | O |
| D-1485 | Me(R) | single bond | H | c-Pr | C(=O)(i-Pr) | Me | Et | O |
| D-1486 | Me(S) | single bond | H | c-Pr | C(=O)(i-Pr) | Me | Et | O |
| D-1487 | H | $CH_2$ | Me | c-Pr | C(=O)(i-Pr) | Me | Et | O |
| D-1488 | Me | $CH_2$ | H | c-Pr | C(=O)(i-Pr) | Me | Et | O |
| D-1489 | H | CH(Me) | H | c-Pr | C(=O)(i-Pr) | Me | Et | O |
| D-1490 | H | $CH_2CH_2$ | Me | c-Pr | C(=O)(i-Pr) | Me | Et | O |

TABLE 679

| Compound Number | Y | W | Z | $R^1$ | $R^2$ | $R^3$ | $R^{10}$ | A |
|---|---|---|---|---|---|---|---|---|
| D-1491 | Me | $CH_2CH_2$ | H | c-Pr | C(=O)(i-Pr) | Me | Et | O |
| D-1492 | H | single bond | Me | c-Pr | C(=O)(i-Pr) | Cl | $CH_2CF_3$ | O |
| D-1493 | Me | single bond | H | c-Pr | C(=O)(i-Pr) | Cl | $CH_2CF_3$ | O |
| D-1494 | Me(R) | single bond | H | c-Pr | C(=O)(i-Pr) | Cl | $CH_2CF_3$ | O |
| D-1495 | Me(S) | single bond | H | c-Pr | C(=O)(i-Pr) | Cl | $CH_2CF_3$ | O |
| D-1496 | H | $CH_2$ | Me | c-Pr | C(=O)(i-Pr) | Cl | $CH_2CF_3$ | O |
| D-1497 | Me | $CH_2$ | H | c-Pr | C(=O)(i-Pr) | Cl | $CH_2CF_3$ | O |
| D-1498 | H | CH(Me) | H | c-Pr | C(=O)(i-Pr) | Cl | $CH_2CF_3$ | O |
| D-1499 | H | $CH_2CH_2$ | Me | c-Pr | C(=O)(i-Pr) | Cl | $CH_2CF_3$ | O |
| D-1500 | Me | $CH_2CH_2$ | H | c-Pr | C(=O)(i-Pr) | Cl | $CH_2CF_3$ | O |
| D-1501 | H | single bond | Me | c-Pr | C(=O)(i-Pr) | Me | $CH_2CF_3$ | O |
| D-1502 | Me | single bond | H | c-Pr | C(=O)(i-Pr) | Me | $CH_2CF_3$ | O |
| D-1503 | Me(R) | single bond | H | c-Pr | C(=O)(i-Pr) | Me | $CH_2CF_3$ | O |
| D-1504 | Me(S) | single bond | H | c-Pr | C(=O)(i-Pr) | Me | $CH_2CF_3$ | O |
| D-1505 | H | $CH_2$ | Me | c-Pr | C(=O)(i-Pr) | Me | $CH_2CF_3$ | O |
| D-1506 | Me | $CH_2$ | H | c-Pr | C(=O)(i-Pr) | Me | $CH_2CF_3$ | O |
| D-1507 | H | CH(Me) | H | c-Pr | C(=O)(i-Pr) | Me | $CH_2CF_3$ | O |
| D-1508 | H | $CH_2CH_2$ | Me | c-Pr | C(=O)(i-Pr) | Me | $CH_2CF_3$ | O |
| D-1509 | Me | $CH_2CH_2$ | H | c-Pr | C(=O)(i-Pr) | Me | $CH_2CF_3$ | O |
| D-1510 | H | single bond | Me | c-Pr | C(=O)(i-Pr) | Cl | $CH_2OMe$ | O |
| D-1511 | Me | single bond | H | c-Pr | C(=O)(i-Pr) | Cl | $CH_2OMe$ | O |
| D-1512 | Me(R) | single bond | H | c-Pr | C(=O)(i-Pr) | Cl | $CH_2OMe$ | O |
| D-1513 | Me(S) | single bond | H | c-Pr | C(=O)(i-Pr) | Cl | $CH_2OMe$ | O |
| D-1514 | H | $CH_2$ | Me | c-Pr | C(=O)(i-Pr) | Cl | $CH_2OMe$ | O |
| D-1515 | Me | $CH_2$ | H | c-Pr | C(=O)(i-Pr) | Cl | $CH_2OMe$ | O |
| D-1516 | H | CH(Me) | H | c-Pr | C(=O)(i-Pr) | Cl | $CH_2OMe$ | O |
| D-1517 | H | $CH_2CH_2$ | Me | c-Pr | C(=O)(i-Pr) | Cl | $CH_2OMe$ | O |
| D-1518 | Me | $CH_2CH_2$ | H | c-Pr | C(=O)(i-Pr) | Cl | $CH_2OMe$ | O |
| D-1519 | H | single bond | Me | c-Pr | C(=O)(i-Pr) | Me | $CH_2OMe$ | O |
| D-1520 | Me | single bond | H | c-Pr | C(=O)(i-Pr) | Me | $CH_2OMe$ | O |
| D-1521 | Me(R) | single bond | H | c-Pr | C(=O)(i-Pr) | Me | $CH_2OMe$ | O |
| D-1522 | Me(S) | single bond | H | c-Pr | C(=O)(i-Pr) | Me | $CH_2OMe$ | O |
| D-1523 | H | $CH_2$ | Me | c-Pr | C(=O)(i-Pr) | Me | $CH_2OMe$ | O |
| D-1524 | Me | $CH_2$ | H | c-Pr | C(=O)(i-Pr) | Me | $CH_2OMe$ | O |
| D-1525 | H | CH(Me) | H | c-Pr | C(=O)(i-Pr) | Me | $CH_2OMe$ | O |
| D-1526 | H | $CH_2CH_2$ | Me | c-Pr | C(=O)(i-Pr) | Me | $CH_2OMe$ | O |
| D-1527 | Me | $CH_2CH_2$ | H | c-Pr | C(=O)(i-Pr) | Me | $CH_2OMe$ | O |
| D-1528 | H | single bond | Me | c-Pr | C(=O)(i-Pr) | Cl | $CH_2CN$ | O |
| D-1529 | Me | single bond | H | c-Pr | C(=O)(i-Pr) | Cl | $CH_2CN$ | O |
| D-1530 | Me(R) | single bond | H | c-Pr | C(=O)(i-Pr) | Cl | $CH_2CN$ | O |
| D-1531 | Me(S) | single bond | H | c-Pr | C(=O)(i-Pr) | Cl | $CH_2CN$ | O |
| D-1532 | H | $CH_2$ | Me | c-Pr | C(=O)(i-Pr) | Cl | $CH_2CN$ | O |

TABLE 679-continued

| Compound Number | Y | W | Z | $R^1$ | $R^2$ | $R^3$ | $R^{10}$ | A |
|---|---|---|---|---|---|---|---|---|
| D-1533 | Me | $CH_2$ | H | c-Pr | C(=O)(i-Pr) | Cl | $CH_2CN$ | O |
| D-1534 | H | CH(Me) | H | c-Pr | C(=O)(i-Pr) | Cl | $CH_2CN$ | O |

TABLE 680

| Compound Number | Y | W | Z | $R^1$ | $R^2$ | $R^3$ | $R^{10}$ | A |
|---|---|---|---|---|---|---|---|---|
| D-1535 | H | $CH_2CH_2$ | Me | c-Pr | C(=O)(i-Pr) | Cl | $CH_2CN$ | O |
| D-1536 | Me | $CH_2CH_2$ | H | c-Pr | C(=O)(i-Pr) | Cl | $CH_2CN$ | O |
| D-1537 | H | single bond | Me | c-Pr | C(=O)(i-Pr) | Me | $CH_2CN$ | O |
| D-1538 | Me | single bond | H | c-Pr | C(=O)(i-Pr) | Me | $CH_2CN$ | O |
| D-1539 | Me(R) | single bond | H | c-Pr | C(=O)(i-Pr) | Me | $CH_2CN$ | O |
| D-1540 | Me(S) | single bond | H | c-Pr | C(=O)(i-Pr) | Me | $CH_2CN$ | O |
| D-1541 | H | $CH_2$ | Me | c-Pr | C(=O)(i-Pr) | Me | $CH_2CN$ | O |
| D-1542 | Me | $CH_2$ | H | c-Pr | C(=O)(i-Pr) | Me | $CH_2CN$ | O |
| D-1543 | H | CH(Me) | H | c-Pr | C(=O)(i-Pr) | Me | $CH_2CN$ | O |
| D-1544 | H | $CH_2CH_2$ | Me | c-Pr | C(=O)(i-Pr) | Me | $CH_2CN$ | O |
| D-1545 | Me | $CH_2CH_2$ | H | c-Pr | C(=O)(i-Pr) | Me | $CH_2CN$ | O |
| D-1546 | H | single bond | Me | c-Pr | C(=O)(i-Pr) | Cl | C(=O)Me | O |
| D-1547 | Me | single bond | H | c-Pr | C(=O)(i-Pr) | Cl | C(=O)Me | O |
| D-1548 | Me(R) | single bond | H | c-Pr | C(=O)(i-Pr) | Cl | C(=O)Me | O |
| D-1549 | Me(S) | single bond | H | c-Pr | C(=O)(i-Pr) | Cl | C(=O)Me | O |
| D-1550 | H | $CH_2$ | Me | c-Pr | C(=O)(i-Pr) | Cl | C(=O)Me | O |
| D-1551 | Me | $CH_2$ | H | c-Pr | C(=O)(i-Pr) | Cl | C(=O)Me | O |
| D-1552 | H | CH(Me) | H | c-Pr | C(=O)(i-Pr) | Cl | C(=O)Me | O |
| D-1553 | H | $CH_2CH_2$ | Me | c-Pr | C(=O)(i-Pr) | Cl | C(=O)Me | O |
| D-1554 | Me | $CH_2CH_2$ | H | c-Pr | C(=O)(i-Pr) | Cl | C(=O)Me | O |
| D-1555 | H | single bond | Me | c-Pr | C(=O)(i-Pr) | Me | C(=O)Me | O |
| D-1556 | Me | single bond | H | c-Pr | C(=O)(i-Pr) | Me | C(=O)Me | O |
| D-1557 | Me(R) | single bond | H | c-Pr | C(=O)(i-Pr) | Me | C(=O)Me | O |
| D-1558 | Me(S) | single bond | H | c-Pr | C(=O)(i-Pr) | Me | C(=O)Me | O |
| D-1559 | H | $CH_2$ | Me | c-Pr | C(=O)(i-Pr) | Me | C(=O)Me | O |
| D-1560 | Me | $CH_2$ | H | c-Pr | C(=O)(i-Pr) | Me | C(=O)Me | O |
| D-1561 | H | CH(Me) | H | c-Pr | C(=O)(i-Pr) | Me | C(=O)Me | O |
| D-1562 | H | $CH_2CH_2$ | Me | c-Pr | C(=O)(i-Pr) | Me | C(=O)Me | O |
| D-1563 | Me | $CH_2CH_2$ | H | c-Pr | C(=O)(i-Pr) | Me | C(=O)Me | O |
| D-1564 | H | single bond | Me | c-Pr | C(=O)Ph | Cl | Me | O |
| D-1565 | Me | single bond | H | c-Pr | C(=O)Ph | Cl | Me | O |
| D-1566 | Me(R) | single bond | H | c-Pr | C(=O)Ph | Cl | Me | O |
| D-1567 | Me(S) | single bond | H | c-Pr | C(=O)Ph | Cl | Me | O |
| D-1568 | H | $CH_2$ | Me | c-Pr | C(=O)Ph | Cl | Me | O |
| D-1569 | Me | $CH_2$ | H | c-Pr | C(=O)Ph | Cl | Me | O |
| D-1570 | H | CH(Me) | H | c-Pr | C(=O)Ph | Cl | Me | O |
| D-1571 | H | $CH_2CH_2$ | Me | c-Pr | C(=O)Ph | Cl | Me | O |
| D-1572 | Me | $CH_2CH_2$ | H | c-Pr | C(=O)Ph | Cl | Me | O |
| D-1573 | H | single bond | Me | c-Pr | C(=O)Ph | Me | Me | O |
| D-1574 | Me | single bond | H | c-Pr | C(=O)Ph | Me | Me | O |
| D-1575 | Me(R) | single bond | H | c-Pr | C(=O)Ph | Me | Me | O |
| D-1576 | Me(S) | single bond | H | c-Pr | C(=O)Ph | Me | Me | O |
| D-1577 | H | $CH_2$ | Me | c-Pr | C(=O)Ph | Me | Me | O |
| D-1578 | Me | $CH_2$ | H | c-Pr | C(=O)Ph | Me | Me | O |

TABLE 681

| Compound Number | Y | W | Z | $R^1$ | $R^2$ | $R^3$ | $R^{10}$ | A |
|---|---|---|---|---|---|---|---|---|
| D-1579 | H | CH(Me) | H | c-Pr | C(=O)Ph | Me | Me | O |
| D-1580 | H | $CH_2CH_2$ | Me | c-Pr | C(=O)Ph | Me | Me | O |
| D-1581 | Me | $CH_2CH_2$ | H | c-Pr | C(=O)Ph | Me | Me | O |
| D-1582 | H | single bond | Me | c-Pr | C(=O)Ph | Cl | Et | O |
| D-1583 | Me | single bond | H | c-Pr | C(=O)Ph | Cl | Et | O |
| D-1584 | Me(R) | single bond | H | c-Pr | C(=O)Ph | Cl | Et | O |
| D-1585 | Me(S) | single bond | H | c-Pr | C(=O)Ph | Cl | Et | O |
| D-1586 | H | $CH_2$ | Me | c-Pr | C(=O)Ph | Cl | Et | O |
| D-1587 | Me | $CH_2$ | H | c-Pr | C(=O)Ph | Cl | Et | O |
| D-1588 | H | CH(Me) | H | c-Pr | C(=O)Ph | Cl | Et | O |

TABLE 681-continued

| Compound Number | Y | W | Z | $R^1$ | $R^2$ | $R^3$ | $R^{10}$ | A |
|---|---|---|---|---|---|---|---|---|
| D-1589 | H | $CH_2CH_2$ | Me | c-Pr | C(=O)Ph | Cl | Et | O |
| D-1590 | Me | $CH_2CH_2$ | H | c-Pr | C(=O)Ph | Cl | Et | O |
| D-1591 | H | single bond | Me | c-Pr | C(=O)Ph | Me | Et | O |
| D-1592 | Me | single bond | H | c-Pr | C(=O)Ph | Me | Et | O |
| D-1593 | Me(R) | single bond | H | c-Pr | C(=O)Ph | Me | Et | O |
| D-1594 | Me(S) | single bond | H | c-Pr | C(=O)Ph | Me | Et | O |
| D-1595 | H | $CH_2$ | Me | c-Pr | C(=O)Ph | Me | Et | O |
| D-1596 | Me | $CH_2$ | H | c-Pr | C(=O)Ph | Me | Et | O |
| D-1597 | H | CH(Me) | H | c-Pr | C(=O)Ph | Me | Et | O |
| D-1598 | H | $CH_2CH_2$ | Me | c-Pr | C(=O)Ph | Me | Et | O |
| D-1599 | Me | $CH_2CH_2$ | H | c-Pr | C(=O)Ph | Me | Et | O |
| D-1600 | H | single bond | Me | c-Pr | C(=O)Ph | Cl | $CH_2CF_3$ | O |
| D-1601 | Me | single bond | H | c-Pr | C(=O)Ph | Cl | $CH_2CF_3$ | O |
| D-1602 | Me(R) | single bond | H | c-Pr | C(=O)Ph | Cl | $CH_2CF_3$ | O |
| D-1603 | Me(S) | single bond | H | c-Pr | C(=O)Ph | Cl | $CH_2CF_3$ | O |
| D-1604 | H | $CH_2$ | Me | c-Pr | C(=O)Ph | Cl | $CH_2CF_3$ | O |
| D-1605 | Me | $CH_2$ | H | c-Pr | C(=O)Ph | Cl | $CH_2CF_3$ | O |
| D-1606 | H | CH(Me) | H | c-Pr | C(=O)Ph | Cl | $CH_2CF_3$ | O |
| D-1607 | H | $CH_2CH_2$ | Me | c-Pr | C(=O)Ph | Cl | $CH_2CF_3$ | O |
| D-1608 | Me | $CH_2CH_2$ | H | c-Pr | C(=O)Ph | Cl | $CH_2CF_3$ | O |
| D-1609 | H | single bond | Me | c-Pr | C(=O)Ph | Me | $CH_2CF_3$ | O |
| D-1610 | Me | single bond | H | c-Pr | C(=O)Ph | Me | $CH_2CF_3$ | O |
| D-1611 | Me(R) | single bond | H | c-Pr | C(=O)Ph | Me | $CH_2CF_3$ | O |
| D-1612 | Me(S) | single bond | H | c-Pr | C(=O)Ph | Me | $CH_2CF_3$ | O |
| D-1613 | H | $CH_2$ | Me | c-Pr | C(=O)Ph | Me | $CH_2CF_3$ | O |
| D-1614 | Me | $CH_2$ | H | c-Pr | C(=O)Ph | Me | $CH_2CF_3$ | O |
| D-1615 | H | CH(Me) | H | c-Pr | C(=O)Ph | Me | $CH_2CF_3$ | O |
| D-1616 | H | $CH_2CH_2$ | Me | c-Pr | C(=O)Ph | Me | $CH_2CF_3$ | O |
| D-1617 | Me | $CH_2CH_2$ | H | c-Pr | C(=O)Ph | Me | $CH_2CF_3$ | O |
| D-1618 | H | single bond | Me | c-Pr | C(=O)Ph | Cl | $CH_2OMe$ | O |
| D-1619 | Me | single bond | H | c-Pr | C(=O)Ph | Cl | $CH_2OMe$ | O |
| D-1620 | Me(R) | single bond | H | c-Pr | C(=O)Ph | Cl | $CH_2OMe$ | O |
| D-1621 | Me(S) | single bond | H | c-Pr | C(=O)Ph | Cl | $CH_2OMe$ | O |
| D-1622 | H | $CH_2$ | Me | c-Pr | C(=O)Ph | Cl | $CH_2OMe$ | O |

TABLE 682

| Compound Number | Y | W | Z | $R^1$ | $R^2$ | $R^3$ | $R^{10}$ | A |
|---|---|---|---|---|---|---|---|---|
| D-1623 | Me | $CH_2$ | H | c-Pr | C(=O)Ph | Cl | $CH_2OMe$ | O |
| D-1624 | H | CH(Me) | H | c-Pr | C(=O)Ph | Cl | $CH_2OMe$ | O |
| D-1625 | H | $CH_2CH_2$ | Me | c-Pr | C(=O)Ph | Cl | $CH_2OMe$ | O |
| D-1626 | Me | $CH_2CH_2$ | H | c-Pr | C(=O)Ph | Cl | $CH_2OMe$ | O |
| D-1627 | H | single bond | Me | c-Pr | C(=O)Ph | Me | $CH_2OMe$ | O |
| D-1628 | Me | single bond | H | c-Pr | C(=O)Ph | Me | $CH_2OMe$ | O |
| D-1629 | Me(R) | single bond | H | c-Pr | C(=O)Ph | Me | $CH_2OMe$ | O |
| D-1630 | Me(S) | single bond | H | c-Pr | C(=O)Ph | Me | $CH_2OMe$ | O |
| D-1631 | H | $CH_2$ | Me | c-Pr | C(=O)Ph | Me | $CH_2OMe$ | O |
| D-1632 | Me | $CH_2$ | H | c-Pr | C(=O)Ph | Me | $CH_2OMe$ | O |
| D-1633 | H | CH(Me) | H | c-Pr | C(=O)Ph | Me | $CH_2OMe$ | O |
| D-1634 | H | $CH_2CH_2$ | Me | c-Pr | C(=O)Ph | Me | $CH_2OMe$ | O |
| D-1635 | Me | $CH_2CH_2$ | H | c-Pr | C(=O)Ph | Me | $CH_2OMe$ | O |
| D-1636 | H | single bond | Me | c-Pr | C(=O)Ph | Cl | $CH_2CN$ | O |
| D-1637 | Me | single bond | H | c-Pr | C(=O)Ph | Cl | $CH_2CN$ | O |
| D-1638 | Me(R) | single bond | H | c-Pr | C(=O)Ph | Cl | $CH_2CN$ | O |
| D-1639 | Me(S) | single bond | H | c-Pr | C(=O)Ph | Cl | $CH_2CN$ | O |
| D-1640 | H | $CH_2$ | Me | c-Pr | C(=O)Ph | Cl | $CH_2CN$ | O |
| D-1641 | Me | $CH_2$ | H | c-Pr | C(=O)Ph | Cl | $CH_2CN$ | O |
| D-1642 | H | CH(Me) | H | c-Pr | C(=O)Ph | Cl | $CH_2CN$ | O |
| D-1643 | H | $CH_2CH_2$ | Me | c-Pr | C(=O)Ph | Cl | $CH_2CN$ | O |
| D-1644 | Me | $CH_2CH_2$ | H | c-Pr | C(=O)Ph | Cl | $CH_2CN$ | O |
| D-1645 | H | single bond | Me | c-Pr | C(=O)Ph | Me | $CH_2CN$ | O |
| D-1646 | Me | single bond | H | c-Pr | C(=O)Ph | Me | $CH_2CN$ | O |
| D-1647 | Me(R) | single bond | H | c-Pr | C(=O)Ph | Me | $CH_2CN$ | O |
| D-1648 | Me(S) | single bond | H | c-Pr | C(=O)Ph | Me | $CH_2CN$ | O |
| D-1649 | H | $CH_2$ | Me | c-Pr | C(=O)Ph | Me | $CH_2CN$ | O |
| D-1650 | Me | $CH_2$ | H | c-Pr | C(=O)Ph | Me | $CH_2CN$ | O |
| D-1651 | H | CH(Me) | H | c-Pr | C(=O)Ph | Me | $CH_2CN$ | O |
| D-1652 | H | $CH_2CH_2$ | Me | c-Pr | C(=O)Ph | Me | $CH_2CN$ | O |
| D-1653 | Me | $CH_2CH_2$ | H | c-Pr | C(=O)Ph | Me | $CH_2CN$ | O |
| D-1654 | H | single bond | Me | c-Pr | C(=O)Ph | Cl | C(=O)Me | O |
| D-1655 | Me | single bond | H | c-Pr | C(=O)Ph | Cl | C(=O)Me | O |

TABLE 682-continued

| Compound Number | Y | W | Z | $R^1$ | $R^2$ | $R^3$ | $R^{10}$ | A |
|---|---|---|---|---|---|---|---|---|
| D-1656 | Me(R) | single bond | H | c-Pr | C(═O)Ph | Cl | C(═O)Me | O |
| D-1657 | Me(S) | single bond | H | c-Pr | C(═O)Ph | Cl | C(═O)Me | O |
| D-1658 | H | $CH_2$ | Me | c-Pr | C(═O)Ph | Cl | C(═O)Me | O |
| D-1659 | Me | $CH_2$ | H | c-Pr | C(═O)Ph | Cl | C(═O)Me | O |
| D-1660 | H | CH(Me) | H | c-Pr | C(═O)Ph | Cl | C(═O)Me | O |
| D-1661 | H | $CH_2CH_2$ | Me | c-Pr | C(═O)Ph | Cl | C(═O)Me | O |
| D-1662 | Me | $CH_2CH_2$ | H | c-Pr | C(═O)Ph | Cl | C(═O)Me | O |
| D-1663 | H | single bond | Me | c-Pr | C(═O)Ph | Me | C(═O)Me | O |
| D-1664 | Me | single bond | H | c-Pr | C(═O)Ph | Me | C(═O)Me | O |
| D-1665 | Me(R) | single bond | H | c-Pr | C(═O)Ph | Me | C(═O)Me | O |
| D-1666 | Me(S) | single bond | H | c-Pr | C(═O)Ph | Me | C(═O)Me | O |

TABLE 683

| Compound Number | Y | W | Z | $R^1$ | $R^2$ | $R^3$ | $R^{10}$ | A |
|---|---|---|---|---|---|---|---|---|
| D-1667 | H | CH | Me | c-Pr | C(═O)Ph | Me | C(═O)Me | O |
| D-1668 | Me | $CH_2$ | H | c-Pr | C(═O)Ph | Me | C(═O)Me | O |
| D-1669 | H | CH(Me) | H | c-Pr | C(═O)Ph | Me | C(═O)Me | O |
| D-1670 | H | $CH_2CH_2$ | Me | c-Pr | C(═O)Ph | Me | C(═O)Me | O |
| D-1671 | Me | $CH_2CH_2$ | H | c-Pr | C(═O)Ph | Me | C(═O)Me | O |
| D-1672 | H | single bond | Me | c-Pr | C(═O)OEt | Cl | Me | O |
| D-1673 | H | single bond | Et | c-Pr | C(═O)OEt | Cl | Me | O |
| D-1674 | Me | single bond | H | c-Pr | C(═O)OEt | Cl | Me | O |
| D-1675 | Me(R) | single bond | H | c-Pr | C(═O)OEt | Cl | Me | O |
| D-1676 | Me(S) | single bond | H | c-Pr | C(═O)OEt | Cl | Me | O |
| D-1677 | H | $CH_2$ | Me | c-Pr | C(═O)OEt | Cl | Me | O |
| D-1678 | Me | $CH_2$ | H | c-Pr | C(═O)OEt | Cl | Me | O |
| D-1679 | H | CH(Me) | H | c-Pr | C(═O)OEt | Cl | Me | O |
| D-1680 | H | $CH_2CH_2$ | Me | c-Pr | C(═O)OEt | Cl | Me | O |
| D-1681 | Me | $CH_2CH_2$ | H | c-Pr | C(═O)OEt | Cl | Me | O |
| D-1682 | H | single bond | Me | c-Pr | C(═O)OEt | Me | Me | O |
| D-1683 | Me | single bond | H | c-Pr | C(═O)OEt | Me | Me | O |
| D-1684 | Me(R) | single bond | H | c-Pr | C(═O)OEt | Me | Me | O |
| D-1685 | Me(S) | single bond | H | c-Pr | C(═O)OEt | Me | Me | O |
| D-1686 | H | $CH_2$ | Me | c-Pr | C(═O)OEt | Me | Me | O |
| D-1687 | Me | $CH_2$ | H | c-Pr | C(═O)OEt | Me | Me | O |
| D-1688 | H | CH(Me) | H | c-Pr | C(═O)OEt | Me | Me | O |
| D-1689 | H | $CH_2CH_2$ | Me | c-Pr | C(═O)OEt | Me | Me | O |
| D-1690 | Me | $CH_2CH_2$ | H | c-Pr | C(═O)OEt | Me | Me | O |
| D-1691 | H | single bond | Me | c-Pr | C(═O)OEt | Cl | Et | O |
| D-1692 | Me | single bond | H | c-Pr | C(═O)OEt | Cl | Et | O |
| D-1693 | Me(R) | single bond | H | c-Pr | C(═O)OEt | Cl | Et | O |
| D-1694 | Me(S) | single bond | H | c-Pr | C(═O)OEt | Cl | Et | O |
| D-1695 | H | $CH_2$ | Me | c-Pr | C(═O)OEt | Cl | Et | O |
| D-1696 | Me | $CH_2$ | H | c-Pr | C(═O)OEt | Cl | Et | O |
| D-1697 | H | CH(Me) | H | c-Pr | C(═O)OEt | Cl | Et | O |
| D-1698 | H | $CH_2CH_2$ | Me | c-Pr | C(═O)OEt | Cl | Et | O |
| D-1699 | Me | $CH_2CH_2$ | H | c-Pr | C(═O)OEt | Cl | Et | O |
| D-1700 | H | single bond | Me | c-Pr | C(═O)OEt | Me | Et | O |
| D-1701 | Me | single bond | H | c-Pr | C(═O)OEt | Me | Et | O |
| D-1702 | Me(R) | single bond | H | c-Pr | C(═O)OEt | Me | Et | O |
| D-1703 | Me(S) | single bond | H | c-Pr | C(═O)OEt | Me | Et | O |
| D-1704 | H | $CH_2$ | Me | c-Pr | C(═O)OEt | Me | Et | O |
| D-1705 | Me | $CH_2$ | H | c-Pr | C(═O)OEt | Me | Et | O |
| D-1706 | H | CH(Me) | H | c-Pr | C(═O)OEt | Me | Et | O |
| D-1707 | H | $CH_2CH_2$ | Me | c-Pr | C(═O)OEt | Me | Et | O |
| D-1708 | Me | $CH_2CH_2$ | H | c-Pr | C(═O)OEt | Me | Et | O |
| D-1709 | H | single bond | Me | c-Pr | C(═O)OEt | Cl | $CH_2CF_3$ | O |
| D-1710 | Me | single bond | H | c-Pr | C(═O)OEt | Cl | $CH_2CF_3$ | O |

TABLE 684

| Compound Number | Y | W | Z | $R^1$ | $R^2$ | $R^3$ | $R^{10}$ | A |
|---|---|---|---|---|---|---|---|---|
| D-1711 | Me(R) | single bond | H | c-Pr | C(═O)OEt | Cl | $CH_2CF_3$ | O |
| D-1712 | Me(S) | single bond | H | c-Pr | C(═O)OEt | Cl | $CH_2CF_3$ | O |
| D-1713 | H | $CH_2$ | Me | c-Pr | C(═O)OEt | Cl | $CH_2CF_3$ | O |

TABLE 684-continued

| Compound Number | Y | W | Z | $R^1$ | $R^2$ | $R^3$ | $R^{10}$ | A |
|---|---|---|---|---|---|---|---|---|
| D-1714 | Me | $CH_2$ | H | c-Pr | C(=O)OEt | Cl | $CH_2CF_3$ | O |
| D-1715 | H | CH(Me) | H | c-Pr | C(=O)OEt | Cl | $CH_2CF_3$ | O |
| D-1716 | H | $CH_2CH_2$ | Me | c-Pr | C(=O)OEt | Cl | $CH_2CF_3$ | O |
| D-1717 | Me | $CH_2CH_2$ | H | c-Pr | C(=O)OEt | Cl | $CH_2CF_3$ | O |
| D-1718 | H | single bond | Me | c-Pr | C(=O)OEt | Me | $CH_2CF_3$ | O |
| D-1719 | Me | single bond | H | c-Pr | C(=O)OEt | Me | $CH_2CF_3$ | O |
| D-1720 | Me(R) | single bond | H | c-Pr | C(=O)OEt | Me | $CH_2CF_3$ | O |
| D-1721 | Me(S) | single bond | H | c-Pr | C(=O)OEt | Me | $CH_2CF_3$ | O |
| D-1722 | H | $CH_2$ | Me | c-Pr | C(=O)OEt | Me | $CH_2CF_3$ | O |
| D-1723 | Me | $CH_2$ | H | c-Pr | C(=O)OEt | Me | $CH_2CF_3$ | O |
| D-1724 | H | CH(Me) | H | c-Pr | C(=O)OEt | Me | $CH_2CF_3$ | O |
| D-1725 | H | $CH_2CH_2$ | Me | c-Pr | C(=O)OEt | Me | $CH_2CF_3$ | O |
| D-1726 | Me | $CH_2CH_2$ | H | c-Pr | C(=O)OEt | Me | $CH_2CF_3$ | O |
| D-1727 | H | single bond | Me | c-Pr | C(=O)OEt | Cl | $CH_2OMe$ | O |
| D-1728 | Me | single bond | H | c-Pr | C(=O)OEt | Cl | $CH_2OMe$ | O |
| D-1729 | Me(R) | single bond | H | c-Pr | C(=O)OEt | Cl | $CH_2OMe$ | O |
| D-1730 | Me(S) | single bond | H | c-Pr | C(=O)OEt | Cl | $CH_2OMe$ | O |
| D-1731 | H | $CH_2$ | Me | c-Pr | C(=O)OEt | Cl | $CH_2OMe$ | O |
| D-1732 | Me | $CH_2$ | H | c-Pr | C(=O)OEt | Cl | $CH_2OMe$ | O |
| D-1733 | H | CH(Me) | H | c-Pr | C(=O)OEt | Cl | $CH_2OMe$ | O |
| D-1734 | H | $CH_2CH_2$ | Me | c-Pr | C(=O)OEt | Cl | $CH_2OMe$ | O |
| D-1735 | Me | $CH_2CH_2$ | H | c-Pr | C(=O)OEt | Cl | $CH_2OMe$ | O |
| D-1736 | H | single bond | Me | c-Pr | C(=O)OEt | Me | $CH_2OMe$ | O |
| D-1737 | Me | single bond | H | c-Pr | C(=O)OEt | Me | $CH_2OMe$ | O |
| D-1738 | Me(R) | single bond | H | c-Pr | C(=O)OEt | Me | $CH_2OMe$ | O |
| D-1739 | Me(S) | single bond | H | c-Pr | C(=O)OEt | Me | $CH_2OMe$ | O |
| D-1740 | H | $CH_2$ | Me | c-Pr | C(=O)OEt | Me | $CH_2OMe$ | O |
| D-1741 | Me | $CH_2$ | H | c-Pr | C(=O)OEt | Me | $CH_2OMe$ | O |
| D-1742 | H | CH(Me) | H | c-Pr | C(=O)OEt | Me | $CH_2OMe$ | O |
| D-1743 | H | $CH_2CH_2$ | Me | c-Pr | C(=O)OEt | Me | $CH_2OMe$ | O |
| D-1744 | Me | $CH_2CH_2$ | H | c-Pr | C(=O)OEt | Me | $CH_2OMe$ | O |
| D-1745 | H | single bond | Me | c-Pr | C(=O)OEt | Cl | $CH_2CN$ | O |
| D-1746 | Me | single bond | H | c-Pr | C(=O)OEt | Cl | $CH_2CN$ | O |
| D-1747 | Me(R) | single bond | H | c-Pr | C(=O)OEt | Cl | $CH_2CN$ | O |
| D-1748 | Me(S) | single bond | H | c-Pr | C(=O)OEt | Cl | $CH_2CN$ | O |
| D-1749 | H | $CH_2$ | Me | c-Pr | C(=O)OEt | Cl | $CH_2CN$ | O |
| D-1750 | Me | $CH_2$ | H | c-Pr | C(=O)OEt | Cl | $CH_2CN$ | O |
| D-1751 | H | CH(Me) | H | c-Pr | C(=O)OEt | Cl | $CH_2CN$ | O |
| D-1752 | H | $CH_2CH_2$ | Me | c-Pr | C(=O)OEt | Cl | $CH_2CN$ | O |
| D-1753 | Me | $CH_2CH_2$ | H | c-Pr | C(=O)OEt | Cl | $CH_2CN$ | O |
| D-1754 | H | single bond | Me | c-Pr | C(=O)OEt | Me | $CH_2CN$ | O |

TABLE 685

| Compound Number | Y | W | Z | $R^1$ | $R^2$ | $R^3$ | $R^{10}$ | A |
|---|---|---|---|---|---|---|---|---|
| D-1755 | Me | single bond | H | c-Pr | C(=O)OEt | Me | $CH_2CN$ | O |
| D-1756 | Me(R) | single bond | H | c-Pr | C(=O)OEt | Me | $CH_2CN$ | O |
| D-1757 | Me(S) | single bond | H | c-Pr | C(=O)OEt | Me | $CH_2CN$ | O |
| D-1758 | H | $CH_2$ | Me | c-Pr | C(=O)OEt | Me | $CH_2CN$ | O |
| D-1759 | Me | $CH_2$ | H | c-Pr | C(=O)OEt | Me | $CH_2CN$ | O |
| D-1760 | H | CH(Me) | H | c-Pr | C(=O)OEt | Me | $CH_2CN$ | O |
| D-1761 | H | $CH_2CH_2$ | Me | c-Pr | C(=O)OEt | Me | $CH_2CN$ | O |
| D-1762 | Me | $CH_2CH_2$ | H | c-Pr | C(=O)OEt | Me | $CH_2CN$ | O |
| D-1763 | H | single bond | Me | c-Pr | C(=O)OEt | Cl | C(=O)Me | O |
| D-1764 | Me | single bond | H | c-Pr | C(=O)OEt | Cl | C(=O)Me | O |
| D-1765 | Me(R) | single bond | H | c-Pr | C(=O)OEt | Cl | C(=O)Me | O |
| D-1766 | Me(S) | single bond | H | c-Pr | C(=O)OEt | Cl | C(=O)Me | O |
| D-1767 | H | $CH_2$ | Me | c-Pr | C(=O)OEt | Cl | C(=O)Me | O |
| D-1768 | Me | $CH_2$ | H | c-Pr | C(=O)OEt | Cl | C(=O)Me | O |
| D-1769 | H | CH(Me) | H | c-Pr | C(=O)OEt | Cl | C(=O)Me | O |
| D-1770 | H | $CH_2CH_2$ | Me | c-Pr | C(=O)OEt | Cl | C(=O)Me | O |
| D-1771 | Me | $CH_2CH_2$ | H | c-Pr | C(=O)OEt | Cl | C(=O)Me | O |
| D-1772 | H | single bond | Me | c-Pr | C(=O)OEt | Me | C(=O)Me | O |
| D-1773 | Me | single bond | H | c-Pr | C(=O)OEt | Me | C(=O)Me | O |
| D-1774 | Me(R) | single bond | H | c-Pr | C(=O)OEt | Me | C(=O)Me | O |
| D-1775 | Me(S) | single bond | H | c-Pr | C(=O)OEt | Me | C(=O)Me | O |
| D-1776 | H | $CH_2$ | Me | c-Pr | C(=O)OEt | Me | C(=O)Me | O |
| D-1777 | Me | $CH_2$ | H | c-Pr | C(=O)OEt | Me | C(=O)Me | O |
| D-1778 | H | CH(Me) | H | c-Pr | C(=O)OEt | Me | C(=O)Me | O |

TABLE 685-continued

| Compound Number | Y | W | Z | $R^1$ | $R^2$ | $R^3$ | $R^{10}$ | A |
|---|---|---|---|---|---|---|---|---|
| D-1779 | H | $CH_2CH_2$ | Me | c-Pr | C(=O)OEt | Me | C(=O)Me | O |
| D-1780 | Me | $CH_2CH_2$ | H | c-Pr | C(=O)OEt | Me | C(=O)Me | O |
| D-1781 | H | single bond | Me | c-Pr | $S(=O)_2Me$ | Cl | Me | O |
| D-1782 | H | single bond | Et | c-Pr | $S(=O)_2Me$ | Cl | Me | O |
| D-1783 | Me | single bond | H | c-Pr | $S(=O)_2Me$ | Cl | Me | O |
| D-1784 | Me(R) | single bond | H | c-Pr | $S(=O)_2Me$ | Cl | Me | O |
| D-1785 | Me(S) | single bond | H | c-Pr | $S(=O)_2Me$ | Cl | Me | O |
| D-1786 | H | $CH_2$ | Me | c-Pr | $S(=O)_2Me$ | Cl | Me | O |
| D-1787 | Me | $CH_2$ | H | c-Pr | $S(=O)_2Me$ | Cl | Me | O |
| D-1788 | H | CH(Me) | H | c-Pr | $S(=O)_2Me$ | Cl | Me | O |
| D-1789 | H | $CH_2CH_2$ | Me | c-Pr | $S(=O)_2Me$ | Cl | Me | O |
| D-1790 | Me | $CH_2CH_2$ | H | c-Pr | $S(=O)_2Me$ | Cl | Me | O |
| D-1791 | H | single bond | Me | c-Pr | $S(=O)_2Me$ | Me | Me | O |
| D-1792 | Me | single bond | H | c-Pr | $S(=O)_2Me$ | Me | Me | O |
| D-1793 | Me(R) | single bond | H | c-Pr | $S(=O)_2Me$ | Me | Me | O |
| D-1794 | Me(S) | single bond | H | c-Pr | $S(=O)_2Me$ | Me | Me | O |
| D-1795 | H | $CH_2$ | Me | c-Pr | $S(=O)_2Me$ | Me | Me | O |
| D-1796 | Me | $CH_2$ | H | c-Pr | $S(=O)_2Me$ | Me | Me | O |
| D-1797 | H | CH(Me) | H | c-Pr | $S(=O)_2Me$ | Me | Me | O |
| D-1798 | H | $CH_2CH_2$ | Me | c-Pr | $S(=O)_2Me$ | Me | Me | O |

TABLE 686

| Compound Number | Y | W | Z | $R^1$ | $R^2$ | $R^3$ | $R^{10}$ | A |
|---|---|---|---|---|---|---|---|---|
| D-1799 | Me | $CH_2CH_2$ | H | c-Pr | $S(=O)_2Me$ | Me | Me | O |
| D-1800 | H | single bond | Me | c-Pr | $S(=O)_2Me$ | Cl | Et | O |
| D-1801 | Me | single bond | H | c-Pr | $S(=O)_2Me$ | Cl | Et | O |
| D-1802 | Me(R) | single bond | H | c-Pr | $S(=O)_2Me$ | Cl | Et | O |
| D-1803 | Me(S) | single bond | H | c-Pr | $S(=O)_2Me$ | Cl | Et | O |
| D-1804 | H | $CH_2$ | Me | c-Pr | $S(=O)_2Me$ | Cl | Et | O |
| D-1805 | Me | $CH_2$ | H | c-Pr | $S(=O)_2Me$ | Cl | Et | O |
| D-1806 | H | CH(Me) | H | c-Pr | $S(=O)_2Me$ | Cl | Et | O |
| D-1807 | H | $CH_2CH_2$ | Me | c-Pr | $S(=O)_2Me$ | Cl | Et | O |
| D-1808 | Me | $CH_2CH_2$ | H | c-Pr | $S(=O)_2Me$ | Cl | Et | O |
| D-1809 | H | single bond | Me | c-Pr | $S(=O)_2Me$ | Me | Et | O |
| D-1810 | Me | single bond | H | c-Pr | $S(=O)_2Me$ | Me | Et | O |
| D-1811 | Me(R) | single bond | H | c-Pr | $S(=O)_2Me$ | Me | Et | O |
| D-1812 | Me(S) | single bond | H | c-Pr | $S(=O)_2Me$ | Me | Et | O |
| D-1813 | H | $CH_2$ | Me | c-Pr | $S(=O)_2Me$ | Me | Et | O |
| D-1814 | Me | $CH_2$ | H | c-Pr | $S(=O)_2Me$ | Me | Et | O |
| D-1815 | H | CH(Me) | H | c-Pr | $S(=O)_2Me$ | Me | Et | O |
| D-1816 | H | $CH_2CH_2$ | Me | c-Pr | $S(=O)_2Me$ | Me | Et | O |
| D-1817 | Me | $CH_2CH_2$ | H | c-Pr | $S(=O)_2Me$ | Me | Et | O |
| D-1818 | H | single bond | Me | c-Pr | $S(=O)_2Me$ | Cl | $CH_2CF_3$ | O |
| D-1819 | Me | single bond | H | c-Pr | $S(=O)_2Me$ | Cl | $CH_2CF_3$ | O |
| D-1820 | Me(R) | single bond | H | c-Pr | $S(=O)_2Me$ | Cl | $CH_2CF_3$ | O |
| D-1821 | Me(S) | single bond | H | c-Pr | $S(=O)_2Me$ | Cl | $CH_2CF_3$ | O |
| D-1822 | H | $CH_2$ | Me | c-Pr | $S(=O)_2Me$ | Cl | $CH_2CF_3$ | O |
| D-1823 | Me | $CH_2$ | H | c-Pr | $S(=O)_2Me$ | Cl | $CH_2CF_3$ | O |
| D-1824 | H | CH(Me) | H | c-Pr | $S(=O)_2Me$ | Cl | $CH_2CF_3$ | O |
| D-1825 | H | $CH_2CH_2$ | Me | c-Pr | $S(=O)_2Me$ | Cl | $CH_2CF_3$ | O |
| D-1826 | Me | $CH_2CH_2$ | H | c-Pr | $S(=O)_2Me$ | Cl | $CH_2CF_3$ | O |
| D-1827 | H | single bond | Me | c-Pr | $S(=O)_2Me$ | Me | $CH_2CF_3$ | O |
| D-1828 | Me | single bond | H | c-Pr | $S(=O)_2Me$ | Me | $CH_2CF_3$ | O |
| D-1829 | Me(R) | single bond | H | c-Pr | $S(=O)_2Me$ | Me | $CH_2CF_3$ | O |
| D-1830 | Me(S) | single bond | H | c-Pr | $S(=O)_2Me$ | Me | $CH_2CF_3$ | O |
| D-1831 | H | $CH_2$ | Me | c-Pr | $S(=O)_2Me$ | Me | $CH_2CF_3$ | O |
| D-1832 | Me | $CH_2$ | H | c-Pr | $S(=O)_2Me$ | Me | $CH_2CF_3$ | O |
| D-1833 | H | CH(Me) | H | c-Pr | $S(=O)_2Me$ | Me | $CH_2CF_3$ | O |
| D-1834 | H | $CH_2CH_2$ | Me | c-Pr | $S(=O)_2Me$ | Me | $CH_2CF_3$ | O |
| D-1835 | Me | $CH_2CH_2$ | H | c-Pr | $S(=O)_2Me$ | Me | $CH_2CF_3$ | O |
| D-1836 | H | single bond | Me | c-Pr | $S(=O)_2Me$ | Cl | $CH_2OMe$ | O |
| D-1837 | Me | single bond | H | c-Pr | $S(=O)_2Me$ | Cl | $CH_2OMe$ | O |
| D-1838 | Me(R) | single bond | H | c-Pr | $S(=O)_2Me$ | Cl | $CH_2OMe$ | O |
| D-1839 | Me(S) | single bond | H | c-Pr | $S(=O)_2Me$ | Cl | $CH_2OMe$ | O |
| D-1840 | H | $CH_2$ | Me | c-Pr | $S(=O)_2Me$ | Cl | $CH_2OMe$ | O |
| D-1841 | Me | $CH_2$ | H | c-Pr | $S(=O)_2Me$ | Cl | $CH_2OMe$ | O |
| D-1842 | H | CH(Me) | H | c-Pr | $S(=O)_2Me$ | Cl | $CH_2OMe$ | O |

TABLE 687

| Compound Number | Y | W | Z | $R^1$ | $R^2$ | $R^3$ | $R^{10}$ | A |
|---|---|---|---|---|---|---|---|---|
| D-1843 | H | $CH_2CH_2$ | Me | c-Pr | $S(=O)_2Me$ | Cl | $CH_2OMe$ | O |
| D-1844 | Me | $CH_2CH_2$ | H | c-Pr | $S(=O)_2Me$ | Cl | $CH_2OMe$ | O |
| D-1845 | H | single bond | Me | c-Pr | $S(=O)_2Me$ | Me | $CH_2OMe$ | O |
| D-1846 | Me | single bond | H | c-Pr | $S(=O)_2Me$ | Me | $CH_2OMe$ | O |
| D-1847 | Me(R) | single bond | H | c-Pr | $S(=O)_2Me$ | Me | $CH_2OMe$ | O |
| D-1848 | Me(S) | single bond | H | c-Pr | $S(=O)_2Me$ | Me | $CH_2OMe$ | O |
| D-1849 | H | $CH_2$ | Me | c-Pr | $S(=O)_2Me$ | Me | $CH_2OMe$ | O |
| D-1850 | Me | $CH_2$ | H | c-Pr | $S(=O)_2Me$ | Me | $CH_2OMe$ | O |
| D-1851 | H | CH(Me) | H | c-Pr | $S(=O)_2Me$ | Me | $CH_2OMe$ | O |
| D-1852 | H | $CH_2CH_2$ | Me | c-Pr | $S(=O)_2Me$ | Me | $CH_2OMe$ | O |
| D-1853 | Me | $CH_2CH_2$ | H | c-Pr | $S(=O)_2Me$ | Me | $CH_2OMe$ | O |
| D-1854 | H | single bond | Me | c-Pr | $S(=O)_2Me$ | Cl | $CH_2CN$ | O |
| D-1855 | Me | single bond | H | c-Pr | $S(=O)_2Me$ | Cl | $CH_2CN$ | O |
| D-1856 | Me(R) | single bond | H | c-Pr | $S(=O)_2Me$ | Cl | $CH_2CN$ | O |
| D-1857 | Me(S) | single bond | H | c-Pr | $S(=O)_2Me$ | Cl | $CH_2CN$ | O |
| D-1858 | H | $CH_2$ | Me | c-Pr | $S(=O)_2Me$ | Cl | $CH_2CN$ | O |
| D-1859 | Me | $CH_2$ | H | c-Pr | $S(=O)_2Me$ | Cl | $CH_2CN$ | O |
| D-1860 | H | CH(Me) | H | c-Pr | $S(=O)_2Me$ | Cl | $CH_2CN$ | O |
| D-1861 | H | $CH_2CH_2$ | Me | c-Pr | $S(=O)_2Me$ | Cl | $CH_2CN$ | O |
| D-1862 | Me | $CH_2CH_2$ | H | c-Pr | $S(=O)_2Me$ | Cl | $CH_2CN$ | O |
| D-1863 | H | single bond | Me | c-Pr | $S(=O)_2Me$ | Me | $CH_2CN$ | O |
| D-1864 | Me | single bond | H | c-Pr | $S(=O)_2Me$ | Me | $CH_2CN$ | O |
| D-1865 | Me(R) | single bond | H | c-Pr | $S(=O)_2Me$ | Me | $CH_2CN$ | O |
| D-1866 | Me(S) | single bond | H | c-Pr | $S(=O)_2Me$ | Me | $CH_2CN$ | O |
| D-1867 | H | $CH_2$ | Me | c-Pr | $S(=O)_2Me$ | Me | $CH_2CN$ | O |
| D-1868 | Me | $CH_2$ | H | c-Pr | $S(=O)_2Me$ | Me | $CH_2CN$ | O |
| D-1869 | H | CH(Me) | H | c-Pr | $S(=O)_2Me$ | Me | $CH_2CN$ | O |
| D-1870 | H | $CH_2CH_2$ | Me | c-Pr | $S(=O)_2Me$ | Me | $CH_2CN$ | O |
| D-1871 | Me | $CH_2CH_2$ | H | c-Pr | $S(=O)_2Me$ | Me | $CH_2CN$ | O |
| D-1872 | H | single bond | Me | c-Pr | $S(=O)_2Me$ | Cl | C(=O)Me | O |
| D-1873 | Me | single bond | H | c-Pr | $S(=O)_2Me$ | Cl | C(=O)Me | O |
| D-1874 | Me(R) | single bond | H | c-Pr | $S(=O)_2Me$ | Cl | C(=O)Me | O |
| D-1875 | Me(S) | single bond | H | c-Pr | $S(=O)_2Me$ | Cl | C(=O)Me | O |
| D-1876 | H | $CH_2$ | Me | c-Pr | $S(=O)_2Me$ | Cl | C(=O)Me | O |
| D-1877 | Me | $CH_2$ | H | c-Pr | $S(=O)_2Me$ | Cl | C(=O)Me | O |
| D-1878 | H | CH(Me) | H | c-Pr | $S(=O)_2Me$ | Cl | C(=O)Me | O |
| D-1879 | H | $CH_2CH_2$ | Me | c-Pr | $S(=O)_2Me$ | Cl | C(=O)Me | O |
| D-1880 | Me | $CH_2CH_2$ | H | c-Pr | $S(=O)_2Me$ | Cl | C(=O)Me | O |
| D-1881 | H | single bond | Me | c-Pr | $S(=O)_2Me$ | Me | C(=O)Me | O |
| D-1882 | Me | single bond | H | c-Pr | $S(=O)_2Me$ | Me | C(=O)Me | O |
| D-1883 | Me(R) | single bond | H | c-Pr | $S(=O)_2Me$ | Me | C(=O)Me | O |
| D-1884 | Me(S) | single bond | H | c-Pr | $S(=O)_2Me$ | Me | C(=O)Me | O |
| D-1885 | H | $CH_2$ | Me | c-Pr | $S(=O)_2Me$ | Me | C(=O)Me | O |
| D-1886 | Me | $CH_2$ | H | c-Pr | $S(=O)_2Me$ | Me | C(=O)Me | O |

TABLE 688

| Compound Number | Y | W | Z | $R^1$ | $R^2$ | $R^3$ | $R^{10}$ | A |
|---|---|---|---|---|---|---|---|---|
| D-1887 | H | CH(Me) | H | c-Pr | $S(=O)_2Me$ | Me | C(=O)Me | O |
| D-1888 | H | $CH_2CH_2$ | Me | c-Pr | $S(=O)_2Me$ | Me | C(=O)Me | O |
| D-1889 | Me | $CH_2CH_2$ | H | c-Pr | $S(=O)_2Me$ | Me | C(=O)Me | O |
| D-1890 | H | single bond | Me | c-Pr | $S(=O)_2CF_3$ | Cl | Me | O |
| D-1891 | H | single bond | Et | c-Pr | $S(=O)_2CF_3$ | Cl | Me | O |
| D-1892 | Me | single bond | H | c-Pr | $S(=O)_2CF_3$ | Cl | Me | O |
| D-1893 | Me(R) | single bond | H | c-Pr | $S(=O)_2CF_3$ | Cl | Me | O |
| D-1894 | Me(S) | single bond | H | c-Pr | $S(=O)_2CF_3$ | Cl | Me | O |
| D-1895 | H | $CH_2$ | Me | c-Pr | $S(=O)_2CF_3$ | Cl | Me | O |
| D-1896 | Me | $CH_2$ | H | c-Pr | $S(=O)_2CF_3$ | Cl | Me | O |
| D-1897 | H | CH(Me) | H | c-Pr | $S(=O)_2CF_3$ | Cl | Me | O |
| D-1898 | H | $CH_2CH_2$ | Me | c-Pr | $S(=O)_2CF_3$ | Cl | Me | O |
| D-1899 | Me | $CH_2CH_2$ | H | c-Pr | $S(=O)_2CF_3$ | Cl | Me | O |
| D-1900 | H | single bond | Me | c-Pr | $S(=O)_2CF_3$ | Me | Me | O |
| D-1901 | Me | single bond | H | c-Pr | $S(=O)_2CF_3$ | Me | Me | O |
| D-1902 | Me(R) | single bond | H | c-Pr | $S(=O)_2CF_3$ | Me | Me | O |
| D-1903 | Me(S) | single bond | H | c-Pr | $S(=O)_2CF_3$ | Me | Me | O |
| D-1904 | H | $CH_2$ | Me | c-Pr | $S(=O)_2CF_3$ | Me | Me | O |
| D-1905 | Me | $CH_2$ | H | c-Pr | $S(=O)_2CF_3$ | Me | Me | O |
| D-1906 | H | CH(Me) | H | c-Pr | $S(=O)_2CF_3$ | Me | Me | O |
| D-1907 | H | $CH_2CH_2$ | Me | c-Pr | $S(=O)_2CF_3$ | Me | Me | O |
| D-1908 | Me | $CH_2CH_2$ | H | c-Pr | $S(=O)_2CF_3$ | Me | Me | O |
| D-1909 | H | single bond | Me | c-Pr | $S(=O)_2CF_3$ | Cl | Et | O |

TABLE 688-continued

| Compound Number | Y | W | Z | $R^1$ | $R^2$ | $R^3$ | $R^{10}$ | A |
|---|---|---|---|---|---|---|---|---|
| D-1910 | Me | single bond | H | c-Pr | $S(=O)_2CF_3$ | Cl | Et | O |
| D-1911 | Me(R) | single bond | H | c-Pr | $S(=O)_2CF_3$ | Cl | Et | O |
| D-1912 | Me(S) | single bond | H | c-Pr | $S(=O)_2CF_3$ | Cl | Et | O |
| D-1913 | H | $CH_2$ | Me | c-Pr | $S(=O)_2CF_3$ | Cl | Et | O |
| D-1914 | Me | $CH_2$ | H | c-Pr | $S(=O)_2CF_3$ | Cl | Et | O |
| D-1915 | H | CH(Me) | H | c-Pr | $S(=O)_2CF_3$ | Cl | Et | O |
| D-1916 | H | $CH_2CH_2$ | Me | c-Pr | $S(=O)_2CF_3$ | Cl | Et | O |
| D-1917 | Me | $CH_2CH_2$ | H | c-Pr | $S(=O)_2CF_3$ | Cl | Et | O |
| D-1918 | H | single bond | Me | c-Pr | $S(=O)_2CF_3$ | Me | Et | O |
| D-1919 | Me | single bond | H | c-Pr | $S(=O)_2CF_3$ | Me | Et | O |
| D-1920 | Me(R) | single bond | H | c-Pr | $S(=O)_2CF_3$ | Me | Et | O |
| D-1921 | Me(S) | single bond | H | c-Pr | $S(=O)_2CF_3$ | Me | Et | O |
| D-1922 | H | $CH_2$ | Me | c-Pr | $S(=O)_2CF_3$ | Me | Et | O |
| D-1923 | Me | $CH_2$ | H | c-Pr | $S(=O)_2CF_3$ | Me | Et | O |
| D-1924 | H | CH(Me) | H | c-Pr | $S(=O)_2CF_3$ | Me | Et | O |
| D-1925 | H | $CH_2CH_2$ | Me | c-Pr | $S(=O)_2CF_3$ | Me | Et | O |
| D-1926 | Me | $CH_2CH_2$ | H | c-Pr | $S(=O)_2CF_3$ | Me | Et | O |
| D-1927 | H | single bond | Me | c-Pr | $S(=O)_2CF_3$ | Cl | $CH_2CF_3$ | O |
| D-1928 | Me | single bond | H | c-Pr | $S(=O)_2CF_3$ | Cl | $CH_2CF_3$ | O |
| D-1929 | Me(R) | single bond | H | c-Pr | $S(=O)_2CF_3$ | Cl | $CH_2CF_3$ | O |
| D-1930 | Me(S) | single bond | H | c-Pr | $S(=O)_2CF_3$ | Cl | $CH_2CF_3$ | O |

TABLE 689

| Compound Number | Y | W | Z | $R^1$ | $R^2$ | $R^3$ | $R^{10}$ | A |
|---|---|---|---|---|---|---|---|---|
| D-1931 | H | $CH_2$ | Me | c-Pr | $S(=O)_2CF_3$ | Cl | $CH_2CF_3$ | O |
| D-1932 | Me | $CH_2$ | H | c-Pr | $S(=O)_2CF_3$ | Cl | $CH_2CF_3$ | O |
| D-1933 | H | CH(Me) | H | c-Pr | $S(=O)_2CF_3$ | Cl | $CH_2CF_3$ | O |
| D-1934 | H | $CH_2CH_2$ | Me | c-Pr | $S(=O)_2CF_3$ | Cl | $CH_2CF_3$ | O |
| D-1935 | Me | $CH_2CH_2$ | H | c-Pr | $S(=O)_2CF_3$ | Cl | $CH_2CF_3$ | O |
| D-1936 | H | single bond | Me | c-Pr | $S(=O)_2CF_3$ | Me | $CH_2CF_3$ | O |
| D-1937 | Me | single bond | H | c-Pr | $S(=O)_2CF_3$ | Me | $CH_2CF_3$ | O |
| D-1938 | Me(R) | single bond | H | c-Pr | $S(=O)_2CF_3$ | Me | $CH_2CF_3$ | O |
| D-1939 | Me(S) | single bond | H | c-Pr | $S(=O)_2CF_3$ | Me | $CH_2CF_3$ | O |
| D-1940 | H | $CH_2$ | Me | c-Pr | $S(=O)_2CF_3$ | Me | $CH_2CF_3$ | O |
| D-1941 | Me | $CH_2$ | H | c-Pr | $S(=O)_2CF_3$ | Me | $CH_2CF_3$ | O |
| D-1942 | H | CH(Me) | H | c-Pr | $S(=O)_2CF_3$ | Me | $CH_2CF_3$ | O |
| D-1943 | H | $CH_2CH_2$ | Me | c-Pr | $S(=O)_2CF_3$ | Me | $CH_2CF_3$ | O |
| D-1944 | Me | $CH_2CH_2$ | H | c-Pr | $S(=O)_2CF_3$ | Me | $CH_2CF_3$ | O |
| D-1945 | H | single bond | Me | c-Pr | $S(=O)_2CF_3$ | Cl | $CH_2OMe$ | O |
| D-1946 | Me | single bond | H | c-Pr | $S(=O)_2CF_3$ | Cl | $CH_2OMe$ | O |
| D-1947 | Me(R) | single bond | H | c-Pr | $S(=O)_2CF_3$ | Cl | $CH_2OMe$ | O |
| D-1948 | Me(S) | single bond | H | c-Pr | $S(=O)_2CF_3$ | Cl | $CH_2OMe$ | O |
| D-1949 | H | $CH_2$ | Me | c-Pr | $S(=O)_2CF_3$ | Cl | $CH_2OMe$ | O |
| D-1950 | Me | $CH_2$ | H | c-Pr | $S(=O)_2CF_3$ | Cl | $CH_2OMe$ | O |
| D-1951 | H | CH(Me) | H | c-Pr | $S(=O)_2CF_3$ | Cl | $CH_2OMe$ | O |
| D-1952 | H | $CH_2CH_2$ | Me | c-Pr | $S(=O)_2CF_3$ | Cl | $CH_2OMe$ | O |
| D-1953 | Me | $CH_2CH_2$ | H | c-Pr | $S(=O)_2CF_3$ | Cl | $CH_2OMe$ | O |
| D-1954 | H | single bond | Me | c-Pr | $S(=O)_2CF_3$ | Me | $CH_2OMe$ | O |
| D-1955 | Me | single bond | H | c-Pr | $S(=O)_2CF_3$ | Me | $CH_2OMe$ | O |
| D-1956 | Me(R) | single bond | H | c-Pr | $S(=O)_2CF_3$ | Me | $CH_2OMe$ | O |
| D-1957 | Me(S) | single bond | H | c-Pr | $S(=O)_2CF_3$ | Me | $CH_2OMe$ | O |
| D-1958 | H | $CH_2$ | Me | c-Pr | $S(=O)_2CF_3$ | Me | $CH_2OMe$ | O |
| D-1959 | Me | $CH_2$ | H | c-Pr | $S(=O)_2CF_3$ | Me | $CH_2OMe$ | O |
| D-1960 | H | CH(Me) | H | c-Pr | $S(=O)_2CF_3$ | Me | $CH_2OMe$ | O |
| D-1961 | H | $CH_2CH_2$ | Me | c-Pr | $S(=O)_2CF_3$ | Me | $CH_2OMe$ | O |
| D-1962 | Me | $CH_2CH_2$ | H | c-Pr | $S(=O)_2CF_3$ | Me | $CH_2OMe$ | O |
| D-1963 | H | single bond | Me | c-Pr | $S(=O)_2CF_3$ | Cl | $CH_2CN$ | O |
| D-1964 | Me | single bond | H | c-Pr | $S(=O)_2CF_3$ | Cl | $CH_2CN$ | O |
| D-1965 | Me(R) | single bond | H | c-Pr | $S(=O)_2CF_3$ | Cl | $CH_2CN$ | O |
| D-1966 | Me(S) | single bond | H | c-Pr | $S(=O)_2CF_3$ | Cl | $CH_2CN$ | O |
| D-1967 | H | $CH_2$ | Me | c-Pr | $S(=O)_2CF_3$ | Cl | $CH_2CN$ | O |
| D-1968 | Me | $CH_2$ | H | c-Pr | $S(=O)_2CF_3$ | Cl | $CH_2CN$ | O |
| D-1969 | H | CH(Me) | H | c-Pr | $S(=O)_2CF_3$ | Cl | $CH_2CN$ | O |
| D-1970 | H | $CH_2CH_2$ | Me | c-Pr | $S(=O)_2CF_3$ | Cl | $CH_2CN$ | O |
| D-1971 | Me | $CH_2CH_2$ | H | c-Pr | $S(=O)_2CF_3$ | Cl | $CH_2CN$ | O |
| D-1972 | H | single bond | Me | c-Pr | $S(=O)_2CF_3$ | Me | $CH_2CN$ | O |
| D-1973 | Me | single bond | H | c-Pr | $S(=O)_2CF_3$ | Me | $CH_2CN$ | O |
| D-1974 | Me(R) | single bond | H | c-Pr | $S(=O)_2CF_3$ | Me | $CH_2CN$ | O |

TABLE 690

| Compound Number | Y | W | Z | $R^1$ | $R^2$ | $R^3$ | $R^{10}$ | A |
|---|---|---|---|---|---|---|---|---|
| D-1975 | Me(S) | single bond | H | c-Pr | $S(=O)_2CF_3$ | Me | $CH_2CN$ | O |
| D-1976 | H | $CH_2$ | Me | c-Pr | $S(=O)_2CF_3$ | Me | $CH_2CN$ | O |
| D-1977 | Me | $CH_2$ | H | c-Pr | $S(=O)_2CF_3$ | Me | $CH_2CN$ | O |
| D-1978 | H | CH(Me) | H | c-Pr | $S(=O)_2CF_3$ | Me | $CH_2CN$ | O |
| D-1979 | H | $CH_2CH_2$ | Me | c-Pr | $S(=O)_2CF_3$ | Me | $CH_2CN$ | O |
| D-1980 | Me | $CH_2CH_2$ | H | c-Pr | $S(=O)_2CF_3$ | Me | $CH_2CN$ | O |
| D-1981 | H | single bond | Me | c-Pr | $S(=O)_2CF_3$ | Cl | C(=O)Me | O |
| D-1982 | Me | single bond | H | c-Pr | $S(=O)_2CF_3$ | Cl | C(=O)Me | O |
| D-1983 | Me(R) | single bond | H | c-Pr | $S(=O)_2CF_3$ | Cl | C(=O)Me | O |
| D-1984 | Me(S) | single bond | H | c-Pr | $S(=O)_2CF_3$ | Cl | C(=O)Me | O |
| D-1985 | H | $CH_2$ | Me | c-Pr | $S(=O)_2CF_3$ | Cl | C(=O)Me | O |
| D-1986 | Me | $CH_2$ | H | c-Pr | $S(=O)_2CF_3$ | Cl | C(=O)Me | O |
| D-1987 | H | CH(Me) | H | c-Pr | $S(=O)_2CF_3$ | Cl | C(=O)Me | O |
| D-1988 | H | $CH_2CH_2$ | Me | c-Pr | $S(=O)_2CF_3$ | Cl | C(=O)Me | O |
| D-1989 | Me | $CH_2CH_2$ | H | c-Pr | $S(=O)_2CF_3$ | Cl | C(=O)Me | O |
| D-1990 | H | single bond | Me | c-Pr | $S(=O)_2CF_3$ | Me | C(=O)Me | O |
| D-1991 | Me | single bond | H | c-Pr | $S(=O)_2CF_3$ | Me | C(=O)Me | O |
| D-1992 | Me(R) | single bond | H | c-Pr | $S(=O)_2CF_3$ | Me | C(=O)Me | O |
| D-1993 | Me(S) | single bond | H | c-Pr | $S(=O)_2CF_3$ | Me | C(=O)Me | O |
| D-1994 | H | $CH_2$ | Me | c-Pr | $S(=O)_2CF_3$ | Me | C(=O)Me | O |
| D-1995 | Me | $CH_2$ | H | c-Pr | $S(=O)_2CF_3$ | Me | C(=O)Me | O |
| D-1996 | H | CH(Me) | H | c-Pr | $S(=O)_2CF_3$ | Me | C(=O)Me | O |
| D-1997 | H | $CH_2CH_2$ | Me | c-Pr | $S(=O)_2CF_3$ | Me | C(=O)Me | O |
| D-1998 | Me | $CH_2CH_2$ | H | c-Pr | $S(=O)_2CF_3$ | Me | C(=O)Me | O |
| D-1999 | H | single bond | Me | c-Pr | Me | Cl | Me | O |
| D-2000 | H | single bond | Et | c-Pr | Me | Cl | Me | O |
| D-2001 | Me | single bond | H | c-Pr | Me | Cl | Me | O |
| D-2002 | Me(R) | single bond | H | c-Pr | Me | Cl | Me | O |
| D-2003 | Me(S) | single bond | H | c-Pr | Me | Cl | Me | O |
| D-2004 | H | $CH_2$ | Me | c-Pr | Me | Cl | Me | O |
| D-2005 | Me | $CH_2$ | H | c-Pr | Me | Cl | Me | O |
| D-2006 | H | CH(Me) | H | c-Pr | Me | Cl | Me | O |
| D-2007 | H | $CH_2CH_2$ | Me | c-Pr | Me | Cl | Me | O |
| D-2008 | Me | $CH_2CH_2$ | H | c-Pr | Me | Cl | Me | O |
| D-2009 | H | single bond | Me | c-Pr | Me | Me | Me | O |
| D-2010 | Me | single bond | H | c-Pr | Me | Me | Me | O |
| D-2011 | Me(R) | single bond | H | c-Pr | Me | Me | Me | O |
| D-2012 | Me(S) | single bond | H | c-Pr | Me | Me | Me | O |
| D-2013 | H | $CH_2$ | Me | c-Pr | Me | Me | Me | O |
| D-2014 | Me | $CH_2$ | H | c-Pr | Me | Me | Me | O |
| D-2015 | H | CH(Me) | H | c-Pr | Me | Me | Me | O |
| D-2016 | H | $CH_2CH_2$ | Me | c-Pr | Me | Me | Me | O |
| D-2017 | Me | $CH_2CH_2$ | H | c-Pr | Me | Me | Me | O |
| D-2018 | H | single bond | Me | c-Pr | Me | Cl | Et | O |

TABLE 691

| Compound Number | Y | W | Z | $R^1$ | $R^2$ | $R^3$ | $R^{10}$ | A |
|---|---|---|---|---|---|---|---|---|
| D-2019 | Me | single bond | H | c-Pr | Me | Cl | Et | O |
| D-2020 | Me(R) | single bond | H | c-Pr | Me | Cl | Et | O |
| D-2021 | Me(S) | single bond | H | c-Pr | Me | Cl | Et | O |
| D-2022 | H | $CH_2$ | Me | c-Pr | Me | Cl | Et | O |
| D-2023 | Me | $CH_2$ | H | c-Pr | Me | Cl | Et | O |
| D-2024 | H | CH(Me) | H | c-Pr | Me | Cl | Et | O |
| D-2025 | H | $CH_2CH_2$ | Me | c-Pr | Me | Cl | Et | O |
| D-2026 | Me | $CH_2CH_2$ | H | c-Pr | Me | Cl | Et | O |
| D-2027 | H | single bond | Me | c-Pr | Me | Me | Et | O |
| D-2028 | Me | single bond | H | c-Pr | Me | Me | Et | O |
| D-2029 | Me(R) | single bond | H | c-Pr | Me | Me | Et | O |
| D-2030 | Me(S) | single bond | H | c-Pr | Me | Me | Et | O |
| D-2031 | H | $CH_2$ | Me | c-Pr | Me | Me | Et | O |
| D-2032 | Me | $CH_2$ | H | c-Pr | Me | Me | Et | O |
| D-2033 | H | CH(Me) | H | c-Pr | Me | Me | Et | O |
| D-2034 | H | $CH_2CH_2$ | Me | c-Pr | Me | Me | Et | O |
| D-2035 | Me | $CH_2CH_2$ | H | c-Pr | Me | Me | Et | O |
| D-2036 | H | single bond | Me | c-Pr | Me | Cl | $CH_2CF_3$ | O |
| D-2037 | Me | single bond | H | c-Pr | Me | Cl | $CH_2CF_3$ | O |
| D-2038 | Me(R) | single bond | H | c-Pr | Me | Cl | $CH_2CF_3$ | O |
| D-2039 | Me(S) | single bond | H | c-Pr | Me | Cl | $CH_2CF_3$ | O |
| D-2040 | H | $CH_2$ | Me | c-Pr | Me | Cl | $CH_2CF_3$ | O |
| D-2041 | Me | $CH_2$ | H | c-Pr | Me | Cl | $CH_2CF_3$ | O |
| D-2042 | H | CH(Me) | H | c-Pr | Me | Cl | $CH_2CF_3$ | O |

TABLE 691-continued

| Compound Number | Y | W | Z | $R^1$ | $R^2$ | $R^3$ | $R^{10}$ | A |
|---|---|---|---|---|---|---|---|---|
| D-2043 | H | $CH_2CH_2$ | Me | c-Pr | Me | Cl | $CH_2CF_3$ | O |
| D-2044 | Me | $CH_2CH_2$ | H | c-Pr | Me | Cl | $CH_2CF_3$ | O |
| D-2045 | H | single bond | Me | c-Pr | Me | Me | $CH_2CF_3$ | O |
| D-2046 | Me | single bond | H | c-Pr | Me | Me | $CH_2CF_3$ | O |
| D-2047 | Me(R) | single bond | H | c-Pr | Me | Me | $CH_2CF_3$ | O |
| D-2048 | Me(S) | single bond | H | c-Pr | Me | Me | $CH_2CF_3$ | O |
| D-2049 | H | $CH_2$ | Me | c-Pr | Me | Me | $CH_2CF_3$ | O |
| D-2050 | Me | $CH_2$ | H | c-Pr | Me | Me | $CH_2CF_3$ | O |
| D-2051 | H | CH(Me) | H | c-Pr | Me | Me | $CH_2CF_3$ | O |
| D-2052 | H | $CH_2CH_2$ | Me | c-Pr | Me | Me | $CH_2CF_3$ | O |
| D-2053 | Me | $CH_2CH_2$ | H | c-Pr | Me | Me | $CH_2CF_3$ | O |
| D-2054 | H | single bond | Me | c-Pr | Me | Cl | $CH_2OMe$ | O |
| D-2055 | Me | single bond | H | c-Pr | Me | Cl | $CH_2OMe$ | O |
| D-2056 | Me(R) | single bond | H | c-Pr | Me | Cl | $CH_2OMe$ | O |
| D-2057 | Me(S) | single bond | H | c-Pr | Me | Cl | $CH_2OMe$ | O |
| D-2058 | H | $CH_2$ | Me | c-Pr | Me | Cl | $CH_2OMe$ | O |
| D-2059 | Me | $CH_2$ | H | c-Pr | Me | Cl | $CH_2OMe$ | O |
| D-2060 | H | CH(Me) | H | c-Pr | Me | Cl | $CH_2OMe$ | O |
| D-2061 | H | $CH_2CH_2$ | Me | c-Pr | Me | Cl | $CH_2OMe$ | O |
| D-2062 | Me | $CH_2CH_2$ | H | c-Pr | Me | Cl | $CH_2OMe$ | O |

TABLE 692

| Compound Number | Y | W | Z | $R^1$ | $R^2$ | $R^3$ | $R^{10}$ | A |
|---|---|---|---|---|---|---|---|---|
| D-2063 | H | single bond | Me | c-Pr | Me | Me | $CH_2OMe$ | O |
| D-2064 | Me | single bond | H | c-Pr | Me | Me | $CH_2OMe$ | O |
| D-2065 | Me(R) | single bond | H | c-Pr | Me | Me | $CH_2OMe$ | O |
| D-2066 | Me(S) | single bond | H | c-Pr | Me | Me | $CH_2OMe$ | O |
| D-2067 | H | $CH_2$ | Me | c-Pr | Me | Me | $CH_2OMe$ | O |
| D-2068 | Me | $CH_2$ | H | c-Pr | Me | Me | $CH_2OMe$ | O |
| D-2069 | H | CH(Me) | H | c-Pr | Me | Me | $CH_2OMe$ | O |
| D-2070 | H | $CH_2CH_2$ | Me | c-Pr | Me | Me | $CH_2OMe$ | O |
| D-2071 | Me | $CH_2CH_2$ | H | c-Pr | Me | Me | $CH_2OMe$ | O |
| D-2072 | H | single bond | Me | c-Pr | Me | Cl | $CH_2CN$ | O |
| D-2073 | Me | single bond | H | c-Pr | Me | Cl | $CH_2CN$ | O |
| D-2074 | Me(R) | single bond | H | c-Pr | Me | Cl | $CH_2CN$ | O |
| D-2075 | Me(S) | single bond | H | c-Pr | Me | Cl | $CH_2CN$ | O |
| D-2076 | H | $CH_2$ | Me | c-Pr | Me | Cl | $CH_2CN$ | O |
| D-2077 | Me | $CH_2$ | H | c-Pr | Me | Cl | $CH_2CN$ | O |
| D-2078 | H | CH(Me) | H | c-Pr | Me | Cl | $CH_2CN$ | O |
| D-2079 | H | $CH_2CH_2$ | Me | c-Pr | Me | Cl | $CH_2CN$ | O |
| D-2080 | Me | $CH_2CH_2$ | H | c-Pr | Me | Cl | $CH_2CN$ | O |
| D-2081 | H | single bond | Me | c-Pr | Me | Me | $CH_2CN$ | O |
| D-2082 | Me | single bond | H | c-Pr | Me | Me | $CH_2CN$ | O |
| D-2083 | Me(R) | single bond | H | c-Pr | Me | Me | $CH_2CN$ | O |
| D-2084 | Me(S) | single bond | H | c-Pr | Me | Me | $CH_2CN$ | O |
| D-2085 | H | $CH_2$ | Me | c-Pr | Me | Me | $CH_2CN$ | O |

TABLE 692-continued

| Compound Number | Y | W | Z | $R^1$ | $R^2$ | $R^3$ | $R^{10}$ | A |
|---|---|---|---|---|---|---|---|---|
| D-2086 | Me | $CH_2$ | H | c-Pr | Me | Me | $CH_2CN$ | O |
| D-2087 | H | CH(Me) | H | c-Pr | Me | Me | $CH_2CN$ | O |
| D-2088 | H | $CH_2CH_2$ | Me | c-Pr | Me | Me | $CH_2CN$ | O |
| D-2089 | Me | $CH_2CH_2$ | H | c-Pr | Me | Me | $CH_2CN$ | O |
| D-2090 | H | single bond | Me | c-Pr | Me | Cl | C(═O)Me | O |
| D-2091 | Me | single bond | H | c-Pr | Me | Cl | C(═O)Me | O |
| D-2092 | Me(R) | single bond | H | c-Pr | Me | Cl | C(═O)Me | O |
| D-2093 | Me(S) | single bond | H | c-Pr | Me | Cl | C(═O)Me | O |
| D-2094 | H | $CH_2$ | Me | c-Pr | Me | Cl | C(═O)Me | O |
| D-2095 | Me | $CH_2$ | H | c-Pr | Me | Cl | C(═O)Me | O |
| D-2096 | H | CH(Me) | H | c-Pr | Me | Cl | C(═O)Me | O |
| D-2097 | H | $CH_2CH_2$ | Me | c-Pr | Me | Cl | C(═O)Me | O |
| D-2098 | Me | $CH_2CH_2$ | H | c-Pr | Me | Cl | C(═O)Me | O |
| D-2099 | H | single bond | Me | c-Pr | Me | Me | C(═O)Me | O |
| D-2100 | Me | single bond | H | c-Pr | Me | Me | C(═O)Me | O |
| D-2101 | Me(R) | single bond | H | c-Pr | Me | Me | C(═O)Me | O |
| D-2102 | Me(S) | single bond | H | c-Pr | Me | Me | C(═O)Me | O |
| D-2103 | H | $CH_2$ | Me | c-Pr | Me | Me | C(═O)Me | O |
| D-2104 | Me | $CH_2$ | H | c-Pr | Me | Me | C(═O)Me | O |
| D-2105 | H | CH(Me) | H | c-Pr | Me | Me | C(═O)Me | O |
| D-2106 | H | $CH_2CH_2$ | Me | c-Pr | Me | Me | C(═O)Me | O |

TABLE 693

| Compound Number | Y | W | Z | $R^1$ | $R^2$ | $R^3$ | $R^{10}$ | A |
|---|---|---|---|---|---|---|---|---|
| D-2107 | Me | $CH_2CH_2$ | H | c-Pr | Me | Me | C(═O)Me | O |
| D-2108 | H | single bond | Me | c-Pr | $CH_2OMe$ | Cl | Me | O |
| D-2109 | H | single bond | Et | c-Pr | $CH_2OMe$ | Cl | Me | O |
| D-2110 | Me | single bond | H | c-Pr | $CH_2OMe$ | Cl | Me | O |
| D-2111 | Me(R) | single bond | H | c-Pr | $CH_2OMe$ | Cl | Me | O |
| D-2112 | Me(S) | single bond | H | c-Pr | $CH_2OMe$ | Cl | Me | O |
| D-2113 | H | $CH_2$ | Me | c-Pr | $CH_2OMe$ | Cl | Me | O |
| D-2114 | Me | $CH_2$ | H | c-Pr | $CH_2OMe$ | Cl | Me | O |
| D-2115 | H | CH(Me) | H | c-Pr | $CH_2OMe$ | Cl | Me | O |
| D-2116 | H | $CH_2CH_2$ | Me | c-Pr | $CH_2OMe$ | Cl | Me | O |
| D-2117 | Me | $CH_2CH_2$ | H | c-Pr | $CH_2OMe$ | Cl | Me | O |
| D-2118 | H | single bond | Me | c-Pr | $CH_2OMe$ | Me | Me | O |
| D-2119 | Me | single bond | H | c-Pr | $CH_2OMe$ | Me | Me | O |
| D-2120 | Me(R) | single bond | H | c-Pr | $CH_2OMe$ | Me | Me | O |
| D-2121 | Me(S) | single bond | H | c-Pr | $CH_2OMe$ | Me | Me | O |
| D-2122 | H | $CH_2$ | Me | c-Pr | $CH_2OMe$ | Me | Me | O |
| D-2123 | Me | $CH_2$ | H | c-Pr | $CH_2OMe$ | Me | Me | O |
| D-2124 | H | CH(Me) | H | c-Pr | $CH_2OMe$ | Me | Me | O |
| D-2125 | H | $CH_2CH_2$ | Me | c-Pr | $CH_2OMe$ | Me | Me | O |
| D-2126 | Me | $CH_2CH_2$ | H | c-Pr | $CH_2OMe$ | Me | Me | O |
| D-2127 | H | single bond | Me | c-Pr | $CH_2OMe$ | Cl | Et | O |
| D-2128 | Me | single bond | H | c-Pr | $CH_2OMe$ | Cl | Et | O |
| D-2129 | Me(R) | single bond | H | c-Pr | $CH_2OMe$ | Cl | Et | O |
| D-2130 | Me(S) | single bond | H | c-Pr | $CH_2OMe$ | Cl | Et | O |
| D-2131 | H | $CH_2$ | Me | c-Pr | $CH_2OMe$ | Cl | Et | O |
| D-2132 | Me | $CH_2$ | H | c-Pr | $CH_2OMe$ | Cl | Et | O |
| D-2133 | H | CH(Me) | H | c-Pr | $CH_2OMe$ | Cl | Et | O |
| D-2134 | H | $CH_2CH_2$ | Me | c-Pr | $CH_2OMe$ | Cl | Et | O |
| D-2135 | Me | $CH_2CH_2$ | H | c-Pr | $CH_2OMe$ | Cl | Et | O |
| D-2136 | H | single bond | Me | c-Pr | $CH_2OMe$ | Me | Et | O |
| D-2137 | Me | single bond | H | c-Pr | $CH_2OMe$ | Me | Et | O |
| D-2138 | Me(R) | single bond | H | c-Pr | $CH_2OMe$ | Me | Et | O |
| D-2139 | Me(S) | single bond | H | c-Pr | $CH_2OMe$ | Me | Et | O |
| D-2140 | H | $CH_2$ | Me | c-Pr | $CH_2OMe$ | Me | Et | O |
| D-2141 | Me | $CH_2$ | H | c-Pr | $CH_2OMe$ | Me | Et | O |
| D-2142 | H | CH(Me) | H | c-Pr | $CH_2OMe$ | Me | Et | O |
| D-2143 | H | $CH_2CH_2$ | Me | c-Pr | $CH_2OMe$ | Me | Et | O |
| D-2144 | Me | $CH_2CH_2$ | H | c-Pr | $CH_2OMe$ | Me | Et | O |
| D-2145 | H | single bond | Me | c-Pr | $CH_2OMe$ | Cl | $CH_2CF_3$ | O |
| D-2146 | Me | single bond | H | c-Pr | $CH_2OMe$ | Cl | $CH_2CF_3$ | O |
| D-2147 | Me(R) | single bond | H | c-Pr | $CH_2OMe$ | Cl | $CH_2CF_3$ | O |
| D-2148 | Me(S) | single bond | H | c-Pr | $CH_2OMe$ | Cl | $CH_2CF_3$ | O |
| D-2149 | H | $CH_2$ | Me | c-Pr | $CH_2OMe$ | Cl | $CH_2CF_3$ | O |
| D-2150 | Me | $CH_2$ | H | c-Pr | $CH_2OMe$ | Cl | $CH_2CF_3$ | O |

TABLE 694

| Compound Number | Y | W | Z | $R^1$ | $R^2$ | $R^3$ | $R^{10}$ | A |
|---|---|---|---|---|---|---|---|---|
| D-2151 | H | CH(Me) | H | c-Pr | $CH_2OMe$ | Cl | $CH_2CF_3$ | O |
| D-2152 | H | $CH_2CH_2$ | Me | c-Pr | $CH_2OMe$ | Cl | $CH_2CF_3$ | O |
| D-2153 | Me | $CH_2CH_2$ | H | c-Pr | $CH_2OMe$ | Cl | $CH_2CF_3$ | O |
| D-2154 | H | single bond | Me | c-Pr | $CH_2OMe$ | Me | $CH_2CF_3$ | O |
| D-2155 | Me | single bond | H | c-Pr | $CH_2OMe$ | Me | $CH_2CF_3$ | O |
| D-2156 | Me(R) | single bond | H | c-Pr | $CH_2OMe$ | Me | $CH_2CF_3$ | O |
| D-2157 | Me(S) | single bond | H | c-Pr | $CH_2OMe$ | Me | $CH_2CF_3$ | O |
| D-2158 | H | $CH_2$ | Me | c-Pr | $CH_2OMe$ | Me | $CH_2CF_3$ | O |
| D-2159 | Me | $CH_2$ | H | c-Pr | $CH_2OMe$ | Me | $CH_2CF_3$ | O |
| D-2160 | H | CH(Me) | H | c-Pr | $CH_2OMe$ | Me | $CH_2CF_3$ | O |
| D-2161 | H | $CH_2CH_2$ | Me | c-Pr | $CH_2OMe$ | Me | $CH_2CF_3$ | O |
| D-2162 | Me | $CH_2CH_2$ | H | c-Pr | $CH_2OMe$ | Me | $CH_2CF_3$ | O |
| D-2163 | H | single bond | Me | c-Pr | $CH_2OMe$ | Cl | $CH_2OMe$ | O |
| D-2164 | Me | single bond | H | c-Pr | $CH_2OMe$ | Cl | $CH_2OMe$ | O |
| D-2165 | Me(R) | single bond | H | c-Pr | $CH_2OMe$ | Cl | $CH_2OMe$ | O |
| D-2166 | Me(S) | single bond | H | c-Pr | $CH_2OMe$ | Cl | $CH_2OMe$ | O |
| D-2167 | H | $CH_2$ | Me | c-Pr | $CH_2OMe$ | Cl | $CH_2OMe$ | O |
| D-2168 | Me | $CH_2$ | H | c-Pr | $CH_2OMe$ | Cl | $CH_2OMe$ | O |
| D-2169 | H | CH(Me) | H | c-Pr | $CH_2OMe$ | Cl | $CH_2OMe$ | O |
| D-2170 | H | $CH_2CH_2$ | Me | c-Pr | $CH_2OMe$ | Cl | $CH_2OMe$ | O |
| D-2171 | Me | $CH_2CH_2$ | H | c-Pr | $CH_2OMe$ | Cl | $CH_2OMe$ | O |
| D-2172 | H | single bond | Me | c-Pr | $CH_2OMe$ | Me | $CH_2OMe$ | O |
| D-2173 | Me | single bond | H | c-Pr | $CH_2OMe$ | Me | $CH_2OMe$ | O |
| D-2174 | Me(R) | single bond | H | c-Pr | $CH_2OMe$ | Me | $CH_2OMe$ | O |
| D-2175 | Me(S) | single bond | H | c-Pr | $CH_2OMe$ | Me | $CH_2OMe$ | O |
| D-2176 | H | $CH_2$ | Me | c-Pr | $CH_2OMe$ | Me | $CH_2OMe$ | O |
| D-2177 | Me | $CH_2$ | H | c-Pr | $CH_2OMe$ | Me | $CH_2OMe$ | O |
| D-2178 | H | CH(Me) | H | c-Pr | $CH_2OMe$ | Me | $CH_2OMe$ | O |
| D-2179 | H | $CH_2CH_2$ | Me | c-Pr | $CH_2OMe$ | Me | $CH_2OMe$ | O |
| D-2180 | Me | $CH_2CH_2$ | H | c-Pr | $CH_2OMe$ | Me | $CH_2OMe$ | O |
| D-2181 | H | single bond | Me | c-Pr | $CH_2OMe$ | Cl | $CH_2CN$ | O |
| D-2182 | Me | single bond | H | c-Pr | $CH_2OMe$ | Cl | $CH_2CN$ | O |
| D-2183 | Me(R) | single bond | H | c-Pr | $CH_2OMe$ | Cl | $CH_2CN$ | O |
| D-2184 | Me(S) | single bond | H | c-Pr | $CH_2OMe$ | Cl | $CH_2CN$ | O |
| D-2185 | H | $CH_2$ | Me | c-Pr | $CH_2OMe$ | Cl | $CH_2CN$ | O |
| D-2186 | Me | $CH_2$ | H | c-Pr | $CH_2OMe$ | Cl | $CH_2CN$ | O |
| D-2187 | H | CH(Me) | H | c-Pr | $CH_2OMe$ | Cl | $CH_2CN$ | O |
| D-2188 | H | $CH_2CH_2$ | Me | c-Pr | $CH_2OMe$ | Cl | $CH_2CN$ | O |
| D-2189 | Me | $CH_2CH_2$ | H | c-Pr | $CH_2OMe$ | Cl | $CH_2CN$ | O |
| D-2190 | H | single bond | Me | c-Pr | $CH_2OMe$ | Me | $CH_2CN$ | O |
| D-2191 | Me | single bond | H | c-Pr | $CH_2OMe$ | Me | $CH_2CN$ | O |
| D-2192 | Me(R) | single bond | H | c-Pr | $CH_2OMe$ | Me | $CH_2CN$ | O |
| D-2193 | Me(S) | single bond | H | c-Pr | $CH_2OMe$ | Me | $CH_2CN$ | O |
| D-2194 | H | $CH_2$ | Me | c-Pr | $CH_2OMe$ | Me | $CH_2CN$ | O |

TABLE 695

| Compound Number | Y | W | Z | $R^1$ | $R^2$ | $R^3$ | $R^{10}$ | A |
|---|---|---|---|---|---|---|---|---|
| D-2195 | Me | $CH_2$ | H | c-Pr | $CH_2OMe$ | Me | $CH_2CN$ | O |
| D-2196 | H | CH(Me) | H | c-Pr | $CH_2OMe$ | Me | $CH_2CN$ | O |
| D-2197 | H | $CH_2CH_2$ | Me | c-Pr | $CH_2OMe$ | Me | $CH_2CN$ | O |
| D-2198 | Me | $CH_2CH_2$ | H | c-Pr | $CH_2OMe$ | Me | $CH_2CN$ | O |
| D-2199 | H | single bond | Me | c-Pr | $CH_2OMe$ | Cl | C(=O)Me | O |
| D-2200 | Me | single bond | H | c-Pr | $CH_2OMe$ | Cl | C(=O)Me | O |
| D-2201 | Me(R) | single bond | H | c-Pr | $CH_2OMe$ | Cl | C(=O)Me | O |
| D-2202 | Me(S) | single bond | H | c-Pr | $CH_2OMe$ | Cl | C(=O)Me | O |
| D-2203 | H | $CH_2$ | Me | c-Pr | $CH_2OMe$ | Cl | C(=O)Me | O |
| D-2204 | Me | $CH_2$ | H | c-Pr | $CH_2OMe$ | Cl | C(=O)Me | O |
| D-2205 | H | CH(Me) | H | c-Pr | $CH_2OMe$ | Cl | C(=O)Me | O |
| D-2206 | H | $CH_2CH_2$ | Me | c-Pr | $CH_2OMe$ | Cl | C(=O)Me | O |
| D-2207 | Me | $CH_2CH_2$ | H | c-Pr | $CH_2OMe$ | Cl | C(=O)Me | O |
| D-2208 | H | single bond | Me | c-Pr | $CH_2OMe$ | Me | C(=O)Me | O |
| D-2209 | Me | single bond | H | c-Pr | $CH_2OMe$ | Me | C(=O)Me | O |
| D-2210 | Me(R) | single bond | H | c-Pr | $CH_2OMe$ | Me | C(=O)Me | O |
| D-2211 | Me(S) | single bond | H | c-Pr | $CH_2OMe$ | Me | C(=O)Me | O |
| D-2212 | H | $CH_2$ | Me | c-Pr | $CH_2OMe$ | Me | C(=O)Me | O |
| D-2213 | Me | $CH_2$ | H | c-Pr | $CH_2OMe$ | Me | C(=O)Me | O |
| D-2214 | H | CH(Me) | H | c-Pr | $CH_2OMe$ | Me | C(=O)Me | O |
| D-2215 | H | $CH_2CH_2$ | Me | c-Pr | $CH_2OMe$ | Me | C(=O)Me | O |
| D-2216 | Me | $CH_2CH_2$ | H | c-Pr | $CH_2OMe$ | Me | C(=O)Me | O |
| D-2217 | H | single bond | Me | c-Pr | $CH_2CN$ | Cl | Me | O |

TABLE 695-continued

| Compound Number | Y | W | Z | $R^1$ | $R^2$ | $R^3$ | $R^{10}$ | A |
|---|---|---|---|---|---|---|---|---|
| D-2218 | H | single bond | Et | c-Pr | $CH_2CN$ | Cl | Me | O |
| D-2219 | Me | single bond | H | c-Pr | $CH_2CN$ | Cl | Me | O |
| D-2220 | Me(R) | single bond | H | c-Pr | $CH_2CN$ | Cl | Me | O |
| D-2221 | Me(S) | single bond | H | c-Pr | $CH_2CN$ | Cl | Me | O |
| D-2222 | H | $CH_2$ | Me | c-Pr | $CH_2CN$ | Cl | Me | O |
| D-2223 | Me | $CH_2$ | H | c-Pr | $CH_2CN$ | Cl | Me | O |
| D-2224 | H | CH(Me) | H | c-Pr | $CH_2CN$ | Cl | Me | O |
| D-2225 | H | $CH_2CH_2$ | Me | c-Pr | $CH_2CN$ | Cl | Me | O |
| D-2226 | Me | $CH_2CH_2$ | H | c-Pr | $CH_2CN$ | Cl | Me | O |
| D-2227 | H | single bond | Me | c-Pr | $CH_2CN$ | Me | Me | O |
| D-2228 | Me | single bond | H | c-Pr | $CH_2CN$ | Me | Me | O |
| D-2229 | Me(R) | single bond | H | c-Pr | $CH_2CN$ | Me | Me | O |
| D-2230 | Me(S) | single bond | H | c-Pr | $CH_2CN$ | Me | Me | O |
| D-2231 | H | $CH_2$ | Me | c-Pr | $CH_2CN$ | Me | Me | O |
| D-2232 | Me | $CH_2$ | H | c-Pr | $CH_2CN$ | Me | Me | O |
| D-2233 | H | CH(Me) | H | c-Pr | $CH_2CN$ | Me | Me | O |
| D-2234 | H | $CH_2CH_2$ | Me | c-Pr | $CH_2CN$ | Me | Me | O |
| D-2235 | Me | $CH_2CH_2$ | H | c-Pr | $CH_2CN$ | Me | Me | O |
| D-2236 | H | single bond | Me | c-Pr | $CH_2CN$ | Cl | Et | O |
| D-2237 | Me | single bond | H | c-Pr | $CH_2CN$ | Cl | Et | O |
| D-2238 | Me(R) | single bond | H | c-Pr | $CH_2CN$ | Cl | Et | O |

TABLE 696

| Compound Number | Y | W | Z | $R^1$ | $R^2$ | $R^3$ | $R^{10}$ | A |
|---|---|---|---|---|---|---|---|---|
| D-2239 | Me(S) | single bond | H | c-Pr | $CH_2CN$ | Cl | Et | O |
| D-2240 | H | $CH_2$ | Me | c-Pr | $CH_2CN$ | Cl | Et | O |
| D-2241 | Me | $CH_2$ | H | c-Pr | $CH_2CN$ | Cl | Et | O |
| D-2242 | H | CH(Me) | H | c-Pr | $CH_2CN$ | Cl | Et | O |
| D-2243 | H | $CH_2CH_2$ | Me | c-Pr | $CH_2CN$ | Cl | Et | O |
| D-2244 | Me | $CH_2CH_2$ | H | c-Pr | $CH_2CN$ | Cl | Et | O |
| D-2245 | H | single bond | Me | c-Pr | $CH_2CN$ | Me | Et | O |
| D-2246 | Me | single bond | H | c-Pr | $CH_2CN$ | Me | Et | O |
| D-2247 | Me(R) | single bond | H | c-Pr | $CH_2CN$ | Me | Et | O |
| D-2248 | Me(S) | single bond | H | c-Pr | $CH_2CN$ | Me | Et | O |
| D-2249 | H | $CH_2$ | Me | c-Pr | $CH_2CN$ | Me | Et | O |
| D-2250 | Me | $CH_2$ | H | c-Pr | $CH_2CN$ | Me | Et | O |
| D-2251 | H | CH(Me) | H | c-Pr | $CH_2CN$ | Me | Et | O |
| D-2252 | H | $CH_2CH_2$ | Me | c-Pr | $CH_2CN$ | Me | Et | O |
| D-2253 | Me | $CH_2CH_2$ | H | c-Pr | $CH_2CN$ | Me | Et | O |
| D-2254 | H | single bond | Me | c-Pr | $CH_2CN$ | Cl | $CH_2CF_3$ | O |
| D-2255 | Me | single bond | H | c-Pr | $CH_2CN$ | Cl | $CH_2CF_3$ | O |
| D-2256 | Me(R) | single bond | H | c-Pr | $CH_2CN$ | Cl | $CH_2CF_3$ | O |
| D-2257 | Me(S) | single bond | H | c-Pr | $CH_2CN$ | Cl | $CH_2CF_3$ | O |
| D-2258 | H | $CH_2$ | Me | c-Pr | $CH_2CN$ | Cl | $CH_2CF_3$ | O |
| D-2259 | Me | $CH_2$ | H | c-Pr | $CH_2CN$ | Cl | $CH_2CF_3$ | O |
| D-2260 | H | CH(Me) | H | c-Pr | $CH_2CN$ | Cl | $CH_2CF_3$ | O |
| D-2261 | H | $CH_2CH_2$ | Me | c-Pr | $CH_2CN$ | Cl | $CH_2CF_3$ | O |
| D-2262 | Me | $CH_2CH_2$ | H | c-Pr | $CH_2CN$ | Cl | $CH_2CF_3$ | O |
| D-2263 | H | single bond | Me | c-Pr | $CH_2CN$ | Me | $CH_2CF_3$ | O |
| D-2264 | Me | single bond | H | c-Pr | $CH_2CN$ | Me | $CH_2CF_3$ | O |
| D-2265 | Me(R) | single bond | H | c-Pr | $CH_2CN$ | Me | $CH_2CF_3$ | O |
| D-2266 | Me(S) | single bond | H | c-Pr | $CH_2CN$ | Me | $CH_2CF_3$ | O |
| D-2267 | H | $CH_2$ | Me | c-Pr | $CH_2CN$ | Me | $CH_2CF_3$ | O |
| D-2268 | Me | $CH_2$ | H | c-Pr | $CH_2CN$ | Me | $CH_2CF_3$ | O |
| D-2269 | H | CH(Me) | H | c-Pr | $CH_2CN$ | Me | $CH_2CF_3$ | O |
| D-2270 | H | $CH_2CH_2$ | Me | c-Pr | $CH_2CN$ | Me | $CH_2CF_3$ | O |
| D-2271 | Me | $CH_2CH_2$ | H | c-Pr | $CH_2CN$ | Me | $CH_2CF_3$ | O |
| D-2272 | H | single bond | Me | c-Pr | $CH_2CN$ | Cl | $CH_2OMe$ | O |
| D-2273 | Me | single bond | H | c-Pr | $CH_2CN$ | Cl | $CH_2OMe$ | O |
| D-2274 | Me(R) | single bond | H | c-Pr | $CH_2CN$ | Cl | $CH_2OMe$ | O |
| D-2275 | Me(S) | single bond | H | c-Pr | $CH_2CN$ | Cl | $CH_2OMe$ | O |
| D-2276 | H | $CH_2$ | Me | c-Pr | $CH_2CN$ | Cl | $CH_2OMe$ | O |
| D-2277 | Me | $CH_2$ | H | c-Pr | $CH_2CN$ | Cl | $CH_2OMe$ | O |
| D-2278 | H | CH(Me) | H | c-Pr | $CH_2CN$ | Cl | $CH_2OMe$ | O |
| D-2279 | H | $CH_2CH_2$ | Me | c-Pr | $CH_2CN$ | Cl | $CH_2OMe$ | O |
| D-2280 | Me | $CH_2CH_2$ | H | c-Pr | $CH_2CN$ | Cl | $CH_2OMe$ | O |
| D-2281 | H | single bond | Me | c-Pr | $CH_2CN$ | Me | $CH_2OMe$ | O |
| D-2282 | Me | single bond | H | c-Pr | $CH_2CN$ | Me | $CH_2OMe$ | O |

TABLE 697

| Compound Number | Y | W | Z | $R^1$ | $R^2$ | $R^3$ | $R^{10}$ | A |
|---|---|---|---|---|---|---|---|---|
| D-2283 | Me(R) | single bond | H | c-Pr | $CH_2CN$ | Me | $CH_2OMe$ | O |
| D-2284 | Me(S) | single bond | H | c-Pr | $CH_2CN$ | Me | $CH_2OMe$ | O |
| D-2285 | H | $CH_2$ | Me | c-Pr | $CH_2CN$ | Me | $CH_2OMe$ | O |
| D-2286 | Me | $CH_2$ | H | c-Pr | $CH_2CN$ | Me | $CH_2OMe$ | O |
| D-2287 | H | CH(Me) | H | c-Pr | $CH_2CN$ | Me | $CH_2OMe$ | O |
| D-2288 | H | $CH_2CH_2$ | Me | c-Pr | $CH_2CN$ | Me | $CH_2OMe$ | O |
| D-2289 | Me | $CH_2CH_2$ | H | c-Pr | $CH_2CN$ | Me | $CH_2OMe$ | O |
| D-2290 | H | single bond | Me | c-Pr | $CH_2CN$ | Cl | $CH_2CN$ | O |
| D-2291 | Me | single bond | H | c-Pr | $CH_2CN$ | Cl | $CH_2CN$ | O |
| D-2292 | Me(R) | single bond | H | c-Pr | $CH_2CN$ | Cl | $CH_2CN$ | O |
| D-2293 | Me(S) | single bond | H | c-Pr | $CH_2CN$ | Cl | $CH_2CN$ | O |
| D-2294 | H | $CH_2$ | Me | c-Pr | $CH_2CN$ | Cl | $CH_2CN$ | O |
| D-2295 | Me | $CH_2$ | H | c-Pr | $CH_2CN$ | Cl | $CH_2CN$ | O |
| D-2296 | H | CH(Me) | H | c-Pr | $CH_2CN$ | Cl | $CH_2CN$ | O |
| D-2297 | H | $CH_2CH_2$ | Me | c-Pr | $CH_2CN$ | Cl | $CH_2CN$ | O |
| D-2298 | Me | $CH_2CH_2$ | H | c-Pr | $CH_2CN$ | Cl | $CH_2CN$ | O |
| D-2299 | H | single bond | Me | c-Pr | $CH_2CN$ | Me | $CH_2CN$ | O |
| D-2300 | Me | single bond | H | c-Pr | $CH_2CN$ | Me | $CH_2CN$ | O |
| D-2301 | Me(R) | single bond | H | c-Pr | $CH_2CN$ | Me | $CH_2CN$ | O |
| D-2302 | Me(S) | single bond | H | c-Pr | $CH_2CN$ | Me | $CH_2CN$ | O |
| D-2303 | H | $CH_2$ | Me | c-Pr | $CH_2CN$ | Me | $CH_2CN$ | O |
| D-2304 | Me | $CH_2$ | H | c-Pr | $CH_2CN$ | Me | $CH_2CN$ | O |
| D-2305 | H | CH(Me) | H | c-Pr | $CH_2CN$ | Me | $CH_2CN$ | O |
| D-2306 | H | $CH_2CH_2$ | Me | c-Pr | $CH_2CN$ | Me | $CH_2CN$ | O |
| D-2307 | Me | $CH_2CH_2$ | H | c-Pr | $CH_2CN$ | Me | $CH_2CN$ | O |
| D-2308 | H | single bond | Me | c-Pr | $CH_2CN$ | Cl | C(═O)Me | O |
| D-2309 | Me | single bond | H | c-Pr | $CH_2CN$ | Cl | C(═O)Me | O |
| D-2310 | Me(R) | single bond | H | c-Pr | $CH_2CN$ | Cl | C(═O)Me | O |
| D-2311 | Me(S) | single bond | H | c-Pr | $CH_2CN$ | Cl | C(═O)Me | O |
| D-2312 | H | $CH_2$ | Me | c-Pr | $CH_2CN$ | Cl | C(═O)Me | O |
| D-2313 | Me | $CH_2$ | H | c-Pr | $CH_2CN$ | Cl | C(═O)Me | O |
| D-2314 | H | CH(Me) | H | c-Pr | $CH_2CN$ | Cl | C(═O)Me | O |
| D-2315 | H | $CH_2CH_2$ | Me | c-Pr | $CH_2CN$ | Cl | C(═O)Me | O |
| D-2316 | Me | $CH_2CH_2$ | H | c-Pr | $CH_2CN$ | Cl | C(═O)Me | O |
| D-2317 | H | single bond | Me | c-Pr | $CH_2CN$ | Me | C(═O)Me | O |
| D-2318 | Me | single bond | H | c-Pr | $CH_2CN$ | Me | C(═O)Me | O |
| D-2319 | Me(R) | single bond | H | c-Pr | $CH_2CN$ | Me | C(═O)Me | O |
| D-2320 | Me(S) | single bond | H | c-Pr | $CH_2CN$ | Me | C(═O)Me | O |
| D-2321 | H | $CH_2$ | Me | c-Pr | $CH_2CN$ | Me | C(═O)Me | O |
| D-2322 | Me | $CH_2$ | H | c-Pr | $CH_2CN$ | Me | C(═O)Me | O |
| D-2323 | H | CH(Me) | H | c-Pr | $CH_2CN$ | Me | C(═O)Me | O |
| D-2324 | H | $CH_2CH_2$ | Me | c-Pr | $CH_2CN$ | Me | C(═O)Me | O |
| D-2325 | Me | $CH_2CH_2$ | H | c-Pr | $CH_2CN$ | Me | C(═O)Me | O |
| D-2326 | H | single bond | Me | c-Pr | C(═O)Me | Cl | Me | O |

TABLE 698

| Compound Number | Y | W | Z | $R^1$ | $R^2$ | $R^3$ | $R^{10}$ | A |
|---|---|---|---|---|---|---|---|---|
| D-2327 | Me | single bond | H | c-Pr | C(═O)Me | Cl | Me | O |
| D-2328 | Me(R) | single bond | H | c-Pr | C(═O)Me | Cl | Me | O |
| D-2329 | Me(S) | single bond | H | c-Pr | C(═O)Me | Cl | Me | O |
| D-2330 | H | $CH_2$ | Me | c-Pr | C(═O)Me | Cl | Me | O |
| D-2331 | Me | $CH_2$ | H | c-Pr | C(═O)Me | Cl | Me | O |
| D-2332 | H | CH(Me) | H | c-Pr | C(═O)Me | Cl | Me | O |
| D-2333 | H | $CH_2CH_2$ | Me | c-Pr | C(═O)Me | Cl | Me | O |
| D-2334 | Me | $CH_2CH_2$ | H | c-Pr | C(═O)Me | Cl | Me | O |
| D-2335 | H | single bond | Me | c-Pr | C(═O)Me | Me | Me | O |
| D-2336 | Me | single bond | H | c-Pr | C(═O)Me | Me | Me | O |
| D-2337 | Me(R) | single bond | H | c-Pr | C(═O)Me | Me | Me | O |
| D-2338 | Me(S) | single bond | H | c-Pr | C(═O)Me | Me | Me | O |
| D-2339 | H | $CH_2$ | Me | c-Pr | C(═O)Me | Me | Me | O |
| D-2340 | Me | $CH_2$ | H | c-Pr | C(═O)Me | Me | Me | O |
| D-2341 | H | CH(Me) | H | c-Pr | C(═O)Me | Me | Me | O |
| D-2342 | H | $CH_2CH_2$ | Me | c-Pr | C(═O)Me | Me | Me | O |
| D-2343 | Me | $CH_2CH_2$ | H | c-Pr | C(═O)Me | Me | Me | O |
| D-2344 | H | single bond | Me | c-Pr | C(═O)Me | Cl | Et | O |
| D-2345 | Me | single bond | H | c-Pr | C(═O)Me | Cl | Et | O |
| D-2346 | Me(R) | single bond | H | c-Pr | C(═O)Me | Cl | Et | O |
| D-2347 | Me(S) | single bond | H | c-Pr | C(═O)Me | Cl | Et | O |

TABLE 698-continued

| Compound Number | Y | W | Z | $R^1$ | $R^2$ | $R^3$ | $R^{10}$ | A |
|---|---|---|---|---|---|---|---|---|
| D-2348 | H | $CH_2$ | Me | c-Pr | C(═O)Me | Cl | Et | O |
| D-2349 | Me | $CH_2$ | H | c-Pr | C(═O)Me | Cl | Et | O |
| D-2350 | H | CH(Me) | H | c-Pr | C(═O)Me | Cl | Et | O |
| D-2351 | H | $CH_2CH_2$ | Me | c-Pr | C(═O)Me | Cl | Et | O |
| D-2352 | Me | $CH_2CH_2$ | H | c-Pr | C(═O)Me | Cl | Et | O |
| D-2353 | H | single bond | Me | c-Pr | C(═O)Me | Me | Et | O |
| D-2354 | Me | single bond | H | c-Pr | C(═O)Me | Me | Et | O |
| D-2355 | Me(R) | single bond | H | c-Pr | C(═O)Me | Me | Et | O |
| D-2356 | Me(S) | single bond | H | c-Pr | C(═O)Me | Me | Et | O |
| D-2357 | H | $CH_2$ | Me | c-Pr | C(═O)Me | Me | Et | O |
| D-2358 | Me | $CH_2$ | H | c-Pr | C(═O)Me | Me | Et | O |
| D-2359 | H | CH(Me) | H | c-Pr | C(═O)Me | Me | Et | O |
| D-2360 | H | $CH_2CH_2$ | Me | c-Pr | C(═O)Me | Me | Et | O |
| D-2361 | Me | $CH_2CH_2$ | H | c-Pr | C(═O)Me | Me | Et | O |
| D-2362 | H | single bond | Me | c-Pr | C(═O)Me | Cl | $CH_2CF_3$ | O |
| D-2363 | Me | single bond | H | c-Pr | C(═O)Me | Cl | $CH_2CF_3$ | O |
| D-2364 | Me(R) | single bond | H | c-Pr | C(═O)Me | Cl | $CH_2CF_3$ | O |
| D-2365 | Me(S) | single bond | H | c-Pr | C(═O)Me | Cl | $CH_2CF_3$ | O |
| D-2366 | H | $CH_2$ | Me | c-Pr | C(═O)Me | Cl | $CH_2CF_3$ | O |
| D-2367 | Me | $CH_2$ | H | c-Pr | C(═O)Me | Cl | $CH_2CF_3$ | O |
| D-2368 | H | CH(Me) | H | c-Pr | C(═O)Me | Cl | $CH_2CF_3$ | O |
| D-2369 | H | $CH_2CH_2$ | Me | c-Pr | C(═O)Me | Cl | $CH_2CF_3$ | O |
| D-2370 | Me | $CH_2CH_2$ | H | c-Pr | C(═O)Me | Cl | $CH_2CF_3$ | O |

TABLE 699

| Compound Number | Y | W | Z | $R^1$ | $R^2$ | $R^3$ | $R^{10}$ | A |
|---|---|---|---|---|---|---|---|---|
| D-2371 | H | single bond | Me | c-Pr | C(═O)Me | Me | $CH_2CF_3$ | O |
| D-2372 | Me | single bond | H | c-Pr | C(═O)Me | Me | $CH_2CF_3$ | O |
| D-2373 | Me(R) | single bond | H | c-Pr | C(═O)Me | Me | $CH_2CF_3$ | O |
| D-2374 | Me(S) | single bond | H | c-Pr | C(═O)Me | Me | $CH_2CF_3$ | O |
| D-2375 | H | $CH_2$ | Me | c-Pr | C(═O)Me | Me | $CH_2CF_3$ | O |
| D-2376 | Me | $CH_2$ | H | c-Pr | C(═O)Me | Me | $CH_2CF_3$ | O |
| D-2377 | H | CH(Me) | H | c-Pr | C(═O)Me | Me | $CH_2CF_3$ | O |
| D-2378 | H | $CH_2CH_2$ | Me | c-Pr | C(═O)Me | Me | $CH_2CF_3$ | O |
| D-2379 | Me | $CH_2CH_2$ | H | c-Pr | C(═O)Me | Me | $CH_2CF_3$ | O |
| D-2380 | H | single bond | Me | c-Pr | C(═O)Me | Cl | $CH_2OMe$ | O |
| D-2381 | Me | single bond | H | c-Pr | C(═O)Me | Cl | $CH_2OMe$ | O |
| D-2382 | Me(R) | single bond | H | c-Pr | C(═O)Me | Cl | $CH_2OMe$ | O |
| D-2383 | Me(S) | single bond | H | c-Pr | C(═O)Me | Cl | $CH_2OMe$ | O |
| D-2384 | H | $CH_2$ | Me | c-Pr | C(═O)Me | Cl | $CH_2OMe$ | O |
| D-2385 | Me | $CH_2$ | H | c-Pr | C(═O)Me | Cl | $CH_2OMe$ | O |
| D-2386 | H | CH(Me) | H | c-Pr | C(═O)Me | Cl | $CH_2OMe$ | O |
| D-2387 | H | $CH_2CH_2$ | Me | c-Pr | C(═O)Me | Cl | $CH_2OMe$ | O |
| D-2388 | Me | $CH_2CH_2$ | H | c-Pr | C(═O)Me | Cl | $CH_2OMe$ | O |
| D-2389 | H | single bond | Me | c-Pr | C(═O)Me | Me | $CH_2OMe$ | O |
| D-2390 | Me | single bond | H | c-Pr | C(═O)Me | Me | $CH_2OMe$ | O |
| D-2391 | Me(R) | single bond | H | c-Pr | C(═O)Me | Me | $CH_2OMe$ | O |
| D-2392 | Me(S) | single bond | H | c-Pr | C(═O)Me | Me | $CH_2OMe$ | O |
| D-2393 | H | $CH_2$ | Me | c-Pr | C(═O)Me | Me | $CH_2OMe$ | O |
| D-2394 | Me | $CH_2$ | H | c-Pr | C(═O)Me | Me | $CH_2OMe$ | O |
| D-2395 | H | CH(Me) | H | c-Pr | C(═O)Me | Me | $CH_2OMe$ | O |
| D-2396 | H | $CH_2CH_2$ | Me | c-Pr | C(═O)Me | Me | $CH_2OMe$ | O |
| D-2397 | Me | $CH_2CH_2$ | H | c-Pr | C(═O)Me | Me | $CH_2OMe$ | O |
| D-2398 | H | single bond | Me | c-Pr | C(═O)Me | Cl | $CH_2CN$ | O |
| D-2399 | Me | single bond | H | c-Pr | C(═O)Me | Cl | $CH_2CN$ | O |
| D-2400 | Me(R) | single bond | H | c-Pr | C(═O)Me | Cl | $CH_2CN$ | O |
| D-2401 | Me(S) | single bond | H | c-Pr | C(═O)Me | Cl | $CH_2CN$ | O |
| D-2402 | H | $CH_2$ | Me | c-Pr | C(═O)Me | Cl | $CH_2CN$ | O |
| D-2403 | Me | $CH_2$ | H | c-Pr | C(═O)Me | Cl | $CH_2CN$ | O |
| D-2404 | H | CH(Me) | H | c-Pr | C(═O)Me | Cl | $CH_2CN$ | O |
| D-2405 | H | $CH_2CH_2$ | Me | c-Pr | C(═O)Me | Cl | $CH_2CN$ | O |
| D-2406 | Me | $CH_2CH_2$ | H | c-Pr | C(═O)Me | Cl | $CH_2CN$ | O |
| D-2407 | H | single bond | Me | c-Pr | C(═O)Me | Me | $CH_2CN$ | O |
| D-2408 | Me | single bond | H | c-Pr | C(═O)Me | Me | $CH_2CN$ | O |
| D-2409 | Me(R) | single bond | H | c-Pr | C(═O)Me | Me | $CH_2CN$ | O |
| D-2410 | Me(S) | single bond | H | c-Pr | C(═O)Me | Me | $CH_2CN$ | O |
| D-2411 | H | $CH_2$ | Me | c-Pr | C(═O)Me | Me | $CH_2CN$ | O |
| D-2412 | Me | $CH_2$ | H | c-Pr | C(═O)Me | Me | $CH_2CN$ | O |

TABLE 699-continued

| Compound Number | Y | W | Z | $R^1$ | $R^2$ | $R^3$ | $R^{10}$ | A |
|---|---|---|---|---|---|---|---|---|
| D-2413 | H | CH(Me) | H | c-Pr | C(═O)Me | Me | $CH_2CN$ | O |
| D-2414 | H | $CH_2CH_2$ | Me | c-Pr | C(═O)Me | Me | $CH_2CN$ | O |

TABLE 700

| Compound Number | Y | W | Z | $R^1$ | $R^2$ | $R^3$ | $R^{10}$ | A |
|---|---|---|---|---|---|---|---|---|
| D-2415 | Me | $CH_2CH_2$ | H | c-Pr | C(═O)Me | Me | CH2CN | O |
| D-2416 | H | single bond | Me | c-Pr | C(═O)Me | Cl | C(═O)Me | O |
| D-2417 | Me | single bond | H | c-Pr | C(═O)Me | Cl | C(═O)Me | O |
| D-2418 | Me(R) | single bond | H | c-Pr | C(═O)Me | Cl | C(═O)Me | O |
| D-2419 | Me(S) | single bond | H | c-Pr | C(═O)Me | Cl | C(═O)Me | O |
| D-2420 | H | $CH_2$ | Me | c-Pr | C(═O)Me | Cl | C(═O)Me | O |
| D-2421 | Me | $CH_2$ | H | c-Pr | C(═O)Me | Cl | C(═O)Me | O |
| D-2422 | H | CH(Me) | H | c-Pr | C(═O)Me | Cl | C(═O)Me | O |
| D-2423 | H | $CH_2CH_2$ | Me | c-Pr | C(═O)Me | Cl | C(═O)Me | O |
| D-2424 | Me | $CH_2CH_2$ | H | c-Pr | C(═O)Me | Cl | C(═O)Me | O |
| D-2425 | H | single bond | Me | c-Pr | C(═O)Me | Me | C(═O)Me | O |
| D-2426 | Me | single bond | H | c-Pr | C(═O)Me | Me | C(═O)Me | O |
| D-2427 | Me(R) | single bond | H | c-Pr | C(═O)Me | Me | C(═O)Me | O |
| D-2428 | Me(S) | single bond | H | c-Pr | C(═O)Me | Me | C(═O)Me | O |
| D-2429 | H | $CH_2$ | Me | c-Pr | C(═O)Me | Me | C(═O)Me | O |
| D-2430 | Me | $CH_2$ | H | c-Pr | C(═O)Me | Me | C(═O)Me | O |
| D-2431 | H | CH(Me) | H | c-Pr | C(═O)Me | Me | C(═O)Me | O |
| D-2432 | H | $CH_2CH_2$ | Me | c-Pr | C(═O)Me | Me | C(═O)Me | O |
| D-2433 | Me | $CH_2CH_2$ | H | c-Pr | C(═O)Me | Me | C(═O)Me | O |
| D-2434 | H | single bond | Me | c-Pr | C(═O)(i-Pr) | Cl | Me | O |
| D-2435 | Me | single bond | H | c-Pr | C(═O)(i-Pr) | Cl | Me | O |
| D-2436 | Me(R) | single bond | H | c-Pr | C(═O)(i-Pr) | Cl | Me | O |
| D-2437 | Me(S) | single bond | H | c-Pr | C(═O)(i-Pr) | Cl | Me | O |
| D-2438 | H | $CH_2$ | Me | c-Pr | C(═O)(i-Pr) | Cl | Me | O |
| D-2439 | Me | $CH_2$ | H | c-Pr | C(═O)(i-Pr) | Cl | Me | O |
| D-2440 | H | CH(Me) | H | c-Pr | C(═O)(i-Pr) | Cl | Me | O |
| D-2441 | H | $CH_2CH_2$ | Me | c-Pr | C(═O)(i-Pr) | Cl | Me | O |
| D-2442 | Me | $CH_2CH_2$ | H | c-Pr | C(═O)(i-Pr) | Cl | Me | O |
| D-2443 | H | single bond | Me | c-Pr | C(═O)(i-Pr) | Me | Me | O |
| D-2444 | Me | single bond | H | c-Pr | C(═O)(i-Pr) | Me | Me | O |
| D-2445 | Me(R) | single bond | H | c-Pr | C(═O)(i-Pr) | Me | Me | O |
| D-2446 | Me(S) | single bond | H | c-Pr | C(═O)(i-Pr) | Me | Me | O |
| D-2447 | H | $CH_2$ | Me | c-Pr | C(═O)(i-Pr) | Me | Me | O |
| D-2448 | Me | $CH_2$ | H | c-Pr | C(═O)(i-Pr) | Me | Me | O |
| D-2449 | H | CH(Me) | H | c-Pr | C(═O)(i-Pr) | Me | Me | O |
| D-2450 | H | $CH_2CH_2$ | Me | c-Pr | C(═O)(i-Pr) | Me | Me | O |
| D-2451 | Me | $CH_2CH_2$ | H | c-Pr | C(═O)(i-Pr) | Me | Me | O |
| D-2452 | H | single bond | Me | c-Pr | C(═O)(i-Pr) | Cl | Et | O |
| D-2453 | Me | single bond | H | c-Pr | C(═O)(i-Pr) | Cl | Et | O |
| D-2454 | Me(R) | single bond | H | c-Pr | C(═O)(i-Pr) | Cl | Et | O |
| D-2455 | Me(S) | single bond | H | c-Pr | C(═O)(i-Pr) | Cl | Et | O |
| D-2456 | H | $CH_2$ | Me | c-Pr | C(═O)(i-Pr) | Cl | Et | O |
| D-2457 | Me | $CH_2$ | H | c-Pr | C(═O)(i-Pr) | Cl | Et | O |
| D-2458 | H | CH(Me) | H | c-Pr | C(═O)(i-Pr) | Cl | Et | O |

TABLE 701

| Compound Number | Y | W | Z | $R^1$ | $R^2$ | $R^3$ | $R^{10}$ | A |
|---|---|---|---|---|---|---|---|---|
| D-2459 | H | $CH_2CH_2$ | Me | c-Pr | C(═O)(i-Pr) | Cl | Et | O |
| D-2460 | Me | $CH_2CH_2$ | H | c-Pr | C(═O)(i-Pr) | Cl | Et | O |
| D-2461 | H | single bond | Me | c-Pr | C(═O)(i-Pr) | Me | Et | O |
| D-2462 | Me | single bond | H | c-Pr | C(═O)(i-Pr) | Me | Et | O |
| D-2463 | Me(R) | single bond | H | c-Pr | C(═O)(i-Pr) | Me | Et | O |
| D-2464 | Me(S) | single bond | H | c-Pr | C(═O)(i-Pr) | Me | Et | O |
| D-2465 | H | $CH_2$ | Me | c-Pr | C(═O)(i-Pr) | Me | Et | O |
| D-2466 | Me | $CH_2$ | H | c-Pr | C(═O)(i-Pr) | Me | Et | O |
| D-2467 | H | CH(Me) | H | c-Pr | C(═O)(i-Pr) | Me | Et | O |
| D-2468 | H | $CH_2CH_2$ | Me | c-Pr | C(═O)(i-Pr) | Me | Et | O |
| D-2469 | Me | $CH_2CH_2$ | H | c-Pr | C(═O)(i-Pr) | Me | Et | O |
| D-2470 | H | single bond | Me | c-Pr | C(═O)(i-Pr) | Cl | $CH_2CF_3$ | O |

TABLE 701-continued

| Compound Number | Y | W | Z | $R^1$ | $R^2$ | $R^3$ | $R^{10}$ | A |
|---|---|---|---|---|---|---|---|---|
| D-2471 | Me | single bond | H | c-Pr | C(=O)(i-Pr) | Cl | $CH_2CF_3$ | O |
| D-2472 | Me(R) | single bond | H | c-Pr | C(=O)(i-Pr) | Cl | $CH_2CF_3$ | O |
| D-2473 | Me(S) | single bond | H | c-Pr | C(=O)(i-Pr) | Cl | $CH_2CF_3$ | O |
| D-2474 | H | $CH_2$ | Me | c-Pr | C(=O)(i-Pr) | Cl | $CH_2CF_3$ | O |
| D-2475 | Me | $CH_2$ | H | c-Pr | C(=O)(i-Pr) | Cl | $CH_2CF_3$ | O |
| D-2476 | H | CH(Me) | H | c-Pr | C(=O)(i-Pr) | Cl | $CH_2CF_3$ | O |
| D-2477 | H | $CH_2CH_2$ | Me | c-Pr | C(=O)(i-Pr) | Cl | $CH_2CF_3$ | O |
| D-2478 | Me | $CH_2CH_2$ | H | c-Pr | C(=O)(i-Pr) | Cl | $CH_2CF_3$ | O |
| D-2479 | H | single bond | Me | c-Pr | C(=O)(i-Pr) | Me | $CH_2CF_3$ | O |
| D-2480 | Me | single bond | H | c-Pr | C(=O)(i-Pr) | Me | $CH_2CF_3$ | O |
| D-2481 | Me(R) | single bond | H | c-Pr | C(=O)(i-Pr) | Me | $CH_2CF_3$ | O |
| D-2482 | Me(S) | single bond | H | c-Pr | C(=O)(i-Pr) | Me | $CH_2CF_3$ | O |
| D-2483 | H | $CH_2$ | Me | c-Pr | C(=O)(i-Pr) | Me | $CH_2CF_3$ | O |
| D-2484 | Me | $CH_2$ | H | c-Pr | C(=O)(i-Pr) | Me | $CH_2CF_3$ | O |
| D-2485 | H | CH(Me) | H | c-Pr | C(=O)(i-Pr) | Me | $CH_2CF_3$ | O |
| D-2486 | H | $CH_2CH_2$ | Me | c-Pr | C(=O)(i-Pr) | Me | $CH_2CF_3$ | O |
| D-2487 | Me | $CH_2CH_2$ | H | c-Pr | C(=O)(i-Pr) | Me | $CH_2CF_3$ | O |
| D-2488 | H | single bond | Me | c-Pr | C(=O)(i-Pr) | Cl | $CH_2OMe$ | O |
| D-2489 | Me | single bond | H | c-Pr | C(=O)(i-Pr) | Cl | $CH_2OMe$ | O |
| D-2490 | Me(R) | single bond | H | c-Pr | C(=O)(i-Pr) | Cl | $CH_2OMe$ | O |
| D-2491 | Me(S) | single bond | H | c-Pr | C(=O)(i-Pr) | Cl | $CH_2OMe$ | O |
| D-2492 | H | $CH_2$ | Me | c-Pr | C(=O)(i-Pr) | Cl | $CH_2OMe$ | O |
| D-2493 | Me | $CH_2$ | H | c-Pr | C(=O)(i-Pr) | Cl | $CH_2OMe$ | O |
| D-2494 | H | CH(Me) | H | c-Pr | C(=O)(i-Pr) | Cl | $CH_2OMe$ | O |
| D-2495 | H | $CH_2CH_2$ | Me | c-Pr | C(=O)(i-Pr) | Cl | $CH_2OMe$ | O |
| D-2496 | Me | $CH_2CH_2$ | H | c-Pr | C(=O)(i-Pr) | Cl | $CH_2OMe$ | O |
| D-2497 | H | single bond | Me | c-Pr | C(=O)(i-Pr) | Me | $CH_2OMe$ | O |
| D-2498 | Me | single bond | H | c-Pr | C(=O)(i-Pr) | Me | $CH_2OMe$ | O |
| D-2499 | Me(R) | single bond | H | c-Pr | C(=O)(i-Pr) | Me | $CH_2OMe$ | O |
| D-2500 | Me(S) | single bond | H | c-Pr | C(=O)(i-Pr) | Me | $CH_2OMe$ | O |
| D-2501 | H | $CH_2$ | Me | c-Pr | C(=O)(i-Pr) | Me | $CH_2OMe$ | O |
| D-2502 | Me | $CH_2$ | H | c-Pr | C(=O)(i-Pr) | Me | $CH_2OMe$ | O |

TABLE 702

| Compound Number | Y | W | Z | $R^1$ | $R^2$ | $R^3$ | $R^{10}$ | A |
|---|---|---|---|---|---|---|---|---|
| D-2503 | H | CH(Me) | H | c-Pr | C(=O)(i-Pr) | Me | $CH_2OMe$ | O |
| D-2504 | H | $CH_2CH_2$ | Me | c-Pr | C(=O)(i-Pr) | Me | $CH_2OMe$ | O |
| D-2505 | Me | $CH_2CH_2$ | H | c-Pr | C(=O)(i-Pr) | Me | $CH_2OMe$ | O |
| D-2506 | H | single bond | Me | c-Pr | C(=O)(i-Pr) | Cl | $CH_2CN$ | O |
| D-2507 | Me | single bond | H | c-Pr | C(=O)(i-Pr) | Cl | $CH_2CN$ | O |
| D-2508 | Me(R) | single bond | H | c-Pr | C(=O)(i-Pr) | Cl | $CH_2CN$ | O |
| D-2509 | Me(S) | single bond | H | c-Pr | C(=O)(i-Pr) | Cl | $CH_2CN$ | O |
| D-2510 | H | $CH_2$ | Me | c-Pr | C(=O)(i-Pr) | Cl | $CH_2CN$ | O |
| D-2511 | Me | $CH_2$ | H | c-Pr | C(=O)(i-Pr) | Cl | $CH_2CN$ | O |
| D-2512 | H | CH(Me) | H | c-Pr | C(=O)(i-Pr) | Cl | $CH_2CN$ | O |
| D-2513 | H | $CH_2CH_2$ | Me | c-Pr | C(=O)(i-Pr) | Cl | $CH_2CN$ | O |
| D-2514 | Me | $CH_2CH_2$ | H | c-Pr | C(=O)(i-Pr) | Cl | $CH_2CN$ | O |
| D-2515 | H | single bond | Me | c-Pr | C(=O)(i-Pr) | Me | $CH_2CN$ | O |
| D-2516 | Me | single bond | H | c-Pr | C(=O)(i-Pr) | Me | $CH_2CN$ | O |
| D-2517 | Me(R) | single bond | H | c-Pr | C(=O)(i-Pr) | Me | $CH_2CN$ | O |
| D-2518 | Me(S) | single bond | H | c-Pr | C(=O)(i-Pr) | Me | $CH_2CN$ | O |
| D-2519 | H | $CH_2$ | Me | c-Pr | C(=O)(i-Pr) | Me | $CH_2CN$ | O |
| D-2520 | Me | $CH_2$ | H | c-Pr | C(=O)(i-Pr) | Me | $CH_2CN$ | O |
| D-2521 | H | CH(Me) | H | c-Pr | C(=O)(i-Pr) | Me | $CH_2CN$ | O |
| D-2522 | H | $CH_2CH_2$ | Me | c-Pr | C(=O)(i-Pr) | Me | $CH_2CN$ | O |
| D-2523 | Me | $CH_2CH_2$ | H | c-Pr | C(=O)(i-Pr) | Me | $CH_2CN$ | O |
| D-2524 | H | single bond | Me | c-Pr | C(=O)(i-Pr) | Cl | C(=O)Me | O |
| D-2525 | Me | single bond | H | c-Pr | C(=O)(i-Pr) | Cl | C(=O)Me | O |
| D-2526 | Me(R) | single bond | H | c-Pr | C(=O)(i-Pr) | Cl | C(=O)Me | O |
| D-2527 | Me(S) | single bond | H | c-Pr | C(=O)(i-Pr) | Cl | C(=O)Me | O |
| D-2528 | H | $CH_2$ | Me | c-Pr | C(=O)(i-Pr) | Cl | C(=O)Me | O |
| D-2529 | Me | $CH_2$ | H | c-Pr | C(=O)(i-Pr) | Cl | C(=O)Me | O |
| D-2530 | H | CH(Me) | H | c-Pr | C(=O)(i-Pr) | Cl | C(=O)Me | O |
| D-2531 | H | $CH_2CH_2$ | Me | c-Pr | C(=O)(i-Pr) | Cl | C(=O)Me | O |
| D-2532 | Me | $CH_2CH_2$ | H | c-Pr | C(=O)(i-Pr) | Cl | C(=O)Me | O |
| D-2533 | H | single bond | Me | c-Pr | C(=O)(i-Pr) | Me | C(=O)Me | O |
| D-2534 | Me | single bond | H | c-Pr | C(=O)(i-Pr) | Me | C(=O)Me | O |
| D-2535 | Me(R) | single bond | H | c-Pr | C(=O)(i-Pr) | Me | C(=O)Me | O |
| D-2536 | Me(S) | single bond | H | c-Pr | C(=O)(i-Pr) | Me | C(=O)Me | O |
| D-2537 | H | $CH_2$ | Me | c-Pr | C(=O)(i-Pr) | Me | C(=O)Me | O |

TABLE 702-continued

| Compound Number | Y | W | Z | $R^1$ | $R^2$ | $R^3$ | $R^{10}$ | A |
|---|---|---|---|---|---|---|---|---|
| D-2538 | Me | $CH_2$ | H | c-Pr | C(=O)(i-Pr) | Me | C(=O)Me | O |
| D-2539 | H | CH(Me) | H | c-Pr | C(=O)(i-Pr) | Me | C(=O)Me | O |
| D-2540 | H | $CH_2CH_2$ | Me | c-Pr | C(=O)(i-Pr) | Me | C(=O)Me | O |
| D-2541 | Me | $CH_2CH_2$ | H | c-Pr | C(=O)(i-Pr) | Me | C(=O)Me | O |
| D-2542 | H | single bond | Me | c-Pr | C(=O)Ph | Cl | Me | O |
| D-2543 | Me | single bond | H | c-Pr | C(=O)Ph | Cl | Me | O |
| D-2544 | Me(R) | single bond | H | c-Pr | C(=O)Ph | Cl | Me | O |
| D-2545 | Me(S) | single bond | H | c-Pr | C(=O)Ph | Cl | Me | O |
| D-2546 | H | $CH_2$ | Me | c-Pr | C(=O)Ph | Cl | Me | O |

TABLE 703

| Compound Number | Y | W | Z | $R^1$ | $R^2$ | $R^3$ | $R^{10}$ | A |
|---|---|---|---|---|---|---|---|---|
| D-2547 | Me | $CH_2$ | H | c-Pr | C(=O)Ph | Cl | Me | O |
| D-2548 | H | CH(Me) | H | c-Pr | C(=O)Ph | Cl | Me | O |
| D-2549 | H | $CH_2CH_2$ | Me | c-Pr | C(=O)Ph | Cl | Me | O |
| D-2550 | Me | $CH_2CH_2$ | H | c-Pr | C(=O)Ph | Cl | Me | O |
| D-2551 | H | single bond | Me | c-Pr | C(=O)Ph | Me | Me | O |
| D-2552 | Me | single bond | H | c-Pr | C(=O)Ph | Me | Me | O |
| D-2553 | Me(R) | single bond | H | c-Pr | C(=O)Ph | Me | Me | O |
| D-2554 | Me(S) | single bond | H | c-Pr | C(=O)Ph | Me | Me | O |
| D-2555 | H | $CH_2$ | Me | c-Pr | C(=O)Ph | Me | Me | O |
| D-2556 | Me | $CH_2$ | H | c-Pr | C(=O)Ph | Me | Me | O |
| D-2557 | H | CH(Me) | H | c-Pr | C(=O)Ph | Me | Me | O |
| D-2558 | H | $CH_2CH_2$ | Me | c-Pr | C(=O)Ph | Me | Me | O |
| D-2559 | Me | $CH_2CH_2$ | H | c-Pr | C(=O)Ph | Me | Me | O |
| D-2560 | H | single bond | Me | c-Pr | C(=O)Ph | Cl | Et | O |
| D-2561 | Me | single bond | H | c-Pr | C(=O)Ph | Cl | Et | O |
| D-2562 | Me(R) | single bond | H | c-Pr | C(=O)Ph | Cl | Et | O |
| D-2563 | Me(S) | single bond | H | c-Pr | C(=O)Ph | Cl | Et | O |
| D-2564 | H | $CH_2$ | Me | c-Pr | C(=O)Ph | Cl | Et | O |
| D-2565 | Me | $CH_2$ | H | c-Pr | C(=O)Ph | Cl | Et | O |
| D-2566 | H | CH(Me) | H | c-Pr | C(=O)Ph | Cl | Et | O |
| D-2567 | H | $CH_2CH_2$ | Me | c-Pr | C(=O)Ph | Cl | Et | O |
| D-2568 | Me | $CH_2CH_2$ | H | c-Pr | C(=O)Ph | Cl | Et | O |
| D-2569 | H | single bond | Me | c-Pr | C(=O)Ph | Me | Et | O |
| D-2570 | Me | single bond | H | c-Pr | C(=O)Ph | Me | Et | O |
| D-2571 | Me(R) | single bond | H | c-Pr | C(=O)Ph | Me | Et | O |
| D-2572 | Me(S) | single bond | H | c-Pr | C(=O)Ph | Me | Et | O |
| D-2573 | H | $CH_2$ | Me | c-Pr | C(=O)Ph | Me | Et | O |
| D-2574 | Me | $CH_2$ | H | c-Pr | C(=O)Ph | Me | Et | O |
| D-2575 | H | CH(Me) | H | c-Pr | C(=O)Ph | Me | Et | O |
| D-2576 | H | $CH_2CH_2$ | Me | c-Pr | C(=O)Ph | Me | Et | O |
| D-2577 | Me | $CH_2CH_2$ | H | c-Pr | C(=O)Ph | Me | Et | O |
| D-2578 | H | single bond | Me | c-Pr | C(=O)Ph | Cl | $CH_2CF_3$ | O |
| D-2579 | Me | single bond | H | c-Pr | C(=O)Ph | Cl | $CH_2CF_3$ | O |
| D-2580 | Me(R) | single bond | H | c-Pr | C(=O)Ph | Cl | $CH_2CF_3$ | O |
| D-2581 | Me(S) | single bond | H | c-Pr | C(=O)Ph | Cl | $CH_2CF_3$ | O |
| D-2582 | H | $CH_2$ | Me | c-Pr | C(=O)Ph | Cl | $CH_2CF_3$ | O |
| D-2583 | Me | $CH_2$ | H | c-Pr | C(=O)Ph | Cl | $CH_2CF_3$ | O |
| D-2584 | H | CH(Me) | H | c-Pr | C(=O)Ph | Cl | $CH_2CF_3$ | O |
| D-2585 | H | $CH_2CH_2$ | Me | c-Pr | C(=O)Ph | Cl | $CH_2CF_3$ | O |
| D-2586 | Me | $CH_2CH_2$ | H | c-Pr | C(=O)Ph | Cl | $CH_2CF_3$ | O |
| D-2587 | H | single bond | Me | c-Pr | C(=O)Ph | Me | $CH_2CF_3$ | O |
| D-2588 | Me | single bond | H | c-Pr | C(=O)Ph | Me | $CH_2CF_3$ | O |
| D-2589 | Me(R) | single bond | H | c-Pr | C(=O)Ph | Me | $CH_2CF_3$ | O |
| D-2590 | Me(S) | single bond | H | c-Pr | C(=O)Ph | Me | $CH_2CF_3$ | O |

TABLE 704

| Compound Number | Y | W | Z | $R^1$ | $R^2$ | $R^3$ | $R^{10}$ | A |
|---|---|---|---|---|---|---|---|---|
| D-2591 | H | $CH_2$ | Me | c-Pr | C(=O)Ph | Me | $CH_2CF_3$ | O |
| D-2592 | Me | $CH_2$ | H | c-Pr | C(=O)Ph | Me | $CH_2CF_3$ | O |
| D-2593 | H | CH(Me) | H | c-Pr | C(=O)Ph | Me | $CH_2CF_3$ | O |

TABLE 704-continued

| Compound Number | Y | W | Z | $R^1$ | $R^2$ | $R^3$ | $R^{10}$ | A |
|---|---|---|---|---|---|---|---|---|
| D-2594 | H | $CH_2CH_2$ | Me | c-Pr | C(=O)Ph | Me | $CH_2CF_3$ | O |
| D-2595 | Me | $CH_2CH_2$ | H | c-Pr | C(=O)Ph | Me | $CH_2CF_3$ | O |
| D-2596 | H | single bond | Me | c-Pr | C(=O)Ph | Cl | $CH_2OMe$ | O |
| D-2597 | Me | single bond | H | c-Pr | C(=O)Ph | Cl | $CH_2OMe$ | O |
| D-2598 | Me(R) | single bond | H | c-Pr | C(=O)Ph | Cl | $CH_2OMe$ | O |
| D-2599 | Me(S) | single bond | H | c-Pr | C(=O)Ph | Cl | $CH_2OMe$ | O |
| D-2600 | H | $CH_2$ | Me | c-Pr | C(=O)Ph | Cl | $CH_2OMe$ | O |
| D-2601 | Me | $CH_2$ | H | c-Pr | C(=O)Ph | Cl | $CH_2OMe$ | O |
| D-2602 | H | CH(Me) | H | c-Pr | C(=O)Ph | Cl | $CH_2OMe$ | O |
| D-2603 | H | $CH_2CH_2$ | Me | c-Pr | C(=O)Ph | Cl | $CH_2OMe$ | O |
| D-2604 | Me | $CH_2CH_2$ | H | c-Pr | C(=O)Ph | Cl | $CH_2OMe$ | O |
| D-2605 | H | single bond | Me | c-Pr | C(=O)Ph | Me | $CH_2OMe$ | O |
| D-2606 | Me | single bond | H | c-Pr | C(=O)Ph | Me | $CH_2OMe$ | O |
| D-2607 | Me(R) | single bond | H | c-Pr | C(=O)Ph | Me | $CH_2OMe$ | O |
| D-2608 | Me(S) | single bond | H | c-Pr | C(=O)Ph | Me | $CH_2OMe$ | O |
| D-2609 | H | $CH_2$ | Me | c-Pr | C(=O)Ph | Me | $CH_2OMe$ | O |
| D-2610 | Me | $CH_2$ | H | c-Pr | C(=O)Ph | Me | $CH_2OMe$ | O |
| D-2611 | H | CH(Me) | H | c-Pr | C(=O)Ph | Me | $CH_2OMe$ | O |
| D-2612 | H | $CH_2CH_2$ | Me | c-Pr | C(=O)Ph | Me | $CH_2OMe$ | O |
| D-2613 | Me | $CH_2CH_2$ | H | c-Pr | C(=O)Ph | Me | $CH_2OMe$ | O |
| D-2614 | H | single bond | Me | c-Pr | C(=O)Ph | Cl | $CH_2CN$ | O |
| D-2615 | Me | single bond | H | c-Pr | C(=O)Ph | Cl | $CH_2CN$ | O |
| D-2616 | Me(R) | single bond | H | c-Pr | C(=O)Ph | Cl | $CH_2CN$ | O |
| D-2617 | Me(S) | single bond | H | c-Pr | C(=O)Ph | Cl | $CH_2CN$ | O |
| D-2618 | H | $CH_2$ | Me | c-Pr | C(=O)Ph | Cl | $CH_2CN$ | O |
| D-2619 | Me | $CH_2$ | H | c-Pr | C(=O)Ph | Cl | $CH_2CN$ | O |
| D-2620 | H | CH(Me) | H | c-Pr | C(=O)Ph | Cl | $CH_2CN$ | O |
| D-2621 | H | $CH_2CH_2$ | Me | c-Pr | C(=O)Ph | Cl | $CH_2CN$ | O |
| D-2622 | Me | $CH_2CH_2$ | H | c-Pr | C(=O)Ph | Cl | $CH_2CN$ | O |
| D-2623 | H | single bond | Me | c-Pr | C(=O)Ph | Me | $CH_2CN$ | O |
| D-2624 | Me | single bond | H | c-Pr | C(=O)Ph | Me | $CH_2CN$ | O |
| D-2625 | Me(R) | single bond | H | c-Pr | C(=O)Ph | Me | $CH_2CN$ | O |
| D-2626 | Me(S) | single bond | H | c-Pr | C(=O)Ph | Me | $CH_2CN$ | O |
| D-2627 | H | $CH_2$ | Me | c-Pr | C(=O)Ph | Me | $CH_2CN$ | O |
| D-2628 | Me | $CH_2$ | H | c-Pr | C(=O)Ph | Me | $CH_2CN$ | O |
| D-2629 | H | CH(Me) | H | c-Pr | C(=O)Ph | Me | $CH_2CN$ | O |
| D-2630 | H | $CH_2CH_2$ | Me | c-Pr | C(=O)Ph | Me | $CH_2CN$ | O |
| D-2631 | Me | $CH_2CH_2$ | H | c-Pr | C(=O)Ph | Me | $CH_2CN$ | O |
| D-2632 | H | single bond | Me | c-Pr | C(=O)Ph | Cl | C(=O)Me | O |
| D-2633 | Me | single bond | H | c-Pr | C(=O)Ph | Cl | C(=O)Me | O |
| D-2634 | Me(R) | single bond | H | c-Pr | C(=O)Ph | Cl | C(=O)Me | O |

TABLE 705

| Compound Number | Y | W | Z | $R^1$ | $R^2$ | $R^3$ | $R^{10}$ | A |
|---|---|---|---|---|---|---|---|---|
| D-2635 | Me(S) | single bond | H | c-Pr | C(=O)Ph | Cl | C(=O)Me | O |
| D-2636 | H | $CH_2$ | Me | c-Pr | C(=O)Ph | Cl | C(=O)Me | O |
| D-2637 | Me | $CH_2$ | H | c-Pr | C(=O)Ph | Cl | C(=O)Me | O |
| D-2638 | H | CH(Me) | H | c-Pr | C(=O)Ph | Cl | C(=O)Me | O |
| D-2639 | H | $CH_2CH_2$ | Me | c-Pr | C(=O)Ph | Cl | C(=O)Me | O |
| D-2640 | Me | $CH_2CH_2$ | H | c-Pr | C(=O)Ph | Cl | C(=O)Me | O |
| D-2641 | H | single bond | Me | c-Pr | C(=O)Ph | Me | C(=O)Me | O |
| D-2642 | Me | single bond | H | c-Pr | C(=O)Ph | Me | C(=O)Me | O |
| D-2643 | Me(R) | single bond | H | c-Pr | C(=O)Ph | Me | C(=O)Me | O |
| D-2644 | Me(S) | single bond | H | c-Pr | C(=O)Ph | Me | C(=O)Me | O |
| D-2645 | H | $CH_2$ | Me | c-Pr | C(=O)Ph | Me | C(=O)Me | O |
| D-2646 | Me | $CH_2$ | H | c-Pr | C(=O)Ph | Me | C(=O)Me | O |
| D-2647 | H | CH(Me) | H | c-Pr | C(=O)Ph | Me | C(=O)Me | O |
| D-2648 | H | $CH_2CH_2$ | Me | c-Pr | C(=O)Ph | Me | C(=O)Me | O |
| D-2649 | Me | $CH_2CH_2$ | H | c-Pr | C(=O)Ph | Me | C(=O)Me | O |
| D-2650 | H | single bond | Me | c-Pr | C(=O)OEt | Cl | Me | O |
| D-2651 | H | single bond | Et | c-Pr | C(=O)OEt | Cl | Me | O |
| D-2652 | Me | single bond | H | c-Pr | C(=O)OEt | Cl | Me | O |
| D-2653 | Me(R) | single bond | H | c-Pr | C(=O)OEt | Cl | Me | O |
| D-2654 | Me(S) | single bond | H | c-Pr | C(=O)OEt | Cl | Me | O |
| D-2655 | H | $CH_2$ | Me | c-Pr | C(=O)OEt | Cl | Me | O |
| D-2656 | Me | $CH_2$ | H | c-Pr | C(=O)OEt | Cl | Me | O |
| D-2657 | H | CH(Me) | H | c-Pr | C(=O)OEt | Cl | Me | O |
| D-2658 | H | $CH_2CH_2$ | Me | c-Pr | C(=O)OEt | Cl | Me | O |
| D-2659 | Me | $CH_2CH_2$ | H | c-Pr | C(=O)OEt | Cl | Me | O |
| D-2660 | H | single bond | Me | c-Pr | C(=O)OEt | Me | Me | O |

TABLE 705-continued

| Compound Number | Y | W | Z | $R^1$ | $R^2$ | $R^3$ | $R^{10}$ | A |
|---|---|---|---|---|---|---|---|---|
| D-2661 | Me | single bond | H | c-Pr | C(=O)OEt | Me | Me | O |
| D-2662 | Me(R) | single bond | H | c-Pr | C(=O)OEt | Me | Me | O |
| D-2663 | Me(S) | single bond | H | c-Pr | C(=O)OEt | Me | Me | O |
| D-2664 | H | $CH_2$ | Me | c-Pr | C(=O)OEt | Me | Me | O |
| D-2665 | Me | $CH_2$ | H | c-Pr | C(=O)OEt | Me | Me | O |
| D-2666 | H | CH(Me) | H | c-Pr | C(=O)OEt | Me | Me | O |
| D-2667 | H | $CH_2CH_2$ | Me | c-Pr | C(=O)OEt | Me | Me | O |
| D-2668 | Me | $CH_2CH_2$ | H | c-Pr | C(=O)OEt | Me | Me | O |
| D-2669 | H | single bond | Me | c-Pr | C(=O)OEt | Cl | Et | O |
| D-2670 | Me | single bond | H | c-Pr | C(=O)OEt | Cl | Et | O |
| D-2671 | Me(R) | single bond | H | c-Pr | C(=O)OEt | Cl | Et | O |
| D-2672 | Me(S) | single bond | H | c-Pr | C(=O)OEt | Cl | Et | O |
| D-2673 | H | $CH_2$ | Me | c-Pr | C(=O)OEt | Cl | Et | O |
| D-2674 | Me | $CH_2$ | H | c-Pr | C(=O)OEt | Cl | Et | O |
| D-2675 | H | CH(Me) | H | c-Pr | C(=O)OEt | Cl | Et | O |
| D-2676 | H | $CH_2CH_2$ | Me | c-Pr | C(=O)OEt | Cl | Et | O |
| D-2677 | Me | $CH_2CH_2$ | H | c-Pr | C(=O)OEt | Cl | Et | O |
| D-2678 | H | single bond | Me | c-Pr | C(=O)OEt | Me | Et | O |

TABLE 706

| Compound Number | Y | W | Z | $R^1$ | $R^2$ | $R^3$ | $R^{10}$ | A |
|---|---|---|---|---|---|---|---|---|
| D-2679 | Me | single bond | H | c-Pr | C(=O)OEt | Me | Et | O |
| D-2680 | Me(R) | single bond | H | c-Pr | C(=O)OEt | Me | Et | O |
| D-2681 | Me(S) | single bond | H | c-Pr | C(=O)OEt | Me | Et | O |
| D-2682 | H | $CH_2$ | Me | c-Pr | C(=O)OEt | Me | Et | O |
| D-2683 | Me | $CH_2$ | H | c-Pr | C(=O)OEt | Me | Et | O |
| D-2684 | H | CH(Me) | H | c-Pr | C(=O)OEt | Me | Et | O |
| D-2685 | H | $CH_2CH_2$ | Me | c-Pr | C(=O)OEt | Me | Et | O |
| D-2686 | Me | $CH_2CH_2$ | H | c-Pr | C(=O)OEt | Me | Et | O |
| D-2687 | H | single bond | Me | c-Pr | C(=O)OEt | Cl | $CH_2CF_3$ | O |
| D-2688 | Me | single bond | H | c-Pr | C(=O)OEt | Cl | $CH_2CF_3$ | O |
| D-2689 | Me(R) | single bond | H | c-Pr | C(=O)OEt | Cl | $CH_2CF_3$ | O |
| D-2690 | Me(S) | single bond | H | c-Pr | C(=O)OEt | Cl | $CH_2CF_3$ | O |
| D-2691 | H | $CH_2$ | Me | c-Pr | C(=O)OEt | Cl | $CH_2CF_3$ | O |
| D-2692 | Me | $CH_2$ | H | c-Pr | C(=O)OEt | Cl | $CH_2CF_3$ | O |
| D-2693 | H | CH(Me) | H | c-Pr | C(=O)OEt | Cl | $CH_2CF_3$ | O |
| D-2694 | H | $CH_2CH_2$ | Me | c-Pr | C(=O)OEt | Cl | $CH_2CF_3$ | O |
| D-2695 | Me | $CH_2CH_2$ | H | c-Pr | C(=O)OEt | Cl | $CH_2CF_3$ | O |
| D-2696 | H | single bond | Me | c-Pr | C(=O)OEt | Me | $CH_2CF_3$ | O |
| D-2697 | Me | single bond | H | c-Pr | C(=O)OEt | Me | $CH_2CF_3$ | O |
| D-2698 | Me(R) | single bond | H | c-Pr | C(=O)OEt | Me | $CH_2CF_3$ | O |
| D-2699 | Me(S) | single bond | H | c-Pr | C(=O)OEt | Me | $CH_2CF_3$ | O |
| D-2700 | H | $CH_2$ | Me | c-Pr | C(=O)OEt | Me | $CH_2CF_3$ | O |
| D-2701 | Me | $CH_2$ | H | c-Pr | C(=O)OEt | Me | $CH_2CF_3$ | O |
| D-2702 | H | CH(Me) | H | c-Pr | C(=O)OEt | Me | $CH_2CF_3$ | O |
| D-2703 | H | $CH_2CH_2$ | Me | c-Pr | C(=O)OEt | Me | $CH_2CF_3$ | O |
| D-2704 | Me | $CH_2CH_2$ | H | c-Pr | C(=O)OEt | Me | $CH_2CF_3$ | O |
| D-2705 | H | single bond | Me | c-Pr | C(=O)OEt | Cl | $CH_2OMe$ | O |
| D-2706 | Me | single bond | H | c-Pr | C(=O)OEt | Cl | $CH_2OMe$ | O |
| D-2707 | Me(R) | single bond | H | c-Pr | C(=O)OEt | Cl | $CH_2OMe$ | O |
| D-2708 | Me(S) | single bond | H | c-Pr | C(=O)OEt | Cl | $CH_2OMe$ | O |
| D-2709 | H | $CH_2$ | Me | c-Pr | C(=O)OEt | Cl | $CH_2OMe$ | O |
| D-2710 | Me | $CH_2$ | H | c-Pr | C(=O)OEt | Cl | $CH_2OMe$ | O |
| D-2711 | H | CH(Me) | H | c-Pr | C(=O)OEt | Cl | $CH_2OMe$ | O |
| D-2712 | H | $CH_2CH_2$ | Me | c-Pr | C(=O)OEt | Cl | $CH_2OMe$ | O |
| D-2713 | Me | $CH_2CH_2$ | H | c-Pr | C(=O)OEt | Cl | $CH_2OMe$ | O |
| D-2714 | H | single bond | Me | c-Pr | C(=O)OEt | Me | $CH_2OMe$ | O |
| D-2715 | Me | single bond | H | c-Pr | C(=O)OEt | Me | $CH_2OMe$ | O |
| D-2716 | Me(R) | single bond | H | c-Pr | C(=O)OEt | Me | $CH_2OMe$ | O |
| D-2717 | Me(S) | single bond | H | c-Pr | C(=O)OEt | Me | $CH_2OMe$ | O |
| D-2718 | H | $CH_2$ | Me | c-Pr | C(=O)OEt | Me | $CH_2OMe$ | O |
| D-2719 | Me | $CH_2$ | H | c-Pr | C(=O)OEt | Me | $CH_2OMe$ | O |
| D-2720 | H | CH(Me) | H | c-Pr | C(=O)OEt | Me | $CH_2OMe$ | O |
| D-2721 | H | $CH_2CH_2$ | Me | c-Pr | C(=O)OEt | Me | $CH_2OMe$ | O |
| D-2722 | Me | $CH_2CH_2$ | H | c-Pr | C(=O)OEt | Me | $CH_2OMe$ | O |

TABLE 707

| Compound Number | Y | W | Z | $R^1$ | $R^2$ | $R^3$ | $R^{10}$ | A |
|---|---|---|---|---|---|---|---|---|
| D-2723 | H | single bond | Me | c-Pr | C(=O)OEt | Cl | $CH_2CN$ | O |
| D-2724 | Me | single bond | H | c-Pr | C(=O)OEt | Cl | $CH_2CN$ | O |
| D-2725 | Me(R) | single bond | H | c-Pr | C(=O)OEt | Cl | $CH_2CN$ | O |
| D-2726 | Me(S) | single bond | H | c-Pr | C(=O)OEt | Cl | $CH_2CN$ | O |
| D-2727 | H | $CH_2$ | Me | c-Pr | C(=O)OEt | Cl | $CH_2CN$ | O |
| D-2728 | Me | $CH_2$ | H | c-Pr | C(=O)OEt | Cl | $CH_2CN$ | O |
| D-2729 | H | CH(Me) | H | c-Pr | C(=O)OEt | Cl | $CH_2CN$ | O |
| D-2730 | H | $CH_2CH_2$ | Me | c-Pr | C(=O)OEt | Cl | $CH_2CN$ | O |
| D-2731 | Me | $CH_2CH_2$ | H | c-Pr | C(=O)OEt | Cl | $CH_2CN$ | O |
| D-2732 | H | single bond | Me | c-Pr | C(=O)OEt | Me | $CH_2CN$ | O |
| D-2733 | Me | single bond | H | c-Pr | C(=O)OEt | Me | $CH_2CN$ | O |
| D-2734 | Me(R) | single bond | H | c-Pr | C(=O)OEt | Me | $CH_2CN$ | O |
| D-2735 | Me(S) | single bond | H | c-Pr | C(=O)OEt | Me | $CH_2CN$ | O |
| D-2736 | H | $CH_2$ | Me | c-Pr | C(=O)OEt | Me | $CH_2CN$ | O |
| D-2737 | Me | $CH_2$ | H | c-Pr | C(=O)OEt | Me | $CH_2CN$ | O |
| D-2738 | H | CH(Me) | H | c-Pr | C(=O)OEt | Me | $CH_2CN$ | O |
| D-2739 | H | $CH_2CH_2$ | Me | c-Pr | C(=O)OEt | Me | $CH_2CN$ | O |
| D-2740 | Me | $CH_2CH_2$ | H | c-Pr | C(=O)OEt | Me | $CH_2CN$ | O |
| D-2741 | H | single bond | Me | c-Pr | C(=O)OEt | Cl | C(=O)Me | O |
| D-2742 | Me | single bond | H | c-Pr | C(=O)OEt | Cl | C(=O)Me | O |
| D-2743 | Me(R) | single bond | H | c-Pr | C(=O)OEt | Cl | C(=O)Me | O |
| D-2744 | Me(S) | single bond | H | c-Pr | C(=O)OEt | Cl | C(=O)Me | O |
| D-2745 | H | $CH_2$ | Me | c-Pr | C(=O)OEt | Cl | C(=O)Me | O |
| D-2746 | Me | $CH_2$ | H | c-Pr | C(=O)OEt | Cl | C(=O)Me | O |
| D-2747 | H | CH(Me) | H | c-Pr | C(=O)OEt | Cl | C(=O)Me | O |
| D-2748 | H | $CH_2CH_2$ | Me | c-Pr | C(=O)OEt | Cl | C(=O)Me | O |
| D-2749 | Me | $CH_2CH_2$ | H | c-Pr | C(=O)OEt | Cl | C(=O)Me | O |
| D-2750 | H | single bond | Me | c-Pr | C(=O)OEt | Me | C(=O)Me | O |
| D-2751 | Me | single bond | H | c-Pr | C(=O)OEt | Me | C(=O)Me | O |
| D-2752 | Me(R) | single bond | H | c-Pr | C(=O)OEt | Me | C(=O)Me | O |
| D-2753 | Me(S) | single bond | H | c-Pr | C(=O)OEt | Me | C(=O)Me | O |
| D-2754 | H | $CH_2$ | Me | c-Pr | C(=O)OEt | Me | C(=O)Me | O |
| D-2755 | Me | $CH_2$ | H | c-Pr | C(=O)OEt | Me | C(=O)Me | O |
| D-2756 | H | CH(Me) | H | c-Pr | C(=O)OEt | Me | C(=O)Me | O |
| D-2757 | H | $CH_2CH_2$ | Me | c-Pr | C(=O)OEt | Me | C(=O)Me | O |
| D-2758 | Me | $CH_2CH_2$ | H | c-Pr | C(=O)OEt | Me | C(=O)Me | O |
| D-2759 | H | single bond | Me | c-Pr | $S(=O)_2Me$ | Cl | Me | O |
| D-2760 | H | single bond | Et | c-Pr | $S(=O)_2Me$ | Cl | Me | O |
| D-2761 | Me | single bond | H | c-Pr | $S(=O)_2Me$ | Cl | Me | O |
| D-2762 | Me(R) | single bond | H | c-Pr | $S(=O)_2Me$ | Cl | Me | O |
| D-2763 | Me(S) | single bond | H | c-Pr | $S(=O)_2Me$ | Cl | Me | O |
| D-2764 | H | $CH_2$ | Me | c-Pr | $S(=O)_2Me$ | Cl | Me | O |
| D-2765 | Me | $CH_2$ | H | c-Pr | $S(=O)_2Me$ | Cl | Me | O |
| D-2766 | H | CH(Me) | H | c-Pr | $S(=O)_2Me$ | Cl | Me | O |

TABLE 708

| Compound Number | Y | W | Z | $R^1$ | $R^2$ | $R^3$ | $R^{10}$ | A |
|---|---|---|---|---|---|---|---|---|
| D-2767 | H | $CH_2CH_2$ | Me | c-Pr | $S(=O)_2Me$ | Cl | Me | O |
| D-2768 | Me | $CH_2CH_2$ | H | c-Pr | $S(=O)_2Me$ | Cl | Me | O |
| D-2769 | H | single bond | Me | c-Pr | $S(=O)_2Me$ | Me | Me | O |
| D-2770 | Me | single bond | H | c-Pr | $S(=O)_2Me$ | Me | Me | O |
| D-2771 | Me(R) | single bond | H | c-Pr | $S(=O)_2Me$ | Me | Me | O |
| D-2772 | Me(S) | single bond | H | c-Pr | $S(=O)_2Me$ | Me | Me | O |
| D-2773 | H | $CH_2$ | Me | c-Pr | $S(=O)_2Me$ | Me | Me | O |
| D-2774 | Me | $CH_2$ | H | c-Pr | $S(=O)_2Me$ | Me | Me | O |
| D-2775 | H | CH(Me) | H | c-Pr | $S(=O)_2Me$ | Me | Me | O |
| D-2776 | H | $CH_2CH_2$ | Me | c-Pr | $S(=O)_2Me$ | Me | Me | O |
| D-2777 | Me | $CH_2CH_2$ | H | c-Pr | $S(=O)_2Me$ | Me | Me | O |
| D-2778 | H | single bond | Me | c-Pr | $S(=O)_2Me$ | Cl | Et | O |
| D-2779 | Me | single bond | H | c-Pr | $S(=O)_2Me$ | Cl | Et | O |
| D-2780 | Me(R) | single bond | H | c-Pr | $S(=O)_2Me$ | Cl | Et | O |
| D-2781 | Me(S) | single bond | H | c-Pr | $S(=O)_2Me$ | Cl | Et | O |
| D-2782 | H | $CH_2$ | Me | c-Pr | $S(=O)_2Me$ | Cl | Et | O |
| D-2783 | Me | $CH_2$ | H | c-Pr | $S(=O)_2Me$ | Cl | Et | O |
| D-2784 | H | CH(Me) | H | c-Pr | $S(=O)_2Me$ | Cl | Et | O |
| D-2785 | H | $CH_2CH_2$ | Me | c-Pr | $S(=O)_2Me$ | Cl | Et | O |
| D-2786 | Me | $CH_2CH_2$ | H | c-Pr | $S(=O)_2Me$ | Cl | Et | O |
| D-2787 | H | single bond | Me | c-Pr | $S(=O)_2Me$ | Me | Et | O |
| D-2788 | Me | single bond | H | c-Pr | $S(=O)_2Me$ | Me | Et | O |
| D-2789 | Me(R) | single bond | H | c-Pr | $S(=O)_2Me$ | Me | Et | O |

TABLE 708-continued

| Compound Number | Y | W | Z | $R^1$ | $R^2$ | $R^3$ | $R^{10}$ | A |
|---|---|---|---|---|---|---|---|---|
| D-2790 | Me(S) | single bond | H | c-Pr | $S(=O)_2Me$ | Me | Et | O |
| D-2791 | H | $CH_2$ | Me | c-Pr | $S(=O)_2Me$ | Me | Et | O |
| D-2792 | Me | $CH_2$ | H | c-Pr | $S(=O)_2Me$ | Me | Et | O |
| D-2793 | H | CH(Me) | H | c-Pr | $S(=O)_2Me$ | Me | Et | O |
| D-2794 | H | $CH_2CH_2$ | Me | c-Pr | $S(=O)_2Me$ | Me | Et | O |
| D-2795 | Me | $CH_2CH_2$ | H | c-Pr | $S(=O)_2Me$ | Me | Et | O |
| D-2796 | H | single bond | Me | c-Pr | $S(=O)_2Me$ | Cl | $CH_2CF_3$ | O |
| D-2797 | Me | single bond | H | c-Pr | $S(=O)_2Me$ | Cl | $CH_2CF_3$ | O |
| D-2798 | Me(R) | single bond | H | c-Pr | $S(=O)_2Me$ | Cl | $CH_2CF_3$ | O |
| D-2799 | Me(S) | single bond | H | c-Pr | $S(=O)_2Me$ | Cl | $CH_2CF_3$ | O |
| D-2800 | H | $CH_2$ | Me | c-Pr | $S(=O)_2Me$ | Cl | $CH_2CF_3$ | O |
| D-2801 | Me | $CH_2$ | H | c-Pr | $S(=O)_2Me$ | Cl | $CH_2CF_3$ | O |
| D-2802 | H | CH(Me) | H | c-Pr | $S(=O)_2Me$ | Cl | $CH_2CF_3$ | O |
| D-2803 | H | $CH_2CH_2$ | Me | c-Pr | $S(=O)_2Me$ | Cl | $CH_2CF_3$ | O |
| D-2804 | Me | $CH_2CH_2$ | H | c-Pr | $S(=O)_2Me$ | Cl | $CH_2CF_3$ | O |
| D-2805 | H | single bond | Me | c-Pr | $S(=O)_2Me$ | Me | $CH_2CF_3$ | O |
| D-2806 | Me | single bond | H | c-Pr | $S(=O)_2Me$ | Me | $CH_2CF_3$ | O |
| D-2807 | Me(R) | single bond | H | c-Pr | $S(=O)_2Me$ | Me | $CH_2CF_3$ | O |
| D-2808 | Me(S) | single bond | H | c-Pr | $S(=O)_2Me$ | Me | $CH_2CF_3$ | O |
| D-2809 | H | $CH_2$ | Me | c-Pr | $S(=O)_2Me$ | Me | $CH_2CF_3$ | O |
| D-2810 | Me | $CH_2$ | H | c-Pr | $S(=O)_2Me$ | Me | $CH_2CF_3$ | O |

TABLE 709

| Compound Number | Y | W | Z | $R^1$ | $R^2$ | $R^3$ | $R^{10}$ | A |
|---|---|---|---|---|---|---|---|---|
| D-2811 | H | CH(Me) | H | c-Pr | $S(=O)_2Me$ | Me | $CH_2CF_3$ | O |
| D-2812 | H | $CH_2CH_2$ | Me | c-Pr | $S(=O)_2Me$ | Me | $CH_2CF_3$ | O |
| D-2813 | Me | $CH_2CH_2$ | H | c-Pr | $S(=O)_2Me$ | Me | $CH_2CF_3$ | O |
| D-2814 | H | single bond | Me | c-Pr | $S(=O)_2Me$ | Cl | $CH_2OMe$ | O |
| D-2815 | Me | single bond | H | c-Pr | $S(=O)_2Me$ | Cl | $CH_2OMe$ | O |
| D-2816 | Me(R) | single bond | H | c-Pr | $S(=O)_2Me$ | Cl | $CH_2OMe$ | O |
| D-2817 | Me(S) | single bond | H | c-Pr | $S(=O)_2Me$ | Cl | $CH_2OMe$ | O |
| D-2818 | H | $CH_2$ | Me | c-Pr | $S(=O)_2Me$ | Cl | $CH_2OMe$ | O |
| D-2819 | Me | $CH_2$ | H | c-Pr | $S(=O)_2Me$ | Cl | $CH_2OMe$ | O |
| D-2820 | H | CH(Me) | H | c-Pr | $S(=O)_2Me$ | Cl | $CH_2OMe$ | O |
| D-2821 | H | $CH_2CH_2$ | Me | c-Pr | $S(=O)_2Me$ | Cl | $CH_2OMe$ | O |
| D-2822 | Me | $CH_2CH_2$ | H | c-Pr | $S(=O)_2Me$ | Cl | $CH_2OMe$ | O |
| D-2823 | H | single bond | Me | c-Pr | $S(=O)_2Me$ | Me | $CH_2OMe$ | O |
| D-2824 | Me | single bond | H | c-Pr | $S(=O)_2Me$ | Me | $CH_2OMe$ | O |
| D-2825 | Me(R) | single bond | H | c-Pr | $S(=O)_2Me$ | Me | $CH_2OMe$ | O |
| D-2826 | Me(S) | single bond | H | c-Pr | $S(=O)_2Me$ | Me | $CH_2OMe$ | O |
| D-2827 | H | $CH_2$ | Me | c-Pr | $S(=O)_2Me$ | Me | $CH_2OMe$ | O |
| D-2828 | Me | $CH_2$ | H | c-Pr | $S(=O)_2Me$ | Me | $CH_2OMe$ | O |
| D-2829 | H | CH(Me) | H | c-Pr | $S(=O)_2Me$ | Me | $CH_2OMe$ | O |
| D-2830 | H | $CH_2CH_2$ | Me | c-Pr | $S(=O)_2Me$ | Me | $CH_2OMe$ | O |
| D-2831 | Me | $CH_2CH_2$ | H | c-Pr | $S(=O)_2Me$ | Me | $CH_2OMe$ | O |
| D-2832 | H | single bond | Me | c-Pr | $S(=O)_2Me$ | Cl | $CH_2CN$ | O |
| D-2833 | Me | single bond | H | c-Pr | $S(=O)_2Me$ | Cl | $CH_2CN$ | O |
| D-2834 | Me(R) | single bond | H | c-Pr | $S(=O)_2Me$ | Cl | $CH_2CN$ | O |
| D-2835 | Me(S) | single bond | H | c-Pr | $S(=O)_2Me$ | Cl | $CH_2CN$ | O |
| D-2836 | H | $CH_2$ | Me | c-Pr | $S(=O)_2Me$ | Cl | $CH_2CN$ | O |
| D-2837 | Me | $CH_2$ | H | c-Pr | $S(=O)_2Me$ | Cl | $CH_2CN$ | O |
| D-2838 | H | CH(Me) | H | c-Pr | $S(=O)_2Me$ | Cl | $CH_2CN$ | O |
| D-2839 | H | $CH_2CH_2$ | Me | c-Pr | $S(=O)_2Me$ | Cl | $CH_2CN$ | O |
| D-2840 | Me | $CH_2CH_2$ | H | c-Pr | $S(=O)_2Me$ | Cl | $CH_2CN$ | O |
| D-2841 | H | single bond | Me | c-Pr | $S(=O)_2Me$ | Me | $CH_2CN$ | O |
| D-2842 | Me | single bond | H | c-Pr | $S(=O)_2Me$ | Me | $CH_2CN$ | O |
| D-2843 | Me(R) | single bond | H | c-Pr | $S(=O)_2Me$ | Me | $CH_2CN$ | O |
| D-2844 | Me(S) | single bond | H | c-Pr | $S(=O)_2Me$ | Me | $CH_2CN$ | O |
| D-2845 | H | $CH_2$ | Me | c-Pr | $S(=O)_2Me$ | Me | $CH_2CN$ | O |
| D-2846 | Me | $CH_2$ | H | c-Pr | $S(=O)_2Me$ | Me | $CH_2CN$ | O |
| D-2847 | H | CH(Me) | H | c-Pr | $S(=O)_2Me$ | Me | $CH_2CN$ | O |
| D-2848 | H | $CH_2CH_2$ | Me | c-Pr | $S(=O)_2Me$ | Me | $CH_2CN$ | O |
| D-2849 | Me | $CH_2CH_2$ | H | c-Pr | $S(=O)_2Me$ | Me | $CH_2CN$ | O |
| D-2850 | H | single bond | Me | c-Pr | $S(=O)_2Me$ | Cl | C(=O)Me | O |
| D-2851 | Me | single bond | H | c-Pr | $S(=O)_2Me$ | Cl | C(=O)Me | O |
| D-2852 | Me(R) | single bond | H | c-Pr | $S(=O)_2Me$ | Cl | C(=O)Me | O |
| D-2853 | Me(S) | single bond | H | c-Pr | $S(=O)_2Me$ | Cl | C(=O)Me | O |
| D-2854 | H | $CH_2$ | Me | c-Pr | $S(=O)_2Me$ | Cl | C(=O)Me | O |

TABLE 710

| Compound Number | Y | W | Z | $R^1$ | $R^2$ | $R^3$ | $R^{10}$ | A |
|---|---|---|---|---|---|---|---|---|
| D-2855 | Me | $CH_2$ | H | c-Pr | $S(=O)_2Me$ | Cl | C(=O)Me | O |
| D-2856 | H | CH(Me) | H | c-Pr | $S(=O)_2Me$ | Cl | C(=O)Me | O |
| D-2857 | H | $CH_2CH_2$ | Me | c-Pr | $S(=O)_2Me$ | Cl | C(=O)Me | O |
| D-2858 | Me | $CH_2CH_2$ | H | c-Pr | $S(=O)_2Me$ | Cl | C(=O)Me | O |
| D-2859 | H | single bond | Me | c-Pr | $S(=O)_2Me$ | Me | C(=O)Me | O |
| D-2860 | Me | single bond | H | c-Pr | $S(=O)_2Me$ | Me | C(=O)Me | O |
| D-2861 | Me(R) | single bond | H | c-Pr | $S(=O)_2Me$ | Me | C(=O)Me | O |
| D-2862 | Me(S) | single bond | H | c-Pr | $S(=O)_2Me$ | Me | C(=O)Me | O |
| D-2863 | H | $CH_2$ | Me | c-Pr | $S(=O)_2Me$ | Me | C(=O)Me | O |
| D-2864 | Me | $CH_2$ | H | c-Pr | $S(=O)_2Me$ | Me | C(=O)Me | O |
| D-2865 | H | CH(Me) | H | c-Pr | $S(=O)_2Me$ | Me | C(=O)Me | O |
| D-2866 | H | $CH_2CH_2$ | Me | c-Pr | $S(=O)_2Me$ | Me | C(=O)Me | O |
| D-2867 | Me | $CH_2CH_2$ | H | c-Pr | $S(=O)_2Me$ | Me | C(=O)Me | O |
| D-2868 | H | single bond | Me | c-Pr | $S(=O)_2CF_3$ | Cl | Me | O |
| D-2869 | H | single bond | Et | c-Pr | $S(=O)_2CF_3$ | Cl | Me | O |
| D-2870 | Me | single bond | H | c-Pr | $S(=O)_2CF_3$ | Cl | Me | O |
| D-2871 | Me(R) | single bond | H | c-Pr | $S(=O)_2CF_3$ | Cl | Me | O |
| D-2872 | Me(S) | single bond | H | c-Pr | $S(=O)_2CF_3$ | Cl | Me | O |
| D-2873 | H | $CH_2$ | Me | c-Pr | $S(=O)_2CF_3$ | Cl | Me | O |
| D-2874 | Me | $CH_2$ | H | c-Pr | $S(=O)_2CF_3$ | Cl | Me | O |
| D-2875 | H | CH(Me) | H | c-Pr | $S(=O)_2CF_3$ | Cl | Me | O |
| D-2876 | H | $CH_2CH_2$ | Me | c-Pr | $S(=O)_2CF_3$ | Cl | Me | O |
| D-2877 | Me | $CH_2CH_2$ | H | c-Pr | $S(=O)_2CF_3$ | Cl | Me | O |
| D-2878 | H | single bond | Me | c-Pr | $S(=O)_2CF_3$ | Me | Me | O |
| D-2879 | Me | single bond | H | c-Pr | $S(=O)_2CF_3$ | Me | Me | O |
| D-2880 | Me(R) | single bond | H | c-Pr | $S(=O)_2CF_3$ | Me | Me | O |
| D-2881 | Me(S) | single bond | H | c-Pr | $S(=O)_2CF_3$ | Me | Me | O |
| D-2882 | H | $CH_2$ | Me | c-Pr | $S(=O)_2CF_3$ | Me | Me | O |
| D-2883 | Me | $CH_2$ | H | c-Pr | $S(=O)_2CF_3$ | Me | Me | O |
| D-2884 | H | CH(Me) | H | c-Pr | $S(=O)_2CF_3$ | Me | Me | O |
| D-2885 | H | $CH_2CH_2$ | Me | c-Pr | $S(=O)_2CF_3$ | Me | Me | O |
| D-2886 | Me | $CH_2CH_2$ | H | c-Pr | $S(=O)_2CF_3$ | Me | Me | O |
| D-2887 | H | single bond | Me | c-Pr | $S(=O)_2CF_3$ | Cl | Et | O |
| D-2888 | Me | single bond | H | c-Pr | $S(=O)_2CF_3$ | Cl | Et | O |
| D-2889 | Me(R) | single bond | H | c-Pr | $S(=O)_2CF_3$ | Cl | Et | O |
| D-2890 | Me(S) | single bond | H | c-Pr | $S(=O)_2CF_3$ | Cl | Et | O |
| D-2891 | H | $CH_2$ | Me | c-Pr | $S(=O)_2CF_3$ | Cl | Et | O |
| D-2892 | Me | $CH_2$ | H | c-Pr | $S(=O)_2CF_3$ | Cl | Et | O |
| D-2893 | H | CH(Me) | H | c-Pr | $S(=O)_2CF_3$ | Cl | Et | O |
| D-2894 | H | $CH_2CH_2$ | Me | c-Pr | $S(=O)_2CF_3$ | Cl | Et | O |
| D-2895 | Me | $CH_2CH_2$ | H | c-Pr | $S(=O)_2CF_3$ | Cl | Et | O |
| D-2896 | H | single bond | Me | c-Pr | $S(=O)_2CF_3$ | Me | Et | O |
| D-2897 | Me | single bond | H | c-Pr | $S(=O)_2CF_3$ | Me | Et | O |
| D-2898 | Me(R) | single bond | H | c-Pr | $S(=O)_2CF_3$ | Me | Et | O |

TABLE 711

| Compound Number | Y | W | Z | $R^1$ | $R^2$ | $R^3$ | $R^{10}$ | A |
|---|---|---|---|---|---|---|---|---|
| D-2899 | Me(S) | single bond | H | c-Pr | $S(=O)_2CF_3$ | Me | Et | O |
| D-2900 | H | $CH_2$ | Me | c-Pr | $S(=O)_2CF_3$ | Me | Et | O |
| D-2901 | Me | $CH_2$ | H | c-Pr | $S(=O)_2CF_3$ | Me | Et | O |
| D-2902 | H | CH(Me) | H | c-Pr | $S(=O)_2CF_3$ | Me | Et | O |
| D-2903 | H | $CH_2CH_2$ | Me | c-Pr | $S(=O)_2CF_3$ | Me | Et | O |
| D-2904 | Me | $CH_2CH_2$ | H | c-Pr | $S(=O)_2CF_3$ | Me | Et | O |
| D-2905 | H | single bond | Me | c-Pr | $S(=O)_2CF_3$ | Cl | $CH_2CF_3$ | O |
| D-2906 | Me | single bond | H | c-Pr | $S(=O)_2CF_3$ | Cl | $CH_2CF_3$ | O |
| D-2907 | Me(R) | single bond | H | c-Pr | $S(=O)_2CF_3$ | Cl | $CH_2CF_3$ | O |
| D-2908 | Me(S) | single bond | H | c-Pr | $S(=O)_2CF_3$ | Cl | $CH_2CF_3$ | O |
| D-2909 | H | $CH_2$ | Me | c-Pr | $S(=O)_2CF_3$ | Cl | $CH_2CF_3$ | O |
| D-2910 | Me | $CH_2$ | H | c-Pr | $S(=O)_2CF_3$ | Cl | $CH_2CF_3$ | O |
| D-2911 | H | CH(Me) | H | c-Pr | $S(=O)_2CF_3$ | Cl | $CH_2CF_3$ | O |
| D-2912 | H | $CH_2CH_2$ | Me | c-Pr | $S(=O)_2CF_3$ | Cl | $CH_2CF_3$ | O |
| D-2913 | Me | $CH_2CH_2$ | H | c-Pr | $S(=O)_2CF_3$ | Cl | $CH_2CF_3$ | O |
| D-2914 | H | single bond | Me | c-Pr | $S(=O)_2CF_3$ | Me | $CH_2CF_3$ | O |
| D-2915 | Me | single bond | H | c-Pr | $S(=O)_2CF_3$ | Me | $CH_2CF_3$ | O |
| D-2916 | Me(R) | single bond | H | c-Pr | $S(=O)_2CF_3$ | Me | $CH_2CF_3$ | O |
| D-2917 | Me(S) | single bond | H | c-Pr | $S(=O)_2CF_3$ | Me | $CH_2CF_3$ | O |
| D-2918 | H | $CH_2$ | Me | c-Pr | $S(=O)_2CF_3$ | Me | $CH_2CF_3$ | O |
| D-2919 | Me | $CH_2$ | H | c-Pr | $S(=O)_2CF_3$ | Me | $CH_2CF_3$ | O |

TABLE 711-continued

| Compound Number | Y | W | Z | $R^1$ | $R^2$ | $R^3$ | $R^{10}$ | A |
|---|---|---|---|---|---|---|---|---|
| D-2920 | H | CH(Me) | H | c-Pr | $S(=O)_2CF_3$ | Me | $CH_2CF_3$ | O |
| D-2921 | H | $CH_2CH_2$ | Me | c-Pr | $S(=O)_2CF_3$ | Me | $CH_2CF_3$ | O |
| D-2922 | Me | $CH_2CH_2$ | H | c-Pr | $S(=O)_2CF_3$ | Me | $CH_2CF_3$ | O |
| D-2923 | H | single bond | Me | c-Pr | $S(=O)_2CF_3$ | Cl | $CH_2OMe$ | O |
| D-2924 | Me | single bond | H | c-Pr | $S(=O)_2CF_3$ | Cl | $CH_2OMe$ | O |
| D-2925 | Me(R) | single bond | H | c-Pr | $S(=O)_2CF_3$ | Cl | $CH_2OMe$ | O |
| D-2926 | Me(S) | single bond | H | c-Pr | $S(=O)_2CF_3$ | Cl | $CH_2OMe$ | O |
| D-2927 | H | $CH_2$ | Me | c-Pr | $S(=O)_2CF_3$ | Cl | $CH_2OMe$ | O |
| D-2928 | Me | $CH_2$ | H | c-Pr | $S(=O)_2CF_3$ | Cl | $CH_2OMe$ | O |
| D-2929 | H | CH(Me) | H | c-Pr | $S(=O)_2CF_3$ | Cl | $CH_2OMe$ | O |
| D-2930 | H | $CH_2CH_2$ | Me | c-Pr | $S(=O)_2CF_3$ | Cl | $CH_2OMe$ | O |
| D-2931 | Me | $CH_2CH_2$ | H | c-Pr | $S(=O)_2CF_3$ | Cl | $CH_2OMe$ | O |
| D-2932 | H | single bond | Me | c-Pr | $S(=O)_2CF_3$ | Me | $CH_2OMe$ | O |
| D-2933 | Me | single bond | H | c-Pr | $S(=O)_2CF_3$ | Me | $CH_2OMe$ | O |
| D-2934 | Me(R) | single bond | H | c-Pr | $S(=O)_2CF_3$ | Me | $CH_2OMe$ | O |
| D-2935 | Me(S) | single bond | H | c-Pr | $S(=O)_2CF_3$ | Me | $CH_2OMe$ | O |
| D-2936 | H | $CH_2$ | Me | c-Pr | $S(=O)_2CF_3$ | Me | $CH_2OMe$ | O |
| D-2937 | Me | $CH_2$ | H | c-Pr | $S(=O)_2CF_3$ | Me | $CH_2OMe$ | O |
| D-2938 | H | CH(Me) | H | c-Pr | $S(=O)_2CF_3$ | Me | $CH_2OMe$ | O |
| D-2939 | H | $CH_2CH_2$ | Me | c-Pr | $S(=O)_2CF_3$ | Me | $CH_2OMe$ | O |
| D-2940 | Me | $CH_2CH_2$ | H | c-Pr | $S(=O)_2CF_3$ | Me | $CH_2OMe$ | O |
| D-2941 | H | single bond | Me | c-Pr | $S(=O)_2CF_3$ | Cl | $CH_2CN$ | O |
| D-2942 | Me | single bond | H | c-Pr | $S(=O)_2CF_3$ | Cl | $CH_2CN$ | O |

TABLE 712

| Compound Number | Y | W | Z | $R^1$ | $R^2$ | $R^3$ | $R^{10}$ | A |
|---|---|---|---|---|---|---|---|---|
| D-2943 | Me(R) | single bond | H | c-Pr | $S(=O)_2CF_3$ | Cl | $CH_2CN$ | O |
| D-2944 | Me(S) | single bond | H | c-Pr | $S(=O)_2CF_3$ | Cl | $CH_2CN$ | O |
| D-2945 | H | $CH_2$ | Me | c-Pr | $S(=O)_2CF_3$ | Cl | $CH_2CN$ | O |
| D-2946 | Me | $CH_2$ | H | c-Pr | $S(=O)_2CF_3$ | Cl | $CH_2CN$ | O |
| D-2947 | H | CH(Me) | H | c-Pr | $S(=O)_2CF_3$ | Cl | $CH_2CN$ | O |
| D-2948 | H | $CH_2CH_2$ | Me | c-Pr | $S(=O)_2CF_3$ | Cl | $CH_2CN$ | O |
| D-2949 | Me | $CH_2CH_2$ | H | c-Pr | $S(=O)_2CF_3$ | Cl | $CH_2CN$ | O |
| D-2950 | H | single bond | Me | c-Pr | $S(=O)_2CF_3$ | Me | $CH_2CN$ | O |
| D-2951 | Me | single bond | H | c-Pr | $S(=O)_2CF_3$ | Me | $CH_2CN$ | O |
| D-2952 | Me(R) | single bond | H | c-Pr | $S(=O)_2CF_3$ | Me | $CH_2CN$ | O |
| D-2953 | Me(S) | single bond | H | c-Pr | $S(=O)_2CF_3$ | Me | $CH_2CN$ | O |
| D-2954 | H | $CH_2$ | Me | c-Pr | $S(=O)_2CF_3$ | Me | $CH_2CN$ | O |
| D-2955 | Me | $CH_2$ | H | c-Pr | $S(=O)_2CF_3$ | Me | $CH_2CN$ | O |
| D-2956 | H | CH(Me) | H | c-Pr | $S(=O)_2CF_3$ | Me | $CH_2CN$ | O |
| D-2957 | H | $CH_2CH_2$ | Me | c-Pr | $S(=O)_2CF_3$ | Me | $CH_2CN$ | O |
| D-2958 | Me | $CH_2CH_2$ | H | c-Pr | $S(=O)_2CF_3$ | Me | $CH_2CN$ | O |
| D-2959 | H | single bond | Me | c-Pr | $S(=O)_2CF_3$ | Cl | C(=O)Me | O |
| D-2960 | Me | single bond | H | c-Pr | $S(=O)_2CF_3$ | Cl | C(=O)Me | O |
| D-2961 | Me(R) | single bond | H | c-Pr | $S(=O)_2CF_3$ | Cl | C(=O)Me | O |
| D-2962 | Me(S) | single bond | H | c-Pr | $S(=O)_2CF_3$ | Cl | C(=O)Me | O |
| D-2963 | H | $CH_2$ | Me | c-Pr | $S(=O)_2CF_3$ | Cl | C(=O)Me | O |
| D-2964 | Me | $CH_2$ | H | c-Pr | $S(=O)_2CF_3$ | Cl | C(=O)Me | O |
| D-2965 | H | CH(Me) | H | c-Pr | $S(=O)_2CF_3$ | Cl | C(=O)Me | O |
| D-2966 | H | $CH_2CH_2$ | Me | c-Pr | $S(=O)_2CF_3$ | Cl | C(=O)Me | O |
| D-2967 | Me | $CH_2CH_2$ | H | c-Pr | $S(=O)_2CF_3$ | Cl | C(=O)Me | O |
| D-2968 | H | single bond | Me | c-Pr | $S(=O)_2CF_3$ | Me | C(=O)Me | O |
| D-2969 | Me | single bond | H | c-Pr | $S(=O)_2CF_3$ | Me | C(=O)Me | O |
| D-2970 | Me(R) | single bond | H | c-Pr | $S(=O)_2CF_3$ | Me | C(=O)Me | O |
| D-2971 | Me(S) | single bond | H | c-Pr | $S(=O)_2CF_3$ | Me | C(=O)Me | O |
| D-2972 | H | $CH_2$ | Me | c-Pr | $S(=O)_2CF_3$ | Me | C(=O)Me | O |
| D-2973 | Me | $CH_2$ | H | c-Pr | $S(=O)_2CF_3$ | Me | C(=O)Me | O |
| D-2974 | H | CH(Me) | H | c-Pr | $S(=O)_2CF_3$ | Me | C(=O)Me | O |
| D-2975 | H | $CH_2CH_2$ | Me | c-Pr | $S(=O)_2CF_3$ | Me | C(=O)Me | O |
| D-2976 | Me | $CH_2CH_2$ | H | c-Pr | $S(=O)_2CF_3$ | Me | C(=O)Me | O |
| D-2977 | H | single bond | Me | c-Pr | H | Cl | H | O |
| D-2978 | Me | single bond | H | c-Pr | H | Cl | H | O |
| D-2979 | Me(R) | single bond | H | c-Pr | H | Cl | H | O |
| D-2980 | Me(S) | single bond | H | c-Pr | H | Cl | H | O |
| D-2981 | Me | single bond | H | c-Pr | H | Cl | H | S |
| D-2982 | Me(R) | single bond | H | c-Pr | H | Cl | H | S |
| D-2983 | Me(S) | single bond | H | c-Pr | H | Cl | H | S |
| D-2984 | H | $CH_2$ | Me | c-Pr | H | Cl | H | O |
| D-2985 | Me | $CH_2$ | H | c-Pr | H | Cl | H | O |
| D-2986 | H | CH(Me) | H | c-Pr | H | Cl | H | O |

TABLE 713

| Compound Number | Y | W | Z | $R^1$ | $R^2$ | $R^3$ | $R^{10}$ | A |
|---|---|---|---|---|---|---|---|---|
| D-2987 | H | $CH_2CH_2$ | Me | c-Pr | H | Cl | H | O |
| D-2988 | Me | $CH_2CH_2$ | H | c-Pr | H | Cl | H | O |
| D-2989 | H | single bond | Me | c-Pr | H | Me | H | O |
| D-2990 | Me | single bond | H | c-Pr | H | Me | H | O |
| D-2991 | Me(R) | single bond | H | c-Pr | H | Me | H | O |
| D-2992 | Me(S) | single bond | H | c-Pr | H | Me | H | O |
| D-2993 | Me | single bond | H | c-Pr | H | Me | H | S |
| D-2994 | Me(R) | single bond | H | c-Pr | H | Me | H | S |
| D-2995 | Me(S) | single bond | H | c-Pr | H | Me | H | S |
| D-2996 | H | $CH_2$ | Me | c-Pr | H | Me | H | O |
| D-2997 | Me | $CH_2$ | H | c-Pr | H | Me | H | O |
| D-2998 | H | CH(Me) | H | c-Pr | H | Me | H | O |
| D-2999 | H | $CH_2CH_2$ | Me | c-Pr | H | Me | H | O |
| D-3000 | Me | $CH_2CH_2$ | H | c-Pr | H | Me | H | O |
| D-3001 | H | single bond | Me | c-Pr | H | Cl | Me | O |
| D-3002 | Me | single bond | H | c-Pr | H | Cl | Me | O |
| D-3003 | Me(R) | single bond | H | c-Pr | H | Cl | Me | O |
| D-3004 | Me(S) | single bond | H | c-Pr | H | Cl | Me | O |
| D-3005 | Me | single bond | H | c-Pr | H | Cl | Me | S |
| D-3006 | Me(R) | single bond | H | c-Pr | H | Cl | Me | S |
| D-3007 | Me(S) | single bond | H | c-Pr | H | Cl | Me | S |
| D-3008 | H | $CH_2$ | Me | c-Pr | H | Cl | Me | O |
| D-3009 | Me | $CH_2$ | H | c-Pr | H | Cl | Me | O |
| D-3010 | H | CH(Me) | H | c-Pr | H | Cl | Me | O |
| D-3011 | H | $CH_2CH_2$ | Me | c-Pr | H | Cl | Me | O |
| D-3012 | Me | $CH_2CH_2$ | H | c-Pr | H | Cl | Me | O |
| D-3013 | H | single bond | Me | c-Pr | H | Me | Me | O |
| D-3014 | Me | single bond | H | c-Pr | H | Me | Me | O |
| D-3015 | Me(R) | single bond | H | c-Pr | H | Me | Me | O |
| D-3016 | Me(S) | single bond | H | c-Pr | H | Me | Me | O |
| D-3017 | Me | single bond | H | c-Pr | H | Me | Me | S |
| D-3018 | Me(R) | single bond | H | c-Pr | H | Me | Me | S |
| D-3019 | Me(S) | single bond | H | c-Pr | H | Me | Me | S |
| D-3020 | H | $CH_2$ | Me | c-Pr | H | Me | Me | O |
| D-3021 | Me | $CH_2$ | H | c-Pr | H | Me | Me | O |
| D-3022 | H | CH(Me) | H | c-Pr | H | Me | Me | O |
| D-3023 | H | $CH_2CH_2$ | Me | c-Pr | H | Me | Me | O |
| D-3024 | Me | $CH_2CH_2$ | H | c-Pr | H | Me | Me | O |
| D-3025 | H | single bond | Me | c-Pr | H | Cl | Et | O |
| D-3026 | Me | single bond | H | c-Pr | H | Cl | Et | O |
| D-3027 | Me(R) | single bond | H | c-Pr | H | Cl | Et | O |
| D-3028 | Me(S) | single bond | H | c-Pr | H | Cl | Et | O |
| D-3029 | Me | single bond | H | c-Pr | H | Cl | Et | S |
| D-3030 | Me(R) | single bond | H | c-Pr | H | Cl | Et | S |

TABLE 714

| Compound Number | Y | W | Z | $R^1$ | $R^2$ | $R^3$ | $R^{10}$ | A |
|---|---|---|---|---|---|---|---|---|
| D-3031 | Me(S) | single bond | H | c-Pr | H | Cl | Et | S |
| D-3032 | H | $CH_2$ | Me | c-Pr | H | Cl | Et | O |
| D-3033 | Me | $CH_2$ | H | c-Pr | H | Cl | Et | O |
| D-3034 | H | CH(Me) | H | c-Pr | H | Cl | Et | O |
| D-3035 | H | $CH_2CH_2$ | Me | c-Pr | H | Cl | Et | O |
| D-3036 | Me | $CH_2CH_2$ | H | c-Pr | H | Cl | Et | O |
| D-3037 | H | single bond | Me | c-Pr | H | Me | Et | O |
| D-3038 | Me | single bond | H | c-Pr | H | Me | Et | O |
| D-3039 | Me(R) | single bond | H | c-Pr | H | Me | Et | O |
| D-3040 | Me(S) | single bond | H | c-Pr | H | Me | Et | O |
| D-3041 | Me | single bond | H | c-Pr | H | Me | Et | S |
| D-3042 | Me(R) | single bond | H | c-Pr | H | Me | Et | S |
| D-3043 | Me(S) | single bond | H | c-Pr | H | Me | Et | S |
| D-3044 | H | $CH_2$ | Me | c-Pr | H | Me | Et | O |
| D-3045 | Me | $CH_2$ | H | c-Pr | H | Me | Et | O |
| D-3046 | H | CH(Me) | H | c-Pr | H | Me | Et | O |
| D-3047 | H | $CH_2CH_2$ | Me | c-Pr | H | Me | Et | O |
| D-3048 | Me | $CH_2CH_2$ | H | c-Pr | H | Me | Et | O |
| D-3049 | H | single bond | Me | c-Pr | H | Cl | $CH_2CF_3$ | O |
| D-3050 | Me | single bond | H | c-Pr | H | Cl | $CH_2CF_3$ | O |
| D-3051 | Me(R) | single bond | H | c-Pr | H | Cl | $CH_2CF_3$ | O |
| D-3052 | Me(S) | single bond | H | c-Pr | H | Cl | $CH_2CF_3$ | O |
| D-3053 | Me | single bond | H | c-Pr | H | Cl | $CH_2CF_3$ | S |
| D-3054 | Me(R) | single bond | H | c-Pr | H | Cl | $CH_2CF_3$ | S |

TABLE 714-continued

| Compound Number | Y | W | Z | $R^1$ | $R^2$ | $R^3$ | $R^{10}$ | A |
|---|---|---|---|---|---|---|---|---|
| D-3055 | Me(S) | single bond | H | c-Pr | H | Cl | $CH_2CF_3$ | S |
| D-3056 | H | $CH_2$ | Me | c-Pr | H | Cl | $CH_2CF_3$ | O |
| D-3057 | Me | $CH_2$ | H | c-Pr | H | Cl | $CH_2CF_3$ | O |
| D-3058 | H | CH(Me) | H | c-Pr | H | Cl | $CH_2CF_3$ | O |
| D-3059 | H | $CH_2CH_2$ | Me | c-Pr | H | Cl | $CH_2CF_3$ | O |
| D-3060 | Me | $CH_2CH_2$ | H | c-Pr | H | Cl | $CH_2CF_3$ | O |
| D-3061 | H | single bond | Me | c-Pr | H | Me | $CH_2CF_3$ | O |
| D-3062 | Me | single bond | H | c-Pr | H | Me | $CH_2CF_3$ | O |
| D-3063 | Me(R) | single bond | H | c-Pr | H | Me | $CH_2CF_3$ | O |
| D-3064 | Me(S) | single bond | H | c-Pr | H | Me | $CH_2CF_3$ | O |
| D-3065 | Me | single bond | H | c-Pr | H | Me | $CH_2CF_3$ | S |
| D-3066 | Me(R) | single bond | H | c-Pr | H | Me | $CH_2CF_3$ | S |
| D-3067 | Me(S) | single bond | H | c-Pr | H | Me | $CH_2CF_3$ | S |
| D-3068 | H | $CH_2$ | Me | c-Pr | H | Me | $CH_2CF_3$ | O |
| D-3069 | Me | $CH_2$ | H | c-Pr | H | Me | $CH_2CF_3$ | O |
| D-3070 | H | CH(Me) | H | c-Pr | H | Me | $CH_2CF_3$ | O |
| D-3071 | H | $CH_2CH_2$ | Me | c-Pr | H | Me | $CH_2CF_3$ | O |
| D-3072 | Me | $CH_2CH_2$ | H | c-Pr | H | Me | $CH_2CF_3$ | O |
| D-3073 | H | single bond | Me | c-Pr | H | Cl | $CH_2OMe$ | O |
| D-3074 | Me | single bond | H | c-Pr | H | Cl | $CH_2OMe$ | O |

TABLE 715

| Compound Number | Y | W | Z | $R^1$ | $R^2$ | $R^3$ | $R^{10}$ | A |
|---|---|---|---|---|---|---|---|---|
| D-3075 | Me(R) | single bond | H | c-Pr | H | Cl | $CH_2OMe$ | O |
| D-3076 | Me(S) | single bond | H | c-Pr | H | Cl | $CH_2OMe$ | O |
| D-3077 | Me | single bond | H | c-Pr | H | Cl | $CH_2OMe$ | S |
| D-3078 | Me(R) | single bond | H | c-Pr | H | Cl | $CH_2OMe$ | S |
| D-3079 | Me(S) | single bond | H | c-Pr | H | Cl | $CH_2OMe$ | S |
| D-3080 | H | $CH_2$ | Me | c-Pr | H | Cl | $CH_2OMe$ | O |
| D-3081 | Me | $CH_2$ | H | c-Pr | H | Cl | $CH_2OMe$ | O |
| D-3082 | H | CH(Me) | H | c-Pr | H | Cl | $CH_2OMe$ | O |
| D-3083 | H | $CH_2CH_2$ | Me | c-Pr | H | Cl | $CH_2OMe$ | O |
| D-3084 | Me | $CH_2CH_2$ | H | c-Pr | H | Cl | $CH_2OMe$ | O |
| D-3085 | H | single bond | Me | c-Pr | H | Me | $CH_2OMe$ | O |
| D-3086 | Me | single bond | H | c-Pr | H | Me | $CH_2OMe$ | O |
| D-3087 | Me(R) | single bond | H | c-Pr | H | Me | $CH_2OMe$ | O |
| D-3088 | Me(S) | single bond | H | c-Pr | H | Me | $CH_2OMe$ | O |
| D-3089 | Me | single bond | H | c-Pr | H | Me | $CH_2OMe$ | S |
| D-3090 | Me(R) | single bond | H | c-Pr | H | Me | $CH_2OMe$ | S |
| D-3091 | Me(S) | single bond | H | c-Pr | H | Me | $CH_2OMe$ | S |
| D-3092 | H | $CH_2$ | Me | c-Pr | H | Me | $CH_2OMe$ | O |
| D-3093 | Me | $CH_2$ | H | c-Pr | H | Me | $CH_2OMe$ | O |
| D-3094 | H | CH(Me) | H | c-Pr | H | Me | $CH_2OMe$ | O |
| D-3095 | H | $CH_2CH_2$ | Me | c-Pr | H | Me | $CH_2OMe$ | O |
| D-3096 | Me | $CH_2CH_2$ | H | c-Pr | H | Me | $CH_2OMe$ | O |
| D-3097 | H | single bond | Me | c-Pr | H | Cl | $CH_2CN$ | O |
| D-3098 | Me | single bond | H | c-Pr | H | Cl | $CH_2CN$ | O |
| D-3099 | Me(R) | single bond | H | c-Pr | H | Cl | $CH_2CN$ | O |
| D-3100 | Me(S) | single bond | H | c-Pr | H | Cl | $CH_2CN$ | O |
| D-3101 | Me | single bond | H | c-Pr | H | Cl | $CH_2CN$ | S |
| D-3102 | Me(R) | single bond | H | c-Pr | H | Cl | $CH_2CN$ | S |
| D-3103 | Me(S) | single bond | H | c-Pr | H | Cl | $CH_2CN$ | S |
| D-3104 | H | $CH_2$ | Me | c-Pr | H | Cl | $CH_2CN$ | O |
| D-3105 | Me | $CH_2$ | H | c-Pr | H | Cl | $CH_2CN$ | O |
| D-3106 | H | CH(Me) | H | c-Pr | H | Cl | $CH_2CN$ | O |
| D-3107 | H | $CH_2CH_2$ | Me | c-Pr | H | Cl | $CH_2CN$ | O |
| D-3108 | Me | $CH_2CH_2$ | H | c-Pr | H | Cl | $CH_2CN$ | O |
| D-3109 | H | single bond | Me | c-Pr | H | Me | $CH_2CN$ | O |
| D-3110 | Me | single bond | H | c-Pr | H | Me | $CH_2CN$ | O |
| D-3111 | Me(R) | single bond | H | c-Pr | H | Me | $CH_2CN$ | O |
| D-3112 | Me(S) | single bond | H | c-Pr | H | Me | $CH_2CN$ | O |
| D-3113 | Me | single bond | H | c-Pr | H | Me | $CH_2CN$ | S |
| D-3114 | Me(R) | single bond | H | c-Pr | H | Me | $CH_2CN$ | S |
| D-3115 | Me(S) | single bond | H | c-Pr | H | Me | $CH_2CN$ | S |
| D-3116 | H | $CH_2$ | Me | c-Pr | H | Me | $CH_2CN$ | O |
| D-3117 | Me | $CH_2$ | H | c-Pr | H | Me | $CH_2CN$ | O |
| D-3118 | H | CH(Me) | H | c-Pr | H | Me | $CH_2CN$ | O |

TABLE 716

| Compound Number | Y | W | Z | $R^1$ | $R^2$ | $R^3$ | $R^{10}$ | A |
|---|---|---|---|---|---|---|---|---|
| D-3119 | H | $CH_2CH_2$ | Me | c-Pr | H | Me | $CH_2CN$ | O |
| D-3120 | Me | $CH_2CH_2$ | H | c-Pr | H | Me | $CH_2CN$ | O |
| D-3121 | H | single bond | Me | c-Pr | H | Cl | C(═O)Me | O |
| D-3122 | Me | single bond | H | c-Pr | H | Cl | C(═O)Me | O |
| D-3123 | Me(R) | single bond | H | c-Pr | H | Cl | C(═O)Me | O |
| D-3124 | Me(S) | single bond | H | c-Pr | H | Cl | C(═O)Me | O |
| D-3125 | Me | single bond | H | c-Pr | H | Cl | C(═O)Me | S |
| D-3126 | Me(R) | single bond | H | c-Pr | H | Cl | C(═O)Me | S |
| D-3127 | Me(S) | single bond | H | c-Pr | H | Cl | C(═O)Me | S |
| D-3128 | H | $CH_2$ | Me | c-Pr | H | Cl | C(═O)Me | O |
| D-3129 | Me | $CH_2$ | H | c-Pr | H | Cl | C(═O)Me | O |
| D-3130 | H | CH(Me) | H | c-Pr | H | Cl | C(═O)Me | O |
| D-3131 | H | $CH_2CH_2$ | Me | c-Pr | H | Cl | C(═O)Me | O |
| D-3132 | Me | $CH_2CH_2$ | H | c-Pr | H | Cl | C(═O)Me | O |
| D-3133 | H | single bond | Me | c-Pr | H | Me | C(═O)Me | O |
| D-3134 | Me | single bond | H | c-Pr | H | Me | C(═O)Me | O |
| D-3135 | Me(R) | single bond | H | c-Pr | H | Me | C(═O)Me | O |
| D-3136 | Me(S) | single bond | H | c-Pr | H | Me | C(═O)Me | O |
| D-3137 | Me | single bond | H | c-Pr | H | Me | C(═O)Me | S |
| D-3138 | Me(R) | single bond | H | c-Pr | H | Me | C(═O)Me | S |
| D-3139 | Me(S) | single bond | H | c-Pr | H | Me | C(═O)Me | S |
| D-3140 | H | $CH_2$ | Me | c-Pr | H | Me | C(═O)Me | O |
| D-3141 | Me | $CH_2$ | H | c-Pr | H | Me | C(═O)Me | O |
| D-3142 | H | CH(Me) | H | c-Pr | H | Me | C(═O)Me | O |
| D-3143 | H | $CH_2CH_2$ | Me | c-Pr | H | Me | C(═O)Me | O |
| D-3144 | Me | $CH_2CH_2$ | H | c-Pr | H | Me | C(═O)Me | O |
| D-3145 | H | single bond | Me | c-Pr | H | Cl | C(═O)OEt | O |
| D-3146 | Me | single bond | H | c-Pr | H | Cl | C(═O)OEt | O |
| D-3147 | Me(R) | single bond | H | c-Pr | H | Cl | C(═O)OEt | O |
| D-3148 | Me(S) | single bond | H | c-Pr | H | Cl | C(═O)OEt | O |
| D-3149 | Me | single bond | H | c-Pr | H | Cl | C(═O)OEt | S |
| D-3150 | Me(R) | single bond | H | c-Pr | H | Cl | C(═O)OEt | S |
| D-3151 | Me(S) | single bond | H | c-Pr | H | Cl | C(═O)OEt | S |
| D-3152 | H | $CH_2$ | Me | c-Pr | H | Cl | C(═O)OEt | O |
| D-3153 | Me | $CH_2$ | H | c-Pr | H | Cl | C(═O)OEt | O |
| D-3154 | H | CH(Me) | H | c-Pr | H | Cl | C(═O)OEt | O |
| D-3155 | H | $CH_2CH_2$ | Me | c-Pr | H | Cl | C(═O)OEt | O |
| D-3156 | Me | $CH_2CH_2$ | H | c-Pr | H | Cl | C(═O)OEt | O |
| D-3157 | H | single bond | Me | c-Pr | H | Me | C(═O)OEt | O |
| D-3158 | Me | single bond | H | c-Pr | H | Me | C(═O)OEt | O |
| D-3159 | Me(R) | single bond | H | c-Pr | H | Me | C(═O)OEt | O |
| D-3160 | Me(S) | single bond | H | c-Pr | H | Me | C(═O)OEt | O |
| D-3161 | Me | single bond | H | c-Pr | H | Me | C(═O)OEt | S |
| D-3162 | Me(R) | single bond | H | c-Pr | H | Me | C(═O)OEt | S |

TABLE 717

| Compound Number | Y | W | Z | $R^1$ | $R^2$ | $R^3$ | $R^{10}$ | A |
|---|---|---|---|---|---|---|---|---|
| D-3163 | Me(S) | single bond | H | c-Pr | H | Me | C(═O)OEt | S |
| D-3164 | H | $CH_2$ | Me | c-Pr | H | Me | C(═O)OEt | O |
| D-3165 | Me | $CH_2$ | H | c-Pr | H | Me | C(═O)OEt | O |
| D-3166 | H | CH(Me) | H | c-Pr | H | Me | C(═O)OEt | O |
| D-3167 | H | $CH_2CH_2$ | Me | c-Pr | H | Me | C(═O)OEt | O |
| D-3168 | Me | $CH_2CH_2$ | H | c-Pr | H | Me | C(═O)OEt | O |
| D-3169 | H | single bond | Me | c-Pr | Me | Cl | Me | O |
| D-3170 | Me | single bond | H | c-Pr | Me | Cl | Me | O |
| D-3171 | Me(R) | single bond | H | c-Pr | Me | Cl | Me | O |
| D-3172 | Me(S) | single bond | H | c-Pr | Me | Cl | Me | O |
| D-3173 | H | $CH_2$ | Me | c-Pr | Me | Cl | Me | O |
| D-3174 | Me | $CH_2$ | H | c-Pr | Me | Cl | Me | O |
| D-3175 | H | CH(Me) | H | c-Pr | Me | Cl | Me | O |
| D-3176 | H | $CH_2CH_2$ | Me | c-Pr | Me | Cl | Me | O |
| D-3177 | Me | $CH_2CH_2$ | H | c-Pr | Me | Cl | Me | O |
| D-3178 | H | single bond | Me | c-Pr | Me | Me | Me | O |
| D-3179 | Me | single bond | H | c-Pr | Me | Me | Me | O |
| D-3180 | Me(R) | single bond | H | c-Pr | Me | Me | Me | O |
| D-3181 | Me(S) | single bond | H | c-Pr | Me | Me | Me | O |
| D-3182 | H | $CH_2$ | Me | c-Pr | Me | Me | Me | O |
| D-3183 | Me | $CH_2$ | H | c-Pr | Me | Me | Me | O |
| D-3184 | H | CH(Me) | H | c-Pr | Me | Me | Me | O |
| D-3185 | H | $CH_2CH_2$ | Me | c-Pr | Me | Me | Me | O |
| D-3186 | Me | $CH_2CH_2$ | H | c-Pr | Me | Me | Me | O |
| D-3187 | H | single bond | Me | c-Pr | Me | Cl | Et | O |
| D-3188 | Me | single bond | H | c-Pr | Me | Cl | Et | O |
| D-3189 | Me(R) | single bond | H | c-Pr | Me | Cl | Et | O |
| D-3190 | Me(S) | single bond | H | c-Pr | Me | Cl | Et | O |
| D-3191 | H | $CH_2$ | Me | c-Pr | Me | Cl | Et | O |
| D-3192 | Me | $CH_2$ | H | c-Pr | Me | Cl | Et | O |
| D-3193 | H | CH(Me) | H | c-Pr | Me | Cl | Et | O |
| D-3194 | H | $CH_2CH_2$ | Me | c-Pr | Me | Cl | Et | O |
| D-3195 | Me | $CH_2CH_2$ | H | c-Pr | Me | Cl | Et | O |
| D-3196 | H | single bond | Me | c-Pr | Me | Me | Et | O |
| D-3197 | Me | single bond | H | c-Pr | Me | Me | Et | O |
| D-3198 | Me(R) | single bond | H | c-Pr | Me | Me | Et | O |
| D-3199 | Me(S) | single bond | H | c-Pr | Me | Me | Et | O |
| D-3200 | H | $CH_2$ | Me | c-Pr | Me | Me | Et | O |
| D-3201 | Me | $CH_2$ | H | c-Pr | Me | Me | Et | O |
| D-3202 | H | CH(Me) | H | c-Pr | Me | Me | Et | O |
| D-3203 | H | $CH_2CH_2$ | Me | c-Pr | Me | Me | Et | O |
| D-3204 | Me | $CH_2CH_2$ | H | c-Pr | Me | Me | Et | O |
| D-3205 | H | single bond | Me | c-Pr | Me | Cl | $CH_2CF_3$ | O |
| D-3206 | Me | single bond | H | c-Pr | Me | Cl | $CH_2CF_3$ | O |

TABLE 718

| Compound Number | Y | W | Z | $R^1$ | $R^2$ | $R^3$ | $R^{10}$ | A |
|---|---|---|---|---|---|---|---|---|
| D-3207 | Me(R) | single bond | H | c-Pr | Me | Cl | $CH_2CF_3$ | O |
| D-3208 | Me(S) | single bond | H | c-Pr | Me | Cl | $CH_2CF_3$ | O |
| D-3209 | H | $CH_2$ | Me | c-Pr | Me | Cl | $CH_2CF_3$ | O |
| D-3210 | Me | $CH_2$ | H | c-Pr | Me | Cl | $CH_2CF_3$ | O |
| D-3211 | H | CH(Me) | H | c-Pr | Me | Cl | $CH_2CF_3$ | O |
| D-3212 | H | $CH_2CH_2$ | Me | c-Pr | Me | Cl | $CH_2CF_3$ | O |
| D-3213 | Me | $CH_2CH_2$ | H | c-Pr | Me | Cl | $CH_2CF_3$ | O |
| D-3214 | H | single bond | Me | c-Pr | Me | Me | $CH_2CF_3$ | O |
| D-3215 | Me | single bond | H | c-Pr | Me | Me | $CH_2CF_3$ | O |
| D-3216 | Me(R) | single bond | H | c-Pr | Me | Me | $CH_2CF_3$ | O |
| D-3217 | Me(S) | single bond | H | c-Pr | Me | Me | $CH_2CF_3$ | O |
| D-3218 | H | $CH_2$ | Me | c-Pr | Me | Me | $CH_2CF_3$ | O |
| D-3219 | Me | $CH_2$ | H | c-Pr | Me | Me | $CH_2CF_3$ | O |
| D-3220 | H | CH(Me) | H | c-Pr | Me | Me | $CH_2CF_3$ | O |
| D-3221 | H | $CH_2CH_2$ | Me | c-Pr | Me | Me | $CH_2CF_3$ | O |
| D-3222 | Me | $CH_2CH_2$ | H | c-Pr | Me | Me | $CH_2CF_3$ | O |
| D-3223 | H | single bond | Me | c-Pr | Me | Cl | $CH_2OMe$ | O |
| D-3224 | Me | single bond | H | c-Pr | Me | Cl | $CH_2OMe$ | O |
| D-3225 | Me(R) | single bond | H | c-Pr | Me | Cl | $CH_2OMe$ | O |
| D-3226 | Me(S) | single bond | H | c-Pr | Me | Cl | $CH_2OMe$ | O |
| D-3227 | H | $CH_2$ | Me | c-Pr | Me | Cl | $CH_2OMe$ | O |
| D-3228 | Me | $CH_2$ | H | c-Pr | Me | Cl | $CH_2OMe$ | O |
| D-3229 | H | CH(Me) | H | c-Pr | Me | Cl | $CH_2OMe$ | O |
| D-3230 | H | $CH_2CH_2$ | Me | c-Pr | Me | Cl | $CH_2OMe$ | O |
| D-3231 | Me | $CH_2CH_2$ | H | c-Pr | Me | Cl | $CH_2OMe$ | O |
| D-3232 | H | single bond | Me | c-Pr | Me | Me | $CH_2OMe$ | O |
| D-3233 | Me | single bond | H | c-Pr | Me | Me | $CH_2OMe$ | O |
| D-3234 | Me(R) | single bond | H | c-Pr | Me | Me | $CH_2OMe$ | O |
| D-3235 | Me(S) | single bond | H | c-Pr | Me | Me | $CH_2OMe$ | O |
| D-3236 | H | $CH_2$ | Me | c-Pr | Me | Me | $CH_2OMe$ | O |
| D-3237 | Me | $CH_2$ | H | c-Pr | Me | Me | $CH_2OMe$ | O |
| D-3238 | H | CH(Me) | H | c-Pr | Me | Me | $CH_2OMe$ | O |
| D-3239 | H | $CH_2CH_2$ | Me | c-Pr | Me | Me | $CH_2OMe$ | O |
| D-3240 | Me | $CH_2CH_2$ | H | c-Pr | Me | Me | $CH_2OMe$ | O |
| D-3241 | H | single bond | Me | c-Pr | Me | Cl | $CH_2CN$ | O |
| D-3242 | Me | single bond | H | c-Pr | Me | Cl | $CH_2CN$ | O |
| D-3243 | Me(R) | single bond | H | c-Pr | Me | Cl | $CH_2CN$ | O |
| D-3244 | Me(S) | single bond | H | c-Pr | Me | Cl | $CH_2CN$ | O |
| D-3245 | H | $CH_2$ | Me | c-Pr | Me | Cl | $CH_2CN$ | O |
| D-3246 | Me | $CH_2$ | H | c-Pr | Me | Cl | $CH_2CN$ | O |
| D-3247 | H | CH(Me) | H | c-Pr | Me | Cl | $CH_2CN$ | O |
| D-3248 | H | $CH_2CH_2$ | Me | c-Pr | Me | Cl | $CH_2CN$ | O |
| D-3249 | Me | $CH_2CH_2$ | H | c-Pr | Me | Cl | $CH_2CN$ | O |
| D-3250 | H | single bond | Me | c-Pr | Me | Me | $CH_2CN$ | O |

TABLE 719

| Compound Number | Y | W | Z | $R^1$ | $R^2$ | $R^3$ | $R^{10}$ | A |
|---|---|---|---|---|---|---|---|---|
| D-3251 | Me | single bond | H | c-Pr | Me | Me | $CH_2CN$ | O |
| D-3252 | Me(R) | single bond | H | c-Pr | Me | Me | $CH_2CN$ | O |
| D-3253 | Me(S) | single bond | H | c-Pr | Me | Me | $CH_2CN$ | O |
| D-3254 | H | $CH_2$ | Me | c-Pr | Me | Me | $CH_2CN$ | O |
| D-3255 | Me | $CH_2$ | H | c-Pr | Me | Me | $CH_2CN$ | O |
| D-3256 | H | CH(Me) | H | c-Pr | Me | Me | $CH_2CN$ | O |
| D-3257 | H | $CH_2CH_2$ | Me | c-Pr | Me | Me | $CH_2CN$ | O |
| D-3258 | Me | $CH_2CH_2$ | H | c-Pr | Me | Me | $CH_2CN$ | O |
| D-3259 | H | single bond | Me | c-Pr | Me | Cl | C(═O)Me | O |
| D-3260 | Me | single bond | H | c-Pr | Me | Cl | C(═O)Me | O |
| D-3261 | Me(R) | single bond | H | c-Pr | Me | Cl | C(═O)Me | O |
| D-3262 | Me(S) | single bond | H | c-Pr | Me | Cl | C(═O)Me | O |
| D-3263 | H | $CH_2$ | Me | c-Pr | Me | Cl | C(═O)Me | O |
| D-3264 | Me | $CH_2$ | H | c-Pr | Me | Cl | C(═O)Me | O |
| D-3265 | H | CH(Me) | H | c-Pr | Me | Cl | C(═O)Me | O |
| D-3266 | H | $CH_2CH_2$ | Me | c-Pr | Me | Cl | C(═O)Me | O |
| D-3267 | Me | $CH_2CH_2$ | H | c-Pr | Me | Cl | C(═O)Me | O |
| D-3268 | H | single bond | Me | c-Pr | Me | Me | C(═O)Me | O |
| D-3269 | Me | single bond | H | c-Pr | Me | Me | C(═O)Me | O |
| D-3270 | Me(R) | single bond | H | c-Pr | Me | Me | C(═O)Me | O |
| D-3271 | Me(S) | single bond | H | c-Pr | Me | Me | C(═O)Me | O |
| D-3272 | H | $CH_2$ | Me | c-Pr | Me | Me | C(═O)Me | O |
| D-3273 | Me | $CH_2$ | H | c-Pr | Me | Me | C(═O)Me | O |
| D-3274 | H | CH(Me) | H | c-Pr | Me | Me | C(═O)Me | O |
| D-3275 | H | $CH_2CH_2$ | Me | c-Pr | Me | Me | C(═O)Me | O |
| D-3276 | Me | $CH_2CH_2$ | H | c-Pr | Me | Me | C(═O)Me | O |
| D-3277 | H | single bond | Me | c-Pr | $CH_2OMe$ | Cl | Me | O |
| D-3278 | Me | single bond | H | c-Pr | $CH_2OMe$ | Cl | Me | O |
| D-3279 | Me(R) | single bond | H | c-Pr | $CH_2OMe$ | Cl | Me | O |
| D-3280 | Me(S) | single bond | H | c-Pr | $CH_2OMe$ | Cl | Me | O |
| D-3281 | H | $CH_2$ | Me | c-Pr | $CH_2OMe$ | Cl | Me | O |
| D-3282 | Me | $CH_2$ | H | c-Pr | $CH_2OMe$ | Cl | Me | O |
| D-3283 | H | CH(Me) | H | c-Pr | $CH_2OMe$ | Cl | Me | O |
| D-3284 | H | $CH_2CH_2$ | Me | c-Pr | $CH_2OMe$ | Cl | Me | O |
| D-3285 | Me | $CH_2CH_2$ | H | c-Pr | $CH_2OMe$ | Cl | Me | O |
| D-3286 | H | single bond | Me | c-Pr | $CH_2OMe$ | Me | Me | O |
| D-3287 | Me | single bond | H | c-Pr | $CH_2OMe$ | Me | Me | O |
| D-3288 | Me(R) | single bond | H | c-Pr | $CH_2OMe$ | Me | Me | O |
| D-3289 | Me(S) | single bond | H | c-Pr | $CH_2OMe$ | Me | Me | O |
| D-3290 | H | $CH_2$ | Me | c-Pr | $CH_2OMe$ | Me | Me | O |
| D-3291 | Me | $CH_2$ | H | c-Pr | $CH_2OMe$ | Me | Me | O |
| D-3292 | H | CH(Me) | H | c-Pr | $CH_2OMe$ | Me | Me | O |
| D-3293 | H | $CH_2CH_2$ | Me | c-Pr | $CH_2OMe$ | Me | Me | O |
| D-3294 | Me | $CH_2CH_2$ | H | c-Pr | $CH_2OMe$ | Me | Me | O |

TABLE 720

| Compound Number | Y | W | Z | $R^1$ | $R^2$ | $R^3$ | $R^{10}$ | A |
|---|---|---|---|---|---|---|---|---|
| D-3295 | H | single bond | Me | c-Pr | $CH_2OMe$ | Cl | Et | O |
| D-3296 | Me | single bond | H | c-Pr | $CH_2OMe$ | Cl | Et | O |
| D-3297 | Me(R) | single bond | H | c-Pr | $CH_2OMe$ | Cl | Et | O |
| D-3298 | Me(S) | single bond | H | c-Pr | $CH_2OMe$ | Cl | Et | O |
| D-3299 | H | $CH_2$ | Me | c-Pr | $CH_2OMe$ | Cl | Et | O |
| D-3300 | Me | $CH_2$ | H | c-Pr | $CH_2OMe$ | Cl | Et | O |
| D-3301 | H | CH(Me) | H | c-Pr | $CH_2OMe$ | Cl | Et | O |
| D-3302 | H | $CH_2CH_2$ | Me | c-Pr | $CH_2OMe$ | Cl | Et | O |
| D-3303 | Me | $CH_2CH_2$ | H | c-Pr | $CH_2OMe$ | Cl | Et | O |
| D-3304 | H | single bond | Me | c-Pr | $CH_2OMe$ | Me | Et | O |
| D-3305 | Me | single bond | H | c-Pr | $CH_2OMe$ | Me | Et | O |
| D-3306 | Me(R) | single bond | H | c-Pr | $CH_2OMe$ | Me | Et | O |
| D-3307 | Me(S) | single bond | H | c-Pr | $CH_2OMe$ | Me | Et | O |
| D-3308 | H | $CH_2$ | Me | c-Pr | $CH_2OMe$ | Me | Et | O |
| D-3309 | Me | $CH_2$ | H | c-Pr | $CH_2OMe$ | Me | Et | O |
| D-3310 | H | CH(Me) | H | c-Pr | $CH_2OMe$ | Me | Et | O |
| D-3311 | H | $CH_2CH_2$ | Me | c-Pr | $CH_2OMe$ | Me | Et | O |
| D-3312 | Me | $CH_2CH_2$ | H | c-Pr | $CH_2OMe$ | Me | Et | O |
| D-3313 | H | single bond | Me | c-Pr | $CH_2OMe$ | Cl | $CH_2CF_3$ | O |
| D-3314 | Me | single bond | H | c-Pr | $CH_2OMe$ | Cl | $CH_2CF_3$ | O |
| D-3315 | Me(R) | single bond | H | c-Pr | $CH_2OMe$ | Cl | $CH_2CF_3$ | O |
| D-3316 | Me(S) | single bond | H | c-Pr | $CH_2OMe$ | Cl | $CH_2CF_3$ | O |
| D-3317 | H | $CH_2$ | Me | c-Pr | $CH_2OMe$ | Cl | $CH_2CF_3$ | O |

TABLE 720-continued

| Compound Number | Y | W | Z | $R^1$ | $R^2$ | $R^3$ | $R^{10}$ | A |
|---|---|---|---|---|---|---|---|---|
| D-3318 | Me | $CH_2$ | H | c-Pr | $CH_2OMe$ | Cl | $CH_2CF_3$ | O |
| D-3319 | H | CH(Me) | H | c-Pr | $CH_2OMe$ | Cl | $CH_2CF_3$ | O |
| D-3320 | H | $CH_2CH_2$ | Me | c-Pr | $CH_2OMe$ | Cl | $CH_2CF_3$ | O |
| D-3321 | Me | $CH_2CH_2$ | H | c-Pr | $CH_2OMe$ | Cl | $CH_2CF_3$ | O |
| D-3322 | H | single bond | Me | c-Pr | $CH_2OMe$ | Me | $CH_2CF_3$ | O |
| D-3323 | Me | single bond | H | c-Pr | $CH_2OMe$ | Me | $CH_2CF_3$ | O |
| D-3324 | Me(R) | single bond | H | c-Pr | $CH_2OMe$ | Me | $CH_2CF_3$ | O |
| D-3325 | Me(S) | single bond | H | c-Pr | $CH_2OMe$ | Me | $CH_2CF_3$ | O |
| D-3326 | H | $CH_2$ | Me | c-Pr | $CH_2OMe$ | Me | $CH_2CF_3$ | O |
| D-3327 | Me | $CH_2$ | H | c-Pr | $CH_2OMe$ | Me | $CH_2CF_3$ | O |
| D-3328 | H | CH(Me) | H | c-Pr | $CH_2OMe$ | Me | $CH_2CF_3$ | O |
| D-3329 | H | $CH_2CH_2$ | Me | c-Pr | $CH_2OMe$ | Me | $CH_2CF_3$ | O |
| D-3330 | Me | $CH_2CH_2$ | H | c-Pr | $CH_2OMe$ | Me | $CH_2CF_3$ | O |
| D-3331 | H | single bond | Me | c-Pr | $CH_2OMe$ | Cl | $CH_2OMe$ | O |
| D-3332 | Me | single bond | H | c-Pr | $CH_2OMe$ | Cl | $CH_2OMe$ | O |
| D-3333 | Me(R) | single bond | H | c-Pr | $CH_2OMe$ | Cl | $CH_2OMe$ | O |
| D-3334 | Me(S) | single bond | H | c-Pr | $CH_2OMe$ | Cl | $CH_2OMe$ | O |
| D-3335 | H | $CH_2$ | Me | c-Pr | $CH_2OMe$ | Cl | $CH_2OMe$ | O |
| D-3336 | Me | $CH_2$ | H | c-Pr | $CH_2OMe$ | Cl | $CH_2OMe$ | O |
| D-3337 | H | CH(Me) | H | c-Pr | $CH_2OMe$ | Cl | $CH_2OMe$ | O |
| D-3338 | H | $CH_2CH_2$ | Me | c-Pr | $CH_2OMe$ | Cl | $CH_2OMe$ | O |

TABLE 721

| Compound Number | Y | W | Z | $R^1$ | $R^2$ | $R^3$ | $R^{10}$ | A |
|---|---|---|---|---|---|---|---|---|
| D-3339 | Me | $CH_2CH_2$ | H | c-Pr | $CH_2OMe$ | Cl | $CH_2OMe$ | O |
| D-3340 | H | single bond | Me | c-Pr | $CH_2OMe$ | Me | $CH_2OMe$ | O |
| D-3341 | Me | single bond | H | c-Pr | $CH_2OMe$ | Me | $CH_2OMe$ | O |
| D-3342 | Me(R) | single bond | H | c-Pr | $CH_2OMe$ | Me | $CH_2OMe$ | O |
| D-3343 | Me(S) | single bond | H | c-Pr | $CH_2OMe$ | Me | $CH_2OMe$ | O |
| D-3344 | H | $CH_2$ | Me | c-Pr | $CH_2OMe$ | Me | $CH_2OMe$ | O |
| D-3345 | Me | $CH_2$ | H | c-Pr | $CH_2OMe$ | Me | $CH_2OMe$ | O |
| D-3346 | H | CH(Me) | H | c-Pr | $CH_2OMe$ | Me | $CH_2OMe$ | O |
| D-3347 | H | $CH_2CH_2$ | Me | c-Pr | $CH_2OMe$ | Me | $CH_2OMe$ | O |
| D-3348 | Me | $CH_2CH_2$ | H | c-Pr | $CH_2OMe$ | Me | $CH_2OMe$ | O |
| D-3349 | H | single bond | Me | c-Pr | $CH_2OMe$ | Cl | $CH_2CN$ | O |
| D-3350 | Me | single bond | H | c-Pr | $CH_2OMe$ | Cl | $CH_2CN$ | O |
| D-3351 | Me(R) | single bond | H | c-Pr | $CH_2OMe$ | Cl | $CH_2CN$ | O |
| D-3352 | Me(S) | single bond | H | c-Pr | $CH_2OMe$ | Cl | $CH_2CN$ | O |
| D-3353 | H | $CH_2$ | Me | c-Pr | $CH_2OMe$ | Cl | $CH_2CN$ | O |
| D-3354 | Me | $CH_2$ | H | c-Pr | $CH_2OMe$ | Cl | $CH_2CN$ | O |
| D-3355 | H | CH(Me) | H | c-Pr | $CH_2OMe$ | Cl | $CH_2CN$ | O |
| D-3356 | H | $CH_2CH_2$ | Me | c-Pr | $CH_2OMe$ | Cl | $CH_2CN$ | O |
| D-3357 | Me | $CH_2CH_2$ | H | c-Pr | $CH_2OMe$ | Cl | $CH_2CN$ | O |
| D-3358 | H | single bond | Me | c-Pr | $CH_2OMe$ | Me | $CH_2CN$ | O |
| D-3359 | Me | single bond | H | c-Pr | $CH_2OMe$ | Me | $CH_2CN$ | O |
| D-3360 | Me(R) | single bond | H | c-Pr | $CH_2OMe$ | Me | $CH_2CN$ | O |
| D-3361 | Me(S) | single bond | H | c-Pr | $CH_2OMe$ | Me | $CH_2CN$ | O |
| D-3362 | H | $CH_2$ | Me | c-Pr | $CH_2OMe$ | Me | $CH_2CN$ | O |
| D-3363 | Me | $CH_2$ | H | c-Pr | $CH_2OMe$ | Me | $CH_2CN$ | O |
| D-3364 | H | CH(Me) | H | c-Pr | $CH_2OMe$ | Me | $CH_2CN$ | O |
| D-3365 | H | $CH_2CH_2$ | Me | c-Pr | $CH_2OMe$ | Me | $CH_2CN$ | O |
| D-3366 | Me | $CH_2CH_2$ | H | c-Pr | $CH_2OMe$ | Me | $CH_2CN$ | O |
| D-3367 | H | single bond | Me | c-Pr | $CH_2OMe$ | Cl | C(═O)Me | O |
| D-3368 | Me | single bond | H | c-Pr | $CH_2OMe$ | Cl | C(═O)Me | O |
| D-3369 | Me(R) | single bond | H | c-Pr | $CH_2OMe$ | Cl | C(═O)Me | O |
| D-3370 | Me(S) | single bond | H | c-Pr | $CH_2OMe$ | Cl | C(═O)Me | O |
| D-3371 | H | $CH_2$ | Me | c-Pr | $CH_2OMe$ | Cl | C(═O)Me | O |
| D-3372 | Me | $CH_2$ | H | c-Pr | $CH_2OMe$ | Cl | C(═O)Me | O |
| D-3373 | H | CH(Me) | H | c-Pr | $CH_2OMe$ | Cl | C(═O)Me | O |
| D-3374 | H | $CH_2CH_2$ | Me | c-Pr | $CH_2OMe$ | Cl | C(═O)Me | O |
| D-3375 | Me | $CH_2CH_2$ | H | c-Pr | $CH_2OMe$ | Cl | C(═O)Me | O |
| D-3376 | H | single bond | Me | c-Pr | $CH_2OMe$ | Me | C(═O)Me | O |
| D-3377 | Me | single bond | H | c-Pr | $CH_2OMe$ | Me | C(═O)Me | O |
| D-3378 | Me(R) | single bond | H | c-Pr | $CH_2OMe$ | Me | C(═O)Me | O |
| D-3379 | Me(S) | single bond | H | c-Pr | $CH_2OMe$ | Me | C(═O)Me | O |
| D-3380 | H | $CH_2$ | Me | c-Pr | $CH_2OMe$ | Me | C(═O)Me | O |
| D-3381 | Me | $CH_2$ | H | c-Pr | $CH_2OMe$ | Me | C(═O)Me | O |
| D-3382 | H | CH(Me) | H | c-Pr | $CH_2OMe$ | Me | C(═O)Me | O |

TABLE 722

| Compound Number | Y | W | Z | $R^1$ | $R^2$ | $R^3$ | $R^{10}$ | A |
|---|---|---|---|---|---|---|---|---|
| D-3383 | H | $CH_2CH_2$ | Me | c-Pr | $CH_2OMe$ | Me | C(=O)Me | O |
| D-3384 | Me | $CH_2CH_2$ | H | c-Pr | $CH_2OMe$ | Me | C(=O)Me | O |
| D-3385 | H | single bond | Me | c-Pr | $CH_2CN$ | Cl | Me | O |
| D-3386 | Me | single bond | H | c-Pr | $CH_2CN$ | Cl | Me | O |
| D-3387 | Me(R) | single bond | H | c-Pr | $CH_2CN$ | Cl | Me | O |
| D-3388 | Me(S) | single bond | H | c-Pr | $CH_2CN$ | Cl | Me | O |
| D-3389 | H | $CH_2$ | Me | c-Pr | $CH_2CN$ | Cl | Me | O |
| D-3390 | Me | $CH_2$ | H | c-Pr | $CH_2CN$ | Cl | Me | O |
| D-3391 | H | CH(Me) | H | c-Pr | $CH_2CN$ | Cl | Me | O |
| D-3392 | H | $CH_2CH_2$ | Me | c-Pr | $CH_2CN$ | Cl | Me | O |
| D-3393 | Me | $CH_2CH_2$ | H | c-Pr | $CH_2CN$ | Cl | Me | O |
| D-3394 | H | single bond | Me | c-Pr | $CH_2CN$ | Me | Me | O |
| D-3395 | Me | single bond | H | c-Pr | $CH_2CN$ | Me | Me | O |
| D-3396 | Me(R) | single bond | H | c-Pr | $CH_2CN$ | Me | Me | O |
| D-3397 | Me(S) | single bond | H | c-Pr | $CH_2CN$ | Me | Me | O |
| D-3398 | H | $CH_2$ | Me | c-Pr | $CH_2CN$ | Me | Me | O |
| D-3399 | Me | $CH_2$ | H | c-Pr | $CH_2CN$ | Me | Me | O |
| D-3400 | H | CH(Me) | H | c-Pr | $CH_2CN$ | Me | Me | O |
| D-3401 | H | $CH_2CH_2$ | Me | c-Pr | $CH_2CN$ | Me | Me | O |
| D-3402 | Me | $CH_2CH_2$ | H | c-Pr | $CH_2CN$ | Me | Me | O |
| D-3403 | H | single bond | Me | c-Pr | $CH_2CN$ | Cl | Et | O |
| D-3404 | Me | single bond | H | c-Pr | $CH_2CN$ | Cl | Et | O |
| D-3405 | Me(R) | single bond | H | c-Pr | $CH_2CN$ | Cl | Et | O |
| D-3406 | Me(S) | single bond | H | c-Pr | $CH_2CN$ | Cl | Et | O |
| D-3407 | H | $CH_2$ | Me | c-Pr | $CH_2CN$ | Cl | Et | O |
| D-3408 | Me | $CH_2$ | H | c-Pr | $CH_2CN$ | Cl | Et | O |
| D-3409 | H | CH(Me) | H | c-Pr | $CH_2CN$ | Cl | Et | O |
| D-3410 | H | $CH_2CH_2$ | Me | c-Pr | $CH_2CN$ | Cl | Et | O |
| D-3411 | Me | $CH_2CH_2$ | H | c-Pr | $CH_2CN$ | Cl | Et | O |
| D-3412 | H | single bond | Me | c-Pr | $CH_2CN$ | Me | Et | O |
| D-3413 | Me | single bond | H | c-Pr | $CH_2CN$ | Me | Et | O |
| D-3414 | Me(R) | single bond | H | c-Pr | $CH_2CN$ | Me | Et | O |
| D-3415 | Me(S) | single bond | H | c-Pr | $CH_2CN$ | Me | Et | O |
| D-3416 | H | $CH_2$ | Me | c-Pr | $CH_2CN$ | Me | Et | O |
| D-3417 | Me | $CH_2$ | H | c-Pr | $CH_2CN$ | Me | Et | O |
| D-3418 | H | CH(Me) | H | c-Pr | $CH_2CN$ | Me | Et | O |
| D-3419 | H | $CH_2CH_2$ | Me | c-Pr | $CH_2CN$ | Me | Et | O |
| D-3420 | Me | $CH_2CH_2$ | H | c-Pr | $CH_2CN$ | Me | Et | O |
| D-3421 | H | single bond | Me | c-Pr | $CH_2CN$ | Cl | $CH_2CF_3$ | O |
| D-3422 | Me | single bond | H | c-Pr | $CH_2CN$ | Cl | $CH_2CF_3$ | O |
| D-3423 | Me(R) | single bond | H | c-Pr | $CH_2CN$ | Cl | $CH_2CF_3$ | O |
| D-3424 | Me(S) | single bond | H | c-Pr | $CH_2CN$ | Cl | $CH_2CF_3$ | O |
| D-3425 | H | $CH_2$ | Me | c-Pr | $CH_2CN$ | Cl | $CH_2CF_3$ | O |
| D-3426 | Me | $CH_2$ | H | c-Pr | $CH_2CN$ | Cl | $CH_2CF_3$ | O |

TABLE 723

| Compound Number | Y | W | Z | $R^1$ | $R^2$ | $R^3$ | $R^{10}$ | A |
|---|---|---|---|---|---|---|---|---|
| D-3427 | H | CH(Me) | H | c-Pr | $CH_2CN$ | Cl | $CH_2CF_3$ | O |
| D-3428 | H | $CH_2CH_2$ | Me | c-Pr | $CH_2CN$ | Cl | $CH_2CF_3$ | O |
| D-3429 | Me | $CH_2CH_2$ | H | c-Pr | $CH_2CN$ | Cl | $CH_2CF_3$ | O |
| D-3430 | H | single bond | Me | c-Pr | $CH_2CN$ | Me | $CH_2CF_3$ | O |
| D-3431 | Me | single bond | H | c-Pr | $CH_2CN$ | Me | $CH_2CF_3$ | O |
| D-3432 | Me(R) | single bond | H | c-Pr | $CH_2CN$ | Me | $CH_2CF_3$ | O |
| D-3433 | Me(S) | single bond | H | c-Pr | $CH_2CN$ | Me | $CH_2CF_3$ | O |
| D-3434 | H | $CH_2$ | Me | c-Pr | $CH_2CN$ | Me | $CH_2CF_3$ | O |
| D-3435 | Me | $CH_2$ | H | c-Pr | $CH_2CN$ | Me | $CH_2CF_3$ | O |
| D-3436 | H | CH(Me) | H | c-Pr | $CH_2CN$ | Me | $CH_2CF_3$ | O |
| D-3437 | H | $CH_2CH_2$ | Me | c-Pr | $CH_2CN$ | Me | $CH_2CF_3$ | O |
| D-3438 | Me | $CH_2CH_2$ | H | c-Pr | $CH_2CN$ | Me | $CH_2CF_3$ | O |
| D-3439 | H | single bond | Me | c-Pr | $CH_2CN$ | Cl | $CH_2OMe$ | O |
| D-3440 | Me | single bond | H | c-Pr | $CH_2CN$ | Cl | $CH_2OMe$ | O |
| D-3441 | Me(R) | single bond | H | c-Pr | $CH_2CN$ | Cl | $CH_2OMe$ | O |
| D-3442 | Me(S) | single bond | H | c-Pr | $CH_2CN$ | Cl | $CH_2OMe$ | O |
| D-3443 | H | $CH_2$ | Me | C-Pr | $CH_2CN$ | Cl | $CH_2OMe$ | O |
| D-3444 | Me | $CH_2$ | H | c-Pr | $CH_2CN$ | Cl | $CH_2OMe$ | O |
| D-3445 | H | CH(Me) | H | c-Pr | $CH_2CN$ | Cl | $CH_2OMe$ | O |
| D-3446 | H | $CH_2CH_2$ | Me | c-Pr | $CH_2CN$ | Cl | $CH_2OMe$ | O |
| D-3447 | Me | $CH_2CH_2$ | H | c-Pr | $CH_2CN$ | Cl | $CH_2OMe$ | O |

TABLE 723-continued

| Compound Number | Y | W | Z | $R^1$ | $R^2$ | $R^3$ | $R^{10}$ | A |
|---|---|---|---|---|---|---|---|---|
| D-3448 | H | single bond | Me | c-Pr | $CH_2CN$ | Me | $CH_2OMe$ | O |
| D-3449 | Me | single bond | H | c-Pr | $CH_2CN$ | Me | $CH_2OMe$ | O |
| D-3450 | Me(R) | single bond | H | c-Pr | $CH_2CN$ | Me | $CH_2OMe$ | O |
| D-3451 | Me(S) | single bond | H | c-Pr | $CH_2CN$ | Me | $CH_2OMe$ | O |
| D-3452 | H | $CH_2$ | Me | c-Pr | $CH_2CN$ | Me | $CH_2OMe$ | O |
| D-3453 | Me | $CH_2$ | H | c-Pr | $CH_2CN$ | Me | $CH_2OMe$ | O |
| D-3454 | H | CH(Me) | H | c-Pr | $CH_2CN$ | Me | $CH_2OMe$ | O |
| D-3455 | H | $CH_2CH_2$ | Me | c-Pr | $CH_2CN$ | Me | $CH_2OMe$ | O |
| D-3456 | Me | $CH_2CH_2$ | H | c-Pr | $CH_2CN$ | Me | $CH_2OMe$ | O |
| D-3457 | H | single bond | Me | c-Pr | $CH_2CN$ | Cl | $CH_2CN$ | O |
| D-3458 | Me | single bond | H | c-Pr | $CH_2CN$ | Cl | $CH_2CN$ | O |
| D-3459 | Me(R) | single bond | H | c-Pr | $CH_2CN$ | Cl | $CH_2CN$ | O |
| D-3460 | Me(S) | single bond | H | c-Pr | $CH_2CN$ | Cl | $CH_2CN$ | O |
| D-3461 | H | $CH_2$ | Me | c-Pr | $CH_2CN$ | Cl | $CH_2CN$ | O |
| D-3462 | Me | $CH_2$ | H | c-Pr | $CH_2CN$ | Cl | $CH_2CN$ | O |
| D-3463 | H | CH(Me) | H | c-Pr | $CH_2CN$ | Cl | $CH_2CN$ | O |
| D-3464 | H | $CH_2CH_2$ | Me | c-Pr | $CH_2CN$ | Cl | $CH_2CN$ | O |
| D-3465 | Me | $CH_2CH_2$ | H | c-Pr | $CH_2CN$ | Cl | $CH_2CN$ | O |
| D-3466 | H | single bond | Me | c-Pr | $CH_2CN$ | Me | $CH_2CN$ | O |
| D-3467 | Me | single bond | H | c-Pr | $CH_2CN$ | Me | $CH_2CN$ | O |
| D-3468 | Me(R) | single bond | H | c-Pr | $CH_2CN$ | Me | $CH_2CN$ | O |
| D-3469 | Me(S) | single bond | H | c-Pr | $CH_2CN$ | Me | $CH_2CN$ | O |
| D-3470 | H | $CH_2$ | Me | c-Pr | $CH_2CN$ | Me | $CH_2CN$ | O |

TABLE 724

| Compound Number | Y | W | Z | $R^1$ | $R^2$ | $R^3$ | $R^{10}$ | A |
|---|---|---|---|---|---|---|---|---|
| D-3471 | Me | $CH_2$ | H | c-Pr | $CH_2CN$ | Me | $CH_2CN$ | O |
| D-3472 | H | CH(Me) | H | c-Pr | $CH_2CN$ | Me | $CH_2CN$ | O |
| D-3473 | H | $CH_2CH_2$ | Me | c-Pr | $CH_2CN$ | Me | $CH_2CN$ | O |
| D-3474 | Me | $CH_2CH_2$ | H | c-Pr | $CH_2CN$ | Me | $CH_2CN$ | O |
| D-3475 | H | single bond | Me | c-Pr | $CH_2CN$ | Cl | C(=O)Me | O |
| D-3476 | Me | single bond | H | c-Pr | $CH_2CN$ | Cl | C(=O)Me | O |
| D-3477 | Me(R) | single bond | H | c-Pr | $CH_2CN$ | Cl | C(=O)Me | O |
| D-3478 | Me(S) | single bond | H | c-Pr | $CH_2CN$ | Cl | C(=O)Me | O |
| D-3479 | H | $CH_2$ | Me | c-Pr | $CH_2CN$ | Cl | C(=O)Me | O |
| D-3480 | Me | $CH_2$ | H | c-Pr | $CH_2CN$ | Cl | C(=O)Me | O |
| D-3481 | H | CH(Me) | H | c-Pr | $CH_2CN$ | Cl | C(=O)Me | O |
| D-3482 | H | $CH_2CH_2$ | Me | c-Pr | $CH_2CN$ | Cl | C(=O)Me | O |
| D-3483 | Me | $CH_2CH_2$ | H | c-Pr | $CH_2CN$ | Cl | C(=O)Me | O |
| D-3484 | H | single bond | Me | c-Pr | $CH_2CN$ | Me | C(=O)Me | O |
| D-3485 | Me | single bond | H | c-Pr | $CH_2CN$ | Me | C(=O)Me | O |
| D-3486 | Me(R) | single bond | H | c-Pr | $CH_2CN$ | Me | C(=O)Me | O |
| D-3487 | Me(S) | single bond | H | c-Pr | $CH_2CN$ | Me | C(=O)Me | O |
| D-3488 | H | $CH_2$ | Me | c-Pr | $CH_2CN$ | Me | C(=O)Me | O |
| D-3489 | Me | $CH_2$ | H | c-Pr | $CH_2CN$ | Me | C(=O)Me | O |
| D-3490 | H | CH(Me) | H | c-Pr | $CH_2CN$ | Me | C(=O)Me | O |
| D-3491 | H | $CH_2CH_2$ | Me | c-Pr | $CH_2CN$ | Me | C(=O)Me | O |
| D-3492 | Me | $CH_2CH_2$ | H | c-Pr | $CH_2CN$ | Me | C(=O)Me | O |
| D-3493 | H | single bond | Me | c-Pr | C(=O)Me | Cl | Me | O |
| D-3494 | Me | single bond | H | C-Pr | C(=O)Me | Cl | Me | O |
| D-3495 | Me(R) | single bond | H | c-Pr | C(=O)Me | Cl | Me | O |
| D-3496 | Me(S) | single bond | H | c-Pr | C(=O)Me | Cl | Me | O |
| D-3497 | H | $CH_2$ | Me | c-Pr | C(=O)Me | Cl | Me | O |
| D-3498 | Me | $CH_2$ | H | c-Pr | C(=O)Me | Cl | Me | O |
| D-3499 | H | CH(Me) | H | c-Pr | C(=O)Me | Cl | Me | O |
| D-3500 | H | $CH_2CH_2$ | Me | c-Pr | C(=O)Me | Cl | Me | O |
| D-3501 | Me | $CH_2CH_2$ | H | c-Pr | C(=O)Me | Cl | Me | O |
| D-3502 | H | single bond | Me | c-Pr | C(=O)Me | Me | Me | O |
| D-3503 | Me | single bond | H | c-Pr | C(=O)Me | Me | Me | O |
| D-3504 | Me(R) | single bond | H | c-Pr | C(=O)Me | Me | Me | O |
| D-3505 | Me(S) | single bond | H | c-Pr | C(=O)Me | Me | Me | O |
| D-3506 | H | $CH_2$ | Me | c-Pr | C(=O)Me | Me | Me | O |
| D-3507 | Me | $CH_2$ | H | c-Pr | C(=O)Me | Me | Me | O |
| D-3508 | H | CH(Me) | H | c-Pr | C(=O)Me | Me | Me | O |
| D-3509 | H | $CH_2CH_2$ | Me | c-Pr | C(=O)Me | Me | Me | O |
| D-3510 | Me | $CH_2CH_2$ | H | c-Pr | C(=O)Me | Me | Me | O |
| D-3511 | H | single bond | Me | c-Pr | C(=O)Me | Cl | Et | O |
| D-3512 | Me | single bond | H | c-Pr | C(=O)Me | Cl | Et | O |

TABLE 724-continued

| Compound Number | Y | W | Z | $R^1$ | $R^2$ | $R^3$ | $R^{10}$ | A |
|---|---|---|---|---|---|---|---|---|
| D-3513 | Me(R) | single bond | H | c-Pr | C(═O)Me | Cl | Et | O |
| D-3514 | Me(S) | single bond | H | c-Pr | C(═O)Me | Cl | Et | O |

TABLE 725

| Compound Number | Y | W | Z | $R^1$ | $R^2$ | $R^3$ | $R^{10}$ | A |
|---|---|---|---|---|---|---|---|---|
| D-3515 | H | $CH_2$ | Me | c-Pr | C(═O)Me | Cl | Et | O |
| D-3516 | Me | $CH_2$ | H | c-Pr | C(═O)Me | Cl | Et | O |
| D-3517 | H | CH(Me) | H | c-Pr | C(═O)Me | Cl | Et | O |
| D-3518 | H | $CH_2CH_2$ | Me | c-Pr | C(═O)Me | Cl | Et | O |
| D-3519 | Me | $CH_2CH_2$ | H | c-Pr | C(═O)Me | Cl | Et | O |
| D-3520 | H | single bond | Me | c-Pr | C(═O)Me | Me | Et | O |
| D-3521 | Me | single bond | H | c-Pr | C(═O)Me | Me | Et | O |
| D-3522 | Me(R) | single bond | H | c-Pr | C(═O)Me | Me | Et | O |
| D-3523 | Me(S) | single bond | H | c-Pr | C(═O)Me | Me | Et | O |
| D-3524 | H | $CH_2$ | Me | c-Pr | C(═O)Me | Me | Et | O |
| D-3525 | Me | $CH_2$ | H | c-Pr | C(═O)Me | Me | Et | O |
| D-3526 | H | CH(Me) | H | c-Pr | C(═O)Me | Me | Et | O |
| D-3527 | H | $CH_2CH_2$ | Me | c-Pr | C(═O)Me | Me | Et | O |
| D-3528 | Me | $CH_2CH_2$ | H | c-Pr | C(═O)Me | Me | Et | O |
| D-3529 | H | single bond | Me | c-Pr | C(═O)Me | Cl | $CH_2CF_3$ | O |
| D-3530 | Me | single bond | H | c-Pr | C(═O)Me | Cl | $CH_2CF_3$ | O |
| D-3531 | Me(R) | single bond | H | c-Pr | C(═O)Me | Cl | $CH_2CF_3$ | O |
| D-3532 | Me(S) | single bond | H | c-Pr | C(═O)Me | Cl | $CH_2CF_3$ | O |
| D-3533 | H | $CH_2$ | Me | c-Pr | C(═O)Me | Cl | $CH_2CF_3$ | O |
| D-3534 | Me | $CH_2$ | H | c-Pr | C(═O)Me | Cl | $CH_2CF_3$ | O |
| D-3535 | H | CH(Me) | H | c-Pr | C(═O)Me | Cl | $CH_2CF_3$ | O |
| D-3536 | H | $CH_2CH_2$ | Me | c-Pr | C(═O)Me | Cl | $CH_2CF_3$ | O |
| D-3537 | Me | $CH_2CH_2$ | H | c-Pr | C(═O)Me | Cl | $CH_2CF_3$ | O |
| D-3538 | H | single bond | Me | c-Pr | C(═O)Me | Me | $CH_2CF_3$ | O |
| D-3539 | Me | single bond | H | c-Pr | C(═O)Me | Me | $CH_2CF_3$ | O |
| D-3540 | Me(R) | single bond | H | c-Pr | C(═O)Me | Me | $CH_2CF_3$ | O |
| D-3541 | Me(S) | single bond | H | c-Pr | C(═O)Me | Me | $CH_2CF_3$ | O |
| D-3542 | H | $CH_2$ | Me | c-Pr | C(═O)Me | Me | $CH_2CF_3$ | O |
| D-3543 | Me | $CH_2$ | H | c-Pr | C(═O)Me | Me | $CH_2CF_3$ | O |
| D-3544 | H | CH(Me) | H | c-Pr | C(═O)Me | Me | $CH_2CF_3$ | O |
| D-3545 | H | $CH_2CH_2$ | Me | c-Pr | C(═O)Me | Me | $CH_2CF_3$ | O |
| D-3546 | Me | $CH_2CH_2$ | H | c-Pr | C(═O)Me | Me | $CH_2CF_3$ | O |
| D-3547 | H | single bond | Me | c-Pr | C(═O)Me | Cl | $CH_2OMe$ | O |
| D-3548 | Me | single bond | H | c-Pr | C(═O)Me | Cl | $CH_2OMe$ | O |
| D-3549 | Me(R) | single bond | H | c-Pr | C(═O)Me | Cl | $CH_2OMe$ | O |
| D-3550 | Me(S) | single bond | H | c-Pr | C(═O)Me | Cl | $CH_2OMe$ | O |
| D-3551 | H | $CH_2$ | Me | c-Pr | C(═O)Me | Cl | $CH_2OMe$ | O |
| D-3552 | Me | $CH_2$ | H | c-Pr | C(═O)Me | Cl | $CH_2OMe$ | O |
| D-3553 | H | CH(Me) | H | c-Pr | C(═O)Me | Cl | $CH_2OMe$ | O |
| D-3554 | H | $CH_2CH_2$ | Me | c-Pr | C(═O)Me | Cl | $CH_2OMe$ | O |
| D-3555 | Me | $CH_2CH_2$ | H | c-Pr | C(═O)Me | Cl | $CH_2OMe$ | O |
| D-3556 | H | single bond | Me | c-Pr | C(═O)Me | Me | $CH_2OMe$ | O |
| D-3557 | Me | single bond | H | c-Pr | C(═O)Me | Me | $CH_2OMe$ | O |
| D-3558 | Me(R) | single bond | H | c-Pr | C(═O)Me | Me | $CH_2OMe$ | O |

TABLE 726

| Compound Number | Y | W | Z | $R^1$ | $R^2$ | $R^3$ | $R^{10}$ | A |
|---|---|---|---|---|---|---|---|---|
| D-3559 | Me(S) | single bond | H | c-Pr | C(═O)Me | Me | $CH_2OMe$ | O |
| D-3560 | H | $CH_2$ | Me | c-Pr | C(═O)Me | Me | $CH_2OMe$ | O |
| D-3561 | Me | $CH_2$ | H | c-Pr | C(═O)Me | Me | $CH_2OMe$ | O |
| D-3562 | H | CH(Me) | H | c-Pr | C(═O)Me | Me | $CH_2OMe$ | O |
| D-3563 | H | $CH_2CH_2$ | Me | c-Pr | C(═O)Me | Me | $CH_2OMe$ | O |
| D-3564 | Me | $CH_2CH_2$ | H | c-Pr | C(═O)Me | Me | $CH_2OMe$ | O |
| D-3565 | H | single bond | Me | c-Pr | C(═O)Me | Cl | $CH_2CN$ | O |
| D-3566 | Me | single bond | H | c-Pr | C(═O)Me | Cl | $CH_2CN$ | O |
| D-3567 | Me(R) | single bond | H | c-Pr | C(═O)Me | Cl | $CH_2CN$ | O |
| D-3568 | Me(S) | single bond | H | c-Pr | C(═O)Me | Cl | $CH_2CN$ | O |
| D-3569 | H | $CH_2$ | Me | c-Pr | C(═O)Me | Cl | $CH_2CN$ | O |
| D-3570 | Me | $CH_2$ | H | c-Pr | C(═O)Me | Cl | $CH_2CN$ | O |

TABLE 726-continued

| Compound Number | Y | W | Z | $R^1$ | $R^2$ | $R^3$ | $R^{10}$ | A |
|---|---|---|---|---|---|---|---|---|
| D-3571 | H | CH(Me) | H | c-Pr | C(=O)Me | Cl | $CH_2CN$ | O |
| D-3572 | H | $CH_2CH_2$ | Me | c-Pr | C(=O)Me | Cl | $CH_2CN$ | O |
| D-3573 | Me | $CH_2CH_2$ | H | c-Pr | C(=O)Me | Cl | $CH_2CN$ | O |
| D-3574 | H | single bond | Me | c-Pr | C(=O)Me | Me | $CH_2CN$ | O |
| D-3575 | Me | single bond | H | c-Pr | C(=O)Me | Me | $CH_2CN$ | O |
| D-3576 | Me(R) | single bond | H | c-Pr | C(=O)Me | Me | $CH_2CN$ | O |
| D-3577 | Me(S) | single bond | H | c-Pr | C(=O)Me | Me | $CH_2CN$ | O |
| D-3578 | H | $CH_2$ | Me | c-Pr | C(=O)Me | Me | $CH_2CN$ | O |
| D-3579 | Me | $CH_2$ | H | c-Pr | C(=O)Me | Me | $CH_2CN$ | O |
| D-3580 | H | CH(Me) | H | c-Pr | C(=O)Me | Me | $CH_2CN$ | O |
| D-3581 | H | $CH_2CH_2$ | Me | c-Pr | C(=O)Me | Me | $CH_2CN$ | O |
| D-3582 | Me | $CH_2CH_2$ | H | c-Pr | C(=O)Me | Me | $CH_2CN$ | O |
| D-3583 | H | single bond | Me | c-Pr | C(=O)Me | Cl | C(=O)Me | O |
| D-3584 | Me | single bond | H | c-Pr | C(=O)Me | Cl | C(=O)Me | O |
| D-3585 | Me(R) | single bond | H | c-Pr | C(=O)Me | Cl | C(=O)Me | O |
| D-3586 | Me(S) | single bond | H | c-Pr | C(=O)Me | Cl | C(=O)Me | O |
| D-3587 | H | $CH_2$ | Me | c-Pr | C(=O)Me | Cl | C(=O)Me | O |
| D-3588 | Me | $CH_2$ | H | c-Pr | C(=O)Me | Cl | C(=O)Me | O |
| D-3589 | H | CH(Me) | H | c-Pr | C(=O)Me | Cl | C(=O)Me | O |
| D-3590 | H | $CH_2CH_2$ | Me | c-Pr | C(=O)Me | Cl | C(=O)Me | O |
| D-3591 | Me | $CH_2CH_2$ | H | c-Pr | C(=O)Me | Cl | C(=O)Me | O |
| D-3592 | H | single bond | Me | c-Pr | C(=O)Me | Me | C(=O)Me | O |
| D-3593 | Me | single bond | H | c-Pr | C(=O)Me | Me | C(=O)Me | O |
| D-3594 | Me(R) | single bond | H | c-Pr | C(=O)Me | Me | C(=O)Me | O |
| D-3595 | Me(S) | single bond | H | c-Pr | C(=O)Me | Me | C(=O)Me | O |
| D-3596 | H | $CH_2$ | Me | c-Pr | C(=O)Me | Me | C(=O)Me | O |
| D-3597 | Me | $CH_2$ | H | c-Pr | C(=O)Me | Me | C(=O)Me | O |
| D-3598 | H | CH(Me) | H | c-Pr | C(=O)Me | Me | C(=O)Me | O |
| D-3599 | H | $CH_2CH_2$ | Me | c-Pr | C(=O)Me | Me | C(=O)Me | O |
| D-3600 | Me | $CH_2CH_2$ | H | c-Pr | C(=O)Me | Me | C(=O)Me | O |
| D-3601 | H | single bond | Me | c-Pr | C(=O)(i-Pr) | Cl | Me | O |
| D-3602 | Me | single bond | H | c-Pr | C(=O)(i-Pr) | Cl | Me | O |

TABLE 727

| Compound Number | Y | W | Z | $R^1$ | $R^2$ | $R^3$ | $R^{10}$ | A |
|---|---|---|---|---|---|---|---|---|
| D-3603 | Me(R) | single bond | H | c-Pr | C(=O)(i-Pr) | Cl | Me | O |
| D-3604 | Me(S) | single bond | H | c-Pr | C(=O)(i-Pr) | Cl | Me | O |
| D-3605 | H | $CH_2$ | Me | c-Pr | C(=O)(i-Pr) | Cl | Me | O |
| D-3606 | Me | $CH_2$ | H | c-Pr | C(=O)(i-Pr) | Cl | Me | O |
| D-3607 | H | CH(Me) | H | c-Pr | C(=O)(i-Pr) | Cl | Me | O |
| D-3608 | H | $CH_2CH_2$ | Me | c-Pr | C(=O)(i-Pr) | Cl | Me | O |
| D-3609 | Me | $CH_2CH_2$ | H | c-Pr | C(=O)(i-Pr) | Cl | Me | O |
| D-3610 | H | single bond | Me | c-Pr | C(=O)(i-Pr) | Me | Me | O |
| D-3611 | Me | single bond | H | c-Pr | C(=O)(i-Pr) | Me | Me | O |
| D-3612 | Me(R) | single bond | H | c-Pr | C(=O)(i-Pr) | Me | Me | O |
| D-3613 | Me(S) | single bond | H | c-Pr | C(=O)(i-Pr) | Me | Me | O |
| D-3614 | H | $CH_2$ | Me | c-Pr | C(=O)(i-Pr) | Me | Me | O |
| D-3615 | Me | $CH_2$ | H | c-Pr | C(=O)(i-Pr) | Me | Me | O |
| D-3616 | H | CH(Me) | H | c-Pr | C(=O)(i-Pr) | Me | Me | O |
| D-3617 | H | $CH_2CH_2$ | Me | c-Pr | C(=O)(i-Pr) | Me | Me | O |
| D-3618 | Me | $CH_2CH_2$ | H | c-Pr | C(=O)(i-Pr) | Me | Me | O |
| D-3619 | H | single bond | Me | c-Pr | C(=O)(i-Pr) | Cl | Et | O |
| D-3620 | Me | single bond | H | c-Pr | C(=O)(i-Pr) | Cl | Et | O |
| D-3621 | Me(R) | single bond | H | c-Pr | C(=O)(i-Pr) | Cl | Et | O |
| D-3622 | Me(S) | single bond | H | c-Pr | C(=O)(i-Pr) | Cl | Et | O |
| D-3623 | H | $CH_2$ | Me | c-Pr | C(=O)(i-Pr) | Cl | Et | O |
| D-3624 | Me | $CH_2$ | H | c-Pr | C(=O)(i-Pr) | Cl | Et | O |
| D-3625 | H | CH(Me) | H | c-Pr | C(=O)(i-Pr) | Cl | Et | O |
| D-3626 | H | $CH_2CH_2$ | Me | c-Pr | C(=O)(i-Pr) | Cl | Et | O |
| D-3627 | Me | $CH_2CH_2$ | H | c-Pr | C(=O)(i-Pr) | Cl | Et | O |
| D-3628 | H | single bond | Me | c-Pr | C(=O)(i-Pr) | Me | Et | O |
| D-3629 | Me | single bond | H | c-Pr | C(=O)(i-Pr) | Me | Et | O |
| D-3630 | Me(R) | single bond | H | c-Pr | C(=O)(i-Pr) | Me | Et | O |
| D-3631 | Me(S) | single bond | H | c-Pr | C(=O)(i-Pr) | Me | Et | O |
| D-3632 | H | $CH_2$ | Me | c-Pr | C(=O)(i-Pr) | Me | Et | O |
| D-3633 | Me | $CH_2$ | H | c-Pr | C(=O)(i-Pr) | Me | Et | O |
| D-3634 | H | CH(Me) | H | c-Pr | C(=O)(i-Pr) | Me | Et | O |
| D-3635 | H | $CH_2CH_2$ | Me | c-Pr | C(=O)(i-Pr) | Me | Et | O |
| D-3636 | Me | $CH_2CH_2$ | H | c-Pr | C(=O)(i-Pr) | Me | Et | O |
| D-3637 | H | single bond | Me | c-Pr | C(=O)(i-Pr) | Cl | $CH_2CF_3$ | O |

TABLE 727-continued

| Compound Number | Y | W | Z | $R^1$ | $R^2$ | $R^3$ | $R^{10}$ | A |
|---|---|---|---|---|---|---|---|---|
| D-3638 | Me | single bond | H | c-Pr | C(=O)(i-Pr) | Cl | $CH_2CF_3$ | O |
| D-3639 | Me(R) | single bond | H | c-Pr | C(=O)(i-Pr) | Cl | $CH_2CF_3$ | O |
| D-3640 | Me(S) | single bond | H | c-Pr | C(=O)(i-Pr) | Cl | $CH_2CF_3$ | O |
| D-3641 | H | $CH_2$ | Me | c-Pr | C(=O)(i-Pr) | Cl | $CH_2CF_3$ | O |
| D-3642 | Me | $CH_2$ | H | c-Pr | C(=O)(i-Pr) | Cl | $CH_2CF_3$ | O |
| D-3643 | H | CH(Me) | H | c-Pr | C(=O)(i-Pr) | Cl | $CH_2CF_3$ | O |
| D-3644 | H | $CH_2CH_2$ | Me | c-Pr | C(=O)(i-Pr) | Cl | $CH_2CF_3$ | O |
| D-3645 | Me | $CH_2CH_2$ | H | c-Pr | C(=O)(i-Pr) | Cl | $CH_2CF_3$ | O |
| D-3646 | H | single bond | Me | c-Pr | C(=O)(i-Pr) | Me | $CH_2CF_3$ | O |

TABLE 728

| Compound Number | Y | W | Z | $R^1$ | $R^2$ | $R^3$ | $R^{10}$ | A |
|---|---|---|---|---|---|---|---|---|
| D-3647 | Me | single bond | H | c-Pr | C(=O)(i-Pr) | Me | $CH_2CF_3$ | O |
| D-3648 | Me(R) | single bond | H | c-Pr | C(=O)(i-Pr) | Me | $CH_2CF_3$ | O |
| D-3649 | Me(S) | single bond | H | c-Pr | C(=O)(i-Pr) | Me | $CH_2CF_3$ | O |
| D-3650 | H | $CH_2$ | Me | c-Pr | C(=O)(i-Pr) | Me | $CH_2CF_3$ | O |
| D-3651 | Me | $CH_2$ | H | c-Pr | C(=O)(i-Pr) | Me | $CH_2CF_3$ | O |
| D-3652 | H | CH(Me) | H | c-Pr | C(=O)(i-Pr) | Me | $CH_2CF_3$ | O |
| D-3653 | H | $CH_2CH_2$ | Me | c-Pr | C(=O)(i-Pr) | Me | $CH_2CF_3$ | O |
| D-3654 | Me | $CH_2CH_2$ | H | c-Pr | C(=O)(i-Pr) | Me | $CH_2CF_3$ | O |
| D-3655 | H | single bond | Me | c-Pr | C(=O)(i-Pr) | Cl | $CH_2OMe$ | O |
| D-3656 | Me | single bond | H | c-Pr | C(=O)(i-Pr) | Cl | $CH_2OMe$ | O |
| D-3657 | Me(R) | single bond | H | c-Pr | C(=O)(i-Pr) | Cl | $CH_2OMe$ | O |
| D-3658 | Me(S) | single bond | H | c-Pr | C(=O)(i-Pr) | Cl | $CH_2OMe$ | O |
| D-3659 | H | $CH_2$ | Me | c-Pr | C(=O)(i-Pr) | Cl | $CH_2OMe$ | O |
| D-3660 | Me | $CH_2$ | H | c-Pr | C(=O)(i-Pr) | Cl | $CH_2OMe$ | O |
| D-3661 | H | CH(Me) | H | c-Pr | C(=O)(i-Pr) | Cl | $CH_2OMe$ | O |
| D-3662 | H | $CH_2CH_2$ | Me | c-Pr | C(=O)(i-Pr) | Cl | $CH_2OMe$ | O |
| D-3663 | Me | $CH_2CH_2$ | H | c-Pr | C(=O)(i-Pr) | Cl | $CH_2OMe$ | O |
| D-3664 | H | single bond | Me | c-Pr | C(=O)(i-Pr) | Me | $CH_2OMe$ | O |
| D-3665 | Me | single bond | H | c-Pr | C(=O)(i-Pr) | Me | $CH_2OMe$ | O |
| D-3666 | Me(R) | single bond | H | c-Pr | C(=O)(i-Pr) | Me | $CH_2OMe$ | O |
| D-3667 | Me(S) | single bond | H | c-Pr | C(=O)(i-Pr) | Me | $CH_2OMe$ | O |
| D-3668 | H | $CH_2$ | Me | c-Pr | C(=O)(i-Pr) | Me | $CH_2OMe$ | O |
| D-3669 | Me | $CH_2$ | H | c-Pr | C(=O)(i-Pr) | Me | $CH_2OMe$ | O |
| D-3670 | H | CH(Me) | H | c-Pr | C(=O)(i-Pr) | Me | $CH_2OMe$ | O |
| D-3671 | H | $CH_2CH_2$ | Me | c-Pr | C(=O)(i-Pr) | Me | $CH_2OMe$ | O |
| D-3672 | Me | $CH_2CH_2$ | H | c-Pr | C(=O)(i-Pr) | Me | $CH_2OMe$ | O |
| D-3673 | H | single bond | Me | c-Pr | C(=O)(i-Pr) | Cl | $CH_2CN$ | O |
| D-3674 | Me | single bond | H | c-Pr | C(=O)(i-Pr) | Cl | $CH_2CN$ | O |
| D-3675 | Me(R) | single bond | H | c-Pr | C(=O)(i-Pr) | Cl | $CH_2CN$ | O |
| D-3676 | Me(S) | single bond | H | c-Pr | C(=O)(i-Pr) | Cl | $CH_2CN$ | O |
| D-3677 | H | $CH_2$ | Me | c-Pr | C(=O)(i-Pr) | Cl | $CH_2CN$ | O |
| D-3678 | Me | $CH_2$ | H | c-Pr | C(=O)(i-Pr) | Cl | $CH_2CN$ | O |
| D-3679 | H | CH(Me) | H | c-Pr | C(=O)(i-Pr) | Cl | $CH_2CN$ | O |
| D-3680 | H | $CH_2CH_2$ | Me | c-Pr | C(=O)(i-Pr) | Cl | $CH_2CN$ | O |
| D-3681 | Me | $CH_2CH_2$ | H | c-Pr | C(=O)(i-Pr) | Cl | $CH_2CN$ | O |
| D-3682 | H | single bond | Me | c-Pr | C(=O)(i-Pr) | Me | $CH_2CN$ | O |
| D-3683 | Me | single bond | H | c-Pr | C(=O)(i-Pr) | Me | $CH_2CN$ | O |
| D-3684 | Me(R) | single bond | H | c-Pr | C(=O)(i-Pr) | Me | $CH_2CN$ | O |
| D-3685 | Me(S) | single bond | H | c-Pr | C(=O)(i-Pr) | Me | $CH_2CN$ | O |
| D-3686 | H | $CH_2$ | Me | c-Pr | C(=O)(i-Pr) | Me | $CH_2CN$ | O |
| D-3687 | Me | $CH_2$ | H | c-Pr | C(=O)(i-Pr) | Me | $CH_2CN$ | O |
| D-3688 | H | CH(Me) | H | c-Pr | C(=O)(i-Pr) | Me | $CH_2CN$ | O |
| D-3689 | H | $CH_2CH_2$ | Me | c-Pr | C(=O)(i-Pr) | Me | $CH_2CN$ | O |
| D-3690 | Me | $CH_2CH_2$ | H | c-Pr | C(=O)(i-Pr) | Me | $CH_2CN$ | O |

TABLE 729

| Compound Number | Y | W | Z | $R^1$ | $R^2$ | $R^3$ | $R^{10}$ | A |
|---|---|---|---|---|---|---|---|---|
| D-3691 | H | single bond | Me | c-Pr | C(=O)(i-Pr) | Cl | C(=O)Me | O |
| D-3692 | Me | single bond | H | c-Pr | C(=O)(i-Pr) | Cl | C(=O)Me | O |
| D-3693 | Me(R) | single bond | H | c-Pr | C(=O)(i-Pr) | Cl | C(=O)Me | O |

TABLE 729-continued

| Compound Number | Y | W | Z | $R^1$ | $R^2$ | $R^3$ | $R^{10}$ | A |
|---|---|---|---|---|---|---|---|---|
| D-3694 | Me(S) | single bond | H | c-Pr | C(=O)(i-Pr) | Cl | C(=O)Me | O |
| D-3695 | H | $CH_2$ | Me | c-Pr | C(=O)(i-Pr) | Cl | C(=O)Me | O |
| D-3696 | Me | $CH_2$ | H | c-Pr | C(=O)(i-Pr) | Cl | C(=O)Me | O |
| D-3697 | H | CH(Me) | H | c-Pr | C(=O)(i-Pr) | Cl | C(=O)Me | O |
| D-3698 | H | $CH_2CH_2$ | Me | c-Pr | C(=O)(i-Pr) | Cl | C(=O)Me | O |
| D-3699 | Me | $CH_2CH_2$ | H | c-Pr | C(=O)(i-Pr) | Cl | C(=O)Me | O |
| D-3700 | H | single bond | Me | c-Pr | C(=O)(i-Pr) | Me | C(=O)Me | O |
| D-3701 | Me | single bond | H | c-Pr | C(=O)(i-Pr) | Me | C(=O)Me | O |
| D-3702 | Me(R) | single bond | H | c-Pr | C(=O)(i-Pr) | Me | C(=O)Me | O |
| D-3703 | Me(S) | single bond | H | c-Pr | C(=O)(i-Pr) | Me | C(=O)Me | O |
| D-3704 | H | $CH_2$ | Me | c-Pr | C(=O)(i-Pr) | Me | C(=O)Me | O |
| D-3705 | Me | $CH_2$ | H | c-Pr | C(=O)(i-Pr) | Me | C(=O)Me | O |
| D-3706 | H | CH(Me) | H | c-Pr | C(=O)(i-Pr) | Me | C(=O)Me | O |
| D-3707 | H | $CH_2CH_2$ | Me | c-Pr | C(=O)(i-Pr) | Me | C(=O)Me | O |
| D-3708 | Me | $CH_2CH_2$ | H | c-Pr | C(=O)(i-Pr) | Me | C(=O)Me | O |
| D-3709 | H | single bond | Me | c-Pr | C(=O)Ph | Cl | Me | O |
| D-3710 | Me | single bond | H | c-Pr | C(=O)Ph | Cl | Me | O |
| D-3711 | Me(R) | single bond | H | c-Pr | C(=O)Ph | Cl | Me | O |
| D-3712 | Me(S) | single bond | H | c-Pr | C(=O)Ph | Cl | Me | O |
| D-3713 | H | $CH_2$ | Me | c-Pr | C(=O)Ph | Cl | Me | O |
| D-3714 | Me | $CH_2$ | H | c-Pr | C(=O)Ph | Cl | Me | O |
| D-3715 | H | CH(Me) | H | c-Pr | C(=O)Ph | Cl | Me | O |
| D-3716 | H | $CH_2CH_2$ | Me | c-Pr | C(=O)Ph | Cl | Me | O |
| D-3717 | Me | $CH_2CH_2$ | H | c-Pr | C(=O)Ph | Cl | Me | O |
| D-3718 | H | single bond | Me | c-Pr | C(=O)Ph | Me | Me | O |
| D-3719 | Me | single bond | H | c-Pr | C(=O)Ph | Me | Me | O |
| D-3720 | Me(R) | single bond | H | c-Pr | C(=O)Ph | Me | Me | O |
| D-3721 | Me(S) | single bond | H | c-Pr | C(=O)Ph | Me | Me | O |
| D-3722 | H | $CH_2$ | Me | c-Pr | C(=O)Ph | Me | Me | O |
| D-3723 | Me | $CH_2$ | H | c-Pr | C(=O)Ph | Me | Me | O |
| D-3724 | H | CH(Me) | H | c-Pr | C(=O)Ph | Me | Me | O |
| D-3725 | H | $CH_2CH_2$ | Me | c-Pr | C(=O)Ph | Me | Me | O |
| D-3726 | Me | $CH_2CH_2$ | H | c-Pr | C(=O)Ph | Me | Me | O |
| D-3727 | H | single bond | Me | c-Pr | C(=O)Ph | Cl | Et | O |
| D-3728 | Me | single bond | H | c-Pr | C(=O)Ph | Cl | Et | O |
| D-3729 | Me(R) | single bond | H | c-Pr | C(=O)Ph | Cl | Et | O |
| D-3730 | Me(S) | single bond | H | c-Pr | C(=O)Ph | Cl | Et | O |
| D-3731 | H | $CH_2$ | Me | c-Pr | C(=O)Ph | Cl | Et | O |
| D-3732 | Me | $CH_2$ | H | c-Pr | C(=O)Ph | Cl | Et | O |
| D-3733 | H | CH(Me) | H | c-Pr | C(=O)Ph | Cl | Et | O |
| D-3734 | H | $CH_2CH_2$ | Me | c-Pr | C(=O)Ph | Cl | Et | O |

TABLE 730

| Compound Number | Y | W | Z | $R^1$ | $R^2$ | $R^3$ | $R^{10}$ | A |
|---|---|---|---|---|---|---|---|---|
| D-3735 | Me | $CH_2CH_2$ | H | c-Pr | C(=O)Ph | Cl | Et | O |
| D-3736 | H | single bond | Me | c-Pr | C(=O)Ph | Me | Et | O |
| D-3737 | Me | single bond | H | c-Pr | C(=O)Ph | Me | Et | O |
| D-3738 | Me(R) | single bond | H | c-Pr | C(=O)Ph | Me | Et | O |
| D-3739 | Me(S) | single bond | H | c-Pr | C(=O)Ph | Me | Et | O |
| D-3740 | H | $CH_2$ | Me | c-Pr | C(=O)Ph | Me | Et | O |
| D-3741 | Me | $CH_2$ | H | c-Pr | C(=O)Ph | Me | Et | O |
| D-3742 | H | CH(Me) | H | c-Pr | C(=O)Ph | Me | Et | O |
| D-3743 | H | $CH_2CH_2$ | Me | c-Pr | C(=O)Ph | Me | Et | O |
| D-3744 | Me | $CH_2CH_2$ | H | c-Pr | C(=O)Ph | Me | Et | O |
| D-3745 | H | single bond | Me | c-Pr | C(=O)Ph | Cl | $CH_2CF_3$ | O |
| D-3746 | Me | single bond | H | c-Pr | C(=O)Ph | Cl | $CH_2CF_3$ | O |
| D-3747 | Me(R) | single bond | H | c-Pr | C(=O)Ph | Cl | $CH_2CF_3$ | O |
| D-3748 | Me(S) | single bond | H | c-Pr | C(=O)Ph | Cl | $CH_2CF_3$ | O |
| D-3749 | H | $CH_2$ | Me | c-Pr | C(=O)Ph | Cl | $CH_2CF_3$ | O |
| D-3750 | Me | $CH_2$ | H | c-Pr | C(=O)Ph | Cl | $CH_2CF_3$ | O |
| D-3751 | H | CH(Me) | H | c-Pr | C(=O)Ph | Cl | $CH_2CF_3$ | O |
| D-3752 | H | $CH_2CH_2$ | Me | c-Pr | C(=O)Ph | Cl | $CH_2CF_3$ | O |
| D-3753 | Me | $CH_2CH_2$ | H | c-Pr | C(=O)Ph | Cl | $CH_2CF_3$ | O |
| D-3754 | H | single bond | Me | c-Pr | C(=O)Ph | Me | $CH_2CF_3$ | O |
| D-3755 | Me | single bond | H | c-Pr | C(=O)Ph | Me | $CH_2CF_3$ | O |
| D-3756 | Me(R) | single bond | H | c-Pr | C(=O)Ph | Me | $CH_2CF_3$ | O |
| D-3757 | Me(S) | single bond | H | c-Pr | C(=O)Ph | Me | $CH_2CF_3$ | O |
| D-3758 | H | $CH_2$ | Me | c-Pr | C(=O)Ph | Me | $CH_2CF_3$ | O |
| D-3759 | Me | $CH_2$ | H | c-Pr | C(=O)Ph | Me | $CH_2CF_3$ | O |
| D-3760 | H | CH(Me) | H | c-Pr | C(=O)Ph | Me | $CH_2CF_3$ | O |

TABLE 730-continued

| Compound Number | Y | W | Z | $R^1$ | $R^2$ | $R^3$ | $R^{10}$ | A |
|---|---|---|---|---|---|---|---|---|
| D-3761 | H | $CH_2CH_2$ | Me | c-Pr | C(=O)Ph | Me | $CH_2CF_3$ | O |
| D-3762 | Me | $CH_2CH_2$ | H | c-Pr | C(=O)Ph | Me | $CH_2CF_3$ | O |
| D-3763 | H | single bond | Me | c-Pr | C(=O)Ph | Cl | $CH_2OMe$ | O |
| D-3764 | Me | single bond | H | c-Pr | C(=O)Ph | Cl | $CH_2OMe$ | O |
| D-3765 | Me(R) | single bond | H | c-Pr | C(=O)Ph | Cl | $CH_2OMe$ | O |
| D-3766 | Me(S) | single bond | H | c-Pr | C(=O)Ph | Cl | $CH_2OMe$ | O |
| D-3767 | H | $CH_2$ | Me | c-Pr | C(=O)Ph | Cl | $CH_2OMe$ | O |
| D-3768 | Me | $CH_2$ | H | c-Pr | C(=O)Ph | Cl | $CH_2OMe$ | O |
| D-3769 | H | CH(Me) | H | c-Pr | C(=O)Ph | Cl | $CH_2OMe$ | O |
| D-3770 | H | $CH_2CH_2$ | Me | c-Pr | C(=O)Ph | Cl | $CH_2OMe$ | O |
| D-3771 | Me | $CH_2CH_2$ | H | c-Pr | C(=O)Ph | Cl | $CH_2OMe$ | O |
| D-3772 | H | single bond | Me | c-Pr | C(=O)Ph | Me | $CH_2OMe$ | O |
| D-3773 | Me | single bond | H | c-Pr | C(=O)Ph | Me | $CH_2OMe$ | O |
| D-3774 | Me(R) | single bond | H | c-Pr | C(=O)Ph | Me | $CH_2OMe$ | O |
| D-3775 | Me(S) | single bond | H | c-Pr | C(=O)Ph | Me | $CH_2OMe$ | O |
| D-3776 | H | $CH_2$ | Me | c-Pr | C(=O)Ph | Me | $CH_2OMe$ | O |
| D-3777 | Me | $CH_2$ | H | c-Pr | C(=O)Ph | Me | $CH_2OMe$ | O |
| D-3778 | H | CH(Me) | H | c-Pr | C(=O)Ph | Me | $CH_2OMe$ | O |

TABLE 731

| Compound Number | Y | W | Z | $R^1$ | $R^2$ | $R^3$ | $R^{10}$ | A |
|---|---|---|---|---|---|---|---|---|
| D-3779 | H | $CH_2CH_2$ | Me | c-Pr | C(=O)Ph | Me | $CH_2OMe$ | O |
| D-3780 | Me | $CH_2CH_2$ | H | c-Pr | C(=O)Ph | Me | $CH_2OMe$ | O |
| D-3781 | H | single bond | Me | c-Pr | C(=O)Ph | Cl | $CH_2CN$ | O |
| D-3782 | Me | single bond | H | c-Pr | C(=O)Ph | Cl | $CH_2CN$ | O |
| D-3783 | Me(R) | single bond | H | c-Pr | C(=O)Ph | Cl | $CH_2CN$ | O |
| D-3784 | Me(S) | single bond | H | c-Pr | C(=O)Ph | Cl | $CH_2CN$ | O |
| D-3785 | H | $CH_2$ | Me | c-Pr | C(=O)Ph | Cl | $CH_2CN$ | O |
| D-3786 | Me | $CH_2$ | H | c-Pr | C(=O)Ph | Cl | $CH_2CN$ | O |
| D-3787 | H | CH(Me) | H | c-Pr | C(=O)Ph | Cl | $CH_2CN$ | O |
| D-3788 | H | $CH_2CH_2$ | Me | c-Pr | C(=O)Ph | Cl | $CH_2CN$ | O |
| D-3789 | Me | $CH_2CH_2$ | H | c-Pr | C(=O)Ph | Cl | $CH_2CN$ | O |
| D-3790 | H | single bond | Me | c-Pr | C(=O)Ph | Me | $CH_2CN$ | O |
| D-3791 | Me | single bond | H | c-Pr | C(=O)Ph | Me | $CH_2CN$ | O |
| D-3792 | Me(R) | single bond | H | c-Pr | C(=O)Ph | Me | $CH_2CN$ | O |
| D-3793 | Me(S) | single bond | H | c-Pr | C(=O)Ph | Me | $CH_2CN$ | O |
| D-3794 | H | $CH_2$ | Me | c-Pr | C(=O)Ph | Me | $CH_2CN$ | O |
| D-3795 | Me | $CH_2$ | H | c-Pr | C(=O)Ph | Me | $CH_2CN$ | O |
| D-3796 | H | CH(Me) | H | c-Pr | C(=O)Ph | Me | $CH_2CN$ | O |
| D-3797 | H | $CH_2CH_2$ | Me | c-Pr | C(=O)Ph | Me | $CH_2CN$ | O |
| D-3798 | Me | $CH_2CH_2$ | H | c-Pr | C(=O)Ph | Me | $CH_2CN$ | O |
| D-3799 | H | single bond | Me | c-Pr | C(=O)Ph | Cl | C(=O)Me | O |
| D-3800 | Me | single bond | H | c-Pr | C(=O)Ph | Cl | C(=O)Me | O |
| D-3801 | Me(R) | single bond | H | c-Pr | C(=O)Ph | Cl | C(=O)Me | O |
| D-3802 | Me(S) | single bond | H | c-Pr | C(=O)Ph | Cl | C(=O)Me | O |
| D-3803 | H | $CH_2$ | Me | c-Pr | C(=O)Ph | Cl | C(=O)Me | O |
| D-3804 | Me | $CH_2$ | H | c-Pr | C(=O)Ph | Cl | C(=O)Me | O |
| D-3805 | H | CH(Me) | H | c-Pr | C(=O)Ph | Cl | C(=O)Me | O |
| D-3806 | H | $CH_2CH_2$ | Me | c-Pr | C(=O)Ph | Cl | C(=O)Me | O |
| D-3807 | Me | $CH_2CH_2$ | H | c-Pr | C(=O)Ph | Cl | C(=O)Me | O |
| D-3808 | H | single bond | Me | c-Pr | C(=O)Ph | Me | C(=O)Me | O |
| D-3809 | Me | single bond | H | c-Pr | C(=O)Ph | Me | C(=O)Me | O |
| D-3810 | Me(R) | single bond | H | c-Pr | C(=O)Ph | Me | C(=O)Me | O |
| D-3811 | Me(S) | single bond | H | c-Pr | C(=O)Ph | Me | C(=O)Me | O |
| D-3812 | H | $CH_2$ | Me | c-Pr | C(=O)Ph | Me | C(=O)Me | O |
| D-3813 | Me | $CH_2$ | H | c-Pr | C(=O)Ph | Me | C(=O)Me | O |
| D-3814 | H | CH(Me) | H | c-Pr | C(=O)Ph | Me | C(=O)Me | O |
| D-3815 | H | $CH_2CH_2$ | Me | c-Pr | C(=O)Ph | Me | C(=O)Me | O |
| D-3816 | Me | $CH_2CH_2$ | H | c-Pr | C(=O)Ph | Me | C(=O)Me | O |
| D-3817 | H | single bond | Me | c-Pr | C(=O)OEt | Cl | Me | O |
| D-3818 | Me | single bond | H | c-Pr | C(=O)OEt | Cl | Me | O |
| D-3819 | Me(R) | single bond | H | c-Pr | C(=O)OEt | Cl | Me | O |
| D-3820 | Me(S) | single bond | H | c-Pr | C(=O)OEt | Cl | Me | O |
| D-3821 | H | $CH_2$ | Me | c-Pr | C(=O)OEt | Cl | Me | O |
| D-3822 | Me | $CH_2$ | H | c-Pr | C(=O)OEt | Cl | Me | O |

TABLE 732

| Compound Number | Y | W | Z | $R^1$ | $R^2$ | $R^3$ | $R^{10}$ | A |
|---|---|---|---|---|---|---|---|---|
| D-3823 | H | CH(Me) | H | c-Pr | C(=O)OEt | Cl | Me | O |
| D-3824 | H | $CH_2CH_2$ | Me | c-Pr | C(=O)OEt | Cl | Me | O |
| D-3825 | Me | $CH_2CH_2$ | H | c-Pr | C(=O)OEt | Cl | Me | O |
| D-3826 | H | single bond | Me | c-Pr | C(=O)OEt | Me | Me | O |
| D-3827 | Me | single bond | H | c-Pr | C(=O)OEt | Me | Me | O |
| D-3828 | Me(R) | single bond | H | c-Pr | C(=O)OEt | Me | Me | O |
| D-3829 | Me(S) | single bond | H | c-Pr | C(=O)OEt | Me | Me | O |
| D-3830 | H | $CH_2$ | Me | c-Pr | C(=O)OEt | Me | Me | O |
| D-3831 | Me | $CH_2$ | H | c-Pr | C(=O)OEt | Me | Me | O |
| D-3832 | H | CH(Me) | H | c-Pr | C(=O)OEt | Me | Me | O |
| D-3833 | H | $CH_2CH_2$ | Me | c-Pr | C(=O)OEt | Me | Me | O |
| D-3834 | Me | $CH_2CH_2$ | H | c-Pr | C(=O)OEt | Me | Me | O |
| D-3835 | H | single bond | Me | c-Pr | C(=O)OEt | Cl | Et | O |
| D-3836 | Me | single bond | H | c-Pr | C(=O)OEt | Cl | Et | O |
| D-3837 | Me(R) | single bond | H | c-Pr | C(=O)OEt | Cl | Et | O |
| D-3838 | Me(S) | single bond | H | c-Pr | C(=O)OEt | Cl | Et | O |
| D-3839 | H | $CH_2$ | Me | c-Pr | C(=O)OEt | Cl | Et | O |
| D-3840 | Me | $CH_2$ | H | c-Pr | C(=O)OEt | Cl | Et | O |
| D-3841 | H | CH(Me) | H | c-Pr | C(=O)OEt | Cl | Et | O |
| D-3842 | H | $CH_2CH_2$ | Me | c-Pr | C(=O)OEt | Cl | Et | O |
| D-3843 | Me | $CH_2CH_2$ | H | c-Pr | C(=O)OEt | Cl | Et | O |
| D-3844 | H | single bond | Me | c-Pr | C(=O)OEt | Me | Et | O |
| D-3845 | Me | single bond | H | c-Pr | C(=O)OEt | Me | Et | O |
| D-3846 | Me(R) | single bond | H | c-Pr | C(=O)OEt | Me | Et | O |
| D-3847 | Me(S) | single bond | H | c-Pr | C(=O)OEt | Me | Et | O |
| D-3848 | H | $CH_2$ | Me | c-Pr | C(=O)OEt | Me | Et | O |
| D-3849 | Me | $CH_2$ | H | c-Pr | C(=O)OEt | Me | Et | O |
| D-3850 | H | CH(Me) | H | c-Pr | C(=O)OEt | Me | Et | O |
| D-3851 | H | $CH_2CH_2$ | Me | c-Pr | C(=O)OEt | Me | Et | O |
| D-3852 | Me | $CH_2CH_2$ | H | c-Pr | C(=O)OEt | Me | Et | O |
| D-3853 | H | single bond | Me | c-Pr | C(=O)OEt | Cl | $CH_2CF_3$ | O |
| D-3854 | Me | single bond | H | c-Pr | C(=O)OEt | Cl | $CH_2CF_3$ | O |
| D-3855 | Me(R) | single bond | H | c-Pr | C(=O)OEt | Cl | $CH_2CF_3$ | O |
| D-3856 | Me(S) | single bond | H | c-Pr | C(=O)OEt | Cl | $CH_2CF_3$ | O |
| D-3857 | H | $CH_2$ | Me | c-Pr | C(=O)OEt | Cl | $CH_2CF_3$ | O |
| D-3858 | Me | $CH_2$ | H | c-Pr | C(=O)OEt | Cl | $CH_2CF_3$ | O |
| D-3859 | H | CH(Me) | H | c-Pr | C(=O)OEt | Cl | $CH_2CF_3$ | O |
| D-3860 | H | $CH_2CH_2$ | Me | c-Pr | C(=O)OEt | Cl | $CH_2CF_3$ | O |
| D-3861 | Me | $CH_2CH_2$ | H | c-Pr | C(=O)OEt | Cl | $CH_2CF_3$ | O |
| D-3862 | H | single bond | Me | c-Pr | C(=O)OEt | Me | $CH_2CF_3$ | O |
| D-3863 | Me | single bond | H | c-Pr | C(=O)OEt | Me | $CH_2CF_3$ | O |
| D-3864 | Me(R) | single bond | H | c-Pr | C(=O)OEt | Me | $CH_2CF_3$ | O |
| D-3865 | Me(S) | single bond | H | c-Pr | C(=O)OEt | Me | $CH_2CF_3$ | O |
| D-3866 | H | $CH_2$ | Me | c-Pr | C(=O)OEt | Me | $CH_2CF_3$ | O |

TABLE 733

| Compound Number | Y | W | Z | $R^1$ | $R^2$ | $R^3$ | $R^{10}$ | A |
|---|---|---|---|---|---|---|---|---|
| D-3867 | Me | $CH_2$ | H | c-Pr | C(=O)OEt | Me | $CH_2CF_3$ | O |
| D-3868 | H | CH(Me) | H | c-Pr | C(=O)OEt | Me | $CH_2CF_3$ | O |
| D-3869 | H | $CH_2CH_2$ | Me | c-Pr | C(=O)OEt | Me | $CH_2CF_3$ | O |
| D-3870 | Me | $CH_2CH_2$ | H | c-Pr | C(=O)OEt | Me | $CH_2CF_3$ | O |
| D-3871 | H | single bond | Me | c-Pr | C(=O)OEt | Cl | $CH_2OMe$ | O |
| D-3872 | Me | single bond | H | c-Pr | C(=O)OEt | Cl | $CH_2OMe$ | O |
| D-3873 | Me(R) | single bond | H | c-Pr | C(=O)OEt | Cl | $CH_2OMe$ | O |
| D-3874 | Me(S) | single bond | H | c-Pr | C(=O)OEt | Cl | $CH_2OMe$ | O |
| D-3875 | H | $CH_2$ | Me | c-Pr | C(=O)OEt | Cl | $CH_2OMe$ | O |
| D-3876 | Me | $CH_2$ | H | c-Pr | C(=O)OEt | Cl | $CH_2OMe$ | O |
| D-3877 | H | CH(Me) | H | c-Pr | C(=O)OEt | Cl | $CH_2OMe$ | O |
| D-3878 | H | $CH_2CH_2$ | Me | c-Pr | C(=O)OEt | Cl | $CH_2OMe$ | O |
| D-3879 | Me | $CH_2CH_2$ | H | c-Pr | C(=O)OEt | Cl | $CH_2OMe$ | O |
| D-3880 | H | single bond | Me | c-Pr | C(=O)OEt | Me | $CH_2OMe$ | O |
| D-3881 | Me | single bond | H | c-Pr | C(=O)OEt | Me | $CH_2OMe$ | O |
| D-3882 | Me(R) | single bond | H | c-Pr | C(=O)OEt | Me | $CH_2OMe$ | O |
| D-3883 | Me(S) | single bond | H | c-Pr | C(=O)OEt | Me | $CH_2OMe$ | O |
| D-3884 | H | $CH_2$ | Me | c-Pr | C(=O)OEt | Me | $CH_2OMe$ | O |
| D-3885 | Me | $CH_2$ | H | c-Pr | C(=O)OEt | Me | $CH_2OMe$ | O |
| D-3886 | H | CH(Me) | H | c-Pr | C(=O)OEt | Me | $CH_2OMe$ | O |
| D-3887 | H | $CH_2CH_2$ | Me | c-Pr | C(=O)OEt | Me | $CH_2OMe$ | O |
| D-3888 | Me | $CH_2CH_2$ | H | c-Pr | C(=O)OEt | Me | $CH_2OMe$ | O |
| D-3889 | H | single bond | Me | c-Pr | C(=O)OEt | Cl | $CH_2CN$ | O |

TABLE 733-continued

| Compound Number | Y | W | Z | $R^1$ | $R^2$ | $R^3$ | $R^{10}$ | A |
|---|---|---|---|---|---|---|---|---|
| D-3890 | Me | single bond | H | c-Pr | C(=O)OEt | Cl | $CH_2CN$ | O |
| D-3891 | Me(R) | single bond | H | c-Pr | C(=O)OEt | Cl | $CH_2CN$ | O |
| D-3892 | Me(S) | single bond | H | c-Pr | C(=O)OEt | Cl | $CH_2CN$ | O |
| D-3893 | H | $CH_2$ | Me | c-Pr | C(=O)OEt | Cl | $CH_2CN$ | O |
| D-3894 | Me | $CH_2$ | H | c-Pr | C(=O)OEt | Cl | $CH_2CN$ | O |
| D-3895 | H | CH(Me) | H | c-Pr | C(=O)OEt | Cl | $CH_2CN$ | O |
| D-3896 | H | $CH_2CH_2$ | Me | c-Pr | C(=O)OEt | Cl | $CH_2CN$ | O |
| D-3897 | Me | $CH_2CH_2$ | H | c-Pr | C(=O)OEt | Cl | $CH_2CN$ | O |
| D-3898 | H | single bond | Me | c-Pr | C(=O)OEt | Me | $CH_2CN$ | O |
| D-3899 | Me | single bond | H | c-Pr | C(=O)OEt | Me | $CH_2CN$ | O |
| D-3900 | Me(R) | single bond | H | c-Pr | C(=O)OEt | Me | $CH_2CN$ | O |
| D-3901 | Me(S) | single bond | H | c-Pr | C(=O)OEt | Me | $CH_2CN$ | O |
| D-3902 | H | $CH_2$ | Me | c-Pr | C(=O)OEt | Me | $CH_2CN$ | O |
| D-3903 | Me | $CH_2$ | H | c-Pr | C(=O)OEt | Me | $CH_2CN$ | O |
| D-3904 | H | CH(Me) | H | c-Pr | C(=O)OEt | Me | $CH_2CN$ | O |
| D-3905 | H | $CH_2CH_2$ | Me | c-Pr | C(=O)OEt | Me | $CH_2CN$ | O |
| D-3906 | Me | $CH_2CH_2$ | H | c-Pr | C(=O)OEt | Me | $CH_2CN$ | O |
| D-3907 | H | single bond | Me | c-Pr | C(=O)OEt | Cl | C(=O)Me | O |
| D-3908 | Me | single bond | H | c-Pr | C(=O)OEt | Cl | C(=O)Me | O |
| D-3909 | Me(R) | single bond | H | c-Pr | C(=O)OEt | Cl | C(=O)Me | O |
| D-3910 | Me(S) | single bond | H | c-Pr | C(=O)OEt | Cl | C(=O)Me | O |

TABLE 734

| Compound Number | Y | W | Z | $R^1$ | $R^2$ | $R^3$ | $R^{10}$ | A |
|---|---|---|---|---|---|---|---|---|
| D-3911 | H | $CH_2$ | Me | c-Pr | C(=O)OEt | Cl | C(=O)Me | O |
| D-3912 | Me | $CH_2$ | H | c-Pr | C(=O)OEt | Cl | C(=O)Me | O |
| D-3913 | H | CH(Me) | H | c-Pr | C(=O)OEt | Cl | C(=O)Me | O |
| D-3914 | H | $CH_2CH_2$ | Me | c-Pr | C(=O)OEt | Cl | C(=O)Me | O |
| D-3915 | Me | $CH_2CH_2$ | H | c-Pr | C(=O)OEt | Cl | C(=O)Me | O |
| D-3916 | H | single bond | Me | c-Pr | C(=O)OEt | Me | C(=O)Me | O |
| D-3917 | Me | single bond | H | c-Pr | C(=O)OEt | Me | C(=O)Me | O |
| D-3918 | Me(R) | single bond | H | c-Pr | C(=O)OEt | Me | C(=O)Me | O |
| D-3919 | Me(S) | single bond | H | c-Pr | C(=O)OEt | Me | C(=O)Me | O |
| D-3920 | H | $CH_2$ | Me | c-Pr | C(=O)OEt | Me | C(=O)Me | O |
| D-3921 | Me | $CH_2$ | H | c-Pr | C(=O)OEt | Me | C(=O)Me | O |
| D-3922 | H | CH(Me) | H | c-Pr | C(=O)OEt | Me | C(=O)Me | O |
| D-3923 | H | $CH_2CH_2$ | Me | c-Pr | C(=O)OEt | Me | C(=O)Me | O |
| D-3924 | Me | $CH_2CH_2$ | H | c-Pr | C(=O)OEt | Me | C(=O)Me | O |
| D-3925 | H | single bond | Me | c-Pr | $S(=O)_2Me$ | Cl | Me | O |
| D-3926 | Me | single bond | H | c-Pr | $S(=O)_2Me$ | Cl | Me | O |
| D-3927 | Me(R) | single bond | H | c-Pr | $S(=O)_2Me$ | Cl | Me | O |
| D-3928 | Me(S) | single bond | H | c-Pr | $S(=O)_2Me$ | Cl | Me | O |
| D-3929 | H | $CH_2$ | Me | c-Pr | $S(=O)_2Me$ | Cl | Me | O |
| D-3930 | Me | $CH_2$ | H | c-Pr | $S(=O)_2Me$ | Cl | Me | O |
| D-3931 | H | CH(Me) | H | c-Pr | $S(=O)_2Me$ | Cl | Me | O |
| D-3932 | H | $CH_2CH_2$ | Me | c-Pr | $S(=O)_2Me$ | Cl | Me | O |
| D-3933 | Me | $CH_2CH_2$ | H | c-Pr | $S(=O)_2Me$ | Cl | Me | O |
| D-3934 | H | single bond | Me | c-Pr | $S(=O)_2Me$ | Me | Me | O |
| D-3935 | Me | single bond | H | c-Pr | $S(=O)_2Me$ | Me | Me | O |
| D-3936 | Me(R) | single bond | H | c-Pr | $S(=O)_2Me$ | Me | Me | O |
| D-3937 | Me(S) | single bond | H | c-Pr | $S(=O)_2Me$ | Me | Me | O |
| D-3938 | H | $CH_2$ | Me | c-Pr | $S(=O)_2Me$ | Me | Me | O |
| D-3939 | Me | $CH_2$ | H | c-Pr | $S(=O)_2Me$ | Me | Me | O |
| D-3940 | H | CH(Me) | H | c-Pr | $S(=O)_2Me$ | Me | Me | O |
| D-3941 | H | $CH_2CH_2$ | Me | c-Pr | $S(=O)_2Me$ | Me | Me | O |
| D-3942 | Me | $CH_2CH_2$ | H | c-Pr | $S(=O)_2Me$ | Me | Me | O |
| D-3943 | H | single bond | Me | c-Pr | $S(=O)_2Me$ | Cl | Et | O |
| D-3944 | Me | single bond | H | c-Pr | $S(=O)_2Me$ | Cl | Et | O |
| D-3945 | Me(R) | single bond | H | c-Pr | $S(=O)_2Me$ | Cl | Et | O |
| D-3946 | Me(S) | single bond | H | c-Pr | $S(=O)_2Me$ | Cl | Et | O |
| D-3947 | H | $CH_2$ | Me | c-Pr | $S(=O)_2Me$ | Cl | Et | O |
| D-3948 | Me | $CH_2$ | H | c-Pr | $S(=O)_2Me$ | Cl | Et | O |
| D-3949 | H | CH(Me) | H | c-Pr | $S(=O)_2Me$ | Cl | Et | O |
| D-3950 | H | $CH_2CH_2$ | Me | c-Pr | $S(=O)_2Me$ | Cl | Et | O |
| D-3951 | Me | $CH_2CH_2$ | H | c-Pr | $S(=O)_2Me$ | Cl | Et | O |
| D-3952 | H | single bond | Me | c-Pr | $S(=O)_2Me$ | Me | Et | O |
| D-3953 | Me | single bond | H | c-Pr | $S(=O)_2Me$ | Me | Et | O |
| D-3954 | Me(R) | single bond | H | c-Pr | $S(=O)_2Me$ | Me | Et | O |

TABLE 735

| Compound Number | Y | W | Z | $R^1$ | $R^2$ | $R^3$ | $R^{10}$ | A |
|---|---|---|---|---|---|---|---|---|
| D-3955 | Me(S) | single bond | H | c-Pr | $S(=O)_2Me$ | Me | Et | O |
| D-3956 | H | $CH_2$ | Me | c-Pr | $S(=O)_2Me$ | Me | Et | O |
| D-3957 | Me | $CH_2$ | H | c-Pr | $S(=O)_2Me$ | Me | Et | O |
| D-3958 | H | CH(Me) | H | c-Pr | $S(=O)_2Me$ | Me | Et | O |
| D-3959 | H | $CH_2CH_2$ | Me | c-Pr | $S(=O)_2Me$ | Me | Et | O |
| D-3960 | Me | $CH_2CH_2$ | H | c-Pr | $S(=O)_2Me$ | Me | Et | O |
| D-3961 | H | single bond | Me | c-Pr | $S(=O)_2Me$ | Cl | $CH_2CF_3$ | O |
| D-3962 | Me | single bond | H | c-Pr | $S(=O)_2Me$ | Cl | $CH_2CF_3$ | O |
| D-3963 | Me(R) | single bond | H | c-Pr | $S(=O)_2Me$ | Cl | $CH_2CF_3$ | O |
| D-3964 | Me(S) | single bond | H | c-Pr | $S(=O)_2Me$ | Cl | $CH_2CF_3$ | O |
| D-3965 | H | $CH_2$ | Me | c-Pr | $S(=O)_2Me$ | Cl | $CH_2CF_3$ | O |
| D-3966 | Me | $CH_2$ | H | c-Pr | $S(=O)_2Me$ | Cl | $CH_2CF_3$ | O |
| D-3967 | H | CH(Me) | H | c-Pr | $S(=O)_2Me$ | Cl | $CH_2CF_3$ | O |
| D-3968 | H | $CH_2CH_2$ | Me | c-Pr | $S(=O)_2Me$ | Cl | $CH_2CF_3$ | O |
| D-3969 | Me | $CH_2CH_2$ | H | c-Pr | $S(=O)_2Me$ | Cl | $CH_2CF_3$ | O |
| D-3970 | H | single bond | Me | c-Pr | $S(=O)_2Me$ | Me | $CH_2CF_3$ | O |
| D-3971 | Me | single bond | H | c-Pr | $S(=O)_2Me$ | Me | $CH_2CF_3$ | O |
| D-3972 | Me(R) | single bond | H | c-Pr | $S(=O)_2Me$ | Me | $CH_2CF_3$ | O |
| D-3973 | Me(S) | single bond | H | c-Pr | $S(=O)_2Me$ | Me | $CH_2CF_3$ | O |
| D-3974 | H | $CH_2$ | Me | c-Pr | $S(=O)_2Me$ | Me | $CH_2CF_3$ | O |
| D-3975 | Me | $CH_2$ | H | c-Pr | $S(=O)_2Me$ | Me | $CH_2CF_3$ | O |
| D-3976 | H | CH(Me) | H | c-Pr | $S(=O)_2Me$ | Me | $CH_2CF_3$ | O |
| D-3977 | H | $CH_2CH_2$ | Me | c-Pr | $S(=O)_2Me$ | Me | $CH_2CF_3$ | O |
| D-3978 | Me | $CH_2CH_2$ | H | c-Pr | $S(=O)_2Me$ | Me | $CH_2CF_3$ | O |
| D-3979 | H | single bond | Me | c-Pr | $S(=O)_2Me$ | Cl | $CH_2OMe$ | O |
| D-3980 | Me | single bond | H | c-Pr | $S(=O)_2Me$ | Cl | $CH_2OMe$ | O |
| D-3981 | Me(R) | single bond | H | c-Pr | $S(=O)_2Me$ | Cl | $CH_2OMe$ | O |
| D-3982 | Me(S) | single bond | H | c-Pr | $S(=O)_2Me$ | Cl | $CH_2OMe$ | O |
| D-3983 | H | $CH_2$ | Me | c-Pr | $S(=O)_2Me$ | Cl | $CH_2OMe$ | O |
| D-3984 | Me | $CH_2$ | H | c-Pr | $S(=O)_2Me$ | Cl | $CH_2OMe$ | O |
| D-3985 | H | CH(Me) | H | c-Pr | $S(=O)_2Me$ | Cl | $CH_2OMe$ | O |
| D-3986 | H | $CH_2CH_2$ | Me | c-Pr | $S(=O)_2Me$ | Cl | $CH_2OMe$ | O |
| D-3987 | Me | $CH_2CH_2$ | H | c-Pr | $S(=O)_2Me$ | Cl | $CH_2OMe$ | O |
| D-3988 | H | single bond | Me | c-Pr | $S(=O)_2Me$ | Me | $CH_2OMe$ | O |
| D-3989 | Me | single bond | H | c-Pr | $S(=O)_2Me$ | Me | $CH_2OMe$ | O |
| D-3990 | Me(R) | single bond | H | c-Pr | $S(=O)_2Me$ | Me | $CH_2OMe$ | O |
| D-3991 | Me(S) | single bond | H | c-Pr | $S(=O)_2Me$ | Me | $CH_2OMe$ | O |
| D-3992 | H | $CH_2$ | Me | c-Pr | $S(=O)_2Me$ | Me | $CH_2OMe$ | O |
| D-3993 | Me | $CH_2$ | H | c-Pr | $S(=O)_2Me$ | Me | $CH_2OMe$ | O |
| D-3994 | H | CH(Me) | H | c-Pr | $S(=O)_2Me$ | Me | $CH_2OMe$ | O |
| D-3995 | H | $CH_2CH_2$ | Me | c-Pr | $S(=O)_2Me$ | Me | $CH_2OMe$ | O |
| D-3996 | Me | $CH_2CH_2$ | H | c-Pr | $S(=O)_2Me$ | Me | $CH_2OMe$ | O |
| D-3997 | H | single bond | Me | c-Pr | $S(=O)_2Me$ | Cl | $CH_2CN$ | O |
| D-3998 | Me | single bond | H | c-Pr | $S(=O)_2Me$ | Cl | $CH_2CN$ | O |

TABLE 736

| Compound Number | Y | W | Z | $R^1$ | $R^2$ | $R^3$ | $R^{10}$ | A |
|---|---|---|---|---|---|---|---|---|
| D-3999 | Me(R) | single bond | H | c-Pr | $S(=O)_2Me$ | Cl | $CH_2CN$ | O |
| D-4000 | Me(S) | single bond | H | c-Pr | $S(=O)_2Me$ | Cl | $CH_2CN$ | O |
| D-4001 | H | $CH_2$ | Me | c-Pr | $S(=O)_2Me$ | Cl | $CH_2CN$ | O |
| D-4002 | Me | $CH_2$ | H | c-Pr | $S(=O)_2Me$ | Cl | $CH_2CN$ | O |
| D-4003 | H | CH(Me) | H | c-Pr | $S(=O)_2Me$ | Cl | $CH_2CN$ | O |
| D-4004 | H | $CH_2CH_2$ | Me | c-Pr | $S(=O)_2Me$ | Cl | $CH_2CN$ | O |
| D-4005 | Me | $CH_2CH_2$ | H | c-Pr | $S(=O)_2Me$ | Cl | $CH_2CN$ | O |
| D-4006 | H | single bond | Me | c-Pr | $S(=O)_2Me$ | Me | $CH_2CN$ | O |
| D-4007 | Me | single bond | H | c-Pr | $S(=O)_2Me$ | Me | $CH_2CN$ | O |
| D-4008 | Me(R) | single bond | H | c-Pr | $S(=O)_2Me$ | Me | $CH_2CN$ | O |
| D-4009 | Me(S) | single bond | H | c-Pr | $S(=O)_2Me$ | Me | $CH_2CN$ | O |
| D-4010 | H | $CH_2$ | Me | c-Pr | $S(=O)_2Me$ | Me | $CH_2CN$ | O |
| D-4011 | Me | $CH_2$ | H | c-Pr | $S(=O)_2Me$ | Me | $CH_2CN$ | O |
| D-4012 | H | CH(Me) | H | c-Pr | $S(=O)_2Me$ | Me | $CH_2CN$ | O |
| D-4013 | H | $CH_2CH_2$ | Me | c-Pr | $S(=O)_2Me$ | Me | $CH_2CN$ | O |
| D-4014 | Me | $CH_2CH_2$ | H | c-Pr | $S(=O)_2Me$ | Me | $CH_2CN$ | O |
| D-4015 | H | single bond | Me | c-Pr | $S(=O)_2Me$ | Cl | C(=O)Me | O |
| D-4016 | Me | single bond | H | c-Pr | $S(=O)_2Me$ | Cl | C(=O)Me | O |
| D-4017 | Me(R) | single bond | H | c-Pr | $S(=O)_2Me$ | Cl | C(=O)Me | O |
| D-4018 | Me(S) | single bond | H | c-Pr | $S(=O)_2Me$ | Cl | C(=O)Me | O |
| D-4019 | H | $CH_2$ | Me | c-Pr | $S(=O)_2Me$ | Cl | C(=O)Me | O |

TABLE 736-continued

| Compound Number | Y | W | Z | $R^1$ | $R^2$ | $R^3$ | $R^{10}$ | A |
|---|---|---|---|---|---|---|---|---|
| D-4020 | Me | $CH_2$ | H | c-Pr | $S(=O)_2Me$ | Cl | C(=O)Me | O |
| D-4021 | H | CH(Me) | H | c-Pr | $S(=O)_2Me$ | Cl | C(=O)Me | O |
| D-4022 | H | $CH_2CH_2$ | Me | c-Pr | $S(=O)_2Me$ | Cl | C(=O)Me | O |
| D-4023 | Me | $CH_2CH_2$ | H | c-Pr | $S(=O)_2Me$ | Cl | C(=O)Me | O |
| D-4024 | H | single bond | Me | c-Pr | $S(=O)_2Me$ | Me | C(=O)Me | O |
| D-4025 | Me | single bond | H | c-Pr | $S(=O)_2Me$ | Me | C(=O)Me | O |
| D-4026 | Me(R) | single bond | H | c-Pr | $S(=O)_2Me$ | Me | C(=O)Me | O |
| D-4027 | Me(S) | single bond | H | c-Pr | $S(=O)_2Me$ | Me | C(=O)Me | O |
| D-4028 | H | $CH_2$ | Me | c-Pr | $S(=O)_2Me$ | Me | C(=O)Me | O |
| D-4029 | Me | $CH_2$ | H | c-Pr | $S(=O)_2Me$ | Me | C(=O)Me | O |
| D-4030 | H | CH(Me) | H | c-Pr | $S(=O)_2Me$ | Me | C(=O)Me | O |
| D-4031 | H | $CH_2CH_2$ | Me | c-Pr | $S(=O)_2Me$ | Me | C(=O)Me | O |
| D-4032 | Me | $CH_2CH_2$ | H | c-Pr | $S(=O)_2Me$ | Me | C(=O)Me | O |
| D-4033 | H | single bond | Me | c-Pr | $S(=O)_2CF_3$ | Cl | Me | O |
| D-4034 | Me | single bond | H | c-Pr | $S(=O)_2CF_3$ | Cl | Me | O |
| D-4035 | Me(R) | single bond | H | c-Pr | $S(=O)_2CF_3$ | Cl | Me | O |
| D-4036 | Me(S) | single bond | H | c-Pr | $S(=O)_2CF_3$ | Cl | Me | O |
| D-4037 | H | $CH_2$ | Me | c-Pr | $S(=O)_2CF_3$ | Cl | Me | O |
| D-4038 | Me | $CH_2$ | H | c-Pr | $S(=O)_2CF_3$ | Cl | Me | O |
| D-4039 | H | CH(Me) | H | c-Pr | $S(=O)_2CF_3$ | Cl | Me | O |
| D-4040 | H | $CH_2CH_2$ | Me | c-Pr | $S(=O)_2CF_3$ | Cl | Me | O |
| D-4041 | Me | $CH_2CH_2$ | H | c-Pr | $S(=O)_2CF_3$ | Cl | Me | O |
| D-4042 | H | single bond | Me | c-Pr | $S(=O)_2CF_3$ | Me | Me | O |

TABLE 737

| Compound Number | Y | W | Z | $R^1$ | $R^2$ | $R^3$ | $R^{10}$ | A |
|---|---|---|---|---|---|---|---|---|
| D-4043 | Me | single bond | H | c-Pr | $S(=O)_2CF_3$ | Me | Me | O |
| D-4044 | Me(R) | single bond | H | c-Pr | $S(=O)_2CF_3$ | Me | Me | O |
| D-4045 | Me(S) | single bond | H | c-Pr | $S(=O)_2CF_3$ | Me | Me | O |
| D-4046 | H | $CH_2$ | Me | c-Pr | $S(=O)_2CF_3$ | Me | Me | O |
| D-4047 | Me | $CH_2$ | H | c-Pr | $S(=O)_2CF_3$ | Me | Me | O |
| D-4048 | H | CH(Me) | H | c-Pr | $S(=O)_2CF_3$ | Me | Me | O |
| D-4049 | H | $CH_2CH_2$ | Me | c-Pr | $S(=O)_2CF_3$ | Me | Me | O |
| D-4050 | Me | $CH_2CH_2$ | H | c-Pr | $S(=O)_2CF_3$ | Me | Me | O |
| D-4051 | H | single bond | Me | c-Pr | $S(=O)_2CF_3$ | Cl | Et | O |
| D-4052 | Me | single bond | H | c-Pr | $S(=O)_2CF_3$ | Cl | Et | O |
| D-4053 | Me(R) | single bond | H | c-Pr | $S(=O)_2CF_3$ | Cl | Et | O |
| D-4054 | Me(S) | single bond | H | c-Pr | $S(=O)_2CF_3$ | Cl | Et | O |
| D-4055 | H | $CH_2$ | Me | c-Pr | $S(=O)_2CF_3$ | Cl | Et | O |
| D-4056 | Me | $CH_2$ | H | c-Pr | $S(=O)_2CF_3$ | Cl | Et | O |
| D-4057 | H | CH(Me) | H | c-Pr | $S(=O)_2CF_3$ | Cl | Et | O |
| D-4058 | H | $CH_2CH_2$ | Me | c-Pr | $S(=O)_2CF_3$ | Cl | Et | O |
| D-4059 | Me | $CH_2CH_2$ | H | c-Pr | $S(=O)_2CF_3$ | Cl | Et | O |
| D-4060 | H | single bond | Me | c-Pr | $S(=O)_2CF_3$ | Me | Et | O |
| D-4061 | Me | single bond | H | c-Pr | $S(=O)_2CF_3$ | Me | Et | O |
| D-4062 | Me(R) | single bond | H | c-Pr | $S(=O)_2CF_3$ | Me | Et | O |
| D-4063 | Me(S) | single bond | H | c-Pr | $S(=O)_2CF_3$ | Me | Et | O |
| D-4064 | H | $CH_2$ | Me | c-Pr | $S(=O)_2CF_3$ | Me | Et | O |
| D-4065 | Me | $CH_2$ | H | c-Pr | $S(=O)_2CF_3$ | Me | Et | O |
| D-4066 | H | CH(Me) | H | c-Pr | $S(=O)_2CF_3$ | Me | Et | O |
| D-4067 | H | $CH_2CH_2$ | Me | c-Pr | $S(=O)_2CF_3$ | Me | Et | O |
| D-4068 | Me | $CH_2CH_2$ | H | c-Pr | $S(=O)_2CF_3$ | Me | Et | O |
| D-4069 | H | single bond | Me | c-Pr | $S(=O)_2CF_3$ | Cl | $CH_2CF_3$ | O |
| D-4070 | Me | single bond | H | c-Pr | $S(=O)_2CF_3$ | Cl | $CH_2CF_3$ | O |
| D-4071 | Me(R) | single bond | H | c-Pr | $S(=O)_2CF_3$ | Cl | $CH_2CF_3$ | O |
| D-4072 | Me(S) | single bond | H | c-Pr | $S(=O)_2CF_3$ | Cl | $CH_2CF_3$ | O |
| D-4073 | H | $CH_2$ | Me | c-Pr | $S(=O)_2CF_3$ | Cl | $CH_2CF_3$ | O |
| D-4074 | Me | $CH_2$ | H | c-Pr | $S(=O)_2CF_3$ | Cl | $CH_2CF_3$ | O |
| D-4075 | H | CH(Me) | H | c-Pr | $S(=O)_2CF_3$ | Cl | $CH_2CF_3$ | O |
| D-4076 | H | $CH_2CH_2$ | Me | c-Pr | $S(=O)_2CF_3$ | Cl | $CH_2CF_3$ | O |
| D-4077 | Me | $CH_2CH_2$ | H | c-Pr | $S(=O)_2CF_3$ | Cl | $CH_2CF_3$ | O |
| D-4078 | H | single bond | Me | c-Pr | $S(=O)_2CF_3$ | Me | $CH_2CF_3$ | O |
| D-4079 | Me | single bond | H | c-Pr | $S(=O)_2CF_3$ | Me | $CH_2CF_3$ | O |
| D-4080 | Me(R) | single bond | H | c-Pr | $S(=O)_2CF_3$ | Me | $CH_2CF_3$ | O |
| D-4081 | Me(S) | single bond | H | c-Pr | $S(=O)_2CF_3$ | Me | $CH_2CF_3$ | O |
| D-4082 | H | $CH_2$ | Me | c-Pr | $S(=O)_2CF_3$ | Me | $CH_2CF_3$ | O |
| D-4083 | Me | $CH_2$ | H | c-Pr | $S(=O)_2CF_3$ | Me | $CH_2CF_3$ | O |
| D-4084 | H | CH(Me) | H | c-Pr | $S(=O)_2CF_3$ | Me | $CH_2CF_3$ | O |

TABLE 737-continued

| Compound Number | Y | W | Z | $R^1$ | $R^2$ | $R^3$ | $R^{10}$ | A |
|---|---|---|---|---|---|---|---|---|
| D-4085 | H | $CH_2CH_2$ | Me | c-Pr | $S(=O)_2CF_3$ | Me | $CH_2CF_3$ | O |
| D-4086 | Me | $CH_2CH_2$ | H | c-Pr | $S(=O)_2CF_3$ | Me | $CH_2CF_3$ | O |

TABLE 738

| Compound Number | Y | W | Z | $R^1$ | $R^2$ | $R^3$ | $R^{10}$ | A |
|---|---|---|---|---|---|---|---|---|
| D-4087 | H | single bond | Me | c-Pr | $S(=O)_2CF_3$ | Cl | $CH_2OMe$ | O |
| D-4088 | Me | single bond | H | c-Pr | $S(=O)_2CF_3$ | Cl | $CH_2OMe$ | O |
| D-4089 | Me(R) | single bond | H | c-Pr | $S(=O)_2CF_3$ | Cl | $CH_2OMe$ | O |
| D-4090 | Me(S) | single bond | H | c-Pr | $S(=O)_2CF_3$ | Cl | $CH_2OMe$ | O |
| D-4091 | H | $CH_2$ | Me | c-Pr | $S(=O)_2CF_3$ | Cl | $CH_2OMe$ | O |
| D-4092 | Me | $CH_2$ | H | c-Pr | $S(=O)_2CF_3$ | Cl | $CH_2OMe$ | O |
| D-4093 | H | CH(Me) | H | c-Pr | $S(=O)_2CF_3$ | Cl | $CH_2OMe$ | O |
| D-4094 | H | $CH_2CH_2$ | Me | c-Pr | $S(=O)_2CF_3$ | Cl | $CH_2OMe$ | O |
| D-4095 | Me | $CH_2CH_2$ | H | c-Pr | $S(=O)_2CF_3$ | Cl | $CH_2OMe$ | O |
| D-4096 | H | single bond | Me | c-Pr | $S(=O)_2CF_3$ | Me | $CH_2OMe$ | O |
| D-4097 | Me | single bond | H | c-Pr | $S(=O)_2CF_3$ | Me | $CH_2OMe$ | O |
| D-4098 | Me(R) | single bond | H | c-Pr | $S(=O)_2CF_3$ | Me | $CH_2OMe$ | O |
| D-4099 | Me(S) | single bond | H | c-Pr | $S(=O)_2CF_3$ | Me | $CH_2OMe$ | O |
| D-4100 | H | $CH_2$ | Me | c-Pr | $S(=O)_2CF_3$ | Me | $CH_2OMe$ | O |
| D-4101 | Me | $CH_2$ | H | c-Pr | $S(=O)_2CF_3$ | Me | $CH_2OMe$ | O |
| D-4102 | H | CH(Me) | H | c-Pr | $S(=O)_2CF_3$ | Me | $CH_2OMe$ | O |
| D-4103 | H | $CH_2CH_2$ | Me | c-Pr | $S(=O)_2CF_3$ | Me | $CH_2OMe$ | O |
| D-4104 | Me | $CH_2CH_2$ | H | c-Pr | $S(=O)_2CF_3$ | Me | $CH_2OMe$ | O |
| D-4105 | H | single bond | Me | c-Pr | $S(=O)_2CF_3$ | Cl | $CH_2CN$ | O |
| D-4106 | Me | single bond | H | c-Pr | $S(=O)_2CF_3$ | Cl | $CH_2CN$ | O |
| D-4107 | Me(R) | single bond | H | c-Pr | $S(=O)_2CF_3$ | Cl | $CH_2CN$ | O |
| D-4108 | Me(S) | single bond | H | c-Pr | $S(=O)_2CF_3$ | Cl | $CH_2CN$ | O |
| D-4109 | H | $CH_2$ | Me | c-Pr | $S(=O)_2CF_3$ | Cl | $CH_2CN$ | O |
| D-4110 | Me | $CH_2$ | H | c-Pr | $S(=O)_2CF_3$ | Cl | $CH_2CN$ | O |
| D-4111 | H | CH(Me) | H | c-Pr | $S(=O)_2CF_3$ | Cl | $CH_2CN$ | O |
| D-4112 | H | $CH_2CH_2$ | Me | c-Pr | $S(=O)_2CF_3$ | Cl | $CH_2CN$ | O |
| D-4113 | Me | $CH_2CH_2$ | H | c-Pr | $S(=O)_2CF_3$ | Cl | $CH_2CN$ | O |
| D-4114 | H | single bond | Me | c-Pr | $S(=O)_2CF_3$ | Me | $CH_2CN$ | O |
| D-4115 | Me | single bond | H | c-Pr | $S(=O)_2CF_3$ | Me | $CH_2CN$ | O |
| D-4116 | Me(R) | single bond | H | c-Pr | $S(=O)_2CF_3$ | Me | $CH_2CN$ | O |
| D-4117 | Me(S) | single bond | H | c-Pr | $S(=O)_2CF_3$ | Me | $CH_2CN$ | O |
| D-4118 | H | $CH_2$ | Me | c-Pr | $S(=O)_2CF_3$ | Me | $CH_2CN$ | O |
| D-4119 | Me | $CH_2$ | H | c-Pr | $S(=O)_2CF_3$ | Me | $CH_2CN$ | O |
| D-4120 | H | CH(Me) | H | c-Pr | $S(=O)_2CF_3$ | Me | $CH_2CN$ | O |
| D-4121 | H | $CH_2CH_2$ | Me | c-Pr | $S(=O)_2CF_3$ | Me | $CH_2CN$ | O |
| D-4122 | Me | $CH_2CH_2$ | H | c-Pr | $S(=O)_2CF_3$ | Me | $CH_2CN$ | O |
| D-4123 | H | single bond | Me | c-Pr | $S(=O)_2CF_3$ | Cl | C(=O)Me | O |
| D-4124 | Me | single bond | H | c-Pr | $S(=O)_2CF_3$ | Cl | C(=O)Me | O |
| D-4125 | Me(R) | single bond | H | c-Pr | $S(=O)_2CF_3$ | Cl | C(=O)Me | O |
| D-4126 | Me(S) | single bond | H | c-Pr | $S(=O)_2CF_3$ | Cl | C(=O)Me | O |
| D-4127 | H | $CH_2$ | Me | c-Pr | $S(=O)_2CF_3$ | Cl | C(=O)Me | O |
| D-4128 | Me | $CH_2$ | H | c-Pr | $S(=O)_2CF_3$ | Cl | C(=O)Me | O |
| D-4129 | H | CH(Me) | H | c-Pr | $S(=O)_2CF_3$ | Cl | C(=O)Me | O |
| D-4130 | H | $CH_2CH_2$ | Me | c-Pr | $S(=O)_2CF_3$ | Cl | C(=O)Me | O |

TABLE 739

| Compound Number | Y | W | Z | $R^1$ | $R^2$ | $R^3$ | $R^{10}$ | A |
|---|---|---|---|---|---|---|---|---|
| D-4131 | Me | $CH_2CH_2$ | H | c-Pr | $S(=O)_2CF_3$ | Cl | C(=O)Me | O |
| D-4132 | H | single bond | Me | c-Pr | $S(=O)_2CF_3$ | Me | C(=O)Me | O |
| D-4133 | Me | single bond | H | c-Pr | $S(=O)_2CF_3$ | Me | C(=O)Me | O |
| D-4134 | Me(R) | single bond | H | c-Pr | $S(=O)_2CF_3$ | Me | C(=O)Me | O |
| D-4135 | Me(S) | single bond | H | c-Pr | $S(=O)_2CF_3$ | Me | C(=O)Me | O |
| D-4136 | H | $CH_2$ | Me | c-Pr | $S(=O)_2CF_3$ | Me | C(=O)Me | O |
| D-4137 | Me | $CH_2$ | H | c-Pr | $S(=O)_2CF_3$ | Me | C(=O)Me | O |
| D-4138 | H | CH(Me) | H | c-Pr | $S(=O)_2CF_3$ | Me | C(=O)Me | O |
| D-4139 | H | $CH_2CH_2$ | Me | c-Pr | $S(=O)_2CF_3$ | Me | C(=O)Me | O |
| D-4140 | Me | $CH_2CH_2$ | H | c-Pr | $S(=O)_2CF_3$ | Me | C(=O)Me | O |
| D-4141 | H | single bond | Me | c-Pr | Me | Cl | H | O |
| D-4142 | Me | single bond | H | c-Pr | Me | Cl | H | O |

TABLE 739-continued

| Compound Number | Y | W | Z | $R^1$ | $R^2$ | $R^3$ | $R^{10}$ | A |
|---|---|---|---|---|---|---|---|---|
| D-4143 | Me(R) | single bond | H | c-Pr | Me | Cl | H | O |
| D-4144 | Me(S) | single bond | H | c-Pr | Me | Cl | H | O |
| D-4145 | H | $CH_2$ | Me | c-Pr | Me | Cl | H | O |
| D-4146 | Me | $CH_2$ | H | c-Pr | Me | Cl | H | O |
| D-4147 | H | CH(Me) | H | c-Pr | Me | Cl | H | O |
| D-4148 | H | $CH_2CH_2$ | Me | c-Pr | Me | Cl | H | O |
| D-4149 | Me | $CH_2CH_2$ | H | c-Pr | Me | Cl | H | O |
| D-4150 | H | single bond | Me | c-Pr | Me | Cl | H | O |
| D-4151 | Me | single bond | H | c-Pr | Me | Cl | H | O |
| D-4152 | Me(R) | single bond | H | c-Pr | Me | Cl | H | O |
| D-4153 | Me(S) | single bond | H | c-Pr | Me | Cl | H | O |
| D-4154 | H | $CH_2$ | Me | c-Pr | Me | Cl | H | O |
| D-4155 | Me | $CH_2$ | H | c-Pr | Me | Cl | H | O |
| D-4156 | H | CH(Me) | H | c-Pr | Me | Cl | H | O |
| D-4157 | H | $CH_2CH_2$ | Me | c-Pr | Me | Cl | H | O |
| D-4158 | Me | $CH_2CH_2$ | H | c-Pr | Me | Cl | H | O |
| D-4159 | H | single bond | Me | c-Pr | Me | Cl | H | O |
| D-4160 | Me | single bond | H | c-Pr | Me | Cl | H | O |
| D-4161 | Me(R) | single bond | H | c-Pr | Me | Cl | H | O |
| D-4162 | Me(S) | single bond | H | c-Pr | Me | Cl | H | O |
| D-4163 | H | $CH_2$ | Me | c-Pr | Me | Cl | H | O |
| D-4164 | Me | CH | H | c-Pr | Me | Cl | H | O |
| D-4165 | H | CH(Me) | H | c-Pr | Me | Cl | H | O |
| D-4166 | H | $CH_2CH_2$ | Me | c-Pr | Me | Cl | H | O |
| D-4167 | Me | $CH_2CH_2$ | H | c-Pr | Me | Cl | H | O |
| D-4168 | H | single bond | Me | c-Pr | Me | Cl | H | O |
| D-4169 | Me | single bond | H | c-Pr | Me | Cl | H | O |
| D-4170 | Me(R) | single bond | H | c-Pr | Me | Cl | H | O |
| D-4171 | Me(S) | single bond | H | c-Pr | Me | Cl | H | O |
| D-4172 | H | $CH_2$ | Me | c-Pr | Me | Cl | H | O |
| D-4173 | Me | $CH_2$ | H | c-Pr | Me | Cl | H | O |
| D-4174 | H | CH(Me) | H | c-Pr | Me | Cl | H | O |

TABLE 740

| Compound Number | Y | W | Z | $R^1$ | $R^2$ | $R^3$ | $R^{10}$ | A |
|---|---|---|---|---|---|---|---|---|
| D-4175 | H | $CH_2CH_2$ | Me | c-Pr | Me | Cl | H | O |
| D-4176 | Me | $CH_2CH_2$ | H | c-Pr | Me | Cl | H | O |
| D-4177 | H | single bond | Me | c-Pr | Me | Me | H | O |
| D-4178 | Me | single bond | H | c-Pr | Me | Me | H | O |
| D-4179 | Me(R) | single bond | H | c-Pr | Me | Me | H | O |
| D-4180 | Me(S) | single bond | H | c-Pr | Me | Me | H | O |
| D-4181 | H | $CH_2$ | Me | c-Pr | Me | Me | H | O |
| D-4182 | Me | $CH_2$ | H | c-Pr | Me | Me | H | O |
| D-4183 | H | CH(Me) | H | c-Pr | Me | Me | H | O |
| D-4184 | H | $CH_2CH_2$ | Me | c-Pr | Me | Me | H | O |
| D-4185 | Me | $CH_2CH_2$ | H | c-Pr | Me | Me | H | O |
| D-4186 | H | single bond | Me | c-Pr | Me | Me | H | O |
| D-4187 | Me | single bond | H | c-Pr | Me | Me | H | O |
| D-4188 | Me(R) | single bond | H | c-Pr | Me | Me | H | O |
| D-4189 | Me(S) | single bond | H | c-Pr | Me | Me | H | O |
| D-4190 | H | $CH_2$ | Me | c-Pr | Me | Me | H | O |
| D-4191 | Me | $CH_2$ | H | c-Pr | Me | Me | H | O |
| D-4192 | H | CH(Me) | H | c-Pr | Me | Me | H | O |
| D-4193 | H | $CH_2CH_2$ | Me | c-Pr | Me | Me | H | O |
| D-4194 | Me | $CH_2CH_2$ | H | c-Pr | Me | Me | H | O |
| D-4195 | H | single bond | Me | c-Pr | Me | Me | H | O |
| D-4196 | Me | single bond | H | c-Pr | Me | Me | H | O |
| D-4197 | Me(R) | single bond | H | c-Pr | Me | Me | H | O |
| D-4198 | Me(S) | single bond | H | c-Pr | Me | Me | H | O |
| D-4199 | H | $CH_2$ | Me | c-Pr | Me | Me | H | O |
| D-4200 | Me | $CH_2$ | H | c-Pr | Me | Me | H | O |
| D-4201 | H | CH(Me) | H | c-Pr | Me | Me | H | O |
| D-4202 | H | $CH_2CH_2$ | Me | c-Pr | Me | Me | H | O |
| D-4203 | Me | $CH_2CH_2$ | H | c-Pr | Me | Me | H | O |
| D-4204 | H | single bond | Me | c-Pr | Me | Me | H | O |
| D-4205 | Me | single bond | H | c-Pr | Me | Me | H | O |
| D-4206 | Me(R) | single bond | H | c-Pr | Me | Me | H | O |
| D-4207 | Me(S) | single bond | H | c-Pr | Me | Me | H | O |
| D-4208 | H | $CH_2$ | Me | c-Pr | Me | Me | H | O |
| D-4209 | Me | $CH_2$ | H | c-Pr | Me | Me | H | O |
| D-4210 | H | CH(Me) | H | c-Pr | Me | Me | H | O |

TABLE 740-continued

| Compound Number | Y | W | Z | $R^1$ | $R^2$ | $R^3$ | $R^{10}$ | A |
|---|---|---|---|---|---|---|---|---|
| D-4211 | H | $CH_2CH_2$ | Me | c-Pr | Me | Me | H | O |
| D-4212 | Me | $CH_2CH_2$ | H | c-Pr | Me | Me | H | O |
| D-4213 | H | single bond | Me | c-Pr | C(=O)Me | Cl | H | O |
| D-4214 | Me | single bond | H | c-Pr | C(=O)Me | Cl | H | O |
| D-4215 | Me(R) | single bond | H | c-Pr | C(=O)Me | Cl | H | O |
| D-4216 | Me(S) | single bond | H | c-Pr | C(=O)Me | Cl | H | O |
| D-4217 | H | $CH_2$ | Me | c-Pr | C(=O)Me | Cl | H | O |
| D-4218 | Me | $CH_2$ | H | c-Pr | C(=O)Me | Cl | H | O |

TABLE 741

| Compound Number | Y | W | Z | $R^1$ | $R^2$ | $R^3$ | $R^{10}$ | A |
|---|---|---|---|---|---|---|---|---|
| D-4219 | H | CH(Me) | H | c-Pr | C(=O)Me | Cl | H | O |
| D-4220 | H | $CH_2CH_2$ | Me | c-Pr | C(=O)Me | Cl | H | O |
| D-4221 | Me | $CH_2CH_2$ | H | c-Pr | C(=O)Me | Cl | H | O |
| D-4222 | H | single bond | Me | c-Pr | C(=O)Me | Cl | H | O |
| D-4223 | Me | single bond | H | c-Pr | C(=O)Me | Cl | H | O |
| D-4224 | Me(R) | single bond | H | c-Pr | C(=O)Me | Cl | H | O |
| D-4225 | Me(S) | single bond | H | c-Pr | C(=O)Me | Cl | H | O |
| D-4226 | H | $CH_2$ | Me | c-Pr | C(=O)Me | Cl | H | O |
| D-4227 | Me | $CH_2$ | H | c-Pr | C(=O)Me | Cl | H | O |
| D-4228 | H | CH(Me) | H | c-Pr | C(=O)Me | Cl | H | O |
| D-4229 | H | $CH_2CH_2$ | Me | c-Pr | C(=O)Me | Cl | H | O |
| D-4230 | Me | $CH_2CH_2$ | H | c-Pr | C(=O)Me | Cl | H | O |
| D-4231 | H | single bond | Me | c-Pr | C(=O)Me | Cl | H | O |
| D-4232 | Me | single bond | H | c-Pr | C(=O)Me | Cl | H | O |
| D-4233 | Me(R) | single bond | H | c-Pr | C(=O)Me | Cl | H | O |
| D-4234 | Me(S) | single bond | H | c-Pr | C(=O)Me | Cl | H | O |
| D-4235 | H | $CH_2$ | Me | c-Pr | C(=O)Me | Cl | H | O |
| D-4236 | Me | $CH_2$ | H | c-Pr | C(=O)Me | Cl | H | O |
| D-4237 | H | CH(Me) | H | c-Pr | C(=O)Me | Cl | H | O |
| D-4238 | H | $CH_2CH_2$ | Me | c-Pr | C(=O)Me | Cl | H | O |

TABLE 741-continued

| Compound Number | Y | W | Z | $R^1$ | $R^2$ | $R^3$ | $R^{10}$ | A |
|---|---|---|---|---|---|---|---|---|
| D-4239 | Me | $CH_2CH_2$ | H | c-Pr | C(═O)Me | Cl | H | O |
| D-4240 | H | single bond | Me | c-Pr | C(═O)Me | Cl | H | O |
| D-4241 | Me | single bond | H | c-Pr | C(═O)Me | Cl | H | O |
| D-4242 | Me(R) | single bond | H | c-Pr | C(═O)Me | Cl | H | O |
| D-4243 | Me(S) | single bond | H | c-Pr | C(═O)Me | Cl | H | O |
| D-4244 | H | $CH_2$ | Me | c-Pr | C(═O)Me | Cl | H | O |
| D-4245 | Me | $CH_2$ | H | c-Pr | C(═O)Me | Cl | H | O |
| D-4246 | H | CH(Me) | H | c-Pr | C(═O)Me | Cl | H | O |
| D-4247 | H | $CH_2CH_2$ | Me | c-Pr | C(═O)Me | Cl | H | O |
| D-4248 | Me | $CH_2CH_2$ | H | c-Pr | C(═O)Me | Cl | H | O |
| D-4249 | H | single bond | Me | c-Pr | C(═O)Me | Me | H | O |
| D-4250 | Me | single bond | H | c-Pr | C(═O)Me | Me | H | O |
| D-4251 | Me(R) | single bond | H | c-Pr | C(═O)Me | Me | H | O |
| D-4252 | Me(S) | single bond | H | c-Pr | C(═O)Me | Me | H | O |
| D-4253 | H | $CH_2$ | Me | c-Pr | C(═O)Me | Me | H | O |
| D-4254 | Me | $CH_2$ | H | c-Pr | C(═O)Me | Me | H | O |
| D-4255 | H | CH(Me) | H | c-Pr | C(═O)Me | Me | H | O |
| D-4256 | H | $CH_2CH_2$ | Me | c-Pr | C(═O)Me | Me | H | O |
| D-4257 | Me | $CH_2CH_2$ | H | c-Pr | C(═O)Me | Me | H | O |
| D-4258 | H | single bond | Me | c-Pr | C(═O)Me | Me | H | O |
| D-4259 | Me | single bond | H | c-Pr | C(═O)Me | Me | H | O |
| D-4260 | Me(R) | single bond | H | c-Pr | C(═O)Me | Me | H | O |
| D-4261 | Me(S) | single bond | H | c-Pr | C(═O)Me | Me | H | O |
| D-4262 | H | $CH_2$ | Me | c-Pr | C(═O)Me | Me | H | O |

TABLE 742

| Compound Number | Y | W | Z | $R^1$ | $R^2$ | $R^3$ | $R^{10}$ | A |
|---|---|---|---|---|---|---|---|---|
| D-4263 | Me | $CH_2$ | H | c-Pr | C(═O)Me | Me | H | O |
| D-4264 | H | CH(Me) | H | c-Pr | C(═O)Me | Me | H | O |
| D-4265 | H | $CH_2CH_2$ | Me | c-Pr | C(═O)Me | Me | H | O |
| D-4266 | Me | $CH_2CH_2$ | H | c-Pr | C(═O)Me | Me | H | O |
| D-4267 | H | single bond | Me | c-Pr | C(═O)Me | Me | H | O |
| D-4268 | Me | single bond | H | c-Pr | C(═O)Me | Me | H | O |
| D-4269 | Me(R) | single bond | H | c-Pr | C(═O)Me | Me | H | O |
| D-4270 | Me(S) | single bond | H | c-Pr | C(═O)Me | Me | H | O |
| D-4271 | H | $CH_2$ | Me | c-Pr | C(═O)Me | Me | H | O |
| D-4272 | Me | $CH_2$ | H | c-Pr | C(═O)Me | Me | H | O |
| D-4273 | H | CH(Me) | H | c-Pr | C(═O)Me | Me | H | O |
| D-4274 | H | $CH_2CH_2$ | Me | c-Pr | C(═O)Me | Me | H | O |
| D-4275 | Me | $CH_2CH_2$ | H | c-Pr | C(═O)Me | Me | H | O |
| D-4276 | H | single bond | Me | c-Pr | C(═O)Me | Me | H | O |
| D-4277 | Me | single bond | H | c-Pr | C(═O)Me | Me | H | O |
| D-4278 | Me(R) | single bond | H | c-Pr | C(═O)Me | Me | H | O |
| D-4279 | Me(S) | single bond | H | c-Pr | C(═O)Me | Me | H | O |
| D-4280 | H | $CH_2$ | Me | c-Pr | C(═O)Me | Me | H | O |
| D-4281 | Me | $CH_2$ | H | c-Pr | C(═O)Me | Me | H | O |
| D-4282 | H | CH(Me) | H | c-Pr | C(═O)Me | Me | H | O |
| D-4283 | H | $CH_2CH_2$ | Me | c-Pr | C(═O)Me | Me | H | O |
| D-4284 | Me | $CH_2CH_2$ | H | c-Pr | C(═O)Me | Me | H | O |
| D-4285 | H | single bond | Me | c-Pr | C(═O)(i-Pr) | Cl | H | O |
| D-4286 | Me | single bond | H | c-Pr | C(═O)(i-Pr) | Cl | H | O |
| D-4287 | Me(R) | single bond | H | c-Pr | C(═O)(i-Pr) | Cl | H | O |
| D-4288 | Me(S) | single bond | H | c-Pr | C(═O)(i-Pr) | Cl | H | O |
| D-4289 | H | $CH_2$ | Me | c-Pr | C(═O)(i-Pr) | Cl | H | O |
| D-4290 | Me | $CH_2$ | H | c-Pr | C(═O)(i-Pr) | Cl | H | O |
| D-4291 | H | CH(Me) | H | c-Pr | C(═O)(i-Pr) | Cl | H | O |
| D-4292 | H | $CH_2CH_2$ | Me | c-Pr | C(═O)(i-Pr) | Cl | H | O |
| D-4293 | Me | $CH_2CH_2$ | H | c-Pr | C(═O)(i-Pr) | Cl | H | O |
| D-4294 | H | single bond | Me | c-Pr | C(═O)(i-Pr) | Cl | H | O |
| D-4295 | Me | single bond | H | c-Pr | C(═O)(i-Pr) | Cl | H | O |
| D-4296 | Me(R) | single bond | H | c-Pr | C(═O)(i-Pr) | Cl | H | O |
| D-4297 | Me(S) | single bond | H | c-Pr | C(═O)(i-Pr) | Cl | H | O |
| D-4298 | H | $CH_2$ | Me | c-Pr | C(═O)(i-Pr) | Cl | H | O |
| D-4299 | Me | $CH_2$ | H | c-Pr | C(═O)(i-Pr) | Cl | H | O |
| D-4300 | H | CH(Me) | H | c-Pr | C(═O)(i-Pr) | Cl | H | O |
| D-4301 | H | $CH_2CH_2$ | Me | c-Pr | C(═O)(i-Pr) | Cl | H | O |
| D-4302 | Me | $CH_2CH_2$ | H | c-Pr | C(═O)(i-Pr) | Cl | H | O |
| D-4303 | H | single bond | Me | c-Pr | C(═O)(i-Pr) | Cl | H | O |
| D-4304 | Me | single bond | H | c-Pr | C(═O)(i-Pr) | Cl | H | O |

TABLE 742-continued

| Compound Number | Y | W | Z | $R^1$ | $R^2$ | $R^3$ | $R^{10}$ | A |
|---|---|---|---|---|---|---|---|---|
| D-4305 | Me(R) | single bond | H | c-Pr | C(═O)(i-Pr) | Cl | H | O |
| D-4306 | Me(S) | single bond | H | c-Pr | C(═O)(i-Pr) | Cl | H | O |

TABLE 743

| Compound Number | Y | W | Z | $R^1$ | $R^2$ | $R^3$ | $R^{10}$ | A |
|---|---|---|---|---|---|---|---|---|
| D-4307 | H | $CH_2$ | Me | c-Pr | C(═O)(i-Pr) | Cl | H | O |
| D-4308 | Me | $CH_2$ | H | c-Pr | C(═O)(i-Pr) | Cl | H | O |
| D-4309 | H | CH(Me) | H | c-Pr | C(═O)(i-Pr) | Cl | H | O |
| D-4310 | H | $CH_2CH_2$ | Me | c-Pr | C(═O)(i-Pr) | Cl | H | O |
| D-4311 | Me | $CH_2CH_2$ | H | c-Pr | C(═O)(i-Pr) | Cl | H | O |
| D-4312 | H | single bond | Me | c-Pr | C(═O)(i-Pr) | Cl | H | O |
| D-4313 | Me | single bond | H | c-Pr | C(═O)(i-Pr) | Cl | H | O |
| D-4314 | Me(R) | single bond | H | c-Pr | C(═O)(i-Pr) | Cl | H | O |
| D-4315 | Me(S) | single bond | H | c-Pr | C(═O)(i-Pr) | Cl | H | O |
| D-4316 | H | $CH_2$ | Me | c-Pr | C(═O)(i-Pr) | Cl | H | O |
| D-4317 | Me | $CH_2$ | H | c-Pr | C(═O)(i-Pr) | Cl | H | O |
| D-4318 | H | CH(Me) | H | c-Pr | C(═O)(i-Pr) | Cl | H | O |
| D-4319 | H | $CH_2CH_2$ | Me | c-Pr | C(═O)(i-Pr) | Cl | H | O |
| D-4320 | Me | $CH_2CH_2$ | H | c-Pr | C(═O)(i-Pr) | Cl | H | O |
| D-4321 | H | single bond | Me | c-Pr | C(═O)(i-Pr) | Me | H | O |
| D-4322 | Me | single bond | H | c-Pr | C(═O)(i-Pr) | Me | H | O |
| D-4323 | Me(R) | single bond | H | c-Pr | C(═O)(i-Pr) | Me | H | O |
| D-4324 | Me(S) | single bond | H | c-Pr | C(═O)(i-Pr) | Me | H | O |
| D-4325 | H | $CH_2$ | Me | c-Pr | C(═O)(i-Pr) | Me | H | O |
| D-4326 | Me | $CH_2$ | H | c-Pr | C(═O)(i-Pr) | Me | H | O |
| D-4327 | H | CH(Me) | H | c-Pr | C(═O)(i-Pr) | Me | H | O |
| D-4328 | H | $CH_2CH_2$ | Me | c-Pr | C(═O)(i-Pr) | Me | H | O |
| D-4329 | Me | $CH_2CH_2$ | H | c-Pr | C(═O)(i-Pr) | Me | H | O |
| D-4330 | H | single bond | Me | c-Pr | C(═O)(i-Pr) | Me | H | O |
| D-4331 | Me | single bond | H | c-Pr | C(═O)(i-Pr) | Me | H | O |
| D-4332 | Me(R) | single bond | H | c-Pr | C(═O)(i-Pr) | Me | H | O |
| D-4333 | Me(S) | single bond | H | c-Pr | C(═O)(i-Pr) | Me | H | O |
| D-4334 | H | $CH_2$ | Me | c-Pr | C(═O)(i-Pr) | Me | H | O |
| D-4335 | Me | $CH_2$ | H | c-Pr | C(═O)(i-Pr) | Me | H | O |
| D-4336 | H | CH(Me) | H | c-Pr | C(═O)(i-Pr) | Me | H | O |
| D-4337 | H | $CH_2CH_2$ | Me | c-Pr | C(═O)(i-Pr) | Me | H | O |
| D-4338 | Me | $CH_2CH_2$ | H | c-Pr | C(═O)(i-Pr) | Me | H | O |
| D-4339 | H | single bond | Me | c-Pr | C(═O)(i-Pr) | Me | H | O |
| D-4340 | Me | single bond | H | c-Pr | C(═O)(i-Pr) | Me | H | O |
| D-4341 | Me(R) | single bond | H | c-Pr | C(═O)(i-Pr) | Me | H | O |
| D-4342 | Me(S) | single bond | H | c-Pr | C(═O)(i-Pr) | Me | H | O |
| D-4343 | H | $CH_2$ | Me | c-Pr | C(═O)(i-Pr) | Me | H | O |
| D-4344 | Me | $CH_2$ | H | c-Pr | C(═O)(i-Pr) | Me | H | O |
| D-4345 | H | CH(Me) | H | c-Pr | C(═O)(i-Pr) | Me | H | O |
| D-4346 | H | $CH_2CH_2$ | Me | c-Pr | C(═O)(i-Pr) | Me | H | O |
| D-4347 | Me | $CH_2CH_2$ | H | c-Pr | C(═O)(i-Pr) | Me | H | O |
| D-4348 | H | single bond | Me | c-Pr | C(═O)(i-Pr) | Me | H | O |
| D-4349 | Me | single bond | H | c-Pr | C(═O)(i-Pr) | Me | H | O |
| D-4350 | Me(R) | single bond | H | c-Pr | C(═O)(i-Pr) | Me | H | O |

TABLE 744

| Compound Number | Y | W | Z | $R^1$ | $R^2$ | $R^3$ | $R^{10}$ | A |
|---|---|---|---|---|---|---|---|---|
| D-4351 | Me(S) | single bond | H | c-Pr | C(═O)(i-Pr) | Me | H | O |
| D-4352 | H | $CH_2$ | Me | c-Pr | C(═O)(i-Pr) | Me | H | O |
| D-4353 | Me | $CH_2$ | H | c-Pr | C(═O)(i-Pr) | Me | H | O |
| D-4354 | H | CH(Me) | H | c-Pr | C(═O)(i-Pr) | Me | H | O |
| D-4355 | H | $CH_2CH_2$ | Me | c-Pr | C(═O)(i-Pr) | Me | H | O |
| D-4356 | Me | $CH_2CH_2$ | H | c-Pr | C(═O)(i-Pr) | Me | H | O |
| D-4357 | H | single bond | Me | c-Pr | H | Br | H | O |
| D-4358 | Me | single bond | H | c-Pr | H | Br | H | O |
| D-4359 | Me(R) | single bond | H | c-Pr | H | Br | H | O |
| D-4360 | Me(S) | single bond | H | c-Pr | H | Br | H | O |
| D-4361 | H | $CH_2$ | Me | c-Pr | H | Br | H | O |
| D-4362 | Me | $CH_2$ | H | c-Pr | H | Br | H | O |
| D-4363 | H | CH(Me) | H | c-Pr | H | Br | H | O |
| D-4364 | H | $CH_2CH_2$ | Me | c-Pr | H | Br | H | O |
| D-4365 | Me | $CH_2CH_2$ | H | c-Pr | H | Br | H | O |

TABLE 744-continued

| Compound Number | Y | W | Z | $R^1$ | $R^2$ | $R^3$ | $R^{10}$ | A |
|---|---|---|---|---|---|---|---|---|
| D-4366 | H | single bond | Me | c-Pr | H | Br | H | O |
| D-4367 | Me | single bond | H | c-Pr | H | Br | H | O |
| D-4368 | Me(R) | single bond | H | c-Pr | H | Br | H | O |
| D-4369 | Me(S) | single bond | H | c-Pr | H | Br | H | O |
| D-4370 | H | $CH_2$ | Me | c-Pr | H | Br | H | O |
| D-4371 | Me | $CH_2$ | H | c-Pr | H | Br | H | O |
| D-4372 | H | CH(Me) | H | c-Pr | H | Br | H | O |
| D-4373 | H | $CH_2CH_2$ | Me | c-Pr | H | Br | H | O |
| D-4374 | Me | $CH_2CH_2$ | H | c-Pr | H | Br | H | O |
| D-4375 | H | single bond | Me | c-Pr | H | Br | H | O |
| D-4376 | Me | single bond | H | c-Pr | H | Br | H | O |
| D-4377 | Me(R) | single bond | H | c-Pr | H | Br | H | O |
| D-4378 | Me(S) | single bond | H | c-Pr | H | Br | H | O |
| D-4379 | H | $CH_2$ | Me | c-Pr | H | Br | H | O |
| D-4380 | Me | $CH_2$ | H | c-Pr | H | Br | H | O |
| D-4381 | H | CH(Me) | H | c-Pr | H | Br | H | O |
| D-4382 | H | $CH_2CH_2$ | Me | c-Pr | H | Br | H | O |
| D-4383 | Me | $CH_2CH_2$ | H | c-Pr | H | Br | H | O |
| D-4384 | H | single bond | Me | c-Pr | H | Br | H | O |
| D-4385 | Me | single bond | H | c-Pr | H | Br | H | O |
| D-4386 | Me(R) | single bond | H | c-Pr | H | Br | H | O |
| D-4387 | Me(S) | single bond | H | c-Pr | H | Br | H | O |
| D-4388 | H | $CH_2$ | Me | c-Pr | H | Br | H | O |
| D-4389 | Me | $CH_2$ | H | c-Pr | H | Br | H | O |
| D-4390 | H | CH(Me) | H | c-Pr | H | Br | H | O |
| D-4391 | H | $CH_2CH_2$ | Me | c-Pr | H | Br | H | O |
| D-4392 | Me | $CH_2CH_2$ | H | c-Pr | H | Br | H | O |
| D-4393 | H | single bond | Me | c-Pr | H | $CF_3$ | H | O |
| D-4394 | Me | single bond | H | c-Pr | H | $CF_3$ | H | O |

TABLE 745

| Compound Number | Y | W | Z | $R^1$ | $R^2$ | $R^3$ | $R^{10}$ | A |
|---|---|---|---|---|---|---|---|---|
| D-4395 | Me(R) | single bond | H | c-Pr | H | $CF_3$ | H | O |
| D-4396 | Me(S) | single bond | H | c-Pr | H | $CF_3$ | H | O |
| D-4397 | H | $CH_2$ | Me | c-Pr | H | $CF_3$ | H | O |
| D-4398 | Me | $CH_2$ | H | c-Pr | H | $CF_3$ | H | O |
| D-4399 | H | CH(Me) | H | c-Pr | H | $CF_3$ | H | O |
| D-4400 | H | $CH_2CH_2$ | Me | c-Pr | H | $CF_3$ | H | O |
| D-4401 | Me | $CH_2CH_2$ | H | c-Pr | H | $CF_3$ | H | O |
| D-4402 | H | single bond | Me | c-Pr | H | $CF_3$ | H | O |
| D-4403 | Me | single bond | H | c-Pr | H | $CF_3$ | H | O |
| D-4404 | Me(R) | single bond | H | c-Pr | H | $CF_3$ | H | O |
| D-4405 | Me(S) | single bond | H | c-Pr | H | $CF_3$ | H | O |
| D-4406 | H | $CH_2$ | Me | c-Pr | H | $CF_3$ | H | O |
| D-4407 | Me | $CH_2$ | H | c-Pr | H | $CF_3$ | H | O |
| D-4408 | H | CH(Me) | H | c-Pr | H | $CF_3$ | H | O |
| D-4409 | H | $CH_2CH_2$ | Me | c-Pr | H | $CF_3$ | H | O |
| D-4410 | Me | $CH_2CH_2$ | H | c-Pr | H | $CF_3$ | H | O |
| D-4411 | H | single bond | Me | c-Pr | H | $CF_3$ | H | O |
| D-4412 | Me | single bond | H | c-Pr | H | $CF_3$ | H | O |
| D-4413 | Me(R) | single bond | H | c-Pr | H | $CF_3$ | H | O |
| D-4414 | Me(S) | single bond | H | c-Pr | H | $CF_3$ | H | O |
| D-4415 | H | $CH_2$ | Me | c-Pr | H | $CF_3$ | H | O |
| D-4416 | Me | $CH_2$ | H | c-Pr | H | $CF_3$ | H | O |
| D-4417 | H | CH(Me) | H | c-Pr | H | $CF_3$ | H | O |
| D-4418 | H | $CH_2CH_2$ | Me | c-Pr | H | $CF_3$ | H | O |
| D-4419 | Me | $CH_2CH_2$ | H | c-Pr | H | $CF_3$ | H | O |
| D-4420 | H | single bond | Me | c-Pr | H | $CF_3$ | H | O |
| D-4421 | Me | single bond | H | c-Pr | H | $CF_3$ | H | O |
| D-4422 | Me(R) | single bond | H | c-Pr | H | $CF_3$ | H | O |
| D-4423 | Me(S) | single bond | H | c-Pr | H | $CF_3$ | H | O |
| D-4424 | H | $CH_2$ | Me | c-Pr | H | $CF_3$ | H | O |
| D-4425 | Me | $CH_2$ | H | c-Pr | H | $CF_3$ | H | O |
| D-4426 | H | CH(Me) | H | c-Pr | H | $CF_3$ | H | O |
| D-4427 | H | $CH_2CH_2$ | Me | c-Pr | H | $CF_3$ | H | O |
| D-4428 | Me | $CH_2CH_2$ | H | c-Pr | H | $CF_3$ | H | O |
| D-4429 | H | single bond | Me | c-Pr | H | OMe | H | O |
| D-4430 | Me | single bond | H | c-Pr | H | OMe | H | O |
| D-4431 | Me(R) | single bond | H | c-Pr | H | OMe | H | O |
| D-4432 | Me(S) | single bond | H | c-Pr | H | OMe | H | O |

TABLE 745-continued

| Compound Number | Y | W | Z | $R^1$ | $R^2$ | $R^3$ | $R^{10}$ | A |
|---|---|---|---|---|---|---|---|---|
| D-4433 | H | $CH_2$ | Me | c-Pr | H | OMe | H | O |
| D-4434 | Me | $CH_2$ | H | c-Pr | H | OMe | H | O |
| D-4435 | H | CH(Me) | H | c-Pr | H | OMe | H | O |
| D-4436 | H | $CH_2CH_2$ | Me | c-Pr | H | OMe | H | O |
| D-4437 | Me | $CH_2CH_2$ | H | c-Pr | H | OMe | H | O |
| D-4438 | H | single bond | Me | c-Pr | H | OMe | H | O |

TABLE 746

| Compound Number | Y | W | Z | $R^1$ | $R^2$ | $R^3$ | $R^{10}$ | A |
|---|---|---|---|---|---|---|---|---|
| D-4439 | Me | single bond | H | c-Pr | H | OMe | H | O |
| D-4440 | Me(R) | single bond | H | c-Pr | H | OMe | H | O |
| D-4441 | Me(S) | single bond | H | c-Pr | H | OMe | H | O |
| D-4442 | H | $CH_2$ | Me | c-Pr | H | OMe | H | O |
| D-4443 | Me | $CH_2$ | H | c-Pr | H | OMe | H | O |
| D-4444 | H | CH(Me) | H | c-Pr | H | OMe | H | O |
| D-4445 | H | $CH_2CH_2$ | Me | c-Pr | H | OMe | H | O |
| D-4446 | Me | $CH_2CH_2$ | H | c-Pr | H | OMe | H | O |
| D-4447 | H | single bond | Me | c-Pr | H | OMe | H | O |
| D-4448 | Me | single bond | H | c-Pr | H | OMe | H | O |
| D-4449 | Me(R) | single bond | H | c-Pr | H | OMe | H | O |
| D-4450 | Me(S) | single bond | H | c-Pr | H | OMe | H | O |
| D-4451 | H | $CH_2$ | Me | c-Pr | H | OMe | H | O |
| D-4452 | Me | $CH_2$ | H | c-Pr | H | OMe | H | O |
| D-4453 | H | CH(Me) | H | c-Pr | H | OMe | H | O |
| D-4454 | H | $CH_2CH_2$ | Me | c-Pr | H | OMe | H | O |
| D-4455 | Me | $CH_2CH_2$ | H | c-Pr | H | OMe | H | O |
| D-4456 | H | single bond | Me | c-Pr | H | OMe | H | O |
| D-4457 | Me | single bond | H | c-Pr | H | OMe | H | O |
| D-4458 | Me(R) | single bond | H | c-Pr | H | OMe | H | O |
| D-4459 | Me(S) | single bond | H | c-Pr | H | OMe | H | O |
| D-4460 | H | $CH_2$ | Me | c-Pr | H | OMe | H | O |
| D-4461 | Me | $CH_2$ | H | c-Pr | H | OMe | H | O |
| D-4462 | H | CH(Me) | H | c-Pr | H | OMe | H | O |
| D-4463 | H | $CH_2CH_2$ | Me | c-Pr | H | OMe | H | O |
| D-4464 | Me | $CH_2CH_2$ | H | c-Pr | H | OMe | H | O |
| D-4465 | H | single bond | Me | c-Pr | H | $OCF_3$ | H | O |
| D-4466 | Me | single bond | H | c-Pr | H | $OCF_3$ | H | O |
| D-4467 | Me(R) | single bond | H | c-Pr | H | $OCF_3$ | H | O |
| D-4468 | Me(S) | single bond | H | c-Pr | H | $OCF_3$ | H | O |
| D-4469 | H | $CH_2$ | Me | c-Pr | H | $OCF_3$ | H | O |
| D-4470 | Me | $CH_2$ | H | c-Pr | H | $OCF_3$ | H | O |
| D-4471 | H | CH(Me) | H | c-Pr | H | $OCF_3$ | H | O |
| D-4472 | H | $CH_2CH_2$ | Me | c-Pr | H | $OCF_3$ | H | O |
| D-4473 | Me | $CH_2CH_2$ | H | c-Pr | H | $OCF_3$ | H | O |
| D-4474 | H | single bond | Me | c-Pr | H | $OCF_3$ | H | O |
| D-4475 | Me | single bond | H | c-Pr | H | $OCF_3$ | H | O |
| D-4476 | Me(R) | single bond | H | c-Pr | H | $OCF_3$ | H | O |
| D-4477 | Me(S) | single bond | H | c-Pr | H | $OCF_3$ | H | O |
| D-4478 | H | $CH_2$ | Me | c-Pr | H | $OCF_3$ | H | O |
| D-4479 | Me | $CH_2$ | H | c-Pr | H | $OCF_3$ | H | O |
| D-4480 | H | CH(Me) | H | c-Pr | H | $OCF_3$ | H | O |
| D-4481 | H | $CH_2CH_2$ | Me | c-Pr | H | $OCF_3$ | H | O |
| D-4482 | Me | $CH_2CH_2$ | H | c-Pr | H | $OCF_3$ | H | O |

TABLE 747

| Compound Number | Y | W | Z | $R^1$ | $R^2$ | $R^3$ | $R^{10}$ | A |
|---|---|---|---|---|---|---|---|---|
| D-4483 | H | single bond | Me | c-Pr | H | $OCF_3$ | H | O |
| D-4484 | Me | single bond | H | c-Pr | H | $OCF_3$ | H | O |
| D-4485 | Me(R) | single bond | H | c-Pr | H | $OCF_3$ | H | O |
| D-4486 | Me(S) | single bond | H | c-Pr | H | $OCF_3$ | H | O |
| D-4487 | H | $CH_2$ | Me | c-Pr | H | $OCF_3$ | H | O |
| D-4488 | Me | $CH_2$ | H | c-Pr | H | $OCF_3$ | H | O |
| D-4489 | H | CH(Me) | H | c-Pr | H | $OCF_3$ | H | O |
| D-4490 | H | $CH_2CH_2$ | Me | c-Pr | H | $OCF_3$ | H | O |
| D-4491 | Me | $CH_2CH_2$ | H | c-Pr | H | $OCF_3$ | H | O |
| D-4492 | H | single bond | Me | c-Pr | H | $OCF_3$ | H | O |

TABLE 747-continued

| Compound Number | Y | W | Z | $R^1$ | $R^2$ | $R^3$ | $R^{10}$ | A |
|---|---|---|---|---|---|---|---|---|
| D-4493 | Me | single bond | H | c-Pr | H | $OCF_3$ | H | O |
| D-4494 | Me(R) | single bond | H | c-Pr | H | $OCF_3$ | H | O |
| D-4495 | Me(S) | single bond | H | c-Pr | H | $OCF_3$ | H | O |
| D-4496 | H | $CH_2$ | Me | c-Pr | H | $OCF_3$ | H | O |
| D-4497 | Me | $CH_2$ | H | c-Pr | H | $OCF_3$ | H | O |
| D-4498 | H | CH(Me) | H | c-Pr | H | $OCF_3$ | H | O |
| D-4499 | H | $CH_2CH_2$ | Me | c-Pr | H | $OCF_3$ | H | O |
| D-4500 | Me | $CH_2CH_2$ | H | c-Pr | H | $OCF_3$ | H | O |
| D-4501 | H | single bond | Me | c-Pr | H | Br | Me | O |
| D-4502 | Me | single bond | H | c-Pr | H | Br | Me | O |
| D-4503 | Me(R) | single bond | H | c-Pr | H | Br | Me | O |
| D-4504 | Me(S) | single bond | H | c-Pr | H | Br | Me | O |
| D-4505 | H | $CH_2$ | Me | c-Pr | H | Br | Me | O |
| D-4506 | Me | $CH_2$ | H | c-Pr | H | Br | Me | O |
| D-4507 | H | CH(Me) | H | c-Pr | H | Br | Me | O |
| D-4508 | H | $CH_2CH_2$ | Me | c-Pr | H | Br | Me | O |
| D-4509 | Me | $CH_2CH_2$ | H | c-Pr | H | Br | Me | O |
| D-4510 | H | single bond | Me | c-Pr | H | Br | Me | O |
| D-4511 | Me | single bond | H | c-Pr | H | Br | Me | O |
| D-4512 | Me(R) | single bond | H | c-Pr | H | Br | Me | O |
| D-4513 | Me(S) | single bond | H | c-Pr | H | Br | Me | O |
| D-4514 | H | $CH_2$ | Me | c-Pr | H | Br | Me | O |
| D-4515 | Me | $CH_2$ | H | c-Pr | H | Br | Me | O |
| D-4516 | H | CH(Me) | H | c-Pr | H | Br | Me | O |
| D-4517 | H | $CH_2CH_2$ | Me | c-Pr | H | Br | Me | O |
| D-4518 | Me | $CH_2CH_2$ | H | c-Pr | H | Br | Me | O |
| D-4519 | H | single bond | Me | c-Pr | H | Br | Me | O |
| D-4520 | Me | single bond | H | c-Pr | H | Br | Me | O |
| D-4521 | Me(R) | single bond | H | c-Pr | H | Br | Me | O |
| D-4522 | Me(S) | single bond | H | c-Pr | H | Br | Me | O |
| D-4523 | H | $CH_2$ | Me | c-Pr | H | Br | Me | O |
| D-4524 | Me | $CH_2$ | H | c-Pr | H | Br | Me | O |
| D-4525 | H | CH(Me) | H | c-Pr | H | Br | Me | O |
| D-4526 | H | $CH_2CH_2$ | Me | c-Pr | H | Br | Me | O |

TABLE 748

| Compound Number | Y | W | Z | $R^1$ | $R^2$ | $R^3$ | $R^{10}$ | A |
|---|---|---|---|---|---|---|---|---|
| D-4527 | Me | $CH_2CH_2$ | H | c-Pr | H | Br | Me | O |
| D-4528 | H | single bond | Me | c-Pr | H | Br | Me | O |
| D-4529 | Me | single bond | H | c-Pr | H | Br | Me | O |
| D-4530 | Me(R) | single bond | H | c-Pr | H | Br | Me | O |
| D-4531 | Me(S) | single bond | H | c-Pr | H | Br | Me | O |
| D-4532 | H | $CH_2$ | Me | c-Pr | H | Br | Me | O |
| D-4533 | Me | $CH_2$ | H | c-Pr | H | Br | Me | O |
| D-4534 | H | CH(Me) | H | c-Pr | H | Br | Me | O |
| D-4535 | H | $CH_2CH_2$ | Me | c-Pr | H | Br | Me | O |
| D-4536 | Me | $CH_2CH_2$ | H | c-Pr | H | Br | Me | O |
| D-4537 | H | single bond | Me | c-Pr | H | $CF_3$ | Me | O |
| D-4538 | Me | single bond | H | c-Pr | H | $CF_3$ | Me | O |
| D-4539 | Me(R) | single bond | H | c-Pr | H | $CF_3$ | Me | O |
| D-4540 | Me(S) | single bond | H | c-Pr | H | $CF_3$ | Me | O |
| D-4541 | H | $CH_2$ | Me | c-Pr | H | $CF_3$ | Me | O |
| D-4542 | Me | $CH_2$ | H | c-Pr | H | $CF_3$ | Me | O |
| D-4543 | H | CH(Me) | H | c-Pr | H | $CF_3$ | Me | O |
| D-4544 | H | $CH_2CH_2$ | Me | c-Pr | H | $CF_3$ | Me | O |
| D-4545 | Me | $CH_2CH_2$ | H | c-Pr | H | $CF_3$ | Me | O |
| D-4546 | H | single bond | Me | c-Pr | H | $CF_3$ | Me | O |
| D-4547 | Me | single bond | H | c-Pr | H | $CF_3$ | Me | O |
| D-4548 | Me(R) | single bond | H | c-Pr | H | $CF_3$ | Me | O |
| D-4549 | Me(S) | single bond | H | c-Pr | H | $CF_3$ | Me | O |
| D-4550 | H | $CH_2$ | Me | c-Pr | H | $CF_3$ | Me | O |
| D-4551 | Me | $CH_2$ | H | c-Pr | H | $CF_3$ | Me | O |
| D-4552 | H | CH(Me) | H | c-Pr | H | $CF_3$ | Me | O |
| D-4553 | H | $CH_2CH_2$ | Me | c-Pr | H | $CF_3$ | Me | O |
| D-4554 | Me | $CH_2CH_2$ | H | c-Pr | H | $CF_3$ | Me | O |
| D-4555 | H | single bond | Me | c-Pr | H | $CF_3$ | Me | O |
| D-4556 | Me | single bond | H | c-Pr | H | $CF_3$ | Me | O |
| D-4557 | Me(R) | single bond | H | c-Pr | H | CF | Me | O |
| D-4558 | Me(S) | single bond | H | c-Pr | H | $CF_3$ | Me | O |
| D-4559 | H | $CH_2$ | Me | c-Pr | H | $CF_3$ | Me | O |
| D-4560 | Me | $CH_2$ | H | c-Pr | H | $CF_3$ | Me | O |

TABLE 748-continued

| Compound Number | Y | W | Z | $R^1$ | $R^2$ | $R^3$ | $R^{10}$ | A |
|---|---|---|---|---|---|---|---|---|
| D-4561 | H | CH(Me) | H | c-Pr | H | $CF_3$ | Me | O |
| D-4562 | H | $CH_2CH_2$ | Me | c-Pr | H | $CF_3$ | Me | O |
| D-4563 | Me | $CH_2CH_2$ | H | c-Pr | H | $CF_3$ | Me | O |
| D-4564 | H | single bond | Me | c-Pr | H | $CF_3$ | Me | O |
| D-4565 | Me | single bond | H | c-Pr | H | $CF_3$ | Me | O |
| D-4566 | Me(R) | single bond | H | c-Pr | H | $CF_3$ | Me | O |
| D-4567 | Me(S) | single bond | H | c-Pr | H | $CF_3$ | Me | O |
| D-4568 | H | $CH_2$ | Me | c-Pr | H | $CF_3$ | Me | O |
| D-4569 | Me | $CH_2$ | H | c-Pr | H | $CF_3$ | Me | O |
| D-4570 | H | CH(Me) | H | c-Pr | H | $CF_3$ | Me | O |

TABLE 749

| Compound Number | Y | W | Z | $R^1$ | $R^2$ | $R^3$ | $R^{10}$ | A |
|---|---|---|---|---|---|---|---|---|
| D-4571 | H | $CH_2CH_2$ | Me | c-Pr | H | $CF_3$ | Me | O |
| D-4572 | Me | $CH_2CH_2$ | H | c-Pr | H | $CF_3$ | Me | O |
| D-4573 | H | single bond | Me | c-Pr | H | OMe | Me | O |
| D-4574 | Me | single bond | H | c-Pr | H | OMe | Me | O |
| D-4575 | Me(R) | single bond | H | c-Pr | H | OMe | Me | O |
| D-4576 | Me(S) | single bond | H | c-Pr | H | OMe | Me | O |
| D-4577 | H | $CH_2$ | Me | c-Pr | H | OMe | Me | O |
| D-4578 | Me | $CH_2$ | H | c-Pr | H | OMe | Me | O |
| D-4579 | H | CH(Me) | H | c-Pr | H | OMe | Me | O |
| D-4580 | H | $CH_2CH_2$ | Me | c-Pr | H | OMe | Me | O |
| D-4581 | Me | $CH_2CH_2$ | H | c-Pr | H | OMe | Me | O |
| D-4582 | H | single bond | Me | c-Pr | H | OMe | Me | O |
| D-4583 | Me | single bond | H | c-Pr | H | OMe | Me | O |
| D-4584 | Me(R) | single bond | H | c-Pr | H | OMe | Me | O |
| D-4585 | Me(S) | single bond | H | c-Pr | H | OMe | Me | O |
| D-4586 | H | $CH_2$ | Me | c-Pr | H | OMe | Me | O |
| D-4587 | Me | $CH_2$ | H | c-Pr | H | OMe | Me | O |
| D-4588 | H | CH(Me) | H | c-Pr | H | OMe | Me | O |
| D-4589 | H | $CH_2CH_2$ | Me | c-Pr | H | OMe | Me | O |
| D-4590 | Me | $CH_2CH_2$ | H | c-Pr | H | OMe | Me | O |
| D-4591 | H | single bond | Me | c-Pr | H | OMe | Me | O |
| D-4592 | Me | single bond | H | c-Pr | H | OMe | Me | O |
| D-4593 | Me(R) | single bond | H | c-Pr | H | OMe | Me | O |
| D-4594 | Me(S) | single bond | H | c-Pr | H | OMe | Me | O |
| D-4595 | H | $CH_2$ | Me | c-Pr | H | OMe | Me | O |
| D-4596 | Me | $CH_2$ | H | c-Pr | H | OMe | Me | O |
| D-4597 | H | CH(Me) | H | c-Pr | H | OMe | Me | O |
| D-4598 | H | $CH_2CH_2$ | Me | c-Pr | H | OMe | Me | O |
| D-4599 | Me | $CH_2CH_2$ | H | c-Pr | H | OMe | Me | O |
| D-4600 | H | single bond | Me | c-Pr | H | OMe | Me | O |
| D-4601 | Me | single bond | H | c-Pr | H | OMe | Me | O |
| D-4602 | Me(R) | single bond | H | c-Pr | H | OMe | Me | O |
| D-4603 | Me(S) | single bond | H | c-Pr | H | OMe | Me | O |
| D-4604 | H | $CH_2$ | Me | c-Pr | H | OMe | Me | O |
| D-4605 | Me | $CH_2$ | H | c-Pr | H | OMe | Me | O |
| D-4606 | H | CH(Me) | H | c-Pr | H | OMe | Me | O |
| D-4607 | H | $CH_2CH_2$ | Me | c-Pr | H | OMe | Me | O |
| D-4608 | Me | $CH_2CH_2$ | H | c-Pr | H | OMe | Me | O |
| D-4609 | H | single bond | Me | c-Pr | H | $OCF_3$ | Me | O |
| D-4610 | Me | single bond | H | c-Pr | H | $OCF_3$ | Me | O |
| D-4611 | Me(R) | single bond | H | c-Pr | H | $OCF_3$ | Me | O |
| D-4612 | Me(S) | single bond | H | c-Pr | H | $OCF_3$ | Me | O |
| D-4613 | H | $CH_2$ | Me | c-Pr | H | $OCF_3$ | Me | O |
| D-4614 | Me | $CH_2$ | H | c-Pr | H | $OCF_3$ | Me | O |

TABLE 750

| Compound Number | Y | W | Z | $R^1$ | $R^2$ | $R^3$ | $R^{10}$ | A |
|---|---|---|---|---|---|---|---|---|
| D-4615 | H | CH(Me) | H | c-Pr | H | $OCF_3$ | Me | O |
| D-4616 | H | $CH_2CH_2$ | Me | c-Pr | H | $OCF_3$ | Me | O |
| D-4617 | Me | $CH_2CH_2$ | H | c-Pr | H | $OCF_3$ | Me | O |
| D-4618 | H | single bond | Me | c-Pr | H | $OCF_3$ | Me | O |
| D-4619 | Me | single bond | H | c-Pr | H | $OCF_3$ | Me | O |
| D-4620 | Me(R) | single bond | H | c-Pr | H | $OCF_3$ | Me | O |

TABLE 750-continued

| Compound Number | Y | W | Z | $R^1$ | $R^2$ | $R^3$ | $R^{10}$ | A |
|---|---|---|---|---|---|---|---|---|
| D-4621 | Me(S) | single bond | H | c-Pr | H | $OCF_3$ | Me | O |
| D-4622 | H | $CH_2$ | Me | c-Pr | H | $OCF_3$ | Me | O |
| D-4623 | Me | $CH_2$ | H | c-Pr | H | $OCF_3$ | Me | O |
| D-4624 | H | CH(Me) | H | c-Pr | H | $OCF_3$ | Me | O |
| D-4625 | H | $CH_2CH_2$ | Me | c-Pr | H | $OCF_3$ | Me | O |
| D-4626 | Me | $CH_2CH_2$ | H | c-Pr | H | $OCF_3$ | Me | O |
| D-4627 | H | single bond | Me | c-Pr | H | $OCF_3$ | Me | O |
| D-4628 | Me | single bond | H | c-Pr | H | $OCF_3$ | Me | O |
| D-4629 | Me(R) | single bond | H | c-Pr | H | $OCF_3$ | Me | O |
| D-4630 | Me(S) | single bond | H | c-Pr | H | $OCF_3$ | Me | O |
| D-4631 | H | $CH_2$ | Me | c-Pr | H | $OCF_3$ | Me | O |
| D-4632 | Me | $CH_2$ | H | c-Pr | H | $OCF_3$ | Me | O |
| D-4633 | H | CH(Me) | H | c-Pr | H | $OCF_3$ | Me | O |
| D-4634 | H | $CH_2CH_2$ | Me | c-Pr | H | $OCF_3$ | Me | O |
| D-4635 | Me | $CH_2CH_2$ | H | c-Pr | H | $OCF_3$ | Me | O |
| D-4636 | H | single bond | Me | c-Pr | H | $OCF_3$ | Me | O |
| D-4637 | Me | single bond | H | c-Pr | H | $OCF_3$ | Me | O |
| D-4638 | Me(R) | single bond | H | c-Pr | H | $OCF_3$ | Me | O |
| D-4639 | Me(S) | single bond | H | c-Pr | H | $OCF_3$ | Me | O |
| D-4640 | H | $CH_2$ | Me | c-Pr | H | $OCF_3$ | Me | O |
| D-4641 | Me | $CH_2$ | H | c-Pr | H | $OCF_3$ | Me | O |
| D-4642 | H | CH(Me) | H | c-Pr | H | $OCF_3$ | Me | O |
| D-4643 | H | $CH_2CH_2$ | Me | c-Pr | H | $OCF_3$ | Me | O |
| D-4644 | Me | $CH_2CH_2$ | H | c-Pr | H | $OCF_3$ | Me | O |
| D-4645 | H | single bond | Me | c-Pr | H | Br | $CH_2OMe$ | O |
| D-4646 | Me | single bond | H | c-Pr | H | Br | $CH_2OMe$ | O |
| D-4647 | Me(R) | single bond | H | c-Pr | H | Br | $CH_2OMe$ | O |
| D-4648 | Me(S) | single bond | H | c-Pr | H | Br | $CH_2OMe$ | O |
| D-4649 | H | $CH_2$ | Me | c-Pr | H | Br | $CH_2OMe$ | O |
| D-4650 | Me | $CH_2$ | H | c-Pr | H | Br | $CH_2OMe$ | O |
| D-4651 | H | CH(Me) | H | c-Pr | H | Br | $CH_2OMe$ | O |
| D-4652 | H | $CH_2CH_2$ | Me | c-Pr | H | Br | $CH_2OMe$ | O |
| D-4653 | Me | $CH_2CH_2$ | H | c-Pr | H | Br | $CH_2OMe$ | O |
| D-4654 | H | single bond | Me | c-Pr | H | Br | $CH_2OMe$ | O |
| D-4655 | Me | single bond | H | c-Pr | H | Br | $CH_2OMe$ | O |
| D-4656 | Me(R) | single bond | H | c-Pr | H | Br | $CH_2OMe$ | O |
| D-4657 | Me(S) | single bond | H | c-Pr | H | Br | $CH_2OMe$ | O |
| D-4658 | H | $CH_2$ | Me | c-Pr | H | Br | $CH_2OMe$ | O |

TABLE 751

| Compound Number | Y | W | Z | $R^1$ | $R^2$ | $R^3$ | $R^{10}$ | A |
|---|---|---|---|---|---|---|---|---|
| D-4659 | Me | $CH_2$ | H | c-Pr | H | Br | $CH_2OMe$ | O |
| D-4660 | H | CH(Me) | H | c-Pr | H | Br | $CH_2OMe$ | O |
| D-4661 | H | $CH_2CH_2$ | Me | c-Pr | H | Br | $CH_2OMe$ | O |
| D-4662 | Me | $CH_2CH_2$ | H | c-Pr | H | Br | $CH_2OMe$ | O |
| D-4663 | H | single bond | Me | c-Pr | H | Br | $CH_2OMe$ | O |
| D-4664 | Me | single bond | H | c-Pr | H | Br | $CH_2OMe$ | O |
| D-4665 | Me(R) | single bond | H | c-Pr | H | Br | $CH_2OMe$ | O |
| D-4666 | Me(S) | single bond | H | c-Pr | H | Br | $CH_2OMe$ | O |
| D-4667 | H | $CH_2$ | Me | c-Pr | H | Br | $CH_2OMe$ | O |
| D-4668 | Me | $CH_2$ | H | c-Pr | H | Br | $CH_2OMe$ | O |
| D-4669 | H | CH(Me) | H | c-Pr | H | Br | $CH_2OMe$ | O |
| D-4670 | H | $CH_2CH_2$ | Me | c-Pr | H | Br | $CH_2OMe$ | O |
| D-4671 | Me | $CH_2CH_2$ | H | c-Pr | H | Br | $CH_2OMe$ | O |
| D-4672 | H | single bond | Me | c-Pr | H | Br | $CH_2OMe$ | O |
| D-4673 | Me | single bond | H | c-Pr | H | Br | $CH_2OMe$ | O |
| D-4674 | Me(R) | single bond | H | c-Pr | H | Br | $CH_2OMe$ | O |
| D-4675 | Me(S) | single bond | H | c-Pr | H | Br | $CH_2OMe$ | O |
| D-4676 | H | $CH_2$ | Me | c-Pr | H | Br | $CH_2OMe$ | O |
| D-4677 | Me | $CH_2$ | H | c-Pr | H | Br | $CH_2OMe$ | O |
| D-4678 | H | CH(Me) | H | c-Pr | H | Br | $CH_2OMe$ | O |
| D-4679 | H | $CH_2CH_2$ | Me | c-Pr | H | Br | $CH_2OMe$ | O |
| D-4680 | Me | $CH_2CH_2$ | H | c-Pr | H | Br | $CH_2OMe$ | O |
| D-4681 | H | single bond | Me | c-Pr | H | $CF_3$ | $CH_2OMe$ | O |
| D-4682 | Me | single bond | H | c-Pr | H | $CF_3$ | $CH_2OMe$ | O |
| D-4683 | Me(R) | single bond | H | c-Pr | H | $CF_3$ | $CH_2OMe$ | O |
| D-4684 | Me(S) | single bond | H | c-Pr | H | $CF_3$ | $CH_2OMe$ | O |
| D-4685 | H | $CH_2$ | Me | c-Pr | H | CF: | $CH_2OMe$ | O |
| D-4686 | Me | $CH_2$ | H | c-Pr | H | $CF_3$ | $CH_2OMe$ | O |
| D-4687 | H | CH(Me) | H | c-Pr | H | $CF_3$ | $CH_2OMe$ | O |
| D-4688 | H | $CH_2CH_2$ | Me | c-Pr | H | $CF_3$ | $CH_2OMe$ | O |

TABLE 751-continued

| Compound Number | Y | W | Z | $R^1$ | $R^2$ | $R^3$ | $R^{10}$ | A |
|---|---|---|---|---|---|---|---|---|
| D-4689 | Me | $CH_2CH_2$ | H | c-Pr | H | $CF_3$ | $CH_2OMe$ | O |
| D-4690 | H | single bond | Me | c-Pr | H | $CF_3$ | $CH_2OMe$ | O |
| D-4691 | Me | single bond | H | c-Pr | H | $CF_3$ | $CH_2OMe$ | O |
| D-4692 | Me(R) | single bond | H | c-Pr | H | $CF_3$ | $CH_2OMe$ | O |
| D-4693 | Me(S) | single bond | H | c-Pr | H | $CF_3$ | $CH_2OMe$ | O |
| D-4694 | H | $CH_2$ | Me | c-Pr | H | $CF_3$ | $CH_2OMe$ | O |
| D-4695 | Me | $CH_2$ | H | c-Pr | H | $CF_3$ | $CH_2OMe$ | O |
| D-4696 | H | CH(Me) | H | c-Pr | H | $CF_3$ | $CH_2OMe$ | O |
| D-4697 | H | $CH_2CH_2$ | Me | c-Pr | H | $CF_3$ | $CH_2OMe$ | O |
| D-4698 | Me | $CH_2CH_2$ | H | c-Pr | H | $CF_3$ | $CH_2OMe$ | O |
| D-4699 | H | single bond | Me | c-Pr | H | $CF_3$ | $CH_2OMe$ | O |
| D-4700 | Me | single bond | H | c-Pr | H | $CF_3$ | $CH_2OMe$ | O |
| D-4701 | Me(R) | single bond | H | c-Pr | H | $CF_3$ | $CH_2OMe$ | O |
| D-4702 | Me(S) | single bond | H | c-Pr | H | $CF_3$ | $CH_2OMe$ | O |

TABLE 752

| Compound Number | Y | W | Z | $R^1$ | $R^2$ | $R^3$ | $R^{10}$ | A |
|---|---|---|---|---|---|---|---|---|
| D-4703 | H | $CH_2$ | Me | c-Pr | H | $CF_3$ | $CH_2OMe$ | O |
| D-4704 | Me | $CH_2$ | H | c-Pr | H | $CF_3$ | $CH_2OMe$ | O |
| D-4705 | H | CH(Me) | H | c-Pr | H | $CF_3$ | $CH_2OMe$ | O |
| D-4706 | H | $CH_2CH_2$ | Me | c-Pr | H | $CF_3$ | $CH_2OMe$ | O |
| D-4707 | Me | $CH_2CH_2$ | H | c-Pr | H | $CF_3$ | $CH_2OMe$ | O |
| D-4708 | H | single bond | Me | c-Pr | H | $CF_3$ | $CH_2OMe$ | O |
| D-4709 | Me | single bond | H | c-Pr | H | $CF_3$ | $CH_2OMe$ | O |
| D-4710 | Me(R) | single bond | H | c-Pr | H | $CF_3$ | $CH_2OMe$ | O |
| D-4711 | Me(S) | single bond | H | c-Pr | H | $CF_3$ | $CH_2OMe$ | O |
| D-4712 | H | $CH_2$ | Me | c-Pr | H | $CF_3$ | $CH_2OMe$ | O |
| D-4713 | Me | $CH_2$ | H | c-Pr | H | $CF_3$ | $CH_2OMe$ | O |
| D-4714 | H | CH(Me) | H | c-Pr | H | $CF_3$ | $CH_2OMe$ | O |
| D-4715 | H | $CH_2CH_2$ | Me | c-Pr | H | $CF_3$ | $CH_2OMe$ | O |
| D-4716 | Me | $CH_2CH_2$ | H | c-Pr | H | $CF_3$ | $CH_2OMe$ | O |
| D-4717 | H | single bond | Me | c-Pr | H | OMe | $CH_2OMe$ | O |
| D-4718 | Me | single bond | H | c-Pr | H | OMe | $CH_2OMe$ | O |
| D-4719 | Me(R) | single bond | H | c-Pr | H | OMe | $CH_2OMe$ | O |
| D-4720 | Me(S) | single bond | H | c-Pr | H | OMe | $CH_2OMe$ | O |
| D-4721 | H | $CH_2$ | Me | c-Pr | H | OMe | $CH_2OMe$ | O |
| D-4722 | Me | $CH_2$ | H | c-Pr | H | OMe | $CH_2OMe$ | O |
| D-4723 | H | CH(Me) | H | c-Pr | H | OMe | $CH_2OMe$ | O |
| D-4724 | H | $CH_2CH_2$ | Me | c-Pr | H | OMe | $CH_2OMe$ | O |
| D-4725 | Me | $CH_2CH_2$ | H | c-Pr | H | OMe | $CH_2OMe$ | O |
| D-4726 | H | single bond | Me | c-Pr | H | OMe | $CH_2OMe$ | O |
| D-4727 | Me | single bond | H | c-Pr | H | OMe | $CH_2OMe$ | O |
| D-4728 | Me(R) | single bond | H | c-Pr | H | OMe | $CH_2OMe$ | O |
| D-4729 | Me(S) | single bond | H | c-Pr | H | OMe | $CH_2OMe$ | O |
| D-4730 | H | $CH_2$ | Me | c-Pr | H | OMe | $CH_2OMe$ | O |
| D-4731 | Me | $CH_2$ | H | c-Pr | H | OMe | $CH_2OMe$ | O |
| D-4732 | H | CH(Me) | H | c-Pr | H | OMe | $CH_2OMe$ | O |
| D-4733 | H | $CH_2CH_2$ | Me | c-Pr | H | OMe | $CH_2OMe$ | O |
| D-4734 | Me | $CH_2CH_2$ | H | c-Pr | H | OMe | $CH_2OMe$ | O |
| D-4735 | H | single bond | Me | c-Pr | H | OMe | $CH_2OMe$ | O |
| D-4736 | Me | single bond | H | c-Pr | H | OMe | $CH_2OMe$ | O |
| D-4737 | Me(R) | single bond | H | c-Pr | H | OMe | $CH_2OMe$ | O |
| D-4738 | Me(S) | single bond | H | c-Pr | H | OMe | $CH_2OMe$ | O |
| D-4739 | H | $CH_2$ | Me | c-Pr | H | OMe | $CH_2OMe$ | O |
| D-4740 | Me | $CH_2$ | H | c-Pr | H | OMe | $CH_2OMe$ | O |
| D-4741 | H | CH(Me) | H | c-Pr | H | OMe | $CH_2OMe$ | O |
| D-4742 | H | $CH_2CH_2$ | Me | c-Pr | H | OMe | $CH_2OMe$ | O |
| D-4743 | Me | $CH_2CH_2$ | H | c-Pr | H | OMe | $CH_2OMe$ | O |
| D-4744 | H | single bond | Me | c-Pr | H | OMe | $CH_2OMe$ | O |
| D-4745 | Me | single bond | H | c-Pr | H | OMe | $CH_2OMe$ | O |
| D-4746 | Me(R) | single bond | H | c-Pr | H | OMe | $CH_2OMe$ | O |

TABLE 753

| Compound Number | Y | W | Z | $R^1$ | $R^2$ | $R^3$ | $R^{10}$ | A |
|---|---|---|---|---|---|---|---|---|
| D-4747 | Me(S) | single bond | H | c-Pr | H | OMe | $CH_2OMe$ | O |
| D-4748 | H | $CH_2$ | Me | c-Pr | H | OMe | $CH_2OMe$ | O |

TABLE 753-continued

| Compound Number | Y | W | Z | $R^1$ | $R^2$ | $R^3$ | $R^{10}$ | A |
|---|---|---|---|---|---|---|---|---|
| D-4749 | Me | $CH_2$ | H | c-Pr | H | OMe | $CH_2OMe$ | O |
| D-4750 | H | CH(Me) | H | c-Pr | H | OMe | $CH_2OMe$ | O |
| D-4751 | H | $CH_2CH_2$ | Me | c-Pr | H | OMe | $CH_2OMe$ | O |
| D-4752 | Me | $CH_2CH_2$ | H | c-Pr | H | OMe | $CH_2OMe$ | O |
| D-4753 | H | single bond | Me | c-Pr | H | $OCF_3$ | $CH_2OMe$ | O |
| D-4754 | Me | single bond | H | c-Pr | H | $OCF_3$ | $CH_2OMe$ | O |
| D-4755 | Me(R) | single bond | H | c-Pr | H | $OCF_3$ | $CH_2OMe$ | O |
| D-4756 | Me(S) | single bond | H | c-Pr | H | $OCF_3$ | $CH_2OMe$ | O |
| D-4757 | H | $CH_2$ | Me | c-Pr | H | $OCF_3$ | $CH_2OMe$ | O |
| D-4758 | Me | $CH_2$ | H | c-Pr | H | $OCF_3$ | $CH_2OMe$ | O |
| D-4759 | H | CH(Me) | H | c-Pr | H | $OCF_3$ | $CH_2OMe$ | O |
| D-4760 | H | $CH_2CH_2$ | Me | c-Pr | H | $OCF_3$ | $CH_2OMe$ | O |
| D-4761 | Me | $CH_2CH_2$ | H | c-Pr | H | $OCF_3$ | $CH_2OMe$ | O |
| D-4762 | H | single bond | Me | c-Pr | H | $OCF_3$ | $CH_2OMe$ | O |
| D-4763 | Me | single bond | H | c-Pr | H | $OCF_3$ | $CH_2OMe$ | O |
| D-4764 | Me(R) | single bond | H | c-Pr | H | $OCF_3$ | $CH_2OMe$ | O |
| D-4765 | Me(S) | single bond | H | c-Pr | H | $OCF_3$ | $CH_2OMe$ | O |
| D-4766 | H | $CH_2$ | Me | c-Pr | H | $OCF_3$ | $CH_2OMe$ | O |
| D-4767 | Me | $CH_2$ | H | c-Pr | H | $OCF_3$ | $CH_2OMe$ | O |
| D-4768 | H | CH(Me) | H | c-Pr | H | $OCF_3$ | $CH_2OMe$ | O |
| D-4769 | H | $CH_2CH_2$ | Me | c-Pr | H | $OCF_3$ | $CH_2OMe$ | O |
| D-4770 | Me | $CH_2CH_2$ | H | c-Pr | H | $OCF_3$ | $CH_2OMe$ | O |
| D-4771 | H | single bond | Me | c-Pr | H | $OCF_3$ | $CH_2OMe$ | O |
| D-4772 | Me | single bond | H | c-Pr | H | $OCF_3$ | $CH_2OMe$ | O |
| D-4773 | Me(R) | single bond | H | c-Pr | H | $OCF_3$ | $CH_2OMe$ | O |
| D-4774 | Me(S) | single bond | H | c-Pr | H | $OCF_3$ | $CH_2OMe$ | O |
| D-4775 | H | $CH_2$ | Me | c-Pr | H | $OCF_3$ | $CH_2OMe$ | O |
| D-4776 | Me | $CH_2$ | H | c-Pr | H | $OCF_3$ | $CH_2OMe$ | O |
| D-4777 | H | CH(Me) | H | c-Pr | H | $OCF_3$ | $CH_2OMe$ | O |
| D-4778 | H | $CH_2CH_2$ | Me | c-Pr | H | $OCF_3$ | $CH_2OMe$ | O |
| D-4779 | Me | $CH_2CH_2$ | H | c-Pr | H | $OCF_3$ | $CH_2OMe$ | O |
| D-4780 | H | single bond | Me | c-Pr | H | $OCF_3$ | $CH_2OMe$ | O |
| D-4781 | Me | single bond | H | c-Pr | H | $OCF_3$ | $CH_2OMe$ | O |
| D-4782 | Me(R) | single bond | H | c-Pr | H | $OCF_3$ | $CH_2OMe$ | O |
| D-4783 | Me(S) | single bond | H | c-Pr | H | $OCF_3$ | $CH_2OMe$ | O |
| D-4784 | H | $CH_2$ | Me | c-Pr | H | $OCF_3$ | $CH_2OMe$ | O |
| D-4785 | Me | $CH_2$ | H | c-Pr | H | $OCF_3$ | $CH_2OMe$ | O |
| D-4786 | H | CH(Me) | H | c-Pr | H | $OCF_3$ | $CH_2OMe$ | O |
| D-4787 | H | $CH_2CH_2$ | Me | c-Pr | H | $OCF_3$ | $CH_2OMe$ | O |
| D-4788 | Me | $CH_2CH_2$ | H | c-Pr | H | $OCF_3$ | $CH_2OMe$ | O |
| D-4789 | H | single bond | Me | c-Pr | H | Br | $CH_2CN$ | O |
| D-4790 | Me | single bond | H | c-Pr | H | Br | $CH_2CN$ | O |

TABLE 754

| Compound Number | Y | W | Z | $R^1$ | $R^2$ | $R^3$ | $R^{10}$ | A |
|---|---|---|---|---|---|---|---|---|
| D-4791 | Me(R) | single bond | H | c-Pr | H | Br | $CH_2CN$ | O |
| D-4792 | Me(S) | single bond | H | c-Pr | H | Br | $CH_2CN$ | O |
| D-4793 | H | $CH_2$ | Me | c-Pr | H | Br | $CH_2CN$ | O |
| D-4794 | Me | $CH_2$ | H | c-Pr | H | Br | $CH_2CN$ | O |
| D-4795 | H | CH(Me) | H | c-Pr | H | Br | $CH_2CN$ | O |
| D-4796 | H | $CH_2CH_2$ | Me | c-Pr | H | Br | $CH_2CN$ | O |
| D-4797 | Me | $CH_2CH_2$ | H | c-Pr | H | Br | $CH_2CN$ | O |
| D-4798 | H | single bond | Me | c-Pr | H | Br | $CH_2CN$ | O |
| D-4799 | Me | single bond | H | c-Pr | H | Br | $CH_2CN$ | O |
| D-4800 | Me(R) | single bond | H | c-Pr | H | Br | $CH_2CN$ | O |
| D-4801 | Me(S) | single bond | H | c-Pr | H | Br | $CH_2CN$ | O |
| D-4802 | H | $CH_2$ | Me | c-Pr | H | Br | $CH_2CN$ | O |
| D-4803 | Me | $CH_2$ | H | c-Pr | H | Br | $CH_2CN$ | O |
| D-4804 | H | CH(Me) | H | c-Pr | H | Br | $CH_2CN$ | O |
| D-4805 | H | $CH_2CH_2$ | Me | c-Pr | H | Br | $CH_2CN$ | O |
| D-4806 | Me | $CH_2CH_2$ | H | c-Pr | H | Br | $CH_2CN$ | O |
| D-4807 | H | single bond | Me | c-Pr | H | Br | $CH_2CN$ | O |
| D-4808 | Me | single bond | H | c-Pr | H | Br | $CH_2CN$ | O |
| D-4809 | Me(R) | single bond | H | c-Pr | H | Br | $CH_2CN$ | O |
| D-4810 | Me(S) | single bond | H | c-Pr | H | Br | $CH_2CN$ | O |
| D-4811 | H | $CH_2$ | Me | c-Pr | H | Br | $CH_2CN$ | O |
| D-4812 | Me | $CH_2$ | H | c-Pr | H | Br | $CH_2CN$ | O |
| D-4813 | H | CH(Me) | H | c-Pr | H | Br | $CH_2CN$ | O |
| D-4814 | H | $CH_2CH_2$ | Me | c-Pr | H | Br | $CH_2CN$ | O |
| D-4815 | Me | $CH_2CH_2$ | H | c-Pr | H | Br | $CH_2CN$ | O |
| D-4816 | H | single bond | Me | c-Pr | H | Br | $CH_2CN$ | O |
| D-4817 | Me | single bond | H | c-Pr | H | Br | $CH_2CN$ | O |
| D-4818 | Me(R) | single bond | H | c-Pr | H | Br | $CH_2CN$ | O |
| D-4819 | Me(S) | single bond | H | c-Pr | H | Br | $CH_2CN$ | O |
| D-4820 | H | $CH_2$ | Me | c-Pr | H | Br | $CH_2CN$ | O |
| D-4821 | Me | $CH_2$ | H | c-Pr | H | Br | $CH_2CN$ | O |
| D-4822 | H | CH(Me) | H | c-Pr | H | Br | $CH_2CN$ | O |
| D-4823 | H | $CH_2CH_2$ | Me | c-Pr | H | Br | $CH_2CN$ | O |
| D-4824 | Me | $CH_2CH_2$ | H | c-Pr | H | Br | $CH_2CN$ | O |
| D-4825 | H | single bond | Me | c-Pr | H | $CF_3$ | $CH_2CN$ | O |
| D-4826 | Me | single bond | H | c-Pr | H | $CF_3$ | $CH_2CN$ | O |
| D-4827 | Me(R) | single bond | H | c-Pr | H | $CF_3$ | $CH_2CN$ | O |
| D-4828 | Me(S) | single bond | H | c-Pr | H | $CF_3$ | $CH_2CN$ | O |
| D-4829 | H | $CH_2$ | Me | c-Pr | H | $CF_3$ | $CH_2CN$ | O |
| D-4830 | Me | $CH_2$ | H | c-Pr | H | $CF_3$ | $CH_2CN$ | O |
| D-4831 | H | CH(Me) | H | c-Pr | H | $CF_3$ | $CH_2CN$ | O |
| D-4832 | H | $CH_2CH_2$ | Me | c-Pr | H | $CF_3$ | $CH_2CN$ | O |
| D-4833 | Me | $CH_2CH_2$ | H | c-Pr | H | $CF_3$ | $CH_2CN$ | O |
| D-4834 | H | single bond | Me | c-Pr | H | $CF_3$ | $CH_2CN$ | O |

TABLE 755

| Compound Number | Y | W | Z | $R^1$ | $R^2$ | $R^3$ | $R^{10}$ | A |
|---|---|---|---|---|---|---|---|---|
| D-4835 | Me | single bond | H | c-Pr | H | $CF_3$ | $CH_2CN$ | O |
| D-4836 | Me(R) | single bond | H | c-Pr | H | $CF_3$ | $CH_2CN$ | O |
| D-4837 | Me(S) | single bond | H | c-Pr | H | $CF_3$ | $CH_2CN$ | O |
| D-4838 | H | $CH_2$ | Me | c-Pr | H | $CF_3$ | $CH_2CN$ | O |
| D-4839 | Me | $CH_2$ | H | c-Pr | H | $CF_3$ | $CH_2CN$ | O |
| D-4840 | H | CH(Me) | H | c-Pr | H | $CF_3$ | $CH_2CN$ | O |
| D-4841 | H | $CH_2CH_2$ | Me | c-Pr | H | $CF_3$ | $CH_2CN$ | O |
| D-4842 | Me | $CH_2CH_2$ | H | c-Pr | H | $CF_3$ | $CH_2CN$ | O |
| D-4843 | H | single bond | Me | c-Pr | H | $CF_3$ | $CH_2CN$ | O |
| D-4844 | Me | single bond | H | c-Pr | H | $CF_3$ | $CH_2CN$ | O |
| D-4845 | Me(R) | single bond | H | c-Pr | H | $CF_3$ | $CH_2CN$ | O |
| D-4846 | Me(S) | single bond | H | c-Pr | H | $CF_3$ | $CH_2CN$ | O |
| D-4847 | H | $CH_2$ | Me | c-Pr | H | $CF_3$ | $CH_2CN$ | O |
| D-4848 | Me | $CH_2$ | H | c-Pr | H | $CF_3$ | $CH_2CN$ | O |
| D-4849 | H | CH(Me) | H | c-Pr | H | $CF_3$ | $CH_2CN$ | O |
| D-4850 | H | $CH_2CH_2$ | Me | c-Pr | H | $CF_3$ | $CH_2CN$ | O |
| D-4851 | Me | $CH_2CH_2$ | H | c-Pr | H | $CF_3$ | $CH_2CN$ | O |
| D-4852 | H | single bond | Me | c-Pr | H | $CF_3$ | $CH_2CN$ | O |
| D-4853 | Me | single bond | H | c-Pr | H | $CF_3$ | $CH_2CN$ | O |
| D-4854 | Me(R) | single bond | H | c-Pr | H | $CF_3$ | $CH_2CN$ | O |
| D-4855 | Me(S) | single bond | H | c-Pr | H | $CF_3$ | $CH_2CN$ | O |
| D-4856 | H | $CH_2$ | Me | c-Pr | H | $CF_3$ | $CH_2CN$ | O |
| D-4857 | Me | $CH_2$ | H | c-Pr | H | $CF_3$ | $CH_2CN$ | O |
| D-4858 | H | CH(Me) | H | c-Pr | H | $CF_3$ | $CH_2CN$ | O |
| D-4859 | H | $CH_2CH_2$ | Me | c-Pr | H | $CF_3$ | $CH_2CN$ | O |
| D-4860 | Me | $CH_2CH_2$ | H | c-Pr | H | $CF_3$ | $CH_2CN$ | O |
| D-4861 | H | single bond | Me | c-Pr | H | OMe | $CH_2CN$ | O |
| D-4862 | Me | single bond | H | c-Pr | H | OMe | $CH_2CN$ | O |
| D-4863 | Me(R) | single bond | H | c-Pr | H | OMe | $CH_2CN$ | O |
| D-4864 | Me(S) | single bond | H | c-Pr | H | OMe | $CH_2CN$ | O |
| D-4865 | H | $CH_2$ | Me | c-Pr | H | OMe | $CH_2CN$ | O |
| D-4866 | Me | $CH_2$ | H | c-Pr | H | OMe | $CH_2CN$ | O |
| D-4867 | H | CH(Me) | H | c-Pr | H | OMe | $CH_2CN$ | O |
| D-4868 | H | $CH_2CH_2$ | Me | c-Pr | H | OMe | $CH_2CN$ | O |
| D-4869 | Me | $CH_2CH_2$ | H | c-Pr | H | OMe | $CH_2CN$ | O |
| D-4870 | H | single bond | Me | c-Pr | H | OMe | $CH_2CN$ | O |
| D-4871 | Me | single bond | H | c-Pr | H | OMe | $CH_2CN$ | O |
| D-4872 | Me(R) | single bond | H | c-Pr | H | OMe | $CH_2CN$ | O |
| D-4873 | Me(S) | single bond | H | c-Pr | H | OMe | $CH_2CN$ | O |
| D-4874 | H | $CH_2$ | Me | c-Pr | H | OMe | $CH_2CN$ | O |
| D-4875 | Me | $CH_2$ | H | c-Pr | H | OMe | $CH_2CN$ | O |
| D-4876 | H | CH(Me) | H | c-Pr | H | OMe | $CH_2CN$ | O |
| D-4877 | H | $CH_2CH_2$ | Me | c-Pr | H | OMe | $CH_2CN$ | O |
| D-4878 | Me | $CH_2CH_2$ | H | c-Pr | H | OMe | $CH_2CN$ | O |

TABLE 756

| Compound Number | Y | W | Z | $R^1$ | $R^2$ | $R^3$ | $R^{10}$ | A |
|---|---|---|---|---|---|---|---|---|
| D-4879 | H | single bond | Me | c-Pr | H | OMe | $CH_2CN$ | O |
| D-4880 | Me | single bond | H | c-Pr | H | OMe | $CH_2CN$ | O |
| D-4881 | Me(R) | single bond | H | c-Pr | H | OMe | $CH_2CN$ | O |
| D-4882 | Me(S) | single bond | H | c-Pr | H | OMe | $CH_2CN$ | O |
| D-4883 | H | $CH_2$ | Me | c-Pr | H | OMe | $CH_2CN$ | O |
| D-4884 | Me | $CH_2$ | H | c-Pr | H | OMe | $CH_2CN$ | O |
| D-4885 | H | CH(Me) | H | c-Pr | H | OMe | $CH_2CN$ | O |
| D-4886 | H | $CH_2CH_2$ | Me | c-Pr | H | OMe | $CH_2CN$ | O |
| D-4887 | Me | $CH_2CH_2$ | H | c-Pr | H | OMe | $CH_2CN$ | O |
| D-4888 | H | single bond | Me | c-Pr | H | OMe | $CH_2CN$ | O |
| D-4889 | Me | single bond | H | c-Pr | H | OMe | $CH_2CN$ | O |
| D-4890 | Me(R) | single bond | H | c-Pr | H | OMe | $CH_2CN$ | O |
| D-4891 | Me(S) | single bond | H | c-Pr | H | OMe | $CH_2CN$ | O |
| D-4892 | H | $CH_2$ | Me | c-Pr | H | OMe | $CH_2CN$ | O |
| D-4893 | Me | $CH_2$ | H | c-Pr | H | OMe | $CH_2CN$ | O |
| D-4894 | H | CH(Me) | H | c-Pr | H | OMe | $CH_2CN$ | O |
| D-4895 | H | $CH_2CH_2$ | Me | c-Pr | H | OMe | $CH_2CN$ | O |
| D-4896 | Me | $CH_2CH_2$ | H | c-Pr | H | OMe | $CH_2CN$ | O |
| D-4897 | H | single bond | Me | c-Pr | H | $OCF_3$ | $CH_2CN$ | O |
| D-4898 | Me | single bond | H | c-Pr | H | $OCF_3$ | $CH_2CN$ | O |
| D-4899 | Me(R) | single bond | H | c-Pr | H | $OCF_3$ | $CH_2CN$ | O |
| D-4900 | Me(S) | single bond | H | c-Pr | H | $OCF_3$ | $CH_2CN$ | O |
| D-4901 | H | $CH_2$ | Me | c-Pr | H | $OCF_3$ | $CH_2CN$ | O |
| D-4902 | Me | $CH_2$ | H | c-Pr | H | $OCF_3$ | $CH_2CN$ | O |
| D-4903 | H | CH(Me) | H | c-Pr | H | $OCF_3$ | $CH_2CN$ | O |
| D-4904 | H | $CH_2CH_2$ | Me | c-Pr | H | $OCF_3$ | $CH_2CN$ | O |
| D-4905 | Me | $CH_2CH_2$ | H | c-Pr | H | $OCF_3$ | $CH_2CN$ | O |
| D-4906 | H | single bond | Me | c-Pr | H | $OCF_3$ | $CH_2CN$ | O |
| D-4907 | Me | single bond | H | c-Pr | H | $OCF_3$ | $CH_2CN$ | O |
| D-4908 | Me(R) | single bond | H | c-Pr | H | $OCF_3$ | $CH_2CN$ | O |
| D-4909 | Me(S) | single bond | H | c-Pr | H | $OCF_3$ | $CH_2CN$ | O |
| D-4910 | H | $CH_2$ | Me | c-Pr | H | $OCF_3$ | $CH_2CN$ | O |
| D-4911 | Me | $CH_2$ | H | c-Pr | H | $OCF_3$ | $CH_2CN$ | O |
| D-4912 | H | CH(Me) | H | c-Pr | H | $OCF_3$ | $CH_2CN$ | O |
| D-4913 | H | $CH_2CH_2$ | Me | c-Pr | H | $OCF_3$ | $CH_2CN$ | O |
| D-4914 | Me | $CH_2CH_2$ | H | c-Pr | H | $OCF_3$ | $CH_2CN$ | O |
| D-4915 | H | single bond | Me | c-Pr | H | $OCF_3$ | $CH_2CN$ | O |
| D-4916 | Me | single bond | H | c-Pr | H | $OCF_3$ | $CH_2CN$ | O |
| D-4917 | Me(R) | single bond | H | c-Pr | H | $OCF_3$ | $CH_2CN$ | O |
| D-4918 | Me(S) | single bond | H | c-Pr | H | $OCF_3$ | $CH_2CN$ | O |
| D-4919 | H | $CH_2$ | Me | c-Pr | H | $OCF_3$ | $CH_2CN$ | O |
| D-4920 | Me | $CH_2$ | H | c-Pr | H | $OCF_3$ | $CH_2CN$ | O |
| D-4921 | H | CH(Me) | H | c-Pr | H | $OCF_3$ | $CH_2CN$ | O |
| D-4922 | H | $CH_2CH_2$ | Me | c-Pr | H | $OCF_3$ | $CH_2CN$ | O |

TABLE 757

| Compound Number | Y | W | Z | $R^1$ | $R^2$ | $R^3$ | $R^{10}$ | A |
|---|---|---|---|---|---|---|---|---|
| D-4923 | Me | $CH_2CH_2$ | H | c-Pr | H | $OCF_3$ | $CH_2CN$ | O |
| D-4924 | H | single bond | Me | c-Pr | H | $OCF_3$ | $CH_2CN$ | O |
| D-4925 | Me | single bond | H | c-Pr | H | $OCF_3$ | $CH_2CN$ | O |
| D-4926 | Me(R) | single bond | H | c-Pr | H | $OCF_3$ | $CH_2CN$ | O |
| D-4927 | Me(S) | single bond | H | c-Pr | H | $OCF_3$ | $CH_2CN$ | O |
| D-4928 | H | $CH_2$ | Me | c-Pr | H | $OCF_3$ | $CH_2CN$ | O |
| D-4929 | Me | $CH_2$ | H | c-Pr | H | $OCF_3$ | $CH_2CN$ | O |
| D-4930 | H | CH(Me) | H | c-Pr | H | $OCF_3$ | $CH_2CN$ | O |
| D-4931 | H | $CH_2CH_2$ | Me | c-Pr | H | $OCF_3$ | $CH_2CN$ | O |
| D-4932 | Me | $CH_2CH_2$ | H | c-Pr | H | $OCF_3$ | $CH_2CN$ | O |
| D-4933 | H | single bond | Me | c-Pr | Me | Br | H | O |
| D-4934 | Me | single bond | H | c-Pr | Me | Br | H | O |
| D-4935 | Me(R) | single bond | H | c-Pr | Me | Br | H | O |
| D-4936 | Me(S) | single bond | H | c-Pr | Me | Br | H | O |
| D-4937 | H | $CH_2$ | Me | c-Pr | Me | Br | H | O |
| D-4938 | Me | $CH_2$ | H | c-Pr | Me | Br | H | O |
| D-4939 | H | CH(Me) | H | c-Pr | Me | Br | H | O |
| D-4940 | H | $CH_2CH_2$ | Me | c-Pr | Me | Br | H | O |
| D-4941 | Me | $CH_2CH_2$ | H | c-Pr | Me | Br | H | O |
| D-4942 | H | single bond | Me | c-Pr | Me | Br | H | O |
| D-4943 | Me | single bond | H | c-Pr | Me | Br | H | O |
| D-4944 | Me(R) | single bond | H | c-Pr | Me | Br | H | O |
| D-4945 | Me(S) | single bond | H | c-Pr | Me | Br | H | O |
| D-4946 | H | $CH_2$ | Me | c-Pr | Me | Br | H | O |
| D-4947 | Me | $CH_2$ | H | c-Pr | Me | Br | H | O |
| D-4948 | H | CH(Me) | H | c-Pr | Me | Br | H | O |
| D-4949 | H | $CH_2CH_2$ | Me | c-Pr | Me | Br | H | O |
| D-4950 | Me | $CH_2CH_2$ | H | c-Pr | Me | Br | H | O |
| D-4951 | H | single bond | Me | c-Pr | Me | Br | H | O |
| D-4952 | Me | single bond | H | c-Pr | Me | Br | H | O |
| D-4953 | Me(R) | single bond | H | c-Pr | Me | Br | H | O |
| D-4954 | Me(S) | single bond | H | c-Pr | Me | Br | H | O |
| D-4955 | H | $CH_2$ | Me | c-Pr | Me | Br | H | O |
| D-4956 | Me | $CH_2$ | H | c-Pr | Me | Br | H | O |
| D-4957 | H | CH(Me) | H | c-Pr | Me | Br | H | O |
| D-4958 | H | $CH_2CH_2$ | Me | c-Pr | Me | Br | H | O |
| D-4959 | Me | $CH_2CH_2$ | H | c-Pr | Me | Br | H | O |
| D-4960 | H | single bond | Me | c-Pr | Me | Br | H | O |
| D-4961 | Me | single bond | H | c-Pr | Me | Br | H | O |
| D-4962 | Me(R) | single bond | H | c-Pr | Me | Br | H | O |
| D-4963 | Me(S) | single bond | H | c-Pr | Me | Br | H | O |
| D-4964 | H | $CH_2$ | Me | c-Pr | Me | Br | H | O |
| D-4965 | Me | $CH_2$ | H | c-Pr | Me | Br | H | O |
| D-4966 | H | CH(Me) | H | c-Pr | Me | Br | H | O |

TABLE 758

| Compound Number | Y | W | Z | $R^1$ | $R^2$ | $R^3$ | $R^{10}$ | A |
|---|---|---|---|---|---|---|---|---|
| D-4967 | H | $CH_2CH_2$ | Me | c-Pr | Me | Br | H | O |
| D-4968 | Me | $CH_2CH_2$ | H | c-Pr | Me | Br | H | O |
| D-4969 | H | single bond | Me | c-Pr | Me | $CF_3$ | H | O |
| D-4970 | Me | single bond | H | c-Pr | Me | $CF_3$ | H | O |
| D-4971 | Me(R) | single bond | H | c-Pr | Me | $CF_3$ | H | O |
| D-4972 | Me(S) | single bond | H | c-Pr | Me | $CF_3$ | H | O |
| D-4973 | H | $CH_2$ | Me | c-Pr | Me | $CF_3$ | H | O |
| D-4974 | Me | $CH_2$ | H | c-Pr | Me | $CF_3$ | H | O |
| D-4975 | H | CH(Me) | H | c-Pr | Me | $CF_3$ | H | O |
| D-4976 | H | $CH_2CH_2$ | Me | c-Pr | Me | $CF_3$ | H | O |
| D-4977 | Me | $CH_2CH_2$ | H | c-Pr | Me | $CF_3$ | H | O |
| D-4978 | H | single bond | Me | c-Pr | Me | $CF_3$ | H | O |
| D-4979 | Me | single bond | H | c-Pr | Me | $CF_3$ | H | O |
| D-4980 | Me(R) | single bond | H | c-Pr | Me | $CF_3$ | H | O |
| D-4981 | Me(S) | single bond | H | c-Pr | Me | $CF_3$ | H | O |
| D-4982 | H | $CH_2$ | Me | c-Pr | Me | $CF_3$ | H | O |
| D-4983 | Me | $CH_2$ | H | c-Pr | Me | $CF_3$ | H | O |
| D-4984 | H | CH(Me) | H | c-Pr | Me | $CF_3$ | H | O |
| D-4985 | H | $CH_2CH_2$ | Me | c-Pr | Me | $CF_3$ | H | O |
| D-4986 | Me | $CH_2CH_2$ | H | c-Pr | Me | $CF_3$ | H | O |
| D-4987 | H | single bond | Me | c-Pr | Me | $CF_3$ | H | O |
| D-4988 | Me | single bond | H | c-Pr | Me | $CF_3$ | H | O |
| D-4989 | Me(R) | single bond | H | c-Pr | Me | $CF_3$ | H | O |
| D-4990 | Me(S) | single bond | H | c-Pr | Me | $CF_3$ | H | O |
| D-4991 | H | $CH_2$ | Me | c-Pr | Me | $CF_3$ | H | O |
| D-4992 | Me | $CH_2$ | H | c-Pr | Me | $CF_3$ | H | O |
| D-4993 | H | CH(Me) | H | c-Pr | Me | $CF_3$ | H | O |
| D-4994 | H | $CH_2CH_2$ | Me | c-Pr | Me | $CF_3$ | H | O |
| D-4995 | Me | $CH_2CH_2$ | H | c-Pr | Me | $CF_3$ | H | O |
| D-4996 | H | single bond | Me | c-Pr | Me | $CF_3$ | H | O |
| D-4997 | Me | single bond | H | c-Pr | Me | $CF_3$ | H | O |
| D-4998 | Me(R) | single bond | H | c-Pr | Me | $CF_3$ | H | O |
| D-4999 | Me(S) | single bond | H | c-Pr | Me | $CF_3$ | H | O |
| D-5000 | H | $CH_2$ | Me | c-Pr | Me | $CF_3$ | H | O |
| D-5001 | Me | $CH_2$ | H | c-Pr | Me | $CF_3$ | H | O |
| D-5002 | H | CH(Me) | H | c-Pr | Me | $CF_3$ | H | O |
| D-5003 | H | $CH_2CH_2$ | Me | c-Pr | Me | $CF_3$ | H | O |
| D-5004 | Me | $CH_2CH_2$ | H | c-Pr | Me | $CF_3$ | H | O |
| D-5005 | H | single bond | Me | c-Pr | Me | OMe | H | O |
| D-5006 | Me | single bond | H | c-Pr | Me | OMe | H | O |
| D-5007 | Me(R) | single bond | H | c-Pr | Me | OMe | H | O |
| D-5008 | Me(S) | single bond | H | c-Pr | Me | OMe | H | O |
| D-5009 | H | $CH_2$ | Me | c-Pr | Me | OMe | H | O |
| D-5010 | Me | $CH_2$ | H | c-Pr | Me | OMe | H | O |

TABLE 759

| Compound Number | Y | W | Z | $R^1$ | $R^2$ | $R^3$ | $R^{10}$ | A |
|---|---|---|---|---|---|---|---|---|
| D-5011 | H | CH(Me) | H | c-Pr | Me | OMe | H | O |
| D-5012 | H | $CH_2CH_2$ | Me | c-Pr | Me | OMe | H | O |
| D-5013 | Me | $CH_2CH_2$ | H | c-Pr | Me | OMe | H | O |
| D-5014 | H | single bond | Me | c-Pr | Me | OMe | H | O |
| D-5015 | Me | single bond | H | c-Pr | Me | OMe | H | O |
| D-5016 | Me(R) | single bond | H | c-Pr | Me | OMe | H | O |
| D-5017 | Me(S) | single bond | H | c-Pr | Me | OMe | H | O |
| D-5018 | H | $CH_2$ | Me | c-Pr | Me | OMe | H | O |
| D-5019 | Me | $CH_2$ | H | c-Pr | Me | OMe | H | O |
| D-5020 | H | CH(Me) | H | c-Pr | Me | OMe | H | O |
| D-5021 | H | $CH_2CH_2$ | Me | c-Pr | Me | OMe | H | O |
| D-5022 | Me | $CH_2CH_2$ | H | c-Pr | Me | OMe | H | O |
| D-5023 | H | single bond | Me | c-Pr | Me | OMe | H | O |
| D-5024 | Me | single bond | H | c-Pr | Me | OMe | H | O |
| D-5025 | Me(R) | single bond | H | c-Pr | Me | OMe | H | O |
| D-5026 | Me(S) | single bond | H | c-Pr | Me | OMe | H | O |
| D-5027 | H | $CH_2$ | Me | c-Pr | Me | OMe | H | O |
| D-5028 | Me | $CH_2$ | H | c-Pr | Me | OMe | H | O |
| D-5029 | H | CH(Me) | H | c-Pr | Me | OMe | H | O |
| D-5030 | H | $CH_2CH_2$ | Me | c-Pr | Me | OMe | H | O |
| D-5031 | Me | $CH_2CH_2$ | H | c-Pr | Me | OMe | H | O |
| D-5032 | H | single bond | Me | c-Pr | Me | OMe | H | O |
| D-5033 | Me | single bond | H | c-Pr | Me | OMe | H | O |
| D-5034 | Me(R) | single bond | H | c-Pr | Me | OMe | H | O |
| D-5035 | Me(S) | single bond | H | c-Pr | Me | OMe | H | O |
| D-5036 | H | $CH_2$ | Me | c-Pr | Me | OMe | H | O |
| D-5037 | Me | $CH_2$ | H | c-Pr | Me | OMe | H | O |
| D-5038 | H | CH(Me) | H | c-Pr | Me | OMe | H | O |
| D-5039 | H | $CH_2CH_2$ | Me | c-Pr | Me | OMe | H | O |
| D-5040 | Me | $CH_2CH_2$ | H | c-Pr | Me | OMe | H | O |
| D-5041 | H | single bond | Me | c-Pr | Me | $OCF_3$ | H | O |
| D-5042 | Me | single bond | H | c-Pr | Me | $OCF_3$ | H | O |
| D-5043 | Me(R) | single bond | H | c-Pr | Me | $OCF_3$ | H | O |
| D-5044 | Me(S) | single bond | H | c-Pr | Me | $OCF_3$ | H | O |
| D-5045 | H | $CH_2$ | Me | c-Pr | Me | $OCF_3$ | H | O |
| D-5046 | Me | $CH_2$ | H | c-Pr | Me | $OCF_3$ | H | O |
| D-5047 | H | CH(Me) | H | c-Pr | Me | $OCF_3$ | H | O |
| D-5048 | H | $CH_2CH_2$ | Me | c-Pr | Me | $OCF_3$ | H | O |
| D-5049 | Me | $CH_2CH_2$ | H | c-Pr | Me | $OCF_3$ | H | O |
| D-5050 | H | single bond | Me | c-Pr | Me | $OCF_3$ | H | O |
| D-5051 | Me | single bond | H | c-Pr | Me | $OCF_3$ | H | O |
| D-5052 | Me(R) | single bond | H | c-Pr | Me | $OCF_3$ | H | O |
| D-5053 | Me(S) | single bond | H | c-Pr | Me | $OCF_3$ | H | O |
| D-5054 | H | $CH_2$ | Me | c-Pr | Me | $OCF_3$ | H | O |

TABLE 769

| Compound Number | Y | W | Z | $R^1$ | $R^2$ | $R^3$ | $R^{10}$ | A |
|---|---|---|---|---|---|---|---|---|
| D-5055 | Me | CH | H | c-Pr | Me | $OCF_3$ | H | O |
| D-5056 | H | CH(Me) | H | c-Pr | Me | $OCF_3$ | H | O |
| D-5057 | H | $CH_2CH_2$ | Me | c-Pr | Me | $OCF_3$ | H | O |
| D-5058 | Me | $CH_2CH_2$ | H | c-Pr | Me | $OCF_3$ | H | O |
| D-5059 | H | single bond | Me | c-Pr | Me | $OCF_3$ | H | O |
| D-5060 | Me | single bond | H | c-Pr | Me | $OCF_3$ | H | O |
| D-5061 | Me(R) | single bond | H | c-Pr | Me | $OCF_3$ | H | O |
| D-5062 | Me(S) | single bond | H | c-Pr | Me | $OCF_3$ | H | O |
| D-5063 | H | $CH_2$ | Me | c-Pr | Me | $OCF_3$ | H | O |
| D-5064 | Me | CH | H | c-Pr | Me | $OCF_3$ | H | O |
| D-5065 | H | CH(Me) | H | c-Pr | Me | $OCF_3$ | H | O |
| D-5066 | H | $CH_2CH_2$ | Me | c-Pr | Me | $OCF_3$ | H | O |
| D-5067 | Me | $CH_2CH_2$ | H | c-Pr | Me | $OCF_3$ | H | O |
| D-5068 | H | single bond | Me | c-Pr | Me | $OCF_3$ | H | O |
| D-5069 | Me | single bond | H | c-Pr | Me | $OCF_3$ | H | O |
| D-5070 | Me(R) | single bond | H | c-Pr | Me | $OCF_3$ | H | O |
| D-5071 | Me(S) | single bond | H | c-Pr | Me | $OCF_3$ | H | O |
| D-5072 | H | $CH_2$ | Me | c-Pr | Me | $OCF_3$ | H | O |
| D-5073 | Me | CH | H | c-Pr | Me | $OCF_3$ | H | O |
| D-5074 | H | CH(Me) | H | c-Pr | Me | $OCF_3$ | H | O |
| D-5075 | H | $CH_2CH_2$ | Me | c-Pr | Me | $OCF_3$ | H | O |
| D-5076 | Me | $CH_2CH_2$ | H | c-Pr | Me | $OCF_3$ | H | O |
| D-5077 | H | single bond | Me | c-Pr | Me | Br | Me | O |
| D-5078 | Me | single bond | H | c-Pr | Me | Br | Me | O |

TABLE 769-continued

| Compound Number | Y | W | Z | $R^1$ | $R^2$ | $R^3$ | $R^{10}$ | A |
|---|---|---|---|---|---|---|---|---|
| D-5079 | Me(R) | single bond | H | c-Pr | Me | Br | Me | O |
| D-5080 | Me(S) | single bond | H | c-Pr | Me | Br | Me | O |
| D-5081 | H | $CH_2$ | Me | c-Pr | Me | Br | Me | O |
| D-5082 | Me | CH | H | c-Pr | Me | Br | Me | O |
| D-5083 | H | CH(Me) | H | c-Pr | Me | Br | Me | O |
| D-5084 | H | $CH_2CH_2$ | Me | c-Pr | Me | Br | Me | O |
| D-5085 | Me | $CH_2CH_2$ | H | c-Pr | Me | Br | Me | O |
| D-5086 | H | single bond | Me | c-Pr | Me | Br | Me | O |
| D-5087 | Me | single bond | H | c-Pr | Me | Br | Me | O |
| D-5088 | Me(R) | single bond | H | c-Pr | Me | Br | Me | O |
| D-5089 | Me(S) | single bond | H | c-Pr | Me | Br | Me | O |
| D-5090 | H | $CH_2$ | Me | c-Pr | Me | Br | Me | O |
| D-5091 | Me | $CH_2$ | H | c-Pr | Me | Br | Me | O |
| D-5092 | H | CH(Me) | H | c-Pr | Me | Br | Me | O |
| D-5093 | H | $CH_2CH_2$ | Me | c-Pr | Me | Br | Me | O |
| D-5094 | Me | $CH_2CH_2$ | H | c-Pr | Me | Br | Me | O |
| D-5095 | H | single bond | Me | c-Pr | Me | Br | Me | O |
| D-5096 | Me | single bond | H | c-Pr | Me | Br | Me | O |
| D-5097 | Me(R) | single bond | H | c-Pr | Me | Br | Me | O |
| D-5098 | Me(S) | single bond | H | c-Pr | Me | Br | Me | O |

TABLE 761

| Compound Number | Y | W | Z | $R^1$ | $R^2$ | $R^3$ | $R^{10}$ | A |
|---|---|---|---|---|---|---|---|---|
| D-5099 | H | $CH_2$ | Me | c-Pr | Me | Br | Me | O |
| D-5100 | Me | $CH_2$ | H | c-Pr | Me | Br | Me | O |
| D-5101 | H | CH(Me) | H | c-Pr | Me | Br | Me | O |
| D-5102 | H | $CH_2CH_2$ | Me | c-Pr | Me | Br | Me | O |
| D-5103 | Me | $CH_2CH_2$ | H | c-Pr | Me | Br | Me | O |
| D-5104 | H | single bond | Me | c-Pr | Me | Br | Me | O |
| D-5105 | Me | single bond | H | c-Pr | Me | Br | Me | O |
| D-5106 | Me(R) | single bond | H | c-Pr | Me | Br | Me | O |
| D-5107 | Me(S) | single bond | H | c-Pr | Me | Br | Me | O |
| D-5108 | H | $CH_2$ | Me | c-Pr | Me | Br | Me | O |
| D-5109 | Me | $CH_2$ | H | c-Pr | Me | Br | Me | O |
| D-5110 | H | CH(Me) | H | c-Pr | Me | Br | Me | O |
| D-5111 | H | $CH_2CH_2$ | Me | c-Pr | Me | Br | Me | O |
| D-5112 | Me | $CH_2CH_2$ | H | c-Pr | Me | Br | Me | O |
| D-5113 | H | single bond | Me | c-Pr | Me | $CF_3$ | Me | O |
| D-5114 | Me | single bond | H | c-Pr | Me | $CF_3$ | Me | O |
| D-5115 | Me(R) | single bond | H | c-Pr | Me | $CF_3$ | Me | O |
| D-5116 | Me(S) | single bond | H | c-Pr | Me | $CF_3$ | Me | O |
| D-5117 | H | $CH_2$ | Me | c-Pr | Me | $CF_3$ | Me | O |
| D-5118 | Me | $CH_2$ | H | c-Pr | Me | $CF_3$ | Me | O |
| D-5119 | H | CH(Me) | H | c-Pr | Me | $CF_3$ | Me | O |
| D-5120 | H | $CH_2CH_2$ | Me | c-Pr | Me | $CF_3$ | Me | O |
| D-5121 | Me | $CH_2CH_2$ | H | c-Pr | Me | $CF_3$ | Me | O |
| D-5122 | H | single bond | Me | c-Pr | Me | $CF_3$ | Me | O |
| D-5123 | Me | single bond | H | c-Pr | Me | $CF_3$ | Me | O |
| D-5124 | Me(R) | single bond | H | c-Pr | Me | $CF_3$ | Me | O |
| D-5125 | Me(S) | single bond | H | c-Pr | Me | $CF_3$ | Me | O |
| D-5126 | H | $CH_2$ | Me | c-Pr | Me | $CF_3$ | Me | O |
| D-5127 | Me | $CH_2$ | H | c-Pr | Me | $CF_3$ | Me | O |
| D-5128 | H | CH(Me) | H | c-Pr | Me | $CF_3$ | Me | O |
| D-5129 | H | $CH_2CH_2$ | Me | c-Pr | Me | $CF_3$ | Me | O |
| D-5130 | Me | $CH_2CH_2$ | H | c-Pr | Me | $CF_3$ | Me | O |
| D-5131 | H | single bond | Me | c-Pr | Me | $CF_3$ | Me | O |
| D-5132 | Me | single bond | H | c-Pr | Me | $CF_3$ | Me | O |
| D-5133 | Me(R) | single bond | H | c-Pr | Me | $CF_3$ | Me | O |
| D-5134 | Me(S) | single bond | H | c-Pr | Me | $CF_3$ | Me | O |
| D-5135 | H | $CH_2$ | Me | c-Pr | Me | $CF_3$ | Me | O |
| D-5136 | Me | $CH_2$ | H | c-Pr | Me | $CF_3$ | Me | O |
| D-5137 | H | CH(Me) | H | c-Pr | Me | $CF_3$ | Me | O |
| D-5138 | H | $CH_2CH_2$ | Me | c-Pr | Me | $CF_3$ | Me | O |
| D-5139 | Me | $CH_2CH_2$ | H | c-Pr | Me | $CF_3$ | Me | O |
| D-5140 | H | single bond | Me | c-Pr | Me | $CF_3$ | Me | O |
| D-5141 | Me | single bond | H | c-Pr | Me | $CF_3$ | Me | O |
| D-5142 | Me(R) | single bond | H | c-Pr | Me | $CF_3$ | Me | O |

TABLE 762

| Compound Number | Y | W | Z | $R^1$ | $R^2$ | $R^3$ | $R^{10}$ | A |
|---|---|---|---|---|---|---|---|---|
| D-5143 | Me(S) | single bond | H | c-Pr | Me | $CF_3$ | Me | O |
| D-5144 | H | $CH_2$ | Me | c-Pr | Me | $CF_3$ | Me | O |
| D-5145 | Me | $CH_2$ | H | c-Pr | Me | $CF_3$ | Me | O |
| D-5146 | H | CH(Me) | H | c-Pr | Me | $CF_3$ | Me | O |
| D-5147 | H | $CH_2CH_2$ | Me | c-Pr | Me | $CF_3$ | Me | O |
| D-5148 | Me | $CH_2CH_2$ | H | c-Pr | Me | $CF_3$ | Me | O |
| D-5149 | H | single bond | Me | c-Pr | Me | OMe | Me | O |
| D-5150 | Me | single bond | H | c-Pr | Me | OMe | Me | O |
| D-5151 | Me(R) | single bond | H | c-Pr | Me | OMe | Me | O |
| D-5152 | Me(S) | single bond | H | c-Pr | Me | OMe | Me | O |
| D-5153 | H | $CH_2$ | Me | c-Pr | Me | OMe | Me | O |
| D-5154 | Me | $CH_2$ | H | c-Pr | Me | OMe | Me | O |
| D-5155 | H | CH(Me) | H | c-Pr | Me | OMe | Me | O |
| D-5156 | H | $CH_2CH_2$ | Me | c-Pr | Me | OMe | Me | O |
| D-5157 | Me | $CH_2CH_2$ | H | c-Pr | Me | OMe | Me | O |
| D-5158 | H | single bond | Me | c-Pr | Me | OMe | Me | O |
| D-5159 | Me | single bond | H | c-Pr | Me | OMe | Me | O |
| D-5160 | Me(R) | single bond | H | c-Pr | Me | OMe | Me | O |
| D-5161 | Me(S) | single bond | H | c-Pr | Me | OMe | Me | O |
| D-5162 | H | $CH_2$ | Me | c-Pr | Me | OMe | Me | O |
| D-5163 | Me | $CH_2$ | H | c-Pr | Me | OMe | Me | O |
| D-5164 | H | CH(Me) | H | c-Pr | Me | OMe | Me | O |
| D-5165 | H | $CH_2CH_2$ | Me | c-Pr | Me | OMe | Me | O |
| D-5166 | Me | $CH_2CH_2$ | H | c-Pr | Me | OMe | Me | O |
| D-5167 | H | single bond | Me | c-Pr | Me | OMe | Me | O |
| D-5168 | Me | single bond | H | c-Pr | Me | OMe | Me | O |
| D-5169 | Me(R) | single bond | H | c-Pr | Me | OMe | Me | O |
| D-5170 | Me(S) | single bond | H | c-Pr | Me | OMe | Me | O |
| D-5171 | H | $CH_2$ | Me | c-Pr | Me | OMe | Me | O |
| D-5172 | Me | $CH_2$ | H | c-Pr | Me | OMe | Me | O |
| D-5173 | H | CH(Me) | H | c-Pr | Me | OMe | Me | O |
| D-5174 | H | $CH_2CH_2$ | Me | c-Pr | Me | OMe | Me | O |
| D-5175 | Me | $CH_2CH_2$ | H | c-Pr | Me | OMe | Me | O |
| D-5176 | H | single bond | Me | c-Pr | Me | OMe | Me | O |
| D-5177 | Me | single bond | H | c-Pr | Me | OMe | Me | O |
| D-5178 | Me(R) | single bond | H | c-Pr | Me | OMe | Me | O |
| D-5179 | Me(S) | single bond | H | c-Pr | Me | OMe | Me | O |
| D-5180 | H | $CH_2$ | Me | c-Pr | Me | OMe | Me | O |
| D-5181 | Me | $CH_2$ | H | c-Pr | Me | OMe | Me | O |
| D-5182 | H | CH(Me) | H | c-Pr | Me | OMe | Me | O |
| D-5183 | H | $CH_2CH_2$ | Me | c-Pr | Me | OMe | Me | O |
| D-5184 | Me | $CH_2CH_2$ | H | c-Pr | Me | OMe | Me | O |
| D-5185 | H | single bond | Me | c-Pr | Me | $OCF_3$ | Me | O |
| D-5186 | Me | single bond | H | c-Pr | Me | $OCF_3$ | Me | O |

TABLE 763

| Compound Number | Y | W | Z | $R^1$ | $R^2$ | $R^3$ | $R^{10}$ | A |
|---|---|---|---|---|---|---|---|---|
| D-5187 | Me(R) | single bond | H | c-Pr | Me | $OCF_3$ | Me | O |
| D-5188 | Me(S) | single bond | H | c-Pr | Me | $OCF_3$ | Me | O |
| D-5189 | H | $CH_2$ | Me | c-Pr | Me | $OCF_3$ | Me | O |
| D-5190 | Me | $CH_2$ | H | c-Pr | Me | $OCF_3$ | Me | O |
| D-5191 | H | CH(Me) | H | c-Pr | Me | $OCF_3$ | Me | O |
| D-5192 | H | $CH_2CH_2$ | Me | c-Pr | Me | $OCF_3$ | Me | O |
| D-5193 | Me | $CH_2CH_2$ | H | c-Pr | Me | $OCF_3$ | Me | O |
| D-5194 | H | single bond | Me | c-Pr | Me | $OCF_3$ | Me | O |
| D-5195 | Me | single bond | H | c-Pr | Me | $OCF_3$ | Me | O |
| D-5196 | Me(R) | single bond | H | c-Pr | Me | $OCF_3$ | Me | O |
| D-5197 | Me(S) | single bond | H | c-Pr | Me | $OCF_3$ | Me | O |
| D-5198 | H | $CH_2$ | Me | c-Pr | Me | $OCF_3$ | Me | O |
| D-5199 | Me | $CH_2$ | H | c-Pr | Me | $OCF_3$ | Me | O |
| D-5200 | H | CH(Me) | H | c-Pr | Me | $OCF_3$ | Me | O |
| D-5201 | H | $CH_2CH_2$ | Me | c-Pr | Me | $OCF_3$ | Me | O |
| D-5202 | Me | $CH_2CH_2$ | H | c-Pr | Me | $OCF_3$ | Me | O |
| D-5203 | H | single bond | Me | c-Pr | Me | $OCF_3$ | Me | O |
| D-5204 | Me | single bond | H | c-Pr | Me | $OCF_3$ | Me | O |
| D-5205 | Me(R) | single bond | H | c-Pr | Me | $OCF_3$ | Me | O |
| D-5206 | Me(S) | single bond | H | c-Pr | Me | $OCF_3$ | Me | O |
| D-5207 | H | $CH_2$ | Me | c-Pr | Me | $OCF_3$ | Me | O |
| D-5208 | Me | $CH_2$ | H | c-Pr | Me | $OCF_3$ | Me | O |
| D-5209 | H | CH(Me) | H | c-Pr | Me | $OCF_3$ | Me | O |
| D-5210 | H | $CH_2CH_2$ | Me | c-Pr | Me | $OCF_3$ | Me | O |

TABLE 763-continued

| Compound Number | Y | W | Z | $R^1$ | $R^2$ | $R^3$ | $R^{10}$ | A |
|---|---|---|---|---|---|---|---|---|
| D-5211 | Me | $CH_2CH_2$ | H | c-Pr | Me | $OCF_3$ | Me | O |
| D-5212 | H | single bond | Me | c-Pr | Me | $OCF_3$ | Me | O |
| D-5213 | Me | single bond | H | c-Pr | Me | $OCF_3$ | Me | O |
| D-5214 | Me(R) | single bond | H | c-Pr | Me | $OCF_3$ | Me | O |
| D-5215 | Me(S) | single bond | H | c-Pr | Me | $OCF_3$ | Me | O |
| D-5216 | H | $CH_2$ | Me | c-Pr | Me | $OCF_3$ | Me | O |
| D-5217 | Me | $CH_2$ | H | c-Pr | Me | $OCF_3$ | Me | O |
| D-5218 | H | CH(Me) | H | c-Pr | Me | $OCF_3$ | Me | O |
| D-5219 | H | $CH_2CH_2$ | Me | c-Pr | Me | $OCF_3$ | Me | O |
| D-5220 | Me | $CH_2CH_2$ | H | c-Pr | Me | $OCF_3$ | Me | O |
| D-5221 | H | single bond | Me | c-Pr | Me | Br | $CH_2OMe$ | O |
| D-5222 | Me | single bond | H | c-Pr | Me | Br | $CH_2OMe$ | O |
| D-5223 | Me(R) | single bond | H | c-Pr | Me | Br | $CH_2OMe$ | O |
| D-5224 | Me(S) | single bond | H | c-Pr | Me | Br | $CH_2OMe$ | O |
| D-5225 | H | $CH_2$ | Me | c-Pr | Me | Br | $CH_2OMe$ | O |
| D-5226 | Me | $CH_2$ | H | c-Pr | Me | Br | $CH_2OMe$ | O |
| D-5227 | H | CH(Me) | H | c-Pr | Me | Br | $CH_2OMe$ | O |
| D-5228 | H | $CH_2CH_2$ | Me | c-Pr | Me | Br | $CH_2OMe$ | O |
| D-5229 | Me | $CH_2CH_2$ | H | c-Pr | Me | Br | $CH_2OMe$ | O |
| D-5230 | H | single bond | Me | c-Pr | Me | Br | $CH_2OMe$ | O |

TABLE 764

| Compound Number | Y | W | Z | $R^1$ | $R^2$ | $R^3$ | $R^{10}$ | A |
|---|---|---|---|---|---|---|---|---|
| D-5231 | Me | single bond | H | c-Pr | Me | Br | $CH_2OMe$ | O |
| D-5232 | Me(R) | single bond | H | c-Pr | Me | Br | $CH_2OMe$ | O |
| D-5233 | Me(S) | single bond | H | c-Pr | Me | Br | $CH_2OMe$ | O |
| D-5234 | H | $CH_2$ | Me | c-Pr | Me | Br | $CH_2OMe$ | O |
| D-5235 | Me | $CH_2$ | H | c-Pr | Me | Br | $CH_2OMe$ | O |
| D-5236 | H | CH(Me) | H | c-Pr | Me | Br | $CH_2OMe$ | O |
| D-5237 | H | $CH_2CH_2$ | Me | c-Pr | Me | Br | $CH_2OMe$ | O |
| D-5238 | Me | $CH_2CH_2$ | H | c-Pr | Me | Br | $CH_2OMe$ | O |
| D-5239 | H | single bond | Me | c-Pr | Me | Br | $CH_2OMe$ | O |
| D-5240 | Me | single bond | H | c-Pr | Me | Br | $CH_2OMe$ | O |
| D-5241 | Me(R) | single bond | H | c-Pr | Me | Br | $CH_2OMe$ | O |
| D-5242 | Me(S) | single bond | H | c-Pr | Me | Br | $CH_2OMe$ | O |
| D-5243 | H | $CH_2$ | Me | c-Pr | Me | Br | $CH_2OMe$ | O |
| D-5244 | Me | $CH_2$ | H | c-Pr | Me | Br | $CH_2OMe$ | O |
| D-5245 | H | CH(Me) | H | c-Pr | Me | Br | $CH_2OMe$ | O |
| D-5246 | H | $CH_2CH_2$ | Me | c-Pr | Me | Br | $CH_2OMe$ | O |
| D-5247 | Me | $CH_2CH_2$ | H | c-Pr | Me | Br | $CH_2OMe$ | O |
| D-5248 | H | single bond | Me | c-Pr | Me | Br | $CH_2OMe$ | O |
| D-5249 | Me | single bond | H | c-Pr | Me | Br | $CH_2OMe$ | O |
| D-5250 | Me(R) | single bond | H | c-Pr | Me | Br | $CH_2OMe$ | O |
| D-5251 | Me(S) | single bond | H | c-Pr | Me | Br | $CH_2OMe$ | O |
| D-5252 | H | $CH_2$ | Me | c-Pr | Me | Br | $CH_2OMe$ | O |
| D-5253 | Me | $CH_2$ | H | c-Pr | Me | Br | $CH_2OMe$ | O |
| D-5254 | H | CH(Me) | H | c-Pr | Me | Br | $CH_2OMe$ | O |
| D-5255 | H | $CH_2CH_2$ | Me | c-Pr | Me | Br | $CH_2OMe$ | O |
| D-5256 | Me | $CH_2CH_2$ | H | c-Pr | Me | Br | $CH_2OMe$ | O |
| D-5257 | H | single bond | Me | c-Pr | Me | $CF_3$ | $CH_2OMe$ | O |
| D-5258 | Me | single bond | H | c-Pr | Me | $CF_3$ | $CH_2OMe$ | O |
| D-5259 | Me(R) | single bond | H | c-Pr | Me | $CF_3$ | $CH_2OMe$ | O |
| D-5260 | Me(S) | single bond | H | c-Pr | Me | $CF_3$ | $CH_2OMe$ | O |
| D-5261 | H | $CH_2$ | Me | c-Pr | Me | $CF_3$ | $CH_2OMe$ | O |
| D-5262 | Me | $CH_2$ | H | c-Pr | Me | $CF_3$ | $CH_2OMe$ | O |
| D-5263 | H | CH(Me) | H | c-Pr | Me | $CF_3$ | $CH_2OMe$ | O |
| D-5264 | H | $CH_2CH_2$ | Me | c-Pr | Me | $CF_3$ | $CH_2OMe$ | O |
| D-5265 | Me | $CH_2CH_2$ | H | c-Pr | Me | $CF_3$ | $CH_2OMe$ | O |
| D-5266 | H | single bond | Me | c-Pr | Me | $CF_3$ | $CH_2OMe$ | O |
| D-5267 | Me | single bond | H | c-Pr | Me | $CF_3$ | $CH_2OMe$ | O |
| D-5268 | Me(R) | single bond | H | c-Pr | Me | $CF_3$ | $CH_2OMe$ | O |
| D-5269 | Me(S) | single bond | H | c-Pr | Me | $CF_3$ | $CH_2OMe$ | O |
| D-5270 | H | $CH_2$ | Me | c-Pr | Me | $CF_3$ | $CH_2OMe$ | O |
| D-5271 | Me | $CH_2$ | H | c-Pr | Me | $CF_3$ | $CH_2OMe$ | O |
| D-5272 | H | CH(Me) | H | c-Pr | Me | $CF_3$ | $CH_2OMe$ | O |
| D-5273 | H | $CH_2CH_2$ | Me | c-Pr | Me | $CF_3$ | $CH_2OMe$ | O |
| D-5274 | Me | $CH_2CH_2$ | H | c-Pr | Me | $CF_3$ | $CH_2OMe$ | O |

TABLE 765

| Compound Number | Y | W | Z | $R^1$ | $R^2$ | $R^3$ | $R^{10}$ | A |
|---|---|---|---|---|---|---|---|---|
| D-5275 | H | single bond | Me | c-Pr | Me | $CF_3$ | $CH_2OMe$ | O |
| D-5276 | Me | single bond | H | c-Pr | Me | $CF_3$ | $CH_2OMe$ | O |
| D-5277 | Me(R) | single bond | H | c-Pr | Me | $CF_3$ | $CH_2OMe$ | O |
| D-5278 | Me(S) | single bond | H | c-Pr | Me | $CF_3$ | $CH_2OMe$ | O |
| D-5279 | H | $CH_2$ | Me | c-Pr | Me | $CF_3$ | $CH_2OMe$ | O |
| D-5280 | Me | $CH_2$ | H | c-Pr | Me | $CF_3$ | $CH_2OMe$ | O |
| D-5281 | H | CH(Me) | H | c-Pr | Me | $CF_3$ | $CH_2OMe$ | O |
| D-5282 | H | $CH_2CH_2$ | Me | c-Pr | Me | $CF_3$ | $CH_2OMe$ | O |
| D-5283 | Me | $CH_2CH_2$ | H | c-Pr | Me | $CF_3$ | $CH_2OMe$ | O |
| D-5284 | H | single bond | Me | c-Pr | Me | $CF_3$ | $CH_2OMe$ | O |
| D-5285 | Me | single bond | H | c-Pr | Me | $CF_3$ | $CH_2OMe$ | O |
| D-5286 | Me(R) | single bond | H | c-Pr | Me | $CF_3$ | $CH_2OMe$ | O |
| D-5287 | Me(S) | single bond | H | c-Pr | Me | $CF_3$ | $CH_2OMe$ | O |
| D-5288 | H | $CH_2$ | Me | c-Pr | Me | $CF_3$ | $CH_2OMe$ | O |
| D-5289 | Me | $CH_2$ | H | c-Pr | Me | $CF_3$ | $CH_2OMe$ | O |
| D-5290 | H | CH(Me) | H | c-Pr | Me | $CF_3$ | $CH_2OMe$ | O |
| D-5291 | H | $CH_2CH_2$ | Me | c-Pr | Me | $CF_3$ | $CH_2OMe$ | O |
| D-5292 | Me | $CH_2CH_2$ | H | c-Pr | Me | $CF_3$ | $CH_2OMe$ | O |
| D-5293 | H | single bond | Me | c-Pr | Me | OMe | $CH_2OMe$ | O |
| D-5294 | Me | single bond | H | c-Pr | Me | OMe | $CH_2OMe$ | O |
| D-5295 | Me(R) | single bond | H | c-Pr | Me | OMe | $CH_2OMe$ | O |
| D-5296 | Me(S) | single bond | H | c-Pr | Me | OMe | $CH_2OMe$ | O |
| D-5297 | H | $CH_2$ | Me | c-Pr | Me | OMe | $CH_2OMe$ | O |
| D-5298 | Me | $CH_2$ | H | c-Pr | Me | OMe | $CH_2OMe$ | O |
| D-5299 | H | CH(Me) | H | c-Pr | Me | OMe | $CH_2OMe$ | O |
| D-5300 | H | $CH_2CH_2$ | Me | c-Pr | Me | OMe | $CH_2OMe$ | O |
| D-5301 | Me | $CH_2CH_2$ | H | c-Pr | Me | OMe | $CH_2OMe$ | O |
| D-5302 | H | single bond | Me | c-Pr | Me | OMe | $CH_2OMe$ | O |
| D-5303 | Me | single bond | H | c-Pr | Me | OMe | $CH_2OMe$ | O |
| D-5304 | Me(R) | single bond | H | c-Pr | Me | OMe | $CH_2OMe$ | O |
| D-5305 | Me(S) | single bond | H | c-Pr | Me | OMe | $CH_2OMe$ | O |
| D-5306 | H | $CH_2$ | Me | c-Pr | Me | OMe | $CH_2OMe$ | O |
| D-5307 | Me | $CH_2$ | H | c-Pr | Me | OMe | $CH_2OMe$ | O |
| D-5308 | H | CH(Me) | H | c-Pr | Me | OMe | $CH_2OMe$ | O |
| D-5309 | H | $CH_2CH_2$ | Me | c-Pr | Me | OMe | $CH_2OMe$ | O |
| D-5310 | Me | $CH_2CH_2$ | H | c-Pr | Me | OMe | $CH_2OMe$ | O |
| D-5311 | H | single bond | Me | c-Pr | Me | OMe | $CH_2OMe$ | O |
| D-5312 | Me | single bond | H | c-Pr | Me | OMe | $CH_2OMe$ | O |
| D-5313 | Me(R) | single bond | H | c-Pr | Me | OMe | $CH_2OMe$ | O |
| D-5314 | Me(S) | single bond | H | c-Pr | Me | OMe | $CH_2OMe$ | O |
| D-5315 | H | $CH_2$ | Me | c-Pr | Me | OMe | $CH_2OMe$ | O |
| D-5316 | Me | $CH_2$ | H | c-Pr | Me | OMe | $CH_2OMe$ | O |
| D-5317 | H | CH(Me) | H | c-Pr | Me | OMe | $CH_2OMe$ | O |
| D-5318 | H | $CH_2CH_2$ | Me | c-Pr | Me | OMe | $CH_2OMe$ | O |

TABLE 766

| Compound Number | Y | W | Z | $R^1$ | $R^2$ | $R^3$ | $R^{10}$ | A |
|---|---|---|---|---|---|---|---|---|
| D-5319 | Me | $CH_2CH_2$ | H | c-Pr | Me | OMe | $CH_2OMe$ | O |
| D-5320 | H | single bond | Me | c-Pr | Me | OMe | $CH_2OMe$ | O |
| D-5321 | Me | single bond | H | c-Pr | Me | OMe | $CH_2OMe$ | O |
| D-5322 | Me(R) | single bond | H | c-Pr | Me | OMe | $CH_2OMe$ | O |
| D-5323 | Me(S) | single bond | H | c-Pr | Me | OMe | $CH_2OMe$ | O |
| D-5324 | H | $CH_2$ | Me | c-Pr | Me | OMe | $CH_2OMe$ | O |
| D-5325 | Me | $CH_2$ | H | c-Pr | Me | OMe | $CH_2OMe$ | O |
| D-5326 | H | CH(Me) | H | c-Pr | Me | OMe | $CH_2OMe$ | O |
| D-5327 | H | $CH_2CH_2$ | Me | c-Pr | Me | OMe | $CH_2OMe$ | O |
| D-5328 | Me | $CH_2CH_2$ | H | c-Pr | Me | OMe | $CH_2OMe$ | O |
| D-5329 | H | single bond | Me | c-Pr | Me | $OCF_3$ | $CH_2OMe$ | O |
| D-5330 | Me | single bond | H | c-Pr | Me | $OCF_3$ | $CH_2OMe$ | O |
| D-5331 | Me(R) | single bond | H | c-Pr | Me | $OCF_3$ | $CH_2OMe$ | O |
| D-5332 | Me(S) | single bond | H | c-Pr | Me | $OCF_3$ | $CH_2OMe$ | O |
| D-5333 | H | $CH_2$ | Me | c-Pr | Me | $OCF_3$ | $CH_2OMe$ | O |
| D-5334 | Me | CH | H | c-Pr | Me | $OCF_3$ | $CH_2OMe$ | O |
| D-5335 | H | CH(Me) | H | c-Pr | Me | $OCF_3$ | $CH_2OMe$ | O |
| D-5336 | H | $CH_2CH_2$ | Me | c-Pr | Me | $OCF_3$ | $CH_2OMe$ | O |
| D-5337 | Me | $CH_2CH_2$ | H | c-Pr | Me | $OCF_3$ | $CH_2OMe$ | O |
| D-5338 | H | single bond | Me | c-Pr | Me | $OCF_3$ | $CH_2OMe$ | O |
| D-5339 | Me | single bond | H | c-Pr | Me | $OCF_3$ | $CH_2OMe$ | O |
| D-5340 | Me(R) | single bond | H | c-Pr | Me | $OCF_3$ | $CH_2OMe$ | O |
| D-5341 | Me(S) | single bond | H | c-Pr | Me | $OCF_3$ | $CH_2OMe$ | O |
| D-5342 | H | $CH_2$ | Me | c-Pr | Me | $OCF_3$ | $CH_2OMe$ | O |

TABLE 766-continued

| Compound Number | Y | W | Z | $R^1$ | $R^2$ | $R^3$ | $R^{10}$ | A |
|---|---|---|---|---|---|---|---|---|
| D-5343 | Me | $CH_2$ | H | c-Pr | Me | $OCF_3$ | $CH_2OMe$ | O |
| D-5344 | H | CH(Me) | H | c-Pr | Me | $OCF_3$ | $CH_2OMe$ | O |
| D-5345 | H | $CH_2CH_2$ | Me | c-Pr | Me | $OCF_3$ | $CH_2OMe$ | O |
| D-5346 | Me | $CH_2CH_2$ | H | c-Pr | Me | $OCF_3$ | $CH_2OMe$ | O |
| D-5347 | H | single bond | Me | c-Pr | Me | $OCF_3$ | $CH_2OMe$ | O |
| D-5348 | Me | single bond | H | c-Pr | Me | $OCF_3$ | $CH_2OMe$ | O |
| D-5349 | Me(R) | single bond | H | c-Pr | Me | $OCF_3$ | $CH_2OMe$ | O |
| D-5350 | Me(S) | single bond | H | c-Pr | Me | $OCF_3$ | $CH_2OMe$ | O |
| D-5351 | H | $CH_2$ | Me | c-Pr | Me | $OCF_3$ | $CH_2OMe$ | O |
| D-5352 | Me | $CH_2$ | H | c-Pr | Me | $OCF_3$ | $CH_2OMe$ | O |
| D-5353 | H | CH(Me) | H | c-Pr | Me | $OCF_3$ | $CH_2OMe$ | O |
| D-5354 | H | $CH_2CH_2$ | Me | c-Pr | Me | $OCF_3$ | $CH_2OMe$ | O |
| D-5355 | Me | $CH_2CH_2$ | H | c-Pr | Me | $OCF_3$ | $CH_2OMe$ | O |
| D-5356 | H | single bond | Me | c-Pr | Me | $OCF_3$ | $CH_2OMe$ | O |
| D-5357 | Me | single bond | H | c-Pr | Me | $OCF_3$ | $CH_2OMe$ | O |
| D-5358 | Me(R) | single bond | H | c-Pr | Me | $OCF_3$ | $CH_2OMe$ | O |
| D-5359 | Me(S) | single bond | H | c-Pr | Me | $OCF_3$ | $CH_2OMe$ | O |
| D-5360 | H | CH | Me | c-Pr | Me | $OCF_3$ | $CH_2OMe$ | O |
| D-5361 | Me | $CH_2$ | H | c-Pr | Me | $OCF_3$ | $CH_2OMe$ | O |
| D-5362 | H | CH(Me) | H | c-Pr | Me | $OCF_3$ | $CH_2OMe$ | O |

TABLE 767

| Compound Number | Y | W | Z | $R^1$ | $R^2$ | $R^3$ | $R^{10}$ | A |
|---|---|---|---|---|---|---|---|---|
| D-5363 | H | $CH_2CH_2$ | Me | c-Pr | Me | $OCF_3$ | $CH_2OMe$ | O |
| D-5364 | Me | $CH_2CH_2$ | H | c-Pr | Me | $OCF_3$ | $CH_2OMe$ | O |
| D-5365 | H | single bond | Me | c-Pr | Me | Br | $CH_2CN$ | O |
| D-5366 | Me | single bond | H | c-Pr | Me | Br | $CH_2CN$ | O |
| D-5367 | Me(R) | single bond | H | c-Pr | Me | Br | $CH_2CN$ | O |
| D-5368 | Me(S) | single bond | H | c-Pr | Me | Br | $CH_2CN$ | O |
| D-5369 | H | $CH_2$ | Me | c-Pr | Me | Br | $CH_2CN$ | O |
| D-5370 | Me | $CH_2$ | H | c-Pr | Me | Br | $CH_2CN$ | O |
| D-5371 | H | CH(Me) | H | c-Pr | Me | Br | $CH_2CN$ | O |
| D-5372 | H | $CH_2CH_2$ | Me | c-Pr | Me | Br | $CH_2CN$ | O |
| D-5373 | Me | $CH_2CH_2$ | H | c-Pr | Me | Br | $CH_2CN$ | O |
| D-5374 | H | single bond | Me | c-Pr | Me | Br | $CH_2CN$ | O |
| D-5375 | Me | single bond | H | c-Pr | Me | Br | $CH_2CN$ | O |
| D-5376 | Me(R) | single bond | H | c-Pr | Me | Br | $CH_2CN$ | O |
| D-5377 | Me(S) | single bond | H | c-Pr | Me | Br | $CH_2CN$ | O |
| D-5378 | H | $CH_2$ | Me | c-Pr | Me | Br | $CH_2CN$ | O |
| D-5379 | Me | $CH_2$ | H | c-Pr | Me | Br | $CH_2CN$ | O |
| D-5380 | H | CH(Me) | H | c-Pr | Me | Br | $CH_2CN$ | O |
| D-5381 | H | $CH_2CH_2$ | Me | c-Pr | Me | Br | $CH_2CN$ | O |
| D-5382 | Me | $CH_2CH_2$ | H | c-Pr | Me | Br | $CH_2CN$ | O |
| D-5383 | H | single bond | Me | c-Pr | Me | Br | $CH_2CN$ | O |
| D-5384 | Me | single bond | H | c-Pr | Me | Br | $CH_2CN$ | O |
| D-5385 | Me(R) | single bond | H | c-Pr | Me | Br | $CH_2CN$ | O |
| D-5386 | Me(S) | single bond | H | c-Pr | Me | Br | $CH_2CN$ | O |
| D-5387 | H | $CH_2$ | Me | c-Pr | Me | Br | $CH_2CN$ | O |
| D-5388 | Me | $CH_2$ | H | c-Pr | Me | Br | $CH_2CN$ | O |
| D-5389 | H | CH(Me) | H | c-Pr | Me | Br | $CH_2CN$ | O |
| D-5390 | H | $CH_2CH_2$ | Me | c-Pr | Me | Br | $CH_2CN$ | O |
| D-5391 | Me | $CH_2CH_2$ | H | c-Pr | Me | Br | $CH_2CN$ | O |
| D-5392 | H | single bond | Me | c-Pr | Me | Br | $CH_2CN$ | O |
| D-5393 | Me | single bond | H | c-Pr | Me | Br | $CH_2CN$ | O |
| D-5394 | Me(R) | single bond | H | c-Pr | Me | Br | $CH_2CN$ | O |
| D-5395 | Me(S) | single bond | H | c-Pr | Me | Br | $CH_2CN$ | O |
| D-5396 | H | $CH_2$ | Me | c-Pr | Me | Br | $CH_2CN$ | O |
| D-5397 | Me | $CH_2$ | H | c-Pr | Me | Br | $CH_2CN$ | O |
| D-5398 | H | CH(Me) | H | c-Pr | Me | Br | $CH_2CN$ | O |
| D-5399 | H | $CH_2CH_2$ | Me | c-Pr | Me | Br | $CH_2CN$ | O |
| D-5400 | Me | $CH_2CH_2$ | H | c-Pr | Me | Br | $CH_2CN$ | O |
| D-5401 | H | single bond | Me | c-Pr | Me | $CF_3$ | $CH_2CN$ | O |
| D-5402 | Me | single bond | H | c-Pr | Me | $CF_3$ | $CH_2CN$ | O |
| D-5403 | Me(R) | single bond | H | c-Pr | Me | $CF_3$ | $CH_2CN$ | O |
| D-5404 | Me(S) | single bond | H | c-Pr | Me | $CF_3$ | $CH_2CN$ | O |
| D-5405 | H | $CH_2$ | Me | c-Pr | Me | $CF_3$ | $CH_2CN$ | O |
| D-5406 | Me | $CH_2$ | H | c-Pr | Me | $CF_3$ | $CH_2CN$ | O |

TABLE 768

| Compound Number | Y | W | Z | $R^1$ | $R^2$ | $R^3$ | $R^{10}$ | A |
|---|---|---|---|---|---|---|---|---|
| D-5407 | H | CH(Me) | H | c-Pr | Me | $CF_3$ | $CH_2CN$ | O |
| D-5408 | H | $CH_2CH_2$ | Me | c-Pr | Me | $CF_3$ | $CH_2CN$ | O |
| D-5409 | Me | $CH_2CH_2$ | H | c-Pr | Me | $CF_3$ | $CH_2CN$ | O |
| D-5410 | H | single bond | Me | c-Pr | Me | $CF_3$ | $CH_2CN$ | O |
| D-5411 | Me | single bond | H | c-Pr | Me | $CF_3$ | $CH_2CN$ | O |
| D-5412 | Me(R) | single bond | H | c-Pr | Me | $CF_3$ | $CH_2CN$ | O |
| D-5413 | Me(S) | single bond | H | c-Pr | Me | $CF_3$ | $CH_2CN$ | O |
| D-5414 | H | $CH_2$ | Me | c-Pr | Me | $CF_3$ | $CH_2CN$ | O |
| D-5415 | Me | $CH_2$ | H | c-Pr | Me | $CF_3$ | $CH_2CN$ | O |
| D-5416 | H | CH(Me) | H | c-Pr | Me | $CF_3$ | $CH_2CN$ | O |
| D-5417 | H | $CH_2CH_2$ | Me | c-Pr | Me | $CF_3$ | $CH_2CN$ | O |
| D-5418 | Me | $CH_2CH_2$ | H | c-Pr | Me | $CF_3$ | $CH_2CN$ | O |
| D-5419 | H | single bond | Me | c-Pr | Me | $CF_3$ | $CH_2CN$ | O |
| D-5420 | Me | single bond | H | c-Pr | Me | $CF_3$ | $CH_2CN$ | O |
| D-5421 | Me(R) | single bond | H | c-Pr | Me | $CF_3$ | $CH_2CN$ | O |
| D-5422 | Me(S) | single bond | H | c-Pr | Me | $CF_3$ | $CH_2CN$ | O |
| D-5423 | H | $CH_2$ | Me | c-Pr | Me | $CF_3$ | $CH_2CN$ | O |
| D-5424 | Me | $CH_2$ | H | c-Pr | Me | $CF_3$ | $CH_2CN$ | O |
| D-5425 | H | CH(Me) | H | c-Pr | Me | $CF_3$ | $CH_2CN$ | O |
| D-5426 | H | $CH_2CH_2$ | Me | c-Pr | Me | $CF_3$ | $CH_2CN$ | O |
| D-5427 | Me | $CH_2CH_2$ | H | c-Pr | Me | $CF_3$ | $CH_2CN$ | O |
| D-5428 | H | single bond | Me | c-Pr | Me | $CF_3$ | $CH_2CN$ | O |
| D-5429 | Me | single bond | H | c-Pr | Me | $CF_3$ | $CH_2CN$ | O |
| D-5430 | Me(R) | single bond | H | c-Pr | Me | $CF_3$ | $CH_2CN$ | O |
| D-5431 | Me(S) | single bond | H | c-Pr | Me | $CF_3$ | $CH_2CN$ | O |
| D-5432 | H | $CH_2$ | Me | c-Pr | Me | $CF_3$ | $CH_2CN$ | O |
| D-5433 | Me | $CH_2$ | H | c-Pr | Me | $CF_3$ | $CH_2CN$ | O |
| D-5434 | H | CH(Me) | H | c-Pr | Me | $CF_3$ | $CH_2CN$ | O |
| D-5435 | H | $CH_2CH_2$ | Me | c-Pr | Me | $CF_3$ | $CH_2CN$ | O |
| D-5436 | Me | $CH_2CH_2$ | H | c-Pr | Me | $CF_3$ | $CH_2CN$ | O |
| D-5437 | H | single bond | Me | c-Pr | Me | OMe | $CH_2CN$ | O |
| D-5438 | Me | single bond | H | c-Pr | Me | OMe | $CH_2CN$ | O |
| D-5439 | Me(R) | single bond | H | c-Pr | Me | OMe | $CH_2CN$ | O |
| D-5440 | Me(S) | single bond | H | c-Pr | Me | OMe | $CH_2CN$ | O |
| D-5441 | H | $CH_2$ | Me | c-Pr | Me | OMe | $CH_2CN$ | O |
| D-5442 | Me | $CH_2$ | H | c-Pr | Me | OMe | $CH_2CN$ | O |
| D-5443 | H | CH(Me) | H | c-Pr | Me | OMe | $CH_2CN$ | O |
| D-5444 | H | $CH_2CH_2$ | Me | c-Pr | Me | OMe | $CH_2CN$ | O |
| D-5445 | Me | $CH_2CH_2$ | H | c-Pr | Me | OMe | $CH_2CN$ | O |
| D-5446 | H | single bond | Me | c-Pr | Me | OMe | $CH_2CN$ | O |
| D-5447 | Me | single bond | H | c-Pr | Me | OMe | $CH_2CN$ | O |
| D-5448 | Me(R) | single bond | H | c-Pr | Me | OMe | $CH_2CN$ | O |
| D-5449 | Me(S) | single bond | H | c-Pr | Me | OMe | $CH_2CN$ | O |
| D-5450 | H | $CH_2$ | Me | c-Pr | Me | OMe | $CH_2CN$ | O |

TABLE 769

| Compound Number | Y | W | Z | $R^1$ | $R^2$ | $R^3$ | $R^{10}$ | A |
|---|---|---|---|---|---|---|---|---|
| D-5451 | Me | $CH_2$ | H | c-Pr | Me | OMe | $CH_2CN$ | O |
| D-5452 | H | CH(Me) | H | c-Pr | Me | OMe | $CH_2CN$ | O |
| D-5453 | H | $CH_2CH_2$ | Me | c-Pr | Me | OMe | $CH_2CN$ | O |
| D-5454 | Me | $CH_2CH_2$ | H | c-Pr | Me | OMe | $CH_2CN$ | O |
| D-5455 | H | single bond | Me | c-Pr | Me | OMe | $CH_2CN$ | O |
| D-5456 | Me | single bond | H | c-Pr | Me | OMe | $CH_2CN$ | O |
| D-5457 | Me(R) | single bond | H | c-Pr | Me | OMe | $CH_2CN$ | O |
| D-5458 | Me(S) | single bond | H | c-Pr | Me | OMe | $CH_2CN$ | O |
| D-5459 | H | $CH_2$ | Me | c-Pr | Me | OMe | $CH_2CN$ | O |
| D-5460 | Me | $CH_2$ | H | c-Pr | Me | OMe | $CH_2CN$ | O |
| D-5461 | H | CH(Me) | H | c-Pr | Me | OMe | $CH_2CN$ | O |
| D-5462 | H | $CH_2CH_2$ | Me | c-Pr | Me | OMe | $CH_2CN$ | O |
| D-5463 | Me | $CH_2CH_2$ | H | c-Pr | Me | OMe | $CH_2CN$ | O |
| D-5464 | H | single bond | Me | c-Pr | Me | OMe | $CH_2CN$ | O |
| D-5465 | Me | single bond | H | c-Pr | Me | OMe | $CH_2CN$ | O |
| D-5466 | Me(R) | single bond | H | c-Pr | Me | OMe | $CH_2CN$ | O |
| D-5467 | Me(S) | single bond | H | c-Pr | Me | OMe | $CH_2CN$ | O |
| D-5468 | H | $CH_2$ | Me | c-Pr | Me | OMe | $CH_2CN$ | O |
| D-5469 | Me | $CH_2$ | H | c-Pr | Me | OMe | $CH_2CN$ | O |
| D-5470 | H | CH(Me) | H | c-Pr | Me | OMe | $CH_2CN$ | O |
| D-5471 | H | $CH_2CH_2$ | Me | c-Pr | Me | OMe | $CH_2CN$ | O |
| D-5472 | Me | $CH_2CH_2$ | H | c-Pr | Me | OMe | $CH_2CN$ | O |
| D-5473 | H | single bond | Me | c-Pr | Me | $OCF_3$ | $CH_2CN$ | O |
| D-5474 | Me | single bond | H | c-Pr | Me | $OCF_3$ | $CH_2CN$ | O |
| D-5475 | Me(R) | single bond | H | c-Pr | Me | $OCF_3$ | $CH_2CN$ | O |
| D-5476 | Me(S) | single bond | H | c-Pr | Me | $OCF_3$ | $CH_2CN$ | O |
| D-5477 | H | $CH_2$ | Me | c-Pr | Me | $OCF_3$ | $CH_2CN$ | O |
| D-5478 | Me | $CH_2$ | H | c-Pr | Me | $OCF_3$ | $CH_2CN$ | O |
| D-5479 | H | CH(Me) | H | c-Pr | Me | $OCF_3$ | $CH_2CN$ | O |
| D-5480 | H | $CH_2CH_2$ | Me | c-Pr | Me | $OCF_3$ | $CH_2CN$ | O |
| D-5481 | Me | $CH_2CH_2$ | H | c-Pr | Me | $OCF_3$ | $CH_2CN$ | O |
| D-5482 | H | single bond | Me | c-Pr | Me | $OCF_3$ | $CH_2CN$ | O |
| D-5483 | Me | single bond | H | c-Pr | Me | $OCF_3$ | $CH_2CN$ | O |
| D-5484 | Me(R) | single bond | H | c-Pr | Me | $OCF_3$ | $CH_2CN$ | O |
| D-5485 | Me(S) | single bond | H | c-Pr | Me | $OCF_3$ | $CH_2CN$ | O |
| D-5486 | H | $CH_2$ | Me | c-Pr | Me | $OCF_3$ | $CH_2CN$ | O |
| D-5487 | Me | $CH_2$ | H | c-Pr | Me | $OCF_3$ | $CH_2CN$ | O |
| D-5488 | H | CH(Me) | H | c-Pr | Me | $OCF_3$ | $CH_2CN$ | O |
| D-5489 | H | $CH_2CH_2$ | Me | c-Pr | Me | $OCF_3$ | $CH_2CN$ | O |
| D-5490 | Me | $CH_2CH_2$ | H | c-Pr | Me | $OCF_3$ | $CH_2CN$ | O |
| D-5491 | H | single bond | Me | c-Pr | Me | $OCF_3$ | $CH_2CN$ | O |
| D-5492 | Me | single bond | H | c-Pr | Me | $OCF_3$ | $CH_2CN$ | O |
| D-5493 | Me(R) | single bond | H | c-Pr | Me | $OCF_3$ | $CH_2CN$ | O |
| D-5494 | Me(S) | single bond | H | c-Pr | Me | $OCF_3$ | $CH_2CN$ | O |

TABLE 770

| Compound Number | Y | W | Z | $R^1$ | $R^2$ | $R^3$ | $R^{10}$ | A |
|---|---|---|---|---|---|---|---|---|
| D-5495 | H | $CH_2$ | Me | c-Pr | Me | $OCF_3$ | $CH_2CN$ | O |
| D-5496 | Me | $CH_2$ | H | c-Pr | Me | $OCF_3$ | $CH_2CN$ | O |
| D-5497 | H | CH(Me) | H | c-Pr | Me | $OCF_3$ | $CH_2CN$ | O |
| D-5498 | H | $CH_2CH_2$ | Me | c-Pr | Me | $OCF_3$ | $CH_2CN$ | O |
| D-5499 | Me | $CH_2CH_2$ | H | c-Pr | Me | $OCF_3$ | $CH_2CN$ | O |
| D-5500 | H | single bond | Me | c-Pr | Me | $OCF_3$ | $CH_2CN$ | O |
| D-5501 | Me | single bond | H | c-Pr | Me | $OCF_3$ | $CH_2CN$ | O |
| D-5502 | Me(R) | single bond | H | c-Pr | Me | $OCF_3$ | $CH_2CN$ | O |
| D-5503 | Me(S) | single bond | H | c-Pr | Me | $OCF_3$ | $CH_2CN$ | O |
| D-5504 | H | $CH_2$ | Me | c-Pr | Me | $OCF_3$ | $CH_2CN$ | O |
| D-5505 | Me | $CH_2$ | H | c-Pr | Me | $OCF_3$ | $CH_2CN$ | O |
| D-5506 | H | CH(Me) | H | c-Pr | Me | $OCF_3$ | $CH_2CN$ | O |
| D-5507 | H | $CH_2CH_2$ | Me | c-Pr | Me | $OCF_3$ | $CH_2CN$ | O |
| D-5508 | Me | $CH_2CH_2$ | H | c-Pr | Me | $OCF_3$ | $CH_2CN$ | O |
| D-5509 | H | single bond | Me | c-Pr | C(=O)Me | Br | H | O |
| D-5510 | Me | single bond | H | c-Pr | C(=O)Me | Br | H | O |
| D-5511 | Me(R) | single bond | H | c-Pr | C(=O)Me | Br | H | O |
| D-5512 | Me(S) | single bond | H | c-Pr | C(=O)Me | Br | H | O |
| D-5513 | H | $CH_2$ | Me | c-Pr | C(=O)Me | Br | H | O |
| D-5514 | Me | $CH_2$ | H | c-Pr | C(=O)Me | Br | H | O |
| D-5515 | H | CH(Me) | H | c-Pr | C(=O)Me | Br | H | O |
| D-5516 | H | $CH_2CH_2$ | Me | c-Pr | C(=O)Me | Br | H | O |
| D-5517 | Me | $CH_2CH_2$ | H | c-Pr | C(=O)Me | Br | H | O |
| D-5518 | H | single bond | Me | c-Pr | C(=O)Me | Br | H | O |

TABLE 770-continued

| Compound Number | Y | W | Z | $R^1$ | $R^2$ | $R^3$ | $R^{10}$ | A |
|---|---|---|---|---|---|---|---|---|
| D-5519 | Me | single bond | H | c-Pr | C(═O)Me | Br | H | O |
| D-5520 | Me(R) | single bond | H | c-Pr | C(═O)Me | Br | H | O |
| D-5521 | Me(S) | single bond | H | c-Pr | C(═O)Me | Br | H | O |
| D-5522 | H | $CH_2$ | Me | c-Pr | C(═O)Me | Br | H | O |
| D-5523 | Me | $CH_2$ | H | c-Pr | C(═O)Me | Br | H | O |
| D-5524 | H | CH(Me) | H | c-Pr | C(═O)Me | Br | H | O |
| D-5525 | H | $CH_2CH_2$ | Me | c-Pr | C(═O)Me | Br | H | O |
| D-5526 | Me | $CH_2CH_2$ | H | c-Pr | C(═O)Me | Br | H | O |
| D-5527 | H | single bond | Me | c-Pr | C(═O)Me | Br | H | O |
| D-5528 | Me | single bond | H | c-Pr | C(═O)Me | Br | H | O |
| D-5529 | Me(R) | single bond | H | c-Pr | C(═O)Me | Br | H | O |
| D-5530 | Me(S) | single bond | H | c-Pr | C(═O)Me | Br | H | O |
| D-5531 | H | $CH_2$ | Me | c-Pr | C(═O)Me | Br | H | O |
| D-5532 | Me | $CH_2$ | H | c-Pr | C(═O)Me | Br | H | O |
| D-5533 | H | CH(Me) | H | c-Pr | C(═O)Me | Br | H | O |
| D-5534 | H | $CH_2CH_2$ | Me | c-Pr | C(═O)Me | Br | H | O |
| D-5535 | Me | $CH_2CH_2$ | H | c-Pr | C(═O)Me | Br | H | O |
| D-5536 | H | single bond | Me | c-Pr | C(═O)Me | Br | H | O |
| D-5537 | Me | single bond | H | c-Pr | C(═O)Me | Br | H | O |
| D-5538 | Me(R) | single bond | H | c-Pr | C(═O)Me | Br | H | O |

TABLE 771

| Compound Number | Y | W | Z | $R^1$ | $R^2$ | $R^3$ | $R^{10}$ | A |
|---|---|---|---|---|---|---|---|---|
| D-5539 | Me(S) | single bond | H | c-Pr | C(═O)Me | Br | H | O |
| D-5540 | H | $CH_2$ | Me | c-Pr | C(═O)Me | Br | H | O |
| D-5541 | Me | $CH_2$ | H | c-Pr | C(═O)Me | Br | H | O |
| D-5542 | H | CH(Me) | H | c-Pr | C(═O)Me | Br | H | O |
| D-5543 | H | $CH_2CH_2$ | Me | c-Pr | C(═O)Me | Br | H | O |
| D-5544 | Me | $CH_2CH_2$ | H | c-Pr | C(═O)Me | Br | H | O |
| D-5545 | H | single bond | Me | c-Pr | C(═O)Me | $CF_3$ | H | O |
| D-5546 | Me | single bond | H | c-Pr | C(═O)Me | $CF_3$ | H | O |
| D-5547 | Me(R) | single bond | H | c-Pr | C(═O)Me | $CF_3$ | H | O |
| D-5548 | Me(S) | single bond | H | c-Pr | C(═O)Me | $CF_3$ | H | O |
| D-5549 | H | $CH_2$ | Me | c-Pr | C(═O)Me | $CF_3$ | H | O |
| D-5550 | Me | $CH_2$ | H | c-Pr | C(═O)Me | $CF_3$ | H | O |
| D-5551 | H | CH(Me) | H | c-Pr | C(═O)Me | $CF_3$ | H | O |
| D-5552 | H | $CH_2CH_2$ | Me | c-Pr | C(═O)Me | $CF_3$ | H | O |
| D-5553 | Me | $CH_2CH_2$ | H | c-Pr | C(═O)Me | $CF_3$ | H | O |
| D-5554 | H | single bond | Me | c-Pr | C(═O)Me | $CF_3$ | H | O |
| D-5555 | Me | single bond | H | c-Pr | C(═O)Me | $CF_3$ | H | O |
| D-5556 | Me(R) | single bond | H | c-Pr | C(═O)Me | $CF_3$ | H | O |
| D-5557 | Me(S) | single bond | H | c-Pr | C(═O)Me | $CF_3$ | H | O |
| D-5558 | H | $CH_2$ | Me | c-Pr | C(═O)Me | $CF_3$ | H | O |
| D-5559 | Me | $CH_2$ | H | c-Pr | C(═O)Me | $CF_3$ | H | O |
| D-5560 | H | CH(Me) | H | c-Pr | C(═O)Me | $CF_3$ | H | O |
| D-5561 | H | $CH_2CH_2$ | Me | c-Pr | C(═O)Me | $CF_3$ | H | O |
| D-5562 | Me | $CH_2CH_2$ | H | c-Pr | C(═O)Me | $CF_3$ | H | O |
| D-5563 | H | single bond | Me | c-Pr | C(═O)Me | $CF_3$ | H | O |
| D-5564 | Me | single bond | H | c-Pr | C(═O)Me | $CF_3$ | H | O |
| D-5565 | Me(R) | single bond | H | c-Pr | C(═O)Me | $CF_3$ | H | O |
| D-5566 | Me(S) | single bond | H | c-Pr | C(═O)Me | $CF_3$ | H | O |
| D-5567 | H | $CH_2$ | Me | c-Pr | C(═O)Me | $CF_3$ | H | O |
| D-5568 | Me | $CH_2$ | H | c-Pr | C(═O)Me | $CF_3$ | H | O |
| D-5569 | H | CH(Me) | H | c-Pr | C(═O)Me | $CF_3$ | H | O |
| D-5570 | H | $CH_2CH_2$ | Me | c-Pr | C(═O)Me | $CF_3$ | H | O |
| D-5571 | Me | $CH_2CH_2$ | H | c-Pr | C(═O)Me | $CF_3$ | H | O |
| D-5572 | H | single bond | Me | c-Pr | C(═O)Me | $CF_3$ | H | O |
| D-5573 | Me | single bond | H | c-Pr | C(═O)Me | $CF_3$ | H | O |
| D-5574 | Me(R) | single bond | H | c-Pr | C(═O)Me | $CF_3$ | H | O |
| D-5575 | Me(S) | single bond | H | c-Pr | C(═O)Me | $CF_3$ | H | O |
| D-5576 | H | $CH_2$ | Me | c-Pr | C(═O)Me | $CF_3$ | H | O |
| D-5577 | Me | $CH_2$ | H | c-Pr | C(═O)Me | $CF_3$ | H | O |
| D-5578 | H | CH(Me) | H | c-Pr | C(═O)Me | $CF_3$ | H | O |
| D-5579 | H | $CH_2CH_2$ | Me | c-Pr | C(═O)Me | $CF_3$ | H | O |
| D-5580 | Me | $CH_2CH_2$ | H | c-Pr | C(═O)Me | $CF_3$ | H | O |
| D-5581 | H | single bond | Me | c-Pr | C(═O)Me | OMe | H | O |
| D-5582 | Me | single bond | H | c-Pr | C(═O)Me | OMe | H | O |

TABLE 772

| Compound Number | Y | W | Z | $R^1$ | $R^2$ | $R^3$ | $R^{10}$ | A |
|---|---|---|---|---|---|---|---|---|
| D-5583 | Me(R) | single bond | H | c-Pr | C(═O)Me | OMe | H | O |
| D-5584 | Me(S) | single bond | H | c-Pr | C(═O)Me | OMe | H | O |
| D-5585 | H | $CH_2$ | Me | c-Pr | C(═O)Me | OMe | H | O |
| D-5586 | Me | $CH_2$ | H | c-Pr | C(═O)Me | OMe | H | O |
| D-5587 | H | CH(Me) | H | c-Pr | C(═O)Me | OMe | H | O |
| D-5588 | H | $CH_2CH_2$ | Me | c-Pr | C(═O)Me | OMe | H | O |
| D-5589 | Me | $CH_2CH_2$ | H | c-Pr | C(═O)Me | OMe | H | O |
| D-5590 | H | single bond | Me | c-Pr | C(═O)Me | OMe | H | O |
| D-5591 | Me | single bond | H | c-Pr | C(═O)Me | OMe | H | O |
| D-5592 | Me(R) | single bond | H | c-Pr | C(═O)Me | OMe | H | O |
| D-5593 | Me(S) | single bond | H | c-Pr | C(═O)Me | OMe | H | O |
| D-5594 | H | $CH_2$ | Me | c-Pr | C(═O)Me | OMe | H | O |
| D-5595 | Me | $CH_2$ | H | c-Pr | C(═O)Me | OMe | H | O |
| D-5596 | H | CH(Me) | H | c-Pr | C(═O)Me | OMe | H | O |
| D-5597 | H | $CH_2CH_2$ | Me | c-Pr | C(═O)Me | OMe | H | O |
| D-5598 | Me | $CH_2CH_2$ | H | c-Pr | C(═O)Me | OMe | H | O |
| D-5599 | H | single bond | Me | c-Pr | C(═O)Me | OMe | H | O |
| D-5600 | Me | single bond | H | c-Pr | C(═O)Me | OMe | H | O |
| D-5601 | Me(R) | single bond | H | c-Pr | C(═O)Me | OMe | H | O |
| D-5602 | Me(S) | single bond | H | c-Pr | C(═O)Me | OMe | H | O |
| D-5603 | H | $CH_2$ | Me | c-Pr | C(═O)Me | OMe | H | O |
| D-5604 | Me | $CH_2$ | H | c-Pr | C(═O)Me | OMe | H | O |
| D-5605 | H | CH(Me) | H | c-Pr | C(═O)Me | OMe | H | O |
| D-5606 | H | $CH_2CH_2$ | Me | C-Pr | C(═O)Me | OMe | H | O |
| D-5607 | Me | $CH_2CH_2$ | H | c-Pr | C(═O)Me | OMe | H | O |
| D-5608 | H | single bond | Me | c-Pr | C(═O)Me | OMe | H | O |
| D-5609 | Me | single bond | H | c-Pr | C(═O)Me | OMe | H | O |
| D-5610 | Me(R) | single bond | H | c-Pr | C(═O)Me | OMe | H | O |
| D-5611 | Me(S) | single bond | H | c-Pr | C(═O)Me | OMe | H | O |
| D-5612 | H | $CH_2$ | Me | c-Pr | C(═O)Me | OMe | H | O |
| D-5613 | Me | $CH_2$ | H | c-Pr | C(═O)Me | OMe | H | O |
| D-5614 | H | CH(Me) | H | c-Pr | C(═O)Me | OMe | H | O |
| D-5615 | H | $CH_2CH_2$ | Me | c-Pr | C(═O)Me | OMe | H | O |
| D-5616 | Me | $CH_2CH_2$ | H | c-Pr | C(═O)Me | OMe | H | O |
| D-5617 | H | single bond | Me | c-Pr | C(═O)Me | $OCF_3$ | H | O |
| D-5618 | Me | single bond | H | c-Pr | C(═O)Me | $OCF_3$ | H | O |
| D-5619 | Me(R) | single bond | H | c-Pr | C(═O)Me | $OCF_3$ | H | O |
| D-5620 | Me(S) | single bond | H | c-Pr | C(═O)Me | $OCF_3$ | H | O |
| D-5621 | H | $CH_2$ | Me | c-Pr | C(═O)Me | $OCF_3$ | H | O |
| D-5622 | Me | $CH_2$ | H | c-Pr | C(═O)Me | $OCF_3$ | H | O |
| D-5623 | H | CH(Me) | H | c-Pr | C(═O)Me | $OCF_3$ | H | O |
| D-5624 | H | $CH_2CH_2$ | Me | c-Pr | C(═O)Me | $OCF_3$ | H | O |
| D-5625 | Me | $CH_2CH_2$ | H | c-Pr | C(═O)Me | $OCF_3$ | H | O |
| D-5626 | H | single bond | Me | c-Pr | C(═O)Me | $OCF_3$ | H | O |

TABLE 773

| Compound Number | Y | W | Z | $R^1$ | $R^2$ | $R^3$ | $R^{10}$ | A |
|---|---|---|---|---|---|---|---|---|
| D-5627 | Me | single bond | H | c-Pr | C(=O)Me | $OCF_3$ | H | O |
| D-5628 | Me(R) | single bond | H | c-Pr | C(=O)Me | $OCF_3$ | H | O |
| D-5629 | Me(S) | single bond | H | c-Pr | C(=O)Me | $OCF_3$ | H | O |
| D-5630 | H | $CH_2$ | Me | c-Pr | C(=O)Me | $OCF_3$ | H | O |
| D-5631 | Me | $CH_2$ | H | c-Pr | C(=O)Me | $OCF_3$ | H | O |
| D-5632 | H | CH(Me) | H | c-Pr | C(=O)Me | $OCF_3$ | H | O |
| D-5633 | H | $CH_2CH_2$ | Me | c-Pr | C(=O)Me | $OCF_3$ | H | O |
| D-5634 | Me | $CH_2CH_2$ | H | c-Pr | C(=O)Me | $OCF_3$ | H | O |
| D-5635 | H | single bond | Me | c-Pr | C(=O)Me | $OCF_3$ | H | O |
| D-5636 | Me | single bond | H | c-Pr | C(=O)Me | $OCF_3$ | H | O |
| D-5637 | Me(R) | single bond | H | c-Pr | C(=O)Me | $OCF_3$ | H | O |
| D-5638 | Me(S) | single bond | H | c-Pr | C(=O)Me | $OCF_3$ | H | O |
| D-5639 | H | $CH_2$ | Me | c-Pr | C(=O)Me | $OCF_3$ | H | O |
| D-5640 | Me | $CH_2$ | H | c-Pr | C(=O)Me | $OCF_3$ | H | O |
| D-5641 | H | CH(Me) | H | c-Pr | C(=O)Me | $OCF_3$ | H | O |
| D-5642 | H | $CH_2CH_2$ | Me | c-Pr | C(=O)Me | $OCF_3$ | H | O |
| D-5643 | Me | $CH_2CH_2$ | H | c-Pr | C(=O)Me | $OCF_3$ | H | O |
| D-5644 | H | single bond | Me | c-Pr | C(=O)Me | $OCF_3$ | H | O |
| D-5645 | Me | single bond | H | c-Pr | C(=O)Me | $OCF_3$ | H | O |
| D-5646 | Me(R) | single bond | H | c-Pr | C(=O)Me | $OCF_3$ | H | O |
| D-5647 | Me(S) | single bond | H | c-Pr | C(=O)Me | $OCF_3$ | H | O |
| D-5648 | H | $CH_2$ | Me | c-Pr | C(=O)Me | $OCF_3$ | H | O |
| D-5649 | Me | $CH_2$ | H | c-Pr | C(=O)Me | $OCF_3$ | H | O |
| D-5650 | H | CH(Me) | H | c-Pr | C(=O)Me | $OCF_3$ | H | O |
| D-5651 | H | $CH_2CH_2$ | Me | c-Pr | C(=O)Me | $OCF_3$ | H | O |
| D-5652 | Me | $CH_2CH_2$ | H | c-Pr | C(=O)Me | $OCF_3$ | H | O |
| D-5653 | H | single bond | Me | c-Pr | C(=O)Me | Br | Me | O |
| D-5654 | Me | single bond | H | c-Pr | C(=O)Me | Br | Me | O |
| D-5655 | Me(R) | single bond | H | c-Pr | C(=O)Me | Br | Me | O |
| D-5656 | Me(S) | single bond | H | c-Pr | C(=O)Me | Br | Me | O |
| D-5657 | H | $CH_2$ | Me | c-Pr | C(=O)Me | Br | Me | O |
| D-5658 | Me | $CH_2$ | H | c-Pr | C(=O)Me | Br | Me | O |
| D-5659 | H | CH(Me) | H | c-Pr | C(=O)Me | Br | Me | O |
| D-5660 | H | $CH_2CH_2$ | Me | c-Pr | C(=O)Me | Br | Me | O |
| D-5661 | Me | $CH_2CH_2$ | H | c-Pr | C(=O)Me | Br | Me | O |
| D-5662 | H | single bond | Me | c-Pr | C(=O)Me | Br | Me | O |
| D-5663 | Me | single bond | H | c-Pr | C(=O)Me | Br | Me | O |
| D-5664 | Me(R) | single bond | H | c-Pr | C(=O)Me | Br | Me | O |
| D-5665 | Me(S) | single bond | H | c-Pr | C(=O)Me | Br | Me | O |
| D-5666 | H | $CH_2$ | Me | c-Pr | C(=O)Me | Br | Me | O |
| D-5667 | Me | $CH_2$ | H | c-Pr | C(=O)Me | Br | Me | O |
| D-5668 | H | CH(Me) | H | c-Pr | C(=O)Me | Br | Me | O |
| D-5669 | H | $CH_2CH_2$ | Me | c-Pr | C(=O)Me | Br | Me | O |
| D-5670 | Me | $CH_2CH_2$ | H | c-Pr | C(=O)Me | Br | Me | O |

TABLE 774

| Compound Number | Y | W | Z | $R^1$ | $R^2$ | $R^3$ | $R^{10}$ | A |
|---|---|---|---|---|---|---|---|---|
| D-5671 | H | single bond | Me | c-Pr | C(=O)Me | Br | Me | O |
| D-5672 | Me | single bond | H | c-Pr | C(=O)Me | Br | Me | O |
| D-5673 | Me(R) | single bond | H | c-Pr | C(=O)Me | Br | Me | O |
| D-5674 | Me(S) | single bond | H | c-Pr | C(=O)Me | Br | Me | O |
| D-5675 | H | $CH_2$ | Me | c-Pr | C(=O)Me | Br | Me | O |
| D-5676 | Me | $CH_2$ | H | c-Pr | C(=O)Me | Br | Me | O |
| D-5677 | H | CH(Me) | H | c-Pr | C(=O)Me | Br | Me | O |
| D-5678 | H | $CH_2CH_2$ | Me | c-Pr | C(=O)Me | Br | Me | O |
| D-5679 | Me | $CH_2CH_2$ | H | c-Pr | C(=O)Me | Br | Me | O |
| D-5680 | H | single bond | Me | c-Pr | C(=O)Me | Br | Me | O |
| D-5681 | Me | single bond | H | c-Pr | C(=O)Me | Br | Me | O |
| D-5682 | Me(R) | single bond | H | c-Pr | C(=O)Me | Br | Me | O |
| D-5683 | Me(S) | single bond | H | c-Pr | C(=O)Me | Br | Me | O |
| D-5684 | H | $CH_2$ | Me | c-Pr | C(=O)Me | Br | Me | O |
| D-5685 | Me | $CH_2$ | H | c-Pr | C(=O)Me | Br | Me | O |
| D-5686 | H | CH(Me) | H | c-Pr | C(=O)Me | Br | Me | O |
| D-5687 | H | $CH_2CH_2$ | Me | c-Pr | C(=O)Me | Br | Me | O |
| D-5688 | Me | $CH_2CH_2$ | H | c-Pr | C(=O)Me | Br | Me | O |
| D-5689 | H | single bond | Me | c-Pr | C(=O)Me | $CF_3$ | Me | O |
| D-5690 | Me | single bond | H | c-Pr | C(=O)Me | $CF_3$ | Me | O |
| D-5691 | Me(R) | single bond | H | c-Pr | C(=O)Me | $CF_3$ | Me | O |
| D-5692 | Me(S) | single bond | H | c-Pr | C(=O)Me | $CF_3$ | Me | O |
| D-5693 | H | $CH_2$ | Me | c-Pr | C(=O)Me | $CF_3$ | Me | O |
| D-5694 | Me | $CH_2$ | H | c-Pr | C(=O)Me | $CF_3$ | Me | O |

TABLE 774-continued

| Compound Number | Y | W | Z | $R^1$ | $R^2$ | $R^3$ | $R^{10}$ | A |
|---|---|---|---|---|---|---|---|---|
| D-5695 | H | CH(Me) | H | c-Pr | C(=O)Me | $CF_3$ | Me | O |
| D-5696 | H | $CH_2CH_2$ | Me | c-Pr | C(=O)Me | CF | Me | O |
| D-5697 | Me | $CH_2CH_2$ | H | c-Pr | C(=O)Me | $CF_3$ | Me | O |
| D-5698 | H | single bond | Me | c-Pr | C(=O)Me | $CF_3$ | Me | O |
| D-5699 | Me | single bond | H | c-Pr | C(=O)Me | CF | Me | O |
| D-5700 | Me(R) | single bond | H | c-Pr | C(=O)Me | $CF_3$ | Me | O |
| D-5701 | Me(S) | single bond | H | c-Pr | C(=O)Me | $CF_3$ | Me | O |
| D-5702 | H | $CH_2$ | Me | c-Pr | C(=O)Me | $CF_3$ | Me | O |
| D-5703 | Me | $CH_2$ | H | c-Pr | C(=O)Me | $CF_3$ | Me | O |
| D-5704 | H | CH(Me) | H | c-Pr | C(=O)Me | $CF_3$ | Me | O |
| D-5705 | H | $CH_2CH_2$ | Me | c-Pr | C(=O)Me | $CF_3$ | Me | O |
| D-5706 | Me | $CH_2CH_2$ | H | c-Pr | C(=O)Me | $CF_3$ | Me | O |
| D-5707 | H | single bond | Me | c-Pr | C(=O)Me | $CF_3$ | Me | O |
| D-5708 | Me | single bond | H | c-Pr | C(=O)Me | $CF_3$ | Me | O |
| D-5709 | Me(R) | single bond | H | c-Pr | C(=O)Me | $CF_3$ | Me | O |
| D-5710 | Me(S) | single bond | H | c-Pr | C(=O)Me | $CF_3$ | Me | O |
| D-5711 | H | $CH_2$ | Me | c-Pr | C(=O)Me | $CF_3$ | Me | O |
| D-5712 | Me | $CH_2$ | H | c-Pr | C(=O)Me | $CF_3$ | Me | O |
| D-5713 | H | CH(Me) | H | c-Pr | C(=O)Me | $CF_3$ | Me | O |
| D-5714 | H | $CH_2CH_2$ | Me | c-Pr | C(=O)Me | $CF_3$ | Me | O |

TABLE 775

| Compound Number | Y | W | Z | $R^1$ | $R^2$ | $R^3$ | $R^{10}$ | A |
|---|---|---|---|---|---|---|---|---|
| D-5715 | Me | $CH_2CH_2$ | H | c-Pr | C(=O)Me | $CF_3$ | Me | O |
| D-5716 | H | single bond | Me | c-Pr | C(=O)Me | $CF_3$ | Me | O |
| D-5717 | Me | single bond | H | c-Pr | C(=O)Me | $CF_3$ | Me | O |
| D-5718 | Me(R) | single bond | H | c-Pr | C(=O)Me | $CF_3$ | Me | O |
| D-5719 | Me(S) | single bond | H | c-Pr | C(=O)Me | $CF_3$ | Me | O |
| D-5720 | H | $CH_2$ | Me | c-Pr | C(=O)Me | $CF_3$ | Me | O |
| D-5721 | Me | $CH_2$ | H | c-Pr | C(=O)Me | $CF_3$ | Me | O |
| D-5722 | H | CH(Me) | H | c-Pr | C(=O)Me | $CF_3$ | Me | O |
| D-5723 | H | $CH_2CH_2$ | Me | c-Pr | C(=O)Me | $CF_3$ | Me | O |
| D-5724 | Me | $CH_2CH_2$ | H | c-Pr | C(=O)Me | $CF_3$ | Me | O |
| D-5725 | H | single bond | Me | c-Pr | C(=O)Me | OMe | Me | O |
| D-5726 | Me | single bond | H | c-Pr | C(=O)Me | OMe | Me | O |
| D-5727 | Me(R) | single bond | H | c-Pr | C(=O)Me | OMe | Me | O |
| D-5728 | Me(S) | single bond | H | c-Pr | C(=O)Me | OMe | Me | O |
| D-5729 | H | $CH_2$ | Me | c-Pr | C(=O)Me | OMe | Me | O |
| D-5730 | Me | $CH_2$ | H | c-Pr | C(=O)Me | OMe | Me | O |
| D-5731 | H | CH(Me) | H | c-Pr | C(=O)Me | OMe | Me | O |
| D-5732 | H | $CH_2CH_2$ | Me | c-Pr | C(=O)Me | OMe | Me | O |
| D-5733 | Me | $CH_2CH_2$ | H | c-Pr | C(=O)Me | OMe | Me | O |
| D-5734 | H | single bond | Me | c-Pr | C(=O)Me | OMe | Me | O |
| D-5735 | Me | single bond | H | c-Pr | C(=O)Me | OMe | Me | O |
| D-5736 | Me(R) | single bond | H | c-Pr | C(=O)Me | OMe | Me | O |
| D-5737 | Me(S) | single bond | H | c-Pr | C(=O)Me | OMe | Me | O |
| D-5738 | H | $CH_2$ | Me | c-Pr | C(=O)Me | OMe | Me | O |
| D-5739 | Me | $CH_2$ | H | c-Pr | C(=O)Me | OMe | Me | O |
| D-5740 | H | CH(Me) | H | c-Pr | C(=O)Me | OMe | Me | O |
| D-5741 | H | $CH_2CH_2$ | Me | c-Pr | C(=O)Me | OMe | Me | O |
| D-5742 | Me | $CH_2CH_2$ | H | c-Pr | C(=O)Me | OMe | Me | O |
| D-5743 | H | single bond | Me | c-Pr | C(=O)Me | OMe | Me | O |
| D-5744 | Me | single bond | H | c-Pr | C(=O)Me | OMe | Me | O |
| D-5745 | Me(R) | single bond | H | c-Pr | C(=O)Me | OMe | Me | O |
| D-5746 | Me(S) | single bond | H | c-Pr | C(=O)Me | OMe | Me | O |
| D-5747 | H | $CH_2$ | Me | c-Pr | C(=O)Me | OMe | Me | O |
| D-5748 | Me | $CH_2$ | H | c-Pr | C(=O)Me | OMe | Me | O |
| D-5749 | H | CH(Me) | H | c-Pr | C(=O)Me | OMe | Me | O |
| D-5750 | H | $CH_2CH_2$ | Me | c-Pr | C(=O)Me | OMe | Me | O |
| D-5751 | Me | $CH_2CH_2$ | H | c-Pr | C(=O)Me | OMe | Me | O |
| D-5752 | H | single bond | Me | c-Pr | C(=O)Me | OMe | Me | O |
| D-5753 | Me | single bond | H | c-Pr | C(=O)Me | OMe | Me | O |
| D-5754 | Me(R) | single bond | H | c-Pr | C(=O)Me | OMe | Me | O |
| D-5755 | Me(S) | single bond | H | c-Pr | C(=O)Me | OMe | Me | O |
| D-5756 | H | $CH_2$ | Me | c-Pr | C(=O)Me | OMe | Me | O |
| D-5757 | Me | $CH_2$ | H | c-Pr | C(=O)Me | OMe | Me | O |
| D-5758 | H | CH(Me) | H | c-Pr | C(=O)Me | OMe | Me | O |

TABLE 776

| Compound Number | Y | W | Z | $R^1$ | $R^2$ | $R^3$ | $R^{10}$ | A |
|---|---|---|---|---|---|---|---|---|
| D-5759 | H | $CH_2CH_2$ | Me | c-Pr | C(=O)Me | OMe | Me | O |
| D-5760 | Me | $CH_2CH_2$ | H | c-Pr | C(=O)Me | OMe | Me | O |
| D-5761 | H | single bond | Me | c-Pr | C(=O)Me | $OCF_3$ | Me | O |
| D-5762 | Me | single bond | H | c-Pr | C(=O)Me | $OCF_3$ | Me | O |
| D-5763 | Me(R) | single bond | H | c-Pr | C(=O)Me | $OCF_3$ | Me | O |
| D-5764 | Me(S) | single bond | H | c-Pr | C(=O)Me | $OCF_3$ | Me | O |
| D-5765 | H | $CH_2$ | Me | c-Pr | C(=O)Me | $OCF_3$ | Me | O |
| D-5766 | Me | $CH_2$ | H | c-Pr | C(=O)Me | $OCF_3$ | Me | O |
| D-5767 | H | CH(Me) | H | c-Pr | C(=O)Me | $OCF_3$ | Me | O |
| D-5768 | H | $CH_2CH_2$ | Me | c-Pr | C(=O)Me | $OCF_3$ | Me | O |
| D-5769 | Me | $CH_2CH_2$ | H | c-Pr | C(=O)Me | $OCF_3$ | Me | O |
| D-5770 | H | single bond | Me | c-Pr | C(=O)Me | $OCF_3$ | Me | O |
| D-5771 | Me | single bond | H | c-Pr | C(=O)Me | $OCF_3$ | Me | O |
| D-5772 | Me(R) | single bond | H | c-Pr | C(=O)Me | $OCF_3$ | Me | O |
| D-5773 | Me(S) | single bond | H | c-Pr | C(=O)Me | $OCF_3$ | Me | O |
| D-5774 | H | $CH_2$ | Me | c-Pr | C(=O)Me | $OCF_3$ | Me | O |
| D-5775 | Me | $CH_2$ | H | c-Pr | C(=O)Me | $OCF_3$ | Me | O |
| D-5776 | H | CH(Me) | H | c-Pr | C(=O)Me | $OCF_3$ | Me | O |
| D-5777 | H | $CH_2CH_2$ | Me | c-Pr | C(=O)Me | $OCF_3$ | Me | O |
| D-5778 | Me | $CH_2CH_2$ | H | c-Pr | C(=O)Me | $OCF_3$ | Me | O |
| D-5779 | H | single bond | Me | c-Pr | C(=O)Me | $OCF_3$ | Me | O |
| D-5780 | Me | single bond | H | c-Pr | C(=O)Me | $OCF_3$ | Me | O |
| D-5781 | Me(R) | single bond | H | c-Pr | C(=O)Me | $OCF_3$ | Me | O |
| D-5782 | Me(S) | single bond | H | c-Pr | C(=O)Me | $OCF_3$ | Me | O |
| D-5783 | H | $CH_2$ | Me | c-Pr | C(=O)Me | $OCF_3$ | Me | O |
| D-5784 | Me | $CH_2$ | H | c-Pr | C(=O)Me | $OCF_3$ | Me | O |
| D-5785 | H | CH(Me) | H | c-Pr | C(=O)Me | $OCF_3$ | Me | O |
| D-5786 | H | $CH_2CH_2$ | Me | c-Pr | C(=O)Me | $OCF_3$ | Me | O |
| D-5787 | Me | $CH_2CH_2$ | H | c-Pr | C(=O)Me | $OCF_3$ | Me | O |
| D-5788 | H | single bond | Me | c-Pr | C(=O)Me | $OCF_3$ | Me | O |
| D-5789 | Me | single bond | H | c-Pr | C(=O)Me | $OCF_3$ | Me | O |
| D-5790 | Me(R) | single bond | H | c-Pr | C(=O)Me | $OCF_3$ | Me | O |
| D-5791 | Me(S) | single bond | H | c-Pr | C(=O)Me | $OCF_3$ | Me | O |
| D-5792 | H | $CH_2$ | Me | c-Pr | C(=O)Me | $OCF_3$ | Me | O |
| D-5793 | Me | $CH_2$ | H | c-Pr | C(=O)Me | $OCF_3$ | Me | O |
| D-5794 | H | CH(Me) | H | c-Pr | C(=O)Me | $OCF_3$ | Me | O |
| D-5795 | H | $CH_2CH_2$ | Me | c-Pr | C(=O)Me | $OCF_3$ | Me | O |
| D-5796 | Me | $CH_2CH_2$ | H | c-Pr | C(=O)Me | $OCF_3$ | Me | O |
| D-5797 | H | single bond | Me | c-Pr | C(=O)Me | Br | $CH_2OMe$ | O |
| D-5798 | Me | single bond | H | c-Pr | C(=O)Me | Br | $CH_2OMe$ | O |
| D-5799 | Me(R) | single bond | H | c-Pr | C(=O)Me | Br | $CH_2OMe$ | O |
| D-5800 | Me(S) | single bond | H | c-Pr | C(=O)Me | Br | $CH_2OMe$ | O |
| D-5801 | H | $CH_2$ | Me | c-Pr | C(=O)Me | Br | $CH_2OMe$ | O |
| D-5802 | Me | $CH_2$ | H | c-Pr | C(=O)Me | Br | $CH_2OMe$ | O |

TABLE 777

| Compound Number | Y | W | Z | $R^1$ | $R^2$ | $R^3$ | $R^{10}$ | A |
|---|---|---|---|---|---|---|---|---|
| D-5803 | H | CH(Me) | H | c-Pr | C(=O)Me | Br | $CH_2OMe$ | O |
| D-5804 | H | $CH_2CH_2$ | Me | c-Pr | C(=O)Me | Br | $CH_2OMe$ | O |
| D-5805 | Me | $CH_2CH_2$ | H | c-Pr | C(=O)Me | Br | $CH_2OMe$ | O |
| D-5806 | H | single bond | Me | c-Pr | C(=O)Me | Br | $CH_2OMe$ | O |
| D-5807 | Me | single bond | H | c-Pr | C(=O)Me | Br | $CH_2OMe$ | O |
| D-5808 | Me(R) | single bond | H | c-Pr | C(=O)Me | Br | $CH_2OMe$ | O |
| D-5809 | Me(S) | single bond | H | c-Pr | C(=O)Me | Br | $CH_2OMe$ | O |
| D-5810 | H | $CH_2$ | Me | c-Pr | C(=O)Me | Br | $CH_2OMe$ | O |
| D-5811 | Me | $CH_2$ | H | c-Pr | C(=O)Me | Br | $CH_2OMe$ | O |
| D-5812 | H | CH(Me) | H | c-Pr | C(=O)Me | Br | $CH_2OMe$ | O |
| D-5813 | H | $CH_2CH_2$ | Me | c-Pr | C(=O)Me | Br | $CH_2OMe$ | O |
| D-5814 | Me | $CH_2CH_2$ | H | c-Pr | C(=O)Me | Br | $CH_2OMe$ | O |
| D-5815 | H | single bond | Me | c-Pr | C(=O)Me | Br | $CH_2OMe$ | O |
| D-5816 | Me | single bond | H | c-Pr | C(=O)Me | Br | $CH_2OMe$ | O |
| D-5817 | Me(R) | single bond | H | c-Pr | C(=O)Me | Br | $CH_2OMe$ | O |
| D-5818 | Me(S) | single bond | H | c-Pr | C(=O)Me | Br | $CH_2OMe$ | O |
| D-5819 | H | $CH_2$ | Me | c-Pr | C(=O)Me | Br | $CH_2OMe$ | O |
| D-5820 | Me | $CH_2$ | H | c-Pr | C(=O)Me | Br | $CH_2OMe$ | O |
| D-5821 | H | CH(Me) | H | c-Pr | C(=O)Me | Br | $CH_2OMe$ | O |
| D-5822 | H | $CH_2CH_2$ | Me | c-Pr | C(=O)Me | Br | $CH_2OMe$ | O |
| D-5823 | Me | $CH_2CH_2$ | H | c-Pr | C(=O)Me | Br | $CH_2OMe$ | O |
| D-5824 | H | single bond | Me | c-Pr | C(=O)Me | Br | $CH_2OMe$ | O |
| D-5825 | Me | single bond | H | c-Pr | C(=O)Me | Br | $CH_2OMe$ | O |

TABLE 777-continued

| Compound Number | Y | W | Z | $R^1$ | $R^2$ | $R^3$ | $R^{10}$ | A |
|---|---|---|---|---|---|---|---|---|
| D-5826 | Me(R) | single bond | H | c-Pr | C(=O)Me | Br | $CH_2OMe$ | O |
| D-5827 | Me(S) | single bond | H | c-Pr | C(=O)Me | Br | $CH_2OMe$ | O |
| D-5828 | H | $CH_2$ | Me | c-Pr | C(=O)Me | Br | $CH_2OMe$ | O |
| D-5829 | Me | $CH_2$ | H | c-Pr | C(=O)Me | Br | $CH_2OMe$ | O |
| D-5830 | H | CH(Me) | H | c-Pr | C(=O)Me | Br | $CH_2OMe$ | O |
| D-5831 | H | $CH_2CH_2$ | Me | c-Pr | C(=O)Me | Br | $CH_2OMe$ | O |
| D-5832 | Me | $CH_2CH_2$ | H | c-Pr | C(=O)Me | Br | $CH_2OMe$ | O |
| D-5833 | H | single bond | Me | c-Pr | C(=O)Me | $CF_3$ | $CH_2OMe$ | O |
| D-5834 | Me | single bond | H | c-Pr | C(=O)Me | $CF_3$ | $CH_2OMe$ | O |
| D-5835 | Me(R) | single bond | H | c-Pr | C(=O)Me | $CF_3$ | $CH_2OMe$ | O |
| D-5836 | Me(S) | single bond | H | c-Pr | C(=O)Me | $CF_3$ | $CH_2OMe$ | O |
| D-5837 | H | $CH_2$ | Me | c-Pr | C(=O)Me | $CF_3$ | $CH_2OMe$ | O |
| D-5838 | Me | $CH_2$ | H | c-Pr | C(=O)Me | $CF_3$ | $CH_2OMe$ | O |
| D-5839 | H | CH(Me) | H | c-Pr | C(=O)Me | $CF_3$ | $CH_2OMe$ | O |
| D-5840 | H | $CH_2CH_2$ | Me | c-Pr | C(=O)Me | $CF_3$ | $CH_2OMe$ | O |
| D-5841 | Me | $CH_2CH_2$ | H | c-Pr | C(=O)Me | $CF_3$ | $CH_2OMe$ | O |
| D-5842 | H | single bond | Me | c-Pr | C(=O)Me | $CF_3$ | $CH_2OMe$ | O |
| D-5843 | Me | single bond | H | c-Pr | C(=O)Me | $CF_3$ | $CH_2OMe$ | O |
| D-5844 | Me(R) | single bond | H | c-Pr | C(=O)Me | $CF_3$ | $CH_2OMe$ | O |
| D-5845 | Me(S) | single bond | H | c-Pr | C(=O)Me | $CF_3$ | $CH_2OMe$ | O |
| D-5846 | H | $CH_2$ | Me | c-Pr | C(=O)Me | $CF_3$ | $CH_2OMe$ | O |

TABLE 778

| Compound Number | Y | W | Z | $R^1$ | $R^2$ | $R^3$ | $R^{10}$ | A |
|---|---|---|---|---|---|---|---|---|
| D-5847 | Me | $CH_2$ | H | c-Pr | C(=O)Me | $CF_3$ | $CH_2OMe$ | O |
| D-5848 | H | CH(Me) | H | c-Pr | C(=O)Me | $CF_3$ | $CH_2OMe$ | O |
| D-5849 | H | $CH_2CH_2$ | Me | c-Pr | C(=O)Me | $CF_3$ | $CH_2OMe$ | O |
| D-5850 | Me | $CH_2CH_2$ | H | c-Pr | C(=O)Me | $CF_3$ | $CH_2OMe$ | O |
| D-5851 | H | single bond | Me | c-Pr | C(=O)Me | $CF_3$ | $CH_2OMe$ | O |
| D-5852 | Me | single bond | H | c-Pr | C(=O)Me | $CF_3$ | $CH_2OMe$ | O |
| D-5853 | Me(R) | single bond | H | c-Pr | C(=O)Me | $CF_3$ | $CH_2OMe$ | O |
| D-5854 | Me(S) | single bond | H | c-Pr | C(=O)Me | $CF_3$ | $CH_2OMe$ | O |
| D-5855 | H | $CH_2$ | Me | c-Pr | C(=O)Me | $CF_3$ | $CH_2OMe$ | O |
| D-5856 | Me | $CH_2$ | H | c-Pr | C(=O)Me | $CF_3$ | $CH_2OMe$ | O |
| D-5857 | H | CH(Me) | H | c-Pr | C(=O)Me | $CF_3$ | $CH_2OMe$ | O |
| D-5858 | H | $CH_2CH_2$ | Me | c-Pr | C(=O)Me | $CF_3$ | $CH_2OMe$ | O |
| D-5859 | Me | $CH_2CH_2$ | H | c-Pr | C(=O)Me | $CF_3$ | $CH_2OMe$ | O |
| D-5860 | H | single bond | Me | c-Pr | C(=O)Me | $CF_3$ | $CH_2OMe$ | O |
| D-5861 | Me | single bond | H | c-Pr | C(=O)Me | $CF_3$ | $CH_2OMe$ | O |
| D-5862 | Me(R) | single bond | H | c-Pr | C(=O)Me | $CF_3$ | $CH_2OMe$ | O |
| D-5863 | Me(S) | single bond | H | c-Pr | C(=O)Me | $CF_3$ | $CH_2OMe$ | O |
| D-5864 | H | $CH_2$ | Me | c-Pr | C(=O)Me | $CF_3$ | $CH_2OMe$ | O |
| D-5865 | Me | $CH_2$ | H | c-Pr | C(=O)Me | $CF_3$ | $CH_2OMe$ | O |
| D-5866 | H | CH(Me) | H | c-Pr | C(=O)Me | $CF_3$ | $CH_2OMe$ | O |
| D-5867 | H | $CH_2CH_2$ | Me | c-Pr | C(=O)Me | $CF_3$ | $CH_2OMe$ | O |
| D-5868 | Me | $CH_2CH_2$ | H | c-Pr | C(=O)Me | $CF_3$ | $CH_2OMe$ | O |
| D-5869 | H | single bond | Me | c-Pr | C(=O)Me | OMe | $CH_2OMe$ | O |
| D-5870 | Me | single bond | H | c-Pr | C(=O)Me | OMe | $CH_2OMe$ | O |
| D-5871 | Me(R) | single bond | H | c-Pr | C(=O)Me | OMe | $CH_2OMe$ | O |
| D-5872 | Me(S) | single bond | H | c-Pr | C(=O)Me | OMe | $CH_2OMe$ | O |
| D-5873 | H | $CH_2$ | Me | c-Pr | C(=O)Me | OMe | $CH_2OMe$ | O |
| D-5874 | Me | $CH_2$ | H | c-Pr | C(=O)Me | OMe | $CH_2OMe$ | O |
| D-5875 | H | CH(Me) | H | c-Pr | C(=O)Me | OMe | $CH_2OMe$ | O |
| D-5876 | H | $CH_2CH_2$ | Me | c-Pr | C(=O)Me | OMe | $CH_2OMe$ | O |
| D-5877 | Me | $CH_2CH_2$ | H | c-Pr | C(=O)Me | OMe | $CH_2OMe$ | O |
| D-5878 | H | single bond | Me | c-Pr | C(=O)Me | OMe | $CH_2OMe$ | O |
| D-5879 | Me | single bond | H | c-Pr | C(=O)Me | OMe | $CH_2OMe$ | O |
| D-5880 | Me(R) | single bond | H | c-Pr | C(=O)Me | OMe | $CH_2OMe$ | O |
| D-5881 | Me(S) | single bond | H | c-Pr | C(=O)Me | OMe | $CH_2OMe$ | O |
| D-5882 | H | $CH_2$ | Me | c-Pr | C(=O)Me | OMe | $CH_2OMe$ | O |
| D-5883 | Me | $CH_2$ | H | c-Pr | C(=O)Me | OMe | $CH_2OMe$ | O |
| D-5884 | H | CH(Me) | H | c-Pr | C(=O)Me | OMe | $CH_2OMe$ | O |
| D-5885 | H | $CH_2CH_2$ | Me | c-Pr | C(=O)Me | OMe | $CH_2OMe$ | O |
| D-5886 | Me | $CH_2CH_2$ | H | c-Pr | C(=O)Me | OMe | $CH_2OMe$ | O |
| D-5887 | H | single bond | Me | c-Pr | C(=O)Me | OMe | $CH_2OMe$ | O |
| D-5888 | Me | single bond | H | c-Pr | C(=O)Me | OMe | $CH_2OMe$ | O |
| D-5889 | Me(R) | single bond | H | c-Pr | C(=O)Me | OMe | $CH_2OMe$ | O |
| D-5890 | Me(S) | single bond | H | c-Pr | C(=O)Me | OMe | $CH_2OMe$ | O |

TABLE 779

| Compound Number | Y | W | Z | $R^1$ | $R^2$ | $R^3$ | $R^{10}$ | A |
|---|---|---|---|---|---|---|---|---|
| D-5891 | H | $CH_2$ | Me | c-Pr | C(=O)Me | OMe | $CH_2OMe$ | O |
| D-5892 | Me | $CH_2$ | H | c-Pr | C(=O)Me | OMe | $CH_2OMe$ | O |
| D-5893 | H | CH(Me) | H | c-Pr | C(=O)Me | OMe | $CH_2OMe$ | O |
| D-5894 | H | $CH_2CH_2$ | Me | c-Pr | C(=O)Me | OMe | $CH_2OMe$ | O |
| D-5895 | Me | $CH_2CH_2$ | H | c-Pr | C(=O)Me | OMe | $CH_2OMe$ | O |
| D-5896 | H | single bond | Me | c-Pr | C(=O)Me | OMe | $CH_2OMe$ | O |
| D-5897 | Me | single bond | H | c-Pr | C(=O)Me | OMe | $CH_2OMe$ | O |
| D-5898 | Me(R) | single bond | H | c-Pr | C(=O)Me | OMe | $CH_2OMe$ | O |
| D-5899 | Me(S) | single bond | H | c-Pr | C(=O)Me | OMe | $CH_2OMe$ | O |
| D-5900 | H | $CH_2$ | Me | c-Pr | C(=O)Me | OMe | $CH_2OMe$ | O |
| D-5901 | Me | $CH_2$ | H | c-Pr | C(=O)Me | OMe | $CH_2OMe$ | O |
| D-5902 | H | CH(Me) | H | c-Pr | C(=O)Me | OMe | $CH_2OMe$ | O |
| D-5903 | H | $CH_2CH_2$ | Me | c-Pr | C(=O)Me | OMe | $CH_2OMe$ | O |
| D-5904 | Me | $CH_2CH_2$ | H | c-Pr | C(=O)Me | OMe | $CH_2OMe$ | O |
| D-5905 | H | single bond | Me | c-Pr | C(=O)Me | $OCF_3$ | $CH_2OMe$ | O |
| D-5906 | Me | single bond | H | c-Pr | C(=O)Me | $OCF_3$ | $CH_2OMe$ | O |
| D-5907 | Me(R) | single bond | H | c-Pr | C(=O)Me | $OCF_3$ | $CH_2OMe$ | O |
| D-5908 | Me(S) | single bond | H | c-Pr | C(=O)Me | $OCF_3$ | $CH_2OMe$ | O |
| D-5909 | H | $CH_2$ | Me | c-Pr | C(=O)Me | $OCF_3$ | $CH_2OMe$ | O |
| D-5910 | Me | $CH_2$ | H | c-Pr | C(=O)Me | $OCF_3$ | $CH_2OMe$ | O |
| D-5911 | H | CH(Me) | H | c-Pr | C(=O)Me | $OCF_3$ | $CH_2OMe$ | O |
| D-5912 | H | $CH_2CH_2$ | Me | c-Pr | C(=O)Me | $OCF_3$ | $CH_2OMe$ | O |
| D-5913 | Me | $CH_2CH_2$ | H | c-Pr | C(=O)Me | $OCF_3$ | $CH_2OMe$ | O |
| D-5914 | H | single bond | Me | c-Pr | C(=O)Me | $OCF_3$ | $CH_2OMe$ | O |
| D-5915 | Me | single bond | H | c-Pr | C(=O)Me | $OCF_3$ | $CH_2OMe$ | O |
| D-5916 | Me(R) | single bond | H | c-Pr | C(=O)Me | $OCF_3$ | $CH_2OMe$ | O |
| D-5917 | Me(S) | single bond | H | c-Pr | C(=O)Me | $OCF_3$ | $CH_2OMe$ | O |
| D-5918 | H | $CH_2$ | Me | c-Pr | C(=O)Me | $OCF_3$ | $CH_2OMe$ | O |
| D-5919 | Me | $CH_2$ | H | c-Pr | C(=O)Me | $OCF_3$ | $CH_2OMe$ | O |
| D-5920 | H | CH(Me) | H | c-Pr | C(=O)Me | $OCF_3$ | $CH_2OMe$ | O |
| D-5921 | H | $CH_2CH_2$ | Me | c-Pr | C(=O)Me | $OCF_3$ | $CH_2OMe$ | O |
| D-5922 | Me | $CH_2CH_2$ | H | c-Pr | C(=O)Me | $OCF_3$ | $CH_2OMe$ | O |
| D-5923 | H | single bond | Me | c-Pr | C(=O)Me | $OCF_3$ | $CH_2OMe$ | O |
| D-5924 | Me | single bond | H | c-Pr | C(=O)Me | $OCF_3$ | $CH_2OMe$ | O |
| D-5925 | Me(R) | single bond | H | c-Pr | C(=O)Me | $OCF_3$ | $CH_2OMe$ | O |
| D-5926 | Me(S) | single bond | H | c-Pr | C(=O)Me | $OCF_3$ | $CH_2OMe$ | O |
| D-5927 | H | $CH_2$ | Me | c-Pr | C(=O)Me | $OCF_3$ | $CH_2OMe$ | O |
| D-5928 | Me | $CH_2$ | H | c-Pr | C(=O)Me | $OCF_3$ | $CH_2OMe$ | O |
| D-5929 | H | CH(Me) | H | c-Pr | C(=O)Me | $OCF_3$ | $CH_2OMe$ | O |
| D-5930 | H | $CH_2CH_2$ | Me | c-Pr | C(=O)Me | $OCF_3$ | $CH_2OMe$ | O |
| D-5931 | Me | $CH_2CH_2$ | H | c-Pr | C(=O)Me | $OCF_3$ | $CH_2OMe$ | O |
| D-5932 | H | single bond | Me | c-Pr | C(=O)Me | $OCF_3$ | $CH_2OMe$ | O |
| D-5933 | Me | single bond | H | c-Pr | C(=O)Me | $OCF_3$ | $CH_2OMe$ | O |
| D-5934 | Me(R) | single bond | H | c-Pr | C(=O)Me | $OCF_3$ | $CH_2OMe$ | O |

TABLE 780

| Compound Number | Y | W | Z | $R^1$ | $R^2$ | $R^3$ | $R^{10}$ | A |
|---|---|---|---|---|---|---|---|---|
| D-5935 | Me(S) | single bond | H | c-Pr | C(=O)Me | $OCF_3$ | $CH_2OMe$ | O |
| D-5936 | H | $CH_2$ | Me | c-Pr | C(=O)Me | $OCF_3$ | $CH_2OMe$ | O |
| D-5937 | Me | $CH_2$ | H | c-Pr | C(=O)Me | $OCF_3$ | $CH_2OMe$ | O |
| D-5938 | H | CH(Me) | H | c-Pr | C(=O)Me | $OCF_3$ | $CH_2OMe$ | O |
| D-5939 | H | $CH_2CH_2$ | Me | c-Pr | C(=O)Me | $OCF_3$ | $CH_2OMe$ | O |
| D-5940 | Me | $CH_2CH_2$ | H | c-Pr | C(=O)Me | $OCF_3$ | $CH_2OMe$ | O |
| D-5941 | H | single bond | Me | c-Pr | C(=O)Me | Br | $CH_2CN$ | O |
| D-5942 | Me | single bond | H | c-Pr | C(=O)Me | Br | $CH_2CN$ | O |
| D-5943 | Me(R) | single bond | H | c-Pr | C(=O)Me | Br | $CH_2CN$ | O |
| D-5944 | Me(S) | single bond | H | c-Pr | C(=O)Me | Br | $CH_2CN$ | O |
| D-5945 | H | $CH_2$ | Me | c-Pr | C(=O)Me | Br | $CH_2CN$ | O |
| D-5946 | Me | $CH_2$ | H | c-Pr | C(=O)Me | Br | $CH_2CN$ | O |
| D-5947 | H | CH(Me) | H | c-Pr | C(=O)Me | Br | $CH_2CN$ | O |
| D-5948 | H | $CH_2CH_2$ | Me | c-Pr | C(=O)Me | Br | $CH_2CN$ | O |
| D-5949 | Me | $CH_2CH_2$ | H | c-Pr | C(=O)Me | Br | $CH_2CN$ | O |
| D-5950 | H | single bond | Me | c-Pr | C(=O)Me | Br | $CH_2CN$ | O |
| D-5951 | Me | single bond | H | c-Pr | C(=O)Me | Br | $CH_2CN$ | O |
| D-5952 | Me(R) | single bond | H | c-Pr | C(=O)Me | Br | $CH_2CN$ | O |
| D-5953 | Me(S) | single bond | H | c-Pr | C(=O)Me | Br | $CH_2CN$ | O |
| D-5954 | H | $CH_2$ | Me | c-Pr | C(=O)Me | Br | $CH_2CN$ | O |
| D-5955 | Me | $CH_2$ | H | c-Pr | C(=O)Me | Br | $CH_2CN$ | O |

TABLE 780-continued

| Compound Number | Y | W | Z | $R^1$ | $R^2$ | $R^3$ | $R^{10}$ | A |
|---|---|---|---|---|---|---|---|---|
| D-5956 | H | CH(Me) | H | c-Pr | C(=O)Me | Br | $CH_2CN$ | O |
| D-5957 | H | $CH_2CH_2$ | Me | c-Pr | C(=O)Me | Br | $CH_2CN$ | O |
| D-5958 | Me | $CH_2CH_2$ | H | c-Pr | C(=O)Me | Br | $CH_2CN$ | O |
| D-5959 | H | single bond | Me | c-Pr | C(=O)Me | Br | $CH_2CN$ | O |
| D-5960 | Me | single bond | H | c-Pr | C(=O)Me | Br | $CH_2CN$ | O |
| D-5961 | Me(R) | single bond | H | c-Pr | C(=O)Me | Br | $CH_2CN$ | O |
| D-5962 | Me(S) | single bond | H | c-Pr | C(=O)Me | Br | $CH_2CN$ | O |
| D-5963 | H | $CH_2$ | Me | c-Pr | C(=O)Me | Br | $CH_2CN$ | O |
| D-5964 | Me | $CH_2$ | H | c-Pr | C(=O)Me | Br | $CH_2CN$ | O |
| D-5965 | H | CH(Me) | H | c-Pr | C(=O)Me | Br | $CH_2CN$ | O |
| D-5966 | H | $CH_2CH_2$ | Me | c-Pr | C(=O)Me | Br | $CH_2CN$ | O |
| D-5967 | Me | $CH_2CH_2$ | H | c-Pr | C(=O)Me | Br | $CH_2CN$ | O |
| D-5968 | H | single bond | Me | c-Pr | C(=O)Me | Br | $CH_2CN$ | O |
| D-5969 | Me | single bond | H | c-Pr | C(=O)Me | Br | $CH_2CN$ | O |
| D-5970 | Me(R) | single bond | H | c-Pr | C(=O)Me | Br | $CH_2CN$ | O |
| D-5971 | Me(S) | single bond | H | c-Pr | C(=O)Me | Br | $CH_2CN$ | O |
| D-5972 | H | $CH_2$ | Me | c-Pr | C(=O)Me | Br | $CH_2CN$ | O |
| D-5973 | Me | $CH_2$ | H | c-Pr | C(=O)Me | Br | $CH_2CN$ | O |
| D-5974 | H | CH(Me) | H | c-Pr | C(=O)Me | Br | $CH_2CN$ | O |
| D-5975 | H | $CH_2CH_2$ | Me | c-Pr | C(=O)Me | Br | $CH_2CN$ | O |
| D-5976 | Me | $CH_2CH_2$ | H | c-Pr | C(=O)Me | Br | $CH_2CN$ | O |
| D-5977 | H | single bond | Me | c-Pr | C(=O)Me | $CF_3$ | $CH_2CN$ | O |
| D-5978 | Me | single bond | H | c-Pr | C(=O)Me | $CF_3$ | $CH_2CN$ | O |

TABLE 781

| Compound Number | Y | W | Z | $R^1$ | $R^2$ | $R^3$ | $R^{10}$ | A |
|---|---|---|---|---|---|---|---|---|
| D-5979 | Me(R) | single bond | H | c-Pr | C(=O)Me | $CF_3$ | $CH_2CN$ | O |
| D-5980 | Me(S) | single bond | H | c-Pr | C(=O)Me | $CF_3$ | $CH_2CN$ | O |
| D-5981 | H | $CH_2$ | Me | c-Pr | C(=O)Me | $CF_3$ | $CH_2CN$ | O |
| D-5982 | Me | $CH_2$ | H | c-Pr | C(=O)Me | $CF_3$ | $CH_2CN$ | O |
| D-5983 | H | CH(Me) | H | c-Pr | C(=O)Me | $CF_3$ | $CH_2CN$ | O |
| D-5984 | H | $CH_2CH_2$ | Me | c-Pr | C(=O)Me | $CF_3$ | $CH_2CN$ | O |
| D-5985 | Me | $CH_2CH_2$ | H | c-Pr | C(=O)Me | $CF_3$ | $CH_2CN$ | O |
| D-5986 | H | single bond | Me | c-Pr | C(=O)Me | $CF_3$ | $CH_2CN$ | O |
| D-5987 | Me | single bond | H | c-Pr | C(=O)Me | $CF_3$ | $CH_2CN$ | O |
| D-5988 | Me(R) | single bond | H | c-Pr | C(=O)Me | $CF_3$ | $CH_2CN$ | O |
| D-5989 | Me(S) | single bond | H | c-Pr | C(=O)Me | $CF_3$ | $CH_2CN$ | O |
| D-5990 | H | $CH_2$ | Me | c-Pr | C(=O)Me | $CF_3$ | $CH_2CN$ | O |
| D-5991 | Me | $CH_2$ | H | c-Pr | C(=O)Me | $CF_3$ | $CH_2CN$ | O |
| D-5992 | H | CH(Me) | H | c-Pr | C(=O)Me | $CF_3$ | $CH_2CN$ | O |
| D-5993 | H | $CH_2CH_2$ | Me | c-Pr | C(=O)Me | $CF_3$ | $CH_2CN$ | O |
| D-5994 | Me | $CH_2CH_2$ | H | c-Pr | C(=O)Me | $CF_3$ | $CH_2CN$ | O |
| D-5995 | H | single bond | Me | c-Pr | C(=O)Me | $CF_3$ | $CH_2CN$ | O |
| D-5996 | Me | single bond | H | c-Pr | C(=O)Me | $CF_3$ | $CH_2CN$ | O |
| D-5997 | Me(R) | single bond | H | c-Pr | C(=O)Me | $CF_3$ | $CH_2CN$ | O |
| D-5998 | Me(S) | single bond | H | c-Pr | C(=O)Me | $CF_3$ | $CH_2CN$ | O |
| D-5999 | H | $CH_2$ | Me | c-Pr | C(=O)Me | $CF_3$ | $CH_2CN$ | O |
| D-6000 | Me | $CH_2$ | H | c-Pr | C(=O)Me | $CF_3$ | $CH_2CN$ | O |
| D-6001 | H | CH(Me) | H | c-Pr | C(=O)Me | $CF_3$ | $CH_2CN$ | O |
| D-6002 | H | $CH_2CH_2$ | Me | c-Pr | C(=O)Me | $CF_3$ | $CH_2CN$ | O |
| D-6003 | Me | $CH_2CH_2$ | H | c-Pr | C(=O)Me | $CF_3$ | $CH_2CN$ | O |
| D-6004 | H | single bond | Me | c-Pr | C(=O)Me | $CF_3$ | $CH_2CN$ | O |
| D-6005 | Me | single bond | H | c-Pr | C(=O)Me | $CF_3$ | $CH_2CN$ | O |
| D-6006 | Me(R) | single bond | H | c-Pr | C(=O)Me | $CF_3$ | $CH_2CN$ | O |
| D-6007 | Me(S) | single bond | H | c-Pr | C(=O)Me | $CF_3$ | $CH_2CN$ | O |
| D-6008 | H | $CH_2$ | Me | c-Pr | C(=O)Me | $CF_3$ | $CH_2CN$ | O |
| D-6009 | Me | $CH_2$ | H | c-Pr | C(=O)Me | $CF_3$ | $CH_2CN$ | O |
| D-6010 | H | CH(Me) | H | c-Pr | C(=O)Me | $CF_3$ | $CH_2CN$ | O |
| D-6011 | H | $CH_2CH_2$ | Me | c-Pr | C(=O)Me | $CF_3$ | $CH_2CN$ | O |
| D-6012 | Me | $CH_2CH_2$ | H | c-Pr | C(=O)Me | $CF_3$ | $CH_2CN$ | O |
| D-6013 | H | single bond | Me | c-Pr | C(=O)Me | OMe | $CH_2CN$ | O |
| D-6014 | Me | single bond | H | c-Pr | C(=O)Me | OMe | $CH_2CN$ | O |
| D-6015 | Me(R) | single bond | H | c-Pr | C(=O)Me | OMe | $CH_2CN$ | O |
| D-6016 | Me(S) | single bond | H | c-Pr | C(=O)Me | OMe | $CH_2CN$ | O |
| D-6017 | H | $CH_2$ | Me | c-Pr | C(=O)Me | OMe | $CH_2CN$ | O |
| D-6018 | Me | $CH_2$ | H | c-Pr | C(=O)Me | OMe | $CH_2CN$ | O |
| D-6019 | H | CH(Me) | H | c-Pr | C(=O)Me | OMe | $CH_2CN$ | O |
| D-6020 | H | $CH_2CH_2$ | Me | c-Pr | C(=O)Me | OMe | $CH_2CN$ | O |

TABLE 781-continued

| Compound Number | Y | W | Z | $R^1$ | $R^2$ | $R^3$ | $R^{10}$ | A |
|---|---|---|---|---|---|---|---|---|
| D-6021 | Me | $CH_2CH_2$ | H | c-Pr | C(=O)Me | OMe | $CH_2CN$ | O |
| D-6022 | H | single bond | Me | c-Pr | C(=O)Me | OMe | $CH_2CN$ | O |

TABLE 782

| Compound Number | Y | W | Z | $R^1$ | $R^2$ | $R^3$ | $R^{10}$ | A |
|---|---|---|---|---|---|---|---|---|
| D-6023 | Me | single bond | H | c-Pr | C(=O)Me | OMe | $CH_2CN$ | O |
| D-6024 | Me(R) | single bond | H | c-Pr | C(=O)Me | OMe | $CH_2CN$ | O |
| D-6025 | Me(S) | single bond | H | c-Pr | C(=O)Me | OMe | $CH_2CN$ | O |
| D-6026 | H | $CH_2$ | Me | c-Pr | C(=O)Me | OMe | $CH_2CN$ | O |
| D-6027 | Me | $CH_2$ | H | c-Pr | C(=O)Me | OMe | $CH_2CN$ | O |
| D-6028 | H | CH(Me) | H | c-Pr | C(=O)Me | OMe | $CH_2CN$ | O |
| D-6029 | H | $CH_2CH_2$ | Me | c-Pr | C(=O)Me | OMe | $CH_2CN$ | O |
| D-6030 | Me | $CH_2CH_2$ | H | c-Pr | C(=O)Me | OMe | $CH_2CN$ | O |
| D-6031 | H | single bond | Me | c-Pr | C(=O)Me | OMe | $CH_2CN$ | O |
| D-6032 | Me | single bond | H | c-Pr | C(=O)Me | OMe | $CH_2CN$ | O |
| D-6033 | Me(R) | single bond | H | c-Pr | C(=O)Me | OMe | $CH_2CN$ | O |
| D-6034 | Me(S) | single bond | H | c-Pr | C(=O)Me | OMe | $CH_2CN$ | O |
| D-6035 | H | $CH_2$ | Me | c-Pr | C(=O)Me | OMe | $CH_2CN$ | O |
| D-6036 | Me | $CH_2$ | H | c-Pr | C(=O)Me | OMe | $CH_2CN$ | O |
| D-6037 | H | CH(Me) | H | c-Pr | C(=O)Me | OMe | $CH_2CN$ | O |
| D-6038 | H | $CH_2CH_2$ | Me | c-Pr | C(=O)Me | OMe | $CH_2CN$ | O |
| D-6039 | Me | $CH_2CH_2$ | H | c-Pr | C(=O)Me | OMe | $CH_2CN$ | O |
| D-6040 | H | single bond | Me | c-Pr | C(=O)Me | OMe | $CH_2CN$ | O |
| D-6041 | Me | single bond | H | c-Pr | C(=O)Me | OMe | $CH_2CN$ | O |
| D-6042 | Me(R) | single bond | H | c-Pr | C(=O)Me | OMe | $CH_2CN$ | O |
| D-6043 | Me(S) | single bond | H | c-Pr | C(=O)Me | OMe | $CH_2CN$ | O |
| D-6044 | H | $CH_2$ | Me | c-Pr | C(=O)Me | OMe | $CH_2CN$ | O |
| D-6045 | Me | $CH_2$ | H | c-Pr | C(=O)Me | OMe | $CH_2CN$ | O |
| D-6046 | H | CH(Me) | H | c-Pr | C(=O)Me | OMe | $CH_2CN$ | O |
| D-6047 | H | $CH_2CH_2$ | Me | c-Pr | C(=O)Me | OMe | $CH_2CN$ | O |
| D-6048 | Me | $CH_2CH_2$ | H | c-Pr | C(=O)Me | OMe | $CH_2CN$ | O |
| D-6049 | H | single bond | Me | c-Pr | C(=O)Me | $OCF_3$ | $CH_2CN$ | O |
| D-6050 | Me | single bond | H | c-Pr | C(=O)Me | $OCF_3$ | $CH_2CN$ | O |
| D-6051 | Me(R) | single bond | H | c-Pr | C(=O)Me | $OCF_3$ | $CH_2CN$ | O |
| D-6052 | Me(S) | single bond | H | c-Pr | C(=O)Me | $OCF_3$ | $CH_2CN$ | O |
| D-6053 | H | $CH_2$ | Me | c-Pr | C(=O)Me | $OCF_3$ | $CH_2CN$ | O |
| D-6054 | Me | $CH_2$ | H | c-Pr | C(=O)Me | $OCF_3$ | $CH_2CN$ | O |
| D-6055 | H | CH(Me) | H | c-Pr | C(=O)Me | $OCF_3$ | $CH_2CN$ | O |
| D-6056 | H | $CH_2CH_2$ | Me | c-Pr | C(=O)Me | $OCF_3$ | $CH_2CN$ | O |
| D-6057 | Me | $CH_2CH_2$ | H | c-Pr | C(=O)Me | $OCF_3$ | $CH_2CN$ | O |
| D-6058 | H | single bond | Me | c-Pr | C(=O)Me | $OCF_3$ | $CH_2CN$ | O |
| D-6059 | Me | single bond | H | c-Pr | C(=O)Me | $OCF_3$ | $CH_2CN$ | O |
| D-6060 | Me(R) | single bond | H | c-Pr | C(=O)Me | $OCF_3$ | $CH_2CN$ | O |
| D-6061 | Me(S) | single bond | H | c-Pr | C(=O)Me | $OCF_3$ | $CH_2CN$ | O |
| D-6062 | H | $CH_2$ | Me | c-Pr | C(=O)Me | $OCF_3$ | $CH_2CN$ | O |
| D-6063 | Me | $CH_2$ | H | c-Pr | C(=O)Me | $OCF_3$ | $CH_2CN$ | O |
| D-6064 | H | CH(Me) | H | c-Pr | C(=O)Me | $OCF_3$ | $CH_2CN$ | O |
| D-6065 | H | $CH_2CH_2$ | Me | c-Pr | C(=O)Me | $OCF_3$ | $CH_2CN$ | O |
| D-6066 | Me | $CH_2CH_2$ | H | c-Pr | C(=O)Me | $OCF_3$ | $CH_2CN$ | O |

TABLE 783

| Compound Number | Y | W | Z | $R^1$ | $R^2$ | $R^3$ | $R^{10}$ | A |
|---|---|---|---|---|---|---|---|---|
| D-6067 | H | single bond | Me | c-Pr | C(=O)Me | $OCF_3$ | $CH_2CN$ | O |
| D-6068 | Me | single bond | H | c-Pr | C(=O)Me | $OCF_3$ | $CH_2CN$ | O |
| D-6069 | Me(R) | single bond | H | c-Pr | C(=O)Me | $OCF_3$ | $CH_2CN$ | O |
| D-6070 | Me(S) | single bond | H | c-Pr | C(=O)Me | $OCF_3$ | $CH_2CN$ | O |
| D-6071 | H | $CH_2$ | Me | c-Pr | C(=O)Me | $OCF_3$ | $CH_2CN$ | O |
| D-6072 | Me | $CH_2$ | H | c-Pr | C(=O)Me | $OCF_3$ | $CH_2CN$ | O |
| D-6073 | H | CH(Me) | H | c-Pr | C(=O)Me | $OCF_3$ | $CH_2CN$ | O |
| D-6074 | H | $CH_2CH_2$ | Me | c-Pr | C(=O)Me | $OCF_3$ | $CH_2CN$ | O |
| D-6075 | Me | $CH_2CH_2$ | H | c-Pr | C(=O)Me | $OCF_3$ | $CH_2CN$ | O |
| D-6076 | H | single bond | Me | c-Pr(1-CN) | C(=O)Me | $OCF_3$ | $CH_2CN$ | O |
| D-6077 | Me | single bond | H | c-Pr(1-CN) | C(=O)Me | $OCF_3$ | $CH_2CN$ | O |
| D-6078 | Me(R) | single bond | H | c-Pr(1-CN) | C(=O)Me | $OCF_3$ | $CH_2CN$ | O |

TABLE 783-continued

| Compound Number | Y | W | Z | $R^1$ | $R^2$ | $R^3$ | $R^{10}$ | A |
|---|---|---|---|---|---|---|---|---|
| D-6079 | Me(S) | single bond | H | c-Pr(1-CN) | C(=O)Me | $OCF_3$ | $CH_2CN$ | O |
| D-6080 | H | $CH_2$ | Me | c-Pr(1-CN) | C(=O)Me | $OCF_3$ | $CH_2CN$ | O |
| D-6081 | Me | $CH_2$ | H | c-Pr(1-CN) | C(=O)Me | $OCF_3$ | $CH_2CN$ | O |
| D-6082 | H | CH(Me) | H | c-Pr(1-CN) | C(=O)Me | $OCF_3$ | $CH_2CN$ | O |
| D-6083 | H | $CH_2CH_2$ | Me | c-Pr(1-CN) | C(=O)Me | $OCF_3$ | $CH_2CN$ | O |
| D-6084 | Me | $CH_2CH_2$ | H | c-Pr(1-CN) | C(=O)Me | $OCF_3$ | $CH_2CN$ | O |

TABLE 784

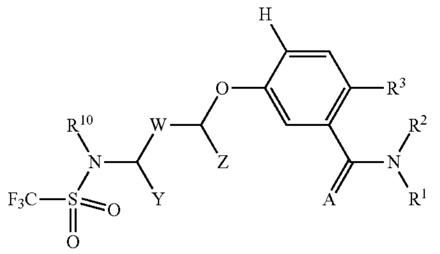

| Compound Number | Y | W | Z | $R^1$ | $R^2$ | $R^3$ | $R^{10}$ | A |
|---|---|---|---|---|---|---|---|---|
| D-6085 | H | single bond | Me | $CH_2CF_3$ | $C(=O)OCH_2CH=CH_2$ | Cl | H | O |
| D-6086 | Me | single bond | H | $CH_2CF_3$ | $C(=O)OCH_2CH=CH_2$ | Cl | H | O |
| D-6087 | Me(R) | single bond | H | $CH_2CF_3$ | $C(=O)OCH_2CH=CH_2$ | Cl | H | O |
| D-6088 | Me(S) | single bond | H | $CH_2CF_3$ | $C(=O)OCH_2CH=CH_2$ | Cl | H | O |
| D-6089 | H | $CH_2$ | Me | $CH_2CF_3$ | $C(=O)OCH_2CH=CH_2$ | Cl | H | O |
| D-6090 | Me | $CH_2$ | H | $CH_2CF_3$ | $C(=O)OCH_2CH=CH_2$ | Cl | H | O |
| D-6091 | H | CH(Me) | H | $CH_2CF_3$ | $C(=O)OCH_2CH=CH_2$ | Cl | H | O |
| D-6092 | H | $CH_2CH_2$ | Me | $CH_2CF_3$ | $C(=O)OCH_2CH=CH_2$ | Cl | H | O |
| D-6093 | Me | $CH_2CH_2$ | H | $CH_2CF_3$ | $C(=O)OCH_2CH=CH_2$ | Cl | H | O |
| D-6094 | H | single bond | Me | $CH_2CF_3$ | $C(=O)OCH_2CH=CH_2$ | Me | H | O |
| D-6095 | Me | single bond | H | $CH_2CF_3$ | $C(=O)OCH_2CH=CH_2$ | Me | H | O |
| D-6096 | Me(R) | single bond | H | $CH_2CF_3$ | $C(=O)OCH_2CH=CH_2$ | Me | H | O |
| D-6097 | Me(S) | single bond | H | $CH_2CF_3$ | $C(=O)OCH_2CH=CH_2$ | Me | H | O |
| D-6098 | H | $CH_2$ | Me | $CH_2CF_3$ | $C(=O)OCH_2CH=CH_2$ | Me | H | O |
| D-6099 | Me | $CH_2$ | H | $CH_2CF_3$ | $C(=O)OCH_2CH=CH_2$ | Me | H | O |
| D-6100 | H | CH(Me) | H | $CH_2CF_3$ | $C(=O)OCH_2CH=CH_2$ | Me | H | O |
| D-6101 | H | $CH_2CH_2$ | Me | $CH_2CF_3$ | $C(=O)OCH_2CH=CH_2$ | Me | H | O |
| D-6102 | Me | $CH_2CH_2$ | H | $CH_2CF_3$ | $C(=O)OCH_2CH=CH_2$ | Me | H | O |
| D-6103 | H | single bond | Me | $CH_2CF_3$ | $C(=O)OCH_2CCl_3$ | Cl | H | O |
| D-6104 | Me | single bond | H | $CH_2CF_3$ | $C(=O)OCH_2CCl_3$ | Cl | H | O |
| D-6105 | Me(R) | single bond | H | $CH_2CF_3$ | $C(=O)OCH_2CCl_3$ | Cl | H | O |
| D-6106 | Me(S) | single bond | H | $CH_2CF_3$ | $C(=O)OCH_2CCl_3$ | Cl | H | O |
| D-6107 | H | $CH_2$ | Me | $CH_2CF_3$ | $C(=O)OCH_2CCl_3$ | Cl | H | O |
| D-6108 | Me | $CH_2$ | H | $CH_2CF_3$ | $C(=O)OCH_2CCl_3$ | Cl | H | O |
| D-6109 | H | CH(Me) | H | $CH_2CF_3$ | $C(=O)OCH_2CCl_3$ | Cl | H | O |
| D-6110 | H | $CH_2CH_2$ | Me | $CH_2CF_3$ | $C(=O)OCH_2CCl_3$ | Cl | H | O |
| D-6111 | Me | $CH_2CH_2$ | H | $CH_2CF_3$ | $C(=O)OCH_2CCl_3$ | Cl | H | O |
| D-6112 | H | single bond | Me | $CH_2CF_3$ | $C(=O)OCH_2CCl_3$ | Me | H | O |
| D-6113 | Me | single bond | H | $CH_2CF_3$ | $C(=O)OCH_2CCl_3$ | Me | H | O |
| D-6114 | Me(R) | single bond | H | $CH_2CF_3$ | $C(=O)OCH_2CCl_3$ | Me | H | O |
| D-6115 | Me(S) | single bond | H | $CH_2CF_3$ | $C(=O)OCH_2CCl_3$ | Me | H | O |
| D-6116 | H | $CH_2$ | Me | $CH_2CF_3$ | $C(=O)OCH_2CCl_3$ | Me | H | O |
| D-6117 | Me | $CH_2$ | H | $CH_2CF_3$ | $C(=O)OCH_2CCl_3$ | Me | H | O |
| D-6118 | H | CH(Me) | H | $CH_2CF_3$ | $C(=O)OCH_2CCl_3$ | Me | H | O |
| D-6119 | H | $CH_2CH_2$ | Me | $CH_2CF_3$ | $C(=O)OCH_2CCl_3$ | Me | H | O |
| D-6120 | Me | $CH_2CH_2$ | H | $CH_2CF_3$ | $C(=O)OCH_2CCl_3$ | Me | H | O |
| D-6121 | H | single bond | Me | $CH_2CF_3$ | $C(=O)N(Me)_2$ | Cl | H | O |
| D-6122 | Me | single bond | H | $CH_2CF_3$ | $C(=O)N(Me)_2$ | Cl | H | O |

TABLE 785

| Compound Number | Y | W | Z | $R^1$ | $R^2$ | $R^3$ | $R^{10}$ | A |
|---|---|---|---|---|---|---|---|---|
| D-6123 | Me(R) | single bond | H | $CH_2CF_3$ | C(═O)N(Me)$_2$ | Cl | H | O |
| D-6124 | Me(S) | single bond | H | $CH_2CF_3$ | C(═O)N(Me)$_2$ | Cl | H | O |
| D-6125 | H | $CH_2$ | Me | $CH_2CF_3$ | C(═O)N(Me)$_2$ | Cl | H | O |
| D-6126 | Me | $CH_2$ | H | $CH_2CF_3$ | C(═O)N(Me)$_2$ | Cl | H | O |
| D-6127 | H | CH(Me) | H | $CH_2CF_3$ | C(═O)N(Me)$_2$ | Cl | H | O |
| D-6128 | H | $CH_2CH_2$ | Me | $CH_2CF_3$ | C(═O)N(Me)$_2$ | Cl | H | O |
| D-6129 | Me | $CH_2CH_2$ | H | $CH_2CF_3$ | C(═O)N(Me)$_2$ | Cl | H | O |
| D-6130 | H | single bond | Me | $CH_2CF_3$ | C(═O)N(Me)$_2$ | Me | H | O |
| D-6131 | Me | single bond | H | $CH_2CF_3$ | C(═O)N(Me)$_2$ | Me | H | O |
| D-6132 | Me(R) | single bond | H | $CH_2CF_3$ | C(═O)N(Me)$_2$ | Me | H | O |
| D-6133 | Me(S) | single bond | H | $CH_2CF_3$ | C(═O)N(Me)$_2$ | Me | H | O |
| D-6134 | H | $CH_2$ | Me | $CH_2CF_3$ | C(═O)N(Me)$_2$ | Me | H | O |
| D-6135 | Me | $CH_2$ | H | $CH_2CF_3$ | C(═O)N(Me)$_2$ | Me | H | O |
| D-6136 | H | CH(Me) | H | $CH_2CF_3$ | C(═O)N(Me)$_2$ | Me | H | O |
| D-6137 | H | $CH_2CH_2$ | Me | $CH_2CF_3$ | C(═O)N(Me)$_2$ | Me | H | O |
| D-6138 | Me | $CH_2CH_2$ | H | $CH_2CF_3$ | C(═O)N(Me)$_2$ | Me | H | O |
| D-6139 | H | single bond | Me | $CH_2CF_3$ | $CH_2$OC(═O)Me | Cl | H | O |
| D-6140 | Me | single bond | H | $CH_2CF_3$ | $CH_2$OC(═O)Me | Cl | H | O |
| D-6141 | Me(R) | single bond | H | $CH_2CF_3$ | $CH_2$OC(═O)Me | Cl | H | O |
| D-6142 | Me(S) | single bond | H | $CH_2CF_3$ | $CH_2$OC(═O)Me | Cl | H | O |
| D-6143 | H | $CH_2$ | Me | $CH_2CF_3$ | $CH_2$OC(═O)Me | Cl | H | O |
| D-6144 | Me | $CH_2$ | H | $CH_2CF_3$ | $CH_2$OC(═O)Me | Cl | H | O |
| D-6145 | H | CH(Me) | H | $CH_2CF_3$ | $CH_2$OC(═O)Me | Cl | H | O |
| D-6146 | H | $CH_2CH_2$ | Me | $CH_2CF_3$ | $CH_2$OC(═O)Me | Cl | H | O |
| D-6147 | Me | $CH_2CH_2$ | H | $CH_2CF_3$ | $CH_2$OC(═O)Me | Cl | H | O |
| D-6148 | H | single bond | Me | $CH_2CF_3$ | $CH_2$OC(═O)Me | Me | H | O |
| D-6149 | Me | single bond | H | $CH_2CF_3$ | $CH_2$OC(═O)Me | Me | H | O |
| D-6150 | Me(R) | single bond | H | $CH_2CF_3$ | $CH_2$OC(═O)Me | Me | H | O |
| D-6151 | Me(S) | single bond | H | $CH_2CF_3$ | $CH_2$OC(═O)Me | Me | H | O |
| D-6152 | H | $CH_2$ | Me | $CH_2CF_3$ | $CH_2$OC(═O)Me | Me | H | O |
| D-6153 | Me | $CH_2$ | H | $CH_2CF_3$ | $CH_2$OC(═O)Me | Me | H | O |
| D-6154 | H | CH(Me) | H | $CH_2CF_3$ | $CH_2$OC(═O)Me | Me | H | O |
| D-6155 | H | $CH_2CH_2$ | Me | $CH_2CF_3$ | $CH_2$OC(═O)Me | Me | H | O |
| D-6156 | Me | $CH_2CH_2$ | H | $CH_2CF_3$ | $CH_2$OC(═O)Me | Me | H | O |
| D-6157 | H | single bond | Me | $CH_2CF_3$ | $CH_2$OC(═O)(i-Pr) | Cl | H | O |
| D-6158 | Me | single bond | H | $CH_2CF_3$ | $CH_2$OC(═O)(i-Pr) | Cl | H | O |
| D-6159 | Me(R) | single bond | H | $CH_2CF_3$ | $CH_2$OC(═O)(i-Pr) | Cl | H | O |
| D-6160 | Me(S) | single bond | H | $CH_2CF_3$ | $CH_2$OC(═O)(i-Pr) | Cl | H | O |
| D-6161 | H | $CH_2$ | Me | $CH_2CF_3$ | $CH_2$OC(═O)(i-Pr) | Cl | H | O |
| D-6162 | Me | $CH_2$ | H | $CH_2CF_3$ | $CH_2$OC(═O)(i-Pr) | Cl | H | O |
| D-6163 | H | CH(Me) | H | $CH_2CF_3$ | $CH_2$OC(═O)(i-Pr) | Cl | H | O |
| D-6164 | H | $CH_2CH_2$ | Me | $CH_2CF_3$ | $CH_2$OC(═O)(i-Pr) | Cl | H | O |
| D-6165 | Me | $CH_2CH_2$ | H | $CH_2CF_3$ | $CH_2$OC(═O)(i-Pr) | Cl | H | O |
| D-6166 | H | single bond | Me | $CH_2CF_3$ | $CH_2$OC(═O)(i-Pr) | Me | H | O |

TABLE 786

| Compound Number | Y | W | Z | $R^1$ | $R^2$ | $R^3$ | $R^{10}$ | A |
|---|---|---|---|---|---|---|---|---|
| D-6167 | Me | single bond | H | $CH_2CF_3$ | $CH_2$OC(═O)(i-Pr) | Me | H | O |
| D-6168 | Me(R) | single bond | H | $CH_2CF_3$ | $CH_2$OC(═O)(i-Pr) | Me | H | O |
| D-6169 | Me(S) | single bond | H | $CH_2CF_3$ | $CH_2$OC(═O)(i-Pr) | Me | H | O |
| D-6170 | H | $CH_2$ | Me | $CH_2CF_3$ | $CH_2$OC(═O)(i-Pr) | Me | H | O |
| D-6171 | Me | $CH_2$ | H | $CH_2CF_3$ | $CH_2$OC(═O)(i-Pr) | Me | H | O |
| D-6172 | H | CH(Me) | H | $CH_2CF_3$ | $CH_2$OC(═O)(i-Pr) | Me | H | O |
| D-6173 | H | $CH_2CH_2$ | Me | $CH_2CF_3$ | $CH_2$OC(═O)(i-Pr) | Me | H | O |
| D-6174 | Me | $CH_2CH_2$ | H | $CH_2CF_3$ | $CH_2$OC(═O)(i-Pr) | Me | H | O |
| D-6175 | H | single bond | Me | $CH_2CF_3$ | $CH_2$OC(═O)(t-Bu) | Cl | H | O |
| D-6176 | Me | single bond | H | $CH_2CF_3$ | $CH_2$OC(═O)(t-Bu) | Cl | H | O |
| D-6177 | Me(R) | single bond | H | $CH_2CF_3$ | $CH_2$OC(═O)(t-Bu) | Cl | H | O |
| D-6178 | Me(S) | single bond | H | $CH_2CF_3$ | $CH_2$OC(═O)(t-Bu) | Cl | H | O |
| D-6179 | H | $CH_2$ | Me | $CH_2CF_3$ | $CH_2$OC(═O)(t-Bu) | Cl | H | O |
| D-6180 | Me | $CH_2$ | H | $CH_2CF_3$ | $CH_2$OC(═O)(t-Bu) | Cl | H | O |
| D-6181 | H | CH(Me) | H | $CH_2CF_3$ | $CH_2$OC(═O)(t-Bu) | Cl | H | O |
| D-6182 | H | $CH_2CH_2$ | Me | $CH_2CF_3$ | $CH_2$OC(═O)(t-Bu) | Cl | H | O |
| D-6183 | Me | $CH_2CH_2$ | H | $CH_2CF_3$ | $CH_2$OC(═O)(t-Bu) | Cl | H | O |
| D-6184 | H | single bond | Me | $CH_2CF_3$ | $CH_2$OC(═O)(t-Bu) | Me | H | O |
| D-6185 | Me | single bond | H | $CH_2CF_3$ | $CH_2$OC(═O)(t-Bu) | Me | H | O |
| D-6186 | Me(R) | single bond | H | $CH_2CF_3$ | $CH_2$OC(═O)(t-Bu) | Me | H | O |
| D-6187 | Me(S) | single bond | H | $CH_2CF_3$ | $CH_2$OC(═O)(t-Bu) | Me | H | O |
| D-6188 | H | $CH_2$ | Me | $CH_2CF_3$ | $CH_2$OC(═O)(t-Bu) | Me | H | O |
| D-6189 | Me | $CH_2$ | H | $CH_2CF_3$ | $CH_2$OC(═O)(t-Bu) | Me | H | O |

TABLE 786-continued

| Compound Number | Y | W | Z | $R^1$ | $R^2$ | $R^3$ | $R^{10}$ | A |
|---|---|---|---|---|---|---|---|---|
| D-6190 | H | CH(Me) | H | $CH_2CF_3$ | $CH_2OC(=O)(t\text{-}Bu)$ | Me | H | O |
| D-6191 | H | $CH_2CH_2$ | Me | $CH_2CF_3$ | $CH_2OC(=O)(t\text{-}Bu)$ | Me | H | O |
| D-6192 | Me | $CH_2CH_2$ | H | $CH_2CF_3$ | $CH_2OC(=O)(t\text{-}Bu)$ | Me | H | O |
| D-6193 | H | single bond | Me | $CH_2CF_3$ | $CH_2OC(=O)OEt$ | Cl | H | O |
| D-6194 | Me | single bond | H | $CH_2CF_3$ | $CH_2OC(=O)OEt$ | Cl | H | O |
| D-6195 | Me(R) | single bond | H | $CH_2CF_3$ | $CH_2OC(=O)OEt$ | Cl | H | O |
| D-6196 | Me(S) | single bond | H | $CH_2CF_3$ | $CH_2OC(=O)OEt$ | Cl | H | O |
| D-6197 | H | $CH_2$ | Me | $CH_2CF_3$ | $CH_2OC(=O)OEt$ | Cl | H | O |
| D-6198 | Me | $CH_2$ | H | $CH_2CF_3$ | $CH_2OC(=O)OEt$ | Cl | H | O |
| D-6199 | H | CH(Me) | H | $CH_2CF_3$ | $CH_2OC(=O)OEt$ | Cl | H | O |
| D-6200 | H | $CH_2CH_2$ | Me | $CH_2CF_3$ | $CH_2OC(=O)OEt$ | Cl | H | O |
| D-6201 | Me | $CH_2CH_2$ | H | $CH_2CF_3$ | $CH_2OC(=O)OEt$ | Cl | H | O |
| D-6202 | H | single bond | Me | $CH_2CF_3$ | $CH_2OC(=O)OEt$ | Me | H | O |
| D-6203 | Me | single bond | H | $CH_2CF_3$ | $CH_2OC(=O)OEt$ | Me | H | O |
| D-6204 | Me(R) | single bond | H | $CH_2CF_3$ | $CH_2OC(=O)OEt$ | Me | H | O |
| D-6205 | Me(S) | single bond | H | $CH_2CF_3$ | $CH_2OC(=O)OEt$ | Me | H | O |
| D-6206 | H | $CH_2$ | Me | $CH_2CF_3$ | $CH_2OC(=O)OEt$ | Me | H | O |
| D-6207 | Me | $CH_2$ | H | $CH_2CF_3$ | $CH_2OC(=O)OEt$ | Me | H | O |
| D-6208 | H | CH(Me) | H | $CH_2CF_3$ | $CH_2OC(=O)OEt$ | Me | H | O |
| D-6209 | H | $CH_2CH_2$ | Me | $CH_2CF_3$ | $CH_2OC(=O)OEt$ | Me | H | O |
| D-6210 | Me | $CH_2CH_2$ | H | $CH_2CF_3$ | $CH_2OC(=O)OEt$ | Me | H | O |

TABLE 787

| Compound Number | Y | W | Z | $R^1$ | $R^2$ | $R^3$ | $R^{10}$ | A |
|---|---|---|---|---|---|---|---|---|
| D-6211 | H | single bond | Me | $CH_2CF_3$ | $CH_2OC(=O)O(i\text{-}Pr)$ | Cl | H | O |
| D-6212 | Me | single bond | H | $CH_2CF_3$ | $CH_2OC(=O)O(i\text{-}Pr)$ | Cl | H | O |
| D-6213 | Me(R) | single bond | H | $CH_2CF_3$ | $CH_2OC(=O)O(i\text{-}Pr)$ | Cl | H | O |
| D-6214 | Me(S) | single bond | H | $CH_2CF_3$ | $CH_2OC(=O)O(i\text{-}Pr)$ | Cl | H | O |
| D-6215 | H | $CH_2$ | Me | $CH_2CF_3$ | $CH_2OC(=O)O(i\text{-}Pr)$ | Cl | H | O |
| D-6216 | Me | $CH_2$ | H | $CH_2CF_3$ | $CH_2OC(=O)O(i\text{-}Pr)$ | Cl | H | O |
| D-6217 | H | CH(Me) | H | $CH_2CF_3$ | $CH_2OC(=O)O(i\text{-}Pr)$ | Cl | H | O |
| D-6218 | H | $CH_2CH_2$ | Me | $CH_2CF_3$ | $CH_2OC(=O)O(i\text{-}Pr)$ | Cl | H | O |
| D-6219 | Me | $CH_2CH_2$ | H | $CH_2CF_3$ | $CH_2OC(=O)O(i\text{-}Pr)$ | Cl | H | O |
| D-6220 | H | single bond | Me | $CH_2CF_3$ | $CH_2OC(=O)O(i\text{-}Pr)$ | Me | H | O |
| D-6221 | Me | single bond | H | $CH_2CF_3$ | $CH_2OC(=O)O(i\text{-}Pr)$ | Me | H | O |
| D-6222 | Me(R) | single bond | H | $CH_2CF_3$ | $CH_2OC(=O)O(i\text{-}Pr)$ | Me | H | O |
| D-6223 | Me(S) | single bond | H | $CH_2CF_3$ | $CH_2OC(=O)O(i\text{-}Pr)$ | Me | H | O |
| D-6224 | H | $CH_2$ | Me | $CH_2CF_3$ | $CH_2OC(=O)O(i\text{-}Pr)$ | Me | H | O |
| D-6225 | Me | $CH_2$ | H | $CH_2CF_3$ | $CH_2OC(=O)O(i\text{-}Pr)$ | Me | H | O |
| D-6226 | H | CH(Me) | H | $CH_2CF_3$ | $CH_2OC(=O)O(i\text{-}Pr)$ | Me | H | O |
| D-6227 | H | $CH_2CH_2$ | Me | $CH_2CF_3$ | $CH_2OC(=O)O(i\text{-}Pr)$ | Me | H | O |
| D-6228 | Me | $CH_2CH_2$ | H | $CH_2CF_3$ | $CH_2OC(=O)O(i\text{-}Pr)$ | Me | H | O |
| D-6229 | H | single bond | Me | $CH_2CF_3$ | $CH_2N(Me)C(=O)OMe$ | Cl | H | O |
| D-6230 | Me | single bond | H | $CH_2CF_3$ | $CH_2N(Me)C(=O)OMe$ | Cl | H | O |
| D-6231 | Me(R) | single bond | H | $CH_2CF_3$ | $CH_2N(Me)C(=O)OMe$ | Cl | H | O |
| D-6232 | Me(S) | single bond | H | $CH_2CF_3$ | $CH_2N(Me)C(=O)OMe$ | Cl | H | O |
| D-6233 | H | $CH_2$ | Me | $CH_2CF_3$ | $CH_2N(Me)C(=O)OMe$ | Cl | H | O |
| D-6234 | Me | $CH_2$ | H | $CH_2CF_3$ | $CH_2N(Me)C(=O)OMe$ | Cl | H | O |
| D-6235 | H | CH(Me) | H | $CH_2CF_3$ | $CH_2N(Me)C(=O)OMe$ | Cl | H | O |
| D-6236 | H | $CH_2CH_2$ | Me | $CH_2CF_3$ | $CH_2N(Me)C(=O)OMe$ | Cl | H | O |
| D-6237 | Me | $CH_2CH_2$ | H | $CH_2CF_3$ | $CH_2N(Me)C(=O)OMe$ | Cl | H | O |
| D-6238 | H | single bond | Me | $CH_2CF_3$ | $CH_2N(Me)C(=O)OMe$ | Me | H | O |
| D-6239 | Me | single bond | H | $CH_2CF_3$ | $CH_2N(Me)C(=O)OMe$ | Me | H | O |
| D-6240 | Me(R) | single bond | H | $CH_2CF_3$ | $CH_2N(Me)C(=O)OMe$ | Me | H | O |
| D-6241 | Me(S) | single bond | H | $CH_2CF_3$ | $CH_2N(Me)C(=O)OMe$ | Me | H | O |
| D-6242 | H | $CH_2$ | Me | $CH_2CF_3$ | $CH_2N(Me)C(=O)OMe$ | Me | H | O |
| D-6243 | Me | $CH_2$ | H | $CH_2CF_3$ | $CH_2N(Me)C(=O)OMe$ | Me | H | O |
| D-6244 | H | CH(Me) | H | $CH_2CF_3$ | $CH_2N(Me)C(=O)OMe$ | Me | H | O |
| D-6245 | H | $CH_2CH_2$ | Me | $CH_2CF_3$ | $CH_2N(Me)C(=O)OMe$ | Me | H | O |
| D-6246 | Me | $CH_2CH_2$ | H | $CH_2CF_3$ | $CH_2N(Me)C(=O)OMe$ | Me | H | O |
| D-6247 | H | single bond | Me | $CH_2CF_3$ | $C(=O)OCH_2CH=CH_2$ | Cl | Me | O |
| D-6248 | Me | single bond | H | $CH_2CF_3$ | $C(=O)OCH_2CH=CH_2$ | Cl | Me | O |
| D-6249 | Me(R) | single bond | H | $CH_2CF_3$ | $C(=O)OCH_2CH=CH_2$ | Cl | Me | O |
| D-6250 | Me(S) | single bond | H | $CH_2CF_3$ | $C(=O)OCH_2CH=CH_2$ | Cl | Me | O |
| D-6251 | H | $CH_2$ | Me | $CH_2CF_3$ | $C(=O)OCH_2CH=CH_2$ | Cl | Me | O |
| D-6252 | Me | $CH_2$ | H | $CH_2CF_3$ | $C(=O)OCH_2CH=CH_2$ | Cl | Me | O |
| D-6253 | H | CH(Me) | H | $CH_2CF_3$ | $C(=O)OCH_2CH=CH_2$ | Cl | Me | O |
| D-6254 | H | $CH_2CH_2$ | Me | $CH_2CF_3$ | $C(=O)OCH_2CH=CH_2$ | Cl | Me | O |

TABLE 788

| Compound Number | Y | W | Z | $R^1$ | $R^2$ | $R^3$ | $R^{10}$ | A |
|---|---|---|---|---|---|---|---|---|
| D-6255 | Me | $CH_2CH_2$ | H | $CH_2CF_3$ | $C(=O)OCH_2CH=CH_2$ | Cl | Me | O |
| D-6256 | H | single bond | Me | $CH_2CF_3$ | $C(=O)OCH_2CH=CH_2$ | Me | Me | O |
| D-6257 | Me | single bond | H | $CH_2CF_3$ | $C(=O)OCH_2CH=CH_2$ | Me | Me | O |
| D-6258 | Me(R) | single bond | H | $CH_2CF_3$ | $C(=O)OCH_2CH=CH_2$ | Me | Me | O |
| D-6259 | Me(S) | single bond | H | $CH_2CF_3$ | $C(=O)OCH_2CH=CH_2$ | Me | Me | O |
| D-6260 | H | $CH_2$ | Me | $CH_2CF_3$ | $C(=O)OCH_2CH=CH_2$ | Me | Me | O |
| D-6261 | Me | $CH_2$ | H | $CH_2CF_3$ | $C(=O)OCH_2CH=CH_2$ | Me | Me | O |
| D-6262 | H | CH(Me) | H | $CH_2CF_3$ | $C(=O)OCH_2CH=CH_2$ | Me | Me | O |
| D-6263 | H | $CH_2CH_2$ | Me | $CH_2CF_3$ | $C(=O)OCH_2CH=CH_2$ | Me | Me | O |
| D-6264 | Me | $CH_2CH_2$ | H | $CH_2CF_3$ | $C(=O)OCH_2CH=CH_2$ | Me | Me | O |
| D-6265 | H | single bond | Me | $CH_2CF_3$ | $C(=O)OCH_2CCl_3$ | Cl | Me | O |
| D-6266 | Me | single bond | H | $CH_2CF_3$ | $C(=O)OCH_2CCl_3$ | Cl | Me | O |
| D-6267 | Me(R) | single bond | H | $CH_2CF_3$ | $C(=O)OCH_2CCl_3$ | Cl | Me | O |
| D-6268 | Me(S) | single bond | H | $CH_2CF_3$ | $C(=O)OCH_2CCl_3$ | Cl | Me | O |
| D-6269 | H | $CH_2$ | Me | $CH_2CF_3$ | $C(=O)OCH_2CCl_3$ | Cl | Me | O |
| D-6270 | Me | $CH_2$ | H | $CH_2CF_3$ | $C(=O)OCH_2CCl_3$ | Cl | Me | O |
| D-6271 | H | CH(Me) | H | $CH_2CF_3$ | $C(=O)OCH_2CCl_3$ | Cl | Me | O |
| D-6272 | H | $CH_2CH_2$ | Me | $CH_2CF_3$ | $C(=O)OCH_2CCl_3$ | Cl | Me | O |
| D-6273 | Me | $CH_2CH_2$ | H | $CH_2CF_3$ | $C(=O)OCH_2CCl_3$ | Cl | Me | O |
| D-6274 | H | single bond | Me | $CH_2CF_3$ | $C(=O)OCH_2CCl_3$ | Me | Me | O |
| D-6275 | Me | single bond | H | $CH_2CF_3$ | $C(=O)OCH_2CCl_3$ | Me | Me | O |
| D-6276 | Me(R) | single bond | H | $CH_2CF_3$ | $C(=O)OCH_2CCl_3$ | Me | Me | O |
| D-6277 | Me(S) | single bond | H | $CH_2CF_3$ | $C(=O)OCH_2CCl_3$ | Me | Me | O |
| D-6278 | H | $CH_2$ | Me | $CH_2CF_3$ | $C(=O)OCH_2CCl_3$ | Me | Me | O |
| D-6279 | Me | $CH_2$ | H | $CH_2CF_3$ | $C(=O)OCH_2CCl_3$ | Me | Me | O |
| D-6280 | H | CH(Me) | H | $CH_2CF_3$ | $C(=O)OCH_2CCl_3$ | Me | Me | O |
| D-6281 | H | $CH_2CH_2$ | Me | $CH_2CF_3$ | $C(=O)OCH_2CCl_3$ | Me | Me | O |
| D-6282 | Me | $CH_2CH_2$ | H | $CH_2CF_3$ | $C(=O)OCH_2CCl_3$ | Me | Me | O |
| D-6283 | H | single bond | Me | $CH_2CF_3$ | $C(=O)N(Me)_2$ | Cl | Me | O |
| D-6284 | Me | single bond | H | $CH_2CF_3$ | $C(=O)N(Me)_2$ | Cl | Me | O |
| D-6285 | Me(R) | single bond | H | $CH_2CF_3$ | $C(=O)N(Me)_2$ | Cl | Me | O |
| D-6286 | Me(S) | single bond | H | $CH_2CF_3$ | $C(=O)N(Me)_2$ | Cl | Me | O |
| D-6287 | H | $CH_2$ | Me | $CH_2CF_3$ | $C(=O)N(Me)_2$ | Cl | Me | O |
| D-6288 | Me | $CH_2$ | H | $CH_2CF_3$ | $C(=O)N(Me)_2$ | Cl | Me | O |
| D-6289 | H | CH(Me) | H | $CH_2CF_3$ | $C(=O)N(Me)_2$ | Cl | Me | O |
| D-6290 | H | $CH_2CH_2$ | Me | $CH_2CF_3$ | $C(=O)N(Me)_2$ | Cl | Me | O |
| D-6291 | Me | $CH_2CH_2$ | H | $CH_2CF_3$ | $C(=O)N(Me)_2$ | Cl | Me | O |
| D-6292 | H | single bond | Me | $CH_2CF_3$ | $C(=O)N(Me)_2$ | Me | Me | O |
| D-6293 | Me | single bond | H | $CH_2CF_3$ | $C(=O)N(Me)_2$ | Me | Me | O |
| D-6294 | Me(R) | single bond | H | $CH_2CF_3$ | $C(=O)N(Me)_2$ | Me | Me | O |
| D-6295 | Me(S) | single bond | H | $CH_2CF_3$ | $C(=O)N(Me)_2$ | Me | Me | O |
| D-6296 | H | $CH_2$ | Me | $CH_2CF_3$ | $C(=O)N(Me)_2$ | Me | Me | O |
| D-6297 | Me | $CH_2$ | H | $CH_2CF_3$ | $C(=O)N(Me)_2$ | Me | Me | O |
| D-6298 | H | CH(Me) | H | $CH_2CF_3$ | $C(=O)N(Me)_2$ | Me | Me | O |

TABLE 789

| Compound Number | Y | W | Z | $R^1$ | $R^2$ | $R^3$ | $R^{10}$ | A |
|---|---|---|---|---|---|---|---|---|
| D-6299 | H | $CH_2CH_2$ | Me | $CH_2CF_3$ | $C(=O)N(Me)_2$ | Me | Me | O |
| D-6300 | Me | $CH_2CH_2$ | H | $CH_2CF_3$ | $C(=O)N(Me)_2$ | Me | Me | O |
| D-6301 | H | single bond | Me | $CH_2CF_3$ | $CH_2OC(=O)Me$ | Cl | Me | O |
| D-6302 | Me | single bond | H | $CH_2CF_3$ | $CH_2OC(=O)Me$ | Cl | Me | O |
| D-6303 | Me(R) | single bond | H | $CH_2CF_3$ | $CH_2OC(=O)Me$ | Cl | Me | O |
| D-6304 | Me(S) | single bond | H | $CH_2CF_3$ | $CH_2OC(=O)Me$ | Cl | Me | O |
| D-6305 | H | $CH_2$ | Me | $CH_2CF_3$ | $CH_2OC(=O)Me$ | Cl | Me | O |
| D-6306 | Me | $CH_2$ | H | $CH_2CF_3$ | $CH_2OC(=O)Me$ | Cl | Me | O |
| D-6307 | H | CH(Me) | H | $CH_2CF_3$ | $CH_2OC(=O)Me$ | Cl | Me | O |
| D-6308 | H | $CH_2CH_2$ | Me | $CH_2CF_3$ | $CH_2OC(=O)Me$ | Cl | Me | O |
| D-6309 | Me | $CH_2CH_2$ | H | $CH_2CF_3$ | $CH_2OC(=O)Me$ | Cl | Me | O |
| D-6310 | H | single bond | Me | $CH_2CF_3$ | $CH_2OC(=O)Me$ | Me | Me | O |
| D-6311 | Me | single bond | H | $CH_2CF_3$ | $CH_2OC(=O)Me$ | Me | Me | O |
| D-6312 | Me(R) | single bond | H | $CH_2CF_3$ | $CH_2OC(=O)Me$ | Me | Me | O |
| D-6313 | Me(S) | single bond | H | $CH_2CF_3$ | $CH_2OC(=O)Me$ | Me | Me | O |
| D-6314 | H | $CH_2$ | Me | $CH_2CF_3$ | $CH_2OC(=O)Me$ | Me | Me | O |
| D-6315 | Me | $CH_2$ | H | $CH_2CF_3$ | $CH_2OC(=O)Me$ | Me | Me | O |
| D-6316 | H | CH(Me) | H | $CH_2CF_3$ | $CH_2OC(=O)Me$ | Me | Me | O |
| D-6317 | H | $CH_2CH_2$ | Me | $CH_2CF_3$ | $CH_2OC(=O)Me$ | Me | Me | O |
| D-6318 | Me | $CH_2CH_2$ | H | $CH_2CF_3$ | $CH_2OC(=O)Me$ | Me | Me | O |
| D-6319 | H | single bond | Me | $CH_2CF_3$ | $CH_2OC(=O)(i-Pr)$ | Cl | Me | O |

TABLE 789-continued

| Compound Number | Y | W | Z | $R^1$ | $R^2$ | $R^3$ | $R^{10}$ | A |
|---|---|---|---|---|---|---|---|---|
| D-6320 | Me | single bond | H | $CH_2CF_3$ | $CH_2OC(=O)(i-Pr)$ | Cl | Me | O |
| D-6321 | Me(R) | single bond | H | $CH_2CF_3$ | $CH_2OC(=O)(i-Pr)$ | Cl | Me | O |
| D-6322 | Me(S) | single bond | H | $CH_2CF_3$ | $CH_2OC(=O)(i-Pr)$ | Cl | Me | O |
| D-6323 | H | $CH_2$ | Me | $CH_2CF_3$ | $CH_2OC(=O)(i-Pr)$ | Cl | Me | O |
| D-6324 | Me | $CH_2$ | H | $CH_2CF_3$ | $CH_2OC(=O)(i-Pr)$ | Cl | Me | O |
| D-6325 | H | CH(Me) | H | $CH_2CF_3$ | $CH_2OC(=O)(i-Pr)$ | Cl | Me | O |
| D-6326 | H | $CH_2CH_2$ | Me | $CH_2CF_3$ | $CH_2OC(=O)(i-Pr)$ | Cl | Me | O |
| D-6327 | Me | $CH_2CH_2$ | H | $CH_2CF_3$ | $CH_2OC(=O)(i-Pr)$ | Cl | Me | O |
| D-6328 | H | single bond | Me | $CH_2CF_3$ | $CH_2OC(=O)(i-Pr)$ | Me | Me | O |
| D-6329 | Me | single bond | H | $CH_2CF_3$ | $CH_2OC(=O)(i-Pr)$ | Me | Me | O |
| D-6330 | Me(R) | single bond | H | $CH_2CF_3$ | $CH_2OC(=O)(i-Pr)$ | Me | Me | O |
| D-6331 | Me(S) | single bond | H | $CH_2CF_3$ | $CH_2OC(=O)(i-Pr)$ | Me | Me | O |
| D-6332 | H | $CH_2$ | Me | $CH_2CF_3$ | $CH_2OC(=O)(i-Pr)$ | Me | Me | O |
| D-6333 | Me | $CH_2$ | H | $CH_2CF_3$ | $CH_2OC(=O)(i-Pr)$ | Me | Me | O |
| D-6334 | H | CH(Me) | H | $CH_2CF_3$ | $CH_2OC(=O)(i-Pr)$ | Me | Me | O |
| D-6335 | H | $CH_2CH_2$ | Me | $CH_2CF_3$ | $CH_2OC(=O)(i-Pr)$ | Me | Me | O |
| D-6336 | Me | $CH_2CH_2$ | H | $CH_2CF_3$ | $CH_2OC(=O)(i-Pr)$ | Me | Me | O |
| D-6337 | H | single bond | Me | $CH_2CF_3$ | $CH_2OC(=O)(t-Bu)$ | Cl | Me | O |
| D-6338 | Me | single bond | H | $CH_2CF_3$ | $CH_2OC(=O)(t-Bu)$ | Cl | Me | O |
| D-6339 | Me(R) | single bond | H | $CH_2CF_3$ | $CH_2OC(=O)(t-Bu)$ | Cl | Me | O |
| D-6340 | Me(S) | single bond | H | $CH_2CF_3$ | $CH_2OC(=O)(t-Bu)$ | Cl | Me | O |
| D-6341 | H | $CH_2$ | Me | $CH_2CF_3$ | $CH_2OC(=O)(t-Bu)$ | Cl | Me | O |
| D-6342 | Me | $CH_2$ | H | $CH_2CF_3$ | $CH_2OC(=O)(t-Bu)$ | Cl | Me | O |

TABLE 790

| Compound Number | Y | W | Z | $R^1$ | $R^2$ | $R^3$ | $R^{10}$ | A |
|---|---|---|---|---|---|---|---|---|
| D-6343 | H | CH(Me) | H | $CH_2CF_3$ | $CH_2OC(=O)(t-Bu)$ | Cl | Me | O |
| D-6344 | H | $CH_2CH_2$ | Me | $CH_2CF_3$ | $CH_2OC(=O)(t-Bu)$ | Cl | Me | O |
| D-6345 | Me | $CH_2CH_2$ | H | $CH_2CF_3$ | $CH_2OC(=O)(t-Bu)$ | Cl | Me | O |
| D-6346 | H | single bond | Me | $CH_2CF_3$ | $CH_2OC(=O)(t-Bu)$ | Me | Me | O |
| D-6347 | Me | single bond | H | $CH_2CF_3$ | $CH_2OC(=O)(t-Bu)$ | Me | Me | O |
| D-6348 | Me(R) | single bond | H | $CH_2CF_3$ | $CH_2OC(=O)(t-Bu)$ | Me | Me | O |
| D-6349 | Me(S) | single bond | H | $CH_2CF_3$ | $CH_2OC(=O)(t-Bu)$ | Me | Me | O |
| D-6350 | H | $CH_2$ | Me | $CH_2CF_3$ | $CH_2OC(=O)(t-Bu)$ | Me | Me | O |
| D-6351 | Me | $CH_2$ | H | $CH_2CF_3$ | $CH_2OC(=O)(t-Bu)$ | Me | Me | O |
| D-6352 | H | CH(Me) | H | $CH_2CF_3$ | $CH_2OC(=O)(t-Bu)$ | Me | Me | O |
| D-6353 | H | $CH_2CH_2$ | Me | $CH_2CF_3$ | $CH_2OC(=O)(t-Bu)$ | Me | Me | O |
| D-6354 | Me | $CH_2CH_2$ | H | $CH_2CF_3$ | $CH_2OC(=O)(t-Bu)$ | Me | Me | O |
| D-6355 | H | single bond | Me | $CH_2CF_3$ | $CH_2OC(=O)OEt$ | Cl | Me | O |
| D-6356 | Me | single bond | H | $CH_2CF_3$ | $CH_2OC(=O)OEt$ | Cl | Me | O |
| D-6357 | Me(R) | single bond | H | $CH_2CF_3$ | $CH_2OC(=O)OEt$ | Cl | Me | O |
| D-6358 | Me(S) | single bond | H | $CH_2CF_3$ | $CH_2OC(=O)OEt$ | Cl | Me | O |
| D-6359 | H | $CH_2$ | Me | $CH_2CF_3$ | $CH_2OC(=O)OEt$ | Cl | Me | O |
| D-6360 | Me | $CH_2$ | H | $CH_2CF_3$ | $CH_2OC(=O)OEt$ | Cl | Me | O |
| D-6361 | H | CH(Me) | H | $CH_2CF_3$ | $CH_2OC(=O)OEt$ | Cl | Me | O |
| D-6362 | H | $CH_2CH_2$ | Me | $CH_2CF_3$ | $CH_2OC(=O)OEt$ | Cl | Me | O |
| D-6363 | Me | $CH_2CH_2$ | H | $CH_2CF_3$ | $CH_2OC(=O)OEt$ | Cl | Me | O |
| D-6364 | H | single bond | Me | $CH_2CF_3$ | $CH_2OC(=O)OEt$ | Me | Me | O |
| D-6365 | Me | single bond | H | $CH_2CF_3$ | $CH_2OC(=O)OEt$ | Me | Me | O |
| D-6366 | Me(R) | single bond | H | $CH_2CF_3$ | $CH_2OC(=O)OEt$ | Me | Me | O |
| D-6367 | Me(S) | single bond | H | $CH_2CF_3$ | $CH_2OC(=O)OEt$ | Me | Me | O |
| D-6368 | H | $CH_2$ | Me | $CH_2CF_3$ | $CH_2OC(=O)OEt$ | Me | Me | O |
| D-6369 | Me | $CH_2$ | H | $CH_2CF_3$ | $CH_2OC(=O)OEt$ | Me | Me | O |
| D-6370 | H | CH(Me) | H | $CH_2CF_3$ | $CH_2OC(=O)OEt$ | Me | Me | O |
| D-6371 | H | $CH_2CH_2$ | Me | $CH_2CF_3$ | $CH_2OC(=O)OEt$ | Me | Me | O |
| D-6372 | Me | $CH_2CH_2$ | H | $CH_2CF_3$ | $CH_2OC(=O)OEt$ | Me | Me | O |
| D-6373 | H | single bond | Me | $CH_2CF_3$ | $CH_2OC(=O)O(i-Pr)$ | Cl | Me | O |
| D-6374 | Me | single bond | H | $CH_2CF_3$ | $CH_2OC(=O)O(i-Pr)$ | Cl | Me | O |
| D-6375 | Me(R) | single bond | H | $CH_2CF_3$ | $CH_2OC(=O)O(i-Pr)$ | Cl | Me | O |
| D-6376 | Me(S) | single bond | H | $CH_2CF_3$ | $CH_2OC(=O)O(i-Pr)$ | Cl | Me | O |
| D-6377 | H | $CH_2$ | Me | $CH_2CF_3$ | $CH_2OC(=O)O(i-Pr)$ | Cl | Me | O |
| D-6378 | Me | $CH_2$ | H | $CH_2CF_3$ | $CH_2OC(=O)O(i-Pr)$ | Cl | Me | O |
| D-6379 | H | CH(Me) | H | $CH_2CF_3$ | $CH_2OC(=O)O(i-Pr)$ | Cl | Me | O |
| D-6380 | H | $CH_2CH_2$ | Me | $CH_2CF_3$ | $CH_2OC(=O)O(i-Pr)$ | Cl | Me | O |
| D-6381 | Me | $CH_2CH_2$ | H | $CH_2CF_3$ | $CH_2OC(=O)O(i-Pr)$ | Cl | Me | O |
| D-6382 | H | single bond | Me | $CH_2CF_3$ | $CH_2OC(=O)O(i-Pr)$ | Me | Me | O |
| D-6383 | Me | single bond | H | $CH_2CF_3$ | $CH_2OC(=O)O(i-Pr)$ | Me | Me | O |
| D-6384 | Me(R) | single bond | H | $CH_2CF_3$ | $CH_2OC(=O)O(i-Pr)$ | Me | Me | O |

TABLE 790-continued

| Compound Number | Y | W | Z | $R^1$ | $R^2$ | $R^3$ | $R^{10}$ | A |
|---|---|---|---|---|---|---|---|---|
| D-6385 | Me(S) | single bond | H | $CH_2CF_3$ | $CH_2OC(=O)O(i\text{-}Pr)$ | Me | Me | O |
| D-6386 | H | $CH_2$ | Me | $CH_2CF_3$ | $CH_2OC(=O)O(i\text{-}Pr)$ | Me | Me | O |

TABLE 791

| Compound Number | Y | W | Z | $R^1$ | $R^2$ | $R^3$ | $R^{10}$ | A |
|---|---|---|---|---|---|---|---|---|
| D-6387 | Me | $CH_2$ | H | $CH_2CF_3$ | $CH_2OC(=O)O(i\text{-}Pr)$ | Me | Me | O |
| D-6388 | H | CH(Me) | H | $CH_2CF_3$ | $CH_2OC(=O)O(i\text{-}Pr)$ | Me | Me | O |
| D-6389 | H | $CH_2CH_2$ | Me | $CH_2CF_3$ | $CH_2OC(=O)O(i\text{-}Pr)$ | Me | Me | O |
| D-6390 | Me | $CH_2CH_2$ | H | $CH_2CF_3$ | $CH_2OC(=O)O(i\text{-}Pr)$ | Me | Me | O |
| D-6391 | H | single bond | Me | $CH_2CF_3$ | $CH_2N(Me)C(=O)OMe$ | Cl | Me | O |
| D-6392 | Me | single bond | H | $CH_2CF_3$ | $CH_2N(Me)C(=O)OMe$ | Cl | Me | O |
| D-6393 | Me(R) | single bond | H | $CH_2CF_3$ | $CH_2N(Me)C(=O)OMe$ | Cl | Me | O |
| D-6394 | Me(S) | single bond | H | $CH_2CF_3$ | $CH_2N(Me)C(=O)OMe$ | Cl | Me | O |
| D-6395 | H | $CH_2$ | Me | $CH_2CF_3$ | $CH_2N(Me)C(=O)OMe$ | Cl | Me | O |
| D-6396 | Me | $CH_2$ | H | $CH_2CF_3$ | $CH_2N(Me)C(=O)OMe$ | Cl | Me | O |
| D-6397 | H | CH(Me) | H | $CH_2CF_3$ | $CH_2N(Me)C(=O)OMe$ | Cl | Me | O |
| D-6398 | H | $CH_2CH_2$ | Me | $CH_2CF_3$ | $CH_2N(Me)C(=O)OMe$ | Cl | Me | O |
| D-6399 | Me | $CH_2CH_2$ | H | $CH_2CF_3$ | $CH_2N(Me)C(=O)OMe$ | Cl | Me | O |
| D-6400 | H | single bond | Me | $CH_2CF_3$ | $CH_2N(Me)C(=O)OMe$ | Me | Me | O |
| D-6401 | Me | single bond | H | $CH_2CF_3$ | $CH_2N(Me)C(=O)OMe$ | Me | Me | O |
| D-6402 | Me(R) | single bond | H | $CH_2CF_3$ | $CH_2N(Me)C(=O)OMe$ | Me | Me | O |
| D-6403 | Me(S) | single bond | H | $CH_2CF_3$ | $CH_2N(Me)C(=O)OMe$ | Me | Me | O |
| D-6404 | H | $CH_2$ | Me | $CH_2CF_3$ | $CH_2N(Me)C(=O)OMe$ | Me | Me | O |
| D-6405 | Me | $CH_2$ | H | $CH_2CF_3$ | $CH_2N(Me)C(=O)OMe$ | Me | Me | O |
| D-6406 | H | CH(Me) | H | $CH_2CF_3$ | $CH_2N(Me)C(=O)OMe$ | Me | Me | O |
| D-6407 | H | $CH_2CH_2$ | Me | $CH_2CF_3$ | $CH_2N(Me)C(=O)OMe$ | Me | Me | O |
| D-6408 | Me | $CH_2CH_2$ | H | $CH_2CF_3$ | $CH_2N(Me)C(=O)OMe$ | Me | Me | O |
| D-6409 | H | single bond | Me | $CH_2CF_3$ | $C(=O)OCH_2CH=CH_2$ | Cl | $CH_2OMe$ | O |
| D-6410 | Me | single bond | H | $CH_2CF_3$ | $C(=O)OCH_2CH=CH_2$ | Cl | $CH_2OMe$ | O |
| D-6411 | Me(R) | single bond | H | $CH_2CF_3$ | $C(=O)OCH_2CH=CH_2$ | Cl | $CH_2OMe$ | O |
| D-6412 | Me(S) | single bond | H | $CH_2CF_3$ | $C(=O)OCH_2CH=CH_2$ | Cl | $CH_2OMe$ | O |
| D-6413 | H | $CH_2$ | Me | $CH_2CF_3$ | $C(=O)OCH_2CH=CH_2$ | Cl | $CH_2OMe$ | O |
| D-6414 | Me | $CH_2$ | H | $CH_2CF_3$ | $C(=O)OCH_2CH=CH_2$ | Cl | $CH_2OMe$ | O |
| D-6415 | H | CH(Me) | H | $CH_2CF_3$ | $C(=O)OCH_2CH=CH_2$ | Cl | $CH_2OMe$ | O |
| D-6416 | H | $CH_2CH_2$ | Me | $CH_2CF_3$ | $C(=O)OCH_2CH=CH_2$ | Cl | $CH_2OMe$ | O |
| D-6417 | Me | $CH_2CH_2$ | H | $CH_2CF_3$ | $C(=O)OCH_2CH=CH_2$ | Cl | $CH_2OMe$ | O |
| D-6418 | H | single bond | Me | $CH_2CF_3$ | $C(=O)OCH_2CH=CH_2$ | Me | $CH_2OMe$ | O |
| D-6419 | Me | single bond | H | $CH_2CF_3$ | $C(=O)OCH_2CH=CH_2$ | Me | $CH_2OMe$ | O |
| D-6420 | Me(R) | single bond | H | $CH_2CF_3$ | $C(=O)OCH_2CH=CH_2$ | Me | $CH_2OMe$ | O |
| D-6421 | Me(S) | single bond | H | $CH_2CF_3$ | $C(=O)OCH_2CH=CH_2$ | Me | $CH_2OMe$ | O |
| D-6422 | H | $CH_2$ | Me | $CH_2CF_3$ | $C(=O)OCH_2CH=CH_2$ | Me | $CH_2OMe$ | O |
| D-6423 | Me | $CH_2$ | H | $CH_2CF_3$ | $C(=O)OCH_2CH=CH_2$ | Me | $CH_2OMe$ | O |
| D-6424 | H | CH(Me) | H | $CH_2CF_3$ | $C(=O)OCH_2CH=CH_2$ | Me | $CH_2OMe$ | O |
| D-6425 | H | $CH_2CH_2$ | Me | $CH_2CF_3$ | $C(=O)OCH_2CH=CH_2$ | Me | $CH_2OMe$ | O |
| D-6426 | Me | $CH_2CH_2$ | H | $CH_2CF_3$ | $C(=O)OCH_2CH=CH_2$ | Me | $CH_2OMe$ | O |
| D-6427 | H | single bond | Me | $CH_2CF_3$ | $C(=O)OCH_2CCl_3$ | Cl | $CH_2OMe$ | O |
| D-6428 | Me | single bond | H | $CH_2CF_3$ | $C(=O)OCH_2CCl_3$ | Cl | $CH_2OMe$ | O |
| D-6429 | Me(R) | single bond | H | $CH_2CF_3$ | $C(=O)OCH_2CCl_3$ | Cl | $CH_2OMe$ | O |
| D-6430 | Me(S) | single bond | H | $CH_2CF_3$ | $C(=O)OCH_2CCl_3$ | Cl | $CH_2OMe$ | O |

TABLE 792

| Compound Number | Y | W | Z | $R^1$ | $R^2$ | $R^3$ | $R^{10}$ | A |
|---|---|---|---|---|---|---|---|---|
| D-6431 | H | $CH_2$ | Me | $CH_2CF_3$ | $C(=O)OCH_2CCl_3$ | Cl | $CH_2OMe$ | O |
| D-6432 | Me | $CH_2$ | H | $CH_2CF_3$ | $C(=O)OCH_2CCl_3$ | Cl | $CH_2OMe$ | O |
| D-6433 | H | CH(Me) | H | $CH_2CF_3$ | $C(=O)OCH_2CCl_3$ | Cl | $CH_2OMe$ | O |
| D-6434 | H | $CH_2CH_2$ | Me | $CH_2CF_3$ | $C(=O)OCH_2CCl_3$ | Cl | $CH_2OMe$ | O |
| D-6435 | Me | $CH_2CH_2$ | H | $CH_2CF_3$ | $C(=O)OCH_2CCl_3$ | Cl | $CH_2OMe$ | O |
| D-6436 | H | single bond | Me | $CH_2CF_3$ | $C(=O)OCH_2CCl_3$ | Me | $CH_2OMe$ | O |
| D-6437 | Me | single bond | H | $CH_2CF_3$ | $C(=O)OCH_2CCl_3$ | Me | $CH_2OMe$ | O |
| D-6438 | Me(R) | single bond | H | $CH_2CF_3$ | $C(=O)OCH_2CCl_3$ | Me | $CH_2OMe$ | O |
| D-6439 | Me(S) | single bond | H | $CH_2CF_3$ | $C(=O)OCH_2CCl_3$ | Me | $CH_2OMe$ | O |
| D-6440 | H | $CH_2$ | Me | $CH_2CF_3$ | $C(=O)OCH_2CCl_3$ | Me | $CH_2OMe$ | O |
| D-6441 | Me | $CH_2$ | H | $CH_2CF_3$ | $C(=O)OCH_2CCl_3$ | Me | $CH_2OMe$ | O |
| D-6442 | H | CH(Me) | H | $CH_2CF_3$ | $C(=O)OCH_2CCl_3$ | Me | $CH_2OMe$ | O |

TABLE 792-continued

| Compound Number | Y | W | Z | $R^1$ | $R^2$ | $R^3$ | $R^{10}$ | A |
|---|---|---|---|---|---|---|---|---|
| D-6443 | H | $CH_2CH_2$ | Me | $CH_2CF_3$ | $C(=O)OCH_2CCl_3$ | Me | $CH_2OMe$ | O |
| D-6444 | Me | $CH_2CH_2$ | H | $CH_2CF_3$ | $C(=O)OCH_2CCl_3$ | Me | $CH_2OMe$ | O |
| D-6445 | H | single bond | Me | $CH_2CF_3$ | $C(=O)N(Me)_2$ | Cl | $CH_2OMe$ | O |
| D-6446 | Me | single bond | H | $CH_2CF_3$ | $C(=O)N(Me)_2$ | Cl | $CH_2OMe$ | O |
| D-6447 | Me(R) | single bond | H | $CH_2CF_3$ | $C(=O)N(Me)_2$ | Cl | $CH_2OMe$ | O |
| D-6448 | Me(S) | single bond | H | $CH_2CF_3$ | $C(=O)N(Me)_2$ | Cl | $CH_2OMe$ | O |
| D-6449 | H | $CH_2$ | Me | $CH_2CF_3$ | $C(=O)N(Me)_2$ | Cl | $CH_2OMe$ | O |
| D-6450 | Me | $CH_2$ | H | $CH_2CF_3$ | $C(=O)N(Me)_2$ | Cl | $CH_2OMe$ | O |
| D-6451 | H | CH(Me) | H | $CH_2CF_3$ | $C(=O)N(Me)_2$ | Cl | $CH_2OMe$ | O |
| D-6452 | H | $CH_2CH_2$ | Me | $CH_2CF_3$ | $C(=O)N(Me)_2$ | Cl | $CH_2OMe$ | O |
| D-6453 | Me | $CH_2CH_2$ | H | $CH_2CF_3$ | $C(=O)N(Me)_2$ | Cl | $CH_2OMe$ | O |
| D-6454 | H | single bond | Me | $CH_2CF_3$ | $C(=O)N(Me)_2$ | Me | $CH_2OMe$ | O |
| D-6455 | Me | single bond | H | $CH_2CF_3$ | $C(=O)N(Me)_2$ | Me | $CH_2OMe$ | O |
| D-6456 | Me(R) | single bond | H | $CH_2CF_3$ | $C(=O)N(Me)_2$ | Me | $CH_2OMe$ | O |
| D-6457 | Me(S) | single bond | H | $CH_2CF_3$ | $C(=O)N(Me)_2$ | Me | $CH_2OMe$ | O |
| D-6458 | H | $CH_2$ | Me | $CH_2CF_3$ | $C(=O)N(Me)_2$ | Me | $CH_2OMe$ | O |
| D-6459 | Me | $CH_2$ | H | $CH_2CF_3$ | $C(=O)N(Me)_2$ | Me | $CH_2OMe$ | O |
| D-6460 | H | CH(Me) | H | $CH_2CF_3$ | $C(=O)N(Me)_2$ | Me | $CH_2OMe$ | O |
| D-6461 | H | $CH_2CH_2$ | Me | $CH_2CF_3$ | $C(=O)N(Me)_2$ | Me | $CH_2OMe$ | O |
| D-6462 | Me | $CH_2CH_2$ | H | $CH_2CF_3$ | $C(=O)N(Me)_2$ | Me | $CH_2OMe$ | O |
| D-6463 | H | single bond | Me | $CH_2CF_3$ | $CH_2OC(=O)Me$ | Cl | $CH_2OMe$ | O |
| D-6464 | Me | single bond | H | $CH_2CF_3$ | $CH_2OC(=O)Me$ | Cl | $CH_2OMe$ | O |
| D-6465 | Me(R) | single bond | H | $CH_2CF_3$ | $CH_2OC(=O)Me$ | Cl | $CH_2OMe$ | O |
| D-6466 | Me(S) | single bond | H | $CH_2CF_3$ | $CH_2OC(=O)Me$ | Cl | $CH_2OMe$ | O |
| D-6467 | H | $CH_2$ | Me | $CH_2CF_3$ | $CH_2OC(=O)Me$ | Cl | $CH_2OMe$ | O |
| D-6468 | Me | $CH_2$ | H | $CH_2CF_3$ | $CH_2OC(=O)Me$ | Cl | $CH_2OMe$ | O |
| D-6469 | H | CH(Me) | H | $CH_2CF_3$ | $CH_2OC(=O)Me$ | Cl | $CH_2OMe$ | O |
| D-6470 | H | $CH_2CH_2$ | Me | $CH_2CF_3$ | $CH_2OC(=O)Me$ | Cl | $CH_2OMe$ | O |
| D-6471 | Me | $CH_2CH_2$ | H | $CH_2CF_3$ | $CH_2OC(=O)Me$ | Cl | $CH_2OMe$ | O |
| D-6472 | H | single bond | Me | $CH_2CF_3$ | $CH_2OC(=O)Me$ | Me | $CH_2OMe$ | O |
| D-6473 | Me | single bond | H | $CH_2CF_3$ | $CH_2OC(=O)Me$ | Me | $CH_2OMe$ | O |
| D-6474 | Me(R) | single bond | H | $CH_2CF_3$ | $CH_2OC(=O)Me$ | Me | $CH_2OMe$ | O |

TABLE 793

| Compound Number | Y | W | Z | $R^1$ | $R^2$ | $R^3$ | $R^{10}$ | A |
|---|---|---|---|---|---|---|---|---|
| D-6475 | Me(S) | single bond | H | $CH_2CF_3$ | $CH_2OC(=O)Me$ | Me | $CH_2OMe$ | O |
| D-6476 | H | $CH_2$ | Me | $CH_2CF_3$ | $CH_2OC(=O)Me$ | Me | $CH_2OMe$ | O |
| D-6477 | Me | $CH_2$ | H | $CH_2CF_3$ | $CH_2OC(=O)Me$ | Me | $CH_2OMe$ | O |
| D-6478 | H | CH(Me) | H | $CH_2CF_3$ | $CH_2OC(=O)Me$ | Me | $CH_2OMe$ | O |
| D-6479 | H | $CH_2CH_2$ | Me | $CH_2CF_3$ | $CH_2OC(=O)Me$ | Me | $CH_2OMe$ | O |
| D-6480 | Me | $CH_2CH_2$ | H | $CH_2CF_3$ | $CH_2OC(=O)Me$ | Me | $CH_2OMe$ | O |
| D-6481 | H | single bond | Me | $CH_2CF_3$ | $CH_2OC(=O)(i-Pr)$ | Cl | $CH_2OMe$ | O |
| D-6482 | Me | single bond | H | $CH_2CF_3$ | $CH_2OC(=O)(i-Pr)$ | Cl | $CH_2OMe$ | O |
| D-6483 | Me(R) | single bond | H | $CH_2CF_3$ | $CH_2OC(=O)(i-Pr)$ | Cl | $CH_2OMe$ | O |
| D-6484 | Me(S) | single bond | H | $CH_2CF_3$ | $CH_2OC(=O)(i-Pr)$ | Cl | $CH_2OMe$ | O |
| D-6485 | H | $CH_2$ | Me | $CH_2CF_3$ | $CH_2OC(=O)(i-Pr)$ | Cl | $CH_2OMe$ | O |
| D-6486 | Me | $CH_2$ | H | $CH_2CF_3$ | $CH_2OC(=O)(i-Pr)$ | Cl | $CH_2OMe$ | O |
| D-6487 | H | CH(Me) | H | $CH_2CF_3$ | $CH_2OC(=O)(i-Pr)$ | Cl | $CH_2OMe$ | O |
| D-6488 | H | $CH_2CH_2$ | Me | $CH_2CF_3$ | $CH_2OC(=O)(i-Pr)$ | Cl | $CH_2OMe$ | O |
| D-6489 | Me | $CH_2CH_2$ | H | $CH_2CF_3$ | $CH_2OC(=O)(i-Pr)$ | Cl | $CH_2OMe$ | O |
| D-6490 | H | single bond | Me | $CH_2CF_3$ | $CH_2OC(=O)(i-Pr)$ | Me | $CH_2OMe$ | O |
| D-6491 | Me | single bond | H | $CH_2CF_3$ | $CH_2OC(=O)(i-Pr)$ | Me | $CH_2OMe$ | O |
| D-6492 | Me(R) | single bond | H | $CH_2CF_3$ | $CH_2OC(=O)(i-Pr)$ | Me | $CH_2OMe$ | O |
| D-6493 | Me(S) | single bond | H | $CH_2CF_3$ | $CH_2OC(=O)(i-Pr)$ | Me | $CH_2OMe$ | O |
| D-6494 | H | $CH_2$ | Me | $CH_2CF_3$ | $CH_2OC(=O)(i-Pr)$ | Me | $CH_2OMe$ | O |
| D-6495 | Me | $CH_2$ | H | $CH_2CF_3$ | $CH_2OC(=O)(i-Pr)$ | Me | $CH_2OMe$ | O |
| D-6496 | H | CH(Me) | H | $CH_2CF_3$ | $CH_2OC(=O)(i-Pr)$ | Me | $CH_2OMe$ | O |
| D-6497 | H | $CH_2CH_2$ | Me | $CH_2CF_3$ | $CH_2OC(=O)(i-Pr)$ | Me | $CH_2OMe$ | O |
| D-6498 | Me | $CH_2CH_2$ | H | $CH_2CF_3$ | $CH_2OC(=O)(i-Pr)$ | Me | $CH_2OMe$ | O |
| D-6499 | H | single bond | Me | $CH_2CF_3$ | $CH_2OC(=O)(t-Bu)$ | Cl | $CH_2OMe$ | O |
| D-6500 | Me | single bond | H | $CH_2CF_3$ | $CH_2OC(=O)(t-Bu)$ | Cl | $CH_2OMe$ | O |
| D-6501 | Me(R) | single bond | H | $CH_2CF_3$ | $CH_2OC(=O)(t-Bu)$ | Cl | $CH_2OMe$ | O |
| D-6502 | Me(S) | single bond | H | $CH_2CF_3$ | $CH_2OC(=O)(t-Bu)$ | Cl | $CH_2OMe$ | O |
| D-6503 | H | $CH_2$ | Me | $CH_2CF_3$ | $CH_2OC(=O)(t-Bu)$ | Cl | $CH_2OMe$ | O |
| D-6504 | Me | $CH_2$ | H | $CH_2CF_3$ | $CH_2OC(=O)(t-Bu)$ | Cl | $CH_2OMe$ | O |
| D-6505 | H | CH(Me) | H | $CH_2CF_3$ | $CH_2OC(=O)(t-Bu)$ | Cl | $CH_2OMe$ | O |
| D-6506 | H | $CH_2CH_2$ | Me | $CH_2CF_3$ | $CH_2OC(=O)(t-Bu)$ | Cl | $CH_2OMe$ | O |
| D-6507 | Me | $CH_2CH_2$ | H | $CH_2CF_3$ | $CH_2OC(=O)(t-Bu)$ | Cl | $CH_2OMe$ | O |
| D-6508 | H | single bond | Me | $CH_2CF_3$ | $CH_2OC(=O)(t-Bu)$ | Me | $CH_2OMe$ | O |
| D-6509 | Me | single bond | H | $CH_2CF_3$ | $CH_2OC(=O)(t-Bu)$ | Me | $CH_2OMe$ | O |

TABLE 793-continued

| Compound Number | Y | W | Z | $R^1$ | $R^2$ | $R^3$ | $R^{10}$ | A |
|---|---|---|---|---|---|---|---|---|
| D-6510 | Me(R) | single bond | H | $CH_2CF_3$ | $CH_2OC(=O)(t-Bu)$ | Me | $CH_2OMe$ | O |
| D-6511 | Me(S) | single bond | H | $CH_2CF_3$ | $CH_2OC(=O)(t-Bu)$ | Me | $CH_2OMe$ | O |
| D-6512 | H | $CH_2$ | Me | $CH_2CF_3$ | $CH_2OC(=O)(t-Bu)$ | Me | $CH_2OMe$ | O |
| D-6513 | Me | $CH_2$ | H | $CH_2CF_3$ | $CH_2OC(=O)(t-Bu)$ | Me | $CH_2OMe$ | O |
| D-6514 | H | CH(Me) | H | $CH_2CF_3$ | $CH_2OC(=O)(t-Bu)$ | Me | $CH_2OMe$ | O |
| D-6515 | H | $CH_2CH_2$ | Me | $CH_2CF_3$ | $CH_2OC(=O)(t-Bu)$ | Me | $CH_2OMe$ | O |
| D-6516 | Me | $CH_2CH_2$ | H | $CH_2CF_3$ | $CH_2OC(=O)(t-Bu)$ | Me | $CH_2OMe$ | O |
| D-6517 | H | single bond | Me | $CH_2CF_3$ | $CH_2OC(=O)OEt$ | Cl | $CH_2OMe$ | O |
| D-6518 | Me | single bond | H | $CH_2CF_3$ | $CH_2OC(=O)OEt$ | Cl | $CH_2OMe$ | O |

TABLE 794

| Compound Number | Y | W | Z | $R^1$ | $R^2$ | $R^3$ | $R^{10}$ | A |
|---|---|---|---|---|---|---|---|---|
| D-6519 | Me(R) | single bond | H | $CH_2CF_3$ | $CH_2OC(=O)OEt$ | Cl | $CH_2OMe$ | O |
| D-6520 | Me(S) | single bond | H | $CH_2CF_3$ | $CH_2OC(=O)OEt$ | Cl | $CH_2OMe$ | O |
| D-6521 | H | $CH_2$ | Me | $CH_2CF_3$ | $CH_2OC(=O)OEt$ | Cl | $CH_2OMe$ | O |
| D-6522 | Me | $CH_2$ | H | $CH_2CF_3$ | $CH_2OC(=O)OEt$ | Cl | $CH_2OMe$ | O |
| D-6523 | H | CH(Me) | H | $CH_2CF_3$ | $CH_2OC(=O)OEt$ | Cl | $CH_2OMe$ | O |
| D-6524 | H | $CH_2CH_2$ | Me | $CH_2CF_3$ | $CH_2OC(=O)OEt$ | Cl | $CH_2OMe$ | O |
| D-6525 | Me | $CH_2CH_2$ | H | $CH_2CF_3$ | $CH_2OC(=O)OEt$ | Cl | $CH_2OMe$ | O |
| D-6526 | H | single bond | Me | $CH_2CF_3$ | $CH_2OC(=O)OEt$ | Me | $CH_2OMe$ | O |
| D-6527 | Me | single bond | H | $CH_2CF_3$ | $CH_2OC(=O)OEt$ | Me | $CH_2OMe$ | O |
| D-6528 | Me(R) | single bond | H | $CH_2CF_3$ | $CH_2OC(=O)OEt$ | Me | $CH_2OMe$ | O |
| D-6529 | Me(S) | single bond | H | $CH_2CF_3$ | $CH_2OC(=O)OEt$ | Me | $CH_2OMe$ | O |
| D-6530 | H | $CH_2$ | Me | $CH_2CF_3$ | $CH_2OC(=O)OEt$ | Me | $CH_2OMe$ | O |
| D-6531 | Me | $CH_2$ | H | $CH_2CF_3$ | $CH_2OC(=O)OEt$ | Me | $CH_2OMe$ | O |
| D-6532 | H | CH(Me) | H | $CH_2CF_3$ | $CH_2OC(=O)OEt$ | Me | $CH_2OMe$ | O |
| D-6533 | H | $CH_2CH_2$ | Me | $CH_2CF_3$ | $CH_2OC(=O)OEt$ | Me | $CH_2OMe$ | O |
| D-6534 | Me | $CH_2CH_2$ | H | $CH_2CF_3$ | $CH_2OC(=O)OEt$ | Me | $CH_2OMe$ | O |
| D-6535 | H | single bond | Me | $CH_2CF_3$ | $CH_2OC(=O)O(i-Pr)$ | Cl | $CH_2OMe$ | O |
| D-6536 | Me | single bond | H | $CH_2CF_3$ | $CH_2OC(=O)O(i-Pr)$ | Cl | $CH_2OMe$ | O |
| D-6537 | Me(R) | single bond | H | $CH_2CF_3$ | $CH_2OC(=O)O(i-Pr)$ | Cl | $CH_2OMe$ | O |
| D-6538 | Me(S) | single bond | H | $CH_2CF_3$ | $CH_2OC(=O)O(i-Pr)$ | Cl | $CH_2OMe$ | O |
| D-6539 | H | $CH_2$ | Me | $CH_2CF_3$ | $CH_2OC(=O)O(i-Pr)$ | Cl | $CH_2OMe$ | O |
| D-6540 | Me | $CH_2$ | H | $CH_2CF_3$ | $CH_2OC(=O)O(i-Pr)$ | Cl | $CH_2OMe$ | O |
| D-6541 | H | CH(Me) | H | $CH_2CF_3$ | $CH_2OC(=O)O(i-Pr)$ | Cl | $CH_2OMe$ | O |
| D-6542 | H | $CH_2CH_2$ | Me | $CH_2CF_3$ | $CH_2OC(=O)O(i-Pr)$ | Cl | $CH_2OMe$ | O |
| D-6543 | Me | $CH_2CH_2$ | H | $CH_2CF_3$ | $CH_2OC(=O)O(i-Pr)$ | Cl | $CH_2OMe$ | O |
| D-6544 | H | single bond | Me | $CH_2CF_3$ | $CH_2OC(=O)O(i-Pr)$ | Me | $CH_2OMe$ | O |
| D-6545 | Me | single bond | H | $CH_2CF_3$ | $CH_2OC(=O)O(i-Pr)$ | Me | $CH_2OMe$ | O |
| D-6546 | Me(R) | single bond | H | $CH_2CF_3$ | $CH_2OC(=O)O(i-Pr)$ | Me | $CH_2OMe$ | O |
| D-6547 | Me(S) | single bond | H | $CH_2CF_3$ | $CH_2OC(=O)O(i-Pr)$ | Me | $CH_2OMe$ | O |
| D-6548 | H | $CH_2$ | Me | $CH_2CF_3$ | $CH_2OC(=O)O(i-Pr)$ | Me | $CH_2OMe$ | O |
| D-6549 | Me | $CH_2$ | H | $CH_2CF_3$ | $CH_2OC(=O)O(i-Pr)$ | Me | $CH_2OMe$ | O |
| D-6550 | H | CH(Me) | H | $CH_2CF_3$ | $CH_2OC(=O)O(i-Pr)$ | Me | $CH_2OMe$ | O |
| D-6551 | H | $CH_2CH_2$ | Me | $CH_2CF_3$ | $CH_2OC(=O)O(i-Pr)$ | Me | $CH_2OMe$ | O |
| D-6552 | Me | $CH_2CH_2$ | H | $CH_2CF_3$ | $CH_2OC(=O)O(i-Pr)$ | Me | $CH_2OMe$ | O |
| D-6553 | H | single bond | Me | $CH_2CF_3$ | $CH_2N(Me)C(=O)OMe$ | Cl | $CH_2OMe$ | O |
| D-6554 | Me | single bond | H | $CH_2CF_3$ | $CH_2N(Me)C(=O)OMe$ | Cl | $CH_2OMe$ | O |
| D-6555 | Me(R) | single bond | H | $CH_2CF_3$ | $CH_2N(Me)C(=O)OMe$ | Cl | $CH_2OMe$ | O |
| D-6556 | Me(S) | single bond | H | $CH_2CF_3$ | $CH_2N(Me)C(=O)OMe$ | Cl | $CH_2OMe$ | O |
| D-6557 | H | $CH_2$ | Me | $CH_2CF_3$ | $CH_2N(Me)C(=O)OMe$ | Cl | $CH_2OMe$ | O |
| D-6558 | Me | $CH_2$ | H | $CH_2CF_3$ | $CH_2N(Me)C(=O)OMe$ | Cl | $CH_2OMe$ | O |
| D-6559 | H | CH(Me) | H | $CH_2CF_3$ | $CH_2N(Me)C(=O)OMe$ | Cl | $CH_2OMe$ | O |
| D-6560 | H | $CH_2CH_2$ | Me | $CH_2CF_3$ | $CH_2N(Me)C(=O)OMe$ | Cl | $CH_2OMe$ | O |
| D-6561 | Me | $CH_2CH_2$ | H | $CH_2CF_3$ | $CH_2N(Me)C(=O)OMe$ | Cl | $CH_2OMe$ | O |
| D-6562 | H | single bond | Me | $CH_2CF_3$ | $CH_2N(Me)C(=O)OMe$ | Me | $CH_2OMe$ | O |

TABLE 795

| Compound Number | Y | W | Z | $R^1$ | $R^2$ | $R^3$ | $R^{10}$ | A |
|---|---|---|---|---|---|---|---|---|
| D-6563 | Me | single bond | H | $CH_2CF_3$ | $CH_2N(Me)C(=O)OMe$ | Me | $CH_2OMe$ | O |
| D-6564 | Me(R) | single bond | H | $CH_2CF_3$ | $CH_2N(Me)C(=O)OMe$ | Me | $CH_2OMe$ | O |
| D-6565 | Me(S) | single bond | H | $CH_2CF_3$ | $CH_2N(Me)C(=O)OMe$ | Me | $CH_2OMe$ | O |

TABLE 795-continued

| Compound Number | Y | W | Z | $R^1$ | $R^2$ | $R^3$ | $R^{10}$ | A |
|---|---|---|---|---|---|---|---|---|
| D-6566 | H | $CH_2$ | Me | $CH_2CF_3$ | $CH_2N(Me)C(=O)OMe$ | Me | $CH_2OMe$ | O |
| D-6567 | Me | $CH_2$ | H | $CH_2CF_3$ | $CH_2N(Me)C(=O)OMe$ | Me | $CH_2OMe$ | O |
| D-6568 | H | CH(Me) | H | $CH_2CF_3$ | $CH_2N(Me)C(=O)OMe$ | Me | $CH_2OMe$ | O |
| D-6569 | H | $CH_2CH_2$ | Me | $CH_2CF_3$ | $CH_2N(Me)C(=O)OMe$ | Me | $CH_2OMe$ | O |
| D-6570 | Me | $CH_2CH_2$ | H | $CH_2CF_3$ | $CH_2N(Me)C(=O)OMe$ | Me | $CH_2OMe$ | O |
| D-6571 | H | single bond | Me | $CH_2CF_3$ | $C(=O)OCH_2CH=CH_2$ | Cl | $CH_2CN$ | O |
| D-6572 | Me | single bond | H | $CH_2CF_3$ | $C(=O)OCH_2CH=CH_2$ | Cl | $CH_2CN$ | O |
| D-6573 | Me(R) | single bond | H | $CH_2CF_3$ | $C(=O)OCH_2CH=CH_2$ | Cl | $CH_2CN$ | O |
| D-6574 | Me(S) | single bond | H | $CH_2CF_3$ | $C(=O)OCH_2CH=CH_2$ | Cl | $CH_2CN$ | O |
| D-6575 | H | $CH_2$ | Me | $CH_2CF_3$ | $C(=O)OCH_2CH=CH_2$ | Cl | $CH_2CN$ | O |
| D-6576 | Me | $CH_2$ | H | $CH_2CF_3$ | $C(=O)OCH_2CH=CH_2$ | Cl | $CH_2CN$ | O |
| D-6577 | H | CH(Me) | H | $CH_2CF_3$ | $C(=O)OCH_2CH=CH_2$ | Cl | $CH_2CN$ | O |
| D-6578 | H | $CH_2CH_2$ | Me | $CH_2CF_3$ | $C(=O)OCH_2CH=CH_2$ | Cl | $CH_2CN$ | O |
| D-6579 | Me | $CH_2CH_2$ | H | $CH_2CF_3$ | $C(=O)OCH_2CH=CH_2$ | Cl | $CH_2CN$ | O |
| D-6580 | H | single bond | Me | $CH_2CF_3$ | $C(=O)OCH_2CH=CH_2$ | Me | $CH_2CN$ | O |
| D-6581 | Me | single bond | H | $CH_2CF_3$ | $C(=O)OCH_2CH=CH_2$ | Me | $CH_2CN$ | O |
| D-6582 | Me(R) | single bond | H | $CH_2CF_3$ | $C(=O)OCH_2CH=CH_2$ | Me | $CH_2CN$ | O |
| D-6583 | Me(S) | single bond | H | $CH_2CF_3$ | $C(=O)OCH_2CH=CH_2$ | Me | $CH_2CN$ | O |
| D-6584 | H | $CH_2$ | Me | $CH_2CF_3$ | $C(=O)OCH_2CH=CH_2$ | Me | $CH_2CN$ | O |
| D-6585 | Me | $CH_2$ | H | $CH_2CF_3$ | $C(=O)OCH_2CH=CH_2$ | Me | $CH_2CN$ | O |
| D-6586 | H | CH(Me) | H | $CH_2CF_3$ | $C(=O)OCH_2CH=CH_2$ | Me | $CH_2CN$ | O |
| D-6587 | H | $CH_2CH_2$ | Me | $CH_2CF_3$ | $C(=O)OCH_2CH=CH_2$ | Me | $CH_2CN$ | O |
| D-6588 | Me | $CH_2CH_2$ | H | $CH_2CF_3$ | $C(=O)OCH_2CH=CH_2$ | Me | $CH_2CN$ | O |
| D-6589 | H | single bond | Me | $CH_2CF_3$ | $C(=O)OCH_2CCl_3$ | Cl | $CH_2CN$ | O |
| D-6590 | Me | single bond | H | $CH_2CF_3$ | $C(=O)OCH_2CCl_3$ | Cl | $CH_2CN$ | O |
| D-6591 | Me(R) | single bond | H | $CH_2CF_3$ | $C(=O)OCH_2CCl_3$ | Cl | $CH_2CN$ | O |
| D-6592 | Me(S) | single bond | H | $CH_2CF_3$ | $C(=O)OCH_2CCl_3$ | Cl | $CH_2CN$ | O |
| D-6593 | H | $CH_2$ | Me | $CH_2CF_3$ | $C(=O)OCH_2CCl_3$ | Cl | $CH_2CN$ | O |
| D-6594 | Me | $CH_2$ | H | $CH_2CF_3$ | $C(=O)OCH_2CCl_3$ | Cl | $CH_2CN$ | O |
| D-6595 | H | CH(Me) | H | $CH_2CF_3$ | $C(=O)OCH_2CCl_3$ | Cl | $CH_2CN$ | O |
| D-6596 | H | $CH_2CH_2$ | Me | $CH_2CF_3$ | $C(=O)OCH_2CCl_3$ | Cl | $CH_2CN$ | O |
| D-6597 | Me | $CH_2CH_2$ | H | $CH_2CF_3$ | $C(=O)OCH_2CCl_3$ | Cl | $CH_2CN$ | O |
| D-6598 | H | single bond | Me | $CH_2CF_3$ | $C(=O)OCH_2CCl_3$ | Me | $CH_2CN$ | O |
| D-6599 | Me | single bond | H | $CH_2CF_3$ | $C(=O)OCH_2CCl_3$ | Me | $CH_2CN$ | O |
| D-6600 | Me(R) | single bond | H | $CH_2CF_3$ | $C(=O)OCH_2CCl_3$ | Me | $CH_2CN$ | O |
| D-6601 | Me(S) | single bond | H | $CH_2CF_3$ | $C(=O)OCH_2CCl_3$ | Me | $CH_2CN$ | O |
| D-6602 | H | $CH_2$ | Me | $CH_2CF_3$ | $C(=O)OCH_2CCl_3$ | Me | $CH_2CN$ | O |
| D-6603 | Me | $CH_2$ | H | $CH_2CF_3$ | $C(=O)OCH_2CCl_3$ | Me | $CH_2CN$ | O |
| D-6604 | H | CH(Me) | H | $CH_2CF_3$ | $C(=O)OCH_2CCl_3$ | Me | $CH_2CN$ | O |
| D-6605 | H | $CH_2CH_2$ | Me | $CH_2CF_3$ | $C(=O)OCH_2CCl_3$ | Me | $CH_2CN$ | O |
| D-6606 | Me | $CH_2CH_2$ | H | $CH_2CF_3$ | $C(=O)OCH_2CCl_3$ | Me | $CH_2CN$ | O |

TABLE 796

| Compound Number | Y | W | Z | $R^1$ | $R^2$ | $R^3$ | $R^{10}$ | A |
|---|---|---|---|---|---|---|---|---|
| D-6607 | H | single bond | Me | $CH_2CF_3$ | $C(=O)N(Me)_2$ | Cl | $CH_2CN$ | O |
| D-6608 | Me | single bond | H | $CH_2CF_3$ | $C(=O)N(Me)_2$ | Cl | $CH_2CN$ | O |
| D-6609 | Me(R) | single bond | H | $CH_2CF_3$ | $C(=O)N(Me)_2$ | Cl | $CH_2CN$ | O |
| D-6610 | Me(S) | single bond | H | $CH_2CF_3$ | $C(=O)N(Me)_2$ | Cl | $CH_2CN$ | O |
| D-6611 | H | $CH_2$ | Me | $CH_2CF_3$ | $C(=O)N(Me)_2$ | Cl | $CH_2CN$ | O |
| D-6612 | Me | $CH_2$ | H | $CH_2CF_3$ | $C(=O)N(Me)_2$ | Cl | $CH_2CN$ | O |
| D-6613 | H | CH(Me) | H | $CH_2CF_3$ | $C(=O)N(Me)_2$ | Cl | $CH_2CN$ | O |
| D-6614 | H | $CH_2CH_2$ | Me | $CH_2CF_3$ | $C(=O)N(Me)_2$ | Cl | $CH_2CN$ | O |
| D-6615 | Me | $CH_2CH_2$ | H | $CH_2CF_3$ | $C(=O)N(Me)_2$ | Cl | $CH_2CN$ | O |
| D-6616 | H | single bond | Me | $CH_2CF_3$ | $C(=O)N(Me)_2$ | Me | $CH_2CN$ | O |
| D-6617 | Me | single bond | H | $CH_2CF_3$ | $C(=O)N(Me)_2$ | Me | $CH_2CN$ | O |
| D-6618 | Me(R) | single bond | H | $CH_2CF_3$ | $C(=O)N(Me)_2$ | Me | $CH_2CN$ | O |
| D-6619 | Me(S) | single bond | H | $CH_2CF_3$ | $C(=O)N(Me)_2$ | Me | $CH_2CN$ | O |
| D-6620 | H | $CH_2$ | Me | $CH_2CF_3$ | $C(=O)N(Me)_2$ | Me | $CH_2CN$ | O |
| D-6621 | Me | $CH_2$ | H | $CH_2CF_3$ | $C(=O)N(Me)_2$ | Me | $CH_2CN$ | O |
| D-6622 | H | CH(Me) | H | $CH_2CF_3$ | $C(=O)N(Me)_2$ | Me | $CH_2CN$ | O |
| D-6623 | H | $CH_2CH_2$ | Me | $CH_2CF_3$ | $C(=O)N(Me)_2$ | Me | $CH_2CN$ | O |
| D-6624 | Me | $CH_2CH_2$ | H | $CH_2CF_3$ | $C(=O)N(Me)_2$ | Me | $CH_2CN$ | O |
| D-6625 | H | single bond | Me | $CH_2CF_3$ | $CH_2OC(=O)Me$ | Cl | $CH_2CN$ | O |
| D-6626 | Me | single bond | H | $CH_2CF_3$ | $CH_2OC(=O)Me$ | Cl | $CH_2CN$ | O |
| D-6627 | Me(R) | single bond | H | $CH_2CF_3$ | $CH_2OC(=O)Me$ | Cl | $CH_2CN$ | O |
| D-6628 | Me(S) | single bond | H | $CH_2CF_3$ | $CH_2OC(=O)Me$ | Cl | $CH_2CN$ | O |
| D-6629 | H | $CH_2$ | Me | $CH_2CF_3$ | $CH_2OC(=O)Me$ | Cl | $CH_2CN$ | O |
| D-6630 | Me | $CH_2$ | H | $CH_2CF_3$ | $CH_2OC(=O)Me$ | Cl | $CH_2CN$ | O |
| D-6631 | H | CH(Me) | H | $CH_2CF_3$ | $CH_2OC(=O)Me$ | Cl | $CH_2CN$ | O |
| D-6632 | H | $CH_2CH_2$ | Me | $CH_2CF_3$ | $CH_2OC(=O)Me$ | Cl | $CH_2CN$ | O |

TABLE 796-continued

| Compound Number | Y | W | Z | $R^1$ | $R^2$ | $R^3$ | $R^{10}$ | A |
|---|---|---|---|---|---|---|---|---|
| D-6633 | Me | $CH_2CH_2$ | H | $CH_2CF_3$ | $CH_2OC(=O)Me$ | Cl | $CH_2CN$ | O |
| D-6634 | H | single bond | Me | $CH_2CF_3$ | $CH_2OC(=O)Me$ | Me | $CH_2CN$ | O |
| D-6635 | Me | single bond | H | $CH_2CF_3$ | $CH_2OC(=O)Me$ | Me | $CH_2CN$ | O |
| D-6636 | Me(R) | single bond | H | $CH_2CF_3$ | $CH_2OC(=O)Me$ | Me | $CH_2CN$ | O |
| D-6637 | Me(S) | single bond | H | $CH_2CF_3$ | $CH_2OC(=O)Me$ | Me | $CH_2CN$ | O |
| D-6638 | H | $CH_2$ | Me | $CH_2CF_3$ | $CH_2OC(=O)Me$ | Me | $CH_2CN$ | O |
| D-6639 | Me | $CH_2$ | H | $CH_2CF_3$ | $CH_2OC(=O)Me$ | Me | $CH_2CN$ | O |
| D-6640 | H | CH(Me) | H | $CH_2CF_3$ | $CH_2OC(=O)Me$ | Me | $CH_2CN$ | O |
| D-6641 | H | $CH_2CH_2$ | Me | $CH_2CF_3$ | $CH_2OC(=O)Me$ | Me | $CH_2CN$ | O |
| D-6642 | Me | $CH_2CH_2$ | H | $CH_2CF_3$ | $CH_2OC(=O)Me$ | Me | $CH_2CN$ | O |
| D-6643 | H | single bond | Me | $CH_2CF_3$ | $CH_2OC(=O)$(i-Pr) | Cl | $CH_2CN$ | O |
| D-6644 | Me | single bond | H | $CH_2CF_3$ | $CH_2OC(=O)$(i-Pr) | Cl | $CH_2CN$ | O |
| D-6645 | Me(R) | single bond | H | $CH_2CF_3$ | $CH_2OC(=O)$(i-Pr) | Cl | $CH_2CN$ | O |
| D-6646 | Me(S) | single bond | H | $CH_2CF_3$ | $CH_2OC(=O)$(i-Pr) | Cl | $CH_2CN$ | O |
| D-6647 | H | $CH_2$ | Me | $CH_2CF_3$ | $CH_2OC(=O)$(i-Pr) | Cl | $CH_2CN$ | O |
| D-6648 | Me | $CH_2$ | H | $CH_2CF_3$ | $CH_2OC(=O)$(i-Pr) | Cl | $CH_2CN$ | O |
| D-6649 | H | CH(Me) | H | $CH_2CF_3$ | $CH_2OC(=O)$(i-Pr) | Cl | $CH_2CN$ | O |
| D-6650 | H | $CH_2CH_2$ | Me | $CH_2CF_3$ | $CH_2OC(=O)$(i-Pr) | Cl | $CH_2CN$ | O |

TABLE 797

| Compound Number | Y | W | Z | $R^1$ | $R^2$ | $R^3$ | $R^{10}$ | A |
|---|---|---|---|---|---|---|---|---|
| D-6651 | Me | $CH_2CH_2$ | H | $CH_2CF_3$ | $CH_2OC(=O)$(i-Pr) | Cl | $CH_2CN$ | O |
| D-6652 | H | single bond | Me | $CH_2CF_3$ | $CH_2OC(=O)$(i-Pr) | Me | $CH_2CN$ | O |
| D-6653 | Me | single bond | H | $CH_2CF_3$ | $CH_2OC(=O)$(i-Pr) | Me | $CH_2CN$ | O |
| D-6654 | Me(R) | single bond | H | $CH_2CF_3$ | $CH_2OC(=O)$(i-Pr) | Me | $CH_2CN$ | O |
| D-6655 | Me(S) | single bond | H | $CH_2CF_3$ | $CH_2OC(=O)$(i-Pr) | Me | $CH_2CN$ | O |
| D-6656 | H | $CH_2$ | Me | $CH_2CF_3$ | $CH_2OC(=O)$(i-Pr) | Me | $CH_2CN$ | O |
| D-6657 | Me | $CH_2$ | H | $CH_2CF_3$ | $CH_2OC(=O)$(i-Pr) | Me | $CH_2CN$ | O |
| D-6658 | H | CH(Me) | H | $CH_2CF_3$ | $CH_2OC(=O)$(i-Pr) | Me | $CH_2CN$ | O |
| D-6659 | H | $CH_2CH_2$ | Me | $CH_2CF_3$ | $CH_2OC(=O)$(i-Pr) | Me | $CH_2CN$ | O |
| D-6660 | Me | $CH_2CH_2$ | H | $CH_2CF_3$ | $CH_2OC(=O)$(i-Pr) | Me | $CH_2CN$ | O |
| D-6661 | H | single bond | Me | $CH_2CF_3$ | $CH_2OC(=O)$(t-Bu) | Cl | $CH_2CN$ | O |
| D-6662 | Me | single bond | H | $CH_2CF_3$ | $CH_2OC(=O)$(t-Bu) | Cl | $CH_2CN$ | O |
| D-6663 | Me(R) | single bond | H | $CH_2CF_3$ | $CH_2OC(=O)$(t-Bu) | Cl | $CH_2CN$ | O |
| D-6664 | Me(S) | single bond | H | $CH_2CF_3$ | $CH_2OC(=O)$(t-Bu) | Cl | $CH_2CN$ | O |
| D-6665 | H | $CH_2$ | Me | $CH_2CF_3$ | $CH_2OC(=O)$(t-Bu) | Cl | $CH_2CN$ | O |
| D-6666 | Me | $CH_2$ | H | $CH_2CF_3$ | $CH_2OC(=O)$(t-Bu) | Cl | $CH_2CN$ | O |
| D-6667 | H | CH(Me) | H | $CH_2CF_3$ | $CH_2OC(=O)$(t-Bu) | Cl | $CH_2CN$ | O |
| D-6668 | H | $CH_2CH_2$ | Me | $CH_2CF_3$ | $CH_2OC(=O)$(t-Bu) | Cl | $CH_2CN$ | O |
| D-6669 | Me | $CH_2CH_2$ | H | $CH_2CF_3$ | $CH_2OC(=O)$(t-Bu) | Cl | $CH_2CN$ | O |
| D-6670 | H | single bond | Me | $CH_2CF_3$ | $CH_2OC(=O)$(t-Bu) | Me | $CH_2CN$ | O |
| D-6671 | Me | single bond | H | $CH_2CF_3$ | $CH_2OC(=O)$(t-Bu) | Me | $CH_2CN$ | O |
| D-6672 | Me(R) | single bond | H | $CH_2CF_3$ | $CH_2OC(=O)$(t-Bu) | Me | $CH_2CN$ | O |
| D-6673 | Me(S) | single bond | H | $CH_2CF_3$ | $CH_2OC(=O)$(t-Bu) | Me | $CH_2CN$ | O |
| D-6674 | H | $CH_2$ | Me | $CH_2CF_3$ | $CH_2OC(=O)$(t-Bu) | Me | $CH_2CN$ | O |
| D-6675 | Me | $CH_2$ | H | $CH_2CF_3$ | $CH_2OC(=O)$(t-Bu) | Me | $CH_2CN$ | O |
| D-6676 | H | CH(Me) | H | $CH_2CF_3$ | $CH_2OC(=O)$(t-Bu) | Me | $CH_2CN$ | O |
| D-6677 | H | $CH_2CH_2$ | Me | $CH_2CF_3$ | $CH_2OC(=O)$(t-Bu) | Me | $CH_2CN$ | O |
| D-6678 | Me | $CH_2CH_2$ | H | $CH_2CF_3$ | $CH_2OC(=O)$(t-Bu) | Me | $CH_2CN$ | O |
| D-6679 | H | single bond | Me | $CH_2CF_3$ | $CH_2OC(=O)OEt$ | Cl | $CH_2CN$ | O |
| D-6680 | Me | single bond | H | $CH_2CF_3$ | $CH_2OC(=O)OEt$ | Cl | $CH_2CN$ | O |
| D-6681 | Me(R) | single bond | H | $CH_2CF_3$ | $CH_2OC(=O)OEt$ | Cl | $CH_2CN$ | O |
| D-6682 | Me(S) | single bond | H | $CH_2CF_3$ | $CH_2OC(=O)OEt$ | Cl | $CH_2CN$ | O |
| D-6683 | H | $CH_2$ | Me | $CH_2CF_3$ | $CH_2OC(=O)OEt$ | Cl | $CH_2CN$ | O |
| D-6684 | Me | $CH_2$ | H | $CH_2CF_3$ | $CH_2OC(=O)OEt$ | Cl | $CH_2CN$ | O |
| D-6685 | H | CH(Me) | H | $CH_2CF_3$ | $CH_2OC(=O)OEt$ | Cl | $CH_2CN$ | O |
| D-6686 | H | $CH_2CH_2$ | Me | $CH_2CF_3$ | $CH_2OC(=O)OEt$ | Cl | $CH_2CN$ | O |
| D-6687 | Me | $CH_2CH_2$ | H | $CH_2CF_3$ | $CH_2OC(=O)OEt$ | Cl | $CH_2CN$ | O |
| D-6688 | H | single bond | Me | $CH_2CF_3$ | $CH_2OC(=O)OEt$ | Me | $CH_2CN$ | O |
| D-6689 | Me | single bond | H | $CH_2CF_3$ | $CH_2OC(=O)OEt$ | Me | $CH_2CN$ | O |
| D-6690 | Me(R) | single bond | H | $CH_2CF_3$ | $CH_2OC(=O)OEt$ | Me | $CH_2CN$ | O |
| D-6691 | Me(S) | single bond | H | $CH_2CF_3$ | $CH_2OC(=O)OEt$ | Me | $CH_2CN$ | O |
| D-6692 | H | $CH_2$ | Me | $CH_2CF_3$ | $CH_2OC(=O)OEt$ | Me | $CH_2CN$ | O |
| D-6693 | Me | $CH_2$ | H | $CH_2CF_3$ | $CH_2OC(=O)OEt$ | Me | $CH_2CN$ | O |
| D-6694 | H | CH(Me) | H | $CH_2CF_3$ | $CH_2OC(=O)OEt$ | Me | $CH_2CN$ | O |

TABLE 798

| Compound Number | Y | W | Z | $R^1$ | $R^2$ | $R^3$ | $R^{10}$ | A |
|---|---|---|---|---|---|---|---|---|
| D-6695 | H | $CH_2CH_2$ | Me | $CH_2CF_3$ | $CH_2OC(=O)OEt$ | Me | $CH_2CN$ | O |
| D-6696 | Me | $CH_2CH_2$ | H | $CH_2CF_3$ | $CH_2OC(=O)OEt$ | Me | $CH_2CN$ | O |
| D-6697 | H | single bond | Me | $CH_2CF_3$ | $CH_2OC(=O)O(i\text{-}Pr)$ | Cl | $CH_2CN$ | O |
| D-6698 | Me | single bond | H | $CH_2CF_3$ | $CH_2OC(=O)O(i\text{-}Pr)$ | Cl | $CH_2CN$ | O |
| D-6699 | Me(R) | single bond | H | $CH_2CF_3$ | $CH_2OC(=O)O(i\text{-}Pr)$ | Cl | $CH_2CN$ | O |
| D-6700 | Me(S) | single bond | H | $CH_2CF_3$ | $CH_2OC(=O)O(i\text{-}Pr)$ | Cl | $CH_2CN$ | O |
| D-6701 | H | $CH_2$ | Me | $CH_2CF_3$ | $CH_2OC(=O)O(i\text{-}Pr)$ | Cl | $CH_2CN$ | O |
| D-6702 | Me | $CH_2$ | H | $CH_2CF_3$ | $CH_2OC(=O)O(i\text{-}Pr)$ | Cl | $CH_2CN$ | O |
| D-6703 | H | CH(Me) | H | $CH_2CF_3$ | $CH_2OC(=O)O(i\text{-}Pr)$ | Cl | $CH_2CN$ | O |
| D-6704 | H | $CH_2CH_2$ | Me | $CH_2CF_3$ | $CH_2OC(=O)O(i\text{-}Pr)$ | Cl | $CH_2CN$ | O |
| D-6705 | Me | $CH_2CH_2$ | H | $CH_2CF_3$ | $CH_2OC(=O)O(i\text{-}Pr)$ | Cl | $CH_2CN$ | O |
| D-6706 | H | single bond | Me | $CH_2CF_3$ | $CH_2OC(=O)O(i\text{-}Pr)$ | Me | $CH_2CN$ | O |
| D-6707 | Me | single bond | H | $CH_2CF_3$ | $CH_2OC(=O)O(i\text{-}Pr)$ | Me | $CH_2CN$ | O |
| D-6708 | Me(R) | single bond | H | $CH_2CF_3$ | $CH_2OC(=O)O(i\text{-}Pr)$ | Me | $CH_2CN$ | O |
| D-6709 | Me(S) | single bond | H | $CH_2CF_3$ | $CH_2OC(=O)O(i\text{-}Pr)$ | Me | $CH_2CN$ | O |
| D-6710 | H | $CH_2$ | Me | $CH_2CF_3$ | $CH_2OC(=O)O(i\text{-}Pr)$ | Me | $CH_2CN$ | O |
| D-6711 | Me | $CH_2$ | H | $CH_2CF_3$ | $CH_2OC(=O)O(i\text{-}Pr)$ | Me | $CH_2CN$ | O |
| D-6712 | H | CH(Me) | H | $CH_2CF_3$ | $CH_2OC(=O)O(i\text{-}Pr)$ | Me | $CH_2CN$ | O |
| D-6713 | H | $CH_2CH_2$ | Me | $CH_2CF_3$ | $CH_2OC(=O)O(i\text{-}Pr)$ | Me | $CH_2CN$ | O |
| D-6714 | Me | $CH_2CH_2$ | H | $CH_2CF_3$ | $CH_2OC(=O)O(i\text{-}Pr)$ | Me | $CH_2CN$ | O |
| D-6715 | H | single bond | Me | $CH_2CF_3$ | $CH_2N(Me)C(=O)OMe$ | Cl | $CH_2CN$ | O |
| D-6716 | Me | single bond | H | $CH_2CF_3$ | $CH_2N(Me)C(=O)OMe$ | Cl | $CH_2CN$ | O |
| D-6717 | Me(R) | single bond | H | $CH_2CF_3$ | $CH_2N(Me)C(=O)OMe$ | Cl | $CH_2CN$ | O |
| D-6718 | Me(S) | single bond | H | $CH_2CF_3$ | $CH_2N(Me)C(=O)OMe$ | Cl | $CH_2CN$ | O |
| D-6719 | H | $CH_2$ | Me | $CH_2CF_3$ | $CH_2N(Me)C(=O)OMe$ | Cl | $CH_2CN$ | O |
| D-6720 | Me | $CH_2$ | H | $CH_2CF_3$ | $CH_2N(Me)C(=O)OMe$ | Cl | $CH_2CN$ | O |
| D-6721 | H | CH(Me) | H | $CH_2CF_3$ | $CH_2N(Me)C(=O)OMe$ | Cl | $CH_2CN$ | O |
| D-6722 | H | $CH_2CH_2$ | Me | $CH_2CF_3$ | $CH_2N(Me)C(=O)OMe$ | Cl | $CH_2CN$ | O |
| D-6723 | Me | $CH_2CH_2$ | H | $CH_2CF_3$ | $CH_2N(Me)C(=O)OMe$ | Cl | $CH_2CN$ | O |
| D-6724 | H | single bond | Me | $CH_2CF_3$ | $CH_2N(Me)C(=O)OMe$ | Me | $CH_2CN$ | O |
| D-6725 | Me | single bond | H | $CH_2CF_3$ | $CH_2N(Me)C(=O)OMe$ | Me | $CH_2CN$ | O |
| D-6726 | Me(R) | single bond | H | $CH_2CF_3$ | $CH_2N(Me)C(=O)OMe$ | Me | $CH_2CN$ | O |
| D-6727 | Me(S) | single bond | H | $CH_2CF_3$ | $CH_2N(Me)C(=O)OMe$ | Me | $CH_2CN$ | O |
| D-6728 | H | $CH_2$ | Me | $CH_2CF_3$ | $CH_2N(Me)C(=O)OMe$ | Me | $CH_2CN$ | O |
| D-6729 | Me | $CH_2$ | H | $CH_2CF_3$ | $CH_2N(Me)C(=O)OMe$ | Me | $CH_2CN$ | O |
| D-6730 | H | CH(Me) | H | $CH_2CF_3$ | $CH_2N(Me)C(=O)OMe$ | Me | $CH_2CN$ | O |
| D-6731 | H | $CH_2CH_2$ | Me | $CH_2CF_3$ | $CH_2N(Me)C(=O)OMe$ | Me | $CH_2CN$ | O |
| D-6732 | Me | $CH_2CH_2$ | H | $CH_2CF_3$ | $CH_2N(Me)C(=O)OMe$ | Me | $CH_2CN$ | O |
| D-6733 | H | single bond | Me | $CH_2CF_3$ | $C(=O)OCH_2CH=CH_2$ | Cl | $C(=O)Me$ | O |
| D-6734 | Me | single bond | H | $CH_2CF_3$ | $C(=O)OCH_2CH=CH_2$ | Cl | $C(=O)Me$ | O |
| D-6735 | Me(R) | single bond | H | $CH_2CF_3$ | $C(=O)OCH_2CH=CH_2$ | Cl | $C(=O)Me$ | O |
| D-6736 | Me(S) | single bond | H | $CH_2CF_3$ | $C(=O)OCH_2CH=CH_2$ | Cl | $C(=O)Me$ | O |
| D-6737 | H | $CH_2$ | Me | $CH_2CF_3$ | $C(=O)OCH_2CH=CH_2$ | Cl | $C(=O)Me$ | O |
| D-6738 | Me | $CH_2$ | H | $CH_2CF_3$ | $C(=O)OCH_2CH=CH_2$ | Cl | $C(=O)Me$ | O |

TABLE 799

| Compound Number | Y | W | Z | $R^1$ | $R^2$ | $R^3$ | $R^{10}$ | A |
|---|---|---|---|---|---|---|---|---|
| D-6739 | H | CH(Me) | H | $CH_2CF_3$ | $C(=O)OCH_2CH=CH_2$ | Cl | $C(=O)Me$ | O |
| D-6740 | H | $CH_2CH_2$ | Me | $CH_2CF_3$ | $C(=O)OCH_2CH=CH_2$ | Cl | $C(=O)Me$ | O |
| D-6741 | Me | $CH_2CH_2$ | H | $CH_2CF_3$ | $C(=O)OCH_2CH=CH_2$ | Cl | $C(=O)Me$ | O |
| D-6742 | H | single bond | Me | $CH_2CF_3$ | $C(=O)OCH_2CH=CH_2$ | Me | $C(=O)Me$ | O |
| D-6743 | Me | single bond | H | $CH_2CF_3$ | $C(=O)OCH_2CH=CH_2$ | Me | $C(=O)Me$ | O |
| D-6744 | Me(R) | single bond | H | $CH_2CF_3$ | $C(=O)OCH_2CH=CH_2$ | Me | $C(=O)Me$ | O |
| D-6745 | Me(S) | single bond | H | $CH_2CF_3$ | $C(=O)OCH_2CH=CH_2$ | Me | $C(=O)Me$ | O |
| D-6746 | H | $CH_2$ | Me | $CH_2CF_3$ | $C(=O)OCH_2CH=CH_2$ | Me | $C(=O)Me$ | O |
| D-6747 | Me | $CH_2$ | H | $CH_2CF_3$ | $C(=O)OCH_2CH=CH_2$ | Me | $C(=O)Me$ | O |
| D-6748 | H | CH(Me) | H | $CH_2CF_3$ | $C(=O)OCH_2CH=CH_2$ | Me | $C(=O)Me$ | O |
| D-6749 | H | $CH_2CH_2$ | Me | $CH_2CF_3$ | $C(=O)OCH_2CH=CH_2$ | Me | $C(=O)Me$ | O |
| D-6750 | Me | $CH_2CH_2$ | H | $CH_2CF_3$ | $C(=O)OCH_2CH=CH_2$ | Me | $C(=O)Me$ | O |
| D-6751 | H | single bond | Me | $CH_2CF_3$ | $C(=O)OCH_2CCl_3$ | Cl | $C(=O)Me$ | O |
| D-6752 | Me | single bond | H | $CH_2CF_3$ | $C(=O)OCH_2CCl_3$ | Cl | $C(=O)Me$ | O |
| D-6753 | Me(R) | single bond | H | $CH_2CF_3$ | $C(=O)OCH_2CCl_3$ | Cl | $C(=O)Me$ | O |
| D-6754 | Me(S) | single bond | H | $CH_2CF_3$ | $C(=O)OCH_2CCl_3$ | Cl | $C(=O)Me$ | O |
| D-6755 | H | $CH_2$ | Me | $CH_2CF_3$ | $C(=O)OCH_2CCl_3$ | Cl | $C(=O)Me$ | O |
| D-6756 | Me | $CH_2$ | H | $CH_2CF_3$ | $C(=O)OCH_2CCl_3$ | Cl | $C(=O)Me$ | O |
| D-6757 | H | CH(Me) | H | $CH_2CF_3$ | $C(=O)OCH_2CCl_3$ | Cl | $C(=O)Me$ | O |
| D-6758 | H | $CH_2CH_2$ | Me | $CH_2CF_3$ | $C(=O)OCH_2CCl_3$ | Cl | $C(=O)Me$ | O |
| D-6759 | Me | $CH_2CH_2$ | H | $CH_2CF_3$ | $C(=O)OCH_2CCl_3$ | Cl | $C(=O)Me$ | O |
| D-6760 | H | single bond | Me | $CH_2CF_3$ | $C(=O)OCH_2CCl_3$ | Me | $C(=O)Me$ | O |
| D-6761 | Me | single bond | H | $CH_2CF_3$ | $C(=O)OCH_2CCl_3$ | Me | $C(=O)Me$ | O |

TABLE 799-continued

| Compound Number | Y | W | Z | $R^1$ | $R^2$ | $R^3$ | $R^{10}$ | A |
|---|---|---|---|---|---|---|---|---|
| D-6762 | Me(R) | single bond | H | $CH_2CF_3$ | C(=O)OCH$_2$CCl$_3$ | Me | C(=O)Me | O |
| D-6763 | Me(S) | single bond | H | $CH_2CF_3$ | C(=O)OCH$_2$CCl$_3$ | Me | C(=O)Me | O |
| D-6764 | H | $CH_2$ | Me | $CH_2CF_3$ | C(=O)OCH$_2$CCl$_3$ | Me | C(=O)Me | O |
| D-6765 | Me | $CH_2$ | H | $CH_2CF_3$ | C(=O)OCH$_2$CCl$_3$ | Me | C(=O)Me | O |
| D-6766 | H | CH(Me) | H | $CH_2CF_3$ | C(=O)OCH$_2$CCl$_3$ | Me | C(=O)Me | O |
| D-6767 | H | $CH_2CH_2$ | Me | $CH_2CF_3$ | C(=O)OCH$_2$CCl$_3$ | Me | C(=O)Me | O |
| D-6768 | Me | $CH_2CH_2$ | H | $CH_2CF_3$ | C(=O)OCH$_2$CCl$_3$ | Me | C(=O)Me | O |
| D-6769 | H | single bond | Me | $CH_2CF_3$ | C(=O)N(Me)$_2$ | Cl | C(=O)Me | O |
| D-6770 | Me | single bond | H | $CH_2CF_3$ | C(=O)N(Me)$_2$ | Cl | C(=O)Me | O |
| D-6771 | Me(R) | single bond | H | $CH_2CF_3$ | C(=O)N(Me)$_2$ | Cl | C(=O)Me | O |
| D-6772 | Me(S) | single bond | H | $CH_2CF_3$ | C(=O)N(Me)$_2$ | Cl | C(=O)Me | O |
| D-6773 | H | $CH_2$ | Me | $CH_2CF_3$ | C(=O)N(Me)$_2$ | Cl | C(=O)Me | O |
| D-6774 | Me | $CH_2$ | H | $CH_2CF_3$ | C(=O)N(Me)$_2$ | Cl | C(=O)Me | O |
| D-6775 | H | CH(Me) | H | $CH_2CF_3$ | C(=O)N(Me)$_2$ | Cl | C(=O)Me | O |
| D-6776 | H | $CH_2CH_2$ | Me | $CH_2CF_3$ | C(=O)N(Me)$_2$ | Cl | C(=O)Me | O |
| D-6777 | Me | $CH_2CH_2$ | H | $CH_2CF_3$ | C(=O)N(Me)$_2$ | Cl | C(=O)Me | O |
| D-6778 | H | single bond | Me | $CH_2CF_3$ | C(=O)N(Me)$_2$ | Me | C(=O)Me | O |
| D-6779 | Me | single bond | H | $CH_2CF_3$ | C(=O)N(Me)$_2$ | Me | C(=O)Me | O |
| D-6780 | Me(R) | single bond | H | $CH_2CF_3$ | C(=O)N(Me)$_2$ | Me | C(=O)Me | O |
| D-6781 | Me(S) | single bond | H | $CH_2CF_3$ | C(=O)N(Me)$_2$ | Me | C(=O)Me | O |
| D-6782 | H | $CH_2$ | Me | $CH_2CF_3$ | C(=O)N(Me)$_2$ | Me | C(=O)Me | O |

TABLE 800

| Compound Number | Y | W | Z | $R^1$ | $R^2$ | $R^3$ | $R^{10}$ | A |
|---|---|---|---|---|---|---|---|---|
| D-6783 | Me | $CH_2$ | H | $CH_2CF_3$ | C(=O)N(Me)$_2$ | Me | C(=O)Me | O |
| D-6784 | H | CH(Me) | H | $CH_2CF_3$ | C(=O)N(Me)$_2$ | Me | C(=O)Me | O |
| D-6785 | H | $CH_2CH_2$ | Me | $CH_2CF_3$ | C(=O)N(Me)$_2$ | Me | C(=O)Me | O |
| D-6786 | Me | $CH_2CH_2$ | H | $CH_2CF_3$ | C(=O)N(Me)$_2$ | Me | C(=O)Me | O |
| D-6787 | H | single bond | Me | $CH_2CF_3$ | CH$_2$OC(=O)Me | Cl | C(=O)Me | O |
| D-6788 | Me | single bond | H | $CH_2CF_3$ | CH$_2$OC(=O)Me | Cl | C(=O)Me | O |
| D-6789 | Me(R) | single bond | H | $CH_2CF_3$ | CH$_2$OC(=O)Me | Cl | C(=O)Me | O |
| D-6790 | Me(S) | single bond | H | $CH_2CF_3$ | CH$_2$OC(=O)Me | Cl | C(=O)Me | O |
| D-6791 | H | $CH_2$ | Me | $CH_2CF_3$ | CH$_2$OC(=O)Me | Cl | C(=O)Me | O |
| D-6792 | Me | $CH_2$ | H | $CH_2CF_3$ | CH$_2$OC(=O)Me | Cl | C(=O)Me | O |
| D-6793 | H | CH(Me) | H | $CH_2CF_3$ | CH$_2$OC(=O)Me | Cl | C(=O)Me | O |
| D-6794 | H | $CH_2CH_2$ | Me | $CH_2CF_3$ | CH$_2$OC(=O)Me | Cl | C(=O)Me | O |
| D-6795 | Me | $CH_2CH_2$ | H | $CH_2CF_3$ | CH$_2$OC(=O)Me | Cl | C(=O)Me | O |
| D-6796 | H | single bond | Me | $CH_2CF_3$ | CH$_2$OC(=O)Me | Me | C(=O)Me | O |
| D-6797 | Me | single bond | H | $CH_2CF_3$ | CH$_2$OC(=O)Me | Me | C(=O)Me | O |
| D-6798 | Me(R) | single bond | H | $CH_2CF_3$ | CH$_2$OC(=O)Me | Me | C(=O)Me | O |
| D-6799 | Me(S) | single bond | H | $CH_2CF_3$ | CH$_2$OC(=O)Me | Me | C(=O)Me | O |
| D-6800 | H | $CH_2$ | Me | $CH_2CF_3$ | CH$_2$OC(=O)Me | Me | C(=O)Me | O |
| D-6801 | Me | $CH_2$ | H | $CH_2CF_3$ | CH$_2$OC(=O)Me | Me | C(=O)Me | O |
| D-6802 | H | CH(Me) | H | $CH_2CF_3$ | CH$_2$OC(=O)Me | Me | C(=O)Me | O |
| D-6803 | H | $CH_2CH_2$ | Me | $CH_2CF_3$ | CH$_2$OC(=O)Me | Me | C(=O)Me | O |
| D-6804 | Me | $CH_2CH_2$ | H | $CH_2CF_3$ | CH$_2$OC(=O)Me | Me | C(=O)Me | O |
| D-6805 | H | single bond | Me | $CH_2CF_3$ | CH$_2$OC(=O)(i-Pr) | Cl | C(=O)Me | O |
| D-6806 | Me | single bond | H | $CH_2CF_3$ | CH$_2$OC(=O)(i-Pr) | Cl | C(=O)Me | O |
| D-6807 | Me(R) | single bond | H | $CH_2CF_3$ | CH$_2$OC(=O)(i-Pr) | Cl | C(=O)Me | O |
| D-6808 | Me(S) | single bond | H | $CH_2CF_3$ | CH$_2$OC(=O)(i-Pr) | Cl | C(=O)Me | O |
| D-6809 | H | $CH_2$ | Me | $CH_2CF_3$ | CH$_2$OC(=O)(i-Pr) | Cl | C(=O)Me | O |
| D-6810 | Me | $CH_2$ | H | $CH_2CF_3$ | CH$_2$OC(=O)(i-Pr) | Cl | C(=O)Me | O |
| D-6811 | H | CH(Me) | H | $CH_2CF_3$ | CH$_2$OC(=O)(i-Pr) | Cl | C(=O)Me | O |
| D-6812 | H | $CH_2CH_2$ | Me | $CH_2CF_3$ | CH$_2$OC(=O)(i-Pr) | Cl | C(=O)Me | O |
| D-6813 | Me | $CH_2CH_2$ | H | $CH_2CF_3$ | CH$_2$OC(=O)(i-Pr) | Cl | C(=O)Me | O |
| D-6814 | H | single bond | Me | $CH_2CF_3$ | CH$_2$OC(=O)(i-Pr) | Me | C(=O)Me | O |
| D-6815 | Me | single bond | H | $CH_2CF_3$ | CH$_2$OC(=O)(i-Pr) | Me | C(=O)Me | O |
| D-6816 | Me(R) | single bond | H | $CH_2CF_3$ | CH$_2$OC(=O)(i-Pr) | Me | C(=O)Me | O |
| D-6817 | Me(S) | single bond | H | $CH_2CF_3$ | CH$_2$OC(=O)(i-Pr) | Me | C(=O)Me | O |
| D-6818 | H | $CH_2$ | Me | $CH_2CF_3$ | CH$_2$OC(=O)(i-Pr) | Me | C(=O)Me | O |
| D-6819 | Me | $CH_2$ | H | $CH_2CF_3$ | CH$_2$OC(=O)(i-Pr) | Me | C(=O)Me | O |
| D-6820 | H | CH(Me) | H | $CH_2CF_3$ | CH$_2$OC(=O)(i-Pr) | Me | C(=O)Me | O |
| D-6821 | H | $CH_2CH_2$ | Me | $CH_2CF_3$ | CH$_2$OC(=O)(i-Pr) | Me | C(=O)Me | O |
| D-6822 | Me | $CH_2CH_2$ | H | $CH_2CF_3$ | CH$_2$OC(=O)(i-Pr) | Me | C(=O)Me | O |
| D-6823 | H | single bond | Me | $CH_2CF_3$ | CH$_2$OC(=O)(t-Bu) | Cl | C(=O)Me | O |
| D-6824 | Me | single bond | H | $CH_2CF_3$ | CH$_2$OC(=O)(t-Bu) | Cl | C(=O)Me | O |
| D-6825 | Me(R) | single bond | H | $CH_2CF_3$ | CH$_2$OC(=O)(t-Bu) | Cl | C(=O)Me | O |
| D-6826 | Me(S) | single bond | H | $CH_2CF_3$ | CH$_2$OC(=O)(t-Bu) | Cl | C(=O)Me | O |

TABLE 801

| Compound Number | Y | W | Z | $R^1$ | $R^2$ | $R^3$ | $R^{10}$ | A |
|---|---|---|---|---|---|---|---|---|
| D-6827 | H | $CH_2$ | Me | $CH_2CF_3$ | $CH_2OC(=O)(t-Bu)$ | Cl | C(=O)Me | O |
| D-6828 | Me | $CH_2$ | H | $CH_2CF_3$ | $CH_2OC(=O)(t-Bu)$ | Cl | C(=O)Me | O |
| D-6829 | H | CH(Me) | H | $CH_2CF_3$ | $CH_2OC(=O)(t-Bu)$ | Cl | C(=O)Me | O |
| D-6830 | H | $CH_2CH_2$ | Me | $CH_2CF_3$ | $CH_2OC(=O)(t-Bu)$ | Cl | C(=O)Me | O |
| D-6831 | Me | $CH_2CH_2$ | H | $CH_2CF_3$ | $CH_2OC(=O)(t-Bu)$ | Cl | C(=O)Me | O |
| D-6832 | H | single bond | Me | $CH_2CF_3$ | $CH_2OC(=O)(t-Bu)$ | Me | C(=O)Me | O |
| D-6833 | Me | single bond | H | $CH_2CF_3$ | $CH_2OC(=O)(t-Bu)$ | Me | C(=O)Me | O |
| D-6834 | Me(R) | single bond | H | $CH_2CF_3$ | $CH_2OC(=O)(t-Bu)$ | Me | C(=O)Me | O |
| D-6835 | Me(S) | single bond | H | $CH_2CF_3$ | $CH_2OC(=O)(t-Bu)$ | Me | C(=O)Me | O |
| D-6836 | H | $CH_2$ | Me | $CH_2CF_3$ | $CH_2OC(=O)(t-Bu)$ | Me | C(=O)Me | O |
| D-6837 | Me | $CH_2$ | H | $CH_2CF_3$ | $CH_2OC(=O)(t-Bu)$ | Me | C(=O)Me | O |
| D-6838 | H | CH(Me) | H | $CH_2CF_3$ | $CH_2OC(=O)(t-Bu)$ | Me | C(=O)Me | O |
| D-6839 | H | $CH_2CH_2$ | Me | $CH_2CF_3$ | $CH_2OC(=O)(t-Bu)$ | Me | C(=O)Me | O |
| D-6840 | Me | $CH_2CH_2$ | H | $CH_2CF_3$ | $CH_2OC(=O)(t-Bu)$ | Me | C(=O)Me | O |
| D-6841 | H | single bond | Me | $CH_2CF_3$ | $CH_2OC(=O)OEt$ | Cl | C(=O)Me | O |
| D-6842 | Me | single bond | H | $CH_2CF_3$ | $CH_2OC(=O)OEt$ | Cl | C(=O)Me | O |
| D-6843 | Me(R) | single bond | H | $CH_2CF_3$ | $CH_2OC(=O)OEt$ | Cl | C(=O)Me | O |
| D-6844 | Me(S) | single bond | H | $CH_2CF_3$ | $CH_2OC(=O)OEt$ | Cl | C(=O)Me | O |
| D-6845 | H | $CH_2$ | Me | $CH_2CF_3$ | $CH_2OC(=O)OEt$ | Cl | C(=O)Me | O |
| D-6846 | Me | $CH_2$ | H | $CH_2CF_3$ | $CH_2OC(=O)OEt$ | Cl | C(=O)Me | O |
| D-6847 | H | CH(Me) | H | $CH_2CF_3$ | $CH_2OC(=O)OEt$ | Cl | C(=O)Me | O |
| D-6848 | H | $CH_2CH_2$ | Me | $CH_2CF_3$ | $CH_2OC(=O)OEt$ | Cl | C(=O)Me | O |
| D-6849 | Me | $CH_2CH_2$ | H | $CH_2CF_3$ | $CH_2OC(=O)OEt$ | Cl | C(=O)Me | O |
| D-6850 | H | single bond | Me | $CH_2CF_3$ | $CH_2OC(=O)OEt$ | Me | C(=O)Me | O |
| D-6851 | Me | single bond | H | $CH_2CF_3$ | $CH_2OC(=O)OEt$ | Me | C(=O)Me | O |
| D-6852 | Me(R) | single bond | H | $CH_2CF_3$ | $CH_2OC(=O)OEt$ | Me | C(=O)Me | O |
| D-6853 | Me(S) | single bond | H | $CH_2CF_3$ | $CH_2OC(=O)OEt$ | Me | C(=O)Me | O |
| D-6854 | H | $CH_2$ | Me | $CH_2CF_3$ | $CH_2OC(=O)OEt$ | Me | C(=O)Me | O |
| D-6855 | Me | $CH_2$ | H | $CH_2CF_3$ | $CH_2OC(=O)OEt$ | Me | C(=O)Me | O |
| D-6856 | H | CH(Me) | H | $CH_2CF_3$ | $CH_2OC(=O)OEt$ | Me | C(=O)Me | O |
| D-6857 | H | $CH_2CH_2$ | Me | $CH_2CF_3$ | $CH_2OC(=O)OEt$ | Me | C(=O)Me | O |
| D-6858 | Me | $CH_2CH_2$ | H | $CH_2CF_3$ | $CH_2OC(=O)OEt$ | Me | C(=O)Me | O |
| D-6859 | H | single bond | Me | $CH_2CF_3$ | $CH_2OC(=O)O(i-Pr)$ | Cl | C(=O)Me | O |
| D-6860 | Me | single bond | H | $CH_2CF_3$ | $CH_2OC(=O)O(i-Pr)$ | Cl | C(=O)Me | O |
| D-6861 | Me(R) | single bond | H | $CH_2CF_3$ | $CH_2OC(=O)O(i-Pr)$ | Cl | C(=O)Me | O |
| D-6862 | Me(S) | single bond | H | $CH_2CF_3$ | $CH_2OC(=O)O(i-Pr)$ | Cl | C(=O)Me | O |
| D-6863 | H | $CH_2$ | Me | $CH_2CF_3$ | $CH_2OC(=O)O(i-Pr)$ | Cl | C(=O)Me | O |
| D-6864 | Me | $CH_2$ | H | $CH_2CF_3$ | $CH_2OC(=O)O(i-Pr)$ | Cl | C(=O)Me | O |
| D-6865 | H | CH(Me) | H | $CH_2CF_3$ | $CH_2OC(=O)O(i-Pr)$ | Cl | C(=O)Me | O |
| D-6866 | H | $CH_2CH_2$ | Me | $CH_2CF_3$ | $CH_2OC(=O)O(i-Pr)$ | Cl | C(=O)Me | O |
| D-6867 | Me | $CH_2CH_2$ | H | $CH_2CF_3$ | $CH_2OC(=O)O(i-Pr)$ | Cl | C(=O)Me | O |
| D-6868 | H | single bond | Me | $CH_2CF_3$ | $CH_2OC(=O)O(i-Pr)$ | Me | C(=O)Me | O |
| D-6869 | Me | single bond | H | $CH_2CF_3$ | $CH_2OC(=O)O(i-Pr)$ | Me | C(=O)Me | O |
| D-6870 | Me(R) | single bond | H | $CH_2CF_3$ | $CH_2OC(=O)O(i-Pr)$ | Me | C(=O)Me | O |

TABLE 802

| Compound Number | Y | W | Z | $R^1$ | $R^2$ | $R^3$ | $R^{10}$ | A |
|---|---|---|---|---|---|---|---|---|
| D-6871 | Me(S) | single bond | H | $CH_2CF_3$ | $CH_2OC(=O)O(i-Pr)$ | Me | C(=O)Me | O |
| D-6872 | H | $CH_2$ | Me | $CH_2CF_3$ | $CH_2OC(=O)O(i-Pr)$ | Me | C(=O)Me | O |
| D-6873 | Me | $CH_2$ | H | $CH_2CF_3$ | $CH_2OC(=O)O(i-Pr)$ | Me | C(=O)Me | O |
| D-6874 | H | CH(Me) | H | $CH_2CF_3$ | $CH_2OC(=O)O(i-Pr)$ | Me | C(=O)Me | O |
| D-6875 | H | $CH_2CH_2$ | Me | $CH_2CF_3$ | $CH_2OC(=O)O(i-Pr)$ | Me | C(=O)Me | O |
| D-6876 | Me | $CH_2CH_2$ | H | $CH_2CF_3$ | $CH_2OC(=O)O(i-Pr)$ | Me | C(=O)Me | O |
| D-6877 | H | single bond | Me | $CH_2CF_3$ | $CH_2N(Me)C(=O)OMe$ | Cl | C(=O)Me | O |
| D-6878 | Me | single bond | H | $CH_2CF_3$ | $CH_2N(Me)C(=O)OMe$ | Cl | C(=O)Me | O |
| D-6879 | Me(R) | single bond | H | $CH_2CF_3$ | $CH_2N(Me)C(=O)OMe$ | Cl | C(=O)Me | O |
| D-6880 | Me(S) | single bond | H | $CH_2CF_3$ | $CH_2N(Me)C(=O)OMe$ | Cl | C(=O)Me | O |
| D-6881 | H | $CH_2$ | Me | $CH_2CF_3$ | $CH_2N(Me)C(=O)OMe$ | Cl | C(=O)Me | O |
| D-6882 | Me | $CH_2$ | H | $CH_2CF_3$ | $CH_2N(Me)C(=O)OMe$ | Cl | C(=O)Me | O |
| D-6883 | H | CH(Me) | H | $CH_2CF_3$ | $CH_2N(Me)C(=O)OMe$ | Cl | C(=O)Me | O |
| D-6884 | H | $CH_2CH_2$ | Me | $CH_2CF_3$ | $CH_2N(Me)C(=O)OMe$ | Cl | C(=O)Me | O |
| D-6885 | Me | $CH_2CH_2$ | H | $CH_2CF_3$ | $CH_2N(Me)C(=O)OMe$ | Cl | C(=O)Me | O |
| D-6886 | H | single bond | Me | $CH_2CF_3$ | $CH_2N(Me)C(=O)OMe$ | Me | C(=O)Me | O |
| D-6887 | Me | single bond | H | $CH_2CF_3$ | $CH_2N(Me)C(=O)OMe$ | Me | C(=O)Me | O |
| D-6888 | Me(R) | single bond | H | $CH_2CF_3$ | $CH_2N(Me)C(=O)OMe$ | Me | C(=O)Me | O |
| D-6889 | Me(S) | single bond | H | $CH_2CF_3$ | $CH_2N(Me)C(=O)OMe$ | Me | C(=O)Me | O |
| D-6890 | H | $CH_2$ | Me | $CH_2CF_3$ | $CH_2N(Me)C(=O)OMe$ | Me | C(=O)Me | O |
| D-6891 | Me | $CH_2$ | H | $CH_2CF_3$ | $CH_2N(Me)C(=O)OMe$ | Me | C(=O)Me | O |

TABLE 802-continued

| Compound Number | Y | W | Z | $R^1$ | $R^2$ | $R^3$ | $R^{10}$ | A |
|---|---|---|---|---|---|---|---|---|
| D-6892 | H | CH(Me) | H | $CH_2CF_3$ | $CH_2N(Me)C(=O)OMe$ | Me | C(=O)Me | O |
| D-6893 | H | $CH_2CH_2$ | Me | $CH_2CF_3$ | $CH_2N(Me)C(=O)OMe$ | Me | C(=O)Me | O |
| D-6894 | Me | $CH_2CH_2$ | H | $CH_2CF_3$ | $CH_2N(Me)C(=O)OMe$ | Me | C(=O)Me | O |
| D-6895 | H | single bond | Me | Et | $C(=O)OCH_2CH=CH_2$ | Cl | H | O |
| D-6896 | Me | single bond | H | Et | $C(=O)OCH_2CH=CH_2$ | Cl | H | O |
| D-6897 | Me(R) | single bond | H | Et | $C(=O)OCH_2CH=CH_2$ | Cl | H | O |
| D-6898 | Me(S) | single bond | H | Et | $C(=O)OCH_2CH=CH_2$ | Cl | H | O |
| D-6899 | H | $CH_2$ | Me | Et | $C(=O)OCH_2CH=CH_2$ | Cl | H | O |
| D-6900 | Me | $CH_2$ | H | Et | $C(=O)OCH_2CH=CH_2$ | Cl | H | O |
| D-6901 | H | CH(Me) | H | Et | $C(=O)OCH_2CH=CH_2$ | Cl | H | O |
| D-6902 | H | $CH_2CH_2$ | Me | Et | $C(=O)OCH_2CH=CH_2$ | Cl | H | O |
| D-6903 | Me | $CH_2CH_2$ | H | Et | $C(=O)OCH_2CH=CH_2$ | Cl | H | O |
| D-6904 | H | single bond | Me | Et | $C(=O)OCH_2CH=CH_2$ | Me | H | O |
| D-6905 | Me | single bond | H | Et | $C(=O)OCH_2CH=CH_2$ | Me | H | O |
| D-6906 | Me(R) | single bond | H | Et | $C(=O)OCH_2CH=CH_2$ | Me | H | O |
| D-6907 | Me(S) | single bond | H | Et | $C(=O)OCH_2CH=CH_2$ | Me | H | O |
| D-6908 | H | $CH_2$ | Me | Et | $C(=O)OCH_2CH=CH_2$ | Me | H | O |
| D-6909 | Me | $CH_2$ | H | Et | $C(=O)OCH_2CH=CH_2$ | Me | H | O |
| D-6910 | H | CH(Me) | H | Et | $C(=O)OCH_2CH=CH_2$ | Me | H | O |
| D-6911 | H | $CH_2CH_2$ | Me | Et | $C(=O)OCH_2CH=CH_2$ | Me | H | O |
| D-6912 | Me | $CH_2CH_2$ | H | Et | $C(=O)OCH_2CH=CH_2$ | Me | H | O |
| D-6913 | H | single bond | Me | Et | $C(=O)OCH_2CCl_3$ | Cl | H | O |
| D-6914 | Me | single bond | H | Et | $C(=O)OCH_2CCl_3$ | Cl | H | O |

TABLE 803

| Compound Number | Y | W | Z | $R^1$ | $R^2$ | $R^3$ | $R^{10}$ | A |
|---|---|---|---|---|---|---|---|---|
| D-6915 | Me(R) | single bond | H | Et | $C(=O)OCH_2CCl_3$ | Cl | H | O |
| D-6916 | Me(S) | single bond | H | Et | $C(=O)OCH_2CCl_3$ | Cl | H | O |
| D-6917 | H | $CH_2$ | Me | Et | $C(=O)OCH_2CCl_3$ | Cl | H | O |
| D-6918 | Me | $CH_2$ | H | Et | $C(=O)OCH_2CCl_3$ | Cl | H | O |
| D-6919 | H | CH(Me) | H | Et | $C(=O)OCH_2CCl_3$ | Cl | H | O |
| D-6920 | H | $CH_2CH_2$ | Me | Et | $C(=O)OCH_2CCl_3$ | Cl | H | O |
| D-6921 | Me | $CH_2CH_2$ | H | Et | $C(=O)OCH_2CCl_3$ | Cl | H | O |
| D-6922 | H | single bond | Me | Et | $C(=O)OCH_2CCl_3$ | Me | H | O |
| D-6923 | Me | single bond | H | Et | $C(=O)OCH_2CCl_3$ | Me | H | O |
| D-6924 | Me(R) | single bond | H | Et | $C(=O)OCH_2CCl_3$ | Me | H | O |
| D-6925 | Me(S) | single bond | H | Et | $C(=O)OCH_2CCl_3$ | Me | H | O |
| D-6926 | H | $CH_2$ | Me | Et | $C(=O)OCH_2CCl_3$ | Me | H | O |
| D-6927 | Me | $CH_2$ | H | Et | $C(=O)OCH_2CCl_3$ | Me | H | O |
| D-6928 | H | CH(Me) | H | Et | $C(=O)OCH_2CCl_3$ | Me | H | O |
| D-6929 | H | $CH_2CH_2$ | Me | Et | $C(=O)OCH_2CCl_3$ | Me | H | O |
| D-6930 | Me | $CH_2CH_2$ | H | Et | $C(=O)OCH_2CCl_3$ | Me | H | O |
| D-6931 | H | single bond | Me | Et | $C(=O)N(Me)_2$ | Cl | H | O |
| D-6932 | Me | single bond | H | Et | $C(=O)N(Me)_2$ | Cl | H | O |
| D-6933 | Me(R) | single bond | H | Et | $C(=O)N(Me)_2$ | Cl | H | O |
| D-6934 | Me(S) | single bond | H | Et | $C(=O)N(Me)_2$ | Cl | H | O |
| D-6935 | H | $CH_2$ | Me | Et | $C(=O)N(Me)_2$ | Cl | H | O |
| D-6936 | Me | $CH_2$ | H | Et | $C(=O)N(Me)_2$ | Cl | H | O |
| D-6937 | H | CH(Me) | H | Et | $C(=O)N(Me)_2$ | Cl | H | O |

TABLE 803-continued

| Compound Number | Y | W | Z | $R^1$ | $R^2$ | $R^3$ | $R^{10}$ | A |
|---|---|---|---|---|---|---|---|---|
| D-6938 | H | $CH_2CH_2$ | Me | Et | $C(=O)N(Me)_2$ | Cl | H | O |
| D-6939 | Me | $CH_2CH_2$ | H | Et | $C(=O)N(Me)_2$ | Cl | H | O |
| D-6940 | H | single bond | Me | Et | $C(=O)N(Me)_2$ | Me | H | O |
| D-6941 | Me | single bond | H | Et | $C(=O)N(Me)_2$ | Me | H | O |
| D-6942 | Me(R) | single bond | H | Et | $C(=O)N(Me)_2$ | Me | H | O |
| D-6943 | Me(S) | single bond | H | Et | $C(=O)N(Me)_2$ | Me | H | O |
| D-6944 | H | $CH_2$ | Me | Et | $C(=O)N(Me)_2$ | Me | H | O |
| D-6945 | Me | $CH_2$ | H | Et | $C(=O)N(Me)_2$ | Me | H | O |
| D-6946 | H | CH(Me) | H | Et | $C(=O)N(Me)_2$ | Me | H | O |
| D-6947 | H | $CH_2CH_2$ | Me | Et | $C(=O)N(Me)_2$ | Me | H | O |
| D-6948 | Me | $CH_2CH_2$ | H | Et | $C(=O)N(Me)_2$ | Me | H | O |
| D-6949 | H | single bond | Me | Et | $CH_2OC(=O)Me$ | Cl | H | O |
| D-6950 | Me | single bond | H | Et | $CH_2OC(=O)Me$ | Cl | H | O |
| D-6951 | Me(R) | single bond | H | Et | $CH_2OC(=O)Me$ | Cl | H | O |
| D-6952 | Me(S) | single bond | H | Et | $CH_2OC(=O)Me$ | Cl | H | O |
| D-6953 | H | $CH_2$ | Me | Et | $CH_2OC(=O)Me$ | Cl | H | O |
| D-6954 | Me | $CH_2$ | H | Et | $CH_2OC(=O)Me$ | Cl | H | O |
| D-6955 | H | CH(Me) | H | Et | $CH_2OC(=O)Me$ | Cl | H | O |
| D-6956 | H | $CH_2CH_2$ | Me | Et | $CH_2OC(=O)Me$ | Cl | H | O |
| D-6957 | Me | $CH_2CH_2$ | H | Et | $CH_2OC(=O)Me$ | Cl | H | O |
| D-6958 | H | single bond | Me | Et | $CH_2OC(=O)Me$ | Me | H | O |

TABLE 804

| Compound Number | Y | W | Z | $R^1$ | $R^2$ | $R^3$ | $R^{10}$ | A |
|---|---|---|---|---|---|---|---|---|
| D-6959 | Me | single bond | H | Et | $CH_2OC(=O)Me$ | Me | H | O |
| D-6960 | Me(R) | single bond | H | Et | $CH_2OC(=O)Me$ | Me | H | O |
| D-6961 | Me(S) | single bond | H | Et | $CH_2OC(=O)Me$ | Me | H | O |
| D-6962 | H | $CH_2$ | Me | Et | $CH_2OC(=O)Me$ | Me | H | O |
| D-6963 | Me | $CH_2$ | H | Et | $CH_2OC(=O)Me$ | Me | H | O |
| D-6964 | H | CH(Me) | H | Et | $CH_2OC(=O)Me$ | Me | H | O |
| D-6965 | H | $CH_2CH_2$ | Me | Et | $CH_2OC(=O)Me$ | Me | H | O |
| D-6966 | Me | $CH_2CH_2$ | H | Et | $CH_2OC(=O)Me$ | Me | H | O |
| D-6967 | H | single bond | Me | Et | $CH_2OC(=O)(i\text{-}Pr)$ | Cl | H | O |
| D-6968 | Me | single bond | H | Et | $CH_2OC(=O)(i\text{-}Pr)$ | Cl | H | O |
| D-6969 | Me(R) | single bond | H | Et | $CH_2OC(=O)(i\text{-}Pr)$ | Cl | H | O |
| D-6970 | Me(S) | single bond | H | Et | $CH_2OC(=O)(i\text{-}Pr)$ | Cl | H | O |
| D-6971 | H | $CH_2$ | Me | Et | $CH_2OC(=O)(i\text{-}Pr)$ | Cl | H | O |
| D-6972 | Me | $CH_2$ | H | Et | $CH_2OC(=O)(i\text{-}Pr)$ | Cl | H | O |

TABLE 804-continued

| Compound Number | Y | W | Z | $R^1$ | $R^2$ | $R^3$ | $R^{10}$ | A |
|---|---|---|---|---|---|---|---|---|
| D-6973 | H | CH(Me) | H | Et | $CH_2OC(=O)(i\text{-}Pr)$ | Cl | H | O |
| D-6974 | H | $CH_2CH_2$ | Me | Et | $CH_2OC(=O)(i\text{-}Pr)$ | Cl | H | O |
| D-6975 | Me | $CH_2CH_2$ | H | Et | $CH_2OC(=O)(i\text{-}Pr)$ | Cl | H | O |
| D-6976 | H | single bond | Me | Et | $CH_2OC(=O)(i\text{-}Pr)$ | Me | H | O |
| D-6977 | Me | single bond | H | Et | $CH_2OC(=O)(i\text{-}Pr)$ | Me | H | O |
| D-6978 | Me(R) | single bond | H | Et | $CH_2OC(=O)(i\text{-}Pr)$ | Me | H | O |
| D-6979 | Me(S) | single bond | H | Et | $CH_2OC(=O)(i\text{-}Pr)$ | Me | H | O |
| D-6980 | H | $CH_2$ | Me | Et | $CH_2OC(=O)(i\text{-}Pr)$ | Me | H | O |
| D-6981 | Me | $CH_2$ | H | Et | $CH_2OC(=O)(i\text{-}Pr)$ | Me | H | O |
| D-6982 | H | CH(Me) | H | Et | $CH_2OC(=O)(i\text{-}Pr)$ | Me | H | O |
| D-6983 | H | $CH_2CH_2$ | Me | Et | $CH_2OC(=O)(i\text{-}Pr)$ | Me | H | O |
| D-6984 | Me | $CH_2CH_2$ | H | Et | $CH_2OC(=O)(i\text{-}Pr)$ | Me | H | O |
| D-6985 | H | single bond | Me | Et | $CH_2OC(=O)(t\text{-}Bu)$ | Cl | H | O |
| D-6986 | Me | single bond | H | Et | $CH_2OC(=O)(t\text{-}Bu)$ | Cl | H | O |
| D-6987 | Me(R) | single bond | H | Et | $CH_2OC(=O)(t\text{-}Bu)$ | Cl | H | O |
| D-6988 | Me(S) | single bond | H | Et | $CH_2OC(=O)(t\text{-}Bu)$ | Cl | H | O |
| D-6989 | H | $CH_2$ | Me | Et | $CH_2OC(=O)(t\text{-}Bu)$ | Cl | H | O |
| D-6990 | Me | $CH_2$ | H | Et | $CH_2OC(=O)(t\text{-}Bu)$ | Cl | H | O |
| D-6991 | H | CH(Me) | H | Et | $CH_2OC(=O)(t\text{-}Bu)$ | Cl | H | O |
| D-6992 | H | $CH_2CH_2$ | Me | Et | $CH_2OC(=O)(t\text{-}Bu)$ | Cl | H | O |
| D-6993 | Me | $CH_2CH_2$ | H | Et | $CH_2OC(=O)(t\text{-}Bu)$ | Cl | H | O |
| D-6994 | H | single bond | Me | Et | $CH_2OC(=O)(t\text{-}Bu)$ | Me | H | O |
| D-6995 | Me | single bond | H | Et | $CH_2OC(=O)(t\text{-}Bu)$ | Me | H | O |
| D-6996 | Me(R) | single bond | H | Et | $CH_2OC(=O)(t\text{-}Bu)$ | Me | H | O |
| D-6997 | Me(S) | single bond | H | Et | $CH_2OC(=O)(t\text{-}Bu)$ | Me | H | O |
| D-6998 | H | $CH_2$ | Me | Et | $CH_2OC(=O)(t\text{-}Bu)$ | Me | H | O |
| D-6999 | Me | $CH_2$ | H | Et | $CH_2OC(=O)(t\text{-}Bu)$ | Me | H | O |
| D-7000 | H | CH(Me) | H | Et | $CH_2OC(=O)(t\text{-}Bu)$ | Me | H | O |
| D-7001 | H | $CH_2CH_2$ | Me | Et | $CH_2OC(=O)(t\text{-}Bu)$ | Me | H | O |
| D-7002 | Me | $CH_2CH_2$ | H | Et | $CH_2OC(=O)(t\text{-}Bu)$ | Me | H | O |

TABLE 805

| Compound Number | Y | W | Z | $R^1$ | $R^2$ | $R^3$ | $R^{10}$ | A |
|---|---|---|---|---|---|---|---|---|
| D-7003 | H | single bond | Me | Et | $CH_2OC(=O)OEt$ | Cl | H | O |
| D-7004 | Me | single bond | H | Et | $CH_2OC(=O)OEt$ | Cl | H | O |
| D-7005 | Me(R) | single bond | H | Et | $CH_2OC(=O)OEt$ | Cl | H | O |
| D-7006 | Me(S) | single bond | H | Et | $CH_2OC(=O)OEt$ | Cl | H | O |
| D-7007 | H | $CH_2$ | Me | Et | $CH_2OC(=O)OEt$ | Cl | H | O |
| D-7008 | Me | $CH_2$ | H | Et | $CH_2OC(=O)OEt$ | Cl | H | O |
| D-7009 | H | CH(Me) | H | Et | $CH_2OC(=O)OEt$ | Cl | H | O |
| D-7010 | H | $CH_2CH_2$ | Me | Et | $CH_2OC(=O)OEt$ | Cl | H | O |
| D-7011 | Me | $CH_2CH_2$ | H | Et | $CH_2OC(=O)OEt$ | Cl | H | O |
| D-7012 | H | single bond | Me | Et | $CH_2OC(=O)OEt$ | Me | H | O |
| D-7013 | Me | single bond | H | Et | $CH_2OC(=O)OEt$ | Me | H | O |
| D-7014 | Me(R) | single bond | H | Et | $CH_2OC(=O)OEt$ | Me | H | O |
| D-7015 | Me(S) | single bond | H | Et | $CH_2OC(=O)OEt$ | Me | H | O |
| D-7016 | H | $CH_2$ | Me | Et | $CH_2OC(=O)OEt$ | Me | H | O |
| D-7017 | Me | $CH_2$ | H | Et | $CH_2OC(=O)OEt$ | Me | H | O |
| D-7018 | H | CH(Me) | H | Et | $CH_2OC(=O)OEt$ | Me | H | O |
| D-7019 | H | $CH_2CH_2$ | Me | Et | $CH_2OC(=O)OEt$ | Me | H | O |
| D-7020 | Me | $CH_2CH_2$ | H | Et | $CH_2OC(=O)OEt$ | Me | H | O |
| D-7021 | H | single bond | Me | Et | $CH_2OC(=O)O(i\text{-}Pr)$ | Cl | H | O |
| D-7022 | Me | single bond | H | Et | $CH_2OC(=O)O(i\text{-}Pr)$ | Cl | H | O |
| D-7023 | Me(R) | single bond | H | Et | $CH_2OC(=O)O(i\text{-}Pr)$ | Cl | H | O |
| D-7024 | Me(S) | single bond | H | Et | $CH_2OC(=O)O(i\text{-}Pr)$ | Cl | H | O |
| D-7025 | H | $CH_2$ | Me | Et | $CH_2OC(=O)O(i\text{-}Pr)$ | Cl | H | O |
| D-7026 | Me | $CH_2$ | H | Et | $CH_2OC(=O)O(i\text{-}Pr)$ | Cl | H | O |
| D-7027 | H | CH(Me) | H | Et | $CH_2OC(=O)O(i\text{-}Pr)$ | Cl | H | O |
| D-7028 | H | $CH_2CH_2$ | Me | Et | $CH_2OC(=O)O(i\text{-}Pr)$ | Cl | H | O |
| D-7029 | Me | $CH_2CH_2$ | H | Et | $CH_2OC(=O)O(i\text{-}Pr)$ | Cl | H | O |
| D-7030 | H | single bond | Me | Et | $CH_2OC(=O)O(i\text{-}Pr)$ | Me | H | O |
| D-7031 | Me | single bond | H | Et | $CH_2OC(=O)O(i\text{-}Pr)$ | Me | H | O |
| D-7032 | Me(R) | single bond | H | Et | $CH_2OC(=O)O(i\text{-}Pr)$ | Me | H | O |
| D-7033 | Me(S) | single bond | H | Et | $CH_2OC(=O)O(i\text{-}Pr)$ | Me | H | O |
| D-7034 | H | $CH_2$ | Me | Et | $CH_2OC(=O)O(i\text{-}Pr)$ | Me | H | O |
| D-7035 | Me | $CH_2$ | H | Et | $CH_2OC(=O)O(i\text{-}Pr)$ | Me | H | O |
| D-7036 | H | CH(Me) | H | Et | $CH_2OC(=O)O(i\text{-}Pr)$ | Me | H | O |
| D-7037 | H | $CH_2CH_2$ | Me | Et | $CH_2OC(=O)O(i\text{-}Pr)$ | Me | H | O |
| D-7038 | Me | $CH_2CH_2$ | H | Et | $CH_2OC(=O)O(i\text{-}Pr)$ | Me | H | O |
| D-7039 | H | single bond | Me | Et | $CH_2N(Me)C(=O)OMe$ | Cl | H | O |

TABLE 805-continued

| Compound Number | Y | W | Z | $R^1$ | $R^2$ | $R^3$ | $R^{10}$ | A |
|---|---|---|---|---|---|---|---|---|
| D-7040 | Me | single bond | H | Et | $CH_2N(Me)C({=}O)OMe$ | Cl | H | O |
| D-7041 | Me(R) | single bond | H | Et | $CH_2N(Me)C({=}O)OMe$ | Cl | H | O |
| D-7042 | Me(S) | single bond | H | Et | $CH_2N(Me)C({=}O)OMe$ | Cl | H | O |
| D-7043 | H | $CH_2$ | Me | Et | $CH_2N(Me)C({=}O)OMe$ | Cl | H | O |
| D-7044 | Me | $CH_2$ | H | Et | $CH_2N(Me)C({=}O)OMe$ | Cl | H | O |
| D-7045 | H | CH(Me) | H | Et | $CH_2N(Me)C({=}O)OMe$ | Cl | H | O |
| D-7046 | H | $CH_2CH_2$ | Me | Et | $CH_2N(Me)C({=}O)OMe$ | Cl | H | O |

TABLE 806

| Compound Number | Y | W | Z | $R^1$ | $R^2$ | $R^3$ | $R^{10}$ | A |
|---|---|---|---|---|---|---|---|---|
| D-7047 | Me | $CH_2CH_2$ | H | Et | $CH_2N(Me)C({=}O)OMe$ | Cl | H | O |
| D-7048 | H | single bond | Me | Et | $CH_2N(Me)C({=}O)OMe$ | Me | H | O |
| D-7049 | Me | single bond | H | Et | $CH_2N(Me)C({=}O)OMe$ | Me | H | O |
| D-7050 | Me(R) | single bond | H | Et | $CH_2N(Me)C({=}O)OMe$ | Me | H | O |
| D-7051 | Me(S) | single bond | H | Et | $CH_2N(Me)C({=}O)OMe$ | Me | H | O |
| D-7052 | H | $CH_2$ | Me | Et | $CH_2N(Me)C({=}O)OMe$ | Me | H | O |
| D-7053 | Me | $CH_2$ | H | Et | $CH_2N(Me)C({=}O)OMe$ | Me | H | O |
| D-7054 | H | CH(Me) | H | Et | $CH_2N(Me)C({=}O)OMe$ | Me | H | O |
| D-7055 | H | $CH_2CH_2$ | Me | Et | $CH_2N(Me)C({=}O)OMe$ | Me | H | O |
| D-7056 | Me | $CH_2CH_2$ | H | Et | $CH_2N(Me)C({=}O)OMe$ | Me | H | O |
| D-7057 | H | single bond | Me | Et | $C({=}O)OCH_2CH{=}CH_2$ | Cl | Me | O |
| D-7058 | Me | single bond | H | Et | $C({=}O)OCH_2CH{=}CH_2$ | Cl | Me | O |
| D-7059 | Me(R) | single bond | H | Et | $C({=}O)OCH_2CH{=}CH_2$ | Cl | Me | O |
| D-7060 | Me(S) | single bond | H | Et | $C({=}O)OCH_2CH{=}CH_2$ | Cl | Me | O |
| D-7061 | H | $CH_2$ | Me | Et | $C({=}O)OCH_2CH{=}CH_2$ | Cl | Me | O |
| D-7062 | Me | $CH_2$ | H | Et | $C({=}O)OCH_2CH{=}CH_2$ | Cl | Me | O |
| D-7063 | H | CH(Me) | H | Et | $C({=}O)OCH_2CH{=}CH_2$ | Cl | Me | O |
| D-7064 | H | $CH_2CH_2$ | Me | Et | $C({=}O)OCH_2CH{=}CH_2$ | Cl | Me | O |
| D-7065 | Me | $CH_2CH_2$ | H | Et | $C({=}O)OCH_2CH{=}CH_2$ | Cl | Me | O |
| D-7066 | H | single bond | Me | Et | $C({=}O)OCH_2CH{=}CH_2$ | Me | Me | O |
| D-7067 | Me | single bond | H | Et | $C({=}O)OCH_2CH{=}CH_2$ | Me | Me | O |
| D-7068 | Me(R) | single bond | H | Et | $C({=}O)OCH_2CH{=}CH_2$ | Me | Me | O |
| D-7069 | Me(S) | single bond | H | Et | $C({=}O)OCH_2CH{=}CH_2$ | Me | Me | O |
| D-7070 | H | $CH_2$ | Me | Et | $C({=}O)OCH_2CH{=}CH_2$ | Me | Me | O |
| D-7071 | Me | $CH_2$ | H | Et | $C({=}O)OCH_2CH{=}CH_2$ | Me | Me | O |
| D-7072 | H | CH(Me) | H | Et | $C({=}O)OCH_2CH{=}CH_2$ | Me | Me | O |
| D-7073 | H | $CH_2CH_2$ | Me | Et | $C({=}O)OCH_2CH{=}CH_2$ | Me | Me | O |
| D-7074 | Me | $CH_2CH_2$ | H | Et | $C({=}O)OCH_2CH{=}CH_2$ | Me | Me | O |
| D-7075 | H | single bond | Me | Et | $C({=}O)OCH_2CCl_3$ | Cl | Me | O |
| D-7076 | Me | single bond | H | Et | $C({=}O)OCH_2CCl_3$ | Cl | Me | O |
| D-7077 | Me(R) | single bond | H | Et | $C({=}O)OCH_2CCl_3$ | Cl | Me | O |
| D-7078 | Me(S) | single bond | H | Et | $C({=}O)OCH_2CCl_3$ | Cl | Me | O |
| D-7079 | H | $CH_2$ | Me | Et | $C({=}O)OCH_2CCl_3$ | Cl | Me | O |
| D-7080 | Me | $CH_2$ | H | Et | $C({=}O)OCH_2CCl_3$ | Cl | Me | O |
| D-7081 | H | CH(Me) | H | Et | $C({=}O)OCH_2CCl_3$ | Cl | Me | O |
| D-7082 | H | $CH_2CH_2$ | Me | Et | $C({=}O)OCH_2CCl_3$ | Cl | Me | O |
| D-7083 | Me | $CH_2CH_2$ | H | Et | $C({=}O)OCH_2CCl_3$ | Cl | Me | O |
| D-7084 | H | single bond | Me | Et | $C({=}O)OCH_2CCl_3$ | Me | Me | O |
| D-7085 | Me | single bond | H | Et | $C({=}O)OCH_2CCl_3$ | Me | Me | O |
| D-7086 | Me(R) | single bond | H | Et | $C({=}O)OCH_2CCl_3$ | Me | Me | O |
| D-7087 | Me(S) | single bond | H | Et | $C({=}O)OCH_2CCl_3$ | Me | Me | O |
| D-7088 | H | $CH_2$ | Me | Et | $C({=}O)OCH_2CCl_3$ | Me | Me | O |
| D-7089 | Me | $CH_2$ | H | Et | $C({=}O)OCH_2CCl_3$ | Me | Me | O |
| D-7090 | H | CH(Me) | H | Et | $C({=}O)OCH_2CCl_3$ | Me | Me | O |

TABLE 807

| Compound Number | Y | W | Z | $R^1$ | $R^2$ | $R^3$ | $R^{10}$ | A |
|---|---|---|---|---|---|---|---|---|
| D-7091 | H | $CH_2CH_2$ | Me | Et | $C({=}O)OCH_2CCl_3$ | Me | Me | O |
| D-7092 | Me | $CH_2CH_2$ | H | Et | $C({=}O)OCH_2CCl_3$ | Me | Me | O |
| D-7093 | H | single bond | Me | Et | $C({=}O)N(Me)_2$ | Cl | Me | O |
| D-7094 | Me | single bond | H | Et | $C({=}O)N(Me)_2$ | Cl | Me | O |
| D-7095 | Me(R) | single bond | H | Et | $C({=}O)N(Me)_2$ | Cl | Me | O |

TABLE 807-continued

| Compound Number | Y | W | Z | $R^1$ | $R^2$ | $R^3$ | $R^{10}$ | A |
|---|---|---|---|---|---|---|---|---|
| D-7096 | Me(S) | single bond | H | Et | C(=O)N(Me)$_2$ | Cl | Me | O |
| D-7097 | H | $CH_2$ | Me | Et | C(=O)N(Me)$_2$ | Cl | Me | O |
| D-7098 | Me | $CH_2$ | H | Et | C(=O)N(Me)$_2$ | Cl | Me | O |
| D-7099 | H | CH(Me) | H | Et | C(=O)N(Me)$_2$ | Cl | Me | O |
| D-7100 | H | $CH_2CH_2$ | Me | Et | C(=O)N(Me)$_2$ | Cl | Me | O |
| D-7101 | Me | $CH_2CH_2$ | H | Et | C(=O)N(Me)$_2$ | Cl | Me | O |
| D-7102 | H | single bond | Me | Et | C(=O)N(Me)$_2$ | Me | Me | O |
| D-7103 | Me | single bond | H | Et | C(=O)N(Me)$_2$ | Me | Me | O |
| D-7104 | Me(R) | single bond | H | Et | C(=O)N(Me)$_2$ | Me | Me | O |
| D-7105 | Me(S) | single bond | H | Et | C(=O)N(Me)$_2$ | Me | Me | O |
| D-7106 | H | $CH_2$ | Me | Et | C(=O)N(Me)$_2$ | Me | Me | O |
| D-7107 | Me | $CH_2$ | H | Et | C(=O)N(Me)$_2$ | Me | Me | O |
| D-7108 | H | CH(Me) | H | Et | C(=O)N(Me)$_2$ | Me | Me | O |
| D-7109 | H | $CH_2CH_2$ | Me | Et | C(=O)N(Me)$_2$ | Me | Me | O |
| D-7110 | Me | $CH_2CH_2$ | H | Et | C(=O)N(Me)$_2$ | Me | Me | O |
| D-7111 | H | single bond | Me | Et | $CH_2$OC(=O)Me | Cl | Me | O |
| D-7112 | Me | single bond | H | Et | $CH_2$OC(=O)Me | Cl | Me | O |
| D-7113 | Me(R) | single bond | H | Et | $CH_2$OC(=O)Me | Cl | Me | O |
| D-7114 | Me(S) | single bond | H | Et | $CH_2$OC(=O)Me | Cl | Me | O |
| D-7115 | H | $CH_2$ | Me | Et | $CH_2$OC(=O)Me | Cl | Me | O |
| D-7116 | Me | $CH_2$ | H | Et | $CH_2$OC(=O)Me | Cl | Me | O |
| D-7117 | H | CH(Me) | H | Et | $CH_2$OC(=O)Me | Cl | Me | O |
| D-7118 | H | $CH_2CH_2$ | Me | Et | $CH_2$OC(=O)Me | Cl | Me | O |
| D-7119 | Me | $CH_2CH_2$ | H | Et | $CH_2$OC(=O)Me | Cl | Me | O |
| D-7120 | H | single bond | Me | Et | $CH_2$OC(=O)Me | Me | Me | O |
| D-7121 | Me | single bond | H | Et | $CH_2$OC(=O)Me | Me | Me | O |
| D-7122 | Me(R) | single bond | H | Et | $CH_2$OC(=O)Me | Me | Me | O |
| D-7123 | Me(S) | single bond | H | Et | $CH_2$OC(=O)Me | Me | Me | O |
| D-7124 | H | $CH_2$ | Me | Et | $CH_2$OC(=O)Me | Me | Me | O |
| D-7125 | Me | $CH_2$ | H | Et | $CH_2$OC(=O)Me | Me | Me | O |
| D-7126 | H | CH(Me) | H | Et | $CH_2$OC(=O)Me | Me | Me | O |
| D-7127 | H | $CH_2CH_2$ | Me | Et | $CH_2$OC(=O)Me | Me | Me | O |
| D-7128 | Me | $CH_2CH_2$ | H | Et | $CH_2$OC(=O)Me | Me | Me | O |
| D-7129 | H | single bond | Me | Et | $CH_2$OC(=O)(i-Pr) | Cl | Me | O |
| D-7130 | Me | single bond | H | Et | $CH_2$OC(=O)(i-Pr) | Cl | Me | O |
| D-7131 | Me(R) | single bond | H | Et | $CH_2$OC(=O)(i-Pr) | Cl | Me | O |
| D-7132 | Me(S) | single bond | H | Et | $CH_2$OC(=O)(i-Pr) | Cl | Me | O |
| D-7133 | H | $CH_2$ | Me | Et | $CH_2$OC(=O)(i-Pr) | Cl | Me | O |
| D-7134 | Me | $CH_2$ | H | Et | $CH_2$OC(=O)(i-Pr) | Cl | Me | O |

TABLE 808

| Compound Number | Y | W | Z | $R^1$ | $R^2$ | $R^3$ | $R^{10}$ | A |
|---|---|---|---|---|---|---|---|---|
| D-7135 | H | CH(Me) | H | Et | $CH_2$OC(=O)(i-Pr) | Cl | Me | O |
| D-7136 | H | $CH_2CH_2$ | Me | Et | $CH_2$OC(=O)(i-Pr) | Cl | Me | O |
| D-7137 | Me | $CH_2CH_2$ | H | Et | $CH_2$OC(=O)(i-Pr) | Cl | Me | O |
| D-7138 | H | single bond | Me | Et | $CH_2$OC(=O)(i-Pr) | Me | Me | O |
| D-7139 | Me | single bond | H | Et | $CH_2$OC(=O)(i-Pr) | Me | Me | O |
| D-7140 | Me(R) | single bond | H | Et | $CH_2$OC(=O)(i-Pr) | Me | Me | O |
| D-7141 | Me(S) | single bond | H | Et | $CH_2$OC(=O)(i-Pr) | Me | Me | O |
| D-7142 | H | $CH_2$ | Me | Et | $CH_2$OC(=O)(i-Pr) | Me | Me | O |
| D-7143 | Me | $CH_2$ | H | Et | $CH_2$OC(=O)(i-Pr) | Me | Me | O |
| D-7144 | H | CH(Me) | H | Et | $CH_2$OC(=O)(i-Pr) | Me | Me | O |
| D-7145 | H | $CH_2CH_2$ | Me | Et | $CH_2$OC(=O)(i-Pr) | Me | Me | O |
| D-7146 | Me | $CH_2CH_2$ | H | Et | $CH_2$OC(=O)(i-Pr) | Me | Me | O |
| D-7147 | H | single bond | Me | Et | $CH_2$OC(=O)(t-Bu) | Cl | Me | O |
| D-7148 | Me | single bond | H | Et | $CH_2$OC(=O)(t-Bu) | Cl | Me | O |
| D-7149 | Me(R) | single bond | H | Et | $CH_2$OC(=O)(t-Bu) | Cl | Me | O |
| D-7150 | Me(S) | single bond | H | Et | $CH_2$OC(=O)(t-Bu) | Cl | Me | O |
| D-7151 | H | $CH_2$ | Me | Et | $CH_2$OC(=O)(t-Bu) | Cl | Me | O |
| D-7152 | Me | $CH_2$ | H | Et | $CH_2$OC(=O)(t-Bu) | Cl | Me | O |
| D-7153 | H | CH(Me) | H | Et | $CH_2$OC(=O)(t-Bu) | Cl | Me | O |
| D-7154 | H | $CH_2CH_2$ | Me | Et | $CH_2$OC(=O)(t-Bu) | Cl | Me | O |
| D-7155 | Me | $CH_2CH_2$ | H | Et | $CH_2$OC(=O)(t-Bu) | Cl | Me | O |
| D-7156 | H | single bond | Me | Et | $CH_2$OC(=O)(t-Bu) | Me | Me | O |
| D-7157 | Me | single bond | H | Et | $CH_2$OC(=O)(t-Bu) | Me | Me | O |
| D-7158 | Me(R) | single bond | H | Et | $CH_2$OC(=O)(t-Bu) | Me | Me | O |
| D-7159 | Me(S) | single bond | H | Et | $CH_2$OC(=O)(t-Bu) | Me | Me | O |
| D-7160 | H | $CH_2$ | Me | Et | $CH_2$OC(=O)(t-Bu) | Me | Me | O |
| D-7161 | Me | $CH_2$ | H | Et | $CH_2$OC(=O)(t-Bu) | Me | Me | O |
| D-7162 | H | CH(Me) | H | Et | $CH_2$OC(=O)(t-Bu) | Me | Me | O |

TABLE 808-continued

| Compound Number | Y | W | Z | $R^1$ | $R^2$ | $R^3$ | $R^{10}$ | A |
|---|---|---|---|---|---|---|---|---|
| D-7163 | H | $CH_2CH_2$ | Me | Et | $CH_2OC(=O)(t\text{-}Bu)$ | Me | Me | O |
| D-7164 | Me | $CH_2CH_2$ | H | Et | $CH_2OC(=O)(t\text{-}Bu)$ | Me | Me | O |
| D-7165 | H | single bond | Me | Et | $CH_2OC(=O)OEt$ | Cl | Me | O |
| D-7166 | Me | single bond | H | Et | $CH_2OC(=O)OEt$ | Cl | Me | O |
| D-7167 | Me(R) | single bond | H | Et | $CH_2OC(=O)OEt$ | Cl | Me | O |
| D-7168 | Me(S) | single bond | H | Et | $CH_2OC(=O)OEt$ | Cl | Me | O |
| D-7169 | H | $CH_2$ | Me | Et | $CH_2OC(=O)OEt$ | Cl | Me | O |
| D-7170 | Me | $CH_2$ | H | Et | $CH_2OC(=O)OEt$ | Cl | Me | O |
| D-7171 | H | CH(Me) | H | Et | $CH_2OC(=O)OEt$ | Cl | Me | O |
| D-7172 | H | $CH_2CH_2$ | Me | Et | $CH_2OC(=O)OEt$ | Cl | Me | O |
| D-7173 | Me | $CH_2CH_2$ | H | Et | $CH_2OC(=O)OEt$ | Cl | Me | O |
| D-7174 | H | single bond | Me | Et | $CH_2OC(=O)OEt$ | Me | Me | O |
| D-7175 | Me | single bond | H | Et | $CH_2OC(=O)OEt$ | Me | Me | O |
| D-7176 | Me(R) | single bond | H | Et | $CH_2OC(=O)OEt$ | Me | Me | O |
| D-7177 | Me(S) | single bond | H | Et | $CH_2OC(=O)OEt$ | Me | Me | O |
| D-7178 | H | $CH_2$ | Me | Et | $CH_2OC(=O)OEt$ | Me | Me | O |

TABLE 809

| Compound Number | Y | W | Z | $R^1$ | $R^2$ | $R^3$ | $R^{10}$ | A |
|---|---|---|---|---|---|---|---|---|
| D-7179 | Me | $CH_2$ | H | Et | $CH_2OC(=O)OEt$ | Me | Me | O |
| D-7180 | H | CH(Me) | H | Et | $CH_2OC(=O)OEt$ | Me | Me | O |
| D-7181 | H | $CH_2CH_2$ | Me | Et | $CH_2OC(=O)OEt$ | Me | Me | O |
| D-7182 | Me | $CH_2CH_2$ | H | Et | $CH_2OC(=O)OEt$ | Me | Me | O |
| D-7183 | H | single bond | Me | Et | $CH_2OC(=O)O(i\text{-}Pr)$ | Cl | Me | O |
| D-7184 | Me | single bond | H | Et | $CH_2OC(=O)O(i\text{-}Pr)$ | Cl | Me | O |
| D-7185 | Me(R) | single bond | H | Et | $CH_2OC(=O)O(i\text{-}Pr)$ | Cl | Me | O |
| D-7186 | Me(S) | single bond | H | Et | $CH_2OC(=O)O(i\text{-}Pr)$ | Cl | Me | O |
| D-7187 | H | $CH_2$ | Me | Et | $CH_2OC(=O)O(i\text{-}Pr)$ | Cl | Me | O |
| D-7188 | Me | $CH_2$ | H | Et | $CH_2OC(=O)O(i\text{-}Pr)$ | Cl | Me | O |
| D-7189 | H | CH(Me) | H | Et | $CH_2OC(=O)O(i\text{-}Pr)$ | Cl | Me | O |
| D-7190 | H | $CH_2CH_2$ | Me | Et | $CH_2OC(=O)O(i\text{-}Pr)$ | Cl | Me | O |
| D-7191 | Me | $CH_2CH_2$ | H | Et | $CH_2OC(=O)O(i\text{-}Pr)$ | Cl | Me | O |
| D-7192 | H | single bond | Me | Et | $CH_2OC(=O)O(i\text{-}Pr)$ | Me | Me | O |
| D-7193 | Me | single bond | H | Et | $CH_2OC(=O)O(i\text{-}Pr)$ | Me | Me | O |
| D-7194 | Me(R) | single bond | H | Et | $CH_2OC(=O)O(i\text{-}Pr)$ | Me | Me | O |
| D-7195 | Me(S) | single bond | H | Et | $CH_2OC(=O)O(i\text{-}Pr)$ | Me | Me | O |
| D-7196 | H | $CH_2$ | Me | Et | $CH_2OC(=O)O(i\text{-}Pr)$ | Me | Me | O |
| D-7197 | Me | $CH_2$ | H | Et | $CH_2OC(=O)O(i\text{-}Pr)$ | Me | Me | O |
| D-7198 | H | CH(Me) | H | Et | $CH_2OC(=O)O(i\text{-}Pr)$ | Me | Me | O |
| D-7199 | H | $CH_2CH_2$ | Me | Et | $CH_2OC(=O)O(i\text{-}Pr)$ | Me | Me | O |
| D-7200 | Me | $CH_2CH_2$ | H | Et | $CH_2OC(=O)O(i\text{-}Pr)$ | Me | Me | O |
| D-7201 | H | single bond | Me | Et | $CH_2N(Me)C(=O)OMe$ | Cl | Me | O |
| D-7202 | Me | single bond | H | Et | $CH_2N(Me)C(=O)OMe$ | Cl | Me | O |
| D-7203 | Me(R) | single bond | H | Et | $CH_2N(Me)C(=O)OMe$ | Cl | Me | O |
| D-7204 | Me(S) | single bond | H | Et | $CH_2N(Me)C(=O)OMe$ | Cl | Me | O |
| D-7205 | H | $CH_2$ | Me | Et | $CH_2N(Me)C(=O)OMe$ | Cl | Me | O |
| D-7206 | Me | $CH_2$ | H | Et | $CH_2N(Me)C(=O)OMe$ | Cl | Me | O |
| D-7207 | H | CH(Me) | H | Et | $CH_2N(Me)C(=O)OMe$ | Cl | Me | O |
| D-7208 | H | $CH_2CH_2$ | Me | Et | $CH_2N(Me)C(=O)OMe$ | Cl | Me | O |
| D-7209 | Me | $CH_2CH_2$ | H | Et | $CH_2N(Me)C(=O)OMe$ | Cl | Me | O |
| D-7210 | H | single bond | Me | Et | $CH_2N(Me)C(=O)OMe$ | Me | Me | O |
| D-7211 | Me | single bond | H | Et | $CH_2N(Me)C(=O)OMe$ | Me | Me | O |
| D-7212 | Me(R) | single bond | H | Et | $CH_2N(Me)C(=O)OMe$ | Me | Me | O |
| D-7213 | Me(S) | single bond | H | Et | $CH_2N(Me)C(=O)OMe$ | Me | Me | O |
| D-7214 | H | $CH_2$ | Me | Et | $CH_2N(Me)C(=O)OMe$ | Me | Me | O |
| D-7215 | Me | $CH_2$ | H | Et | $CH_2N(Me)C(=O)OMe$ | Me | Me | O |
| D-7216 | H | CH(Me) | H | Et | $CH_2N(Me)C(=O)OMe$ | Me | Me | O |
| D-7217 | H | $CH_2CH_2$ | Me | Et | $CH_2N(Me)C(=O)OMe$ | Me | Me | O |
| D-7218 | Me | $CH_2CH_2$ | H | Et | $CH_2N(Me)C(=O)OMe$ | Me | Me | O |
| D-7219 | H | single bond | Me | Et | $C(=O)OCH_2CH=CH_2$ | Cl | $CH_2OMe$ | O |
| D-7220 | Me | single bond | H | Et | $C(=O)OCH_2CH=CH_2$ | Cl | $CH_2OMe$ | O |
| D-7221 | Me(R) | single bond | H | Et | $C(=O)OCH_2CH=CH_2$ | Cl | $CH_2OMe$ | O |
| D-7222 | Me(S) | single bond | H | Et | $C(=O)OCH_2CH=CH_2$ | Cl | $CH_2OMe$ | O |

TABLE 810

| Compound Number | Y | W | Z | $R^1$ | $R^2$ | $R^3$ | $R^{10}$ | A |
|---|---|---|---|---|---|---|---|---|
| D-7223 | H | $CH_2$ | Me | Et | $C(=O)OCH_2CH=CH_2$ | Cl | $CH_2OMe$ | O |
| D-7224 | Me | $CH_2$ | H | Et | $C(=O)OCH_2CH=CH_2$ | Cl | $CH_2OMe$ | O |
| D-7225 | H | CH(Me) | H | Et | $C(=O)OCH_2CH=CH_2$ | Cl | $CH_2OMe$ | O |
| D-7226 | H | $CH_2CH_2$ | Me | Et | $C(=O)OCH_2CH=CH_2$ | Cl | $CH_2OMe$ | O |
| D-7227 | Me | $CH_2CH_2$ | H | Et | $C(=O)OCH_2CH=CH_2$ | Cl | $CH_2OMe$ | O |
| D-7228 | H | single bond | Me | Et | $C(=O)OCH_2CH=CH_2$ | Me | $CH_2OMe$ | O |
| D-7229 | Me | single bond | H | Et | $C(=O)OCH_2CH=CH_2$ | Me | $CH_2OMe$ | O |
| D-7230 | Me(R) | single bond | H | Et | $C(=O)OCH_2CH=CH_2$ | Me | $CH_2OMe$ | O |
| D-7231 | Me(S) | single bond | H | Et | $C(=O)OCH_2CH=CH_2$ | Me | $CH_2OMe$ | O |
| D-7232 | H | $CH_2$ | Me | Et | $C(=O)OCH_2CH=CH_2$ | Me | $CH_2OMe$ | O |
| D-7233 | Me | $CH_2$ | H | Et | $C(=O)OCH_2CH=CH_2$ | Me | $CH_2OMe$ | O |
| D-7234 | H | CH(Me) | H | Et | $C(=O)OCH_2CH=CH_2$ | Me | $CH_2OMe$ | O |
| D-7235 | H | $CH_2CH_2$ | Me | Et | $C(=O)OCH_2CH=CH_2$ | Me | $CH_2OMe$ | O |
| D-7236 | Me | $CH_2CH_2$ | H | Et | $C(=O)OCH_2CH=CH_2$ | Me | $CH_2OMe$ | O |
| D-7237 | H | single bond | Me | Et | $C(=O)OCH_2CCl_3$ | Cl | $CH_2OMe$ | O |
| D-7238 | Me | single bond | H | Et | $C(=O)OCH_2CCl_3$ | Cl | $CH_2OMe$ | O |
| D-7239 | Me(R) | single bond | H | Et | $C(=O)OCH_2CCl_3$ | Cl | $CH_2OMe$ | O |
| D-7240 | Me(S) | single bond | H | Et | $C(=O)OCH_2CCl_3$ | Cl | $CH_2OMe$ | O |
| D-7241 | H | $CH_2$ | Me | Et | $C(=O)OCH_2CCl_3$ | Cl | $CH_2OMe$ | O |
| D-7242 | Me | $CH_2$ | H | Et | $C(=O)OCH_2CCl_3$ | Cl | $CH_2OMe$ | O |
| D-7243 | H | CH(Me) | H | Et | $C(=O)OCH_2CCl_3$ | Cl | $CH_2OMe$ | O |
| D-7244 | H | $CH_2CH_2$ | Me | Et | $C(=O)OCH_2CCl_3$ | Cl | $CH_2OMe$ | O |
| D-7245 | Me | $CH_2CH_2$ | H | Et | $C(=O)OCH_2CCl_3$ | Cl | $CH_2OMe$ | O |
| D-7246 | H | single bond | Me | Et | $C(=O)OCH_2CCl_3$ | Me | $CH_2OMe$ | O |
| D-7247 | Me | single bond | H | Et | $C(=O)OCH_2CCl_3$ | Me | $CH_2OMe$ | O |
| D-7248 | Me(R) | single bond | H | Et | $C(=O)OCH_2CCl_3$ | Me | $CH_2OMe$ | O |
| D-7249 | Me(S) | single bond | H | Et | $C(=O)OCH_2CCl_3$ | Me | $CH_2OMe$ | O |
| D-7250 | H | $CH_2$ | Me | Et | $C(=O)OCH_2CCl_3$ | Me | $CH_2OMe$ | O |
| D-7251 | Me | $CH_2$ | H | Et | $C(=O)OCH_2CCl_3$ | Me | $CH_2OMe$ | O |
| D-7252 | H | CH(Me) | H | Et | $C(=O)OCH_2CCl_3$ | Me | $CH_2OMe$ | O |
| D-7253 | H | $CH_2CH_2$ | Me | Et | $C(=O)OCH_2CCl_3$ | Me | $CH_2OMe$ | O |
| D-7254 | Me | $CH_2CH_2$ | H | Et | $C(=O)OCH_2CCl_3$ | Me | $CH_2OMe$ | O |
| D-7255 | H | single bond | Me | Et | $C(=O)N(Me)_2$ | Cl | $CH_2OMe$ | O |
| D-7256 | Me | single bond | H | Et | $C(=O)N(Me)_2$ | Cl | $CH_2OMe$ | O |
| D-7257 | Me(R) | single bond | H | Et | $C(=O)N(Me)_2$ | Cl | $CH_2OMe$ | O |
| D-7258 | Me(S) | single bond | H | Et | $C(=O)N(Me)_2$ | Cl | $CH_2OMe$ | O |
| D-7259 | H | $CH_2$ | Me | Et | $C(=O)N(Me)_2$ | Cl | $CH_2OMe$ | O |
| D-7260 | Me | $CH_2$ | H | Et | $C(=O)N(Me)_2$ | Cl | $CH_2OMe$ | O |
| D-7261 | H | CH(Me) | H | Et | $C(=O)N(Me)_2$ | Cl | $CH_2OMe$ | O |
| D-7262 | H | $CH_2CH_2$ | Me | Et | $C(=O)N(Me)_2$ | Cl | $CH_2OMe$ | O |
| D-7263 | Me | $CH_2CH_2$ | H | Et | $C(=O)N(Me)_2$ | Cl | $CH_2OMe$ | O |
| D-7264 | H | single bond | Me | Et | $C(=O)N(Me)_2$ | Me | $CH_2OMe$ | O |
| D-7265 | Me | single bond | H | Et | $C(=O)N(Me)_2$ | Me | $CH_2OMe$ | O |
| D-7266 | Me(R) | single bond | H | Et | $C(=O)N(Me)_2$ | Me | $CH_2OMe$ | O |

TABLE 811

| Compound Number | Y | W | Z | $R^1$ | $R^2$ | $R^3$ | $R^{10}$ | A |
|---|---|---|---|---|---|---|---|---|
| D-7267 | Me(S) | single bond | H | Et | $C(=O)N(Me)_2$ | Me | $CH_2OMe$ | O |
| D-7268 | H | $CH_2$ | Me | Et | $C(=O)N(Me)_2$ | Me | $CH_2OMe$ | O |
| D-7269 | Me | $CH_2$ | H | Et | $C(=O)N(Me)_2$ | Me | $CH_2OMe$ | O |
| D-7270 | H | CH(Me) | H | Et | $C(=O)N(Me)_2$ | Me | $CH_2OMe$ | O |
| D-7271 | H | $CH_2CH_2$ | Me | Et | $C(=O)N(Me)_2$ | Me | $CH_2OMe$ | O |
| D-7272 | Me | $CH_2CH_2$ | H | Et | $C(=O)N(Me)_2$ | Me | $CH_2OMe$ | O |
| D-7273 | H | single bond | Me | Et | $CH_2OC(=O)Me$ | Cl | $CH_2OMe$ | O |
| D-7274 | Me | single bond | H | Et | $CH_2OC(=O)Me$ | Cl | $CH_2OMe$ | O |
| D-7275 | Me(R) | single bond | H | Et | $CH_2OC(=O)Me$ | Cl | $CH_2OMe$ | O |
| D-7276 | Me(S) | single bond | H | Et | $CH_2OC(=O)Me$ | Cl | $CH_2OMe$ | O |
| D-7277 | H | $CH_2$ | Me | Et | $CH_2OC(=O)Me$ | Cl | $CH_2OMe$ | O |
| D-7278 | Me | $CH_2$ | H | Et | $CH_2OC(=O)Me$ | Cl | $CH_2OMe$ | O |
| D-7279 | H | CH(Me) | H | Et | $CH_2OC(=O)Me$ | Cl | $CH_2OMe$ | O |
| D-7280 | H | $CH_2CH_2$ | Me | Et | $CH_2OC(=O)Me$ | Cl | $CH_2OMe$ | O |
| D-7281 | Me | $CH_2CH_2$ | H | Et | $CH_2OC(=O)Me$ | Cl | $CH_2OMe$ | O |
| D-7282 | H | single bond | Me | Et | $CH_2OC(=O)Me$ | Me | $CH_2OMe$ | O |
| D-7283 | Me | single bond | H | Et | $CH_2OC(=O)Me$ | Me | $CH_2OMe$ | O |
| D-7284 | Me(R) | single bond | H | Et | $CH_2OC(=O)Me$ | Me | $CH_2OMe$ | O |
| D-7285 | Me(S) | single bond | H | Et | $CH_2OC(=O)Me$ | Me | $CH_2OMe$ | O |
| D-7286 | H | $CH_2$ | Me | Et | $CH_2OC(=O)Me$ | Me | $CH_2OMe$ | O |
| D-7287 | Me | $CH_2$ | H | Et | $CH_2OC(=O)Me$ | Me | $CH_2OMe$ | O |
| D-7288 | H | CH(Me) | H | Et | $CH_2OC(=O)Me$ | Me | $CH_2OMe$ | O |
| D-7289 | H | $CH_2CH_2$ | Me | Et | $CH_2OC(=O)Me$ | Me | $CH_2OMe$ | O |

TABLE 811-continued

| Compound Number | Y | W | Z | $R^1$ | $R^2$ | $R^3$ | $R^{10}$ | A |
|---|---|---|---|---|---|---|---|---|
| D-7290 | Me | $CH_2CH_2$ | H | Et | $CH_2OC(=O)Me$ | Me | $CH_2OMe$ | O |
| D-7291 | H | single bond | Me | Et | $CH_2OC(=O)(i-Pr)$ | Cl | $CH_2OMe$ | O |
| D-7292 | Me | single bond | H | Et | $CH_2OC(=O)(i-Pr)$ | Cl | $CH_2OMe$ | O |
| D-7293 | Me(R) | single bond | H | Et | $CH_2OC(=O)(i-Pr)$ | Cl | $CH_2OMe$ | O |
| D-7294 | Me(S) | single bond | H | Et | $CH_2OC(=O)(i-Pr)$ | Cl | $CH_2OMe$ | O |
| D-7295 | H | $CH_2$ | Me | Et | $CH_2OC(=O)(i-Pr)$ | Cl | $CH_2OMe$ | O |
| D-7296 | Me | $CH_2$ | H | Et | $CH_2OC(=O)(i-Pr)$ | Cl | $CH_2OMe$ | O |
| D-7297 | H | CH(Me) | H | Et | $CH_2OC(=O)(i-Pr)$ | Cl | $CH_2OMe$ | O |
| D-7298 | H | $CH_2CH_2$ | Me | Et | $CH_2OC(=O)(i-Pr)$ | Cl | $CH_2OMe$ | O |
| D-7299 | Me | $CH_2CH_2$ | H | Et | $CH_2OC(=O)(i-Pr)$ | Cl | $CH_2OMe$ | O |
| D-7300 | H | single bond | Me | Et | $CH_2OC(=O)(i-Pr)$ | Me | $CH_2OMe$ | O |
| D-7301 | Me | single bond | H | Et | $CH_2OC(=O)(i-Pr)$ | Me | $CH_2OMe$ | O |
| D-7302 | Me(R) | single bond | H | Et | $CH_2OC(=O)(i-Pr)$ | Me | $CH_2OMe$ | O |
| D-7303 | Me(S) | single bond | H | Et | $CH_2OC(=O)(i-Pr)$ | Me | $CH_2OMe$ | O |
| D-7304 | H | $CH_2$ | Me | Et | $CH_2OC(=O)(i-Pr)$ | Me | $CH_2OMe$ | O |
| D-7305 | Me | $CH_2$ | H | Et | $CH_2OC(=O)(i-Pr)$ | Me | $CH_2OMe$ | O |
| D-7306 | H | CH(Me) | H | Et | $CH_2OC(=O)(i-Pr)$ | Me | $CH_2OMe$ | O |
| D-7307 | H | $CH_2CH_2$ | Me | Et | $CH_2OC(=O)(i-Pr)$ | Me | $CH_2OMe$ | O |
| D-7308 | Me | $CH_2CH_2$ | H | Et | $CH_2OC(=O)(i-Pr)$ | Me | $CH_2OMe$ | O |
| D-7309 | H | single bond | Me | Et | $CH_2OC(=O)(t-Bu)$ | Cl | $CH_2OMe$ | O |
| D-7310 | Me | single bond | H | Et | $CH_2OC(=O)(t-Bu)$ | Cl | $CH_2OMe$ | O |

TABLE 812

| Compound Number | Y | W | Z | $R^1$ | $R^2$ | $R^3$ | $R^{10}$ | A |
|---|---|---|---|---|---|---|---|---|
| D-7311 | Me(R) | single bond | H | Et | $CH_2OC(=O)(t-Bu)$ | Cl | $CH_2OMe$ | O |
| D-7312 | Me(S) | single bond | H | Et | $CH_2OC(=O)(t-Bu)$ | Cl | $CH_2OMe$ | O |
| D-7313 | H | $CH_2$ | Me | Et | $CH_2OC(=O)(t-Bu)$ | Cl | $CH_2OMe$ | O |
| D-7314 | Me | $CH_2$ | H | Et | $CH_2OC(=O)(t-Bu)$ | Cl | $CH_2OMe$ | O |
| D-7315 | H | CH(Me) | H | Et | $CH_2OC(=O)(t-Bu)$ | Cl | $CH_2OMe$ | O |
| D-7316 | H | $CH_2CH_2$ | Me | Et | $CH_2OC(=O)(t-Bu)$ | Cl | $CH_2OMe$ | O |
| D-7317 | Me | $CH_2CH_2$ | H | Et | $CH_2OC(=O)(t-Bu)$ | Cl | $CH_2OMe$ | O |
| D-7318 | H | single bond | Me | Et | $CH_2OC(=O)(t-Bu)$ | Me | $CH_2OMe$ | O |
| D-7319 | Me | single bond | H | Et | $CH_2OC(=O)(t-Bu)$ | Me | $CH_2OMe$ | O |
| D-7320 | Me(R) | single bond | H | Et | $CH_2OC(=O)(t-Bu)$ | Me | $CH_2OMe$ | O |
| D-7321 | Me(S) | single bond | H | Et | $CH_2OC(=O)(t-Bu)$ | Me | $CH_2OMe$ | O |
| D-7322 | H | $CH_2$ | Me | Et | $CH_2OC(=O)(t-Bu)$ | Me | $CH_2OMe$ | O |
| D-7323 | Me | $CH_2$ | H | Et | $CH_2OC(=O)(t-Bu)$ | Me | $CH_2OMe$ | O |
| D-7324 | H | CH(Me) | H | Et | $CH_2OC(=O)(t-Bu)$ | Me | $CH_2OMe$ | O |
| D-7325 | H | $CH_2CH_2$ | Me | Et | $CH_2OC(=O)(t-Bu)$ | Me | $CH_2OMe$ | O |
| D-7326 | Me | $CH_2CH_2$ | H | Et | $CH_2OC(=O)(t-Bu)$ | Me | $CH_2OMe$ | O |
| D-7327 | H | single bond | Me | Et | $CH_2OC(=O)OEt$ | Cl | $CH_2OMe$ | O |
| D-7328 | Me | single bond | H | Et | $CH_2OC(=O)OEt$ | Cl | $CH_2OMe$ | O |
| D-7329 | Me(R) | single bond | H | Et | $CH_2OC(=O)OEt$ | Cl | $CH_2OMe$ | O |
| D-7330 | Me(S) | single bond | H | Et | $CH_2OC(=O)OEt$ | Cl | $CH_2OMe$ | O |
| D-7331 | H | $CH_2$ | Me | Et | $CH_2OC(=O)OEt$ | Cl | $CH_2OMe$ | O |
| D-7332 | Me | $CH_2$ | H | Et | $CH_2OC(=O)OEt$ | Cl | $CH_2OMe$ | O |
| D-7333 | H | CH(Me) | H | Et | $CH_2OC(=O)OEt$ | Cl | $CH_2OMe$ | O |
| D-7334 | H | $CH_2CH_2$ | Me | Et | $CH_2OC(=O)OEt$ | Cl | $CH_2OMe$ | O |
| D-7335 | Me | $CH_2CH_2$ | H | Et | $CH_2OC(=O)OEt$ | Cl | $CH_2OMe$ | O |
| D-7336 | H | single bond | Me | Et | $CH_2OC(=O)OEt$ | Me | $CH_2OMe$ | O |
| D-7337 | Me | single bond | H | Et | $CH_2OC(=O)OEt$ | Me | $CH_2OMe$ | O |
| D-7338 | Me(R) | single bond | H | Et | $CH_2OC(=O)OEt$ | Me | $CH_2OMe$ | O |
| D-7339 | Me(S) | single bond | H | Et | $CH_2OC(=O)OEt$ | Me | $CH_2OMe$ | O |
| D-7340 | H | $CH_2$ | Me | Et | $CH_2OC(=O)OEt$ | Me | $CH_2OMe$ | O |
| D-7341 | Me | $CH_2$ | H | Et | $CH_2OC(=O)OEt$ | Me | $CH_2OMe$ | O |
| D-7342 | H | CH(Me) | H | Et | $CH_2OC(=O)OEt$ | Me | $CH_2OMe$ | O |
| D-7343 | H | $CH_2CH_2$ | Me | Et | $CH_2OC(=O)OEt$ | Me | $CH_2OMe$ | O |
| D-7344 | Me | $CH_2CH_2$ | H | Et | $CH_2OC(=O)OEt$ | Me | $CH_2OMe$ | O |
| D-7345 | H | single bond | Me | Et | $CH_2OC(=O)O(i-Pr)$ | Cl | $CH_2OMe$ | O |
| D-7346 | Me | single bond | H | Et | $CH_2OC(=O)O(i-Pr)$ | Cl | $CH_2OMe$ | O |
| D-7347 | Me(R) | single bond | H | Et | $CH_2OC(=O)O(i-Pr)$ | Cl | $CH_2OMe$ | O |
| D-7348 | Me(S) | single bond | H | Et | $CH_2OC(=O)O(i-Pr)$ | Cl | $CH_2OMe$ | O |
| D-7349 | H | $CH_2$ | Me | Et | $CH_2OC(=O)O(i-Pr)$ | Cl | $CH_2OMe$ | O |
| D-7350 | Me | $CH_2$ | H | Et | $CH_2OC(=O)O(i-Pr)$ | Cl | $CH_2OMe$ | O |
| D-7351 | H | CH(Me) | H | Et | $CH_2OC(=O)O(i-Pr)$ | Cl | $CH_2OMe$ | O |
| D-7352 | H | $CH_2CH_2$ | Me | Et | $CH_2OC(=O)O(i-Pr)$ | Cl | $CH_2OMe$ | O |
| D-7353 | Me | $CH_2CH_2$ | H | Et | $CH_2OC(=O)O(i-Pr)$ | Cl | $CH_2OMe$ | O |
| D-7354 | H | single bond | Me | Et | $CH_2OC(=O)O(i-Pr)$ | Me | $CH_2OMe$ | O |

TABLE 813

| Compound Number | Y | W | Z | $R^1$ | $R^2$ | $R^3$ | $R^{10}$ | A |
|---|---|---|---|---|---|---|---|---|
| D-7355 | Me | single bond | H | Et | $CH_2OC(=O)O(i\text{-}Pr)$ | Me | CH2OMe | O |
| D-7356 | Me(R) | single bond | H | Et | $CH_2OC(=O)O(i\text{-}Pr)$ | Me | $CH_2OMe$ | O |
| D-7357 | Me(S) | single bond | H | Et | $CH_2OC(=O)O(i\text{-}Pr)$ | Me | $CH_2OMe$ | O |
| D-7358 | H | $CH_2$ | Me | Et | $CH_2OC(=O)O(i\text{-}Pr)$ | Me | $CH_2OMe$ | O |
| D-7359 | Me | $CH_2$ | H | Et | $CH_2OC(=O)O(i\text{-}Pr)$ | Me | $CH_2OMe$ | O |
| D-7360 | H | CH(Me) | H | Et | $CH_2OC(=O)O(i\text{-}Pr)$ | Me | $CH_2OMe$ | O |
| D-7361 | H | $CH_2CH_2$ | Me | Et | $CH_2OC(=O)O(i\text{-}Pr)$ | Me | $CH_2OMe$ | O |
| D-7362 | Me | $CH_2CH_2$ | H | Et | $CH_2OC(=O)O(i\text{-}Pr)$ | Me | $CH_2OMe$ | O |
| D-7363 | H | single bond | Me | Et | $CH_2N(Me)C(=O)OMe$ | Cl | $CH_2OMe$ | O |
| D-7364 | Me | single bond | H | Et | $CH_2N(Me)C(=O)OMe$ | Cl | $CH_2OMe$ | O |
| D-7365 | Me(R) | single bond | H | Et | $CH_2N(Me)C(=O)OMe$ | Cl | $CH_2OMe$ | O |
| D-7366 | Me(S) | single bond | H | Et | $CH_2N(Me)C(=O)OMe$ | Cl | $CH_2OMe$ | O |
| D-7367 | H | $CH_2$ | Me | Et | $CH_2N(Me)C(=O)OMe$ | Cl | $CH_2OMe$ | O |
| D-7368 | Me | $CH_2$ | H | Et | $CH_2N(Me)C(=O)OMe$ | Cl | $CH_2OMe$ | O |
| D-7369 | H | CH(Me) | H | Et | $CH_2N(Me)C(=O)OMe$ | Cl | $CH_2OMe$ | O |
| D-7370 | H | $CH_2CH_2$ | Me | Et | $CH_2N(Me)C(=O)OMe$ | Cl | $CH_2OMe$ | O |
| D-7371 | Me | $CH_2CH_2$ | H | Et | $CH_2N(Me)C(=O)OMe$ | Cl | $CH_2OMe$ | O |
| D-7372 | H | single bond | Me | Et | $CH_2N(Me)C(=O)OMe$ | Me | $CH_2OMe$ | O |
| D-7373 | Me | single bond | H | Et | $CH_2N(Me)C(=O)OMe$ | Me | $CH_2OMe$ | O |
| D-7374 | Me(R) | single bond | H | Et | $CH_2N(Me)C(=O)OMe$ | Me | $CH_2OMe$ | O |
| D-7375 | Me(S) | single bond | H | Et | $CH_2N(Me)C(=O)OMe$ | Me | $CH_2OMe$ | O |
| D-7376 | H | $CH_2$ | Me | Et | $CH_2N(Me)C(=O)OMe$ | Me | $CH_2OMe$ | O |
| D-7377 | Me | $CH_2$ | H | Et | $CH_2N(Me)C(=O)OMe$ | Me | $CH_2OMe$ | O |
| D-7378 | H | CH(Me) | H | Et | $CH_2N(Me)C(=O)OMe$ | Me | $CH_2OMe$ | O |
| D-7379 | H | $CH_2CH_2$ | Me | Et | $CH_2N(Me)C(=O)OMe$ | Me | $CH_2OMe$ | O |
| D-7380 | Me | $CH_2CH_2$ | H | Et | $CH_2N(Me)C(=O)OMe$ | Me | $CH_2OMe$ | O |
| D-7381 | H | single bond | Me | Et | $C(=O)OCH_2CH=CH_2$ | Cl | $CH_2CN$ | O |
| D-7382 | Me | single bond | H | Et | $C(=O)OCH_2CH=CH_2$ | Cl | $CH_2CN$ | O |
| D-7383 | Me(R) | single bond | H | Et | $C(=O)OCH_2CH=CH_2$ | Cl | $CH_2CN$ | O |
| D-7384 | Me(S) | single bond | H | Et | $C(=O)OCH_2CH=CH_2$ | Cl | $CH_2CN$ | O |
| D-7385 | H | $CH_2$ | Me | Et | $C(=O)OCH_2CH=CH_2$ | Cl | $CH_2CN$ | O |
| D-7386 | Me | $CH_2$ | H | Et | $C(=O)OCH_2CH=CH_2$ | Cl | $CH_2CN$ | O |
| D-7387 | H | CH(Me) | H | Et | $C(=O)OCH_2CH=CH_2$ | Cl | $CH_2CN$ | O |
| D-7388 | H | $CH_2CH_2$ | Me | Et | $C(=O)OCH_2CH=CH_2$ | Cl | $CH_2CN$ | O |
| D-7389 | Me | $CH_2CH_2$ | H | Et | $C(=O)OCH_2CH=CH_2$ | Cl | $CH_2CN$ | O |
| D-7390 | H | single bond | Me | Et | $C(=O)OCH_2CH=CH_2$ | Me | $CH_2CN$ | O |
| D-7391 | Me | single bond | H | Et | $C(=O)OCH_2CH=CH_2$ | Me | $CH_2CN$ | O |
| D-7392 | Me(R) | single bond | H | Et | $C(=O)OCH_2CH=CH_2$ | Me | $CH_2CN$ | O |
| D-7393 | Me(S) | single bond | H | Et | $C(=O)OCH_2CH=CH_2$ | Me | $CH_2CN$ | O |
| D-7394 | H | $CH_2$ | Me | Et | $C(=O)OCH_2CH=CH_2$ | Me | $CH_2CN$ | O |
| D-7395 | Me | $CH_2$ | H | Et | $C(=O)OCH_2CH=CH_2$ | Me | $CH_2CN$ | O |
| D-7396 | H | CH(Me) | H | Et | $C(=O)OCH_2CH=CH_2$ | Me | $CH_2CN$ | O |
| D-7397 | H | $CH_2CH_2$ | Me | Et | $C(=O)OCH_2CH=CH_2$ | Me | $CH_2CN$ | O |
| D-7398 | Me | $CH_2CH_2$ | H | Et | $C(=O)OCH_2CH=CH_2$ | Me | $CH_2CN$ | O |

TABLE 814

| Compound Number | Y | W | Z | $R^1$ | $R^2$ | $R^3$ | $R^{10}$ | A |
|---|---|---|---|---|---|---|---|---|
| D-7399 | H | single bond | Me | Et | $C(=O)OCH_2CCl_3$ | Cl | $CH_2CN$ | O |
| D-7400 | Me | single bond | H | Et | $C(=O)OCH_2CCl_3$ | Cl | $CH_2CN$ | O |
| D-7401 | Me(R) | single bond | H | Et | $C(=O)OCH_2CCl_3$ | Cl | $CH_2CN$ | O |
| D-7402 | Me(S) | single bond | H | Et | $C(=O)OCH_2CCl_3$ | Cl | $CH_2CN$ | O |
| D-7403 | H | $CH_2$ | Me | Et | $C(=O)OCH_2CCl_3$ | Cl | $CH_2CN$ | O |
| D-7404 | Me | $CH_2$ | H | Et | $C(=O)OCH_2CCl_3$ | Cl | $CH_2CN$ | O |
| D-7405 | H | CH(Me) | H | Et | $C(=O)OCH_2CCl_3$ | Cl | $CH_2CN$ | O |
| D-7406 | H | $CH_2CH_2$ | Me | Et | $C(=O)OCH_2CCl_3$ | Cl | $CH_2CN$ | O |
| D-7407 | Me | $CH_2CH_2$ | H | Et | $C(=O)OCH_2CCl_3$ | Cl | $CH_2CN$ | O |
| D-7408 | H | single bond | Me | Et | $C(=O)OCH_2CCl_3$ | Me | $CH_2CN$ | O |
| D-7409 | Me | single bond | H | Et | $C(=O)OCH_2CCl_3$ | Me | $CH_2CN$ | O |
| D-7410 | Me(R) | single bond | H | Et | $C(=O)OCH_2CCl_3$ | Me | $CH_2CN$ | O |
| D-7411 | Me(S) | single bond | H | Et | $C(=O)OCH_2CCl_3$ | Me | $CH_2CN$ | O |
| D-7412 | H | $CH_2$ | Me | Et | $C(=O)OCH_2CCl_3$ | Me | $CH_2CN$ | O |
| D-7413 | Me | $CH_2$ | H | Et | $C(=O)OCH_2CCl_3$ | Me | $CH_2CN$ | O |
| D-7414 | H | CH(Me) | H | Et | $C(=O)OCH_2CCl_3$ | Me | $CH_2CN$ | O |
| D-7415 | H | $CH_2CH_2$ | Me | Et | $C(=O)OCH_2CCl_3$ | Me | $CH_2CN$ | O |
| D-7416 | Me | $CH_2CH_2$ | H | Et | $C(=O)OCH_2CCl_3$ | Me | $CH_2CN$ | O |
| D-7417 | H | single bond | Me | Et | $C(=O)N(Me)_2$ | Cl | $CH_2CN$ | O |
| D-7418 | Me | single bond | H | Et | $C(=O)N(Me)_2$ | Cl | $CH_2CN$ | O |
| D-7419 | Me(R) | single bond | H | Et | $C(=O)N(Me)_2$ | Cl | $CH_2CN$ | O |

TABLE 814-continued

| Compound Number | Y | W | Z | $R^1$ | $R^2$ | $R^3$ | $R^{10}$ | A |
|---|---|---|---|---|---|---|---|---|
| D-7420 | Me(S) | single bond | H | Et | C(=O)N(Me)$_2$ | Cl | $CH_2CN$ | O |
| D-7421 | H | $CH_2$ | Me | Et | C(=O)N(Me)$_2$ | Cl | $CH_2CN$ | O |
| D-7422 | Me | $CH_2$ | H | Et | C(=O)N(Me)$_2$ | Cl | $CH_2CN$ | O |
| D-7423 | H | CH(Me) | H | Et | C(=O)N(Me)$_2$ | Cl | $CH_2CN$ | O |
| D-7424 | H | $CH_2CH_2$ | Me | Et | C(=O)N(Me)$_2$ | Cl | $CH_2CN$ | O |
| D-7425 | Me | $CH_2CH_2$ | H | Et | C(=O)N(Me)$_2$ | Cl | $CH_2CN$ | O |
| D-7426 | H | single bond | Me | Et | C(=O)N(Me)$_2$ | Me | $CH_2CN$ | O |
| D-7427 | Me | single bond | H | Et | C(=O)N(Me)$_2$ | Me | $CH_2CN$ | O |
| D-7428 | Me(R) | single bond | H | Et | C(=O)N(Me)$_2$ | Me | $CH_2CN$ | O |
| D-7429 | Me(S) | single bond | H | Et | C(=O)N(Me)$_2$ | Me | $CH_2CN$ | O |
| D-7430 | H | $CH_2$ | Me | Et | C(=O)N(Me)$_2$ | Me | $CH_2CN$ | O |
| D-7431 | Me | $CH_2$ | H | Et | C(=O)N(Me)$_2$ | Me | $CH_2CN$ | O |
| D-7432 | H | CH(Me) | H | Et | C(=O)N(Me)$_2$ | Me | $CH_2CN$ | O |
| D-7433 | H | $CH_2CH_2$ | Me | Et | C(=O)N(Me)$_2$ | Me | $CH_2CN$ | O |
| D-7434 | Me | $CH_2CH_2$ | H | Et | C(=O)N(Me)$_2$ | Me | $CH_2CN$ | O |
| D-7435 | H | single bond | Me | Et | $CH_2$OC(=O)Me | Cl | $CH_2CN$ | O |
| D-7436 | Me | single bond | H | Et | $CH_2$OC(=O)Me | Cl | $CH_2CN$ | O |
| D-7437 | Me(R) | single bond | H | Et | $CH_2$OC(=O)Me | Cl | $CH_2CN$ | O |
| D-7438 | Me(S) | single bond | H | Et | $CH_2$OC(=O)Me | Cl | $CH_2CN$ | O |
| D-7439 | H | $CH_2$ | Me | Et | $CH_2$OC(=O)Me | Cl | $CH_2CN$ | O |
| D-7440 | Me | $CH_2$ | H | Et | $CH_2$OC(=O)Me | Cl | $CH_2CN$ | O |
| D-7441 | H | CH(Me) | H | Et | $CH_2$OC(=O)Me | Cl | $CH_2CN$ | O |
| D-7442 | H | $CH_2CH_2$ | Me | Et | $CH_2$OC(=O)Me | Cl | $CH_2CN$ | O |

TABLE 815

| Compound Number | Y | W | Z | $R^1$ | $R^2$ | $R^3$ | $R^{10}$ | A |
|---|---|---|---|---|---|---|---|---|
| D-7443 | Me | $CH_2CH_2$ | H | Et | $CH_2$OC(=O)Me | Cl | $CH_2CN$ | O |
| D-7444 | H | single bond | Me | Et | $CH_2$OC(=O)Me | Me | $CH_2CN$ | O |
| D-7445 | Me | single bond | H | Et | $CH_2$OC(=O)Me | Me | $CH_2CN$ | O |
| D-7446 | Me(R) | single bond | H | Et | $CH_2$OC(=O)Me | Me | $CH_2CN$ | O |
| D-7447 | Me(S) | single bond | H | Et | $CH_2$OC(=O)Me | Me | $CH_2CN$ | O |
| D-7448 | H | $CH_2$ | Me | Et | $CH_2$OC(=O)Me | Me | $CH_2CN$ | O |
| D-7449 | Me | $CH_2$ | H | Et | $CH_2$OC(=O)Me | Me | $CH_2CN$ | O |
| D-7450 | H | CH(Me) | H | Et | $CH_2$OC(=O)Me | Me | $CH_2CN$ | O |
| D-7451 | H | $CH_2CH_2$ | Me | Et | $CH_2$OC(=O)Me | Me | $CH_2CN$ | O |
| D-7452 | Me | $CH_2CH_2$ | H | Et | $CH_2$OC(=O)Me | Me | $CH_2CN$ | O |
| D-7453 | H | single bond | Me | Et | $CH_2$OC(=O)(i-Pr) | Cl | $CH_2CN$ | O |
| D-7454 | Me | single bond | H | Et | $CH_2$OC(=O)(i-Pr) | Cl | $CH_2CN$ | O |
| D-7455 | Me(R) | single bond | H | Et | $CH_2$OC(=O)(i-Pr) | Cl | $CH_2CN$ | O |
| D-7456 | Me(S) | single bond | H | Et | $CH_2$OC(=O)(i-Pr) | Cl | $CH_2CN$ | O |
| D-7457 | H | $CH_2$ | Me | Et | $CH_2$OC(=O)(i-Pr) | Cl | $CH_2CN$ | O |
| D-7458 | Me | $CH_2$ | H | Et | $CH_2$OC(=O)(i-Pr) | Cl | $CH_2CN$ | O |
| D-7459 | H | CH(Me) | H | Et | $CH_2$OC(=O)(i-Pr) | Cl | $CH_2CN$ | O |
| D-7460 | H | $CH_2CH_2$ | Me | Et | $CH_2$OC(=O)(i-Pr) | Cl | $CH_2CN$ | O |
| D-7461 | Me | $CH_2CH_2$ | H | Et | $CH_2$OC(=O)(i-Pr) | Cl | $CH_2CN$ | O |
| D-7462 | H | single bond | Me | Et | $CH_2$OC(=O)(i-Pr) | Me | $CH_2CN$ | O |
| D-7463 | Me | single bond | H | Et | $CH_2$OC(=O)(i-Pr) | Me | $CH_2CN$ | O |
| D-7464 | Me(R) | single bond | H | Et | $CH_2$OC(=O)(i-Pr) | Me | $CH_2CN$ | O |
| D-7465 | Me(S) | single bond | H | Et | $CH_2$OC(=O)(i-Pr) | Me | $CH_2CN$ | O |
| D-7466 | H | $CH_2$ | Me | Et | $CH_2$OC(=O)(i-Pr) | Me | $CH_2CN$ | O |
| D-7467 | Me | $CH_2$ | H | Et | $CH_2$OC(=O)(i-Pr) | Me | $CH_2CN$ | O |
| D-7468 | H | CH(Me) | H | Et | $CH_2$OC(=O)(i-Pr) | Me | $CH_2CN$ | O |
| D-7469 | H | $CH_2CH_2$ | Me | Et | $CH_2$OC(=O)(i-Pr) | Me | $CH_2CN$ | O |
| D-7470 | Me | $CH_2CH_2$ | H | Et | $CH_2$OC(=O)(i-Pr) | Me | $CH_2CN$ | O |
| D-7471 | H | single bond | Me | Et | $CH_2$OC(=O)(t-Bu) | Cl | $CH_2CN$ | O |
| D-7472 | Me | single bond | H | Et | $CH_2$OC(=O)(t-Bu) | Cl | $CH_2CN$ | O |
| D-7473 | Me(R) | single bond | H | Et | $CH_2$OC(=O)(t-Bu) | Cl | $CH_2CN$ | O |
| D-7474 | Me(S) | single bond | H | Et | $CH_2$OC(=O)(t-Bu) | Cl | $CH_2CN$ | O |
| D-7475 | H | $CH_2$ | Me | Et | $CH_2$OC(=O)(t-Bu) | Cl | $CH_2CN$ | O |
| D-7476 | Me | $CH_2$ | H | Et | $CH_2$OC(=O)(t-Bu) | Cl | $CH_2CN$ | O |
| D-7477 | H | CH(Me) | H | Et | $CH_2$OC(=O)(t-Bu) | Cl | $CH_2CN$ | O |
| D-7478 | H | $CH_2CH_2$ | Me | Et | $CH_2$OC(=O)(t-Bu) | Cl | $CH_2CN$ | O |
| D-7479 | Me | $CH_2CH_2$ | H | Et | $CH_2$OC(=O)(t-Bu) | Cl | $CH_2CN$ | O |
| D-7480 | H | single bond | Me | Et | $CH_2$OC(=O)(t-Bu) | Me | $CH_2CN$ | O |
| D-7481 | Me | single bond | H | Et | $CH_2$OC(=O)(t-Bu) | Me | $CH_2CN$ | O |
| D-7482 | Me(R) | single bond | H | Et | $CH_2$OC(=O)(t-Bu) | Me | $CH_2CN$ | O |
| D-7483 | Me(S) | single bond | H | Et | $CH_2$OC(=O)(t-Bu) | Me | $CH_2CN$ | O |
| D-7484 | H | $CH_2$ | Me | Et | $CH_2$OC(=O)(t-Bu) | Me | $CH_2CN$ | O |

TABLE 815-continued

| Compound Number | Y | W | Z | $R^1$ | $R^2$ | $R^3$ | $R^{10}$ | A |
|---|---|---|---|---|---|---|---|---|
| D-7485 | Me | $CH_2$ | H | Et | $CH_2OC(=O)(t\text{-}Bu)$ | Me | $CH_2CN$ | O |
| D-7486 | H | CH(Me) | H | Et | $CH_2OC(=O)(t\text{-}Bu)$ | Me | $CH_2CN$ | O |

TABLE 816

| Compound Number | Y | W | Z | $R^1$ | $R^2$ | $R^3$ | $R^{10}$ | A |
|---|---|---|---|---|---|---|---|---|
| D-7487 | H | $CH_2CH_2$ | Me | Et | $CH_2OC(=O)(t\text{-}Bu)$ | Me | $CH_2CN$ | O |
| D-7488 | Me | $CH_2CH_2$ | H | Et | $CH_2OC(=O)(t\text{-}Bu)$ | Me | $CH_2CN$ | O |
| D-7489 | H | single bond | Me | Et | $CH_2OC(=O)OEt$ | Cl | $CH_2CN$ | O |
| D-7490 | Me | single bond | H | Et | $CH_2OC(=O)OEt$ | Cl | $CH_2CN$ | O |
| D-7491 | Me(R) | single bond | H | Et | $CH_2OC(=O)OEt$ | Cl | $CH_2CN$ | O |
| D-7492 | Me(S) | single bond | H | Et | $CH_2OC(=O)OEt$ | Cl | $CH_2CN$ | O |
| D-7493 | H | $CH_2$ | Me | Et | $CH_2OC(=O)OEt$ | Cl | $CH_2CN$ | O |
| D-7494 | Me | $CH_2$ | H | Et | $CH_2OC(=O)OEt$ | Cl | $CH_2CN$ | O |
| D-7495 | H | CH(Me) | H | Et | $CH_2OC(=O)OEt$ | Cl | $CH_2CN$ | O |
| D-7496 | H | $CH_2CH_2$ | Me | Et | $CH_2OC(=O)OEt$ | Cl | $CH_2CN$ | O |
| D-7497 | Me | $CH_2CH_2$ | H | Et | $CH_2OC(=O)OEt$ | Cl | $CH_2CN$ | O |
| D-7498 | H | single bond | Me | Et | $CH_2OC(=O)OEt$ | Me | $CH_2CN$ | O |
| D-7499 | Me | single bond | H | Et | $CH_2OC(=O)OEt$ | Me | $CH_2CN$ | O |
| D-7500 | Me(R) | single bond | H | Et | $CH_2OC(=O)OEt$ | Me | $CH_2CN$ | O |
| D-7501 | Me(S) | single bond | H | Et | $CH_2OC(=O)OEt$ | Me | $CH_2CN$ | O |
| D-7502 | H | $CH_2$ | Me | Et | $CH_2OC(=O)OEt$ | Me | $CH_2CN$ | O |
| D-7503 | Me | $CH_2$ | H | Et | $CH_2OC(=O)OEt$ | Me | $CH_2CN$ | O |
| D-7504 | H | CH(Me) | H | Et | $CH_2OC(=O)OEt$ | Me | $CH_2CN$ | O |
| D-7505 | H | $CH_2CH_2$ | Me | Et | $CH_2OC(=O)OEt$ | Me | $CH_2CN$ | O |
| D-7506 | Me | $CH_2CH_2$ | H | Et | $CH_2OC(=O)OEt$ | Me | $CH_2CN$ | O |
| D-7507 | H | single bond | Me | Et | $CH_2OC(=O)O(i\text{-}Pr)$ | Cl | $CH_2CN$ | O |
| D-7508 | Me | single bond | H | Et | $CH_2OC(=O)O(i\text{-}Pr)$ | Cl | $CH_2CN$ | O |
| D-7509 | Me(R) | single bond | H | Et | $CH_2OC(=O)O(i\text{-}Pr)$ | Cl | $CH_2CN$ | O |
| D-7510 | Me(S) | single bond | H | Et | $CH_2OC(=O)O(i\text{-}Pr)$ | Cl | $CH_2CN$ | O |
| D-7511 | H | $CH_2$ | Me | Et | $CH_2OC(=O)O(i\text{-}Pr)$ | Cl | $CH_2CN$ | O |
| D-7512 | Me | $CH_2$ | H | Et | $CH_2OC(=O)O(i\text{-}Pr)$ | Cl | $CH_2CN$ | O |
| D-7513 | H | CH(Me) | H | Et | $CH_2OC(=O)O(i\text{-}Pr)$ | Cl | $CH_2CN$ | O |
| D-7514 | H | $CH_2CH_2$ | Me | Et | $CH_2OC(=O)O(i\text{-}Pr)$ | Cl | $CH_2CN$ | O |
| D-7515 | Me | $CH_2CH_2$ | H | Et | $CH_2OC(=O)O(i\text{-}Pr)$ | Cl | $CH_2CN$ | O |
| D-7516 | H | single bond | Me | Et | $CH_2OC(=O)O(i\text{-}Pr)$ | Me | $CH_2CN$ | O |
| D-7517 | Me | single bond | H | Et | $CH_2OC(=O)O(i\text{-}Pr)$ | Me | $CH_2CN$ | O |
| D-7518 | Me(R) | single bond | H | Et | $CH_2OC(=O)O(i\text{-}Pr)$ | Me | $CH_2CN$ | O |
| D-7519 | Me(S) | single bond | H | Et | $CH_2OC(=O)O(i\text{-}Pr)$ | Me | $CH_2CN$ | O |
| D-7520 | H | $CH_2$ | Me | Et | $CH_2OC(=O)O(i\text{-}Pr)$ | Me | $CH_2CN$ | O |
| D-7521 | Me | $CH_2$ | H | Et | $CH_2OC(=O)O(i\text{-}Pr)$ | Me | $CH_2CN$ | O |
| D-7522 | H | CH(Me) | H | Et | $CH_2OC(=O)O(i\text{-}Pr)$ | Me | $CH_2CN$ | O |
| D-7523 | H | $CH_2CH_2$ | Me | Et | $CH_2OC(=O)O(i\text{-}Pr)$ | Me | $CH_2CN$ | O |
| D-7524 | Me | $CH_2CH_2$ | H | Et | $CH_2OC(=O)O(i\text{-}Pr)$ | Me | $CH_2CN$ | O |
| D-7525 | H | single bond | Me | Et | $CH_2N(Me)C(=O)OMe$ | Cl | $CH_2CN$ | O |
| D-7526 | Me | single bond | H | Et | $CH_2N(Me)C(=O)OMe$ | Cl | $CH_2CN$ | O |
| D-7527 | Me(R) | single bond | H | Et | $CH_2N(Me)C(=O)OMe$ | Cl | $CH_2CN$ | O |
| D-7528 | Me(S) | single bond | H | Et | $CH_2N(Me)C(=O)OMe$ | Cl | $CH_2CN$ | O |
| D-7529 | H | $CH_2$ | Me | Et | $CH_2N(Me)C(=O)OMe$ | Cl | $CH_2CN$ | O |
| D-7530 | Me | $CH_2$ | H | Et | $CH_2N(Me)C(=O)OMe$ | Cl | $CH_2CN$ | O |

TABLE 817

| Compound Number | Y | W | Z | $R^1$ | $R^2$ | $R^3$ | $R^{10}$ | A |
|---|---|---|---|---|---|---|---|---|
| D-7531 | H | CH(Me) | H | Et | $CH_2N(Me)C(=O)OMe$ | Cl | $CH_2CN$ | O |
| D-7532 | H | $CH_2CH_2$ | Me | Et | $CH_2N(Me)C(=O)OMe$ | Cl | $CH_2CN$ | O |
| D-7533 | Me | $CH_2CH_2$ | H | Et | $CH_2N(Me)C(=O)OMe$ | Cl | $CH_2CN$ | O |
| D-7534 | H | single bond | Me | Et | $CH_2N(Me)C(=O)OMe$ | Me | $CH_2CN$ | O |
| D-7535 | Me | single bond | H | Et | $CH_2N(Me)C(=O)OMe$ | Me | $CH_2CN$ | O |
| D-7536 | Me(R) | single bond | H | Et | $CH_2N(Me)C(=O)OMe$ | Me | $CH_2CN$ | O |
| D-7537 | Me(S) | single bond | H | Et | $CH_2N(Me)C(=O)OMe$ | Me | $CH_2CN$ | O |
| D-7538 | H | $CH_2$ | Me | Et | $CH_2N(Me)C(=O)OMe$ | Me | $CH_2CN$ | O |
| D-7539 | Me | $CH_2$ | H | Et | $CH_2N(Me)C(=O)OMe$ | Me | $CH_2CN$ | O |
| D-7540 | H | CH(Me) | H | Et | $CH_2N(Me)C(=O)OMe$ | Me | $CH_2CN$ | O |
| D-7541 | H | $CH_2CH_2$ | Me | Et | $CH_2N(Me)C(=O)OMe$ | Me | $CH_2CN$ | O |
| D-7542 | Me | $CH_2CH_2$ | H | Et | $CH_2N(Me)C(=O)OMe$ | Me | $CH_2CN$ | O |

TABLE 817-continued

| Compound Number | Y | W | Z | $R^1$ | $R^2$ | $R^3$ | $R^{10}$ | A |
|---|---|---|---|---|---|---|---|---|
| D-7543 | H | single bond | Me | Et | $C(=O)OCH_2CH=CH_2$ | Cl | C(=O)Me | O |
| D-7544 | Me | single bond | H | Et | $C(=O)OCH_2CH=CH_2$ | Cl | C(=O)Me | O |
| D-7545 | Me(R) | single bond | H | Et | $C(=O)OCH_2CH=CH_2$ | Cl | C(=O)Me | O |
| D-7546 | Me(S) | single bond | H | Et | $C(=O)OCH_2CH=CH_2$ | Cl | C(=O)Me | O |
| D-7547 | H | $CH_2$ | Me | Et | $C(=O)OCH_2CH=CH_2$ | Cl | C(=O)Me | O |
| D-7548 | Me | $CH_2$ | H | Et | $C(=O)OCH_2CH=CH_2$ | Cl | C(=O)Me | O |
| D-7549 | H | CH(Me) | H | Et | $C(=O)OCH_2CH=CH_2$ | Cl | C(=O)Me | O |
| D-7550 | H | $CH_2CH_2$ | Me | Et | $C(=O)OCH_2CH=CH_2$ | Cl | C(=O)Me | O |
| D-7551 | Me | $CH_2CH_2$ | H | Et | $C(=O)OCH_2CH=CH_2$ | Cl | C(=O)Me | O |
| D-7552 | H | single bond | Me | Et | $C(=O)OCH_2CH=CH_2$ | Me | C(=O)Me | O |
| D-7553 | Me | single bond | H | Et | $C(=O)OCH_2CH=CH_2$ | Me | C(=O)Me | O |
| D-7554 | Me(R) | single bond | H | Et | $C(=O)OCH_2CH=CH_2$ | Me | C(=O)Me | O |
| D-7555 | Me(S) | single bond | H | Et | $C(=O)OCH_2CH=CH_2$ | Me | C(=O)Me | O |
| D-7556 | H | $CH_2$ | Me | Et | $C(=O)OCH_2CH=CH_2$ | Me | C(=O)Me | O |
| D-7557 | Me | $CH_2$ | H | Et | $C(=O)OCH_2CH=CH_2$ | Me | C(=O)Me | O |
| D-7558 | H | CH(Me) | H | Et | $C(=O)OCH_2CH=CH_2$ | Me | C(=O)Me | O |
| D-7559 | H | $CH_2CH_2$ | Me | Et | $C(=O)OCH_2CH=CH_2$ | Me | C(=O)Me | O |
| D-7560 | Me | $CH_2CH_2$ | H | Et | $C(=O)OCH_2CH=CH_2$ | Me | C(=O)Me | O |
| D-7561 | H | single bond | Me | Et | $C(=O)OCH_2CCl_3$ | Cl | C(=O)Me | O |
| D-7562 | Me | single bond | H | Et | $C(=O)OCH_2CCl_3$ | Cl | C(=O)Me | O |
| D-7563 | Me(R) | single bond | H | Et | $C(=O)OCH_2CCl_3$ | Cl | C(=O)Me | O |
| D-7564 | Me(S) | single bond | H | Et | $C(=O)OCH_2CCl_3$ | Cl | C(=O)Me | O |
| D-7565 | H | $CH_2$ | Me | Et | $C(=O)OCH_2CCl_3$ | Cl | C(=O)Me | O |
| D-7566 | Me | $CH_2$ | H | Et | $C(=O)OCH_2CCl_3$ | Cl | C(=O)Me | O |
| D-7567 | H | CH(Me) | H | Et | $C(=O)OCH_2CCl_3$ | Cl | C(=O)Me | O |
| D-7568 | H | $CH_2CH_2$ | Me | Et | $C(=O)OCH_2CCl_3$ | Cl | C(=O)Me | O |
| D-7569 | Me | $CH_2CH_2$ | H | Et | $C(=O)OCH_2CCl_3$ | Cl | C(=O)Me | O |
| D-7570 | H | single bond | Me | Et | $C(=O)OCH_2CCl_3$ | Me | C(=O)Me | O |
| D-7571 | Me | single bond | H | Et | $C(=O)OCH_2CCl_3$ | Me | C(=O)Me | O |
| D-7572 | Me(R) | single bond | H | Et | $C(=O)OCH_2CCl_3$ | Me | C(=O)Me | O |
| D-7573 | Me(S) | single bond | H | Et | $C(=O)OCH_2CCl_3$ | Me | C(=O)Me | O |
| D-7574 | H | $CH_2$ | Me | Et | $C(=O)OCH_2CCl_3$ | Me | C(=O)Me | O |

TABLE 818

| Compound Number | Y | W | Z | $R^1$ | $R^2$ | $R^3$ | $R^{10}$ | A |
|---|---|---|---|---|---|---|---|---|
| D-7575 | Me | $CH_2$ | H | Et | $C(=O)OCH_2CCl_3$ | Me | C(=O)Me | O |
| D-7576 | H | CH(Me) | H | Et | $C(=O)OCH_2CCl_3$ | Me | C(=O)Me | O |
| D-7577 | H | $CH_2CH_2$ | Me | Et | $C(=O)OCH_2CCl_3$ | Me | C(=O)Me | O |
| D-7578 | Me | $CH_2CH_2$ | H | Et | $C(=O)OCH_2CCl_3$ | Me | C(=O)Me | O |
| D-7579 | H | single bond | Me | Et | $C(=O)N(Me)_2$ | Cl | C(=O)Me | O |
| D-7580 | Me | single bond | H | Et | $C(=O)N(Me)_2$ | Cl | C(=O)Me | O |
| D-7581 | Me(R) | single bond | H | Et | $C(=O)N(Me)_2$ | Cl | C(=O)Me | O |
| D-7582 | Me(S) | single bond | H | Et | $C(=O)N(Me)_2$ | Cl | C(=O)Me | O |
| D-7583 | H | $CH_2$ | Me | Et | $C(=O)N(Me)_2$ | Cl | C(=O)Me | O |
| D-7584 | Me | $CH_2$ | H | Et | $C(=O)N(Me)_2$ | Cl | C(=O)Me | O |
| D-7585 | H | CH(Me) | H | Et | $C(=O)N(Me)_2$ | Cl | C(=O)Me | O |
| D-7586 | H | $CH_2CH_2$ | Me | Et | $C(=O)N(Me)_2$ | Cl | C(=O)Me | O |
| D-7587 | Me | $CH_2CH_2$ | H | Et | $C(=O)N(Me)_2$ | Cl | C(=O)Me | O |
| D-7588 | H | single bond | Me | Et | $C(=O)N(Me)_2$ | Me | C(=O)Me | O |
| D-7589 | Me | single bond | H | Et | $C(=O)N(Me)_2$ | Me | C(=O)Me | O |
| D-7590 | Me(R) | single bond | H | Et | $C(=O)N(Me)_2$ | Me | C(=O)Me | O |
| D-7591 | Me(S) | single bond | H | Et | $C(=O)N(Me)_2$ | Me | C(=O)Me | O |
| D-7592 | H | $CH_2$ | Me | Et | $C(=O)N(Me)_2$ | Me | C(=O)Me | O |
| D-7593 | Me | $CH_2$ | H | Et | $C(=O)N(Me)_2$ | Me | C(=O)Me | O |
| D-7594 | H | CH(Me) | H | Et | $C(=O)N(Me)_2$ | Me | C(=O)Me | O |
| D-7595 | H | $CH_2CH_2$ | Me | Et | $C(=O)N(Me)_2$ | Me | C(=O)Me | O |
| D-7596 | Me | $CH_2CH_2$ | H | Et | $C(=O)N(Me)_2$ | Me | C(=O)Me | O |
| D-7597 | H | single bond | Me | Et | $CH_2OC(=O)Me$ | Cl | C(=O)Me | O |
| D-7598 | Me | single bond | H | Et | $CH_2OC(=O)Me$ | Cl | C(=O)Me | O |
| D-7599 | Me(R) | single bond | H | Et | $CH_2OC(=O)Me$ | Cl | C(=O)Me | O |
| D-7600 | Me(S) | single bond | H | Et | $CH_2OC(=O)Me$ | Cl | C(=O)Me | O |
| D-7601 | H | $CH_2$ | Me | Et | $CH_2OC(=O)Me$ | Cl | C(=O)Me | O |
| D-7602 | Me | $CH_2$ | H | Et | $CH_2OC(=O)Me$ | Cl | C(=O)Me | O |
| D-7603 | H | CH(Me) | H | Et | $CH_2OC(=O)Me$ | Cl | C(=O)Me | O |
| D-7604 | H | $CH_2CH_2$ | Me | Et | $CH_2OC(=O)Me$ | Cl | C(=O)Me | O |
| D-7605 | Me | $CH_2CH_2$ | H | Et | $CH_2OC(=O)Me$ | Cl | C(=O)Me | O |
| D-7606 | H | single bond | Me | Et | $CH_2OC(=O)Me$ | Me | C(=O)Me | O |
| D-7607 | Me | single bond | H | Et | $CH_2OC(=O)Me$ | Me | C(=O)Me | O |
| D-7608 | Me(R) | single bond | H | Et | $CH_2OC(=O)Me$ | Me | C(=O)Me | O |
| D-7609 | Me(S) | single bond | H | Et | $CH_2OC(=O)Me$ | Me | C(=O)Me | O |

TABLE 818-continued

| Compound Number | Y | W | Z | $R^1$ | $R^2$ | $R^3$ | $R^{10}$ | A |
|---|---|---|---|---|---|---|---|---|
| D-7610 | H | $CH_2$ | Me | Et | $CH_2OC(=O)Me$ | Me | C(=O)Me | O |
| D-7611 | Me | $CH_2$ | H | Et | $CH_2OC(=O)Me$ | Me | C(=O)Me | O |
| D-7612 | H | CH(Me) | H | Et | $CH_2OC(=O)Me$ | Me | C(=O)Me | O |
| D-7613 | H | $CH_2CH_2$ | Me | Et | $CH_2OC(=O)Me$ | Me | C(=O)Me | O |
| D-7614 | Me | $CH_2CH_2$ | H | Et | $CH_2OC(=O)Me$ | Me | C(=O)Me | O |
| D-7615 | H | single bond | Me | Et | $CH_2OC(=O)(i-Pr)$ | Cl | C(=O)Me | O |
| D-7616 | Me | single bond | H | Et | $CH_2OC(=O)(i-Pr)$ | Cl | C(=O)Me | O |
| D-7617 | Me(R) | single bond | H | Et | $CH_2OC(=O)(i-Pr)$ | Cl | C(=O)Me | O |
| D-7618 | Me(S) | single bond | H | Et | $CH_2OC(=O)(i-Pr)$ | Cl | C(=O)Me | O |

TABLE 819

| Compound Number | Y | W | Z | $R^1$ | $R^2$ | $R^3$ | $R^{10}$ | A |
|---|---|---|---|---|---|---|---|---|
| D-7619 | H | $CH_2$ | Me | Et | $CH_2OC(=O)(i-Pr)$ | Cl | C(=O)Me | O |
| D-7620 | Me | $CH_2$ | H | Et | $CH_2OC(=O)(i-Pr)$ | Cl | C(=O)Me | O |
| D-7621 | H | CH(Me) | H | Et | $CH_2OC(=O)(i-Pr)$ | Cl | C(=O)Me | O |
| D-7622 | H | $CH_2CH_2$ | Me | Et | $CH_2OC(=O)(i-Pr)$ | Cl | C(=O)Me | O |
| D-7623 | Me | $CH_2CH_2$ | H | Et | $CH_2OC(=O)(i-Pr)$ | Cl | C(=O)Me | O |
| D-7624 | H | single bond | Me | Et | $CH_2OC(=O)(i-Pr)$ | Me | C(=O)Me | O |
| D-7625 | Me | single bond | H | Et | $CH_2OC(=O)(i-Pr)$ | Me | C(=O)Me | O |
| D-7626 | Me(R) | single bond | H | Et | $CH_2OC(=O)(i-Pr)$ | Me | C(=O)Me | O |
| D-7627 | Me(S) | single bond | H | Et | $CH_2OC(=O)(i-Pr)$ | Me | C(=O)Me | O |
| D-7628 | H | $CH_2$ | Me | Et | $CH_2OC(=O)(i-Pr)$ | Me | C(=O)Me | O |
| D-7629 | Me | $CH_2$ | H | Et | $CH_2OC(=O)(i-Pr)$ | Me | C(=O)Me | O |
| D-7630 | H | CH(Me) | H | Et | $CH_2OC(=O)(i-Pr)$ | Me | C(=O)Me | O |
| D-7631 | H | $CH_2CH_2$ | Me | Et | $CH_2OC(=O)(i-Pr)$ | Me | C(=O)Me | O |
| D-7632 | Me | $CH_2CH_2$ | H | Et | $CH_2OC(=O)(i-Pr)$ | Me | C(=O)Me | O |
| D-7633 | H | single bond | Me | Et | $CH_2OC(=O)(t-Bu)$ | Cl | C(=O)Me | O |
| D-7634 | Me | single bond | H | Et | $CH_2OC(=O)(t-Bu)$ | Cl | C(=O)Me | O |
| D-7635 | Me(R) | single bond | H | Et | $CH_2OC(=O)(t-Bu)$ | Cl | C(=O)Me | O |
| D-7636 | Me(S) | single bond | H | Et | $CH_2OC(=O)(t-Bu)$ | Cl | C(=O)Me | O |
| D-7637 | H | $CH_2$ | Me | Et | $CH_2OC(=O)(t-Bu)$ | Cl | C(=O)Me | O |
| D-7638 | Me | $CH_2$ | H | Et | $CH_2OC(=O)(t-Bu)$ | Cl | C(=O)Me | O |
| D-7639 | H | CH(Me) | H | Et | $CH_2OC(=O)(t-Bu)$ | Cl | C(=O)Me | O |
| D-7640 | H | $CH_2CH_2$ | Me | Et | $CH_2OC(=O)(t-Bu)$ | Cl | C(=O)Me | O |
| D-7641 | Me | $CH_2CH_2$ | H | Et | $CH_2OC(=O)(t-Bu)$ | Cl | C(=O)Me | O |
| D-7642 | H | single bond | Me | Et | $CH_2OC(=O)(t-Bu)$ | Me | C(=O)Me | O |
| D-7643 | Me | single bond | H | Et | $CH_2OC(=O)(t-Bu)$ | Me | C(=O)Me | O |
| D-7644 | Me(R) | single bond | H | Et | $CH_2OC(=O)(t-Bu)$ | Me | C(=O)Me | O |
| D-7645 | Me(S) | single bond | H | Et | $CH_2OC(=O)(t-Bu)$ | Me | C(=O)Me | O |
| D-7646 | H | $CH_2$ | Me | Et | $CH_2OC(=O)(t-Bu)$ | Me | C(=O)Me | O |
| D-7647 | Me | $CH_2$ | H | Et | $CH_2OC(=O)(t-Bu)$ | Me | C(=O)Me | O |
| D-7648 | H | CH(Me) | H | Et | $CH_2OC(=O)(t-Bu)$ | Me | C(=O)Me | O |
| D-7649 | H | $CH_2CH_2$ | Me | Et | $CH_2OC(=O)(t-Bu)$ | Me | C(=O)Me | O |
| D-7650 | Me | $CH_2CH_2$ | H | Et | $CH_2OC(=O)(t-Bu)$ | Me | C(=O)Me | O |
| D-7651 | H | single bond | Me | Et | $CH_2OC(=O)OEt$ | Cl | C(=O)Me | O |
| D-7652 | Me | single bond | H | Et | $CH_2OC(=O)OEt$ | Cl | C(=O)Me | O |
| D-7653 | Me(R) | single bond | H | Et | $CH_2OC(=O)OEt$ | Cl | C(=O)Me | O |
| D-7654 | Me(S) | single bond | H | Et | $CH_2OC(=O)OEt$ | Cl | C(=O)Me | O |
| D-7655 | H | $CH_2$ | Me | Et | $CH_2OC(=O)OEt$ | Cl | C(=O)Me | O |
| D-7656 | Me | $CH_2$ | H | Et | $CH_2OC(=O)OEt$ | Cl | C(=O)Me | O |
| D-7657 | H | CH(Me) | H | Et | $CH_2OC(=O)OEt$ | Cl | C(=O)Me | O |
| D-7658 | H | $CH_2CH_2$ | Me | Et | $CH_2OC(=O)OEt$ | Cl | C(=O)Me | O |
| D-7659 | Me | $CH_2CH_2$ | H | Et | $CH_2OC(=O)OEt$ | Cl | C(=O)Me | O |
| D-7660 | H | single bond | Me | Et | $CH_2OC(=O)OEt$ | Me | C(=O)Me | O |
| D-7661 | Me | single bond | H | Et | $CH_2OC(=O)OEt$ | Me | C(=O)Me | O |
| D-7662 | Me(R) | single bond | H | Et | $CH_2OC(=O)OEt$ | Me | C(=O)Me | O |

TABLE 820

| Compound Number | Y | W | Z | $R^1$ | $R^2$ | $R^3$ | $R^{10}$ | A |
|---|---|---|---|---|---|---|---|---|
| D-7663 | Me(S) | single bond | H | Et | $CH_2OC(=O)OEt$ | Me | C(=O)Me | O |
| D-7664 | H | $CH_2$ | Me | Et | $CH_2OC(=O)OEt$ | Me | C(=O)Me | O |
| D-7665 | Me | $CH_2$ | H | Et | $CH_2OC(=O)OEt$ | Me | C(=O)Me | O |

TABLE 820-continued

| Compound Number | Y | W | Z | $R^1$ | $R^2$ | $R^3$ | $R^{10}$ | A |
|---|---|---|---|---|---|---|---|---|
| D-7666 | H | CH(Me) | H | Et | $CH_2OC(=O)OEt$ | Me | C(=O)Me | O |
| D-7667 | H | $CH_2CH_2$ | Me | Et | $CH_2OC(=O)OEt$ | Me | C(=O)Me | O |
| D-7668 | Me | $CH_2CH_2$ | H | Et | $CH_2OC(=O)OEt$ | Me | C(=O)Me | O |
| D-7669 | H | single bond | Me | Et | $CH_2OC(=O)O(i-Pr)$ | Cl | C(=O)Me | O |
| D-7670 | Me | single bond | H | Et | $CH_2OC(=O)O(i-Pr)$ | Cl | C(=O)Me | O |
| D-7671 | Me(R) | single bond | H | Et | $CH_2OC(=O)O(i-Pr)$ | Cl | C(=O)Me | O |
| D-7672 | Me(S) | single bond | H | Et | $CH_2OC(=O)O(i-Pr)$ | Cl | C(=O)Me | O |
| D-7673 | H | $CH_2$ | Me | Et | $CH_2OC(=O)O(i-Pr)$ | Cl | C(=O)Me | O |
| D-7674 | Me | $CH_2$ | H | Et | $CH_2OC(=O)O(i-Pr)$ | Cl | C(=O)Me | O |
| D-7675 | H | CH(Me) | H | Et | $CH_2OC(=O)O(i-Pr)$ | Cl | C(=O)Me | O |
| D-7676 | H | $CH_2CH_2$ | Me | Et | $CH_2OC(=O)O(i-Pr)$ | Cl | C(=O)Me | O |
| D-7677 | Me | $CH_2CH_2$ | H | Et | $CH_2OC(=O)O(i-Pr)$ | Cl | C(=O)Me | O |
| D-7678 | H | single bond | Me | Et | $CH_2OC(=O)O(i-Pr)$ | Me | C(=O)Me | O |
| D-7679 | Me | single bond | H | Et | $CH_2OC(=O)O(i-Pr)$ | Me | C(=O)Me | O |
| D-7680 | Me(R) | single bond | H | Et | $CH_2OC(=O)O(i-Pr)$ | Me | C(=O)Me | O |
| D-7681 | Me(S) | single bond | H | Et | $CH_2OC(=O)O(i-Pr)$ | Me | C(=O)Me | O |
| D-7682 | H | $CH_2$ | Me | Et | $CH_2OC(=O)O(i-Pr)$ | Me | C(=O)Me | O |
| D-7683 | Me | $CH_2$ | H | Et | $CH_2OC(=O)O(i-Pr)$ | Me | C(=O)Me | O |
| D-7684 | H | CH(Me) | H | Et | $CH_2OC(=O)O(i-Pr)$ | Me | C(=O)Me | O |
| D-7685 | H | $CH_2CH_2$ | Me | Et | $CH_2OC(=O)O(i-Pr)$ | Me | C(=O)Me | O |
| D-7686 | Me | $CH_2CH_2$ | H | Et | $CH_2OC(=O)O(i-Pr)$ | Me | C(=O)Me | O |
| D-7687 | H | single bond | Me | Et | $CH_2N(Me)C(=O)OMe$ | Cl | C(=O)Me | O |
| D-7688 | Me | single bond | H | Et | $CH_2N(Me)C(=O)OMe$ | Cl | C(=O)Me | O |
| D-7689 | Me(R) | single bond | H | Et | $CH_2N(Me)C(=O)OMe$ | Cl | C(=O)Me | O |
| D-7690 | Me(S) | single bond | H | Et | $CH_2N(Me)C(=O)OMe$ | Cl | C(=O)Me | O |
| D-7691 | H | $CH_2$ | Me | Et | $CH_2N(Me)C(=O)OMe$ | Cl | C(=O)Me | O |
| D-7692 | Me | $CH_2$ | H | Et | $CH_2N(Me)C(=O)OMe$ | Cl | C(=O)Me | O |
| D-7693 | H | CH(Me) | H | Et | $CH_2N(Me)C(=O)OMe$ | Cl | C(=O)Me | O |
| D-7694 | H | $CH_2CH_2$ | Me | Et | $CH_2N(Me)C(=O)OMe$ | Cl | C(=O)Me | O |
| D-7695 | Me | $CH_2CH_2$ | H | Et | $CH_2N(Me)C(=O)OMe$ | Cl | C(=O)Me | O |
| D-7696 | H | single bond | Me | Et | $CH_2N(Me)C(=O)OMe$ | Me | C(=O)Me | O |
| D-7697 | Me | single bond | H | Et | $CH_2N(Me)C(=O)OMe$ | Me | C(=O)Me | O |
| D-7698 | Me(R) | single bond | H | Et | $CH_2N(Me)C(=O)OMe$ | Me | C(=O)Me | O |
| D-7699 | Me(S) | single bond | H | Et | $CH_2N(Me)C(=O)OMe$ | Me | C(=O)Me | O |
| D-7700 | H | $CH_2$ | Me | Et | $CH_2N(Me)C(=O)OMe$ | Me | C(=O)Me | O |
| D-7701 | Me | $CH_2$ | H | Et | $CH_2N(Me)C(=O)OMe$ | Me | C(=O)Me | O |
| D-7702 | H | CH(Me) | H | Et | $CH_2N(Me)C(=O)OMe$ | Me | C(=O)Me | O |
| D-7703 | H | $CH_2CH_2$ | Me | Et | $CH_2N(Me)C(=O)OMe$ | Me | C(=O)Me | O |
| D-7704 | Me | $CH_2CH_2$ | H | Et | $CH_2N(Me)C(=O)OMe$ | Me | C(=O)Me | O |
| D-7705 | H | single bond | Me | c-Pr | $C(=O)OCH_2CH=CH_2$ | Cl | H | O |
| D-7706 | Me | single bond | H | c-Pr | $C(=O)OCH_2CH=CH_2$ | Cl | H | O |

TABLE 821

| Compound Number | Y | W | Z | $R^1$ | $R^2$ | $R^3$ | $R^{10}$ | A |
|---|---|---|---|---|---|---|---|---|
| D-7707 | Me(R) | single bond | H | c-Pr | $C(=O)OCH_2CH=CH_2$ | Cl | H | O |
| D-7708 | Me(S) | single bond | H | c-Pr | $C(=O)OCH_2CH=CH_2$ | Cl | H | O |
| D-7709 | H | $CH_2$ | Me | c-Pr | $C(=O)OCH_2CH=CH_2$ | Cl | H | O |
| D-7710 | Me | $CH_2$ | H | c-Pr | $C(=O)OCH_2CH=CH_2$ | Cl | H | O |
| D-7711 | H | CH(Me) | H | c-Pr | $C(=O)OCH_2CH=CH_2$ | Cl | H | O |
| D-7712 | H | $CH_2CH_2$ | Me | c-Pr | $C(=O)OCH_2CH=CH_2$ | Cl | H | O |
| D-7713 | Me | $CH_2CH_2$ | H | c-Pr | $C(=O)OCH_2CH=CH_2$ | Cl | H | O |
| D-7714 | H | single bond | Me | c-Pr | $C(=O)OCH_2CH=CH_2$ | Me | H | O |
| D-7715 | Me | single bond | H | c-Pr | $C(=O)OCH_2CH=CH_2$ | Me | H | O |
| D-7716 | Me(R) | single bond | H | c-Pr | $C(=O)OCH_2CH=CH_2$ | Me | H | O |
| D-7717 | Me(S) | single bond | H | c-Pr | $C(=O)OCH_2CH=CH_2$ | Me | H | O |
| D-7718 | H | $CH_2$ | Me | c-Pr | $C(=O)OCH_2CH=CH_2$ | Me | H | O |
| D-7719 | Me | $CH_2$ | H | c-Pr | $C(=O)OCH_2CH=CH_2$ | Me | H | O |
| D-7720 | H | CH(Me) | H | c-Pr | $C(=O)OCH_2CH=CH_2$ | Me | H | O |
| D-7721 | H | $CH_2CH_2$ | Me | c-Pr | $C(=O)OCH_2CH=CH_2$ | Me | H | O |
| D-7722 | Me | $CH_2CH_2$ | H | c-Pr | $C(=O)OCH_2CH=CH_2$ | Me | H | O |
| D-7723 | H | single bond | Me | c-Pr | $C(=O)OCH_2CCl_3$ | Cl | H | O |
| D-7724 | Me | single bond | H | c-Pr | $C(=O)OCH_2CCl_3$ | Cl | H | O |
| D-7725 | Me(R) | single bond | H | c-Pr | $C(=O)OCH_2CCl_3$ | Cl | H | O |
| D-7726 | Me(S) | single bond | H | c-Pr | $C(=O)OCH_2CCl_3$ | Cl | H | O |
| D-7727 | H | $CH_2$ | Me | c-Pr | $C(=O)OCH_2CCl_3$ | Cl | H | O |
| D-7728 | Me | $CH_2$ | H | c-Pr | $C(=O)OCH_2CCl_3$ | Cl | H | O |
| D-7729 | H | CH(Me) | H | c-Pr | $C(=O)OCH_2CCl_3$ | Cl | H | O |
| D-7730 | H | $CH_2CH_2$ | Me | c-Pr | $C(=O)OCH_2CCl_3$ | Cl | H | O |
| D-7731 | Me | $CH_2CH_2$ | H | c-Pr | $C(=O)OCH_2CCl_3$ | Cl | H | O |
| D-7732 | H | single bond | Me | c-Pr | $C(=O)OCH_2CCl_3$ | Me | H | O |

TABLE 821-continued

| Compound Number | Y | W | Z | $R^1$ | $R^2$ | $R^3$ | $R^{10}$ | A |
|---|---|---|---|---|---|---|---|---|
| D-7733 | Me | single bond | H | c-Pr | $C(=O)OCH_2CCl_3$ | Me | H | O |
| D-7734 | Me(R) | single bond | H | c-Pr | $C(=O)OCH_2CCl_3$ | Me | H | O |
| D-7735 | Me(S) | single bond | H | c-Pr | $C(=O)OCH_2CCl_3$ | Me | H | O |
| D-7736 | H | $CH_2$ | Me | c-Pr | $C(=O)OCH_2CCl_3$ | Me | H | O |
| D-7737 | Me | $CH_2$ | H | c-Pr | $C(=O)OCH_2CCl_3$ | Me | H | O |
| D-7738 | H | CH(Me) | H | c-Pr | $C(=O)OCH_2CCl_3$ | Me | H | O |
| D-7739 | H | $CH_2CH_2$ | Me | c-Pr | $C(=O)OCH_2CCl_3$ | Me | H | O |
| D-7740 | Me | $CH_2CH_2$ | H | c-Pr | $C(=O)OCH_2CCl_3$ | Me | H | O |
| D-7741 | H | single bond | Me | c-Pr | $C(=O)N(Me)_2$ | Cl | H | O |
| D-7742 | Me | single bond | H | c-Pr | $C(=O)N(Me)_2$ | Cl | H | O |
| D-7743 | Me(R) | single bond | H | c-Pr | $C(=O)N(Me)_2$ | Cl | H | O |
| D-7744 | Me(S) | single bond | H | c-Pr | $C(=O)N(Me)_2$ | Cl | H | O |
| D-7745 | H | $CH_2$ | Me | c-Pr | $C(=O)N(Me)_2$ | Cl | H | O |
| D-7746 | Me | $CH_2$ | H | c-Pr | $C(=O)N(Me)_2$ | Cl | H | O |
| D-7747 | H | CH(Me) | H | c-Pr | $C(=O)N(Me)_2$ | Cl | H | O |
| D-7748 | H | $CH_2CH_2$ | Me | c-Pr | $C(=O)N(Me)_2$ | Cl | H | O |
| D-7749 | Me | $CH_2CH_2$ | H | c-Pr | $C(=O)N(Me)_2$ | Cl | H | O |
| D-7750 | H | single bond | Me | c-Pr | $C(=O)N(Me)_2$ | Me | H | O |

TABLE 822

| Compound Number | Y | W | Z | $R^1$ | $R^2$ | $R^3$ | $R^{10}$ | A |
|---|---|---|---|---|---|---|---|---|
| D-7751 | Me | single bond | H | c-Pr | $C(=O)N(Me)_2$ | Me | H | O |
| D-7752 | Me(R) | single bond | H | c-Pr | $C(=O)N(Me)_2$ | Me | H | O |
| D-7753 | Me(S) | single bond | H | c-Pr | $C(=O)N(Me)_2$ | Me | H | O |
| D-7754 | H | $CH_2$ | Me | c-Pr | $C(=O)N(Me)_2$ | Me | H | O |
| D-7755 | Me | $CH_2$ | H | c-Pr | $C(=O)N(Me)_2$ | Me | H | O |
| D-7756 | H | CH(Me) | H | c-Pr | $C(=O)N(Me)_2$ | Me | H | O |
| D-7757 | H | $CH_2CH_2$ | Me | c-Pr | $C(=O)N(Me)_2$ | Me | H | O |
| D-7758 | Me | $CH_2CH_2$ | H | c-Pr | $C(=O)N(Me)_2$ | Me | H | O |
| D-7759 | H | single bond | Me | c-Pr | $CH_2OC(=O)Me$ | Cl | H | O |
| D-7760 | Me | single bond | H | c-Pr | $CH_2OC(=O)Me$ | Cl | H | O |
| D-7761 | Me(R) | single bond | H | c-Pr | $CH_2OC(=O)Me$ | Cl | H | O |
| D-7762 | Me(S) | single bond | H | c-Pr | $CH_2OC(=O)Me$ | Cl | H | O |
| D-7763 | H | $CH_2$ | Me | c-Pr | $CH_2OC(=O)Me$ | Cl | H | O |
| D-7764 | Me | $CH_2$ | H | c-Pr | $CH_2OC(=O)Me$ | Cl | H | O |
| D-7765 | H | CH(Me) | H | c-Pr | $CH_2OC(=O)Me$ | Cl | H | O |
| D-7766 | H | $CH_2CH_2$ | Me | c-Pr | $CH_2OC(=O)Me$ | Cl | H | O |
| D-7767 | Me | $CH_2CH_2$ | H | c-Pr | $CH_2OC(=O)Me$ | Cl | H | O |
| D-7768 | H | single bond | Me | c-Pr | $CH_2OC(=O)Me$ | Me | H | O |
| D-7769 | Me | single bond | H | c-Pr | $CH_2OC(=O)Me$ | Me | H | O |
| D-7770 | Me(R) | single bond | H | c-Pr | $CH_2OC(=O)Me$ | Me | H | O |
| D-7771 | Me(S) | single bond | H | c-Pr | $CH_2OC(=O)Me$ | Me | H | O |
| D-7772 | H | $CH_2$ | Me | c-Pr | $CH_2OC(=O)Me$ | Me | H | O |
| D-7773 | Me | $CH_2$ | H | c-Pr | $CH_2OC(=O)Me$ | Me | H | O |
| D-7774 | H | CH(Me) | H | c-Pr | $CH_2OC(=O)Me$ | Me | H | O |
| D-7775 | H | $CH_2CH_2$ | Me | c-Pr | $CH_2OC(=O)Me$ | Me | H | O |
| D-7776 | Me | $CH_2CH_2$ | H | c-Pr | $CH_2OC(=O)Me$ | Me | H | O |
| D-7777 | H | single bond | Me | c-Pr | $CH_2OC(=O)(i\text{-}Pr)$ | Cl | H | O |
| D-7778 | Me | single bond | H | c-Pr | $CH_2OC(=O)(i\text{-}Pr)$ | Cl | H | O |
| D-7779 | Me(R) | single bond | H | c-Pr | $CH_2OC(=O)(i\text{-}Pr)$ | Cl | H | O |
| D-7780 | Me(S) | single bond | H | c-Pr | $CH_2OC(=O)(i\text{-}Pr)$ | Cl | H | O |
| D-7781 | H | $CH_2$ | Me | c-Pr | $CH_2OC(=O)(i\text{-}Pr)$ | Cl | H | O |
| D-7782 | Me | $CH_2$ | H | c-Pr | $CH_2OC(=O)(i\text{-}Pr)$ | Cl | H | O |
| D-7783 | H | CH(Me) | H | c-Pr | $CH_2OC(=O)(i\text{-}Pr)$ | Cl | H | O |
| D-7784 | H | $CH_2CH_2$ | Me | c-Pr | $CH_2OC(=O)(i\text{-}Pr)$ | Cl | H | O |
| D-7785 | Me | $CH_2CH_2$ | H | c-Pr | $CH_2OC(=O)(i\text{-}Pr)$ | Cl | H | O |
| D-7786 | H | single bond | Me | c-Pr | $CH_2OC(=O)(i\text{-}Pr)$ | Me | H | O |
| D-7787 | Me | single bond | H | c-Pr | $CH_2OC(=O)(i\text{-}Pr)$ | Me | H | O |
| D-7788 | Me(R) | single bond | H | c-Pr | $CH_2OC(=O)(i\text{-}Pr)$ | Me | H | O |
| D-7789 | Me(S) | single bond | H | c-Pr | $CH_2OC(=O)(i\text{-}Pr)$ | Me | H | O |
| D-7790 | H | $CH_2$ | Me | c-Pr | $CH_2OC(=O)(i\text{-}Pr)$ | Me | H | O |
| D-7791 | Me | $CH_2$ | H | c-Pr | $CH_2OC(=O)(i\text{-}Pr)$ | Me | H | O |
| D-7792 | H | CH(Me) | H | c-Pr | $CH_2OC(=O)(i\text{-}Pr)$ | Me | H | O |
| D-7793 | H | $CH_2CH_2$ | Me | c-Pr | $CH_2OC(=O)(i\text{-}Pr)$ | Me | H | O |
| D-7794 | Me | $CH_2CH_2$ | H | c-Pr | $CH_2OC(=O)(i\text{-}Pr)$ | Me | H | O |

TABLE 823

| Compound Number | Y | W | Z | $R^1$ | $R^2$ | $R^3$ | $R^{10}$ | A |
|---|---|---|---|---|---|---|---|---|
| D-7795 | H | single bond | Me | c-Pr | $CH_2OC(=O)(t\text{-}Bu)$ | Cl | H | O |
| D-7796 | Me | single bond | H | c-Pr | $CH_2OC(=O)(t\text{-}Bu)$ | Cl | H | O |
| D-7797 | Me(R) | single bond | H | c-Pr | $CH_2OC(=O)(t\text{-}Bu)$ | Cl | H | O |
| D-7798 | Me(S) | single bond | H | c-Pr | $CH_2OC(=O)(t\text{-}Bu)$ | Cl | H | O |
| D-7799 | H | $CH_2$ | Me | c-Pr | $CH_2OC(=O)(t\text{-}Bu)$ | Cl | H | O |
| D-7800 | Me | $CH_2$ | H | c-Pr | $CH_2OC(=O)(t\text{-}Bu)$ | Cl | H | O |
| D-7801 | H | CH(Me) | H | c-Pr | $CH_2OC(=O)(t\text{-}Bu)$ | Cl | H | O |
| D-7802 | H | $CH_2CH_2$ | Me | c-Pr | $CH_2OC(=O)(t\text{-}Bu)$ | Cl | H | O |
| D-7803 | Me | $CH_2CH_2$ | H | c-Pr | $CH_2OC(=O)(t\text{-}Bu)$ | Cl | H | O |
| D-7804 | H | single bond | Me | c-Pr | $CH_2OC(=O)(t\text{-}Bu)$ | Me | H | O |
| D-7805 | Me | single bond | H | c-Pr | $CH_2OC(=O)(t\text{-}Bu)$ | Me | H | O |
| D-7806 | Me(R) | single bond | H | c-Pr | $CH_2OC(=O)(t\text{-}Bu)$ | Me | H | O |
| D-7807 | Me(S) | single bond | H | c-Pr | $CH_2OC(=O)(t\text{-}Bu)$ | Me | H | O |
| D-7808 | H | $CH_2$ | Me | c-Pr | $CH_2OC(=O)(t\text{-}Bu)$ | Me | H | O |
| D-7809 | Me | $CH_2$ | H | c-Pr | $CH_2OC(=O)(t\text{-}Bu)$ | Me | H | O |
| D-7810 | H | CH(Me) | H | c-Pr | $CH_2OC(=O)(t\text{-}Bu)$ | Me | H | O |
| D-7811 | H | $CH_2CH_2$ | Me | c-Pr | $CH_2OC(=O)(t\text{-}Bu)$ | Me | H | O |
| D-7812 | Me | $CH_2CH_2$ | H | c-Pr | $CH_2OC(=O)(t\text{-}Bu)$ | Me | H | O |
| D-7813 | H | single bond | Me | c-Pr | $CH_2OC(=O)OEt$ | Cl | H | O |
| D-7814 | Me | single bond | H | c-Pr | $CH_2OC(=O)OEt$ | Cl | H | O |
| D-7815 | Me(R) | single bond | H | c-Pr | $CH_2OC(=O)OEt$ | Cl | H | O |
| D-7816 | Me(S) | single bond | H | c-Pr | $CH_2OC(=O)OEt$ | Cl | H | O |
| D-7817 | H | $CH_2$ | Me | c-Pr | $CH_2OC(=O)OEt$ | Cl | H | O |
| D-7818 | Me | $CH_2$ | H | c-Pr | $CH_2OC(=O)OEt$ | Cl | H | O |
| D-7819 | H | CH(Me) | H | c-Pr | $CH_2OC(=O)OEt$ | Cl | H | O |
| D-7820 | H | $CH_2CH_2$ | Me | c-Pr | $CH_2OC(=O)OEt$ | Cl | H | O |
| D-7821 | Me | $CH_2CH_2$ | H | c-Pr | $CH_2OC(=O)OEt$ | Cl | H | O |
| D-7822 | H | single bond | Me | c-Pr | $CH_2OC(=O)OEt$ | Me | H | O |
| D-7823 | Me | single bond | H | c-Pr | $CH_2OC(=O)OEt$ | Me | H | O |
| D-7824 | Me(R) | single bond | H | c-Pr | $CH_2OC(=O)OEt$ | Me | H | O |
| D-7825 | Me(S) | single bond | H | c-Pr | $CH_2OC(=O)OEt$ | Me | H | O |
| D-7826 | H | $CH_2$ | Me | c-Pr | $CH_2OC(=O)OEt$ | Me | H | O |
| D-7827 | Me | $CH_2$ | H | c-Pr | $CH_2OC(=O)OEt$ | Me | H | O |
| D-7828 | H | CH(Me) | H | c-Pr | $CH_2OC(=O)OEt$ | Me | H | O |
| D-7829 | H | $CH_2CH_2$ | Me | c-Pr | $CH_2OC(=O)OEt$ | Me | H | O |
| D-7830 | Me | $CH_2CH_2$ | H | c-Pr | $CH_2OC(=O)OEt$ | Me | H | O |
| D-7831 | H | single bond | Me | c-Pr | $CH_2OC(=O)O(i\text{-}Pr)$ | Cl | H | O |
| D-7832 | Me | single bond | H | c-Pr | $CH_2OC(=O)O(i\text{-}Pr)$ | Cl | H | O |
| D-7833 | Me(R) | single bond | H | c-Pr | $CH_2OC(=O)O(i\text{-}Pr)$ | Cl | H | O |
| D-7834 | Me(S) | single bond | H | c-Pr | $CH_2OC(=O)O(i\text{-}Pr)$ | Cl | H | O |
| D-7835 | H | $CH_2$ | Me | c-Pr | $CH_2OC(=O)O(i\text{-}Pr)$ | Cl | H | O |
| D-7836 | Me | $CH_2$ | H | c-Pr | $CH_2OC(=O)O(i\text{-}Pr)$ | Cl | H | O |
| D-7837 | H | CH(Me) | H | c-Pr | $CH_2OC(=O)O(i\text{-}Pr)$ | Cl | H | O |
| D-7838 | H | $CH_2CH_2$ | Me | c-Pr | $CH_2OC(=O)O(i\text{-}Pr)$ | Cl | H | O |

TABLE 824

| Compound Number | Y | W | Z | $R^1$ | $R^2$ | $R^3$ | $R^{10}$ | A |
|---|---|---|---|---|---|---|---|---|
| D-7839 | Me | $CH_2CH_2$ | H | c-Pr | $CH_2OC(=O)O(i\text{-}Pr)$ | Cl | H | O |
| D-7840 | H | single bond | Me | c-Pr | $CH_2OC(=O)O(i\text{-}Pr)$ | Me | H | O |
| D-7841 | Me | single bond | H | c-Pr | $CH_2OC(=O)O(i\text{-}Pr)$ | Me | H | O |
| D-7842 | Me(R) | single bond | H | c-Pr | $CH_2OC(=O)O(i\text{-}Pr)$ | Me | H | O |
| D-7843 | Me(S) | single bond | H | c-Pr | $CH_2OC(=O)O(i\text{-}Pr)$ | Me | H | O |
| D-7844 | H | $CH_2$ | Me | c-Pr | $CH_2OC(=O)O(i\text{-}Pr)$ | Me | H | O |
| D-7845 | Me | $CH_2$ | H | c-Pr | $CH_2OC(=O)O(i\text{-}Pr)$ | Me | H | O |
| D-7846 | H | CH(Me) | H | c-Pr | $CH_2OC(=O)O(i\text{-}Pr)$ | Me | H | O |
| D-7847 | H | $CH_2CH_2$ | Me | c-Pr | $CH_2OC(=O)O(i\text{-}Pr)$ | Me | H | O |
| D-7848 | Me | $CH_2CH_2$ | H | c-Pr | $CH_2OC(=O)O(i\text{-}Pr)$ | Me | H | O |
| D-7849 | H | single bond | Me | c-Pr | $CH_2N(Me)C(=O)OMe$ | Cl | H | O |
| D-7850 | Me | single bond | H | c-Pr | $CH_2N(Me)C(=O)OMe$ | Cl | H | O |
| D-7851 | Me(R) | single bond | H | c-Pr | $CH_2N(Me)C(=O)OMe$ | Cl | H | O |
| D-7852 | Me(S) | single bond | H | c-Pr | $CH_2N(Me)C(=O)OMe$ | Cl | H | O |
| D-7853 | H | $CH_2$ | Me | c-Pr | $CH_2N(Me)C(=O)OMe$ | Cl | H | O |
| D-7854 | Me | $CH_2$ | H | c-Pr | $CH_2N(Me)C(=O)OMe$ | Cl | H | O |
| D-7855 | H | CH(Me) | H | c-Pr | $CH_2N(Me)C(=O)OMe$ | Cl | H | O |
| D-7856 | H | $CH_2CH_2$ | Me | c-Pr | $CH_2N(Me)C(=O)OMe$ | Cl | H | O |
| D-7857 | Me | $CH_2CH_2$ | H | c-Pr | $CH_2N(Me)C(=O)OMe$ | Cl | H | O |
| D-7858 | H | single bond | Me | c-Pr | $CH_2N(Me)C(=O)OMe$ | Me | H | O |
| D-7859 | Me | single bond | H | c-Pr | $CH_2N(Me)C(=O)OMe$ | Me | H | O |
| D-7860 | Me(R) | single bond | H | c-Pr | $CH_2N(Me)C(=O)OMe$ | Me | H | O |
| D-7861 | Me(S) | single bond | H | c-Pr | $CH_2N(Me)C(=O)OMe$ | Me | H | O |

TABLE 824-continued

| Compound Number | Y | W | Z | $R^1$ | $R^2$ | $R^3$ | $R^{10}$ | A |
|---|---|---|---|---|---|---|---|---|
| D-7862 | H | $CH_2$ | Me | c-Pr | $CH_2N(Me)C({=}O)OMe$ | Me | H | O |
| D-7863 | Me | $CH_2$ | H | c-Pr | $CH_2N(Me)C({=}O)OMe$ | Me | H | O |
| D-7864 | H | CH(Me) | H | c-Pr | $CH_2N(Me)C({=}O)OMe$ | Me | H | O |
| D-7865 | H | $CH_2CH_2$ | Me | c-Pr | $CH_2N(Me)C({=}O)OMe$ | Me | H | O |
| D-7866 | Me | $CH_2CH_2$ | H | c-Pr | $CH_2N(Me)C({=}O)OMe$ | Me | H | O |
| D-7867 | H | single bond | Me | c-Pr | $C({=}O)OCH_2CH{=}CH_2$ | Cl | Me | O |
| D-7868 | Me | single bond | H | c-Pr | $C({=}O)OCH_2CH{=}CH_2$ | Cl | Me | O |
| D-7869 | Me(R) | single bond | H | c-Pr | $C({=}O)OCH_2CH{=}CH_2$ | Cl | Me | O |
| D-7870 | Me(S) | single bond | H | c-Pr | $C({=}O)OCH_2CH{=}CH_2$ | Cl | Me | O |
| D-7871 | H | $CH_2$ | Me | c-Pr | $C({=}O)OCH_2CH{=}CH_2$ | Cl | Me | O |
| D-7872 | Me | $CH_2$ | H | c-Pr | $C({=}O)OCH_2CH{=}CH_2$ | Cl | Me | O |
| D-7873 | H | CH(Me) | H | c-Pr | $C({=}O)OCH_2CH{=}CH_2$ | Cl | Me | O |
| D-7874 | H | $CH_2CH_2$ | Me | c-Pr | $C({=}O)OCH_2CH{=}CH_2$ | Cl | Me | O |
| D-7875 | Me | $CH_2CH_2$ | H | c-Pr | $C({=}O)OCH_2CH{=}CH_2$ | Cl | Me | O |
| D-7876 | H | single bond | Me | c-Pr | $C({=}O)OCH_2CH{=}CH_2$ | Me | Me | O |
| D-7877 | Me | single bond | H | c-Pr | $C({=}O)OCH_2CH{=}CH_2$ | Me | Me | O |
| D-7878 | Me(R) | single bond | H | c-Pr | $C({=}O)OCH_2CH{=}CH_2$ | Me | Me | O |
| D-7879 | Me(S) | single bond | H | c-Pr | $C({=}O)OCH_2CH{=}CH_2$ | Me | Me | O |
| D-7880 | H | $CH_2$ | Me | c-Pr | $C({=}O)OCH_2CH{=}CH_2$ | Me | Me | O |
| D-7881 | Me | $CH_2$ | H | c-Pr | $C({=}O)OCH_2CH{=}CH_2$ | Me | Me | O |
| D-7882 | H | CH(Me) | H | c-Pr | $C({=}O)OCH_2CH{=}CH_2$ | Me | Me | O |

TABLE 825

| Compound Number | Y | W | Z | $R^1$ | $R^2$ | $R^3$ | $R^{10}$ | A |
|---|---|---|---|---|---|---|---|---|
| D-7883 | H | $CH_2CH_2$ | Me | c-Pr | $C({=}O)OCH_2CH{=}CH_2$ | Me | Me | O |
| D-7884 | Me | $CH_2CH_2$ | H | c-Pr | $C({=}O)OCH_2CH{=}CH_2$ | Me | Me | O |
| D-7885 | H | single bond | Me | c-Pr | $C({=}O)OCH_2CCl_3$ | Cl | Me | O |
| D-7886 | Me | single bond | H | c-Pr | $C({=}O)OCH_2CCl_3$ | Cl | Me | O |
| D-7887 | Me(R) | single bond | H | c-Pr | $C({=}O)OCH_2CCl_3$ | Cl | Me | O |
| D-7888 | Me(S) | single bond | H | c-Pr | $C({=}O)OCH_2CCl_3$ | Cl | Me | O |
| D-7889 | H | $CH_2$ | Me | c-Pr | $C({=}O)OCH_2CCl_3$ | Cl | Me | O |
| D-7890 | Me | $CH_2$ | H | c-Pr | $C({=}O)OCH_2CCl_3$ | Cl | Me | O |
| D-7891 | H | CH(Me) | H | c-Pr | $C({=}O)OCH_2CCl_3$ | Cl | Me | O |
| D-7892 | H | $CH_2CH_2$ | Me | c-Pr | $C({=}O)OCH_2CCl_3$ | Cl | Me | O |
| D-7893 | Me | $CH_2CH_2$ | H | c-Pr | $C({=}O)OCH_2CCl_3$ | Cl | Me | O |
| D-7894 | H | single bond | Me | c-Pr | $C({=}O)OCH_2CCl_3$ | Me | Me | O |
| D-7895 | Me | single bond | H | c-Pr | $C({=}O)OCH_2CCl_3$ | Me | Me | O |
| D-7896 | Me(R) | single bond | H | c-Pr | $C({=}O)OCH_2CCl_3$ | Me | Me | O |
| D-7897 | Me(S) | single bond | H | c-Pr | $C({=}O)OCH_2CCl_3$ | Me | Me | O |
| D-7898 | H | $CH_2$ | Me | c-Pr | $C({=}O)OCH_2CCl_3$ | Me | Me | O |
| D-7899 | Me | $CH_2$ | H | c-Pr | $C({=}O)OCH_2CCl_3$ | Me | Me | O |
| D-7900 | H | CH(Me) | H | c-Pr | $C({=}O)OCH_2CCl_3$ | Me | Me | O |
| D-7901 | H | $CH_2CH_2$ | Me | c-Pr | $C({=}O)OCH_2CCl_3$ | Me | Me | O |
| D-7902 | Me | $CH_2CH_2$ | H | c-Pr | $C({=}O)OCH_2CCl_3$ | Me | Me | O |
| D-7903 | H | single bond | Me | c-Pr | $C({=}O)N(Me)_2$ | Cl | Me | O |
| D-7904 | Me | single bond | H | c-Pr | $C({=}O)N(Me)_2$ | Cl | Me | O |
| D-7905 | Me(R) | single bond | H | c-Pr | $C({=}O)N(Me)_2$ | Cl | Me | O |
| D-7906 | Me(S) | single bond | H | c-Pr | $C({=}O)N(Me)_2$ | Cl | Me | O |
| D-7907 | H | $CH_2$ | Me | c-Pr | $C({=}O)N(Me)_2$ | Cl | Me | O |
| D-7908 | Me | $CH_2$ | H | c-Pr | $C({=}O)N(Me)_2$ | Cl | Me | O |
| D-7909 | H | CH(Me) | H | c-Pr | $C({=}O)N(Me)_2$ | Cl | Me | O |
| D-7910 | H | $CH_2CH_2$ | Me | c-Pr | $C({=}O)N(Me)_2$ | Cl | Me | O |
| D-7911 | Me | $CH_2CH_2$ | H | c-Pr | $C({=}O)N(Me)_2$ | Cl | Me | O |
| D-7912 | H | single bond | Me | c-Pr | $C({=}O)N(Me)_2$ | Me | Me | O |
| D-7913 | Me | single bond | H | c-Pr | $C({=}O)N(Me)_2$ | Me | Me | O |
| D-7914 | Me(R) | single bond | H | c-Pr | $C({=}O)N(Me)_2$ | Me | Me | O |
| D-7915 | Me(S) | single bond | H | c-Pr | $C({=}O)N(Me)_2$ | Me | Me | O |
| D-7916 | H | $CH_2$ | Me | c-Pr | $C({=}O)N(Me)_2$ | Me | Me | O |
| D-7917 | Me | $CH_2$ | H | c-Pr | $C({=}O)N(Me)_2$ | Me | Me | O |
| D-7918 | H | CH(Me) | H | c-Pr | $C({=}O)N(Me)_2$ | Me | Me | O |
| D-7919 | H | $CH_2CH_2$ | Me | c-Pr | $C({=}O)N(Me)_2$ | Me | Me | O |
| D-7920 | Me | $CH_2CH_2$ | H | c-Pr | $C({=}O)N(Me)_2$ | Me | Me | O |
| D-7921 | H | single bond | Me | c-Pr | $CH_2OC({=}O)Me$ | Cl | Me | O |
| D-7922 | Me | single bond | H | c-Pr | $CH_2OC({=}O)Me$ | Cl | Me | O |
| D-7923 | Me(R) | single bond | H | c-Pr | $CH_2OC({=}O)Me$ | Cl | Me | O |
| D-7924 | Me(S) | single bond | H | c-Pr | $CH_2OC({=}O)Me$ | Cl | Me | O |
| D-7925 | H | $CH_2$ | Me | c-Pr | $CH_2OC({=}O)Me$ | Cl | Me | O |
| D-7926 | Me | $CH_2$ | H | c-Pr | $CH_2OC({=}O)Me$ | Cl | Me | O |

TABLE 826

| Compound Number | Y | W | Z | $R^1$ | $R^2$ | $R^3$ | $R^{10}$ | A |
|---|---|---|---|---|---|---|---|---|
| D-7927 | H | CH(Me) | H | c-Pr | $CH_2OC(=O)Me$ | Cl | Me | O |
| D-7928 | H | $CH_2CH_2$ | Me | c-Pr | $CH_2OC(=O)Me$ | Cl | Me | O |
| D-7929 | Me | $CH_2CH_2$ | H | c-Pr | $CH_2OC(=O)Me$ | Cl | Me | O |
| D-7930 | H | single bond | Me | c-Pr | $CH_2OC(=O)Me$ | Me | Me | O |
| D-7931 | Me | single bond | H | c-Pr | $CH_2OC(=O)Me$ | Me | Me | O |
| D-7932 | Me(R) | single bond | H | c-Pr | $CH_2OC(=O)Me$ | Me | Me | O |
| D-7933 | Me(S) | single bond | H | c-Pr | $CH_2OC(=O)Me$ | Me | Me | O |
| D-7934 | H | $CH_2$ | Me | c-Pr | $CH_2OC(=O)Me$ | Me | Me | O |
| D-7935 | Me | $CH_2$ | H | c-Pr | $CH_2OC(=O)Me$ | Me | Me | O |
| D-7936 | H | CH(Me) | H | c-Pr | $CH_2OC(=O)Me$ | Me | Me | O |
| D-7937 | H | $CH_2CH_2$ | Me | c-Pr | $CH_2OC(=O)Me$ | Me | Me | O |
| D-7938 | Me | $CH_2CH_2$ | H | c-Pr | $CH_2OC(=O)Me$ | Me | Me | O |
| D-7939 | H | single bond | Me | c-Pr | $CH_2OC(=O)(i-Pr)$ | Cl | Me | O |
| D-7940 | Me | single bond | H | c-Pr | $CH_2OC(=O)(i-Pr)$ | Cl | Me | O |
| D-7941 | Me(R) | single bond | H | c-Pr | $CH_2OC(=O)(i-Pr)$ | Cl | Me | O |
| D-7942 | Me(S) | single bond | H | c-Pr | $CH_2OC(=O)(i-Pr)$ | Cl | Me | O |
| D-7943 | H | $CH_2$ | Me | c-Pr | $CH_2OC(=O)(i-Pr)$ | Cl | Me | O |
| D-7944 | Me | $CH_2$ | H | c-Pr | $CH_2OC(=O)(i-Pr)$ | Cl | Me | O |
| D-7945 | H | CH(Me) | H | c-Pr | $CH_2OC(=O)(i-Pr)$ | Cl | Me | O |
| D-7946 | H | $CH_2CH_2$ | Me | c-Pr | $CH_2OC(=O)(i-Pr)$ | Cl | Me | O |
| D-7947 | Me | $CH_2CH_2$ | H | c-Pr | $CH_2OC(=O)(i-Pr)$ | Cl | Me | O |
| D-7948 | H | single bond | Me | c-Pr | $CH_2OC(=O)(i-Pr)$ | Me | Me | O |
| D-7949 | Me | single bond | H | c-Pr | $CH_2OC(=O)(i-Pr)$ | Me | Me | O |
| D-7950 | Me(R) | single bond | H | c-Pr | $CH_2OC(=O)(i-Pr)$ | Me | Me | O |
| D-7951 | Me(S) | single bond | H | c-Pr | $CH_2OC(=O)(i-Pr)$ | Me | Me | O |
| D-7952 | H | $CH_2$ | Me | c-Pr | $CH_2OC(=O)(i-Pr)$ | Me | Me | O |
| D-7953 | Me | $CH_2$ | H | c-Pr | $CH_2OC(=O)(i-Pr)$ | Me | Me | O |
| D-7954 | H | CH(Me) | H | c-Pr | $CH_2OC(=O)(i-Pr)$ | Me | Me | O |
| D-7955 | H | $CH_2CH_2$ | Me | c-Pr | $CH_2OC(=O)(i-Pr)$ | Me | Me | O |
| D-7956 | Me | $CH_2CH_2$ | H | c-Pr | $CH_2OC(=O)(i-Pr)$ | Me | Me | O |
| D-7957 | H | single bond | Me | c-Pr | $CH_2OC(=O)(t-Bu)$ | Cl | Me | O |
| D-7958 | Me | single bond | H | c-Pr | $CH_2OC(=O)(t-Bu)$ | Cl | Me | O |
| D-7959 | Me(R) | single bond | H | c-Pr | $CH_2OC(=O)(t-Bu)$ | Cl | Me | O |
| D-7960 | Me(S) | single bond | H | c-Pr | $CH_2OC(=O)(t-Bu)$ | Cl | Me | O |
| D-7961 | H | $CH_2$ | Me | c-Pr | $CH_2OC(=O)(t-Bu)$ | Cl | Me | O |
| D-7962 | Me | $CH_2$ | H | c-Pr | $CH_2OC(=O)(t-Bu)$ | Cl | Me | O |
| D-7963 | H | CH(Me) | H | c-Pr | $CH_2OC(=O)(t-Bu)$ | Cl | Me | O |
| D-7964 | H | $CH_2CH_2$ | Me | c-Pr | $CH_2OC(=O)(t-Bu)$ | Cl | Me | O |
| D-7965 | Me | $CH_2CH_2$ | H | c-Pr | $CH_2OC(=O)(t-Bu)$ | Cl | Me | O |
| D-7966 | H | single bond | Me | c-Pr | $CH_2OC(=O)(t-Bu)$ | Me | Me | O |
| D-7967 | Me | single bond | H | c-Pr | $CH_2OC(=O)(t-Bu)$ | Me | Me | O |
| D-7968 | Me(R) | single bond | H | c-Pr | $CH_2OC(=O)(t-Bu)$ | Me | Me | O |
| D-7969 | Me(S) | single bond | H | c-Pr | $CH_2OC(=O)(t-Bu)$ | Me | Me | O |
| D-7970 | H | $CH_2$ | Me | c-Pr | $CH_2OC(=O)(t-Bu)$ | Me | Me | O |

TABLE 827

| Compound Number | Y | W | Z | $R^1$ | $R^2$ | $R^3$ | $R^{10}$ | A |
|---|---|---|---|---|---|---|---|---|
| D-7971 | Me | $CH_2$ | H | c-Pr | $CH_2OC(=O)(t-Bu)$ | Me | Me | O |
| D-7972 | H | CH(Me) | H | c-Pr | $CH_2OC(=O)(t-Bu)$ | Me | Me | O |
| D-7973 | H | $CH_2CH_2$ | Me | c-Pr | $CH_2OC(=O)(t-Bu)$ | Me | Me | O |
| D-7974 | Me | $CH_2CH_2$ | H | c-Pr | $CH_2OC(=O)(t-Bu)$ | Me | Me | O |
| D-7975 | H | single bond | Me | c-Pr | $CH_2OC(=O)OEt$ | Cl | Me | O |
| D-7976 | Me | single bond | H | c-Pr | $CH_2OC(=O)OEt$ | Cl | Me | O |
| D-7977 | Me(R) | single bond | H | c-Pr | $CH_2OC(=O)OEt$ | Cl | Me | O |
| D-7978 | Me(S) | single bond | H | c-Pr | $CH_2OC(=O)OEt$ | Cl | Me | O |
| D-7979 | H | $CH_2$ | Me | c-Pr | $CH_2OC(=O)OEt$ | Cl | Me | O |
| D-7980 | Me | $CH_2$ | H | c-Pr | $CH_2OC(=O)OEt$ | Cl | Me | O |
| D-7981 | H | CH(Me) | H | c-Pr | $CH_2OC(=O)OEt$ | Cl | Me | O |
| D-7982 | H | $CH_2CH_2$ | Me | c-Pr | $CH_2OC(=O)OEt$ | Cl | Me | O |
| D-7983 | Me | $CH_2CH_2$ | H | c-Pr | $CH_2OC(=O)OEt$ | Cl | Me | O |
| D-7984 | H | single bond | Me | c-Pr | $CH_2OC(=O)OEt$ | Me | Me | O |
| D-7985 | Me | single bond | H | c-Pr | $CH_2OC(=O)OEt$ | Me | Me | O |
| D-7986 | Me(R) | single bond | H | c-Pr | $CH_2OC(=O)OEt$ | Me | Me | O |
| D-7987 | Me(S) | single bond | H | c-Pr | $CH_2OC(=O)OEt$ | Me | Me | O |
| D-7988 | H | $CH_2$ | Me | c-Pr | $CH_2OC(=O)OEt$ | Me | Me | O |
| D-7989 | Me | $CH_2$ | H | c-Pr | $CH_2OC(=O)OEt$ | Me | Me | O |
| D-7990 | H | CH(Me) | H | c-Pr | $CH_2OC(=O)OEt$ | Me | Me | O |
| D-7991 | H | $CH_2CH_2$ | Me | c-Pr | $CH_2OC(=O)OEt$ | Me | Me | O |

TABLE 827-continued

| Compound Number | Y | W | Z | $R^1$ | $R^2$ | $R^3$ | $R^{10}$ | A |
|---|---|---|---|---|---|---|---|---|
| D-7992 | Me | $CH_2CH_2$ | H | c-Pr | $CH_2OC(=O)OEt$ | Me | Me | O |
| D-7993 | H | single bond | Me | c-Pr | $CH_2OC(=O)O(i-Pr)$ | Cl | Me | O |
| D-7994 | Me | single bond | H | c-Pr | $CH_2OC(=O)O(i-Pr)$ | Cl | Me | O |
| D-7995 | Me(R) | single bond | H | c-Pr | $CH_2OC(=O)O(i-Pr)$ | Cl | Me | O |
| D-7996 | Me(S) | single bond | H | c-Pr | $CH_2OC(=O)O(i-Pr)$ | Cl | Me | O |
| D-7997 | H | $CH_2$ | Me | c-Pr | $CH_2OC(=O)O(i-Pr)$ | Cl | Me | O |
| D-7998 | Me | $CH_2$ | H | c-Pr | $CH_2OC(=O)O(i-Pr)$ | Cl | Me | O |
| D-7999 | H | CH(Me) | H | c-Pr | $CH_2OC(=O)O(i-Pr)$ | Cl | Me | O |
| D-8000 | H | $CH_2CH_2$ | Me | c-Pr | $CH_2OC(=O)O(i-Pr)$ | Cl | Me | O |
| D-8001 | Me | $CH_2CH_2$ | H | c-Pr | $CH_2OC(=O)O(i-Pr)$ | Cl | Me | O |
| D-8002 | H | single bond | Me | c-Pr | $CH_2OC(=O)O(i-Pr)$ | Me | Me | O |
| D-8003 | Me | single bond | H | c-Pr | $CH_2OC(=O)O(i-Pr)$ | Me | Me | O |
| D-8004 | Me(R) | single bond | H | c-Pr | $CH_2OC(=O)O(i-Pr)$ | Me | Me | O |
| D-8005 | Me(S) | single bond | H | c-Pr | $CH_2OC(=O)O(i-Pr)$ | Me | Me | O |
| D-8006 | H | $CH_2$ | Me | c-Pr | $CH_2OC(=O)O(i-Pr)$ | Me | Me | O |
| D-8007 | Me | $CH_2$ | H | c-Pr | $CH_2OC(=O)O(i-Pr)$ | Me | Me | O |
| D-8008 | H | CH(Me) | H | c-Pr | $CH_2OC(=O)O(i-Pr)$ | Me | Me | O |
| D-8009 | H | $CH_2CH_2$ | Me | c-Pr | $CH_2OC(=O)O(i-Pr)$ | Me | Me | O |
| D-8010 | Me | $CH_2CH_2$ | H | c-Pr | $CH_2OC(=O)O(i-Pr)$ | Me | Me | O |
| D-8011 | H | single bond | Me | c-Pr | $CH_2N(Me)C(=O)OMe$ | Cl | Me | O |
| D-8012 | Me | single bond | H | c-Pr | $CH_2N(Me)C(=O)OMe$ | Cl | Me | O |
| D-8013 | Me(R) | single bond | H | c-Pr | $CH_2N(Me)C(=O)OMe$ | Cl | Me | O |
| D-8014 | Me(S) | single bond | H | c-Pr | $CH_2N(Me)C(=O)OMe$ | Cl | Me | O |

25

TABLE 828

| Compound Number | Y | W | Z | $R^1$ | $R^2$ | $R^3$ | $R^{10}$ | A |
|---|---|---|---|---|---|---|---|---|
| D-8015 | H | $CH_2$ | Me | c-Pr | $CH_2N(Me)C(=O)OMe$ | Cl | Me | O |
| D-8016 | Me | $CH_2$ | H | c-Pr | $CH_2N(Me)C(=O)OMe$ | Cl | Me | O |
| D-8017 | H | CH(Me) | H | c-Pr | $CH_2N(Me)C(=O)OMe$ | Cl | Me | O |
| D-8018 | H | $CH_2CH_2$ | Me | c-Pr | $CH_2N(Me)C(=O)OMe$ | Cl | Me | O |
| D-8019 | Me | $CH_2CH_2$ | H | c-Pr | $CH_2N(Me)C(=O)OMe$ | Cl | Me | O |
| D-8020 | H | single bond | Me | c-Pr | $CH_2N(Me)C(=O)OMe$ | Me | Me | O |
| D-8021 | Me | single bond | H | c-Pr | $CH_2N(Me)C(=O)OMe$ | Me | Me | O |
| D-8022 | Me(R) | single bond | H | c-Pr | $CH_2N(Me)C(=O)OMe$ | Me | Me | O |
| D-8023 | Me(S) | single bond | H | c-Pr | $CH_2N(Me)C(=O)OMe$ | Me | Me | O |
| D-8024 | H | $CH_2$ | Me | c-Pr | $CH_2N(Me)C(=O)OMe$ | Me | Me | O |
| D-8025 | Me | $CH_2$ | H | c-Pr | $CH_2N(Me)C(=O)OMe$ | Me | Me | O |
| D-8026 | H | CH(Me) | H | c-Pr | $CH_2N(Me)C(=O)OMe$ | Me | Me | O |
| D-8027 | H | $CH_2CH_2$ | Me | c-Pr | $CH_2N(Me)C(=O)OMe$ | Me | Me | O |
| D-8028 | Me | $CH_2CH_2$ | H | c-Pr | $CH_2N(Me)C(=O)OMe$ | Me | Me | O |
| D-8029 | H | single bond | Me | c-Pr | $C(=O)OCH_2CH=CH_2$ | Cl | $CH_2OMe$ | O |
| D-8030 | Me | single bond | H | c-Pr | $C(=O)OCH_2CH=CH_2$ | Cl | $CH_2OMe$ | O |
| D-8031 | Me(R) | single bond | H | c-Pr | $C(=O)OCH_2CH=CH_2$ | Cl | $CH_2OMe$ | O |
| D-8032 | Me(S) | single bond | H | c-Pr | $C(=O)OCH_2CH=CH_2$ | Cl | $CH_2OMe$ | O |
| D-8033 | H | $CH_2$ | Me | c-Pr | $C(=O)OCH_2CH=CH_2$ | Cl | $CH_2OMe$ | O |
| D-8034 | Me | $CH_2$ | H | c-Pr | $C(=O)OCH_2CH=CH_2$ | Cl | $CH_2OMe$ | O |
| D-8035 | H | CH(Me) | H | c-Pr | $C(=O)OCH_2CH=CH_2$ | Cl | $CH_2OMe$ | O |
| D-8036 | H | $CH_2CH_2$ | Me | c-Pr | $C(=O)OCH_2CH=CH_2$ | Cl | $CH_2OMe$ | O |
| D-8037 | Me | $CH_2CH_2$ | H | c-Pr | $C(=O)OCH_2CH=CH_2$ | Cl | $CH_2OMe$ | O |
| D-8038 | H | single bond | Me | c-Pr | $C(=O)OCH_2CH=CH_2$ | Me | $CH_2OMe$ | O |
| D-8039 | Me | single bond | H | c-Pr | $C(=O)OCH_2CH=CH_2$ | Me | $CH_2OMe$ | O |
| D-8040 | Me(R) | single bond | H | c-Pr | $C(=O)OCH_2CH=CH_2$ | Me | $CH_2OMe$ | O |
| D-8041 | Me(S) | single bond | H | c-Pr | $C(=O)OCH_2CH=CH_2$ | Me | $CH_2OMe$ | O |
| D-8042 | H | $CH_2$ | Me | c-Pr | $C(=O)OCH_2CH=CH_2$ | Me | $CH_2OMe$ | O |
| D-8043 | Me | $CH_2$ | H | c-Pr | $C(=O)OCH_2CH=CH_2$ | Me | $CH_2OMe$ | O |
| D-8044 | H | CH(Me) | H | c-Pr | $C(=O)OCH_2CH=CH_2$ | Me | $CH_2OMe$ | O |
| D-8045 | H | $CH_2CH_2$ | Me | c-Pr | $C(=O)OCH_2CH=CH_2$ | Me | $CH_2OMe$ | O |
| D-8046 | Me | $CH_2CH_2$ | H | c-Pr | $C(=O)OCH_2CH=CH_2$ | Me | $CH_2OMe$ | O |
| D-8047 | H | single bond | Me | c-Pr | $C(=O)OCH_2CCl_3$ | Cl | $CH_2OMe$ | O |
| D-8048 | Me | single bond | H | c-Pr | $C(=O)OCH_2CCl_3$ | Cl | $CH_2OMe$ | O |
| D-8049 | Me(R) | single bond | H | c-Pr | $C(=O)OCH_2CCl_3$ | Cl | $CH_2OMe$ | O |
| D-8050 | Me(S) | single bond | H | c-Pr | $C(=O)OCH_2CCl_3$ | Cl | $CH_2OMe$ | O |
| D-8051 | H | $CH_2$ | Me | c-Pr | $C(=O)OCH_2CCl_3$ | Cl | $CH_2OMe$ | O |
| D-8052 | Me | $CH_2$ | H | c-Pr | $C(=O)OCH_2CCl_3$ | Cl | $CH_2OMe$ | O |
| D-8053 | H | CH(Me) | H | c-Pr | $C(=O)OCH_2CCl_3$ | Cl | $CH_2OMe$ | O |
| D-8054 | H | $CH_2CH_2$ | Me | c-Pr | $C(=O)OCH_2CCl_3$ | Cl | $CH_2OMe$ | O |
| D-8055 | Me | $CH_2CH_2$ | H | c-Pr | $C(=O)OCH_2CCl_3$ | Cl | $CH_2OMe$ | O |
| D-8056 | H | single bond | Me | c-Pr | $C(=O)OCH_2CCl_3$ | Me | $CH_2OMe$ | O |

TABLE 828-continued

| Compound Number | Y | W | Z | $R^1$ | $R^2$ | $R^3$ | $R^{10}$ | A |
|---|---|---|---|---|---|---|---|---|
| D-8057 | Me | single bond | H | c-Pr | $C(=O)OCH_2CCl_3$ | Me | $CH_2OMe$ | O |
| D-8058 | Me(R) | single bond | H | c-Pr | $C(=O)OCH_2CCl_3$ | Me | $CH_2OMe$ | O |

TABLE 829

| Compound Number | Y | W | Z | $R^1$ | $R^2$ | $R^3$ | $R^{10}$ | A |
|---|---|---|---|---|---|---|---|---|
| D-8059 | Me(S) | single bond | H | c-Pr | $C(=O)OCH_2CCl_3$ | Me | $CH_2OMe$ | O |
| D-8060 | H | $CH_2$ | Me | c-Pr | $C(=O)OCH_2CCl_3$ | Me | $CH_2OMe$ | O |
| D-8061 | Me | $CH_2$ | H | c-Pr | $C(=O)OCH_2CCl_3$ | Me | $CH_2OMe$ | O |
| D-8062 | H | CH(Me) | H | c-Pr | $C(=O)OCH_2CCl_3$ | Me | $CH_2OMe$ | O |
| D-8063 | H | $CH_2CH_2$ | Me | c-Pr | $C(=O)OCH_2CCl_3$ | Me | $CH_2OMe$ | O |
| D-8064 | Me | $CH_2CH_2$ | H | c-Pr | $C(=O)OCH_2CCl_3$ | Me | $CH_2OMe$ | O |
| D-8065 | H | single bond | Me | c-Pr | $C(=O)N(Me)_2$ | Cl | $CH_2OMe$ | O |
| D-8066 | Me | single bond | H | c-Pr | $C(=O)N(Me)_2$ | Cl | $CH_2OMe$ | O |
| D-8067 | Me(R) | single bond | H | c-Pr | $C(=O)N(Me)_2$ | Cl | $CH_2OMe$ | O |
| D-8068 | Me(S) | single bond | H | c-Pr | $C(=O)N(Me)_2$ | Cl | $CH_2OMe$ | O |
| D-8069 | H | $CH_2$ | Me | c-Pr | $C(=O)N(Me)_2$ | Cl | $CH_2OMe$ | O |
| D-8070 | Me | $CH_2$ | H | c-Pr | $C(=O)N(Me)_2$ | Cl | $CH_2OMe$ | O |
| D-8071 | H | CH(Me) | H | c-Pr | $C(=O)N(Me)_2$ | Cl | $CH_2OMe$ | O |
| D-8072 | H | $CH_2CH_2$ | Me | c-Pr | $C(=O)N(Me)_2$ | Cl | $CH_2OMe$ | O |
| D-8073 | Me | $CH_2CH_2$ | H | c-Pr | $C(=O)N(Me)_2$ | Cl | $CH_2OMe$ | O |
| D-8074 | H | single bond | Me | c-Pr | $C(=O)N(Me)_2$ | Me | $CH_2OMe$ | O |
| D-8075 | Me | single bond | H | c-Pr | $C(=O)N(Me)_2$ | Me | $CH_2OMe$ | O |
| D-8076 | Me(R) | single bond | H | c-Pr | $C(=O)N(Me)_2$ | Me | $CH_2OMe$ | O |
| D-8077 | Me(S) | single bond | H | c-Pr | $C(=O)N(Me)_2$ | Me | $CH_2OMe$ | O |
| D-8078 | H | $CH_2$ | Me | c-Pr | $C(=O)N(Me)_2$ | Me | $CH_2OMe$ | O |
| D-8079 | Me | $CH_2$ | H | c-Pr | $C(=O)N(Me)_2$ | Me | $CH_2OMe$ | O |
| D-8080 | H | CH(Me) | H | c-Pr | $C(=O)N(Me)_2$ | Me | $CH_2OMe$ | O |
| D-8081 | H | $CH_2CH_2$ | Me | c-Pr | $C(=O)N(Me)_2$ | Me | $CH_2OMe$ | O |
| D-8082 | Me | $CH_2CH_2$ | H | c-Pr | $C(=O)N(Me)_2$ | Me | $CH_2OMe$ | O |
| D-8083 | H | single bond | Me | c-Pr | $CH_2OC(=O)Me$ | Cl | $CH_2OMe$ | O |
| D-8084 | Me | single bond | H | c-Pr | $CH_2OC(=O)Me$ | Cl | $CH_2OMe$ | O |
| D-8085 | Me(R) | single bond | H | c-Pr | $CH_2OC(=O)Me$ | Cl | $CH_2OMe$ | O |
| D-8086 | Me(S) | single bond | H | c-Pr | $CH_2OC(=O)Me$ | Cl | $CH_2OMe$ | O |
| D-8087 | H | $CH_2$ | Me | c-Pr | $CH_2OC(=O)Me$ | Cl | $CH_2OMe$ | O |
| D-8088 | Me | $CH_2$ | H | c-Pr | $CH_2OC(=O)Me$ | Cl | $CH_2OMe$ | O |
| D-8089 | H | CH(Me) | H | c-Pr | $CH_2OC(=O)Me$ | Cl | $CH_2OMe$ | O |
| D-8090 | H | $CH_2CH_2$ | Me | c-Pr | $CH_2OC(=O)Me$ | Cl | $CH_2OMe$ | O |
| D-8091 | Me | $CH_2CH_2$ | H | c-Pr | $CH_2OC(=O)Me$ | Cl | $CH_2OMe$ | O |
| D-8092 | H | single bond | Me | c-Pr | $CH_2OC(=O)Me$ | Me | $CH_2OMe$ | O |
| D-8093 | Me | single bond | H | c-Pr | $CH_2OC(=O)Me$ | Me | $CH_2OMe$ | O |
| D-8094 | Me(R) | single bond | H | c-Pr | $CH_2OC(=O)Me$ | Me | $CH_2OMe$ | O |
| D-8095 | Me(S) | single bond | H | c-Pr | $CH_2OC(=O)Me$ | Me | $CH_2OMe$ | O |
| D-8096 | H | $CH_2$ | Me | c-Pr | $CH_2OC(=O)Me$ | Me | $CH_2OMe$ | O |
| D-8097 | Me | $CH_2$ | H | c-Pr | $CH_2OC(=O)Me$ | Me | $CH_2OMe$ | O |
| D-8098 | H | CH(Me) | H | c-Pr | $CH_2OC(=O)Me$ | Me | $CH_2OMe$ | O |
| D-8099 | H | $CH_2CH_2$ | Me | c-Pr | $CH_2OC(=O)Me$ | Me | $CH_2OMe$ | O |
| D-8100 | Me | $CH_2CH_2$ | H | c-Pr | $CH_2OC(=O)Me$ | Me | $CH_2OMe$ | O |
| D-8101 | H | single bond | Me | c-Pr | $CH_2OC(=O)(i-Pr)$ | Cl | $CH_2OMe$ | O |
| D-8102 | Me | single bond | H | c-Pr | $CH_2OC(=O)(i-Pr)$ | Cl | $CH_2OMe$ | O |

TABLE 830

| Compound Number | Y | W | Z | $R^1$ | $R^2$ | $R^3$ | $R^{10}$ | A |
|---|---|---|---|---|---|---|---|---|
| D-8103 | Me(R) | single bond | H | c-Pr | $CH_2OC(=O)(i-Pr)$ | Cl | $CH_2OMe$ | O |
| D-8104 | Me(S) | single bond | H | c-Pr | $CH_2OC(=O)(i-Pr)$ | Cl | $CH_2OMe$ | O |
| D-8105 | H | $CH_2$ | Me | c-Pr | $CH_2OC(=O)(i-Pr)$ | Cl | $CH_2OMe$ | O |
| D-8106 | Me | $CH_2$ | H | c-Pr | $CH_2OC(=O)(i-Pr)$ | Cl | $CH_2OMe$ | O |
| D-8107 | H | CH(Me) | H | c-Pr | $CH_2OC(=O)(i-Pr)$ | Cl | $CH_2OMe$ | O |
| D-8108 | H | $CH_2CH_2$ | Me | c-Pr | $CH_2OC(=O)(i-Pr)$ | Cl | $CH_2OMe$ | O |
| D-8109 | Me | $CH_2CH_2$ | H | c-Pr | $CH_2OC(=O)(i-Pr)$ | Cl | $CH_2OMe$ | O |
| D-8110 | H | single bond | Me | c-Pr | $CH_2OC(=O)(i-Pr)$ | Me | $CH_2OMe$ | O |
| D-8111 | Me | single bond | H | c-Pr | $CH_2OC(=O)(i-Pr)$ | Me | $CH_2OMe$ | O |
| D-8112 | Me(R) | single bond | H | c-Pr | $CH_2OC(=O)(i-Pr)$ | Me | $CH_2OMe$ | O |
| D-8113 | Me(S) | single bond | H | c-Pr | $CH_2OC(=O)(i-Pr)$ | Me | $CH_2OMe$ | O |
| D-8114 | H | $CH_2$ | Me | c-Pr | $CH_2OC(=O)(i-Pr)$ | Me | $CH_2OMe$ | O |

TABLE 830-continued

| Compound Number | Y | W | Z | $R^1$ | $R^2$ | $R^3$ | $R^{10}$ | A |
|---|---|---|---|---|---|---|---|---|
| D-8115 | Me | $CH_2$ | H | c-Pr | $CH_2OC(=O)(i\text{-}Pr)$ | Me | $CH_2OMe$ | O |
| D-8116 | H | CH(Me) | H | c-Pr | $CH_2OC(=O)(i\text{-}Pr)$ | Me | $CH_2OMe$ | O |
| D-8117 | H | $CH_2CH_2$ | Me | c-Pr | $CH_2OC(=O)(i\text{-}Pr)$ | Me | $CH_2OMe$ | O |
| D-8118 | Me | $CH_2CH_2$ | H | c-Pr | $CH_2OC(=O)(i\text{-}Pr)$ | Me | $CH_2OMe$ | O |
| D-8119 | H | single bond | Me | c-Pr | $CH_2OC(=O)(t\text{-}Bu)$ | Cl | $CH_2OMe$ | O |
| D-8120 | Me | single bond | H | c-Pr | $CH_2OC(=O)(t\text{-}Bu)$ | Cl | $CH_2OMe$ | O |
| D-8121 | Me(R) | single bond | H | c-Pr | $CH_2OC(=O)(t\text{-}Bu)$ | Cl | $CH_2OMe$ | O |
| D-8122 | Me(S) | single bond | H | c-Pr | $CH_2OC(=O)(t\text{-}Bu)$ | Cl | $CH_2OMe$ | O |
| D-8123 | H | $CH_2$ | Me | c-Pr | $CH_2OC(=O)(t\text{-}Bu)$ | Cl | $CH_2OMe$ | O |
| D-8124 | Me | $CH_2$ | H | c-Pr | $CH_2OC(=O)(t\text{-}Bu)$ | Cl | $CH_2OMe$ | O |
| D-8125 | H | CH(Me) | H | c-Pr | $CH_2OC(=O)(t\text{-}Bu)$ | Cl | $CH_2OMe$ | O |
| D-8126 | H | $CH_2CH_2$ | Me | c-Pr | $CH_2OC(=O)(t\text{-}Bu)$ | Cl | $CH_2OMe$ | O |
| D-8127 | Me | $CH_2CH_2$ | H | c-Pr | $CH_2OC(=O)(t\text{-}Bu)$ | Cl | $CH_2OMe$ | O |
| D-8128 | H | single bond | Me | c-Pr | $CH_2OC(=O)(t\text{-}Bu)$ | Me | $CH_2OMe$ | O |
| D-8129 | Me | single bond | H | c-Pr | $CH_2OC(=O)(t\text{-}Bu)$ | Me | $CH_2OMe$ | O |
| D-8130 | Me(R) | single bond | H | c-Pr | $CH_2OC(=O)(t\text{-}Bu)$ | Me | $CH_2OMe$ | O |
| D-8131 | Me(S) | single bond | H | c-Pr | $CH_2OC(=O)(t\text{-}Bu)$ | Me | $CH_2OMe$ | O |
| D-8132 | H | $CH_2$ | Me | c-Pr | $CH_2OC(=O)(t\text{-}Bu)$ | Me | $CH_2OMe$ | O |
| D-8133 | Me | $CH_2$ | H | c-Pr | $CH_2OC(=O)(t\text{-}Bu)$ | Me | $CH_2OMe$ | O |
| D-8134 | H | CH(Me) | H | c-Pr | $CH_2OC(=O)(t\text{-}Bu)$ | Me | $CH_2OMe$ | O |
| D-8135 | H | $CH_2CH_2$ | Me | c-Pr | $CH_2OC(=O)(t\text{-}Bu)$ | Me | $CH_2OMe$ | O |
| D-8136 | Me | $CH_2CH_2$ | H | c-Pr | $CH_2OC(=O)(t\text{-}Bu)$ | Me | $CH_2OMe$ | O |
| D-8137 | H | single bond | Me | c-Pr | $CH_2OC(=O)OEt$ | Cl | $CH_2OMe$ | O |
| D-8138 | Me | single bond | H | c-Pr | $CH_2OC(=O)OEt$ | Cl | $CH_2OMe$ | O |
| D-8139 | Me(R) | single bond | H | c-Pr | $CH_2OC(=O)OEt$ | Cl | $CH_2OMe$ | O |
| D-8140 | Me(S) | single bond | H | c-Pr | $CH_2OC(=O)OEt$ | Cl | $CH_2OMe$ | O |
| D-8141 | H | $CH_2$ | Me | c-Pr | $CH_2OC(=O)OEt$ | Cl | $CH_2OMe$ | O |
| D-8142 | Me | $CH_2$ | H | c-Pr | $CH_2OC(=O)OEt$ | Cl | $CH_2OMe$ | O |
| D-8143 | H | CH(Me) | H | c-Pr | $CH_2OC(=O)OEt$ | Cl | $CH_2OMe$ | O |
| D-8144 | H | $CH_2CH_2$ | Me | c-Pr | $CH_2OC(=O)OEt$ | Cl | $CH_2OMe$ | O |
| D-8145 | Me | $CH_2CH_2$ | H | c-Pr | $CH_2OC(=O)OEt$ | Cl | $CH_2OMe$ | O |
| D-8146 | H | single bond | Me | c-Pr | $CH_2OC(=O)OEt$ | Me | $CH_2OMe$ | O |

TABLE 831

| Compound Number | Y | W | Z | $R^1$ | $R^2$ | $R^3$ | $R^{10}$ | A |
|---|---|---|---|---|---|---|---|---|
| D-8147 | Me | single bond | H | c-Pr | $CH_2OC(=O)OEt$ | Me | $CH_2OMe$ | O |
| D-8148 | Me(R) | single bond | H | c-Pr | $CH_2OC(=O)OEt$ | Me | $CH_2OMe$ | O |
| D-8149 | Me(S) | single bond | H | c-Pr | $CH_2OC(=O)OEt$ | Me | $CH_2OMe$ | O |
| D-8150 | H | $CH_2$ | Me | c-Pr | $CH_2OC(=O)OEt$ | Me | $CH_2OMe$ | O |
| D-8151 | Me | $CH_2$ | H | c-Pr | $CH_2OC(=O)OEt$ | Me | $CH_2OMe$ | O |
| D-8152 | H | CH(Me) | H | c-Pr | $CH_2OC(=O)OEt$ | Me | $CH_2OMe$ | O |
| D-8153 | H | $CH_2CH_2$ | Me | c-Pr | $CH_2OC(=O)OEt$ | Me | $CH_2OMe$ | O |
| D-8154 | Me | $CH_2CH_2$ | H | c-Pr | $CH_2OC(=O)OEt$ | Me | $CH_2OMe$ | O |
| D-8155 | H | single bond | Me | c-Pr | $CH_2OC(=O)O(i\text{-}Pr)$ | Cl | $CH_2OMe$ | O |
| D-8156 | Me | single bond | H | c-Pr | $CH_2OC(=O)O(i\text{-}Pr)$ | Cl | $CH_2OMe$ | O |
| D-8157 | Me(R) | single bond | H | c-Pr | $CH_2OC(=O)O(i\text{-}Pr)$ | Cl | $CH_2OMe$ | O |
| D-8158 | Me(S) | single bond | H | c-Pr | $CH_2OC(=O)O(i\text{-}Pr)$ | Cl | $CH_2OMe$ | O |
| D-8159 | H | $CH_2$ | Me | c-Pr | $CH_2OC(=O)O(i\text{-}Pr)$ | Cl | $CH_2OMe$ | O |
| D-8160 | Me | $CH_2$ | H | c-Pr | $CH_2OC(=O)O(i\text{-}Pr)$ | Cl | $CH_2OMe$ | O |
| D-8161 | H | CH(Me) | H | c-Pr | $CH_2OC(=O)O(i\text{-}Pr)$ | Cl | $CH_2OMe$ | O |
| D-8162 | H | $CH_2CH_2$ | Me | c-Pr | $CH_2OC(=O)O(i\text{-}Pr)$ | Cl | $CH_2OMe$ | O |
| D-8163 | Me | $CH_2CH_2$ | H | c-Pr | $CH_2OC(=O)O(i\text{-}Pr)$ | Cl | $CH_2OMe$ | O |
| D-8164 | H | single bond | Me | c-Pr | $CH_2OC(=O)O(i\text{-}Pr)$ | Me | $CH_2OMe$ | O |
| D-8165 | Me | single bond | H | c-Pr | $CH_2OC(=O)O(i\text{-}Pr)$ | Me | $CH_2OMe$ | O |
| D-8166 | Me(R) | single bond | H | c-Pr | $CH_2OC(=O)O(i\text{-}Pr)$ | Me | $CH_2OMe$ | O |
| D-8167 | Me(S) | single bond | H | c-Pr | $CH_2OC(=O)O(i\text{-}Pr)$ | Me | $CH_2OMe$ | O |
| D-8168 | H | $CH_2$ | Me | c-Pr | $CH_2OC(=O)O(i\text{-}Pr)$ | Me | $CH_2OMe$ | O |
| D-8169 | Me | $CH_2$ | H | c-Pr | $CH_2OC(=O)O(i\text{-}Pr)$ | Me | $CH_2OMe$ | O |
| D-8170 | H | CH(Me) | H | c-Pr | $CH_2OC(=O)O(i\text{-}Pr)$ | Me | $CH_2OMe$ | O |
| D-8171 | H | $CH_2CH_2$ | Me | c-Pr | $CH_2OC(=O)O(i\text{-}Pr)$ | Me | $CH_2OMe$ | O |
| D-8172 | Me | $CH_2CH_2$ | H | c-Pr | $CH_2OC(=O)O(i\text{-}Pr)$ | Me | $CH_2OMe$ | O |
| D-8173 | H | single bond | Me | c-Pr | $CH_2N(Me)C(=O)OMe$ | Cl | $CH_2OMe$ | O |
| D-8174 | Me | single bond | H | c-Pr | $CH_2N(Me)C(=O)OMe$ | Cl | $CH_2OMe$ | O |
| D-8175 | Me(R) | single bond | H | c-Pr | $CH_2N(Me)C(=O)OMe$ | Cl | $CH_2OMe$ | O |
| D-8176 | Me(S) | single bond | H | c-Pr | $CH_2N(Me)C(=O)OMe$ | Cl | $CH_2OMe$ | O |
| D-8177 | H | $CH_2$ | Me | c-Pr | $CH_2N(Me)C(=O)OMe$ | Cl | $CH_2OMe$ | O |
| D-8178 | Me | $CH_2$ | H | c-Pr | $CH_2N(Me)C(=O)OMe$ | Cl | $CH_2OMe$ | O |
| D-8179 | H | CH(Me) | H | c-Pr | $CH_2N(Me)C(=O)OMe$ | Cl | $CH_2OMe$ | O |
| D-8180 | H | $CH_2CH_2$ | Me | c-Pr | $CH_2N(Me)C(=O)OMe$ | Cl | $CH_2OMe$ | O |
| D-8181 | Me | $CH_2CH_2$ | H | c-Pr | $CH_2N(Me)C(=O)OMe$ | Cl | $CH_2OMe$ | O |

TABLE 831-continued

| Compound Number | Y | W | Z | $R^1$ | $R^2$ | $R^3$ | $R^{10}$ | A |
|---|---|---|---|---|---|---|---|---|
| D-8182 | H | single bond | Me | c-Pr | $CH_2N(Me)C(=O)OMe$ | Me | $CH_2OMe$ | O |
| D-8183 | Me | single bond | H | c-Pr | $CH_2N(Me)C(=O)OMe$ | Me | $CH_2OMe$ | O |
| D-8184 | Me(R) | single bond | H | c-Pr | $CH_2N(Me)C(=O)OMe$ | Me | $CH_2OMe$ | O |
| D-8185 | Me(S) | single bond | H | c-Pr | $CH_2N(Me)C(=O)OMe$ | Me | $CH_2OMe$ | O |
| D-8186 | H | $CH_2$ | Me | c-Pr | $CH_2N(Me)C(=O)OMe$ | Me | $CH_2OMe$ | O |
| D-8187 | Me | $CH_2$ | H | c-Pr | $CH_2N(Me)C(=O)OMe$ | Me | $CH_2OMe$ | O |
| D-8188 | H | CH(Me) | H | c-Pr | $CH_2N(Me)C(=O)OMe$ | Me | $CH_2OMe$ | O |
| D-8189 | H | $CH_2CH_2$ | Me | c-Pr | $CH_2N(Me)C(=O)OMe$ | Me | $CH_2OMe$ | O |
| D-8190 | Me | $CH_2CH_2$ | H | c-Pr | $CH_2N(Me)C(=O)OMe$ | Me | $CH_2OMe$ | O |

TABLE 832

| Compound Number | Y | W | Z | $R^1$ | $R^2$ | $R^3$ | $R^{10}$ | A |
|---|---|---|---|---|---|---|---|---|
| D-8191 | H | single bond | Me | c-Pr | $C(=O)OCH_2CH=CH_2$ | Cl | $CH_2CN$ | O |
| D-8192 | Me | single bond | H | c-Pr | $C(=O)OCH_2CH=CH_2$ | Cl | $CH_2CN$ | O |
| D-8193 | Me(R) | single bond | H | c-Pr | $C(=O)OCH_2CH=CH_2$ | Cl | $CH_2CN$ | O |
| D-8194 | Me(S) | single bond | H | c-Pr | $C(=O)OCH_2CH=CH_2$ | Cl | $CH_2CN$ | O |
| D-8195 | H | $CH_2$ | Me | c-Pr | $C(=O)OCH_2CH=CH_2$ | Cl | $CH_2CN$ | O |
| D-8196 | Me | $CH_2$ | H | c-Pr | $C(=O)OCH_2CH=CH_2$ | Cl | $CH_2CN$ | O |
| D-8197 | H | CH(Me) | H | c-Pr | $C(=O)OCH_2CH=CH_2$ | Cl | $CH_2CN$ | O |
| D-8198 | H | $CH_2CH_2$ | Me | c-Pr | $C(=O)OCH_2CH=CH_2$ | Cl | $CH_2CN$ | O |
| D-8199 | Me | $CH_2CH_2$ | H | c-Pr | $C(=O)OCH_2CH=CH_2$ | Cl | $CH_2CN$ | O |
| D-8200 | H | single bond | Me | c-Pr | $C(=O)OCH_2CH=CH_2$ | Me | $CH_2CN$ | O |
| D-8201 | Me | single bond | H | c-Pr | $C(=O)OCH_2CH=CH_2$ | Me | $CH_2CN$ | O |
| D-8202 | Me(R) | single bond | H | c-Pr | $C(=O)OCH_2CH=CH_2$ | Me | $CH_2CN$ | O |
| D-8203 | Me(S) | single bond | H | c-Pr | $C(=O)OCH_2CH=CH_2$ | Me | $CH_2CN$ | O |
| D-8204 | H | $CH_2$ | Me | c-Pr | $C(=O)OCH_2CH=CH_2$ | Me | $CH_2CN$ | O |
| D-8205 | Me | $CH_2$ | H | c-Pr | $C(=O)OCH_2CH=CH_2$ | Me | $CH_2CN$ | O |
| D-8206 | H | CH(Me) | H | c-Pr | $C(=O)OCH_2CH=CH_2$ | Me | $CH_2CN$ | O |
| D-8207 | H | $CH_2CH_2$ | Me | c-Pr | $C(=O)OCH_2CH=CH_2$ | Me | $CH_2CN$ | O |
| D-8208 | Me | $CH_2CH_2$ | H | c-Pr | $C(=O)OCH_2CH=CH_2$ | Me | $CH_2CN$ | O |
| D-8209 | H | single bond | Me | c-Pr | $C(=O)OCH_2CCl_3$ | Cl | $CH_2CN$ | O |
| D-8210 | Me | single bond | H | c-Pr | $C(=O)OCH_2CCl_3$ | Cl | $CH_2CN$ | O |
| D-8211 | Me(R) | single bond | H | c-Pr | $C(=O)OCH_2CCl_3$ | Cl | $CH_2CN$ | O |
| D-8212 | Me(S) | single bond | H | c-Pr | $C(=O)OCH_2CCl_3$ | Cl | $CH_2CN$ | O |
| D-8213 | H | $CH_2$ | Me | c-Pr | $C(=O)OCH_2CCl_3$ | Cl | $CH_2CN$ | O |
| D-8214 | Me | $CH_2$ | H | c-Pr | $C(=O)OCH_2CCl_3$ | Cl | $CH_2CN$ | O |
| D-8215 | H | CH(Me) | H | c-Pr | $C(=O)OCH_2CCl_3$ | Cl | $CH_2CN$ | O |
| D-8216 | H | $CH_2CH_2$ | Me | c-Pr | $C(=O)OCH_2CCl_3$ | Cl | $CH_2CN$ | O |
| D-8217 | Me | $CH_2CH_2$ | H | c-Pr | $C(=O)OCH_2CCl_3$ | Cl | $CH_2CN$ | O |
| D-8218 | H | single bond | Me | c-Pr | $C(=O)OCH_2CCl_3$ | Me | $CH_2CN$ | O |
| D-8219 | Me | single bond | H | c-Pr | $C(=O)OCH_2CCl_3$ | Me | $CH_2CN$ | O |
| D-8220 | Me(R) | single bond | H | c-Pr | $C(=O)OCH_2CCl_3$ | Me | $CH_2CN$ | O |
| D-8221 | Me(S) | single bond | H | c-Pr | $C(=O)OCH_2CCl_3$ | Me | $CH_2CN$ | O |
| D-8222 | H | $CH_2$ | Me | c-Pr | $C(=O)OCH_2CCl_3$ | Me | $CH_2CN$ | O |
| D-8223 | Me | $CH_2$ | H | c-Pr | $C(=O)OCH_2CCl_3$ | Me | $CH_2CN$ | O |
| D-8224 | H | CH(Me) | H | c-Pr | $C(=O)OCH_2CCl_3$ | Me | $CH_2CN$ | O |
| D-8225 | H | $CH_2CH_2$ | Me | c-Pr | $C(=O)OCH_2CCl_3$ | Me | $CH_2CN$ | O |
| D-8226 | Me | $CH_2CH_2$ | H | c-Pr | $C(=O)OCH_2CCl_3$ | Me | $CH_2CN$ | O |
| D-8227 | H | single bond | Me | c-Pr | $C(=O)N(Me)_2$ | Cl | $CH_2CN$ | O |
| D-8228 | Me | single bond | H | c-Pr | $C(=O)N(Me)_2$ | Cl | $CH_2CN$ | O |
| D-8229 | Me(R) | single bond | H | c-Pr | $C(=O)N(Me)_2$ | Cl | $CH_2CN$ | O |
| D-8230 | Me(S) | single bond | H | c-Pr | $C(=O)N(Me)_2$ | Cl | $CH_2CN$ | O |
| D-8231 | H | $CH_2$ | Me | c-Pr | $C(=O)N(Me)_2$ | Cl | $CH_2CN$ | O |
| D-8232 | Me | $CH_2$ | H | c-Pr | $C(=O)N(Me)_2$ | Cl | $CH_2CN$ | O |
| D-8233 | H | CH(Me) | H | c-Pr | $C(=O)N(Me)_2$ | Cl | $CH_2CN$ | O |
| D-8234 | H | $CH_2CH_2$ | Me | c-Pr | $C(=O)N(Me)_2$ | Cl | $CH_2CN$ | O |

TABLE 833

| Compound Number | Y | W | Z | $R^1$ | $R^2$ | $R^3$ | $R^{10}$ | A |
|---|---|---|---|---|---|---|---|---|
| D-8235 | Me | $CH_2CH_2$ | H | c-Pr | $C(=O)N(Me)_2$ | Cl | $CH_2CN$ | O |
| D-8236 | H | single bond | Me | c-Pr | $C(=O)N(Me)_2$ | Me | $CH_2CN$ | O |
| D-8237 | Me | single bond | H | c-Pr | $C(=O)N(Me)_2$ | Me | $CH_2CN$ | O |

TABLE 833-continued

| Compound Number | Y | W | Z | $R^1$ | $R^2$ | $R^3$ | $R^{10}$ | A |
|---|---|---|---|---|---|---|---|---|
| D-8238 | Me(R) | single bond | H | c-Pr | C(═O)N(Me)$_2$ | Me | $CH_2CN$ | O |
| D-8239 | Me(S) | single bond | H | c-Pr | C(═O)N(Me)$_2$ | Me | $CH_2CN$ | O |
| D-8240 | H | $CH_2$ | Me | c-Pr | C(═O)N(Me)$_2$ | Me | $CH_2CN$ | O |
| D-8241 | Me | $CH_2$ | H | c-Pr | C(═O)N(Me)$_2$ | Me | $CH_2CN$ | O |
| D-8242 | H | CH(Me) | H | c-Pr | C(═O)N(Me)$_2$ | Me | $CH_2CN$ | O |
| D-8243 | H | $CH_2CH_2$ | Me | c-Pr | C(═O)N(Me)$_2$ | Me | $CH_2CN$ | O |
| D-8244 | Me | $CH_2CH_2$ | H | c-Pr | C(═O)N(Me)$_2$ | Me | $CH_2CN$ | O |
| D-8245 | H | single bond | Me | c-Pr | $CH_2$OC(═O)Me | Cl | $CH_2CN$ | O |
| D-8246 | Me | single bond | H | c-Pr | $CH_2$OC(═O)Me | Cl | $CH_2CN$ | O |
| D-8247 | Me(R) | single bond | H | c-Pr | $CH_2$OC(═O)Me | Cl | $CH_2CN$ | O |
| D-8248 | Me(S) | single bond | H | c-Pr | $CH_2$OC(═O)Me | Cl | $CH_2CN$ | O |
| D-8249 | H | $CH_2$ | Me | c-Pr | $CH_2$OC(═O)Me | Cl | $CH_2CN$ | O |
| D-8250 | Me | $CH_2$ | H | c-Pr | $CH_2$OC(═O)Me | Cl | $CH_2CN$ | O |
| D-8251 | H | CH(Me) | H | c-Pr | $CH_2$OC(═O)Me | Cl | $CH_2CN$ | O |
| D-8252 | H | $CH_2CH_2$ | Me | c-Pr | $CH_2$OC(═O)Me | Cl | $CH_2CN$ | O |
| D-8253 | Me | $CH_2CH_2$ | H | c-Pr | $CH_2$OC(═O)Me | Cl | $CH_2CN$ | O |
| D-8254 | H | single bond | Me | c-Pr | $CH_2$OC(═O)Me | Me | $CH_2CN$ | O |
| D-8255 | Me | single bond | H | c-Pr | $CH_2$OC(═O)Me | Me | $CH_2CN$ | O |
| D-8256 | Me(R) | single bond | H | c-Pr | $CH_2$OC(═O)Me | Me | $CH_2CN$ | O |
| D-8257 | Me(S) | single bond | H | c-Pr | $CH_2$OC(═O)Me | Me | $CH_2CN$ | O |
| D-8258 | H | $CH_2$ | Me | c-Pr | $CH_2$OC(═O)Me | Me | $CH_2CN$ | O |
| D-8259 | Me | $CH_2$ | H | c-Pr | $CH_2$OC(═O)Me | Me | $CH_2CN$ | O |
| D-8260 | H | CH(Me) | H | c-Pr | $CH_2$OC(═O)Me | Me | $CH_2CN$ | O |
| D-8261 | H | $CH_2CH_2$ | Me | c-Pr | $CH_2$OC(═O)Me | Me | $CH_2CN$ | O |
| D-8262 | Me | $CH_2CH_2$ | H | c-Pr | $CH_2$OC(═O)Me | Me | $CH_2CN$ | O |
| D-8263 | H | single bond | Me | c-Pr | $CH_2$OC(═O)(i-Pr) | Cl | $CH_2CN$ | O |
| D-8264 | Me | single bond | H | c-Pr | $CH_2$OC(═O)(i-Pr) | Cl | $CH_2CN$ | O |
| D-8265 | Me(R) | single bond | H | c-Pr | $CH_2$OC(═O)(i-Pr) | Cl | $CH_2CN$ | O |
| D-8266 | Me(S) | single bond | H | c-Pr | $CH_2$OC(═O)(i-Pr) | Cl | $CH_2CN$ | O |
| D-8267 | H | $CH_2$ | Me | c-Pr | $CH_2$OC(═O)(i-Pr) | Cl | $CH_2CN$ | O |
| D-8268 | Me | $CH_2$ | H | c-Pr | $CH_2$OC(═O)(i-Pr) | Cl | $CH_2CN$ | O |
| D-8269 | H | CH(Me) | H | c-Pr | $CH_2$OC(═O)(i-Pr) | Cl | $CH_2CN$ | O |
| D-8270 | H | $CH_2CH_2$ | Me | c-Pr | $CH_2$OC(═O)(i-Pr) | Cl | $CH_2CN$ | O |
| D-8271 | Me | $CH_2CH_2$ | H | c-Pr | $CH_2$OC(═O)(i-Pr) | Cl | $CH_2CN$ | O |
| D-8272 | H | single bond | Me | c-Pr | $CH_2$OC(═O)(i-Pr) | Me | $CH_2CN$ | O |
| D-8273 | Me | single bond | H | c-Pr | $CH_2$OC(═O)(i-Pr) | Me | $CH_2CN$ | O |
| D-8274 | Me(R) | single bond | H | c-Pr | $CH_2$OC(═O)(i-Pr) | Me | $CH_2CN$ | O |
| D-8275 | Me(S) | single bond | H | c-Pr | $CH_2$OC(═O)(i-Pr) | Me | $CH_2CN$ | O |
| D-8276 | H | $CH_2$ | Me | c-Pr | $CH_2$OC(═O)(i-Pr) | Me | $CH_2CN$ | O |
| D-8277 | Me | $CH_2$ | H | c-Pr | $CH_2$OC(═O)(i-Pr) | Me | $CH_2CN$ | O |
| D-8278 | H | CH(Me) | H | c-Pr | $CH_2$OC(═O)(i-Pr) | Me | $CH_2CN$ | O |

TABLE 834

| Compound Number | Y | W | Z | $R^1$ | $R^2$ | $R^3$ | $R^{10}$ | A |
|---|---|---|---|---|---|---|---|---|
| D-8279 | H | $CH_2CH_2$ | Me | c-Pr | $CH_2$OC(═O)(i -Pr) | Me | $CH_2CN$ | O |
| D-8280 | Me | $CH_2CH_2$ | H | c-Pr | $CH_2$OC(═O)(i-Pr) | Me | $CH_2CN$ | O |
| D-8281 | H | single bond | Me | c-Pr | $CH_2$OC(═O)(t-Bu) | Cl | $CH_2CN$ | O |
| D-8282 | Me | single bond | H | c-Pr | $CH_2$OC(═O)(t-Bu) | Cl | $CH_2CN$ | O |
| D-8283 | Me(R) | single bond | H | c-Pr | $CH_2$OC(═O)(t-Bu) | Cl | $CH_2CN$ | O |
| D-8284 | Me(S) | single bond | H | c-Pr | $CH_2$OC(═O)(t-Bu) | Cl | $CH_2CN$ | O |
| D-8285 | H | $CH_2$ | Me | c-Pr | $CH_2$OC(═O)(t-Bu) | Cl | $CH_2CN$ | O |
| D-8286 | Me | $CH_2$ | H | c-Pr | $CH_2$OC(═O)(t-Bu) | Cl | $CH_2CN$ | O |
| D-8287 | H | CH(Me) | H | c-Pr | $CH_2$OC(═O)(t-Bu) | Cl | $CH_2CN$ | O |
| D-8288 | H | $CH_2CH_2$ | Me | c-Pr | $CH_2$OC(═O)(t-Bu) | Cl | $CH_2CN$ | O |
| D-8289 | Me | $CH_2CH_2$ | H | c-Pr | $CH_2$OC(═O)(t-Bu) | Cl | $CH_2CN$ | O |
| D-8290 | H | single bond | Me | c-Pr | $CH_2$OC(═O)(t-Bu) | Me | $CH_2CN$ | O |
| D-8291 | Me | single bond | H | c-Pr | $CH_2$OC(═O)(t-Bu) | Me | $CH_2CN$ | O |
| D-8292 | Me(R) | single bond | H | c-Pr | $CH_2$OC(═O)(t-Bu) | Me | $CH_2CN$ | O |
| D-8293 | Me(S) | single bond | H | c-Pr | $CH_2$OC(═O)(t-Bu) | Me | $CH_2CN$ | O |
| D-8294 | H | $CH_2$ | Me | c-Pr | $CH_2$OC(═O)(t-Bu) | Me | $CH_2CN$ | O |
| D-8295 | Me | $CH_2$ | H | c-Pr | $CH_2$OC(═O)(t-Bu) | Me | $CH_2CN$ | O |
| D-8296 | H | CH(Me) | H | c-Pr | $CH_2$OC(═O)(t-Bu) | Me | $CH_2CN$ | O |
| D-8297 | H | $CH_2CH_2$ | Me | c-Pr | $CH_2$OC(═O)(t-Bu) | Me | $CH_2CN$ | O |
| D-8298 | Me | $CH_2CH_2$ | H | c-Pr | $CH_2$OC(═O)(t-Bu) | Me | $CH_2CN$ | O |
| D-8299 | H | single bond | Me | c-Pr | $CH_2$OC(═O)OEt | Cl | $CH_2CN$ | O |
| D-8300 | Me | single bond | H | c-Pr | $CH_2$OC(═O)OEt | Cl | $CH_2CN$ | O |
| D-8301 | Me(R) | single bond | H | c-Pr | $CH_2$OC(═O)OEt | Cl | $CH_2CN$ | O |
| D-8302 | Me(S) | single bond | H | c-Pr | $CH_2$OC(═O)OEt | Cl | $CH_2CN$ | O |
| D-8303 | H | $CH_2$ | Me | c-Pr | $CH_2$OC(═O)OEt | Cl | $CH_2CN$ | O |
| D-8304 | Me | $CH_2$ | H | c-Pr | $CH_2$OC(═O)OEt | Cl | $CH_2CN$ | O |

TABLE 834-continued

| Compound Number | Y | W | Z | $R^1$ | $R^2$ | $R^3$ | $R^{10}$ | A |
|---|---|---|---|---|---|---|---|---|
| D-8305 | H | CH(Me) | H | c-Pr | $CH_2OC(=O)OEt$ | Cl | $CH_2CN$ | O |
| D-8306 | H | $CH_2CH_2$ | Me | c-Pr | $CH_2OC(=O)OEt$ | Cl | $CH_2CN$ | O |
| D-8307 | Me | $CH_2CH_2$ | H | c-Pr | $CH_2OC(=O)OEt$ | Cl | $CH_2CN$ | O |
| D-8308 | H | single bond | Me | c-Pr | $CH_2OC(=O)OEt$ | Me | $CH_2CN$ | O |
| D-8309 | Me | single bond | H | c-Pr | $CH_2OC(=O)OEt$ | Me | $CH_2CN$ | O |
| D-8310 | Me(R) | single bond | H | c-Pr | $CH_2OC(=O)OEt$ | Me | $CH_2CN$ | O |
| D-8311 | Me(S) | single bond | H | c-Pr | $CH_2OC(=O)OEt$ | Me | $CH_2CN$ | O |
| D-8312 | H | $CH_2$ | Me | c-Pr | $CH_2OC(=O)OEt$ | Me | $CH_2CN$ | O |
| D-8313 | Me | $CH_2$ | H | c-Pr | $CH_2OC(=O)OEt$ | Me | $CH_2CN$ | O |
| D-8314 | H | CH(Me) | H | c-Pr | $CH_2OC(=O)OEt$ | Me | $CH_2CN$ | O |
| D-8315 | H | $CH_2CH_2$ | Me | c-Pr | $CH_2OC(=O)OEt$ | Me | $CH_2CN$ | O |
| D-8316 | Me | $CH_2CH_2$ | H | c-Pr | $CH_2OC(=O)OEt$ | Me | $CH_2CN$ | O |
| D-8317 | H | single bond | Me | c-Pr | $CH_2OC(=O)O(i-Pr)$ | Cl | $CH_2CN$ | O |
| D-8318 | Me | single bond | H | c-Pr | $CH_2OC(=O)O(i-Pr)$ | Cl | $CH_2CN$ | O |
| D-8319 | Me(R) | single bond | H | c-Pr | $CH_2OC(=O)O(i-Pr)$ | Cl | $CH_2CN$ | O |
| D-8320 | Me(S) | single bond | H | c-Pr | $CH_2OC(=O)O(i-Pr)$ | Cl | $CH_2CN$ | O |
| D-8321 | H | $CH_2$ | Me | c-Pr | $CH_2OC(=O)O(i-Pr)$ | Cl | $CH_2CN$ | O |
| D-8322 | Me | $CH_2$ | H | c-Pr | $CH_2OC(=O)O(i-Pr)$ | Cl | $CH_2CN$ | O |

TABLE 835

| Compound Number | Y | W | Z | $R^1$ | $R^2$ | $R^3$ | $R^{10}$ | A |
|---|---|---|---|---|---|---|---|---|
| D-8323 | H | CH(Me) | H | c-Pr | $CH_2OC(=O)O(i-Pr)$ | Cl | $CH_2CN$ | O |
| D-8324 | H | $CH_2CH_2$ | Me | c-Pr | $CH_2OC(=O)O(i-Pr)$ | Cl | $CH_2CN$ | O |
| D-8325 | Me | $CH_2CH_2$ | H | c-Pr | $CH_2OC(=O)O(i-Pr)$ | Cl | $CH_2CN$ | O |
| D-8326 | H | single bond | Me | c-Pr | $CH_2OC(=O)O(i-Pr)$ | Me | $CH_2CN$ | O |
| D-8327 | Me | single bond | H | c-Pr | $CH_2OC(=O)O(i-Pr)$ | Me | $CH_2CN$ | O |
| D-8328 | Me(R) | single bond | H | c-Pr | $CH_2OC(=O)O(i-Pr)$ | Me | $CH_2CN$ | O |
| D-8329 | Me(S) | single bond | H | c-Pr | $CH_2OC(=O)O(i-Pr)$ | Me | $CH_2CN$ | O |
| D-8330 | H | $CH_2$ | Me | c-Pr | $CH_2OC(=O)O(i-Pr)$ | Me | $CH_2CN$ | O |
| D-8331 | Me | $CH_2$ | H | c-Pr | $CH_2OC(=O)O(i-Pr)$ | Me | $CH_2CN$ | O |
| D-8332 | H | CH(Me) | H | c-Pr | $CH_2OC(=O)O(i-Pr)$ | Me | $CH_2CN$ | O |
| D-8333 | H | $CH_2CH_2$ | Me | c-Pr | $CH_2OC(=O)O(i-Pr)$ | Me | $CH_2CN$ | O |
| D-8334 | Me | $CH_2CH_2$ | H | c-Pr | $CH_2OC(=O)O(i-Pr)$ | Me | $CH_2CN$ | O |
| D-8335 | H | single bond | Me | c-Pr | $CH_2N(Me)C(=O)OMe$ | Cl | $CH_2CN$ | O |
| D-8336 | Me | single bond | H | c-Pr | $CH_2N(Me)C(=O)OMe$ | Cl | $CH_2CN$ | O |
| D-8337 | Me(R) | single bond | H | c-Pr | $CH_2N(Me)C(=O)OMe$ | Cl | $CH_2CN$ | O |
| D-8338 | Me(S) | single bond | H | c-Pr | $CH_2N(Me)C(=O)OMe$ | Cl | $CH_2CN$ | O |
| D-8339 | H | $CH_2$ | Me | c-Pr | $CH_2N(Me)C(=O)OMe$ | Cl | $CH_2CN$ | O |
| D-8340 | Me | $CH_2$ | H | c-Pr | $CH_2N(Me)C(=O)OMe$ | Cl | $CH_2CN$ | O |
| D-8341 | H | CH(Me) | H | c-Pr | $CH_2N(Me)C(=O)OMe$ | Cl | $CH_2CN$ | O |
| D-8342 | H | $CH_2CH_2$ | Me | c-Pr | $CH_2N(Me)C(=O)OMe$ | Cl | $CH_2CN$ | O |
| D-8343 | Me | $CH_2CH_2$ | H | c-Pr | $CH_2N(Me)C(=O)OMe$ | Cl | $CH_2CN$ | O |
| D-8344 | H | single bond | Me | c-Pr | $CH_2N(Me)C(=O)OMe$ | Me | $CH_2CN$ | O |
| D-8345 | Me | single bond | H | c-Pr | $CH_2N(Me)C(=O)OMe$ | Me | $CH_2CN$ | O |
| D-8346 | Me(R) | single bond | H | c-Pr | $CH_2N(Me)C(=O)OMe$ | Me | $CH_2CN$ | O |
| D-8347 | Me(S) | single bond | H | c-Pr | $CH_2N(Me)C(=O)OMe$ | Me | $CH_2CN$ | O |
| D-8348 | H | $CH_2$ | Me | c-Pr | $CH_2N(Me)C(=O)OMe$ | Me | $CH_2CN$ | O |
| D-8349 | Me | $CH_2$ | H | c-Pr | $CH_2N(Me)C(=O)OMe$ | Me | $CH_2CN$ | O |
| D-8350 | H | CH(Me) | H | c-Pr | $CH_2N(Me)C(=O)OMe$ | Me | $CH_2CN$ | O |
| D-8351 | H | $CH_2CH_2$ | Me | c-Pr | $CH_2N(Me)C(=O)OMe$ | Me | $CH_2CN$ | O |
| D-8352 | Me | $CH_2CH_2$ | H | c-Pr | $CH_2N(Me)C(=O)OMe$ | Me | $CH_2CN$ | O |
| D-8353 | H | single bond | Me | c-Pr | $C(=O)OCH_2CH=CH_2$ | Cl | $C(=O)Me$ | O |
| D-8354 | Me | single bond | H | c-Pr | $C(=O)OCH_2CH=CH_2$ | Cl | $C(=O)Me$ | O |
| D-8355 | Me(R) | single bond | H | c-Pr | $C(=O)OCH_2CH=CH_2$ | Cl | $C(=O)Me$ | O |
| D-8356 | Me(S) | single bond | H | c-Pr | $C(=O)OCH_2CH=CH_2$ | Cl | $C(=O)Me$ | O |
| D-8357 | H | $CH_2$ | Me | c-Pr | $C(=O)OCH_2CH=CH_2$ | Cl | $C(=O)Me$ | O |
| D-8358 | Me | $CH_2$ | H | c-Pr | $C(=O)OCH_2CH=CH_2$ | Cl | $C(=O)Me$ | O |
| D-8359 | H | CH(Me) | H | c-Pr | $C(=O)OCH_2CH=CH_2$ | Cl | $C(=O)Me$ | O |
| D-8360 | H | $CH_2CH_2$ | Me | c-Pr | $C(=O)OCH_2CH=CH_2$ | Cl | $C(=O)Me$ | O |
| D-8361 | Me | $CH_2CH_2$ | H | c-Pr | $C(=O)OCH_2CH=CH_2$ | Cl | $C(=O)Me$ | O |
| D-8362 | H | single bond | Me | c-Pr | $C(=O)OCH_2CH=CH_2$ | Me | $C(=O)Me$ | O |
| D-8363 | Me | single bond | H | c-Pr | $C(=O)OCH_2CH=CH_2$ | Me | $C(=O)Me$ | O |
| D-8364 | Me(R) | single bond | H | c-Pr | $C(=O)OCH_2CH=CH_2$ | Me | $C(=O)Me$ | O |
| D-8365 | Me(S) | single bond | H | c-Pr | $C(=O)OCH_2CH=CH_2$ | Me | $C(=O)Me$ | O |
| D-8366 | H | $CH_2$ | Me | c-Pr | $C(=O)OCH_2CH=CH_2$ | Me | $C(=O)Me$ | O |

TABLE 836

| Compound Number | Y | W | Z | $R^1$ | $R^2$ | $R^3$ | $R^{10}$ | A |
|---|---|---|---|---|---|---|---|---|
| D-8367 | Me | $CH_2$ | H | c-Pr | $C(=O)OCH_2CH=CH_2$ | Me | C(=O)Me | O |
| D-8368 | H | CH(Me) | H | c-Pr | $C(=O)OCH_2CH=CH_2$ | Me | C(=O)Me | O |
| D-8369 | H | $CH_2CH_2$ | Me | c-Pr | $C(=O)OCH_2CH=CH_2$ | Me | C(=O)Me | O |
| D-8370 | Me | $CH_2CH_2$ | H | c-Pr | $C(=O)OCH_2CH=CH_2$ | Me | C(=O)Me | O |
| D-8371 | H | single bond | Me | c-Pr | $C(=O)OCH_2CCl_3$ | Cl | C(=O)Me | O |
| D-8372 | Me | single bond | H | c-Pr | $C(=O)OCH_2CCl_3$ | Cl | C(=O)Me | O |
| D-8373 | Me(R) | single bond | H | c-Pr | $C(=O)OCH_2CCl_3$ | Cl | C(=O)Me | O |
| D-8374 | Me(S) | single bond | H | c-Pr | $C(=O)OCH_2CCl_3$ | Cl | C(=O)Me | O |
| D-8375 | H | $CH_2$ | Me | c-Pr | $C(=O)OCH_2CCl_3$ | Cl | C(=O)Me | O |
| D-8376 | Me | $CH_2$ | H | c-Pr | $C(=O)OCH_2CCl_3$ | Cl | C(=O)Me | O |
| D-8377 | H | CH(Me) | H | c-Pr | $C(=O)OCH_2CCl_3$ | Cl | C(=O)Me | O |
| D-8378 | H | $CH_2CH_2$ | Me | c-Pr | $C(=O)OCH_2CCl_3$ | Cl | C(=O)Me | O |
| D-8379 | Me | $CH_2CH_2$ | H | c-Pr | $C(=O)OCH_2CCl_3$ | Cl | C(=O)Me | O |
| D-8380 | H | single bond | Me | c-Pr | $C(=O)OCH_2CCl_3$ | Me | C(=O)Me | O |
| D-8381 | Me | single bond | H | c-Pr | $C(=O)OCH_2CCl_3$ | Me | C(=O)Me | O |
| D-8382 | Me(R) | single bond | H | c-Pr | $C(=O)OCH_2CCl_3$ | Me | C(=O)Me | O |
| D-8383 | Me(S) | single bond | H | c-Pr | $C(=O)OCH_2CCl_3$ | Me | C(=O)Me | O |
| D-8384 | H | $CH_2$ | Me | c-Pr | $C(=O)OCH_2CCl_3$ | Me | C(=O)Me | O |
| D-8385 | Me | $CH_2$ | H | c-Pr | $C(=O)OCH_2CCl_3$ | Me | C(=O)Me | O |
| D-8386 | H | CH(Me) | H | c-Pr | $C(=O)OCH_2CCl_3$ | Me | C(=O)Me | O |
| D-8387 | H | $CH_2CH_2$ | Me | c-Pr | $C(=O)OCH_2CCl_3$ | Me | C(=O)Me | O |
| D-8388 | Me | $CH_2CH_2$ | H | c-Pr | $C(=O)OCH_2CCl_3$ | Me | C(=O)Me | O |
| D-8389 | H | single bond | Me | c-Pr | $C(=O)N(Me)_2$ | Cl | C(=O)Me | O |
| D-8390 | Me | single bond | H | c-Pr | $C(=O)N(Me)_2$ | Cl | C(=O)Me | O |
| D-8391 | Me(R) | single bond | H | c-Pr | $C(=O)N(Me)_2$ | Cl | C(=O)Me | O |
| D-8392 | Me(S) | single bond | H | c-Pr | $C(=O)N(Me)_2$ | Cl | C(=O)Me | O |
| D-8393 | H | $CH_2$ | Me | c-Pr | $C(=O)N(Me)_2$ | Cl | C(=O)Me | O |
| D-8394 | Me | $CH_2$ | H | c-Pr | $C(=O)N(Me)_2$ | Cl | C(=O)Me | O |
| D-8395 | H | CH(Me) | H | c-Pr | $C(=O)N(Me)_2$ | Cl | C(=O)Me | O |
| D-8396 | H | $CH_2CH_2$ | Me | c-Pr | $C(=O)N(Me)_2$ | Cl | C(=O)Me | O |
| D-8397 | Me | $CH_2CH_2$ | H | c-Pr | $C(=O)N(Me)_2$ | Cl | C(=O)Me | O |
| D-8398 | H | single bond | Me | c-Pr | $C(=O)N(Me)_2$ | Me | C(=O)Me | O |
| D-8399 | Me | single bond | H | c-Pr | $C(=O)N(Me)_2$ | Me | C(=O)Me | O |
| D-8400 | Me(R) | single bond | H | c-Pr | $C(=O)N(Me)_2$ | Me | C(=O)Me | O |
| D-8401 | Me(S) | single bond | H | c-Pr | $C(=O)N(Me)_2$ | Me | C(=O)Me | O |
| D-8402 | H | $CH_2$ | Me | c-Pr | $C(=O)N(Me)_2$ | Me | C(=O)Me | O |
| D-8403 | Me | $CH_2$ | H | c-Pr | $C(=O)N(Me)_2$ | Me | C(=O)Me | O |
| D-8404 | H | CH(Me) | H | c-Pr | $C(=O)N(Me)_2$ | Me | C(=O)Me | O |
| D-8405 | H | $CH_2CH_2$ | Me | c-Pr | $C(=O)N(Me)_2$ | Me | C(=O)Me | O |
| D-8406 | Me | $CH_2CH_2$ | H | c-Pr | $C(=O)N(Me)_2$ | Me | C(=O)Me | O |
| D-8407 | H | single bond | Me | c-Pr | $CH_2OC(=O)Me$ | Cl | C(=O)Me | O |
| D-8408 | Me | single bond | H | c-Pr | $CH_2OC(=O)Me$ | Cl | C(=O)Me | O |
| D-8409 | Me(R) | single bond | H | c-Pr | $CH_2OC(=O)Me$ | Cl | C(=O)Me | O |
| D-8410 | Me(S) | single bond | H | c-Pr | $CH_2OC(=O)Me$ | Cl | C(=O)Me | O |

TABLE 837

| Compound Number | Y | W | Z | $R^1$ | $R^2$ | $R^3$ | $R^{10}$ | A |
|---|---|---|---|---|---|---|---|---|
| D-8411 | H | $CH_2$ | Me | c-Pr | $CH_2OC(=O)Me$ | Cl | C(=O)Me | O |
| D-8412 | Me | $CH_2$ | H | c-Pr | $CH_2OC(=O)Me$ | Cl | C(=O)Me | O |
| D-8413 | H | CH(Me) | H | c-Pr | $CH_2OC(=O)Me$ | C | C(=O)Me | O |
| D-8414 | H | $CH_2CH_2$ | Me | c-Pr | $CH_2OC(=O)Me$ | Cl | C(=O)Me | O |
| D-8415 | Me | $CH_2CH_2$ | H | c-Pr | $CH_2OC(=O)Me$ | Cl | C(=O)Me | O |
| D-8416 | H | single bond | Me | c-Pr | $CH_2OC(=O)Me$ | Me | C(=O)Me | O |
| D-8417 | Me | single bond | H | c-Pr | $CH_2OC(=O)Me$ | Me | C(=O)Me | O |
| D-8418 | Me(R) | single bond | H | c-Pr | $CH_2OC(=O)Me$ | Me | C(=O)Me | O |
| D-8419 | Me(S) | single bond | H | c-Pr | $CH_2OC(=O)Me$ | Me | C(=O)Me | O |
| D-8420 | H | $CH_2$ | Me | c-Pr | $CH_2OC(=O)Me$ | Me | C(=O)Me | O |
| D-8421 | Me | $CH_2$ | H | c-Pr | $CH_2OC(=O)Me$ | Me | C(=O)Me | O |
| D-8422 | H | CH(Me) | H | c-Pr | $CH_2OC(=O)Me$ | Me | C(=O)Me | O |
| D-8423 | H | $CH_2CH_2$ | Me | c-Pr | $CH_2OC(=O)Me$ | Me | C(=O)Me | O |
| D-8424 | Me | $CH_2CH_2$ | H | c-Pr | $CH_2OC(=O)Me$ | Me | C(=O)Me | O |
| D-8425 | H | single bond | Me | c-Pr | $CH_2OC(=O)(i-Pr)$ | Cl | C(=O)Me | O |
| D-8426 | Me | single bond | H | c-Pr | $CH_2OC(=O)(i-Pr)$ | Cl | C(=O)Me | O |
| D-8427 | Me(R) | single bond | H | c-Pr | $CH_2OC(=O)(i-Pr)$ | Cl | C(=O)Me | O |
| D-8428 | Me(S) | single bond | H | c-Pr | $CH_2OC(=O)(i-Pr)$ | Cl | C(=O)Me | O |
| D-8429 | H | $CH_2$ | Me | c-Pr | $CH_2OC(=O)(i-Pr)$ | Cl | C(=O)Me | O |
| D-8430 | Me | $CH_2$ | H | c-Pr | $CH_2OC(=O)(i-Pr)$ | Cl | C(=O)Me | O |
| D-8431 | H | CH(Me) | H | c-Pr | $CH_2OC(=O)(i-Pr)$ | Cl | C(=O)Me | O |
| D-8432 | H | $CH_2CH_2$ | Me | c-Pr | $CH_2OC(=O)(i-Pr)$ | Cl | C(=O)Me | O |
| D-8433 | Me | $CH_2CH_2$ | H | c-Pr | $CH_2OC(=O)(i-Pr)$ | Cl | C(=O)Me | O |

TABLE 837-continued

| Compound Number | Y | W | Z | $R^1$ | $R^2$ | $R^3$ | $R^{10}$ | A |
|---|---|---|---|---|---|---|---|---|
| D-8434 | H | single bond | Me | c-Pr | $CH_2OC(=O)(i\text{-}Pr)$ | Me | C(=O)Me | O |
| D-8435 | Me | single bond | H | c-Pr | $CH_2OC(=O)(i\text{-}Pr)$ | Me | C(=O)Me | O |
| D-8436 | Me(R) | single bond | H | c-Pr | $CH_2OC(=O)(i\text{-}Pr)$ | Me | C(=O)Me | O |
| D-8437 | Me(S) | single bond | H | c-Pr | $CH_2OC(=O)(i\text{-}Pr)$ | Me | C(=O)Me | O |
| D-8438 | H | $CH_2$ | Me | c-Pr | $CH_2OC(=O)(i\text{-}Pr)$ | Me | C(=O)Me | O |
| D-8439 | Me | CH | H | c-Pr | $CH_2OC(=O)(i\text{-}Pr)$ | Me | C(=O)Me | O |
| D-8440 | H | CH(Me) | H | c-Pr | $CH_2OC(=O)(i\text{-}Pr)$ | Me | C(=O)Me | O |
| D-8441 | H | $CH_2CH_2$ | Me | c-Pr | $CH_2OC(=O)(i\text{-}Pr)$ | Me | C(=O)Me | O |
| D-8442 | Me | $CH_2CH_2$ | H | c-Pr | $CH_2OC(=O)(i\text{-}Pr)$ | Me | C(=O)Me | O |
| D-8443 | H | single bond | Me | c-Pr | $CH_2OC(=O)(t\text{-}Bu)$ | Cl | C(=O)Me | O |
| D-8444 | Me | single bond | H | c-Pr | $CH_2OC(=O)(t\text{-}Bu)$ | Cl | C(=O)Me | O |
| D-8445 | Me(R) | single bond | H | c-Pr | $CH_2OC(=O)(t\text{-}Bu)$ | Cl | C(=O)Me | O |
| D-8446 | Me(S) | single bond | H | c-Pr | $CH_2OC(=O)(t\text{-}Bu)$ | Cl | C(=O)Me | O |
| D-8447 | H | $CH_2$ | Me | c-Pr | $CH_2OC(=O)(t\text{-}Bu)$ | Cl | C(=O)Me | O |
| D-8448 | Me | $CH_2$ | H | c-Pr | $CH_2OC(=O)(t\text{-}Bu)$ | Cl | C(=O)Me | O |
| D-8449 | H | CH(Me) | H | c-Pr | $CH_2OC(=O)(t\text{-}Bu)$ | Cl | C(=O)Me | O |
| D-8450 | H | $CH_2CH_2$ | Me | c-Pr | $CH_2OC(=O)(t\text{-}Bu)$ | Cl | C(=O)Me | O |
| D-8451 | Me | $CH_2CH_2$ | H | c-Pr | $CH_2OC(=O)(t\text{-}Bu)$ | Cl | C(=O)Me | O |
| D-8452 | H | single bond | Me | c-Pr | $CH_2OC(=O)(t\text{-}Bu)$ | Me | C(=O)Me | O |
| D-8453 | Me | single bond | H | c-Pr | $CH_2OC(=O)(t\text{-}Bu)$ | Me | C(=O)Me | O |
| D-8454 | Me(R) | single bond | H | c-Pr | $CH_2OC(=O)(t\text{-}Bu)$ | Me | C(=O)Me | O |

TABLE 838

| Compound Number | Y | W | Z | $R^1$ | $R^2$ | $R^3$ | $R^{10}$ | A |
|---|---|---|---|---|---|---|---|---|
| D-8455 | Me(S) | single bond | H | c-Pr | $CH_2OC(=O)(t\text{-}Bu)$ | Me | C(=O)Me | O |
| D-8456 | H | $CH_2$ | Me | c-Pr | $CH_2OC(=O)(t\text{-}Bu)$ | Me | C(=O)Me | O |
| D-8457 | Me | $CH_2$ | H | c-Pr | $CH_2OC(=O)(t\text{-}Bu)$ | Me | C(=O)Me | O |
| D-8458 | H | CH(Me) | H | c-Pr | $CH_2OC(=O)(t\text{-}Bu)$ | Me | C(=O)Me | O |
| D-8459 | H | $CH_2CH_2$ | Me | c-Pr | $CH_2OC(=O)(t\text{-}Bu)$ | Me | C(=O)Me | O |
| D-8460 | Me | $CH_2CH_2$ | H | c-Pr | $CH_2OC(=O)(t\text{-}Bu)$ | Me | C(=O)Me | O |
| D-8461 | H | single bond | Me | c-Pr | $CH_2OC(=O)OEt$ | Cl | C(=O)Me | O |
| D-8462 | Me | single bond | H | c-Pr | $CH_2OC(=O)OEt$ | Cl | C(=O)Me | O |
| D-8463 | Me(R) | single bond | H | c-Pr | $CH_2OC(=O)OEt$ | Cl | C(=O)Me | O |
| D-8464 | Me(S) | single bond | H | c-Pr | $CH_2OC(=O)OEt$ | Cl | C(=O)Me | O |
| D-8465 | H | $CH_2$ | Me | c-Pr | $CH_2OC(=O)OEt$ | Cl | C(=O)Me | O |
| D-8466 | Me | $CH_2$ | H | c-Pr | $CH_2OC(=O)OEt$ | Cl | C(=O)Me | O |
| D-8467 | H | CH(Me) | H | c-Pr | $CH_2OC(=O)OEt$ | Cl | C(=O)Me | O |
| D-8468 | H | $CH_2CH_2$ | Me | c-Pr | $CH_2OC(=O)OEt$ | Cl | C(=O)Me | O |
| D-8469 | Me | $CH_2CH_2$ | H | c-Pr | $CH_2OC(=O)OEt$ | Cl | C(=O)Me | O |
| D-8470 | H | single bond | Me | c-Pr | $CH_2OC(=O)OEt$ | Me | C(=O)Me | O |
| D-8471 | Me | single bond | H | c-Pr | $CH_2OC(=O)OEt$ | Me | C(=O)Me | O |
| D-8472 | Me(R) | single bond | H | c-Pr | $CH_2OC(=O)OEt$ | Me | C(=O)Me | O |
| D-8473 | Me(S) | single bond | H | c-Pr | $CH_2OC(=O)OEt$ | Me | C(=O)Me | O |
| D-8474 | H | $CH_2$ | Me | c-Pr | $CH_2OC(=O)OEt$ | Me | C(=O)Me | O |
| D-8475 | Me | $CH_2$ | H | c-Pr | $CH_2OC(=O)OEt$ | Me | C(=O)Me | O |
| D-8476 | H | CH(Me) | H | c-Pr | $CH_2OC(=O)OEt$ | Me | C(=O)Me | O |
| D-8477 | H | $CH_2CH_2$ | Me | c-Pr | $CH_2OC(=O)OEt$ | Me | C(=O)Me | O |
| D-8478 | Me | $CH_2CH_2$ | H | c-Pr | $CH_2OC(=O)OEt$ | Me | C(=O)Me | O |
| D-8479 | H | single bond | Me | c-Pr | $CH_2OC(=O)O(i\text{-}Pr)$ | Cl | C(=O)Me | O |
| D-8480 | Me | single bond | H | c-Pr | $CH_2OC(=O)O(i\text{-}Pr)$ | Cl | C(=O)Me | O |
| D-8481 | Me(R) | single bond | H | c-Pr | $CH_2OC(=O)O(i\text{-}Pr)$ | Cl | C(=O)Me | O |
| D-8482 | Me(S) | single bond | H | c-Pr | $CH_2OC(=O)O(i\text{-}Pr)$ | Cl | C(=O)Me | O |
| D-8483 | H | $CH_2$ | Me | c-Pr | $CH_2OC(=O)O(i\text{-}Pr)$ | Cl | C(=O)Me | O |
| D-8484 | Me | $CH_2$ | H | c-Pr | $CH_2OC(=O)O(i\text{-}Pr)$ | Cl | C(=O)Me | O |
| D-8485 | H | CH(Me) | H | c-Pr | $CH_2OC(=O)O(i\text{-}Pr)$ | Cl | C(=O)Me | O |
| D-8486 | H | $CH_2CH_2$ | Me | c-Pr | $CH_2OC(=O)O(i\text{-}Pr)$ | Cl | C(=O)Me | O |
| D-8487 | Me | $CH_2CH_2$ | H | c-Pr | $CH_2OC(=O)O(i\text{-}Pr)$ | Cl | C(=O)Me | O |
| D-8488 | H | single bond | Me | c-Pr | $CH_2OC(=O)O(i\text{-}Pr)$ | Me | C(=O)Me | O |
| D-8489 | Me | single bond | H | c-Pr | $CH_2OC(=O)O(i\text{-}Pr)$ | Me | C(=O)Me | O |
| D-8490 | Me(R) | single bond | H | c-Pr | $CH_2OC(=O)O(i\text{-}Pr)$ | Me | C(=O)Me | O |
| D-8491 | Me(S) | single bond | H | c-Pr | $CH_2OC(=O)O(i\text{-}Pr)$ | Me | C(=O)Me | O |
| D-8492 | H | $CH_2$ | Me | c-Pr | $CH_2OC(=O)O(i\text{-}Pr)$ | Me | C(=O)Me | O |
| D-8493 | Me | $CH_2$ | H | c-Pr | $CH_2OC(=O)O(i\text{-}Pr)$ | Me | C(=O)Me | O |
| D-8494 | H | CH(Me) | H | c-Pr | $CH_2OC(=O)O(i\text{-}Pr)$ | Me | C(=O)Me | O |
| D-8495 | H | $CH_2CH_2$ | Me | c-Pr | $CH_2OC(=O)O(i\text{-}Pr)$ | Me | C(=O)Me | O |
| D-8496 | Me | $CH_2CH_2$ | H | c-Pr | $CH_2OC(=O)O(i\text{-}Pr)$ | Me | C(=O)Me | O |
| D-8497 | H | single bond | Me | c-Pr | $CH_2N(Me)C(=O)OMe$ | Cl | C(=O)Me | O |
| D-8498 | Me | single bond | H | c-Pr | $CH_2N(Me)C(=O)OMe$ | Cl | C(=O)Me | O |

TABLE 839

| Compound Number | Y | W | Z | $R^1$ | $R^2$ | $R^3$ | $R^{10}$ | A |
|---|---|---|---|---|---|---|---|---|
| D-8499 | Me(R) | single bond | H | c-Pr | $CH_2N(Me)C(=O)OMe$ | Cl | C(=O)Me | O |
| D-8500 | Me(S) | single bond | H | c-Pr | $CH_2N(Me)C(=O)OMe$ | Cl | C(=O)Me | O |
| D-8501 | H | $CH_2$ | Me | c-Pr | $CH_2N(Me)C(=O)OMe$ | Cl | C(=O)Me | O |
| D-8502 | Me | $CH_2$ | H | c-Pr | $CH_2N(Me)C(=O)OMe$ | Cl | C(=O)Me | O |
| D-8503 | H | CH(Me) | H | c-Pr | $CH_2N(Me)C(=O)OMe$ | Cl | C(=O)Me | O |
| D-8504 | H | $CH_2CH_2$ | Me | c-Pr | $CH_2N(Me)C(=O)OMe$ | Cl | C(=O)Me | O |
| D-8505 | Me | $CH_2CH_2$ | H | c-Pr | $CH_2N(Me)C(=O)OMe$ | Cl | C(=O)Me | O |
| D-8506 | H | single bond | Me | c-Pr | $CH_2N(Me)C(=O)OMe$ | Me | C(=O)Me | O |
| D-8507 | Me | single bond | H | c-Pr | $CH_2N(Me)C(=O)OMe$ | Me | C(=O)Me | O |
| D-8508 | Me(R) | single bond | H | c-Pr | $CH_2N(Me)C(=O)OMe$ | Me | C(=O)Me | O |
| D-8509 | Me(S) | single bond | H | c-Pr | $CH_2N(Me)C(=O)OMe$ | Me | C(=O)Me | O |
| D-8510 | H | $CH_2$ | Me | c-Pr | $CH_2N(Me)C(=O)OMe$ | Me | C(=O)Me | O |
| D-8511 | Me | $CH_2$ | H | c-Pr | $CH_2N(Me)C(=O)OMe$ | Me | C(=O)Me | O |
| D-8512 | H | CH(Me) | H | c-Pr | $CH_2N(Me)C(=O)OMe$ | Me | C(=O)Me | O |
| D-8513 | H | $CH_2CH_2$ | Me | c-Pr | $CH_2N(Me)C(=O)OMe$ | Me | C(=O)Me | O |
| D-8514 | Me | $CH_2CH_2$ | H | c-Pr | $CH_2N(Me)C(=O)OMe$ | Me | C(=O)Me | O |
| D-8515 | H | single bond | Me | c-Pr(1-CN) | $C(=O)OCH_2CH=CH_2$ | Cl | H | O |
| D-8516 | Me | single bond | H | c-Pr(1-CN) | $C(=O)OCH_2CH=CH_2$ | Cl | H | O |
| D-8517 | Me(R) | single bond | H | c-Pr(1-CN) | $C(=O)OCH_2CH=CH_2$ | Cl | H | O |
| D-8518 | Me(S) | single bond | H | c-Pr(1-CN) | $C(=O)OCH_2CH=CH_2$ | Cl | H | O |
| D-8519 | H | $CH_2$ | Me | c-Pr(1-CN) | $C(=O)OCH_2CH=CH_2$ | Cl | H | O |
| D-8520 | Me | $CH_2$ | H | c-Pr(1-CN) | $C(=O)OCH_2CH=CH_2$ | Cl | H | O |
| D-8521 | H | CH(Me) | H | c-Pr(1-CN) | $C(=O)OCH_2CH=CH_2$ | Cl | H | O |
| D-8522 | H | $CH_2CH_2$ | Me | c-Pr(1-CN) | $C(=O)OCH_2CH=CH_2$ | Cl | H | O |
| D-8523 | Me | $CH_2CH_2$ | H | c-Pr(1-CN) | $C(=O)OCH_2CH=CH_2$ | Cl | H | O |
| D-8524 | H | single bond | Me | c-Pr(1-CN) | $C(=O)OCH_2CH=CH_2$ | Me | H | O |
| D-8525 | Me | single bond | H | c-Pr(1-CN) | $C(=O)OCH_2CH=CH_2$ | Me | H | O |
| D-8526 | Me(R) | single bond | H | c-Pr(1-CN) | $C(=O)OCH_2CH=CH_2$ | Me | H | O |
| D-8527 | Me(S) | single bond | H | c-Pr(1-CN) | $C(=O)OCH_2CH=CH_2$ | Me | H | O |
| D-8528 | H | $CH_2$ | Me | c-Pr(1-CN) | $C(=O)OCH_2CH=CH_2$ | Me | H | O |
| D-8529 | Me | $CH_2$ | H | c-Pr(1-CN) | $C(=O)OCH_2CH=CH_2$ | Me | H | O |
| D-8530 | H | CH(Me) | H | c-Pr(1-CN) | $C(=O)OCH_2CH=CH_2$ | Me | H | O |
| D-8531 | H | $CH_2CH_2$ | Me | c-Pr(1-CN) | $C(=O)OCH_2CH=CH_2$ | Me | H | O |
| D-8532 | Me | $CH_2CH_2$ | H | c-Pr(1-CN) | $C(=O)OCH_2CH=CH_2$ | Me | H | O |
| D-8533 | H | single bond | Me | c-Pr(1-CN) | $C(=O)OCH_2CCl_3$ | Cl | H | O |
| D-8534 | Me | single bond | H | c-Pr(1-CN) | $C(=O)OCH_2CCl_3$ | Cl | H | O |
| D-8535 | Me(R) | single bond | H | c-Pr(1-CN) | $C(=O)OCH_2CCl_3$ | Cl | H | O |
| D-8536 | Me(S) | single bond | H | c-Pr(1-CN) | $C(=O)OCH_2CCl_3$ | Cl | H | O |
| D-8537 | H | $CH_2$ | Me | c-Pr(1-CN) | $C(=O)OCH_2CCl_3$ | Cl | H | O |
| D-8538 | Me | $CH_2$ | H | c-Pr(1-CN) | $C(=O)OCH_2CCl_3$ | Cl | H | O |
| D-8539 | H | CH(Me) | H | c-Pr(1-CN) | $C(=O)OCH_2CCl_3$ | Cl | H | O |
| D-8540 | H | $CH_2CH_2$ | Me | c-Pr(1-CN) | $C(=O)OCH_2CCl_3$ | Cl | H | O |
| D-8541 | Me | $CH_2CH_2$ | H | c-Pr(1-CN) | $C(=O)OCH_2CCl_3$ | Cl | H | O |
| D-8542 | H | single bond | Me | c-Pr(1-CN) | $C(=O)OCH_2CCl_3$ | Me | H | O |

TABLE 840

| Compound Number | Y | W | Z | $R^1$ | $R^2$ | $R^3$ | $R^{10}$ | A |
|---|---|---|---|---|---|---|---|---|
| D-8543 | Me | single bond | H | c-Pr(1-CN) | $C(=O)OCH_2CCl_3$ | Me | H | O |
| D-8544 | Me(R) | single bond | H | c-Pr(1-CN) | $C(=O)OCH_2CCl_3$ | Me | H | O |
| D-8545 | Me(S) | single bond | H | c-Pr(1-CN) | $C(=O)OCH_2CCl_3$ | Me | H | O |
| D-8546 | H | $CH_2$ | Me | c-Pr(1-CN) | $C(=O)OCH_2CCl_3$ | Me | H | O |
| D-8547 | Me | $CH_2$ | H | c-Pr(1-CN) | $C(=O)OCH_2CCl_3$ | Me | H | O |
| D-8548 | H | CH(Me) | H | c-Pr(1-CN) | $C(=O)OCH_2CCl_3$ | Me | H | O |
| D-8549 | H | $CH_2CH_2$ | Me | c-Pr(1-CN) | $C(=O)OCH_2CCl_3$ | Me | H | O |
| D-8550 | Me | $CH_2CH_2$ | H | c-Pr(1-CN) | $C(=O)OCH_2CCl_3$ | Me | H | O |
| D-8551 | H | single bond | Me | c-Pr(1-CN) | $C(=O)N(Me)_2$ | Cl | H | O |
| D-8552 | Me | single bond | H | c-Pr(1-CN) | $C(=O)N(Me)_2$ | Cl | H | O |
| D-8553 | Me(R) | single bond | H | c-Pr(1-CN) | $C(=O)N(Me)_2$ | Cl | H | O |
| D-8554 | Me(S) | single bond | H | c-Pr(1-CN) | $C(=O)N(Me)_2$ | Cl | H | O |
| D-8555 | H | $CH_2$ | Me | c-Pr(1-CN) | $C(=O)N(Me)_2$ | Cl | H | O |
| D-8556 | Me | $CH_2$ | H | c-Pr(1-CN) | $C(=O)N(Me)_2$ | Cl | H | O |
| D-8557 | H | CH(Me) | H | c-Pr(1-CN) | $C(=O)N(Me)_2$ | Cl | H | O |
| D-8558 | H | $CH_2CH_2$ | Me | c-Pr(1-CN) | $C(=O)N(Me)_2$ | Cl | H | O |
| D-8559 | Me | $CH_2CH_2$ | H | c-Pr(1-CN) | $C(=O)N(Me)_2$ | Cl | H | O |
| D-8560 | H | single bond | Me | c-Pr(1-CN) | $C(=O)N(Me)_2$ | Me | H | O |
| D-8561 | Me | single bond | H | c-Pr(1-CN) | $C(=O)N(Me)_2$ | Me | H | O |
| D-8562 | Me(R) | single bond | H | c-Pr(1-CN) | $C(=O)N(Me)_2$ | Me | H | O |
| D-8563 | Me(S) | single bond | H | c-Pr(1-CN) | $C(=O)N(Me)_2$ | Me | H | O |

TABLE 840-continued

| Compound Number | Y | W | Z | $R^1$ | $R^2$ | $R^3$ | $R^{10}$ | A |
|---|---|---|---|---|---|---|---|---|
| D-8564 | H | $CH_2$ | Me | c-Pr(1-CN) | C(═O)N(Me)$_2$ | Me | H | O |
| D-8565 | Me | $CH_2$ | H | c-Pr(1-CN) | C(═O)N(Me)$_2$ | Me | H | O |
| D-8566 | H | CH(Me) | H | c-Pr(1-CN) | C(═O)N(Me)$_2$ | Me | H | O |
| D-8567 | H | $CH_2CH_2$ | Me | c-Pr(1-CN) | C(═O)N(Me)$_2$ | Me | H | O |
| D-8568 | Me | $CH_2CH_2$ | H | c-Pr(1-CN) | C(═O)N(Me)$_2$ | Me | H | O |
| D-8569 | H | single bond | Me | c-Pr(1-CN) | $CH_2$OC(═O)Me | Cl | H | O |
| D-8570 | Me | single bond | H | c-Pr(1-CN) | $CH_2$OC(═O)Me | Cl | H | O |
| D-8571 | Me(R) | single bond | H | c-Pr(1-CN) | $CH_2$OC(═O)Me | Cl | H | O |
| D-8572 | Me(S) | single bond | H | c-Pr(1-CN) | $CH_2$OC(═O)Me | Cl | H | O |
| D-8573 | H | $CH_2$ | Me | c-Pr(1-CN) | $CH_2$OC(═O)Me | Cl | H | O |
| D-8574 | Me | $CH_2$ | H | c-Pr(1-CN) | $CH_2$OC(═O)Me | Cl | H | O |
| D-8575 | H | CH(Me) | H | c-Pr(1-CN) | $CH_2$OC(═O)Me | Cl | H | O |
| D-8576 | H | $CH_2CH_2$ | Me | c-Pr(1-CN) | $CH_2$OC(═O)Me | Cl | H | O |
| D-8577 | Me | $CH_2CH_2$ | H | c-Pr(1-CN) | $CH_2$OC(═O)Me | Cl | H | O |
| D-8578 | H | single bond | Me | c-Pr(1-CN) | $CH_2$OC(═O)Me | Me | H | O |
| D-8579 | Me | single bond | H | c-Pr(1-CN) | $CH_2$OC(═O)Me | Me | H | O |
| D-8580 | Me(R) | single bond | H | c-Pr(1-CN) | $CH_2$OC(═O)Me | Me | H | O |
| D-8581 | Me(S) | single bond | H | c-Pr(1-CN) | $CH_2$OC(═O)Me | Me | H | O |
| D-8582 | H | $CH_2$ | Me | c-Pr(1-CN) | $CH_2$OC(═O)Me | Me | H | O |
| D-8583 | Me | $CH_2$ | H | c-Pr(1-CN) | $CH_2$OC(═O)Me | Me | H | O |
| D-8584 | H | CH(Me) | H | c-Pr(1-CN) | $CH_2$OC(═O)Me | Me | H | O |
| D-8585 | H | $CH_2CH_2$ | Me | c-Pr(1-CN) | $CH_2$OC(═O)Me | Me | H | O |
| D-8586 | Me | $CH_2CH_2$ | H | c-Pr(1-CN) | $CH_2$OC(═O)Me | Me | H | O |

TABLE 841

| Compound Number | Y | W | Z | $R^1$ | $R^2$ | $R^3$ | $R^{10}$ | A |
|---|---|---|---|---|---|---|---|---|
| D-8587 | H | single bond | Me | c-Pr(1-CN) | $CH_2$OC(═O)(i-Pr) | Cl | H | O |
| D-8588 | Me | single bond | H | c-Pr(1-CN) | $CH_2$OC(═O)(i-Pr) | Cl | H | O |
| D-8589 | Me(R) | single bond | H | c-Pr(1-CN) | $CH_2$OC(═O)(i-Pr) | Cl | H | O |
| D-8590 | Me(S) | single bond | H | c-Pr(1-CN) | $CH_2$OC(═O)(i-Pr) | Cl | H | O |
| D-8591 | H | $CH_2$ | Me | c-Pr(1-CN) | $CH_2$OC(═O)(i-Pr) | Cl | H | O |
| D-8592 | Me | $CH_2$ | H | c-Pr(1-CN) | $CH_2$OC(═O)(i-Pr) | Cl | H | O |
| D-8593 | H | CH(Me) | H | c-Pr(1-CN) | $CH_2$OC(═O)(i-Pr) | Cl | H | O |
| D-8594 | H | $CH_2CH_2$ | Me | c-Pr(1-CN) | $CH_2$OC(═O)(i-Pr) | Cl | H | O |
| D-8595 | Me | $CH_2CH_2$ | H | c-Pr(1-CN) | $CH_2$OC(═O)(i-Pr) | Cl | H | O |
| D-8596 | H | single bond | Me | c-Pr(1-CN) | $CH_2$OC(═O)(i-Pr) | Me | H | O |
| D-8597 | Me | single bond | H | c-Pr(1-CN) | $CH_2$OC(═O)(i-Pr) | Me | H | O |
| D-8598 | Me(R) | single bond | H | c-Pr(1-CN) | $CH_2$OC(═O)(i-Pr) | Me | H | O |
| D-8599 | Me(S) | single bond | H | c-Pr(1-CN) | $CH_2$OC(═O)(i-Pr) | Me | H | O |
| D-8600 | H | $CH_2$ | Me | c-Pr(1-CN) | $CH_2$OC(═O)(i-Pr) | Me | H | O |
| D-8601 | Me | $CH_2$ | H | c-Pr(1-CN) | $CH_2$OC(═O)(i-Pr) | Me | H | O |
| D-8602 | H | CH(Me) | H | c-Pr(1-CN) | $CH_2$OC(═O)(i-Pr) | Me | H | O |
| D-8603 | H | $CH_2CH_2$ | Me | c-Pr(1-CN) | $CH_2$OC(═O)(i-Pr) | Me | H | O |
| D-8604 | Me | $CH_2CH_2$ | H | c-Pr(1-CN) | $CH_2$OC(═O)(i-Pr) | Me | H | O |
| D-8605 | H | single bond | Me | c-Pr(1-CN) | $CH_2$OC(═O)(t-Bu) | Cl | H | O |
| D-8606 | Me | single bond | H | c-Pr(1-CN) | $CH_2$OC(═O)(t-Bu) | Cl | H | O |
| D-8607 | Me(R) | single bond | H | c-Pr(1-CN) | $CH_2$OC(═O)(t-Bu) | Cl | H | O |
| D-8608 | Me(S) | single bond | H | c-Pr(1-CN) | $CH_2$OC(═O)(t-Bu) | Cl | H | O |
| D-8609 | H | $CH_2$ | Me | c-Pr(1-CN) | $CH_2$OC(═O)(t-Bu) | Cl | H | O |
| D-8610 | Me | $CH_2$ | H | c-Pr(1-CN) | $CH_2$OC(═O)(t-Bu) | Cl | H | O |
| D-8611 | H | CH(Me) | H | c-Pr(1-CN) | $CH_2$OC(═O)(t-Bu) | Cl | H | O |
| D-8612 | H | $CH_2CH_2$ | Me | c-Pr(1-CN) | $CH_2$OC(═O)(t-Bu) | Cl | H | O |
| D-8613 | Me | $CH_2CH_2$ | H | c-Pr(1-CN) | $CH_2$OC(═O)(t-Bu) | Cl | H | O |
| D-8614 | H | single bond | Me | c-Pr(1-CN) | $CH_2$OC(═O)(t-Bu) | Me | H | O |
| D-8615 | Me | single bond | H | c-Pr(1-CN) | $CH_2$OC(═O)(t-Bu) | Me | H | O |
| D-8616 | Me(R) | single bond | H | c-Pr(1-CN) | $CH_2$OC(═O)(t-Bu) | Me | H | O |
| D-8617 | Me(S) | single bond | H | c-Pr(1-CN) | $CH_2$OC(═O)(t-Bu) | Me | H | O |
| D-8618 | H | $CH_2$ | Me | c-Pr(1-CN) | $CH_2$OC(═O)(t-Bu) | Me | H | O |
| D-8619 | Me | $CH_2$ | H | c-Pr(1-CN) | $CH_2$OC(═O)(t-Bu) | Me | H | O |
| D-8620 | H | CH(Me) | H | c-Pr(1-CN) | $CH_2$OC(═O)(t-Bu) | Me | H | O |
| D-8621 | H | $CH_2CH_2$ | Me | c-Pr(1-CN) | $CH_2$OC(═O)(t-Bu) | Me | H | O |
| D-8622 | Me | $CH_2CH_2$ | H | c-Pr(1-CN) | $CH_2$OC(═O)(t-Bu) | Me | H | O |
| D-8623 | H | single bond | Me | c-Pr(1-CN) | $CH_2$OC(═O)OEt | Cl | H | O |
| D-8624 | Me | single bond | H | c-Pr(1-CN) | $CH_2$OC(═O)OEt | Cl | H | O |
| D-8625 | Me(R) | single bond | H | c-Pr(1-CN) | $CH_2$OC(═O)OEt | Cl | H | O |
| D-8626 | Me(S) | single bond | H | c-Pr(1-CN) | $CH_2$OC(═O)OEt | Cl | H | O |
| D-8627 | H | $CH_2$ | Me | c-Pr(1-CN) | $CH_2$OC(═O)OEt | Cl | H | O |
| D-8628 | Me | $CH_2$ | H | c-Pr(1-CN) | $CH_2$OC(═O)OEt | Cl | H | O |

TABLE 841-continued

| Compound Number | Y | W | Z | $R^1$ | $R^2$ | $R^3$ | $R^{10}$ | A |
|---|---|---|---|---|---|---|---|---|
| D-8629 | H | CH(Me) | H | c-Pr(1-CN) | $CH_2OC(=O)OEt$ | Cl | H | O |
| D-8630 | H | $CH_2CH_2$ | Me | c-Pr(1-CN) | $CH_2OC(=O)OEt$ | Cl | H | O |

TABLE 842

| Compound Number | Y | W | Z | $R^1$ | $R^2$ | $R^3$ | $R^{10}$ | A |
|---|---|---|---|---|---|---|---|---|
| D-8631 | Me | $CH_2CH_2$ | H | c-Pr(1-CN) | $CH_2OC(=O)OEt$ | Cl | H | O |
| D-8632 | H | single bond | Me | c-Pr(1-CN) | $CH_2OC(=O)OEt$ | Me | H | O |
| D-8633 | Me | single bond | H | c-Pr(1-CN) | $CH_2OC(=O)OEt$ | Me | H | O |
| D-8634 | Me(R) | single bond | H | c-Pr(1-CN) | $CH_2OC(=O)OEt$ | Me | H | O |
| D-8635 | Me(S) | single bond | H | c-Pr(1-CN) | $CH_2OC(=O)OEt$ | Me | H | O |
| D-8636 | H | $CH_2$ | Me | c-Pr(1-CN) | $CH_2OC(=O)OEt$ | Me | H | O |
| D-8637 | Me | $CH_2$ | H | c-Pr(1-CN) | $CH_2OC(=O)OEt$ | Me | H | O |
| D-8638 | H | CH(Me) | H | c-Pr(1-CN) | $CH_2OC(=O)OEt$ | Me | H | O |
| D-8639 | H | $CH_2CH_2$ | Me | c-Pr(1-CN) | $CH_2OC(=O)OEt$ | Me | H | O |
| D-8640 | Me | $CH_2CH_2$ | H | c-Pr(1-CN) | $CH_2OC(=O)OEt$ | Me | H | O |
| D-8641 | H | single bond | Me | c-Pr(1-CN) | $CH_2OC(=O)O(i-Pr)$ | Cl | H | O |
| D-8642 | Me | single bond | H | c-Pr(1-CN) | $CH_2OC(=O)O(i-Pr)$ | Cl | H | O |
| D-8643 | Me(R) | single bond | H | c-Pr(1-CN) | $CH_2OC(=O)O(i-Pr)$ | Cl | H | O |
| D-8644 | Me(S) | single bond | H | c-Pr(1-CN) | $CH_2OC(=O)O(i-Pr)$ | Cl | H | O |
| D-8645 | H | $CH_2$ | Me | c-Pr(1-CN) | $CH_2OC(=O)O(i-Pr)$ | Cl | H | O |
| D-8646 | Me | $CH_2$ | H | c-Pr(1-CN) | $CH_2OC(=O)O(i-Pr)$ | Cl | H | O |
| D-8647 | H | CH(Me) | H | c-Pr(1-CN) | $CH_2OC(=O)O(i-Pr)$ | Cl | H | O |
| D-8648 | H | $CH_2CH_2$ | Me | c-Pr(1-CN) | $CH_2OC(=O)O(i-Pr)$ | Cl | H | O |
| D-8649 | Me | $CH_2CH_2$ | H | c-Pr(1-CN) | $CH_2OC(=O)O(i-Pr)$ | Cl | H | O |
| D-8650 | H | single bond | Me | c-Pr(1-CN) | $CH_2OC(=O)O(i-Pr)$ | Me | H | O |
| D-8651 | Me | single bond | H | c-Pr(1-CN) | $CH_2OC(=O)O(i-Pr)$ | Me | H | O |
| D-8652 | Me(R) | single bond | H | c-Pr(1-CN) | $CH_2OC(=O)O(i-Pr)$ | Me | H | O |
| D-8653 | Me(S) | single bond | H | c-Pr(1-CN) | $CH_2OC(=O)O(i-Pr)$ | Me | H | O |
| D-8654 | H | $CH_2$ | Me | c-Pr(1-CN) | $CH_2OC(=O)O(i-Pr)$ | Me | H | O |
| D-8655 | Me | $CH_2$ | H | c-Pr(1-CN) | $CH_2OC(=O)O(i-Pr)$ | Me | H | O |
| D-8656 | H | CH(Me) | H | c-Pr(1-CN) | $CH_2OC(=O)O(i-Pr)$ | Me | H | O |
| D-8657 | H | $CH_2CH_2$ | Me | c-Pr(1-CN) | $CH_2OC(=O)O(i-Pr)$ | Me | H | O |
| D-8658 | Me | $CH_2CH_2$ | H | c-Pr(1-CN) | $CH_2OC(=O)O(i-Pr)$ | Me | H | O |
| D-8659 | H | single bond | Me | c-Pr(1-CN) | $CH_2N(Me)C(=O)OMe$ | Cl | H | O |
| D-8660 | Me | single bond | H | c-Pr(1-CN) | $CH_2N(Me)C(=O)OMe$ | Cl | H | O |
| D-8661 | Me(R) | single bond | H | c-Pr(1-CN) | $CH_2N(Me)C(=O)OMe$ | Cl | H | O |
| D-8662 | Me(S) | single bond | H | c-Pr(1-CN) | $CH_2N(Me)C(=O)OMe$ | Cl | H | O |
| D-8663 | H | $CH_2$ | Me | c-Pr(1-CN) | $CH_2N(Me)C(=O)OMe$ | Cl | H | O |
| D-8664 | Me | $CH_2$ | H | c-Pr(1-CN) | $CH_2N(Me)C(=O)OMe$ | Cl | H | O |
| D-8665 | H | CH(Me) | H | c-Pr(1-CN) | $CH_2N(Me)C(=O)OMe$ | Cl | H | O |
| D-8666 | H | $CH_2CH_2$ | Me | c-Pr(1-CN) | $CH_2N(Me)C(=O)OMe$ | Cl | H | O |
| D-8667 | Me | $CH_2CH_2$ | H | c-Pr(1-CN) | $CH_2N(Me)C(=O)OMe$ | Cl | H | O |
| D-8668 | H | single bond | Me | c-Pr(1-CN) | $CH_2N(Me)C(=O)OMe$ | Me | H | O |
| D-8669 | Me | single bond | H | c-Pr(1-CN) | $CH_2N(Me)C(=O)OMe$ | Me | H | O |
| D-8670 | Me(R) | single bond | H | c-Pr(1-CN) | $CH_2N(Me)C(=O)OMe$ | Me | H | O |
| D-8671 | Me(S) | single bond | H | c-Pr(1-CN) | $CH_2N(Me)C(=O)OMe$ | Me | H | O |
| D-8672 | H | CH | Me | c-Pr(1-CN) | $CH_2N(Me)C(=O)OMe$ | Me | H | O |
| D-8673 | Me | $CH_2$ | H | c-Pr(1-CN) | $CH_2N(Me)C(=O)OMe$ | Me | H | O |
| D-8674 | H | CH(Me) | H | c-Pr(1-CN) | $CH_2N(Me)C(=O)OMe$ | Me | H | O |

TABLE 843

| Compound Number | Y | W | Z | $R^1$ | $R^2$ | $R^3$ | $R^{10}$ | A |
|---|---|---|---|---|---|---|---|---|
| D-8675 | H | $CH_2CH_2$ | Me | c-Pr(1-CN) | $CH_2N(Me)C(=O)OMe$ | Me | H | O |
| D-8676 | Me | $CH_2CH_2$ | H | c-Pr(1-CN) | $CH_2N(Me)C(=O)OMe$ | Me | H | O |
| D-8677 | H | single bond | Me | c-Pr(1-CN) | $C(=O)OCH_2CH=CH_2$ | Cl | Me | O |
| D-8678 | Me | single bond | H | c-Pr(1-CN) | $C(=O)OCH_2CH=CH_2$ | Cl | Me | O |
| D-8679 | Me(R) | single bond | H | c-Pr(1-CN) | $C(=O)OCH_2CH=CH_2$ | Cl | Me | O |
| D-8680 | Me(S) | single bond | H | c-Pr(1-CN) | $C(=O)OCH_2CH=CH_2$ | Cl | Me | O |
| D-8681 | H | $CH_2$ | Me | c-Pr(1-CN) | $C(=O)OCH_2CH=CH_2$ | Cl | Me | O |
| D-8682 | Me | $CH_2$ | H | c-Pr(1-CN) | $C(=O)OCH_2CH=CH_2$ | Cl | Me | O |
| D-8683 | H | CH(Me) | H | c-Pr(1-CN) | $C(=O)OCH_2CH=CH_2$ | Cl | Me | O |
| D-8684 | H | $CH_2CH_2$ | Me | c-Pr(1-CN) | $C(=O)OCH_2CH=CH_2$ | Cl | Me | O |
| D-8685 | Me | $CH_2CH_2$ | H | c-Pr(1-CN) | $C(=O)OCH_2CH=CH_2$ | Cl | Me | O |
| D-8686 | H | single bond | Me | c-Pr(1-CN) | $C(=O)OCH_2CH=CH_2$ | Me | Me | O |

TABLE 843-continued

| Compound Number | Y | W | Z | $R^1$ | $R^2$ | $R^3$ | $R^{10}$ | A |
|---|---|---|---|---|---|---|---|---|
| D-8687 | Me | single bond | H | c-Pr(1-CN) | C(=O)OCH$_2$CH=CH$_2$ | Me | Me | O |
| D-8688 | Me(R) | single bond | H | c-Pr(1-CN) | C(=O)OCH$_2$CH=CH$_2$ | Me | Me | O |
| D-8689 | Me(S) | single bond | H | c-Pr(1-CN) | C(=O)OCH$_2$CH=CH$_2$ | Me | Me | O |
| D-8690 | H | CH$_2$ | Me | c-Pr(1-CN) | C(=O)OCH$_2$CH=CH$_2$ | Me | Me | O |
| D-8691 | Me | CH$_2$ | H | c-Pr(1-CN) | C(=O)OCH$_2$CH=CH$_2$ | Me | Me | O |
| D-8692 | H | CH(Me) | H | c-Pr(1-CN) | C(=O)OCH$_2$CH=CH$_2$ | Me | Me | O |
| D-8693 | H | CH$_2$CH$_2$ | Me | c-Pr(1-CN) | C(=O)OCH$_2$CH=CH$_2$ | Me | Me | O |
| D-8694 | Me | CH$_2$CH$_2$ | H | c-Pr(1-CN) | C(=O)OCH$_2$CH=CH$_2$ | Me | Me | O |
| D-8695 | H | single bond | Me | c-Pr(1-CN) | C(=O)OCH$_2$CCl$_3$ | Cl | Me | O |
| D-8696 | Me | single bond | H | c-Pr(1-CN) | C(=O)OCH$_2$CCl$_3$ | Cl | Me | O |
| D-8697 | Me(R) | single bond | H | c-Pr(1-CN) | C(=O)OCH$_2$CCl$_3$ | Cl | Me | O |
| D-8698 | Me(S) | single bond | H | c-Pr(1-CN) | C(=O)OCH$_2$CCl$_3$ | Cl | Me | O |
| D-8699 | H | CH$_2$ | Me | c-Pr(1-CN) | C(=O)OCH$_2$CCl$_3$ | Cl | Me | O |
| D-8700 | Me | CH$_2$ | H | c-Pr(1-CN) | C(=O)OCH$_2$CCl$_3$ | Cl | Me | O |
| D-8701 | H | CH(Me) | H | c-Pr(1-CN) | C(=O)OCH$_2$CCl$_3$ | Cl | Me | O |
| D-8702 | H | CH$_2$CH$_2$ | Me | c-Pr(1-CN) | C(=O)OCH$_2$CCl$_3$ | Cl | Me | O |
| D-8703 | Me | CH$_2$CH$_2$ | H | c-Pr(1-CN) | C(=O)OCH$_2$CCl$_3$ | Cl | Me | O |
| D-8704 | H | single bond | Me | c-Pr(1-CN) | C(=O)OCH$_2$CCl$_3$ | Me | Me | O |
| D-8705 | Me | single bond | H | c-Pr(1-CN) | C(=O)OCH$_2$CCl$_3$ | Me | Me | O |
| D-8706 | Me(R) | single bond | H | c-Pr(1-CN) | C(=O)OCH$_2$CCl$_3$ | Me | Me | O |
| D-8707 | Me(S) | single bond | H | c-Pr(1-CN) | C(=O)OCH$_2$CCl$_3$ | Me | Me | O |
| D-8708 | H | CH$_2$ | Me | c-Pr(1-CN) | C(=O)OCH$_2$CCl$_3$ | Me | Me | O |
| D-8709 | Me | CH$_2$ | H | c-Pr(1-CN) | C(=O)OCH$_2$CCl$_3$ | Me | Me | O |
| D-8710 | H | CH(Me) | H | c-Pr(1-CN) | C(=O)OCH$_2$CCl$_3$ | Me | Me | O |
| D-8711 | H | CH$_2$CH$_2$ | Me | c-Pr(1-CN) | C(=O)OCH$_2$CCl$_3$ | Me | Me | O |
| D-8712 | Me | CH$_2$CH$_2$ | H | c-Pr(1-CN) | C(=O)OCH$_2$CCl$_3$ | Me | Me | O |
| D-8713 | H | single bond | Me | c-Pr(1-CN) | C(=O)N(Me)$_2$ | Cl | Me | O |
| D-8714 | Me | single bond | H | c-Pr(1-CN) | C(=O)N(Me)$_2$ | Cl | Me | O |
| D-8715 | Me(R) | single bond | H | c-Pr(1-CN) | C(=O)N(Me)$_2$ | Cl | Me | O |
| D-8716 | Me(S) | single bond | H | c-Pr(1-CN) | C(=O)N(Me)$_2$ | Cl | Me | O |
| D-8717 | H | CH$_2$ | Me | c-Pr(1-CN) | C(=O)N(Me)$_2$ | Cl | Me | O |
| D-8718 | Me | CH$_2$ | H | c-Pr(1-CN) | C(=O)N(Me)$_2$ | Cl | Me | O |

TABLE 844

| Compound Number | Y | W | Z | $R^1$ | $R^2$ | $R^3$ | $R^{10}$ | A |
|---|---|---|---|---|---|---|---|---|
| D-8719 | H | CH(Me) | H | c-Pr(1-CN) | C(=O)N(Me)$_2$ | Cl | Me | O |
| D-8720 | H | CH$_2$CH$_2$ | Me | c-Pr(1-CN) | C(=O)N(Me)$_2$ | Cl | Me | O |
| D-8721 | Me | CH$_2$CH$_2$ | H | c-Pr(1-CN) | C(=O)N(Me)$_2$ | Cl | Me | O |
| D-8722 | H | single bond | Me | c-Pr(1-CN) | C(=O)N(Me)$_2$ | Me | Me | O |
| D-8723 | Me | single bond | H | c-Pr(1-CN) | C(=O)N(Me)$_2$ | Me | Me | O |
| D-8724 | Me(R) | single bond | H | c-Pr(1-CN) | C(=O)N(Me)$_2$ | Me | Me | O |
| D-8725 | Me(S) | single bond | H | c-Pr(1-CN) | C(=O)N(Me)$_2$ | Me | Me | O |
| D-8726 | H | CH$_2$ | Me | c-Pr(1-CN) | C(=O)N(Me)$_2$ | Me | Me | O |
| D-8727 | Me | CH$_2$ | H | c-Pr(1-CN) | C(=O)N(Me)$_2$ | Me | Me | O |
| D-8728 | H | CH(Me) | H | c-Pr(1-CN) | C(=O)N(Me)$_2$ | Me | Me | O |
| D-8729 | H | CH$_2$CH$_2$ | Me | c-Pr(1-CN) | C(=O)N(Me)$_2$ | Me | Me | O |
| D-8730 | Me | CH$_2$CH$_2$ | H | c-Pr(1-CN) | C(=O)N(Me)$_2$ | Me | Me | O |
| D-8731 | H | single bond | Me | c-Pr(1-CN) | CH$_2$OC(=O)Me | Cl | Me | O |
| D-8732 | Me | single bond | H | c-Pr(1-CN) | CH$_2$OC(=O)Me | Cl | Me | O |
| D-8733 | Me(R) | single bond | H | c-Pr(1-CN) | CH$_2$OC(=O)Me | Cl | Me | O |
| D-8734 | Me(S) | single bond | H | c-Pr(1-CN) | CH$_2$OC(=O)Me | Cl | Me | O |
| D-8735 | H | CH$_2$ | Me | c-Pr(1-CN) | CH$_2$OC(=O)Me | Cl | Me | O |
| D-8736 | Me | CH$_2$ | H | c-Pr(1-CN) | CH$_2$OC(=O)Me | Cl | Me | O |
| D-8737 | H | CH(Me) | H | c-Pr(1-CN) | CH$_2$OC(=O)Me | Cl | Me | O |
| D-8738 | H | CH$_2$CH$_2$ | Me | c-Pr(1-CN) | CH$_2$OC(=O)Me | Cl | Me | O |
| D-8739 | Me | CH$_2$CH$_2$ | H | c-Pr(1-CN) | CH$_2$OC(=O)Me | Cl | Me | O |
| D-8740 | H | single bond | Me | c-Pr(1-CN) | CH$_2$OC(=O)Me | Me | Me | O |
| D-8741 | Me | single bond | H | c-Pr(1-CN) | CH$_2$OC(=O)Me | Me | Me | O |
| D-8742 | Me(R) | single bond | H | c-Pr(1-CN) | CH$_2$OC(=O)Me | Me | Me | O |
| D-8743 | Me(S) | single bond | H | c-Pr(1-CN) | CH$_2$OC(=O)Me | Me | Me | O |
| D-8744 | H | CH$_2$ | Me | c-Pr(1-CN) | CH$_2$OC(=O)Me | Me | Me | O |
| D-8745 | Me | CH$_2$ | H | c-Pr(1-CN) | CH$_2$OC(=O)Me | Me | Me | O |
| D-8746 | H | CH(Me) | H | c-Pr(1-CN) | CH$_2$OC(=O)Me | Me | Me | O |
| D-8747 | H | CH$_2$CH$_2$ | Me | c-Pr(1-CN) | CH$_2$OC(=O)Me | Me | Me | O |
| D-8748 | Me | CH$_2$CH$_2$ | H | c-Pr(1-CN) | CH$_2$OC(=O)Me | Me | Me | O |
| D-8749 | H | single bond | Me | c-Pr(1-CN) | CH$_2$OC(=O)(i-Pr) | Cl | Me | O |
| D-8750 | Me | single bond | H | c-Pr(1-CN) | CH$_2$OC(=O)(i-Pr) | Cl | Me | O |
| D-8751 | Me(R) | single bond | H | c-Pr(1-CN) | CH$_2$OC(=O)(i-Pr) | Cl | Me | O |
| D-8752 | Me(S) | single bond | H | c-Pr(1-CN) | CH$_2$OC(=O)(i-Pr) | Cl | Me | O |
| D-8753 | H | CH$_2$ | Me | c-Pr(1-CN) | CH$_2$OC(=O)(i-Pr) | Cl | Me | O |

TABLE 844-continued

| Compound Number | Y | W | Z | $R^1$ | $R^2$ | $R^3$ | $R^{10}$ | A |
|---|---|---|---|---|---|---|---|---|
| D-8754 | Me | $CH_2$ | H | c-Pr(1-CN) | $CH_2OC(=O)(i-Pr)$ | Cl | Me | O |
| D-8755 | H | CH(Me) | H | c-Pr(1-CN) | $CH_2OC(=O)(i-Pr)$ | Cl | Me | O |
| D-8756 | H | $CH_2CH_2$ | Me | c-Pr(1-CN) | $CH_2OC(=O)(i-Pr)$ | Cl | Me | O |
| D-8757 | Me | $CH_2CH_2$ | H | c-Pr(1-CN) | $CH_2OC(=O)(i-Pr)$ | Cl | Me | O |
| D-8758 | H | single bond | Me | c-Pr(1-CN) | $CH_2OC(=O)(i-Pr)$ | Me | Me | O |
| D-8759 | Me | single bond | H | c-Pr(1-CN) | $CH_2OC(=O)(i-Pr)$ | Me | Me | O |
| D-8760 | Me(R) | single bond | H | c-Pr(1-CN) | $CH_2OC(=O)(i-Pr)$ | Me | Me | O |
| D-8761 | Me(S) | single bond | H | c-Pr(1-CN) | $CH_2OC(=O)(i-Pr)$ | Me | Me | O |
| D-8762 | H | $CH_2$ | Me | c-Pr(1-CN) | $CH_2OC(=O)(i-Pr)$ | Me | Me | O |

TABLE 845

| Compound Number | Y | W | Z | $R^1$ | $R^2$ | $R^3$ | $R^{10}$ | A |
|---|---|---|---|---|---|---|---|---|
| D-8763 | Me | $CH_2$ | H | c-Pr(1-CN) | $CH_2OC(=O)(i-Pr)$ | Me | Me | O |
| D-8764 | H | CH(Me) | H | c-Pr(1-CN) | $CH_2OC(=O)(i-Pr)$ | Me | Me | O |
| D-8765 | H | $CH_2CH_2$ | Me | c-Pr(1-CN) | $CH_2OC(=O)(i-Pr)$ | Me | Me | O |
| D-8766 | Me | $CH_2CH_2$ | H | c-Pr(1-CN) | $CH_2OC(=O)(i-Pr)$ | Me | Me | O |
| D-8767 | H | single bond | Me | c-Pr(1-CN) | $CH_2OC(=O)(t-Bu)$ | Cl | Me | O |
| D-8768 | Me | single bond | H | c-Pr(1-CN) | $CH_2OC(=O)(t-Bu)$ | Cl | Me | O |
| D-8769 | Me(R) | single bond | H | c-Pr(1-CN) | $CH_2OC(=O)(t-Bu)$ | Cl | Me | O |
| D-8770 | Me(S) | single bond | H | c-Pr(1-CN) | $CH_2OC(=O)(t-Bu)$ | Cl | Me | O |
| D-8771 | H | $CH_2$ | Me | c-Pr(1-CN) | $CH_2OC(=O)(t-Bu)$ | Cl | Me | O |
| D-8772 | Me | $CH_2$ | H | c-Pr(1-CN) | $CH_2OC(=O)(t-Bu)$ | Cl | Me | O |
| D-8773 | H | CH(Me) | H | c-Pr(1-CN) | $CH_2OC(=O)(t-Bu)$ | Cl | Me | O |
| D-8774 | H | $CH_2CH_2$ | Me | c-Pr(1-CN) | $CH_2OC(=O)(t-Bu)$ | Cl | Me | O |
| D-8775 | Me | $CH_2CH_2$ | H | c-Pr(1-CN) | $CH_2OC(=O)(t-Bu)$ | Cl | Me | O |
| D-8776 | H | single bond | Me | c-Pr(1-CN) | $CH_2OC(=O)(t-Bu)$ | Me | Me | O |
| D-8777 | Me | single bond | H | c-Pr(1-CN) | $CH_2OC(=O)(t-Bu)$ | Me | Me | O |
| D-8778 | Me(R) | single bond | H | c-Pr(1-CN) | $CH_2OC(=O)(t-Bu)$ | Me | Me | O |
| D-8779 | Me(S) | single bond | H | c-Pr(1-CN) | $CH_2OC(=O)(t-Bu)$ | Me | Me | O |
| D-8780 | H | $CH_2$ | Me | c-Pr(1-CN) | $CH_2OC(=O)(t-Bu)$ | Me | Me | O |
| D-8781 | Me | $CH_2$ | H | c-Pr(1-CN) | $CH_2OC(=O)(t-Bu)$ | Me | Me | O |
| D-8782 | H | CH(Me) | H | c-Pr(1-CN) | $CH_2OC(=O)(t-Bu)$ | Me | Me | O |
| D-8783 | H | $CH_2CH_2$ | Me | c-Pr(1-CN) | $CH_2OC(=O)(t-Bu)$ | Me | Me | O |
| D-8784 | Me | $CH_2CH_2$ | H | c-Pr(1-CN) | $CH_2OC(=O)(t-Bu)$ | Me | Me | O |
| D-8785 | H | single bond | Me | c-Pr(1-CN) | $CH_2OC(=O)OEt$ | Cl | Me | O |
| D-8786 | Me | single bond | H | c-Pr(1-CN) | $CH_2OC(=O)OEt$ | Cl | Me | O |
| D-8787 | Me(R) | single bond | H | c-Pr(1-CN) | $CH_2OC(=O)OEt$ | Cl | Me | O |
| D-8788 | Me(S) | single bond | H | c-Pr(1-CN) | $CH_2OC(=O)OEt$ | Cl | Me | O |
| D-8789 | H | $CH_2$ | Me | c-Pr(1-CN) | $CH_2OC(=O)OEt$ | Cl | Me | O |
| D-8790 | Me | $CH_2$ | H | c-Pr(1-CN) | $CH_2OC(=O)OEt$ | Cl | Me | O |
| D-8791 | H | CH(Me) | H | c-Pr(1-CN) | $CH_2OC(=O)OEt$ | Cl | Me | O |
| D-8792 | H | $CH_2CH_2$ | Me | c-Pr(1-CN) | $CH_2OC(=O)OEt$ | Cl | Me | O |
| D-8793 | Me | $CH_2CH_2$ | H | c-Pr(1-CN) | $CH_2OC(=O)OEt$ | Cl | Me | O |
| D-8794 | H | single bond | Me | c-Pr(1-CN) | $CH_2OC(=O)OEt$ | Me | Me | O |
| D-8795 | Me | single bond | H | c-Pr(1-CN) | $CH_2OC(=O)OEt$ | Me | Me | O |
| D-8796 | Me(R) | single bond | H | c-Pr(1-CN) | $CH_2OC(=O)OEt$ | Me | Me | O |
| D-8797 | Me(S) | single bond | H | c-Pr(1-CN) | $CH_2OC(=O)OEt$ | Me | Me | O |
| D-8798 | H | $CH_2$ | Me | c-Pr(1-CN) | $CH_2OC(=O)OEt$ | Me | Me | O |
| D-8799 | Me | $CH_2$ | H | c-Pr(1-CN) | $CH_2OC(=O)OEt$ | Me | Me | O |
| D-8800 | H | CH(Me) | H | c-Pr(1-CN) | $CH_2OC(=O)OEt$ | Me | Me | O |
| D-8801 | H | $CH_2CH_2$ | Me | c-Pr(1-CN) | $CH_2OC(=O)OEt$ | Me | Me | O |
| D-8802 | Me | $CH_2CH_2$ | H | c-Pr(1-CN) | $CH_2OC(=O)OEt$ | Me | Me | O |
| D-8803 | H | single bond | Me | c-Pr(1-CN) | $CH_2OC(=O)O(i-Pr)$ | Cl | Me | O |
| D-8804 | Me | single bond | H | c-Pr(1-CN) | $CH_2OC(=O)O(i-Pr)$ | Cl | Me | O |
| D-8805 | Me(R) | single bond | H | c-Pr(1-CN) | $CH_2OC(=O)O(i-Pr)$ | Cl | Me | O |
| D-8806 | Me(S) | single bond | H | c-Pr(1-CN) | $CH_2OC(=O)O(i-Pr)$ | Cl | Me | O |

TABLE 846

| Compound Number | Y | W | Z | $R^1$ | $R^2$ | $R^3$ | $R^{10}$ | A |
|---|---|---|---|---|---|---|---|---|
| D-8807 | H | $CH_2$ | Me | c-Pr(1-CN) | $CH_2OC(=O)O(i-Pr)$ | Cl | Me | O |
| D-8808 | Me | $CH_2$ | H | c-Pr(1-CN) | $CH_2OC(=O)O(i-Pr)$ | Cl | Me | O |
| D-8809 | H | CH(Me) | H | c-Pr(1-CN) | $CH_2OC(=O)O(i-Pr)$ | Cl | Me | O |

TABLE 846-continued

| Compound Number | Y | W | Z | $R^1$ | $R^2$ | $R^3$ | $R^{10}$ | A |
|---|---|---|---|---|---|---|---|---|
| D-8810 | H | $CH_2CH_2$ | Me | c-Pr(1-CN) | $CH_2OC(=O)O(i\text{-}Pr)$ | Cl | Me | O |
| D-8811 | Me | $CH_2CH_2$ | H | c-Pr(1-CN) | $CH_2OC(=O)O(i\text{-}Pr)$ | Cl | Me | O |
| D-8812 | H | single bond | Me | c-Pr(1-CN) | $CH_2OC(=O)O(i\text{-}Pr)$ | Me | Me | O |
| D-8813 | Me | single bond | H | c-Pr(1-CN) | $CH_2OC(=O)O(i\text{-}Pr)$ | Me | Me | O |
| D-8814 | Me(R) | single bond | H | c-Pr(1-CN) | $CH_2OC(=O)O(i\text{-}Pr)$ | Me | Me | O |
| D-8815 | Me(S) | single bond | H | c-Pr(1-CN) | $CH_2OC(=O)O(i\text{-}Pr)$ | Me | Me | O |
| D-8816 | H | $CH_2$ | Me | c-Pr(1-CN) | $CH_2OC(=O)O(i\text{-}Pr)$ | Me | Me | O |
| D-8817 | Me | $CH_2$ | H | c-Pr(1-CN) | $CH_2OC(=O)O(i\text{-}Pr)$ | Me | Me | O |
| D-8818 | H | CH(Me) | H | c-Pr(1-CN) | $CH_2OC(=O)O(i\text{-}Pr)$ | Me | Me | O |
| D-8819 | H | $CH_2CH_2$ | Me | c-Pr(1-CN) | $CH_2OC(=O)O(i\text{-}Pr)$ | Me | Me | O |
| D-8820 | Me | $CH_2CH_2$ | H | c-Pr(1-CN) | $CH_2OC(=O)O(i\text{-}Pr)$ | Me | Me | O |
| D-8821 | H | single bond | Me | c-Pr(1-CN) | $CH_2N(Me)C(=O)OMe$ | Cl | Me | O |
| D-8822 | Me | single bond | H | c-Pr(1-CN) | $CH_2N(Me)C(=O)OMe$ | Cl | Me | O |
| D-8823 | Me(R) | single bond | H | c-Pr(1-CN) | $CH_2N(Me)C(=O)OMe$ | Cl | Me | O |
| D-8824 | Me(S) | single bond | H | c-Pr(1-CN) | $CH_2N(Me)C(=O)OMe$ | Cl | Me | O |
| D-8825 | H | $CH_2$ | Me | c-Pr(1-CN) | $CH_2N(Me)C(=O)OMe$ | Cl | Me | O |
| D-8826 | Me | $CH_2$ | H | c-Pr(1-CN) | $CH_2N(Me)C(=O)OMe$ | Cl | Me | O |
| D-8827 | H | CH(Me) | H | c-Pr(1-CN) | $CH_2N(Me)C(=O)OMe$ | Cl | Me | O |
| D-8828 | H | $CH_2CH_2$ | Me | c-Pr(1-CN) | $CH_2N(Me)C(=O)OMe$ | Cl | Me | O |
| D-8829 | Me | $CH_2CH_2$ | H | c-Pr(1-CN) | $CH_2N(Me)C(=O)OMe$ | Cl | Me | O |
| D-8830 | H | single bond | Me | c-Pr(1-CN) | $CH_2N(Me)C(=O)OMe$ | Me | Me | O |
| D-8831 | Me | single bond | H | c-Pr(1-CN) | $CH_2N(Me)C(=O)OMe$ | Me | Me | O |
| D-8832 | Me(R) | single bond | H | c-Pr(1-CN) | $CH_2N(Me)C(=O)OMe$ | Me | Me | O |
| D-8833 | Me(S) | single bond | H | c-Pr(1-CN) | $CH_2N(Me)C(=O)OMe$ | Me | Me | O |
| D-8834 | H | $CH_2$ | Me | c-Pr(1-CN) | $CH_2N(Me)C(=O)OMe$ | Me | Me | O |
| D-8835 | Me | $CH_2$ | H | c-Pr(1-CN) | $CH_2N(Me)C(=O)OMe$ | Me | Me | O |
| D-8836 | H | CH(Me) | H | c-Pr(1-CN) | $CH_2N(Me)C(=O)OMe$ | Me | Me | O |
| D-8837 | H | $CH_2CH_2$ | Me | c-Pr(1-CN) | $CH_2N(Me)C(=O)OMe$ | Me | Me | O |
| D-8838 | Me | $CH_2CH_2$ | H | c-Pr(1-CN) | $CH_2N(Me)C(=O)OMe$ | Me | Me | O |
| D-8839 | H | single bond | Me | c-Pr(1-CN) | $C(=O)OCH_2CH=CH_2$ | Cl | $CH_2OMe$ | O |
| D-8840 | Me | single bond | H | c-Pr(1-CN) | $C(=O)OCH_2CH=CH_2$ | Cl | $CH_2OMe$ | O |
| D-8841 | Me(R) | single bond | H | c-Pr(1-CN) | $C(=O)OCH_2CH=CH_2$ | Cl | $CH_2OMe$ | O |
| D-8842 | Me(S) | single bond | H | c-Pr(1-CN) | $C(=O)OCH_2CH=CH_2$ | Cl | $CH_2OMe$ | O |
| D-8843 | H | $CH_2$ | Me | c-Pr(1-CN) | $C(=O)OCH_2CH=CH_2$ | Cl | $CH_2OMe$ | O |
| D-8844 | Me | $CH_2$ | H | c-Pr(1-CN) | $C(=O)OCH_2CH=CH_2$ | Cl | $CH_2OMe$ | O |
| D-8845 | H | CH(Me) | H | c-Pr(1-CN) | $C(=O)OCH_2CH=CH_2$ | Cl | $CH_2OMe$ | O |
| D-8846 | H | $CH_2CH_2$ | Me | c-Pr(1-CN) | $C(=O)OCH_2CH=CH_2$ | Cl | $CH_2OMe$ | O |
| D-8847 | Me | $CH_2CH_2$ | H | c-Pr(1-CN) | $C(=O)OCH_2CH=CH_2$ | Cl | $CH_2OMe$ | O |
| D-8848 | H | single bond | Me | c-Pr(1-CN) | $C(=O)OCH_2CH=CH_2$ | Me | $CH_2OMe$ | O |
| D-8849 | Me | single bond | H | c-Pr(1-CN) | $C(=O)OCH_2CH=CH_2$ | Me | $CH_2OMe$ | O |
| D-8850 | Me(R) | single bond | H | c-Pr(1-CN) | $C(=O)OCH_2CH=CH_2$ | Me | $CH_2OMe$ | O |

TABLE 847

| Compound Number | Y | W | Z | $R^1$ | $R^2$ | $R^3$ | $R^{10}$ | A |
|---|---|---|---|---|---|---|---|---|
| D-8851 | Me(S) | single bond | H | c-Pr(1-CN) | $C(=O)OCH_2CH=CH_2$ | Me | $CH_2OMe$ | O |
| D-8852 | H | $CH_2$ | Me | c-Pr(1-CN) | $C(=O)OCH_2CH=CH_2$ | Me | $CH_2OMe$ | O |
| D-8853 | Me | $CH_2$ | H | c-Pr(1-CN) | $C(=O)OCH_2CH=CH_2$ | Me | $CH_2OMe$ | O |
| D-8854 | H | CH(Me) | H | c-Pr(1-CN) | $C(=O)OCH_2CH=CH_2$ | Me | $CH_2OMe$ | O |
| D-8855 | H | $CH_2CH_2$ | Me | c-Pr(1-CN) | $C(=O)OCH_2CH=CH_2$ | Me | $CH_2OMe$ | O |
| D-8856 | Me | $CH_2CH_2$ | H | c-Pr(1-CN) | $C(=O)OCH_2CH=CH_2$ | Me | $CH_2OMe$ | O |
| D-8857 | H | single bond | Me | c-Pr(1-CN) | $C(=O)OCH_2CCl_3$ | Cl | $CH_2OMe$ | O |
| D-8858 | Me | single bond | H | c-Pr(1-CN) | $C(=O)OCH_2CCl_3$ | Cl | $CH_2OMe$ | O |
| D-8859 | Me(R) | single bond | H | c-Pr(1-CN) | $C(=O)OCH_2CCl_3$ | Cl | $CH_2OMe$ | O |
| D-8860 | Me(S) | single bond | H | c-Pr(1-CN) | $C(=O)OCH_2CCl_3$ | Cl | $CH_2OMe$ | O |
| D-8861 | H | $CH_2$ | Me | c-Pr(1-CN) | $C(=O)OCH_2CCl_3$ | Cl | $CH_2OMe$ | O |
| D-8862 | Me | $CH_2$ | H | c-Pr(1-CN) | $C(=O)OCH_2CCl_3$ | Cl | $CH_2OMe$ | O |
| D-8863 | H | CH(Me) | H | c-Pr(1-CN) | $C(=O)OCH_2CCl_3$ | Cl | $CH_2OMe$ | O |
| D-8864 | H | $CH_2CH_2$ | Me | c-Pr(1-CN) | $C(=O)OCH_2CCl_3$ | Cl | $CH_2OMe$ | O |
| D-8865 | Me | $CH_2CH_2$ | H | c-Pr(1-CN) | $C(=O)OCH_2CCl_3$ | Cl | $CH_2OMe$ | O |
| D-8866 | H | single bond | Me | c-Pr(1-CN) | $C(=O)OCH_2CCl_3$ | Me | $CH_2OMe$ | O |
| D-8867 | Me | single bond | H | c-Pr(1-CN) | $C(=O)OCH_2CCl_3$ | Me | $CH_2OMe$ | O |
| D-8868 | Me(R) | single bond | H | c-Pr(1-CN) | $C(=O)OCH_2CCl_3$ | Me | $CH_2OMe$ | O |
| D-8869 | Me(S) | single bond | H | c-Pr(1-CN) | $C(=O)OCH_2CCl_3$ | Me | $CH_2OMe$ | O |
| D-8870 | H | $CH_2$ | Me | c-Pr(1-CN) | $C(=O)OCH_2CCl_3$ | Me | $CH_2OMe$ | O |
| D-8871 | Me | $CH_2$ | H | c-Pr(1-CN) | $C(=O)OCH_2CCl_3$ | Me | $CH_2OMe$ | O |
| D-8872 | H | CH(Me) | H | c-Pr(1-CN) | $C(=O)OCH_2CCl_3$ | Me | $CH_2OMe$ | O |
| D-8873 | H | $CH_2CH_2$ | Me | c-Pr(1-CN) | $C(=O)OCH_2CCl_3$ | Me | $CH_2OMe$ | O |
| D-8874 | Me | $CH_2CH_2$ | H | c-Pr(1-CN) | $C(=O)OCH_2CCl_3$ | Me | $CH_2OMe$ | O |
| D-8875 | H | single bond | Me | c-Pr(1-CN) | $C(=O)N(Me)_2$ | Cl | $CH_2OMe$ | O |
| D-8876 | Me | single bond | H | c-Pr(1-CN) | $C(=O)N(Me)_2$ | Cl | $CH_2OMe$ | O |

TABLE 847-continued

| Compound Number | Y | W | Z | $R^1$ | $R^2$ | $R^3$ | $R^{10}$ | A |
|---|---|---|---|---|---|---|---|---|
| D-8877 | Me(R) | single bond | H | c-Pr(1-CN) | C(=O)N(Me)$_2$ | Cl | CH$_2$OMe | O |
| D-8878 | Me(S) | single bond | H | c-Pr(1-CN) | C(=O)N(Me)$_2$ | Cl | CH$_2$OMe | O |
| D-8879 | H | CH$_2$ | Me | c-Pr(1-CN) | C(=O)N(Me)$_2$ | Cl | CH$_2$OMe | O |
| D-8880 | Me | CH$_2$ | H | c-Pr(1-CN) | C(=O)N(Me)$_2$ | Cl | CH$_2$OMe | O |
| D-8881 | H | CH(Me) | H | c-Pr(1-CN) | C(=O)N(Me)$_2$ | Cl | CH$_2$OMe | O |
| D-8882 | H | CH$_2$CH$_2$ | Me | c-Pr(1-CN) | C(=O)N(Me)$_2$ | Cl | CH$_2$OMe | O |
| D-8883 | Me | CH$_2$CH$_2$ | H | c-Pr(1-CN) | C(=O)N(Me)$_2$ | Cl | CH$_2$OMe | O |
| D-8884 | H | single bond | Me | c-Pr(1-CN) | C(=O)N(Me)$_2$ | Me | CH$_2$OMe | O |
| D-8885 | Me | single bond | H | c-Pr(1-CN) | C(=O)N(Me)$_2$ | Me | CH$_2$OMe | O |
| D-8886 | Me(R) | single bond | H | c-Pr(1-CN) | C(=O)N(Me)$_2$ | Me | CH$_2$OMe | O |
| D-8887 | Me(S) | single bond | H | c-Pr(1-CN) | C(=O)N(Me)$_2$ | Me | CH$_2$OMe | O |
| D-8888 | H | CH$_2$ | Me | c-Pr(1-CN) | C(=O)N(Me)$_2$ | Me | CH$_2$OMe | O |
| D-8889 | Me | CH$_2$ | H | c-Pr(1-CN) | C(=O)N(Me)$_2$ | Me | CH$_2$OMe | O |
| D-8890 | H | CH(Me) | H | c-Pr(1-CN) | C(=O)N(Me)$_2$ | Me | CH$_2$OMe | O |
| D-8891 | H | CH$_2$CH$_2$ | Me | c-Pr(1-CN) | C(=O)N(Me)$_2$ | Me | CH$_2$OMe | O |
| D-8892 | Me | CH$_2$CH$_2$ | H | c-Pr(1-CN) | C(=O)N(Me)$_2$ | Me | CH$_2$OMe | O |
| D-8893 | H | single bond | Me | c-Pr(1-CN) | CH$_2$OC(=O)Me | Cl | CH$_2$OMe | O |
| D-8894 | Me | single bond | H | c-Pr(1-CN) | CH$_2$OC(=O)Me | Cl | CH$_2$OMe | O |

TABLE 848

| Compound Number | Y | W | Z | $R^1$ | $R^2$ | $R^3$ | $R^{10}$ | A |
|---|---|---|---|---|---|---|---|---|
| D-8895 | Me(R) | single bond | H | c-Pr(1-CN) | CH$_2$OC(=O)Me | Cl | CH$_2$OMe | O |
| D-8896 | Me(S) | single bond | H | c-Pr(1-CN) | CH$_2$OC(=O)Me | Cl | CH$_2$OMe | O |
| D-8897 | H | CH$_2$ | Me | c-Pr(1-CN) | CH$_2$OC(=O)Me | Cl | CH$_2$OMe | O |
| D-8898 | Me | CH$_2$ | H | c-Pr(1-CN) | CH$_2$OC(=O)Me | Cl | CH$_2$OMe | O |
| D-8899 | H | CH(Me) | H | c-Pr(1-CN) | CH$_2$OC(=O)Me | Cl | CH$_2$OMe | O |
| D-8900 | H | CH$_2$CH$_2$ | Me | c-Pr(1-CN) | CH$_2$OC(=O)Me | Cl | CH$_2$OMe | O |
| D-8901 | Me | CH$_2$CH$_2$ | H | c-Pr(1-CN) | CH$_2$OC(=O)Me | Cl | CH$_2$OMe | O |
| D-8902 | H | single bond | Me | c-Pr(1-CN) | CH$_2$OC(=O)Me | Me | CH$_2$OMe | O |
| D-8903 | Me | single bond | H | c-Pr(1-CN) | CH$_2$OC(=O)Me | Me | CH$_2$OMe | O |
| D-8904 | Me(R) | single bond | H | c-Pr(1-CN) | CH$_2$OC(=O)Me | Me | CH$_2$OMe | O |
| D-8905 | Me(S) | single bond | H | c-Pr(1-CN) | CH$_2$OC(=O)Me | Me | CH$_2$OMe | O |
| D-8906 | H | CH$_2$ | Me | c-Pr(1-CN) | CH$_2$OC(=O)Me | Me | CH$_2$OMe | O |
| D-8907 | Me | CH$_2$ | H | c-Pr(1-CN) | CH$_2$OC(=O)Me | Me | CH$_2$OMe | O |
| D-8908 | H | CH(Me) | H | c-Pr(1-CN) | CH$_2$OC(=O)Me | Me | CH$_2$OMe | O |
| D-8909 | H | CH$_2$CH$_2$ | Me | c-Pr(1-CN) | CH$_2$OC(=O)Me | Me | CH$_2$OMe | O |
| D-8910 | Me | CH$_2$CH$_2$ | H | c-Pr(1-CN) | CH$_2$OC(=O)Me | Me | CH$_2$OMe | O |
| D-8911 | H | single bond | Me | c-Pr(1-CN) | CH$_2$OC(=O)(i-Pr) | Cl | CH$_2$OMe | O |
| D-8912 | Me | single bond | H | c-Pr(1-CN) | CH$_2$OC(=O)(i-Pr) | Cl | CH$_2$OMe | O |
| D-8913 | Me(R) | single bond | H | c-Pr(1-CN) | CH$_2$OC(=O)(i-Pr) | Cl | CH$_2$OMe | O |
| D-8914 | Me(S) | single bond | H | c-Pr(1-CN) | CH$_2$OC(=O)(i-Pr) | Cl | CH$_2$OMe | O |
| D-8915 | H | CH$_2$ | Me | c-Pr(1-CN) | CH$_2$OC(=O)(i-Pr) | Cl | CH$_2$OMe | O |
| D-8916 | Me | CH$_2$ | H | c-Pr(1-CN) | CH$_2$OC(=O)(i-Pr) | Cl | CH$_2$OMe | O |
| D-8917 | H | CH(Me) | H | c-Pr(1-CN) | CH$_2$OC(=O)(i-Pr) | Cl | CH$_2$OMe | O |
| D-8918 | H | CH$_2$CH$_2$ | Me | c-Pr(1-CN) | CH$_2$OC(=O)(i-Pr) | Cl | CH$_2$OMe | O |
| D-8919 | Me | CH$_2$CH$_2$ | H | c-Pr(1-CN) | CH$_2$OC(=O)(i-Pr) | Cl | CH$_2$OMe | O |
| D-8920 | H | single bond | Me | c-Pr(1-CN) | CH$_2$OC(=O)(i-Pr) | Me | CH$_2$OMe | O |
| D-8921 | Me | single bond | H | c-Pr(1-CN) | CH$_2$OC(=O)(i-Pr) | Me | CH$_2$OMe | O |
| D-8922 | Me(R) | single bond | H | c-Pr(1-CN) | CH$_2$OC(=O)(i-Pr) | Me | CH$_2$OMe | O |
| D-8923 | Me(S) | single bond | H | c-Pr(1-CN) | CH$_2$OC(=O)(i-Pr) | Me | CH$_2$OMe | O |
| D-8924 | H | CH$_2$ | Me | c-Pr(1-CN) | CH$_2$OC(=O)(i-Pr) | Me | CH$_2$OMe | O |
| D-8925 | Me | CH$_2$ | H | c-Pr(1-CN) | CH$_2$OC(=O)(i-Pr) | Me | CH$_2$OMe | O |
| D-8926 | H | CH(Me) | H | c-Pr(1-CN) | CH$_2$OC(=O)(i-Pr) | Me | CH$_2$OMe | O |
| D-8927 | H | CH$_2$CH$_2$ | Me | c-Pr(1-CN) | CH$_2$OC(=O)(i-Pr) | Me | CH$_2$OMe | O |
| D-8928 | Me | CH$_2$CH$_2$ | H | c-Pr(1-CN) | CH$_2$OC(=O)(i-Pr) | Me | CH$_2$OMe | O |
| D-8929 | H | single bond | Me | c-Pr(1-CN) | CH$_2$OC(=O)(t-Bu) | Cl | CH$_2$OMe | O |
| D-8930 | Me | single bond | H | c-Pr(1-CN) | CH$_2$OC(=O)(t-Bu) | Cl | CH$_2$OMe | O |
| D-8931 | Me(R) | single bond | H | c-Pr(1-CN) | CH$_2$OC(=O)(t-Bu) | Cl | CH$_2$OMe | O |
| D-8932 | Me(S) | single bond | H | c-Pr(1-CN) | CH$_2$OC(=O)(t-Bu) | Cl | CH$_2$OMe | O |
| D-8933 | H | CH$_2$ | Me | c-Pr(1-CN) | CH$_2$OC(=O)(t-Bu) | Cl | CH$_2$OMe | O |
| D-8934 | Me | CH$_2$ | H | c-Pr(1-CN) | CH$_2$OC(=O)(t-Bu) | Cl | CH$_2$OMe | O |
| D-8935 | H | CH(Me) | H | c-Pr(1-CN) | CH$_2$OC(=O)(t-Bu) | Cl | CH$_2$OMe | O |
| D-8936 | H | CH$_2$CH$_2$ | Me | c-Pr(1-CN) | CH$_2$OC(=O)(t-Bu) | Cl | CH$_2$OMe | O |
| D-8937 | Me | CH$_2$CH$_2$ | H | c-Pr(1-CN) | CH$_2$OC(=O)(t-Bu) | Cl | CH$_2$OMe | O |
| D-8938 | H | single bond | Me | c-Pr(1-CN) | CH$_2$OC(=O)(t-Bu) | Me | CH$_2$OMe | O |

TABLE 849

| Compound Number | Y | W | Z | $R^1$ | $R^2$ | $R^3$ | $R^{10}$ | A |
|---|---|---|---|---|---|---|---|---|
| D-8939 | Me | single bond | H | c-Pr(1-CN) | $CH_2OC(=O)(t-Bu)$ | Me | $CH_2OMe$ | O |
| D-8940 | Me(R) | single bond | H | c-Pr(1-CN) | $CH_2OC(=O)(t-Bu)$ | Me | $CH_2OMe$ | O |
| D-8941 | Me(S) | single bond | H | c-Pr(1-CN) | $CH_2OC(=O)(t-Bu)$ | Me | $CH_2OMe$ | O |
| D-8942 | H | $CH_2$ | Me | c-Pr(1-CN) | $CH_2OC(=O)(t-Bu)$ | Me | $CH_2OMe$ | O |
| D-8943 | Me | $CH_2$ | H | c-Pr(1-CN) | $CH_2OC(=O)(t-Bu)$ | Me | $CH_2OMe$ | O |
| D-8944 | H | CH(Me) | H | c-Pr(1-CN) | $CH_2OC(=O)(t-Bu)$ | Me | $CH_2OMe$ | O |
| D-8945 | H | $CH_2CH_2$ | Me | c-Pr(1-CN) | $CH_2OC(=O)(t-Bu)$ | Me | $CH_2OMe$ | O |
| D-8946 | Me | $CH_2CH_2$ | H | c-Pr(1-CN) | $CH_2OC(=O)(t-Bu)$ | Me | $CH_2OMe$ | O |
| D-8947 | H | single bond | Me | c-Pr(1-CN) | $CH_2OC(=O)OEt$ | Cl | $CH_2OMe$ | O |
| D-8948 | Me | single bond | H | c-Pr(1-CN) | $CH_2OC(=O)OEt$ | Cl | $CH_2OMe$ | O |
| D-8949 | Me(R) | single bond | H | c-Pr(1-CN) | $CH_2OC(=O)OEt$ | Cl | $CH_2OMe$ | O |
| D-8950 | Me(S) | single bond | H | c-Pr(1-CN) | $CH_2OC(=O)OEt$ | Cl | $CH_2OMe$ | O |
| D-8951 | H | $CH_2$ | Me | c-Pr(1-CN) | $CH_2OC(=O)OEt$ | Cl | $CH_2OMe$ | O |
| D-8952 | Me | $CH_2$ | H | c-Pr(1-CN) | $CH_2OC(=O)OEt$ | Cl | $CH_2OMe$ | O |
| D-8953 | H | CH(Me) | H | c-Pr(1-CN) | $CH_2OC(=O)OEt$ | Cl | $CH_2OMe$ | O |
| D-8954 | H | $CH_2CH_2$ | Me | c-Pr(1-CN) | $CH_2OC(=O)OEt$ | Cl | $CH_2OMe$ | O |
| D-8955 | Me | $CH_2CH_2$ | H | c-Pr(1-CN) | $CH_2OC(=O)OEt$ | Cl | $CH_2OMe$ | O |
| D-8956 | H | single bond | Me | c-Pr(1-CN) | $CH_2OC(=O)OEt$ | Me | $CH_2OMe$ | O |
| D-8957 | Me | single bond | H | c-Pr(1-CN) | $CH_2OC(=O)OEt$ | Me | $CH_2OMe$ | O |
| D-8958 | Me(R) | single bond | H | c-Pr(1-CN) | $CH_2OC(=O)OEt$ | Me | $CH_2OMe$ | O |
| D-8959 | Me(S) | single bond | H | c-Pr(1-CN) | $CH_2OC(=O)OEt$ | Me | $CH_2OMe$ | O |
| D-8960 | H | $CH_2$ | Me | c-Pr(1-CN) | $CH_2OC(=O)OEt$ | Me | $CH_2OMe$ | O |
| D-8961 | Me | $CH_2$ | H | c-Pr(1-CN) | $CH_2OC(=O)OEt$ | Me | $CH_2OMe$ | O |
| D-8962 | H | CH(Me) | H | c-Pr(1-CN) | $CH_2OC(=O)OEt$ | Me | $CH_2OMe$ | O |
| D-8963 | H | $CH_2CH_2$ | Me | c-Pr(1-CN) | $CH_2OC(=O)OEt$ | Me | $CH_2OMe$ | O |
| D-8964 | Me | $CH_2CH_2$ | H | c-Pr(1-CN) | $CH_2OC(=O)OEt$ | Me | $CH_2OMe$ | O |
| D-8965 | H | single bond | Me | c-Pr(1-CN) | $CH_2OC(=O)O(i-Pr)$ | Cl | $CH_2OMe$ | O |
| D-8966 | Me | single bond | H | c-Pr(1-CN) | $CH_2OC(=O)O(i-Pr)$ | Cl | $CH_2OMe$ | O |
| D-8967 | Me(R) | single bond | H | c-Pr(1-CN) | $CH_2OC(=O)O(i-Pr)$ | Cl | $CH_2OMe$ | O |
| D-8968 | Me(S) | single bond | H | c-Pr(1-CN) | $CH_2OC(=O)O(i-Pr)$ | Cl | $CH_2OMe$ | O |
| D-8969 | H | $CH_2$ | Me | c-Pr(1-CN) | $CH_2OC(=O)O(i-Pr)$ | Cl | $CH_2OMe$ | O |
| D-8970 | Me | $CH_2$ | H | c-Pr(1-CN) | $CH_2OC(=O)O(i-Pr)$ | Cl | $CH_2OMe$ | O |
| D-8971 | H | CH(Me) | H | c-Pr(1-CN) | $CH_2OC(=O)O(i-Pr)$ | Cl | $CH_2OMe$ | O |
| D-8972 | H | $CH_2CH_2$ | Me | c-Pr(1-CN) | $CH_2OC(=O)O(i-Pr)$ | Cl | $CH_2OMe$ | O |
| D-8973 | Me | $CH_2CH_2$ | H | c-Pr(1-CN) | $CH_2OC(=O)O(i-Pr)$ | Cl | $CH_2OMe$ | O |
| D-8974 | H | single bond | Me | c-Pr(1-CN) | $CH_2OC(=O)O(i-Pr)$ | Me | $CH_2OMe$ | O |
| D-8975 | Me | single bond | H | c-Pr(1-CN) | $CH_2OC(=O)O(i-Pr)$ | Me | $CH_2OMe$ | O |
| D-8976 | Me(R) | single bond | H | c-Pr(1-CN) | $CH_2OC(=O)O(i-Pr)$ | Me | $CH_2OMe$ | O |
| D-8977 | Me(S) | single bond | H | c-Pr(1-CN) | $CH_2OC(=O)O(i-Pr)$ | Me | $CH_2OMe$ | O |
| D-8978 | H | $CH_2$ | Me | c-Pr(1-CN) | $CH_2OC(=O)O(i-Pr)$ | Me | $CH_2OMe$ | O |
| D-8979 | Me | $CH_2$ | H | c-Pr(1-CN) | $CH_2OC(=O)O(i-Pr)$ | Me | $CH_2OMe$ | O |
| D-8980 | H | CH(Me) | H | c-Pr(1-CN) | $CH_2OC(=O)O(i-Pr)$ | Me | $CH_2OMe$ | O |
| D-8981 | H | $CH_2CH_2$ | Me | c-Pr(1-CN) | $CH_2OC(=O)O(i-Pr)$ | Me | $CH_2OMe$ | O |
| D-8982 | Me | $CH_2CH_2$ | H | c-Pr(1-CN) | $CH_2OC(=O)O(i-Pr)$ | Me | $CH_2OMe$ | O |

TABLE 850

| Compound Number | Y | W | Z | $R^1$ | $R^2$ | $R^3$ | $R^{10}$ | A |
|---|---|---|---|---|---|---|---|---|
| D-8983 | H | single bond | Me | c-Pr(1-CN) | $CH_2N(Me)C(=O)OMe$ | Cl | $CH_2OMe$ | O |
| D-8984 | Me | single bond | H | c-Pr(1-CN) | $CH_2N(Me)C(=O)OMe$ | Cl | $CH_2OMe$ | O |
| D-8985 | Me(R) | single bond | H | c-Pr(1-CN) | $CH_2N(Me)C(=O)OMe$ | Cl | $CH_2OMe$ | O |
| D-8986 | Me(S) | single bond | H | c-Pr(1-CN) | $CH_2N(Me)C(=O)OMe$ | Cl | $CH_2OMe$ | O |
| D-8987 | H | $CH_2$ | Me | c-Pr(1-CN) | $CH_2N(Me)C(=O)OMe$ | Cl | $CH_2OMe$ | O |
| D-8988 | Me | $CH_2$ | H | c-Pr(1-CN) | $CH_2N(Me)C(=O)OMe$ | Cl | $CH_2OMe$ | O |
| D-8989 | H | CH(Me) | H | c-Pr(1-CN) | $CH_2N(Me)C(=O)OMe$ | Cl | $CH_2OMe$ | O |
| D-8990 | H | $CH_2CH_2$ | Me | c-Pr(1-CN) | $CH_2N(Me)C(=O)OMe$ | Cl | $CH_2OMe$ | O |
| D-8991 | Me | $CH_2CH_2$ | H | c-Pr(1-CN) | $CH_2N(Me)C(=O)OMe$ | Cl | $CH_2OMe$ | O |
| D-8992 | H | single bond | Me | c-Pr(1-CN) | $CH_2N(Me)C(=O)OMe$ | Me | $CH_2OMe$ | O |
| D-8993 | Me | single bond | H | c-Pr(1-CN) | $CH_2N(Me)C(=O)OMe$ | Me | $CH_2OMe$ | O |
| D-8994 | Me(R) | single bond | H | c-Pr(1-CN) | $CH_2N(Me)C(=O)OMe$ | Me | $CH_2OMe$ | O |
| D-8995 | Me(S) | single bond | H | c-Pr(1-CN) | $CH_2N(Me)C(=O)OMe$ | Me | $CH_2OMe$ | O |
| D-8996 | H | $CH_2$ | Me | c-Pr(1-CN) | $CH_2N(Me)C(=O)OMe$ | Me | $CH_2OMe$ | O |
| D-8997 | Me | $CH_2$ | H | c-Pr(1-CN) | $CH_2N(Me)C(=O)OMe$ | Me | $CH_2OMe$ | O |
| D-8998 | H | CH(Me) | H | c-Pr(1-CN) | $CH_2N(Me)C(=O)OMe$ | Me | $CH_2OMe$ | O |
| D-8999 | H | $CH_2CH_2$ | Me | c-Pr(1-CN) | $CH_2N(Me)C(=O)OMe$ | Me | $CH_2OMe$ | O |
| D-9000 | Me | $CH_2CH_2$ | H | c-Pr(1-CN) | $CH_2N(Me)C(=O)OMe$ | Me | $CH_2OMe$ | O |
| 0-9001 | H | single bond | Me | c-Pr(1-CN) | $C(=O)OCH_2CH=CH_2$ | Cl | $CH_2CN$ | O |
| D-9002 | Me | single bond | H | c-Pr(1-CN) | $C(=O)OCH_2CH=CH_2$ | Cl | $CH_2CN$ | O |
| D-9003 | Me(R) | single bond | H | c-Pr(1-CN) | $C(=O)OCH_2CH=CH_2$ | Cl | $CH_2CN$ | O |
| D-9004 | Me(S) | single bond | H | c-Pr(1-CN) | $C(=O)OCH_2CH=CH_2$ | Cl | $CH_2CN$ | O |
| D-9005 | H | $CH_2$ | Me | c-Pr(1-CN) | $C(=O)OCH_2CH=CH_2$ | Cl | $CH_2CN$ | O |

TABLE 850-continued

| Compound Number | Y | W | Z | $R^1$ | $R^2$ | $R^3$ | $R^{10}$ | A |
|---|---|---|---|---|---|---|---|---|
| D-9006 | Me | $CH_2$ | H | c-Pr(1-CN) | $C(=O)OCH_2CH=CH_2$ | Cl | $CH_2CN$ | O |
| D-9007 | H | CH(Me) | H | c-Pr(1-CN) | $C(=O)OCH_2CH=CH_2$ | Cl | $CH_2CN$ | O |
| D-9008 | H | $CH_2CH_2$ | Me | c-Pr(1-CN) | $C(=O)OCH_2CH=CH_2$ | Cl | $CH_2CN$ | O |
| D-9009 | Me | $CH_2CH_2$ | H | c-Pr(1-CN) | $C(=O)OCH_2CH=CH_2$ | Cl | $CH_2CN$ | O |
| D-9010 | H | single bond | Me | c-Pr(1-CN) | $C(=O)OCH_2CH=CH_2$ | Me | $CH_2CN$ | O |
| D-9011 | Me | single bond | H | c-Pr(1-CN) | $C(=O)OCH_2CH=CH_2$ | Me | $CH_2CN$ | O |
| D-9012 | Me(R) | single bond | H | c-Pr(1-CN) | $C(=O)OCH_2CH=CH_2$ | Me | $CH_2CN$ | O |
| D-9013 | Me(S) | single bond | H | c-Pr(1-CN) | $C(=O)OCH_2CH=CH_2$ | Me | $CH_2CN$ | O |
| D-9014 | H | $CH_2$ | Me | c-Pr(1-CN) | $C(=O)OCH_2CH=CH_2$ | Me | $CH_2CN$ | O |
| D-9015 | Me | $CH_2$ | H | c-Pr(1-CN) | $C(=O)OCH_2CH=CH_2$ | Me | $CH_2CN$ | O |
| D-9016 | H | CH(Me) | H | c-Pr(1-CN) | $C(=O)OCH_2CH=CH_2$ | Me | $CH_2CN$ | O |
| D-9017 | H | $CH_2CH_2$ | Me | c-Pr(1-CN) | $C(=O)OCH_2CH=CH_2$ | Me | $CH_2CN$ | O |
| D-9018 | Me | $CH_2CH_2$ | H | c-Pr(1-CN) | $C(=O)OCH_2CH=CH_2$ | Me | $CH_2CN$ | O |
| D-9019 | H | single bond | Me | c-Pr(1-CN) | $C(=O)OCH_2CCl_3$ | Cl | $CH_2CN$ | O |
| D-9020 | Me | single bond | H | c-Pr(1-CN) | $C(=O)OCH_2CCl_3$ | Cl | $CH_2CN$ | O |
| D-9021 | Me(R) | single bond | H | c-Pr(1-CN) | $C(=O)OCH_2CCl_3$ | Cl | $CH_2CN$ | O |
| D-9022 | Me(S) | single bond | H | c-Pr(1-CN) | $C(=O)OCH_2CCl_3$ | Cl | $CH_2CN$ | O |
| D-9023 | H | $CH_2$ | Me | c-Pr(1-CN) | $C(=O)OCH_2CCl_3$ | Cl | $CH_2CN$ | O |
| D-9024 | Me | $CH_2$ | H | c-Pr(1-CN) | $C(=O)OCH_2CCl_3$ | Cl | $CH_2CN$ | O |
| D-9025 | H | CH(Me) | H | c-Pr(1-CN) | $C(=O)OCH_2CCl_3$ | Cl | $CH_2CN$ | O |
| D-9026 | H | $CH_2CH_2$ | Me | c-Pr(1-CN) | $C(=O)OCH_2CCl_3$ | Cl | $CH_2CN$ | O |

TABLE 851

| Compound Number | Y | W | Z | $R^1$ | $R^2$ | $R^3$ | $R^{10}$ | A |
|---|---|---|---|---|---|---|---|---|
| D-9027 | Me | $CH_2CH_2$ | H | c-Pr(1-CN) | $C(=O)OCH_2CCl_3$ | Cl | $CH_2CN$ | O |
| D-9028 | H | single bond | Me | c-Pr(1-CN) | $C(=O)OCH_2CCl_3$ | Me | $CH_2CN$ | O |
| D-9029 | Me | single bond | H | c-Pr(1-CN) | $C(=O)OCH_2CCl_3$ | Me | $CH_2CN$ | O |
| D-9030 | Me(R) | single bond | H | c-Pr(1-CN) | $C(=O)OCH_2CCl_3$ | Me | $CH_2CN$ | O |
| D-9031 | Me(S) | single bond | H | c-Pr(1-CN) | $C(=O)OCH_2CCl_3$ | Me | $CH_2CN$ | O |
| D-9032 | H | $CH_2$ | Me | c-Pr(1-CN) | $C(=O)OCH_2CCl_3$ | Me | $CH_2CN$ | O |
| D-9033 | Me | $CH_2$ | H | c-Pr(1-CN) | $C(=O)OCH_2CCl_3$ | Me | $CH_2CN$ | O |
| D-9034 | H | CH(Me) | H | c-Pr(1-CN) | $C(=O)OCH_2CCl_3$ | Me | $CH_2CN$ | O |
| D-9035 | H | $CH_2CH_2$ | Me | c-Pr(1-CN) | $C(=O)OCH_2CCl_3$ | Me | $CH_2CN$ | O |
| D-9036 | Me | $CH_2CH_2$ | H | c-Pr(1-CN) | $C(=O)OCH_2CCl_3$ | Me | $CH_2CN$ | O |
| D-9037 | H | single bond | Me | c-Pr(1-CN) | $C(=O)N(Me)_2$ | Cl | $CH_2CN$ | O |
| D-9038 | Me | single bond | H | c-Pr(1-CN) | $C(=O)N(Me)_2$ | Cl | $CH_2CN$ | O |
| D-9039 | Me(R) | single bond | H | c-Pr(1-CN) | $C(=O)N(Me)_2$ | Cl | $CH_2CN$ | O |
| D-9040 | Me(S) | single bond | H | c-Pr(1-CN) | $C(=O)N(Me)_2$ | Cl | $CH_2CN$ | O |
| D-9041 | H | $CH_2$ | Me | c-Pr(1-CN) | $C(=O)N(Me)_2$ | Cl | $CH_2CN$ | O |
| D-9042 | Me | $CH_2$ | H | c-Pr(1-CN) | $C(=O)N(Me)_2$ | Cl | $CH_2CN$ | O |
| D-9043 | H | CH(Me) | H | c-Pr(1-CN) | $C(=O)N(Me)_2$ | Cl | $CH_2CN$ | O |
| D-9044 | H | $CH_2CH_2$ | Me | c-Pr(1-CN) | $C(=O)N(Me)_2$ | Cl | $CH_2CN$ | O |
| D-9045 | Me | $CH_2CH_2$ | H | c-Pr(1-CN) | $C(=O)N(Me)_2$ | Cl | $CH_2CN$ | O |
| D-9046 | H | single bond | Me | c-Pr(1-CN) | $C(=O)N(Me)_2$ | Me | $CH_2CN$ | O |
| D-9047 | Me | single bond | H | c-Pr(1-CN) | $C(=O)N(Me)_2$ | Me | $CH_2CN$ | O |
| D-9048 | Me(R) | single bond | H | c-Pr(1-CN) | $C(=O)N(Me)_2$ | Me | $CH_2CN$ | O |
| D-9049 | Me(S) | single bond | H | c-Pr(1-CN) | $C(=O)N(Me)_2$ | Me | $CH_2CN$ | O |
| D-9050 | H | $CH_2$ | Me | c-Pr(1-CN) | $C(=O)N(Me)_2$ | Me | $CH_2CN$ | O |
| D-9051 | Me | $CH_2$ | H | c-Pr(1-CN) | $C(=O)N(Me)_2$ | Me | $CH_2CN$ | O |
| D-9052 | H | CH(Me) | H | c-Pr(1-CN) | $C(=O)N(Me)_2$ | Me | $CH_2CN$ | O |
| D-9053 | H | $CH_2CH_2$ | Me | c-Pr(1-CN) | $C(=O)N(Me)_2$ | Me | $CH_2CN$ | O |
| D-9054 | Me | $CH_2CH_2$ | H | c-Pr(1-CN) | $C(=O)N(Me)_2$ | Me | $CH_2CN$ | O |
| D-9055 | H | single bond | Me | c-Pr(1-CN) | $CH_2OC(=O)Me$ | Cl | $CH_2CN$ | O |
| D-9056 | Me | single bond | H | c-Pr(1-CN) | $CH_2OC(=O)Me$ | Cl | $CH_2CN$ | O |
| D-9057 | Me(R) | single bond | H | c-Pr(1-CN) | $CH_2OC(=O)Me$ | Cl | $CH_2CN$ | O |
| D-9058 | Me(S) | single bond | H | c-Pr(1-CN) | $CH_2OC(=O)Me$ | Cl | $CH_2CN$ | O |
| D-9059 | H | $CH_2$ | Me | c-Pr(1-CN) | $CH_2OC(=O)Me$ | Cl | $CH_2CN$ | O |
| D-9060 | Me | CH | H | c-Pr(1-CN) | $CH_2OC(=O)Me$ | Cl | $CH_2CN$ | O |
| D-9061 | H | CH(Me) | H | c-Pr(1-CN) | $CH_2OC(=O)Me$ | Cl | $CH_2CN$ | O |
| D-9062 | H | $CH_2CH_2$ | Me | c-Pr(1-CN) | $CH_2OC(=O)Me$ | Cl | $CH_2CN$ | O |
| D-9063 | Me | $CH_2CH_2$ | H | c-Pr(1-CN) | $CH_2OC(=O)Me$ | Cl | $CH_2CN$ | O |
| D-9064 | H | single bond | Me | c-Pr(1-CN) | $CH_2OC(=O)Me$ | Me | $CH_2CN$ | O |
| D-9065 | Me | single bond | H | c-Pr(1-CN) | $CH_2OC(=O)Me$ | Me | $CH_2CN$ | O |
| D-9066 | Me(R) | single bond | H | c-Pr(1-CN) | $CH_2OC(=O)Me$ | Me | $CH_2CN$ | O |
| D-9067 | Me(S) | single bond | H | c-Pr(1-CN) | $CH_2OC(=O)Me$ | Me | $CH_2CN$ | O |
| D-9068 | H | CH | Me | c-Pr(1-CN) | $CH_2OC(=O)Me$ | Me | $CH_2CN$ | O |
| D-9069 | Me | $CH_2$ | H | c-Pr(1-CN) | $CH_2OC(=O)Me$ | Me | $CH_2CN$ | O |
| D-9070 | H | CH(Me) | H | c-Pr(1-CN) | $CH_2OC(=O)Me$ | Me | $CH_2CN$ | O |

TABLE 852

| Compound Number | Y | W | Z | $R^1$ | $R^2$ | $R^3$ | $R^{10}$ | A |
|---|---|---|---|---|---|---|---|---|
| D-9071 | H | $CH_2CH_2$ | Me | c-Pr(1-CN) | $CH_2OC(=O)Me$ | Me | $CH_2CN$ | O |
| D-9072 | Me | $CH_2CH_2$ | H | c-Pr(1-CN) | $CH_2OC(=O)Me$ | Me | $CH_2CN$ | O |
| D-9073 | H | single bond | Me | c-Pr(1-CN) | $CH_2OC(=O)$(i-Pr) | Cl | $CH_2CN$ | O |
| D-9074 | Me | single bond | H | c-Pr(1-CN) | $CH_2OC(=O)$(i-Pr) | Cl | $CH_2CN$ | O |
| D-9075 | Me(R) | single bond | H | c-Pr(1-CN) | $CH_2OC(=O)$(i-Pr) | Cl | $CH_2CN$ | O |
| D-9076 | Me(S) | single bond | H | c-Pr(1-CN) | $CH_2OC(=O)$(i-Pr) | Cl | $CH_2CN$ | O |
| D-9077 | H | $CH_2$ | Me | c-Pr(1-CN) | $CH_2OC(=O)$(i-Pr) | Cl | $CH_2CN$ | O |
| D-9078 | Me | $CH_2$ | H | c-Pr(1-CN) | $CH_2OC(=O)$(i-Pr) | Cl | $CH_2CN$ | O |
| D-9079 | H | CH(Me) | H | c-Pr(1-CN) | $CH_2OC(=O)$(i-Pr) | Cl | $CH_2CN$ | O |
| D-9080 | H | $CH_2CH_2$ | Me | c-Pr(1-CN) | $CH_2OC(=O)$(i-Pr) | Cl | $CH_2CN$ | O |
| D-9081 | Me | $CH_2CH_2$ | H | c-Pr(1-CN) | $CH_2OC(=O)$(/-Pr) | Cl | $CH_2CN$ | O |
| D-9082 | H | single bond | Me | c-Pr(1-CN) | $CH_2OC(=O)$(i-Pr) | Me | $CH_2CN$ | O |
| D-9083 | Me | single bond | H | c-Pr(1-CN) | $CH_2OC(=O)$(i-Pr) | Me | $CH_2CN$ | O |
| D-9084 | Me(R) | single bond | H | c-Pr(1-CN) | $CH_2OC(=O)$(i-Pr) | Me | $CH_2CN$ | O |
| D-9085 | Me(S) | single bond | H | c-Pr(1-CN) | $CH_2OC(=O)$(i-Pr) | Me | $CH_2CN$ | O |
| D-9086 | H | $CH_2$ | Me | c-Pr(1-CN) | $CH_2OC(=O)$(i-Pr) | Me | $CH_2CN$ | O |
| D-9087 | Me | $CH_2$ | H | c-Pr(1-CN) | $CH_2OC(=O)$(i-Pr) | Me | $CH_2CN$ | O |
| D-9088 | H | CH(Me) | H | c-Pr(1-CN) | $CH_2OC(=O)$(i-Pr) | Me | $CH_2CN$ | O |
| D-9089 | H | $CH_2CH_2$ | Me | c-Pr(1-CN) | $CH_2OC(=O)$(i-Pr) | Me | $CH_2CN$ | O |
| D-9090 | Me | $CH_2CH_2$ | H | c-Pr(1-CN) | $CH_2OC(=O)$(i-Pr) | Me | $CH_2CN$ | O |
| D-9091 | H | single bond | Me | c-Pr(1-CN) | $CH_2OC(=O)$(t-Bu) | Cl | $CH_2CN$ | O |
| D-9092 | Me | single bond | H | c-Pr(1-CN) | $CH_2OC(=O)$(t-Bu) | Cl | $CH_2CN$ | O |
| D-9093 | Me(R) | single bond | H | c-Pr(1-CN) | $CH_2OC(=O)$(t-Bu) | Cl | $CH_2CN$ | O |
| D-9094 | Me(S) | single bond | H | c-Pr(1-CN) | $CH_2OC(=O)$(t-Bu) | Cl | $CH_2CN$ | O |
| D-9095 | H | $CH_2$ | Me | c-Pr(1-CN) | $CH_2OC(=O)$(t-Bu) | Cl | $CH_2CN$ | O |
| D-9096 | Me | $CH_2$ | H | c-Pr(1-CN) | $CH_2OC(=O)$(t-Bu) | Cl | $CH_2CN$ | O |
| D-9097 | H | CH(Me) | H | c-Pr(1-CN) | $CH_2OC(=O)$(t-Bu) | Cl | $CH_2CN$ | O |
| D-9098 | H | $CH_2CH_2$ | Me | c-Pr(1-CN) | $CH_2OC(=O)$(t-Bu) | Cl | $CH_2CN$ | O |
| D-9099 | Me | $CH_2CH_2$ | H | c-Pr(1-CN) | $CH_2OC(=O)$(t-Bu) | Cl | $CH_2CN$ | O |
| D-9100 | H | single bond | Me | c-Pr(1-CN) | $CH_2OC(=O)$(t-Bu) | Me | $CH_2CN$ | O |
| D-9101 | Me | single bond | H | c-Pr(1-CN) | $CH_2OC(=O)$(t-Bu) | Me | $CH_2CN$ | O |
| D-9102 | Me(R) | single bond | H | c-Pr(1-CN) | $CH_2OC(=O)$(t-Bu) | Me | $CH_2CN$ | O |
| D-9103 | Me(S) | single bond | H | c-Pr(1-CN) | $CH_2OC(=O)$(t-Bu) | Me | $CH_2CN$ | O |
| D-9104 | H | $CH_2$ | Me | c-Pr(1-CN) | $CH_2OC(=O)$(t-Bu) | Me | $CH_2CN$ | O |
| D-9105 | Me | $CH_2$ | H | c-Pr(1-CN) | $CH_2OC(=O)$(t-Bu) | Me | $CH_2CN$ | O |
| D-9106 | H | CH(Me) | H | c-Pr(1-CN) | $CH_2OC(=O)$(t-Bu) | Me | $CH_2CN$ | O |
| D-9107 | H | $CH_2CH_2$ | Me | c-Pr(1-CN) | $CH_2OC(=O)$(t-Bu) | Me | $CH_2CN$ | O |
| D-9108 | Me | $CH_2CH_2$ | H | c-Pr(1-CN) | $CH_2OC(=O)$(t-Bu) | Me | $CH_2CN$ | O |
| D-9109 | H | single bond | Me | c-Pr(1-CN) | $CH_2OC(=O)OEt$ | Cl | $CH_2CN$ | O |
| D-9110 | Me | single bond | H | c-Pr(1-CN) | $CH_2OC(=O)OEt$ | Cl | $CH_2CN$ | O |
| D-9111 | Me(R) | single bond | H | c-Pr(1-CN) | $CH_2OC(=O)OEt$ | Cl | $CH_2CN$ | O |
| D-9112 | Me(S) | single bond | H | c-Pr(1-CN) | $CH_2OC(=O)OEt$ | Cl | $CH_2CN$ | O |
| D-9113 | H | $CH_2$ | Me | c-Pr(1-CN) | $CH_2OC(=O)OEt$ | Cl | $CH_2CN$ | O |
| D-9114 | Me | $CH_2$ | H | c-Pr(1-CN) | $CH_2OC(=O)OEt$ | Cl | $CH_2CN$ | O |

TABLE 853

| Compound Number | Y | W | Z | $R^1$ | $R^2$ | $R^3$ | $R^{10}$ | A |
|---|---|---|---|---|---|---|---|---|
| D-9115 | H | CH(Me) | H | c-Pr(1-CN) | $CH_2OC(=O)OEt$ | Cl | $CH_2CN$ | O |
| D-9116 | H | $CH_2CH_2$ | Me | c-Pr(1-CN) | $CH_2OC(=O)OEt$ | Cl | $CH_2CN$ | O |
| D-9117 | Me | $CH_2CH_2$ | H | c-Pr(1-CN) | $CH_2OC(=O)OEt$ | Cl | $CH_2CN$ | O |
| D-9118 | H | single bond | Me | c-Pr(1-CN) | $CH_2OC(=O)OEt$ | Me | $CH_2CN$ | O |
| D-9119 | Me | single bond | H | c-Pr(1-CN) | $CH_2OC(=O)OEt$ | Me | $CH_2CN$ | O |
| D-9120 | Me(R) | single bond | H | c-Pr(1-CN) | $CH_2OC(=O)OEt$ | Me | $CH_2CN$ | O |
| D-9121 | Me(S) | single bond | H | c-Pr(1-CN) | $CH_2OC(=O)OEt$ | Me | $CH_2CN$ | O |
| D-9122 | H | $CH_2$ | Me | c-Pr(1-CN) | $CH_2OC(=O)OEt$ | Me | $CH_2CN$ | O |
| D-9123 | Me | $CH_2$ | H | c-Pr(1-CN) | $CH_2OC(=O)OEt$ | Me | $CH_2CN$ | O |
| D-9124 | H | CH(Me) | H | c-Pr(1-CN) | $CH_2OC(=O)OEt$ | Me | $CH_2CN$ | O |
| D-9125 | H | $CH_2CH_2$ | Me | c-Pr(1-CN) | $CH_2OC(=O)OEt$ | Me | $CH_2CN$ | O |
| D-9126 | Me | $CH_2CH_2$ | H | c-Pr(1-CN) | $CH_2OC(=O)OEt$ | Me | $CH_2CN$ | O |
| D-9127 | H | single bond | Me | c-Pr(1-CN) | $CH_2OC(=O)O$(i-Pr) | Cl | $CH_2CN$ | O |
| D-9128 | Me | single bond | H | c-Pr(1-CN) | $CH_2OC(=O)O$(i-Pr) | Cl | $CH_2CN$ | O |
| D-9129 | Me(R) | single bond | H | c-Pr(1-CN) | $CH_2OC(=O)O$(i-Pr) | Cl | $CH_2CN$ | O |
| D-9130 | Me(S) | single bond | H | c-Pr(1-CN) | $CH_2OC(=O)O$(i-Pr) | Cl | $CH_2CN$ | O |
| D-9131 | H | $CH_2$ | Me | c-Pr(1-CN) | $CH_2OC(=O)O$(i-Pr) | Cl | $CH_2CN$ | O |
| D-9132 | Me | $CH_2$ | H | c-Pr(1-CN) | $CH_2OC(=O)O$(i-Pr) | Cl | $CH_2CN$ | O |
| D-9133 | H | CH(Me) | H | c-Pr(1-CN) | $CH_2OC(=O)O$(i-Pr) | Cl | $CH_2CN$ | O |
| D-9134 | H | $CH_2CH_2$ | Me | c-Pr(1-CN) | $CH_2OC(=O)O$(i-Pr) | Cl | $CH_2CN$ | O |
| D-9135 | Me | $CH_2CH_2$ | H | c-Pr(1-CN) | $CH_2OC(=O)O$(i-Pr) | Cl | $CH_2CN$ | O |

TABLE 853-continued

| Compound Number | Y | W | Z | $R^1$ | $R^2$ | $R^3$ | $R^{10}$ | A |
|---|---|---|---|---|---|---|---|---|
| D-9136 | H | single bond | Me | c-Pr(1-CN) | $CH_2OC(=O)O(i-Pr)$ | Me | $CH_2CN$ | O |
| D-9137 | Me | single bond | H | c-Pr(1-CN) | $CH_2OC(=O)O(i-Pr)$ | Me | $CH_2CN$ | O |
| D-9138 | Me(R) | single bond | H | c-Pr(1-CN) | $CH_2OC(=O)O(i-Pr)$ | Me | $CH_2CN$ | O |
| D-9139 | Me(S) | single bond | H | c-Pr(1-CN) | $CH_2OC(=O)O(i-Pr)$ | Me | $CH_2CN$ | O |
| D-9140 | H | $CH_2$ | Me | c-Pr(1-CN) | $CH_2OC(=O)O(i-Pr)$ | Me | $CH_2CN$ | O |
| D-9141 | Me | $CH_2$ | H | c-Pr(1-CN) | $CH_2OC(=O)O(i-Pr)$ | Me | $CH_2CN$ | O |
| D-9142 | H | CH(Me) | H | c-Pr(1-CN) | $CH_2OC(=O)O(i-Pr)$ | Me | $CH_2CN$ | O |
| D-9143 | H | $CH_2CH_2$ | Me | c-Pr(1-CN) | $CH_2OC(=O)O(i-Pr)$ | Me | $CH_2CN$ | O |
| D-9144 | Me | $CH_2CH_2$ | H | c-Pr(1-CN) | $CH_2OC(=O)O(i-Pr)$ | Me | $CH_2CN$ | O |
| D-9145 | H | single bond | Me | c-Pr(1-CN) | $CH_2N(Me)C(=O)OMe$ | Cl | $CH_2CN$ | O |
| D-9146 | Me | single bond | H | c-Pr(1-CN) | $CH_2N(Me)C(=O)OMe$ | Cl | $CH_2CN$ | O |
| D-9147 | Me(R) | single bond | H | c-Pr(1-CN) | $CH_2N(Me)C(=O)OMe$ | Cl | $CH_2CN$ | O |
| D-9148 | Me(S) | single bond | H | c-Pr(1-CN) | $CH_2N(Me)C(=O)OMe$ | Cl | $CH_2CN$ | O |
| D-9149 | H | $CH_2$ | Me | c-Pr(1-CN) | $CH_2N(Me)C(=O)OMe$ | Cl | $CH_2CN$ | O |
| D-9150 | Me | $CH_2$ | H | c-Pr(1-CN) | $CH_2N(Me)C(=O)OMe$ | Cl | $CH_2CN$ | O |
| D-9151 | H | CH(Me) | H | c-Pr(1-CN) | $CH_2N(Me)C(=O)OMe$ | Cl | $CH_2CN$ | O |
| D-9152 | H | $CH_2CH_2$ | Me | c-Pr(1-CN) | $CH_2N(Me)C(=O)OMe$ | Cl | $CH_2CN$ | O |
| D-9153 | Me | $CH_2CH_2$ | H | c-Pr(1-CN) | $CH_2N(Me)C(=O)OMe$ | Cl | $CH_2CN$ | O |
| D-9154 | H | single bond | Me | c-Pr(1-CN) | $CH_2N(Me)C(=O)OMe$ | Me | $CH_2CN$ | O |
| D-9155 | Me | single bond | H | c-Pr(1-CN) | $CH_2N(Me)C(=O)OMe$ | Me | $CH_2CN$ | O |
| D-9156 | Me(R) | single bond | H | c-Pr(1-CN) | $CH_2N(Me)C(=O)OMe$ | Me | $CH_2CN$ | O |
| D-9157 | Me(S) | single bond | H | c-Pr(1-CN) | $CH_2N(Me)C(=O)OMe$ | Me | $CH_2CN$ | O |
| D-9158 | H | $CH_2$ | Me | c-Pr(1-CN) | $CH_2N(Me)C(=O)OMe$ | Me | $CH_2CN$ | O |

TABLE 854

| Compound Number | Y | W | Z | $R^1$ | $R^2$ | $R^3$ | $R^{10}$ | A |
|---|---|---|---|---|---|---|---|---|
| D-9159 | Me | $CH_2$ | H | c-Pr(1-CN) | $CH_2N(Me)C(=O)OMe$ | Me | $CH_2CN$ | O |
| D-9160 | H | CH(Me) | H | c-Pr(1-CN) | $CH_2N(Me)C(=O)OMe$ | Me | $CH_2CN$ | O |
| D-9161 | H | $CH_2CH_2$ | Me | c-Pr(1-CN) | $CH_2N(Me)C(=O)OMe$ | Me | $CH_2CN$ | O |
| D-9162 | Me | $CH_2CH_2$ | H | c-Pr(1-CN) | $CH_2N(Me)C(=O)OMe$ | Me | $CH_2CN$ | O |
| D-9163 | H | single bond | Me | c-Pr(1-CN) | $C(=O)OCH_2CH=CH_2$ | Cl | C(=O)Me | O |
| D-9164 | Me | single bond | H | c-Pr(1-CN) | $C(=O)OCH_2CH=CH_2$ | Cl | C(=O)Me | O |
| D-9165 | Me(R) | single bond | H | c-Pr(1-CN) | $C(=O)OCH_2CH=CH_2$ | Cl | C(=O)Me | O |
| D-9166 | Me(S) | single bond | H | c-Pr(1-CN) | $C(=O)OCH_2CH=CH_2$ | Cl | C(=O)Me | O |
| D-9167 | H | $CH_2$ | Me | c-Pr(1-CN) | $C(=O)OCH_2CH=CH_2$ | Cl | C(=O)Me | O |
| D-9168 | Me | $CH_2$ | H | c-Pr(1-CN) | $C(=O)OCH_2CH=CH_2$ | Cl | C(=O)Me | O |
| D-9169 | H | CH(Me) | H | c-Pr(1-CN) | $C(=O)OCH_2CH=CH_2$ | Cl | C(=O)Me | O |
| D-9170 | H | $CH_2CH_2$ | Me | c-Pr(1-CN) | $C(=O)OCH_2CH=CH_2$ | Cl | C(=O)Me | O |
| D-9171 | Me | $CH_2CH_2$ | H | c-Pr(1-CN) | $C(=O)OCH_2CH=CH_2$ | Cl | C(=O)Me | O |
| D-9172 | H | single bond | Me | c-Pr(1-CN) | $C(=O)OCH_2CH=CH_2$ | Me | C(=O)Me | O |
| D-9173 | Me | single bond | H | c-Pr(1-CN) | $C(=O)OCH_2CH=CH_2$ | Me | C(=O)Me | O |
| D-9174 | Me(R) | single bond | H | c-Pr(1-CN) | $C(=O)OCH_2CH=CH_2$ | Me | C(=O)Me | O |
| D-9175 | Me(S) | single bond | H | c-Pr(1-CN) | $C(=O)OCH_2CH=CH_2$ | Me | C(=O)Me | O |
| D-9176 | H | $CH_2$ | Me | c-Pr(1-CN) | $C(=O)OCH_2CH=CH_2$ | Me | C(=O)Me | O |
| D-9177 | Me | $CH_2$ | H | c-Pr(1-CN) | $C(=O)OCH_2CH=CH_2$ | Me | C(=O)Me | O |
| D-9178 | H | CH(Me) | H | c-Pr(1-CN) | $C(=O)OCH_2CH=CH_2$ | Me | C(=O)Me | O |
| D-9179 | H | $CH_2CH_2$ | Me | c-Pr(1-CN) | $C(=O)OCH_2CH=CH_2$ | Me | C(=O)Me | O |
| D-9180 | Me | $CH_2CH_2$ | H | c-Pr(1-CN) | $C(=O)OCH_2CH=CH_2$ | Me | C(=O)Me | O |
| D-9181 | H | single bond | Me | c-Pr(1-CN) | $C(=O)OCH_2CCl_3$ | Cl | C(=O)Me | O |
| D-9182 | Me | single bond | H | c-Pr(1-CN) | $C(=O)OCH_2CCl_3$ | Cl | C(=O)Me | O |
| D-9183 | Me(R) | single bond | H | c-Pr(1-CN) | $C(=O)OCH_2CCl_3$ | Cl | C(=O)Me | O |
| D-9184 | Me(S) | single bond | H | c-Pr(1-CN) | $C(=O)OCH_2CCl_3$ | Cl | C(=O)Me | O |
| D-9185 | H | $CH_2$ | Me | c-Pr(1-CN) | $C(=O)OCH_2CCl_3$ | Cl | C(=O)Me | O |
| D-9186 | Me | $CH_2$ | H | c-Pr(1-CN) | $C(=O)OCH_2CCl_3$ | Cl | C(=O)Me | O |
| D-9187 | H | CH(Me) | H | c-Pr(1-CN) | $C(=O)OCH_2CCl_3$ | Cl | C(=O)Me | O |
| D-9188 | H | $CH_2CH_2$ | Me | c-Pr(1-CN) | $C(=O)OCH_2CCl_3$ | Cl | C(=O)Me | O |
| D-9189 | Me | $CH_2CH_2$ | H | c-Pr(1-CN) | $C(=O)OCH_2CCl_3$ | Cl | C(=O)Me | O |
| D-9190 | H | single bond | Me | c-Pr(1-CN) | $C(=O)OCH_2CCl_3$ | Me | C(=O)Me | O |
| D-9191 | Me | single bond | H | c-Pr(1-CN) | $C(=O)OCH_2CCl_3$ | Me | C(=O)Me | O |
| D-9192 | Me(R) | single bond | H | c-Pr(1-CN) | $C(=O)OCH_2CCl_3$ | Me | C(=O)Me | O |
| D-9193 | Me(S) | single bond | H | c-Pr(1-CN) | $C(=O)OCH_2CCl_3$ | Me | C(=O)Me | O |
| D-9194 | H | $CH_2$ | Me | c-Pr(1-CN) | $C(=O)OCH_2CCl_3$ | Me | C(=O)Me | O |
| D-9195 | Me | $CH_2$ | H | c-Pr(1-CN) | $C(=O)OCH_2CCl_3$ | Me | C(=O)Me | O |
| D-9196 | H | CH(Me) | H | c-Pr(1-CN) | $C(=O)OCH_2CCl_3$ | Me | C(=O)Me | O |
| D-9197 | H | $CH_2CH_2$ | Me | c-Pr(1-CN) | $C(=O)OCH_2CCl_3$ | Me | C(=O)Me | O |
| D-9198 | Me | $CH_2CH_2$ | H | c-Pr(1-CN) | $C(=O)OCH_2CCl_3$ | Me | C(=O)Me | O |
| D-9199 | H | single bond | Me | c-Pr(1-CN) | $C(=O)N(Me)_2$ | Cl | C(=O)Me | O |
| D-9200 | Me | single bond | H | c-Pr(1-CN) | $C(=O)N(Me)_2$ | Cl | C(=O)Me | O |

TABLE 854-continued

| Compound Number | Y | W | Z | $R^1$ | $R^2$ | $R^3$ | $R^{10}$ | A |
|---|---|---|---|---|---|---|---|---|
| D-9201 | Me(R) | single bond | H | c-Pr(1-CN) | C(=O)N(Me)$_2$ | Cl | C(=O)Me | O |
| D-9202 | Me(S) | single bond | H | c-Pr(1-CN) | C(=O)N(Me)$_2$ | Cl | C(=O)Me | O |

TABLE 855

| Compound Number | Y | W | Z | $R^1$ | $R^2$ | $R^3$ | $R^{10}$ | A |
|---|---|---|---|---|---|---|---|---|
| D-9203 | H | CH$_2$ | Me | c-Pr(1-CN) | C(=O)N(Me)$_2$ | Cl | C(=O)Me | O |
| D-9204 | Me | CH$_2$ | H | c-Pr(1-CN) | C(=O)N(Me)$_2$ | Cl | C(=O)Me | O |
| D-9205 | H | CH(Me) | H | c-Pr(1-CN) | C(=O)N(Me)$_2$ | Cl | C(=O)Me | O |
| D-9206 | H | CH$_2$CH$_2$ | Me | c-Pr(1-CN) | C(=O)N(Me)$_2$ | Cl | C(=O)Me | O |
| D-9207 | Me | CH$_2$CH$_2$ | H | c-Pr(1-CN) | C(=O)N(Me)$_2$ | Cl | C(=O)Me | O |
| D-9208 | H | single bond | Me | c-Pr(1-CN) | C(=O)N(Me)$_2$ | Me | C(=O)Me | O |
| D-9209 | Me | single bond | H | c-Pr(1-CN) | C(=O)N(Me)$_2$ | Me | C(=O)Me | O |
| D-9210 | Me(R) | single bond | H | c-Pr(1-CN) | C(=O)N(Me)$_2$ | Me | C(=O)Me | O |
| D-9211 | Me(S) | single bond | H | c-Pr(1-CN) | C(=O)N(Me)$_2$ | Me | C(=O)Me | O |
| D-9212 | H | CH$_2$ | Me | c-Pr(1-CN) | C(=O)N(Me)$_2$ | Me | C(=O)Me | O |
| D-9213 | Me | CH$_2$ | H | c-Pr(1-CN) | C(=O)N(Me)$_2$ | Me | C(=O)Me | O |
| D-9214 | H | CH(Me) | H | c-Pr(1-CN) | C(=O)N(Me)$_2$ | Me | C(=O)Me | O |
| D-9215 | H | CH$_2$CH$_2$ | Me | c-Pr(1-CN) | C(=O)N(Me)$_2$ | Me | C(=O)Me | O |
| D-9216 | Me | CH$_2$CH$_2$ | H | c-Pr(1-CN) | C(=O)N(Me)$_2$ | Me | C(=O)Me | O |
| D-9217 | H | single bond | Me | c-Pr(1-CN) | CH$_2$OC(=O)Me | Cl | C(=O)Me | O |
| D-9218 | Me | single bond | H | c-Pr(1-CN) | CH$_2$OC(=O)Me | Cl | C(=O)Me | O |
| D-9219 | Me(R) | single bond | H | c-Pr(1-CN) | CH$_2$OC(=O)Me | Cl | C(=O)Me | O |
| D-9220 | Me(S) | single bond | H | c-Pr(1-CN) | CH$_2$OC(=O)Me | Cl | C(=O)Me | O |
| D-9221 | H | CH$_2$ | Me | c-Pr(1-CN) | CH$_2$OC(=O)Me | Cl | C(=O)Me | O |
| D-9222 | Me | CH$_2$ | H | c-Pr(1-CN) | CH$_2$OC(=O)Me | Cl | C(=O)Me | O |
| D-9223 | H | CH(Me) | H | c-Pr(1-CN) | CH$_2$OC(=O)Me | Cl | C(=O)Me | O |
| D-9224 | H | CH$_2$CH$_2$ | Me | c-Pr(1-CN) | CH$_2$OC(=O)Me | Cl | C(=O)Me | O |
| D-9225 | Me | CH$_2$CH$_2$ | H | c-Pr(1-CN) | CH$_2$OC(=O)Me | Cl | C(=O)Me | O |
| D-9226 | H | single bond | Me | c-Pr(1-CN) | CH$_2$OC(=O)Me | Me | C(=O)Me | O |
| D-9227 | Me | single bond | H | c-Pr(1-CN) | CH$_2$OC(=O)Me | Me | C(=O)Me | O |
| D-9228 | Me(R) | single bond | H | c-Pr(1-CN) | CH$_2$OC(=O)Me | Me | C(=O)Me | O |
| D-9229 | Me(S) | single bond | H | c-Pr(1-CN) | CH$_2$OC(=O)Me | Me | C(=O)Me | O |
| D-9230 | H | CH$_2$ | Me | c-Pr(1-CN) | CH$_2$OC(=O)Me | Me | C(=O)Me | O |
| D-9231 | Me | CH$_2$ | H | c-Pr(1-CN) | CH$_2$OC(=O)Me | Me | C(=O)Me | O |
| D-9232 | H | CH(Me) | H | c-Pr(1-CN) | CH$_2$OC(=O)Me | Me | C(=O)Me | O |
| D-9233 | H | CH$_2$CH$_2$ | Me | c-Pr(1-CN) | CH$_2$OC(=O)Me | Me | C(=O)Me | O |
| D-9234 | Me | CH$_2$CH$_2$ | H | c-Pr(1-CN) | CH$_2$OC(=O)Me | Me | C(=O)Me | O |
| D-9235 | H | single bond | Me | c-Pr(1-CN) | CH$_2$OC(=O)(i-Pr) | Cl | C(=O)Me | O |
| D-9236 | Me | single bond | H | c-Pr(1-CN) | CH$_2$OC(=O)(i-Pr) | Cl | C(=O)Me | O |
| D-9237 | Me(R) | single bond | H | c-Pr(1-CN) | CH$_2$OC(=O)(i-Pr) | Cl | C(=O)Me | O |
| D-9238 | Me(S) | single bond | H | c-Pr(1-CN) | CH$_2$OC(=O)(i-Pr) | Cl | C(=O)Me | O |
| D-9239 | H | CH$_2$ | Me | c-Pr(1-CN) | CH$_2$OC(=O)(i-Pr) | Cl | C(=O)Me | O |
| D-9240 | Me | CH$_2$ | H | c-Pr(1-CN) | CH$_2$OC(=O)(i-Pr) | Cl | C(=O)Me | O |
| D-9241 | H | CH(Me) | H | c-Pr(1-CN) | CH$_2$OC(=O)(i-Pr) | Cl | C(=O)Me | O |
| D-9242 | H | CH$_2$CH$_2$ | Me | c-Pr(1-CN) | CH$_2$OC(=O)(i-Pr) | Cl | C(=O)Me | O |
| D-9243 | Me | CH$_2$CH$_2$ | H | c-Pr(1-CN) | CH$_2$OC(=O)(i-Pr) | Cl | C(=O)Me | O |
| D-9244 | H | single bond | Me | c-Pr(1-CN) | CH$_2$OC(=O)(i-Pr) | Me | C(=O)Me | O |
| D-9245 | Me | single bond | H | c-Pr(1-CN) | CH$_2$OC(=O)(i-Pr) | Me | C(=O)Me | O |
| D-9246 | Me(R) | single bond | H | c-Pr(1-CN) | CH$_2$OC(=O)(i-Pr) | Me | C(=O)Me | O |

TABLE 856

| Compound Number | Y | W | Z | $R^1$ | $R^2$ | $R^3$ | $R^{10}$ | A |
|---|---|---|---|---|---|---|---|---|
| D-9247 | Me(S) | single bond | H | c-Pr(1-CN) | CH$_2$OC(=O)(i-Pr) | Me | C(=O)Me | O |
| D-9248 | H | CH$_2$ | Me | c-Pr(1-CN) | CH$_2$OC(=O)(i-Pr) | Me | C(=O)Me | O |
| D-9249 | Me | CH$_2$ | H | c-Pr(1-CN) | CH$_2$OC(=O)(i-Pr) | Me | C(=O)Me | O |
| D-9250 | H | CH(Me) | H | c-Pr(1-CN) | CH$_2$OC(=O)(i-Pr) | Me | C(=O)Me | O |
| D-9251 | H | CH$_2$CH$_2$ | Me | c-Pr(1-CN) | CH$_2$OC(=O)(i-Pr) | Me | C(=O)Me | O |
| D-9252 | Me | CH$_2$CH$_2$ | H | c-Pr(1-CN) | CH$_2$OC(=O)(i-Pr) | Me | C(=O)Me | O |
| D-9253 | H | single bond | Me | c-Pr(1-CN) | CH$_2$OC(=O)(t-Bu) | Cl | C(=O)Me | O |
| D-9254 | Me | single bond | H | c-Pr(1-CN) | CH$_2$OC(=O)(t-Bu) | Cl | C(=O)Me | O |
| D-9255 | Me(R) | single bond | H | c-Pr(1-CN) | CH$_2$OC(=O)(t-Bu) | Cl | C(=O)Me | O |
| D-9256 | Me(S) | single bond | H | c-Pr(1-CN) | CH$_2$OC(=O)(t-Bu) | Cl | C(=O)Me | O |
| D-9257 | H | CH$_2$ | Me | c-Pr(1-CN) | CH$_2$OC(=O)(t-Bu) | Cl | C(=O)Me | O |
| D-9258 | Me | CH$_2$ | H | c-Pr(1-CN) | CH$_2$OC(=O)(t-Bu) | Cl | C(=O)Me | O |

TABLE 856-continued

| Compound Number | Y | W | Z | $R^1$ | $R^2$ | $R^3$ | $R^{10}$ | A |
|---|---|---|---|---|---|---|---|---|
| D-9259 | H | CH(Me) | H | c-Pr(1-CN) | $CH_2OC(=O)(t-Bu)$ | Cl | C(=O)Me | O |
| D-9260 | H | $CH_2CH_2$ | Me | c-Pr(1-CN) | $CH_2OC(=O)(t-Bu)$ | Cl | C(=O)Me | O |
| D-9261 | Me | $CH_2CH_2$ | H | c-Pr(1-CN) | $CH_2OC(=O)(t-Bu)$ | Cl | C(=O)Me | O |
| D-9262 | H | single bond | Me | c-Pr(1-CN) | $CH_2OC(=O)(t-Bu)$ | Me | C(=O)Me | O |
| D-9263 | Me | single bond | H | c-Pr(1-CN) | $CH_2OC(=O)(t-Bu)$ | Me | C(=O)Me | O |
| D-9264 | Me(R) | single bond | H | c-Pr(1-CN) | $CH_2OC(=O)(t-Bu)$ | Me | C(=O)Me | O |
| D-9265 | Me(S) | single bond | H | c-Pr(1-CN) | $CH_2OC(=O)(t-Bu)$ | Me | C(=O)Me | O |
| D-9266 | H | $CH_2$ | Me | c-Pr(1-CN) | $CH_2OC(=O)(t-Bu)$ | Me | C(=O)Me | O |
| D-9267 | Me | $CH_2$ | H | c-Pr(1-CN) | $CH_2OC(=O)(t-Bu)$ | Me | C(=O)Me | O |
| D-9268 | H | CH(Me) | H | c-Pr(1-CN) | $CH_2OC(=O)(t-Bu)$ | Me | C(=O)Me | O |
| D-9269 | H | $CH_2CH_2$ | Me | c-Pr(1-CN) | $CH_2OC(=O)(t-Bu)$ | Me | C(=O)Me | O |
| D-9270 | Me | $CH_2CH_2$ | H | c-Pr(1-CN) | $CH_2OC(=O)(t-Bu)$ | Me | C(=O)Me | O |
| D-9271 | H | single bond | Me | c-Pr(1-CN) | $CH_2OC(=O)OEt$ | Cl | C(=O)Me | O |
| D-9272 | Me | single bond | H | c-Pr(1-CN) | $CH_2OC(=O)OEt$ | Cl | C(=O)Me | O |
| D-9273 | Me(R) | single bond | H | c-Pr(1-CN) | $CH_2OC(=O)OEt$ | Cl | C(=O)Me | O |
| D-9274 | Me(S) | single bond | H | c-Pr(1-CN) | $CH_2OC(=O)OEt$ | Cl | C(=O)Me | O |
| D-9275 | H | $CH_2$ | Me | c-Pr(1-CN) | $CH_2OC(=O)OEt$ | Cl | C(=O)Me | O |
| D-9276 | Me | $CH_2$ | H | c-Pr(1-CN) | $CH_2OC(=O)OEt$ | Cl | C(=O)Me | O |
| D-9277 | H | CH(Me) | H | c-Pr(1-CN) | $CH_2OC(=O)OEt$ | Cl | C(=O)Me | O |
| D-9278 | H | $CH_2CH_2$ | Me | c-Pr(1-CN) | $CH_2OC(=O)OEt$ | Cl | C(=O)Me | O |
| D-9279 | Me | $CH_2CH_2$ | H | c-Pr(1-CN) | $CH_2OC(=O)OEt$ | Cl | C(=O)Me | O |
| D-9280 | H | single bond | Me | c-Pr(1-CN) | $CH_2OC(=O)OEt$ | Me | C(=O)Me | O |
| D-9281 | Me | single bond | H | c-Pr(1-CN) | $CH_2OC(=O)OEt$ | Me | C(=O)Me | O |
| D-9282 | Me(R) | single bond | H | c-Pr(1-CN) | $CH_2OC(=O)OEt$ | Me | C(=O)Me | O |
| D-9283 | Me(S) | single bond | H | c-Pr(1-CN) | $CH_2OC(=O)OEt$ | Me | C(=O)Me | O |
| D-9284 | H | $CH_2$ | Me | c-Pr(1-CN) | $CH_2OC(=O)OEt$ | Me | C(=O)Me | O |
| D-9285 | Me | $CH_2$ | H | c-Pr(1-CN) | $CH_2OC(=O)OEt$ | Me | C(=O)Me | O |
| D-9286 | H | CH(Me) | H | c-Pr(1-CN) | $CH_2OC(=O)OEt$ | Me | C(=O)Me | O |
| D-9287 | H | $CH_2CH_2$ | Me | c-Pr(1-CN) | $CH_2OC(=O)OEt$ | Me | C(=O)Me | O |
| D-9288 | Me | $CH_2CH_2$ | H | c-Pr(1-CN) | $CH_2OC(=O)OEt$ | Me | C(=O)Me | O |
| D-9289 | H | single bond | Me | c-Pr(1-CN) | $CH_2OC(=O)O(i-Pr)$ | Cl | C(=O)Me | O |
| D-9290 | Me | single bond | H | c-Pr(1-CN) | $CH_2OC(=O)O(i-Pr)$ | Cl | C(=O)Me | O |

TABLE 857

| Compound Number | Y | W | Z | $R^1$ | $R^2$ | $R^3$ | $R^{10}$ | A |
|---|---|---|---|---|---|---|---|---|
| D-9291 | Me(R) | single bond | H | c-Pr(1-CN) | $CH_2OC(=O)O(i-Pr)$ | Cl | C(=O)Me | O |
| D-9292 | Me(S) | single bond | H | c-Pr(1-CN) | $CH_2OC(=O)O(i-Pr)$ | Cl | C(=O)Me | O |
| D-9293 | H | $CH_2$ | Me | c-Pr(1-CN) | $CH_2OC(=O)O(i-Pr)$ | Cl | C(=O)Me | O |
| D-9294 | Me | $CH_2$ | H | c-Pr(1-CN) | $CH_2OC(=O)O(i-Pr)$ | Cl | C(=O)Me | O |
| D-9295 | H | CH(Me) | H | c-Pr(1-CN) | $CH_2OC(=O)O(i-Pr)$ | Cl | C(=O)Me | O |
| D-9296 | H | $CH_2CH_2$ | Me | c-Pr(1-CN) | $CH_2OC(=O)O(i-Pr)$ | Cl | C(=O)Me | O |
| D-9297 | Me | $CH_2CH_2$ | H | c-Pr(1-CN) | $CH_2OC(=O)O(i-Pr)$ | Cl | C(=O)Me | O |
| D-9298 | H | single bond | Me | c-Pr(1-CN) | $CH_2OC(=O)O(i-Pr)$ | Me | C(=O)Me | O |
| D-9299 | Me | single bond | H | c-Pr(1-CN) | $CH_2OC(=O)O(i-Pr)$ | Me | C(=O)Me | O |
| D-9300 | Me(R) | single bond | H | c-Pr(1-CN) | $CH_2OC(=O)O(i-Pr)$ | Me | C(=O)Me | O |
| D-9301 | Me(S) | single bond | H | c-Pr(1-CN) | $CH_2OC(=O)O(i-Pr)$ | Me | C(=O)Me | O |
| D-9302 | H | $CH_2$ | Me | c-Pr(1-CN) | $CH_2OC(=O)O(i-Pr)$ | Me | C(=O)Me | O |
| D-9303 | Me | $CH_2$ | H | c-Pr(1-CN) | $CH_2OC(=O)O(i-Pr)$ | Me | C(=O)Me | O |
| D-9304 | H | CH(Me) | H | c-Pr(1-CN) | $CH_2OC(=O)O(i-Pr)$ | Me | C(=O)Me | O |
| D-9305 | H | $CH_2CH_2$ | Me | c-Pr(1-CN) | $CH_2OC(=O)O(i-Pr)$ | Me | C(=O)Me | O |
| D-9306 | Me | $CH_2CH_2$ | H | c-Pr(1-CN) | $CH_2OC(=O)O(i-Pr)$ | Me | C(=O)Me | O |
| D-9307 | H | single bond | Me | c-Pr(1-CN) | $CH_2N(Me)C(=O)OMe$ | Cl | C(=O)Me | O |
| D-9308 | Me | single bond | H | c-Pr(1-CN) | $CH_2N(Me)C(=O)OMe$ | Cl | C(=O)Me | O |
| D-9309 | Me(R) | single bond | H | c-Pr(1-CN) | $CH_2N(Me)C(=O)OMe$ | Cl | C(=O)Me | O |
| D-9310 | Me(S) | single bond | H | c-Pr(1-CN) | $CH_2N(Me)C(=O)OMe$ | Cl | C(=O)Me | O |
| D-9311 | H | $CH_2$ | Me | c-Pr(1-CN) | $CH_2N(Me)C(=O)OMe$ | Cl | C(=O)Me | O |
| D-9312 | Me | $CH_2$ | H | c-Pr(1-CN) | $CH_2N(Me)C(=O)OMe$ | Cl | C(=O)Me | O |
| D-9313 | H | CH(Me) | H | c-Pr(1-CN) | $CH_2N(Me)C(=O)OMe$ | Cl | C(=O)Me | O |
| D-9314 | H | $CH_2CH_2$ | Me | c-Pr(1-CN) | $CH_2N(Me)C(=O)OMe$ | Cl | C(=O)Me | O |
| D-9315 | Me | $CH_2CH_2$ | H | c-Pr(1-CN) | $CH_2N(Me)C(=O)OMe$ | Cl | C(=O)Me | O |
| D-9316 | H | single bond | Me | c-Pr(1-CN) | $CH_2N(Me)C(=O)OMe$ | Me | C(=O)Me | O |
| D-9317 | Me | single bond | H | c-Pr(1-CN) | $CH_2N(Me)C(=O)OMe$ | Me | C(=O)Me | O |
| D-9318 | Me(R) | single bond | H | c-Pr(1-CN) | $CH_2N(Me)C(=O)OMe$ | Me | C(=O)Me | O |
| D-9319 | Me(S) | single bond | H | c-Pr(1-CN) | $CH_2N(Me)C(=O)OMe$ | Me | C(=O)Me | O |
| D-9320 | H | $CH_2$ | Me | c-Pr(1-CN) | $CH_2N(Me)C(=O)OMe$ | Me | C(=O)Me | O |
| D-9321 | Me | $CH_2$ | H | c-Pr(1-CN) | $CH_2N(Me)C(=O)OMe$ | Me | C(=O)Me | O |
| D-9322 | H | CH(Me) | H | c-Pr(1-CN) | $CH_2N(Me)C(=O)OMe$ | Me | C(=O)Me | O |
| D-9323 | H | $CH_2CH_2$ | Me | c-Pr(1-CN) | $CH_2N(Me)C(=O)OMe$ | Me | C(=O)Me | O |
| D-9324 | Me | $CH_2CH_2$ | H | c-Pr(1-CN) | $CH_2N(Me)C(=O)OMe$ | Me | C(=O)Me | O |

TABLE 858

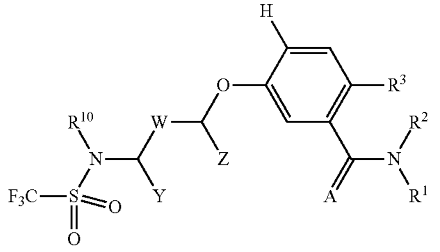

| Compound Number | Y | W | Z | $R^1$ | $R^2$ | $R^3$ | $R^{10}$ | A |
|---|---|---|---|---|---|---|---|---|
| D-9325 | H | single bond | Me | $CH_2CF_3$ | H | Cl | c-Pr | O |
| D-9326 | Me | single bond | H | $CH_2CF_3$ | H | Cl | c-Pr | O |
| D-9327 | Me(R) | single bond | H | $CH_2CF_3$ | H | Cl | c-Pr | O |
| D-9328 | Me(S) | single bond | H | $CH_2CF_3$ | H | Cl | c-Pr | O |
| D-9329 | H | single bond | Me | Et | H | Cl | c-Pr | O |
| D-9330 | Me | single bond | H | Et | H | Cl | c-Pr | O |
| D-9331 | Me(R) | single bond | H | Et | H | Cl | c-Pr | O |
| D-9332 | Me(S) | single bond | H | Et | H | Cl | c-Pr | O |
| D-9333 | H | single bond | Me | c-Pr | H | Cl | c-Pr | O |
| D-9334 | Me | single bond | H | c-Pr | H | Cl | c-Pr | O |
| D-9335 | Me(R) | single bond | H | c-Pr | H | Cl | c-Pr | O |
| D-9336 | Me(S) | single bond | H | c-Pr | H | Cl | c-Pr | O |
| D-9337 | H | single bond | Me | c-Pr(1-CN) | H | Cl | c-Pr | O |
| D-9338 | Me | single bond | H | c-Pr(1-CN) | H | Cl | c-Pr | O |
| D-9339 | Me(R) | single bond | H | c-Pr(1-CN) | H | Cl | c-Pr | O |
| D-9340 | Me(S) | single bond | H | c-Pr(1-CN) | H | Cl | c-Pr | O |
| D-9341 | H | single bond | Me | $CH_2CF_3$ | H | Me | c-Pr | O |
| D-9342 | Me | single bond | H | $CH_2CF_3$ | H | Me | c-Pr | O |
| D-9343 | Me(R) | single bond | H | $CH_2CF_3$ | H | Me | c-Pr | O |
| D-9344 | Me(S) | single bond | H | $CH_2CF_3$ | H | Me | c-Pr | O |

TABLE 858-continued

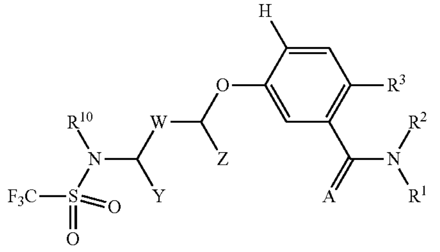

| Compound Number | Y | W | Z | $R^1$ | $R^2$ | $R^3$ | $R^{10}$ | A |
|---|---|---|---|---|---|---|---|---|
| D-9345 | H | single bond | Me | Et | H | Me | c-Pr | O |
| D-9346 | Me | single bond | H | Et | H | Me | c-Pr | O |
| D-9347 | Me(R) | single bond | H | Et | H | Me | c-Pr | O |
| D-9348 | Me(S) | single bond | H | Et | H | Me | c-Pr | O |
| D-9349 | H | single bond | Me | c-Pr | H | Me | c-Pr | O |
| D-9350 | Me | single bond | H | c-Pr | H | Me | c-Pr | O |
| D-9351 | Me(R) | single bond | H | c-Pr | H | Me | c-Pr | O |
| D-9352 | Me(S) | single bond | H | c-Pr | H | Me | c-Pr | O |
| D-9353 | H | single bond | Me | c-Pr(1-CN) | H | Me | c-Pr | O |
| D-9354 | Me | single bond | H | c-Pr(1-CN) | H | Me | c-Pr | O |
| D-9355 | Me(R) | single bond | H | c-Pr(1-CN) | H | Me | c-Pr | O |
| D-9356 | Me(S) | single bond | H | c-Pr(1-CN) | H | Me | c-Pr | O |
| D-9357 | H | single bond | Me | $CH_2CF_3$ | H | Cl | OMe | O |
| D-9358 | Me | single bond | H | $CH_2CF_3$ | H | Cl | OMe | O |
| D-9359 | Me(R) | single bond | H | $CH_2CF_3$ | H | Cl | OMe | O |
| D-9360 | Me(S) | single bond | H | $CH_2CF_3$ | H | Cl | OMe | O |
| D-9361 | H | single bond | Me | Et | H | Cl | OMe | O |
| D-9362 | Me | single bond | H | Et | H | Cl | OMe | O |

TABLE 859

| Compound Number | Y | W | Z | $R^1$ | $R^2$ | $R^3$ | $R^{10}$ | A |
|---|---|---|---|---|---|---|---|---|
| D-9363 | Me(R) | single bond | H | Et | H | Cl | OMe | O |
| D-9364 | Me(S) | single bond | H | Et | H | Cl | OMe | O |
| D-9365 | H | single bond | Me | c-Pr | H | Cl | OMe | O |
| D-9366 | Me | single bond | H | c-Pr | H | Cl | OMe | O |
| D-9367 | Me(R) | single bond | H | c-Pr | H | Cl | OMe | O |
| D-9368 | Me(S) | single bond | H | c-Pr | H | Cl | OMe | O |
| D-9369 | H | single bond | Me | c-Pr(1-CN) | H | Cl | OMe | O |
| D-9370 | Me | single bond | H | c-Pr(1-CN) | H | Cl | OMe | O |
| D-9371 | Me(R) | single bond | H | c-Pr(1-CN) | H | Cl | OMe | O |
| D-9372 | Me(S) | single bond | H | c-Pr(1-CN) | H | Cl | OMe | O |
| D-9373 | H | single bond | Me | $CH_2CF_3$ | H | Me | OMe | O |
| D-9374 | Me | single bond | H | $CH_2CF_3$ | H | Me | OMe | O |
| D-9375 | Me(R) | single bond | H | $CH_2CF_3$ | H | Me | OMe | O |
| D-9376 | Me(S) | single bond | H | $CH_2CF_3$ | H | Me | OMe | O |
| D-9377 | H | single bond | Me | Et | H | Me | OMe | O |
| D-9378 | Me | single bond | H | Et | H | Me | OMe | O |
| D-9379 | Me(R) | single bond | H | Et | H | Me | OMe | O |
| D-9380 | Me(S) | single bond | H | Et | H | Me | OMe | O |
| D-9381 | H | single bond | Me | c-Pr | H | Me | OMe | O |
| D-9382 | Me | single bond | H | c-Pr | H | Me | OMe | O |
| D-9383 | Me(R) | single bond | H | c-Pr | H | Me | OMe | O |
| D-9384 | Me(S) | single bond | H | c-Pr | H | Me | OMe | O |
| D-9385 | H | single bond | Me | c-Pr(1-CN) | H | Me | OMe | O |
| D-9386 | Me | single bond | H | c-Pr(1-CN) | H | Me | OMe | O |
| D-9387 | Me(R) | single bond | H | c-Pr(1-CN) | H | Me | OMe | O |
| D-9388 | Me(S) | single bond | H | c-Pr(1-CN) | H | Me | OMe | O |
| D-9389 | H | single bond | Me | $CH_2CF_3$ | H | Cl | C(=O)(i-Pr) | O |
| D-9390 | Me | single bond | H | $CH_2CF_3$ | H | Cl | C(=O)(i-Pr) | O |
| D-9391 | Me(R) | single bond | H | $CH_2CF_3$ | H | Cl | C(=O)(i-Pr) | O |
| D-9392 | Me(S) | single bond | H | $CH_2CF_3$ | H | Cl | C(=O)(i-Pr) | O |
| D-9393 | H | single bond | Me | Et | H | Cl | C(=O)(i-Pr) | O |
| D-9394 | Me | single bond | H | Et | H | Cl | C(=O)(i-Pr) | O |
| D-9395 | Me(R) | single bond | H | Et | H | Cl | C(=O)(i-Pr) | O |
| D-9396 | Me(S) | single bond | H | Et | H | Cl | C(=O)(i-Pr) | O |
| D-9397 | H | single bond | Me | c-Pr | H | Cl | C(=O)(i-Pr) | O |
| D-9398 | Me | single bond | H | c-Pr | H | Cl | C(=O)(i-Pr) | O |
| D-9399 | Me(R) | single bond | H | c-Pr | H | Cl | C(=O)(i-Pr) | O |

TABLE 859-continued

| Compound Number | Y | W | Z | $R^1$ | $R^2$ | $R^3$ | $R^{10}$ | A |
|---|---|---|---|---|---|---|---|---|
| D-9400 | Me(S) | single bond | H | c-Pr | H | Cl | C(=O)(i-Pr) | O |
| D-9401 | H | single bond | Me | c-Pr(1-CN) | H | Cl | C(=O)(i-Pr) | O |
| D-9402 | Me | single bond | H | c-Pr(1-CN) | H | Cl | C(=O)(i-Pr) | O |
| D-9403 | Me(R) | single bond | H | c-Pr(1-CN) | H | Cl | C(=O)(i-Pr) | O |
| D-9404 | Me(S) | single bond | H | c-Pr(1-CN) | H | Cl | C(=O)(i-Pr) | O |
| D-9405 | H | single bond | Me | $CH_2CF_3$ | H | Me | C(=O)(i-Pr) | O |
| D-9406 | Me | single bond | H | $CH_2CF_3$ | H | Me | C(=O)(i-Pr) | O |

TABLE 860

| Compound Number | Y | W | Z | $R^1$ | $R^2$ | $R^3$ | $R^{10}$ | A |
|---|---|---|---|---|---|---|---|---|
| D-9407 | Me(R) | single bond | H | $CH_2CF_3$ | H | Me | C(=O)(i-Pr) | O |
| D-9408 | Me(S) | single bond | H | $CH_2CF_3$ | H | Me | C(=O)(i-Pr) | O |
| D-9409 | H | single bond | Me | Et | H | Me | C(=O)(i-Pr) | O |
| D-9410 | Me | single bond | H | Et | H | Me | C(=O)(i-Pr) | O |
| D-9411 | Me(R) | single bond | H | Et | H | Me | C(=O)(i-Pr) | O |
| D-9412 | Me(S) | single bond | H | Et | H | Me | C(=O)(i-Pr) | O |
| D-9413 | H | single bond | Me | c-Pr | H | Me | C(=O)(i-Pr) | O |
| D-9414 | Me | single bond | H | c-Pr | H | Me | C(=O)(i-Pr) | O |
| D-9415 | Me(R) | single bond | H | c-Pr | H | Me | C(=O)(i-Pr) | O |
| D-9416 | Me(S) | single bond | H | c-Pr | H | Me | C(=O)(i-Pr) | O |
| D-9417 | H | single bond | Me | c-Pr(1-CN) | H | Me | C(=O)(i-Pr) | O |
| D-9418 | Me | single bond | H | c-Pr(1-CN) | H | Me | C(=O)(i-Pr) | O |
| D-9419 | Me(R) | single bond | H | c-Pr(1-CN) | H | Me | C(=O)(i-Pr) | O |
| D-9420 | Me(S) | single bond | H | c-Pr(1-CN) | H | Me | C(=O)(i-Pr) | O |
| D-9421 | H | single bond | Me | $CH_2CF_3$ | H | Cl | C(=O)O(t-Bu) | O |
| D-9422 | Me | single bond | H | $CH_2CF_3$ | H | Cl | C(=O)O(t-Bu) | O |
| D-9423 | Me(R) | single bond | H | $CH_2CF_3$ | H | Cl | C(=O)O(t-Bu) | O |
| D-9424 | Me(S) | single bond | H | $CH_2CF_3$ | H | Cl | C(=O)O(t-Bu) | O |
| D-9425 | H | single bond | Me | Et | H | Cl | C(=O)O(t-Bu) | O |
| D-9426 | Me | single bond | H | Et | H | Cl | C(=O)O(t-Bu) | O |
| D-9427 | Me(R) | single bond | H | Et | H | Cl | C(=O)O(t-Bu) | O |
| D-9428 | Me(S) | single bond | H | Et | H | Cl | C(=O)O(t-Bu) | O |
| D-9429 | H | single bond | Me | c-Pr | H | Cl | C(=O)O(t-Bu) | O |
| D-9430 | Me | single bond | H | c-Pr | H | Cl | C(=O)O(t-Bu) | O |
| D-9431 | Me(R) | single bond | H | c-Pr | H | Cl | C(=O)O(t-Bu) | O |
| D-9432 | Me(S) | single bond | H | c-Pr | H | Cl | C(=O)O(t-Bu) | O |
| D-9433 | H | single bond | Me | c-Pr(1-CN) | H | Cl | C(=O)O(t-Bu) | O |
| D-9434 | Me | single bond | H | c-Pr(1-CN) | H | Cl | C(=O)O(t-Bu) | O |
| D-9435 | Me(R) | single bond | H | c-Pr(1-CN) | H | Cl | C(=O)O(t-Bu) | O |
| D-9436 | Me(S) | single bond | H | c-Pr(1-CN) | H | Cl | C(=O)O(t-Bu) | O |
| D-9437 | H | single bond | Me | $CH_2CF_3$ | H | Me | C(=O)O(t-Bu) | O |
| D-9438 | Me | single bond | H | $CH_2CF_3$ | H | Me | C(=O)O(t-Bu) | O |
| D-9439 | Me(R) | single bond | H | $CH_2CF_3$ | H | Me | C(=O)O(t-Bu) | O |
| D-9440 | Me(S) | single bond | H | $CH_2CF_3$ | H | Me | C(=O)O(t-Bu) | O |
| D-9441 | H | single bond | Me | Et | H | Me | C(=O)O(t-Bu) | O |
| D-9442 | Me | single bond | H | Et | H | Me | C(=O)O(t-Bu) | O |
| D-9443 | Me(R) | single bond | H | Et | H | Me | C(=O)O(t-Bu) | O |
| D-9444 | Me(S) | single bond | H | Et | H | Me | C(=O)O(t-Bu) | O |
| D-9445 | H | single bond | Me | c-Pr | H | Me | C(=O)O(t-Bu) | O |
| D-9446 | Me | single bond | H | c-Pr | H | Me | C(=O)O(t-Bu) | O |
| D-9447 | Me(R) | single bond | H | c-Pr | H | Me | C(=O)O(t-Bu) | O |
| D-9448 | Me(S) | single bond | H | c-Pr | H | Me | C(=O)O(t-Bu) | O |
| D-9449 | H | single bond | Me | c-Pr(1-CN) | H | Me | C(=O)O(t-Bu) | O |
| D-9450 | Me | single bond | H | c-Pr(1-CN) | H | Me | C(=O)O(t-Bu) | O |

TABLE 861

| Compound Number | Y | W | Z | $R^1$ | $R^2$ | $R^3$ | $R^{10}$ | A |
|---|---|---|---|---|---|---|---|---|
| D-9451 | Me(R) | single bond | H | c-Pr(1-CN) | H | Me | C(=O)O(t-Bu) | O |
| D-9452 | Me(S) | single bond | H | c-Pr(1-CN) | H | Me | C(=O)O(t-Bu) | O |
| D-9453 | H | single bond | Me | $CH_2CF_3$ | H | Cl | $CH_2OEt$ | O |
| D-9454 | Me | single bond | H | $CH_2CF_3$ | H | Cl | $CH_2OEt$ | O |
| D-9455 | Me(R) | single bond | H | $CH_2CF_3$ | H | Cl | $CH_2OEt$ | O |

TABLE 861-continued

| Compound Number | Y | W | Z | $R^1$ | $R^2$ | $R^3$ | $R^{10}$ | A |
|---|---|---|---|---|---|---|---|---|
| D-9456 | Me(S) | single bond | H | $CH_2CF_3$ | H | Cl | $CH_2OEt$ | O |
| D-9457 | H | single bond | Me | Et | H | Cl | $CH_2OEt$ | O |
| D-9458 | Me | single bond | H | Et | H | Cl | $CH_2OEt$ | O |
| D-9459 | Me(R) | single bond | H | Et | H | Cl | $CH_2OEt$ | O |
| D-9460 | Me(S) | single bond | H | Et | H | Cl | $CH_2OEt$ | O |
| D-9461 | H | single bond | Me | c-Pr | H | Cl | $CH_2OEt$ | O |
| D-9462 | Me | single bond | H | c-Pr | H | Cl | $CH_2OEt$ | O |
| D-9463 | Me(R) | single bond | H | c-Pr | H | Cl | $CH_2OEt$ | O |
| D-9464 | Me(S) | single bond | H | c-Pr | H | Cl | $CH_2OEt$ | O |
| D-9465 | H | single bond | Me | c-Pr(1-CN) | H | Cl | $CH_2OEt$ | O |
| D-9466 | Me | single bond | H | c-Pr(1-CN) | H | Cl | $CH_2OEt$ | O |
| D-9467 | Me(R) | single bond | H | c-Pr(1-CN) | H | Cl | $CH_2OEt$ | O |
| D-9468 | Me(S) | single bond | H | c-Pr(1-CN) | H | Cl | $CH_2OEt$ | O |
| D-9469 | H | single bond | Me | $CH_2CF_3$ | H | Me | $CH_2OEt$ | O |
| D-9470 | Me | single bond | H | $CH_2CF_3$ | H | Me | $CH_2OEt$ | O |
| D-9471 | Me(R) | single bond | H | $CH_2CF_3$ | H | Me | $CH_2OEt$ | O |
| D-9472 | Me(S) | single bond | H | $CH_2CF_3$ | H | Me | $CH_2OEt$ | O |
| D-9473 | H | single bond | Me | Et | H | Me | $CH_2OEt$ | O |
| D-9474 | Me | single bond | H | Et | H | Me | $CH_2OEt$ | O |
| D-9475 | Me(R) | single bond | H | Et | H | Me | $CH_2OEt$ | O |
| D-9476 | Me(S) | single bond | H | Et | H | Me | $CH_2OEt$ | O |
| D-9477 | H | single bond | Me | c-Pr | H | Me | $CH_2OEt$ | O |
| D-9478 | Me | single bond | H | c-Pr | H | Me | $CH_2OEt$ | O |
| D-9479 | Me(R) | single bond | H | c-Pr | H | Me | $CH_2OEt$ | O |
| D-9480 | Me(S) | single bond | H | c-Pr | H | Me | $CH_2OEt$ | O |
| D-9481 | H | single bond | Me | c-Pr(1-CN) | H | Me | $CH_2OEt$ | O |
| D-9482 | Me | single bond | H | c-Pr(1-CN) | H | Me | $CH_2OEt$ | O |
| D-9483 | Me(R) | single bond | H | c-Pr(1-CN) | H | Me | $CH_2OEt$ | O |
| D-9484 | Me(S) | single bond | H | c-Pr(1-CN) | H | Me | $CH_2OEt$ | O |
| D-9485 | H | single bond | Me | $CH_2CF_3$ | H | Cl | $CH_2SMe$ | O |
| D-9486 | Me | single bond | H | $CH_2CF_3$ | H | Cl | $CH_2SMe$ | O |
| D-9487 | Me(R) | single bond | H | $CH_2CF_3$ | H | Cl | $CH_2SMe$ | O |
| D-9488 | Me(S) | single bond | H | $CH_2CF_3$ | H | Cl | $CH_2SMe$ | O |
| D-9489 | H | single bond | Me | Et | H | Cl | $CH_2SMe$ | O |
| D-9490 | Me | single bond | H | Et | H | Cl | $CH_2SMe$ | O |
| D-9491 | Me(R) | single bond | H | Et | H | Cl | $CH_2SMe$ | O |
| D-9492 | Me(S) | single bond | H | Et | H | Cl | $CH_2SMe$ | O |
| D-9493 | H | single bond | Me | c-Pr | H | Cl | $CH_2SMe$ | O |
| D-9494 | Me | single bond | H | c-Pr | H | Cl | $CH_2SMe$ | O |

TABLE 862

| Compound Number | Y | W | Z | $R^1$ | $R^2$ | $R^3$ | $R^{10}$ | A |
|---|---|---|---|---|---|---|---|---|
| D-9495 | Me(R) | single bond | H | c-Pr | H | Cl | $CH_2SMe$ | O |
| D-9496 | Me(S) | single bond | H | c-Pr | H | Cl | $CH_2SMe$ | O |
| D-9497 | H | single bond | Me | c-Pr(1-CN) | H | Cl | $CH_2SMe$ | O |
| D-9498 | Me | single bond | H | c-Pr(1-CN) | H | Cl | $CH_2SMe$ | O |
| D-9499 | Me(R) | single bond | H | c-Pr(1-CN) | H | Cl | $CH_2SMe$ | O |
| D-9500 | Me(S) | single bond | H | c-Pr(1-CN) | H | Cl | $CH_2SMe$ | O |
| D-9501 | H | single bond | Me | $CH_2CF_3$ | H | Me | $CH_2SMe$ | O |
| D-9502 | Me | single bond | H | $CH_2CF_3$ | H | Me | $CH_2SMe$ | O |
| D-9503 | Me(R) | single bond | H | $CH_2CF_3$ | H | Me | $CH_2SMe$ | O |
| D-9504 | Me(S) | single bond | H | $CH_2CF_3$ | H | Me | $CH_2SMe$ | O |
| D-9505 | H | single bond | Me | Et | H | Me | $CH_2SMe$ | O |
| D-9506 | Me | single bond | H | Et | H | Me | $CH_2SMe$ | O |
| D-9507 | Me(R) | single bond | H | Et | H | Me | $CH_2SMe$ | O |
| D-9508 | Me(S) | single bond | H | Et | H | Me | $CH_2SMe$ | O |
| D-9509 | H | single bond | Me | c-Pr | H | Me | $CH_2SMe$ | O |
| D-9510 | Me | single bond | H | c-Pr | H | Me | $CH_2SMe$ | O |
| D-9511 | Me(R) | single bond | H | c-Pr | H | Me | $CH_2SMe$ | O |
| D-9512 | Me(S) | single bond | H | c-Pr | H | Me | $CH_2SMe$ | O |
| D-9513 | H | single bond | Me | c-Pr(1-CN) | H | Me | $CH_2SMe$ | O |
| D-9514 | Me | single bond | H | c-Pr(1-CN) | H | Me | $CH_2SMe$ | O |
| D-9515 | Me(R) | single bond | H | c-Pr(1-CN) | H | Me | $CH_2SMe$ | O |
| D-9516 | Me(S) | single bond | H | c-Pr(1-CN) | H | Me | $CH_2SMe$ | O |
| D-9517 | H | single bond | Me | $CH_2CF_3$ | H | Cl | $CH_2S({=}O)_2Me$ | O |
| D-9518 | Me | single bond | H | $CH_2CF_3$ | H | Cl | $CH_2S({=}O)_2Me$ | O |
| D-9519 | Me(R) | single bond | H | $CH_2CF_3$ | H | Cl | $CH_2S({=}O)_2Me$ | O |
| D-9520 | Me(S) | single bond | H | $CH_2CF_3$ | H | Cl | $CH_2S({=}O)_2Me$ | O |
| D-9521 | H | single bond | Me | Et | H | Cl | $CH_2S({=}O)_2Me$ | O |
| D-9522 | Me | single bond | H | Et | H | Cl | $CH_2S({=}O)_2Me$ | O |

TABLE 862-continued

| Compound Number | Y | W | Z | $R^1$ | $R^2$ | $R^3$ | $R^{10}$ | A |
|---|---|---|---|---|---|---|---|---|
| D-9523 | Me(R) | single bond | H | Et | H | Cl | $CH_2S(=O)_2Me$ | O |
| D-9524 | Me(S) | single bond | H | Et | H | Cl | $CH_2S(=O)_2Me$ | O |
| D-9525 | H | single bond | Me | c-Pr | H | Cl | $CH_2S(=O)_2Me$ | O |
| D-9526 | Me | single bond | H | c-Pr | H | Cl | $CH_2S(=O)_2Me$ | O |
| D-9527 | Me(R) | single bond | H | c-Pr | H | Cl | $CH_2S(=O)_2Me$ | O |
| D-9528 | Me(S) | single bond | H | c-Pr | H | Cl | $CH_2S(=O)_2Me$ | O |
| D-9529 | H | single bond | Me | c-Pr(1-CN) | H | Cl | $CH_2S(=O)_2Me$ | O |
| D-9530 | Me | single bond | H | c-Pr(1-CN) | H | Cl | $CH_2S(=O)_2Me$ | O |
| D-9531 | Me(R) | single bond | H | c-Pr(1-CN) | H | Cl | $CH_2S(=O)_2Me$ | O |
| D-9532 | Me(S) | single bond | H | c-Pr(1-CN) | H | Cl | $CH_2S(=O)_2Me$ | O |
| D-9533 | H | single bond | Me | $CH_2CF_3$ | H | Me | $CH_2S(=0)_2Me$ | O |
| D-9534 | Me | single bond | H | $CH_2CF_3$ | H | Me | $CH_2S(=O)_2Me$ | O |
| D-9535 | Me(R) | single bond | H | $CH_2CF_3$ | H | Me | $CH_2S(=O)_2Me$ | O |
| D-9536 | Me(S) | single bond | H | $CH_2CF_3$ | H | Me | $CH_2S(=O)_2Me$ | O |
| D-9537 | H | single bond | Me | Et | H | Me | $CH_2S(=O)_2Me$ | O |
| D-9538 | Me | single bond | H | Et | H | Me | $CH_2S(=O)_2Me$ | O |

TABLE 863

| Compound Number | Y | W | Z | $R^1$ | $R^2$ | $R^3$ | $R^{10}$ | A |
|---|---|---|---|---|---|---|---|---|
| D-9539 | Me(R) | single bond | H | Et | H | Me | $CH_2S(=O)_2Me$ | O |
| D-9540 | Me(S) | single bond | H | Et | H | Me | $CH_2S(=O)_2Me$ | O |
| D-9541 | H | single bond | Me | c-Pr | H | Me | $CH_2S(=O)_2Me$ | O |
| D-9542 | Me | single bond | H | c-Pr | H | Me | $CH_2S(=O)_2Me$ | O |
| D-9543 | Me(R) | single bond | H | c-Pr | H | Me | $CH_2S(=O)_2Me$ | O |
| D-9544 | Me(S) | single bond | H | c-Pr | H | Me | $CH_2S(=O)_2Me$ | O |
| D-9545 | H | single bond | Me | c-Pr(1-CN) | H | Me | $CH_2S(=O)_2Me$ | O |
| D-9546 | Me | single bond | H | c-Pr(1-CN) | H | Me | $CH_2S(=O)_2Me$ | O |
| D-9547 | Me(R) | single bond | H | c-Pr(1-CN) | H | Me | $CH_2S(=O)_2Me$ | O |
| D-9548 | Me(S) | single bond | H | c-Pr(1-CN) | H | Me | $CH_2S(=O)_2Me$ | O |
| D-9549 | H | single bond | Me | $CH_2CF_3$ | H | Cl | $CH_2C(=O)Me$ | O |
| D-9550 | Me | single bond | H | $CH_2CF_3$ | H | Cl | $CH_2C(=O)Me$ | O |
| D-9551 | Me(R) | single bond | H | $CH_2CF_3$ | H | Cl | $CH_2C(=O)Me$ | O |
| D-9552 | Me(S) | single bond | H | $CH_2CF_3$ | H | Cl | $CH_2C(=O)Me$ | O |
| D-9553 | H | single bond | Me | Et | H | Cl | $CH_2C(=O)Me$ | O |
| D-9554 | Me | single bond | H | Et | H | Cl | $CH_2C(=O)Me$ | O |
| D-9555 | Me(R) | single bond | H | Et | H | Cl | $CH_2C(=O)Me$ | O |
| D-9556 | Me(S) | single bond | H | Et | H | Cl | $CH_2C(=O)Me$ | O |
| D-9557 | H | single bond | Me | c-Pr | H | Cl | $CH_2C(=O)Me$ | O |
| D-9558 | Me | single bond | H | c-Pr | H | Cl | $CH_2C(=O)Me$ | O |
| D-9559 | Me(R) | single bond | H | c-Pr | H | Cl | $CH_2C(=O)Me$ | O |
| D-9560 | Me(S) | single bond | H | c-Pr | H | Cl | $CH_2C(=O)Me$ | O |
| D-9561 | H | single bond | Me | c-Pr(1-CN) | H | Cl | $CH_2C(=O)Me$ | O |
| D-9562 | Me | single bond | H | c-Pr(1-CN) | H | Cl | $CH_2C(=O)Me$ | O |
| D-9563 | Me(R) | single bond | H | c-Pr(1-CN) | H | Cl | $CH_2C(=O)Me$ | O |
| D-9564 | Me(S) | single bond | H | c-Pr(1-CN) | H | Cl | $CH_2C(=O)Me$ | O |
| D-9565 | H | single bond | Me | $CH_2CF_3$ | H | Me | $CH_2C(=O)Me$ | O |
| D-9566 | Me | single bond | H | $CH_2CF_3$ | H | Me | $CH_2C(=O)Me$ | O |
| D-9567 | Me(R) | single bond | H | $CH_2CF_3$ | H | Me | $CH_2C(=O)Me$ | O |
| D-9568 | Me(S) | single bond | H | $CH_2CF_3$ | H | Me | $CH_2C(=O)Me$ | O |
| D-9569 | H | single bond | Me | Et | H | Me | $CH_2C(=O)Me$ | O |
| D-9570 | Me | single bond | H | Et | H | Me | $CH_2C(=O)Me$ | O |
| D-9571 | Me(R) | single bond | H | Et | H | Me | $CH_2C(=O)Me$ | O |
| D-9572 | Me(S) | single bond | H | Et | H | Me | $CH_2C(=O)Me$ | O |
| D-9573 | H | single bond | Me | c-Pr | H | Me | $CH_2C(=O)Me$ | O |
| D-9574 | Me | single bond | H | c-Pr | H | Me | $CH_2C(=O)Me$ | O |
| D-9575 | Me(R) | single bond | H | c-Pr | H | Me | $CH_2C(=O)Me$ | O |
| D-9576 | Me(S) | single bond | H | c-Pr | H | Me | $CH_2C(=O)Me$ | O |
| D-9577 | H | single bond | Me | c-Pr(1-CN) | H | Me | $CH_2C(=O)Me$ | O |
| D-9578 | Me | single bond | H | c-Pr(1-CN) | H | Me | $CH_2C(=O)Me$ | O |
| D-9579 | Me(R) | single bond | H | c-Pr(1-CN) | H | Me | $CH_2C(=O)Me$ | O |
| D-9580 | Me(S) | single bond | H | c-Pr(1-CN) | H | Me | $CH_2C(=O)Me$ | O |
| D-9581 | H | single bond | Me | $CH_2CF_3$ | H | Cl | $CH_2C(=O)OMe$ | O |
| D-9582 | Me | single bond | H | $CH_2CF_3$ | H | Cl | $CH_2C(=O)OMe$ | O |

TABLE 864

| Compound Number | Y | W | Z | $R^1$ | $R^2$ | $R^3$ | $R^{10}$ | A |
|---|---|---|---|---|---|---|---|---|
| D-9583 | Me(R) | single bond | H | $CH_2CF_3$ | H | Cl | $CH_2C(=O)OMe$ | O |
| D-9584 | Me(S) | single bond | H | $CH_2CF_3$ | H | Cl | $CH_2C(=O)OMe$ | O |
| D-9585 | H | single bond | Me | Et | H | Cl | $CH_2C(=O)OMe$ | O |
| D-9586 | Me | single bond | H | Et | H | Cl | $CH_2C(=O)OMe$ | O |
| D-9587 | Me(R) | single bond | H | Et | H | Cl | $CH_2C(=O)OMe$ | O |
| D-9588 | Me(S) | single bond | H | Et | H | Cl | $CH_2C(=O)OMe$ | O |
| D-9589 | H | single bond | Me | c-Pr | H | Cl | $CH_2C(=O)OMe$ | O |
| D-9590 | Me | single bond | H | c-Pr | H | Cl | $CH_2C(=O)OMe$ | O |
| D-9591 | Me(R) | single bond | H | c-Pr | H | Cl | $CH_2C(=O)OMe$ | O |
| D-9592 | Me(S) | single bond | H | c-Pr | H | Cl | $CH_2C(=O)OMe$ | O |
| D-9593 | H | single bond | Me | c-Pr(1-CN) | H | Cl | $CH_2C(=O)OMe$ | O |
| D-9594 | Me | single bond | H | c-Pr(1-CN) | H | Cl | $CH_2C(=O)OMe$ | O |
| D-9595 | Me(R) | single bond | H | c-Pr(1-CN) | H | Cl | $CH_2C(=O)OMe$ | O |
| D-9596 | Me(S) | single bond | H | c-Pr(1-CN) | H | Cl | $CH_2C(=O)OMe$ | O |
| D-9597 | H | single bond | Me | $CH_2CF_3$ | H | Me | $CH_2C(=O)OMe$ | O |
| D-9598 | Me | single bond | H | $CH_2CF_3$ | H | Me | $CH_2C(=O)OMe$ | O |
| D-9599 | Me(R) | single bond | H | $CH_2CF_3$ | H | Me | $CH_2C(=O)OMe$ | O |
| D-9600 | Me(S) | single bond | H | $CH_2CF_3$ | H | Me | $CH_2C(=O)OMe$ | O |
| D-9601 | H | single bond | Me | Et | H | Me | $CH_2C(=O)OMe$ | O |
| D-9602 | Me | single bond | H | Et | H | Me | $CH_2C(=O)OMe$ | O |
| D-9603 | Me(R) | single bond | H | Et | H | Me | $CH_2C(=O)OMe$ | O |
| D-9604 | Me(S) | single bond | H | Et | H | Me | $CH_2C(=O)OMe$ | O |
| D-9605 | H | single bond | Me | c-Pr | H | Me | $CH_2C(=O)OMe$ | O |
| D-9606 | Me | single bond | H | c-Pr | H | Me | $CH_2C(=O)OMe$ | O |
| D-9607 | Me(R) | single bond | H | c-Pr | H | Me | $CH_2C(=O)OMe$ | O |
| D-9608 | Me(S) | single bond | H | c-Pr | H | Me | $CH_2C(=O)OMe$ | O |
| D-9609 | H | single bond | Me | c-Pr(1-CN) | H | Me | $CH_2C(=O)OMe$ | O |
| D-9610 | Me | single bond | H | c-Pr(1-CN) | H | Me | $CH_2C(=O)OMe$ | O |
| D-9611 | Me(R) | single bond | H | c-Pr(1-CN) | H | Me | $CH_2C(=O)OMe$ | O |
| D-9612 | Me(S) | single bond | H | c-Pr(1-CN) | H | Me | $CH_2C(=O)OMe$ | O |
| D-9613 | H | single bond | Me | $CH_2CF_3$ | H | Cl | $CH_2C(=O)NHMe$ | O |
| D-9614 | Me | single bond | H | $CH_2CF_3$ | H | Cl | $CH_2C(=O)NHMe$ | O |
| D-9615 | Me(R) | single bond | H | $CH_2CF_3$ | H | Cl | $CH_2C(=O)NHMe$ | O |
| D-9616 | Me(S) | single bond | H | $CH_2CF_3$ | H | Cl | $CH_2C(=O)NHMe$ | O |
| D-9617 | H | single bond | Me | Et | H | Cl | $CH_2C(=O)NHMe$ | O |
| D-9618 | Me | single bond | H | Et | H | Cl | $CH_2C(=O)NHMe$ | O |
| D-9619 | Me(R) | single bond | H | Et | H | Cl | $CH_2C(=O)NHMe$ | O |
| D-9620 | Me(S) | single bond | H | Et | H | Cl | $CH_2C(=O)NHMe$ | O |
| D-9621 | H | single bond | Me | c-Pr | H | Cl | $CH_2C(=O)NHMe$ | O |
| D-9622 | Me | single bond | H | c-Pr | H | Cl | $CH_2C(=O)NHMe$ | O |
| D-9623 | Me(R) | single bond | H | c-Pr | H | Cl | $CH_2C(=O)NHMe$ | O |
| D-9624 | Me(S) | single bond | H | c-Pr | H | Cl | $CH_2C(=O)NHMe$ | O |
| D-9625 | H | single bond | Me | c-Pr(1-CN) | H | Cl | $CH_2C(=O)NHMe$ | O |
| D-9626 | Me | single bond | H | c-Pr(1-CN) | H | Cl | $CH_2C(=O)NHMe$ | O |

TABLE 865

| Compound Number | Y | W | Z | $R^1$ | $R^2$ | $R^3$ | $R^{10}$ | A |
|---|---|---|---|---|---|---|---|---|
| D-9627 | Me(R) | single bond | H | c-Pr(1-CN) | H | Cl | $CH_2C(=O)NHMe$ | O |
| D-9628 | Me(S) | single bond | H | c-Pr(1-CN) | H | Cl | $CH_2C(=O)NHMe$ | O |
| D-9629 | H | single bond | Me | $CH_2CF_3$ | H | Me | $CH_2C(=O)NHMe$ | O |
| D-9630 | Me | single bond | H | $CH_2CF_3$ | H | Me | $CH_2C(=O)NHMe$ | O |
| D-9631 | Me(R) | single bond | H | $CH_2CF_3$ | H | Me | $CH_2C(=O)NHMe$ | O |
| D-9632 | Me(S) | single bond | H | $CH_2CF_3$ | H | Me | $CH_2C(=O)NHMe$ | O |
| D-9633 | H | single bond | Me | Et | H | Me | $CH_2C(=O)NHMe$ | O |
| D-9634 | Me | single bond | H | Et | H | Me | $CH_2C(=O)NHMe$ | O |
| D-9635 | Me(R) | single bond | H | Et | H | Me | $CH_2C(=O)NHMe$ | O |
| D-9636 | Me(S) | single bond | H | Et | H | Me | $CH_2C(=O)NHMe$ | O |
| D-9637 | H | single bond | Me | c-Pr | H | Me | $CH_2C(=O)NHMe$ | O |
| D-9638 | Me | single bond | H | c-Pr | H | Me | $CH_2C(=O)NHMe$ | O |
| D-9639 | Me(R) | single bond | H | c-Pr | H | Me | $CH_2C(=O)NHMe$ | O |
| D-9640 | Me(S) | single bond | H | c-Pr | H | Me | $CH_2C(=O)NHMe$ | O |
| D-9641 | H | single bond | Me | c-Pr(1-CN) | H | Me | $CH_2C(=O)NHMe$ | O |
| D-9642 | Me | single bond | H | c-Pr(1-CN) | H | Me | $CH_2C(=O)NHMe$ | O |
| D-9643 | Me(R) | single bond | H | c-Pr(1-CN) | H | Me | $CH_2C(=O)NHMe$ | O |
| D-9644 | Me(S) | single bond | H | c-Pr(1-CN) | H | Me | $CH_2C(=O)NHMe$ | O |
| D-9645 | H | single bond | Me | $CH_2CF_3$ | H | Cl | $CH_2OC(=O)Me$ | O |
| D-9646 | Me | single bond | H | $CH_2CF_3$ | H | Cl | $CH_2OC(=O)Me$ | O |
| D-9647 | Me(R) | single bond | H | $CH_2CF_3$ | H | Cl | $CH_2OC(=O)Me$ | O |
| D-9648 | Me(S) | single bond | H | $CH_2CF_3$ | H | Cl | $CH_2OC(=O)Me$ | O |
| D-9649 | H | single bond | Me | Et | H | Cl | $CH_2OC(=O)Me$ | O |

TABLE 865-continued

| Compound Number | Y | W | Z | $R^1$ | $R^2$ | $R^3$ | $R^{10}$ | A |
|---|---|---|---|---|---|---|---|---|
| D-9650 | Me | single bond | H | Et | H | Cl | $CH_2OC(=O)Me$ | O |
| D-9651 | Me(R) | single bond | H | Et | H | Cl | $CH_2OC(=O)Me$ | O |
| D-9652 | Me(S) | single bond | H | Et | H | Cl | $CH_2OC(=O)Me$ | O |
| D-9653 | H | single bond | Me | c-Pr | H | Cl | $CH_2OC(=O)Me$ | O |
| D-9654 | Me | single bond | H | c-Pr | H | Cl | $CH_2OC(=O)Me$ | O |
| D-9655 | Me(R) | single bond | H | c-Pr | H | Cl | $CH_2OC(=O)Me$ | O |
| D-9656 | Me(S) | single bond | H | c-Pr | H | Cl | $CH_2OC(=O)Me$ | O |
| D-9657 | H | single bond | Me | c-Pr(1-CN) | H | Cl | $CH_2OC(=O)Me$ | O |
| D-9658 | Me | single bond | H | c-Pr(1-CN) | H | Cl | $CH_2OC(=O)Me$ | O |
| D-9659 | Me(R) | single bond | H | c-Pr(1-CN) | H | Cl | $CH_2OC(=O)Me$ | O |
| D-9660 | Me(S) | single bond | H | c-Pr(1-CN) | H | Cl | $CH_2OC(=O)Me$ | O |
| D-9661 | H | single bond | Me | $CH_2CF_3$ | H | Me | $CH_2OC(=O)Me$ | O |
| D-9662 | Me | single bond | H | $CH_2CF_3$ | H | Me | $CH_2OC(=O)Me$ | O |
| D-9663 | Me(R) | single bond | H | $CH_2CF_3$ | H | Me | $CH_2OC(=O)Me$ | O |
| D-9664 | Me(S) | single bond | H | $CH_2CF_3$ | H | Me | $CH_2OC(=O)Me$ | O |
| D-9665 | H | single bond | Me | Et | H | Me | $CH_2OC(=O)Me$ | O |
| D-9666 | Me | single bond | H | Et | H | Me | $CH_2OC(=O)Me$ | O |
| D-9667 | Me(R) | single bond | H | Et | H | Me | $CH_2OC(=O)Me$ | O |
| D-9668 | Me(S) | single bond | H | Et | H | Me | $CH_2OC(=O)Me$ | O |
| D-9669 | H | single bond | Me | c-Pr | H | Me | $CH_2OC(=O)Me$ | O |
| D-9670 | Me | single bond | H | c-Pr | H | Me | $CH_2OC(=O)Me$ | O |

TABLE 866

| Compound Number | Y | W | Z | $R^1$ | $R^2$ | $R^3$ | $R^{10}$ | A |
|---|---|---|---|---|---|---|---|---|
| D-9671 | Me(R) | single bond | H | c-Pr | H | Me | $CH_2OC(=O)Me$ | O |
| D-9672 | Me(S) | single bond | H | c-Pr | H | Me | $CH_2OC(=O)Me$ | O |
| D-9673 | H | single bond | Me | c-Pr(1-CN) | H | Me | $CH_2OC(=O)Me$ | O |
| D-9674 | Me | single bond | H | c-Pr(1-CN) | H | Me | $CH_2OC(=O)Me$ | O |
| D-9675 | Me(R) | single bond | H | c-Pr(1-CN) | H | Me | $CH_2OC(=O)Me$ | O |
| D-9676 | Me(S) | single bond | H | c-Pr(1-CN) | H | Me | $CH_2OC(=O)Me$ | O |
| D-9677 | H | single bond | Me | $CH_2CF_3$ | H | Cl | $CH_2OC(=O)$(i-Pr) | O |
| D-9678 | Me | single bond | H | $CH_2CF_3$ | H | Cl | $CH_2OC(=O)$(i-Pr) | O |
| D-9679 | Me(R) | single bond | H | $CH_2CF_3$ | H | Cl | $CH_2OC(=O)$(i-Pr) | O |
| D-9680 | Me(S) | single bond | H | $CH_2CF_3$ | H | Cl | $CH_2OC(=O)$(i-Pr) | O |
| D-9681 | H | single bond | Me | Et | H | Cl | $CH_2OC(=O)$(i-Pr) | O |
| D-9682 | Me | single bond | H | Et | H | Cl | $CH_2OC(=O)$(i-Pr) | O |
| D-9683 | Me(R) | single bond | H | Et | H | Cl | $CH_2OC(=O)$(i-Pr) | O |
| D-9684 | Me(S) | single bond | H | Et | H | Cl | $CH_2OC(=O)$(/-Pr) | O |
| D-9685 | H | single bond | Me | c-Pr | H | Cl | $CH_2OC(=O)$(i-Pr) | O |
| D-9686 | Me | single bond | H | c-Pr | H | Cl | $CH_2OC(=O)$(i-Pr) | O |
| D-9687 | Me(R) | single bond | H | c-Pr | H | Cl | $CH_2OC(=O)$(i-Pr) | O |
| D-9688 | Me(S) | single bond | H | c-Pr | H | Cl | $CH_2OC(=O)$(i-Pr) | O |
| D-9689 | H | single bond | Me | c-Pr(1-CN) | H | Cl | $CH_2OC(=O)$(i-Pr) | O |
| D-9690 | Me | single bond | H | c-Pr(1-CN) | H | Cl | $CH_2OC(=O)$(i-Pr) | O |
| D-9691 | Me(R) | single bond | H | c-Pr(1-CN) | H | Cl | $CH_2OC(=O)$(i-Pr) | O |
| D-9692 | Me(S) | single bond | H | c-Pr(1-CN) | H | Cl | $CH_2OC(=O)$(i-Pr) | O |
| D-9693 | H | single bond | Me | $CH_2CF_3$ | H | Me | $CH_2OC(=O)$(i-Pr) | O |
| D-9694 | Me | single bond | H | $CH_2CF_3$ | H | Me | $CH_2OC(=O)$(i-Pr) | O |
| D-9695 | Me(R) | single bond | H | $CH_2CF_3$ | H | Me | $CH_2OC(=O)$(i-Pr) | O |
| D-9696 | Me(S) | single bond | H | $CH_2CF_3$ | H | Me | $CH_2OC(=O)$(/-Pr) | O |
| D-9697 | H | single bond | Me | Et | H | Me | $CH_2OC(=O)$(i-Pr) | O |
| D-9698 | Me | single bond | H | Et | H | Me | $CH_2OC(=O)$(i-Pr) | O |
| D-9699 | Me(R) | single bond | H | Et | H | Me | $CH_2OC(=O)$(i-Pr) | O |
| D-9700 | Me(S) | single bond | H | Et | H | Me | $CH_2OC(=O)$(/-Pr) | O |
| D-9701 | H | single bond | Me | c-Pr | H | Me | $CH_2OC(=O)$(i-Pr) | O |
| D-9702 | Me | single bond | H | c-Pr | H | Me | $CH_2OC(=O)$(i-Pr) | O |
| D-9703 | Me(R) | single bond | H | c-Pr | H | Me | $CH_2OC(=O)$(i-Pr) | O |
| D-9704 | Me(S) | single bond | H | c-Pr | H | Me | $CH_2OC(=O)$(i-Pr) | O |
| D-9705 | H | single bond | Me | c-Pr(1-CN) | H | Me | $CH_2OC(=O)$(i-Pr) | O |
| D-9706 | Me | single bond | H | c-Pr(1-CN) | H | Me | $CH_2OC(=O)$(i-Pr) | O |
| D-9707 | Me(R) | single bond | H | c-Pr(1-CN) | H | Me | $CH_2OC(=O)$(i-Pr) | O |
| D-9708 | Me(S) | single bond | H | c-Pr(1-CN) | H | Me | $CH_2OC(=O)$(i-Pr) | O |
| D-9709 | H | single bond | Me | $CH_2CF_3$ | H | Cl | $CH_2OC(=O)$(t-Bu) | O |
| D-9710 | Me | single bond | H | $CH_2CF_3$ | H | Cl | $CH_2OC(=O)$(t-Bu) | O |
| D-9711 | Me(R) | single bond | H | $CH_2CF_3$ | H | Cl | $CH_2OC(=O)$(t-Bu) | O |
| D-9712 | Me(S) | single bond | H | $CH_2CF_3$ | H | Cl | $CH_2OC(=O)$(t-Bu) | O |
| D-9713 | H | single bond | Me | Et | H | Cl | $CH_2OC(=O)$(t-Bu) | O |
| D-9714 | Me | single bond | H | Et | H | Cl | $CH_2OC(=O)$(t-Bu) | O |

TABLE 867

| Compound Number | Y | W | Z | $R^1$ | $R^2$ | $R^3$ | $R^{10}$ | A |
|---|---|---|---|---|---|---|---|---|
| D-9715 | Me(R) | single bond | H | Et | H | Cl | $CH_2OC(=O)(t-Bu)$ | O |
| D-9716 | Me(S) | single bond | H | Et | H | Cl | $CH_2OC(=O)(t-Bu)$ | O |
| D-9717 | H | single bond | Me | c-Pr | H | Cl | $CH_2OC(=O)(t-Bu)$ | O |
| D-9718 | Me | single bond | H | c-Pr | H | Cl | $CH_2OC(=O)(t-Bu)$ | O |
| D-9719 | Me(R) | single bond | H | c-Pr | H | Cl | $CH_2OC(=O)(t-Bu)$ | O |
| D-9720 | Me(S) | single bond | H | c-Pr | H | Cl | $CH_2OC(=O)(t-Bu)$ | O |
| D-9721 | H | single bond | Me | c-Pr(1-CN) | H | Cl | $CH_2OC(=O)(t-Bu)$ | O |
| D-9722 | Me | single bond | H | c-Pr(1-CN) | H | Cl | $CH_2OC(=O)(t-Bu)$ | O |
| D-9723 | Me(R) | single bond | H | c-Pr(1-CN) | H | Cl | $CH_2OC(=O)(t-Bu)$ | O |
| D-9724 | Me(S) | single bond | H | c-Pr(1-CN) | H | Cl | $CH_2OC(=O)(t-Bu)$ | O |
| D-9725 | H | single bond | Me | $CH_2CF_3$ | H | Me | $CH_2OC(=O)(t-Bu)$ | O |
| D-9726 | Me | single bond | H | $CH_2CF_3$ | H | Me | $CH_2OC(=O)(t-Bu)$ | O |
| D-9727 | Me(R) | single bond | H | $CH_2CF_3$ | H | Me | $CH_2OC(=O)(t-Bu)$ | O |
| D-9728 | Me(S) | single bond | H | $CH_2CF_3$ | H | Me | $CH_2OC(=O)(t-Bu)$ | O |
| D-9729 | H | single bond | Me | Et | H | Me | $CH_2OC(=O)(t-Bu)$ | O |
| D-9730 | Me | single bond | H | Et | H | Me | $CH_2OC(=O)(t-Bu)$ | O |
| D-9731 | Me(R) | single bond | H | Et | H | Me | $CH_2OC(=O)(t-Bu)$ | O |
| D-9732 | Me(S) | single bond | H | Et | H | Me | $CH_2OC(=O)(t-Bu)$ | O |
| D-9733 | H | single bond | Me | c-Pr | H | Me | $CH_2OC(=O)(t-Bu)$ | O |
| D-9734 | Me | single bond | H | c-Pr | H | Me | $CH_2OC(=O)(t-Bu)$ | O |
| D-9735 | Me(R) | single bond | H | c-Pr | H | Me | $CH_2OC(=O)(t-Bu)$ | O |
| D-9736 | Me(S) | single bond | H | c-Pr | H | Me | $CH_2OC(=O)(t-Bu)$ | O |
| D-9737 | H | single bond | Me | c-Pr(1-CN) | H | Me | $CH_2OC(=O)(t-Bu)$ | O |
| D-9738 | Me | single bond | H | c-Pr(1-CN) | H | Me | $CH_2OC(=O)(t-Bu)$ | O |
| D-9739 | Me(R) | single bond | H | c-Pr(1-CN) | H | Me | $CH_2OC(=O)(t-Bu)$ | O |
| D-9740 | Me(S) | single bond | H | c-Pr(1-CN) | H | Me | $CH_2OC(=O)(t-Bu)$ | O |
| D-9741 | H | single bond | Me | $CH_2CF_3$ | H | Cl | $CH_2OC(=O)OEt$ | O |
| D-9742 | Me | single bond | H | $CH_2CF_3$ | H | Cl | $CH_2OC(=O)OEt$ | O |
| D-9743 | Me(R) | single bond | H | $CH_2CF_3$ | H | Cl | $CH_2OC(=O)OEt$ | O |
| D-9744 | Me(S) | single bond | H | $CH_2CF_3$ | H | Cl | $CH_2OC(=O)OEt$ | O |
| D-9745 | H | single bond | Me | Et | H | Cl | $CH_2OC(=O)OEt$ | O |
| D-9746 | Me | single bond | H | Et | H | Cl | $CH_2OC(=O)OEt$ | O |
| D-9747 | Me(R) | single bond | H | Et | H | Cl | $CH_2OC(=O)OEt$ | O |
| D-9748 | Me(S) | single bond | H | Et | H | Cl | $CH_2OC(=O)OEt$ | O |
| D-9749 | H | single bond | Me | c-Pr | H | Cl | $CH_2OC(=O)OEt$ | O |
| D-9750 | Me | single bond | H | c-Pr | H | C | $CH_2OC(=O)OEt$ | O |
| D-9751 | Me(R) | single bond | H | c-Pr | H | Cl | $CH_2OC(=O)OEt$ | O |
| D-9752 | Me(S) | single bond | H | c-Pr | H | Cl | $CH_2OC(=O)OEt$ | O |
| D-9753 | H | single bond | Me | c-Pr(1-CN) | H | Cl | $CH_2OC(=O)OEt$ | O |
| D-9754 | Me | single bond | H | c-Pr(1-CN) | H | C | $CH_2OC(=O)OEt$ | O |
| D-9755 | Me(R) | single bond | H | c-Pr(1-CN) | H | Cl | $CH_2OC(=O)OEt$ | O |
| D-9756 | Me(S) | single bond | H | c-Pr(1-CN) | H | Cl | $CH_2OC(=O)OEt$ | O |
| D-9757 | H | single bond | Me | $CH_2CF_3$ | H | Me | $CH_2OC(=O)OEt$ | O |
| D-9758 | Me | single bond | H | $CH_2CF_3$ | H | Me | $CH_2OC(=O)OEt$ | O |

TABLE 868

| Compound Number | Y | W | Z | $R^1$ | $R^2$ | $R^3$ | $R^{10}$ | A |
|---|---|---|---|---|---|---|---|---|
| D-9759 | Me(R) | single bond | H | $CH_2CF_3$ | H | Me | $CH_2OC(=O)OEt$ | O |
| D-9760 | Me(S) | single bond | H | $CH_2CF_3$ | H | Me | $CH_2OC(=O)OEt$ | O |
| D-9761 | H | single bond | Me | Et | H | Me | $CH_2OC(=O)OEt$ | O |
| D-9762 | Me | single bond | H | Et | H | Me | $CH_2OC(=O)OEt$ | O |
| D-9763 | Me(R) | single bond | H | Et | H | Me | $CH_2OC(=O)OEt$ | O |
| D-9764 | Me(S) | single bond | H | Et | H | Me | $CH_2OC(=O)OEt$ | O |
| D-9765 | H | single bond | Me | c-Pr | H | Me | $CH_2OC(=O)OEt$ | O |
| D-9766 | Me | single bond | H | c-Pr | H | Me | $CH_2OC(=O)OEt$ | O |
| D-9767 | Me(R) | single bond | H | c-Pr | H | Me | $CH_2OC(=O)OEt$ | O |
| D-9768 | Me(S) | single bond | H | c-Pr | H | Me | $CH_2OC(=O)OEt$ | O |
| D-9769 | H | single bond | Me | c-Pr(1-CN) | H | Me | $CH_2OC(=O)OEt$ | O |
| D-9770 | Me | single bond | H | c-Pr(1-CN) | H | Me | $CH_2OC(=O)OEt$ | O |
| D-9771 | Me(R) | single bond | H | c-Pr(1-CN) | H | Me | $CH_2OC(=O)OEt$ | O |
| D-9772 | Me(S) | single bond | H | c-Pr(1-CN) | H | Me | $CH_2OC(=O)OEt$ | O |
| D-9773 | H | single bond | Me | $CH_2CF_3$ | H | Cl | $CH_2OC(=O)O(i-Pr)$ | O |
| D-9774 | Me | single bond | H | $CH_2CF_3$ | H | Cl | $CH_2OC(=O)O(i-Pr)$ | O |
| D-9775 | Me(R) | single bond | H | $CH_2CF_3$ | H | Cl | $CH_2OC(=O)O(i-Pr)$ | O |
| D-9776 | Me(S) | single bond | H | $CH_2CF_3$ | H | Cl | $CH_2OC(=O)O(i-Pr)$ | O |
| D-9777 | H | single bond | Me | Et | H | Cl | $CH_2OC(=O)O(i-Pr)$ | O |
| D-9778 | Me | single bond | H | Et | H | Cl | $CH_2OC(=O)O(i-Pr)$ | O |
| D-9779 | Me(R) | single bond | H | Et | H | Cl | $CH_2OC(=O)O(i-Pr)$ | O |

TABLE 868-continued

| Compound Number | Y | W | Z | $R^1$ | $R^2$ | $R^3$ | $R^{10}$ | A |
|---|---|---|---|---|---|---|---|---|
| D-9780 | Me(S) | single bond | H | Et | H | Cl | $CH_2OC(=O)O(i-Pr)$ | O |
| D-9781 | H | single bond | Me | c-Pr | H | Cl | $CH_2OC(=O)O(i-Pr)$ | O |
| D-9782 | Me | single bond | H | c-Pr | H | Cl | $CH_2OC(=O)O(i-Pr)$ | O |
| D-9783 | Me(R) | single bond | H | c-Pr | H | Cl | $CH_2OC(=O)O(i-Pr)$ | O |
| D-9784 | Me(S) | single bond | H | c-Pr | H | Cl | $CH_2OC(=O)O(i-Pr)$ | O |
| D-9785 | H | single bond | Me | c-Pr(1-CN) | H | Cl | $CH_2OC(=O)O(i-Pr)$ | O |
| D-9786 | Me | single bond | H | c-Pr(1-CN) | H | Cl | $CH_2OC(=O)O(i-Pr)$ | O |
| D-9787 | Me(R) | single bond | H | c-Pr(1-CN) | H | Cl | $CH_2OC(=O)O(i-Pr)$ | O |
| D-9788 | Me(S) | single bond | H | c-Pr(1-CN) | H | Cl | $CH_2OC(=O)O(i-Pr)$ | O |
| D-9789 | H | single bond | Me | $CH_2CF_3$ | H | Me | $CH_2OC(=O)O(i-Pr)$ | O |
| D-9790 | Me | single bond | H | $CH_2CF_3$ | H | Me | $CH_2OC(=O)O(i-Pr)$ | O |
| D-9791 | Me(R) | single bond | H | $CH_2CF_3$ | H | Me | $CH_2OC(=O)O(i-Pr)$ | O |
| D-9792 | Me(S) | single bond | H | $CH_2CF_3$ | H | Me | $CH_2OC(=O)O(i-Pr)$ | O |
| D-9793 | H | single bond | Me | Et | H | Me | $CH_2OC(=O)O(i-Pr)$ | O |
| D-9794 | Me | single bond | H | Et | H | Me | $CH_2OC(=O)O(i-Pr)$ | O |
| D-9795 | Me(R) | single bond | H | Et | H | Me | $CH_2OC(=O)O(i-Pr)$ | O |
| D-9796 | Me(S) | single bond | H | Et | H | Me | $CH_2OC(=O)O(i-Pr)$ | O |
| D-9797 | H | single bond | Me | c-Pr | H | Me | $CH_2OC(=O)O(i-Pr)$ | O |
| D-9798 | Me | single bond | H | c-Pr | H | Me | $CH_2OC(=O)O(i-Pr)$ | O |
| D-9799 | Me(R) | single bond | H | c-Pr | H | Me | $CH_2OC(=O)O(i-Pr)$ | O |
| D-9800 | Me(S) | single bond | H | c-Pr | H | Me | $CH_2OC(=O)O(i-Pr)$ | O |
| D-9801 | H | single bond | Me | c-Pr(1-CN) | H | Me | $CH_2OC(=O)O(i-Pr)$ | O |
| D-9802 | Me | single bond | H | c-Pr(1-CN) | H | Me | $CH_2OC(=O)O(i-Pr)$ | O |

TABLE 869

| Compound Number | Y | W | Z | $R^1$ | $R^2$ | $R^3$ | $R^{10}$ | A |
|---|---|---|---|---|---|---|---|---|
| D-9803 | Me(R) | single bond | H | c-Pr(1-CN) | H | Me | $CH_2OC(=O)O(i-Pr)$ | O |
| D-9804 | Me(S) | single bond | H | c-Pr(1-CN) | H | Me | $CH_2OC(=O)O(i-Pr)$ | O |
| D-9805 | H | single bond | Me | $CH_2CF_3$ | H | Cl | $CH_2N(Me)C(=O)OMe$ | O |
| D-9806 | Me | single bond | H | $CH_2CF_3$ | H | Cl | $CH_2N(Me)C(=O)OMe$ | O |
| D-9807 | Me(R) | single bond | H | $CH_2CF_3$ | H | Cl | $CH_2N(Me)C(=O)OMe$ | O |
| D-9808 | Me(S) | single bond | H | $CH_2CF_3$ | H | Cl | $CH_2N(Me)C(=O)OMe$ | O |
| D-9809 | H | single bond | Me | Et | H | Cl | $CH_2N(Me)C(=O)OMe$ | O |
| D-9810 | Me | single bond | H | Et | H | Cl | $CH_2N(Me)C(=O)OMe$ | O |
| D-9811 | Me(R) | single bond | H | Et | H | Cl | $CH_2N(Me)C(=O)OMe$ | O |
| D-9812 | Me(S) | single bond | H | Et | H | Cl | $CH_2N(Me)C(=O)OMe$ | O |
| D-9813 | H | single bond | Me | c-Pr | H | Cl | $CH_2N(Me)C(=O)OMe$ | O |
| D-9814 | Me | single bond | H | c-Pr | H | Cl | $CH_2N(Me)C(=O)OMe$ | O |
| D-9815 | Me(R) | single bond | H | c-Pr | H | Cl | $CH_2N(Me)C(=O)OMe$ | O |
| D-9816 | Me(S) | single bond | H | c-Pr | H | Cl | $CH_2N(Me)C(=O)OMe$ | O |
| D-9817 | H | single bond | Me | c-Pr(1-CN) | H | Cl | $CH_2N(Me)C(=O)OMe$ | O |
| D-9818 | Me | single bond | H | c-Pr(1-CN) | H | Cl | $CH_2N(Me)C(=O)OMe$ | O |
| D-9819 | Me(R) | single bond | H | c-Pr(1-CN) | H | Cl | $CH_2N(Me)C(=O)OMe$ | O |
| D-9820 | Me(S) | single bond | H | c-Pr(1-CN) | H | Cl | $CH_2N(Me)C(=O)OMe$ | O |
| D-9821 | H | single bond | Me | $CH_2CF_3$ | H | Me | $CH_2N(Me)C(=O)OMe$ | O |
| D-9822 | Me | single bond | H | $CH_2CF_3$ | H | Me | $CH_2N(Me)C(=O)OMe$ | O |
| D-9823 | Me(R) | single bond | H | $CH_2CF_3$ | H | Me | $CH_2N(Me)C(=O)OMe$ | O |
| D-9824 | Me(S) | single bond | H | $CH_2CF_3$ | H | Me | $CH_2N(Me)C(=O)OMe$ | O |
| D-9825 | H | single bond | Me | Et | H | Me | $CH_2N(Me)C(=O)OMe$ | O |
| D-9826 | Me | single bond | H | Et | H | Me | $CH_2N(Me)C(=O)OMe$ | O |
| D-9827 | Me(R) | single bond | H | Et | H | Me | $CH_2N(Me)C(=O)OMe$ | O |
| D-9828 | Me(S) | single bond | H | Et | H | Me | $CH_2N(Me)C(=O)OMe$ | O |
| D-9829 | H | single bond | Me | c-Pr | H | Me | $CH_2N(Me)C(=O)OMe$ | O |
| D-9830 | Me | single bond | H | c-Pr | H | Me | $CH_2N(Me)C(=O)OMe$ | O |
| D-9831 | Me(R) | single bond | H | c-Pr | H | Me | $CH_2N(Me)C(=O)OMe$ | O |
| D-9832 | Me(S) | single bond | H | c-Pr | H | Me | $CH_2N(Me)C(=O)OMe$ | O |
| D-9833 | H | single bond | Me | c-Pr(1-CN) | H | Me | $CH_2N(Me)C(=O)OMe$ | O |
| D-9834 | Me | single bond | H | c-Pr(1-CN) | H | Me | $CH_2N(Me)C(=O)OMe$ | O |
| D-9835 | Me(R) | single bond | H | c-Pr(1-CN) | H | Me | $CH_2N(Me)C(=O)OMe$ | O |
| D-9836 | Me(S) | single bond | H | c-Pr(1-CN) | H | Me | $CH_2N(Me)C(=O)OMe$ | O |
| D-9837 | H | single bond | Me | $CH_2CF_3$ | H | Cl | $CH_2OCH_2CH_2OMe$ | O |
| D-9838 | Me | single bond | H | $CH_2CF_3$ | H | Cl | $CH_2OCH_2CH_2OMe$ | O |
| D-9839 | Me(R) | single bond | H | $CH_2CF_3$ | H | Cl | $CH_2OCH_2CH_2OMe$ | O |
| D-9840 | Me(S) | single bond | H | $CH_2CF_3$ | H | Cl | $CH_2OCH_2CH_2OMe$ | O |
| D-9841 | H | single bond | Me | Et | H | Cl | $CH_2OCH_2CH_2OMe$ | O |
| D-9842 | Me | single bond | H | Et | H | Cl | $CH_2OCH_2CH_2OMe$ | O |
| D-9843 | Me(R) | single bond | H | Et | H | Cl | $CH_2OCH_2CH_2OMe$ | O |
| D-9844 | Me(S) | single bond | H | Et | H | Cl | $CH_2OCH_2CH_2OMe$ | O |

TABLE 869-continued

| Compound Number | Y | W | Z | $R^1$ | $R^2$ | $R^3$ | $R^{10}$ | A |
|---|---|---|---|---|---|---|---|---|
| D-9845 | H | single bond | Me | c-Pr | H | Cl | $CH_2OCH_2CH_2OMe$ | O |
| D-9846 | Me | single bond | H | c-Pr | H | Cl | $CH_2OCH_2CH_2OMe$ | O |

TABLE 870

| Compound Number | Y | W | Z | $R^1$ | $R^2$ | $R^3$ | $R^{10}$ | A |
|---|---|---|---|---|---|---|---|---|
| D-9847 | Me(R) | single bond | H | c-Pr | H | Cl | $CH_2OCH_2CH_2OMe$ | O |
| D-9848 | Me(S) | single bond | H | c-Pr | H | Cl | $CH_2OCH_2CH_2OMe$ | O |
| D-9849 | H | single bond | Me | c-Pr(1-CN) | H | Cl | $CH_2OCH_2CH_2OMe$ | O |
| D-9850 | Me | single bond | H | c-Pr(1-CN) | H | Cl | $CH_2OCH_2CH_2OMe$ | O |
| D-9851 | Me(R) | single bond | H | c-Pr(1-CN) | H | Cl | $CH_2OCH_2CH_2OMe$ | O |
| D-9852 | Me(S) | single bond | H | c-Pr(1-CN) | H | Cl | $CH_2OCH_2CH_2OMe$ | O |
| D-9853 | H | single bond | Me | $CH_2CF_3$ | H | Me | $CH_2OCH_2CH_2OMe$ | O |
| D-9854 | Me | single bond | H | $CH_2CF_3$ | H | Me | $CH_2OCH_2CH_2OMe$ | O |
| D-9855 | Me(R) | single bond | H | $CH_2CF_3$ | H | Me | $CH_2OCH_2CH_2OMe$ | O |
| D-9856 | Me(S) | single bond | H | $CH_2CF_3$ | H | Me | $CH_2OCH_2CH_2OMe$ | O |
| D-9857 | H | single bond | Me | Et | H | Me | $CH_2OCH_2CH_2OMe$ | O |
| D-9858 | Me | single bond | H | Et | H | Me | $CH_2OCH_2CH_2OMe$ | O |
| D-9859 | Me(R) | single bond | H | Et | H | Me | $CH_2OCH_2CH_2OMe$ | O |
| D-9860 | Me(S) | single bond | H | Et | H | Me | $CH_2OCH_2CH_2OMe$ | O |
| D-9861 | H | single bond | Me | c-Pr | H | Me | $CH_2OCH_2CH_2OMe$ | O |
| D-9862 | Me | single bond | H | c-Pr | H | Me | $CH_2OCH_2CH_2OMe$ | O |
| D-9863 | Me(R) | single bond | H | c-Pr | H | Me | $CH_2OCH_2CH_2OMe$ | O |
| D-9864 | Me(S) | single bond | H | c-Pr | H | Me | $CH_2OCH_2CH_2OMe$ | O |
| D-9865 | H | single bond | Me | c-Pr(1-CN) | H | Me | $CH_2OCH_2CH_2OMe$ | O |
| D-9866 | Me | single bond | H | c-Pr(1-CN) | H | Me | $CH_2OCH_2CH_2OMe$ | O |
| D-9867 | Me(R) | single bond | H | c-Pr(1-CN) | H | Me | $CH_2OCH_2CH_2OMe$ | O |
| D-9868 | Me(S) | single bond | H | c-Pr(1-CN) | H | Me | $CH_2OCH_2CH_2OMe$ | O |
| D-9869 | H | single bond | Me | $CH_2CF_3$ | H | Cl | $CH_2OCH_2CH_2CN$ | O |
| D-9870 | Me | single bond | H | $CH_2CF_3$ | H | Cl | $CH_2OCH_2CH_2CN$ | O |
| D-9871 | Me(R) | single bond | H | $CH_2CF_3$ | H | Cl | $CH_2OCH_2CH_2CN$ | O |
| D-9872 | Me(S) | single bond | H | $CH_2CF_3$ | H | Cl | $CH_2OCH_2CH_2CN$ | O |
| D-9873 | H | single bond | Me | Et | H | Cl | $CH_2OCH_2CH_2CN$ | O |
| D-9874 | Me | single bond | H | Et | H | Cl | $CH_2OCH_2CH_2CN$ | O |
| D-9875 | Me(R) | single bond | H | Et | H | Cl | $CH_2OCH_2CH_2CN$ | O |
| D-9876 | Me(S) | single bond | H | Et | H | Cl | $CH_2OCH_2CH_2CN$ | O |
| D-9877 | H | single bond | Me | c-Pr | H | Cl | $CH_2OCH_2CH_2CN$ | O |
| D-9878 | Me | single bond | H | c-Pr | H | C | $CH_2OCH_2CH_2CN$ | O |
| D-9879 | Me(R) | single bond | H | c-Pr | H | Cl | $CH_2OCH_2CH_2CN$ | O |
| D-9880 | Me(S) | single bond | H | c-Pr | H | Cl | $CH_2OCH_2CH_2CN$ | O |
| D-9881 | H | single bond | Me | c-Pr(1-CN) | H | Cl | $CH_2OCH_2CH_2CN$ | O |
| D-9882 | Me | single bond | H | c-Pr(1-CN) | H | Cl | $CH_2OCH_2CH_2CN$ | O |
| D-9883 | Me(R) | single bond | H | c-Pr(1-CN) | H | Cl | $CH_2OCH_2CH_2CN$ | O |
| D-9884 | Me(S) | single bond | H | c-Pr(1-CN) | H | Cl | $CH_2OCH_2CH_2CN$ | O |
| D-9885 | H | single bond | Me | $CH_2CF_3$ | H | Me | $CH_2OCH_2CH_2CN$ | O |
| D-9886 | Me | single bond | H | $CH_2CF_3$ | H | Me | $CH_2OCH_2CH_2CN$ | O |
| D-9887 | Me(R) | single bond | H | $CH_2CF_3$ | H | Me | $CH_2OCH_2CH_2CN$ | O |
| D-9888 | Me(S) | single bond | H | $CH_2CF_3$ | H | Me | $CH_2OCH_2CH_2CN$ | O |
| D-9889 | H | single bond | Me | Et | H | Me | $CH_2OCH_2CH_2CN$ | O |
| D-9890 | Me | single bond | H | Et | H | Me | $CH_2OCH_2CH_2CN$ | O |

TABLE 871

| Compound Number | Y | W | Z | $R^1$ | $R^2$ | $R^3$ | $R^{10}$ | A |
|---|---|---|---|---|---|---|---|---|
| D-9891 | Me(R) | single bond | H | Et | H | Me | $CH_2OCH_2CH_2CN$ | O |
| D-9892 | Me(S) | single bond | H | Et | H | Me | $CH_2OCH_2CH_2CN$ | O |
| D-9893 | H | single bond | Me | c-Pr | H | Me | $CH_2OCH_2CH_2CN$ | O |
| D-9894 | Me | single bond | H | c-Pr | H | Me | $CH_2OCH_2CH_2CN$ | O |
| D-9895 | Me(R) | single bond | H | c-Pr | H | Me | $CH_2OCH_2CH_2CN$ | O |
| D-9896 | Me(S) | single bond | H | c-Pr | H | Me | $CH_2OCH_2CH_2CN$ | O |
| D-9897 | H | single bond | Me | c-Pr(1-CN) | H | Me | $CH_2OCH_2CH_2CN$ | O |
| D-9898 | Me | single bond | H | c-Pr(1-CN) | H | Me | $CH_2OCH_2CH_2CN$ | O |
| D-9899 | Me(R) | single bond | H | c-Pr(1-CN) | H | Me | $CH_2OCH_2CH_2CN$ | O |
| D-9900 | Me(S) | single bond | H | c-Pr(1-CN) | H | Me | $CH_2OCH_2CH_2CN$ | O |
| D-9901 | H | single bond | Me | $CH_2CF_3$ | H | Cl | $CH_2OCH_2CH_2S(=O)_2Me$ | O |
| D-9902 | Me | single bond | H | $CH_2CF_3$ | H | Cl | $CH_2OCH_2CH_2S(=O)_2Me$ | O |

TABLE 871-continued

| Compound Number | Y | W | Z | $R^1$ | $R^2$ | $R^3$ | $R^{10}$ | A |
|---|---|---|---|---|---|---|---|---|
| D-9903 | Me(R) | single bond | H | $CH_2CF_3$ | H | Cl | $CH_2OCH_2CH_2S(=O)_2Me$ | O |
| D-9904 | Me(S) | single bond | H | $CH_2CF_3$ | H | Cl | $CH_2OCH_2CH_2S(=O)_2Me$ | O |
| D-9905 | H | single bond | Me | Et | H | Cl | $CH_2OCH_2CH_2S(=O)_2Me$ | O |
| D-9906 | Me | single bond | H | Et | H | Cl | $CH_2OCH_2CH_2S(=O)_2Me$ | O |
| D-9907 | Me(R) | single bond | H | Et | H | Cl | $CH_2OCH_2CH_2S(=O)_2Me$ | O |
| D-9908 | Me(S) | single bond | H | Et | H | Cl | $CH_2OCH_2CH_2S(=O)_2Me$ | O |
| D-9909 | H | single bond | Me | c-Pr | H | Cl | $CH_2OCH_2CH_2S(=O)_2Me$ | O |
| D-9910 | Me | single bond | H | c-Pr | H | Cl | $CH_2OCH_2CH_2S(=O)_2Me$ | O |
| D-9911 | Me(R) | single bond | H | c-Pr | H | Cl | $CH_2OCH_2CH_2S(=O)_2Me$ | O |
| D-9912 | Me(S) | single bond | H | c-Pr | H | Cl | $CH_2OCH_2CH_2S(=O)_2Me$ | O |
| D-9913 | H | single bond | Me | c-Pr(1-CN) | H | Cl | $CH_2OCH_2CH_2S(=O)_2Me$ | O |
| D-9914 | Me | single bond | H | c-Pr(1-CN) | H | Cl | $CH_2OCH_2CH_2S(=O)_2Me$ | O |
| D-9915 | Me(R) | single bond | H | c-Pr(1-CN) | H | Cl | $CH_2OCH_2CH_2S(=O)_2Me$ | O |
| D-9916 | Me(S) | single bond | H | c-Pr(1-CN) | H | Cl | $CH_2OCH_2CH_2S(=O)_2Me$ | O |
| D-9917 | H | single bond | Me | $CH_2CF_3$ | H | Me | $CH_2OCH_2CH_2S(=O)_2Me$ | O |
| D-9918 | Me | single bond | H | $CH_2CF_3$ | H | Me | $CH_2OCH_2CH_2S(=O)_2Me$ | O |
| D-9919 | Me(R) | single bond | H | $CH_2CF_3$ | H | Me | $CH_2OCH_2CH_2S(=O)_2Me$ | O |
| D-9920 | Me(S) | single bond | H | $CH_2CF_3$ | H | Me | $CH_2OCH_2CH_2S(=O)_2Me$ | O |
| D-9921 | H | single bond | Me | Et | H | Me | $CH_2OCH_2CH_2S(=O)_2Me$ | O |
| D-9922 | Me | single bond | H | Et | H | Me | $CH_2OCH_2CH_2S(=O)_2Me$ | O |
| D-9923 | Me(R) | single bond | H | Et | H | Me | $CH_2OCH_2CH_2S(=O)_2Me$ | O |
| D-9924 | Me(S) | single bond | H | Et | H | Me | $CH_2OCH_2CH_2S(=O)_2Me$ | O |
| D-9925 | H | single bond | Me | c-Pr | H | Me | $CH_2OCH_2CH_2S(=O)_2Me$ | O |
| D-9926 | Me | single bond | H | c-Pr | H | Me | $CH_2OCH_2CH_2S(=O)_2Me$ | O |
| D-9927 | Me(R) | single bond | H | c-Pr | H | Me | $CH_2OCH_2CH_2S(=O)_2Me$ | O |
| D-9928 | Me(S) | single bond | H | c-Pr | H | Me | $CH_2OCH_2CH_2S(=O)_2Me$ | O |
| D-9929 | H | single bond | Me | c-Pr(1-CN) | H | Me | $CH_2OCH_2CH_2S(=O)_2Me$ | O |
| D-9930 | Me | single bond | H | c-Pr(1-CN) | H | Me | $CH_2OCH_2CH_2S(=O)_2Me$ | O |
| D-9931 | Me(R) | single bond | H | c-Pr(1-CN) | H | Me | $CH_2OCH_2CH_2S(=O)_2Me$ | O |
| D-9932 | Me(S) | single bond | H | c-Pr(1-CN) | H | Me | $CH_2OCH_2CH_2S(=O)_2Me$ | O |
| D-9933 | H | single bond | Me | $CH_2CF_3$ | H | Cl | $CH_2$(5-Me-1,3-dioxol-2-one-4-yl) | O |
| D-9934 | Me | single bond | H | $CH_2CF_3$ | H | Cl | $CH_2$(5-Me-1,3-dioxol-2-one-4-yl) | O |

TABLE 872

| Compound Number | Y | W | Z | $R^1$ | $R^2$ | $R^3$ | $R^{10}$ | A |
|---|---|---|---|---|---|---|---|---|
| D-9935 | Me(R) | single bond | H | $CH_2CF_3$ | H | Cl | $CH_2$(5-Me-1,3-dioxol-2-one-4-yl) | O |
| D-9936 | Me(S) | single bond | H | $CH_2CF_3$ | H | Cl | $CH_2$(5-Me-1,3-dioxol-2-one-4-yl) | O |
| D-9937 | H | single bond | Me | Et | H | Cl | $CH_2$(5-Me-1,3-dioxol-2-one-4-yl) | O |
| D-9938 | Me | single bond | H | Et | H | Cl | $CH_2$(5-Me-1,3-dioxol-2-one-4-yl) | O |
| D-9939 | Me(R) | single bond | H | Et | H | Cl | $CH_2$(5-Me-1,3-dioxol-2-one-4-yl) | O |
| D-9940 | Me(S) | single bond | H | Et | H | Cl | $CH_2$(5-Me-1,3-dioxol-2-one-4-yl) | O |
| D-9941 | H | single bond | Me | c-Pr | H | Cl | $CH_2$(5-Me-1,3-dioxol-2-one-4-yl) | O |
| D-9942 | Me | single bond | H | c-Pr | H | Cl | $CH_2$(5-Me-1,3-dioxol-2-one-4-yl) | O |
| D-9943 | Me(R) | single bond | H | c-Pr | H | Cl | $CH_2$(5-Me-1,3-dioxol-2-one-4-yl) | O |
| D-9944 | Me(S) | single bond | H | c-Pr | H | Cl | $CH_2$(5-Me-1,3-dioxol-2-one-4-yl) | O |
| D-9945 | H | single bond | Me | c-Pr(1-CN) | H | Cl | $CH_2$(5-Me-1,3-dioxol-2-one-4-yl) | O |
| D-9946 | Me | single bond | H | c-Pr(1-CN) | H | Cl | $CH_2$(5-Me-1,3-dioxol-2-one-4-yl) | O |
| D-9947 | Me(R) | single bond | H | c-Pr(1-CN) | H | Cl | $CH_2$(5-Me-1,3-dioxol-2-one-4-yl) | O |
| D-9948 | Me(S) | single bond | H | c-Pr(1-CN) | H | Cl | $CH_2$(5-Me-1,3-dioxol-2-one-4-yl) | O |
| D-9949 | H | single bond | Me | $CH_2CF_3$ | H | Me | $CH_2$(5-Me-1,3-dioxol-2-one-4-yl) | O |
| D-9950 | Me | single bond | H | $CH_2CF_3$ | H | Me | $CH_2$(5-Me-1,3-dioxol-2-one-4-yl) | O |
| D-9951 | Me(R) | single bond | H | $CH_2CF_3$ | H | Me | $CH_2$(5-Me-1,3-dioxol-2-one-4-yl) | O |
| D-9952 | Me(S) | single bond | H | $CH_2CF_3$ | H | Me | $CH_2$(5-Me-1,3-dioxol-2-one-4-yl) | O |
| D-9953 | H | single bond | Me | Et | H | Me | $CH_2$(5-Me-1,3-dioxol-2-one-4-yl) | O |
| D-9954 | Me | single bond | H | Et | H | Me | $CH_2$(5-Me-1,3-dioxol-2-one-4-yl) | O |
| D-9955 | Me(R) | single bond | H | Et | H | Me | $CH_2$(5-Me-1,3-dioxol-2-one-4-yl) | O |
| D-9956 | Me(S) | single bond | H | Et | H | Me | $CH_2$(5-Me-1,3-dioxol-2-one-4-yl) | O |
| D-9957 | H | single bond | Me | c-Pr | H | Me | $CH_2$(5-Me-1,3-dioxol-2-one-4-yl) | O |
| D-9958 | Me | single bond | H | c-Pr | H | Me | $CH_2$(5-Me-1,3-dioxol-2-one-4-yl) | O |
| D-9959 | Me(R) | single bond | H | c-Pr | H | Me | $CH_2$(5-Me-1,3-dioxol-2-one-4-yl) | O |
| D-9960 | Me(S) | single bond | H | c-Pr | H | Me | $CH_2$(5-Me-1,3-dioxol-2-one-4-yl) | O |
| D-9961 | H | single bond | Me | c-Pr(1-CN) | H | Me | $CH_2$(5-Me-1,3-dioxol-2-one-4-yl) | O |
| D-9962 | Me | single bond | H | c-Pr(1-CN) | H | Me | $CH_2$(5-Me-1,3-dioxol-2-one-4-yl) | O |
| D-9963 | Me(R) | single bond | H | c-Pr(1-CN) | H | Me | $CH_2$(5-Me-1,3-dioxol-2-one-4-yl) | O |
| D-9964 | Me(S) | single bond | H | c-Pr(1-CN) | H | Me | $CH_2$(5-Me-1,3-dioxol-2-one-4-yl) | O |
| D-9965 | H | single bond | Me | $CH_2CF_3$ | Me | Cl | c-Pr | O |
| D-9966 | Me | single bond | H | $CH_2CF_3$ | Me | Cl | c-Pr | O |
| D-9967 | Me(R) | single bond | H | $CH_2CF_3$ | Me | Cl | c-Pr | O |
| D-9968 | Me(S) | single bond | H | $CH_2CF_3$ | Me | Cl | c-Pr | O |
| D-9969 | H | single bond | Me | Et | Me | Cl | c-Pr | O |

TABLE 872-continued

| Compound Number | Y | W | Z | $R^1$ | $R^2$ | $R^3$ | $R^{10}$ | A |
|---|---|---|---|---|---|---|---|---|
| D-9970 | Me | single bond | H | Et | Me | Cl | c-Pr | O |
| D-9971 | Me(R) | single bond | H | Et | Me | Cl | c-Pr | O |
| D-9972 | Me(S) | single bond | H | Et | Me | Cl | c-Pr | O |
| D-9973 | H | single bond | Me | c-Pr | Me | Cl | c-Pr | O |
| D-9974 | Me | single bond | H | c-Pr | Me | Cl | c-Pr | O |
| D-9975 | Me(R) | single bond | H | c-Pr | Me | Cl | c-Pr | O |
| D-9976 | Me(S) | single bond | H | c-Pr | Me | Cl | c-Pr | O |
| D-9977 | H | single bond | Me | c-Pr(1-CN) | Me | Cl | c-Pr | O |
| D-9978 | Me | single bond | H | c-Pr(1-CN) | Me | Cl | c-Pr | O |

TABLE 873

| Compound Number | Y | W | Z | $R^1$ | $R^2$ | $R^3$ | $R^{10}$ | A |
|---|---|---|---|---|---|---|---|---|
| D-9979 | Me(R) | single bond | H | c-Pr(1-CN) | Me | Cl | c-Pr | O |
| D-9980 | Me(S) | single bond | H | c-Pr(1-CN) | Me | Cl | c-Pr | O |
| D-9981 | H | single bond | Me | $CH_2CF_3$ | Me | Me | c-Pr | O |
| D-9982 | Me | single bond | H | $CH_2CF_3$ | Me | Me | c-Pr | O |
| D-9983 | Me(R) | single bond | H | $CH_2CF_3$ | Me | Me | c-Pr | O |
| D-9984 | Me(S) | single bond | H | $CH_2CF_3$ | Me | Me | c-Pr | O |
| D-9985 | H | single bond | Me | Et | Me | Me | c-Pr | O |
| D-9986 | Me | single bond | H | Et | Me | Me | c-Pr | O |
| D-9987 | Me(R) | single bond | H | Et | Me | Me | c-Pr | O |
| D-9988 | Me(S) | single bond | H | Et | Me | Me | c-Pr | O |
| D-9989 | H | single bond | Me | c-Pr | Me | Me | c-Pr | O |
| D-9990 | Me | single bond | H | c-Pr | Me | Me | c-Pr | O |
| D-9991 | Me(R) | single bond | H | c-Pr | Me | Me | c-Pr | O |
| D-9992 | Me(S) | single bond | H | c-Pr | Me | Me | c-Pr | O |
| D-9993 | H | single bond | Me | c-Pr(1-CN) | Me | Me | c-Pr | O |
| D-9994 | Me | single bond | H | c-Pr(1-CN) | Me | Me | c-Pr | O |
| D-9995 | Me(R) | single bond | H | c-Pr(1-CN) | Me | Me | c-Pr | O |
| D-9996 | Me(S) | single bond | H | c-Pr(1-CN) | Me | Me | c-Pr | O |
| D-9997 | H | single bond | Me | $CH_2CF_3$ | Me | Cl | OMe | O |
| D-9998 | Me | single bond | H | $CH_2CF_3$ | Me | Cl | OMe | O |
| D-9999 | Me(R) | single bond | H | $CH_2CF_3$ | Me | Cl | OMe | O |
| D-10000 | Me(S) | single bond | H | $CH_2CF_3$ | Me | Cl | OMe | O |
| D-10001 | H | single bond | Me | Et | Me | Cl | OMe | O |

TABLE 873-continued

| Compound Number | Y | W | Z | $R^1$ | $R^2$ | $R^3$ | $R^{10}$ | A |
|---|---|---|---|---|---|---|---|---|
| D-10002 | Me | single bond | H | Et | Me | Cl | OMe | O |
| D-10003 | Me(R) | single bond | H | Et | Me | Cl | OMe | O |
| D-10004 | Me(S) | single bond | H | Et | Me | Cl | OMe | O |
| D-10005 | H | single bond | Me | c-Pr | Me | Cl | OMe | O |
| D-10006 | Me | single bond | H | c-Pr | Me | Cl | OMe | O |
| D-10007 | Me(R) | single bond | H | c-Pr | Me | Cl | OMe | O |
| D-10008 | Me(S) | single bond | H | c-Pr | Me | Cl | OMe | O |
| D-10009 | H | single bond | Me | c-Pr(1-CN) | Me | Cl | OMe | O |
| D-10010 | Me | single bond | H | c-Pr(1-CN) | Me | Cl | OMe | O |
| D-10011 | Me(R) | single bond | H | c-Pr(1-CN) | Me | Cl | OMe | O |
| D-10012 | Me(S) | single bond | H | c-Pr(1-CN) | Me | Cl | OMe | O |
| D-10013 | H | single bond | Me | $CH_2CF_3$ | Me | Me | OMe | O |
| D-10014 | Me | single bond | H | $CH_2CF_3$ | Me | Me | OMe | O |
| D-10015 | Me(R) | single bond | H | $CH_2CF_3$ | Me | Me | OMe | O |
| D-10016 | Me(S) | single bond | H | $CH_2CF_3$ | Me | Me | OMe | O |
| D-10017 | H | single bond | Me | Et | Me | Me | OMe | O |
| D-10018 | Me | single bond | H | Et | Me | Me | OMe | O |
| D-10019 | Me(R) | single bond | H | Et | Me | Me | OMe | O |
| D-10020 | Me(S) | single bond | H | Et | Me | Me | OMe | O |
| D-10021 | H | single bond | Me | c-Pr | Me | Me | OMe | O |
| D-10022 | Me | single bond | H | c-Pr | Me | Me | OMe | O |

TABLE 874

| Compound Number | Y | W | Z | $R^1$ | $R^2$ | $R^3$ | $R^{10}$ | A |
|---|---|---|---|---|---|---|---|---|
| D-10023 | Me(R) | single bond | H | c-Pr | Me | Me | OMe | O |
| D-10024 | Me(S) | single bond | H | c-Pr | Me | Me | OMe | O |
| D-10025 | H | single bond | Me | c-Pr(1-CN) | Me | Me | OMe | O |
| D-10026 | Me | single bond | H | c-Pr(1-CN) | Me | Me | OMe | O |
| D-10027 | Me(R) | single bond | H | c-Pr(1-CN) | Me | Me | OMe | O |
| D-10028 | Me(S) | single bond | H | c-Pr(1-CN) | Me | Me | OMe | O |
| D-10029 | H | single bond | Me | $CH_2CF_3$ | Me | Cl | C(=O)(i-Pr) | O |
| D-10030 | Me | single bond | H | $CH_2CF_3$ | Me | Cl | C(=O)(i-Pr) | O |
| D-10031 | Me(R) | single bond | H | $CH_2CF_3$ | Me | Cl | C(=O)(i-Pr) | O |
| D-10032 | Me(S) | single bond | H | $CH_2CF_3$ | Me | Cl | C(=O)(i-Pr) | O |
| D-10033 | H | single bond | Me | Et | Me | Cl | C(=O)(i-Pr) | O |
| D-10034 | Me | single bond | H | Et | Me | Cl | C(=O)(i-Pr) | O |
| D-10035 | Me(R) | single bond | H | Et | Me | Cl | C(=O)(i-Pr) | O |
| D-10036 | Me(S) | single bond | H | Et | Me | Cl | C(=O)(i-Pr) | O |
| D-10037 | H | single bond | Me | c-Pr | Me | Cl | C(=O)(i-Pr) | O |
| D-10038 | Me | single bond | H | c-Pr | Me | Cl | C(=O)(i-Pr) | O |
| D-10039 | Me(R) | single bond | H | c-Pr | Me | Cl | C(=O)(i-Pr) | O |
| D-10040 | Me(S) | single bond | H | c-Pr | Me | Cl | C(=O)(i-Pr) | O |
| D-10041 | H | single bond | Me | c-Pr(1-CN) | Me | Cl | C(=O)(i-Pr) | O |
| D-10042 | Me | single bond | H | c-Pr(1-CN) | Me | Cl | C(=O)(i-Pr) | O |
| D-10043 | Me(R) | single bond | H | c-Pr(1-CN) | Me | Cl | C(=O)(i-Pr) | O |
| D-10044 | Me(S) | single bond | H | c-Pr(1-CN) | Me | Cl | C(=O)(i-Pr) | O |
| D-10045 | H | single bond | Me | $CH_2CF_3$ | Me | Me | C(=O)(i-Pr) | O |
| D-10046 | Me | single bond | H | $CH_2CF_3$ | Me | Me | C(=O)(i-Pr) | O |
| D-10047 | Me(R) | single bond | H | $CH_2CF_3$ | Me | Me | C(=O)(i-Pr) | O |
| D-10048 | Me(S) | single bond | H | $CH_2CF_3$ | Me | Me | C(=O)(i-Pr) | O |
| D-10049 | H | single bond | Me | Et | Me | Me | C(=O)(i-Pr) | O |
| D-10050 | Me | single bond | H | Et | Me | Me | C(=O)(i-Pr) | O |
| D-10051 | Me(R) | single bond | H | Et | Me | Me | C(=O)(i-Pr) | O |

TABLE 874-continued

| Compound Number | Y | W | Z | $R^1$ | $R^2$ | $R^3$ | $R^{10}$ | A |
|---|---|---|---|---|---|---|---|---|
| D-10052 | Me(S) | single bond | H | Et | Me | Me | C(=O)(i-Pr) | O |
| D-10053 | H | single bond | Me | c-Pr | Me | Me | C(=O)(i-Pr) | O |
| D-10054 | Me | single bond | H | c-Pr | Me | Me | C(=O)(i-Pr) | O |
| D-10055 | Me(R) | single bond | H | c-Pr | Me | Me | C(=O)(i-Pr) | O |
| D-10056 | Me(S) | single bond | H | c-Pr | Me | Me | C(=O)(i-Pr) | O |
| D-10057 | H | single bond | Me | c-Pr(1-CN) | Me | Me | C(=O)(i-Pr) | O |
| D-10058 | Me | single bond | H | c-Pr(1-CN) | Me | Me | C(=O)(i-Pr) | O |
| D-10059 | Me(R) | single bond | H | c-Pr(1-CN) | Me | Me | C(=O)(i-Pr) | O |
| D-10060 | Me(S) | single bond | H | c-Pr(1-CN) | Me | Me | C(=O)(i-Pr) | O |
| D-10061 | H | single bond | Me | $CH_2CF_3$ | Me | Cl | C(=O)O(t-Bu) | O |
| D-10062 | Me | single bond | H | $CH_2CF_3$ | Me | Cl | C(=O)O(t-Bu) | O |
| D-10063 | Me(R) | single bond | H | $CH_2CF_3$ | Me | Cl | C(=O)O(t-Bu) | O |
| D-10064 | Me(S) | single bond | H | $CH_2CF_3$ | Me | Cl | C(=O)O(t-Bu) | O |
| D-10065 | H | single bond | Me | Et | Me | Cl | C(=O)O(t-Bu) | O |
| D-10066 | Me | single bond | H | Et | Me | Cl | C(=O)O(t-Bu) | O |

TABLE 875

| Compound Number | Y | W | Z | $R^1$ | $R^2$ | $R^3$ | $R^{10}$ | A |
|---|---|---|---|---|---|---|---|---|
| D-10067 | Me(R) | single bond | H | Et | Me | Cl | C(=O)O(t-Bu) | O |
| D-10068 | Me(S) | single bond | H | Et | Me | Cl | C(=O)O(t-Bu) | O |
| D-10069 | H | single bond | Me | c-Pr | Me | Cl | C(=O)O(t-Bu) | O |
| D-10070 | Me | single bond | H | c-Pr | Me | Cl | C(=O)O(t-Bu) | O |
| D-10071 | Me(R) | single bond | H | c-Pr | Me | Cl | C(=O)O(t-Bu) | O |
| D-10072 | Me(S) | single bond | H | c-Pr | Me | Cl | C(=O)O(t-Bu) | O |
| D-10073 | H | single bond | Me | c-Pr(1-CN) | Me | Cl | C(=O)O(t-Bu) | O |
| D-10074 | Me | single bond | H | c-Pr(1-CN) | Me | Cl | C(=O)O(t-Bu) | O |
| D-10075 | Me(R) | single bond | H | c-Pr(1-CN) | Me | Cl | C(=O)O(t-Bu) | O |
| D-10076 | Me(S) | single bond | H | c-Pr(1-CN) | Me | Cl | C(=O)O(t-Bu) | O |
| D-10077 | H | single bond | Me | $CH_2CF_3$ | Me | Me | C(=O)O(t-Bu) | O |
| D-10078 | Me | single bond | H | $CH_2CF_3$ | Me | Me | C(=O)O(t-Bu) | O |
| D-10079 | Me(R) | single bond | H | $CH_2CF_3$ | Me | Me | C(=O)O(t-Bu) | O |
| D-10080 | Me(S) | single bond | H | $CH_2CF_3$ | Me | Me | C(=O)O(t-Bu) | O |
| D-10081 | H | single bond | Me | Et | Me | Me | C(=O)O(t-Bu) | O |
| D-10082 | Me | single bond | H | Et | Me | Me | C(=O)O(t-Bu) | O |
| D-10083 | Me(R) | single bond | H | Et | Me | Me | C(=O)O(t-Bu) | O |
| D-10084 | Me(S) | single bond | H | Et | Me | Me | C(=O)O(t-Bu) | O |
| D-10085 | H | single bond | Me | c-Pr | Me | Me | C(=O)O(t-Bu) | O |
| D-10086 | Me | single bond | H | c-Pr | Me | Me | C(=O)O(t-Bu) | O |
| D-10087 | Me(R) | single bond | H | c-Pr | Me | Me | C(=O)O(t-Bu) | O |
| D-10088 | Me(S) | single bond | H | c-Pr | Me | Me | C(=O)O(t-Bu) | O |
| D-10089 | H | single bond | Me | c-Pr(1-CN) | Me | Me | C(=O)O(t-Bu) | O |
| D-10090 | Me | single bond | H | c-Pr(1-CN) | Me | Me | C(=O)O(t-Bu) | O |
| D-10091 | Me(R) | single bond | H | c-Pr(1-CN) | Me | Me | C(=O)O(t-Bu) | O |
| D-10092 | Me(S) | single bond | H | c-Pr(1-CN) | Me | Me | C(=O)O(t-Bu) | O |
| D-10093 | H | single bond | Me | $CH_2CF_3$ | Me | Cl | $CH_2OEt$ | O |
| D-10094 | Me | single bond | H | $CH_2CF_3$ | Me | Cl | $CH_2OEt$ | O |
| D-10095 | Me(R) | single bond | H | $CH_2CF_3$ | Me | Cl | $CH_2OEt$ | O |
| D-10096 | Me(S) | single bond | H | $CH_2CF_3$ | Me | Cl | $CH_2OEt$ | O |
| D-10097 | H | single bond | Me | Et | Me | Cl | $CH_2OEt$ | O |
| D-10098 | Me | single bond | H | Et | Me | Cl | $CH_2OEt$ | O |
| D-10099 | Me(R) | single bond | H | Et | Me | Cl | $CH_2OEt$ | O |
| D-10100 | Me(S) | single bond | H | Et | Me | Cl | $CH_2OEt$ | O |
| D-10101 | H | single bond | Me | c-Pr | Me | Cl | $CH_2OEt$ | O |
| D-10102 | Me | single bond | H | c-Pr | Me | Cl | $CH_2OEt$ | O |
| D-10103 | Me(R) | single bond | H | c-Pr | Me | Cl | $CH_2OEt$ | O |
| D-10104 | Me(S) | single bond | H | c-Pr | Me | Cl | $CH_2OEt$ | O |
| D-10105 | H | single bond | Me | c-Pr(1-CN) | Me | Cl | $CH_2OEt$ | O |
| D-10106 | Me | single bond | H | c-Pr(1-CN) | Me | Cl | $CH_2OEt$ | O |
| D-10107 | Me(R) | single bond | H | c-Pr(1-CN) | Me | Cl | $CH_2OEt$ | O |
| D-10108 | Me(S) | single bond | H | c-Pr(1-CN) | Me | Cl | $CH_2OEt$ | O |
| D-10109 | H | single bond | Me | $CH_2CF_3$ | Me | Me | $CH_2OEt$ | O |
| D-10110 | Me | single bond | H | $CH_2CF_3$ | Me | Me | $CH_2OEt$ | O |

TABLE 876

| Compound Number | Y | W | Z | $R^1$ | $R^2$ | $R^3$ | $R^{10}$ | A |
|---|---|---|---|---|---|---|---|---|
| D-10111 | Me(R) | single bond | H | $CH_2CF_3$ | Me | Me | $CH_2OEt$ | O |
| D-10112 | Me(S) | single bond | H | $CH_2CF_3$ | Me | Me | $CH_2OEt$ | O |
| D-10113 | H | single bond | Me | Et | Me | Me | $CH_2OEt$ | O |
| D-10114 | Me | single bond | H | Et | Me | Me | $CH_2OEt$ | O |
| D-10115 | Me(R) | single bond | H | Et | Me | Me | $CH_2OEt$ | O |
| D-10116 | Me(S) | single bond | H | Et | Me | Me | $CH_2OEt$ | O |
| D-10117 | H | single bond | Me | c-Pr | Me | Me | $CH_2OEt$ | O |
| D-10118 | Me | single bond | H | c-Pr | Me | Me | $CH_2OEt$ | O |
| D-10119 | Me(R) | single bond | H | c-Pr | Me | Me | $CH_2OEt$ | O |
| D-10120 | Me(S) | single bond | H | c-Pr | Me | Me | $CH_2OEt$ | O |
| D-10121 | H | single bond | Me | c-Pr(1-CN) | Me | Me | $CH_2OEt$ | O |
| D-10122 | Me | single bond | H | c-Pr(1-CN) | Me | Me | $CH_2OEt$ | O |
| D-10123 | Me(R) | single bond | H | c-Pr(1-CN) | Me | Me | $CH_2OEt$ | O |
| D-10124 | Me(S) | single bond | H | c-Pr(1-CN) | Me | Me | $CH_2OEt$ | O |
| D-10125 | H | single bond | Me | $CH_2CF_3$ | Me | Cl | $CH_2SMe$ | O |
| D-10126 | Me | single bond | H | $CH_2CF_3$ | Me | Cl | $CH_2SMe$ | O |
| D-10127 | Me(R) | single bond | H | $CH_2CF_3$ | Me | Cl | $CH_2SMe$ | O |
| D-10128 | Me(S) | single bond | H | $CH_2CF_3$ | Me | Cl | $CH_2SMe$ | O |
| D-10129 | H | single bond | Me | Et | Me | Cl | $CH_2SMe$ | O |
| D-10130 | Me | single bond | H | Et | Me | Cl | $CH_2SMe$ | O |
| D-10131 | Me(R) | single bond | H | Et | Me | Cl | $CH_2SMe$ | O |
| D-10132 | Me(S) | single bond | H | Et | Me | Cl | $CH_2SMe$ | O |
| D-10133 | H | single bond | Me | c-Pr | Me | Cl | $CH_2SMe$ | O |
| D-10134 | Me | single bond | H | c-Pr | Me | Cl | $CH_2SMe$ | O |
| D-10135 | Me(R) | single bond | H | c-Pr | Me | Cl | $CH_2SMe$ | O |
| D-10136 | Me(S) | single bond | H | c-Pr | Me | Cl | $CH_2SMe$ | O |
| D-10137 | H | single bond | Me | c-Pr(1-CN) | Me | Cl | $CH_2SMe$ | O |
| D-10138 | Me | single bond | H | c-Pr(1-CN) | Me | Cl | $CH_2SMe$ | O |
| D-10139 | Me(R) | single bond | H | c-Pr(1-CN) | Me | Cl | $CH_2SMe$ | O |
| D-10140 | Me(S) | single bond | H | c-Pr(1-CN) | Me | Cl | $CH_2SMe$ | O |
| D-10141 | H | single bond | Me | $CH_2CF_3$ | Me | Me | $CH_2SMe$ | O |
| D-10142 | Me | single bond | H | $CH_2CF_3$ | Me | Me | $CH_2SMe$ | O |
| D-10143 | Me(R) | single bond | H | $CH_2CF_3$ | Me | Me | $CH_2SMe$ | O |
| D-10144 | Me(S) | single bond | H | $CH_2CF_3$ | Me | Me | $CH_2SMe$ | O |
| D-10145 | H | single bond | Me | Et | Me | Me | $CH_2SMe$ | O |
| D-10146 | Me | single bond | H | Et | Me | Me | $CH_2SMe$ | O |
| D-10147 | Me(R) | single bond | H | Et | Me | Me | $CH_2SMe$ | O |
| D-10148 | Me(S) | single bond | H | Et | Me | Me | $CH_2SMe$ | O |
| D-10149 | H | single bond | Me | c-Pr | Me | Me | $CH_2SMe$ | O |
| D-10150 | Me | single bond | H | c-Pr | Me | Me | $CH_2SMe$ | O |
| D-10151 | Me(R) | single bond | H | c-Pr | Me | Me | $CH_2SMe$ | O |
| D-10152 | Me(S) | single bond | H | c-Pr | Me | Me | $CH_2SMe$ | O |
| D-10153 | H | single bond | Me | c-Pr(1-CN) | Me | Me | $CH_2SMe$ | O |
| D-10154 | Me | single bond | H | c-Pr(1-CN) | Me | Me | $CH_2SMe$ | O |

TABLE 877

| Compound Number | Y | W | Z | $R^1$ | $R^2$ | $R^3$ | $R^{10}$ | A |
|---|---|---|---|---|---|---|---|---|
| D-10155 | Me(R) | single bond | H | c-Pr(1-CN) | Me | Me | $CH_2SMe$ | O |
| D-10156 | Me(S) | single bond | H | c-Pr(1-CN) | Me | Me | $CH_2SMe$ | O |
| D-10157 | H | single bond | Me | $CH_2CF_3$ | Me | Cl | $CH_2S(=O)_2Me$ | O |
| D-10158 | Me | single bond | H | $CH_2CF_3$ | Me | Cl | $CH_2S(=O)_2Me$ | O |
| D-10159 | Me(R) | single bond | H | $CH_2CF_3$ | Me | Cl | $CH_2S(=O)_2Me$ | O |
| D-10160 | Me(S) | single bond | H | $CH_2CF_3$ | Me | Cl | $CH_2S(=O)_2Me$ | O |
| D-10161 | H | single bond | Me | Et | Me | Cl | $CH_2S(=O)_2Me$ | O |
| D-10162 | Me | single bond | H | Et | Me | Cl | $CH_2S(=O)_2Me$ | O |
| D-10163 | Me(R) | single bond | H | Et | Me | Cl | $CH_2S(=O)_2Me$ | O |
| D-10164 | Me(S) | single bond | H | Et | Me | Cl | $CH_2S(=O)_2Me$ | O |
| D-10165 | H | single bond | Me | c-Pr | Me | Cl | $CH_2S(=O)_2Me$ | O |
| D-10166 | Me | single bond | H | c-Pr | Me | Cl | $CH_2S(=O)_2Me$ | O |
| D-10167 | Me(R) | single bond | H | c-Pr | Me | Cl | $CH_2S(=O)_2Me$ | O |
| D-10168 | Me(S) | single bond | H | c-Pr | Me | Cl | $CH_2S(=O)_2Me$ | O |
| D-10169 | H | single bond | Me | c-Pr(1-CN) | Me | Cl | $CH_2S(=O)_2Me$ | O |
| D-10170 | Me | single bond | H | c-Pr(1-CN) | Me | Cl | $CH_2S(=O)_2Me$ | O |
| D-10171 | Me(R) | single bond | H | c-Pr(1-CN) | Me | Cl | $CH_2S(=O)_2Me$ | O |
| D-10172 | Me(S) | single bond | H | c-Pr(1-CN) | Me | Cl | $CH_2S(=O)_2Me$ | O |
| D-10173 | H | single bond | Me | $CH_2CF_3$ | Me | Me | $CH_2S(=O)_2Me$ | O |
| D-10174 | Me | single bond | H | $CH_2CF_3$ | Me | Me | $CH_2S(=O)_2Me$ | O |
| D-10175 | Me(R) | single bond | H | $CH_2CF_3$ | Me | Me | $CH_2S(=O)_2Me$ | O |
| D-10176 | Me(S) | single bond | H | $CH_2CF_3$ | Me | Me | $CH_2S(=O)_2Me$ | O |
| D-10177 | H | single bond | Me | Et | Me | Me | $CH_2S(=O)_2Me$ | O |

TABLE 877-continued

| Compound Number | Y | W | Z | $R^1$ | $R^2$ | $R^3$ | $R^{10}$ | A |
|---|---|---|---|---|---|---|---|---|
| D-10178 | Me | single bond | H | Et | Me | Me | $CH_2S(=O)_2Me$ | O |
| D-10179 | Me(R) | single bond | H | Et | Me | Me | $CH_2S(=O)_2Me$ | O |
| D-10180 | Me(S) | single bond | H | Et | Me | Me | $CH_2S(=O)_2Me$ | O |
| D-10181 | H | single bond | Me | c-Pr | Me | Me | $CH_2S(=O)_2Me$ | O |
| D-10182 | Me | single bond | H | c-Pr | Me | Me | $CH_2S(=O)_2Me$ | O |
| D-10183 | Me(R) | single bond | H | c-Pr | Me | Me | $CH_2S(=O)_2Me$ | O |
| D-10184 | Me(S) | single bond | H | c-Pr | Me | Me | $CH_2S(=O)_2Me$ | O |
| D-10185 | H | single bond | Me | c-Pr(1-CN) | Me | Me | $CH_2S(=O)_2Me$ | O |
| D-10186 | Me | single bond | H | c-Pr(1-CN) | Me | Me | $CH_2S(=O)_2Me$ | O |
| D-10187 | Me(R) | single bond | H | c-Pr(1-CN) | Me | Me | $CH_2S(=O)_2Me$ | O |
| D-10188 | Me(S) | single bond | H | c-Pr(1-CN) | Me | Me | $CH_2S(=O)_2Me$ | O |
| D-10189 | H | single bond | Me | $CH_2CF_3$ | Me | Cl | $CH_2C(=O)Me$ | O |
| D-10190 | Me | single bond | H | $CH_2CF_3$ | Me | Cl | $CH_2C(=O)Me$ | O |
| D-10191 | Me(R) | single bond | H | $CH_2CF_3$ | Me | Cl | $CH_2C(=O)Me$ | O |
| D-10192 | Me(S) | single bond | H | $CH_2CF_3$ | Me | Cl | $CH_2C(=O)Me$ | O |
| D-10193 | H | single bond | Me | Et | Me | Cl | $CH_2C(=O)Me$ | O |
| D-10194 | Me | single bond | H | Et | Me | Cl | $CH_2C(=O)Me$ | O |
| D-10195 | Me(R) | single bond | H | Et | Me | Cl | $CH_2C(=O)Me$ | O |
| D-10196 | Me(S) | single bond | H | Et | Me | Cl | $CH_2C(=O)Me$ | O |
| D-10197 | H | single bond | Me | c-Pr | Me | Cl | $CH_2C(=O)Me$ | O |
| D-10198 | Me | single bond | H | c-Pr | Me | Cl | $CH_2C(=O)Me$ | O |

TABLE 878

| Compound Number | Y | W | Z | $R^1$ | $R^2$ | $R^3$ | $R^{10}$ | A |
|---|---|---|---|---|---|---|---|---|
| D-10199 | Me(R) | single bond | H | c-Pr | Me | Cl | $CH_2C(=O)Me$ | O |
| D-10200 | Me(S) | single bond | H | c-Pr | Me | Cl | $CH_2C(=O)Me$ | O |
| D-10201 | H | single bond | Me | c-Pr(1-CN) | Me | Cl | $CH_2C(=O)Me$ | O |
| D-10202 | Me | single bond | H | c-Pr(1-CN) | Me | Cl | $CH_2C(=O)Me$ | O |
| D-10203 | Me(R) | single bond | H | c-Pr(1-CN) | Me | Cl | $CH_2C(=O)Me$ | O |
| D-10204 | Me(S) | single bond | H | c-Pr(1-CN) | Me | Cl | $CH_2C(=O)Me$ | O |
| D-10205 | H | single bond | Me | $CH_2CF_3$ | Me | Me | $CH_2C(=O)Me$ | O |
| D-10206 | Me | single bond | H | $CH_2CF_3$ | Me | Me | $CH_2C(=O)Me$ | O |
| D-10207 | Me(R) | single bond | H | $CH_2CF_3$ | Me | Me | $CH_2C(=O)Me$ | O |
| D-10208 | Me(S) | single bond | H | $CH_2CF_3$ | Me | Me | $CH_2C(=O)Me$ | O |
| D-10209 | H | single bond | Me | Et | Me | Me | $CH_2C(=O)Me$ | O |
| D-10210 | Me | single bond | H | Et | Me | Me | $CH_2C(=O)Me$ | O |
| D-10211 | Me(R) | single bond | H | Et | Me | Me | $CH_2C(=O)Me$ | O |
| D-10212 | Me(S) | single bond | H | Et | Me | Me | $CH_2C(=O)Me$ | O |
| D-10213 | H | single bond | Me | c-Pr | Me | Me | $CH_2C(=O)Me$ | O |
| D-10214 | Me | single bond | H | c-Pr | Me | Me | $CH_2C(=O)Me$ | O |
| D-10215 | Me(R) | single bond | H | c-Pr | Me | Me | $CH_2C(=O)Me$ | O |
| D-10216 | Me(S) | single bond | H | c-Pr | Me | Me | $CH_2C(=O)Me$ | O |
| D-10217 | H | single bond | Me | c-Pr(1-CN) | Me | Me | $CH_2C(=O)Me$ | O |
| D-10218 | Me | single bond | H | c-Pr(1-CN) | Me | Me | $CH_2C(=O)Me$ | O |
| D-10219 | Me(R) | single bond | H | c-Pr(1-CN) | Me | Me | $CH_2C(=O)Me$ | O |
| D-10220 | Me(S) | single bond | H | c-Pr(1-CN) | Me | Me | $CH_2C(=O)Me$ | O |
| D-10221 | H | single bond | Me | $CH_2CF_3$ | Me | Cl | $CH_2C(=O)OMe$ | O |
| D-10222 | Me | single bond | H | $CH_2CF_3$ | Me | Cl | $CH_2C(=O)OMe$ | O |
| D-10223 | Me(R) | single bond | H | $CH_2CF_3$ | Me | Cl | $CH_2C(=O)OMe$ | O |
| D-10224 | Me(S) | single bond | H | $CH_2CF_3$ | Me | Cl | $CH_2C(=O)OMe$ | O |
| D-10225 | H | single bond | Me | Et | Me | Cl | $CH_2C(=O)OMe$ | O |
| D-10226 | Me | single bond | H | Et | Me | Cl | $CH_2C(=O)OMe$ | O |
| D-10227 | Me(R) | single bond | H | Et | Me | Cl | $CH_2C(=O)OMe$ | O |
| D-10228 | Me(S) | single bond | H | Et | Me | Cl | $CH_2C(=O)OMe$ | O |
| D-10229 | H | single bond | Me | c-Pr | Me | Cl | $CH_2C(=O)OMe$ | O |
| D-10230 | Me | single bond | H | c-Pr | Me | Cl | $CH_2C(=O)OMe$ | O |
| D-10231 | Me(R) | single bond | H | c-Pr | Me | Cl | $CH_2C(=O)OMe$ | O |
| D-10232 | Me(S) | single bond | H | c-Pr | Me | Cl | $CH_2C(=O)OMe$ | O |
| D-10233 | H | single bond | Me | c-Pr(1-CN) | Me | Cl | $CH_2C(=O)OMe$ | O |
| D-10234 | Me | single bond | H | c-Pr(1-CN) | Me | Cl | $CH_2C(=O)OMe$ | O |
| D-10235 | Me(R) | single bond | H | c-Pr(1-CN) | Me | Cl | $CH_2C(=O)OMe$ | O |
| D-10236 | Me(S) | single bond | H | c-Pr(1-CN) | Me | Cl | $CH_2C(=O)OMe$ | O |
| D-10237 | H | single bond | Me | $CH_2CF_3$ | Me | Me | $CH_2C(=O)OMe$ | O |
| D-10238 | Me | single bond | H | $CH_2CF_3$ | Me | Me | $CH_2C(=O)OMe$ | O |
| D-10239 | Me(R) | single bond | H | $CH_2CF_3$ | Me | Me | $CH_2C(=O)OMe$ | O |
| D-10240 | Me(S) | single bond | H | $CH_2CF_3$ | Me | Me | $CH_2C(=O)OMe$ | O |
| D-10241 | H | single bond | Me | Et | Me | Me | $CH_2C(=O)OMe$ | O |
| D-10242 | Me | single bond | H | Et | Me | Me | $CH_2C(=O)OMe$ | O |

TABLE 879

| Compound Number | Y | W | Z | $R^1$ | $R^2$ | $R^3$ | $R^{10}$ | A |
|---|---|---|---|---|---|---|---|---|
| D-10243 | Me(R) | single bond | H | Et | Me | Me | $CH_2C(=O)OMe$ | O |
| D-10244 | Me(S) | single bond | H | Et | Me | Me | $CH_2C(=O)OMe$ | O |
| D-10245 | H | single bond | Me | c-Pr | Me | Me | $CH_2C(=O)OMe$ | O |
| D-10246 | Me | single bond | H | c-Pr | Me | Me | $CH_2C(=O)OMe$ | O |
| D-10247 | Me(R) | single bond | H | c-Pr | Me | Me | $CH_2C(=O)OMe$ | O |
| D-10248 | Me(S) | single bond | H | c-Pr | Me | Me | $CH_2C(=O)OMe$ | O |
| D-10249 | H | single bond | Me | c-Pr(1-CN) | Me | Me | $CH_2C(=O)OMe$ | O |
| D-10250 | Me | single bond | H | c-Pr(1-CN) | Me | Me | $CH_2C(=O)OMe$ | O |
| D-10251 | Me(R) | single bond | H | c-Pr(1-CN) | Me | Me | $CH_2C(=O)OMe$ | O |
| D-10252 | Me(S) | single bond | H | c-Pr(1-CN) | Me | Me | $CH_2C(=O)OMe$ | O |
| D-10253 | H | single bond | Me | $CH_2CF_3$ | Me | Cl | $CH_2C(=O)NHMe$ | O |
| D-10254 | Me | single bond | H | $CH_2CF_3$ | Me | Cl | $CH_2C(=O)NHMe$ | O |
| D-10255 | Me(R) | single bond | H | $CH_2CF_3$ | Me | Cl | $CH_2C(=O)NHMe$ | O |
| D-10256 | Me(S) | single bond | H | $CH_2CF_3$ | Me | Cl | $CH_2C(=O)NHMe$ | O |
| D-10257 | H | single bond | Me | Et | Me | Cl | $CH_2C(=O)NHMe$ | O |
| D-10258 | Me | single bond | H | Et | Me | Cl | $CH_2C(=O)NHMe$ | O |
| D-10259 | Me(R) | single bond | H | Et | Me | Cl | $CH_2C(=O)NHMe$ | O |
| D-10260 | Me(S) | single bond | H | Et | Me | Cl | $CH_2C(=O)NHMe$ | O |
| D-10261 | H | single bond | Me | c-Pr | Me | Cl | $CH_2C(=O)NHMe$ | O |
| D-10262 | Me | single bond | H | c-Pr | Me | Cl | $CH_2C(=O)NHMe$ | O |
| D-10263 | Me(R) | single bond | H | c-Pr | Me | Cl | $CH_2C(=O)NHMe$ | O |
| D-10264 | Me(S) | single bond | H | c-Pr | Me | Cl | $CH_2C(=O)NHMe$ | O |
| D-10265 | H | single bond | Me | c-Pr(1-CN) | Me | Cl | $CH_2C(=O)NHMe$ | O |
| D-10266 | Me | single bond | H | c-Pr(1-CN) | Me | Cl | $CH_2C(=O)NHMe$ | O |
| D-10267 | Me(R) | single bond | H | c-Pr(1-CN) | Me | Cl | $CH_2C(=O)NHMe$ | O |
| D-10268 | Me(S) | single bond | H | c-Pr(1-CN) | Me | Cl | $CH_2C(=O)NHMe$ | O |
| D-10269 | H | single bond | Me | $CH_2CF_3$ | Me | Me | $CH_2C(=O)NHMe$ | O |
| D-10270 | Me | single bond | H | $CH_2CF_3$ | Me | Me | $CH_2C(=O)NHMe$ | O |
| D-10271 | Me(R) | single bond | H | $CH_2CF_3$ | Me | Me | $CH_2C(=O)NHMe$ | O |
| D-10272 | Me(S) | single bond | H | $CH_2CF_3$ | Me | Me | $CH_2C(=O)NHMe$ | O |
| D-10273 | H | single bond | Me | Et | Me | Me | $CH_2C(=O)NHMe$ | O |
| D-10274 | Me | single bond | H | Et | Me | Me | $CH_2C(=O)NHMe$ | O |
| D-10275 | Me(R) | single bond | H | Et | Me | Me | $CH_2C(=O)NHMe$ | O |
| D-10276 | Me(S) | single bond | H | Et | Me | Me | $CH_2C(=O)NHMe$ | O |
| D-10277 | H | single bond | Me | c-Pr | Me | Me | $CH_2C(=O)NHMe$ | O |
| D-10278 | Me | single bond | H | c-Pr | Me | Me | $CH_2C(=O)NHMe$ | O |
| D-10279 | Me(R) | single bond | H | c-Pr | Me | Me | $CH_2C(=O)NHMe$ | O |
| D-10280 | Me(S) | single bond | H | c-Pr | Me | Me | $CH_2C(=O)NHMe$ | O |
| D-10281 | H | single bond | Me | c-Pr(1-CN) | Me | Me | $CH_2C(=O)NHMe$ | O |
| D-10282 | Me | single bond | H | c-Pr(1-CN) | Me | Me | $CH_2C(=O)NHMe$ | O |
| D-10283 | Me(R) | single bond | H | c-Pr(1-CN) | Me | Me | $CH_2C(=O)NHMe$ | O |
| D-10284 | Me(S) | single bond | H | c-Pr(1-CN) | Me | Me | $CH_2C(=O)NHMe$ | O |
| D-10285 | H | single bond | Me | $CH_2CF_3$ | Me | Cl | $CH_2OC(=O)Me$ | O |
| D-10286 | Me | single bond | H | $CH_2CF_3$ | Me | Cl | $CH_2OC(=O)Me$ | O |

TABLE 880

| Compound Number | Y | W | Z | $R^1$ | $R^2$ | $R^3$ | $R^{10}$ | A |
|---|---|---|---|---|---|---|---|---|
| D-10287 | Me(R) | single bond | H | $CH_2CF_3$ | Me | Cl | $CH_2OC(=O)Me$ | O |
| D-10288 | Me(S) | single bond | H | $CH_2CF_3$ | Me | Cl | $CH_2OC(=O)Me$ | O |
| D-10289 | H | single bond | Me | Et | Me | Cl | $CH_2OC(=O)Me$ | O |
| D-10290 | Me | single bond | H | Et | Me | Cl | $CH_2OC(=O)Me$ | O |
| D-10291 | Me(R) | single bond | H | Et | Me | Cl | $CH_2OC(=O)Me$ | O |
| D-10292 | Me(S) | single bond | H | Et | Me | Cl | $CH_2OC(=O)Me$ | O |
| D-10293 | H | single bond | Me | c-Pr | Me | Cl | $CH_2OC(=O)Me$ | O |
| D-10294 | Me | single bond | H | c-Pr | Me | Cl | $CH_2OC(=O)Me$ | O |
| D-10295 | Me(R) | single bond | H | c-Pr | Me | Cl | $CH_20C(=O)Me$ | O |
| D-10296 | Me(S) | single bond | H | c-Pr | Me | Cl | $CH_2OC(=O)Me$ | O |
| D-10297 | H | single bond | Me | c-Pr(1-CN) | Me | Cl | $CH_2OC(=O)Me$ | O |
| D-10298 | Me | single bond | H | c-Pr(1-CN) | Me | Cl | $CH_2OC(=O)Me$ | O |
| D-10299 | Me(R) | single bond | H | c-Pr(1-CN) | Me | Cl | $CH_2OC(=O)Me$ | O |
| D-10300 | Me(S) | single bond | H | c-Pr(1-CN) | Me | Cl | $CH_2OC(=O)Me$ | O |
| D-10301 | H | single bond | Me | $CH_2CF_3$ | Me | Me | $CH_2OC(=O)Me$ | O |
| D-10302 | Me | single bond | H | $CH_2CF_3$ | Me | Me | $CH_2OC(=O)Me$ | O |
| D-10303 | Me(R) | single bond | H | $CH_2CF_3$ | Me | Me | $CH_2OC(=O)Me$ | O |
| D-10304 | Me(S) | single bond | H | $CH_2CF_3$ | Me | Me | $CH_2OC(=O)Me$ | O |
| D-10305 | H | single bond | Me | Et | Me | Me | $CH_2OC(=O)Me$ | O |
| D-10306 | Me | single bond | H | Et | Me | Me | $CH_2OC(=O)Me$ | O |
| D-10307 | Me(R) | single bond | H | Et | Me | Me | $CH_2OC(=O)Me$ | O |

TABLE 880-continued

| Compound Number | Y | W | Z | $R^1$ | $R^2$ | $R^3$ | $R^{10}$ | A |
|---|---|---|---|---|---|---|---|---|
| D-10308 | Me(S) | single bond | H | Et | Me | Me | $CH_2OC(=O)Me$ | O |
| D-10309 | H | single bond | Me | c-Pr | Me | Me | $CH_2OC(=O)Me$ | O |
| D-10310 | Me | single bond | H | c-Pr | Me | Me | $CH_2OC(=O)Me$ | O |
| D-10311 | Me(R) | single bond | H | c-Pr | Me | Me | $CH_2OC(=O)Me$ | O |
| D-10312 | Me(S) | single bond | H | c-Pr | Me | Me | $CH_2OC(=O)Me$ | O |
| D-10313 | H | single bond | Me | c-Pr(1-CN) | Me | Me | $CH_2OC(=O)Me$ | O |
| D-10314 | Me | single bond | H | c-Pr(1-CN) | Me | Me | $CH_2OC(=O)Me$ | O |
| D-10315 | Me(R) | single bond | H | c-Pr(1-CN) | Me | Me | $CH_2OC(=O)Me$ | O |
| D-10316 | Me(S) | single bond | H | c-Pr(1-CN) | Me | Me | $CH_2OC(=O)Me$ | O |
| D-10317 | H | single bond | Me | $CH_2CF_3$ | Me | Cl | $CH_2OC(=O)$(i-Pr) | O |
| D-10318 | Me | single bond | H | $CH_2CF_3$ | Me | Cl | $CH_2OC(=O)$(i-Pr) | O |
| D-10319 | Me(R) | single bond | H | $CH_2CF_3$ | Me | Cl | $CH_2OC(=O)$(i-Pr) | O |
| D-10320 | Me(S) | single bond | H | $CH_2CF_3$ | Me | Cl | $CH_2OC(=O)$(i-Pr) | O |
| D-10321 | H | single bond | Me | Et | Me | Cl | $CH_2OC(=O)$(i-Pr) | O |
| D-10322 | Me | single bond | H | Et | Me | Cl | $CH_2OC(=O)$(i-Pr) | O |
| D-10323 | Me(R) | single bond | H | Et | Me | Cl | $CH_2OC(=O)$(i-Pr) | O |
| D-10324 | Me(S) | single bond | H | Et | Me | Cl | $CH_2OC(=O)$(i-Pr) | O |
| D-10325 | H | single bond | Me | c-Pr | Me | Cl | $CH_2OC(=O)$(i-Pr) | O |
| D-10326 | Me | single bond | H | c-Pr | Me | Cl | $CH_2OC(=O)$(i-Pr) | O |
| D-10327 | Me(R) | single bond | H | c-Pr | Me | Cl | $CH_2OC(=O)$(i-Pr) | O |
| D-10328 | Me(S) | single bond | H | c-Pr | Me | Cl | $CH_2OC(=O)$(i-Pr) | O |
| D-10329 | H | single bond | Me | c-Pr(1-CN) | Me | Cl | $CH_2OC(=O)$(i-Pr) | O |
| D-10330 | Me | single bond | H | c-Pr(1-CN) | Me | Cl | $CH_2OC(=O)$(i-Pr) | O |

TABLE 881

| Compound Number | Y | W | Z | $R^1$ | $R^2$ | $R^3$ | $R^{10}$ | A |
|---|---|---|---|---|---|---|---|---|
| D-10331 | Me(R) | single bond | H | c-Pr(1-CN) | Me | Cl | $CH_2OC(=O)$(i-Pr) | O |
| D-10332 | Me(S) | single bond | H | c-Pr(1-CN) | Me | Cl | $CH_2OC(=O)$(i-Pr) | O |
| D-10333 | H | single bond | Me | $CH_2CF_3$ | Me | Me | $CH_2OC(=O)$(i-Pr) | O |
| D-10334 | Me | single bond | H | $CH_2CF_3$ | Me | Me | $CH_2OC(=O)$(i-Pr) | O |
| D-10335 | Me(R) | single bond | H | $CH_2CF_3$ | Me | Me | $CH_2OC(=O)$(i-Pr) | O |
| D-10336 | Me(S) | single bond | H | $CH_2CF_3$ | Me | Me | $CH_2OC(=O)$(i-Pr) | O |
| D-10337 | H | single bond | Me | Et | Me | Me | $CH_2OC(=O)$(i-Pr) | O |
| D-10338 | Me | single bond | H | Et | Me | Me | $CH_2OC(=O)$(i-Pr) | O |
| D-10339 | Me(R) | single bond | H | Et | Me | Me | $CH_2OC(=O)$(i-Pr) | O |
| D-10340 | Me(S) | single bond | H | Et | Me | Me | $CH_2OC(=O)$(i-Pr) | O |
| D-10341 | H | single bond | Me | c-Pr | Me | Me | $CH_2OC(=O)$(i-Pr) | O |
| D-10342 | Me | single bond | H | c-Pr | Me | Me | $CH_2OC(=O)$(i-Pr) | O |
| D-10343 | Me(R) | single bond | H | c-Pr | Me | Me | $CH_2OC(=O)$(i-Pr) | O |
| D-10344 | Me(S) | single bond | H | c-Pr | Me | Me | $CH_2OC(=O)$(i-Pr) | O |
| D-10345 | H | single bond | Me | c-Pr(1-CN) | Me | Me | $CH_2OC(=O)$(i-Pr) | O |
| D-10346 | Me | single bond | H | c-Pr(1-CN) | Me | Me | $CH_2OC(=O)$(i-Pr) | O |
| D-10347 | Me(R) | single bond | H | c-Pr(1-CN) | Me | Me | $CH_2OC(=O)$(i-Pr) | O |
| D-10348 | Me(S) | single bond | H | c-Pr(1-CN) | Me | Me | $CH_2OC(=O)$(i-Pr) | O |
| D-10349 | H | single bond | Me | $CH_2CF_3$ | Me | Cl | $CH_2OC(=O)$(t-Bu) | O |
| D-10350 | Me | single bond | H | $CH_2CF_3$ | Me | Cl | $CH_2OC(=O)$(t-Bu) | O |
| D-10351 | Me(R) | single bond | H | $CH_2CF_3$ | Me | Cl | $CH_2OC(=O)$(t-Bu) | O |
| D-10352 | Me(S) | single bond | H | $CH_2CF_3$ | Me | Cl | $CH_2OC(=O)$(t-Bu) | O |
| D-10353 | H | single bond | Me | Et | Me | Cl | $CH_2OC(=O)$(t-Bu) | O |
| D-10354 | Me | single bond | H | Et | Me | Cl | $CH_2OC(=O)$(t-Bu) | O |
| D-10355 | Me(R) | single bond | H | Et | Me | Cl | $CH_2OC(=O)$(t-Bu) | O |
| D-10356 | Me(S) | single bond | H | Et | Me | Cl | $CH_2OC(=O)$(t-Bu) | O |
| D-10357 | H | single bond | Me | c-Pr | Me | Cl | $CH_2OC(=O)$(t-Bu) | O |
| D-10358 | Me | single bond | H | c-Pr | Me | Cl | $CH_2OC(=O)$(t-Bu) | O |
| D-10359 | Me(R) | single bond | H | c-Pr | Me | Cl | $CH_2OC(=O)$(t-Bu) | O |
| D-10360 | Me(S) | single bond | H | c-Pr | Me | Cl | $CH_2OC(=O)$(t-Bu) | O |
| D-10361 | H | single bond | Me | c-Pr(1-CN) | Me | Cl | $CH_2OC(=O)$(t-Bu) | O |
| D-10362 | Me | single bond | H | c-Pr(1-CN) | Me | Cl | $CH_2OC(=O)$(t-Bu) | O |
| D-10363 | Me(R) | single bond | H | c-Pr(1-CN) | Me | Cl | $CH_2OC(=O)$(t-Bu) | O |
| D-10364 | Me(S) | single bond | H | c-Pr(1-CN) | Me | Cl | $CH_2OC(=O)$(t-Bu) | O |
| D-10365 | H | single bond | Me | $CH_2CF_3$ | Me | Me | $CH_2OC(=O)$(t-Bu) | O |
| D-10366 | Me | single bond | H | $CH_2CF_3$ | Me | Me | $CH_2OC(=O)$(t-Bu) | O |
| D-10367 | Me(R) | single bond | H | $CH_2CF_3$ | Me | Me | $CH_2OC(=O)$(t-Bu) | O |
| D-10368 | Me(S) | single bond | H | $CH_2CF_3$ | Me | Me | $CH_2OC(=O)$(t-Bu) | O |
| D-10369 | H | single bond | Me | Et | Me | Me | $CH_2OC(=O)$(t-Bu) | O |
| D-10370 | Me | single bond | H | Et | Me | Me | $CH_2OC(=O)$(t-Bu) | O |
| D-10371 | Me(R) | single bond | H | Et | Me | Me | $CH_2OC(=O)$(t-Bu) | O |
| D-10372 | Me(S) | single bond | H | Et | Me | Me | $CH_2OC(=O)$(t-Bu) | O |

TABLE 881-continued

| Compound Number | Y | W | Z | $R^1$ | $R^2$ | $R^3$ | $R^{10}$ | A |
|---|---|---|---|---|---|---|---|---|
| D-10373 | H | single bond | Me | c-Pr | Me | Me | $CH_2OC(=O)(t-Bu)$ | O |
| D-10374 | Me | single bond | H | c-Pr | Me | Me | $CH_2OC(=O)(t-Bu)$ | O |

TABLE 882

| Compound Number | Y | W | Z | $R^1$ | $R^2$ | $R^3$ | $R^{10}$ | A |
|---|---|---|---|---|---|---|---|---|
| D-10375 | Me(R) | single bond | H | c-Pr | Me | Me | $CH_2OC(=O)(t-Bu)$ | O |
| D-10376 | Me(S) | single bond | H | c-Pr | Me | Me | $CH_2OC(=O)(t-Bu)$ | O |
| D-10377 | H | single bond | Me | c-Pr(1-CN) | Me | Me | $CH_2OC(=O)(t-Bu)$ | O |
| D-10378 | Me | single bond | H | c-Pr(1-CN) | Me | Me | $CH_2OC(=O)(t-Bu)$ | O |
| D-10379 | Me(R) | single bond | H | c-Pr(1-CN) | Me | Me | $CH_2OC(=O)(t-Bu)$ | O |
| D-10380 | Me(S) | single bond | H | c-Pr(1-CN) | Me | Me | $CH_2OC(=O)(t-Bu)$ | O |
| D-10381 | H | single bond | Me | $CH_2CF_3$ | Me | Cl | $CH_2OC(=O)OEt$ | O |
| D-10382 | Me | single bond | H | $CH_2CF_3$ | Me | Cl | $CH_2OC(=O)OEt$ | O |
| D-10383 | Me(R) | single bond | H | $CH_2CF_3$ | Me | Cl | $CH_2OC(=O)OEt$ | O |
| D-10384 | Me(S) | single bond | H | $CH_2CF_3$ | Me | Cl | $CH_2OC(=O)OEt$ | O |
| D-10385 | H | single bond | Me | Et | Me | Cl | $CH_2OC(=O)OEt$ | O |
| D-10386 | Me | single bond | H | Et | Me | Cl | $CH_2OC(=O)OEt$ | O |
| D-10387 | Me(R) | single bond | H | Et | Me | Cl | $CH_2OC(=O)OEt$ | O |
| D-10388 | Me(S) | single bond | H | Et | Me | Cl | $CH_2OC(=O)OEt$ | O |
| D-10389 | H | single bond | Me | c-Pr | Me | Cl | $CH_2OC(=O)OEt$ | O |
| D-10390 | Me | single bond | H | c-Pr | Me | Cl | $CH_2OC(=O)OEt$ | O |
| D-10391 | Me(R) | single bond | H | c-Pr | Me | Cl | $CH_2OC(=O)OEt$ | O |
| D-10392 | Me(S) | single bond | H | c-Pr | Me | Cl | $CH_2OC(=O)OEt$ | O |
| D-10393 | H | single bond | Me | c-Pr(1-CN) | Me | Cl | $CH_2OC(=O)OEt$ | O |
| D-10394 | Me | single bond | H | c-Pr(1-CN) | Me | Cl | $CH_2OC(=O)OEt$ | O |
| D-10395 | Me(R) | single bond | H | c-Pr(1-CN) | Me | Cl | $CH_2OC(=O)OEt$ | O |
| D-10396 | Me(S) | single bond | H | c-Pr(1-CN) | Me | Cl | $CH_2OC(=O)OEt$ | O |
| D-10397 | H | single bond | Me | $CH_2CF_3$ | Me | Me | $CH_2OC(=O)OEt$ | O |
| D-10398 | Me | single bond | H | $CH_2CF_3$ | Me | Me | $CH_2OC(=O)OEt$ | O |
| D-10399 | Me(R) | single bond | H | $CH_2CF_3$ | Me | Me | $CH_2OC(=O)OEt$ | O |
| D-10400 | Me(S) | single bond | H | $CH_2CF_3$ | Me | Me | $CH_2OC(=O)OEt$ | O |
| D-10401 | H | single bond | Me | Et | Me | Me | $CH_2OC(=O)OEt$ | O |
| D-10402 | Me | single bond | H | Et | Me | Me | $CH_2OC(=O)OEt$ | O |
| D-10403 | Me(R) | single bond | H | Et | Me | Me | $CH_2OC(=O)OEt$ | O |
| D-10404 | Me(S) | single bond | H | Et | Me | Me | $CH_2OC(=O)OEt$ | O |
| D-10405 | H | single bond | Me | c-Pr | Me | Me | $CH_2OC(=O)OEt$ | O |
| D-10406 | Me | single bond | H | c-Pr | Me | Me | $CH_2OC(=O)OEt$ | O |
| D-10407 | Me(R) | single bond | H | c-Pr | Me | Me | $CH_2OC(=O)OEt$ | O |
| D-10408 | Me(S) | single bond | H | c-Pr | Me | Me | $CH_2OC(=O)OEt$ | O |
| D-10409 | H | single bond | Me | c-Pr(1-CN) | Me | Me | $CH_2OC(=O)OEt$ | O |
| D-10410 | Me | single bond | H | c-Pr(1-CN) | Me | Me | $CH_2OC(=O)OEt$ | O |
| D-10411 | Me(R) | single bond | H | c-Pr(1-CN) | Me | Me | $CH_2OC(=O)OEt$ | O |
| D-10412 | Me(S) | single bond | H | c-Pr(1-CN) | Me | Me | $CH_2OC(=O)OEt$ | O |
| D-10413 | H | single bond | Me | $CH_2CF_3$ | Me | Cl | $CH_2OC(=O)O(i-Pr)$ | O |
| D-10414 | Me | single bond | H | $CH_2CF_3$ | Me | Cl | $CH_2OC(=O)O(i-Pr)$ | O |
| D-10415 | Me(R) | single bond | H | $CH_2CF_3$ | Me | Cl | $CH_2OC(=O)O(i-Pr)$ | O |
| D-10416 | Me(S) | single bond | H | $CH_2CF_3$ | Me | Cl | $CH_2OC(=O)O(i-Pr)$ | O |
| D-10417 | H | single bond | Me | Et | Me | Cl | $CH_2OC(=O)O(i-Pr)$ | O |
| D-10418 | Me | single bond | H | Et | Me | Cl | $CH_2OC(=O)O(i-Pr)$ | O |

TABLE 883

| Compound Number | Y | W | Z | $R^1$ | $R^2$ | $R^3$ | $R^{10}$ | A |
|---|---|---|---|---|---|---|---|---|
| D-10419 | Me(R) | single bond | H | Et | Me | Cl | $CH_2OC(=O)O(i-Pr)$ | O |
| D-10420 | Me(S) | single bond | H | Et | Me | Cl | $CH_2OC(=O)O(i-Pr)$ | O |
| D-10421 | H | single bond | Me | c-Pr | Me | Cl | $CH_2OC(=O)O(i-Pr)$ | O |
| D-10422 | Me | single bond | H | c-Pr | Me | Cl | $CH_2OC(=O)O(i-Pr)$ | O |
| D-10423 | Me(R) | single bond | H | c-Pr | Me | Cl | $CH_2OC(=O)O(i-Pr)$ | O |
| D-10424 | Me(S) | single bond | H | c-Pr | Me | Cl | $CH_2OC(=O)O(i-Pr)$ | O |
| D-10425 | H | single bond | Me | c-Pr(1-CN) | Me | Cl | $CH_2OC(=O)O(i-Pr)$ | O |
| D-10426 | Me | single bond | H | c-Pr(1-CN) | Me | Cl | $CH_2OC(=O)O(i-Pr)$ | O |
| D-10427 | Me(R) | single bond | H | c-Pr(1-CN) | Me | Cl | $CH_2OC(=O)O(i-Pr)$ | O |
| D-10428 | Me(S) | single bond | H | c-Pr(1-CN) | Me | Cl | $CH_2OC(=O)O(i-Pr)$ | O |
| D-10429 | H | single bond | Me | $CH_2CF_3$ | Me | Me | $CH_2OC(=O)O(i-Pr)$ | O |
| D-10430 | Me | single bond | H | $CH_2CF_3$ | Me | Me | $CH_2OC(=O)O(i-Pr)$ | O |

TABLE 883-continued

| Compound Number | Y | W | Z | $R^1$ | $R^2$ | $R^3$ | $R^{10}$ | A |
|---|---|---|---|---|---|---|---|---|
| D-10431 | Me(R) | single bond | H | $CH_2CF_3$ | Me | Me | $CH_2OC(=O)O(i\text{-}Pr)$ | O |
| D-10432 | Me(S) | single bond | H | $CH_2CF_3$ | Me | Me | $CH_2OC(=O)O(i\text{-}Pr)$ | O |
| D-10433 | H | single bond | Me | Et | Me | Me | $CH_2OC(=O)O(i\text{-}Pr)$ | O |
| D-10434 | Me | single bond | H | Et | Me | Me | $CH_2OC(=O)O(i\text{-}Pr)$ | O |
| D-10435 | Me(R) | single bond | H | Et | Me | Me | $CH_2OC(=O)O(i\text{-}Pr)$ | O |
| D-10436 | Me(S) | single bond | H | Et | Me | Me | $CH_2OC(=O)O(i\text{-}Pr)$ | O |
| D-10437 | H | single bond | Me | c-Pr | Me | Me | $CH_2OC(=O)O(i\text{-}Pr)$ | O |
| D-10438 | Me | single bond | H | c-Pr | Me | Me | $CH_2OC(=O)O(i\text{-}Pr)$ | O |
| D-10439 | Me(R) | single bond | H | c-Pr | Me | Me | $CH_2OC(=O)O(i\text{-}Pr)$ | O |
| D-10440 | Me(S) | single bond | H | c-Pr | Me | Me | $CH_2OC(=O)O(i\text{-}Pr)$ | O |
| D-10441 | H | single bond | Me | c-Pr(1-CN) | Me | Me | $CH_2OC(=O)O(i\text{-}Pr)$ | O |
| D-10442 | Me | single bond | H | c-Pr(1-CN) | Me | Me | $CH_2OC(=O)O(i\text{-}Pr)$ | O |
| D-10443 | Me(R) | single bond | H | c-Pr(1-CN) | Me | Me | $CH_2OC(=O)O(i\text{-}Pr)$ | O |
| D-10444 | Me(S) | single bond | H | c-Pr(1-CN) | Me | Me | $CH_2OC(=O)O(i\text{-}Pr)$ | O |
| D-10445 | H | single bond | Me | $CH_2CF_3$ | Me | Cl | $CH_2N(Me)C(=O)OMe$ | O |
| D-10446 | Me | single bond | H | $CH_2CF_3$ | Me | Cl | $CH_2N(Me)C(=O)OMe$ | O |
| D-10447 | Me(R) | single bond | H | $CH_2CF_3$ | Me | Cl | $CH_2N(Me)C(=O)OMe$ | O |
| D-10448 | Me(S) | single bond | H | $CH_2CF_3$ | Me | Cl | $CH_2N(Me)C(=O)OMe$ | O |
| D-10449 | H | single bond | Me | Et | Me | Cl | $CH_2N(Me)C(=O)OMe$ | O |
| D-10450 | Me | single bond | H | Et | Me | Cl | $CH_2N(Me)C(=O)OMe$ | O |
| D-10451 | Me(R) | single bond | H | Et | Me | Cl | $CH_2N(Me)C(=O)OMe$ | O |
| D-10452 | Me(S) | single bond | H | Et | Me | Cl | $CH_2N(Me)C(=O)OMe$ | O |
| D-10453 | H | single bond | Me | c-Pr | Me | Cl | $CH_2N(Me)C(=O)OMe$ | O |
| D-10454 | Me | single bond | H | c-Pr | Me | Cl | $CH_2N(Me)C(=O)OMe$ | O |
| D-10455 | Me(R) | single bond | H | c-Pr | Me | Cl | $CH_2N(Me)C(=O)OMe$ | O |
| D-10456 | Me(S) | single bond | H | c-Pr | Me | Cl | $CH_2N(Me)C(=O)OMe$ | O |
| D-10457 | H | single bond | Me | c-Pr(1-CN) | Me | Cl | $CH_2N(Me)C(=O)OMe$ | O |
| D-10458 | Me | single bond | H | c-Pr(1-CN) | Me | Cl | $CH_2N(Me)C(=O)OMe$ | O |
| D-10459 | Me(R) | single bond | H | c-Pr(1-CN) | Me | Cl | $CH_2N(Me)C(=O)OMe$ | O |
| D-10460 | Me(S) | single bond | H | c-Pr(1-CN) | Me | Cl | $CH_2N(Me)C(=O)OMe$ | O |
| D-10461 | H | single bond | Me | $CH_2CF_3$ | Me | Me | $CH_2N(Me)C(=O)OMe$ | O |
| D-10462 | Me | single bond | H | $CH_2CF_3$ | Me | Me | $CH_2N(Me)C(=O)OMe$ | O |

TABLE 884

| Compound Number | Y | W | Z | $R^1$ | $R^2$ | $R^3$ | $R^{10}$ | A |
|---|---|---|---|---|---|---|---|---|
| D-10463 | Me(R) | single bond | H | $CH_2CF_3$ | Me | Me | $CH_2N(Me)C(=O)OMe$ | O |
| D-10464 | Me(S) | single bond | H | $CH_2CF_3$ | Me | Me | $CH_2N(Me)C(=O)OMe$ | O |
| D-10465 | H | single bond | Me | Et | Me | Me | $CH_2N(Me)C(=O)OMe$ | O |
| D-10466 | Me | single bond | H | Et | Me | Me | $CH_2N(Me)C(=O)OMe$ | O |
| D-10467 | Me(R) | single bond | H | Et | Me | Me | $CH_2N(Me)C(=O)OMe$ | O |
| D-10468 | Me(S) | single bond | H | Et | Me | Me | $CH_2N(Me)C(=O)OMe$ | O |
| D-10469 | H | single bond | Me | c-Pr | Me | Me | $CH_2N(Me)C(=O)OMe$ | O |
| D-10470 | Me | single bond | H | c-Pr | Me | Me | $CH_2N(Me)C(=O)OMe$ | O |
| D-10471 | Me(R) | single bond | H | c-Pr | Me | Me | $CH_2N(Me)C(=O)OMe$ | O |
| D-10472 | Me(S) | single bond | H | c-Pr | Me | Me | $CH_2N(Me)C(=O)OMe$ | O |
| D-10473 | H | single bond | Me | c-Pr(1-CN) | Me | Me | $CH_2N(Me)C(=O)OMe$ | O |
| D-10474 | Me | single bond | H | c-Pr(1-CN) | Me | Me | $CH_2N(Me)C(=O)OMe$ | O |
| D-10475 | Me(R) | single bond | H | c-Pr(1-CN) | Me | Me | $CH_2N(Me)C(=O)OMe$ | O |
| D-10476 | Me(S) | single bond | H | c-Pr(1-CN) | Me | Me | $CH_2N(Me)C(=O)OMe$ | O |
| D-10477 | H | single bond | Me | $CH_2CF_3$ | Me | Cl | $CH_2OCH_2CH_2OMe$ | O |
| D-10478 | Me | single bond | H | $CH_2CF_3$ | Me | Cl | $CH_2OCH_2CH_2OMe$ | O |
| D-10479 | Me(R) | single bond | H | $CH_2CF_3$ | Me | Cl | $CH_2OCH_2CH_2OMe$ | O |
| D-10480 | Me(S) | single bond | H | $CH_2CF_3$ | Me | Cl | $CH_2OCH_2CH_2OMe$ | O |
| D-10481 | H | single bond | Me | Et | Me | Cl | $CH_2OCH_2CH_2OMe$ | O |
| D-10482 | Me | single bond | H | Et | Me | Cl | $CH_2OCH_2CH_2OMe$ | O |
| D-10483 | Me(R) | single bond | H | Et | Me | Cl | $CH_2OCH_2CH_2OMe$ | O |
| D-10484 | Me(S) | single bond | H | Et | Me | Cl | $CH_2OCH_2CH_2OMe$ | O |
| D-10485 | H | single bond | Me | c-Pr | Me | Cl | $CH_2OCH_2CH_2OMe$ | O |
| D-10486 | Me | single bond | H | c-Pr | Me | Cl | $CH_2OCH_2CH_2OMe$ | O |
| D-10487 | Me(R) | single bond | H | c-Pr | Me | Cl | $CH_2OCH_2CH_2OMe$ | O |
| D-10488 | Me(S) | single bond | H | c-Pr | Me | Cl | $CH_2OCH_2CH_2OMe$ | O |
| D-10489 | H | single bond | Me | c-Pr(1-CN) | Me | Cl | $CH_2OCH_2CH_2OMe$ | O |
| D-10490 | Me | single bond | H | c-Pr(1-CN) | Me | Cl | $CH_2OCH_2CH_2OMe$ | O |
| D-10491 | Me(R) | single bond | H | c-Pr(1-CN) | Me | Cl | $CH_2OCH_2CH_2OMe$ | O |
| D-10492 | Me(S) | single bond | H | c-Pr(1-CN) | Me | Cl | $CH_2OCH_2CH_2OMe$ | O |
| D-10493 | H | single bond | Me | $CH_2CF_3$ | Me | Me | $CH_2OCH_2CH_2OMe$ | O |
| D-10494 | Me | single bond | H | $CH_2CF_3$ | Me | Me | $CH_2OCH_2CH_2OMe$ | O |
| D-10495 | Me(R) | single bond | H | $CH_2CF_3$ | Me | Me | $CH_2OCH_2CH_2OMe$ | O |
| D-10496 | Me(S) | single bond | H | $CH_2CF_3$ | Me | Me | $CH_2OCH_2CH_2OMe$ | O |
| D-10497 | H | single bond | Me | Et | Me | Me | $CH_2OCH_2CH_2OMe$ | O |

TABLE 884-continued

| Compound Number | Y | W | Z | $R^1$ | $R^2$ | $R^3$ | $R^{10}$ | A |
|---|---|---|---|---|---|---|---|---|
| D-10498 | Me | single bond | H | Et | Me | Me | $CH_2OCH_2CH_2OMe$ | O |
| D-10499 | Me(R) | single bond | H | Et | Me | Me | $CH_2OCH_2CH_2OMe$ | O |
| D-10500 | Me(S) | single bond | H | Et | Me | Me | $CH_2OCH_2CH_2OMe$ | O |
| D-10501 | H | single bond | Me | c-Pr | Me | Me | $CH_2OCH_2CH_2OMe$ | O |
| D-10502 | Me | single bond | H | c-Pr | Me | Me | $CH_2OCH_2CH_2OMe$ | O |
| D-10503 | Me(R) | single bond | H | c-Pr | Me | Me | $CH_2OCH_2CH_2OMe$ | O |
| D-10504 | Me(S) | single bond | H | c-Pr | Me | Me | $CH_2OCH_2CH_2OMe$ | O |
| D-10505 | H | single bond | Me | c-Pr(1-CN) | Me | Me | $CH_2OCH_2CH_2OMe$ | O |
| D-10506 | Me | single bond | H | c-Pr(1-CN) | Me | Me | $CH_2OCH_2CH_2OMe$ | O |

TABLE 885

| Compound Number | Y | W | Z | $R^1$ | $R^2$ | $R^3$ | $R^{10}$ | A |
|---|---|---|---|---|---|---|---|---|
| D-10507 | Me(R) | single bond | H | c-Pr(1-CN) | Me | Me | $CH_2OCH_2CH_2OMe$ | O |
| D-10508 | Me(S) | single bond | H | c-Pr(1-CN) | Me | Me | $CH_2OCH_2CH_2OMe$ | O |
| D-10509 | H | single bond | Me | $CH_2CF_3$ | Me | Cl | $CH_2OCH_2CH_2CN$ | O |
| D-10510 | Me | single bond | H | $CH_2CF_3$ | Me | Cl | $CH_2OCH_2CH_2CN$ | O |
| D-10511 | Me(R) | single bond | H | $CH_2CF_3$ | Me | Cl | $CH_2OCH_2CH_2CN$ | O |
| D-10512 | Me(S) | single bond | H | $CH_2CF_3$ | Me | Cl | $CH_2OCH_2CH_2CN$ | O |
| D-10513 | H | single bond | Me | Et | Me | Cl | $CH_2OCH_2CH_2CN$ | O |
| D-10514 | Me | single bond | H | Et | Me | Cl | $CH_2OCH_2CH_2CN$ | O |
| D-10515 | Me(R) | single bond | H | Et | Me | Cl | $CH_2OCH_2CH_2CN$ | O |
| D-10516 | Me(S) | single bond | H | Et | Me | Cl | $CH_2OCH_2CH_2CN$ | O |
| D-10517 | H | single bond | Me | c-Pr | Me | Cl | $CH_2OCH_2CH_2CN$ | O |
| D-10518 | Me | single bond | H | c-Pr | Me | Cl | $CH_2OCH_2CH_2CN$ | O |
| D-10519 | Me(R) | single bond | H | c-Pr | Me | Cl | $CH_2OCH_2CH_2CN$ | O |
| D-10520 | Me(S) | single bond | H | c-Pr | Me | Cl | $CH_2OCH_2CH_2CN$ | O |
| D-10521 | H | single bond | Me | c-Pr(1-CN) | Me | Cl | $CH_2OCH_2CH_2CN$ | O |
| D-10522 | Me | single bond | H | c-Pr(1-CN) | Me | Cl | $CH_2OCH_2CH_2CN$ | O |
| D-10523 | Me(R) | single bond | H | c-Pr(1-CN) | Me | Cl | $CH_2OCH_2CH_2CN$ | O |
| D-10524 | Me(S) | single bond | H | c-Pr(1-CN) | Me | Cl | $CH_2OCH_2CH_2CN$ | O |
| D-10525 | H | single bond | Me | $CH_2CF_3$ | Me | Me | $CH_2OCH_2CH_2CN$ | O |
| D-10526 | Me | single bond | H | $CH_2CF_3$ | Me | Me | $CH_2OCH_2CH_2CN$ | O |
| D-10527 | Me(R) | single bond | H | $CH_2CF_3$ | Me | Me | $CH_2OCH_2CH_2CN$ | O |
| D-10528 | Me(S) | single bond | H | $CH_2CF_3$ | Me | Me | $CH_2OCH_2CH_2CN$ | O |
| D-10529 | H | single bond | Me | Et | Me | Me | $CH_2OCH_2CH_2CN$ | O |
| D-10530 | Me | single bond | H | Et | Me | Me | $CH_2OCH_2CH_2CN$ | O |
| D-10531 | Me(R) | single bond | H | Et | Me | Me | $CH_2OCH_2CH_2CN$ | O |
| D-10532 | Me(S) | single bond | H | Et | Me | Me | $CH_2OCH_2CH_2CN$ | O |
| D-10533 | H | single bond | Me | c-Pr | Me | Me | $CH_2OCH_2CH_2CN$ | O |
| D-10534 | Me | single bond | H | c-Pr | Me | Me | $CH_2OCH_2CH_2CN$ | O |
| D-10535 | Me(R) | single bond | H | c-Pr | Me | Me | $CH_2OCH_2CH_2CN$ | O |
| D-10536 | Me(S) | single bond | H | c-Pr | Me | Me | $CH_2OCH_2CH_2CN$ | O |
| D-10537 | H | single bond | Me | c-Pr(1-CN) | Me | Me | $CH_2OCH_2CH_2CN$ | O |
| D-10538 | Me | single bond | H | c-Pr(1-CN) | Me | Me | $CH_2OCH_2CH_2CN$ | O |
| D-10539 | Me(R) | single bond | H | c-Pr(1-CN) | Me | Me | $CH_2OCH_2CH_2CN$ | O |
| D-10540 | Me(S) | single bond | H | c-Pr(1-CN) | Me | Me | $CH_2OCH_2CH_2CN$ | O |
| D-10541 | H | single bond | Me | $CH_2CF_3$ | Me | Cl | $CH_2OCH_2CH_2S(=O)_2Me$ | O |
| D-10542 | Me | single bond | H | $CH_2CF_3$ | Me | Cl | $CH_2OCH_2CH_2S(=O)_2Me$ | O |
| D-10543 | Me(R) | single bond | H | $CH_2CF_3$ | Me | Cl | $CH_2OCH_2CH_2S(=O)_2Me$ | O |
| D-10544 | Me(S) | single bond | H | $CH_2CF_3$ | Me | Cl | $CH_2OCH_2CH_2S(=O)_2Me$ | O |
| D-10545 | H | single bond | Me | Et | Me | Cl | $CH_2OCH_2CH_2S(=O)_2Me$ | O |
| D-10546 | Me | single bond | H | Et | Me | Cl | $CH_2OCH_2CH_2S(=O)_2Me$ | O |
| D-10547 | Me(R) | single bond | H | Et | Me | Cl | $CH_2OCH_2CH_2S(=O)_2Me$ | O |
| D-10548 | Me(S) | single bond | H | Et | Me | Cl | $CH_2OCH_2CH_2S(=O)_2Me$ | O |
| D-10549 | H | single bond | Me | c-Pr | Me | Cl | $CH_2OCH_2CH_2S(=O)_2Me$ | O |
| D-10550 | Me | single bond | H | c-Pr | Me | Cl | $CH_2OCH_2CH_2S(=O)_2Me$ | O |

TABLE 886

| Compound Number | Y | W | Z | $R^1$ | $R^2$ | $R^3$ | $R^{10}$ | A |
|---|---|---|---|---|---|---|---|---|
| D-10551 | Me(R) | single bond | H | c-Pr | Me | Cl | $CH_2OCH_2CH_2S(=O)_2Me$ | O |
| D-10552 | Me(S) | single bond | H | c-Pr | Me | Cl | $CH_2OCH_2CH_2S(=O)_2Me$ | O |
| D-10553 | H | single bond | Me | c-Pr(1-CN) | Me | Cl | $CH_2OCH_2CH_2S(=O)_2Me$ | O |

TABLE 886-continued

| Compound Number | Y | W | Z | $R^1$ | $R^2$ | $R^3$ | $R^{10}$ | A |
|---|---|---|---|---|---|---|---|---|
| D-10554 | Me | single bond | H | c-Pr(1-CN) | Me | Cl | $CH_2OCH_2CH_2S(=O)_2Me$ | O |
| D-10555 | Me(R) | single bond | H | c-Pr(1-CN) | Me | Cl | $CH_2OCH_2CH_2S(=O)_2Me$ | O |
| D-10556 | Me(S) | single bond | H | c-Pr(1-CN) | Me | Cl | $CH_2OCH_2CH_2S(=O)_2Me$ | O |
| D-10557 | H | single bond | Me | $CH_2CF_3$ | Me | Me | $CH_2OCH_2CH_2S(=O)_2Me$ | O |
| D-10558 | Me | single bond | H | $CH_2CF_3$ | Me | Me | $CH_2OCH_2CH_2S(=O)_2Me$ | O |
| D-10559 | Me(R) | single bond | H | $CH_2CF_3$ | Me | Me | $CH_2OCH_2CH_2S(=O)_2Me$ | O |
| D-10560 | Me(S) | single bond | H | $CH_2CF_3$ | Me | Me | $CH_2OCH_2CH_2S(=O)_2Me$ | O |
| D-10561 | H | single bond | Me | Et | Me | Me | $CH_2OCH_2CH_2S(=O)_2Me$ | O |
| D-10562 | Me | single bond | H | Et | Me | Me | $CH_2OCH_2CH_2S(=O)_2Me$ | O |
| D-10563 | Me(R) | single bond | H | Et | Me | Me | $CH_2OCH_2CH_2S(=O)_2Me$ | O |
| D-10564 | Me(S) | single bond | H | Et | Me | Me | $CH_2OCH_2CH_2S(=O)_2Me$ | O |
| D-10565 | H | single bond | Me | c-Pr | Me | Me | $CH_2OCH_2CH_2S(=O)_2Me$ | O |
| D-10566 | Me | single bond | H | c-Pr | Me | Me | $CH_2OCH_2CH_2S(=O)_2Me$ | O |
| D-10567 | Me(R) | single bond | H | c-Pr | Me | Me | $CH_2OCH_2CH_2S(=O)_2Me$ | O |
| D-10568 | Me(S) | single bond | H | c-Pr | Me | Me | $CH_2OCH_2CH_2S(=O)_2Me$ | O |
| D-10569 | H | single bond | Me | c-Pr(1-CN) | Me | Me | $CH_2OCH_2CH_2S(=O)_2Me$ | O |
| D-10570 | Me | single bond | H | c-Pr(1-CN) | Me | Me | $CH_2OCH_2CH_2S(=O)_2Me$ | O |
| D-10571 | Me(R) | single bond | H | c-Pr(1-CN) | Me | Me | $CH_2OCH_2CH_2S(=O)_2Me$ | O |
| D-10572 | Me(S) | single bond | H | c-Pr(1-CN) | Me | Me | $CH_2OCH_2CH_2S(=O)_2Me$ | O |
| D-10573 | H | single bond | Me | $CH_2CF_3$ | Me | Cl | $CH_2$(5-Me-1,3-dioxol-2-one-4-yl) | O |
| D-10574 | Me | single bond | H | $CH_2CF_3$ | Me | Cl | $CH_2$(5-Me-1,3-dioxol-2-one-4-yl) | O |
| D-10575 | Me(R) | single bond | H | $CH_2CF_3$ | Me | Cl | $CH_2$(5-Me-1,3-dioxol-2-one-4-yl) | O |
| D-10576 | Me(S) | single bond | H | $CH_2CF_3$ | Me | Cl | $CH_2$(5-Me-1,3-dioxol-2-one-4-yl) | O |
| D-10577 | H | single bond | Me | Et | Me | Cl | $CH_2$(5-Me-1,3-dioxol-2-one-4-yl) | O |
| D-10578 | Me | single bond | H | Et | Me | Cl | $CH_2$(5-Me-1,3-dioxol-2-one-4-yl) | O |
| D-10579 | Me(R) | single bond | H | Et | Me | Cl | $CH_2$(5-Me-1,3-dioxol-2-one-4-yl) | O |
| D-10580 | Me(S) | single bond | H | Et | Me | Cl | $CH_2$(5-Me-1,3-dioxol-2-one-4-yl) | O |
| D-10581 | H | single bond | Me | c-Pr | Me | Cl | $CH_2$(5-Me-1,3-dioxol-2-one-4-yl) | O |
| D-10582 | Me | single bond | H | c-Pr | Me | Cl | $CH_2$(5-Me-1,3-dioxol-2-one-4-yl) | O |
| D-10583 | Me(R) | single bond | H | c-Pr | Me | Cl | $CH_2$(5-Me-1,3-dioxol-2-one-4-yl) | O |
| D-10584 | Me(S) | single bond | H | c-Pr | Me | Cl | $CH_2$(5-Me-1,3-dioxol-2-one-4-yl) | O |
| D-10585 | H | single bond | Me | c-Pr(1-CN) | Me | Cl | $CH_2$(5-Me-1,3-dioxol-2-one-4-yl) | O |
| D-10586 | Me | single bond | H | c-Pr(1-CN) | Me | Cl | $CH_2$(5-Me-1,3-dioxol-2-one-4-yl) | O |
| D-10587 | Me(R) | single bond | H | c-Pr(1-CN) | Me | Cl | $CH_2$(5-Me-1,3-dioxol-2-one-4-yl) | O |
| D-10588 | Me(S) | single bond | H | c-Pr(1-CN) | Me | Cl | $CH_2$(5-Me-1,3-dioxol-2-one-4-yl) | O |
| D-10589 | H | single bond | Me | $CH_2CF_3$ | Me | Me | $CH_2$(5-Me-1,3-dioxol-2-one-4-yl) | O |
| D-10590 | Me | single bond | H | $CH_2CF_3$ | Me | Me | $CH_2$(5-Me-1,3-dioxol-2-one-4-yl) | O |
| D-10591 | Me(R) | single bond | H | $CH_2CF_3$ | Me | Me | $CH_2$(5-Me-1,3-dioxol-2-one-4-yl) | O |
| D-10592 | Me(S) | single bond | H | $CH_2CF_3$ | Me | Me | $CH_2$(5-Me-1,3-dioxol-2-one-4-yl) | O |
| D-10593 | H | single bond | Me | Et | Me | Me | $CH_2$(5-Me-1,3-dioxol-2-one-4-yl) | O |
| D-10594 | Me | single bond | H | Et | Me | Me | $CH_2$(5-Me-1,3-dioxol-2-one-4-yl) | O |

TABLE 887

| Compound Number | Y | W | Z | $R^1$ | $R^2$ | $R^3$ | $R^{10}$ | A |
|---|---|---|---|---|---|---|---|---|
| D-10595 | Me(R) | single bond | H | Et | Me | Me | $CH_2$(5-Me-1,3-dioxol-2-one-4-yl) | O |
| D-10596 | Me(S) | single bond | H | Et | Me | Me | $CH_2$(5-Me-1,3-dioxol-2-one-4-yl) | O |
| D-10597 | H | single bond | Me | c-Pr | Me | Me | $CH_2$(5-Me-1,3-dioxol-2-one-4-yl) | O |
| D-10598 | Me | single bond | H | c-Pr | Me | Me | $CH_2$(5-Me-1,3-dioxol-2-one-4-yl) | O |
| D-10599 | Me(R) | single bond | H | c-Pr | Me | Me | $CH_2$(5-Me-1,3-dioxol-2-one-4-yl) | O |
| D-10600 | Me(S) | single bond | H | c-Pr | Me | Me | $CH_2$(5-Me-1,3-dioxol-2-one-4-yl) | O |
| D-10601 | H | single bond | Me | c-Pr(1-CN) | Me | Me | $CH_2$(5-Me-1,3-dioxol-2-one-4-yl) | O |
| D-10602 | Me | single bond | H | c-Pr(1-CN) | Me | Me | $CH_2$(5-Me-1,3-dioxol-2-one-4-yl) | O |
| D-10603 | Me(R) | single bond | H | c-Pr(1-CN) | Me | Me | $CH_2$(5-Me-1,3-dioxol-2-one-4-yl) | O |
| D-10604 | Me(S) | single bond | H | c-Pr(1-CN) | Me | Me | $CH_2$(5-Me-1,3-dioxol-2-one-4-yl) | O |
| D-10605 | H | single bond | Me | $CH_2CF_3$ | C(=O)Me | Cl | c-Pr | O |
| D-10606 | Me | single bond | H | $CH_2CF_3$ | C(=O)Me | Cl | c-Pr | O |
| D-10607 | Me(R) | single bond | H | $CH_2CF_3$ | C(=O)Me | Cl | c-Pr | O |
| D-10608 | Me(S) | single bond | H | $CH_2CF_3$ | C(=O)Me | Cl | c-Pr | O |
| D-10609 | H | single bond | Me | Et | C(=O)Me | Cl | c-Pr | O |
| D-10610 | Me | single bond | H | Et | C(=O)Me | Cl | c-Pr | O |
| D-10611 | Me(R) | single bond | H | Et | C(=O)Me | Cl | c-Pr | O |
| D-10612 | Me(S) | single bond | H | Et | C(=O)Me | Cl | c-Pr | O |
| D-10613 | H | single bond | Me | c-Pr | C(=O)Me | Cl | c-Pr | O |
| D-10614 | Me | single bond | H | c-Pr | C(=O)Me | Cl | c-Pr | O |
| D-10615 | Me(R) | single bond | H | c-Pr | C(=O)Me | Cl | c-Pr | O |
| D-10616 | Me(S) | single bond | H | c-Pr | C(=O)Me | Cl | c-Pr | O |
| D-10617 | H | single bond | Me | c-Pr(1-CN) | C(=O)Me | Cl | c-Pr | O |
| D-10618 | Me | single bond | H | c-Pr(1-CN) | C(=O)Me | Cl | c-Pr | O |
| D-10619 | Me(R) | single bond | H | c-Pr(1-CN) | C(=O)Me | Cl | c-Pr | O |
| D-10620 | Me(S) | single bond | H | c-Pr(1-CN) | C(=O)Me | Cl | c-Pr | O |

TABLE 887-continued

| Compound Number | Y | W | Z | $R^1$ | $R^2$ | $R^3$ | $R^{10}$ | A |
|---|---|---|---|---|---|---|---|---|
| D-10621 | H | single bond | Me | $CH_2CF_3$ | C(=O)Me | Me | c-Pr | O |
| D-10622 | Me | single bond | H | $CH_2CF_3$ | C(=O)Me | Me | c-Pr | O |
| D-10623 | Me(R) | single bond | H | $CH_2CF_3$ | C(=O)Me | Me | c-Pr | O |
| D-10624 | Me(S) | single bond | H | $CH_2CF_3$ | C(=O)Me | Me | c-Pr | O |
| D-10625 | H | single bond | Me | Et | C(=O)Me | Me | c-Pr | O |
| D-10626 | Me | single bond | H | Et | C(=O)Me | Me | c-Pr | O |
| D-10627 | Me(R) | single bond | H | Et | C(=O)Me | Me | c-Pr | O |
| D-10628 | Me(S) | single bond | H | Et | C(=O)Me | Me | c-Pr | O |
| D-10629 | H | single bond | Me | c-Pr | C(=O)Me | Me | c-Pr | O |
| D-10630 | Me | single bond | H | c-Pr | C(=O)Me | Me | c-Pr | O |
| D-10631 | Me(R) | single bond | H | c-Pr | C(=O)Me | Me | c-Pr | O |
| D-10632 | Me(S) | single bond | H | c-Pr | C(=O)Me | Me | c-Pr | O |
| D-10633 | H | single bond | Me | c-Pr(1-CN) | C(=O)Me | Me | c-Pr | O |
| D-10634 | Me | single bond | H | c-Pr(1-CN) | C(=O)Me | Me | c-Pr | O |
| D-10635 | Me(R) | single bond | H | c-Pr(1-CN) | C(=O)Me | Me | c-Pr | O |
| D-10636 | Me(S) | single bond | H | c-Pr(1-CN) | C(=O)Me | Me | c-Pr | O |
| D-10637 | H | single bond | Me | $CH_2CF_3$ | C(=O)Me | Cl | OMe | O |
| D-10638 | Me | single bond | H | $CH_2CF_3$ | C(=O)Me | Cl | OMe | O |

TABLE 888

| Compound Number | Y | W | Z | $R^1$ | $R^2$ | $R^3$ | $R^{10}$ | A |
|---|---|---|---|---|---|---|---|---|
| D-10639 | Me(R) | single bond | H | $CH_2CF_3$ | C(=O)Me | Cl | OMe | O |
| D-10640 | Me(S) | single bond | H | $CH_2CF_3$ | C(=O)Me | Cl | OMe | O |
| D-10641 | H | single bond | Me | Et | C(=O)Me | Cl | OMe | O |
| D-10642 | Me | single bond | H | Et | C(=O)Me | Cl | OMe | O |
| D-10643 | Me(R) | single bond | H | Et | C(=O)Me | Cl | OMe | O |
| D-10644 | Me(S) | single bond | H | Et | C(=O)Me | Cl | OMe | O |
| D-10645 | H | single bond | Me | c-Pr | C(=O)Me | Cl | OMe | O |
| D-10646 | Me | single bond | H | c-Pr | C(=O)Me | Cl | OMe | O |
| D-10647 | Me(R) | single bond | H | c-Pr | C(=O)Me | Cl | OMe | O |
| D-10648 | Me(S) | single bond | H | c-Pr | C(=O)Me | Cl | OMe | O |
| D-10649 | H | single bond | Me | c-Pr(1-CN) | C(=O)Me | Cl | OMe | O |
| D-10650 | Me | single bond | H | c-Pr(1-CN) | C(=O)Me | Cl | OMe | O |
| D-10651 | Me(R) | single bond | H | c-Pr(1-CN) | C(=O)Me | Cl | OMe | O |
| D-10652 | Me(S) | single bond | H | c-Pr(1-CN) | C(=O)Me | Cl | OMe | O |
| D-10653 | H | single bond | Me | $CH_2CF_3$ | C(=O)Me | Me | OMe | O |
| D-10654 | Me | single bond | H | $CH_2CF_3$ | C(=O)Me | Me | OMe | O |
| D-10655 | Me(R) | single bond | H | $CH_2CF_3$ | C(=O)Me | Me | OMe | O |
| D-10656 | Me(S) | single bond | H | $CH_2CF_3$ | C(=O)Me | Me | OMe | O |
| D-10657 | H | single bond | Me | Et | C(=O)Me | Me | OMe | O |
| D-10658 | Me | single bond | H | Et | C(=O)Me | Me | OMe | O |
| D-10659 | Me(R) | single bond | H | Et | C(=O)Me | Me | OMe | O |
| D-10660 | Me(S) | single bond | H | Et | C(=O)Me | Me | OMe | O |
| D-10661 | H | single bond | Me | c-Pr | C(=O)Me | Me | OMe | O |
| D-10662 | Me | single bond | H | c-Pr | C(=O)Me | Me | OMe | O |
| D-10663 | Me(R) | single bond | H | c-Pr | C(=O)Me | Me | OMe | O |
| D-10664 | Me(S) | single bond | H | c-Pr | C(=O)Me | Me | OMe | O |
| D-10665 | H | single bond | Me | c-Pr(1-CN) | C(=O)Me | Me | OMe | O |
| D-10666 | Me | single bond | H | c-Pr(1-CN) | C(=O)Me | Me | OMe | O |
| D-10667 | Me(R) | single bond | H | c-Pr(1-CN) | C(=O)Me | Me | OMe | O |
| D-10668 | Me(S) | single bond | H | c-Pr(1-CN) | C(=O)Me | Me | OMe | O |
| D-10669 | H | single bond | Me | $CH_2CF_3$ | C(=O)Me | Cl | C(=O)(i-Pr) | O |
| D-10670 | Me | single bond | H | $CH_2CF_3$ | C(=O)Me | Cl | C(=O)(i-Pr) | O |
| D-10671 | Me(R) | single bond | H | $CH_2CF_3$ | C(=O)Me | Cl | C(=O)(i-Pr) | O |
| D-10672 | Me(S) | single bond | H | $CH_2CF_3$ | C(=O)Me | Cl | C(=O)(i-Pr) | O |
| D-10673 | H | single bond | Me | Et | C(=O)Me | Cl | C(=O)(i-Pr) | O |
| D-10674 | Me | single bond | H | Et | C(=O)Me | Cl | C(=O)(i-Pr) | O |
| D-10675 | Me(R) | single bond | H | Et | C(=O)Me | Cl | C(=O)(i-Pr) | O |
| D-10676 | Me(S) | single bond | H | Et | C(=O)Me | Cl | C(=O)(i-Pr) | O |
| D-10677 | H | single bond | Me | c-Pr | C(=O)Me | Cl | C(=O)(i-Pr) | O |
| D-10678 | Me | single bond | H | c-Pr | C(=O)Me | Cl | C(=O)(i-Pr) | O |
| D-10679 | Me(R) | single bond | H | c-Pr | C(=O)Me | Cl | C(=O)(i-Pr) | O |
| D-10680 | Me(S) | single bond | H | c-Pr | C(=O)Me | Cl | C(=O)(i-Pr) | O |
| D-10681 | H | single bond | Me | c-Pr(1-CN) | C(=O)Me | Cl | C(=O)(i-Pr) | O |
| D-10682 | Me | single bond | H | c-Pr(1-CN) | C(=O)Me | Cl | C(=O)(i-Pr) | O |

TABLE 889

| Compound Number | Y | W | Z | $R^1$ | $R^2$ | $R^3$ | $R^{10}$ | A |
|---|---|---|---|---|---|---|---|---|
| D-10683 | Me(R) | single bond | H | c-Pr(1-CN) | C(=O)Me | Cl | C(=O)(i-Pr) | O |
| D-10684 | Me(S) | single bond | H | c-Pr(1-CN) | C(=O)Me | Cl | C(=O)(i-Pr) | O |
| D-10685 | H | single bond | Me | $CH_2CF_3$ | C(=O)Me | Me | C(=O)(i-Pr) | O |
| D-10686 | Me | single bond | H | $CH_2CF_3$ | C(=O)Me | Me | C(=O)(i-Pr) | O |
| D-10687 | Me(R) | single bond | H | $CH_2CF_3$ | C(=O)Me | Me | C(=O)(i-Pr) | O |
| D-10688 | Me(S) | single bond | H | $CH_2CF_3$ | C(=O)Me | Me | C(=O)(i-Pr) | O |
| D-10689 | H | single bond | Me | Et | C(=O)Me | Me | C(=O)(i-Pr) | O |
| D-10690 | Me | single bond | H | Et | C(=O)Me | Me | C(=O)(i-Pr) | O |
| D-10691 | Me(R) | single bond | H | Et | C(=O)Me | Me | C(=O)(i-Pr) | O |
| D-10692 | Me(S) | single bond | H | Et | C(=O)Me | Me | C(=O)(i-Pr) | O |
| D-10693 | H | single bond | Me | c-Pr | C(=O)Me | Me | C(=O)(i-Pr) | O |
| D-10694 | Me | single bond | H | c-Pr | C(=O)Me | Me | C(=O)(i-Pr) | O |
| D-10695 | Me(R) | single bond | H | c-Pr | C(=O)Me | Me | C(=O)(i-Pr) | O |
| D-10696 | Me(S) | single bond | H | c-Pr | C(=O)Me | Me | C(=O)(i-Pr) | O |
| D-10697 | H | single bond | Me | c-Pr(1-CN) | C(=O)Me | Me | C(=O)(i-Pr) | O |
| D-10698 | Me | single bond | H | c-Pr(1-CN) | C(=O)Me | Me | C(=O)(i-Pr) | O |
| D-10699 | Me(R) | single bond | H | c-Pr(1-CN) | C(=O)Me | Me | C(=O)(i-Pr) | O |
| D-10700 | Me(S) | single bond | H | c-Pr(1-CN) | C(=O)Me | Me | C(=O)(i-Pr) | O |
| D-10701 | H | single bond | Me | $CH_2CF_3$ | C(=O)Me | Cl | C(=O)O(t-Bu) | O |
| D-10702 | Me | single bond | H | $CH_2CF_3$ | C(=O)Me | Cl | C(=O)O(t-Bu) | O |
| D-10703 | Me(R) | single bond | H | $CH_2CF_3$ | C(=O)Me | Cl | C(=O)O(t-Bu) | O |
| D-10704 | Me(S) | single bond | H | $CH_2CF_3$ | C(=O)Me | Cl | C(=O)O(t-Bu) | O |
| D-10705 | H | single bond | Me | Et | C(=O)Me | Cl | C(=O)O(t-Bu) | O |
| D-10706 | Me | single bond | H | Et | C(=O)Me | Cl | C(=O)O(t-Bu) | O |
| D-10707 | Me(R) | single bond | H | Et | C(=O)Me | Cl | C(=O)O(t-Bu) | O |
| D-10708 | Me(S) | single bond | H | Et | C(=O)Me | Cl | C(=O)O(t-Bu) | O |
| D-10709 | H | single bond | Me | c-Pr | C(=O)Me | Cl | C(=O)O(t-Bu) | O |
| D-10710 | Me | single bond | H | c-Pr | C(=O)Me | Cl | C(=O)O(t-Bu) | O |
| D-10711 | Me(R) | single bond | H | c-Pr | C(=O)Me | Cl | C(=O)O(t-Bu) | O |
| D-10712 | Me(S) | single bond | H | c-Pr | C(=O)Me | Cl | C(=O)O(t-Bu) | O |
| D-10713 | H | single bond | Me | c-Pr(1-CN) | C(=O)Me | Cl | C(=O)O(t-Bu) | O |
| D-10714 | Me | single bond | H | c-Pr(1-CN) | C(=O)Me | Cl | C(=O)O(t-Bu) | O |
| D-10715 | Me(R) | single bond | H | c-Pr(1-CN) | C(=O)Me | Cl | C(=O)O(t-Bu) | O |
| D-10716 | Me(S) | single bond | H | c-Pr(1-CN) | C(=O)Me | Cl | C(=O)O(t-Bu) | O |
| D-10717 | H | single bond | Me | $CH_2CF_3$ | C(=O)Me | Me | C(=O)O(t-Bu) | O |
| D-10718 | Me | single bond | H | $CH_2CF_3$ | C(=O)Me | Me | C(=O)O(t-Bu) | O |
| D-10719 | Me(R) | single bond | H | $CH_2CF_3$ | C(=O)Me | Me | C(=O)O(t-Bu) | O |
| D-10720 | Me(S) | single bond | H | $CH_2CF_3$ | C(=O)Me | Me | C(=O)O(t-Bu) | O |
| D-10721 | H | single bond | Me | Et | C(=O)Me | Me | C(=O)O(t-Bu) | O |
| D-10722 | Me | single bond | H | Et | C(=O)Me | Me | C(=O)O(t-Bu) | O |
| D-10723 | Me(R) | single bond | H | Et | C(=O)Me | Me | C(=O)O(t-Bu) | O |
| D-10724 | Me(S) | single bond | H | Et | C(=O)Me | Me | C(=O)O(t-Bu) | O |
| D-10725 | H | single bond | Me | c-Pr | C(=O)Me | Me | C(=O)O(t-Bu) | O |
| D-10726 | Me | single bond | H | c-Pr | C(=O)Me | Me | C(=O)O(t-Bu) | O |

TABLE 890

| Compound Number | Y | W | Z | $R^1$ | $R^2$ | $R^3$ | $R^{10}$ | A |
|---|---|---|---|---|---|---|---|---|
| D-10727 | Me(R) | single bond | H | c-Pr | C(=O)Me | Me | C(=O)O(t-Bu) | O |
| D-10728 | Me(S) | single bond | H | c-Pr | C(=O)Me | Me | C(=O)O(t-Bu) | O |
| D-10729 | H | single bond | Me | c-Pr(1-CN) | C(=O)Me | Me | C(=O)O(t-Bu) | O |
| D-10730 | Me | single bond | H | c-Pr(1-CN) | C(=O)Me | Me | C(=O)O(t-Bu) | O |
| D-10731 | Me(R) | single bond | H | c-Pr(1-CN) | C(=O)Me | Me | C(=O)O(t-Bu) | O |
| D-10732 | Me(S) | single bond | H | c-Pr(1-CN) | C(=O)Me | Me | C(=O)O(t-Bu) | O |
| D-10733 | H | single bond | Me | $CH_2CF_3$ | C(=O)Me | Cl | $CH_2OEt$ | O |
| D-10734 | Me | single bond | H | $CH_2CF_3$ | C(=O)Me | Cl | $CH_2OEt$ | O |
| D-10735 | Me(R) | single bond | H | $CH_2CF_3$ | C(=O)Me | Cl | $CH_2OEt$ | O |
| D-10736 | Me(S) | single bond | H | $CH_2CF_3$ | C(=O)Me | Cl | $CH_2OEt$ | O |
| D-10737 | H | single bond | Me | Et | C(=O)Me | Cl | $CH_2OEt$ | O |
| D-10738 | Me | single bond | H | Et | C(=O)Me | Cl | $CH_2OEt$ | O |
| D-10739 | Me(R) | single bond | H | Et | C(=O)Me | Cl | $CH_2OEt$ | O |
| D-10740 | Me(S) | single bond | H | Et | C(=O)Me | Cl | $CH_2OEt$ | O |
| D-10741 | H | single bond | Me | c-Pr | C(=O)Me | Cl | $CH_2OEt$ | O |
| D-10742 | Me | single bond | H | c-Pr | C(=O)Me | Cl | $CH_2OEt$ | O |
| D-10743 | Me(R) | single bond | H | c-Pr | C(=O)Me | Cl | $CH_2OEt$ | O |
| D-10744 | Me(S) | single bond | H | c-Pr | C(=O)Me | Cl | $CH_2OEt$ | O |
| D-10745 | H | single bond | Me | c-Pr(1-CN) | C(=O)Me | Cl | $CH_2OEt$ | O |
| D-10746 | Me | single bond | H | c-Pr(1-CN) | C(=O)Me | Cl | $CH_2OEt$ | O |
| D-10747 | Me(R) | single bond | H | c-Pr(1-CN) | C(=O)Me | Cl | $CH_2OEt$ | O |
| D-10748 | Me(S) | single bond | H | c-Pr(1-CN) | C(=O)Me | Cl | $CH_2OEt$ | O |
| D-10749 | H | single bond | Me | $CH_2CF_3$ | C(=O)Me | Me | $CH_2OEt$ | O |

TABLE 890-continued

| Compound Number | Y | W | Z | $R^1$ | $R^2$ | $R^3$ | $R^{10}$ | A |
|---|---|---|---|---|---|---|---|---|
| D-10750 | Me | single bond | H | $CH_2CF_3$ | C(=O)Me | Me | $CH_2OEt$ | O |
| D-10751 | Me(R) | single bond | H | $CH_2CF_3$ | C(=O)Me | Me | $CH_2OEt$ | O |
| D-10752 | Me(S) | single bond | H | $CH_2CF_3$ | C(=O)Me | Me | $CH_2OEt$ | O |
| D-10753 | H | single bond | Me | Et | C(=O)Me | Me | $CH_2OEt$ | O |
| D-10754 | Me | single bond | H | Et | C(=O)Me | Me | $CH_2OEt$ | O |
| D-10755 | Me(R) | single bond | H | Et | C(=O)Me | Me | $CH_2OEt$ | O |
| D-10756 | Me(S) | single bond | H | Et | C(=O)Me | Me | $CH_2OEt$ | O |
| D-10757 | H | single bond | Me | c-Pr | C(=O)Me | Me | $CH_2OEt$ | O |
| D-10758 | Me | single bond | H | c-Pr | C(=O)Me | Me | $CH_2OEt$ | O |
| D-10759 | Me(R) | single bond | H | c-Pr | C(=O)Me | Me | $CH_2OEt$ | O |
| D-10760 | Me(S) | single bond | H | c-Pr | C(=O)Me | Me | $CH_2OEt$ | O |
| D-10761 | H | single bond | Me | c-Pr(1-CN) | C(=O)Me | Me | $CH_2OEt$ | O |
| D-10762 | Me | single bond | H | c-Pr(1-CN) | C(=O)Me | Me | $CH_2OEt$ | O |
| D-10763 | Me(R) | single bond | H | c-Pr(1-CN) | C(=O)Me | Me | $CH_2OEt$ | O |
| D-10764 | Me(S) | single bond | H | c-Pr(1-CN) | C(=O)Me | Me | $CH_2OEt$ | O |
| D-10765 | H | single bond | Me | $CH_2CF_3$ | C(=O)Me | Cl | $CH_2SMe$ | O |
| D-10766 | Me | single bond | H | $CH_2CF_3$ | C(=O)Me | Cl | $CH_2SMe$ | O |
| D-10767 | Me(R) | single bond | H | $CH_2CF_3$ | C(=O)Me | Cl | $CH_2SMe$ | O |
| D-10768 | Me(S) | single bond | H | $CH_2CF_3$ | C(=O)Me | Cl | $CH_2SMe$ | O |
| D-10769 | H | single bond | Me | Et | C(=O)Me | Cl | $CH_2SMe$ | O |
| D-10770 | Me | single bond | H | Et | C(=O)Me | Cl | $CH_2SMe$ | O |

TABLE 891

| Compound Number | Y | W | Z | $R^1$ | $R^2$ | $R^3$ | $R^{10}$ | A |
|---|---|---|---|---|---|---|---|---|
| D-10771 | Me(R) | single bond | H | Et | C(=O)Me | Cl | $CH_2SMe$ | O |
| D-10772 | Me(S) | single bond | H | Et | C(=O)Me | Cl | $CH_2SMe$ | O |
| D-10773 | H | single bond | Me | c-Pr | C(=O)Me | Cl | $CH_2SMe$ | O |
| D-10774 | Me | single bond | H | c-Pr | C(=O)Me | Cl | $CH_2SMe$ | O |
| D-10775 | Me(R) | single bond | H | c-Pr | C(=O)Me | Cl | $CH_2SMe$ | O |
| D-10776 | Me(S) | single bond | H | c-Pr | C(=O)Me | Cl | $CH_2SMe$ | O |
| D-10777 | H | single bond | Me | c-Pr(1-CN) | C(=O)Me | Cl | $CH_2SMe$ | O |
| D-10778 | Me | single bond | H | c-Pr(1-CN) | C(=O)Me | Cl | $CH_2SMe$ | O |
| D-10779 | Me(R) | single bond | H | c-Pr(1-CN) | C(=O)Me | Cl | $CH_2SMe$ | O |
| D-10780 | Me(S) | single bond | H | c-Pr(1-CN) | C(=O)Me | Cl | $CH_2SMe$ | O |
| D-10781 | H | single bond | Me | $CH_2CF_3$ | C(=O)Me | Me | $CH_2SMe$ | O |
| D-10782 | Me | single bond | H | $CH_2CF_3$ | C(=O)Me | Me | $CH_2SMe$ | O |
| D-10783 | Me(R) | single bond | H | $CH_2CF_3$ | C(=O)Me | Me | $CH_2SMe$ | O |
| D-10784 | Me(S) | single bond | H | $CH_2CF_3$ | C(=O)Me | Me | $CH_2SMe$ | O |
| D-10785 | H | single bond | Me | Et | C(=O)Me | Me | $CH_2SMe$ | O |
| D-10786 | Me | single bond | H | Et | C(=O)Me | Me | $CH_2SMe$ | O |
| D-10787 | Me(R) | single bond | H | Et | C(=O)Me | Me | $CH_2SMe$ | O |
| D-10788 | Me(S) | single bond | H | Et | C(=O)Me | Me | $CH_2SMe$ | O |
| D-10789 | H | single bond | Me | c-Pr | C(=O)Me | Me | $CH_2SMe$ | O |
| D-10790 | Me | single bond | H | c-Pr | C(=O)Me | Me | $CH_2SMe$ | O |
| D-10791 | Me(R) | single bond | H | c-Pr | C(=O)Me | Me | $CH_2SMe$ | O |
| D-10792 | Me(S) | single bond | H | c-Pr | C(=O)Me | Me | $CH_2SMe$ | O |
| D-10793 | H | single bond | Me | c-Pr(1-CN) | C(=O)Me | Me | $CH_2SMe$ | O |
| D-10794 | Me | single bond | H | c-Pr(1-CN) | C(=O)Me | Me | $CH_2SMe$ | O |
| D-10795 | Me(R) | single bond | H | c-Pr(1-CN) | C(=O)Me | Me | $CH_2SMe$ | O |
| D-10796 | Me(S) | single bond | H | c-Pr(1-CN) | C(=O)Me | Me | $CH_2SMe$ | O |
| D-10797 | H | single bond | Me | $CH_2CF_3$ | C(=O)Me | Cl | $CH_2S(=O)_2Me$ | O |
| D-10798 | Me | single bond | H | $CH_2CF_3$ | C(=O)Me | Cl | $CH_2S(=O)_2Me$ | O |
| D-10799 | Me(R) | single bond | H | $CH_2CF_3$ | C(=O)Me | Cl | $CH_2S(=O)_2Me$ | O |
| D-10800 | Me(S) | single bond | H | $CH_2CF_3$ | C(=O)Me | Cl | $CH_2S(=O)_2Me$ | O |
| D-10801 | H | single bond | Me | Et | C(=O)Me | Cl | $CH_2S(=O)_2Me$ | O |
| D-10802 | Me | single bond | H | Et | C(=O)Me | Cl | $CH_2S(=O)_2Me$ | O |
| D-10803 | Me(R) | single bond | H | Et | C(=O)Me | Cl | $CH_2S(=O)_2Me$ | O |
| D-10804 | Me(S) | single bond | H | Et | C(=O)Me | Cl | $CH_2S(=O)_2Me$ | O |
| D-10805 | H | single bond | Me | c-Pr | C(=O)Me | Cl | $CH_2S(=O)_2Me$ | O |
| D-10806 | Me | single bond | H | c-Pr | C(=O)Me | Cl | $CH_2S(=O)_2Me$ | O |
| D-10807 | Me(R) | single bond | H | c-Pr | C(=O)Me | Cl | $CH_2S(=O)_2Me$ | O |
| D-10808 | Me(S) | single bond | H | c-Pr | C(=O)Me | Cl | $CH_2S(=O)_2Me$ | O |
| D-10809 | H | single bond | Me | c-Pr(1-CN) | C(=O)Me | Cl | $CH_2S(=O)_2Me$ | O |
| D-10810 | Me | single bond | H | c-Pr(1-CN) | C(=O)Me | Cl | $CH_2S(=O)_2Me$ | O |
| D-10811 | Me(R) | single bond | H | c-Pr(1-CN) | C(=O)Me | Cl | $CH_2S(=O)_2Me$ | O |
| D-10812 | Me(S) | single bond | H | c-Pr(1-CN) | C(=O)Me | Cl | $CH_2S(=O)_2Me$ | O |
| D-10813 | H | single bond | Me | $CH_2CF_3$ | C(=O)Me | Me | $CH_2S(=O)_2Me$ | O |
| D-10814 | Me | single bond | H | $CH_2CF_3$ | C(=O)Me | Me | $CH_2S(=O)_2Me$ | O |

TABLE 892

| Compound Number | Y | W | Z | $R^1$ | $R^2$ | $R^3$ | $R^{10}$ | A |
|---|---|---|---|---|---|---|---|---|
| D-10815 | Me(R) | single bond | H | $CH_2CF_3$ | C(=O)Me | Me | $CH_2S(=O)_2Me$ | O |
| D-10816 | Me(S) | single bond | H | $CH_2CF_3$ | C(=O)Me | Me | $CH_2S(=O)_2Me$ | O |
| D-10817 | H | single bond | Me | Et | C(=O)Me | Me | $CH_2S(=O)_2Me$ | O |
| D-10818 | Me | single bond | H | Et | C(=O)Me | Me | $CH_2S(=O)_2Me$ | O |
| D-10819 | Me(R) | single bond | H | Et | C(=O)Me | Me | $CH_2S(=O)_2Me$ | O |
| D-10820 | Me(S) | single bond | H | Et | C(=O)Me | Me | $CH_2S(=O)_2Me$ | O |
| D-10821 | H | single bond | Me | c-Pr | C(=O)Me | Me | $CH_2S(=O)_2Me$ | O |
| D-10822 | Me | single bond | H | c-Pr | C(=O)Me | Me | $CH_2S(=O)_2Me$ | O |
| D-10823 | Me(R) | single bond | H | c-Pr | C(=O)Me | Me | $CH_2S(=O)_2Me$ | O |
| D-10824 | Me(S) | single bond | H | c-Pr | C(=O)Me | Me | $CH_2S(=O)_2Me$ | O |
| D-10825 | H | single bond | Me | c-Pr(1-CN) | C(=O)Me | Me | $CH_2S(=O)_2Me$ | O |
| D-10826 | Me | single bond | H | c-Pr(1-CN) | C(=O)Me | Me | $CH_2S(=O)_2Me$ | O |
| D-10827 | Me(R) | single bond | H | c-Pr(1-CN) | C(=O)Me | Me | $CH_2S(=O)_2Me$ | O |
| D-10828 | Me(S) | single bond | H | c-Pr(1-CN) | C(=O)Me | Me | $CH_2S(=O)_2Me$ | O |
| D-10829 | H | single bond | Me | $CH_2CF_3$ | C(=O)Me | Cl | $CH_2C(=O)Me$ | O |
| D-10830 | Me | single bond | H | $CH_2CF_3$ | C(=O)Me | Cl | $CH_2C(=O)Me$ | O |
| D-10831 | Me(R) | single bond | H | $CH_2CF_3$ | C(=O)Me | Cl | $CH_2C(=O)Me$ | O |
| D-10832 | Me(S) | single bond | H | $CH_2CF_3$ | C(=O)Me | Cl | $CH_2C(=O)Me$ | O |
| D-10833 | H | single bond | Me | Et | C(=O)Me | Cl | $CH_2C(=O)Me$ | O |
| D-10834 | Me | single bond | H | Et | C(=O)Me | Cl | $CH_2C(=O)Me$ | O |
| D-10835 | Me(R) | single bond | H | Et | C(=O)Me | Cl | $CH_2C(=O)Me$ | O |
| D-10836 | Me(S) | single bond | H | Et | C(=O)Me | Cl | $CH_2C(=O)Me$ | O |
| D-10837 | H | single bond | Me | c-Pr | C(=O)Me | Cl | $CH_2C(=O)Me$ | O |
| D-10838 | Me | single bond | H | c-Pr | C(=O)Me | Cl | $CH_2C(=O)Me$ | O |
| D-10839 | Me(R) | single bond | H | c-Pr | C(=O)Me | Cl | $CH_2C(=O)Me$ | O |
| D-10840 | Me(S) | single bond | H | c-Pr | C(=O)Me | Cl | $CH_2C(=O)Me$ | O |
| D-10841 | H | single bond | Me | c-Pr(1-CN) | C(=O)Me | Cl | $CH_2C(=O)Me$ | O |
| D-10842 | Me | single bond | H | c-Pr(1-CN) | C(=O)Me | Cl | $CH_2C(=O)Me$ | O |
| D-10843 | Me(R) | single bond | H | c-Pr(1-CN) | C(=O)Me | Cl | $CH_2C(=O)Me$ | O |
| D-10844 | Me(S) | single bond | H | c-Pr(1-CN) | C(=O)Me | Cl | $CH_2C(=O)Me$ | O |
| D-10845 | H | single bond | Me | $CH_2CF_3$ | C(=O)Me | Me | $CH_2C(=O)Me$ | O |
| D-10846 | Me | single bond | H | $CH_2CF_3$ | C(=O)Me | Me | $CH_2C(=O)Me$ | O |
| D-10847 | Me(R) | single bond | H | $CH_2CF_3$ | C(=O)Me | Me | $CH_2C(=O)Me$ | O |
| D-10848 | Me(S) | single bond | H | $CH_2CF_3$ | C(=O)Me | Me | $CH_2C(=O)Me$ | O |
| D-10849 | H | single bond | Me | Et | C(=O)Me | Me | $CH_2C(=O)Me$ | O |
| D-10850 | Me | single bond | H | Et | C(=O)Me | Me | $CH_2C(=O)Me$ | O |
| D-10851 | Me(R) | single bond | H | Et | C(=O)Me | Me | $CH_2C(=O)Me$ | O |
| D-10852 | Me(S) | single bond | H | Et | C(=O)Me | Me | $CH_2C(=O)Me$ | O |
| D-10853 | H | single bond | Me | c-Pr | C(=O)Me | Me | $CH_2C(=O)Me$ | O |
| D-10854 | Me | single bond | H | c-Pr | C(=O)Me | Me | $CH_2C(=O)Me$ | O |
| D-10855 | Me(R) | single bond | H | c-Pr | C(=O)Me | Me | $CH_2C(=O)Me$ | O |
| D-10856 | Me(S) | single bond | H | c-Pr | C(=O)Me | Me | $CH_2C(=O)Me$ | O |
| D-10857 | H | single bond | Me | c-Pr(1-CN) | C(=O)Me | Me | $CH_2C(=O)Me$ | O |
| D-10858 | Me | single bond | H | c-Pr(1-CN) | C(=O)Me | Me | $CH_2C(=O)Me$ | O |

TABLE 893

| Compound Number | Y | W | Z | $R^1$ | $R^2$ | $R^3$ | $R^{10}$ | A |
|---|---|---|---|---|---|---|---|---|
| D-10859 | Me(R) | single bond | H | c-Pr(1-CN) | C(=O)Me | Me | $CH_2C(=O)Me$ | O |
| D-10860 | Me(S) | single bond | H | c-Pr(1-CN) | C(=O)Me | Me | $CH_2C(=O)Me$ | O |
| D-10861 | H | single bond | Me | $CH_2CF_3$ | C(=O)Me | Cl | $CH_2C(=O)OMe$ | O |
| D-10862 | Me | single bond | H | $CH_2CF_3$ | C(=O)Me | Cl | $CH_2C(=O)OMe$ | O |
| D-10863 | Me(R) | single bond | H | $CH_2CF_3$ | C(=O)Me | Cl | $CH_2C(=O)OMe$ | O |
| D-10864 | Me(S) | single bond | H | $CH_2CF_3$ | C(=O)Me | Cl | $CH_2C(=O)OMe$ | O |
| D-10865 | H | single bond | Me | Et | C(=O)Me | Cl | $CH_2C(=O)OMe$ | O |
| D-10866 | Me | single bond | H | Et | C(=O)Me | Cl | $CH_2C(=O)OMe$ | O |
| D-10867 | Me(R) | single bond | H | Et | C(=O)Me | Cl | $CH_2C(=O)OMe$ | O |
| D-10868 | Me(S) | single bond | H | Et | C(=O)Me | Cl | $CH_2C(=O)OMe$ | O |
| D-10869 | H | single bond | Me | c-Pr | C(=O)Me | Cl | $CH_2C(=O)OMe$ | O |
| D-10870 | Me | single bond | H | c-Pr | C(=O)Me | Cl | $CH_2C(=O)OMe$ | O |
| D-10871 | Me(R) | single bond | H | c-Pr | C(=O)Me | Cl | $CH_2C(=O)OMe$ | O |
| D-10872 | Me(S) | single bond | H | c-Pr | C(=O)Me | Cl | $CH_2C(=O)OMe$ | O |
| D-10873 | H | single bond | Me | c-Pr(1-CN) | C(=O)Me | Cl | $CH_2C(=O)OMe$ | O |
| D-10874 | Me | single bond | H | c-Pr(1-CN) | C(=O)Me | Cl | $CH_2C(=O)OMe$ | O |
| D-10875 | Me(R) | single bond | H | c-Pr(1-CN) | C(=O)Me | Cl | $CH_2C(=O)OMe$ | O |
| D-10876 | Me(S) | single bond | H | c-Pr(1-CN) | C(=O)Me | Cl | $CH_2C(=O)OMe$ | O |
| D-10877 | H | single bond | Me | $CH_2CF_3$ | C(=O)Me | Me | $CH_2C(=O)OMe$ | O |
| D-10878 | Me | single bond | H | $CH_2CF_3$ | C(=O)Me | Me | $CH_2C(=O)OMe$ | O |
| D-10879 | Me(R) | single bond | H | $CH_2CF_3$ | C(=O)Me | Me | $CH_2C(=O)OMe$ | O |

TABLE 893-continued

| Compound Number | Y | W | Z | $R^1$ | $R^2$ | $R^3$ | $R^{10}$ | A |
|---|---|---|---|---|---|---|---|---|
| D-10880 | Me(S) | single bond | H | $CH_2CF_3$ | C(=O)Me | Me | $CH_2C(=O)OMe$ | O |
| D-10881 | H | single bond | Me | Et | C(=O)Me | Me | $CH_2C(=O)OMe$ | O |
| D-10882 | Me | single bond | H | Et | C(=O)Me | Me | $CH_2C(=O)OMe$ | O |
| D-10883 | Me(R) | single bond | H | Et | C(=O)Me | Me | $CH_2C(=O)OMe$ | O |
| D-10884 | Me(S) | single bond | H | Et | C(=O)Me | Me | $CH_2C(=O)OMe$ | O |
| D-10885 | H | single bond | Me | c-Pr | C(=O)Me | Me | $CH_2C(=O)OMe$ | O |
| D-10886 | Me | single bond | H | c-Pr | C(=O)Me | Me | $CH_2C(=O)OMe$ | O |
| D-10887 | Me(R) | single bond | H | c-Pr | C(=O)Me | Me | $CH_2C(=O)OMe$ | O |
| D-10888 | Me(S) | single bond | H | c-Pr | C(=O)Me | Me | $CH_2C(=O)OMe$ | O |
| D-10889 | H | single bond | Me | c-Pr(1-CN) | C(=O)Me | Me | $CH_2C(=O)OMe$ | O |
| D-10890 | Me | single bond | H | c-Pr(1-CN) | C(=O)Me | Me | $CH_2C(=O)OMe$ | O |
| D-10891 | Me(R) | single bond | H | c-Pr(1-CN) | C(=O)Me | Me | $CH_2C(=O)OMe$ | O |
| D-10892 | Me(S) | single bond | H | c-Pr(1-CN) | C(=O)Me | Me | $CH_2C(=O)OMe$ | O |
| D-10893 | H | single bond | Me | $CH_2CF_3$ | C(=O)Me | Cl | $CH_2C(=O)NHMe$ | O |
| D-10894 | Me | single bond | H | $CH_2CF_3$ | C(=O)Me | Cl | $CH_2C(=O)NHMe$ | O |
| D-10895 | Me(R) | single bond | H | $CH_2CF_3$ | C(=O)Me | Cl | $CH_2C(=O)NHMe$ | O |
| D-10896 | Me(S) | single bond | H | $CH_2CF_3$ | C(=O)Me | Cl | $CH_2C(=O)NHMe$ | O |
| D-10897 | H | single bond | Me | Et | C(=O)Me | Cl | $CH_2C(=O)NHMe$ | O |
| D-10898 | Me | single bond | H | Et | C(=O)Me | Cl | $CH_2C(=O)NHMe$ | O |
| D-10899 | Me(R) | single bond | H | Et | C(=O)Me | Cl | $CH_2C(=O)NHMe$ | O |
| D-10900 | Me(S) | single bond | H | Et | C(=O)Me | Cl | $CH_2C(=O)NHMe$ | O |
| D-10901 | H | single bond | Me | c-Pr | C(=O)Me | Cl | $CH_2C(=O)NHMe$ | O |
| D-10902 | Me | single bond | H | c-Pr | C(=O)Me | Cl | $CH_2C(=O)NHMe$ | O |

TABLE 894

| Compound Number | Y | W | Z | $R^1$ | $R^2$ | $R^3$ | $R^{10}$ | A |
|---|---|---|---|---|---|---|---|---|
| D-10903 | Me(R) | single bond | H | c-Pr | C(=O)Me | Cl | $CH_2C(=O)NHMe$ | O |
| D-10904 | Me(S) | single bond | H | c-Pr | C(=O)Me | Cl | $CH_2C(=O)NHMe$ | O |
| D-10905 | H | single bond | Me | c-Pr(1-CN) | C(=O)Me | Cl | $CH_2C(=O)NHMe$ | O |
| D-10906 | Me | single bond | H | c-Pr(1-CN) | C(=O)Me | Cl | $CH_2C(=O)NHMe$ | O |
| D-10907 | Me(R) | single bond | H | c-Pr(1-CN) | C(=O)Me | Cl | $CH_2C(=O)NHMe$ | O |
| D-10908 | Me(S) | single bond | H | c-Pr(1-CN) | C(=O)Me | Cl | $CH_2C(=O)NHMe$ | O |
| D-10909 | H | single bond | Me | $CH_2CF_3$ | C(=O)Me | Me | $CH_2C(=O)NHMe$ | O |
| D-10910 | Me | single bond | H | $CH_2CF_3$ | C(=O)Me | Me | $CH_2C(=O)NHMe$ | O |
| D-10911 | Me(R) | single bond | H | $CH_2CF_3$ | C(=O)Me | Me | $CH_2C(=O)NHMe$ | O |
| D-10912 | Me(S) | single bond | H | $CH_2CF_3$ | C(=O)Me | Me | $CH_2C(=O)NHMe$ | O |
| D-10913 | H | single bond | Me | Et | C(=O)Me | Me | $CH_2C(=O)NHMe$ | O |
| D-10914 | Me | single bond | H | Et | C(=O)Me | Me | $CH_2C(=O)NHMe$ | O |
| D-10915 | Me(R) | single bond | H | Et | C(=O)Me | Me | $CH_2C(=O)NHMe$ | O |
| D-10916 | Me(S) | single bond | H | Et | C(=O)Me | Me | $CH_2C(=O)NHMe$ | O |
| D-10917 | H | single bond | Me | c-Pr | C(=O)Me | Me | $CH_2C(=O)NHMe$ | O |
| D-10918 | Me | single bond | H | c-Pr | C(=O)Me | Me | $CH_2C(=O)NHMe$ | O |
| D-10919 | Me(R) | single bond | H | c-Pr | C(=O)Me | Me | $CH_2C(=O)NHMe$ | O |
| D-10920 | Me(S) | single bond | H | c-Pr | C(=O)Me | Me | $CH_2C(=O)NHMe$ | O |
| D-10921 | H | single bond | Me | c-Pr(1-CN) | C(=O)Me | Me | $CH_2C(=O)NHMe$ | O |
| D-10922 | Me | single bond | H | c-Pr(1-CN) | C(=O)Me | Me | $CH_2C(=O)NHMe$ | O |
| D-10923 | Me(R) | single bond | H | c-Pr(1-CN) | C(=O)Me | Me | $CH_2C(=O)NHMe$ | O |
| D-10924 | Me(S) | single bond | H | c-Pr(1-CN) | C(=O)Me | Me | $CH_2C(=O)NHMe$ | O |
| D-10925 | H | single bond | Me | $CH_2CF_3$ | C(=O)Me | Cl | $CH_2OC(=O)Me$ | O |
| D-10926 | Me | single bond | H | $CH_2CF_3$ | C(=O)Me | Cl | $CH_2OC(=O)Me$ | O |
| D-10927 | Me(R) | single bond | H | $CH_2CF_3$ | C(=O)Me | Cl | $CH_2OC(=O)Me$ | O |
| D-10928 | Me(S) | single bond | H | $CH_2CF_3$ | C(=O)Me | Cl | $CH_2OC(=O)Me$ | O |
| D-10929 | H | single bond | Me | Et | C(=O)Me | Cl | $CH_2OC(=O)Me$ | O |
| D-10930 | Me | single bond | H | Et | C(=O)Me | Cl | $CH_2OC(=O)Me$ | O |
| D-10931 | Me(R) | single bond | H | Et | C(=O)Me | Cl | $CH_2OC(=O)Me$ | O |
| D-10932 | Me(S) | single bond | H | Et | C(=O)Me | Cl | $CH_2OC(=O)Me$ | O |
| D-10933 | H | single bond | Me | c-Pr | C(=O)Me | Cl | $CH_2OC(=O)Me$ | O |
| D-10934 | Me | single bond | H | c-Pr | C(=O)Me | Cl | $CH_2OC(=O)Me$ | O |
| D-10935 | Me(R) | single bond | H | c-Pr | C(=O)Me | Cl | $CH_2OC(=O)Me$ | O |
| D-10936 | Me(S) | single bond | H | c-Pr | C(=O)Me | Cl | $CH_2OC(=O)Me$ | O |
| D-10937 | H | single bond | Me | c-Pr(1-CN) | C(=O)Me | Cl | $CH_2OC(=O)Me$ | O |
| D-10938 | Me | single bond | H | c-Pr(1-CN) | C(=O)Me | Cl | $CH_2OC(=O)Me$ | O |
| D-10939 | Me(R) | single bond | H | c-Pr(1-CN) | C(=O)Me | Cl | $CH_2OC(=O)Me$ | O |
| D-10940 | Me(S) | single bond | H | c-Pr(1-CN) | C(=O)Me | Cl | $CH_2OC(=O)Me$ | O |
| D-10941 | H | single bond | Me | $CH_2CF_3$ | C(=O)Me | Me | $CH_2OC(=O)Me$ | O |
| D-10942 | Me | single bond | H | $CH_2CF_3$ | C(=O)Me | Me | $CH_2OC(=O)Me$ | O |
| D-10943 | Me(R) | single bond | H | $CH_2CF_3$ | C(=O)Me | Me | $CH_2OC(=O)Me$ | O |
| D-10944 | Me(S) | single bond | H | $CH_2CF_3$ | C(=O)Me | Me | $CH_2OC(=O)Me$ | O |

TABLE 894-continued

| Compound Number | Y | W | Z | $R^1$ | $R^2$ | $R^3$ | $R^{10}$ | A |
|---|---|---|---|---|---|---|---|---|
| D-10945 | H | single bond | Me | Et | C(=O)Me | Me | $CH_2OC(=O)Me$ | O |
| D-10946 | Me | single bond | H | Et | C(=O)Me | Me | $CH_2OC(=O)Me$ | O |

TABLE 895

| Compound Number | Y | W | Z | $R^1$ | $R^2$ | $R^3$ | $R^{10}$ | A |
|---|---|---|---|---|---|---|---|---|
| D-10947 | Me(R) | single bond | H | Et | C(=O)Me | Me | $CH_2OC(=O)Me$ | O |
| D-10948 | Me(S) | single bond | H | Et | C(=O)Me | Me | $CH_2OC(=O)Me$ | O |
| D-10949 | H | single bond | Me | c-Pr | C(=O)Me | Me | $CH_2OC(=O)Me$ | O |
| D-10950 | Me | single bond | H | c-Pr | C(=O)Me | Me | $CH_2OC(=O)Me$ | O |
| D-10951 | Me(R) | single bond | H | c-Pr | C(=O)Me | Me | $CH_2OC(=O)Me$ | O |
| D-10952 | Me(S) | single bond | H | c-Pr | C(=O)Me | Me | $CH_2OC(=O)Me$ | O |
| D-10953 | H | single bond | Me | c-Pr(1-CN) | C(=O)Me | Me | $CH_2OC(=O)Me$ | O |
| D-10954 | Me | single bond | H | c-Pr(1-CN) | C(=O)Me | Me | $CH_2OC(=O)Me$ | O |
| D-10955 | Me(R) | single bond | H | c-Pr(1-CN) | C(=O)Me | Me | $CH_2OC(=O)Me$ | O |
| D-10956 | Me(S) | single bond | H | c-Pr(1-CN) | C(=O)Me | Me | $CH_2OC(=O)Me$ | O |
| D-10957 | H | single bond | Me | $CH_2CF_3$ | C(=O)Me | Cl | $CH_2OC(=O)$(i-Pr) | O |
| D-10958 | Me | single bond | H | $CH_2CF_3$ | C(=O)Me | Cl | $CH_2OC(=O)$(i-Pr) | O |
| D-10959 | Me(R) | single bond | H | $CH_2CF_3$ | C(=O)Me | Cl | $CH_2OC(=O)$(i-Pr) | O |
| D-10960 | Me(S) | single bond | H | $CH_2CF_3$ | C(=O)Me | Cl | $CH_2OC(=O)$(i-Pr) | O |
| D-10961 | H | single bond | Me | Et | C(=O)Me | Cl | $CH_2OC(=O)$(i-Pr) | O |
| D-10962 | Me | single bond | H | Et | C(=O)Me | Cl | $CH_2OC(=O)$(i-Pr) | O |
| D-10963 | Me(R) | single bond | H | Et | C(=O)Me | Cl | $CH_2OC(=O)$(i-Pr) | O |
| D-10964 | Me(S) | single bond | H | Et | C(=O)Me | Cl | $CH_2OC(=O)$(i-Pr) | O |
| D-10965 | H | single bond | Me | c-Pr | C(=O)Me | Cl | $CH_2OC(=O)$(i-Pr) | O |
| D-10966 | Me | single bond | H | c-Pr | C(=O)Me | Cl | $CH_2OC(=O)$(i-Pr) | O |
| D-10967 | Me(R) | single bond | H | c-Pr | C(=O)Me | Cl | $CH_2OC(=O)$(i-Pr) | O |
| D-10968 | Me(S) | single bond | H | c-Pr | C(=O)Me | Cl | $CH_2OC(=O)$(i-Pr) | O |
| D-10969 | H | single bond | Me | c-Pr(1-CN) | C(=O)Me | Cl | $CH_2OC(=O)$(i-Pr) | O |
| D-10970 | Me | single bond | H | c-Pr(1-CN) | C(=O)Me | Cl | $CH_2OC(=O)$(i-Pr) | O |
| D-10971 | Me(R) | single bond | H | c-Pr(1-CN) | C(=O)Me | Cl | $CH_2OC(=O)$(i-Pr) | O |
| D-10972 | Me(S) | single bond | H | c-Pr(1-CN) | C(=O)Me | Cl | $CH_2OC(=O)$(i-Pr) | O |
| D-10973 | H | single bond | Me | $CH_2CF_3$ | C(=O)Me | Me | $CH_2OC(=O)$(i-Pr) | O |
| D-10974 | Me | single bond | H | $CH_2CF_3$ | C(=O)Me | Me | $CH_2OC(=O)$(i-Pr) | O |
| D-10975 | Me(R) | single bond | H | $CH_2CF_3$ | C(=O)Me | Me | $CH_2OC(=O)$(/-Pr) | O |
| D-10976 | Me(S) | single bond | H | $CH_2CF_3$ | C(=O)Me | Me | $CH_2OC(=O)$(i-Pr) | O |
| D-10977 | H | single bond | Me | Et | C(=O)Me | Me | $CH_2OC(=O)$(i-Pr) | O |
| D-10978 | Me | single bond | H | Et | C(=O)Me | Me | $CH_2OC(=O)$(i-Pr) | O |
| D-10979 | Me(R) | single bond | H | Et | C(=O)Me | Me | $CH_2OC(=O)$(i-Pr) | O |
| D-10980 | Me(S) | single bond | H | Et | C(=O)Me | Me | $CH_2OC(=O)$(i-Pr) | O |
| D-10981 | H | single bond | Me | c-Pr | C(=O)Me | Me | $CH_2OC(=O)$(i-Pr) | O |
| D-10982 | Me | single bond | H | c-Pr | C(=O)Me | Me | $CH_2OC(=O)$(i-Pr) | O |
| D-10983 | Me(R) | single bond | H | c-Pr | C(=O)Me | Me | $CH_2OC(=O)$(i-Pr) | O |
| D-10984 | Me(S) | single bond | H | c-Pr | C(=O)Me | Me | $CH_2OC(=O)$(i-Pr) | O |
| D-10985 | H | single bond | Me | c-Pr(1-CN) | C(=O)Me | Me | $CH_2OC(=O)$(i-Pr) | O |
| D-10986 | Me | single bond | H | c-Pr(1-CN) | C(=O)Me | Me | $CH_2OC(=O)$(i-Pr) | O |
| D-10987 | Me(R) | single bond | H | c-Pr(1-CN) | C(=O)Me | Me | $CH_2OC(=O)$(i-Pr) | O |
| D-10988 | Me(S) | single bond | H | c-Pr(1-CN) | C(=O)Me | Me | $CH_2OC(=O)$(i-Pr) | O |
| D-10989 | H | single bond | Me | $CH_2CF_3$ | C(=O)Me | Cl | $CH_2OC(=O)$(t-Bu) | O |
| D-10990 | Me | single bond | H | $CH_2CF_3$ | C(=O)Me | Cl | $CH_2OC(=O)$(t-Bu) | O |

TABLE 896

| Compound Number | Y | W | Z | $R^1$ | $R^2$ | $R^3$ | $R^{10}$ | A |
|---|---|---|---|---|---|---|---|---|
| D-10991 | Me(R) | single bond | H | $CH_2CF_3$ | C(=O)Me | Cl | $CH_2OC(=O)$(t-Bu) | O |
| D-10992 | Me(S) | single bond | H | $CH_2CF_3$ | C(=O)Me | Cl | $CH_2OC(=O)$(t-Bu) | O |
| D-10993 | H | single bond | Me | Et | C(=O)Me | Cl | $CH_2OC(=O)$(t-Bu) | O |
| D-10994 | Me | single bond | H | Et | C(=O)Me | Cl | $CH_2OC(=O)$(t-Bu) | O |
| D-10995 | Me(R) | single bond | H | Et | C(=O)Me | Cl | $CH_2OC(=O)$(t-Bu) | O |
| D-10996 | Me(S) | single bond | H | Et | C(=O)Me | Cl | $CH_2OC(=O)$(t-Bu) | O |
| D-10997 | H | single bond | Me | c-Pr | C(=O)Me | Cl | $CH_2OC(=O)$(t-Bu) | O |
| D-10998 | Me | single bond | H | c-Pr | C(=O)Me | Cl | $CH_2OC(=O)$(t-Bu) | O |
| D-10999 | Me(R) | single bond | H | c-Pr | C(=O)Me | Cl | $CH_2OC(=O)$(t-Bu) | O |
| D-11000 | Me(S) | single bond | H | c-Pr | C(=O)Me | Cl | $CH_2OC(=O)$(t-Bu) | O |
| D-11001 | H | single bond | Me | c-Pr(1-CN) | C(=O)Me | Cl | $CH_2OC(=O)$(t-Bu) | O |
| D-11002 | Me | single bond | H | c-Pr(1-CN) | C(=O)Me | Cl | $CH_2OC(=O)$(t-Bu) | O |

TABLE 896-continued

| Compound Number | Y | W | Z | $R^1$ | $R^2$ | $R^3$ | $R^{10}$ | A |
|---|---|---|---|---|---|---|---|---|
| D-11003 | Me(R) | single bond | H | c-Pr(1-CN) | C(=O)Me | Cl | $CH_2OC(=O)(t\text{-}Bu)$ | O |
| D-11004 | Me(S) | single bond | H | c-Pr(1-CN) | C(=O)Me | Cl | $CH_2OC(=O)(t\text{-}Bu)$ | O |
| D-11005 | H | single bond | Me | $CH_2CF_3$ | C(=O)Me | Me | $CH_2OC(=O)(t\text{-}Bu)$ | O |
| D-11006 | Me | single bond | H | $CH_2CF_3$ | C(=O)Me | Me | $CH_2OC(=O)(t\text{-}Bu)$ | O |
| D-11007 | Me(R) | single bond | H | $CH_2CF_3$ | C(=O)Me | Me | $CH_2OC(=O)(t\text{-}Bu)$ | O |
| D-11008 | Me(S) | single bond | H | $CH_2CF_3$ | C(=O)Me | Me | $CH_2OC(=O)(t\text{-}Bu)$ | O |
| D-11009 | H | single bond | Me | Et | C(=O)Me | Me | $CH_2OC(=O)(t\text{-}Bu)$ | O |
| D-11010 | Me | single bond | H | Et | C(=O)Me | Me | $CH_2OC(=O)(t\text{-}Bu)$ | O |
| D-11011 | Me(R) | single bond | H | Et | C(=O)Me | Me | $CH_2OC(=O)(t\text{-}Bu)$ | O |
| D-11012 | Me(S) | single bond | H | Et | C(=O)Me | Me | $CH_2OC(=O)(t\text{-}Bu)$ | O |
| D-11013 | H | single bond | Me | c-Pr | C(=O)Me | Me | $CH_2OC(=O)(t\text{-}Bu)$ | O |
| D-11014 | Me | single bond | H | c-Pr | C(=O)Me | Me | $CH_2OC(=O)(t\text{-}Bu)$ | O |
| D-11015 | Me(R) | single bond | H | c-Pr | C(=O)Me | Me | $CH_2OC(=O)(t\text{-}Bu)$ | O |
| D-11016 | Me(S) | single bond | H | c-Pr | C(=O)Me | Me | $CH_2OC(=O)(t\text{-}Bu)$ | O |
| D-11017 | H | single bond | Me | c-Pr(1-CN) | C(=O)Me | Me | $CH_2OC(=O)(t\text{-}Bu)$ | O |
| D-11018 | Me | single bond | H | c-Pr(1-CN) | C(=O)Me | Me | $CH_2OC(=O)(t\text{-}Bu)$ | O |
| D-11019 | Me(R) | single bond | H | c-Pr(1-CN) | C(=O)Me | Me | $CH_2OC(=O)(t\text{-}Bu)$ | O |
| D-11020 | Me(S) | single bond | H | c-Pr(1-CN) | C(=O)Me | Me | $CH_2OC(=O)(t\text{-}Bu)$ | O |
| D-11021 | H | single bond | Me | $CH_2CF_3$ | C(=O)Me | Cl | $CH_2OC(=O)OEt$ | O |
| D-11022 | Me | single bond | H | $CH_2CF_3$ | C(=O)Me | Cl | $CH_2OC(=O)OEt$ | O |
| D-11023 | Me(R) | single bond | H | $CH_2CF_3$ | C(=O)Me | Cl | $CH_2OC(=O)OEt$ | O |
| D-11024 | Me(S) | single bond | H | $CH_2CF_3$ | C(=O)Me | Cl | $CH_2OC(=O)OEt$ | O |
| D-11025 | H | single bond | Me | Et | C(=O)Me | Cl | $CH_2OC(=O)OEt$ | O |
| D-11026 | Me | single bond | H | Et | C(=O)Me | Cl | $CH_2OC(=O)OEt$ | O |
| D-11027 | Me(R) | single bond | H | Et | C(=O)Me | Cl | $CH_2OC(=O)OEt$ | O |
| D-11028 | Me(S) | single bond | H | Et | C(=O)Me | Cl | $CH_2OC(=O)OEt$ | O |
| D-11029 | H | single bond | Me | c-Pr | C(=O)Me | Cl | $CH_2OC(=O)OEt$ | O |
| D-11030 | Me | single bond | H | c-Pr | C(=O)Me | Cl | $CH_2OC(=O)OEt$ | O |
| D-11031 | Me(R) | single bond | H | c-Pr | C(=O)Me | Cl | $CH_2OC(=O)OEt$ | O |
| D-11032 | Me(S) | single bond | H | c-Pr | C(=O)Me | Cl | $CH_2OC(=O)OEt$ | O |
| D-11033 | H | single bond | Me | c-Pr(1-CN) | C(=O)Me | Cl | $CH_2OC(=O)OEt$ | O |
| D-11034 | Me | single bond | H | c-Pr(1-CN) | C(=O)Me | Cl | $CH_2OC(=O)OEt$ | O |

TABLE 897

| Compound Number | Y | W | Z | $R^1$ | $R^2$ | $R^3$ | $R^{10}$ | A |
|---|---|---|---|---|---|---|---|---|
| D-11035 | Me(R) | single bond | H | c-Pr(1-CN) | C(=O)Me | Cl | $CH_2OC(=O)OEt$ | O |
| D-11036 | Me(S) | single bond | H | c-Pr(1-CN) | C(=O)Me | Cl | $CH_2OC(=O)OEt$ | O |
| D-11037 | H | single bond | Me | $CH_2CF_3$ | C(=O)Me | Me | $CH_2OC(=O)OEt$ | O |
| D-11038 | Me | single bond | H | $CH_2CF_3$ | C(=O)Me | Me | $CH_2OC(=O)OEt$ | O |
| D-11039 | Me(R) | single bond | H | $CH_2CF_3$ | C(=O)Me | Me | $CH_2OC(=O)OEt$ | O |
| D-11040 | Me(S) | single bond | H | $CH_2CF_3$ | C(=O)Me | Me | $CH_2OC(=O)OEt$ | O |
| D-11041 | H | single bond | Me | Et | C(=O)Me | Me | $CH_2OC(=O)OEt$ | O |
| D-11042 | Me | single bond | H | Et | C(=O)Me | Me | $CH_2OC(=O)OEt$ | O |
| D-11043 | Me(R) | single bond | H | Et | C(=O)Me | Me | $CH_2OC(=O)OEt$ | O |
| D-11044 | Me(S) | single bond | H | Et | C(=O)Me | Me | $CH_2OC(=O)OEt$ | O |
| D-11045 | H | single bond | Me | c-Pr | C(=O)Me | Me | $CH_2OC(=O)OEt$ | O |
| D-11046 | Me | single bond | H | c-Pr | C(=O)Me | Me | $CH_2OC(=O)OEt$ | O |
| D-11047 | Me(R) | single bond | H | c-Pr | C(=O)Me | Me | $CH_2OC(=O)OEt$ | O |
| D-11048 | Me(S) | single bond | H | c-Pr | C(=O)Me | Me | $CH_2OC(=O)OEt$ | O |
| D-11049 | H | single bond | Me | c-Pr(1-CN) | C(=O)Me | Me | $CH_2OC(=O)OEt$ | O |
| D-11050 | Me | single bond | H | c-Pr(1-CN) | C(=O)Me | Me | $CH_2OC(=O)OEt$ | O |
| D-11051 | Me(R) | single bond | H | c-Pr(1-CN) | C(=O)Me | Me | $CH_2OC(=O)OEt$ | O |
| D-11052 | Me(S) | single bond | H | c-Pr(1-CN) | C(=O)Me | Me | $CH_2OC(=O)OEt$ | O |
| D-11053 | H | single bond | Me | $CH_2CF_3$ | C(=O)Me | Cl | $CH_2OC(=O)O(i\text{-}Pr)$ | O |
| D-11054 | Me | single bond | H | $CH_2CF_3$ | C(=O)Me | Cl | $CH_2OC(=O)O(i\text{-}Pr)$ | O |
| D-11055 | Me(R) | single bond | H | $CH_2CF_3$ | C(=O)Me | Cl | $CH_2OC(=O)O(i\text{-}Pr)$ | O |
| D-11056 | Me(S) | single bond | H | $CH_2CF_3$ | C(=O)Me | Cl | $CH_2OC(=O)O(i\text{-}Pr)$ | O |
| D-11057 | H | single bond | Me | Et | C(=O)Me | Cl | $CH_2OC(=O)O(i\text{-}Pr)$ | O |
| D-11058 | Me | single bond | H | Et | C(=O)Me | Cl | $CH_2OC(=O)O(i\text{-}Pr)$ | O |
| D-11059 | Me(R) | single bond | H | Et | C(=O)Me | Cl | $CH_2OC(=O)O(i\text{-}Pr)$ | O |
| D-11060 | Me(S) | single bond | H | Et | C(=O)Me | Cl | $CH_2OC(=O)O(i\text{-}Pr)$ | O |
| D-11061 | H | single bond | Me | c-Pr | C(=O)Me | Cl | $CH_2OC(=O)O(i\text{-}Pr)$ | O |
| D-11062 | Me | single bond | H | c-Pr | C(=O)Me | Cl | $CH_2OC(=O)O(i\text{-}Pr)$ | O |
| D-11063 | Me(R) | single bond | H | c-Pr | C(=O)Me | Cl | $CH_2OC(=O)O(i\text{-}Pr)$ | O |
| D-11064 | Me(S) | single bond | H | c-Pr | C(=O)Me | Cl | $CH_2OC(=O)O(i\text{-}Pr)$ | O |
| D-11065 | H | single bond | Me | c-Pr(1-CN) | C(=O)Me | Cl | $CH_2OC(=O)O(i\text{-}Pr)$ | O |
| D-11066 | Me | single bond | H | c-Pr(1-CN) | C(=O)Me | Cl | $CH_2OC(=O)O(i\text{-}Pr)$ | O |
| D-11067 | Me(R) | single bond | H | c-Pr(1-CN) | C(=O)Me | Cl | $CH_2OC(=O)O(i\text{-}Pr)$ | O |
| D-11068 | Me(S) | single bond | H | c-Pr(1-CN) | C(=O)Me | Cl | $CH_2OC(=O)O(i\text{-}Pr)$ | O |
| D-11069 | H | single bond | Me | $CH_2CF_3$ | C(=O)Me | Me | $CH_2OC(=O)O(i\text{-}Pr)$ | O |

TABLE 897-continued

| Compound Number | Y | W | Z | $R^1$ | $R^2$ | $R^3$ | $R^{10}$ | A |
|---|---|---|---|---|---|---|---|---|
| D-11070 | Me | single bond | H | $CH_2CF_3$ | C(=O)Me | Me | $CH_2OC(=O)O(i\text{-}Pr)$ | O |
| D-11071 | Me(R) | single bond | H | $CH_2CF_3$ | C(=O)Me | Me | $CH_2OC(=O)O(i\text{-}Pr)$ | O |
| D-11072 | Me(S) | single bond | H | $CH_2CF_3$ | C(=O)Me | Me | $CH_2OC(=O)O(i\text{-}Pr)$ | O |
| D-11073 | H | single bond | Me | Et | C(=O)Me | Me | $CH_2OC(=O)O(i\text{-}Pr)$ | O |
| D-11074 | Me | single bond | H | Et | C(=O)Me | Me | $CH_2OC(=O)O(i\text{-}Pr)$ | O |
| D-11075 | Me(R) | single bond | H | Et | C(=O)Me | Me | $CH_2OC(=O)O(i\text{-}Pr)$ | O |
| D-11076 | Me(S) | single bond | H | Et | C(=O)Me | Me | $CH_2OC(=O)O(i\text{-}Pr)$ | O |
| D-11077 | H | single bond | Me | c-Pr | C(=O)Me | Me | $CH_2OC(=O)O(i\text{-}Pr)$ | O |
| D-11078 | Me | single bond | H | c-Pr | C(=O)Me | Me | $CH_2OC(=O)O(i\text{-}Pr)$ | O |

TABLE 898

| Compound Number | Y | W | Z | $R^1$ | $R^2$ | $R^3$ | $R^{10}$ | A |
|---|---|---|---|---|---|---|---|---|
| D-11079 | Me(R) | single bond | H | c-Pr | C(=O)Me | Me | $CH_2OC(=O)O(i\text{-}Pr)$ | O |
| D-11080 | Me(S) | single bond | H | c-Pr | C(=O)Me | Me | $CH_2OC(=O)O(i\text{-}Pr)$ | O |
| D-11081 | H | single bond | Me | c-Pr(1-CN) | C(=O)Me | Me | $CH_2OC(=O)O(i\text{-}Pr)$ | O |
| D-11082 | Me | single bond | H | c-Pr(1-CN) | C(=O)Me | Me | $CH_2OC(=O)O(i\text{-}Pr)$ | O |
| D-11083 | Me(R) | single bond | H | c-Pr(1-CN) | C(=O)Me | Me | $CH_2OC(=O)O(i\text{-}Pr)$ | O |
| D-11084 | Me(S) | single bond | H | c-Pr(1-CN) | C(=O)Me | Me | $CH_2OC(=O)O(i\text{-}Pr)$ | O |
| D-11085 | H | single bond | Me | $CH_2CF_3$ | C(=O)Me | Cl | $CH_2N(Me)C(=O)OMe$ | O |
| D-11086 | Me | single bond | H | $CH_2CF_3$ | C(=O)Me | Cl | $CH_2N(Me)C(=O)OMe$ | O |
| D-11087 | Me(R) | single bond | H | $CH_2CF_3$ | C(=O)Me | Cl | $CH_2N(Me)C(=O)OMe$ | O |
| D-11088 | Me(S) | single bond | H | $CH_2CF_3$ | C(=O)Me | Cl | $CH_2N(Me)C(=O)OMe$ | O |
| D-11089 | H | single bond | Me | Et | C(=O)Me | Cl | $CH_2N(Me)C(=O)OMe$ | O |
| D-11090 | Me | single bond | H | Et | C(=O)Me | Cl | $CH_2N(Me)C(=O)OMe$ | O |
| D-11091 | Me(R) | single bond | H | Et | C(=O)Me | Cl | $CH_2N(Me)C(=O)OMe$ | O |
| D-11092 | Me(S) | single bond | H | Et | C(=O)Me | Cl | $CH_2N(Me)C(=O)OMe$ | O |
| D-11093 | H | single bond | Me | c-Pr | C(=O)Me | Cl | $CH_2N(Me)C(=O)OMe$ | O |
| D-11094 | Me | single bond | H | c-Pr | C(=O)Me | Cl | $CH_2N(Me)C(=O)OMe$ | O |
| D-11095 | Me(R) | single bond | H | c-Pr | C(=O)Me | Cl | $CH_2N(Me)C(=O)OMe$ | O |
| D-11096 | Me(S) | single bond | H | c-Pr | C(=O)Me | Cl | $CH_2N(Me)C(=O)OMe$ | O |
| D-11097 | H | single bond | Me | c-Pr(1-CN) | C(=O)Me | Cl | $CH_2N(Me)C(=O)OMe$ | O |
| D-11098 | Me | single bond | H | c-Pr(1-CN) | C(=O)Me | Cl | $CH_2N(Me)C(=O)OMe$ | O |
| D-11099 | Me(R) | single bond | H | c-Pr(1-CN) | C(=O)Me | Cl | $CH_2N(Me)C(=O)OMe$ | O |
| D-11100 | Me(S) | single bond | H | c-Pr(1-CN) | C(=O)Me | Cl | $CH_2N(Me)C(=O)OMe$ | O |
| D-11101 | H | single bond | Me | $CH_2CF_3$ | C(=O)Me | Me | $CH_2N(Me)C(=O)OMe$ | O |
| D-11102 | Me | single bond | H | $CH_2CF_3$ | C(=O)Me | Me | $CH_2N(Me)C(=O)OMe$ | O |
| D-11103 | Me(R) | single bond | H | $CH_2CF_3$ | C(=O)Me | Me | $CH_2N(Me)C(=O)OMe$ | O |
| D-11104 | Me(S) | single bond | H | $CH_2CF_3$ | C(=O)Me | Me | $CH_2N(Me)C(=O)OMe$ | O |
| D-11105 | H | single bond | Me | Et | C(=O)Me | Me | $CH_2N(Me)C(=O)OMe$ | O |
| D-11106 | Me | single bond | H | Et | C(=O)Me | Me | $CH_2N(Me)C(=O)OMe$ | O |
| D-11107 | Me(R) | single bond | H | Et | C(=O)Me | Me | $CH_2N(Me)C(=O)OMe$ | O |
| D-11108 | Me(S) | single bond | H | Et | C(=O)Me | Me | $CH_2N(Me)C(=O)OMe$ | O |
| D-11109 | H | single bond | Me | c-Pr | C(=O)Me | Me | $CH_2N(Me)C(=O)OMe$ | O |
| D-11110 | Me | single bond | H | c-Pr | C(=O)Me | Me | $CH_2N(Me)C(=O)OMe$ | O |
| D-11111 | Me(R) | single bond | H | c-Pr | C(=O)Me | Me | $CH_2N(Me)C(=O)OMe$ | O |
| D-11112 | Me(S) | single bond | H | c-Pr | C(=O)Me | Me | $CH_2N(Me)C(=O)OMe$ | O |
| D-11113 | H | single bond | Me | c-Pr(1-CN) | C(=O)Me | Me | $CH_2N(Me)C(=O)OMe$ | O |
| D-11114 | Me | single bond | H | c-Pr(1-CN) | C(=O)Me | Me | $CH_2N(Me)C(=O)OMe$ | O |
| D-11115 | Me(R) | single bond | H | c-Pr(1-CN) | C(=O)Me | Me | $CH_2N(Me)C(=O)OMe$ | O |
| D-11116 | Me(S) | single bond | H | c-Pr(1-CN) | C(=O)Me | Me | $CH_2N(Me)C(=O)OMe$ | O |
| D-11117 | H | single bond | Me | $CH_2CF_3$ | C(=O)Me | Cl | $CH_2OCH_2CH_2OMe$ | O |
| D-11118 | Me | single bond | H | $CH_2CF_3$ | C(=O)Me | Cl | $CH_2OCH_2CH_2OMe$ | O |
| D-11119 | Me(R) | single bond | H | $CH_2CF_3$ | C(=O)Me | Cl | $CH_2OCH_2CH_2OMe$ | O |
| D-11120 | Me(S) | single bond | H | $CH_2CF_3$ | C(=O)Me | Cl | $CH_2OCH_2CH_2OMe$ | O |
| D-11121 | H | single bond | Me | Et | C(=O)Me | Cl | $CH_2OCH_2CH_2OMe$ | O |
| D-11122 | Me | single bond | H | Et | C(=O)Me | Cl | $CH_2OCH_2CH_2OMe$ | O |

TABLE 899

| Compound Number | Y | W | Z | $R^1$ | $R^2$ | $R^3$ | $R^{10}$ | A |
|---|---|---|---|---|---|---|---|---|
| D-11123 | Me(R) | single bond | H | Et | C(=O)Me | Cl | $CH_2OCH_2CH_2OMe$ | O |
| D-11124 | Me(S) | single bond | H | Et | C(=O)Me | Cl | $CH_2OCH_2CH_2OMe$ | O |
| D-11125 | H | single bond | Me | c-Pr | C(=O)Me | Cl | $CH_2OCH_2CH_2OMe$ | O |

TABLE 899-continued

| Compound Number | Y | W | Z | $R^1$ | $R^2$ | $R^3$ | $R^{10}$ | A |
|---|---|---|---|---|---|---|---|---|
| D-11126 | Me | single bond | H | c-Pr | C(═O)Me | Cl | $CH_2OCH_2CH_2OMe$ | O |
| D-11127 | Me(R) | single bond | H | c-Pr | C(═O)Me | Cl | $CH_2OCH_2CH_2OMe$ | O |
| D-11128 | Me(S) | single bond | H | c-Pr | C(═O)Me | Cl | $CH_2OCH_2CH_2OMe$ | O |
| D-11129 | H | single bond | Me | c-Pr(1-CN) | C(═O)Me | Cl | $CH_2OCH_2CH_2OMe$ | O |
| D-11130 | Me | single bond | H | c-Pr(1-CN) | C(═O)Me | Cl | $CH_2OCH_2CH_2OMe$ | O |
| D-11131 | Me(R) | single bond | H | c-Pr(1-CN) | C(═O)Me | Cl | $CH_2OCH_2CH_2OMe$ | O |
| D-11132 | Me(S) | single bond | H | c-Pr(1-CN) | C(═O)Me | Cl | $CH_2OCH_2CH_2OMe$ | O |
| D-11133 | H | single bond | Me | $CH_2CF_3$ | C(═O)Me | Me | $CH_2OCH_2CH_2OMe$ | O |
| D-11134 | Me | single bond | H | $CH_2CF_3$ | C(═O)Me | Me | $CH_2OCH_2CH_2OMe$ | O |
| D-11135 | Me(R) | single bond | H | $CH_2CF_3$ | C(═O)Me | Me | $CH_2OCH_2CH_2OMe$ | O |
| D-11136 | Me(S) | single bond | H | $CH_2CF_3$ | C(═O)Me | Me | $CH_2OCH_2CH_2OMe$ | O |
| D-11137 | H | single bond | Me | Et | C(═O)Me | Me | $CH_2OCH_2CH_2OMe$ | O |
| D-11138 | Me | single bond | H | Et | C(═O)Me | Me | $CH_2OCH_2CH_2OMe$ | O |
| D-11139 | Me(R) | single bond | H | Et | C(═O)Me | Me | $CH_2OCH_2CH_2OMe$ | O |
| D-11140 | Me(S) | single bond | H | Et | C(═O)Me | Me | $CH_2OCH_2CH_2OMe$ | O |
| D-11141 | H | single bond | Me | c-Pr | C(═O)Me | Me | $CH_2OCH_2CH_2OMe$ | O |
| D-11142 | Me | single bond | H | c-Pr | C(═O)Me | Me | $CH_2OCH_2CH_2OMe$ | O |
| D-11143 | Me(R) | single bond | H | c-Pr | C(═O)Me | Me | $CH_2OCH_2CH_2OMe$ | O |
| D-11144 | Me(S) | single bond | H | c-Pr | C(═O)Me | Me | $CH_2OCH_2CH_2OMe$ | O |
| D-11145 | H | single bond | Me | c-Pr(1-CN) | C(═O)Me | Me | $CH_2OCH_2CH_2OMe$ | O |
| D-11146 | Me | single bond | H | c-Pr(1-CN) | C(═O)Me | Me | $CH_2OCH_2CH_2OMe$ | O |
| D-11147 | Me(R) | single bond | H | c-Pr(1-CN) | C(═O)Me | Me | $CH_2OCH_2CH_2OMe$ | O |
| D-11148 | Me(S) | single bond | H | c-Pr(1-CN) | C(═O)Me | Me | $CH_2OCH_2CH_2OMe$ | O |
| D-11149 | H | single bond | Me | $CH_2CF_3$ | C(═O)Me | Cl | $CH_2OCH_2CH_2CN$ | O |
| D-11150 | Me | single bond | H | $CH_2CF_3$ | C(═O)Me | Cl | $CH_2OCH_2CH_2CN$ | O |
| D-11151 | Me(R) | single bond | H | $CH_2CF_3$ | C(═O)Me | Cl | $CH_2OCH_2CH_2CN$ | O |
| D-11152 | Me(S) | single bond | H | $CH_2CF_3$ | C(═O)Me | Cl | $CH_2OCH_2CH_2CN$ | O |
| D-11153 | H | single bond | Me | Et | C(═O)Me | Cl | $CH_2OCH_2CH_2CN$ | O |
| D-11154 | Me | single bond | H | Et | C(═O)Me | Cl | $CH_2OCH_2CH_2CN$ | O |
| D-11155 | Me(R) | single bond | H | Et | C(═O)Me | Cl | $CH_2OCH_2CH_2CN$ | O |
| D-11156 | Me(S) | single bond | H | Et | C(═O)Me | Cl | $CH_2OCH_2CH_2CN$ | O |
| D-11157 | H | single bond | Me | c-Pr | C(═O)Me | Cl | $CH_2OCH_2CH_2CN$ | O |
| D-11158 | Me | single bond | H | c-Pr | C(═O)Me | Cl | $CH_2OCH_2CH_2CN$ | O |
| D-11159 | Me(R) | single bond | H | c-Pr | C(═O)Me | Cl | $CH_2OCH_2CH_2CN$ | O |
| D-11160 | Me(S) | single bond | H | c-Pr | C(═O)Me | Cl | $CH_2OCH_2CH_2CN$ | O |
| D-11161 | H | single bond | Me | c-Pr(1-CN) | C(═O)Me | Cl | $CH_2OCH_2CH_2CN$ | O |
| D-11162 | Me | single bond | H | c-Pr(1-CN) | C(═O)Me | Cl | $CH_2OCH_2CH_2CN$ | O |
| D-11163 | Me(R) | single bond | H | c-Pr(1-CN) | C(═O)Me | Cl | $CH_2OCH_2CH_2CN$ | O |
| D-11164 | Me(S) | single bond | H | c-Pr(1-CN) | C(═O)Me | Cl | $CH_2OCH_2CH_2CN$ | O |
| D-11165 | H | single bond | Me | $CH_2CF_3$ | C(═O)Me | Me | $CH_2OCH_2CH_2CN$ | O |
| D-11166 | Me | single bond | H | $CH_2CF_3$ | C(═O)Me | Me | $CH_2OCH_2CH_2CN$ | O |

TABLE 900

| Compound Number | Y | W | Z | $R^1$ | $R^2$ | $R^3$ | $R^{10}$ | A |
|---|---|---|---|---|---|---|---|---|
| D-11167 | Me(R) | single bond | H | $CH_2CF_3$ | C(═O)Me | Me | $CH_2OCH_2CH_2CN$ | O |
| D-11168 | Me(S) | single bond | H | $CH_2CF_3$ | C(═O)Me | Me | $CH_2OCH_2CH_2CN$ | O |
| D-11169 | H | single bond | Me | Et | C(═O)Me | Me | $CH_2OCH_2CH_2CN$ | O |
| D-11170 | Me | single bond | H | Et | C(═O)Me | Me | $CH_2OCH_2CH_2CN$ | O |
| D-11171 | Me(R) | single bond | H | Et | C(═O)Me | Me | $CH_2OCH_2CH_2CN$ | O |
| D-11172 | Me(S) | single bond | H | Et | C(═O)Me | Me | $CH_2OCH_2CH_2CN$ | O |
| D-11173 | H | single bond | Me | c-Pr | C(═O)Me | Me | $CH_2OCH_2CH_2CN$ | O |
| D-11174 | Me | single bond | H | c-Pr | C(═O)Me | Me | $CH_2OCH_2CH_2CN$ | O |
| D-11175 | Me(R) | single bond | H | c-Pr | C(═O)Me | Me | $CH_2OCH_2CH_2CN$ | O |
| D-11176 | Me(S) | single bond | H | c-Pr | C(═O)Me | Me | $CH_2OCH_2CH_2CN$ | O |
| D-11177 | H | single bond | Me | c-Pr(1-CN) | C(═O)Me | Me | $CH_2OCH_2CH_2CN$ | O |
| D-11178 | Me | single bond | H | c-Pr(1-CN) | C(═O)Me | Me | $CH_2OCH_2CH_2CN$ | O |
| D-11179 | Me(R) | single bond | H | c-Pr(1-CN) | C(═O)Me | Me | $CH_2OCH_2CH_2CN$ | O |
| D-11180 | Me(S) | single bond | H | c-Pr(1-CN) | C(═O)Me | Me | $CH_2OCH_2CH_2CN$ | O |
| D-11181 | H | single bond | Me | $CH_2CF_3$ | C(═O)Me | Cl | $CH_2OCH_2CH_2S(═O)_2Me$ | O |
| D-11182 | Me | single bond | H | $CH_2CF_3$ | C(═O)Me | Cl | $CH_2OCH_2CH_2S(═O)_2Me$ | O |
| D-11183 | Me(R) | single bond | H | $CH_2CF_3$ | C(═O)Me | Cl | $CH_2OCH_2CH_2S(═O)_2Me$ | O |
| D-11184 | Me(S) | single bond | H | $CH_2CF_3$ | C(═O)Me | Cl | $CH_2OCH_2CH_2S(═O)_2Me$ | O |
| D-11185 | H | single bond | Me | Et | C(═O)Me | Cl | $CH_2OCH_2CH_2S(═O)_2Me$ | O |
| D-11186 | Me | single bond | H | Et | C(═O)Me | Cl | $CH_2OCH_2CH_2S(═O)_2Me$ | O |
| D-11187 | Me(R) | single bond | H | Et | C(═O)Me | Cl | $CH_2OCH_2CH_2S(═O)_2Me$ | O |
| D-11188 | Me(S) | single bond | H | Et | C(═O)Me | Cl | $CH_2OCH_2CH_2S(═O)_2Me$ | O |
| D-11189 | H | single bond | Me | c-Pr | C(═O)Me | Cl | $CH_2OCH_2CH_2S(═O)_2Me$ | O |
| D-11190 | Me | single bond | H | c-Pr | C(═O)Me | Cl | $CH_2OCH_2CH_2S(═O)_2Me$ | O |
| D-11191 | Me(R) | single bond | H | c-Pr | C(═O)Me | Cl | $CH_2OCH_2CH_2S(═O)_2Me$ | O |
| D-11192 | Me(S) | single bond | H | c-Pr | C(═O)Me | Cl | $CH_2OCH_2CH_2S(═O)_2Me$ | O |

TABLE 900-continued

| Compound Number | Y | W | Z | $R^1$ | $R^2$ | $R^3$ | $R^{10}$ | A |
|---|---|---|---|---|---|---|---|---|
| D-11193 | H | single bond | Me | c-Pr(1-CN) | C(═O)Me | Cl | $CH_2OCH_2CH_2S(=O)_2Me$ | O |
| D-11194 | Me | single bond | H | c-Pr(1-CN) | C(═O)Me | Cl | $CH_2OCH_2CH_2S(=O)_2Me$ | O |
| D-11195 | Me(R) | single bond | H | c-Pr(1-CN) | C(═O)Me | Cl | $CH_2OCH_2CH_2S(=O)_2Me$ | O |
| D-11196 | Me(S) | single bond | H | c-Pr(1-CN) | C(═O)Me | Cl | $CH_2OCH_2CH_2S(=O)_2Me$ | O |
| D-11197 | H | single bond | Me | $CH_2CF_3$ | C(═O)Me | Me | $CH_2OCH_2CH_2S(=O)_2Me$ | O |
| D-11198 | Me | single bond | H | $CH_2CF_3$ | C(═O)Me | Me | $CH_2OCH_2CH_2S(=O)_2Me$ | O |
| D-11199 | Me(R) | single bond | H | $CH_2CF_3$ | C(═O)Me | Me | $CH_2OCH_2CH_2S(=O)_2Me$ | O |
| D-11200 | Me(S) | single bond | H | $CH_2CF_3$ | C(═O)Me | Me | $CH_2OCH_2CH_2S(=O)_2Me$ | O |
| D-11201 | H | single bond | Me | Et | C(═O)Me | Me | $CH_2OCH_2CH_2S(=O)_2Me$ | O |
| D-11202 | Me | single bond | H | Et | C(═O)Me | Me | $CH_2OCH_2CH_2S(=O)_2Me$ | O |
| D-11203 | Me(R) | single bond | H | Et | C(═O)Me | Me | $CH_2OCH_2CH_2S(=O)_2Me$ | O |
| D-11204 | Me(S) | single bond | H | Et | C(═O)Me | Me | $CH_2OCH_2CH_2S(=O)_2Me$ | O |
| D-11205 | H | single bond | Me | c-Pr | C(═O)Me | Me | $CH_2OCH_2CH_2S(=O)_2Me$ | O |
| D-11206 | Me | single bond | H | c-Pr | C(═O)Me | Me | $CH_2OCH_2CH_2S(=O)_2Me$ | O |
| D-11207 | Me(R) | single bond | H | c-Pr | C(═O)Me | Me | $CH_2OCH_2CH_2S(=O)_2Me$ | O |
| D-11208 | Me(S) | single bond | H | c-Pr | C(═O)Me | Me | $CH_2OCH_2CH_2S(=O)_2Me$ | O |
| D-11209 | H | single bond | Me | c-Pr(1-CN) | C(═O)Me | Me | $CH_2OCH_2CH_2S(=O)_2Me$ | O |
| D-11210 | Me | single bond | H | c-Pr(1-CN) | C(═O)Me | Me | $CH_2OCH_2CH_2S(=O)_2Me$ | O |

TABLE 901

| Compound Number | Y | W | Z | $R^1$ | $R^2$ | $R^3$ | $R^{10}$ | A |
|---|---|---|---|---|---|---|---|---|
| D-11211 | Me(R) | single bond | H | c-Pr(1-CN) | C(═O)Me | Me | $CH_2OCH_2CH_2S(=O)_2Me$ | O |
| D-11212 | Me(S) | single bond | H | c-Pr(1-CN) | C(═O)Me | Me | $CH_2OCH_2CH_2S(=O)_2Me$ | O |
| D-11213 | H | single bond | Me | $CH_2CF_3$ | C(═O)Me | Cl | $CH_2$(5-Me-1,3-dioxol-2-one-4-yl) | O |
| D-11214 | Me | single bond | H | $CH_2CF_3$ | C(═O)Me | Cl | $CH_2$(5-Me-1,3-dioxol-2-one-4-yl) | O |
| D-11215 | Me(R) | single bond | H | $CH_2CF_3$ | C(═O)Me | Cl | $CH_2$(5-Me-1,3-dioxol-2-one-4-yl) | O |
| D-11216 | Me(S) | single bond | H | $CH_2CF_3$ | C(═O)Me | Cl | $CH_2$(5-Me-1,3-dioxol-2-one-4-yl) | O |
| D-11217 | H | single bond | Me | Et | C(═O)Me | Cl | $CH_2$(5-Me-1,3-dioxol-2-one-4-yl) | O |
| D-11218 | Me | single bond | H | Et | C(═O)Me | Cl | $CH_2$(5-Me-1,3-dioxol-2-one-4-yl) | O |
| D-11219 | Me(R) | single bond | H | Et | C(═O)Me | Cl | $CH_2$(5-Me-1,3-dioxol-2-one-4-yl) | O |
| D-11220 | Me(S) | single bond | H | Et | C(═O)Me | Cl | $CH_2$(5-Me-1,3-dioxol-2-one-4-yl) | O |
| D-11221 | H | single bond | Me | c-Pr | C(═O)Me | Cl | $CH_2$(5-Me-1,3-dioxol-2-one-4-yl) | O |
| D-11222 | Me | single bond | H | c-Pr | C(═O)Me | Cl | $CH_2$(5-Me-1,3-dioxol-2-one-4-yl) | O |
| D-11223 | Me(R) | single bond | H | c-Pr | C(═O)Me | Cl | $CH_2$(5-Me-1,3-dioxol-2-one-4-yl) | O |
| D-11224 | Me(S) | single bond | H | c-Pr | C(═O)Me | Cl | $CH_2$(5-Me-1,3-dioxol-2-one-4-yl) | O |
| D-11225 | H | single bond | Me | c-Pr(1-CN) | C(═O)Me | Cl | $CH_2$(5-Me-1,3-dioxol-2-one-4-yl) | O |
| D-11226 | Me | single bond | H | c-Pr(1-CN) | C(═O)Me | Cl | $CH_2$(5-Me-1,3-dioxol-2-one-4-yl) | O |
| D-11227 | Me(R) | single bond | H | c-Pr(1-CN) | C(═O)Me | Cl | $CH_2$(5-Me-1,3-dioxol-2-one-4-yl) | O |
| D-11228 | Me(S) | single bond | H | c-Pr(1-CN) | C(═O)Me | Cl | $CH_2$(5-Me-1,3-dioxol-2-one-4-yl) | O |
| D-11229 | H | single bond | Me | $CH_2CF_3$ | C(═O)Me | Me | $CH_2$(5-Me-1,3-dioxol-2-one-4-yl) | O |
| D-11230 | Me | single bond | H | $CH_2CF_3$ | C(═O)Me | Me | $CH_2$(5-Me-1,3-dioxol-2-one-4-yl) | O |
| D-11231 | Me(R) | single bond | H | $CH_2CF_3$ | C(═O)Me | Me | $CH_2$(5-Me-1,3-dioxol-2-one-4-yl) | O |
| D-11232 | Me(S) | single bond | H | $CH_2CF_3$ | C(═O)Me | Me | $CH_2$(5-Me-1,3-dioxol-2-one-4-yl) | O |
| D-11233 | H | single bond | Me | Et | C(═O)Me | Me | $CH_2$(5-Me-1,3-dioxol-2-one-4-yl) | O |
| D-11234 | Me | single bond | H | Et | C(═O)Me | Me | $CH_2$(5-Me-1,3-dioxol-2-one-4-yl) | O |
| D-11235 | Me(R) | single bond | H | Et | C(═O)Me | Me | $CH_2$(5-Me-1,3-dioxol-2-one-4-yl) | O |
| D-11236 | Me(S) | single bond | H | Et | C(═O)Me | Me | $CH_2$(5-Me-1,3-dioxol-2-one-4-yl) | O |
| D-11237 | H | single bond | Me | c-Pr | C(═O)Me | Me | $CH_2$(5-Me-1,3-dioxol-2-one-4-yl) | O |
| D-11238 | Me | single bond | H | c-Pr | C(═O)Me | Me | $CH_2$(5-Me-1,3-dioxol-2-one-4-yl) | O |
| D-11239 | Me(R) | single bond | H | c-Pr | C(═O)Me | Me | $CH_2$(5-Me-1,3-dioxol-2-one-4-yl) | O |
| D-11240 | Me(S) | single bond | H | c-Pr | C(═O)Me | Me | $CH_2$(5-Me-1,3-dioxol-2-one-4-yl) | O |
| D-11241 | H | single bond | Me | c-Pr(1-CN) | C(═O)Me | Me | $CH_2$(5-Me-1,3-dioxol-2-one-4-yl) | O |
| D-11242 | Me | single bond | H | c-Pr(1-CN) | C(═O)Me | Me | $CH_2$(5-Me-1,3-dioxol-2-one-4-yl) | O |
| D-11243 | Me(R) | single bond | H | c-Pr(1-CN) | C(═O)Me | Me | $CH_2$(5-Me-1,3-dioxol-2-one-4-yl) | O |
| D-11244 | Me(S) | single bond | H | c-Pr(1-CN) | C(═O)Me | Me | $CH_2$(5-Me-1,3-dioxol-2-one-4-yl) | O |

TABLE 902

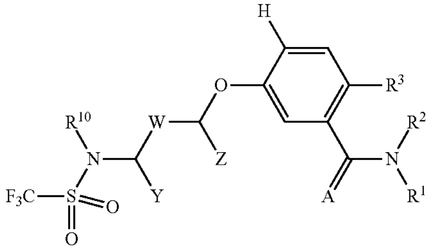

| Compound Number | Y | W | Z | $R^1$ | $R^2$ | $R^3$ | $R^{10}$ | A |
|---|---|---|---|---|---|---|---|---|
| D-11245 | H | single bond | Me | Me | H | Cl | H | O |
| D-11246 | Me | single bond | H | Me | H | Cl | H | O |
| D-11247 | Me(R) | single bond | H | Me | H | Cl | H | O |
| D-11248 | Me(S) | single bond | H | Me | H | Cl | H | O |
| D-11249 | H | single bond | Me | Me | H | Me | H | O |
| D-11250 | Me | single bond | H | Me | H | Me | H | O |
| D-11251 | Me(R) | single bond | H | Me | H | Me | H | O |
| D-11252 | Me(S) | single bond | H | Me | H | Me | H | O |
| D-11253 | H | single bond | Me | $CH_2CHF_2$ | H | Cl | H | O |
| D-11254 | Me | single bond | H | $CH_2CHF_2$ | H | Cl | H | O |
| D-11255 | Me(R) | single bond | H | $CH_2CHF_2$ | H | Cl | H | O |
| D-11256 | Me(S) | single bond | H | $CH_2CHF_2$ | H | Cl | H | O |
| D-11257 | H | single bond | Me | $CH_2CHF_2$ | H | Me | H | O |
| D-11258 | Me | single bond | H | $CH_2CHF_2$ | H | Me | H | O |
| D-11259 | Me(R) | single bond | H | $CH_2CHF_2$ | H | Me | H | O |
| D-11260 | Me(S) | single bond | H | $CH_2CHF_2$ | H | Me | H | O |
| D-11261 | H | single bond | Me | n-Pr | H | Cl | H | O |
| D-11262 | Me | single bond | H | n-Pr | H | Cl | H | O |
| D-11263 | Me(R) | single bond | H | n-Pr | H | Cl | H | O |
| D-11264 | Me(S) | single bond | H | n-Pr | H | Cl | H | O |

TABLE 902-continued

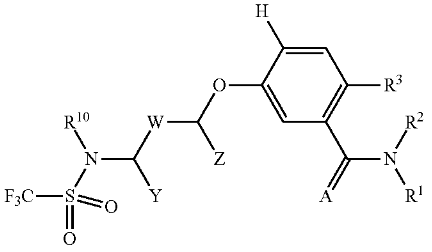

| Compound Number | Y | W | Z | $R^1$ | $R^2$ | $R^3$ | $R^{10}$ | A |
|---|---|---|---|---|---|---|---|---|
| D-11265 | H | single bond | Me | n-Pr | H | Me | H | O |
| D-11266 | Me | single bond | H | n-Pr | H | Me | H | O |
| D-11267 | Me(R) | single bond | H | n-Pr | H | Me | H | O |
| D-11268 | Me(S) | single bond | H | n-Pr | H | Me | H | O |
| D-11269 | H | single bond | Me | i-Pr | H | Cl | H | O |
| D-11270 | Me | single bond | H | i-Pr | H | Cl | H | O |
| D-11271 | Me(R) | single bond | H | i-Pr | H | Cl | H | O |
| D-11272 | Me(S) | single bond | H | i-Pr | H | Cl | H | O |
| D-11273 | H | single bond | Me | i-Pr | H | Me | H | O |
| D-11274 | Me | single bond | H | i-Pr | H | Me | H | O |
| D-11275 | Me(R) | single bond | H | i-Pr | H | Me | H | O |
| D-11276 | Me(S) | single bond | H | i-Pr | H | Me | H | O |
| D-11277 | H | single bond | Me | c-Pr(1-F) | H | Cl | H | O |
| D-11278 | Me | single bond | H | c-Pr(1-F) | H | Cl | H | O |
| D-11279 | Me(R) | single bond | H | c-Pr(1-F) | H | Cl | H | O |
| D-11280 | Me(S) | single bond | H | c-Pr(1-F) | H | Cl | H | O |
| D-11281 | H | single bond | Me | c-Pr(1-F) | H | Me | H | O |
| D-11282 | Me | single bond | H | c-Pr(1-F) | H | Me | H | O |

TABLE 903

| Compound Number | Y | W | Z | $R^1$ | $R^2$ | $R^3$ | $R^{10}$ | A |
|---|---|---|---|---|---|---|---|---|
| D-11283 | Me(R) | single bond | H | c-Pr(1-F) | H | Me | H | O |
| D-11284 | Me(S) | single bond | H | c-Pr(1-F) | H | Me | H | O |
| D-11285 | H | single bond | Me | c-Pr(2,2-$F_2$) | H | Cl | H | O |
| D-11286 | Me | single bond | H | c-Pr(2,2-$F_2$) | H | Cl | H | O |
| D-11287 | Me(R) | single bond | H | c-Pr(2,2-$F_2$) | H | Cl | H | O |
| D-11288 | Me(S) | single bond | H | c-Pr(2,2-$F_2$) | H | Cl | H | O |
| D-11289 | H | single bond | Me | c-Pr(2,2-$F_2$) | H | Me | H | O |
| D-11290 | Me | single bond | H | c-Pr(2,2-$F_2$) | H | Me | H | O |
| D-11291 | Me(R) | single bond | H | c-Pr(2,2-$F_2$) | H | Me | H | O |
| D-11292 | Me(S) | single bond | H | c-Pr(2,2-$F_2$) | H | Me | H | O |
| D-11293 | H | single bond | Me | c-Pr(1-Cl) | H | Cl | H | O |
| D-11294 | Me | single bond | H | c-Pr(1-Cl) | H | Cl | H | O |
| D-11295 | Me(R) | single bond | H | c-Pr(1-Cl) | H | Cl | H | O |
| D-11296 | Me(S) | single bond | H | c-Pr(1-Cl) | H | Cl | H | O |
| D-11297 | H | single bond | Me | c-Pr(1-Cl) | H | Me | H | O |
| D-11298 | Me | single bond | H | c-Pr(1-Cl) | H | Me | H | O |
| D-11299 | Me(R) | single bond | H | c-Pr(1-Cl) | H | Me | H | O |
| D-11300 | Me(S) | single bond | H | c-Pr(1-Cl) | H | Me | H | O |
| D-11301 | H | single bond | Me | c-Pr(1-Br) | H | Cl | H | O |
| D-11302 | Me | single bond | H | c-Pr(1-Br) | H | Cl | H | O |
| D-11303 | Me(R) | single bond | H | c-Pr(1-Br) | H | Cl | H | O |
| D-11304 | Me(S) | single bond | H | c-Pr(1-Br) | H | Cl | H | O |
| D-11305 | H | single bond | Me | c-Pr(1-Br) | H | Me | H | O |
| D-11306 | Me | single bond | H | c-Pr(1-Br) | H | Me | H | O |
| D-11307 | Me(R) | single bond | H | c-Pr(1-Br) | H | Me | H | O |
| D-11308 | Me(S) | single bond | H | c-Pr(1-Br) | H | Me | H | O |
| D-11309 | H | single bond | Me | c-Pr(1-Me) | H | Cl | H | O |
| D-11310 | Me | single bond | H | c-Pr(1-Me) | H | Cl | H | O |
| D-11311 | Me(R) | single bond | H | c-Pr(1-Me) | H | Cl | H | O |
| D-11312 | Me(S) | single bond | H | c-Pr(1-Me) | H | Cl | H | O |
| D-11313 | H | single bond | Me | c-Pr(1-Me) | H | Me | H | O |
| D-11314 | Me | single bond | H | c-Pr(1-Me) | H | Me | H | O |
| D-11315 | Me(R) | single bond | H | c-Pr(1-Me) | H | Me | H | O |
| D-11316 | Me(S) | single bond | H | c-Pr(1-Me) | H | Me | H | O |
| D-11317 | H | single bond | Me | c-Pr(1-$CH_2OH$) | H | Cl | H | O |
| D-11318 | Me | single bond | H | c-Pr(1-$CH_2OH$) | H | Cl | H | O |
| D-11319 | Me(R) | single bond | H | c-Pr(1-$CH_2OH$) | H | Cl | H | O |

TABLE 903-continued

| Compound Number | Y | W | Z | $R^1$ | $R^2$ | $R^3$ | $R^{10}$ | A |
|---|---|---|---|---|---|---|---|---|
| D-11320 | Me(S) | single bond | H | c-Pr(1-$CH_2$OH) | H | Cl | H | O |
| D-11321 | H | single bond | Me | c-Pr(1-$CH_2$OH) | H | Me | H | O |
| D-11322 | Me | single bond | H | c-Pr(1-$CH_2$OH) | H | Me | H | O |
| D-11323 | Me(R) | single bond | H | c-Pr(1-$CH_2$OH) | H | Me | H | O |
| D-11324 | Me(S) | single bond | H | c-Pr(1-$CH_2$OH) | H | Me | H | O |
| D-11325 | H | single bond | Me | c-Pr[1-$CH_2$OS(=O)$_2$Me] | H | Cl | H | O |
| D-11326 | Me | single bond | H | c-Pr[1-$CH_2$OS(=O)$_2$Me] | H | Cl | H | O |

TABLE 904

| Compound Number | Y | W | Z | $R^1$ | $R^2$ | $R^3$ | $R^{10}$ | A |
|---|---|---|---|---|---|---|---|---|
| D-11327 | Me(R) | single bond | H | c-Pr[1-$CH_2$OS(=O)$_2$Me] | H | Cl | H | O |
| D-11328 | Me(S) | single bond | H | c-Pr[1-$CH_2$OS(=O)$_2$Me] | H | Cl | H | O |
| D-11329 | H | single bond | Me | c-Pr[1-$CH_2$OS(=O)$_2$Me] | H | Me | H | O |
| D-11330 | Me | single bond | H | c-Pr[1-$CH_2$OS(=O)$_2$Me] | H | Me | H | O |
| D-11331 | Me(R) | single bond | H | c-Pr[1-$CH_2$OS(=O)$_2$Me] | H | Me | H | O |
| D-11332 | Me(S) | single bond | H | c-Pr[1-$CH_2$OS(=O)$_2$Me] | H | Me | H | O |
| D-11333 | H | single bond | Me | c-Pr(1-$CH_2$OMe) | H | Cl | H | O |
| D-11334 | Me | single bond | H | c-Pr(1-$CH_2$OMe) | H | Cl | H | O |
| D-11335 | Me(R) | single bond | H | c-Pr(1-$CH_2$OMe) | H | Cl | H | O |
| D-11336 | Me(S) | single bond | H | c-Pr(1-$CH_2$OMe) | H | Cl | H | O |
| D-11337 | H | single bond | Me | c-Pr(1-$CH_2$OMe) | H | Me | H | O |
| D-11338 | Me | single bond | H | c-Pr(1-$CH_2$OMe) | H | Me | H | O |
| D-11339 | Me(R) | single bond | H | c-Pr(1-$CH_2$OMe) | H | Me | H | O |
| D-11340 | Me(S) | single bond | H | c-Pr(1-$CH_2$OMe) | H | Me | H | O |
| D-11341 | H | single bond | Me | c-Pr(1-$CH_2$OMe) | H | Cl | H | O |
| D-11342 | Me | single bond | H | c-Pr(1-$CH_2$OMe) | H | Cl | H | O |
| D-11343 | Me(R) | single bond | H | c-Pr(1-$CH_2$OMe) | H | Cl | H | O |
| D-11344 | Me(S) | single bond | H | c-Pr(1-$CH_2$OMe) | H | Cl | H | O |
| D-11345 | H | single bond | Me | c-Pr(1-$CH_2$OMe) | H | Me | H | O |
| D-11346 | Me | single bond | H | c-Pr(1-$CH_2$OMe) | H | Me | H | O |
| D-11347 | Me(R) | single bond | H | c-Pr(1-$CH_2$OMe) | H | Me | H | O |
| D-11348 | Me(S) | single bond | H | c-Pr(1-$CH_2$OMe) | H | Me | H | O |
| D-11349 | H | single bond | Me | c-Pr(1-$CH_2$OMe) | H | Cl | H | O |
| D-11350 | Me | single bond | H | c-Pr(1-$CH_2$OMe) | H | Cl | H | O |
| D-11351 | Me(R) | single bond | H | c-Pr(1-$CH_2$OMe) | H | Cl | H | O |
| D-11352 | Me(S) | single bond | H | c-Pr(1-$CH_2$OMe) | H | Cl | H | O |
| D-11353 | H | single bond | Me | c-Pr(1-$CH_2$OMe) | H | Me | H | O |
| D-11354 | Me | single bond | H | c-Pr(1-$CH_2$OMe) | H | Me | H | O |
| D-11355 | Me(R) | single bond | H | c-Pr(1-$CH_2$OMe) | H | Me | H | O |
| D-11356 | Me(S) | single bond | H | c-Pr(1-$CH_2$OMe) | H | Me | H | O |
| D-11357 | H | single bond | Me | c-Pr[1-$CH_2$S(=O)Me] | H | Cl | H | O |
| D-11358 | Me | single bond | H | c-Pr[1-$CH_2$S(=O)Me] | H | Cl | H | O |
| D-11359 | Me(R) | single bond | H | c-Pr[1-$CH_2$S(=O)Me] | H | Cl | H | O |
| D-11360 | Me(S) | single bond | H | c-Pr[1-$CH_2$S(=O)Me] | H | Cl | H | O |
| D-11361 | H | single bond | Me | c-Pr[1-$CH_2$S(=O)Me] | H | Me | H | O |
| D-11362 | Me | single bond | H | c-Pr[1-$CH_2$S(=O)Me] | H | Me | H | O |
| D-11363 | Me(R) | single bond | H | c-Pr[1-$CH_2$S(=O)Me] | H | Me | H | O |
| D-11364 | Me(S) | single bond | H | c-Pr[1-$CH_2$S(=O)Me] | H | Me | H | O |
| D-11365 | H | single bond | Me | c-Pr[1-$CH_2$S(=O)$_2$Me] | H | Cl | H | O |
| D-11366 | Me | single bond | H | c-Pr[1-$CH_2$S(=O)$_2$Me] | H | Cl | H | O |
| D-11367 | Me(R) | single bond | H | c-Pr[1-$CH_2$S(=O)$_2$Me] | H | Cl | H | O |
| D-11368 | Me(S) | single bond | H | c-Pr[1-$CH_2$S(=O)$_2$Me] | H | Cl | H | O |
| D-11369 | H | single bond | Me | c-Pr[1-$CH_2$S(=O)$_2$Me] | H | Me | H | O |
| D-11370 | Me | single bond | H | c-Pr[1-$CH_2$S(=O)$_2$Me] | H | Me | H | O |

TABLE 905

| Compound Number | Y | W | Z | $R^1$ | $R^2$ | $R^3$ | $R^{10}$ | A |
|---|---|---|---|---|---|---|---|---|
| D-11371 | Me(R) | single bond | H | c-Pr[1-$CH_2$S(=O)$_2$Me] | H | Me | H | O |
| D-11372 | Me(S) | single bond | H | c-Pr[1-$CH_2$S(=O)$_2$Me] | H | Me | H | O |
| D-11373 | H | single bond | Me | c-Pr(1-$CH_2$F) | H | Cl | H | O |
| D-11374 | Me | single bond | H | c-Pr(1-$CH_2$F) | H | Cl | H | O |
| D-11375 | Me(R) | single bond | H | c-Pr(1-$CH_2$F) | H | Cl | H | O |

TABLE 905-continued

| Compound Number | Y | W | Z | $R^1$ | $R^2$ | $R^3$ | $R^{10}$ | A |
|---|---|---|---|---|---|---|---|---|
| D-11376 | Me(S) | single bond | H | c-Pr(1-$CH_2F$) | H | Cl | H | O |
| D-11377 | H | single bond | Me | c-Pr(1-$CH_2F$) | H | Me | H | O |
| D-11378 | Me | single bond | H | c-Pr(1-$CH_2F$) | H | Me | H | O |
| D-11379 | Me(R) | single bond | H | c-Pr(1-$CH_2F$) | H | Me | H | O |
| D-11380 | Me(S) | single bond | H | c-Pr(1-$CH_2F$) | H | Me | H | O |
| D-11381 | H | single bond | Me | c-Pr(1-$CHF_2$) | H | Cl | H | O |
| D-11382 | Me | single bond | H | c-Pr(1-$CHF_2$) | H | Cl | H | O |
| D-11383 | Me(R) | single bond | H | c-Pr(1-$CHF_2$) | H | Cl | H | O |
| D-11384 | Me(S) | single bond | H | c-Pr(1-$CHF_2$) | H | Cl | H | O |
| D-11385 | H | single bond | Me | c-Pr(1-$CHF_2$) | H | Me | H | O |
| D-11386 | Me | single bond | H | c-Pr(1-$CHF_2$) | H | Me | H | O |
| D-11387 | Me(R) | single bond | H | c-Pr(1-$CHF_2$) | H | Me | H | O |
| D-11388 | Me(S) | single bond | H | c-Pr(1-$CHF_2$) | H | Me | H | O |
| D-11389 | H | single bond | Me | c-Pr(1-$CF_3$) | H | Cl | H | O |
| D-11390 | Me | single bond | H | c-Pr(1-$CF_3$) | H | Cl | H | O |
| D-11391 | Me(R) | single bond | H | c-Pr(1-$CF_3$) | H | Cl | H | O |
| D-11392 | Me(S) | single bond | H | c-Pr(1-$CF_3$) | H | Cl | H | O |
| D-11393 | H | single bond | Me | c-Pr(1-$CF_3$) | H | Me | H | O |
| D-11394 | Me | single bond | H | c-Pr(1-$CF_3$) | H | Me | H | O |
| D-11395 | Me(R) | single bond | H | c-Pr(1-$CF_3$) | H | Me | H | O |
| D-11396 | Me(S) | single bond | H | c-Pr(1-$CF_3$) | H | Me | H | O |
| D-11397 | H | single bond | Me | c-Pr(1-C≡CH) | H | Cl | H | O |
| D-11398 | Me | single bond | H | c-Pr(1-C≡CH) | H | Cl | H | O |
| D-11399 | Me(R) | single bond | H | c-Pr(1-C≡CH) | H | Cl | H | O |
| D-11400 | Me(S) | single bond | H | c-Pr(1-C≡CH) | H | Cl | H | O |
| D-11401 | H | single bond | Me | c-Pr(1-C≡CH) | H | Me | H | O |
| D-11402 | Me | single bond | H | c-Pr(1-C≡CH) | H | Me | H | O |
| D-11403 | Me(R) | single bond | H | c-Pr(1-C≡CH) | H | Me | H | O |
| D-11404 | Me(S) | single bond | H | c-Pr(1-C≡CH) | H | Me | H | O |
| D-11405 | H | single bond | Me | c-Pr[1-C(═O)OEt] | H | Cl | H | O |
| D-11406 | Me | single bond | H | c-Pr[1-C(═O)OEt] | H | Cl | H | O |
| D-11407 | Me(R) | single bond | H | c-Pr[1-C(═O)OEt] | H | Cl | H | O |
| D-11408 | Me(S) | single bond | H | c-Pr[1-C(═O)OEt] | H | Cl | H | O |
| D-11409 | H | single bond | Me | c-Pr[1-C(═O)OEt] | H | Me | H | O |
| D-11410 | Me | single bond | H | c-Pr[1-C(═O)OEt] | H | Me | H | O |
| D-11411 | Me(R) | single bond | H | c-Pr[1-C(═O)OEt] | H | Me | H | O |
| D-11412 | Me(S) | single bond | H | c-Pr[1-C(═O)OEt] | H | Me | H | O |
| D-11413 | H | single bond | Me | c-Pr[1-C(═O)OH] | H | Cl | H | O |
| D-11414 | Me | single bond | H | c-Pr[1-C(═O)OH] | H | Cl | H | O |

TABLE 906

| Compound Number | Y | W | Z | $R^1$ | $R^2$ | $R^3$ | $R^{10}$ | A |
|---|---|---|---|---|---|---|---|---|
| D-11415 | Me(R) | single bond | H | c-Pr[1-C(═O)OH] | H | Cl | H | O |
| D-11416 | Me(S) | single bond | H | c-Pr[1-C(═O)OH] | H | Cl | H | O |
| D-11417 | H | single bond | Me | c-Pr[1-C(═O)OH] | H | Me | H | O |
| D-11418 | Me | single bond | H | c-Pr[1-C(═O)OH] | H | Me | H | O |
| D-11419 | Me(R) | single bond | H | c-Pr[1-C(═O)OH] | H | Me | H | O |
| D-11420 | Me(S) | single bond | H | c-Pr[1-C(═O)OH] | H | Me | H | O |
| D-11421 | H | single bond | Me | c-Pr[1-C(═O)$NH_2$] | H | Cl | H | O |
| D-11422 | Me | single bond | H | c-Pr[1-C(═O)$NH_2$] | H | Cl | H | O |
| D-11423 | Me(R) | single bond | H | c-Pr[1-C(═O)$NH_2$] | H | Cl | H | O |
| D-11424 | Me(S) | single bond | H | c-Pr[1-C(═O)$NH_2$] | H | Cl | H | O |
| D-11425 | H | single bond | Me | c-Pr[1-C(═O)$NH_2$] | H | Me | H | O |
| D-11426 | Me | single bond | H | c-Pr[1-C(═O)$NH_2$] | H | Me | H | O |
| D-11427 | Me(R) | single bond | H | c-Pr[1-C(═O)$NH_2$] | H | Me | H | O |
| D-11428 | Me(S) | single bond | H | c-Pr[1-C(═O)$NH_2$] | H | Me | H | O |
| D-11429 | H | single bond | Me | c-Pr(1-OMe) | H | Cl | H | O |
| D-11430 | Me | single bond | H | c-Pr(1-OMe) | H | Cl | H | O |
| D-11431 | Me(R) | single bond | H | c-Pr(1-OMe) | H | Cl | H | O |
| D-11432 | Me(S) | single bond | H | c-Pr(1-OMe) | H | Cl | H | O |
| D-11433 | H | single bond | Me | c-Pr(1-OMe) | H | Me | H | O |
| D-11434 | Me | single bond | H | c-Pr(1-OMe) | H | Me | H | O |
| D-11435 | Me(R) | single bond | H | c-Pr(1-OMe) | H | Me | H | O |
| D-11436 | Me(S) | single bond | H | c-Pr(1-OMe) | H | Me | H | O |
| D-11437 | H | single bond | Me | c-Pr(1-SMe) | H | Cl | H | O |
| D-11438 | Me | single bond | H | c-Pr(1-SMe) | H | Cl | H | O |
| D-11439 | Me(R) | single bond | H | c-Pr(1-SMe) | H | Cl | H | O |
| D-11440 | Me(S) | single bond | H | c-Pr(1-SMe) | H | Cl | H | O |
| D-11441 | H | single bond | Me | c-Pr(1-SMe) | H | Me | H | O |
| D-11442 | Me | single bond | H | c-Pr(1-SMe) | H | Me | H | O |

TABLE 906-continued

| Compound Number | Y | W | Z | $R^1$ | $R^2$ | $R^3$ | $R^{10}$ | A |
|---|---|---|---|---|---|---|---|---|
| D-11443 | Me(R) | single bond | H | c-Pr(1-SMe) | H | Me | H | O |
| D-11444 | Me(S) | single bond | H | c-Pr(1-SMe) | H | Me | H | O |
| D-11445 | H | single bond | Me | c-Pr[1-S(═O)Me] | H | Cl | H | O |
| D-11446 | Me | single bond | H | c-Pr[1-S(═O)Me] | H | Cl | H | O |
| D-11447 | Me(R) | single bond | H | c-Pr[1-S(═O)Me] | H | Cl | H | O |
| D-11448 | Me(S) | single bond | H | c-Pr[1-S(═O)Me] | H | Cl | H | O |
| D-11449 | H | single bond | Me | c-Pr[1-S(═O)Me] | H | Me | H | O |
| D-11450 | Me | single bond | H | c-Pr[1-S(═O)Me] | H | Me | H | O |
| D-11451 | Me(R) | single bond | H | c-Pr[1-S(═O)Me] | H | Me | H | O |
| D-11452 | Me(S) | single bond | H | c-Pr[1-S(═O)Me] | H | Me | H | O |
| D-11453 | H | single bond | Me | c-Pr[1-S(═O)$_2$Me] | H | Cl | H | O |
| D-11454 | Me | single bond | H | c-Pr[1-S(═O)$_2$Me] | H | Cl | H | O |
| D-11455 | Me(R) | single bond | H | c-Pr[1-S(═O)$_2$Me] | H | Cl | H | O |
| D-11456 | Me(S) | single bond | H | c-Pr[1-S(═O)$_2$Me] | H | Cl | H | O |
| D-11457 | H | single bond | Me | c-Pr[1-S(═O)$_2$Me] | H | Me | H | O |
| D-11458 | Me | single bond | H | c-Pr[1-S(═O)$_2$Me] | H | Me | H | O |

TABLE 907

| Compound Number | Y | W | Z | $R^1$ | $R^2$ | $R^3$ | $R^{10}$ | A |
|---|---|---|---|---|---|---|---|---|
| D-11459 | Me(R) | single bond | H | c-Pr[1-S(═O)$_2$Me] | H | Me | H | O |
| D-11460 | Me(S) | single bond | H | c-Pr[1-S(═O)$_2$Me] | H | Me | H | O |
| D-11461 | H | single bond | Me | c-Pr[1-S(═O)$_2$CHF$_2$] | H | Cl | H | O |
| D-11462 | Me | single bond | H | c-Pr[1-S(═O)$_2$CHF$_2$] | H | Cl | H | O |
| D-11463 | Me(R) | single bond | H | c-Pr[1-S(═O)$_2$CHF$_2$] | H | Cl | H | O |
| D-11464 | Me(S) | single bond | H | c-Pr[1-S(═O)$_2$CHF$_2$] | H | Cl | H | O |
| D-11465 | H | single bond | Me | c-Pr[1-S(═O)$_2$CHF$_2$] | H | Me | H | O |
| D-11466 | Me | single bond | H | c-Pr[1-S(═O)$_2$CHF$_2$] | H | Me | H | O |
| D-11467 | Me(R) | single bond | H | c-Pr[1-S(═O)$_2$CHF$_2$] | H | Me | H | O |
| D-11468 | Me(S) | single bond | H | c-Pr[1-S(═O)$_2$CHF$_2$] | H | Me | H | O |
| D-11469 | H | single bond | Me | c-Pr[1-S(═O)$_2$CF$_3$] | H | Cl | H | O |
| D-11470 | Me | single bond | H | c-Pr[1-S(═O)$_2$CF$_3$] | H | Cl | H | O |
| D-11471 | Me(R) | single bond | H | c-Pr[1-S(═O)$_2$CF$_3$] | H | Cl | H | O |
| D-11472 | Me(S) | single bond | H | c-Pr[1-S(═O)$_2$CF$_3$] | H | Cl | H | O |
| D-11473 | H | single bond | Me | c-Pr[1-S(═O)$_2$CF$_3$] | H | Me | H | O |
| D-11474 | Me | single bond | H | c-Pr[1-S(═O)$_2$CF$_3$] | H | Me | H | O |
| D-11475 | Me(R) | single bond | H | c-Pr[1-S(═O)$_2$CF$_3$] | H | Me | H | O |
| D-11476 | Me(S) | single bond | H | c-Pr[1-S(═O)$_2$CF$_3$] | H | Me | H | O |
| D-11477 | H | single bond | Me | c-Pr[1-(5,6-dihydro-1,4,2-dioxazin-3-yl)] | H | Cl | H | O |
| D-11478 | Me | single bond | H | c-Pr[1-(5,6-dihydro-1,4,2-dioxazin-3-yl)] | H | Cl | H | O |
| D-11479 | Me(R) | single bond | H | c-Pr[1-(5,6-dihydro-1,4,2-dioxazin-3-yl)] | H | Cl | H | O |
| D-11480 | Me(S) | single bond | H | c-Pr[1-(5,6-dihydro-1,4,2-dioxazin-3-yl)] | H | Cl | H | O |
| D-11481 | H | single bond | Me | c-Pr[1-(5,6-dihydro-1,4,2-dioxazin-3-yl)] | H | Me | H | O |
| D-11482 | Me | single bond | H | c-Pr[1-(5,6-dihydro-1,4,2-dioxazin-3-yl)] | H | Me | H | O |
| D-11483 | Me(R) | single bond | H | c-Pr[1-(5,6-dihydro-1,4,2-dioxazin-3-yl)] | H | Me | H | O |
| D-11484 | Me(S) | single bond | H | c-Pr[1-(5,6-dihydro-1,4,2-dioxazin-3-yl)] | H | Me | H | O |
| D-11485 | H | single bond | Me | c-Pr[1-(5-hydroxy-1,3,4-oxadiazol-2-yl)] | H | Cl | H | O |
| D-11486 | Me | single bond | H | c-Pr[1-(5-hydroxy-1,3,4-oxadiazol-2-yl)] | H | Cl | H | O |
| D-11487 | Me(R) | single bond | H | c-Pr[1-(5-hydroxy-1,3,4-oxadiazol-2-yl)] | H | Cl | H | O |
| D-11488 | Me(S) | single bond | H | c-Pr[1-(5-hydroxy-1,3,4-oxadiazol-2-yl)] | H | Cl | H | O |
| D-11489 | H | single bond | Me | c-Pr[1-(5-hydroxy-1,3,4-oxadiazol-2-yl)] | H | Me | H | O |
| D-11490 | Me | single bond | H | c-Pr[1-(5-hydroxy-1,3,4-oxadiazol-2-yl)] | H | Me | H | O |
| D-11491 | Me(R) | single bond | H | c-Pr[1-(5-hydroxy-1,3,4-oxadiazol-2-yl)] | H | Me | H | O |
| D-11492 | Me(S) | single bond | H | c-Pr[1-(5-hydroxy-1,3,4-oxadiazol-2-yl)] | H | Me | H | O |
| D-11493 | H | single bond | Me | c-Pr[1-(pyrimidin-2-yl)] | H | Cl | H | O |
| D-11494 | Me | single bond | H | c-Pr[1-(pyrimidin-2-yl)] | H | Cl | H | O |
| D-11495 | Me(R) | single bond | H | c-Pr[1-(pyrimidin-2-yl)] | H | Cl | H | O |
| D-11496 | Me(S) | single bond | H | c-Pr[1-(pyrimidin-2-yl)] | H | Cl | H | O |
| D-11497 | H | single bond | Me | c-Pr[1-(pyrimidin-2-yl)] | H | Me | H | O |
| D-11498 | Me | single bond | H | c-Pr[1-(pyrimidin-2-yl)] | H | Me | H | O |
| D-11499 | Me(R) | single bond | H | c-Pr[1-(pyrimidin-2-yl)] | H | Me | H | O |
| D-11500 | Me(S) | single bond | H | c-Pr[1-(pyrimidin-2-yl)] | H | Me | H | O |
| D-11501 | H | single bond | Me | t-Bu | H | Cl | H | O |
| D-11502 | Me | single bond | H | t-Bu | H | Cl | H | O |

TABLE 908

| Compound Number | Y | W | Z | $R^1$ | $R^2$ | $R^3$ | $R^{10}$ | A |
|---|---|---|---|---|---|---|---|---|
| D-11503 | Me(R) | single bond | H | t-Bu | H | Cl | H | O |
| D-11504 | Me(S) | single bond | H | t-Bu | H | Cl | H | O |
| D-11505 | H | single bond | Me | t-Bu | H | Me | H | O |
| D-11506 | Me | single bond | H | t-Bu | H | Me | H | O |
| D-11507 | Me(R) | single bond | H | t-Bu | H | Me | H | O |
| D-11508 | Me(S) | single bond | H | t-Bu | H | Me | H | O |
| D-11509 | H | single bond | Me | c-Bu | H | Cl | H | O |
| D-11510 | Me | single bond | H | c-Bu | H | Cl | H | O |
| D-11511 | Me(R) | single bond | H | c-Bu | H | Cl | H | O |
| D-11512 | Me(S) | single bond | H | c-Bu | H | Cl | H | O |
| D-11513 | H | single bond | Me | c-Bu | H | Me | H | O |
| D-11514 | Me | single bond | H | c-Bu | H | Me | H | O |
| D-11515 | Me(R) | single bond | H | c-Bu | H | Me | H | O |
| D-11516 | Me(S) | single bond | H | c-Bu | H | Me | H | O |
| D-11517 | H | single bond | Me | c-Bu(1-CN) | H | Cl | H | O |
| D-11518 | Me | single bond | H | c-Bu(1-CN) | H | Cl | H | O |
| D-11519 | Me(R) | single bond | H | c-Bu(1-CN) | H | Cl | H | O |
| D-11520 | Me(S) | single bond | H | c-Bu(1-CN) | H | Cl | H | O |
| D-11521 | H | single bond | Me | c-Bu(1-CN) | H | Me | H | O |
| D-11522 | Me | single bond | H | c-Bu(1-CN) | H | Me | H | O |
| D-11523 | Me(R) | single bond | H | c-Bu(1-CN) | H | Me | H | O |
| D-11524 | Me(S) | single bond | H | c-Bu(1-CN) | H | Me | H | O |
| D-11525 | H | single bond | Me | c-Bu(3,3-$F_2$) | H | Cl | H | O |
| D-11526 | Me | single bond | H | c-Bu(3,3-$F_2$) | H | Cl | H | O |
| D-11527 | Me(R) | single bond | H | c-Bu(3,3-$F_2$) | H | Cl | H | O |
| D-11528 | Me(S) | single bond | H | c-Bu(3,3-$F_2$) | H | Cl | H | O |
| D-11529 | H | single bond | Me | c-Bu(3,3-$F_2$) | H | Me | H | O |
| D-11530 | Me | single bond | H | c-Bu(3,3-$F_2$) | H | Me | H | O |
| D-11531 | Me(R) | single bond | H | c-Bu(3,3-$F_2$) | H | Me | H | O |
| D-11532 | Me(S) | single bond | H | c-Bu(3,3-$F_2$) | H | Me | H | O |
| D-11533 | H | single bond | Me | oxetan-3-yl | H | Cl | H | O |
| D-11534 | Me | single bond | H | oxetan-3-yl | H | Cl | H | O |
| D-11535 | Me(R) | single bond | H | oxetan-3-yl | H | Cl | H | O |
| D-11536 | Me(S) | single bond | H | oxetan-3-yl | H | Cl | H | O |
| D-11537 | H | single bond | Me | oxetan-3-yl | H | Me | H | O |
| D-11538 | Me | single bond | H | oxetan-3-yl | H | Me | H | O |
| D-11539 | Me(R) | single bond | H | oxetan-3-yl | H | Me | H | O |
| D-11540 | Me(S) | single bond | H | oxetan-3-yl | H | Me | H | O |
| D-11541 | H | single bond | Me | oxetan(3-CN)-3-yl | H | Cl | H | O |
| D-11542 | Me | single bond | H | oxetan(3-CN)-3-yl | H | Cl | H | O |
| D-11543 | Me(R) | single bond | H | oxetan(3-CN)-3-yl | H | Cl | H | O |
| D-11544 | Me(S) | single bond | H | oxetan(3-CN)-3-yl | H | Cl | H | O |
| D-11545 | H | single bond | Me | oxetan(3-CN)-3-yl | H | Me | H | O |
| D-11546 | Me | single bond | H | oxetan(3-CN)-3-yl | H | Me | H | O |

TABLE 909

| Compound Number | Y | W | Z | $R^1$ | $R^2$ | $R^3$ | $R^{10}$ | A |
|---|---|---|---|---|---|---|---|---|
| D-11547 | Me(R) | single bond | H | oxetan(3-CN)-3-yl | H | Me | H | O |
| D-11548 | Me(S) | single bond | H | oxetan(3-CN)-3-yl | H | Me | H | O |
| D-11549 | H | single bond | Me | azetidin[1-C(═O)Me]-3-yl | H | Cl | H | O |
| D-11550 | Me | single bond | H | azetidin[1-C(═O)Me]-3-yl | H | Cl | H | O |
| D-11551 | Me(R) | single bond | H | azetidin[1-C(═O)Me]-3-yl | H | Cl | H | O |
| D-11552 | Me(S) | single bond | H | azetidin[1-C(═O)Me]-3-yl | H | Cl | H | O |
| D-11553 | H | single bond | Me | azetidin[1-C(═O)Me]-3-yl | H | Me | H | O |
| D-11554 | Me | single bond | H | azetidin[1-C(═O)Me]-3-yl | H | Me | H | O |
| D-11555 | Me(R) | single bond | H | azetidin[1-C(═O)Me]-3-yl | H | Me | H | O |
| D-11556 | Me(S) | single bond | H | azetidin[1-C(═O)Me]-3-yl | H | Me | H | O |
| D-11557 | H | single bond | Me | azetidin[1-S(═O)$_2$Me]-3-yl | H | Cl | H | O |
| D-11558 | Me | single bond | H | azetidin[1-S(═O)$_2$Me]-3-yl | H | Cl | H | O |
| D-11559 | Me(R) | single bond | H | azetidin[1-S(═O)$_2$Me]-3-yl | H | Cl | H | O |
| D-11560 | Me(S) | single bond | H | azetidin[1-S(═O)$_2$Me]-3-yl | H | Cl | H | O |
| D-11561 | H | single bond | Me | azetidin[1-S(═O)$_2$Me]-3-yl | H | Me | H | O |
| D-11562 | Me | single bond | H | azetidin[1-S(═O)$_2$Me]-3-yl | H | Me | H | O |
| D-11563 | Me(R) | single bond | H | azetidin[1-S(═O)$_2$Me]-3-yl | H | Me | H | O |
| D-11564 | Me(S) | single bond | H | azetidin[1-S(═O)$_2$Me]-3-yl | H | Me | H | O |
| D-11565 | H | single bond | Me | azetidin[1-S(═O)$_2$CHF$_2$]-3-yl | H | Cl | H | O |
| D-11566 | Me | single bond | H | azetidin[1-S(═O)$_2$CHF$_2$]-3-yl | H | Cl | H | O |
| D-11567 | Me(R) | single bond | H | azetidin[1-S(═O)$_2$CHF$_2$]-3-yl | H | Cl | H | O |
| D-11568 | Me(S) | single bond | H | azetidin[1-S(═O)$_2$CHF$_2$]-3-yl | H | Cl | H | O |
| D-11569 | H | single bond | Me | azetidin[1-S(═O)$_2$CHF$_2$]-3-yl | H | Me | H | O |

TABLE 909-continued

| Compound Number | Y | W | Z | $R^1$ | $R^2$ | $R^3$ | $R^{10}$ | A |
|---|---|---|---|---|---|---|---|---|
| D-11570 | Me | single bond | H | azetidin[1-S(=O)$_2$CHF$_2$]-3-yl | H | Me | H | O |
| D-11571 | Me(R) | single bond | H | azetidin[1-S(=O)$_2$CHF$_2$]-3-yl | H | Me | H | O |
| D-11572 | Me(S) | single bond | H | azetidin[1-S(=O)$_2$CHF$_2$]-3-yl | H | Me | H | O |
| D-11573 | H | single bond | Me | c-Pen | H | Cl | H | O |
| D-11574 | Me | single bond | H | c-Pen | H | Cl | H | O |
| D-11575 | Me(R) | single bond | H | c-Pen | H | Cl | H | O |
| D-11576 | Me(S) | single bond | H | c-Pen | H | Cl | H | O |
| D-11577 | H | single bond | Me | c-Pen | H | Me | H | O |
| D-11578 | Me | single bond | H | c-Pen | H | Me | H | O |
| D-11579 | Me(R) | single bond | H | c-Pen | H | Me | H | O |
| D-11580 | Me(S) | single bond | H | c-Pen | H | Me | H | O |
| D-11581 | H | single bond | Me | tetrahydrofuran-3-yl | H | Cl | H | O |
| D-11582 | Me | single bond | H | tetrahydrofuran-3-yl | H | Cl | H | O |
| D-11583 | Me(R) | single bond | H | tetrahydrofuran-3-yl | H | Cl | H | O |
| D-11584 | Me(S) | single bond | H | tetrahydrofuran-3-yl | H | Cl | H | O |
| D-11585 | H | single bond | Me | tetrahydrofuran-3-yl | H | Me | H | O |
| D-11586 | Me | single bond | H | tetrahydrofuran-3-yl | H | Me | H | O |
| D-11587 | Me(R) | single bond | H | tetrahydrofuran-3-yl | H | Me | H | O |
| D-11588 | Me(S) | single bond | H | tetrahydrofuran-3-yl | H | Me | H | O |
| D-11589 | H | single bond | Me | tetrahydrothiophen-3-yl | H | Cl | H | O |
| D-11590 | Me | single bond | H | tetrahydrothiophen-3-yl | H | Cl | H | O |

TABLE 910

| Compound Number | Y | W | Z | $R^1$ | $R^2$ | $R^3$ | $R^{10}$ | A |
|---|---|---|---|---|---|---|---|---|
| D-11591 | Me(R) | single bond | H | tetrahydrothiophen-3-yl | H | Cl | H | O |
| D-11592 | Me(S) | single bond | H | tetrahydrothiophen-3-yl | H | Cl | H | O |
| D-11593 | H | single bond | Me | tetrahydrothiophen-3-yl | H | Me | H | O |
| D-11594 | Me | single bond | H | tetrahydrothiophen-3-yl | H | Me | H | O |
| D-11595 | Me(R) | single bond | H | tetrahydrothiophen-3-yl | H | Me | H | O |
| D-11596 | Me(S) | single bond | H | tetrahydrothiophen-3-yl | H | Me | H | O |
| D-11597 | H | single bond | Me | c-Pen(1-CN) | H | Cl | H | O |
| D-11598 | Me | single bond | H | c-Pen(1-CN) | H | Cl | H | O |
| D-11599 | Me(R) | single bond | H | c-Pen(1-CN) | H | Cl | H | O |
| D-11600 | Me(S) | single bond | H | c-Pen(1-CN) | H | Cl | H | O |
| D-11601 | H | single bond | Me | c-Pen(1-CN) | H | Me | H | O |
| D-11602 | Me | single bond | H | c-Pen(1-CN) | H | Me | H | O |
| D-11603 | Me(R) | single bond | H | c-Pen(1-CN) | H | Me | H | O |
| D-11604 | Me(S) | single bond | H | c-Pen(1-CN) | H | Me | H | O |
| D-11605 | H | single bond | Me | tetrahydrofuran(3-CN)-3-yl | H | Cl | H | O |
| D-11606 | Me | single bond | H | tetrahydrofuran(3-CN)-3-yl | H | Cl | H | O |
| D-11607 | Me(R) | single bond | H | tetrahydrofuran(3-CN)-3-yl | H | Cl | H | O |
| D-11608 | Me(S) | single bond | H | tetrahydrofuran(3-CN)-3-yl | H | Cl | H | O |
| D-11609 | H | single bond | Me | tetrahydrofuran(3-CN)-3-yl | H | Me | H | O |
| D-11610 | Me | single bond | H | tetrahydrofuran(3-CN)-3-yl | H | Me | H | O |
| D-11611 | Me(R) | single bond | H | tetrahydrofuran(3-CN)-3-yl | H | Me | H | O |
| D-11612 | Me(S) | single bond | H | tetrahydrofuran(3-CN)-3-yl | H | Me | H | O |
| D-11613 | H | single bond | Me | tetrahydrothiophen(3-CN)-3-yl | H | Cl | H | O |
| D-11614 | Me | single bond | H | tetrahydrothiophen(3-CN)-3-yl | H | Cl | H | O |
| D-11615 | Me(R) | single bond | H | tetrahydrothiophen(3-CN)-3-yl | H | Cl | H | O |
| D-11616 | Me(S) | single bond | H | tetrahydrothiophen(3-CN)-3-yl | H | Cl | H | O |
| D-11617 | H | single bond | Me | tetrahydrothiophen(3-CN)-3-yl | H | Me | H | O |
| D-11618 | Me | single bond | H | tetrahydrothiophen(3-CN)-3-yl | H | Me | H | O |
| D-11619 | Me(R) | single bond | H | tetrahydrothiophen(3-CN)-3-yl | H | Me | H | O |
| D-11620 | Me(S) | single bond | H | tetrahydrothiophen(3-CN)-3-yl | H | Me | H | O |
| D-11621 | H | single bond | Me | bicyclo[1.1.1]pentan-1-yl | H | Cl | H | O |
| D-11622 | Me | single bond | H | bicyclo[1.1.1]pentan-1-yl | H | Cl | H | O |
| D-11623 | Me(R) | single bond | H | bicyclo[1.1.1]pentan-1-yl | H | Cl | H | O |
| D-11624 | Me(S) | single bond | H | bicyclo[1.1.1]pentan-1-yl | H | Cl | H | O |
| D-11625 | H | single bond | Me | bicyclo[1.1.1]pentan-1-yl | H | Me | H | O |
| D-11626 | Me | single bond | H | bicyclo[1.1.1]pentan-1-yl | H | Me | H | O |
| D-11627 | Me(R) | single bond | H | bicyclo[1.1.1]pentan-1-yl | H | Me | H | O |
| D-11628 | Me(S) | single bond | H | bicyclo[1.1.1]pentan-1-yl | H | Me | H | O |
| D-11629 | H | single bond | Me | c-Hex | H | Cl | H | O |
| D-11630 | Me | single bond | H | c-Hex | H | Cl | H | O |
| D-11631 | Me(R) | single bond | H | c-Hex | H | Cl | H | O |
| D-11632 | Me(S) | single bond | H | c-Hex | H | Cl | H | O |
| D-11633 | H | single bond | Me | c-Hex | H | Me | H | O |
| D-11634 | Me | single bond | H | c-Hex | H | Me | H | O |

TABLE 911

| Compound Number | Y | W | Z | $R^1$ | $R^2$ | $R^3$ | $R^{10}$ | A |
|---|---|---|---|---|---|---|---|---|
| D-11635 | Me(R) | single bond | H | c-Hex | H | Me | H | O |
| D-11636 | Me(S) | single bond | H | c-Hex | H | Me | H | O |
| D-11637 | H | single bond | Me | tetrahydropyran-4-yl | H | Cl | H | O |
| D-11638 | Me | single bond | H | tetrahydropyran-4-yl | H | Cl | H | O |
| D-11639 | Me(R) | single bond | H | tetrahydropyran-4-yl | H | Cl | H | O |
| D-11640 | Me(S) | single bond | H | tetrahydropyran-4-yl | H | Cl | H | O |
| D-11641 | H | single bond | Me | tetrahydropyran-4-yl | H | Me | H | O |
| D-11642 | Me | single bond | H | tetrahydropyran-4-yl | H | Me | H | O |
| D-11643 | Me(R) | single bond | H | tetrahydropyran-4-yl | H | Me | H | O |
| D-11644 | Me(S) | single bond | H | tetrahydropyran-4-yl | H | Me | H | O |
| D-11645 | H | single bond | Me | tetrahydrothiopyran-4-yl | H | Cl | H | O |
| D-11646 | Me | single bond | H | tetrahydrothiopyran-4-yl | H | Cl | H | O |
| D-11647 | Me(R) | single bond | H | tetrahydrothiopyran-4-yl | H | Cl | H | O |
| D-11648 | Me(S) | single bond | H | tetrahydrothiopyran-4-yl | H | Cl | H | O |
| D-11649 | H | single bond | Me | tetrahydrothiopyran-4-yl | H | Me | H | O |
| D-11650 | Me | single bond | H | tetrahydrothiopyran-4-yl | H | Me | H | O |
| D-11651 | Me(R) | single bond | H | tetrahydrothiopyran-4-yl | H | Me | H | O |
| D-11652 | Me(S) | single bond | H | tetrahydrothiopyran-4-yl | H | Me | H | O |
| D-11653 | H | single bond | Me | c-Hex(1-CN) | H | Cl | H | O |
| D-11654 | Me | single bond | H | c-Hex(1-CN) | H | Cl | H | O |
| D-11655 | Me(R) | single bond | H | c-Hex(1-CN) | H | Cl | H | O |
| D-11656 | Me(S) | single bond | H | c-Hex(1-CN) | H | Cl | H | O |
| D-11657 | H | single bond | Me | c-Hex(1-CN) | H | Me | H | O |
| D-11658 | Me | single bond | H | c-Hex(1-CN) | H | Me | H | O |
| D-11659 | Me(R) | single bond | H | c-Hex(1-CN) | H | Me | H | O |
| D-11660 | Me(S) | single bond | H | c-Hex(1-CN) | H | Me | H | O |
| D-11661 | H | single bond | Me | tetrahydropyran(4-CN)-4-yl | H | Cl | H | O |
| D-11662 | Me | single bond | H | tetrahydropyran(4-CN)-4-yl | H | Cl | H | O |
| D-11663 | Me(R) | single bond | H | tetrahydropyran(4-CN)-4-yl | H | Cl | H | O |
| D-11664 | Me(S) | single bond | H | tetrahydropyran(4-CN)-4-yl | H | Cl | H | O |
| D-11665 | H | single bond | Me | tetrahydropyran(4-CN)-4-yl | H | Me | H | O |
| D-11666 | Me | single bond | H | tetrahydropyran(4-CN)-4-yl | H | Me | H | O |
| D-11667 | Me(R) | single bond | H | tetrahydropyran(4-CN)-4-yl | H | Me | H | O |
| D-11668 | Me(S) | single bond | H | tetrahydropyran(4-CN)-4-yl | H | Me | H | O |
| D-11669 | H | single bond | Me | tetrahydrothiopyran(4-CN)-4-yl | H | Cl | H | O |
| D-11670 | Me | single bond | H | tetrahydrothiopyran(4-CN)-4-yl | H | Cl | H | O |
| D-11671 | Me(R) | single bond | H | tetrahydrothiopyran(4-CN)-4-yl | H | Cl | H | O |
| D-11672 | Me(S) | single bond | H | tetrahydrothiopyran(4-CN)-4-yl | H | Cl | H | O |
| D-11673 | H | single bond | Me | tetrahydrothiopyran(4-CN)-4-yl | H | Me | H | O |
| D-11674 | Me | single bond | H | tetrahydrothiopyran(4-CN)-4-yl | H | Me | H | O |
| D-11675 | Me(R) | single bond | H | tetrahydrothiopyran(4-CN)-4-yl | H | Me | H | O |
| D-11676 | Me(S) | single bond | H | tetrahydrothiopyran(4-CN)-4-yl | H | Me | H | O |
| D-11677 | H | single bond | Me | $CH_2$(c-Pr) | H | Cl | H | O |
| D-11678 | Me | single bond | H | $CH_2$(c-Pr) | H | Cl | H | O |

TABLE 912

| Compound Number | Y | W | Z | $R^1$ | $R^2$ | $R^3$ | $R^{10}$ | A |
|---|---|---|---|---|---|---|---|---|
| D-11679 | Me(R) | single bond | H | $CH_2$(c-Pr) | H | Cl | H | O |
| D-11680 | Me(S) | single bond | H | $CH_2$(c-Pr) | H | Cl | H | O |
| D-11681 | H | single bond | Me | $CH_2$(c-Pr) | H | Me | H | O |
| D-11682 | Me | single bond | H | $CH_2$(c-Pr) | H | Me | H | O |
| D-11683 | Me(R) | single bond | H | $CH_2$(c-Pr) | H | Me | H | O |
| D-11684 | Me(S) | single bond | H | $CH_2$(c-Pr) | H | Me | H | O |
| D-11685 | H | single bond | Me | $CH_2$[c-Pr(1-CN)] | H | Cl | H | O |
| D-11686 | Me | single bond | H | $CH_2$[c-Pr(1-CN)] | H | Cl | H | O |
| D-11687 | Me(R) | single bond | H | $CH_2$[c-Pr(1-CN)] | H | Cl | H | O |
| D-11688 | Me(S) | single bond | H | $CH_2$[c-Pr(1-CN)] | H | Cl | H | O |
| D-11689 | H | single bond | Me | $CH_2$[c-Pr(1-CN)] | H | Me | H | O |
| D-11690 | Me | single bond | H | $CH_2$[c-Pr(1-CN)] | H | Me | H | O |
| D-11691 | Me(R) | single bond | H | $CH_2$[c-Pr(1-CN)] | H | Me | H | O |
| D-11692 | Me(S) | single bond | H | $CH_2$[c-Pr(1-CN)] | H | Me | H | O |
| D-11693 | H | single bond | Me | CH(Me)(c-Pr) | H | Cl | H | O |
| D-11694 | Me | single bond | H | CH(Me)(c-Pr) | H | Cl | H | O |
| D-11695 | Me(R) | single bond | H | CH(Me)(c-Pr) | H | Cl | H | O |
| D-11696 | Me(S) | single bond | H | CH(Me)(c-Pr) | H | Cl | H | O |
| D-11697 | H | single bond | Me | CH(Me)(c-Pr) | H | Me | H | O |
| D-11698 | Me | single bond | H | CH(Me)(c-Pr) | H | Me | H | O |
| D-11699 | Me(R) | single bond | H | CH(Me)(c-Pr) | H | Me | H | O |

TABLE 912-continued

| Compound Number | Y | W | Z | $R^1$ | $R^2$ | $R^3$ | $R^{10}$ | A |
|---|---|---|---|---|---|---|---|---|
| D-11700 | Me(S) | single bond | H | CH(Me)(c-Pr) | H | Me | H | O |
| D-11701 | H | single bond | Me | $CH(Me)CH_2OMe$ | H | Cl | H | O |
| D-11702 | Me | single bond | H | $CH(Me)CH_2OMe$ | H | Cl | H | O |
| D-11703 | Me(R) | single bond | H | $CH(Me)CH_2OMe$ | H | Cl | H | O |
| D-11704 | Me(S) | single bond | H | $CH(Me)CH_2OMe$ | H | Cl | H | O |
| D-11705 | H | single bond | Me | $CH(Me)CH_2OMe$ | H | Me | H | O |
| D-11706 | Me | single bond | H | $CH(Me)CH_2OMe$ | H | Me | H | O |
| D-11707 | Me(R) | single bond | H | $CH(Me)CH_2OMe$ | H | Me | H | O |
| D-11708 | Me(S) | single bond | H | $CH(Me)CH_2OMe$ | H | Me | H | O |
| D-11709 | H | single bond | Me | $CH_2CH{=}CH_2$ | H | Cl | H | O |
| D-11710 | Me | single bond | H | $CH_2CH{=}CH_2$ | H | Cl | H | O |
| D-11711 | Me(R) | single bond | H | $CH_2CH{=}CH_2$ | H | Cl | H | O |
| D-11712 | Me(S) | single bond | H | $CH_2CH{=}CH_2$ | H | Cl | H | O |
| D-11713 | H | single bond | Me | $CH_2CH{=}CH_2$ | H | Me | H | O |
| D-11714 | Me | single bond | H | $CH_2CH{=}CH_2$ | H | Me | H | O |
| D-11715 | Me(R) | single bond | H | $CH_2CH{=}CH_2$ | H | Me | H | O |
| D-11716 | Me(S) | single bond | H | $CH_2CH{=}CH_2$ | H | Me | H | O |
| D-11717 | H | single bond | Me | CH2C≡CH | H | Cl | H | O |
| D-11718 | Me | single bond | H | CH2C≡CH | H | Cl | H | O |
| D-11719 | Me(R) | single bond | H | CH2C≡CH | H | Cl | H | O |
| D-11720 | Me(S) | single bond | H | CH2C≡CH | H | Cl | H | O |
| D-11721 | H | single bond | Me | CH2C≡CH | H | Me | H | O |
| D-11722 | Me | single bond | H | CH2C≡CH | H | Me | H | O |

TABLE 913

| Compound Number | Y | W | Z | $R^1$ | $R^2$ | $R^3$ | $R^{10}$ | A |
|---|---|---|---|---|---|---|---|---|
| D-11723 | Me(R) | single bond | H | $CH_2C{\equiv}CH$ | H | Me | H | O |
| D-11724 | Me(S) | single bond | H | $CH_2C{\equiv}CH$ | H | Me | H | O |
| D-11725 | H | single bond | Me | $CH_2CN$ | H | Cl | H | O |
| D-11726 | Me | single bond | H | $CH_2CN$ | H | Cl | H | O |
| D-11727 | Me(R) | single bond | H | $CH_2CN$ | H | Cl | H | O |
| D-11728 | Me(S) | single bond | H | $CH_2CN$ | H | Cl | H | O |
| D-11729 | H | single bond | Me | $CH_2CN$ | H | Me | H | O |
| D-11730 | Me | single bond | H | $CH_2CN$ | H | Me | H | O |
| D-11731 | Me(R) | single bond | H | $CH_2CN$ | H | Me | H | O |
| D-11732 | Me(S) | single bond | H | $CH_2CN$ | H | Me | H | O |
| D-11733 | H | single bond | Me | CH(Me)CN | H | Cl | H | O |
| D-11734 | Me | single bond | H | CH(Me)CN | H | Cl | H | O |
| D-11735 | Me(R) | single bond | H | CH(Me)CN | H | Cl | H | O |
| D-11736 | Me(S) | single bond | H | CH(Me)CN | H | Cl | H | O |
| D-11737 | H | single bond | Me | CH(Me)CN | H | Me | H | O |
| D-11738 | Me | single bond | H | CH(Me)CN | H | Me | H | O |
| D-11739 | Me(R) | single bond | H | CH(Me)CN | H | Me | H | O |
| D-11740 | Me(S) | single bond | H | CH(Me)CN | H | Me | H | O |
| D-11741 | H | single bond | Me | $C(Me)_2CN$ | H | Cl | H | O |
| D-11742 | Me | single bond | H | $C(Me)_2CN$ | H | Cl | H | O |
| D-11743 | Me(R) | single bond | H | $C(Me)_2CN$ | H | Cl | H | O |
| D-11744 | Me(S) | single bond | H | $C(Me)_2CN$ | H | Cl | H | O |
| D-11745 | H | single bond | Me | $C(Me)_2CN$ | H | Me | H | O |

TABLE 913-continued

| Compound Number | Y | W | Z | $R^1$ | $R^2$ | $R^3$ | $R^{10}$ | A |
|---|---|---|---|---|---|---|---|---|
| D-11746 | Me | single bond | H | $C(Me)_2CN$ | H | Me | H | O |
| D-11747 | Me(R) | single bond | H | $C(Me)_2CN$ | H | Me | H | O |
| D-11748 | Me(S) | single bond | H | $C(Me)_2CN$ | H | Me | H | O |
| D-11749 | H | single bond | Me | C(Me)(i-Pr)CN | H | Cl | H | O |
| D-11750 | Me | single bond | H | C(Me)(i-Pr)CN | H | Cl | H | O |
| D-11751 | Me(R) | single bond | H | C(Me)(i-Pr)CN | H | Cl | H | O |
| D-11752 | Me(S) | single bond | H | C(Me)(i-Pr)CN | H | Cl | H | O |
| D-11753 | H | single bond | Me | C(Me)(i-Pr)CN | H | Me | H | O |
| D-11754 | Me | single bond | H | C(Me)(i-Pr)CN | H | Me | H | O |
| D-11755 | Me(R) | single bond | H | C(Me)(i-Pr)CN | H | Me | H | O |
| D-11756 | Me(S) | single bond | H | C(Me)(i-Pr)CN | H | Me | H | O |
| D-11757 | H | single bond | Me | OMe | H | Cl | H | O |
| D-11758 | Me | single bond | H | OMe | H | Cl | H | O |
| D-11759 | Me(R) | single bond | H | OMe | H | Cl | H | O |
| D-11760 | Me(S) | single bond | H | OMe | H | Cl | H | O |
| D-11761 | H | single bond | Me | OMe | H | Me | H | O |
| D-11762 | Me | single bond | H | OMe | H | Me | H | O |
| D-11763 | Me(R) | single bond | H | OMe | H | Me | H | O |
| D-11764 | Me(S) | single bond | H | OMe | H | Me | H | O |
| D-11765 | H | single bond | Me | CH=NOMe | H | Cl | H | O |
| D-11766 | Me | single bond | H | CH=NOMe | H | Cl | H | O |

TABLE 914

| Compound Number | Y | W | Z | $R^1$ | $R^2$ | $R^3$ | $R^{10}$ | A |
|---|---|---|---|---|---|---|---|---|
| D-11767 | Me(R) | single bond | H | CH=NOMe | H | Cl | H | O |
| D-11768 | Me(S) | single bond | H | CH=NOMe | H | Cl | H | O |
| D-11769 | H | single bond | Me | CH=NOMe | H | Me | H | O |
| D-11770 | Me | single bond | H | CH=NOMe | H | Me | H | O |
| D-11771 | Me(R) | single bond | H | CH=NOMe | H | Me | H | O |
| D-11772 | Me(S) | single bond | H | CH=NOMe | H | Me | H | O |
| D-11773 | H | single bond | Me | morpholin-4-yl | H | Cl | H | O |
| D-11774 | Me | single bond | H | morpholin-4-yl | H | Cl | H | O |
| D-11775 | Me(R) | single bond | H | morpholin-4-yl | H | Cl | H | O |
| D-11776 | Me(S) | single bond | H | morpholin-4-yl | H | Cl | H | O |
| D-11777 | H | single bond | Me | morpholin-4-yl | H | Me | H | O |
| D-11778 | Me | single bond | H | morpholin-4-yl | H | Me | H | O |
| D-11779 | Me(R) | single bond | H | morpholin-4-yl | H | Me | H | O |
| D-11780 | Me(S) | single bond | H | morpholin-4-yl | H | Me | H | O |
| D-11781 | H | single bond | Me | Ph | H | Cl | H | O |

TABLE 914-continued

| Compound Number | Y | W | Z | $R^1$ | $R^2$ | $R^3$ | $R^{10}$ | A |
|---|---|---|---|---|---|---|---|---|
| D-11782 | Me | single bond | H | Ph | H | Cl | H | O |
| D-11783 | Me(R) | single bond | H | Ph | H | Cl | H | O |
| D-11784 | Me(S) | single bond | H | Ph | H | Cl | H | O |
| D-11785 | H | single bond | Me | Ph | H | Me | H | O |
| D-11786 | Me | single bond | H | Ph | H | Me | H | O |
| D-11787 | Me(R) | single bond | H | Ph | H | Me | H | O |
| D-11788 | Me(S) | single bond | H | Ph | H | Me | H | O |
| D-11789 | H | single bond | Me | $CH_2Ph$ | H | Cl | H | O |
| D-11790 | Me | single bond | H | $CH_2Ph$ | H | Cl | H | O |
| D-11791 | Me(R) | single bond | H | $CH_2Ph$ | H | Cl | H | O |
| D-11792 | Me(S) | single bond | H | $CH_2Ph$ | H | Cl | H | O |
| D-11793 | H | single bond | Me | $CH_2Ph$ | H | Me | H | O |
| D-11794 | Me | single bond | H | $CH_2Ph$ | H | Me | H | O |
| D-11795 | Me(R) | single bond | H | $CH_2Ph$ | H | Me | H | O |
| D-11796 | Me(S) | single bond | H | $CH_2Ph$ | H | Me | H | O |
| D-11797 | H | single bond | Me | thiazole-2-yl | H | Cl | H | O |
| D-11798 | Me | single bond | H | thiazole-2-yl | H | Cl | H | O |
| D-11799 | Me(R) | single bond | H | thiazole-2-yl | H | Cl | H | O |
| D-11800 | Me(S) | single bond | H | thiazole-2-y | H | Cl | H | O |
| D-11801 | H | single bond | Me | thiazole-2-yl | H | Me | H | O |
| D-11802 | Me | single bond | H | thiazole-2-yl | H | Me | H | O |
| D-11803 | Me(R) | single bond | H | thiazole-2-yl | H | Me | H | O |
| D-11804 | Me(S) | single bond | H | thiazole-2-yl | H | Me | H | O |
| D-11805 | H | single bond | Me | 1-Me-pyrazol-3-yl | H | Cl | H | O |
| D-11806 | Me | single bond | H | 1-Me-pyrazol-3-yl | H | Cl | H | O |
| D-11807 | Me(R) | single bond | H | 1-Me-pyrazol-3-yl | H | Cl | H | O |
| D-11808 | Me(S) | single bond | H | 1-Me-pyrazol-3-yl | H | Cl | H | O |
| D-11809 | H | single bond | Me | 1-Me-pyrazol-3-yl | H | Me | H | O |
| D-11810 | Me | single bond | H | 1-Me-pyrazol-3-yl | H | Me | H | O |

TABLE 915

| Compound Number | Y | W | Z | $R^1$ | $R^2$ | $R^3$ | $R^{10}$ | A |
|---|---|---|---|---|---|---|---|---|
| D-11811 | Me(R) | single bond | NII | 1-Me-pyrazol-3-yl | H | Me | H | O |
| D-11812 | Me(S) | single bond | H | 1-Me-pyrazol-3-yl | H | Me | H | O |
| D-11813 | H | single bond | Me | 1-Me-pyrazol-5-yl | H | Cl | H | O |
| D-11814 | Me | single bond | H | 1-Me-pyrazol-5-yl | H | Cl | H | O |
| D-11815 | Me(R) | single bond | H | 1-Me-pyrazol-5-yl | H | Cl | H | O |
| D-11816 | Me(S) | single bond | H | 1-Me-pyrazol-5-yl | H | Cl | H | O |
| D-11817 | H | single bond | Me | 1-Me-pyrazol-5-yl | H | Me | H | O |
| D-11818 | Me | single bond | H | 1-Me-pyrazol-5-yl | H | Me | H | O |
| D-11819 | Me(R) | single bond | H | 1-Me-pyrazol-5-yl | H | Me | H | O |
| D-11820 | Me(S) | single bond | H | 1-Me-pyrazol-5-yl | H | Me | H | O |
| D-11821 | H | single bond | Me | $CH_2$(pyrimidin-2-yl) | H | Cl | H | O |
| D-11822 | Me | single bond | H | $CH_2$(pyrimidin-2-yl) | H | Cl | H | O |
| D-11823 | Me(R) | single bond | H | $CH_2$(pyrimidin-2-yl) | H | Cl | H | O |
| D-11824 | Me(S) | single bond | H | $CH_2$(pyrimidin-2-yl) | H | Cl | H | O |
| D-11825 | H | single bond | Me | $CH_2$(pyrimidin-2-yl) | H | Me | H | O |
| D-11826 | Me | single bond | H | $CH_2$(pyrimidin-2-yl) | H | Me | H | O |
| D-11827 | Me(R) | single bond | H | $CH_2$(pyrimidin-2-yl) | H | Me | H | O |
| D-11828 | Me(S) | single bond | H | $CH_2$(pyrimidin-2-yl) | H | Me | H | O |
| D-11829 | H | single bond | Me | $—CH_2CH_2CH_2—$ | | Cl | H | O |
| D-11830 | Me | single bond | H | $—CH_2CH_2CH_2—$ | | C | H | O |
| D-11831 | Me(R) | single bond | H | $—CH_2CH_2CH_2—$ | | Cl | H | O |
| D-11832 | Me(S) | single bond | H | $—CH_2CH_2CH_2—$ | | Cl | H | O |
| D-11833 | H | single bond | Me | $—CH_2CH_2CH_2—$ | | Me | H | O |
| D-11834 | Me | single bond | H | $—CH_2CH_2CH_2—$ | | Me | H | O |
| D-11835 | Me(R) | single bond | H | $—CH_2CH_2CH_2—$ | | Me | H | O |
| D-11836 | Me(S) | single bond | H | $—CH_2CH_2CH_2—$ | | Me | H | O |
| D-11837 | H | single bond | Me | $—CH_2CH_2OCH_2CH_2—$ | | Cl | H | O |
| D-11838 | Me | single bond | H | $—CH_2CH_2OCH_2CH_2—$ | | Cl | H | O |
| D-11839 | Me(R) | single bond | H | $—CH_2CH_2OCH_2CH_2—$ | | Cl | H | O |
| D-11840 | Me(S) | single bond | H | $—CH_2CH_2OCH_2CH_2—$ | | Cl | H | O |
| D-11841 | H | single bond | Me | $—CH_2CH_2OCH_2CH_2—$ | | Me | H | O |
| D-11842 | Me | single bond | H | $—CH_2CH_2OCH_2CH_2—$ | | Me | H | O |
| D-11843 | Me(R) | single bond | H | $—CH_2CH_2OCH_2CH_2—$ | | Me | H | O |
| D-11844 | Me(S) | single bond | H | $—CH_2CH_2OCH_2CH_2—$ | | Me | H | O |
| D-11845 | H | single bond | Me | Me | H | Cl | Me | O |
| D-11846 | Me | single bond | H | Me | H | Cl | Me | O |
| D-11847 | Me(R) | single bond | H | Me | H | Cl | Me | O |
| D-11848 | Me(S) | single bond | H | Me | H | Cl | Me | O |

TABLE 915-continued

| Compound Number | Y | W | Z | $R^1$ | $R^2$ | $R^3$ | $R^{10}$ | A |
|---|---|---|---|---|---|---|---|---|
| D-11849 | H | single bond | Me | Me | H | Me | Me | O |
| D-11850 | Me | single bond | H | Me | H | Me | Me | O |
| D-11851 | Me(R) | single bond | H | Me | H | Me | Me | O |
| D-11852 | Me(S) | single bond | H | Me | H | Me | Me | O |
| D-11853 | H | single bond | Me | $CH_2CHF_2$ | H | Cl | Me | O |
| D-11854 | Me | single bond | H | $CH_2CHF_2$ | H | Cl | Me | O |

TABLE 916

| Compound Number | Y | W | Z | $R^1$ | $R^2$ | $R^3$ | $R^{10}$ | A |
|---|---|---|---|---|---|---|---|---|
| D-11855 | Me(R) | single bond | H | $CH_2CHF_2$ | H | Cl | Me | O |
| D-11856 | Me(S) | single bond | H | $CH_2CHF_2$ | H | Cl | Me | O |
| D-11857 | H | single bond | Me | $CH_2CHF_2$ | H | Me | Me | O |
| D-11858 | Me | single bond | H | $CH_2CHF_2$ | H | Me | Me | O |
| D-11859 | Me(R) | single bond | H | $CH_2CHF_2$ | H | Me | Me | O |
| D-11860 | Me(S) | single bond | H | $CH_2CHF_2$ | H | Me | Me | O |
| D-11861 | H | single bond | Me | n-Pr | H | Cl | Me | O |
| D-11862 | Me | single bond | H | n-Pr | H | Cl | Me | O |
| D-11863 | Me(R) | single bond | H | n-Pr | H | Cl | Me | O |
| D-11864 | Me(S) | single bond | H | n-Pr | H | Cl | Me | O |
| D-11865 | H | single bond | Me | n-Pr | H | Me | Me | O |
| D-11866 | Me | single bond | H | n-Pr | H | Me | Me | O |
| D-11867 | Me(R) | single bond | H | n-Pr | H | Me | Me | O |
| D-11868 | Me(S) | single bond | H | n-Pr | H | Me | Me | O |
| D-11869 | H | single bond | Me | i-Pr | H | Cl | Me | O |
| D-11870 | Me | single bond | H | i-Pr | H | Cl | Me | O |
| D-11871 | Me(R) | single bond | H | i-Pr | H | Cl | Me | O |
| D-11872 | Me(S) | single bond | H | i-Pr | H | Cl | Me | O |
| D-11873 | H | single bond | Me | i-Pr | H | Me | Me | O |
| D-11874 | Me | single bond | H | i-Pr | H | Me | Me | O |
| D-11875 | Me(R) | single bond | H | i-Pr | H | Me | Me | O |
| D-11876 | Me(S) | single bond | H | i-Pr | H | Me | Me | O |
| D-11877 | H | single bond | Me | c-Pr(1-F) | H | Cl | Me | O |

TABLE 916-continued

| Compound Number | Y | W | Z | $R^1$ | $R^2$ | $R^3$ | $R^{10}$ | A |
|---|---|---|---|---|---|---|---|---|
| D-11878 | Me | single bond | H | c-Pr(1-F) | H | Cl | Me | O |
| D-11879 | Me(R) | single bond | H | c-Pr(1-F) | H | Cl | Me | O |
| D-11880 | Me(S) | single bond | H | c-Pr(1-F) | H | Cl | Me | O |
| D-11881 | H | single bond | Me | c-Pr(1-F) | H | Me | Me | O |
| D-11882 | Me | single bond | H | c-Pr(1-F) | H | Me | Me | O |
| D-11883 | Me(R) | single bond | H | c-Pr(1-F) | H | Me | Me | O |
| D-11884 | Me(S) | single bond | H | c-Pr(1-F) | H | Me | Me | O |
| D-11885 | H | single bond | Me | c-Pr(2,2-$F_2$) | H | Cl | Me | O |
| D-11886 | Me | single bond | H | c-Pr(2,2-$F_2$) | H | Cl | Me | O |
| D-11887 | Me(R) | single bond | H | c-Pr(2,2-$F_2$) | H | Cl | Me | O |
| D-11888 | Me(S) | single bond | H | c-Pr(2,2-$F_2$) | H | Cl | Me | O |
| D-11889 | H | single bond | Me | c-Pr(2,2-$F_2$) | H | Me | Me | O |
| D-11890 | Me | single bond | H | c-Pr(2,2-$F_2$) | H | Me | Me | O |
| D-11891 | Me(R) | single bond | H | c-Pr(2,2-$F_2$) | H | Me | Me | O |
| D-11892 | Me(S) | single bond | H | c-Pr(2,2-$F_2$) | H | Me | Me | O |
| D-11893 | H | single bond | Me | c-Pr(1-Cl) | H | Cl | Me | O |
| D-11894 | Me | single bond | H | c-Pr(1-Cl) | H | Cl | Me | O |
| D-11895 | Me(R) | single bond | H | c-Pr(1-Cl) | H | Cl | Me | O |
| D-11896 | Me(S) | single bond | H | c-Pr(1-Cl) | H | Cl | Me | O |
| D-11897 | H | single bond | Me | c-Pr(1-Cl) | H | Me | Me | O |
| D-11898 | Me | single bond | H | c-Pr(1-Cl) | H | Me | Me | O |

TABLE 917

| Compound Number | Y | W | Z | $R^1$ | $R^2$ | $R^3$ | $R^{10}$ | A |
|---|---|---|---|---|---|---|---|---|
| D-11899 | Me(R) | single bond | H | c-Pr(1-Cl) | H | Me | Me | O |
| D-11900 | Me(S) | single bond | H | c-Pr(1-Cl) | H | Me | Me | O |
| D-11901 | H | single bond | Me | c-Pr(1-Br) | H | Cl | Me | O |
| D-11902 | Me | single bond | H | c-Pr(1-Br) | H | Cl | Me | O |
| D-11903 | Me(R) | single bond | H | c-Pr(1-Br) | H | Cl | Me | O |
| D-11904 | Me(S) | single bond | H | c-Pr(1-Br) | H | Cl | Me | O |
| D-11905 | H | single bond | Me | c-Pr(1-Br) | H | Me | Me | O |
| D-11906 | Me | single bond | H | c-Pr(1-Br) | H | Me | Me | O |
| D-11907 | Me(R) | single bond | H | c-Pr(1-Br) | H | Me | Me | O |
| D-11908 | Me(S) | single bond | H | c-Pr(1-Br) | H | Me | Me | O |
| D-11909 | H | single bond | Me | c-Pr(1-Me) | H | Cl | Me | O |
| D-11910 | Me | single bond | H | c-Pr(1-Me) | H | Cl | Me | O |
| D-11911 | Me(R) | single bond | H | c-Pr(1-Me) | H | Cl | Me | O |
| D-11912 | Me(S) | single bond | H | c-Pr(1-Me) | H | Cl | Me | O |
| D-11913 | H | single bond | Me | c-Pr(1-Me) | H | Me | Me | O |
| D-11914 | Me | single bond | H | c-Pr(1-Me) | H | Me | Me | O |
| D-11915 | Me(R) | single bond | H | c-Pr(1-Me) | H | Me | Me | O |
| D-11916 | Me(S) | single bond | H | c-Pr(1-Me) | H | Me | Me | O |
| D-11917 | H | single bond | Me | c-Pr(1-$CH_2OH$) | H | Cl | Me | O |
| D-11918 | Me | single bond | H | c-Pr(1-$CH_2OH$) | H | Cl | Me | O |
| D-11919 | Me(R) | single bond | H | c-Pr(1-$CH_2OH$) | H | Cl | Me | O |
| D-11920 | Me(S) | single bond | H | c-Pr(1-$CH_2OH$) | H | Cl | Me | O |
| D-11921 | H | single bond | Me | c-Pr(1-$CH_2OH$) | H | Me | Me | O |
| D-11922 | Me | single bond | H | c-Pr(1-$CH_2OH$) | H | Me | Me | O |
| D-11923 | Me(R) | single bond | H | c-Pr(1-$CH_2OH$) | H | Me | Me | O |
| D-11924 | Me(S) | single bond | H | c-Pr(1-$CH_2OH$) | H | Me | Me | O |
| D-11925 | H | single bond | Me | c-Pr[1-$CH_2OS(=O)_2Me$] | H | Cl | Me | O |
| D-11926 | Me | single bond | H | c-Pr[1-$CH_2OS(=O)_2Me$] | H | Cl | Me | O |
| D-11927 | Me(R) | single bond | H | c-Pr[1-$CH_2OS(=O)_2Me$] | H | Cl | Me | O |
| D-11928 | Me(S) | single bond | H | c-Pr[1-$CH_2OS(=O)_2Me$] | H | Cl | Me | O |
| D-11929 | H | single bond | Me | c-Pr[1-$CH_2OS(=O)_2Me$] | H | Me | Me | O |
| D-11930 | Me | single bond | H | c-Pr[1-$CH_2OS(=O)_2Me$] | H | Me | Me | O |

TABLE 917-continued

| Compound Number | Y | W | Z | $R^1$ | $R^2$ | $R^3$ | $R^{10}$ | A |
|---|---|---|---|---|---|---|---|---|
| D-11931 | Me(R) | single bond | H | c-Pr[1-$CH_2OS(=O)_2$Me] | H | Me | Me | O |
| D-11932 | Me(S) | single bond | H | c-Pr[1-$CH_2OS(=O)_2$Me] | H | Me | Me | O |
| D-11933 | H | single bond | Me | c-Pr(1-$CH_2$OMe) | H | Cl | Me | O |
| D-11934 | Me | single bond | H | c-Pr(1-$CH_2$OMe) | H | Cl | Me | O |
| D-11935 | Me(R) | single bond | H | c-Pr(1-$CH_2$OMe) | H | Cl | Me | O |
| D-11936 | Me(S) | single bond | H | c-Pr(1-$CH_2$OMe) | H | Cl | Me | O |
| D-11937 | H | single bond | Me | c-Pr(1-$CH_2$OMe) | H | Me | Me | O |
| D-11938 | Me | single bond | H | c-Pr(1-$CH_2$OMe) | H | Me | Me | O |
| D-11939 | Me(R) | single bond | H | c-Pr(1-$CH_2$OMe) | H | Me | Me | O |
| D-11940 | Me(S) | single bond | H | c-Pr(1-$CH_2$OMe) | H | Me | Me | O |
| D-11941 | H | single bond | Me | c-Pr(1-$CH_2$OCN) | H | Cl | Me | O |
| D-11942 | Me | single bond | H | c-Pr(1-$CH_2$OCN) | H | Cl | Me | O |

TABLE 918

| Compound Number | Y | W | Z | $R^1$ | $R^2$ | $R^3$ | $R^{10}$ | A |
|---|---|---|---|---|---|---|---|---|
| D-11943 | Me(R) | single bond | H | c-Pr(1-$CH_2$OCN) | H | Cl | Me | O |
| D-11944 | Me(S) | single bond | H | c-Pr(1-$CH_2$OCN) | H | Cl | Me | O |
| D-11945 | H | single bond | Me | c-Pr(1-$CH_2$OCN) | H | Me | Me | O |
| D-11946 | Me | single bond | H | c-Pr(1-$CH_2$OCN) | H | Me | Me | O |
| D-11947 | Me(R) | single bond | H | c-Pr(1-$CH_2$OCN) | H | Me | Me | O |
| D-11948 | Me(S) | single bond | H | c-Pr(1-$CH_2$OCN) | H | Me | Me | O |
| D-11949 | H | single bond | Me | c-Pr(1-$CH_2$SMe) | H | Cl | Me | O |
| D-11950 | Me | single bond | H | c-Pr(1-$CH_2$SMe) | H | Cl | Me | O |
| D-11951 | Me(R) | single bond | H | c-Pr(1-$CH_2$SMe) | H | Cl | Me | O |
| D-11952 | Me(S) | single bond | H | c-Pr(1-$CH_2$SMe) | H | Cl | Me | O |
| D-11953 | H | single bond | Me | c-Pr(1-$CH_2$SMe) | H | Me | Me | O |
| D-11954 | Me | single bond | H | c-Pr(1-$CH_2$SMe) | H | Me | Me | O |
| D-11955 | Me(R) | single bond | H | c-Pr(1-$CH_2$SMe) | H | Me | Me | O |
| D-11956 | Me(S) | single bond | H | c-Pr(1-$CH_2$SMe) | H | Me | Me | O |
| D-11957 | H | single bond | Me | c-Pr[1-$CH_2S(=O)$Me] | H | Cl | Me | O |
| D-11958 | Me | single bond | H | c-Pr[1-$CH_2S(=O)$Me] | H | Cl | Me | O |
| D-11959 | Me(R) | single bond | H | c-Pr[1-$CH_2S(=O)$Me] | H | Cl | Me | O |
| D-11960 | Me(S) | single bond | H | c-Pr[1-$CH_2S(=O)$Me] | H | Cl | Me | O |
| D-11961 | H | single bond | Me | c-Pr[1-$CH_2S(=O)$Me] | H | Me | Me | O |
| D-11962 | Me | single bond | H | c-Pr[1-$CH_2S(=O)$Me] | H | Me | Me | O |
| D-11963 | Me(R) | single bond | H | c-Pr[1-$CH_2S(=O)$Me] | H | Me | Me | O |
| D-11964 | Me(S) | single bond | H | c-Pr[1-$CH_2S(=O)$Me] | H | Me | Me | O |
| D-11965 | H | single bond | Me | c-Pr[1-$CH_2S(=O)_2$Me] | H | Cl | Me | O |
| D-11966 | Me | single bond | H | c-Pr[1-$CH_2S(=O)_2$Me] | H | Cl | Me | O |
| D-11967 | Me(R) | single bond | H | c-Pr[1-$CH_2S(=O)_2$Me] | H | Cl | Me | O |
| D-11968 | Me(S) | single bond | H | c-Pr[1-$CH_2S(=O)_2$Me] | H | Cl | Me | O |
| D-11969 | H | single bond | Me | c-Pr[1-$CH_2S(=O)_2$Me] | H | Me | Me | O |
| D-11970 | Me | single bond | H | c-Pr[1-$CH_2S(=O)_2$Me] | H | Me | Me | O |
| D-11971 | Me(R) | single bond | H | c-Pr[1-$CH_2S(=O)_2$Me] | H | Me | Me | O |
| D-11972 | Me(S) | single bond | H | c-Pr[1-$CH_2S(=O)_2$Me] | H | Me | Me | O |
| D-11973 | H | single bond | Me | c-Pr(1-$CH_2$F) | H | Cl | Me | O |
| D-11974 | Me | single bond | H | c-Pr(1-$CH_2$F) | H | Cl | Me | O |
| D-11975 | Me(R) | single bond | H | c-Pr(1-$CH_2$F) | H | Cl | Me | O |
| D-11976 | Me(S) | single bond | H | c-Pr(1-$CH_2$F) | H | Cl | Me | O |
| D-11977 | H | single bond | Me | c-Pr(1-$CH_2$F) | H | Me | Me | O |
| D-11978 | Me | single bond | H | c-Pr(1-$CH_2$F) | H | Me | Me | O |
| D-11979 | Me(R) | single bond | H | c-Pr(1-$CH_2$F) | H | Me | Me | O |
| D-11980 | Me(S) | single bond | H | c-Pr(1-$CH_2$F) | H | Me | Me | O |
| D-11981 | H | single bond | Me | c-Pr(1-$CHF_2$) | H | Cl | Me | O |
| D-11982 | Me | single bond | H | c-Pr(1-$CHF_2$) | H | Cl | Me | O |
| D-11983 | Me(R) | single bond | H | c-Pr(1-$CHF_2$) | H | Cl | Me | O |
| D-11984 | Me(S) | single bond | H | c-Pr(1-$CHF_2$) | H | Cl | Me | O |
| D-11985 | H | single bond | Me | c-Pr(1-$CHF_2$) | H | Me | Me | O |
| D-11986 | Me | single bond | H | c-Pr(1-$CHF_2$) | H | Me | Me | O |

TABLE 919

| Compound Number | Y | W | Z | $R^1$ | $R^2$ | $R^3$ | $R^{10}$ | A |
|---|---|---|---|---|---|---|---|---|
| D-11987 | Me(R) | single bond | H | c-Pr(1-$CHF_2$) | H | Me | Me | O |
| D-11988 | Me(S) | single bond | H | c-Pr(1-$CHF_2$) | H | Me | Me | O |
| D-11989 | H | single bond | Me | c-Pr(1-$CF_3$) | H | Cl | Me | O |
| D-11990 | Me | single bond | H | c-Pr(1-$CF_3$) | H | Cl | Me | O |
| D-11991 | Me(R) | single bond | H | c-Pr(1-$CF_3$) | H | Cl | Me | O |
| D-11992 | Me(S) | single bond | H | c-Pr(1-$CF_3$) | H | Cl | Me | O |
| D-11993 | H | single bond | Me | c-Pr(1-$CF_3$) | H | Me | Me | O |
| D-11994 | Me | single bond | H | c-Pr(1-$CF_3$) | H | Me | Me | O |
| D-11995 | Me(R) | single bond | H | c-Pr(1-$CF_3$) | H | Me | Me | O |
| D-11996 | Me(S) | single bond | H | c-Pr(1-$CF_3$) | H | Me | Me | O |
| D-11997 | H | single bond | Me | c-Pr(1-C≡CH) | H | Cl | Me | O |
| D-11998 | Me | single bond | H | c-Pr(1-C≡CH) | H | Cl | Me | O |
| D-11999 | Me(R) | single bond | H | c-Pr(1-C≡CH) | H | Cl | Me | O |
| D-12000 | Me(S) | single bond | H | c-Pr(1-C≡CH) | H | Cl | Me | O |
| D-12001 | H | single bond | Me | c-Pr(1-C≡CH) | H | Me | Me | O |
| D-12002 | Me | single bond | H | c-Pr(1-C≡CH) | H | Me | Me | O |
| D-12003 | Me(R) | single bond | H | c-Pr(1-C≡CH) | H | Me | Me | O |
| D-12004 | Me(S) | single bond | H | c-Pr(1-C≡CH) | H | Me | Me | O |
| D-12005 | H | single bond | Me | c-Pr[1-C(═O)OEt] | H | Cl | Me | O |
| D-12006 | Me | single bond | H | c-Pr[1-C(═O)OEt] | H | Cl | Me | O |
| D-12007 | Me(R) | single bond | H | c-Pr[1-C(═O)OEt] | H | Cl | Me | O |
| D-12008 | Me(S) | single bond | H | c-Pr[1-C(═O)OEt] | H | Cl | Me | O |
| D-12009 | H | single bond | Me | c-Pr[1-C(═O)OEt] | H | Me | Me | O |
| D-12010 | Me | single bond | H | c-Pr[1-C(═O)OEt] | H | Me | Me | O |
| D-12011 | Me(R) | single bond | H | c-Pr[1-C(═O)OEt] | H | Me | Me | O |
| D-12012 | Me(S) | single bond | H | c-Pr[1-C(═O)OEt] | H | Me | Me | O |
| D-12013 | H | single bond | Me | c-Pr[1-C(═O)OH] | H | Cl | Me | O |
| D-12014 | Me | single bond | H | c-Pr[1-C(═O)OH] | H | Cl | Me | O |
| D-12015 | Me(R) | single bond | H | c-Pr[1-C(═O)OH] | H | Cl | Me | O |
| D-12016 | Me(S) | single bond | H | c-Pr[1-C(═O)OH] | H | Cl | Me | O |
| D-12017 | H | single bond | Me | c-Pr[1-C(═O)OH] | H | Me | Me | O |
| D-12018 | Me | single bond | H | c-Pr[1-C(═O)OH] | H | Me | Me | O |
| D-12019 | Me(R) | single bond | H | c-Pr[1-C(═O)OH] | H | Me | Me | O |
| D-12020 | Me(S) | single bond | H | c-Pr[1-C(═O)OH] | H | Me | Me | O |
| D-12021 | H | single bond | Me | c-Pr[1-C(═O)$NH_2$] | H | Cl | Me | O |
| D-12022 | Me | single bond | H | c-Pr[1-C(═O)$NH_2$] | H | Cl | Me | O |
| D-12023 | Me(R) | single bond | H | c-Pr[1-C(═O)$NH_2$] | H | Cl | Me | O |
| D-12024 | Me(S) | single bond | H | c-Pr[1-C(═O)$NH_2$] | H | Cl | Me | O |
| D-12025 | H | single bond | Me | c-Pr[1-C(═O)$NH_2$] | H | Me | Me | O |
| D-12026 | Me | single bond | H | c-Pr[1-C(═O)$NH_2$] | H | Me | Me | O |
| D-12027 | Me(R) | single bond | H | c-Pr[1-C(═O)$NH_2$] | H | Me | Me | O |
| D-12028 | Me(S) | single bond | H | c-Pr[1-C(═O)$NH_2$] | H | Me | Me | O |
| D-12029 | H | single bond | Me | c-Pr(1-OMe) | H | Cl | Me | O |
| D-12030 | Me | single bond | H | c-Pr(1-OMe) | H | Cl | Me | O |

TABLE 920

| Compound Number | Y | W | Z | $R^1$ | $R^2$ | $R^3$ | $R^{10}$ | A |
|---|---|---|---|---|---|---|---|---|
| D-12031 | Me(R) | single bond | H | c-Pr(1-OMe) | H | Cl | Me | O |
| D-12032 | Me(S) | single bond | H | c-Pr(1-OMe) | H | Cl | Me | O |
| D-12033 | H | single bond | Me | c-Pr(1-OMe) | H | Me | Me | O |
| D-12034 | Me | single bond | H | c-Pr(1-OMe) | H | Me | Me | O |
| D-12035 | Me(R) | single bond | H | c-Pr(1-OMe) | H | Me | Me | O |
| D-12036 | Me(S) | single bond | H | c-Pr(1-OMe) | H | Me | Me | O |
| D-12037 | H | single bond | Me | c-Pr(1-SMe) | H | Cl | Me | O |
| D-12038 | Me | single bond | H | c-Pr(1-SMe) | H | Cl | Me | O |
| D-12039 | Me(R) | single bond | H | c-Pr(1-SMe) | H | Cl | Me | O |
| D-12040 | Me(S) | single bond | H | c-Pr(1-SMe) | H | Cl | Me | O |
| D-12041 | H | single bond | Me | c-Pr(1-SMe) | H | Me | Me | O |
| D-12042 | Me | single bond | H | c-Pr(1-SMe) | H | Me | Me | O |
| D-12043 | Me(R) | single bond | H | c-Pr(1-SMe) | H | Me | Me | O |
| D-12044 | Me(S) | single bond | H | c-Pr(1-SMe) | H | Me | Me | O |
| D-12045 | H | single bond | Me | c-Pr[1-S(═O)Me] | H | Cl | Me | O |
| D-12046 | Me | single bond | H | c-Pr[1-S(═O)Me] | H | Cl | Me | O |
| D-12047 | Me(R) | single bond | H | c-Pr[1-S(═O)Me] | H | Cl | Me | O |
| D-12048 | Me(S) | single bond | H | c-Pr[1-S(═O)Me] | H | Cl | Me | O |
| D-12049 | H | single bond | Me | c-Pr[1-S(═O)Me] | H | Me | Me | O |
| D-12050 | Me | single bond | H | c-Pr[1-S(═O)Me] | H | Me | Me | O |
| D-12051 | Me(R) | single bond | H | c-Pr[1-S(═O)Me] | H | Me | Me | O |
| D-12052 | Me(S) | single bond | H | c-Pr[1-S(═O)Me] | H | Me | Me | O |
| D-12053 | H | single bond | Me | c-Pr[1-S(═O)$_2$Me] | H | Cl | Me | O |

TABLE 920-continued

| Compound Number | Y | W | Z | $R^1$ | $R^2$ | $R^3$ | $R^{10}$ | A |
|---|---|---|---|---|---|---|---|---|
| D-12054 | Me | single bond | H | c-Pr[1-S(=O)$_2$Me] | H | Cl | Me | O |
| D-12055 | Me(R) | single bond | H | c-Pr[1-S(=O)$_2$Me] | H | Cl | Me | O |
| D-12056 | Me(S) | single bond | H | c-Pr[1-S(=O)$_2$Me] | H | Cl | Me | O |
| D-12057 | H | single bond | Me | c-Pr[1-S(=O)$_2$Me] | H | Me | Me | O |
| D-12058 | Me | single bond | H | c-Pr[1-S(=O)$_2$Me] | H | Me | Me | O |
| D-12059 | Me(R) | single bond | H | c-Pr[1-S(=O)$_2$Me] | H | Me | Me | O |
| D-12060 | Me(S) | single bond | H | c-Pr[1-S(=O)$_2$Me] | H | Me | Me | O |
| D-12061 | H | single bond | Me | c-Pr[1-S(=O)$_2$CHF$_2$] | H | Cl | Me | O |
| D-12062 | Me | single bond | H | c-Pr[1-S(=O)$_2$CHF$_2$] | H | Cl | Me | O |
| D-12063 | Me(R) | single bond | H | c-Pr[1-S(=O)$_2$CHF$_2$] | H | Cl | Me | O |
| D-12064 | Me(S) | single bond | H | c-Pr[1-S(=O)$_2$CHF$_2$] | H | Cl | Me | O |
| D-12065 | H | single bond | Me | c-Pr[1-S(=O)$_2$CHF$_2$] | H | Me | Me | O |
| D-12066 | Me | single bond | H | c-Pr[1-S(=O)$_2$CHF$_2$] | H | Me | Me | O |
| D-12067 | Me(R) | single bond | H | c-Pr[1-S(=O)$_2$CHF$_2$] | H | Me | Me | O |
| D-12068 | Me(S) | single bond | H | c-Pr[1-S(=O)$_2$CHF$_2$] | H | Me | Me | O |
| D-12069 | H | single bond | Me | c-Pr[1-S(=O)$_2$CF$_3$] | H | Cl | Me | O |
| D-12070 | Me | single bond | H | c-Pr[1-S(=O)$_2$CF$_3$] | H | Cl | Me | O |
| D-12071 | Me(R) | single bond | H | c-Pr[1-S(=O)$_2$CF$_3$] | H | Cl | Me | O |
| D-12072 | Me(S) | single bond | H | c-Pr[1-S(=O)$_2$CF$_3$] | H | Cl | Me | O |
| D-12073 | H | single bond | Me | c-Pr[1-S(=O)$_2$CF$_3$] | H | Me | Me | O |
| D-12074 | Me | single bond | H | c-Pr[1-S(=O)$_2$CF$_3$] | H | Me | Me | O |

TABLE 921

| Compound Number | Y | W | Z | $R^1$ | $R^2$ | $R^3$ | $R^{10}$ | A |
|---|---|---|---|---|---|---|---|---|
| D-12075 | Me(R) | single bond | H | c-Pr[1-S(=O)$_2$CF$_3$] | H | Me | Me | O |
| D-12076 | Me(S) | single bond | H | c-Pr[1-S(=O)$_2$CF$_3$] | H | Me | Me | O |
| D-12077 | H | single bond | Me | c-Pr[1-(5,6-dihydro-1,4,2-dioxazin-3-yl)] | H | Cl | Me | O |
| D-12078 | Me | single bond | H | c-Pr[1-(5,6-dihydro-1,4,2-dioxazin-3-yl)] | H | Cl | Me | O |
| D-12079 | Me(R) | single bond | H | c-Pr[1-(5,6-dihydro-1,4,2-dioxazin-3-yl)] | H | Cl | Me | O |
| D-12080 | Me(S) | single bond | H | c-Pr[1-(5,6-dihydro-1,4,2-dioxazin-3-yl)] | H | Cl | Me | O |
| D-12081 | H | single bond | Me | c-Pr[1-(5,6-dihydro-1,4,2-dioxazin-3-yl)] | H | Me | Me | O |
| D-12082 | Me | single bond | H | c-Pr[1-(5,6-dihydro-1,4,2-dioxazin-3-yl)] | H | Me | Me | O |
| D-12083 | Me(R) | single bond | H | c-Pr[1-(5,6-dihydro-1,4,2-dioxazin-3-yl)] | H | Me | Me | O |
| D-12084 | Me(S) | single bond | H | c-Pr[1-(5,6-dihydro-1,4,2-dioxazin-3-yl)] | H | Me | Me | O |
| D-12085 | H | single bond | Me | c-Pr[1-(5-hydroxy-1,3,4-oxadiazol-2-yl)] | H | Cl | Me | O |
| D-12086 | Me | single bond | H | c-Pr[1-(5-hydroxy-1,3,4-oxadiazol-2-yl)] | H | Cl | Me | O |
| D-12087 | Me(R) | single bond | H | c-Pr[1-(5-hydroxy-1,3,4-oxadiazol-2-yl)] | H | Cl | Me | O |
| D-12088 | Me(S) | single bond | H | c-Pr[1-(5-hydroxy-1,3,4-oxadiazol-2-yl)] | H | Cl | Me | O |
| D-12089 | H | single bond | Me | c-Pr[1-(5-hydroxy-1,3,4-oxadiazol-2-yl)] | H | Me | Me | O |
| D-12090 | Me | single bond | H | c-Pr[1-(5-hydroxy-1,3,4-oxadiazol-2-yl)] | H | Me | Me | O |
| D-12091 | Me(R) | single bond | H | c-Pr[1-(5-hydroxy-1,3,4-oxadiazol-2-yl)] | H | Me | Me | O |
| D-12092 | Me(S) | single bond | H | c-Pr[1-(5-hydroxy-1,3,4-oxadiazol-2-yl)] | H | Me | Me | O |
| D-12093 | H | single bond | Me | c-Pr[1-(pyrimidin-2-yl)] | H | Cl | Me | O |
| D-12094 | Me | single bond | H | c-Pr[1-(pyrimidin-2-yl)] | H | Cl | Me | O |
| D-12095 | Me(R) | single bond | H | c-Pr[1-(pyrimidin-2-yl)] | H | Cl | Me | O |
| D-12096 | Me(S) | single bond | H | c-Pr[1-(pyrimidin-2-yl)] | H | Cl | Me | O |
| D-12097 | H | single bond | Me | c-Pr[1-(pyrimidin-2-yl)] | H | Me | Me | O |
| D-12098 | Me | single bond | H | c-Pr[1-(pyrimidin-2-yl)] | H | Me | Me | O |
| D-12099 | Me(R) | single bond | H | c-Pr[1-(pyrimidin-2-yl)] | H | Me | Me | O |
| D-12100 | Me(S) | single bond | H | c-Pr[1-(pyrimidin-2-yl)] | H | Me | Me | O |
| D-12101 | H | single bond | Me | t-Bu | H | Cl | Me | O |
| D-12102 | Me | single bond | H | t-Bu | H | Cl | Me | O |
| D-12103 | Me(R) | single bond | H | t-Bu | H | Cl | Me | O |
| D-12104 | Me(S) | single bond | H | t-Bu | H | Cl | Me | O |
| D-12105 | H | single bond | Me | t-Bu | H | Me | Me | O |
| D-12106 | Me | single bond | H | t-Bu | H | Me | Me | O |
| D-12107 | Me(R) | single bond | H | t-Bu | H | Me | Me | O |
| D-12108 | Me(S) | single bond | H | t-Bu | H | Me | Me | O |
| D-12109 | H | single bond | Me | c-Bu | H | Cl | Me | O |
| D-12110 | Me | single bond | H | c-Bu | H | Cl | Me | O |
| D-12111 | Me(R) | single bond | H | c-Bu | H | Cl | Me | O |
| D-12112 | Me(S) | single bond | H | c-Bu | H | Cl | Me | O |
| D-12113 | H | single bond | Me | c-Bu | H | Me | Me | O |
| D-12114 | Me | single bond | H | c-Bu | H | Me | Me | O |
| D-12115 | Me(R) | single bond | H | c-Bu | H | Me | Me | O |
| D-12116 | Me(S) | single bond | H | c-Bu | H | Me | Me | O |
| D-12117 | H | single bond | Me | c-Bu(1-CN) | H | Cl | Me | O |
| D-12118 | Me | single bond | H | c-Bu(1-CN) | H | Cl | Me | O |

TABLE 922

| Compound Number | Y | W | Z | $R^1$ | $R^2$ | $R^3$ | $R^{10}$ | A |
|---|---|---|---|---|---|---|---|---|
| D-12119 | Me(R) | single bond | H | c-Bu(1-CN) | H | Cl | Me | O |
| D-12120 | Me(S) | single bond | H | c-Bu(1-CN) | H | Cl | Me | O |
| D-12121 | H | single bond | Me | c-Bu(1-CN) | H | Me | Me | O |
| D-12122 | Me | single bond | H | c-Bu(1-CN) | H | Me | Me | O |
| D-12123 | Me(R) | single bond | H | c-Bu(1-CN) | H | Me | Me | O |
| D-12124 | Me(S) | single bond | H | c-Bu(1-CN) | H | Me | Me | O |
| D-12125 | H | single bond | Me | c-Bu(3,3-$F_2$) | H | Cl | Me | O |
| D-12126 | Me | single bond | H | c-Bu(3,3-$F_2$) | H | Cl | Me | O |
| D-12127 | Me(R) | single bond | H | c-Bu(3,3-$F_2$) | H | Cl | Me | O |
| D-12128 | Me(S) | single bond | H | c-Bu(3,3-$F_2$) | H | Cl | Me | O |
| D-12129 | H | single bond | Me | c-Bu(3,3-$F_2$) | H | Me | Me | O |
| D-12130 | Me | single bond | H | c-Bu(3,3-$F_2$) | H | Me | Me | O |
| D-12131 | Me(R) | single bond | H | c-Bu(3,3-$F_2$) | H | Me | Me | O |
| D-12132 | Me(S) | single bond | H | c-Bu(3,3-$F_2$) | H | Me | Me | O |
| D-12133 | H | single bond | Me | oxetan-3-yl | H | Cl | Me | O |
| D-12134 | Me | single bond | H | oxetan-3-yl | H | Cl | Me | O |
| D-12135 | Me(R) | single bond | H | oxetan-3-yl | H | Cl | Me | O |
| D-12136 | Me(S) | single bond | H | oxetan-3-yl | H | Cl | Me | O |
| D-12137 | H | single bond | Me | oxetan-3-yl | H | Me | Me | O |
| D-12138 | Me | single bond | H | oxetan-3-yl | H | Me | Me | O |
| D-12139 | Me(R) | single bond | H | oxetan-3-yl | H | Me | Me | O |
| D-12140 | Me(S) | single bond | H | oxetan-3-yl | H | Me | Me | O |
| D-12141 | H | single bond | Me | oxetan(3-CN)-3-yl | H | Cl | Me | O |
| D-12142 | Me | single bond | H | oxetan(3-CN)-3-yl | H | Cl | Me | O |
| D-12143 | Me(R) | single bond | H | oxetan(3-CN)-3-yl | H | Cl | Me | O |
| D-12144 | Me(S) | single bond | H | oxetan(3-CN)-3-yl | H | Cl | Me | O |
| D-12145 | H | single bond | Me | oxetan(3-CN)-3-yl | H | Me | Me | O |
| D-12146 | Me | single bond | H | oxetan(3-CN)-3-yl | H | Me | Me | O |
| D-12147 | Me(R) | single bond | H | oxetan(3-CN)-3-yl | H | Me | Me | O |
| D-12148 | Me(S) | single bond | H | oxetan(3-CN)-3-yl | H | Me | Me | O |
| D-12149 | H | single bond | Me | azetidin[1-C(═O)Me]-3-yl | H | Cl | Me | O |
| D-12150 | Me | single bond | H | azetidin[1-C(═O)Me]-3-yl | H | Cl | Me | O |
| D-12151 | Me(R) | single bond | H | azetidin[1-C(═O)Me]-3-yl | H | Cl | Me | O |
| D-12152 | Me(S) | single bond | H | azetidin[1-C(═O)Me]-3-yl | H | Cl | Me | O |
| D-12153 | H | single bond | Me | azetidin[1-C(═O)Me]-3-yl | H | Me | Me | O |
| D-12154 | Me | single bond | H | azetidin[1-C(═O)Me]-3-yl | H | Me | Me | O |
| D-12155 | Me(R) | single bond | H | azetidin[1-C(═O)Me]-3-yl | H | Me | Me | O |
| D-12156 | Me(S) | single bond | H | azetidin[1-C(═O)Me]-3-yl | H | Me | Me | O |
| D-12157 | H | single bond | Me | azetidin[1-S(═O)$_2$Me]-3-yl | H | Cl | Me | O |
| D-12158 | Me | single bond | H | azetidin[1-S(═O)$_2$Me]-3-yl | H | Cl | Me | O |
| D-12159 | Me(R) | single bond | H | azetidin[1-S(═O)$_2$Me]-3-yl | H | Cl | Me | O |
| D-12160 | Me(S) | single bond | H | azetidin[1-S(═O)$_2$Me]-3-yl | H | Cl | Me | O |
| D-12161 | H | single bond | Me | azetidin[1-S(═O)$_2$Me]-3-yl | H | Me | Me | O |
| D-12162 | Me | single bond | H | azetidin[1-S(═O)$_2$Me]-3-yl | H | Me | Me | O |

TABLE 923

| Compound Number | Y | W | Z | $R^1$ | $R^2$ | $R^3$ | $R^{10}$ | A |
|---|---|---|---|---|---|---|---|---|
| D-12163 | Me(R) | single bond | H | azetidin[1-S(═O)$_2$Me]-3-yl | H | Me | Me | O |
| D-12164 | Me(S) | single bond | H | azetidin[1-S(═O)$_2$Me]-3-yl | H | Me | Me | O |
| D-12165 | H | single bond | Me | azetidin[1-S(═O)$_2$CHF$_2$]-3-yl | H | Cl | Me | O |
| D-12166 | Me | single bond | H | azetidin[1-S(═O)$_2$CHF$_2$]-3-yl | H | Cl | Me | O |
| D-12167 | Me(R) | single bond | H | azetidin[1-S(═O)$_2$CHF$_2$]-3-yl | H | Cl | Me | O |
| D-12168 | Me(S) | single bond | H | azetidin[1-S(═O)$_2$CHF$_2$]-3-yl | H | Cl | Me | O |
| D-12169 | H | single bond | Me | azetidin[1-S(═O)$_2$CHF$_2$]-3-yl | H | Me | Me | O |
| D-12170 | Me | single bond | H | azetidin[1-S(═O)$_2$CHF$_2$]-3-yl | H | Me | Me | O |
| D-12171 | Me(R) | single bond | H | azetidin[1-S(═O)$_2$CHF$_2$]-3-yl | H | Me | Me | O |
| D-12172 | Me(S) | single bond | H | azetidin[1-S(═O)$_2$CHF$_2$]-3-yl | H | Me | Me | O |
| D-12173 | H | single bond | Me | c-Pen | H | Cl | Me | O |
| D-12174 | Me | single bond | H | c-Pen | H | Cl | Me | O |
| D-12175 | Me(R) | single bond | H | c-Pen | H | Cl | Me | O |
| D-12176 | Me(S) | single bond | H | c-Pen | H | Cl | Me | O |
| D-12177 | H | single bond | Me | c-Pen | H | Me | Me | O |
| D-12178 | Me | single bond | H | c-Pen | H | Me | Me | O |
| D-12179 | Me(R) | single bond | H | c-Pen | H | Me | Me | O |
| D-12180 | Me(S) | single bond | H | c-Pen | H | Me | Me | O |
| D-12181 | H | single bond | Me | tetrahydrofuran-3-yl | H | Cl | Me | O |
| D-12182 | Me | single bond | H | tetrahydrofuran-3-yl | H | Cl | Me | O |
| D-12183 | Me(R) | single bond | H | tetrahydrofuran-3-yl | H | Cl | Me | O |

TABLE 923-continued

| Compound Number | Y | W | Z | $R^1$ | $R^2$ | $R^3$ | $R^{10}$ | A |
|---|---|---|---|---|---|---|---|---|
| D-12184 | Me(S) | single bond | H | tetrahydrofuran-3-yl | H | Cl | Me | O |
| D-12185 | H | single bond | Me | tetrahydrofuran-3-yl | H | Me | Me | O |
| D-12186 | Me | single bond | H | tetrahydrofuran-3-yl | H | Me | Me | O |
| D-12187 | Me(R) | single bond | H | tetrahydrofuran-3-yl | H | Me | Me | O |
| D-12188 | Me(S) | single bond | H | tetrahydrofuran-3-yl | H | Me | Me | O |
| D-12189 | H | single bond | Me | tetrahydrothiophen-3-yl | H | Cl | Me | O |
| D-12190 | Me | single bond | H | tetrahydrothiophen-3-yl | H | Cl | Me | O |
| D-12191 | Me(R) | single bond | H | tetrahydrothiophen-3-yl | H | Cl | Me | O |
| D-12192 | Me(S) | single bond | H | tetrahydrothiophen-3-yl | H | Cl | Me | O |
| D-12193 | H | single bond | Me | tetrahydrothiophen-3-yl | H | Me | Me | O |
| D-12194 | Me | single bond | H | tetrahydrothiophen-3-yl | H | Me | Me | O |
| D-12195 | Me(R) | single bond | H | tetrahydrothiophen-3-yl | H | Me | Me | O |
| D-12196 | Me(S) | single bond | H | tetrahydrothiophen-3-yl | H | Me | Me | O |
| D-12197 | H | single bond | Me | c-Pen(1-CN) | H | Cl | Me | O |
| D-12198 | Me | single bond | H | c-Pen(1-CN) | H | Cl | Me | O |
| D-12199 | Me(R) | single bond | H | c-Pen(1-CN) | H | Cl | Me | O |
| D-12200 | Me(S) | single bond | H | c-Pen(1-CN) | H | Cl | Me | O |
| D-12201 | H | single bond | Me | c-Pen(1-CN) | H | Me | Me | O |
| D-12202 | Me | single bond | H | c-Pen(1-CN) | H | Me | Me | O |
| D-12203 | Me(R) | single bond | H | c-Pen(1-CN) | H | Me | Me | O |
| D-12204 | Me(S) | single bond | H | c-Pen(1-CN) | H | Me | Me | O |
| D-12205 | H | single bond | Me | tetrahydrofuran(3-CN)-3-yl | H | Cl | Me | O |
| D-12206 | Me | single bond | H | tetrahydrofuran(3-CN)-3-yl | H | Cl | Me | O |

TABLE 924

| Compound Number | Y | W | Z | $R^1$ | $R^2$ | $R^3$ | $R^{10}$ | A |
|---|---|---|---|---|---|---|---|---|
| D-12207 | Me(R) | single bond | H | tetrahydrofuran(3-CN)-3-yl | H | Cl | Me | O |
| D-12208 | Me(S) | single bond | H | tetrahydrofuran(3-CN)-3-yl | H | Cl | Me | O |
| D-12209 | H | single bond | Me | tetrahydrofuran(3-CN)-3-yl | H | Me | Me | O |
| D-12210 | Me | single bond | H | tetrahydrofuran(3-CN)-3-yl | H | Me | Me | O |
| D-12211 | Me(R) | single bond | H | tetrahydrofuran(3-CN)-3-yl | H | Me | Me | O |
| D-12212 | Me(S) | single bond | H | tetrahydrofuran(3-CN)-3-yl | H | Me | Me | O |
| D-12213 | H | single bond | Me | tetrahydrothiophen(3-CN)-3-yl | H | Cl | Me | O |
| D-12214 | Me | single bond | H | tetrahydrothiophen(3-CN)-3-yl | H | Cl | Me | O |
| D-12215 | Me(R) | single bond | H | tetrahydrothiophen(3-CN)-3-yl | H | Cl | Me | O |
| D-12216 | Me(S) | single bond | H | tetrahydrothiophen(3-CN)-3-yl | H | Cl | Me | O |
| D-12217 | H | single bond | Me | tetrahydrothiophen(3-CN)-3-yl | H | Me | Me | O |
| D-12218 | Me | single bond | H | tetrahydrothiophen(3-CN)-3-yl | H | Me | Me | O |
| D-12219 | Me(R) | single bond | H | tetrahydrothiophen(3-CN)-3-yl | H | Me | Me | O |
| D-12220 | Me(S) | single bond | H | tetrahydrothiophen(3-CN)-3-yl | H | Me | Me | O |
| D-12221 | H | single bond | Me | bicyclo[1.1.1]pentan-1-yl | H | Cl | Me | O |
| D-12222 | Me | single bond | H | bicyclo[1.1.1]pentan-1-yl | H | Cl | Me | O |
| D-12223 | Me(R) | single bond | H | bicyclo[1.1.1]pentan-1-yl | H | Cl | Me | O |
| D-12224 | Me(S) | single bond | H | bicyclo[1.1.1]pentan-1-yl | H | Cl | Me | O |
| D-12225 | H | single bond | Me | bicyclo[1.1.1]pentan-1-yl | H | Me | Me | O |
| D-12226 | Me | single bond | H | bicyclo[1.1.1]pentan-1-yl | H | Me | Me | O |
| D-12227 | Me(R) | single bond | H | bicyclo[1.1.1]pentan-1-yl | H | Me | Me | O |
| D-12228 | Me(S) | single bond | H | bicyclo[1.1.1]pentan-1-yl | H | Me | Me | O |
| D-12229 | H | single bond | Me | c-Hex | H | Cl | Me | O |
| D-12230 | Me | single bond | H | c-Hex | H | Cl | Me | O |
| D-12231 | Me(R) | single bond | H | c-Hex | H | Cl | Me | O |
| D-12232 | Me(S) | single bond | H | c-Hex | H | Cl | Me | O |
| D-12233 | H | single bond | Me | c-Hex | H | Me | Me | O |
| D-12234 | Me | single bond | H | c-Hex | H | Me | Me | O |
| D-12235 | Me(R) | single bond | H | c-Hex | H | Me | Me | O |
| D-12236 | Me(S) | single bond | H | c-Hex | H | Me | Me | O |
| D-12237 | H | single bond | Me | tetrahydropyran-4-yl | H | Cl | Me | O |
| D-12238 | Me | single bond | H | tetrahydropyran-4-yl | H | Cl | Me | O |
| D-12239 | Me(R) | single bond | H | tetrahydropyran-4-yl | H | Cl | Me | O |
| D-12240 | Me(S) | single bond | H | tetrahydropyran-4-yl | H | Cl | Me | O |
| D-12241 | H | single bond | Me | tetrahydropyran-4-yl | H | Me | Me | O |
| D-12242 | Me | single bond | H | tetrahydropyran-4-yl | H | Me | Me | O |
| D-12243 | Me(R) | single bond | H | tetrahydropyran-4-yl | H | Me | Me | O |
| D-12244 | Me(S) | single bond | H | tetrahydropyran-4-yl | H | Me | Me | O |
| D-12245 | H | single bond | Me | tetrahydrothiopyran-4-yl | H | Cl | Me | O |
| D-12246 | Me | single bond | H | tetrahydrothiopyran-4-yl | H | Cl | Me | O |
| D-12247 | Me(R) | single bond | H | tetrahydrothiopyran-4-yl | H | Cl | Me | O |
| D-12248 | Me(S) | single bond | H | tetrahydrothiopyran-4-yl | H | Cl | Me | O |

TABLE 924-continued

| Compound Number | Y | W | Z | $R^1$ | $R^2$ | $R^3$ | $R^{10}$ | A |
|---|---|---|---|---|---|---|---|---|
| D-12249 | H | single bond | Me | tetrahydrothiopyran-4-yl | H | Me | Me | O |
| D-12250 | Me | single bond | H | tetrahydrothiopyran-4-yl | H | Me | Me | O |

TABLE 925

| Compound Number | Y | W | Z | $R^1$ | $R^2$ | $R^3$ | $R^{10}$ | A |
|---|---|---|---|---|---|---|---|---|
| D-12251 | Me(R) | single bond | H | tetrahydrothiopyran-4-yl | H | Me | Me | O |
| D-12252 | Me(S) | single bond | H | tetrahydrothiopyran-4-yl | H | Me | Me | O |
| D-12253 | H | single bond | Me | c-Hex(1-CN) | H | Cl | Me | O |
| D-12254 | Me | single bond | H | c-Hex(1-CN) | H | Cl | Me | O |
| D-12255 | Me(R) | single bond | H | c-Hex(1-CN) | H | Cl | Me | O |
| D-12256 | Me(S) | single bond | H | c-Hex(1-CN) | H | Cl | Me | O |
| D-12257 | H | single bond | Me | c-Hex(1-CN) | H | Me | Me | O |
| D-12258 | Me | single bond | H | c-Hex(1-CN) | H | Me | Me | O |
| D-12259 | Me(R) | single bond | H | c-Hex(1-CN) | H | Me | Me | O |
| D-12260 | Me(S) | single bond | H | c-Hex(1-CN) | H | Me | Me | O |
| D-12261 | H | single bond | Me | tetrahydropyran(4-CN)-4-yl | H | Cl | Me | O |
| D-12262 | Me | single bond | H | tetrahydropyran(4-CN)-4-yl | H | Cl | Me | O |
| D-12263 | Me(R) | single bond | H | tetrahydropyran(4-CN)-4-yl | H | Cl | Me | O |
| D-12264 | Me(S) | single bond | H | tetrahydropyran(4-CN)-4-yl | H | Cl | Me | O |
| D-12265 | H | single bond | Me | tetrahydropyran(4-CN)-4-yl | H | Me | Me | O |
| D-12266 | Me | single bond | H | tetrahydropyran(4-CN)-4-yl | H | Me | Me | O |
| D-12267 | Me(R) | single bond | H | tetrahydropyran(4-CN)-4-yl | H | Me | Me | O |
| D-12268 | Me(S) | single bond | H | tetrahydropyran(4-CN)-4-yl | H | Me | Me | O |
| D-12269 | H | single bond | Me | tetrahydrothiopyran(4-CN)-4-yl | H | Cl | Me | O |
| D-12270 | Me | single bond | H | tetrahydrothiopyran(4-CN)-4-yl | H | Cl | Me | O |
| D-12271 | Me(R) | single bond | H | tetrahydrothiopyran(4-CN)-4-yl | H | Cl | Me | O |
| D-12272 | Me(S) | single bond | H | tetrahydrothiopyran(4-CN)-4-yl | H | Cl | Me | O |
| D-12273 | H | single bond | Me | tetrahydrothiopyran(4-CN)-4-yl | H | Me | Me | O |
| D-12274 | Me | single bond | H | tetrahydrothiopyran(4-CN)-4-yl | H | Me | Me | O |
| D-12275 | Me(R) | single bond | H | tetrahydrothiopyran(4-CN)-4-yl | H | Me | Me | O |
| D-12276 | Me(S) | single bond | H | tetrahydrothiopyran(4-CN)-4-yl | H | Me | Me | O |
| D-12277 | H | single bond | Me | $CH_2$(c-Pr) | H | Cl | Me | O |
| D-12278 | Me | single bond | H | $CH_2$(c-Pr) | H | Cl | Me | O |
| D-12279 | Me(R) | single bond | H | $CH_2$(c-Pr) | H | Cl | Me | O |
| D-12280 | Me(S) | single bond | H | $CH_2$(c-Pr) | H | Cl | Me | O |
| D-12281 | H | single bond | Me | $CH_2$(c-Pr) | H | Me | Me | O |
| D-12282 | Me | single bond | H | $CH_2$(c-Pr) | H | Me | Me | O |
| D-12283 | Me(R) | single bond | H | $CH_2$(c-Pr) | H | Me | Me | O |
| D-12284 | Me(S) | single bond | H | $CH_2$(c-Pr) | H | Me | Me | O |
| D-12285 | H | single bond | Me | $CH_2$[c-Pr(1-CN)] | H | Cl | Me | O |
| D-12286 | Me | single bond | H | $CH_2$[c-Pr(1-CN)] | H | Cl | Me | O |
| D-12287 | Me(R) | single bond | H | $CH_2$[c-Pr(1-CN)] | H | Cl | Me | O |
| D-12288 | Me(S) | single bond | H | $CH_2$[c-Pr(1-CN)] | H | Cl | Me | O |
| D-12289 | H | single bond | Me | $CH_2$[c-Pr(1-CN)] | H | Me | Me | O |
| D-12290 | Me | single bond | H | $CH_2$[c-Pr(1-CN)] | H | Me | Me | O |
| D-12291 | Me(R) | single bond | H | $CH_2$[c-Pr(1-CN)] | H | Me | Me | O |
| D-12292 | Me(S) | single bond | H | $CH_2$[c-Pr(1-CN)] | H | Me | Me | O |
| D-12293 | H | single bond | Me | CH(Me)(c-Pr) | H | Cl | Me | O |
| D-12294 | Me | single bond | H | CH(Me)(c-Pr) | H | Cl | Me | O |

TABLE 926

| Compound Number | Y | W | Z | $R^1$ | $R^2$ | $R^3$ | $R^{10}$ | A |
|---|---|---|---|---|---|---|---|---|
| D-12295 | Me(R) | single bond | H | CH(Me)(c-Pr) | H | Cl | Me | O |
| D-12296 | Me(S) | single bond | H | CH(Me)(c-Pr) | H | Cl | Me | O |
| D-12297 | H | single bond | Me | CH(Me)(c-Pr) | H | Me | Me | O |
| D-12298 | Me | single bond | H | CH(Me)(c-Pr) | H | Me | Me | O |
| D-12299 | Me(R) | single bond | H | CH(Me)(c-Pr) | H | Me | Me | O |
| D-12300 | Me(S) | single bond | H | CH(Me)(c-Pr) | H | Me | Me | O |
| D-12301 | H | single bond | Me | CH(Me)$CH_2$OMe | H | Cl | Me | O |
| D-12302 | Me | single bond | H | CH(Me)$CH_2$OMe | H | Cl | Me | O |
| D-12303 | Me(R) | single bond | H | CH(Me)$CH_2$OMe | H | Cl | Me | O |
| D-12304 | Me(S) | single bond | H | CH(Me)$CH_2$OMe | H | Cl | Me | O |
| D-12305 | H | single bond | Me | CH(Me)$CH_2$OMe | H | Me | Me | O |
| D-12306 | Me | single bond | H | CH(Me)$CH_2$OMe | H | Me | Me | O |

TABLE 926-continued

| Compound Number | Y | W | Z | $R^1$ | $R^2$ | $R^3$ | $R^{10}$ | A |
|---|---|---|---|---|---|---|---|---|
| D-12307 | Me(R) | single bond | H | $CH(Me)CH_2OMe$ | H | Me | Me | O |
| D-12308 | Me(S) | single bond | H | $CH(Me)CH_2OMe$ | H | Me | Me | O |
| D-12309 | H | single bond | Me | $CH_2CH{=}CH_2$ | H | Cl | Me | O |
| D-12310 | Me | single bond | H | $CH_2CH{=}CH_2$ | H | Cl | Me | O |
| D-12311 | Me(R) | single bond | H | $CH_2CH{=}CH_2$ | H | Cl | Me | O |
| D-12312 | Me(S) | single bond | H | $CH_2CH{=}CH_2$ | H | Cl | Me | O |
| D-12313 | H | single bond | Me | $CH_2CH{=}CH_2$ | H | Me | Me | O |
| D-12314 | Me | single bond | H | $CH_2CH{=}CH_2$ | H | Me | Me | O |
| D-12315 | Me(R) | single bond | H | $CH_2CH{=}CH_2$ | H | Me | Me | O |
| D-12316 | Me(S) | single bond | H | $CH_2CH{=}CH_2$ | H | Me | Me | O |
| D-12317 | H | single bond | Me | $CH_2C{\equiv}CH$ | H | Cl | Me | O |
| D-12318 | Me | single bond | H | $CH_2C{\equiv}CH$ | H | Cl | Me | O |
| D-12319 | Me(R) | single bond | H | $CH_2C{\equiv}CH$ | H | Cl | Me | O |
| D-12320 | Me(S) | single bond | H | $CH_2C{\equiv}CH$ | H | Cl | Me | O |
| D-12321 | H | single bond | Me | $CH_2C{\equiv}CH$ | H | Me | Me | O |
| D-12322 | Me | single bond | H | $CH_2C{\equiv}CH$ | H | Me | Me | O |
| D-12323 | Me(R) | single bond | H | $CH_2C{\equiv}CH$ | H | Me | Me | O |
| D-12324 | Me(S) | single bond | H | $CH_2C{\equiv}CH$ | H | Me | Me | O |
| D-12325 | H | single bond | Me | $CH_2CN$ | H | Cl | Me | O |
| D-12326 | Me | single bond | H | $CH_2CN$ | H | Cl | Me | O |
| D-12327 | Me(R) | single bond | H | $CH_2CN$ | H | Cl | Me | O |
| D-12328 | Me(S) | single bond | H | $CH_2CN$ | H | Cl | Me | O |
| D-12329 | H | single bond | Me | $CH_2CN$ | H | Me | Me | O |
| D-12330 | Me | single bond | H | $CH_2CN$ | H | Me | Me | O |
| D-12331 | Me(R) | single bond | H | $CH_2CN$ | H | Me | Me | O |
| D-12332 | Me(S) | single bond | H | $CH_2CN$ | H | Me | Me | O |
| D-12333 | H | single bond | Me | CH(Me)CN | H | Cl | Me | O |
| D-12334 | Me | single bond | H | CH(Me)CN | H | Cl | Me | O |
| D-12335 | Me(R) | single bond | H | CH(Me)CN | H | Cl | Me | O |
| D-12336 | Me(S) | single bond | H | CH(Me)CN | H | Cl | Me | O |
| D-12337 | H | single bond | Me | CH(Me)CN | H | Me | Me | O |
| D-12338 | Me | single bond | H | CH(Me)CN | H | Me | Me | O |

TABLE 927

| Compound Number | Y | W | Z | $R^1$ | $R^2$ | $R^3$ | $R^{10}$ | A |
|---|---|---|---|---|---|---|---|---|
| D-12339 | Me(R) | single bond | H | CH(Me)CN | H | Me | Me | O |
| D-12340 | Me(S) | single bond | H | CH(Me)CN | H | Me | Me | O |
| D-12341 | H | single bond | Me | $C(Me)_2CN$ | H | Cl | Me | O |
| D-12342 | Me | single bond | H | $C(Me)_2CN$ | H | Cl | Me | O |
| D-12343 | Me(R) | single bond | H | $C(Me)_2CN$ | H | Cl | Me | O |
| D-12344 | Me(S) | single bond | H | $C(Me)_2CN$ | H | Cl | Me | O |
| D-12345 | H | single bond | Me | $C(Me)_2CN$ | H | Me | Me | O |
| D-12346 | Me | single bond | H | $C(Me)_2CN$ | H | Me | Me | O |
| D-12347 | Me(R) | single bond | H | $C(Me)_2CN$ | H | Me | Me | O |
| D-12348 | Me(S) | single bond | H | $C(Me)_2CN$ | H | Me | Me | O |
| D-12349 | H | single bond | Me | C(Me)(i-Pr)CN | H | Cl | Me | O |
| D-12350 | Me | single bond | H | C(Me)(i-Pr)CN | H | Cl | Me | O |
| D-12351 | Me(R) | single bond | H | C(Me)(i-Pr)CN | H | Cl | Me | O |
| D-12352 | Me(S) | single bond | H | C(Me)(i-Pr)CN | H | Cl | Me | O |
| D-12353 | H | single bond | Me | C(Me)(i-Pr)CN | H | Me | Me | O |
| D-12354 | Me | single bond | H | C(Me)(i-Pr)CN | H | Me | Me | O |
| D-12355 | Me(R) | single bond | H | C(Me)(i-Pr)CN | H | Me | Me | O |
| D-12356 | Me(S) | single bond | H | C(Me)(i-Pr)CN | H | Me | Me | O |
| D-12357 | H | single bond | Me | OMe | H | Cl | Me | O |
| D-12358 | Me | single bond | H | OMe | H | Cl | Me | O |
| D-12359 | Me(R) | single bond | H | OMe | H | Cl | Me | O |
| D-12360 | Me(S) | single bond | H | OMe | H | Cl | Me | O |
| D-12361 | H | single bond | Me | OMe | H | Me | Me | O |

TABLE 927-continued

| Compound Number | Y | W | Z | $R^1$ | $R^2$ | $R^3$ | $R^{10}$ | A |
|---|---|---|---|---|---|---|---|---|
| D-12362 | Me | single bond | H | OMe | H | Me | Me | O |
| D-12363 | Me(R) | single bond | H | OMe | H | Me | Me | O |
| D-12364 | Me(S) | single bond | H | OMe | H | Me | Me | O |
| D-12365 | H | single bond | Me | CH=NOMe | H | Cl | Me | O |
| D-12366 | Me | single bond | H | CH=NOMe | H | Cl | Me | O |
| D-12367 | Me(R) | single bond | H | CH=NOMe | H | Cl | Me | O |
| D-12368 | Me(S) | single bond | H | CH=NOMe | H | Cl | Me | O |
| D-12369 | H | single bond | Me | CH=NOMe | H | Me | Me | O |
| D-12370 | Me | single bond | H | CH=NOMe | H | Me | Me | O |
| D-12371 | Me(R) | single bond | H | CH=NOMe | H | Me | Me | O |
| D-12372 | Me(S) | single bond | H | CH=NOMe | H | Me | Me | O |
| D-12373 | H | single bond | Me | morpholin-4-yl | H | Cl | Me | O |
| D-12374 | Me | single bond | H | morpholin-4-yl | H | Cl | Me | O |
| D-12375 | Me(R) | single bond | H | morpholin-4-yl | H | Cl | Me | O |
| D-12376 | Me(S) | single bond | H | morpholin-4-yl | H | Cl | Me | O |
| D-12377 | H | single bond | Me | morpholin-4-yl | H | Me | Me | O |
| D-12378 | Me | single bond | H | morpholin-4-yl | H | Me | Me | O |
| D-12379 | Me(R) | single bond | H | morpholin-4-yl | H | Me | Me | O |
| D-12380 | Me(S) | single bond | H | morpholin-4-yl | H | Me | Me | O |
| D-12381 | H | single bond | Me | Ph | H | Cl | Me | O |
| D-12382 | Me | single bond | H | Ph | H | Cl | Me | O |

TABLE 928

| Compound Number | Y | W | Z | $R^1$ | $R^2$ | $R^3$ | $R^{10}$ | A |
|---|---|---|---|---|---|---|---|---|
| D-12383 | Me(R) | single bond | H | Ph | H | Cl | Me | O |
| D-12384 | Me(S) | single bond | H | Ph | H | Cl | Me | O |
| D-12385 | H | single bond | Me | Ph | H | Me | Me | O |
| D-12386 | Me | single bond | H | Ph | H | Me | Me | O |
| D-12387 | Me(R) | single bond | H | Ph | H | Me | Me | O |
| D-12388 | Me(S) | single bond | H | Ph | H | Me | Me | O |

TABLE 928-continued

| Compound Number | Y | W | Z | $R^1$ | $R^2$ | $R^3$ | $R^{10}$ | A |
|---|---|---|---|---|---|---|---|---|
| D-12389 | H | single bond | Me | $CH_2Ph$ | H | Cl | Me | O |
| D-12390 | Me | single bond | H | $CH_2Ph$ | H | Cl | Me | O |
| D-12391 | Me(R) | single bond | H | $CH_2Ph$ | H | Cl | Me | O |
| D-12392 | Me(S) | single bond | H | $CH_2Ph$ | H | Cl | Me | O |
| D-12393 | H | single bond | Me | $CH_2Ph$ | H | Me | Me | O |
| D-12394 | Me | single bond | H | $CH_2Ph$ | H | Me | Me | O |
| D-12395 | Me(R) | single bond | H | $CH_2Ph$ | H | Me | Me | O |
| D-12396 | Me(S) | single bond | H | $CH_2Ph$ | H | Me | Me | O |
| D-12397 | H | single bond | Me | thiazole-2-yl | H | Cl | Me | O |
| D-12398 | Me | single bond | H | thiazole-2-yl | H | Cl | Me | O |
| D-12399 | Me(R) | single bond | H | thiazole-2-yl | H | Cl | Me | O |
| D-12400 | Me(S) | single bond | H | thiazole-2-yl | H | Cl | Me | O |
| D-12401 | H | single bond | Me | thiazole-2-yl | H | Me | Me | O |
| D-12402 | Me | single bond | H | thiazole-2-yl | H | Me | Me | O |
| D-12403 | Me(R) | single bond | H | thiazole-2-yl | H | Me | Me | O |
| D-12404 | Me(S) | single bond | H | thiazole-2-yl | H | Me | Me | O |
| D-12405 | H | single bond | Me | 1-Me-pyrazol-3-yl | H | Cl | Me | O |
| D-12406 | Me | single bond | H | 1-Me-pyrazol-3-yl | H | Cl | Me | O |
| D-12407 | Me(R) | single bond | H | 1-Me-pyrazol-3-yl | H | Cl | Me | O |
| D-12408 | Me(S) | single bond | H | 1-Me-pyrazol-3-yl | H | Cl | Me | O |
| D-12409 | H | single bond | Me | 1-Me-pyrazol-3-yl | H | Me | Me | O |
| D-12410 | Me | single bond | H | 1-Me-pyrazol-3-yl | H | Me | Me | O |
| D-12411 | Me(R) | single bond | H | 1-Me-pyrazol-3-yl | H | Me | Me | O |
| D-12412 | Me(S) | single bond | H | 1-Me-pyrazol-3-yl | H | Me | Me | O |
| D-12413 | H | single bond | Me | 1-Me-pyrazol-5-yl | H | Cl | Me | O |
| D-12414 | Me | single bond | H | 1-Me-pyrazol-5-yl | H | Cl | Me | O |
| D-12415 | Me(R) | single bond | H | 1-Me-pyrazol-5-yl | H | Cl | Me | O |
| D-12416 | Me(S) | single bond | H | 1-Me-pyrazol-5-yl | H | Cl | Me | O |
| D-12417 | H | single bond | Me | 1-Me-pyrazol-5-yl | H | Me | Me | O |
| D-12418 | Me | single bond | H | 1-Me-pyrazol-5-yl | H | Me | Me | O |
| D-12419 | Me(R) | single bond | H | 1-Me-pyrazol-5-yl | H | Me | Me | O |
| D-12420 | Me(S) | single bond | H | 1-Me-pyrazol-5-yl | H | Me | Me | O |
| D-12421 | H | single bond | Me | $CH_2$(pyrimidin-2-yl) | H | Cl | Me | O |
| D-12422 | Me | single bond | H | $CH_2$(pyrimidin-2-yl) | H | Cl | Me | O |
| D-12423 | Me(R) | single bond | H | $CH_2$(pyrimidin-2-yl) | H | Cl | Me | O |
| D-12424 | Me(S) | single bond | H | $CH_2$(pyrimidin-2-yl) | H | Cl | Me | O |
| D-12425 | H | single bond | Me | $CH_2$(pyrimidin-2-yl) | H | Me | Me | O |
| D-12426 | Me | single bond | H | $CH_2$(pyrimidin-2-yl) | H | Me | Me | O |

TABLE 929

| Compound Number | Y | W | Z | $R^1$ | $R^2$ | $R^3$ | $R^{10}$ | A |
|---|---|---|---|---|---|---|---|---|
| D-12427 | Me(R) | single bond | H | $CH_2$(pyrimidin-2-yl) | H | Me | Me | O |
| D-12428 | Me(S) | single bond | H | $CH_2$(pyrimidin-2-yl) | H | Me | Me | O |
| D-12429 | H | single bond | Me | $—CH_2CH_2CH_2—$ | H | Cl | Me | O |
| D-12430 | Me | single bond | H | $—CH_2CH_2CH_2—$ | H | Cl | Me | O |
| D-12431 | Me(R) | single bond | H | $—CH_2CH_2CH_2—$ | H | Cl | Me | O |
| D-12432 | Me(S) | single bond | H | $—CH_2CH_2CH_2—$ | H | Cl | Me | O |
| D-12433 | H | single bond | Me | $—CH_2CH_2CH_2—$ | H | Me | Me | O |
| D-12434 | Me | single bond | H | $—CH_2CH_2CH_2—$ | H | Me | Me | O |
| D-12435 | Me(R) | single bond | H | $—CH_2CH_2CH_2—$ | H | Me | Me | O |
| D-12436 | Me(S) | single bond | H | $—CH_2CH_2CH_2—$ | H | Me | Me | O |
| D-12437 | H | single bond | Me | $—CH_2CH_2OCH_2CH_2—$ | H | Cl | Me | O |
| D-12438 | Me | single bond | H | $—CH_2CH_2OCH_2CH_2—$ | H | Cl | Me | O |
| D-12439 | Me(R) | single bond | H | $—CH_2CH_2OCH_2CH_2—$ | H | Cl | Me | O |
| D-12440 | Me(S) | single bond | H | $—CH_2CH_2OCH_2CH_2—$ | H | Cl | Me | O |
| D-12441 | H | single bond | Me | $—CH_2CH_2OCH_2CH_2—$ | H | Me | Me | O |
| D-12442 | Me | single bond | H | $—CH_2CH_2OCH_2CH_2—$ | H | Me | Me | O |
| D-12443 | Me(R) | single bond | H | $—CH_2CH_2OCH_2CH_2—$ | H | Me | Me | O |
| D-12444 | Me(S) | single bond | H | $—CH_2CH_2OCH_2CH_2—$ | H | Me | Me | O |
| D-12445 | H | single bond | Me | Me | H | Cl | $CH_2OMe$ | O |
| D-12446 | Me | single bond | H | Me | H | Cl | $CH_2OMe$ | O |
| D-12447 | Me(R) | single bond | H | Me | H | Cl | $CH_2OMe$ | O |
| D-12448 | Me(S) | single bond | H | Me | H | Cl | $CH_2OMe$ | O |
| D-12449 | H | single bond | Me | Me | H | Me | $CH_2OMe$ | O |
| D-12450 | Me | single bond | H | Me | H | Me | $CH_2OMe$ | O |
| D-12451 | Me(R) | single bond | H | Me | H | Me | $CH_2OMe$ | O |
| D-12452 | Me(S) | single bond | H | Me | H | Me | $CH_2OMe$ | O |
| D-12453 | H | single bond | Me | $CH_2CHF_2$ | H | Cl | $CH_2OMe$ | O |
| D-12454 | Me | single bond | H | $CH_2CHF_2$ | H | Cl | $CH_2OMe$ | O |
| D-12455 | Me(R) | single bond | H | $CH_2CHF_2$ | H | Cl | $CH_2OMe$ | O |

TABLE 929-continued

| Compound Number | Y | W | Z | $R^1$ | $R^2$ | $R^3$ | $R^{10}$ | A |
|---|---|---|---|---|---|---|---|---|
| D-12456 | Me(S) | single bond | H | $CH_2CHF_2$ | H | Cl | $CH_2OMe$ | O |
| D-12457 | H | single bond | Me | $CH_2CHF_2$ | H | Me | $CH_2OMe$ | O |
| D-12458 | Me | single bond | H | $CH_2CHF_2$ | H | Me | $CH_2OMe$ | O |
| D-12459 | Me(R) | single bond | H | $CH_2CHF_2$ | H | Me | $CH_2OMe$ | O |
| D-12460 | Me(S) | single bond | H | $CH_2CHF_2$ | H | Me | $CH_2OMe$ | O |
| D-12461 | H | single bond | Me | n-Pr | H | Cl | $CH_2OMe$ | O |
| D-12462 | Me | single bond | H | n-Pr | H | Cl | $CH_2OMe$ | O |
| D-12463 | Me(R) | single bond | H | n-Pr | H | Cl | $CH_2OMe$ | O |
| D-12464 | Me(S) | single bond | H | n-Pr | H | Cl | $CH_2OMe$ | O |
| D-12465 | H | single bond | Me | n-Pr | H | Me | $CH_2OMe$ | O |
| D-12466 | Me | single bond | H | n-Pr | H | Me | $CH_2OMe$ | O |
| D-12467 | Me(R) | single bond | H | n-Pr | H | Me | $CH_2OMe$ | O |
| D-12468 | Me(S) | single bond | H | n-Pr | H | Me | $CH_2OMe$ | O |
| D-12469 | H | single bond | Me | i-Pr | H | Cl | $CH_2OMe$ | O |
| D-12470 | Me | single bond | H | i-Pr | H | Cl | $CH_2OMe$ | O |

TABLE 930

| Compound Number | Y | W | Z | $R^1$ | $R^2$ | $R^3$ | $R^{10}$ | A |
|---|---|---|---|---|---|---|---|---|
| D-12471 | Me(R) | single bond | H | i-Pr | H | Cl | $CH_2OMe$ | O |
| D-12472 | Me(S) | single bond | H | i-Pr | H | Cl | $CH_2OMe$ | O |
| D-12473 | H | single bond | Me | i-Pr | H | Me | $CH_2OMe$ | O |
| D-12474 | Me | single bond | H | i-Pr | H | Me | $CH_2OMe$ | O |
| D-12475 | Me(R) | single bond | H | i-Pr | H | Me | $CH_2OMe$ | O |
| D-12476 | Me(S) | single bond | H | i-Pr | H | Me | $CH_2OMe$ | O |
| D-12477 | H | single bond | Me | c-Pr(1-F) | H | Cl | $CH_2OMe$ | O |
| D-12478 | Me | single bond | H | c-Pr(1-F) | H | Cl | $CH_2OMe$ | O |
| D-12479 | Me(R) | single bond | H | c-Pr(1-F) | H | Cl | $CH_2OMe$ | O |
| D-12480 | Me(S) | single bond | H | c-Pr(1-F) | H | Cl | $CH_2OMe$ | O |
| D-12481 | H | single bond | Me | c-Pr(1-F) | H | Me | $CH_2OMe$ | O |
| D-12482 | Me | single bond | H | c-Pr(1-F) | H | Me | $CH_2OMe$ | O |
| D-12483 | Me(R) | single bond | H | c-Pr(1-F) | H | Me | $CH_2OMe$ | O |
| D-12484 | Me(S) | single bond | H | c-Pr(1-F) | H | Me | $CH_2OMe$ | O |
| D-12485 | H | single bond | Me | c-Pr(2,2-$F_2$) | H | Cl | $CH_2OMe$ | O |
| D-12486 | Me | single bond | H | c-Pr(2,2-$F_2$) | H | Cl | $CH_2OMe$ | O |
| D-12487 | Me(R) | single bond | H | c-Pr(2,2-$F_2$) | H | Cl | $CH_2OMe$ | O |
| D-12488 | Me(S) | single bond | H | c-Pr(2,2-$F_2$) | H | Cl | $CH_2OMe$ | O |
| D-12489 | H | single bond | Me | c-Pr(2,2-$F_2$) | H | Me | $CH_2OMe$ | O |
| D-12490 | Me | single bond | H | c-Pr(2,2-$F_2$) | H | Me | $CH_2OMe$ | O |
| D-12491 | Me(R) | single bond | H | c-Pr(2,2-$F_2$) | H | Me | $CH_2OMe$ | O |
| D-12492 | Me(S) | single bond | H | c-Pr(2,2-$F_2$) | H | Me | $CH_2OMe$ | O |
| D-12493 | H | single bond | Me | c-Pr(1-Cl) | H | Cl | $CH_2OMe$ | O |
| D-12494 | Me | single bond | H | c-Pr(1-Cl) | H | Cl | $CH_2OMe$ | O |
| D-12495 | Me(R) | single bond | H | c-Pr(1-Cl) | H | Cl | $CH_2OMe$ | O |
| D-12496 | Me(S) | single bond | H | c-Pr(1-Cl) | H | Cl | $CH_2OMe$ | O |
| D-12497 | H | single bond | Me | c-Pr(1-Cl) | H | Me | $CH_2OMe$ | O |
| D-12498 | Me | single bond | H | c-Pr(1-Cl) | H | Me | $CH_2OMe$ | O |
| D-12499 | Me(R) | single bond | H | c-Pr(1-Cl) | H | Me | $CH_2OMe$ | O |
| D-12500 | Me(S) | single bond | H | c-Pr(1-Cl) | H | Me | $CH_2OMe$ | O |
| D-12501 | H | single bond | Me | c-Pr(1-Br) | H | Cl | $CH_2OMe$ | O |
| D-12502 | Me | single bond | H | c-Pr(1-Br) | H | Cl | $CH_2OMe$ | O |
| D-12503 | Me(R) | single bond | H | c-Pr(1-Br) | H | Cl | $CH_2OMe$ | O |
| D-12504 | Me(S) | single bond | H | c-Pr(1-Br) | H | Cl | $CH_2OMe$ | O |
| D-12505 | H | single bond | Me | c-Pr(1-Br) | H | Me | $CH_2OMe$ | O |
| D-12506 | Me | single bond | H | c-Pr(1-Br) | H | Me | $CH_2OMe$ | O |
| D-12507 | Me(R) | single bond | H | c-Pr(1-Br) | H | Me | $CH_2OMe$ | O |
| D-12508 | Me(S) | single bond | H | c-Pr(1-Br) | H | Me | $CH_2OMe$ | O |
| D-12509 | H | single bond | Me | c-Pr(1-Me) | H | Cl | $CH_2OMe$ | O |
| D-12510 | Me | single bond | H | c-Pr(1-Me) | H | Cl | $CH_2OMe$ | O |
| D-12511 | Me(R) | single bond | H | c-Pr(1-Me) | H | Cl | $CH_2OMe$ | O |
| D-12512 | Me(S) | single bond | H | c-Pr(1-Me) | H | Cl | $CH_2OMe$ | O |
| D-12513 | H | single bond | Me | c-Pr(1-Me) | H | Me | $CH_2OMe$ | O |
| D-12514 | Me | single bond | H | c-Pr(1-Me) | H | Me | $CH_2OMe$ | O |

TABLE 931

| Compound Number | Y | W | Z | $R^1$ | $R^2$ | $R^3$ | $R^{10}$ | A |
|---|---|---|---|---|---|---|---|---|
| D-12515 | Me(R) | single bond | H | c-Pr(1-Me) | H | Me | $CH_2OMe$ | O |
| D-12516 | Me(S) | single bond | H | c-Pr(1-Me) | H | Me | $CH_2OMe$ | O |
| D-12517 | H | single bond | Me | c-Pr(1-$CH_2OH$) | H | Cl | $CH_2OMe$ | O |
| D-12518 | Me | single bond | H | c-Pr(1-$CH_2OH$) | H | Cl | $CH_2OMe$ | O |
| D-12519 | Me(R) | single bond | H | c-Pr(1-$CH_2OH$) | H | Cl | $CH_2OMe$ | O |
| D-12520 | Me(S) | single bond | H | c-Pr(1-$CH_2OH$) | H | Cl | $CH_2OMe$ | O |
| D-12521 | H | single bond | Me | c-Pr(1-$CH_2OH$) | H | Me | $CH_2OMe$ | O |
| D-12522 | Me | single bond | H | c-Pr(1-$CH_2OH$) | H | Me | $CH_2OMe$ | O |
| D-12523 | Me(R) | single bond | H | c-Pr(1-$CH_2OH$) | H | Me | $CH_2OMe$ | O |
| D-12524 | Me(S) | single bond | H | c-Pr(1-$CH_2OH$) | H | Me | $CH_2OMe$ | O |
| D-12525 | H | single bond | Me | c-Pr[1-$CH_2OS(=O)_2Me$] | H | Cl | $CH_2OMe$ | O |
| D-12526 | Me | single bond | H | c-Pr[1-$CH_2OS(=O)_2Me$] | H | Cl | $CH_2OMe$ | O |
| D-12527 | Me(R) | single bond | H | c-Pr[1-$CH_2OS(=O)_2Me$] | H | Cl | $CH_2OMe$ | O |
| D-12528 | Me(S) | single bond | H | c-Pr[1-$CH_2OS(=O)_2Me$] | H | Cl | $CH_2OMe$ | O |
| D-12529 | H | single bond | Me | c-Pr[1-$CH_2OS(=O)_2Me$] | H | Me | $CH_2OMe$ | O |
| D-12530 | Me | single bond | H | c-Pr[1-$CH_2OS(=O)_2Me$] | H | Me | $CH_2OMe$ | O |
| D-12531 | Me(R) | single bond | H | c-Pr[1-$CH_2OS(=O)_2Me$] | H | Me | $CH_2OMe$ | O |
| D-12532 | Me(S) | single bond | H | c-Pr[1-$CH_2OS(=O)_2Me$] | H | Me | $CH_2OMe$ | O |
| D-12533 | H | single bond | Me | c-Pr(1-$CH_2OMe$) | H | Cl | $CH_2OMe$ | O |
| D-12534 | Me | single bond | H | c-Pr(1-$CH_2OMe$) | H | Cl | $CH_2OMe$ | O |
| D-12535 | Me(R) | single bond | H | c-Pr(1-$CH_2OMe$) | H | Cl | $CH_2OMe$ | O |
| D-12536 | Me(S) | single bond | H | c-Pr(1-$CH_2OMe$) | H | Cl | $CH_2OMe$ | O |
| D-12537 | H | single bond | Me | c-Pr(1-$CH_2OMe$) | H | Me | $CH_2OMe$ | O |
| D-12538 | Me | single bond | H | c-Pr(1-$CH_2OMe$) | H | Me | $CH_2OMe$ | O |
| D-12539 | Me(R) | single bond | H | c-Pr(1-$CH_2OMe$) | H | Me | $CH_2OMe$ | O |
| D-12540 | Me(S) | single bond | H | c-Pr(1-$CH_2OMe$) | H | Me | $CH_2OMe$ | O |
| D-12541 | H | single bond | Me | c-Pr(1-$CH_2OCN$) | H | Cl | $CH_2OMe$ | O |
| D-12542 | Me | single bond | H | c-Pr(1-$CH_2OCN$) | H | Cl | $CH_2OMe$ | O |
| D-12543 | Me(R) | single bond | H | c-Pr(1-$CH_2OCN$) | H | Cl | $CH_2OMe$ | O |
| D-12544 | Me(S) | single bond | H | c-Pr(1-$CH_2OCN$) | H | Cl | $CH_2OMe$ | O |
| D-12545 | H | single bond | Me | c-Pr(1-$CH_2OCN$) | H | Me | $CH_2OMe$ | O |
| D-12546 | Me | single bond | H | c-Pr(1-$CH_2OCN$) | H | Me | $CH_2OMe$ | O |
| D-12547 | Me(R) | single bond | H | c-Pr(1-$CH_2OCN$) | H | Me | $CH_2OMe$ | O |
| D-12548 | Me(S) | single bond | H | c-Pr(1-$CH_2OCN$) | H | Me | $CH_2OMe$ | O |
| D-12549 | H | single bond | Me | c-Pr(1-$CH_2SMe$) | H | Cl | $CH_2OMe$ | O |
| D-12550 | Me | single bond | H | c-Pr(1-$CH_2SMe$) | H | Cl | $CH_2OMe$ | O |
| D-12551 | Me(R) | single bond | H | c-Pr(1-$CH_2SMe$) | H | Cl | $CH_2OMe$ | O |
| D-12552 | Me(S) | single bond | H | c-Pr(1-$CH_2SMe$) | H | Cl | $CH_2OMe$ | O |
| D-12553 | H | single bond | Me | c-Pr(1-$CH_2SMe$) | H | Me | $CH_2OMe$ | O |
| D-12554 | Me | single bond | H | c-Pr(1-$CH_2SMe$) | H | Me | $CH_2OMe$ | O |
| D-12555 | Me(R) | single bond | H | c-Pr(1-$CH_2SMe$) | H | Me | $CH_2OMe$ | O |
| D-12556 | Me(S) | single bond | H | c-Pr(1-$CH_2SMe$) | H | Me | $CH_2OMe$ | O |
| D-12557 | H | single bond | Me | c-Pr[1-$CH_2S(=O)Me$] | H | Cl | $CH_2OMe$ | O |
| D-12558 | Me | single bond | H | c-Pr[1-$CH_2S(=O)Me$] | H | Cl | $CH_2OMe$ | O |

TABLE 932

| Compound Number | Y | W | Z | $R^1$ | $R^2$ | $R^3$ | $R^{10}$ | A |
|---|---|---|---|---|---|---|---|---|
| D-12559 | Me(R) | single bond | H | c-Pr[1-$CH_2S(=O)Me$] | H | Cl | $CH_2OMe$ | O |
| D-12560 | Me(S) | single bond | H | c-Pr[1-$CH_2S(=O)Me$] | H | Cl | $CH_2OMe$ | O |
| D-12561 | H | single bond | Me | c-Pr[1-$CH_2S(=O)Me$] | H | Me | $CH_2OMe$ | O |
| D-12562 | Me | single bond | H | c-Pr[1-$CH_2S(=O)Me$] | H | Me | $CH_2OMe$ | O |
| D-12563 | Me(R) | single bond | H | c-Pr[1-$CH_2S(=O)Me$] | H | Me | $CH_2OMe$ | O |
| D-12564 | Me(S) | single bond | H | c-Pr[1-$CH_2S(=O)Me$] | H | Me | $CH_2OMe$ | O |
| D-12565 | H | single bond | Me | c-Pr[1-$CH_2S(=O)_2Me$] | H | Cl | $CH_2OMe$ | O |
| D-12566 | Me | single bond | H | c-Pr[1-$CH_2S(=O)_2Me$] | H | Cl | $CH_2OMe$ | O |
| D-12567 | Me(R) | single bond | H | c-Pr[1-$CH_2S(=O)_2Me$] | H | Cl | $CH_2OMe$ | O |
| D-12568 | Me(S) | single bond | H | c-Pr[1-$CH_2S(=O)_2Me$] | H | Cl | $CH_2OMe$ | O |
| D-12569 | H | single bond | Me | c-Pr[1-$CH_2S(=O)_2Me$] | H | Me | $CH_2OMe$ | O |
| D-12570 | Me | single bond | H | c-Pr[1-$CH_2S(=O)_2Me$] | H | Me | $CH_2OMe$ | O |
| D-12571 | Me(R) | single bond | H | c-Pr[1-$CH_2S(=O)_2Me$] | H | Me | $CH_2OMe$ | O |
| D-12572 | Me(S) | single bond | H | c-Pr[1-$CH_2S(=O)_2Me$] | H | Me | $CH_2OMe$ | O |
| D-12573 | H | single bond | Me | c-Pr(1-$CH_2F$) | H | Cl | $CH_2OMe$ | O |
| D-12574 | Me | single bond | H | c-Pr(1-$CH_2F$) | H | Cl | $CH_2OMe$ | O |
| D-12575 | Me(R) | single bond | H | c-Pr(1-$CH_2F$) | H | Cl | $CH_2OMe$ | O |
| D-12576 | Me(S) | single bond | H | c-Pr(1-$CH_2F$) | H | Cl | $CH_2OMe$ | O |
| D-12577 | H | single bond | Me | c-Pr(1-$CH_2F$) | H | Me | $CH_2OMe$ | O |
| D-12578 | Me | single bond | H | c-Pr(1-$CH_2F$) | H | Me | $CH_2OMe$ | O |
| D-12579 | Me(R) | single bond | H | c-Pr(1-$CH_2F$) | H | Me | $CH_2OMe$ | O |
| D-12580 | Me(S) | single bond | H | c-Pr(1-$CH_2F$) | H | Me | $CH_2OMe$ | O |
| D-12581 | H | single bond | Me | c-Pr(1-$CHF_2$) | H | Cl | $CH_2OMe$ | O |

TABLE 932-continued

| Compound Number | Y | W | Z | $R^1$ | $R^2$ | $R^3$ | $R^{10}$ | A |
|---|---|---|---|---|---|---|---|---|
| D-12582 | Me | single bond | H | c-Pr(1-$CHF_2$) | H | Cl | $CH_2OMe$ | O |
| D-12583 | Me(R) | single bond | H | c-Pr(1-$CHF_2$) | H | Cl | $CH_2OMe$ | O |
| D-12584 | Me(S) | single bond | H | c-Pr(1-$CHF_2$) | H | Cl | $CH_2OMe$ | O |
| D-12585 | H | single bond | Me | c-Pr(1-$CHF_2$) | H | Me | $CH_2OMe$ | O |
| D-12586 | Me | single bond | H | c-Pr(1-$CHF_2$) | H | Me | $CH_2OMe$ | O |
| D-12587 | Me(R) | single bond | H | c-Pr(1-$CHF_2$) | H | Me | $CH_2OMe$ | O |
| D-12588 | Me(S) | single bond | H | c-Pr(1-$CHF_2$) | H | Me | $CH_2OMe$ | O |
| D-12589 | H | single bond | Me | c-Pr(1-$CF_3$) | H | Cl | $CH_2OMe$ | O |
| D-12590 | Me | single bond | H | c-Pr(1-$CF_3$) | H | Cl | $CH_2OMe$ | O |
| D-12591 | Me(R) | single bond | H | c-Pr(1-$CF_3$) | H | Cl | $CH_2OMe$ | O |
| D-12592 | Me(S) | single bond | H | c-Pr(1-$CF_3$) | H | Cl | $CH_2OMe$ | O |
| D-12593 | H | single bond | Me | c-Pr(1-$CF_3$) | H | Me | $CH_2OMe$ | O |
| D-12594 | Me | single bond | H | c-Pr(1-$CF_3$) | H | Me | $CH_2OMe$ | O |
| D-12595 | Me(R) | single bond | H | c-Pr(1-$CF_3$) | H | Me | $CH_2OMe$ | O |
| D-12596 | Me(S) | single bond | H | c-Pr(1-$CF_3$) | H | Me | $CH_2OMe$ | O |
| D-12597 | H | single bond | Me | c-Pr(1-C≡CH) | H | Cl | $CH_2OMe$ | O |
| D-12598 | Me | single bond | H | c-Pr(1-C≡CH) | H | Cl | $CH_2OMe$ | O |
| D-12599 | Me(R) | single bond | H | c-Pr(1-C≡CH) | H | Cl | $CH_2OMe$ | O |
| D-12600 | Me(S) | single bond | H | c-Pr(1-C≡CH) | H | Cl | $CH_2OMe$ | O |
| D-12601 | H | single bond | Me | c-Pr(1-C≡CH) | H | Me | $CH_2OMe$ | O |
| D-12602 | Me | single bond | H | c-Pr(1-C≡CH) | H | Me | $CH_2OMe$ | O |

TABLE 933

| Compound Number | Y | W | Z | $R^1$ | $R^2$ | $R^3$ | $R^{10}$ | A |
|---|---|---|---|---|---|---|---|---|
| D-12603 | Me(R) | single bond | H | c-Pr(1-C≡CH) | H | Me | $CH_2OMe$ | O |
| D-12604 | Me(S) | single bond | H | c-Pr(1-C≡CH) | H | Me | $CH_2OMe$ | O |
| D-12605 | H | single bond | Me | c-Pr[1-C(═O)OEt] | H | Cl | $CH_2OMe$ | O |
| D-12606 | Me | single bond | H | c-Pr[1-C(═O)OEt] | H | Cl | $CH_2OMe$ | O |
| D-12607 | Me(R) | single bond | H | c-Pr[1-C(═O)OEt] | H | Cl | $CH_2OMe$ | O |
| D-12608 | Me(S) | single bond | H | c-Pr[1-C(═O)OEt] | H | Cl | $CH_2OMe$ | O |
| D-12609 | H | single bond | Me | c-Pr[1-C(═O)OEt] | H | Me | $CH_2OMe$ | O |
| D-12610 | Me | single bond | H | c-Pr[1-C(═O)OEt] | H | Me | $CH_2OMe$ | O |
| D-12611 | Me(R) | single bond | H | c-Pr[1-C(═O)OEt] | H | Me | $CH_2OMe$ | O |
| D-12612 | Me(S) | single bond | H | c-Pr[1-C(═O)OEt] | H | Me | $CH_2OMe$ | O |
| D-12613 | H | single bond | Me | c-Pr[1-C(═O)OH] | H | Cl | $CH_2OMe$ | O |
| D-12614 | Me | single bond | H | c-Pr[1-C(═O)OH] | H | Cl | $CH_2OMe$ | O |
| D-12615 | Me(R) | single bond | H | c-Pr[1-C(═O)OH] | H | Cl | $CH_2OMe$ | O |
| D-12616 | Me(S) | single bond | H | c-Pr[1-C(═O)OH] | H | Cl | $CH_2OMe$ | O |
| D-12617 | H | single bond | Me | c-Pr[1-C(═O)OH] | H | Me | $CH_2OMe$ | O |
| D-12618 | Me | single bond | H | c-Pr[1-C(═O)OH] | H | Me | $CH_2OMe$ | O |
| D-12619 | Me(R) | single bond | H | c-Pr[1-C(═O)OH] | H | Me | $CH_2OMe$ | O |
| D-12620 | Me(S) | single bond | H | c-Pr[1-C(═O)OH] | H | Me | $CH_2OMe$ | O |
| D-12621 | H | single bond | Me | c-Pr[1-C(═O)$NH_2$] | H | Cl | $CH_2OMe$ | O |
| D-12622 | Me | single bond | H | c-Pr[1-C(═O)$NH_2$] | H | Cl | $CH_2OMe$ | O |
| D-12623 | Me(R) | single bond | H | c-Pr[1-C(═O)$NH_2$] | H | Cl | $CH_2OMe$ | O |
| D-12624 | Me(S) | single bond | H | c-Pr[1-C(═O)$NH_2$] | H | Cl | $CH_2OMe$ | O |
| D-12625 | H | single bond | Me | c-Pr[1-C(═O)$NH_2$] | H | Me | $CH_2OMe$ | O |
| D-12626 | Me | single bond | H | c-Pr[1-C(═O)$NH_2$] | H | Me | $CH_2OMe$ | O |
| D-12627 | Me(R) | single bond | H | c-Pr[1-C(═O)$NH_2$] | H | Me | $CH_2OMe$ | O |
| D-12628 | Me(S) | single bond | H | c-Pr[1-C(═O)$NH_2$] | H | Me | $CH_2OMe$ | O |
| D-12629 | H | single bond | Me | c-Pr(1-OMe) | H | Cl | $CH_2OMe$ | O |
| D-12630 | Me | single bond | H | c-Pr(1-OMe) | H | Cl | $CH_2OMe$ | O |
| D-12631 | Me(R) | single bond | H | c-Pr(1-OMe) | H | Cl | $CH_2OMe$ | O |
| D-12632 | Me(S) | single bond | H | c-Pr(1-OMe) | H | Cl | $CH_2OMe$ | O |
| D-12633 | H | single bond | Me | c-Pr(1-OMe) | H | Me | $CH_2OMe$ | O |
| D-12634 | Me | single bond | H | c-Pr(1-OMe) | H | Me | $CH_2OMe$ | O |
| D-12635 | Me(R) | single bond | H | c-Pr(1-OMe) | H | Me | $CH_2OMe$ | O |
| D-12636 | Me(S) | single bond | H | c-Pr(1-OMe) | H | Me | $CH_2OMe$ | O |
| D-12637 | H | single bond | Me | c-Pr(1-SMe) | H | Cl | $CH_2OMe$ | O |
| D-12638 | Me | single bond | H | c-Pr(1-SMe) | H | Cl | $CH_2OMe$ | O |
| D-12639 | Me(R) | single bond | H | c-Pr(1-SMe) | H | Cl | $CH_2OMe$ | O |
| D-12640 | Me(S) | single bond | H | c-Pr(1-SMe) | H | Cl | $CH_2OMe$ | O |
| D-12641 | H | single bond | Me | c-Pr(1-SMe) | H | Me | $CH_2OMe$ | O |
| D-12642 | Me | single bond | H | c-Pr(1-SMe) | H | Me | $CH_2OMe$ | O |
| D-12643 | Me(R) | single bond | H | c-Pr(1-SMe) | H | Me | $CH_2OMe$ | O |
| D-12644 | Me(S) | single bond | H | c-Pr(1-SMe) | H | Me | $CH_2OMe$ | O |
| D-12645 | H | single bond | Me | c-Pr[1-S(═O)Me] | H | Cl | $CH_2OMe$ | O |
| D-12646 | Me | single bond | H | c-Pr[1-S(═O)Me] | H | Cl | $CH_2OMe$ | O |

TABLE 934

| Compound Number | Y | W | Z | $R^1$ | $R^2$ | $R^3$ | $R^{10}$ | A |
|---|---|---|---|---|---|---|---|---|
| D-12647 | Me(R) | single bond | H | c-Pr[1-S(═O)Me] | H | Cl | $CH_2OMe$ | O |
| D-12648 | Me(S) | single bond | H | c-Pr[1-S(═O)Me] | H | Cl | $CH_2OMe$ | O |
| D-12649 | H | single bond | Me | c-Pr[1-S(═O)Me] | H | Me | $CH_2OMe$ | O |
| D-12650 | Me | single bond | H | c-Pr[1-S(═O)Me] | H | Me | $CH_2OMe$ | O |
| D-12651 | Me(R) | single bond | H | c-Pr[1-S(═O)Me] | H | Me | $CH_2OMe$ | O |
| D-12652 | Me(S) | single bond | H | c-Pr[1-S(═O)Me] | H | Me | $CH_2OMe$ | O |
| D-12653 | H | single bond | Me | c-Pr[1-S(═O)$_2$Me] | H | Cl | $CH_2OMe$ | O |
| D-12654 | Me | single bond | H | c-Pr[1-S(═O)$_2$Me] | H | Cl | $CH_2OMe$ | O |
| D-12655 | Me(R) | single bond | H | c-Pr[1-S(═O)$_2$Me] | H | Cl | $CH_2OMe$ | O |
| D-12656 | Me(S) | single bond | H | c-Pr[1-S(═O)$_2$Me] | H | Cl | $CH_2OMe$ | O |
| D-12657 | H | single bond | Me | c-Pr[1-S(═O)$_2$Me] | H | Me | $CH_2OMe$ | O |
| D-12658 | Me | single bond | H | c-Pr[1-S(═O)$_2$Me] | H | Me | $CH_2OMe$ | O |
| D-12659 | Me(R) | single bond | H | c-Pr[1-S(═O)$_2$Me] | H | Me | $CH_2OMe$ | O |
| D-12660 | Me(S) | single bond | H | c-Pr[1-S(═O)$_2$Me] | H | Me | $CH_2OMe$ | O |
| D-12661 | H | single bond | Me | c-Pr[1-S(═O)$_2$CHF$_2$] | H | Cl | $CH_2OMe$ | O |
| D-12662 | Me | single bond | H | c-Pr[1-S(═O)$_2$CHF$_2$] | H | Cl | $CH_2OMe$ | O |
| D-12663 | Me(R) | single bond | H | c-Pr[1-S(═O)$_2$CHF$_2$] | H | Cl | $CH_2OMe$ | O |
| D-12664 | Me(S) | single bond | H | c-Pr[1-S(═O)$_2$CHF$_2$] | H | Cl | $CH_2OMe$ | O |
| D-12665 | H | single bond | Me | c-Pr[1-S(═O)$_2$CHF$_2$] | H | Me | $CH_2OMe$ | O |
| D-12666 | Me | single bond | H | c-Pr[1-S(═O)$_2$CHF$_2$] | H | Me | $CH_2OMe$ | O |
| D-12667 | Me(R) | single bond | H | c-Pr[1-S(═O)$_2$CHF$_2$] | H | Me | $CH_2OMe$ | O |
| D-12668 | Me(S) | single bond | H | c-Pr[1-S(═O)$_2$CHF$_2$] | H | Me | $CH_2OMe$ | O |
| D-12669 | H | single bond | Me | c-Pr[1-S(═O)$_2$CF3] | H | Cl | $CH_2OMe$ | O |
| D-12670 | Me | single bond | H | c-Pr[1-S(═O)$_2$CF3] | H | Cl | $CH_2OMe$ | O |
| D-12671 | Me(R) | single bond | H | c-Pr[1-S(═O)$_2$CF3] | H | Cl | $CH_2OMe$ | O |
| D-12672 | Me(S) | single bond | H | c-Pr[1-S(═O)$_2$CF3] | H | Cl | $CH_2OMe$ | O |
| D-12673 | H | single bond | Me | c-Pr[1-S(═O)$_2$CF3] | H | Me | $CH_2OMe$ | O |
| D-12674 | Me | single bond | H | c-Pr[1-S(═O)$_2$CF3] | H | Me | $CH_2OMe$ | O |
| D-12675 | Me(R) | single bond | H | c-Pr[1-S(═O)$_2$CF3] | H | Me | $CH_2OMe$ | O |
| D-12676 | Me(S) | single bond | H | c-Pr[1-S(═O)$_2$CF3] | H | Me | $CH_2OMe$ | O |
| D-12677 | H | single bond | Me | c-Pr[1-(5,6-dihydro-1,4,2-dioxazin-3-yl)] | H | Cl | $CH_2OMe$ | O |
| D-12678 | Me | single bond | H | c-Pr[1-(5,6-dihydro-1,4,2-dioxazin-3-yl)] | H | Cl | $CH_2OMe$ | O |
| D-12679 | Me(R) | single bond | H | c-Pr[1-(5,6-dihydro-1,4,2-dioxazin-3-yl)] | H | Cl | $CH_2OMe$ | O |
| D-12680 | Me(S) | single bond | H | c-Pr[1-(5,6-dihydro-1,4,2-dioxazin-3-yl)] | H | Cl | $CH_2OMe$ | O |
| D-12681 | H | single bond | Me | c-Pr[1-(5,6-dihydro-1,4,2-dioxazin-3-yl)] | H | Me | $CH_2OMe$ | O |
| D-12682 | Me | single bond | H | c-Pr[1-(5,6-dihydro-1,4,2-dioxazin-3-yl)] | H | Me | $CH_2OMe$ | O |
| D-12683 | Me(R) | single bond | H | c-Pr[1-(5,6-dihydro-1,4,2-dioxazin-3-yl)] | H | Me | $CH_2OMe$ | O |
| D-12684 | Me(S) | single bond | H | c-Pr[1-(5,6-dihydro-1,4,2-dioxazin-3-yl)] | H | Me | $CH_2OMe$ | O |
| D-12685 | H | single bond | Me | c-Pr[1-(5-hydroxy-1,3,4-oxadiazol-2-yl)] | H | Cl | $CH_2OMe$ | O |
| D-12686 | Me | single bond | H | c-Pr[1-(5-hydroxy-1,3,4-oxadiazol-2-yl)] | H | Cl | $CH_2OMe$ | O |
| D-12687 | Me(R) | single bond | H | c-Pr[1-(5-hydroxy-1,3,4-oxadiazol-2-yl)] | H | Cl | $CH_2OMe$ | O |
| D-12688 | Me(S) | single bond | H | c-Pr[1-(5-hydroxy-1,3,4-oxadiazol-2-yl)] | H | Cl | $CH_2OMe$ | O |
| D-12689 | H | single bond | Me | c-Pr[1-(5-hydroxy-1,3,4-oxadiazol-2-yl)] | H | Me | $CH_2OMe$ | O |
| D-12690 | Me | single bond | H | c-Pr[1-(5-hydroxy-1,3,4-oxadiazol-2-yl)] | H | Me | $CH_2OMe$ | O |

TABLE 935

| Compound Number | Y | W | Z | $R^1$ | $R^2$ | $R^3$ | $R^{10}$ | A |
|---|---|---|---|---|---|---|---|---|
| D-12691 | Me(R) | single bond | H | c-Pr[1-(5-hydroxy-1,3,4-oxadiazol-2-yl)] | H | Me | $CH_2OMe$ | O |
| D-12692 | Me(S) | single bond | H | c-Pr[1-(5-hydroxy-1,3,4-oxadiazol-2-yl)] | H | Me | $CH_2OMe$ | O |
| D-12693 | H | single bond | Me | c-Pr[1-(pyrimidin-2-yl)] | H | Cl | $CH_2OMe$ | O |
| D-12694 | Me | single bond | H | c-Pr[1-(pyrimidin-2-yl)] | H | Cl | $CH_2OMe$ | O |
| D-12695 | Me(R) | single bond | H | c-Pr[1-(pyrimidin-2-yl)] | H | Cl | $CH_2OMe$ | O |
| D-12696 | Me(S) | single bond | H | c-Pr[1-(pyrimidin-2-yl)] | H | Cl | $CH_2OMe$ | O |
| D-12697 | H | single bond | Me | c-Pr[1-(pyrimidin-2-yl)] | H | Me | $CH_2OMe$ | O |
| D-12698 | Me | single bond | H | c-Pr[1-(pyrimidin-2-yl)] | H | Me | $CH_2OMe$ | O |
| D-12699 | Me(R) | single bond | H | c-Pr[1-(pyrimidin-2-yl)] | H | Me | $CH_2OMe$ | O |
| D-12700 | Me(S) | single bond | H | c-Pr[1-(pyrimidin-2-yl)] | H | Me | $CH_2OMe$ | O |
| D-12701 | H | single bond | Me | t-Bu | H | Cl | $CH_2OMe$ | O |
| D-12702 | Me | single bond | H | t-Bu | H | Cl | $CH_2OMe$ | O |
| D-12703 | Me(R) | single bond | H | t-Bu | H | Cl | $CH_2OMe$ | O |
| D-12704 | Me(S) | single bond | H | t-Bu | H | Cl | $CH_2OMe$ | O |
| D-12705 | H | single bond | Me | t-Bu | H | Me | $CH_2OMe$ | O |
| D-12706 | Me | single bond | H | t-Bu | H | Me | $CH_2OMe$ | O |
| D-12707 | Me(R) | single bond | H | t-Bu | H | Me | $CH_2OMe$ | O |
| D-12708 | Me(S) | single bond | H | t-Bu | H | Me | $CH_2OMe$ | O |
| D-12709 | H | single bond | Me | c-Bu | H | Cl | $CH_2OMe$ | O |
| D-12710 | Me | single bond | H | c-Bu | H | Cl | $CH_2OMe$ | O |
| D-12711 | Me(R) | single bond | H | c-Bu | H | Cl | $CH_2OMe$ | O |

TABLE 935-continued

| Compound Number | Y | W | Z | $R^1$ | $R^2$ | $R^3$ | $R^{10}$ | A |
|---|---|---|---|---|---|---|---|---|
| D-12712 | Me(S) | single bond | H | c-Bu | H | Cl | $CH_2OMe$ | O |
| D-12713 | H | single bond | Me | c-Bu | H | Me | $CH_2OMe$ | O |
| D-12714 | Me | single bond | H | c-Bu | H | Me | $CH_2OMe$ | O |
| D-12715 | Me(R) | single bond | H | c-Bu | H | Me | $CH_2OMe$ | O |
| D-12716 | Me(S) | single bond | H | c-Bu | H | Me | $CH_2OMe$ | O |
| D-12717 | H | single bond | Me | c-Bu(1-CN) | H | Cl | $CH_2OMe$ | O |
| D-12718 | Me | single bond | H | c-Bu(1-CN) | H | Cl | $CH_2OMe$ | O |
| D-12719 | Me(R) | single bond | H | c-Bu(1-CN) | H | Cl | $CH_2OMe$ | O |
| D-12720 | Me(S) | single bond | H | c-Bu(1-CN) | H | Cl | $CH_2OMe$ | O |
| D-12721 | H | single bond | Me | c-Bu(1-CN) | H | Me | $CH_2OMe$ | O |
| D-12722 | Me | single bond | H | c-Bu(1-CN) | H | Me | $CH_2OMe$ | O |
| D-12723 | Me(R) | single bond | H | c-Bu(1-CN) | H | Me | $CH_2OMe$ | O |
| D-12724 | Me(S) | single bond | H | c-Bu(1-CN) | H | Me | $CH_2OMe$ | O |
| D-12725 | H | single bond | Me | c-Bu(3,3-$F_2$) | H | Cl | $CH_2OMe$ | O |
| D-12726 | Me | single bond | H | c-Bu(3,3-$F_2$) | H | Cl | $CH_2OMe$ | O |
| D-12727 | Me(R) | single bond | H | c-Bu(3,3-$F_2$) | H | Cl | $CH_2OMe$ | O |
| D-12728 | Me(S) | single bond | H | c-Bu(3,3-$F_2$) | H | Cl | $CH_2OMe$ | O |
| D-12729 | H | single bond | Me | c-Bu(3,3-$F_2$) | H | Me | $CH_2OMe$ | O |
| D-12730 | Me | single bond | H | c-Bu(3,3-$F_2$) | H | Me | $CH_2OMe$ | O |
| D-12731 | Me(R) | single bond | H | c-Bu(3,3-$F_2$) | H | Me | $CH_2OMe$ | O |
| D-12732 | Me(S) | single bond | H | c-Bu(3,3-$F_2$) | H | Me | $CH_2OMe$ | O |
| D-12733 | H | single bond | Me | oxetan-3-yl | H | Cl | $CH_2OMe$ | O |
| D-12734 | Me | single bond | H | oxetan-3-yl | H | Cl | $CH_2OMe$ | O |

TABLE 936

| Compound Number | Y | W | Z | $R^1$ | $R^2$ | $R^3$ | $R^{10}$ | A |
|---|---|---|---|---|---|---|---|---|
| D-12735 | Me(R) | single bond | H | oxetan-3-yl | H | Cl | $CH_2OMe$ | O |
| D-12736 | Me(S) | single bond | H | oxetan-3-yl | H | Cl | $CH_2OMe$ | O |
| D-12737 | H | single bond | Me | oxetan-3-yl | H | Me | $CH_2OMe$ | O |
| D-12738 | Me | single bond | H | oxetan-3-yl | H | Me | $CH_2OMe$ | O |
| D-12739 | Me(R) | single bond | H | oxetan-3-yl | H | Me | $CH_2OMe$ | O |
| D-12740 | Me(S) | single bond | H | oxetan-3-yl | H | Me | $CH_2OMe$ | O |
| D-12741 | H | single bond | Me | oxetan(3-CN)-3-yl | H | Cl | $CH_2OMe$ | O |
| D-12742 | Me | single bond | H | oxetan(3-CN)-3-yl | H | Cl | $CH_2OMe$ | O |
| D-12743 | Me(R) | single bond | H | oxetan(3-CN)-3-yl | H | Cl | $CH_2OMe$ | O |
| D-12744 | Me(S) | single bond | H | oxetan(3-CN)-3-yl | H | Cl | $CH_2OMe$ | O |
| D-12745 | H | single bond | Me | oxetan(3-CN)-3-yl | H | Me | $CH_2OMe$ | O |
| D-12746 | Me | single bond | H | oxetan(3-CN)-3-yl | H | Me | $CH_2OMe$ | O |
| D-12747 | Me(R) | single bond | H | oxetan(3-CN)-3-yl | H | Me | $CH_2OMe$ | O |
| D-12748 | Me(S) | single bond | H | oxetan(3-CN)-3-yl | H | Me | $CH_2OMe$ | O |
| D-12749 | H | single bond | Me | azetidin[1-C(=O)Me]-3-yl | H | Cl | $CH_2OMe$ | O |
| D-12750 | Me | single bond | H | azetidin[1-C(=O)Me]-3-yl | H | Cl | $CH_2OMe$ | O |
| D-12751 | Me(R) | single bond | H | azetidin[1-C(=O)Me]-3-yl | H | Cl | $CH_2OMe$ | O |
| D-12752 | Me(S) | single bond | H | azetidin[1-C(=O)Me]-3-yl | H | Cl | $CH_2OMe$ | O |
| D-12753 | H | single bond | Me | azetidin[1-C(=O)Me]-3-yl | H | Me | $CH_2OMe$ | O |
| D-12754 | Me | single bond | H | azetidin[1-C(=O)Me]-3-yl | H | Me | $CH_2OMe$ | O |
| D-12755 | Me(R) | single bond | H | azetidin[1-C(=O)Me]-3-yl | H | Me | $CH_2OMe$ | O |
| D-12756 | Me(S) | single bond | H | azetidin[1-C(=O)Me]-3-yl | H | Me | $CH_2OMe$ | O |
| D-12757 | H | single bond | Me | azetidin[1-S(=O)$_2$Me]-3-yl | H | Cl | $CH_2OMe$ | O |
| D-12758 | Me | single bond | H | azetidin[1-S(=O)$_2$Me]-3-yl | H | Cl | $CH_2OMe$ | O |
| D-12759 | Me(R) | single bond | H | azetidin[1-S(=O)$_2$Me]-3-yl | H | Cl | $CH_2OMe$ | O |
| D-12760 | Me(S) | single bond | H | azetidin[1-S(=O)$_2$Me]-3-yl | H | Cl | $CH_2OMe$ | O |
| D-12761 | H | single bond | Me | azetidin[1-S(=O)$_2$Me]-3-yl | H | Me | $CH_2OMe$ | O |
| D-12762 | Me | single bond | H | azetidin[1-S(=O)$_2$Me]-3-yl | H | Me | $CH_2OMe$ | O |
| D-12763 | Me(R) | single bond | H | azetidin[1-S(=O)$_2$Me]-3-yl | H | Me | $CH_2OMe$ | O |
| D-12764 | Me(S) | single bond | H | azetidin[1-S(=O)$_2$Me]-3-yl | H | Me | $CH_2OMe$ | O |
| D-12765 | H | single bond | Me | azetidin[1-S(=O)$_2$CHF$_2$]-3-yl | H | Cl | $CH_2OMe$ | O |
| D-12766 | Me | single bond | H | azetidin[1-S(=O)$_2$CHF$_2$]-3-yl | H | Cl | $CH_2OMe$ | O |
| D-12767 | Me(R) | single bond | H | azetidin[1-S(=O)$_2$CHF$_2$]-3-yl | H | Cl | $CH_2OMe$ | O |
| D-12768 | Me(S) | single bond | H | azetidin[1-S(=O)$_2$CHF$_2$]-3-yl | H | Cl | $CH_2OMe$ | O |
| D-12769 | H | single bond | Me | azetidin[1-S(=O)$_2$CHF$_2$]-3-yl | H | Me | $CH_2OMe$ | O |
| D-12770 | Me | single bond | H | azetidin[1-S(=O)$_2$CHF$_2$]-3-yl | H | Me | $CH_2OMe$ | O |
| D-12771 | Me(R) | single bond | H | azetidin[1-S(=O)$_2$CHF$_2$]-3-yl | H | Me | $CH_2OMe$ | O |
| D-12772 | Me(S) | single bond | H | azetidin[1-S(=O)$_2$CHF$_2$]-3-yl | H | Me | $CH_2OMe$ | O |
| D-12773 | H | single bond | Me | c-Pen | H | Cl | $CH_2OMe$ | O |
| D-12774 | Me | single bond | H | c-Pen | H | Cl | $CH_2OMe$ | O |
| D-12775 | Me(R) | single bond | H | c-Pen | H | Cl | $CH_2OMe$ | O |
| D-12776 | Me(S) | single bond | H | c-Pen | H | Cl | $CH_2OMe$ | O |

TABLE 936-continued

| Compound Number | Y | W | Z | $R^1$ | $R^2$ | $R^3$ | $R^{10}$ | A |
|---|---|---|---|---|---|---|---|---|
| D-12777 | H | single bond | Me | c-Pen | H | Me | $CH_2OMe$ | O |
| D-12778 | Me | single bond | H | c-Pen | H | Me | $CH_2OMe$ | O |

TABLE 937

| Compound Number | Y | W | Z | $R^1$ | $R^2$ | $R^3$ | $R^{10}$ | A |
|---|---|---|---|---|---|---|---|---|
| D-12779 | Me(R) | single bond | H | c-Pen | H | Me | $CH_2OMe$ | O |
| D-12780 | Me(S) | single bond | H | c-Pen | H | Me | $CH_2OMe$ | O |
| D-12781 | H | single bond | Me | tetrahydrofuran-3-yl | H | Cl | $CH_2OMe$ | O |
| D-12782 | Me | single bond | H | tetrahydrofuran-3-yl | H | Cl | $CH_2OMe$ | O |
| D-12783 | Me(R) | single bond | H | tetrahydrofuran-3-yl | H | Cl | $CH_2OMe$ | O |
| D-12784 | Me(S) | single bond | H | tetrahydrofuran-3-yl | H | Cl | $CH_2OMe$ | O |
| D-12785 | H | single bond | Me | tetrahydrofuran-3-yl | H | Me | $CH_2OMe$ | O |
| D-12786 | Me | single bond | H | tetrahydrofuran-3-yl | H | Me | $CH_2OMe$ | O |
| D-12787 | Me(R) | single bond | H | tetrahydrofuran-3-yl | H | Me | $CH_2OMe$ | O |
| D-12788 | Me(S) | single bond | H | tetrahydrofuran-3-yl | H | Me | $CH_2OMe$ | O |
| D-12789 | H | single bond | Me | tetrahydrothiophen-3-yl | H | Cl | $CH_2OMe$ | O |
| D-12790 | Me | single bond | H | tetrahydrothiophen-3-yl | H | Cl | $CH_2OMe$ | O |
| D-12791 | Me(R) | single bond | H | tetrahydrothiophen-3-yl | H | Cl | $CH_2OMe$ | O |
| D-12792 | Me(S) | single bond | H | tetrahydrothiophen-3-yl | H | Cl | $CH_2OMe$ | O |
| D-12793 | H | single bond | Me | tetrahydrothiophen-3-yl | H | Me | $CH_2OMe$ | O |
| D-12794 | Me | single bond | H | tetrahydrothiophen-3-yl | H | Me | $CH_2OMe$ | O |
| D-12795 | Me(R) | single bond | H | tetrahydrothiophen-3-yl | H | Me | $CH_2OMe$ | O |
| D-12796 | Me(S) | single bond | H | tetrahydrothiophen-3-yl | H | Me | $CH_2OMe$ | O |
| D-12797 | H | single bond | Me | c-Pen(1-CN) | H | Cl | $CH_2OMe$ | O |
| D-12798 | Me | single bond | H | c-Pen(1-CN) | H | Cl | $CH_2OMe$ | O |
| D-12799 | Me(R) | single bond | H | c-Pen(1-CN) | H | Cl | $CH_2OMe$ | O |
| D-12800 | Me(S) | single bond | H | c-Pen(1-CN) | H | Cl | $CH_2OMe$ | O |
| D-12801 | H | single bond | Me | c-Pen(1-CN) | H | Me | $CH_2OMe$ | O |
| D-12802 | Me | single bond | H | c-Pen(1-CN) | H | Me | $CH_2OMe$ | O |
| D-12803 | Me(R) | single bond | H | c-Pen(1-CN) | H | Me | $CH_2OMe$ | O |
| D-12804 | Me(S) | single bond | H | c-Pen(1-CN) | H | Me | $CH_2OMe$ | O |
| D-12805 | H | single bond | Me | tetrahydrofuran(3-CN)-3-yl | H | Cl | $CH_2OMe$ | O |
| D-12806 | Me | single bond | H | tetrahydrofuran(3-CN)-3-yl | H | Cl | $CH_2OMe$ | O |
| D-12807 | Me(R) | single bond | H | tetrahydrofuran(3-CN)-3-yl | H | Cl | $CH_2OMe$ | O |
| D-12808 | Me(S) | single bond | H | tetrahydrofuran(3-CN)-3-yl | H | Cl | $CH_2OMe$ | O |
| D-12809 | H | single bond | Me | tetrahydrofuran(3-CN)-3-yl | H | Me | $CH_2OMe$ | O |
| D-12810 | Me | single bond | H | tetrahydrofuran(3-CN)-3-yl | H | Me | $CH_2OMe$ | O |
| D-12811 | Me(R) | single bond | H | tetrahydrofuran(3-CN)-3-yl | H | Me | $CH_2OMe$ | O |
| D-12812 | Me(S) | single bond | H | tetrahydrofuran(3-CN)-3-yl | H | Me | $CH_2OMe$ | O |
| D-12813 | H | single bond | Me | tetrahydrothiophen(3-CN)-3-yl | H | Cl | $CH_2OMe$ | O |
| D-12814 | Me | single bond | H | tetrahydrothiophen(3-CN)-3-yl | H | Cl | $CH_2OMe$ | O |
| D-12815 | Me(R) | single bond | H | tetrahydrothiophen(3-CN)-3-yl | H | Cl | $CH_2OMe$ | O |
| D-12816 | Me(S) | single bond | H | tetrahydrothiophen(3-CN)-3-yl | H | Cl | $CH_2OMe$ | O |
| D-12817 | H | single bond | Me | tetrahydrothiophen(3-CN)-3-yl | H | Me | $CH_2OMe$ | O |
| D-12818 | Me | single bond | H | tetrahydrothiophen(3-CN)-3-yl | H | Me | $CH_2OMe$ | O |
| D-12819 | Me(R) | single bond | H | tetrahydrothiophen(3-CN)-3-yl | H | Me | $CH_2OMe$ | O |
| D-12820 | Me(S) | single bond | H | tetrahydrothiophen(3-CN)-3-yl | H | Me | $CH_2OMe$ | O |
| D-12821 | H | single bond | Me | bicyclo[1.1.1]pentan-1-yl | H | Cl | $CH_2OMe$ | O |
| D-12822 | Me | single bond | H | bicyclo[1.1.1]pentan-1-yl | H | Cl | $CH_2OMe$ | O |

TABLE 938

| Compound Number | Y | W | Z | $R^1$ | $R^2$ | $R^3$ | $R^{10}$ | A |
|---|---|---|---|---|---|---|---|---|
| D-12823 | Me(R) | single bond | H | bicyclo[1.1.1]pentan-1-yl | H | Cl | $CH_2OMe$ | O |
| D-12824 | Me(S) | single bond | H | bicyclo[1.1.1]pentan-1-yl | H | Cl | $CH_2OMe$ | O |
| D-12825 | H | single bond | Me | bicyclo[1.1.1]pentan-1-yl | H | Me | $CH_2OMe$ | O |
| D-12826 | Me | single bond | H | bicyclo[1.1.1]pentan-1-yl | H | Me | $CH_2OMe$ | O |
| D-12827 | Me(R) | single bond | H | bicyclo[1.1.1]pentan-1-yl | H | Me | $CH_2OMe$ | O |
| D-12828 | Me(S) | single bond | H | bicyclo[1.1.1]pentan-1-yl | H | Me | $CH_2OMe$ | O |
| D-12829 | H | single bond | Me | c-Hex | H | Cl | $CH_2OMe$ | O |
| D-12830 | Me | single bond | H | c-Hex | H | Cl | $CH_2OMe$ | O |
| D-12831 | Me(R) | single bond | H | c-Hex | H | Cl | $CH_2OMe$ | O |
| D-12832 | Me(S) | single bond | H | c-Hex | H | Cl | $CH_2OMe$ | O |
| D-12833 | H | single bond | Me | c-Hex | H | Me | $CH_2OMe$ | O |
| D-12834 | Me | single bond | H | c-Hex | H | Me | $CH_2OMe$ | O |

TABLE 938-continued

| Compound Number | Y | W | Z | $R^1$ | $R^2$ | $R^3$ | $R^{10}$ | A |
|---|---|---|---|---|---|---|---|---|
| D-12835 | Me(R) | single bond | H | c-Hex | H | Me | $CH_2OMe$ | O |
| D-12836 | Me(S) | single bond | H | c-Hex | H | Me | $CH_2OMe$ | O |
| D-12837 | H | single bond | Me | tetrahydropyran-4-yl | H | Cl | $CH_2OMe$ | O |
| D-12838 | Me | single bond | H | tetrahydropyran-4-yl | H | Cl | $CH_2OMe$ | O |
| D-12839 | Me(R) | single bond | H | tetrahydropyran-4-yl | H | Cl | $CH_2OMe$ | O |
| D-12840 | Me(S) | single bond | H | tetrahydropyran-4-yl | H | Cl | $CH_2OMe$ | O |
| D-12841 | H | single bond | Me | tetrahydropyran-4-yl | H | Me | $CH_2OMe$ | O |
| D-12842 | Me | single bond | H | tetrahydropyran-4-yl | H | Me | $CH_2OMe$ | O |
| D-12843 | Me(R) | single bond | H | tetrahydropyran-4-yl | H | Me | $CH_2OMe$ | O |
| D-12844 | Me(S) | single bond | H | tetrahydropyran-4-yl | H | Me | $CH_2OMe$ | O |
| D-12845 | H | single bond | Me | tetrahydrothiopyran-4-yl | H | Cl | $CH_2OMe$ | O |
| D-12846 | Me | single bond | H | tetrahydrothiopyran-4-yl | H | Cl | $CH_2OMe$ | O |
| D-12847 | Me(R) | single bond | H | tetrahydrothiopyran-4-yl | H | Cl | $CH_2OMe$ | O |
| D-12848 | Me(S) | single bond | H | tetrahydrothiopyran-4-yl | H | Cl | $CH_2OMe$ | O |
| D-12849 | H | single bond | Me | tetrahydrothiopyran-4-yl | H | Me | $CH_2OMe$ | O |
| D-12850 | Me | single bond | H | tetrahydrothiopyran-4-yl | H | Me | $CH_2OMe$ | O |
| D-12851 | Me(R) | single bond | H | tetrahydrothiopyran-4-yl | H | Me | $CH_2OMe$ | O |
| D-12852 | Me(S) | single bond | H | tetrahydrothiopyran-4-yl | H | Me | $CH_2OMe$ | O |
| D-12853 | H | single bond | Me | c-Hex(1-CN) | H | Cl | $CH_2OMe$ | O |
| D-12854 | Me | single bond | H | c-Hex(1-CN) | H | Cl | $CH_2OMe$ | O |
| D-12855 | Me(R) | single bond | H | c-Hex(1-CN) | H | Cl | $CH_2OMe$ | O |
| D-12856 | Me(S) | single bond | H | c-Hex(1-CN) | H | Cl | $CH_2OMe$ | O |
| D-12857 | H | single bond | Me | c-Hex(1-CN) | H | Me | $CH_2OMe$ | O |
| D-12858 | Me | single bond | H | c-Hex(1-CN) | H | Me | $CH_2OMe$ | O |
| D-12859 | Me(R) | single bond | H | c-Hex(1-CN) | H | Me | $CH_2OMe$ | O |
| D-12860 | Me(S) | single bond | H | c-Hex(1-CN) | H | Me | $CH_2OMe$ | O |
| D-12861 | H | single bond | Me | tetrahydropyran(4-CN)-4-yl | H | Cl | $CH_2OMe$ | O |
| D-12862 | Me | single bond | H | tetrahydropyran(4-CN)-4-yl | H | Cl | $CH_2OMe$ | O |
| D-12863 | Me(R) | single bond | H | tetrahydropyran(4-CN)-4-yl | H | Cl | $CH_2OMe$ | O |
| D-12864 | Me(S) | single bond | H | tetrahydropyran(4-CN)-4-yl | H | Cl | $CH_2OMe$ | O |
| D-12865 | H | single bond | Me | tetrahydropyran(4-CN)-4-yl | H | Me | $CH_2OMe$ | O |
| D-12866 | Me | single bond | H | tetrahydropyran(4-CN)-4-yl | H | Me | $CH_2OMe$ | O |

TABLE 939

| Compound Number | Y | W | Z | $R^1$ | $R^2$ | $R^3$ | $R^{10}$ | A |
|---|---|---|---|---|---|---|---|---|
| D-12867 | Me(R) | single bond | H | tetrahydropyran(4-CN)-4-yl | H | Me | $CH_2OMe$ | O |
| D-12868 | Me(S) | single bond | H | tetrahydropyran(4-CN)-4-yl | H | Me | $CH_2OMe$ | O |
| D-12869 | H | single bond | Me | tetrahydrothiopyran(4-CN)-4-yl | H | Cl | $CH_2OMe$ | O |
| D-12870 | Me | single bond | H | tetrahydrothiopyran(4-CN)-4-yl | H | Cl | $CH_2OMe$ | O |
| D-12871 | Me(R) | single bond | H | tetrahydrothiopyran(4-CN)-4-yl | H | Cl | $CH_2OMe$ | O |
| D-12872 | Me(S) | single bond | H | tetrahydrothiopyran(4-CN)-4-yl | H | Cl | $CH_2OMe$ | O |
| D-12873 | H | single bond | Me | tetrahydrothiopyran(4-CN)-4-yl | H | Me | $CH_2OMe$ | O |
| D-12874 | Me | single bond | H | tetrahydrothiopyran(4-CN)-4-yl | H | Me | $CH_2OMe$ | O |
| D-12875 | Me(R) | single bond | H | tetrahydrothiopyran(4-CN)-4-yl | H | Me | $CH_2OMe$ | O |
| D-12876 | Me(S) | single bond | H | tetrahydrothiopyran(4-CN)-4-yl | H | Me | $CH_2OMe$ | O |
| D-12877 | H | single bond | Me | $CH_2$(c-Pr) | H | Cl | $CH_2OMe$ | O |
| D-12878 | Me | single bond | H | $CH_2$(c-Pr) | H | Cl | $CH_2OMe$ | O |
| D-12879 | Me(R) | single bond | H | $CH_2$(c-Pr) | H | Cl | $CH_2OMe$ | O |
| D-12880 | Me(S) | single bond | H | $CH_2$(c-Pr) | H | Cl | $CH_2OMe$ | O |
| D-12881 | H | single bond | Me | $CH_2$(c-Pr) | H | Me | $CH_2OMe$ | O |
| D-12882 | Me | single bond | H | $CH_2$(c-Pr) | H | Me | $CH_2OMe$ | O |
| D-12883 | Me(R) | single bond | H | $CH_2$(c-Pr) | H | Me | $CH_2OMe$ | O |
| D-12884 | Me(S) | single bond | H | $CH_2$(c-Pr) | H | Me | $CH_2OMe$ | O |
| D-12885 | H | single bond | Me | $CH_2$[c-Pr(1-CN)] | H | Cl | $CH_2OMe$ | O |
| D-12886 | Me | single bond | H | $CH_2$[c-Pr(1-CN)] | H | Cl | $CH_2OMe$ | O |
| D-12887 | Me(R) | single bond | H | $CH_2$[c-Pr(1-CN)] | H | Cl | $CH_2OMe$ | O |
| D-12888 | Me(S) | single bond | H | $CH_2$[c-Pr(1-CN)] | H | Cl | $CH_2OMe$ | O |
| D-12889 | H | single bond | Me | $CH_2$[c-Pr(1-CN)] | H | Me | $CH_2OMe$ | O |
| D-12890 | Me | single bond | H | $CH_2$[c-Pr(1-CN)] | H | Me | $CH_2OMe$ | O |
| D-12891 | Me(R) | single bond | H | $CH_2$[c-Pr(1-CN)] | H | Me | $CH_2OMe$ | O |
| D-12892 | Me(S) | single bond | H | $CH_2$[c-Pr(1-CN)] | H | Me | $CH_2OMe$ | O |
| D-12893 | H | single bond | Me | CH(Me)(c-Pr) | H | Cl | $CH_2OMe$ | O |
| D-12894 | Me | single bond | H | CH(Me)(c-Pr) | H | Cl | $CH_2OMe$ | O |
| D-12895 | Me(R) | single bond | H | CH(Me)(c-Pr) | H | Cl | $CH_2OMe$ | O |
| D-12896 | Me(S) | single bond | H | CH(Me)(c-Pr) | H | Cl | $CH_2OMe$ | O |
| D-12897 | H | single bond | Me | CH(Me)(c-Pr) | H | Me | $CH_2OMe$ | O |
| D-12898 | Me | single bond | H | CH(Me)(c-Pr) | H | Me | $CH_2OMe$ | O |
| D-12899 | Me(R) | single bond | H | CH(Me)(c-Pr) | H | Me | $CH_2OMe$ | O |
| D-12900 | Me(S) | single bond | H | CH(Me)(c-Pr) | H | Me | $CH_2OMe$ | O |
| D-12901 | H | single bond | Me | $CH(Me)CH_2OMe$ | H | Cl | $CH_2OMe$ | O |

TABLE 939-continued

| Compound Number | Y | W | Z | $R^1$ | $R^2$ | $R^3$ | $R^{10}$ | A |
|---|---|---|---|---|---|---|---|---|
| D-12902 | Me | single bond | H | $CH(Me)CH_2OMe$ | H | Cl | $CH_2OMe$ | O |
| D-12903 | Me(R) | single bond | H | $CH(Me)CH_2OMe$ | H | Cl | $CH_2OMe$ | O |
| D-12904 | Me(S) | single bond | H | $CH(Me)CH_2OMe$ | H | Cl | $CH_2OMe$ | O |
| D-12905 | H | single bond | Me | $CH(Me)CH_2OMe$ | H | Me | $CH_2OMe$ | O |
| D-12906 | Me | single bond | H | $CH(Me)CH_2OMe$ | H | Me | $CH_2OMe$ | O |
| D-12907 | Me(R) | single bond | H | $CH(Me)CH_2OMe$ | H | Me | $CH_2OMe$ | O |
| D-12908 | Me(S) | single bond | H | $CH(Me)CH_2OMe$ | H | Me | $CH_2OMe$ | O |
| D-12909 | H | single bond | Me | $CH_2CH{=}CH_2$ | H | Cl | $CH_2OMe$ | O |
| D-12910 | Me | single bond | H | $CH_2CH{=}CH_2$ | H | Cl | $CH_2OMe$ | O |

TABLE 940

| Compound Number | Y | W | Z | $R^1$ | $R^2$ | $R^3$ | $R^{10}$ | A |
|---|---|---|---|---|---|---|---|---|
| D-12911 | Me(R) | single bond | H | $CH_2CH{=}CH_2$ | H | Cl | $CH_2OMe$ | O |
| D-12912 | Me(S) | single bond | H | $CH_2CH{=}CH_2$ | H | Cl | $CH_2OMe$ | O |
| D-12913 | H | single bond | Me | $CH_2CH{=}CH_2$ | H | Me | $CH_2OMe$ | O |
| D-12914 | Me | single bond | H | $CH_2CH{=}CH_2$ | H | Me | $CH_2OMe$ | O |
| D-12915 | Me(R) | single bond | H | $CH_2CH{=}CH_2$ | H | Me | $CH_2OMe$ | O |
| D-12916 | Me(S) | single bond | H | $CH_2CH{=}CH_2$ | H | Me | $CH_2OMe$ | O |
| D-12917 | H | single bond | Me | $CH_2C{\equiv}CH$ | H | Cl | $CH_2OMe$ | O |
| D-12918 | Me | single bond | H | $CH_2C{\equiv}CH$ | H | Cl | $CH_2OMe$ | O |
| D-12919 | Me(R) | single bond | H | $CH_2C{\equiv}CH$ | H | Cl | $CH_2OMe$ | O |
| D-12920 | Me(S) | single bond | H | $CH_2C{\equiv}CH$ | H | Cl | $CH_2OMe$ | O |
| D-12921 | H | single bond | Me | $CH_2C{\equiv}CH$ | H | Me | $CH_2OMe$ | O |
| D-12922 | Me | single bond | H | $CH_2C{\equiv}CH$ | H | Me | $CH_2OMe$ | O |
| D-12923 | Me(R) | single bond | H | $CH_2C{\equiv}CH$ | H | Me | $CH_2OMe$ | O |
| D-12924 | Me(S) | single bond | H | $CH_2C{\equiv}CH$ | H | Me | $CH_2OMe$ | O |
| D-12925 | H | single bond | Me | $CH_2CN$ | H | Cl | $CH_2OMe$ | O |
| D-12926 | Me | single bond | H | $CH_2CN$ | H | Cl | $CH_2OMe$ | O |
| D-12927 | Me(R) | single bond | H | $CH_2CN$ | H | Cl | $CH_2OMe$ | O |
| D-12928 | Me(S) | single bond | H | $CH_2CN$ | H | Cl | $CH_2OMe$ | O |
| D-12929 | H | single bond | Me | $CH_2CN$ | H | Me | $CH_2OMe$ | O |
| D-12930 | Me | single bond | H | $CH_2CN$ | H | Me | $CH_2OMe$ | O |
| D-12931 | Me(R) | single bond | H | $CH_2CN$ | H | Me | $CH_2OMe$ | O |
| D-12932 | Me(S) | single bond | H | $CH_2CN$ | H | Me | $CH_2OMe$ | O |
| D-12933 | H | single bond | Me | CH(Me)CN | H | Cl | $CH_2OMe$ | O |
| D-12934 | Me | single bond | H | CH(Me)CN | H | Cl | $CH_2OMe$ | O |
| D-12935 | Me(R) | single bond | H | CH(Me)CN | H | Cl | $CH_2OMe$ | O |
| D-12936 | Me(S) | single bond | H | CH(Me)CN | H | Cl | $CH_2OMe$ | O |
| D-12937 | H | single bond | Me | CH(Me)CN | H | Me | $CH_2OMe$ | O |
| D-12938 | Me | single bond | H | CH(Me)CN | H | Me | $CH_2OMe$ | O |
| D-12939 | Me(R) | single bond | H | CH(Me)CN | H | Me | $CH_2OMe$ | O |
| D-12940 | Me(S) | single bond | H | CH(Me)CN | H | Me | $CH_2OMe$ | O |
| D-12941 | H | single bond | Me | $C(Me)_2CN$ | H | Cl | $CH_2OMe$ | O |
| D-12942 | Me | single bond | H | $C(Me)_2CN$ | H | Cl | $CH_2OMe$ | O |
| D-12943 | Me(R) | single bond | H | $C(Me)_2CN$ | H | Cl | $CH_2OMe$ | O |
| D-12944 | Me(S) | single bond | H | $C(Me)_2CN$ | H | Cl | $CH_2OMe$ | O |
| D-12945 | H | single bond | Me | $C(Me)_2CN$ | H | Me | $CH_2OMe$ | O |
| D-12946 | Me | single bond | H | $C(Me)_2CN$ | H | Me | $CH_2OMe$ | O |
| D-12947 | Me(R) | single bond | H | $C(Me)_2CN$ | H | Me | $CH_2OMe$ | O |
| D-12948 | Me(S) | single bond | H | $C(Me)_2CN$ | H | Me | $CH_2OMe$ | O |
| D-12949 | H | single bond | Me | C(Me)(i-Pr)CN | H | Cl | $CH_2OMe$ | O |
| D-12950 | Me | single bond | H | C(Me)(i-Pr)CN | H | Cl | $CH_2OMe$ | O |
| D-12951 | Me(R) | single bond | H | C(Me)(i-Pr)CN | H | Cl | $CH_2OMe$ | O |
| D-12952 | Me(S) | single bond | H | C(Me)(i-Pr)CN | H | Cl | $CH_2OMe$ | O |
| D-12953 | H | single bond | Me | C(Me)(i-Pr)CN | H | Me | $CH_2OMe$ | O |
| D-12954 | Me | single bond | H | C(Me)(i-Pr)CN | H | Me | $CH_2OMe$ | O |

TABLE 941

| Compound Number | Y | W | Z | $R^1$ | $R^2$ | $R^3$ | $R^{10}$ | A |
|---|---|---|---|---|---|---|---|---|
| D-12955 | Me(R) | single bond | H | C(Me)(i-Pr)CN | H | Me | $CH_2OMe$ | O |
| D-12956 | Me(S) | single bond | H | C(Me)(i-Pr)CN | H | Me | $CH_2OMe$ | O |
| D-12957 | H | single bond | Me | OMe | H | Cl | $CH_2OMe$ | O |

TABLE 941-continued

| Compound Number | Y | W | Z | $R^1$ | $R^2$ | $R^3$ | $R^{10}$ | A |
|---|---|---|---|---|---|---|---|---|
| D-12958 | Me | single bond | H | OMe | H | Cl | $CH_2OMe$ | O |
| D-12959 | Me(R) | single bond | H | OMe | H | Cl | $CH_2OMe$ | O |
| D-12960 | Me(S) | single bond | H | OMe | H | Cl | $CH_2OMe$ | O |
| D-12961 | H | single bond | Me | OMe | H | Me | $CH_2OMe$ | O |
| D-12962 | Me | single bond | H | OMe | H | Me | $CH_2OMe$ | O |
| D-12963 | Me(R) | single bond | H | OMe | H | Me | $CH_2OMe$ | O |
| D-12964 | Me(S) | single bond | H | OMe | H | Me | $CH_2OMe$ | O |
| D-12965 | H | single bond | Me | CH═NOMe | H | Cl | $CH_2OMe$ | O |
| D-12966 | Me | single bond | H | CH═NOMe | H | Cl | $CH_2OMe$ | O |
| D-12967 | Me(R) | single bond | H | CH═NOMe | H | Cl | $CH_2OMe$ | O |
| D-12968 | Me(S) | single bond | H | CH═NOMe | H | Cl | $CH_2OMe$ | O |
| D-12969 | H | single bond | Me | CH═NOMe | H | Me | $CH_2OMe$ | O |
| D-12970 | Me | single bond | H | CH═NOMe | H | Me | $CH_2OMe$ | O |
| D-12971 | Me(R) | single bond | H | CH═NOMe | H | Me | $CH_2OMe$ | O |
| D-12972 | Me(S) | single bond | H | CH═NOMe | H | Me | $CH_2OMe$ | O |
| D-12973 | H | single bond | Me | morpholin-4-yl | H | Cl | $CH_2OMe$ | O |
| D-12974 | Me | single bond | H | morpholin-4-yl | H | Cl | $CH_2OMe$ | O |
| D-12975 | Me(R) | single bond | H | morpholin-4-yl | H | Cl | $CH_2OMe$ | O |
| D-12976 | Me(S) | single bond | H | morpholin-4-yl | H | Cl | $CH_2OMe$ | O |
| D-12977 | H | single bond | Me | morpholin-4-yl | H | Me | $CH_2OMe$ | O |
| D-12978 | Me | single bond | H | morpholin-4-yl | H | Me | $CH_2OMe$ | O |
| D-12979 | Me(R) | single bond | H | morpholin-4-yl | H | Me | $CH_2OMe$ | O |
| D-12980 | Me(S) | single bond | H | morpholin-4-yl | H | Me | $CH_2OMe$ | O |
| D-12981 | H | single bond | Me | Ph | H | Cl | $CH_2OMe$ | O |
| D-12982 | Me | single bond | H | Ph | H | Cl | $CH_2OMe$ | O |
| D-12983 | Me(R) | single bond | H | Ph | H | Cl | $CH_2OMe$ | O |
| D-12984 | Me(S) | single bond | H | Ph | H | Cl | $CH_2OMe$ | O |
| D-12985 | H | single bond | Me | Ph | H | Me | $CH_2OMe$ | O |
| D-12986 | Me | single bond | H | Ph | H | Me | $CH_2OMe$ | O |
| D-12987 | Me(R) | single bond | H | Ph | H | Me | $CH_2OMe$ | O |
| D-12988 | Me(S) | single bond | H | Ph | H | Me | $CH_2OMe$ | O |
| D-12989 | H | single bond | Me | $CH_2Ph$ | H | Cl | $CH_2OMe$ | O |
| D-12990 | Me | single bond | H | $CH_2Ph$ | H | Cl | $CH_2OMe$ | O |
| D-12991 | Me(R) | single bond | H | $CH_2Ph$ | H | Cl | $CH_2OMe$ | O |
| D-12992 | Me(S) | single bond | H | $CH_2Ph$ | H | Cl | $CH_2OMe$ | O |
| D-12993 | H | single bond | Me | $CH_2Ph$ | H | Me | $CH_2OMe$ | O |
| D-12994 | Me | single bond | H | $CH_2Ph$ | H | Me | $CH_2OMe$ | O |
| D-12995 | Me(R) | single bond | H | $CH_2Ph$ | H | Me | $CH_2OMe$ | O |
| D-12996 | Me(S) | single bond | H | $CH_2Ph$ | H | Me | $CH_2OMe$ | O |
| D-12997 | H | single bond | Me | thiazole-2-yl | H | Cl | $CH_2OMe$ | O |
| D-12998 | Me | single bond | H | thiazole-2-yl | H | Cl | $CH_2OMe$ | O |

TABLE 942

| Compound Number | Y | W | Z | $R^1$ | $R^2$ | $R^3$ | $R^{10}$ | A |
|---|---|---|---|---|---|---|---|---|
| D-12999 | Me(R) | single bond | H | thiazole-2-yl | H | Cl | $CH_2OMe$ | O |
| D-13000 | Me(S) | single bond | H | thiazole-2-yl | H | Cl | $CH_2OMe$ | O |
| D-13001 | H | single bond | Me | thiazole-2-yl | H | Me | $CH_2OMe$ | O |
| D-13002 | Me | single bond | H | thiazole-2-yl | H | Me | $CH_2OMe$ | O |
| D-13003 | Me(R) | single bond | H | thiazole-2-yl | H | Me | $CH_2OMe$ | O |
| D-13004 | Me(S) | single bond | H | thiazole-2-yl | H | Me | $CH_2OMe$ | O |
| D-13005 | H | single bond | Me | 1-Me-pyrazol-3-yl | H | Cl | $CH_2OMe$ | O |
| D-13006 | Me | single bond | H | 1-Me-pyrazol-3-yl | H | Cl | $CH_2OMe$ | O |
| D-13007 | Me(R) | single bond | H | 1-Me-pyrazol-3-yl | H | Cl | $CH_2OMe$ | O |
| D-13008 | Me(S) | single bond | H | 1-Me-pyrazol-3-yl | H | Cl | $CH_2OMe$ | O |
| D-13009 | H | single bond | Me | 1-Me-pyrazol-3-yl | H | Me | $CH_2OMe$ | O |
| D-13010 | Me | single bond | H | 1-Me-pyrazol-3-yl | H | Me | $CH_2OMe$ | O |
| D-13011 | Me(R) | single bond | H | 1-Me-pyrazol-3-yl | H | Me | $CH_2OMe$ | O |
| D-13012 | Me(S) | single bond | H | 1-Me-pyrazol-3-yl | H | Me | $CH_2OMe$ | O |
| D-13013 | H | single bond | Me | 1-Me-pyrazol-5-yl | H | Cl | $CH_2OMe$ | O |
| D-13014 | Me | single bond | H | 1-Me-pyrazol-5-yl | H | Cl | $CH_2OMe$ | O |
| D-13015 | Me(R) | single bond | H | 1-Me-pyrazol-5-yl | H | Cl | $CH_2OMe$ | O |
| D-13016 | Me(S) | single bond | H | 1-Me-pyrazol-5-yl | H | Cl | $CH_2OMe$ | O |
| D-13017 | H | single bond | Me | 1-Me-pyrazol-5-yl | H | Me | $CH_2OMe$ | O |
| D-13018 | Me | single bond | H | 1-Me-pyrazol-5-yl | H | Me | $CH_2OMe$ | O |
| D-13019 | Me(R) | single bond | H | 1-Me-pyrazol-5-yl | H | Me | $CH_2OMe$ | O |
| D-13020 | Me(S) | single bond | H | 1-Me-pyrazol-5-yl | H | Me | $CH_2OMe$ | O |
| D-13021 | H | single bond | Me | $CH_2$(pyrimidin-2-yl) | H | Cl | $CH_2OMe$ | O |
| D-13022 | Me | single bond | H | $CH_2$(pyrimidin-2-yl) | H | Cl | $CH_2OMe$ | O |
| D-13023 | Me(R) | single bond | H | $CH_2$(pyrimidin-2-yl) | H | Cl | $CH_2OMe$ | O |
| D-13024 | Me(S) | single bond | H | $CH_2$(pyrimidin-2-yl) | H | Cl | $CH_2OMe$ | O |

TABLE 942-continued

| Compound Number | Y | W | Z | $R^1$ | $R^2$ | $R^3$ | $R^{10}$ | A |
|---|---|---|---|---|---|---|---|---|
| D-13025 | H | single bond | Me | $CH_2$(pyrimidin-2-yl) | H | Me | $CH_2OMe$ | O |
| D-13026 | Me | single bond | H | $CH_2$(pyrimidin-2-yl) | H | Me | $CH_2OMe$ | O |
| D-13027 | Me(R) | single bond | H | $CH_2$(pyrimidin-2-yl) | H | Me | $CH_2OMe$ | O |
| D-13028 | Me(S) | single bond | H | $CH_2$(pyrimidin-2-yl) | H | Me | $CH_2OMe$ | O |
| D-13029 | H | single bond | Me | $—CH_2CH_2CH_2—$ | | Cl | $CH_2OMe$ | O |
| D-13030 | Me | single bond | H | $—CH_2CH_2CH_2—$ | | Cl | $CH_2OMe$ | O |
| D-13031 | Me(R) | single bond | H | $—CH_2CH_2CH_2—$ | | Cl | $CH_2OMe$ | O |
| D-13032 | Me(S) | single bond | H | $—CH_2CH_2CH_2—$ | | Cl | $CH_2OMe$ | O |
| D-13033 | H | single bond | Me | $—CH_2CH_2CH_2—$ | | Me | $CH_2OMe$ | O |
| D-13034 | Me | single bond | H | $—CH_2CH_2CH_2—$ | | Me | $CH_2OMe$ | O |
| D-13035 | Me(R) | single bond | H | $—CH_2CH_2CH_2—$ | | Me | $CH_2OMe$ | O |
| D-13036 | Me(S) | single bond | H | $—CH_2CH_2CH_2—$ | | Me | $CH_2OMe$ | O |
| D-13037 | H | single bond | Me | $—CH_2CH_2OCH_2CH_2—$ | | Cl | $CH_2OMe$ | O |
| D-13038 | Me | single bond | H | $—CH_2CH_2OCH_2CH_2—$ | | Cl | $CH_2OMe$ | O |
| D-13039 | Me(R) | single bond | H | $—CH_2CH_2OCH_2CH_2—$ | | Cl | $CH_2OMe$ | O |
| D-13040 | Me(S) | single bond | H | $—CH_2CH_2OCH_2CH_2—$ | | Cl | $CH_2OMe$ | O |
| D-13041 | H | single bond | Me | $—CH_2CH_2OCH_2CH_2—$ | | Me | $CH_2OMe$ | O |
| D-13042 | Me | single bond | H | $—CH_2CH_2OCH_2CH_2—$ | | Me | $CH_2OMe$ | O |

TABLE 943

| Compound Number | Y | W | Z | $R^1$ | $R^2$ | $R^3$ | $R^{10}$ | A |
|---|---|---|---|---|---|---|---|---|
| D-13043 | Me(R) | single bond | H | $—CH_2CH_2OCH_2CH_2—$ | Me | $CH_2OMe$ | O | |
| D-13044 | Me(S) | single bond | H | $—CH_2CH_2OCH_2CH_2—$ | Me | $CH_2OMe$ | O | |
| D-13045 | H | single bond | Me | Me | H | Cl | O | O |
| D-13046 | Me | single bond | H | Me | H | Cl | O | O |
| D-13047 | Me(R) | single bond | H | Me | H | Cl | O | O |
| D-13048 | Me(S) | single bond | H | Me | H | Cl | O | O |
| D-13049 | H | single bond | Me | Me | H | Me | O | O |
| D-13050 | Me | single bond | H | Me | H | Me | O | O |
| D-13051 | Me(R) | single bond | H | Me | H | Me | O | O |
| D-13052 | Me(S) | single bond | H | Me | H | Me | O | O |
| D-13053 | H | single bond | Me | $CH_2CHF_2$ | H | Cl | O | O |
| D-13054 | Me | single bond | H | $CH_2CHF_2$ | H | Cl | O | O |
| D-13055 | Me(R) | single bond | H | $CH_2CHF_2$ | H | Cl | O | O |
| D-13056 | Me(S) | single bond | H | $CH_2CHF_2$ | H | Cl | O | O |
| D-13057 | H | single bond | Me | $CH_2CHF_2$ | H | Me | O | O |
| D-13058 | Me | single bond | H | $CH_2CHF_2$ | H | Me | O | O |
| D-13059 | Me(R) | single bond | H | $CH_2CHF_2$ | H | Me | O | O |
| D-13060 | Me(S) | single bond | H | $CH_2CHF_2$ | H | Me | O | O |
| D-13061 | H | single bond | Me | n-Pr | H | Cl | O | O |
| D-13062 | Me | single bond | H | n-Pr | H | Cl | O | O |
| D-13063 | Me(R) | single bond | H | n-Pr | H | Cl | O | O |
| D-13064 | Me(S) | single bond | H | n-Pr | H | Cl | O | O |
| D-13065 | H | single bond | Me | n-Pr | H | Me | O | O |
| D-13066 | Me | single bond | H | n-Pr | H | Me | O | O |
| D-13067 | Me(R) | single bond | H | n-Pr | H | Me | O | O |
| D-13068 | Me(S) | single bond | H | n-Pr | H | Me | O | O |
| D-13069 | H | single bond | Me | i-Pr | H | Cl | O | O |
| D-13070 | Me | single bond | H | i-Pr | H | Cl | O | O |
| D-13071 | Me(R) | single bond | H | i-Pr | H | Cl | O | O |
| D-13072 | Me(S) | single bond | H | i-Pr | H | Cl | O | O |
| D-13073 | H | single bond | Me | i-Pr | H | Me | O | O |
| D-13074 | Me | single bond | H | i-Pr | H | Me | O | O |
| D-13075 | Me(R) | single bond | H | i-Pr | H | Me | O | O |
| D-13076 | Me(S) | single bond | H | i-Pr | H | Me | O | O |
| D-13077 | H | single bond | Me | c-Pr(1-F) | H | Cl | O | O |
| D-13078 | Me | single bond | H | c-Pr(1-F) | H | Cl | O | O |
| D-13079 | Me(R) | single bond | H | c-Pr(1-F) | H | Cl | O | O |
| D-13080 | Me(S) | single bond | H | c-Pr(1-F) | H | Cl | O | O |
| D-13081 | H | single bond | Me | c-Pr(1-F) | H | Me | O | O |
| D-13082 | Me | single bond | H | c-Pr(1-F) | H | Me | O | O |
| D-13083 | Me(R) | single bond | H | c-Pr(1-F) | H | Me | O | O |
| D-13084 | Me(S) | single bond | H | c-Pr(1-F) | H | Me | O | O |
| D-13085 | H | single bond | Me | c-Pr(2,2-$F_2$) | H | Cl | O | O |
| D-13086 | Me | single bond | H | c-Pr(2,2-$F_2$) | H | Cl | O | O |

TABLE 944

| Compound Number | Y | W | Z | $R^1$ | $R^2$ | $R^3$ | $R^{10}$ | A |
|---|---|---|---|---|---|---|---|---|
| D-13087 | Me(R) | single bond | H | c-Pr(2,2-$F_2$) | H | Cl | C(═O)Me | O |
| D-13088 | Me(S) | single bond | H | c-Pr(2,2-$F_2$) | H | Cl | C(═O)Me | O |
| D-13089 | H | single bond | Me | c-Pr(2,2-$F_2$) | H | Me | C(═O)Me | O |
| D-13090 | Me | single bond | H | c-Pr(2,2-$F_2$) | H | Me | C(═O)Me | O |
| D-13091 | Me(R) | single bond | H | c-Pr(2,2-$F_2$) | H | Me | C(═O)Me | O |
| D-13092 | Me(S) | single bond | H | c-Pr(2,2-$F_2$) | H | Me | C(═O)Me | O |
| D-13093 | H | single bond | Me | c-Pr(1-Cl) | H | Cl | C(═O)Me | O |
| D-13094 | Me | single bond | H | c-Pr(1-Cl) | H | Cl | C(═O)Me | O |
| D-13095 | Me(R) | single bond | H | c-Pr(1-Cl) | H | Cl | C(═O)Me | O |
| D-13096 | Me(S) | single bond | H | c-Pr(1-Cl) | H | Cl | C(═O)Me | O |
| D-13097 | H | single bond | Me | c-Pr(1-Cl) | H | Me | C(═O)Me | O |
| D-13098 | Me | single bond | H | c-Pr(1-Cl) | H | Me | C(═O)Me | O |
| D-13099 | Me(R) | single bond | H | c-Pr(1-Cl) | H | Me | C(═O)Me | O |
| D-13100 | Me(S) | single bond | H | c-Pr(1-Cl) | H | Me | C(═O)Me | O |
| D-13101 | H | single bond | Me | c-Pr(1-Br) | H | Cl | C(═O)Me | O |
| D-13102 | Me | single bond | H | c-Pr(1-Br) | H | Cl | C(═O)Me | O |
| D-13103 | Me(R) | single bond | H | c-Pr(1-Br) | H | Cl | C(═O)Me | O |
| D-13104 | Me(S) | single bond | H | c-Pr(1-Br) | H | Cl | C(═O)Me | O |
| D-13105 | H | single bond | Me | c-Pr(1-Br) | H | Me | C(═O)Me | O |
| D-13106 | Me | single bond | H | c-Pr(1-Br) | H | Me | C(═O)Me | O |
| D-13107 | Me(R) | single bond | H | c-Pr(1-Br) | H | Me | C(═O)Me | O |
| D-13108 | Me(S) | single bond | H | c-Pr(1-Br) | H | Me | C(═O)Me | O |
| D-13109 | H | single bond | Me | c-Pr(1-Me) | H | Cl | C(═O)Me | O |
| D-13110 | Me | single bond | H | c-Pr(1-Me) | H | Cl | C(═O)Me | O |
| D-13111 | Me(R) | single bond | H | c-Pr(1-Me) | H | Cl | C(═O)Me | O |
| D-13112 | Me(S) | single bond | H | c-Pr(1-Me) | H | Cl | C(═O)Me | O |
| D-13113 | H | single bond | Me | c-Pr(1-Me) | H | Me | C(═O)Me | O |
| D-13114 | Me | single bond | H | c-Pr(1-Me) | H | Me | C(═O)Me | O |
| D-13115 | Me(R) | single bond | H | c-Pr(1-Me) | H | Me | C(═O)Me | O |
| D-13116 | Me(S) | single bond | H | c-Pr(1-Me) | H | Me | C(═O)Me | O |
| D-13117 | H | single bond | Me | c-Pr(1-$CH_2OH$) | H | Cl | C(═O)Me | O |
| D-13118 | Me | single bond | H | c-Pr(1-$CH_2OH$) | H | Cl | C(═O)Me | O |
| D-13119 | Me(R) | single bond | H | c-Pr(1-$CH_2OH$) | H | Cl | C(═O)Me | O |
| D-13120 | Me(S) | single bond | H | c-Pr(1-$CH_2OH$) | H | Cl | C(═O)Me | O |
| D-13121 | H | single bond | Me | c-Pr(1-$CH_2OH$) | H | Me | C(═O)Me | O |
| D-13122 | Me | single bond | H | c-Pr(1-$CH_2OH$) | H | Me | C(═O)Me | O |
| D-13123 | Me(R) | single bond | H | c-Pr(1-$CH_2OH$) | H | Me | C(═O)Me | O |
| D-13124 | Me(S) | single bond | H | c-Pr(1-$CH_2OH$) | H | Me | C(═O)Me | O |
| D-13125 | H | single bond | Me | c-Pr[1-$CH_2OS$](═O)$_2$Me] | H | Cl | C(═O)Me | O |
| D-13126 | Me | single bond | H | c-Pr[1-$CH_2OS$](═O)$_2$Me] | H | Cl | C(═O)Me | O |
| D-13127 | Me(R) | single bond | H | c-Pr[1-$CH_2OS$](═O)$_2$Me] | H | Cl | C(═O)Me | O |
| D-13128 | Me(S) | single bond | H | c-Pr[1-$CH_2OS$](═O)$_2$Me] | H | Cl | C(═O)Me | O |
| D-13129 | H | single bond | Me | c-Pr[1-$CH_2OS$](═O)$_2$Me] | H | Me | C(═O)Me | O |
| D-13130 | Me | single bond | H | c-Pr[1-$CH_2OS$](═O)$_2$Me] | H | Me | C(═O)Me | O |

TABLE 945

| Compound Number | Y | W | Z | $R^1$ | $R^2$ | $R^3$ | $R^{10}$ | A |
|---|---|---|---|---|---|---|---|---|
| D-13131 | Me(R) | single bond | H | c-Pr[1-$CH_2OS$](═O)$_2$Me] | H | Me | C(═O)Me | O |
| D-13132 | Me(S) | single bond | H | c-Pr[1-$CH_2OS$](═O)$_2$Me] | H | Me | C(═O)Me | O |
| D-13133 | H | single bond | Me | c-Pr(1-$CH_2OMe$) | H | Cl | C(═O)Me | O |
| D-13134 | Me | single bond | H | c-Pr(1-$CH_2OMe$) | H | Cl | C(═O)Me | O |
| D-13135 | Me(R) | single bond | H | c-Pr(1-$CH_2OMe$) | H | Cl | C(═O)Me | O |
| D-13136 | Me(S) | single bond | H | c-Pr(1-$CH_2OMe$) | H | Cl | C(═O)Me | O |
| D-13137 | H | single bond | Me | c-Pr(1-$CH_2OMe$) | H | Me | C(═O)Me | O |
| D-13138 | Me | single bond | H | c-Pr(1-$CH_2OMe$) | H | Me | C(═O)Me | O |
| D-13139 | Me(R) | single bond | H | c-Pr(1-$CH_2OMe$) | H | Me | C(═O)Me | O |
| D-13140 | Me(S) | single bond | H | c-Pr(1-$CH_2OMe$) | H | Me | C(═O)Me | O |
| D-13141 | H | single bond | Me | c-Pr(1-$CH_2OCN$) | H | Cl | C(═O)Me | O |
| D-13142 | Me | single bond | H | c-Pr(1-$CH_2OCN$) | H | Cl | C(═O)Me | O |
| D-13143 | Me(R) | single bond | H | c-Pr(1-$CH_2OCN$) | H | Cl | C(═O)Me | O |
| D-13144 | Me(S) | single bond | H | c-Pr(1-$CH_2OCN$) | H | Cl | C(═O)Me | O |
| D-13145 | H | single bond | Me | c-Pr(1-$CH_2OCN$) | H | Me | C(═O)Me | O |
| D-13146 | Me | single bond | H | c-Pr(1-$CH_2OCN$) | H | Me | C(═O)Me | O |
| D-13147 | Me(R) | single bond | H | c-Pr(1-$CH_2OCN$) | H | Me | C(═O)Me | O |
| D-13148 | Me(S) | single bond | H | c-Pr(1-$CH_2OCN$) | H | Me | C(═O)Me | O |
| D-13149 | H | single bond | Me | c-Pr(1-$CH_2SMe$) | H | Cl | C(═O)Me | O |
| D-13150 | Me | single bond | H | c-Pr(1-$CH_2SMe$) | H | Cl | C(═O)Me | O |
| D-13151 | Me(R) | single bond | H | c-Pr(1-$CH_2SMe$) | H | Cl | C(═O)Me | O |
| D-13152 | Me(S) | single bond | H | c-Pr(1-$CH_2SMe$) | H | Cl | C(═O)Me | O |
| D-13153 | H | single bond | Me | c-Pr(1-$CH_2SMe$) | H | Me | C(═O)Me | O |

TABLE 945-continued

| Compound Number | Y | W | Z | $R^1$ | $R^2$ | $R^3$ | $R^{10}$ | A |
|---|---|---|---|---|---|---|---|---|
| D-13154 | Me | single bond | H | c-Pr(1-$CH_2$SMe) | H | Me | C(=O)Me | O |
| D-13155 | Me(R) | single bond | H | c-Pr(1-$CH_2$SMe) | H | Me | C(=O)Me | O |
| D-13156 | Me(S) | single bond | H | c-Pr(1-$CH_2$SMe) | H | Me | C(=O)Me | O |
| D-13157 | H | single bond | Me | c-Pr[1-$CH_2$S(=O)Me] | H | Cl | C(=O)Me | O |
| D-13158 | Me | single bond | H | c-Pr[1-$CH_2$S(=O)Me] | H | Cl | C(=O)Me | O |
| D-13159 | Me(R) | single bond | H | c-Pr[1-$CH_2$S(=O)Me] | H | Cl | C(=O)Me | O |
| D-13160 | Me(S) | single bond | H | c-Pr[1-$CH_2$S(=O)Me] | H | Cl | C(=O)Me | O |
| D-13161 | H | single bond | Me | c-Pr[1-$CH_2$S(=O)Me] | H | Me | C(=O)Me | O |
| D-13162 | Me | single bond | H | c-Pr[1-$CH_2$S(=O)Me] | H | Me | C(=O)Me | O |
| D-13163 | Me(R) | single bond | H | c-Pr[1-$CH_2$S(=O)Me] | H | Me | C(=O)Me | O |
| D-13164 | Me(S) | single bond | H | c-Pr[1-$CH_2$S(=O)Me] | H | Me | C(=O)Me | O |
| D-13165 | H | single bond | Me | c-Pr[1-$CH_2$S](=O)$_2$Me] | H | Cl | C(=O)Me | O |
| D-13166 | Me | single bond | H | c-Pr[1-$CH_2$S](=O)$_2$Me] | H | Cl | C(=O)Me | O |
| D-13167 | Me(R) | single bond | H | c-Pr[1-$CH_2$S](=O)$_2$Me] | H | Cl | C(=O)Me | O |
| D-13168 | Me(S) | single bond | H | c-Pr[1-$CH_2$S](=O)$_2$Me] | H | Cl | C(=O)Me | O |
| D-13169 | H | single bond | Me | c-Pr[1-$CH_2$S](=O)$_2$Me] | H | Me | C(=O)Me | O |
| D-13170 | Me | single bond | H | c-Pr[1-$CH_2$S](=O)$_2$Me] | H | Me | C(=O)Me | O |
| D-13171 | Me(R) | single bond | H | c-Pr[1-$CH_2$S](=O)$_2$Me] | H | Me | C(=O)Me | O |
| D-13172 | Me(S) | single bond | H | c-Pr[1-$CH_2$S](=O)$_2$Me] | H | Me | C(=O)Me | O |
| D-13173 | H | single bond | Me | c-Pr(1-$CH_2$F) | H | Cl | C(=O)Me | O |
| D-13174 | Me | single bond | H | c-Pr(1-$CH_2$F) | H | Cl | C(=O)Me | O |

TABLE 946

| Compound Number | Y | W | Z | $R^1$ | $R^2$ | $R^3$ | $R^{10}$ | A |
|---|---|---|---|---|---|---|---|---|
| D-13175 | Me(R) | single bond | H | c-Pr(1-$CH_2$F) | H | Cl | C(=O)Me | O |
| D-13176 | Me(S) | single bond | H | c-Pr(1-$CH_2$F) | H | Cl | C(=O)Me | O |
| D-13177 | H | single bond | Me | c-Pr(1-$CH_2$F) | H | Me | C(=O)Me | O |
| D-13178 | Me | single bond | H | c-Pr(1-$CH_2$F) | H | Me | C(=O)Me | O |
| D-13179 | Me(R) | single bond | H | c-Pr(1-$CH_2$F) | H | Me | C(=O)Me | O |
| D-13180 | Me(S) | single bond | H | c-Pr(1-$CH_2$F) | H | Me | C(=O)Me | O |
| D-13181 | H | single bond | Me | c-Pr(1-$CHF_2$) | H | Cl | C(=O)Me | O |
| D-13182 | Me | single bond | H | c-Pr(1-$CHF_2$) | H | Cl | C(=O)Me | O |
| D-13183 | Me(R) | single bond | H | c-Pr(1-$CHF_2$) | H | Cl | C(=O)Me | O |
| D-13184 | Me(S) | single bond | H | c-Pr(1-$CHF_2$) | H | Cl | C(=O)Me | O |
| D-13185 | H | single bond | Me | c-Pr(1-$CHF_2$) | H | Me | C(=O)Me | O |
| D-13186 | Me | single bond | H | c-Pr(1-$CHF_2$) | H | Me | C(=O)Me | O |
| D-13187 | Me(R) | single bond | H | c-Pr(1-$CHF_2$) | H | Me | C(=O)Me | O |
| D-13188 | Me(S) | single bond | H | c-Pr(1-$CHF_2$) | H | Me | C(=O)Me | O |
| D-13189 | H | single bond | Me | c-Pr(1-$CF_3$) | H | Cl | C(=O)Me | O |
| D-13190 | Me | single bond | H | c-Pr(1-$CF_3$) | H | Cl | C(=O)Me | O |
| D-13191 | Me(R) | single bond | H | c-Pr(1-$CF_3$) | H | Cl | C(=O)Me | O |
| D-13192 | Me(S) | single bond | H | c-Pr(1-$CF_3$) | H | Cl | C(=O)Me | O |
| D-13193 | H | single bond | Me | c-Pr(1-$CF_3$) | H | Me | C(=O)Me | O |
| D-13194 | Me | single bond | H | c-Pr(1-$CF_3$) | H | Me | C(=O)Me | O |
| D-13195 | Me(R) | single bond | H | c-Pr(1-$CF_3$) | H | Me | C(=O)Me | O |
| D-13196 | Me(S) | single bond | H | c-Pr(1-$CF_3$) | H | Me | C(=O)Me | O |
| D-13197 | H | single bond | Me | c-Pr(1-C=CH) | H | Cl | C(=O)Me | O |
| D-13198 | Me | single bond | H | c-Pr(1-C=CH) | H | Cl | C(=O)Me | O |
| D-13199 | Me(R) | single bond | H | c-Pr(1-C=CH) | H | Cl | C(=O)Me | O |
| D-13200 | Me(S) | single bond | H | c-Pr(1-C=CH) | H | Cl | C(=O)Me | 0 |
| D-13201 | H | single bond | Me | c-Pr(1-C=CH) | H | Me | C(=O)Me | O |
| D-13202 | Me | single bond | H | c-Pr(1-C=CH) | H | Me | C(=O)Me | O |
| D-13203 | Me(R) | single bond | H | c-Pr(1-C=CH) | H | Me | C(=O)Me | O |
| D-13204 | Me(S) | single bond | H | c-Pr(1-C=CH) | H | Me | C(=O)Me | O |
| D-13205 | H | single bond | Me | c-Pr[1-C(=O)OEt] | H | Cl | C(=O)Me | O |
| D-13206 | Me | single bond | H | c-Pr[1-C(=O)OEt] | H | Cl | C(=O)Me | O |
| D-13207 | Me(R) | single bond | H | c-Pr[1-C(=O)OEt] | H | Cl | C(=O)Me | O |
| D-13208 | Me(S) | single bond | H | c-Pr[1-C(=O)OEt] | H | Cl | C(=O)Me | O |
| D-13209 | H | single bond | Me | c-Pr[1-C(=O)OEt] | H | Me | C(=O)Me | O |
| D-13210 | Me | single bond | H | c-Pr[1-C(=O)OEt] | H | Me | C(=O)Me | O |
| D-13211 | Me(R) | single bond | H | c-Pr[1-C(=O)OEt] | H | Me | C(=O)Me | O |
| D-13212 | Me(S) | single bond | H | c-Pr[1-C(=O)OEt] | H | Me | C(=O)Me | O |
| D-13213 | H | single bond | Me | c-Pr[1-C(=O)OH] | H | Cl | C(=O)Me | O |
| D-13214 | Me | single bond | H | c-Pr[1-C(=O)OH] | H | Cl | C(=O)Me | O |
| D-13215 | Me(R) | single bond | H | c-Pr[1-C(=O)OH] | H | Cl | C(=O)Me | O |
| D-13216 | Me(S) | single bond | H | c-Pr[1-C(=O)OH] | H | Cl | C(=O)Me | O |
| D-13217 | H | single bond | Me | c-Pr[1-C(=O)OH] | H | Me | C(=O)Me | O |
| D-13218 | Me | single bond | H | c-Pr[1-C(=O)OH] | H | Me | C(=O)Me | O |

TABLE 947

| Compound Number | Y | W | Z | $R^1$ | $R^2$ | $R^3$ | $R^{10}$ | A |
|---|---|---|---|---|---|---|---|---|
| D-13219 | Me(R) | single bond | H | c-Pr[1-C(═O)OH] | H | Me | C(═O)Me | O |
| D-13220 | Me(S) | single bond | H | c-Pr[1-C(═O)OH] | H | Me | C(═O)Me | O |
| D-13221 | H | single bond | Me | c-Pr[1-C(═O)$NH_2$] | O | Cl | C(═O)Me | O |
| D-13222 | Me | single bond | H | c-Pr[1-C(═O)$NH_2$] | H | Cl | C(═O)Me | O |
| D-13223 | Me(R) | single bond | H | c-Pr[1-C(═O)$NH_2$] | H | Cl | C(═O)Me | O |
| D-13224 | Me(S) | single bond | H | c-Pr[1-C(═O)$NH_2$] | H | Cl | C(═O)Me | O |
| D-13225 | H | single bond | Me | c-Pr[1-C(═O)$NH_2$] | H | Me | C(═O)Me | O |
| D-13226 | Me | single bond | H | c-Pr[1-C(═O)$NH_2$] | H | Me | C(═O)Me | O |
| D-13227 | Me(R) | single bond | H | c-Pr[1-C(═O)$NH_2$] | H | Me | C(═O)Me | O |
| D-13228 | Me(S) | single bond | H | c-Pr[1-C(═O)$NH_2$] | H | Me | C(═O)Me | O |
| D-13229 | H | single bond | Me | c-Pr(1-OMe) | H | Cl | C(═O)Me | O |
| D-13230 | Me | single bond | H | c-Pr(1-OMe) | H | Cl | C(═O)Me | O |
| D-13231 | Me(R) | single bond | H | c-Pr(1-OMe) | H | Cl | C(═O)Me | O |
| D-13232 | Me(S) | single bond | H | c-Pr(1-OMe) | H | Cl | C(═O)Me | O |
| D-13233 | H | single bond | Me | c-Pr(1-OMe) | H | Me | C(═O)Me | O |
| D-13234 | Me | single bond | H | c-Pr(1-OMe) | H | Me | C(═O)Me | O |
| D-13235 | Me(R) | single bond | H | c-Pr(1-OMe) | H | Me | C(═O)Me | O |
| D-13236 | Me(S) | single bond | H | c-Pr(1-OMe) | H | Me | C(═O)Me | O |
| D-13237 | H | single bond | Me | c-Pr(1-SMe) | H | Cl | C(═O)Me | O |
| D-13238 | Me | single bond | H | c-Pr(1-SMe) | H | Cl | C(═O)Me | O |
| D-13239 | Me(R) | single bond | H | c-Pr(1-SMe) | H | Cl | C(═O)Me | O |
| D-13240 | Me(S) | single bond | H | c-Pr(1-SMe) | H | Cl | C(═O)Me | O |
| D-13241 | H | single bond | Me | c-Pr(1-SMe) | H | Me | C(═O)Me | O |
| D-13242 | Me | single bond | H | c-Pr(1-SMe) | H | Me | C(═O)Me | O |
| D-13243 | Me(R) | single bond | H | c-Pr(1-SMe) | H | Me | C(═O)Me | O |
| D-13244 | Me(S) | single bond | H | c-Pr(1-SMe) | H | Me | C(═O)Me | O |
| D-13245 | H | single bond | Me | c-Pr[1-S(═O)Me] | H | Cl | C(═O)Me | O |
| D-13246 | Me | single bond | H | c-Pr[1-S(═O)Me] | H | Cl | C(═O)Me | O |
| D-13247 | Me(R) | single bond | H | c-Pr[1-S(═O)Me] | H | Cl | C(═O)Me | O |
| D-13248 | Me(S) | single bond | H | c-Pr[1-S(═O)Me] | H | Cl | C(═O)Me | O |
| D-13249 | H | single bond | Me | c-Pr[1-S(═O)Me] | H | Me | C(═O)Me | O |
| D-13250 | Me | single bond | H | c-Pr[1-S(═O)Me] | H | Me | C(═O)Me | O |
| D-13251 | Me(R) | single bond | H | c-Pr[1-S(═O)Me] | H | Me | C(═O)Me | O |
| D-13252 | Me(S) | single bond | H | c-Pr[1-S(═O)Me] | H | Me | C(═O)Me | O |
| D-13253 | H | single bond | Me | c-Pr[1-S(═O)$_2$Me] | H | Cl | C(═O)Me | O |
| D-13254 | Me | single bond | H | c-Pr[1-S(═O)$_2$Me] | H | Cl | C(═O)Me | O |
| D-13255 | Me(R) | single bond | H | c-Pr[1-S(═O)$_2$Me] | H | Cl | C(═O)Me | O |
| D-13256 | Me(S) | single bond | H | c-Pr[1-S(═O)$_2$Me] | H | Cl | C(═O)Me | O |
| D-13257 | H | single bond | Me | c-Pr[1-S(═O)$_2$Me] | H | Me | C(═O)Me | O |
| D-13258 | Me | single bond | H | c-Pr[1-S(═O)$_2$Me] | H | Me | C(═O)Me | O |
| D-13259 | Me(R) | single bond | H | c-Pr[1-S(═O)$_2$Me] | H | Me | C(═O)Me | O |
| D-13260 | Me(S) | single bond | H | c-Pr[1-S(═O)$_2$Me] | H | Me | C(═O)Me | O |
| D-13261 | H | single bond | Me | c-Pr[1-S(═O)$_2$$CHF_2$] | H | Cl | C(═O)Me | O |
| D-13262 | Me | single bond | H | c-Pr[1-S(═O)$_2$$CHF_2$] | H | Cl | C(═O)Me | O |

TABLE 948

| Compound Number | Y | W | Z | $R^1$ | $R^2$ | $R^3$ | $R^{10}$ | A |
|---|---|---|---|---|---|---|---|---|
| D-13263 | Me(R) | single bond | H | c-Pr[1-S(═O)$_2$$CHF_2$] | H | Cl | C(═O)Me | O |
| D-13264 | Me(S) | single bond | H | c-Pr[1-S(═O)$_2$$CHF_2$] | H | Cl | C(═O)Me | O |
| D-13265 | H | single bond | Me | c-Pr[1-S(═O)$_2$$CHF_2$] | H | Me | C(═O)Me | O |
| D-13266 | Me | single bond | H | c-Pr[1-S(═O)$_2$$CHF_2$] | H | Me | C(═O)Me | O |
| D-13267 | Me(R) | single bond | H | c-Pr[1-S(═O)$_2$$CHF_2$] | H | Me | C(═O)Me | O |
| D-13268 | Me(S) | single bond | H | c-Pr[1-S(═O)$_2$$CHF_2$] | H | Me | C(═O)Me | O |
| D-13269 | H | single bond | Me | c-Pr[1-S(═O)$_2$$CHF_3$] | H | Cl | C(═O)Me | O |
| D-13270 | Me | single bond | H | c-Pr[1-S(═O)$_2$$CHF_3$] | H | Cl | C(═O)Me | O |
| D-13271 | Me(R) | single bond | H | c-Pr[1-S(═O)$_2$$CHF_3$] | H | Cl | C(═O)Me | O |
| D-13272 | Me(S) | single bond | H | c-Pr[1-S(═O)$_2$$CHF_3$] | H | Cl | C(═O)Me | O |
| D-13273 | H | single bond | Me | c-Pr[1-S(═O)$_2$$CHF_3$] | H | Me | C(═O)Me | O |
| D-13274 | Me | single bond | H | c-Pr[1-S(═O)$_2$$CHF_3$] | H | Me | C(═O)Me | O |
| D-13275 | Me(R) | single bond | H | c-Pr[1-S(═O)$_2$$CHF_3$] | H | Me | C(═O)Me | O |
| D-13276 | Me(S) | single bond | H | c-Pr[1-S(═O)$_2$$CHF_3$] | H | Me | C(═O)Me | O |
| D-13277 | H | single bond | Me | c-Pr[1-(5,6-dihydro-1,4,2-dioxazin-3-yl)] | H | Cl | C(═O)Me | O |
| D-13278 | Me | single bond | H | c-Pr[1-(5,6-dihydro-1,4,2-dioxazin-3-yl)] | H | Cl | C(═O)Me | O |
| D-13279 | Me(R) | single bond | H | c-Pr[1-(5,6-dihydro-1,4,2-dioxazin-3-yl)] | H | Cl | C(═O)Me | O |
| D-13280 | Me(S) | single bond | H | c-Pr[1-(5,6-dihydro-1,4,2-dioxazin-3-yl)] | H | Cl | C(═O)Me | O |
| D-13281 | H | single bond | Me | c-Pr[1-(5,6-dihydro-1,4,2-dioxazin-3-yl)] | H | Me | C(═O)Me | O |
| D-13282 | Me | single bond | H | c-Pr[1-(5,6-dihydro-1,4,2-dioxazin-3-yl)] | H | Me | C(═O)Me | O |
| D-13283 | Me(R) | single bond | H | c-Pr[1-(5,6-dihydro-1,4,2-dioxazin-3-yl)] | H | Me | C(═O)Me | O |

TABLE 948-continued

| Compound Number | Y | W | Z | $R^1$ | $R^2$ | $R^3$ | $R^{10}$ | A |
|---|---|---|---|---|---|---|---|---|
| D-13284 | Me(S) | single bond | H | c-Pr[1-(5,6-dihydro-1,4,2-dioxazin-3-yl)] | H | Me | C(=O)Me | O |
| D-13285 | H | single bond | Me | c-Pr[1-(5-hydroxy-1,3,4-oxadiazol-2-yl)] | H | Cl | C(=O)Me | O |
| D-13286 | Me | single bond | H | c-Pr[1-(5-hydroxy-1,3,4-oxadiazol-2-yl)] | H | Cl | C(=O)Me | O |
| D-13287 | Me(R) | single bond | H | c-Pr[1-(5-hydroxy-1,3,4-oxadiazol-2-yl)] | H | Cl | C(=O)Me | O |
| D-13288 | Me(S) | single bond | H | c-Pr[1-(5-hydroxy-1,3,4-oxadiazol-2-yl)] | H | Cl | C(=O)Me | O |
| D-13289 | H | single bond | Me | c-Pr[1-(5-hydroxy-1,3,4-oxadiazol-2-yl)] | H | Me | C(=O)Me | O |
| D-13290 | Me | single bond | H | c-Pr[1-(5-hydroxy-1,3,4-oxadiazol-2-yl)] | H | Me | C(=O)Me | O |
| D-13291 | Me(R) | single bond | H | c-Pr[1-(5-hydroxy-1,3,4-oxadiazol-2-yl)] | H | Me | C(=O)Me | O |
| D-13292 | Me(S) | single bond | H | c-Pr[1-(5-hydroxy-1,3,4-oxadiazol-2-yl)] | H | Me | C(=O)Me | O |
| D-13293 | H | single bond | Me | c-Pr[1-(pyrimidin-2-yl)] | H | Cl | C(=O)Me | O |
| D-13294 | Me | single bond | H | c-Pr[1-(pyrimidin-2-yl)] | H | Cl | C(=O)Me | O |
| D-13295 | Me(R) | single bond | H | c-Pr[1-(pyrimidin-2-yl)] | H | Cl | C(=O)Me | O |
| D-13296 | Me(S) | single bond | H | c-Pr[1-(pyrimidin-2-yl)] | H | Cl | C(=O)Me | O |
| D-13297 | H | single bond | Me | c-Pr[1-(pyrimidin-2-yl)] | H | Me | C(=O)Me | O |
| D-13298 | Me | single bond | H | c-Pr[1-(pyrimidin-2-yl)] | H | Me | C(=O)Me | O |
| D-13299 | Me(R) | single bond | H | c-Pr[1-(pyrimidin-2-yl)] | H | Me | C(=O)Me | O |
| D-13300 | Me(S) | single bond | H | c-Pr[1-(pyrimidin-2-yl)] | H | Me | C(=O)Me | O |
| D-13301 | H | single bond | Me | t-Bu | H | Cl | C(=O)Me | O |
| D-13302 | Me | single bond | H | t-Bu | H | Cl | C(=O)Me | O |
| D-13303 | Me(R) | single bond | H | t-Bu | H | Cl | C(=O)Me | O |
| D-13304 | Me(S) | single bond | H | t-Bu | H | Cl | C(=O)Me | O |
| D-13305 | H | single bond | Me | t-Bu | H | Me | C(=O)Me | O |
| D-13306 | Me | single bond | H | t-Bu | H | Me | C(=O)Me | O |

TABLE 949

| Compound Number | Y | W | Z | $R^1$ | $R^2$ | $R^3$ | $R^{10}$ | A |
|---|---|---|---|---|---|---|---|---|
| D-13307 | Me(R) | single bond | H | t-Bu | H | Me | C(=O)Me | O |
| D-13308 | Me(S) | single bond | H | t-Bu | H | Me | C(=O)Me | O |
| D-13309 | H | single bond | Me | c-Bu | H | Cl | C(=O)Me | O |
| D-13310 | Me | single bond | H | c-Bu | H | Cl | C(=O)Me | O |
| D-13311 | Me(R) | single bond | H | c-Bu | H | Cl | C(=O)Me | O |
| D-13312 | Me(S) | single bond | H | c-Bu | H | Cl | C(=O)Me | O |
| D-13313 | H | single bond | Me | c-Bu | H | Me | C(=O)Me | O |
| D-13314 | Me | single bond | H | c-Bu | H | Me | C(=O)Me | O |
| D-13315 | Me(R) | single bond | H | c-Bu | H | Me | C(=O)Me | O |
| D-13316 | Me(S) | single bond | H | c-Bu | H | Me | C(=O)Me | O |
| D-13317 | H | single bond | Me | c-Bu(1-CN) | H | Cl | C(=O)Me | O |
| D-13318 | Me | single bond | H | c-Bu(1-CN) | H | Cl | C(=O)Me | O |
| D-13319 | Me(R) | single bond | H | c-Bu(1-CN) | H | Cl | C(=O)Me | O |
| D-13320 | Me(S) | single bond | H | c-Bu(1-CN) | H | Cl | C(=O)Me | O |
| D-13321 | H | single bond | Me | c-Bu(1-CN) | H | Me | C(=O)Me | O |
| D-13322 | Me | single bond | H | c-Bu(1-CN) | H | Me | C(=O)Me | O |
| D-13323 | Me(R) | single bond | H | c-Bu(1-CN) | H | Me | C(=O)Me | O |
| D-13324 | Me(S) | single bond | H | c-Bu(1-CN) | H | Me | C(=O)Me | O |
| D-13325 | H | single bond | Me | c-Bu(3,3-$F_2$) | H | Cl | C(=O)Me | O |
| D-13326 | Me | single bond | H | c-Bu(3,3-$F_2$) | H | Cl | C(=O)Me | O |
| D-13327 | Me(R) | single bond | H | c-Bu(3,3-$F_2$) | H | Cl | C(=O)Me | O |
| D-13328 | Me(S) | single bond | H | c-Bu(3,3-$F_2$) | H | Cl | C(=O)Me | O |
| D-13329 | H | single bond | Me | c-Bu(3,3-$F_2$) | H | Me | C(=O)Me | O |
| D-13330 | Me | single bond | H | c-Bu(3,3-$F_2$) | H | Me | C(=O)Me | O |
| D-13331 | Me(R) | single bond | H | c-Bu(3,3-$F_2$) | H | Me | C(=O)Me | O |
| D-13332 | Me(S) | single bond | H | c-Bu(3,3-$F_2$) | H | Me | C(=O)Me | O |
| D-13333 | H | single bond | Me | oxetan-3-yl | H | Cl | C(=O)Me | O |
| D-13334 | Me | single bond | H | oxetan-3-yl | H | Cl | C(=O)Me | O |
| D-13335 | Me(R) | single bond | H | oxetan-3-yl | H | Cl | C(=O)Me | O |
| D-13336 | Me(S) | single bond | H | oxetan-3-yl | H | Cl | C(=O)Me | O |
| D-13337 | H | single bond | Me | oxetan-3-yl | H | Me | C(=O)Me | O |
| D-13338 | Me | single bond | H | oxetan-3-yl | H | Me | C(=O)Me | O |
| D-13339 | Me(R) | single bond | H | oxetan-3-yl | H | Me | C(=O)Me | O |
| D-13340 | Me(S) | single bond | H | oxetan-3-yl | H | Me | C(=O)Me | O |
| D-13341 | H | single bond | Me | oxetan(3-CN)-3-yl | H | Cl | C(=O)Me | O |
| D-13342 | Me | single bond | H | oxetan(3-CN)-3-yl | H | Cl | C(=O)Me | O |
| D-13343 | Me(R) | single bond | H | oxetan(3-CN)-3-yl | H | Cl | C(=O)Me | O |
| D-13344 | Me(S) | single bond | H | oxetan(3-CN)-3-yl | H | Cl | C(=O)Me | O |
| D-13345 | H | single bond | Me | oxetan(3-CN)-3-yl | H | Me | C(=O)Me | O |
| D-13346 | Me | single bond | H | oxetan(3-CN)-3-yl | H | Me | C(=O)Me | O |
| D-13347 | Me(R) | single bond | H | oxetan(3-CN)-3-yl | H | Me | C(=O)Me | O |
| D-13348 | Me(S) | single bond | H | oxetan(3-CN)-3-yl | H | Me | C(=O)Me | O |

TABLE 949-continued

| Compound Number | Y | W | Z | $R^1$ | $R^2$ | $R^3$ | $R^{10}$ | A |
|---|---|---|---|---|---|---|---|---|
| D-13349 | H | single bond | Me | azetidin[1-C(=O)Me]-3-yl | H | Cl | C(=O)Me | O |
| D-13350 | Me | single bond | H | azetidin[1-C(=O)Me]-3-yl | H | Cl | C(=O)Me | O |

TABLE 950

| Compound Number | Y | W | Z | $R^1$ | $R^2$ | $R^3$ | $R^{10}$ | A |
|---|---|---|---|---|---|---|---|---|
| D-13351 | Me(R) | single bond | H | azetidin[1-C(=O)Me]-3-yl | H | Cl | C(=O)Me | O |
| D-13352 | Me(S) | single bond | H | azetidin[1-C(=O)Me]-3-yl | H | Cl | C(=O)Me | O |
| D-13353 | H | single bond | Me | azetidin[1-C(=O)Me]-3-yl | H | Me | C(=O)Me | O |
| D-13354 | Me | single bond | H | azetidin[1-C(=O)Me]-3-yl | H | Me | C(=O)Me | O |
| D-13355 | Me(R) | single bond | H | azetidin[1-C(=O)Me]-3-yl | H | Me | C(=O)Me | O |
| D-13356 | Me(S) | single bond | H | azetidin[1-C(=O)Me]-3-yl | H | Me | C(=O)Me | O |
| D-13357 | H | single bond | Me | azetidin[1-S(=O)$_2$Me]-3-yl | H | Cl | C(=O)Me | O |
| D-13358 | Me | single bond | H | azetidin[1-S(=O)$_2$Me]-3-yl | H | Cl | C(=O)Me | O |
| D-13359 | Me(R) | single bond | H | azetidin[1-S(=O)$_2$Me]-3-yl | H | Cl | C(=O)Me | O |
| D-13360 | Me(S) | single bond | H | azetidin[1-S(=O)$_2$Me]-3-yl | H | Cl | C(=O)Me | O |
| D-13361 | H | single bond | Me | azetidin[1-S(=O)$_2$Me]-3-yl | H | Me | C(=O)Me | O |
| D-13362 | Me | single bond | H | azetidin[1-S(=O)$_2$Me]-3-yl | H | Me | C(=O)Me | O |
| D-13363 | Me(R) | single bond | H | azetidin[1-S(=O)$_2$Me]-3-yl | H | Me | C(=O)Me | O |
| D-13364 | Me(S) | single bond | H | azetidin[1-S(=O)$_2$Me]-3-yl | H | Me | C(=O)Me | O |
| D-13365 | H | single bond | Me | azetidin[1-S(=O)$_2$CHF$_2$]-3-yl | H | Cl | C(=O)Me | O |
| D-13366 | Me | single bond | H | azetidin[1-S(=O)$_2$CHF$_2$]-3-yl | H | Cl | C(=O)Me | O |
| D-13367 | Me(R) | single bond | H | azetidin[1-S(=O)$_2$CHF$_2$]-3-yl | H | Cl | C(=O)Me | O |
| D-13368 | Me(S) | single bond | H | azetidin[1-S(=O)$_2$CHF$_2$]-3-yl | H | Cl | C(=O)Me | O |
| D-13369 | H | single bond | Me | azetidin[1-S(=O)$_2$CHF$_2$]-3-yl | H | Me | C(=O)Me | O |
| D-13370 | Me | single bond | H | azetidin[1-S(=O)$_2$CHF$_2$]-3-yl | H | Me | C(=O)Me | O |
| D-13371 | Me(R) | single bond | H | azetidin[1-S(=O)$_2$CHF$_2$]-3-yl | H | Me | C(=O)Me | O |
| D-13372 | Me(S) | single bond | H | azetidin[1-S(=O)$_2$CHF$_2$]-3-yl | H | Me | C(=O)Me | O |
| D-13373 | H | single bond | Me | c-Pen | H | Cl | C(=O)Me | O |
| D-13374 | Me | single bond | H | c-Pen | H | Cl | C(=O)Me | O |
| D-13375 | Me(R) | single bond | H | c-Pen | H | Cl | C(=O)Me | O |
| D-13376 | Me(S) | single bond | H | c-Pen | H | Cl | C(=O)Me | O |
| D-13377 | H | single bond | Me | c-Pen | H | Me | C(=O)Me | O |
| D-13378 | Me | single bond | H | c-Pen | H | Me | C(=O)Me | O |
| D-13379 | Me(R) | single bond | H | c-Pen | H | Me | C(=O)Me | O |
| D-13380 | Me(S) | single bond | H | c-Pen | H | Me | C(=O)Me | O |
| D-13381 | H | single bond | Me | tetrahydrofuran-3-yl | H | Cl | C(=O)Me | O |
| D-13382 | Me | single bond | H | tetrahydrofuran-3-yl | H | Cl | C(=O)Me | O |
| D-13383 | Me(R) | single bond | H | tetrahydrofuran-3-yl | H | Cl | C(=O)Me | O |
| D-13384 | Me(S) | single bond | H | tetrahydrofuran-3-yl | H | Cl | C(=O)Me | O |
| D-13385 | H | single bond | Me | tetrahydrofuran-3-yl | H | Me | C(=O)Me | O |
| D-13386 | Me | single bond | H | tetrahydrofuran-3-yl | H | Me | C(=O)Me | O |
| D-13387 | Me(R) | single bond | H | tetrahydrofuran-3-yl | H | Me | C(=O)Me | O |
| D-13388 | Me(S) | single bond | H | tetrahydrofuran-3-yl | H | Me | C(=O)Me | O |
| D-13389 | H | single bond | Me | tetrahydrothiophen-3-yl | H | Cl | C(=O)Me | O |
| D-13390 | Me | single bond | H | tetrahydrothiophen-3-yl | H | Cl | C(=O)Me | O |
| D-13391 | Me(R) | single bond | H | tetrahydrothiophen-3-yl | H | Cl | C(=O)Me | O |
| D-13392 | Me(S) | single bond | H | tetrahydrothiophen-3-yl | H | Cl | C(=O)Me | O |
| D-13393 | H | single bond | Me | tetrahydrothiophen-3-yl | H | Me | C(=O)Me | O |
| D-13394 | Me | single bond | H | tetrahydrothiophen-3-yl | H | Me | C(=O)Me | O |

TABLE 951

| Compound Number | Y | W | Z | $R^1$ | $R^2$ | $R^3$ | $R^{10}$ | A |
|---|---|---|---|---|---|---|---|---|
| D-13395 | Me(R) | single bond | H | tetrahydrothiophen-3-yl | H | Me | C(=O)Me | O |
| D-13396 | Me(S) | single bond | H | tetrahydrothiophen-3-yl | H | Me | C(=O)Me | O |
| D-13397 | H | single bond | Me | c-Pen(1-CN) | H | Cl | C(=O)Me | O |
| D-13398 | Me | single bond | H | c-Pen(1-CN) | H | Cl | C(=O)Me | O |
| D-13399 | Me(R) | single bond | H | c-Pen(1-CN) | H | Cl | C(=O)Me | O |
| D-13400 | Me(S) | single bond | H | c-Pen(1-CN) | H | Cl | C(=O)Me | O |
| D-13401 | H | single bond | Me | c-Pen(1-CN) | H | Me | C(=O)Me | O |
| D-13402 | Me | single bond | H | c-Pen(1-CN) | H | Me | C(=O)Me | O |
| D-13403 | Me(R) | single bond | H | c-Pen(1-CN) | H | Me | C(=O)Me | O |
| D-13404 | Me(S) | single bond | H | c-Pen(1-CN) | H | Me | C(=O)Me | O |

TABLE 951-continued

| Compound Number | Y | W | Z | $R^1$ | $R^2$ | $R^3$ | $R^{10}$ | A |
|---|---|---|---|---|---|---|---|---|
| D-13405 | H | single bond | Me | tetrahydrofuran(3-CN)-3-yl | H | Cl | C(=O)Me | O |
| D-13406 | Me | single bond | H | tetrahydrofuran(3-CN)-3-yl | H | Cl | C(=O)Me | O |
| D-13407 | Me(R) | single bond | H | tetrahydrofuran(3-CN)-3-yl | H | Cl | C(=O)Me | O |
| D-13408 | Me(S) | single bond | H | tetrahydrofuran(3-CN)-3-yl | H | Cl | C(=O)Me | O |
| D-13409 | H | single bond | Me | tetrahydrofuran(3-CN)-3-yl | H | Me | C(=O)Me | O |
| D-13410 | Me | single bond | H | tetrahydrofuran(3-CN)-3-yl | H | Me | C(=O)Me | O |
| D-13411 | Me(R) | single bond | H | tetrahydrofuran(3-CN)-3-yl | H | Me | C(=O)Me | O |
| D-13412 | Me(S) | single bond | H | tetrahydrofuran(3-CN)-3-yl | H | Me | C(=O)Me | O |
| D-13413 | H | single bond | Me | tetrahydrothiophen(3-CN)-3-yl | H | Cl | C(=O)Me | O |
| D-13414 | Me | single bond | H | tetrahydrothiophen(3-CN)-3-yl | H | Cl | C(=O)Me | O |
| D-13415 | Me(R) | single bond | H | tetrahydrothiophen(3-CN)-3-yl | H | Cl | C(=O)Me | O |
| D-13416 | Me(S) | single bond | H | tetrahydrothiophen(3-CN)-3-yl | H | Cl | C(=O)Me | O |
| D-13417 | H | single bond | Me | tetrahydrothiophen(3-CN)-3-yl | H | Me | C(=O)Me | O |
| D-13418 | Me | single bond | H | tetrahydrothiophen(3-CN)-3-yl | H | Me | C(=O)Me | O |
| D-13419 | Me(R) | single bond | H | tetrahydrothiophen(3-CN)-3-yl | H | Me | C(=O)Me | O |
| D-13420 | Me(S) | single bond | H | tetrahydrothiophen(3-CN)-3-yl | H | Me | C(=O)Me | O |
| D-13421 | H | single bond | Me | bicyclo[1.1.1]pentan-1-yl | H | Cl | C(=O)Me | O |
| D-13422 | Me | single bond | H | bicyclo[1.1.1]pentan-1-yl | H | Cl | C(=O)Me | O |
| D-13423 | Me(R) | single bond | H | bicyclo[1.1.1]pentan-1-yl | H | Cl | C(=O)Me | O |
| D-13424 | Me(S) | single bond | H | bicyclo[1.1.1]pentan-1-yl | H | Cl | C(=O)Me | O |
| D-13425 | H | single bond | Me | bicyclo[1.1.1]pentan-1-yl | H | Me | C(=O)Me | O |
| D-13426 | Me | single bond | H | bicyclo[1.1.1]pentan-1-yl | H | Me | C(=O)Me | O |
| D-13427 | Me(R) | single bond | H | bicyclo[1.1.1]pentan-1-yl | H | Me | C(=O)Me | O |
| D-13428 | Me(S) | single bond | H | bicyclo[1.1.1]pentan-1-yl | H | Me | C(=O)Me | O |
| D-13429 | H | single bond | Me | c-Hex | H | Cl | C(=O)Me | O |
| D-13430 | Me | single bond | H | c-Hex | H | Cl | C(=O)Me | O |
| D-13431 | Me(R) | single bond | H | c-Hex | H | Cl | C(=O)Me | O |
| D-13432 | Me(S) | single bond | H | c-Hex | H | Cl | C(=O)Me | O |
| D-13433 | H | single bond | Me | c-Hex | H | Me | C(=O)Me | O |
| D-13434 | Me | single bond | H | c-Hex | H | Me | C(=O)Me | O |
| D-13435 | Me(R) | single bond | H | c-Hex | H | Me | C(=O)Me | O |
| D-13436 | Me(S) | single bond | H | c-Hex | H | Me | C(=O)Me | O |
| D-13437 | H | single bond | Me | tetrahydropyran-4-yl | H | Cl | C(=O)Me | O |
| D-13438 | Me | single bond | H | tetrahydropyran-4-yl | H | Cl | C(=O)Me | O |

TABLE 952

| Compound Number | Y | W | Z | $R^1$ | $R^2$ | $R^3$ | $R^{10}$ | A |
|---|---|---|---|---|---|---|---|---|
| D-13439 | Me(R) | single bond | H | tetrahydropyran-4-yl | H | Cl | C(=O)Me | O |
| D-13440 | Me(S) | single bond | H | tetrahydropyran-4-yl | H | Cl | C(=O)Me | O |
| D-13441 | H | single bond | Me | tetrahydropyran-4-yl | H | Me | C(=O)Me | O |
| D-13442 | Me | single bond | H | tetrahydropyran-4-yl | H | Me | C(=O)Me | O |
| D-13443 | Me(R) | single bond | H | tetrahydropyran-4-yl | H | Me | C(=O)Me | O |
| D-13444 | Me(S) | single bond | H | tetrahydropyran-4-yl | H | Me | C(=O)Me | O |
| D-13445 | H | single bond | Me | tetrahydrothiopyran-4-yl | H | Cl | C(=O)Me | O |
| D-13446 | Me | single bond | H | tetrahydrothiopyran-4-yl | H | Cl | C(=O)Me | O |
| D-13447 | Me(R) | single bond | H | tetrahydrothiopyran-4-yl | H | Cl | C(=O)Me | O |
| D-13448 | Me(S) | single bond | H | tetrahydrothiopyran-4-yl | H | Cl | C(=O)Me | O |
| D-13449 | H | single bond | Me | tetrahydrothiopyran-4-yl | H | Me | C(=O)Me | O |
| D-13450 | Me | single bond | H | tetrahydrothiopyran-4-yl | H | Me | C(=O)Me | O |
| D-13451 | Me(R) | single bond | H | tetrahydrothiopyran-4-yl | H | Me | C(=O)Me | O |
| D-13452 | Me(S) | single bond | H | tetrahydrothiopyran-4-yl | H | Me | C(=O)Me | O |
| D-13453 | H | single bond | Me | c-Hex(1-CN) | H | Cl | C(=O)Me | O |
| D-13454 | Me | single bond | H | c-Hex(1-CN) | H | Cl | C(=O)Me | O |
| D-13455 | Me(R) | single bond | H | c-Hex(1-CN) | H | Cl | C(=O)Me | O |
| D-13456 | Me(S) | single bond | H | c-Hex(1-CN) | H | Cl | C(=O)Me | O |
| D-13457 | H | single bond | Me | c-Hex(1-CN) | H | Me | C(=O)Me | O |
| D-13458 | Me | single bond | H | c-Hex(1-CN) | H | Me | C(=O)Me | O |
| D-13459 | Me(R) | single bond | H | c-Hex(1-CN) | H | Me | C(=O)Me | O |
| D-13460 | Me(S) | single bond | H | c-Hex(1-CN) | H | Me | C(=O)Me | O |
| D-13461 | H | single bond | Me | tetrahydropyran(4-CN)-4-yl | H | Cl | C(=O)Me | O |
| D-13462 | Me | single bond | H | tetrahydropyran(4-CN)-4-yl | H | Cl | C(=O)Me | O |
| D-13463 | Me(R) | single bond | H | tetrahydropyran(4-CN)-4-yl | H | Cl | C(=O)Me | O |
| D-13464 | Me(S) | single bond | H | tetrahydropyran(4-CN)-4-yl | H | Cl | C(=O)Me | O |
| D-13465 | H | single bond | Me | tetrahydropyran(4-CN)-4-yl | H | Me | C(=O)Me | O |
| D-13466 | Me | single bond | H | tetrahydropyran(4-CN)-4-yl | H | Me | C(=O)Me | O |
| D-13467 | Me(R) | single bond | H | tetrahydropyran(4-CN)-4-yl | H | Me | C(=O)Me | O |
| D-13468 | Me(S) | single bond | H | tetrahydropyran(4-CN)-4-yl | H | Me | C(=O)Me | O |
| D-13469 | H | single bond | Me | tetrahydrothiopyran(4-CN)-4-yl | H | Cl | C(=O)Me | O |
| D-13470 | Me | single bond | H | tetrahydrothiopyran(4-CN)-4-yl | H | Cl | C(=O)Me | O |
| D-13471 | Me(R) | single bond | H | tetrahydrothiopyran(4-CN)-4-yl | H | Cl | C(=O)Me | O |

TABLE 952-continued

| Compound Number | Y | W | Z | $R^1$ | $R^2$ | $R^3$ | $R^{10}$ | A |
|---|---|---|---|---|---|---|---|---|
| D-13472 | Me(S) | single bond | H | tetrahydrothiopyran(4-CN)-4-yl | H | Cl | C(=O)Me | O |
| D-13473 | H | single bond | Me | tetrahydrothiopyran(4-CN)-4-yl | H | Me | C(=O)Me | O |
| D-13474 | Me | single bond | H | tetrahydrothiopyran(4-CN)-4-yl | H | Me | C(=O)Me | O |
| D-13475 | Me(R) | single bond | H | tetrahydrothiopyran(4-CN)-4-yl | H | Me | C(=O)Me | O |
| D-13476 | Me(S) | single bond | H | tetrahydrothiopyran(4-CN)-4-yl | H | Me | C(=O)Me | O |
| D-13477 | H | single bond | Me | $CH_2$(c-Pr) | H | Cl | C(=O)Me | O |
| D-13478 | Me | single bond | H | $CH_2$(c-Pr) | H | Cl | C(=O)Me | O |
| D-13479 | Me(R) | single bond | H | $CH_2$(c-Pr) | H | Cl | C(=O)Me | O |
| D-13480 | Me(S) | single bond | H | $CH_2$(c-Pr) | H | Cl | C(=O)Me | O |
| D-13481 | H | single bond | Me | $CH_2$(c-Pr) | H | Me | C(=O)Me | O |
| D-13482 | Me | single bond | H | $CH_2$(c-Pr) | H | Me | C(=O)Me | O |

TABLE 953

| Compound Number | Y | W | Z | $R^1$ | $R^2$ | $R^3$ | $R^{10}$ | A |
|---|---|---|---|---|---|---|---|---|
| D-13483 | Me(R) | single bond | H | $CH_2$(c-Pr) | H | Me | C(=O)Me | O |
| D-13484 | Me(S) | single bond | H | $CH_2$(c-Pr) | H | Me | C(=O)Me | O |
| D-13485 | H | single bond | Me | $CH_2$[c-Pr(1-CN)] | H | Cl | C(=O)Me | O |
| D-13486 | Me | single bond | H | $CH_2$[c-Pr(1-CN)] | H | Cl | C(=O)Me | O |
| D-13487 | Me(R) | single bond | H | $CH_2$[c-Pr(1-CN)] | H | Cl | C(=O)Me | O |
| D-13488 | Me(S) | single bond | H | $CH_2$[c-Pr(1-CN)] | H | Cl | C(=O)Me | O |
| D-13489 | H | single bond | Me | $CH_2$[c-Pr(1-CN)] | H | Me | C(=O)Me | O |
| D-13490 | Me | single bond | H | $CH_2$[c-Pr(1-CN)] | H | Me | C(=O)Me | O |
| D-13491 | Me(R) | single bond | H | $CH_2$[c-Pr(1-CN)] | H | Me | C(=O)Me | O |
| D-13492 | Me(S) | single bond | H | $CH_2$[c-Pr(1-CN)] | H | Me | C(=O)Me | O |
| D-13493 | H | single bond | Me | CH(Me)(c-Pr) | H | Cl | C(=O)Me | O |
| D-13494 | Me | single bond | H | CH(Me)(c-Pr) | H | Cl | C(=O)Me | O |
| D-13495 | Me(R) | single bond | H | CH(Me)(c-Pr) | H | Cl | C(=O)Me | O |
| D-13496 | Me(S) | single bond | H | CH(Me)(c-Pr) | H | Cl | C(=O)Me | O |
| D-13497 | H | single bond | Me | CH(Me)(c-Pr) | H | Me | C(=O)Me | O |
| D-13498 | Me | single bond | H | CH(Me)(c-Pr) | H | Me | C(=O)Me | O |
| D-13499 | Me(R) | single bond | H | CH(Me)(c-Pr) | H | Me | C(=O)Me | O |
| D-13500 | Me(S) | single bond | H | CH(Me)(c-Pr) | H | Me | C(=O)Me | O |
| D-13501 | H | single bond | Me | CH(Me)$CH_2$OMe | H | Cl | C(=O)Me | O |
| D-13502 | Me | single bond | H | CH(Me)$CH_2$OMe | H | Cl | C(=O)Me | O |
| D-13503 | Me(R) | single bond | H | CH(Me)$CH_2$OMe | H | Cl | C(=O)Me | O |
| D-13504 | Me(S) | single bond | H | CH(Me)$CH_2$OMe | H | Cl | C(=O)Me | O |
| D-13505 | H | single bond | Me | CH(Me)$CH_2$OMe | H | Me | C(=O)Me | O |
| D-13506 | Me | single bond | H | CH(Me)$CH_2$OMe | H | Me | C(=O)Me | O |
| D-13507 | Me(R) | single bond | H | CH(Me)$CH_2$OMe | H | Me | C(=O)Me | O |
| D-13508 | Me(S) | single bond | H | CH(Me)$CH_2$OMe | H | Me | C(=O)Me | O |
| D-13509 | H | single bond | Me | $CH_2CH{=}CH_2$ | H | Cl | C(=O)Me | O |
| D-13510 | Me | single bond | H | $CH_2CH{=}CH_2$ | H | Cl | C(=O)Me | O |
| D-13511 | Me(R) | single bond | H | $CH_2CH{=}CH_2$ | H | Cl | C(=O)Me | O |
| D-13512 | Me(S) | single bond | H | $CH_2CH{=}CH_2$ | H | Cl | C(=O)Me | O |
| D-13513 | H | single bond | Me | $CH_2CH{=}CH_2$ | H | Me | C(=O)Me | O |
| D-13514 | Me | single bond | H | $CH_2CH{=}CH_2$ | H | Me | C(=O)Me | O |
| D-13515 | Me(R) | single bond | H | $CH_2CH{=}CH_2$ | H | Me | C(=O)Me | O |
| D-13516 | Me(S) | single bond | H | $CH_2CH{=}CH_2$ | H | Me | C(=O)Me | O |
| D-13517 | H | single bond | Me | $CH_2C{\equiv}CH$ | H | Cl | C(=O)Me | O |
| D-13518 | Me | single bond | H | $CH_2C{\equiv}CH$ | H | Cl | C(=O)Me | O |
| D-13519 | Me(R) | single bond | H | $CH_2C{\equiv}CH$ | H | Cl | C(=O)Me | O |
| D-13520 | Me(S) | single bond | H | $CH_2C{\equiv}CH$ | H | Cl | C(=O)Me | O |
| D-13521 | H | single bond | Me | $CH_2C{\equiv}CH$ | H | Me | C(=O)Me | O |
| D-13522 | Me | single bond | H | $CH_2C{\equiv}CH$ | H | Me | C(=O)Me | O |
| D-13523 | Me(R) | single bond | H | $CH_2C{\equiv}CH$ | H | Me | C(=O)Me | O |
| D-13524 | Me(S) | single bond | H | $CH_2C{\equiv}CH$ | H | Me | C(=O)Me | O |
| D-13525 | H | single bond | Me | $CH_2CN$ | H | Cl | C(=O)Me | O |
| D-13526 | Me | single bond | H | $CH_2CN$ | H | Cl | C(=O)Me | O |

TABLE 954

| Compound Number | Y | W | Z | $R^1$ | $R^2$ | $R^3$ | $R^{10}$ | A |
|---|---|---|---|---|---|---|---|---|
| D-13527 | Me(R) | single bond | H | $CH_2CN$ | H | Cl | C(=O)Me | O |
| D-13528 | Me(S) | single bond | H | $CH_2CN$ | H | Cl | C(=O)Me | O |
| D-13529 | H | single bond | Me | $CH_2CN$ | H | Me | C(=O)Me | O |

TABLE 954-continued

| Compound Number | Y | W | Z | $R^1$ | $R^2$ | $R^3$ | $R^{10}$ | A |
|---|---|---|---|---|---|---|---|---|
| D-13530 | Me | single bond | H | $CH_2CN$ | H | Me | C(=O)Me | O |
| D-13531 | Me(R) | single bond | H | $CH_2CN$ | H | Me | C(=O)Me | O |
| D-13532 | Me(S) | single bond | H | $CH_2CN$ | H | Me | C(=O)Me | O |
| D-13533 | H | single bond | Me | CH(Me)CN | H | Cl | C(=O)Me | O |
| D-13534 | Me | single bond | H | CH(Me)CN | H | Cl | C(=O)Me | O |
| D-13535 | Me(R) | single bond | H | CH(Me)CN | H | Cl | C(=O)Me | O |
| D-13536 | Me(S) | single bond | H | CH(Me)CN | H | Cl | C(=O)Me | O |
| D-13537 | H | single bond | Me | CH(Me)CN | H | Me | C(=O)Me | O |
| D-13538 | Me | single bond | H | CH(Me)CN | H | Me | C(=O)Me | O |
| D-13539 | Me(R) | single bond | H | CH(Me)CN | H | Me | C(=O)Me | O |
| D-13540 | Me(S) | single bond | H | CH(Me)CN | H | Me | C(=O)Me | O |
| D-13541 | H | single bond | Me | $C(Me)_2CN$ | H | Cl | C(=O)Me | O |
| D-13542 | Me | single bond | H | $C(Me)_2CN$ | H | Cl | C(=O)Me | O |
| D-13543 | Me(R) | single bond | H | $C(Me)_2CN$ | H | Cl | C(=O)Me | O |
| D-13544 | Me(S) | single bond | H | $C(Me)_2CN$ | H | Cl | C(=O)Me | O |
| D-13545 | H | single bond | Me | $C(Me)_2CN$ | H | Me | C(=O)Me | O |
| D-13546 | Me | single bond | H | $C(Me)_2CN$ | H | Me | C(=O)Me | O |
| D-13547 | Me(R) | single bond | H | $C(Me)_2CN$ | H | Me | C(=O)Me | O |
| D-13548 | Me(S) | single bond | H | $C(Me)_2CN$ | H | Me | C(=O)Me | O |
| D-13549 | H | single bond | Me | C(Me)(i-Pr)CN | H | Cl | C(=O)Me | O |
| D-13550 | Me | single bond | H | C(Me)(i-Pr)CN | H | Cl | C(=O)Me | O |
| D-13551 | Me(R) | single bond | H | C(Me)(i-Pr)CN | H | Cl | C(=O)Me | O |
| D-13552 | Me(S) | single bond | H | C(Me)(i-Pr)CN | H | Cl | C(=O)Me | O |
| D-13553 | H | single bond | Me | C(Me)(i-Pr)CN | H | Me | C(=O)Me | O |
| D-13554 | Me | single bond | H | C(Me)(i-Pr)CN | H | Me | C(=O)Me | O |
| D-13555 | Me(R) | single bond | H | C(Me)(i-Pr)CN | H | Me | C(=O)Me | O |
| D-13556 | Me(S) | single bond | H | C(Me)(i-Pr)CN | H | Me | C(=O)Me | O |
| D-13557 | H | single bond | Me | OMe | H | Cl | C(=O)Me | O |
| D-13558 | Me | single bond | H | OMe | H | Cl | C(=O)Me | O |
| D-13559 | Me(R) | single bond | H | OMe | H | Cl | C(=O)Me | O |
| D-13560 | Me(S) | single bond | H | OMe | H | Cl | C(=O)Me | O |
| D-13561 | H | single bond | Me | OMe | H | Me | C(=O)Me | O |
| D-13562 | Me | single bond | H | OMe | H | Me | C(=O)Me | O |
| D-13563 | Me(R) | single bond | H | OMe | H | Me | C(=O)Me | O |
| D-13564 | Me(S) | single bond | H | OMe | H | Me | C(=O)Me | O |
| D-13565 | H | single bond | Me | CH=NOMe | H | Cl | C(=O)Me | O |
| D-13566 | Me | single bond | H | CH=NOMe | H | Cl | C(=O)Me | O |
| D-13567 | Me(R) | single bond | H | CH=NOMe | H | Cl | C(=O)Me | O |
| D-13568 | Me(S) | single bond | H | CH=NOMe | H | Cl | C(=O)Me | O |
| D-13569 | H | single bond | Me | CH=NOMe | H | Me | C(=O)Me | O |
| D-13570 | Me | single bond | H | CH=NOMe | H | Me | C(=O)Me | O |

TABLE 955

| Compound Number | Y | W | Z | $R^1$ | $R^2$ | $R^3$ | $R^{10}$ | A |
|---|---|---|---|---|---|---|---|---|
| D-13571 | Me(R) | single bond | H | CH=NOMe | H | Me | C(=O)Me | O |
| D-13572 | Me(S) | single bond | H | CH=NOMe | H | Me | C(=O)Me | O |
| D-13573 | H | single bond | Me | morpholin-4-yl | H | Cl | C(=O)Me | O |
| D-13574 | Me | single bond | H | morpholin-4-yl | H | Cl | C(=O)Me | O |
| D-13575 | Me(R) | single bond | H | morpholin-4-yl | H | Cl | C(=O)Me | O |
| D-13576 | Me(S) | single bond | H | morpholin-4-yl | H | Cl | C(=O)Me | O |
| D-13577 | H | single bond | Me | morpholin-4-yl | H | Me | C(=O)Me | O |
| D-13578 | Me | single bond | H | morpholin-4-yl | H | Me | C(=O)Me | O |
| D-13579 | Me(R) | single bond | H | morpholin-4-yl | H | Me | C(=O)Me | O |
| D-13580 | Me(S) | single bond | H | morpholin-4-yl | H | Me | C(=O)Me | O |
| D-13581 | H | single bond | Me | Ph | H | Cl | C(=O)Me | O |
| D-13582 | Me | single bond | H | Ph | H | Cl | C(=O)Me | O |
| D-13583 | Me(R) | single bond | H | Ph | H | Cl | C(=O)Me | O |
| D-13584 | Me(S) | single bond | H | Ph | H | Cl | C(=O)Me | O |
| D-13585 | H | single bond | Me | Ph | H | Me | C(=O)Me | O |
| D-13586 | Me | single bond | H | Ph | H | Me | C(=O)Me | O |
| D-13587 | Me(R) | single bond | H | Ph | H | Me | C(=O)Me | O |
| D-13588 | Me(S) | single bond | H | Ph | H | Me | C(=O)Me | O |
| D-13589 | H | single bond | Me | $CH_2Ph$ | H | Cl | C(=O)Me | O |
| D-13590 | Me | single bond | H | $CH_2Ph$ | H | Cl | C(=O)Me | O |
| D-13591 | Me(R) | single bond | H | $CH_2Ph$ | H | Cl | C(=O)Me | O |
| D-13592 | Me(S) | single bond | H | $CH_2Ph$ | H | Cl | C(=O)Me | O |
| D-13593 | H | single bond | Me | $CH_2Ph$ | H | Me | C(=O)Me | O |
| D-13594 | Me | single bond | H | $CH_2Ph$ | H | Me | C(=O)Me | O |
| D-13595 | Me(R) | single bond | H | $CH_2Ph$ | H | Me | C(=O)Me | O |
| D-13596 | Me(S) | single bond | H | $CH_2Ph$ | H | Me | C(=O)Me | O |

TABLE 955-continued

| Compound Number | Y | W | Z | $R^1$ | $R^2$ | $R^3$ | $R^{10}$ | A |
|---|---|---|---|---|---|---|---|---|
| D-13597 | H | single bond | Me | thiazole-2-yl | H | Cl | C(═O)Me | O |
| D-13598 | Me | single bond | H | thiazole-2-yl | H | Cl | C(═O)Me | O |
| D-13599 | Me(R) | single bond | H | thiazole-2-yl | H | Cl | C(═O)Me | O |
| D-13600 | Me(S) | single bond | H | thiazole-2-yl | H | Cl | C(═O)Me | O |
| D-13601 | H | single bond | Me | thiazole-2-yl | H | Me | C(═O)Me | O |
| D-13602 | Me | single bond | H | thiazole-2-yl | H | Me | C(═O)Me | O |
| D-13603 | Me(R) | single bond | H | thiazole-2-yl | H | Me | C(═O)Me | O |
| D-13604 | Me(S) | single bond | H | thiazole-2-yl | H | Me | C(═O)Me | O |
| D-13605 | H | single bond | Me | 1-Me-pyrazol-3-yl | H | Cl | C(═O)Me | O |
| D-13606 | Me | single bond | H | 1-Me-pyrazol-3-yl | H | Cl | C(═O)Me | O |
| D-13607 | Me(R) | single bond | H | 1-Me-pyrazol-3-yl | H | Cl | C(═O)Me | O |
| D-13608 | Me(S) | single bond | H | 1-Me-pyrazol-3-yl | H | Cl | C(═O)Me | O |
| D-13609 | H | single bond | Me | 1-Me-pyrazol-3-yl | H | Me | C(═O)Me | O |
| D-13610 | Me | single bond | H | 1-Me-pyrazol-3-yl | H | Me | C(═O)Me | O |
| D-13611 | Me(R) | single bond | H | 1-Me-pyrazol-3-yl | H | Me | C(═O)Me | O |
| D-13612 | Me(S) | single bond | H | 1-Me-pyrazol-3-yl | H | Me | C(═O)Me | O |
| D-13613 | H | single bond | Me | 1-Me-pyrazol-5-yl | H | Cl | C(═O)Me | O |
| D-13614 | Me | single bond | H | 1-Me-pyrazol-5-yl | H | Cl | C(═O)Me | O |

TABLE 956

| Compound Number | Y | W | Z | $R^1$ | $R^2$ | $R^3$ | $R^{10}$ | A |
|---|---|---|---|---|---|---|---|---|
| D-13615 | Me(R) | single bond | H | 1-Me-pyrazol-5-yl | H | Cl | C(═O)Me | O |
| D-13616 | Me(S) | single bond | H | 1-Me-pyrazol-5-yl | H | Cl | C(═O)Me | O |
| D-13617 | H | single bond | Me | 1-Me-pyrazol-5-yl | H | Me | C(═O)Me | O |
| D-13618 | Me | single bond | H | 1-Me-pyrazol-5-yl | H | Me | C(═O)Me | O |
| D-13619 | Me(R) | single bond | H | 1-Me-pyrazol-5-yl | H | Me | C(═O)Me | O |
| D-13620 | Me(S) | single bond | H | 1-Me-pyrazol-5-yl | H | Me | C(═O)Me | O |
| D-13621 | H | single bond | Me | $CH_2$(pyrimidin-2-yl) | H | Cl | C(═O)Me | O |
| D-13622 | Me | single bond | H | $CH_2$(pyrimidin-2-yl) | H | Cl | C(═O)Me | O |
| D-13623 | Me(R) | single bond | H | $CH_2$(pyrimidin-2-yl) | H | Cl | C(═O)Me | O |
| D-13624 | Me(S) | single bond | H | $CH_2$(pyrimidin-2-yl) | H | Cl | C(═O)Me | O |
| D-13625 | H | single bond | Me | $CH_2$(pyrimidin-2-yl) | H | Me | C(═O)Me | O |
| D-13626 | Me | single bond | H | $CH_2$(pyrimidin-2-yl) | H | Me | C(═O)Me | O |
| D-13627 | Me(R) | single bond | H | $CH_2$(pyrimidin-2-yl) | H | Me | C(═O)Me | O |
| D-13628 | Me(S) | single bond | H | $CH_2$(pyrimidin-2-yl) | H | Me | C(═O)Me | O |
| D-13629 | H | single bond | Me | $—CH_2CH_2CH_2—$ | | Cl | C(═O)Me | O |
| D-13630 | Me | single bond | H | $—CH_2CH_2CH_2—$ | | Cl | C(═O)Me | O |
| D-13631 | Me(R) | single bond | H | $—CH_2CH_2CH_2—$ | | Cl | C(═O)Me | O |
| D-13632 | Me(S) | single bond | H | $—CH_2CH_2CH_2—$ | | Cl | C(═O)Me | O |
| D-13633 | H | single bond | Me | $—CH_2CH_2CH_2—$ | | Me | C(═O)Me | O |
| D-13634 | Me | single bond | H | $—CH_2CH_2CH_2—$ | | Me | C(═O)Me | O |
| D-13635 | Me(R) | single bond | H | $—CH_2CH_2CH_2—$ | | Me | C(═O)Me | O |
| D-13636 | Me(S) | single bond | H | $—CH_2CH_2CH_2—$ | | Me | C(═O)Me | O |
| D-13637 | H | single bond | Me | $—CH_2CH_2OCH_2CH_2—$ | | Cl | C(═O)Me | O |
| D-13638 | Me | single bond | H | $—CH_2CH_2OCH_2CH_2—$ | | Cl | C(═O)Me | O |
| D-13639 | Me(R) | single bond | H | $—CH_2CH_2OCH_2CH_2—$ | | Cl | C(═O)Me | O |
| D-13640 | Me(S) | single bond | H | $—CH_2CH_2OCH_2CH_2—$ | | Cl | C(═O)Me | O |
| D-13641 | H | single bond | Me | $—CH_2CH_2OCH_2CH_2—$ | | Me | C(═O)Me | O |
| D-13642 | Me | single bond | H | $—CH_2CH_2OCH_2CH_2—$ | | Me | C(═O)Me | O |
| D-13643 | Me(R) | single bond | H | $—CH_2CH_2OCH_2CH_2—$ | | Me | C(═O)Me | O |
| D-13644 | Me(S) | single bond | H | $—CH_2CH_2OCH_2CH_2—$ | | Me | C(═O)Me | O |
| D-13645 | H | single bond | Me | Me | Me | Cl | H | O |
| D-13646 | Me | single bond | H | Me | Me | Cl | H | O |
| D-13647 | Me(R) | single bond | H | Me | Me | Cl | H | O |
| D-13648 | Me(S) | single bond | H | Me | Me | Cl | H | O |
| D-13649 | H | single bond | Me | Me | Me | Me | H | O |
| D-13650 | Me | single bond | H | Me | Me | Me | H | O |
| D-13651 | Me(R) | single bond | H | Me | Me | Me | H | O |
| D-13652 | Me(S) | single bond | H | Me | Me | Me | H | O |
| D-13653 | H | single bond | Me | $CH_2CHF_2$ | Me | Cl | H | O |
| D-13654 | Me | single bond | H | $CH_2CHF_2$ | Me | Cl | H | O |
| D-13655 | Me(R) | single bond | H | $CH_2CHF_2$ | Me | Cl | H | O |
| D-13656 | Me(S) | single bond | H | $CH_2CHF_2$ | Me | Cl | H | O |
| D-13657 | H | single bond | Me | $CH_2CHF_2$ | Me | Me | H | O |
| D-13658 | Me | single bond | H | $CH_2CHF_2$ | Me | Me | H | O |

TABLE 957

| Compound Number | Y | W | Z | $R^1$ | $R^2$ | $R^3$ | $R^{10}$ | A |
|---|---|---|---|---|---|---|---|---|
| D-13659 | Me(R) | single bond | H | $CH_2CHF_2$ | Me | Me | H | O |
| D-13660 | Me(S) | single bond | H | $CH_2CHF_2$ | Me | Me | H | O |
| D-13661 | H | single bond | Me | n-Pr | Me | Cl | H | O |
| D-13662 | Me | single bond | H | n-Pr | Me | Cl | H | O |
| D-13663 | Me(R) | single bond | H | n-Pr | Me | Cl | H | O |
| D-13664 | Me(S) | single bond | H | n-Pr | Me | Cl | H | O |
| D-13665 | H | single bond | Me | n-Pr | Me | Me | H | O |
| D-13666 | Me | single bond | H | n-Pr | Me | Me | H | O |
| D-13667 | Me(R) | single bond | H | n-Pr | Me | Me | H | O |
| D-13668 | Me(S) | single bond | H | n-Pr | Me | Me | H | O |
| D-13669 | H | single bond | Me | i-Pr | Me | Cl | H | O |
| D-13670 | Me | single bond | H | i-Pr | Me | Cl | H | O |
| D-13671 | Me(R) | single bond | H | i-Pr | Me | Cl | H | O |
| D-13672 | Me(S) | single bond | H | i-Pr | Me | Cl | H | O |
| D-13673 | H | single bond | Me | i-Pr | Me | Me | H | O |
| D-13674 | Me | single bond | H | i-Pr | Me | Me | H | O |
| D-13675 | Me(R) | single bond | H | i-Pr | Me | Me | H | O |
| D-13676 | Me(S) | single bond | H | i-Pr | Me | Me | H | O |
| D-13677 | H | single bond | Me | c-Pr(1-F) | Me | Cl | H | O |
| D-13678 | Me | single bond | H | c-Pr(1-F) | Me | Cl | H | O |
| D-13679 | Me(R) | single bond | H | c-Pr(1-F) | Me | Cl | H | O |
| D-13680 | Me(S) | single bond | H | c-Pr(1-F) | Me | Cl | H | O |
| D-13681 | H | single bond | Me | c-Pr(1-F) | Me | Me | H | O |

TABLE 957-continued

| Compound Number | Y | W | Z | $R^1$ | $R^2$ | $R^3$ | $R^{10}$ | A |
|---|---|---|---|---|---|---|---|---|
| D-13682 | Me | single bond | H | c-Pr(1-F) | Me | Me | H | O |
| D-13683 | Me(R) | single bond | H | c-Pr(1-F) | Me | Me | H | O |
| D-13684 | Me(S) | single bond | H | c-Pr(1-F) | Me | Me | H | O |
| D-13685 | H | single bond | Me | c-Pr(2,2-$F_2$) | Me | Cl | H | O |
| D-13686 | Me | single bond | H | c-Pr(2,2-$F_2$) | Me | Cl | H | O |
| D-13687 | Me(R) | single bond | H | c-Pr(2,2-$F_2$) | Me | Cl | H | O |
| D-13688 | Me(S) | single bond | H | c-Pr(2,2-$F_2$) | Me | Cl | H | O |
| D-13689 | H | single bond | Me | c-Pr(2,2-$F_2$) | Me | Me | H | O |
| D-13690 | Me | single bond | H | c-Pr(2,2-$F_2$) | Me | Me | H | O |
| D-13691 | Me(R) | single bond | H | c-Pr(2,2-$F_2$) | Me | Me | H | O |
| D-13692 | Me(S) | single bond | H | c-Pr(2,2-$F_2$) | Me | Me | H | O |
| D-13693 | H | single bond | Me | c-Pr(1-Cl) | Me | Cl | H | O |
| D-13694 | Me | single bond | H | c-Pr(1-Cl) | Me | Cl | H | O |
| D-13695 | Me(R) | single bond | H | c-Pr(1-Cl) | Me | Cl | H | O |
| D-13696 | Me(S) | single bond | H | c-Pr(1-Cl) | Me | Cl | H | O |
| D-13697 | H | single bond | Me | c-Pr(1-Cl) | Me | Me | H | O |
| D-13698 | Me | single bond | H | c-Pr(1-Cl) | Me | Me | H | O |
| D-13699 | Me(R) | single bond | H | c-Pr(1-Cl) | Me | Me | H | O |
| D-13700 | Me(S) | single bond | H | c-Pr(1-Cl) | Me | Me | H | O |
| D-13701 | H | single bond | Me | c-Pr(1-Br) | Me | Cl | H | O |
| D-13702 | Me | single bond | H | c-Pr(1-Br) | Me | Cl | H | O |

TABLE 958

| Compound Number | Y | W | Z | $R^1$ | $R^2$ | $R^3$ | $R^{10}$ | A |
|---|---|---|---|---|---|---|---|---|
| D-13703 | Me(R) | single bond | H | c-Pr(1-Br) | Me | Cl | H | O |
| D-13704 | Me(S) | single bond | H | c-Pr(1-Br) | Me | Cl | H | O |
| D-13705 | H | single bond | Me | c-Pr(1-Br) | Me | Me | H | O |
| D-13706 | Me | single bond | H | c-Pr(1-Br) | Me | Me | H | O |
| D-13707 | Me(R) | single bond | H | c-Pr(1-Br) | Me | Me | H | O |
| D-13708 | Me(S) | single bond | H | c-Pr(1-Br) | Me | Me | H | O |
| D-13709 | H | single bond | Me | c-Pr(1-Me) | Me | Cl | H | O |
| D-13710 | Me | single bond | H | c-Pr(1-Me) | Me | Cl | H | O |
| D-13711 | Me(R) | single bond | H | c-Pr(1-Me) | Me | Cl | H | O |
| D-13712 | Me(S) | single bond | H | c-Pr(1-Me) | Me | Cl | H | O |
| D-13713 | H | single bond | Me | c-Pr(1-Me) | Me | Me | H | O |
| D-13714 | Me | single bond | H | c-Pr(1-Me) | Me | Me | H | O |
| D-13715 | Me(R) | single bond | H | c-Pr(1-Me) | Me | Me | H | O |
| D-13716 | Me(S) | single bond | H | c-Pr(1-Me) | Me | Me | H | O |
| D-13717 | H | single bond | Me | c-Pr(1-$CH_2OH$) | Me | Cl | H | O |
| D-13718 | Me | single bond | H | c-Pr(1-$CH_2OH$) | Me | Cl | H | O |
| D-13719 | Me(R) | single bond | H | c-Pr(1-$CH_2OH$) | Me | Cl | H | O |
| D-13720 | Me(S) | single bond | H | c-Pr(1-$CH_2OH$) | Me | Cl | H | O |
| D-13721 | H | single bond | Me | c-Pr(1-$CH_2OH$) | Me | Me | H | O |
| D-13722 | Me | single bond | H | c-Pr(1-$CH_2OH$) | Me | Me | H | O |
| D-13723 | Me(R) | single bond | H | c-Pr(1-$CH_2OH$) | Me | Me | H | O |
| D-13724 | Me(S) | single bond | H | c-Pr(1-$CH_2OH$) | Me | Me | H | O |
| D-13725 | H | single bond | Me | c-Pr[1-$CH_2OS(=O)_2Me$] | Me | Cl | H | O |
| D-13726 | Me | single bond | H | c-Pr[1-$CH_2OS(=O)_2Me$] | Me | Cl | H | O |
| D-13727 | Me(R) | single bond | H | c-Pr[1-$CH_2OS(=O)_2Me$] | Me | Cl | H | O |
| D-13728 | Me(S) | single bond | H | c-Pr[1-$CH_2OS(=O)_2Me$] | Me | Cl | H | O |
| D-13729 | H | single bond | Me | c-Pr[1-$CH_2OS(=O)_2Me$] | Me | Me | H | O |
| D-13730 | Me | single bond | H | c-Pr[1-$CH_2OS(=O)_2Me$] | Me | Me | H | O |
| D-13731 | Me(R) | single bond | H | c-Pr[1-$CH_2OS(=O)_2Me$] | Me | Me | H | O |
| D-13732 | Me(S) | single bond | H | c-Pr[1-$CH_2OS(=O)_2Me$] | Me | Me | H | O |
| D-13733 | H | single bond | Me | c-Pr(1-$CH_2OMe$) | Me | Cl | H | O |
| D-13734 | Me | single bond | H | c-Pr(1-$CH_2OMe$) | Me | Cl | H | O |
| D-13735 | Me(R) | single bond | H | c-Pr(1-$CH_2OMe$) | Me | Cl | H | O |
| D-13736 | Me(S) | single bond | H | c-Pr(1-$CH_2OMe$) | Me | Cl | H | O |
| D-13737 | H | single bond | Me | c-Pr(1-$CH_2OMe$) | Me | Me | H | O |
| D-13738 | Me | single bond | H | c-Pr(1-$CH_2OMe$) | Me | Me | H | O |
| D-13739 | Me(R) | single bond | H | c-Pr(1-$CH_2OMe$) | Me | Me | H | O |
| D-13740 | Me(S) | single bond | H | c-Pr(1-$CH_2OMe$) | Me | Me | H | O |
| D-13741 | H | single bond | Me | c-Pr(1-$CH_2OCN$) | Me | Cl | H | O |
| D-13742 | Me | single bond | H | c-Pr(1-$CH_2OCN$) | Me | Cl | H | O |
| D-13743 | Me(R) | single bond | H | c-Pr(1-$CH_2OCN$) | Me | Cl | H | O |
| D-13744 | Me(S) | single bond | H | c-Pr(1-$CH_2OCN$) | Me | Cl | H | O |
| D-13745 | H | single bond | Me | c-Pr(1-$CH_2OCN$) | Me | Me | H | O |
| D-13746 | Me | single bond | H | c-Pr(1-$CH_2OCN$) | Me | Me | H | O |

TABLE 959

| Compound Number | Y | W | Z | $R^1$ | $R^2$ | $R^3$ | $R^{10}$ | A |
|---|---|---|---|---|---|---|---|---|
| D-13747 | Me(R) | single bond | H | c-Pr(1-$CH_2$OCN) | Me | Me | H | O |
| D-13748 | Me(S) | single bond | H | c-Pr(1-$CH_2$OCN) | Me | Me | H | O |
| D-13749 | H | single bond | Me | c-Pr(1-$CH_2$SMe) | Me | Cl | H | O |
| D-13750 | Me | single bond | H | c-Pr(1-$CH_2$SMe) | Me | Cl | H | O |
| D-13751 | Me(R) | single bond | H | c-Pr(1-$CH_2$SMe) | Me | Cl | H | O |
| D-13752 | Me(S) | single bond | H | c-Pr(1-$CH_2$SMe) | Me | Cl | H | O |
| D-13753 | H | single bond | Me | c-Pr(1-$CH_2$SMe) | Me | Me | H | O |
| D-13754 | Me | single bond | H | c-Pr(1-$CH_2$SMe) | Me | Me | H | O |
| D-13755 | Me(R) | single bond | H | c-Pr(1-$CH_2$SMe) | Me | Me | H | O |
| D-13756 | Me(S) | single bond | H | c-Pr(1-$CH_2$SMe) | Me | Me | H | O |
| D-13757 | H | single bond | Me | c-Pr[1-$CH_2$S(=O)Me] | Me | Cl | H | O |
| D-13758 | Me | single bond | H | c-Pr[1-$CH_2$S(=O)Me] | Me | Cl | H | O |
| D-13759 | Me(R) | single bond | H | c-Pr[1-$CH_2$S(=O)Me] | Me | Cl | H | O |
| D-13760 | Me(S) | single bond | H | c-Pr[1-$CH_2$S(=O)Me] | Me | Cl | H | O |
| D-13761 | H | single bond | Me | c-Pr[1-$CH_2$S(=O)Me] | Me | Me | H | O |
| D-13762 | Me | single bond | H | c-Pr[1-$CH_2$S(=O)Me] | Me | Me | H | O |
| D-13763 | Me(R) | single bond | H | c-Pr[1-$CH_2$S(=O)Me] | Me | Me | H | O |
| D-13764 | Me(S) | single bond | H | c-Pr[1-$CH_2$S(=O)Me] | Me | Me | H | O |
| D-13765 | H | single bond | Me | c-Pr[1-$CH_2$S(=O)$_2$Me] | Me | Cl | H | O |
| D-13766 | Me | single bond | H | c-Pr[1-$CH_2$S(=O)$_2$Me] | Me | Cl | H | O |
| D-13767 | Me(R) | single bond | H | c-Pr[1-$CH_2$S(=O)$_2$Me] | Me | Cl | H | O |
| D-13768 | Me(S) | single bond | H | c-Pr[1-$CH_2$S(=O)$_2$Me] | Me | Cl | H | O |
| D-13769 | H | single bond | Me | c-Pr[1-$CH_2$S(=O)$_2$Me] | Me | Me | H | O |
| D-13770 | Me | single bond | H | c-Pr[1-$CH_2$S(=O)$_2$Me] | Me | Me | H | O |
| D-13771 | Me(R) | single bond | H | c-Pr[1-$CH_2$S(=O)$_2$Me] | Me | Me | H | O |
| D-13772 | Me(S) | single bond | H | c-Pr[1-$CH_2$S(=O)$_2$Me] | Me | Me | H | O |
| D-13773 | H | single bond | Me | c-Pr(1-$CH_2$F) | Me | Cl | H | O |
| D-13774 | Me | single bond | H | c-Pr(1-$CH_2$F) | Me | Cl | H | O |
| D-13775 | Me(R) | single bond | H | c-Pr(1-$CH_2$F) | Me | Cl | H | O |
| D-13776 | Me(S) | single bond | H | c-Pr(1-$CH_2$F) | Me | Cl | H | O |
| D-13777 | H | single bond | Me | c-Pr(1-$CH_2$F) | Me | Me | H | O |
| D-13778 | Me | single bond | H | c-Pr(1-$CH_2$F) | Me | Me | H | O |
| D-13779 | Me(R) | single bond | H | c-Pr(1-$CH_2$F) | Me | Me | H | O |
| D-13780 | Me(S) | single bond | H | c-Pr(1-$CH_2$F) | Me | Me | H | O |
| D-13781 | H | single bond | Me | c-Pr(1-$CHF_2$) | Me | Cl | H | O |
| D-13782 | Me | single bond | H | c-Pr(1-$CHF_2$) | Me | Cl | H | O |
| D-13783 | Me(R) | single bond | H | c-Pr(1-$CHF_2$) | Me | Cl | H | O |
| D-13784 | Me(S) | single bond | H | c-Pr(1-$CHF_2$) | Me | Cl | H | O |
| D-13785 | H | single bond | Me | c-Pr(1-$CHF_2$) | Me | Me | H | O |
| D-13786 | Me | single bond | H | c-Pr(1-$CHF_2$) | Me | Me | H | O |
| D-13787 | Me(R) | single bond | H | c-Pr(1-$CHF_2$) | Me | Me | H | O |
| D-13788 | Me(S) | single bond | H | c-Pr(1-$CHF_2$) | Me | Me | H | O |
| D-13789 | H | single bond | Me | c-Pr(1-$CF_3$) | Me | Cl | H | O |
| D-13790 | Me | single bond | H | c-Pr(1-$CF_3$) | Me | Cl | H | O |

TABLE 960

| Compound Number | Y | W | Z | $R^1$ | $R^2$ | $R^3$ | $R^{10}$ | A |
|---|---|---|---|---|---|---|---|---|
| D-13791 | Me(R) | single bond | H | c-Pr(1-$CF_3$) | Me | Cl | H | O |
| D-13792 | Me(S) | single bond | H | c-Pr(1-$CF_3$) | Me | Cl | H | O |
| D-13793 | H | single bond | Me | c-Pr(1-$CF_3$) | Me | Me | H | O |
| D-13794 | Me | single bond | H | c-Pr(1-$CF_3$) | Me | Me | H | O |
| D-13795 | Me(R) | single bond | H | c-Pr(1-$CF_3$) | Me | Me | H | O |
| D-13796 | Me(S) | single bond | H | c-Pr(1-$CF_3$) | Me | Me | H | O |
| D-13797 | H | single bond | Me | c-Pr(1-C≡CH) | Me | Cl | H | O |
| D-13798 | Me | single bond | H | c-Pr(1-C≡CH) | Me | Cl | H | O |
| D-13799 | Me(R) | single bond | H | c-Pr(1-C≡CH) | Me | Cl | H | O |
| D-13800 | Me(S) | single bond | H | c-Pr(1-C≡CH) | Me | Cl | H | O |
| D-13801 | H | single bond | Me | c-Pr(1-C≡CH) | Me | Me | H | O |
| D-13802 | Me | single bond | H | c-Pr(1-C≡CH) | Me | Me | H | O |
| D-13803 | Me(R) | single bond | H | c-Pr(1-C≡CH) | Me | Me | H | O |
| D-13804 | Me(S) | single bond | H | c-Pr(1-C≡CH) | Me | Me | H | O |
| D-13805 | H | single bond | Me | c-Pr[1-C(=O)OEt] | Me | Cl | H | O |
| D-13806 | Me | single bond | H | c-Pr[1-C(=O)OEt] | Me | Cl | H | O |
| D-13807 | Me(R) | single bond | H | c-Pr[1-C(=O)OEt] | Me | Cl | H | O |
| D-13808 | Me(S) | single bond | H | c-Pr[1-C(=O)OEt] | Me | Cl | H | O |
| D-13809 | H | single bond | Me | c-Pr[1-C(=O)OEt] | Me | Me | H | O |
| D-13810 | Me | single bond | H | c-Pr[1-C(=O)OEt] | Me | Me | H | O |
| D-13811 | Me(R) | single bond | H | c-Pr[1-C(=O)OEt] | Me | Me | H | O |
| D-13812 | Me(S) | single bond | H | c-Pr[1-C(=O)OEt] | Me | Me | H | O |
| D-13813 | H | single bond | Me | c-Pr[1-C(=O)OH] | Me | Cl | H | O |

TABLE 960-continued

| Compound Number | Y | W | Z | $R^1$ | $R^2$ | $R^3$ | $R^{10}$ | A |
|---|---|---|---|---|---|---|---|---|
| D-13814 | Me | single bond | H | c-Pr[1-C(=O)OH] | Me | Cl | H | O |
| D-13815 | Me(R) | single bond | H | c-Pr[1-C(=O)OH] | Me | Cl | H | O |
| D-13816 | Me(S) | single bond | H | c-Pr[1-C(=O)OH] | Me | Cl | H | O |
| D-13817 | H | single bond | Me | c-Pr[1-C(=O)OH] | Me | Me | H | O |
| D-13818 | Me | single bond | H | c-Pr[1-C(=O)OH] | Me | Me | H | O |
| D-13819 | Me(R) | single bond | H | c-Pr[1-C(=O)OH] | Me | Me | H | O |
| D-13820 | Me(S) | single bond | H | c-Pr[1-C(=O)OH] | Me | Me | H | O |
| D-13821 | H | single bond | Me | c-Pr[1-C(=O)$NH_2$] | Me | Cl | H | O |
| D-13822 | Me | single bond | H | c-Pr[1-C(=O)$NH_2$] | Me | Cl | H | O |
| D-13823 | Me(R) | single bond | H | c-Pr[1-C(=O)$NH_2$] | Me | Cl | H | O |
| D-13824 | Me(S) | single bond | H | c-Pr[1-C(=O)$NH_2$] | Me | Cl | H | O |
| D-13825 | H | single bond | Me | c-Pr[1-C(=O)$NH_2$] | Me | Me | H | O |
| D-13826 | Me | single bond | H | c-Pr[1-C(=O)$NH_2$] | Me | Me | H | O |
| D-13827 | Me(R) | single bond | H | c-Pr[1-C(=O)$NH_2$] | Me | Me | H | O |
| D-13828 | Me(S) | single bond | H | c-Pr[1-C(=O)$NH_2$] | Me | Me | H | O |
| D-13829 | H | single bond | Me | c-Pr(1-OMe) | Me | Cl | H | O |
| D-13830 | Me | single bond | H | c-Pr(1-OMe) | Me | Cl | H | O |
| D-13831 | Me(R) | single bond | H | c-Pr(1-OMe) | Me | Cl | H | O |
| D-13832 | Me(S) | single bond | H | c-Pr(1-OMe) | Me | Cl | H | O |
| D-13833 | H | single bond | Me | c-Pr(1-OMe) | Me | Me | H | O |
| D-13834 | Me | single bond | H | c-Pr(1-OMe) | Me | Me | H | O |

TABLE 961

| Compound Number | Y | W | Z | $R^1$ | $R^2$ | $R^3$ | $R^{10}$ | A |
|---|---|---|---|---|---|---|---|---|
| D-13835 | Me(R) | single bond | H | c-Pr(1-OMe) | Me | Me | H | O |
| D-13836 | Me(S) | single bond | H | c-Pr(1-OMe) | Me | Me | H | O |
| D-13837 | H | single bond | Me | c-Pr(1-SMe) | Me | Cl | H | O |
| D-13838 | Me | single bond | H | c-Pr(1-SMe) | Me | Cl | H | O |
| D-13839 | Me(R) | single bond | H | c-Pr(1-SMe) | Me | Cl | H | O |
| D-13840 | Me(S) | single bond | H | c-Pr(1-SMe) | Me | Cl | H | O |
| D-13841 | H | single bond | Me | c-Pr(1-SMe) | Me | Me | H | O |
| D-13842 | Me | single bond | H | c-Pr(1-SMe) | Me | Me | H | O |
| D-13843 | Me(R) | single bond | H | c-Pr(1-SMe) | Me | Me | H | O |
| D-13844 | Me(S) | single bond | H | c-Pr(1-SMe) | Me | Me | H | O |
| D-13845 | H | single bond | Me | c-Pr[1-S(=O)Me] | Me | Cl | H | O |
| D-13846 | Me | single bond | H | c-Pr[1-S(=O)Me] | Me | Cl | H | O |
| D-13847 | Me(R) | single bond | H | c-Pr[1-S(=O)Me] | Me | Cl | H | O |
| D-13848 | Me(S) | single bond | H | c-Pr[1-S(=O)Me] | Me | Cl | H | O |
| D-13849 | H | single bond | Me | c-Pr[1-S(=O)Me] | Me | Me | H | O |
| D-13850 | Me | single bond | H | c-Pr[1-S(=O)Me] | Me | Me | H | O |
| D-13851 | Me(R) | single bond | H | c-Pr[1-S(=O)Me] | Me | Me | H | O |
| D-13852 | Me(S) | single bond | H | c-Pr[1-S(=O)Me] | Me | Me | H | O |
| D-13853 | H | single bond | Me | c-Pr[1-S(=O)$_2$Me] | Me | Cl | H | O |
| D-13854 | Me | single bond | H | c-Pr[1-S(=O)$_2$Me] | Me | Cl | H | O |
| D-13855 | Me(R) | single bond | H | c-Pr[1-S(=O)$_2$Me] | Me | Cl | H | O |
| D-13856 | Me(S) | single bond | H | c-Pr[1-S(=O)$_2$Me] | Me | Cl | H | O |
| D-13857 | H | single bond | Me | c-Pr[1-S(=O)$_2$Me] | Me | Me | H | O |
| D-13858 | Me | single bond | H | c-Pr[1-S(=O)$_2$Me] | Me | Me | H | O |
| D-13859 | Me(R) | single bond | H | c-Pr[1-S(=O)$_2$Me] | Me | Me | H | O |
| D-13860 | Me(S) | single bond | H | c-Pr[1-S(=O)$_2$Me] | Me | Me | H | O |
| D-13861 | H | single bond | Me | c-Pr[1-S(=O)$_2$$CHF_2$] | Me | Cl | H | O |
| D-13862 | Me | single bond | H | c-Pr[1-S(=O)$_2$$CHF_2$] | Me | Cl | H | O |
| D-13863 | Me(R) | single bond | H | c-Pr[1-S(=O)$_2$$CHF_2$] | Me | Cl | H | O |
| D-13864 | Me(S) | single bond | H | c-Pr[1-S(=O)$_2$$CHF_2$] | Me | Cl | H | O |
| D-13865 | H | single bond | Me | c-Pr[1-S(=O)$_2$$CHF_2$] | Me | Me | H | O |
| D-13866 | Me | single bond | H | c-Pr[1-S(=O)$_2$$CHF_2$] | Me | Me | H | O |
| D-13867 | Me(R) | single bond | H | c-Pr[1-S(=O)$_2$$CHF_2$] | Me | Me | H | O |
| D-13868 | Me(S) | single bond | H | c-Pr[1-S(=O)$_2$$CHF_2$] | Me | Me | H | O |
| D-13869 | H | single bond | Me | c-Pr[1-S(=O)$_2$$CF_3$] | Me | Cl | H | O |
| D-13870 | Me | single bond | H | c-Pr[1-S(=O)$_2$$CF_3$] | Me | Cl | H | O |
| D-13871 | Me(R) | single bond | H | c-Pr[1-S(=O)$_2$$CF_3$] | Me | Cl | H | O |
| D-13872 | Me(S) | single bond | H | c-Pr[1-S(=O)$_2$$CF_3$] | Me | Cl | H | O |
| D-13873 | H | single bond | Me | c-Pr[1-S(=O)$_2$$CF_3$] | Me | Me | H | O |
| D-13874 | Me | single bond | H | c-Pr[1-S(=O)$_2$$CF_3$] | Me | Me | H | O |
| D-13875 | Me(R) | single bond | H | c-Pr[1-S(=O)$_2$$CF_3$] | Me | Me | H | O |
| D-13876 | Me(S) | single bond | H | c-Pr[1-S(=O)$_2$$CF_3$] | Me | Me | H | O |
| D-13877 | H | single bond | Me | c-Pr[1-(5,6-dihydro-1,4,2-dioxazin-3-yl)] | Me | Cl | H | O |
| D-13878 | Me | single bond | H | c-Pr[1-(5,6-dihydro-1,4,2-dioxazin-3-yl)] | Me | Cl | H | O |

| Compound Number | Y | W | Z | $R^1$ | $R^2$ | $R^3$ | $R^{10}$ | A |
|---|---|---|---|---|---|---|---|---|
| D-13879 | Me(R) | single bond | H | c-Pr[1-(5,6-dihydro-1,4,2-dioxazin-3-yl)] | Me | Cl | H | O |
| D-13880 | Me(S) | single bond | H | c-Pr[1-(5,6-dihydro-1,4,2-dioxazin-3-yl)] | Me | Cl | H | O |
| D-13881 | H | single bond | Me | c-Pr[1-(5,6-dihydro-1,4,2-dioxazin-3-yl)] | Me | Me | H | O |
| D-13882 | Me | single bond | H | c-Pr[1-(5,6-dihydro-1,4,2-dioxazin-3-yl)] | Me | Me | H | O |
| D-13883 | Me(R) | single bond | H | c-Pr[1-(5,6-dihydro-1,4,2-dioxazin-3-yl)] | Me | Me | H | O |
| D-13884 | Me(S) | single bond | H | c-Pr[1-(5,6-dihydro-1,4,2-dioxazin-3-yl)] | Me | Me | H | O |
| D-13885 | H | single bond | Me | c-Pr[1-(5-hydroxy-1,3,4-oxadiazol-2-yl)] | Me | Cl | H | O |
| D-13886 | Me | single bond | H | c-Pr[1-(5-hydroxy-1,3,4-oxadiazol-2-yl)] | Me | Cl | H | O |
| D-13887 | Me(R) | single bond | H | c-Pr[1-(5-hydroxy-1,3,4-oxadiazol-2-yl)] | Me | Cl | H | O |
| D-13888 | Me(S) | single bond | H | c-Pr[1-(5-hydroxy-1,3,4-oxadiazol-2-yl)] | Me | Cl | H | O |
| D-13889 | H | single bond | Me | c-Pr[1-(5-hydroxy-1,3,4-oxadiazol-2-yl)] | Me | Me | H | O |
| D-13890 | Me | single bond | H | c-Pr[1-(5-hydroxy-1,3,4-oxadiazol-2-yl)] | Me | Me | H | O |
| D-13891 | Me(R) | single bond | H | c-Pr[1-(5-hydroxy-1,3,4-oxadiazol-2-yl)] | Me | Me | H | O |
| D-13892 | Me(S) | single bond | H | c-Pr[1-(5-hydroxy-1,3,4-oxadiazol-2-yl)] | Me | Me | H | O |
| D-13893 | H | single bond | Me | c-Pr[1-(pyrimidin-2-yl)] | Me | Cl | H | O |
| D-13894 | Me | single bond | H | c-Pr[1-(pyrimidin-2-yl)] | Me | Cl | H | O |
| D-13895 | Me(R) | single bond | H | c-Pr[1-(pyrimidin-2-yl)] | Me | Cl | H | O |
| D-13896 | Me(S) | single bond | H | c-Pr[1-(pyrimidin-2-yl)] | Me | Cl | H | O |
| D-13897 | H | single bond | Me | c-Pr[1-(pyrimidin-2-yl)] | Me | Me | H | O |
| D-13898 | Me | single bond | H | c-Pr[1-(pyrimidin-2-yl)] | Me | Me | H | O |
| D-13899 | Me(R) | single bond | H | c-Pr[1-(pyrimidin-2-yl)] | Me | Me | H | O |
| D-13900 | Me(S) | single bond | H | c-Pr[1-(pyrimidin-2-yl)] | Me | Me | H | O |
| D-13901 | H | single bond | Me | t-Bu | Me | Cl | H | O |
| D-13902 | Me | single bond | H | t-Bu | Me | Cl | H | O |
| D-13903 | Me(R) | single bond | H | t-Bu | Me | Cl | H | O |
| D-13904 | Me(S) | single bond | H | t-Bu | Me | Cl | H | O |
| D-13905 | H | single bond | Me | t-Bu | Me | Me | H | O |
| D-13906 | Me | single bond | H | t-Bu | Me | Me | H | O |
| D-13907 | Me(R) | single bond | H | t-Bu | Me | Me | H | O |
| D-13908 | Me(S) | single bond | H | t-Bu | Me | Me | H | O |
| D-13909 | H | single bond | Me | c-Bu | Me | Cl | H | O |
| D-13910 | Me | single bond | H | c-Bu | Me | Cl | H | O |
| D-13911 | Me(R) | single bond | H | c-Bu | Me | Cl | H | O |
| D-13912 | Me(S) | single bond | H | c-Bu | Me | Cl | H | O |
| D-13913 | H | single bond | Me | c-Bu | Me | Me | H | O |
| D-13914 | Me | single bond | H | c-Bu | Me | Me | H | O |
| D-13915 | Me(R) | single bond | H | c-Bu | Me | Me | H | O |
| D-13916 | Me(S) | single bond | H | c-Bu | Me | Me | H | O |
| D-13917 | H | single bond | Me | c-Bu(1-CN) | Me | Cl | H | O |
| D-13918 | Me | single bond | H | c-Bu(1-CN) | Me | Cl | H | O |
| D-13919 | Me(R) | single bond | H | c-Bu(1-CN) | Me | Cl | H | O |
| D-13920 | Me(S) | single bond | H | c-Bu(1-CN) | Me | Cl | H | O |
| D-13921 | H | single bond | Me | c-Bu(1-CN) | Me | Me | H | O |
| D-13922 | Me | single bond | H | c-Bu(1-CN) | Me | Me | H | O |

TABLE 963

| Compound Number | Y | W | Z | $R^1$ | $R^2$ | $R^3$ | $R^{10}$ | A |
|---|---|---|---|---|---|---|---|---|
| D-13923 | Me(R) | single bond | H | c-Bu(1-CN) | Me | Me | H | O |
| D-13924 | Me(S) | single bond | H | c-Bu(1-CN) | Me | Me | H | O |
| D-13925 | H | single bond | Me | c-Bu(3,3-$F_2$) | Me | Cl | H | O |
| D-13926 | Me | single bond | H | c-Bu(3,3-$F_2$) | Me | Cl | H | O |
| D-13927 | Me(R) | single bond | H | c-Bu(3,3-$F_2$) | Me | Cl | H | O |
| D-13928 | Me(S) | single bond | H | c-Bu(3,3-$F_2$) | Me | Cl | H | O |
| D-13929 | H | single bond | Me | c-Bu(3,3-$F_2$) | Me | Me | H | O |
| D-13930 | Me | single bond | H | c-Bu(3,3-$F_2$) | Me | Me | H | O |
| D-13931 | Me(R) | single bond | H | c-Bu(3,3-$F_2$) | Me | Me | H | O |
| D-13932 | Me(S) | single bond | H | c-Bu(3,3-$F_2$) | Me | Me | H | O |
| D-13933 | H | single bond | Me | oxetan-3-yl | Me | Cl | H | O |
| D-13934 | Me | single bond | H | oxetan-3-yl | Me | Cl | H | O |
| D-13935 | Me(R) | single bond | H | oxetan-3-yl | Me | Cl | H | O |
| D-13936 | Me(S) | single bond | H | oxetan-3-yl | Me | Cl | H | O |
| D-13937 | H | single bond | Me | oxetan-3-yl | Me | Me | H | O |
| D-13938 | Me | single bond | H | oxetan-3-yl | Me | Me | H | O |
| D-13939 | Me(R) | single bond | H | oxetan-3-yl | Me | Me | H | O |
| D-13940 | Me(S) | single bond | H | oxetan-3-yl | Me | Me | H | O |
| D-13941 | H | single bond | Me | oxetan(3-CN)-3-yl | Me | Cl | H | O |
| D-13942 | Me | single bond | H | oxetan(3-CN)-3-yl | Me | Cl | H | O |
| D-13943 | Me(R) | single bond | H | oxetan(3-CN)-3-yl | Me | Cl | H | O |
| D-13944 | Me(S) | single bond | H | oxetan(3-CN)-3-yl | Me | Cl | H | O |

TABLE 963-continued

| Compound Number | Y | W | Z | $R^1$ | $R^2$ | $R^3$ | $R^{10}$ | A |
|---|---|---|---|---|---|---|---|---|
| D-13945 | H | single bond | Me | oxetan(3-CN)-3-yl | Me | Me | H | O |
| D-13946 | Me | single bond | H | oxetan(3-CN)-3-yl | Me | Me | H | O |
| D-13947 | Me(R) | single bond | H | oxetan(3-CN)-3-yl | Me | Me | H | O |
| D-13948 | Me(S) | single bond | H | oxetan(3-CN)-3-yl | Me | Me | H | O |
| D-13949 | H | single bond | Me | azetidin[1-C(═O)Me]-3-yl | Me | Cl | H | O |
| D-13950 | Me | single bond | H | azetidin[1-C(═O)Me]-3-yl | Me | Cl | H | O |
| D-13951 | Me(R) | single bond | H | azetidin[1-C(═O)Me]-3-yl | Me | Cl | H | O |
| D-13952 | Me(S) | single bond | H | azetidin[1-C(═O)Me]-3-yl | Me | Cl | H | O |
| D-13953 | H | single bond | Me | azetidin[1-C(═O)Me]-3-yl | Me | Me | H | O |
| D-13954 | Me | single bond | H | azetidin[1-C(═O)Me]-3-yl | Me | Me | H | O |
| D-13955 | Me(R) | single bond | H | azetidin[1-C(═O)Me]-3-yl | Me | Me | H | O |
| D-13956 | Me(S) | single bond | H | azetidin[1-C(═O)Me]-3-yl | Me | Me | H | O |
| D-13957 | H | single bond | Me | azetidin[1-S(═O)$_2$Me]-3-yl | Me | Cl | H | O |
| D-13958 | Me | single bond | H | azetidin[1-S(═O)$_2$Me]-3-yl | Me | Cl | H | O |
| D-13959 | Me(R) | single bond | H | azetidin[1-S(═O)$_2$Me]-3-yl | Me | Cl | H | O |
| D-13960 | Me(S) | single bond | H | azetidin[1-S(═O)$_2$Me]-3-yl | Me | Cl | H | O |
| D-13961 | H | single bond | Me | azetidin[1-S(═O)$_2$Me]-3-yl | Me | Me | H | O |
| D-13962 | Me | single bond | H | azetidin[1-S(═O)$_2$Me]-3-yl | Me | Me | H | O |
| D-13963 | Me(R) | single bond | H | azetidin[1-S(═O)$_2$Me]-3-yl | Me | Me | H | O |
| D-13964 | Me(S) | single bond | H | azetidin[1-S(═O)$_2$Me]-3-yl | Me | Me | H | O |
| D-13965 | H | single bond | Me | azetidin[1-S(═O)$_2$CHF$_2$]-3-yl | Me | Cl | H | O |
| D-13966 | Me | single bond | H | azetidin[1-S(═O)$_2$CHF$_2$]-3-yl | Me | Cl | H | O |

TABLE 964

| Compound Number | Y | W | Z | $R^1$ | $R^2$ | $R^3$ | $R^{10}$ | A |
|---|---|---|---|---|---|---|---|---|
| D-13967 | Me(R) | single bond | H | azetidin[1-S(═O)$_2$CHF$_2$]-3-yl | Me | Cl | H | O |
| D-13968 | Me(S) | single bond | H | azetidin[1-S(═O)$_2$CHF$_2$]-3-yl | Me | Cl | H | O |
| D-13969 | H | single bond | Me | azetidin[1-S(═O)$_2$CHF$_2$]-3-yl | Me | Me | H | O |
| D-13970 | Me | single bond | H | azetidin[1-S(═O)$_2$CHF$_2$]-3-yl | Me | Me | H | O |
| D-13971 | Me(R) | single bond | H | azetidin[1-S(═O)$_2$CHF$_2$]-3-yl | Me | Me | H | O |
| D-13972 | Me(S) | single bond | H | azetidin[1-S(═O)$_2$CHF$_2$]-3-yl | Me | Me | H | O |
| D-13973 | H | single bond | Me | c-Pen | Me | Cl | H | O |
| D-13974 | Me | single bond | H | c-Pen | Me | Cl | H | O |
| D-13975 | Me(R) | single bond | H | c-Pen | Me | Cl | H | O |
| D-13976 | Me(S) | single bond | H | c-Pen | Me | Cl | H | O |
| D-13977 | H | single bond | Me | c-Pen | Me | Me | H | O |
| D-13978 | Me | single bond | H | c-Pen | Me | Me | H | O |
| D-13979 | Me(R) | single bond | H | c-Pen | Me | Me | H | O |
| D-13980 | Me(S) | single bond | H | c-Pen | Me | Me | H | O |
| D-13981 | H | single bond | Me | tetrahydrofuran-3-yl | Me | Cl | H | O |
| D-13982 | Me | single bond | H | tetrahydrofuran-3-yl | Me | Cl | H | O |
| D-13983 | Me(R) | single bond | H | tetrahydrofuran-3-yl | Me | Cl | H | O |
| D-13984 | Me(S) | single bond | H | tetrahydrofuran-3-yl | Me | Cl | H | O |
| D-13985 | H | single bond | Me | tetrahydrofuran-3-yl | Me | Me | H | O |
| D-13986 | Me | single bond | H | tetrahydrofuran-3-yl | Me | Me | H | O |
| D-13987 | Me(R) | single bond | H | tetrahydrofuran-3-yl | Me | Me | H | O |
| D-13988 | Me(S) | single bond | H | tetrahydrofuran-3-yl | Me | Me | H | O |
| D-13989 | H | single bond | Me | tetrahydrothiophen-3-yl | Me | Cl | H | O |
| D-13990 | Me | single bond | H | tetrahydrothiophen-3-yl | Me | Cl | H | O |
| D-13991 | Me(R) | single bond | H | tetrahydrothiophen-3-yl | Me | Cl | H | O |
| D-13992 | Me(S) | single bond | H | tetrahydrothiophen-3-yl | Me | Cl | H | O |
| D-13993 | H | single bond | Me | tetrahydrothiophen-3-yl | Me | Me | H | O |
| D-13994 | Me | single bond | H | tetrahydrothiophen-3-yl | Me | Me | H | O |
| D-13995 | Me(R) | single bond | H | tetrahydrothiophen-3-yl | Me | Me | H | O |
| D-13996 | Me(S) | single bond | H | tetrahydrothiophen-3-yl | Me | Me | H | O |
| D-13997 | H | single bond | Me | c-Pen(1-CN) | Me | Cl | H | O |
| D-13998 | Me | single bond | H | c-Pen(1-CN) | Me | Cl | H | O |
| D-13999 | Me(R) | single bond | H | c-Pen(1-CN) | Me | Cl | H | O |
| D-14000 | Me(S) | single bond | H | c-Pen(1-CN) | Me | Cl | H | O |
| D-14001 | H | single bond | Me | c-Pen(1-CN) | Me | Me | H | O |
| D-14002 | Me | single bond | H | c-Pen(1-CN) | Me | Me | H | O |
| D-14003 | Me(R) | single bond | H | c-Pen(1-CN) | Me | Me | H | O |
| D-14004 | Me(S) | single bond | H | c-Pen(1-CN) | Me | Me | H | O |
| D-14005 | H | single bond | Me | tetrahydrofuran(3-CN)-3-yl | Me | Cl | H | O |
| D-14006 | Me | single bond | H | tetrahydrofuran(3-CN)-3-yl | Me | Cl | H | O |
| D-14007 | Me(R) | single bond | H | tetrahydrofuran(3-CN)-3-yl | Me | Cl | H | O |
| D-14008 | Me(S) | single bond | H | tetrahydrofuran(3-CN)-3-yl | Me | Cl | H | O |
| D-14009 | H | single bond | Me | tetrahydrofuran(3-CN)-3-yl | Me | Me | H | O |
| D-14010 | Me | single bond | H | tetrahydrofuran(3-CN)-3-yl | Me | Me | H | O |

TABLE 965

| Compound Number | Y | W | Z | $R^1$ | $R^2$ | $R^3$ | $R^{10}$ | A |
|---|---|---|---|---|---|---|---|---|
| D-14011 | Me(R) | single bond | H | tetrahydrofuran(3-CN)-3-yl | Me | Me | H | O |
| D-14012 | Me(S) | single bond | H | tetrahydrofuran(3-CN)-3-yl | Me | Me | H | O |
| D-14013 | H | single bond | Me | tetrahydrothiophen(3-CN)-3-yl | Me | Cl | H | O |
| D-14014 | Me | single bond | H | tetrahydrothiophen(3-CN)-3-yl | Me | Cl | H | O |
| D-14015 | Me(R) | single bond | H | tetrahydrothiophen(3-CN)-3-yl | Me | Cl | H | O |
| D-14016 | Me(S) | single bond | H | tetrahydrothiophen(3-CN)-3-yl | Me | Cl | H | O |
| D-14017 | H | single bond | Me | tetrahydrothiophen(3-CN)-3-yl | Me | Me | H | O |
| D-14018 | Me | single bond | H | tetrahydrothiophen(3-CN)-3-yl | Me | Me | H | O |
| D-14019 | Me(R) | single bond | H | tetrahydrothiophen(3-CN)-3-yl | Me | Me | H | O |
| D-14020 | Me(S) | single bond | H | tetrahydrothiophen(3-CN)-3-yl | Me | Me | H | O |
| D-14021 | H | single bond | Me | bicyclo[1.1.1]pentan-1-yl | Me | Cl | H | O |
| D-14022 | Me | single bond | H | bicyclo[1.1.1]pentan-1-yl | Me | Cl | H | O |
| D-14023 | Me(R) | single bond | H | bicyclo[1.1.1]pentan-1-yl | Me | Cl | H | O |
| D-14024 | Me(S) | single bond | H | bicyclo[1.1.1]pentan-1-yl | Me | Cl | H | O |
| D-14025 | H | single bond | Me | bicyclo[1.1.1]pentan-1-yl | Me | Me | H | O |
| D-14026 | Me | single bond | H | bicyclo[1.1.1]pentan-1-yl | Me | Me | H | O |
| D-14027 | Me(R) | single bond | H | bicyclo[1.1.1]pentan-1-yl | Me | Me | H | O |
| D-14028 | Me(S) | single bond | H | bicyclo[1.1.1]pentan-1-yl | Me | Me | H | O |
| D-14029 | H | single bond | Me | c-Hex | Me | Cl | H | O |
| D-14030 | Me | single bond | H | c-Hex | Me | Cl | H | O |
| D-14031 | Me(R) | single bond | H | c-Hex | Me | Cl | H | O |
| D-14032 | Me(S) | single bond | H | c-Hex | Me | Cl | H | O |
| D-14033 | H | single bond | Me | c-Hex | Me | Me | H | O |
| D-14034 | Me | single bond | H | c-Hex | Me | Me | H | O |
| D-14035 | Me(R) | single bond | H | c-Hex | Me | Me | H | O |
| D-14036 | Me(S) | single bond | H | c-Hex | Me | Me | H | O |
| D-14037 | H | single bond | Me | tetrahydropyran-4-yl | Me | Cl | H | O |
| D-14038 | Me | single bond | H | tetrahydropyran-4-yl | Me | Cl | H | O |
| D-14039 | Me(R) | single bond | H | tetrahydropyran-4-yl | Me | Cl | H | O |
| D-14040 | Me(S) | single bond | H | tetrahydropyran-4-yl | Me | Cl | H | O |
| D-14041 | H | single bond | Me | tetrahydropyran-4-yl | Me | Me | H | O |
| D-14042 | Me | single bond | H | tetrahydropyran-4-yl | Me | Me | H | O |
| D-14043 | Me(R) | single bond | H | tetrahydropyran-4-yl | Me | Me | H | O |
| D-14044 | Me(S) | single bond | H | tetrahydropyran-4-yl | Me | Me | H | O |
| D-14045 | H | single bond | Me | tetrahydrothiopyran-4-yl | Me | Cl | H | O |
| D-14046 | Me | single bond | H | tetrahydrothiopyran-4-yl | Me | Cl | H | O |
| D-14047 | Me(R) | single bond | H | tetrahydrothiopyran-4-yl | Me | Cl | H | O |
| D-14048 | Me(S) | single bond | H | tetrahydrothiopyran-4-yl | Me | Cl | H | O |
| D-14049 | H | single bond | Me | tetrahydrothiopyran-4-yl | Me | Me | H | O |
| D-14050 | Me | single bond | H | tetrahydrothiopyran-4-yl | Me | Me | H | O |
| D-14051 | Me(R) | single bond | H | tetrahydrothiopyran-4-yl | Me | Me | H | O |
| D-14052 | Me(S) | single bond | H | tetrahydrothiopyran-4-yl | Me | Me | H | O |
| D-14053 | H | single bond | Me | c-Hex(1-CN) | Me | Cl | H | O |
| D-14054 | Me | single bond | H | c-Hex(1-CN) | Me | Cl | H | O |

TABLE 966

| Compound Number | Y | W | Z | $R^1$ | $R^2$ | $R^3$ | $R^{10}$ | A |
|---|---|---|---|---|---|---|---|---|
| D-14055 | Me(R) | single bond | H | c-Hex(1-CN) | Me | Cl | H | O |
| D-14056 | Me(S) | single bond | H | c-Hex(1-CN) | Me | Cl | H | O |
| D-14057 | H | single bond | Me | c-Hex(1-CN) | Me | Me | H | O |
| D-14058 | Me | single bond | H | c-Hex(1-CN) | Me | Me | H | O |
| D-14059 | Me(R) | single bond | H | c-Hex(1-CN) | Me | Me | H | O |
| D-14060 | Me(S) | single bond | H | c-Hex(1-CN) | Me | Me | H | O |
| D-14061 | H | single bond | Me | tetrahydropyran(4-CN)-4-yl | Me | Cl | H | O |
| D-14062 | Me | single bond | H | tetrahydropyran(4-CN)-4-yl | Me | Cl | H | O |
| D-14063 | Me(R) | single bond | H | tetrahydropyran(4-CN)-4-yl | Me | Cl | H | O |
| D-14064 | Me(S) | single bond | H | tetrahydropyran(4-CN)-4-yl | Me | Cl | H | O |
| D-14065 | H | single bond | Me | tetrahydropyran(4-CN)-4-yl | Me | Me | H | O |
| D-14066 | Me | single bond | H | tetrahydropyran(4-CN)-4-yl | Me | Me | H | O |
| D-14067 | Me(R) | single bond | H | tetrahydropyran(4-CN)-4-yl | Me | Me | H | O |
| D-14068 | Me(S) | single bond | H | tetrahydropyran(4-CN)-4-yl | Me | Me | H | O |
| D-14069 | H | single bond | Me | tetrahydrothiopyran(4-CN)-4-yl | Me | Cl | H | O |
| D-14070 | Me | single bond | H | tetrahydrothiopyran(4-CN)-4-yl | Me | Cl | H | O |
| D-14071 | Me(R) | single bond | H | tetrahydrothiopyran(4-CN)-4-yl | Me | Cl | H | O |
| D-14072 | Me(S) | single bond | H | tetrahydrothiopyran(4-CN)-4-yl | Me | Cl | H | O |
| D-14073 | H | single bond | Me | tetrahydrothiopyran(4-CN)-4-yl | Me | Me | H | O |
| D-14074 | Me | single bond | H | tetrahydrothiopyran(4-CN)-4-yl | Me | Me | H | O |
| D-14075 | Me(R) | single bond | H | tetrahydrothiopyran(4-CN)-4-yl | Me | Me | H | O |

TABLE 966-continued

| Compound Number | Y | W | Z | $R^1$ | $R^2$ | $R^3$ | $R^{10}$ | A |
|---|---|---|---|---|---|---|---|---|
| D-14076 | Me(S) | single bond | H | tetrahydrothiopyran(4-CN)-4-yl | Me | Me | H | O |
| D-14077 | H | single bond | Me | $CH_2$(c-Pr) | Me | Cl | H | O |
| D-14078 | Me | single bond | H | $CH_2$(c-Pr) | Me | Cl | H | O |
| D-14079 | Me(R) | single bond | H | $CH_2$(c-Pr) | Me | Cl | H | O |
| D-14080 | Me(S) | single bond | H | $CH_2$(c-Pr) | Me | Cl | H | O |
| D-14081 | H | single bond | Me | $CH_2$(c-Pr) | Me | Me | H | O |
| D-14082 | Me | single bond | H | $CH_2$(c-Pr) | Me | Me | H | O |
| D-14083 | Me(R) | single bond | H | $CH_2$(c-Pr) | Me | Me | H | O |
| D-14084 | Me(S) | single bond | H | $CH_2$(c-Pr) | Me | Me | H | O |
| D-14085 | H | single bond | Me | $CH_2$[c-Pr(1-CN)] | Me | Cl | H | O |
| D-14086 | Me | single bond | H | $CH_2$[c-Pr(1-CN)] | Me | Cl | H | O |
| D-14087 | Me(R) | single bond | H | $CH_2$[c-Pr(1-CN)] | Me | Cl | H | O |
| D-14088 | Me(S) | single bond | H | $CH_2$[c-Pr(1-CN)] | Me | Cl | H | O |
| D-14089 | H | single bond | Me | $CH_2$[c-Pr(1-CN)] | Me | Me | H | O |
| D-14090 | Me | single bond | H | $CH_2$[c-Pr(1-CN)] | Me | Me | H | O |
| D-14091 | Me(R) | single bond | H | $CH_2$[c-Pr(1-CN)] | Me | Me | H | O |
| D-14092 | Me(S) | single bond | H | $CH_2$[c-Pr(1-CN)] | Me | Me | H | O |
| D-14093 | H | single bond | Me | CH(Me)(c-Pr) | Me | Cl | H | O |
| D-14094 | Me | single bond | H | CH(Me)(c-Pr) | Me | Cl | H | O |
| D-14095 | Me(R) | single bond | H | CH(Me)(c-Pr) | Me | Cl | H | O |
| D-14096 | Me(S) | single bond | H | CH(Me)(c-Pr) | Me | Cl | H | O |
| D-14097 | H | single bond | Me | CH(Me)(c-Pr) | Me | Me | H | O |
| D-14098 | Me | single bond | H | CH(Me)(c-Pr) | Me | Me | H | O |

TABLE 967

| Compound Number | Y | W | Z | $R^1$ | $R^2$ | $R^3$ | $R^{10}$ | A |
|---|---|---|---|---|---|---|---|---|
| D-14099 | Me(R) | single bond | H | CH(Me)(c-Pr) | Me | Me | H | O |
| D-14100 | Me(S) | single bond | H | CH(Me)(c-Pr) | Me | Me | H | O |
| D-14101 | H | single bond | Me | CH(Me)$CH_2$OMe | Me | Cl | H | O |
| D-14102 | Me | single bond | H | CH(Me)$CH_2$OMe | Me | Cl | H | O |
| D-14103 | Me(R) | single bond | H | CH(Me)$CH_2$OMe | Me | Cl | H | O |
| D-14104 | Me(S) | single bond | H | CH(Me)$CH_2$OMe | Me | Cl | H | O |
| D-14105 | H | single bond | Me | CH(Me)$CH_2$OMe | Me | Me | H | O |
| D-14106 | Me | single bond | H | CH(Me)$CH_2$OMe | Me | Me | H | O |
| D-14107 | Me(R) | single bond | H | CH(Me)$CH_2$OMe | Me | Me | H | O |
| D-14108 | Me(S) | single bond | H | CH(Me)$CH_2$OMe | Me | Me | H | O |
| D-14109 | H | single bond | Me | $CH_2CH{=}CH_2$ | Me | Cl | H | O |
| D-14110 | Me | single bond | H | $CH_2CH{=}CH_2$ | Me | Cl | H | O |
| D-14111 | Me(R) | single bond | H | $CH_2CH{=}CH_2$ | Me | Cl | H | O |
| D-14112 | Me(S) | single bond | H | $CH_2CH{=}CH_2$ | Me | Cl | H | O |
| D-14113 | H | single bond | Me | $CH_2CH{=}CH_2$ | Me | Me | H | O |
| D-14114 | Me | single bond | H | $CH_2CH{=}CH_2$ | Me | Me | H | O |
| D-14115 | Me(R) | single bond | H | $CH_2CH{=}CH_2$ | Me | Me | H | O |
| D-14116 | Me(S) | single bond | H | $CH_2CH{=}CH_2$ | Me | Me | H | O |
| D-14117 | H | single bond | Me | $CH_2C{\equiv}CH$ | Me | Cl | H | O |
| D-14118 | Me | single bond | H | $CH_2C{\equiv}CH$ | Me | Cl | H | O |
| D-14119 | Me(R) | single bond | H | $CH_2C{\equiv}CH$ | Me | Cl | H | O |
| D-14120 | Me(S) | single bond | H | $CH_2C{\equiv}CH$ | Me | Cl | H | O |
| D-14121 | H | single bond | Me | $CH_2C{\equiv}CH$ | Me | Me | H | O |
| D-14122 | Me | single bond | H | $CH_2C{\equiv}CH$ | Me | Me | H | O |
| D-14123 | Me(R) | single bond | H | $CH_2C{\equiv}CH$ | Me | Me | H | O |
| D-14124 | Me(S) | single bond | H | $CH_2C{\equiv}CH$ | Me | Me | H | O |
| D-14125 | H | single bond | Me | $CH_2CN$ | Me | Cl | H | O |
| D-14126 | Me | single bond | H | $CH_2CN$ | Me | Cl | H | O |
| D-14127 | Me(R) | single bond | H | $CH_2CN$ | Me | Cl | H | O |
| D-14128 | Me(S) | single bond | H | $CH_2CN$ | Me | Cl | H | O |
| D-14129 | H | single bond | Me | $CH_2CN$ | Me | Me | H | O |
| D-14130 | Me | single bond | H | $CH_2CN$ | Me | Me | H | O |
| D-14131 | Me(R) | single bond | H | $CH_2CN$ | Me | Me | H | O |
| D-14132 | Me(S) | single bond | H | $CH_2CN$ | Me | Me | H | O |
| D-14133 | H | single bond | Me | CH(Me)CN | Me | Cl | H | O |
| D-14134 | Me | single bond | H | CH(Me)CN | Me | Cl | H | O |
| D-14135 | Me(R) | single bond | H | CH(Me)CN | Me | Cl | H | O |
| D-14136 | Me(S) | single bond | H | CH(Me)CN | Me | Cl | H | O |
| D-14137 | H | single bond | Me | CH(Me)CN | Me | Me | H | O |
| D-14138 | Me | single bond | H | CH(Me)CN | Me | Me | H | O |
| D-14139 | Me(R) | single bond | H | CH(Me)CN | Me | Me | H | O |
| D-14140 | Me(S) | single bond | H | CH(Me)CN | Me | Me | H | O |

TABLE 967-continued

| Compound Number | Y | W | Z | $R^1$ | $R^2$ | $R^3$ | $R^{10}$ | A |
|---|---|---|---|---|---|---|---|---|
| D-14141 | H | single bond | Me | $C(Me)_2CN$ | Me | Cl | H | O |
| D-14142 | Me | single bond | H | $C(Me)_2CN$ | Me | Cl | H | O |

TABLE 968

| Compound Number | Y | W | Z | $R^1$ | $R^2$ | $R^3$ | $R^{10}$ | A |
|---|---|---|---|---|---|---|---|---|
| D-14143 | Me(R) | single bond | H | $C(Me)_2CN$ | Me | Cl | H | O |
| D-14144 | Me(S) | single bond | H | $C(Me)_2CN$ | Me | Cl | H | O |
| D-14145 | H | single bond | Me | $C(Me)_2CN$ | Me | Me | H | O |
| D-14146 | Me | single bond | H | $C(Me)_2CN$ | Me | Me | H | O |
| D-14147 | Me(R) | single bond | H | $C(Me)_2CN$ | Me | Me | H | O |
| D-14148 | Me(S) | single bond | H | $C(Me)_2CN$ | Me | Me | H | O |
| D-14149 | H | single bond | Me | C(Me)(i-Pr)CN | Me | Cl | H | O |
| D-14150 | Me | single bond | H | C(Me)(i-Pr)CN | Me | Cl | H | O |
| D-14151 | Me(R) | single bond | H | C(Me)(i-Pr)CN | Me | Cl | H | O |
| D-14152 | Me(S) | single bond | H | C(Me)(i-Pr)CN | Me | Cl | H | O |
| D-14153 | H | single bond | Me | C(Me)(i-Pr)CN | Me | Me | H | O |
| D-14154 | Me | single bond | H | C(Me)(i-Pr)CN | Me | Me | H | O |
| D-14155 | Me(R) | single bond | H | C(Me)(i-Pr)CN | Me | Me | H | O |
| D-14156 | Me(S) | single bond | H | C(Me)(i-Pr)CN | Me | Me | H | O |
| D-14157 | H | single bond | Me | OMe | Me | Cl | H | O |
| D-14158 | Me | single bond | H | OMe | Me | Cl | H | O |
| D-14159 | Me(R) | single bond | H | OMe | Me | Cl | H | O |
| D-14160 | Me(S) | single bond | H | OMe | Me | Cl | H | O |
| D-14161 | H | single bond | Me | OMe | Me | Me | H | O |
| D-14162 | Me | single bond | H | OMe | Me | Me | H | O |
| D-14163 | Me(R) | single bond | H | OMe | Me | Me | H | O |
| D-14164 | Me(S) | single bond | H | OMe | Me | Me | H | O |
| D-14165 | H | single bond | Me | CH═NOMe | Me | Cl | H | O |
| D-14166 | Me | single bond | H | CH═NOMe | Me | Cl | H | O |
| D-14167 | Me(R) | single bond | H | CH═NOMe | Me | Cl | H | O |
| D-14168 | Me(S) | single bond | H | CH═NOMe | Me | Cl | H | O |
| D-14169 | H | single bond | Me | CH═NOMe | Me | Me | H | O |
| D-14170 | Me | single bond | H | CH═NOMe | Me | Me | H | O |
| D-14171 | Me(R) | single bond | H | CH═NOMe | Me | Me | H | O |
| D-14172 | Me(S) | single bond | H | CH═NOMe | Me | Me | H | O |
| D-14173 | H | single bond | Me | morpholin-4-yl | Me | Cl | H | O |
| D-14174 | Me | single bond | H | morpholin-4-yl | Me | Cl | H | O |
| D-14175 | Me(R) | single bond | H | morpholin-4-yl | Me | Cl | H | O |
| D-14176 | Me(S) | single bond | H | morpholin-4-yl | Me | Cl | H | O |
| D-14177 | H | single bond | Me | morpholin-4-yl | Me | Me | H | O |
| D-14178 | Me | single bond | H | morpholin-4-yl | Me | Me | H | O |
| D-14179 | Me(R) | single bond | H | morpholin-4-yl | Me | Me | H | O |
| D-14180 | Me(S) | single bond | H | morpholin-4-yl | Me | Me | H | O |
| D-14181 | H | single bond | Me | Ph | Me | Cl | H | O |
| D-14182 | Me | single bond | H | Ph | Me | Cl | H | O |
| D-14183 | Me(R) | single bond | H | Ph | Me | Cl | H | O |
| D-14184 | Me(S) | single bond | H | Ph | Me | Cl | H | O |
| D-14185 | H | single bond | Me | Ph | Me | Me | H | O |
| D-14186 | Me | single bond | H | Ph | Me | Me | H | O |

TABLE 969

| Compound Number | Y | W | Z | $R^1$ | $R^2$ | $R^3$ | $R^{10}$ | A |
|---|---|---|---|---|---|---|---|---|
| D-14187 | Me(R) | single bond | H | Ph | Me | Me | H | O |
| D-14188 | Me(S) | single bond | H | Ph | Me | Me | H | O |
| D-14189 | H | single bond | Me | $CH_2Ph$ | Me | Cl | H | O |
| D-14190 | Me | single bond | H | $CH_2Ph$ | Me | Cl | H | O |
| D-14191 | Me(R) | single bond | H | $CH_2Ph$ | Me | Cl | H | O |
| D-14192 | Me(S) | single bond | H | $CH_2Ph$ | Me | Cl | H | O |
| D-14193 | H | single bond | Me | $CH_2Ph$ | Me | Me | H | O |
| D-14194 | Me | single bond | H | $CH_2Ph$ | Me | Me | H | O |
| D-14195 | Me(R) | single bond | H | $CH_2Ph$ | Me | Me | H | O |
| D-14196 | Me(S) | single bond | H | $CH_2Ph$ | Me | Me | H | O |
| D-14197 | H | single bond | Me | thiazole-2-yl | Me | Cl | H | O |
| D-14198 | Me | single bond | H | thiazole-2-yl | Me | Cl | H | O |

TABLE 969-continued

| Compound Number | Y | W | Z | $R^1$ | $R^2$ | $R^3$ | $R^{10}$ | A |
|---|---|---|---|---|---|---|---|---|
| D-14199 | Me(R) | single bond | H | thiazole-2-yl | Me | Cl | H | O |
| D-14200 | Me(S) | single bond | H | thiazole-2-yl | Me | Cl | H | O |
| D-14201 | H | single bond | Me | thiazole-2-yl | Me | Me | H | O |
| D-14202 | Me | single bond | H | thiazole-2-yl | Me | Me | H | O |
| D-14203 | Me(R) | single bond | H | thiazole-2-yl | Me | Me | H | O |
| D-14204 | Me(S) | single bond | H | thiazole-2-yl | Me | Me | H | O |
| D-14205 | H | single bond | Me | 1-Me-pyrazol-3-yl | Me | Cl | H | O |
| D-14206 | Me | single bond | H | 1-Me-pyrazol-3-yl | Me | Cl | H | O |
| D-14207 | Me(R) | single bond | H | 1-Me-pyrazol-3-yl | Me | Cl | H | O |
| D-14208 | Me(S) | single bond | H | 1-Me-pyrazol-3-yl | Me | Cl | H | O |
| D-14209 | H | single bond | Me | 1-Me-pyrazol-3-yl | Me | Me | H | O |
| D-14210 | Me | single bond | H | 1-Me-pyrazol-3-yl | Me | Me | H | O |
| D-14211 | Me(R) | single bond | H | 1-Me-pyrazol-3-yl | Me | Me | H | O |
| D-14212 | Me(S) | single bond | H | 1-Me-pyrazol-3-yl | Me | Me | H | O |
| D-14213 | H | single bond | Me | 1-Me-pyrazol-5-yl | Me | Cl | H | O |
| D-14214 | Me | single bond | H | 1-Me-pyrazol-5-yl | Me | Cl | H | O |
| D-14215 | Me(R) | single bond | H | 1-Me-pyrazol-5-yl | Me | Cl | H | O |
| D-14216 | Me(S) | single bond | H | 1-Me-pyrazol-5-yl | Me | Cl | H | O |
| D-14217 | H | single bond | Me | 1-Me-pyrazol-5-yl | Me | Me | H | O |
| D-14218 | Me | single bond | H | 1-Me-pyrazol-5-yl | Me | Me | H | O |
| D-14219 | Me(R) | single bond | H | 1-Me-pyrazol-5-yl | Me | Me | H | O |
| D-14220 | Me(S) | single bond | H | 1-Me-pyrazol-5-yl | Me | Me | H | O |
| D-14221 | H | single bond | Me | $CH_2$(pyrimidin-2-yl) | Me | Cl | H | O |
| D-14222 | Me | single bond | H | $CH_2$(pyrimidin-2-yl) | Me | Cl | H | O |
| D-14223 | Me(R) | single bond | H | $CH_2$(pyrimidin-2-yl) | Me | Cl | H | O |
| D-14224 | Me(S) | single bond | H | $CH_2$(pyrimidin-2-yl) | Me | Cl | H | O |
| D-14225 | H | single bond | Me | $CH_2$(pyrimidin-2-yl) | Me | Me | H | O |
| D-14226 | Me | single bond | H | $CH_2$(pyrimidin-2-yl) | Me | Me | H | O |
| D-14227 | Me(R) | single bond | H | $CH_2$(pyrimidin-2-yl) | Me | Me | H | O |
| D-14228 | Me(S) | single bond | H | $CH_2$(pyrimidin-2-yl) | Me | Me | H | O |
| D-14229 | H | single bond | Me | Me | Me | Cl | Me | O |
| D-14230 | Me | single bond | H | Me | Me | Cl | Me | O |

TABLE 970

| Compound Number | Y | W | Z | $R^1$ | $R^2$ | $R^3$ | $R^{10}$ | A |
|---|---|---|---|---|---|---|---|---|
| D-14231 | Me(R) | single bond | H | Me | Me | Cl | Me | O |
| D-14232 | Me(S) | single bond | H | Me | Me | Cl | Me | O |
| D-14233 | H | single bond | Me | Me | Me | Me | Me | O |
| D-14234 | Me | single bond | H | Me | Me | Me | Me | O |
| D-14235 | Me(R) | single bond | H | Me | Me | Me | Me | O |
| D-14236 | Me(S) | single bond | H | Me | Me | Me | Me | O |
| D-14237 | H | single bond | Me | $CH_2CHF_2$ | Me | Cl | Me | O |
| D-14238 | Me | single bond | H | $CH_2CHF_2$ | Me | Cl | Me | O |
| D-14239 | Me(R) | single bond | H | $CH_2CHF_2$ | Me | Cl | Me | O |
| D-14240 | Me(S) | single bond | H | $CH_2CHF_2$ | Me | Cl | Me | O |
| D-14241 | H | single bond | Me | $CH_2CHF_2$ | Me | Me | Me | O |
| D-14242 | Me | single bond | H | $CH_2CHF_2$ | Me | Me | Me | O |
| D-14243 | Me(R) | single bond | H | $CH_2CHF_2$ | Me | Me | Me | O |
| D-14244 | Me(S) | single bond | H | $CH_2CHF_2$ | Me | Me | Me | O |
| D-14245 | H | single bond | Me | n-Pr | Me | Cl | Me | O |
| D-14246 | Me | single bond | H | n-Pr | Me | Cl | Me | O |
| D-14247 | Me(R) | single bond | H | n-Pr | Me | Cl | Me | O |
| D-14248 | Me(S) | single bond | H | n-Pr | Me | Cl | Me | O |
| D-14249 | H | single bond | Me | n-Pr | Me | Me | Me | O |
| D-14250 | Me | single bond | H | n-Pr | Me | Me | Me | O |
| D-14251 | Me(R) | single bond | H | n-Pr | Me | Me | Me | O |
| D-14252 | Me(S) | single bond | H | n-Pr | Me | Me | Me | O |
| D-14253 | H | single bond | Me | i-Pr | Me | Cl | Me | O |
| D-14254 | Me | single bond | H | i-Pr | Me | Cl | Me | O |
| D-14255 | Me(R) | single bond | H | i-Pr | Me | Cl | Me | O |
| D-14256 | Me(S) | single bond | H | i-Pr | Me | Cl | Me | O |
| D-14257 | H | single bond | Me | i-Pr | Me | Me | Me | O |
| D-14258 | Me | single bond | H | i-Pr | Me | Me | Me | O |
| D-14259 | Me(R) | single bond | H | i-Pr | Me | Me | Me | O |
| D-14260 | Me(S) | single bond | H | i-Pr | Me | Me | Me | O |
| D-14261 | H | single bond | Me | c-Pr(1-F) | Me | Cl | Me | O |
| D-14262 | Me | single bond | H | c-Pr(1-F) | Me | Cl | Me | O |
| D-14263 | Me(R) | single bond | H | c-Pr(1-F) | Me | Cl | Me | O |
| D-14264 | Me(S) | single bond | H | c-Pr(1-F) | Me | Cl | Me | O |
| D-14265 | H | single bond | Me | c-Pr(1-F) | Me | Me | Me | O |
| D-14266 | Me | single bond | H | c-Pr(1-F) | Me | Me | Me | O |
| D-14267 | Me(R) | single bond | III | c-Pr(1-F) | Me | Me | Me | O |
| D-14268 | Me(S) | single bond | H | c-Pr(1-F) | Me | Me | Me | O |
| D-14269 | H | single bond | Me | c-Pr(2,2-$F_2$) | Me | Cl | Me | O |
| D-14270 | Me | single bond | H | c-Pr(2,2-$F_2$) | Me | Cl | Me | O |
| D-14271 | Me(R) | single bond | H | c-Pr(2,2-$F_2$) | Me | Cl | Me | O |
| D-14272 | Me(S) | single bond | H | c-Pr(2,2-$F_2$) | Me | Cl | Me | O |
| D-14273 | H | single bond | Me | c-Pr(2,2-$F_2$) | Me | Me | Me | O |
| D-14274 | Me | single bond | H | c-Pr(2,2-$F_2$) | Me | Me | Me | O |

TABLE 971

| Compound Number | Y | W | Z | $R^1$ | $R^2$ | $R^3$ | $R^{10}$ | A |
|---|---|---|---|---|---|---|---|---|
| D-14275 | Me(R) | single bond | H | c-Pr(2,2-$F_2$) | Me | Me | Me | O |
| D-14276 | Me(S) | single bond | H | c-Pr(2,2-$F_2$) | Me | Me | Me | O |
| D-14277 | H | single bond | Me | c-Pr(1-Cl) | Me | Cl | Me | O |
| D-14278 | Me | single bond | H | c-Pr(1-Cl) | Me | Cl | Me | O |
| D-14279 | Me(R) | single bond | H | c-Pr(1-Cl) | Me | Cl | Me | O |
| D-14280 | Me(S) | single bond | H | c-Pr(1-Cl) | Me | Cl | Me | O |

TABLE 971-continued

| Compound Number | Y | W | Z | $R^1$ | $R^2$ | $R^3$ | $R^{10}$ | A |
|---|---|---|---|---|---|---|---|---|
| D-14281 | H | single bond | Me | c-Pr(1-Cl) | Me | Me | Me | O |
| D-14282 | Me | single bond | H | c-Pr(1-Cl) | Me | Me | Me | O |
| D-14283 | Me(R) | single bond | H | c-Pr(1-Cl) | Me | Me | Me | O |
| D-14284 | Me(S) | single bond | H | c-Pr(1-Cl) | Me | Me | Me | O |
| D-14285 | H | single bond | Me | c-Pr(1-Br) | Me | Cl | Me | O |
| D-14286 | Me | single bond | H | c-Pr(1-Br) | Me | Cl | Me | O |
| D-14287 | Me(R) | single bond | H | c-Pr(1-Br) | Me | Cl | Me | O |
| D-14288 | Me(S) | single bond | H | c-Pr(1-Br) | Me | Cl | Me | O |
| D-14289 | H | single bond | Me | c-Pr(1-Br) | Me | Me | Me | O |
| D-14290 | Me | single bond | H | c-Pr(1-Br) | Me | Me | Me | O |
| D-14291 | Me(R) | single bond | H | c-Pr(1-Br) | Me | Me | Me | O |
| D-14292 | Me(S) | single bond | H | c-Pr(1-Br) | Me | Me | Me | O |
| D-14293 | H | single bond | Me | c-Pr(1-Me) | Me | Cl | Me | O |
| D-14294 | Me | single bond | H | c-Pr(1-Me) | Me | Cl | Me | O |
| D-14295 | Me(R) | single bond | H | c-Pr(1-Me) | Me | Cl | Me | O |
| D-14296 | Me(S) | single bond | H | c-Pr(1-Me) | Me | Cl | Me | O |
| D-14297 | H | single bond | Me | c-Pr(1-Me) | Me | Me | Me | O |
| D-14298 | Me | single bond | H | c-Pr(1-Me) | Me | Me | Me | O |
| D-14299 | Me(R) | single bond | H | c-Pr(1-Me) | Me | Me | Me | O |
| D-14300 | Me(S) | single bond | H | c-Pr(1-Me) | Me | Me | Me | O |
| D-14301 | H | single bond | Me | c-Pr(1-$CH_2$OH) | Me | Cl | Me | O |
| D-14302 | Me | single bond | H | c-Pr(1-$CH_2$OH) | Me | Cl | Me | O |
| D-14303 | Me(R) | single bond | H | c-Pr(1-$CH_2$OH) | Me | Cl | Me | O |
| D-14304 | Me(S) | single bond | H | c-Pr(1-$CH_2$OH) | Me | Cl | Me | O |
| D-14305 | H | single bond | Me | c-Pr(1-$CH_2$OH) | Me | Me | Me | O |
| D-14306 | Me | single bond | H | c-Pr(1-$CH_2$OH) | Me | Me | Me | O |
| D-14307 | Me(R) | single bond | H | c-Pr(1-$CH_2$OH) | Me | Me | Me | O |
| D-14308 | Me(S) | single bond | H | c-Pr(1-$CH_2$OH) | Me | Me | Me | O |
| D-14309 | H | single bond | Me | c-Pr[1-$CH_2$OS(=O)$_2$Me] | Me | Cl | Me | O |
| D-14310 | Me | single bond | H | c-Pr[1-$CH_2$OS(=O)$_2$Me] | Me | Cl | Me | O |
| D-14311 | Me(R) | single bond | H | c-Pr[1-$CH_2$OS(=O)$_2$Me] | Me | Cl | Me | O |
| D-14312 | Me(S) | single bond | H | c-Pr[1-$CH_2$OS(=O)$_2$Me] | Me | Cl | Me | O |
| D-14313 | H | single bond | Me | c-Pr[1-$CH_2$OS(=O)$_2$Me] | Me | Me | Me | O |
| D-14314 | Me | single bond | H | c-Pr[1-$CH_2$OS(=O)$_2$Me] | Me | Me | Me | O |
| D-14315 | Me(R) | single bond | H | c-Pr[1-$CH_2$OS(=O)$_2$Me] | Me | Me | Me | O |
| D-14316 | Me(S) | single bond | H | c-Pr[1-$CH_2$OS(=O)$_2$Me] | Me | Me | Me | O |
| D-14317 | H | single bond | Me | c-Pr(1-$CH_2$OMe) | Me | Cl | Me | O |
| D-14318 | Me | single bond | H | c-Pr(1-$CH_2$OMe) | Me | Cl | Me | O |

TABLE 972

| Compound Number | Y | W | Z | $R^1$ | $R^2$ | $R^3$ | $R^{10}$ | A |
|---|---|---|---|---|---|---|---|---|
| D-14319 | Me(R) | single bond | H | c-Pr(1-$CH_2$OMe) | Me | Cl | Me | O |
| D-14320 | Me(S) | single bond | H | c-Pr(1-$CH_2$OMe) | Me | Cl | Me | O |
| D-14321 | H | single bond | Me | c-Pr(1-$CH_2$OMe) | Me | Me | Me | O |
| D-14322 | Me | single bond | H | c-Pr(1-$CH_2$OMe) | Me | Me | Me | O |
| D-14323 | Me(R) | single bond | H | c-Pr(1-$CH_2$OMe) | Me | Me | Me | O |
| D-14324 | Me(S) | single bond | H | c-Pr(1-$CH_2$OMe) | Me | Me | Me | O |
| D-14325 | H | single bond | Me | c-Pr(1-$CH_2$OCN) | Me | Cl | Me | O |
| D-14326 | Me | single bond | H | c-Pr(1-$CH_2$OCN) | Me | Cl | Me | O |
| D-14327 | Me(R) | single bond | H | c-Pr(1-$CH_2$OCN) | Me | Cl | Me | O |
| D-14328 | Me(S) | single bond | H | c-Pr(1-$CH_2$OCN) | Me | Cl | Me | O |
| D-14329 | H | single bond | Me | c-Pr(1-$CH_2$OCN) | Me | Me | Me | O |
| D-14330 | Me | single bond | H | c-Pr(1-$CH_2$OCN) | Me | Me | Me | O |
| D-14331 | Me(R) | single bond | H | c-Pr(1-$CH_2$OCN) | Me | Me | Me | O |
| D-14332 | Me(S) | single bond | H | c-Pr(1-$CH_2$OCN) | Me | Me | Me | O |
| D-14333 | H | single bond | Me | c-Pr(1-$CH_2$SMe) | Me | C | Me | O |
| D-14334 | Me | single bond | H | c-Pr(1-$CH_2$SMe) | Me | Cl | Me | O |
| D-14335 | Me(R) | single bond | H | c-Pr(1-$CH_2$SMe) | Me | Cl | Me | O |
| D-14336 | Me(S) | single bond | H | c-Pr(1-$CH_2$SMe) | Me | Cl | Me | O |
| D-14337 | H | single bond | Me | c-Pr(1-$CH_2$SMe) | Me | Me | Me | O |
| D-14338 | Me | single bond | H | c-Pr(1-$CH_2$SMe) | Me | Me | Me | O |
| D-14339 | Me(R) | single bond | H | c-Pr(1-$CH_2$SMe) | Me | Me | Me | O |
| D-14340 | Me(S) | single bond | H | c-Pr(1-$CH_2$SMe) | Me | Me | Me | O |
| D-14341 | H | single bond | Me | c-Pr[1-$CH_2$S(=O)Me] | Me | Cl | Me | O |
| D-14342 | Me | single bond | H | c-Pr[1-$CH_2$S(=O)Me] | Me | Cl | Me | O |
| D-14343 | Me(R) | single bond | H | c-Pr[1-$CH_2$S(=O)Me] | Me | Cl | Me | O |
| D-14344 | Me(S) | single bond | H | c-Pr[1-$CH_2$S(=O)Me] | Me | Cl | Me | O |
| D-14345 | H | single bond | Me | c-Pr[1-$CH_2$S(=O)Me] | Me | Me | Me | O |
| D-14346 | Me | single bond | H | c-Pr[1-$CH_2$S(=O)Me] | Me | Me | Me | O |
| D-14347 | Me(R) | single bond | H | c-Pr[1-$CH_2$S(=O)Me] | Me | Me | Me | O |

TABLE 972-continued

| Compound Number | Y | W | Z | $R^1$ | $R^2$ | $R^3$ | $R^{10}$ | A |
|---|---|---|---|---|---|---|---|---|
| D-14348 | Me(S) | single bond | H | c-Pr[1-$CH_2S$(=O)Me] | Me | Me | Me | O |
| D-14349 | H | single bond | Me | c-Pr[1-$CH_2S(=O)_2$Me] | Me | Cl | Me | O |
| D-14350 | Me | single bond | H | c-Pr[1-$CH_2S(=O)_2$Me] | Me | Cl | Me | O |
| D-14351 | Me(R) | single bond | H | c-Pr[1-$CH_2S(=O)_2$Me] | Me | Cl | Me | O |
| D-14352 | Me(S) | single bond | H | c-Pr[1-$CH_2S(=O)_2$Me] | Me | Cl | Me | O |
| D-14353 | H | single bond | Me | c-Pr[1-$CH_2S(=O)_2$Me] | Me | Me | Me | O |
| D-14354 | Me | single bond | H | c-Pr[1-$CH_2S(=O)_2$Me] | Me | Me | Me | O |
| D-14355 | Me(R) | single bond | H | c-Pr[1-$CH_2S(=O)_2$Me] | Me | Me | Me | O |
| D-14356 | Me(S) | single bond | H | c-Pr[1-$CH_2S(=O)_2$Me] | Me | Me | Me | O |
| D-14357 | H | single bond | Me | c-Pr(1-$CH_2F$) | Me | Cl | Me | O |
| D-14358 | Me | single bond | H | c-Pr(1-$CH_2F$) | Me | Cl | Me | O |
| D-14359 | Me(R) | single bond | H | c-Pr(1-$CH_2F$) | Me | Cl | Me | O |
| D-14360 | Me(S) | single bond | H | c-Pr(1-$CH_2F$) | Me | Cl | Me | O |
| D-14361 | H | single bond | Me | c-Pr(1-$CH_2F$) | Me | Me | Me | O |
| D-14362 | Me | single bond | H | c-Pr(1-$CH_2F$) | Me | Me | Me | O |

TABLE 973

| Compound Number | Y | W | Z | $R^1$ | $R^2$ | $R^3$ | $R^{10}$ | A |
|---|---|---|---|---|---|---|---|---|
| D-14363 | Me(R) | single bond | H | c-Pr(1-$CNH_2F$) | Me | Me | Me | O |
| D-14364 | Me(S) | single bond | H | c-Pr(1-$CNH_2F$) | Me | Me | Me | O |
| D-14365 | H | single bond | Me | c-Pr(1-$CHF_2$) | Me | Cl | Me | O |
| D-14366 | Me | single bond | H | c-Pr(1-$CHF_2$) | Me | Cl | Me | O |
| D-14367 | Me(R) | single bond | H | c-Pr(1-$CHF_2$) | Me | Cl | Me | O |
| D-14368 | Me(S) | single bond | H | c-Pr(1-$CHF_2$) | Me | Cl | Me | O |
| D-14369 | H | single bond | Me | c-Pr(1-$CHF_2$) | Me | Me | Me | O |
| D-14370 | Me | single bond | H | c-Pr(1-$CHF_2$) | Me | Me | Me | O |
| D-14371 | Me(R) | single bond | H | c-Pr(1-$CHF_2$) | Me | Me | Me | O |
| D-14372 | Me(S) | single bond | H | c-Pr(1-$CHF_2$) | Me | Me | Me | O |
| D-14373 | H | single bond | Me | c-Pr(1-$CF_3$) | Me | Cl | Me | O |
| D-14374 | Me | single bond | H | c-Pr(1-$CF_3$) | Me | Cl | Me | O |
| D-14375 | Me(R) | single bond | H | c-Pr(1-$CF_3$) | Me | Cl | Me | O |
| D-14376 | Me(S) | single bond | H | c-Pr(1-$CF_3$) | Me | Cl | Me | O |
| D-14377 | H | single bond | Me | c-Pr(1-$CF_3$) | Me | Me | Me | O |
| D-14378 | Me | single bond | H | c-Pr(1-$CF_3$) | Me | Me | Me | O |
| D-14379 | Me(R) | single bond | H | c-Pr(1-$CF_3$) | Me | Me | Me | O |
| D-14380 | Me(S) | single bond | H | c-Pr(1-$CF_3$) | Me | Me | Me | O |
| D-14381 | H | single bond | Me | c-Pr(1-C≡CH) | Me | Cl | Me | O |
| D-14382 | Me | single bond | H | c-Pr(1-C≡CH) | Me | Cl | Me | O |
| D-14383 | Me(R) | single bond | H | c-Pr(1-C≡CH) | Me | Cl | Me | O |
| D-14384 | Me(S) | single bond | H | c-Pr(1-C≡CH) | Me | Cl | Me | O |
| D-14385 | H | single bond | Me | c-Pr(1-C≡CH) | Me | Me | Me | O |
| D-14386 | Me | single bond | H | c-Pr(1-C≡CH) | Me | Me | Me | O |
| D-14387 | Me(R) | single bond | H | c-Pr(1-C≡CH) | Me | Me | Me | O |
| D-14388 | Me(S) | single bond | H | c-Pr(1-C≡CH) | Me | Me | Me | O |
| D-14389 | H | single bond | Me | c-Pr[1-C(=O)OEt] | Me | Cl | Me | O |
| D-14390 | Me | single bond | H | c-Pr[1-C(=O)OEt] | Me | Cl | Me | O |
| D-14391 | Me(R) | single bond | H | c-Pr[1-C(=O)OEt] | Me | Cl | Me | O |
| D-14392 | Me(S) | single bond | H | c-Pr[1-C(=O)OEt] | Me | Cl | Me | O |
| D-14393 | H | single bond | Me | c-Pr[1-C(=O)OEt] | Me | Me | Me | O |
| D-14394 | Me | single bond | H | c-Pr[1-C(=O)OEt] | Me | Me | Me | O |
| D-14395 | Me(R) | single bond | H | c-Pr[1-C(=O)OEt] | Me | Me | Me | O |
| D-14396 | Me(S) | single bond | H | c-Pr[1-C(=O)OEt] | Me | Me | Me | O |
| D-14397 | H | single bond | Me | c-Pr[1-C(=O)OH] | Me | Cl | Me | O |
| D-14398 | Me | single bond | H | c-Pr[1-C(=O)OH] | Me | Cl | Me | O |
| D-14399 | Me(R) | single bond | H | c-Pr[1-C(=O)OH] | Me | Cl | Me | O |
| D-14400 | Me(S) | single bond | H | c-Pr[1-C(=O)OH] | Me | Cl | Me | O |
| D-14401 | H | single bond | Me | c-Pr[1-C(=O)OH] | Me | Me | Me | O |
| D-14402 | Me | single bond | H | c-Pr[1-C(=O)OH] | Me | Me | Me | O |
| D-14403 | Me(R) | single bond | H | c-Pr[1-C(=O)OH] | Me | Me | Me | O |
| D-14404 | Me(S) | single bond | H | c-Pr[1-C(=O)OH] | Me | Me | Me | O |
| D-14405 | H | single bond | Me | c-Pr[1-C(=O)$NNH_2$] | Me | Cl | Me | O |
| D-14406 | Me | single bond | H | c-Pr[1-C(=O)$NNH_2$] | Me | Cl | Me | O |

TABLE 974

| Compound Number | Y | W | Z | $R^1$ | $R^2$ | $R^3$ | $R^{10}$ | A |
|---|---|---|---|---|---|---|---|---|
| D-14407 | Me(R) | single bond | H | c-Pr[1-C(=O)NNH$_2$] | Me | Cl | Me | O |
| D-14408 | Me(S) | single bond | H | c-Pr[1-C(=O)NNH$_2$] | Me | Cl | Me | O |
| D-14409 | H | single bond | Me | c-Pr[1-C(=O)NNH$_2$] | Me | Me | Me | O |
| D-14410 | Me | single bond | H | c-Pr[1-C(=O)NNH$_2$] | Me | Me | Me | O |
| D-14411 | Me(R) | single bond | H | c-Pr[1-C(=O)NNH$_2$] | Me | Me | Me | O |
| D-14412 | Me(S) | single bond | H | c-Pr[1-C(=O)NNH$_2$] | Me | Me | Me | O |
| D-14413 | H | single bond | Me | c-Pr(1-OMe) | Me | Cl | Me | O |
| D-14414 | Me | single bond | H | c-Pr(1-OMe) | Me | Cl | Me | O |
| D-14415 | Me(R) | single bond | H | c-Pr(1-OMe) | Me | Cl | Me | O |
| D-14416 | Me(S) | single bond | H | c-Pr(1-OMe) | Me | Cl | Me | O |
| D-14417 | H | single bond | Me | c-Pr(1-OMe) | Me | Me | Me | O |
| D-14418 | Me | single bond | H | c-Pr(1-OMe) | Me | Me | Me | O |
| D-14419 | Me(R) | single bond | H | c-Pr(1-OMe) | Me | Me | Me | O |
| D-14420 | Me(S) | single bond | H | c-Pr(1-OMe) | Me | Me | Me | O |
| D-14421 | H | single bond | Me | c-Pr(1-SMe) | Me | Cl | Me | O |
| D-14422 | Me | single bond | H | c-Pr(1-SMe) | Me | Cl | Me | O |
| D-14423 | Me(R) | single bond | H | c-Pr(1-SMe) | Me | Cl | Me | O |
| D-14424 | Me(S) | single bond | H | c-Pr(1-SMe) | Me | Cl | Me | O |
| D-14425 | H | single bond | Me | c-Pr(1-SMe) | Me | Me | Me | O |
| D-14426 | Me | single bond | H | c-Pr(1-SMe) | Me | Me | Me | O |
| D-14427 | Me(R) | single bond | H | c-Pr(1-SMe) | Me | Me | Me | O |
| D-14428 | Me(S) | single bond | H | c-Pr(1-SMe) | Me | Me | Me | O |
| D-14429 | H | single bond | Me | c-Pr[1-S(=O)Me] | Me | Cl | Me | O |
| D-14430 | Me | single bond | H | c-Pr[1-S(=O)Me] | Me | Cl | Me | O |
| D-14431 | Me(R) | single bond | H | c-Pr[1-S(=O)Me] | Me | Cl | Me | O |
| D-14432 | Me(S) | single bond | H | c-Pr[1-S(=O)Me] | Me | Cl | Me | O |
| D-14433 | H | single bond | Me | c-Pr[1-S(=O)Me] | Me | Me | Me | O |
| D-14434 | Me | single bond | H | c-Pr[1-S(=O)Me] | Me | Me | Me | O |
| D-14435 | Me(R) | single bond | H | c-Pr[1-S(=O)Me] | Me | Me | Me | O |
| D-14436 | Me(S) | single bond | H | c-Pr[1-S(=O)Me] | Me | Me | Me | O |
| D-14437 | H | single bond | Me | c-Pr[1-S(=O)$_2$Me] | Me | Cl | Me | O |
| D-14438 | Me | single bond | H | c-Pr[1-S(=O)$_2$Me] | Me | Cl | Me | O |
| D-14439 | Me(R) | single bond | H | c-Pr[1-S(=O)$_2$Me] | Me | Cl | Me | O |
| D-14440 | Me(S) | single bond | H | c-Pr[1-S(=O)$_2$Me] | Me | Cl | Me | O |
| D-14441 | H | single bond | Me | c-Pr[1-S(=O)$_2$Me] | Me | Me | Me | O |
| D-14442 | Me | single bond | H | c-Pr[1-S(=O)$_2$Me] | Me | Me | Me | O |
| D-14443 | Me(R) | single bond | H | c-Pr[1-S(=O)$_2$Me] | Me | Me | Me | O |
| D-14444 | Me(S) | single bond | H | c-Pr[1-S(=O)$_2$Me] | Me | Me | Me | O |
| D-14445 | H | single bond | Me | c-Pr[1-S(=O)$_2$CHF$_2$] | Me | Cl | Me | O |
| D-14446 | Me | single bond | H | c-Pr[1-S(=O)$_2$CHF$_2$] | Me | Cl | Me | O |
| D-14447 | Me(R) | single bond | H | c-Pr[1-S(=O)$_2$CHF$_2$] | Me | Cl | Me | O |
| D-14448 | Me(S) | single bond | H | c-Pr[1-S(=O)$_2$CHF$_2$] | Me | Cl | Me | O |
| D-14449 | H | single bond | Me | c-Pr[1-S(=O)$_2$CHF$_2$] | Me | Me | Me | O |
| D-14450 | Me | single bond | H | c-Pr[1-S(=O)$_2$CHF$_2$] | Me | Me | Me | O |

TABLE 975

| Compound Number | Y | W | Z | $R^1$ | $R^2$ | $R^3$ | $R^{10}$ | A |
|---|---|---|---|---|---|---|---|---|
| D-14451 | Me(R) | single bond | H | c-Pr[1-S(=O)$_2$CHF$_2$] | Me | Me | Me | O |
| D-14452 | Me(S) | single bond | H | c-Pr[1-S(=O)$_2$CHF$_2$] | Me | Me | Me | O |
| D-14453 | H | single bond | Me | c-Pr[1-S(=O)$_2$CF$_3$] | Me | Cl | Me | O |
| D-14454 | Me | single bond | H | c-Pr[1-S(=O)$_2$CF$_3$] | Me | Cl | Me | O |
| D-14455 | Me(R) | single bond | H | c-Pr[1-S(=O)$_2$CF$_3$] | Me | Cl | Me | O |
| D-14456 | Me(S) | single bond | H | c-Pr[1-S(=O)$_2$CF$_3$] | Me | Cl | Me | O |
| D-14457 | H | single bond | Me | c-Pr[1-S(=O)$_2$CF$_3$] | Me | Me | Me | O |
| D-14458 | Me | single bond | H | c-Pr[1-S(=O)$_2$CF$_3$] | Me | Me | Me | O |
| D-14459 | Me(R) | single bond | H | c-Pr[1-S(=O)$_2$CF$_3$] | Me | Me | Me | O |
| D-14460 | Me(S) | single bond | H | c-Pr[1-S(=O)$_2$CF$_3$] | Me | Me | Me | O |
| D-14461 | H | single bond | Me | c-Pr[1-(5,6-dihydro-1,4,2-dioxazin-3-yl)] | Me | Cl | Me | O |
| D-14462 | Me | single bond | H | c-Pr[1-(5,6-dihydro-1,4,2-dioxazin-3-yl)] | Me | Cl | Me | O |
| D-14463 | Me(R) | single bond | H | c-Pr[1-(5,6-dihydro-1,4,2-dioxazin-3-yl)] | Me | Cl | Me | O |
| D-14464 | Me(S) | single bond | H | c-Pr[1-(5,6-dihydro-1,4,2-dioxazin-3-yl)] | Me | Cl | Me | O |
| D-14465 | H | single bond | Me | c-Pr[1-(5,6-dihydro-1,4,2-dioxazin-3-yl)] | Me | Me | Me | O |
| D-14466 | Me | single bond | H | c-Pr[1-(5,6-dihydro-1,4,2-dioxazin-3-yl)] | Me | Me | Me | O |
| D-14467 | Me(R) | single bond | H | c-Pr[1-(5,6-dihydro-1,4,2-dioxazin-3-yl)] | Me | Me | Me | O |
| D-14468 | Me(S) | single bond | H | c-Pr[1-(5,6-dihydro-1,4,2-dioxazin-3-yl)] | Me | Me | Me | O |
| D-14469 | H | single bond | Me | c-Pr[1-(5-hydroxy-1,3,4-oxadiazol-2-yl)] | Me | Cl | Me | O |
| D-14470 | Me | single bond | H | c-Pr[1-(5-hydroxy-1,3,4-oxadiazol-2-yl)] | Me | Cl | Me | O |
| D-14471 | Me(R) | single bond | H | c-Pr[1-(5-hydroxy-1,3,4-oxadiazol-2-yl)] | Me | Cl | Me | O |
| D-14472 | Me(S) | single bond | H | c-Pr[1-(5-hydroxy-1,3,4-oxadiazol-2-yl)] | Me | Cl | Me | O |
| D-14473 | H | single bond | Me | c-Pr[1-(5-hydroxy-1,3,4-oxadiazol-2-yl)] | Me | Me | Me | O |

TABLE 975-continued

| Compound Number | Y | W | Z | $R^1$ | $R^2$ | $R^3$ | $R^{10}$ | A |
|---|---|---|---|---|---|---|---|---|
| D-14474 | Me | single bond | H | c-Pr[1-(5-hydroxy-1,3,4-oxadiazol-2-yl)] | Me | Me | Me | O |
| D-14475 | Me(R) | single bond | H | c-Pr[1-(5-hydroxy-1,3,4-oxadiazol-2-yl)] | Me | Me | Me | O |
| D-14476 | Me(S) | single bond | H | c-Pr[1-(5-hydroxy-1,3,4-oxadiazol-2-yl)] | Me | Me | Me | O |
| D-14477 | H | single bond | Me | c-Pr[1-(pyrimidin-2-yl)] | Me | Cl | Me | O |
| D-14478 | Me | single bond | H | c-Pr[1-(pyrimidin-2-yl)] | Me | Cl | Me | O |
| D-14479 | Me(R) | single bond | H | c-Pr[1-(pyrimidin-2-yl)] | Me | Cl | Me | O |
| D-14480 | Me(S) | single bond | H | c-Pr[1-(pyrimidin-2-yl)] | Me | Cl | Me | O |
| D-14481 | H | single bond | Me | c-Pr[1-(pyrimidin-2-yl)] | Me | Me | Me | O |
| D-14482 | Me | single bond | H | c-Pr[1-(pyrimidin-2-yl)] | Me | Me | Me | O |
| D-14483 | Me(R) | single bond | H | c-Pr[1-(pyrimidin-2-yl)] | Me | Me | Me | O |
| D-14484 | Me(S) | single bond | H | c-Pr[1-(pyrimidin-2-yl)] | Me | Me | Me | O |
| D-14485 | H | single bond | Me | t-Bu | Me | Cl | Me | O |
| D-14486 | Me | single bond | H | t-Bu | Me | Cl | Me | O |
| D-14487 | Me(R) | single bond | H | t-Bu | Me | Cl | Me | O |
| D-14488 | Me(S) | single bond | H | t-Bu | Me | Cl | Me | O |
| D-14489 | H | single bond | Me | t-Bu | Me | Me | Me | O |
| D-14490 | Me | single bond | H | t-Bu | Me | Me | Me | O |
| D-14491 | Me(R) | single bond | H | t-Bu | Me | Me | Me | O |
| D-14492 | Me(S) | single bond | H | t-Bu | Me | Me | Me | O |
| D-14493 | H | single bond | Me | c-Bu | Me | Cl | Me | O |
| D-14494 | Me | single bond | H | c-Bu | Me | Cl | Me | O |

TABLE 976

| Compound Number | Y | W | Z | $R^1$ | $R^2$ | $R^3$ | $R^{10}$ | A |
|---|---|---|---|---|---|---|---|---|
| D-14495 | Me(R) | single bond | H | c-Bu | Me | Cl | Me | O |
| D-14496 | Me(S) | single bond | H | c-Bu | Me | Cl | Me | O |
| D-14497 | H | single bond | Me | c-Bu | Me | Me | Me | O |
| D-14498 | Me | single bond | H | c-Bu | Me | Me | Me | O |
| D-14499 | Me(R) | single bond | H | c-Bu | Me | Me | Me | O |
| D-14500 | Me(S) | single bond | H | c-Bu | Me | Me | Me | O |
| D-14501 | H | single bond | Me | c-Bu(1-CN) | Me | Cl | Me | O |
| D-14502 | Me | single bond | H | c-Bu(1-CN) | Me | Cl | Me | O |
| D-14503 | Me(R) | single bond | H | c-Bu(1-CN) | Me | Cl | Me | O |
| D-14504 | Me(S) | single bond | H | c-Bu(1-CN) | Me | Cl | Me | O |
| D-14505 | H | single bond | Me | c-Bu(1-CN) | Me | Me | Me | O |
| D-14506 | Me | single bond | H | c-Bu(1-CN) | Me | Me | Me | O |
| D-14507 | Me(R) | single bond | H | c-Bu(1-CN) | Me | Me | Me | O |
| D-14508 | Me(S) | single bond | H | c-Bu(1-CN) | Me | Me | Me | O |
| D-14509 | H | single bond | Me | c-Bu(3,3-$F_2$) | Me | Cl | Me | O |
| D-14510 | Me | single bond | H | c-Bu(3,3-$F_2$) | Me | Cl | Me | O |
| D-14511 | Me(R) | single bond | H | c-Bu(3,3-$F_2$) | Me | Cl | Me | O |
| D-14512 | Me(S) | single bond | H | c-Bu(3,3-$F_2$) | Me | Cl | Me | O |
| D-14513 | H | single bond | Me | c-Bu(3,3-$F_2$) | Me | Me | Me | O |
| D-14514 | Me | single bond | H | c-Bu(3,3-$F_2$) | Me | Me | Me | O |
| D-14515 | Me(R) | single bond | H | c-Bu(3,3-$F_2$) | Me | Me | Me | O |
| D-14516 | Me(S) | single bond | H | c-Bu(3,3-$F_2$) | Me | Me | Me | O |
| D-14517 | H | single bond | Me | oxetan-3-yl | Me | Cl | Me | O |
| D-14518 | Me | single bond | H | oxetan-3-yl | Me | Cl | Me | O |
| D-14519 | Me(R) | single bond | H | oxetan-3-yl | Me | Cl | Me | O |
| D-14520 | Me(S) | single bond | H | oxetan-3-yl | Me | Cl | Me | O |
| D-14521 | H | single bond | Me | oxetan-3-yl | Me | Me | Me | O |
| D-14522 | Me | single bond | H | oxetan-3-yl | Me | Me | Me | O |
| D-14523 | Me(R) | single bond | H | oxetan-3-yl | Me | Me | Me | O |
| D-14524 | Me(S) | single bond | H | oxetan-3-yl | Me | Me | Me | O |
| D-14525 | H | single bond | Me | oxetan(3-CN)-3-yl | Me | Cl | Me | O |
| D-14526 | Me | single bond | H | oxetan(3-CN)-3-yl | Me | Cl | Me | O |
| D-14527 | Me(R) | single bond | H | oxetan(3-CN)-3-yl | Me | Cl | Me | O |
| D-14528 | Me(S) | single bond | H | oxetan(3-CN)-3-yl | Me | Cl | Me | O |
| D-14529 | H | single bond | Me | oxetan(3-CN)-3-yl | Me | Me | Me | O |
| D-14530 | Me | single bond | H | oxetan(3-CN)-3-yl | Me | Me | Me | O |
| D-14531 | Me(R) | single bond | H | oxetan(3-CN)-3-yl | Me | Me | Me | O |
| D-14532 | Me(S) | single bond | H | oxetan(3-CN)-3-yl | Me | Me | Me | O |
| D-14533 | H | single bond | Me | azetidin[1-C(=O)Me]-3-yl | Me | Cl | Me | O |
| D-14534 | Me | single bond | H | azetidin[1-C(=O)Me]-3-yl | Me | Cl | Me | O |
| D-14535 | Me(R) | single bond | H | azetidin[1-C(=O)Me]-3-yl | Me | Cl | Me | O |
| D-14536 | Me(S) | single bond | H | azetidin[1-C(=O)Me]-3-yl | Me | Cl | Me | O |
| D-14537 | H | single bond | Me | azetidin[1-C(=O)Me]-3-yl | Me | Me | Me | O |
| D-14538 | Me | single bond | H | azetidin[1-C(=O)Me]-3-yl | Me | Me | Me | O |

TABLE 977

| Compound Number | Y | W | Z | $R^1$ | $R^2$ | $R^3$ | $R^{10}$ | A |
|---|---|---|---|---|---|---|---|---|
| D-14539 | Me(R) | single bond | H | azetidin[1-C(=O)Me]-3-yl | Me | Me | Me | O |
| D-14540 | Me(S) | single bond | H | azetidin[1-C(=O)Me]-3-yl | Me | Me | Me | O |
| D-14541 | H | single bond | Me | azetidin[1-S(=O)$_2$Me]-3-yl | Me | Cl | Me | O |
| D-14542 | Me | single bond | H | azetidin[1-S(=O)$_2$Me]-3-yl | Me | Cl | Me | O |
| D-14543 | Me(R) | single bond | H | azetidin[1-S(=O)$_2$Me]-3-yl | Me | Cl | Me | O |
| D-14544 | Me(S) | single bond | H | azetidin[1-S(=O)$_2$Me]-3-yl | Me | Cl | Me | O |
| D-14545 | H | single bond | Me | azetidin[1-S(=O)$_2$Me]-3-yl | Me | Me | Me | O |
| D-14546 | Me | single bond | H | azetidin[1-S(=O)$_2$Me]-3-yl | Me | Me | Me | O |
| D-14547 | Me(R) | single bond | H | azetidin[1-S(=O)$_2$Me]-3-yl | Me | Me | Me | O |
| D-14548 | Me(S) | single bond | H | azetidin[1-S(=O)$_2$Me]-3-yl | Me | Me | Me | O |
| D-14549 | H | single bond | Me | azetidin[1-S(=O)$_2$CHF$_2$]-3-yl | Me | Cl | Me | O |
| D-14550 | Me | single bond | H | azetidin[1-S(=O)$_2$CHF$_2$]-3-yl | Me | Cl | Me | O |
| D-14551 | Me(R) | single bond | H | azetidin[1-S(=O)$_2$CHF$_2$]-3-yl | Me | Cl | Me | O |
| D-14552 | Me(S) | single bond | H | azetidin[1-S(=O)$_2$CHF$_2$]-3-yl | Me | Cl | Me | O |
| D-14553 | H | single bond | Me | azetidin[1-S(=O)$_2$CHF$_2$]-3-yl | Me | Me | Me | O |
| D-14554 | Me | single bond | H | azetidin[1-S(=O)$_2$CHF$_2$]-3-yl | Me | Me | Me | O |
| D-14555 | Me(R) | single bond | H | azetidin[1-S(=O)$_2$CHF$_2$]-3-yl | Me | Me | Me | O |
| D-14556 | Me(S) | single bond | H | azetidin[1-S(=O)$_2$CHF$_2$]-3-yl | Me | Me | Me | O |
| D-14557 | H | single bond | Me | c-Pen | Me | Cl | Me | O |
| D-14558 | Me | single bond | H | c-Pen | Me | Cl | Me | O |
| D-14559 | Me(R) | single bond | H | c-Pen | Me | Cl | Me | O |
| D-14560 | Me(S) | single bond | H | c-Pen | Me | Cl | Me | O |
| D-14561 | H | single bond | Me | c-Pen | Me | Me | Me | O |
| D-14562 | Me | single bond | H | c-Pen | Me | Me | Me | O |
| D-14563 | Me(R) | single bond | H | c-Pen | Me | Me | Me | O |
| D-14564 | Me(S) | single bond | H | c-Pen | Me | Me | Me | O |
| D-14565 | H | single bond | Me | tetrahydrofuran-3-yl | Me | Cl | Me | O |
| D-14566 | Me | single bond | H | tetrahydrofuran-3-yl | Me | Cl | Me | O |
| D-14567 | Me(R) | single bond | H | tetrahydrofuran-3-yl | Me | Cl | Me | O |
| D-14568 | Me(S) | single bond | H | tetrahydrofuran-3-yl | Me | Cl | Me | O |
| D-14569 | H | single bond | Me | tetrahydrofuran-3-yl | Me | Me | Me | O |
| D-14570 | Me | single bond | H | tetrahydrofuran-3-yl | Me | Me | Me | O |
| D-14571 | Me(R) | single bond | H | tetrahydrofuran-3-yl | Me | Me | Me | O |
| D-14572 | Me(S) | single bond | H | tetrahydrofuran-3-yl | Me | Me | Me | O |
| D-14573 | H | single bond | Me | tetrahydrothiophen-3-yl | Me | Cl | Me | O |
| D-14574 | Me | single bond | H | tetrahydrothiophen-3-yl | Me | Cl | Me | O |
| D-14575 | Me(R) | single bond | H | tetrahydrothiophen-3-yl | Me | Cl | Me | O |
| D-14576 | Me(S) | single bond | H | tetrahydrothiophen-3-yl | Me | Cl | Me | O |
| D-14577 | H | single bond | Me | tetrahydrothiophen-3-yl | Me | Me | Me | O |
| D-14578 | Me | single bond | H | tetrahydrothiophen-3-yl | Me | Me | Me | O |
| D-14579 | Me(R) | single bond | H | tetrahydrothiophen-3-yl | Me | Me | Me | O |
| D-14580 | Me(S) | single bond | H | tetrahydrothiophen-3-yl | Me | Me | Me | O |
| D-14581 | H | single bond | Me | c-Pen(1-CN) | Me | Cl | Me | O |
| D-14582 | Me | single bond | H | c-Pen(1-CN) | Me | Cl | Me | O |

TABLE 978

| Compound Number | Y | W | Z | $R^1$ | $R^2$ | $R^3$ | $R^{10}$ | A |
|---|---|---|---|---|---|---|---|---|
| D-14583 | Me(R) | single bond | H | c-Pen(1-CN) | Me | Cl | Me | O |
| D-14584 | Me(S) | single bond | H | c-Pen(1-CN) | Me | Cl | Me | O |
| D-14585 | H | single bond | Me | c-Pen(1-CN) | Me | Me | Me | O |
| D-14586 | Me | single bond | H | c-Pen(1-CN) | Me | Me | Me | O |
| D-14587 | Me(R) | single bond | H | c-Pen(1-CN) | Me | Me | Me | O |
| D-14588 | Me(S) | single bond | H | c-Pen(1-CN) | Me | Me | Me | O |
| D-14589 | H | single bond | Me | tetrahydrofuran(3-CN)-3-yl | Me | Cl | Me | O |
| D-14590 | Me | single bond | H | tetrahydrofuran(3-CN)-3-yl | Me | Cl | Me | O |
| D-14591 | Me(R) | single bond | H | tetrahydrofuran(3-CN)-3-yl | Me | Cl | Me | O |
| D-14592 | Me(S) | single bond | H | tetrahydrofuran(3-CN)-3-yl | Me | Cl | Me | O |
| D-14593 | H | single bond | Me | tetrahydrofuran(3-CN)-3-yl | Me | Me | Me | O |
| D-14594 | Me | single bond | H | tetrahydrofuran(3-CN)-3-yl | Me | Me | Me | O |
| D-14595 | Me(R) | single bond | H | tetrahydrofuran(3-CN)-3-yl | Me | Me | Me | O |
| D-14596 | Me(S) | single bond | H | tetrahydrofuran(3-CN)-3-yl | Me | Me | Me | O |
| D-14597 | H | single bond | Me | tetrahydrothiophen(3-CN)-3-yl | Me | Cl | Me | O |
| D-14598 | Me | single bond | H | tetrahydrothiophen(3-CN)-3-yl | Me | Cl | Me | O |
| D-14599 | Me(R) | single bond | H | tetrahydrothiophen(3-CN)-3-yl | Me | Cl | Me | O |
| D-14600 | Me(S) | single bond | H | tetrahydrothiophen(3-CN)-3-yl | Me | Cl | Me | O |
| D-14601 | H | single bond | Me | tetrahydrothiophen(3-CN)-3-yl | Me | Me | Me | O |
| D-14602 | Me | single bond | H | tetrahydrothiophen(3-CN)-3-yl | Me | Me | Me | O |
| D-14603 | Me(R) | single bond | H | tetrahydrothiophen(3-CN)-3-yl | Me | Me | Me | O |

TABLE 978-continued

| Compound Number | Y | W | Z | $R^1$ | $R^2$ | $R^3$ | $R^{10}$ | A |
|---|---|---|---|---|---|---|---|---|
| D-14604 | Me(S) | single bond | H | tetrahydrothiophen(3-CN)-3-yl | Me | Me | Me | O |
| D-14605 | H | single bond | Me | bicyclo[1.1.1]pentan-1-yl | Me | Cl | Me | O |
| D-14606 | Me | single bond | H | bicyclo[1.1.1]pentan-1-yl | Me | Cl | Me | O |
| D-14607 | Me(R) | single bond | H | bicyclo[1.1.1]pentan-1-yl | Me | Cl | Me | O |
| D-14608 | Me(S) | single bond | H | bicyclo[1.1.1]pentan-1-yl | Me | Cl | Me | O |
| D-14609 | H | single bond | Me | bicyclo[1.1.1]pentan-1-yl | Me | Me | Me | O |
| D-14610 | Me | single bond | H | bicyclo[1.1.1]pentan-1-yl | Me | Me | Me | O |
| D-14611 | Me(R) | single bond | H | bicyclo[1.1.1]pentan-1-yl | Me | Me | Me | O |
| D-14612 | Me(S) | single bond | H | bicyclo[1.1.1]pentan-1-yl | Me | Me | Me | O |
| D-14613 | H | single bond | Me | c-Hex | Me | Cl | Me | O |
| D-14614 | Me | single bond | H | c-Hex | Me | Cl | Me | O |
| D-14615 | Me(R) | single bond | H | c-Hex | Me | Cl | Me | O |
| D-14616 | Me(S) | single bond | H | c-Hex | Me | Cl | Me | O |
| D-14617 | H | single bond | Me | c-Hex | Me | Me | Me | O |
| D-14618 | Me | single bond | H | c-Hex | Me | Me | Me | O |
| D-14619 | Me(R) | single bond | H | c-Hex | Me | Me | Me | O |
| D-14620 | Me(S) | single bond | H | c-Hex | Me | Me | Me | O |
| D-14621 | H | single bond | Me | tetrahydropyran-4-yl | Me | Cl | Me | O |
| D-14622 | Me | single bond | H | tetrahydropyran-4-yl | Me | Cl | Me | O |
| D-14623 | Me(R) | single bond | H | tetrahydropyran-4-yl | Me | Cl | Me | O |
| D-14624 | Me(S) | single bond | H | tetrahydropyran-4-yl | Me | Cl | Me | O |
| D-14625 | H | single bond | Me | tetrahydropyran-4-yl | Me | Me | Me | O |
| D-14626 | Me | single bond | H | tetrahydropyran-4-yl | Me | Me | Me | O |

TABLE 979

| Compound Number | Y | W | Z | $R^1$ | $R^2$ | $R^3$ | $R^{10}$ | A |
|---|---|---|---|---|---|---|---|---|
| D-14627 | Me(R) | single bond | H | tetrahydropyran-4-yl | Me | Me | Me | O |
| D-14628 | Me(S) | single bond | H | tetrahydropyran-4-yl | Me | Me | Me | O |
| D-14629 | H | single bond | Me | tetrahydrothiopyran-4-yl | Me | Cl | Me | O |
| D-14630 | Me | single bond | H | tetrahydrothiopyran-4-yl | Me | Cl | Me | O |
| D-14631 | Me(R) | single bond | H | tetrahydrothiopyran-4-yl | Me | Cl | Me | O |
| D-14632 | Me(S) | single bond | H | tetrahydrothiopyran-4-yl | Me | Cl | Me | O |
| D-14633 | H | single bond | Me | tetrahydrothiopyran-4-yl | Me | Me | Me | O |
| D-14634 | Me | single bond | H | tetrahydrothiopyran-4-yl | Me | Me | Me | O |
| D-14635 | Me(R) | single bond | H | tetrahydrothiopyran-4-yl | Me | Me | Me | O |
| D-14636 | Me(S) | single bond | H | tetrahydrothiopyran-4-yl | Me | Me | Me | O |
| D-14637 | H | single bond | Me | c-Hex(1-CN) | Me | Cl | Me | O |
| D-14638 | Me | single bond | H | c-Hex(1-CN) | Me | Cl | Me | O |
| D-14639 | Me(R) | single bond | H | c-Hex(1-CN) | Me | Cl | Me | O |
| D-14640 | Me(S) | single bond | H | c-Hex(1-CN) | Me | Cl | Me | O |
| D-14641 | H | single bond | Me | c-Hex(1-CN) | Me | Me | Me | O |
| D-14642 | Me | single bond | H | c-Hex(1-CN) | Me | Me | Me | O |
| D-14643 | Me(R) | single bond | H | c-Hex(1-CN) | Me | Me | Me | O |
| D-14644 | Me(S) | single bond | H | c-Hex(1-CN) | Me | Me | Me | O |
| D-14645 | H | single bond | Me | tetrahydropyran(4-CN)-4-yl | Me | Cl | Me | O |
| D-14646 | Me | single bond | H | tetrahydropyran(4-CN)-4-yl | Me | Cl | Me | O |
| D-14647 | Me(R) | single bond | H | tetrahydropyran(4-CN)-4-yl | Me | Cl | Me | O |
| D-14648 | Me(S) | single bond | H | tetrahydropyran(4-CN)-4-yl | Me | Cl | Me | O |
| D-14649 | H | single bond | Me | tetrahydropyran(4-CN)-4-yl | Me | Me | Me | O |
| D-14650 | Me | single bond | H | tetrahydropyran(4-CN)-4-yl | Me | Me | Me | O |
| D-14651 | Me(R) | single bond | H | tetrahydropyran(4-CN)-4-yl | Me | Me | Me | O |
| D-14652 | Me(S) | single bond | H | tetrahydropyran(4-CN)-4-yl | Me | Me | Me | O |
| D-14653 | H | single bond | Me | tetrahydrothiopyran(4-CN)-4-yl | Me | Cl | Me | O |
| D-14654 | Me | single bond | H | tetrahydrothiopyran(4-CN)-4-yl | Me | Cl | Me | O |
| D-14655 | Me(R) | single bond | H | tetrahydrothiopyran(4-CN)-4-yl | Me | Cl | Me | O |
| D-14656 | Me(S) | single bond | H | tetrahydrothiopyran(4-CN)-4-yl | Me | Cl | Me | O |
| D-14657 | H | single bond | Me | tetrahydrothiopyran(4-CN)-4-yl | Me | Me | Me | O |
| D-14658 | Me | single bond | H | tetrahydrothiopyran(4-CN)-4-yl | Me | Me | Me | O |
| D-14659 | Me(R) | single bond | H | tetrahydrothiopyran(4-CN)-4-yl | Me | Me | Me | O |
| D-14660 | Me(S) | single bond | H | tetrahydrothiopyran(4-CN)-4-yl | Me | Me | Me | O |
| D-14661 | H | single bond | Me | $CNH_2$(c-Pr) | Me | Cl | Me | O |
| D-14662 | Me | single bond | H | $CNH_2$(c-Pr) | Me | Cl | Me | O |
| D-14663 | Me(R) | single bond | H | $CNH_2$(c-Pr) | Me | Cl | Me | O |
| D-14664 | Me(S) | single bond | H | $CNH_2$(c-Pr) | Me | Cl | Me | O |
| D-14665 | H | single bond | Me | $CNH_2$(c-Pr) | Me | Me | Me | O |
| D-14666 | Me | single bond | H | $CNH_2$(c-Pr) | Me | Me | Me | O |
| D-14667 | Me(R) | single bond | H | $CNH_2$(c-Pr) | Me | Me | Me | O |
| D-14668 | Me(S) | single bond | H | $CNH_2$(c-Pr) | Me | Me | Me | O |

TABLE 979-continued

| Compound Number | Y | W | Z | $R^1$ | $R^2$ | $R^3$ | $R^{10}$ | A |
|---|---|---|---|---|---|---|---|---|
| D-14669 | H | single bond | Me | $CNH_2$[c-Pr(1-CN)] | Me | Cl | Me | O |
| D-14670 | Me | single bond | H | $CNH_2$[c-Pr(1-CN)] | Me | Cl | Me | O |

TABLE 980

| Compound Number | Y | W | Z | $R^1$ | $R^2$ | $R^3$ | $R^{10}$ | A |
|---|---|---|---|---|---|---|---|---|
| D-14671 | Me(R) | single bond | H | $CNH_2$[c-Pr(1-CN)] | Me | Cl | Me | O |
| D-14672 | Me(S) | single bond | H | $CNH_2$[c-Pr(1-CN)] | Me | Cl | Me | O |
| D-14673 | H | single bond | Me | $CNH_2$[c-Pr(1-CN)] | Me | Me | Me | O |
| D-14674 | Me | single bond | H | $CNH_2$[c-Pr(1-CN)] | Me | Me | Me | O |
| D-14675 | Me(R) | single bond | H | $CNH_2$[c-Pr(1-CN)] | Me | Me | Me | O |
| D-14676 | Me(S) | single bond | H | $CNH_2$[c-Pr(1-CN)] | Me | Me | Me | O |
| D-14677 | H | single bond | Me | CH(Me)(c-Pr) | Me | Cl | Me | O |
| D-14678 | Me | single bond | H | CH(Me)(c-Pr) | Me | Cl | Me | O |
| D-14679 | Me(R) | single bond | H | CH(Me)(c-Pr) | Me | Cl | Me | O |
| D-14680 | Me(S) | single bond | H | CH(Me)(c-Pr) | Me | Cl | Me | O |
| D-14681 | H | single bond | Me | CH(Me)(c-Pr) | Me | Me | Me | O |
| D-14682 | Me | single bond | H | CH(Me)(c-Pr) | Me | Me | Me | O |
| D-14683 | Me(R) | single bond | H | CH(Me)(c-Pr) | Me | Me | Me | O |
| D-14684 | Me(S) | single bond | H | CH(Me)(c-Pr) | Me | Me | Me | O |
| D-14685 | H | single bond | Me | CH(Me)$CNH_2$OMe | Me | Cl | Me | O |
| D-14686 | Me | single bond | H | CH(Me)$CNH_2$OMe | Me | Cl | Me | O |
| D-14687 | Me(R) | single bond | H | CH(Me)$CNH_2$OMe | Me | Cl | Me | O |
| D-14688 | Me(S) | single bond | H | CH(Me)$CNH_2$OMe | Me | Cl | Me | O |
| D-14689 | H | single bond | Me | CH(Me)$CNH_2$OMe | Me | Me | Me | O |
| D-14690 | Me | single bond | H | CH(Me)$CNH_2$OMe | Me | Me | Me | O |
| D-14691 | Me(R) | single bond | H | CH(Me)$CNH_2$OMe | Me | Me | Me | O |
| D-14692 | Me(S) | single bond | H | CH(Me)$CNH_2$OMe | Me | Me | Me | O |
| D-14693 | H | single bond | Me | $CNH_2CH{=}CNH_2$ | Me | Cl | Me | O |
| D-14694 | Me | single bond | H | $CNH_2CH{=}CNH_2$ | Me | Cl | Me | O |
| D-14695 | Me(R) | single bond | H | $CNH_2CH{=}CNH_2$ | Me | Cl | Me | O |
| D-14696 | Me(S) | single bond | H | $CNH_2CH{=}CNH_2$ | Me | Cl | Me | O |
| D-14697 | H | single bond | Me | $CNH_2CH{=}CNH_2$ | Me | Me | Me | O |
| D-14698 | Me | single bond | H | $CNH_2CH{=}CNH_2$ | Me | Me | Me | O |
| D-14699 | Me(R) | single bond | H | $CNH_2CH{=}CNH_2$ | Me | Me | Me | O |
| D-14700 | Me(S) | single bond | H | $CNH_2CH{=}CNH_2$ | Me | Me | Me | O |
| D-14701 | H | single bond | Me | $CNH_2C{\equiv}CH$ | Me | Cl | Me | O |
| D-14702 | Me | single bond | H | $CNH_2C{\equiv}CH$ | Me | Cl | Me | O |
| D-14703 | Me(R) | single bond | H | $CNH_2C{\equiv}CH$ | Me | Cl | Me | O |
| D-14704 | Me(S) | single bond | H | $CNH_2C{\equiv}CH$ | Me | Cl | Me | O |
| D-14705 | H | single bond | Me | $CNH_2C{\equiv}CH$ | Me | Me | Me | O |
| D-14706 | Me | single bond | H | $CNH_2C{\equiv}CH$ | Me | Me | Me | O |
| D-14707 | Me(R) | single bond | H | $CNH_2C{\equiv}CH$ | Me | Me | Me | O |
| D-14708 | Me(S) | single bond | H | $CNH_2C{\equiv}CH$ | Me | Me | Me | O |
| D-14709 | H | single bond | Me | $CNH_2CN$ | Me | Cl | Me | O |
| D-14710 | Me | single bond | H | $CNH_2CN$ | Me | Cl | Me | O |
| D-14711 | Me(R) | single bond | H | $CNH_2CN$ | Me | Cl | Me | O |
| D-14712 | Me(S) | single bond | H | $CNH_2CN$ | Me | Cl | Me | O |
| D-14713 | H | single bond | Me | $CNH_2CN$ | Me | Me | Me | O |
| D-14714 | Me | single bond | H | $CNH_2CN$ | Me | Me | Me | O |

TABLE 981

| Compound Number | Y | W | Z | $R^1$ | $R^2$ | $R^3$ | $R^{10}$ | A |
|---|---|---|---|---|---|---|---|---|
| D-14715 | Me(R) | single bond | H | $CNH_2CN$ | Me | Me | Me | O |
| D-14716 | Me(S) | single bond | H | $CNH_2CN$ | Me | Me | Me | O |
| D-14717 | H | single bond | Me | CH(Me)CN | Me | Cl | Me | O |
| D-14718 | Me | single bond | H | CH(Me)CN | Me | Cl | Me | O |
| D-14719 | Me(R) | single bond | H | CH(Me)CN | Me | Cl | Me | O |
| D-14720 | Me(S) | single bond | H | CH(Me)CN | Me | Cl | Me | O |
| D-14721 | H | single bond | Me | CH(Me)CN | Me | Me | Me | O |
| D-14722 | Me | single bond | H | CH(Me)CN | Me | Me | Me | O |
| D-14723 | Me(R) | single bond | H | CH(Me)CN | Me | Me | Me | O |
| D-14724 | Me(S) | single bond | H | CH(Me)CN | Me | Me | Me | O |
| D-14725 | H | single bond | Me | $C(Me)_2CN$ | Me | Cl | Me | O |
| D-14726 | Me | single bond | H | $C(Me)_2CN$ | Me | Cl | Me | O |

TABLE 981-continued

| Compound Number | Y | W | Z | $R^1$ | $R^2$ | $R^3$ | $R^{10}$ | A |
|---|---|---|---|---|---|---|---|---|
| D-14727 | Me(R) | single bond | H | $C(Me)_2CN$ | Me | Cl | Me | O |
| D-14728 | Me(S) | single bond | H | $C(Me)_2CN$ | Me | Cl | Me | O |
| D-14729 | H | single bond | Me | $C(Me)_2CN$ | Me | Me | Me | O |
| D-14730 | Me | single bond | H | $C(Me)_2CN$ | Me | Me | Me | O |
| D-14731 | Me(R) | single bond | H | $C(Me)_2CN$ | Me | Me | Me | O |
| D-14732 | Me(S) | single bond | H | $C(Me)_2CN$ | Me | Me | Me | O |
| D-14733 | H | single bond | Me | C(Me)(i-Pr)CN | Me | Cl | Me | O |
| D-14734 | Me | single bond | H | C(Me)(i-Pr)CN | Me | Cl | Me | O |
| D-14735 | Me(R) | single bond | H | C(Me)(i-Pr)CN | Me | Cl | Me | O |
| D-14736 | Me(S) | single bond | H | C(Me)(i-Pr)CN | Me | Cl | Me | O |
| D-14737 | H | single bond | Me | C(Me)(i-Pr)CN | Me | Me | Me | O |
| D-14738 | Me | single bond | H | C(Me)(i-Pr)CN | Me | Me | Me | O |
| D-14739 | Me(R) | single bond | H | C(Me)(i-Pr)CN | Me | Me | Me | O |
| D-14740 | Me(S) | single bond | H | C(Me)(i-Pr)CN | Me | Me | Me | O |
| D-14741 | H | single bond | Me | OMe | Me | Cl | Me | O |
| D-14742 | Me | single bond | H | OMe | Me | C | Me | O |
| D-14743 | Me(R) | single bond | H | OMe | Me | Cl | Me | O |
| D-14744 | Me(S) | single bond | H | OMe | Me | Cl | Me | O |
| D-14745 | H | single bond | Me | OMe | Me | Me | Me | O |
| D-14746 | Me | single bond | H | OMe | Me | Me | Me | O |
| D-14747 | Me(R) | single bond | H | OMe | Me | Me | Me | O |
| D-14748 | Me(S) | single bond | H | OMe | Me | Me | Me | O |
| D-14749 | H | single bond | Me | CH=NOMe | Me | Cl | Me | O |
| D-14750 | Me | single bond | H | CH=NOMe | Me | Cl | Me | O |
| D-14751 | Me(R) | single bond | H | CH=NOMe | Me | Cl | Me | O |
| D-14752 | Me(S) | single bond | H | CH=NOMe | Me | Cl | Me | O |
| D-14753 | H | single bond | Me | CH=NOMe | Me | Me | Me | O |
| D-14754 | Me | single bond | H | CH=NOMe | Me | Me | Me | O |
| D-14755 | Me(R) | single bond | H | CH=NOMe | Me | Me | Me | O |
| D-14756 | Me(S) | single bond | H | CH=NOMe | Me | Me | Me | O |
| D-14757 | H | single bond | Me | morpholin-4-yl | Me | Cl | Me | O |
| D-14758 | Me | single bond | H | morpholin-4-yl | Me | Cl | Me | O |

TABLE 982

| Compound Number | Y | W | Z | $R^1$ | $R^2$ | $R^3$ | $R^{10}$ | A |
|---|---|---|---|---|---|---|---|---|
| D-14759 | Me(R) | single bond | H | morpholin-4-yl | Me | Cl | Me | O |
| D-14760 | Me(S) | single bond | H | morpholin-4-yl | Me | Cl | Me | O |
| D-14761 | H | single bond | Me | morpholin-4-yl | Me | Me | Me | O |
| D-14762 | Me | single bond | H | morpholin-4-yl | Me | Me | Me | O |
| D-14763 | Me(R) | single bond | H | morpholin-4-yl | Me | Me | Me | O |
| D-14764 | Me(S) | single bond | H | morpholin-4-yl | Me | Me | Me | O |
| D-14765 | H | single bond | Me | Ph | Me | Cl | Me | O |
| D-14766 | Me | single bond | H | Ph | Me | Cl | Me | O |
| D-14767 | Me(R) | single bond | H | Ph | Me | Cl | Me | O |
| D-14768 | Me(S) | single bond | H | Ph | Me | Cl | Me | O |
| D-14769 | H | single bond | Me | Ph | Me | Me | Me | O |
| D-14770 | Me | single bond | H | Ph | Me | Me | Me | O |
| D-14771 | Me(R) | single bond | H | Ph | Me | Me | Me | O |
| D-14772 | Me(S) | single bond | H | Ph | Me | Me | Me | O |
| D-14773 | H | single bond | Me | $CNH_2Ph$ | Me | Cl | Me | O |
| D-14774 | Me | single bond | H | $CNH_2Ph$ | Me | Cl | Me | O |
| D-14775 | Me(R) | single bond | H | $CNH_2Ph$ | Me | Cl | Me | O |
| D-14776 | Me(S) | single bond | H | $CNH_2Ph$ | Me | Cl | Me | O |
| D-14777 | H | single bond | Me | $CNH_2Ph$ | Me | Me | Me | O |
| D-14778 | Me | single bond | H | $CNH_2Ph$ | Me | Me | Me | O |
| D-14779 | Me(R) | single bond | H | $CNH_2Ph$ | Me | Me | Me | O |
| D-14780 | Me(S) | single bond | H | $CNH_2Ph$ | Me | Me | Me | O |
| D-14781 | H | single bond | Me | thiazole-2-yl | Me | Cl | Me | O |
| D-14782 | Me | single bond | H | thiazole-2-yl | Me | Cl | Me | O |
| D-14783 | Me(R) | single bond | H | thiazole-2-yl | Me | Cl | Me | O |
| D-14784 | Me(S) | single bond | H | thiazole-2-yl | Me | Cl | Me | O |
| D-14785 | H | single bond | Me | thiazole-2-yl | Me | Me | Me | O |
| D-14786 | Me | single bond | H | thiazole-2-yl | Me | Me | Me | O |
| D-14787 | Me(R) | single bond | H | thiazole-2-yl | Me | Me | Me | O |
| D-14788 | Me(S) | single bond | H | thiazole-2-yl | Me | Me | Me | O |
| D-14789 | H | single bond | Me | 1-Me-pyrazol-3-yl | Me | Cl | Me | O |
| D-14790 | Me | single bond | H | 1-Me-pyrazol-3-yl | Me | Cl | Me | O |
| D-14791 | Me(R) | single bond | H | 1-Me-pyrazol-3-yl | Me | Cl | Me | O |
| D-14792 | Me(S) | single bond | H | 1-Me-pyrazol-3-yl | Me | Cl | Me | O |
| D-14793 | H | single bond | Me | 1-Me-pyrazol-3-yl | Me | Me | Me | O |

TABLE 982-continued

| Compound Number | Y | W | Z | $R^1$ | $R^2$ | $R^3$ | $R^{10}$ | A |
|---|---|---|---|---|---|---|---|---|
| D-14794 | Me | single bond | H | 1-Me-pyrazol-3-yl | Me | Me | Me | O |
| D-14795 | Me(R) | single bond | H | 1-Me-pyrazol-3-yl | Me | Me | Me | O |
| D-14796 | Me(S) | single bond | H | 1-Me-pyrazol-3-yl | Me | Me | Me | O |
| D-14797 | H | single bond | Me | 1-Me-pyrazol-5-yl | Me | Cl | Me | O |
| D-14798 | Me | single bond | H | 1-Me-pyrazol-5-yl | Me | Cl | Me | O |
| D-14799 | Me(R) | single bond | H | 1-Me-pyrazol-5-yl | Me | Cl | Me | O |
| D-14800 | Me(S) | single bond | H | 1-Me-pyrazol-5-yl | Me | Cl | Me | O |
| D-14801 | H | single bond | Me | 1-Me-pyrazol-5-yl | Me | Me | Me | O |
| D-14802 | Me | single bond | H | 1-Me-pyrazol-5-yl | Me | Me | Me | O |

TABLE 983

| Compound Number | Y | W | Z | $R^1$ | $R^2$ | $R^3$ | $R^{10}$ | A |
|---|---|---|---|---|---|---|---|---|
| D-14803 | Me(R) | single bond | H | 1-Me-pyrazol-5-yl | Me | Me | Me | O |
| D-14804 | Me(S) | single bond | H | 1-Me-pyrazol-5-yl | Me | Me | Me | O |
| D-14805 | H | single bond | Me | $CNH_2$(pyrimidin-2-yl) | Me | Cl | Me | O |
| D-14806 | Me | single bond | H | $CNH_2$(pyrimidin-2-yl) | Me | Cl | Me | O |
| D-14807 | Me(R) | single bond | H | $CNH_2$(pyrimidin-2-yl) | Me | Cl | Me | O |
| D-14808 | Me(S) | single bond | H | $CNH_2$(pyrimidin-2-yl) | Me | Cl | Me | O |
| D-14809 | H | single bond | Me | $CNH_2$(pyrimidin-2-yl) | Me | Me | Me | O |
| D-14810 | Me | single bond | H | $CNH_2$(pyrimidin-2-yl) | Me | Me | Me | O |
| D-14811 | Me(R) | single bond | H | $CNH_2$(pyrimidin-2-yl) | Me | Me | Me | O |
| D-14812 | Me(S) | single bond | H | $CNH_2$(pyrimidin-2-yl) | Me | Me | Me | O |
| D-14813 | H | single bond | Me | Me | Me | Cl | $CNH_2OMe$ | O |
| D-14814 | Me | single bond | H | Me | Me | Cl | $CNH_2OMe$ | O |
| D-14815 | Me(R) | single bond | H | Me | Me | Cl | $CNH_2OMe$ | O |
| D-14816 | Me(S) | single bond | H | Me | Me | Cl | $CNH_2OMe$ | O |
| D-14817 | H | single bond | Me | Me | Me | Me | $CNH_2OMe$ | O |
| D-14818 | Me | single bond | H | Me | Me | Me | $CNH_2OMe$ | O |
| D-14819 | Me(R) | single bond | H | Me | Me | Me | $CNH_2OMe$ | O |
| D-14820 | Me(S) | single bond | H | Me | Me | Me | $CNH_2OMe$ | O |
| D-14821 | H | single bond | Me | $CNH_2CHF_2$ | Me | Cl | $CNH_2OMe$ | O |
| D-14822 | Me | single bond | H | $CNH_2CHF_2$ | Me | Cl | $CNH_2OMe$ | O |
| D-14823 | Me(R) | single bond | H | $CNH_2CHF_2$ | Me | Cl | $CNH_2OMe$ | O |
| D-14824 | Me(S) | single bond | H | $CNH_2CHF_2$ | Me | Cl | $CNH_2OMe$ | O |
| D-14825 | H | single bond | Me | $CNH_2CHF_2$ | Me | Me | $CNH_2OMe$ | O |
| D-14826 | Me | single bond | H | $CNH_2CHF_2$ | Me | Me | $CNH_2OMe$ | O |
| D-14827 | Me(R) | single bond | H | $CNH_2CHF_2$ | Me | Me | $CNH_2OMe$ | O |
| D-14828 | Me(S) | single bond | H | $CNH_2CHF_2$ | Me | Me | $CNH_2OMe$ | O |
| D-14829 | H | single bond | Me | n-Pr | Me | Cl | $CNH_2OMe$ | O |
| D-14830 | Me | single bond | H | n-Pr | Me | Cl | $CNH_2OMe$ | O |
| D-14831 | Me(R) | single bond | H | n-Pr | Me | Cl | $CNH_2OMe$ | O |
| D-14832 | Me(S) | single bond | H | n-Pr | Me | Cl | $CNH_2OMe$ | O |
| D-14833 | H | single bond | Me | n-Pr | Me | Me | $CNH_2OMe$ | O |
| D-14834 | Me | single bond | H | n-Pr | Me | Me | $CNH_2OMe$ | O |
| D-14835 | Me(R) | single bond | H | n-Pr | Me | Me | $CNH_2OMe$ | O |
| D-14836 | Me(S) | single bond | H | n-Pr | Me | Me | $CNH_2OMe$ | O |
| D-14837 | H | single bond | Me | i-Pr | Me | Cl | $CNH_2OMe$ | O |
| D-14838 | Me | single bond | H | i-Pr | Me | Cl | $CNH_2OMe$ | O |
| D-14839 | Me(R) | single bond | H | i-Pr | Me | Cl | $CNH_2OMe$ | O |
| D-14840 | Me(S) | single bond | H | i-Pr | Me | Cl | $CNH_2OMe$ | O |
| D-14841 | H | single bond | Me | i-Pr | Me | Me | $CNH_2OMe$ | O |
| D-14842 | Me | single bond | H | i-Pr | Me | Me | $CNH_2OMe$ | O |
| D-14843 | Me(R) | single bond | H | i-Pr | Me | Me | $CNH_2OMe$ | O |
| D-14844 | Me(S) | single bond | H | i-Pr | Me | Me | $CNH_2OMe$ | O |
| D-14845 | H | single bond | Me | c-Pr(1-F) | Me | Cl | $CNH_2OMe$ | O |
| D-14846 | Me | single bond | H | c-Pr(1-F) | Me | Cl | $CNH_2OMe$ | O |

TABLE 984

| Compound Number | Y | W | Z | $R^1$ | $R^2$ | $R^3$ | $R^{10}$ | A |
|---|---|---|---|---|---|---|---|---|
| D-14847 | Me(R) | single bond | H | c-Pr(1-F) | Me | Cl | $CNH_2OMe$ | O |
| D-14848 | Me(S) | single bond | H | c-Pr(1-F) | Me | Cl | $CNH_2OMe$ | O |
| D-14849 | H | single bond | Me | c-Pr(1-F) | Me | Me | $CNH_2OMe$ | O |

TABLE 984-continued

| Compound Number | Y | W | Z | $R^1$ | $R^2$ | $R^3$ | $R^{10}$ | A |
|---|---|---|---|---|---|---|---|---|
| D-14850 | Me | single bond | H | c-Pr(1-F) | Me | Me | $CNH_2OMe$ | O |
| D-14851 | Me(R) | single bond | H | c-Pr(1-F) | Me | Me | $CNH_2OMe$ | O |
| D-14852 | Me(S) | single bond | H | c-Pr(1-F) | Me | Me | $CNH_2OMe$ | O |
| D-14853 | H | single bond | Me | c-Pr(2,2-$F_2$) | Me | Cl | $CNH_2OMe$ | O |
| D-14854 | Me | single bond | H | c-Pr(2,2-$F_2$) | Me | Cl | $CNH_2OMe$ | O |
| D-14855 | Me(R) | single bond | H | c-Pr(2,2-$F_2$) | Me | Cl | $CNH_2OMe$ | O |
| D-14856 | Me(S) | single bond | H | c-Pr(2,2-$F_2$) | Me | Cl | $CNH_2OMe$ | O |
| D-14857 | H | single bond | Me | c-Pr(2,2-$F_2$) | Me | Me | $CNH_2OMe$ | O |
| D-14858 | Me | single bond | H | c-Pr(2,2-$F_2$) | Me | Me | $CNH_2OMe$ | O |
| D-14859 | Me(R) | single bond | H | c-Pr(2,2-$F_2$) | Me | Me | $CNH_2OMe$ | O |
| D-14860 | Me(S) | single bond | H | c-Pr(2,2-$F_2$) | Me | Me | $CNH_2OMe$ | O |
| D-14861 | H | single bond | Me | c-Pr(1-Cl) | Me | Cl | $CNH_2OMe$ | O |
| D-14862 | Me | single bond | H | c-Pr(1-Cl) | Me | Cl | $CNH_2OMe$ | O |
| D-14863 | Me(R) | single bond | H | c-Pr(1-Cl) | Me | Cl | $CNH_2OMe$ | O |
| D-14864 | Me(S) | single bond | H | c-Pr(1-Cl) | Me | Cl | $CNH_2OMe$ | O |
| D-14865 | H | single bond | Me | c-Pr(1-Cl) | Me | Me | $CNH_2OMe$ | O |
| D-14866 | Me | single bond | H | c-Pr(1-Cl) | Me | Me | $CNH_2OMe$ | O |
| D-14867 | Me(R) | single bond | H | c-Pr(1-Cl) | Me | Me | $CNH_2OMe$ | O |
| D-14868 | Me(S) | single bond | H | c-Pr(1-Cl) | Me | Me | $CNH_2OMe$ | O |
| D-14869 | H | single bond | Me | c-Pr(1-Br) | Me | Cl | $CNH_2OMe$ | O |
| D-14870 | Me | single bond | H | c-Pr(1-Br) | Me | Cl | $CNH_2OMe$ | O |
| D-14871 | Me(R) | single bond | H | c-Pr(1-Br) | Me | Cl | $CNH_2OMe$ | O |
| D-14872 | Me(S) | single bond | H | c-Pr(1-Br) | Me | Cl | $CNH_2OMe$ | O |
| D-14873 | H | single bond | Me | c-Pr(1-Br) | Me | Me | $CNH_2OMe$ | O |
| D-14874 | Me | single bond | H | c-Pr(1-Br) | Me | Me | $CNH_2OMe$ | O |
| D-14875 | Me(R) | single bond | H | c-Pr(1-Br) | Me | Me | $CNH_2OMe$ | O |
| D-14876 | Me(S) | single bond | H | c-Pr(1-Br) | Me | Me | $CNH_2OMe$ | O |
| D-14877 | H | single bond | Me | c-Pr(1-Me) | Me | Cl | $CNH_2OMe$ | O |
| D-14878 | Me | single bond | H | c-Pr(1-Me) | Me | Cl | $CNH_2OMe$ | O |
| D-14879 | Me(R) | single bond | H | c-Pr(1-Me) | Me | Cl | $CNH_2OMe$ | O |
| D-14880 | Me(S) | single bond | H | c-Pr(1-Me) | Me | Cl | $CNH_2OMe$ | O |
| D-14881 | H | single bond | Me | c-Pr(1-Me) | Me | Me | $CNH_2OMe$ | O |
| D-14882 | Me | single bond | H | c-Pr(1-Me) | Me | Me | $CNH_2OMe$ | O |
| D-14883 | Me(R) | single bond | H | c-Pr(1-Me) | Me | Me | $CNH_2OMe$ | O |
| D-14884 | Me(S) | single bond | H | c-Pr(1-Me) | Me | Me | $CNH_2OMe$ | O |
| D-14885 | H | single bond | Me | c-Pr(1-$CNH_2OH$) | Me | Cl | $CNH_2OMe$ | O |
| D-14886 | Me | single bond | H | c-Pr(1-$CNH_2OH$) | Me | Cl | $CNH_2OMe$ | O |
| D-14887 | Me(R) | single bond | H | c-Pr(1-$CNH_2OH$) | Me | Cl | $CNH_2OMe$ | O |
| D-14888 | Me(S) | single bond | H | c-Pr(1-$CNH_2OH$) | Me | Cl | $CNH_2OMe$ | O |
| D-14889 | H | single bond | Me | c-Pr(1-$CNH_2OH$) | Me | Me | $CNH_2OMe$ | O |
| D-14890 | Me | single bond | H | c-Pr(1-$CNH_2OH$) | Me | Me | $CNH_2OMe$ | O |

TABLE 985

| Compound Number | Y | W | Z | $R^1$ | $R^2$ | $R^3$ | $R^{10}$ | A |
|---|---|---|---|---|---|---|---|---|
| D-14891 | Me(R) | single bond | H | c-Pr(1-$CNH_2OH$) | Me | Me | $CNH_2OMe$ | O |
| D-14892 | Me(S) | single bond | H | c-Pr(1-$CNH_2OH$) | Me | Me | $CNH_2OMe$ | O |
| D-14893 | H | single bond | Me | c-Pr[1-$CNH_2OS(=O)_2Me$] | Me | Cl | $CNH_2OMe$ | O |
| D-14894 | Me | single bond | H | c-Pr[1-$CNH_2OS(=O)_2Me$] | Me | Cl | $CNH_2OMe$ | O |
| D-14895 | Me(R) | single bond | H | c-Pr[1-$CNH_2OS(=O)_2Me$] | Me | Cl | $CNH_2OMe$ | O |
| D-14896 | Me(S) | single bond | H | c-Pr[1-$CNH_2OS(=O)_2Me$] | Me | Cl | $CNH_2OMe$ | O |
| D-14897 | H | single bond | Me | c-Pr[1-$CNH_2OS(=O)_2Me$] | Me | Me | $CNH_2OMe$ | O |
| D-14898 | Me | single bond | H | c-Pr[1-$CNH_2OS(=O)_2Me$] | Me | Me | $CNH_2OMe$ | O |
| D-14899 | Me(R) | single bond | H | c-Pr[1-$CNH_2OS(=O)_2Me$] | Me | Me | $CNH_2OMe$ | O |
| D-14900 | Me(S) | single bond | H | c-Pr[1-$CNH_2OS(=O)_2Me$] | Me | Me | $CNH_2OMe$ | O |
| D-14901 | H | single bond | Me | c-Pr(1-$CNH_2OMe$) | Me | Cl | $CNH_2OMe$ | O |
| D-14902 | Me | single bond | H | c-Pr(1-$CNH_2OMe$) | Me | Cl | $CNH_2OMe$ | O |
| D-14903 | Me(R) | single bond | H | c-Pr(1-$CNH_2OMe$) | Me | Cl | $CNH_2OMe$ | O |
| D-14904 | Me(S) | single bond | H | c-Pr(1-$CNH_2OMe$) | Me | Cl | $CNH_2OMe$ | O |
| D-14905 | H | single bond | Me | c-Pr(1-$CNH_2OMe$) | Me | Me | $CNH_2OMe$ | O |
| D-14906 | Me | single bond | H | c-Pr(1-$CNH_2OMe$) | Me | Me | $CNH_2OMe$ | O |
| D-14907 | Me(R) | single bond | H | c-Pr(1-$CNH_2OMe$) | Me | Me | $CNH_2OMe$ | O |
| D-14908 | Me(S) | single bond | H | c-Pr(1-$CNH_2OMe$) | Me | Me | $CNH_2OMe$ | O |
| D-14909 | H | single bond | Me | c-Pr(1-$CNH_2OCN$) | Me | Cl | $CNH_2OMe$ | O |
| D-14910 | Me | single bond | H | c-Pr(1-$CNH_2OCN$) | Me | Cl | $CNH_2OMe$ | O |
| D-14911 | Me(R) | single bond | H | c-Pr(1-$CNH_2OCN$) | Me | Cl | $CNH_2OMe$ | O |
| D-14912 | Me(S) | single bond | H | c-Pr(1-$CNH_2OCN$) | Me | Cl | $CNH_2OMe$ | O |
| D-14913 | H | single bond | Me | c-Pr(1-$CNH_2OCN$) | Me | Me | $CNH_2OMe$ | O |
| D-14914 | Me | single bond | H | c-Pr(1-$CNH_2OCN$) | Me | Me | $CNH_2OMe$ | O |
| D-14915 | Me(R) | single bond | H | c-Pr(1-$CNH_2OCN$) | Me | Me | $CNH_2OMe$ | O |
| D-14916 | Me(S) | single bond | H | c-Pr(1-$CNH_2OCN$) | Me | Me | $CNH_2OMe$ | O |

TABLE 985-continued

| Compound Number | Y | W | Z | $R^1$ | $R^2$ | $R^3$ | $R^{10}$ | A |
|---|---|---|---|---|---|---|---|---|
| D-14917 | H | single bond | Me | c-Pr(1-$CNH_2$SMe) | Me | Cl | $CNH_2$OMe | O |
| D-14918 | Me | single bond | H | c-Pr(1-$CNH_2$SMe) | Me | Cl | $CNH_2$OMe | O |
| D-14919 | Me(R) | single bond | H | c-Pr(1-$CNH_2$SMe) | Me | Cl | $CNH_2$OMe | O |
| D-14920 | Me(S) | single bond | H | c-Pr(1-$CNH_2$SMe) | Me | Cl | $CNH_2$OMe | O |
| D-14921 | H | single bond | Me | c-Pr(1-$CNH_2$SMe) | Me | Me | $CNH_2$OMe | O |
| D-14922 | Me | single bond | H | c-Pr(1-$CNH_2$SMe) | Me | Me | $CNH_2$OMe | O |
| D-14923 | Me(R) | single bond | H | c-Pr(1-$CNH_2$SMe) | Me | Me | $CNH_2$OMe | O |
| D-14924 | Me(S) | single bond | H | c-Pr(1-$CNH_2$SMe) | Me | Me | $CNH_2$OMe | O |
| D-14925 | H | single bond | Me | c-Pr[1-$CNH_2$S(=O)Me] | Me | Cl | $CNH_2$OMe | O |
| D-14926 | Me | single bond | H | c-Pr[1-$CNH_2$S(=O)Me] | Me | Cl | $CNH_2$OMe | O |
| D-14927 | Me(R) | single bond | H | c-Pr[1-$CNH_2$S(=O)Me] | Me | Cl | $CNH_2$OMe | O |
| D-14928 | Me(S) | single bond | H | c-Pr[1-$CNH_2$S(=O)Me] | Me | Cl | $CNH_2$OMe | O |
| D-14929 | H | single bond | Me | c-Pr[1-$CNH_2$S(=O)Me] | Me | Me | $CNH_2$OMe | O |
| D-14930 | Me | single bond | H | c-Pr[1-$CNH_2$S(=O)Me] | Me | Me | $CNH_2$OMe | O |
| D-14931 | Me(R) | single bond | H | c-Pr[1-$CNH_2$S(=O)Me] | Me | Me | $CNH_2$OMe | O |
| D-14932 | Me(S) | single bond | H | c-Pr[1-$CNH_2$S(=O)Me] | Me | Me | $CNH_2$OMe | O |
| D-14933 | H | single bond | Me | c-Pr[1-$CNH_2$S(=O)$_2$Me] | Me | Cl | $CNH_2$OMe | O |
| D-14934 | Me | single bond | H | c-Pr[1-$CNH_2$S(=O)$_2$Me] | Me | Cl | $CNH_2$OMe | O |

TABLE 986

| Compound Number | Y | W | Z | $R^1$ | $R^2$ | $R^3$ | $R^{10}$ | A |
|---|---|---|---|---|---|---|---|---|
| D-14935 | Me(R) | single bond | H | c-Pr[1-$CNH_2$S(=O)$_2$Me] | Me | Cl | $CNH_2$OMe | O |
| D-14936 | Me(S) | single bond | H | c-Pr[1-$CNH_2$S(=O)$_2$Me] | Me | Cl | $CNH_2$OMe | O |
| D-14937 | H | single bond | Me | c-Pr[1-$CNH_2$S(=O)$_2$Me] | Me | Me | $CNH_2$OMe | O |
| D-14938 | Me | single bond | H | c-Pr[1-$CNH_2$S(=O)$_2$Me] | Me | Me | $CNH_2$OMe | O |
| D-14939 | Me(R) | single bond | H | c-Pr[1-$CNH_2$S(=O)$_2$Me] | Me | Me | $CNH_2$OMe | O |
| D-14940 | Me(S) | single bond | H | c-Pr[1-$CNH_2$S(=O)$_2$Me] | Me | Me | $CNH_2$OMe | O |
| D-14941 | H | single bond | Me | c-Pr(1-$CNH_2$F) | Me | Cl | $CNH_2$OMe | O |
| D-14942 | Me | single bond | H | c-Pr(1-$CNH_2$F) | Me | Cl | $CNH_2$OMe | O |
| D-14943 | Me(R) | single bond | H | c-Pr(1-$CNH_2$F) | Me | Cl | $CNH_2$OMe | O |
| D-14944 | Me(S) | single bond | H | c-Pr(1-$CNH_2$F) | Me | Cl | $CNH_2$OMe | O |
| D-14945 | H | single bond | Me | c-Pr(1-$CNH_2$F) | Me | Me | $CNH_2$OMe | O |
| D-14946 | Me | single bond | H | c-Pr(1-$CNH_2$F) | Me | Me | $CNH_2$OMe | O |
| D-14947 | Me(R) | single bond | H | c-Pr(1-$CNH_2$F) | Me | Me | $CNH_2$OMe | O |
| D-14948 | Me(S) | single bond | H | c-Pr(1-$CNH_2$F) | Me | Me | $CNH_2$OMe | O |
| D-14949 | H | single bond | Me | c-Pr(1-$CHF_2$) | Me | Cl | $CNH_2$OMe | O |
| D-14950 | Me | single bond | H | c-Pr(1-$CHF_2$) | Me | Cl | $CNH_2$OMe | O |
| D-14951 | Me(R) | single bond | H | c-Pr(1-$CHF_2$) | Me | Cl | $CNH_2$OMe | O |
| D-14952 | Me(S) | single bond | H | c-Pr(1-$CHF_2$) | Me | Cl | $CNH_2$OMe | O |
| D-14953 | H | single bond | Me | c-Pr(1-$CHF_2$) | Me | Me | $CNH_2$OMe | O |
| D-14954 | Me | single bond | H | c-Pr(1-$CHF_2$) | Me | Me | $CNH_2$OMe | O |
| D-14955 | Me(R) | single bond | H | c-Pr(1-$CHF_2$) | Me | Me | $CNH_2$OMe | O |
| D-14956 | Me(S) | single bond | H | c-Pr(1-$CHF_2$) | Me | Me | $CNH_2$OMe | O |
| D-14957 | H | single bond | Me | c-Pr(1-$CF_3$) | Me | Cl | $CNH_2$OMe | O |
| D-14958 | Me | single bond | H | c-Pr(1-$CF_3$) | Me | Cl | $CNH_2$OMe | O |
| D-14959 | Me(R) | single bond | H | c-Pr(1-$CF_3$) | Me | Cl | $CNH_2$OMe | O |
| D-14960 | Me(S) | single bond | H | c-Pr(1-$CF_3$) | Me | Cl | $CNH_2$OMe | O |
| D-14961 | H | single bond | Me | c-Pr(1-$CF_3$) | Me | Me | $CNH_2$OMe | O |
| D-14962 | Me | single bond | H | c-Pr(1-$CF_3$) | Me | Me | $CNH_2$OMe | O |
| D-14963 | Me(R) | single bond | H | c-Pr(1-$CF_3$) | Me | Me | $CNH_2$OMe | O |
| D-14964 | Me(S) | single bond | H | c-Pr(1-$CF_3$) | Me | Me | $CNH_2$OMe | O |
| D-14965 | H | single bond | Me | c-Pr(1-C≡CH) | Me | Cl | $CNH_2$OMe | O |
| D-14966 | Me | single bond | H | c-Pr(1-C≡CH) | Me | Cl | $CNH_2$OMe | O |
| D-14967 | Me(R) | single bond | H | c-Pr(1-C≡CH) | Me | Cl | $CNH_2$OMe | O |
| D-14968 | Me(S) | single bond | H | c-Pr(1-C≡CH) | Me | Cl | $CNH_2$OMe | O |
| D-14969 | H | single bond | Me | c-Pr(1-C≡CH) | Me | Me | $CNH_2$OMe | O |
| D-14970 | Me | single bond | H | c-Pr(1-C≡CH) | Me | Me | $CNH_2$OMe | O |
| D-14971 | Me(R) | single bond | H | c-Pr(1-C≡CH) | Me | Me | $CNH_2$OMe | O |
| D-14972 | Me(S) | single bond | H | c-Pr(1-C≡CH) | Me | Me | $CNH_2$OMe | O |
| D-14973 | H | single bond | Me | c-Pr[1-C(=O)OEt] | Me | Cl | $CNH_2$OMe | O |
| D-14974 | Me | single bond | H | c-Pr[1-C(=O)OEt] | Me | Cl | $CNH_2$OMe | O |
| D-14975 | Me(R) | single bond | H | c-Pr[1-C(=O)OEt] | Me | Cl | $CNH_2$OMe | O |
| D-14976 | Me(S) | single bond | H | c-Pr[1-C(=O)OEt] | Me | Cl | $CNH_2$OMe | O |
| D-14977 | H | single bond | Me | c-Pr[1-C(=O)OEt] | Me | Me | $CNH_2$OMe | O |
| D-14978 | Me | single bond | H | c-Pr[1-C(=O)OEt] | Me | Me | $CNH_2$OMe | O |

TABLE 987

| Compound Number | Y | W | Z | $R^1$ | $R^2$ | $R^3$ | $R^{10}$ | A |
|---|---|---|---|---|---|---|---|---|
| D-14979 | Me(R) | single bond | H | c-Pr[1-C(═O)OEt] | Me | Me | $CNH_2OMe$ | O |
| D-14980 | Me(S) | single bond | H | c-Pr[1-C(═O)OEt] | Me | Me | $CNH_2OMe$ | O |
| D-14981 | H | single bond | Me | c-Pr[1-C(═O)OH] | Me | Cl | $CNH_2OMe$ | O |
| D-14982 | Me | single bond | H | c-Pr[1-C(═O)OH] | Me | Cl | $CNH_2OMe$ | O |
| D-14983 | Me(R) | single bond | H | c-Pr[1-C(═O)OH] | Me | Cl | $CNH_2OMe$ | O |
| D-14984 | Me(S) | single bond | H | c-Pr[1-C(═O)OH] | Me | Cl | $CNH_2OMe$ | O |
| D-14985 | H | single bond | Me | c-Pr[1-C(═O)OH] | Me | Me | $CNH_2OMe$ | O |
| D-14986 | Me | single bond | H | c-Pr[1-C(═O)OH] | Me | Me | $CNH_2OMe$ | O |
| D-14987 | Me(R) | single bond | H | c-Pr[1-C(═O)OH] | Me | Me | $CNH_2OMe$ | O |
| D-14988 | Me(S) | single bond | H | c-Pr[1-C(═O)OH] | Me | Me | $CNH_2OMe$ | O |
| D-14989 | H | single bond | Me | c-Pr[1-C(═O)$NNH_2$] | Me | Cl | $CNH_2OMe$ | O |
| D-14990 | Me | single bond | H | c-Pr[1-C(═O)$NNH_2$] | Me | Cl | $CNH_2OMe$ | O |
| D-14991 | Me(R) | single bond | H | c-Pr[1-C(═O)$NNH_2$] | Me | Cl | $CNH_2OMe$ | O |
| D-14992 | Me(S) | single bond | H | c-Pr[1-C(═O)$NNH_2$] | Me | Cl | $CNH_2OMe$ | O |
| D-14993 | H | single bond | Me | c-Pr[1-C(═O)$NNH_2$] | Me | Me | $CNH_2OMe$ | O |
| D-14994 | Me | single bond | H | c-Pr[1-C(═O)$NNH_2$] | Me | Me | $CNH_2OMe$ | O |
| D-14995 | Me(R) | single bond | H | c-Pr[1-C(═O)$NNH_2$] | Me | Me | $CNH_2OMe$ | O |
| D-14996 | Me(S) | single bond | H | c-Pr[1-C(═O)$NNH_2$] | Me | Me | $CNH_2OMe$ | O |
| D-14997 | H | single bond | Me | c-Pr(1-OMe) | Me | Cl | $CNH_2OMe$ | O |
| D-14998 | Me | single bond | H | c-Pr(1-OMe) | Me | Cl | $CNH_2OMe$ | O |
| D-14999 | Me(R) | single bond | H | c-Pr(1-OMe) | Me | Cl | $CNH_2OMe$ | O |
| D-15000 | Me(S) | single bond | H | c-Pr(1-OMe) | Me | Cl | $CNH_2OMe$ | O |
| D-15001 | H | single bond | Me | c-Pr(1-OMe) | Me | Me | $CNH_2OMe$ | O |
| D-15002 | Me | single bond | H | c-Pr(1-OMe) | Me | Me | $CNH_2OMe$ | O |
| D-15003 | Me(R) | single bond | H | c-Pr(1-OMe) | Me | Me | $CNH_2OMe$ | O |
| D-15004 | Me(S) | single bond | H | c-Pr(1-OMe) | Me | Me | $CNH_2OMe$ | O |
| D-15005 | H | single bond | Me | c-Pr(1-SMe) | Me | Cl | $CNH_2OMe$ | O |
| D-15006 | Me | single bond | H | c-Pr(1-SMe) | Me | Cl | $CNH_2OMe$ | O |
| D-15007 | Me(R) | single bond | H | c-Pr(1-SMe) | Me | Cl | $CNH_2OMe$ | O |
| D-15008 | Me(S) | single bond | H | c-Pr(1-SMe) | Me | Cl | $CNH_2OMe$ | O |
| D-15009 | H | single bond | Me | c-Pr(1-SMe) | Me | Me | $CNH_2OMe$ | O |
| D-15010 | Me | single bond | H | c-Pr(1-SMe) | Me | Me | $CNH_2OMe$ | O |
| D-15011 | Me(R) | single bond | H | c-Pr(1-SMe) | Me | Me | $CNH_2OMe$ | O |
| D-15012 | Me(S) | single bond | H | c-Pr(1-SMe) | Me | Me | $CNH_2OMe$ | O |
| D-15013 | H | single bond | Me | c-Pr[1-S(═O)Me] | Me | Cl | $CNH_2OMe$ | O |
| D-15014 | Me | single bond | H | c-Pr[1-S(═O)Me] | Me | Cl | $CNH_2OMe$ | O |
| D-15015 | Me(R) | single bond | H | c-Pr[1-S(═O)Me] | Me | Cl | $CNH_2OMe$ | O |
| D-15016 | Me(S) | single bond | H | c-Pr[1-S(═O)Me] | Me | Cl | $CNH_2OMe$ | O |
| D-15017 | H | single bond | Me | c-Pr[1-S(═O)Me] | Me | Me | $CNH_2OMe$ | O |
| D-15018 | Me | single bond | H | c-Pr[1-S(═O)Me] | Me | Me | $CNH_2OMe$ | O |
| D-15019 | Me(R) | single bond | H | c-Pr[1-S(═O)Me] | Me | Me | $CNH_2OMe$ | O |
| D-15020 | Me(S) | single bond | H | c-Pr[1-S(═O)Me] | Me | Me | $CNH_2OMe$ | O |
| D-15021 | H | single bond | Me | c-Pr[1-S(═O)$_2$Me] | Me | Cl | $CNH_2OMe$ | O |
| D-15022 | Me | single bond | H | c-Pr[1-S(═O)$_2$Me] | Me | Cl | $CNH_2OMe$ | O |

TABLE 988

| Compound Number | Y | W | Z | $R^1$ | $R^2$ | $R^3$ | $R^{10}$ | A |
|---|---|---|---|---|---|---|---|---|
| D-15023 | Me(R) | single bond | H | c-Pr[1-S(═O)$_2$Me] | Me | Cl | $CH_2OMe$ | O |
| D-15024 | Me(S) | single bond | H | c-Pr[1-S(═O)$_2$Me] | Me | Cl | $CH_2OMe$ | O |
| D-15025 | H | single bond | Me | c-Pr[1-S(═O)$_2$Me] | Me | Me | $CH_2OMe$ | O |
| D-15026 | Me | single bond | H | c-Pr[1-S(═O)$_2$Me] | Me | Me | $CH_2OMe$ | O |
| D-15027 | Me(R) | single bond | H | c-Pr[1-S(═O)$_2$Me] | Me | Me | $CH_2OMe$ | O |
| D-15028 | Me(S) | single bond | H | c-Pr[1-S(═O)$_2$Me] | Me | Me | $CH_2OMe$ | O |
| D-15029 | H | single bond | Me | c-Pr[1-S(═O)$_2$$CHF_2$] | Me | Cl | $CH_2OMe$ | O |
| D-15030 | Me | single bond | H | c-Pr[1-S(═O)$_2$$CHF_2$] | Me | Cl | $CH_2OMe$ | O |
| D-15031 | Me(R) | single bond | H | c-Pr[1-S(═O)$_2$$CHF_2$] | Me | Cl | $CH_2OMe$ | O |
| D-15032 | Me(S) | single bond | H | c-Pr[1-S(═O)$_2$$CHF_2$] | Me | Cl | $CH_2OMe$ | O |
| D-15033 | H | single bond | Me | c-Pr[1-S(═O)$_2$$CHF_2$] | Me | Me | $CH_2OMe$ | O |
| D-15034 | Me | single bond | H | c-Pr[1-S(═O)$_2$$CHF_2$] | Me | Me | $CH_2OMe$ | O |
| D-15035 | Me(R) | single bond | H | c-Pr[1-S(═O)$_2$$CHF_2$] | Me | Me | $CH_2OMe$ | O |
| D-15036 | Me(S) | single bond | H | c-Pr[1-S(═O)$_2$$CHF_2$] | Me | Me | $CH_2OMe$ | O |
| D-15037 | H | single bond | Me | c-Pr[1-S(═O)$_2$$CF_3$] | Me | Cl | $CH_2OMe$ | O |
| D-15038 | Me | single bond | H | c-Pr[1-S(═O)$_2$$CF_3$] | Me | Cl | $CH_2OMe$ | O |
| D-15039 | Me(R) | single bond | H | c-Pr[1-S(═O)$_2$$CF_3$] | Me | Cl | $CH_2OMe$ | O |
| D-15040 | Me(S) | single bond | H | c-Pr[1-S(═O)$_2$$CF_3$] | Me | Cl | $CH_2OMe$ | O |
| D-15041 | H | single bond | Me | c-Pr[1-S(═O)$_2$$CF_3$] | Me | Me | $CH_2OMe$ | O |
| D-15042 | Me | single bond | H | c-Pr[1-S(═O)$_2$$CF_3$] | Me | Me | $CH_2OMe$ | O |
| D-15043 | Me(R) | single bond | H | c-Pr[1-S(═O)$_2$$CF_3$] | Me | Me | $CH_2OMe$ | O |
| D-15044 | Me(S) | single bond | H | c-Pr[1-S(═O)$_2$$CF_3$] | Me | Me | $CH_2OMe$ | O |
| D-15045 | H | single bond | Me | c-Pr[1-(5,6-dihydro-1,4,2-dioxazin-3-yl)] | Me | Cl | $CH_2OMe$ | O |

TABLE 988-continued

| Compound Number | Y | W | Z | $R^1$ | $R^2$ | $R^3$ | $R^{10}$ | A |
|---|---|---|---|---|---|---|---|---|
| D-15046 | Me | single bond | H | c-Pr[1-(5,6-dihydro-1,4,2-dioxazin-3-yl)] | Me | Cl | $CH_2OMe$ | O |
| D-15047 | Me(R) | single bond | H | c-Pr[1-(5,6-dihydro-1,4,2-dioxazin-3-yl)] | Me | Cl | $CH_2OMe$ | O |
| D-15048 | Me(S) | single bond | H | c-Pr[1-(5,6-dihydro-1,4,2-dioxazin-3-yl)] | Me | Cl | $CH_2OMe$ | O |
| D-15049 | H | single bond | Me | c-Pr[1-(5,6-dihydro-1,4,2-dioxazin-3-yl)] | Me | Me | $CH_2OMe$ | O |
| D-15050 | Me | single bond | H | c-Pr[1-(5,6-dihydro-1,4,2-dioxazin-3-yl)] | Me | Me | $CH_2OMe$ | O |
| D-15051 | Me(R) | single bond | H | c-Pr[1-(5,6-dihydro-1,4,2-dioxazin-3-yl)] | Me | Me | $CH_2OMe$ | O |
| D-15052 | Me(S) | single bond | H | c-Pr[1-(5,6-dihydro-1,4,2-dioxazin-3-yl)] | Me | Me | $CH_2OMe$ | O |
| D-15053 | H | single bond | Me | c-Pr[1-(5-hydroxy-1,3,4-oxadiazol-2-yl)] | Me | Cl | $CH_2OMe$ | O |
| D-15054 | Me | single bond | H | c-Pr[1-(5-hydroxy-1,3,4-oxadiazol-2-yl)] | Me | Cl | $CH_2OMe$ | O |
| D-15055 | Me(R) | single bond | H | c-Pr[1-(5-hydroxy-1,3,4-oxadiazol-2-yl)] | Me | Cl | $CH_2OMe$ | O |
| D-15056 | Me(S) | single bond | H | c-Pr[1-(5-hydroxy-1,3,4-oxadiazol-2-yl)] | Me | Cl | $CH_2OMe$ | O |
| D-15057 | H | single bond | Me | c-Pr[1-(5-hydroxy-1,3,4-oxadiazol-2-yl)] | Me | Me | $CH_2OMe$ | O |
| D-15058 | Me | single bond | H | c-Pr[1-(5-hydroxy-1,3,4-oxadiazol-2-yl)] | Me | Me | $CH_2OMe$ | O |
| D-15059 | Me(R) | single bond | H | c-Pr[1-(5-hydroxy-1,3,4-oxadiazol-2-yl)] | Me | Me | $CH_2OMe$ | O |
| D-15060 | Me(S) | single bond | H | c-Pr[1-(5-hydroxy-1,3,4-oxadiazol-2-yl)] | Me | Me | $CH_2OMe$ | O |
| D-15061 | H | single bond | Me | c-Pr[1-(pyrimidin-2-yl)] | Me | Cl | $CH_2OMe$ | O |
| D-15062 | Me | single bond | H | c-Pr[1-(pyrimidin-2-yl)] | Me | Cl | $CH_2OMe$ | O |
| D-15063 | Me(R) | single bond | H | c-Pr[1-(pyrimidin-2-yl)] | Me | Cl | $CH_2OMe$ | O |
| D-15064 | Me(S) | single bond | H | c-Pr[1-(pyrimidin-2-yl)] | Me | Cl | $CH_2OMe$ | O |
| D-15065 | H | single bond | Me | c-Pr[1-(pyrimidin-2-yl)] | Me | Me | $CH_2OMe$ | O |
| D-15066 | Me | single bond | H | c-Pr[1-(pyrimidin-2-yl)] | Me | Me | $CH_2OMe$ | O |

TABLE 989

| Compound Number | Y | W | Z | $R^1$ | $R^2$ | $R^3$ | $R^{10}$ | A |
|---|---|---|---|---|---|---|---|---|
| D-15067 | Me(R) | single bond | H | c-Pr[1-(pyrimidin-2-yl)] | Me | Me | $CH_2OMe$ | O |
| D-15068 | Me(S) | single bond | H | c-Pr[1-(pyrimidin-2-yl)] | Me | Me | $CH_2OMe$ | O |
| D-15069 | H | single bond | Me | t-Bu | Me | Cl | $CH_2OMe$ | O |
| D-15070 | Me | single bond | H | t-Bu | Me | Cl | $CH_2OMe$ | O |
| D-15071 | Me(R) | single bond | H | t-Bu | Me | Cl | $CH_2OMe$ | O |
| D-15072 | Me(S) | single bond | H | t-Bu | Me | Cl | $CH_2OMe$ | O |
| D-15073 | H | single bond | Me | t-Bu | Me | Me | $CH_2OMe$ | O |
| D-15074 | Me | single bond | H | t-Bu | Me | Me | $CH_2OMe$ | O |
| D-15075 | Me(R) | single bond | H | t-Bu | Me | Me | $CH_2OMe$ | O |
| D-15076 | Me(S) | single bond | H | t-Bu | Me | Me | $CH_2OMe$ | O |
| D-15077 | H | single bond | Me | c-Bu | Me | Cl | $CH_2OMe$ | O |
| D-15078 | Me | single bond | H | c-Bu | Me | Cl | $CH_2OMe$ | O |
| D-15079 | Me(R) | single bond | H | c-Bu | Me | Cl | $CH_2OMe$ | O |
| D-15080 | Me(S) | single bond | H | c-Bu | Me | Cl | $CH_2OMe$ | O |
| D-15081 | H | single bond | Me | c-Bu | Me | Me | $CH_2OMe$ | O |
| D-15082 | Me | single bond | H | c-Bu | Me | Me | $CH_2OMe$ | O |
| D-15083 | Me(R) | single bond | H | c-Bu | Me | Me | $CH_2OMe$ | O |
| D-15084 | Me(S) | single bond | H | c-Bu | Me | Me | $CH_2OMe$ | O |
| D-15085 | H | single bond | Me | c-Bu(1-CN) | Me | Cl | $CH_2OMe$ | O |
| D-15086 | Me | single bond | H | c-Bu(1-CN) | Me | Cl | $CH_2OMe$ | O |
| D-15087 | Me(R) | single bond | H | c-Bu(1-CN) | Me | Cl | $CH_2OMe$ | O |
| D-15088 | Me(S) | single bond | H | c-Bu(1-CN) | Me | Cl | $CH_2OMe$ | O |
| D-15089 | H | single bond | Me | c-Bu(1-CN) | Me | Me | $CH_2OMe$ | O |
| D-15090 | Me | single bond | H | c-Bu(1-CN) | Me | Me | $CH_2OMe$ | O |
| D-15091 | Me(R) | single bond | H | c-Bu(1-CN) | Me | Me | $CH_2OMe$ | O |
| D-15092 | Me(S) | single bond | H | c-Bu(1-CN) | Me | Me | $CH_2OMe$ | O |
| D-15093 | H | single bond | Me | c-Bu(3,3-$F_2$) | Me | Cl | $CH_2OMe$ | O |
| D-15094 | Me | single bond | H | c-Bu(3,3-$F_2$) | Me | Cl | $CH_2OMe$ | O |
| D-15095 | Me(R) | single bond | H | c-Bu(3,3-$F_2$) | Me | Cl | $CH_2OMe$ | O |
| D-15096 | Me(S) | single bond | H | c-Bu(3,3-$F_2$) | Me | Cl | $CH_2OMe$ | O |
| D-15097 | H | single bond | Me | c-Bu(3,3-$F_2$) | Me | Me | $CH_2OMe$ | O |
| D-15098 | Me | single bond | H | c-Bu(3,3-$F_2$) | Me | Me | $CH_2OMe$ | O |
| D-15099 | Me(R) | single bond | H | c-Bu(3,3-$F_2$) | Me | Me | $CH_2OMe$ | O |
| D-15100 | Me(S) | single bond | H | c-Bu(3,3-$F_2$) | Me | Me | $CH_2OMe$ | O |
| D-15101 | H | single bond | Me | oxetan-3-yl | Me | Cl | $CH_2OMe$ | O |
| D-15102 | Me | single bond | H | oxetan-3-yl | Me | Cl | $CH_2OMe$ | O |
| D-15103 | Me(R) | single bond | H | oxetan-3-yl | Me | Cl | $CH_2OMe$ | O |
| D-15104 | Me(S) | single bond | H | oxetan-3-yl | Me | Cl | $CH_2OMe$ | O |
| D-15105 | H | single bond | Me | oxetan-3-yl | Me | Me | $CH_2OMe$ | O |
| D-15106 | Me | single bond | H | oxetan-3-yl | Me | Me | $CH_2OMe$ | O |
| D-15107 | Me(R) | single bond | H | oxetan-3-yl | Me | Me | $CH_2OMe$ | O |
| D-15108 | Me(S) | single bond | H | oxetan-3-yl | Me | Me | $CH_2OMe$ | O |
| D-15109 | H | single bond | Me | oxetan(3-CN)-3-yl | Me | Cl | $CH_2OMe$ | O |
| D-15110 | Me | single bond | H | oxetan(3-CN)-3-yl | Me | Cl | $CH_2OMe$ | O |

TABL 990

| Compound Number | Y | W | Z | $R^1$ | $R^2$ | $R^3$ | $R^{10}$ | A |
|---|---|---|---|---|---|---|---|---|
| D-15111 | Me(R) | single bond | H | oxetan(3-CN)-3-yl | Me | Cl | $CH_2OMe$ | O |
| D-15112 | Me(S) | single bond | H | oxetan(3-CN)-3-yl | Me | Cl | $CH_2OMe$ | O |
| D-15113 | H | single bond | Me | oxetan(3-CN)-3-yl | Me | Me | $CH_2OMe$ | O |
| D-15114 | Me | single bond | H | oxetan(3-CN)-3-yl | Me | Me | $CH_2OMe$ | O |
| D-15115 | Me(R) | single bond | H | oxetan(3-CN)-3-yl | Me | Me | $CH_2OMe$ | O |
| D-15116 | Me(S) | single bond | H | oxetan(3-CN)-3-yl | Me | Me | $CH_2OMe$ | O |
| D-15117 | H | single bond | Me | azetidin[1-C(═O)Me]-3-yl | Me | Cl | $CH_2OMe$ | O |
| D-15118 | Me | single bond | H | azetidin[1-C(═O)Me]-3-yl | Me | Cl | $CH_2OMe$ | O |
| D-15119 | Me(R) | single bond | H | azetidin[1-C(═O)Me]-3-yl | Me | Cl | $CH_2OMe$ | O |
| D-15120 | Me(S) | single bond | H | azetidin[1-C(═O)Me]-3-yl | Me | Cl | $CH_2OMe$ | O |
| D-15121 | H | single bond | Me | azetidin[1-C(═O)Me]-3-yl | Me | Me | $CH_2OMe$ | O |
| D-15122 | Me | single bond | H | azetidin[1-C(═O)Me]-3-yl | Me | Me | $CH_2OMe$ | O |
| D-15123 | Me(R) | single bond | H | azetidin[1-C(═O)Me]-3-yl | Me | Me | $CH_2OMe$ | O |
| D-15124 | Me(S) | single bond | H | azetidin[1-C(═O)Me]-3-yl | Me | Me | $CH_2OMe$ | O |
| D-15125 | H | single bond | Me | azetidin[1-S(═O)$_2$Me]-3-yl | Me | Cl | $CH_2OMe$ | O |
| D-15126 | Me | single bond | H | azetidin[1-S(═O)$_2$Me]-3-yl | Me | Cl | $CH_2OMe$ | O |
| D-15127 | Me(R) | single bond | H | azetidin[1-S(═O)$_2$Me]-3-yl | Me | Cl | $CH_2OMe$ | O |
| D-15128 | Me(S) | single bond | H | azetidin[1-S(═O)$_2$Me]-3-yl | Me | Cl | $CH_2OMe$ | O |
| D-15129 | H | single bond | Me | azetidin[1-S(═O)$_2$Me]-3-yl | Me | Me | $CH_2OMe$ | O |
| D-15130 | Me | single bond | H | azetidin[1-S(═O)$_2$Me]-3-yl | Me | Me | $CH_2OMe$ | O |
| D-15131 | Me(R) | single bond | H | azetidin[1-S(═O)$_2$Me]-3-yl | Me | Me | $CH_2OMe$ | O |
| D-15132 | Me(S) | single bond | H | azetidin[1-S(═O)$_2$Me]-3-yl | Me | Me | $CH_2OMe$ | O |
| D-15133 | H | single bond | Me | azetidin[1-S(═O)$_2$CHF$_2$]-3-yl | Me | Cl | $CH_2OMe$ | O |
| D-15134 | Me | single bond | H | azetidin[1-S(═O)$_2$CHF$_2$]-3-yl | Me | Cl | $CH_2OMe$ | O |
| D-15135 | Me(R) | single bond | H | azetidin[1-S(═O)$_2$CHF$_2$]-3-yl | Me | Cl | $CH_2OMe$ | O |
| D-15136 | Me(S) | single bond | H | azetidin[1-S(═O)$_2$CHF$_2$]-3-yl | Me | Cl | $CH_2OMe$ | O |
| D-15137 | H | single bond | Me | azetidin[1-S(═O)$_2$CHF$_2$]-3-yl | Me | Me | $CH_2OMe$ | O |
| D-15138 | Me | single bond | H | azetidin[1-S(═O)$_2$CHF$_2$]-3-yl | Me | Me | $CH_2OMe$ | O |
| D-15139 | Me(R) | single bond | H | azetidin[1-S(═O)$_2$CHF$_2$]-3-yl | Me | Me | $CH_2OMe$ | O |
| D-15140 | Me(S) | single bond | H | azetidin[1-S(═O)$_2$CHF$_2$]-3-yl | Me | Me | $CH_2OMe$ | O |
| D-15141 | H | single bond | Me | c-Pen | Me | Cl | $CH_2OMe$ | O |
| D-15142 | Me | single bond | H | c-Pen | Me | Cl | $CH_2OMe$ | O |
| D-15143 | Me(R) | single bond | H | c-Pen | Me | Cl | $CH_2OMe$ | O |
| D-15144 | Me(S) | single bond | H | c-Pen | Me | Cl | $CH_2OMe$ | O |
| D-15145 | H | single bond | Me | c-Pen | Me | Me | $CH_2OMe$ | O |
| D-15146 | Me | single bond | H | c-Pen | Me | Me | $CH_2OMe$ | O |
| D-15147 | Me(R) | single bond | H | c-Pen | Me | Me | $CH_2OMe$ | O |
| D-15148 | Me(S) | single bond | H | c-Pen | Me | Me | $CH_2OMe$ | O |
| D-15149 | H | single bond | Me | tetrahydrofuran-3-yl | Me | Cl | $CH_2OMe$ | O |
| D-15150 | Me | single bond | H | tetrahydrofuran-3-yl | Me | Cl | $CH_2OMe$ | O |
| D-15151 | Me(R) | single bond | H | tetrahydrofuran-3-yl | Me | Cl | $CH_2OMe$ | O |
| D-15152 | Me(S) | single bond | H | tetrahydrofuran-3-yl | Me | Cl | $CH_2OMe$ | O |
| D-15153 | H | single bond | Me | tetrahydrofuran-3-yl | Me | Me | $CH_2OMe$ | O |
| D-15154 | Me | single bond | H | tetrahydrofuran-3-yl | Me | Me | $CH_2OMe$ | O |

TABLE 991

| Compound Number | Y | W | Z | $R^1$ | $R^2$ | $R^3$ | $R^{10}$ | A |
|---|---|---|---|---|---|---|---|---|
| D-15155 | Me(R) | single bond | H | tetrahydrofuran-3-yl | Me | Me | $CH_2OMe$ | O |
| D-15156 | Me(S) | single bond | H | tetrahydrofuran-3-yl | Me | Me | $CH_2OMe$ | O |
| D-15157 | H | single bond | Me | tetrahydrothiophen-3-yl | Me | Cl | $CH_2OMe$ | O |
| D-15158 | Me | single bond | H | tetrahydrothiophen-3-yl | Me | Cl | $CH_2OMe$ | O |
| D-15159 | Me(R) | single bond | H | tetrahydrothiophen-3-yl | Me | Cl | $CH_2OMe$ | O |
| D-15160 | Me(S) | single bond | H | tetrahydrothiophen-3-yl | Me | Cl | $CH_2OMe$ | O |
| D-15161 | H | single bond | Me | tetrahydrothiophen-3-yl | Me | Me | $CH_2OMe$ | O |
| D-15162 | Me | single bond | H | tetrahydrothiophen-3-yl | Me | Me | $CH_2OMe$ | O |
| D-15163 | Me(R) | single bond | H | tetrahydrothiophen-3-yl | Me | Me | $CH_2OMe$ | O |
| D-15164 | Me(S) | single bond | H | tetrahydrothiophen-3-yl | Me | Me | $CH_2OMe$ | O |
| D-15165 | H | single bond | Me | c-Pen(1-CN) | Me | Cl | $CH_2OMe$ | O |
| D-15166 | Me | single bond | H | c-Pen(1-CN) | Me | Cl | $CH_2OMe$ | O |
| D-15167 | Me(R) | single bond | H | c-Pen(1-CN) | Me | Cl | $CH_2OMe$ | O |
| D-15168 | Me(S) | single bond | H | c-Pen(1-CN) | Me | Cl | $CH_2OMe$ | O |
| D-15169 | H | single bond | Me | c-Pen(1-CN) | Me | Me | $CH_2OMe$ | O |
| D-15170 | Me | single bond | H | c-Pen(1-CN) | Me | Me | $CH_2OMe$ | O |
| D-15171 | Me(R) | single bond | H | c-Pen(1-CN) | Me | Me | $CH_2OMe$ | O |
| D-15172 | Me(S) | single bond | H | c-Pen(1-CN) | Me | Me | $CH_2OMe$ | O |
| D-15173 | H | single bond | Me | tetrahydrofuran(3-CN)-3-yl | Me | Cl | $CH_2OMe$ | O |
| D-15174 | Me | single bond | H | tetrahydrofuran(3-CN)-3-yl | Me | Cl | $CH_2OMe$ | O |
| D-15175 | Me(R) | single bond | H | tetrahydrofuran(3-CN)-3-yl | Me | Cl | $CH_2OMe$ | O |

TABLE 991-continued

| Compound Number | Y | W | Z | $R^1$ | $R^2$ | $R^3$ | $R^{10}$ | A |
|---|---|---|---|---|---|---|---|---|
| D-15176 | Me(S) | single bond | H | tetrahydrofuran(3-CN)-3-yl | Me | Cl | $CH_2OMe$ | O |
| D-15177 | H | single bond | Me | tetrahydrofuran(3-CN)-3-yl | Me | Me | $CH_2OMe$ | O |
| D-15178 | Me | single bond | H | tetrahydrofuran(3-CN)-3-yl | Me | Me | $CH_2OMe$ | O |
| D-15179 | Me(R) | single bond | H | tetrahydrofuran(3-CN)-3-yl | Me | Me | $CH_2OMe$ | O |
| D-15180 | Me(S) | single bond | H | tetrahydrofuran(3-CN)-3-yl | Me | Me | $CH_2OMe$ | O |
| D-15181 | H | single bond | Me | tetrahydrothiophen(3-CN)-3-yl | Me | Cl | $CH_2OMe$ | O |
| D-15182 | Me | single bond | H | tetrahydrothiophen(3-CN)-3-yl | Me | Cl | $CH_2OMe$ | O |
| D-15183 | Me(R) | single bond | H | tetrahydrothiophen(3-CN)-3-yl | Me | Cl | $CH_2OMe$ | O |
| D-15184 | Me(S) | single bond | H | tetrahydrothiophen(3-CN)-3-yl | Me | Cl | $CH_2OMe$ | O |
| D-15185 | H | single bond | Me | tetrahydrothiophen(3-CN)-3-yl | Me | Me | $CH_2OMe$ | O |
| D-15186 | Me | single bond | H | tetrahydrothiophen(3-CN)-3-yl | Me | Me | $CH_2OMe$ | O |
| D-15187 | Me(R) | single bond | H | tetrahydrothiophen(3-CN)-3-yl | Me | Me | $CH_2OMe$ | O |
| D-15188 | Me(S) | single bond | H | tetrahydrothiophen(3-CN)-3-yl | Me | Me | $CH_2OMe$ | O |
| D-15189 | H | single bond | Me | bicyclo[1.1.1]pentan-1-yl | Me | Cl | $CH_2OMe$ | O |
| D-15190 | Me | single bond | H | bicyclo[1.1.1]pentan-1-yl | Me | Cl | $CH_2OMe$ | O |
| D-15191 | Me(R) | single bond | III | bicyclo[1.1.1]pentan-1-yl | Me | Cl | $CH_2OMe$ | O |
| D-15192 | Me(S) | single bond | H | bicyclo[1.1.1]pentan-1-yl | Me | Cl | $CH_2OMe$ | O |
| D-15193 | H | single bond | Me | bicyclo[1.1.1]pentan-1-yl | Me | Me | $CH_2OMe$ | O |
| D-15194 | Me | single bond | H | bicyclo[1.1.1]pentan-1-yl | Me | Me | $CH_2OMe$ | O |
| D-15195 | Me(R) | single bond | H | bicyclo[1.1.1]pentan-1-yl | Me | Me | $CH_2OMe$ | O |
| D-15196 | Me(S) | single bond | H | bicyclo[1.1.1]pentan-1-yl | Me | Me | $CH_2OMe$ | O |
| D-15197 | H | single bond | Me | c-Hex | Me | Cl | $CH_2OMe$ | O |
| D-15198 | Me | single bond | H | c-Hex | Me | Cl | $CH_2OMe$ | O |

TABLE 992

| Compound Number | Y | W | Z | $R^1$ | $R^2$ | $R^3$ | $R^{10}$ | A |
|---|---|---|---|---|---|---|---|---|
| D-15199 | Me(R) | single bond | H | c-Hex | Me | Cl | $CH_2OMe$ | O |
| D-15200 | Me(S) | single bond | H | c-Hex | Me | Cl | $CH_2OMe$ | O |
| D-15201 | H | single bond | Me | c-Hex | Me | Me | $CH_2OMe$ | O |
| D-15202 | Me | single bond | H | c-Hex | Me | Me | $CH_2OMe$ | O |
| D-15203 | Me(R) | single bond | H | c-Hex | Me | Me | $CH_2OMe$ | O |
| D-15204 | Me(S) | single bond | H | c-Hex | Me | Me | $CH_2OMe$ | O |
| D-15205 | H | single bond | Me | tetrahydropyran-4-yl | Me | Cl | $CH_2OMe$ | O |
| D-15206 | Me | single bond | H | tetrahydropyran-4-yl | Me | Cl | $CH_2OMe$ | O |
| D-15207 | Me(R) | single bond | H | tetrahydropyran-4-yl | Me | Cl | $CH_2OMe$ | O |
| D-15208 | Me(S) | single bond | H | tetrahydropyran-4-yl | Me | Cl | $CH_2OMe$ | O |
| D-15209 | H | single bond | Me | tetrahydropyran-4-yl | Me | Me | $CH_2OMe$ | O |
| D-15210 | Me | single bond | H | tetrahydropyran-4-yl | Me | Me | $CH_2OMe$ | O |
| D-15211 | Me(R) | single bond | H | tetrahydropyran-4-yl | Me | Me | $CH_2OMe$ | O |
| D-15212 | Me(S) | single bond | H | tetrahydropyran-4-yl | Me | Me | $CH_2OMe$ | O |
| D-15213 | H | single bond | Me | tetrahydrothiopyran-4-yl | Me | Cl | $CH_2OMe$ | O |
| D-15214 | Me | single bond | H | tetrahydrothiopyran-4-yl | Me | Cl | $CH_2OMe$ | O |
| D-15215 | Me(R) | single bond | H | tetrahydrothiopyran-4-yl | Me | Cl | $CH_2OMe$ | O |
| D-15216 | Me(S) | single bond | H | tetrahydrothiopyran-4-yl | Me | Cl | $CH_2OMe$ | O |
| D-15217 | H | single bond | Me | tetrahydrothiopyran-4-yl | Me | Me | $CH_2OMe$ | O |
| D-15218 | Me | single bond | H | tetrahydrothiopyran-4-yl | Me | Me | $CH_2OMe$ | O |
| D-15219 | Me(R) | single bond | H | tetrahydrothiopyran-4-yl | Me | Me | $CH_2OMe$ | O |
| D-15220 | Me(S) | single bond | H | tetrahydrothiopyran-4-yl | Me | Me | $CH_2OMe$ | O |
| D-15221 | H | single bond | Me | c-Hex(1-CN) | Me | Cl | $CH_2OMe$ | O |
| D-15222 | Me | single bond | H | c-Hex(1-CN) | Me | Cl | $CH_2OMe$ | O |
| D-15223 | Me(R) | single bond | H | c-Hex(1-CN) | Me | Cl | $CH_2OMe$ | O |
| D-15224 | Me(S) | single bond | H | c-Hex(1-CN) | Me | Cl | $CH_2OMe$ | O |
| D-15225 | H | single bond | Me | c-Hex(1-CN) | Me | Me | $CH_2OMe$ | O |
| D-15226 | Me | single bond | H | c-Hex(1-CN) | Me | Me | $CH_2OMe$ | O |
| D-15227 | Me(R) | single bond | H | c-Hex(1-CN) | Me | Me | $CH_2OMe$ | O |
| D-15228 | Me(S) | single bond | H | c-Hex(1-CN) | Me | Me | $CH_2OMe$ | O |
| D-15229 | H | single bond | Me | tetrahydropyran(4-CN)-4-yl | Me | Cl | $CH_2OMe$ | O |
| D-15230 | Me | single bond | H | tetrahydropyran(4-CN)-4-yl | Me | Cl | $CH_2OMe$ | O |
| D-15231 | Me(R) | single bond | H | tetrahydropyran(4-CN)-4-yl | Me | Cl | $CH_2OMe$ | O |
| D-15232 | Me(S) | single bond | H | tetrahydropyran(4-CN)-4-yl | Me | Cl | $CH_2OMe$ | O |
| D-15233 | H | single bond | Me | tetrahydropyran(4-CN)-4-yl | Me | Me | $CH_2OMe$ | O |
| D-15234 | Me | single bond | H | tetrahydropyran(4-CN)-4-yl | Me | Me | $CH_2OMe$ | O |
| D-15235 | Me(R) | single bond | H | tetrahydropyran(4-CN)-4-yl | Me | Me | $CH_2OMe$ | O |
| D-15236 | Me(S) | single bond | H | tetrahydropyran(4-CN)-4-yl | Me | Me | $CH_2OMe$ | O |
| D-15237 | H | single bond | Me | tetrahydrothiopyran(4-CN)-4-yl | Me | Cl | $CH_2OMe$ | O |
| D-15238 | Me | single bond | H | tetrahydrothiopyran(4-CN)-4-yl | Me | Cl | $CH_2OMe$ | O |
| D-15239 | Me(R) | single bond | H | tetrahydrothiopyran(4-CN)-4-yl | Me | Cl | $CH_2OMe$ | O |
| D-15240 | Me(S) | single bond | H | tetrahydrothiopyran(4-CN)-4-yl | Me | Cl | $CH_2OMe$ | O |

TABLE 992-continued

| Compound Number | Y | W | Z | $R^1$ | $R^2$ | $R^3$ | $R^{10}$ | A |
|---|---|---|---|---|---|---|---|---|
| D-15241 | H | single bond | Me | tetrahydrothiopyran(4-CN)-4-yl | Me | Me | $CH_2OMe$ | O |
| D-15242 | Me | single bond | H | tetrahydrothiopyran(4-CN)-4-yl | Me | Me | $CH_2OMe$ | O |

TABLE 993

| Compound Number | Y | W | Z | $R^1$ | $R^2$ | $R^3$ | $R^{10}$ | A |
|---|---|---|---|---|---|---|---|---|
| D-15243 | Me(R) | single bond | H | tetrahydrothiopyran(4-CN)-4-yl | Me | Me | $CH_2OMe$ | O |
| D-15244 | Me(S) | single bond | H | tetrahydrothiopyran(4-CN)-4-yl | Me | Me | $CH_2OMe$ | O |
| D-15245 | H | single bond | Me | $CH_2$(c-Pr) | Me | Cl | $CH_2OMe$ | O |
| D-15246 | Me | single bond | H | $CH_2$(c-Pr) | Me | Cl | $CH_2OMe$ | O |
| D-15247 | Me(R) | single bond | H | $CH_2$(c-Pr) | Me | Cl | $CH_2OMe$ | O |
| D-15248 | Me(S) | single bond | H | $CH_2$(c-Pr) | Me | Cl | $CH_2OMe$ | O |
| D-15249 | H | single bond | Me | $CH_2$(c-Pr) | Me | Me | $CH_2OMe$ | O |
| D-15250 | Me | single bond | H | $CH_2$(c-Pr) | Me | Me | $CH_2OMe$ | O |
| D-15251 | Me(R) | single bond | H | $CH_2$(c-Pr) | Me | Me | $CH_2OMe$ | O |
| D-15252 | Me(S) | single bond | H | $CH_2$(c-Pr) | Me | Me | $CH_2OMe$ | O |
| D-15253 | H | single bond | Me | $CH_2$[c-Pr(1-CN)] | Me | Cl | $CH_2OMe$ | O |
| D-15254 | Me | single bond | H | $CH_2$[c-Pr(1-CN)] | Me | Cl | $CH_2OMe$ | O |
| D-15255 | Me(R) | single bond | H | $CH_2$[c-Pr(1-CN)] | Me | Cl | $CH_2OMe$ | O |
| D-15256 | Me(S) | single bond | H | $CH_2$[c-Pr(1-CN)] | Me | Cl | $CH_2OMe$ | O |
| D-15257 | H | single bond | Me | $CH_2$[c-Pr(1-CN)] | Me | Me | $CH_2OMe$ | O |
| D-15258 | Me | single bond | H | $CH_2$[c-Pr(1-CN)] | Me | Me | $CH_2OMe$ | O |
| D-15259 | Me(R) | single bond | H | $CH_2$[c-Pr(1-CN)] | Me | Me | $CH_2OMe$ | O |
| D-15260 | Me(S) | single bond | H | $CH_2$[c-Pr(1-CN)] | Me | Me | $CH_2OMe$ | O |
| D-15261 | H | single bond | Me | CH(Me)(c-Pr) | Me | Cl | $CH_2OMe$ | O |
| D-15262 | Me | single bond | H | CH(Me)(c-Pr) | Me | Cl | $CH_2OMe$ | O |
| D-15263 | Me(R) | single bond | H | CH(Me)(c-Pr) | Me | Cl | $CH_2OMe$ | O |
| D-15264 | Me(S) | single bond | H | CH(Me)(c-Pr) | Me | Cl | $CH_2OMe$ | O |
| D-15265 | H | single bond | Me | CH(Me)(c-Pr) | Me | Me | $CH_2OMe$ | O |
| D-15266 | Me | single bond | H | CH(Me)(c-Pr) | Me | Me | $CH_2OMe$ | O |
| D-15267 | Me(R) | single bond | H | CH(Me)(c-Pr) | Me | Me | $CH_2OMe$ | O |
| D-15268 | Me(S) | single bond | H | CH(Me)(c-Pr) | Me | Me | $CH_2OMe$ | O |
| D-15269 | H | single bond | Me | CH(Me)$CH_2OMe$ | Me | Cl | $CH_2OMe$ | O |
| D-15270 | Me | single bond | H | CH(Me)$CH_2OMe$ | Me | Cl | $CH_2OMe$ | O |
| D-15271 | Me(R) | single bond | H | CH(Me)$CH_2OMe$ | Me | Cl | $CH_2OMe$ | O |
| D-15272 | Me(S) | single bond | H | CH(Me)$CH_2OMe$ | Me | Cl | $CH_2OMe$ | O |
| D-15273 | H | single bond | Me | CH(Me)$CH_2OMe$ | Me | Me | $CH_2OMe$ | O |
| D-15274 | Me | single bond | H | CH(Me)$CH_2OMe$ | Me | Me | $CH_2OMe$ | O |
| D-15275 | Me(R) | single bond | H | CH(Me)$CH_2OMe$ | Me | Me | $CH_2OMe$ | O |
| D-15276 | Me(S) | single bond | H | CH(Me)$CH_2OMe$ | Me | Me | $CH_2OMe$ | O |
| D-15277 | H | single bond | Me | $CH_2CH{=}CH_2$ | Me | Cl | $CH_2OMe$ | O |
| D-15278 | Me | single bond | H | $CH_2CH{=}CH_2$ | Me | Cl | $CH_2OMe$ | O |
| D-15279 | Me(R) | single bond | H | $CH_2CH{=}CH_2$ | Me | Cl | $CH_2OMe$ | O |
| D-15280 | Me(S) | single bond | H | $CH_2CH{=}CH_2$ | Me | Cl | $CH_2OMe$ | O |
| D-15281 | H | single bond | Me | $CH_2CH{=}CH_2$ | Me | Me | $CH_2OMe$ | O |
| D-15282 | Me | single bond | H | $CH_2CH{=}CH_2$ | Me | Me | $CH_2OMe$ | O |
| D-15283 | Me(R) | single bond | H | $CH_2CH{=}CH_2$ | Me | Me | $CH_2OMe$ | O |
| D-15284 | Me(S) | single bond | H | $CH_2CH{=}CH_2$ | Me | Me | $CH_2OMe$ | O |
| D-15285 | H | single bond | Me | $CH_2C{\equiv}CH$ | Me | Cl | $CH_2OMe$ | O |
| D-15286 | Me | single bond | H | $CH_2C{\equiv}CH$ | Me | Cl | $CH_2OMe$ | O |

TABLE 994

| Compound Number | Y | W | Z | $R^1$ | $R^2$ | $R^3$ | $R^{10}$ | A |
|---|---|---|---|---|---|---|---|---|
| D-15287 | Me(R) | single bond | H | $CH_2C{\equiv}CH$ | Me | Cl | $CH_2OMe$ | O |
| D-15288 | Me(S) | single bond | H | $CH_2C{\equiv}CH$ | Me | Cl | $CH_2OMe$ | O |
| D-15289 | H | single bond | Me | $CH_2C{\equiv}CH$ | Me | Me | $CH_2OMe$ | O |
| D-15290 | Me | single bond | H | $CH_2C{\equiv}CH$ | Me | Me | $CH_2OMe$ | O |
| D-15291 | Me(R) | single bond | H | $CH_2C{\equiv}CH$ | Me | Me | $CH_2OMe$ | O |
| D-15292 | Me(S) | single bond | H | $CH_2C{\equiv}CH$ | Me | Me | $CH_2OMe$ | O |
| D-15293 | H | single bond | Me | $CH_2CN$ | Me | Cl | $CH_2OMe$ | O |
| D-15294 | Me | single bond | H | $CH_2CN$ | Me | Cl | $CH_2OMe$ | O |
| D-15295 | Me(R) | single bond | H | $CH_2CN$ | Me | Cl | $CH_2OMe$ | O |
| D-15296 | Me(S) | single bond | H | $CH_2CN$ | Me | Cl | $CH_2OMe$ | O |
| D-15297 | H | single bond | Me | $CH_2CN$ | Me | Me | $CH_2OMe$ | O |
| D-15298 | Me | single bond | H | $CH_2CN$ | Me | Me | $CH_2OMe$ | O |

TABLE 994-continued

| Compound Number | Y | W | Z | $R^1$ | $R^2$ | $R^3$ | $R^{10}$ | A |
|---|---|---|---|---|---|---|---|---|
| D-15299 | Me(R) | single bond | H | $CH_2CN$ | Me | Me | $CH_2OMe$ | O |
| D-15300 | Me(S) | single bond | H | $CH_2CN$ | Me | Me | $CH_2OMe$ | O |
| D-15301 | H | single bond | Me | CH(Me)CN | Me | Cl | $CH_2OMe$ | O |
| D-15302 | Me | single bond | H | CH(Me)CN | Me | Cl | $CH_2OMe$ | O |
| D-15303 | Me(R) | single bond | H | CH(Me)CN | Me | Cl | $CH_2OMe$ | O |
| D-15304 | Me(S) | single bond | H | CH(Me)CN | Me | Cl | $CH_2OMe$ | O |
| D-15305 | H | single bond | Me | CH(Me)CN | Me | Me | $CH_2OMe$ | O |
| D-15306 | Me | single bond | H | CH(Me)CN | Me | Me | $CH_2OMe$ | O |
| D-15307 | Me(R) | single bond | H | CH(Me)CN | Me | Me | $CH_2OMe$ | O |
| D-15308 | Me(S) | single bond | H | CH(Me)CN | Me | Me | $CH_2OMe$ | O |
| D-15309 | H | single bond | Me | $C(Me)_2CN$ | Me | Cl | $CH_2OMe$ | O |
| D-15310 | Me | single bond | H | $C(Me)_2CN$ | Me | Cl | $CH_2OMe$ | O |
| D-15311 | Me(R) | single bond | H | $C(Me)_2CN$ | Me | Cl | $CH_2OMe$ | O |
| D-15312 | Me(S) | single bond | H | $C(Me)_2CN$ | Me | Cl | $CH_2OMe$ | O |
| D-15313 | H | single bond | Me | $C(Me)_2CN$ | Me | Me | $CH_2OMe$ | O |
| D-15314 | Me | single bond | H | $C(Me)_2CN$ | Me | Me | $CH_2OMe$ | O |
| D-15315 | Me(R) | single bond | H | $C(Me)_2CN$ | Me | Me | $CH_2OMe$ | O |
| D-15316 | Me(S) | single bond | H | $C(Me)_2CN$ | Me | Me | $CH_2OMe$ | O |
| D-15317 | H | single bond | Me | C(Me)(i-Pr)CN | Me | Cl | $CH_2OMe$ | O |
| D-15318 | Me | single bond | H | C(Me)(i-Pr)CN | Me | Cl | $CH_2OMe$ | O |
| D-15319 | Me(R) | single bond | H | C(Me)(i-Pr)CN | Me | Cl | $CH_2OMe$ | O |
| D-15320 | Me(S) | single bond | H | C(Me)(i-Pr)CN | Me | Cl | $CH_2OMe$ | O |
| D-15321 | H | single bond | Me | C(Me)(i-Pr)CN | Me | Me | $CH_2OMe$ | O |
| D-15322 | Me | single bond | H | C(Me)(i-Pr)CN | Me | Me | $CH_2OMe$ | O |
| D-15323 | Me(R) | single bond | H | C(Me)(i-Pr)CN | Me | Me | $CH_2OMe$ | O |
| D-15324 | Me(S) | single bond | H | C(Me)(i-Pr)CN | Me | Me | $CH_2OMe$ | O |
| D-15325 | H | single bond | Me | OMe | Me | Cl | $CH_2OMe$ | O |
| D-15326 | Me | single bond | H | OMe | Me | Cl | $CH_2OMe$ | O |
| D-15327 | Me(R) | single bond | H | OMe | Me | Cl | $CH_2OMe$ | O |
| D-15328 | Me(S) | single bond | H | OMe | Me | Cl | $CH_2OMe$ | O |
| D-15329 | H | single bond | Me | OMe | Me | Me | $CH_2OMe$ | O |
| D-15330 | Me | single bond | H | OMe | Me | Me | $CH_2OMe$ | O |

TABLE 995

| Compound Number | Y | W | Z | $R^1$ | $R^2$ | $R^3$ | $R^{10}$ | A |
|---|---|---|---|---|---|---|---|---|
| D-15331 | Me(R) | single bond | H | OMe | Me | Me | $CH_2OMe$ | O |
| D-15332 | Me(S) | single bond | H | OMe | Me | Me | $CH_2OMe$ | O |
| D-15333 | H | single bond | Me | CH=NOMe | Me | Cl | $CH_2OMe$ | O |
| D-15334 | Me | single bond | H | CH=NOMe | Me | Cl | $CH_2OMe$ | O |
| D-15335 | Me(R) | single bond | H | CH=NOMe | Me | Cl | $CH_2OMe$ | O |
| D-15336 | Me(S) | single bond | H | CH=NOMe | Me | Cl | $CH_2OMe$ | O |
| D-15337 | H | single bond | Me | CH=NOMe | Me | Me | $CH_2OMe$ | O |
| D-15338 | Me | single bond | H | CH=NOMe | Me | Me | $CH_2OMe$ | O |
| D-15339 | Me(R) | single bond | H | CH=NOMe | Me | Me | $CH_2OMe$ | O |
| D-15340 | Me(S) | single bond | H | CH=NOMe | Me | Me | $CH_2OMe$ | O |
| D-15341 | H | single bond | Me | morpholin-4-yl | Me | Cl | $CH_2OMe$ | O |
| D-15342 | Me | single bond | H | morpholin-4-yl | Me | Cl | $CH_2OMe$ | O |
| D-15343 | Me(R) | single bond | H | morpholin-4-yl | Me | Cl | $CH_2OMe$ | O |
| D-15344 | Me(S) | single bond | H | morpholin-4-yl | Me | Cl | $CH_2OMe$ | O |
| D-15345 | H | single bond | Me | morpholin-4-yl | Me | Me | $CH_2OMe$ | O |
| D-15346 | Me | single bond | H | morpholin-4-yl | Me | Me | $CH_2OMe$ | O |
| D-15347 | Me(R) | single bond | H | morpholin-4-yl | Me | Me | $CH_2OMe$ | O |
| D-15348 | Me(S) | single bond | H | morpholin-4-yl | Me | Me | $CH_2OMe$ | O |
| D-15349 | H | single bond | Me | Ph | Me | Cl | $CH_2OMe$ | O |
| D-15350 | Me | single bond | H | Ph | Me | Cl | $CH_2OMe$ | O |
| D-15351 | Me(R) | single bond | H | Ph | Me | Cl | $CH_2OMe$ | O |
| D-15352 | Me(S) | single bond | H | Ph | Me | Cl | $CH_2OMe$ | O |
| D-15353 | H | single bond | Me | Ph | Me | Me | $CH_2OMe$ | O |
| D-15354 | Me | single bond | H | Ph | Me | Me | $CH_2OMe$ | O |
| D-15355 | Me(R) | single bond | H | Ph | Me | Me | $CH_2OMe$ | O |
| D-15356 | Me(S) | single bond | H | Ph | Me | Me | $CH_2OMe$ | O |
| D-15357 | H | single bond | Me | $CH_2Ph$ | Me | Cl | $CH_2OMe$ | O |
| D-15358 | Me | single bond | H | $CH_2Ph$ | Me | Cl | $CH_2OMe$ | O |
| D-15359 | Me(R) | single bond | H | $CH_2Ph$ | Me | Cl | $CH_2OMe$ | O |
| D-15360 | Me(S) | single bond | H | $CH_2Ph$ | Me | Cl | $CH_2OMe$ | O |
| D-15361 | H | single bond | Me | $CH_2Ph$ | Me | Me | $CH_2OMe$ | O |
| D-15362 | Me | single bond | H | $CH_2Ph$ | Me | Me | $CH_2OMe$ | O |
| D-15363 | Me(R) | single bond | H | $CH_2Ph$ | Me | Me | $CH_2OMe$ | O |
| D-15364 | Me(S) | single bond | H | $CH_2Ph$ | Me | Me | $CH_2OMe$ | O |
| D-15365 | H | single bond | Me | thiazole-2-yl | Me | Cl | $CH_2OMe$ | O |

TABLE 995-continued

| Compound Number | Y | W | Z | $R^1$ | $R^2$ | $R^3$ | $R^{10}$ | A |
|---|---|---|---|---|---|---|---|---|
| D-15366 | Me | single bond | H | thiazole-2-yl | Me | Cl | $CH_2OMe$ | O |
| D-15367 | Me(R) | single bond | H | thiazole-2-yl | Me | Cl | $CH_2OMe$ | O |
| D-15368 | Me(S) | single bond | H | thiazole-2-yl | Me | Cl | $CH_2OMe$ | O |
| D-15369 | H | single bond | Me | thiazole-2-yl | Me | Me | $CH_2OMe$ | O |
| D-15370 | Me | single bond | H | thiazole-2-yl | Me | Me | $CH_2OMe$ | O |
| D-15371 | Me(R) | single bond | H | thiazole-2-yl | Me | Me | $CH_2OMe$ | O |
| D-15372 | Me(S) | single bond | H | thiazole-2-yl | Me | Me | $CH_2OMe$ | O |
| D-15373 | H | single bond | H | 1-Me-pyrazol-3-yl | Me | Cl | $CH_2OMe$ | O |
| D-15374 | Me | single bond | H | 1-Me-pyrazol-3-yl | Me | Cl | $CH_2OMe$ | O |

TABLE 996

| Compound Number | Y | W | Z | $R^1$ | $R^2$ | $R^3$ | $R^{10}$ | A |
|---|---|---|---|---|---|---|---|---|
| D-15375 | Me(R) | single bond | H | 1-Me-pyrazol-3-yl | Me | Cl | $CH_2OMe$ | O |
| D-15376 | Me(S) | single bond | H | 1-Me-pyrazol-3-yl | Me | Cl | $CH_2OMe$ | O |
| D-15377 | H | single bond | Me | 1-Me-pyrazol-3-yl | Me | Me | $CH_2OMe$ | O |
| D-15378 | Me | single bond | H | 1-Me-pyrazol-3-yl | Me | Me | $CH_2OMe$ | O |
| D-15379 | Me(R) | single bond | H | 1-Me-pyrazol-3-yl | Me | Me | $CH_2OMe$ | O |
| D-15380 | Me(S) | single bond | H | 1-Me-pyrazol-3-yl | Me | Me | $CH_2OMe$ | O |
| D-15381 | H | single bond | Me | 1-Me-pyrazol-5-yl | Me | Cl | $CH_2OMe$ | O |
| D-15382 | Me | single bond | H | 1-Me-pyrazol-5-yl | Me | Cl | $CH_2OMe$ | O |
| D-15383 | Me(R) | single bond | H | 1-Me-pyrazol-5-yl | Me | Cl | $CH_2OMe$ | O |
| D-15384 | Me(S) | single bond | H | 1-Me-pyrazol-5-yl | Me | Cl | $CH_2OMe$ | O |
| D-15385 | H | single bond | Me | 1-Me-pyrazol-5-yl | Me | Me | $CH_2OMe$ | O |
| D-15386 | Me | single bond | H | 1-Me-pyrazol-5-yl | Me | Me | $CH_2OMe$ | O |
| D-15387 | Me(R) | single bond | H | 1-Me-pyrazol-5-yl | Me | Me | $CH_2OMe$ | O |
| D-15388 | Me(S) | single bond | H | 1-Me-pyrazol-5-yl | Me | Me | $CH_2OMe$ | O |
| D-15389 | H | single bond | Me | $CH_2$(pyrimidin-2-yl) | Me | Cl | $CH_2OMe$ | O |
| D-15390 | Me | single bond | H | $CH_2$(pyrimidin-2-yl) | Me | Cl | $CH_2OMe$ | O |
| D-15391 | Me(R) | single bond | H | $CH_2$(pyrimidin-2-yl) | Me | Cl | $CH_2OMe$ | O |
| D-15392 | Me(S) | single bond | H | $CH_2$(pyrimidin-2-yl) | Me | Cl | $CH_2OMe$ | O |
| D-15393 | H | single bond | Me | $CH_2$(pyrimidin-2-yl) | Me | Me | $CH_2OMe$ | O |
| D-15394 | Me | single bond | H | $CH_2$(pyrimidin-2-yl) | Me | Me | $CH_2OMe$ | O |
| D-15395 | Me(R) | single bond | H | $CH_2$(pyrimidin-2-yl) | Me | Me | $CH_2OMe$ | O |
| D-15396 | Me(S) | single bond | H | $CH_2$(pyrimidin-2-yl) | Me | Me | $CH_2OMe$ | O |
| D-15397 | H | single bond | Me | Me | Me | Cl | C(=O)Me | O |
| D-15398 | Me | single bond | H | Me | Me | Cl | C(=O)Me | O |
| D-15399 | Me(R) | single bond | H | Me | Me | Cl | C(=O)Me | O |
| D-15400 | Me(S) | single bond | H | Me | Me | Cl | C(=O)Me | O |
| D-15401 | H | single bond | Me | Me | Me | Me | C(=O)Me | O |
| D-15402 | Me | single bond | H | Me | Me | Me | C(=O)Me | O |
| D-15403 | Me(R) | single bond | H | Me | Me | Me | C(=O)Me | O |
| D-15404 | Me(S) | single bond | H | Me | Me | Me | C(=O)Me | O |
| D-15405 | H | single bond | Me | $CH_2CHF_2$ | Me | Cl | C(=O)Me | O |
| D-15406 | Me | single bond | H | $CH_2CHF_2$ | Me | Cl | C(=O)Me | O |
| D-15407 | Me(R) | single bond | H | $CH_2CHF_2$ | Me | Cl | C(=O)Me | O |
| D-15408 | Me(S) | single bond | H | $CH_2CHF_2$ | Me | Cl | C(=O)Me | O |
| D-15409 | H | single bond | Me | $CH_2CHF_2$ | Me | Me | C(=O)Me | O |
| D-15410 | Me | single bond | H | $CH_2CHF_2$ | Me | Me | C(=O)Me | O |
| D-15411 | Me(R) | single bond | H | $CH_2CHF_2$ | Me | Me | C(=O)Me | O |
| D-15412 | Me(S) | single bond | H | $CH_2CHF_2$ | Me | Me | C(=O)Me | O |
| D-15413 | H | single bond | Me | n-Pr | Me | Cl | C(=O)Me | O |
| D-15414 | Me | single bond | H | n-Pr | Me | Cl | C(=O)Me | O |
| D-15415 | Me(R) | single bond | H | n-Pr | Me | Cl | C(=O)Me | O |
| D-15416 | Me(S) | single bond | H | n-Pr | Me | Cl | C(=O)Me | O |
| D-15417 | H | single bond | Me | n-Pr | Me | Me | C(=O)Me | O |
| D-15418 | Me | single bond | H | n-Pr | Me | Me | C(=O)Me | O |

TABLE 997

| Compound Number | Y | W | Z | $R^1$ | $R^2$ | $R^3$ | $R^{10}$ | A |
|---|---|---|---|---|---|---|---|---|
| D-15419 | Me(R) | single bond | H | n-Pr | Me | Me | C(=O)Me | O |
| D-15420 | Me(S) | single bond | H | n-Pr | Me | Me | C(=O)Me | O |
| D-15421 | H | single bond | Me | i-Pr | Me | Cl | C(=O)Me | O |

TABLE 997-continued

| Compound Number | Y | W | Z | $R^1$ | $R^2$ | $R^3$ | $R^{10}$ | A |
|---|---|---|---|---|---|---|---|---|
| D-15422 | Me | single bond | H | i-Pr | Me | Cl | C(=O)Me | O |
| D-15423 | Me(R) | single bond | H | i-Pr | Me | Cl | C(=O)Me | O |
| D-15424 | Me(S) | single bond | H | i-Pr | Me | Cl | C(=O)Me | O |
| D-15425 | H | single bond | Me | i-Pr | Me | Me | C(=O)Me | O |
| D-15426 | Me | single bond | H | i-Pr | Me | Me | C(=O)Me | O |
| D-15427 | Me(R) | single bond | H | i-Pr | Me | Me | C(=O)Me | O |
| D-15428 | Me(S) | single bond | H | i-Pr | Me | Me | C(=O)Me | O |
| D-15429 | H | single bond | Me | c-Pr(1-F) | Me | Cl | C(=O)Me | O |
| D-15430 | Me | single bond | H | c-Pr(1-F) | Me | Cl | C(=O)Me | O |
| D-15431 | Me(R) | single bond | H | c-Pr(1-F) | Me | Cl | C(=O)Me | O |
| D-15432 | Me(S) | single bond | H | c-Pr(1-F) | Me | Cl | C(=O)Me | O |
| D-15433 | H | single bond | Me | c-Pr(1-F) | Me | Me | C(=O)Me | O |
| D-15434 | Me | single bond | H | c-Pr(1-F) | Me | Me | C(=O)Me | O |
| D-15435 | Me(R) | single bond | H | c-Pr(1-F) | Me | Me | C(=O)Me | O |
| D-15436 | Me(S) | single bond | H | c-Pr(1-F) | Me | Me | C(=O)Me | O |
| D-15437 | H | single bond | Me | c-Pr(2,2-$F_2$) | Me | Cl | C(=O)Me | O |
| D-15438 | Me | single bond | H | c-Pr(2,2-$F_2$) | Me | Cl | C(=O)Me | O |
| D-15439 | Me(R) | single bond | H | c-Pr(2,2-$F_2$) | Me | Cl | C(=O)Me | O |
| D-15440 | Me(S) | single bond | H | c-Pr(2,2-$F_2$) | Me | Cl | C(=O)Me | O |
| D-15441 | H | single bond | Me | c-Pr(2,2-$F_2$) | Me | Me | C(=O)Me | O |
| D-15442 | Me | single bond | H | c-Pr(2,2-$F_2$) | Me | Me | C(=O)Me | O |
| D-15443 | Me(R) | single bond | H | c-Pr(2,2-$F_2$) | Me | Me | C(=O)Me | O |
| D-15444 | Me(S) | single bond | H | c-Pr(2,2-$F_2$) | Me | Me | C(=O)Me | O |
| D-15445 | H | single bond | Me | c-Pr(1-Cl) | Me | Cl | C(=O)Me | O |
| D-15446 | Me | single bond | H | c-Pr(1-Cl) | Me | Cl | C(=O)Me | O |
| D-15447 | Me(R) | single bond | H | c-Pr(1-Cl) | Me | Cl | C(=O)Me | O |
| D-15448 | Me(S) | single bond | H | c-Pr(1-Cl) | Me | Cl | C(=O)Me | O |
| D-15449 | H | single bond | Me | c-Pr(1-Cl) | Me | Me | C(=O)Me | O |
| D-15450 | Me | single bond | H | c-Pr(1-Cl) | Me | Me | C(=O)Me | O |
| D-15451 | Me(R) | single bond | H | c-Pr(1-Cl) | Me | Me | C(=O)Me | O |
| D-15452 | Me(S) | single bond | H | c-Pr(1-Cl) | Me | Me | C(=O)Me | O |
| D-15453 | H | single bond | Me | c-Pr(1-Br) | Me | Cl | C(=O)Me | O |
| D-15454 | Me | single bond | H | c-Pr(1-Br) | Me | Cl | C(=O)Me | O |
| D-15455 | Me(R) | single bond | H | c-Pr(1-Br) | Me | Cl | C(=O)Me | O |
| D-15456 | Me(S) | single bond | H | c-Pr(1-Br) | Me | Cl | C(=O)Me | O |
| D-15457 | H | single bond | Me | c-Pr(1-Br) | Me | Me | C(=O)Me | O |
| D-15458 | Me | single bond | H | c-Pr(1-Br) | Me | Me | C(=O)Me | O |
| D-15459 | Me(R) | single bond | H | c-Pr(1-Br) | Me | Me | C(=O)Me | O |
| D-15460 | Me(S) | single bond | H | c-Pr(1-Br) | Me | Me | C(=O)Me | O |
| D-15461 | H | single bond | Me | c-Pr(1-Me) | Me | Cl | C(=O)Me | O |
| D-15462 | Me | single bond | H | c-Pr(1-Me) | Me | Cl | C(=O)Me | O |

TABLE 998

| Compound Number | Y | W | Z | $R^1$ | $R^2$ | $R^3$ | $R^{10}$ | A |
|---|---|---|---|---|---|---|---|---|
| D-15463 | Me(R) | single bond | H | c-Pr(1-Me) | Me | Cl | C(=O)Me | O |
| D-15464 | Me(S) | single bond | H | c-Pr(1-Me) | Me | Cl | C(=O)Me | O |
| D-15465 | H | single bond | Me | c-Pr(1-Me) | Me | Me | C(=O)Me | O |
| D-15466 | Me | single bond | H | c-Pr(1-Me) | Me | Me | C(=O)Me | O |
| D-15467 | Me(R) | single bond | H | c-Pr(1-Me) | Me | Me | C(=O)Me | O |
| D-15468 | Me(S) | single bond | H | c-Pr(1-Me) | Me | Me | C(=O)Me | O |
| D-15469 | H | single bond | Me | c-Pr(1-$CH_2OH$) | Me | Cl | C(=O)Me | O |
| D-15470 | Me | single bond | H | c-Pr(1-$CH_2OH$) | Me | Cl | C(=O)Me | O |
| D-15471 | Me(R) | single bond | H | c-Pr(1-$CH_2OH$) | Me | Cl | C(=O)Me | O |
| D-15472 | Me(S) | single bond | H | c-Pr(1-$CH_2OH$) | Me | Cl | C(=O)Me | O |
| D-15473 | H | single bond | Me | c-Pr(1-$CH_2OH$) | Me | Me | C(=O)Me | O |
| D-15474 | Me | single bond | H | c-Pr(1-$CH_2OH$) | Me | Me | C(=O)Me | O |
| D-15475 | Me(R) | single bond | H | c-Pr(1-$CH_2OH$) | Me | Me | C(=O)Me | O |
| D-15476 | Me(S) | single bond | H | c-Pr(1-$CH_2OH$) | Me | Me | C(=O)Me | O |
| D-15477 | H | single bond | Me | c-Pr[1-$CH_2OS(=O)_2Me$] | Me | Cl | C(=O)Me | O |
| D-15478 | Me | single bond | H | c-Pr[1-$CH_2OS(=O)_2Me$] | Me | Cl | C(=O)Me | O |
| D-15479 | Me(R) | single bond | H | c-Pr[1-$CH_2OS(=O)_2Me$] | Me | Cl | C(=O)Me | O |
| D-15480 | Me(S) | single bond | H | c-Pr[1-$CH_2OS(=O)_2Me$] | Me | Cl | C(=O)Me | O |
| D-15481 | H | single bond | Me | c-Pr[1-$CH_2OS(=O)_2Me$] | Me | Me | C(=O)Me | O |
| D-15482 | Me | single bond | H | c-Pr[1-$CH_2OS(=O)_2Me$] | Me | Me | C(=O)Me | O |
| D-15483 | Me(R) | single bond | H | c-Pr[1-$CH_2OS(=O)_2Me$] | Me | Me | C(=O)Me | O |
| D-15484 | Me(S) | single bond | H | c-Pr[1-$CH_2OS(=O)_2Me$] | Me | Me | C(=O)Me | O |
| D-15485 | H | single bond | Me | c-Pr(1-$CH_2OMe$) | Me | Cl | C(=O)Me | O |
| D-15486 | Me | single bond | H | c-Pr(1-$CH_2OMe$) | Me | Cl | C(=O)Me | O |
| D-15487 | Me(R) | single bond | H | c-Pr(1-$CH_2OMe$) | Me | Cl | C(=O)Me | O |
| D-15488 | Me(S) | single bond | H | c-Pr(1-$CH_2OMe$) | Me | Cl | C(=O)Me | O |

TABLE 998-continued

| Compound Number | Y | W | Z | $R^1$ | $R^2$ | $R^3$ | $R^{10}$ | A |
|---|---|---|---|---|---|---|---|---|
| D-15489 | H | single bond | Me | c-Pr(1-$CH_2$OMe) | Me | Me | C(═O)Me | O |
| D-15490 | Me | single bond | H | c-Pr(1-$CH_2$OMe) | Me | Me | C(═O)Me | O |
| D-15491 | Me(R) | single bond | H | c-Pr(1-$CH_2$OMe) | Me | Me | C(═O)Me | O |
| D-15492 | Me(S) | single bond | H | c-Pr(1-$CH_2$OMe) | Me | Me | C(═O)Me | O |
| D-15493 | H | single bond | Me | c-Pr(1-$CH_2$OCN) | Me | Cl | C(═O)Me | O |
| D-15494 | Me | single bond | H | c-Pr(1-$CH_2$OCN) | Me | Cl | C(═O)Me | O |
| D-15495 | Me(R) | single bond | H | c-Pr(1-$CH_2$OCN) | Me | Cl | C(═O)Me | O |
| D-15496 | Me(S) | single bond | H | c-Pr(1-$CH_2$OCN) | Me | Cl | C(═O)Me | O |
| D-15497 | H | single bond | Me | c-Pr(1-$CH_2$OCN) | Me | Me | C(═O)Me | O |
| D-15498 | Me | single bond | H | c-Pr(1-$CH_2$OCN) | Me | Me | C(═O)Me | O |
| D-15499 | Me(R) | single bond | H | c-Pr(1-$CH_2$OCN) | Me | Me | C(═O)Me | O |
| D-15500 | Me(S) | single bond | H | c-Pr(1-$CH_2$OCN) | Me | Me | C(═O)Me | O |
| D-15501 | H | single bond | Me | c-Pr(1-$CH_2$SMe) | Me | Cl | C(═O)Me | O |
| D-15502 | Me | single bond | H | c-Pr(1-$CH_2$SMe) | Me | Cl | C(═O)Me | O |
| D-15503 | Me(R) | single bond | H | c-Pr(1-$CH_2$SMe) | Me | Cl | C(═O)Me | O |
| D-15504 | Me(S) | single bond | H | c-Pr(1-$CH_2$SMe) | Me | Cl | C(═O)Me | O |
| D-15505 | H | single bond | Me | c-Pr(1-$CH_2$SMe) | Me | Me | C(═O)Me | O |
| D-15506 | Me | single bond | H | c-Pr(1-$CH_2$SMe) | Me | Me | C(═O)Me | O |

TABLE 999

| Compound Number | Y | W | Z | $R^1$ | $R^2$ | $R^3$ | $R^{10}$ | A |
|---|---|---|---|---|---|---|---|---|
| D-15507 | Me(R) | single bond | H | c-Pr(1-$CH_2$SMe) | Me | Me | C(═O)Me | O |
| D-15508 | Me(S) | single bond | H | c-Pr(1-$CH_2$SMe) | Me | Me | C(═O)Me | O |
| D-15509 | H | single bond | Me | c-Pr[1-$CH_2$S(═O)Me] | Me | Cl | C(═O)Me | O |
| D-15510 | Me | single bond | H | c-Pr[1-$CH_2$S(═O)Me] | Me | Cl | C(═O)Me | O |
| D-15511 | Me(R) | single bond | H | c-Pr[1-$CH_2$S(═O)Me] | Me | Cl | C(═O)Me | O |
| D-15512 | Me(S) | single bond | H | c-Pr[1-$CH_2$S(═O)Me] | Me | Cl | C(═O)Me | O |
| D-15513 | H | single bond | Me | c-Pr[1-$CH_2$S(═O)Me] | Me | Me | C(═O)Me | O |
| D-15514 | Me | single bond | H | c-Pr[1-$CH_2$S(═O)Me] | Me | Me | C(═O)Me | O |
| D-15515 | Me(R) | single bond | H | c-Pr[1-$CH_2$S(═O)Me] | Me | Me | C(═O)Me | O |
| D-15516 | Me(S) | single bond | H | c-Pr[1-$CH_2$S(═O)Me] | Me | Me | C(═O)Me | O |
| D-15517 | H | single bond | Me | c-Pr[1-$CH_2$S(═O)$_2$Me] | Me | Cl | C(═O)Me | O |
| D-15518 | Me | single bond | H | c-Pr[1-$CH_2$S(═O)$_2$Me] | Me | Cl | C(═O)Me | O |
| D-15519 | Me(R) | single bond | H | c-Pr[1-$CH_2$S(═O)$_2$Me] | Me | Cl | C(═O)Me | O |
| D-15520 | Me(S) | single bond | H | c-Pr[1-$CH_2$S(═O)$_2$Me] | Me | Cl | C(═O)Me | O |
| D-15521 | H | single bond | Me | c-Pr[1-$CH_2$S(═O)$_2$Me] | Me | Me | C(═O)Me | O |
| D-15522 | Me | single bond | H | c-Pr[1-$CH_2$S(═O)$_2$Me] | Me | Me | C(═O)Me | O |
| D-15523 | Me(R) | single bond | H | c-Pr[1-$CH_2$S(═O)$_2$Me] | Me | Me | C(═O)Me | O |
| D-15524 | Me(S) | single bond | H | c-Pr[1-$CH_2$S(═O)$_2$Me] | Me | Me | C(═O)Me | O |
| D-15525 | H | single bond | Me | c-Pr(1-$CH_2$F) | Me | Cl | C(═O)Me | O |
| D-15526 | Me | single bond | H | c-Pr(1-$CH_2$F) | Me | Cl | C(═O)Me | O |
| D-15527 | Me(R) | single bond | H | c-Pr(1-$CH_2$F) | Me | Cl | C(═O)Me | O |
| D-15528 | Me(S) | single bond | H | c-Pr(1-$CH_2$F) | Me | Cl | C(═O)Me | O |
| D-15529 | H | single bond | Me | c-Pr(1-$CH_2$F) | Me | Me | C(═O)Me | O |
| D-15530 | Me | single bond | H | c-Pr(1-$CH_2$F) | Me | Me | C(═O)Me | O |
| D-15531 | Me(R) | single bond | H | c-Pr(1-$CH_2$F) | Me | Me | C(═O)Me | O |
| D-15532 | Me(S) | single bond | H | c-Pr(1-$CH_2$F) | Me | Me | C(═O)Me | O |
| D-15533 | H | single bond | Me | c-Pr(1-$CHF_2$) | Me | Cl | C(═O)Me | O |
| D-15534 | Me | single bond | H | c-Pr(1-$CHF_2$) | Me | Cl | C(═O)Me | O |
| D-15535 | Me(R) | single bond | H | c-Pr(1-$CHF_2$) | Me | Cl | C(═O)Me | O |
| D-15536 | Me(S) | single bond | H | c-Pr(1-$CHF_2$) | Me | Cl | C(═O)Me | O |
| D-15537 | H | single bond | Me | c-Pr(1-$CHF_2$) | Me | Me | C(═O)Me | O |
| D-15538 | Me | single bond | H | c-Pr(1-$CHF_2$) | Me | Me | C(═O)Me | O |
| D-15539 | Me(R) | single bond | H | c-Pr(1-$CHF_2$) | Me | Me | C(═O)Me | O |
| D-15540 | Me(S) | single bond | H | c-Pr(1-$CHF_2$) | Me | Me | C(═O)Me | O |
| D-15541 | H | single bond | Me | c-Pr(1-$CF_3$) | Me | Cl | C(═O)Me | O |
| D-15542 | Me | single bond | H | c-Pr(1-$CF_3$) | Me | Cl | C(═O)Me | O |
| D-15543 | Me(R) | single bond | H | c-Pr(1-$CF_3$) | Me | Cl | C(═O)Me | O |
| D-15544 | Me(S) | single bond | H | c-Pr(1-$CF_3$) | Me | Cl | C(═O)Me | O |
| D-15545 | H | single bond | Me | c-Pr(1-$CF_3$) | Me | Me | C(═O)Me | O |
| D-15546 | Me | single bond | H | c-Pr(1-$CF_3$) | Me | Me | C(═O)Me | O |
| D-15547 | Me(R) | single bond | H | c-Pr(1-$CF_3$) | Me | Me | C(═O)Me | O |
| D-15548 | Me(S) | single bond | H | c-Pr(1-$CF_3$) | Me | Me | C(═O)Me | O |
| D-15549 | H | single bond | Me | c-Pr(1-C≡CH) | Me | Cl | C(═O)Me | O |
| D-15550 | Me | single bond | H | c-Pr(1-C≡CH) | Me | Cl | C(═O)Me | O |

TABLE 1000

| Compound Number | Y | W | Z | $R^1$ | $R^2$ | $R^3$ | $R^{10}$ | A |
|---|---|---|---|---|---|---|---|---|
| D-15551 | Me(R) | single bond | H | c-Pr(1-C≡CH) | Me | Cl | C(=O)Me | O |
| D-15552 | Me(S) | single bond | H | c-Pr(1-C≡CH) | Me | Cl | C(=O)Me | O |
| D-15553 | H | single bond | Me | c-Pr(1-C≡CH) | Me | Me | C(=O)Me | O |
| D-15554 | Me | single bond | H | c-Pr(1-C≡CH) | Me | Me | C(=O)Me | O |
| D-15555 | Me(R) | single bond | H | c-Pr(1-C≡CH) | Me | Me | C(=O)Me | O |
| D-15556 | Me(S) | single bond | H | c-Pr(1-C≡CH) | Me | Me | C(=O)Me | O |
| D-15557 | H | single bond | Me | c-Pr[1-C(=O)OEt] | Me | Cl | C(=O)Me | O |
| D-15558 | Me | single bond | H | c-Pr[1-C(=O)OEt] | Me | Cl | C(=O)Me | O |
| D-15559 | Me(R) | single bond | H | c-Pr[1-C(=O)OEt] | Me | Cl | C(=O)Me | O |
| D-15560 | Me(S) | single bond | H | c-Pr[1-C(=O)OEt] | Me | Cl | C(=O)Me | O |
| D-15561 | H | single bond | Me | c-Pr[1-C(=O)OEt] | Me | Me | C(=O)Me | O |
| D-15562 | Me | single bond | H | c-Pr[1-C(=O)OEt] | Me | Me | C(=O)Me | O |
| D-15563 | Me(R) | single bond | H | c-Pr[1-C(=O)OEt] | Me | Me | C(=O)Me | O |
| D-15564 | Me(S) | single bond | H | c-Pr[1-C(=O)OEt] | Me | Me | C(=O)Me | O |
| D-15565 | H | single bond | Me | c-Pr[1-C(=O)OH] | Me | Cl | C(=O)Me | O |
| D-15566 | Me | single bond | H | c-Pr[1-C(=O)OH] | Me | Cl | C(=O)Me | O |
| D-15567 | Me(R) | single bond | H | c-Pr[1-C(=O)OH] | Me | Cl | C(=O)Me | O |
| D-15568 | Me(S) | single bond | H | c-Pr[1-C(=O)OH] | Me | Cl | C(=O)Me | O |
| D-15569 | H | single bond | Me | c-Pr[1-C(=O)OH] | Me | Me | C(=O)Me | O |
| D-15570 | Me | single bond | H | c-Pr[1-C(=O)OH] | Me | Me | C(=O)Me | O |
| D-15571 | Me(R) | single bond | H | c-Pr[1-C(=O)OH] | Me | Me | C(=O)Me | O |
| D-15572 | Me(S) | single bond | H | c-Pr[1-C(=O)OH] | Me | Me | C(=O)Me | O |
| D-15573 | H | single bond | Me | c-Pr[1-C(=O)$NH_2$] | Me | Cl | C(=O)Me | O |
| D-15574 | Me | single bond | H | c-Pr[1-C(=O)$NH_2$] | Me | Cl | C(=O)Me | O |
| D-15575 | Me(R) | single bond | H | c-Pr[1-C(=O)$NH_2$] | Me | Cl | C(=O)Me | O |
| D-15576 | Me(S) | single bond | H | c-Pr[1-C(=O)$NH_2$] | Me | Cl | C(=O)Me | O |
| D-15577 | H | single bond | Me | c-Pr[1-C(=O)$NH_2$] | Me | Me | C(=O)Me | O |
| D-15578 | Me | single bond | H | c-Pr[1-C(=O)$NH_2$] | Me | Me | C(=O)Me | O |
| D-15579 | Me(R) | single bond | H | c-Pr[1-C(=O)$NH_2$] | Me | Me | C(=O)Me | O |
| D-15580 | Me(S) | single bond | H | c-Pr[1-C(=O)$NH_2$] | Me | Me | C(=O)Me | O |
| D-15581 | H | single bond | Me | c-Pr(1-OMe) | Me | Cl | C(=O)Me | O |
| D-15582 | Me | single bond | H | c-Pr(1-OMe) | Me | Cl | C(=O)Me | O |
| D-15583 | Me(R) | single bond | H | c-Pr(1-OMe) | Me | Cl | C(=O)Me | O |
| D-15584 | Me(S) | single bond | H | c-Pr(1-OMe) | Me | Cl | C(=O)Me | O |
| D-15585 | H | single bond | Me | c-Pr(1-OMe) | Me | Me | C(=O)Me | O |
| D-15586 | Me | single bond | H | c-Pr(1-OMe) | Me | Me | C(=O)Me | O |
| D-15587 | Me(R) | single bond | H | c-Pr(1-OMe) | Me | Me | C(=O)Me | O |
| D-15588 | Me(S) | single bond | H | c-Pr(1-OMe) | Me | Me | C(=O)Me | O |
| D-15589 | H | single bond | Me | c-Pr(1-SMe) | Me | Cl | C(=O)Me | O |
| D-15590 | Me | single bond | H | c-Pr(1-SMe) | Me | Cl | C(=O)Me | O |
| D-15591 | Me(R) | single bond | H | c-Pr(1-SMe) | Me | Cl | C(=O)Me | O |
| D-15592 | Me(S) | single bond | H | c-Pr(1-SMe) | Me | Cl | C(=O)Me | O |
| D-15593 | H | single bond | Me | c-Pr(1-SMe) | Me | Me | C(=O)Me | O |
| D-15594 | Me | single bond | H | c-Pr(1-SMe) | Me | Me | C(=O)Me | O |

TABLE 1001

| Compound Number | Y | W | Z | $R^1$ | $R^2$ | $R^3$ | $R^{10}$ | A |
|---|---|---|---|---|---|---|---|---|
| D-15595 | Me(R) | single bond | H | c-Pr(1-SMe) | Me | Me | C(=O)Me | O |
| D-15596 | Me(S) | single bond | H | c-Pr(1-SMe) | Me | Me | C(=O)Me | O |
| D-15597 | H | single bond | Me | c-Pr[1-S(=O)Me] | Me | Cl | C(=O)Me | O |
| D-15598 | Me | single bond | H | c-Pr[1-S(=O)Me] | Me | Cl | C(=O)Me | O |
| D-15599 | Me(R) | single bond | H | c-Pr[1-S(=O)Me] | Me | Cl | C(=O)Me | O |
| D-15600 | Me(S) | single bond | H | c-Pr[1-S(=O)Me] | Me | Cl | C(=O)Me | O |
| D-15601 | H | single bond | Me | c-Pr[1-S(=O)Me] | Me | Me | C(=O)Me | O |
| D-15602 | Me | single bond | H | c-Pr[1-S(=O)Me] | Me | Me | C(=O)Me | O |
| D-15603 | Me(R) | single bond | H | c-Pr[1-S(=O)Me] | Me | Me | C(=O)Me | O |
| D-15604 | Me(S) | single bond | H | c-Pr[1-S(=O)Me] | Me | Me | C(=O)Me | O |
| D-15605 | H | single bond | Me | c-Pr[1-S(=O)$_2$Me] | Me | Cl | C(=O)Me | O |
| D-15606 | Me | single bond | H | c-Pr[1-S(=O)$_2$Me] | Me | Cl | C(=O)Me | O |
| D-15607 | Me(R) | single bond | H | c-Pr[1-S(=O)$_2$Me] | Me | Cl | C(=O)Me | O |
| D-15608 | Me(S) | single bond | H | c-Pr[1-S(=O)$_2$Me] | Me | Cl | C(=O)Me | O |
| D-15609 | H | single bond | Me | c-Pr[1-S(=O)$_2$Me] | Me | Me | C(=O)Me | O |
| D-15610 | Me | single bond | H | c-Pr[1-S(=O)$_2$Me] | Me | Me | C(=O)Me | O |
| D-15611 | Me(R) | single bond | H | c-Pr[1-S(=O)$_2$Me] | Me | Me | C(=O)Me | O |
| D-15612 | Me(S) | single bond | H | c-Pr[1-S(=O)$_2$Me] | Me | Me | C(=O)Me | O |
| D-15613 | H | single bond | Me | c-Pr[1-S(=O)$_2$$CHF_2$] | Me | Cl | C(=O)Me | O |
| D-15614 | Me | single bond | H | c-Pr[1-S(=O)$_2$$CHF_2$] | Me | Cl | C(=O)Me | O |
| D-15615 | Me(R) | single bond | H | c-Pr[1-S(=O)$_2$$CHF_2$] | Me | Cl | C(=O)Me | O |
| D-15616 | Me(S) | single bond | H | c-Pr[1-S(=O)$_2$$CHF_2$] | Me | Cl | C(=O)Me | O |
| D-15617 | H | single bond | Me | c-Pr[1-S(=O)$_2$$CHF_2$] | Me | Me | C(=O)Me | O |

TABLE 1001-continued

| Compound Number | Y | W | Z | $R^1$ | $R^2$ | $R^3$ | $R^{10}$ | A |
|---|---|---|---|---|---|---|---|---|
| D-15618 | Me | single bond | H | c-Pr[1-S(=O)$_2$CHF$_2$] | Me | Me | C(=O)Me | O |
| D-15619 | Me(R) | single bond | H | c-Pr[1-S(=O)$_2$CHF$_2$] | Me | Me | C(=O)Me | O |
| D-15620 | Me(S) | single bond | H | c-Pr[1-S(=O)$_2$CHF$_2$] | Me | Me | C(=O)Me | O |
| D-15621 | H | single bond | Me | c-Pr[1-S(=O)$_2$CF$_3$] | Me | Cl | C(=O)Me | O |
| D-15622 | Me | single bond | H | c-Pr[1-S(=O)$_2$CF$_3$] | Me | Cl | C(=O)Me | O |
| D-15623 | Me(R) | single bond | H | c-Pr[1-S(=O)$_2$CF$_3$] | Me | Cl | C(=O)Me | O |
| D-15624 | Me(S) | single bond | H | c-Pr[1-S(=O)$_2$CF$_3$] | Me | Cl | C(=O)Me | O |
| D-15625 | H | single bond | Me | c-Pr[1-S(=O)$_2$CF$_3$] | Me | Me | C(=O)Me | O |
| D-15626 | Me | single bond | H | c-Pr[1-S(=O)$_2$CF$_3$] | Me | Me | C(=O)Me | O |
| D-15627 | Me(R) | single bond | H | c-Pr[1-S(=O)$_2$CF$_3$] | Me | Me | C(=O)Me | O |
| D-15628 | Me(S) | single bond | H | c-Pr[1-S(=O)$_2$CF$_3$] | Me | Me | C(=O)Me | O |
| D-15629 | H | single bond | Me | c-Pr[1-(5,6-dihydro-1,4,2-dioxazin-3-yl)] | Me | Cl | C(=O)Me | O |
| D-15630 | Me | single bond | H | c-Pr[1-(5,6-dihydro-1,4,2-dioxazin-3-yl)] | Me | Cl | C(=O)Me | O |
| D-15631 | Me(R) | single bond | H | c-Pr[1-(5,6-dihydro-1,4,2-dioxazin-3-yl)] | Me | Cl | C(=O)Me | O |
| D-15632 | Me(S) | single bond | H | c-Pr[1-(5,6-dihydro-1,4,2-dioxazin-3-yl)] | Me | Cl | C(=O)Me | O |
| D-15633 | H | single bond | Me | c-Pr[1-(5,6-dihydro-1,4,2-dioxazin-3-yl)] | Me | Me | C(=O)Me | O |
| D-15634 | Me | single bond | H | c-Pr[1-(5,6-dihydro-1,4,2-dioxazin-3-yl)] | Me | Me | C(=O)Me | O |
| D-15635 | Me(R) | single bond | H | c-Pr[1-(5,6-dihydro-1,4,2-dioxazin-3-yl)] | Me | Me | C(=O)Me | O |
| D-15636 | Me(S) | single bond | H | c-Pr[1-(5,6-dihydro-1,4,2-dioxazin-3-yl)] | Me | Me | C(=O)Me | O |
| D-15637 | H | single bond | Me | c-Pr[1-(5-hydroxy-1,3,4-oxadiazol-2-yl)] | Me | Cl | C(=O)Me | O |
| D-15638 | Me | single bond | H | c-Pr[1-(5-hydroxy-1,3,4-oxadiazol-2-yl)] | Me | Cl | C(=O)Me | O |

TABLE 1002

| Compound Number | Y | W | Z | $R^1$ | $R^2$ | $R^3$ | $R^{10}$ | A |
|---|---|---|---|---|---|---|---|---|
| D-15639 | Me(R) | single bond | H | c-Pr[1-(5-hydroxy-1,3,4-oxadiazol-2-yl)] | Me | Cl | C(=O)Me | O |
| D-15640 | Me(S) | single bond | H | c-Pr[1-(5-hydroxy-1,3,4-oxadiazol-2-yl)] | Me | Cl | C(=O)Me | O |
| D-15641 | H | single bond | Me | c-Pr[1-(5-hydroxy-1,3,4-oxadiazol-2-yl)] | Me | Me | C(=O)Me | O |
| D-15642 | Me | single bond | H | c-Pr[1-(5-hydroxy-1,3,4-oxadiazol-2-yl)] | Me | Me | C(=O)Me | O |
| D-15643 | Me(R) | single bond | H | c-Pr[1-(5-hydroxy-1,3,4-oxadiazol-2-yl)] | Me | Me | C(=O)Me | O |
| D-15644 | Me(S) | single bond | H | c-Pr[1-(5-hydroxy-1,3,4-oxadiazol-2-yl)] | Me | Me | C(=O)Me | O |
| D-15645 | H | single bond | Me | c-Pr[1-(pyrimidin-2-yl)] | Me | Cl | C(=O)Me | O |
| D-15646 | Me | single bond | H | c-Pr[1-(pyrimidin-2-yl)] | Me | Cl | C(=O)Me | O |
| D-15647 | Me(R) | single bond | H | c-Pr[1-(pyrimidin-2-yl)] | Me | Cl | C(=O)Me | O |
| D-15648 | Me(S) | single bond | H | c-Pr[1-(pyrimidin-2-yl)] | Me | Cl | C(=O)Me | O |
| D-15649 | H | single bond | Me | c-Pr[1-(pyrimidin-2-yl)] | Me | Me | C(=O)Me | O |
| D-15650 | Me | single bond | H | c-Pr[1-(pyrimidin-2-yl)] | Me | Me | C(=O)Me | O |
| D-15651 | Me(R) | single bond | H | c-Pr[1-(pyrimidin-2-yl)] | Me | Me | C(=O)Me | O |
| D-15652 | Me(S) | single bond | H | c-Pr[1-(pyrimidin-2-yl)] | Me | Me | C(=O)Me | O |
| D-15653 | H | single bond | Me | t-Bu | Me | Cl | C(=O)Me | O |
| D-15654 | Me | single bond | H | t-Bu | Me | Cl | C(=O)Me | O |
| D-15655 | Me(R) | single bond | H | t-Bu | Me | Cl | C(=O)Me | O |
| D-15656 | Me(S) | single bond | H | t-Bu | Me | Cl | C(=O)Me | O |
| D-15657 | H | single bond | Me | t-Bu | Me | Me | C(=O)Me | O |
| D-15658 | Me | single bond | H | t-Bu | Me | Me | C(=O)Me | O |
| D-15659 | Me(R) | single bond | H | t-Bu | Me | Me | C(=O)Me | O |
| D-15660 | Me(S) | single bond | H | t-Bu | Me | Me | C(=O)Me | O |
| D-15661 | H | single bond | Me | c-Bu | Me | Cl | C(=O)Me | O |
| D-15662 | Me | single bond | H | c-Bu | Me | Cl | C(=O)Me | O |
| D-15663 | Me(R) | single bond | H | c-Bu | Me | Cl | C(=O)Me | O |
| D-15664 | Me(S) | single bond | H | c-Bu | Me | Cl | C(=O)Me | O |
| D-15665 | H | single bond | Me | c-Bu | Me | Me | C(=O)Me | O |
| D-15666 | Me | single bond | H | c-Bu | Me | Me | C(=O)Me | O |
| D-15667 | Me(R) | single bond | H | c-Bu | Me | Me | C(=O)Me | O |
| D-15668 | Me(S) | single bond | H | c-Bu | Me | Me | C(=O)Me | O |
| D-15669 | H | single bond | Me | c-Bu(1-CN) | Me | Cl | C(=O)Me | O |
| D-15670 | Me | single bond | H | c-Bu(1-CN) | Me | Cl | C(=O)Me | O |
| D-15671 | Me(R) | single bond | H | c-Bu(1-CN) | Me | Cl | C(=O)Me | O |
| D-15672 | Me(S) | single bond | H | c-Bu(1-CN) | Me | Cl | C(=O)Me | O |
| D-15673 | H | single bond | Me | c-Bu(1-CN) | Me | Me | C(=O)Me | O |
| D-15674 | Me | single bond | H | c-Bu(1-CN) | Me | Me | C(=O)Me | O |
| D-15675 | Me(R) | single bond | H | c-Bu(1-CN) | Me | Me | C(=O)Me | O |
| D-15676 | Me(S) | single bond | H | c-Bu(1-CN) | Me | Me | C(=O)Me | O |
| D-15677 | H | single bond | Me | c-Bu(3,3-F$_2$) | Me | Cl | C(=O)Me | O |
| D-15678 | Me | single bond | H | c-Bu(3,3-F$_2$) | Me | Cl | C(=O)Me | O |
| D-15679 | Me(R) | single bond | H | c-Bu(3,3-F$_2$) | Me | Cl | C(=O)Me | O |
| D-15680 | Me(S) | single bond | H | c-Bu(3,3-F$_2$) | Me | Cl | C(=O)Me | O |
| D-15681 | H | single bond | Me | c-Bu(3,3-F$_2$) | Me | Me | C(=O)Me | O |
| D-15682 | Me | single bond | H | c-Bu(3,3-F$_2$) | Me | Me | C(=O)Me | O |

TABLE 1003

| Compound Number | Y | W | Z | $R^1$ | $R^2$ | $R^3$ | $R^{10}$ | A |
|---|---|---|---|---|---|---|---|---|
| D-15683 | Me(R) | single bond | H | c-Bu(3,3-$F_2$) | Me | Me | C(=O)Me | O |
| D-15684 | Me(S) | single bond | H | c-Bu(3,3-$F_2$) | Me | Me | C(=O)Me | O |
| D-15685 | H | single bond | Me | oxetan-3-yl | Me | Cl | C(=O)Me | O |
| D-15686 | Me | single bond | H | oxetan-3-yl | Me | Cl | C(=O)Me | O |
| D-15687 | Me(R) | single bond | H | oxetan-3-yl | Me | Cl | C(=O)Me | O |
| D-15688 | Me(S) | single bond | H | oxetan-3-yl | Me | Cl | C(=O)Me | O |
| D-15689 | H | single bond | Me | oxetan-3-yl | Me | Me | C(=O)Me | O |
| D-15690 | Me | single bond | H | oxetan-3-yl | Me | Me | C(=O)Me | O |
| D-15691 | Me(R) | single bond | H | oxetan-3-yl | Me | Me | C(=O)Me | O |
| D-15692 | Me(S) | single bond | H | oxetan-3-yl | Me | Me | C(=O)Me | O |
| D-15693 | H | single bond | Me | oxetan(3-CN)-3-yl | Me | Cl | C(=O)Me | O |
| D-15694 | Me | single bond | H | oxetan(3-CN)-3-yl | Me | Cl | C(=O)Me | O |
| D-15695 | Me(R) | single bond | H | oxetan(3-CN)-3-yl | Me | Cl | C(=O)Me | O |
| D-15696 | Me(S) | single bond | H | oxetan(3-CN)-3-yl | Me | Cl | C(=O)Me | O |
| D-15697 | H | single bond | Me | oxetan(3-CN)-3-yl | Me | Me | C(=O)Me | O |
| D-15698 | Me | single bond | H | oxetan(3-CN)-3-yl | Me | Me | C(=O)Me | O |
| D-15699 | Me(R) | single bond | H | oxetan(3-CN)-3-yl | Me | Me | C(=O)Me | O |
| D-15700 | Me(S) | single bond | H | oxetan(3-CN)-3-yl | Me | Me | C(=O)Me | O |
| D-15701 | H | single bond | Me | azetidin[1-C(=O)Me]-3-yl | Me | Cl | C(=O)Me | O |
| D-15702 | Me | single bond | H | azetidin[1-C(=O)Me]-3-yl | Me | Cl | C(=O)Me | O |
| D-15703 | Me(R) | single bond | H | azetidin[1-C(=O)Me]-3-yl | Me | Cl | C(=O)Me | O |
| D-15704 | Me(S) | single bond | H | azetidin[1-C(=O)Me]-3-yl | Me | Cl | C(=O)Me | O |
| D-15705 | H | single bond | Me | azetidin[1-C(=O)Me]-3-yl | Me | Me | C(=O)Me | O |
| D-15706 | Me | single bond | H | azetidin[1-C(=O)Me]-3-yl | Me | Me | C(=O)Me | O |
| D-15707 | Me(R) | single bond | H | azetidin[1-C(=O)Me]-3-yl | Me | Me | C(=O)Me | O |
| D-15708 | Me(S) | single bond | H | azetidin[1-C(=O)Me]-3-yl | Me | Me | C(=O)Me | O |
| D-15709 | H | single bond | Me | azetidin[1-S(=O)$_2$Me]-3-yl | Me | Cl | C(=O)Me | O |
| D-15710 | Me | single bond | H | azetidin[1-S(=O)$_2$Me]-3-yl | Me | Cl | C(=O)Me | O |
| D-15711 | Me(R) | single bond | H | azetidin[1-S(=O)$_2$Me]-3-yl | Me | Cl | C(=O)Me | O |
| D-15712 | Me(S) | single bond | H | azetidin[1-S(=O)$_2$Me]-3-yl | Me | Cl | C(=O)Me | O |
| D-15713 | H | single bond | Me | azetidin[1-S(=O)$_2$Me]-3-yl | Me | Me | C(=O)Me | O |
| D-15714 | Me | single bond | H | azetidin[1-S(=O)$_2$Me]-3-yl | Me | Me | C(=O)Me | O |
| D-15715 | Me(R) | single bond | H | azetidin[1-S(=O)$_2$Me]-3-yl | Me | Me | C(=O)Me | O |
| D-15716 | Me(S) | single bond | H | azetidin[1-S(=O)$_2$Me]-3-yl | Me | Me | C(=O)Me | O |
| D-15717 | H | single bond | Me | azetidin[1-S(=O)$_2$CHF$_2$]-3-yl | Me | Cl | C(=O)Me | O |
| D-15718 | Me | single bond | H | azetidin[1-S(=O)$_2$CHF$_2$]-3-yl | Me | Cl | C(=O)Me | O |
| D-15719 | Me(R) | single bond | H | azetidin[1-S(=O)$_2$CHF$_2$]-3-yl | Me | Cl | C(=O)Me | O |
| D-15720 | Me(S) | single bond | H | azetidin[1-S(=O)$_2$CHF$_2$]-3-yl | Me | Cl | C(=O)Me | O |
| D-15721 | H | single bond | Me | azetidin[1-S(=O)$_2$CHF$_2$]-3-yl | Me | Me | C(=O)Me | O |
| D-15722 | Me | single bond | H | azetidin[1-S(=O)$_2$CHF$_2$]-3-yl | Me | Me | C(=O)Me | O |
| D-15723 | Me(R) | single bond | H | azetidin[1-S(=O)$_2$CHF$_2$]-3-yl | Me | Me | C(=O)Me | O |
| D-15724 | Me(S) | single bond | H | azetidin[1-S(=O)$_2$CHF$_2$]-3-yl | Me | Me | C(=O)Me | O |
| D-15725 | H | single bond | Me | c-Pen | Me | Cl | C(=O)Me | O |
| D-15726 | Me | single bond | H | c-Pen | Me | Cl | C(=O)Me | O |

TABLE 1004

| Compound Number | Y | W | Z | $R^1$ | $R^2$ | $R^3$ | $R^{10}$ | A |
|---|---|---|---|---|---|---|---|---|
| D-15727 | Me(R) | single bond | H | c-Pen | Me | Cl | C(=O)Me | O |
| D-15728 | Me(S) | single bond | H | c-Pen | Me | Cl | C(=O)Me | O |
| D-15729 | H | single bond | Me | c-Pen | Me | Me | C(=O)Me | O |
| D-15730 | Me | single bond | H | c-Pen | Me | Me | C(=O)Me | O |
| D-15731 | Me(R) | single bond | H | c-Pen | Me | Me | C(=O)Me | O |
| D-15732 | Me(S) | single bond | H | c-Pen | Me | Me | C(=O)Me | O |
| D-15733 | H | single bond | Me | tetrahydrofuran-3-yl | Me | Cl | C(=O)Me | O |
| D-15734 | Me | single bond | H | tetrahydrofuran-3-yl | Me | Cl | C(=O)Me | O |
| D-15735 | Me(R) | single bond | H | tetrahydrofuran-3-yl | Me | Cl | C(=O)Me | O |
| D-15736 | Me(S) | single bond | H | tetrahydrofuran-3-yl | Me | Cl | C(=O)Me | O |
| D-15737 | H | single bond | Me | tetrahydrofuran-3-yl | Me | Me | C(=O)Me | O |
| D-15738 | Me | single bond | H | tetrahydrofuran-3-yl | Me | Me | C(=O)Me | O |
| D-15739 | Me(R) | single bond | H | tetraihydrofuran-3-yl | Me | Me | C(=O)Me | O |
| D-15740 | Me(S) | single bond | H | tetrahydrofuran-3-yl | Me | Me | C(=O)Me | O |
| D-15741 | H | single bond | Me | tetrahydrothiophen-3-yl | Me | Cl | C(=O)Me | O |
| D-15742 | Me | single bond | H | tetrahydrothiophen-3-yl | Me | Cl | C(=O)Me | O |
| D-15743 | Me(R) | single bond | H | tetrahydrothiophen-3-yl | Me | Cl | C(=O)Me | O |
| D-15744 | Me(S) | single bond | H | tetrahydrothiophen-3-yl | Me | Cl | C(=O)Me | O |
| D-15745 | H | single bond | Me | tetrahydrothiophen-3-yl | Me | Me | C(=O)Me | O |
| D-15746 | Me | single bond | H | tetrahydrothiophen-3-yl | Me | Me | C(=O)Me | O |
| D-15747 | Me(R) | single bond | H | tetrahydrothiophen-3-yl | Me | Me | C(=O)Me | O |

TABLE 1004-continued

| Compound Number | Y | W | Z | $R^1$ | $R^2$ | $R^3$ | $R^{10}$ | A |
|---|---|---|---|---|---|---|---|---|
| D-15748 | Me(S) | single bond | H | tetrahydrothiophen-3-yl | Me | Me | C(═O)Me | O |
| D-15749 | H | single bond | Me | c-Pen(1-CN) | Me | Cl | C(═O)Me | O |
| D-15750 | Me | single bond | H | c-Pen(1-CN) | Me | Cl | C(═O)Me | O |
| D-15751 | Me(R) | single bond | H | c-Pen(1-CN) | Me | Cl | C(═O)Me | O |
| D-15752 | Me(S) | single bond | H | c-Pen(1-CN) | Me | Cl | C(═O)Me | O |
| D-15753 | H | single bond | Me | c-Pen(1-CN) | Me | Me | C(═O)Me | O |
| D-15754 | Me | single bond | H | c-Pen(1-CN) | Me | Me | C(═O)Me | O |
| D-15755 | Me(R) | single bond | H | c-Pen(1-CN) | Me | Me | C(═O)Me | O |
| D-15756 | Me(S) | single bond | H | c-Pen(1-CN) | Me | Me | C(═O)Me | O |
| D-15757 | H | single bond | Me | tetrahydrofuran(3-CN)-3-yl | Me | Cl | C(═O)Me | O |
| D-15758 | Me | single bond | H | tetrahydrofuran(3-CN)-3-yl | Me | Cl | C(═O)Me | O |
| D-15759 | Me(R) | single bond | H | tetrahydrofuran(3-CN)-3-yl | Me | Cl | C(═O)Me | O |
| D-15760 | Me(S) | single bond | H | tetrahydrofuran(3-CN)-3-yl | Me | Cl | C(═O)Me | O |
| D-15761 | H | single bond | Me | tetrahydrofuran(3-CN)-3-yl | Me | Me | C(═O)Me | O |
| D-15762 | Me | single bond | H | tetrahydrofuran(3-CN)-3-yl | Me | Me | C(═O)Me | O |
| D-15763 | Me(R) | single bond | H | tetrahydrofuran(3-CN)-3-yl | Me | Me | C(═O)Me | O |
| D-15764 | Me(S) | single bond | H | tetrahydrofuran(3-CN)-3-yl | Me | Me | C(═O)Me | O |
| D-15765 | H | single bond | Me | tetrahydrothiophen(3-CN)-3-yl | Me | Cl | C(═O)Me | O |
| D-15766 | Me | single bond | H | tetrahydrothiophen(3-CN)-3-yl | Me | Cl | C(═O)Me | O |
| D-15767 | Me(R) | single bond | H | tetrahydrothiophen(3-CN)-3-yl | Me | Cl | C(═O)Me | O |
| D-15768 | Me(S) | single bond | H | tetrahydrothiophen(3-CN)-3-yl | Me | Cl | C(═O)Me | O |
| D-15769 | H | single bond | Me | tetrahydrothiophen(3-CN)-3-yl | Me | Me | C(═O)Me | O |
| D-15770 | Me | single bond | H | tetrahydrothiophen(3-CN)-3-yl | Me | Me | C(═O)Me | O |

TABLE 1005

| Compound Number | Y | W | Z | $R^1$ | $R^2$ | $R^3$ | $R^{10}$ | A |
|---|---|---|---|---|---|---|---|---|
| D-15771 | Me(R) | single bond | H | tetrahydrothiophen(3-CN)-3-yl | Me | Me | C(═O)Me | O |
| D-15772 | Me(S) | single bond | H | tetrahydrothiophen(3-CN)-3-yl | Me | Me | C(═O)Me | O |
| D-15773 | H | single bond | Me | bicyclo[1.1.1]pentan-1-yl | Me | Cl | C(═O)Me | O |
| D-15774 | Me | single bond | H | bicyclo[1.1.1]pentan-1-yl | Me | Cl | C(═O)Me | O |
| D-15775 | Me(R) | single bond | H | bicyclo[1.1.1]pentan-1-yl | Me | Cl | C(═O)Me | O |
| D-15776 | Me(S) | single bond | H | bicyclo[1.1.1]pentan-1-yl | Me | Cl | C(═O)Me | O |
| D-15777 | H | single bond | Me | bicyclo[1.1.1]pentan-1-yl | Me | Me | C(═O)Me | O |
| D-15778 | Me | single bond | H | bicyclo[1.1.1]pentan-1-yl | Me | Me | C(═O)Me | O |
| D-15779 | Me(R) | single bond | H | bicyclo[1.1.1]pentan-1-yl | Me | Me | C(═O)Me | O |
| D-15780 | Me(S) | single bond | H | bicyclo[1.1.1]pentan-1-yl | Me | Me | C(═O)Me | O |
| D-15781 | H | single bond | Me | c-Hex | Me | Cl | C(═O)Me | O |
| D-15782 | Me | single bond | H | c-Hex | Me | Cl | C(═O)Me | O |
| D-15783 | Me(R) | single bond | H | c-Hex | Me | Cl | C(═O)Me | O |
| D-15784 | Me(S) | single bond | H | c-Hex | Me | Cl | C(═O)Me | O |
| D-15785 | H | single bond | Me | c-Hex | Me | Me | C(═O)Me | O |
| D-15786 | Me | single bond | H | c-Hex | Me | Me | C(═O)Me | O |
| D-15787 | Me(R) | single bond | H | c-Hex | Me | Me | C(═O)Me | O |
| D-15788 | Me(S) | single bond | H | c-Hex | Me | Me | C(═O)Me | O |
| D-15789 | H | single bond | Me | tetrahydropyran-4-yl | Me | Cl | C(═O)Me | O |
| D-15790 | Me | single bond | H | tetrahydropyran-4-yl | Me | Cl | C(═O)Me | O |
| D-15791 | Me(R) | single bond | H | tetrahydropyran-4-yl | Me | Cl | C(═O)Me | O |
| D-15792 | Me(S) | single bond | H | tetrahydropyran-4-yl | Me | Cl | C(═O)Me | O |
| D-15793 | H | single bond | Me | tetrahydropyran-4-yl | Me | Me | C(═O)Me | O |
| D-15794 | Me | single bond | H | tetrahydropyran-4-yl | Me | Me | C(═O)Me | O |
| D-15795 | Me(R) | single bond | H | tetrahydropyran-4-yl | Me | Me | C(═O)Me | O |
| D-15796 | Me(S) | single bond | H | tetrahydropyran-4-yl | Me | Me | C(═O)Me | O |
| D-15797 | H | single bond | Me | tetrahydrothiopyran-4-yl | Me | Cl | C(═O)Me | O |
| D-15798 | Me | single bond | H | tetrahydrothiopyran-4-yl | Me | Cl | C(═O)Me | O |
| D-15799 | Me(R) | single bond | H | tetrahydrothiopyran-4-yl | Me | Cl | C(═O)Me | O |
| D-15800 | Me(S) | single bond | H | tetrahydrothiopyran-4-yl | Me | Cl | C(═O)Me | O |
| D-15801 | H | single bond | Me | tetrahydrothiopyran-4-yl | Me | Me | C(═O)Me | O |
| D-15802 | Me | single bond | H | tetrahydrothiopyran-4-yl | Me | Me | C(═O)Me | O |
| D-15803 | Me(R) | single bond | H | tetrahydrothiopyran-4-yl | Me | Me | C(═O)Me | O |
| D-15804 | Me(S) | single bond | H | tetrahydrothiopyran-4-yl | Me | Me | C(═O)Me | O |
| D-15805 | H | single bond | Me | c-Hex(1-CN) | Me | Cl | C(═O)Me | O |
| D-15806 | Me | single bond | H | c-Hex(1-CN) | Me | Cl | C(═O)Me | O |
| D-15807 | Me(R) | single bond | H | c-Hex(1-CN) | Me | Cl | C(═O)Me | O |
| D-15808 | Me(S) | single bond | H | c-Hex(1-CN) | Me | Cl | C(═O)Me | O |
| D-15809 | H | single bond | Me | c-Hex(1-CN) | Me | Me | C(═O)Me | O |
| D-15810 | Me | single bond | H | c-Hex(1-CN) | Me | Me | C(═O)Me | O |
| D-15811 | Me(R) | single bond | H | c-Hex(1-CN) | Me | Me | C(═O)Me | O |
| D-15812 | Me(S) | single bond | H | c-Hex(1-CN) | Me | Me | C(═O)Me | O |

TABLE 1005-continued

| Compound Number | Y | W | Z | $R^1$ | $R^2$ | $R^3$ | $R^{10}$ | A |
|---|---|---|---|---|---|---|---|---|
| D-15813 | H | single bond | Me | tetrahydropyran(4-CN)-4-yl | Me | Cl | C(=O)Me | O |
| D-15814 | Me | single bond | H | tetrahydropyran(4-CN)-4-yl | Me | Cl | C(=O)Me | O |

TABLE 1006

| Compound Number | Y | W | Z | $R^1$ | $R^2$ | $R^3$ | $R^{10}$ | A |
|---|---|---|---|---|---|---|---|---|
| D-15815 | Me(R) | single bond | H | tetrahydropyran(4-CN)-4-yl | Me | Cl | C(=O)Me | O |
| D-15816 | Me(S) | single bond | H | tetrahydropyran(4-CN)-4-yl | Me | Cl | C(=O)Me | O |
| D-15817 | H | single bond | Me | tetrahydropyran(4-CN)-4-yl | Me | Me | C(=O)Me | O |
| D-15818 | Me | single bond | H | tetrahydropyran(4-CN)-4-yl | Me | Me | C(=O)Me | O |
| D-15819 | Me(R) | single bond | H | tetrahydropyran(4-CN)-4-yl | Me | Me | C(=O)Me | O |
| D-15820 | Me(S) | single bond | H | tetrahydropyran(4-CN)-4-yl | Me | Me | C(=O)Me | O |
| D-15821 | H | single bond | Me | tetrahydrothiopyran(4-CN)-4-yl | Me | Cl | C(=O)Me | O |
| D-15822 | Me | single bond | H | tetrahydrothiopyran(4-CN)-4-yl | Me | Cl | C(=O)Me | O |
| D-15823 | Me(R) | single bond | H | tetrahydrothiopyran(4-CN)-4-yl | Me | C | C(=O)Me | O |
| D-15824 | Me(S) | single bond | H | tetrahydrothiopyran(4-CN)-4-yl | Me | Cl | C(=O)Me | O |
| D-15825 | H | single bond | Me | tetrahydrothiopyran(4-CN)-4-yl | Me | Me | C(=O)Me | O |
| D-15826 | Me | single bond | H | tetrahydrothiopyran(4-CN)-4-yl | Me | Me | C(=O)Me | O |
| D-15827 | Me(R) | single bond | H | tetrahydrothiopyran(4-CN)-4-yl | Me | Me | C(=O)Me | O |
| D-15828 | Me(S) | single bond | H | tetrahydrothiopyran(4-CN)-4-yl | Me | Me | C(=O)Me | O |
| D-15829 | H | single bond | Me | $CH_2$(c-Pr) | Me | Cl | C(=O)Me | O |
| D-15830 | Me | single bond | H | $CH_2$(c-Pr) | Me | C | C(=O)Me | O |
| D-15831 | Me(R) | single bond | H | $CH_2$(c-Pr) | Me | Cl | C(=O)Me | O |
| D-15832 | Me(S) | single bond | H | $CH_2$(c-Pr) | Me | Cl | C(=O)Me | O |
| D-15833 | H | single bond | Me | $CH_2$(c-Pr) | Me | Me | C(=O)Me | O |
| D-15834 | Me | single bond | H | $CH_2$(c-Pr) | Me | Me | C(=O)Me | O |
| D-15835 | Me(R) | single bond | H | $CH_2$(c-Pr) | Me | Me | C(=O)Me | O |
| D-15836 | Me(S) | single bond | H | $CH_2$(c-Pr) | Me | Me | C(=O)Me | O |
| D-15837 | H | single bond | Me | $CH_2$[c-Pr(1-CN)] | Me | Cl | C(=O)Me | O |
| D-15838 | Me | single bond | H | $CH_2$[c-Pr(1-CN)] | Me | Cl | C(=O)Me | O |
| D-15839 | Me(R) | single bond | H | $CH_2$[c-Pr(1-CN)] | Me | Cl | C(=O)Me | O |
| D-15840 | Me(S) | single bond | H | $CH_2$[c-Pr(1-CN)] | Me | Cl | C(=O)Me | O |
| D-15841 | H | single bond | Me | $CH_2$[c-Pr(1-CN)] | Me | Me | C(=O)Me | O |
| D-15842 | Me | single bond | H | $CH_2$[c-Pr(1-CN)] | Me | Me | C(=O)Me | O |
| D-15843 | Me(R) | single bond | H | $CH_2$[c-Pr(1-CN)] | Me | Me | C(=O)Me | O |
| D-15844 | Me(S) | single bond | H | $CH_2$[c-Pr(1-CN)] | Me | Me | C(=O)Me | O |
| D-15845 | H | single bond | Me | CH(Me)(c-Pr) | Me | C | C(=O)Me | O |
| D-15846 | Me | single bond | H | CH(Me)(c-Pr) | Me | Cl | C(=O)Me | O |
| D-15847 | Me(R) | single bond | H | CH(Me)(c-Pr) | Me | Cl | C(=O)Me | O |
| D-15848 | Me(S) | single bond | H | CH(Me)(c-Pr) | Me | Cl | C(=O)Me | O |
| D-15849 | H | single bond | Me | CH(Me)(c-Pr) | Me | Me | C(=O)Me | O |
| D-15850 | Me | single bond | H | CH(Me)(c-Pr) | Me | Me | C(=O)Me | O |
| D-15851 | Me(R) | single bond | H | CH(Me)(c-Pr) | Me | Me | C(=O)Me | O |
| D-15852 | Me(S) | single bond | H | CH(Me)(c-Pr) | Me | Me | C(=O)Me | O |
| D-15853 | H | single bond | Me | CH(Me)$CH_2$OMe | Me | Cl | C(=O)Me | O |
| D-15854 | Me | single bond | H | CH(Me)$CH_2$OMe | Me | Cl | C(=O)Me | O |
| D-15855 | Me(R) | single bond | H | CH(Me)$CH_2$OMe | Me | Cl | C(=O)Me | O |
| D-15856 | Me(S) | single bond | H | CH(Me)$CH_2$OMe | Me | Cl | C(=O)Me | O |
| D-15857 | H | single bond | Me | CH(Me)$CH_2$OMe | Me | Me | C(=O)Me | O |
| D-15858 | Me | single bond | H | CH(Me)$CH_2$OMe | Me | Me | C(=O)Me | O |

TABLE 1007

| Compound Number | Y | W | Z | $R^1$ | $R^2$ | $R^3$ | $R^{10}$ | A |
|---|---|---|---|---|---|---|---|---|
| D-15859 | Me(R) | single bond | H | CH(Me)$CH_2$OMe | Me | Me | C(=O)Me | O |
| D-15860 | Me(S) | single bond | H | CH(Me)$CH_2$OMe | Me | Me | C(=O)Me | O |
| D-15861 | H | single bond | Me | $CH_2CH{=}CH_2$ | Me | Cl | C(=O)Me | O |
| D-15862 | Me | single bond | H | $CH_2CH{=}CH_2$ | Me | Cl | C(=O)Me | O |
| D-15863 | Me(R) | single bond | H | $CH_2CH{=}CH_2$ | Me | Cl | C(=O)Me | O |
| D-15864 | Me(S) | single bond | H | $CH_2CH{=}CH_2$ | Me | Cl | C(=O)Me | O |
| D-15865 | H | single bond | Me | $CH_2CH{=}CH_2$ | Me | Me | C(=O)Me | O |
| D-15866 | Me | single bond | H | $CH_2CH{=}CH_2$ | Me | Me | C(=O)Me | O |
| D-15867 | Me(R) | single bond | H | $CH_2CH{=}CH_2$ | Me | Me | C(=O)Me | O |
| D-15868 | Me(S) | single bond | H | $CH_2CH{=}CH_2$ | Me | Me | C(=O)Me | O |
| D-15869 | H | single bond | Me | $CH_2C{\equiv}CH$ | Me | Cl | C(=O)Me | O |
| D-15870 | Me | single bond | H | $CH_2C{\equiv}CH$ | Me | Cl | C(=O)Me | O |

TABLE 1007-continued

| Compound Number | Y | W | Z | $R^1$ | $R^2$ | $R^3$ | $R^{10}$ | A |
|---|---|---|---|---|---|---|---|---|
| D-15871 | Me(R) | single bond | H | $CH_2C≡CH$ | Me | Cl | C(=O)Me | O |
| D-15872 | Me(S) | single bond | H | $CH_2C≡CH$ | Me | Cl | C(=O)Me | O |
| D-15873 | H | single bond | Me | $CH_2C≡CH$ | Me | Me | C(=O)Me | O |
| D-15874 | Me | single bond | H | $CH_2C≡CH$ | Me | Me | C(=O)Me | O |
| D-15875 | Me(R) | single bond | H | $CH_2C≡CH$ | Me | Me | C(=O)Me | O |
| D-15876 | Me(S) | single bond | H | $CH_2C≡CH$ | Me | Me | C(=O)Me | O |
| D-15877 | H | single bond | Me | $CH_2CN$ | Me | Cl | C(=O)Me | O |
| D-15878 | Me | single bond | H | $CH_2CN$ | Me | Cl | C(=O)Me | O |
| D-15879 | Me(R) | single bond | H | $CH_2CN$ | Me | Cl | C(=O)Me | O |
| D-15880 | Me(S) | single bond | H | $CH_2CN$ | Me | Cl | C(=O)Me | O |
| D-15881 | H | single bond | Me | $CH_2CN$ | Me | Me | C(=O)Me | O |
| D-15882 | Me | single bond | H | $CH_2CN$ | Me | Me | C(=O)Me | O |
| D-15883 | Me(R) | single bond | H | $CH_2CN$ | Me | Me | C(=O)Me | O |
| D-15884 | Me(S) | single bond | H | $CH_2CN$ | Me | Me | C(=O)Me | O |
| D-15885 | H | single bond | Me | CH(Me)CN | Me | Cl | C(=O)Me | O |
| D-15886 | Me | single bond | H | CH(Me)CN | Me | Cl | C(=O)Me | O |
| D-15887 | Me(R) | single bond | H | CH(Me)CN | Me | Cl | C(=O)Me | O |
| D-15888 | Me(S) | single bond | H | CH(Me)CN | Me | Cl | C(=O)Me | O |
| D-15889 | H | single bond | Me | CH(Me)CN | Me | Me | C(=O)Me | O |
| D-15890 | Me | single bond | H | CH(Me)CN | Me | Me | C(=O)Me | O |
| D-15891 | Me(R) | single bond | H | CH(Me)CN | Me | Me | C(=O)Me | O |
| D-15892 | Me(S) | single bond | H | CH(Me)CN | Me | Me | C(=O)Me | O |
| D-15893 | H | single bond | Me | $C(Me)_2CN$ | Me | Cl | C(=O)Me | O |
| D-15894 | Me | single bond | H | $C(Me)_2CN$ | Me | Cl | C(=O)Me | O |
| D-15895 | Me(R) | single bond | H | $C(Me)_2CN$ | Me | Cl | C(=O)Me | O |
| D-15896 | Me(S) | single bond | H | $C(Me)_2CN$ | Me | Cl | C(=O)Me | O |
| D-15897 | H | single bond | Me | $C(Me)_2CN$ | Me | Me | C(=O)Me | O |
| D-15898 | Me | single bond | H | $C(Me)_2CN$ | Me | Me | C(=O)Me | O |
| D-15899 | Me(R) | single bond | H | $C(Me)_2CN$ | Me | Me | C(=O)Me | O |
| D-15900 | Me(S) | single bond | H | $C(Me)_2CN$ | Me | Me | C(=O)Me | O |
| D-15901 | H | single bond | Me | C(Me)(i-Pr)CN | Me | Cl | C(=O)Me | O |
| D-15902 | Me | single bond | H | C(Me)(i-Pr)CN | Me | Cl | C(=O)Me | O |

TABLE 1008

| Compound Number | Y | W | Z | $R^1$ | $R^2$ | $R^3$ | $R^{10}$ | A |
|---|---|---|---|---|---|---|---|---|
| D-15903 | Me(R) | single bond | H | C(Me)(i-Pr)CN | Me | Cl | C(=O)Me | O |
| D-15904 | Me(S) | single bond | H | C(Me)(i-Pr)CN | Me | Cl | C(=O)Me | O |
| D-15905 | H | single bond | Me | C(Me)(i-Pr)CN | Me | Me | C(=O)Me | O |
| D-15906 | Me | single bond | H | C(Me)(i-Pr)CN | Me | Me | C(=O)Me | O |
| D-15907 | Me(R) | single bond | H | C(Me)(i-Pr)CN | Me | Me | C(=O)Me | O |
| D-15908 | Me(S) | single bond | H | C(Me)(i-Pr)CN | Me | Me | C(=O)Me | O |
| D-15909 | H | single bond | Me | OMe | Me | Cl | C(=O)Me | O |
| D-15910 | Me | single bond | H | OMe | Me | Cl | C(=O)Me | O |
| D-15911 | Me(R) | single bond | H | OMe | Me | Cl | C(=O)Me | O |
| D-15912 | Me(S) | single bond | H | OMe | Me | Cl | C(=O)Me | O |
| D-15913 | H | single bond | Me | OMe | Me | Me | C(=O)Me | O |
| D-15914 | Me | single bond | H | OMe | Me | Me | C(=O)Me | O |
| D-15915 | Me(R) | single bond | H | OMe | Me | Me | C(=O)Me | O |
| D-15916 | Me(S) | single bond | H | OMe | Me | Me | C(=O)Me | O |
| D-15917 | H | single bond | Me | CH=NOMe | Me | Cl | C(=O)Me | O |
| D-15918 | Me | single bond | H | CH=NOMe | Me | Cl | C(=O)Me | O |
| D-15919 | Me(R) | single bond | H | CH=NOMe | Me | Cl | C(=O)Me | O |
| D-15920 | Me(S) | single bond | H | CH=NOMe | Me | Cl | C(=O)Me | O |
| D-15921 | H | single bond | Me | CH=NOMe | Me | Me | C(=O)Me | O |
| D-15922 | Me | single bond | H | CH=NOMe | Me | Me | C(=O)Me | O |
| D-15923 | Me(R) | single bond | H | CH=NOMe | Me | Me | C(=O)Me | O |
| D-15924 | Me(S) | single bond | H | CH=NOMe | Me | Me | C(=O)Me | O |
| D-15925 | H | single bond | Me | morpholin-4-yl | Me | Cl | C(=O)Me | O |
| D-15926 | Me | single bond | H | morpholin-4-yl | Me | Cl | C(=O)Me | O |
| D-15927 | Me(R) | single bond | H | morpholin-4-yl | Me | Cl | C(=O)Me | O |
| D-15928 | Me(S) | single bond | H | morpholin-4-yl | Me | Cl | C(=O)Me | O |
| D-15929 | H | single bond | Me | morpholin-4-yl | Me | Me | C(=O)Me | O |
| D-15930 | Me | single bond | H | morpholin-4-yl | Me | Me | C(=O)Me | O |
| D-15931 | Me(R) | single bond | H | morpholin-4-yl | Me | Me | C(=O)Me | O |
| D-15932 | Me(S) | single bond | H | morpholin-4-yl | Me | Me | C(=O)Me | O |
| D-15933 | H | single bond | Me | Ph | Me | Cl | C(=O)Me | O |
| D-15934 | Me | single bond | H | Ph | Me | Cl | C(=O)Me | O |
| D-15935 | Me(R) | single bond | H | Ph | Me | Cl | C(=O)Me | O |
| D-15936 | Me(S) | single bond | H | Ph | Me | Cl | C(=O)Me | O |
| D-15937 | H | single bond | Me | Ph | Me | Me | C(=O)Me | O |

TABLE 1008-continued

| Compound Number | Y | W | Z | $R^1$ | $R^2$ | $R^3$ | $R^{10}$ | A |
|---|---|---|---|---|---|---|---|---|
| D-15938 | Me | single bond | H | Ph | Me | Me | C(═O)Me | O |
| D-15939 | Me(R) | single bond | H | Ph | Me | Me | C(═O)Me | O |
| D-15940 | Me(S) | single bond | H | Ph | Me | Me | C(═O)Me | O |
| D-15941 | H | single bond | Me | $CH_2Ph$ | Me | Cl | C(═O)Me | O |
| D-15942 | Me | single bond | H | $CH_2Ph$ | Me | Cl | C(═O)Me | O |
| D-15943 | Me(R) | single bond | H | $CH_2Ph$ | Me | Cl | C(═O)Me | O |
| D-15944 | Me(S) | single bond | H | $CH_2Ph$ | Me | Cl | C(═O)Me | O |
| D-15945 | H | single bond | Me | $CH_2Ph$ | Me | Me | C(═O)Me | O |
| D-15946 | Me | single bond | H | $CH_2Ph$ | Me | Me | C(═O)Me | O |

TABLE 1009

| Compound Number | Y | W | Z | $R^1$ | $R^2$ | $R^3$ | $R^{10}$ | A |
|---|---|---|---|---|---|---|---|---|
| D-15947 | Me(R) | single bond | H | $CH_2Ph$ | Me | Me | C(═O)Me | O |
| D-15948 | Me(S) | single bond | H | $CH_2Ph$ | Me | Me | C(═O)Me | O |
| D-15949 | H | single bond | Me | thiazole-2-yl | Me | Cl | C(═O)Me | O |
| D-15950 | Me | single bond | H | thiazole-2-yl | Me | Cl | C(═O)Me | O |
| D-15951 | Me(R) | single bond | H | thiazole-2-yl | Me | Cl | C(═O)Me | O |
| D-15952 | Me(S) | single bond | H | thiazole-2-yl | Me | Cl | C(═O)Me | O |
| D-15953 | H | single bond | Me | thiazole-2-yl | Me | Me | C(═O)Me | O |
| D-15954 | Me | single bond | H | thiazole-2-yl | Me | Me | C(═O)Me | O |
| D-15955 | Me(R) | single bond | H | thiazole-2-yl | Me | Me | C(═O)Me | O |
| D-15956 | Me(S) | single bond | H | thiazole-2-yl | Me | Me | C(═O)Me | O |
| D-15957 | H | single bond | Me | 1-Me-pyrazol-3-yl | Me | Cl | C(═O)Me | O |
| D-15958 | Me | single bond | H | 1-Me-pyrazol-3-yl | Me | Cl | C(═O)Me | O |
| D-15959 | Me(R) | single bond | H | 1-Me-pyrazol-3-yl | Me | Cl | C(═O)Me | O |
| D-15960 | Me(S) | single bond | H | 1-Me-pyrazol-3-yl | Me | Cl | C(═O)Me | O |
| D-15961 | H | single bond | Me | 1-Me-pyrazol-3-yl | Me | Me | C(═O)Me | O |
| D-15962 | Me | single bond | H | 1-Me-pyrazol-3-yl | Me | Me | C(═O)Me | O |
| D-15963 | Me(R) | single bond | H | 1-Me-pyrazol-3-yl | Me | Me | C(═O)Me | O |
| D-15964 | Me(S) | single bond | H | 1-Me-pyrazol-3-yl | Me | Me | C(═O)Me | O |
| D-15965 | H | single bond | Me | 1-Me-pyrazol-5-yl | Me | Cl | C(═O)Me | O |
| D-15966 | Me | single bond | H | 1-Me-pyrazol-5-yl | Me | Cl | C(═O)Me | O |
| D-15967 | Me(R) | single bond | H | 1-Me-pyrazol-5-yl | Me | Cl | C(═O)Me | O |
| D-15968 | Me(S) | single bond | H | 1-Me-pyrazol-5-yl | Me | Cl | C(═O)Me | O |
| D-15969 | H | single bond | Me | 1-Me-pyrazol-5-yl | Me | Me | C(═O)Me | O |
| D-15970 | Me | single bond | H | 1-Me-pyrazol-5-yl | Me | Me | C(═O)Me | O |
| D-15971 | Me(R) | single bond | H | 1-Me-pyrazol-5-yl | Me | Me | C(═O)Me | O |
| D-15972 | Me(S) | single bond | H | 1-Me-pyrazol-5-yl | Me | Me | C(═O)Me | O |
| D-15973 | H | single bond | Me | $CH_2$(pyrimidin-2-yl) | Me | Cl | C(═O)Me | O |
| D-15974 | Me | single bond | H | $CH_2$(pyrimidin-2-yl) | Me | Cl | C(═O)Me | O |
| D-15975 | Me(R) | single bond | H | $CH_2$(pyrimidin-2-yl) | Me | Cl | C(═O)Me | O |
| D-15976 | Me(S) | single bond | H | $CH_2$(pyrimidin-2-yl) | Me | Cl | C(═O)Me | O |
| D-15977 | H | single bond | Me | $CH_2$(pyrimidin-2-yl) | Me | Me | C(═O)Me | O |
| D-15978 | Me | single bond | H | $CH_2$(pyrimidin-2-yl) | Me | Me | C(═O)Me | O |
| D-15979 | Me(R) | single bond | H | $CH_2$(pyrimidin-2-yl) | Me | Me | C(═O)Me | O |
| D-15980 | Me(S) | single bond | H | $CH_2$(pyrimidin-2-yl) | Me | Me | C(═O)Me | O |
| D-15981 | H | single bond | Me | Me | C(═O)Me | Cl | H | O |
| D-15982 | Me | single bond | H | Me | C(═O)Me | Cl | H | O |
| D-15983 | Me(R) | single bond | H | Me | C(═O)Me | Cl | H | O |
| D-15984 | Me(S) | single bond | H | Me | C(═O)Me | Cl | H | O |
| D-15985 | H | single bond | Me | Me | C(═O)Me | Me | H | O |
| D-15986 | Me | single bond | H | Me | C(═O)Me | Me | H | O |
| D-15987 | Me(R) | single bond | H | Me | C(═O)Me | Me | H | O |
| D-15988 | Me(S) | single bond | H | Me | C(═O)Me | Me | H | O |
| D-15989 | H | single bond | Me | $CH_2CHF_2$ | C(═O)Me | Cl | H | O |
| D-15990 | Me | single bond | H | $CH_2CHF_2$ | C(═O)Me | Cl | H | O |

TABLE 1010

| Compound Number | Y | W | Z | $R^1$ | $R^2$ | $R^3$ | $R^{10}$ | A |
|---|---|---|---|---|---|---|---|---|
| D-15991 | Me(R) | single bond | H | $CH_2CHF_2$ | C(═O)Me | Cl | H | O |
| D-15992 | Me(S) | single bond | H | $CH_2CHF_2$ | C(═O)Me | Cl | H | O |
| D-15993 | H | single bond | Me | $CH_2CHF_2$ | C(═O)Me | Me | H | O |

TABLE 1010-continued

| Compound Number | Y | W | Z | $R^1$ | $R^2$ | $R^3$ | $R^{10}$ | A |
|---|---|---|---|---|---|---|---|---|
| D-15994 | Me | single bond | H | $CH_2CHF_2$ | C(=O)Me | Me | H | O |
| D-15995 | Me(R) | single bond | H | $CH_2CHF_2$ | C(=O)Me | Me | H | O |
| D-15996 | Me(S) | single bond | H | $CH_2CHF_2$ | C(=O)Me | Me | H | O |
| D-15997 | H | single bond | Me | n-Pr | C(=O)Me | Cl | H | O |
| D-15998 | Me | single bond | H | n-Pr | C(=O)Me | Cl | H | O |
| D-15999 | Me(R) | single bond | H | n-Pr | C(=O)Me | Cl | H | O |
| D-16000 | Me(S) | single bond | H | n-Pr | C(=O)Me | Cl | H | O |
| D-16001 | H | single bond | Me | n-Pr | C(=O)Me | Me | H | O |
| D-16002 | Me | single bond | H | n-Pr | C(=O)Me | Me | H | O |
| D-16003 | Me(R) | single bond | H | n-Pr | C(=O)Me | Me | H | O |
| D-16004 | Me(S) | single bond | H | n-Pr | C(=O)Me | Me | H | O |
| D-16005 | H | single bond | Me | i-Pr | C(=O)Me | Cl | H | O |
| D-16006 | Me | single bond | H | i-Pr | C(=O)Me | Cl | H | O |
| D-16007 | Me(R) | single bond | H | i-Pr | C(=O)Me | Cl | H | O |
| D-16008 | Me(S) | single bond | H | i-Pr | C(=O)Me | Cl | H | O |
| D-16009 | H | single bond | Me | i-Pr | C(=O)Me | Me | H | O |
| D-16010 | Me | single bond | H | i-Pr | C(=O)Me | Me | H | O |
| D-16011 | Me(R) | single bond | H | i-Pr | C(=O)Me | Me | H | O |
| D-16012 | Me(S) | single bond | H | i-Pr | C(=O)Me | Me | H | O |
| D-16013 | H | single bond | Me | c-Pr(1-F) | C(=O)Me | Cl | H | O |
| D-16014 | Me | single bond | H | c-Pr(1-F) | C(=O)Me | Cl | H | O |
| D-16015 | Me(R) | single bond | H | c-Pr(1-F) | C(=O)Me | Cl | H | O |
| D-16016 | Me(S) | single bond | H | c-Pr(1-F) | C(=O)Me | Cl | H | O |
| D-16017 | H | single bond | Me | c-Pr(1-F) | C(=O)Me | Me | H | O |
| D-16018 | Me | single bond | H | c-Pr(1-F) | C(=O)Me | Me | H | O |
| D-16019 | Me(R) | single bond | H | c-Pr(1-F) | C(=O)Me | Me | H | O |
| D-16020 | Me(S) | single bond | H | c-Pr(1-F) | C(=O)Me | Me | H | O |
| D-16021 | H | single bond | Me | c-Pr(2,2-$F_2$) | C(=O)Me | Cl | H | O |
| D-16022 | Me | single bond | H | c-Pr(2,2-$F_2$) | C(=O)Me | | H | O |
| D-16023 | Me(R) | single bond | H | c-Pr(2,2-$F_2$) | C(=O)Me | Cl | H | O |
| D-16024 | Me(S) | single bond | H | c-Pr(2,2-$F_2$) | C(=O)Me | Cl | H | O |
| D-16025 | H | single bond | Me | c-Pr(2,2-$F_2$) | C(=O)Me | Me | H | O |
| D-16026 | Me | single bond | H | c-Pr(2,2-$F_2$) | C(=O)Me | Me | H | O |
| D-16027 | Me(R) | single bond | H | c-Pr(2,2-$F_2$) | C(=O)Me | Me | H | O |
| D-16028 | Me(S) | single bond | H | c-Pr(2,2-$F_2$) | C(=O)Me | Me | H | O |
| D-16029 | H | single bond | Me | c-Pr(1-Cl) | C(=O)Me | Cl | H | O |
| D-16030 | Me | single bond | H | c-Pr(1-Cl) | C(=O)Me | Cl | H | O |
| D-16031 | Me(R) | single bond | H | c-Pr(1-Cl) | C(=O)Me | Cl | H | O |
| D-16032 | Me(S) | single bond | H | c-Pr(1-Cl) | C(=O)Me | Cl | H | O |
| D-16033 | H | single bond | Me | c-Pr(1-Cl) | C(=O)Me | Me | H | O |
| D-16034 | Me | single bond | H | c-Pr(1-Cl) | C(=O)Me | Me | H | O |

TABLE 1011

| Compound Number | Y | W | Z | $R^1$ | $R^2$ | $R^3$ | $R^{10}$ | A |
|---|---|---|---|---|---|---|---|---|
| D-16035 | Me(R) | single bond | H | c-Pr(1-Cl) | C(=O)Me | Me | H | O |
| D-16036 | Me(S) | single bond | H | c-Pr(1-Cl) | C(=O)Me | Me | H | O |
| D-16037 | H | single bond | Me | c-Pr(1-Br) | C(=O)Me | Cl | H | O |
| D-16038 | Me | single bond | H | c-Pr(1-Br) | C(=O)Me | Cl | H | O |
| D-16039 | Me(R) | single bond | H | c-Pr(1-Br) | C(=O)Me | Cl | H | O |
| D-16040 | Me(S) | single bond | H | c-Pr(1-Br) | C(=O)Me | Cl | H | O |
| D-16041 | H | single bond | Me | c-Pr(1-Br) | C(=O)Me | Me | H | O |
| D-16042 | Me | single bond | H | c-Pr(1-Br) | C(=O)Me | Me | H | O |
| D-16043 | Me(R) | single bond | H | c-Pr(1-Br) | C(=O)Me | Me | H | O |
| D-16044 | Me(S) | single bond | H | c-Pr(1-Br) | C(=O)Me | Me | H | O |
| D-16045 | H | single bond | Me | c-Pr(1-Me) | C(=O)Me | Cl | H | O |
| D-16046 | Me | single bond | H | c-Pr(1-Me) | C(=O)Me | Cl | H | O |
| D-16047 | Me(R) | single bond | H | c-Pr(1-Me) | C(=O)Me | Cl | H | O |
| D-16048 | Me(S) | single bond | H | c-Pr(1-Me) | C(=O)Me | Cl | H | O |
| D-16049 | H | single bond | Me | c-Pr(1-Me) | C(=O)Me | Me | H | O |
| D-16050 | Me | single bond | H | c-Pr(1-Me) | C(=O)Me | Me | H | O |
| D-16051 | Me(R) | single bond | H | c-Pr(1-Me) | C(=O)Me | Me | H | O |
| D-16052 | Me(S) | single bond | H | c-Pr(1-Me) | C(=O)Me | Me | H | O |
| D-16053 | H | single bond | Me | c-Pr(1-$CH_2OH$) | C(=O)Me | Cl | H | O |
| D-16054 | Me | single bond | H | c-Pr(1-$CH_2OH$) | C(=O)Me | Cl | H | O |
| D-16055 | Me(R) | single bond | H | c-Pr(1-$CH_2OH$) | C(=O)Me | Cl | H | O |
| D-16056 | Me(S) | single bond | H | c-Pr(1-$CH_2OH$) | C(=O)Me | Cl | H | O |
| D-16057 | H | single bond | Me | c-Pr(1-$CH_2OH$) | C(=O)Me | Me | H | O |
| D-16058 | Me | single bond | H | c-Pr(1-$CH_2OH$) | C(=O)Me | Me | H | O |
| D-16059 | Me(R) | single bond | H | c-Pr(1-$CH_2OH$) | C(=O)Me | Me | H | O |
| D-16060 | Me(S) | single bond | H | c-Pr(1-$CH_2OH$) | C(=O)Me | Me | H | O |

TABLE 1011-continued

| Compound Number | Y | W | Z | $R^1$ | $R^2$ | $R^3$ | $R^{10}$ | A |
|---|---|---|---|---|---|---|---|---|
| D-16061 | H | single bond | Me | c-Pr[1-$CH_2OS(=O)_2Me$] | C(=O)Me | Cl | H | O |
| D-16062 | Me | single bond | H | c-Pr[1-$CH_2OS(=O)_2Me$] | C(=O)Me | Cl | H | O |
| D-16063 | Me(R) | single bond | H | c-Pr[1-$CH_2OS(=O)_2Me$] | C(=O)Me | Cl | H | O |
| D-16064 | Me(S) | single bond | H | c-Pr[1-$CH_2OS(=O)_2Me$] | C(=O)Me | Cl | H | O |
| D-16065 | H | single bond | Me | c-Pr[1-$CH_2OS(=O)_2Me$] | C(=O)Me | Me | H | O |
| D-16066 | Me | single bond | H | c-Pr[1-$CH_2OS(=O)_2Me$] | C(=O)Me | Me | H | O |
| D-16067 | Me(R) | single bond | H | c-Pr[1-$CH_2OS(=O)_2Me$] | C(=O)Me | Me | H | O |
| D-16068 | Me(S) | single bond | H | c-Pr[1-$CH_2OS(=O)_2Me$] | C(=O)Me | Me | H | O |
| D-16069 | H | single bond | Me | c-Pr(1-$CH_2OMe$) | C(=O)Me | Cl | H | O |
| D-16070 | Me | single bond | H | c-Pr(1-$CH_2OMe$) | C(=O)Me | Cl | H | O |
| D-16071 | Me(R) | single bond | H | c-Pr(1-$CH_2OMe$) | C(=O)Me | Cl | H | O |
| D-16072 | Me(S) | single bond | H | c-Pr(1-$CH_2OMe$) | C(=O)Me | Cl | H | O |
| D-16073 | H | single bond | Me | c-Pr(1-$CH_2OMe$) | C(=O)Me | Me | H | O |
| D-16074 | Me | single bond | H | c-Pr(1-$CH_2OMe$) | C(=O)Me | Me | H | O |
| D-16075 | Me(R) | single bond | H | c-Pr(1-$CH_2OMe$) | C(=O)Me | Me | H | O |
| D-16076 | Me(S) | single bond | H | c-Pr(1-$CH_2OMe$) | C(=O)Me | Me | H | O |
| D-16077 | H | single bond | Me | c-Pr(1-$CH_2OCN$) | C(=O)Me | Cl | H | O |
| D-16078 | Me | single bond | H | c-Pr(1-$CH_2OCN$) | C(=O)Me | Cl | H | O |

TABLE 1012

| Compound Number | Y | W | Z | $R^1$ | $R^2$ | $R^3$ | $R^{10}$ | A |
|---|---|---|---|---|---|---|---|---|
| D-16079 | Me(R) | single bond | H | c-Pr(1-$CH_2OCN$) | C(=O)Me | Cl | H | O |
| D-16080 | Me(S) | single bond | H | c-Pr(1-$CH_2OCN$) | C(=O)Me | Cl | H | O |
| D-16081 | H | single bond | Me | c-Pr(1-$CH_2OCN$) | C(=O)Me | Me | H | O |
| D-16082 | Me | single bond | H | c-Pr(1-$CH_2OCN$) | C(=O)Me | Me | H | O |
| D-16083 | Me(R) | single bond | H | c-Pr(1-$CH_2OCN$) | C(=O)Me | Me | H | O |
| D-16084 | Me(S) | single bond | H | c-Pr(1-$CH_2OCN$) | C(=O)Me | Me | H | O |
| D-16085 | H | single bond | Me | c-Pr(1-$CH_2SMe$) | C(=O)Me | Cl | H | O |
| D-16086 | Me | single bond | H | c-Pr(1-$CH_2SMe$) | C(=O)Me | Cl | H | O |
| D-16087 | Me(R) | single bond | H | c-Pr(1-$CH_2SMe$) | C(=O)Me | Cl | H | O |
| D-16088 | Me(S) | single bond | H | c-Pr(1-$CH_2SMe$) | C(=O)Me | Cl | H | O |
| D-16089 | H | single bond | Me | c-Pr(1-$CH_2SMe$) | C(=O)Me | Me | H | O |
| D-16090 | Me | single bond | H | c-Pr(1-$CH_2SMe$) | C(=O)Me | Me | H | O |
| D-16091 | Me(R) | single bond | H | c-Pr(1-$CH_2SMe$) | C(=O)Me | Me | H | O |
| D-16092 | Me(S) | single bond | H | c-Pr(1-$CH_2SMe$) | C(=O)Me | Me | H | O |
| D-16093 | H | single bond | Me | c-Pr[1-$CH_2S(=O)Me$] | C(=O)Me | Cl | H | O |
| D-16094 | Me | single bond | H | c-Pr[1-$CH_2S(=O)Me$] | C(=O)Me | Cl | H | O |
| D-16095 | Me(R) | single bond | H | c-Pr[1-$CH_2S(=O)Me$] | C(=O)Me | Cl | H | O |
| D-16096 | Me(S) | single bond | H | c-Pr[1-$CH_2S(=O)Me$] | C(=O)Me | Cl | H | O |
| D-16097 | H | single bond | Me | c-Pr[1-$CH_2S(=O)Me$] | C(=O)Me | Me | H | O |
| D-16098 | Me | single bond | H | c-Pr[1-$CH_2S(=O)Me$] | C(=O)Me | Me | H | O |
| D-16099 | Me(R) | single bond | H | c-Pr[1-$CH_2S(=O)Me$] | C(=O)Me | Me | H | O |
| D-16100 | Me(S) | single bond | H | c-Pr[1-$CH_2S(=O)Me$] | C(=O)Me | Me | H | O |
| D-16101 | H | single bond | Me | c-Pr[1-$CH_2S(=O)_2Me$] | C(=O)Me | Cl | H | O |
| D-16102 | Me | single bond | H | c-Pr[1-$CH_2S(=O)_2Me$] | C(=O)Me | Cl | H | O |
| D-16103 | Me(R) | single bond | H | c-Pr[1-$CH_2S(=O)_2Me$] | C(=O)Me | Cl | H | O |
| D-16104 | Me(S) | single bond | H | c-Pr[1-$CH_2S(=O)_2Me$] | C(=O)Me | Cl | H | O |
| D-16105 | H | single bond | Me | c-Pr[1-$CH_2S(=O)_2Me$] | C(=O)Me | Me | H | O |
| D-16106 | Me | single bond | H | c-Pr[1-$CH_2S(=O)_2Me$] | C(=O)Me | Me | H | O |
| D-16107 | Me(R) | single bond | H | c-Pr[1-$CH_2S(=O)_2Me$] | C(=O)Me | Me | H | O |
| D-16108 | Me(S) | single bond | H | c-Pr[1-$CH_2S(=O)_2Me$] | C(=O)Me | Me | H | O |
| D-16109 | H | single bond | Me | c-Pr(1-$CH_2F$) | C(=O)Me | Cl | H | O |
| D-16110 | Me | single bond | H | c-Pr(1-$CH_2F$) | C(=O)Me | Cl | H | O |
| D-16111 | Me(R) | single bond | H | c-Pr(1-$CH_2F$) | C(=O)Me | Cl | H | O |
| D-16112 | Me(S) | single bond | H | c-Pr(1-$CH_2F$) | C(=O)Me | Cl | H | O |
| D-16113 | H | single bond | Me | c-Pr(1-$CH_2F$) | C(=O)Me | Me | H | O |
| D-16114 | Me | single bond | H | c-Pr(1-$CH_2F$) | C(=O)Me | Me | H | O |
| D-16115 | Me(R) | single bond | H | c-Pr(1-$CH_2F$) | C(=O)Me | Me | H | O |
| D-16116 | Me(S) | single bond | H | c-Pr(1-$CH_2F$) | C(=O)Me | Me | H | O |
| D-16117 | H | single bond | Me | c-Pr(1-$CHF_2$) | C(=O)Me | Cl | H | O |
| D-16118 | Me | single bond | H | c-Pr(1-$CHF_2$) | C(=O)Me | Cl | H | O |
| D-16119 | Me(R) | single bond | H | c-Pr(1-$CHF_2$) | C(=O)Me | Cl | H | O |
| D-16120 | Me(S) | single bond | H | c-Pr(1-$CHF_2$) | C(=O)Me | Cl | H | O |
| D-16121 | H | single bond | Me | c-Pr(1-$CHF_2$) | C(=O)Me | Me | H | O |
| D-16122 | Me | single bond | H | c-Pr(1-$CHF_2$) | C(=O)Me | Me | H | O |

TABLE 1013

| Compound Number | Y | W | Z | $R^1$ | $R^2$ | $R^3$ | $R^{10}$ | A |
|---|---|---|---|---|---|---|---|---|
| D-16123 | Me(R) | single bond | H | c-Pr(1-$CHF_2$) | C(═O)Me | Me | H | O |
| D-16124 | Me(S) | single bond | H | c-Pr(1-$CHF_2$) | C(═O)Me | Me | H | O |
| D-16125 | H | single bond | Me | c-Pr(1-$CF_3$) | C(═O)Me | Cl | H | O |
| D-16126 | Me | single bond | H | c-Pr(1-$CF_3$) | C(═O)Me | Cl | H | O |
| D-16127 | Me(R) | single bond | H | c-Pr(1-$CF_3$) | C(═O)Me | Cl | H | O |
| D-16128 | Me(S) | single bond | H | c-Pr(1-$CF_3$) | C(═O)Me | Cl | H | O |
| D-16129 | H | single bond | Me | c-Pr(1-$CF_3$) | C(═O)Me | Me | H | O |
| D-16130 | Me | single bond | H | c-Pr(1-$CF_3$) | C(═O)Me | Me | H | O |
| D-16131 | Me(R) | single bond | H | c-Pr(1-$CF_3$) | C(═O)Me | Me | H | O |
| D-16132 | Me(S) | single bond | H | c-Pr(1-$CF_3$) | C(═O)Me | Me | H | O |
| D-16133 | H | single bond | Me | c-Pr(1-C≡CH) | C(═O)Me | Cl | H | O |
| D-16134 | Me | single bond | H | c-Pr(1-C≡CH) | C(═O)Me | Cl | H | O |
| D-16135 | Me(R) | single bond | H | c-Pr(1-C≡CH) | C(═O)Me | Cl | H | O |
| D-16136 | Me(S) | single bond | H | c-Pr(1-C≡CH) | C(═O)Me | Cl | H | O |
| D-16137 | H | single bond | Me | c-Pr(1-C≡CH) | C(═O)Me | Me | H | O |
| D-16138 | Me | single bond | H | c-Pr(1-C≡CH) | C(═O)Me | Me | H | O |
| D-16139 | Me(R) | single bond | H | c-Pr(1-C≡CH) | C(═O)Me | Me | H | O |
| D-16140 | Me(S) | single bond | H | c-Pr(1-C≡CH) | C(═O)Me | Me | H | O |
| D-16141 | H | single bond | Me | c-Pr[1-C(═O)OEt] | C(═O)Me | Cl | H | O |
| D-16142 | Me | single bond | H | c-Pr[1-C(═O)OEt] | C(═O)Me | Cl | H | O |
| D-16143 | Me(R) | single bond | H | c-Pr[1-C(═O)OEt] | C(═O)Me | Cl | H | O |
| D-16144 | Me(S) | single bond | H | c-Pr[1-C(═O)OEt] | C(═O)Me | Cl | H | O |
| D-16145 | H | single bond | Me | c-Pr[1-C(═O)OEt] | C(═O)Me | Me | H | O |
| D-16146 | Me | single bond | H | c-Pr[1-C(═O)OEt] | C(═O)Me | Me | H | O |
| D-16147 | Me(R) | single bond | H | c-Pr[1-C(═O)OEt] | C(═O)Me | Me | H | O |
| D-16148 | Me(S) | single bond | H | c-Pr[1-C(═O)OEt] | C(═O)Me | Me | H | O |
| D-16149 | H | single bond | Me | c-Pr[1-C(═O)OH] | C(═O)Me | Cl | H | O |
| D-16150 | Me | single bond | H | c-Pr[1-C(═O)OH] | C(═O)Me | Cl | H | O |
| D-16151 | Me(R) | single bond | H | c-Pr[1-C(═O)OH] | C(═O)Me | Cl | H | O |
| D-16152 | Me(S) | single bond | H | c-Pr[1-C(═O)OH] | C(═O)Me | Cl | H | O |
| D-16153 | H | single bond | Me | c-Pr[1-C(═O)OH] | C(═O)Me | Me | H | O |
| D-16154 | Me | single bond | H | c-Pr[1-C(═O)OH] | C(═O)Me | Me | H | O |
| D-16155 | Me(R) | single bond | H | c-Pr[1-C(═O)OH] | C(═O)Me | Me | H | O |
| D-16156 | Me(S) | single bond | H | c-Pr[1-C(═O)OH] | C(═O)Me | Me | H | O |
| D-16157 | H | single bond | Me | c-Pr[1-C(═O)$NH_2$] | C(═O)Me | Cl | H | O |
| D-16158 | Me | single bond | H | c-Pr[1-C(═O)$NH_2$] | C(═O)Me | Cl | H | O |
| D-16159 | Me(R) | single bond | H | c-Pr[1-C(═O)$NH_2$] | C(═O)Me | Cl | H | O |
| D-16160 | Me(S) | single bond | H | c-Pr[1-C(═O)$NH_2$] | C(═O)Me | Cl | H | O |
| D-16161 | H | single bond | Me | c-Pr[1-C(═O)$NH_2$] | C(═O)Me | Me | H | O |
| D-16162 | Me | single bond | H | c-Pr[1-C(═O)$NH_2$] | C(═O)Me | Me | H | O |
| D-16163 | Me(R) | single bond | H | c-Pr[1-C(═O)$NH_2$] | C(═O)Me | Me | H | O |
| D-16164 | Me(S) | single bond | H | c-Pr[1-C(═O)$NH_2$] | C(═O)Me | Me | H | O |
| D-16165 | H | single bond | Me | c-Pr(1-OMe) | C(═O)Me | Cl | H | O |
| D-16166 | Me | single bond | H | c-Pr(1-OMe) | C(═O)Me | Cl | H | O |

TABLE 1014

| Compound Number | Y | W | Z | $R^1$ | $R^2$ | $R^3$ | $R^{10}$ | A |
|---|---|---|---|---|---|---|---|---|
| D-16167 | Me(R) | single bond | H | c-Pr(1-OMe) | C(═O)Me | Cl | H | O |
| D-16168 | Me(S) | single bond | H | c-Pr(1-OMe) | C(═O)Me | Cl | H | O |
| D-16169 | H | single bond | Me | c-Pr(1-OMe) | C(═O)Me | Me | H | O |
| D-16170 | Me | single bond | H | c-Pr(1-OMe) | C(═O)Me | Me | H | O |
| D-16171 | Me(R) | single bond | H | c-Pr(1-OMe) | C(═O)Me | Me | H | O |
| D-16172 | Me(S) | single bond | H | c-Pr(1-OMe) | C(═O)Me | Me | H | O |
| D-16173 | H | single bond | Me | c-Pr(1-SMe) | C(═O)Me | Cl | H | O |
| D-16174 | Me | single bond | H | c-Pr(1-SMe) | C(═O)Me | Cl | H | O |
| D-16175 | Me(R) | single bond | H | c-Pr(1-SMe) | C(═O)Me | Cl | H | O |
| D-16176 | Me(S) | single bond | H | c-Pr(1-SMe) | C(═O)Me | Cl | H | O |
| D-16177 | H | single bond | Me | c-Pr(1-SMe) | C(═O)Me | Me | H | O |
| D-16178 | Me | single bond | H | c-Pr(1-SMe) | C(═O)Me | Me | H | O |
| D-16179 | Me(R) | single bond | H | c-Pr(1-SMe) | C(═O)Me | Me | H | O |
| D-16180 | Me(S) | single bond | H | c-Pr(1-SMe) | C(═O)Me | Me | H | O |
| D-16181 | H | single bond | Me | c-Pr[1-S(═O)Me] | C(═O)Me | Cl | H | O |
| D-16182 | Me | single bond | H | c-Pr[1-S(═O)Me] | C(═O)Me | Cl | H | O |
| D-16183 | Me(R) | single bond | H | c-Pr[1-S(═O)Me] | C(═O)Me | Cl | H | O |
| D-16184 | Me(S) | single bond | H | c-Pr[1-S(═O)Me] | C(═O)Me | Cl | H | O |
| D-16185 | H | single bond | Me | c-Pr[1-S(═O)Me] | C(═O)Me | Me | H | O |
| D-16186 | Me | single bond | H | c-Pr[1-S(═O)Me] | C(═O)Me | Me | H | O |
| D-16187 | Me(R) | single bond | H | c-Pr[1-S(═O)Me] | C(═O)Me | Me | H | O |
| D-16188 | Me(S) | single bond | H | c-Pr[1-S(═O)Me] | C(═O)Me | Me | H | O |
| D-16189 | H | single bond | Me | c-Pr[1-S(═O)$_2$Me] | C(═O)Me | Cl | H | O |

TABLE 1014-continued

| Compound Number | Y | W | Z | $R^1$ | $R^2$ | $R^3$ | $R^{10}$ | A |
|---|---|---|---|---|---|---|---|---|
| D-16190 | Me | single bond | H | c-Pr[1-S(=O)$_2$Me] | C(=O)Me | Cl | H | O |
| D-16191 | Me(R) | single bond | H | c-Pr[1-S(=O)$_2$Me] | C(=O)Me | Cl | H | O |
| D-16192 | Me(S) | single bond | H | c-Pr[1-S(=O)$_2$Me] | C(=O)Me | Cl | H | O |
| D-16193 | H | single bond | Me | c-Pr[1-S(=O)$_2$Me] | C(=O)Me | Me | H | O |
| D-16194 | Me | single bond | H | c-Pr[1-S(=O)$_2$Me] | C(=O)Me | Me | H | O |
| D-16195 | Me(R) | single bond | H | c-Pr[1-S(=O)$_2$Me] | C(=O)Me | Me | H | O |
| D-16196 | Me(S) | single bond | H | c-Pr[1-S(=O)$_2$Me] | C(=O)Me | Me | H | O |
| D-16197 | H | single bond | Me | c-Pr[1-S(=O)$_2$CHF$_2$] | C(=O)Me | Cl | H | O |
| D-16198 | Me | single bond | H | c-Pr[1-S(=O)$_2$CHF$_2$] | C(=O)Me | Cl | H | O |
| D-16199 | Me(R) | single bond | H | c-Pr[1-S(=O)$_2$CHF$_2$] | C(=O)Me | Cl | H | O |
| D-16200 | Me(S) | single bond | H | c-Pr[1-S(=O)$_2$CHF$_2$] | C(=O)Me | Cl | H | O |
| D-16201 | H | single bond | Me | c-Pr[1-S(=O)$_2$CHF$_2$] | C(=O)Me | Me | H | O |
| D-16202 | Me | single bond | H | c-Pr[1-S(=O)$_2$CHF$_2$] | C(=O)Me | Me | H | O |
| D-16203 | Me(R) | single bond | H | c-Pr[1-S(=O)$_2$CHF$_2$] | C(=O)Me | Me | H | O |
| D-16204 | Me(S) | single bond | H | c-Pr[1-S(=O)$_2$CHF$_2$] | C(=O)Me | Me | H | O |
| D-16205 | H | single bond | Me | c-Pr[1-S(=O)$_2$CF$_3$] | C(=O)Me | Cl | H | O |
| D-16206 | Me | single bond | H | c-Pr[1-S(=O)$_2$CF$_3$] | C(=O)Me | Cl | H | O |
| D-16207 | Me(R) | single bond | H | c-Pr[1-S(=O)$_2$CF$_3$] | C(=O)Me | Cl | H | O |
| D-16208 | Me(S) | single bond | H | c-Pr[1-S(=O)$_2$CF$_3$] | C(=O)Me | Cl | H | O |
| D-16209 | H | single bond | Me | c-Pr[1-S(=O)$_2$CF$_3$] | C(=O)Me | Me | H | O |
| D-16210 | Me | single bond | H | c-Pr[1-S(=O)$_2$CF$_3$] | C(=O)Me | Me | H | O |

TABLE 1015

| Compound Number | Y | W | Z | $R^1$ | $R^2$ | $R^3$ | $R^{10}$ | A |
|---|---|---|---|---|---|---|---|---|
| D-16211 | Me(R) | single bond | H | c-Pr[1-S(=O)$_2$CF$_3$] | C(=O)Me | Me | H | O |
| D-16212 | Me(S) | single bond | H | c-Pr[1-S(=O)$_2$CF$_3$] | C(=O)Me | Me | H | O |
| D-16213 | H | single bond | Me | c-Pr[1-(5,6-dihydro-1,4,2-dioxazin-3-yl)] | C(=O)Me | Cl | H | O |
| D-16214 | Me | single bond | H | c-Pr[1-(5,6-dihydro-1,4,2-dioxazin-3-yl)] | C(=O)Me | Cl | H | O |
| D-16215 | Me(R) | single bond | H | c-Pr[1-(5,6-dihydro-1,4,2-dioxazin-3-yl)] | C(=O)Me | Cl | H | O |
| D-16216 | Me(S) | single bond | H | c-Pr[1-(5,6-dihydro-1,4,2-dioxazin-3-yl)] | C(=O)Me | Cl | H | O |
| D-16217 | H | single bond | Me | c-Pr[1-(5,6-dihydro-1,4,2-dioxazin-3-yl)] | C(=O)Me | Me | H | O |
| D-16218 | Me | single bond | H | c-Pr[1-(5,6-dihydro-1,4,2-dioxazin-3-yl)] | C(=O)Me | Me | H | O |
| D-16219 | Me(R) | single bond | H | c-Pr[1-(5,6-dihydro-1,4,2-dioxazin-3-yl)] | C(=O)Me | Me | H | O |
| D-16220 | Me(S) | single bond | H | c-Pr[1-(5,6-dihydro-1,4,2-dioxazin-3-yl)] | C(=O)Me | Me | H | O |
| D-16221 | H | single bond | Me | c-Pr[1-(5-hydroxy-1,3,4-oxadiazol-2-yl)] | C(=O)Me | Cl | H | O |
| D-16222 | Me | single bond | H | c-Pr[1-(5-hydroxy-1,3,4-oxadiazol-2-yl)] | C(=O)Me | Cl | H | O |
| D-16223 | Me(R) | single bond | H | c-Pr[1-(5-hydroxy-1,3,4-oxadiazol-2-yl)] | C(=O)Me | Cl | H | O |
| D-16224 | Me(S) | single bond | H | c-Pr[1-(5-hydroxy-1,3,4-oxadiazol-2-yl)] | C(=O)Me | Cl | H | O |
| D-16225 | H | single bond | Me | c-Pr[1-(5-hydroxy-1,3,4-oxadiazol-2-yl)] | C(=O)Me | Me | H | O |
| D-16226 | Me | single bond | H | c-Pr[1-(5-hydroxy-1,3,4-oxadiazol-2-yl)] | C(=O)Me | Me | H | O |
| D-16227 | Me(R) | single bond | H | c-Pr[1-(5-hydroxy-1,3,4-oxadiazol-2-yl)] | C(=O)Me | Me | H | O |
| D-16228 | Me(S) | single bond | H | c-Pr[1-(5-hydroxy-1,3,4-oxadiazol-2-yl)] | C(=O)Me | Me | H | O |
| D-16229 | H | single bond | Me | c-Pr[1-(pyrimidin-2-yl)] | C(=O)Me | Cl | H | O |
| D-16230 | Me | single bond | H | c-Pr[1-(pyrimidin-2-yl)] | C(=O)Me | Cl | H | O |
| D-16231 | Me(R) | single bond | H | c-Pr[1-(pyrimidin-2-yl)] | C(=O)Me | Cl | H | O |
| D-16232 | Me(S) | single bond | H | c-Pr[1-(pyrimidin-2-yl)] | C(=O)Me | Cl | H | O |
| D-16233 | H | single bond | Me | c-Pr[1-(pyrimidin-2-yl)] | C(=O)Me | Me | H | O |
| D-16234 | Me | single bond | H | c-Pr[1-(pyrimidin-2-yl)] | C(=O)Me | Me | H | O |
| D-16235 | Me(R) | single bond | H | c-Pr[1-(pyrimidin-2-yl)] | C(=O)Me | Me | H | O |
| D-16236 | Me(S) | single bond | H | c-Pr[1-(pyrimidin-2-yl)] | C(=O)Me | Me | H | O |
| D-16237 | H | single bond | Me | t-Bu | C(=O)Me | Cl | H | O |
| D-16238 | Me | single bond | H | t-Bu | C(=O)Me | Cl | H | O |
| D-16239 | Me(R) | single bond | H | t-Bu | C(=O)Me | Cl | H | O |
| D-16240 | Me(S) | single bond | H | t-Bu | C(=O)Me | Cl | H | O |
| D-16241 | H | single bond | Me | t-Bu | C(=O)Me | Me | H | O |
| D-16242 | Me | single bond | H | t-Bu | C(=O)Me | Me | H | O |
| D-16243 | Me(R) | single bond | H | t-Bu | C(=O)Me | Me | H | O |
| D-16244 | Me(S) | single bond | H | t-Bu | C(=O)Me | Me | H | O |
| D-16245 | H | single bond | Me | c-Bu | C(=O)Me | Cl | H | O |
| D-16246 | Me | single bond | H | c-Bu | C(=O)Me | Cl | H | O |
| D-16247 | Me(R) | single bond | H | c-Bu | C(=O)Me | Cl | H | O |
| D-16248 | Me(S) | single bond | H | c-Bu | C(=O)Me | Cl | H | O |
| D-16249 | H | single bond | Me | c-Bu | C(=O)Me | Me | H | O |
| D-16250 | Me | single bond | H | c-Bu | C(=O)Me | Me | H | O |
| D-16251 | Me(R) | single bond | H | c-Bu | C(=O)Me | Me | H | O |
| D-16252 | Me(S) | single bond | H | c-Bu | C(=O)Me | Me | H | O |
| D-16253 | H | single bond | Me | c-Bu(1-CN) | C(=O)Me | Cl | H | O |
| D-16254 | Me | single bond | H | c-Bu(1-CN) | C(=O)Me | Cl | H | O |

TABLE 1016

| Compound Number | Y | W | Z | $R^1$ | $R^2$ | $R^3$ | $R^{10}$ | A |
|---|---|---|---|---|---|---|---|---|
| D-16255 | Me(R) | single bond | H | c-Bu(1-CN) | C(═O)Me | Cl | H | O |
| D-16256 | Me(S) | single bond | H | c-Bu(1-CN) | C(═O)Me | Cl | H | O |
| D-16257 | H | single bond | Me | c-Bu(1-CN) | C(═O)Me | Me | H | O |
| D-16258 | Me | single bond | H | c-Bu(1-CN) | C(═O)Me | Me | H | O |
| D-16259 | Me(R) | single bond | H | c-Bu(1-CN) | C(═O)Me | Me | H | O |
| D-16260 | Me(S) | single bond | H | c-Bu(1-CN) | C(═O)Me | Me | H | O |
| D-16261 | H | single bond | Me | c-Bu(3,3-$F_2$) | C(═O)Me | Cl | H | O |
| D-16262 | Me | single bond | H | c-Bu(3,3-$F_2$) | C(═O)Me | Cl | H | O |
| D-16263 | Me(R) | single bond | H | c-Bu(3,3-$F_2$) | C(═O)Me | Cl | H | O |
| D-16264 | Me(S) | single bond | H | c-Bu(3,3-$F_2$) | C(═O)Me | Cl | H | O |
| D-16265 | H | single bond | Me | c-Bu(3,3-$F_2$) | C(═O)Me | Me | H | O |
| D-16266 | Me | single bond | H | c-Bu(3,3-$F_2$) | C(═O)Me | Me | H | O |
| D-16267 | Me(R) | single bond | H | c-Bu(3,3-$F_2$) | C(═O)Me | Me | H | O |
| D-16268 | Me(S) | single bond | H | c-Bu(3,3-$F_2$) | C(═O)Me | Me | H | O |
| D-16269 | H | single bond | Me | oxetan-3-yl | C(═O)Me | Cl | H | O |
| D-16270 | Me | single bond | H | oxetan-3-yl | C(═O)Me | Cl | H | O |
| D-16271 | Me(R) | single bond | H | oxetan-3-yl | C(═O)Me | Cl | H | O |
| D-16272 | Me(S) | single bond | H | oxetan-3-yl | C(═O)Me | Cl | H | O |
| D-16273 | H | single bond | Me | oxetan-3-yl | C(═O)Me | Me | H | O |
| D-16274 | Me | single bond | H | oxetan-3-yl | C(═O)Me | Me | H | O |
| D-16275 | Me(R) | single bond | H | oxetan-3-yl | C(═O)Me | Me | H | O |
| D-16276 | Me(S) | single bond | H | oxetan-3-yl | C(═O)Me | Me | H | O |
| D-16277 | H | single bond | Me | oxetan(3-CN)-3-yl | C(═O)Me | Cl | H | O |
| D-16278 | Me | single bond | H | oxetan(3-CN)-3-yl | C(═O)Me | Cl | H | O |
| D-16279 | Me(R) | single bond | H | oxetan(3-CN)-3-yl | C(═O)Me | Cl | H | O |
| D-16280 | Me(S) | single bond | H | oxetan(3-CN)-3-yl | C(═O)Me | Cl | H | O |
| D-16281 | H | single bond | Me | oxetan(3-CN)-3-yl | C(═O)Me | Me | H | O |
| D-16282 | Me | single bond | H | oxetan(3-CN)-3-yl | C(═O)Me | Me | H | O |
| D-16283 | Me(R) | single bond | H | oxetan(3-CN)-3-yl | C(═O)Me | Me | H | O |
| D-16284 | Me(S) | single bond | H | oxetan(3-CN)-3-yl | C(═O)Me | Me | H | O |
| D-16285 | H | single bond | Me | azetidin[1-C(═O)Me]-3-yl | C(═O)Me | Cl | H | O |
| D-16286 | Me | single bond | H | azetidin[1-C(═O)Me]-3-yl | C(═O)Me | Cl | H | O |
| D-16287 | Me(R) | single bond | H | azetidin[1-C(═O)Me]-3-yl | C(═O)Me | Cl | H | O |
| D-16288 | Me(S) | single bond | H | azetidin[1-C(═O)Me]-3-yl | C(═O)Me | Cl | H | O |
| D-16289 | H | single bond | Me | azetidin[1-C(═O)Me]-3-yl | C(═O)Me | Me | H | O |
| D-16290 | Me | single bond | H | azetidin[1-C(═O)Me]-3-yl | C(═O)Me | Me | H | O |
| D-16291 | Me(R) | single bond | H | azetidin[1-C(═O)Me]-3-yl | C(═O)Me | Me | H | O |
| D-16292 | Me(S) | single bond | H | azetidin[1-C(═O)Me]-3-yl | C(═O)Me | Me | H | O |
| D-16293 | H | single bond | Me | azetidin[1-S(═O)$_2$Me]-3-yl | C(═O)Me | Cl | H | O |
| D-16294 | Me | single bond | H | azetidin[1-S(═O)$_2$Me]-3-yl | C(═O)Me | Cl | H | O |
| D-16295 | Me(R) | single bond | H | azetidin[1-S(═O)$_2$Me]-3-yl | C(═O)Me | Cl | H | O |
| D-16296 | Me(S) | single bond | H | azetidin[1-S(═O)$_2$Me]-3-yl | C(═O)Me | Cl | H | O |
| D-16297 | H | single bond | Me | azetidin[1-S(═O)$_2$Me]-3-yl | C(═O)Me | Me | H | O |
| D-16298 | Me | single bond | H | azetidin[1-S(═O)$_2$Me]-3-yl | C(═O)Me | Me | H | O |

TABLE 1017

| Compound Number | Y | W | Z | $R^1$ | $R^2$ | $R^3$ | $R^{10}$ | A |
|---|---|---|---|---|---|---|---|---|
| D-16299 | Me(R) | single bond | H | azetidin[1-S(═O)$_2$Me]-3-yl | C(═O)Me | Me | H | O |
| D-16300 | Me(S) | single bond | H | azetidin[1-S(═O)$_2$Me]-3-yl | C(═O)Me | Me | H | O |
| D-16301 | H | single bond | Me | azetidin[1-S(═O)$_2$CHF$_2$]-3-yl | C(═O)Me | Cl | H | O |
| D-16302 | Me | single bond | H | azetidin[1-S(═O)$_2$CHF$_2$]-3-yl | C(═O)Me | Cl | H | O |
| D-16303 | Me(R) | single bond | H | azetidin[1-S(═O)$_2$CHF$_2$]-3-yl | C(═O)Me | Cl | H | O |
| D-16304 | Me(S) | single bond | H | azetidin[1-S(═O)$_2$CHF$_2$]-3-yl | C(═O)Me | Cl | H | O |
| D-16305 | H | single bond | Me | azetidin[1-S(═O)$_2$CHF$_2$]-3-yl | C(═O)Me | Me | H | O |
| D-16306 | Me | single bond | H | azetidin[1-S(═O)$_2$CHF$_2$]-3-yl | C(═O)Me | Me | H | O |
| D-16307 | Me(R) | single bond | H | azetidin[1-S(═O)$_2$CHF$_2$]-3-yl | C(═O)Me | Me | H | O |
| D-16308 | Me(S) | single bond | H | azetidin[1-S(═O)$_2$CHF$_2$]-3-yl | C(═O)Me | Me | H | O |
| D-16309 | H | single bond | Me | c-Pen | C(═O)Me | Cl | H | O |
| D-16310 | Me | single bond | H | c-Pen | C(═O)Me | Cl | H | O |
| D-16311 | Me(R) | single bond | H | c-Pen | C(═O)Me | Cl | H | O |
| D-16312 | Me(S) | single bond | H | c-Pen | C(═O)Me | Cl | H | O |
| D-16313 | H | single bond | Me | c-Pen | C(═O)Me | Me | H | O |
| D-16314 | Me | single bond | H | c-Pen | C(═O)Me | Me | H | O |
| D-16315 | Me(R) | single bond | H | c-Pen | C(═O)Me | Me | H | O |
| D-16316 | Me(S) | single bond | H | c-Pen | C(═O)Me | Me | H | O |
| D-16317 | H | single bond | Me | tetrahydrofuran-3-yl | C(═O)Me | Cl | H | O |
| D-16318 | Me | single bond | H | tetrahydrofuran-3-yl | C(═O)Me | Cl | H | O |
| D-16319 | Me(R) | single bond | H | tetrahydrofuran-3-yl | C(═O)Me | Cl | H | O |

TABLE 1017-continued

| Compound Number | Y | W | Z | $R^1$ | $R^2$ | $R^3$ | $R^{10}$ | A |
|---|---|---|---|---|---|---|---|---|
| D-16320 | Me(S) | single bond | H | tetrahydrofuran-3-yl | C(═O)Me | Cl | H | O |
| D-16321 | H | single bond | Me | tetrahydrofuran-3-yl | C(═O)Me | Me | H | O |
| D-16322 | Me | single bond | H | tetrahydrofuran-3-yl | C(═O)Me | Me | H | O |
| D-16323 | Me(R) | single bond | H | tetrahydrofuran-3-yl | C(═O)Me | Me | H | O |
| D-16324 | Me(S) | single bond | H | tetrahydrofuran-3-yl | C(═O)Me | Me | H | O |
| D-16325 | H | single bond | Me | tetrahydrothiophen-3-yl | C(═O)Me | Cl | H | O |
| D-16326 | Me | single bond | H | tetrahydrothiophen-3-yl | C(═O)Me | Cl | H | O |
| D-16327 | Me(R) | single bond | H | tetrahydrothiophen-3-yl | C(═O)Me | Cl | H | O |
| D-16328 | Me(S) | single bond | H | tetrahydrothiophen-3-yl | C(═O)Me | Cl | H | O |
| D-16329 | H | single bond | Me | tetrahydrothiophen-3-yl | C(═O)Me | Me | H | O |
| D-16330 | Me | single bond | H | tetrahydrothiophen-3-yl | C(═O)Me | Me | H | O |
| D-16331 | Me(R) | single bond | H | tetrahydrothiophen-3-yl | C(═O)Me | Me | H | O |
| D-16332 | Me(S) | single bond | H | tetrahydrothiophen-3-yl | C(═O)Me | Me | H | O |
| D-16333 | H | single bond | Me | c-Pen(1-CN) | C(═O)Me | Cl | H | O |
| D-16334 | Me | single bond | H | c-Pen(1-CN) | C(═O)Me | Cl | H | O |
| D-16335 | Me(R) | single bond | H | c-Pen(1-CN) | C(═O)Me | Cl | H | O |
| D-16336 | Me(S) | single bond | H | c-Pen(1-CN) | C(═O)Me | Cl | H | O |
| D-16337 | H | single bond | Me | c-Pen(1-CN) | C(═O)Me | Me | H | O |
| D-16338 | Me | single bond | H | c-Pen(1-CN) | C(═O)Me | Me | H | O |
| D-16339 | Me(R) | single bond | H | c-Pen(1-CN) | C(═O)Me | Me | H | O |
| D-16340 | Me(S) | single bond | H | c-Pen(1-CN) | C(═O)Me | Me | H | O |
| D-16341 | H | single bond | Me | tetrahydrofuran(3-CN)-3-yl | C(═O)Me | Cl | H | O |
| D-16342 | Me | single bond | H | tetrahydrofuran(3-CN)-3-yl | C(═O)Me | Cl | H | O |

25

TABLE 1018

| Compound Number | Y | W | Z | $R^1$ | $R^2$ | $R^3$ | $R^{10}$ | A |
|---|---|---|---|---|---|---|---|---|
| D-16343 | Me(R) | single bond | H | tetrahydrofuran(3-CN)-3-yl | C(═O)Me | Cl | H | O |
| D-16344 | Me(S) | single bond | H | tetrahydrofuran(3-CN)-3-yl | C(═O)Me | Cl | H | O |
| D-16345 | H | single bond | Me | tetrahydrofuran(3-CN)-3-yl | C(═O)Me | Me | H | O |
| D-16346 | Me | single bond | H | tetrahydrofuran(3-CN)-3-yl | C(═O)Me | Me | H | O |
| D-16347 | Me(R) | single bond | H | tetrahydrofuran(3-CN)-3-yl | C(═O)Me | Me | H | O |
| D-16348 | Me(S) | single bond | H | tetrahydrofuran(3-CN)-3-yl | C(═O)Me | Me | H | O |
| D-16349 | H | single bond | Me | tetrahydrothiophen(3-CN)-3-yl | C(═O)Me | Cl | H | O |
| D-16350 | Me | single bond | H | tetrahydrothiophen(3-CN)-3-yl | C(═O)Me | Cl | H | O |
| D-16351 | Me(R) | single bond | H | tetrahydrothiophen(3-CN)-3-yl | C(═O)Me | Cl | H | O |
| D-16352 | Me(S) | single bond | H | tetrahydrothiophen(3-CN)-3-yl | C(═O)Me | Cl | H | O |
| D-16353 | H | single bond | Me | tetrahydrothiophen(3-CN)-3-yl | C(═O)Me | Me | H | O |
| D-16354 | Me | single bond | H | tetrahydrothiophen(3-CN)-3-yl | C(═O)Me | Me | H | O |
| D-16355 | Me(R) | single bond | H | tetrahydrothiophen(3-CN)-3-yl | C(═O)Me | Me | H | O |
| D-16356 | Me(S) | single bond | H | tetrahydrothiophen(3-CN)-3-yl | C(═O)Me | Me | H | O |
| D-16357 | H | single bond | Me | bicyclo[1.1.1]pentan-1-yl | C(═O)Me | Cl | H | O |
| D-16358 | Me | single bond | H | bicyclo[1.1.1]pentan-1-yl | C(═O)Me | Cl | H | O |
| D-16359 | Me(R) | single bond | H | bicyclo[1.1.1]pentan-1-yl | C(═O)Me | Cl | H | O |
| D-16360 | Me(S) | single bond | H | bicyclo[1.1.1]pentan-1-yl | C(═O)Me | Cl | H | O |
| D-16361 | H | single bond | Me | bicyclo[1.1.1]pentan-1-yl | C(═O)Me | Me | H | O |
| D-16362 | Me | single bond | H | bicyclo[1.1.1]pentan-1-yl | C(═O)Me | Me | H | O |
| D-16363 | Me(R) | single bond | H | bicyclo[1.1.1]pentan-1-yl | C(═O)Me | Me | H | O |
| D-16364 | Me(S) | single bond | H | bicyclo[1.1.1]pentan-1-yl | C(═O)Me | Me | H | O |
| D-16365 | H | single bond | Me | c-Hex | C(═O)Me | Cl | H | O |
| D-16366 | Me | single bond | H | c-Hex | C(═O)Me | Cl | H | O |
| D-16367 | Me(R) | single bond | H | c-Hex | C(═O)Me | Cl | H | O |
| D-16368 | Me(S) | single bond | H | c-Hex | C(═O)Me | Cl | H | O |
| D-16369 | H | single bond | Me | c-Hex | C(═O)Me | Me | H | O |
| D-16370 | Me | single bond | H | c-Hex | C(═O)Me | Me | H | O |
| D-16371 | Me(R) | single bond | H | c-Hex | C(═O)Me | Me | H | O |
| D-16372 | Me(S) | single bond | H | c-Hex | C(═O)Me | Me | H | O |
| D-16373 | H | single bond | Me | tetrahydropyran-4-yl | C(═O)Me | Cl | H | O |
| D-16374 | Me | single bond | H | tetrahydropyran-4-yl | C(═O)Me | Cl | H | O |
| D-16375 | Me(R) | single bond | H | tetrahydropyran-4-yl | C(═O)Me | Cl | H | O |
| D-16376 | Me(S) | single bond | H | tetrahydropyran-4-yl | C(═O)Me | Cl | H | O |
| D-16377 | H | single bond | Me | tetrahydropyran-4-yl | C(═O)Me | Me | H | O |
| D-16378 | Me | single bond | H | tetrahydropyran-4-yl | C(═O)Me | Me | H | O |
| D-16379 | Me(R) | single bond | H | tetrahydropyran-4-yl | C(═O)Me | Me | H | O |
| D-16380 | Me(S) | single bond | H | tetrahydropyran-4-yl | C(═O)Me | Me | H | O |
| D-16381 | H | single bond | Me | tetrahydrothiopyran-4-yl | C(═O)Me | Cl | H | O |
| D-16382 | Me | single bond | H | tetrahydrothiopyran-4-yl | C(═O)Me | Cl | H | O |
| D-16383 | Me(R) | single bond | H | tetrahydrothiopyran-4-yl | C(═O)Me | Cl | H | O |
| D-16384 | Me(S) | single bond | H | tetrahydrothiopyran-4-yl | C(═O)Me | Cl | H | O |

TABLE 1018-continued

| Compound Number | Y | W | Z | $R^1$ | $R^2$ | $R^3$ | $R^{10}$ | A |
|---|---|---|---|---|---|---|---|---|
| D-16385 | H | single bond | Me | tetrahydrothiopyran-4-yl | C(═O)Me | Me | H | O |
| D-16386 | Me | single bond | H | tetrahydrothiopyran-4-yl | C(═O)Me | Me | H | O |

TABLE 1019

| Compound Number | Y | W | Z | $R^1$ | $R^2$ | $R^3$ | $R^{10}$ | A |
|---|---|---|---|---|---|---|---|---|
| D-16387 | Me(R) | single bond | H | tetrahydrothiopyran-4-yl | C(═O)Me | Me | H | O |
| D-16388 | Me(S) | single bond | H | tetrahydrothiopyran-4-yl | C(═O)Me | Me | H | O |
| D-16389 | H | single bond | Me | c-Hex(1-CN) | C(═O)Me | Cl | H | O |
| D-16390 | Me | single bond | H | c-Hex(1-CN) | C(═O)Me | Cl | H | O |
| D-16391 | Me(R) | single bond | H | c-Hex(1-CN) | C(═O)Me | Cl | H | O |
| D-16392 | Me(S) | single bond | H | c-Hex(1-CN) | C(═O)Me | Cl | H | O |
| D-16393 | H | single bond | Me | c-Hex(1-CN) | C(═O)Me | Me | H | O |
| D-16394 | Me | single bond | H | c-Hex(1-CN) | C(═O)Me | Me | H | O |
| D-16395 | Me(R) | single bond | H | c-Hex(1-CN) | C(═O)Me | Me | H | O |
| D-16396 | Me(S) | single bond | H | c-Hex(1-CN) | C(═O)Me | Me | H | O |
| D-16397 | H | single bond | Me | tetrahydropyran(4-CN)-4-yl | C(═O)Me | Cl | H | O |
| D-16398 | Me | single bond | H | tetrahydropyran(4-CN)-4-yl | C(═O)Me | Cl | H | O |
| D-16399 | Me(R) | single bond | H | tetrahydropyran(4-CN)-4-yl | C(═O)Me | Cl | H | O |
| D-16400 | Me(S) | single bond | H | tetrahydropyran(4-CN)-4-yl | C(═O)Me | Cl | H | O |
| D-16401 | H | single bond | Me | tetrahydropyran(4-CN)-4-yl | C(═O)Me | Me | H | O |
| D-16402 | Me | single bond | H | tetrahydropyran(4-CN)-4-yl | C(═O)Me | Me | H | O |
| D-16403 | Me(R) | single bond | H | tetrahydropyran(4-CN)-4-yl | C(═O)Me | Me | H | O |
| D-16404 | Me(S) | single bond | H | tetrahydropyran(4-CN)-4-yl | C(═O)Me | Me | H | O |
| D-16405 | H | single bond | Me | tetrahydrothiopyran(4-CN)-4-yl | C(═O)Me | Cl | H | O |
| D-16406 | Me | single bond | H | tetrahydrothiopyran(4-CN)-4-yl | C(═O)Me | Cl | H | O |
| D-16407 | Me(R) | single bond | H | tetrahydrothiopyran(4-CN)-4-yl | C(═O)Me | Cl | H | O |
| D-16408 | Me(S) | single bond | H | tetrahydrothiopyran(4-CN)-4-yl | C(═O)Me | Cl | H | O |
| D-16409 | H | single bond | Me | tetrahydrothiopyran(4-CN)-4-yl | C(═O)Me | Me | H | O |
| D-16410 | Me | single bond | H | tetrahydrothiopyran(4-CN)-4-yl | C(═O)Me | Me | H | O |
| D-16411 | Me(R) | single bond | H | tetrahydrothiopyran(4-CN)-4-yl | C(═O)Me | Me | H | O |
| D-16412 | Me(S) | single bond | H | tetrahydrothiopyran(4-CN)-4-yl | C(═O)Me | Me | H | O |
| D-16413 | H | single bond | Me | $CH_2$(c-Pr) | C(═O)Me | Cl | H | O |
| D-16414 | Me | single bond | H | $CH_2$(c-Pr) | C(═O)Me | Cl | H | O |
| D-16415 | Me(R) | single bond | H | $CH_2$(c-Pr) | C(═O)Me | Cl | H | O |
| D-16416 | Me(S) | single bond | H | $CH_2$(C-Pr) | C(═O)Me | Cl | H | O |
| D-16417 | H | single bond | Me | $CH_2$(c-Pr) | C(═O)Me | Me | H | O |
| D-16418 | Me | single bond | H | $CH_2$(c-Pr) | C(═O)Me | Me | H | O |
| D-16419 | Me(R) | single bond | H | $CH_2$(c-Pr) | C(═O)Me | Me | H | O |
| D-16420 | Me(S) | single bond | H | $CH_2$(c-Pr) | C(═O)Me | Me | H | O |
| D-16421 | H | single bond | Me | $CH_2$[c-Pr(1-CN)] | C(═O)Me | Cl | H | O |
| D-16422 | Me | single bond | H | $CH_2$[c-Pr(1-CN)] | C(═O)Me | Cl | H | O |
| D-16423 | Me(R) | single bond | H | $CH_2$[c-Pr(1-CN)] | C(═O)Me | Cl | H | O |
| D-16424 | Me(S) | single bond | H | $CH_2$[c-Pr(1-CN)] | C(═O)Me | Cl | H | O |
| D-16425 | H | single bond | Me | $CH_2$[c-Pr(1-CN)] | C(═O)Me | Me | H | O |
| D-16426 | Me | single bond | H | $CH_2$[c-Pr(1-CN)] | C(═O)Me | Me | H | O |
| D-16427 | Me(R) | single bond | H | $CH_2$[c-Pr(1-CN)] | C(═O)Me | Me | H | O |
| D-16428 | Me(S) | single bond | H | $CH_2$[c-Pr(1-CN)] | C(═O)Me | Me | H | O |
| D-16429 | H | single bond | Me | CH(Me)(c-Pr) | C(═O)Me | Cl | H | O |
| D-16430 | Me | single bond | H | CH(Me)(c-Pr) | C(═O)Me | Cl | H | O |

TABLE 1020

| Compound Number | Y | W | Z | $R^1$ | $R^2$ | $R^3$ | $R^{10}$ | A |
|---|---|---|---|---|---|---|---|---|
| D-16431 | Me(R) | single bond | H | CH(Me)(c-Pr) | C(═O)Me | Cl | H | O |
| D-16432 | Me(S) | single bond | H | CH(Me)(c-Pr) | C(═O)Me | Cl | H | O |
| D-16433 | H | single bond | Me | CH(Me)(c-Pr) | C(═O)Me | Me | H | O |
| D-16434 | Me | single bond | H | CH(Me)(c-Pr) | C(═O)Me | Me | H | O |
| D-16435 | Me(R) | single bond | H | CH(Me)(c-Pr) | C(═O)Me | Me | H | O |
| D-16436 | Me(S) | single bond | H | CH(Me)(c-Pr) | C(═O)Me | Me | H | O |
| D-16437 | H | single bond | Me | CH(Me)$CH_2$OMe | C(═O)Me | Cl | H | O |
| D-16438 | Me | single bond | H | CH(Me)$CH_2$OMe | C(═O)Me | Cl | H | O |
| D-16439 | Me(R) | single bond | H | CH(Me)$CH_2$OMe | C(═O)Me | Cl | H | O |
| D-16440 | Me(S) | single bond | H | CH(Me)$CH_2$OMe | C(═O)Me | Cl | H | O |
| D-16441 | H | single bond | Me | CH(Me)$CH_2$OMe | C(═O)Me | Me | H | O |
| D-16442 | Me | single bond | H | CH(Me)$CH_2$OMe | C(═O)Me | Me | H | O |

TABLE 1020-continued

| Compound Number | Y | W | Z | $R^1$ | $R^2$ | $R^3$ | $R^{10}$ | A |
|---|---|---|---|---|---|---|---|---|
| D-16443 | Me(R) | single bond | H | $CH(Me)CH_2OMe$ | C(═O)Me | Me | H | O |
| D-16444 | Me(S) | single bond | H | $CH(Me)CH_2OMe$ | C(═O)Me | Me | H | O |
| D-16445 | H | single bond | Me | $CH_2CH{=}CH_2$ | C(═O)Me | Cl | H | O |
| D-16446 | Me | single bond | H | $CH_2CH{=}CH_2$ | C(═O)Me | Cl | H | O |
| D-16447 | Me(R) | single bond | H | $CH_2CH{=}CH_2$ | C(═O)Me | Cl | H | O |
| D-16448 | Me(S) | single bond | H | $CH_2CH{=}CH_2$ | C(═O)Me | Cl | H | O |
| D-16449 | H | single bond | Me | $CH_2CH{=}CH_2$ | C(═O)Me | Me | H | O |
| D-16450 | Me | single bond | H | $CH_2CH{=}CH_2$ | C(═O)Me | Me | H | O |
| D-16451 | Me(R) | single bond | H | $CH_2CH{=}CH_2$ | C(═O)Me | Me | H | O |
| D-16452 | Me(S) | single bond | H | $CH_2CH{=}CH_2$ | C(═O)Me | Me | H | O |
| D-16453 | H | single bond | Me | $CH_2C{\equiv}CH$ | C(═O)Me | Cl | H | O |
| D-16454 | Me | single bond | H | $CH_2C{\equiv}CH$ | C(═O)Me | Cl | H | O |
| D-16455 | Me(R) | single bond | H | $CH_2C{\equiv}CH$ | C(═O)Me | Cl | H | O |
| D-16456 | Me(S) | single bond | H | $CH_2C{\equiv}CH$ | C(═O)Me | Cl | H | O |
| D-16457 | H | single bond | Me | $CH_2C{\equiv}CH$ | C(═O)Me | Me | H | O |
| D-16458 | Me | single bond | H | $CH_2C{\equiv}CH$ | C(═O)Me | Me | H | O |
| D-16459 | Me(R) | single bond | H | $CH_2C{\equiv}CH$ | C(═O)Me | Me | H | O |
| D-16460 | Me(S) | single bond | H | $CH_2C{\equiv}CH$ | C(═O)Me | Me | H | O |
| D-16461 | H | single bond | Me | $CH_2CN$ | C(═O)Me | Cl | H | O |
| D-16462 | Me | single bond | H | $CH_2CN$ | C(═O)Me | Cl | H | O |
| D-16463 | Me(R) | single bond | H | $CH_2CN$ | C(═O)Me | Cl | H | O |
| D-16464 | Me(S) | single bond | H | $CH_2CN$ | C(═O)Me | Cl | H | O |
| D-16465 | H | single bond | Me | $CH_2CN$ | C(═O)Me | Me | H | O |
| D-16466 | Me | single bond | H | $CH_2CN$ | C(═O)Me | Me | H | O |
| D-16467 | Me(R) | single bond | H | $CH_2CN$ | C(═O)Me | Me | H | O |
| D-16468 | Me(S) | single bond | H | $CH_2CN$ | C(═O)Me | Me | H | O |
| D-16469 | H | single bond | Me | CH(Me)CN | C(═O)Me | Cl | H | O |
| D-16470 | Me | single bond | H | CH(Me)CN | C(═O)Me | Cl | H | O |
| D-16471 | Me(R) | single bond | H | CH(Me)CN | C(═O)Me | Cl | H | O |
| D-16472 | Me(S) | single bond | H | CH(Me)CN | C(═O)Me | Cl | H | O |
| D-16473 | H | single bond | Me | CH(Me)CN | C(═O)Me | Me | H | O |
| D-16474 | Me | single bond | H | CH(Me)CN | C(═O)Me | Me | H | O |

TABLE 1021

| Compound Number | Y | W | Z | $R^1$ | $R^2$ | $R^3$ | $R^{10}$ | A |
|---|---|---|---|---|---|---|---|---|
| D-16475 | Me(R) | single bond | H | CH(Me)CN | C(═O)Me | Me | H | O |
| D-16476 | Me(S) | single bond | H | CH(Me)CN | C(═O)Me | Me | H | O |
| D-16477 | H | single bond | Me | $C(Me)_2CN$ | C(═O)Me | Cl | H | O |
| D-16478 | Me | single bond | H | $C(Me)_2CN$ | C(═O)Me | Cl | H | O |
| D-16479 | Me(R) | single bond | H | $C(Me)_2CN$ | C(═O)Me | Cl | H | O |
| D-16480 | Me(S) | single bond | H | $C(Me)_2CN$ | C(═O)Me | Cl | H | O |
| D-16481 | H | single bond | Me | $C(Me)_2CN$ | C(═O)Me | Me | H | O |
| D-16482 | Me | single bond | H | $C(Me)_2CN$ | C(═O)Me | Me | H | O |
| D-16483 | Me(R) | single bond | H | $C(Me)_2CN$ | C(═O)Me | Me | H | O |
| D-16484 | Me(S) | single bond | H | $C(Me)_2CN$ | C(═O)Me | Me | H | O |
| D-16485 | H | single bond | Me | C(Me)(i-Pr)CN | C(═O)Me | Cl | H | O |
| D-16486 | Me | single bond | H | C(Me)(i-Pr)CN | C(═O)Me | Cl | H | O |
| D-16487 | Me(R) | single bond | H | C(Me)(i-Pr)CN | C(═O)Me | Cl | H | O |
| D-16488 | Me(S) | single bond | H | C(Me)(i-Pr)CN | C(═O)Me | Cl | H | O |
| D-16489 | H | single bond | Me | C(Me)(i-Pr)CN | C(═O)Me | Me | H | O |
| D-16490 | Me | single bond | H | C(Me)(i-Pr)CN | C(═O)Me | Me | H | O |
| D-16491 | Me(R) | single bond | H | C(Me)(i-Pr)CN | C(═O)Me | Me | H | O |
| D-16492 | Me(S) | single bond | H | C(Me)(i-Pr)CN | C(═O)Me | Me | H | O |
| D-16493 | H | single bond | Me | OMe | C(═O)Me | Cl | H | O |
| D-16494 | Me | single bond | H | OMe | C(═O)Me | Cl | H | O |
| D-16495 | Me(R) | single bond | H | OMe | C(═O)Me | Cl | H | O |
| D-16496 | Me(S) | single bond | H | OMe | C(═O)Me | Cl | H | O |
| D-16497 | H | single bond | Me | OMe | C(═O)Me | Me | H | O |
| D-16498 | Me | single bond | H | OMe | C(═O)Me | Me | H | O |
| D-16499 | Me(R) | single bond | H | OMe | C(═O)Me | Me | H | O |
| D-16500 | Me(S) | single bond | H | OMe | C(═O)Me | Me | H | O |
| D-16501 | H | single bond | Me | CH═NOMe | C(═O)Me | Cl | H | O |
| D-16502 | Me | single bond | H | CH═NOMe | C(═O)Me | Cl | H | O |
| D-16503 | Me(R) | single bond | H | CH═NOMe | C(═O)Me | Cl | H | O |
| D-16504 | Me(S) | single bond | H | CH═NOMe | C(═O)Me | Cl | H | O |
| D-16505 | H | single bond | Me | CH═NOMe | C(═O)Me | Me | H | O |
| D-16506 | Me | single bond | H | CH═NOMe | C(═O)Me | Me | H | O |
| D-16507 | Me(R) | single bond | H | CH═NOMe | C(═O)Me | Me | H | O |
| D-16508 | Me(S) | single bond | H | CH═NOMe | C(═O)Me | Me | H | O |
| D-16509 | H | single bond | Me | morpholin-4-yl | C(═O)Me | Cl | H | O |

TABLE 1021-continued

| Compound Number | Y | W | Z | $R^1$ | $R^2$ | $R^3$ | $R^{10}$ | A |
|---|---|---|---|---|---|---|---|---|
| D-16510 | Me | single bond | H | morpholin-4-yl | C(=O)Me | Cl | H | O |
| D-16511 | Me(R) | single bond | H | morpholin-4-yl | C(=O)Me | Cl | H | O |
| D-16512 | Me(S) | single bond | H | morpholin-4-yl | C(=O)Me | Cl | H | O |
| D-16513 | H | single bond | Me | morpholin-4-yl | C(=O)Me | Me | H | O |
| D-16514 | Me | single bond | H | morpholin-4-yl | C(=O)Me | Me | H | O |
| D-16515 | Me(R) | single bond | H | morpholin-4-yl | C(=O)Me | Me | H | O |
| D-16516 | Me(S) | single bond | H | morpholin-4-yl | C(=O)Me | Me | H | O |
| D-16517 | H | single bond | Me | Ph | C(=O)Me | Cl | H | O |
| D-16518 | Me | single bond | H | Ph | C(=O)Me | Cl | H | O |

TABLE 1022

| Compound Number | Y | W | Z | $R^1$ | $R^2$ | $R^3$ | $R^{10}$ | A |
|---|---|---|---|---|---|---|---|---|
| D-16519 | Me(R) | single bond | H | Ph | C(=O)Me | Cl | H | O |
| D-16520 | Me(S) | single bond | H | Ph | C(=O)Me | Cl | H | O |
| D-16521 | H | single bond | Me | Ph | C(=O)Me | Me | H | O |
| D-16522 | Me | single bond | H | Ph | C(=O)Me | Me | H | O |
| D-16523 | Me(R) | single bond | H | Ph | C(=O)Me | Me | H | O |
| D-16524 | Me(S) | single bond | H | Ph | C(=O)Me | Me | H | O |
| D-16525 | H | single bond | Me | $CH_2Ph$ | C(=O)Me | Cl | H | O |
| D-16526 | Me | single bond | H | $CH_2Ph$ | C(=O)Me | Cl | H | O |
| D-16527 | Me(R) | single bond | H | $CH_2Ph$ | C(=O)Me | Cl | H | O |
| D-16528 | Me(S) | single bond | H | $CH_2Ph$ | C(=O)Me | Cl | H | O |
| D-16529 | H | single bond | Me | $CH_2Ph$ | C(=O)Me | Me | H | O |
| D-16530 | Me | single bond | H | $CH_2Ph$ | C(=O)Me | Me | H | O |
| D-16531 | Me(R) | single bond | H | $CH_2Ph$ | C(=O)Me | Me | H | O |
| D-16532 | Me(S) | single bond | H | $CH_2Ph$ | C(=O)Me | Me | H | O |
| D-16533 | H | single bond | Me | thiazole-2-yl | C(=O)Me | Cl | H | O |
| D-16534 | Me | single bond | H | thiazole-2-yl | C(=O)Me | Cl | H | O |
| D-16535 | Me(R) | single bond | H | thiazole-2-yl | C(=O)Me | Cl | H | O |
| D-16536 | Me(S) | single bond | H | thiazole-2-yl | C(=O)Me | Cl | H | O |
| D-16537 | H | single bond | Me | thiazole-2-yl | C(=O)Me | Me | H | O |
| D-16538 | Me | single bond | H | thiazole-2-yl | C(=O)Me | Me | H | O |
| D-16539 | Me(R) | single bond | H | thiazole-2-yl | C(=O)Me | Me | H | O |
| D-16540 | Me(S) | single bond | H | thiazole-2-yl | C(=O)Me | Me | H | O |
| D-16541 | H | single bond | Me | 1-Me-pyrazol-3-yl | C(=O)Me | Cl | H | O |
| D-16542 | Me | single bond | H | 1-Me-pyrazol-3-yl | C(=O)Me | Cl | H | O |
| D-16543 | Me(R) | single bond | H | 1-Me-pyrazol-3-yl | C(=O)Me | Cl | H | O |
| D-16544 | Me(S) | single bond | H | 1-Me-pyrazol-3-yl | C(=O)Me | Cl | H | O |
| D-16545 | H | single bond | Me | 1-Me-pyrazol-3-yl | C(=O)Me | Me | H | O |
| D-16546 | Me | single bond | H | 1-Me-pyrazol-3-yl | C(=O)Me | Me | H | O |
| D-16547 | Me(R) | single bond | H | 1-Me-pyrazol-3-yl | C(=O)Me | Me | H | O |
| D-16548 | Me(S) | single bond | H | 1-Me-pyrazol-3-yl | C(=O)Me | Me | H | O |
| D-16549 | H | single bond | Me | 1-Me-pyrazol-5-yl | C(=O)Me | Cl | H | O |
| D-16550 | Me | single bond | H | 1-Me-pyrazol-5-yl | C(=O)Me | Cl | H | O |
| D-16551 | Me(R) | single bond | H | 1-Me-pyrazol-5-yl | C(=O)Me | Cl | H | O |
| D-16552 | Me(S) | single bond | H | 1-Me-pyrazol-5-yl | C(=O)Me | Cl | H | O |
| D-16553 | H | single bond | Me | 1-Me-pyrazol-5-yl | C(=O)Me | Me | H | O |
| D-16554 | Me | single bond | H | 1-Me-pyrazol-5-yl | C(=O)Me | Me | H | O |
| D-16555 | Me(R) | single bond | H | 1-Me-pyrazol-5-yl | C(=O)Me | Me | H | O |
| D-16556 | Me(S) | single bond | H | 1-Me-pyrazol-5-yl | C(=O)Me | Me | H | O |
| D-16557 | H | single bond | Me | $CH_2$(pyrimidin-2-yl) | C(=O)Me | Cl | H | O |
| D-16558 | Me | single bond | H | $CH_2$(pyrimidin-2-yl) | C(=O)Me | Cl | H | O |
| D-16559 | Me(R) | single bond | H | $CH_2$(pyrimidin-2-yl) | C(=O)Me | Cl | H | O |
| D-16560 | Me(S) | single bond | H | $CH_2$(pyrimidin-2-yl) | C(=O)Me | Cl | H | O |
| D-16561 | H | single bond | Me | $CH_2$(pyrimidin-2-yl) | C(=O)Me | Me | H | O |
| D-16562 | Me | single bond | H | $CH_2$(pyrimidin-2-yl) | C(=O)Me | Me | H | O |

TABLE 1023

| Compound Number | Y | W | Z | $R^1$ | $R^2$ | $R^3$ | $R^{10}$ | A |
|---|---|---|---|---|---|---|---|---|
| D-16563 | Me(R) | single bond | H | $CH_2$(pyrimidin-2-yl) | C(=O)Me | Me | H | O |
| D-16564 | Me(S) | single bond | H | $CH_2$(pyrimidin-2-yl) | C(=O)Me | Me | H | O |
| D-16565 | H | single bond | Me | Me | C(=O)Me | Cl | Me | O |

TABLE 1023-continued

| Compound Number | Y | W | Z | $R^1$ | $R^2$ | $R^3$ | $R^{10}$ | A |
|---|---|---|---|---|---|---|---|---|
| D-16566 | Me | single bond | H | Me | C(=O)Me | Cl | Me | O |
| D-16567 | Me(R) | single bond | H | Me | C(=O)Me | Cl | Me | O |
| D-16568 | Me(S) | single bond | H | Me | C(=O)Me | Cl | Me | O |
| D-16569 | H | single bond | Me | Me | C(=O)Me | Me | Me | O |
| D-16570 | Me | single bond | H | Me | C(=O)Me | Me | Me | O |
| D-16571 | Me(R) | single bond | H | Me | C(=O)Me | Me | Me | O |
| D-16572 | Me(S) | single bond | H | Me | C(=O)Me | Me | Me | O |
| D-16573 | H | single bond | Me | $CH_2CHF_2$ | C(=O)Me | Cl | Me | O |
| D-16574 | Me | single bond | H | $CH_2CHF_2$ | C(=O)Me | Cl | Me | O |
| D-16575 | Me(R) | single bond | H | $CH_2CHF_2$ | C(=O)Me | Cl | Me | O |
| D-16576 | Me(S) | single bond | H | $CH_2CHF_2$ | C(=O)Me | Cl | Me | O |
| D-16577 | H | single bond | Me | $CH_2CHF_2$ | C(=O)Me | Me | Me | O |
| D-16578 | Me | single bond | H | $CH_2CHF_2$ | C(=O)Me | Me | Me | O |
| D-16579 | Me(R) | single bond | H | $CH_2CHF_2$ | C(=O)Me | Me | Me | O |
| D-16580 | Me(S) | single bond | H | $CH_2CHF_2$ | C(=O)Me | Me | Me | O |
| D-16581 | H | single bond | Me | n-Pr | C(=O)Me | Cl | Me | O |
| D-16582 | Me | single bond | H | n-Pr | C(=O)Me | Cl | Me | O |
| D-16583 | Me(R) | single bond | H | n-Pr | C(=O)Me | Cl | Me | O |
| D-16584 | Me(S) | single bond | H | n-Pr | C(=O)Me | Cl | Me | O |
| D-16585 | H | single bond | Me | n-Pr | C(=O)Me | Me | Me | O |
| D-16586 | Me | single bond | H | n-Pr | C(=O)Me | Me | Me | O |
| D-16587 | Me(R) | single bond | H | n-Pr | C(=O)Me | Me | Me | O |
| D-16588 | Me(S) | single bond | H | n-Pr | C(=O)Me | Me | Me | O |
| D-16589 | H | single bond | Me | i-Pr | C(=O)Me | Cl | Me | O |
| D-16590 | Me | single bond | H | i-Pr | C(=O)Me | Cl | Me | O |
| D-16591 | Me(R) | single bond | H | i-Pr | C(=O)Me | Cl | Me | O |
| D-16592 | Me(S) | single bond | H | i-Pr | C(=O)Me | Cl | Me | O |
| D-16593 | H | single bond | Me | i-Pr | C(=O)Me | Me | Me | O |
| D-16594 | Me | single bond | H | i-Pr | C(=O)Me | Me | Me | O |
| D-16595 | Me(R) | single bond | H | i-Pr | C(=O)Me | Me | Me | O |
| D-16596 | Me(S) | single bond | H | i-Pr | C(=O)Me | Me | Me | O |
| D-16597 | H | single bond | Me | c-Pr(1-F) | C(=O)Me | Cl | Me | O |
| D-16598 | Me | single bond | H | c-Pr(1-F) | C(=O)Me | Cl | Me | O |
| D-16599 | Me(R) | single bond | H | c-Pr(1-F) | C(=O)Me | Cl | Me | O |
| D-16600 | Me(S) | single bond | H | c-Pr(1-F) | C(=O)Me | Cl | Me | O |
| D-16601 | H | single bond | Me | c-Pr(1-F) | C(=O)Me | Me | Me | O |
| D-16602 | Me | single bond | H | c-Pr(1-F) | C(=O)Me | Me | Me | O |
| D-16603 | Me(R) | single bond | H | c-Pr(1-F) | C(=O)Me | Me | Me | O |
| D-16604 | Me(S) | single bond | H | c-Pr(1-F) | C(=O)Me | Me | Me | O |
| D-16605 | H | single bond | Me | c-Pr(2,2-$F_2$) | C(=O)Me | Cl | Me | O |
| D-16606 | Me | single bond | H | c-Pr(2,2-$F_2$) | C(=O)Me | Cl | Me | O |

TABLE 1024

| Compound Number | Y | W | Z | $R^1$ | $R^2$ | $R^3$ | $R^{10}$ | A |
|---|---|---|---|---|---|---|---|---|
| D-16607 | Me(R) | single bond | H | c-Pr(2,2-$F_2$) | C(=O)Me | Cl | Me | O |
| D-16608 | Me(S) | single bond | H | c-Pr(2,2-$F_2$) | C(=O)Me | Cl | Me | O |
| D-16609 | H | single bond | Me | c-Pr(2,2-$F_2$) | C(=O)Me | Me | Me | O |
| D-16610 | Me | single bond | H | c-Pr(2,2-$F_2$) | C(=O)Me | Me | Me | O |
| D-16611 | Me(R) | single bond | H | c-Pr(2,2-$F_2$) | C(=O)Me | Me | Me | O |
| D-16612 | Me(S) | single bond | H | c-Pr(2,2-$F_2$) | C(=O)Me | Me | Me | O |
| D-16613 | H | single bond | Me | c-Pr(1-Cl) | C(=O)Me | Cl | Me | O |
| D-16614 | Me | single bond | H | c-Pr(1-Cl) | C(=O)Me | Cl | Me | O |
| D-16615 | Me(R) | single bond | H | c-Pr(1-Cl) | C(=O)Me | Cl | Me | O |
| D-16616 | Me(S) | single bond | H | c-Pr(1-Cl) | C(=O)Me | Cl | Me | O |
| D-16617 | H | single bond | Me | c-Pr(1-Cl) | C(=O)Me | Me | Me | O |
| D-16618 | Me | single bond | H | c-Pr(1-Cl) | C(=O)Me | Me | Me | O |
| D-16619 | Me(R) | single bond | H | c-Pr(1-Cl) | C(=O)Me | Me | Me | O |
| D-16620 | Me(S) | single bond | H | c-Pr(1-Cl) | C(=O)Me | Me | Me | O |
| D-16621 | H | single bond | Me | c-Pr(1-Br) | C(=O)Me | Cl | Me | O |
| D-16622 | Me | single bond | H | c-Pr(1-Br) | C(=O)Me | Cl | Me | O |
| D-16623 | Me(R) | single bond | H | c-Pr(1-Br) | C(=O)Me | Cl | Me | O |
| D-16624 | Me(S) | single bond | H | c-Pr(1-Br) | C(=O)Me | Cl | Me | O |
| D-16625 | H | single bond | Me | c-Pr(1-Br) | C(=O)Me | Me | Me | O |
| D-16626 | Me | single bond | H | c-Pr(1-Br) | C(=O)Me | Me | Me | O |
| D-16627 | Me(R) | single bond | H | c-Pr(1-Br) | C(=O)Me | Me | Me | O |
| D-16628 | Me(S) | single bond | H | c-Pr(1-Br) | C(=O)Me | Me | Me | O |
| D-16629 | H | single bond | Me | c-Pr(1-Me) | C(=O)Me | Cl | Me | O |
| D-16630 | Me | single bond | H | c-Pr(1-Me) | C(=O)Me | Cl | Me | O |
| D-16631 | Me(R) | single bond | H | c-Pr(1-Me) | C(=O)Me | Cl | Me | O |
| D-16632 | Me(S) | single bond | H | c-Pr(1-Me) | C(=O)Me | Cl | Me | O |

TABLE 1024-continued

| Compound Number | Y | W | Z | $R^1$ | $R^2$ | $R^3$ | $R^{10}$ | A |
|---|---|---|---|---|---|---|---|---|
| D-16633 | H | single bond | Me | c-Pr(1-Me) | C(=O)Me | Me | Me | O |
| D-16634 | Me | single bond | H | c-Pr(1-Me) | C(=O)Me | Me | Me | O |
| D-16635 | Me(R) | single bond | H | c-Pr(1-Me) | C(=O)Me | Me | Me | O |
| D-16636 | Me(S) | single bond | H | c-Pr(1-Me) | C(=O)Me | Me | Me | O |
| D-16637 | H | single bond | Me | c-Pr(1-$CH_2$OH) | C(=O)Me | Cl | Me | O |
| D-16638 | Me | single bond | H | c-Pr(1-$CH_2$OH) | C(=O)Me | Cl | Me | O |
| D-16639 | Me(R) | single bond | H | c-Pr(1-$CH_2$OH) | C(=O)Me | Cl | Me | O |
| D-16640 | Me(S) | single bond | H | c-Pr(1-$CH_2$OH) | C(=O)Me | Cl | Me | O |
| D-16641 | H | single bond | Me | c-Pr(1-$CH_2$OH) | C(=O)Me | Me | Me | O |
| D-16642 | Me | single bond | H | c-Pr(1-$CH_2$OH) | C(=O)Me | Me | Me | O |
| D-16643 | Me(R) | single bond | H | c-Pr(1-$CH_2$OH) | C(=O)Me | Me | Me | O |
| D-16644 | Me(S) | single bond | H | c-Pr(1-$CH_2$OH) | C(=O)Me | Me | Me | O |
| D-16645 | H | single bond | Me | c-Pr[1-$CH_2$OS(=O)$_2$Me] | C(=O)Me | Cl | Me | O |
| D-16646 | Me | single bond | H | c-Pr[1-$CH_2$OS(=O)$_2$Me] | C(=O)Me | Cl | Me | O |
| D-16647 | Me(R) | single bond | H | c-Pr[1-$CH_2$OS(=O)$_2$Me] | C(=O)Me | Cl | Me | O |
| D-16648 | Me(S) | single bond | H | c-Pr[1-$CH_2$OS(=O)$_2$Me] | C(=O)Me | Cl | Me | O |
| D-16649 | H | single bond | Me | c-Pr[1-$CH_2$OS(=O)$_2$Me] | C(=O)Me | Me | Me | O |
| D-16650 | Me | single bond | H | c-Pr[1-$CH_2$OS(=O)$_2$Me] | C(=O)Me | Me | Me | O |

TABLE 1025

| Compound Number | Y | W | Z | $R^1$ | $R^2$ | $R^3$ | $R^{10}$ | A |
|---|---|---|---|---|---|---|---|---|
| D-16651 | Me(R) | single bond | H | c-Pr[1-$CH_2$OS(=O)$_2$Me] | C(=O)Me | Me | Me | O |
| D-16652 | Me(S) | single bond | H | c-Pr[1-$CH_2$OS(=O)$_2$Me] | C(=O)Me | Me | Me | O |
| D-16653 | H | single bond | Me | c-Pr(1-$CH_2$OMe) | C(=O)Me | Cl | Me | O |
| D-16654 | Me | single bond | H | c-Pr(1-$CH_2$OMe) | C(=O)Me | Cl | Me | O |
| D-16655 | Me(R) | single bond | H | c-Pr(1-$CH_2$OMe) | C(=O)Me | Cl | Me | O |
| D-16656 | Me(S) | single bond | H | c-Pr(1-$CH_2$OMe) | C(=O)Me | Cl | Me | O |
| D-16657 | H | single bond | Me | c-Pr(1-$CH_2$OMe) | C(=O)Me | Me | Me | O |
| D-16658 | Me | single bond | H | c-Pr(1-$CH_2$OMe) | C(=O)Me | Me | Me | O |
| D-16659 | Me(R) | single bond | H | c-Pr(1-$CH_2$OMe) | C(=O)Me | Me | Me | O |
| D-16660 | Me(S) | single bond | H | c-Pr(1-$CH_2$OMe) | C(=O)Me | Me | Me | O |
| D-16661 | H | single bond | Me | c-Pr(1-$CH_2$OCN) | C(=O)Me | Cl | Me | O |
| D-16662 | Me | single bond | H | c-Pr(1-$CH_2$OCN) | C(=O)Me | Cl | Me | O |
| D-16663 | Me(R) | single bond | H | c-Pr(1-$CH_2$OCN) | C(=O)Me | Cl | Me | O |
| D-16664 | Me(S) | single bond | H | c-Pr(1-$CH_2$OCN) | C(=O)Me | Cl | Me | O |
| D-16665 | H | single bond | Me | c-Pr(1-$CH_2$OCN) | C(=O)Me | Me | Me | O |
| D-16666 | Me | single bond | H | c-Pr(1-$CH_2$OCN) | C(=O)Me | Me | Me | O |
| D-16667 | Me(R) | single bond | H | c-Pr(1-$CH_2$OCN) | C(=O)Me | Me | Me | O |
| D-16668 | Me(S) | single bond | H | c-Pr(1-$CH_2$OCN) | C(=O)Me | Me | Me | O |
| D-16669 | H | single bond | Me | c-Pr(1-$CH_2$SMe) | C(=O)Me | Cl | Me | O |
| D-16670 | Me | single bond | H | c-Pr(1-$CH_2$SMe) | C(=O)Me | Cl | Me | O |
| D-16671 | Me(R) | single bond | H | c-Pr(1-$CH_2$SMe) | C(=O)Me | Cl | Me | O |
| D-16672 | Me(S) | single bond | H | c-Pr(1-$CH_2$SMe) | C(=O)Me | Cl | Me | O |
| D-16673 | H | single bond | Me | c-Pr(1-$CH_2$SMe) | C(=O)Me | Me | Me | O |
| D-16674 | Me | single bond | H | c-Pr(1-$CH_2$SMe) | C(=O)Me | Me | Me | O |
| D-16675 | Me(R) | single bond | H | c-Pr(1-$CH_2$SMe) | C(=O)Me | Me | Me | O |
| D-16676 | Me(S) | single bond | H | c-Pr(1-$CH_2$SMe) | C(=O)Me | Me | Me | O |
| D-16677 | H | single bond | Me | c-Pr[1-$CH_2$S(=O)Me] | C(=O)Me | Cl | Me | O |
| D-16678 | Me | single bond | H | c-Pr[1-$CH_2$S(=O)Me] | C(=O)Me | Cl | Me | O |
| D-16679 | Me(R) | single bond | H | c-Pr[1-$CH_2$S(=O)Me] | C(=O)Me | Cl | Me | O |
| D-16680 | Me(S) | single bond | H | c-Pr[1-$CH_2$S(=O)Me] | C(=O)Me | Cl | Me | O |
| D-16681 | H | single bond | Me | c-Pr[1-$CH_2$S(=O)Me] | C(=O)Me | Me | Me | O |
| D-16682 | Me | single bond | H | c-Pr[1-$CH_2$S(=O)Me] | C(=O)Me | Me | Me | O |
| D-16683 | Me(R) | single bond | H | c-Pr[1-$CH_2$S(=O)Me] | C(=O)Me | Me | Me | O |
| D-16684 | Me(S) | single bond | H | c-Pr[1-$CH_2$S(=O)Me] | C(=O)Me | Me | Me | O |
| D-16685 | H | single bond | Me | c-Pr[1-$CH_2$S(=O)$_2$Me] | C(=O)Me | Cl | Me | O |
| D-16686 | Me | single bond | H | c-Pr[1-$CH_2$S(=O)$_2$Me] | C(=O)Me | Cl | Me | O |
| D-16687 | Me(R) | single bond | H | c-Pr[1-$CH_2$S(=O)$_2$Me] | C(=O)Me | Cl | Me | O |
| D-16688 | Me(S) | single bond | H | c-Pr[1-$CH_2$S(=O)$_2$Me] | C(=O)Me | Cl | Me | O |
| D-16689 | H | single bond | Me | c-Pr[1-$CH_2$S(=O)$_2$Me] | C(=O)Me | Me | Me | O |
| D-16690 | Me | single bond | H | c-Pr[1-$CH_2$S(=O)$_2$Me] | C(=O)Me | Me | Me | O |
| D-16691 | Me(R) | single bond | H | c-Pr[1-$CH_2$S(=O)$_2$Me] | C(=O)Me | Me | Me | O |
| D-16692 | Me(S) | single bond | H | c-Pr[1-$CH_2$S(=O)$_2$Me] | C(=O)Me | Me | Me | O |
| D-16693 | H | single bond | Me | c-Pr(1-$CH_2$F) | C(=O)Me | Cl | Me | O |
| D-16694 | Me | single bond | H | c-Pr(1-$CH_2$F) | C(=O)Me | Cl | Me | O |

TABLE 1026

| Compound Number | Y | W | Z | $R^1$ | $R^2$ | $R^3$ | $R^{10}$ | A |
|---|---|---|---|---|---|---|---|---|
| D-16695 | Me(R) | single bond | H | c-Pr(1-$CH_2F$) | C(═O)Me | Cl | Me | O |
| D-16696 | Me(S) | single bond | H | c-Pr(1-$CH_2F$) | C(═O)Me | Cl | Me | O |
| D-16697 | H | single bond | Me | c-Pr(1-$CH_2F$) | C(═O)Me | Me | Me | O |
| D-16698 | Me | single bond | H | c-Pr(1-$CH_2F$) | C(═O)Me | Me | Me | O |
| D-16699 | Me(R) | single bond | H | c-Pr(1-$CH_2F$) | C(═O)Me | Me | Me | O |
| D-16700 | Me(S) | single bond | H | c-Pr(1-$CH_2F$) | C(═O)Me | Me | Me | O |
| D-16701 | H | single bond | Me | c-Pr(1-$CHF_2$) | C(═O)Me | Cl | Me | O |
| D-16702 | Me | single bond | H | c-Pr(1-$CHF_2$) | C(═O)Me | Cl | Me | O |
| D-16703 | Me(R) | single bond | H | c-Pr(1-$CHF_2$) | C(═O)Me | Cl | Me | O |
| D-16704 | Me(S) | single bond | H | c-Pr(1-$CHF_2$) | C(═O)Me | Cl | Me | O |
| D-16705 | H | single bond | Me | c-Pr(1-$CHF_2$) | C(═O)Me | Me | Me | O |
| D-16706 | Me | single bond | H | c-Pr(1-$CHF_2$) | C(═O)Me | Me | Me | O |
| D-16707 | Me(R) | single bond | H | c-Pr(1-$CHF_2$) | C(═O)Me | Me | Me | O |
| D-16708 | Me(S) | single bond | H | c-Pr(1-$CHF_2$) | C(═O)Me | Me | Me | O |
| D-16709 | H | single bond | Me | c-Pr(1-$CF_3$) | C(═O)Me | Cl | Me | O |
| D-16710 | Me | single bond | H | c-Pr(1-$CF_3$) | C(═O)Me | Cl | Me | O |
| D-16711 | Me(R) | single bond | H | c-Pr(1-$CF_3$) | C(═O)Me | Cl | Me | O |
| D-16712 | Me(S) | single bond | H | c-Pr(1-$CF_3$) | C(═O)Me | Cl | Me | O |
| D-16713 | H | single bond | Me | c-Pr(1-$CF_3$) | C(═O)Me | Me | Me | O |
| D-16714 | Me | single bond | H | c-Pr(1-$CF_3$) | C(═O)Me | Me | Me | O |
| D-16715 | Me(R) | single bond | H | c-Pr(1-$CF_3$) | C(═O)Me | Me | Me | O |
| D-16716 | Me(S) | single bond | H | c-Pr(1-$CF_3$) | C(═O)Me | Me | Me | O |
| D-16717 | H | single bond | Me | c-Pr(1-C═CH) | C(═O)Me | Cl | Me | O |
| D-16718 | Me | single bond | H | c-Pr(1-C═CH) | C(═O)Me | Cl | Me | O |
| D-16719 | Me(R) | single bond | H | c-Pr(1-C═CH) | C(═O)Me | Cl | Me | O |
| D-16720 | Me(S) | single bond | H | c-Pr(1-C═CH) | C(═O)Me | Cl | Me | O |
| D-16721 | H | single bond | Me | c-Pr(1-C═CH) | C(═O)Me | Me | Me | O |
| D-16722 | Me | single bond | H | c-Pr(1-C═CH) | C(═O)Me | Me | Me | O |
| D-16723 | Me(R) | single bond | H | c-Pr(1-C═CH) | C(═O)Me | Me | Me | O |
| D-16724 | Me(S) | single bond | H | c-Pr(1-C═CH) | C(═O)Me | Me | Me | O |
| D-16725 | H | single bond | Me | c-Pr[1-C(═O)OEt] | C(═O)Me | Cl | Me | O |
| D-16726 | Me | single bond | H | c-Pr[1-C(═O)OEt] | C(═O)Me | Cl | Me | O |
| D-16727 | Me(R) | single bond | H | c-Pr[1-C(═O)OEt] | C(═O)Me | Cl | Me | O |
| D-16728 | Me(S) | single bond | H | c-Pr[1-C(═O)OEt] | C(═O)Me | Cl | Me | O |
| D-16729 | H | single bond | Me | c-Pr[1-C(═O)OEt] | C(═O)Me | Me | Me | O |
| D-16730 | Me | single bond | H | c-Pr[1-C(═O)OEt] | C(═O)Me | Me | Me | O |
| D-16731 | Me(R) | single bond | H | c-Pr[1-C(═O)OEt] | C(═O)Me | Me | Me | O |
| D-16732 | Me(S) | single bond | H | c-Pr[1-C(═O)OEt] | C(═O)Me | Me | Me | O |
| D-16733 | H | single bond | Me | c-Pr[1-C(═O)OH] | C(═O)Me | Cl | Me | O |
| D-16734 | Me | single bond | H | c-Pr[1-C(═O)OH] | C(═O)Me | Cl | Me | O |
| D-16735 | Me(R) | single bond | H | c-Pr[1-C(═O)OH] | C(═O)Me | Cl | Me | O |
| D-16736 | Me(S) | single bond | H | c-Pr[1-C(═O)OH] | C(═O)Me | Cl | Me | O |
| D-16737 | H | single bond | Me | c-Pr[1-C(═O)OH] | C(═O)Me | Me | Me | O |
| D-16738 | Me | single bond | H | c-Pr[1-C(═O)OH] | C(═O)Me | Me | Me | O |

TABLE 1027

| Compound Number | Y | W | Z | $R^1$ | $R^2$ | $R^3$ | $R^{10}$ | A |
|---|---|---|---|---|---|---|---|---|
| D-16739 | Me(R) | single bond | H | c-Pr[1-C(═O)OH] | C(═O)Me | Me | Me | O |
| D-16740 | Me(S) | single bond | H | c-Pr[1-C(═O)OH] | C(═O)Me | Me | Me | O |
| D-16741 | H | single bond | Me | c-Pr[1-C(═O)$NH_2$] | C(═O)Me | Cl | Me | O |
| D-16742 | Me | single bond | H | c-Pr[1-C(═O)$NH_2$] | C(═O)Me | Cl | Me | O |
| D-16743 | Me(R) | single bond | H | c-Pr[1-C(═O)$NH_2$] | C(═O)Me | Cl | Me | O |
| D-16744 | Me(S) | single bond | H | c-Pr[1-C(═O)$NH_2$] | C(═O)Me | Cl | Me | O |
| D-16745 | H | single bond | Me | c-Pr[1-C(═O)$NH_2$] | C(═O)Me | Me | Me | O |
| D-16746 | Me | single bond | H | c-Pr[1-C(═O)$NH_2$] | C(═O)Me | Me | Me | O |
| D-16747 | Me(R) | single bond | H | c-Pr[1-C(═O)$NH_2$] | C(═O)Me | Me | Me | O |
| D-16748 | Me(S) | single bond | H | c-Pr[1-C(═O)$NH_2$] | C(═O)Me | Me | Me | O |
| D-16749 | H | single bond | Me | c-Pr(1-OMe) | C(═O)Me | Cl | Me | O |
| D-16750 | Me | single bond | H | c-Pr(1-OMe) | C(═O)Me | Cl | Me | O |
| D-16751 | Me(R) | single bond | H | c-Pr(1-OMe) | C(═O)Me | Cl | Me | O |
| D-16752 | Me(S) | single bond | H | c-Pr(1-OMe) | C(═O)Me | Cl | Me | O |
| D-16753 | H | single bond | Me | c-Pr(1-OMe) | C(═O)Me | Me | Me | O |
| D-16754 | Me | single bond | H | c-Pr(1-OMe) | C(═O)Me | Me | Me | O |
| D-16755 | Me(R) | single bond | H | c-Pr(1-OMe) | C(═O)Me | Me | Me | O |
| D-16756 | Me(S) | single bond | H | c-Pr(1-OMe) | C(═O)Me | Me | Me | O |
| D-16757 | H | single bond | Me | c-Pr(1-SMe) | C(═O)Me | Cl | Me | O |
| D-16758 | Me | single bond | H | c-Pr(1-SMe) | C(═O)Me | Cl | Me | O |
| D-16759 | Me(R) | single bond | H | c-Pr(1-SMe) | C(═O)Me | Cl | Me | O |
| D-16760 | Me(S) | single bond | H | c-Pr(1-SMe) | C(═O)Me | Cl | Me | O |
| D-16761 | H | single bond | Me | c-Pr(1-SMe) | C(═O)Me | Me | Me | O |

TABLE 1027-continued

| Compound Number | Y | W | Z | $R^1$ | $R^2$ | $R^3$ | $R^{10}$ | A |
|---|---|---|---|---|---|---|---|---|
| D-16762 | Me | single bond | H | c-Pr(1-SMe) | C(=O)Me | Me | Me | O |
| D-16763 | Me(R) | single bond | H | c-Pr(1-SMe) | C(=O)Me | Me | Me | O |
| D-16764 | Me(S) | single bond | H | c-Pr(1-SMe) | C(=O)Me | Me | Me | O |
| D-16765 | H | single bond | Me | c-Pr[1-S(=O)Me] | C(=O)Me | Cl | Me | O |
| D-16766 | Me | single bond | H | c-Pr[1-S(=O)Me] | C(=O)Me | Cl | Me | O |
| D-16767 | Me(R) | single bond | H | c-Pr[1-S(=O)Me] | C(=O)Me | Cl | Me | O |
| D-16768 | Me(S) | single bond | H | c-Pr[1-S(=O)Me] | C(=O)Me | Cl | Me | O |
| D-16769 | H | single bond | Me | c-Pr[1-S(=O)Me] | C(=O)Me | Me | Me | O |
| D-16770 | Me | single bond | H | c-Pr[1-S(=O)Me] | C(=O)Me | Me | Me | O |
| D-16771 | Me(R) | single bond | H | c-Pr[1-S(=O)Me] | C(=O)Me | Me | Me | O |
| D-16772 | Me(S) | single bond | H | c-Pr[1-S(=O)Me] | C(=O)Me | Me | Me | O |
| D-16773 | H | single bond | Me | c-Pr[1-S(=O)$_2$Me] | C(=O)Me | Cl | Me | O |
| D-16774 | Me | single bond | H | c-Pr[1-S(=O)$_2$Me] | C(=O)Me | Cl | Me | O |
| D-16775 | Me(R) | single bond | H | c-Pr[1-S(=O)$_2$Me] | C(=O)Me | Cl | Me | O |
| D-16776 | Me(S) | single bond | H | c-Pr[1-S(=O)$_2$Me] | C(=O)Me | Cl | Me | O |
| D-16777 | H | single bond | Me | c-Pr[1-S(=O)$_2$Me] | C(=O)Me | Me | Me | O |
| D-16778 | Me | single bond | H | c-Pr[1-S(=O)$_2$Me] | C(=O)Me | Me | Me | O |
| D-16779 | Me(R) | single bond | H | c-Pr[1-S(=O)$_2$Me] | C(=O)Me | Me | Me | O |
| D-16780 | Me(S) | single bond | H | c-Pr[1-S(=O)$_2$Me] | C(=O)Me | Me | Me | O |
| D-16781 | H | single bond | Me | c-Pr[1-S(=O)$_2$CHF$_2$] | C(=O)Me | Cl | Me | O |
| D-16782 | Me | single bond | H | c-Pr[1-S(=O)$_2$CHF$_2$] | C(=O)Me | Cl | Me | O |

TABLE 1028

| Compound Number | Y | W | Z | $R^1$ | $R^2$ | $R^3$ | $R^{10}$ | A |
|---|---|---|---|---|---|---|---|---|
| D-16783 | Me(R) | single bond | H | c-Pr[1-S(=O)$_2$CHF$_2$] | C(=O)Me | Cl | Me | O |
| D-16784 | Me(S) | single bond | H | c-Pr[1-S(=O)$_2$CHF$_2$] | C(=O)Me | Cl | Me | O |
| D-16785 | H | single bond | Me | c-Pr[1-S(=O)$_2$CHF$_2$] | C(=O)Me | Me | Me | O |
| D-16786 | Me | single bond | H | c-Pr[1-S(=O)$_2$CHF$_2$] | C(=O)Me | Me | Me | O |
| D-16787 | Me(R) | single bond | H | c-Pr[1-S(=O)$_2$CHF$_2$] | C(=O)Me | Me | Me | O |
| D-16788 | Me(S) | single bond | H | c-Pr[1-S(=O)$_2$CHF$_2$] | C(=O)Me | Me | Me | O |
| D-16789 | H | single bond | Me | c-Pr[1-S(=O)$_2$CF$_3$] | C(=O)Me | Cl | Me | O |
| D-16790 | Me | single bond | H | c-Pr[1-S(=O)$_2$CF$_3$] | C(=O)Me | Cl | Me | O |
| D-16791 | Me(R) | single bond | H | c-Pr[1-S(=O)$_2$CF$_3$] | C(=O)Me | Cl | Me | O |
| D-16792 | Me(S) | single bond | H | c-Pr[1-S(=O)$_2$CF$_3$] | C(=O)Me | Cl | Me | O |
| D-16793 | H | single bond | Me | c-Pr[1-S(=O)$_2$CF$_3$] | C(=O)Me | Me | Me | O |
| D-16794 | Me | single bond | H | c-Pr[1-S(=O)$_2$CF$_3$] | C(=O)Me | Me | Me | O |
| D-16795 | Me(R) | single bond | H | c-Pr[1-S(=O)$_2$CF$_3$] | C(=O)Me | Me | Me | O |
| D-16796 | Me(S) | single bond | H | c-Pr[1-S(=O)$_2$CF$_3$] | C(=O)Me | Me | Me | O |
| D-16797 | H | single bond | Me | c-Pr[1-(5,6-dihydro-1,4,2-dioxazin-3-yl] | C(=O)Me | Cl | Me | O |
| D-16798 | Me | single bond | H | c-Pr[1-(5,6-dihydro-1,4,2-dioxazin-3-yl] | C(=O)Me | Cl | Me | O |
| D-16799 | Me(R) | single bond | H | c-Pr[1-(5,6-dihydro-1,4,2-dioxazin-3-yl] | C(=O)Me | Cl | Me | O |
| D-16800 | Me(S) | single bond | H | c-Pr[1-(5,6-dihydro-1,4,2-dioxazin-3-yl] | C(=O)Me | Cl | Me | O |
| D-16801 | H | single bond | Me | c-Pr[1-(5,6-dihydro-1,4,2-dioxazin-3-yl] | C(=O)Me | Me | Me | O |
| D-16802 | Me | single bond | H | c-Pr[1-(5,6-dihydro-1,4,2-dioxazin-3-yl] | C(=O)Me | Me | Me | O |
| D-16803 | Me(R) | single bond | H | c-Pr[1-(5,6-dihydro-1,4,2-dioxazin-3-yl] | C(=O)Me | Me | Me | O |
| D-16804 | Me(S) | single bond | H | c-Pr[1-(5,6-dihydro-1,4,2-dioxazin-3-yl] | C(=O)Me | Me | Me | O |
| D-16805 | H | single bond | Me | c-Pr[1-(5-hydroxy-1,3,4-oxadiazol-2-yl] | C(=O)Me | Cl | Me | O |
| D-16806 | Me | single bond | H | c-Pr[1-(5-hydroxy-1,3,4-oxadiazol-2-yl] | C(=O)Me | Cl | Me | O |
| D-16807 | Me(R) | single bond | H | c-Pr[1-(5-hydroxy-1,3,4-oxadiazol-2-yl] | C(=O)Me | Cl | Me | O |
| D-16808 | Me(S) | single bond | H | c-Pr[1-(5-hydroxy-1,3,4-oxadiazol-2-yl] | C(=O)Me | Cl | Me | O |
| D-16809 | H | single bond | Me | c-Pr[1-(5-hydroxy-1,3,4-oxadiazol-2-yl] | C(=O)Me | Me | Me | O |
| D-16810 | Me | single bond | H | c-Pr[1-(5-hydroxy-1,3,4-oxadiazol-2-yl] | C(=O)Me | Me | Me | O |
| D-16811 | Me(R) | single bond | H | c-Pr[1-(5-hydroxy-1,3,4-oxadiazol-2-yl] | C(=O)Me | Me | Me | O |
| D-16812 | Me(S) | single bond | H | c-Pr[1-(5-hydroxy-1,3,4-oxadiazol-2-yl] | C(=O)Me | Me | Me | O |
| D-16813 | H | single bond | Me | c-Pr[1-(pyrimidin-2-yl] | C(=O)Me | Cl | Me | O |
| D-16814 | Me | single bond | H | c-Pr[1-(pyrimidin-2-yl] | C(=O)Me | Cl | Me | O |
| D-16815 | Me(R) | single bond | H | c-Pr[1-(pyrimidin-2-yl] | C(=O)Me | Cl | Me | O |
| D-16816 | Me(S) | single bond | H | c-Pr[1-(pyrimidin-2-yl] | C(=O)Me | Cl | Me | O |
| D-16817 | H | single bond | Me | c-Pr[1-(pyrimidin-2-yl] | C(=O)Me | Me | Me | O |
| D-16818 | Me | single bond | H | c-Pr[1-(pyrimidin-2-yl] | C(=O)Me | Me | Me | O |
| D-16819 | Me(R) | single bond | H | c-Pr[1-(pyrimidin-2-yl] | C(=O)Me | Me | Me | O |
| D-16820 | Me(S) | single bond | H | c-Pr[1-(pyrimidin-2-yl] | C(=O)Me | Me | Me | O |
| D-16821 | H | single bond | Me | t-Bu | C(=O)Me | Cl | Me | O |
| D-16822 | Me | single bond | H | t-Bu | C(=O)Me | Cl | Me | O |
| D-16823 | Me(R) | single bond | H | t-Bu | C(=O)Me | Cl | Me | O |
| D-16824 | Me(S) | single bond | H | t-Bu | C(=O)Me | Cl | Me | O |
| D-16825 | H | single bond | Me | t-Bu | C(=O)Me | Me | Me | O |
| D-16826 | Me | single bond | H | t-Bu | C(=O)Me | Me | Me | O |

TABLE 1029

| Compound Number | Y | W | Z | $R^1$ | $R^2$ | $R^3$ | $R^{10}$ | A |
|---|---|---|---|---|---|---|---|---|
| D-16827 | Me(R) | single bond | H | t-Bu | C(=O)Me | Me | Me | O |
| D-16828 | Me(S) | single bond | H | t-Bu | C(=O)Me | Me | Me | O |
| D-16829 | H | single bond | Me | c-Bu | C(=O)Me | Cl | Me | O |
| D-16830 | Me | single bond | H | c-Bu | C(=O)Me | Cl | Me | O |
| D-16831 | Me(R) | single bond | H | c-Bu | C(=O)Me | Cl | Me | O |
| D-16832 | Me(S) | single bond | H | c-Bu | C(=O)Me | Cl | Me | O |
| D-16833 | H | single bond | Me | c-Bu | C(=O)Me | Me | Me | O |
| D-16834 | Me | single bond | H | c-Bu | C(=O)Me | Me | Me | O |
| D-16835 | Me(R) | single bond | H | c-Bu | C(=O)Me | Me | Me | O |
| D-16836 | Me(S) | single bond | H | c-Bu | C(=O)Me | Me | Me | O |
| D-16837 | H | single bond | Me | c-Bu(1-CN) | C(=O)Me | Cl | Me | O |
| D-16838 | Me | single bond | H | c-Bu(1-CN) | C(=O)Me | Cl | Me | O |
| D-16839 | Me(R) | single bond | H | c-Bu(1-CN) | C(=O)Me | Cl | Me | O |
| D-16840 | Me(S) | single bond | H | c-Bu(1-CN) | C(=O)Me | Cl | Me | O |
| D-16841 | H | single bond | Me | c-Bu(1-CN) | C(=O)Me | Me | Me | O |
| D-16842 | Me | single bond | H | c-Bu(1-CN) | C(=O)Me | Me | Me | O |
| D-16843 | Me(R) | single bond | H | c-Bu(1-CN) | C(=O)Me | Me | Me | O |
| D-16844 | Me(S) | single bond | H | c-Bu(1-CN) | C(=O)Me | Me | Me | O |
| D-16845 | H | single bond | Me | c-Bu(3,3-$F_2$) | C(=O)Me | Cl | Me | O |
| D-16846 | Me | single bond | H | c-Bu(3,3-$F_2$) | C(=O)Me | Cl | Me | O |
| D-16847 | Me(R) | single bond | H | c-Bu(3,3-$F_2$) | C(=O)Me | Cl | Me | O |
| D-16848 | Me(S) | single bond | H | c-Bu(3,3-$F_2$) | C(=O)Me | Cl | Me | O |
| D-16849 | H | single bond | Me | c-Bu(3,3-$F_2$) | C(=O)Me | Me | Me | O |
| D-16850 | Me | single bond | H | c-Bu(3,3-$F_2$) | C(=O)Me | Me | Me | O |
| D-16851 | Me(R) | single bond | H | c-Bu(3,3-$F_2$) | C(=O)Me | Me | Me | O |
| D-16852 | Me(S) | single bond | H | c-Bu(3,3-$F_2$) | C(=O)Me | Me | Me | O |
| D-16853 | H | single bond | Me | oxetan-3-yl | C(=O)Me | Cl | Me | O |
| D-16854 | Me | single bond | H | oxetan-3-yl | C(=O)Me | Cl | Me | O |
| D-16855 | Me(R) | single bond | H | oxetan-3-yl | C(=O)Me | Cl | Me | O |
| D-16856 | Me(S) | single bond | H | oxetan-3-yl | C(=O)Me | Cl | Me | O |
| D-16857 | H | single bond | Me | oxetan-3-yl | C(=O)Me | Me | Me | O |
| D-16858 | Me | single bond | H | oxetan-3-yl | C(=O)Me | Me | Me | O |
| D-16859 | Me(R) | single bond | H | oxetan-3-yl | C(=O)Me | Me | Me | O |
| D-16860 | Me(S) | single bond | H | oxetan-3-yl | C(=O)Me | Me | Me | O |
| D-16861 | H | single bond | Me | oxetan(3-CN)-3-yl | C(=O)Me | Cl | Me | O |
| D-16862 | Me | single bond | H | oxetan(3-CN)-3-yl | C(=O)Me | Cl | Me | O |
| D-16863 | Me(R) | single bond | H | oxetan(3-CN)-3-yl | C(=O)Me | Cl | Me | O |
| D-16864 | Me(S) | single bond | H | oxetan(3-CN)-3-yl | C(=O)Me | Cl | Me | O |
| D-16865 | H | single bond | Me | oxetan(3-CN)-3-yl | C(=O)Me | Me | Me | O |
| D-16866 | Me | single bond | H | oxetan(3-CN)-3-yl | C(=O)Me | Me | Me | O |
| D-16867 | Me(R) | single bond | H | oxetan(3-CN)-3-yl | C(=O)Me | Me | Me | O |
| D-16868 | Me(S) | single bond | H | oxetan(3-CN)-3-yl | C(=O)Me | Me | Me | O |
| D-16869 | H | single bond | Me | azetidin[1-C(=O)Me]-3-yl | C(=O)Me | Cl | Me | O |
| D-16870 | Me | single bond | H | azetidin[1-C(=O)Me]-3-yl | C(=O)Me | Cl | Me | O |

TABLE 1030

| Compound Number | Y | W | Z | $R^1$ | $R^2$ | $R^3$ | $R^{10}$ | A |
|---|---|---|---|---|---|---|---|---|
| D-16871 | Me(R) | single bond | H | azetidin[1-C(=O)Me]-3-yl | C(=O)Me | Cl | Me | O |
| D-16872 | Me(S) | single bond | H | azetidin[1-C(=O)Me]-3-yl | C(=O)Me | Cl | Me | O |
| D-16873 | H | single bond | Me | azetidin[1-C(=O)Me]-3-yl | C(=O)Me | Me | Me | O |
| D-16874 | Me | single bond | H | azetidin[1-C(=O)Me]-3-yl | C(=O)Me | Me | Me | O |
| D-16875 | Me(R) | single bond | H | azetidin[1-C(=O)Me]-3-yl | C(=O)Me | Me | Me | O |
| D-16876 | Me(S) | single bond | H | azetidin[1-C(=O)Me]-3-yl | C(=O)Me | Me | Me | O |
| D-16877 | H | single bond | Me | azetidin[1-S(=O)$_2$Me]3-yl | C(=O)Me | Cl | Me | O |
| D-16878 | Me | single bond | H | azetidin[1-S(=O)$_2$Me]-3-yl | C(=O)Me | Cl | Me | O |
| D-16879 | Me(R) | single bond | H | azetidin[1-S(=O)$_2$Me]-3-yl | C(=O)Me | Cl | Me | O |
| D-16880 | Me(S) | single bond | H | azetidin[1-S(=O)$_2$Me]-3-yl | C(=O)Me | Cl | Me | O |
| D-16881 | H | single bond | Me | azetidin[1-S(=O)$_2$Me]-3-yl | C(=O)Me | Me | Me | O |
| D-16882 | Me | single bond | H | azetidin[1-S(=O)$_2$Me]-3-yl | C(=O)Me | Me | Me | O |
| D-16883 | Me(R) | single bond | H | azetidin[1-S(=O)$_2$Me]-3-yl | C(=O)Me | Me | Me | O |
| D-16884 | Me(S) | single bond | H | azetidin[1-S(=O)$_2$Me]-3-yl | C(=O)Me | Me | Me | O |
| D-16885 | H | single bond | Me | azetidin[1-S(=O)$_2$CHF$_2$]-3-yl | C(=O)Me | Cl | Me | O |
| D-16886 | Me | single bond | H | azetidin[1-S(=O)$_2$CHF$_2$]-3-yl | C(=O)Me | Cl | Me | O |
| D-16887 | Me(R) | single bond | H | azetidin[1-S(=O)$_2$CHF$_2$]-3-yl | C(=O)Me | Cl | Me | O |
| D-16888 | Me(S) | single bond | H | azetidin[1-S(=O)$_2$CHF$_2$]-3-yl | C(=O)Me | Cl | Me | O |
| D-16889 | H | single bond | Me | azetidin[1-S(=O)$_2$CHF$_2$]-3-yl | C(=O)Me | Me | Me | O |
| D-16890 | Me | single bond | H | azetidin[1-S(=O)$_2$CHF$_2$]-3-yl | C(=O)Me | Me | Me | O |
| D-16891 | Me(R) | single bond | H | azetidin[1-S(=O)$_2$CHF$_2$]-3-yl | C(=O)Me | Me | Me | O |

TABLE 1030-continued

| Compound Number | Y | W | Z | $R^1$ | $R^2$ | $R^3$ | $R^{10}$ | A |
|---|---|---|---|---|---|---|---|---|
| D-16892 | Me(S) | single bond | H | azetidin[1-S(=O)$_2$CHF$_2$]-3-yl | C(=O)Me | Me | Me | O |
| D-16893 | H | single bond | Me | c-Pen | C(=O)Me | Cl | Me | O |
| D-16894 | Me | single bond | H | c-Pen | C(=O)Me | Cl | Me | O |
| D-16895 | Me(R) | single bond | H | c-Pen | C(=O)Me | Cl | Me | O |
| D-16896 | Me(S) | single bond | H | c-Pen | C(=O)Me | Cl | Me | O |
| D-16897 | H | single bond | Me | c-Pen | C(=O)Me | Me | Me | O |
| D-16898 | Me | single bond | H | c-Pen | C(=O)Me | Me | Me | O |
| D-16899 | Me(R) | single bond | H | c-Pen | C(=O)Me | Me | Me | O |
| D-16900 | Me(S) | single bond | H | c-Pen | C(=O)Me | Me | Me | O |
| D-16901 | H | single bond | Me | tetrahydrofuran-3-yl | C(=O)Me | Cl | Me | O |
| D-16902 | Me | single bond | H | tetrahydrofuran-3-yl | C(=O)Me | Cl | Me | O |
| D-16903 | Me(R) | single bond | H | tetrahydrofuran-3-yl | C(=O)Me | Cl | Me | O |
| D-16904 | Me(S) | single bond | H | tetrahydrofuran-3-yl | C(=O)Me | Cl | Me | O |
| D-16905 | H | single bond | Me | tetrahydrofuran-3-yl | C(=O)Me | Me | Me | O |
| D-16906 | Me | single bond | H | tetrahydrofuran-3-yl | C(=O)Me | Me | Me | O |
| D-16907 | Me(R) | single bond | H | tetrahydrofuran-3-yl | C(=O)Me | Me | Me | O |
| D-16908 | Me(S) | single bond | H | tetrahydrofuran-3-yl | C(=O)Me | Me | Me | O |
| D-16909 | H | single bond | Me | tetrahydrothiophen-3-yl | C(=O)Me | Cl | Me | O |
| D-16910 | Me | single bond | H | tetrahydrothiophen-3-yl | C(=O)Me | Cl | Me | O |
| D-16911 | Me(R) | single bond | H | tetrahydrothiophen-3-yl | C(=O)Me | Cl | Me | O |
| D-16912 | Me(S) | single bond | H | tetrahydrothiophen-3-yl | C(=O)Me | Cl | Me | O |
| D-16913 | H | single bond | Me | tetrahydrothiophen-3-yl | C(=O)Me | Me | Me | O |
| D-16914 | Me | single bond | H | tetrahydrothiophen-3-yl | C(=O)Me | Me | Me | O |

TABLE 1031

| Compound Number | Y | W | Z | $R^1$ | $R^2$ | $R^3$ | $R^{10}$ | A |
|---|---|---|---|---|---|---|---|---|
| D-16915 | Me(R) | single bond | H | tetrahydrothiophen-3-yl | C(=O)Me | Me | Me | O |
| D-16916 | Me(S) | single bond | H | tetrahydrothiophen-3-yl | C(=O)Me | Me | Me | O |
| D-16917 | H | single bond | Me | c-Pen(1-CN) | C(=O)Me | Cl | Me | O |
| D-16918 | Me | single bond | H | c-Pen(1-CN) | C(=O)Me | Cl | Me | O |
| D-16919 | Me(R) | single bond | H | c-Pen(1-CN) | C(=O)Me | Cl | Me | O |
| D-16920 | Me(S) | single bond | H | c-Pen(1-CN) | C(=O)Me | Cl | Me | O |
| D-16921 | H | single bond | Me | c-Pen(1-CN) | C(=O)Me | Me | Me | O |
| D-16922 | Me | single bond | H | c-Pen(1-CN) | C(=O)Me | Me | Me | O |
| D-16923 | Me(R) | single bond | H | c-Pen(1-CN) | C(=O)Me | Me | Me | O |
| D-16924 | Me(S) | single bond | H | c-Pen(1-CN) | C(=O)Me | Me | Me | O |
| D-16925 | H | single bond | Me | tetrahydrofuran(3-CN)-3-yl | C(=O)Me | Cl | Me | O |
| D-16926 | Me | single bond | H | tetrahydrofuran(3-CN)-3-yl | C(=O)Me | Cl | Me | O |
| D-16927 | Me(R) | single bond | H | tetrahydrofuran(3-CN)-3-yl | C(=O)Me | Cl | Me | O |
| D-16928 | Me(S) | single bond | H | tetrahydrofuran(3-CN)-3-yl | C(=O)Me | Cl | Me | O |
| D-16929 | H | single bond | Me | tetrahydrofuran(3-CN)-3-yl | C(=O)Me | Me | Me | O |
| D-16930 | Me | single bond | H | tetrahydrofuran(3-CN)-3-yl | C(=O)Me | Me | Me | O |
| D-16931 | Me(R) | single bond | H | tetrahydrofuran(3-CN)-3-yl | C(=O)Me | Me | Me | O |
| D-16932 | Me(S) | single bond | H | tetrahydrofuran(3-CN)-3-yl | C(=O)Me | Me | Me | O |
| D-16933 | H | single bond | Me | tetrahydrothiophen(3-CN)-3-yl | C(=O)Me | Cl | Me | O |
| D-16934 | Me | single bond | H | tetrahydrothiophen(3-CN)-3-yl | C(=O)Me | Cl | Me | O |
| D-16935 | Me(R) | single bond | H | tetrahydrothiophen(3-CN)-3-yl | C(=O)Me | Cl | Me | O |
| D-16936 | Me(S) | single bond | H | tetrahydrothiophen(3-CN)-3-yl | C(=O)Me | Cl | Me | O |
| D-16937 | H | single bond | Me | tetrahydrothiophen(3-CN)-3-yl | C(=O)Me | Me | Me | O |
| D-16938 | Me | single bond | H | tetrahydrothiophen(3-CN)-3-yl | C(=O)Me | Me | Me | O |
| D-16939 | Me(R) | single bond | H | tetrahydrothiophen(3-CN)-3-yl | C(=O)Me | Me | Me | O |
| D-16940 | Me(S) | single bond | H | tetrahydrothiophen(3-CN)-3-yl | C(=O)Me | Me | Me | O |
| D-16941 | H | single bond | Me | bicyclo[1.1.1]pentan-1-yl | C(=O)Me | Cl | Me | O |
| D-16942 | Me | single bond | H | bicyclo[1.1.1]pentan-1-yl | C(=O)Me | Cl | Me | O |
| D-16943 | Me(R) | single bond | H | bicyclo[1.1.1]pentan-1-yl | C(=O)Me | Cl | Me | O |
| D-16944 | Me(S) | single bond | H | bicyclo[1.1.1]pentan-1-yl | C(=O)Me | Cl | Me | O |
| D-16945 | H | single bond | Me | bicyclo[1.1.1]pentan-1-yl | C(=O)Me | Me | Me | O |
| D-16946 | Me | single bond | H | bicyclo[1.1.1]pentan-1-yl | C(=O)Me | Me | Me | O |
| D-16947 | Me(R) | single bond | H | bicyclo[1.1.1]pentan-1-yl | C(=O)Me | Me | Me | O |
| D-16948 | Me(S) | single bond | H | bicyclo[1.1.1]pentan-1-yl | C(=O)Me | Me | Me | O |
| D-16949 | H | single bond | Me | c-Hex | C(=O)Me | Cl | Me | O |
| D-16950 | Me | single bond | H | c-Hex | C(=O)Me | Cl | Me | O |
| D-16951 | Me(R) | single bond | H | c-Hex | C(=O)Me | Cl | Me | O |
| D-16952 | Me(S) | single bond | H | c-Hex | C(=O)Me | Cl | Me | O |
| D-16953 | H | single bond | Me | cHex | C(=O)Me | Me | Me | O |
| D-16954 | Me | single bond | H | c-Hex | C(=O)Me | Me | Me | O |
| D-16955 | Me(R) | single bond | H | c-Hex | C(=O)Me | Me | Me | O |
| D-16956 | Me(S) | single bond | H | c-Hex | C(=O)Me | Me | Me | O |

TABLE 1031-continued

| Compound Number | Y | W | Z | $R^1$ | $R^2$ | $R^3$ | $R^{10}$ | A |
|---|---|---|---|---|---|---|---|---|
| D-16957 | H | single bond | Me | tetrahydropyran-4-yl | C(═O)Me | Cl | Me | O |
| D-16958 | Me | single bond | H | tetrahydropyran-4-yl | C(═O)Me | Cl | Me | O |

TABLE 1032

| Compound Number | Y | W | Z | $R^1$ | $R^2$ | $R^3$ | $R^{10}$ | A |
|---|---|---|---|---|---|---|---|---|
| D-16959 | Me(R) | single bond | H | tetrahydropyran-4-yl | C(═O)Me | Cl | Me | O |
| D-16960 | Me(S) | single bond | H | tetrahydropyran-4-yl | C(═O)Me | Cl | Me | O |
| D-16961 | H | single bond | Me | tetrahydropyran-4-yl | C(═O)Me | Me | Me | O |
| D-16962 | Me | single bond | H | tetrahydropyran-4-yl | C(═O)Me | Me | Me | O |
| D-16963 | Me(R) | single bond | H | tetrahydropyran-4-yl | C(═O)Me | Me | Me | O |
| D-16964 | Me(S) | single bond | H | tetrahydropyran-4-yl | C(═O)Me | Me | Me | O |
| D-16965 | H | single bond | Me | tetrahydrothiopyran-4-yl | C(═O)Me | Cl | Me | O |
| D-16966 | Me | single bond | H | tetrahydrothiopyran-4-yl | C(═O)Me | Cl | Me | O |
| D-16967 | Me(R) | single bond | H | tetrahydrothiopyran-4-yl | C(═O)Me | Cl | Me | O |
| D-16968 | Me(S) | single bond | H | tetrahydrothiopyran-4-yl | C(═O)Me | Cl | Me | O |
| D-16969 | H | single bond | Me | tetrahydrothiopyran-4-yl | C(═O)Me | Me | Me | O |
| D-16970 | Me | single bond | H | tetrahydrothiopyran-4-yl | C(═O)Me | Me | Me | O |
| D-16971 | Me(R) | single bond | H | tetrahydrothiopyran-4-yl | C(═O)Me | Me | Me | O |
| D-16972 | Me(S) | single bond | H | tetrahydrothiopyran-4-yl | C(═O)Me | Me | Me | O |
| D-16973 | H | single bond | Me | c-Hex(1-CN) | C(═O)Me | Cl | Me | O |
| D-16974 | Me | single bond | H | c-Hex(1-CN) | C(═O)Me | Cl | Me | O |
| D-16975 | Me(R) | single bond | H | c-Hex(1-CN) | C(═O)Me | Cl | Me | O |
| D-16976 | Me(S) | single bond | H | c-Hex(1-CN) | C(═O)Me | Cl | Me | O |
| D-16977 | H | single bond | Me | c-Hex(1-CN) | C(═O)Me | Me | Me | O |
| D-16978 | Me | single bond | H | c-Hex(1-CN) | C(═O)Me | Me | Me | O |
| D-16979 | Me(R) | single bond | H | c-Hex(1-CN) | C(═O)Me | Me | Me | O |
| D-16980 | Me(S) | single bond | H | c-Hex(1-CN) | C(═O)Me | Me | Me | O |
| D-16981 | H | single bond | Me | tetrahydropyran(4-CN)-4-yl | C(═O)Me | Cl | Me | O |
| D-16982 | Me | single bond | H | tetrahydropyran(4-CN)-4-yl | C(═O)Me | Cl | Me | O |
| D-16983 | Me(R) | single bond | H | tetrahydropyran(4-CN)-4-yl | C(═O)Me | Cl | Me | O |
| D-16984 | Me(S) | single bond | H | tetrahydropyran(4-CN)-4-yl | C(═O)Me | Cl | Me | O |
| D-16985 | H | single bond | Me | tetrahydropyran(4-CN)-4-yl | C(═O)Me | Me | Me | O |
| D-16986 | Me | single bond | H | tetrahydropyran(4-CN)-4-yl | C(═O)Me | Me | Me | O |
| D-16987 | Me(R) | single bond | H | tetrahydropyran(4-CN)-4-yl | C(═O)Me | Me | Me | O |
| D-16988 | Me(S) | single bond | H | tetrahydropyran(4-CN)-4-yl | C(═O)Me | Me | Me | O |
| D-16989 | H | single bond | Me | tetrahydrothiopyran(4-CN)-4-yl | C(═O)Me | Cl | Me | O |
| D-16990 | Me | single bond | H | tetrahydrothiopyran(4-CN)-4-yl | C(═O)Me | Cl | Me | O |
| D-16991 | Me(R) | single bond | H | tetrahydrothiopyran(4-CN)-4-yl | C(═O)Me | Cl | Me | O |
| D-16992 | Me(S) | single bond | H | tetrahydrothiopyran(4-CN)-4-yl | C(═O)Me | Cl | Me | O |
| D-16993 | H | single bond | Me | tetrahydrothiopyran(4-CN)-4-yl | C(═O)Me | Me | Me | O |
| D-16994 | Me | single bond | H | tetrahydrothiopyran(4-CN)-4-yl | C(═O)Me | Me | Me | O |
| D-16995 | Me(R) | single bond | H | tetrahydrothiopyran(4-CN)-4-yl | C(═O)Me | Me | Me | O |
| D-16996 | Me(S) | single bond | H | tetrahydrothiopyran(4-CN)-4-yl | C(═O)Me | Me | Me | O |
| D-16997 | H | single bond | Me | $CH_2$(c-Pr) | C(═O)Me | Cl | Me | O |
| D-16998 | Me | single bond | H | $CH_2$(c-Pr) | C(═O)Me | Cl | Me | O |
| D-16999 | Me(R) | single bond | H | $CH_2$(c-Pr) | C(═O)Me | Cl | Me | O |
| D-17000 | Me(S) | single bond | H | $CH_2$(c-Pr) | C(═O)Me | Cl | Me | O |
| D-17001 | H | single bond | Me | $CH_2$(c-Pr) | C(═O)Me | Me | Me | O |
| D-17002 | Me | single bond | H | $CH_2$(c-Pr) | C(═O)Me | Me | Me | O |

TABLE 1033

| Compound Number | Y | W | Z | $R^1$ | $R^2$ | $R^3$ | $R^{10}$ | A |
|---|---|---|---|---|---|---|---|---|
| D-17003 | Me(R) | single bond | H | $CH_2$(c-Pr) | C(═O)Me | Me | Me | O |
| D-17004 | Me(S) | single bond | H | $CH_2$(c-Pr) | C(═O)Me | Me | Me | O |
| D-17005 | H | single bond | Me | $CH_2$[c-Pr(1-CN)] | C(═O)Me | Cl | Me | O |
| D-17006 | Me | single bond | H | $CH_2$[c-Pr(1-CN)] | C(═O)Me | Cl | Me | O |
| D-17007 | Me(R) | single bond | H | $CH_2$[c-Pr(1-CN)] | C(═O)Me | Cl | Me | O |
| D-17008 | Me(S) | single bond | H | $CH_2$[c-Pr(1-CN)] | C(═O)Me | Cl | Me | O |
| D-17009 | H | single bond | Me | $CH_2$[c-Pr(1-CN)] | C(═O)Me | Me | Me | O |
| D-17010 | Me | single bond | H | $CH_2$[c-Pr(1-CN)] | C(═O)Me | Me | Me | O |
| D-17011 | Me(R) | single bond | H | $CH_2$[c-Pr(1-CN)] | C(═O)Me | Me | Me | O |
| D-17012 | Me(S) | single bond | H | $CH_2$[c-Pr(1-CN)] | C(═O)Me | Me | Me | O |
| D-17013 | H | single bond | Me | CH(Me)(c-Pr) | C(═O)Me | Cl | Me | O |
| D-17014 | Me | single bond | H | CH(Me)(c-Pr) | C(═O)Me | Cl | Me | O |

TABLE 1033-continued

| Compound Number | Y | W | Z | $R^1$ | $R^2$ | $R^3$ | $R^{10}$ | A |
|---|---|---|---|---|---|---|---|---|
| D-17015 | Me(R) | single bond | H | CH(Me)(c-Pr) | C(=O)Me | Cl | Me | O |
| D-17016 | Me(S) | single bond | H | CH(Me)(c-Pr) | C(=O)Me | Cl | Me | O |
| D-17017 | H | single bond | Me | CH(Me)(c-Pr) | C(=O)Me | Me | Me | O |
| D-17018 | Me | single bond | H | CH(Me)(c-Pr) | C(=O)Me | Me | Me | O |
| D-17019 | Me(R) | single bond | H | CH(Me)(c-Pr) | C(=O)Me | Me | Me | O |
| D-17020 | Me(S) | single bond | H | CH(Me)(c-Pr) | C(=O)Me | Me | Me | O |
| D-17021 | H | single bond | Me | $CH(Me)CH_2OMe$ | C(=O)Me | Cl | Me | O |
| D-17022 | Me | single bond | H | $CH(Me)CH_2OMe$ | C(=O)Me | Cl | Me | O |
| D-17023 | Me(R) | single bond | H | $CH(Me)CH_2OMe$ | C(=O)Me | Cl | Me | O |
| D-17024 | Me(S) | single bond | H | $CH(Me)CH_2OMe$ | C(=O)Me | Cl | Me | O |
| D-17025 | H | single bond | Me | $CH(Me)CH_2OMe$ | C(=O)Me | Me | Me | O |
| D-17026 | Me | single bond | H | $CH(Me)CH_2OMe$ | C(=O)Me | Me | Me | O |
| D-17027 | Me(R) | single bond | H | $CH(Me)CH_2OMe$ | C(=O)Me | Me | Me | O |
| D-17028 | Me(S) | single bond | H | $CH(Me)CH_2OMe$ | C(=O)Me | Me | Me | O |
| D-17029 | H | single bond | Me | $CH_2CH{=}CH_2$ | C(=O)Me | Cl | Me | O |
| D-17030 | Me | single bond | H | $CH_2CH{=}CH_2$ | C(=O)Me | Cl | Me | O |
| D-17031 | Me(R) | single bond | H | $CH_2CH{=}CH_2$ | C(=O)Me | Cl | Me | O |
| D-17032 | Me(S) | single bond | H | $CH_2CH{=}CH_2$ | C(=O)Me | Cl | Me | O |
| D-17033 | H | single bond | Me | $CH_2CH{=}CH_2$ | C(=O)Me | Me | Me | O |
| D-17034 | Me | single bond | H | $CH_2CH{=}CH_2$ | C(=O)Me | Me | Me | O |
| D-17035 | Me(R) | single bond | H | $CH_2CH{=}CH_2$ | C(=O)Me | Me | Me | O |
| D-17036 | Me(S) | single bond | H | $CH_2CH{=}CH_2$ | C(=O)Me | Me | Me | O |
| D-17037 | H | single bond | Me | $CH_2C{\equiv}CH$ | C(=O)Me | Cl | Me | O |
| D-17038 | Me | single bond | H | $CH_2C{\equiv}CH$ | C(=O)Me | Cl | Me | O |
| D-17039 | Me(R) | single bond | H | $CH_2C{\equiv}CH$ | C(=O)Me | Cl | Me | O |
| D-17040 | Me(S) | single bond | H | $CH_2C{\equiv}CH$ | C(=O)Me | Cl | Me | O |
| D-17041 | H | single bond | Me | $CH_2C{\equiv}CH$ | C(=O)Me | Me | Me | O |
| D-17042 | Me | single bond | H | $CH_2C{\equiv}CH$ | C(=O)Me | Me | Me | O |
| D-17043 | Me(R) | single bond | H | $CH_2C{\equiv}CH$ | C(=O)Me | Me | Me | O |
| D-17044 | Me(S) | single bond | H | $CH_2C{\equiv}CH$ | C(=O)Me | Me | Me | O |
| D-17045 | H | single bond | Me | $CH_2CN$ | C(=O)Me | Cl | Me | O |
| D-17046 | Me | single bond | H | $CH_2CN$ | C(=O)Me | Cl | Me | O |

TABLE 1034

| Compound Number | Y | W | Z | $R^1$ | $R^2$ | $R^3$ | $R^{10}$ | A |
|---|---|---|---|---|---|---|---|---|
| D-17047 | Me(R) | single bond | H | $CH_2CN$ | C(=O)Me | Cl | Me | O |
| D-17048 | Me(S) | single bond | H | $CH_2CN$ | C(=O)Me | Cl | Me | O |
| D-17049 | H | single bond | Me | $CH_2CN$ | C(=O)Me | Me | Me | O |
| D-17050 | Me | single bond | H | $CH_2CN$ | C(=O)Me | Me | Me | O |
| D-17051 | Me(R) | single bond | H | $CH_2CN$ | C(=O)Me | Me | Me | O |
| D-17052 | Me(S) | single bond | H | $CH_2CN$ | C(=O)Me | Me | Me | O |
| D-17053 | H | single bond | Me | CH(Me)CN | C(=O)Me | Cl | Me | O |
| D-17054 | Me | single bond | H | CH(Me)CN | C(=O)Me | Cl | Me | O |
| D-17055 | Me(R) | single bond | H | CH(Me)CN | C(=O)Me | Cl | Me | O |
| D-17056 | Me(S) | single bond | H | CH(Me)CN | C(=O)Me | Cl | Me | O |
| D-17057 | H | single bond | Me | CH(Me)CN | C(=O)Me | Me | Me | O |
| D-17058 | Me | single bond | H | CH(Me)CN | C(=O)Me | Me | Me | O |
| D-17059 | Me(R) | single bond | H | CH(Me)CN | C(=O)Me | Me | Me | O |
| D-17060 | Me(S) | single bond | H | CH(Me)CN | C(=O)Me | Me | Me | O |
| D-17061 | H | single bond | Me | $C(Me)_2CN$ | C(=O)Me | Cl | Me | O |
| D-17062 | Me | single bond | H | $C(Me)_2CN$ | C(=O)Me | Cl | Me | O |
| D-17063 | Me(R) | single bond | H | $C(Me)_2CN$ | C(=O)Me | Cl | Me | O |
| D-17064 | Me(S) | single bond | H | $C(Me)_2CN$ | C(=O)Me | Cl | Me | O |
| D-17065 | H | single bond | Me | $C(Me)_2CN$ | C(=O)Me | Me | Me | O |
| D-17066 | Me | single bond | H | $C(Me)_2CN$ | C(=O)Me | Me | Me | O |
| D-17067 | Me(R) | single bond | H | $C(Me)_2CN$ | C(=O)Me | Me | Me | O |
| D-17068 | Me(S) | single bond | H | $C(Me)_2CN$ | C(=O)Me | Me | Me | O |
| D-17069 | H | single bond | Me | C(Me)(i-Pr)CN | C(=O)Me | Cl | Me | O |
| D-17070 | Me | single bond | H | C(Me)(i-Pr)CN | C(=O)Me | Cl | Me | O |
| D-17071 | Me(R) | single bond | H | C(Me)(i-Pr)CN | C(=O)Me | Cl | Me | O |
| D-17072 | Me(S) | single bond | H | C(Me)(i-Pr)CN | C(=O)Me | Cl | Me | O |
| D-17073 | H | single bond | Me | C(Me)(i-Pr)CN | C(=O)Me | Me | Me | O |
| D-17074 | Me | single bond | H | C(Me)(i-Pr)CN | C(=O)Me | Me | Me | O |
| D-17075 | Me(R) | single bond | H | C(Me)(i-Pr)CN | C(=O)Me | Me | Me | O |
| D-17076 | Me(S) | single bond | H | C(Me)(i-Pr)CN | C(=O)Me | Me | Me | O |
| D-17077 | H | single bond | Me | OMe | C(=O)Me | Cl | Me | O |
| D-17078 | Me | single bond | H | OMe | C(=O)Me | Cl | Me | O |
| D-17079 | Me(R) | single bond | H | OMe | C(=O)Me | Cl | Me | O |
| D-17080 | Me(S) | single bond | H | OMe | C(=O)Me | Cl | Me | O |
| D-17081 | H | single bond | Me | OMe | C(=O)Me | Me | Me | O |

TABLE 1034-continued

| Compound Number | Y | W | Z | $R^1$ | $R^2$ | $R^3$ | $R^{10}$ | A |
|---|---|---|---|---|---|---|---|---|
| D-17082 | Me | single bond | H | OMe | C(=O)Me | Me | Me | O |
| D-17083 | Me(R) | single bond | H | OMe | C(=O)Me | Me | Me | O |
| D-17084 | Me(S) | single bond | H | OMe | C(=O)Me | Me | Me | O |
| D-17085 | H | single bond | Me | CH=NOMe | C(=O)Me | Cl | Me | O |
| D-17086 | Me | single bond | H | CH=NOMe | C(=O)Me | Cl | Me | O |
| D-17087 | Me(R) | single bond | H | CH=NOMe | C(=O)Me | Cl | Me | O |
| D-17088 | Me(S) | single bond | H | CH=NOMe | C(=O)Me | Cl | Me | O |
| D-17089 | H | single bond | Me | CH=NOMe | C(=O)Me | Me | Me | O |
| D-17090 | Me | single bond | H | CH=NOMe | C(=O)Me | Me | Me | O |

TABLE 1035

| Compound Number | Y | W | Z | $R^1$ | $R^2$ | $R^3$ | $R^{10}$ | A |
|---|---|---|---|---|---|---|---|---|
| D-17091 | Me(R) | single bond | H | CH=NOMe | C(=O)Me | Me | Me | O |
| D-17092 | Me(S) | single bond | H | CH=NOMe | C(=O)Me | Me | Me | O |
| D-17093 | H | single bond | Me | morpholin-4-yl | C(=O)Me | Cl | Me | O |
| D-17094 | Me | single bond | H | morpholin-4-yl | C(=O)Me | Cl | Me | O |
| D-17095 | Me(R) | single bond | H | morpholin-4-yl | C(=O)Me | Cl | Me | O |
| D-17096 | Me(S) | single bond | H | morpholin-4-yl | C(=O)Me | Cl | Me | O |
| D-17097 | H | single bond | Me | morpholin-4-yl | C(=O)Me | Me | Me | O |
| D-17098 | Me | single bond | H | morpholin-4-yl | C(=O)Me | Me | Me | O |
| D-17099 | Me(R) | single bond | H | morpholin-4-yl | C(=O)Me | Me | Me | O |
| D-17100 | Me(S) | single bond | H | morpholin-4-yl | C(=O)Me | Me | Me | O |
| D-17101 | H | single bond | Me | Ph | C(=O)Me | Cl | Me | O |
| D-17102 | Me | single bond | H | Ph | C(=O)Me | Cl | Me | O |
| D-17103 | Me(R) | single bond | H | Ph | C(=O)Me | Cl | Me | O |
| D-17104 | Me(S) | single bond | H | Ph | C(=O)Me | Cl | Me | O |
| D-17105 | H | single bond | Me | Ph | C(=O)Me | Me | Me | O |
| D-17106 | Me | single bond | H | Ph | C(=O)Me | Me | Me | O |
| D-17107 | Me(R) | single bond | H | Ph | C(=O)Me | Me | Me | O |
| D-17108 | Me(S) | single bond | H | Ph | C(=O)Me | Me | Me | O |
| D-17109 | H | single bond | Me | $CH_2Ph$ | C(=O)Me | Cl | Me | O |
| D-17110 | Me | single bond | H | $CH_2Ph$ | C(=O)Me | Cl | Me | O |
| D-17111 | Me(R) | single bond | H | $CH_2Ph$ | C(=O)Me | Cl | Me | O |
| D-17112 | Me(S) | single bond | H | $CH_2Ph$ | C(=O)Me | Cl | Me | O |
| D-17113 | H | single bond | Me | $CH_2Ph$ | C(=O)Me | Me | Me | O |
| D-17114 | Me | single bond | H | $CH_2Ph$ | C(=O)Me | Me | Me | O |
| D-17115 | Me(R) | single bond | H | $CH_2Ph$ | C(=O)Me | Me | Me | O |
| D-17116 | Me(S) | single bond | H | $CH_2Ph$ | C(=O)Me | Me | Me | O |
| D-17117 | H | single bond | Me | thiazole-2-yl | C(=O)Me | Cl | Me | O |
| D-17118 | Me | single bond | H | thiazole-2-yl | C(=O)Me | Cl | Me | O |
| D-17119 | Me(R) | single bond | H | thiazole-2-yl | C(=O)Me | Cl | Me | O |
| D-17120 | Me(S) | single bond | H | thiazole-2-yl | C(=O)Me | Cl | Me | O |
| D-17121 | H | single bond | Me | thiazole-2-yl | C(=O)Me | Me | Me | O |
| D-17122 | Me | single bond | H | thiazole-2-yl | C(=O)Me | Me | Me | O |
| D-17123 | Me(R) | single bond | H | thiazole-2-yl | C(=O)Me | Me | Me | O |
| D-17124 | Me(S) | single bond | H | thiazole-2-yl | C(=O)Me | Me | Me | O |
| D-17125 | H | single bond | Me | 1-Me-pyrazol-3-yl | C(=O)Me | Cl | Me | O |
| D-17126 | Me | single bond | H | 1-Me-pyrazol-3-yl | C(=O)Me | Cl | Me | O |
| D-17127 | Me(R) | single bond | H | 1-Me-pyrazol-3-yl | C(=O)Me | Cl | Me | O |
| D-17128 | Me(S) | single bond | H | 1-Me-pyrazol-3-yl | C(=O)Me | Cl | Me | O |
| D-17129 | H | single bond | Me | 1-Me-pyrazol-3-yl | C(=O)Me | Me | Me | O |
| D-17130 | Me | single bond | H | 1-Me-pyrazol-3-yl | C(=O)Me | Me | Me | O |
| D-17131 | Me(R) | single bond | H | 1-Me-pyrazol-3-yl | C(=O)Me | Me | Me | O |
| D-17132 | Me(S) | single bond | H | 1-Me-pyrazol-3-yl | C(=O)Me | Me | Me | O |
| D-17133 | H | single bond | Me | 1-Me-pyrazol-5-yl | C(=O)Me | Cl | Me | O |
| D-17134 | Me | single bond | H | 1-Me-pyrazol-5-yl | C(=O)Me | Cl | Me | O |

TABLE 1036

| Compound Number | Y | W | Z | $R^1$ | $R^2$ | $R^3$ | $R^{10}$ | A |
|---|---|---|---|---|---|---|---|---|
| D-17135 | Me(R) | single bond | H | 1-Me-pyrazol-5-yl | C(=O)Me | Cl | Me | O |
| D-17136 | Me(S) | single bond | H | 1-Me-pyrazol-5-yl | C(=O)Me | Cl | Me | O |
| D-17137 | H | single bond | Me | 1-Me-pyrazol-5-yl | C(=O)Me | Me | Me | O |

TABLE 1036-continued

| Compound Number | Y | W | Z | $R^1$ | $R^2$ | $R^3$ | $R^{10}$ | A |
|---|---|---|---|---|---|---|---|---|
| D-17138 | Me | single bond | H | 1-Me-pyrazol-5-yl | C(=O)Me | Me | Me | O |
| D-17139 | Me(R) | single bond | H | 1-Me-pyrazol-5-yl | C(=O)Me | Me | Me | O |
| D-17140 | Me(S) | single bond | H | 1-Me-pyrazol-5-yl | C(=O)Me | Me | Me | O |
| D-17141 | H | single bond | Me | $CH_2$(pyrimidin-2-yl) | C(=O)Me | Cl | Me | O |
| D-17142 | Me | single bond | H | $CH_2$(pyrimidin-2-yl) | C(=O)Me | Cl | Me | O |
| D-17143 | Me(R) | single bond | H | $CH_2$(pyrimidin-2-yl) | C(=O)Me | Cl | Me | O |
| D-17144 | Me(S) | single bond | H | $CH_2$(pyrimidin-2-yl) | C(=O)Me | Cl | Me | O |
| D-17145 | H | single bond | Me | $CH_2$(pyrimidin-2-yl) | C(=O)Me | Me | Me | O |
| D-17146 | Me | single bond | H | $CH_2$(pyrimidin-2-yl) | C(=O)Me | Me | Me | O |
| D-17147 | Me(R) | single bond | H | $CH_2$(pyrimidin-2-yl) | C(=O)Me | Me | Me | O |
| D-17148 | Me(S) | single bond | H | $CH_2$(pyrimidin-2-yl) | C(=O)Me | Me | Me | O |
| D-17149 | H | single bond | Me | Me | C(=O)Me | Cl | $CH_2OMe$ | O |
| D-17150 | Me | single bond | H | Me | C(=O)Me | Cl | $CH_2OMe$ | O |
| D-17151 | Me(R) | single bond | H | Me | C(=O)Me | Cl | $CH_2OMe$ | O |
| D-17152 | Me(S) | single bond | H | Me | C(=O)Me | Cl | $CH_2OMe$ | O |
| D-17153 | H | single bond | Me | Me | C(=O)Me | Me | $CH_2OMe$ | O |
| D-17154 | Me | single bond | H | Me | C(=O)Me | Me | $CH_2OMe$ | O |
| D-17155 | Me(R) | single bond | H | Me | C(=O)Me | Me | $CH_2OMe$ | O |
| D-17156 | Me(S) | single bond | H | Me | C(=O)Me | Me | $CH_2OMe$ | O |
| D-17157 | H | single bond | Me | $CH_2CHF_2$ | C(=O)Me | Cl | $CH_2OMe$ | O |
| D-17158 | Me | single bond | H | $CH_2CHF_2$ | C(=O)Me | Cl | $CH_2OMe$ | O |
| D-17159 | Me(R) | single bond | H | $CH_2CHF_2$ | C(=O)Me | Cl | $CH_2OMe$ | O |
| D-17160 | Me(S) | single bond | H | $CH_2CHF_2$ | C(=O)Me | Cl | $CH_2OMe$ | O |
| D-17161 | H | single bond | Me | $CH_2CHF_2$ | C(=O)Me | Me | $CH_2OMe$ | O |
| D-17162 | Me | single bond | H | $CH_2CHF_2$ | C(=O)Me | Me | $CH_2OMe$ | O |
| D-17163 | Me(R) | single bond | H | $CH_2CHF_2$ | C(=O)Me | Me | $CH_2OMe$ | O |
| D-17164 | Me(S) | single bond | H | $CH_2CHF_2$ | C(=O)Me | Me | $CH_2OMe$ | O |
| D-17165 | H | single bond | Me | n -Pr | C(=O)Me | Cl | $CH_2OMe$ | O |
| D-17166 | Me | single bond | H | n-Pr | C(=O)Me | Cl | $CH_2OMe$ | O |
| D-17167 | Me(R) | single bond | H | n-Pr | C(=O)Me | Cl | $CH_2OMe$ | O |
| D-17168 | Me(S) | single bond | H | n-Pr | C(=O)Me | Cl | $CH_2OMe$ | O |
| D-17169 | H | single bond | Me | n-Pr | C(=O)Me | Me | $CH_2OMe$ | O |
| D-17170 | Me | single bond | H | n-Pr | C(=O)Me | Me | $CH_2OMe$ | O |
| D-17171 | Me(R) | single bond | H | n-Pr | C(=O)Me | Me | $CH_2OMe$ | O |
| D-17172 | Me(S) | single bond | H | n-Pr | C(=O)Me | Me | $CH_2OMe$ | O |
| D-17173 | H | single bond | Me | i-Pr | C(=O)Me | Cl | $CH_2OMe$ | O |
| D-17174 | Me | single bond | H | i-Pr | C(=O)Me | Cl | $CH_2OMe$ | O |
| D-17175 | Me(R) | single bond | H | i-Pr | C(=O)Me | Cl | $CH_2OMe$ | O |
| D-17176 | Me(S) | single bond | H | i-Pr | C(=O)Me | Cl | $CH_2OMe$ | O |
| D-17177 | H | single bond | Me | i-Pr | C(=O)Me | Me | $CH_2OMe$ | O |
| D-17178 | Me | single bond | H | i-Pr | C(=O)Me | Me | $CH_2OMe$ | O |

TABLE 1037

| Compound Number | Y | W | Z | $R^1$ | $R^2$ | $R^3$ | $R^{10}$ | A |
|---|---|---|---|---|---|---|---|---|
| D-17179 | Me(R) | single bond | H | i-Pr | C(=O)Me | Me | $CH_2OMe$ | O |
| D-17180 | Me(S) | single bond | H | i-Pr | C(=O)Me | Me | $CH_2OMe$ | O |
| D-17181 | H | single bond | Me | c-Pr(1-F) | C(=O)Me | Cl | $CH_2OMe$ | O |
| D-17182 | Me | single bond | H | c-Pr(1-F) | C(=O)Me | Cl | $CH_2OMe$ | O |
| D-17183 | Me(R) | single bond | H | c-Pr(1-F) | C(=O)Me | Cl | $CH_2OMe$ | O |
| D-17184 | Me(S) | single bond | H | c-Pr(1-F) | C(=O)Me | Cl | $CH_2OMe$ | O |
| D-17185 | H | single bond | Me | c-Pr(1-F) | C(=O)Me | Me | $CH_2OMe$ | O |
| D-17186 | Me | single bond | H | c-Pr(1-F) | C(=O)Me | Me | $CH_2OMe$ | O |
| D-17187 | Me(R) | single bond | H | c-Pr(1-F) | C(=O)Me | Me | $CH_2OMe$ | O |
| D-17188 | Me(S) | single bond | H | c-Pr(1-F) | C(=O)Me | Me | $CH_2OMe$ | O |
| D-17189 | H | single bond | Me | c-Pr(2,2-$F_2$) | C(=O)Me | Cl | $CH_2OMe$ | O |
| D-17190 | Me | single bond | H | c-Pr(2,2-$F_2$) | C(=O)Me | Cl | $CH_2OMe$ | O |
| D-17191 | Me(R) | single bond | H | c-Pr(2,2-$F_2$) | C(=O)Me | Cl | $CH_2OMe$ | O |
| D-17192 | Me(S) | single bond | H | c-Pr(2,2-$F_2$) | C(=O)Me | Cl | $CH_2OMe$ | O |
| D-17193 | H | single bond | Me | c-Pr(2,2-$F_2$) | C(=O)Me | Me | $CH_2OMe$ | O |
| D-17194 | Me | single bond | H | c-Pr(2,2-$F_2$) | C(=O)Me | Me | $CH_2OMe$ | O |
| D-17195 | Me(R) | single bond | H | c-Pr(2,2-$F_2$) | C(=O)Me | Me | $CH_2OMe$ | O |
| D-17196 | Me(S) | single bond | H | c-Pr(2,2-$F_2$) | C(=O)Me | Me | $CH_2OMe$ | O |
| D-17197 | H | single bond | Me | c-Pr(1-Cl) | C(=O)Me | Cl | $CH_2OMe$ | O |
| D-17198 | Me | single bond | H | c-Pr(1-Cl) | C(=O)Me | Cl | $CH_2OMe$ | O |
| D-17199 | Me(R) | single bond | H | c-Pr(1-Cl) | C(=O)Me | Cl | $CH_2OMe$ | O |
| D-17200 | Me(S) | single bond | H | c-Pr(1-Cl) | C(=O)Me | Cl | $CH_2OMe$ | O |
| D-17201 | H | single bond | Me | c-Pr(1-Cl) | C(=O)Me | Me | $CH_2OMe$ | O |
| D-17202 | Me | single bond | H | c-Pr(1-Cl) | C(=O)Me | Me | $CH_2OMe$ | O |
| D-17203 | Me(R) | single bond | H | c-Pr(1-Cl) | C(=O)Me | Me | $CH_2OMe$ | O |
| D-17204 | Me(S) | single bond | H | c-Pr(1-Cl) | C(=O)Me | Me | $CH_2OMe$ | O |

TABLE 1037-continued

| Compound Number | Y | W | Z | $R^1$ | $R^2$ | $R^3$ | $R^{10}$ | A |
|---|---|---|---|---|---|---|---|---|
| D-17205 | H | single bond | Me | c-Pr(1-Br) | C(=O)Me | Cl | $CH_2OMe$ | O |
| D-17206 | Me | single bond | H | c-Pr(1-Br) | C(=O)Me | Cl | $CH_2OMe$ | O |
| D-17207 | Me(R) | single bond | H | c-Pr(1-Br) | C(=O)Me | Cl | $CH_2OMe$ | O |
| D-17208 | Me(S) | single bond | H | c-Pr(1-Br) | C(=O)Me | Cl | $CH_2OMe$ | O |
| D-17209 | H | single bond | Me | c-Pr(1-Br) | C(=O)Me | Me | $CH_2OMe$ | O |
| D-17210 | Me | single bond | H | c-Pr(1-Br) | C(=O)Me | Me | $CH_2OMe$ | O |
| D-17211 | Me(R) | single bond | H | c-Pr(1-Br) | C(=O)Me | Me | $CH_2OMe$ | O |
| D-17212 | Me(S) | single bond | H | c-Pr(1-Br) | C(=O)Me | Me | $CH_2OMe$ | O |
| D-17213 | H | single bond | Me | c-Pr(1-Me) | C(=O)Me | Cl | $CH_2OMe$ | O |
| D-17214 | Me | single bond | H | c-Pr(1-Me) | C(=O)Me | Cl | $CH_2OMe$ | O |
| D-17215 | Me(R) | single bond | H | c-Pr(1-Me) | C(=O)Me | Cl | $CH_2OMe$ | O |
| D-17216 | Me(S) | single bond | H | c-Pr(1-Me) | C(=O)Me | Cl | $CH_2OMe$ | O |
| D-17217 | H | single bond | Me | c-Pr(1-Me) | C(=O)Me | Me | $CH_2OMe$ | O |
| D-17218 | Me | single bond | H | c-Pr(1-Me) | C(=O)Me | Me | $CH_2OMe$ | O |
| D-17219 | Me(R) | single bond | H | c-Pr(1-Me) | C(=O)Me | Me | $CH_2OMe$ | O |
| D-17220 | Me(S) | single bond | H | c-Pr(1-Me) | C(=O)Me | Me | $CH_2OMe$ | O |
| D-17221 | H | single bond | Me | c-Pr(1-$CH_2OH$) | C(=O)Me | Cl | $CH_2OMe$ | O |
| D-17222 | Me | single bond | H | c-Pr(1-$CH_2OH$) | C(=O)Me | Cl | $CH_2OMe$ | O |

TABLE 1038

| Compound Number | Y | W | Z | $R^1$ | $R^2$ | $R^3$ | $R^{10}$ | A |
|---|---|---|---|---|---|---|---|---|
| D-17223 | Me(R) | single bond | H | c-Pr(1-$CH_2OH$) | C(=O)Me | Cl | $CH_2OMe$ | O |
| D-17224 | Me(S) | single bond | H | c-Pr(1-$CH_2OH$) | C(=O)Me | Cl | $CH_2OMe$ | O |
| D-17225 | H | single bond | Me | c-Pr(1-$CH_2OH$) | C(=O)Me | Me | $CH_2OMe$ | O |
| D-17226 | Me | single bond | H | c-Pr(1-$CH_2OH$) | C(=O)Me | Me | $CH_2OMe$ | O |
| D-17227 | Me(R) | single bond | H | c-Pr(1-$CH_2OH$) | C(=O)Me | Me | $CH_2OMe$ | O |
| D-17228 | Me(S) | single bond | H | c-Pr(1-$CH_2OH$) | C(=O)Me | Me | $CH_2OMe$ | O |
| D-17229 | H | single bond | Me | c-Pr[1-$CH_2OS(=O)_2Me$] | C(=O)Me | Cl | $CH_2OMe$ | O |
| D-17230 | Me | single bond | H | c-Pr[1-$CH_2OS(=O)_2Me$] | C(=O)Me | Cl | $CH_2OMe$ | O |
| D-17231 | Me(R) | single bond | H | c-Pr[1-$CH_2OS(=O)_2Me$] | C(=O)Me | Cl | $CH_2OMe$ | O |
| D-17232 | Me(S) | single bond | H | c-Pr[1-$CH_2OS(=O)_2Me$] | C(=O)Me | Cl | $CH_2OMe$ | O |
| D-17233 | H | single bond | Me | c-Pr[1-$CH_2OS(=O)_2Me$] | C(=O)Me | Me | $CH_2OMe$ | O |
| D-17234 | Me | single bond | H | c-Pr[1-$CH_2OS(=O)_2Me$] | C(=O)Me | Me | $CH_2OMe$ | O |
| D-17235 | Me(R) | single bond | H | c-Pr[1-$CH_2OS(=O)_2Me$] | C(=O)Me | Me | $CH_2OMe$ | O |
| D-17236 | Me(S) | single bond | H | c-Pr[1-$CH_2OS(=O)_2Me$] | C(=O)Me | Me | $CH_2OMe$ | O |
| D-17237 | H | single bond | Me | c-Pr(1-$CH_2OMe$) | C(=O)Me | Cl | $CH_2OMe$ | O |
| D-17238 | Me | single bond | H | c-Pr(1-$CH_2OMe$) | C(=O)Me | Cl | $CH_2OMe$ | O |
| D-17239 | Me(R) | single bond | H | c-Pr(1-$CH_2OMe$) | C(=O)Me | Cl | $CH_2OMe$ | O |
| D-17240 | Me(S) | single bond | H | c-Pr(1-$CH_2OMe$) | C(=O)Me | Cl | $CH_2OMe$ | O |
| D-17241 | H | single bond | Me | c-Pr(1-$CH_2OMe$) | C(=O)Me | Me | $CH_2OMe$ | O |
| D-17242 | Me | single bond | H | c-Pr(1-$CH_2OMe$) | C(=O)Me | Me | $CH_2OMe$ | O |
| D-17243 | Me(R) | single bond | H | c-Pr(1-$CH_2OMe$) | C(=O)Me | Me | $CH_2OMe$ | O |
| D-17244 | Me(S) | single bond | H | c-Pr(1-$CH_2OMe$) | C(=O)Me | Me | $CH_2OMe$ | O |
| D-17245 | H | single bond | Me | c-Pr(1-$CH_2OCN$) | C(=O)Me | Cl | $CH_2OMe$ | O |
| D-17246 | Me | single bond | H | c-Pr(1-$CH_2OCN$) | C(=O)Me | Cl | $CH_2OMe$ | O |
| D-17247 | Me(R) | single bond | H | c-Pr(1-$CH_2OCN$) | C(=O)Me | Cl | $CH_2OMe$ | O |
| D-17248 | Me(S) | single bond | H | c-Pr(1-$CH_2OCN$) | C(=O)Me | Cl | $CH_2OMe$ | O |
| D-17249 | H | single bond | Me | c-Pr(1-$CH_2OCN$) | C(=O)Me | Me | $CH_2OMe$ | O |
| D-17250 | Me | single bond | H | c-Pr(1-$CH_2OCN$) | C(=O)Me | Me | $CH_2OMe$ | O |
| D-17251 | Me(R) | single bond | H | c-Pr(1-$CH_2OCN$) | C(=O)Me | Me | $CH_2OMe$ | O |
| D-17252 | Me(S) | single bond | H | c-Pr(1-$CH_2OCN$) | C(=O)Me | Me | $CH_2OMe$ | O |
| D-17253 | H | single bond | Me | c-Pr(1-$CH_2SMe$) | C(=O)Me | Cl | $CH_2OMe$ | O |
| D-17254 | Me | single bond | H | c-Pr(1-$CH_2SMe$) | C(=O)Me | Cl | $CH_2OMe$ | O |
| D-17255 | Me(R) | single bond | H | c-Pr(1-$CH_2SMe$) | C(=O)Me | Cl | $CH_2OMe$ | O |
| D-17256 | Me(S) | single bond | H | c-Pr(1-$CH_2SMe$) | C(=O)Me | Cl | $CH_2OMe$ | O |
| D-17257 | H | single bond | Me | c-Pr(1-$CH_2SMe$) | C(=O)Me | Me | $CH_2OMe$ | O |
| D-17258 | Me | single bond | H | c-Pr(1-$CH_2SMe$) | C(=O)Me | Me | $CH_2OMe$ | O |
| D-17259 | Me(R) | single bond | H | c-Pr(1-$CH_2SMe$) | C(=O)Me | Me | $CH_2OMe$ | O |
| D-17260 | Me(S) | single bond | H | c-Pr(1-$CH_2SMe$) | C(=O)Me | Me | $CH_2OMe$ | O |
| D-17261 | H | single bond | Me | c-Pr[1-$CH_2S(=O)Me$] | C(=O)Me | Cl | $CH_2OMe$ | O |
| D-17262 | Me | single bond | H | c-Pr[1-$CH_2S(=O)Me$] | C(=O)Me | Cl | $CH_2OMe$ | O |
| D-17263 | Me(R) | single bond | H | c-Pr[1-$CH_2S(=O)Me$] | C(=O)Me | Cl | $CH_2OMe$ | O |
| D-17264 | Me(S) | single bond | H | c-Pr[1-$CH_2S(=O)Me$] | C(=O)Me | Cl | $CH_2OMe$ | O |
| D-17265 | H | single bond | Me | c-Pr[1-$CH_2S(=O)Me$] | C(=O)Me | Me | $CH_2OMe$ | O |
| D-17266 | Me | single bond | H | c-Pr[1-$CH_2S(=O)Me$] | C(=O)Me | Me | $CH_2OMe$ | O |

TABLE 1039

| Compound Number | Y | W | Z | $R^1$ | $R^2$ | $R^3$ | $R^{10}$ | A |
|---|---|---|---|---|---|---|---|---|
| D-17267 | Me(R) | single bond | H | c-Pr[1-$CH_2S$(=O)Me] | C(=O)Me | Me | $CH_2OMe$ | O |
| D-17268 | Me(S) | single bond | H | c-Pr[1-$CH_2S$(=O)Me] | C(=O)Me | Me | $CH_2OMe$ | O |
| D-17269 | H | single bond | Me | c-Pr[1-$CH_2S(=O)_2$Me] | C(=O)Me | Cl | $CH_2OMe$ | O |
| D-17270 | Me | single bond | H | c-Pr[1-$CH_2S(=O)_2$Me] | C(=O)Me | Cl | $CH_2OMe$ | O |
| D-17271 | Me(R) | single bond | H | c-Pr[1-$CH_2S(=O)_2$Me] | C(=O)Me | Cl | $CH_2OMe$ | O |
| D-17272 | Me(S) | single bond | H | c-Pr[1-$CH_2S(=O)_2$Me] | C(=O)Me | Cl | $CH_2OMe$ | O |
| D-17273 | H | single bond | Me | c-Pr[1-$CH_2S(=O)_2$Me] | C(=O)Me | Me | $CH_2OMe$ | O |
| D-17274 | Me | single bond | H | c-Pr[1-$CH_2S(=O)_2$Me] | C(=O)Me | Me | $CH_2OMe$ | O |
| D-17275 | Me(R) | single bond | H | c-Pr[1-$CH_2S(=O)_2$Me] | C(=O)Me | Me | $CH_2OMe$ | O |
| D-17276 | Me(S) | single bond | H | c-Pr[1-$CH_2S(=O)_2$Me] | C(=O)Me | Me | $CH_2OMe$ | O |
| D-17277 | H | single bond | Me | c-Pr(1-$CH_2F$) | C(=O)Me | Cl | $CH_2OMe$ | O |
| D-17278 | Me | single bond | H | c-Pr(1-$CH_2F$) | C(=O)Me | Cl | $CH_2OMe$ | O |
| D-17279 | Me(R) | single bond | H | c-Pr(1-$CH_2F$) | C(=O)Me | Cl | $CH_2OMe$ | O |
| D-17280 | Me(S) | single bond | H | c-Pr(1-$CH_2F$) | C(=O)Me | Cl | $CH_2OMe$ | O |
| D-17281 | H | single bond | Me | c-Pr(1-$CH_2F$) | C(=O)Me | Me | $CH_2OMe$ | O |
| D-17282 | Me | single bond | H | c-Pr(1-$CH_2F$) | C(=O)Me | Me | $CH_2OMe$ | O |
| D-17283 | Me(R) | single bond | H | c-Pr(1-$CH_2F$) | C(=O)Me | Me | $CH_2OMe$ | O |
| D-17284 | Me(S) | single bond | H | c-Pr(1-$CH_2F$) | C(=O)Me | Me | $CH_2OMe$ | O |
| D-17285 | H | single bond | Me | c-Pr(1-$CHF_2$) | C(=O)Me | Cl | $CH_2OMe$ | O |
| D-17286 | Me | single bond | H | c-Pr(1-$CHF_2$) | C(=O)Me | Cl | $CH_2OMe$ | O |
| D-17287 | Me(R) | single bond | H | c-Pr(1-$CHF_2$) | C(=O)Me | Cl | $CH_2OMe$ | O |
| D-17288 | Me(S) | single bond | H | c-Pr(1-$CHF_2$) | C(=O)Me | Cl | $CH_2OMe$ | O |
| D-17289 | H | single bond | Me | c-Pr(1-$CHF_2$) | C(=O)Me | Me | $CH_2OMe$ | O |
| D-17290 | Me | single bond | H | c-Pr(1-$CHF_2$) | C(=O)Me | Me | $CH_2OMe$ | O |
| D-17291 | Me(R) | single bond | H | c-Pr(1-$CHF_2$) | C(=O)Me | Me | $CH_2OMe$ | O |
| D-17292 | Me(S) | single bond | H | c-Pr(1-$CHF_2$) | C(=O)Me | Me | $CH_2OMe$ | O |
| D-17293 | H | single bond | Me | c-Pr(1-$CF_3$) | C(=O)Me | Cl | $CH_2OMe$ | O |
| D-17294 | Me | single bond | H | c-Pr(1-$CF_3$) | C(=O)Me | Cl | $CH_2OMe$ | O |
| D-17295 | Me(R) | single bond | H | c-Pr(1-$CF_3$) | C(=O)Me | Cl | $CH_2OMe$ | O |
| D-17296 | Me(S) | single bond | H | c-Pr(1-$CF_3$) | C(=O)Me | Cl | $CH_2OMe$ | O |
| D-17297 | H | single bond | Me | c-Pr(1-$CF_3$) | C(=O)Me | Me | $CH_2OMe$ | O |
| D-17298 | Me | single bond | H | c-Pr(1-$CF_3$) | C(=O)Me | Me | $CH_2OMe$ | O |
| D-17299 | Me(R) | single bond | H | c-Pr(1-$CF_3$) | C(=O)Me | Me | $CH_2OMe$ | O |
| D-17300 | Me(S) | single bond | H | c-Pr(1-$CF_3$) | C(=O)Me | Me | $CH_2OMe$ | O |
| D-17301 | H | single bond | Me | c-Pr(1-C≡CH) | C(=O)Me | Cl | $CH_2OMe$ | O |
| D-17302 | Me | single bond | H | c-Pr(1-C≡CH) | C(=O)Me | Cl | $CH_2OMe$ | O |
| D-17303 | Me(R) | single bond | H | c-Pr(1-C≡CH) | C(=O)Me | Cl | $CH_2OMe$ | O |
| D-17304 | Me(S) | single bond | H | c-Pr(1-C≡CH) | C(=O)Me | Cl | $CH_2OMe$ | O |
| D-17305 | H | single bond | Me | c-Pr(1-C≡CH) | C(=O)Me | Me | $CH_2OMe$ | O |
| D-17306 | Me | single bond | H | c-Pr(1-C≡CH) | C(=O)Me | Me | $CH_2OMe$ | O |
| D-17307 | Me(R) | single bond | H | c-Pr(1-C≡CH) | C(=O)Me | Me | $CH_2OMe$ | O |
| D-17308 | Me(S) | single bond | H | c-Pr(1-C≡CH) | C(=O)Me | Me | $CH_2OMe$ | O |
| D-17309 | H | single bond | Me | c-Pr[1-C(=O)OEt] | C(=O)Me | Cl | $CH_2OMe$ | O |
| D-17310 | Me | single bond | H | c-Pr[1-C(=O)OEt] | C(=O)Me | Cl | $CH_2OMe$ | O |

TABLE 1040

| Compound Number | Y | W | Z | $R^1$ | $R^2$ | $R^3$ | $R^{10}$ | A |
|---|---|---|---|---|---|---|---|---|
| D-17311 | Me(R) | single bond | H | c-Pr[1-C(=O)OEt] | C(=O)Me | Cl | $CH_2OMe$ | O |
| D-17312 | Me(S) | single bond | H | c-Pr[1-C(=O)OEt] | C(=O)Me | Cl | $CH_2OMe$ | O |
| D-17313 | H | single bond | Me | c-Pr[1-C(=O)OEt] | C(=O)Me | Me | $CH_2OMe$ | O |
| D-17314 | Me | single bond | H | c-Pr[1-C(=O)OEt] | C(=O)Me | Me | $CH_2OMe$ | O |
| D-17315 | Me(R) | single bond | H | c-Pr[1-C(=O)OEt] | C(=O)Me | Me | $CH_2OMe$ | O |
| D-17316 | Me(S) | single bond | H | c-Pr[1-C(=O)OEt] | C(=O)Me | Me | $CH_2OMe$ | O |
| D-17317 | H | single bond | Me | c-Pr[1-C(=O)OH] | C(=O)Me | Cl | $CH_2OMe$ | O |
| D-17318 | Me | single bond | H | c-Pr[1-C(=O)OH] | C(=O)Me | Cl | $CH_2OMe$ | O |
| D-17319 | Me(R) | single bond | H | c-Pr[1-C(=O)OH] | C(=O)Me | Cl | $CH_2OMe$ | O |
| D-17320 | Me(S) | single bond | H | c-Pr[1-C(=O)OH] | C(=O)Me | Cl | $CH_2OMe$ | O |
| D-17321 | H | single bond | Me | c-Pr[1-C(=O)OH] | C(=O)Me | Me | $CH_2OMe$ | O |
| D-17322 | Me | single bond | H | c-Pr[1-C(=O)OH] | C(=O)Me | Me | $CH_2OMe$ | O |
| D-17323 | Me(R) | single bond | H | c-Pr[1-C(=O)OH] | C(=O)Me | Me | $CH_2OMe$ | O |
| D-17324 | Me(S) | single bond | H | c-Pr[1-C(=O)OH] | C(=O)Me | Me | $CH_2OMe$ | O |
| D-17325 | H | single bond | Me | c-Pr[1-C(=O)$NH_2$] | C(=O)Me | Cl | $CH_2OMe$ | O |
| D-17326 | Me | single bond | H | c-Pr[1-C(=O)$NH_2$] | C(=O)Me | Cl | $CH_2OMe$ | O |
| D-17327 | Me(R) | single bond | H | c-Pr[1-C(=O)$NH_2$] | C(=O)Me | Cl | $CH_2OMe$ | O |
| D-17328 | Me(S) | single bond | H | c-Pr[1-C(=O)$NH_2$] | C(=O)Me | Cl | $CH_2OMe$ | O |
| D-17329 | H | single bond | Me | c-Pr[1-C(=O)$NH_2$] | C(=O)Me | Me | $CH_2OMe$ | O |
| D-17330 | Me | single bond | H | c-Pr[1-C(=O)$NH_2$] | C(=O)Me | Me | $CH_2OMe$ | O |
| D-17331 | Me(R) | single bond | H | c-Pr[1-C(=O)$NH_2$] | C(=O)Me | Me | $CH_2OMe$ | O |
| D-17332 | Me(S) | single bond | H | c-Pr[1-C(=O)$NH_2$] | C(=O)Me | Me | $CH_2OMe$ | O |
| D-17333 | H | single bond | Me | c-Pr(1-OMe) | C(=O)Me | Cl | $CH_2OMe$ | O |

TABLE 1040-continued

| Compound Number | Y | W | Z | $R^1$ | $R^2$ | $R^3$ | $R^{10}$ | A |
|---|---|---|---|---|---|---|---|---|
| D-17334 | Me | single bond | H | c-Pr(1-OMe) | C(═O)Me | Cl | $CH_2OMe$ | O |
| D-17335 | Me(R) | single bond | H | c-Pr(1-OMe) | C(═O)Me | Cl | $CH_2OMe$ | O |
| D-17336 | Me(S) | single bond | H | c-Pr(1-OMe) | C(═O)Me | Cl | $CH_2OMe$ | O |
| D-17337 | H | single bond | Me | c-Pr(1-OMe) | C(═O)Me | Me | $CH_2OMe$ | O |
| D-17338 | Me | single bond | H | c-Pr(1-OMe) | C(═O)Me | Me | $CH_2OMe$ | O |
| D-17339 | Me(R) | single bond | H | c-Pr(1-OMe) | C(═O)Me | Me | $CH_2OMe$ | O |
| D-17340 | Me(S) | single bond | H | c-Pr(1-OMe) | C(═O)Me | Me | $CH_2OMe$ | O |
| D-17341 | H | single bond | Me | c-Pr(1-SMe) | C(═O)Me | Cl | $CH_2OMe$ | O |
| D-17342 | Me | single bond | H | c-Pr(1-SMe) | C(═O)Me | Cl | $CH_2OMe$ | O |
| D-17343 | Me(R) | single bond | H | c-Pr(1-SMe) | C(═O)Me | Cl | $CH_2OMe$ | O |
| D-17344 | Me(S) | single bond | H | c-Pr(1-SMe) | C(═O)Me | Cl | $CH_2OMe$ | O |
| D-17345 | H | single bond | Me | c-Pr(1-SMe) | C(═O)Me | Me | $CH_2OMe$ | O |
| D-17346 | Me | single bond | H | c-Pr(1-SMe) | C(═O)Me | Me | $CH_2OMe$ | O |
| D-17347 | Me(R) | single bond | H | c-Pr(1-SMe) | C(═O)Me | Me | $CH_2OMe$ | O |
| D-17348 | Me(S) | single bond | H | c-Pr(1-SMe) | C(═O)Me | Me | $CH_2OMe$ | O |
| D-17349 | H | single bond | Me | c-Pr[1-S(═O)Me] | C(═O)Me | Cl | $CH_2OMe$ | O |
| D-17350 | Me | single bond | H | c-Pr[1-S(═O)Me] | C(═O)Me | Cl | $CH_2OMe$ | O |
| D-17351 | Me(R) | single bond | H | c-Pr[1-S(═O)Me] | C(═O)Me | Cl | $CH_2OMe$ | O |
| D-17352 | Me(S) | single bond | H | c-Pr[1-S(═O)Me] | C(═O)Me | Cl | $CH_2OMe$ | O |
| D-17353 | H | single bond | Me | c-Pr[1-S(═O)Me] | C(═O)Me | Me | $CH_2OMe$ | O |
| D-17354 | Me | single bond | H | c-Pr[1-S(═O)Me] | C(═O)Me | Me | $CH_2OMe$ | O |

TABLE 1041

| Compound Number | Y | W | Z | $R^1$ | $R^2$ | $R^3$ | $R^{10}$ | A |
|---|---|---|---|---|---|---|---|---|
| D-17355 | Me(R) | single bond | H | c-Pr[1-S(═O)Me] | C(═O)Me | Me | $CH_2OMe$ | O |
| D-17356 | Me(S) | single bond | H | c-Pr[1-S(═O)Me] | C(═O)Me | Me | $CH_2OMe$ | O |
| D-17357 | H | single bond | Me | c-Pr[1-S(═O)$_2$Me] | C(═O)Me | Cl | $CH_2OMe$ | O |
| D-17358 | Me | single bond | H | c-Pr[1-S(═O)$_2$Me] | C(═O)Me | Cl | $CH_2OMe$ | O |
| D-17359 | Me(R) | single bond | H | c-Pr[1-S(═O)$_2$Me] | C(═O)Me | Cl | $CH_2OMe$ | O |
| D-17360 | Me(S) | single bond | H | c-Pr[1-S(═O)$_2$Me] | C(═O)Me | Cl | $CH_2OMe$ | O |
| D-17361 | H | single bond | Me | c-Pr[1-S(═O)$_2$Me] | C(═O)Me | Me | $CH_2OMe$ | O |
| D-17362 | Me | single bond | H | c-Pr[1-S(═O)$_2$Me] | C(═O)Me | Me | $CH_2OMe$ | O |
| D-17363 | Me(R) | single bond | H | c-Pr[1-S(═O)$_2$Me] | C(═O)Me | Me | $CH_2OMe$ | O |
| D-17364 | Me(S) | single bond | H | c-Pr[1-S(═O)$_2$Me] | C(═O)Me | Me | $CH_2OMe$ | O |
| D-17365 | H | single bond | Me | c-Pr[1-S(═O)$_2$CHF$_2$] | C(═O)Me | Cl | $CH_2OMe$ | O |
| D-17366 | Me | single bond | H | c-Pr[1-S(═O)$_2$CHF$_2$] | C(═O)Me | Cl | $CH_2OMe$ | O |
| D-17367 | Me(R) | single bond | H | c-Pr[1-S(═O)$_2$CHF$_2$] | C(═O)Me | Cl | $CH_2OMe$ | O |
| D-17368 | Me(S) | single bond | H | c-Pr[1-S(═O)$_2$CHF$_2$] | C(═O)Me | Cl | $CH_2OMe$ | O |
| D-17369 | H | single bond | Me | c-Pr[1-S(═O)$_2$CHF$_2$] | C(═O)Me | Me | $CH_2OMe$ | O |
| D-17370 | Me | single bond | H | c-Pr[1-S(═O)$_2$CHF$_2$] | C(═O)Me | Me | $CH_2OMe$ | O |
| D-17371 | Me(R) | single bond | H | c-Pr[1-S(═O)$_2$CHF$_2$] | C(═O)Me | Me | $CH_2OMe$ | O |
| D-17372 | Me(S) | single bond | H | c-Pr[1-S(═O)$_2$CHF$_2$] | C(═O)Me | Me | $CH_2OMe$ | O |
| D-17373 | H | single bond | Me | c-Pr[1-S(═O)$_2$CF$_3$] | C(═O)Me | Cl | $CH_2OMe$ | O |
| D-17374 | Me | single bond | H | c-Pr[1-S(═O)$_2$CF$_3$] | C(═O)Me | Cl | $CH_2OMe$ | O |
| D-17375 | Me(R) | single bond | H | c-Pr[1-S(═O)$_2$CF$_3$] | C(═O)Me | Cl | $CH_2OMe$ | O |
| D-17376 | Me(S) | single bond | H | c-Pr[1-S(═O)$_2$CF$_3$] | C(═O)Me | Cl | $CH_2OMe$ | O |
| D-17377 | H | single bond | Me | c-Pr[1-S(═O)$_2$CF$_3$] | C(═O)Me | Me | $CH_2OMe$ | O |
| D-17378 | Me | single bond | H | c-Pr[1-S(═O)$_2$CF$_3$] | C(═O)Me | Me | $CH_2OMe$ | O |
| D-17379 | Me(R) | single bond | H | c-Pr[1-S(═O)$_2$CF$_3$] | C(═O)Me | Me | $CH_2OMe$ | O |
| D-17380 | Me(S) | single bond | H | c-Pr[1-S(═O)$_2$CF$_3$] | C(═O)Me | Me | $CH_2OMe$ | O |
| D-17381 | H | single bond | Me | c-Pr[1-(5,6-dihydro-1,4,2-dioxazin-3-yl)] | C(═O)Me | Cl | $CH_2OMe$ | O |
| D-17382 | Me | single bond | H | c-Pr[1-(5,6-dihydro-1,4,2-dioxazin-3-yl)] | C(═O)Me | Cl | $CH_2OMe$ | O |
| D-17383 | Me(R) | single bond | H | c-Pr[1-(5,6-dihydro-1,4,2-dioxazin-3-yl)] | C(═O)Me | Cl | $CH_2OMe$ | O |
| D-17384 | Me(S) | single bond | H | c-Pr[1-(5,6-dihydro-1,4,2-dioxazin-3-yl)] | C(═O)Me | Cl | $CH_2OMe$ | O |
| D-17385 | H | single bond | Me | c-Pr[1-(5,6-dihydro-1,4,2-dioxazin-3-yl)] | C(═O)Me | Me | $CH_2OMe$ | O |
| D-17386 | Me | single bond | H | c-Pr[1-(5,6-dihydro-1,4,2-dioxazin-3-yl)] | C(═O)Me | Me | $CH_2OMe$ | O |
| D-17387 | Me(R) | single bond | H | c-Pr[1-(5,6-dihydro-1,4,2-dioxazin-3-yl)] | C(═O)Me | Me | $CH_2OMe$ | O |
| D-17388 | Me(S) | single bond | H | c-Pr[1-(5,6-dihydro-1,4,2-dioxazin-3-yl)] | C(═O)Me | Me | $CH_2OMe$ | O |
| D-17389 | H | single bond | Me | c-Pr[1-(5-hydroxy-1,3,4-oxadiazol-2-yl)] | C(═O)Me | Cl | $CH_2OMe$ | O |
| D-17390 | Me | single bond | H | c-Pr[1-(5-hydroxy-1,3,4-oxadiazol-2-yl)] | C(═O)Me | Cl | $CH_2OMe$ | O |
| D-17391 | Me(R) | single bond | H | c-Pr[1-(5-hydroxy-1,3,4-oxadiazol-2-yl)] | C(═O)Me | Cl | $CH_2OMe$ | O |
| D-17392 | Me(S) | single bond | H | c-Pr[1-(5-hydroxy-1,3,4-oxadiazol-2-yl)] | C(═O)Me | Cl | $CH_2OMe$ | O |
| D-17393 | H | single bond | Me | c-Pr[1-(5-hydroxy-1,3,4-oxadiazol-2-yl)] | C(═O)Me | Me | $CH_2OMe$ | O |
| D-17394 | Me | single bond | H | c-Pr[1-(5-hydroxy-1,3,4-oxadiazol-2-yl)] | C(═O)Me | Me | $CH_2OMe$ | O |
| D-17395 | Me(R) | single bond | H | c-Pr[1-(5-hydroxy-1,3,4-oxadiazol-2-yl)] | C(═O)Me | Me | $CH_2OMe$ | O |
| D-17396 | Me(S) | single bond | H | c-Pr[1-(5-hydroxy-1,3,4-oxadiazol-2-yl)] | C(═O)Me | Me | $CH_2OMe$ | O |
| D-17397 | H | single bond | Me | c-Pr[1-(pyrimidin-2-yl)] | C(═O)Me | Cl | $CH_2OMe$ | O |
| D-17398 | Me | single bond | H | c-Pr[1-(pyrimidin-2-yl)] | C(═O)Me | Cl | $CH_2OMe$ | O |

TABLE 1042

| Compound Number | Y | W | Z | $R^1$ | $R^2$ | $R^3$ | $R^{10}$ | A |
|---|---|---|---|---|---|---|---|---|
| D-17399 | Me(R) | single bond | H | c-Pr[1-(pyrimidin-2-yl)] | C(═O)Me | Cl | $CH_2OMe$ | O |
| D-17400 | Me(S) | single bond | H | c-Pr[1-(pyrimidin-2-yl)] | C(═O)Me | Cl | $CH_2OMe$ | O |
| D-17401 | H | single bond | Me | c-Pr[1-(pyrimidin-2-yl)] | C(═O)Me | Me | $CH_2OMe$ | O |
| D-17402 | Me | single bond | H | c-Pr[1-(pyrimidin-2-yl)] | C(═O)Me | Me | $CH_2OMe$ | O |
| D-17403 | Me(R) | single bond | H | c-Pr[1-(pyrimidin-2-yl)] | C(═O)Me | Me | $CH_2OMe$ | O |
| D-17404 | Me(S) | single bond | H | c-Pr[1-(pyrimidin-2-yl)] | C(═O)Me | Me | $CH_2OMe$ | O |
| D-17405 | H | single bond | Me | t-Bu | C(═O)Me | Cl | $CH_2OMe$ | O |
| D-17406 | Me | single bond | H | t-Bu | C(═O)Me | Cl | $CH_2OMe$ | O |
| D-17407 | Me(R) | single bond | H | t-Bu | C(═O)Me | Cl | $CH_2OMe$ | O |
| D-17408 | Me(S) | single bond | H | t-Bu | C(═O)Me | Cl | $CH_2OMe$ | O |
| D-17409 | H | single bond | Me | t-Bu | C(═O)Me | Me | $CH_2OMe$ | O |
| D-17410 | Me | single bond | H | t-Bu | C(═O)Me | Me | $CH_2OMe$ | O |
| D-17411 | Me(R) | single bond | H | t-Bu | C(═O)Me | Me | $CH_2OMe$ | O |
| D-17412 | Me(S) | single bond | H | t-Bu | C(═O)Me | Me | $CH_2OMe$ | O |
| D-17413 | H | single bond | Me | c-Bu | C(═O)Me | Cl | $CH_2OMe$ | O |
| D-17414 | Me | single bond | H | c-Bu | C(═O)Me | Cl | $CH_2OMe$ | O |
| D-17415 | Me(R) | single bond | H | c-Bu | C(═O)Me | Cl | $CH_2OMe$ | O |
| D-17416 | Me(S) | single bond | H | c-Bu | C(═O)Me | Cl | $CH_2OMe$ | O |
| D-17417 | H | single bond | Me | c-Bu | C(═O)Me | Me | $CH_2OMe$ | O |
| D-17418 | Me | single bond | H | c-Bu | C(═O)Me | Me | $CH_2OMe$ | O |
| D-17419 | Me(R) | single bond | H | c-Bu | C(═O)Me | Me | $CH_2OMe$ | O |
| D-17420 | Me(S) | single bond | H | c-Bu | C(═O)Me | Me | $CH_2OMe$ | O |
| D-17421 | H | single bond | Me | c-Bu(1-CN) | C(═O)Me | Cl | $CH_2OMe$ | O |
| D-17422 | Me | single bond | H | c-Bu(1-CN) | C(═O)Me | Cl | $CH_2OMe$ | O |
| D-17423 | Me(R) | single bond | H | c-Bu(1-CN) | C(═O)Me | Cl | $CH_2OMe$ | O |
| D-17424 | Me(S) | single bond | H | c-Bu(1-CN) | C(═O)Me | Cl | $CH_2OMe$ | O |
| D-17425 | H | single bond | Me | c-Bu(1-CN) | C(═O)Me | Me | $CH_2OMe$ | O |
| D-17426 | Me | single bond | H | c-Bu(1-CN) | C(═O)Me | Me | $CH_2OMe$ | O |
| D-17427 | Me(R) | single bond | H | c-Bu(1-CN) | C(═O)Me | Me | $CH_2OMe$ | O |
| D-17428 | Me(S) | single bond | H | c-Bu(1-CN) | C(═O)Me | Me | $CH_2OMe$ | O |
| D-17429 | H | single bond | Me | c-Bu(3,3-$F_2$) | C(═O)Me | Cl | $CH_2OMe$ | O |
| D-17430 | Me | single bond | H | c-Bu(3,3-$F_2$) | C(═O)Me | Cl | $CH_2OMe$ | O |
| D-17431 | Me(R) | single bond | H | c-Bu(3,3-$F_2$) | C(═O)Me | Cl | $CH_2OMe$ | O |
| D-17432 | Me(S) | single bond | H | c-Bu(3,3-$F_2$) | C(═O)Me | Cl | $CH_2OMe$ | O |
| D-17433 | H | single bond | Me | c-Bu(3,3-$F_2$) | C(═O)Me | Me | $CH_2OMe$ | O |
| D-17434 | Me | single bond | H | c-Bu(3,3-$F_2$) | C(═O)Me | Me | $CH_2OMe$ | O |
| D-17435 | Me(R) | single bond | H | c-Bu(3,3-$F_2$) | C(═O)Me | Me | $CH_2OMe$ | O |
| D-17436 | Me(S) | single bond | H | c-Bu(3,3-$F_2$) | C(═O)Me | Me | $CH_2OMe$ | O |
| D-17437 | H | single bond | Me | oxetan-3-yl | C(═O)Me | Cl | $CH_2OMe$ | O |
| D-17438 | Me | single bond | H | oxetan-3-yl | C(═O)Me | Cl | $CH_2OMe$ | O |
| D-17439 | Me(R) | single bond | H | oxetan-3-yl | C(═O)Me | Cl | $CH_2OMe$ | O |
| D-17440 | Me(S) | single bond | H | oxetan-3-yl | C(═O)Me | Cl | $CH_2OMe$ | O |
| D-17441 | H | single bond | Me | oxetan-3-yl | C(═O)Me | Me | $CH_2OMe$ | O |
| D-17442 | Me | single bond | H | oxetan-3-yl | C(═O)Me | Me | $CH_2OMe$ | O |

TABLE 1043

| Compound Number | Y | W | Z | $R^1$ | $R^2$ | $R^3$ | $R^{10}$ | A |
|---|---|---|---|---|---|---|---|---|
| D-17443 | Me(R) | single bond | H | oxetan-3-yl | C(═O)Me | Me | $CH_2OMe$ | O |
| D-17444 | Me(S) | single bond | H | oxetan-3-yl | C(═O)Me | Me | $CH_2OMe$ | O |
| D-17445 | H | single bond | Me | oxetan(3-CN)-3-yl | C(═O)Me | Cl | $CH_2OMe$ | O |
| D-17446 | Me | single bond | H | oxetan(3-CN)-3-yl | C(═O)Me | Cl | $CH_2OMe$ | O |
| D-17447 | Me(R) | single bond | H | oxetan(3-CN)-3-yl | C(═O)Me | Cl | $CH_2OMe$ | O |
| D-17448 | Me(S) | single bond | H | oxetan(3-CN)-3-yl | C(═O)Me | Cl | $CH_2OMe$ | O |
| D-17449 | H | single bond | Me | oxetan(3-CN)-3-yl | C(═O)Me | Me | $CH_2OMe$ | O |
| D-17450 | Me | single bond | H | oxetan(3-CN)-3-yl | C(═O)Me | Me | $CH_2OMe$ | O |
| D-17451 | Me(R) | single bond | H | oxetan(3-CN)-3-yl | C(═O)Me | Me | $CH_2OMe$ | O |
| D-17452 | Me(S) | single bond | H | oxetan(3-CN)-3-yl | C(═O)Me | Me | $CH_2OMe$ | O |
| D-17453 | H | single bond | Me | azetidin[1-C(═O)Me]-3-yl | C(═O)Me | Cl | $CH_2OMe$ | O |
| D-17454 | Me | single bond | H | azetidin[1-C(═O)Me]-3-yl | C(═O)Me | Cl | $CH_2OMe$ | O |
| D-17455 | Me(R) | single bond | H | azetidin[1-C(═O)Me]-3-yl | C(═O)Me | Cl | $CH_2OMe$ | O |
| D-17456 | Me(S) | single bond | H | azetidin[1-C(═O)Me]-3-yl | C(═O)Me | Cl | $CH_2OMe$ | O |
| D-17457 | H | single bond | Me | azetidin[1-C(═O)Me]-3-yl | C(═O)Me | Me | $CH_2OMe$ | O |
| D-17458 | Me | single bond | H | azetidin[1-C(═O)Me]-3-yl | C(═O)Me | Me | $CH_2OMe$ | O |
| D-17459 | Me(R) | single bond | H | azetidin[1-C(═O)Me]-3-yl | C(═O)Me | Me | $CH_2OMe$ | O |
| D-17460 | Me(S) | single bond | H | azetidin[1-C(═O)Me]-3-yl | C(═O)Me | Me | $CH_2OMe$ | O |
| D-17461 | H | single bond | Me | azetidin[1-S(═O)$_2$Me]-3-yl | C(═O)Me | Cl | $CH_2OMe$ | O |
| D-17462 | Me | single bond | H | azetidin[1-S(═O)$_2$Me]-3-yl | C(═O)Me | Cl | $CH_2OMe$ | O |
| D-17463 | Me(R) | single bond | H | azetidin[1-S(═O)$_2$Me]-3-yl | C(═O)Me | Cl | $CH_2OMe$ | O |

TABLE 1043-continued

| Compound Number | Y | W | Z | $R^1$ | $R^2$ | $R^3$ | $R^{10}$ | A |
|---|---|---|---|---|---|---|---|---|
| D-17464 | Me(S) | single bond | H | azetidin[1-S(=O)$_2$Me]-3-yl | C(=O)Me | Cl | $CH_2OMe$ | O |
| D-17465 | H | single bond | Me | azetidin[1-S(=O)$_2$Me]-3-yl | C(=O)Me | Me | $CH_2OMe$ | O |
| D-17466 | Me | single bond | H | azetidin[1-S(=O)$_2$Me]-3-yl | C(=O)Me | Me | $CH_2OMe$ | O |
| D-17467 | Me(R) | single bond | H | azetidin[1-S(=O)$_2$Me]-3-yl | C(=O)Me | Me | $CH_2OMe$ | O |
| D-17468 | Me(S) | single bond | H | azetidin[1-S(=O)$_2$Me]-3-yl | C(=O)Me | Me | $CH_2OMe$ | O |
| D-17469 | H | single bond | Me | azetidin[1-S(=O)$_2$CHF$_2$]-3-yl | C(=O)Me | Cl | $CH_2OMe$ | O |
| D-17470 | Me | single bond | H | azetidin[1-S(=O)$_2$CHF$_2$]-3-yl | C(=O)Me | Cl | $CH_2OMe$ | O |
| D-17471 | Me(R) | single bond | H | azetidin[1-S(=O)$_2$CHF$_2$]-3-yl | C(=O)Me | Cl | $CH_2OMe$ | O |
| D-17472 | Me(S) | single bond | H | azetidin[1-S(=O)$_2$CHF$_2$]-3-yl | C(=O)Me | Cl | $CH_2OMe$ | O |
| D-17473 | H | single bond | Me | azetidin[1-S(=O)$_2$CHF$_2$]-3-yl | C(=O)Me | Me | $CH_2OMe$ | O |
| D-17474 | Me | single bond | H | azetidin[1-S(=O)$_2$CHF$_2$]-3-yl | C(=O)Me | Me | $CH_2OMe$ | O |
| D-17475 | Me(R) | single bond | H | azetidin[1-S(=O)$_2$CHF$_2$]-3-yl | C(=O)Me | Me | $CH_2OMe$ | O |
| D-17476 | Me(S) | single bond | H | azetidin[1-S(=O)$_2$CHF$_2$]-3-yl | C(=O)Me | Me | $CH_2OMe$ | O |
| D-17477 | H | single bond | Me | c-Pen | C(=O)Me | Cl | $CH_2OMe$ | O |
| D-17478 | Me | single bond | H | c-Pen | C(=O)Me | Cl | $CH_2OMe$ | O |
| D-17479 | Me(R) | single bond | H | c-Pen | C(=O)Me | Cl | $CH_2OMe$ | O |
| D-17480 | Me(S) | single bond | H | c-Pen | C(=O)Me | Cl | $CH_2OMe$ | O |
| D-17481 | H | single bond | Me | c-Pen | C(=O)Me | Me | $CH_2OMe$ | O |
| D-17482 | Me | single bond | H | c-Pen | C(=O)Me | Me | $CH_2OMe$ | O |
| D-17483 | Me(R) | single bond | H | c-Pen | C(=O)Me | Me | $CH_2OMe$ | O |
| D-17484 | Me(S) | single bond | H | c-Pen | C(=O)Me | Me | $CH_2OMe$ | O |
| D-17485 | H | single bond | Me | tetrahydrofuran-3-yl | C(=O)Me | Cl | $CH_2OMe$ | O |
| D-17486 | Me | single bond | H | tetrahydrofuran-3-yl | C(=O)Me | Cl | $CH_2OMe$ | O |

TABLE 1044

| Compound Number | Y | W | Z | $R^1$ | $R^2$ | $R^3$ | $R^{10}$ | A |
|---|---|---|---|---|---|---|---|---|
| D-17487 | Me(R) | single bond | H | tetrahydrofuran-3-yl | C(=O)Me | C | $CH_2OMe$ | O |
| D-17488 | Me(S) | single bond | H | tetrahydrofuran-3-yl | C(=O)Me | Cl | $CH_2OMe$ | O |
| D-17489 | H | single bond | Me | tetrahydrofuran-3-yl | C(=O)Me | Me | $CH_2OMe$ | O |
| D-17490 | Me | single bond | H | tetrahydrofuran-3-yl | C(=O)Me | Me | $CH_2OMe$ | O |
| D-17491 | Me(R) | single bond | H | tetrahydrofuran-3-yl | C(=O)Me | Me | $CH_2OMe$ | O |
| D-17492 | Me(S) | single bond | H | tetrahydrofuran-3-yl | C(=O)Me | Me | $CH_2OMe$ | O |
| D-17493 | H | single bond | Me | tetrahydrothiophen-3-yl | C(=O)Me | Cl | $CH_2OMe$ | O |
| D-17494 | Me | single bond | H | tetrahydrothiophen-3-yl | C(=O)Me | Cl | $CH_2OMe$ | O |
| D-17495 | Me(R) | single bond | H | tetrahydrothiophen-3-yl | C(=O)Me | Cl | $CH_2OMe$ | O |
| D-17496 | Me(S) | single bond | H | tetrahydrothiophen-3-yl | C(=O)Me | Cl | $CH_2OMe$ | O |
| D-17497 | H | single bond | Me | tetrahydrothiophen-3-yl | C(=O)Me | Me | $CH_2OMe$ | O |
| D-17498 | Me | single bond | H | tetrahydrothiophen-3-yl | C(=O)Me | Me | $CH_2OMe$ | O |
| D-17499 | Me(R) | single bond | H | tetrahydrothiophen-3-yl | C(=O)Me | Me | $CH_2OMe$ | O |
| D-17500 | Me(S) | single bond | H | tetrahydrothiophen-3-yl | C(=O)Me | Me | $CH_2OMe$ | O |
| D-17501 | H | single bond | Me | c-Pen(1-CN) | C(=O)Me | Cl | $CH_2OMe$ | O |
| D-17502 | Me | single bond | H | c-Pen(1-CN) | C(=O)Me | Cl | $CH_2OMe$ | O |
| D-17503 | Me(R) | single bond | H | c-Pen(1-CN) | C(=O)Me | Cl | $CH_2OMe$ | O |
| D-17504 | Me(S) | single bond | H | c-Pen(1-CN) | C(=O)Me | Cl | $CH_2OMe$ | O |
| D-17505 | H | single bond | Me | c-Pen(1-CN) | C(=O)Me | Me | $CH_2OMe$ | O |
| D-17506 | Me | single bond | H | c-Pen(1-CN) | C(=O)Me | Me | $CH_2OMe$ | O |
| D-17507 | Me(R) | single bond | H | c-Pen(1-CN) | C(=O)Me | Me | $CH_2OMe$ | O |
| D-17508 | Me(S) | single bond | H | c-Pen(1-CN) | C(=O)Me | Me | $CH_2OMe$ | O |
| D-17509 | H | single bond | Me | tetrahydrofuran(3-CN)-3-yl | C(=O)Me | Cl | $CH_2OMe$ | O |
| D-17510 | Me | single bond | H | tetrahydrofuran(3-CN)-3-yl | C(=O)Me | Cl | $CH_2OMe$ | O |
| D-17511 | Me(R) | single bond | H | tetrahydrofuran(3-CN)-3-yl | C(=O)Me | Cl | $CH_2OMe$ | O |
| D-17512 | Me(S) | single bond | H | tetrahydrofuran(3-CN)-3-yl | C(=O)Me | Cl | $CH_2OMe$ | O |
| D-17513 | H | single bond | Me | tetrahydrofuran(3-CN)-3-yl | C(=O)Me | Me | $CH_2OMe$ | O |
| D-17514 | Me | single bond | H | tetrahydrofuran(3-CN)-3-yl | C(=O)Me | Me | $CH_2OMe$ | O |
| D-17515 | Me(R) | single bond | H | tetrahydrofuran(3-CN)-3-yl | C(=O)Me | Me | $CH_2OMe$ | O |
| D-17516 | Me(S) | single bond | H | tetrahydrofuran(3-CN)-3-yl | C(=O)Me | Me | $CH_2OMe$ | O |
| D-17517 | H | single bond | Me | tetrahydrothiophen(3-CN)-3-yl | C(=O)Me | Cl | $CH_2OMe$ | O |
| D-17518 | Me | single bond | H | tetrahydrothiophen(3-CN)-3-yl | C(=O)Me | Cl | $CH_2OMe$ | O |
| D-17519 | Me(R) | single bond | H | tetrahydrothiophen(3-CN)-3-yl | C(=O)Me | Cl | $CH_2OMe$ | O |
| D-17520 | Me(S) | single bond | H | tetrahydrothiophen(3-CN)-3-yl | C(=O)Me | Cl | $CH_2OMe$ | O |
| D-17521 | H | single bond | Me | tetrahydrothiophen(3-CN)-3-yl | C(=O)Me | Me | $CH_2OMe$ | O |
| D-17522 | Me | single bond | H | tetrahydrothiophen(3-CN)-3-yl | C(=O)Me | Me | $CH_2OMe$ | O |
| D-17523 | Me(R) | single bond | H | tetrahydrothiophen(3-CN)-3-yl | C(=O)Me | Me | $CH_2OMe$ | O |
| D-17524 | Me(S) | single bond | H | tetrahydrothiophen(3-CN)-3-yl | C(=O)Me | Me | $CH_2OMe$ | O |
| D-17525 | H | single bond | Me | bicyclo[1.1.1]pentan-1-yl | C(=O)Me | Cl | $CH_2OMe$ | O |
| D-17526 | Me | single bond | H | bicyclo[1.1.1]pentan-1-yl | C(=O)Me | Cl | $CH_2OMe$ | O |
| D-17527 | Me(R) | single bond | H | bicyclo[1.1.1]pentan-1-yl | C(=O)Me | Cl | $CH_2OMe$ | O |
| D-17528 | Me(S) | single bond | H | bicyclo[1.1.1]pentan-1-yl | C(=O)Me | Cl | $CH_2OMe$ | O |

TABLE 1044-continued

| Compound Number | Y | W | Z | $R^1$ | $R^2$ | $R^3$ | $R^{10}$ | A |
|---|---|---|---|---|---|---|---|---|
| D-17529 | H | single bond | Me | bicyclo[1.1.1]pentan-1-yl | C(═O)Me | Me | $CH_2OMe$ | O |
| D-17530 | Me | single bond | H | bicyclo[1.1.1]pentan-1-yl | C(═O)Me | Me | $CH_2OMe$ | O |

TABLE 1045

| Compound Number | Y | W | Z | $R^1$ | $R^2$ | $R^3$ | $R^{10}$ | A |
|---|---|---|---|---|---|---|---|---|
| D-17531 | Me(R) | single bond | H | bicyclo[1.1.1]pentan-1-yl | C(═O)Me | Me | $CH_2OMe$ | O |
| D-17532 | Me(S) | single bond | H | bicyclo[1.1.1]pentan-1-yl | C(═O)Me | Me | $CH_2OMe$ | O |
| D-17533 | H | single bond | Me | c-Hex | C(═O)Me | Cl | $CH_2OMe$ | O |
| D-17534 | Me | single bond | H | c-Hex | C(═O)Me | Cl | $CH_2OMe$ | O |
| D-17535 | Me(R) | single bond | H | c-Hex | C(═O)Me | Cl | $CH_2OMe$ | O |
| D-17536 | Me(S) | single bond | H | c-Hex | C(═O)Me | Cl | $CH_2OMe$ | O |
| D-17537 | H | single bond | Me | c-Hex | C(═O)Me | Me | $CH_2OMe$ | O |
| D-17538 | Me | single bond | H | c-Hex | C(═O)Me | Me | $CH_2OMe$ | O |
| D-17539 | Me(R) | single bond | H | c-Hex | C(═O)Me | Me | $CH_2OMe$ | O |
| D-17540 | Me(S) | single bond | H | c-Hex | C(═O)Me | Me | $CH_2OMe$ | O |
| D-17541 | H | single bond | Me | tetrahydropyran-4-yl | C(═O)Me | Cl | $CH_2OMe$ | O |
| D-17542 | Me | single bond | H | tetrahydropyran-4-yl | C(═O)Me | Cl | $CH_2OMe$ | O |
| D-17543 | Me(R) | single bond | H | tetrahydropyran-4-yl | C(═O)Me | Cl | $CH_2OMe$ | O |
| D-17544 | Me(S) | single bond | H | tetrahydropyran-4-yl | C(═O)Me | Cl | $CH_2OMe$ | O |
| D-17545 | H | single bond | Me | tetrahydropyran-4-yl | C(═O)Me | Me | $CH_2OMe$ | O |
| D-17546 | Me | single bond | H | tetrahydropyran-4-yl | C(═O)Me | Me | $CH_2OMe$ | O |
| D-17547 | Me(R) | single bond | H | tetrahydropyran-4-yl | C(═O)Me | Me | $CH_2OMe$ | O |
| D-17548 | Me(S) | single bond | H | tetrahydropyran-4-yl | C(═O)Me | Me | $CH_2OMe$ | O |
| D-17549 | H | single bond | Me | tetrahydrothiopyran-4-yl | C(═O)Me | Cl | $CH_2OMe$ | O |
| D-17550 | Me | single bond | H | tetrahydrothiopyran-4-yl | C(═O)Me | Cl | $CH_2OMe$ | O |
| D-17551 | Me(R) | single bond | H | tetrahydrothiopyran-4-yl | C(═O)Me | Cl | $CH_2OMe$ | O |
| D-17552 | Me(S) | single bond | H | tetrahydrothiopyran-4-yl | C(═O)Me | Cl | $CH_2OMe$ | O |
| D-17553 | H | single bond | Me | tetrahydrothiopyran-4-yl | C(═O)Me | Me | $CH_2OMe$ | O |
| D-17554 | Me | single bond | H | tetrahydrothiopyran-4-yl | C(═O)Me | Me | $CH_2OMe$ | O |
| D-17555 | Me(R) | single bond | H | tetrahydrothiopyran-4-yl | C(═O)Me | Me | $CH_2OMe$ | O |
| D-17556 | Me(S) | single bond | H | tetrahydrothiopyran-4-yl | C(═O)Me | Me | $CH_2OMe$ | O |
| D-17557 | H | single bond | Me | c-Hex(1-CN) | C(═O)Me | Cl | $CH_2OMe$ | O |
| D-17558 | Me | single bond | H | c-Hex(1-CN) | C(═O)Me | Cl | $CH_2OMe$ | O |
| D-17559 | Me(R) | single bond | H | c-Hex(1-CN) | C(═O)Me | Cl | $CH_2OMe$ | O |
| D-17560 | Me(S) | single bond | H | c-Hex(1-CN) | C(═O)Me | Cl | $CH_2OMe$ | O |
| D-17561 | H | single bond | Me | c-Hex(1-CN) | C(═O)Me | Me | $CH_2OMe$ | O |
| D-17562 | Me | single bond | H | c-Hex(1-CN) | C(═O)Me | Me | $CH_2OMe$ | O |
| D-17563 | Me(R) | single bond | H | c-Hex(1-CN) | C(═O)Me | Me | $CH_2OMe$ | O |
| D-17564 | Me(S) | single bond | H | c-Hex(1-CN) | C(═O)Me | Me | $CH_2OMe$ | O |
| D-17565 | H | single bond | Me | tetrahydropyran(4-CN)-4-yl | C(═O)Me | Cl | $CH_2OMe$ | O |
| D-17566 | Me | single bond | H | tetrahydropyran(4-CN)-4-yl | C(═O)Me | Cl | $CH_2OMe$ | O |
| D-17567 | Me(R) | single bond | H | tetrahydropyran(4-CN)-4-yl | C(═O)Me | Cl | $CH_2OMe$ | O |
| D-17568 | Me(S) | single bond | H | tetrahydropyran(4-CN)-4-yl | C(═O)Me | Cl | $CH_2OMe$ | O |
| D-17569 | H | single bond | Me | tetrahydropyran(4-CN)-4-yl | C(═O)Me | Me | $CH_2OMe$ | O |
| D-17570 | Me | single bond | H | tetrahydropyran(4-CN)-4-yl | C(═O)Me | Me | $CH_2OMe$ | O |
| D-17571 | Me(R) | single bond | H | tetrahydropyran(4-CN)-4-yl | C(═O)Me | Me | $CH_2OMe$ | O |
| D-17572 | Me(S) | single bond | H | tetrahydropyran(4-CN)-4-yl | C(═O)Me | Me | $CH_2OMe$ | O |
| D-17573 | H | single bond | Me | tetrahydrothiopyran(4-CN)-4-yl | C(═O)Me | Cl | $CH_2OMe$ | O |
| D-17574 | Me | single bond | H | tetrahydrothiopyran(4-CN)-4-yl | C(═O)Me | Cl | $CH_2OMe$ | O |

TABLE 1046

| Compound Number | Y | W | Z | $R^1$ | $R^2$ | $R^3$ | $R^{10}$ | A |
|---|---|---|---|---|---|---|---|---|
| D-17575 | Me(R) | single bond | H | tetrahydrothiopyran(4-CN)-4-yl | C(═O)Me | Cl | $CH_2OMe$ | O |
| D-17576 | Me(S) | single bond | H | tetrahydrothiopyran(4-CN)-4-yl | C(═O)Me | Cl | $CH_2OMe$ | O |
| D-17577 | H | single bond | Me | tetrahydrothiopyran(4-CN)-4-yl | C(═O)Me | Me | $CH_2OMe$ | O |
| D-17578 | Me | single bond | H | tetrahydrothiopyran(4-CN)-4-yl | C(═O)Me | Me | $CH_2OMe$ | O |
| D-17579 | Me(R) | single bond | H | tetrahydrothiopyran(4-CN)-4-yl | C(═O)Me | Me | $CH_2OMe$ | O |
| D-17580 | Me(S) | single bond | H | tetrahydrothiopyran(4-CN)-4-yl | C(═O)Me | Me | $CH_2OMe$ | O |
| D-17581 | H | single bond | Me | $CH_2$(c-Pr) | C(═O)Me | Cl | $CH_2OMe$ | O |
| D-17582 | Me | single bond | H | $CH_2$(c-Pr) | C(═O)Me | Cl | $CH_2OMe$ | O |
| D-17583 | Me(R) | single bond | H | $CH_2$(c-Pr) | C(═O)Me | Cl | $CH_2OMe$ | O |
| D-17584 | Me(S) | single bond | H | $CH_2$(c-Pr) | C(═O)Me | Cl | $CH_2OMe$ | O |
| D-17585 | H | single bond | Me | $CH_2$(c-Pr) | C(═O)Me | Me | $CH_2OMe$ | O |
| D-17586 | Me | single bond | H | $CH_2$(c-Pr) | C(═O)Me | Me | $CH_2OMe$ | O |

TABLE 1046-continued

| Compound Number | Y | W | Z | $R^1$ | $R^2$ | $R^3$ | $R^{10}$ | A |
|---|---|---|---|---|---|---|---|---|
| D-17587 | Me(R) | single bond | H | $CH_2$(c-Pr) | C(=O)Me | Me | $CH_2OMe$ | O |
| D-17588 | Me(S) | single bond | H | $CH_2$(c-Pr) | C(=O)Me | Me | $CH_2OMe$ | O |
| D-17589 | H | single bond | Me | $CH_2$[c-Pr(1-CN)] | C(=O)Me | Cl | $CH_2OMe$ | O |
| D-17590 | Me | single bond | H | $CH_2$[c-Pr(1-CN)] | C(=O)Me | Cl | $CH_2OMe$ | O |
| D-17591 | Me(R) | single bond | H | $CH_2$[c-Pr(1-CN)] | C(=O)Me | Cl | $CH_2OMe$ | O |
| D-17592 | Me(S) | single bond | H | $CH_2$[c-Pr(1-CN)] | C(=O)Me | Cl | $CH_2OMe$ | O |
| D-17593 | H | single bond | Me | $CH_2$[c-Pr(1-CN)] | C(=O)Me | Me | $CH_2OMe$ | O |
| D-17594 | Me | single bond | H | $CH_2$[c-Pr(1-CN)] | C(=O)Me | Me | $CH_2OMe$ | O |
| D-17595 | Me(R) | single bond | H | $CH_2$[c-Pr(1-CN)] | C(=O)Me | Me | $CH_2OMe$ | O |
| D-17596 | Me(S) | single bond | H | $CH_2$[c-Pr(1-CN)] | C(=O)Me | Me | $CH_2OMe$ | O |
| D-17597 | H | single bond | Me | CH(Me)(c-Pr) | C(=O)Me | Cl | $CH_2OMe$ | O |
| D-17598 | Me | single bond | H | CH(Me)(c-Pr) | C(=O)Me | Cl | $CH_2OMe$ | O |
| D-17599 | Me(R) | single bond | H | CH(Me)(c-Pr) | C(=O)Me | Cl | $CH_2OMe$ | O |
| D-17600 | Me(S) | single bond | H | CH(Me)(c-Pr) | C(=O)Me | Cl | $CH_2OMe$ | O |
| D-17601 | H | single bond | Me | CH(Me)(c-Pr) | C(=O)Me | Me | $CH_2OMe$ | O |
| D-17602 | Me | single bond | H | CH(Me)(c-Pr) | C(=O)Me | Me | $CH_2OMe$ | O |
| D-17603 | Me(R) | single bond | H | CH(Me)(c-Pr) | C(=O)Me | Me | $CH_2OMe$ | O |
| D-17604 | Me(S) | single bond | H | CH(Me)(c-Pr) | C(=O)Me | Me | $CH_2OMe$ | O |
| D-17605 | H | single bond | Me | CH(Me)$CH_2OMe$ | C(=O)Me | Cl | $CH_2OMe$ | O |
| D-17606 | Me | single bond | H | CH(Me)$CH_2OMe$ | C(=O)Me | Cl | $CH_2OMe$ | O |
| D-17607 | Me(R) | single bond | H | CH(Me)$CH_2OMe$ | C(=O)Me | Cl | $CH_2OMe$ | O |
| D-17608 | Me(S) | single bond | H | CH(Me)$CH_2OMe$ | C(=O)Me | Cl | $CH_2OMe$ | O |
| D-17609 | H | single bond | Me | CH(Me)$CH_2OMe$ | C(=O)Me | Me | $CH_2OMe$ | O |
| D-17610 | Me | single bond | H | CH(Me)$CH_2OMe$ | C(=O)Me | Me | $CH_2OMe$ | O |
| D-17611 | Me(R) | single bond | H | CH(Me)$CH_2OMe$ | C(=O)Me | Me | $CH_2OMe$ | O |
| D-17612 | Me(S) | single bond | H | CH(Me)$CH_2OMe$ | C(=O)Me | Me | $CH_2OMe$ | O |
| D-17613 | H | single bond | Me | $CH_2CH{=}CH_2$ | C(=O)Me | Cl | $CH_2OMe$ | O |
| D-17614 | Me | single bond | H | $CH_2CH{=}CH_2$ | C(=O)Me | Cl | $CH_2OMe$ | O |
| D-17615 | Me(R) | single bond | H | $CH_2CH{=}CH_2$ | C(=O)Me | Cl | $CH_2OMe$ | O |
| D-17616 | Me(S) | single bond | H | $CH_2CH{=}CH_2$ | C(=O)Me | Cl | $CH_2OMe$ | O |
| D-17617 | H | single bond | Me | $CH_2CH{=}CH_2$ | C(=O)Me | Me | $CH_2OMe$ | O |
| D-17618 | Me | single bond | H | $CH_2CH{=}CH_2$ | C(=O)Me | Me | $CH_2OMe$ | O |

TABLE 1047

| Compound Number | Y | W | Z | $R^1$ | $R^2$ | $R^3$ | $R^{10}$ | A |
|---|---|---|---|---|---|---|---|---|
| D-17619 | Me(R) | single bond | H | $CH_2CH{=}CH_2$ | C(=O)Me | Me | $CH_2OMe$ | O |
| D-17620 | Me(S) | single bond | H | $CH_2CH{=}CH_2$ | C(=O)Me | Me | $CH_2OMe$ | O |
| D-17621 | H | single bond | Me | $CH_2C{\equiv}CH$ | C(=O)Me | Cl | $CH_2OMe$ | O |
| D-17622 | Me | single bond | H | $CH_2C{\equiv}CH$ | C(=O)Me | Cl | $CH_2OMe$ | O |
| D-17623 | Me(R) | single bond | H | $CH_2C{\equiv}CH$ | C(=O)Me | Cl | $CH_2OMe$ | O |
| D-17624 | Me(S) | single bond | H | $CH_2C{\equiv}CH$ | C(=O)Me | Cl | $CH_2OMe$ | O |
| D-17625 | H | single bond | Me | $CH_2C{\equiv}CH$ | C(=O)Me | Me | $CH_2OMe$ | O |
| D-17626 | Me | single bond | H | $CH_2C{\equiv}CH$ | C(=O)Me | Me | $CH_2OMe$ | O |
| D-17627 | Me(R) | single bond | H | $CH_2C{\equiv}CH$ | C(=O)Me | Me | $CH_2OMe$ | O |
| D-17628 | Me(S) | single bond | H | $CH_2C{\equiv}CH$ | C(=O)Me | Me | $CH_2OMe$ | O |
| D-17629 | H | single bond | Me | $CH_2CN$ | C(=O)Me | Cl | $CH_2OMe$ | O |
| D-17630 | Me | single bond | H | $CH_2CN$ | C(=O)Me | Cl | $CH_2OMe$ | O |
| D-17631 | Me(R) | single bond | H | $CH_2CN$ | C(=O)Me | Cl | $CH_2OMe$ | O |
| D-17632 | Me(S) | single bond | H | $CH_2CN$ | C(=O)Me | Cl | $CH_2OMe$ | O |
| D-17633 | H | single bond | Me | $CH_2CN$ | C(=O)Me | Me | $CH_2OMe$ | O |
| D-17634 | Me | single bond | H | $CH_2CN$ | C(=O)Me | Me | $CH_2OMe$ | O |
| D-17635 | Me(R) | single bond | H | $CH_2CN$ | C(=O)Me | Me | $CH_2OMe$ | O |
| D-17636 | Me(S) | single bond | H | $CH_2CN$ | C(=O)Me | Me | $CH_2OMe$ | O |
| D-17637 | H | single bond | Me | CH(Me)CN | C(=O)Me | Cl | $CH_2OMe$ | O |
| D-17638 | Me | single bond | H | CH(Me)CN | C(=O)Me | Cl | $CH_2OMe$ | O |
| D-17639 | Me(R) | single bond | H | CH(Me)CN | C(=O)Me | Cl | $CH_2OMe$ | O |
| D-17640 | Me(S) | single bond | H | CH(Me)CN | C(=O)Me | Cl | $CH_2OMe$ | O |
| D-17641 | H | single bond | Me | CH(Me)CN | C(=O)Me | Me | $CH_2OMe$ | O |
| D-17642 | Me | single bond | H | CH(Me)CN | C(=O)Me | Me | $CH_2OMe$ | O |
| D-17643 | Me(R) | single bond | H | CH(Me)CN | C(=O)Me | Me | $CH_2OMe$ | O |
| D-17644 | Me(S) | single bond | H | CH(Me)CN | C(=O)Me | Me | $CH_2OMe$ | O |
| D-17645 | H | single bond | Me | $C(Me)_2CN$ | C(=O)Me | Cl | $CH_2OMe$ | O |
| D-17646 | Me | single bond | H | $C(Me)_2CN$ | C(=O)Me | Cl | $CH_2OMe$ | O |
| D-17647 | Me(R) | single bond | H | $C(Me)_2CN$ | C(=O)Me | Cl | $CH_2OMe$ | O |
| D-17648 | Me(S) | single bond | H | $C(Me)_2CN$ | C(=O)Me | Cl | $CH_2OMe$ | O |
| D-17649 | H | single bond | Me | $C(Me)_2CN$ | C(=O)Me | Me | $CH_2OMe$ | O |
| D-17650 | Me | single bond | H | $C(Me)_2CN$ | C(=O)Me | Me | $CH_2OMe$ | O |
| D-17651 | Me(R) | single bond | H | $C(Me)_2CN$ | C(=O)Me | Me | $CH_2OMe$ | O |
| D-17652 | Me(S) | single bond | H | $C(Me)_2CN$ | C(=O)Me | Me | $CH_2OMe$ | O |
| D-17653 | H | single bond | Me | C(Me)(i-Pr)CN | C(=O)Me | Cl | $CH_2OMe$ | O |

TABLE 1047-continued

| Compound Number | Y | W | Z | $R^1$ | $R^2$ | $R^3$ | $R^{10}$ | A |
|---|---|---|---|---|---|---|---|---|
| D-17654 | Me | single bond | H | C(Me)(i-Pr)CN | C(═O)Me | Cl | $CH_2OMe$ | O |
| D-17655 | Me(R) | single bond | H | C(Me)(i-Pr)CN | C(═O)Me | Cl | $CH_2OMe$ | O |
| D-17656 | Me(S) | single bond | H | C(Me)(i-Pr)CN | C(═O)Me | Cl | $CH_2OMe$ | O |
| D-17657 | H | single bond | Me | C(Me)(i-Pr)CN | C(═O)Me | Me | $CH_2OMe$ | O |
| D-17658 | Me | single bond | H | C(Me)(i-Pr)CN | C(═O)Me | Me | $CH_2OMe$ | O |
| D-17659 | Me(R) | single bond | H | C(Me)(i-Pr)CN | C(═O)Me | Me | $CH_2OMe$ | O |
| D-17660 | Me(S) | single bond | H | C(Me)(i-Pr)CN | C(═O)Me | Me | $CH_2OMe$ | O |
| D-17661 | H | single bond | Me | OMe | C(═O)Me | Cl | $CH_2OMe$ | O |
| D-17662 | Me | single bond | H | OMe | C(═O)Me | Cl | $CH_2OMe$ | O |

TABLE 1048

| Compound Number | Y | W | Z | $R^1$ | $R^2$ | $R^3$ | $R^{10}$ | A |
|---|---|---|---|---|---|---|---|---|
| D-17663 | Me(R) | single bond | H | OMe | C(═O)Me | Cl | $CH_2OMe$ | O |
| D-17664 | Me(S) | single bond | H | OMe | C(═O)Me | Cl | $CH_2OMe$ | O |
| D-17665 | H | single bond | Me | OMe | C(═O)Me | Me | $CH_2OMe$ | O |
| D-17666 | Me | single bond | H | OMe | C(═O)Me | Me | $CH_2OMe$ | O |
| D-17667 | Me(R) | single bond | H | OMe | C(═O)Me | Me | $CH_2OMe$ | O |
| D-17668 | Me(S) | single bond | H | OMe | C(═O)Me | Me | $CH_2OMe$ | O |
| D-17669 | H | single bond | Me | CH=NOMe | C(═O)Me | Cl | $CH_2OMe$ | O |
| D-17670 | Me | single bond | H | CH=NOMe | C(═O)Me | Cl | $CH_2OMe$ | O |
| D-17671 | Me(R) | single bond | H | CH=NOMe | C(═O)Me | Cl | $CH_2OMe$ | O |
| D-17672 | Me(S) | single bond | H | CH=NOMe | C(═O)Me | Cl | $CH_2OMe$ | O |
| D-17673 | H | single bond | Me | CH=NOMe | C(═O)Me | Me | $CH_2OMe$ | O |
| D-17674 | Me | single bond | H | CH=NOMe | C(═O)Me | Me | $CH_2OMe$ | O |
| D-17675 | Me(R) | single bond | H | CH=NOMe | C(═O)Me | Me | $CH_2OMe$ | O |
| D-17676 | Me(S) | single bond | H | CH=NOMe | C(═O)Me | Me | $CH_2OMe$ | O |
| D-17677 | H | single bond | Me | morpholin-4-yl | C(═O)Me | Cl | $CH_2OMe$ | O |
| D-17678 | Me | single bond | H | morpholin-4-yl | C(═O)Me | Cl | $CH_2OMe$ | O |
| D-17679 | Me(R) | single bond | H | morpholin-4-yl | C(═O)Me | Cl | $CH_2OMe$ | O |
| D-17680 | Me(S) | single bond | H | morpholin-4-yl | C(═O)Me | Cl | $CH_2OMe$ | O |
| D-17681 | H | single bond | Me | morpholin-4-yl | C(═O)Me | Me | $CH_2OMe$ | O |
| D-17682 | Me | single bond | H | morpholin-4-yl | C(═O)Me | Me | $CH_2OMe$ | O |
| D-17683 | Me(R) | single bond | H | morpholin-4-yl | C(═O)Me | Me | $CH_2OMe$ | O |
| D-17684 | Me(S) | single bond | H | morpholin-4-yl | C(═O)Me | Me | $CH_2OMe$ | O |
| D-17685 | H | single bond | Me | Ph | C(═O)Me | Cl | $CH_2OMe$ | O |
| D-17686 | Me | single bond | H | Ph | C(═O)Me | Cl | $CH_2OMe$ | O |
| D-17687 | Me(R) | single bond | H | Ph | C(═O)Me | Cl | $CH_2OMe$ | O |
| D-17688 | Me(S) | single bond | H | Ph | C(═O)Me | Cl | $CH_2OMe$ | O |
| D-17689 | H | single bond | Me | Ph | C(═O)Me | Me | $CH_2OMe$ | O |
| D-17690 | Me | single bond | H | Ph | C(═O)Me | Me | $CH_2OMe$ | O |
| D-17691 | Me(R) | single bond | H | Ph | C(═O)Me | Me | $CH_2OMe$ | O |
| D-17692 | Me(S) | single bond | H | Ph | C(═O)Me | Me | $CH_2OMe$ | O |
| D-17693 | H | single bond | Me | $CH_2Ph$ | C(═O)Me | Cl | $CH_2OMe$ | O |
| D-17694 | Me | single bond | H | $CH_2Ph$ | C(═O)Me | Cl | $CH_2OMe$ | O |
| D-17695 | Me(R) | single bond | H | $CH_2Ph$ | C(═O)Me | Cl | $CH_2OMe$ | O |
| D-17696 | Me(S) | single bond | H | $CH_2Ph$ | C(═O)Me | Cl | $CH_2OMe$ | O |
| D-17697 | H | single bond | Me | $CH_2Ph$ | C(═O)Me | Me | $CH_2OMe$ | O |
| D-17698 | Me | single bond | H | $CH_2Ph$ | C(═O)Me | Me | $CH_2OMe$ | O |
| D-17699 | Me(R) | single bond | H | $CH_2Ph$ | C(═O)Me | Me | $CH_2OMe$ | O |
| D-17700 | Me(S) | single bond | H | $CH_2Ph$ | C(═O)Me | Me | $CH_2OMe$ | O |
| D-17701 | H | single bond | Me | thiazole-2-yl | C(═O)Me | Cl | $CH_2OMe$ | O |
| D-17702 | Me | single bond | H | thiazole-2-yl | C(═O)Me | Cl | $CH_2OMe$ | O |
| D-17703 | Me(R) | single bond | H | thiazole-2-yl | C(═O)Me | Cl | $CH_2OMe$ | O |
| D-17704 | Me(S) | single bond | H | thiazole-2-yl | C(═O)Me | Cl | $CH_2OMe$ | O |
| D-17705 | H | single bond | Me | thiazole-2-yl | C(═O)Me | Me | $CH_2OMe$ | O |
| D-17706 | Me | single bond | H | thiazole-2-yl | C(═O)Me | Me | $CH_2OMe$ | O |

TABLE 1049

| Compound Number | Y | W | Z | $R^1$ | $R^2$ | $R^3$ | $R^{10}$ | A |
|---|---|---|---|---|---|---|---|---|
| D-17707 | Me(R) | single bond | H | thiazole-2-yl | C(═O)Me | Me | $CH_2OMe$ | O |
| D-17708 | Me(S) | single bond | H | thiazole-2-yl | C(═O)Me | Me | $CH_2OMe$ | O |
| D-17709 | H | single bond | Me | 1-Me-pyrazol-3-yl | C(═O)Me | Cl | $CH_2OMe$ | O |

TABLE 1049-continued

| Compound Number | Y | W | Z | $R^1$ | $R^2$ | $R^3$ | $R^{10}$ | A |
|---|---|---|---|---|---|---|---|---|
| D-17710 | Me | single bond | H | 1-Me-pyrazol-3-yl | C(=O)Me | Cl | $CH_2OMe$ | O |
| D-17711 | Me(R) | single bond | H | 1-Me-pyrazol-3-yl | C(=O)Me | Cl | $CH_2OMe$ | O |
| D-17712 | Me(S) | single bond | H | 1-Me-pyrazol-3-yl | C(=O)Me | Cl | $CH_2OMe$ | O |
| D-17713 | H | single bond | Me | 1-Me-pyrazol-3-yl | C(=O)Me | Me | $CH_2OMe$ | O |
| D-17714 | Me | single bond | H | 1-Me-pyrazol-3-yl | C(=O)Me | Me | $CH_2OMe$ | O |
| D-17715 | Me(R) | single bond | H | 1-Me-pyrazol-3-yl | C(=O)Me | Me | $CH_2OMe$ | O |
| D-17716 | Me(S) | single bond | H | 1-Me-pyrazol-3-yl | C(=O)Me | Me | $CH_2OMe$ | O |
| D-17717 | H | single bond | Me | 1-Me-pyrazol-5-yl | C(=O)Me | Cl | $CH_2OMe$ | O |
| D-17718 | Me | single bond | H | 1-Me-pyrazol-5-yl | C(=O)Me | Cl | $CH_2OMe$ | O |
| D-17719 | Me(R) | single bond | H | 1-Me-pyrazol-5-yl | C(=O)Me | Cl | $CH_2OMe$ | O |
| D-17720 | Me(S) | single bond | H | 1-Me-pyrazol-5-yl | C(=O)Me | Cl | $CH_2OMe$ | O |
| D-17721 | H | single bond | Me | 1-Me-pyrazol-5-yl | C(=O)Me | Me | $CH_2OMe$ | O |
| D-17722 | Me | single bond | H | 1-Me-pyrazol-5-yl | C(=O)Me | Me | $CH_2OMe$ | O |
| D-17723 | Me(R) | single bond | H | 1-Me-pyrazol-5-yl | C(=O)Me | Me | $CH_2OMe$ | O |
| D-17724 | Me(S) | single bond | H | 1-Me-pyrazol-5-yl | C(=O)Me | Me | $CH_2OMe$ | O |
| D-17725 | H | single bond | Me | $CH_2$(pyrimidin-2-yl) | C(=O)Me | Cl | $CH_2OMe$ | O |
| D-17726 | Me | single bond | H | $CH_2$(pyrimidin-2-yl) | C(=O)Me | Cl | $CH_2OMe$ | O |
| D-17727 | Me(R) | single bond | H | $CH_2$(pyrimidin-2-yl) | C(=O)Me | Cl | $CH_2OMe$ | O |
| D-17728 | Me(S) | single bond | H | $CH_2$(pyrimidin-2-yl) | C(=O)Me | Cl | $CH_2OMe$ | O |
| D-17729 | H | single bond | Me | $CH_2$(pyrimidin-2-yl) | C(=O)Me | Me | $CH_2OMe$ | O |
| D-17730 | Me | single bond | H | $CH_2$(pyrimidin-2-yl) | C(=O)Me | Me | $CH_2OMe$ | O |
| D-17731 | Me(R) | single bond | H | $CH_2$(pyrimidin-2-yl) | C(=O)Me | Me | $CH_2OMe$ | O |
| D-17732 | Me(S) | single bond | H | $CH_2$(pyrimidin-2-yl) | C(=O)Me | Me | $CH_2OMe$ | O |
| D-17733 | H | single bond | Me | Me | C(=O)Me | Cl | C(=O)Me | O |
| D-17734 | Me | single bond | H | Me | C(=O)Me | Cl | C(=O)Me | O |
| D-17735 | Me(R) | single bond | H | Me | C(=O)Me | Cl | C(=O)Me | O |
| D-17736 | Me(S) | single bond | H | Me | C(=O)Me | Cl | C(=O)Me | O |
| D-17737 | H | single bond | Me | Me | C(=O)Me | Me | C(=O)Me | O |
| D-17738 | Me | single bond | H | Me | C(=O)Me | Me | C(=O)Me | O |
| D-17739 | Me(R) | single bond | H | Me | C(=O)Me | Me | C(=O)Me | O |
| D-17740 | Me(S) | single bond | H | Me | C(=O)Me | Me | C(=O)Me | O |
| D-17741 | H | single bond | Me | $CH_2CHF_2$ | C(=O)Me | Cl | C(=O)Me | O |
| D-17742 | Me | single bond | H | $CH_2CHF_2$ | C(=O)Me | Cl | C(=O)Me | O |
| D-17743 | Me(R) | single bond | H | $CH_2CHF_2$ | C(=O)Me | Cl | C(=O)Me | O |
| D-17744 | Me(S) | single bond | H | $CH_2CHF_2$ | C(=O)Me | Cl | C(=O)Me | O |
| D-17745 | H | single bond | Me | $CH_2CHF_2$ | C(=O)Me | Me | C(=O)Me | O |
| D-17746 | Me | single bond | H | $CH_2CHF_2$ | C(=O)Me | Me | C(=O)Me | O |
| D-17747 | Me(R) | single bond | H | $CH_2CHF_2$ | C(=O)Me | Me | C(=O)Me | O |
| D-17748 | Me(S) | single bond | H | $CH_2CHF_2$ | C(=O)Me | Me | C(=O)Me | O |
| D-17749 | H | single bond | Me | n-Pr | C(=O)Me | Cl | C(=O)Me | O |
| D-17750 | Me | single bond | H | n-Pr | C(=O)Me | Cl | C(=O)Me | O |

TABLE 1050

| Compound Number | Y | W | Z | $R^1$ | $R^2$ | $R^3$ | $R^{10}$ | A |
|---|---|---|---|---|---|---|---|---|
| D-17751 | Me(R) | single bond | H | n-Pr | C(=O)Me | Cl | C(=O)Me | O |
| D-17752 | Me(S) | single bond | H | n-Pr | C(=O)Me | Cl | C(=O)Me | O |
| D-17753 | H | single bond | Me | n-Pr | C(=O)Me | Me | C(=O)Me | O |
| D-17754 | Me | single bond | H | n-Pr | C(=O)Me | Me | C(=O)Me | O |
| D-17755 | Me(R) | single bond | H | n-Pr | C(=O)Me | Me | C(=O)Me | O |
| D-17756 | Me(S) | single bond | H | n-Pr | C(=O)Me | Me | C(=O)Me | O |
| D-17757 | H | single bond | Me | i-Pr | C(=O)Me | Cl | C(=O)Me | O |
| D-17758 | Me | single bond | H | i-Pr | C(=O)Me | Cl | C(=O)Me | O |
| D-17759 | Me(R) | single bond | H | i-Pr | C(=O)Me | Cl | C(=O)Me | O |
| D-17760 | Me(S) | single bond | H | i-Pr | C(=O)Me | Cl | C(=O)Me | O |
| D-17761 | H | single bond | Me | i-Pr | C(=O)Me | Me | C(=O)Me | O |
| D-17762 | Me | single bond | H | i-Pr | C(=O)Me | Me | C(=O)Me | O |
| D-17763 | Me(R) | single bond | H | i-Pr | C(=O)Me | Me | C(=O)Me | O |
| D-17764 | Me(S) | single bond | H | i-Pr | C(=O)Me | Me | C(=O)Me | O |
| D-17765 | H | single bond | Me | c-Pr(1-F) | C(=O)Me | Cl | C(=O)Me | O |
| D-17766 | Me | single bond | H | c-Pr(1-F) | C(=O)Me | Cl | C(=O)Me | O |
| D-17767 | Me(R) | single bond | H | c-Pr(1-F) | C(=O)Me | Cl | C(=O)Me | O |
| D-17768 | Me(S) | single bond | H | c-Pr(1-F) | C(=O)Me | Cl | C(=O)Me | O |
| D-17769 | H | single bond | Me | c-Pr(1-F) | C(=O)Me | Me | C(=O)Me | O |
| D-17770 | Me | single bond | H | c-Pr(1-F) | C(=O)Me | Me | C(=O)Me | O |
| D-17771 | Me(R) | single bond | H | c-Pr(1-F) | C(=O)Me | Me | C(=O)Me | O |
| D-17772 | Me(S) | single bond | H | c-Pr(1-F) | C(=O)Me | Me | C(=O)Me | O |
| D-17773 | H | single bond | Me | c-Pr(2,2-$F_2$) | C(=O)Me | Cl | C(=O)Me | O |
| D-17774 | Me | single bond | H | c-Pr(2,2-$F_2$) | C(=O)Me | Cl | C(=O)Me | O |
| D-17775 | Me(R) | single bond | H | c-Pr(2,2-$F_2$) | C(=O)Me | Cl | C(=O)Me | O |
| D-17776 | Me(S) | single bond | H | c-Pr(2,2-$F_2$) | C(=O)Me | Cl | C(=O)Me | O |

TABLE 1050-continued

| Compound Number | Y | W | Z | $R^1$ | $R^2$ | $R^3$ | $R^{10}$ | A |
|---|---|---|---|---|---|---|---|---|
| D-17777 | H | single bond | Me | c-Pr(2,2-$F_2$) | C(=O)Me | Me | C(=O)Me | O |
| D-17778 | Me | single bond | H | c-Pr(2,2-$F_2$) | C(=O)Me | Me | C(=O)Me | O |
| D-17779 | Me(R) | single bond | H | c-Pr(2,2-$F_2$) | C(=O)Me | Me | C(=O)Me | O |
| D-17780 | Me(S) | single bond | H | c-Pr(2,2-$F_2$) | C(=O)Me | Me | C(=O)Me | O |
| D-17781 | H | single bond | Me | c-Pr(1-Cl) | C(=O)Me | Cl | C(=O)Me | O |
| D-17782 | Me | single bond | H | c-Pr(1-Cl) | C(=O)Me | Cl | C(=O)Me | O |
| D-17783 | Me(R) | single bond | H | c-Pr(1-Cl) | C(=O)Me | Cl | C(=O)Me | O |
| D-17784 | Me(S) | single bond | H | c-Pr(1-Cl) | C(=O)Me | Cl | C(=O)Me | O |
| D-17785 | H | single bond | Me | c-Pr(1-Cl) | C(=O)Me | Me | C(=O)Me | O |
| D-17786 | Me | single bond | H | c-Pr(1-Cl) | C(=O)Me | Me | C(=O)Me | O |
| D-17787 | Me(R) | single bond | H | c-Pr(1-Cl) | C(=O)Me | Me | C(=O)Me | O |
| D-17788 | Me(S) | single bond | H | c-Pr(1-Cl) | C(=O)Me | Me | C(=O)Me | O |
| D-17789 | H | single bond | Me | c-Pr(1-Br) | C(=O)Me | Cl | C(=O)Me | O |
| D-17790 | Me | single bond | H | c-Pr(1-Br) | C(=O)Me | Cl | C(=O)Me | O |
| D-17791 | Me(R) | single bond | H | c-Pr(1-Br) | C(=O)Me | Cl | C(=O)Me | O |
| D-17792 | Me(S) | single bond | H | c-Pr(1-Br) | C(=O)Me | Cl | C(=O)Me | O |
| D-17793 | H | single bond | Me | c-Pr(1-Br) | C(=O)Me | Me | C(=O)Me | O |
| D-17794 | Me | single bond | H | c-Pr(1-Br) | C(=O)Me | Me | C(=O)Me | O |

TABLE 1051

| Compound Number | Y | W | Z | $R^1$ | $R^2$ | $R^3$ | $R^{10}$ | A |
|---|---|---|---|---|---|---|---|---|
| D-17795 | Me(R) | single bond | H | c-Pr(1-Br) | C(=O)Me | Me | C(=O)Me | O |
| D-17796 | Me(S) | single bond | H | c-Pr(1-Br) | C(=O)Me | Me | C(=O)Me | O |
| D-17797 | H | single bond | Me | c-Pr(1-Me) | C(=O)Me | Cl | C(=O)Me | O |
| D-17798 | Me | single bond | H | c-Pr(1-Me) | C(=O)Me | Cl | C(=O)Me | O |
| D-17799 | Me(R) | single bond | H | c-Pr(1-Me) | C(=O)Me | Cl | C(=O)Me | O |
| D-17800 | Me(S) | single bond | H | c-Pr(1-Me) | C(=O)Me | Cl | C(=O)Me | O |
| D-17801 | H | single bond | Me | c-Pr(1-Me) | C(=O)Me | Me | C(=O)Me | O |
| D-17802 | Me | single bond | H | c-Pr(1-Me) | C(=O)Me | Me | C(=O)Me | O |
| D-17803 | Me(R) | single bond | H | c-Pr(1-Me) | C(=O)Me | Me | C(=O)Me | O |
| D-17804 | Me(S) | single bond | H | c-Pr(1-Me) | C(=O)Me | Me | C(=O)Me | O |
| D-17805 | H | single bond | Me | c-Pr(1-$CH_2$OH) | C(=O)Me | Cl | C(=O)Me | O |
| D-17806 | Me | single bond | H | c-Pr(1-$CH_2$OH) | C(=O)Me | Cl | C(=O)Me | O |
| D-17807 | Me(R) | single bond | H | c-Pr(1-$CH_2$OH) | C(=O)Me | Cl | C(=O)Me | O |
| D-17808 | Me(S) | single bond | H | c-Pr(1-$CH_2$OH) | C(=O)Me | Cl | C(=O)Me | O |
| D-17809 | H | single bond | Me | c-Pr(1-$CH_2$OH) | C(=O)Me | Me | C(=O)Me | O |
| D-17810 | Me | single bond | H | c-Pr(1-$CH_2$OH) | C(=O)Me | Me | C(=O)Me | O |
| D-17811 | Me(R) | single bond | H | c-Pr(1-$CH_2$OH) | C(=O)Me | Me | C(=O)Me | O |
| D-17812 | Me(S) | single bond | H | c-Pr(1-$CH_2$OH) | C(=O)Me | Me | C(=O)Me | O |
| D-17813 | H | single bond | Me | c-Pr[1-$CH_2$OS(=O)$_2$Me] | C(=O)Me | Cl | C(=O)Me | O |
| D-17814 | Me | single bond | H | c-Pr[1-$CH_2$OS(=O)$_2$Me] | C(=O)Me | Cl | C(=O)Me | O |
| D-17815 | Me(R) | single bond | H | c-Pr[1-$CH_2$OS(=O)$_2$Me] | C(=O)Me | Cl | C(=O)Me | O |
| D-17816 | Me(S) | single bond | H | c-Pr[1-$CH_2$OS(=O)$_2$Me] | C(=O)Me | Cl | C(=O)Me | O |
| D-17817 | H | single bond | Me | c-Pr[1-$CH_2$OS(=O)$_2$Me] | C(=O)Me | Me | C(=O)Me | O |
| D-17818 | Me | single bond | H | c-Pr[1-$CH_2$OS(=O)$_2$Me] | C(=O)Me | Me | C(=O)Me | O |
| D-17819 | Me(R) | single bond | H | c-Pr[1-$CH_2$OS(=O)$_2$Me] | C(=O)Me | Me | C(=O)Me | O |
| D-17820 | Me(S) | single bond | H | c-Pr[1-$CH_2$OS(=O)$_2$Me] | C(=O)Me | Me | C(=O)Me | O |
| D-17821 | H | single bond | Me | c-Pr(1-$CH_2$OMe) | C(=O)Me | Cl | C(=O)Me | O |
| D-17822 | Me | single bond | H | c-Pr(1-$CH_2$OMe) | C(=O)Me | Cl | C(=O)Me | O |
| D-17823 | Me(R) | single bond | H | c-Pr(1-$CH_2$OMe) | C(=O)Me | Cl | C(=O)Me | O |
| D-17824 | Me(S) | single bond | H | c-Pr(1-$CH_2$OMe) | C(=O)Me | Cl | C(=O)Me | O |
| D-17825 | H | single bond | Me | c-Pr(1-$CH_2$OMe) | C(=O)Me | Me | C(=O)Me | O |
| D-17826 | Me | single bond | H | c-Pr(1-$CH_2$OMe) | C(=O)Me | Me | C(=O)Me | O |
| D-17827 | Me(R) | single bond | H | c-Pr(1-$CH_2$OMe) | C(=O)Me | Me | C(=O)Me | O |
| D-17828 | Me(S) | single bond | H | c-Pr(1-$CH_2$OMe) | C(=O)Me | Me | C(=O)Me | O |
| D-17829 | H | single bond | Me | c-Pr(1-$CH_2$OCN) | C(=O)Me | Cl | C(=O)Me | O |
| D-17830 | Me | single bond | H | c-Pr(1-$CH_2$OCN) | C(=O)Me | Cl | C(=O)Me | O |
| D-17831 | Me(R) | single bond | H | c-Pr(1-$CH_2$OCN) | C(=O)Me | Cl | C(=O)Me | O |
| D-17832 | Me(S) | single bond | H | c-Pr(1-$CH_2$OCN) | C(=O)Me | Cl | C(=O)Me | O |
| D-17833 | H | single bond | Me | c-Pr(1-$CH_2$OCN) | C(=O)Me | Me | C(=O)Me | O |
| D-17834 | Me | single bond | H | c-Pr(1-$CH_2$OCN) | C(=O)Me | Me | C(=O)Me | O |
| D-17835 | Me(R) | single bond | H | c-Pr(1-$CH_2$OCN) | C(=O)Me | Me | C(=O)Me | O |
| D-17836 | Me(S) | single bond | H | c-Pr(1-$CH_2$OCN) | C(=O)Me | Me | C(=O)Me | O |
| D-17837 | H | single bond | Me | c-Pr(1-$CH_2$SMe) | C(=O)Me | Cl | C(=O)Me | O |
| D-17838 | Me | single bond | H | c-Pr(1-$CH_2$SMe) | C(=O)Me | Cl | C(=O)Me | O |

TABLE 1052

| Compound Number | Y | W | Z | $R^1$ | $R^2$ | $R^3$ | $R^{10}$ | A |
|---|---|---|---|---|---|---|---|---|
| D-17839 | Me(R) | single bond | H | c-Pr(1-$CH_2$SMe) | C(═O)Me | Cl | C(═O)Me | O |
| D-17840 | Me(S) | single bond | H | c-Pr(1-$CH_2$SMe) | C(═O)Me | Cl | C(═O)Me | O |
| D-17841 | H | single bond | Me | c-Pr(1-$CH_2$SMe) | C(═O)Me | Me | C(═O)Me | O |
| D-17842 | Me | single bond | H | c-Pr(1-$CH_2$SMe) | C(═O)Me | Me | C(═O)Me | O |
| D-17843 | Me(R) | single bond | H | c-Pr(1-$CH_2$SMe) | C(═O)Me | Me | C(═O)Me | O |
| D-17844 | Me(S) | single bond | H | c-Pr(1-$CH_2$SMe) | C(═O)Me | Me | C(═O)Me | O |
| D-17845 | H | single bond | Me | c-Pr[1-$CH_2$S(═O)Me] | C(═O)Me | Cl | C(═O)Me | O |
| D-17846 | Me | single bond | H | c-Pr[1-$CH_2$S(═O)Me] | C(═O)Me | Cl | C(═O)Me | O |
| D-17847 | Me(R) | single bond | H | c-Pr[1-$CH_2$S(═O)Me] | C(═O)Me | Cl | C(═O)Me | O |
| D-17848 | Me(S) | single bond | H | c-Pr[1-$CH_2$S(═O)Me] | C(═O)Me | Cl | C(═O)Me | O |
| D-17849 | H | single bond | Me | c-Pr[1-$CH_2$S(═O)Me] | C(═O)Me | Me | C(═O)Me | O |
| D-17850 | Me | single bond | H | c-Pr[1-$CH_2$S(═O)Me] | C(═O)Me | Me | C(═O)Me | O |
| D-17851 | Me(R) | single bond | H | c-Pr[1-$CH_2$S(═O)Me] | C(═O)Me | Me | C(═O)Me | O |
| D-17852 | Me(S) | single bond | H | c-Pr[1-$CH_2$S(═O)Me] | C(═O)Me | Me | C(═O)Me | O |
| D-17853 | H | single bond | Me | c-Pr[1-$CH_2$S(═O)$_2$Me] | C(═O)Me | Cl | C(═O)Me | O |
| D-17854 | Me | single bond | H | c-Pr[1-$CH_2$S(═O)$_2$Me] | C(═O)Me | Cl | C(═O)Me | O |
| D-17855 | Me(R) | single bond | H | c-Pr[1-$CH_2$S(═O)$_2$Me] | C(═O)Me | Cl | C(═O)Me | O |
| D-17856 | Me(S) | single bond | H | c-Pr[1-$CH_2$S(═O)$_2$Me] | C(═O)Me | Cl | C(═O)Me | O |
| D-17857 | H | single bond | Me | c-Pr[1-$CH_2$S(═O)$_2$Me] | C(═O)Me | Me | C(═O)Me | O |
| D-17858 | Me | single bond | H | c-Pr[1-$CH_2$S(═O)$_2$Me] | C(═O)Me | Me | C(═O)Me | O |
| D-17859 | Me(R) | single bond | H | c-Pr[1-$CH_2$S(═O)$_2$Me] | C(═O)Me | Me | C(═O)Me | O |
| D-17860 | Me(S) | single bond | H | c-Pr[1-$CH_2$S(═O)$_2$Me] | C(═O)Me | Me | C(═O)Me | O |
| D-17861 | H | single bond | Me | c-Pr(1-$CH_2$F) | C(═O)Me | Cl | C(═O)Me | O |
| D-17862 | Me | single bond | H | c-Pr(1-$CH_2$F) | C(═O)Me | Cl | C(═O)Me | O |
| D-17863 | Me(R) | single bond | H | c-Pr(1-$CH_2$F) | C(═O)Me | Cl | C(═O)Me | O |
| D-17864 | Me(S) | single bond | H | c-Pr(1-$CH_2$F) | C(═O)Me | Cl | C(═O)Me | O |
| D-17865 | H | single bond | Me | c-Pr(1-$CH_2$F) | C(═O)Me | Me | C(═O)Me | O |
| D-17866 | Me | single bond | H | c-Pr(1-$CH_2$F) | C(═O)Me | Me | C(═O)Me | O |
| D-17867 | Me(R) | single bond | H | c-Pr(1-$CH_2$F) | C(═O)Me | Me | C(═O)Me | O |
| D-17868 | Me(S) | single bond | H | c-Pr(1-$CH_2$F) | C(═O)Me | Me | C(═O)Me | O |
| D-17869 | H | single bond | Me | c-Pr(1-$CHF_2$) | C(═O)Me | Cl | C(═O)Me | O |
| D-17870 | Me | single bond | H | c-Pr(1-$CHF_2$) | C(═O)Me | Cl | C(═O)Me | O |
| D-17871 | Me(R) | single bond | H | c-Pr(1-$CHF_2$) | C(═O)Me | Cl | C(═O)Me | O |
| D-17872 | Me(S) | single bond | H | c-Pr(1-$CHF_2$) | C(═O)Me | Cl | C(═O)Me | O |
| D-17873 | H | single bond | Me | c-Pr(1-$CHF_2$) | C(═O)Me | Me | C(═O)Me | O |
| D-17874 | Me | single bond | H | c-Pr(1-$CHF_2$) | C(═O)Me | Me | C(═O)Me | O |
| D-17875 | Me(R) | single bond | H | c-Pr(1-$CHF_2$) | C(═O)Me | Me | C(═O)Me | O |
| D-17876 | Me(S) | single bond | H | c-Pr(1-$CHF_2$) | C(═O)Me | Me | C(═O)Me | O |
| D-17877 | H | single bond | Me | c-Pr(1-$CF_3$) | C(═O)Me | Cl | C(═O)Me | O |
| D-17878 | Me | single bond | H | c-Pr(1-$CF_3$) | C(═O)Me | Cl | C(═O)Me | O |
| D-17879 | Me(R) | single bond | H | c-Pr(1-$CF_3$) | C(═O)Me | Cl | C(═O)Me | O |
| D-17880 | Me(S) | single bond | H | c-Pr(1-$CF_3$) | C(═O)Me | Cl | C(═O)Me | O |
| D-17881 | H | single bond | Me | c-Pr(1-$CF_3$) | C(═O)Me | Me | C(═O)Me | O |
| D-17882 | Me | single bond | H | c-Pr(1-$CF_3$) | C(═O)Me | Me | C(═O)Me | O |

TABLE 1053

| Compound Number | Y | W | Z | $R^1$ | $R^2$ | $R^3$ | $R^{10}$ | A |
|---|---|---|---|---|---|---|---|---|
| D-17883 | Me(R) | single bond | H | c-Pr(1-$CF_3$) | C(═O)Me | Me | C(═O)Me | O |
| D-17884 | Me(S) | single bond | H | c-Pr(1-$CF_3$) | C(═O)Me | Me | C(═O)Me | O |
| D-17885 | H | single bond | Me | c-Pr(1-C≡CH) | C(═O)Me | Cl | C(═O)Me | O |
| D-17886 | Me | single bond | H | c-Pr(1-C≡CH) | C(═O)Me | Cl | C(═O)Me | O |
| D-17887 | Me(R) | single bond | H | c-Pr(1-C≡CH) | C(═O)Me | Cl | C(═O)Me | O |
| D-17888 | Me(S) | single bond | H | c-Pr(1-C≡CH) | C(═O)Me | Cl | C(═O)Me | O |
| D-17889 | H | single bond | Me | c-Pr(1-C≡CH) | C(═O)Me | Me | C(═O)Me | O |
| D-17890 | Me | single bond | H | c-Pr(1-C≡CH) | C(═O)Me | Me | C(═O)Me | O |
| D-17891 | Me(R) | single bond | H | c-Pr(1-C≡CH) | C(═O)Me | Me | C(═O)Me | O |
| D-17892 | Me(S) | single bond | H | c-Pr(1-C≡CH) | C(═O)Me | Me | C(═O)Me | O |
| D-17893 | H | single bond | Me | c-Pr[1-C(═O)OEt] | C(═O)Me | Cl | C(═O)Me | O |
| D-17894 | Me | single bond | H | c-Pr[1-C(═O)OEt] | C(═O)Me | Cl | C(═O)Me | O |
| D-17895 | Me(R) | single bond | H | c-Pr[1-C(═O)OEt] | C(═O)Me | Cl | C(═O)Me | O |
| D-17896 | Me(S) | single bond | H | c-Pr[1-C(═O)OEt] | C(═O)Me | Cl | C(═O)Me | O |
| D-17897 | H | single bond | Me | c-Pr[1-C(═O)OEt] | C(═O)Me | Me | C(═O)Me | O |
| D-17898 | Me | single bond | H | c-Pr[1-C(═O)OEt] | C(═O)Me | Me | C(═O)Me | O |
| D-17899 | Me(R) | single bond | H | c-Pr[1-C(═O)OEt] | C(═O)Me | Me | C(═O)Me | O |
| D-17900 | Me(S) | single bond | H | c-Pr[1-C(═O)OEt] | C(═O)Me | Me | C(═O)Me | O |
| D-17901 | H | single bond | Me | c-Pr[1-C(═O)OH] | C(═O)Me | Cl | C(═O)Me | O |
| D-17902 | Me | single bond | H | c-Pr[1-C(═O)OH] | C(═O)Me | Cl | C(═O)Me | O |
| D-17903 | Me(R) | single bond | H | c-Pr[1-C(═O)OH] | C(═O)Me | Cl | C(═O)Me | O |
| D-17904 | Me(S) | single bond | H | c-Pr[1-C(═O)OH] | C(═O)Me | Cl | C(═O)Me | O |
| D-17905 | H | single bond | Me | c-Pr[1-C(═O)OH] | C(═O)Me | Me | C(═O)Me | O |

TABLE 1053-continued

| Compound Number | Y | W | Z | $R^1$ | $R^2$ | $R^3$ | $R^{10}$ | A |
|---|---|---|---|---|---|---|---|---|
| D-17906 | Me | single bond | H | c-Pr[1-C(=O)OH] | C(=O)Me | Me | C(=O)Me | O |
| D-17907 | Me(R) | single bond | H | c-Pr[1-C(=O)OH] | C(=O)Me | Me | C(=O)Me | O |
| D-17908 | Me(S) | single bond | H | c-Pr[1-C(=O)OH] | C(=O)Me | Me | C(=O)Me | O |
| D-17909 | H | single bond | Me | c-Pr[1-C(=O)$NH_2$] | C(=O)Me | Cl | C(=O)Me | O |
| D-17910 | Me | single bond | H | c-Pr[1-C(=O)$NH_2$] | C(=O)Me | Cl | C(=O)Me | O |
| D-17911 | Me(R) | single bond | H | c-Pr[1-C(=O)$NH_2$] | C(=O)Me | Cl | C(=O)Me | O |
| D-17912 | Me(S) | single bond | H | c-Pr[1-C(=O)$NH_2$] | C(=O)Me | Cl | C(=O)Me | O |
| D-17913 | H | single bond | Me | c-Pr[1-C(=O)$NH_2$] | C(=O)Me | Me | C(=O)Me | O |
| D-17914 | Me | single bond | H | c-Pr[1-C(=O)$NH_2$] | C(=O)Me | Me | C(=O)Me | O |
| D-17915 | Me(R) | single bond | H | c-Pr[1-C(=O)$NH_2$] | C(=O)Me | Me | C(=O)Me | O |
| D-17916 | Me(S) | single bond | H | c-Pr[1-C(=O)$NH_2$] | C(=O)Me | Me | C(=O)Me | O |
| D-17917 | H | single bond | Me | c-Pr(1-OMe) | C(=O)Me | Cl | C(=O)Me | O |
| D-17918 | Me | single bond | H | c-Pr(1-OMe) | C(=O)Me | Cl | C(=O)Me | O |
| D-17919 | Me(R) | single bond | H | c-Pr(1-OMe) | C(=O)Me | Cl | C(=O)Me | O |
| D-17920 | Me(S) | single bond | H | c-Pr(1-OMe) | C(=O)Me | Cl | C(=O)Me | O |
| D-17921 | H | single bond | Me | c-Pr(1-OMe) | C(=O)Me | Me | C(=O)Me | O |
| D-17922 | Me | single bond | H | c-Pr(1-OMe) | C(=O)Me | Me | C(=O)Me | O |
| D-17923 | Me(R) | single bond | H | c-Pr(1-OMe) | C(=O)Me | Me | C(=O)Me | O |
| D-17924 | Me(S) | single bond | H | c-Pr(1-OMe) | C(=O)Me | Me | C(=O)Me | O |
| D-17925 | H | single bond | Me | c-Pr(1-SMe) | C(=O)Me | Cl | C(=O)Me | O |
| D-17926 | Me | single bond | H | c-Pr(1-SMe) | C(=O)Me | Cl | C(=O)Me | O |

TABLE 1054

| Compound Number | Y | W | Z | $R^1$ | $R^2$ | $R^3$ | $R^{10}$ | A |
|---|---|---|---|---|---|---|---|---|
| D-17927 | Me(R) | single bond | H | c-Pr(1-SMe) | C(=O)Me | Cl | C(=O)Me | O |
| D-17928 | Me(S) | single bond | H | c-Pr(1-SMe) | C(=O)Me | Cl | C(=O)Me | O |
| D-17929 | H | single bond | Me | c-Pr(1-SMe) | C(=O)Me | Me | C(=O)Me | O |
| D-17930 | Me | single bond | H | c-Pr(1-SMe) | C(=O)Me | Me | C(=O)Me | O |
| D-17931 | Me(R) | single bond | H | c-Pr(1-SMe) | C(=O)Me | Me | C(=O)Me | O |
| D-17932 | Me(S) | single bond | H | c-Pr(1-SMe) | C(=O)Me | Me | C(=O)Me | O |
| D-17933 | H | single bond | Me | c-Pr[1-S(=O)Me] | C(=O)Me | Cl | C(=O)Me | O |
| D-17934 | Me | single bond | H | c-Pr[1-S(=O)Me] | C(=O)Me | Cl | C(=O)Me | O |
| D-17935 | Me(R) | single bond | H | c-Pr[1-S(=O)Me] | C(=O)Me | Cl | C(=O)Me | O |
| D-17936 | Me(S) | single bond | H | c-Pr[1-S(=O)Me] | C(=O)Me | Cl | C(=O)Me | O |
| D-17937 | H | single bond | Me | c-Pr[1-S(=O)Me] | C(=O)Me | Me | C(=O)Me | O |
| D-17938 | Me | single bond | H | c-Pr[1-S(=O)Me] | C(=O)Me | Me | C(=O)Me | O |
| D-17939 | Me(R) | single bond | H | c-Pr[1-S(=O)Me] | C(=O)Me | Me | C(=O)Me | O |
| D-17940 | Me(S) | single bond | H | c-Pr[1-S(=O)Me] | C(=O)Me | Me | C(=O)Me | O |
| D-17941 | H | single bond | Me | c-Pr[1-S(=O)$_2$Me] | C(=O)Me | Cl | C(=O)Me | O |
| D-17942 | Me | single bond | H | c-Pr[1-S(=O)$_2$Me] | C(=O)Me | Cl | C(=O)Me | O |
| D-17943 | Me(R) | single bond | H | c-Pr[1-S(=O)$_2$Me] | C(=O)Me | Cl | C(=O)Me | O |
| D-17944 | Me(S) | single bond | H | c-Pr[1-S(=O)$_2$Me] | C(=O)Me | Cl | C(=O)Me | O |
| D-17945 | H | single bond | Me | c-Pr[1-S(=O)$_2$Me] | C(=O)Me | Me | C(=O)Me | O |
| D-17946 | Me | single bond | H | c-Pr[1-S(=O)$_2$Me] | C(=O)Me | Me | C(=O)Me | O |
| D-17947 | Me(R) | single bond | H | c-Pr[1-S(=O)$_2$Me] | C(=O)Me | Me | C(=O)Me | O |
| D-17948 | Me(S) | single bond | H | c-Pr[1-S(=O)$_2$Me] | C(=O)Me | Me | C(=O)Me | O |
| D-17949 | H | single bond | Me | c-Pr[1-S(=O)$_2$$CHF_2$] | C(=O)Me | Cl | C(=O)Me | O |
| D-17950 | Me | single bond | H | c-Pr[1-S(=O)$_2$$CHF_2$] | C(=O)Me | Cl | C(=O)Me | O |
| D-17951 | Me(R) | single bond | H | c-Pr[1-S(=O)$_2$$CHF_2$] | C(=O)Me | Cl | C(=O)Me | O |
| D-17952 | Me(S) | single bond | H | c-Pr[1-S(=O)$_2$$CHF_2$] | C(=O)Me | Cl | C(=O)Me | O |
| D-17953 | H | single bond | Me | c-Pr[1-S(=O)$_2$$CHF_2$] | C(=O)Me | Me | C(=O)Me | O |
| D-17954 | Me | single bond | H | c-Pr[1-S(=O)$_2$$CHF_2$] | C(=O)Me | Me | C(=O)Me | O |
| D-17955 | Me(R) | single bond | H | c-Pr[1-S(=O)$_2$$CHF_2$] | C(=O)Me | Me | C(=O)Me | O |
| D-17956 | Me(S) | single bond | H | c-Pr[1-S(=O)$_2$$CHF_2$] | C(=O)Me | Me | C(=O)Me | O |
| D-17957 | H | single bond | Me | c-Pr[1-S(=O)$_2$$CF_3$] | C(=O)Me | Cl | C(=O)Me | O |
| D-17958 | Me | single bond | H | c-Pr[1-S(=O)$_2$$CF_3$] | C(=O)Me | Cl | C(=O)Me | O |
| D-17959 | Me(R) | single bond | H | c-Pr[1-S(=O)$_2$$CF_3$] | C(=O)Me | Cl | C(=O)Me | O |
| D-17960 | Me(S) | single bond | H | c-Pr[1-S(=O)$_2$$CF_3$] | C(=O)Me | Cl | C(=O)Me | O |
| D-17961 | H | single bond | Me | c-Pr[1-S(=O)$_2$$CF_3$] | C(=O)Me | Me | C(=O)Me | O |
| D-17962 | Me | single bond | H | c-Pr[1-S(=O)$_2$$CF_3$] | C(=O)Me | Me | C(=O)Me | O |
| D-17963 | Me(R) | single bond | H | c-Pr[1-S(=O)$_2$$CF_3$] | C(=O)Me | Me | C(=O)Me | O |
| D-17964 | Me(S) | single bond | H | c-Pr[1-S(=O)$_2$$CF_3$] | C(=O)Me | Me | C(=O)Me | O |
| D-17965 | H | single bond | Me | c-Pr[1-(5,6-dihydro-1,4,2-dioxazin-3-yl)] | C(=O)Me | Cl | C(=O)Me | O |
| D-17966 | Me | single bond | H | c-Pr[1-(5,6-dihydro-1,4,2-dioxazin-3-yl)] | C(=O)Me | Cl | C(=O)Me | O |
| D-17967 | Me(R) | single bond | H | c-Pr[1-(5,6-dihydro-1,4,2-dioxazin-3-yl)] | C(=O)Me | Cl | C(=O)Me | O |
| D-17968 | Me(S) | single bond | H | c-Pr[1-(5,6-dihydro-1,4,2-dioxazin-3-yl)] | C(=O)Me | Cl | C(=O)Me | O |
| D-17969 | H | single bond | Me | c-Pr[1-(5,6-dihydro-1,4,2-dioxazin-3-yl)] | C(=O)Me | Me | C(=O)Me | O |
| D-17970 | Me | single bond | H | c-Pr[1-(5,6-dihydro-1,4,2-dioxazin-3-yl)] | C(=O)Me | Me | C(=O)Me | O |

TABLE 1055

| Compound Number | Y | W | Z | $R^1$ | $R^2$ | $R^3$ | $R^{10}$ | A |
|---|---|---|---|---|---|---|---|---|
| D-17971 | Me(R) | single bond | H | c-Pr[1-(5,6-dihydro-1,4,2-dioxazin-3-yl)] | C(=O)Me | Me | C(=O)Me | O |
| D-17972 | Me(S) | single bond | H | c-Pr[1-(5,6-dihydro-1,4,2-dioxazin-3-yl)] | C(=O)Me | Me | C(=O)Me | O |
| D-17973 | H | single bond | Me | c-Pr[1-(5-hydroxy-1,3,4-oxadiazol-2-yl)] | C(=O)Me | Cl | C(=O)Me | O |
| D-17974 | Me | single bond | H | c-Pr[1-(5-hydroxy-1,3,4-oxadiazol-2-yl)] | C(=O)Me | Cl | C(=O)Me | O |
| D-17975 | Me(R) | single bond | H | c-Pr[1-(5-hydroxy-1,3,4-oxadiazol-2-yl)] | C(=O)Me | Cl | C(=O)Me | O |
| D-17976 | Me(S) | single bond | H | c-Pr[1-(5-hydroxy-1,3,4-oxadiazol-2-yl)] | C(=O)Me | Cl | C(=O)Me | O |
| D-17977 | H | single bond | Me | c-Pr[1-(5-hydroxy-1,3,4-oxadiazol-2-yl)] | C(=O)Me | Me | C(=O)Me | O |
| D-17978 | Me | single bond | H | c-Pr[1-(5-hydroxy-1,3,4-oxadiazol-2-yl)] | C(=O)Me | Me | C(=O)Me | O |
| D-17979 | Me(R) | single bond | H | c-Pr[1-(5-hydroxy-1,3,4-oxadiazol-2-yl)] | C(=O)Me | Me | C(=O)Me | O |
| D-17980 | Me(S) | single bond | H | c-Pr[1-(5-hydroxy-1,3,4-oxadiazol-2-yl)] | C(=O)Me | Me | C(=O)Me | O |
| D-17981 | H | single bond | Me | c-Pr[1-(pyrimidin-2-yl)] | C(=O)Me | Cl | C(=O)Me | O |
| D-17982 | Me | single bond | H | c-Pr[1-(pyrimidin-2-yl)] | C(=O)Me | Cl | C(=O)Me | O |
| D-17983 | Me(R) | single bond | H | c-Pr[1-(pyrimidin-2-yl)] | C(=O)Me | Cl | C(=O)Me | O |
| D-17984 | Me(S) | single bond | H | c-Pr[1-(pyrimidin-2-yl)] | C(=O)Me | Cl | C(=O)Me | O |
| D-17985 | H | single bond | Me | c-Pr[1-(pyrimidin-2-yl)] | C(=O)Me | Me | C(=O)Me | O |
| D-17986 | Me | single bond | H | c-Pr[1-(pyrimidin-2-yl)] | C(=O)Me | Me | C(=O)Me | O |
| D-17987 | Me(R) | single bond | H | c-Pr[1-(pyrimidin-2-yl)] | C(=O)Me | Me | C(=O)Me | O |
| D-17988 | Me(S) | single bond | H | c-Pr[1-(pyrimidin-2-yl)] | C(=O)Me | Me | C(=O)Me | O |
| D-17989 | H | single bond | Me | t-Bu | C(=O)Me | Cl | C(=O)Me | O |
| D-17990 | Me | single bond | H | t-Bu | C(=O)Me | Cl | C(=O)Me | O |
| D-17991 | Me(R) | single bond | H | t-Bu | C(=O)Me | Cl | C(=O)Me | O |
| D-17992 | Me(S) | single bond | H | t-Bu | C(=O)Me | Cl | C(=O)Me | O |
| D-17993 | H | single bond | Me | t-Bu | C(=O)Me | Me | C(=O)Me | O |
| D-17994 | Me | single bond | H | t-Bu | C(=O)Me | Me | C(=O)Me | O |
| D-17995 | Me(R) | single bond | H | t-Bu | C(=O)Me | Me | C(=O)Me | O |
| D-17996 | Me(S) | single bond | H | t-Bu | C(=O)Me | Me | C(=O)Me | O |
| D-17997 | H | single bond | Me | c-Bu | C(=O)Me | Cl | C(=O)Me | O |
| D-17998 | Me | single bond | H | c-Bu | C(=O)Me | Cl | C(=O)Me | O |
| D-17999 | Me(R) | single bond | H | c-Bu | C(=O)Me | Cl | C(=O)Me | O |
| D-18000 | Me(S) | single bond | H | c-Bu | C(=O)Me | Cl | C(=O)Me | O |
| D-18001 | H | single bond | Me | c-Bu | C(=O)Me | Me | C(=O)Me | O |
| D-18002 | Me | single bond | H | c-Bu | C(=O)Me | Me | C(=O)Me | O |
| D-18003 | Me(R) | single bond | H | c-Bu | C(=O)Me | Me | C(=O)Me | O |
| D-18004 | Me(S) | single bond | H | c-Bu | C(=O)Me | Me | C(=O)Me | O |
| D-18005 | H | single bond | Me | c-Bu(1-CN) | C(=O)Me | Cl | C(=O)Me | O |
| D-18006 | Me | single bond | H | c-Bu(1-CN) | C(=O)Me | Cl | C(=O)Me | O |
| D-18007 | Me(R) | single bond | H | c-Bu(1-CN) | C(=O)Me | Cl | C(=O)Me | O |
| D-18008 | Me(S) | single bond | H | c-Bu(1-CN) | C(=O)Me | Cl | C(=O)Me | O |
| D-18009 | H | single bond | Me | c-Bu(1-CN) | C(=O)Me | Me | C(=O)Me | O |
| D-18010 | Me | single bond | H | c-Bu(1-CN) | C(=O)Me | Me | C(=O)Me | O |
| D-18011 | Me(R) | single bond | H | c-Bu(1-CN) | C(=O)Me | Me | C(=O)Me | O |
| D-18012 | Me(S) | single bond | H | c-Bu(1-CN) | C(=O)Me | Me | C(=O)Me | O |
| D-18013 | H | single bond | Me | c-Bu(3,3-$F_2$) | C(=O)Me | Cl | C(=O)Me | O |
| D-18014 | Me | single bond | H | c-Bu(3,3-$F_2$) | C(=O)Me | Cl | C(=O)Me | O |

TABLE 1056

| Compound Number | Y | W | Z | $R^1$ | $R^2$ | $R^3$ | $R^{10}$ | A |
|---|---|---|---|---|---|---|---|---|
| D-18015 | Me(R) | single bond | H | c-Bu(3,3-$F_2$) | C(=O)Me | Cl | C(=O)Me | O |
| D-18016 | Me(S) | single bond | H | c-Bu(3,3-$F_2$) | C(=O)Me | Cl | C(=O)Me | O |
| D-18017 | H | single bond | Me | c-Bu(3,3-$F_2$) | C(=O)Me | Me | C(=O)Me | O |
| D-18018 | Me | single bond | H | c-Bu(3,3-$F_2$) | C(=O)Me | Me | C(=O)Me | O |
| D-18019 | Me(R) | single bond | H | c-Bu(3,3-$F_2$) | C(=O)Me | Me | C(=O)Me | O |
| D-18020 | Me(S) | single bond | H | c-Bu(3,3-$F_2$) | C(=O)Me | Me | C(=O)Me | O |
| D-18021 | H | single bond | Me | oxetan-3-yl | C(=O)Me | Cl | C(=O)Me | O |
| D-18022 | Me | single bond | H | oxetan-3-yl | C(=O)Me | Cl | C(=O)Me | O |
| D-18023 | Me(R) | single bond | H | oxetan-3-yl | C(=O)Me | Cl | C(=O)Me | O |
| D-18024 | Me(S) | single bond | H | oxetan-3-yl | C(=O)Me | Cl | C(=O)Me | O |
| D-18025 | H | single bond | Me | oxetan-3-yl | C(=O)Me | Me | C(=O)Me | O |
| D-18026 | Me | single bond | H | oxetan-3-yl | C(=O)Me | Me | C(=O)Me | O |
| D-18027 | Me(R) | single bond | H | oxetan-3-yl | C(=O)Me | Me | C(=O)Me | O |
| D-18028 | Me(S) | single bond | H | oxetan-3-yl | C(=O)Me | Me | C(=O)Me | O |
| D-18029 | H | single bond | Me | oxetan(3-CN)-3-yl | C(=O)Me | Cl | C(=O)Me | O |
| D-18030 | Me | single bond | H | oxetan(3-CN)-3-yl | C(=O)Me | Cl | C(=O)Me | O |
| D-18031 | Me(R) | single bond | H | oxetan(3-CN)-3-yl | C(=O)Me | Cl | C(=O)Me | O |
| D-18032 | Me(S) | single bond | H | oxetan(3-CN)-3-yl | C(=O)Me | Cl | C(=O)Me | O |
| D-18033 | H | single bond | Me | oxetan(3-CN)-3-yl | C(=O)Me | Me | C(=O)Me | O |
| D-18034 | Me | single bond | H | oxetan(3-CN)-3-yl | C(=O)Me | Me | C(=O)Me | O |
| D-18035 | Me(R) | single bond | H | oxetan(3-CN)-3-yl | C(=O)Me | Me | C(=O)Me | O |

TABLE 1056-continued

| Compound Number | Y | W | Z | $R^1$ | $R^2$ | $R^3$ | $R^{10}$ | A |
|---|---|---|---|---|---|---|---|---|
| D-18036 | Me(S) | single bond | H | oxetan(3-CN)-3-yl | C(═O)Me | Me | C(═O)Me | O |
| D-18037 | H | single bond | Me | azetidin[1-C(═O)Me]-3-yl | C(═O)Me | Cl | C(═O)Me | O |
| D-18038 | Me | single bond | H | azetidin[1-C(═O)Me]-3-yl | C(═O)Me | Cl | C(═O)Me | O |
| D-18039 | Me(R) | single bond | H | azetidin[1-C(═O)Me]-3-yl | C(═O)Me | Cl | C(═O)Me | O |
| D-18040 | Me(S) | single bond | H | azetidin[1-C(═O)Me]-3-yl | C(═O)Me | Cl | C(═O)Me | O |
| D-18041 | H | single bond | Me | azetidin[1-C(═O)Me]-3-yl | C(═O)Me | Me | C(═O)Me | O |
| D-18042 | Me | single bond | H | azetidin[1-C(═O)Me]-3-yl | C(═O)Me | Me | C(═O)Me | O |
| D-18043 | Me(R) | single bond | H | azetidin[1-C(═O)Me]-3-yl | C(═O)Me | Me | C(═O)Me | O |
| D-18044 | Me(S) | single bond | H | azetidin[1-C(═O)Me]-3-yl | C(═O)Me | Me | C(═O)Me | O |
| D-18045 | H | single bond | Me | azetidin[1-S(═O)$_2$Me]-3-yl | C(═O)Me | Cl | C(═O)Me | O |
| D-18046 | Me | single bond | H | azetidin[1-S(═O)$_2$Me]-3-yl | C(═O)Me | Cl | C(═O)Me | O |
| D-18047 | Me(R) | single bond | H | azetidin[1-S(═O)$_2$Me]-3-yl | C(═O)Me | Cl | C(═O)Me | O |
| D-18048 | Me(S) | single bond | H | azetidin[1-S(═O)$_2$Me]-3-yl | C(═O)Me | Cl | C(═O)Me | O |
| D-18049 | H | single bond | Me | azetidin[1-S(═O)$_2$Me]-3-yl | C(═O)Me | Me | C(═O)Me | O |
| D-18050 | Me | single bond | H | azetidin[1-S(═O)$_2$Me]-3-yl | C(═O)Me | Me | C(═O)Me | O |
| D-18051 | Me(R) | single bond | H | azetidin[1-S(═O)$_2$Me]-3-yl | C(═O)Me | Me | C(═O)Me | O |
| D-18052 | Me(S) | single bond | H | azetidin[1-S(═O)$_2$Me]-3-yl | C(═O)Me | Me | C(═O)Me | O |
| D-18053 | H | single bond | Me | azetidin[1-S(═O)$_2$CHF$_2$]-3-yl | C(═O)Me | Cl | C(═O)Me | O |
| D-18054 | Me | single bond | H | azetidin[1-S(═O)$_2$CHF$_2$]-3-yl | C(═O)Me | Cl | C(═O)Me | O |
| D-18055 | Me(R) | single bond | H | azetidin[1-S(═O)$_2$CHF$_2$]-3-yl | C(═O)Me | Cl | C(═O)Me | O |
| D-18056 | Me(S) | single bond | H | azetidin[1-S(═O)$_2$CHF$_2$]-3-yl | C(═O)Me | Cl | C(═O)Me | O |
| D-18057 | H | single bond | Me | azetidin[1-S(═O)$_2$CHF$_2$]-3-yl | C(═O)Me | Me | C(═O)Me | O |
| D-18058 | Me | single bond | H | azetidin[1-S(═O)$_2$CHF$_2$]-3-yl | C(═O)Me | Me | C(═O)Me | O |

TABLE 1057

| Compound Number | Y | W | Z | $R^1$ | $R^2$ | $R^3$ | $R^{10}$ | A |
|---|---|---|---|---|---|---|---|---|
| D-18059 | Me(R) | single bond | H | azetidin[1-S(═O)$_2$CHF$_2$]-3-yl | C(═O)Me | Me | C(═O)Me | O |
| D-18060 | Me(S) | single bond | H | azetidin[1-S(═O)$_2$CHF$_2$]-3-yl | C(═O)Me | Me | C(═O)Me | O |
| D-18061 | H | single bond | Me | c-Pen | C(═O)Me | Cl | C(═O)Me | O |
| D-18062 | Me | single bond | H | c-Pen | C(═O)Me | Cl | C(═O)Me | O |
| D-18063 | Me(R) | single bond | H | c-Pen | C(═O)Me | Cl | C(═O)Me | O |
| D-18064 | Me(S) | single bond | H | c-Pen | C(═O)Me | Cl | C(═O)Me | O |
| D-18065 | H | single bond | Me | c-Pen | C(═O)Me | Me | C(═O)Me | O |
| D-18066 | Me | single bond | H | c-Pen | C(═O)Me | Me | C(═O)Me | O |
| D-18067 | Me(R) | single bond | H | c-Pen | C(═O)Me | Me | C(═O)Me | O |
| D-18068 | Me(S) | single bond | H | c-Pen | C(═O)Me | Me | C(═O)Me | O |
| D-18069 | H | single bond | Me | tetrahydrofuran-3-yl | C(═O)Me | Cl | C(═O)Me | O |
| D-18070 | Me | single bond | H | tetrahydrofuran-3-yl | C(═O)Me | Cl | C(═O)Me | O |
| D-18071 | Me(R) | single bond | H | tetrahydrofuran-3-yl | C(═O)Me | Cl | C(═O)Me | O |
| D-18072 | Me(S) | single bond | H | tetrahydrofuran-3-yl | C(═O)Me | Cl | C(═O)Me | O |
| D-18073 | H | single bond | Me | tetrahydrofuran-3-yl | C(═O)Me | Me | C(═O)Me | O |
| D-18074 | Me | single bond | H | tetrahydrofuran-3-yl | C(═O)Me | Me | C(═O)Me | O |
| D-18075 | Me(R) | single bond | H | tetrahydrofuran-3-yl | C(═O)Me | Me | C(═O)Me | O |
| D-18076 | Me(S) | single bond | H | tetrahydrofuran-3-yl | C(═O)Me | Me | C(═O)Me | O |
| D-18077 | H | single bond | Me | tetrahydrothiophen-3-yl | C(═O)Me | Cl | C(═O)Me | O |
| D-18078 | Me | single bond | H | tetrahydrothiophen-3-yl | C(═O)Me | Cl | C(═O)Me | O |
| D-18079 | Me(R) | single bond | H | tetrahydrothiophen-3-yl | C(═O)Me | Cl | C(═O)Me | O |
| D-18080 | Me(S) | single bond | H | tetrahydrothiophen-3-yl | C(═O)Me | Cl | C(═O)Me | O |
| D-18081 | H | single bond | Me | tetrahydrothiophen-3-yl | C(═O)Me | Me | C(═O)Me | O |
| D-18082 | Me | single bond | H | tetrahydrothiophen-3-yl | C(═O)Me | Me | C(═O)Me | O |
| D-18083 | Me(R) | single bond | H | tetrahydrothiophen-3-yl | C(═O)Me | Me | C(═O)Me | O |
| D-18084 | Me(S) | single bond | H | tetrahydrothiophen-3-yl | C(═O)Me | Me | C(═O)Me | O |
| D-18085 | H | single bond | Me | c-Pen(1-CN) | C(═O)Me | Cl | C(═O)Me | O |
| D-18086 | Me | single bond | H | c-Pen(1-CN) | C(═O)Me | Cl | C(═O)Me | O |
| D-18087 | Me(R) | single bond | H | c-Pen(1-CN) | C(═O)Me | Cl | C(═O)Me | O |
| D-18088 | Me(S) | single bond | H | c-Pen(1-CN) | C(═O)Me | Cl | C(═O)Me | O |
| D-18089 | H | single bond | Me | c-Pen(1-CN) | C(═O)Me | Me | C(═O)Me | O |
| D-18090 | Me | single bond | H | c-Pen(1-CN) | C(═O)Me | Me | C(═O)Me | O |
| D-18091 | Me(R) | single bond | H | c-Pen(1-CN) | C(═O)Me | Me | C(═O)Me | O |
| D-18092 | Me(S) | single bond | H | c-Pen(1-CN) | C(═O)Me | Me | C(═O)Me | O |
| D-18093 | H | single bond | Me | tetrahydrofuran(3-CN)-3-yl | C(═O)Me | Cl | C(═O)Me | O |
| D-18094 | Me | single bond | H | tetrahydrofuran(3-CN)-3-yl | C(═O)Me | Cl | C(═O)Me | O |
| D-18095 | Me(R) | single bond | H | tetrahydrofuran(3-CN)-3-yl | C(═O)Me | Cl | C(═O)Me | O |
| D-18096 | Me(S) | single bond | H | tetrahydrofuran(3-CN)-3-yl | C(═O)Me | Cl | C(═O)Me | O |
| D-18097 | H | single bond | Me | tetrahydrofuran(3-CN)-3-yl | C(═O)Me | Me | C(═O)Me | O |
| D-18098 | Me | single bond | H | tetrahydrofuran(3-CN)-3-yl | C(═O)Me | Me | C(═O)Me | O |
| D-18099 | Me(R) | single bond | H | tetrahydrofuran(3-CN)-3-yl | C(═O)Me | Me | C(═O)Me | O |
| D-18100 | Me(S) | single bond | H | tetrahydrofuran(3-CN)-3-yl | C(═O)Me | Me | C(═O)Me | O |

TABLE 1057-continued

| Compound Number | Y | W | Z | $R^1$ | $R^2$ | $R^3$ | $R^{10}$ | A |
|---|---|---|---|---|---|---|---|---|
| D-18101 | H | single bond | Me | tetrahydrothiophen(3-CN)-3-yl | C(═O)Me | Cl | C(═O)Me | O |
| D-18102 | Me | single bond | H | tetrahydrothiophen(3-CN)-3-yl | C(═O)Me | Cl | C(═O)Me | O |

TABLE 1058

| Compound Number | Y | W | Z | $R^1$ | $R^2$ | $R^3$ | $R^{10}$ | A |
|---|---|---|---|---|---|---|---|---|
| D-18103 | Me(R) | single bond | H | tetrahydrothiophen(3-CN)-3-yl | C(═O)Me | Cl | C(═O)Me | O |
| D-18104 | Me(S) | single bond | H | tetrahydrothiophen(3-CN)-3-yl | C(═O)Me | Cl | C(═O)Me | O |
| D-18105 | H | single bond | Me | tetrahydrothiophen(3-CN)-3-yl | C(═O)Me | Me | C(═O)Me | O |
| D-18106 | Me | single bond | H | tetrahydrothiophen(3-CN)-3-yl | C(═O)Me | Me | C(═O)Me | O |
| D-18107 | Me(R) | single bond | H | tetrahydrothiophen(3-CN)-3-yl | C(═O)Me | Me | C(═O)Me | O |
| D-18108 | Me(S) | single bond | H | tetrahydrothiophen(3-CN)-3-yl | C(═O)Me | Me | C(═O)Me | O |
| D-18109 | H | single bond | Me | bicyclo[1.1.1]pentan-1-yl | C(═O)Me | Cl | C(═O)Me | O |
| D-18110 | Me | single bond | H | bicyclo[1.1.1]pentan-1-yl | C(═O)Me | Cl | C(═O)Me | O |
| D-18111 | Me(R) | single bond | H | bicyclo[1.1.1]pentan-1-yl | C(═O)Me | Cl | C(═O)Me | O |
| D-18112 | Me(S) | single bond | H | bicyclo[1.1.1]pentan-1-yl | C(═O)Me | Cl | C(═O)Me | O |
| D-18113 | H | single bond | Me | bicyclo[1.1.1]pentan-1-yl | C(═O)Me | Me | C(═O)Me | O |
| D-18114 | Me | single bond | H | bicyclo[1.1.1]pentan-1-yl | C(═O)Me | Me | C(═O)Me | O |
| D-18115 | Me(R) | single bond | H | bicyclo[1.1.1]pentan-1-yl | C(═O)Me | Me | C(═O)Me | O |
| D-18116 | Me(S) | single bond | H | bicyclo[1.1.1]pentan-1-yl | C(═O)Me | Me | C(═O)Me | O |
| D-18117 | H | single bond | Me | c-Hex | C(═O)Me | Cl | C(═O)Me | O |
| D-18118 | Me | single bond | H | c-Hex | C(═O)Me | Cl | C(═O)Me | O |
| D-18119 | Me(R) | single bond | H | c-Hex | C(═O)Me | Cl | C(═O)Me | O |
| D-18120 | Me(S) | single bond | H | c-Hex | C(═O)Me | Cl | C(═O)Me | O |
| D-18121 | H | single bond | Me | c-Hex | C(═O)Me | Me | C(═O)Me | O |
| D-18122 | Me | single bond | H | c-Hex | C(═O)Me | Me | C(═O)Me | O |
| D-18123 | Me(R) | single bond | H | c-Hex | C(═O)Me | Me | C(═O)Me | O |
| D-18124 | Me(S) | single bond | H | c-Hex | C(═O)Me | Me | C(═O)Me | O |
| D-18125 | H | single bond | Me | tetrahydropyran-4-yl | C(═O)Me | Cl | C(═O)Me | O |
| D-18126 | Me | single bond | H | tetrahydropyran-4-yl | C(═O)Me | Cl | C(═O)Me | O |
| D-18127 | Me(R) | single bond | H | tetrahydropyran-4-yl | C(═O)Me | Cl | C(═O)Me | O |
| D-18128 | Me(S) | single bond | H | tetrahydropyran-4-yl | C(═O)Me | Cl | C(═O)Me | O |
| D-18129 | H | single bond | Me | tetrahydropyran-4-yl | C(═O)Me | Me | C(═O)Me | O |
| D-18130 | Me | single bond | H | tetrahydropyran-4-yl | C(═O)Me | Me | C(═O)Me | O |
| D-18131 | Me(R) | single bond | H | tetrahydropyran-4-yl | C(═O)Me | Me | C(═O)Me | O |
| D-18132 | Me(S) | single bond | H | tetrahydropyran-4-yl | C(═O)Me | Me | C(═O)Me | O |
| D-18133 | H | single bond | Me | tetrahydrothiopyran-4-yl | C(═O)Me | Cl | C(═O)Me | O |
| D-18134 | Me | single bond | H | tetrahydrothiopyran-4-yl | C(═O)Me | Cl | C(═O)Me | O |
| D-18135 | Me(R) | single bond | H | tetrahydrothiopyran-4-yl | C(═O)Me | Cl | C(═O)Me | O |
| D-18136 | Me(S) | single bond | H | tetrahydrothiopyran-4-yl | C(═O)Me | Cl | C(═O)Me | O |
| D-18137 | H | single bond | Me | tetrahydrothiopyran-4-yl | C(═O)Me | Me | C(═O)Me | O |
| D-18138 | Me | single bond | H | tetrahydrothiopyran-4-yl | C(═O)Me | Me | C(═O)Me | O |
| D-18139 | Me(R) | single bond | H | tetrahydrothiopyran-4-yl | C(═O)Me | Me | C(═O)Me | O |
| D-18140 | Me(S) | single bond | H | tetrahydrothiopyran-4-yl | C(═O)Me | Me | C(═O)Me | O |
| D-18141 | H | single bond | Me | c-Hex(1-CN) | C(═O)Me | Cl | C(═O)Me | O |
| D-18142 | Me | single bond | H | c-Hex(1-CN) | C(═O)Me | Cl | C(═O)Me | O |
| D-18143 | Me(R) | single bond | H | c-Hex(1-CN) | C(═O)Me | Cl | C(═O)Me | O |
| D-18144 | Me(S) | single bond | H | c-Hex(1-CN) | C(═O)Me | Cl | C(═O)Me | O |
| D-18145 | H | single bond | Me | c-Hex(1-CN) | C(═O)Me | Me | C(═O)Me | O |
| D-18146 | Me | single bond | H | c-Hex(1-CN) | C(═O)Me | Me | C(═O)Me | O |

TABLE 1059

| Compound Number | Y | W | Z | $R^1$ | $R^2$ | $R^3$ | $R^{10}$ | A |
|---|---|---|---|---|---|---|---|---|
| D-18147 | Me(R) | single bond | H | c-Hex(1-CN) | C(═O)Me | Me | C(═O)Me | O |
| D-18148 | Me(S) | single bond | H | c-Hex(1-CN) | C(═O)Me | Me | C(═O)Me | O |
| D-18149 | H | single bond | Me | tetrahydropyran(4-CN)-4-yl | C(═O)Me | Cl | C(═O)Me | O |
| D-18150 | Me | single bond | H | tetrahydropyran(4-CN)-4-yl | C(═O)Me | Cl | C(═O)Me | O |
| D-18151 | Me(R) | single bond | H | tetrahydropyran(4-CN)-4-yl | C(═O)Me | Cl | C(═O)Me | O |
| D-18152 | Me(S) | single bond | H | tetrahydropyran(4-CN)-4-yl | C(═O)Me | Cl | C(═O)Me | O |
| D-18153 | H | single bond | Me | tetrahydropyran(4-CN)-4-yl | C(═O)Me | Me | C(═O)Me | O |
| D-18154 | Me | single bond | H | tetrahydropyran(4-CN)-4-yl | C(═O)Me | Me | C(═O)Me | O |
| D-18155 | Me(R) | single bond | H | tetrahydropyran(4-CN)-4-yl | C(═O)Me | Me | C(═O)Me | O |
| D-18156 | Me(S) | single bond | H | tetrahydropyran(4-CN)-4-yl | C(═O)Me | Me | C(═O)Me | O |
| D-18157 | H | single bond | Me | tetrahydrothiopyran(4-CN)-4-yl | C(═O)Me | Cl | C(═O)Me | O |
| D-18158 | Me | single bond | H | tetrahydrothiopyran(4-CN)-4-yl | C(═O)Me | Cl | C(═O)Me | O |

TABLE 1059-continued

| Compound Number | Y | W | Z | $R^1$ | $R^2$ | $R^3$ | $R^{10}$ | A |
|---|---|---|---|---|---|---|---|---|
| D-18159 | Me(R) | single bond | H | tetrahydrothiopyran(4-CN)-4-yl | C(═O)Me | Cl | C(═O)Me | O |
| D-18160 | Me(S) | single bond | H | tetrahydrothiopyran(4-CN)-4-yl | C(═O)Me | Cl | C(═O)Me | O |
| D-18161 | H | single bond | Me | tetrahydrothiopyran(4-CN)-4-yl | C(═O)Me | Me | C(═O)Me | O |
| D-18162 | Me | single bond | H | tetrahydrothiopyran(4-CN)-4-yl | C(═O)Me | Me | C(═O)Me | O |
| D-18163 | Me(R) | single bond | H | tetrahydrothiopyran(4-CN)-4-yl | C(═O)Me | Me | C(═O)Me | O |
| D-18164 | Me(S) | single bond | H | tetrahydrothiopyran(4-CN)-4-yl | C(═O)Me | Me | C(═O)Me | O |
| D-18165 | H | single bond | Me | $CH_2$(c-Pr) | C(═O)Me | Cl | C(═O)Me | O |
| D-18166 | Me | single bond | H | $CH_2$(c-Pr) | C(═O)Me | Cl | C(═O)Me | O |
| D-18167 | Me(R) | single bond | H | $CH_2$(c-Pr) | C(═O)Me | Cl | C(═O)Me | O |
| D-18168 | Me(S) | single bond | H | $CH_2$(c-Pr) | C(═O)Me | Cl | C(═O)Me | O |
| D-18169 | H | single bond | Me | $CH_2$(c-Pr) | C(═O)Me | Me | C(═O)Me | O |
| D-18170 | Me | single bond | H | $CH_2$(c-Pr) | C(═O)Me | Me | C(═O)Me | O |
| D-18171 | Me(R) | single bond | H | $CH_2$(c-Pr) | C(═O)Me | Me | C(═O)Me | O |
| D-18172 | Me(S) | single bond | H | $CH_2$(c-Pr) | C(═O)Me | Me | C(═O)Me | O |
| D-18173 | H | single bond | Me | $CH_2$[c-Pr(1-CN)] | C(═O)Me | Cl | C(═O)Me | O |
| D-18174 | Me | single bond | H | $CH_2$[c-Pr(1-CN)] | C(═O)Me | Cl | C(═O)Me | O |
| D-18175 | Me(R) | single bond | H | $CH_2$[c-Pr(1-CN)] | C(═O)Me | Cl | C(═O)Me | O |
| D-18176 | Me(S) | single bond | H | $CH_2$[c-Pr(1-CN)] | C(═O)Me | Cl | C(═O)Me | O |
| D-18177 | H | single bond | Me | $CH_2$[c-Pr(1-CN)] | C(═O)Me | Me | C(═O)Me | O |
| D-18178 | Me | single bond | H | $CH_2$[c-Pr(1-CN)] | C(═O)Me | Me | C(═O)Me | O |
| D-18179 | Me(R) | single bond | H | $CH_2$[c-Pr(1-CN)] | C(═O)Me | Me | C(═O)Me | O |
| D-18180 | Me(S) | single bond | H | $CH_2$[c-Pr(1-CN)] | C(═O)Me | Me | C(═O)Me | O |
| D-18181 | H | single bond | Me | CH(Me)(c-Pr) | C(═O)Me | Cl | C(═O)Me | O |
| D-18182 | Me | single bond | H | CH(Me)(c-Pr) | C(═O)Me | Cl | C(═O)Me | O |
| D-18183 | Me(R) | single bond | H | CH(Me)(c-Pr) | C(═O)Me | Cl | C(═O)Me | O |
| D-18184 | Me(S) | single bond | H | CH(Me)(c-Pr) | C(═O)Me | Cl | C(═O)Me | O |
| D-18185 | H | single bond | Me | CH(Me)(c-Pr) | C(═O)Me | Me | C(═O)Me | O |
| D-18186 | Me | single bond | H | CH(Me)(c-Pr) | C(═O)Me | Me | C(═O)Me | O |
| D-18187 | Me(R) | single bond | H | CH(Me)(c-Pr) | C(═O)Me | Me | C(═O)Me | O |
| D-18188 | Me(S) | single bond | H | CH(Me)(c-Pr) | C(═O)Me | Me | C(═O)Me | O |
| D-18189 | H | single bond | Me | CH(Me)$CH_2$OMe | C(═O)Me | Cl | C(═O)Me | O |
| D-18190 | Me | single bond | H | CH(Me)$CH_2$OMe | C(═O)Me | Cl | C(═O)Me | O |

TABLE 1060

| Compound Number | Y | W | Z | $R^1$ | $R^2$ | $R^3$ | $R^{10}$ | A |
|---|---|---|---|---|---|---|---|---|
| D-18191 | Me(R) | single bond | H | CH(Me)$CH_2$OMe | C(═O)Me | Cl | C(═O)Me | O |
| D-18192 | Me(S) | single bond | H | CH(Me)$CH_2$OMe | C(═O)Me | Cl | C(═O)Me | O |
| D-18193 | H | single bond | Me | CH(Me)$CH_2$OMe | C(═O)Me | Me | C(═O)Me | O |
| D-18194 | Me | single bond | H | CH(Me)$CH_2$OMe | C(═O)Me | Me | C(═O)Me | O |
| D-18195 | Me(R) | single bond | H | CH(Me)$CH_2$OMe | C(═O)Me | Me | C(═O)Me | O |
| D-18196 | Me(S) | single bond | H | CH(Me)$CH_2$OMe | C(═O)Me | Me | C(═O)Me | O |
| D-18197 | H | single bond | Me | $CH_2CH{=}CH_2$ | C(═O)Me | Cl | C(═O)Me | O |
| D-18198 | Me | single bond | H | $CH_2CH{=}CH_2$ | C(═O)Me | Cl | C(═O)Me | O |
| D-18199 | Me(R) | single bond | H | $CH_2CH{=}CH_2$ | C(═O)Me | Cl | C(═O)Me | O |
| D-18200 | Me(S) | single bond | H | $CH_2CH{=}CH_2$ | C(═O)Me | Cl | C(═O)Me | O |
| D-18201 | H | single bond | Me | $CH_2CH{=}CH_2$ | C(═O)Me | Me | C(═O)Me | O |
| D-18202 | Me | single bond | H | $CH_2CH{=}CH_2$ | C(═O)Me | Me | C(═O)Me | O |
| D-18203 | Me(R) | single bond | H | $CH_2CH{=}CH_2$ | C(═O)Me | Me | C(═O)Me | O |
| D-18204 | Me(S) | single bond | H | $CH_2CH{=}CH_2$ | C(═O)Me | Me | C(═O)Me | O |
| D-18205 | H | single bond | Me | $CH_2C{\equiv}CH$ | C(═O)Me | Cl | C(═O)Me | O |
| D-18206 | Me | single bond | H | $CH_2C{\equiv}CH$ | C(═O)Me | Cl | C(═O)Me | O |
| D-18207 | Me(R) | single bond | H | $CH_2C{\equiv}CH$ | C(═O)Me | Cl | C(═O)Me | O |
| D-18208 | Me(S) | single bond | H | $CH_2C{\equiv}CH$ | C(═O)Me | Cl | C(═O)Me | O |
| D-18209 | H | single bond | Me | $CH_2C{\equiv}CH$ | C(═O)Me | Me | C(═O)Me | O |
| D-18210 | Me | single bond | H | $CH_2C{\equiv}CH$ | C(═O)Me | Me | C(═O)Me | O |
| D-18211 | Me(R) | single bond | H | $CH_2C{\equiv}CH$ | C(═O)Me | Me | C(═O)Me | O |
| D-18212 | Me(S) | single bond | H | $CH_2C{\equiv}CH$ | C(═O)Me | Me | C(═O)Me | O |
| D-18213 | H | single bond | Me | $CH_2CN$ | C(═O)Me | Cl | C(═O)Me | O |
| D-18214 | Me | single bond | H | $CH_2CN$ | C(═O)Me | Cl | C(═O)Me | O |
| D-18215 | Me(R) | single bond | H | $CH_2CN$ | C(═O)Me | Cl | C(═O)Me | O |
| D-18216 | Me(S) | single bond | H | $CH_2CN$ | C(═O)Me | Cl | C(═O)Me | O |
| D-18217 | H | single bond | Me | $CH_2CN$ | C(═O)Me | Me | C(═O)Me | O |
| D-18218 | Me | single bond | H | $CH_2CN$ | C(═O)Me | Me | C(═O)Me | O |
| D-18219 | Me(R) | single bond | H | $CH_2CN$ | C(═O)Me | Me | C(═O)Me | O |
| D-18220 | Me(S) | single bond | H | $CH_2CN$ | C(═O)Me | Me | C(═O)Me | O |
| D-18221 | H | single bond | Me | CH(Me)CN | C(═O)Me | Cl | C(═O)Me | O |
| D-18222 | Me | single bond | H | CH(Me)CN | C(═O)Me | Cl | C(═O)Me | O |
| D-18223 | Me(R) | single bond | H | CH(Me)CN | C(═O)Me | Cl | C(═O)Me | O |
| D-18224 | Me(S) | single bond | H | CH(Me)CN | C(═O)Me | Cl | C(═O)Me | O |
| D-18225 | H | single bond | Me | CH(Me)CN | C(═O)Me | Me | C(═O)Me | O |

TABLE 1060-continued

| Compound Number | Y | W | Z | $R^1$ | $R^2$ | $R^3$ | $R^{10}$ | A |
|---|---|---|---|---|---|---|---|---|
| D-18226 | Me | single bond | H | CH(Me)CN | C(=O)Me | Me | C(=O)Me | O |
| D-18227 | Me(R) | single bond | H | CH(Me)CN | C(=O)Me | Me | C(=O)Me | O |
| D-18228 | Me(S) | single bond | H | CH(Me)CN | C(=O)Me | Me | C(=O)Me | O |
| D-18229 | H | single bond | Me | $C(Me)_2CN$ | C(=O)Me | Cl | C(=O)Me | O |
| D-18230 | Me | single bond | H | $C(Me)_2CN$ | C(=O)Me | Cl | C(=O)Me | O |
| D-18231 | Me(R) | single bond | H | $C(Me)_2CN$ | C(=O)Me | Cl | C(=O)Me | O |
| D-18232 | Me(S) | single bond | H | $C(Me)_2CN$ | C(=O)Me | Cl | C(=O)Me | O |
| D-18233 | H | single bond | Me | $C(Me)_2CN$ | C(=O)Me | Me | C(=O)Me | O |
| D-18234 | Me | single bond | H | $C(Me)_2CN$ | C(=O)Me | Me | C(=O)Me | O |

TABLE 1061

| Compound Number | Y | W | Z | $R^1$ | $R^2$ | $R^3$ | $R^{10}$ | A |
|---|---|---|---|---|---|---|---|---|
| D-18235 | Me(R) | single bond | H | $C(Me)_2CN$ | C(=O)Me | Me | C(=O)Me | O |
| D-18236 | Me(S) | single bond | H | $C(Me)_2CN$ | C(=O)Me | Me | C(=O)Me | O |
| D-18237 | H | single bond | Me | C(Me)(i-Pr)CN | C(=O)Me | Cl | C(=O)Me | O |
| D-18238 | Me | single bond | H | C(Me)(i-Pr)CN | C(=O)Me | Cl | C(=O)Me | O |
| D-18239 | Me(R) | single bond | H | C(Me)(i-Pr)CN | C(=O)Me | Cl | C(=O)Me | O |
| D-18240 | Me(S) | single bond | H | C(Me)(i-Pr)CN | C(=O)Me | Cl | C(=O)Me | O |
| D-18241 | H | single bond | Me | C(Me)(i-Pr)CN | C(=O)Me | Me | C(=O)Me | O |
| D-18242 | Me | single bond | H | C(Me)(i-Pr)CN | C(=O)Me | Me | C(=O)Me | O |
| D-18243 | Me(R) | single bond | H | C(Me)(i-Pr)CN | C(=O)Me | Me | C(=O)Me | O |
| D-18244 | Me(S) | single bond | H | C(Me)(i-Pr)CN | C(=O)Me | Me | C(=O)Me | O |
| D-18245 | H | single bond | Me | OMe | C(=O)Me | Cl | C(=O)Me | O |
| D-18246 | Me | single bond | H | OMe | C(=O)Me | Cl | C(=O)Me | O |
| D-18247 | Me(R) | single bond | H | OMe | C(=O)Me | Cl | C(=O)Me | O |
| D-18248 | Me(S) | single bond | H | OMe | C(=O)Me | Cl | C(=O)Me | O |
| D-18249 | H | single bond | Me | OMe | C(=O)Me | Me | C(=O)Me | O |
| D-18250 | Me | single bond | H | OMe | C(=O)Me | Me | C(=O)Me | O |
| D-18251 | Me(R) | single bond | H | OMe | C(=O)Me | Me | C(=O)Me | O |
| D-18252 | Me(S) | single bond | H | OMe | C(=O)Me | Me | C(=O)Me | O |
| D-18253 | H | single bond | Me | CH=NOMe | C(=O)Me | Cl | C(=O)Me | O |
| D-18254 | Me | single bond | H | CH=NOMe | C(=O)Me | Cl | C(=O)Me | O |
| D-18255 | Me(R) | single bond | H | CH=NOMe | C(=O)Me | Cl | C(=O)Me | O |
| D-18256 | Me(S) | single bond | H | CH=NOMe | C(=O)Me | Cl | C(=O)Me | O |
| D-18257 | H | single bond | Me | CH=NOMe | C(=O)Me | Me | C(=O)Me | O |
| D-18258 | Me | single bond | H | CH=NOMe | C(=O)Me | Me | C(=O)Me | O |
| D-18259 | Me(R) | single bond | H | CH=NOMe | C(=O)Me | Me | C(=O)Me | O |
| D-18260 | Me(S) | single bond | H | CH=NOMe | C(=O)Me | Me | C(=O)Me | O |
| D-18261 | H | single bond | Me | morpholin-4-yl | C(=O)Me | Cl | C(=O)Me | O |
| D-18262 | Me | single bond | H | morpholin-4-yl | C(=O)Me | Cl | C(=O)Me | O |
| D-18263 | Me(R) | single bond | H | morpholin-4-yl | C(=O)Me | Cl | C(=O)Me | O |
| D-18264 | Me(S) | single bond | H | morpholin-4-yl | C(=O)Me | Cl | C(=O)Me | O |
| D-18265 | H | single bond | Me | morpholin-4-yl | C(=O)Me | Me | C(=O)Me | O |
| D-18266 | Me | single bond | H | morpholin-4-yl | C(=O)Me | Me | C(=O)Me | O |
| D-18267 | Me(R) | single bond | H | morpholin-4-yl | C(=O)Me | Me | C(=O)Me | O |
| D-18268 | Me(S) | single bond | H | morpholin-4-yl | C(=O)Me | Me | C(=O)Me | O |
| D-18269 | H | single bond | Me | Ph | C(=O)Me | Cl | C(=O)Me | O |
| D-18270 | Me | single bond | H | Ph | C(=O)Me | Cl | C(=O)Me | O |
| D-18271 | Me(R) | single bond | H | Ph | C(=O)Me | Cl | C(=O)Me | O |
| D-18272 | Me(S) | single bond | H | Ph | C(=O)Me | Cl | C(=O)Me | O |
| D-18273 | H | single bond | Me | Ph | C(=O)Me | Me | C(=O)Me | O |
| D-18274 | Me | single bond | H | Ph | C(=O)Me | Me | C(=O)Me | O |
| D-18275 | Me(R) | single bond | H | Ph | C(=O)Me | Me | C(=O)Me | O |
| D-18276 | Me(S) | single bond | H | Ph | C(=O)Me | Me | C(=O)Me | O |
| D-18277 | H | single bond | Me | $CH_2Ph$ | C(=O)Me | Cl | C(=O)Me | O |
| D-18278 | Me | single bond | H | $CH_2Ph$ | C(=O)Me | Cl | C(=O)Me | O |

TABLE 1062

| Compound Number | Y | W | Z | $R^1$ | $R^2$ | $R^3$ | $R^{10}$ | A |
|---|---|---|---|---|---|---|---|---|
| D-18279 | Me(R) | single bond | H | $CH_2Ph$ | C(=O)Me | Cl | C(=O)Me | O |
| D-18280 | Me(S) | single bond | H | $CH_2Ph$ | C(=O)Me | Cl | C(=O)Me | O |
| D-18281 | H | single bond | Me | $CH_2Ph$ | C(=O)Me | Me | C(=O)Me | O |

TABLE 1062-continued

| Compound Number | Y | W | Z | $R^1$ | $R^2$ | $R^3$ | $R^{10}$ | A |
|---|---|---|---|---|---|---|---|---|
| D-18282 | Me | single bond | H | $CH_2Ph$ | C(=O)Me | Me | C(=O)Me | O |
| D-18283 | Me(R) | single bond | H | $CH_2Ph$ | C(=O)Me | Me | C(=O)Me | O |
| D-18284 | Me(S) | single bond | H | $CH_2Ph$ | C(=O)Me | Me | C(=O)Me | O |
| D-18285 | H | single bond | Me | thiazole-2-yl | C(=O)Me | Cl | C(=O)Me | O |
| D-18286 | Me | single bond | H | thiazole-2-yl | C(=O)Me | Cl | C(=O)Me | O |
| D-18287 | Me(R) | single bond | H | thiazole-2-yl | C(=O)Me | Cl | C(=O)Me | O |
| D-18288 | Me(S) | single bond | H | thiazole-2-yl | C(=O)Me | Cl | C(=O)Me | O |
| D-18289 | H | single bond | Me | thiazole-2-yl | C(=O)Me | Me | C(=O)Me | O |
| D-18290 | Me | single bond | H | thiazole-2-yl | C(=O)Me | Me | C(=O)Me | O |
| D-18291 | Me(R) | single bond | H | thiazole-2-yl | C(=O)Me | Me | C(=O)Me | O |
| D-18292 | Me(S) | single bond | H | thiazole-2-yl | C(=O)Me | Me | C(=O)Me | O |
| D-18293 | H | single bond | Me | 1-Me-pyrazol-3-yl | C(=O)Me | Cl | C(=O)Me | O |
| D-18294 | Me | single bond | H | 1-Me-pyrazol-3-yl | C(=O)Me | Cl | C(=O)Me | O |
| D-18295 | Me(R) | single bond | H | 1-Me-pyrazol-3-yl | C(=O)Me | Cl | C(=O)Me | O |
| D-18296 | Me(S) | single bond | H | 1-Me-pyrazol-3-yl | C(=O)Me | Cl | C(=O)Me | O |
| D-18297 | H | single bond | Me | 1-Me-pyrazol-3-yl | C(=O)Me | Me | C(=O)Me | O |
| D-18298 | Me | single bond | H | 1-Me-pyrazol-3-yl | C(=O)Me | Me | C(=O)Me | O |
| D-18299 | Me(R) | single bond | H | 1-Me-pyrazol-3-yl | C(=O)Me | Me | C(=O)Me | O |
| D-18300 | Me(S) | single bond | H | 1-Me-pyrazol-3-yl | C(=O)Me | Me | C(=O)Me | O |
| D-18301 | H | single bond | Me | 1-Me-pyrazol-5-yl | C(=O)Me | Cl | C(=O)Me | O |
| D-18302 | Me | single bond | H | 1-Me-pyrazol-5-yl | C(=O)Me | Cl | C(=O)Me | O |
| D-18303 | Me(R) | single bond | H | 1-Me-pyrazol-5-yl | C(=O)Me | Cl | C(=O)Me | O |
| D-18304 | Me(S) | single bond | H | 1-Me-pyrazol-5-yl | C(=O)Me | Cl | C(=O)Me | O |
| D-18305 | H | single bond | Me | 1-Me-pyrazol-5-yl | C(=O)Me | Me | C(=O)Me | O |
| D-18306 | Me | single bond | H | 1-Me-pyrazol-5-yl | C(=O)Me | Me | C(=O)Me | O |
| D-18307 | Me(R) | single bond | H | 1-Me-pyrazol-5-yl | C(=O)Me | Me | C(=O)Me | O |
| D-18308 | Me(S) | single bond | H | 1-Me-pyrazol-5-yl | C(=O)Me | Me | C(=O)Me | O |
| D-18309 | H | single bond | Me | $CH_2$(pyrimidin-2-yl) | C(=O)Me | Cl | C(=O)Me | O |
| D-18310 | Me | single bond | H | $CH_2$(pyrimidin-2-yl) | C(=O)Me | Cl | C(=O)Me | O |
| D-18311 | Me(R) | single bond | H | $CH_2$(pyrimidin-2-yl) | C(=O)Me | Cl | C(=O)Me | O |
| D-18312 | Me(S) | single bond | H | $CH_2$(pyrimidin-2-yl) | C(=O)Me | Cl | C(=O)Me | O |
| D-18313 | H | single bond | Me | $CH_2$(pyrimidin-2-yl) | C(=O)Me | Me | C(=O)Me | O |
| D-18314 | Me | single bond | H | $CH_2$(pyrimidin-2-yl) | C(=O)Me | Me | C(=O)Me | O |
| D-18315 | Me(R) | single bond | H | $CH_2$(pyrimidin-2-yl) | C(=O)Me | Me | C(=O)Me | O |
| D-18316 | Me(S) | single bond | H | $CH_2$(pyrimidin-2-yl) | C(=O)Me | Me | C(=O)Me | O |

TABLE 1063

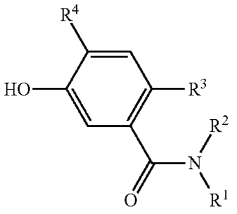

| Compound Number | $R^1$ | $R^2$ | $R^3$ | $R^4$ |
|---|---|---|---|---|
| E-0001 | $CH_2CF_3$ | H | F | H |
| E-0002 | $CH_2CF_3$ | H | F | F |
| E-0003 | $CH_2CF_3$ | H | F | Cl |
| E-0004 | $CH_2CF_3$ | H | F | Me |
| E-0005 | $CH_2CF_3$ | H | Cl | H |
| E-0006 | $CH_2CF_3$ | H | Cl | F |
| E-0007 | $CH_2CF_3$ | H | Cl | Cl |
| E-0008 | $CH_2CF_3$ | H | Cl | Me |
| E-0009 | $CH_2CF_3$ | H | Me | H |
| E-0010 | $CH_2CF_3$ | H | Me | F |
| E-0011 | $CH_2CF_3$ | H | Me | Cl |
| E-0012 | $CH_2CF_3$ | H | Me | Me |
| E-0013 | Et | H | F | H |
| E-0014 | Et | H | F | F |
| E-0015 | Et | H | F | Cl |
| E-0016 | Et | H | F | Me |
| E-0017 | Et | H | Cl | H |
| E-0018 | Et | H | Cl | F |
| E-0019 | Et | H | Cl | Cl |
| E-0020 | Et | H | Cl | Me |
| E-0021 | Et | H | Me | H |
| E-0022 | Et | H | Me | F |
| E-0023 | Et | H | Me | Cl |

TABLE 1063-continued

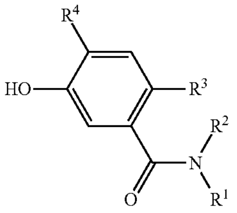

| Compound Number | $R^1$ | $R^2$ | $R^3$ | $R^4$ |
|---|---|---|---|---|
| E-0024 | Et | H | Me | Me |
| E-0025 | c-Pr | H | F | H |
| E-0026 | c-Pr | H | F | F |
| E-0027 | c-Pr | H | F | Cl |
| E-0028 | c-Pr | H | F | Me |
| E-0029 | c-Pr | H | Cl | H |
| E-0030 | c-Pr | H | Cl | F |
| E-0031 | c-Pr | H | Cl | Cl |
| E-0032 | c-Pr | H | Cl | Me |
| E-0033 | c-Pr | H | Me | H |
| E-0034 | c-Pr | H | Me | F |
| E-0035 | c-Pr | H | Me | Cl |
| E-0036 | c-Pr | H | Me | Me |
| E-0037 | c-Pr(1-CN) | H | F | H |
| E-0038 | c-Pr(1-CN) | H | F | F |

TABLE 1064

| Compound Number | $R^1$ | $R^2$ | $R^3$ | $R^4$ |
|---|---|---|---|---|
| E-0039 | c-Pr(1-CN) | H | F | Cl |
| E-0040 | c-Pr(1-CN) | H | F | Me |
| E-0041 | c-Pr(1-CN) | H | Cl | H |
| E-0042 | c-Pr(1-CN) | H | Cl | F |
| E-0043 | c-Pr(1-CN) | H | Cl | Cl |
| E-0044 | c-Pr(1-CN) | H | Cl | Me |
| E-0045 | c-Pr(1-CN) | H | Me | H |
| E-0046 | c-Pr(1-CN) | H | Me | F |
| E-0047 | c-Pr(1-CN) | H | Me | Cl |
| E-0048 | c-Pr(1-CN) | H | Me | Me |

TABLE 1065

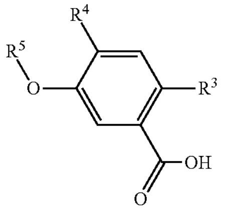

| Compound Number | $R^3$ | $R^4$ | $R^5$ |
|---|---|---|---|
| F-0001 | Cl | F | Me |
| F-0002 | Cl | F | Et |
| F-0003 | Cl | F | n-Pr |
| F-0004 | Cl | F | i-Pr |
| F-0005 | Cl | F | n-Bu |
| F-0006 | Cl | F | n-Pen |
| F-0007 | Cl | F | n-Hex |
| F-0008 | Cl | F | n-Heptyl |
| F-0009 | Cl | F | n-Octyl |
| F-0010 | Cl | F | n-Nonyl |
| F-0011 | Cl | F | n-Decyl |
| F-0012 | Cl | F | c-Pr |
| F-0013 | Cl | F | c-Pen |
| F-0014 | Cl | F | c-Hex |
| F-0015 | Cl | F | $CH_2C(Me)=CH_2$ |
| F-0016 | Cl | F | $CH_2CH_2CH=CH_2$ |
| F-0017 | Cl | F | $CH_2CH_2CH=C(CH_3)_2$ |
| F-0018 | Cl | F | $CH_2CH_2CH_2CH=CH_2$ |
| F-0019 | Cl | F | $CH_2CH_2CH_2CH=C(CH_3)_2$ |
| F-0020 | Cl | F | $CH_2CH_2CH_2CH_2CH=CH_2$ |
| F-0021 | Cl | F | $CH_2CH_2CH_2CH_2CH=C(CH_3)_2$ |
| F-0022 | Cl | F | $CH_2CH_2CH\equiv CH$ |
| F-0023 | Cl | F | $CH_2CH_2CH_2CH\equiv CH$ |
| F-0024 | Cl | F | $CH_2CH_2CH_2CH_2CH\equiv CH$ |
| F-0025 | Cl | F | $CH_2CH_2CH_2Cl$ |
| F-0026 | Cl | F | $CH_2CH_2CH_2Br$ |
| F-0027 | Cl | F | $CH_2CH_2CH_2CH_2Cl$ |
| F-0028 | Cl | F | $CH_2CH_2CH_2CH_2Br$ |
| F-0029 | Cl | F | $CH_2CH_2CH_2CH_2CH_2Cl$ |
| F-0030 | Cl | F | $CH_2CH_2CH_2CH_2CH_2Br$ |
| F-0031 | Cl | F | $CH_2CH_2CH_2CH_2CH_2CH_2Cl$ |
| F-0032 | Cl | F | $CH_2CH_2CH_2CH_2CH_2CH_2Br$ |
| F-0033 | Cl | F | $CH_2CH_2CH_2CH_2CH_2CH_2CH_2Cl$ |
| F-0034 | Cl | F | $CH_2CH_2CH_2CH_2CH_2CH_2CH_2Br$ |
| F-0035 | Cl | F | $CH_2CH_2CH_2CH_2CH_2CH_2CH_2CH_2Br$ |
| F-0036 | Cl | F | $CH_2CH(Me)CH_2Cl$ |
| F-0037 | Cl | F | $CH_2CH(Me)CH_2Br$ |
| F-0038 | Cl | F | $CH_2CH_2CH(Me)CH_2CH_2Cl$ |

TABLE 1066

| Compound Number | $R^3$ | $R^4$ | $R^5$ |
|---|---|---|---|
| F-0039 | Cl | F | $CH_2CH_2CH(Me)CH_2CH_2Br$ |
| F-0040 | Cl | F | $CH_2CH_2CF=CF_2$ |
| F-0041 | Cl | F | $CH_2CH=C(Cl)CF_3$ |

TABLE 1066-continued

| Compound Number | $R^3$ | $R^4$ | $R^5$ |
|---|---|---|---|
| F-0042 | Cl | F | $CH_2CH_2CH_2CF=CF_2$ |
| F-0043 | Cl | F | $CH_2CH_2CH_2CH_2CF=CF_2$ |
| F-0044 | Cl | F | $CH_2CH_2CH_2CH_2CH_2CH_2CF=CF_2$ |
| F-0045 | Cl | F | $CH_2$(t-Bu) |
| F-0046 | Cl | F | $CH_2CH_2$(t-Bu) |
| F-0047 | Cl | F | $CH_2CH_2CH_2$(t-Bu) |
| F-0048 | Cl | F | $CH_2CH_2CH_2CH_2$(t-Bu) |
| F-0049 | Cl | F | $CH_2CH_2CH_2CH_2CH_2$(t-Bu) |
| F-0050 | Cl | F | $CH_2CH_2CH_2CH_2CH_2CH_2$(t-Bu) |
| F-0051 | Cl | F | $CH_2CF_3$ |
| F-0052 | Cl | F | $CH_2CH_2CF_3$ |
| F-0053 | Cl | F | $CH_2CH_2CH_2CF_3$ |
| F-0054 | Cl | F | $CH_2CH_2CH_2CH_2CF_3$ |
| F-0055 | Cl | F | $CH_2CH_2CH_2CH_2CH_2CF_3$ |
| F-0056 | Cl | F | $CH_2CH_2CH_2CH_2CH_2CH_2CF_3$ |
| F-0057 | Cl | F | $CH_2CH_2CH_2CH_2CH_2CH_2CH_2CF_3$ |
| F-0058 | Cl | F | $CH_2CF_2CF_3$ |
| F-0059 | Cl | F | $CF_2CHFCF_3$ |
| F-0060 | Cl | F | $CF_2CF_2CF_3$ |
| F-0061 | Cl | F | $CH_2CF_2CF_2CF_3$ |
| F-0062 | Cl | F | $CH_2CF_2CF_2CF_2CF_3$ |
| F-0063 | Cl | F | $CH_2CF_2CF_2CF_2CHF_2$ |
| F-0064 | Cl | F | $CH(CF_3)CF_3$ |
| F-0065 | Cl | F | $CH_2CF(CF_3)CF_3$ |
| F-0066 | Cl | F | $CH_2CF_2CF(CF_3)CF_3$ |
| F-0067 | Cl | F | $CH_2CF(CF_3)CF_2CF_3$ |
| F-0068 | Cl | F | $CH_2CF_2CF_2CF(CF_3)CF_3$ |
| F-0069 | Cl | F | $CH_2CF_2CF(CF_3)CF_2CF_3$ |
| F-0070 | Cl | F | $CH_2CF(CF_3)CF_2CF_2CF_3$ |
| F-0071 | Cl | F | $CH_2$(c-Pr) |
| F-0072 | Cl | F | $CH_2$[c-Pr(1-Me)] |
| F-0073 | Cl | F | $CH_2$[c-Pr(1-Ph)] |
| F-0074 | Cl | F | $CH_2$\{c-Pr[1-NHS(=O)$_2$CF$_3$]\} |
| F-0075 | Cl | F | $CH_2$\{c-Pr[1-Ph(4-CF$_3$)]\} |
| F-0076 | Cl | F | $CH_2$\{c-Pr[1-Ph(3,4,5-F$_3$)]\} |
| F-0077 | Cl | F | $CH_2$\{c-Hex[4-(t-Bu)]\} |
| F-0078 | Cl | F | $CH_2$[c-Hex(4-CF$_3$)] |
| F-0079 | Cl | F | $CH_2CH_2$(c-Pr) |
| F-0080 | Cl | F | $CH_2CH_2$(c-Hex) |
| F-0081 | Cl | F | $CH_2CH_2$[c-Hex(4-CF$_3$)] |
| F-0082 | Cl | F | $CH_2CH_2$[c-Hex(4-SCF$_3$)] |

TABLE 1067

| Compound Number | $R^3$ | $R^4$ | $R^5$ |
|---|---|---|---|
| F-0083 | Cl | F | $CH_2CH_2CH_2$(c-Pr) |
| F-0084 | Cl | F | $CH_2CH_2CH_2$(c-Hex) |
| F-0085 | Cl | F | $CH_2CH_2CH_2$\{c-Hex[4-(t-Bu)]\} |
| F-0086 | Cl | F | $CH_2CH_2CH_2$[c-Hex(4-CF$_3$)] |
| F-0087 | Cl | F | $CH_2CH_2CH_2$[c-Hex(4-SCF$_3$)] |
| F-0088 | Cl | F | $CH_2CH_2CH_2CH_2$(c-Pr) |
| F-0089 | Cl | F | $CH_2CH_2CH_2CH_2$(c-Hex) |
| F-0090 | Cl | F | $CH_2CH_2CH_2CH_2$[c-Hex(4-CF$_3$)] |
| F-0091 | Cl | F | $CH_2$[c-Pr(2,2-F$_2$)] |
| F-0092 | Cl | F | $CH_2$[c-Hex(4,4-F$_2$)] |
| F-0093 | Cl | F | $CH_2CH_2$[c-Pr(2,2-F$_2$)] |
| F-0094 | Cl | F | $CH_2CH_2$[c-Hex(4,4-F$_2$)] |
| F-0095 | Cl | F | $CH_2CH_2CH_2$[c-Pr(2,2-F$_2$)] |
| F-0096 | Cl | F | $CH_2CH_2CH_2CH_2$[c-Pr(2,2-F$_2$)] |
| F-0097 | Cl | F | $CH_2CH_2OH$ |
| F-0098 | Cl | F | $CH_2CH_2CH_2OH$ |
| F-0099 | Cl | F | $CH_2CH_2CH_2CH_2OH$ |
| F-0100 | Cl | F | $CH_2CH_2CH_2CH_2CH_2OH$ |
| F-0101 | Cl | F | $CH_2CH_2CH_2CH_2CH_2CH_2OH$ |
| F-0102 | Cl | F | $CH_2C(=O)Me$ |
| F-0103 | Cl | F | $CH_2CH(OH)Me$ |
| F-0104 | Cl | F | $CH_2CH(OH)CF_3$ |
| F-0105 | Cl | F | $CH_2C(OH)_2CF_3$ |
| F-0106 | Cl | F | $CH_2C(CF_3)=NOH$ |
| F-0107 | Cl | F | $CH_2C(CF_3)=NOMe$ |

TABLE 1067-continued

| Compound Number | $R^3$ | $R^4$ | $R^5$ |
|---|---|---|---|
| F-0108 | Cl | F | $CH_2CH(CF_3)NH_2$ |
| F-0109 | Cl | F | $CH_2CH(CF_3)NHSO_2CF_3$ |
| F-0110 | Cl | F | $CH_2CH_2OMe$ |
| F-0111 | Cl | F | $CH_2CH_2CH_2OMe$ |
| F-0112 | Cl | F | $CH_2CH_2CH_2CH_2OMe$ |
| F-0113 | Cl | F | $CH_2CH_2CH_2CH_2CH_2OMe$ |
| F-0114 | Cl | F | $CH_2CH_2CH_2CH_2CH_2CH_2OMe$ |
| F-0115 | Cl | F | $CH_2CH_2OCHF_2$ |
| F-0116 | Cl | F | $CH_2CH_2CH_2OCHF_2$ |
| F-0117 | Cl | F | $CH_2CH_2CH_2CH_2OCHF_2$ |
| F-0118 | Cl | F | $CH_2CH_2CH_2CH_2CH_2OCHF_2$ |
| F-0119 | Cl | F | $CH_2CH_2CH_2CH_2CH_2CH_2OCHF_2$ |
| F-0120 | Cl | F | $CH_2CH_2OCH_2CF_3$ |
| F-0121 | Cl | F | $CH_2CH_2CH_2OCH_2CF_3$ |
| F-0122 | Cl | F | $CH_2CH_2CH_2CH_2OCH_2CF_3$ |
| F-0123 | Cl | F | $CH_2CH_2CH_2CH_2CH_2OCH_2CF_3$ |
| F-0124 | Cl | F | $CH_2CH_2CH_2CH_2CH_2CH_2OCH_2CF_3$ |
| F-0125 | Cl | F | $CH_2CH_2CH_2CH_2CH_2CH_2CH_2OCH_2CF_3$ |
| F-0126 | Cl | F | $CH_2CH_2OC(CF_3)_3$ |

TABLE 1068

| Compound Number | $R^3$ | $R^4$ | $R^5$ |
|---|---|---|---|
| F-0127 | Cl | F | $CH_2CH_2CH_2OC(CF_3)_3$ |
| F-0128 | Cl | F | $CH_2CH_2CH_2CH_2OC(CF_3)_3$ |
| F-0129 | Cl | F | $CH_2CH_2CH_2CH_2CH_2OC(CF_3)_3$ |
| F-0130 | Cl | F | $CF_2CHFOCF_2CF_2CF_3$ |
| F-0131 | Cl | F | $CH_2CH_2O$(c-Pr) |
| F-0132 | Cl | F | $CH_2CH_2O$(c-Pen) |
| F-0133 | Cl | F | $CH_2CH_2O$(c-Hex) |
| F-0134 | Cl | F | $CH_2CH_2CH_2O$(c-Pr) |
| F-0135 | Cl | F | $CH_2CH_2CH_2O$(c-Pen) |
| F-0136 | Cl | F | $CH_2CH_2CH_2O$(c-Hex) |
| F-0137 | Cl | F | $CH_2CH_2CH_2CH_2O$(c-Pr) |
| F-0138 | Cl | F | $CH_2CH_2CH_2CH_2O$(c-Pen) |
| F-0139 | Cl | F | $CH_2CH_2CH_2CH_2O$(c-Hex) |
| F-0140 | Cl | F | $CH_2CH_2O$[c-Pr(2,2-$F_2$)] |
| F-0141 | Cl | F | $CH_2CH_2CH_2O$[c-Pr(2,2-$F_2$)] |
| F-0142 | Cl | F | $CH_2CH_2CH_2CH_2O$[c-Pr(2,2-$F_2$)] |
| F-0143 | Cl | F | $CH_2CH_2OCH_2CH_2OCH_3$ |
| F-0144 | Cl | F | $CH_2CH_2OCH_2CH_2OCH_2CF_3$ |
| F-0145 | Cl | F | $CH_2CF_2OCF_2CF_2OCF_3$ |
| F-0146 | Cl | F | $CF_2CHFOCF_2CF_2OCF_3$ |
| F-0147 | Cl | F | $CF_2CHFOCF_2CF(CF_3)OCF_2CF_2CF_3$ |
| F-0148 | Cl | F | $CH_2CH_2SH$ |
| F-0149 | Cl | F | $CH_2CH_2CH_2SH$ |
| F-0150 | Cl | F | $CH_2CH_2CH_2CH_2SH$ |
| F-0151 | Cl | F | $CH_2CH_2CH_2CH_2CH_2SH$ |
| F-0152 | Cl | F | $CH_2CH_2CH_2CH_2CH_2CH_2SH$ |
| F-0153 | Cl | F | $CH_2CH_2S$(t-Bu) |
| F-0154 | Cl | F | $CH_2CH_2CH_2S$(t-Bu) |
| F-0155 | Cl | F | $CH_2CH_2CH_2CH_2S$(t-Bu) |
| F-0156 | Cl | F | $CH_2CH_2CH_2CH_2CH_2SCH_3$ |
| F-0157 | Cl | F | $CH_2CH_2CH_2CH_2CH_2SCH(CH_3)_2$ |
| F-0158 | Cl | F | $CH_2CH_2CH_2CH_2CH_2S$(t-Bu) |
| F-0159 | Cl | F | $CH_2CH_2CH_2CH_2CH_2CH_2SCH(CH_3)_2$ |
| F-0160 | Cl | F | $CH_2CH_2CH_2CH_2CH_2CH_2S$(t-Bu) |
| F-0161 | Cl | F | $CH_2CH_2CH_2CH_2CH_2CH_2CH_2S$(t-Bu) |
| F-0162 | Cl | F | $CH_2CH_2SCHF_2$ |
| F-0163 | Cl | F | $CH_2CH_2CH_2SCHF_2$ |
| F-0164 | Cl | F | $CH_2CH_2CH_2CH_2SCHF_2$ |
| F-0165 | Cl | F | $CH_2CH_2CH_2CH_2CH_2SCHF_2$ |
| F-0166 | Cl | F | $CH_2CH_2CH_2CH_2CH_2CH_2SCHF_2$ |
| F-0167 | Cl | F | $CH_2CH_2CH_2CH_2CH_2CH_2CH_2SCHF_2$ |
| F-0168 | Cl | F | $CH_2CH_2SCF_3$ |
| F-0169 | Cl | F | $CH_2CH_2CH_2SCF_3$ |
| F-0170 | Cl | F | $CH_2CH_2CH_2CH_2SCF_3$ |

TABLE 1069

| Compound Number | $R^3$ | $R^4$ | $R^5$ |
|---|---|---|---|
| F-0171 | Cl | F | $CH_2CH_2CH_2CH_2CH_2SCF_3$ |
| F-0172 | Cl | F | $CH_2CH_2CH_2CH_2CH_2CH_2SCF_3$ |
| F-0173 | Cl | F | $CH_2CH_2CH_2CH_2CH_2CH_2CH_2SCF_3$ |
| F-0174 | Cl | F | $CH_2CH_2CH_2CH_2CH_2CH_2CH_2CH_2SCF_3$ |
| F-0175 | Cl | F | $CH_2CH(Me)SCF_3$ |
| F-0176 | Cl | F | $CH(Me)CH_2SCF_3$ |
| F-0177 | Cl | F | $CH_2CH_2CH(Me)SCF_3$ |
| F-0178 | Cl | F | $CH_2CH(Me)CH_2SCF_3$ |
| F-0179 | Cl | F | $CH(Me)CH_2CH_2SCF_3$ |
| F-0180 | Cl | F | $CH_2CH_2CH_2CH(Me)SCF_3$ |
| F-0181 | Cl | F | $CH_2CH_2CH(Me)CH_2SCF_3$ |
| F-0182 | Cl | F | $CH_2CH(Me)CH_2CH_2SCF_3$ |
| F-0183 | Cl | F | $CH(Me)CH_2CH_2CH_2SCF_3$ |
| F-0184 | Cl | F | $CH_2CH_2SCH_2CF_3$ |
| F-0185 | Cl | F | $CH_2CH_2CH_2SCH_2CF_3$ |
| F-0186 | Cl | F | $CH_2CH_2CH_2CH_2SCH_2CF_3$ |
| F-0187 | Cl | F | $CH_2CH_2CH_2CH_2CH_2SCH_2CF_3$ |
| F-0188 | Cl | F | $CH_2CH_2CH_2CH_2CH_2CH_2SCH_2CF_3$ |
| F-0189 | Cl | F | $CH_2CH_2CH_2CH_2CH_2CH_2CH_2SCH_2CF_3$ |
| F-0190 | Cl | F | $CH_2CH_2SCH(CF_3)_2$ |
| F-0191 | Cl | F | $CH_2CH_2CH_2SCH(CF_3)_2$ |
| F-0192 | Cl | F | $CH_2CH_2CH_2CH_2SCH(CF_3)_2$ |
| F-0193 | Cl | F | $CH_2CH_2CH_2CH_2CH_2SCH(CF_3)_2$ |
| F-0194 | Cl | F | $CH_2CH_2CH_2CH_2CH_2CH_2SCH(CF_3)_2$ |
| F-0195 | Cl | F | $CH_2CH_2CH_2CH_2CH_2SCF_2CF_3$ |
| F-0196 | Cl | F | $CH_2CH_2CH_2CH_2CH_2CH_2SCF_2CF_3$ |
| F-0197 | Cl | F | $CH_2CH_2CH_2CH_2CH_2CH_2SCF(CF_3)_2$ |
| F-0198 | Cl | F | $CH_2CH_2CH_2CH_2CH_2CH_2CH_2SCF(CF_3)_2$ |
| F-0199 | Cl | F | $CH_2CH_2CH_2CH_2CH_2SCCl_3$ |
| F-0200 | Cl | F | $CH_2CH_2CH_2CH_2CH_2CH_2SCCl_3$ |
| F-0201 | Cl | F | $CH_2CH_2SCH_2CH{=}CH_2$ |
| F-0202 | Cl | F | $CH_2CH_2CH_2SCH_2CH{=}CH_2$ |
| F-0203 | Cl | F | $CH_2CH_2CH_2CH_2SCH_2CH{=}CH_2$ |
| F-0204 | Cl | F | $CH_2CH_2SCF{=}CFCF_3$ |
| F-0205 | Cl | F | $CH_2CH_2CH_2SCF{=}CFCF_3$ |
| F-0206 | Cl | F | $CH_2CH_2CH_2CH_2SCF{=}CFCF_3$ |
| F-0207 | Cl | F | $CH_2CH_2CH_2S$(c-Pr) |
| F-0208 | Cl | F | $CH_2CH_2CH_2S$(c-Hex) |
| F-0209 | Cl | F | $CH_2CH_2CH_2CH_2S$(c-Pr) |
| F-0210 | Cl | F | $CH_2CH_2CH_2CH_2S$(c-Hex) |
| F-0211 | Cl | F | $CH_2CH_2CH_2CH_2CH_2S$(c-Pr) |
| F-0212 | Cl | F | $CH_2CH_2CH_2CH_2CH_2S$(c-Hex) |
| F-0213 | Cl | F | $CH_2CH_2CH_2S$[c-Hex(4,4-$F_2$)] |
| F-0214 | Cl | F | $CH_2CH_2CH_2CH_2S$[c-Hex(4,4-$F_2$)] |

TABLE 1070

| Compound Number | $R^3$ | $R^4$ | $R^5$ |
|---|---|---|---|
| F-0215 | Cl | F | $CH_2CH_2CH_2CH_2CH_2S$[c-Hex(4,4-$F_2$)] |
| F-0216 | Cl | F | $CH_2CH_2CH_2SCH_2$(c-Pr) |
| F-0217 | Cl | F | $CH_2CH_2CH_2SCH_2$(c-Hex) |
| F-0218 | Cl | F | $CH_2CH_2CH_2CH_2SCH_2$(c-Pr) |
| F-0219 | Cl | F | $CH_2CH_2CH_2CH_2SCH_2$(c-Hex) |
| F-0220 | Cl | F | $CH_2CH_2CH_2CH_2CH_2SCH_2$(c-Pr) |
| F-0221 | Cl | F | $CH_2CH_2CH_2CH_2CH_2SCH_2$(c-Hex) |
| F-0222 | Cl | F | $CH_2CH_2CH_2SCH_2$[c-Hex(4,4-$F_2$)] |
| F-0223 | Cl | F | $CH_2CH_2CH_2CH_2SCH_2$[c-Hex(4,4-$F_2$)] |
| F-0224 | Cl | F | $CH_2CH_2CH_2CH_2CH_2SCH_2$[C-Hex(4,4-$F_2$)] |
| F-0225 | Cl | F | $CH_2CH_2CH_2SCH_2SiMe_3$ |
| F-0226 | Cl | F | $CH_2CH_2CH_2CH_2SCH_2SiMe_3$ |
| F-0227 | Cl | F | $CH_2CH_2CH_2CH_2CH_2SCH_2SiMe_3$ |
| F-0228 | Cl | F | $CH_2CH_2OCH_2CH_2SCH_3$ |
| F-0229 | Cl | F | $CH_2CH_2OCH_2CH_2SCHF_2$ |
| F-0230 | Cl | F | $CH_2CH_2OCH_2CH_2SCF_3$ |
| F-0231 | Cl | F | $CH_2CH_2OCH_2CH_2SCH_2CF_3$ |
| F-0232 | Cl | F | $CH_2CH_2CH_2S({=}O)$(t-Bu) |
| F-0233 | Cl | F | $CH_2CH_2CH_2CH_2S({=}O)$(t-Bu) |
| F-0234 | Cl | F | $CH_2CH_2CH_2CH_2CH_2CH_2CH_2S({=}O)$(t-Bu) |
| F-0235 | Cl | F | $CH_2CH_2S({=}O)CHF_2$ |
| F-0236 | Cl | F | $CH_2CH_2CH_2S({=}O)CHF_2$ |
| F-0237 | Cl | F | $CH_2CH_2CH_2CH_2S({=}O)CHF_2$ |
| F-0238 | Cl | F | $CH_2CH_2CH_2CH_2CH_2CH_2S({=}O)CHF_2$ |

TABLE 1070-continued

| Compound Number | $R^3$ | $R^4$ | $R^5$ |
|---|---|---|---|
| F-0239 | Cl | F | $CH_2CH_2CH_2CH_2CH_2CH_2S(=O)CHF_2$ |
| F-0240 | Cl | F | $CH_2CH_2CH_2CH_2CH_2CH_2CH_2S(=O)CHF_2$ |
| F-0241 | Cl | F | $CH_2CH_2S(=O)CF_3$ |
| F-0242 | Cl | F | $CH_2CH_2CH_2S(=O)CF_3$ |
| F-0243 | Cl | F | $CH_2CH_2CH_2CH_2S(=O)CF_3$ |
| F-0244 | Cl | F | $CH_2CH_2CH_2CH_2CH_2S(=O)CF_3$ |
| F-0245 | Cl | F | $CH_2CH_2CH_2CH_2CH_2CH_2S(=O)CF_3$ |
| F-0246 | Cl | F | $CH_2CH_2CH_2CH_2CH_2CH_2CH_2S(=O)CF_3$ |
| F-0247 | Cl | F | $CH_2CH_2S(=O)CH_2CF_3$ |
| F-0248 | Cl | F | $CH_2CH_2CH_2S(=O)CH_2CF_3$ |
| F-0249 | Cl | F | $CH_2CH_2CH_2CH_2S(=O)CH_2CF_3$ |
| F-0250 | Cl | F | $CH_2CH_2CH_2CH_2CH_2S(=O)CH_2CF_3$ |
| F-0251 | Cl | F | $CH_2CH_2CH_2CH_2CH_2CH_2S(=O)CH_2CF_3$ |
| F-0252 | Cl | F | $CH_2CH_2CH_2CH_2CH_2CH_2CH_2S(=O)CH_2CF_3$ |
| F-0253 | Cl | F | $CH_2CH_2CH_2S(=O)$(c-Pr) |
| F-0254 | Cl | F | $CH_2CH_2CH_2CH_2S(=O)$(c-Pr) |
| F-0255 | Cl | F | $CH_2CH_2CH_2CH_2S(=O)$(c-Pen) |
| F-0256 | Cl | F | $CH_2CH_2CH_2CH_2S(=O)$(c-Hex) |
| F-0257 | Cl | F | $CH_2CH_2CH_2CH_2CH_2S(=O)$(c-Pr) |
| F-0258 | Cl | F | $CH_2CH_2CH_2CH_2CH_2S(=O)$(c-Hex) |

TABLE 1071

| Compound Number | $R^3$ | $R^4$ | $R^5$ |
|---|---|---|---|
| F-0259 | Cl | F | $CH_2CH_2CH_2S(=O)$[c-Hex(4,4-$F_2$)] |
| F-0260 | Cl | F | $CH_2CH_2CH_2CH_2S(=O)$[c-Hex(4,4-$F_2$)] |
| F-0261 | Cl | F | $CH_2CH_2CH_2CH_2CH_2S(=O)$[c-Hex(4,4-$F_2$)] |
| F-0262 | Cl | F | $CH_2CH_2CH_2CH_2S(=O)_2Me$ |
| F-0263 | Cl | F | $CH_2CH_2CH_2CH_2CH_2S(=O)_2Me$ |
| F-0264 | Cl | F | $CH_2CH_2CH_2CH_2CH_2S(=O)_2$(t-Bu) |
| F-0265 | Cl | F | $CH_2CH_2S(=O)_2CHF_2$ |
| F-0266 | Cl | F | $CH_2CH_2CH_2S(=O)_2CHF_2$ |
| F-0267 | Cl | F | $CH_2CH_2CH_2CH_2S(=O)_2CHF_2$ |
| F-0268 | Cl | F | $CH_2CH_2CH_2CH_2CH_2S(=O)_2CHF_2$ |
| F-0269 | Cl | F | $CH_2CH_2CH_2CH_2CH_2CH_2S(=O)_2CHF_2$ |
| F-0270 | Cl | F | $CH_2CH_2S(=O)_2CF_3$ |
| F-0271 | Cl | F | $CH_2CH_2CH_2S(=O)_2CF_3$ |
| F-0272 | Cl | F | $CH_2CH_2CH_2CH_2S(=O)_2CF_3$ |
| F-0273 | Cl | F | $CH_2CH_2CH_2CH_2CH_2S(=O)_2CF_3$ |
| F-0274 | Cl | F | $CH_2CH_2CH_2CH_2CH_2CH_2S(=O)_2CF_3$ |
| F-0275 | Cl | F | $CH_2CH_2CH_2CH_2CH_2CH_2CH_2S(=O)_2CF_3$ |
| F-0276 | Cl | F | $CH_2CH_2CH_2CH_2CH_2CH_2CH_2CH_2S(=O)_2CF_3$ |
| F-0277 | Cl | F | $CH_2CH_2S(=O)_2CH_2CF_3$ |
| F-0278 | Cl | F | $CH_2CH_2CH_2S(=O)_2CH_2CF_3$ |
| F-0279 | Cl | F | $CH_2CH_2CH_2CH_2S(=O)_2CH_2CF_3$ |
| F-0280 | Cl | F | $CH_2CH_2CH_2CH_2CH_2S(=O)_2CH_2CF_3$ |
| F-0281 | Cl | F | $CH_2CH_2CH_2CH_2CH_2CH_2S(=O)_2CH_2CF_3$ |
| F-0282 | Cl | F | $CH_2CH_2CH_2S(=O)_2$(c-Pr) |
| F-0283 | Cl | F | $CH_2CH_2CH_2CH_2S(=O)_2$(c-Pr) |
| F-0284 | Cl | F | $CH_2CH_2CH_2CH_2CH_2S(=O)_2$(c-Pr) |
| F-0285 | Cl | F | $CH_2CH_2CH_2S(=O)_2$[c-Hex(4,4-$F_2$)] |
| F-0286 | Cl | F | $CH_2CH_2CH_2CH_2S(=O)_2$[c-Hex(4,4-$F_2$)] |
| F-0287 | Cl | F | $CH_2CH_2CH_2CH_2CH_2S(=O)_2$[c-Hex(4,4-$F_2$)] |
| F-0288 | Cl | F | $CH_2CH_2CH_2C(=O)H$ |
| F-0289 | Cl | F | $CH_2CH_2CH_2CH_2C(=O)H$ |
| F-0290 | Cl | F | $CH_2CH_2CH_2CH_2CH_2C(=O)H$ |
| F-0291 | Cl | F | $CH_2CH_2CH_2C(=O)$(t-Bu) |
| F-0292 | Cl | F | $CH_2CH_2CH_2CH_2C(=O)$(t-Bu) |
| F-0293 | Cl | F | $CH_2CH_2CH_2CH_2CH_2C(=O)$(t-Bu) |
| F-0294 | Cl | F | $CH_2CH_2CH_2C(=O)CF_3$ |
| F-0295 | Cl | F | $CH_2CH_2CH_2CH_2C(=O)CF_3$ |
| F-0296 | Cl | F | $CH_2CH_2CH_2CH_2CH_2C(=O)CF_3$ |
| F-0297 | Cl | F | $CH_2C(=O)Ph$ |
| F-0298 | Cl | F | $CH_2C(=O)Ph$(4-Cl) |
| F-0299 | Cl | F | $CH_2C(=O)Ph(4\text{-}CF_3)$ |
| F-0300 | Cl | F | $CH_2CH_2C(=O)Ph(4\text{-}CF_3)$ |
| F-0301 | Cl | F | $CH_2CH_2CH_2C(=O)Ph(4\text{-}CF_3)$ |
| F-0302 | Cl | F | $CH_2CH_2CH_2CH_2C(=O)Ph(4\text{-}CF_3)$ |

TABLE 1072

| Compound Number | $R^3$ | $R^4$ | $R^5$ |
|---|---|---|---|
| F-0303 | Cl | F | $CH_2CH_2CH_2CH_2CH_2C(=O)Ph(4\text{-}CF_3)$ |
| F-0304 | Cl | F | $CH_2C(=O)OEt$ |
| F-0305 | Cl | F | $CH_2CH_2C(=O)O$(t-Bu) |
| F-0306 | Cl | F | $CH_2CH_2CH_2C(=O)OEt$ |
| F-0307 | Cl | F | $CH_2CH_2CH_2C(=O)O$(t-Bu) |
| F-0308 | Cl | F | $CH_2CH_2CH_2CH_2C(=O)O$(t-Bu) |
| F-0309 | Cl | F | $CH_2CH_2CH_2CH_2CH_2C(=O)O$(t-Bu) |
| F-0310 | Cl | F | $CH_2CH_2CH_2CH_2CH_2CH_2C(=O)O$(t-Bu) |
| F-0311 | Cl | F | $CH_2CH_2CH_2CH_2CH_2CH_2CH_2C(=O)OEt$ |
| F-0312 | Cl | F | $CH_2CH_2C(=O)OCH_2CF_3$ |
| F-0313 | Cl | F | $CH_2CH_2CH_2C(=O)OCH_2CF_3$ |
| F-0314 | Cl | F | $CH_2CH_2CH_2CH_2C(=O)OCH_2CF_3$ |
| F-0315 | Cl | F | $CH_2CH_2CH_2CH_2CH_2C(=O)OCH_2CF_3$ |
| F-0316 | Cl | F | $CH_2CH_2C(=O)NH$(t-Bu) |
| F-0317 | Cl | F | $CH_2CH_2CH_2C(=O)NH$(t-Bu) |
| F-0318 | Cl | F | $CH_2CH_2CH_2C(=O)NH$(t-Pen) |
| F-0319 | Cl | F | $CH_2CH_2CH_2CH_2C(=O)NH$(t-Bu) |
| F-0320 | Cl | F | $CH_2CH_2C(=O)NHCH_2CF_3$ |
| F-0321 | Cl | F | $CH_2CH_2CH_2C(=O)NHCH_2CF_3$ |
| F-0322 | Cl | F | $CH_2CH_2CH_2CH_2C(=O)NHCH_2CF_3$ |
| F-0323 | Cl | F | $CH_2CH_2SC(=O)N(Me)_2$ |
| F-0324 | Cl | F | $CH_2CH_2CH_2SC(=O)N(Me)_2$ |
| F-0325 | Cl | F | $CH_2CH_2CH_2SC(=O)NH$(t-Bu) |
| F-0326 | Cl | F | $CH_2CH_2CH_2CH_2CH_2SC(=O)NH$(t-Bu) |
| F-0327 | Cl | F | $CH_2CH_2SC(=O)NHCH_2CF_3$ |
| F-0328 | Cl | F | $CH_2CH_2CH_2SC(=O)NHCH_2CF_3$ |
| F-0329 | Cl | F | $CH_2CH_2CH_2CH_2SC(=O)NHCH_2CF_3$ |
| F-0330 | Cl | F | $CH_2CH_2CH_2OC(=O)H$ |
| F-0331 | Cl | F | $CH_2CH_2CH_2CH_2OC(=O)H$ |
| F-0332 | Cl | F | $CH_2CH_2CH_2CH_2CH_2OC(=O)H$ |
| F-0333 | Cl | F | $CH_2CH_2CH_2OC(=O)Me$ |
| F-0334 | Cl | F | $CH_2CH_2CH_2CH_2OC(=O)Me$ |
| F-0335 | Cl | F | $CH_2CH_2CH_2CH_2CH_2OC(=O)Me$ |
| F-0336 | Cl | F | $CH_2CH_2OC(=O)CF_3$ |
| F-0337 | Cl | F | $CH_2CH_2CH_2OC(=O)CF_3$ |
| F-0338 | Cl | F | $CH_2CH_2CH_2CH_2OC(=O)CF_3$ |
| F-0339 | Cl | F | $CH_2CH_2CH_2CH_2CH_2OC(=O)Ph(4\text{-}CF_3)$ |
| F-0340 | Cl | F | $CH_2CH_2OC(=O)Ph$ |
| F-0341 | Cl | F | $CH_2CH_2OC(=O)Ph(4\text{-}CF_3)$ |
| F-0342 | Cl | F | $CH_2CH_2CH_2OC(=O)Ph(4\text{-}CF_3)$ |
| F-0343 | Cl | F | $CH_2CH_2CH_2CH_2OC(=O)Ph(4\text{-}CF_3)$ |
| F-0344 | Cl | F | $CH_2CH_2CH_2CH_2CH_2OC(=O)Ph(4\text{-}CF_3)$ |
| F-0345 | Cl | F | $CH_2CH_2OS(=O)Me$ |
| F-0346 | Cl | F | $CH_2CH_2CH_2OS(=O)Me$ |

TABLE 1073

| Compound Number | $R^3$ | $R^4$ | $R^5$ |
|---|---|---|---|
| F-0347 | Cl | F | $CH_2CH_2CH_2CH_2OS(=O)Me$ |
| F-0348 | Cl | F | $CH_2CH_2CH_2CH_2CH_2OS(=O)Me$ |
| F-0349 | Cl | F | $CH_2CH_2CH_2CH_2CH_2CH_2OS(=O)Me$ |
| F-0350 | Cl | F | $CH_2CH_2OS(=O)CF_3$ |
| F-0351 | Cl | F | $CH_2CH_2CH_2OS(=O)CF_3$ |
| F-0352 | Cl | F | $CH_2CH_2CH_2CH_2OS(=O)CF_3$ |
| F-0353 | Cl | F | $CH_2CH_2CH_2CH_2CH_2OS(=O)CF_3$ |
| F-0354 | Cl | F | $CH_2CH_2CH_2CH_2CH_2CH_2OS(=O)CF_3$ |
| F-0355 | Cl | F | $CH_2CH_2OS(=O)Ph$ |
| F-0356 | Cl | F | $CH_2CH_2OS(=O)Ph$(4-Me) |
| F-0357 | Cl | F | $CH_2CH_2CH_2OS(=O)Ph$ |
| F-0358 | Cl | F | $CH_2CH_2CH_2OS(=O)Ph$(4-Me) |
| F-0359 | Cl | F | $CH_2CH_2OS(=O)_2Me$ |
| F-0360 | Cl | F | $CH_2CH_2CH_2OS(=O)_2Me$ |
| F-0361 | Cl | F | $CH_2CH_2CH_2OS(=O)_2CF_3$ |
| F-0362 | Cl | F | $CH_2CH_2CH_2CH_2OS(=O)_2CF_3$ |
| F-0363 | Cl | F | $CH_2CH_2CH_2CH_2CH_2OS(=O)_2CF_3$ |
| F-0364 | Cl | F | $CH_2CH_2CH_2CH_2CH_2OS(=O)_2CF_2CF_2CF_2CF_3$ |
| F-0365 | Cl | F | $CH_2CH_2OS(=O)_2Ph$ |
| F-0366 | Cl | F | $CH_2CH_2OS(=O)_2Ph$(4-Me) |
| F-0367 | Cl | F | $CH_2CH_2CH_2OS(=O)_2Ph$ |
| F-0368 | Cl | F | $CH_2CH_2CH_2OS(=O)_2Ph$(4-Me) |
| F-0369 | Cl | F | $CH_2CH_2NH_2$ |
| F-0370 | Cl | F | $CH_2CH_2CH_2NH_2$ |

TABLE 1073-continued

| Compound Number | $R^3$ | $R^4$ | $R^5$ |
|---|---|---|---|
| F-0371 | Cl | F | $CH_2CH_2CH_2CH_2NH_2$ |
| F-0372 | Cl | F | $CH_2CH_2CH_2CH_2CH_2NH_2$ |
| F-0373 | Cl | F | $CH_2CH_2CH_2CH_2CH_2CH_2NH_2$ |
| F-0374 | Cl | F | $CH_2CH_2CH_2CH_2CH_2CH_2CH_2NH_2$ |
| F-0375 | Cl | F | $CH_2CH(Me)NH_2$ |
| F-0376 | Cl | F | $CH_2C$*$H(Me)NH_2$:(R) |
| F-0377 | Cl | F | $CH_2C$*$H(Me)NH_2$:(S) |
| F-0378 | Cl | F | $CH_2CH(Et)NH_2$ |
| F-0379 | Cl | F | $CH_2CH$(i-Pr)$NH_2$ |
| F-0380 | Cl | F | $CH(Me)CH_2NH_2$ |
| F-0381 | Cl | F | $CH(Et)CH_2NH_2$ |
| F-0382 | Cl | F | CH(i-Pr)$CH_2NH_2$ |
| F-0383 | Cl | F | $CH_2CH_2CH(Me)NH_2$ |
| F-0384 | Cl | F | $CH_2CH(Me)CH_2NH_2$ |
| F-0385 | Cl | F | $CH(Me)CH_2CH_2NH_2$ |
| F-0386 | Cl | F | $CH_2CH(Me)NH$(c-Pr) |
| F-0387 | Cl | F | $CH_2CH(Me)N$(c-Pr)$S(=O)_2CF_3$ |
| F-0388 | Cl | F | $CH_2CH(Me)NHOMe$ |
| F-0389 | Cl | F | $CH_2CH(Me)N(OMe)S(=O)_2CF_3$ |
| F-0390 | Cl | F | $CH_2CH(Me)N(OMe)S(=O)_2Ph(2\text{-}NO_2)$ |

TABLE 1074

| Compound Number | $R^3$ | $R^4$ | $R^5$ |
|---|---|---|---|
| F-0391 | Cl | F | $CH_2CH(Me)N(OMe)S(=O)_2Ph(4\text{-}NO_2)$ |
| F-0392 | Cl | F | $CH_2CH_2N(Me)$(t-Bu) |
| F-0393 | Cl | F | $CH_2CH_2CH_2N(Me)$(t-Bu) |
| F-0394 | Cl | F | $CH_2CH_2CH_2CH_2N(Me)$(t-Bu) |
| F-0395 | Cl | F | $CH_2CH_2NHCH_2CF_3$ |
| F-0396 | Cl | F | $CH_2CH_2CH_2NHCH_2CF_3$ |
| F-0397 | Cl | F | $CH_2CH_2CH_2CH_2NHCH_2CF_3$ |
| F-0398 | Cl | F | $CH_2CH_2NHC(=O)C(Me)(CF_3)_2$ |
| F-0399 | Cl | F | $CH_2CH_2NHC(=O)Me$ |
| F-0400 | Cl | F | $CH_2CH_2NHC(=O)$(t-Bu) |
| F-0401 | Cl | F | $CH_2CH_2CH_2CH_2NHC(=O)CH(CH_3)_2$ |
| F-0402 | Cl | F | $CH_2CH_2CH_2CH_2NHC(=O)$(t-Bu) |
| F-0403 | Cl | F | $CH_2CH_2CH_2CH_2NHC(=O)CH_2$(t-Bu) |
| F-0404 | Cl | F | $CH_2CH_2NHC(=O)CF_3$ |
| F-0405 | Cl | F | $CH_2CH_2NHC(=O)CH_2CF_3$ |
| F-0406 | Cl | F | $CH_2CH_2NHC(=O)CF_2CF_3$ |
| F-0407 | Cl | F | $CH_2CH_2CH_2NHC(=O)CF_3$ |
| F-0408 | Cl | F | $CH_2CH_2CH_2NHC(=O)CH_2CF_3$ |
| F-0409 | Cl | F | $CH_2CH_2CH_2NHC(=O)CF_2CF_3$ |
| F-0410 | Cl | F | $CH_2CH_2CH_2CH_2NHC(=O)CF_3$ |
| F-0411 | Cl | F | $CH_2CH_2CH_2CH_2NHC(=O)CH_2CF_3$ |
| F-0412 | Cl | F | $CH_2CH_2CH_2CH_2NHC(=O)CF_2CF_3$ |
| F-0413 | Cl | F | $CH_2CH_2CH_2CH_2NHC(=O)CF(CF_3)_2$ |
| F-0414 | Cl | F | $CH_2CH_2CH_2CH_2NHC(=O)CCl_3$ |
| F-0415 | Cl | F | $CH_2CH_2NHC(=O)Ph$ |
| F-0416 | Cl | F | $CH_2CH_2NHC(=O)Ph(4\text{-}CF_3)$ |
| F-0417 | Cl | F | $CH_2CH_2CH_2NHC(=O)Ph(4\text{-}CF_3)$ |
| F-0418 | Cl | F | $CH_2CH_2CH_2CH_2NHC(=O)Ph(4\text{-}CF_3)$ |
| F-0419 | Cl | F | $CH_2CH_2NHC(=O)O$(t-Bu) |
| F-0420 | Cl | F | $CH_2CH_2CH_2NHC(=O)O$(t-Bu) |
| F-0421 | Cl | F | $CH_2CH_2CH_2CH_2NHC(=O)O$(t-Bu) |
| F-0422 | Cl | F | $CH_2CH_2CH_2CH_2NHC(=O)OCH(CH_3)_2$ |
| F-0423 | Cl | F | $CH_2CH(Me)NHC(=O)O$(t-Bu) |
| F-0424 | Cl | F | $CH_2C$*$H(Me)NHC(=O)O$(t-Bu):(R) |
| F-0425 | Cl | F | $CH_2C$*$H(Me)NHC(=O)O$(t-Bu):(S) |
| F-0426 | Cl | F | $CH_2CH(Et)NHC(=O)O$(t-Bu) |
| F-0427 | Cl | F | $CH_2CH$(i-Pr)$NHC(=O)O$(t-Bu) |
| F-0428 | Cl | F | $CH(Me)CH_2NHC(=O)O$(t-Bu) |
| F-0429 | Cl | F | $CH(Et)CH_2NHC(=O)O$(t-Bu) |
| F-0430 | Cl | F | CH(i-Pr)$CH_2NHC(=O)O$(t-Bu) |
| F-0431 | Cl | F | $CH_2CH(Me)CH_2NHC(=O)O$(t-Bu) |
| F-0432 | Cl | F | $CH_2CH_2NHC(=O)OC(Me)_2CF_3$ |
| F-0433 | Cl | F | $CH_2CH_2CH_2NHC(=O)OCH_2CF_3$ |
| F-0434 | Cl | F | $CH_2CH_2CH_2NHC(=O)OCH_2CH_2CF_3$ |

TABLE 1075

| Compound Number | $R^3$ | $R^4$ | $R^5$ |
|---|---|---|---|
| F-0435 | Cl | F | $CH_2CH_2CH_2CH_2NHC(=O)OCH_2CCl_3$ |
| F-0436 | Cl | F | $CH_2CH_2CH_2CH_2NHC(=O)OCH_2CF_3$ |
| F-0437 | Cl | F | $CH_2CH_2NHC(=O)NH$(t-Bu) |
| F-0438 | Cl | F | $CH_2CH_2CH_2NHC(=O)NH$(t-Bu) |
| F-0439 | Cl | F | $CH_2CH_2CH_2CH_2NHC(=O)NHEt$ |
| F-0440 | Cl | F | $CH_2CH_2CH_2CH_2NHC(=O)NH$(t-Bu) |
| F-0441 | Cl | F | $CH_2CH_2CH_2NHC(=O)NHCH_2CCl_3$ |
| F-0442 | Cl | F | $CH_2CH_2CH_2NHC(=O)NHCH_2CH_2F$ |
| F-0443 | Cl | F | $CH_2CH_2CH_2NHC(=O)NHCH_2CF_3$ |
| F-0444 | Cl | F | $CH_2CH_2CH_2CH_2NHC(=O)NHCH_2CCl_3$ |
| F-0445 | Cl | F | $CH_2CH_2CH_2CH_2NHC(=O)NHCH_2CH_2F$ |
| F-0446 | Cl | F | $CH_2CH_2CH_2CH_2NHC(=O)NHCH_2CF_3$ |
| F-0447 | Cl | F | $CH_2CH_2NHS(=O)Me$ |
| F-0448 | Cl | F | $CH_2CH_2CH_2NHS(=O)Me$ |
| F-0449 | Cl | F | $CH_2CH_2CH_2CH_2NHS(=O)Me$ |
| F-0450 | Cl | F | $CH_2CH_2CH_2CH_2NHS(=O)CH(CH_3)_2$ |
| F-0451 | Cl | F | $CH_2CH_2CH_2CH_2CH_2NHS(=O)Me$ |
| F-0452 | Cl | F | $CH_2CH_2NHS(=O)CHF_2$ |
| F-0453 | Cl | F | $CH_2CH_2CH_2NHS(=O)CHF_2$ |
| F-0454 | Cl | F | $CH_2CH_2CH_2CH_2NHS(=O)CHF_2$ |
| F-0455 | Cl | F | $CH_2CH_2CH_2CH_2CH_2NHS(=O)CHF_2$ |
| F-0456 | Cl | F | $CH_2CH(Me)NHS(=O)CHF_2$ |
| F-0457 | Cl | F | $CH(Me)CH_2NHS(=O)CHF_2$ |
| F-0458 | Cl | F | $CH_2CH_2CH(Me)NHS(=O)CHF_2$ |
| F-0459 | Cl | F | $CH_2CH(Me)CH_2NHS(=O)CHF_2$ |
| F-0460 | Cl | F | $CH(Me)CH_2CH_2NHS(=O)CHF_2$ |
| F-0461 | Cl | F | $CH_2CH_2NHS(=O)CF_3$ |
| F-0462 | Cl | F | $CH_2CH_2CH_2NHS(=O)CF_3$ |
| F-0463 | Cl | F | $CH_2CH_2CH_2CH_2NHS(=O)CF_3$ |
| F-0464 | Cl | F | $CH_2CH_2CH_2CH_2CH_2NHS(=O)CF_3$ |
| F-0465 | Cl | F | $CH_2CH_2CH_2NHS(=O)Ph$ |
| F-0466 | Cl | F | $CH_2CH_2CH_2CH_2NHS(=O)Ph$ |
| F-0467 | Cl | F | $CH_2CH_2CH_2CH_2CH_2NHS(=O)Ph$ |
| F-0468 | Cl | F | $CH_2CH_2CH_2CH_2CH_2NHS(=O)Ph(4\text{-}CF_3)$ |
| F-0469 | Cl | F | $CH_2CH(Me)NHS(=O)Ph(4\text{-}CF_3)$ |
| F-0470 | Cl | F | $CH_2CH(Et)NHS(=O)Ph(4\text{-}CF_3)$ |
| F-0471 | Cl | F | $CH(Me)CH_2NHS(=O)Ph(4\text{-}CF_3)$ |
| F-0472 | Cl | F | $CH(Et)CH_2NHS(=O)Ph(4\text{-}CF_3)$ |
| F-0473 | Cl | F | $CH_2CH(Et)CH_2NHS(=O)Ph(4\text{-}CF_3)$ |
| F-0474 | Cl | F | $CH_2CH_2NHS(=O)_2Me$ |
| F-0475 | Cl | F | $CH_2CH_2CH_2NHS(=O)_2Me$ |
| F-0476 | Cl | F | $CH_2CH_2CH_2CH_2NHS(=O)_2Me$ |
| F-0477 | Cl | F | $CH_2CH_2CH_2CH_2NHS(=O)_2CH(CH_3)_2$ |
| F-0478 | Cl | F | $CH_2CH_2CH_2CH_2CH_2NHS(=O)_2Me$ |

TABLE 1076

| Compound Number | $R^3$ | $R^4$ | $R^5$ |
|---|---|---|---|
| F-0479 | Cl | F | $CH_2CH_2NHS(=O)_2CHF_2$ |
| F-0480 | Cl | F | $CH_2CH_2CH_2NHS(=O)_2CHF_2$ |
| F-0481 | Cl | F | $CH_2CH_2CH_2CH_2NHS(=O)_2CHF_2$ |
| F-0482 | Cl | F | $CH_2CH_2CH_2CH_2CH_2NHS(=O)_2CHF_2$ |
| F-0483 | Cl | F | $CH_2CH(Me)NHS(=O)_2CHF_2$ |
| F-0484 | Cl | F | $CH(Me)CH_2NHS(=O)_2CHF_2$ |
| F-0485 | Cl | F | $CH_2CH_2CH(Me)NHS(=O)_2CHF_2$ |
| F-0486 | Cl | F | $CH_2CH(Me)CH_2NHS(=O)_2CHF_2$ |
| F-0487 | Cl | F | $CH(Me)CH_2CH_2NHS(=O)_2CHF_2$ |
| F-0488 | Cl | F | $CH_2CH(Me)N(Me)S(=O)_2CHF_2$ |
| F-0489 | Cl | F | $CH(Me)CH_2N(Me)S(=O)_2CHF_2$ |
| F-0490 | Cl | F | $CH_2CH_2CH(Me)N(Me)S(=O)_2CHF_2$ |
| F-0491 | Cl | F | $CH_2CH(Me)CH_2N(Me)S(=O)_2CHF_2$ |
| F-0492 | Cl | F | $CH(Me)CH_2CH_2N(Me)S(=O)_2CHF_2$ |
| F-0493 | Cl | F | $CH_2CH_2NHS(=O)_2CF_3$ |
| F-0494 | Cl | F | $CH_2CH_2CH_2NHS(=O)_2CF_3$ |
| F-0495 | Cl | F | $CH_2CH_2CH_2CH_2NHS(=O)_2CF_3$ |
| F-0496 | Cl | F | $CH_2CH_2CH_2CH_2CH_2NHS(=O)_2CF_3$ |
| F-0497 | Cl | F | $CH_2CH_2N(Me)S(=O)_2CF_3$ |
| F-0498 | Cl | F | $CH_2CH_2N(Et)S(=O)_2CF_3$ |
| F-0499 | Cl | F | $CH_2CH_2N(CH_2CN)S(=O)_2CF_3$ |
| F-0500 | Cl | F | $CH_2CH_2N(CH_2OMe)S(=O)_2CF_3$ |
| F-0501 | Cl | F | $CH_2CH_2CH_2N(Me)S(=O)_2CF_3$ |
| F-0502 | Cl | F | $CH_2CH_2CH_2N(Et)S(=O)_2CF_3$ |

TABLE 1076-continued

| Compound Number | $R^3$ | $R^4$ | $R^5$ |
|---|---|---|---|
| F-0503 | Cl | F | $CH_2CH_2CH_2N(CH_2CN)S(=O)_2CF_3$ |
| F-0504 | Cl | F | $CH_2CH_2CH_2N(CH_2OMe)S(=O)_2CF_3$ |
| F-0505 | Cl | F | $CH_2CH_2CH_2CH_2N(Me)S(=O)_2CF_3$ |
| F-0506 | Cl | F | $CH_2CH_2CH_2CH_2N(Et)S(=O)_2CF_3$ |
| F-0507 | Cl | F | $CH_2CH_2CH_2CH_2N(CH_2CN)S(=O)_2CF_3$ |
| F-0508 | Cl | F | $CH_2CH_2CH_2CH_2N(CH_2OMe)S(=O)_2CF_3$ |
| F-0509 | Cl | F | $CH_2CH(Me)NHS(=O)_2CF_3$ |
| F-0510 | Cl | F | $CH_2C^*H(Me)NHS(=O)_2CF_3$:(R) |
| F-0511 | Cl | F | $CH_2C^*H(Me)NHS(=O)_2CF_3$:(S) |
| F-0512 | Cl | F | $CH(Me)CH_2NHS(=O)_2CF_3$ |
| F-0513 | Cl | F | $CH_2CH_2CH(Me)NHS(=O)_2CF_3$ |
| F-0514 | Cl | F | $CH_2CH(Me)CH_2NHS(=O)_2CF_3$ |
| F-0515 | Cl | F | $CH(Me)CH_2CH_2NHS(=O)_2CF_3$ |
| F-0516 | Cl | F | $CH_2CH(Me)N(Me)S(=O)_2CF_3$ |
| F-0517 | Cl | F | $CH(Me)CH_2N(Me)S(=O)_2CF_3$ |
| F-0518 | Cl | F | $CH_2CH_2CH(Me)N(Me)S(=O)_2CF_3$ |
| F-0519 | Cl | F | $CH_2CH(Me)CH_2N(Me)S(=O)_2CF_3$ |
| F-0520 | Cl | F | $CH(Me)CH_2CH_2N(Me)S(=O)_2CF_3$ |
| F-0521 | Cl | F | $CH_2CH_2CH_2NHS(=O)_2Ph$ |
| F-0522 | Cl | F | $CH_2CH_2CH_2CH_2NHS(=O)_2Ph$ |

TABLE 1077

| Compound Number | $R^3$ | $R^4$ | $R^5$ |
|---|---|---|---|
| F-0523 | Cl | F | $CH_2CH_2CH_2CH_2CH_2NHS(=O)_2Ph$ |
| F-0524 | Cl | F | $CH_2CH_2CH_2CH_2CH_2NHS(=O)_2Ph(4\text{-}CF_3)$ |
| F-0525 | Cl | F | $CH_2CH(Me)NHS(=O)_2Ph(4\text{-}CF_3)$ |
| F-0526 | Cl | F | $CH_2CH(Et)NHS(=O)_2Ph(4\text{-}CF_3)$ |
| F-0527 | Cl | F | $CH(Me)CH_2NHS(=O)_2Ph(4\text{-}CF_3)$ |
| F-0528 | Cl | F | $CH(Et)CH_2NHS(=O)_2Ph(4\text{-}CF_3)$ |
| F-0529 | Cl | F | $CH_2CH(Me)CH_2NHS(=O)_2Ph(4\text{-}CF_3)$ |
| F-0530 | Cl | F | $CH_2CH_2SiMe_3$ |
| F-0531 | Cl | F | $CH_2CH_2CH_2SiMe_3$ |
| F-0532 | Cl | F | $CH_2CH_2CH_2CH_2SiMe_3$ |
| F-0533 | Cl | F | $CH_2Ph$ |
| F-0534 | Cl | F | $CH_2Ph(2\text{-}CF_3)$ |
| F-0535 | Cl | F | $CH_2Ph(3\text{-}CF_3)$ |
| F-0536 | Cl | F | $CH_2Ph(4\text{-}CF_3)$ |
| F-0537 | Cl | F | $CH_2Ph(2\text{-}OCF_3)$ |
| F-0538 | Cl | F | $CH_2Ph(3\text{-}OCF_3)$ |
| F-0539 | Cl | F | $CH_2Ph(4\text{-}OCF_3)$ |
| F-0540 | Cl | F | $CH_2Ph(2\text{-}SCF_3)$ |
| F-0541 | Cl | F | $CH_2Ph(3\text{-}SCF_3)$ |
| F-0542 | Cl | F | $CH_2Ph(4\text{-}SCF_3)$ |
| F-0543 | Cl | F | $CH_2Ph(3\text{-}CH_2SCF_3)$ |
| F-0544 | Cl | F | $CH_2Ph(4\text{-}F)$ |
| F-0545 | Cl | F | $CH_2Ph(4\text{-}Cl)$ |
| F-0546 | Cl | F | $CH_2Ph(4\text{-}Br)$ |
| F-0547 | Cl | F | $CH_2Ph(4\text{-}Me)$ |
| F-0548 | Cl | F | $CH_2Ph[4\text{-}(t\text{-}Bu)]$ |
| F-0549 | Cl | F | $CH_2Ph(4\text{-}CN)$ |
| F-0550 | Cl | F | $CH_2Ph(4\text{-}NO_2)$ |
| F-0551 | Cl | F | $CH_2Ph(4\text{-}OCHF_2)$ |
| F-0552 | Cl | F | $CH_2Ph(4\text{-}SCHF_2)$ |
| F-0553 | Cl | F | $CH_2Ph(4\text{-}CH_2SCF_3)$ |
| F-0554 | Cl | F | $CH_2Ph[4\text{-}CF(CF_3)_2]$ |
| F-0555 | Cl | F | $CH_2Ph(4\text{-}CH_2SCF_3)$ |
| F-0556 | Cl | F | $CH_2Ph[4\text{-}Ph(4\text{-}CF_3)]$ |
| F-0557 | Cl | F | $CH_2Ph(2,4\text{-}Cl_2)$ |
| F-0558 | Cl | F | $CH_2Ph[2,5\text{-}(CF_3)_2]$ |
| F-0559 | Cl | F | $CH_2Ph(3,4\text{-}Cl_2)$ |
| F-0560 | Cl | F | $CH_2Ph(3\text{-}CF_3\text{-}4\text{-}F)$ |
| F-0561 | Cl | F | $CH_2Ph(3\text{-}CF_3\text{-}4\text{-}Cl)$ |
| F-0562 | Cl | F | $CH_2Ph(3\text{-}F\text{-}4\text{-}CF_3)$ |
| F-0563 | Cl | F | $CH_2Ph(2,4,6\text{-}F_3)$ |
| F-0564 | Cl | F | $CH_2Ph(3,4,5\text{-}F_3)$ |
| F-0565 | Cl | F | $CH_2Ph(2,3,4\text{-}F_3)$ |
| F-0566 | Cl | F | $CH_2Ph(3,4,5\text{-}Cl_3)$ |

TABLE 1078

| Compound Number | $R^3$ | $R^4$ | $R^5$ |
|---|---|---|---|
| F-0567 | Cl | F | $CH_2CH_2Ph$ |
| F-0568 | Cl | F | $CH_2CH_2Ph(4\text{-}F)$ |
| F-0569 | Cl | F | $CH_2CH_2Ph(4\text{-}Cl)$ |
| F-0570 | Cl | F | $CH_2CH_2Ph(4\text{-}Br)$ |
| F-0571 | Cl | F | $CH_2CH_2Ph[4\text{-}(t\text{-}Bu)]$ |
| F-0572 | Cl | F | $CH_2CH_2Ph(2\text{-}CF_3)$ |
| F-0573 | Cl | F | $CH_2CH_2Ph(3\text{-}CF_3)$ |
| F-0574 | Cl | F | $CH_2CH_2Ph(4\text{-}CF_3)$ |
| F-0575 | Cl | F | $CH_2CH_2Ph[4\text{-}CF(CF_3)_2]$ |
| F-0576 | Cl | F | $CH_2CH_2Ph[4\text{-}(c\text{-}Pr)]$ |
| F-0577 | Cl | F | $CH_2CH_2Ph\{4\text{-}[c\text{-}Pr(2,2\text{-}F_2)]\}$ |
| F-0578 | Cl | F | $CH_2CH_2Ph(4\text{-}OMe)$ |
| F-0579 | Cl | F | $CH_2CH_2Ph(3\text{-}OCF_3)$ |
| F-0580 | Cl | F | $CH_2CH_2Ph(4\text{-}OCHF_2)$ |
| F-0581 | Cl | F | $CH_2CH_2Ph(4\text{-}OCF_3)$ |
| F-0582 | Cl | F | $CH_2CH_2Ph(4\text{-}SMe)$ |
| F-0583 | Cl | F | $CH_2CH_2Ph(4\text{-}SCHF_2)$ |
| F-0584 | Cl | F | $CH_2CH_2Ph(4\text{-}SCF_3)$ |
| F-0585 | Cl | F | $CH_2CH_2Ph[4\text{-}S(=O)Me]$ |
| F-0586 | Cl | F | $CH_2CH_2Ph[4\text{-}S(=O)CF_3]$ |
| F-0587 | Cl | F | $CH_2CH_2Ph[4\text{-}S(=O)_2Me]$ |
| F-0588 | Cl | F | $CH_2CH_2Ph[4\text{-}S(=O)_2CF_3]$ |
| F-0589 | Cl | F | $CH_2CH_2Ph(4\text{-}CH_2SMe)$ |
| F-0590 | Cl | F | $CH_2CH_2Ph(4\text{-}CH_2SCF_3)$ |
| F-0591 | Cl | F | $CH_2CH_2Ph[4\text{-}OS(=O)_2Me]$ |
| F-0592 | Cl | F | $CH_2CH_2Ph[4\text{-}OS(=O)_2CF_3]$ |
| F-0593 | Cl | F | $CH_2CH_2Ph[4\text{-}Ph(4\text{-}CF_3)]$ |
| F-0594 | Cl | F | $CH_2CH_2Ph(4\text{-}CH_2Ph)$ |
| F-0595 | Cl | F | $CH_2CH_2Ph(4\text{-}OCH_2Ph)$ |
| F-0596 | Cl | F | $CH_2CH_2Ph(4\text{-}CN)$ |
| F-0597 | Cl | F | $CH_2CH_2Ph(4\text{-}NO_2)$ |
| F-0598 | Cl | F | $CH_2CH_2Ph(2,4\text{-}Cl_2)$ |
| F-0599 | Cl | F | $CH_2CH_2Ph(3,4\text{-}Cl_2)$ |
| F-0600 | Cl | F | $CH_2CH_2Ph(3\text{-}CF_3\text{-}4\text{-}F)$ |
| F-0601 | Cl | F | $CH_2CH_2Ph(2\text{-}CF_3\text{-}4\text{-}F)$ |
| F-0602 | Cl | F | $CH_2CH_2Ph(3\text{-}F\text{-}4\text{-}CF_3)$ |
| F-0603 | Cl | F | $CH_2CH_2Ph(2\text{-}F\text{-}4\text{-}CF_3)$ |
| F-0604 | Cl | F | $CH_2CH_2Ph(3\text{-}Cl\text{-}4\text{-}OCHF_2)$ |
| F-0605 | Cl | F | $CH_2CH_2Ph(3,4,5\text{-}Cl_3)$ |
| F-0606 | Cl | F | $CH_2CH_2Ph(2,3,4\text{-}F_3)$ |
| F-0607 | Cl | F | $CH_2CH_2Ph(2,4,5\text{-}F_3)$ |
| F-0608 | Cl | F | $CH_2CH_2Ph(3,4,5\text{-}F_3)$ |
| F-0609 | Cl | F | $CH_2CH_2Ph(2,4,6\text{-}F_3)$ |
| F-0610 | Cl | F | $CH_2CH_2CH_2Ph$ |

TABLE 1079

| Compound Number | $R^3$ | $R^4$ | $R^5$ |
|---|---|---|---|
| F-0611 | Cl | F | $CH_2CH_2CH_2Ph(3\text{-}CF_3)$ |
| F-0612 | Cl | F | $CH_2CH_2CH_2Ph(4\text{-}CF_3)$ |
| F-0613 | Cl | F | $CH_2CH_2CH_2Ph(4\text{-}F)$ |
| F-0614 | Cl | F | $CH_2CH_2CH_2Ph[4\text{-}(t\text{-}Bu)]$ |
| F-0615 | Cl | F | $CH_2CH_2CH_2Ph(4\text{-}CN)$ |
| F-0616 | Cl | F | $CH_2CH_2CH_2Ph(4\text{-}CF_3)$ |
| F-0617 | Cl | F | $CH_2CH_2CH_2Ph(4\text{-}OCHF_2)$ |
| F-0618 | Cl | F | $CH_2CH_2CH_2Ph(4\text{-}OCF_3)$ |
| F-0619 | Cl | F | $CH_2CH_2CH_2Ph(4\text{-}SCHF_2)$ |
| F-0620 | Cl | F | $CH_2CH_2CH_2Ph(4\text{-}SCF_3)$ |
| F-0621 | Cl | F | $CH_2CH_2CH_2Ph[4\text{-}CF(CF_3)_2]$ |
| F-0622 | Cl | F | $CH_2CH_2CH_2Ph(3,4,5\text{-}F_3)$ |
| F-0623 | Cl | F | $CH_2CH_2CH_2Ph(2,4,6\text{-}F_3)$ |
| F-0624 | Cl | F | $CH_2CH_2CH_2CH_2Ph$ |
| F-0625 | Cl | F | $CH_2CH_2CH_2CH_2Ph(4\text{-}F)$ |
| F-0626 | Cl | F | $CH_2CH_2CH_2CH_2Ph(4\text{-}CF_3)$ |
| F-0627 | Cl | F | $CH_2CH_2CH_2CH_2Ph(4\text{-}OCF_3)$ |
| F-0628 | Cl | F | $CH_2CH_2CH_2CH_2Ph(4\text{-}SCF_3)$ |
| F-0629 | Cl | F | $CH_2CH_2CH_2CH_2CH_2Ph$ |
| F-0630 | Cl | F | $CH_2CH_2CH_2CH_2CH_2CH_2Ph$ |
| F-0631 | Cl | F | $CH_2CF_2Ph(4\text{-}F)$ |
| F-0632 | Cl | F | $CH_2CF_2Ph(4\text{-}CF_3)$ |
| F-0633 | Cl | F | $CH_2CF_2Ph(3,4,5\text{-}F_3)$ |
| F-0634 | Cl | F | $CH_2CH_2OPh$ |

TABLE 1079-continued

| Compound Number | $R^3$ | $R^4$ | $R^5$ |
|---|---|---|---|
| F-0635 | Cl | F | $CH_2CH_2OPh(4\text{-}F)$ |
| F-0636 | Cl | F | $CH_2CH_2OPh(4\text{-}CF_3)$ |
| F-0637 | Cl | F | $CH_2CH_2CH_2OPh$ |
| F-0638 | Cl | F | $CH_2CH_2CH_2OPh(4\text{-}Cl)$ |
| F-0639 | Cl | F | $CH_2CH_2CH_2OPh(4\text{-}CF_3)$ |
| F-0640 | Cl | F | $CH_2CH_2CH_2CH_2OPh(4\text{-}CF_3)$ |
| F-0641 | Cl | F | $CH_2CH_2CH_2CH_2OPh(4\text{-}OCF_3)$ |
| F-0642 | Cl | F | $CH_2CH_2CH_2CH_2CH_2OPh(4\text{-}CF_3)$ |
| F-0643 | Cl | F | $CH_2CH_2OCH_2Ph$ |
| F-0644 | Cl | F | $CH_2CH_2CH_2OCH_2Ph$ |
| F-0645 | Cl | F | $CH_2CH_2CH_2CH_2OCH_2Ph$ |
| F-0646 | Cl | F | $CH_2CH_2CH_2CH_2CH_2OCH_2Ph$ |
| F-0647 | Cl | F | $CH_2CH_2SPh$ |
| F-0648 | Cl | F | $CH_2CH_2CH_2SPh$ |
| F-0649 | Cl | F | $CH_2CH_2CH_2SPh(4\text{-}F)$ |
| F-0650 | Cl | F | $CH_2CH_2CH_2SPh(4\text{-}Cl)$ |
| F-0651 | Cl | F | $CH_2CH_2CH_2SPh(4\text{-}Br)$ |
| F-0652 | Cl | F | $CH_2CH_2CH_2SPh[4\text{-}(t\text{-}Bu)]$ |
| F-0653 | Cl | F | $CH_2CH_2CH_2SPh(3\text{-}CF_3)$ |
| F-0654 | Cl | F | $CH_2CH_2CH_2SPh(4\text{-}CF_3)$ |

TABLE 1080

| Compound Number | $R^3$ | $R^4$ | $R^5$ |
|---|---|---|---|
| F-0655 | Cl | F | $CH_2CH_2CH_2SPh(3\text{-}SCF_3)$ |
| F-0656 | Cl | F | $CH_2CH_2CH_2SPh(4\text{-}SCF_3)$ |
| F-0657 | Cl | F | $CH_2CH_2CH_2CH_2SPh$ |
| F-0658 | Cl | F | $CH_2CH_2CH_2CH_2SPh(4\text{-}F)$ |
| F-0659 | Cl | F | $CH_2CH_2CH_2CH_2SPh(4\text{-}Cl)$ |
| F-0660 | Cl | F | $CH_2CH_2CH_2CH_2SPh[4\text{-}(t\text{-}Bu)]$ |
| F-0661 | Cl | F | $CH_2CH_2CH_2CH_2SPh(4\text{-}CF_3)$ |
| F-0662 | Cl | F | $CH_2CH_2CH_2CH_2CH_2SPh$ |
| F-0663 | Cl | F | $CH_2CH_2CH_2CH_2CH_2SPh(4\text{-}F)$ |
| F-0664 | Cl | F | $CH_2CH_2CH_2CH_2CH_2SPh(4\text{-}Cl)$ |
| F-0665 | Cl | F | $CH_2CH_2CH_2CH_2CH_2SPh(4\text{-}CF_3)$ |
| F-0666 | Cl | F | $CH_2CH_2S({=}O)Ph$ |
| F-0667 | Cl | F | $CH_2CH_2CH_2S({=}O)Ph$ |
| F-0668 | Cl | F | $CH_2CH_2CH_2S({=}O)Ph(4\text{-}F)$ |
| F-0669 | Cl | F | $CH_2CH_2CH_2S({=}O)Ph[4\text{-}(t\text{-}Bu)]$ |
| F-0670 | Cl | F | $CH_2CH_2CH_2S({=}O)Ph(4\text{-}CF_3)$ |
| F-0671 | Cl | F | $CH_2CH_2S({=}O)_2Ph$ |
| F-0672 | Cl | F | $CH_2CH_2S({=}O)_2Ph(4\text{-}CF_3)$ |
| F-0673 | Cl | F | $CH_2CH_2CH_2S({=}O)_2Ph(4\text{-}F)$ |
| F-0674 | Cl | F | $CH_2CH_2CH_2S({=}O)_2Ph(4\text{-}Cl)$ |
| F-0675 | Cl | F | $CH_2CH_2CH_2S({=}O)_2Ph(4\text{-}CF_3)$ |
| F-0676 | Cl | F | $CH_2CH_2CH_2CH_2S({=}O)_2Ph$ |
| F-0677 | Cl | F | $CH_2CH_2CH_2CH_2S({=}O)_2Ph(4\text{-}Cl)$ |
| F-0678 | Cl | F | $CH_2CH_2CH_2CH_2S({=}O)_2Ph(4\text{-}CF_3)$ |
| F-0679 | Cl | F | $CH_2CH_2SCH_2Ph$ |
| F-0680 | Cl | F | $CH_2CH_2CH_2SCH_2Ph$ |
| F-0681 | Cl | F | $CH_2CH_2CH_2SCH_2Ph(2\text{-}Cl)$ |
| F-0682 | Cl | F | $CH_2CH_2CH_2SCH_2Ph(3\text{-}Cl)$ |
| F-0683 | Cl | F | $CH_2CH_2CH_2SCH_2Ph(4\text{-}Cl)$ |
| F-0684 | Cl | F | $CH_2CH_2CH_2SCH_2Ph(2\text{-}SCF_3)$ |
| F-0685 | Cl | F | $CH_2CH_2CH_2SCH_2Ph(3\text{-}CF_3)$ |
| F-0686 | Cl | F | $CH_2CH_2CH_2SCH_2Ph(4\text{-}CF_3)$ |
| F-0687 | Cl | F | $CH_2CH_2CH_2SCH_2Ph(4\text{-}NO_2)$ |
| F-0688 | Cl | F | $CH_2CH_2CH_2CH_2SCH_2Ph$ |
| F-0689 | Cl | F | $CH_2CH_2CH_2CH_2SCH_2Ph(4\text{-}Cl)$ |
| F-0690 | Cl | F | $CH_2CH_2CH_2CH_2SCH_2Ph(4\text{-}CF_3)$ |
| F-0691 | Cl | F | $CH_2CH_2CH_2CH_2SCH_2Ph(4\text{-}CN)$ |
| F-0692 | Cl | F | $CH_2CH_2CH_2CH_2CH_2SCH_2Ph$ |
| F-0693 | Cl | F | $CH_2CH_2SCH_2CH_2Ph$ |
| F-0694 | Cl | F | $CH_2CH_2CH_2SCH_2CH_2Ph$ |
| F-0695 | Cl | F | $CH_2CH_2CH_2CH_2SCH_2CH_2Ph$ |
| F-0696 | Cl | F | $CH_2CH_2SCH(Me)Ph$ |
| F-0697 | Cl | F | $CH_2CH_2CH_2SCH(Me)Ph$ |
| F-0698 | Cl | F | $CH_2CH_2CH_2CH_2SCH(Me)Ph$ |

TABLE 1081

| Compound Number | $R^3$ | $R^4$ | $R^5$ |
|---|---|---|---|
| F-0699 | Cl | F | $CH_2CH_2S({=}O)CH_2Ph$ |
| F-0700 | Cl | F | $CH_2CH_2S({=}O)CH_2Ph(4\text{-}CF_3)$ |
| F-0701 | Cl | F | $CH_2CH_2CH_2S({=}O)CH_2Ph$ |
| F-0702 | Cl | F | $CH_2CH_2CH_2S({=}O)CH_2Ph(2\text{-}SCF_3)$ |
| F-0703 | Cl | F | $CH_2CH_2CH_2S({=}O)CH_2Ph(4\text{-}SCF_3)$ |
| F-0704 | Cl | F | $CH_2CH_2CH_2S({=}O)CH_2Ph(4\text{-}Cl)$ |
| F-0705 | Cl | F | $CH_2CH_2CH_2S({=}O)CH_2Ph(4\text{-}CF_3)$ |
| F-0706 | Cl | F | $CH_2CH_2CH_2CH_2S({=}O)CH_2Ph$ |
| F-0707 | Cl | F | $CH_2CH_2CH_2CH_2S({=}O)CH_2Ph(4\text{-}CF_3)$ |
| F-0708 | Cl | F | $CH_2CH_2CH_2CH_2CH_2S({=}O)CH_2Ph(4\text{-}CF_3)$ |
| F-0709 | Cl | F | $CH_2CH_2S({=}O)_2CH_2Ph$ |
| F-0710 | Cl | F | $CH_2CH_2S({=}O)_2CH_2Ph(4\text{-}CF_3)$ |
| F-0711 | Cl | F | $CH_2CH_2CH_2S({=}O)_2CH_2Ph$ |
| F-0712 | Cl | F | $CH_2CH_2CH_2S({=}O)_2CH_2Ph(4\text{-}Cl)$ |
| F-0713 | Cl | F | $CH_2CH_2CH_2S({=}O)_2CH_2Ph(4\text{-}CF_3)$ |
| F-0714 | Cl | F | $CH_2CH_2CH_2CH_2S({=}O)_2CH_2Ph$ |
| F-0715 | Cl | F | $CH_2CH_2CH_2CH_2S({=}O)_2CH_2Ph(4\text{-}CF_3)$ |
| F-0716 | Cl | F | $CH_2CH_2CH_2CH_2CH_2S({=}O)_2CH_2Ph$ |
| F-0717 | Cl | F | $CH_2CH_2CH_2CH_2CH_2S({=}O)_2CH_2Ph(4\text{-}CF_3)$ |
| F-0718 | Cl | F | $CH_2CH_2ON{=}CH(t\text{-}Bu)$ |
| F-0719 | Cl | F | $CH_2CH_2CH_2ON{=}CH(t\text{-}Bu)$ |
| F-0720 | Cl | F | $CH_2CH_2CH_2CH_2ON{=}C(Me)(c\text{-}Pr)$ |
| F-0721 | Cl | F | $CH_2CH_2ON{=}C(Me)CF_3$ |
| F-0722 | Cl | F | $CH_2CH_2CH_2ON{=}CHCF_3$ |
| F-0723 | Cl | F | $CH_2CH_2CH_2ON{=}C(Me)CF_3$ |
| F-0724 | Cl | F | $CH_2CH_2CH_2ON{=}C(Me)CCl_3$ |
| F-0725 | Cl | F | $CH_2CH_2CH_2CH_2ON{=}CHCF_3$ |
| F-0726 | Cl | F | $CH_2CH_2CH_2CH_2ON{=}C(Me)CF_3$ |
| F-0727 | Cl | F | $CH_2CH_2CH_2CH_2CH_2ON{=}C(Me)CF_3$ |
| F-0728 | Cl | F | $CH_2CH_2ON{=}CHPh$ |
| F-0729 | Cl | F | $CH_2CH_2ON{=}CHPh(4\text{-}CF_3)$ |
| F-0730 | Cl | F | $CH_2CH_2ON{=}CHPh(4\text{-}SCF_3)$ |
| F-0731 | Cl | F | $CH_2CH_2CH_2ON{=}CHPh(3\text{-}CF_3)$ |
| F-0732 | Cl | F | $CH_2CH_2CH_2ON{=}CHPh(4\text{-}CF_3)$ |
| F-0733 | Cl | F | $CH_2CH_2CH_2ON{=}CHPh(4\text{-}SCF_3)$ |
| F-0734 | Cl | F | $CH_2CH_2CH_2ON{=}C(Me)Ph(4\text{-}CF_3)$ |
| F-0735 | Cl | F | $CH_2CH_2CH_2CH_2ON{=}CHPh(4\text{-}SCF_3)$ |
| F-0736 | Cl | F | $CH_2CH_2$(adamant-1-yl) |
| F-0737 | Cl | F | $CH_2CH_2CH_2$(3-$CF_3$-pyrazol-1-yl) |
| F-0738 | Cl | F | $CH_2CH_2CH_2CH_2$(3-$CF_3$-pyrazol-1-yl) |
| F-0739 | Cl | F | $CH_2CH_2CH_2CH_2CH_2$(3-$CF_3$-pyrazol-1-yl) |
| F-0740 | Cl | F | $CH_2$(1-Me-4-$CF_3$-imidazol-5-yl) |
| F-0741 | Cl | F | $CH_2CH_2$(1-Me-4-$CF_3$-imidazol-5-yl) |
| F-0742 | Cl | F | $CH_2CH_2CH_2$(1-Me-4-$CF_3$-imidazol-5-yl) |

TABLE 1082

| Compound Number | $R^3$ | $R^4$ | $R^5$ |
|---|---|---|---|
| F-0743 | Cl | F | $CH_2CH_2CH_2$(3-$CF_3$-1,2,4-triazol-1-yl) |
| F-0744 | Cl | F | $CH_2CH_2CH_2CH_2$(3-$CF_3$-1,2,4-triazol-1-yl) |
| F-0745 | Cl | F | $CH_2CH_2CH_2CH_2CH_2$(3-$CF_3$-1,2,4-triazol-1-yl) |
| F-0746 | Cl | F | $CH_2CH_2CH_2$(4-$CF_3$-thiazol-2-yl) |
| F-0747 | Cl | F | $CH_2CH_2CH_2CH_2$(4-$CF_3$-thiazol-2-yl) |
| F-0748 | Cl | F | $CH_2CH_2CH_2CH_2CH_2$(4-$CF_3$-thiazol-2-yl) |
| F-0749 | Cl | F | $CH_2CH_2CH_2$(2-$CF_3$-pyridin-5-yl) |
| F-0750 | Cl | F | $CH_2CH_2CH_2CH_2$(2-$CF_3$-pyridin-5-yl) |
| F-0751 | Cl | F | $CH_2CH_2CH_2CH_2CH_2$(2-$CF_3$-pyridin-5-yl) |
| F-0752 | Cl | F | $CH_2$(4-$CF_3$-pyrimidin-2-yl) |
| F-0753 | Cl | F | $CH_2CH_2$(4-$CF_3$-pyrimidin-2-yl) |
| F-0754 | Cl | F | $CH_2CH_2CH_2$(4-$CF_3$-pyrimidin-2-yl) |
| F-0755 | Cl | F | $CH_2CH_2O$(3-Cl-5-$CF_3$-pyridin-2-yl) |
| F-0756 | Cl | F | $CH_2CH_2CH_2O$(3-Cl-5-$CF_3$-pyridin-2-yl) |
| F-0757 | Cl | F | $CH_2CH_2CH_2CH_2O$(3-Cl-5-$CF_3$-pyridin-2-yl) |
| F-0758 | Cl | F | $CH_2CH_2CH_2CH_2CH_2O$(3-Cl-5-$CF_3$-pyridin-2-yl) |
| F-0759 | Cl | F | $CH_2CH_2N$(Phth) |
| F-0760 | Cl | F | $CH_2CH_2CH_2N$(Phth) |
| F-0761 | Cl | F | $CH_2CH_2CH_2CH_2N$(Phth) |
| F-0762 | Cl | F | $CH_2CH_2CH_2CH_2CH_2N$(Phth) |
| F-0763 | Cl | F | $CH_2CH(Me)CH_2N$(Phth) |
| F-0764 | Cl | F | $CH_2CH_2CH_2CN$ |
| F-0765 | Cl | F | $CH_2CH_2CH_2CH_2CN$ |

TABLE 1082-continued

| Compound Number | $R^3$ | $R^4$ | $R^5$ |
|---|---|---|---|
| F-0766 | Cl | F | $CH_2CH_2CH_2CH_2CH_2CN$ |
| F-0767 | Cl | F | $CH_2CH_2CH_2CH_2CH_2CH_2CN$ |
| F-0768 | Cl | F | $CH_2CH_2CH_2C(=O)OH$ |
| F-0769 | Cl | F | $CH_2CH_2CH_2CH_2C(=O)OH$ |
| F-0770 | Cl | F | $CH_2CH_2CH_2CH_2CH_2C(=O)OH$ |
| F-0771 | Cl | F | $CH_2CH_2SCN$ |
| F-0772 | Cl | F | $CH_2CH_2CH_2SCN$ |
| F-0773 | Cl | F | $CH_2CH_2CH_2CH_2SCN$ |
| F-0774 | Cl | F | $CH_2CH_2CH_2CH_2CH_2SCN$ |
| F-0775 | Cl | F | $CH_2CH_2CH_2CH_2CH_2CH_2SCN$ |
| F-0776 | Cl | F | $CH_2CH_2CH_2CH_2CH_2CH_2CH_2SCN$ |
| F-0777 | Cl | F | $CH_2CH_2CH_2CH_2CH_2CH_2CH_2CH_2SCN$ |
| F-0778 | Cl | F | $CH_2CH_2CH(Me)SCN$ |
| F-0779 | Cl | F | $CH_2CH(Me)CH_2SCN$ |
| F-0780 | Cl | F | $CH(Me)CH_2CH_2SCN$ |
| F-0781 | Cl | F | $CH_2CH_2CH_2CH(Me)SCN$ |
| F-0782 | Cl | F | $CH_2CH_2CH(Me)CH_2SCN$ |
| F-0783 | Cl | F | $CH_2CH(Me)CH_2CH_2SCN$ |
| F-0784 | Cl | F | $CH(Me)CH_2CH_2CH_2SCN$ |
| F-0785 | Cl | F | $CH_2CH_2CH_2CH_2CH(Me)SCN$ |
| F-0786 | Cl | F | $CH_2CH_2CH_2CH(Me)CH_2SCN$ |

TABLE 1083

| Compound Number | $R^3$ | $R^4$ | $R^5$ |
|---|---|---|---|
| F-0787 | Cl | F | $CH_2CH_2CH(Me)CH_2CH_2SCN$ |
| F-0788 | Cl | F | $CH_2CH(Me)CH_2CH_2CH_2SCN$ |
| F-0789 | Cl | F | $CH(Me)CH_2CH_2CH_2CH_2SCN$ |
| F-0790 | Cl | F | $CH_2CH_2ONH_2$ |
| F-0791 | Cl | F | $CH_2CH_2CH_2ONH_2$ |
| F-0792 | Cl | F | $CH_2CH_2CH_2CH_2ONH_2$ |
| F-0793 | Cl | F | $CH_2CH_2CH_2CH_2CH_2ONH_2$ |
| F-0794 | Cl | F | $CH_2CH_2CH_2CH_2CH_2CH_2ONH_2$ |
| F-0795 | Me | F | Me |
| F-0796 | Me | F | Et |
| F-0797 | Me | F | n-Pr |
| F-0798 | Me | F | i-Pr |
| F-0799 | Me | F | n-Bu |
| F-0800 | Me | F | n-Pen |
| F-0801 | Me | F | n-Hex |
| F-0802 | Me | F | n-Heptyl |
| F-0803 | Me | F | n-Octyl |
| F-0804 | Me | F | n-Nonyl |
| F-0805 | Me | F | n-Decyl |
| F-0806 | Me | F | c-Pr |
| F-0807 | Me | F | c-Pen |
| F-0808 | Me | F | c-Hex |
| F-0809 | Me | F | $CH_2C(Me)=CH_2$ |
| F-0810 | Me | F | $CH_2CH_2CH=CH_2$ |
| F-0811 | Me | F | $CH_2CH_2CH=C(CH_3)_2$ |
| F-0812 | Me | F | $CH_2CH_2CH_2CH=CH_2$ |
| F-0813 | Me | F | $CH_2CH_2CH_2CH=C(CH_3)_2$ |
| F-0814 | Me | F | $CH_2CH_2CH_2CH_2CH=CH_2$ |
| F-0815 | Me | F | $CH_2CH_2CH_2CH_2CH=C(CH_3)_2$ |
| F-0816 | Me | F | $CH_2CH_2CH\equiv CH$ |
| F-0817 | Me | F | $CH_2CH_2CH_2CH\equiv CH$ |
| F-0818 | Me | F | $CH_2CH_2CH_2CH_2CH\equiv CH$ |
| F-0819 | Me | F | $CH_2CH_2CH_2Cl$ |
| F-0820 | Me | F | $CH_2CH_2CH_2Br$ |
| F-0821 | Me | F | $CH_2CH_2CH_2CH_2Cl$ |
| F-0822 | Me | F | $CH_2CH_2CH_2CH_2Br$ |
| F-0823 | Me | F | $CH_2CH_2CH_2CH_2CH_2Cl$ |
| F-0824 | Me | F | $CH_2CH_2CH_2CH_2CH_2Br$ |
| F-0825 | Me | F | $CH_2CH_2CH_2CH_2CH_2CH_2Cl$ |
| F-0826 | Me | F | $CH_2CH_2CH_2CH_2CH_2CH_2Br$ |
| F-0827 | Me | F | $CH_2CH_2CH_2CH_2CH_2CH_2CH_2Cl$ |
| F-0828 | Me | F | $CH_2CH_2CH_2CH_2CH_2CH_2CH_2Br$ |
| F-0829 | Me | F | $CH_2CH_2CH_2CH_2CH_2CH_2CH_2CH_2Br$ |
| F-0830 | Me | F | $CH_2CH(Me)CH_2Cl$ |

TABLE 1084

| Compound Number | $R^3$ | $R^4$ | $R^5$ |
|---|---|---|---|
| F-0831 | Me | F | $CH_2CH(Me)CH_2Br$ |
| F-0832 | Me | F | $CH_2CH_2CH(Me)CH_2CH_2Cl$ |
| F-0833 | Me | F | $CH_2CH_2CH(Me)CH_2CH_2Br$ |
| F-0834 | Me | F | $CH_2CH_2CF=CF_2$ |
| F-0835 | Me | F | $CH_2CH=C(Cl)CF_3$ |
| F-0836 | Me | F | $CH_2CH_2CH_2CF=CF_2$ |
| F-0837 | Me | F | $CH_2CH_2CH_2CH_2CF=CF_2$ |
| F-0838 | Me | F | $CH_2CH_2CH_2CH_2CH_2CF=CF_2$ |
| F-0839 | Me | F | $CH_2$(t-Bu) |
| F-0840 | Me | F | $CH_2CH_2$(t-Bu) |
| F-0841 | Me | F | $CH_2CH_2CH_2$(t-Bu) |
| F-0842 | Me | F | $CH_2CH_2CH_2CH_2$(t-Bu) |
| F-0843 | Me | F | $CH_2CH_2CH_2CH_2CH_2$(t-Bu) |
| F-0844 | Me | F | $CH_2CH_2CH_2CH_2CH_2CH_2$(t-Bu) |
| F-0845 | Me | F | $CH_2CF_3$ |
| F-0846 | Me | F | $CH_2CH_2CF_3$ |
| F-0847 | Me | F | $CH_2CH_2CH_2CF_3$ |
| F-0848 | Me | F | $CH_2CH_2CH_2CH_2CF_3$ |
| F-0849 | Me | F | $CH_2CH_2CH_2CH_2CH_2CF_3$ |
| F-0850 | Me | F | $CH_2CH_2CH_2CH_2CH_2CH_2CF_3$ |
| F-0851 | Me | F | $CH_2CH_2CH_2CH_2CH_2CH_2CH_2CF_3$ |
| F-0852 | Me | F | $CH_2CF_2CF_3$ |
| F-0853 | Me | F | $CF_2CHFCF_3$ |
| F-0854 | Me | F | $CF_2CF_2CF_3$ |
| F-0855 | Me | F | $CH_2CF_2CF_2CF_3$ |
| F-0856 | Me | F | $CH_2CF_2CF_2CF_2CF_3$ |
| F-0857 | Me | F | $CH_2CF_2CF_2CF_2CHF_2$ |
| F-0858 | Me | F | $CH(CF_3)CF_3$ |
| F-0859 | Me | F | $CH_2CF(CF_3)CF_3$ |
| F-0860 | Me | F | $CH_2CF_2CF(CF_3)CF_3$ |
| F-0861 | Me | F | $CH_2CF(CF_3)CF_2CF_3$ |
| F-0862 | Me | F | $CH_2CF_2CF_2CF(CF_3)CF_3$ |
| F-0863 | Me | F | $CH_2CF_2CF(CF_3)CF_2CF_3$ |
| F-0864 | Me | F | $CH_2CF(CF_3)CF_2CF_2CF_3$ |
| F-0865 | Me | F | $CH_2$(c-Pr) |
| F-0866 | Me | F | $CH_2$[c-Pr(1-Me)] |
| F-0867 | Me | F | $CH_2$[c-Pr(1-Ph)] |
| F-0868 | Me | F | $CH_2${c-Pr[1-NHS(=O)$_2CF_3$]} |
| F-0869 | Me | F | $CH_2${c-Pr[1-Ph(4-$CF_3$)]} |
| F-0870 | Me | F | $CH_2${c-Pr[1-Ph(3,4,5-$F_3$)]} |
| F-0871 | Me | F | $CH_2${c-Hex[4-(t-Bu)]} |
| F-0872 | Me | F | $CH_2$[c-Hex(4-$CF_3$)] |
| F-0873 | Me | F | $CH_2CH_2$(c-Pr) |
| F-0874 | Me | F | $CH_2CH_2$(c-Hex) |

TABLE 1085

| Compound Number | $R^3$ | $R^4$ | $R^5$ |
|---|---|---|---|
| F-0875 | Me | F | $CH_2CH_2$[c-Hex(4-$CF_3$)] |
| F-0876 | Me | F | $CH_2CH_2$[c-Hex(4-$SCF_3$)] |
| F-0877 | Me | F | $CH_2CH_2CH_2$(c-Pr) |
| F-0878 | Me | F | $CH_2CH_2CH_2$(c-Hex) |
| F-0879 | Me | F | $CH_2CH_2CH_2${c-Hex[4-(t-Bu)]} |
| F-0880 | Me | F | $CH_2CH_2CH_2$[c-Hex(4-$CF_3$)] |
| F-0881 | Me | F | $CH_2CH_2CH_2$[c-Hex(4-$SCF_3$)] |
| F-0882 | Me | F | $CH_2CH_2CH_2CH_2$(c-Pr) |
| F-0883 | Me | F | $CH_2CH_2CH_2CH_2$(c-Hex) |
| F-0884 | Me | F | $CH_2CH_2CH_2CH_2$[c-Hex(4-$CF_3$)] |
| F-0885 | Me | F | $CH_2$[c-Pr(2,2-$F_2$)] |
| F-0886 | Me | F | $CH_2$[c-Hex(4,4-$F_2$)] |
| F-0887 | Me | F | $CH_2CH_2$[c-Pr(2,2-$F_2$)] |
| F-0888 | Me | F | $CH_2CH_2$[c-Hex(4,4-$F_2$)] |
| F-0889 | Me | F | $CH_2CH_2CH_2$[c-Pr(2,2-$F_2$)] |
| F-0890 | Me | F | $CH_2CH_2CH_2CH_2$[c-Pr(2,2-$F_2$)] |
| F-0891 | Me | F | $CH_2CH_2OH$ |
| F-0892 | Me | F | $CH_2CH_2CH_2OH$ |
| F-0893 | Me | F | $CH_2CH_2CH_2CH_2OH$ |
| F-0894 | Me | F | $CH_2CH_2CH_2CH_2CH_2OH$ |
| F-0895 | Me | F | $CH_2CH_2CH_2CH_2CH_2CH_2OH$ |
| F-0896 | Me | F | $CH_2C(=O)Me$ |
| F-0897 | Me | F | $CH_2CH(OH)Me$ |
| F-0898 | Me | F | $CH_2CH(OH)CF_3$ |

TABLE 1085-continued

| Compound Number | $R^3$ | $R^4$ | $R^5$ |
|---|---|---|---|
| F-0899 | Me | F | $CH_2C(OH)_2CF_3$ |
| F-0900 | Me | F | $CH_2C(CF_3)=NOH$ |
| F-0901 | Me | F | $CH_2C(CF_3)=NOMe$ |
| F-0902 | Me | F | $CH_2CH(CF_3)NH_2$ |
| F-0903 | Me | F | $CH_2CH(CF_3)NHSO_2CF_3$ |
| F-0904 | Me | F | $CH_2CH_2OMe$ |
| F-0905 | Me | F | $CH_2CH_2CH_2OMe$ |
| F-0906 | Me | F | $CH_2CH_2CH_2CH_2OMe$ |
| F-0907 | Me | F | $CH_2CH_2CH_2CH_2CH_2OMe$ |
| F-0908 | Me | F | $CH_2CH_2CH_2CH_2CH_2CH_2OMe$ |
| F-0909 | Me | F | $CH_2CH_2OCHF_2$ |
| F-0910 | Me | F | $CH_2CH_2CH_2OCHF_2$ |
| F-0911 | Me | F | $CH_2CH_2CH_2CH_2OCHF_2$ |
| F-0912 | Me | F | $CH_2CH_2CH_2CH_2CH_2OCHF_2$ |
| F-0913 | Me | F | $CH_2CH_2CH_2CH_2CH_2CH_2OCHF_2$ |
| F-0914 | Me | F | $CH_2CH_2OCH_2CF_3$ |
| F-0915 | Me | F | $CH_2CH_2CH_2OCH_2CF_3$ |
| F-0916 | Me | F | $CH_2CH_2CH_2CH_2OCH_2CF_3$ |
| F-0917 | Me | F | $CH_2CH_2CH_2CH_2CH_2OCH_2CF_3$ |
| F-0918 | Me | F | $CH_2CH_2CH_2CH_2CH_2CH_2OCH_2CF_3$ |

TABLE 1086

| Compound Number | $R^3$ | $R^4$ | $R^5$ |
|---|---|---|---|
| F-0919 | Me | F | $CH_2CH_2CH_2CH_2CH_2CH_2CH_2OCH_2CF_3$ |
| F-0920 | Me | F | $CH_2CH_2OC(CF_3)_3$ |
| F-0921 | Me | F | $CH_2CH_2CH_2OC(CF_3)_3$ |
| F-0922 | Me | F | $CH_2CH_2CH_2CH_2OC(CF_3)_3$ |
| F-0923 | Me | F | $CH_2CH_2CH_2CH_2CH_2OC(CF_3)_3$ |
| F-0924 | Me | F | $CF_2CHFOCF_2CF_2CF_3$ |
| F-0925 | Me | F | $CH_2CH_2O$(c-Pr) |
| F-0926 | Me | F | $CH_2CH_2O$(c-Pen) |
| F-0927 | Me | F | $CH_2CH_2O$(c-Hex) |
| F-0928 | Me | F | $CH_2CH_2CH_2O$(c-Pr) |
| F-0929 | Me | F | $CH_2CH_2CH_2O$(c-Pen) |
| F-0930 | Me | F | $CH_2CH_2CH_2O$(c-Hex) |
| F-0931 | Me | F | $CH_2CH_2CH_2CH_2O$(c-Pr) |
| F-0932 | Me | F | $CH_2CH_2CH_2CH_2O$(c-Pen) |
| F-0933 | Me | F | $CH_2CH_2CH_2CH_2O$(c-Hex) |
| F-0934 | Me | F | $CH_2CH_2O$[c-Pr(2,2-$F_2$)] |
| F-0935 | Me | F | $CH_2CH_2CH_2O$[c-Pr(2,2-$F_2$)] |
| F-0936 | Me | F | $CH_2CH_2CH_2CH_2O$[c-Pr(2,2-$F_2$)] |
| F-0937 | Me | F | $CH_2CH_2OCH_2CH_2OCH_3$ |
| F-0938 | Me | F | $CH_2CH_2OCH_2CH_2OCH_2CF_3$ |
| F-0939 | Me | F | $CH_2CF_2OCF_2CF_2OCF_3$ |
| F-0940 | Me | F | $CF_2CHFOCF_2CF_2OCF_3$ |
| F-0941 | Me | F | $CF_2CHFOCF_2CF(CF_3)OCF_2CF_2CF_3$ |
| F-0942 | Me | F | $CH_2CH_2SH$ |
| F-0943 | Me | F | $CH_2CH_2CH_2SH$ |
| F-0944 | Me | F | $CH_2CH_2CH_2CH_2SH$ |
| F-0945 | Me | F | $CH_2CH_2CH_2CH_2CH_2SH$ |
| F-0946 | Me | F | $CH_2CH_2CH_2CH_2CH_2CH_2SH$ |
| F-0947 | Me | F | $CH_2CH_2S$(t-Bu) |
| F-0948 | Me | F | $CH_2CH_2CH_2S$(t-Bu) |
| F-0949 | Me | F | $CH_2CH_2CH_2CH_2S$(t-Bu) |
| F-0950 | Me | F | $CH_2CH_2CH_2CH_2CH_2SCH_3$ |
| F-0951 | Me | F | $CH_2CH_2CH_2CH_2CH_2SCH(CH_3)_2$ |
| F-0952 | Me | F | $CH_2CH_2CH_2CH_2CH_2S$(t-Bu) |
| F-0953 | Me | F | $CH_2CH_2CH_2CH_2CH_2CH_2SCH(CH_3)_2$ |
| F-0954 | Me | F | $CH_2CH_2CH_2CH_2CH_2CH_2S$(t-Bu) |
| F-0955 | Me | F | $CH_2CH_2CH_2CH_2CH_2CH_2CH_2S$(t-Bu) |
| F-0956 | Me | F | $CH_2CH_2SCHF_2$ |
| F-0957 | Me | F | $CH_2CH_2CH_2SCHF_2$ |
| F-0958 | Me | F | $CH_2CH_2CH_2CH_2SCHF_2$ |
| F-0959 | Me | F | $CH_2CH_2CH_2CH_2CH_2SCHF_2$ |
| F-0960 | Me | F | $CH_2CH_2CH_2CH_2CH_2CH_2SCHF_2$ |
| F-0961 | Me | F | $CH_2CH_2CH_2CH_2CH_2CH_2CH_2SCHF_2$ |
| F-0962 | Me | F | $CH_2CH_2SCF_3$ |

TABLE 1087

| Compound Number | $R^3$ | $R^4$ | $R^5$ |
|---|---|---|---|
| F-0963 | Me | F | $CH_2CH_2CH_2SCF_3$ |
| F-0964 | Me | F | $CH_2CH_2CH_2CH_2SCF_3$ |
| F-0965 | Me | F | $CH_2CH_2CH_2CH_2CH_2SCF_3$ |
| F-0966 | Me | F | $CH_2CH_2CH_2CH_2CH_2CH_2SCF_3$ |
| F-0967 | Me | F | $CH_2CH_2CH_2CH_2CH_2CH_2CH_2SCF_3$ |
| F-0968 | Me | F | $CH_2CH_2CH_2CH_2CH_2CH_2CH_2CH_2SCF_3$ |
| F-0969 | Me | F | $CH_2CH(Me)SCF_3$ |
| F-0970 | Me | F | $CH(Me)CH_2SCF_3$ |
| F-0971 | Me | F | $CH_2CH_2CH(Me)SCF_3$ |
| F-0972 | Me | F | $CH_2CH(Me)CH_2SCF_3$ |
| F-0973 | Me | F | $CH(Me)CH_2CH_2SCF_3$ |
| F-0974 | Me | F | $CH_2CH_2CH_2CH(Me)SCF_3$ |
| F-0975 | Me | F | $CH_2CH_2CH(Me)CH_2SCF_3$ |
| F-0976 | Me | F | $CH_2CH(Me)CH_2CH_2SCF_3$ |
| F-0977 | Me | F | $CH(Me)CH_2CH_2CH_2SCF_3$ |
| F-0978 | Me | F | $CH_2CH_2SCH_2CF_3$ |
| F-0979 | Me | F | $CH_2CH_2CH_2SCH_2CF_3$ |
| F-0980 | Me | F | $CH_2CH_2CH_2CH_2SCH_2CF_3$ |
| F-0981 | Me | F | $CH_2CH_2CH_2CH_2CH_2SCH_2CF_3$ |
| F-0982 | Me | F | $CH_2CH_2CH_2CH_2CH_2CH_2SCH_2CF_3$ |
| F-0983 | Me | F | $CH_2CH_2CH_2CH_2CH_2CH_2CH_2SCH_2CF_3$ |
| F-0984 | Me | F | $CH_2CH_2SCH(CF_3)_2$ |
| F-0985 | Me | F | $CH_2CH_2CH_2SCH(CF_3)_2$ |
| F-0986 | Me | F | $CH_2CH_2CH_2CH_2SCH(CF_3)_2$ |
| F-0987 | Me | F | $CH_2CH_2CH_2CH_2CH_2SCH(CF_3)_2$ |
| F-0988 | Me | F | $CH_2CH_2CH_2CH_2CH_2CH_2SCH(CF_3)_2$ |
| F-0989 | Me | F | $CH_2CH_2CH_2CH_2CH_2SCF_2CF_3$ |
| F-0990 | Me | F | $CH_2CH_2CH_2CH_2CH_2CH_2SCF_2CF_3$ |
| F-0991 | Me | F | $CH_2CH_2CH_2CH_2CH_2CH_2SCF(CF_3)_2$ |
| F-0992 | Me | F | $CH_2CH_2CH_2CH_2CH_2CH_2CH_2SCF(CF_3)_2$ |
| F-0993 | Me | F | $CH_2CH_2CH_2CH_2CH_2SCCl_3$ |
| F-0994 | Me | F | $CH_2CH_2CH_2CH_2CH_2CH_2SCCl_3$ |
| F-0995 | Me | F | $CH_2CH_2SCH_2CH=CH_2$ |
| F-0996 | Me | F | $CH_2CH_2CH_2SCH_2CH=CH_2$ |
| F-0997 | Me | F | $CH_2CH_2CH_2CH_2SCH_2CH=CH_2$ |
| F-0998 | Me | F | $CH_2CH_2SCF=CFCF_3$ |
| F-0999 | Me | F | $CH_2CH_2CH_2SCF=CFCF_3$ |
| F-1000 | Me | F | $CH_2CH_2CH_2CH_2SCF=CFCF_3$ |
| F-1001 | Me | F | $CH_2CH_2CH_2S$(c-Pr) |
| F-1002 | Me | F | $CH_2CH_2CH_2S$(c-Hex) |
| F-1003 | Me | F | $CH_2CH_2CH_2CH_2S$(c-Pr) |
| F-1004 | Me | F | $CH_2CH_2CH_2CH_2S$(c-Hex) |
| F-1005 | Me | F | $CH_2CH_2CH_2CH_2CH_2S$(c-Pr) |
| F-1006 | Me | F | $CH_2CH_2CH_2CH_2CH_2S$(c-Hex) |

TABLE 1088

| Compound Number | $R^3$ | $R^4$ | $R^5$ |
|---|---|---|---|
| F-1007 | Me | F | $CH_2CH_2CH_2S$[c-Hex(4,4-$F_2$)] |
| F-1008 | Me | F | $CH_2CH_2CH_2CH_2S$[c-Hex(4,4-$F_2$)] |
| F-1009 | Me | F | $CH_2CH_2CH_2CH_2CH_2S$[c-Hex(4,4-$F_2$)] |
| F-1010 | Me | F | $CH_2CH_2CH_2SCH_2$(c-Pr) |
| F-1011 | Me | F | $CH_2CH_2CH_2SCH_2$(c-Hex) |
| F-1012 | Me | F | $CH_2CH_2CH_2CH_2SCH_2$(c-Pr) |
| F-1013 | Me | F | $CH_2CH_2CH_2CH_2SCH_2$(c-Hex) |
| F-1014 | Me | F | $CH_2CH_2CH_2CH_2CH_2SCH_2$(c-Pr) |
| F-1015 | Me | F | $CH_2CH_2CH_2CH_2CH_2SCH_2$(c-Hex) |
| F-1016 | Me | F | $CH_2CH_2CH_2SCH_2$[c-Hex(4,4-$F_2$)] |
| F-1017 | Me | F | $CH_2CH_2CH_2CH_2SCH_2$[c-Hex(4,4-$F_2$)] |
| F-1018 | Me | F | $CH_2CH_2CH_2CH_2CH_2SCH_2$[c-Hex(4,4-$F_2$)] |
| F-1019 | Me | F | $CH_2CH_2CH_2SCH_2SiMe_3$ |
| F-1020 | Me | F | $CH_2CH_2CH_2CH_2SCH_2SiMe_3$ |
| F-1021 | Me | F | $CH_2CH_2CH_2CH_2CH_2SCH_2SiMe_3$ |
| F-1022 | Me | F | $CH_2CH_2OCH_2CH_2SCH_3$ |
| F-1023 | Me | F | $CH_2CH_2OCH_2CH_2SCHF_2$ |
| F-1024 | Me | F | $CH_2CH_2OCH_2CH_2SCF_3$ |
| F-1025 | Me | F | $CH_2CH_2OCH_2CH_2SCH_2CF_3$ |
| F-1026 | Me | F | $CH_2CH_2CH_2S(=O)$(t-Bu) |
| F-1027 | Me | F | $CH_2CH_2CH_2CH_2S(=O)$(t-Bu) |
| F-1028 | Me | F | $CH_2CH_2CH_2CH_2CH_2CH_2CH_2S(=O)$(t-Bu) |
| F-1029 | Me | F | $CH_2CH_2S(=O)CHF_2$ |
| F-1030 | Me | F | $CH_2CH_2CH_2S(=O)CHF_2$ |

TABLE 1088-continued

| Compound Number | $R^3$ | $R^4$ | $R^5$ |
|---|---|---|---|
| F-1031 | Me | F | $CH_2CH_2CH_2CH_2S(=O)CHF_2$ |
| F-1032 | Me | F | $CH_2CH_2CH_2CH_2CH_2S(=O)CHF_2$ |
| F-1033 | Me | F | $CH_2CH_2CH_2CH_2CH_2CH_2S(=O)CHF_2$ |
| F-1034 | Me | F | $CH_2CH_2CH_2CH_2CH_2CH_2CH_2S(=O)CHF_2$ |
| F-1035 | Me | F | $CH_2CH_2S(=O)CF_3$ |
| F-1036 | Me | F | $CH_2CH_2CH_2S(=O)CF_3$ |
| F-1037 | Me | F | $CH_2CH_2CH_2CH_2S(=O)CF_3$ |
| F-1038 | Me | F | $CH_2CH_2CH_2CH_2CH_2S(=O)CF_3$ |
| F-1039 | Me | F | $CH_2CH_2CH_2CH_2CH_2CH_2S(=O)CF_3$ |
| F-1040 | Me | F | $CH_2CH_2CH_2CH_2CH_2CH_2CH_2S(=O)CF_3$ |
| F-1041 | Me | F | $CH_2CH_2S(=O)CH_2CF_3$ |
| F-1042 | Me | F | $CH_2CH_2CH_2S(=O)CH_2CF_3$ |
| F-1043 | Me | F | $CH_2CH_2CH_2CH_2S(=O)CH_2CF_3$ |
| F-1044 | Me | F | $CH_2CH_2CH_2CH_2CH_2S(=O)CH_2CF_3$ |
| F-1045 | Me | F | $CH_2CH_2CH_2CH_2CH_2CH_2S(=O)CH_2CF_3$ |
| F-1046 | Me | F | $CH_2CH_2CH_2CH_2CH_2CH_2CH_2S(=O)CH_2CF_3$ |
| F-1047 | Me | F | $CH_2CH_2CH_2S(=O)$(c-Pr) |
| F-1048 | Me | F | $CH_2CH_2CH_2CH_2S(=O)$(c-Pr) |
| F-1049 | Me | F | $CH_2CH_2CH_2CH_2S(=O)$(c-Pen) |
| F-1050 | Me | F | $CH_2CH_2CH_2CH_2S(=O)$(c-Hex) |

TABLE 1089

| Compound Number | $R^3$ | $R^4$ | $R^5$ |
|---|---|---|---|
| F-1051 | Me | F | $CH_2CH_2CH_2CH_2CH_2S(=O)$(c-Pr) |
| F-1052 | Me | F | $CH_2CH_2CH_2CH_2CH_2S(=O)$(c-Hex) |
| F-1053 | Me | F | $CH_2CH_2CH_2S(=O)$[c-Hex(4,4-$F_2$)] |
| F-1054 | Me | F | $CH_2CH_2CH_2CH_2S(=O)$[c-Hex(4,4-$F_2$)] |
| F-1055 | Me | F | $CH_2CH_2CH_2CH_2CH_2S(=O)$[c-Hex(4,4-$F_2$)] |
| F-1056 | Me | F | $CH_2CH_2CH_2CH_2S(=O)_2Me$ |
| F-1057 | Me | F | $CH_2CH_2CH_2CH_2CH_2S(=O)_2Me$ |
| F-1058 | Me | F | $CH_2CH_2CH_2CH_2CH_2S(=O)_2$(t-Bu) |
| F-1059 | Me | F | $CH_2CH_2S(=O)_2CHF_2$ |
| F-1060 | Me | F | $CH_2CH_2CH_2S(=O)_2CHF_2$ |
| F-1061 | Me | F | $CH_2CH_2CH_2CH_2S(=O)_2CHF_2$ |
| F-1062 | Me | F | $CH_2CH_2CH_2CH_2CH_2S(=O)_2CHF_2$ |
| F-1063 | Me | F | $CH_2CH_2CH_2CH_2CH_2CH_2S(=O)_2CHF_2$ |
| F-1064 | Me | F | $CH_2CH_2S(=O)_2CF_3$ |
| F-1065 | Me | F | $CH_2CH_2CH_2S(=O)_2CF_3$ |
| F-1066 | Me | F | $CH_2CH_2CH_2CH_2S(=O)_2CF_3$ |
| F-1067 | Me | F | $CH_2CH_2CH_2CH_2CH_2S(=O)_2CF_3$ |
| F-1068 | Me | F | $CH_2CH_2CH_2CH_2CH_2CH_2S(=O)_2CF_3$ |
| F-1069 | Me | F | $CH_2CH_2CH_2CH_2CH_2CH_2CH_2S(=O)_2CF_3$ |
| F-1070 | Me | F | $CH_2CH_2CH_2CH_2CH_2CH_2CH_2CH_2S(=O)_2CF_3$ |
| F-1071 | Me | F | $CH_2CH_2S(=O)_2CH_2CF_3$ |
| F-1072 | Me | F | $CH_2CH_2CH_2S(=O)_2CH_2CF_3$ |
| F-1073 | Me | F | $CH_2CH_2CH_2CH_2S(=O)_2CH_2CF_3$ |
| F-1074 | Me | F | $CH_2CH_2CH_2CH_2CH_2S(=O)_2CH_2CF_3$ |
| F-1075 | Me | F | $CH_2CH_2CH_2CH_2CH_2CH_2S(=O)_2CH_2CF_3$ |
| F-1076 | Me | F | $CH_2CH_2CH_2S(=O)_2$(c-Pr) |
| F-1077 | Me | F | $CH_2CH_2CH_2CH_2S(=O)_2$(c-Pr) |
| F-1078 | Me | F | $CH_2CH_2CH_2CH_2CH_2S(=O)_2$(c-Pr) |
| F-1079 | Me | F | $CH_2CH_2CH_2S(=O)_2$[c-Hex(4,4-$F_2$)] |
| F-1080 | Me | F | $CH_2CH_2CH_2CH_2S(=O)_2$[c-Hex(4,4-$F_2$)] |
| F-1081 | Me | F | $CH_2CH_2CH_2CH_2CH_2S(=O)_2$[c-Hex(4,4-$F_2$)] |
| F-1082 | Me | F | $CH_2CH_2CH_2C(=O)H$ |
| F-1083 | Me | F | $CH_2CH_2CH_2CH_2C(=O)H$ |
| F-1084 | Me | F | $CH_2CH_2CH_2CH_2CH_2C(=O)H$ |
| F-1085 | Me | F | $CH_2CH_2CH_2C(=O)$(t-Bu) |
| F-1086 | Me | F | $CH_2CH_2CH_2CH_2C(=O)$(t-Bu) |
| F-1087 | Me | F | $CH_2CH_2CH_2CH_2CH_2C(=O)$(t-Bu) |
| F-1088 | Me | F | $CH_2CH_2CH_2C(=O)CF_3$ |
| F-1089 | Me | F | $CH_2CH_2CH_2CH_2C(=O)CF_3$ |
| F-1090 | Me | F | $CH_2CH_2CH_2CH_2CH_2C(=O)CF_3$ |
| F-1091 | Me | F | $CH_2C(=O)Ph$ |
| F-1092 | Me | F | $CH_2C(=O)Ph$(4-Cl) |
| F-1093 | Me | F | $CH_2C(=O)Ph(4-CF_3)$ |
| F-1094 | Me | F | $CH_2CH_2C(=O)Ph(4-CF_3)$ |

TABLE 1090

| Compound Number | $R^3$ | $R^4$ | $R^5$ |
|---|---|---|---|
| F-1095 | Me | F | $CH_2CH_2CH_2C(=O)Ph(4-CF_3)$ |
| F-1096 | Me | F | $CH_2CH_2CH_2CH_2C(=O)Ph(4-CF_3)$ |
| F-1097 | Me | F | $CH_2CH_2CH_2CH_2CH_2C(=O)Ph(4-CF_3)$ |
| F-1098 | Me | F | $CH_2C(=O)OEt$ |
| F-1099 | Me | F | $CH_2CH_2C(=O)O$(t-Bu) |
| F-1100 | Me | F | $CH_2CH_2CH_2C(=O)OEt$ |
| F-1101 | Me | F | $CH_2CH_2CH_2C(=O)O$(t-Bu) |
| F-1102 | Me | F | $CH_2CH_2CH_2CH_2C(=O)O$(t-Bu) |
| F-1103 | Me | F | $CH_2CH_2CH_2CH_2CH_2C(=O)O$(t-Bu) |
| F-1104 | Me | F | $CH_2CH_2CH_2CH_2CH_2CH_2C(=O)O$(t-Bu) |
| F-1105 | Me | F | $CH_2CH_2CH_2CH_2CH_2CH_2CH_2C(=O)OEt$ |
| F-1106 | Me | F | $CH_2CH_2C(=O)OCH_2CF_3$ |
| F-1107 | Me | F | $CH_2CH_2CH_2C(=O)OCH_2CF_3$ |
| F-1108 | Me | F | $CH_2CH_2CH_2CH_2C(=O)OCH_2CF_3$ |
| F-1109 | Me | F | $CH_2CH_2CH_2CH_2CH_2C(=O)OCH_2CF_3$ |
| F-1110 | Me | F | $CH_2CH_2C(=O)NH$(t-Bu) |
| F-1111 | Me | F | $CH_2CH_2CH_2C(=O)NH$(t-Bu) |
| F-1112 | Me | F | $CH_2CH_2CH_2C(=O)NH$(t-Pen) |
| F-1113 | Me | F | $CH_2CH_2CH_2CH_2C(=O)NH$(t-Bu) |
| F-1114 | Me | F | $CH_2CH_2C(=O)NHCH_2CF_3$ |
| F-1115 | Me | F | $CH_2CH_2CH_2C(=O)NHCH_2CF_3$ |
| F-1116 | Me | F | $CH_2CH_2CH_2CH_2C(=O)NHCH_2CF_3$ |
| F-1117 | Me | F | $CH_2CH_2SC(=O)N(Me)_2$ |
| F-1118 | Me | F | $CH_2CH_2CH_2SC(=O)N(Me)_2$ |
| F-1119 | Me | F | $CH_2CH_2CH_2SC(=O)NH$(t-Bu) |
| F-1120 | Me | F | $CH_2CH_2CH_2CH_2CH_2SC(=O)NH$(t-Bu) |
| F-1121 | Me | F | $CH_2CH_2SC(=O)NHCH_2CF_3$ |
| F-1122 | Me | F | $CH_2CH_2CH_2SC(=O)NHCH_2CF_3$ |
| F-1123 | Me | F | $CH_2CH_2CH_2CH_2SC(=O)NHCH_2CF_3$ |
| F-1124 | Me | F | $CH_2CH_2CH_2OC(=O)H$ |
| F-1125 | Me | F | $CH_2CH_2CH_2CH_2OC(=O)H$ |
| F-1126 | Me | F | $CH_2CH_2CH_2CH_2CH_2OC(=O)H$ |
| F-1127 | Me | F | $CH_2CH_2CH_2OC(=O)Me$ |
| F-1128 | Me | F | $CH_2CH_2CH_2CH_2OC(=O)Me$ |
| F-1129 | Me | F | $CH_2CH_2CH_2CH_2CH_2OC(=O)Me$ |
| F-1130 | Me | F | $CH_2CH_2OC(=O)CF_3$ |
| F-1131 | Me | F | $CH_2CH_2CH_2OC(=O)CF_3$ |
| F-1132 | Me | F | $CH_2CH_2CH_2CH_2OC(=O)CF_3$ |
| F-1133 | Me | F | $CH_2CH_2CH_2CH_2CH_2OC(=O)Ph(4-CF_3)$ |
| F-1134 | Me | F | $CH_2CH_2OC(=O)Ph$ |
| F-1135 | Me | F | $CH_2CH_2OC(=O)Ph(4-CF_3)$ |
| F-1136 | Me | F | $CH_2CH_2CH_2OC(=O)Ph(4-CF_3)$ |
| F-1137 | Me | F | $CH_2CH_2CH_2CH_2OC(=O)Ph(4-CF_3)$ |
| F-1138 | Me | F | $CH_2CH_2CH_2CH_2CH_2OC(=O)Ph(4-CF_3)$ |

TABLE 1091

| Compound Number | $R^3$ | $R^4$ | $R^5$ |
|---|---|---|---|
| F-1139 | Me | F | $CH_2CH_2OS(=O)Me$ |
| F-1140 | Me | F | $CH_2CH_2CH_2OS(=O)Me$ |
| F-1141 | Me | F | $CH_2CH_2CH_2CH_2OS(=O)Me$ |
| F-1142 | Me | F | $CH_2CH_2CH_2CH_2CH_2OS(=O)Me$ |
| F-1143 | Me | F | $CH_2CH_2CH_2CH_2CH_2CH_2OS(=O)Me$ |
| F-1144 | Me | F | $CH_2CH_2OS(=O)CF_3$ |
| F-1145 | Me | F | $CH_2CH_2CH_2OS(=O)CF_3$ |
| F-1146 | Me | F | $CH_2CH_2CH_2CH_2OS(=O)CF_3$ |
| F-1147 | Me | F | $CH_2CH_2CH_2CH_2CH_2OS(=O)CF_3$ |
| F-1148 | Me | F | $CH_2CH_2CH_2CH_2CH_2CH_2OS(=O)CF_3$ |
| F-1149 | Me | F | $CH_2CH_2OS(=O)Ph$ |
| F-1150 | Me | F | $CH_2CH_2OS(=O)Ph$(4-Me) |
| F-1151 | Me | F | $CH_2CH_2CH_2OS(=O)Ph$ |
| F-1152 | Me | F | $CH_2CH_2CH_2OS(=O)Ph$(4-Me) |
| F-1153 | Me | F | $CH_2CH_2OS(=O)_2Me$ |
| F-1154 | Me | F | $CH_2CH_2CH_2OS(=O)_2Me$ |
| F-1155 | Me | F | $CH_2CH_2CH_2OS(=O)_2CF_3$ |
| F-1156 | Me | F | $CH_2CH_2CH_2CH_2OS(=O)_2CF_3$ |
| F-1157 | Me | F | $CH_2CH_2CH_2CH_2CH_2OS(=O)_2CF_3$ |
| F-1158 | Me | F | $CH_2CH_2CH_2CH_2CH_2OS(=O)_2CF_2CF_2CF_2CF_3$ |
| F-1159 | Me | F | $CH_2CH_2OS(=O)_2Ph$ |
| F-1160 | Me | F | $CH_2CH_2OS(=O)_2Ph$(4-Me) |
| F-1161 | Me | F | $CH_2CH_2CH_2OS(=O)_2Ph$ |
| F-1162 | Me | F | $CH_2CH_2CH_2OS(=O)_2Ph$(4-Me) |

TABLE 1091-continued

| Compound Number | $R^3$ | $R^4$ | $R^5$ |
|---|---|---|---|
| F-1163 | Me | F | $CH_2CH_2NH_2$ |
| F-1164 | Me | F | $CH_2CH_2CH_2NH_2$ |
| F-1165 | Me | F | $CH_2CH_2CH_2CH_2NH_2$ |
| F-1166 | Me | F | $CH_2CH_2CH_2CH_2CH_2NH_2$ |
| F-1167 | Me | F | $CH_2CH_2CH_2CH_2CH_2CH_2NH_2$ |
| F-1168 | Me | F | $CH_2CH_2CH_2CH_2CH_2CH_2CH_2CH_2NH_2$ |
| F-1169 | Me | F | $CH_2CH(Me)NH_2$ |
| F-1170 | Me | F | $CH_2C^*H(Me)NH_2$:(R) |
| F-1171 | Me | F | $CH_2C^*H(Me)NH_2$:(S) |
| F-1172 | Me | F | $CH_2CH(Et)NH_2$ |
| F-1173 | Me | F | $CH_2CH(i\text{-}Pr)NH_2$ |
| F-1174 | Me | F | $CH(Me)CH_2NH_2$ |
| F-1175 | Me | F | $CH(Et)CH_2NH_2$ |
| F-1176 | Me | F | $CH(i\text{-}Pr)CH_2NH_2$ |
| F-1177 | Me | F | $CH_2CH_2CH(Me)NH_2$ |
| F-1178 | Me | F | $CH_2CH(Me)CH_2NH_2$ |
| F-1179 | Me | F | $CH(Me)CH_2CH_2NH_2$ |
| F-1180 | Me | F | $CH_2CH(Me)NH(c\text{-}Pr)$ |
| F-1181 | Me | F | $CH_2CH(Me)N(c\text{-}Pr)S(=O)_2CF_3$ |
| F-1182 | Me | F | $CH_2CH(Me)NHOMe$ |

TABLE 1092

| Compound Number | $R^3$ | $R^4$ | $R^5$ |
|---|---|---|---|
| F-1183 | Me | F | $CH_2CH(Me)N(OMe)S(=O)_2CF_3$ |
| F-1184 | Me | F | $CH_2CH(Me)N(OMe)S(=O)_2Ph(2\text{-}NO_2)$ |
| F-1185 | Me | F | $CH_2CH(Me)N(OMe)S(=O)_2Ph(4\text{-}NO_2)$ |
| F-1186 | Me | F | $CH_2CH_2N(Me)(t\text{-}Bu)$ |
| F-1187 | Me | F | $CH_2CH_2CH_2N(Me)(t\text{-}Bu)$ |
| F-1188 | Me | F | $CH_2CH_2CH_2CH_2N(Me)(t\text{-}Bu)$ |
| F-1189 | Me | F | $CH_2CH_2NHCH_2CF_3$ |
| F-1190 | Me | F | $CH_2CH_2CH_2NHCH_2CF_3$ |
| F-1191 | Me | F | $CH_2CH_2CH_2CH_2NHCH_2CF_3$ |
| F-1192 | Me | F | $CH_2CH_2NHC(=O)C(Me)(CF_3)_2$ |
| F-1193 | Me | F | $CH_2CH_2NHC(=O)Me$ |
| F-1194 | Me | F | $CH_2CH_2NHC(=O)(t\text{-}Bu)$ |
| F-1195 | Me | F | $CH_2CH_2CH_2CH_2NHC(=O)CH(CH_3)_2$ |
| F-1196 | Me | F | $CH_2CH_2CH_2CH_2NHC(=O)(t\text{-}Bu)$ |
| F-1197 | Me | F | $CH_2CH_2CH_2CH_2NHC(=O)CH_2(t\text{-}Bu)$ |
| F-1198 | Me | F | $CH_2CH_2NHC(=O)CF_3$ |
| F-1199 | Me | F | $CH_2CH_2NHC(=O)CH_2CF_3$ |
| F-1200 | Me | F | $CH_2CH_2NHC(=O)CF_2CF_3$ |
| F-1201 | Me | F | $CH_2CH_2CH_2NHC(=O)CF_3$ |
| F-1202 | Me | F | $CH_2CH_2CH_2NHC(=O)CH_2CF_3$ |
| F-1203 | Me | F | $CH_2CH_2CH_2NHC(=O)CF_2CF_3$ |
| F-1204 | Me | F | $CH_2CH_2CH_2CH_2NHC(=O)CF_3$ |
| F-1205 | Me | F | $CH_2CH_2CH_2CH_2NHC(=O)CH_2CF_3$ |
| F-1206 | Me | F | $CH_2CH_2CH_2CH_2NHC(=O)CF_2CF_3$ |
| F-1207 | Me | F | $CH_2CH_2CH_2CH_2NHC(=O)CF(CF_3)_2$ |
| F-1208 | Me | F | $CH_2CH_2CH_2CH_2NHC(=O)CCl_3$ |
| F-1209 | Me | F | $CH_2CH_2NHC(=O)Ph$ |
| F-1210 | Me | F | $CH_2CH_2NHC(=O)Ph(4\text{-}CF_3)$ |
| F-1211 | Me | F | $CH_2CH_2CH_2NHC(=O)Ph(4\text{-}CF_3)$ |
| F-1212 | Me | F | $CH_2CH_2CH_2CH_2NHC(=O)Ph(4\text{-}CF_3)$ |
| F-1213 | Me | F | $CH_2CH_2NHC(=O)O(t\text{-}Bu)$ |
| F-1214 | Me | F | $CH_2CH_2CH_2NHC(=O)O(t\text{-}Bu)$ |
| F-1215 | Me | F | $CH_2CH_2CH_2CH_2NHC(=O)O(t\text{-}Bu)$ |
| F-1216 | Me | F | $CH_2CH_2CH_2CH_2NHC(=O)OCH(CH_3)_2$ |
| F-1217 | Me | F | $CH_2CH(Me)NHC(=O)O(t\text{-}Bu)$ |
| F-1218 | Me | F | $CH_2C^*H(Me)NHC(=O)O(t\text{-}Bu)$:(R) |
| F-1219 | Me | F | $CH_2C^*H(Me)NHC(=O)O(t\text{-}Bu)$:(S) |
| F-1220 | Me | F | $CH_2CH(Et)NHC(=O)O(t\text{-}Bu)$ |
| F-1221 | Me | F | $CH_2CH(i\text{-}Pr)NHC(=O)O(t\text{-}Bu)$ |
| F-1222 | Me | F | $CH(Me)CH_2NHC(=O)O(t\text{-}Bu)$ |
| F-1223 | Me | F | $CH(Et)CH_2NHC(=O)O(t\text{-}Bu)$ |
| F-1224 | Me | F | $CH(i\text{-}Pr)CH_2NHC(=O)O(t\text{-}Bu)$ |
| F-1225 | Me | F | $CH_2CH(Me)CH_2NHC(=O)O(t\text{-}Bu)$ |
| F-1226 | Me | F | $CH_2CH_2NHC(=O)OC(Me)_2CF_3$ |

TABLE 1093

| Compound Number | $R^3$ | $R^4$ | $R^5$ |
|---|---|---|---|
| F-1227 | Me | F | $CH_2CH_2CH_2NHC(=O)OCH_2CF_3$ |
| F-1228 | Me | F | $CH_2CH_2CH_2NHC(=O)OCH_2CH_2CF_3$ |
| F-1229 | Me | F | $CH_2CH_2CH_2CH_2NHC(=O)OCH_2CCl_3$ |
| F-1230 | Me | F | $CH_2CH_2CH_2CH_2NHC(=O)OCH_2CF_3$ |
| F-1231 | Me | F | $CH_2CH_2NHC(=O)NH(t\text{-}Bu)$ |
| F-1232 | Me | F | $CH_2CH_2CH_2NHC(=O)NH(t\text{-}Bu)$ |
| F-1233 | Me | F | $CH_2CH_2CH_2CH_2NHC(=O)NHEt$ |
| F-1234 | Me | F | $CH_2CH_2CH_2CH_2NHC(=O)NH(t\text{-}Bu)$ |
| F-1235 | Me | F | $CH_2CH_2CH_2NHC(=O)NHCH_2CCl_3$ |
| F-1236 | Me | F | $CH_2CH_2CH_2NHC(=O)NHCH_2CH_2F$ |
| F-1237 | Me | F | $CH_2CH_2CH_2NHC(=O)NHCH_2CF_3$ |
| F-1238 | Me | F | $CH_2CH_2CH_2CH_2NHC(=O)NHCH_2CCl_3$ |
| F-1239 | Me | F | $CH_2CH_2CH_2CH_2NHC(=O)NHCH_2CH_2F$ |
| F-1240 | Me | F | $CH_2CH_2CH_2CH_2NHC(=O)NHCH_2CF_3$ |
| F-1241 | Me | F | $CH_2CH_2NHS(=O)Me$ |
| F-1242 | Me | F | $CH_2CH_2CH_2NHS(=O)Me$ |
| F-1243 | Me | F | $CH_2CH_2CH_2CH_2NHS(=O)Me$ |
| F-1244 | Me | F | $CH_2CH_2CH_2CH_2NHS(=O)CH(CH_3)_2$ |
| F-1245 | Me | F | $CH_2CH_2CH_2CH_2CH_2NHS(=O)Me$ |
| F-1246 | Me | F | $CH_2CH_2NHS(=O)CHF_2$ |
| F-1247 | Me | F | $CH_2CH_2CH_2NHS(=O)CHF_2$ |
| F-1248 | Me | F | $CH_2CH_2CH_2CH_2NHS(=O)CHF_2$ |
| F-1249 | Me | F | $CH_2CH_2CH_2CH_2CH_2NHS(=O)CHF_2$ |
| F-1250 | Me | F | $CH_2CH(Me)NHS(=O)CHF_2$ |
| F-1251 | Me | F | $CH(Me)CH_2NHS(=O)CHF_2$ |
| F-1252 | Me | F | $CH_2CH_2CH(Me)NHS(=O)CHF_2$ |
| F-1253 | Me | F | $CH_2CH(Me)CH_2NHS(=O)CHF_2$ |
| F-1254 | Me | F | $CH(Me)CH_2CH_2NHS(=O)CHF_2$ |
| F-1255 | Me | F | $CH_2CH_2NHS(=O)CF_3$ |
| F-1256 | Me | F | $CH_2CH_2CH_2NHS(=O)CF_3$ |
| F-1257 | Me | F | $CH_2CH_2CH_2CH_2NHS(=O)CF_3$ |
| F-1258 | Me | F | $CH_2CH_2CH_2CH_2CH_2NHS(=O)CF_3$ |
| F-1259 | Me | F | $CH_2CH_2CH_2NHS(=O)Ph$ |
| F-1260 | Me | F | $CH_2CH_2CH_2CH_2NHS(=O)Ph$ |
| F-1261 | Me | F | $CH_2CH_2CH_2CH_2CH_2NHS(=O)Ph$ |
| F-1262 | Me | F | $CH_2CH_2CH_2CH_2CH_2NHS(=O)Ph(4\text{-}CF_3)$ |
| F-1263 | Me | F | $CH_2CH(Me)NHS(=O)Ph(4\text{-}CF_3)$ |
| F-1264 | Me | F | $CH_2CH(Et)NHS(=O)Ph(4\text{-}CF_3)$ |
| F-1265 | Me | F | $CH(Me)CH_2NHS(=O)Ph(4\text{-}CF_3)$ |
| F-1266 | Me | F | $CH(Et)CH_2NHS(=O)Ph(4\text{-}CF_3)$ |
| F-1267 | Me | F | $CH_2CH(Et)CH_2NHS(=O)Ph(4\text{-}CF_3)$ |
| F-1268 | Me | F | $CH_2CH_2NHS(=O)_2Me$ |
| F-1269 | Me | F | $CH_2CH_2CH_2NHS(=O)_2Me$ |
| F-1270 | Me | F | $CH_2CH_2CH_2CH_2NHS(=O)_2Me$ |

TABLE 1094

| Compound Number | $R^3$ | $R^4$ | $R^5$ |
|---|---|---|---|
| F-1271 | Me | F | $CH_2CH_2CH_2CH_2NHS(=O)_2CH(CH_3)_2$ |
| F-1272 | Me | F | $CH_2CH_2CH_2CH_2CH_2NHS(=O)_2Me$ |
| F-1273 | Me | F | $CH_2CH_2NHS(=O)_2CHF_2$ |
| F-1274 | Me | F | $CH_2CH_2CH_2NHS(=O)_2CHF_2$ |
| F-1275 | Me | F | $CH_2CH_2CH_2CH_2NHS(=O)_2CHF_2$ |
| F-1276 | Me | F | $CH_2CH_2CH_2CH_2CH_2NHS(=O)_2CHF_2$ |
| F-1277 | Me | F | $CH_2CH(Me)NHS(=O)_2CHF_2$ |
| F-1278 | Me | F | $CH(Me)CH_2NHS(=O)_2CHF_2$ |
| F-1279 | Me | F | $CH_2CH_2CH(Me)NHS(=O)_2CHF_2$ |
| F-1280 | Me | F | $CH_2CH(Me)CH_2NHS(=O)_2CHF_2$ |
| F-1281 | Me | F | $CH(Me)CH_2CH_2NHS(=O)_2CHF_2$ |
| F-1282 | Me | F | $CH_2CH(Me)N(Me)S(=O)_2CHF_2$ |
| F-1283 | Me | F | $CH(Me)CH_2N(Me)S(=O)_2CHF_2$ |
| F-1284 | Me | F | $CH_2CH_2CH(Me)N(Me)S(=O)_2CHF_2$ |
| F-1285 | Me | F | $CH_2CH(Me)CH_2N(Me)S(=O)_2CHF_2$ |
| F-1286 | Me | F | $CH(Me)CH_2CH_2N(Me)S(=O)_2CHF_2$ |
| F-1287 | Me | F | $CH_2CH_2NHS(=O)_2CF_3$ |
| F-1288 | Me | F | $CH_2CH_2CH_2NHS(=O)_2CF_3$ |
| F-1289 | Me | F | $CH_2CH_2CH_2CH_2NHS(=O)_2CF_3$ |
| F-1290 | Me | F | $CH_2CH_2CH_2CH_2CH_2NHS(=O)_2CF_3$ |
| F-1291 | Me | F | $CH_2CH_2N(Me)S(=O)_2CF_3$ |
| F-1292 | Me | F | $CH_2CH_2N(Et)S(=O)_2CF_3$ |
| F-1293 | Me | F | $CH_2CH_2N(CH_2CN)S(=O)_2CF_3$ |
| F-1294 | Me | F | $CH_2CH_2N(CH_2OMe)S(=O)_2CF_3$ |

TABLE 1094-continued

| Compound Number | $R^3$ | $R^4$ | $R^5$ |
|---|---|---|---|
| F-1295 | Me | F | $CH_2CH_2CH_2N(Me)S(=O)_2CF_3$ |
| F-1296 | Me | F | $CH_2CH_2CH_2N(Et)S(=O)_2CF_3$ |
| F-1297 | Me | F | $CH_2CH_2CH_2N(CH_2CN)S(=O)_2CF_3$ |
| F-1298 | Me | F | $CH_2CH_2CH_2N(CH_2OMe)S(=O)_2CF_3$ |
| F-1299 | Me | F | $CH_2CH_2CH_2CH_2N(Me)S(=O)_2CF_3$ |
| F-1300 | Me | F | $CH_2CH_2CH_2CH_2N(Et)S(=O)_2CF_3$ |
| F-1301 | Me | F | $CH_2CH_2CH_2CH_2N(CH_2CN)S(=O)_2CF_3$ |
| F-1302 | Me | F | $CH_2CH_2CH_2CH_2N(CH_2OMe)S(=O)_2CF_3$ |
| F-1303 | Me | F | $CH_2CH(Me)NHS(=O)_2CF_3$ |
| F-1304 | Me | F | $CH_2CH(Me)NHS(=O)_2CF_3$:(R) |
| F-1305 | Me | F | $CH_2CH(Me)NHS(=O)_2CF_3$:(S) |
| F-1306 | Me | F | $CH(Me)CH_2NHS(=O)_2CF_3$ |
| F-1307 | Me | F | $CH_2CH_2CH(Me)NHS(=O)_2CF_3$ |
| F-1308 | Me | F | $CH_2CH(Me)CH_2NHS(=O)_2CF_3$ |
| F-1309 | Me | F | $CH(Me)CH_2CH_2NHS(=O)_2CF_3$ |
| F-1310 | Me | F | $CH_2CH(Me)N(Me)S(=O)_2CF_3$ |
| F-1311 | Me | F | $CH(Me)CH_2N(Me)S(=O)_2CF_3$ |
| F-1312 | Me | F | $CH_2CH_2CH(Me)N(Me)S(=O)_2CF_3$ |
| F-1313 | Me | F | $CH_2CH(Me)CH_2N(Me)S(=O)_2CF_3$ |
| F-1314 | Me | F | $CH(Me)CH_2CH_2N(Me)S(=O)_2CF_3$ |

TABLE 1095

| Compound Number | $R^3$ | $R^4$ | $R^5$ |
|---|---|---|---|
| F-1315 | Me | F | $CH_2CH_2CH_2NHS(=O)_2Ph$ |
| F-1316 | Me | F | $CH_2CH_2CH_2CH_2NHS(=O)_2Ph$ |
| F-1317 | Me | F | $CH_2CH_2CH_2CH_2CH_2NHS(=O)_2Ph$ |
| F-1318 | Me | F | $CH_2CH_2CH_2CH_2CH_2NHS(=O)_2Ph(4-CF_3)$ |
| F-1319 | Me | F | $CH_2CH(Me)NHS(=O)_2Ph(4-CF_3)$ |
| F-1320 | Me | F | $CH_2CH(Et)NHS(=O)_2Ph(4-CF_3)$ |
| F-1321 | Me | F | $CH(Me)CH_2NHS(=O)_2Ph(4-CF_3)$ |
| F-1322 | Me | F | $CH(Et)CH_2NHS(=O)_2Ph(4-CF_3)$ |
| F-1323 | Me | F | $CH_2CH(Me)CH_2NHS(=O)_2Ph(4-CF_3)$ |
| F-1324 | Me | F | $CH_2CH_2SiMe_3$ |
| F-1325 | Me | F | $CH_2CH_2CH_2SiMe_3$ |
| F-1326 | Me | F | $CH_2CH_2CH_2CH_2SiMe_3$ |
| F-1327 | Me | F | $CH_2Ph$ |
| F-1328 | Me | F | $CH_2Ph(2-CF_3)$ |
| F-1329 | Me | F | $CH_2Ph(3-CF_3)$ |
| F-1330 | Me | F | $CH_2Ph(4-CF_3)$ |
| F-1331 | Me | F | $CH_2Ph(2-OCF_3)$ |
| F-1332 | Me | F | $CH_2Ph(3-OCF_3)$ |
| F-1333 | Me | F | $CH_2Ph(4-OCF_3)$ |
| F-1334 | Me | F | $CH_2Ph(2-SCF_3)$ |
| F-1335 | Me | F | $CH_2Ph(3-SCF_3)$ |
| F-1336 | Me | F | $CH_2Ph(4-SCF_3)$ |
| F-1337 | Me | F | $CH_2Ph(3-CH_2SCF_3)$ |
| F-1338 | Me | F | $CH_2Ph(4-F)$ |
| F-1339 | Me | F | $CH_2Ph(4-Cl)$ |
| F-1340 | Me | F | $CH_2Ph(4-Br)$ |
| F-1341 | Me | F | $CH_2Ph(4-Me)$ |
| F-1342 | Me | F | $CH_2Ph[4-(t-Bu)]$ |
| F-1343 | Me | F | $CH_2Ph(4-CN)$ |
| F-1344 | Me | F | $CH_2Ph(4-NO_2)$ |
| F-1345 | Me | F | $CH_2Ph(4-OCHF_2)$ |
| F-1346 | Me | F | $CH_2Ph(4-SCHF_2)$ |
| F-1347 | Me | F | $CH_2Ph(4-CH_2SCF_3)$ |
| F-1348 | Me | F | $CH_2Ph[4-CF(CF_3)_2]$ |
| F-1349 | Me | F | $CH_2Ph(4-CH_2SCF_3)$ |
| F-1350 | Me | F | $CH_2Ph[4-Ph(4-CF_3)]$ |
| F-1351 | Me | F | $CH_2Ph(2,4-Cl_2)$ |
| F-1352 | Me | F | $CH_2Ph[2,5-(CF_3)_2]$ |
| F-1353 | Me | F | $CH_2Ph(3,4-Cl_2)$ |
| F-1354 | Me | F | $CH_2Ph(3-CF_3-4-F)$ |
| F-1355 | Me | F | $CH_2Ph(3-CF_3-4-Cl)$ |
| F-1356 | Me | F | $CH_2Ph(3-F-4-CF_3)$ |
| F-1357 | Me | F | $CH_2Ph(2,4,6-F_3)$ |
| F-1358 | Me | F | $CH_2Ph(3,4,5-F_3)$ |

TABLE 1096

| Compound Number | $R^3$ | $R^4$ | $R^5$ |
|---|---|---|---|
| F-1359 | Me | F | $CH_2Ph(2,3,4-F_3)$ |
| F-1360 | Me | F | $CH_2Ph(3,4,5-Cl_3)$ |
| F-1361 | Me | F | $CH_2CH_2Ph$ |
| F-1362 | Me | F | $CH_2CH_2Ph(4-F)$ |
| F-1363 | Me | F | $CH_2CH_2Ph(4-Cl)$ |
| F-1364 | Me | F | $CH_2CH_2Ph(4-Br)$ |
| F-1365 | Me | F | $CH_2CH_2Ph[4-(t-Bu)]$ |
| F-1366 | Me | F | $CH_2CH_2Ph(2-CF_3)$ |
| F-1367 | Me | F | $CH_2CH_2Ph(3-CF_3)$ |
| F-1368 | Me | F | $CH_2CH_2Ph(4-CF_3)$ |
| F-1369 | Me | F | $CH_2CH_2Ph[4-CF(CF_3)_2]$ |
| F-1370 | Me | F | $CH_2CH_2Ph[4-(c-Pr)]$ |
| F-1371 | Me | F | $CH_2CH_2Ph\{4-[c-Pr(2,2-F_2)]\}$ |
| F-1372 | Me | F | $CH_2CH_2Ph(4-OMe)$ |
| F-1373 | Me | F | $CH_2CH_2Ph(3-OCF_3)$ |
| F-1374 | Me | F | $CH_2CH_2Ph(4-OCHF_2)$ |
| F-1375 | Me | F | $CH_2CH_2Ph(4-OCF_3)$ |
| F-1376 | Me | F | $CH_2CH_2Ph(4-SMe)$ |
| F-1377 | Me | F | $CH_2CH_2Ph(4-SCHF_2)$ |
| F-1378 | Me | F | $CH_2CH_2Ph(4-SCF_3)$ |
| F-1379 | Me | F | $CH_2CH_2Ph[4-S(=O)Me]$ |
| F-1380 | Me | F | $CH_2CH_2Ph[4-S(=O)CF_3]$ |
| F-1381 | Me | F | $CH_2CH_2Ph[4-S(=O)_2Me]$ |
| F-1382 | Me | F | $CH_2CH_2Ph[4-S(=O)_2CF_3]$ |
| F-1383 | Me | F | $CH_2CH_2Ph(4-CH_2SMe)$ |
| F-1384 | Me | F | $CH_2CH_2Ph(4-CH_2SCF_3)$ |
| F-1385 | Me | F | $CH_2CH_2Ph[4-OS(=O)_2Me]$ |
| F-1386 | Me | F | $CH_2CH_2Ph[4-OS(=O)_2CF_3]$ |
| F-1387 | Me | F | $CH_2CH_2Ph[4-Ph(4-CF_3)]$ |
| F-1388 | Me | F | $CH_2CH_2Ph(4-CH_2Ph)$ |
| F-1389 | Me | F | $CH_2CH_2Ph(4-OCH_2Ph)$ |
| F-1390 | Me | F | $CH_2CH_2Ph(4-CN)$ |
| F-1391 | Me | F | $CH_2CH_2Ph(4-NO_2)$ |
| F-1392 | Me | F | $CH_2CH_2Ph(2,4-Cl_2)$ |
| F-1393 | Me | F | $CH_2CH_2Ph(3,4-Cl_2)$ |
| F-1394 | Me | F | $CH_2CH_2Ph(3-CF_3-4-F)$ |
| F-1395 | Me | F | $CH_2CH_2Ph(2-CF_3-4-F)$ |
| F-1396 | Me | F | $CH_2CH_2Ph(3-F-4-CF_3)$ |
| F-1397 | Me | F | $CH_2CH_2Ph(2-F-4-CF_3)$ |
| F-1398 | Me | F | $CH_2CH_2Ph(3-Cl-4-OCHF_2)$ |
| F-1399 | Me | F | $CH_2CH_2Ph(3,4,5-Cl_3)$ |
| F-1400 | Me | F | $CH_2CH_2Ph(2,3,4-F_3)$ |
| F-1401 | Me | F | $CH_2CH_2Ph(2,4,5-F_3)$ |
| F-1402 | Me | F | $CH_2CH_2Ph(3,4,5-F_3)$ |

TABLE 1097

| Compound Number | $R^3$ | $R^4$ | $R^5$ |
|---|---|---|---|
| F-1403 | Me | F | $CH_2CH_2Ph(2,4,6-F_3)$ |
| F-1404 | Me | F | $CH_2CH_2CH_2Ph$ |
| F-1405 | Me | F | $CH_2CH_2CH_2Ph(3-CF_3)$ |
| F-1406 | Me | F | $CH_2CH_2CH_2Ph(4-CF_3)$ |
| F-1407 | Me | F | $CH_2CH_2CH_2Ph(4-F)$ |
| F-1408 | Me | F | $CH_2CH_2CH_2Ph[4-(t-Bu)]$ |
| F-1409 | Me | F | $CH_2CH_2CH_2Ph(4-CN)$ |
| F-1410 | Me | F | $CH_2CH_2CH_2Ph(4-CF_3)$ |
| F-1411 | Me | F | $CH_2CH_2CH_2Ph(4-OCHF_2)$ |
| F-1412 | Me | F | $CH_2CH_2CH_2Ph(4-OCF_3)$ |
| F-1413 | Me | F | $CH_2CH_2CH_2Ph(4-SCHF_2)$ |
| F-1414 | Me | F | $CH_2CH_2CH_2Ph(4-SCF_3)$ |
| F-1415 | Me | F | $CH_2CH_2CH_2Ph[4-CF(CF_3)_2]$ |
| F-1416 | Me | F | $CH_2CH_2CH_2Ph(3,4,5-F_3)$ |
| F-1417 | Me | F | $CH_2CH_2CH_2Ph(2,4,6-F_3)$ |
| F-1418 | Me | F | $CH_2CH_2CH_2CH_2Ph$ |
| F-1419 | Me | F | $CH_2CH_2CH_2CH_2Ph(4-F)$ |
| F-1420 | Me | F | $CH_2CH_2CH_2CH_2Ph(4-CF_3)$ |
| F-1421 | Me | F | $CH_2CH_2CH_2CH_2Ph(4-OCF_3)$ |
| F-1422 | Me | F | $CH_2CH_2CH_2CH_2Ph(4-SCF_3)$ |
| F-1423 | Me | F | $CH_2CH_2CH_2CH_2CH_2Ph$ |
| F-1424 | Me | F | $CH_2CH_2CH_2CH_2CH_2CH_2Ph$ |
| F-1425 | Me | F | $CH_2CF_2Ph(4-F)$ |
| F-1426 | Me | F | $CH_2CF_2Ph(4-CF_3)$ |

TABLE 1097-continued

| Compound Number | $R^3$ | $R^4$ | $R^5$ |
|---|---|---|---|
| F-1427 | Me | F | $CH_2CF_2Ph(3,4,5-F_3)$ |
| F-1428 | Me | F | $CH_2CH_2OPh$ |
| F-1429 | Me | F | $CH_2CH_2OPh(4-F)$ |
| F-1430 | Me | F | $CH_2CH_2OPh(4-CF_3)$ |
| F-1431 | Me | F | $CH_2CH_2CH_2OPh$ |
| F-1432 | Me | F | $CH_2CH_2CH_2OPh(4-Cl)$ |
| F-1433 | Me | F | $CH_2CH_2CH_2OPh(4-CF_3)$ |
| F-1434 | Me | F | $CH_2CH_2CH_2CH_2OPh(4-CF_3)$ |
| F-1435 | Me | F | $CH_2CH_2CH_2CH_2OPh(4-OCF_3)$ |
| F-1436 | Me | F | $CH_2CH_2CH_2CH_2CH_2OPh(4-CF_3)$ |
| F-1437 | Me | F | $CH_2CH_2OCH_2Ph$ |
| F-1438 | Me | F | $CH_2CH_2CH_2OCH_2Ph$ |
| F-1439 | Me | F | $CH_2CH_2CH_2CH_2OCH_2Ph$ |
| F-1440 | Me | F | $CH_2CH_2CH_2CH_2CH_2OCH_2Ph$ |
| F-1441 | Me | F | $CH_2CH_2SPh$ |
| F-1442 | Me | F | $CH_2CH_2CH_2SPh$ |
| F-1443 | Me | F | $CH_2CH_2CH_2SPh(4-F)$ |
| F-1444 | Me | F | $CH_2CH_2CH_2SPh(4-Cl)$ |
| F-1445 | Me | F | $CH_2CH_2CH_2SPh(4-Br)$ |
| F-1446 | Me | F | $CH_2CH_2CH_2SPh[4-(t-Bu)]$ |

TABLE 1098

| Compound Number | $R^3$ | $R^4$ | $R^5$ |
|---|---|---|---|
| F-1447 | Me | F | $CH_2CH_2CH_2SPh(3-CF_3)$ |
| F-1448 | Me | F | $CH_2CH_2CH_2SPh(4-CF_3)$ |
| F-1449 | Me | F | $CH_2CH_2CH_2SPh(3-SCF_3)$ |
| F-1450 | Me | F | $CH_2CH_2CH_2SPh(4-SCF_3)$ |
| F-1451 | Me | F | $CH_2CH_2CH_2CH_2SPh$ |
| F-1452 | Me | F | $CH_2CH_2CH_2CH_2SPh(4-F)$ |
| F-1453 | Me | F | $CH_2CH_2CH_2CH_2SPh(4-Cl)$ |
| F-1454 | Me | F | $CH_2CH_2CH_2CH_2SPh[4-(t-Bu)]$ |
| F-1455 | Me | F | $CH_2CH_2CH_2CH_2SPh(4-CF_3)$ |
| F-1456 | Me | F | $CH_2CH_2CH_2CH_2CH_2SPh$ |
| F-1457 | Me | F | $CH_2CH_2CH_2CH_2CH_2SPh(4-F)$ |
| F-1458 | Me | F | $CH_2CH_2CH_2CH_2CH_2SPh(4-Cl)$ |
| F-1459 | Me | F | $CH_2CH_2CH_2CH_2CH_2SPh(4-CF_3)$ |
| F-1460 | Me | F | $CH_2CH_2S({=}O)Ph$ |
| F-1461 | Me | F | $CH_2CH_2CH_2S({=}O)Ph$ |
| F-1462 | Me | F | $CH_2CH_2CH_2S({=}O)Ph(4-F)$ |
| F-1463 | Me | F | $CH_2CH_2CH_2S({=}O)Ph[4-(t-Bu)]$ |
| F-1464 | Me | F | $CH_2CH_2CH_2S({=}O)Ph(4-CF_3)$ |
| F-1465 | Me | F | $CH_2CH_2S({=}O)_2Ph$ |
| F-1466 | Me | F | $CH_2CH_2S({=}O)_2Ph(4-CF_3)$ |
| F-1467 | Me | F | $CH_2CH_2CH_2S({=}O)_2Ph(4-F)$ |
| F-1468 | Me | F | $CH_2CH_2CH_2S({=}O)_2Ph(4-Cl)$ |
| F-1469 | Me | F | $CH_2CH_2CH_2S({=}O)_2Ph(4-CF_3)$ |
| F-1470 | Me | F | $CH_2CH_2CH_2CH_2S({=}O)_2Ph$ |
| F-1471 | Me | F | $CH_2CH_2CH_2CH_2S({=}O)_2Ph(4-Cl)$ |
| F-1472 | Me | F | $CH_2CH_2CH_2CH_2S({=}O)_2Ph(4-CF_3)$ |
| F-1473 | Me | F | $CH_2CH_2SCH_2Ph$ |
| F-1474 | Me | F | $CH_2CH_2CH_2SCH_2Ph$ |
| F-1475 | Me | F | $CH_2CH_2CH_2SCH_2Ph(2-Cl)$ |
| F-1476 | Me | F | $CH_2CH_2CH_2SCH_2Ph(3-Cl)$ |
| F-1477 | Me | F | $CH_2CH_2CH_2SCH_2Ph(4-Cl)$ |
| F-1478 | Me | F | $CH_2CH_2CH_2SCH_2Ph(2-SCF_3)$ |
| F-1479 | Me | F | $CH_2CH_2CH_2SCH_2Ph(3-CF_3)$ |
| F-1480 | Me | F | $CH_2CH_2CH_2SCH_2Ph(4-CF_3)$ |
| F-1481 | Me | F | $CH_2CH_2CH_2SCH_2Ph(4-NO_2)$ |
| F-1482 | Me | F | $CH_2CH_2CH_2CH_2SCH_2Ph$ |
| F-1483 | Me | F | $CH_2CH_2CH_2CH_2SCH_2Ph(4-Cl)$ |
| F-1484 | Me | F | $CH_2CH_2CH_2CH_2SCH_2Ph(4-CF_3)$ |
| F-1485 | Me | F | $CH_2CH_2CH_2CH_2SCH_2Ph(4-CN)$ |
| F-1486 | Me | F | $CH_2CH_2CH_2CH_2CH_2SCH_2Ph$ |
| F-1487 | Me | F | $CH_2CH_2SCH_2CH_2Ph$ |
| F-1488 | Me | F | $CH_2CH_2CH_2SCH_2CH_2Ph$ |
| F-1489 | Me | F | $CH_2CH_2CH_2CH_2SCH_2CH_2Ph$ |
| F-1490 | Me | F | $CH_2CH_2SCH(Me)Ph$ |

TABLE 1099

| Compound Number | $R^3$ | $R^4$ | $R^5$ |
|---|---|---|---|
| F-1491 | Me | F | $CH_2CH_2CH_2SCH(Me)Ph$ |
| F-1492 | Me | F | $CH_2CH_2CH_2CH_2SCH(Me)Ph$ |
| F-1493 | Me | F | $CH_2CH_2S({=}O)CH_2Ph$ |
| F-1494 | Me | F | $CH_2CH_2S({=}O)CH_2Ph(4-CF_3)$ |
| F-1495 | Me | F | $CH_2CH_2CH_2S({=}O)CH_2Ph$ |
| F-1496 | Me | F | $CH_2CH_2CH_2S({=}O)CH_2Ph(2-SCF_3)$ |
| F-1497 | Me | F | $CH_2CH_2CH_2S({=}O)CH_2Ph(4-SCF_3)$ |
| F-1498 | Me | F | $CH_2CH_2CH_2S({=}O)CH_2Ph(4-Cl)$ |
| F-1499 | Me | F | $CH_2CH_2CH_2S({=}O)CH_2Ph(4-CF_3)$ |
| F-1500 | Me | F | $CH_2CH_2CH_2CH_2S({=}O)CH_2Ph$ |
| F-1501 | Me | F | $CH_2CH_2CH_2CH_2S({=}O)CH_2Ph(4-CF_3)$ |
| F-1502 | Me | F | $CH_2CH_2CH_2CH_2CH_2S({=}O)CH_2Ph(4-CF_3)$ |
| F-1503 | Me | F | $CH_2CH_2S({=}O)_2CH_2Ph$ |
| F-1504 | Me | F | $CH_2CH_2S({=}O)_2CH_2Ph(4-CF_3)$ |
| F-1505 | Me | F | $CH_2CH_2CH_2S({=}O)_2CH_2Ph$ |
| F-1506 | Me | F | $CH_2CH_2CH_2S({=}O)_2CH_2Ph(4-Cl)$ |
| F-1507 | Me | F | $CH_2CH_2CH_2S({=}O)_2CH_2Ph(4-CF_3)$ |
| F-1508 | Me | F | $CH_2CH_2CH_2CH_2S({=}O)_2CH_2Ph$ |
| F-1509 | Me | F | $CH_2CH_2CH_2CH_2S({=}O)_2CH_2Ph(4-CF_3)$ |
| F-1510 | Me | F | $CH_2CH_2CH_2CH_2CH_2S({=}O)_2CH_2Ph$ |
| F-1511 | Me | F | $CH_2CH_2CH_2CH_2CH_2S({=}O)_2CH_2Ph(4-CF_3)$ |
| F-1512 | Me | F | $CH_2CH_2ON{=}CH(t-Bu)$ |
| F-1513 | Me | F | $CH_2CH_2CH_2ON{=}CH(t-Bu)$ |
| F-1514 | Me | F | $CH_2CH_2CH_2CH_2ON{=}C(Me)(c-Pr)$ |
| F-1515 | Me | F | $CH_2CH_2ON{=}C(Me)CF_3$ |
| F-1516 | Me | F | $CH_2CH_2CH_2ON{=}CHCF_3$ |
| F-1517 | Me | F | $CH_2CH_2CH_2ON{=}C(Me)CF_3$ |
| F-1518 | Me | F | $CH_2CH_2CH_2ON{=}C(Me)CCl_3$ |
| F-1519 | Me | F | $CH_2CH_2CH_2CH_2ON{=}CHCF_3$ |
| F-1520 | Me | F | $CH_2CH_2CH_2CH_2ON{=}C(Me)CF_3$ |
| F-1521 | Me | F | $CH_2CH_2CH_2CH_2CH_2ON{=}C(Me)CF_3$ |
| F-1522 | Me | F | $CH_2CH_2ON{=}CHPh$ |
| F-1523 | Me | F | $CH_2CH_2ON{=}CHPh(4-CF_3)$ |
| F-1524 | Me | F | $CH_2CH_2ON{=}CHPh(4-SCF_3)$ |
| F-1525 | Me | F | $CH_2CH_2CH_2ON{=}CHPh(3-CF_3)$ |
| F-1526 | Me | F | $CH_2CH_2CH_2ON{=}CHPh(4-CF_3)$ |
| F-1527 | Me | F | $CH_2CH_2CH_2ON{=}CHPh(4-SCF_3)$ |
| F-1528 | Me | F | $CH_2CH_2CH_2ON{=}C(Me)Ph(4-CF_3)$ |
| F-1529 | Me | F | $CH_2CH_2CH_2CH_2ON{=}CHPh(4-SCF_3)$ |
| F-1530 | Me | F | $CH_2CH_2$(adamant-1-yl) |
| F-1531 | Me | F | $CH_2CH_2CH_2(3-CF_3$-pyrazol-1-yl) |
| F-1532 | Me | F | $CH_2CH_2CH_2CH_2(3-CF_3$-pyrazol-1-yl) |
| F-1533 | Me | F | $CH_2CH_2CH_2CH_2CH_2(3-CF_3$-pyrazol-1-yl) |
| F-1534 | Me | F | $CH_2(1-Me-4-CF_3$-imidazol-5-yl) |

TABLE 1100

| Compound Number | $R^3$ | $R^4$ | $R^5$ |
|---|---|---|---|
| F-1535 | Me | F | $CH_2CH_2(1-Me-4-CF_3$-imidazol-5-yl) |
| F-1536 | Me | F | $CH_2CH_2CH_2(1-Me-4-CF_3$-imidazol-5-yl) |
| F-1537 | Me | F | $CH_2CH_2CH_2(3-CF_3$-1,2,4-triazol-1-yl) |
| F-1538 | Me | F | $CH_2CH_2CH_2CH_2(3-CF_3$-1,2,4-triazol-1-yl) |
| F-1539 | Me | F | $CH_2CH_2CH_2CH_2CH_2(3-CF_3$-1,2,4-triazol-1-yl) |
| F-1540 | Me | F | $CH_2CH_2CH_2(4-CF_3$-thiazol-2-yl) |
| F-1541 | Me | F | $CH_2CH_2CH_2CH_2(4-CF_3$-thiazol-2-yl) |
| F-1542 | Me | F | $CH_2CH_2CH_2CH_2CH_2(4-CF_3$-thiazol-2-yl) |
| F-1543 | Me | F | $CH_2CH_2CH_2(2-CF_3$-pyridin-5-yl) |
| F-1544 | Me | F | $CH_2CH_2CH_2CH_2(2-CF_3$-pyridin-5-yl) |
| F-1545 | Me | F | $CH_2CH_2CH_2CH_2CH_2(2-CF_3$-pyridin-5-yl) |
| F-1546 | Me | F | $CH_2(4-CF_3$-pyrimidin-2-yl) |
| F-1547 | Me | F | $CH_2CH_2(4-CF_3$-pyrimidin-2-yl) |
| F-1548 | Me | F | $CH_2CH_2CH_2(4-CF_3$-pyrimidin-2-yl) |
| F-1549 | Me | F | $CH_2CH_2O(3-Cl-5-CF_3$-pyridin-2-yl) |
| F-1550 | Me | F | $CH_2CH_2CH_2O(3-Cl-5-CF_3$-pyridin-2-yl) |
| F-1551 | Me | F | $CH_2CH_2CH_2CH_2O(3-Cl-5-CF_3$-pyridin-2-yl) |
| F-1552 | Me | F | $CH_2CH_2CH_2CH_2CH_2O(3-Cl-5-CF_3$-pyridin-2-yl) |
| F-1553 | Me | F | $CH_2CH_2$N(Phth) |
| F-1554 | Me | F | $CH_2CH_2CH_2$N(Phth) |
| F-1555 | Me | F | $CH_2CH_2CH_2CH_2$N(Phth) |
| F-1556 | Me | F | $CH_2CH_2CH_2CH_2CH_2$N(Phth) |

TABLE 1100-continued

| Compound Number | $R^3$ | $R^4$ | $R^5$ |
|---|---|---|---|
| F-1557 | Me | F | $CH_2CH(Me)CH_2N(Phth)$ |
| F-1558 | Me | F | $CH_2CH_2CH_2CN$ |
| F-1559 | Me | F | $CH_2CH_2CH_2CH_2CN$ |
| F-1560 | Me | F | $CH_2CH_2CH_2CH_2CH_2CN$ |
| F-1561 | Me | F | $CH_2CH_2CH_2CH_2CH_2CH_2CN$ |
| F-1562 | Me | F | $CH_2CH_2CH_2C({=}O)OH$ |
| F-1563 | Me | F | $CH_2CH_2CH_2CH_2C({=}O)OH$ |
| F-1564 | Me | F | $CH_2CH_2CH_2CH_2CH_2C({=}O)OH$ |
| F-1565 | Me | F | $CH_2CH_2SCN$ |
| F-1566 | Me | F | $CH_2CH_2CH_2SCN$ |
| F-1567 | Me | F | $CH_2CH_2CH_2CH_2SCN$ |
| F-1568 | Me | F | $CH_2CH_2CH_2CH_2CH_2SCN$ |
| F-1569 | Me | F | $CH_2CH_2CH_2CH_2CH_2CH_2SCN$ |
| F-1570 | Me | F | $CH_2CH_2CH_2CH_2CH_2CH_2CH_2SCN$ |
| F-1571 | Me | F | $CH_2CH_2CH_2CH_2CH_2CH_2CH_2CH_2SCN$ |
| F-1572 | Me | F | $CH_2CH_2CH(Me)SCN$ |
| F-1573 | Me | F | $CH_2CH(Me)CH_2SCN$ |
| F-1574 | Me | F | $CH(Me)CH_2CH_2SCN$ |
| F-1575 | Me | F | $CH_2CH_2CH_2CH(Me)SCN$ |
| F-1576 | Me | F | $CH_2CH_2CH(Me)CH_2SCN$ |
| F-1577 | Me | F | $CH_2CH(Me)CH_2CH_2SCN$ |
| F-1578 | Me | F | $CH(Me)CH_2CH_2CH_2SCN$ |

TABLE 1101

| Compound Number | $R^3$ | $R^4$ | $R^5$ |
|---|---|---|---|
| F-1579 | Me | F | $CH_2CH_2CH_2CH_2CH(Me)SCN$ |
| F-1580 | Me | F | $CH_2CH_2CH_2CH(Me)CH_2SCN$ |
| F-1581 | Me | F | $CH_2CH_2CH(Me)CH_2CH_2SCN$ |
| F-1582 | Me | F | $CH_2CH(Me)CH_2CH_2CH_2SCN$ |
| F-1583 | Me | F | $CH(Me)CH_2CH_2CH_2CH_2SCN$ |
| F-1584 | Me | F | $CH_2CH_2ONH_2$ |
| F-1585 | Me | F | $CH_2CH_2CH_2ONH_2$ |
| F-1586 | Me | F | $CH_2CH_2CH_2CH_2ONH_2$ |
| F-1587 | Me | F | $CH_2CH_2CH_2CH_2CH_2ONH_2$ |
| F-1588 | Me | F | $CH_2CH_2CH_2CH_2CH_2CH_2ONH_2$ |
| F-1589 | Cl | H | $CH_2C({=}O)Me$ |
| F-1590 | Cl | H | $CH_2CH(OH)Me$ |
| F-1591 | Cl | H | $CH_2CH(OH)CF_3$ |
| F-1592 | Cl | H | $CH_2C(OH)_2CF_3$ |
| F-1593 | Cl | H | $CH_2C(CF_3){=}NOH$ |
| F-1594 | Cl | H | $CH_2C(CF_3){=}NOMe$ |
| F-1595 | Cl | H | $CH_2CH(CF_3)NH_2$ |
| F-1596 | Cl | H | $CH_2CH(CF_3)NHSO_2CF_3$ |
| F-1597 | Cl | H | $CH_2\{c\text{-}Pr[1\text{-}NHS({=}O)_2CF_3]\}$ |
| F-1598 | Cl | H | $CH_2CH(Me)NH(c\text{-}Pr)$ |
| F-1599 | Cl | H | $CH_2CH(Me)N(c\text{-}Pr)S({=}O)_2CF_3$ |
| F-1600 | Cl | H | $CH_2CH(Me)NHOMe$ |
| F-1601 | Cl | H | $CH_2CH(Me)N(OMe)S({=}O)_2CF_3$ |
| F-1602 | Cl | H | $CH_2CH(Me)N(OMe)S({=}O)_2Ph(2\text{-}NO_2)$ |
| F-1603 | Cl | H | $CH_2CH(Me)N(OMe)S({=}O)_2Ph(4\text{-}NO_2)$ |
| F-1604 | Cl | H | $CH_2CH_2SCHF_2$ |
| F-1605 | Cl | H | $CH_2CH_2CH_2SCHF_2$ |
| F-1606 | Cl | H | $CH_2CH_2CH_2CH_2SCHF_2$ |
| F-1607 | Cl | H | $CH_2CH_2CH_2CH_2CH_2SCHF_2$ |
| F-1608 | Cl | H | $CH_2CH_2CH_2CH_2CH_2CH_2SCHF_2$ |
| F-1609 | Cl | H | $CH_2CH_2CH_2CH_2CH_2CH_2CH_2SCHF_2$ |
| F-1610 | Cl | H | $CH_2CH_2SCF_3$ |
| F-1611 | Cl | H | $CH_2CH_2CH_2SCF_3$ |
| F-1612 | Cl | H | $CH_2CH_2CH_2CH_2SCF_3$ |
| F-1613 | Cl | H | $CH_2CH_2CH_2CH_2CH_2SCF_3$ |
| F-1614 | Cl | H | $CH_2CH_2CH_2CH_2CH_2CH_2SCF_3$ |
| F-1615 | Cl | H | $CH_2CH_2CH_2CH_2CH_2CH_2CH_2SCF_3$ |
| F-1616 | Cl | H | $CH_2CH_2CH_2CH_2CH_2CH_2CH_2CH_2SCF_3$ |
| F-1617 | Cl | H | $CH_2CH(Me)SCF_3$ |
| F-1618 | Cl | H | $CH(Me)CH_2SCF_3$ |
| F-1619 | Cl | H | $CH_2CH_2CH(Me)SCF_3$ |
| F-1620 | Cl | H | $CH_2CH(Me)CH_2SCF_3$ |
| F-1621 | Cl | H | $CH(Me)CH_2CH_2SCF_3$ |
| F-1622 | Cl | H | $CH_2CH_2CH_2CH(Me)SCF_3$ |

TABLE 1102

| Compound Number | $R^3$ | $R^4$ | $R^5$ |
|---|---|---|---|
| F-1623 | Cl | H | $CH_2CH_2CH(Me)CH_2SCF_3$ |
| F-1624 | Cl | H | $CH_2CH(Me)CH_2CH_2SCF_3$ |
| F-1625 | Cl | H | $CH(Me)CH_2CH_2CH_2SCF_3$ |
| F-1626 | Cl | H | $CH_2CH_2NHS({=}O)_2CF_3$ |
| F-1627 | Cl | H | $CH_2CH_2CH_2NHS({=}O)_2CF_3$ |
| F-1628 | Cl | H | $CH_2CH_2CH_2CH_2NHS({=}O)_2CF_3$ |
| F-1629 | Cl | H | $CH_2CH_2CH_2CH_2CH_2NHS({=}O)_2CF_3$ |
| F-1630 | Cl | H | $CH_2CH_2N(Me)S({=}O)_2CF_3$ |
| F-1631 | Cl | H | $CH_2CH_2N(Et)S({=}O)_2CF_3$ |
| F-1632 | Cl | H | $CH_2CH_2N(CH_2CN)S({=}O)_2CF_3$ |
| F-1633 | Cl | H | $CH_2CH_2N(CH_2OMe)S({=}O)_2CF_3$ |
| F-1634 | Cl | H | $CH_2CH_2CH_2N(Me)S({=}O)_2CF_3$ |
| F-1635 | Cl | H | $CH_2CH_2CH_2N(Et)S({=}O)_2CF_3$ |
| F-1636 | Cl | H | $CH_2CH_2CH_2N(CH_2CN)S({=}O)_2CF_3$ |
| F-1637 | Cl | H | $CH_2CH_2CH_2N(CH_2OMe)S({=}O)_2CF_3$ |
| F-1638 | Cl | H | $CH_2CH_2CH_2CH_2N(Me)S({=}O)_2CF_3$ |
| F-1639 | Cl | H | $CH_2CH_2CH_2CH_2N(Et)S({=}O)_2CF_3$ |
| F-1640 | Cl | H | $CH_2CH_2CH_2CH_2N(CH_2CN)S({=}O)_2CF_3$ |
| F-1641 | Cl | H | $CH_2CH_2CH_2CH_2N(CH_2OMe)S({=}O)_2CF_3$ |
| F-1642 | Cl | H | $CH_2CH(Me)NHS({=}O)_2CF_3$ |
| F-1643 | Cl | H | $CH_2C{*}H(Me)NHS({=}O)_2CF_3{:}(R)$ |
| F-1644 | Cl | H | $CH_2C{*}H(Me)NHS({=}O)_2CF_3{:}(S)$ |
| F-1645 | Cl | H | $CH(Me)CH_2NHS({=}O)_2CF_3$ |
| F-1646 | Cl | H | $CH_2CH_2CH(Me)NHS({=}O)_2CF_3$ |
| F-1647 | Cl | H | $CH_2CH(Me)CH_2NHS({=}O)_2CF_3$ |
| F-1648 | Cl | H | $CH(Me)CH_2CH_2NHS({=}O)_2CF_3$ |
| F-1649 | Cl | H | $CH_2CH(Me)N(Me)S({=}O)_2CF_3$ |
| F-1650 | Cl | H | $CH(Me)CH_2N(Me)S({=}O)_2CF_3$ |
| F-1651 | Cl | H | $CH_2CH_2CH(Me)N(Me)S({=}O)_2CF_3$ |
| F-1652 | Cl | H | $CH_2CH(Me)CH_2N(Me)S({=}O)_2CF_3$ |
| F-1653 | Cl | H | $CH(Me)CH_2CH_2N(Me)S({=}O)_2CF_3$ |
| F-1654 | Cl | H | $CH_2Ph$ |
| F-1655 | Cl | H | $CH_2Ph(2\text{-}CF_3)$ |
| F-1656 | Cl | H | $CH_2Ph(3\text{-}CF_3)$ |
| F-1657 | Cl | H | $CH_2Ph(4\text{-}CF_3)$ |
| F-1658 | Cl | H | $CH_2Ph(2\text{-}OCF_3)$ |
| F-1659 | Cl | H | $CH_2Ph(3\text{-}OCF_3)$ |
| F-1660 | Cl | H | $CH_2Ph(4\text{-}OCF_3)$ |
| F-1661 | Cl | H | $CH_2Ph(2\text{-}SCF_3)$ |
| F-1662 | Cl | H | $CH_2Ph(3\text{-}SCF_3)$ |
| F-1663 | Cl | H | $CH_2Ph(4\text{-}SCF_3)$ |
| F-1664 | Cl | H | $CH_2Ph(3\text{-}CH_2SCF_3)$ |
| F-1665 | Cl | H | $CH_2Ph(4\text{-}F)$ |
| F-1666 | Cl | H | $CH_2Ph(4\text{-}Cl)$ |

TABLE 1103

| Compound Number | $R^3$ | $R^4$ | $R^5$ |
|---|---|---|---|
| F-1667 | Cl | H | $CH_2Ph(4\text{-}Br)$ |
| F-1668 | Cl | H | $CH_2Ph(4\text{-}Me)$ |
| F-1669 | Cl | H | $CH_2Ph[4\text{-}(t\text{-}Bu)]$ |
| F-1670 | Cl | H | $CH_2Ph(4\text{-}CN)$ |
| F-1671 | Cl | H | $CH_2Ph(4\text{-}NO_2)$ |
| F-1672 | Cl | H | $CH_2Ph(4\text{-}OCHF_2)$ |
| F-1673 | Cl | H | $CH_2Ph(4\text{-}SCHF_2)$ |
| F-1674 | Cl | H | $CH_2Ph(4\text{-}CH_2SCF_3)$ |
| F-1675 | Cl | H | $CH_2Ph[4\text{-}CF(CF_3)_2]$ |
| F-1676 | Cl | H | $CH_2Ph(4\text{-}CH_2SCF_3)$ |
| F-1677 | Cl | H | $CH_2Ph[4\text{-}Ph(4\text{-}CF_3)]$ |
| F-1678 | Cl | H | $CH_2Ph(2,4\text{-}Cl_2)$ |
| F-1679 | Cl | H | $CH_2Ph[2,5\text{-}(CF_3)_2]$ |
| F-1680 | Cl | H | $CH_2Ph(3,4\text{-}Cl_2)$ |
| F-1681 | Cl | H | $CH_2Ph(3\text{-}CF_3\text{-}4\text{-}F)$ |
| F-1682 | Cl | H | $CH_2Ph(3\text{-}CF_3\text{-}4\text{-}Cl)$ |
| F-1683 | Cl | H | $CH_2Ph(3\text{-}F\text{-}4\text{-}CF_3)$ |
| F-1684 | Cl | H | $CH_2Ph(2,4,6\text{-}F_3)$ |
| F-1685 | Cl | H | $CH_2Ph(3,4,5\text{-}F_3)$ |
| F-1686 | Cl | H | $CH_2Ph(2,3,4\text{-}F_3)$ |
| F-1687 | Cl | H | $CH_2Ph(3,4,5\text{-}Cl_3)$ |
| F-1688 | Cl | H | $CH_2CH_2Ph$ |
| F-1689 | Cl | H | $CH_2CH_2Ph(4\text{-}F)$ |
| F-1690 | Cl | H | $CH_2CH_2Ph(4\text{-}Cl)$ |

TABLE 1103-continued

| Compound Number | $R^3$ | $R^4$ | $R^5$ |
|---|---|---|---|
| F-1691 | Cl | H | $CH_2CH_2Ph(4-Br)$ |
| F-1692 | Cl | H | $CH_2CH_2Ph[4-(t-Bu)]$ |
| F-1693 | Cl | H | $CH_2CH_2Ph(2-CF_3)$ |
| F-1694 | Cl | H | $CH_2CH_2Ph(3-CF_3)$ |
| F-1695 | Cl | H | $CH_2CH_2Ph(4-CF_3)$ |
| F-1696 | Cl | H | $CH_2CH_2Ph[4-CF(CF_3)_2]$ |
| F-1697 | Cl | H | $CH_2CH_2Ph[4-(c-Pr)]$ |
| F-1698 | Cl | H | $CH_2CH_2Ph\{4-[c-Pr(2,2-F_2)]\}$ |
| F-1699 | Cl | H | $CH_2CH_2Ph(4-OMe)$ |
| F-1700 | Cl | H | $CH_2CH_2Ph(3-OCF_3)$ |
| F-1701 | Cl | H | $CH_2CH_2Ph(4-OCHF_2)$ |
| F-1702 | Cl | H | $CH_2CH_2Ph(4-OCF_3)$ |
| F-1703 | Cl | H | $CH_2CH_2Ph(4-SMe)$ |
| F-1704 | Cl | H | $CH_2CH_2Ph(4-SCHF_2)$ |
| F-1705 | Cl | H | $CH_2CH_2Ph(4-SCF_3)$ |
| F-1706 | Cl | H | $CH_2CH_2Ph[4-S(=O)Me]$ |
| F-1707 | Cl | H | $CH_2CH_2Ph[4-S(=O)CF_3]$ |
| F-1708 | Cl | H | $CH_2CH_2Ph[4-S(=O)_2Me]$ |
| F-1709 | Cl | H | $CH_2CH_2Ph[4-S(=O)_2CF_3]$ |
| F-1710 | Cl | H | $CH_2CH_2Ph(4-CH_2SMe)$ |

TABLE 1104

| Compound Number | $R^3$ | $R^4$ | $R^5$ |
|---|---|---|---|
| F-1711 | Cl | H | $CH_2CH_2Ph(4-CH_2SCF_3)$ |
| F-1712 | Cl | H | $CH_2CH_2Ph[4-OS(=O)_2Me]$ |
| F-1713 | Cl | H | $CH_2CH_2Ph[4-OS(=O)_2CF_3]$ |
| F-1714 | Cl | H | $CH_2CH_2Ph[4-Ph(4-CF_3)]$ |
| F-1715 | Cl | H | $CH_2CH_2Ph(4-CH_2Ph)$ |
| F-1716 | Cl | H | $CH_2CH_2Ph(4-OCH_2Ph)$ |
| F-1717 | Cl | H | $CH_2CH_2Ph(4-CN)$ |
| F-1718 | Cl | H | $CH_2CH_2Ph(4-NO_2)$ |
| F-1719 | Cl | H | $CH_2CH_2Ph(2,4-Cl_2)$ |
| F-1720 | Cl | H | $CH_2CH_2Ph(3,4-Cl_2)$ |
| F-1721 | Cl | H | $CH_2CH_2Ph(3-CF_3-4-F)$ |
| F-1722 | Cl | H | $CH_2CH_2Ph(2-CF_3-4-F)$ |
| F-1723 | Cl | H | $CH_2CH_2Ph(3-F-4-CF_3)$ |
| F-1724 | Cl | H | $CH_2CH_2Ph(2-F-4-CF_3)$ |
| F-1725 | Cl | H | $CH_2CH_2Ph(3-Cl-4-OCHF_2)$ |
| F-1726 | Cl | H | $CH_2CH_2Ph(3,4,5-Cl_3)$ |
| F-1727 | Cl | H | $CH_2CH_2Ph(2,3,4-F_3)$ |
| F-1728 | Cl | H | $CH_2CH_2Ph(2,4,5-F_3)$ |
| F-1729 | Cl | H | $CH_2CH_2Ph(3,4,5-F_3)$ |
| F-1730 | Cl | H | $CH_2CH_2Ph(2,4,6-F_3)$ |
| F-1731 | Cl | H | $CH_2CH_2CH_2Ph$ |
| F-1732 | Cl | H | $CH_2CH_2CH_2Ph(3-CF_3)$ |
| F-1733 | Cl | H | $CH_2CH_2CH_2Ph(4-CF_3)$ |
| F-1734 | Cl | H | $CH_2CH_2CH_2Ph(4-F)$ |
| F-1735 | Cl | H | $CH_2CH_2CH_2Ph[4-(t-Bu)]$ |
| F-1736 | Cl | H | $CH_2CH_2CH_2Ph(4-CN)$ |
| F-1737 | Cl | H | $CH_2CH_2CH_2Ph(4-CF_3)$ |
| F-1738 | Cl | H | $CH_2CH_2CH_2Ph(4-OCHF_2)$ |
| F-1739 | Cl | H | $CH_2CH_2CH_2Ph(4-OCF_3)$ |
| F-1740 | Cl | H | $CH_2CH_2CH_2Ph(4-SCHF_2)$ |
| F-1741 | Cl | H | $CH_2CH_2CH_2Ph(4-SCF_3)$ |
| F-1742 | Cl | H | $CH_2CH_2CH_2Ph[4-CF(CF_3)_2]$ |
| F-1743 | Cl | H | $CH_2CH_2CH_2Ph(3,4,5-F_3)$ |
| F-1744 | Cl | H | $CH_2CH_2CH_2Ph(2,4,6-F_3)$ |
| F-1745 | Cl | H | $CH_2CH_2CH_2CH_2Ph$ |
| F-1746 | Cl | H | $CH_2CH_2CH_2CH_2Ph(4-F)$ |
| F-1747 | Cl | H | $CH_2CH_2CH_2CH_2Ph(4-CF_3)$ |
| F-1748 | Cl | H | $CH_2CH_2CH_2CH_2Ph(4-OCF_3)$ |
| F-1749 | Cl | H | $CH_2CH_2CH_2CH_2Ph(4-SCF_3)$ |
| F-1750 | Cl | H | $CH_2CH_2CH_2CH_2CH_2Ph$ |
| F-1751 | Cl | H | $CH_2CH_2CH_2CH_2CH_2CH_2Ph$ |
| F-1752 | Cl | H | $CH_2CF_2Ph(4-F)$ |
| F-1753 | Cl | H | $CH_2CF_2Ph(4-CF_3)$ |
| F-1754 | Cl | H | $CH_2CF_2Ph(3,4,5-F_3)$ |

TABLE 1105

| Compound Number | $R^3$ | $R^4$ | $R^5$ |
|---|---|---|---|
| F-1755 | Me | H | $CH_2C(=O)Me$ |
| F-1756 | Me | H | $CH_2CH(OH)Me$ |
| F-1757 | Me | H | $CH_2CH(OH)CF_3$ |
| F-1758 | Me | H | $CH_2C(OH)_2CF_3$ |
| F-1759 | Me | H | $CH_2C(CF_3)=NOH$ |
| F-1760 | Me | H | $CH_2C(CF_3)=NOMe$ |
| F-1761 | Me | H | $CH_2CH(CF_3)NH_2$ |
| F-1762 | Me | H | $CH_2CH(CF_3)NHSO_2CF_3$ |
| F-1763 | Me | H | $CH_2\{c-Pr[1-NHS(=O)_2CF_3]\}$ |
| F-1764 | Me | H | $CH_2CH(Me)NH(c-Pr)$ |
| F-1765 | Me | H | $CH_2CH(Me)N(c-Pr)S(=O)_2CF_3$ |
| F-1766 | Me | H | $CH_2CH(Me)NHOMe$ |
| F-1767 | Me | H | $CH_2CH(Me)N(OMe)S(=O)_2CF_3$ |
| F-1768 | Me | H | $CH_2CH(Me)N(OMe)S(=O)_2Ph(2-NO_2)$ |
| F-1769 | Me | H | $CH_2CH(Me)N(OMe)S(=O)_2Ph(4-NO_2)$ |
| F-1770 | Me | H | $CH_2CH_2SCHF_2$ |
| F-1771 | Me | H | $CH_2CH_2CH_2SCHF_2$ |
| F-1772 | Me | H | $CH_2CH_2CH_2CH_2SCHF_2$ |
| F-1773 | Me | H | $CH_2CH_2CH_2CH_2CH_2SCHF_2$ |
| F-1774 | Me | H | $CH_2CH_2CH_2CH_2CH_2CH_2SCHF_2$ |
| F-1775 | Me | H | $CH_2CH_2CH_2CH_2CH_2CH_2CH_2SCHF_2$ |
| F-1776 | Me | H | $CH_2CH_2SCF_3$ |
| F-1777 | Me | H | $CH_2CH_2CH_2SCF_3$ |
| F-1778 | Me | H | $CH_2CH_2CH_2CH_2SCF_3$ |
| F-1779 | Me | H | $CH_2CH_2CH_2CH_2CH_2SCF_3$ |
| F-1780 | Me | H | $CH_2CH_2CH_2CH_2CH_2CH_2SCF_3$ |
| F-1781 | Me | H | $CH_2CH_2CH_2CH_2CH_2CH_2CH_2SCF_3$ |
| F-1782 | Me | H | $CH_2CH_2CH_2CH_2CH_2CH_2CH_2CH_2SCF_3$ |
| F-1783 | Me | H | $CH_2CH(Me)SCF_3$ |
| F-1784 | Me | H | $CH(Me)CH_2SCF_3$ |
| F-1785 | Me | H | $CH_2CH_2CH(Me)SCF_3$ |
| F-1786 | Me | H | $CH_2CH(Me)CH_2SCF_3$ |
| F-1787 | Me | H | $CH(Me)CH_2CH_2SCF_3$ |
| F-1788 | Me | H | $CH_2CH_2CH_2CH(Me)SCF_3$ |
| F-1789 | Me | H | $CH_2CH_2CH(Me)CH_2SCF_3$ |
| F-1790 | Me | H | $CH_2CH(Me)CH_2CH_2SCF_3$ |
| F-1791 | Me | H | $CH(Me)CH_2CH_2CH_2SCF_3$ |
| F-1792 | Me | H | $CH_2CH_2NHS(=O)_2CF_3$ |
| F-1793 | Me | H | $CH_2CH_2CH_2NHS(=O)_2CF_3$ |
| F-1794 | Me | H | $CH_2CH_2CH_2CH_2NHS(=O)_2CF_3$ |
| F-1795 | Me | H | $CH_2CH_2CH_2CH_2CH_2NHS(=O)_2CF_3$ |
| F-1796 | Me | H | $CH_2CH_2N(Me)S(=O)_2CF_3$ |
| F-1797 | Me | H | $CH_2CH_2N(Et)S(=O)_2CF_3$ |
| F-1798 | Me | H | $CH_2CH_2N(CH_2CN)S(=O)_2CF_3$ |

TABLE 1106

| Compound Number | $R^3$ | $R^4$ | $R^5$ |
|---|---|---|---|
| F-1799 | Me | H | $CH_2CH_2N(CH_2OMe)S(=O)_2CF_3$ |
| F-1800 | Me | H | $CH_2CH_2CH_2N(Me)S(=O)_2CF_3$ |
| F-1801 | Me | H | $CH_2CH_2CH_2N(Et)S(=O)_2CF_3$ |
| F-1802 | Me | H | $CH_2CH_2CH_2N(CH_2CN)S(=O)_2CF_3$ |
| F-1803 | Me | H | $CH_2CH_2CH_2N(CH_2OMe)S(=O)_2CF_3$ |
| F-1804 | Me | H | $CH_2CH_2CH_2CH_2N(Me)S(=O)_2CF_3$ |
| F-1805 | Me | H | $CH_2CH_2CH_2CH_2N(Et)S(=O)_2CF_3$ |
| F-1806 | Me | H | $CH_2CH_2CH_2CH_2N(CH_2CN)S(=O)_2CF_3$ |
| F-1807 | Me | H | $CH_2CH_2CH_2CH_2N(CH_2OMe)S(=O)_2CF_3$ |
| F-1808 | Me | H | $CH_2CH(Me)NHS(=O)_2CF_3$ |
| F-1809 | Me | H | $CH_2C^*H(Me)NHS(=O)_2CF_3$:(R) |
| F-1810 | Me | H | $CH_2C^*H(Me)NHS(=O)_2CF_3$:(S) |
| F-1811 | Me | H | $CH(Me)CH_2NHS(=O)_2CF_3$ |
| F-1812 | Me | H | $CH_2CH_2CH(Me)NHS(=O)_2CF_3$ |
| F-1813 | Me | H | $CH_2CH(Me)CH_2NHS(=O)_2CF_3$ |
| F-1814 | Me | H | $CH(Me)CH_2CH_2NHS(=O)_2CF_3$ |
| F-1815 | Me | H | $CH_2CH(Me)N(Me)S(=O)_2CF_3$ |
| F-1816 | Me | H | $CH(Me)CH_2N(Me)S(=O)_2CF_3$ |
| F-1817 | Me | H | $CH_2CH_2CH(Me)N(Me)S(=O)_2CF_3$ |
| F-1818 | Me | H | $CH_2CH(Me)CH_2N(Me)S(=O)_2CF_3$ |
| F-1819 | Me | H | $CH(Me)CH_2CH_2N(Me)S(=O)_2CF_3$ |
| F-1820 | Me | H | $CH_2Ph$ |
| F-1821 | Me | H | $CH_2Ph(2-CF_3)$ |
| F-1822 | Me | H | $CH_2Ph(3-CF_3)$ |

TABLE 1106-continued

| Compound Number | $R^3$ | $R^4$ | $R^5$ |
|---|---|---|---|
| F-1823 | Me | H | $CH_2Ph(4\text{-}CF_3)$ |
| F-1824 | Me | H | $CH_2Ph(2\text{-}OCF_3)$ |
| F-1825 | Me | H | $CH_2Ph(3\text{-}OCF_3)$ |
| F-1826 | Me | H | $CH_2Ph(4\text{-}OCF_3)$ |
| F-1827 | Me | H | $CH_2Ph(2\text{-}SCF_3)$ |
| F-1828 | Me | H | $CH_2Ph(3\text{-}SCF_3)$ |
| F-1829 | Me | H | $CH_2Ph(4\text{-}SCF_3)$ |
| F-1830 | Me | H | $CH_2Ph(3\text{-}CH_2SCF_3)$ |
| F-1831 | Me | H | $CH_2Ph(4\text{-}F)$ |
| F-1832 | Me | H | $CH_2Ph(4\text{-}Cl)$ |
| F-1833 | Me | H | $CH_2Ph(4\text{-}Br)$ |
| F-1834 | Me | H | $CH_2Ph(4\text{-}Me)$ |
| F-1835 | Me | H | $CH_2Ph[4\text{-}(t\text{-}Bu)]$ |
| F-1836 | Me | H | $CH_2Ph(4\text{-}CN)$ |
| F-1837 | Me | H | $CH_2Ph(4\text{-}NO_2)$ |
| F-1838 | Me | H | $CH_2Ph(4\text{-}OCHF_2)$ |
| F-1839 | Me | H | $CH_2Ph(4\text{-}SCHF_2)$ |
| F-1840 | Me | H | $CH_2Ph(4\text{-}CH_2SCF_3)$ |
| F-1841 | Me | H | $CH_2Ph[4\text{-}CF(CF_3)_2]$ |
| F-1842 | Me | H | $CH_2Ph(4\text{-}CH_2SCF_3)$ |

TABLE 1107

| Compound Number | $R^3$ | $R^4$ | $R^5$ |
|---|---|---|---|
| F-1843 | Me | H | $CH_2Ph[4\text{-}Ph(4\text{-}CF_3)]$ |
| F-1844 | Me | H | $CH_2Ph(2,4\text{-}Cl_2)$ |
| F-1845 | Me | H | $CH_2Ph[2,5\text{-}(CF_3)_2]$ |
| F-1846 | Me | H | $CH_2Ph(3,4\text{-}Cl_2)$ |
| F-1847 | Me | H | $CH_2Ph(3\text{-}CF_3\text{-}4\text{-}F)$ |
| F-1848 | Me | H | $CH_2Ph(3\text{-}CF_3\text{-}4\text{-}Cl)$ |
| F-1849 | Me | H | $CH_2Ph(3\text{-}F\text{-}4\text{-}CF_3)$ |
| F-1850 | Me | H | $CH_2Ph(2,4,6\text{-}F_3)$ |
| F-1851 | Me | H | $CH_2Ph(3,4,5\text{-}F_3)$ |
| F-1852 | Me | H | $CH_2Ph(2,3,4\text{-}F_3)$ |
| F-1853 | Me | H | $CH_2Ph(3,4,5\text{-}Cl_3)$ |
| F-1854 | Me | H | $CH_2CH_2Ph$ |
| F-1855 | Me | H | $CH_2CH_2Ph(4\text{-}F)$ |
| F-1856 | Me | H | $CH_2CH_2Ph(4\text{-}Cl)$ |
| F-1857 | Me | H | $CH_2CH_2Ph(4\text{-}Br)$ |
| F-1858 | Me | H | $CH_2CH_2Ph[4\text{-}(t\text{-}Bu)]$ |
| F-1859 | Me | H | $CH_2CH_2Ph(2\text{-}CF_3)$ |
| F-1860 | Me | H | $CH_2CH_2Ph(3\text{-}CF_3)$ |
| F-1861 | Me | H | $CH_2CH_2Ph(4\text{-}CF_3)$ |
| F-1862 | Me | H | $CH_2CH_2Ph[4\text{-}CF(CF_3)_2]$ |
| F-1863 | Me | H | $CH_2CH_2Ph[4\text{-}(c\text{-}Pr)]$ |
| F-1864 | Me | H | $CH_2CH_2Ph\{4\text{-}[c\text{-}Pr(2,2\text{-}F_2)]\}$ |
| F-1865 | Me | H | $CH_2CH_2Ph(4\text{-}OMe)$ |
| F-1866 | Me | H | $CH_2CH_2Ph(3\text{-}OCF_3)$ |
| F-1867 | Me | H | $CH_2CH_2Ph(4\text{-}OCHF_2)$ |
| F-1868 | Me | H | $CH_2CH_2Ph(4\text{-}OCF_3)$ |
| F-1869 | Me | H | $CH_2CH_2Ph(4\text{-}SMe)$ |
| F-1870 | Me | H | $CH_2CH_2Ph(4\text{-}SCHF_2)$ |
| F-1871 | Me | H | $CH_2CH_2Ph(4\text{-}SCF_3)$ |
| F-1872 | Me | H | $CH_2CH_2Ph[4\text{-}S({=}O)Me]$ |
| F-1873 | Me | H | $CH_2CH_2Ph[4\text{-}S({=}O)CF_3]$ |
| F-1874 | Me | H | $CH_2CH_2Ph[4\text{-}S({=}O)_2Me]$ |
| F-1875 | Me | H | $CH_2CH_2Ph[4\text{-}S({=}O)_2CF_3]$ |
| F-1876 | Me | H | $CH_2CH_2Ph(4\text{-}CH_2SMe)$ |
| F-1877 | Me | H | $CH_2CH_2Ph(4\text{-}CH_2SCF_3)$ |
| F-1878 | Me | H | $CH_2CH_2Ph[4\text{-}OS({=}O)_2Me]$ |
| F-1879 | Me | H | $CH_2CH_2Ph[4\text{-}OS({=}O)_2CF_3]$ |
| F-1880 | Me | H | $CH_2CH_2Ph[4\text{-}Ph(4\text{-}CF_3)]$ |
| F-1881 | Me | H | $CH_2CH_2Ph(4\text{-}CH_2Ph)$ |
| F-1882 | Me | H | $CH_2CH_2Ph(4\text{-}OCH_2Ph)$ |
| F-1883 | Me | H | $CH_2CH_2Ph(4\text{-}CN)$ |
| F-1884 | Me | H | $CH_2CH_2Ph(4\text{-}NO_2)$ |
| F-1885 | Me | H | $CH_2CH_2Ph(2,4\text{-}Cl_2)$ |
| F-1886 | Me | H | $CH_2CH_2Ph(3,4\text{-}Cl_2)$ |

TABLE 1108

| Compound Number | $R^3$ | $R^4$ | $R^5$ |
|---|---|---|---|
| F-1887 | Me | H | $CH_2CH_2Ph(3\text{-}CF_3\text{-}4\text{-}F)$ |
| F-1888 | Me | H | $CH_2CH_2Ph(2\text{-}CF_3\text{-}4\text{-}F)$ |
| F-1889 | Me | H | $CH_2CH_2Ph(3\text{-}F\text{-}4\text{-}CF_3)$ |
| F-1890 | Me | H | $CH_2CH_2Ph(2\text{-}F\text{-}4\text{-}CF_3)$ |
| F-1891 | Me | H | $CH_2CH_2Ph(3\text{-}Cl\text{-}4\text{-}OCHF_2)$ |
| F-1892 | Me | H | $CH_2CH_2Ph(3,4,5\text{-}Cl_3)$ |
| F-1893 | Me | H | $CH_2CH_2Ph(2,3,4\text{-}F_3)$ |
| F-1894 | Me | H | $CH_2CH_2Ph(2,4,5\text{-}F_3)$ |
| F-1895 | Me | H | $CH_2CH_2Ph(3,4,5\text{-}F_3)$ |
| F-1896 | Me | H | $CH_2CH_2Ph(2,4,6\text{-}F_3)$ |
| F-1897 | Me | H | $CH_2CH_2CH_2Ph$ |
| F-1898 | Me | H | $CH_2CH_2CH_2Ph(3\text{-}CF_3)$ |
| F-1899 | Me | H | $CH_2CH_2CH_2Ph(4\text{-}CF_3)$ |
| F-1900 | Me | H | $CH_2CH_2CH_2Ph(4\text{-}F)$ |
| F-1901 | Me | H | $CH_2CH_2CH_2Ph[4\text{-}(t\text{-}Bu)]$ |
| F-1902 | Me | H | $CH_2CH_2CH_2Ph(4\text{-}CN)$ |
| F-1903 | Me | H | $CH_2CH_2CH_2Ph(4\text{-}CF_3)$ |
| F-1904 | Me | H | $CH_2CH_2CH_2Ph(4\text{-}OCHF_2)$ |
| F-1905 | Me | H | $CH_2CH_2CH_2Ph(4\text{-}OCF_3)$ |
| F-1906 | Me | H | $CH_2CH_2CH_2Ph(4\text{-}SCHF_2)$ |
| F-1907 | Me | H | $CH_2CH_2CH_2Ph(4\text{-}SCF_3)$ |
| F-1908 | Me | H | $CH_2CH_2CH_2Ph[4\text{-}CF(CF_3)_2]$ |
| F-1909 | Me | H | $CH_2CH_2CH_2Ph(3,4,5\text{-}F_3)$ |
| F-1910 | Me | H | $CH_2CH_2CH_2Ph(2,4,6\text{-}F_3)$ |
| F-1911 | Me | H | $CH_2CH_2CH_2CH_2Ph$ |
| F-1912 | Me | H | $CH_2CH_2CH_2CH_2Ph(4\text{-}F)$ |
| F-1913 | Me | H | $CH_2CH_2CH_2CH_2Ph(4\text{-}CF_3)$ |
| F-1914 | Me | H | $CH_2CH_2CH_2CH_2Ph(4\text{-}OCF_3)$ |
| F-1915 | Me | H | $CH_2CH_2CH_2CH_2Ph(4\text{-}SCF_3)$ |
| F-1916 | Me | H | $CH_2CH_2CH_2CH_2CH_2Ph$ |
| F-1917 | Me | H | $CH_2CH_2CH_2CH_2CH_2CH_2Ph$ |
| F-1918 | Me | H | $CH_2CF_2Ph(4\text{-}F)$ |
| F-1919 | Me | H | $CH_2CF_2Ph(4\text{-}CF_3)$ |
| F-1920 | Me | H | $CH_2CF_2Ph(3,4,5\text{-}F_3)$ |
| F-1921 | $CF_3$ | H | $CH_2CH(Me)NHS({=}O)_2CF_3$ |
| F-1922 | $CF_3$ | H | $CH_2C^*H(Me)NHS({=}O)_2CF_3$:(R) |
| F-1923 | $CF_3$ | H | $CH_2C^*H(Me)NHS({=}O)_2CF_3$:(S) |
| F-1924 | $OCF_3$ | H | $CH_2CH(Me)NHS({=}O)_2CF_3$ |
| F-1925 | $OCF_3$ | H | $CH_2C^*H(Me)NHS({=}O)_2CF_3$:(R) |
| F-1926 | $OCF_3$ | H | $CH_2C^*H(Me)NHS({=}O)_2CF_3$:(S) |
| F-1927 | Cl | Cl | $CH_2CH_2SCHF_2$ |
| F-1928 | Cl | Cl | $CH_2CH_2CH_2SCHF_2$ |
| F-1929 | Cl | Cl | $CH_2CH_2CH_2CH_2SCHF_2$ |
| F-1930 | Cl | Cl | $CH_2CH_2CH_2CH_2CH_2SCHF_2$ |

TABLE 1109

| Compound Number | $R^3$ | $R^4$ | $R^5$ |
|---|---|---|---|
| F-1931 | Cl | Cl | $CH_2CH_2CH_2CH_2CH_2CH_2SCHF_2$ |
| F-1932 | Cl | Cl | $CH_2CH_2CH_2CH_2CH_2CH_2CH_2SCHF_2$ |
| F-1933 | Cl | Cl | $CH_2CH_2SCF_3$ |
| F-1934 | Cl | Cl | $CH_2CH_2CH_2SCF_3$ |
| F-1935 | Cl | Cl | $CH_2CH_2CH_2CH_2SCF_3$ |
| F-1936 | Cl | Cl | $CH_2CH_2CH_2CH_2CH_2SCF_3$ |
| F-1937 | Cl | Cl | $CH_2CH_2CH_2CH_2CH_2CH_2SCF_3$ |
| F-1938 | Cl | Cl | $CH_2CH_2CH_2CH_2CH_2CH_2CH_2SCF_3$ |
| F-1939 | Cl | Cl | $CH_2CH_2CH_2CH_2CH_2CH_2CH_2CH_2SCF_3$ |
| F-1940 | Cl | Cl | $CH_2CH(Me)SCF_3$ |
| F-1941 | Cl | Cl | $CH(Me)CH_2SCF_3$ |
| F-1942 | Cl | Cl | $CH_2CH_2CH(Me)SCF_3$ |
| F-1943 | Cl | Cl | $CH_2CH(Me)CH_2SCF_3$ |
| F-1944 | Cl | Cl | $CH(Me)CH_2CH_2SCF_3$ |
| F-1945 | Cl | Cl | $CH_2CH_2CH_2CH(Me)SCF_3$ |
| F-1946 | Cl | Cl | $CH_2CH_2CH(Me)CH_2SCF_3$ |
| F-1947 | Cl | Cl | $CH_2CH(Me)CH_2CH_2SCF_3$ |
| F-1948 | Cl | Cl | $CH(Me)CH_2CH_2CH_2SCF_3$ |
| F-1949 | Cl | Cl | $CH_2CH_2NHS({=}O)_2CF_3$ |
| F-1950 | Cl | Cl | $CH_2CH_2CH_2NHS({=}O)_2CF_3$ |
| F-1951 | Cl | Cl | $CH_2CH_2CH_2CH_2NHS({=}O)_2CF_3$ |
| F-1952 | Cl | Cl | $CH_2CH_2CH_2CH_2CH_2NHS({=}O)_2CF_3$ |
| F-1953 | Cl | Cl | $CH_2CH_2N(Me)S({=}O)_2CF_3$ |
| F-1954 | Cl | Cl | $CH_2CH_2N(Et)S({=}O)_2CF_3$ |

TABLE 1109-continued

| Compound Number | $R^3$ | $R^4$ | $R^5$ |
|---|---|---|---|
| F-1955 | Cl | Cl | $CH_2CH_2N(CH_2CN)S(=O)_2CF_3$ |
| F-1956 | Cl | Cl | $CH_2CH_2N(CH_2OMe)S(=O)_2CF_3$ |
| F-1957 | Cl | Cl | $CH_2CH_2CH_2N(Me)S(=O)_2CF_3$ |
| F-1958 | Cl | Cl | $CH_2CH_2CH_2N(Et)S(=O)_2CF_3$ |
| F-1959 | Cl | Cl | $CH_2CH_2CH_2N(CH_2CN)S(=O)_2CF_3$ |
| F-1960 | Cl | Cl | $CH_2CH_2CH_2N(CH_2OMe)S(=O)_2CF_3$ |
| F-1961 | Cl | Cl | $CH_2CH_2CH_2CH_2N(Me)S(=O)_2CF_3$ |
| F-1962 | Cl | Cl | $CH_2CH_2CH_2CH_2N(Et)S(=O)_2CF_3$ |
| F-1963 | Cl | Cl | $CH_2CH_2CH_2CH_2N(CH_2CN)S(=O)_2CF_3$ |
| F-1964 | Cl | Cl | $CH_2CH_2CH_2CH_2N(CH_2OMe)S(=O)_2CF_3$ |
| F-1965 | Cl | Cl | $CH_2CH(Me)NHS(=O)_2CF_3$ |
| F-1966 | Cl | Cl | $CH(Me)CH_2NHS(=O)_2CF_3$ |
| F-1967 | Cl | Cl | $CH_2CH_2CH(Me)NHS(=O)_2CF_3$ |
| F-1968 | Cl | Cl | $CH_2CH(Me)CH_2NHS(=O)_2CF_3$ |
| F-1969 | Cl | Cl | $CH(Me)CH_2CH_2NHS(=O)_2CF_3$ |
| F-1970 | Cl | Cl | $CH_2CH(Me)N(Me)S(=O)_2CF_3$ |
| F-1971 | Cl | Cl | $CH(Me)CH_2N(Me)S(=O)_2CF_3$ |
| F-1972 | Cl | Cl | $CH_2CH_2CH(Me)N(Me)S(=O)_2CF_3$ |
| F-1973 | Cl | Cl | $CH_2CH(Me)CH_2N(Me)S(=O)_2CF_3$ |
| F-1974 | Cl | Cl | $CH(Me)CH_2CH_2N(Me)S(=O)_2CF_3$ |

TABLE 1110

| Compound Number | $R^3$ | $R^4$ | $R^5$ |
|---|---|---|---|
| F-1975 | Cl | Cl | $CH_2Ph$ |
| F-1976 | Cl | Cl | $CH_2Ph(2-CF_3)$ |
| F-1977 | Cl | Cl | $CH_2Ph(3-CF_3)$ |
| F-1978 | Cl | Cl | $CH_2Ph(4-CF_3)$ |
| F-1979 | Cl | Cl | $CH_2Ph(2-OCF_3)$ |
| F-1980 | Cl | Cl | $CH_2Ph(3-OCF_3)$ |
| F-1981 | Cl | Cl | $CH_2Ph(4-OCF_3)$ |
| F-1982 | Cl | Cl | $CH_2Ph(2-SCF_3)$ |
| F-1983 | Cl | Cl | $CH_2Ph(3-SCF_3)$ |
| F-1984 | Cl | Cl | $CH_2Ph(4-SCF_3)$ |
| F-1985 | Cl | Cl | $CH_2Ph(3-CH_2SCF_3)$ |
| F-1986 | Cl | Cl | $CH_2Ph(4-F)$ |
| F-1987 | Cl | Cl | $CH_2Ph(4-Cl)$ |
| F-1988 | Cl | Cl | $CH_2Ph(4-Br)$ |
| F-1989 | Cl | Cl | $CH_2Ph(4-Me)$ |
| F-1990 | Cl | Cl | $CH_2Ph[4-(t-Bu)]$ |
| F-1991 | Cl | Cl | $CH_2Ph(4-CN)$ |
| F-1992 | Cl | Cl | $CH_2Ph(4-NO_2)$ |
| F-1993 | Cl | Cl | $CH_2Ph(4-OCHF_2)$ |
| F-1994 | Cl | Cl | $CH_2Ph(4-SCHF_2)$ |
| F-1995 | Cl | Cl | $CH_2Ph(4-CH_2SCF_3)$ |
| F-1996 | Cl | Cl | $CH_2Ph[4-CF(CF_3)_2]$ |
| F-1997 | Cl | Cl | $CH_2Ph(4-CH_2SCF_3)$ |
| F-1998 | Cl | Cl | $CH_2Ph[4-Ph(4-CF_3)]$ |
| F-1999 | Cl | Cl | $CH_2Ph(2,4-Cl_2)$ |
| F-2000 | Cl | Cl | $CH_2Ph[2,5-(CF_3)_2]$ |
| F-2001 | Cl | Cl | $CH_2Ph(3,4-Cl_2)$ |
| F-2002 | Cl | Cl | $CH_2Ph(3-CF_3-4-F)$ |
| F-2003 | Cl | Cl | $CH_2Ph(3-CF_3-4-Cl)$ |
| F-2004 | Cl | Cl | $CH_2Ph(3-F-4-CF_3)$ |
| F-2005 | Cl | Cl | $CH_2Ph(2,4,6-F_3)$ |
| F-2006 | Cl | Cl | $CH_2Ph(3,4,5-F_3)$ |
| F-2007 | Cl | Cl | $CH_2Ph(2,3,4-F_3)$ |
| F-2008 | Cl | Cl | $CH_2Ph(3,4,5-Cl_3)$ |
| F-2009 | Cl | Cl | $CH_2CH_2Ph$ |
| F-2010 | Cl | Cl | $CH_2CH_2Ph(4-F)$ |
| F-2011 | Cl | Cl | $CH_2CH_2Ph(4-Cl)$ |
| F-2012 | Cl | Cl | $CH_2CH_2Ph(4-Br)$ |
| F-2013 | Cl | Cl | $CH_2CH_2Ph[4-(t-Bu)]$ |
| F-2014 | Cl | Cl | $CH_2CH_2Ph(2-CF_3)$ |
| F-2015 | Cl | Cl | $CH_2CH_2Ph(3-CF_3)$ |
| F-2016 | Cl | Cl | $CH_2CH_2Ph(4-CF_3)$ |
| F-2017 | Cl | Cl | $CH_2CH_2Ph[4-CF(CF_3)_2]$ |
| F-2018 | Cl | Cl | $CH_2CH_2Ph[4-(c-Pr)]$ |

TABLE 1111

| Compound Number | $R^3$ | $R^4$ | $R^5$ |
|---|---|---|---|
| F-2019 | Cl | Cl | $CH_2CH_2Ph\{4-[c-Pr(2,2-F_2)]\}$ |
| F-2020 | Cl | Cl | $CH_2CH_2Ph(4-OMe)$ |
| F-2021 | Cl | Cl | $CH_2CH_2Ph(3-OCF_3)$ |
| F-2022 | Cl | Cl | $CH_2CH_2Ph(4-OCHF_2)$ |
| F-2023 | Cl | Cl | $CH_2CH_2Ph(4-OCF_3)$ |
| F-2024 | Cl | Cl | $CH_2CH_2Ph(4-SMe)$ |
| F-2025 | Cl | Cl | $CH_2CH_2Ph(4-SCHF_2)$ |
| F-2026 | Cl | Cl | $CH_2CH_2Ph(4-SCF_3)$ |
| F-2027 | Cl | Cl | $CH_2CH_2Ph[4-S(=O)Me]$ |
| F-2028 | Cl | Cl | $CH_2CH_2Ph[4-S(=O)CF_3]$ |
| F-2029 | Cl | Cl | $CH_2CH_2Ph[4-S(=O)_2Me]$ |
| F-2030 | Cl | Cl | $CH_2CH_2Ph[4-S(=O)_2CF_3]$ |
| F-2031 | Cl | Cl | $CH_2CH_2Ph(4-CH_2SMe)$ |
| F-2032 | Cl | Cl | $CH_2CH_2Ph(4-CH_2SCF_3)$ |
| F-2033 | Cl | Cl | $CH_2CH_2Ph[4-OS(=O)_2Me]$ |
| F-2034 | Cl | Cl | $CH_2CH_2Ph[4-OS(=O)_2CF_3]$ |
| F-2035 | Cl | Cl | $CH_2CH_2Ph[4-Ph(4-CF_3)]$ |
| F-2036 | Cl | Cl | $CH_2CH_2Ph(4-CH_2Ph)$ |
| F-2037 | Cl | Cl | $CH_2CH_2Ph(4-OCH_2Ph)$ |
| F-2038 | Cl | Cl | $CH_2CH_2Ph(4-CN)$ |
| F-2039 | Cl | Cl | $CH_2CH_2Ph(4-NO_2)$ |
| F-2040 | Cl | Cl | $CH_2CH_2Ph(2,4-Cl_2)$ |
| F-2041 | Cl | Cl | $CH_2CH_2Ph(3,4-Cl_2)$ |
| F-2042 | Cl | Cl | $CH_2CH_2Ph(3-CF_3-4-F)$ |
| F-2043 | Cl | Cl | $CH_2CH_2Ph(2-CF_3-4-F)$ |
| F-2044 | Cl | Cl | $CH_2CH_2Ph(3-F-4-CF_3)$ |
| F-2045 | Cl | Cl | $CH_2CH_2Ph(2-F-4-CF_3)$ |
| F-2046 | Cl | Cl | $CH_2CH_2Ph(3-Cl-4-OCHF_2)$ |
| F-2047 | Cl | Cl | $CH_2CH_2Ph(3,4,5-Cl_3)$ |
| F-2048 | Cl | Cl | $CH_2CH_2Ph(2,3,4-F_3)$ |
| F-2049 | Cl | Cl | $CH_2CH_2Ph(2,4,5-F_3)$ |
| F-2050 | Cl | Cl | $CH_2CH_2Ph(3,4,5-F_3)$ |
| F-2051 | Cl | Cl | $CH_2CH_2Ph(2,4,6-F_3)$ |
| F-2052 | Cl | Cl | $CH_2CH_2CH_2Ph$ |
| F-2053 | Cl | Cl | $CH_2CH_2CH_2Ph(3-CF_3)$ |
| F-2054 | Cl | Cl | $CH_2CH_2CH_2Ph(4-CF_3)$ |
| F-2055 | Cl | Cl | $CH_2CH_2CH_2Ph(4-F)$ |
| F-2056 | Cl | Cl | $CH_2CH_2CH_2Ph[4-(t-Bu)]$ |
| F-2057 | Cl | Cl | $CH_2CH_2CH_2Ph(4-CN)$ |
| F-2058 | Cl | Cl | $CH_2CH_2CH_2Ph(4-CF_3)$ |
| F-2059 | Cl | Cl | $CH_2CH_2CH_2Ph(4-OCHF_2)$ |
| F-2060 | Cl | Cl | $CH_2CH_2CH_2Ph(4-OCF_3)$ |
| F-2061 | Cl | Cl | $CH_2CH_2CH_2Ph(4-SCHF_2)$ |
| F-2062 | Cl | Cl | $CH_2CH_2CH_2Ph(4-SCF_3)$ |

TABLE 1112

| Compound Number | $R^3$ | $R^4$ | $R^5$ |
|---|---|---|---|
| F-2063 | Cl | Cl | $CH_2CH_2CH_2Ph[4-CF(CF_3)_2]$ |
| F-2064 | Cl | Cl | $CH_2CH_2CH_2Ph(3,4,5-F_3)$ |
| F-2065 | Cl | Cl | $CH_2CH_2CH_2Ph(2,4,6-F_3)$ |
| F-2066 | Cl | Cl | $CH_2CH_2CH_2CH_2Ph$ |
| F-2067 | Cl | Cl | $CH_2CH_2CH_2CH_2Ph(4-F)$ |
| F-2068 | Cl | Cl | $CH_2CH_2CH_2CH_2Ph(4-CF_3)$ |
| F-2069 | Cl | Cl | $CH_2CH_2CH_2CH_2Ph(4-OCF_3)$ |
| F-2070 | Cl | Cl | $CH_2CH_2CH_2CH_2Ph(4-SCF_3)$ |
| F-2071 | Cl | Cl | $CH_2CH_2CH_2CH_2CH_2Ph$ |
| F-2072 | Cl | Cl | $CH_2CH_2CH_2CH_2CH_2CH_2Ph$ |
| F-2073 | Cl | Cl | $CH_2CF_2Ph(4-F)$ |
| F-2074 | Cl | Cl | $CH_2CF_2Ph(4-CF_3)$ |
| F-2075 | Cl | Cl | $CH_2CF_2Ph(3,4,5-F_3)$ |
| F-2076 | Me | Cl | $CH_2CH_2SCHF_2$ |
| F-2077 | Me | Cl | $CH_2CH_2CH_2SCHF_2$ |
| F-2078 | Me | Cl | $CH_2CH_2CH_2CH_2SCHF_2$ |
| F-2079 | Me | Cl | $CH_2CH_2CH_2CH_2CH_2SCHF_2$ |
| F-2080 | Me | Cl | $CH_2CH_2CH_2CH_2CH_2CH_2SCHF_2$ |
| F-2081 | Me | Cl | $CH_2CH_2CH_2CH_2CH_2CH_2CH_2SCHF_2$ |
| F-2082 | Me | Cl | $CH_2CH_2SCF_3$ |
| F-2083 | Me | Cl | $CH_2CH_2CH_2SCF_3$ |
| F-2084 | Me | Cl | $CH_2CH_2CH_2CH_2SCF_3$ |
| F-2085 | Me | Cl | $CH_2CH_2CH_2CH_2CH_2SCF_3$ |
| F-2086 | Me | Cl | $CH_2CH_2CH_2CH_2CH_2CH_2SCF_3$ |

TABLE 1112-continued

| Compound Number | $R^3$ | $R^4$ | $R^5$ |
|---|---|---|---|
| F-2087 | Me | Cl | $CH_2CH_2CH_2CH_2CH_2CH_2CH_2SCF_3$ |
| F-2088 | Me | Cl | $CH_2CH_2CH_2CH_2CH_2CH_2CH_2CH_2SCF_3$ |
| F-2089 | Me | Cl | $CH_2CH(Me)SCF_3$ |
| F-2090 | Me | Cl | $CH(Me)CH_2SCF_3$ |
| F-2091 | Me | Cl | $CH_2CH_2CH(Me)SCF_3$ |
| F-2092 | Me | Cl | $CH_2CH(Me)CH_2SCF_3$ |
| F-2093 | Me | Cl | $CH(Me)CH_2CH_2SCF_3$ |
| F-2094 | Me | Cl | $CH_2CH_2CH_2CH(Me)SCF_3$ |
| F-2095 | Me | Cl | $CH_2CH_2CH(Me)CH_2SCF_3$ |
| F-2096 | Me | Cl | $CH_2CH(Me)CH_2CH_2SCF_3$ |
| F-2097 | Me | Cl | $CH(Me)CH_2CH_2CH_2SCF_3$ |
| F-2098 | Me | Cl | $CH_2CH_2NHS(=O)_2CF_3$ |
| F-2099 | Me | Cl | $CH_2CH_2CH_2NHS(=O)_2CF_3$ |
| F-2100 | Me | Cl | $CH_2CH_2CH_2CH_2NHS(=O)_2CF_3$ |
| F-2101 | Me | Cl | $CH_2CH_2CH_2CH_2CH_2NHS(=O)_2CF_3$ |
| F-2102 | Me | Cl | $CH_2CH_2N(Me)S(=O)_2CF_3$ |
| F-2103 | Me | Cl | $CH_2CH_2N(Et)S(=O)_2CF_3$ |
| F-2104 | Me | Cl | $CH_2CH_2N(CH_2CN)S(=O)_2CF_3$ |
| F-2105 | Me | Cl | $CH_2CH_2N(CH_2OMe)S(=O)_2CF_3$ |
| F-2106 | Me | Cl | $CH_2CH_2CH_2N(Me)S(=O)_2CF_3$ |

TABLE 1113

| Compound Number | $R^3$ | $R^4$ | $R^5$ |
|---|---|---|---|
| F-2107 | Me | Cl | $CH_2CH_2CH_2N(Et)S(=O)_2CF_3$ |
| F-2108 | Me | Cl | $CH_2CH_2CH_2N(CH_2CN)S(=O)_2CF_3$ |
| F-2109 | Me | Cl | $CH_2CH_2CH_2N(CH_2OMe)S(=O)_2CF_3$ |
| F-2110 | Me | Cl | $CH_2CH_2CH_2CH_2N(Me)S(=O)_2CF_3$ |
| F-2111 | Me | Cl | $CH_2CH_2CH_2CH_2N(Et)S(=O)_2CF_3$ |
| F-2112 | Me | Cl | $CH_2CH_2CH_2CH_2N(CH_2CN)S(=O)_2CF_3$ |
| F-2113 | Me | Cl | $CH_2CH_2CH_2CH_2N(CH_2OMe)S(=O)_2CF_3$ |
| F-2114 | Me | Cl | $CH_2CH(Me)NHS(=O)_2CF_3$ |
| F-2115 | Me | Cl | $CH(Me)CH_2NHS(=O)_2CF_3$ |
| F-2116 | Me | Cl | $CH_2CH_2CH(Me)NHS(=O)_2CF_3$ |
| F-2117 | Me | Cl | $CH_2CH(Me)CH_2NHS(=O)_2CF_3$ |
| F-2118 | Me | Cl | $CH(Me)CH_2CH_2NHS(=O)_2CF_3$ |
| F-2119 | Me | Cl | $CH_2CH(Me)N(Me)S(=O)_2CF_3$ |
| F-2120 | Me | Cl | $CH(Me)CH_2N(Me)S(=O)_2CF_3$ |
| F-2121 | Me | Cl | $CH_2CH_2CH(Me)N(Me)S(=O)_2CF_3$ |
| F-2122 | Me | Cl | $CH_2CH(Me)CH_2N(Me)S(=O)_2CF_3$ |
| F-2123 | Me | Cl | $CH(Me)CH_2CH_2N(Me)S(=O)_2CF_3$ |
| F-2124 | Me | Cl | $CH_2Ph$ |
| F-2125 | Me | Cl | $CH_2Ph(2-CF_3)$ |
| F-2126 | Me | Cl | $CH_2Ph(3-CF_3)$ |
| F-2127 | Me | Cl | $CH_2Ph(4-CF_3)$ |
| F-2128 | Me | Cl | $CH_2Ph(2-OCF_3)$ |
| F-2129 | Me | Cl | $CH_2Ph(3-OCF_3)$ |
| F-2130 | Me | Cl | $CH_2Ph(4-OCF_3)$ |
| F-2131 | Me | Cl | $CH_2Ph(2-SCF_3)$ |
| F-2132 | Me | Cl | $CH_2Ph(3-SCF_3)$ |
| F-2133 | Me | Cl | $CH_2Ph(4-SCF_3)$ |
| F-2134 | Me | Cl | $CH_2Ph(3-CH_2SCF_3)$ |
| F-2135 | Me | Cl | $CH_2Ph(4-F)$ |
| F-2136 | Me | Cl | $CH_2Ph(4-Cl)$ |
| F-2137 | Me | Cl | $CH_2Ph(4-Br)$ |
| F-2138 | Me | Cl | $CH_2Ph(4-Me)$ |
| F-2139 | Me | Cl | $CH_2Ph[4-(t-Bu)]$ |
| F-2140 | Me | Cl | $CH_2Ph(4-CN)$ |
| F-2141 | Me | Cl | $CH_2Ph(4-NO_2)$ |
| F-2142 | Me | Cl | $CH_2Ph(4-OCHF_2)$ |
| F-2143 | Me | Cl | $CH_2Ph(4-SCHF_2)$ |
| F-2144 | Me | Cl | $CH_2Ph(4-CH_2SCFl_3)$ |
| F-2145 | Me | Cl | $CH_2Ph[4-CF(CF_3)_2]$ |
| F-2146 | Me | Cl | $CH_2Ph(4-CH_2SCF_3)$ |
| F-2147 | Me | Cl | $CH_2Ph[4-Ph(4-CF_3)]$ |
| F-2148 | Me | Cl | $CH_2Ph(2,4-Cl_2)$ |
| F-2149 | Me | Cl | $CH_2Ph[2,5-(CF_3)_2]$ |
| F-2150 | Me | Cl | $CH_2Ph(3,4-Cl_2)$ |

TABLE 1114

| Compound Number | $R^3$ | $R^4$ | $R^5$ |
|---|---|---|---|
| F-2151 | Me | Cl | $CH_2Ph(3-CF_3-4-F)$ |
| F-2152 | Me | Cl | $CH_2Ph(3-CF_3-4-Cl)$ |
| F-2153 | Me | Cl | $CH_2Ph(3-F-4-CF_3)$ |
| F-2154 | Me | Cl | $CH_2Ph(2,4,6-F_3)$ |
| F-2155 | Me | Cl | $CH_2Ph(3,4,5-F_3)$ |
| F-2156 | Me | Cl | $CH_2Ph(2,3,4-F_3)$ |
| F-2157 | Me | Cl | $CH_2Ph(3,4,5-Cl_3)$ |
| F-2158 | Me | Cl | $CH_2CH_2Ph$ |
| F-2159 | Me | Cl | $CH_2CH_2Ph(4-F)$ |
| F-2160 | Me | Cl | $CH_2CH_2Ph(4-Cl)$ |
| F-2161 | Me | Cl | $CH_2CH_2Ph(4-Br)$ |
| F-2162 | Me | Cl | $CH_2CH_2Ph[4-(t-Bu)]$ |
| F-2163 | Me | Cl | $CH_2CH_2Ph(2-CF_3)$ |
| F-2164 | Me | Cl | $CH_2CH_2Ph(3-CF_3)$ |
| F-2165 | Me | Cl | $CH_2CH_2Ph(4-CF_3)$ |
| F-2166 | Me | Cl | $CH_2CH_2Ph[4-CF(CF_3)_2]$ |
| F-2167 | Me | Cl | $CH_2CH_2Ph[4-(c-Pr)]$ |
| F-2168 | Me | Cl | $CH_2CH_2Ph\{4-[c-Pr(2,2-F_2)]\}$ |
| F-2169 | Me | Cl | $CH_2CH_2Ph(4-OMe)$ |
| F-2170 | Me | Cl | $CH_2CH_2Ph(3-OCF_3)$ |
| F-2171 | Me | Cl | $CH_2CH_2Ph(4-OCHF_2)$ |
| F-2172 | Me | Cl | $CH_2CH_2Ph(4-OCF_3)$ |
| F-2173 | Me | Cl | $CH_2CH_2Ph(4-SMe)$ |
| F-2174 | Me | Cl | $CH_2CH_2Ph(4-SCHF_2)$ |
| F-2175 | Me | Cl | $CH_2CH_2Ph(4-SCF_3)$ |
| F-2176 | Me | Cl | $CH_2CH_2Ph[4-S(=O)Me]$ |
| F-2177 | Me | Cl | $CH_2CH_2Ph[4-S(=O)CF_3]$ |
| F-2178 | Me | Cl | $CH_2CH_2Ph[4-S(=O)_2Me]$ |
| F-2179 | Me | Cl | $CH_2CH_2Ph[4-S(=O)_2CF_3]$ |
| F-2180 | Me | Cl | $CH_2CH_2Ph(4-CH_2SMe)$ |
| F-2181 | Me | Cl | $CH_2CH_2Ph(4-CH_2SCF_3)$ |
| F-2182 | Me | Cl | $CH_2CH_2Ph[4-OS(=O)_2Me]$ |
| F-2183 | Me | Cl | $CH_2CH_2Ph[4-OS(=O)_2CF_3]$ |
| F-2184 | Me | Cl | $CH_2CH_2Ph[4-Ph(4-CF_3)]$ |
| F-2185 | Me | Cl | $CH_2CH_2Ph(4-CH_2Ph)$ |
| F-2186 | Me | Cl | $CH_2CH_2Ph(4-OCH_2Ph)$ |
| F-2187 | Me | Cl | $CH_2CH_2Ph(4-CN)$ |
| F-2188 | Me | Cl | $CH_2CH_2Ph(4-NO_2)$ |
| F-2189 | Me | Cl | $CH_2CH_2Ph(2,4-Cl_2)$ |
| F-2190 | Me | Cl | $CH_2CH_2Ph(3,4-Cl_2)$ |
| F-2191 | Me | Cl | $CH_2CH_2Ph(3-CF_3-4-F)$ |
| F-2192 | Me | Cl | $CH_2CH_2Ph(2-CF_3-4-F)$ |
| F-2193 | Me | Cl | $CH_2CH_2Ph(3-F-4-CF_3)$ |
| F-2194 | Me | Cl | $CH_2CH_2Ph(2-F-4-CF_3)$ |

TABLE 1115

| Compound Number | $R^3$ | $R^4$ | $R^5$ |
|---|---|---|---|
| F-2195 | Me | Cl | $CH_2CH_2Ph(3-Cl-4-OCHF_2)$ |
| F-2196 | Me | Cl | $CH_2CH_2Ph(3,4,5-Cl_3)$ |
| F-2197 | Me | Cl | $CH_2CH_2Ph(2,3,4-F_3)$ |
| F-2198 | Me | Cl | $CH_2CH_2Ph(2,4,5-F_3)$ |
| F-2199 | Me | Cl | $CH_2CH_2Ph(3,4,5-F_3)$ |
| F-2200 | Me | Cl | $CH_2CH_2Ph(2,4,6-F_3)$ |
| F-2201 | Me | Cl | $CH_2CH_2CH_2Ph$ |
| F-2202 | Me | Cl | $CH_2CH_2CH_2Ph(3-CF_3)$ |
| F-2203 | Me | Cl | $CH_2CH_2CH_2Ph(4-CF_3)$ |
| F-2204 | Me | Cl | $CH_2CH_2CH_2Ph(4-F)$ |
| F-2205 | Me | Cl | $CH_2CH_2CH_2Ph[4-(t-Bu)]$ |
| F-2206 | Me | Cl | $CH_2CH_2CH_2Ph(4-CN)$ |
| F-2207 | Me | Cl | $CH_2CH_2CH_2Ph(4-CF_3)$ |
| F-2208 | Me | Cl | $CH_2CH_2CH_2Ph(4-OCHF_2)$ |
| F-2209 | Me | Cl | $CH_2CH_2CH_2Ph(4-OCF_3)$ |
| F-2210 | Me | Cl | $CH_2CH_2CH_2Ph(4-SCHF_2)$ |
| F-2211 | Me | Cl | $CH_2CH_2CH_2Ph(4-SCF_3)$ |
| F-2212 | Me | Cl | $CH_2CH_2CH_2Ph[4-CF(CF_3)_2]$ |
| F-2213 | Me | Cl | $CH_2CH_2CH_2Ph(3,4,5-F_3)$ |
| F-2214 | Me | Cl | $CH_2CH_2CH_2Ph(2,4,6-F_3)$ |
| F-2215 | Me | Cl | $CH_2CH_2CH_2CH_2Ph$ |
| F-2216 | Me | Cl | $CH_2CH_2CH_2CH_2Ph(4-F)$ |
| F-2217 | Me | Cl | $CH_2CH_2CH_2CH_2Ph(4-CF_3)$ |
| F-2218 | Me | Cl | $CH_2CH_2CH_2CH_2Ph(4-OCF_3)$ |

TABLE 1115-continued

| Compound Number | $R^3$ | $R^4$ | $R^5$ |
|---|---|---|---|
| F-2219 | Me | Cl | $CH_2CH_2CH_2CH_2Ph(4\text{-}SCF_3)$ |
| F-2220 | Me | Cl | $CH_2CH_2CH_2CH_2CH_2Ph$ |
| F-2221 | Me | Cl | $CH_2CH_2CH_2CH_2CH_2CH_2Ph$ |
| F-2222 | Me | Cl | $CH_2CF_2Ph(4\text{-}F)$ |
| F-2223 | Me | Cl | $CH_2CF_2Ph(4\text{-}CF_3)$ |
| F-2224 | Me | Cl | $CH_2CF_2Ph(3,4,5\text{-}F_3)$ |
| F-2225 | Me | Me | $CH_2CH_2SCHF_2$ |
| F-2226 | Me | Me | $CH_2CH_2CH_2SCHF_2$ |
| F-2227 | Me | Me | $CH_2CH_2CH_2CH_2SCHF_2$ |
| F-2228 | Me | Me | $CH_2CH_2CH_2CH_2CH_2SCHF_2$ |
| F-2229 | Me | Me | $CH_2CH_2CH_2CH_2CH_2CH_2SCHF_2$ |
| F-2230 | Me | Me | $CH_2CH_2CH_2CH_2CH_2CH_2CH_2SCHF_2$ |
| F-2231 | Me | Me | $CH_2CH_2SCF_3$ |
| F-2232 | Me | Me | $CH_2CH_2CH_2SCF_3$ |
| F-2233 | Me | Me | $CH_2CH_2CH_2CH_2SCF_3$ |
| F-2234 | Me | Me | $CH_2CH_2CH_2CH_2CH_2SCF_3$ |
| F-2235 | Me | Me | $CH_2CH_2CH_2CH_2CH_2CH_2SCF_3$ |
| F-2236 | Me | Me | $CH_2CH_2CH_2CH_2CH_2CH_2CH_2SCF_3$ |
| F-2237 | Me | Me | $CH_2CH_2CH_2CH_2CH_2CH_2CH_2CH_2SCF_3$ |
| F-2238 | Me | Me | $CH_2CH(Me)SCF_3$ |

TABLE 1116

| Compound Number | $R^3$ | $R^4$ | $R^5$ |
|---|---|---|---|
| F-2239 | Me | Me | $CH(Me)CH_2SCF_3$ |
| F-2240 | Me | Me | $CH_2CH_2CH(Me)SCF_3$ |
| F-2241 | Me | Me | $CH_2CH(Me)CH_2SCF_3$ |
| F-2242 | Me | Me | $CH(Me)CH_2CH_2SCF_3$ |
| F-2243 | Me | Me | $CH_2CH_2CH_2CH(Me)SCF_3$ |
| F-2244 | Me | Me | $CH_2CH_2CH(Me)CH_2SCF_3$ |
| F-2245 | Me | Me | $CH_2CH(Me)CH_2CH_2SCF_3$ |
| F-2246 | Me | Me | $CH(Me)CH_2CH_2CH_2SCF_3$ |
| F-2247 | Me | Me | $CH_2CH_2NHS(=O)_2CF_3$ |
| F-2248 | Me | Me | $CH_2CH_2CH_2NHS(=O)_2CF_3$ |
| F-2249 | Me | Me | $CH_2CH_2CH_2CH_2NHS(=O)_2CF_3$ |
| F-2250 | Me | Me | $CH_2CH_2CH_2CH_2CH_2NHS(=O)_2CF_3$ |
| F-2251 | Me | Me | $CH_2CH_2N(Me)S(=O)_2CF_3$ |
| F-2252 | Me | Me | $CH_2CH_2N(Et)S(=O)_2CF_3$ |
| F-2253 | Me | Me | $CH_2CH_2N(CH_2CN)S(=O)_2CF_3$ |
| F-2254 | Me | Me | $CH_2CH_2N(CH_2OMe)S(=O)_2CF_3$ |
| F-2255 | Me | Me | $CH_2CH_2CH_2N(Me)S(=O)_2CF_3$ |
| F-2256 | Me | Me | $CH_2CH_2CH_2N(Et)S(=O)_2CF_3$ |
| F-2257 | Me | Me | $CH_2CH_2CH_2N(CH_2CN)S(=O)_2CF_3$ |
| F-2258 | Me | Me | $CH_2CH_2CH_2N(CH_2OMe)S(=O)_2CF_3$ |
| F-2259 | Me | Me | $CH_2CH_2CH_2CH_2N(Me)S(=O)_2CF_3$ |
| F-2260 | Me | Me | $CH_2CH_2CH_2CH_2N(Et)S(=O)_2CF_3$ |
| F-2261 | Me | Me | $CH_2CH_2CH_2CH_2N(CH_2CN)S(=O)_2CF_3$ |
| F-2262 | Me | Me | $CH_2CH_2CH_2CH_2N(CH_2OMe)S(=O)_2CF_3$ |
| F-2263 | Me | Me | $CH_2CH(Me)NHS(=O)_2CF_3$ |
| F-2264 | Me | Me | $CH(Me)CH_2NHS(=O)_2CF_3$ |
| F-2265 | Me | Me | $CH_2CH_2CH(Me)NHS(=O)_2CF_3$ |
| F-2266 | Me | Me | $CH_2CH(Me)CH_2NHS(=O)_2CF_3$ |
| F-2267 | Me | Me | $CH(Me)CH_2CH_2NHS(=O)_2CF_3$ |
| F-2268 | Me | Me | $CH_2CH(Me)N(Me)S(=O)_2CF_3$ |
| F-2269 | Me | Me | $CH(Me)CH_2N(Me)S(=O)_2CF_3$ |
| F-2270 | Me | Me | $CH_2CH_2CH(Me)N(Me)S(=O)_2CF_3$ |
| F-2271 | Me | Me | $CH_2CH(Me)CH_2N(Me)S(=O)_2CF_3$ |
| F-2272 | Me | Me | $CH(Me)CH_2CH_2N(Me)S(=O)_2CF_3$ |
| F-2273 | Me | Me | $CH_2Ph$ |
| F-2274 | Me | Me | $CH_2Ph(2\text{-}CF_3)$ |
| F-2275 | Me | Me | $CH_2Ph(3\text{-}CF_3)$ |
| F-2276 | Me | Me | $CH_2Ph(4\text{-}CF_3)$ |
| F-2277 | Me | Me | $CH_2Ph(2\text{-}OCF_3)$ |
| F-2278 | Me | Me | $CH_2Ph(3\text{-}OCF_3)$ |
| F-2279 | Me | Me | $CH_2Ph(4\text{-}OCF_3)$ |
| F-2280 | Me | Me | $CH_2Ph(2\text{-}SCF_3)$ |
| F-2281 | Me | Me | $CH_2Ph(3\text{-}SCF_3)$ |
| F-2282 | Me | Me | $CH_2Ph(4\text{-}SCF_3)$ |

TABLE 1117

| Compound Number | $R^3$ | $R^4$ | $R^5$ |
|---|---|---|---|
| F-2283 | Me | Me | $CH_2Ph(3\text{-}CH_2SCF_3)$ |
| F-2284 | Me | Me | $CH_2Ph(4\text{-}F)$ |
| F-2285 | Me | Me | $CH_2Ph(4\text{-}Cl)$ |
| F-2286 | Me | Me | $CH_2Ph(4\text{-}Br)$ |
| F-2287 | Me | Me | $CH_2Ph(4\text{-}Me)$ |
| F-2288 | Me | Me | $CH_2Ph[4\text{-}(t\text{-}Bu)]$ |
| F-2289 | Me | Me | $CH_2Ph(4\text{-}CN)$ |
| F-2290 | Me | Me | $CH_2Ph(4\text{-}NO_2)$ |
| F-2291 | Me | Me | $CH_2Ph(4\text{-}OCHF_2)$ |
| F-2292 | Me | Me | $CH_2Ph(4\text{-}SCHF_2)$ |
| F-2293 | Me | Me | $CH_2Ph(4\text{-}CH_2SCF_3)$ |
| F-2294 | Me | Me | $CH_2Ph[4\text{-}CF(CF_3)_2]$ |
| F-2295 | Me | Me | $CH_2Ph(4\text{-}CH_2SCF_3)$ |
| F-2296 | Me | Me | $CH_2Ph[4\text{-}Ph(4\text{-}CF_3)]$ |
| F-2297 | Me | Me | $CH_2Ph(2,4\text{-}Cl_2)$ |
| F-2298 | Me | Me | $CH_2Ph[2,5\text{-}(CF_3)_2]$ |
| F-2299 | Me | Me | $CH_2Ph(3,4\text{-}Cl_2)$ |
| F-2300 | Me | Me | $CH_2Ph(3\text{-}CF_3\text{-}4\text{-}F)$ |
| F-2301 | Me | Me | $CH_2Ph(3\text{-}CF_3\text{-}4\text{-}Cl)$ |
| F-2302 | Me | Me | $CH_2Ph(3\text{-}F\text{-}4\text{-}CF_3)$ |
| F-2303 | Me | Me | $CH_2Ph(2,4,6\text{-}F_3)$ |
| F-2304 | Me | Me | $CH_2Ph(3,4,5\text{-}F_3)$ |
| F-2305 | Me | Me | $CH_2Ph(2,3,4\text{-}F_3)$ |
| F-2306 | Me | Me | $CH_2Ph(3,4,5\text{-}Cl_3)$ |
| F-2307 | Me | Me | $CH_2CH_2Ph$ |
| F-2308 | Me | Me | $CH_2CH_2Ph(4\text{-}F)$ |
| F-2309 | Me | Me | $CH_2CH_2Ph(4\text{-}Cl)$ |
| F-2310 | Me | Me | $CH_2CH_2Ph(4\text{-}Br)$ |
| F-2311 | Me | Me | $CH_2CH_2Ph[4\text{-}(t\text{-}Bu)]$ |
| F-2312 | Me | Me | $CH_2CH_2Ph(2\text{-}CF_3)$ |
| F-2313 | Me | Me | $CH_2CH_2Ph(3\text{-}CF_3)$ |
| F-2314 | Me | Me | $CH_2CH_2Ph(4\text{-}CF_3)$ |
| F-2315 | Me | Me | $CH_2CH_2Ph[4\text{-}CF(CF_3)_2]$ |
| F-2316 | Me | Me | $CH_2CH_2Ph[4\text{-}(c\text{-}Pr)]$ |
| F-2317 | Me | Me | $CH_2CH_2Ph\{4\text{-}[c\text{-}Pr(2,2\text{-}F_2)]\}$ |
| F-2318 | Me | Me | $CH_2CH_2Ph(4\text{-}OMe)$ |
| F-2319 | Me | Me | $CH_2CH_2Ph(3\text{-}OCF_3)$ |
| F-2320 | Me | Me | $CH_2CH_2Ph(4\text{-}OCHF_2)$ |
| F-2321 | Me | Me | $CH_2CH_2Ph(4\text{-}OCF_3)$ |
| F-2322 | Me | Me | $CH_2CH_2Ph(4\text{-}SMe)$ |
| F-2323 | Me | Me | $CH_2CH_2Ph(4\text{-}SCHF_2)$ |
| F-2324 | Me | Me | $CH_2CH_2Ph(4\text{-}SCF_3)$ |
| F-2325 | Me | Me | $CH_2CH_2Ph[4\text{-}S(=O)Me]$ |
| F-2326 | Me | Me | $CH_2CH_2Ph[4\text{-}S(=O)CF_3]$ |

TABLE 1118

| Compound Number | $R^3$ | $R^4$ | $R^5$ |
|---|---|---|---|
| F-2327 | Me | Me | $CH_2CH_2Ph[4\text{-}S(=O)_2Me]$ |
| F-2328 | Me | Me | $CH_2CH_2Ph[4\text{-}S(=O)_2CF_3]$ |
| F-2329 | Me | Me | $CH_2CH_2Ph(4\text{-}CH_2SMe)$ |
| F-2330 | Me | Me | $CH_2CH_2Ph(4\text{-}CH_2SCF_3)$ |
| F-2331 | Me | Me | $CH_2CH_2Ph[4\text{-}OS(=O)_2Me]$ |
| F-2332 | Me | Me | $CH_2CH_2Ph[4\text{-}OS(=O)_2CF_3]$ |
| F-2333 | Me | Me | $CH_2CH_2Ph[4\text{-}Ph(4\text{-}CF_3)]$ |
| F-2334 | Me | Me | $CH_2CH_2Ph(4\text{-}CH_2Ph)$ |
| F-2335 | Me | Me | $CH_2CH_2Ph(4\text{-}OCH_2Ph)$ |
| F-2336 | Me | Me | $CH_2CH_2Ph(4\text{-}CN)$ |
| F-2337 | Me | Me | $CH_2CH_2Ph(4\text{-}NO_2)$ |
| F-2338 | Me | Me | $CH_2CH_2Ph(2,4\text{-}Cl_2)$ |
| F-2339 | Me | Me | $CH_2CH_2Ph(3,4\text{-}Cl_2)$ |
| F-2340 | Me | Me | $CH_2CH_2Ph(3\text{-}CF_3\text{-}4\text{-}F)$ |
| F-2341 | Me | Me | $CH_2CH_2Ph(2\text{-}CF_3\text{-}4\text{-}F)$ |
| F-2342 | Me | Me | $CH_2CH_2Ph(3\text{-}F\text{-}4\text{-}CF_3)$ |
| F-2343 | Me | Me | $CH_2CH_2Ph(2\text{-}F\text{-}4\text{-}CF_3)$ |
| F-2344 | Me | Me | $CH_2CH_2Ph(3\text{-}Cl\text{-}4\text{-}OCHF_2)$ |
| F-2345 | Me | Me | $CH_2CH_2Ph(3,4,5\text{-}Cl_3)$ |
| F-2346 | Me | Me | $CH_2CH_2Ph(2,3,4\text{-}F_3)$ |
| F-2347 | Me | Me | $CH_2CH_2Ph(2,4,5\text{-}F_3)$ |
| F-2348 | Me | Me | $CH_2CH_2Ph(3,4,5\text{-}F_3)$ |
| F-2349 | Me | Me | $CH_2CH_2Ph(2,4,6\text{-}F_3)$ |
| F-2350 | Me | Me | $CH_2CH_2CH_2Ph$ |

TABLE 1118-continued

| Compound Number | $R^3$ | $R^4$ | $R^5$ |
|---|---|---|---|
| F-2351 | Me | Me | $CH_2CH_2CH_2Ph(3\text{-}CF_3)$ |
| F-2352 | Me | Me | $CH_2CH_2CH_2Ph(4\text{-}CF_3)$ |
| F-2353 | Me | Me | $CH_2CH_2CH_2Ph(4\text{-}F)$ |
| F-2354 | Me | Me | $CH_2CH_2CH_2Ph[4\text{-}(t\text{-}Bu)]$ |
| F-2355 | Me | Me | $CH_2CH_2CH_2Ph(4\text{-}CN)$ |
| F-2356 | Me | Me | $CH_2CH_2CH_2Ph(4\text{-}CF_3)$ |
| F-2357 | Me | Me | $CH_2CH_2CH_2Ph(4\text{-}OCHF_2)$ |
| F-2358 | Me | Me | $CH_2CH_2CH_2Ph(4\text{-}OCF_3)$ |
| F-2359 | Me | Me | $CH_2CH_2CH_2Ph(4\text{-}SCHF_2)$ |
| F-2360 | Me | Me | $CH_2CH_2CH_2Ph(4\text{-}SCF_3)$ |
| F-2361 | Me | Me | $CH_2CH_2CH_2Ph[4\text{-}CF(CF_3)_2]$ |
| F-2362 | Me | Me | $CH_2CH_2CH_2Ph(3,4,5\text{-}F_3)$ |
| F-2363 | Me | Me | $CH_2CH_2CH_2Ph(2,4,6\text{-}F_3)$ |
| F-2364 | Me | Me | $CH_2CH_2CH_2CH_2Ph$ |
| F-2365 | Me | Me | $CH_2CH_2CH_2CH_2Ph(4\text{-}F)$ |
| F-2366 | Me | Me | $CH_2CH_2CH_2CH_2Ph(4\text{-}CF_3)$ |
| F-2367 | Me | Me | $CH_2CH_2CH_2CH_2Ph(4\text{-}OCF_3)$ |
| F-2368 | Me | Me | $CH_2CH_2CH_2CH_2Ph(4\text{-}SCF_3)$ |
| F-2369 | Me | Me | $CH_2CH_2CH_2CH_2CH_2Ph$ |
| F-2370 | Me | Me | $CH_2CH_2CH_2CH_2CH_2CH_2Ph$ |

TABLE 1119

| Compound Number | $R^3$ | $R^4$ | $R^5$ |
|---|---|---|---|
| F-2371 | Me | Me | $CH_2CF_2Ph(4\text{-}F)$ |
| F-2372 | Me | Me | $CH_2CF_2Ph(4\text{-}CF_3)$ |
| F-2373 | Me | Me | $CH_2CF_2Ph(3,4,5\text{-}F_3)$ |

TABLE 1120

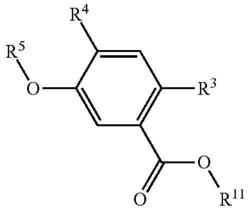

| Compound Number | $R^3$ | $R^4$ | $R^5$ | $R^{11}$ |
|---|---|---|---|---|
| G-0001 | Cl | F | Me | Me |
| G-0002 | Cl | F | Et | Me |
| G-0003 | Cl | F | n-Pr | Me |
| G-0004 | Cl | F | i-Pr | Me |
| G-0005 | Cl | F | n-Bu | Me |
| G-0006 | Cl | F | n-Pen | Me |
| G-0007 | Cl | F | n-Hex | Me |
| G-0008 | Cl | F | n-Heptyl | Me |
| G-0009 | Cl | F | n-Octyl | Me |
| G-0010 | Cl | F | n-Nonyl | Me |
| G-0011 | Cl | F | n-Decyl | Me |
| G-0012 | Cl | F | c-Pr | Me |
| G-0013 | Cl | F | c-Pen | Me |
| G-0014 | Cl | F | c-Hex | Me |
| G-0015 | Cl | F | $CH_2C(Me){=}CH_2$ | Me |
| G-0016 | Cl | F | $CH_2CH_2CH{=}CH_2$ | Me |
| G-0017 | Cl | F | $CH_2CH_2CH{=}C(CH_3)_2$ | Me |
| G-0018 | Cl | F | $CH_2CH_2CH_2CH{=}CH_2$ | Me |
| G-0019 | Cl | F | $CH_2CH_2CH_2CH{=}C(CH_3)_2$ | Me |
| G-0020 | Cl | F | $CH_2CH_2CH_2CH_2CH{=}CH_2$ | Me |
| G-0021 | Cl | F | $CH_2CH_2CH_2CH_2CH{=}C(CH_3)_2$ | Me |
| G-0022 | Cl | F | $CH_2CH_2C{\equiv}CH$ | Me |
| G-0023 | Cl | F | $CH_2CH_2CH_2C{\equiv}CH$ | Me |
| G-0024 | Cl | F | $CH_2CH_2CH_2CH_2C{\equiv}CH$ | Me |
| G-0025 | Cl | F | $CH_2CH_2CH_2Cl$ | Me |
| G-0026 | Cl | F | $CH_2CH_2CH_2Br$ | Me |

TABLE 1120-continued

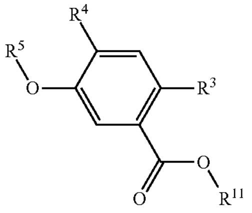

| Compound Number | $R^3$ | $R^4$ | $R^5$ | $R^{11}$ |
|---|---|---|---|---|
| G-0027 | Cl | F | $CH_2CH_2CH_2CH_2Cl$ | Me |
| G-0028 | Cl | F | $CH_2CH_2CH_2CH_2Br$ | Me |
| G-0029 | Cl | F | $CH_2CH_2CH_2CH_2CH_2Cl$ | Me |
| G-0030 | Cl | F | $CH_2CH_2CH_2CH_2CH_2Br$ | Me |
| G-0031 | Cl | F | $CH_2CH_2CH_2CH_2CH_2CH_2Cl$ | Me |
| G-0032 | Cl | F | $CH_2CH_2CH_2CH_2CH_2CH_2Br$ | Me |
| G-0033 | Cl | F | $CH_2CH_2CH_2CH_2CH_2CH_2CH_2Cl$ | Me |
| G-0034 | Cl | F | $CH_2CH_2CH_2CH_2CH_2CH_2CH_2Br$ | Me |
| G-0035 | Cl | F | $CH_2CH_2CH_2CH_2CH_2CH_2CH_2CH_2Br$ | Me |
| G-0036 | Cl | F | $CH_2CH(Me)CH_2Cl$ | Me |
| G-0037 | Cl | F | $CH_2CH(Me)CH_2Br$ | Me |
| G-0038 | C | F | $CH_2CH_2CH(Me)CH_2CH_2Cl$ | Me |

TABLE 1121

| Compound Number | $R^3$ | $R^4$ | $R^5$ | $R^{11}$ |
|---|---|---|---|---|
| G-0039 | Cl | F | $CH_2CH_2CH(Me)CH_2CH_2Br$ | Me |
| G-0040 | Cl | F | $CH_2CH_2CF{=}CF_2$ | Me |
| G-0041 | Cl | F | $CH_2CH{=}C(Cl)CF_3$ | Me |
| G-0042 | Cl | F | $CH_2CH_2CH_2CF{=}CF_2$ | Me |
| G-0043 | Cl | F | $CH_2CH_2CH_2CH_2CF{=}CF_2$ | Me |
| G-0044 | Cl | F | $CH_2CH_2CH_2CH_2CH_2CF{=}CF_2$ | Me |
| G-0045 | Cl | F | $CH_2(t\text{-}Bu)$ | Me |
| G-0046 | Cl | F | $CH_2CH_2(t\text{-}Bu)$ | Me |
| G-0047 | Cl | F | $CH_2CH_2CH_2(t\text{-}Bu)$ | Me |
| G-0048 | Cl | F | $CH_2CH_2CH_2CH_2(t\text{-}Bu)$ | Me |
| G-0049 | Cl | F | $CH_2CH_2CH_2CH_2CH_2(t\text{-}Bu)$ | Me |
| G-0050 | Cl | F | $CH_2CH_2CH_2CH_2CH_2CH_2(t\text{-}Bu)$ | Me |
| G-0051 | Cl | F | $CH_2CF_3$ | Me |
| G-0052 | Cl | F | $CH_2CH_2CF_3$ | Me |
| G-0053 | Cl | F | $CH_2CH_2CH_2CF_3$ | Me |
| G-0054 | Cl | F | $CH_2CH_2CH_2CH_2CF_3$ | Me |
| G-0055 | Cl | F | $CH_2CH_2CH_2CH_2CH_2CF_3$ | Me |
| G-0056 | Cl | F | $CH_2CH_2CH_2CH_2CH_2CH_2CF_3$ | Me |
| G-0057 | Cl | F | $CH_2CH_2CH_2CH_2CH_2CH_2CH_2CF_3$ | Me |
| G-0058 | Cl | F | $CH_2CF_2CF_3$ | Me |
| G-0059 | Cl | F | $CF_2CHFCF_3$ | Me |
| G-0060 | Cl | F | $CF_2CF_2CF_3$ | Me |
| G-0061 | Cl | F | $CH_2CF_2CF_2CF_3$ | Me |
| G-0062 | Cl | F | $CH_2CF_2CF_2CF_2CF_3$ | Me |
| G-0063 | Cl | F | $CH_2CF_2CF_2CF_2CHF_2$ | Me |
| G-0064 | Cl | F | $CH(CF_3)CF_3$ | Me |
| G-0065 | Cl | F | $CH_2CF(CF_3)CF_3$ | Me |
| G-0066 | Cl | F | $CH_2CF_2CF(CF_3)CF_3$ | Me |
| G-0067 | Cl | F | $CH_2CF(CF_3)CF_2CF_3$ | Me |
| G-0068 | Cl | F | $CH_2CF_2CF_2CF(CF_3)CF_3$ | Me |
| G-0069 | Cl | F | $CH_2CF_2CF(CF_3)CF_2CF_3$ | Me |
| G-0070 | Cl | F | $CH_2CF(CF_3)CF_2CF_2CF_3$ | Me |
| G-0071 | Cl | F | $CH_2(c\text{-}Pr)$ | Me |
| G-0072 | Cl | F | $CH_2[c\text{-}Pr(1\text{-}Me)]$ | Me |
| G-0073 | Cl | F | $CH_2[c\text{-}Pr(1\text{-}Ph)]$ | Me |
| G-0074 | Cl | F | $CH_2[c\text{-}Pr(1\text{-}NH_2)]$ | Me |
| G-0075 | Cl | F | $CH_2[c\text{-}Pr(1\text{-}NHC({=}O)O(t\text{-}Bu)]$ | Me |
| G-0076 | Cl | F | $CH_2\{c\text{-}Pr[1\text{-}NHS({=}O)_2CF_3]\}$ | Me |
| G-0077 | Cl | F | $CH_2\{c\text{-}Pr[1\text{-}Ph(4\text{-}CF_3)]\}$ | Me |
| G-0078 | Cl | F | $CH_2\{c\text{-}Pr[1\text{-}Ph(3,4,5\text{-}F_3)]\}$ | Me |
| G-0079 | Cl | F | $CH_2\{c\text{-}Hex[4\text{-}(t\text{-}Bu)]\}$ | Me |
| G-0080 | Cl | F | $CH_2[c\text{-}Hex(4\text{-}CF_3)]$ | Me |
| G-0081 | Cl | F | $CH_2CH_2(c\text{-}Pr)$ | Me |
| G-0082 | Cl | F | $CH_2CH_2(c\text{-}Hex)$ | Me |

TABLE 1122

| Compound Number | $R^3$ | $R^4$ | $R^5$ | $R^{11}$ |
|---|---|---|---|---|
| G-0083 | Cl | F | $CH_2CH_2$[c-Hex(4-$CF_3$)] | Me |
| G-0084 | Cl | F | $CH_2CH_2$[c-Hex(4-$SCF_3$)] | Me |
| G-0085 | Cl | F | $CH_2CH_2CH_2$(c-Pr) | Me |
| G-0086 | Cl | F | $CH_2CH_2CH_2$(c-Hex) | Me |
| G-0087 | Cl | F | $CH_2CH_2CH_2${c-Hex[4-(t-Bu)]} | Me |
| G-0088 | Cl | F | $CH_2CH_2CH_2$[c-Hex(4-$CF_3$)] | Me |
| G-0089 | Cl | F | $CH_2CH_2CH_2$[c-Hex(4-$SCF_3$)] | Me |
| G-0090 | Cl | F | $CH_2CH_2CH_2CH_2$(c-Pr) | Me |
| G-0091 | Cl | F | $CH_2CH_2CH_2CH_2$(c-Hex) | Me |
| G-0092 | Cl | F | $CH_2CH_2CH_2CH_2$[c-Hex(4-$CF_3$)] | Me |
| G-0093 | Cl | F | $CH_2$[c-Pr(2,2-$F_2$)] | Me |
| G-0094 | Cl | F | $CH_2$[c-Hex(4,4-$F_2$)] | Me |
| G-0095 | Cl | F | $CH_2CH_2$[c-Pr(2,2-$F_2$)] | Me |
| G-0096 | Cl | F | $CH_2CH_2$[c-Hex(4,4-$F_2$)] | Me |
| G-0097 | Cl | F | $CH_2CH_2CH_2$[c-Pr(2,2-$F_2$)] | Me |
| G-0098 | Cl | F | $CH_2CH_2CH_2CH_2$[c-Pr(2,2-$F_2$)] | Me |
| G-0099 | Cl | F | $CH_2CH_2OH$ | Me |
| G-0100 | Cl | F | $CH_2CH_2CH_2OH$ | Me |
| G-0101 | Cl | F | $CH_2CH_2CH_2CH_2OH$ | Me |
| G-0102 | Cl | F | $CH_2CH_2CH_2CH_2CH_2OH$ | Me |
| G-0103 | Cl | F | $CH_2CH_2CH_2CH_2CH_2CH_2OH$ | Me |
| G-0104 | Cl | F | $CH_2C$(=O)Me | Me |
| G-0105 | Cl | F | $CH_2CH$(OH)Me | Me |
| G-0106 | Cl | F | $CH_2CH(OH)CF_3$ | Me |
| G-0107 | Cl | F | $CH_2C(OH)_2CF_3$ | Me |
| G-0108 | Cl | F | $CH_2C(CF_3)$=NOH | Me |
| G-0109 | Cl | F | $CH_2C(CF_3)$=NOMe | Me |
| G-0110 | Cl | F | $CH_2CH(CF_3)NH_2$ | Me |
| G-0111 | Cl | F | $CH_2CH(CF_3)NHSO_2CF_3$ | Me |
| G-0112 | Cl | F | $CH_2CH_2$OMe | Me |
| G-0113 | Cl | F | $CH_2CH_2CH_2$OMe | Me |
| G-0114 | Cl | F | $CH_2CH_2CH_2CH_2$OMe | Me |
| G-0115 | Cl | F | $CH_2CH_2CH_2CH_2CH_2$OMe | Me |
| G-0116 | Cl | F | $CH_2CH_2CH_2CH_2CH_2CH_2$OMe | Me |
| G-0117 | Cl | F | $CH_2CH_2OCHF_2$ | Me |
| G-0118 | Cl | F | $CH_2CH_2CH_2OCHF_2$ | Me |
| G-0119 | Cl | F | $CH_2CH_2CH_2CH_2OCHF_2$ | Me |
| G-0120 | Cl | F | $CH_2CH_2CH_2CH_2CH_2OCHF_2$ | Me |
| G-0121 | Cl | F | $CH_2CH_2CH_2CH_2CH_2CH_2OCHF_2$ | Me |
| G-0122 | Cl | F | $CH_2CH_2OCH_2CF_3$ | Me |
| G-0123 | Cl | F | $CH_2CH_2CH_2OCH_2CF_3$ | Me |
| G-0124 | Cl | F | $CH_2CH_2CH_2CH_2OCH_2CF_3$ | Me |
| G-0125 | Cl | F | $CH_2CH_2CH_2CH_2CH_2OCH_2CF_3$ | Me |
| G-0126 | Cl | F | $CH_2CH_2CH_2CH_2CH_2CH_2OCH_2CF_3$ | Me |

TABLE 1123

| Compound Number | $R^3$ | $R^4$ | $R^5$ | $R^{11}$ |
|---|---|---|---|---|
| G-0127 | Cl | F | $CH_2CH_2CH_2CH_2CH_2CH_2CH_2OCH_2CF_3$ | Me |
| G-0128 | Cl | F | $CH_2CH_2OC(CF_3)_3$ | Me |
| G-0129 | Cl | F | $CH_2CH_2CH_2OC(CF_3)_3$ | Me |
| G-0130 | Cl | F | $CH_2CH_2CH_2CH_2OC(CF_3)_3$ | Me |
| G-0131 | Cl | F | $CH_2CH_2CH_2CH_2CH_2OC(CF_3)_3$ | Me |
| G-0132 | Cl | F | $CF_2CHFOCF_2CF_2CF_3$ | Me |
| G-0133 | Cl | F | $CH_2CH_2O$(c-Pr) | Me |
| G-0134 | Cl | F | $CH_2CH_2O$(c-Pen) | Me |
| G-0135 | Cl | F | $CH_2CH_2O$(c-Hex) | Me |
| G-0136 | Cl | F | $CH_2CH_2CH_2O$(c-Pr) | Me |
| G-0137 | Cl | F | $CH_2CH_2CH_2O$(c-Pen) | Me |
| G-0138 | Cl | F | $CH_2CH_2CH_2O$(c-Hex) | Me |
| G-0139 | Cl | F | $CH_2CH_2CH_2CH_2O$(c-Pr) | Me |
| G-0140 | Cl | F | $CH_2CH_2CH_2CH_2O$(c-Pen) | Me |
| G-0141 | Cl | F | $CH_2CH_2CH_2CH_2O$(c-Hex) | Me |
| G-0142 | Cl | F | $CH_2CH_2O$[c-Pr(2,2-$F_2$)] | Me |
| G-0143 | Cl | F | $CH_2CH_2CH_2O$[c-Pr(2,2-$F_2$)] | Me |
| G-0144 | Cl | F | $CH_2CH_2CH_2CH_2O$[c-Pr(2,2-$F_2$)] | Me |
| G-0145 | Cl | F | $CH_2CH_2OCH_2CH_2OCH_3$ | Me |
| G-0146 | Cl | F | $CH_2CH_2OCH_2CH_2OCH_2CF_3$ | Me |
| G-0147 | Cl | F | $CH_2CF_2OCF_2CF_2OCF_3$ | Me |
| G-0148 | Cl | F | $CF_2CHFOCF_2CF_2OCF_3$ | Me |
| G-0149 | Cl | F | $CF_2CHFOCF_2CF(CF_3)OCF_2CF_2CF_3$ | Me |
| G-0150 | Cl | F | $CH_2CH_2SH$ | Me |

TABLE 1123-continued

| Compound Number | $R^3$ | $R^4$ | $R^5$ | $R^{11}$ |
|---|---|---|---|---|
| G-0151 | Cl | F | $CH_2CH_2CH_2SH$ | Me |
| G-0152 | Cl | F | $CH_2CH_2CH_2CH_2SH$ | Me |
| G-0153 | Cl | F | $CH_2CH_2CH_2CH_2CH_2SH$ | Me |
| G-0154 | Cl | F | $CH_2CH_2CH_2CH_2CH_2CH_2SH$ | Me |
| G-0155 | Cl | F | $CH_2CH_2S$(t-Bu) | Me |
| G-0156 | Cl | F | $CH_2CH_2CH_2S$(t-Bu) | Me |
| G-0157 | Cl | F | $CH_2CH_2CH_2CH_2S$(t-Bu) | Me |
| G-0158 | Cl | F | $CH_2CH_2CH_2CH_2CH_2SCH_3$ | Me |
| G-0159 | Cl | F | $CH_2CH_2CH_2CH_2CH_2SCH(CH_3)_2$ | Me |
| G-0160 | Cl | F | $CH_2CH_2CH_2CH_2CH_2S$(t-Bu) | Me |
| G-0161 | Cl | F | $CH_2CH_2CH_2CH_2CH_2CH_2SCH(CH_3)_2$ | Me |
| G-0162 | Cl | F | $CH_2CH_2CH_2CH_2CH_2CH_2S$(t-Bu) | Me |
| G-0163 | Cl | F | $CH_2CH_2CH_2CH_2CH_2CH_2CH_2S$(t-Bu) | Me |
| G-0164 | Cl | F | $CH_2CH_2SCHF_2$ | Me |
| G-0165 | Cl | F | $CH_2CH_2CH_2SCHF_2$ | Me |
| G-0166 | Cl | F | $CH_2CH_2CH_2CH_2SCHF_2$ | Me |
| G-0167 | Cl | F | $CH_2CH_2CH_2CH_2CH_2SCHF_2$ | Me |
| G-0168 | Cl | F | $CH_2CH_2CH_2CH_2CH_2CH_2SCHF_2$ | Me |
| G-0169 | Cl | F | $CH_2CH_2CH_2CH_2CH_2CH_2CH_2SCHF_2$ | Me |
| G-0170 | Cl | F | $CH_2CH_2SCF_3$ | Me |

TABLE 1124

| Compound Number | $R^3$ | $R^4$ | $R^5$ | $R^{11}$ |
|---|---|---|---|---|
| G-0171 | Cl | F | $CH_2CH_2CH_2SCF_3$ | Me |
| G-0172 | Cl | F | $CH_2CH_2CH_2CH_2SCF_3$ | Me |
| G-0173 | Cl | F | $CH_2CH_2CH_2CH_2CH_2SCF_3$ | Me |
| G-0174 | Cl | F | $CH_2CH_2CH_2CH_2CH_2CH_2SCF_3$ | Me |
| G-0175 | Cl | F | $CH_2CH_2CH_2CH_2CH_2CH_2CH_2SCF_3$ | Me |
| G-0176 | Cl | F | $CH_2CH_2CH_2CH_2CH_2CH_2CH_2CH_2SCF_3$ | Me |
| G-0177 | Cl | F | $CH_2CH(Me)SCF_3$ | Me |
| G-0178 | Cl | F | $CH(Me)CH_2SCF_3$ | Me |
| G-0179 | Cl | F | $CH_2CH_2CH(Me)SCF_3$ | Me |
| G-0180 | Cl | F | $CH_2CH(Me)CH_2SCF_3$ | Me |
| G-0181 | Cl | F | $CH(Me)CH_2CH_2SCF_3$ | Me |
| G-0182 | Cl | F | $CH_2CH_2CH_2CH(Me)SCF_3$ | Me |
| G-0183 | Cl | F | $CH_2CH_2CH(Me)CH_2SCF_3$ | Me |
| G-0184 | Cl | F | $CH_2CH(Me)CH_2CH_2SCF_3$ | Me |
| G-0185 | Cl | F | $CH(Me)CH_2CH_2CH_2SCF_3$ | Me |
| G-0186 | Cl | F | $CH_2CH_2SCH_2CF_3$ | Me |
| G-0187 | Cl | F | $CH_2CH_2CH_2SCH_2CF_3$ | Me |
| G-0188 | Cl | F | $CH_2CH_2CH_2CH_2SCH_2CF_3$ | Me |
| G-0189 | Cl | F | $CH_2CH_2CH_2CH_2CH_2SCH_2CF_3$ | Me |
| G-0190 | Cl | F | $CH_2CH_2CH_2CH_2CH_2CH_2SCH_2CF_3$ | Me |
| G-0191 | Cl | F | $CH_2CH_2CH_2CH_2CH_2CH_2CH_2SCH_2CF_3$ | Me |
| G-0192 | Cl | F | $CH_2CH_2SCH(CF_3)_2$ | Me |
| G-0193 | Cl | F | $CH_2CH_2CH_2SCH(CF_3)_2$ | Me |
| G-0194 | Cl | F | $CH_2CH_2CH_2CH_2SCH(CF_3)_2$ | Me |
| G-0195 | Cl | F | $CH_2CH_2CH_2CH_2CH_2SCH(CF_3)_2$ | Me |
| G-0196 | Cl | F | $CH_2CH_2CH_2CH_2CH_2CH_2SCH(CF_3)_2$ | Me |
| G-0197 | Cl | F | $CH_2CH_2CH_2CH_2CH_2SCF_2CF_3$ | Me |
| G-0198 | Cl | F | $CH_2CH_2CH_2CH_2CH_2CH_2SCF_2CF_3$ | Me |
| G-0199 | Cl | F | $CH_2CH_2CH_2CH_2CH_2CH_2SCF(CF_3)_2$ | Me |
| G-0200 | Cl | F | $CH_2CH_2CH_2CH_2CH_2CH_2CH_2SCF(CF_3)_2$ | Me |
| G-0201 | Cl | F | $CH_2CH_2CH_2CH_2CH_2SCCl_3$ | Me |
| G-0202 | Cl | F | $CH_2CH_2CH_2CH_2CH_2CH_2SCCl_3$ | Me |
| G-0203 | Cl | F | $CH_2CH_2SCH_2CH$=$CH_2$ | Me |
| G-0204 | Cl | F | $CH_2CH_2CH_2SCH_2CH$=$CH_2$ | Me |
| G-0205 | Cl | F | $CH_2CH_2CH_2CH_2SCH_2CH$=$CH_2$ | Me |
| G-0206 | Cl | F | $CH_2CH_2SCF$=$CFCF_3$ | Me |
| G-0207 | Cl | F | $CH_2CH_2CH_2SCF$=$CFCF_3$ | Me |
| G-0208 | Cl | F | $CH_2CH_2CH_2CH_2SCF$=$CFCF_3$ | Me |
| G-0209 | Cl | F | $CH_2CH_2CH_2S$(c-Pr) | Me |
| G-0210 | Cl | F | $CH_2CH_2CH_2S$(c-Hex) | Me |
| G-0211 | Cl | F | $CH_2CH_2CH_2CH_2S$(c-Pr) | Me |
| G-0212 | Cl | F | $CH_2CH_2CH_2CH_2S$(c-Hex) | Me |
| G-0213 | Cl | F | $CH_2CH_2CH_2CH_2CH_2S$(c-Pr) | Me |
| G-0214 | Cl | F | $CH_2CH_2CH_2CH_2CH_2S$(c-Hex) | Me |

TABLE 1125

| Compound Number | $R^3$ | $R^4$ | $R^5$ | $R^{11}$ |
|---|---|---|---|---|
| G-0215 | Cl | F | $CH_2CH_2CH_2S$[c-Hex(4,4-$F_2$)] | Me |
| G-0216 | Cl | F | $CH_2CH_2CH_2CH_2S$[c-Hex(4,4-$F_2$)] | Me |
| G-0217 | Cl | F | $CH_2CH_2CH_2CH_2CH_2CH_2S$[c-Hex(4,4-$F_2$)] | Me |
| G-0218 | Cl | F | $CH_2CH_2CH_2SCH_2$(c-Pr) | Me |
| G-0219 | Cl | F | $CH_2CH_2CH_2SCH_2$(c-Hex) | Me |
| G-0220 | Cl | F | $CH_2CH_2CH_2CH_2SCH_2$(c-Pr) | Me |
| G-0221 | Cl | F | $CH_2CH_2CH_2CH_2SCH_2$(c-Hex) | Me |
| G-0222 | Cl | F | $CH_2CH_2CH_2CH_2CH_2SCH_2$(c-Pr) | Me |
| G-0223 | Cl | F | $CH_2CH_2CH_2CH_2CH_2SCH_2$(c-Hex) | Me |
| G-0224 | Cl | F | $CH_2CH_2CH_2SCH_2$[c-Hex(4,4-$F_2$)] | Me |
| G-0225 | Cl | F | $CH_2CH_2CH_2CH_2SCH_2$[c-Hex(4,4-$F_2$)] | Me |
| G-0226 | Cl | F | $CH_2CH_2CH_2CH_2CH_2SCH_2$[c-Hex(4,4-$F_2$)] | Me |
| G-0227 | Cl | F | $CH_2CH_2CH_2SCH_2SiMe_3$ | Me |
| G-0228 | Cl | F | $CH_2CH_2CH_2CH_2SCH_2SiMe_3$ | Me |
| G-0229 | Cl | F | $CH_2CH_2CH_2CH_2CH_2SCH_2SiMe_3$ | Me |
| G-0230 | Cl | F | $CH_2CH_2OCH_2CH_2SCH_3$ | Me |
| G-0231 | Cl | F | $CH_2CH_2OCH_2CH_2SCHF_2$ | Me |
| G-0232 | Cl | F | $CH_2CH_2OCH_2CH_2SCF_3$ | Me |
| G-0233 | Cl | F | $CH_2CH_2OCH_2CH_2SCH_2CF_3$ | Me |
| G-0234 | Cl | F | $CH_2CH_2CH_2S$(=O)(t-Bu) | Me |
| G-0235 | Cl | F | $CH_2CH_2CH_2CH_2S$(=O)(t-Bu) | Me |
| G-0236 | Cl | F | $CH_2CH_2CH_2CH_2CH_2CH_2S$(=O)(t-Bu) | Me |
| G-0237 | Cl | F | $CH_2CH_2S$(=O)$CHF_2$ | Me |
| G-0238 | Cl | F | $CH_2CH_2CH_2S$(=O)$CHF_2$ | Me |
| G-0239 | Cl | F | $CH_2CH_2CH_2CH_2S$(=O)$CHF_2$ | Me |
| G-0240 | Cl | F | $CH_2CH_2CH_2CH_2CH_2S$(=O)$CHF_2$ | Me |
| G-0241 | Cl | F | $CH_2CH_2CH_2CH_2CH_2CH_2S$(=O)$CHF_2$ | Me |
| G-0242 | Cl | F | $CH_2CH_2CH_2CH_2CH_2CH_2CH_2S$(=O)$CHF_2$ | Me |
| G-0243 | Cl | F | $CH_2CH_2S$(=O)$CF_3$ | Me |
| G-0244 | Cl | F | $CH_2CH_2CH_2S$(=O)$CF_3$ | Me |
| G-0245 | Cl | F | $CH_2CH_2CH_2CH_2S$(=O)$CF_3$ | Me |
| G-0246 | Cl | F | $CH_2CH_2CH_2CH_2CH_2S$(=O)$CF_3$ | Me |
| G-0247 | Cl | F | $CH_2CH_2CH_2CH_2CH_2CH_2S$(=O)$CF_3$ | Me |
| G-0248 | Cl | F | $CH_2CH_2CH_2CH_2CH_2CH_2CH_2S$(=O)$CF_3$ | Me |
| G-0249 | Cl | F | $CH_2CH_2S$(=O)$CH_2CF_3$ | Me |
| G-0250 | Cl | F | $CH_2CH_2CH_2S$(=O)$CH_2CF_3$ | Me |
| G-0251 | Cl | F | $CH_2CH_2CH_2CH_2S$(=O)$CH_2CF_3$ | Me |
| G-0252 | Cl | F | $CH_2CH_2CH_2CH_2CH_2S$(=O)$CH_2CF_3$ | Me |
| G-0253 | Cl | F | $CH_2CH_2CH_2CH_2CH_2CH_2S$(=O)$CH_2CF_3$ | Me |
| G-0254 | Cl | F | $CH_2CH_2CH_2CH_2CH_2CH_2CH_2S$(=O)$CH_2CF_3$ | Me |
| G-0255 | Cl | F | $CH_2CH_2CH_2S$(=O)(c-Pr) | Me |
| G-0256 | Cl | F | $CH_2CH_2CH_2CH_2S$(=O)(c-Pr) | Me |
| G-0257 | Cl | F | $CH_2CH_2CH_2CH_2S$(=O)(c-Pen) | Me |
| G-0258 | Cl | F | $CH_2CH_2CH_2CH_2S$(=O)(c-Hex) | Me |

TABLE 1126

| Compound Number | $R^3$ | $R^4$ | $R^5$ | $R^{11}$ |
|---|---|---|---|---|
| G-0259 | Cl | F | $CH_2CH_2CH_2CH_2CH_2S$(=O)(c-Pr) | Me |
| G-0260 | Cl | F | $CH_2CH_2CH_2CH_2CH_2S$(=O)(c-Hex) | Me |
| G-0261 | Cl | F | $CH_2CH_2CH_2S$(=O)[c-Hex(4,4-$F_2$)] | Me |
| G-0262 | Cl | F | $CH_2CH_2CH_2CH_2S$(=O)[c-Hex(4,4-$F_2$)] | Me |
| G-0263 | Cl | F | $CH_2CH_2CH_2CH_2CH_2S$(=O)[c-Hex(4,4-$F_2$)] | Me |
| G-0264 | Cl | F | $CH_2CH_2CH_2CH_2S(=O)_2$Me | Me |
| G-0265 | Cl | F | $CH_2CH_2CH_2CH_2CH_2S(=O)_2$Me | Me |
| G-0266 | Cl | F | $CH_2CH_2CH_2CH_2CH_2S(=O)_2$(t-Bu) | Me |
| G-0267 | Cl | F | $CH_2CH_2S(=O)_2CHF_2$ | Me |
| G-0268 | Cl | F | $CH_2CH_2CH_2S(=O)_2CHF_2$ | Me |
| G-0269 | Cl | F | $CH_2CH_2CH_2CH_2S(=O)_2CHF_2$ | Me |
| G-0270 | Cl | F | $CH_2CH_2CH_2CH_2CH_2S(=O)_2CHF_2$ | Me |
| G-0271 | Cl | F | $CH_2CH_2CH_2CH_2CH_2CH_2S(=O)_2CHF_2$ | Me |
| G-0272 | Cl | F | $CH_2CH_2S(=O)_2CF_3$ | Me |
| G-0273 | Cl | F | $CH_2CH_2CH_2S(=O)_2CF_3$ | Me |
| G-0274 | Cl | F | $CH_2CH_2CH_2CH_2S(=O)_2CF_3$ | Me |
| G-0275 | Cl | F | $CH_2CH_2CH_2CH_2CH_2S(=O)_2CF_3$ | Me |
| G-0276 | Cl | F | $CH_2CH_2CH_2CH_2CH_2CH_2S(=O)_2CF_3$ | Me |
| G-0277 | Cl | F | $CH_2CH_2CH_2CH_2CH_2CH_2CH_2S(=O)_2CF_3$ | Me |
| G-0278 | Cl | F | $CH_2CH_2CH_2CH_2CH_2CH_2CH_2CH_2S(=O)_2CF_3$ | Me |
| G-0279 | Cl | F | $CH_2CH_2S(=O)_2CH_2CF_3$ | Me |
| G-0280 | Cl | F | $CH_2CH_2CH_2S(=O)_2CH_2CF_3$ | Me |

TABLE 1126-continued

| Compound Number | $R^3$ | $R^4$ | $R^5$ | $R^{11}$ |
|---|---|---|---|---|
| G-0281 | Cl | F | $CH_2CH_2CH_2CH_2S(=O)_2CH_2CF_3$ | Me |
| G-0282 | Cl | F | $CH_2CH_2CH_2CH_2CH_2S(=O)_2CH_2CF_3$ | Me |
| G-0283 | Cl | F | $CH_2CH_2CH_2CH_2CH_2CH_2CH_2S(=O)_2CH_2CF_3$ | Me |
| G-0284 | Cl | F | $CH_2CH_2CH_2S(=O)_2$(c-Pr) | Me |
| G-0285 | Cl | F | $CH_2CH_2CH_2CH_2S(=O)_2$(c-Pr) | Me |
| G-0286 | Cl | F | $CH_2CH_2CH_2CH_2CH_2S(=O)_2$(c-Pr) | Me |
| G-0287 | Cl | F | $CH_2CH_2CH_2S(=O)_2$[c-Hex(4,4-$F_2$)] | Me |
| G-0288 | Cl | F | $CH_2CH_2CH_2CH_2S(=O)_2$[c-Hex(4,4-$F_2$)] | Me |
| G-0289 | Cl | F | $CH_2CH_2CH_2CH_2CH_2S(=O)_2$[c-Hex(4,4-$F_2$)] | Me |
| G-0290 | Cl | F | $CH_2CH_2CH_2C$(=O)H | Me |
| G-0291 | Cl | F | $CH_2CH_2CH_2CH_2C$(=O)H | Me |
| G-0292 | Cl | F | $CH_2CH_2CH_2CH_2CH_2C$(=O)H | Me |
| G-0293 | Cl | F | $CH_2CH_2CH_2C$(=O)(t-Bu) | Me |
| G-0294 | Cl | F | $CH_2CH_2CH_2CH_2C$(=O)(t-Bu) | Me |
| G-0295 | Cl | F | $CH_2CH_2CH_2CH_2CH_2C$(=O)(t-Bu) | Me |
| G-0296 | Cl | F | $CH_2CH_2CH_2C$(=O)$CF_3$ | Me |
| G-0297 | Cl | F | $CH_2CH_2CH_2CH_2C$(=O)$CF_3$ | Me |
| G-0298 | Cl | F | $CH_2CH_2CH_2CH_2CH_2C$(=O)$CF_3$ | Me |
| G-0299 | Cl | F | $CH_2C$(=O)Ph | Me |
| G-0300 | Cl | F | $CH_2C$(=O)Ph(4-Cl) | Me |
| G-0301 | Cl | F | $CH_2C$(=O)Ph(4-$CF_3$) | Me |
| G-0302 | Cl | F | $CH_2CH_2C$(=O)Ph(4-$CF_3$) | Me |

TABLE 1127

| Compound Number | $R^3$ | $R^4$ | $R^5$ | $R^{11}$ |
|---|---|---|---|---|
| G-0303 | Cl | F | $CH_2CH_2CH_2C$(=O)Ph(4-$CF_3$) | Me |
| G-0304 | Cl | F | $CH_2CH_2CH_2CH_2C$(=O)Ph(4-$CF_3$) | Me |
| G-0305 | Cl | F | $CH_2CH_2CH_2CH_2CH_2C$(=O)Ph(4-$CF_3$) | Me |
| G-0306 | Cl | F | $CH_2C$(=O)OEt | Me |
| G-0307 | Cl | F | $CH_2CH_2C$(=O)O(t-Bu) | Me |
| G-0308 | Cl | F | $CH_2CH_2CH_2C$(=O)OEt | Me |
| G-0309 | Cl | F | $CH_2CH_2CH_2C$(=O)O(t-Bu) | Me |
| G-0310 | Cl | F | $CH_2CH_2CH_2CH_2C$(=O)O(t-Bu) | Me |
| G-0311 | Cl | F | $CH_2CH_2CH_2CH_2CH_2C$(=O)O(t-Bu) | Me |
| G-0312 | Cl | F | $CH_2CH_2CH_2CH_2CH_2CH_2C$(=O)O(t-Bu) | Me |
| G-0313 | Cl | F | $CH_2CH_2CH_2CH_2CH_2CH_2CH_2C$(=O)OEt | Me |
| G-0314 | Cl | F | $CH_2CH_2C$(=O)$OCH_2CF_3$ | Me |
| G-0315 | Cl | F | $CH_2CH_2CH_2C$(=O)$OCH_2CF_3$ | Me |
| G-0316 | Cl | F | $CH_2CH_2CH_2CH_2C$(=O)$OCH_2CF_3$ | Me |
| G-0317 | Cl | F | $CH_2CH_2CH_2CH_2CH_2C$(=O)$OCH_2CF_3$ | Me |
| G-0318 | Cl | F | $CH_2CH_2C$(=O)NH(t-Bu) | Me |
| G-0319 | Cl | F | $CH_2CH_2CH_2C$(=O)NH(t-Bu) | Me |
| G-0320 | Cl | F | $CH_2CH_2CH_2C$(=O)NH(t-Pen) | Me |
| G-0321 | Cl | F | $CH_2CH_2CH_2CH_2C$(=O)NH(t-Bu) | Me |
| G-0322 | Cl | F | $CH_2CH_2C$(=O)$NHCH_2CF_3$ | Me |
| G-0323 | Cl | F | $CH_2CH_2CH_2C$(=O)$NHCH_2CF_3$ | Me |
| G-0324 | Cl | F | $CH_2CH_2CH_2CH_2C$(=O)$NHCH_2CF_3$ | Me |
| G-0325 | Cl | F | $CH_2CH_2SC$(=O)$N(Me)_2$ | Me |
| G-0326 | Cl | F | $CH_2CH_2CH_2SC$(=O)$N(Me)_2$ | Me |
| G-0327 | Cl | F | $CH_2CH_2CH_2SC$(=O)NH(t-Bu) | Me |
| G-0328 | Cl | F | $CH_2CH_2CH_2CH_2CH_2SC$(=O)NH(t-Bu) | Me |
| G-0329 | Cl | F | $CH_2CH_2SC$(=O)$NHCH_2CF_3$ | Me |
| G-0330 | Cl | F | $CH_2CH_2CH_2SC$(=O)$NHCH_2CF_3$ | Me |
| G-0331 | Cl | F | $CH_2CH_2CH_2CH_2SC$(=O)$NHCH_2CF_3$ | Me |
| G-0332 | Cl | F | $CH_2CH_2CH_2OC$(=O)H | Me |
| G-0333 | Cl | F | $CH_2CH_2CH_2CH_2OC$(=O)H | Me |
| G-0334 | Cl | F | $CH_2CH_2CH_2CH_2CH_2OC$(=O)H | Me |
| G-0335 | Cl | F | $CH_2CH_2CH_2OC$(=O)Me | Me |
| G-0336 | Cl | F | $CH_2CH_2CH_2CH_2OC$(=O)Me | Me |
| G-0337 | Cl | F | $CH_2CH_2CH_2CH_2CH_2OC$(=O)Me | Me |
| G-0338 | Cl | F | $CH_2CH_2OC$(=O)$CF_3$ | Me |
| G-0339 | Cl | F | $CH_2CH_2CH_2OC$(=O)$CF_3$ | Me |
| G-0340 | Cl | F | $CH_2CH_2CH_2CH_2OC$(=O)$CF_3$ | Me |
| G-0341 | Cl | F | $CH_2CH_2CH_2CH_2OC$(=O)Ph(4-$CF_3$) | Me |
| G-0342 | Cl | F | $CH_2CH_2OC$(=O)Ph | Me |
| G-0343 | Cl | F | $CH_2CH_2OC$(=O)Ph(4-$CF_3$) | Me |
| G-0344 | Cl | F | $CH_2CH_2CH_2OC$(=O)Ph(4-$CF_3$) | Me |

TABLE 1127-continued

| Compound Number | $R^3$ | $R^4$ | $R^5$ | $R^{11}$ |
|---|---|---|---|---|
| G-0345 | Cl | F | $CH_2CH_2CH_2CH_2OC$(=O)Ph(4-$CF_3$) | Me |
| G-0346 | Cl | F | $CH_2CH_2CH_2CH_2CH_2OC$(=O)Ph(4-$CF_3$) | Me |

TABLE 1128

| Compound Number | $R^3$ | $R^4$ | $R^5$ | $R^{11}$ |
|---|---|---|---|---|
| G-0347 | Cl | F | $CH_2CH_2OS$(=O)Me | Me |
| G-0348 | Cl | F | $CH_2CH_2CH_2OS$(=O)Me | Me |
| G-0349 | Cl | F | $CH_2CH_2CH_2CH_2OS$(=O)Me | Me |
| G-0350 | Cl | F | $CH_2CH_2CH_2CH_2CH_2OS$(=O)Me | Me |
| G-0351 | Cl | F | $CH_2CH_2CH_2CH_2CH_2CH_2OS$(=O)Me | Me |
| G-0352 | Cl | F | $CH_2CH_2OS$(=O)$CF_3$ | Me |
| G-0353 | Cl | F | $CH_2CH_2CH_2OS$(=O)$CF_3$ | Me |
| G-0354 | Cl | F | $CH_2CH_2CH_2CH_2OS$(=O)$CF_3$ | Me |
| G-0355 | Cl | F | $CH_2CH_2CH_2CH_2CH_2OS$(=O)$CF_3$ | Me |
| G-0356 | Cl | F | $CH_2CH_2CH_2CH_2CH_2CH_2OS$(=O)$CF_3$ | Me |
| G-0357 | Cl | F | $CH_2CH_2OS$(=O)Ph | Me |
| G-0358 | Cl | F | $CH_2CH_2OS$(=O)Ph(4-Me) | Me |
| G-0359 | Cl | F | $CH_2CH_2CH_2OS$(=O)Ph | Me |
| G-0360 | Cl | F | $CH_2CH_2CH_2OS$(=O)Ph(4-Me) | Me |
| G-0361 | Cl | F | $CH_2CH_2OS(=O)_2$Me | Me |
| G-0362 | Cl | F | $CH_2CH_2CH_2OS(=O)_2$Me | Me |
| G-0363 | Cl | F | $CH_2CH_2CH_2OS(=O)_2CF_3$ | Me |
| G-0364 | Cl | F | $CH_2CH_2CH_2CH_2OS(=O)_2CF_3$ | Me |
| G-0365 | Cl | F | $CH_2CH_2CH_2CH_2CH_2OS(=O)_2CF_3$ | Me |
| G-0366 | Cl | F | $CH_2CH_2CH_2CH_2CH_2OS(=O)_2CF_2CF_2CF_2CF_3$ | Me |
| G-0367 | Cl | F | $CH_2CH_2OS(=O)_2$Ph | Me |
| G-0368 | Cl | F | $CH_2CH_2OS(=O)_2$Ph(4-Me) | Me |
| G-0369 | Cl | F | $CH_2CH_2CH_2OS(=O)_2$Ph | Me |
| G-0370 | Cl | F | $CH_2CH_2CH_2OS(=O)_2$Ph(4-Me) | Me |
| G-0371 | Cl | F | $CH_2CH_2NH_2$ | Me |
| G-0372 | Cl | F | $CH_2CH_2NH_2$, HCl | Me |
| G-0373 | Cl | F | $CH_2CH_2CH_2NH_2$ | Me |
| G-0374 | Cl | F | $CH_2CH_2CH_2CH_2NH_2$ | Me |
| G-0375 | Cl | F | $CH_2CH_2CH_2CH_2CH_2NH_2$ | Me |
| G-0376 | Cl | F | $CH_2CH_2CH_2CH_2CH_2CH_2NH_2$ | Me |
| G-0377 | Cl | F | $CH_2CH_2CH_2CH_2CH_2CH_2CH_2NH_2$ | Me |
| G-0378 | Cl | F | $CH_2CH(Me)NH_2$ | Me |
| G-0379 | Cl | F | $CH_2C$*H(Me)$NH_2$,HCl | Me |
| G-0380 | Cl | F | $CH_2C$*H(Me)$NH_2$:(R) | Me |
| G-0381 | Cl | F | $CH_2C$*H(Me)$NH_2$,HCl:(R) | Me |
| G-0382 | Cl | F | $CH_2C$*H(Me)$NH_2$:(S) | Me |
| G-0383 | Cl | F | $CH_2C$*H(Me)$NH_2$,HCl:(S) | Me |
| G-0384 | Cl | F | $CH_2CH(Et)NH_2$ | Me |
| G-0385 | Cl | F | $CH_2CH$(i-Pr)$NH_2$ | Me |
| G-0386 | Cl | F | $CH(Me)CH_2NH_2$ | Me |
| G-0387 | Cl | F | $CH(Me)CH_2NH_2$, HCl | Me |
| G-0388 | Cl | F | $CH(Et)CH_2NH_2$ | Me |
| G-0389 | Cl | F | CH(i-Pr)$CH_2NH_2$ | Me |
| G-0390 | Cl | F | $CH_2CH_2CH(Me)NH_2$ | Me |

TABLE 1129

| Compound Number | $R^3$ | $R^4$ | $R^5$ | $R^{11}$ |
|---|---|---|---|---|
| G-0391 | Cl | F | $CH_2CH(Me)CH_2NH_2$ | Me |
| G-0392 | Cl | F | $CH(Me)CH_2CH_2NH_2$ | Me |
| G-0393 | Cl | F | $CH_2CH$(Me)NH(c-Pr) | Me |
| G-0394 | Cl | F | $CH_2CH$(Me)N(c-Pr)$S(=O)_2CF_3$ | Me |
| G-0395 | Cl | F | $CH_2CH$(Me)NHOMe | Me |
| G-0396 | Cl | F | $CH_2CH$(Me)N(OMe)$S(=O)_2CF_3$ | Me |
| G-0397 | Cl | F | $CH_2CH$(Me)N(OMe)$S(=O)_2$Ph(2-$NO_2$) | Me |
| G-0398 | Cl | F | $CH_2CH$(Me)N(OMe)$S(=O)_2$Ph(4-$NO_2$) | Me |
| G-0399 | Cl | F | $CH_2CH_2N$(Me)(t-Bu) | Me |
| G-0400 | Cl | F | $CH_2CH_2CH_2N$(Me)(t-Bu) | Me |
| G-0401 | Cl | F | $CH_2CH_2CH_2CH_2N$(Me)(t-Bu) | Me |
| G-0402 | Cl | F | $CH_2CH_2NHCH_2CF_3$ | Me |

TABLE 1129-continued

| Compound Number | $R^3$ | $R^4$ | $R^5$ | $R^{11}$ |
|---|---|---|---|---|
| G-0403 | Cl | F | $CH_2CH_2CH_2NHCH_2CF_3$ | Me |
| G-0404 | Cl | F | $CH_2CH_2CH_2CH_2NHCH_2CF_3$ | Me |
| G-0405 | Cl | F | $CH_2CH_2NHC$(=O)C(Me)$(CF_3)_2$ | Me |
| G-0406 | Cl | F | $CH_2CH_2NHC$(=O)Me | Me |
| G-0407 | Cl | F | $CH_2CH_2NHC$(=O)(t-Bu) | Me |
| G-0408 | Cl | F | $CH_2CH_2CH_2CH_2NHC(=O)CH(CH_3)_2$ | Me |
| G-0409 | Cl | F | $CH_2CH_2CH_2CH_2NHC$(=O)(t-Bu) | Me |
| G-0410 | Cl | F | $CH_2CH_2CH_2CH_2NHC(=O)CH_2$(t-Bu) | Me |
| G-0411 | Cl | F | $CH_2CH_2NHC(=O)CF_3$ | Me |
| G-0412 | Cl | F | $CH_2CH_2NHC(=O)CH_2CF_3$ | Me |
| G-0413 | Cl | F | $CH_2CH_2NHC(=O)CF_2CF_3$ | Me |
| G-0414 | Cl | F | $CH_2CH_2CH_2NHC(=O)CF_3$ | Me |
| G-0415 | Cl | F | $CH_2CH_2CH_2NHC(=O)CH_2CF_3$ | Me |
| G-0416 | Cl | F | $CH_2CH_2CH_2NHC(=O)CF_2CF_3$ | Me |
| G-0417 | Cl | F | $CH_2CH_2CH_2CH_2NHC(=O)CF_3$ | Me |
| G-0418 | Cl | F | $CH_2CH_2CH_2CH_2NHC(=O)CH_2CF_3$ | Me |
| G-0419 | Cl | F | $CH_2CH_2CH_2CH_2NHC(=O)CF_2CF_3$ | Me |
| G-0420 | Cl | F | $CH_2CH_2CH_2CH_2NHC(=O)CF(CF_3)_2$ | Me |
| G-0421 | Cl | F | $CH_2CH_2CH_2CH_2NHC(=O)CCl_3$ | Me |
| G-0422 | Cl | F | $CH_2CH_2NHC$(=O)Ph | Me |
| G-0423 | Cl | F | $CH_2CH_2NHC$(=O)Ph(4-$CF_3$) | Me |
| G-0424 | Cl | F | $CH_2CH_2CH_2NHC$(=O)Ph(4-$CF_3$) | Me |
| G-0425 | Cl | F | $CH_2CH_2CH_2CH_2NHC$(=O)Ph(4-$CF_3$) | Me |
| G-0426 | Cl | F | $CH_2CH_2NHC$(=O)O(t-Bu) | Me |
| G-0427 | Cl | F | $CH_2CH_2CH_2NHC$(=O)O(t-Bu) | Me |
| G-0428 | Cl | F | $CH_2CH_2CH_2CH_2NHC$(=O)O(t-Bu) | Me |
| G-0429 | Cl | F | $CH_2CH_2CH_2CH_2NHC(=O)OCH(CH_3)_2$ | Me |
| G-0430 | Cl | F | $CH_2CH$(Me)NHC(=O)O(t-Bu) | Me |
| G-0431 | Cl | F | $CH_2C$*H(Me)NHC(=O)O(t-Bu):(R) | Me |
| G-0432 | Cl | F | $CH_2C$*H(Me)NHC(=O)O(t-Bu):(S) | Me |
| G-0433 | Cl | F | $CH_2CH$(Et)NHC(=O)O(t-Bu) | Me |
| G-0434 | Cl | F | $CH_2CH$(i-Pr)NHC(=O)O(t-Bu) | Me |

TABLE 1130

| Compound Number | $R^3$ | $R^4$ | $R^5$ | $R^{11}$ |
|---|---|---|---|---|
| G-0435 | Cl | F | $CH(Me)CH_2NHC$(=O)O(t-Bu) | Me |
| G-0436 | Cl | F | $CH(Et)CH_2NHC$(=O)O(t-Bu) | Me |
| G-0437 | Cl | F | CH(i-Pr)$CH_2NHC$(=O)O(t-Bu) | Me |
| G-0438 | Cl | F | $CH_2CH(Me)CH_2NHC$(=O)O(t-Bu) | Me |
| G-0439 | Cl | F | $CH_2CH_2NHC(=O)OC(Me)_2CF_3$ | Me |
| G-0440 | Cl | F | $CH_2CH_2CH_2NHC(=O)OCH_2CF_3$ | Me |
| G-0441 | Cl | F | $CH_2CH_2CH_2NHC(=O)OCH_2CH_2CF_3$ | Me |
| G-0442 | Cl | F | $CH_2CH_2CH_2CH_2NHC(=O)OCH_2CCl_3$ | Me |
| G-0443 | Cl | F | $CH_2CH_2CH_2CH_2NHC(=O)OCH_2CF_3$ | Me |
| G-0444 | Cl | F | $CH_2CH_2NHC$(=O)NH(t-Bu) | Me |
| G-0445 | Cl | F | $CH_2CH_2CH_2NHC$(=O)NH(t-Bu) | Me |
| G-0446 | Cl | F | $CH_2CH_2CH_2CH_2NHC$(=O)NHEt | Me |
| G-0447 | Cl | F | $CH_2CH_2CH_2CH_2NHC$(=O)NH(t-Bu) | Me |
| G-0448 | Cl | F | $CH_2CH_2CH_2NHC(=O)NHCH_2CCl_3$ | Me |
| G-0449 | Cl | F | $CH_2CH_2CH_2NHC(=O)NHCH_2CH_2F$ | Me |
| G-0450 | Cl | F | $CH_2CH_2CH_2NHC(=O)NHCH_2CF_3$ | Me |
| G-0451 | Cl | F | $CH_2CH_2CH_2CH_2NHC(=O)NHCH_2CCl_3$ | Me |
| G-0452 | Cl | F | $CH_2CH_2CH_2CH_2NHC(=O)NHCH_2CH_2F$ | Me |
| G-0453 | Cl | F | $CH_2CH_2CH_2CH_2NHC(=O)NHCH_2CF_3$ | Me |
| G-0454 | Cl | F | $CH_2CH_2NHS$(=O)Me | Me |
| G-0455 | Cl | F | $CH_2CH_2CH_2NHS$(=O)Me | Me |
| G-0456 | Cl | F | $CH_2CH_2CH_2CH_2NHS$(=O)Me | Me |
| G-0457 | Cl | F | $CH_2CH_2CH_2CH_2NHS(=O)CH(CH_3)_2$ | Me |
| G-0458 | Cl | F | $CH_2CH_2CH_2CH_2CH_2NHS$(=O)Me | Me |
| G-0459 | Cl | F | $CH_2CH_2NHS(=O)CHF_2$ | Me |
| G-0460 | Cl | F | $CH_2CH_2CH_2NHS(=O)CHF_2$ | Me |
| G-0461 | Cl | F | $CH_2CH_2CH_2CH_2NHS(=O)CHF_2$ | Me |
| G-0462 | Cl | F | $CH_2CH_2CH_2CH_2CH_2NHS(=O)CHF_2$ | Me |
| G-0463 | Cl | F | $CH_2CH(Me)NHS(=O)CHF_2$ | Me |
| G-0464 | Cl | F | $CH(Me)CH_2NHS(=O)CHF_2$ | Me |
| G-0465 | Cl | F | $CH_2CH_2CH(Me)NHS(=O)CHF_2$ | Me |
| G-0466 | Cl | F | $CH_2CH(Me)CH_2NHS(=O)CHF_2$ | Me |
| G-0467 | Cl | F | $CH(Me)CH_2CH_2NHS(=O)CHF_2$ | Me |
| G-0468 | Cl | F | $CH_2CH_2NHS(=O)CF_3$ | Me |
| G-0469 | Cl | F | $CH_2CH_2CH_2NHS(=O)CF_3$ | Me |
| G-0470 | Cl | F | $CH_2CH_2CH_2CH_2NHS(=O)CF_3$ | Me |

TABLE 1130-continued

| Compound Number | $R^3$ | $R^4$ | $R^5$ | $R^{11}$ |
|---|---|---|---|---|
| G-0471 | Cl | F | $CH_2CH_2CH_2CH_2CH_2NHS(=O)CF_3$ | Me |
| G-0472 | Cl | F | $CH_2CH_2CH_2NHS(=O)Ph$ | Me |
| G-0473 | Cl | F | $CH_2CH_2CH_2CH_2NHS(=O)Ph$ | Me |
| G-0474 | Cl | F | $CH_2CH_2CH_2CH_2CH_2NHS(=O)Ph$ | Me |
| G-0475 | Cl | F | $CH_2CH_2CH_2CH_2CH_2NHS(=O)Ph(4\text{-}CF_3)$ | Me |
| G-0476 | Cl | F | $CH_2CH(Me)NHS(=O)Ph(4\text{-}CF_3)$ | Me |
| G-0477 | Cl | F | $CH_2CH(Et)NHS(=O)Ph(4\text{-}CF_3)$ | Me |
| G-0478 | Cl | F | $CH(Me)CH_2NHS(=O)Ph(4\text{-}CF_3)$ | Me |

TABLE 1131

| Compound Number | $R^3$ | $R^4$ | $R^5$ | $R^{11}$ |
|---|---|---|---|---|
| G-0479 | Cl | F | $CH(Et)CH_2NHS(=O)Ph(4\text{-}CF_3)$ | Me |
| G-0480 | Cl | F | $CH_2CH(Et)CH_2NHS(=O)Ph(4\text{-}CF_3)$ | Me |
| G-0481 | Cl | F | $CH_2CH_2NHS(=O)_2Me$ | Me |
| G-0482 | Cl | F | $CH_2CH_2CH_2NHS(=O)_2Me$ | Me |
| G-0483 | Cl | F | $CH_2CH_2CH_2CH_2NHS(=O)_2Me$ | Me |
| G-0484 | Cl | F | $CH_2CH_2CH_2CH_2NHS(=O)_2CH(CH_3)_2$ | Me |
| G-0485 | Cl | F | $CH_2CH_2CH_2CH_2CH_2NHS(=O)_2Me$ | Me |
| G-0486 | Cl | F | $CH_2CH_2NHS(=O)_2CHF_2$ | Me |
| G-0487 | Cl | F | $CH_2CH_2CH_2NHS(=O)_2CHF_2$ | Me |
| G-0488 | Cl | F | $CH_2CH_2CH_2CH_2NHS(=O)_2CHF_2$ | Me |
| G-0489 | Cl | F | $CH_2CH_2CH_2CH_2CH_2NHS(=O)_2CHF_2$ | Me |
| G-0490 | Cl | F | $CH_2CH(Me)NHS(=O)_2CHF_2$ | Me |
| G-0491 | Cl | F | $CH(Me)CH_2NHS(=O)_2CHF_2$ | Me |
| G-0492 | Cl | F | $CH_2CH_2CH(Me)NHS(=O)_2CHF_2$ | Me |
| G-0493 | Cl | F | $CH_2CH(Me)CH_2NHS(=O)_2CHF_2$ | Me |
| G-0494 | Cl | F | $CH(Me)CH_2CH_2NHS(=O)_2CHF_2$ | Me |
| G-0495 | Cl | F | $CH_2CH(Me)N(Me)S(=O)_2CHF_2$ | Me |
| G-0496 | Cl | F | $CH(Me)CH_2N(Me)S(=O)_2CHF_2$ | Me |
| G-0497 | Cl | F | $CH_2CH_2CH(Me)N(Me)S(=O)_2CHF_2$ | Me |
| G-0498 | Cl | F | $CH_2CH(Me)CH_2N(Me)S(=O)_2CHF_2$ | Me |
| G-0499 | Cl | F | $CH(Me)CH_2CH_2N(Me)S(=O)_2CHF_2$ | Me |
| G-0500 | Cl | F | $CH_2CH_2NHS(=O)_2CF_3$ | Me |
| G-0501 | Cl | F | $CH_2CH_2CH_2NHS(=O)_2CF_3$ | Me |
| G-0502 | Cl | F | $CH_2CH_2CH_2CH_2NHS(=O)_2CF_3$ | Me |
| G-0503 | Cl | F | $CH_2CH_2CH_2CH_2CH_2NHS(=O)_2CF_3$ | Me |
| G-0504 | Cl | F | $CH_2CH_2N(Me)S(=O)_2CF_3$ | Me |
| G-0505 | Cl | F | $CH_2CH_2N(Et)S(=O)_2CF_3$ | Me |
| G-0506 | Cl | F | $CH_2CH_2N(CH_2CN)S(=O)_2CF_3$ | Me |
| G-0507 | Cl | F | $CH_2CH_2N(CH_2OMe)S(=O)_2CF_3$ | Me |
| G-0508 | Cl | F | $CH_2CH_2CH_2N(Me)S(=O)_2CF_3$ | Me |
| G-0509 | Cl | F | $CH_2CH_2CH_2N(Et)S(=O)_2CF_3$ | Me |
| G-0510 | Cl | F | $CH_2CH_2CH_2N(CH_2CN)S(=O)_2CF_3$ | Me |
| G-0511 | Cl | F | $CH_2CH_2CH_2N(CH_2OMe)S(=O)_2CF_3$ | Me |
| G-0512 | Cl | F | $CH_2CH_2CH_2CH_2N(Me)S(=O)_2CF_3$ | Me |
| G-0513 | Cl | F | $CH_2CH_2CH_2CH_2N(Et)S(=O)_2CF_3$ | Me |
| G-0514 | Cl | F | $CH_2CH_2CH_2CH_2N(CH_2CN)S(=O)_2CF_3$ | Me |
| G-0515 | Cl | F | $CH_2CH_2CH_2CH_2N(CH_2OMe)S(=O)_2CF_3$ | Me |
| G-0516 | Cl | F | $CH_2CH(Me)NHS(=O)_2CF_3$ | Me |
| G-0517 | Cl | F | $CH_2C^*H(Me)NHS(=O)_2CF_3$:(R) | Me |
| G-0518 | Cl | F | $CH_2C^*H(Me)NHS(=O)_2CF_3$:(S) | Me |
| G-0519 | Cl | F | $CH(Me)CH_2NHS(=O)_2CF_3$ | Me |
| G-0520 | Cl | F | $CH_2CH_2CH(Me)NHS(=O)_2CF_3$ | Me |
| G-0521 | Cl | F | $CH_2CH(Me)CH_2NHS(=O)_2CF_3$ | Me |
| G-0522 | Cl | F | $CH(Me)CH_2CH_2NHS(=O)_2CF_3$ | Me |

TABLE 1132

| Compound Number | $R^3$ | $R^4$ | $R^5$ | $R^{11}$ |
|---|---|---|---|---|
| G-0523 | Cl | F | $CH_2CH(Me)N(Me)S(=O)_2CF_3$ | Me |
| G-0524 | Cl | F | $CH(Me)CH_2N(Me)S(=O)_2CF_3$ | Me |
| G-0525 | Cl | F | $CH_2CH_2CH(Me)N(Me)S(=O)_2CF_3$ | Me |
| G-0526 | Cl | F | $CH_2CH(Me)CH_2N(Me)S(=O)_2CF_3$ | Me |
| G-0527 | Cl | F | $CH(Me)CH_2CH_2N(Me)S(=O)_2CF_3$ | Me |
| G-0528 | Cl | F | $CH_2CH_2CH_2NHS(=O)_2Ph$ | Me |
| G-0529 | Cl | F | $CH_2CH_2CH_2CH_2NHS(=O)_2Ph$ | Me |
| G-0530 | Cl | F | $CH_2CH_2CH_2CH_2CH_2NHS(=O)_2Ph$ | Me |

TABLE 1132-continued

| Compound Number | $R^3$ | $R^4$ | $R^5$ | $R^{11}$ |
|---|---|---|---|---|
| G-0531 | Cl | F | $CH_2CH_2CH_2CH_2CH_2NHS(=O)_2Ph(4\text{-}CF_3)$ | Me |
| G-0532 | Cl | F | $CH_2CH(Me)NHS(=O)_2Ph(4\text{-}CF_3)$ | Me |
| G-0533 | Cl | F | $CH_2CH(Et)NHS(=O)_2Ph(4\text{-}CF_3)$ | Me |
| G-0534 | Cl | F | $CH(Me)CH_2NHS(=O)_2Ph(4\text{-}CF_3)$ | Me |
| G-0535 | Cl | F | $CH(Et)CH_2NHS(=O)_2Ph(4\text{-}CF_3)$ | Me |
| G-0536 | Cl | F | $CH_2CH(Me)CH_2NHS(=O)_2Ph(4\text{-}CF_3)$ | Me |
| G-0537 | Cl | F | $CH_2CH_2SiMe_3$ | Me |
| G-0538 | Cl | F | $CH_2CH_2CH_2SiMe_3$ | Me |
| G-0539 | Cl | F | $CH_2CH_2CH_2CH_2SiMe_3$ | Me |
| G-0540 | Cl | F | $CH_2Ph$ | Me |
| G-0541 | Cl | F | $CH_2Ph(2\text{-}CF_3)$ | Me |
| G-0542 | Cl | F | $CH_2Ph(3\text{-}CF_3)$ | Me |
| G-0543 | Cl | F | $CH_2Ph(4\text{-}CF_3)$ | Me |
| G-0544 | Cl | F | $CH_2Ph(2\text{-}OCF_3)$ | Me |
| G-0545 | Cl | F | $CH_2Ph(3\text{-}OCF_3)$ | Me |
| G-0546 | Cl | F | $CH_2Ph(4\text{-}OCF_3)$ | Me |
| G-0547 | Cl | F | $CH_2Ph(2\text{-}SCF_3)$ | Me |
| G-0548 | Cl | F | $CH_2Ph(3\text{-}SCF_3)$ | Me |
| G-0549 | Cl | F | $CH_2Ph(4\text{-}SCF_3)$ | Me |
| G-0550 | Cl | F | $CH_2Ph(3\text{-}CH_2SCF_3)$ | Me |
| G-0551 | Cl | F | $CH_2Ph(4\text{-}F)$ | Me |
| G-0552 | Cl | F | $CH_2Ph(4\text{-}Cl)$ | Me |
| G-0553 | Cl | F | $CH_2Ph(4\text{-}Br)$ | Me |
| G-0554 | Cl | F | $CH_2Ph(4\text{-}Me)$ | Me |
| G-0555 | Cl | F | $CH_2Ph[4\text{-}(t\text{-}Bu)]$ | Me |
| G-0556 | Cl | F | $CH_2Ph(4\text{-}CN)$ | Me |
| G-0557 | Cl | F | $CH_2Ph(4\text{-}NO_2)$ | Me |
| G-0558 | Cl | F | $CH_2Ph(4\text{-}OCHF_2)$ | Me |
| G-0559 | Cl | F | $CH_2Ph(4\text{-}SCHF_2)$ | Me |
| G-0560 | Cl | F | $CH_2Ph(4\text{-}CH_2SCF_3)$ | Me |
| G-0561 | Cl | F | $CH_2Ph[(4\text{-}CF(CF_3)_2]$ | Me |
| G-0562 | Cl | F | $CH_2Ph(4\text{-}CH_2SCF_3)]$ | Me |
| G-0563 | Cl | F | $CH_2Ph[4\text{-}Ph(4\text{-}CF_3)]$ | Me |
| G-0564 | Cl | F | $CH_2PhCH_2Ph(2,4\text{-}Cl_2)$ | Me |
| G-0565 | Cl | F | $CH_2Ph[2,5\text{-}(CF_3)_2]$ | Me |
| G-0566 | Cl | F | $CH_2Ph(3,4\text{-}Cl_2)$ | Me |

TABLE 1133

| Compound Number | $R^3$ | $R^4$ | $R^5$ | $R^{11}$ |
|---|---|---|---|---|
| G-0567 | Cl | F | $CH_2Ph(3\text{-}CF_3\text{-}4\text{-}F)$ | Me |
| G-0568 | Cl | F | $CH_2Ph(3\text{-}CF_3\text{-}4\text{-}Cl)$ | Me |
| G-0569 | Cl | F | $CH_2Ph(3\text{-}F\text{-}4\text{-}CF_3)$ | Me |
| G-0570 | Cl | F | $CH_2Ph(2,4,6\text{-}F_3)$ | Me |
| G-0571 | Cl | F | $CH_2Ph(3,4,5\text{-}F_3)$ | Me |
| G-0572 | Cl | F | $CH_2Ph(2,3,4\text{-}F_3)$ | Me |
| G-0573 | Cl | F | $CH_2Ph(3,4,5\text{-}Cl_3)$ | Me |
| G-0574 | Cl | F | $CH_2CH_2Ph$ | Me |
| G-0575 | Cl | F | $CH_2CH_2Ph(4\text{-}F)$ | Me |
| G-0576 | Cl | F | $CH_2CH_2Ph(4\text{-}Cl)$ | Me |
| G-0577 | Cl | F | $CH_2CH_2Ph(4\text{-}Br)$ | Me |
| G-0578 | Cl | F | $CH_2CH_2Ph[4\text{-}(t\text{-}Bu)]$ | Me |
| G-0579 | Cl | F | $CH_2CH_2Ph(2\text{-}CF_3)$ | Me |
| G-0580 | Cl | F | $CH_2CH_2Ph(3\text{-}CF_3)$ | Me |
| G-0581 | Cl | F | $CH_2CH_2Ph(4\text{-}CF_3)$ | Me |
| G-0582 | Cl | F | $CH2CH2Ph[4\text{-}CF(CF_3)_2]$ | Me |
| G-0583 | Cl | F | $CH_2CH_2Ph[4\text{-}(c\text{-}Pr)]$ | Me |
| G-0584 | Cl | F | $CH_2CH_2Ph\{4\text{-}[c\text{-}Pr(2,2\text{-}F_2)]\}$ | Me |
| G-0585 | Cl | F | $CH_2CH_2Ph(4\text{-}OMe)$ | Me |
| G-0586 | Cl | F | $CH_2CH_2Ph(3\text{-}OCF_3)$ | Me |
| G-0587 | Cl | F | $CH_2CH_2Ph(4\text{-}OCHF_2)$ | Me |
| G-0588 | Cl | F | $CH_2CH_2Ph(4\text{-}OCF_3)$ | Me |
| G-0589 | Cl | F | $CH_2CH_2Ph(4\text{-}SMe)$ | Me |
| G-0590 | Cl | F | $CH_2CH_2Ph(4\text{-}SCHF_2)$ | Me |
| G-0591 | Cl | F | $CH_2CH_2Ph(4\text{-}SCF_3)$ | Me |
| G-0592 | Cl | F | $CH_2CH_2Ph[4\text{-}S(=O)Me]$ | Me |
| G-0593 | Cl | F | $CH_2CH_2Ph[4\text{-}S(=O)CF_3]$ | Me |
| G-0594 | Cl | F | $CH_2CH_2Ph[4\text{-}S(=O)_2Me]$ | Me |
| G-0595 | Cl | F | $CH_2CH_2Ph[4\text{-}S(=O)_2CF_3]$ | Me |
| G-0596 | Cl | F | $CH_2CH_2Ph(4\text{-}CH_2SMe)$ | Me |
| G-0597 | Cl | F | $CH_2CH_2Ph(4\text{-}CH_2SCF_3)$ | Me |
| G-0598 | Cl | F | $CH_2CH_2Ph[4\text{-}OS(=O)_2Me]$ | Me |

TABLE 1133-continued

| Compound Number | $R^3$ | $R^4$ | $R^5$ | $R^{11}$ |
|---|---|---|---|---|
| G-0599 | Cl | F | $CH_2CH_2Ph[4-OS(=O)_2CF_3]$ | Me |
| G-0600 | Cl | F | $CH_2CH_2Ph[4-Ph(4-CF_3]$ | Me |
| G-0601 | Cl | F | $CH_2CH_2Ph(4-CH_2Ph)$ | Me |
| G-0602 | Cl | F | $CH_2CH_2Ph(4-OCH_2Ph)$ | Me |
| G-0603 | Cl | F | $CH_2CH_2Ph(4-CN)$ | Me |
| G-0604 | Cl | F | $CH_2CH_2Ph(4-NO_2)$ | Me |
| G-0605 | Cl | F | $CH_2CH_2Ph(2,4-Cl_2)$ | Me |
| G-0606 | Cl | F | $CH_2CH_2Ph(3,4-Cl_2)$ | Me |
| G-0607 | Cl | F | $CH_2CH_2Ph(3-CF_3-4-F)$ | Me |
| G-0608 | Cl | F | $CH_2CH_2Ph(2-CF_3-4-F)$ | Me |
| G-0609 | Cl | F | $CH_2CH_2Ph(3-F-4-CF_3)$ | Me |
| G-0610 | Cl | F | $CH_2CH_2Ph(2-F-4-CF_3)$ | Me |

TABLE 1134

| Compound Number | $R^3$ | $R^4$ | $R^5$ | $R^{11}$ |
|---|---|---|---|---|
| G-0611 | Cl | F | $CH_2CH_2Ph(3-Cl-4-OCHF_2)$ | Me |
| G-0612 | Cl | F | $CH_2CH_2Ph(3,4,5-Cl_3)$ | Me |
| G-0613 | Cl | F | $CH_2CH_2Ph(2,3,4-F_3)$ | Me |
| G-0614 | Cl | F | $CH_2CH_2Ph(2,4,5-F_3)$ | Me |
| G-0615 | Cl | F | $CH_2CH_2Ph(3,4,5-F_3)$ | Me |
| G-0616 | Cl | F | $CH_2CH_2Ph(2,4,6-F_3)$ | Me |
| G-0617 | Cl | F | $CH_2CH_2CH_2Ph$ | Me |
| G-0618 | Cl | F | $CH_2CH_2CH_2Ph(3-CF_3)$ | Me |
| G-0619 | Cl | F | $CH_2CH_2CH_2Ph(4-CF_3)$ | Me |
| G-0620 | Cl | F | $CH_2CH_2CH_2Ph(4-F)$ | Me |
| G-0621 | Cl | F | $CH_2CH_2CH_2Ph[4-(t-Bu)]$ | Me |
| G-0622 | Cl | F | $CH_2CH_2CH_2Ph(4-CN)$ | Me |
| G-0623 | Cl | F | $CH_2CH_2CH_2Ph(4-CF_3)$ | Me |
| G-0624 | Cl | F | $CH_2CH_2CH_2Ph(4-OCHF_2)$ | Me |
| G-0625 | Cl | F | $CH_2CH_2CH_2Ph(4-OCF_3)$ | Me |
| G-0626 | Cl | F | $CH_2CH_2CH_2Ph(4-SCHF_2)$ | Me |
| G-0627 | Cl | F | $CH_2CH_2CH_2Ph(4-SCF_3)$ | Me |
| G-0628 | Cl | F | $CH_2CH_2CH_2Ph[4-CF(CF_3)_2]$ | Me |
| G-0629 | Cl | F | $CH_2CH_2CH_2Ph(3,4,5-F_3)$ | Me |
| G-0630 | Cl | F | $CH_2CH_2CH_2Ph(2,4,6-F_3)$ | Me |
| G-0631 | Cl | F | $CH_2CH_2CH_2CH_2Ph$ | Me |
| G-0632 | Cl | F | $CH_2CH_2CH_2CH_2Ph(4-F)$ | Me |
| G-0633 | Cl | F | $CH_2CH_2CH_2CH_2Ph(4-CF_3)$ | Me |
| G-0634 | Cl | F | $CH_2CH_2CH_2CH_2Ph(4-OCF_3)$ | Me |
| G-0635 | Cl | F | $CH_2CH_2CH_2CH_2Ph(4-SCF_3)$ | Me |
| G-0636 | Cl | F | $CH_2CH_2CH_2CH_2CH_2Ph$ | Me |
| G-0637 | Cl | F | $CH_2CH_2CH_2CH_2CH_2CH_2Ph$ | Me |
| G-0638 | Cl | F | $CH_2CF_2Ph(4-F)$ | Me |
| G-0639 | Cl | F | $CH_2CF_2Ph(4-CF_3)$ | Me |
| G-0640 | Cl | F | $CH_2CF_2Ph(3,4,5-F_3)$ | Me |
| G-0641 | Cl | F | $CH_2CH_2OPh$ | Me |
| G-0642 | Cl | F | $CH_2CH_2OPh(4-F)$ | Me |
| G-0643 | Cl | F | $CH_2CH_2OPh(4-CF_3)$ | Me |
| G-0644 | Cl | F | $CH_2CH_2CH_2OPh$ | Me |
| G-0645 | Cl | F | $CH_2CH_2CH_2OPh(4-Cl)$ | Me |
| G-0646 | Cl | F | $CH_2CH_2CH_2OPh(4-CF_3)$ | Me |
| G-0647 | Cl | F | $CH_2CH_2CH_2CH_2OPh(4-CF_3)$ | Me |
| G-0648 | Cl | F | $CH_2CH_2CH_2CH_2OPh(4-OCF_3)$ | Me |
| G-0649 | Cl | F | $CH_2CH_2CH_2CH_2CH_2OPh(4-CF_3)$ | Me |
| G-0650 | Cl | F | $CH_2CH_2OCH_2Ph$ | Me |
| G-0651 | Cl | F | $CH_2CH_2CH_2OCH_2Ph$ | Me |
| G-0652 | Cl | F | $CH_2CH_2CH_2CH_2OCH_2Ph$ | Me |
| G-0653 | Cl | F | $CH_2CH_2CH_2CH_2CH_2OCH_2Ph$ | Me |
| G-0654 | Cl | F | $CH_2CH_2SPh$ | Me |

TABLE 1135

| Compound Number | $R^3$ | $R^4$ | $R^5$ | $R^{11}$ |
|---|---|---|---|---|
| G-0655 | Cl | F | $CH_2CH_2CH_2SPh$ | Me |
| G-0656 | Cl | F | $CH_2CH_2CH_2SPh(4-F)$ | Me |
| G-0657 | Cl | F | $CH_2CH_2CH_2SPh(4-Cl)$ | Me |
| G-0658 | Cl | F | $CH_2CH_2CH_2SPh(4-Br)$ | Me |

TABLE 1135-continued

| Compound Number | $R^3$ | $R^4$ | $R^5$ | $R^{11}$ |
|---|---|---|---|---|
| G-0659 | Cl | F | $CH_2CH_2CH_2SPh[4-(t-Bu)]$ | Me |
| G-0660 | Cl | F | $CH_2CH_2CH_2SPh(3-CF_3)$ | Me |
| G-0661 | Cl | F | $CH_2CH_2CH_2SPh(4-CF_3)$ | Me |
| G-0662 | Cl | F | $CH_2CH_2CH_2SPh(3-SCF_3)$ | Me |
| G-0663 | Cl | F | $CH_2CH_2CH_2SPh(4-SCF_3)$ | Me |
| G-0664 | Cl | F | $CH_2CH_2CH_2CH_2SPh$ | Me |
| G-0665 | Cl | F | $CH_2CH_2CH_2CH_2SPh(4-F)$ | Me |
| G-0666 | Cl | F | $CH_2CH_2CH_2CH_2SPh(4-Cl)$ | Me |
| G-0667 | Cl | F | $CH_2CH_2CH_2CH_2SPh[4-(t-Bu)]$ | Me |
| G-0668 | Cl | F | $CH_2CH_2CH_2CH_2SPh(4-CF_3)$ | Me |
| G-0669 | Cl | F | $CH_2CH_2CH_2CH_2CH_2SPh$ | Me |
| G-0670 | Cl | F | $CH_2CH_2CH_2CH_2CH_2SPh(4-F)$ | Me |
| G-0671 | Cl | F | $CH_2CH_2CH_2CH_2CH_2SPh(4-Cl)$ | Me |
| G-0672 | Cl | F | $CH_2CH_2CH_2CH_2CH_2SPh(4-CF_3)$ | Me |
| G-0673 | Cl | F | $CH_2CH_2S(=O)Ph$ | Me |
| G-0674 | Cl | F | $CH_2CH_2CH_2S(=O)Ph$ | Me |
| G-0675 | Cl | F | $CH_2CH_2CH_2S(=O)Ph(4-F)$ | Me |
| G-0676 | Cl | F | $CH_2CH_2CH_2S(=O)Ph[4-(t-Bu)]$ | Me |
| G-0677 | Cl | F | $CH_2CH_2CH_2S(=O)Ph(4-CF_3)$ | Me |
| G-0678 | Cl | F | $CH_2CH_2S(=O)_2Ph$ | Me |
| G-0679 | Cl | F | $CH_2CH_2S(=O)_2Ph(4-CF_3)$ | Me |
| G-0680 | Cl | F | $CH_2CH2CH_2S(=O)_2Ph(4-F)$ | Me |
| G-0681 | Cl | F | $CH_2CH_2CH_2S(=O)_2Ph(4-Cl)$ | Me |
| G-0682 | Cl | F | $CH_2CH_2CH_2S(=O)_2Ph(4-CF_3)$ | Me |
| G-0683 | Cl | F | $CH_2CH_2CH_2CH_2S(=O)_2Ph$ | Me |
| G-0684 | Cl | F | $CH_2CH_2CH_2CH_2S(=O)_2Ph(4-Cl)$ | Me |
| G-0685 | Cl | F | $CH_2CH_2CH_2CH_2S(=O)_2Ph(4-CF_3)$ | Me |
| G-0686 | Cl | F | $CH_2CH_2SCH_2Ph$ | Me |
| G-0687 | Cl | F | $CH_2CH_2CH_2SCH_2Ph$ | Me |
| G-0688 | Cl | F | $CH_2CH_2CH_2SCH_2Ph(2-Cl)$ | Me |
| G-0689 | Cl | F | $CH_2CH_2CH_2SCH_2Ph(3-Cl)$ | Me |
| G-0690 | Cl | F | $CH_2CH_2CH_2SCH_2Ph(4-Cl)$ | Me |
| G-0691 | Cl | F | $CH_2CH_2CH_2SCH_2Ph(2-SCF_3)$ | Me |
| G-0692 | Cl | F | $CH_2CH_2CH_2SCH_2Ph(3-CF_3)$ | Me |
| G-0693 | Cl | F | $CH_2CH_2CH_2SCH_2Ph(4-CF_3)$ | Me |
| G-0694 | Cl | F | $CH_2CH_2CH_2SCH_2Ph(4-NO_2)$ | Me |
| G-0695 | Cl | F | $CH_2CH_2CH_2CH_2SCH_2Ph$ | Me |
| G-0696 | Cl | F | $CH_2CH_2CH_2CH_2SCH_2Ph(4-Cl)$ | Me |
| G-0697 | Cl | F | $CH_2CH_2CH_2CH_2SCH_2Ph(4-CF_3)$ | Me |
| G-0698 | Cl | F | $CH_2CH_2CH_2CH_2SCH_2Ph(4-CN)$ | Me |

TABLE 1136

| Compound Number | $R^3$ | $R^4$ | $R^5$ | $R^{11}$ |
|---|---|---|---|---|
| G-0699 | Cl | F | $CH_2CH_2CH_2CH_2CH_2SCH_2Ph$ | Me |
| G-0700 | Cl | F | $CH_2CH_2SCH_2CH_2Ph$ | Me |
| G-0701 | Cl | F | $CH_2CH_2CH_2SCH_2CH_2Ph$ | Me |
| G-0702 | Cl | F | $CH_2CH_2CH_2CH_2SCH_2CH_2Ph$ | Me |
| G-0703 | Cl | F | $CH_2CH_2SCH(Me)Ph$ | Me |
| G-0704 | Cl | F | $CH_2CH_2CH_2SCH(Me)Ph$ | Me |
| G-0705 | Cl | F | $CH_2CH_2CH_2CH_2SCH(Me)Ph$ | Me |
| G-0706 | Cl | F | $CH_2CH_2S(=O)CH_2Ph$ | Me |
| G-0707 | Cl | F | $CH_2CH_2S(=O)CH_2Ph(4-CF_3)$ | Me |
| G-0708 | Cl | F | $CH_2CH_2CH_2S(=O)CH_2Ph$ | Me |
| G-0709 | Cl | F | $CH_2CH_2CH_2S(=O)CH_2Ph(2-SCF_3)$ | Me |
| G-0710 | Cl | F | $CH_2CH_2CH_2S(=O)CH_2Ph(4-SCF_3)$ | Me |
| G-0711 | Cl | F | $CH_2CH_2CH_2S(=O)CH_2Ph(4-Cl)$ | Me |
| G-0712 | Cl | F | $CH_2CH_2CH_2S(=O)CH_2Ph(4-CF_3)$ | Me |
| G-0713 | Cl | F | $CH_2CH_2CH_2CH_2S(=O)CH_2Ph$ | Me |
| G-0714 | Cl | F | $CH_2CH_2CH_2CH_2S(=O)CH_2Ph(4-CF_3)$ | Me |
| G-0715 | Cl | F | $CH_2CH_2CH_2CH_2CH_2S(=O)CH_2Ph(4-CF_3)$ | Me |
| G-0716 | Cl | F | $CH_2CH_2S(=O)_2CH_2Ph$ | Me |
| G-0717 | Cl | F | $CH_2CH_2S(=O)_2CH_2Ph(4-CF_3)$ | Me |
| G-0718 | Cl | F | $CH_2CH_2CH_2S(=O)_2CH_2Ph$ | Me |
| G-0719 | Cl | F | $CH_2CH_2CH_2S(=O)_2CH_2Ph(4-Cl)$ | Me |
| G-0720 | Cl | F | $CH_2CH_2CH_2S(=O)_2CH_2Ph(4-CF_3)$ | Me |
| G-0721 | Cl | F | $CH_2CH_2CH_2CH_2S(=O)_2CH_2Ph$ | Me |
| G-0722 | Cl | F | $CH_2CH_2CH_2CH_2S(=O)_2CH_2Ph(4-CF_3)$ | Me |
| G-0723 | Cl | F | $CH_2CH_2CH_2CH_2CH_2S(=O)_2CH_2Ph$ | Me |
| G-0724 | Cl | F | $CH_2CH_2CH_2CH_2CH_2S(=O)_2CH_2Ph(4-CF_3)$ | Me |
| G-0725 | Cl | F | $CH_2CH_2ON=CH(t-Bu)$ | Me |
| G-0726 | Cl | F | $CH_2CH_2CH_2ON=CH(t-Bu)$ | Me |

TABLE 1136-continued

| Compound Number | $R^3$ | $R^4$ | $R^5$ | $R^{11}$ |
|---|---|---|---|---|
| G-0727 | Cl | F | $CH_2CH_2CH_2CH_2ON{=}C(Me)(c\text{-}Pr)$ | Me |
| G-0728 | Cl | F | $CH_2CH_2ON{=}C(Me)CF_3$ | Me |
| G-0729 | Cl | F | $CH_2CH_2CH_2ON{=}CHCF_3$ | Me |
| G-0730 | Cl | F | $CH_2CH_2CH_2ON{=}C(Me)CF_3$ | Me |
| G-0731 | Cl | F | $CH_2CH_2CH_2ON{=}C(Me)CCl_3$ | Me |
| G-0732 | Cl | F | $CH_2CH_2CH_2CH_2ON{=}CHCF_3$ | Me |
| G-0733 | Cl | F | $CH_2CH_2CH_2CH_2ON{=}C(Me)CF_3$ | Me |
| G-0734 | Cl | F | $CH_2CH_2CH_2CH_2CH_2ON{=}C(Me)CF_3$ | Me |
| G-0735 | Cl | F | $CH_2CH_2ON{=}CHPh$ | Me |
| G-0736 | C | F | $CH_2CH_2ON{=}CHPh(4\text{-}CF_3)$ | Me |
| G-0737 | Cl | F | $CH_2CH_2ON{=}CHPh(4\text{-}SCF_3)$ | Me |
| G-0738 | Cl | F | $CH_2CH_2CH_2ON{=}CHPh(3\text{-}CF_3)$ | Me |
| G-0739 | Cl | F | $CH_2CH_2CH_2ON{=}CHPh(4\text{-}CF_3)$ | Me |
| G-0740 | Cl | F | $CH_2CH_2CH_2ON{=}CHPh(4\text{-}SCF_3)$ | Me |
| G-0741 | Cl | F | $CH_2CH_2CH_2ON{=}C(Me)Ph(4\text{-}CF_3)$ | Me |
| G-0742 | Cl | F | $CH_2CH_2CH_2CH_2ON{=}CHPh(4\text{-}SCF_3)$ | Me |

TABLE 1137

| Compound Number | $R^3$ | $R^4$ | $R^5$ | $R^{11}$ |
|---|---|---|---|---|
| G-0743 | Cl | F | $CH_2CH_2$(adamant-1-yl) | Me |
| G-0744 | Cl | F | $CH_2CH_2CH_2$(3-$CF_3$-pyrazol-1-yl) | Me |
| G-0745 | Cl | F | $CH_2CH_2CH_2CH_2$(3-$CF_3$-pyrazol-1-yl) | Me |
| G-0746 | Cl | F | $CH_2CH_2CH_2CH_2CH_2$(3-$CF_3$-pyrazol-1-yl) | Me |
| G-0747 | Cl | F | $CH_2$(1-Me-4-$CF_3$-imidazol-5-yl) | Me |
| G-0748 | Cl | F | $CH_2CH_2$(1-Me-4-$CF_3$-imidazol-5-yl) | Me |
| G-0749 | Cl | F | $CH_2CH_2CH_2$(1-Me-4-$CF_3$-imidazol-5-yl) | Me |
| G-0750 | Cl | F | $CH_2CH_2CH_2$(3-$CF_3$-1,2,4-triazol-1-yl) | Me |
| G-0751 | Cl | F | $CH_2CH_2CH_2CH_2$(3-$CF_3$-1,2,4-triazol-1-yl) | Me |
| G-0752 | Cl | F | $CH_2CH_2CH_2CH_2CH_2$(3-$CF_3$-1,2,4-triazol-1-yl) | Me |
| G-0753 | Cl | F | $CH_2CH_2CH_2$(4-$CF_3$-thiazol-2-yl) | Me |
| G-0754 | Cl | F | $CH_2CH_2CH_2CH_2$(4-$CF_3$-thiazol-2-yl) | Me |
| G-0755 | Cl | F | $CH_2CH_2CH_2CH_2CH_2$(4-$CF_3$-thiazol-2-yl) | Me |
| G-0756 | Cl | F | $CH_2CH_2CH_2$(2-$CF_3$-pyridin-5-yl) | Me |
| G-0757 | Cl | F | $CH_2CH_2CH_2CH_2$(2-$CF_3$-pyridin-5-yl) | Me |
| G-0758 | Cl | F | $CH_2CH_2CH_2CH_2CH_2$(2-$CF_3$-pyridin-5-yl) | Me |
| G-0759 | Cl | F | $CH_2$(4-$CF_3$-pyrimidin-2-yl) | Me |
| G-0760 | Cl | F | $CH_2CH_2$(4-$CF_3$-pyrimidin-2-yl) | Me |
| G-0761 | Cl | F | $CH_2CH_2CH_2$(4-$CF_3$-pyrimidin-2-yl) | Me |
| G-0762 | Cl | F | $CH_2CH_2O$(3-Cl-5-$CF_3$-pyridin-2-yl) | Me |
| G-0763 | Cl | F | $CH_2CH_2CH_2O$(3-Cl-5-$CF_3$-pyridin-2-yl) | Me |
| G-0764 | Cl | F | $CH_2CH_2CH_2CH_2O$(3-Cl-5-$CF_3$-pyridin-2-yl) | Me |
| G-0765 | Cl | F | $CH_2CH_2CH_2CH_2CH_2O$(3-Cl-5-$CF_3$-pyridin-2-yl) | Me |
| G-0766 | Cl | F | $CH_2CH_2N$(Phth) | Me |
| G-0767 | Cl | F | $CH_2CH_2CH_2N$(Phth) | Me |
| G-0768 | Cl | F | $CH_2CH_2CH_2CH_2N$(Phth) | Me |
| G-0769 | Cl | F | $CH_2CH_2CH_2CH_2CH_2N$(Phth) | Me |
| G-0770 | Cl | F | $CH_2CH(Me)CH_2N$(Phth) | Me |
| G-0771 | Cl | F | $CH_2$[1,3-dioxolan(2-$CF_3$)-2-yl] | Me |
| G-0772 | Cl | F | $CH_2$(azetidin-3-yl) | Me |
| G-0773 | Cl | F | $CH_2$(pyrrolidin-3-yl) | Me |
| G-0774 | Cl | F | $CH_2$(piperidin-3-yl) | Me |
| G-0775 | Cl | F | $CH_2${azettidin[1-C(=O)O(t-Bu)]-3-yl} | Me |
| G-0776 | Cl | F | $CH_2${pyrrolidin[1-C(=O)O(t-Bu)]-3-yl} | Me |
| G-0777 | Cl | F | $CH_2${piperidine[1-C(=O)O(t-Bu)]-3-yl} | Me |
| G-0778 | Cl | F | $CH_2${azetidin[1-C(=O)$CF_3$]-3-yl} | Me |
| G-0779 | Cl | F | $CH_2${azetidin[1-S(=O)$_2CF_3$]-3-yl} | Me |
| G-0780 | Cl | F | $CH_2${pyrrolidin[1-C(=O)$CF_3$]-3-yl} | Me |
| G-0781 | Cl | F | $CH_2${pyrrolidin[1-S(=O)$_2CF_3$]-3-yl} | Me |
| G-0782 | Cl | F | $CH_2${piperidin[1-C(=O)$CF_3$]-3-yl} | Me |
| G-0783 | Cl | F | $CH_2${piperidin[1-S(=O)$_2CF_3$]-3-yl} | Me |
| G-0784 | Cl | F | $CH_2CH_2CH_2CN$ | Me |
| G-0785 | Cl | F | $CH_2CH_2CH_2CH_2CN$ | Me |
| G-0786 | Cl | F | $CH_2CH_2CH_2CH_2CH_2CN$ | Me |

TABLE 1138

| Compound Number | $R^3$ | $R^4$ | $R^5$ | $R^{11}$ |
|---|---|---|---|---|
| G-0787 | Cl | F | $CH_2CH_2CH_2CH_2CH_2CH_2CN$ | Me |
| G-0788 | Cl | F | $CH_2CH_2CH_2C({=}O)OH$ | Me |
| G-0789 | C | F | $CH_2CH_2CH_2CH_2C({=}O)OH$ | Me |
| G-0790 | Cl | F | $CH_2CH_2CH_2CH_2CH_2CH_2C({=}O)OH$ | Me |
| G-0791 | Cl | F | $CH_2CH_2SCN$ | Me |
| G-0792 | Cl | F | $CH_2CH_2CH_2SCN$ | Me |
| G-0793 | Cl | F | $CH_2CH_2CH_2CH_2SCN$ | Me |
| G-0794 | Cl | F | $CH_2CH_2CH_2CH_2CH_2SCN$ | Me |
| G-0795 | Cl | F | $CH_2CH_2CH_2CH_2CH_2CH_2SCN$ | Me |
| G-0796 | Cl | F | $CH_2CH_2CH_2CH_2CH_2CH_2CH_2SCN$ | Me |
| G-0797 | Cl | F | $CH_2CH_2CH_2CH_2CH_2CH_2CH_2CH_2SCN$ | Me |
| G-0798 | Cl | F | $CH_2CH_2CH(Me)SCN$ | Me |
| G-0799 | Cl | F | $CH_2CH(Me)CH_2SCN$ | Me |
| G-0800 | Cl | F | $CH(Me)CH_2CH_2SCN$ | Me |
| G-0801 | Cl | F | $CH_2CH_2CH_2CH(Me)SCN$ | Me |
| G-0802 | Cl | F | $CH_2CH_2CH(Me)CH_2SCN$ | Me |
| G-0803 | Cl | F | $CH_2CH(Me)CH_2CH_2SCN$ | Me |
| G-0804 | Cl | F | $CH(Me)CH_2CH_2CH_2SCN$ | Me |
| G-0805 | Cl | F | $CH_2CH_2CH_2CH_2CH(Me)SCN$ | Me |
| G-0806 | Cl | F | $CH_2CH_2CH_2CH(Me)CH_2SCN$ | Me |
| G-0807 | Cl | F | $CH_2CH_2CH(Me)CH_2CH_2SCN$ | Me |
| G-0808 | Cl | F | $CH_2CH(Me)CH_2CH_2CH_2SCN$ | Me |
| G-0809 | Cl | F | $CH(Me)CH_2CH_2CH_2CH_2SCN$ | Me |
| G-0810 | Cl | F | $CH_2CH_2ONH_2$ | Me |
| G-0811 | Cl | F | $CH_2CH_2CH_2ONH_2$ | Me |
| G-0812 | Cl | F | $CH_2CH_2CH_2CH_2ONH_2$ | Me |
| G-0813 | Cl | F | $CH_2CH_2CH_2CH_2CH_2ONH_2$ | Me |
| G-0814 | Cl | F | $CH_2CH_2CH_2CH_2CH_2CH_2ONH_2$ | Me |
| G-0815 | Me | F | Me | Me |
| G-0816 | Me | F | Et | Me |
| G-0817 | Me | F | n-Pr | Me |
| G-0818 | Me | F | i-Pr | Me |
| G-0819 | Me | F | n-Bu | Me |
| G-0820 | Me | F | n-Pen | Me |
| G-0821 | Me | F | n-Hex | Me |
| G-0822 | Me | F | n-Heptyl | Me |
| G-0823 | Me | F | n-Octyl | Me |
| G-0824 | Me | F | n-Nonyl | Me |
| G-0825 | Me | F | n-Decyl | Me |
| G-0826 | Me | F | c-Pr | Me |
| G-0827 | Me | F | c-Pen | Me |
| G-0828 | Me | F | c-Hex | Me |
| G-0829 | Me | F | $CH_2C(Me){=}CH_2$ | Me |
| G-0830 | Me | F | $CH_2CH_2CH{=}CH_2$ | Me |

TABLE 1139

| Compound Number | $R^3$ | $R^4$ | $R^5$ | $R^{11}$ |
|---|---|---|---|---|
| G-0831 | Me | F | $CH_2CH_2CH{=}C(CH_3)_2$ | Me |
| G-0832 | Me | F | $CH_2CH_2CH_2CH{=}CH_2$ | Me |
| G-0833 | Me | F | $CH_2CH_2CH_2CH{=}C(CH_3)_2$ | Me |
| G-0834 | Me | F | $CH_2CH_2CH_2CH_2CH{=}CH_2$ | Me |
| G-0835 | Me | F | $CH_2CH_2CH_2CH_2CH{=}C(CH_3)_2$ | Me |
| G-0836 | Me | F | $CH_2CH_2CH_2CH$ | Me |
| G-0837 | Me | F | $CH_2CH_2CH_2CH_2CH$ | Me |
| G-0838 | Me | F | $CH_2CH_2CH_2CH_2CH_2CH$ | Me |
| G-0839 | Me | F | $CH_2CH_2CH_2Cl$ | Me |
| G-0840 | Me | F | $CH_2CH_2CH_2Br$ | Me |
| G-0841 | Me | F | $CH_2CH_2CH_2CH_2Cl$ | Me |
| G-0842 | Me | F | $CH_2CH_2CH_2CH_2Br$ | Me |
| G-0843 | Me | F | $CH_2CH_2CH_2CH_2CH_2Cl$ | Me |
| G-0844 | Me | F | $CH_2CH_2CH_2CH_2CH_2Br$ | Me |
| G-0845 | Me | F | $CH_2CH_2CH_2CH_2CH_2CH_2Cl$ | Me |
| G-0846 | Me | F | $CH_2CH_2CH_2CH_2CH_2CH_2Br$ | Me |
| G-0847 | Me | F | $CH_2CH_2CH_2CH_2CH_2CH_2CH_2Cl$ | Me |
| G-0848 | Me | F | $CH_2CH_2CH_2CH_2CH_2CH_2CH_2Br$ | Me |
| G-0849 | Me | F | $CH_2CH_2CH_2CH_2CH_2CH_2CH_2CH_2CH_2Br$ | Me |
| G-0850 | Me | F | $CH_2CH(Me)CH_2Cl$ | Me |
| G-0851 | Me | F | $CH_2CH(Me)CH_2Br$ | Me |
| G-0852 | Me | F | $CH_2CH_2CH(Me)CH_2CH_2Cl$ | Me |
| G-0853 | Me | F | $CH_2CH_2CH(Me)CH_2CH_2Br$ | Me |
| G-0854 | Me | F | $CH_2CH_2CF{=}CF_2$ | Me |

TABLE 1139-continued

| Compound Number | $R^3$ | $R^4$ | $R^5$ | $R^{11}$ |
|---|---|---|---|---|
| G-0855 | Me | F | $CH_2CH{=}C(Cl)CF_3$ | Me |
| G-0856 | Me | F | $CH_2CH_2CH_2CF{=}CF_2$ | Me |
| G-0857 | Me | F | $CH_2CH_2CH_2CH_2CF{=}CF_2$ | Me |
| G-0858 | Me | F | $CH_2CH_2CH_2CH_2CH_2CF{=}CF_2$ | Me |
| G-0859 | Me | F | $CH_2$(t-Bu) | Me |
| G-0860 | Me | F | $CH_2CH_2$(t-Bu) | Me |
| G-0861 | Me | F | $CH_2CH_2CH_2$(t-Bu) | Me |
| G-0862 | Me | F | $CH_2CH_2CH_2CH_2$(t-Bu) | Me |
| G-0863 | Me | F | $CH_2CH_2CH_2CH_2CH_2$(t-Bu) | Me |
| G-0864 | Me | F | $CH_2CH_2CH_2CH_2CH_2CH_2$(t-Bu) | Me |
| G-0865 | Me | F | $CH_2CF_3$ | Me |
| G-0866 | Me | F | $CH_2CH_2CF_3$ | Me |
| G-0867 | Me | F | $CH_2CH_2CH_2CF_3$ | Me |
| G-0868 | Me | F | $CH_2CH_2CH_2CH_2CF_3$ | Me |
| G-0869 | Me | F | $CH_2CH_2CH_2CH_2CH_2CF_3$ | Me |
| G-0870 | Me | F | $CH_2CH_2CH_2CH_2CH_2CH_2CF_3$ | Me |
| G-0871 | Me | F | $CH_2CH_2CH_2CH_2CH_2CH_2CH_2CF_3$ | Me |
| G-0872 | Me | F | $CH_2CF_2CF_3$ | Me |
| G-0873 | Me | F | $CF_2CHFCF_3$ | Me |
| G-0874 | Me | F | $CF_2CF_2CF_3$ | Me |

TABLE 1140

| Compound Number | $R^3$ | $R^4$ | $R^5$ | $R^{11}$ |
|---|---|---|---|---|
| G-0875 | Me | F | $CH_2CF_2CF_2CF_3$ | Me |
| G-0876 | Me | F | $CH_2CF_2CF_2CF_2CF_3$ | Me |
| G-0877 | Me | F | $CH_2CF_2CF_2CF_2CHF_2$ | Me |
| G-0878 | Me | F | $CH(CF_3)CF_3$ | Me |
| G-0879 | Me | F | $CH_2CF(CF_3)CF_3$ | Me |
| G-0880 | Me | F | $CH_2CF_2CF(CF_3)CF_3$ | Me |
| G-0881 | Me | F | $CH_2CF(CF_3)CF_2CF_3$ | Me |
| G-0882 | Me | F | $CH_2CF_2CF_2CF(CF_3)CF_3$ | Me |
| G-0883 | Me | F | $CH_2CF_2CF(CF_3)CF_2CF_3$ | Me |
| G-0884 | Me | F | $CH_2CF(CF_3)CF_2CF_2CF_3$ | Me |
| G-0885 | Me | F | $CH_2$(c-Pr) | Me |
| G-0886 | Me | F | $CH_2$[c-Pr(1-Me)] | Me |
| G-0887 | Me | F | $CH_2$[c-Pr(1-Ph)] | Me |
| G-0888 | Me | F | $CH_2$[c-Pr(1-$NH_2$)] | Me |
| G-0889 | Me | F | $CH_2$[c-Pr(1-NHC(=O)O(t-Bu)] | Me |
| G-0890 | Me | F | $CH_2${c-Pr[1-NHS(=O)$_2CF_3$]} | Me |
| G-0891 | Me | F | $CH_2${c-Pr[1-Ph(4-$CF_3$)]} | Me |
| G-0892 | Me | F | $CH_2${c-Pr[1-Ph(3,4,5-$F_3$)]} | Me |
| G-0893 | Me | F | $CH_2${c-Hex[4-(t-Bu)]} | Me |
| G-0894 | Me | F | $CH_2$[c-Hex(4-$CF_3$)] | Me |
| G-0895 | Me | F | $CH_2CH_2$(c-Pr) | Me |
| G-0896 | Me | F | $CH_2CH_2$(c-Hex) | Me |
| G-0897 | Me | F | $CH_2CH_2$[c-Hex(4-$CF_3$)] | Me |
| G-0898 | Me | F | $CH_2CH_2$[c-Hex(4-$SCF_3$)] | Me |
| G-0899 | Me | F | $CH_2CH_2CH_2$(c-Pr) | Me |
| G-0900 | Me | F | $CH_2CH_2CH_2$(c-Hex) | Me |
| G-0901 | Me | F | $CH_2CH_2CH_2${c-Hex[4-(t-Bu)] | Me |
| G-0902 | Me | F | $CH_2CH_2CH_2${c-Hex(4-$CF_3$)] | Me |
| G-0903 | Me | F | $CH_2CH_2CH_2${c-Hex(4-$SCF_3$)] | Me |
| G-0904 | Me | F | $CH_2CH_2CH_2CH_2$(c-Pr) | Me |
| G-0905 | Me | F | $CH_2CH_2CH_2CH_2$(c-Hex) | Me |
| G-0906 | Me | F | $CH_2CH_2CH_2CH_2$[c-Hex(4-$CF_3$)] | Me |
| G-0907 | Me | F | $CH_2$[c-Pr(2,2-$F_2$)] | Me |
| G-0908 | Me | F | $CH_2$[c-Hex(4,4-$F_2$)] | Me |
| G-0909 | Me | F | $CH_2CH_2$[c-Pr(2,2-$F_2$)] | Me |
| G-0910 | Me | F | $CH_2CH_2$[c-Hex(4,4-$F_2$)] | Me |
| G-0911 | Me | F | $CH_2CH_2CH_2$[c-Pr(2,2-$F_2$)] | Me |
| G-0912 | Me | F | $CH_2CH_2CH_2$[c-Pr(2,2-$F_2$)] | Me |
| G-0913 | Me | F | $CH_2CH_2OH$ | Me |
| G-0914 | Me | F | $CH_2CH_2CH_2OH$ | Me |
| G-0915 | Me | F | $CH_2CH_2CH_2CH_2OH$ | Me |
| G-0916 | Me | F | $CH_2CH_2CH_2CH_2CH_2OH$ | Me |
| G-0917 | Me | F | $CH_2CH_2CH_2CH_2CH_2CH_2OH$ | Me |
| G-0918 | Me | F | $CH_2C(=O)Me$ | Me |

TABLE 1141

| Compound Number | $R^3$ | $R^4$ | $R^5$ | $R^{11}$ |
|---|---|---|---|---|
| G-0919 | Me | F | $CH_2CH(OH)Me$ | Me |
| G-0920 | Me | F | $CH_2CH(OH)CF_3$ | Me |
| G-0921 | Me | F | $CH_2C(OH)_2CF_3$ | Me |
| G-0922 | Me | F | $CH_2C(CF_3){=}NOH$ | Me |
| G-0923 | Me | F | $CH_2C(CF_3){=}NOMe$ | Me |
| G-0924 | Me | F | $CH_2CH(CF_3)NH_2$ | Me |
| G-0925 | Me | F | $CH_2CH(CF_3)NHSO_2CF_3$ | Me |
| G-0926 | Me | F | $CH_2CH_2OMe$ | Me |
| G-0927 | Me | F | $CH_2CH_2CH_2OMe$ | Me |
| G-0928 | Me | F | $CH_2CH_2CH_2CH_2OMe$ | Me |
| G-0929 | Me | F | $CH_2CH_2CH_2CH_2CH_2OMe$ | Me |
| G-0930 | Me | F | $CH_2CH_2CH_2CH_2CH_2CH_2OMe$ | Me |
| G-0931 | Me | F | $CH_2CH_2OCHF_2$ | Me |
| G-0932 | Me | F | $CH_2CH_2CH_2OCHF_2$ | Me |
| G-0933 | Me | F | $CH_2CH_2CH_2CH_2OCHF_2$ | Me |
| G-0934 | Me | F | $CH_2CH_2CH_2CH_2CH_2OCHF_2$ | Me |
| G-0935 | Me | F | $CH_2CH_2CH_2CH_2CH_2CH_2OCHF_2$ | Me |
| G-0936 | Me | F | $CH_2CH_2OCH_2CF_3$ | Me |
| G-0937 | Me | F | $CH_2CH_2CH_2OCH_2CF_3$ | Me |
| G-0938 | Me | F | $CH_2CH_2CH_2CH_2OCH_2CF_3$ | Me |
| G-0939 | Me | F | $CH_2CH_2CH_2CH_2CH_2OCH_2CF_3$ | Me |
| G-0940 | Me | F | $CH_2CH_2CH_2CH_2CH_2CH_2OCH_2CF_3$ | Me |
| G-0941 | Me | F | $CH_2CH_2CH_2CH_2CH_2CH_2CH_2CH_2OCH_2CF_3$ | Me |
| G-0942 | Me | F | $CH_2CH_2OC(CF_3)_3$ | Me |
| G-0943 | Me | F | $CH_2CH_2CH_2OC(CF_3)_3$ | Me |
| G-0944 | Me | F | $CH_2CH_2CH_2CH_2OC(CF_3)_3$ | Me |
| G-0945 | Me | F | $CH_2CH_2CH_2CH_2CH_2OC(CF_3)_3$ | Me |
| G-0946 | Me | F | $CF_2CHFOCF_2CF_2CF_3$ | Me |
| G-0947 | Me | F | $CH_2CH_2O$(c-Pr) | Me |
| G-0948 | Me | F | $CH_2CH_2O$(c-Pen) | Me |
| G-0949 | Me | F | $CH_2CH_2O$(c-Hex) | Me |
| G-0950 | Me | F | $CH_2CH_2CH_2O$(c-Pr) | Me |
| G-0951 | Me | F | $CH_2CH_2CH_2O$(c-Pen) | Me |
| G-0952 | Me | F | $CH_2CH_2CH_2O$(c-Hex) | Me |
| G-0953 | Me | F | $CH_2CH_2CH_2CH_2O$(c-Pr) | Me |
| G-0954 | Me | F | $CH_2CH_2CH_2CH_2O$(c-Pen) | Me |
| G-0955 | Me | F | $CH_2CH_2CH_2CH_2O$(c-Hex) | Me |
| G-0956 | Me | F | $CH_2CH_2O$[c-Pr(2,2-$F_2$)] | Me |
| G-0957 | Me | F | $CH_2CH_2CH_2O$[c-Pr(2,2-$F_2$)] | Me |
| G-0958 | Me | F | $CH_2CH_2CH_2CH_2O$[c-Pr(2,2-$F_2$)] | Me |
| G-0959 | Me | F | $CH_2CH_2OCH_2CH_2OCH_3$ | Me |
| G-0960 | Me | F | $CH_2CH_2OCH_2CH_2OCH_2CF_3$ | Me |
| G-0961 | Me | F | $CH_2CF_2OCF_2CF_2OCF_3$ | Me |
| G-0962 | Me | F | $CF_2CHFOCF_2CF_2OCF_3$ | Me |

TABLE 1142

| Compound Number | $R^3$ | $R^4$ | $R^5$ | $R^{11}$ |
|---|---|---|---|---|
| G-0963 | Me | F | $CF_2CHFOCF_2CF(CF_3)OCF_2CF_2CF_3$ | Me |
| G-0964 | Me | F | $CH_2CH_2SH$ | Me |
| G-0965 | Me | F | $CH_2CH_2CH_2SH$ | Me |
| G-0966 | Me | F | $CH_2CH_2CH_2CH_2SH$ | Me |
| G-0967 | Me | F | $CH_2CH_2CH_2CH_2CH_2SH$ | Me |
| G-0968 | Me | F | $CH_2CH_2CH_2CH_2CH_2CH_2SH$ | Me |
| G-0969 | Me | F | $CH_2CH_2S$(t-Bu) | Me |
| G-0970 | Me | F | $CH_2CH_2CH_2S$(t-Bu) | Me |
| G-0971 | Me | F | $CH_2CH_2CH_2CH_2S$(t-Bu) | Me |
| G-0972 | Me | F | $CH_2CH_2CH_2CH_2CH_2SCH_3$ | Me |
| G-0973 | Me | F | $CH_2CH_2CH_2CH_2CH_2SCH(CH_3)_2$ | Me |
| G-0974 | Me | F | $CH_2CH_2CH_2CH_2CH_2S$(t-Bu) | Me |
| G-0975 | Me | F | $CH_2CH_2CH_2CH_2CH_2CH_2SCH(CH_3)_2$ | Me |
| G-0976 | Me | F | $CH_2CH_2CH_2CH_2CH_2CH_2S$(t-Bu) | Me |
| G-0977 | Me | F | $CH_2CH_2CH_2CH_2CH_2CH_2CH_2S$(t-Bu) | Me |
| G-0978 | Me | F | $CH_2CH_2SCHF_2$ | Me |
| G-0979 | Me | F | $CH_2CH_2CH_2SCHF_2$ | Me |
| G-0980 | Me | F | $CH_2CH_2CH_2CH_2SCHF_2$ | Me |
| G-0981 | Me | F | $CH_2CH_2CH_2CH_2CH_2SCHF_2$ | Me |
| G-0982 | Me | F | $CH_2CH_2CH_2CH_2CH_2CH_2SCHF_2$ | Me |
| G-0983 | Me | F | $CH_2CH_2CH_2CH_2CH_2CH_2CH_2SCHF_2$ | Me |
| G-0984 | Me | F | $CH_2CH_2SCF_3$ | Me |
| G-0985 | Me | F | $CH_2CH_2CH_2SCF_3$ | Me |
| G-0986 | Me | F | $CH_2CH_2CH_2CH_2SCF_3$ | Me |

TABLE 1142-continued

| Compound Number | $R^3$ | $R^4$ | $R^5$ | $R^{11}$ |
|---|---|---|---|---|
| G-0987 | Me | F | $CH_2CH_2CH_2CH_2CH_2SCF_3$ | Me |
| G-0988 | Me | F | $CH_2CH_2CH_2CH_2CH_2CH_2SCF_3$ | Me |
| G-0989 | Me | F | $CH_2CH_2CH_2CH_2CH_2CH_2CH_2SCF_3$ | Me |
| G-0990 | Me | F | $CH_2CH_2CH_2CH_2CH_2CH_2CH_2CH_2SCF_3$ | Me |
| G-0991 | Me | F | $CH_2CH(Me)SCF_3$ | Me |
| G-0992 | Me | F | $CH(Me)CH_2SCF_3$ | Me |
| G-0993 | Me | F | $CH_2CH_2CH(Me)SCF_3$ | Me |
| G-0994 | Me | F | $CH_2CH(Me)CH_2SCF_3$ | Me |
| G-0995 | Me | F | $CH(Me)CH_2CH_2SCF_3$ | Me |
| G-0996 | Me | F | $CH_2CH_2CH_2CH(Me)SCF_3$ | Me |
| G-0997 | Me | F | $CH_2CH_2CH(Me)CH_2SCF_3$ | Me |
| G-0998 | Me | F | $CH_2CH(Me)CH_2CH_2SCF_3$ | Me |
| G-0999 | Me | F | $CH(Me)CH_2CH_2CH_2SCF_3$ | Me |
| G-1000 | Me | F | $CH_2CH_2SCH_2CF_3$ | Me |
| G-1001 | Me | F | $CH_2CH_2CH_2SCH_2CF_3$ | Me |
| G-1002 | Me | F | $CH_2CH_2CH_2CH_2SCH_2CF_3$ | Me |
| G-1003 | Me | F | $CH_2CH_2CH_2CH_2CH_2SCH_2CF_3$ | Me |
| G-1004 | Me | F | $CH_2CH_2CH_2CH_2CH_2CH_2SCH_2CF_3$ | Me |
| G-1005 | Me | F | $CH_2CH_2CH_2CH_2CH_2CH_2CH_2SCH_2CF_3$ | Me |
| G-1006 | Me | F | $CH_2CH_2SCH(CF_3)_2$ | Me |

TABLE 1143

| Compound Number | $R^3$ | $R^4$ | $R^5$ | $R^{11}$ |
|---|---|---|---|---|
| G-1007 | Me | F | $CH_2CH_2CH_2SCH(CF_3)_2$ | Me |
| G-1008 | Me | F | $CH_2CH_2CH_2CH_2SCH(CF_3)_2$ | Me |
| G-1009 | Me | F | $CH_2CH_2CH_2CH_2CH_2SCH(CF_3)_2$ | Me |
| G-1010 | Me | F | $CH_2CH_2CH_2CH_2CH_2CH_2SCH(CF_3)_2$ | Me |
| G-1011 | Me | F | $CH_2CH_2CH_2CH_2CH_2SCF_2CF_3$ | Me |
| G-1012 | Me | F | $CH_2CH_2CH_2CH_2CH_2CH_2SCF_2CF_3$ | Me |
| G-1013 | Me | F | $CH_2CH_2CH_2CH_2CH_2CH_2SCF(CF_3)_2$ | Me |
| G-1014 | Me | F | $CH_2CH_2CH_2CH_2CH_2CH_2CH_2SCF(CF_3)_2$ | Me |
| G-1015 | Me | F | $CH_2CH_2CH_2CH_2CH_2SCCl_3$ | Me |
| G-1016 | Me | F | $CH_2CH_2CH_2CH_2CH_2CH_2SCCl_3$ | Me |
| G-1017 | Me | F | $CH_2CH_2SCH_2CH{=}CH_2$ | Me |
| G-1018 | Me | F | $CH_2CH_2CH_2SCH_2CH{=}CH_2$ | Me |
| G-1019 | Me | F | $CH_2CH_2CH_2CH_2SCH_2CH{=}CH_2$ | Me |
| G-1020 | Me | F | $CH_2CH_2SCF{=}CFCF_3$ | Me |
| G-1021 | Me | F | $CH_2CH_2CH2SCF{=}CFCF_3$ | Me |
| G-1022 | Me | F | $CH_2CH_2CH_2CH_2SCF{=}CFCF_3$ | Me |
| G-1023 | Me | F | $CH_2CH_2CH_2S$(c-Pr) | Me |
| G-1024 | Me | F | $CH_2CH_2CH_2S$(c-Hex) | Me |
| G-1025 | Me | F | $CH_2CH_2CH_2CH_2S$(c-Pr) | Me |
| G-1026 | Me | F | $CH_2CH_2CH_2CH_2S$(c-Hex) | Me |
| G-1027 | Me | F | $CH_2CH_2CH_2CH_2CH_2S$(c-Pr) | Me |
| G-1028 | Me | F | $CH_2CH_2CH_2CH_2CH_2S$(c-Hex) | Me |
| G-1029 | Me | F | $CH_2CH_2CH_2S$[c-Hex(4,4-$F_2$)] | Me |
| G-1030 | Me | F | $CH_2CH_2CH_2CH_2S$[c-Hex(4,4-$F_2$)] | Me |
| G-1031 | Me | F | $CH_2CH_2CH_2CH_2CH2S$[c-Hex(4,4-$F_2$)] | Me |
| G-1032 | Me | F | $CH_2CH_2CH_2SCH_2$(c-Pr) | Me |
| G-1033 | Me | F | $CH_2CH_2CH_2SCH_2$(c-Hex) | Me |
| G-1034 | Me | F | $CH_2CH_2CH_2CH_2SCH_2$(c-Pr) | Me |
| G-1035 | Me | F | $CH_2CH_2CH_2CH_2SCH_2$(c-Hex) | Me |
| G-1036 | Me | F | $CH_2CH_2CH_2CH_2CH_2SCH_2$(c-Pr) | Me |
| G-1037 | Me | F | $CH_2CH_2CH_2CH_2CH_2SCH_2$(c-Hex) | Me |
| G-1038 | Me | F | $CH_2CH_2CH_2SCH_2$[c-Hex(4,4-$F_2$)] | Me |
| G-1039 | Me | F | $CH_2CH_2CH_2CH_2SCH_2$[c-Hex(4,4-$F_2$)] | Me |
| G-1040 | Me | F | $CH_2CH_2CH_2CH_2CH_2SCH_2$[c-Hex(4,4-$F_2$)] | Me |
| G-1041 | Me | F | $CH_2CH_2CH_2SCH_2SiMe_3$ | Me |
| G-1042 | Me | F | $CH_2CH_2CH_2CH_2SCH_2SiMe_3$ | Me |
| G-1043 | Me | F | $CH_2CH_2CH_2CH_2CH_2SCH_2SiMe_3$ | Me |
| G-1044 | Me | F | $CH_2CH_2OCH_2CH_2SCH_3$ | Me |
| G-1045 | Me | F | $CH_2CH_2OCH_2CH_2SCHF_2$ | Me |
| G-1046 | Me | F | $CH_2CH_2OCH_2CH_2SCF_3$ | Me |
| G-1047 | Me | F | $CH_2CH_2OCH_2CH_2SCH_2CF_3$ | Me |
| G-1048 | Me | F | $CH_2CH_2CH_2S({=}O)$(t-Bu) | Me |
| G-1049 | Me | F | $CH_2CH_2CH_2CH_2S({=}O)$(t-Bu) | Me |
| G-1050 | Me | F | $CH_2CH_2CH_2CH_2CH_2CH_2S({=}O)$(t-Bu) | Me |

TABLE 1144

| Compound Number | $R^3$ | $R^4$ | $R^5$ | $R^{11}$ |
|---|---|---|---|---|
| G-1051 | Me | F | $CH_2CH_2S({=}O)CHF_2$ | Me |
| G-1052 | Me | F | $CH_2CH_2CH_2S({=}O)CHF_2$ | Me |
| G-1053 | Me | F | $CH_2CH_2CH_2CH_2S({=}O)CHF_2$ | Me |
| G-1054 | Me | F | $CH_2CH_2CH_2CH_2CH_2S({=}O)CHF_2$ | Me |
| G-1055 | Me | F | $CH_2CH_2CH_2CH_2CH_2CH_2S({=}O)CHF_2$ | Me |
| G-1056 | Me | F | $CH_2CH_2CH_2CH_2CH_2CH_2CH_2S({=}O)CHF_2$ | Me |
| G-1057 | Me | F | $CH_2CH_2S({=}O)CF_3$ | Me |
| G-1058 | Me | F | $CH_2CH_2CH_2S({=}O)CF_3$ | Me |
| G-1059 | Me | F | $CH_2CH_2CH_2CH_2S({=}O)CF_3$ | Me |
| G-1060 | Me | F | $CH_2CH_2CH_2CH_2CH_2S({=}O)CF_3$ | Me |
| G-1061 | Me | F | $CH_2CH_2CH_2CH_2CH_2CH_2S({=}O)CF_3$ | Me |
| G-1062 | Me | F | $CH_2CH_2CH_2CH_2CH_2CH_2CH_2S({=}O)CF_3$ | Me |
| G-1063 | Me | F | $CH_2CH_2S({=}O)CH_2CF_3$ | Me |
| G-1064 | Me | F | $CH_2CH_2CH_2S({=}O)CH_2CF_3$ | Me |
| G-1065 | Me | F | $CH_2CH_2CH_2CH_2S({=}O)CH_2CF_3$ | Me |
| G-1066 | Me | F | $CH_2CH_2CH_2CH_2CH_2S({=}O)CH_2CF_3$ | Me |
| G-1067 | Me | F | $CH_2CH_2CH_2CH_2CH_2CH_2S({=}O)CH_2CF_3$ | Me |
| G-1068 | Me | F | $CH_2CH_2CH_2CH_2CH_2CH_2CH_2S({=}O)CH_2CF_3$ | Me |
| G-1069 | Me | F | $CH_2CH_2CH_2S({=}O)$(c-Pr) | Me |
| G-1070 | Me | F | $CH_2CH_2CH_2CH_2S({=}O)$(c-Pr) | Me |
| G-1071 | Me | F | $CH_2CH_2CH_2CH_2S({=}O)$(c-Pen) | Me |
| G-1072 | Me | F | $CH_2CH_2CH_2CH_2S({=}O)$(c-Hex) | Me |
| G-1073 | Me | F | $CH_2CH_2CH_2CH_2CH_2S({=}O)$(c-Pr) | Me |
| G-1074 | Me | F | $CH_2CH_2CH_2CH_2CH_2S({=}O)$(c-Hex) | Me |
| G-1075 | Me | F | $CH_2CH_2CH_2S({=}O)$[c-Hex(4,4-$F_2$)] | Me |
| G-1076 | Me | F | $CH_2CH_2CH_2CH_2S({=}O)$[c-Hex(4,4-$F_2$)] | Me |
| G-1077 | Me | F | $CH_2CH_2CH_2CH_2CH_2S({=}O)$[c-Hex(4,4-$F_2$)] | Me |
| G-1078 | Me | F | $CH_2CH_2CH_2CH_2S({=}O)_2Me$ | Me |
| G-1079 | Me | F | $CH_2CH_2CH_2CH_2CH_2S({=}O)_2Me$ | Me |
| G-1080 | Me | F | $CH_2CH_2CH_2CH_2CH_2S({=}O)_2$(t-Bu) | Me |
| G-1081 | Me | F | $CH_2CH_2S({=}O)_2CHF_2$ | Me |
| G-1082 | Me | F | $CH_2CH_2CH_2S({=}O)_2CHF_2$ | Me |
| G-1083 | Me | F | $CH_2CH_2CH_2CH_2S({=}O)_2CHF_2$ | Me |
| G-1084 | Me | F | $CH_2CH_2CH_2CH_2CH_2S({=}O)_2CHF_2$ | Me |
| G-1085 | Me | F | $CH_2CH_2CH_2CH_2CH_2CH_2S({=}O)_2CHF_2$ | Me |
| G-1086 | Me | F | $CH_2CH_2S({=}O)_2CF_3$ | Me |
| G-1087 | Me | F | $CH_2CH_2CH_2S({=}O)_2CF_3$ | Me |
| G-1088 | Me | F | $CH_2CH_2CH_2CH_2S({=}O)_2CF_3$ | Me |
| G-1089 | Me | F | $CH_2CH_2CH_2CH_2CH_2S({=}O)_2CF_3$ | Me |
| G-1090 | Me | F | $CH_2CH_2CH_2CH_2CH_2CH_2S({=}O)_2CF_3$ | Me |
| G-1091 | Me | F | $CH_2CH_2CH_2CH_2CH_2CH_2CH_2S({=}O)_2CF_3$ | Me |
| G-1092 | Me | F | $CH_2CH_2CH_2CH_2CH_2CH_2CH_2CH_2S({=}O)_2CF_3$ | Me |
| G-1093 | Me | F | $CH_2CH_2S({=}O)_2CH_2CF_3$ | Me |
| G-1094 | Me | F | $CH_2CH_2CH_2S({=}O)_2CH_2CF_3$ | Me |

TABLE 1145

| Compound Number | $R^3$ | $R^4$ | $R^5$ | $R^{11}$ |
|---|---|---|---|---|
| G-1095 | Me | F | $CH_2CH_2CH_2CH_2S({=}O)_2CH_2CF_3$ | Me |
| G-1096 | Me | F | $CH_2CH_2CH_2CH_2CH_2S({=}O)_2CH_2CF_3$ | Me |
| G-1097 | Me | F | $CH_2CH_2CH_2CH_2CH_2CH_2CH_2S({=}O)_2CH_2CF_3$ | Me |
| G-1098 | Me | F | $CH_2CH_2CH_2S({=}O)_2$(c-Pr) | Me |
| G-1099 | Me | F | $CH_2CH_2CH_2CH_2S({=}O)_2$(c-Pr) | Me |
| G-1100 | Me | F | $CH_2CH_2CH_2CH_2CH_2S({=}O)_2$(c-Pr) | Me |
| G-1101 | Me | F | $CH_2CH_2CH_2S({=}O)_2$[c-Hex(4,4-$F_2$)] | Me |
| G-1102 | Me | F | $CH_2CH_2CH_2CH_2S({=}O)_2$[c-Hex(4,4-$F_2$)] | Me |
| G-1103 | Me | F | $CH_2CH_2CH_2CH_2CH_2S({=}O)_2$[c-Hex(4,4-$F_2$)] | Me |
| G-1104 | Me | F | $CH_2CH_2CH_2C({=}O)H$ | Me |
| G-1105 | Me | F | $CH_2CH_2CH_2CH_2C({=}O)H$ | Me |
| G-1106 | Me | F | $CH_2CH_2CH_2CH_2CH_2C({=}O)H$ | Me |
| G-1107 | Me | F | $CH_2CH_2CH_2C({=}O)$(t-Bu) | Me |
| G-1108 | Me | F | $CH_2CH_2CH_2CH_2C({=}O)$(t-Bu) | Me |
| G-1109 | Me | F | $CH_2CH_2CH_2CH_2CH_2C({=}O)$(t-Bu) | Me |
| G-1110 | Me | F | $CH_2CH_2CH_2C({=}O)CF_3$ | Me |
| G-1111 | Me | F | $CH_2CH_2CH_2CH_2C({=}O)CF_3$ | Me |
| G-1112 | Me | F | $CH_2CH_2CH_2CH_2CH_2C({=}O)CF_3$ | Me |
| G-1113 | Me | F | $CH_2C({=}O)Ph$ | Me |
| G-1114 | Me | F | $CH_2C({=}O)Ph$(4-Cl) | Me |
| G-1115 | Me | F | $CH_2C({=}O)Ph(4-CF_3)$ | Me |
| G-1116 | Me | F | $CH_2CH_2C({=}O)Ph(4-CF_3)$ | Me |
| G-1117 | Me | F | $CH_2CH_2CH_2C({=}O)Ph(4-CF_3)$ | Me |
| G-1118 | Me | F | $CH_2CH_2CH_2CH_2C({=}O)Ph(4-CF_3)$ | Me |

TABLE 1145-continued

| Compound Number | $R^3$ | $R^4$ | $R^5$ | $R^{11}$ |
|---|---|---|---|---|
| G-1119 | Me | F | $CH_2CH_2CH_2CH_2CH_2C({=}O)Ph(4\text{-}CF_3)$ | Me |
| G-1120 | Me | F | $CH_2C({=}O)OEt$ | Me |
| G-1121 | Me | F | $CH_2CH_2C({=}O)O(t\text{-}Bu)$ | Me |
| G-1122 | Me | F | $CH_2CH_2CH_2C({=}O)OEt$ | Me |
| G-1123 | Me | F | $CH_2CH_2CH_2C({=}O)O(t\text{-}Bu)$ | Me |
| G-1124 | Me | F | $CH_2CH_2CH_2CH_2C({=}O)O(t\text{-}Bu)$ | Me |
| G-1125 | Me | F | $CH_2CH_2CH_2CH_2CH_2C({=}O)O(t\text{-}Bu)$ | Me |
| G-1126 | Me | F | $CH_2CH_2CH_2CH_2CH_2CH_2C({=}O)O(t\text{-}Bu)$ | Me |
| G-1127 | Me | F | $CH_2CH_2CH_2CH_2CH_2CH_2CH_2C({=}O)OEt$ | Me |
| G-1128 | Me | F | $CH_2CH_2C({=}O)OCH_2CF_3$ | Me |
| G-1129 | Me | F | $CH_2CH_2CH_2C({=}O)OCH_2CF_3$ | Me |
| G-1130 | Me | F | $CH_2CH_2CH_2CH_2C({=}O)OCH_2CF_3$ | Me |
| G-1131 | Me | F | $CH_2CH_2CH_2CH_2CH_2C({=}O)OCH_2CF_3$ | Me |
| G-1132 | Me | F | $CH_2CH_2C({=}O)NH(t\text{-}Bu)$ | Me |
| G-1133 | Me | F | $CH_2CH_2CH_2C({=}O)NH(t\text{-}Bu)$ | Me |
| G-1134 | Me | F | $CH_2CH_2CH_2C({=}O)NH(t\text{-}Pen)$ | Me |
| G-1135 | Me | F | $CH_2CH_2CH_2CH_2C({=}O)NH(t\text{-}Bu)$ | Me |
| G-1136 | Me | F | $CH_2CH_2C({=}O)NHCH_2CF_3$ | Me |
| G-1137 | Me | F | $CH_2CH_2CH_2C({=}O)NHCH_2CF_3$ | Me |
| G-1138 | Me | F | $CH_2CH_2CH_2CH_2C({=}O)NHCH_2CF_3$ | Me |

TABLE 1146

| Compound Number | $R^3$ | $R^4$ | $R^5$ | $R^{11}$ |
|---|---|---|---|---|
| G-1139 | Me | F | $CH_2CH_2SC({=}O)N(Me)_2$ | Me |
| G-1140 | Me | F | $CH_2CH_2CH_2SC({=}O)N(Me)_2$ | Me |
| G-1141 | Me | F | $CH_2CH_2CH_2SC({=}O)NH(t\text{-}Bu)$ | Me |
| G-1142 | Me | F | $CH_2CH_2CH_2CH_2CH_2SC({=}O)NH(t\text{-}Bu)$ | Me |
| G-1143 | Me | F | $CH_2CH_2SC({=}O)NHCH_2CF_3$ | Me |
| G-1144 | Me | F | $CH_2CH_2CH_2SC({=}O)NHCH_2CF_3$ | Me |
| G-1145 | Me | F | $CH_2CH_2CH_2CH_2SC({=}O)NHCH_2CF_3$ | Me |
| G-1146 | Me | F | $CH_2CH_2CH_2OC({=}O)H$ | Me |
| G-1147 | Me | F | $CH_2CH_2CH_2CH_2OC({=}O)H$ | Me |
| G-1148 | Me | F | $CH_2CH_2CH_2CH_2CH_2OC({=}O)H$ | Me |
| G-1149 | Me | F | $CH_2CH_2CH_2OC({=}O)Me$ | Me |
| G-1150 | Me | F | $CH_2CH_2CH_2CH_2OC({=}O)Me$ | Me |
| G-1151 | Me | F | $CH_2CH_2CH_2CH_2CH_2OC({=}O)Me$ | Me |
| G-1152 | Me | F | $CH_2CH_2OC({=}O)CF_3$ | Me |
| G-1153 | Me | F | $CH_2CH_2CH_2OC({=}O)CF_3$ | Me |
| G-1154 | Me | F | $CH_2CH_2CH_2CH_2OC({=}O)CF_3$ | Me |
| G-1155 | Me | F | $CH_2CH_2CH_2CH_2CH_2OC({=}O)Ph(4\text{-}CF_3)$ | Me |
| G-1156 | Me | F | $CH_2CH_2OC({=}O)Ph$ | Me |
| G-1157 | Me | F | $CH_2CH_2OC({=}O)Ph(4\text{-}CF_3)$ | Me |
| G-1158 | Me | F | $CH_2CH_2CH_2OC({=}O)Ph(4\text{-}CF_3)$ | Me |
| G-1159 | Me | F | $CH_2CH_2CH_2CH_2OC({=}O)Ph(4\text{-}CF_3)$ | Me |
| G-1160 | Me | F | $CH_2CH_2CH_2CH_2CH_2OC({=}O)Ph(4\text{-}CF_3)$ | Me |
| G-1161 | Me | F | $CH_2CH_2OS({=}O)Me$ | Me |
| G-1162 | Me | F | $CH_2CH_2CH_2OS({=}O)Me$ | Me |
| G-1163 | Me | F | $CH_2CH_2CH_2CH_2OS({=}O)Me$ | Me |
| G-1164 | Me | F | $CH_2CH_2CH_2CH_2CH_2OS({=}O)Me$ | Me |
| G-1165 | Me | F | $CH_2CH_2CH_2CH_2CH_2CH_2OS({=}O)Me$ | Me |
| G-1166 | Me | F | $CH_2CH_2OS({=}O)CF_3$ | Me |
| G-1167 | Me | F | $CH_2CH_2CH_2OS({=}O)CF_3$ | Me |
| G-1168 | Me | F | $CH_2CH_2CH_2CH_2OS({=}O)CF_3$ | Me |
| G-1169 | Me | F | $CH_2CH_2CH_2CH_2CH_2OS({=}O)CF_3$ | Me |
| G-1170 | Me | F | $CH_2CH_2CH_2CH_2CH_2CH_2OS({=}O)CF_3$ | Me |
| G-1171 | Me | F | $CH_2CH_2OS({=}O)Ph$ | Me |
| G-1172 | Me | F | $CH_2CH_2OS({=}O)Ph(4\text{-}Me)$ | Me |
| G-1173 | Me | F | $CH_2CH_2CH_2OS({=}O)Ph$ | Me |
| G-1174 | Me | F | $CH_2CH_2CH_2OS({=}O)Ph(4\text{-}Me)$ | Me |
| G-1175 | Me | F | $CH_2CH_2OS({=}O)_2Me$ | Me |
| G-1176 | Me | F | $CH_2CH_2CH_2OS({=}O)_2Me$ | Me |
| G-1177 | Me | F | $CH_2CH_2CH_2OS({=}O)_2CF_3$ | Me |
| G-1178 | Me | F | $CH_2CH_2CH_2CH_2OS({=}O)_2CF_3$ | Me |
| G-1179 | Me | F | $CH_2CH_2CH_2CH_2CH_2OS({=}O)_2CF_3$ | Me |
| G-1180 | Me | F | $CH_2CH_2CH_2CH_2CH_2OS({=}O)_2CF_2CF_2CF_2CF_3$ | Me |
| G-1181 | Me | F | $CH_2CH_2OS({=}O)_2Ph$ | Me |
| G-1182 | Me | F | $CH_2CH_2OS({=}O)_2Ph(4\text{-}Me)$ | Me |

TABLE 1147

| Compound Number | $R^3$ | $R^4$ | $R^5$ | $R^{11}$ |
|---|---|---|---|---|
| G-1183 | Me | F | $CH_2CH_2CH_2OS({=}O)_2Ph$ | Me |
| G-1184 | Me | F | $CH_2CH_2CH_2OS({=}O)_2Ph(4\text{-}Me)$ | Me |
| G-1185 | Me | F | $CH_2CH_2NH_2$ | Me |
| G-1186 | Me | F | $CH_2CH_2NH_2$, HCl | Me |
| G-1187 | Me | F | $CH_2CH_2CH_2NH_2$ | Me |
| G-1188 | Me | F | $CH_2CH_2CH_2CH_2NH_2$ | Me |
| G-1189 | Me | F | $CH_2CH_2CH_2CH_2CH_2NH_2$ | Me |
| G-1190 | Me | F | $CH_2CH_2CH_2CH_2CH_2CH_2NH_2$ | Me |
| G-1191 | Me | F | $CH_2CH_2CH_2CH_2CH_2CH_2CH_2NH_2$ | Me |
| G-1192 | Me | F | $CH_2CH(Me)NH_2$ | Me |
| G-1193 | Me | F | $CH_2C^*H(Me)NH_2$, HCl | Me |
| G-1194 | Me | F | $CH_2C^*H(Me)NH_2$:(R) | Me |
| G-1195 | Me | F | $CH_2C^*H(Me)NH_2$, HCl:(R) | Me |
| G-1196 | Me | F | $CH_2C^*H(Me)NH_2$:(S) | Me |
| G-1197 | Me | F | $CH_2C^*H(Me)NH_2$, HCl:(S) | Me |
| G-1198 | Me | F | $CH_2CH(Et)NH_2$ | Me |
| G-1199 | Me | F | $CH_2CH(i\text{-}Pr)NH_2$ | Me |
| G-1200 | Me | F | $CH(Me)CH_2NH_2$ | Me |
| G-1201 | Me | F | $CH(Me)CH_2NH_2$, HCl | Me |
| G-1202 | Me | F | $CH(Et)CH_2NH_2$ | Me |
| G-1203 | Me | F | $CH(i\text{-}Pr)CH_2NH_2$ | Me |
| G-1204 | Me | F | $CH_2CH_2CH(Me)NH_2$ | Me |
| G-1205 | Me | F | $CH_2CH(Me)CH_2NH_2$ | Me |
| G-1206 | Me | F | $CH(Me)CH_2CH_2NH_2$ | Me |
| G-1207 | Me | F | $CH_2CH(Me)NH(c\text{-}Pr)$ | Me |
| G-1208 | Me | F | $CH_2CH(Me)N(c\text{-}Pr)S({=}O)_2CF_3$ | Me |
| G-1209 | Me | F | $CH_2CH(Me)NHOMe$ | Me |
| G-1210 | Me | F | $CH_2CH(Me)N(OMe)S({=}O)_2CF_3$ | Me |
| G-1211 | Me | F | $CH_2CH(Me)N(OMe)S({=}O)_2Ph(2\text{-}NH_3)$ | Me |
| G-1212 | Me | F | $CH_2CH(Me)N(OMe)S({=}O)_2Ph(4\text{-}NH_3)$ | Me |
| G-1213 | Me | F | $CH_2CH_2N(Me)(t\text{-}Bu)$ | Me |
| G-1214 | Me | F | $CH_2CH_2CH_2N(Me)(t\text{-}Bu)$ | Me |
| G-1215 | Me | F | $CH_2CH_2CH_2CH_2N(Me)(t\text{-}Bu)$ | Me |
| G-1216 | Me | F | $CH_2CH_2NHCH_2CF_3$ | Me |
| G-1217 | Me | F | $CH_2CH_2CH_2NHCH_2CF_3$ | Me |
| G-1218 | Me | F | $CH_2CH_2CH_2CH_2NHCH_2CF_3$ | Me |
| G-1219 | Me | F | $CH_2CH_2NHC({=}O)C(Me)(CF_3)_2$ | Me |
| G-1220 | Me | F | $CH_2CH_2NHC({=}O)Me$ | Me |
| G-1221 | Me | F | $CH_2CH_2NHC({=}O)(t\text{-}Bu)$ | Me |
| G-1222 | Me | F | $CH_2CH_2CH_2CH_2NHC({=}O)CH(CH_3)_2$ | Me |
| G-1223 | Me | F | $CH_2CH_2CH_2CH_2NHC({=}O)(t\text{-}Bu)$ | Me |
| G-1224 | Me | F | $CH_2CH_2CH_2CH_2NHC({=}O)CH_2(t\text{-}Bu)$ | Me |
| G-1225 | Me | F | $CH_2CH_2NHC({=}O)CF_3$ | Me |
| G-1226 | Me | F | $CH_2CH_2NHC({=}O)CH_2CF_3$ | Me |

TABLE 1148

| Compound Number | $R^3$ | $R^4$ | $R^5$ | $R^{11}$ |
|---|---|---|---|---|
| G-1227 | Me | F | $CH_2CH_2NHC({=}O)CF_2CF_3$ | Me |
| G-1228 | Me | F | $CH_2CH_2CH_2NHC({=}O)CF_3$ | Me |
| G-1229 | Me | F | $CH_2CH_2CH_2NHC({=}O)CH_2CF_3$ | Me |
| G-1230 | Me | F | $CH_2CH_2CH_2NHC({=}O)CF_2CF_3$ | Me |
| G-1231 | Me | F | $CH_2CH_2CH_2CH_2NHC({=}O)CF_3$ | Me |
| G-1232 | Me | F | $CH_2CH_2CH_2CH_2NHC({=}O)CH_2CF_3$ | Me |
| G-1233 | Me | F | $CH_2CH_2CH_2CH_2NHC({=}O)CF_2CF_3$ | Me |
| G-1234 | Me | F | $CH_2CH_2CH_2CH_2NHC({=}O)CF(CF_3)_2$ | Me |
| G-1235 | Me | F | $CH_2CH_2CH_2CH_2NHC({=}O)CCl_3$ | Me |
| G-1236 | Me | F | $CH_2CH_2NHC({=}O)Ph$ | Me |
| G-1237 | Me | F | $CH_2CH_2NHC({=}O)Ph(4\text{-}CF_3)$ | Me |
| G-1238 | Me | F | $CH_2CH_2CH_2NHC({=}O)Ph(4\text{-}CF_3)$ | Me |
| G-1239 | Me | F | $CH_2CH_2CH_2CH_2NHC({=}O)Ph(4\text{-}CF_3)$ | Me |
| G-1240 | Me | F | $CH_2CH_2NHC({=}O)O(t\text{-}Bu)$ | Me |
| G-1241 | Me | F | $CH_2CH_2CH_2NHC({=}O)O(t\text{-}Bu)$ | Me |
| G-1242 | Me | F | $CH_2CH_2CH_2CH_2NHC({=}O)O(t\text{-}Bu)$ | Me |
| G-1243 | Me | F | $CH_2CH_2CH_2CH_2NHC({=}O)OCH(CH_3)_2$ | Me |
| G-1244 | Me | F | $CH_2CH(Me)NHC({=}O)O(t\text{-}Bu)$ | Me |
| G-1245 | Me | F | $CH_2C^*H(Me)NHC({=}O)O(t\text{-}Bu)$:(R) | Me |
| G-1246 | Me | F | $CH_2C^*H(Me)NHC({=}O)O(t\text{-}Bu)$:(S) | Me |
| G-1247 | Me | F | $CH_2CH(Et)NHC({=}O)O(t\text{-}Bu)$ | Me |
| G-1248 | Me | F | $CH_2CH(i\text{-}Pr)NHC({=}O)O(t\text{-}Bu)$ | Me |
| G-1249 | Me | F | $CH(Me)CH_2NHC({=}O)O(t\text{-}Bu)$ | Me |
| G-1250 | Me | F | $CH(Et)CH_2NHC({=}O)O(t\text{-}Bu)$ | Me |

TABLE 1148-continued

| Compound Number | $R^3$ | $R^4$ | $R^5$ | $R^{11}$ |
|---|---|---|---|---|
| G-1251 | Me | F | CH(i-Pr)$CH_2$NHC(=O)O(t-Bu) | Me |
| G-1252 | Me | F | $CH_2$CH(Me)$CH_2$NHC(=O)O(t-Bu) | Me |
| G-1253 | Me | F | $CH_2CH_2$NHC(=O)OC(Me)$_2CF_3$ | Me |
| G-1254 | Me | F | $CH_2CH_2CH_2$NHC(=O)O$CH_2CF_3$ | Me |
| G-1255 | Me | F | $CH_2CH_2CH_2$NHC(=O)O$CH_2CH_2CF_3$ | Me |
| G-1256 | Me | F | $CH_2CH_2CH_2CH_2$NHC(=O)O$CH_2CCl_3$ | Me |
| G-1257 | Me | F | $CH_2CH_2CH_2CH_2$NHC(=O)O$CH_2CF_3$ | Me |
| G-1258 | Me | F | $CH_2CH_2$NHC(=O)NH(t-Bu) | Me |
| G-1259 | Me | F | $CH_2CH_2CH_2$NHC(=O)NH(t-Bu) | Me |
| G-1260 | Me | F | $CH_2CH_2CH_2CH_2$NHC(=O)NHEt | Me |
| G-1261 | Me | F | $CH_2CH_2CH_2CH_2$NHC(=O)NH(t-Bu) | Me |
| G-1262 | Me | F | $CH_2CH_2CH_2$NHC(=O)NH$CH_2CCl_3$ | Me |
| G-1263 | Me | F | $CH_2CH_2CH_2$NHC(=O)NH$CH_2CH_2$F | Me |
| G-1264 | Me | F | $CH_2CH_2CH_2$NHC(=O)NH$CH_2CF_3$ | Me |
| G-1265 | Me | F | $CH_2CH_2CH_2CH_2$NHC(=O)NH$CH_2CCl_3$ | Me |
| G-1266 | Me | F | $CH_2CH_2CH_2CH_2$NHC(=O)NH$CH_2CH_2$F | Me |
| G-1267 | Me | F | $CH_2CH_2CH_2CH_2$NHC(=O)NH$CH_2CF_3$ | Me |
| G-1268 | Me | F | $CH_2CH_2$NHS(=O)Me | Me |
| G-1269 | Me | F | $CH_2CH_2CH_2$NHS(=O)Me | Me |
| G-1270 | Me | F | $CH_2CH_2CH_2CH_2$NHS(=O)Me | Me |

TABLE 1149

| Compound Number | $R^3$ | $R^4$ | $R^5$ | $R^{11}$ |
|---|---|---|---|---|
| G-1271 | Me | F | $CH_2CH_2CH_2CH_2$NHS(=O)CH$(CH_3)_2$ | Me |
| G-1272 | Me | F | $CH_2CH_2CH_2CH_2CH_2$NHS(=O)Me | Me |
| G-1273 | Me | F | $CH_2CH_2$NHS(=O)$CHF_2$ | Me |
| G-1274 | Me | F | $CH_2CH_2CH_2$NHS(=O)$CHF_2$ | Me |
| G-1275 | Me | F | $CH_2CH_2CH_2CH_2$NHS(=O)$CHF_2$ | Me |
| G-1276 | Me | F | $CH_2CH_2CH_2CH_2CH_2$NHS(=O)$CHF_2$ | Me |
| G-1277 | Me | F | $CH_2$CH(Me)NHS(=O)$CHF_2$ | Me |
| G-1278 | Me | F | CH(Me)$CH_2$NHS(=O)$CHF_2$ | Me |
| G-1279 | Me | F | $CH_2CH_2$CH(Me)NHS(=O)$CHF_2$ | Me |
| G-1280 | Me | F | $CH_2$CH(Me)$CH_2$NHS(=O)$CHF_2$ | Me |
| G-1281 | Me | F | CH(Me)$CH_2CH_2$NHS(=O)$CHF_2$ | Me |
| G-1282 | Me | F | $CH_2CH_2$NHS(=O)$CF_3$ | Me |
| G-1283 | Me | F | $CH_2CH_2CH_2$NHS(=O)$CF_3$ | Me |
| G-1284 | Me | F | $CH_2CH_2CH_2CH_2$NHS(=O)$CF_3$ | Me |
| G-1285 | Me | F | $CH_2CH_2CH_2CH_2CH_2$NHS(=O)$CF_3$ | Me |
| G-1286 | Me | F | $CH_2CH_2CH_2$NHS(=O)Ph | Me |
| G-1287 | Me | F | $CH_2CH_2CH_2CH_2$NHS(=O)Ph | Me |
| G-1288 | Me | F | $CH_2CH_2CH_2CH_2CH_2$NHS(=O)Ph | Me |
| G-1289 | Me | F | $CH_2CH_2CH_2CH_2CH_2$NHS(=O)Ph(4-$CF_3$) | Me |
| G-1290 | Me | F | $CH_2$CH(Me)NHS(=O)Ph(4-$CF_3$) | Me |
| G-1291 | Me | F | $CH_2$CH(Et)NHS(=O)Ph(4-$CF_3$) | Me |
| G-1292 | Me | F | CH(Me)$CH_2$NHS(=O)Ph(4-$CF_3$) | Me |
| G-1293 | Me | F | CH(Et)$CH_2$NHS(=O)Ph(4-$CF_3$) | Me |
| G-1294 | Me | F | $CH_2$CH(Et)$CH_2$NHS(=O)Ph(4-$CF_3$) | Me |
| G-1295 | Me | F | $CH_2CH_2$NHS(=O)$_2$Me | Me |
| G-1296 | Me | F | $CH_2CH_2CH_2$NHS(=O)$_2$Me | Me |
| G-1297 | Me | F | $CH_2CH_2CH_2CH_2$NHS(=O)$_2$Me | Me |
| G-1298 | Me | F | $CH_2CH_2CH_2CH_2$NHS(=O)$_2$CH$(CH_3)_2$ | Me |
| G-1299 | Me | F | $CH_2CH_2CH_2CH_2CH_2$NHS(=O)$_2$Me | Me |
| G-1300 | Me | F | $CH_2CH_2$NHS(=O)$_2CHF_2$ | Me |
| G-1301 | Me | F | $CH_2CH_2CH_2$NHS(=O)$_2CHF_2$ | Me |
| G-1302 | Me | F | $CH_2CH_2CH_2CH_2$NHS(=O)$_2CHF_2$ | Me |
| G-1303 | Me | F | $CH_2CH_2CH_2CH_2CH_2$NHS(=O)$_2CHF_2$ | Me |
| G-1304 | Me | F | $CH_2$CH(Me)NHS(=O)$_2CHF_2$ | Me |
| G-1305 | Me | F | CH(Me)$CH_2$NHS(=O)$_2CHF_2$ | Me |
| G-1306 | Me | F | $CH_2CH_2$CH(Me)NHS(=O)$_2CHF_2$ | Me |
| G-1307 | Me | F | $CH_2$CH(Me)$CH_2$NHS(=O)$_2CHF_2$ | Me |
| G-1308 | Me | F | CH(Me)$CH_2CH_2$NHS(=O)$_2CHF_2$ | Me |
| G-1309 | Me | F | $CH_2$CH(Me)N(Me)S(=O)$_2CHF_2$ | Me |
| G-1310 | Me | F | CH(Me)$CH_2$N(Me)S(=O)$_2CHF_2$ | Me |
| G-1311 | Me | F | $CH_2CH_2$CH(Me)N(Me)S(=O)$_2CHF_2$ | Me |
| G-1312 | Me | F | $CH_2$CH(Me)$CH_2$N(Me)S(=O)$_2CHF_2$ | Me |
| G-1313 | Me | F | CH(Me)$CH_2CH_2$N(Me)S(=O)$_2CHF_2$ | Me |
| G-1314 | Me | F | $CH_2CH_2$NHS(=O)$_2CF_3$ | Me |

TABLE 1150

| Compound Number | $R^3$ | $R^4$ | $R^5$ | $R^{11}$ |
|---|---|---|---|---|
| G-1315 | Me | F | $CH_2CH_2CH_2$NHS(=O)$_2CF_3$ | Me |
| G-1316 | Me | F | $CH_2CH_2CH_2CH_2$NHS(=O)$_2CF_3$ | Me |
| G-1317 | Me | F | $CH_2CH_2CH_2CH_2CH_2$NHS(=O)$_2CF_3$ | Me |
| G-1318 | Me | F | $CH_2CH_2$N(Me)S(=O)$_2CF_3$ | Me |
| G-1319 | Me | F | $CH_2CH_2$N(Et)S(=O)$_2CF_3$ | Me |
| G-1320 | Me | F | $CH_2CH_2$N($CH_2$CN)S(=O)$_2CF_3$ | Me |
| G-1321 | Me | F | $CH_2CH_2$N($CH_2$OMe)S(=O)$_2CF_3$ | Me |
| G-1322 | Me | F | $CH_2CH_2CH_2$N(Me)S(=O)$_2CF_3$ | Me |
| G-1323 | Me | F | $CH_2CH_2CH_2$N(Et)S(=O)$_2CF_3$ | Me |
| G-1324 | Me | F | $CH_2CH_2CH_2$N($CH_2$CN)S(=O)$_2CF_3$ | Me |
| G-1325 | Me | F | $CH_2CH_2CH_2$N($CH_2$OMe)S(=O)$_2CF_3$ | Me |
| G-1326 | Me | F | $CH_2CH_2CH_2CH_2$N(Me)S(=O)$_2CF_3$ | Me |
| G-1327 | Me | F | $CH_2CH_2CH_2CH_2$N(Et)S(=O)$_2CF_3$ | Me |
| G-1328 | Me | F | $CH_2CH_2CH_2CH_2$N($CH_2$CN)S(=O)$_2CF_3$ | Me |
| G-1329 | Me | F | $CH_2CH_2CH_2CH_2$N($CH_2$OMe)S(=O)$_2CF_3$ | Me |
| G-1330 | Me | F | $CH_2$CH(Me)NHS(=O)$_2CF_3$ | Me |
| G-1331 | Me | F | $CH_2$CH(Me)NHS(=O)$_2CF_3$:(R) | Me |
| G-1332 | Me | F | $CH_2$CH(Me)NHS(=O)$_2CF_3$:(S) | Me |
| G-1333 | Me | F | CH(Me)$CH_2$NHS(=O)$_2CF_3$ | Me |
| G-1334 | Me | F | $CH_2CH_2$CH(Me)NHS(=O)$_2CF_3$ | Me |
| G-1335 | Me | F | $CH_2$CH(Me)$CH_2$NHS(=O)$_2CF_3$ | Me |
| G-1336 | Me | F | CH(Me)$CH_2CH_2$NHS(=O)$_2CF_3$ | Me |
| G-1337 | Me | F | $CH_2$CH(Me)N(Me)S(=O)$_2CF_3$ | Me |
| G-1338 | Me | F | CH(Me)$CH_2$N(Me)S(=O)$_2CF_3$ | Me |
| G-1339 | Me | F | $CH_2CH_2$CH(Me)N(Me)S(=O)$_2CF_3$ | Me |
| G-1340 | Me | F | $CH_2$CH(Me)$CH_2$N(Me)S(=O)$_2CF_3$ | Me |
| G-1341 | Me | F | CH(Me)$CH_2CH_2$N(Me)S(=O)$_2CF_3$ | Me |
| G-1342 | Me | F | $CH_2CH_2CH_2$NHS(=O)$_2$Ph | Me |
| G-1343 | Me | F | $CH_2CH_2CH_2CH_2$NHS(=O)$_2$Ph | Me |
| G-1344 | Me | F | $CH_2CH_2CH_2CH_2CH_2$NHS(=O)$_2$Ph | Me |
| G-1345 | Me | F | $CH_2CH_2CH_2CH_2CH_2$NHS(=O)$_2$Ph(4-$CF_3$) | Me |
| G-1346 | Me | F | $CH_2$CH(Me)NHS(=O)$_2$Ph(4-$CF_3$) | Me |
| G-1347 | Me | F | $CH_2$CH(Et)NHS(=O)$_2$Ph(4-$CF_3$) | Me |
| G-1348 | Me | F | CH(Me)$CH_2$NHS(=O)$_2$Ph(4-$CF_3$) | Me |
| G-1349 | Me | F | CH(Et)$CH_2$NHS(=O)$_2$Ph(4-$CF_3$) | Me |
| G-1350 | Me | F | $CH_2$CH(Me)$CH_2$NHS(=O)$_2$Ph(4-$CF_3$) | Me |
| G-1351 | Me | F | $CH_2CH_2SiMe_3$ | Me |
| G-1352 | Me | F | $CH_2CH_2CH_2SiMe_3$ | Me |
| G-1353 | Me | F | $CH_2CH_2CH_2CH_2SiMe_3$ | Me |
| G-1354 | Me | F | $CH_2$Ph | Me |
| G-1355 | Me | F | $CH_2$Ph(2-$CF_3$) | Me |
| G-1356 | Me | F | $CH_2$Ph(3-$CF_3$) | Me |
| G-1357 | Me | F | $CH_2$Ph(4-$CF_3$) | Me |
| G-1358 | Me | F | $CH_2$Ph(2-O$CF_3$) | Me |

TABLE 1151

| Compound Number | $R^3$ | $R^4$ | $R^5$ | $R^{11}$ |
|---|---|---|---|---|
| G-1359 | Me | F | $CH_2$Ph(3-O$CF_3$) | Me |
| G-1360 | Me | F | $CH_2$Ph(4-O$CF_3$) | Me |
| G-1361 | Me | F | $CH_2$Ph(2-S$CF_3$) | Me |
| G-1362 | Me | F | $CH_2$Ph(3-S$CF_3$) | Me |
| G-1363 | Me | F | $CH_2$Ph(4-S$CF_3$) | Me |
| G-1364 | Me | F | $CH_2$Ph(3-$CH_2$S$CF_3$) | Me |
| G-1365 | Me | F | $CH_2$Ph(4-F) | Me |
| G-1366 | Me | F | $CH_2$Ph(4-Cl) | Me |
| G-1367 | Me | F | $CH_2$Ph(4-Br) | Me |
| G-1368 | Me | F | $CH_2$Ph(4-Me) | Me |
| G-1369 | Me | F | $CH_2$Ph[4-(t-Bu)] | Me |
| G-1370 | Me | F | $CH_2$Ph(4-CN) | Me |
| G-1371 | Me | F | $CH_2$Ph(4-$NH_3$) | Me |
| G-1372 | Me | F | $CH_2$Ph(4-O$CHF_2$) | Me |
| G-1373 | Me | F | $CH_2$Ph(4-S$CHF_2$) | Me |
| G-1374 | Me | F | $CH_2$Ph(4-$CH_2$S$CF_3$) | Me |
| G-1375 | Me | F | $CH_2$Ph[4-CF$(CF_3)_2$] | Me |
| G-1376 | Me | F | $CH_2$Ph(4-$CH_2$S$CF_3$) | Me |
| G-1377 | Me | F | $CH_2$Ph[4-Ph(4-$CF_3$)] | Me |
| G-1378 | Me | F | $CH_2$Ph(2,4-$Cl_2$) | Me |
| G-1379 | Me | F | $CH_2$Ph[2,5-$(CF_3)_2$] | Me |
| G-1380 | Me | F | $CH_2$Ph(3,4-$Cl_2$) | Me |
| G-1381 | Me | F | $CH_2$Ph(3-$CF_3$-4-F) | Me |

TABLE 1151-continued

| Compound Number | $R^3$ | $R^4$ | $R^5$ | $R^{11}$ |
|---|---|---|---|---|
| G-1382 | Me | F | $CH_2Ph(3-CF_3-4-Cl)$ | Me |
| G-1383 | Me | F | $CH_2Ph(3-F-4-CF_3)$ | Me |
| G-1384 | Me | F | $CH_2Ph(2,4,6-F_3)$ | Me |
| G-1385 | Me | F | $CH_2Ph(3,4,5-F_3)$ | Me |
| G-1386 | Me | F | $CH_2Ph(2,3,4-F_3)$ | Me |
| G-1387 | Me | F | $CH_2Ph(3,4,5-Cl_3)$ | Me |
| G-1388 | Me | F | $CH_2CH_2Ph$ | Me |
| G-1389 | Me | F | $CH_2CH_2Ph(4-F)$ | Me |
| G-1390 | Me | F | $CH_2CH_2Ph(4-Cl)$ | Me |
| G-1391 | Me | F | $CH_2CH_2Ph(4-Br)$ | Me |
| G-1392 | Me | F | $CH_2CH_2Ph[4-(t-Bu)]$ | Me |
| G-1393 | Me | F | $CH_2CH_2Ph(2-CF_3)$ | Me |
| G-1394 | Me | F | $CH_2CH_2Ph(3-CF_3)$ | Me |
| G-1395 | Me | F | $CH_2CH_2Ph(4-CF_3)$ | Me |
| G-1396 | Me | F | $CH_2CH_2Ph[4-CF(CF_3)_2]$ | Me |
| G-1397 | Me | F | $CH_2CH_2Ph[4-(c-Pr)]$ | Me |
| G-1398 | Me | F | $CH_2CH_2Ph\{4-[c-Pr(2,2-F_2)]\}$ | Me |
| G-1399 | Me | F | $CH_2CH_2Ph(4-OMe)$ | Me |
| G-1400 | Me | F | $CH_2CH_2Ph(3-OCF_3)$ | Me |
| G-1401 | Me | F | $CH_2CH_2Ph(4-OCHF_2)$ | Me |
| G-1402 | Me | F | $CH_2CH_2Ph(4-OCF_3)$ | Me |

TABLE 1152

| Compound Number | $R^3$ | $R^4$ | $R^5$ | $R^{11}$ |
|---|---|---|---|---|
| G-1403 | Me | F | $CH_2CH_2Ph(4-SMe)$ | Me |
| G-1404 | Me | F | $CH_2CH_2Ph(4-SCHF_2)$ | Me |
| G-1405 | Me | F | $CH_2CH_2Ph(4-SCF_3)$ | Me |
| G-1406 | Me | F | $CH_2CH_2Ph[4-S(=O)Me]$ | Me |
| G-1407 | Me | F | $CH_2CH_2Ph[4-S(=O)CF_3]$ | Me |
| G-1408 | Me | F | $CH_2CH_2Ph[4-S(=O)_2Me]$ | Me |
| G-1409 | Me | F | $CH_2CH_2Ph[4-S(=O)_2CF_3]$ | Me |
| G-1410 | Me | F | $CH_2CH_2Ph(4-CH_2SMe)$ | Me |
| G-1411 | Me | F | $CH_2CH_2Ph(4-CH_2SCF_3)$ | Me |
| G-1412 | Me | F | $CH_2CH_2Ph[4-OS(=O)_2Me]$ | Me |
| G-1413 | Me | F | $CH_2CH_2Ph[4-OS(=O)_2CF_3]$ | Me |
| G-1414 | Me | F | $CH_2CH_2Ph[4-Ph(4-CF_3)]$ | Me |
| G-1415 | Me | F | $CH_2CH_2Ph(4-CH_2Ph)$ | Me |
| G-1416 | Me | F | $CH_2CH_2Ph(4-OCH_2Ph)$ | Me |
| G-1417 | Me | F | $CH_2CH_2Ph(4-CN)$ | Me |
| G-1418 | Me | F | $CH_2CH_2Ph(4-NH_3)$ | Me |
| G-1419 | Me | F | $CH_2CH_2Ph(2,4-Cl_2)$ | Me |
| G-1420 | Me | F | $CH_2CH_2Ph(3,4-Cl_2)$ | Me |
| G-1421 | Me | F | $CH_2CH_2Ph(3-CF_3-4-F)$ | Me |
| G-1422 | Me | F | $CH_2CH_2Ph(2-CF_3-4-F)$ | Me |
| G-1423 | Me | F | $CH_2CH_2Ph(3-F-4-CF_3)$ | Me |
| G-1424 | Me | F | $CH_2CH_2Ph(2-F-4-CF_3)$ | Me |
| G-1425 | Me | F | $CH_2CH_2Ph(3-Cl-4-OCHF_2)$ | Me |
| G-1426 | Me | F | $CH_2CH_2Ph(3,4,5-Cl_3)$ | Me |
| G-1427 | Me | F | $CH_2CH_2Ph(2,3,4-F_3)$ | Me |
| G-1428 | Me | F | $CH_2CH_2Ph(2,4,5-F_3)$ | Me |
| G-1429 | Me | F | $CH_2CH_2Ph(3,4,5-F_3)$ | Me |
| G-1430 | Me | F | $CH_2CH_2Ph(2,4,6-F_3)$ | Me |
| G-1431 | Me | F | $CH_2CH_2CH_2Ph$ | Me |
| G-1432 | Me | F | $CH_2CH_2CH_2Ph(3-CF_3)$ | Me |
| G-1433 | Me | F | $CH_2CH_2CH_2Ph(4-CF_3)$ | Me |
| G-1434 | Me | F | $CH_2CH_2CH_2Ph(4-F)$ | Me |
| G-1435 | Me | F | $CH_2CH_2CH_2Ph[4-(t-Bu)]$ | Me |
| G-1436 | Me | F | $CH_2CH_2CH_2Ph(4-CN)$ | Me |
| G-1437 | Me | F | $CH_2CH_2CH_2Ph(4-CF_3)$ | Me |
| G-1438 | Me | F | $CH_2CH_2CH_2Ph(4-OCHF_2)$ | Me |
| G-1439 | Me | F | $CH_2CH_2CH_2Ph(4-OCF_3)$ | Me |
| G-1440 | Me | F | $CH_2CH_2CH_2Ph(4-SCHF_2)$ | Me |
| G-1441 | Me | F | $CH_2CH_2CH_2Ph(4-SCF_3)$ | Me |
| G-1442 | Me | F | $CH_2CH_2CH_2Ph[4-CF(CF_3)_2]$ | Me |
| G-1443 | Me | F | $CH_2CH_2CH_2Ph(3,4,5-F_3)$ | Me |
| G-1444 | Me | F | $CH_2CH_2CH_2Ph(2,4,6-F_3)$ | Me |
| G-1445 | Me | F | $CH_2CH_2CH_2CH_2Ph$ | Me |
| G-1446 | Me | F | $CH_2CH_2CH_2CH_2Ph(4-F)$ | Me |

TABLE 1153

| Compound Number | $R^3$ | $R^4$ | $R^5$ | $R^{11}$ |
|---|---|---|---|---|
| G-1447 | Me | F | $CH_2CH_2CH_2CH_2Ph(4-CF_3)$ | Me |
| G-1448 | Me | F | $CH_2CH_2CH_2CH_2Ph(4-OCF_3)$ | Me |
| G-1449 | Me | F | $CH_2CH_2CH_2CH_2Ph(4-SCF_3)$ | Me |
| G-1450 | Me | F | $CH_2CH_2CH_2CH_2CH_2Ph$ | Me |
| G-1451 | Me | F | $CH_2CH_2CH_2CH_2CH_2CH_2Ph$ | Me |
| G-1452 | Me | F | $CH_2CF_2Ph(4-F)$ | Me |
| G-1453 | Me | F | $CH_2CF_2Ph(4-CF_3)$ | Me |
| G-1454 | Me | F | $CH_2CF_2Ph(3,4,5-F_3)$ | Me |
| G-1455 | Me | F | $CH_2CH_2OPh$ | Me |
| G-1456 | Me | F | $CH_2CH_2OPh(4-F)$ | Me |
| G-1457 | Me | F | $CH_2CH_2OPh(4-CF_3)$ | Me |
| G-1458 | Me | F | $CH_2CH_2CH_2OPh$ | Me |
| G-1459 | Me | F | $CH_2CH_2CH_2OPh(4-Cl)$ | Me |
| G-1460 | Me | F | $CH_2CH_2CH_2OPh(4-CF_3)$ | Me |
| G-1461 | Me | F | $CH_2CH_2CH_2CH_2OPh(4-CF_3)$ | Me |
| G-1462 | Me | F | $CH_2CH_2CH_2CH_2OPh(4-OCF_3)$ | Me |
| G-1463 | Me | F | $CH_2CH_2CH_2CH_2CH_2OPh(4-CF_3)$ | Me |
| G-1464 | Me | F | $CH_2CH_2OCH_2Ph$ | Me |
| G-1465 | Me | F | $CH_2CH_2CH_2OCH_2Ph$ | Me |
| G-1466 | Me | F | $CH_2CH_2CH_2CH_2OCH_2Ph$ | Me |
| G-1467 | Me | F | $CH_2CH_2CH_2CH_2CH_2OCH_2Ph$ | Me |
| G-1468 | Me | F | $CH_2CH_2SPh$ | Me |
| G-1469 | Me | F | $CH_2CH_2CH_2SPh$ | Me |
| G-1470 | Me | F | $CH_2CH_2CH_2SPh(4-F)$ | Me |
| G-1471 | Me | F | $CH_2CH_2CH_2SPh(4-Cl)$ | Me |
| G-1472 | Me | F | $CH_2CH_2CH_2SPh(4-Br)$ | Me |
| G-1473 | Me | F | $CH_2CH_2CH_2SPh[4-(t-Bu)]$ | Me |
| G-1474 | Me | F | $CH_2CH_2CH_2SPh(3-CF_3)$ | Me |
| G-1475 | Me | F | $CH_2CH_2CH_2SPh(4-CF_3)$ | Me |
| G-1476 | Me | F | $CH_2CH_2CH_2SPh(3-SCF_3)$ | Me |
| G-1477 | Me | F | $CH_2CH_2CH_2SPh(4-SCF_3)$ | Me |
| G-1478 | Me | F | $CH_2CH_2CH_2CH_2SPh$ | Me |
| G-1479 | Me | F | $CH_2CH_2CH_2CH_2SPh(4-F)$ | Me |
| G-1480 | Me | F | $CH_2CH_2CH_2CH_2SPh(4-Cl)$ | Me |
| G-1481 | Me | F | $CH_2CH_2CH_2CH_2SPh[4-(t-Bu)]$ | Me |
| G-1482 | Me | F | $CH_2CH_2CH_2CH_2SPh(4-CF_3)$ | Me |
| G-1483 | Me | F | $CH_2CH_2CH_2CH_2CH_2SPh$ | Me |
| G-1484 | Me | F | $CH_2CH_2CH_2CH_2CH_2SPh(4-F)$ | Me |
| G-1485 | Me | F | $CH_2CH_2CH_2CH_2CH_2SPh(4-Cl)$ | Me |
| G-1486 | Me | F | $CH_2CH_2CH_2CH_2CH_2SPh(4-CF_3)$ | Me |
| G-1487 | Me | F | $CH_2CH_2S(=O)Ph$ | Me |
| G-1488 | Me | F | $CH_2CH_2CH_2S(=O)Ph$ | Me |
| G-1489 | Me | F | $CH_2CH_2CH_2S(=O)Ph(4-F)$ | Me |
| G-1490 | Me | F | $CH_2CH_2CH_2S(=O)Ph[4-(t-Bu)]$ | Me |

TABLE 1154

| Compound Number | $R^3$ | $R^4$ | $R^5$ | $R^{11}$ |
|---|---|---|---|---|
| G-1491 | Me | F | $CH_2CH_2CH_2S(=O)Ph(4-CF_3)$ | Me |
| G-1492 | Me | F | $CH_2CH_2S(=O)_2Ph$ | Me |
| G-1493 | Me | F | $CH_2CH_2S(=O)_2Ph(4-CF_3)$ | Me |
| G-1494 | Me | F | $CH_2CH_2CH_2S(=O)_2Ph(4-F)$ | Me |
| G-1495 | Me | F | $CH_2CH_2CH_2S(=O)_2Ph(4-Cl)$ | Me |
| G-1496 | Me | F | $CH_2CH_2CH_2S(=O)_2Ph(4-CF_3)$ | Me |
| G-1497 | Me | F | $CH_2CH_2CH_2CH_2S(=O)_2Ph$ | Me |
| G-1498 | Me | F | $CH_2CH_2CH_2CH_2S(=O)_2Ph(4-Cl)$ | Me |
| G-1499 | Me | F | $CH_2CH_2CH_2CH_2S(=O)_2Ph(4-CF_3)$ | Me |
| G-1500 | Me | F | $CH_2CH_2SCH_2Ph$ | Me |
| G-1501 | Me | F | $CH_2CH_2CH_2SCH_2Ph$ | Me |
| G-1502 | Me | F | $CH_2CH_2CH_2SCH_2Ph(2-Cl)$ | Me |
| G-1503 | Me | F | $CH_2CH_2CH_2SCH_2Ph(3-Cl)$ | Me |
| G-1504 | Me | F | $CH_2CH_2CH_2SCH_2Ph(4-Cl)$ | Me |
| G-1505 | Me | F | $CH_2CH_2CH_2SCH_2Ph(2-SCF_3)$ | Me |
| G-1506 | Me | F | $CH_2CH_2CH_2SCH_2Ph(3-CF_3)$ | Me |
| G-1507 | Me | F | $CH_2CH_2CH_2SCH_2Ph(4-CF_3)$ | Me |
| G-1508 | Me | F | $CH_2CH_2CH_2SCH_2Ph(4-NH_3)$ | Me |
| G-1509 | Me | F | $CH_2CH_2CH_2CH_2SCH_2Ph$ | Me |
| G-1510 | Me | F | $CH_2CH_2CH_2CH_2SCH_2Ph(4-Cl)$ | Me |
| G-1511 | Me | F | $CH_2CH_2CH_2CH_2SCH_2Ph(4-CF_3)$ | Me |
| G-1512 | Me | F | $CH_2CH_2CH_2CH_2SCH_2Ph(4-CN)$ | Me |
| G-1513 | Me | F | $CH_2CH_2CH_2CH_2CH_2SCH_2Ph$ | Me |
| G-1514 | Me | F | $CH_2CH_2SCH_2CH_2Ph$ | Me |

TABLE 1154-continued

| Compound Number | $R^3$ | $R^4$ | $R^5$ | $R^{11}$ |
|---|---|---|---|---|
| G-1515 | Me | F | $CH_2CH_2CH_2SCH_2CH_2Ph$ | Me |
| G-1516 | Me | F | $CH_2CH_2CH_2CH_2SCH_2CH_2Ph$ | Me |
| G-1517 | Me | F | $CH_2CH_2SCH(Me)Ph$ | Me |
| G-1518 | Me | F | $CH_2CH_2CH_2SCH(Me)Ph$ | Me |
| G-1519 | Me | F | $CH_2CH_2CH_2CH_2SCH(Me)Ph$ | Me |
| G-1520 | Me | F | $CH_2CH_2S({=}O)CH_2Ph$ | Me |
| G-1521 | Me | F | $CH_2CH_2S({=}O)CH_2Ph(4\text{-}CF_3)$ | Me |
| G-1522 | Me | F | $CH_2CH_2CH_2S({=}O)CH_2Ph$ | Me |
| G-1523 | Me | F | $CH_2CH_2CH_2S({=}O)CH_2Ph(2\text{-}SCF_3)$ | Me |
| G-1524 | Me | F | $CH_2CH_2CH_2S({=}O)CH_2Ph(4\text{-}SCF_3)$ | Me |
| G-1525 | Me | F | $CH_2CH_2CH_2S({=}O)CH_2Ph(4\text{-}Cl)$ | Me |
| G-1526 | Me | F | $CH_2CH_2CH_2S({=}O)CH_2Ph(4\text{-}CF_3)$ | Me |
| G-1527 | Me | F | $CH_2CH_2CH_2CH_2S({=}O)CH_2Ph$ | Me |
| G-1528 | Me | F | $CH_2CH_2CH_2CH_2S({=}O)CH_2Ph(4\text{-}CF_3)$ | Me |
| G-1529 | Me | F | $CH_2CH_2CH_2CH_2CH_2S({=}O)CH_2Ph(4\text{-}CF_3)$ | Me |
| G-1530 | Me | F | $CH_2CH_2S({=}O)_2CH_2Ph$ | Me |
| G-1531 | Me | F | $CH_2CH_2S({=}O)_2CH_2Ph(4\text{-}CF_3)$ | Me |
| G-1532 | Me | F | $CH_2CH_2CH_2S({=}O)_2CH_2Ph$ | Me |
| G-1533 | Me | F | $CH_2CH_2CH_2S({=}O)_2CH_2Ph(4\text{-}Cl)$ | Me |
| G-1534 | Me | F | $CH_2CH_2CH_2S({=}O)_2CH_2Ph(4\text{-}CF_3)$ | Me |

TABLE 1155

| Compound Number | $R^3$ | $R^4$ | $R^5$ | $R^{11}$ |
|---|---|---|---|---|
| G-1535 | Me | F | $CH_2CH_2CH_2CH_2S({=}O)_2CH_2Ph$ | Me |
| G-1536 | Me | F | $CH_2CH_2CH_2CH_2S({=}O)_2CH_2Ph(4\text{-}CF_3)$ | Me |
| G-1537 | Me | F | $CH_2CH_2CH_2CH_2CH_2S({=}O)_2CH_2Ph$ | Me |
| G-1538 | Me | F | $CH_2CH_2CH_2CH_2CH_2S({=}O)_2CH_2Ph(4\text{-}CF_3)$ | Me |
| G-1539 | Me | F | $CH_2CH_2ON{=}CH(t\text{-}Bu)$ | Me |
| G-1540 | Me | F | $CH_2CH_2CH_2ON{=}CH(t\text{-}Bu)$ | Me |
| G-1541 | Me | F | $CH_2CH_2CH_2CH_2ON{=}C(Me)(c\text{-}Pr)$ | Me |
| G-1542 | Me | F | $CH_2CH_2ON{=}C(Me)CF_3$ | Me |
| G-1543 | Me | F | $CH_2CH_2CH_2ON{=}CHCF_3$ | Me |
| G-1544 | Me | F | $CH_2CH_2CH_2ON{=}C(Me)CF_3$ | Me |
| G-1545 | Me | F | $CH_2CH_2CH_2ON{=}C(Me)CCl_3$ | Me |
| G-1546 | Me | F | $CH_2CH_2CH_2CH_2ON{=}CHCF_3$ | Me |
| G-1547 | Me | F | $CH_2CH_2CH_2CH_2ON{=}C(Me)CF_3$ | Me |
| G-1548 | Me | F | $CH_2CH_2CH_2CH_2CH_2ON{=}C(Me)CF_3$ | Me |
| G-1549 | Me | F | $CH_2CH_2ON{=}CHPh$ | Me |
| G-1550 | Me | F | $CH_2CH_2ON{=}CHPh(4\text{-}CF_3)$ | Me |
| G-1551 | Me | F | $CH_2CH_2ON{=}CHPh(4\text{-}SCF_3)$ | Me |
| G-1552 | Me | F | $CH_2CH_2CH_2ON{=}CHPh(3\text{-}CF_3)$ | Me |
| G-1553 | Me | F | $CH_2CH_2CH_2ON{=}CHPh(4\text{-}CF_3)$ | Me |
| G-1554 | Me | F | $CH_2CH_2CH_2ON{=}CHPh(4\text{-}SCF_3)$ | Me |
| G-1555 | Me | F | $CH_2CH_2CH_2ON{=}C(Me)Ph(4\text{-}CF_3)$ | Me |
| G-1556 | Me | F | $CH_2CH_2CH_2CH_2ON{=}CHPh(4\text{-}SCF_3)$ | Me |
| G-1557 | Me | F | $CH_2CH_2$(adamant-1-yl) | Me |
| G-1558 | Me | F | $CH_2CH_2CH_2$(3-$CF_3$-pyrazol-1-yl) | Me |
| G-1559 | Me | F | $CH_2CH_2CH_2CH_2$(3-$CF_3$-pyrazol-1-yl) | Me |
| G-1560 | Me | F | $CH_2CH_2CH_2CH_2CH_2$(3-$CF_3$-pyrazol-1-yl) | Me |
| G-1561 | Me | F | $CH_2$(1-Me-4-$CF_3$-imidazol-5-yl) | Me |
| G-1562 | Me | F | $CH_2CH_2$(1-Me-4-$CF_3$-imidazol-5-yl) | Me |
| G-1563 | Me | F | $CH_2CH_2CH_2$(1-Me-4-$CF_3$-imidazol-5-yl) | Me |
| G-1564 | Me | F | $CH_2CH_2CH_2$(3-$CF_3$-1,2,4-triazol-1-yl) | Me |
| G-1565 | Me | F | $CH_2CH_2CH_2CH_2$(3-$CF_3$-1,2,4-triazol-1-yl) | Me |
| G-1566 | Me | F | $CH_2CH_2CH_2CH_2CH_2$(3-$CF_3$-1,2,4-triazol-1-yl) | Me |
| G-1567 | Me | F | $CH_2CH_2CH_2$(4-$CF_3$-thiazol-2-yl) | Me |
| G-1568 | Me | F | $CH_2CH_2CH_2CH_2$(4-$CF_3$-thiazol-2-yl) | Me |
| G-1569 | Me | F | $CH_2CH_2CH_2CH_2CH_2$(4-$CF_3$-thiazol-2-yl) | Me |
| G-1570 | Me | F | $CH_2CH_2CH_2$(2-$CF_3$-pyridin-5-yl) | Me |
| G-1571 | Me | F | $CH_2CH_2CH_2CH_2$(2-$CF_3$-pyridin-5-yl) | Me |
| G-1572 | Me | F | $CH_2CH_2CH_2CH_2CH_2$(2-$CF_3$-pyridin-5-yl) | Me |
| G-1573 | Me | F | $CH_2$(4-$CF_3$-pyrimidin-2-yl) | Me |
| G-1574 | Me | F | $CH_2CH_2$(4-$CF_3$-pyrimidin-2-yl) | Me |
| G-1575 | Me | F | $CH_2CH_2CH_2$(4-$CF_3$-pyrimidin-2-yl) | Me |
| G-1576 | Me | F | $CH_2CH_2O$(3-Cl-5-$CF_3$-pyridin-2-yl) | Me |
| G-1577 | Me | F | $CH_2CH_2CH_2O$(3-Cl-5-$CF_3$-pyridin-2-yl) | Me |
| G-1578 | Me | F | $CH_2CH_2CH_2CH_2O$(3-Cl-5-$CF_3$-pyridin-2-yl) | Me |

TABLE 1156

| Compound Number | $R^3$ | $R^4$ | $R^5$ | $R^{11}$ |
|---|---|---|---|---|
| G-1579 | Me | F | $CH_2CH_2CH_2CH_2CH_2O$(3-Cl-5-$CF_3$-pyridin-2-yl) | Me |
| G-1580 | Me | F | $CH_2CH_2N$(Phth) | Me |
| G-1581 | Me | F | $CH_2CH_2CH_2N$(Phth) | Me |
| G-1582 | Me | F | $CH_2CH_2CH_2CH_2N$(Phth) | Me |
| G-1583 | Me | F | $CH_2CH_2CH_2CH_2CH_2N$(Phth) | Me |
| G-1584 | Me | F | $CH_2CH(Me)CH_2N$(Phth) | Me |
| G-1585 | Me | F | $CH_2$[1,3-dioxolan(2-$CF_3$)-2-yl] | Me |
| G-1586 | Me | F | $CH_2$(azetidin-3-yl) | Me |
| G-1587 | Me | F | $CH_2$(pyrrolidin-3-yl) | Me |
| G-1588 | Me | F | $CH_2$(piperidin-3-yl) | Me |
| G-1589 | Me | F | $CH_2${azetidin[1-C(=O)O(t-Bu)]-3-yl} | Me |
| G-1590 | Me | F | $CH_2${pyrrolidin[1-C(=O)O(t-Bu)]-3-yl} | Me |
| G-1591 | Me | F | $CH_2${piperidin[1-C(=O)O(t-Bu)]-3-yl} | Me |
| G-1592 | Me | F | $CH_2${azetidin[1-C(=O)$CF_3$]-3-yl} | Me |
| G-1593 | Me | F | $CH_2${azetidin[1-S(=O)$_2CF_3$]-3-yl} | Me |
| G-1594 | Me | F | $CH_2${pyrrolidin[1-C(=O)$CF_3$]-3-yl} | Me |
| G-1595 | Me | F | $CH_2${pyrrolidin[1-S(=O)$_2CF_3$]-3-yl} | Me |
| G-1596 | Me | F | $CH_2${piperidin[1-C(=O)$CF_3$]-3-yl} | Me |
| G-1597 | Me | F | $CH_2${piperidin[1-S(=O)$_2CF_3$]-3-yl} | Me |
| G-1598 | Me | F | $CH_2CH_2CH_2CN$ | Me |
| G-1599 | Me | F | $CH_2CH_2CH_2CH_2CN$ | Me |
| G-1600 | Me | F | $CH_2CH_2CH_2CH_2CH_2CN$ | Me |
| G-1601 | Me | F | $CH_2CH_2CH_2CH_2CH_2CH_2CN$ | Me |
| G-1602 | Me | F | $CH_2CH_2CH_2C({=}O)OH$ | Me |
| G-1603 | Me | F | $CH_2CH_2CH_2CH_2C({=}O)OH$ | Me |
| G-1604 | Me | F | $CH_2CH_2CH_2CH_2CH_2C({=}O)OH$ | Me |
| G-1605 | Me | F | $CH_2CH_2SCN$ | Me |
| G-1606 | Me | F | $CH_2CH_2CH_2SCN$ | Me |
| G-1607 | Me | F | $CH_2CH_2CH_2CH_2SCN$ | Me |
| G-1608 | Me | F | $CH_2CH_2CH_2CH_2CH_2SCN$ | Me |
| G-1609 | Me | F | $CH_2CH_2CH_2CH_2CH_2CH_2SCN$ | Me |
| G-1610 | Me | F | $CH_2CH_2CH_2CH_2CH_2CH_2CH_2SCN$ | Me |
| G-1611 | Me | F | $CH_2CH_2CH_2CH_2CH_2CH_2CH_2CH_2SCN$ | Me |
| G-1612 | Me | F | $CH_2CH_2CH(Me)SCN$ | Me |
| G-1613 | Me | F | $CH_2CH(Me)CH_2SCN$ | Me |
| G-1614 | Me | F | $CH(Me)CH_2CH_2SCN$ | Me |
| G-1615 | Me | F | $CH_2CH_2CH_2CH(Me)SCN$ | Me |
| G-1616 | Me | F | $CH_2CH_2CH(Me)CH_2SCN$ | Me |
| G-1617 | Me | F | $CH_2CH(Me)CH_2CH_2SCN$ | Me |
| G-1618 | Me | F | $CH(Me)CH_2CH_2CH_2SCN$ | Me |
| G-1619 | Me | F | $CH_2CH_2CH_2CH_2CH(Me)SCN$ | Me |
| G-1620 | Me | F | $CH_2CH_2CH_2CH(Me)CH_2SCN$ | Me |
| G-1621 | Me | F | $CH_2CH_2CH(Me)CH_2CH_2SCN$ | Me |
| G-1622 | Me | F | $CH_2CH(Me)CH_2CH_2CH_2SCN$ | Me |

TABLE 1157

| Compound Number | $R^3$ | $R^4$ | $R^5$ | $R^{11}$ |
|---|---|---|---|---|
| G-1623 | Me | F | $CH(Me)CH_2CH_2CH_2CH_2SCN$ | Me |
| G-1624 | Me | F | $CH_2CH_2ONH_2$ | Me |
| G-1625 | Me | F | $CH_2CH_2CH_2ONH_2$ | Me |
| G-1626 | Me | F | $CH_2CH_2CH_2CH_2ONH_2$ | Me |
| G-1627 | Me | F | $CH_2CH_2CH_2CH_2CH_2ONH_2$ | Me |
| G-1628 | Me | F | $CH_2CH_2CH_2CH_2CH_2CH_2ONH_2$ | Me |
| G-1629 | Cl | H | $CH_2C({=}O)Me$ | Me |
| G-1630 | Cl | H | $CH_2CH(OH)Me$ | Me |
| G-1631 | Cl | H | $CH_2CH(OH)CF_3$ | Me |
| G-1632 | Cl | H | $CH_2C(OH)_2CF_3$ | Me |
| G-1633 | Cl | H | $CH_2C(CF_3){=}NOH$ | Me |
| G-1634 | Cl | H | $CH_2C(CF_3){=}NOMe$ | Me |
| G-1635 | Cl | H | $CH_2CH(CF_3)NH_2$ | Me |
| G-1636 | Cl | H | $CH_2CH(CF_3)NHSH_3CF_3$ | Me |
| G-1637 | Cl | H | $CH_2$[C-Pr(1-$NH_2$)] | Me |
| G-1638 | Cl | H | $CH_2$[c-Pr(1-NHC(=O)O(t-Bu)] | Me |
| G-1639 | Cl | H | $CH_2${C-Pr[1-NHS(=O)$_2CF_3$]} | Me |
| G-1640 | Cl | H | $CH_2CH_2NH_2$ | Me |
| G-1641 | Cl | H | $CH_2CH_2NH_2$, HCl | Me |
| G-1642 | Cl | H | $CH_2CH_2CH_2NH_2$ | Me |
| G-1643 | Cl | H | $CH_2CH_2CH_2CH_2NH_2$ | Me |
| G-1644 | Cl | H | $CH_2CH_2CH_2CH_2CH_2NH_2$ | Me |
| G-1645 | Cl | H | $CH_2CH_2CH_2CH_2CH_2CH_2NH_2$ | Me |

TABLE 1157-continued

| Compound Number | $R^3$ | $R^4$ | $R^5$ | $R^{11}$ |
|---|---|---|---|---|
| G-1646 | Cl | H | $CH_2CH_2CH_2CH_2CH_2CH_2CH_2CH_2NH_2$ | Me |
| G-1647 | Cl | H | $CH_2CH(Me)NH_2$ | Me |
| G-1648 | Cl | H | $CH_2C{*}H(Me)NH_2$, HCl | Me |
| G-1649 | Cl | H | $CH_2C{*}H(Me)NH_2$:(R) | Me |
| G-1650 | Cl | H | $CH_2C{*}H(Me)NH_2$, HCl:(R) | Me |
| G-1651 | Cl | H | $CH_2C{*}H(Me)NH_2$:(S) | Me |
| G-1652 | Cl | H | $CH_2C{*}H(Me)NH_2$, HCl:(S) | Me |
| G-1653 | Cl | H | $CH_2CH(Et)NH_2$ | Me |
| G-1654 | Cl | H | $CH_2CH(i\text{-}Pr)NH_2$ | Me |
| G-1655 | Cl | H | $CH(Me)CH_2NH_2$ | Me |
| G-1656 | Cl | H | $CH(Me)CH_2NH_2$, HCl | Me |
| G-1657 | Cl | H | $CH(Et)CH_2NH_2$ | Me |
| G-1658 | Cl | H | $CH(i\text{-}Pr)CH_2NH_2$ | Me |
| G-1659 | Cl | H | $CH_2CH_2CH(Me)NH_2$ | Me |
| G-1660 | Cl | H | $CH_2CH(Me)CH_2NH_2$ | Me |
| G-1661 | Cl | H | $CH(Me)CH_2CH_2NH_2$ | Me |
| G-1662 | Cl | H | $CH_2CH(Me)NH(c\text{-}Pr)$ | Me |
| G-1663 | Cl | H | $CH_2CH(Me)N(c\text{-}Pr)S(=O)_2CF_3$ | Me |
| G-1664 | Cl | H | $CH_2CH(Me)NHOMe$ | Me |
| G-1665 | Cl | H | $CH_2CH(Me)N(OMe)S(=O)_2CF_3$ | Me |
| G-1666 | Cl | H | $CH_2CH(Me)N(OMe)S(=O)_2Ph(2\text{-}NH_3)$ | Me |

TABLE 1158

| Compound Number | $R^3$ | $R^4$ | $R^5$ | $R^{11}$ |
|---|---|---|---|---|
| G-1667 | Cl | H | $CH_2CH(Me)N(OMe)S(=O)_2Ph(4\text{-}NH_3)$ | Me |
| G-1668 | Cl | H | $CH_2CH_2NHC(=O)O(t\text{-}Bu)$ | Me |
| G-1669 | Cl | H | $CH_2CH_2CH_2NHC(=O)O(t\text{-}Bu)$ | Me |
| G-1670 | Cl | H | $CH_2CH_2CH_2CH_2NHC(=O)O(t\text{-}Bu)$ | Me |
| G-1671 | Cl | H | $CH_2CH_2CH_2CH_2NHC(=O)OCH(CH_3)_2$ | Me |
| G-1672 | Cl | H | $CH_2CH(Me)NHC(=O)O(t\text{-}Bu)$ | Me |
| G-1673 | Cl | H | $CH_2C{*}H(Me)NHC(=O)O(t\text{-}Bu)$:(R) | Me |
| G-1674 | Cl | H | $CH_2C{*}H(Me)NHC(=O)O(t\text{-}Bu)$:(S) | Me |
| G-1675 | Cl | H | $CH_2CH(Et)NHC(=O)O(t\text{-}Bu)$ | Me |
| G-1676 | Cl | H | $CH_2CH(i\text{-}Pr)NHC(=O)O(t\text{-}Bu)$ | Me |
| G-1677 | Cl | H | $CH(Me)CH_2NHC(=O)O(t\text{-}Bu)$ | Me |
| G-1678 | Cl | H | $CH(Et)CH_2NHC(=O)O(t\text{-}Bu)$ | Me |
| G-1679 | Cl | H | $CH(i\text{-}Pr)CH_2NHC(=O)O(t\text{-}Bu)$ | Me |
| G-1680 | Cl | H | $CH_2CH(Me)CH_2NHC(=O)O(t\text{-}Bu)$ | Me |
| G-1681 | Cl | H | $CH_2CH_2SCHF_2$ | Me |
| G-1682 | Cl | H | $CH_2CH_2CH_2SCHF_2$ | Me |
| G-1683 | Cl | H | $CH_2CH_2CH_2CH_2SCHF_2$ | Me |
| G-1684 | Cl | H | $CH_2CH_2CH_2CH_2CH_2SCHF_2$ | Me |
| G-1685 | Cl | H | $CH_2CH_2CH_2CH_2CH_2CH_2SCHF_2$ | Me |
| G-1686 | Cl | H | $CH_2CH_2CH_2CH_2CH_2CH_2CH_2SCHF_2$ | Me |
| G-1687 | Cl | H | $CH_2CH_2SCF_3$ | Me |
| G-1688 | Cl | H | $CH_2CH_2CH_2SCF_3$ | Me |
| G-1689 | Cl | H | $CH_2CH_2CH_2CH_2SCF_3$ | Me |
| G-1690 | Cl | H | $CH_2CH_2CH_2CH_2CH_2SCF_3$ | Me |
| G-1691 | Cl | H | $CH_2CH_2CH_2CH_2CH_2CH_2SCF_3$ | Me |
| G-1692 | Cl | H | $CH_2CH_2CH_2CH_2CH_2CH_2CH_2SCF_3$ | Me |
| G-1693 | Cl | H | $CH_2CH_2CH_2CH_2CH_2CH_2CH_2CH_2SCF_3$ | Me |
| G-1694 | Cl | H | $CH_2CH(Me)SCF_3$ | Me |
| G-1695 | Cl | H | $CH(Me)CH_2SCF_3$ | Me |
| G-1696 | Cl | H | $CH_2CH_2CH(Me)SCF_3$ | Me |
| G-1697 | Cl | H | $CH_2CH(Me)CH_2SCF_3$ | Me |
| G-1698 | Cl | H | $CH(Me)CH_2CH_2SCF_3$ | Me |
| G-1699 | Cl | H | $CH_2CH_2CH_2CH(Me)SCF_3$ | Me |
| G-1700 | Cl | H | $CH_2CH_2CH(Me)CH_2SCF_3$ | Me |
| G-1701 | Cl | H | $CH_2CH(Me)CH_2CH_2SCF_3$ | Me |
| G-1702 | Cl | H | $CH(Me)CH_2CH_2CH_2SCF_3$ | Me |
| G-1703 | Cl | H | $CH_2CH_2NHS(=O)_2CF_3$ | Me |
| G-1704 | Cl | H | $CH_2CH_2CH_2NHS(=O)_2CF_3$ | Me |
| G-1705 | Cl | H | $CH_2CH_2CH_2CH_2NHS(=O)_2CF_3$ | Me |
| G-1706 | Cl | H | $CH_2CH_2CH_2CH_2CH_2NHS(=O)_2CF_3$ | Me |
| G-1707 | Cl | H | $CH_2CH_2N(Me)S(=O)_2CF_3$ | Me |
| G-1708 | Cl | H | $CH_2CH_2N(Et)S(=O)_2CF_3$ | Me |
| G-1709 | Cl | H | $CH_2CH_2N(CH_2CN)S(=O)_2CF_3$ | Me |
| G-1710 | Cl | H | $CH_2CH_2N(CH_2OMe)S(=O)_2CF_3$ | Me |

TABLE 1159

| Compound Number | $R^3$ | $R^4$ | $R^5$ | $R^{11}$ |
|---|---|---|---|---|
| G-1711 | Cl | H | $CH_2CH_2CH_2N(Me)S(=O)_2CF_3$ | Me |
| G-1712 | Cl | H | $CH_2CH_2CH_2N(Et)S(=O)_2CF_3$ | Me |
| G-1713 | Cl | H | $CH_2CH_2CH_2N(CH_2CN)S(=O)_2CF_3$ | Me |
| G-1714 | Cl | H | $CH_2CH_2CH_2N(CH_2OMe)S(=O)_2CF_3$ | Me |
| G-1715 | Cl | H | $CH_2CH_2CH_2CH_2N(Me)S(=O)_2CF_3$ | Me |
| G-1716 | Cl | H | $CH_2CH_2CH_2CH_2N(Et)S(=O)_2CF_3$ | Me |
| G-1717 | Cl | H | $CH_2CH_2CH_2CH_2N(CH_2CN)S(=O)_2CF_3$ | Me |
| G-1718 | Cl | H | $CH_2CH_2CH_2CH_2N(CH_2OMe)S(=O)_2CF_3$ | Me |
| G-1719 | Cl | H | $CH_2CH(Me)NHS(=O)_2CF_3$ | Me |
| G-1720 | Cl | H | $CH_2CH(Me)NHS(=O)_2CF_3$:(R) | Me |
| G-1721 | Cl | H | $CH_2CH(Me)NHS(=O)_2CF_3$:(S) | Me |
| G-1722 | Cl | H | $CH(Me)CH_2NHS(=O)_2CF_3$ | Me |
| G-1723 | Cl | H | $CH_2CH_2CH(Me)NHS(=O)_2CF_3$ | Me |
| G-1724 | Cl | H | $CH_2CH(Me)CH_2NHS(=O)_2CF_3$ | Me |
| G-1725 | Cl | H | $CH(Me)CH_2CH_2NHS(=O)_2CF_3$ | Me |
| G-1726 | Cl | H | $CH_2CH(Me)N(Me)S(=O)_2CF_3$ | Me |
| G-1727 | Cl | H | $CH(Me)CH_2N(Me)S(=O)_2CF_3$ | Me |
| G-1728 | Cl | H | $CH_2CH_2CH(Me)N(Me)S(=O)_2CF_3$ | Me |
| G-1729 | Cl | H | $CH_2CH(Me)CH_2N(Me)S(=O)_2CF_3$ | Me |
| G-1730 | Cl | H | $CH(Me)CH_2CH_2N(Me)S(=O)_2CF_3$ | Me |
| G-1731 | Cl | H | $CH_2Ph$ | Me |
| G-1732 | Cl | H | $CH_2Ph(2\text{-}CF_3)$ | Me |
| G-1733 | Cl | H | $CH_2Ph(3\text{-}CF_3)$ | Me |
| G-1734 | Cl | H | $CH_2Ph(4\text{-}CF_3)$ | Me |
| G-1735 | Cl | H | $CH_2Ph(2\text{-}OCF_3)$ | Me |
| G-1736 | Cl | H | $CH_2Ph(3\text{-}OCF_3)$ | Me |
| G-1737 | Cl | H | $CH_2Ph(4\text{-}OCF_3)$ | Me |
| G-1738 | Cl | H | $CH_2Ph(2\text{-}SCF_3)$ | Me |
| G-1739 | Cl | H | $CH_2Ph(3\text{-}SCF_3)$ | Me |
| G-1740 | Cl | H | $CH_2Ph(4\text{-}SCF_3)$ | Me |
| G-1741 | Cl | H | $CH_2Ph(3\text{-}CH_2SCF_3)$ | Me |
| G-1742 | Cl | H | $CH_2Ph(4\text{-}F)$ | Me |
| G-1743 | Cl | H | $CH_2Ph(4\text{-}Cl)$ | Me |
| G-1744 | Cl | H | $CH_2Ph(4\text{-}Br)$ | Me |
| G-1745 | Cl | H | $CH_2Ph(4\text{-}Me)$ | Me |
| G-1746 | Cl | H | $CH_2Ph[4\text{-}(t\text{-}Bu)]$ | Me |
| G-1747 | Cl | H | $CH_2Ph(4\text{-}CN)$ | Me |
| G-1748 | Cl | H | $CH_2Ph(4\text{-}NO_2)$ | Me |
| G-1749 | Cl | H | $CH_2Ph(4\text{-}OCHF_2)$ | Me |
| G-1750 | Cl | H | $CH_2Ph(4\text{-}SCHF_2)$ | Me |
| G-1751 | Cl | H | $CH_2Ph(4\text{-}CH_2SCF_3)$ | Me |
| G-1752 | Cl | H | $CH_2Ph[4\text{-}CF(CF_3)_2]$ | Me |
| G-1753 | Cl | H | $CH_2Ph(4\text{-}CH_2SCF_3)$ | Me |
| G-1754 | Cl | H | $CH_2Ph[4\text{-}Ph(4\text{-}CF_3)]$ | Me |

TABLE 1160

| Compound Number | $R^3$ | $R^4$ | $R^5$ | $R^{11}$ |
|---|---|---|---|---|
| G-1755 | Cl | H | $CH_2Ph(2,4\text{-}Cl_2)$ | Me |
| G-1756 | Cl | H | $CH_2Ph[2,5\text{-}(CF_3)_2]$ | Me |
| G-1757 | Cl | H | $CH_2Ph(3,4\text{-}Cl_2)$ | Me |
| G-1758 | Cl | H | $CH_2Ph(3\text{-}CF_3\text{-}4\text{-}F)$ | Me |
| G-1759 | Cl | H | $CH_2Ph(3\text{-}CF_3\text{-}4\text{-}Cl)$ | Me |
| G-1760 | Cl | H | $CH_2Ph(3\text{-}F\text{-}4\text{-}CF_3)$ | Me |
| G-1761 | Cl | H | $CH_2Ph(2,4,6\text{-}F_3)$ | Me |
| G-1762 | Cl | H | $CH_2Ph(3,4,5\text{-}F_3)$ | Me |
| G-1763 | Cl | H | $CH_2Ph(2,3,4\text{-}F_3)$ | Me |
| G-1764 | Cl | H | $CH_2Ph(3,4,5\text{-}Cl_3)$ | Me |
| G-1765 | Cl | H | $CH_2CH_2Ph$ | Me |
| G-1766 | Cl | H | $CH_2CH_2Ph(4\text{-}F)$ | Me |
| G-1767 | Cl | H | $CH_2CH_2Ph(4\text{-}Cl)$ | Me |
| G-1768 | Cl | H | $CH_2CH_2Ph(4\text{-}Br)$ | Me |
| G-1769 | Cl | H | $CH_2CH_2Ph[4\text{-}(t\text{-}Bu)]$ | Me |
| G-1770 | Cl | H | $CH_2CH_2Ph(2\text{-}CF_3)$ | Me |
| G-1771 | Cl | H | $CH_2CH_2Ph(3\text{-}CF_3)$ | Me |
| G-1772 | Cl | H | $CH_2CH_2Ph(4\text{-}CF_3)$ | Me |
| G-1773 | Cl | H | $CH_2CH_2Ph[4\text{-}CF(CF_3)_2]$ | Me |
| G-1774 | Cl | H | $CH_2CH_2Ph[4\text{-}(c\text{-}Pr)]$ | Me |
| G-1775 | Cl | H | $CH_2CH_2Ph\{4\text{-}[c\text{-}Pr(2,2\text{-}F_2)]\}$ | Me |
| G-1776 | Cl | H | $CH_2CH_2Ph(4\text{-}OMe)$ | Me |
| G-1777 | Cl | H | $CH_2CH_2Ph(3\text{-}OCF_3)$ | Me |
| G-1778 | Cl | H | $CH_2CH_2Ph(4\text{-}OCHF_2)$ | Me |

TABLE 1160-continued

| Compound Number | $R^3$ | $R^4$ | $R^5$ | $R^{11}$ |
|---|---|---|---|---|
| G-1779 | Cl | H | $CH_2CH_2Ph(4\text{-}OCF_3)$ | Me |
| G-1780 | Cl | H | $CH_2CH_2Ph(4\text{-}SMe)$ | Me |
| G-1781 | Cl | H | $CH_2CH_2Ph(4\text{-}SCHF_2)$ | Me |
| G-1782 | Cl | H | $CH_2CH_2Ph(4\text{-}SCF_3)$ | Me |
| G-1783 | Cl | H | $CH_2CH_2Ph[4\text{-}S({=}O)Me]$ | Me |
| G-1784 | Cl | H | $CH_2CH_2Ph[4\text{-}S({=}O)CF_3]$ | Me |
| G-1785 | Cl | H | $CH_2CH_2Ph[4\text{-}S({=}O)_2Me]$ | Me |
| G-1786 | Cl | H | $CH_2CH_2Ph[4\text{-}S({=}O)_2CF_3]$ | Me |
| G-1787 | Cl | H | $CH_2CH_2Ph(4\text{-}CH_2SMe)$ | Me |
| G-1788 | Cl | H | $CH_2CH_2Ph(4\text{-}CH_2SCF_3)$ | Me |
| G-1789 | Cl | H | $CH_2CH_2Ph[4\text{-}OS({=}O)_2Me]$ | Me |
| G-1790 | Cl | H | $CH_2CH_2Ph[4\text{-}OS({=}O)_2CF_3]$ | Me |
| G-1791 | Cl | H | $CH_2CH_2Ph[4\text{-}Ph(4\text{-}CF_3)]$ | Me |
| G-1792 | Cl | H | $CH_2CH_2Ph(4\text{-}CH_2Ph)$ | Me |
| G-1793 | Cl | H | $CH_2CH_2Ph(4\text{-}OCH_2Ph)$ | Me |
| G-1794 | Cl | H | $CH_2CH_2Ph(4\text{-}CN)$ | Me |
| G-1795 | Cl | H | $CH_2CH_2Ph(4\text{-}NO_2)$ | Me |
| G-1796 | Cl | H | $CH_2CH_2Ph(2,4\text{-}Cl_2)$ | Me |
| G-1797 | Cl | H | $CH_2CH_2Ph(3,4\text{-}Cl_2)$ | Me |
| G-1798 | Cl | H | $CH_2CH_2Ph(3\text{-}CF_3\text{-}4\text{-}F)$ | Me |

TABLE 1161

| Compound Number | $R^3$ | $R^4$ | $R^5$ | $R^{11}$ |
|---|---|---|---|---|
| G-1799 | Cl | H | $CH_2CH_2Ph(2\text{-}CF_3\text{-}4\text{-}F)$ | Me |
| G-1800 | Cl | H | $CH_2CH_2Ph(3\text{-}F\text{-}4\text{-}CF_3)$ | Me |
| G-1801 | Cl | H | $CH_2CH_2Ph(2\text{-}F\text{-}4\text{-}CF_3)$ | Me |
| G-1802 | Cl | H | $CH_2CH_2Ph(3\text{-}Cl\text{-}4\text{-}OCHF_2)$ | Me |
| G-1803 | Cl | H | $CH_2CH_2Ph(3,4,5\text{-}Cl_3)$ | Me |
| G-1804 | Cl | H | $CH_2CH_2Ph(2,3,4\text{-}F_3)$ | Me |
| G-1805 | Cl | H | $CH_2CH_2Ph(2,4,5\text{-}F_3)$ | Me |
| G-1806 | Cl | H | $CH_2CH_2Ph(3,4,5\text{-}F_3)$ | Me |
| G-1807 | Cl | H | $CH_2CH_2Ph(2,4,6\text{-}F_3)$ | Me |
| G-1808 | Cl | H | $CH_2CH_2CH_2Ph$ | Me |
| G-1809 | Cl | H | $CH_2CH_2CH_2Ph(3\text{-}CF_3)$ | Me |
| G-1810 | Cl | H | $CH_2CH_2CH_2Ph(4\text{-}CF_3)$ | Me |
| G-1811 | Cl | H | $CH_2CH_2CH_2Ph(4\text{-}F)$ | Me |
| G-1812 | Cl | H | $CH_2CH_2CH_2Ph[4\text{-}(t\text{-}Bu)]$ | Me |
| G-1813 | Cl | H | $CH_2CH_2CH_2Ph(4\text{-}CN)$ | Me |
| G-1814 | Cl | H | $CH_2CH_2CH_2Ph(4\text{-}CF_3)$ | Me |
| G-1815 | Cl | H | $CH_2CH_2CH_2Ph(4\text{-}OCHF_2)$ | Me |
| G-1816 | Cl | H | $CH_2CH_2CH_2Ph(4\text{-}OCF_3)$ | Me |
| G-1817 | Cl | H | $CH_2CH_2CH_2Ph(4\text{-}SCHF_2)$ | Me |
| G-1818 | Cl | H | $CH_2CH_2CH_2Ph(4\text{-}SCF_3)$ | Me |
| G-1819 | Cl | H | $CH_2CH_2CH_2Ph[4\text{-}CF(CF_3)_2]$ | Me |
| G-1820 | Cl | H | $CH_2CH_2CH_2Ph(3,4,5\text{-}F_3)$ | Me |
| G-1821 | Cl | H | $CH_2CH_2CH_2Ph(2,4,6\text{-}F_3)$ | Me |
| G-1822 | Cl | H | $CH_2CH_2CH_2CH_2Ph$ | Me |
| G-1823 | Cl | H | $CH_2CH_2CH_2CH_2Ph(4\text{-}F)$ | Me |
| G-1824 | Cl | H | $CH_2CH_2CH_2CH_2Ph(4\text{-}CF_3)$ | Me |
| G-1825 | Cl | H | $CH_2CH_2CH_2CH_2Ph(4\text{-}OCF_3)$ | Me |
| G-1826 | Cl | H | $CH_2CH_2CH_2CH_2Ph(4\text{-}SCF_3)$ | Me |
| G-1827 | Cl | H | $CH_2CH_2CH_2CH_2CH_2Ph$ | Me |
| G-1828 | Cl | H | $CH_2CH_2CH_2CH_2CH_2CH_2Ph$ | Me |
| G-1829 | Cl | H | $CH_2CF_2Ph(4\text{-}F)$ | Me |
| G-1830 | Cl | H | $CH_2CF_2Ph(4\text{-}CF_3)$ | Me |
| G-1831 | Cl | H | $CH_2CF_2Ph(3,4,5\text{-}F_3)$ | Me |
| G-1832 | Me | H | $CH_2C({=}O)Me$ | Me |
| G-1833 | Me | H | $CH_2CH(OH)Me$ | Me |
| G-1834 | Me | H | $CH_2CH(OH)CF_3$ | Me |
| G-1835 | Me | H | $CH_2C(OH)_2CF_3$ | Me |
| G-1836 | Me | H | $CH_2C(CF_3){=}NOH$ | Me |
| G-1837 | Me | H | $CH_2C(CF_3){=}NOMe$ | Me |
| G-1838 | Me | H | $CH_2CH(CF_3)NH_2$ | Me |
| G-1839 | Me | H | $CH_2CH(CF_3)NHSO_2CF_3$ | Me |
| G-1840 | Me | H | $CH_2[c\text{-}Pr(1\text{-}NH_2)]$ | Me |
| G-1841 | Me | H | $CH_2[c\text{-}Pr(1\text{-}NHC({=}O)O(t\text{-}Bu)]$ | Me |
| G-1842 | Me | H | $CH_2\{c\text{-}Pr[1\text{-}NHS({=}O)_2CF_3]\}$ | Me |

TABLE 1162

| Compound Number | $R^3$ | $R^4$ | $R^5$ | $R^{11}$ |
|---|---|---|---|---|
| G-1843 | Me | H | $CH_2CH_2NH_2$ | Me |
| G-1844 | Me | H | $CH_2CH_2NH_2$, HCl | Me |
| G-1845 | Me | H | $CH_2CH_2CH_2NH_2$ | Me |
| G-1846 | Me | H | $CH_2CH_2CH_2CH_2NH_2$ | Me |
| G-1847 | Me | H | $CH_2CH_2CH_2CH_2CH_2NH_2$ | Me |
| G-1848 | Me | H | $CH_2CH_2CH_2CH_2CH_2CH_2NH_2$ | Me |
| G-1849 | Me | H | $CH_2CH_2CH_2CH_2CH_2CH_2CH_2NH_2$ | Me |
| G-1850 | Me | H | $CH_2CH(Me)NH_2$ | Me |
| G-1851 | Me | H | $CH_2C^*H(Me)NH_2$, HCl | Me |
| G-1852 | Me | H | $CH_2C^*H(Me)NH_2$:(R) | Me |
| G-1853 | Me | H | $CH_2C^*H(Me)NH_2$, HCl:(R) | Me |
| G-1854 | Me | H | $CH_2C^*H(Me)NH_2$:(S) | Me |
| G-1855 | Me | H | $CH_2C^*H(Me)NH_2$, HCl:(S) | Me |
| G-1856 | Me | H | $CH_2CH(Et)NH_2$ | Me |
| G-1857 | Me | H | $CH_2CH(i\text{-}Pr)NH_2$ | Me |
| G-1858 | Me | H | $CH(Me)CH_2NH_2$ | Me |
| G-1859 | Me | H | $CH(Me)CH_2NH_2$, HCl | Me |
| G-1860 | Me | H | $CH(Et)CH_2NH_2$ | Me |
| G-1861 | Me | H | $CH(i\text{-}Pr)CH_2NH_2$ | Me |
| G-1862 | Me | H | $CH_2CH_2CH(Me)NH_2$ | Me |
| G-1863 | Me | H | $CH_2CH(Me)CH_2NH_2$ | Me |
| G-1864 | Me | H | $CH(Me)CH_2CH_2NH_2$ | Me |
| G-1865 | Me | H | $CH_2CH(Me)NH(c\text{-}Pr)$ | Me |
| G-1866 | Me | H | $CH_2CH(Me)N(c\text{-}Pr)S({=}O)_2CF_3$ | Me |
| G-1867 | Me | H | $CH_2CH(Me)NHOMe$ | Me |
| G-1868 | Me | H | $CH_2CH(Me)N(OMe)S({=}O)_2CF_3$ | Me |
| G-1869 | Me | H | $CH_2CH(Me)N(OMe)S({=}O)_2Ph(2\text{-}NO_2)$ | Me |
| G-1870 | Me | H | $CH_2CH(Me)N(OMe)S({=}O)_2Ph(4\text{-}NO_2)$ | Me |
| G-1871 | Me | H | $CH_2CH_2NHC({=}O)O(t\text{-}Bu)$ | Me |
| G-1872 | Me | H | $CH_2CH_2CH_2NHC({=}O)O(t\text{-}Bu)$ | Me |
| G-1873 | Me | H | $CH_2CH_2CH_2CH_2NHC({=}O)O(t\text{-}Bu)$ | Me |
| G-1874 | Me | H | $CH_2CH_2CH_2CH_2NHC({=}O)OCH(CH_3)_2$ | Me |
| G-1875 | Me | H | $CH_2CH(Me)NHC({=}O)O(t\text{-}Bu)$ | Me |
| G-1876 | Me | H | $CH_2C^*H(Me)NHC({=}O)O(t\text{-}Bu)$:(R) | Me |
| G-1877 | Me | H | $CH_2C^*H(Me)NHC({=}O)O(t\text{-}Bu)$:(S) | Me |
| G-1878 | Me | H | $CH_2CH(Et)NHC({=}O)O(t\text{-}Bu)$ | Me |
| G-1879 | Me | H | $CH_2CH(i\text{-}Pr)NHC({=}O)O(t\text{-}Bu)$ | Me |
| G-1880 | Me | H | $CH(Me)CH_2NHC({=}O)O(t\text{-}Bu)$ | Me |
| G-1881 | Me | H | $CH(Et)CH_2NHC({=}O)O(t\text{-}Bu)$ | Me |
| G-1882 | Me | H | $CH(i\text{-}Pr)CH_2NHC({=}O)O(t\text{-}Bu)$ | Me |
| G-1883 | Me | H | $CH_2CH(Me)CH_2NHC({=}O)O(t\text{-}Bu)$ | Me |
| G-1884 | Me | H | $CH_2CH_2SCHF_2$ | Me |
| G-1885 | Me | H | $CH_2CH_2CH_2SCHF_2$ | Me |
| G-1886 | Me | H | $CH_2CH_2CH_2CH_2CH_2SCHF_2$ | Me |

TABLE 1163

| Compound Number | $R^3$ | $R^4$ | $R^5$ | $R^{11}$ |
|---|---|---|---|---|
| G-1887 | Me | H | $CH_2CH_2CH_2CH_2CH_2SCHF_2$ | Me |
| G-1888 | Me | H | $CH_2CH_2CH_2CH_2CH_2CH_2SCHF_2$ | Me |
| G-1889 | Me | H | $CH_2CH_2CH_2CH_2CH_2CH_2CH_2SCHF_2$ | Me |
| G-1890 | Me | H | $CH_2CH_2SCF_3$ | Me |
| G-1891 | Me | H | $CH_2CH_2CH_2SCF_3$ | Me |
| G-1892 | Me | H | $CH_2CH_2CH_2CH_2SCF_3$ | Me |
| G-1893 | Me | H | $CH_2CH_2CH_2CH_2CH_2SCF_3$ | Me |
| G-1894 | Me | H | $CH_2CH_2CH_2CH_2CH_2CH_2SCF_3$ | Me |
| G-1895 | Me | H | $CH_2CH_2CH_2CH_2CH_2CH_2CH_2SCF_3$ | Me |
| G-1896 | Me | H | $CH_2CH_2CH_2CH_2CH_2CH_2CH_2CH_2SCF_3$ | Me |
| G-1897 | Me | H | $CH_2CH(Me)SCF_3$ | Me |
| G-1898 | Me | H | $CH(Me)CH_2SCF_3$ | Me |
| G-1899 | Me | H | $CH_2CH_2CH(Me)SCF_3$ | Me |
| G-1900 | Me | H | $CH_2CH(Me)CH_2SCF_3$ | Me |
| G-1901 | Me | H | $CH(Me)CH_2CH_2SCF_3$ | Me |
| G-1902 | Me | H | $CH_2CH_2CH_2CH(Me)SCF_3$ | Me |
| G-1903 | Me | H | $CH_2CH_2CH(Me)CH_2SCF_3$ | Me |
| G-1904 | Me | H | $CH_2CH(Me)CH_2CH_2SCF_3$ | Me |
| G-1905 | Me | H | $CH(Me)CH_2CH_2CH_2SCF_3$ | Me |
| G-1906 | Me | H | $CH_2CH_2NHS({=}O)_2CF_3$ | Me |
| G-1907 | Me | H | $CH_2CH_2CH_2NHS({=}O)_2CF_3$ | Me |
| G-1908 | Me | H | $CH_2CH_2CH_2CH_2NHS({=}O)_2CF_3$ | Me |
| G-1909 | Me | H | $CH_2CH_2CH_2CH_2CH_2NHS({=}O)_2CF_3$ | Me |
| G-1910 | Me | H | $CH_2CH_2N(Me)S({=}O)_2CF_3$ | Me |

TABLE 1163-continued

| Compound Number | $R^3$ | $R^4$ | $R^5$ | $R^{11}$ |
|---|---|---|---|---|
| G-1911 | Me | H | $CH_2CH_2N(Et)S(=O)_2CF_3$ | Me |
| G-1912 | Me | H | $CH_2CH_2N(CH_2CN)S(=O)_2CF_3$ | Me |
| G-1913 | Me | H | $CH_2CH_2N(CH_2OMe)S(=O)_2CF_3$ | Me |
| G-1914 | Me | H | $CH_2CH_2CH_2N(Me)S(=O)_2CF_3$ | Me |
| G-1915 | Me | H | $CH_2CH_2CH_2N(Et)S(=O)_2CF_3$ | Me |
| G-1916 | Me | H | $CH_2CH_2CH_2N(CH_2CN)S(=O)_2CF_3$ | Me |
| G-1917 | Me | H | $CH_2CH_2CH_2N(CH_2OMe)S(=O)_2CF_3$ | Me |
| G-1918 | Me | H | $CH_2CH_2CH_2CH_2N(Me)S(=O)_2CF_3$ | Me |
| G-1919 | Me | H | $CH_2CH_2CH_2CH_2N(Et)S(=O)_2CF_3$ | Me |
| G-1920 | Me | H | $CH_2CH_2CH_2CH_2N(CH_2CN)S(=O)_2CF_3$ | Me |
| G-1921 | Me | H | $CH_2CH_2CH_2CH_2N(CH_2OMe)S(=O)_2CF_3$ | Me |
| G-1922 | Me | H | $CH_2CH(Me)NH(=O)_2CF_3$ | Me |
| G-1923 | Me | H | $CH_2CH(Me)NHS(=O)_2CF_3$:(R) | Me |
| G-1924 | Me | H | $CH_2CH(Me)NHS(=O)_2CF_3$:(S) | Me |
| G-1925 | Me | H | $CH(Me)CH_2NHS(=O)_2CF_3$ | Me |
| G-1926 | Me | H | $CH_2CH_2CH(Me)NHS(=O)_2CF_3$ | Me |
| G-1927 | Me | H | $CH_2CH(Me)CH_2NHS(=O)_2CF_3$ | Me |
| G-1928 | Me | H | $CH(Me)CH_2CH_2NHS(=O)_2CF_3$ | Me |
| G-1929 | Me | H | $CH_2CH(Me)N(Me)S(=O)_2CF_3$ | Me |
| G-1930 | Me | H | $CH(Me)CH_2N(Me)S(=O)_2CF_3$ | Me |

TABLE 1164

| Compound Number | $R^3$ | $R^4$ | $R^5$ | $R^{11}$ |
|---|---|---|---|---|
| G-1931 | Me | H | $CH_2CH_2CH(Me)N(Me)S(=O)_2CF_3$ | Me |
| G-1932 | Me | H | $CH_2CH(Me)CH_2N(Me)S(=O)_2CF_3$ | Me |
| G-1933 | Me | H | $CH(Me)CH_2CH_2N(Me)S(=O)_2CF_3$ | Me |
| G-1934 | Me | H | $CH_2Ph$ | Me |
| G-1935 | Me | H | $CH_2Ph(2-CF_3)$ | Me |
| G-1936 | Me | H | $CH_2Ph(3-CF_3)$ | Me |
| G-1937 | Me | H | $CH_2Ph(4-CF_3)$ | Me |
| G-1938 | Me | H | $CH_2Ph(2-OCF_3)$ | Me |
| G-1939 | Me | H | $CH_2Ph(3-OCF_3)$ | Me |
| G-1940 | Me | H | $CH_2Ph(4-OCF_3)$ | Me |
| G-1941 | Me | H | $CH_2Ph(2-SCF_3)$ | Me |
| G-1942 | Me | H | $CH_2Ph(3-SCF_3)$ | Me |
| G-1943 | Me | H | $CH_2Ph(4-SCF_3)$ | Me |
| G-1944 | Me | H | $CH_2Ph(3-CH_2SCF_3)$ | Me |
| G-1945 | Me | H | $CH_2Ph(4-F)$ | Me |
| G-1946 | Me | H | $CH_2Ph(4-Cl)$ | Me |
| G-1947 | Me | H | $CH_2Ph(4-Br)$ | Me |
| G-1948 | Me | H | $CH_2Ph(4-Me)$ | Me |
| G-1949 | Me | H | $CH_2Ph[4-(t-Bu)]$ | Me |
| G-1950 | Me | H | $CH_2Ph(4-CN)$ | Me |
| G-1951 | Me | H | $CH_2Ph(4-NO_2)$ | Me |
| G-1952 | Me | H | $CH_2Ph(4-OCHF_2)$ | Me |
| G-1953 | Me | H | $CH_2Ph(4-SCHF_2)$ | Me |
| G-1954 | Me | H | $CH_2Ph(4-CH_2SCF_3)$ | Me |
| G-1955 | Me | H | $CH_2Ph[4-CF(CF_3)_2]$ | Me |
| G-1956 | Me | H | $CH_2Ph(4-CH_2SCF_3)$ | Me |
| G-1957 | Me | H | $CH_2Ph[4-Ph(4-CF_3)]$ | Me |
| G-1958 | Me | H | $CH_2Ph(2,4-Cl_2)$ | Me |
| G-1959 | Me | H | $CH_2Ph[2,5-(CF_3)_2]$ | Me |
| G-1960 | Me | H | $CH_2Ph(3,4-Cl_2)$ | Me |
| G-1961 | Me | H | $CH_2Ph(3-CF_3-4-F)$ | Me |
| G-1962 | Me | H | $CH_2Ph(3-CF_3-4-Cl)$ | Me |
| G-1963 | Me | H | $CH_2Ph(3-F-4-CF_3)$ | Me |
| G-1964 | Me | H | $CH_2Ph(2,4,6-F_3)$ | Me |
| G-1965 | Me | H | $CH_2Ph(3,4,5-F_3)$ | Me |
| G-1966 | Me | H | $CH_2Ph(2,3,4-F_3)$ | Me |
| G-1967 | Me | H | $CH_2Ph(3,4,5-Cl_3)$ | Me |
| G-1968 | Me | H | $CH_2CH_2Ph$ | Me |
| G-1969 | Me | H | $CH_2CH_2Ph(4-F)$ | Me |
| G-1970 | Me | H | $CH_2CH_2Ph(4-Cl)$ | Me |
| G-1971 | Me | H | $CH_2CH_2Ph(4-Br)$ | Me |
| G-1972 | Me | H | $CH_2CH_2Ph[4-(t-Bu)]$ | Me |
| G-1973 | Me | H | $CH_2CH_2Ph(2-CF_3)$ | Me |
| G-1974 | Me | H | $CH_2CH_2Ph(3-CF_3)$ | Me |

TABLE 1165

| Compound Number | $R^3$ | $R^4$ | $R^5$ | $R^{11}$ |
|---|---|---|---|---|
| G-1975 | Me | H | $CH_2CH_2Ph(4-CF_3)$ | Me |
| G-1976 | Me | H | $CH_2CH_2Ph[4-CF(CF_3)_2]$ | Me |
| G-1977 | Me | H | $CH_2CH_2Ph[4-(c-Pr)]$ | Me |
| G-1978 | Me | H | $CH_2CH_2Ph\{4-[c-Pr(2,2-F_2)]\}$ | Me |
| G-1979 | Me | H | $CH_2CH_2Ph(4-OMe)$ | Me |
| G-1980 | Me | H | $CH_2CH_2Ph(3-OCF_3)$ | Me |
| G-1981 | Me | H | $CH_2CH_2Ph(4-OCHF_2)$ | Me |
| G-1982 | Me | H | $CH_2CH_2Ph(4-OCF_3)$ | Me |
| G-1983 | Me | H | $CH_2CH_2Ph(4-SMe)$ | Me |
| G-1984 | Me | H | $CH_2CH_2Ph(4-SCHF_2)$ | Me |
| G-1985 | Me | H | $CH_2CH_2Ph(4-SCF_3)$ | Me |
| G-1986 | Me | H | $CH_2CH_2Ph[4-S(=O)Me]$ | Me |
| G-1987 | Me | H | $CH_2CH_2Ph[4-S(=O)CF_3]$ | Me |
| G-1988 | Me | H | $CH_2CH_2Ph[4-S(=O)_2Me]$ | Me |
| G-1989 | Me | H | $CH_2CH_2Ph[4-S(=O)_2CF_3]$ | Me |
| G-1990 | Me | H | $CH_2CH_2Ph(4-CH_2SMe)$ | Me |
| G-1991 | Me | H | $CH_2CH_2Ph(4-CH_2SCF_3)$ | Me |
| G-1992 | Me | H | $CH_2CH_2Ph[4-OS(=O)_2Me]$ | Me |
| G-1993 | Me | H | $CH_2CH_2Ph[4-OS(=O)_2CF_3]$ | Me |
| G-1994 | Me | H | $CH_2CH_2Ph[4-Ph(4-CF_3)]$ | Me |
| G-1995 | Me | H | $CH_2CH_2Ph(4-CH_2Ph)$ | Me |
| G-1996 | Me | H | $CH_2CH_2Ph(4-OCH_2Ph)$ | Me |
| G-1997 | Me | H | $CH_2CH_2Ph(4-CN)$ | Me |
| G-1998 | Me | H | $CH_2CH_2Ph(4-NO_2)$ | Me |
| G-1999 | Me | H | $CH_2CH_2Ph(2,4-Cl_2)$ | Me |
| G-2000 | Me | H | $CH_2CH_2Ph(3,4-Cl_2)$ | Me |
| G-2001 | Me | H | $CH_2CH_2Ph(3-CF_3-4-F)$ | Me |
| G-2002 | Me | H | $CH_2CH_2Ph(2-CF_3-4-F)$ | Me |
| G-2003 | Me | H | $CH_2CH_2Ph(3-F-4-CF_3)$ | Me |
| G-2004 | Me | H | $CH_2CH_2Ph(2-F-4-CF_3)$ | Me |
| G-2005 | Me | H | $CH_2CH_2Ph(3-Cl-4-OCHF_2)$ | Me |
| G-2006 | Me | H | $CH_2CH_2Ph(3,4,5-Cl_3)$ | Me |
| G-2007 | Me | H | $CH_2CH_2Ph(2,3,4-F_3)$ | Me |
| G-2008 | Me | H | $CH_2CH_2Ph(2,4,5-F_3)$ | Me |
| G-2009 | Me | H | $CH_2CH_2Ph(3,4,5-F_3)$ | Me |
| G-2010 | Me | H | $CH_2CH_2Ph(2,4,6-F_3)$ | Me |
| G-2011 | Me | H | $CH_2CH_2CH_2Ph$ | Me |
| G-2012 | Me | H | $CH_2CH_2CH_2Ph(3-CF_3)$ | Me |
| G-2013 | Me | H | $CH_2CH_2CH_2Ph(4-CF_3)$ | Me |
| G-2014 | Me | H | $CH_2CH_2CH_2Ph(4-F)$ | Me |
| G-2015 | Me | H | $CH_2CH_2CH_2Ph[4-(t-Bu)]$ | Me |
| G-2016 | Me | H | $CH_2CH_2CH_2Ph(4-CN)$ | Me |
| G-2017 | Me | H | $CH_2CH_2CH_2Ph(4-CF_3)$ | Me |
| G-2018 | Me | H | $CH_2CH_2CH_2Ph(4-OCHF_2)$ | Me |

TABLE 1166

| Compound Number | $R^3$ | $R^4$ | $R^5$ | $R^{11}$ |
|---|---|---|---|---|
| G-2019 | Me | H | $CH_2CH_2CH_2Ph(4-OCF_3)$ | Me |
| G-2020 | Me | H | $CH_2CH_2CH_2Ph(4-SCHF_2)$ | Me |
| G-2021 | Me | H | $CH_2CH_2CH_2Ph(4-SCF_3)$ | Me |
| G-2022 | Me | H | $CH_2CH_2CH_2Ph[4-CF(CF_3)_2]$ | Me |
| G-2023 | Me | H | $CH_2CH_2CH_2Ph(3,4,5-F_3)$ | Me |
| G-2024 | Me | H | $CH_2CH_2CH_2Ph(2,4,6-F_3)$ | Me |
| G-2025 | Me | H | $CH_2CH_2CH_2CH_2Ph$ | Me |
| G-2026 | Me | H | $CH_2CH_2CH_2CH_2Ph(4-F)$ | Me |
| G-2027 | Me | H | $CH_2CH_2CH_2CH_2Ph(4-CF_3)$ | Me |
| G-2028 | Me | H | $CH_2CH_2CH_2CH_2Ph(4-OCF_3)$ | Me |
| G-2029 | Me | H | $CH_2CH_2CH_2CH_2Ph(4-SCF_3)$ | Me |
| G-2030 | Me | H | $CH_2CH_2CH_2CH_2CH_2Ph$ | Me |
| G-2031 | Me | H | $CH_2CH_2CH_2CH_2CH_2CH_2Ph$ | Me |
| G-2032 | Me | H | $CH_2CF_2Ph(4-F)$ | Me |
| G-2033 | Me | H | $CH_2CF_2Ph(4-CF_3)$ | Me |
| G-2034 | Me | H | $CH_2CF_2Ph(3,4,5-F_3)$ | Me |
| G-2035 | $CF_3$ | H | $CH_2CH(Me)NH_2$ | Me |
| G-2036 | $CF_3$ | H | $CH_2C^*H(Me)NH_2$, HCl | Me |
| G-2037 | $CF_3$ | H | $CH_2C^*H(Me)NH_2$:(R) | Me |
| G-2038 | $CF_3$ | H | $CH_2C^*H(Me)NH_2$, HCl:(R) | Me |
| G-2039 | $CF_3$ | H | $CH_2C^*H(Me)NH_2$:(S) | Me |
| G-2040 | $CF_3$ | H | $CH_2C^*H(Me)NH_2$, HCl:(S) | Me |
| G-2041 | $CF_3$ | H | $CH_2CH(Me)NHC(=O)O(t-Bu)$ | Me |
| G-2042 | $CF_3$ | H | $CH_2C^*H(Me)NHC(=O)O(t-Bu)$:(R) | Me |

TABLE 1166-continued

| Compound Number | $R^3$ | $R^4$ | $R^5$ | $R^{11}$ |
|---|---|---|---|---|
| G-2043 | $CF_3$ | H | $CH_2C^*H(Me)NHC(=O)O(t\text{-}Bu)$:(S) | Me |
| G-2044 | $CF_3$ | H | $CH_2CH(Me)NHS(=O)_2CF_3$ | Me |
| G-2045 | $CF_3$ | H | $CH_2CH(Me)NHS(=O)_2CF_3$:(R) | Me |
| G-2046 | $CF_3$ | H | $CH_2CH(Me)NHS(=O)_2CF_3$:(S) | Me |
| G-2047 | $OCF_3$ | H | $CH_2CH(Me)NH_2$ | Me |
| G-2048 | $OCF_3$ | H | $CH_2C^*H(Me)NH_2$, HCl | Me |
| G-2049 | $OCF_3$ | H | $CH_2C^*H(Me)NH_2$:(R) | Me |
| G-2050 | $OCF_3$ | H | $CH_2C^*H(Me)NH_2$, HCl:(R) | Me |
| G-2051 | $OCF_3$ | H | $CH_2C^*H(Me)NH_2$:(S) | Me |
| G-2052 | $OCF_3$ | H | $CH_2C^*H(Me)NH_2$, HCl:(S) | Me |
| G-2053 | $OCF_3$ | H | $CH_2CH(Me)NHC(=O)O(t\text{-}Bu)$ | Me |
| G-2054 | $OCF_3$ | H | $CH_2C^*H(Me)NHC(=O)O(t\text{-}Bu)$:(R) | Me |
| G-2055 | $OCF_3$ | H | $CH_2C^*H(Me)NHC(=O)O(t\text{-}Bu)$:(S) | Me |
| G-2056 | $OCF_3$ | H | $CH_2CH(Me)NHS(=O)_2CF_3$ | Me |
| G-2057 | $OCF_3$ | H | $CH_2CH(Me)NHS(=O)_2CF_3$:(R) | Me |
| G-2058 | $OCF_3$ | H | $CH_2CH(Me)NHS(=O)_2CF_3$:(S) | Me |
| G-2059 | Cl | Cl | $CH_2CH_2SCHF_2$ | Me |
| G-2060 | Cl | Cl | $CH_2CH_2CH_2SCHF_2$ | Me |
| G-2061 | Cl | Cl | $CH_2CH_2CH_2CH_2SCHF_2$ | Me |
| G-2062 | Cl | Cl | $CH_2CH_2CH_2CH_2CH_2SCHF_2$ | Me |

TABLE 1167

| Compound Number | $R^3$ | $R^4$ | $R^5$ | $R^{11}$ |
|---|---|---|---|---|
| G-2063 | Cl | Cl | $CH_2CH_2CH_2CH_2CH_2CH_2SCHF_2$ | Me |
| G-2064 | Cl | Cl | $CH_2CH_2CH_2CH_2CH_2CH_2CH_2SCHF_2$ | Me |
| G-2065 | Cl | Cl | $CH_2CH_2SCF_3$ | Me |
| G-2066 | Cl | Cl | $CH_2CH_2CH_2SCF_3$ | Me |
| G-2067 | Cl | Cl | $CH_2CH_2CH_2CH_2SCF_3$ | Me |
| G-2068 | Cl | Cl | $CH_2CH_2CH_2CH_2CH_2SCF_3$ | Me |
| G-2069 | Cl | Cl | $CH_2CH_2CH_2CH_2CH_2CH_2SCF_3$ | Me |
| G-2070 | Cl | Cl | $CH_2CH_2CH_2CH_2CH_2CH_2CH_2SCF_3$ | Me |
| G-2071 | Cl | Cl | $CH_2CH_2CH_2CH_2CH_2CH_2CH_2CH_2SCF_3$ | Me |
| G-2072 | Cl | Cl | $CH_2CH(Me)SCF_3$ | Me |
| G-2073 | Cl | Cl | $CH(Me)CH_2SCF_3$ | Me |
| G-2074 | Cl | Cl | $CH_2CH_2CH(Me)SCF_3$ | Me |
| G-2075 | Cl | Cl | $CH_2CH(Me)CH_2SCF_3$ | Me |
| G-2076 | Cl | Cl | $CH(Me)CH_2CH_2SCF_3$ | Me |
| G-2077 | Cl | Cl | $CH_2CH_2CH_2CH(Me)SCF_3$ | Me |
| G-2078 | Cl | Cl | $CH_2CH_2CH(Me)CH_2SCF_3$ | Me |
| G-2079 | Cl | Cl | $CH_2CH(Me)CH_2CH_2SCF_3$ | Me |
| G-2080 | Cl | Cl | $CH(Me)CH_2CH_2CH_2SCF_3$ | Me |
| G-2081 | Cl | Cl | $CH_2CH_2NHS(=O)_2CF_3$ | Me |
| G-2082 | Cl | Cl | $CH_2CH_2CH_2NHS(=O)_2CF_3$ | Me |
| G-2083 | Cl | Cl | $CH_2CH_2CH_2CH_2NHS(=O)_2CF_3$ | Me |
| G-2084 | Cl | Cl | $CH_2CH_2CH_2CH_2CH_2NHS(=O)_2CF_3$ | Me |
| G-2085 | Cl | Cl | $CH_2CH_2N(Me)S(=O)_2CF_3$ | Me |
| G-2086 | Cl | Cl | $CH_2CH_2N(Et)S(=O)_2CF_3$ | Me |
| G-2087 | Cl | Cl | $CH_2CH_2N(CH_2CN)S(=O)_2CF_3$ | Me |
| G-2088 | Cl | Cl | $CH_2CH_2N(CH_2OMe)S(=O)_2CF_3$ | Me |
| G-2089 | Cl | Cl | $CH_2CH_2CH_2N(Me)S(=O)_2CF_3$ | Me |
| G-2090 | Cl | Cl | $CH_2CH_2CH_2N(Et)S(=O)_2CF_3$ | Me |
| G-2091 | Cl | Cl | $CH_2CH_2CH_2N(CH_2CN)S(=O)_2CF_3$ | Me |
| G-2092 | Cl | Cl | $CH_2CH_2CH_2N(CH_2OMe)S(=O)_2CF_3$ | Me |
| G-2093 | Cl | Cl | $CH_2CH_2CH_2CH_2N(Me)S(=O)_2CF_3$ | Me |
| G-2094 | Cl | Cl | $CH_2CH_2CH_2CH_2N(Et)S(=O)_2CF_3$ | Me |
| G-2095 | Cl | Cl | $CH_2CH_2CH_2CH_2N(CH_2CN)S(=O)_2CF_3$ | Me |
| G-2096 | Cl | Cl | $CH_2CH_2CH_2CH_2N(CH_2OMe)S(=O)_2CF_3$ | Me |
| G-2097 | Cl | Cl | $CH_2CH(Me)NHS(=O)_2CF_3$ | Me |
| G-2098 | Cl | Cl | $CH(Me)CH_2NHS(=O)_2CF_3$ | Me |
| G-2099 | Cl | Cl | $CH_2CH_2CH(Me)NHS(=O)_2CF_3$ | Me |
| G-2100 | Cl | Cl | $CH_2CH(Me)CH_2NHS(=O)_2CF_3$ | Me |
| G-2101 | Cl | Cl | $CH(Me)CH_2CH_2NHS(=O)_2CF_3$ | Me |
| G-2102 | Cl | Cl | $CH_2CH(Me)N(Me)S(=O)_2CF_3$ | Me |
| G-2103 | Cl | Cl | $CH(Me)CH_2N(Me)S(=O)_2CF_3$ | Me |
| G-2104 | Cl | Cl | $CH_2CH_2CH(Me)N(Me)S(=O)_2CF_3$ | Me |
| G-2105 | Cl | Cl | $CH_2CH(Me)CH_2N(Me)S(=O)_2CF_3$ | Me |
| G-2106 | Cl | Cl | $CH(Me)CH_2CH_2N(Me)S(=O)_2CF_3$ | Me |

TABLE 1168

| Compound Number | $R^3$ | $R^4$ | $R^5$ | $R^{11}$ |
|---|---|---|---|---|
| G-2107 | Cl | Cl | $CH_2Ph$ | Me |
| G-2108 | Cl | Cl | $CH_2Ph(2\text{-}CF_3)$ | Me |
| G-2109 | Cl | Cl | $CH_2Ph(3\text{-}CF_3)$ | Me |
| G-2110 | Cl | Cl | $CH_2Ph(4\text{-}CF_3)$ | Me |
| G-2111 | Cl | Cl | $CH_2Ph(2\text{-}OCF_3)$ | Me |
| G-2112 | Cl | Cl | $CH_2Ph(3\text{-}OCF_3)$ | Me |
| G-2113 | Cl | Cl | $CH_2Ph(4\text{-}OCF_3)$ | Me |
| G-2114 | Cl | Cl | $CH_2Ph(2\text{-}SCF_3)$ | Me |
| G-2115 | Cl | Cl | $CH_2Ph(3\text{-}SCF_3)$ | Me |
| G-2116 | Cl | Cl | $CH_2Ph(4\text{-}SCF_3)$ | Me |
| G-2117 | Cl | Cl | $CH_2Ph(3\text{-}CH_2SCF_3)$ | Me |
| G-2118 | Cl | Cl | $CH_2Ph(4\text{-}F)$ | Me |
| G-2119 | Cl | Cl | $CH_2Ph(4\text{-}Cl)$ | Me |
| G-2120 | Cl | Cl | $CH_2Ph(4\text{-}Br)$ | Me |
| G-2121 | Cl | Cl | $CH_2Ph(4\text{-}Me)$ | Me |
| G-2122 | Cl | Cl | $CH_2Ph[4\text{-}(t\text{-}Bu)]$ | Me |
| G-2123 | Cl | Cl | $CH_2Ph(4\text{-}CN)$ | Me |
| G-2124 | Cl | Cl | $CH_2Ph(4\text{-}NO_2)$ | Me |
| G-2125 | Cl | Cl | $CH_2Ph(4\text{-}OCHF_2)$ | Me |
| G-2126 | Cl | Cl | $CH_2Ph(4\text{-}SCHF_2)$ | Me |
| G-2127 | Cl | Cl | $CH_2Ph(4\text{-}CH_2SCF_3)$ | Me |
| G-2128 | Cl | Cl | $CH_2Ph[4\text{-}CF(CF_3)_2]$ | Me |
| G-2129 | Cl | Cl | $CH_2Ph(4\text{-}CH_2SCF_3)$ | Me |
| G-2130 | Cl | Cl | $CH_2Ph[4\text{-}Ph(4\text{-}CF_3)]$ | Me |
| G-2131 | Cl | Cl | $CH_2Ph(2,4\text{-}Cl_2)$ | Me |
| G-2132 | Cl | Cl | $CH_2Ph[2,5\text{-}(CF_3)_2]$ | Me |
| G-2133 | Cl | Cl | $CH_2Ph(3,4\text{-}Cl_2)$ | Me |
| G-2134 | Cl | Cl | $CH_2Ph(3\text{-}CF_3\text{-}4\text{-}F)$ | Me |
| G-2135 | Cl | Cl | $CH_2Ph(3\text{-}CF_3\text{-}4\text{-}Cl)$ | Me |
| G-2136 | Cl | Cl | $CH_2Ph(3\text{-}F\text{-}4\text{-}CF_3)$ | Me |
| G-2137 | Cl | Cl | $CH_2Ph(2,4,6\text{-}F_3)$ | Me |
| G-2138 | Cl | Cl | $CH_2Ph(3,4,5\text{-}F_3)$ | Me |
| G-2139 | Cl | Cl | $CH_2Ph(2,3,4\text{-}F_3)$ | Me |
| G-2140 | Cl | Cl | $CH_2Ph(3,4,5\text{-}Cl_3)$ | Me |
| G-2141 | Cl | Cl | $CH_2CH_2Ph$ | Me |
| G-2142 | Cl | Cl | $CH_2CH_2Ph(4\text{-}F)$ | Me |
| G-2143 | Cl | Cl | $CH_2CH_2Ph(4\text{-}Cl)$ | Me |
| G-2144 | Cl | Cl | $CH_2CH_2Ph(4\text{-}Br)$ | Me |
| G-2145 | Cl | Cl | $CH_2CH_2Ph[4\text{-}(t\text{-}Bu)]$ | Me |
| G-2146 | Cl | Cl | $CH_2CH_2Ph(2\text{-}CF_3)$ | Me |
| G-2147 | Cl | Cl | $CH_2CH_2Ph(3\text{-}CF_3)$ | Me |
| G-2148 | Cl | Cl | $CH_2CH_2Ph(4\text{-}CF_3)$ | Me |
| G-2149 | Cl | Cl | $CH_2CH_2Ph[4\text{-}CF(CF_3)_2]$ | Me |
| G-2150 | Cl | Cl | $CH_2CH_2Ph[4\text{-}(c\text{-}Pr)]$ | Me |

TABLE 1169

| Compound Number | $R^3$ | $R^4$ | $R^5$ | $R^{11}$ |
|---|---|---|---|---|
| G-2151 | Cl | Cl | $CH_2CH_2Ph\{4\text{-}[c\text{-}Pr(2,2\text{-}F_2)]\}$ | Me |
| G-2152 | Cl | Cl | $CH_2CH_2Ph(4\text{-}OMe)$ | Me |
| G-2153 | Cl | Cl | $CH_2CH_2Ph(3\text{-}OCF_3)$ | Me |
| G-2154 | Cl | Cl | $CH_2CH_2Ph(4\text{-}OCHF_2)$ | Me |
| G-2155 | Cl | Cl | $CH_2CH_2Ph(4\text{-}OCF_3)$ | Me |
| G-2156 | Cl | Cl | $CH_2CH_2Ph(4\text{-}SMe)$ | Me |
| G-2157 | Cl | Cl | $CH_2CH_2Ph(4\text{-}SCHF_2)$ | Me |
| G-2158 | Cl | Cl | $CH_2CH_2Ph(4\text{-}SCF_3)$ | Me |
| G-2159 | Cl | Cl | $CH_2CH_2Ph[4\text{-}S(=O)Me]$ | Me |
| G-2160 | Cl | Cl | $CH_2CH_2Ph[4\text{-}S(=O)CF_3]$ | Me |
| G-2161 | Cl | Cl | $CH_2CH_2Ph[4\text{-}S(=O)_2Me]$ | Me |
| G-2162 | Cl | Cl | $CH_2CH_2Ph[4\text{-}S(=O)_2CF_3]$ | Me |
| G-2163 | Cl | Cl | $CH_2CH_2Ph(4\text{-}CH_2SMe)$ | Me |
| G-2164 | Cl | Cl | $CH_2CH_2Ph(4\text{-}CH_2SCF_3)$ | Me |
| G-2165 | Cl | Cl | $CH_2CH_2Ph[4\text{-}OS(=O)_2Me]$ | Me |
| G-2166 | Cl | Cl | $CH_2CH_2Ph[4\text{-}OS(=O)_2CF_3]$ | Me |
| G-2167 | Cl | Cl | $CH_2CH_2Ph[4\text{-}Ph(4\text{-}CF_3)]$ | Me |
| G-2168 | Cl | Cl | $CH_2CH_2Ph(4\text{-}CH_2Ph)$ | Me |
| G-2169 | Cl | Cl | $CH_2CH_2Ph(4\text{-}OCH_2Ph)$ | Me |
| G-2170 | Cl | Cl | $CH_2CH_2Ph(4\text{-}CN)$ | Me |
| G-2171 | Cl | Cl | $CH_2CH_2Ph(4\text{-}NO_2)$ | Me |
| G-2172 | Cl | Cl | $CH_2CH_2Ph(2,4\text{-}Cl_2)$ | Me |
| G-2173 | Cl | Cl | $CH_2CH_2Ph(3,4\text{-}Cl_2)$ | Me |
| G-2174 | Cl | Cl | $CH_2CH_2Ph(3\text{-}CF_3\text{-}4\text{-}F)$ | Me |

TABLE 1169-continued

| Compound Number | $R^3$ | $R^4$ | $R^5$ | $R^{11}$ |
|---|---|---|---|---|
| G-2175 | Cl | Cl | $CH_2CH_2Ph(2-CF_3-4-F)$ | Me |
| G-2176 | Cl | Cl | $CH_2CH_2Ph(3-F-4-CF_3)$ | Me |
| G-2177 | Cl | Cl | $CH_2CH_2Ph(2-F-4-CF_3)$ | Me |
| G-2178 | Cl | Cl | $CH_2CH_2Ph(3-Cl-4-OCHF_2)$ | Me |
| G-2179 | Cl | Cl | $CH_2CH_2Ph(3,4,5-Cl_3)$ | Me |
| G-2180 | Cl | Cl | $CH_2CH_2Ph(2,3,4-F_3)$ | Me |
| G-2181 | Cl | Cl | $CH_2CH_2Ph(2,4,5-F_3)$ | Me |
| G-2182 | Cl | Cl | $CH_2CH_2Ph(3,4,5-F_3)$ | Me |
| G-2183 | Cl | Cl | $CH_2CH_2Ph(2,4,6-F_3)$ | Me |
| G-2184 | Cl | Cl | $CH_2CH_2CH_2Ph$ | Me |
| G-2185 | Cl | Cl | $CH_2CH_2CH_2Ph(3-CF_3)$ | Me |
| G-2186 | Cl | Cl | $CH_2CH_2CH_2Ph(4-CF_3)$ | Me |
| G-2187 | Cl | Cl | $CH_2CH_2CH_2Ph(4-F)$ | Me |
| G-2188 | Cl | Cl | $CH_2CH_2CH_2Ph[4-(t-Bu)]$ | Me |
| G-2189 | Cl | Cl | $CH_2CH_2CH_2Ph(4-CN)$ | Me |
| G-2190 | Cl | Cl | $CH_2CH_2CH_2Ph(4-CF_3)$ | Me |
| G-2191 | Cl | Cl | $CH_2CH_2CH_2Ph(4-OCHF_2)$ | Me |
| G-2192 | Cl | Cl | $CH_2CH_2CH_2Ph(4-OCF_3)$ | Me |
| G-2193 | Cl | Cl | $CH_2CH_2CH_2Ph(4-SCHF_2)$ | Me |
| G-2194 | Cl | Cl | $CH_2CH_2CH_2Ph(4-SCF_3)$ | Me |

TABLE 1170

| Compound Number | $R^3$ | $R^4$ | $R^5$ | $R^{11}$ |
|---|---|---|---|---|
| G-2195 | Cl | C | $CH_2CH_2CH_2Ph[4-CF(CF_3)_2]$ | Me |
| G-2196 | Cl | Cl | $CH_2CH_2CH_2Ph(3,4,5-F_3)$ | Me |
| G-2197 | Cl | Cl | $CH_2CH_2CH_2Ph(2,4,6-F_3)$ | Me |
| G-2198 | Cl | Cl | $CH_2CH_2CH_2CH_2Ph$ | Me |
| G-2199 | Cl | Cl | $CH_2CH_2CH_2CH_2Ph(4-F)$ | Me |
| G-2200 | Cl | Cl | $CH_2CH_2CH_2CH_2Ph(4-CF_3)$ | Me |
| G-2201 | Cl | Cl | $CH_2CH_2CH_2CH_2Ph(4-OCF_3)$ | Me |
| G-2202 | Cl | Cl | $CH_2CH_2CH_2CH_2Ph(4-SCF_3)$ | Me |
| G-2203 | Cl | Cl | $CH_2CH_2CH_2CH_2CH_2Ph$ | Me |
| G-2204 | Cl | Cl | $CH_2CH_2CH_2CH_2CH_2CH_2Ph$ | Me |
| G-2205 | Cl | Cl | $CH_2CF_2Ph(4-F)$ | Me |
| G-2206 | Cl | Cl | $CH_2CF_2Ph(4-CF_3)$ | Me |
| G-2207 | Cl | Cl | $CH_2CF_2Ph(3,4,5-F_3)$ | Me |
| G-2208 | Me | Cl | $CH_2CH_2SCHF_2$ | Me |
| G-2209 | Me | Cl | $CH_2CH_2CH_2SCHF_2$ | Me |
| G-2210 | Me | Cl | $CH_2CH_2CH_2CH_2SCHF2$ | Me |
| G-2211 | Me | Cl | $CH_2CH_2CH_2CH_2CH_2SCHF_2$ | Me |
| G-2212 | Me | Cl | $CH_2CH_2CH_2CH_2CH_2CH_2SCHF_2$ | Me |
| G-2213 | Me | Cl | $CH_2CH_2CH_2CH_2CH_2CH_2CH_2SCHF_2$ | Me |
| G-2214 | Me | Cl | $CH_2CH_2SCF_3$ | Me |
| G-2215 | Me | Cl | $CH_2CH_2CH_2SCF_3$ | Me |
| G-2216 | Me | Cl | $CH_2CH_2CH_2CH_2SCF_3$ | Me |
| G-2217 | Me | Cl | $CH_2CH_2CH_2CH_2CH_2SCF_3$ | Me |
| G-2218 | Me | Cl | $CH_2CH_2CH_2CH_2CH_2CH_2SCF_3$ | Me |
| G-2219 | Me | Cl | $CH_2CH_2CH_2CH_2CH_2CH_2CH_2SCF_3$ | Me |
| G-2220 | Me | Cl | $CH_2CH_2CH_2CH_2CH_2CH_2CH_2CH_2SCF_3$ | Me |
| G-2221 | Me | Cl | $CH_2CH(Me)SCF_3$ | Me |
| G-2222 | Me | Cl | $CH(Me)CH_2SCF_3$ | Me |
| G-2223 | Me | Cl | $CH_2CH_2CH(Me)SCF_3$ | Me |
| G-2224 | Me | Cl | $CH_2CH(Me)CH_2SCF_3$ | Me |
| G-2225 | Me | Cl | $CH(Me)CH_2CH_2SCF_3$ | Me |
| G-2226 | Me | Cl | $CH_2CH_2CH_2CH(Me)SCF_3$ | Me |
| G-2227 | Me | Cl | $CH_2CH_2CH(Me)CH_2SCF_3$ | Me |
| G-2228 | Me | Cl | $CH_2CH(Me)CH_2CH_2SCF_3$ | Me |
| G-2229 | Me | Cl | $CH(Me)CH_2CH_2CH_2SCF_3$ | Me |
| G-2230 | Me | Cl | $CH_2CH_2NHS(=O)_2CF_3$ | Me |
| G-2231 | Me | Cl | $CH_2CH_2CH_2NHS(=O)_2CF_3$ | Me |
| G-2232 | Me | Cl | $CH_2CH_2CH_2CH_2NHS(=O)_2CF_3$ | Me |
| G-2233 | Me | Cl | $CH_2CH_2CH_2CH_2CH_2NHS(=O)_2CF_3$ | Me |
| G-2234 | Me | Cl | $CH_2CH_2N(Me)S(=O)_2CF_3$ | Me |
| G-2235 | Me | Cl | $CH_2CH_2N(Et)S(=O)_2CF_3$ | Me |
| G-2236 | Me | Cl | $CH_2CH_2N(CH_2CN)S(=O)_2CF_3$ | Me |
| G-2237 | Me | Cl | $CH_2CH_2N(CH_2OMe)S(=O)_2CF_3$ | Me |
| G-2238 | Me | Cl | $CH_2CH_2CH_2N(Me)S(=O)_2CF_3$ | Me |

TABLE 1171

| Compound Number | $R^3$ | $R^4$ | $R^5$ | $R^{11}$ |
|---|---|---|---|---|
| G-2239 | Me | Cl | $CH_2CH_2CH_2N(Et)S(=O)_2CF_3$ | Me |
| G-2240 | Me | Cl | $CH_2CH_2CH_2N(CH_2CN)S(=O)_2CF_3$ | Me |
| G-2241 | Me | Cl | $CH_2CH_2CH_2N(CH_2OMe)S(=O)_2CF_3$ | Me |
| G-2242 | Me | Cl | $CH_2CH_2CH_2CH_2N(Me)S(=O)_2CF_3$ | Me |
| G-2243 | Me | Cl | $CH_2CH_2CH_2CH_2N(Et)S(=O)_2CF_3$ | Me |
| G-2244 | Me | Cl | $CH_2CH_2CH_2CH_2N(CH_2CN)S(=O)_2CF_3$ | Me |
| G-2245 | Me | Cl | $CH_2CH_2CH_2CH_2N(CH_2OMe)S(=O)_2CF_3$ | Me |
| G-2246 | Me | Cl | $CH_2CH(Me)NHS(=O)_2CF_3$ | Me |
| G-2247 | Me | Cl | $CH(Me)CH_2NHS(=O)_2CF_3$ | Me |
| G-2248 | Me | Cl | $CH_2CH_2CH(Me)NHS(=O)_2CF_3$ | Me |
| G-2249 | Me | Cl | $CH_2CH(Me)CH_2NHS(=O)_2CF_3$ | Me |
| G-2250 | Me | Cl | $CH(Me)CH_2CH_2NHS(=O)_2CF_3$ | Me |
| G-2251 | Me | Cl | $CH_2CH(Me)N(Me)S(=O)_2CF_3$ | Me |
| G-2252 | Me | Cl | $CH(Me)CH_2N(Me)S(=O)_2CF_3$ | Me |
| G-2253 | Me | Cl | $CH_2CH_2CH(Me)N(Me)S(=O)_2CF_3$ | Me |
| G-2254 | Me | Cl | $CH_2CH(Me)CH_2N(Me)S(=O)_2CF_3$ | Me |
| G-2255 | Me | Cl | $CH(Me)CH_2CH_2N(Me)S(=O)_2CF_3$ | Me |
| G-2256 | Me | Cl | $CH_2Ph$ | Me |
| G-2257 | Me | Cl | $CH_2Ph(2-CF_3)$ | Me |
| G-2258 | Me | Cl | $CH_2Ph(3-CF_3)$ | Me |
| G-2259 | Me | Cl | $CH_2Ph(4-CF_3)$ | Me |
| G-2260 | Me | Cl | $CH_2Ph(2-OCF_3)$ | Me |
| G-2261 | Me | Cl | $CH_2Ph(3-OCF_3)$ | Me |
| G-2262 | Me | Cl | $CH_2Ph(4-OCF_3)$ | Me |
| G-2263 | Me | Cl | $CH_2Ph(2-SCF_3)$ | Me |
| G-2264 | Me | Cl | $CH_2Ph(3-SCF_3)$ | Me |
| G-2265 | Me | Cl | $CH_2Ph(4-SCF_3)$ | Me |
| G-2266 | Me | Cl | $CH_2Ph(3-CH_2SCF_3)$ | Me |
| G-2267 | Me | Cl | $CH_2Ph(4-F)$ | Me |
| G-2268 | Me | Cl | $CH_2Ph(4-Cl)$ | Me |
| G-2269 | Me | Cl | $CH_2Ph(4-Br)$ | Me |
| G-2270 | Me | Cl | $CH_2Ph(4-Me)$ | Me |
| G-2271 | Me | Cl | $CH_2Ph[4-(t-Bu)]$ | Me |
| G-2272 | Me | Cl | $CH_2Ph(4-CN)$ | Me |
| G-2273 | Me | Cl | $CH_2Ph(4-NO_2)$ | Me |
| G-2274 | Me | Cl | $CH_2Ph(4-OCHF_2)$ | Me |
| G-2275 | Me | Cl | $CH_2Ph(4-SCHF_2)$ | Me |
| G-2276 | Me | Cl | $CH_2Ph(4-CH_2SCF_3)$ | Me |
| G-2277 | Me | Cl | $CH_2Ph[4-CF(CF_3)_2]$ | Me |
| G-2278 | Me | Cl | $CH_2Ph(4-CH_2SCF_3)$ | Me |
| G-2279 | Me | Cl | $CH_2Ph[4-Ph(4-CF_3)]$ | Me |
| G-2280 | Me | Cl | $CH_2Ph(2,4-Cl_2)$ | Me |
| G-2281 | Me | Cl | $CH_2Ph[2,5-(CF_3)_2]$ | Me |
| G-2282 | Me | Cl | $CH_2Ph(3,4-Cl_2)$ | Me |

TABLE 1172

| Compound Number | $R^3$ | $R^4$ | $R^5$ | $R^{11}$ |
|---|---|---|---|---|
| G-2283 | Me | Cl | $CH_2Ph(3-CF_3-4-F)$ | Me |
| G-2284 | Me | Cl | $CH_2Ph(3-CF_3-4-Cl)$ | Me |
| G-2285 | Me | Cl | $CH_2Ph(3-F-4-CF_3)$ | Me |
| G-2286 | Me | Cl | $CH_2Ph(2,4,6-F_3)$ | Me |
| G-2287 | Me | Cl | $CH_2Ph(3,4,5-F_3)$ | Me |
| G-2288 | Me | Cl | $CH_2Ph(2,3,4-F_3)$ | Me |
| G-2289 | Me | Cl | $CH_2Ph(3,4,5-Cl_3)$ | Me |
| G-2290 | Me | Cl | $CH_2CH_2Ph$ | Me |
| G-2291 | Me | Cl | $CH_2CH_2Ph(4-F)$ | Me |
| G-2292 | Me | Cl | $CH_2CH_2Ph(4-Cl)$ | Me |
| G-2293 | Me | Cl | $CH_2CH_2Ph(4-Br)$ | Me |
| G-2294 | Me | Cl | $CH_2CH_2Ph[4-(t-Bu)]$ | Me |
| G-2295 | Me | Cl | $CH_2CH_2Ph(2-CF_3)$ | Me |
| G-2296 | Me | Cl | $CH_2CH_2Ph(3-CF_3)$ | Me |
| G-2297 | Me | Cl | $CH_2CH_2Ph(4-CF3)$ | Me |
| G-2298 | Me | Cl | $CH_2CH_2Ph[4-CF(CF_3)_2]$ | Me |
| G-2299 | Me | Cl | $CH_2CH_2Ph[4-(c-Pr)]$ | Me |
| G-2300 | Me | Cl | $CH_2CH_2Ph\{4-[c-Pr(2,2-F_2)]\}$ | Me |
| G-2301 | Me | Cl | $CH_2CH_2Ph(4-OMe)$ | Me |
| G-2302 | Me | Cl | $CH_2CH_2Ph(3-OCF_3)$ | Me |
| G-2303 | Me | Cl | $CH_2CH_2Ph(4-OCHF_2)$ | Me |
| G-2304 | Me | Cl | $CH_2CH_2Ph(4-OCF_3)$ | Me |
| G-2305 | Me | Cl | $CH_2CH_2Ph(4-SMe)$ | Me |
| G-2306 | Me | Cl | $CH_2CH_2Ph(4-SCHF_2)$ | Me |

TABLE 1172-continued

| Compound Number | $R^3$ | $R^4$ | $R^5$ | $R^{11}$ |
|---|---|---|---|---|
| G-2307 | Me | Cl | $CH_2CH_2Ph(4\text{-}SCF_3)$ | Me |
| G-2308 | Me | Cl | $CH_2CH_2Ph[4\text{-}S(=O)Me]$ | Me |
| G-2309 | Me | Cl | $CH_2CH_2Ph[4\text{-}S(=O)CF_3]$ | Me |
| G-2310 | Me | Cl | $CH_2CH_2Ph[4\text{-}S(=O)_2Me]$ | Me |
| G-2311 | Me | Cl | $CH_2CH_2Ph[4\text{-}S(=O)_2CF_3]$ | Me |
| G-2312 | Me | Cl | $CH_2CH_2Ph(4\text{-}CH_2SMe)$ | Me |
| G-2313 | Me | Cl | $CH_2CH_2Ph(4\text{-}CH_2SCF_3)$ | Me |
| G-2314 | Me | Cl | $CH_2CH_2Ph[4\text{-}OS(=O)_2Me]$ | Me |
| G-2315 | Me | Cl | $CH_2CH_2Ph[4\text{-}OS(=O)_2CF_3]$ | Me |
| G-2316 | Me | Cl | $CH_2CH_2Ph[4\text{-}Ph(4\text{-}CF_3)]$ | Me |
| G-2317 | Me | Cl | $CH_2CH_2Ph(4\text{-}CH_2Ph)$ | Me |
| G-2318 | Me | Cl | $CH_2CH_2Ph(4\text{-}OCH_2Ph)$ | Me |
| G-2319 | Me | Cl | $CH_2CH_2Ph(4\text{-}CN)$ | Me |
| G-2320 | Me | Cl | $CH_2CH_2Ph(4\text{-}NO_2)$ | Me |
| G-2321 | Me | Cl | $CH_2CH_2Ph(2,4\text{-}Cl_2)$ | Me |
| G-2322 | Me | Cl | $CH_2CH_2Ph(3,4\text{-}Cl_2)$ | Me |
| G-2323 | Me | Cl | $CH_2CH_2Ph(3\text{-}CF_3\text{-}4\text{-}F)$ | Me |
| G-2324 | Me | Cl | $CH_2CH_2Ph(2\text{-}CF_3\text{-}4\text{-}F)$ | Me |
| G-2325 | Me | Cl | $CH_2CH_2Ph(3\text{-}F\text{-}4\text{-}CF_3)$ | Me |
| G-2326 | Me | Cl | $CH_2CH_2Ph(2\text{-}F\text{-}4\text{-}CF_3)$ | Me |

TABLE 1173

| Compound Number | $R^3$ | $R^4$ | $R^5$ | $R^{11}$ |
|---|---|---|---|---|
| G-2327 | Me | Cl | $CH_2CH_2Ph(3\text{-}Cl\text{-}4\text{-}OCHF_2)$ | Me |
| G-2328 | Me | Cl | $CH_2CH_2Ph(3,4,5\text{-}Cl_3)$ | Me |
| G-2329 | Me | Cl | $CH_2CH_2Ph(2,3,4\text{-}F_3)$ | Me |
| G-2330 | Me | Cl | $CH_2CH_2Ph(2,4,5\text{-}F_3)$ | Me |
| G-2331 | Me | Cl | $CH_2CH_2Ph(3,4,5\text{-}F_3)$ | Me |
| G-2332 | Me | Cl | $CH_2CH_2Ph(2,4,6\text{-}F_3)$ | Me |
| G-2333 | Me | Cl | $CH_2CH_2CH_2Ph$ | Me |
| G-2334 | Me | Cl | $CH_2CH_2CH_2Ph(3\text{-}CF_3)$ | Me |
| G-2335 | Me | Cl | $CH_2CH_2CH_2Ph(4\text{-}CF_3)$ | Me |
| G-2336 | Me | Cl | $CH_2CH_2CH_2Ph(4\text{-}F)$ | Me |
| G-2337 | Me | Cl | $CH_2CH_2CH_2Ph[4\text{-}(t\text{-}Bu)]$ | Me |
| G-2338 | Me | Cl | $CH_2CH_2CH_2Ph(4\text{-}CN)$ | Me |
| G-2339 | Me | Cl | $CH_2CH_2CH_2Ph(4\text{-}CF_3)$ | Me |
| G-2340 | Me | Cl | $CH_2CH_2CH_2Ph(4\text{-}OCHF_2)$ | Me |
| G-2341 | Me | Cl | $CH_2CH_2CH_2Ph(4\text{-}OCF_3)$ | Me |
| G-2342 | Me | Cl | $CH_2CH_2CH_2Ph(4\text{-}SCHF_2)$ | Me |
| G-2343 | Me | Cl | $CH_2CH_2CH_2Ph(4\text{-}SCF_3)$ | Me |
| G-2344 | Me | Cl | $CH_2CH_2CH_2Ph[4\text{-}CF(CF_3)_2]$ | Me |
| G-2345 | Me | Cl | $CH_2CH_2CH_2Ph(3,4,5\text{-}F_3)$ | Me |
| G-2346 | Me | Cl | $CH_2CH_2CH_2Ph(2,4,6\text{-}F_3)$ | Me |
| G-2347 | Me | Cl | $CH_2CH_2CH_2CH_2Ph$ | Me |
| G-2348 | Me | Cl | $CH_2CH_2CH_2CH_2Ph(4\text{-}F)$ | Me |
| G-2349 | Me | Cl | $CH_2CH_2CH_2CH_2Ph(4\text{-}CF_3)$ | Me |
| G-2350 | Me | Cl | $CH_2CH_2CH_2CH_2Ph(4\text{-}OCF_3)$ | Me |
| G-2351 | Me | Cl | $CH_2CH_2CH_2CH_2Ph(4\text{-}SCF_3)$ | Me |
| G-2352 | Me | Cl | $CH_2CH_2CH_2CH_2CH_2Ph$ | Me |
| G-2353 | Me | Cl | $CH_2CH_2CH_2CH_2CH_2CH_2Ph$ | Me |
| G-2354 | Me | Cl | $CH_2CF_2Ph(4\text{-}F)$ | Me |
| G-2355 | Me | Cl | $CH_2CF_2Ph(4\text{-}CF_3)$ | Me |
| G-2356 | Me | Cl | $CH_2CF_2Ph(3,4,5\text{-}F_3)$ | Me |
| G-2357 | Me | Me | $CH_2CH_2SCHF_2$ | Me |
| G-2358 | Me | Me | $CH_2CH_2CH_2SCHF_2$ | Me |
| G-2359 | Me | Me | $CH_2CH_2CH_2CH_2SCHF_2$ | Me |
| G-2360 | Me | Me | $CH_2CH_2CH_2CH_2CH_2SCHF_2$ | Me |
| G-2361 | Me | Me | $CH_2CH_2CH_2CH_2CH_2CH_2SCHF_2$ | Me |
| G-2362 | Me | Me | $CH_2CH_2CH_2CH_2CH_2CH_2CH_2SCHF_2$ | Me |
| G-2363 | Me | Me | $CH_2CH_2SCF_3$ | Me |
| G-2364 | Me | Me | $CH_2CH_2CH_2SCF_3$ | Me |
| G-2365 | Me | Me | $CH_2CH_2CH_2CH_2SCF_3$ | Me |
| G-2366 | Me | Me | $CH_2CH_2CH_2CH_2CH_2SCF_3$ | Me |
| G-2367 | Me | Me | $CH_2CH_2CH_2CH_2CH_2CH_2SCF_3$ | Me |
| G-2368 | Me | Me | $CH_2CH_2CH_2CH_2CH_2CH_2CH_2SCF_3$ | Me |
| G-2369 | Me | Me | $CH_2CH_2CH_2CH_2CH_2CH_2CH_2CH_2SCF_3$ | Me |
| G-2370 | Me | Me | $CH_2CH(Me)SCF_3$ | Me |

TABLE 1174

| Compound Number | $R^3$ | $R^4$ | $R^5$ | $R^{11}$ |
|---|---|---|---|---|
| G-2371 | Me | Me | $CH(Me)CH_2SCF_3$ | Me |
| G-2372 | Me | Me | $CH_2CH_2CH(Me)SCF_3$ | Me |
| G-2373 | Me | Me | $CH_2CH(Me)CH_2SCF_3$ | Me |
| G-2374 | Me | Me | $CH(Me)CH_2CH_2SCF_3$ | Me |
| G-2375 | Me | Me | $CH_2CH_2CH_2CH(Me)SCF_3$ | Me |
| G-2376 | Me | Me | $CH_2CH_2CH(Me)CH_2SCF_3$ | Me |
| G-2377 | Me | Me | $CH_2CH(Me)CH_2CH_2SCF_3$ | Me |
| G-2378 | Me | Me | $CH(Me)CH_2CH_2CH_2SCF_3$ | Me |
| G-2379 | Me | Me | $CH_2CH_2NHS(=O)_2CF_3$ | Me |
| G-2380 | Me | Me | $CH_2CH_2CH_2NHS(=O)_2CF_3$ | Me |
| G-2381 | Me | Me | $CH_2CH_2CH_2CH_2NHS(=O)_2CF_3$ | Me |
| G-2382 | Me | Me | $CH_2CH_2CH_2CH_2CH_2NHS(=O)_2CF_3$ | Me |
| G-2383 | Me | Me | $CH_2CH_2N(Me)S(=O)_2CF_3$ | Me |
| G-2384 | Me | Me | $CH_2CH_2N(Et)S(=O)_2CF_3$ | Me |
| G-2385 | Me | Me | $CH_2CH_2N(CH_2CN)S(=O)_2CF_3$ | Me |
| G-2386 | Me | Me | $CH_2CH_2N(CH_2OMe)S(=O)_2CF_3$ | Me |
| G-2387 | Me | Me | $CH_2CH_2CH_2N(Me)S(=O)_2CF_3$ | Me |
| G-2388 | Me | Me | $CH_2CH_2CH_2N(Et)S(=O)_2CF_3$ | Me |
| G-2389 | Me | Me | $CH_2CH_2CH_2N(CH_2CN)S(=O)_2CF_3$ | Me |
| G-2390 | Me | Me | $CH_2CH_2CH_2N(CH_2OMe)S(=O)_2CF_3$ | Me |
| G-2391 | Me | Me | $CH_2CH_2CH_2CH_2N(Me)S(=O)_2CF_3$ | Me |
| G-2392 | Me | Me | $CH_2CH_2CH_2CH_2N(Et)S(=O)_2CF_3$ | Me |
| G-2393 | Me | Me | $CH_2CH_2CH_2CH_2N(CH_2CN)S(=O)_2CF_3$ | Me |
| G-2394 | Me | Me | $CH_2CH_2CH_2CH_2N(CH_2OMe)S(=O)_2CF_3$ | Me |
| G-2395 | Me | Me | $CH_2CH(Me)NHS(=O)_2CF_3$ | Me |
| G-2396 | Me | Me | $CH(Me)CH_2NHS(=O)_2CF_3$ | Me |
| G-2397 | Me | Me | $CH_2CH_2CH(Me)NHS(=O)_2CF_3$ | Me |
| G-2398 | Me | Me | $CH_2CH(Me)CH_2NHS(=O)_2CF_3$ | Me |
| G-2399 | Me | Me | $CH(Me)CH_2CH_2NHS(=O)_2CF_3$ | Me |
| G-2400 | Me | Me | $CH_2CH(Me)N(Me)S(=O)_2CF_3$ | Me |
| G-2401 | Me | Me | $CH(Me)CH_2N(Me)S(=O)_2CF_3$ | Me |
| G-2402 | Me | Me | $CH_2CH_2CH(Me)N(Me)S(=O)_2CF_3$ | Me |
| G-2403 | Me | Me | $CH_2CH(Me)CH_2N(Me)S(=O)_2CF_3$ | Me |
| G-2404 | Me | Me | $CH(Me)CH_2CH_2N(Me)S(=O)_2CF_3$ | Me |
| G-2405 | Me | Me | $CH_2Ph$ | Me |
| G-2406 | Me | Me | $CH_2Ph(2\text{-}CF_3)$ | Me |
| G-2407 | Me | Me | $CH_2Ph(3\text{-}CF_3)$ | Me |
| G-2408 | Me | Me | $CH_2Ph(4\text{-}CF_3)$ | Me |
| G-2409 | Me | Me | $CH_2Ph(2\text{-}OCF_3)$ | Me |
| G-2410 | Me | Me | $CH_2Ph(3\text{-}OCF_3)$ | Me |
| G-2411 | Me | Me | $CH_2Ph(4\text{-}OCF_3)$ | Me |
| G-2412 | Me | Me | $CH_2Ph(2\text{-}SCF_3)$ | Me |
| G-2413 | Me | Me | $CH_2Ph(3\text{-}SCF_3)$ | Me |
| G-2414 | Me | Me | $CH_2Ph(4\text{-}SCF_3)$ | Me |

TABLE 1175

| Compound Number | $R^3$ | $R^4$ | $R^5$ | $R^{11}$ |
|---|---|---|---|---|
| G-2415 | Me | Me | $CH_2Ph(3\text{-}CH_2SCF_3)$ | Me |
| G-2416 | Me | Me | $CH_2Ph(4\text{-}F)$ | Me |
| G-2417 | Me | Me | $CH_2Ph(4\text{-}Cl)$ | Me |
| G-2418 | Me | Me | $CH_2Ph(4\text{-}Br)$ | Me |
| G-2419 | Me | Me | $CH_2Ph(4\text{-}Me)$ | Me |
| G-2420 | Me | Me | $CH_2Ph[4\text{-}(t\text{-}Bu)]$ | Me |
| G-2421 | Me | Me | $CH_2Ph(4\text{-}CN)$ | Me |
| G-2422 | Me | Me | $CH_2Ph(4\text{-}NO_2)$ | Me |
| G-2423 | Me | Me | $CH_2Ph(4\text{-}OCHF_2)$ | Me |
| G-2424 | Me | Me | $CH_2Ph(4\text{-}SCHF_2)$ | Me |
| G-2425 | Me | Me | $CH_2Ph(4\text{-}CH_2SCF_3)$ | Me |
| G-2426 | Me | Me | $CH_2Ph[4\text{-}CF(CF_3)_2]$ | Me |
| G-2427 | Me | Me | $CH_2Ph(4\text{-}CH_2SCF_3)$ | Me |
| G-2428 | Me | Me | $CH_2Ph[4\text{-}Ph(4\text{-}CF_3)]$ | Me |
| G-2429 | Me | Me | $CH_2Ph(2,4\text{-}Cl_2)$ | Me |
| G-2430 | Me | Me | $CH_2Ph[2,5\text{-}(CF_3)_2]$ | Me |
| G-2431 | Me | Me | $CH_2Ph(3,4\text{-}Cl_2)$ | Me |
| G-2432 | Me | Me | $CH_2Ph(3\text{-}CF_3\text{-}4\text{-}F)$ | Me |
| G-2433 | Me | Me | $CH_2Ph(3\text{-}CF_3\text{-}4\text{-}Cl)$ | Me |
| G-2434 | Me | Me | $CH_2Ph(3\text{-}F\text{-}4\text{-}CF_3)$ | Me |
| G-2435 | Me | Me | $CH_2Ph(2,4,6\text{-}F_3)$ | Me |
| G-2436 | Me | Me | $CH_2Ph(3,4,5\text{-}F_3)$ | Me |
| G-2437 | Me | Me | $CH_2Ph(2,3,4\text{-}F_3)$ | Me |

TABLE 1175-continued

| Compound Number | $R^3$ | $R^4$ | $R^5$ | $R^{11}$ |
|---|---|---|---|---|
| G-2438 | Me | Me | $CH_2Ph(3,4,5-Cl_3)$ | Me |
| G-2439 | Me | Me | $CH_2CH_2Ph$ | Me |
| G-2440 | Me | Me | $CH_2CH_2Ph(4-F)$ | Me |
| G-2441 | Me | Me | $CH_2CH_2Ph(4-Cl)$ | Me |
| G-2442 | Me | Me | $CH_2CH_2Ph(4-Br)$ | Me |
| G-2443 | Me | Me | $CH_2CH_2Ph[4-(t-Bu)]$ | Me |
| G-2444 | Me | Me | $CH_2CH_2Ph(2-CF_3)$ | Me |
| G-2445 | Me | Me | $CH_2CH_2Ph(3-CF_3)$ | Me |
| G-2446 | Me | Me | $CH_2CH_2Ph(4-CF_3)$ | Me |
| G-2447 | Me | Me | $CH_2CH_2Ph[4-CF(CF_3)_2]$ | Me |
| G-2448 | Me | Me | $CH_2CH_2Ph[4-(c-Pr)]$ | Me |
| G-2449 | Me | Me | $CH_2CH_2Ph\{4-[c-Pr(2,2-F_2)]\}$ | Me |
| G-2450 | Me | Me | $CH_2CH_2Ph(4-OMe)$ | Me |
| G-2451 | Me | Me | $CH_2CH_2Ph(3-OCF_3)$ | Me |
| G-2452 | Me | Me | $CH_2CH_2Ph(4-OCHF_2)$ | Me |
| G-2453 | Me | Me | $CH_2CH_2Ph(4-OCF_3)$ | Me |
| G-2454 | Me | Me | $CH_2CH_2Ph(4-SMe)$ | Me |
| G-2455 | Me | Me | $CH_2CH_2Ph(4-SCHF_2)$ | Me |
| G-2456 | Me | Me | $CH_2CH_2Ph(4-SCF_3)$ | Me |
| G-2457 | Me | Me | $CH_2CH_2Ph[4-S(=O)Me]$ | Me |
| G-2458 | Me | Me | $CH_2CH_2Ph[4-S(=O)CF_3]$ | Me |

TABLE 1176

| Compound Number | $R^3$ | $R^4$ | $R^5$ | $R^{11}$ |
|---|---|---|---|---|
| G-2459 | Me | Me | $CH_2CH_2Ph[4-S(=O)_2Me]$ | Me |
| G-2460 | Me | Me | $CH_2CH_2Ph[4-S(=O)_2CF_3]$ | Me |
| G-2461 | Me | Me | $CH_2CH_2Ph(4-CH_2SMe)$ | Me |
| G-2462 | Me | Me | $CH_2CH_2Ph(4-CH_2SCF_3)$ | Me |
| G-2463 | Me | Me | $CH_2CH_2Ph[4-OS(=O)_2Me]$ | Me |
| G-2464 | Me | Me | $CH_2CH_2Ph[4-OS(=O)_2CF_3]$ | Me |
| G-2465 | Me | Me | $CH_2CH_2Ph[4-Ph(4-CF_3)]$ | Me |
| G-2466 | Me | Me | $CH_2CH_2Ph(4-CH_2Ph)$ | Me |
| G-2467 | Me | Me | $CH_2CH_2Ph(4-OCH_2Ph)$ | Me |
| G-2468 | Me | Me | $CH_2CH_2Ph(4-CN)$ | Me |
| G-2469 | Me | Me | $CH_2CH_2Ph(4-NO_2)$ | Me |
| G-2470 | Me | Me | $CH_2CH_2Ph(2,4-Cl_2)$ | Me |
| G-2471 | Me | Me | $CH_2CH_2Ph(3,4-Cl_2)$ | Me |
| G-2472 | Me | Me | $CH_2CH_2Ph(3-CF_3-4-F)$ | Me |
| G-2473 | Me | Me | $CH_2CH_2Ph(2-CF_3-4-F)$ | Me |
| G-2474 | Me | Me | $CH_2CH_2Ph(3-F-4-CF_3)$ | Me |
| G-2475 | Me | Me | $CH_2CH_2Ph(2-F-4-CF_3)$ | Me |
| G-2476 | Me | Me | $CH_2CH_2Ph(3-Cl-4-OCHF_2)$ | Me |
| G-2477 | Me | Me | $CH_2CH_2Ph(3,4,5-Cl_3)$ | Me |
| G-2478 | Me | Me | $CH_2CH_2Ph(2,3,4-F_3)$ | Me |
| G-2479 | Me | Me | $CH_2CH_2Ph(2,4,5-F_3)$ | Me |
| G-2480 | Me | Me | $CH_2CH_2Ph(3,4,5-F_3)$ | Me |
| G-2481 | Me | Me | $CH_2CH_2Ph(2,4,6-F_3)$ | Me |
| G-2482 | Me | Me | $CH_2CH_2CH_2Ph$ | Me |
| G-2483 | Me | Me | $CH_2CH_2CH_2Ph(3-CF_3)$ | Me |
| G-2484 | Me | Me | $CH_2CH_2CH_2Ph(4-CF_3)$ | Me |
| G-2485 | Me | Me | $CH_2CH_2CH_2Ph(4-F)$ | Me |
| G-2486 | Me | Me | $CH_2CH_2CH_2Ph[4-(t-Bu)]$ | Me |
| G-2487 | Me | Me | $CH_2CH_2CH_2Ph(4-CN)$ | Me |
| G-2488 | Me | Me | $CH_2CH_2CH_2Ph(4-CF_3)$ | Me |
| G-2489 | Me | Me | $CH_2CH_2CH_2Ph(4-OCHF_2)$ | Me |
| G-2490 | Me | Me | $CH_2CH_2CH_2Ph(4-OCF_3)$ | Me |
| G-2491 | Me | Me | $CH_2CH_2CH_2Ph(4-SCHF_2)$ | Me |
| G-2492 | Me | Me | $CH_2CH_2CH_2Ph(4-SCF_3)$ | Me |
| G-2493 | Me | Me | $CH_2CH_2CH_2Ph[4-CF(CF_3)_2]$ | Me |
| G-2494 | Me | Me | $CH_2CH_2CH_2Ph(3,4,5-F_3)$ | Me |
| G-2495 | Me | Me | $CH_2CH_2CH_2Ph(2,4,6-F_3)$ | Me |
| G-2496 | Me | Me | $CH_2CH_2CH_2CH_2Ph$ | Me |
| G-2497 | Me | Me | $CH_2CH_2CH_2CH_2Ph(4-F)$ | Me |
| G-2498 | Me | Me | $CH_2CH_2CH_2CH_2Ph(4-CF_3)$ | Me |
| G-2499 | Me | Me | $CH_2CH_2CH_2CH_2Ph(4-OCF_3)$ | Me |
| G-2500 | Me | Me | $CH_2CH_2CH_2CH_2Ph(4-SCF_3)$ | Me |
| G-2501 | Me | Me | $CH_2CH_2CH_2CH_2CH_2Ph$ | Me |
| G-2502 | Me | Me | $CH_2CH_2CH_2CH_2CH_2CH_2Ph$ | Me |

TABLE 1177

| Compound Number | $R^3$ | $R^4$ | $R^5$ | $R^{11}$ |
|---|---|---|---|---|
| G-2503 | Me | Me | $CH_2CF_2Ph(4-F)$ | Me |
| G-2504 | Me | Me | $CH_2CF_2Ph(4-CF_3)$ | Me |
| G-2505 | Me | Me | $CH_2CF_2Ph(3,4,5-F_3)$ | Me |
| G-2506 | Cl | F | Me | Et |
| G-2507 | Cl | F | Et | Et |
| G-2508 | Cl | F | n-Pr | Et |
| G-2509 | Cl | F | i-Pr | Et |
| G-2510 | Cl | F | n-Bu | Et |
| G-2511 | Cl | F | n-Pen | Et |
| G-2512 | Cl | F | n-Hex | Et |
| G-2513 | Cl | F | n-Heptyl | Et |
| G-2514 | Cl | F | n-Octyl | Et |
| G-2515 | Cl | F | n-Nonyl | Et |
| G-2516 | Cl | F | n-Decyl | Et |
| G-2517 | Cl | F | c-Pr | Et |
| G-2518 | Cl | F | c-Pen | Et |
| G-2519 | Cl | F | C-Hex | Et |
| G-2520 | Cl | F | $CH_2C(Me)=CH_2$ | Et |
| G-2521 | Cl | F | $CH_2CH_2CH=CH_2$ | Et |
| G-2522 | Cl | F | $CH_2CH_2CH=C(CH_3)_2$ | Et |
| G-2523 | Cl | F | $CH_2CH_2CH_2CH=CH_2$ | Et |
| G-2524 | Cl | F | $CH_2CH_2CH_2CH=C(CH_3)_2$ | Et |
| G-2525 | Cl | F | $CH_2CH_2CH_2CH_2CH=CH_2$ | Et |
| G-2526 | Cl | F | $CH_2CH_2CH_2CH_2CH=C(CH_3)_2$ | Et |
| G-2527 | Cl | F | $CH_2CH_2CH \equiv CH$ | Et |
| G-2528 | Cl | F | $CH_2CH_2CH_2CH \equiv CH$ | Et |
| G-2529 | Cl | F | $CH_2CH_2CH_2CH_2CH \equiv CH$ | Et |
| G-2530 | Cl | F | $CH_2CH_2CH_2Cl$ | Et |
| G-2531 | Cl | F | $CH_2CH_2CH_2Br$ | Et |
| G-2532 | Cl | F | $CH_2CH_2CH_2CH_2Cl$ | Et |
| G-2533 | Cl | F | $CH_2CH_2CH_2CH_2Br$ | Et |
| G-2534 | Cl | F | $CH_2CH_2CH_2CH_2CH_2Cl$ | Et |
| G-2535 | Cl | F | $CH_2CH_2CH_2CH_2CH_2Br$ | Et |
| G-2536 | Cl | F | $CH_2CH_2CH_2CH_2CH_2CH_2Cl$ | Et |
| G-2537 | Cl | F | $CH_2CH_2CH_2CH_2CH_2CH_2Br$ | Et |
| G-2538 | Cl | F | $CH_2CH_2CH_2CH_2CH_2CH_2CH_2Cl$ | Et |
| G-2539 | Cl | F | $CH_2CH_2CH_2CH_2CH_2CH_2CH_2Br$ | Et |
| G-2540 | Cl | F | $CH_2CH_2CH_2CH_2CH_2CH_2CH_2CH_2Br$ | Et |
| G-2541 | Cl | F | $CH_2CH(Me)CH_2Cl$ | Et |
| G-2542 | Cl | F | $CH_2CH(Me)CH_2Br$ | Et |
| G-2543 | Cl | F | $CH_2CH_2CH(Me)CH_2CH_2Cl$ | Et |
| G-2544 | Cl | F | $CH_2CH_2CH(Me)CH_2CH_2Br$ | Et |
| G-2545 | Cl | F | $CH_2CH_2CF=CF_2$ | Et |
| G-2546 | Cl | F | $CH_2CH=C(Cl)CF_3$ | Et |

TABLE 1178

| Compound Number | $R^3$ | $R^4$ | $R^5$ | $R^{11}$ |
|---|---|---|---|---|
| G-2547 | Cl | F | $CH_2CH_2CH_2CF=CF_2$ | Et |
| G-2548 | Cl | F | $CH_2CH_2CH_2CH_2CF=CF_2$ | Et |
| G-2549 | Cl | F | $CH_2CH_2CH_2CH_2CH_2CF=CF_2$ | Et |
| G-2550 | Cl | F | $CH_2(t-Bu)$ | Et |
| G-2551 | Cl | F | $CH_2CH_2(t-Bu)$ | Et |
| G-2552 | Cl | F | $CH_2CH_2CH_2(t-Bu)$ | Et |
| G-2553 | Cl | F | $CH_2CH_2CH_2CH_2(t-Bu)$ | Et |
| G-2554 | Cl | F | $CH_2CH_2CH_2CH_2CH_2(t-Bu)$ | Et |
| G-2555 | Cl | F | $CH_2CH_2CH_2CH_2CH_2CH_2(t-Bu)$ | Et |
| G-2556 | Cl | F | $CH_2CF_3$ | Et |
| G-2557 | Cl | F | $CH_2CH_2CF_3$ | Et |
| G-2558 | Cl | F | $CH_2CH_2CH_2CF_3$ | Et |
| G-2559 | Cl | F | $CH_2CH_2CH_2CH_2CF_3$ | Et |
| G-2560 | Cl | F | $CH_2CH_2CH_2CH_2CH_2CF_3$ | Et |
| G-2561 | Cl | F | $CH_2CH_2CH_2CH_2CH_2CH_2CF_3$ | Et |
| G-2562 | Cl | F | $CH_2CH_2CH_2CH_2CH_2CH_2CH_2CF_3$ | Et |
| G-2563 | Cl | F | $CH_2CF_2CF_3$ | Et |
| G-2564 | Cl | F | $CF_2CHFCF_3$ | Et |
| G-2565 | Cl | F | $CF_2CF_2CF_3$ | Et |
| G-2566 | Cl | F | $CH_2CF_2CF_2CF_3$ | Et |
| G-2567 | Cl | F | $CH_2CF_2CF_2CF_2CF_3$ | Et |
| G-2568 | Cl | F | $CH_2CF_2CF_2CF_2CHF_2$ | Et |
| G-2569 | Cl | F | $CH(CF_3)CF_3$ | Et |
| G-2570 | Cl | F | $CH_2CF(CF_3)CF_3$ | Et |

TABLE 1178-continued

| Compound Number | $R^3$ | $R^4$ | $R^5$ | $R^{11}$ |
|---|---|---|---|---|
| G-2571 | Cl | F | $CH_2CF_2CF(CF_3)CF_3$ | Et |
| G-2572 | Cl | F | $CH_2CF(CF_3)CF_2CF_3$ | Et |
| G-2573 | Cl | F | $CH_2CF_2CF_2CF(CF_3)CF_3$ | Et |
| G-2574 | C | F | $CH_2CF_2CF(CF_3)CF_2CF_3$ | Et |
| G-2575 | Cl | F | $CH_2CF(CF_3)CF_2CF_2CF_3$ | Et |
| G-2576 | Cl | F | $CH_2$(c-Pr) | Et |
| G-2577 | Cl | F | $CH_2$[c-Pr(1-Me)] | Et |
| G-2578 | Cl | F | $CH_2$[c-Pr(1-Ph)] | Et |
| G-2579 | Cl | F | $CH_2$[C-Pr(1-$NH_2$)] | Et |
| G-2580 | Cl | F | $CH_2$[C-Pr(1-NHC(═O)O(t-Bu)] | Et |
| G-2581 | Cl | F | $CH_2${c-Pr[1-NHS(═O)$_2CF_3$]} | Et |
| G-2582 | Cl | F | $CH_2${c-Pr[1-Ph(4-$CF_3$)]} | Et |
| G-2583 | Cl | F | $CH_2${C-Pr[1-Ph(3,4,5-$F_3$)]} | Et |
| G-2584 | Cl | F | $CH_2${C-Hex[4-(t-Bu)]} | Et |
| G-2585 | Cl | F | $CH_2$[c-Hex(4-$CF_3$)] | Et |
| G-2586 | Cl | F | $CH_2CH_2$(c-Pr) | Et |
| G-2587 | Cl | F | $CH_2CH_2$(c-Hex) | Et |
| G-2588 | Cl | F | $CH_2CH_2$[C-Hex(4-$CF_3$)] | Et |
| G-2589 | Cl | F | $CH_2CH_2$[c-Hex(4-$SCF_3$)] | Et |
| G-2590 | Cl | F | $CH_2CH_2CH_2$(c-Pr) | Et |

TABLE 1179

| Compound Number | $R^3$ | $R^4$ | $R^5$ | $R^{11}$ |
|---|---|---|---|---|
| G-2591 | Cl | F | $CH_2CH_2CH_2$(c-Hex) | Et |
| G-2592 | Cl | F | $CH_2CH_2CH_2${C-Hex[4-(t-Bu)]} | Et |
| G-2593 | Cl | F | $CH_2CH_2CH_2$[C-Hex(4-$CF_3$)] | Et |
| G-2594 | Cl | F | $CH_2CH_2CH_2$[c-Hex(4-$SCF_3$)] | Et |
| G-2595 | Cl | F | $CH_2CH_2CH_2CH_2$(C-Pr) | Et |
| G-2596 | Cl | F | $CH_2CH_2CH_2CH_2$(c-Hex) | Et |
| G-2597 | Cl | F | $CH_2CH_2CH_2CH_2$[c-Hex(4-$CF_3$)] | Et |
| G-2598 | Cl | F | $CH_2$[c-Pr(2,2-$F_2$)] | Et |
| G-2599 | Cl | F | $CH_2$[C-Hex(4,4-$F_2$)] | Et |
| G-2600 | Cl | F | $CH_2CH_2$[C-Pr(2,2-$F_2$)] | Et |
| G-2601 | Cl | F | $CH_2CH_2$[C-Hex(4,4-$F_2$)] | Et |
| G-2602 | Cl | F | $CH_2CH_2CH_2$[C-Pr(2,2-$F_2$)] | Et |
| G-2603 | Cl | F | $CH_2CH_2CH_2CH_2$[C-Pr(2,2-$F_2$)] | Et |
| G-2604 | Cl | F | $CH_2CH_2OH$ | Et |
| G-2605 | Cl | F | $CH_2CH_2CH_2OH$ | Et |
| G-2606 | Cl | F | $CH_2CH_2CH_2CH_2OH$ | Et |
| G-2607 | Cl | F | $CH_2CH_2CH_2CH_2CH_2OH$ | Et |
| G-2608 | Cl | F | $CH_2CH_2CH_2CH_2CH_2CH_2OH$ | Et |
| G-2609 | Cl | F | $CH_2$C(═O)Me | Et |
| G-2610 | Cl | F | $CH_2$CH(OH)Me | Et |
| G-2611 | Cl | F | $CH_2CH(OH)CF_3$ | Et |
| G-2612 | Cl | F | $CH_2C(OH)_2CF_3$ | Et |
| G-2613 | Cl | F | $CH_2C(CF_3)$═NOH | Et |
| G-2614 | Cl | F | $CH_2C(CF_3)$═NOMe | Et |
| G-2615 | Cl | F | $CH_2CH(CF_3)NH_2$ | Et |
| G-2616 | Cl | F | $CH_2CH(CF_3)NHSO_2CF_3$ | Et |
| G-2617 | Cl | F | $CH_2CH_2$OMe | Et |
| G-2618 | Cl | F | $CH_2CH_2CH_2$OMe | Et |
| G-2619 | Cl | F | $CH_2CH_2CH_2CH_2$OMe | Et |
| G-2620 | Cl | F | $CH_2CH_2CH_2CH_2CH_2$OMe | Et |
| G-2621 | Cl | F | $CH_2CH_2CH_2CH_2CH_2CH_2$OMe | Et |
| G-2622 | Cl | F | $CH_2CH_2OCHF_2$ | Et |
| G-2623 | Cl | F | $CH_2CH_2CH_2OCHF_2$ | Et |
| G-2624 | Cl | F | $CH_2CH_2CH_2CH_2OCHF_2$ | Et |
| G-2625 | Cl | F | $CH_2CH_2CH_2CH_2CH_2OCHF_2$ | Et |
| G-2626 | Cl | F | $CH_2CH_2CH_2CH_2CH_2CH_2OCHF_2$ | Et |
| G-2627 | Cl | F | $CH_2CH_2OCH_2CF_3$ | Et |
| G-2628 | Cl | F | $CH_2CH_2CH_2OCH_2CF_3$ | Et |
| G-2629 | Cl | F | $CH_2CH_2CH_2CH_2OCH_2CF_3$ | Et |
| G-2630 | Cl | F | $CH_2CH_2CH_2CH_2CH_2OCH_2CF_3$ | Et |
| G-2631 | Cl | F | $CH_2CH_2CH_2CH_2CH_2CH_2OCH_2CF_3$ | Et |
| G-2632 | Cl | F | $CH_2CH_2CH_2CH_2CH_2CH_2CH_2OCH_2CF_3$ | Et |
| G-2633 | Cl | F | $CH_2CH_2OC(CF_3)_3$ | Et |
| G-2634 | Cl | F | $CH_2CH_2CH_2OC(CF_3)_3$ | Et |

TABLE 1180

| Compound Number | $R^3$ | $R^4$ | $R^5$ | $R^{11}$ |
|---|---|---|---|---|
| G-2635 | Cl | F | $CH_2CH_2CH_2CH_2OC(CF_3)_3$ | Et |
| G-2636 | Cl | F | $CH_2CH_2CH_2CH_2CH_2OC(CF_3)_3$ | Et |
| G-2637 | Cl | F | $CF_2CHFOCF_2CF_2CF_3$ | Et |
| G-2638 | Cl | F | $CH_2CH_2$O(c-Pr) | Et |
| G-2639 | Cl | F | $CH_2CH_2$O(c-Pen) | Et |
| G-2640 | Cl | F | $CH_2CH_2$O(c-Hex) | Et |
| G-2641 | Cl | F | $CH_2CH_2CH_2$O(c-Pr) | Et |
| G-2642 | Cl | F | $CH_2CH_2CH_2$O(c-Pen) | Et |
| G-2643 | Cl | F | $CH_2CH_2CH_2$O(c-Hex) | Et |
| G-2644 | Cl | F | $CH_2CH_2CH_2CH_2$O(c-Pr) | Et |
| G-2645 | Cl | F | $CH_2CH_2CH_2CH_2$O(c-Pen) | Et |
| G-2646 | Cl | F | $CH_2CH_2CH_2CH_2$O(c-Hex) | Et |
| G-2647 | Cl | F | $CH_2CH_2$O[c-Pr(2,2-$F_2$)] | Et |
| G-2648 | Cl | F | $CH_2CH_2CH_2$O[c-Pr(2,2-$F_2$)] | Et |
| G-2649 | Cl | F | $CH_2CH_2CH_2CH_2$O[c-Pr(2,2-$F_2$)] | Et |
| G-2650 | Cl | F | $CH_2CH_2OCH_2CH_2OCH_3$ | Et |
| G-2651 | Cl | F | $CH_2CH_2OCH_2CH_2OCH_2CF_3$ | Et |
| G-2652 | Cl | F | $CH_2CF_2OCF_2CF_2OCF_3$ | Et |
| G-2653 | Cl | F | $CF_2CHFOCF_2CF_2OCF_3$ | Et |
| G-2654 | Cl | F | $CF_2CHFOCF_2CF(CF_3)OCF_2CF_2CF_3$ | Et |
| G-2655 | Cl | F | $CH_2CH_2SH$ | Et |
| G-2656 | Cl | F | $CH_2CH_2CH_2SH$ | Et |
| G-2657 | Cl | F | $CH_2CH_2CH_2CH_2SH$ | Et |
| G-2658 | Cl | F | $CH_2CH_2CH_2CH_2CH_2SH$ | Et |
| G-2659 | Cl | F | $CH_2CH_2CH_2CH_2CH_2CH_2SH$ | Et |
| G-2660 | Cl | F | $CH_2CH_2$S(t-Bu) | Et |
| G-2661 | Cl | F | $CH_2CH_2CH_2$S(t-Bu) | Et |
| G-2662 | Cl | F | $CH_2CH_2CH_2CH_2$S(t-Bu) | Et |
| G-2663 | Cl | F | $CH_2CH_2CH_2CH_2CH_2SCH_3$ | Et |
| G-2664 | Cl | F | $CH_2CH_2CH_2CH_2CH_2SCH(CH_3)_2$ | Et |
| G-2665 | Cl | F | $CH_2CH_2CH_2CH_2CH_2$S(t-Bu) | Et |
| G-2666 | Cl | F | $CH_2CH_2CH_2CH_2CH_2CH_2SCH(CH_3)_2$ | Et |
| G-2667 | Cl | F | $CH_2CH_2CH_2CH_2CH_2CH_2$S(t-Bu) | Et |
| G-2668 | Cl | F | $CH_2CH_2CH_2CH_2CH_2CH_2CH_2$S(t-Bu) | Et |
| G-2669 | Cl | F | $CH_2CH_2SCHF_2$ | Et |
| G-2670 | Cl | F | $CH_2CH_2CH_2SCHF_2$ | Et |
| G-2671 | Cl | F | $CH_2CH_2CH_2CH_2SCHF_2$ | Et |
| G-2672 | Cl | F | $CH_2CH_2CH_2CH_2CH_2SCHF_2$ | Et |
| G-2673 | Cl | F | $CH_2CH_2CH_2CH_2CH_2CH_2SCHF_2$ | Et |
| G-2674 | Cl | F | $CH_2CH_2CH_2CH_2CH_2CH_2CH_2SCHF_2$ | Et |
| G-2675 | Cl | F | $CH_2CH_2SCF_3$ | Et |
| G-2676 | Cl | F | $CH_2CH_2CH_2SCF_3$ | Et |
| G-2677 | Cl | F | $CH_2CH_2CH_2CH_2SCF_3$ | Et |
| G-2678 | Cl | F | $CH_2CH_2CH_2CH_2CH_2SCF_3$ | Et |

TABLE 1181

| Compound Number | $R^3$ | $R^4$ | $R^5$ | $R^{11}$ |
|---|---|---|---|---|
| G-2679 | Cl | F | $CH_2CH_2CH_2CH_2CH_2CH_2SCF_3$ | Et |
| G-2680 | Cl | F | $CH_2CH_2CH_2CH_2CH_2CH_2CH_2SCF_3$ | Et |
| G-2681 | Cl | F | $CH_2CH_2CH_2CH_2CH_2CH_2CH_2CH_2SCF_3$ | Et |
| G-2682 | Cl | F | $CH_2$CH(Me)$SCF_3$ | Et |
| G-2683 | Cl | F | CH(Me)$CH_2SCF_3$ | Et |
| G-2684 | Cl | F | $CH_2CH_2$CH(Me)$SCF_3$ | Et |
| G-2685 | Cl | F | $CH_2$CH(Me)$CH_2SCF_3$ | Et |
| G-2686 | Cl | F | CH(Me)$CH_2CH_2SCF_3$ | Et |
| G-2687 | Cl | F | $CH_2CH_2CH_2$CH(Me)$SCF_3$ | Et |
| G-2688 | Cl | F | $CH_2CH_2$CH(Me)$CH_2SCF_3$ | Et |
| G-2689 | Cl | F | $CH_2$CH(Me)$CH_2CH_2SCF_3$ | Et |
| G-2690 | Cl | F | CH(Me)$CH_2CH_2CH_2SCF_3$ | Et |
| G-2691 | Cl | F | $CH_2CH_2SCH_2CF_3$ | Et |
| G-2692 | Cl | F | $CH_2CH_2CH_2SCH_2CF_3$ | Et |
| G-2693 | Cl | F | $CH_2CH_2CH_2CH_2SCH_2CF_3$ | Et |
| G-2694 | Cl | F | $CH_2CH_2CH_2CH_2CH_2SCH_2CF_3$ | Et |
| G-2695 | Cl | F | $CH_2CH_2CH_2CH_2CH_2CH_2SCH_2CF_3$ | Et |
| G-2696 | Cl | F | $CH_2CH_2CH_2CH_2CH_2CH_2CH_2SCH_2CF_3$ | Et |
| G-2697 | Cl | F | $CH_2CH_2SCH(CF_3)_2$ | Et |
| G-2698 | Cl | F | $CH_2CH_2CH_2SCH(CF_3)_2$ | Et |
| G-2699 | Cl | F | $CH_2CH_2CH_2CH_2SCH(CF_3)_2$ | Et |
| G-2700 | Cl | F | $CH_2CH_2CH_2CH_2CH_2SCH(CF_3)_2$ | Et |
| G-2701 | Cl | F | $CH_2CH_2CH_2CH_2CH_2CH_2SCH(CF_3)_2$ | Et |

TABLE 1181-continued

| Compound Number | $R^3$ | $R^4$ | $R^5$ | $R^{11}$ |
|---|---|---|---|---|
| G-2702 | Cl | F | $CH_2CH_2CH_2CH_2CH_2SCF_2CF_3$ | Et |
| G-2703 | Cl | F | $CH_2CH_2CH_2CH_2CH_2CH_2SCF_2CF_3$ | Et |
| G-2704 | Cl | F | $CH_2CH_2CH_2CH_2CH_2CH_2SCF(CF_3)_2$ | Et |
| G-2705 | Cl | F | $CH_2CH_2CH_2CH_2CH_2CH_2CH_2SCF(CF_3)_2$ | Et |
| G-2706 | Cl | F | $CH_2CH_2CH_2CH_2CH_2SCCl_3$ | Et |
| G-2707 | Cl | F | $CH_2CH_2CH_2CH_2CH_2CH_2SCCl_3$ | Et |
| G-2708 | Cl | F | $CH_2CH_2SCH_2CH{=}CH_2$ | Et |
| G-2709 | Cl | F | $CH_2CH_2CH_2SCH_2CH{=}CH_2$ | Et |
| G-2710 | Cl | F | $CH_2CH_2CH_2CH_2SCH_2CH{=}CH_2$ | Et |
| G-2711 | Cl | F | $CH_2CH_2SCF{=}CFCF_3$ | Et |
| G-2712 | Cl | F | $CH_2CH_2CH_2SCF{=}CFCF_3$ | Et |
| G-2713 | Cl | F | $CH_2CH_2CH_2CH_2SCF{=}CFCF_3$ | Et |
| G-2714 | Cl | F | $CH_2CH_2S$(c-Pr) | Et |
| G-2715 | Cl | F | $CH_2CH_2CH_2S$(c-Hex) | Et |
| G-2716 | Cl | F | $CH_2CH_2CH_2CH_2S$(c-Pr) | Et |
| G-2717 | Cl | F | $CH_2CH_2CH_2CH_2S$(c-Hex) | Et |
| G-2718 | Cl | F | $CH_2CH_2CH_2CH_2CH_2S$(c-Pr) | Et |
| G-2719 | Cl | F | $CH_2CH_2CH_2CH_2CH_2S$(c-Hex) | Et |
| G-2720 | Cl | F | $CH_2CH_2CH_2S$[c-Hex(4,4-$F_2$)] | Et |
| G-2721 | Cl | F | $CH_2CH_2CH_2CH_2S$[c-Hex(4,4-$F_2$)] | Et |
| G-2722 | Cl | F | $CH_2CH_2CH_2CH_2CH_2S$[c-Hex(4,4-$F_2$)] | Et |

TABLE 1182

| Compound Number | $R^3$ | $R^4$ | $R^5$ | $R^{11}$ |
|---|---|---|---|---|
| G-2723 | Cl | F | $CH_2CH_2CH_2SCH_2$(c-Pr) | Et |
| G-2724 | Cl | F | $CH_2CH_2CH_2SCH_2$(c-Hex) | Et |
| G-2725 | Cl | F | $CH_2CH_2CH_2CH_2SCH_2$(c-Pr) | Et |
| G-2726 | Cl | F | $CH_2CH_2CH_2CH_2SCH_2$(c-Hex) | Et |
| G-2727 | Cl | F | $CH_2CH_2CH_2CH_2CH_2SCH_2$(c-Pr) | Et |
| G-2728 | Cl | F | $CH_2CH_2CH_2CH_2CH_2SCH_2$(c-Hex) | Et |
| G-2729 | Cl | F | $CH_2CH_2CH_2SCH_2$[c-Hex(4,4-$F_2$)] | Et |
| G-2730 | Cl | F | $CH_2CH_2CH_2CH_2SCH_2$[c-Hex(4,4-$F_2$)] | Et |
| G-2731 | Cl | F | $CH_2CH_2CH_2CH_2CH_2SCH_2$[C-Hex(4,4-$F_2$)] | Et |
| G-2732 | Cl | F | $CH_2CH_2CH_2SCH_2SiMe_3$ | Et |
| G-2733 | Cl | F | $CH_2CH_2CH_2CH_2SCH_2SiMe_3$ | Et |
| G-2734 | Cl | F | $CH_2CH_2CH_2CH_2CH_2SCH_2SiMe_3$ | Et |
| G-2735 | Cl | F | $CH_2CH_2OCH_2CH_2SCH_3$ | Et |
| G-2736 | Cl | F | $CH_2CH_2OCH_2CH_2SCHF_2$ | Et |
| G-2737 | Cl | F | $CH_2CH_2OCH_2CH_2SCF_3$ | Et |
| G-2738 | Cl | F | $CH_2CH_2OCH_2CH_2SCH_2CF_3$ | Et |
| G-2739 | Cl | F | $CH_2CH_2CH_2S({=}O)$(t-Bu) | Et |
| G-2740 | Cl | F | $CH_2CH_2CH_2CH_2S({=}O)$(t-Bu) | Et |
| G-2741 | Cl | F | $CH_2CH_2CH_2CH_2CH_2CH_2S({=}O)$(t-Bu) | Et |
| G-2742 | Cl | F | $CH_2CH_2S({=}O)CHF_2$ | Et |
| G-2743 | Cl | F | $CH_2CH_2CH_2S({=}O)CHF_2$ | Et |
| G-2744 | Cl | F | $CH_2CH_2CH_2CH_2S({=}O)CHF_2$ | Et |
| G-2745 | Cl | F | $CH_2CH_2CH_2CH_2CH_2S({=}O)CHF_2$ | Et |
| G-2746 | Cl | F | $CH_2CH_2CH_2CH_2CH_2CH_2S({=}O)CHF_2$ | Et |
| G-2747 | Cl | F | $CH_2CH_2CH_2CH_2CH_2CH_2CH_2S({=}O)CHF_2$ | Et |
| G-2748 | Cl | F | $CH_2CH_2S({=}O)CF_3$ | Et |
| G-2749 | Cl | F | $CH_2CH_2CH_2S({=}O)CF_3$ | Et |
| G-2750 | Cl | F | $CH_2CH_2CH_2CH_2S({=}O)CF_3$ | Et |
| G-2751 | Cl | F | $CH_2CH_2CH_2CH_2CH_2S({=}O)CF_3$ | Et |
| G-2752 | Cl | F | $CH_2CH_2CH_2CH_2CH_2CH_2S({=}O)CF_3$ | Et |
| G-2753 | Cl | F | $CH_2CH_2CH_2CH_2CH_2CH_2CH_2S({=}O)CF_3$ | Et |
| G-2754 | Cl | F | $CH_2CH_2S({=}O)CH_2CF_3$ | Et |
| G-2755 | Cl | F | $CH_2CH_2CH_2S({=}O)CH_2CF_3$ | Et |
| G-2756 | Cl | F | $CH_2CH_2CH_2CH_2S({=}O)CH_2CF_3$ | Et |
| G-2757 | Cl | F | $CH_2CH_2CH_2CH_2CH_2S({=}O)CH_2CF_3$ | Et |
| G-2758 | Cl | F | $CH_2CH_2CH_2CH_2CH_2CH_2S({=}O)CH_2CF_3$ | Et |
| G-2759 | Cl | F | $CH_2CH_2CH_2CH_2CH_2CH_2CH_2S({=}O)CH_2CF_3$ | Et |
| G-2760 | Cl | F | $CH_2CH_2CH_2S({=}O)$(c-Pr) | Et |
| G-2761 | Cl | F | $CH_2CH_2CH_2CH_2S({=}O)$(c-Pr) | Et |
| G-2762 | Cl | F | $CH_2CH_2CH_2CH_2S({=}O)$(c-Pen) | Et |
| G-2763 | Cl | F | $CH_2CH_2CH_2CH_2S({=}O)$(c-Hex) | Et |
| G-2764 | Cl | F | $CH_2CH_2CH_2CH_2CH_2S({=}O)$(c-Pr) | Et |
| G-2765 | Cl | F | $CH_2CH_2CH_2CH_2CH_2S({=}O)$(c-Hex) | Et |
| G-2766 | Cl | F | $CH_2CH_2CH_2S({=}O)$[c-Hex(4,4-$F_2$)] | Et |

TABLE 1183

| Compound Number | $R^3$ | $R^4$ | $R^5$ | $R^{11}$ |
|---|---|---|---|---|
| G-2767 | Cl | F | $CH_2CH_2CH_2CH_2S({=}O)$[c-Hex(4,4-$F_2$)] | Et |
| G-2768 | Cl | F | $CH_2CH_2CH_2CH_2CH_2S({=}O)$[c-Hex(4,4-$F_2$)] | Et |
| G-2769 | Cl | F | $CH_2CH_2CH_2CH_2S({=}O)_2Me$ | Et |

TABLE 1183-continued

| Compound Number | $R^3$ | $R^4$ | $R^5$ | $R^{11}$ |
|---|---|---|---|---|
| G-2770 | Cl | F | $CH_2CH_2CH_2CH_2CH_2S(=O)_2Me$ | Et |
| G-2771 | Cl | F | $CH_2CH_2CH_2CH_2CH_2S(=O)_2$(t-Bu) | Et |
| G-2772 | Cl | F | $CH_2CH_2S(=O)_2CHF_2$ | Et |
| G-2773 | Cl | F | $CH_2CH_2CH_2S(=O)_2CHF_2$ | Et |
| G-2774 | Cl | F | $CH_2CH_2CH_2CH_2S(=O)_2CHF_2$ | Et |
| G-2775 | Cl | F | $CH_2CH_2CH_2CH_2CH_2S(=O)_2CHF_2$ | Et |
| G-2776 | Cl | F | $CH_2CH_2CH_2CH_2CH_2CH_2S(=O)_2CHF_2$ | Et |
| G-2777 | Cl | F | $CH_2CH_2S(=O)_2CF_3$ | Et |
| G-2778 | Cl | F | $CH_2CH_2CH_2S(=O)_2CF_3$ | Et |
| G-2779 | Cl | F | $CH_2CH_2CH_2CH_2S(=O)_2CF_3$ | Et |
| G-2780 | Cl | F | $CH_2CH_2CH_2CH_2CH_2S(=O)_2CF_3$ | Et |
| G-2781 | Cl | F | $CH_2CH_2CH_2CH_2CH_2CH_2S(=O)_2CF_3$ | Et |
| G-2782 | Cl | F | $CH_2CH_2CH_2CH_2CH_2CH_2CH_2S(=O)_2CF_3$ | Et |
| G-2783 | Cl | F | $CH_2CH_2CH_2CH_2CH_2CH_2CH_2CH_2S(=O)_2CF_3$ | Et |
| G-2784 | Cl | F | $CH_2CH_2S(=O)_2CH_2CF_3$ | Et |
| G-2785 | Cl | F | $CH_2CH_2CH_2S(=O)_2CH_2CF_3$ | Et |
| G-2786 | Cl | F | $CH_2CH_2CH_2CH_2S(=O)_2CH_2CF_3$ | Et |
| G-2787 | Cl | F | $CH_2CH_2CH_2CH_2CH_2S(=O)_2CH_2CF_3$ | Et |
| G-2788 | Cl | F | $CH_2CH_2CH_2CH_2CH_2CH_2S(=O)_2CH_2CF_3$ | Et |
| G-2789 | Cl | F | $CH_2CH_2CH_2S(=O)_2$(c-Pr) | Et |
| G-2790 | Cl | F | $CH_2CH_2CH_2CH_2S(=O)_2$(c-Pr) | Et |
| G-2791 | Cl | F | $CH_2CH_2CH_2CH_2CH_2S(=O)_2$(c-Pr) | Et |
| G-2792 | Cl | F | $CH_2CH_2CH_2S(=O)_2$[c-Hex(4,4-$F_2$)] | Et |
| G-2793 | Cl | F | $CH_2CH_2CH_2CH_2S(=O)_2$[c-Hex(4,4-$F_2$)] | Et |
| G-2794 | Cl | F | $CH_2CH_2CH_2CH_2CH_2S(=O)_2$[c-Hex(4,4-$F_2$)] | Et |
| G-2795 | Cl | F | $CH_2CH_2CH_2C(=O)H$ | Et |
| G-2796 | Cl | F | $CH_2CH_2CH_2CH_2C(=O)H$ | Et |
| G-2797 | Cl | F | $CH_2CH_2CH_2CH_2CH_2C(=O)H$ | Et |
| G-2798 | Cl | F | $CH_2CH_2CH_2C(=O)$(t-Bu) | Et |
| G-2799 | Cl | F | $CH_2CH_2CH_2CH_2C(=O)$(t-Bu) | Et |
| G-2800 | Cl | F | $CH_2CH_2CH_2CH_2CH_2C(=O)$(t-Bu) | Et |
| G-2801 | Cl | F | $CH_2CH_2CH_2C(=O)CF_3$ | Et |
| G-2802 | Cl | F | $CH_2CH_2CH_2CH_2C(=O)CF_3$ | Et |
| G-2803 | Cl | F | $CH_2CH_2CH_2CH_2CH_2C(=O)CF_3$ | Et |
| G-2804 | Cl | F | $CH_2C(=O)Ph$ | Et |
| G-2805 | Cl | F | $CH_2C(=O)Ph$(4-Cl) | Et |
| G-2806 | Cl | F | $CH_2C(=O)Ph(4-CF_3)$ | Et |
| G-2807 | Cl | F | $CH_2CH_2C(=O)Ph(4-CF_3)$ | Et |
| G-2808 | Cl | F | $CH_2CH_2CH_2C(=O)Ph(4-CF_3)$ | Et |
| G-2809 | Cl | F | $CH_2CH_2CH_2CH_2C(=O)Ph(4-CF_3)$ | Et |
| G-2810 | Cl | F | $CH_2CH_2CH_2CH_2CH_2C(=O)Ph(4-CF_3)$ | Et |

TABLE 1184

| Compound Number | $R^3$ | $R^4$ | $R^5$ | $R^{11}$ |
|---|---|---|---|---|
| G-2811 | Cl | F | $CH_2C(=O)OEt$ | Et |
| G-2812 | Cl | F | $CH_2CH_2C(=O)O$(t-Bu) | Et |
| G-2813 | Cl | F | $CH_2CH_2CH_2C(=O)OEt$ | Et |
| G-2814 | Cl | F | $CH_2CH_2CH_2C(=O)O$(t-Bu) | Et |
| G-2815 | Cl | F | $CH_2CH_2CH_2CH_2C(=O)O$(t-Bu) | Et |
| G-2816 | Cl | F | $CH_2CH_2CH_2CH_2CH_2C(=O)O$(t-Bu) | Et |
| G-2817 | Cl | F | $CH_2CH_2CH_2CH_2CH_2CH_2C(=O)O$(t-Bu) | Et |
| G-2818 | Cl | F | $CH_2CH_2CH_2CH_2CH_2CH_2CH_2C(=O)OEt$ | Et |
| G-2819 | Cl | F | $CH_2CH_2C(=O)OCH_2CF_3$ | Et |
| G-2820 | Cl | F | $CH_2CH_2CH_2C(=O)OCH_2CF_3$ | Et |
| G-2821 | Cl | F | $CH_2CH_2CH_2CH_2C(=O)OCH_2CF_3$ | Et |
| G-2822 | Cl | F | $CH_2CH_2CH_2CH_2CH_2C(=O)OCH_2CF_3$ | Et |
| G-2823 | Cl | F | $CH_2CH_2C(=O)NH$(t-Bu) | Et |
| G-2824 | Cl | F | $CH_2CH_2CH_2C(=O)NH$(t-Bu) | Et |
| G-2825 | Cl | F | $CH_2CH_2CH_2C(=O)NH$(t-Pen) | Et |
| G-2826 | Cl | F | $CH_2CH_2CH_2CH_2C(=O)NH$(t-Bu) | Et |
| G-2827 | Cl | F | $CH_2CH_2C(=O)NHCH_2CF_3$ | Et |
| G-2828 | Cl | F | $CH_2CH_2CH_2C(=O)NHCH_2CF_3$ | Et |
| G-2829 | Cl | F | $CH_2CH_2CH_2CH_2C(=O)NHCH_2CF_3$ | Et |
| G-2830 | Cl | F | $CH_2CH_2SC(=O)N(Me)_2$ | Et |
| G-2831 | Cl | F | $CH_2CH_2CH_2SC(=O)N(Me)_2$ | Et |
| G-2832 | Cl | F | $CH_2CH_2CH_2SC(=O)NH$(t-Bu) | Et |
| G-2833 | Cl | F | $CH_2CH_2CH_2CH_2CH_2SC(=O)NH$(t-Bu) | Et |
| G-2834 | Cl | F | $CH_2CH_2SC(=O)NHCH_2CF_3$ | Et |
| G-2835 | Cl | F | $CH_2CH_2CH_2SC(=O)NHCH_2CF_3$ | Et |
| G-2836 | Cl | F | $CH_2CH_2CH_2CH_2SC(=O)NHCH_2CF_3$ | Et |

TABLE 1184-continued

| Compound Number | $R^3$ | $R^4$ | $R^5$ | $R^{11}$ |
|---|---|---|---|---|
| G-2837 | Cl | F | $CH_2CH_2CH_2OC(=O)H$ | Et |
| G-2838 | Cl | F | $CH_2CH_2CH_2CH_2OC(=O)H$ | Et |
| G-2839 | Cl | F | $CH_2CH_2CH_2CH_2CH_2OC(=O)H$ | Et |
| G-2840 | Cl | F | $CH_2CH_2CH_2OC(=O)Me$ | Et |
| G-2841 | Cl | F | $CH_2CH_2CH_2CH_2OC(=O)Me$ | Et |
| G-2842 | Cl | F | $CH_2CH_2CH_2CH_2CH_2OC(=O)Me$ | Et |
| G-2843 | Cl | F | $CH_2CH_2OC(=O)CF_3$ | Et |
| G-2844 | Cl | F | $CH_2CH_2CH_2OC(=O)CF_3$ | Et |
| G-2845 | Cl | F | $CH_2CH_2CH_2CH_2OC(=O)CF_3$ | Et |
| G-2846 | Cl | F | $CH_2CH_2CH_2CH_2CH_2OC(=O)Ph(4-CF_3)$ | Et |
| G-2847 | Cl | F | $CH_2CH_2OC(=O)Ph$ | Et |
| G-2848 | Cl | F | $CH_2CH_2OC(=O)Ph(4-CF_3)$ | Et |
| G-2849 | Cl | F | $CH_2CH_2CH_2OC(=O)Ph(4-CF_3)$ | Et |
| G-2850 | Cl | F | $CH_2CH_2CH_2CH_2OC(=O)Ph(4-CF_3)$ | Et |
| G-2851 | Cl | F | $CH_2CH_2CH_2CH_2CH_2OC(=O)Ph(4-CF_3)$ | Et |
| G-2852 | Cl | F | $CH_2CH_2OS(=O)Me$ | Et |
| G-2853 | Cl | F | $CH_2CH_2CH_2OS(=O)Me$ | Et |
| G-2854 | Cl | F | $CH_2CH_2CH_2CH_2OS(=O)Me$ | Et |

TABLE 1185

| Compound Number | $R^3$ | $R^4$ | $R^5$ | $R^{11}$ |
|---|---|---|---|---|
| G-2855 | Cl | F | $CH_2CH_2CH_2CH_2CH_2OS(=O)Me$ | Et |
| G-2856 | Cl | F | $CH_2CH_2CH_2CH_2CH_2CH_2OS(=O)Me$ | Et |
| G-2857 | Cl | F | $CH_2CH_2OS(=O)CF_3$ | Et |
| G-2858 | Cl | F | $CH_2CH_2CH_2OS(=O)CF_3$ | Et |
| G-2859 | Cl | F | $CH_2CH_2CH_2CH_2OS(=O)CF_3$ | Et |
| G-2860 | Cl | F | $CH_2CH_2CH_2CH_2CH_2OS(=O)CF_3$ | Et |
| G-2861 | Cl | F | $CH_2CH_2CH_2CH_2CH_2CH_2OS(=O)CF_3$ | Et |
| G-2862 | Cl | F | $CH_2CH_2OS(=O)Ph$ | Et |
| G-2863 | Cl | F | $CH_2CH_2OS(=O)Ph(4-Me)$ | Et |
| G-2864 | Cl | F | $CH_2CH_2CH_2OS(=O)Ph$ | Et |
| G-2865 | Cl | F | $CH_2CH_2CH_2OS(=O)Ph(4-Me)$ | Et |
| G-2866 | Cl | F | $CH_2CH_2OS(=O)_2Me$ | Et |
| G-2867 | Cl | F | $CH_2CH_2CH_2OS(=O)_2Me$ | Et |
| G-2868 | Cl | F | $CH_2CH_2CH_2OS(=O)_2CF_3$ | Et |
| G-2869 | Cl | F | $CH_2CH_2CH_2CH_2OS(=O)_2CF_3$ | Et |
| G-2870 | Cl | F | $CH_2CH_2CH_2CH_2CH_2OS(=O)_2CF_3$ | Et |
| G-2871 | Cl | F | $CH_2CH_2CH_2CH_2CH_2OS(=O)_2CF_2CF_2CF_2CF_3$ | Et |
| G-2872 | Cl | F | $CH_2CH_2OS(=O)_2Ph$ | Et |
| G-2873 | Cl | F | $CH_2CH_2OS(=O)_2Ph(4-Me)$ | Et |
| G-2874 | Cl | F | $CH_2CH_2CH_2OS(=O)_2Ph$ | Et |
| G-2875 | Cl | F | $CH_2CH_2CH_2OS(=O)_2Ph(4-Me)$ | Et |
| G-2876 | Cl | F | $CH_2CH_2NH_2$ | Et |
| G-2877 | Cl | F | $CH_2CH_2NH_2$, HCl | Et |
| G-2878 | Cl | F | $CH_2CH_2CH_2NH_2$ | Et |
| G-2879 | Cl | F | $CH_2CH_2CH_2CH_2NH_2$ | Et |
| G-2880 | Cl | F | $CH_2CH_2CH_2CH_2CH_2NH_2$ | Et |
| G-2881 | Cl | F | $CH_2CH_2CH_2CH_2CH_2CH_2NH_2$ | Et |
| G-2882 | Cl | F | $CH_2CH_2CH_2CH_2CH_2CH_2CH_2NH_2$ | Et |
| G-2883 | Cl | F | $CH_2CH(Me)NH_2$ | Et |
| G-2884 | Cl | F | $CH_2C^*H(Me)NH_2$, HCl | Et |
| G-2885 | Cl | F | $CH_2C^*H(Me)NH_2$:(R) | Et |
| G-2886 | Cl | F | $CH_2C^*H(Me)NH_2$, HCl:(R) | Et |
| G-2887 | Cl | F | $CH_2C^*H(Me)NH_2$:(S) | Et |
| G-2888 | Cl | F | $CH_2C^*H(Me)NH_2$, HCl:(S) | Et |
| G-2889 | Cl | F | $CH_2CH(Et)NH_2$ | Et |
| G-2890 | Cl | F | $CH_2CH(/-Pr)NH_2$ | Et |
| G-2891 | Cl | F | $CH(Me)CH_2NH_2$ | Et |
| G-2892 | Cl | F | $CH(Me)CH_2NH_2$, HCl | Et |
| G-2893 | Cl | F | $CH(Et)CH_2NH_2$ | Et |
| G-2894 | Cl | F | $CH(i-Pr)CH_2NH_2$ | Et |
| G-2895 | Cl | F | $CH_2CH_2CH(Me)NH_2$ | Et |
| G-2896 | Cl | F | $CH_2CH(Me)CH_2NH_2$ | Et |
| G-2897 | Cl | F | $CH(Me)CH_2CH_2NH_2$ | Et |
| G-2898 | Cl | F | $CH_2CH(Me)NH(c-Pr)$ | Et |

TABLE 1186

| Compound Number | $R^3$ | $R^4$ | $R^5$ | $R^{11}$ |
|---|---|---|---|---|
| G-2899 | Cl | F | $CH_2CH(Me)N(c-Pr)S(=O)_2CF_3$ | Et |
| G-2900 | Cl | F | $CH_2CH(Me)NHOMe$ | Et |
| G-2901 | Cl | F | $CH_2CH(Me)N(OMe)S(=O)_2CF_3$ | Et |
| G-2902 | Cl | F | $CH_2CH(Me)N(OMe)S(=O)_2Ph(2-NO_2)$ | Et |
| G-2903 | Cl | F | $CH_2CH(Me)N(OMe)S(=O)_2Ph(4-NO_2)$ | Et |
| G-2904 | Cl | F | $CH_2CH_2N(Me)(t-Bu)$ | Et |
| G-2905 | Cl | F | $CH_2CH_2CH_2N(Me)(t-Bu)$ | Et |
| G-2906 | Cl | F | $CH_2CH_2CH_2CH_2N(Me)(t-Bu)$ | Et |
| G-2907 | Cl | F | $CH_2CH_2NHCH_2CF_3$ | Et |
| G-2908 | Cl | F | $CH_2CH_2CH_2NHCH_2CF_3$ | Et |
| G-2909 | Cl | F | $CH_2CH_2CH_2CH_2NHCH_2CF_3$ | Et |
| G-2910 | Cl | F | $CH_2CH_2NHC(=O)C(Me)(CF_3)_2$ | Et |
| G-2911 | Cl | F | $CH_2CH_2NHC(=O)Me$ | Et |
| G-2912 | Cl | F | $CH_2CH_2NHC(=O)(t-Bu)$ | Et |
| G-2913 | Cl | F | $CH_2CH_2CH_2CH_2NHC(=O)CH(CH_3)_2$ | Et |
| G-2914 | Cl | F | $CH_2CH_2CH_2CH_2NHC(=O)(t-Bu)$ | Et |
| G-2915 | Cl | F | $CH_2CH_2CH_2CH_2NHC(=O)CH_2(t-Bu)$ | Et |
| G-2916 | Cl | F | $CH_2CH_2NHC(=O)CF_3$ | Et |
| G-2917 | Cl | F | $CH_2CH_2NHC(=O)CH_2CF_3$ | Et |
| G-2918 | Cl | F | $CH_2CH_2NHC(=O)CF_2CF_3$ | Et |
| G-2919 | Cl | F | $CH_2CH_2CH_2NHC(=O)CF_3$ | Et |
| G-2920 | Cl | F | $CH_2CH_2CH_2NHC(=O)CH_2CF_3$ | Et |
| G-2921 | Cl | F | $CH_2CH_2CH_2NHC(=O)CF_2CF_3$ | Et |

TABLE 1186-continued

| Compound Number | $R^3$ | $R^4$ | $R^5$ | $R^{11}$ |
|---|---|---|---|---|
| G-2922 | Cl | F | $CH_2CH_2CH_2CH_2NHC(=O)CF_3$ | Et |
| G-2923 | Cl | F | $CH_2CH_2CH_2CH_2NHC(=O)CH_2CF_3$ | Et |
| G-2924 | Cl | F | $CH_2CH_2CH_2CH_2NHC(=O)CF_2CF_3$ | Et |
| G-2925 | Cl | F | $CH_2CH_2CH_2CH_2NHC(=O)CF(CF_3)_2$ | Et |
| G-2926 | Cl | F | $CH_2CH_2CH_2CH_2NHC(=O)CCl_3$ | Et |
| G-2927 | Cl | F | $CH_2CH_2NHC(=O)Ph$ | Et |
| G-2928 | Cl | F | $CH_2CH_2NHC(=O)Ph(4-CF_3)$ | Et |
| G-2929 | Cl | F | $CH_2CH_2CH_2NHC(=O)Ph(4-CF_3)$ | Et |
| G-2930 | Cl | F | $CH_2CH_2CH_2CH_2NHC(=O)Ph(4-CF_3)$ | Et |
| G-2931 | Cl | F | $CH_2CH_2NHC(=O)O(t-Bu)$ | Et |
| G-2932 | Cl | F | $CH_2CH_2CH_2NHC(=O)O(t-Bu)$ | Et |
| G-2933 | Cl | F | $CH_2CH_2CH_2CH_2NHC(=O)O(t-Bu)$ | Et |
| G-2934 | Cl | F | $CH_2CH_2CH_2CH_2NHC(=O)OCH(CH_3)_2$ | Et |
| G-2935 | Cl | F | $CH_2CH(Me)NHC(=O)O(t-Bu)$ | Et |
| G-2936 | Cl | F | $CH_2C^*H(Me)NHC(=O)O(t-Bu)$:(R) | Et |
| G-2937 | Cl | F | $CH_2C^*H(Me)NHC(=O)O(t-Bu)$:(S) | Et |
| G-2938 | Cl | F | $CH_2CH(Et)NHC(=O)O(t-Bu)$ | Et |
| G-2939 | Cl | F | $CH_2CH(i-Pr)NHC(=O)O(t-Bu)$ | Et |
| G-2940 | Cl | F | $CH(Me)CH_2NHC(=O)O(t-Bu)$ | Et |
| G-2941 | Cl | F | $CH(Et)CH_2NHC(=O)O(t-Bu)$ | Et |
| G-2942 | Cl | F | $CH(i-Pr)CH_2NHC(=O)O(t-Bu)$ | Et |

TABLE 1187

| Compound Number | $R^3$ | $R^4$ | $R^5$ | $R^{11}$ |
|---|---|---|---|---|
| G-2943 | Cl | F | $CH_2CH(Me)CH_2NHC(=O)O(t-Bu)$ | Et |
| G-2944 | Cl | F | $CH_2CH_2NHC(=O)OC(Me)_2CF_3$ | Et |
| G-2945 | Cl | F | $CH_2CH_2CH_2NHC(=O)OCH_2CF_3$ | Et |
| G-2946 | Cl | F | $CH_2CH_2CH_2NHC(=O)OCH_2CH_2CF_3$ | Et |
| G-2947 | Cl | F | $CH_2CH_2CH_2CH_2NHC(=O)OCH_2CCl_3$ | Et |
| G-2948 | Cl | F | $CH_2CH_2CH_2CH_2NHC(=O)OCH_2CF_3$ | Et |
| G-2949 | Cl | F | $CH_2CH_2NHC(=O)NH(t-Bu)$ | Et |
| G-2950 | Cl | F | $CH_2CH_2CH_2NHC(=O)NH(t-Bu)$ | Et |
| G-2951 | Cl | F | $CH_2CH_2CH_2CH_2NHC(=O)NHEt$ | Et |
| G-2952 | Cl | F | $CH_2CH_2CH_2CH_2NHC(=O)NH(t-Bu)$ | Et |
| G-2953 | Cl | F | $CH_2CH_2CH_2NHC(=O)NHCH_2CCl_3$ | Et |
| G-2954 | Cl | F | $CH_2CH_2CH_2NHC(=O)NHCH_2CH_2F$ | Et |
| G-2955 | Cl | F | $CH_2CH_2CH_2NHC(=O)NHCH_2CF_3$ | Et |
| G-2956 | Cl | F | $CH_2CH_2CH_2CH_2NHC(=O)NHCH_2CCl_3$ | Et |
| G-2957 | Cl | F | $CH_2CH_2CH_2CH_2NHC(=O)NHCH_2CH_2F$ | Et |
| G-2958 | Cl | F | $CH_2CH_2CH_2CH_2NHC(=O)NHCH_2CF_3$ | Et |
| G-2959 | Cl | F | $CH_2CH_2NHS(=O)Me$ | Et |
| G-2960 | Cl | F | $CH_2CH_2CH_2NHS(=O)Me$ | Et |
| G-2961 | Cl | F | $CH_2CH_2CH_2CH_2NHS(=O)Me$ | Et |
| G-2962 | Cl | F | $CH_2CH_2CH_2CH_2NHS(=O)CH(CH_3)_2$ | Et |
| G-2963 | Cl | F | $CH_2CH_2CH_2CH_2CH_2NHS(=O)Me$ | Et |
| G-2964 | Cl | F | $CH_2CH_2NHS(=O)CHF_2$ | Et |
| G-2965 | Cl | F | $CH_2CH_2CH_2NHS(=O)CHF_2$ | Et |
| G-2966 | Cl | F | $CH_2CH_2CH_2CH_2NHS(=O)CHF_2$ | Et |
| G-2967 | Cl | F | $CH_2CH_2CH_2CH_2CH_2NHS(=O)CHF_2$ | Et |
| G-2968 | Cl | F | $CH_2CH(Me)NHS(=O)CHF_2$ | Et |
| G-2969 | Cl | F | $CH(Me)CH_2NHS(=O)CHF_2$ | Et |
| G-2970 | Cl | F | $CH_2CH_2CH(Me)NHS(=O)CHF_2$ | Et |
| G-2971 | Cl | F | $CH_2CH(Me)CH_2NHS(=O)CHF_2$ | Et |
| G-2972 | Cl | F | $CH(Me)CH_2CH_2NHS(=O)CHF_2$ | Et |
| G-2973 | Cl | F | $CH_2CH_2NHS(=O)CF_3$ | Et |
| G-2974 | Cl | F | $CH_2CH_2CH_2NHS(=O)CF_3$ | Et |
| G-2975 | Cl | F | $CH_2CH_2CH_2CH_2NHS(=O)CF_3$ | Et |
| G-2976 | Cl | F | $CH_2CH_2CH_2CH_2CH_2NHS(=O)CF_3$ | Et |
| G-2977 | Cl | F | $CH_2CH_2CH_2NHS(=O)Ph$ | Et |
| G-2978 | Cl | F | $CH_2CH_2CH_2CH_2NHS(=O)Ph$ | Et |
| G-2979 | Cl | F | $CH_2CH_2CH_2CH_2CH_2NHS(=O)Ph$ | Et |
| G-2980 | Cl | F | $CH_2CH_2CH_2CH_2CH_2NHS(=O)Ph(4-CF_3)$ | Et |
| G-2981 | Cl | F | $CH_2CH(Me)NHS(=O)Ph(4-CF_3)$ | Et |
| G-2982 | Cl | F | $CH_2CH(Et)NHS(=O)Ph(4-CF_3)$ | Et |
| G-2983 | Cl | F | $CH(Me)CH_2NHS(=O)Ph(4-CF_3)$ | Et |
| G-2984 | Cl | F | $CH(Et)CH_2NHS(=O)Ph(4-CF_3)$ | Et |
| G-2985 | Cl | F | $CH_2CH(Et)CH_2NHS(=O)Ph(4-CF_3)$ | Et |
| G-2986 | Cl | F | $CH_2CH_2NHS(=O)_2Me$ | Et |

TABLE 1188

| Compound Number | $R^3$ | $R^4$ | $R^5$ | $R^{11}$ |
|---|---|---|---|---|
| G-2987 | Cl | F | $CH_2CH_2CH_2NHS(=O)_2Me$ | Et |
| G-2988 | Cl | F | $CH_2CH_2CH_2CH_2NHS(=O)_2Me$ | Et |
| G-2989 | Cl | F | $CH_2CH_2CH_2CH_2NHS(=O)_2CH(CH_3)_2$ | Et |
| G-2990 | Cl | F | $CH_2CH_2CH_2CH_2CH_2NHS(=O)_2Me$ | Et |
| G-2991 | Cl | F | $CH_2CH_2NHS(=O)_2CHF_2$ | Et |
| G-2992 | Cl | F | $CH_2CH_2CH_2NHS(=O)_2CHF_2$ | Et |
| G-2993 | Cl | F | $CH_2CH_2CH_2CH_2NHS(=O)_2CHF_2$ | Et |
| G-2994 | Cl | F | $CH_2CH_2CH_2CH_2CH_2NHS(=O)_2CHF_2$ | Et |
| G-2995 | Cl | F | $CH_2CH(Me)CH_2NHS(=O)_2CHF_2$ | Et |
| G-2996 | Cl | F | $CH(Me)CH_2NHS(=O)_2CHF_2$ | Et |
| G-2997 | Cl | F | $CH_2CH_2CH(Me)NHS(=O)_2CHF_2$ | Et |
| G-2998 | Cl | F | $CH_2CH(Me)CH_2NHS(=O)_2CHF_2$ | Et |
| G-2999 | Cl | F | $CH(Me)CH_2CH_2NHS(=O)_2CHF_2$ | Et |
| G-3000 | Cl | F | $CH_2CH(Me)N(Me)S(=O)_2CHF_2$ | Et |
| G-3001 | Cl | F | $CH(Me)CH_2N(Me)S(=O)_2CHF_2$ | Et |
| G-3002 | Cl | F | $CH_2CH_2CH(Me)N(Me)S(=O)_2CHF_2$ | Et |
| G-3003 | Cl | F | $CH_2CH(Me)CH_2N(Me)S(=O)_2CHF_2$ | Et |
| G-3004 | Cl | F | $CH(Me)CH_2CH_2N(Me)S(=O)_2CHF_2$ | Et |
| G-3005 | Cl | F | $CH_2CH_2NHS(=O)_2CF_3$ | Et |
| G-3006 | Cl | F | $CH_2CH_2CH_2NHS(=O)_2CF_3$ | Et |
| G-3007 | Cl | F | $CH_2CH_2CH_2CH_2NHS(=O)_2CF_3$ | Et |
| G-3008 | Cl | F | $CH_2CH_2CH_2CH_2CH_2NHS(=O)_2CF_3$ | Et |
| G-3009 | Cl | F | $CH_2CH_2N(Me)S(=O)_2CF_3$ | Et |
| G-3010 | Cl | F | $CH_2CH_2N(Et)S(=O)_2CF_3$ | Et |
| G-3011 | Cl | F | $CH_2CH_2N(CH_2CN)S(=O)_2CF_3$ | Et |
| G-3012 | Cl | F | $CH_2CH_2N(CH_2OMe)S(=O)_2CF_3$ | Et |
| G-3013 | Cl | F | $CH_2CH_2CH_2N(Me)S(=O)_2CF_3$ | Et |
| G-3014 | Cl | F | $CH_2CH_2CH_2N(Et)S(=O)_2CF_3$ | Et |
| G-3015 | Cl | F | $CH_2CH_2CH_2N(CH_2CN)S(=O)_2CF_3$ | Et |
| G-3016 | Cl | F | $CH_2CH_2CH_2N(CH_2OMe)S(=O)_2CF_3$ | Et |
| G-3017 | Cl | F | $CH_2CH_2CH_2CH_2N(Me)S(=O)_2CF_3$ | Et |
| G-3018 | Cl | F | $CH_2CH_2CH_2CH_2N(Et)S(=O)_2CF_3$ | Et |
| G-3019 | Cl | F | $CH_2CH_2CH_2CH_2N(CH_2CN)S(=O)_2CF_3$ | Et |
| G-3020 | Cl | F | $CH_2CH_2CH_2CH_2N(CH_2OMe)S(=O)_2CF_3$ | Et |
| G-3021 | Cl | F | $CH_2CH(Me)NHS(=O)_2CF_3$ | Et |
| G-3022 | Cl | F | $CH_2CH(Me)NHS(=O)_2CF_3$:(R) | Et |
| G-3023 | Cl | F | $CH_2CH(Me)NHS(=O)_2CF_3$:(S) | Et |
| G-3024 | Cl | F | $CH(Me)CH_2NHS(=O)_2CF_3$ | Et |
| G-3025 | Cl | F | $CH_2CH_2CH(Me)NHS(=O)_2CF_3$ | Et |
| G-3026 | Cl | F | $CH_2CH(Me)CH_2NHS(=O)_2CF_3$ | Et |
| G-3027 | Cl | F | $CH(Me)CH_2CH_2NHS(=O)_2CF_3$ | Et |
| G-3028 | Cl | F | $CH_2CH(Me)N(Me)S(=O)_2CF_3$ | Et |
| G-3029 | Cl | F | $CH(Me)CH_2N(Me)S(=O)_2CF_3$ | Et |
| G-3030 | Cl | F | $CH_2CH_2CH(Me)N(Me)S(=O)_2CF_3$ | Et |

TABLE 1189

| Compound Number | $R^3$ | $R^4$ | $R^5$ | $R^{11}$ |
|---|---|---|---|---|
| G-3031 | Cl | F | $CH_2CH(Me)CH_2N(Me)S(=O)_2CF_3$ | Et |
| G-3032 | Cl | F | $CH(Me)CH_2CH_2N(Me)S(=O)_2CF_3$ | Et |
| G-3033 | Cl | F | $CH_2CH_2CH_2NHS(=O)_2Ph$ | Et |
| G-3034 | Cl | F | $CH_2CH_2CH_2CH_2NHS(=O)_2Ph$ | Et |
| G-3035 | Cl | F | $CH_2CH_2CH_2CH_2CH_2NHS(=O)_2Ph$ | Et |
| G-3036 | Cl | F | $CH_2CH_2CH_2CH_2CH_2NHS(=O)_2Ph(4-CF_3)$ | Et |
| G-3037 | Cl | F | $CH_2CH(Me)NHS(=O)_2Ph(4-CF_3)$ | Et |
| G-3038 | Cl | F | $CH_2CH(Et)NHS(=O)_2Ph(4-CF_3)$ | Et |
| G-3039 | Cl | F | $CH(Me)CH_2NHS(=O)_2Ph(4-CF_3)$ | Et |
| G-3040 | Cl | F | $CH(Et)CH_2NHS(=O)_2Ph(4-CF_3)$ | Et |
| G-3041 | Cl | F | $CH_2CH(Me)CH_2NHS(=O)_2Ph(4-CF_3)$ | Et |
| G-3042 | Cl | F | $CH_2CH_2SiMe_3$ | Et |
| G-3043 | Cl | F | $CH_2CH_2CH_2SiMe_3$ | Et |
| G-3044 | Cl | F | $CH_2CH_2CH_2CH_2SiMe_3$ | Et |
| G-3045 | Cl | F | $CH_2Ph$ | Et |
| G-3046 | Cl | F | $CH_2Ph(2-CF_3)$ | Et |
| G-3047 | Cl | F | $CH_2Ph(3-CF_3)$ | Et |
| G-3048 | Cl | F | $CH_2Ph(4-CF_3)$ | Et |
| G-3049 | Cl | F | $CH_2Ph(2-OCF_3)$ | Et |
| G-3050 | Cl | F | $CH_2Ph(3-OCF_3)$ | Et |
| G-3051 | Cl | F | $CH_2Ph(4-OCF_3)$ | Et |
| G-3052 | Cl | F | $CH_2Ph(2-SCF_3)$ | Et |
| G-3053 | Cl | F | $CH_2Ph(3-SCF_3)$ | Et |
| G-3054 | Cl | F | $CH_2Ph(4-SCF_3)$ | Et |
| G-3055 | Cl | F | $CH_2Ph(3-CH_2SCF_3)$ | Et |
| G-3056 | Cl | F | $CH_2Ph(4-F)$ | Et |
| G-3057 | Cl | F | $CH_2Ph(4-Cl)$ | Et |
| G-3058 | Cl | F | $CH_2Ph(4-Br)$ | Et |
| G-3059 | Cl | F | $CH_2Ph(4-Me)$ | Et |
| G-3060 | Cl | F | $CH_2Ph[4-(t-Bu)]$ | Et |
| G-3061 | Cl | F | $CH_2Ph(4-CN)$ | Et |
| G-3062 | Cl | F | $CH_2Ph(4-NO_2)$ | Et |
| G-3063 | Cl | F | $CH_2Ph(4-OCHF_2)$ | Et |
| G-3064 | Cl | F | $CH_2Ph(4-SCHF_2)$ | Et |
| G-3065 | Cl | F | $CH_2Ph(4-CH_2SCF_3)$ | Et |
| G-3066 | Cl | F | $CH_2Ph[4-CF(CF_3)_2]$ | Et |
| G-3067 | Cl | F | $CH_2Ph(4-CH_2SCF_3)$ | Et |
| G-3068 | Cl | F | $CH_2Ph[4-Ph(4-CF_3)]$ | Et |
| G-3069 | Cl | F | $CH_2Ph(2,4-Cl_2)$ | Et |
| G-3070 | Cl | F | $CH_2Ph[2,5-(CF_3)_2]$ | Et |
| G-3071 | Cl | F | $CH_2Ph(3,4-Cl_2)$ | Et |
| G-3072 | Cl | F | $CH_2Ph$(3-CF 3-4-F) | Et |
| G-3073 | Cl | F | $CH_2Ph$(3-CF 3-4-Cl) | Et |
| G-3074 | Cl | F | $CH_2Ph(3-F-4-CF_3)$ | Et |

TABLE 1190

| Compound Number | $R^3$ | $R^4$ | $R^5$ | $R^{11}$ |
|---|---|---|---|---|
| G-3075 | Cl | F | $CH_2Ph(2,4,6-F_3)$ | Et |
| G-3076 | Cl | F | $CH_2Ph(3,4,5-F_3)$ | Et |
| G-3077 | Cl | F | $CH_2Ph(2,3,4-F_3)$ | Et |
| G-3078 | Cl | F | $CH_2Ph(3,4,5-Cl_3)$ | Et |
| G-3079 | Cl | F | $CH_2CH_2Ph$ | Et |
| G-3080 | Cl | F | $CH_2CH_2Ph(4-F)$ | Et |
| G-3081 | Cl | F | $CH_2CH_2Ph(4-Cl)$ | Et |
| G-3082 | Cl | F | $CH_2CH_2Ph(4-Br)$ | Et |
| G-3083 | Cl | F | $CH_2CH_2Ph[4-(t-Bu)]$ | Et |
| G-3084 | Cl | F | $CH_2CH_2Ph(2-CF_3)$ | Et |
| G-3085 | Cl | F | $CH_2CH_2Ph(3-CF_3)$ | Et |
| G-3086 | Cl | F | $CH_2CH_2Ph(4-CF_3)$ | Et |
| G-3087 | Cl | F | $CH_2CH_2Ph[4-CF(CF_3)_2]$ | Et |
| G-3088 | Cl | F | $CH_2CH_2Ph[4-(c-Pr)]$ | Et |
| G-3089 | Cl | F | $CH_2CH_2Ph\{4-[c-Pr(2,2-F_2)]\}$ | Et |
| G-3090 | Cl | F | $CH_2CH_2Ph(4-OMe)$ | Et |
| G-3091 | Cl | F | $CH_2CH_2Ph(3-OCF_3)$ | Et |
| G-3092 | Cl | F | $CH_2CH_2Ph(4-OCHF_2)$ | Et |
| G-3093 | Cl | F | $CH_2CH_2Ph(4-OCF_3)$ | Et |
| G-3094 | Cl | F | $CH_2CH_2Ph(4-SMe)$ | Et |
| G-3095 | Cl | F | $CH_2CH_2Ph(4-SCHF_2)$ | Et |
| G-3096 | Cl | F | $CH_2CH_2Ph(4-SCF_3)$ | Et |
| G-3097 | Cl | F | $CH_2CH_2Ph[4-S(=O)Me]$ | Et |
| G-3098 | Cl | F | $CH_2CH_2Ph[4-S(=O)CF_3]$ | Et |
| G-3099 | Cl | F | $CH_2CH_2Ph[4-S(=O)_2Me]$ | Et |
| G-3100 | Cl | F | $CH_2CH_2Ph[4-S(=O)_2CF_3]$ | Et |
| G-3101 | Cl | F | $CH_2CH_2Ph(4-CH_2SMe)$ | Et |
| G-3102 | Cl | F | $CH_2CH_2Ph(4-CH_2SCF_3)$ | Et |
| G-3103 | Cl | F | $CH_2CH_2Ph[4-OS(=O)_2Me]$ | Et |
| G-3104 | Cl | F | $CH_2CH_2Ph[4-OS(=O)_2CF_3]$ | Et |
| G-3105 | Cl | F | $CH_2CH_2Ph[4-Ph(4-CF_3)]$ | Et |
| G-3106 | Cl | F | $CH_2CH_2Ph(4-CH_2Ph)$ | Et |
| G-3107 | Cl | F | $CH_2CH_2Ph(4-OCH_2Ph)$ | Et |
| G-3108 | Cl | F | $CH_2CH_2Ph(4-CN)$ | Et |
| G-3109 | Cl | F | $CH_2CH_2Ph(4-NO_2)$ | Et |
| G-3110 | Cl | F | $CH_2CH_2Ph(2,4-Cl_2)$ | Et |
| G-3111 | Cl | F | $CH_2CH_2Ph(3,4-Cl_2)$ | Et |
| G-3112 | Cl | F | $CH_2CH_2Ph(3-CF_3-4-F)$ | Et |
| G-3113 | Cl | F | $CH_2CH_2Ph(2-CF_3-4-F)$ | Et |
| G-3114 | Cl | F | $CH_2CH_2Ph(3-F-4-CF_3)$ | Et |
| G-3115 | Cl | F | $CH_2CH_2Ph(2-F-4-CF_3)$ | Et |
| G-3116 | Cl | F | $CH_2CH_2Ph(3-Cl-4-OCHF_2)$ | Et |
| G-3117 | Cl | F | $CH_2CH_2Ph(3,4,5-Cl_3)$ | Et |
| G-3118 | Cl | F | $CH_2CH_2Ph(2,3,4-F_3)$ | Et |

TABLE 1191

| Compound Number | $R^3$ | $R^4$ | $R^5$ | $R^{11}$ |
|---|---|---|---|---|
| G-3119 | Cl | F | $CH_2CH_2Ph(2,4,5-F_3)$ | Et |
| G-3120 | Cl | F | $CH_2CH_2Ph(3,4,5-F_3)$ | Et |
| G-3121 | Cl | F | $CH_2CH_2Ph(2,4,6-F_3)$ | Et |
| G-3122 | Cl | F | $CH_2CH_2CH_2Ph$ | Et |
| G-3123 | Cl | F | $CH_2CH_2CH_2Ph(3-CF_3)$ | Et |
| G-3124 | Cl | F | $CH_2CH_2CH_2Ph(4-CF_3)$ | Et |
| G-3125 | Cl | F | $CH_2CH_2CH_2Ph(4-F)$ | Et |
| G-3126 | Cl | F | $CH_2CH_2CH_2Ph[4-(t-Bu)]$ | Et |
| G-3127 | Cl | F | $CH_2CH_2CH_2Ph(4-CN)$ | Et |
| G-3128 | Cl | F | $CH_2CH_2CH_2Ph(4-CF_3)$ | Et |
| G-3129 | Cl | F | $CH_2CH_2CH_2Ph(4-OCHF_2)$ | Et |
| G-3130 | Cl | F | $CH_2CH_2CH_2Ph(4-OCF_3)$ | Et |
| G-3131 | Cl | F | $CH_2CH_2CH_2Ph(4-SCHF_2)$ | Et |
| G-3132 | Cl | F | $CH_2CH_2CH_2Ph(4-SCF_3)$ | Et |
| G-3133 | Cl | F | $CH_2CH_2CH_2Ph[4-CF(CF_3)_2]$ | Et |
| G-3134 | Cl | F | $CH_2CH_2CH_2Ph(3,4,5-F_3)$ | Et |
| G-3135 | Cl | F | $CH_2CH_2CH_2Ph(2,4,6-F_3)$ | Et |
| G-3136 | Cl | F | $CH_2CH_2CH_2CH_2Ph$ | Et |
| G-3137 | Cl | F | $CH_2CH_2CH_2CH_2Ph(4-F)$ | Et |
| G-3138 | Cl | F | $CH_2CH_2CH_2CH_2Ph(4-CF_3)$ | Et |
| G-3139 | Cl | F | $CH_2CH_2CH_2CH_2Ph(4-OCF_3)$ | Et |
| G-3140 | Cl | F | $CH_2CH_2CH_2CH_2Ph(4-SCF_3)$ | Et |
| G-3141 | Cl | F | $CH_2CH_2CH_2CH_2CH_2Ph$ | Et |
| G-3142 | Cl | F | $CH_2CH_2CH_2CH_2CH_2CH_2Ph$ | Et |

TABLE 1191-continued

| Compound Number | $R^3$ | $R^4$ | $R^5$ | $R^{11}$ |
|---|---|---|---|---|
| G-3143 | Cl | F | $CH_2CF_2Ph(4-F)$ | Et |
| G-3144 | Cl | F | $CH_2CF_2Ph(4-CF_3)$ | Et |
| G-3145 | Cl | F | $CH_2CF_2Ph(3,4,5-F_3)$ | Et |
| G-3146 | Cl | F | $CH_2CH_2OPh$ | Et |
| G-3147 | Cl | F | $CH_2CH_2OPh(4-F)$ | Et |
| G-3148 | Cl | F | $CH_2CH_2OPh(4-CF_3)$ | Et |
| G-3149 | Cl | F | $CH_2CH_2CH_2OPh$ | Et |
| G-3150 | Cl | F | $CH_2CH_2CH_2OPh(4-Cl)$ | Et |
| G-3151 | Cl | F | $CH_2CH_2CH_2OPh(4-CF_3)$ | Et |
| G-3152 | Cl | F | $CH_2CH_2CH_2CH_2OPh(4-CF_3)$ | Et |
| G-3153 | Cl | F | $CH_2CH_2CH_2CH_2OPh(4-OCF_3)$ | Et |
| G-3154 | Cl | F | $CH_2CH_2CH_2CH_2CH_2OPh(4-CF_3)$ | Et |
| G-3155 | Cl | F | $CH_2CH_2OCH_2Ph$ | Et |
| G-3156 | Cl | F | $CH_2CH_2CH_2OCH_2Ph$ | Et |
| G-3157 | Cl | F | $CH_2CH_2CH_2CH_2OCH_2Ph$ | Et |
| G-3158 | Cl | F | $CH_2CH_2CH_2CH_2CH_2OCH_2Ph$ | Et |
| G-3159 | Cl | F | $CH_2CH_2SPh$ | Et |
| G-3160 | Cl | F | $CH_2CH_2CH_2SPh$ | Et |
| G-3161 | Cl | F | $CH_2CH_2CH_2SPh(4-F)$ | Et |
| G-3162 | Cl | F | $CH_2CH_2CH_2SPh(4-Cl)$ | Et |

TABLE 1192

| Compound Number | $R^3$ | $R^4$ | $R^5$ | $R^{11}$ |
|---|---|---|---|---|
| G-3163 | Cl | F | $CH_2CH_2CH_2SPh(4-Br)$ | Et |
| G-3164 | Cl | F | $CH_2CH_2CH_2SPh[4-(t-Bu)]$ | Et |
| G-3165 | Cl | F | $CH_2CH_2CH_2SPh(3-CF_3)$ | Et |
| G-3166 | Cl | F | $CH_2CH_2CH_2SPh(4-CF_3)$ | Et |
| G-3167 | Cl | F | $CH_2CH_2CH_2SPh(3-SCF_3)$ | Et |
| G-3168 | Cl | F | $CH_2CH_2CH_2SPh(4-SCF_3)$ | Et |
| G-3169 | Cl | F | $CH_2CH_2CH_2CH_2SPh$ | Et |
| G-3170 | Cl | F | $CH_2CH_2CH_2CH_2SPh(4-F)$ | Et |
| G-3171 | Cl | F | $CH_2CH_2CH_2CH_2SPh(4-Cl)$ | Et |
| G-3172 | Cl | F | $CH_2CH_2CH_2CH_2SPh[4-(t-Bu)]$ | Et |
| G-3173 | Cl | F | $CH_2CH_2CH_2CH_2SPh(4-CF_3)$ | Et |
| G-3174 | Cl | F | $CH_2CH_2CH_2CH_2CH_2SPh$ | Et |
| G-3175 | Cl | F | $CH_2CH_2CH_2CH_2CH_2SPh(4-F)$ | Et |
| G-3176 | Cl | F | $CH_2CH_2CH_2CH_2CH_2SPh(4-Cl)$ | Et |
| G-3177 | Cl | F | $CH_2CH_2CH_2CH_2CH_2SPh(4-CF_3)$ | Et |
| G-3178 | Cl | F | $CH_2CH_2S(=O)Ph$ | Et |
| G-3179 | Cl | F | $CH_2CH_2CH_2S(=O)Ph$ | Et |
| G-3180 | Cl | F | $CH_2CH_2CH_2S(=O)Ph(4-F)$ | Et |
| G-3181 | Cl | F | $CH_2CH_2CH_2S(=O)Ph[4-(t-Bu)]$ | Et |
| G-3182 | Cl | F | $CH_2CH_2CH_2S(=O)Ph(4-CF_3)$ | Et |
| G-3183 | Cl | F | $CH_2CH_2S(=O)2Ph$ | Et |
| G-3184 | Cl | F | $CH_2CH_2S(=O)2Ph(4-CF_3)$ | Et |
| G-3185 | Cl | F | $CH_2CH_2CH_2S(=O)2Ph(4-F)$ | Et |
| G-3186 | Cl | F | $CH_2CH_2CH_2S(=O)2Ph(4-Cl)$ | Et |
| G-3187 | Cl | F | $CH_2CH_2CH_2S(=O)2Ph(4-CF_3)$ | Et |
| G-3188 | Cl | F | $CH_2CH_2CH_2CH_2S(=O)_2Ph$ | Et |
| G-3189 | Cl | F | $CH_2CH_2CH_2CH_2S(=O)2Ph(4-Cl)$ | Et |
| G-3190 | Cl | F | $CH_2CH_2CH_2CH_2S(=O)2Ph(4-CF_3)$ | Et |
| G-3191 | Cl | F | $CH_2CH_2SCH_2Ph$ | Et |
| G-3192 | Cl | F | $CH_2CH_2CH_2SCH_2Ph$ | Et |
| G-3193 | Cl | F | $CH_2CH_2CH_2SCH_2Ph(2-Cl)$ | Et |
| G-3194 | Cl | F | $CH_2CH_2CH_2SCH_2Ph(3-Cl)$ | Et |
| G-3195 | Cl | F | $CH_2CH_2CH_2SCH_2Ph(4-Cl)$ | Et |
| G-3196 | Cl | F | $CH_2CH_2CH_2SCH_2Ph(2-SCF_3)$ | Et |
| G-3197 | Cl | F | $CH_2CH_2CH_2SCH_2Ph(3-CF_3)$ | Et |
| G-3198 | Cl | F | $CH_2CH_2CH_2SCH_2Ph(4-CF_3)$ | Et |
| G-3199 | Cl | F | $CH_2CH_2CH_2SCH_2Ph(4-NO_2)$ | Et |
| G-3200 | Cl | F | $CH_2CH_2CH_2CH_2SCH_2Ph$ | Et |
| G-3201 | Cl | F | $CH_2CH_2CH_2CH_2SCH_2Ph(4-Cl)$ | Et |
| G-3202 | Cl | F | $CH_2CH_2CH_2CH_2SCH_2Ph(4-CF_3)$ | Et |
| G-3203 | Cl | F | $CH_2CH_2CH_2CH_2SCH_2Ph(4-CN)$ | Et |
| G-3204 | Cl | F | $CH_2CH_2CH_2CH_2CH_2SCH_2Ph$ | Et |
| G-3205 | Cl | F | $CH_2CH_2SCH_2CH_2Ph$ | Et |
| G-3206 | Cl | F | $CH_2CH_2CH_2SCH_2CH_2Ph$ | Et |

TABLE 1193

| Compound Number | $R^3$ | $R^4$ | $R^5$ | $R^{11}$ |
|---|---|---|---|---|
| G-3207 | Cl | F | $CH_2CH_2CH_2CH_2SCH_2CH_2Ph$ | Et |
| G-3208 | Cl | F | $CH_2CH_2SCH(Me)Ph$ | Et |
| G-3209 | Cl | F | $CH_2CH_2CH_2SCH(Me)Ph$ | Et |
| G-3210 | Cl | F | $CH_2CH_2CH_2CH_2SCH(Me)Ph$ | Et |
| G-3211 | Cl | F | $CH_2CH_2S({=}O)CH_2Ph$ | Et |
| G-3212 | Cl | F | $CH_2CH_2S({=}O)CH_2Ph(4\text{-}CF_3)$ | Et |
| G-3213 | Cl | F | $CH_2CH_2CH_2S({=}O)CH_2Ph$ | Et |
| G-3214 | Cl | F | $CH_2CH_2CH_2S({=}O)CH_2Ph(2\text{-}SCF_3)$ | Et |
| G-3215 | Cl | F | $CH_2CH_2CH_2S({=}O)CH_2Ph(4\text{-}SCF_3)$ | Et |
| G-3216 | Cl | F | $CH_2CH_2CH_2S({=}O)CH_2Ph(4\text{-}Cl)$ | Et |
| G-3217 | Cl | F | $CH_2CH_2CH_2S({=}O)CH_2Ph(4\text{-}CF_3)$ | Et |
| G-3218 | Cl | F | $CH_2CH_2CH_2CH_2S({=}O)CH_2Ph$ | Et |
| G-3219 | Cl | F | $CH_2CH_2CH_2CH_2S({=}O)CH_2Ph(4\text{-}CF_3)$ | Et |
| G-3220 | Cl | F | $CH_2CH_2CH_2CH_2CH_2S({=}O)CH_2Ph(4\text{-}CF_3)$ | Et |
| G-3221 | Cl | F | $CH_2CH_2S({=}O)_2CH_2Ph$ | Et |
| G-3222 | Cl | F | $CH_2CH_2S({=}O)_2CH_2Ph(4\text{-}CF_3)$ | Et |
| G-3223 | Cl | F | $CH_2CH_2CH_2S({=}O)_2CH_2Ph$ | Et |
| G-3224 | Cl | F | $CH_2CH_2CH_2S({=}O)_2CH_2Ph(4\text{-}Cl)$ | Et |
| G-3225 | Cl | F | $CH_2CH_2CH_2S({=}O)_2CH_2Ph(4\text{-}CF_3)$ | Et |
| G-3226 | Cl | F | $CH_2CH_2CH_2CH_2S({=}O)_2CH_2Ph$ | Et |
| G-3227 | Cl | F | $CH_2CH_2CH_2CH_2S({=}O)_2CH_2Ph(4\text{-}CF_3)$ | Et |
| G-3228 | Cl | F | $CH_2CH_2CH_2CH_2CH_2S({=}O)_2CH_2Ph$ | Et |
| G-3229 | Cl | F | $CH_2CH_2CH_2CH_2CH_2S({=}O)_2CH_2Ph(4\text{-}CF_3)$ | Et |
| G-3230 | Cl | F | $CH_2CH_2ON{=}CH(t\text{-}Bu)$ | Et |
| G-3231 | Cl | F | $CH_2CH_2CH_2ON{=}CH(t\text{-}Bu)$ | Et |
| G-3232 | Cl | F | $CH_2CH_2CH_2CH_2ON{=}C(Me)(c\text{-}Pr)$ | Et |
| G-3233 | Cl | F | $CH_2CH_2ON{=}C(Me)CF_3$ | Et |
| G-3234 | Cl | F | $CH_2CH_2CH_2ON{=}CHCF_3$ | Et |
| G-3235 | Cl | F | $CH_2CH_2CH_2ON{=}C(Me)CF_3$ | Et |
| G-3236 | Cl | F | $CH_2CH_2CH_2ON{=}C(Me)CCl_3$ | Et |
| G-3237 | Cl | F | $CH_2CH_2CH_2CH_2ON{=}CHCF_3$ | Et |
| G-3238 | Cl | F | $CH_2CH_2CH_2CH_2ON{=}C(Me)CF_3$ | Et |
| G-3239 | Cl | F | $CH_2CH_2CH_2CH_2CH_2ON{=}C(Me)CF_3$ | Et |
| G-3240 | Cl | F | $CH_2CH_2ON{=}CHPh$ | Et |
| G-3241 | Cl | F | $CH_2CH_2ON{=}CHPh(4\text{-}CF_3)$ | Et |
| G-3242 | Cl | F | $CH_2CH_2ON{=}CHPh(4\text{-}SCF_3)$ | Et |
| G-3243 | Cl | F | $CH_2CH_2CH_2ON{=}CHPh(3\text{-}CF_3)$ | Et |
| G-3244 | Cl | F | $CH_2CH_2CH_2ON{=}CHPh(4\text{-}CF_3)$ | Et |
| G-3245 | Cl | F | $CH_2CH_2CH_2ON{=}CHPh(4\text{-}SCF_3)$ | Et |
| G-3246 | Cl | F | $CH_2CH_2CH_2ON{=}C(Me)Ph(4\text{-}CF_3)$ | Et |
| G-3247 | Cl | F | $CH_2CH_2CH_2CH_2ON{=}CHPh(4\text{-}SCF_3)$ | Et |
| G-3248 | Cl | F | $CH_2CH_2$(adamant-1-yl) | Et |
| G-3249 | Cl | F | $CH_2CH_2CH_2(3\text{-}CF_3$-pyrazol-1-yl) | Et |
| G-3250 | Cl | F | $CH_2CH_2CH_2CH_2(3\text{-}CF_3$-pyrazol-1-yl) | Et |

TABLE 1194

| Compound Number | $R^3$ | $R^4$ | $R^5$ | $R^{11}$ |
|---|---|---|---|---|
| G-3251 | Cl | F | $CH_2CH_2CH_2CH_2CH_2(3\text{-}CF_3$-pyrazol-1-yl) | Et |
| G-3252 | Cl | F | $CH_2(1\text{-}Me\text{-}4\text{-}CF_3$-imidazol-5-yl) | Et |
| G-3253 | Cl | F | $CH_2CH_2(1\text{-}Me\text{-}4\text{-}CF_3$-imidazol-5-yl) | Et |
| G-3254 | Cl | F | $CH_2CH_2CH_2(1\text{-}Me\text{-}4\text{-}CF_3$-imidazol-5-yl) | Et |
| G-3255 | Cl | F | $CH_2CH_2CH_2(3\text{-}CF_3$-1,2,4-triazol-1-yl) | Et |
| G-3256 | Cl | F | $CH_2CH_2CH_2CH_2(3\text{-}CF_3$-1,2,4-triazol-1-yl) | Et |
| G-3257 | Cl | F | $CH_2CH_2CH_2CH_2CH_2(3\text{-}CF_3$-1,2,4-triazol-1-yl) | Et |
| G-3258 | Cl | F | $CH_2CH_2CH_2(4\text{-}CF_3$-thiazol-2-yl) | Et |
| G-3259 | Cl | F | $CH_2CH_2CH_2CH_2(4\text{-}CF_3$-thiazol-2-yl) | Et |
| G-3260 | Cl | F | $CH_2CH_2CH_2CH_2CH_2(4\text{-}CF_3$-thiazol-2-yl) | Et |
| G-3261 | Cl | F | $CH_2CH_2CH_2(2\text{-}CF_3$-pyridin-5-yl) | Et |
| G-3262 | Cl | F | $CH_2CH_2CH_2CH_2(2\text{-}CF_3$-pyridin-5-yl) | Et |
| G-3263 | Cl | F | $CH_2CH_2CH_2CH_2CH_2(2\text{-}CF_3$-pyridin-5-yl) | Et |
| G-3264 | Cl | F | $CH_2(4\text{-}CF_3$-pyrimidin-2-yl) | Et |
| G-3265 | Cl | F | $CH_2CH_2(4\text{-}CF_3$-pyrimidin-2-yl) | Et |
| G-3266 | Cl | F | $CH_2CH_2CH_2(4\text{-}CF_3$-pyrimidin-2-yl) | Et |
| G-3267 | Cl | F | $CH_2CH_2O(3\text{-}Cl\text{-}5\text{-}CF_3$-pyridin-2-yl) | Et |
| G-3268 | Cl | F | $CH_2CH_2CH_2O(3\text{-}Cl\text{-}5\text{-}CF_3$-pyridin-2-yl) | Et |
| G-3269 | Cl | F | $CH_2CH_2CH_2CH_2O(3\text{-}Cl\text{-}5\text{-}CF_3$-pyridin-2-yl) | Et |
| G-3270 | Cl | F | $CH_2CH_2CH_2CH_2CH_2O(3\text{-}Cl\text{-}5\text{-}CF_3$-pyridin-2-yl) | Et |
| G-3271 | Cl | F | $CH_2CH_2N$(Phth) | Et |
| G-3272 | Cl | F | $CH_2CH_2CH_2N$(Phth) | Et |
| G-3273 | Cl | F | $CH_2CH_2CH_2CH_2N$(Phth) | Et |

TABLE 1194-continued

| Compound Number | $R^3$ | $R^4$ | $R^5$ | $R^{11}$ |
|---|---|---|---|---|
| G-3274 | Cl | F | $CH_2CH_2CH_2CH_2CH_2N(Phth)$ | Et |
| G-3275 | Cl | F | $CH_2CH(Me)CH_2N(Phth)$ | Et |
| G-3276 | Cl | F | $CH_2$[1,3-dioxolan(2-$CF_3$)-2-yl] | Et |
| G-3277 | Cl | F | $CH_2$(azetidin-3-yl) | Et |
| G-3278 | Cl | F | $CH_2$(pyrrolidin-3-yl) | Et |
| G-3279 | Cl | F | $CH_2$(piperidin-3-yl) | Et |
| G-3280 | Cl | F | $CH_2${azetidin[1-C(=O)O(t-Bu)]-3-yl} | Et |
| G-3281 | Cl | F | $CH_2${pyrrolidin[1-C(=O)O(t-Bu)]-3-yl} | Et |
| G-3282 | Cl | F | $CH_2${piperidin[1-C(=O)O(t-Bu)]-3-yl} | Et |
| G-3283 | Cl | F | $CH_2${azetidin[1-C(=O)CF3]-3-yl} | Et |
| G-3284 | Cl | F | $CH_2${azetidin[1-S(=O)2CF3]-3-yl} | Et |
| G-3285 | Cl | F | $CH_2${pyrrolidin[1-C(=O)CF3]-3-yl} | Et |
| G-3286 | Cl | F | $CH_2${pyrrolidin[1-S(=O)2CF 3]-3-yl} | Et |
| G-3287 | Cl | F | $CH_2${piperidin[1-C(=O)CF3]-3-yl} | Et |
| G-3288 | Cl | F | $CH_2${piperidin[1-S(=O)2CF3]-3-yl} | Et |
| G-3289 | Cl | F | $CH_2CH_2CH_2CN$ | Et |
| G-3290 | Cl | F | $CH_2CH_2CH_2CH_2CN$ | Et |
| G-3291 | Cl | F | $CH_2CH_2CH_2CH_2CH_2CN$ | Et |
| G-3292 | Cl | F | $CH_2CH_2CH_2CH_2CH_2CH_2CN$ | Et |
| G-3293 | Cl | F | $CH_2CH_2CH_2C(=O)OH$ | Et |
| G-3294 | Cl | F | $CH_2CH_2CH_2CH_2C(=O)OH$ | Et |

TABLE 1195

| Compound Number | $R^3$ | $R^4$ | $R^5$ | $R^{11}$ |
|---|---|---|---|---|
| G-3295 | Cl | F | $CH_2CH_2CH_2CH_2CH_2C(=O)OH$ | Et |
| G-3296 | Cl | F | $CH_2CH_2SCN$ | Et |
| G-3297 | Cl | F | $CH_2CH_2CH_2SCN$ | Et |
| G-3298 | Cl | F | $CH_2CH_2CH_2CH_2SCN$ | Et |
| G-3299 | Cl | F | $CH_2CH_2CH_2CH_2CH_2SCN$ | Et |
| G-3300 | Cl | F | $CH_2CH_2CH_2CH_2CH_2CH_2SCN$ | Et |
| G-3301 | Cl | F | $CH_2CH_2CH_2CH_2CH_2CH_2CH_2SCN$ | Et |
| G-3302 | Cl | F | $CH_2CH_2CH_2CH_2CH_2CH_2CH_2CH_2SCN$ | Et |
| G-3303 | Cl | F | $CH_2CH_2CH(Me)SCN$ | Et |
| G-3304 | Cl | F | $CH_2CH(Me)CH_2SCN$ | Et |
| G-3305 | Cl | F | $CH(Me)CH_2CH_2SCN$ | Et |
| G-3306 | Cl | F | $CH_2CH_2CH_2CH(Me)SCN$ | Et |
| G-3307 | Cl | F | $CH_2CH_2CH(Me)CH_2SCN$ | Et |
| G-3308 | Cl | F | $CH_2CH(Me)CH_2CH_2SCN$ | Et |
| G-3309 | Cl | F | $CH(Me)CH_2CH_2CH_2SCN$ | Et |
| G-3310 | Cl | F | $CH_2CH_2CH_2CH_2CH(Me)SCN$ | Et |
| G-3311 | Cl | F | $CH_2CH_2CH_2CH(Me)CH_2SCN$ | Et |
| G-3312 | Cl | F | $CH_2CH_2CH(Me)CH_2CH_2SCN$ | Et |
| G-3313 | Cl | F | CH2CH(Me)$CH_2CH_2CH_2SCN$ | Et |
| G-3314 | Cl | F | $CH(Me)CH_2CH_2CH_2CH_2SCN$ | Et |
| G-3315 | Cl | F | $CH_2CH_2ONH_2$ | Et |
| G-3316 | Cl | F | $CH_2CH_2CH_2ONH_2$ | Et |
| G-3317 | Cl | F | $CH_2CH_2CH_2CH_2ONH_2$ | Et |
| G-3318 | Cl | F | $CH_2CH_2CH_2CH_2CH_2ONH_2$ | Et |
| G-3319 | Cl | F | $CH_2CH_2CH_2CH_2CH_2CH_2ONH_2$ | Et |
| G-3320 | Me | F | Me | Et |
| G-3321 | Me | F | Et | Et |
| G-3322 | Me | F | n-Pr | Et |
| G-3323 | Me | F | i-Pr | Et |
| G-3324 | Me | F | n-Bu | Et |
| G-3325 | Me | F | n-Pen | Et |
| G-3326 | Me | F | n-Hex | Et |
| G-3327 | Me | F | n-Heptyl | Et |
| G-3328 | Me | F | n-Octyl | Et |
| G-3329 | Me | F | n-Nonyl | Et |
| G-3330 | Me | F | n-Decyl | Et |
| G-3331 | Me | F | c-Pr | Et |
| G-3332 | Me | F | c-Pen | Et |
| G-3333 | Me | F | c-Hex | Et |
| G-3334 | Me | F | CH2C(Me)=$CH_2$ | Et |
| G-3335 | Me | F | $CH_2CH_2CH=CH_2$ | Et |
| G-3336 | Me | F | $CH_2CH_2CH=C(CH_3)_2$ | Et |
| G-3337 | Me | F | $CH_2CH_2CH_2CH=CH_2$ | Et |
| G-3338 | Me | F | $CH_2CH_2CH_2CH=C(CH_3)_2$ | Et |

TABLE 1196

| Compound Number | $R^3$ | $R^4$ | $R^5$ | $R^{11}$ |
|---|---|---|---|---|
| G-3339 | Me | F | $CH_2CH_2CH_2CH_2CH=CH_2$ | Et |
| G-3340 | Me | F | $CH_2CH_2CH_2CH_2CH=C(CH_3)_2$ | Et |
| G-3341 | Me | F | $CH_2CH_2CH$≡CH | Et |
| G-3342 | Me | F | $CH_2CH_2CH_2CH$≡CH | Et |
| G-3343 | Me | F | $CH_2CH_2CH_2CH_2CH$≡CH | Et |
| G-3344 | Me | F | $CH_2CH_2CH_2Cl$ | Et |
| G-3345 | Me | F | $CH_2CH_2CH_2Br$ | Et |
| G-3346 | Me | F | $CH_2CH_2CH_2CH_2Cl$ | Et |
| G-3347 | Me | F | $CH_2CH_2CH_2CH_2Br$ | Et |
| G-3348 | Me | F | $CH_2CH_2CH_2CH_2CH_2Cl$ | Et |
| G-3349 | Me | F | $CH_2CH_2CH_2CH_2CH_2Br$ | Et |
| G-3350 | Me | F | $CH_2CH_2CH_2CH_2CH_2CH_2Cl$ | Et |
| G-3351 | Me | F | $CH_2CH_2CH_2CH_2CH_2CH_2Br$ | Et |
| G-3352 | Me | F | $CH_2CH_2CH_2CH_2CH_2CH_2CH_2Cl$ | Et |
| G-3353 | Me | F | $CH_2CH_2CH_2CH_2CH_2CH_2CH_2Br$ | Et |
| G-3354 | Me | F | $CH_2CH_2CH_2CH_2CH_2CH_2CH_2CH_2Br$ | Et |
| G-3355 | Me | F | $CH_2CH(Me)CH_2Cl$ | Et |
| G-3356 | Me | F | $CH_2CH(Me)CH_2Br$ | Et |
| G-3357 | Me | F | $CH_2CH_2CH(Me)CH_2CH_2Cl$ | Et |
| G-3358 | Me | F | $CH_2CH_2CH(Me)CH_2CH_2Br$ | Et |
| G-3359 | Me | F | $CH_2CH_2CF=CF_2$ | Et |
| G-3360 | Me | F | $CH_2CH$=C(Cl)CF3 | Et |
| G-3361 | Me | F | $CH_2CH_2CH_2CF=CF_2$ | Et |
| G-3362 | Me | F | $CH_2CH_2CH_2CH_2CF=CF_2$ | Et |
| G-3363 | Me | F | $CH_2CH_2CH_2CH_2CH_2CF=CF_2$ | Et |
| G-3364 | Me | F | $CH_2$(t-Bu) | Et |
| G-3365 | Me | F | $CH_2CH_2$(t-Bu) | Et |
| G-3366 | Me | F | $CH_2CH_2CH_2$(t-Bu) | Et |
| G-3367 | Me | F | $CH_2CH_2CH_2CH_2$(t-Bu) | Et |
| G-3368 | Me | F | $CH_2CH_2CH_2CH_2CH_2$(t-Bu) | Et |
| G-3369 | Me | F | $CH_2CH_2CH_2CH_2CH_2CH_2$(t-Bu) | Et |
| G-3370 | Me | F | $CH_2CF_3$ | Et |
| G-3371 | Me | F | $CH_2CH_2CF_3$ | Et |
| G-3372 | Me | F | $CH_2CH_2CH_2CF_3$ | Et |
| G-3373 | Me | F | $CH_2CH_2CH_2CH_2CF_3$ | Et |
| G-3374 | Me | F | $CH_2CH_2CH_2CH_2CH_2CF_3$ | Et |
| G-3375 | Me | F | $CH_2CH_2CH_2CH_2CH_2CH_2CF_3$ | Et |
| G-3376 | Me | F | $CH_2CH_2CH_2CH_2CH_2CH_2CH_2CF_3$ | Et |
| G-3377 | Me | F | $CH_2CF_2CF_3$ | Et |
| G-3378 | Me | F | $CF_2CHFCF_3$ | Et |
| G-3379 | Me | F | $CF_2CF_2CF_3$ | Et |
| G-3380 | Me | F | $CH_2CF_2CF_2CF_3$ | Et |
| G-3381 | Me | F | $CH_2CF_2$CF2$CF_2CF_3$ | Et |
| G-3382 | Me | F | $CH_2CF_2CF_2CF_2CHF_2$ | Et |

TABLE 1197

| Compound Number | $R^3$ | $R^4$ | $R^5$ | $R^{11}$ |
|---|---|---|---|---|
| G-3383 | Me | F | $CH(CF_3)CF_3$ | Et |
| G-3384 | Me | F | $CH_2CF(CF_3)CF_3$ | Et |
| G-3385 | Me | F | $CH_2CF2CF(CF_3)CF_3$ | Et |
| G-3386 | Me | F | $CH_2CF(CF_3)CF_2CF_3$ | Et |
| G-3387 | Me | F | $CH_2CF2CF2CF(CF_3)CF_3$ | Et |
| G-3388 | Me | F | $CH_2CF2CF(CF_3)CF_2CF_3$ | Et |
| G-3389 | Me | F | $CH_2CF(CF_3)CF2CF_2CF_3$ | Et |
| G-3390 | Me | F | $CH_2$(c-Pr) | Et |
| G-3391 | Me | F | $CH_2$[C-Pr(1-Me)] | Et |
| G-3392 | Me | F | $CH_2$[c-Pr(1-Ph)] | Et |
| G-3393 | Me | F | $CH_2$[C-Pr(1-$NH_2$)] | Et |
| G-3394 | Me | F | $CH_2$[c-Pr(1-NHC(═O)O(t-Bu))] | Et |
| G-3395 | Me | F | $CH_2${c-Pr[1-NHS(═O)2$CF_3$]} | Et |
| G-3396 | Me | F | $CH_2${c-Pr[1-Ph(4-$CF_3$)]} | Et |
| G-3397 | Me | F | $CH_2${c-Pr[1-Ph(3,4,5-$F_3$)]} | Et |
| G-3398 | Me | F | $CH_2${c-Hex[4-(t-Bu)]} | Et |
| G-3399 | Me | F | $CH_2$[C-Hex(4-$CF_3$)] | Et |
| G-3400 | Me | F | $CH_2CH_2$(c-Pr) | Et |
| G-3401 | Me | F | $CH_2CH_2$(c-Hex) | Et |
| G-3402 | Me | F | $CH_2CH_2$[C-Hex(4-$CF_3$)] | Et |
| G-3403 | Me | F | $CH_2CH_2$[C-Hex(4-$SCF_3$)] | Et |
| G-3404 | Me | F | $CH_2CH_2CH_2$(c-Pr) | Et |
| G-3405 | Me | F | $CH_2CH_2CH_2$(c-Hex) | Et |
| G-3406 | Me | F | $CH_2CH_2CH_2${C-Hex[4-(t-Bu)]} | Et |
| G-3407 | Me | F | $CH_2CH_2CH_2$[c-Hex(4-$CF_3$)] | Et |
| G-3408 | Me | F | $CH_2CH_2CH_2$[C-Hex(4-$SCF_3$)] | Et |
| G-3409 | Me | F | $CH_2CH_2CH_2CH_2$(c-Pr) | Et |
| G-3410 | Me | F | $CH_2CH_2CH_2CH_2$(c-Hex) | Et |
| G-3411 | Me | F | $CH_2CH_2CH_2CH_2$[C-Hex(4-$CF_3$)] | Et |
| G-3412 | Me | F | $CH_2$[C-Pr(2,2-$F_2$)] | Et |
| G-3413 | Me | F | $CH_2$[C-Hex(4,4-$F_2$)] | Et |
| G-3414 | Me | F | $CH_2CH_2$[C-Pr(2,2-$F_2$)] | Et |
| G-3415 | Me | F | $CH_2CH_2$[c-Hex(4,4-$F_2$)] | Et |
| G-3416 | Me | F | $CH_2CH_2CH_2$[C-Pr(2,2-$F_2$)] | Et |
| G-3417 | Me | F | $CH_2CH_2CH_2CH_2$[C-Pr(2,2-$F_2$)] | Et |
| G-3418 | Me | F | $CH_2CH_2OH$ | Et |
| G-3419 | Me | F | $CH_2CH_2CH_2OH$ | Et |
| G-3420 | Me | F | $CH_2CH_2CH_2CH_2OH$ | Et |
| G-3421 | Me | F | $CH_2CH_2CH_2CH_2CH_2OH$ | Et |
| G-3422 | Me | F | $CH_2CH_2CH_2CH_2CH_2CH_2OH$ | Et |
| G-3423 | Me | F | $CH_2$C(═O)Me | Et |
| G-3424 | Me | F | $CH_2$CH(OH)Me | Et |
| G-3425 | Me | F | $CH_2CH(OH)CF_3$ | Et |
| G-3426 | Me | F | $CH_2C(OH)2CF_3$ | Et |

TABLE 1198

| Compound Number | $R^3$ | $R^4$ | $R^5$ | $R^{11}$ |
|---|---|---|---|---|
| G-3427 | Me | F | $CH_2C(CF_3)$═NOH | Et |
| G-3428 | Me | F | $CH_2C(CF_3)$═NOMe | Et |
| G-3429 | Me | F | $CH_2CH(CF_3)NH_2$ | Et |
| G-3430 | Me | F | $CH_2CH(CF_3)NHSO_2CF_3$ | Et |
| G-3431 | Me | F | $CH_2CH_2$OMe | Et |
| G-3432 | Me | F | $CH_2CH_2CH_2$OMe | Et |
| G-3433 | Me | F | $CH_2CH_2CH_2CH_2$OMe | Et |
| G-3434 | Me | F | $CH_2CH_2CH_2CH_2CH_2$OMe | Et |
| G-3435 | Me | F | $CH_2CH_2CH_2CH_2CH_2CH_2$OMe | Et |
| G-3436 | Me | F | $CH_2CH_2OCHF_2$ | Et |
| G-3437 | Me | F | $CH_2CH_2CH_2OCHF_2$ | Et |
| G-3438 | Me | F | $CH_2CH_2CH_2CH_2OCHF_2$ | Et |
| G-3439 | Me | F | $CH_2CH_2CH_2CH_2CH_2OCHF_2$ | Et |
| G-3440 | Me | F | $CH_2CH_2CH_2CH_2CH_2CH_2OCHF_2$ | Et |
| G-3441 | Me | F | $CH_2CH_2OCH_2CH_2CF_3$ | Et |
| G-3442 | Me | F | $CH_2CH_2CH_2OCH_2CH_2CF_3$ | Et |
| G-3443 | Me | F | $CH_2CH_2CH_2CH_2OCH_2CF_3$ | Et |
| G-3444 | Me | F | $CH_2CH_2CH_2CH_2CH_2OCH_2CF_3$ | Et |
| G-3445 | Me | F | $CH_2CH_2CH_2CH_2CH_2CH_2OCH_2CF_3$ | Et |
| G-3446 | Me | F | $CH_2CH_2CH_2CH_2CH_2CH_2CH_2OCH_2CF_3$ | Et |
| G-3447 | Me | F | $CH_2CH_2OC(CF_3)_3$ | Et |
| G-3448 | Me | F | $CH_2CH_2CH_2OC(CF_3)_3$ | Et |
| G-3449 | Me | F | $CH_2CH_2CH_2CH_2OC(CF_3)_3$ | Et |
| G-3450 | Me | F | $CH_2CH_2CH_2CH_2CH_2OC(CF_3)_3$ | Et |

TABLE 1198-continued

| Compound Number | $R^3$ | $R^4$ | $R^5$ | $R^{11}$ |
|---|---|---|---|---|
| G-3451 | Me | F | $CF_2CHFOCF_2CF_2CF_3$ | Et |
| G-3452 | Me | F | $CH_2CH_2$O(c-Pr) | Et |
| G-3453 | Me | F | $CH_2CH_2$O(c-Pen) | Et |
| G-3454 | Me | F | $CH_2CH_2$O(c-Hex) | Et |
| G-3455 | Me | F | $CH_2CH_2CH_2$O(c-Pr) | Et |
| G-3456 | Me | F | $CH_2CH_2CH_2$O(c-Pen) | Et |
| G-3457 | Me | F | $CH_2CH_2CH_2$O(c-Hex) | Et |
| G-3458 | Me | F | $CH_2CH_2CH_2CH_2$O(c-Pr) | Et |
| G-3459 | Me | F | $CH_2CH_2CH_2CH_2$O(c-Pen) | Et |
| G-3460 | Me | F | $CH_2CH_2CH_2CH_2$O(c-Hex) | Et |
| G-3461 | Me | F | $CH_2CH_2$O[c-Pr(2,2-$F_2$)] | Et |
| G-3462 | Me | F | $CH_2CH_2CH_2$O[c-Pr(2,2-$F_2$)] | Et |
| G-3463 | Me | F | $CH_2CH_2CH_2CH_2$O[c-Pr(2,2-$F_2$)] | Et |
| G-3464 | Me | F | $CH_2CH_2OCH_2CH_2OCH_3$ | Et |
| G-3465 | Me | F | $CH_2CH_2OCH_2CH_2OCH_2CF_3$ | Et |
| G-3466 | Me | F | $CH_2CF_2OCF_2CF_2OCF_3$ | Et |
| G-3467 | Me | F | $CF_2CHFOCF_2CF_2OCF_3$ | Et |
| G-3468 | Me | F | $CF_2CHFOCF_2CF(CF_3)OCF_2CF_2CF_3$ | Et |
| G-3469 | Me | F | $CH_2CH_2SH$ | Et |
| G-3470 | Me | F | $CH_2CH_2CH_2SH$ | Et |

TABLE 1199

| Compound Number | $R^3$ | $R^4$ | $R^5$ | $R^{11}$ |
|---|---|---|---|---|
| G-3471 | Me | F | $CH_2CH_2CH_2CH_2SH$ | Et |
| G-3472 | Me | F | $CH_2CH_2CH_2CH_2CH_2SH$ | Et |
| G-3473 | Me | F | $CH_2CH_2CH_2CH_2CH_2CH_2SH$ | Et |
| G-3474 | Me | F | $CH_2CH_2$S(t-Bu) | Et |
| G-3475 | Me | F | $CH_2CH_2CH_2$S(t-Bu) | Et |
| G-3476 | Me | F | $CH_2CH_2CH_2CH_2$S(t-Bu) | Et |
| G-3477 | Me | F | $CH_2CH_2CH_2CH_2CH_2SCH_3$ | Et |
| G-3478 | Me | F | $CH_2CH_2CH_2CH_2CH_2SCH(CH_3)_2$ | Et |
| G-3479 | Me | F | $CH_2CH_2CH_2CH_2CH_2$S(t-Bu) | Et |
| G-3480 | Me | F | $CH_2CH_2CH_2CH_2CH_2CH_2SCH(CH_3)_2$ | Et |
| G-3481 | Me | F | $CH_2CH_2CH_2CH_2CH_2CH_2$S(t-Bu) | Et |
| G-3482 | Me | F | $CH_2CH_2CH_2CH_2CH_2CH_2CH_2$S(t-Bu) | Et |
| G-3483 | Me | F | $CH_2CH_2SCHF_2$ | Et |
| G-3484 | Me | F | $CH_2CH_2CH_2SCHF_2$ | Et |
| G-3485 | Me | F | $CH_2CH_2CH_2CH_2SCHF_2$ | Et |
| G-3486 | Me | F | $CH_2CH_2CH_2CH_2CH_2SCHF_2$ | Et |
| G-3487 | Me | F | $CH_2CH_2CH_2CH_2CH_2CH_2SCHF_2$ | Et |
| G-3488 | Me | F | $CH_2CH_2CH_2CH_2CH_2CH_2CH_2SCHF_2$ | Et |
| G-3489 | Me | F | $CH_2CH_2SCF_3$ | Et |
| G-3490 | Me | F | $CH_2CH_2CH_2SCF_3$ | Et |
| G-3491 | Me | F | $CH_2CH_2CH_2CH_2SCF_3$ | Et |
| G-3492 | Me | F | $CH_2CH_2CH_2CH_2CH_2SCF_3$ | Et |
| G-3493 | Me | F | $CH_2CH_2CH_2CH_2CH_2CH_2SCF_3$ | Et |
| G-3494 | Me | F | $CH_2CH_2CH_2CH_2CH_2CH_2CH_2SCF_3$ | Et |
| G-3495 | Me | F | $CH_2CH_2CH_2CH_2CH_2CH_2CH_2CH_2SCF_3$ | Et |
| G-3496 | Me | F | $CH_2CH(Me)SCF_3$ | Et |
| G-3497 | Me | F | $CH(Me)CH_2SCF_3$ | Et |
| G-3498 | Me | F | $CH_2CH_2CH(Me)SCF_3$ | Et |
| G-3499 | Me | F | $CH_2CH(Me)CH_2SCF_3$ | Et |
| G-3500 | Me | F | $CH(Me)CH_2CH_2SCF_3$ | Et |
| G-3501 | Me | F | $CH_2CH_2CH_2CH(Me)SCF_3$ | Et |
| G-3502 | Me | F | $CH_2CH_2CH(Me)CH_2SCF_3$ | Et |
| G-3503 | Me | F | $CH_2CH(Me)CH_2CH_2SCF_3$ | Et |
| G-3504 | Me | F | $CH(Me)CH_2CH_2CH_2SCF_3$ | Et |
| G-3505 | Me | F | $CH_2CH_2SCH_2CF_3$ | Et |
| G-3506 | Me | F | $CH_2CH_2CH_2SCH_2CF_3$ | Et |
| G-3507 | Me | F | $CH_2CH_2CH_2CH_2SCH_2CF_3$ | Et |
| G-3508 | Me | F | $CH_2CH_2CH_2CH_2CH_2SCH_2CF_3$ | Et |
| G-3509 | Me | F | $CH_2CH_2CH_2CH_2CH_2CH_2SCH_2CF_3$ | Et |
| G-3510 | Me | F | $CH_2CH_2CH_2CH_2CH_2CH_2CH_2SCH_2CF_3$ | Et |
| G-3511 | Me | F | $CH_2CH_2SCH(CF_3)_2$ | Et |
| G-3512 | Me | F | $CH_2CH_2CH_2SCH(CF_3)_2$ | Et |
| G-3513 | Me | F | $CH_2CH_2CH_2CH_2SCH(CF_3)_2$ | Et |
| G-3514 | Me | F | $CH_2CH_2CH_2CH_2CH_2SCH(CF_3)_2$ | Et |

TABLE 1200

| Compound Number | $R^3$ | $R^4$ | $R^5$ | $R^{11}$ |
|---|---|---|---|---|
| G-3515 | Me | F | $CH_2CH_2CH_2CH_2CH_2CH_2SCH(CF_3)_2$ | Et |
| G-3516 | Me | F | $CH_2CH_2CH_2CH_2CH_2SCF_2CF_3$ | Et |
| G-3517 | Me | F | $CH_2CH_2CH_2CH_2CH_2CH_2SCF_2CF_3$ | Et |
| G-3518 | Me | F | $CH_2CH_2CH_2CH_2CH_2CH_2SCF(CF_3)_2$ | Et |
| G-3519 | Me | F | $CH_2CH_2CH_2CH_2CH_2CH_2CH_2SCF(CF_3)_2$ | Et |
| G-3520 | Me | F | $CH_2CH_2CH_2CH_2CH_2SCCl_3$ | Et |
| G-3521 | Me | F | $CH_2CH_2CH_2CH_2CH_2CH_2SCCl_3$ | Et |
| G-3522 | Me | F | $CH_2CH_2SCH_2CH{=}CH_2$ | Et |
| G-3523 | Me | F | $CH_2CH_2CH_2SCH_2CH{=}CH_2$ | Et |
| G-3524 | Me | F | $CH_2CH_2CH_2CH_2SCH_2CH{=}CH_2$ | Et |
| G-3525 | Me | F | $CH_2CH_2SCF{=}CFCF_3$ | Et |
| G-3526 | Me | F | $CH_2CH_2CH_2SCF{=}CFCF_3$ | Et |
| G-3527 | Me | F | $CH_2CH_2CH_2CH_2SCF{=}CFCF_3$ | Et |
| G-3528 | Me | F | $CH_2CH_2CH_2S$(c-Pr) | Et |
| G-3529 | Me | F | $CH_2CH_2CH_2S$(c-Hex) | Et |
| G-3530 | Me | F | $CH_2CH_2CH_2CH_2S$(c-Pr) | Et |
| G-3531 | Me | F | $CH_2CH_2CH_2CH_2S$(c-Hex) | Et |
| G-3532 | Me | F | $CH_2CH_2CH_2CH_2CH_2S$(c-Pr) | Et |
| G-3533 | Me | F | $CH_2CH_2CH_2CH_2CH_2S$(c-Hex) | Et |
| G-3534 | Me | F | $CH_2CH_2CH_2S$[c-Hex(4,4-$F_2$)] | Et |
| G-3535 | Me | F | $CH_2CH_2CH_2CH_2S$[c-Hex(4,4-$F_2$)] | Et |
| G-3536 | Me | F | $CH_2CH_2CH_2CH_2CH_2S$[c-Hex(4,4-$F_2$)] | Et |
| G-3537 | Me | F | $CH_2CH_2CH_2SCH_2$(c-Pr) | Et |

TABLE 1200-continued

| Compound Number | $R^3$ | $R^4$ | $R^5$ | $R^{11}$ |
|---|---|---|---|---|
| G-3538 | Me | F | $CH_2CH_2CH_2SCH_2$(c-Hex) | Et |
| G-3539 | Me | F | $CH_2CH_2CH_2CH_2SCH_2$(c-Pr) | Et |
| G-3540 | Me | F | $CH_2CH_2CH_2CH_2SCH_2$(c-Hex) | Et |
| G-3541 | Me | F | $CH_2CH_2CH_2CH_2CH_2SCH_2$(c-Pr) | Et |
| G-3542 | Me | F | $CH_2CH_2CH_2CH_2CH_2SCH_2$(c-Hex) | Et |
| G-3543 | Me | F | $CH_2CH_2CH_2SCH_2$[C-Hex(4,4-$F_2$)] | Et |
| G-3544 | Me | F | $CH_2CH_2CH_2CH_2SCH_2$[c-Hex(4,4-$F_2$)] | Et |
| G-3545 | Me | F | $CH_2CH_2CH_2CH_2CH_2SCH_2$[c-Hex(4,4-$F_2$)] | Et |
| G-3546 | Me | F | $CH_2CH_2CH_2SCH_2SiMe_3$ | Et |
| G-3547 | Me | F | $CH_2CH_2CH_2CH_2SCH_2SiMe_3$ | Et |
| G-3548 | Me | F | $CH_2CH_2CH_2CH_2CH_2SCH_2SiMe_3$ | Et |
| G-3549 | Me | F | $CH_2CH_2OCH_2CH_2SCH3$ | Et |
| G-3550 | Me | F | $CH_2CH_2OCH_2CH_2SCHF_2$ | Et |
| G-3551 | Me | F | $CH_2CH_2OCH_2CH_2SCF_3$ | Et |
| G-3552 | Me | F | $CH_2CH_2OCH_2CH_2SCH_2CF_3$ | Et |
| G-3553 | Me | F | $CH_2CH_2CH_2S({=}O)$(t-Bu) | Et |
| G-3554 | Me | F | $CH_2CH_2CH_2CH_2S({=}O)$(t-Bu) | Et |
| G-3555 | Me | F | $CH_2CH_2CH_2CH_2CH_2CH_2S({=}O)$(t-Bu) | Et |
| G-3556 | Me | F | $CH_2CH_2S({=}O)CHF_2$ | Et |
| G-3557 | Me | F | $CH_2CH_2CH_2S({=}O)CHF_2$ | Et |
| G-3558 | Me | F | $CH_2CH_2CH_2CH_2S({=}O)CHF_2$ | Et |

TABLE 1201

| Compound Number | $R^3$ | $R^4$ | $R^5$ | $R^{11}$ |
|---|---|---|---|---|
| G-3559 | Me | F | $CH_2CH_2CH_2CH_2CH_2S({=}O)CHF_2$ | Et |
| G-3560 | Me | F | $CH_2CH_2CH_2CH_2CH_2CH_2S({=}O)CHF_2$ | Et |
| G-3561 | Me | F | $CH_2CH_2CH_2CH_2CH_2CH_2CH_2S({=}O)CHF_2$ | Et |
| G-3562 | Me | F | $CH_2CH_2S({=}O)CF_3$ | Et |
| G-3563 | Me | F | $CH_2CH_2CH_2S({=}O)CF_3$ | Et |
| G-3564 | Me | F | $CH_2CH_2CH_2CH_2S({=}O)CF_3$ | Et |
| G-3565 | Me | F | $CH_2CH_2CH_2CH_2CH_2S({=}O)CF_3$ | Et |
| G-3566 | Me | F | $CH_2CH_2CH_2CH_2CH_2CH_2S({=}O)CF_3$ | Et |
| G-3567 | Me | F | $CH_2CH_2CH_2CH_2CH_2CH_2CH_2S({=}O)CF_3$ | Et |
| G-3568 | Me | F | $CH_2CH_2S({=}O)CH_2CF_3$ | Et |
| G-3569 | Me | F | $CH_2CH_2CH_2S({=}O)CH_2CF_3$ | Et |
| G-3570 | Me | F | $CH_2CH_2CH_2CH_2S({=}O)CH_2CF_3$ | Et |
| G-3571 | Me | F | $CH_2CH_2CH_2CH_2CH_2S({=}O)CH_2CF_3$ | Et |
| G-3572 | Me | F | $CH_2CH_2CH_2CH_2CH_2CH_2S({=}O)CH_2CF_3$ | Et |
| G-3573 | Me | F | $CH_2CH_2CH_2CH_2CH_2CH_2CH_2S({=}O)CH_2CF_3$ | Et |
| G-3574 | Me | F | $CH_2CH_2CH_2S({=}O)$(c-Pr) | Et |
| G-3575 | Me | F | $CH_2CH_2CH_2CH_2S({=}O)$(c-Pr) | Et |
| G-3576 | Me | F | $CH_2CH_2CH_2CH_2S({=}O)$(c-Pen) | Et |
| G-3577 | Me | F | $CH_2CH_2CH_2CH_2S({=}O)$(c-Hex) | Et |
| G-3578 | Me | F | $CH_2CH_2CH_2CH_2CH_2S({=}O)$(c-Pr) | Et |
| G-3579 | Me | F | $CH_2CH_2CH_2CH_2CH_2S({=}O)$(c-Hex) | Et |
| G-3580 | Me | F | $CH_2CH_2CH_2S({=}O)$[c-Hex(4,4-$F_2$)] | Et |
| G-3581 | Me | F | $CH_2CH_2CH_2CH_2S({=}O)$[c-Hex(4,4-$F_2$)] | Et |
| G-3582 | Me | F | $CH_2CH_2CH_2CH_2CH_2S({=}O)$[c-Hex(4,4-$F_2$)] | Et |
| G-3583 | Me | F | $CH_2CH_2CH_2CH_2S({=}O)_2Me$ | Et |
| G-3584 | Me | F | $CH_2CH_2CH_2CH_2CH_2S({=}O)_2Me$ | Et |
| G-3585 | Me | F | $CH_2CH_2CH_2CH_2CH_2S({=}O)_2$(t-Bu) | Et |
| G-3586 | Me | F | $CH_2CH_2S({=}O)_2CHF_2$ | Et |
| G-3587 | Me | F | $CH_2CH_2CH_2S({=}O)_2CHF_2$ | Et |
| G-3588 | Me | F | $CH_2CH_2CH_2CH_2S({=}O)_2CHF_2$ | Et |
| G-3589 | Me | F | $CH_2CH_2CH_2CH_2CH_2S({=}O)_2CHF_2$ | Et |
| G-3590 | Me | F | $CH_2CH_2CH_2CH_2CH_2CH_2S({=}O)_2CHF_2$ | Et |
| G-3591 | Me | F | $CH_2CH_2S({=}O)_2CF_3$ | Et |
| G-3592 | Me | F | $CH_2CH_2CH_2S({=}O)_2CF_3$ | Et |
| G-3593 | Me | F | $CH_2CH_2CH_2CH_2S({=}O)_2CF_3$ | Et |
| G-3594 | Me | F | $CH_2CH_2CH_2CH_2CH_2S({=}O)_2CF_3$ | Et |
| G-3595 | Me | F | $CH_2CH_2CH_2CH_2CH_2CH_2S({=}O)_2CF_3$ | Et |
| G-3596 | Me | F | $CH_2CH_2CH_2CH_2CH_2CH_2CH_2S({=}O)_2CF_3$ | Et |
| G-3597 | Me | F | $CH_2CH_2CH_2CH_2CH_2CH_2CH_2CH_2S({=}O)_2CF_3$ | Et |
| G-3598 | Me | F | $CH_2CH_2S({=}O)_2CH_2CF_3$ | Et |
| G-3599 | Me | F | $CH_2CH_2CH_2S({=}O)_2CH_2CF_3$ | Et |
| G-3600 | Me | F | $CH_2CH_2CH_2CH_2S({=}O)_2CH_2CF_3$ | Et |
| G-3601 | Me | F | $CH_2CH_2CH_2CH_2CH_2S({=}O)_2CH_2CF_3$ | Et |
| G-3602 | Me | F | $CH_2CH_2CH_2CH_2CH_2CH_2S({=}O)_2CH_2CF_3$ | Et |

TABLE 1202

| Compound Number | $R^3$ | $R^4$ | $R^5$ | $R^{11}$ |
|---|---|---|---|---|
| G-3603 | Me | F | $CH_2CH_2CH_2S(=O)_2$(c-Pr) | Et |
| G-3604 | Me | F | $CH_2CH_2CH_2CH_2S(=O)_2$(c-Pr) | Et |
| G-3605 | Me | F | $CH_2CH_2CH_2CH_2CH_2S(=O)_2$(c-Pr) | Et |
| G-3606 | Me | F | $CH_2CH_2CH_2S(=O)_2$[c-Hex(4,4-$F_2$)] | Et |
| G-3607 | Me | F | $CH_2CH_2CH_2CH_2S(=O)_2$[c-Hex(4,4-$F_2$)] | Et |
| G-3608 | Me | F | $CH_2CH_2CH_2CH_2CH_2S(=O)_2$[c-Hex(4,4-$F_2$)] | Et |
| G-3609 | Me | F | $CH_2CH_2CH_2C(=O)H$ | Et |
| G-3610 | Me | F | $CH_2CH_2CH_2CH_2C(=O)H$ | Et |
| G-3611 | Me | F | $CH_2CH_2CH_2CH_2CH_2C(=O)H$ | Et |
| G-3612 | Me | F | $CH_2CH_2CH_2C(=O)$(t-Bu) | Et |
| G-3613 | Me | F | $CH_2CH_2CH_2CH_2C(=O)$(t-Bu) | Et |
| G-3614 | Me | F | $CH_2CH_2CH_2CH_2CH_2C(=O)$(t-Bu) | Et |
| G-3615 | Me | F | $CH_2CH_2CH_2C(=O)CF_3$ | Et |
| G-3616 | Me | F | $CH_2CH_2CH_2CH_2C(=O)CF_3$ | Et |
| G-3617 | Me | F | $CH_2CH_2CH_2CH_2CH_2C(=O)CF_3$ | Et |
| G-3618 | Me | F | $CH_2C(=O)Ph$ | Et |
| G-3619 | Me | F | $CH_2C(=O)Ph$(4-Cl) | Et |
| G-3620 | Me | F | $CH_2C(=O)Ph(4-CF_3)$ | Et |
| G-3621 | Me | F | $CH_2CH_2C(=O)Ph(4-CF_3)$ | Et |
| G-3622 | Me | F | $CH_2CH_2CH_2C(=O)Ph(4-CF_3)$ | Et |
| G-3623 | Me | F | $CH_2CH_2CH_2CH_2C(=O)Ph(4-CF_3)$ | Et |
| G-3624 | Me | F | $CH_2CH_2CH_2CH_2CH_2C(=O)Ph(4-CF_3)$ | Et |
| G-3625 | Me | F | $CH_2C(=O)OEt$ | Et |
| G-3626 | Me | F | $CH_2CH_2C(=O)O$(t-Bu) | Et |
| G-3627 | Me | F | $CH_2CH_2CH_2C(=O)OEt$ | Et |
| G-3628 | Me | F | $CH_2CH_2CH_2C(=O)O$(t-Bu) | Et |
| G-3629 | Me | F | $CH_2CH_2CH_2CH_2C(=O)O$(t-Bu) | Et |
| G-3630 | Me | F | $CH_2CH_2CH_2CH_2CH_2C(=O)O$(t-Bu) | Et |
| G-3631 | Me | F | $CH_2CH_2CH_2CH_2CH_2CH_2C(=O)O$(t-Bu) | Et |
| G-3632 | Me | F | $CH_2CH_2CH_2CH_2CH_2CH_2CH_2C(=O)OEt$ | Et |
| G-3633 | Me | F | $CH_2CH_2C(=O)OCH_2CF_3$ | Et |
| G-3634 | Me | F | $CH_2CH_2CH_2C(=O)OCH_2CF_3$ | Et |
| G-3635 | Me | F | $CH_2CH_2CH_2CH_2C(=O)OCH_2CF_3$ | Et |
| G-3636 | Me | F | $CH_2CH_2CH_2CH_2CH_2C(=O)OCH_2CF_3$ | Et |
| G-3637 | Me | F | $CH_2CH_2C(=O)NH$(t-Bu) | Et |
| G-3638 | Me | F | $CH_2CH_2CH_2C(=O)NH$(t-Bu) | Et |
| G-3639 | Me | F | $CH_2CH_2CH_2C(=O)NH$(t-Pen) | Et |
| G-3640 | Me | F | $CH_2CH_2CH_2CH_2C(=O)NH$(t-Bu) | Et |
| G-3641 | Me | F | $CH_2CH_2C(=O)NHCH_2CF_3$ | Et |
| G-3642 | Me | F | $CH_2CH_2CH_2C(=O)NHCH_2CF_3$ | Et |
| G-3643 | Me | F | $CH_2CH_2CH_2CH_2C(=O)NHCH_2CF_3$ | Et |
| G-3644 | Me | F | $CH_2CH_2SC(=O)N(Me)_2$ | Et |
| G-3645 | Me | F | $CH_2CH_2CH_2SC(=O)N(Me)_2$ | Et |
| G-3646 | Me | F | $CH_2CH_2CH_2SC(=O)NH$(t-Bu) | Et |

TABLE 1203

| Compound Number | $R^3$ | $R^4$ | $R^5$ | $R^{11}$ |
|---|---|---|---|---|
| G-3647 | Me | F | $CH_2CH_2CH_2CH_2CH_2SC(=O)NH$(t-Bu) | Et |
| G-3648 | Me | F | $CH_2CH_2SC(=O)NHCH_2CF_3$ | Et |
| G-3649 | Me | F | $CH_2CH_2CH_2SC(=O)NHCH_2CF_3$ | Et |
| G-3650 | Me | F | $CH_2CH_2CH_2CH_2SC(=O)NHCH_2CF_3$ | Et |
| G-3651 | Me | F | $CH_2CH_2CH_2OC(=O)H$ | Et |
| G-3652 | Me | F | $CH_2CH_2CH_2CH_2OC(=O)H$ | Et |
| G-3653 | Me | F | $CH_2CH_2CH_2CH_2CH_2OC(=O)H$ | Et |
| G-3654 | Me | F | $CH_2CH_2CH_2OC(=O)Me$ | Et |
| G-3655 | Me | F | $CH_2CH_2CH_2CH_2OC(=O)Me$ | Et |
| G-3656 | Me | F | $CH_2CH_2CH_2CH_2CH_2OC(=O)Me$ | Et |
| G-3657 | Me | F | $CH_2CH_2OC(=O)CF_3$ | Et |
| G-3658 | Me | F | $CH_2CH_2CH_2OC(=O)CF_3$ | Et |
| G-3659 | Me | F | $CH_2CH_2CH_2CH_2OC(=O)CF_3$ | Et |
| G-3660 | Me | F | $CH_2CH_2CH_2CH_2CH_2OC(=O)Ph(4-CF_3)$ | Et |
| G-3661 | Me | F | $CH_2CH_2OC(=O)Ph$ | Et |
| G-3662 | Me | F | $CH_2CH_2OC(=O)Ph(4-CF_3)$ | Et |
| G-3663 | Me | F | $CH_2CH_2CH_2OC(=O)Ph(4-CF_3)$ | Et |
| G-3664 | Me | F | $CH_2CH_2CH_2CH_2OC(=O)Ph(4-CF_3)$ | Et |
| G-3665 | Me | F | $CH_2CH_2CH_2CH_2CH_2OC(=O)Ph(4-CF_3)$ | Et |
| G-3666 | Me | F | $CH_2CH_2OS(=O)Me$ | Et |
| G-3667 | Me | F | $CH_2CH_2CH_2OS(=O)Me$ | Et |
| G-3668 | Me | F | $CH_2CH_2CH_2CH_2OS(=O)Me$ | Et |
| G-3669 | Me | F | $CH_2CH_2CH_2CH_2CH_2OS(=O)Me$ | Et |

TABLE 1203-continued

| Compound Number | $R^3$ | $R^4$ | $R^5$ | $R^{11}$ |
|---|---|---|---|---|
| G-3670 | Me | F | $CH_2CH_2CH_2CH_2CH_2CH_2OS(=O)Me$ | Et |
| G-3671 | Me | F | $CH_2CH_2OS(=O)CF_3$ | Et |
| G-3672 | Me | F | $CH_2CH_2CH_2OS(=O)CF_3$ | Et |
| G-3673 | Me | F | $CH_2CH_2CH_2CH_2OS(=O)CF_3$ | Et |
| G-3674 | Me | F | $CH_2CH_2CH_2CH_2CH_2OS(=O)CF_3$ | Et |
| G-3675 | Me | F | $CH_2CH_2CH_2CH_2CH_2CH_2OS(=O)CF_3$ | Et |
| G-3676 | Me | F | $CH_2CH_2OS(=O)Ph$ | Et |
| G-3677 | Me | F | $CH_2CH_2OS(=O)Ph(4-Me)$ | Et |
| G-3678 | Me | F | $CH_2CH_2CH_2OS(=O)Ph$ | Et |
| G-3679 | Me | F | $CH_2CH_2CH_2OS(=O)Ph(4-Me)$ | Et |
| G-3680 | Me | F | $CH_2CH_2OS(=O)_2Me$ | Et |
| G-3681 | Me | F | $CH_2CH_2CH_2OS(=O)_2Me$ | Et |
| G-3682 | Me | F | $CH_2CH_2CH_2OS(=O)_2CF_3$ | Et |
| G-3683 | Me | F | $CH_2CH_2CH_2CH_2OS(=O)_2CF_3$ | Et |
| G-3684 | Me | F | $CH_2CH_2CH_2CH_2CH_2OS(=O)_2CF_3$ | Et |
| G-3685 | Me | F | $CH_2CH_2CH_2CH_2CH_2OS(=O)_2CF_2CF_2CF_2CF_3$ | Et |
| G-3686 | Me | F | $CH_2CH_2OS(=O)_2Ph$ | Et |
| G-3687 | Me | F | $CH_2CH_2OS(=O)_2Ph(4-Me)$ | Et |
| G-3688 | Me | F | $CH_2CH_2CH_2OS(=O)_2Ph$ | Et |
| G-3689 | Me | F | $CH_2CH_2CH_2OS(=O)_2Ph(4-Me)$ | Et |
| G-3690 | Me | F | $CH_2CH_2NH_2$ | Et |

TABLE 1204

| Compound Number | $R^3$ | $R^4$ | $R^5$ | $R^{11}$ |
|---|---|---|---|---|
| G-3691 | Me | F | $CH_2CH_2NH_2$, HCl | Et |
| G-3692 | Me | F | $CH_2CH_2CH_2NH_2$ | Et |
| G-3693 | Me | F | $CH_2CH_2CH_2CH_2NH_2$ | Et |
| G-3694 | Me | F | $CH_2CH_2CH_2CH_2CH_2NH_2$ | Et |
| G-3695 | Me | F | $CH_2CH_2CH_2CH_2CH_2CH_2NH_2$ | Et |
| G-3696 | Me | F | $CH_2CH_2CH_2CH_2CH_2CH_2CH_2NH_2$ | Et |
| G-3697 | Me | F | $CH_2CH(Me)NH_2$ | Et |
| G-3698 | Me | F | $CH_2C*H(Me)NH_2$, HCl | Et |
| G-3699 | Me | F | $CH_2C*H(Me)NH_2$:(R) | Et |
| G-3700 | Me | F | $CH_2C*H(Me)NH_2$, HCl:(R) | Et |
| G-3701 | Me | F | $CH_2C*H(Me)NH_2$:(S) | Et |
| G-3702 | Me | F | $CH_2C*H(Me)NH_2$, HCl:(S) | Et |
| G-3703 | Me | F | $CH_2CH(Et)NH_2$ | Et |
| G-3704 | Me | F | $CH_2CH(i-Pr)NH_2$ | Et |
| G-3705 | Me | F | $CH(Me)CH_2NH_2$ | Et |
| G-3706 | Me | F | $CH(Me)CH_2NH_2$, HCl | Et |
| G-3707 | Me | F | $CH(Et)CH_2NH_2$ | Et |
| G-3708 | Me | F | $CH(i-Pr)CH_2NH_2$ | Et |
| G-3709 | Me | F | $CH_2CH_2CH(Me)NH_2$ | Et |
| G-3710 | Me | F | $CH_2CH(Me)CH_2NH_2$ | Et |
| G-3711 | Me | F | $CH(Me)CH_2CH_2NH_2$ | Et |
| G-3712 | Me | F | $CH_2CH(Me)NH(c-Pr)$ | Et |
| G-3713 | Me | F | $CH_2CH(Me)N(c-Pr)S(=O)_2CF_3$ | Et |
| G-3714 | Me | F | $CH_2CH(Me)NHOMe$ | Et |
| G-3715 | Me | F | $CH_2CH(Me)N(OMe)S(=O)_2CF_3$ | Et |
| G-3716 | Me | F | $CH_2CH(Me)N(OMe)S(=O)_2Ph(2-NO_2)$ | Et |
| G-3717 | Me | F | $CH_2CH(Me)N(OMe)S(=O)_2Ph(4-NO_2)$ | Et |
| G-3718 | Me | F | $CH_2CH_2N(Me)(t-Bu)$ | Et |
| G-3719 | Me | F | $CH_2CH_2CH_2N(Me)(t-Bu)$ | Et |
| G-3720 | Me | F | $CH_2CH_2CH_2CH_2N(Me)(t-Bu)$ | Et |
| G-3721 | Me | F | $CH_2CH_2NHCH_2CF_3$ | Et |
| G-3722 | Me | F | $CH_2CH_2CH_2NHCH_2CF_3$ | Et |
| G-3723 | Me | F | $CH_2CH_2CH_2CH_2NHCH_2CF_3$ | Et |
| G-3724 | Me | F | $CH_2CH_2NHC(=O)C(Me)(CF_3)_2$ | Et |
| G-3725 | Me | F | $CH_2CH_2NHC(=O)Me$ | Et |
| G-3726 | Me | F | $CH_2CH_2NHC(=O)(t-Bu)$ | Et |
| G-3727 | Me | F | $CH_2CH_2CH_2CH_2NHC(=O)CH(CH_3)_2$ | Et |
| G-3728 | Me | F | $CH_2CH_2CH_2CH_2NHC(=O)(t-Bu)$ | Et |
| G-3729 | Me | F | $CH_2CH_2CH_2CH_2NHC(=O)CH_2(t-Bu)$ | Et |
| G-3730 | Me | F | $CH_2CH_2NHC(=O)CF_3$ | Et |
| G-3731 | Me | F | $CH_2CH_2NHC(=O)CH_2CF_3$ | Et |
| G-3732 | Me | F | $CH_2CH_2NHC(=O)CF_2CF_3$ | Et |
| G-3733 | Me | F | $CH_2CH_2CH_2NHC(=O)CF_3$ | Et |
| G-3734 | Me | F | $CH_2CH_2CH_2NHC(=O)CH_2CF_3$ | Et |

TABLE 1205

| Compound Number | $R^3$ | $R^4$ | $R^5$ | $R^{11}$ |
|---|---|---|---|---|
| G-3735 | Me | F | $CH_2CH_2CH_2NHC(=O)CF_2CF_3$ | Et |
| G-3736 | Me | F | $CH_2CH_2CH_2CH_2NHC(=O)CF_3$ | Et |
| G-3737 | Me | F | $CH_2CH_2CH_2CH_2NHC(=O)CH_2CF_3$ | Et |
| G-3738 | Me | F | $CH_2CH_2CH_2CH_2NHC(=O)CF_2CF_3$ | Et |
| G-3739 | Me | F | $CH_2CH_2CH_2CH_2NHC(=O)CF(CF_3)_2$ | Et |
| G-3740 | Me | F | $CH_2CH_2CH_2CH_2NHC(=O)CCl_3$ | Et |
| G-3741 | Me | F | $CH_2CH_2NHC(=O)Ph$ | Et |
| G-3742 | Me | F | $CH_2CH_2NHC(=O)Ph(4-CF_3)$ | Et |
| G-3743 | Me | F | $CH_2CH_2CH_2NHC(=O)Ph(4-CF_3)$ | Et |
| G-3744 | Me | F | $CH_2CH_2CH_2CH_2NHC(=O)Ph(4-CF_3)$ | Et |
| G-3745 | Me | F | $CH_2CH_2NHC(=O)O(t-Bu)$ | Et |
| G-3746 | Me | F | $CH_2CH_2CH_2NHC(=O)O(t-Bu)$ | Et |
| G-3747 | Me | F | $CH_2CH_2CH_2CH_2NHC(=O)O(t-Bu)$ | Et |
| G-3748 | Me | F | $CH_2CH_2CH_2CH_2NHC(=O)OCH(CH_3)_2$ | Et |
| G-3749 | Me | F | $CH_2CH(Me)NHC(=O)O(t-Bu)$ | Et |
| G-3750 | Me | F | $CH_2C*H(Me)NHC(=O)O(t-Bu)$:(R) | Et |
| G-3751 | Me | F | $CH_2C*H(Me)NHC(=O)O(t-Bu)$:(S) | Et |
| G-3752 | Me | F | $CH_2CH(Et)NHC(=O)O(t-Bu)$ | Et |
| G-3753 | Me | F | $CH_2CH(i-Pr)NHC(=O)O(t-Bu)$ | Et |
| G-3754 | Me | F | $CH(Me)CH_2NHC(=O)O(t-Bu)$ | Et |
| G-3755 | Me | F | $CH(Et)CH_2NHC(=O)O(t-Bu)$ | Et |
| G-3756 | Me | F | $CH(i-Pr)CH_2NHC(=O)O(t-Bu)$ | Et |
| G-3757 | Me | F | $CH_2CH(Me)CH_2NHC(=O)O(t-Bu)$ | Et |
| G-3758 | Me | F | $CH_2CH_2NHC(=O)OC(Me)_2CF_3$ | Et |
| G-3759 | Me | F | $CH_2CH_2CH_2NHC(=O)OCH_2CF_3$ | Et |
| G-3760 | Me | F | $CH_2CH_2CH_2NHC(=O)OCH_2CH_2CF_3$ | Et |
| G-3761 | Me | F | $CH_2CH_2CH_2CH_2NHC(=O)OCH_2CCl_3$ | Et |
| G-3762 | Me | F | $CH_2CH_2CH_2CH_2NHC(=O)OCH_2CF_3$ | Et |
| G-3763 | Me | F | $CH_2CH_2NHC(=O)NH(t-Bu)$ | Et |
| G-3764 | Me | F | $CH_2CH_2CH_2NHC(=O)NH(t-Bu)$ | Et |
| G-3765 | Me | F | $CH_2CH_2CH_2CH_2NHC(=O)NHEt$ | Et |
| G-3766 | Me | F | $CH_2CH_2CH_2CH_2NHC(=O)NH(t-Bu)$ | Et |
| G-3767 | Me | F | $CH_2CH_2CH_2NHC(=O)NHCH_2CCl_3$ | Et |
| G-3768 | Me | F | $CH_2CH_2CH_2NHC(=O)NHCH_2CH_2F$ | Et |
| G-3769 | Me | F | $CH_2CH_2CH_2NHC(=O)NHCH_2CF_3$ | Et |
| G-3770 | Me | F | $CH_2CH_2CH_2CH_2NHC(=O)NHCH_2CCl_3$ | Et |
| G-3771 | Me | F | $CH_2CH_2CH_2CH_2NHC(=O)NHCH_2CH_2F$ | Et |
| G-3772 | Me | F | $CH_2CH_2CH_2CH_2NHC(=O)NHCH_2CF_3$ | Et |
| G-3773 | Me | F | $CH_2CH_2NHS(=O)Me$ | Et |
| G-3774 | Me | F | $CH_2CH_2CH_2NHS(=O)Me$ | Et |
| G-3775 | Me | F | $CH_2CH_2CH_2CH_2NHS(=O)Me$ | Et |
| G-3776 | Me | F | $CH_2CH_2CH_2CH_2NHS(=O)CH(CH_3)_2$ | Et |
| G-3777 | Me | F | $CH_2CH_2CH_2CH_2CH_2NHS(=O)Me$ | Et |
| G-3778 | Me | F | $CH_2CH_2NHS(=O)CHF_2$ | Et |

TABLE 1206

| Compound Number | $R^3$ | $R^4$ | $R^5$ | $R^{11}$ |
|---|---|---|---|---|
| G-3779 | Me | F | $CH_2CH_2CH_2NHS(=O)CHF_2$ | Et |
| G-3780 | Me | F | $CH_2CH_2CH_2CH_2NHS(=O)CHF_2$ | Et |
| G-3781 | Me | F | $CH_2CH_2CH_2CH_2CH_2NHS(=O)CHF_2$ | Et |
| G-3782 | Me | F | $CH_2CH(Me)NHS(=O)CHF_2$ | Et |
| G-3783 | Me | F | $CH(Me)CH_2NHS(=O)CHF_2$ | Et |
| G-3784 | Me | F | $CH_2CH_2CH(Me)NHS(=O)CHF_2$ | Et |
| G-3785 | Me | F | $CH_2CH(Me)CH_2NHS(=O)CHF_2$ | Et |
| G-3786 | Me | F | $CH(Me)CH_2CH_2NHS(=O)CHF_2$ | Et |
| G-3787 | Me | F | $CH_2CH_2NHS(=O)CF_3$ | Et |
| G-3788 | Me | F | $CH_2CH_2CH_2NHS(=O)CF_3$ | Et |
| G-3789 | Me | F | $CH_2CH_2CH_2CH_2NHS(=O)CF_3$ | Et |
| G-3790 | Me | F | $CH_2CH_2CH_2CH_2CH_2NHS(=O)CF_3$ | Et |
| G-3791 | Me | F | $CH_2CH_2CH_2NHS(=O)Ph$ | Et |
| G-3792 | Me | F | $CH_2CH_2CH_2CH_2NHS(=O)Ph$ | Et |
| G-3793 | Me | F | $CH_2CH_2CH_2CH_2CH_2NHS(=O)Ph$ | Et |
| G-3794 | Me | F | $CH_2CH_2CH_2CH_2CH_2NHS(=O)Ph(4-CF_3)$ | Et |
| G-3795 | Me | F | $CH_2CH(Me)NHS(=O)Ph(4-CF_3)$ | Et |
| G-3796 | Me | F | $CH_2CH(Et)NHS(=O)Ph(4-CF_3)$ | Et |
| G-3797 | Me | F | $CH(Me)CH_2NHS(=O)Ph(4-CF_3)$ | Et |
| G-3798 | Me | F | $CH(Et)CH_2NHS(=O)Ph(4-CF_3)$ | Et |
| G-3799 | Me | F | $CH_2CH(Et)CH_2NHS(=O)Ph(4-CF_3)$ | Et |
| G-3800 | Me | F | $CH_2CH_2NHS(=O)_2Me$ | Et |
| G-3801 | Me | F | $CH_2CH_2CH_2NHS(=O)_2Me$ | Et |
| G-3802 | Me | F | $CH_2CH_2CH_2CH_2NHS(=O)_2Me$ | Et |
| G-3803 | Me | F | $CH_2CH_2CH_2CH_2NHS(=O)_2CH(CH_3)_2$ | Et |
| G-3804 | Me | F | $CH_2CH_2CH_2CH_2CH_2NHS(=O)_2Me$ | Et |
| G-3805 | Me | F | $CH_2CH_2NHS(=O)_2CHF_2$ | Et |
| G-3806 | Me | F | $CH_2CH_2CH_2NHS(=O)_2CHF_2$ | Et |
| G-3807 | Me | F | $CH_2CH_2CH_2CH_2NHS(=O)_2CHF_2$ | Et |
| G-3808 | Me | F | $CH_2CH_2CH_2CH_2CH_2NHS(=O)_2CHF_2$ | Et |
| G-3809 | Me | F | $CH_2CH(Me)NHS(=O)_2CHF_2$ | Et |
| G-3810 | Me | F | $CH(Me)CH_2NHS(=O)_2CHF_2$ | Et |
| G-3811 | Me | F | $CH_2CH_2CH(Me)NHS(=O)_2CHF_2$ | Et |
| G-3812 | Me | F | $CH_2CH(Me)CH_2NHS(=O)_2CHF_2$ | Et |
| G-3813 | Me | F | $CH(Me)CH_2CH_2NHS(=O)_2CHF_2$ | Et |
| G-3814 | Me | F | $CH_2CH(Me)N(Me)S(=O)_2CHF_2$ | Et |
| G-3815 | Me | F | $CH(Me)CH_2N(Me)S(=O)_2CHF_2$ | Et |
| G-3816 | Me | F | $CH_2CH_2CH(Me)N(Me)S(=O)_2CHF_2$ | Et |
| G-3817 | Me | F | $CH_2CH(Me)CH_2N(Me)S(=O)_2CHF_2$ | Et |
| G-3818 | Me | F | $CH(Me)CH_2CH_2N(Me)S(=O)_2CHF_2$ | Et |
| G-3819 | Me | F | $CH_2CH_2NHS(=O)_2CF_3$ | Et |
| G-3820 | Me | F | $CH_2CH_2CH_2NHS(=O)_2CF_3$ | Et |
| G-3821 | Me | F | $CH_2CH_2CH_2CH_2NHS(=O)_2CF_3$ | Et |
| G-3822 | Me | F | $CH_2CH_2CH_2CH_2CH_2NHS(=O)_2CF_3$ | Et |

TABLE 1207

| Compound Number | $R^3$ | $R^4$ | $R^5$ | $R^{11}$ |
|---|---|---|---|---|
| G-3823 | Me | F | $CH_2CH_2N(Me)S(=O)_2CF_3$ | Et |
| G-3824 | Me | F | $CH_2CH_2N(Et)S(=O)_2CF_3$ | Et |
| G-3825 | Me | F | $CH_2CH_2N(CH_2CN)S(=O)_2CF_3$ | Et |
| G-3826 | Me | F | $CH_2CH_2N(CH_2OMe)S(=O)_2CF_3$ | Et |
| G-3827 | Me | F | $CH_2CH_2CH_2N(Me)S(=O)_2CF_3$ | Et |
| G-3828 | Me | F | $CH_2CH_2CH_2N(Et)S(=O)_2CF_3$ | Et |
| G-3829 | Me | F | $CH_2CH_2CH_2N(CH_2CN)S(=O)_2CF_3$ | Et |
| G-3830 | Me | F | $CH_2CH_2CH_2N(CH_2OMe)S(=O)_2CF_3$ | Et |
| G-3831 | Me | F | $CH_2CH_2CH_2CH_2N(Me)S(=O)_2CF_3$ | Et |
| G-3832 | Me | F | $CH_2CH_2CH_2CH_2N(Et)S(=O)_2CF_3$ | Et |
| G-3833 | Me | F | $CH_2CH_2CH_2CH_2N(CH_2CN)S(=O)_2CF_3$ | Et |
| G-3834 | Me | F | $CH_2CH_2CH_2CH_2N(CH_2OMe)S(=O)_2CF_3$ | Et |
| G-3835 | Me | F | $CH_2CH(Me)NHS(=O)_2CF_3$ | Et |
| G-3836 | Me | F | $CH_2CH(Me)NHS(=O)_2CF_3$:(R) | Et |
| G-3837 | Me | F | $CH_2CH(Me)NHS(=O)_2CF_3$:(S) | Et |
| G-3838 | Me | F | $CH(Me)CH_2NHS(=O)_2CF_3$ | Et |
| G-3839 | Me | F | $CH_2CH_2CH(Me)NHS(=O)_2CF_3$ | Et |
| G-3840 | Me | F | $CH_2CH(Me)CH_2NHS(=O)_2CF_3$ | Et |
| G-3841 | Me | F | $CH(Me)CH_2CH_2NHS(=O)_2CF_3$ | Et |
| G-3842 | Me | F | $CH_2CH(Me)N(Me)S(=O)_2CF_3$ | Et |
| G-3843 | Me | F | $CH(Me)CH_2N(Me)S(=O)_2CF_3$ | Et |
| G-3844 | Me | F | $CH_2CH_2CH(Me)N(Me)S(=O)_2CF_3$ | Et |
| G-3845 | Me | F | $CH_2CH(Me)CH_2N(Me)S(=O)_2CF_3$ | Et |
| G-3846 | Me | F | $CH(Me)CH_2CH_2N(Me)S(=O)_2CF_3$ | Et |

TABLE 1207-continued

| Compound Number | $R^3$ | $R^4$ | $R^5$ | $R^{11}$ |
|---|---|---|---|---|
| G-3847 | Me | F | $CH_2CH_2CH_2NHS(=O)_2Ph$ | Et |
| G-3848 | Me | F | $CH_2CH_2CH_2CH_2NHS(=O)_2Ph$ | Et |
| G-3849 | Me | F | $CH_2CH_2CH_2CH_2CH_2NHS(=O)_2Ph$ | Et |
| G-3850 | Me | F | $CH_2CH_2CH_2CH_2CH_2NHS(=O)_2Ph(4-CF_3)$ | Et |
| G-3851 | Me | F | $CH_2CH(Me)NHS(=O)_2Ph(4-CF_3)$ | Et |
| G-3852 | Me | F | $CH_2CH(Et)NHS(=O)_2Ph(4-CF_3)$ | Et |
| G-3853 | Me | F | $CH(Me)CH_2NHS(=O)_2Ph(4-CF_3)$ | Et |
| G-3854 | Me | F | $CH(Et)CH_2NHS(=O)_2Ph(4-CF_3)$ | Et |
| G-3855 | Me | F | $CH_2CH(Me)CH_2NHS(=O)_2Ph(4-CF_3)$ | Et |
| G-3856 | Me | F | $CH_2CH_2SiMe_3$ | Et |
| G-3857 | Me | F | $CH_2CH_2CH_2SiMe_3$ | Et |
| G-3858 | Me | F | $CH_2CH_2CH_2CH_2SiMe_3$ | Et |
| G-3859 | Me | F | $CH_2Ph$ | Et |
| G-3860 | Me | F | $CH_2Ph(2-CF_3)$ | Et |
| G-3861 | Me | F | $CH_2Ph(3-CF_3)$ | Et |
| G-3862 | Me | F | $CH_2Ph(4-CF_3)$ | Et |
| G-3863 | Me | F | $CH_2Ph(2-OCF_3)$ | Et |
| G-3864 | Me | F | $CH_2Ph(3-OCF_3)$ | Et |
| G-3865 | Me | F | $CH_2Ph(4-OCF_3)$ | Et |
| G-3866 | Me | F | $CH_2Ph(2-SCF_3)$ | Et |

TABLE 1208

| Compound Number | $R^3$ | $R^4$ | $R^5$ | $R^{11}$ |
|---|---|---|---|---|
| G-3867 | Me | F | $CH_2Ph(3-SCF_3)$ | Et |
| G-3868 | Me | F | $CH_2Ph(4-SCF_3)$ | Et |
| G-3869 | Me | F | $CH_2Ph(3-CH_2SCF_3)$ | Et |
| G-3870 | Me | F | $CH_2Ph(4-F)$ | Et |
| G-3871 | Me | F | $CH_2Ph(4-Cl)$ | Et |
| G-3872 | Me | F | $CH_2Ph(4-Br)$ | Et |
| G-3873 | Me | F | $CH_2Ph(4-Me)$ | Et |
| G-3874 | Me | F | $CH_2Ph[4-(t-Bu)]$ | Et |
| G-3875 | Me | F | $CH_2Ph(4-CN)$ | Et |
| G-3876 | Me | F | $CH_2Ph(4-NO_2)$ | Et |
| G-3877 | Me | F | $CH_2Ph(4-OCHF_2)$ | Et |
| G-3878 | Me | F | $CH_2Ph(4-SCHF_2)$ | Et |
| G-3879 | Me | F | $CH_2Ph(4-CH_2SCF_3)$ | Et |
| G-3880 | Me | F | $CH_2Ph[4-CF(CF_3)_2]$ | Et |
| G-3881 | Me | F | $CH_2Ph(4-CH_2SCF_3)$ | Et |
| G-3882 | Me | F | $CH_2Ph[4-Ph(4-CF_3)]$ | Et |
| G-3883 | Me | F | $CH_2Ph(2,4-Cl_2)$ | Et |
| G-3884 | Me | F | $CH_2Ph[2,5-(CF_3)_2]$ | Et |
| G-3885 | Me | F | $CH_2Ph(3,4-Cl_2)$ | Et |
| G-3886 | Me | F | $CH_2Ph(3-CF_3-4-F)$ | Et |
| G-3887 | Me | F | $CH_2Ph(3-CF_3-4-Cl)$ | Et |
| G-3888 | Me | F | $CH_2Ph(3-F-4-CF_3)$ | Et |
| G-3889 | Me | F | $CH_2Ph(2,4,6-F_3)$ | Et |
| G-3890 | Me | F | $CH_2Ph(3,4,5-F_3)$ | Et |
| G-3891 | Me | F | $CH_2Ph(2,3,4-F_3)$ | Et |
| G-3892 | Me | F | $CH_2Ph(3,4,5-Cl_3)$ | Et |
| G-3893 | Me | F | $CH_2CH_2Ph$ | Et |
| G-3894 | Me | F | $CH_2CH_2Ph(4-F)$ | Et |
| G-3895 | Me | F | $CH_2CH_2Ph(4-Cl)$ | Et |
| G-3896 | Me | F | $CH_2CH_2Ph(4-Br)$ | Et |
| G-3897 | Me | F | $CH_2CH_2Ph[4-(t-Bu)]$ | Et |
| G-3898 | Me | F | $CH_2CH_2Ph(2-CF_3)$ | Et |
| G-3899 | Me | F | $CH_2CH_2Ph(3-CF_3)$ | Et |
| G-3900 | Me | F | $CH_2CH_2Ph(4-CF_3)$ | Et |
| G-3901 | Me | F | $CH_2CH_2Ph[4-CF(CF_3)_2]$ | Et |
| G-3902 | Me | F | $CH_2CH_2Ph[4-(c-Pr)]$ | Et |
| G-3903 | Me | F | $CH_2CH_2Ph\{4-[c-Pr(2,2-F_2)]\}$ | Et |
| G-3904 | Me | F | $CH_2CH_2Ph(4-OMe)$ | Et |
| G-3905 | Me | F | $CH_2CH_2Ph(3-OCF_3)$ | Et |
| G-3906 | Me | F | $CH_2CH_2Ph(4-OCHF_2)$ | Et |
| G-3907 | Me | F | $CH_2CH_2Ph(4-OCF_3)$ | Et |
| G-3908 | Me | F | $CH_2CH_2Ph(4-SMe)$ | Et |
| G-3909 | Me | F | $CH_2CH_2Ph(4-SCHF_2)$ | Et |
| G-3910 | Me | F | $CH_2CH_2Ph(4-SCF_3)$ | Et |

TABLE 1209

| Compound Number | $R^3$ | $R^4$ | $R^5$ | $R^{11}$ |
|---|---|---|---|---|
| G-3911 | Me | F | $CH_2CH_2Ph[4-S(=O)Me]$ | Et |
| G-3912 | Me | F | $CH_2CH_2Ph[4-S(=O)CF_3]$ | Et |
| G-3913 | Me | F | $CH_2CH_2Ph[4-S(=O)_2Me]$ | Et |
| G-3914 | Me | F | $CH_2CH_2Ph[4-S(=O)_2CF_3]$ | Et |
| G-3915 | Me | F | $CH_2CH_2Ph(4-CH_2SMe)$ | Et |
| G-3916 | Me | F | $CH_2CH_2Ph(4-CH_2SCF_3)$ | Et |
| G-3917 | Me | F | $CH_2CH_2Ph[4-OS(=O)_2Me]$ | Et |
| G-3918 | Me | F | $CH_2CH_2Ph[4-OS(=O)_2CF_3]$ | Et |
| G-3919 | Me | F | $CH_2CH_2Ph[4-Ph(4-CF_3)]$ | Et |
| G-3920 | Me | F | $CH_2CH_2Ph(4-CH_2Ph)$ | Et |
| G-3921 | Me | F | $CH_2CH_2Ph(4-OCH_2Ph)$ | Et |
| G-3922 | Me | F | $CH_2CH_2Ph(4-CN)$ | Et |
| G-3923 | Me | F | $CH_2CH_2Ph(4-NO_2)$ | Et |
| G-3924 | Me | F | $CH_2CH_2Ph(2,4-Cl_2)$ | Et |
| G-3925 | Me | F | $CH_2CH_2Ph(3,4-Cl_2)$ | Et |
| G-3926 | Me | F | $CH_2CH_2Ph(3-CF_3-4-F)$ | Et |
| G-3927 | Me | F | $CH_2CH_2Ph(2-CF_3-4-F)$ | Et |
| G-3928 | Me | F | $CH_2CH_2Ph(3-F-4-CF_3)$ | Et |
| G-3929 | Me | F | $CH_2CH_2Ph(2-F-4-CF_3)$ | Et |
| G-3930 | Me | F | $CH_2CH_2Ph(3-Cl-4-OCHF_2)$ | Et |
| G-3931 | Me | F | $CH_2CH_2Ph(3,4,5-Cl_3)$ | Et |
| G-3932 | Me | F | $CH_2CH_2Ph(2,3,4-F_3)$ | Et |
| G-3933 | Me | F | $CH_2CH_2Ph(2,4,5-F_3)$ | Et |
| G-3934 | Me | F | $CH_2CH_2Ph(3,4,5-F_3)$ | Et |
| G-3935 | Me | F | $CH_2CH_2Ph(2,4,6-F_3)$ | Et |
| G-3936 | Me | F | $CH_2CH_2CH_2Ph$ | Et |
| G-3937 | Me | F | $CH_2CH_2CH_2Ph(3-CF_3)$ | Et |
| G-3938 | Me | F | $CH_2CH_2CH_2Ph(4-CF_3)$ | Et |
| G-3939 | Me | F | $CH_2CH_2CH_2Ph(4-F)$ | Et |
| G-3940 | Me | F | $CH_2CH_2CH_2Ph[4-(t-Bu)]$ | Et |
| G-3941 | Me | F | $CH_2CH_2CH_2Ph(4-CN)$ | Et |
| G-3942 | Me | F | $CH_2CH_2CH_2Ph(4-CF_3)$ | Et |
| G-3943 | Me | F | $CH_2CH_2CH_2Ph(4-OCHF_2)$ | Et |
| G-3944 | Me | F | $CH_2CH_2CH_2Ph(4-OCF_3)$ | Et |
| G-3945 | Me | F | $CH_2CH_2CH_2Ph(4-SCHF_2)$ | Et |
| G-3946 | Me | F | $CH_2CH_2CH_2Ph(4-SCF_3)$ | Et |
| G-3947 | Me | F | $CH_2CH_2CH_2Ph[4-CF(CF_3)_2]$ | Et |
| G-3948 | Me | F | $CH_2CH_2CH_2Ph(3,4,5-F_3)$ | Et |
| G-3949 | Me | F | $CH_2CH_2CH_2Ph(2,4,6-F_3)$ | Et |
| G-3950 | Me | F | $CH_2CH_2CH_2CH_2Ph$ | Et |
| G-3951 | Me | F | $CH_2CH_2CH_2CH_2Ph(4-F)$ | Et |
| G-3952 | Me | F | $CH_2CH_2CH_2CH_2Ph(4-CF_3)$ | Et |
| G-3953 | Me | F | $CH_2CH_2CH_2CH_2Ph(4-OCF_3)$ | Et |
| G-3954 | Me | F | $CH_2CH_2CH_2CH_2Ph(4-SCF_3)$ | Et |

TABLE 1210

| Compound Number | $R^3$ | $R^4$ | $R^5$ | $R^{11}$ |
|---|---|---|---|---|
| G-3955 | Me | F | $CH_2CH_2CH_2CH_2CH_2Ph$ | Et |
| G-3956 | Me | F | $CH_2CH_2CH_2CH_2CH_2CH_2Ph$ | Et |
| G-3957 | Me | F | $CH_2CF_2Ph(4-F)$ | Et |
| G-3958 | Me | F | $CH_2CF_2Ph(4-CF_3)$ | Et |
| G-3959 | Me | F | $CH_2CF_2Ph(3,4,5-F_3)$ | Et |
| G-3960 | Me | F | $CH_2CH_2OPh$ | Et |
| G-3961 | Me | F | $CH_2CH_2OPh(4-F)$ | Et |
| G-3962 | Me | F | $CH_2CH_2OPh(4-CF_3)$ | Et |
| G-3963 | Me | F | $CH_2CH_2CH_2OPh$ | Et |
| G-3964 | Me | F | $CH_2CH_2CH_2OPh(4-Cl)$ | Et |
| G-3965 | Me | F | $CH_2CH_2CH_2OPh(4-CF_3)$ | Et |
| G-3966 | Me | F | $CH_2CH_2CH_2CH_2OPh(4-CF_3)$ | Et |
| G-3967 | Me | F | $CH_2CH_2CH_2CH_2OPh(4-OCF_3)$ | Et |
| G-3968 | Me | F | $CH_2CH_2CH_2CH_2CH_2OPh(4-CF_3)$ | Et |
| G-3969 | Me | F | $CH_2CH_2OCH_2Ph$ | Et |
| G-3970 | Me | F | $CH_2CH_2CH_2OCH_2Ph$ | Et |
| G-3971 | Me | F | $CH_2CH_2CH_2CH_2OCH_2Ph$ | Et |
| G-3972 | Me | F | $CH_2CH_2CH_2CH_2CH_2OCH_2Ph$ | Et |
| G-3973 | Me | F | $CH_2CH_2SPh$ | Et |
| G-3974 | Me | F | $CH_2CH_2CH_2SPh$ | Et |
| G-3975 | Me | F | $CH_2CH_2CH_2SPh(4-F)$ | Et |
| G-3976 | Me | F | $CH_2CH_2CH_2SPh(4-Cl)$ | Et |
| G-3977 | Me | F | $CH_2CH_2CH_2SPh(4-Br)$ | Et |
| G-3978 | Me | F | $CH_2CH_2CH_2SPh[4-(t-Bu)]$ | Et |

TABLE 1210-continued

| Compound Number | $R^3$ | $R^4$ | $R^5$ | $R^{11}$ |
|---|---|---|---|---|
| G-3979 | Me | F | $CH_2CH_2CH_2SPh(3-CF_3)$ | Et |
| G-3980 | Me | F | $CH_2CH_2CH_2SPh(4-CF_3)$ | Et |
| G-3981 | Me | F | $CH_2CH_2CH_2SPh(3-SCF_3)$ | Et |
| G-3982 | Me | F | $CH_2CH_2CH_2SPh(4-SCF_3)$ | Et |
| G-3983 | Me | F | $CH_2CH_2CH_2CH_2SPh$ | Et |
| G-3984 | Me | F | $CH_2CH_2CH_2CH_2SPh(4-F)$ | Et |
| G-3985 | Me | F | $CH_2CH_2CH_2CH_2SPh(4-Cl)$ | Et |
| G-3986 | Me | F | $CH_2CH_2CH_2CH_2SPh[4-(t-Bu)]$ | Et |
| G-3987 | Me | F | $CH_2CH_2CH_2CH_2SPh(4-CF_3)$ | Et |
| G-3988 | Me | F | $CH_2CH_2CH_2CH_2CH_2SPh$ | Et |
| G-3989 | Me | F | $CH_2CH_2CH_2CH_2CH_2SPh(4-F)$ | Et |
| G-3990 | Me | F | $CH_2CH_2CH_2CH_2CH_2SPh(4-Cl)$ | Et |
| G-3991 | Me | F | $CH_2CH_2CH_2CH_2CH_2SPh(4-CF_3)$ | Et |
| G-3992 | Me | F | $CH_2CH_2S(=O)Ph$ | Et |
| G-3993 | Me | F | $CH_2CH_2CH_2S(=O)Ph$ | Et |
| G-3994 | Me | F | $CH_2CH_2CH_2S(=O)Ph(4-F)$ | Et |
| G-3995 | Me | F | $CH_2CH_2CH_2S(=O)Ph[4-(t-Bu)]$ | Et |
| G-3996 | Me | F | $CH_2CH_2CH_2S(=O)Ph(4-CF_3)$ | Et |
| G-3997 | Me | F | $CH_2CH_2S(=O)_2Ph$ | Et |
| G-3998 | Me | F | $CH_2CH_2S(=O)_2Ph(4-CF_3)$ | Et |

TABLE 1211

| Compound Number | $R^3$ | $R^4$ | $R^5$ | $R^{11}$ |
|---|---|---|---|---|
| G-3999 | Me | F | $CH_2CH_2CH_2S(=O)_2Ph(4-F)$ | Et |
| G-4000 | Me | F | $CH_2CH_2CH_2S(=O)_2Ph(4-Cl)$ | Et |
| G-4001 | Me | F | $CH_2CH_2CH_2S(=O)_2Ph(4-CF_3)$ | Et |
| G-4002 | Me | F | $CH_2CH_2CH_2CH_2S(=O)_2Ph$ | Et |
| G-4003 | Me | F | $CH_2CH_2CH_2CH_2S(=O)_2Ph(4-Cl)$ | Et |
| G-4004 | Me | F | $CH_2CH_2CH_2CH_2S(=O)_2Ph(4-CF_3)$ | Et |
| G-4005 | Me | F | $CH_2CH_2SCH_2Ph$ | Et |
| G-4006 | Me | F | $CH_2CH_2CH_2SCH_2Ph$ | Et |
| G-4007 | Me | F | $CH_2CH_2CH_2SCH_2Ph(2-Cl)$ | Et |
| G-4008 | Me | F | $CH_2CH_2CH_2SCH_2Ph(3-Cl)$ | Et |
| G-4009 | Me | F | $CH_2CH_2CH_2SCH_2Ph(4-Cl)$ | Et |
| G-4010 | Me | F | $CH_2CH_2CH_2SCH_2Ph(2-SCF_3)$ | Et |
| G-4011 | Me | F | $CH_2CH_2CH_2SCH_2Ph(3-CF_3)$ | Et |
| G-4012 | Me | F | $CH_2CH_2CH_2SCH_2Ph(4-CF_3)$ | Et |
| G-4013 | Me | F | $CH_2CH_2CH_2SCH_2Ph(4-NO_2)$ | Et |
| G-4014 | Me | F | $CH_2CH_2CH_2CH_2SCH_2Ph$ | Et |
| G-4015 | Me | F | $CH_2CH_2CH_2CH_2SCH_2Ph(4-Cl)$ | Et |
| G-4016 | Me | F | $CH_2CH_2CH_2CH_2SCH_2Ph(4-CF_3)$ | Et |
| G-4017 | Me | F | $CH_2CH_2CH_2CH_2SCH_2Ph(4-CN)$ | Et |
| G-4018 | Me | F | $CH_2CH_2CH_2CH_2CH_2SCH_2Ph$ | Et |
| G-4019 | Me | F | $CH_2CH_2SCH_2CH_2Ph$ | Et |
| G-4020 | Me | F | $CH_2CH_2CH_2SCH_2CH_2Ph$ | Et |
| G-4021 | Me | F | $CH_2CH_2CH_2CH_2SCH_2CH_2Ph$ | Et |
| G-4022 | Me | F | $CH_2CH_2SCH(Me)Ph$ | Et |
| G-4023 | Me | F | $CH_2CH_2CH_2SCH(Me)Ph$ | Et |
| G-4024 | Me | F | $CH_2CH_2CH_2CH_2SCH(Me)Ph$ | Et |
| G-4025 | Me | F | $CH_2CH_2S(=O)CH_2Ph$ | Et |
| G-4026 | Me | F | $CH_2CH_2S(=O)CH_2Ph(4-CF_3)$ | Et |
| G-4027 | Me | F | $CH_2CH_2CH_2S(=O)CH_2Ph$ | Et |
| G-4028 | Me | F | $CH_2CH_2CH_2S(=O)CH_2Ph(2-SCF_3)$ | Et |
| G-4029 | Me | F | $CH_2CH_2CH_2S(=O)CH_2Ph(4-SCF_3)$ | Et |
| G-4030 | Me | F | $CH_2CH_2CH_2S(=O)CH_2Ph(4-Cl)$ | Et |
| G-4031 | Me | F | $CH_2CH_2CH_2S(=O)CH_2Ph(4-CF_3)$ | Et |
| G-4032 | Me | F | $CH_2CH_2CH_2CH_2S(=O)CH_2Ph$ | Et |
| G-4033 | Me | F | $CH_2CH_2CH_2CH_2S(=O)CH_2Ph(4-CF_3)$ | Et |
| G-4034 | Me | F | $CH_2CH_2CH_2CH_2CH_2S(=O)CH_2Ph(4-CF_3)$ | Et |
| G-4035 | Me | F | $CH_2CH_2S(=O)_2CH_2Ph$ | Et |
| G-4036 | Me | F | $CH_2CH_2S(=O)_2CH_2Ph(4-CF_3)$ | Et |
| G-4037 | Me | F | $CH_2CH_2CH_2S(=O)_2CH_2Ph$ | Et |
| G-4038 | Me | F | $CH_2CH_2CH_2S(=O)_2CH_2Ph(4-Cl)$ | Et |
| G-4039 | Me | F | $CH_2CH_2CH_2S(=O)_2CH_2Ph(4-CF_3)$ | Et |
| G-4040 | Me | F | $CH_2CH_2CH_2CH_2S(=O)_2CH_2Ph$ | Et |
| G-4041 | Me | F | $CH_2CH_2CH_2CH_2S(=O)_2CH_2Ph(4-CF_3)$ | Et |
| G-4042 | Me | F | $CH_2CH_2CH_2CH_2CH_2S(=O)_2CH_2Ph$ | Et |

TABLE 1212

| Compound Number | $R^3$ | $R^4$ | $R^5$ | $R^{11}$ |
|---|---|---|---|---|
| G-4043 | Me | F | $CH_2CH_2CH_2CH_2CH_2S(=O)_2CH_2Ph(4\text{-}CF_3)$ | Et |
| G-4044 | Me | F | $CH_2CH_2ON{=}CH(t\text{-}Bu)$ | Et |
| G-4045 | Me | F | $CH_2CH_2CH_2ON{=}CH(t\text{-}Bu)$ | Et |
| G-4046 | Me | F | $CH_2CH_2CH_2CH_2ON{=}C(Me)(c\text{-}Pr)$ | Et |
| G-4047 | Me | F | $CH_2CH_2ON{=}C(Me)CF_3$ | Et |
| G-4048 | Me | F | $CH_2CH_2CH_2ON{=}CHCF_3$ | Et |
| G-4049 | Me | F | $CH_2CH_2CH_2ON{=}C(Me)CF_3$ | Et |
| G-4050 | Me | F | $CH_2CH_2CH_2ON{=}C(Me)CCl_3$ | Et |
| G-4051 | Me | F | $CH_2CH_2CH_2CH_2ON{=}CHCF_3$ | Et |
| G-4052 | Me | F | $CH_2CH_2CH_2CH_2ON{=}C(Me)CF_3$ | Et |
| G-4053 | Me | F | $CH_2CH_2CH_2CH_2CH_2ON{=}C(Me)CF_3$ | Et |
| G-4054 | Me | F | $CH_2CH_2ON{=}CHPh$ | Et |
| G-4055 | Me | F | $CH_2CH_2ON{=}CHPh(4\text{-}CF_3)$ | Et |
| G-4056 | Me | F | $CH_2CH_2ON{=}CHPh(4\text{-}SCF_3)$ | Et |
| G-4057 | Me | F | $CH_2CH_2CH_2ON{=}CHPh(3\text{-}CF_3)$ | Et |
| G-4058 | Me | F | $CH_2CH_2CH_2ON{=}CHPh(4\text{-}CF_3)$ | Et |
| G-4059 | Me | F | $CH_2CH_2CH_2ON{=}CHPh(4\text{-}SCF_3)$ | Et |
| G-4060 | Me | F | $CH_2CH_2CH_2ON{=}C(Me)Ph(4\text{-}CF_3)$ | Et |
| G-4061 | Me | F | $CH_2CH_2CH_2CH_2ON{=}CHPh(4\text{-}SCF_3)$ | Et |
| G-4062 | Me | F | $CH_2CH_2$(adamant-1-yl) | Et |
| G-4063 | Me | F | $CH_2CH_2CH_2(3\text{-}CF_3$-pyrazol-1-yl) | Et |
| G-4064 | Me | F | $CH_2CH_2CH_2CH_2(3\text{-}CF_3$-pyrazol-1-yl) | Et |
| G-4065 | Me | F | $CH_2CH_2CH_2CH_2CH_2(3\text{-}CF_3$-pyrazol-1-yl) | Et |
| G-4066 | Me | F | $CH_2(1\text{-}Me\text{-}4\text{-}CF_3$-imidazol-5-yl) | Et |
| G-4067 | Me | F | $CH_2CH_2(1\text{-}Me\text{-}4\text{-}CF_3$-imidazol-5-yl) | Et |
| G-4068 | Me | F | $CH_2CH_2CH_2(1\text{-}Me\text{-}4\text{-}CF_3$-imidazol-5-yl) | Et |
| G-4069 | Me | F | $CH_2CH_2CH_2(3\text{-}CF_3$-1,2,4-triazol-1-yl) | Et |
| G-4070 | Me | F | $CH_2CH_2CH_2CH_2(3\text{-}CF_3$-1,2,4-triazol-1-yl) | Et |
| G-4071 | Me | F | $CH_2CH_2CH_2CH_2CH_2(3\text{-}CF_3$-1,2,4-triazol-1-yl) | Et |
| G-4072 | Me | F | $CH_2CH_2CH_2(4\text{-}CF_3$-thiazol-2-yl) | Et |
| G-4073 | Me | F | $CH_2CH_2CH_2CH_2(4\text{-}CF_3$-thiazol-2-yl) | Et |
| G-4074 | Me | F | $CH_2CH_2CH_2CH_2CH_2(4\text{-}CF_3$-thiazol-2-yl) | Et |
| G-4075 | Me | F | $CH_2CH_2CH_2(2\text{-}CF_3$-pyridin-5-yl) | Et |
| G-4076 | Me | F | $CH_2CH_2CH_2CH_2(2\text{-}CF_3$-pyridin-5-yl) | Et |
| G-4077 | Me | F | $CH_2CH_2CH_2CH_2CH_2(2\text{-}CF_3$-pyridin-5-yl) | Et |
| G-4078 | Me | F | $CH_2(4\text{-}CF_3$-pyrimidin-2-yl) | Et |
| G-4079 | Me | F | $CH_2CH_2(4\text{-}CF_3$-pyrimidin-2-yl) | Et |
| G-4080 | Me | F | $CH_2CH_2CH_2(4\text{-}CF_3$-pyrimidin-2-yl) | Et |
| G-4081 | Me | F | $CH_2CH_2O(3\text{-}Cl\text{-}5\text{-}CF_3$-pyridin-2-yl) | Et |
| G-4082 | Me | F | $CH_2CH_2CH_2O(3\text{-}Cl\text{-}5\text{-}CF_3$-pyridin-2-yl) | Et |
| G-4083 | Me | F | $CH_2CH_2CH_2CH_2O(3\text{-}Cl\text{-}5\text{-}CF_3$-pyridin-2-yl) | Et |
| G-4084 | Me | F | $CH_2CH_2CH_2CH_2CH_2O(3\text{-}Cl\text{-}5\text{-}CF_3$-pyridin-2-yl) | Et |
| G-4085 | Me | F | $CH_2CH_2N$(Phth) | Et |
| G-4086 | Me | F | $CH_2CH_2CH_2N$(Phth) | Et |

TABLE 1213

| Compound Number | $R^3$ | $R^4$ | $R^5$ | $R^{11}$ |
|---|---|---|---|---|
| G-4087 | Me | F | $CH_2CH_2CH_2CH_2N$(Phth) | Et |
| G-4088 | Me | F | $CH_2CH_2CH_2CH_2CH_2N$(Phth) | Et |
| G-4089 | Me | F | $CH_2CH(Me)CH_2N$(Phth) | Et |
| G-4090 | Me | F | $CH_2[1,3\text{-dioxolan}(2\text{-}CF_3)\text{-}2\text{-yl}]$ | Et |
| G-4091 | Me | F | $CH_2$(azetidin-3-yl) | Et |
| G-4092 | Me | F | $CH_2$(pyrrolidin-3-yl) | Et |
| G-4093 | Me | F | $CH_2$(piperidin-3-yl) | Et |
| G-4094 | Me | F | $CH_2$\{azetidin[1-C(=O)O(t-Bu)]-3-yl\} | Et |
| G-4095 | Me | F | $CH_2$\{pyrrolidin[1-C(=O)O(t-Bu)]-3-yl\} | Et |
| G-4096 | Me | F | $CH_2$\{piperidin[1-C(=O)O(t-Bu)]-3-yl\} | Et |
| G-4097 | Me | F | $CH_2$\{azetidin[1-C(=O)$CF_3$]-3-yl\} | Et |
| G-4098 | Me | F | $CH_2$\{azetidin[1-S(=O)$_2CF_3$]-3-yl\} | Et |
| G-4099 | Me | F | $CH_2$\{pyrrolidin[1-C(=O)$CF_3$]-3-yl\} | Et |
| G-4100 | Me | F | $CH_2$\{pyrrolidin[1-S(=O)$_2CF_3$]-3-yl\} | Et |
| G-4101 | Me | F | $CH_2$\{piperidin[1-C(=O)$CF_3$]-3-yl\} | Et |
| G-4102 | Me | F | $CH_2$\{piperidin[1-S(=O)$_2CF_3$]-3-yl\} | Et |
| G-4103 | Me | F | $CH_2CH_2CH_2CN$ | Et |
| G-4104 | Me | F | $CH_2CH_2CH_2CH_2CN$ | Et |
| G-4105 | Me | F | $CH_2CH_2CH_2CH_2CH_2CN$ | Et |
| G-4106 | Me | F | $CH_2CH_2CH_2CH_2CH_2CH_2CN$ | Et |
| G-4107 | Me | F | $CH_2CH_2C(=O)OH$ | Et |
| G-4108 | Me | F | $CH_2CH_2CH_2CH_2C(=O)OH$ | Et |
| G-4109 | Me | F | $CH_2CH_2CH_2CH_2CH_2C(=O)OH$ | Et |
| G-4110 | Me | F | $CH_2CH_2SCN$ | Et |
| G-4111 | Me | F | $CH_2CH_2CH_2SCN$ | Et |
| G-4112 | Me | F | $CH_2CH_2CH_2CH_2SCN$ | Et |
| G-4113 | Me | F | $CH_2CH_2CH_2CH_2CH_2SCN$ | Et |
| G-4114 | Me | F | $CH_2CH_2CH_2CH_2CH_2CH_2SCN$ | Et |
| G-4115 | Me | F | $CH_2CH_2CH_2CH_2CH_2CH_2CH_2SCN$ | Et |
| G-4116 | Me | F | $CH_2CH_2CH_2CH_2CH_2CH_2CH_2CH_2SCN$ | Et |
| G-4117 | Me | F | $CH_2CH_2CH(Me)SCN$ | Et |
| G-4118 | Me | F | $CH_2CH(Me)CH_2SCN$ | Et |
| G-4119 | Me | F | $CH(Me)CH_2CH_2SCN$ | Et |
| G-4120 | Me | F | $CH_2CH_2CH_2CH(Me)SCN$ | Et |
| G-4121 | Me | F | $CH_2CH_2CH(Me)CH_2SCN$ | Et |
| G-4122 | Me | F | $CH_2CH(Me)CH_2CH_2SCN$ | Et |
| G-4123 | Me | F | $CH(Me)CH_2CH_2CH_2SCN$ | Et |
| G-4124 | Me | F | $CH_2CH_2CH_2CH_2CH(Me)SCN$ | Et |
| G-4125 | Me | F | $CH_2CH_2CH_2CH(Me)CH_2SCN$ | Et |
| G-4126 | Me | F | $CH_2CH_2CH(Me)CH_2CH_2SCN$ | Et |
| G-4127 | Me | F | $CH_2CH(Me)CH_2CH_2CH_2SCN$ | Et |
| G-4128 | Me | F | $CH(Me)CH_2CH_2CH_2CH_2SCN$ | Et |
| G-4129 | Me | F | $CH_2CH_2ONH_2$ | Et |
| G-4130 | Me | F | $CH_2CH_2CH_2ONH_2$ | Et |

TABLE 1214

| Compound Number | $R^3$ | $R^4$ | $R^5$ | $R^{11}$ |
|---|---|---|---|---|
| G-4131 | Me | F | $CH_2CH_2CH_2CH_2ONH_2$ | Et |
| G-4132 | Me | F | $CH_2CH_2CH_2CH_2CH_2ONH_2$ | Et |
| G-4133 | Me | F | $CH_2CH_2CH_2CH_2CH_2CH_2ONH_2$ | Et |
| G-4134 | Cl | H | $CH_2C(=O)Me$ | Et |
| G-4135 | Cl | H | $CH_2CH(OH)Me$ | Et |
| G-4136 | Cl | H | $CH_2CH(OH)CF_3$ | Et |
| G-4137 | Cl | H | $CH_2C(OH)_2CF_3$ | Et |
| G-4138 | Cl | H | $CH_2C(CF_3){=}NOH$ | Et |
| G-4139 | Cl | H | $CH_2C(CF_3){=}NOMe$ | Et |
| G-4140 | Cl | H | $CH_2CH(CF_3)NH_2$ | Et |
| G-4141 | Cl | H | $CH_2CH(CF_3)NHSO2CF_3$ | Et |
| G-4142 | Cl | H | $CH_2[c\text{-}Pr(1\text{-}NH_2)]$ | Et |
| G-4143 | Cl | H | $CH_2[c\text{-}Pr(1\text{-}NHC(=O)O(t\text{-}Bu)]$ | Et |
| G-4144 | Cl | H | $CH_2\{c\text{-}Pr[1\text{-}NHS(=O)_2CF_3]\}$ | Et |
| G-4145 | Cl | H | $CH_2CH_2NH_2$ | Et |
| G-4146 | Cl | H | $CH_2CH_2NH_2$, HCl | Et |
| G-4147 | Cl | H | $CH_2CH_2CH_2NH_2$ | Et |
| G-4148 | Cl | H | $CH_2CH_2CH_2CH_2NH_2$ | Et |
| G-4149 | C | H | $CH_2CH_2CH_2CH_2CH_2NH_2$ | Et |
| G-4150 | Cl | H | $CH_2CH_2CH_2CH_2CH_2CH_2NH_2$ | Et |
| G-4151 | Cl | H | $CH_2CH_2CH_2CH_2CH_2CH_2CH_2NH_2$ | Et |
| G-4152 | Cl | H | $CH_2CH(Me)NH_2$ | Et |
| G-4153 | Cl | H | $CH_2C^*H(Me)NH_2$, HCl | Et |
| G-4154 | Cl | H | $CH_2C^*H(Me)NH_2$:(R) | Et |
| G-4155 | Cl | H | $CH_2C^*H(Me)NH_2$, HCl:(R) | Et |
| G-4156 | Cl | H | $CH_2C^*H(Me)NH_2$:(S) | Et |
| G-4157 | Cl | H | $CH_2C^*H(Me)NH_2$, HCl:(S) | Et |
| G-4158 | Cl | H | $CH_2CH(Et)NH_2$ | Et |
| G-4159 | Cl | H | $CH_2CH(i\text{-}Pr)NH_2$ | Et |
| G-4160 | Cl | H | $CH(Me)CH_2NH_2$ | Et |
| G-4161 | Cl | H | $CH(Me)CH_2NH_2$, HCl | Et |
| G-4162 | Cl | H | $CH(Et)CH_2NH_2$ | Et |
| G-4163 | Cl | H | $CH(i\text{-}Pr)CH_2NH_2$ | Et |
| G-4164 | Cl | H | $CH_2CH_2CH(Me)NH_2$ | Et |
| G-4165 | Cl | H | $CH_2CH(Me)CH_2NH_2$ | Et |
| G-4166 | Cl | H | $CH(Me)CH_2CH_2NH_2$ | Et |
| G-4167 | Cl | H | $CH_2CH(Me)NH(c\text{-}Pr)$ | Et |
| G-4168 | Cl | H | $CH_2CH(Me)N(c\text{-}Pr)S(=O)_2CF_3$ | Et |
| G-4169 | Cl | H | $CH_2CH(Me)NHOMe$ | Et |
| G-4170 | Cl | H | $CH_2CH(Me)N(OMe)S(=O)_2CF_3$ | Et |
| G-4171 | Cl | H | $CH_2CH(Me)N(OMe)S(=O)_2Ph(2\text{-}NO_2)$ | Et |
| G-4172 | Cl | H | $CH_2CH(Me)N(OMe)S(=O)_2Ph(4\text{-}NO_2)$ | Et |
| G-4173 | Cl | H | $CH_2CH_2NHC(=O)O(t\text{-}Bu)$ | Et |
| G-4174 | C | H | $CH_2CH_2CH_2NHC(=O)O(t\text{-}Bu)$ | Et |

TABLE 1215

| Compound Number | $R^3$ | $R^4$ | $R^5$ | $R^{11}$ |
|---|---|---|---|---|
| G-4175 | Cl | H | $CH_2CH_2CH_2CH_2NHC(=O)O(t-Bu)$ | Et |
| G-4176 | Cl | H | $CH_2CH_2CH_2CH_2NHC(=O)OCH(CH_3)_2$ | Et |
| G-4177 | Cl | H | $CH_2CH(Me)NHC(=O)O(t-Bu)$ | Et |
| G-4178 | Cl | H | $CH_2C^*H(Me)NHC(=O)O(t-Bu)$:(R) | Et |
| G-4179 | Cl | H | $CH_2C^*H(Me)NHC(=O)O(t-Bu)$:(S) | Et |
| G-4180 | Cl | H | $CH_2CH(Et)NHC(=O)O(t-Bu)$ | Et |
| G-4181 | Cl | H | $CH_2CH(i-Pr)NHC(=O)O(t-Bu)$ | Et |
| G-4182 | Cl | H | $CH(Me)CH_2NHC(=O)O(t-Bu)$ | Et |
| G-4183 | Cl | H | $CH(Et)CH_2NHC(=O)O(t-Bu)$ | Et |
| G-4184 | Cl | H | $CH(i-Pr)CH_2NHC(=O)O(t-Bu)$ | Et |
| G-4185 | Cl | H | $CH_2CH(Me)CH_2NHC(=O)O(t-Bu)$ | Et |
| G-4186 | Cl | H | $CH_2CH_2SCHF_2$ | Et |
| G-4187 | Cl | H | $CH_2CH_2CH_2SCHF_2$ | Et |
| G-4188 | Cl | H | $CH_2CH_2CH_2CH_2SCHF_2$ | Et |
| G-4189 | Cl | H | $CH_2CH_2CH_2CH_2CH_2SCHF_2$ | Et |
| G-4190 | Cl | H | $CH_2CH_2CH_2CH_2CH_2CH_2SCHF_2$ | Et |
| G-4191 | Cl | H | $CH_2CH_2CH_2CH_2CH_2CH_2CH_2SCHF_2$ | Et |
| G-4192 | Cl | H | $CH_2CH_2SCF_3$ | Et |
| G-4193 | Cl | H | $CH_2CH_2CH_2SCF_3$ | Et |
| G-4194 | Cl | H | $CH_2CH_2CH_2CH_2SCF_3$ | Et |
| G-4195 | Cl | H | $CH_2CH_2CH_2CH_2CH_2SCF_3$ | Et |
| G-4196 | Cl | H | $CH_2CH_2CH_2CH_2CH_2CH_2SCF_3$ | Et |
| G-4197 | Cl | H | $CH_2CH_2CH_2CH_2CH_2CH_2CH_2SCF_3$ | Et |
| G-4198 | Cl | H | $CH_2CH_2CH_2CH_2CH_2CH_2CH_2CH_2SCF_3$ | Et |
| G-4199 | Cl | H | $CH_2CH(Me)SCF_3$ | Et |
| G-4200 | Cl | H | $CH(Me)CH_2SCF_3$ | Et |
| G-4201 | Cl | H | $CH_2CH_2CH(Me)SCF_3$ | Et |
| G-4202 | Cl | H | $CH_2CH(Me)CH_2SCF_3$ | Et |
| G-4203 | Cl | H | $CH(Me)CH_2CH_2SCF_3$ | Et |
| G-4204 | Cl | H | $CH_2CH_2CH_2CH(Me)SCF_3$ | Et |
| G-4205 | Cl | H | $CH_2CH_2CH(Me)CH_2SCF_3$ | Et |
| G-4206 | Cl | H | $CH_2CH(Me)CH_2CH_2SCF_3$ | Et |
| G-4207 | Cl | H | $CH(Me)CH_2CH_2CH_2SCF_3$ | Et |
| G-4208 | Cl | H | $CH_2CH_2NHS(=O)_2CF_3$ | Et |
| G-4209 | Cl | H | $CH_2CH_2CH_2NHS(=O)_2CF_3$ | Et |
| G-4210 | Cl | H | $CH_2CH_2CH_2CH_2NHS(=O)_2CF_3$ | Et |
| G-4211 | Cl | H | $CH_2CH_2CH_2CH_2CH_2NHS(=O)_2CF_3$ | Et |
| G-4212 | Cl | H | $CH_2CH_2N(Me)S(=O)_2CF_3$ | Et |
| G-4213 | Cl | H | $CH_2CH_2N(Et)S(=O)_2CF_3$ | Et |
| G-4214 | Cl | H | $CH_2CH_2N(CH_2CN)S(=O)_2CF_3$ | Et |
| G-4215 | Cl | H | $CH_2CH_2N(CH_2OMe)S(=O)_2CF_3$ | Et |
| G-4216 | Cl | H | $CH_2CH_2CH_2N(Me)S(=O)_2CF_3$ | Et |
| G-4217 | Cl | H | $CH_2CH_2CH_2N(Et)S(=O)_2CF_3$ | Et |
| G-4218 | Cl | H | $CH_2CH_2CH_2N(CH_2CN)S(=O)_2CF_3$ | Et |

TABLE 1216

| Compound Number | $R^3$ | $R^4$ | $R^5$ | $R^{11}$ |
|---|---|---|---|---|
| G-4219 | Cl | H | $CH_2CH_2CH_2N(CH_2OMe)S(=O)_2CF_3$ | Et |
| G-4220 | Cl | H | $CH_2CH_2CH_2CH_2N(Me)S(=O)_2CF_3$ | Et |
| G-4221 | Cl | H | $CH_2CH_2CH_2CH_2N(Et)S(=O)_2CF_3$ | Et |
| G-4222 | Cl | H | $CH_2CH_2CH_2CH_2N(CH_2CN)S(=O)_2CF_3$ | Et |
| G-4223 | Cl | H | $CH_2CH_2CH_2CH_2N(CH_2OMe)S(=O)_2CF_3$ | Et |
| G-4224 | Cl | H | $CH_2CH(Me)NHS(=O)_2CF_3$ | Et |
| G-4225 | Cl | H | $CH_2CH(Me)NHS(=O)_2CF_3$:(R) | Et |
| G-4226 | Cl | H | $CH_2CH(Me)NHS(=O)_2CF_3$:(S) | Et |
| G-4227 | Cl | H | $CH(Me)CH_2NHS(=O)_2CF_3$ | Et |
| G-4228 | Cl | H | $CH_2CH_2CH(Me)NHS(=O)_2CF_3$ | Et |
| G-4229 | Cl | H | $CH_2CH(Me)CH_2NHS(=O)_2CF_3$ | Et |
| G-4230 | Cl | H | $CH(Me)CH_2CH_2NHS(=O)_2CF_3$ | Et |
| G-4231 | Cl | H | $CH_2CH(Me)N(Me)S(=O)_2CF_3$ | Et |
| G-4232 | Cl | H | $CH(Me)CH_2N(Me)S(=O)_2CF_3$ | Et |
| G-4233 | Cl | H | $CH_2CH_2CH(Me)N(Me)S(=O)_2CF_3$ | Et |
| G-4234 | Cl | H | $CH_2CH(Me)CH_2N(Me)S(=O)_2CF_3$ | Et |
| G-4235 | Cl | H | $CH(Me)CH_2CH_2N(Me)S(=O)_2CF_3$ | Et |
| G-4236 | Cl | H | $CH_2Ph$ | Et |
| G-4237 | Cl | H | $CH_2Ph(2-CF_3)$ | Et |
| G-4238 | Cl | H | $CH_2Ph(3-CF_3)$ | Et |
| G-4239 | Cl | H | $CH_2Ph(4-CF_3)$ | Et |
| G-4240 | Cl | H | $CH_2Ph(2-OCF_3)$ | Et |
| G-4241 | Cl | H | $CH_2Ph(3-OCF_3)$ | Et |
| G-4242 | Cl | H | $CH_2Ph(4-OCF_3)$ | Et |

TABLE 1216-continued

| Compound Number | $R^3$ | $R^4$ | $R^5$ | $R^{11}$ |
|---|---|---|---|---|
| G-4243 | Cl | H | $CH_2Ph(2-SCF_3)$ | Et |
| G-4244 | Cl | H | $CH_2Ph(3-SCF_3)$ | Et |
| G-4245 | Cl | H | $CH_2Ph(4-SCF_3)$ | Et |
| G-4246 | Cl | H | $CH_2Ph(3-CH_2SCF_3)$ | Et |
| G-4247 | Cl | H | $CH_2Ph(4-F)$ | Et |
| G-4248 | Cl | H | $CH_2Ph(4-Cl)$ | Et |
| G-4249 | Cl | H | $CH_2Ph(4-Br)$ | Et |
| G-4250 | Cl | H | $CH_2Ph(4-Me)$ | Et |
| G-4251 | Cl | H | $CH_2Ph[4-(t-Bu)]$ | Et |
| G-4252 | Cl | H | $CH_2Ph(4-CN)$ | Et |
| G-4253 | Cl | H | $CH_2Ph(4-NO_2)$ | Et |
| G-4254 | Cl | H | $CH_2Ph(4-OCHF_2)$ | Et |
| G-4255 | Cl | H | $CH_2Ph(4-SCHF_2)$ | Et |
| G-4256 | Cl | H | $CH_2Ph(4-CH_2SCF_3)$ | Et |
| G-4257 | Cl | H | $CH_2Ph[4-CF(CF_3)_2]$ | Et |
| G-4258 | Cl | H | $CH_2Ph(4-CH_2SCF_3)$ | Et |
| G-4259 | Cl | H | $CH_2Ph[4-Ph(4-CF_3)]$ | Et |
| G-4260 | Cl | H | $CH_2Ph(2,4-Cl_2)$ | Et |
| G-4261 | Cl | H | $CH_2Ph[2,5-(CF_3)_2]$ | Et |
| G-4262 | Cl | H | $CH_2Ph(3,4-Cl_2)$ | Et |

TABLE 1217

| Compound Number | $R^3$ | $R^4$ | $R^5$ | $R^{11}$ |
|---|---|---|---|---|
| G-4263 | Cl | H | $CH_2Ph(3-CF_3-4-F)$ | Et |
| G-4264 | Cl | H | $CH_2Ph(3-CF_3-4-Cl)$ | Et |
| G-4265 | Cl | H | $CH_2Ph(3-F-4-CF_3)$ | Et |
| G-4266 | Cl | H | $CH_2Ph(2,4,6-F_3)$ | Et |
| G-4267 | Cl | H | $CH_2Ph(3,4,5-F_3)$ | Et |
| G-4268 | Cl | H | $CH_2Ph(2,3,4-F_3)$ | Et |
| G-4269 | Cl | H | $CH_2Ph(3,4,5-Cl_3)$ | Et |
| G-4270 | Cl | H | $CH_2CH_2Ph$ | Et |
| G-4271 | Cl | H | $CH_2CH_2Ph(4-F)$ | Et |
| G-4272 | Cl | H | $CH_2CH_2Ph(4-Cl)$ | Et |
| G-4273 | Cl | H | $CH_2CH_2Ph(4-Br)$ | Et |
| G-4274 | Cl | H | $CH_2CH_2Ph[4-(t-Bu)]$ | Et |
| G-4275 | Cl | H | $CH_2CH_2Ph(2-CF_3)$ | Et |
| G-4276 | Cl | H | $CH_2CH_2Ph(3-CF_3)$ | Et |
| G-4277 | Cl | H | $CH_2CH_2Ph(4-CF_3)$ | Et |
| G-4278 | Cl | H | $CH_2CH_2Ph[4-CF(CF_3)_2]$ | Et |
| G-4279 | Cl | H | $CH_2CH_2Ph[4-(c-Pr)]$ | Et |
| G-4280 | Cl | H | $CH_2CH_2Ph\{4-[c-Pr(2,2-F_2)]\}$ | Et |
| G-4281 | Cl | H | $CH_2CH_2Ph(4-OMe)$ | Et |
| G-4282 | Cl | H | $CH_2CH_2Ph(3-OCF_3)$ | Et |
| G-4283 | Cl | H | $CH_2CH_2Ph(4-OCHF_2)$ | Et |
| G-4284 | Cl | H | $CH_2CH_2Ph(4-OCF_3)$ | Et |
| G-4285 | Cl | H | $CH_2CH_2Ph(4-SMe)$ | Et |
| G-4286 | Cl | H | $CH_2CH_2Ph(4-SCHF_2)$ | Et |
| G-4287 | Cl | H | $CH_2CH_2Ph(4-SCF_3)$ | Et |
| G-4288 | Cl | H | $CH_2CH_2Ph[4-S(=O)Me]$ | Et |
| G-4289 | Cl | H | $CH_2CH_2Ph[4-S(=O)CF_3]$ | Et |
| G-4290 | Cl | H | $CH_2CH_2Ph[4-S(=O)_2Me]$ | Et |
| G-4291 | Cl | H | $CH_2CH_2Ph[4-S(=O)_2CF_3]$ | Et |
| G-4292 | Cl | H | $CH_2CH_2Ph(4-CH_2SMe)$ | Et |
| G-4293 | Cl | H | $CH_2CH_2Ph(4-CH_2SCF_3)$ | Et |
| G-4294 | Cl | H | $CH_2CH_2Ph[4-OS(=O)_2Me]$ | Et |
| G-4295 | Cl | H | $CH_2CH_2Ph[4-OS(=O)_2CF_3]$ | Et |
| G-4296 | Cl | H | $CH_2CH_2Ph[4-Ph(4-CF_3)]$ | Et |
| G-4297 | Cl | H | $CH_2CH_2Ph(4-CH_2Ph)$ | Et |
| G-4298 | Cl | H | $CH_2CH_2Ph(4-OCH_2Ph)$ | Et |
| G-4299 | Cl | H | $CH_2CH_2Ph(4-CN)$ | Et |
| G-4300 | Cl | H | $CH_2CH_2Ph(4-NO_2)$ | Et |
| G-4301 | Cl | H | $CH_2CH_2Ph(2,4-Cl_2)$ | Et |
| G-4302 | Cl | H | $CH_2CH_2Ph(3,4-Cl_2)$ | Et |
| G-4303 | Cl | H | $CH_2CH_2Ph(3-CF_3-4-F)$ | Et |
| G-4304 | Cl | H | $CH_2CH_2Ph(2-CF_3-4-F)$ | Et |
| G-4305 | Cl | H | $CH_2CH_2Ph(3-F-4-CF_3)$ | Et |
| G-4306 | Cl | H | $CH_2CH_2Ph(2-F-4-CF_3)$ | Et |

TABLE 1218

| Compound Number | $R^3$ | $R^4$ | $R^5$ | $R^{11}$ |
|---|---|---|---|---|
| G-4307 | Cl | H | $CH_2CH_2Ph(3\text{-}Cl\text{-}4\text{-}OCHF_2)$ | Et |
| G-4308 | Cl | H | $CH_2CH_2Ph(3,4,5\text{-}Cl_3)$ | Et |
| G-4309 | Cl | H | $CH_2CH_2Ph(2,3,4\text{-}F_3)$ | Et |
| G-4310 | Cl | H | $CH_2CH_2Ph(2,4,5\text{-}F_3)$ | Et |
| G-4311 | Cl | H | $CH_2CH_2Ph(3,4,5\text{-}F_3)$ | Et |
| G-4312 | Cl | H | $CH_2CH_2Ph(2,4,6\text{-}F_3)$ | Et |
| G-4313 | Cl | H | $CH_2CH_2CH_2Ph$ | Et |
| G-4314 | Cl | H | $CH_2CH_2CH_2Ph(3\text{-}CF_3)$ | Et |
| G-4315 | Cl | H | $CH_2CH_2CH_2Ph(4\text{-}CF_3)$ | Et |
| G-4316 | Cl | H | $CH_2CH_2CH_2Ph(4\text{-}F)$ | Et |
| G-4317 | Cl | H | $CH_2CH_2CH_2Ph[4\text{-}(t\text{-}Bu)]$ | Et |
| G-4318 | Cl | H | $CH_2CH_2CH_2Ph(4\text{-}CN)$ | Et |
| G-4319 | Cl | H | $CH_2CH_2CH_2Ph(4\text{-}CF_3)$ | Et |
| G-4320 | Cl | H | $CH_2CH_2CH_2Ph(4\text{-}OCHF_2)$ | Et |
| G-4321 | Cl | H | $CH_2CH_2CH_2Ph(4\text{-}OCF_3)$ | Et |
| G-4322 | Cl | H | $CH_2CH_2CH_2Ph(4\text{-}SCHF_2)$ | Et |
| G-4323 | Cl | H | $CH_2CH_2CH_2Ph(4\text{-}SCF_3)$ | Et |
| G-4324 | Cl | H | $CH_2CH_2CH_2Ph[4\text{-}CF(CF_3)_2]$ | Et |
| G-4325 | Cl | H | $CH_2CH_2CH_2Ph(3,4,5\text{-}F_3)$ | Et |
| G-4326 | Cl | H | $CH_2CH_2CH_2Ph(2,4,6\text{-}F_3)$ | Et |
| G-4327 | Cl | H | $CH_2CH_2CH_2CH_2Ph$ | Et |
| G-4328 | Cl | H | $CH_2CH_2CH_2CH_2Ph(4\text{-}F)$ | Et |
| G-4329 | Cl | H | $CH_2CH_2CH_2CH_2Ph(4\text{-}CF_3)$ | Et |
| G-4330 | Cl | H | $CH_2CH_2CH_2CH_2Ph(4\text{-}OCF_3)$ | Et |
| G-4331 | Cl | H | $CH_2CH_2CH_2CH_2Ph(4\text{-}SCF_3)$ | Et |
| G-4332 | Cl | H | $CH_2CH_2CH_2CH_2CH_2Ph$ | Et |
| G-4333 | Cl | H | $CH_2CH_2CH_2CH_2CH_2CH_2Ph$ | Et |
| G-4334 | Cl | H | $CH_2CF_2Ph(4\text{-}F)$ | Et |
| G-4335 | Cl | H | $CH_2CF_2Ph(4\text{-}CF_3)$ | Et |
| G-4336 | Cl | H | $CH_2CF_2Ph(3,4,5\text{-}F_3)$ | Et |
| G-4337 | Me | H | $CH_2C({=}O)Me$ | Et |
| G-4338 | Me | H | $CH_2CH(OH)Me$ | Et |
| G-4339 | Me | H | $CH_2CH(OH)CF_3$ | Et |
| G-4340 | Me | H | $CH_2C(OH)_2CF_3$ | Et |
| G-4341 | Me | H | $CH_2C(CF_3){=}NOH$ | Et |
| G-4342 | Me | H | $CH_2C(CF_3){=}NOMe$ | Et |
| G-4343 | Me | H | $CH_2CH(CF_3)NH_2$ | Et |
| G-4344 | Me | H | $CH_2CH(CF_3)NHSO2CF_3$ | Et |
| G-4345 | Me | H | $CH_2[c\text{-}Pr(1\text{-}NH_2)]$ | Et |
| G-4346 | Me | H | $CH_2[c\text{-}Pr(1\text{-}NHC({=}O)O(t\text{-}Bu)]$ | Et |
| G-4347 | Me | H | $CH_2\{c\text{-}Pr[1\text{-}NHS({=}O)_2CF_3]\}$ | Et |
| G-4348 | Me | H | $CH_2CH_2NH_2$ | Et |
| G-4349 | Me | H | $CH_2CH_2NH_2$, HCl | Et |
| G-4350 | Me | H | $CH_2CH_2CH_2NH_2$ | Et |

TABLE 1219

| Compound Number | $R^3$ | $R^4$ | $R^5$ | $R^{11}$ |
|---|---|---|---|---|
| G-4351 | Me | H | $CH_2CH_2CH_2CH_2NH_2$ | Et |
| G-4352 | Me | H | $CH_2CH_2CH_2CH_2CH_2NH_2$ | Et |
| G-4353 | Me | H | $CH_2CH_2CH_2CH_2CH_2CH_2NH_2$ | Et |
| G-4354 | Me | H | $CH_2CH_2CH_2CH_2CH_2CH_2CH_2NH_2$ | Et |
| G-4355 | Me | H | $CH_2CH(Me)NH_2$ | Et |
| G-4356 | Me | H | $CH_2C{*}H(Me)NH_2$, HCl | Et |
| G-4357 | Me | H | $CH_2C{*}H(Me)NH_2$:(R) | Et |
| G-4358 | Me | H | $CH_2C{*}H(Me)NH_2$, HCl:(R) | Et |
| G-4359 | Me | H | $CH_2C{*}H(Me)NH_2$:(S) | Et |
| G-4360 | Me | H | $CH_2C{*}H(Me)NH_2$, HCl:(S) | Et |
| G-4361 | Me | H | $CH_2CH(Et)NH_2$ | Et |
| G-4362 | Me | H | $CH_2CH(i\text{-}Pr)NH_2$ | Et |
| G-4363 | Me | H | $CH(Me)CH_2NH_2$ | Et |
| G-4364 | Me | H | $CH(Me)CH_2NH_2$, HCl | Et |
| G-4365 | Me | H | $CH(Et)CH_2NH_2$ | Et |
| G-4366 | Me | H | $CH(i\text{-}Pr)CH_2NH_2$ | Et |
| G-4367 | Me | H | $CH_2CH_2CH(Me)NH_2$ | Et |
| G-4368 | Me | H | $CH_2CH(Me)CH_2NH_2$ | Et |
| G-4369 | Me | H | $CH(Me)CH_2CH_2NH_2$ | Et |
| G-4370 | Me | H | $CH_2CH(Me)NH(c\text{-}Pr)$ | Et |
| G-4371 | Me | H | $CH_2CH(Me)N(c\text{-}Pr)S({=}O)_2CF_3$ | Et |
| G-4372 | Me | H | $CH_2CH(Me)NHOMe$ | Et |
| G-4373 | Me | H | $CH_2CH(Me)N(OMe)S({=}O)_2CF_3$ | Et |
| G-4374 | Me | H | $CH_2CH(Me)N(OMe)S({=}O)_2Ph(2\text{-}NO_2)$ | Et |

TABLE 1219-continued

| Compound Number | $R^3$ | $R^4$ | $R^5$ | $R^{11}$ |
|---|---|---|---|---|
| G-4375 | Me | H | $CH_2CH(Me)N(OMe)S({=}O)_2Ph(4\text{-}NO_2)$ | Et |
| G-4376 | Me | H | $CH_2CH_2NHC({=}O)O(t\text{-}Bu)$ | Et |
| G-4377 | Me | H | $CH_2CH_2CH_2NHC({=}O)O(t\text{-}Bu)$ | Et |
| G-4378 | Me | H | $CH_2CH_2CH_2CH_2NHC({=}O)O(t\text{-}Bu)$ | Et |
| G-4379 | Me | H | $CH_2CH_2CH_2CH_2NHC({=}O)OCH(CH_3)_2$ | Et |
| G-4380 | Me | H | $CH_2CH(Me)NHC({=}O)O(t\text{-}Bu)$ | Et |
| G-4381 | Me | H | $CH_2C{*}H(Me)NHC({=}O)O(t\text{-}Bu)$:(R) | Et |
| G-4382 | Me | H | $CH_2C{*}H(Me)NHC({=}O)O(t\text{-}Bu)$:(S) | Et |
| G-4383 | Me | H | $CH_2CH(Et)NHC({=}O)O(t\text{-}Bu)$ | Et |
| G-4384 | Me | H | $CH_2CH(i\text{-}Pr)NHC({=}O)O(t\text{-}Bu)$ | Et |
| G-4385 | Me | H | $CH(Me)CH_2NHC({=}O)O(t\text{-}Bu)$ | Et |
| G-4386 | Me | H | $CH(Et)CH_2NHC({=}O)O(t\text{-}Bu)$ | Et |
| G-4387 | Me | H | $CH(i\text{-}Pr)CH_2NHC({=}O)O(t\text{-}Bu)$ | Et |
| G-4388 | Me | H | $CH_2CH(Me)CH_2NHC({=}O)O(t\text{-}Bu)$ | Et |
| G-4389 | Me | H | $CH_2CH_2SCHF_2$ | Et |
| G-4390 | Me | H | $CH_2CH_2CH_2SCHF_2$ | Et |
| G-4391 | Me | H | $CH_2CH_2CH_2CH_2SCHF_2$ | Et |
| G-4392 | Me | H | $CH_2CH_2CH_2CH_2CH_2SCHF_2$ | Et |
| G-4393 | Me | H | $CH_2CH_2CH_2CH_2CH_2CH_2SCHF_2$ | Et |
| G-4394 | Me | H | $CH_2CH_2CH_2CH_2CH_2CH_2CH_2SCHF_2$ | Et |

TABLE 1220

| Compound Number | $R^3$ | $R^4$ | $R^5$ | $R^{11}$ |
|---|---|---|---|---|
| G-4395 | Me | H | $CH_2CH_2SCF_3$ | Et |
| G-4396 | Me | H | $CH_2CH_2CH_2SCF_3$ | Et |
| G-4397 | Me | H | $CH_2CH_2CH_2CH_2SCF_3$ | Et |
| G-4398 | Me | H | $CH_2CH_2CH_2CH_2CH_2SCF_3$ | Et |
| G-4399 | Me | H | $CH_2CH_2CH_2CH_2CH_2CH_2SCF_3$ | Et |
| G-4400 | Me | H | $CH_2CH_2CH_2CH_2CH_2CH_2CH_2SCF_3$ | Et |
| G-4401 | Me | H | $CH_2CH_2CH_2CH_2CH_2CH_2CH_2CH_2SCF_3$ | Et |
| G-4402 | Me | H | $CH_2CH(Me)SCF_3$ | Et |
| G-4403 | Me | H | $CH(Me)CH_2SCF_3$ | Et |
| G-4404 | Me | H | $CH_2CH_2CH(Me)SCF_3$ | Et |
| G-4405 | Me | H | $CH_2CH(Me)CH_2SCF_3$ | Et |
| G-4406 | Me | H | $CH(Me)CH_2CH_2SCF_3$ | Et |
| G-4407 | Me | H | $CH_2CH_2CH_2CH(Me)SCF_3$ | Et |
| G-4408 | Me | H | $CH_2CH_2CH(Me)CH_2SCF_3$ | Et |
| G-4409 | Me | H | $CH_2CH(Me)CH_2CH_2SCF_3$ | Et |
| G-4410 | Me | H | $CH(Me)CH_2CH_2CH_2SCF_3$ | Et |
| G-4411 | Me | H | $CH_2CH_2NHS({=}O)_2CF_3$ | Et |
| G-4412 | Me | H | $CH_2CH_2CH_2NHS({=}O)_2CF_3$ | Et |
| G-4413 | Me | H | $CH_2CH_2CH_2CH_2NHS({=}O)_2CF_3$ | Et |
| G-4414 | Me | H | $CH_2CH_2CH_2CH_2CH_2NHS({=}O)_2CF_3$ | Et |
| G-4415 | Me | H | $CH_2CH_2N(Me)S({=}O)_2CF_3$ | Et |
| G-4416 | Me | H | $CH_2CH_2N(Et)S({=}O)_2CF_3$ | Et |
| G-4417 | Me | H | $CH_2CH_2N(CH_2CN)S({=}O)_2CF_3$ | Et |
| G-4418 | Me | H | $CH_2CH_2N(CH_2OMe)S({=}O)_2CF_3$ | Et |
| G-4419 | Me | H | $CH_2CH_2CH_2N(Me)S({=}O)_2CF_3$ | Et |
| G-4420 | Me | H | $CH_2CH_2CH_2N(Et)S({=}O)_2CF_3$ | Et |
| G-4421 | Me | H | $CH_2CH_2CH_2N(CH_2CN)S({=}O)_2CF_3$ | Et |
| G-4422 | Me | H | $CH_2CH_2CH_2N(CH_2OMe)S({=}O)_2CF_3$ | Et |
| G-4423 | Me | H | $CH_2CH_2CH_2CH_2N(Me)S({=}O)_2CF_3$ | Et |
| G-4424 | Me | H | $CH_2CH_2CH_2CH_2N(Et)S({=}O)_2CF_3$ | Et |
| G-4425 | Me | H | $CH_2CH_2CH_2CH_2N(CH_2CN)S({=}O)_2CF_3$ | Et |
| G-4426 | Me | H | $CH_2CH_2CH_2CH_2N(CH_2OMe)S({=}O)_2CF_3$ | Et |
| G-4427 | Me | H | $CH_2CH(Me)NHS({=}O)_2CF_3$ | Et |
| G-4428 | Me | H | $CH_2CH(Me)NHS({=}O)_2CF_3$:(R) | Et |
| G-4429 | Me | H | $CH_2CH(Me)NHS({=}O)_2CF_3$:(S) | Et |
| G-4430 | Me | H | $CH(Me)CH_2NHS({=}O)_2CF_3$ | Et |
| G-4431 | Me | H | $CH_2CH_2CH(Me)NHS({=}O)_2CF_3$ | Et |
| G-4432 | Me | H | $CH_2CH(Me)CH_2NHS({=}O)_2CF_3$ | Et |
| G-4433 | Me | H | $CH(Me)CH_2CH_2NHS({=}O)_2CF_3$ | Et |
| G-4434 | Me | H | $CH_2CH(Me)N(Me)S({=}O)_2CF_3$ | Et |
| G-4435 | Me | H | $CH(Me)CH_2N(Me)S({=}O)_2CF_3$ | Et |
| G-4436 | Me | H | $CH_2CH_2CH(Me)N(Me)S({=}O)_2CF_3$ | Et |
| G-4437 | Me | H | $CH_2CH(Me)CH_2N(Me)S({=}O)_2CF_3$ | Et |
| G-4438 | Me | H | $CH(Me)CH_2CH_2N(Me)S({=}O)_2CF_3$ | Et |

TABLE 1221

| Compound Number | $R^3$ | $R^4$ | $R^5$ | $R^{11}$ |
|---|---|---|---|---|
| G-4439 | Me | H | $CH_2Ph$ | Et |
| G-4440 | Me | H | $CH_2Ph(2-CF_3)$ | Et |
| G-4441 | Me | H | $CH_2Ph(3-CF_3)$ | Et |
| G-4442 | Me | H | $CH_2Ph(4-CF_3)$ | Et |
| G-4443 | Me | H | $CH_2Ph(2-OCF_3)$ | Et |
| G-4444 | Me | H | $CH_2Ph(3-OCF_3)$ | Et |
| G-4445 | Me | H | $CH_2Ph(4-OCF_3)$ | Et |
| G-4446 | Me | H | $CH_2Ph(2-SCF_3)$ | Et |
| G-4447 | Me | H | $CH_2Ph(3-SCF_3)$ | Et |
| G-4448 | Me | H | $CH_2Ph(4-SCF_3)$ | Et |
| G-4449 | Me | H | $CH_2Ph(3-CH_2SCF_3)$ | Et |
| G-4450 | Me | H | $CH_2Ph(4-F)$ | Et |
| G-4451 | Me | H | $CH_2Ph(4-Cl)$ | Et |
| G-4452 | Me | H | $CH_2Ph(4-Br)$ | Et |
| G-4453 | Me | H | $CH_2Ph(4-Me)$ | Et |
| G-4454 | Me | H | $CH_2Ph[4-(t-Bu)]$ | Et |
| G-4455 | Me | H | $CH_2Ph(4-CN)$ | Et |
| G-4456 | Me | H | $CH_2Ph(4-NO_2)$ | Et |
| G-4457 | Me | H | $CH_2Ph(4-OCHF_2)$ | Et |
| G-4458 | Me | H | $CH_2Ph(4-SCHF_2)$ | Et |
| G-4459 | Me | H | $CH_2Ph(4-CH_2SCF_3)$ | Et |
| G-4460 | Me | H | $CH_2Ph[4-CF(CF_3)_2]$ | Et |
| G-4461 | Me | H | $CH_2Ph(4-CH_2SCF_3)$ | Et |
| G-4462 | Me | H | $CH_2Ph[4-Ph(4-CF_3)]$ | Et |
| G-4463 | Me | H | $CH_2Ph(2,4-Cl_2)$ | Et |
| G-4464 | Me | H | $CH_2Ph[2,5-(CF_3)_2]$ | Et |
| G-4465 | Me | H | $CH_2Ph(3,4-Cl_2)$ | Et |
| G-4466 | Me | H | $CH_2Ph(3-CF_3-4-F)$ | Et |
| G-4467 | Me | H | $CH_2Ph(3-CF_3-4-Cl)$ | Et |
| G-4468 | Me | H | $CH_2Ph(3-F-4-CF_3)$ | Et |
| G-4469 | Me | H | $CH_2Ph(2,4,6-F_3)$ | Et |
| G-4470 | Me | H | $CH_2Ph(3,4,5-F_3)$ | Et |
| G-4471 | Me | H | $CH_2Ph(2,3,4-F_3)$ | Et |
| G-4472 | Me | H | $CH_2Ph(3,4,5-Cl_3)$ | Et |
| G-4473 | Me | H | $CH_2CH_2Ph$ | Et |
| G-4474 | Me | H | $CH_2CH_2Ph(4-F)$ | Et |
| G-4475 | Me | H | $CH_2CH_2Ph(4-Cl)$ | Et |
| G-4476 | Me | H | $CH_2CH_2Ph(4-Br)$ | Et |
| G-4477 | Me | H | $CH_2CH_2Ph[4-(t-Bu)]$ | Et |
| G-4478 | Me | H | $CH_2CH_2Ph(2-CF_3)$ | Et |
| G-4479 | Me | H | CH2CH $_2Ph(3-CF_3)$ | Et |
| G-4480 | Me | H | $CH_2CH_2Ph(4-CF_3)$ | Et |
| G-4481 | Me | H | $CH_2CH_2Ph[4-CF(CF_3)_2]$ | Et |
| G-4482 | Me | H | $CH_2CH_2Ph[4-(c-Pr)]$ | Et |

TABLE 1222

| Compound Number | $R^3$ | $R^4$ | $R^5$ | $R^{11}$ |
|---|---|---|---|---|
| G-4483 | Me | H | $CH_2CH_2Ph\{4-[c-Pr(2,2-F_2)]\}$ | Et |
| G-4484 | Me | H | $CH_2CH_2Ph(4-OMe)$ | Et |
| G-4485 | Me | H | $CH_2CH_2Ph(3-OCF_3)$ | Et |
| G-4486 | Me | H | $CH_2CH_2Ph(4-OCHF_2)$ | Et |
| G-4487 | Me | H | $CH_2CH_2Ph(4-OCF_3)$ | Et |
| G-4488 | Me | H | $CH_2CH_2Ph(4-SMe)$ | Et |
| G-4489 | Me | H | $CH_2CH_2Ph(4-SCHF_2)$ | Et |
| G-4490 | Me | H | $CH_2CH_2Ph(4-SCF_3)$ | Et |
| G-4491 | Me | H | $CH_2CH_2Ph[4-S(=O)Me]$ | Et |
| G-4492 | Me | H | $CH_2CH_2Ph[4-S(=O)CF_3]$ | Et |
| G-4493 | Me | H | $CH_2CH_2Ph[4-S(=O)_2Me]$ | Et |
| G-4494 | Me | H | $CH_2CH_2Ph[4-S(=O)_2CF_3]$ | Et |
| G-4495 | Me | H | $CH_2CH_2Ph(4-CH_2SMe)$ | Et |
| G-4496 | Me | H | $CH_2CH_2Ph(4-CH_2SCF_3)$ | Et |
| G-4497 | Me | H | $CH_2CH_2Ph[4-OS(=O)_2Me]$ | Et |
| G-4498 | Me | H | $CH_2CH_2Ph[4-OS(=O)_2CF_3]$ | Et |
| G-4499 | Me | H | $CH_2CH_2Ph[4-Ph(4-CF_3)]$ | Et |
| G-4500 | Me | H | $CH_2CH_2Ph(4-CH_2Ph)$ | Et |
| G-4501 | Me | H | $CH_2CH_2Ph(4-OCH_2Ph)$ | Et |
| G-4502 | Me | H | $CH_2CH_2Ph(4-CN)$ | Et |
| G-4503 | Me | H | $CH_2CH_2Ph(4-NO_2)$ | Et |
| G-4504 | Me | H | $CH_2CH_2Ph(2,4-Cl_2)$ | Et |
| G-4505 | Me | H | $CH_2CH_2Ph(3,4-Cl_2)$ | Et |
| G-4506 | Me | H | $CH_2CH_2Ph(3-CF_3-4-F)$ | Et |

TABLE 1222-continued

| Compound Number | $R^3$ | $R^4$ | $R^5$ | $R^{11}$ |
|---|---|---|---|---|
| G-4507 | Me | H | $CH_2CH_2Ph(2-CF_3-4-F)$ | Et |
| G-4508 | Me | H | $CH_2CH_2Ph(3-F-4-CF_3)$ | Et |
| G-4509 | Me | H | $CH_2CH_2Ph(2-F-4-CF_3)$ | Et |
| G-4510 | Me | H | $CH_2CH_2Ph(3-Cl-4-OCHF_2)$ | Et |
| G-4511 | Me | H | $CH_2CH_2Ph(3,4,5-Cl_3)$ | Et |
| G-4512 | Me | H | $CH_2CH_2Ph(2,3,4-F_3)$ | Et |
| G-4513 | Me | H | $CH_2CH_2Ph(2,4,5-F_3)$ | Et |
| G-4514 | Me | H | $CH_2CH_2Ph(3,4,5-F_3)$ | Et |
| G-4515 | Me | H | $CH_2CH_2Ph(2,4,6-F_3)$ | Et |
| G-4516 | Me | H | $CH_2CH_2CH_2Ph$ | Et |
| G-4517 | Me | H | $CH_2CH_2CH_2Ph(3-CF_3)$ | Et |
| G-4518 | Me | H | $CH_2CH_2CH_2Ph(4-CF_3)$ | Et |
| G-4519 | Me | H | $CH_2CH_2CH_2Ph(4-F)$ | Et |
| G-4520 | Me | H | $CH_2CH_2CH_2Ph[4-(t-Bu)]$ | Et |
| G-4521 | Me | H | $CH_2CH_2CH_2Ph(4-CN)$ | Et |
| G-4522 | Me | H | $CH_2CH_2CH_2Ph(4-CF_3)$ | Et |
| G-4523 | Me | H | $CH_2CH_2CH_2Ph(4-OCHF_2)$ | Et |
| G-4524 | Me | H | $CH_2CH_2CH_2Ph(4-OCF_3)$ | Et |
| G-4525 | Me | H | $CH_2CH_2CH_2Ph(4-SCHF_2)$ | Et |
| G-4526 | Me | H | $CH_2CH_2CH_2Ph(4-SCF_3)$ | Et |

TABLE 1223

| Compound Number | $R^3$ | $R^4$ | $R^5$ | $R^{11}$ |
|---|---|---|---|---|
| G-4527 | Me | H | $CH_2CH_2CH_2Ph[4-CF(CF_3)_2]$ | Et |
| G-4528 | Me | H | $CH_2CH_2CH_2Ph(3,4,5-F_3)$ | Et |
| G-4529 | Me | H | $CH_2CH_2CH_2Ph(2,4,6-F_3)$ | Et |
| G-4530 | Me | H | $CH_2CH_2CH_2CH_2Ph$ | Et |
| G-4531 | Me | H | $CH_2CH_2CH_2CH_2Ph(4-F)$ | Et |
| G-4532 | Me | H | $CH_2CH_2CH_2CH_2Ph(4-CF_3)$ | Et |
| G-4533 | Me | H | $CH_2CH_2CH_2CH_2Ph(4-OCF_3)$ | Et |
| G-4534 | Me | H | $CH_2CH_2CH_2CH_2Ph(4-SCF_3)$ | Et |
| G-4535 | Me | H | $CH_2CH_2CH_2CH_2CH_2Ph$ | Et |
| G-4536 | Me | H | $CH_2CH_2CH_2CH_2CH_2CH_2Ph$ | Et |
| G-4537 | Me | H | $CH_2CF_2Ph(4-F)$ | Et |
| G-4538 | Me | H | $CH_2CF_2Ph(4-CF_3)$ | Et |
| G-4539 | Me | H | $CH_2CF_2Ph(3,4,5-F_3)$ | Et |
| G-4540 | $CF_3$ | H | $CH_2CH(Me)NH_2$ | Et |
| G-4541 | $CF_3$ | H | $CH_2C^*H(Me)NH_2$, HCl | Et |
| G-4542 | $CF_3$ | H | $CH_2C^*H(Me)NH_2$:(R) | Et |
| G-4543 | $CF_3$ | H | $CH_2C^*H(Me)NH_2$, HCl:(R) | Et |
| G-4544 | $CF_3$ | H | $CH_2C^*H(Me)NH_2$:(S) | Et |
| G-4545 | $CF_3$ | H | $CH_2C^*H(Me)NH_2$, HCl:(S) | Et |
| G-4546 | $CF_3$ | H | $CH_2CH(Me)NHC(=O)O(t-Bu)$ | Et |
| G-4547 | $CF_3$ | H | $CH_2C^*H(Me)NHC(=O)O(t-Bu)$:(R) | Et |
| G-4548 | $CF_3$ | H | $CH_2C^*H(Me)NHC(=O)O(t-Bu)$:(S) | Et |
| G-4549 | $CF_3$ | H | $CH_2CH(Me)NHS(=O)_2CF_3$ | Et |
| G-4550 | $CF_3$ | H | $CH_2CH(Me)NHS(=O)_2CF_3$:(R) | Et |
| G-4551 | $CF_3$ | H | $CH_2CH(Me)NHS(=O)_2CF_3$:(S) | Et |
| G-4552 | $OCF_3$ | H | $CH_2CH(Me)NH_2$ | Et |
| G-4553 | $OCF_3$ | H | $CH_2C^*H(Me)NH_2$, HCl | Et |
| G-4554 | $OCF_3$ | H | $CH_2C^*H(Me)NH_2$:(R) | Et |
| G-4555 | $OCF_3$ | H | $CH_2C^*H(Me)NH_2$, HCl:(R) | Et |
| G-4556 | $OCF_3$ | H | $CH_2C^*H(Me)NH_2$:(S) | Et |
| G-4557 | $OCF_3$ | H | $CH_2C^*H(Me)NH_2$, HCl:(S) | Et |
| G-4558 | $OCF_3$ | H | $CH_2CH(Me)NHC(=O)O(t-Bu)$ | Et |
| G-4559 | $OCF_3$ | H | $CH_2C^*H(Me)NHC(=O)O(t-Bu)$:(R) | Et |
| G-4560 | $OCF_3$ | H | $CH_2C^*H(Me)NHC(=O)O(t-Bu)$:(S) | Et |
| G-4561 | $OCF_3$ | H | $CH_2CH(Me)NHS(=O)_2CF_3$ | Et |
| G-4562 | $OCF_3$ | H | $CH_2CH(Me)NHS(=O)_2CF_3$:(R) | Et |
| G-4563 | $OCF_3$ | H | $CH_2CH(Me)NHS(=O)_2CF_3$:(S) | Et |
| G-4564 | Cl | Cl | $CH_2CH_2SCHF_2$ | Et |
| G-4565 | Cl | Cl | $CH_2CH_2CH_2SCHF_2$ | Et |
| G-4566 | Cl | Cl | $CH_2CH_2CH_2CH_2SCHF_2$ | Et |
| G-4567 | Cl | Cl | $CH_2CH_2CH_2CH_2CH_2SCHF_2$ | Et |
| G-4568 | Cl | C | $CH_2CH_2CH_2CH_2CH_2CH_2SCHF_2$ | Et |
| G-4569 | Cl | Cl | $CH_2CH_2CH_2CH_2CH_2CH_2CH_2CH_2SCHF_2$ | Et |
| G-4570 | Cl | Cl | $CH_2CH_2SCF_3$ | Et |

TABLE 1224

| Compound Number | $R^3$ | $R^4$ | $R^5$ | $R^{11}$ |
|---|---|---|---|---|
| G-4571 | Cl | Cl | $CH_2CH_2CH_2SCF_3$ | Et |
| G-4572 | Cl | Cl | $CH_2CH_2CH_2CH_2SCF_3$ | Et |
| G-4573 | Cl | Cl | $CH_2CH_2CH_2CH_2CH_2SCF_3$ | Et |
| G-4574 | Cl | Cl | $CH_2CH_2CH_2CH_2CH_2CH_2SCF_3$ | Et |
| G-4575 | Cl | Cl | $CH_2CH_2CH_2CH_2CH_2CH_2CH_2SCF_3$ | Et |
| G-4576 | Cl | Cl | $CH_2CH_2CH_2CH_2CH_2CH_2CH_2CH_2SCF_3$ | Et |
| G-4577 | Cl | Cl | $CH_2CH(Me)SCF_3$ | Et |
| G-4578 | Cl | Cl | $CH(Me)CH_2SCF_3$ | Et |
| G-4579 | Cl | Cl | $CH_2CH_2CH(Me)SCF_3$ | Et |
| G-4580 | Cl | Cl | $CH_2CH(Me)CH_2SCF_3$ | Et |
| G-4581 | Cl | Cl | $CH(Me)CH_2CH_2SCF_3$ | Et |
| G-4582 | Cl | Cl | $CH_2CH_2CH_2CH(Me)SCF_3$ | Et |
| G-4583 | Cl | Cl | $CH_2CH_2CH(Me)CH_2SCF_3$ | Et |
| G-4584 | Cl | Cl | $CH_2CH(Me)CH_2CH_2SCF_3$ | Et |
| G-4585 | Cl | Cl | $CH(Me)CH_2CH_2CH_2SCF_3$ | Et |
| G-4586 | Cl | Cl | $CH_2CH_2NHS({=}O)_2CF_3$ | Et |
| G-4587 | Cl | Cl | $CH_2CH_2CH_2NHS({=}O)_2CF_3$ | Et |
| G-4588 | Cl | Cl | $CH_2CH_2CH_2CH_2NHS({=}O)_2CF_3$ | Et |
| G-4589 | Cl | Cl | $CH_2CH_2CH_2CH_2CH_2NHS({=}O)_2CF_3$ | Et |
| G-4590 | Cl | Cl | $CH_2CH_2N(Me)S({=}O)_2CF_3$ | Et |
| G-4591 | Cl | Cl | $CH_2CH_2N(Et)S({=}O)_2CF_3$ | Et |
| G-4592 | Cl | Cl | $CH_2CH_2N(CH_2CN)S({=}O)_2CF_3$ | Et |
| G-4593 | Cl | Cl | $CH_2CH_2N(CH_2OMe)S({=}O)_2CF_3$ | Et |
| G-4594 | Cl | Cl | $CH_2CH_2CH_2N(Me)S({=}O)_2CF_3$ | Et |
| G-4595 | Cl | Cl | $CH_2CH_2CH_2N(Et)S({=}O)_2CF_3$ | Et |
| G-4596 | Cl | Cl | $CH_2CH_2CH_2N(CH_2CN)S({=}O)_2CF_3$ | Et |
| G-4597 | Cl | Cl | $CH_2CH_2CH_2N(CH_2OMe)S({=}O)_2CF_3$ | Et |
| G-4598 | Cl | Cl | $CH_2CH_2CH_2CH_2N(Me)S({=}O)_2CF_3$ | Et |
| G-4599 | Cl | Cl | $CH_2CH_2CH_2CH_2N(Et)S({=}O)_2CF_3$ | Et |
| G-4600 | Cl | Cl | $CH_2CH_2CH_2CH_2N(CH_2CN)S({=}O)_2CF_3$ | Et |
| G-4601 | Cl | Cl | $CH_2CH_2CH_2CH_2N(CH_2OMe)S({=}O)_2CF_3$ | Et |
| G-4602 | Cl | Cl | $CH_2CH(Me)NHS({=}O)_2CF_3$ | Et |
| G-4603 | Cl | Cl | $CH(Me)CH_2NHS({=}O)_2CF_3$ | Et |
| G-4604 | Cl | Cl | $CH_2CH_2CH(Me)NHS({=}O)_2CF_3$ | Et |
| G-4605 | Cl | Cl | $CH_2CH(Me)CH_2NHS({=}O)_2CF_3$ | Et |
| G-4606 | Cl | Cl | $CH(Me)CH_2CH_2NHS({=}O)_2CF_3$ | Et |
| G-4607 | Cl | Cl | $CH_2CH(Me)N(Me)S({=}O)_2CF_3$ | Et |
| G-4608 | Cl | Cl | $CH(Me)CH_2N(Me)S({=}O)_2CF_3$ | Et |
| G-4609 | Cl | Cl | $CH_2CH_2CH(Me)N(Me)S({=}O)_2CF_3$ | Et |
| G-4610 | Cl | Cl | $CH_2CH(Me)CH_2N(Me)S({=}O)_2CF_3$ | Et |
| G-4611 | Cl | Cl | $CH(Me)CH_2CH_2N(Me)S({=}O)_2CF_3$ | Et |
| G-4612 | Cl | Cl | $CH_2Ph$ | Et |
| G-4613 | Cl | Cl | $CH_2Ph(2\text{-}CF_3)$ | Et |
| G-4614 | Cl | Cl | $CH_2Ph(3\text{-}CF_3)$ | Et |

TABLE 1225

| Compound Number | $R^3$ | $R^4$ | $R^5$ | $R^{11}$ |
|---|---|---|---|---|
| G-4615 | Cl | Cl | $CH_2Ph(4\text{-}CF_3)$ | Et |
| G-4616 | Cl | Cl | $CH_2Ph(2\text{-}OCF_3)$ | Et |
| G-4617 | Cl | Cl | $CH_2Ph(3\text{-}OCF_3)$ | Et |
| G-4618 | Cl | Cl | $CH_2Ph(4\text{-}OCF_3)$ | Et |
| G-4619 | Cl | Cl | $CH_2Ph(2\text{-}SCF_3)$ | Et |
| G-4620 | Cl | Cl | $CH_2Ph(3\text{-}SCF_3)$ | Et |
| G-4621 | Cl | Cl | $CH_2Ph(4\text{-}SCF_3)$ | Et |
| G-4622 | Cl | Cl | $CH_2Ph(3\text{-}CH_2SCF_3)$ | Et |
| G-4623 | Cl | Cl | $CH_2Ph(4\text{-}F)$ | Et |
| G-4624 | Cl | Cl | $CH_2Ph(4\text{-}Cl)$ | Et |
| G-4625 | Cl | Cl | $CH_2Ph(4\text{-}Br)$ | Et |
| G-4626 | Cl | Cl | $CH_2Ph(4\text{-}Me)$ | Et |
| G-4627 | Cl | Cl | $CH_2Ph[4\text{-}(t\text{-}Bu)]$ | Et |
| G-4628 | Cl | Cl | $CH_2Ph(4\text{-}CN)$ | Et |
| G-4629 | Cl | Cl | $CH_2Ph(4\text{-}NO_2)$ | Et |
| G-4630 | Cl | Cl | $CH_2Ph(4\text{-}OCHF_2)$ | Et |
| G-4631 | Cl | Cl | $CH_2Ph(4\text{-}SCHF_2)$ | Et |
| G-4632 | Cl | Cl | $CH_2Ph(4\text{-}CH_2SCF_3)$ | Et |
| G-4633 | Cl | Cl | $CH_2Ph[4\text{-}CF(CF_3)_2]$ | Et |
| G-4634 | Cl | Cl | $CH_2Ph(4\text{-}CH_2SCF_3)$ | Et |
| G-4635 | Cl | Cl | $CH_2Ph[4\text{-}Ph(4\text{-}CF_3)]$ | Et |
| G-4636 | Cl | Cl | $CH_2Ph(2,4\text{-}Cl_2)$ | Et |
| G-4637 | Cl | Cl | $CH_2Ph[2,5\text{-}(CF_3)_2]$ | Et |
| G-4638 | Cl | Cl | $CH_2Ph(3,4\text{-}Cl_2)$ | Et |

TABLE 1225-continued

| Compound Number | $R^3$ | $R^4$ | $R^5$ | $R^{11}$ |
|---|---|---|---|---|
| G-4639 | Cl | Cl | $CH_2Ph(3\text{-}CF_3\text{-}4\text{-}F)$ | Et |
| G-4640 | Cl | Cl | $CH_2Ph(3\text{-}CF_3\text{-}4\text{-}Cl)$ | Et |
| G-4641 | Cl | Cl | $CH_2Ph(3\text{-}F\text{-}4\text{-}CF_3)$ | Et |
| G-4642 | Cl | Cl | $CH_2Ph(2,4,6\text{-}F_3)$ | Et |
| G-4643 | Cl | Cl | $CH_2Ph(3,4,5\text{-}F_3)$ | Et |
| G-4644 | Cl | Cl | $CH_2Ph(2,3,4\text{-}F_3)$ | Et |
| G-4645 | Cl | Cl | $CH_2Ph(3,4,5\text{-}Cl_3)$ | Et |
| G-4646 | Cl | Cl | $CH_2CH_2Ph$ | Et |
| G-4647 | Cl | Cl | $CH_2CH_2Ph(4\text{-}F)$ | Et |
| G-4648 | Cl | Cl | $CH_2CH_2Ph(4\text{-}Cl)$ | Et |
| G-4649 | Cl | Cl | $CH_2CH_2Ph(4\text{-}Br)$ | Et |
| G-4650 | Cl | Cl | $CH_2CH_2Ph[4\text{-}(t\text{-}Bu)]$ | Et |
| G-4651 | Cl | Cl | $CH_2CH_2Ph(2\text{-}CF_3)$ | Et |
| G-4652 | Cl | Cl | $CH_2CH_2Ph(3\text{-}CF_3)$ | Et |
| G-4653 | Cl | Cl | $CH_2CH_2Ph(4\text{-}CF_3)$ | Et |
| G-4654 | Cl | Cl | $CH_2CH_2Ph[4\text{-}CF(CF_3)_2]$ | Et |
| G-4655 | Cl | Cl | $CH_2CH_2Ph[4\text{-}(c\text{-}Pr)]$ | Et |
| G-4656 | Cl | Cl | $CH_2CH_2Ph\{4\text{-}[c\text{-}Pr(2,2\text{-}F_2)]\}$ | Et |
| G-4657 | Cl | Cl | $CH_2CH_2Ph(4\text{-}OMe)$ | Et |
| G-4658 | Cl | Cl | $CH_2CH_2Ph(3\text{-}OCF_3)$ | Et |

TABLE 1226

| Compound Number | $R^3$ | $R^4$ | $R^5$ | $R^{11}$ |
|---|---|---|---|---|
| G-4659 | Cl | Cl | $CH_2CH_2Ph(4\text{-}OCHF_2)$ | Et |
| G-4660 | Cl | Cl | $CH_2CH_2Ph(4\text{-}OCF_3)$ | Et |
| G-4661 | Cl | Cl | $CH_2CH_2Ph(4\text{-}SMe)$ | Et |
| G-4662 | Cl | Cl | $CH_2CH_2Ph(4\text{-}SCHF_2)$ | Et |
| G-4663 | Cl | Cl | $CH_2CH_2Ph(4\text{-}SCF_3)$ | Et |
| G-4664 | Cl | Cl | $CH_2CH_2Ph[4\text{-}S({=}O)Me]$ | Et |
| G-4665 | Cl | Cl | $CH_2CH_2Ph[4\text{-}S({=}O)CF_3]$ | Et |
| G-4666 | Cl | Cl | $CH_2CH_2Ph[4\text{-}S({=}O)_2Me]$ | Et |
| G-4667 | Cl | Cl | $CH_2CH_2Ph[4\text{-}S({=}O)_2CF_3]$ | Et |
| G-4668 | Cl | Cl | $CH_2CH_2Ph(4\text{-}CH_2SMe)$ | Et |
| G-4669 | Cl | Cl | $CH_2CH_2Ph(4\text{-}CH_2SCF_3)$ | Et |
| G-4670 | Cl | Cl | $CH_2CH_2Ph[4\text{-}OS({=}O)_2Me]$ | Et |
| G-4671 | Cl | Cl | $CH_2CH_2Ph[4\text{-}OS({=}O)_2CF_3]$ | Et |
| G-4672 | Cl | Cl | $CH_2CH_2Ph[4\text{-}Ph(4\text{-}CF_3)]$ | Et |
| G-4673 | Cl | Cl | $CH_2CH_2Ph(4\text{-}CH_2Ph)$ | Et |
| G-4674 | Cl | Cl | $CH_2CH_2Ph(4\text{-}OCH_2Ph)$ | Et |
| G-4675 | Cl | Cl | $CH_2CH_2Ph(4\text{-}CN)$ | Et |
| G-4676 | Cl | Cl | $CH_2CH_2Ph(4\text{-}NO_2)$ | Et |
| G-4677 | Cl | Cl | $CH_2CH_2Ph(2,4\text{-}Cl_2)$ | Et |
| G-4678 | Cl | Cl | $CH_2CH_2Ph(3,4\text{-}Cl_2)$ | Et |
| G-4679 | Cl | Cl | $CH_2CH_2Ph(3\text{-}CF_3\text{-}4\text{-}F)$ | Et |
| G-4680 | Cl | Cl | $CH_2CH_2Ph(2\text{-}CF_3\text{-}4\text{-}F)$ | Et |
| G-4681 | Cl | Cl | $CH_2CH_2Ph(3\text{-}F\text{-}4\text{-}CF_3)$ | Et |
| G-4682 | Cl | Cl | $CH_2CH_2Ph(2\text{-}F\text{-}4\text{-}CF_3)$ | Et |
| G-4683 | Cl | Cl | $CH_2CH_2Ph(3\text{-}Cl\text{-}4\text{-}OCHF_2)$ | Et |
| G-4684 | Cl | Cl | $CH_2CH_2Ph(3,4,5\text{-}Cl_3)$ | Et |
| G-4685 | Cl | Cl | $CH_2CH_2Ph(2,3,4\text{-}F_3)$ | Et |
| G-4686 | Cl | Cl | $CH_2CH_2Ph(2,4,5\text{-}F_3)$ | Et |
| G-4687 | Cl | Cl | $CH_2CH_2Ph(3,4,5\text{-}F_3)$ | Et |
| G-4688 | Cl | Cl | $CH_2CH_2Ph(2,4,6\text{-}F_3)$ | Et |
| G-4689 | Cl | Cl | $CH_2CH_2CH_2Ph$ | Et |
| G-4690 | Cl | Cl | $CH_2CH_2CH_2Ph(3\text{-}CF_3)$ | Et |
| G-4691 | Cl | Cl | $CH_2CH_2CH_2Ph(4\text{-}CF_3)$ | Et |
| G-4692 | Cl | Cl | $CH_2CH_2CH_2Ph(4\text{-}F)$ | Et |
| G-4693 | Cl | Cl | $CH_2CH_2CH_2Ph[4\text{-}(t\text{-}Bu)]$ | Et |
| G-4694 | Cl | Cl | $CH_2CH_2CH_2Ph(4\text{-}CN)$ | Et |
| G-4695 | Cl | Cl | $CH_2CH_2CH_2Ph(4\text{-}CF_3)$ | Et |
| G-4696 | Cl | Cl | $CH_2CH_2CH_2Ph(4\text{-}OCHF_2)$ | Et |
| G-4697 | Cl | Cl | $CH_2CH_2CH_2Ph(4\text{-}OCF_3)$ | Et |
| G-4698 | Cl | Cl | $CH_2CH_2CH_2Ph(4\text{-}SCHF_2)$ | Et |
| G-4699 | Cl | Cl | $CH_2CH_2CH_2Ph(4\text{-}SCF_3)$ | Et |
| G-4700 | Cl | Cl | $CH_2CH_2CH_2Ph[4\text{-}CF(CF_3)_2]$ | Et |
| G-4701 | Cl | Cl | $CH_2CH_2CH_2Ph(3,4,5\text{-}F_3)$ | Et |
| G-4702 | Cl | Cl | $CH_2CH_2CH_2Ph(2,4,6\text{-}F_3)$ | Et |

TABLE 1227

| Compound Number | $R^3$ | $R^4$ | $R^5$ | $R^{11}$ |
|---|---|---|---|---|
| G-4703 | Cl | Cl | $CH_2CH_2CH_2CH_2Ph$ | Et |
| G-4704 | Cl | Cl | $CH_2CH_2CH_2CH_2Ph(4-F)$ | Et |
| G-4705 | Cl | Cl | $CH_2CH_2CH_2CH_2Ph(4-CF_3)$ | Et |
| G-4706 | Cl | Cl | $CH_2CH_2CH_2CH_2Ph(4-OCF_3)$ | Et |
| G-4707 | Cl | Cl | $CH_2CH_2CH_2CH_2Ph(4-SCF_3)$ | Et |
| G-4708 | Cl | Cl | $CH_2CH_2CH_2CH_2CH_2Ph$ | Et |
| G-4709 | Cl | Cl | $CH_2CH_2CH_2CH_2CH_2CH_2Ph$ | Et |
| G-4710 | Cl | Cl | $CH_2CF_2Ph(4-F)$ | Et |
| G-4711 | Cl | Cl | $CH_2CF_2Ph(4-CF_3)$ | Et |
| G-4712 | Cl | Cl | $CH_2CF_2Ph(3,4,5-F_3)$ | Et |
| G-4713 | Me | Cl | $CH_2CH_2SCHF_2$ | Et |
| G-4714 | Me | Cl | $CH_2CH_2CH_2SCHF_2$ | Et |
| G-4715 | Me | Cl | $CH_2CH_2CH_2CH_2SCHF_2$ | Et |
| G-4716 | Me | Cl | $CH_2CH_2CH_2CH_2CH_2SCHF_2$ | Et |
| G-4717 | Me | Cl | $CH_2CH_2CH_2CH_2CH_2CH_2SCHF_2$ | Et |
| G-4718 | Me | Cl | $CH_2CH_2CH_2CH_2CH_2CH_2CH_2SCHF_2$ | Et |
| G-4719 | Me | Cl | $CH_2CH_2SCF_3$ | Et |
| G-4720 | Me | Cl | $CH_2CH_2CH_2SCF_3$ | Et |
| G-4721 | Me | Cl | $CH_2CH_2CH_2CH_2SCF_3$ | Et |
| G-4722 | Me | Cl | $CH_2CH_2CH_2CH_2CH_2SCF_3$ | Et |
| G-4723 | Me | Cl | $CH_2CH_2CH_2CH_2CH_2CH_2SCF_3$ | Et |
| G-4724 | Me | Cl | $CH_2CH_2CH_2CH_2CH_2CH_2CH_2SCF_3$ | Et |
| G-4725 | Me | Cl | $CH_2CH_2CH_2CH_2CH_2CH_2CH_2CH_2CH_2SCF_3$ | Et |
| G-4726 | Me | Cl | $CH_2CH(Me)SCF_3$ | Et |
| G-4727 | Me | Cl | $CH(Me)CH_2SCF_3$ | Et |
| G-4728 | Me | Cl | $CH_2CH_2CH(Me)SCF_3$ | Et |
| G-4729 | Me | Cl | $CH_2CH(Me)CH_2SCF_3$ | Et |
| G-4730 | Me | Cl | $CH(Me)CH_2CH_2SCF_3$ | Et |
| G-4731 | Me | Cl | $CH_2CH_2CH_2CH(Me)SCF_3$ | Et |
| G-4732 | Me | Cl | $CH_2CH_2CH(Me)CH_2SCF_3$ | Et |
| G-4733 | Me | Cl | $CH_2CH(Me)CH_2CH_2SCF_3$ | Et |
| G-4734 | Me | Cl | $CH(Me)CH_2CH_2CH_2SCF_3$ | Et |
| G-4735 | Me | Cl | $CH_2CH_2NHS({=}O)_2CF_3$ | Et |
| G-4736 | Me | Cl | $CH_2CH_2CH_2NHS({=}O)_2CF_3$ | Et |
| G-4737 | Me | Cl | $CH_2CH_2CH_2CH_2NHS({=}O)_2CF_3$ | Et |
| G-4738 | Me | Cl | $CH_2CH_2CH_2CH_2CH_2NHS({=}O)_2CF_3$ | Et |
| G-4739 | Me | Cl | $CH_2CH_2N(Me)S({=}O)_2CF_3$ | Et |
| G-4740 | Me | Cl | $CH_2CH_2N(Et)S({=}O)_2CF_3$ | Et |
| G-4741 | Me | Cl | $CH_2CH_2N(CH_2CN)S({=}O)_2CF_3$ | Et |
| G-4742 | Me | Cl | $CH_2CH_2N(CH_2OMe)S({=}O)_2CF_3$ | Et |
| G-4743 | Me | Cl | $CH_2CH_2CH_2N(Me)S({=}O)_2CF_3$ | Et |
| G-4744 | Me | Cl | $CH_2CH_2CH_2N(Et)S({=}O)_2CF_3$ | Et |
| G-4745 | Me | Cl | $CH_2CH_2CH_2N(CH_2CN)S({=}O)_2CF_3$ | Et |
| G-4746 | Me | Cl | $CH_2CH_2CH_2N(CH_2OMe)S({=}O)_2CF_3$ | Et |

TABLE 1228

| Compound Number | $R^3$ | $R^4$ | $R^5$ | $R^{11}$ |
|---|---|---|---|---|
| G-4747 | Me | Cl | $CH_2CH_2CH_2CH_2N(Me)S({=}O)_2CF_3$ | Et |
| G-4748 | Me | Cl | $CH_2CH_2CH_2CH_2N(Et)S({=}O)_2CF_3$ | Et |
| G-4749 | Me | Cl | $CH_2CH_2CH_2CH_2N(CH_2CN)S({=}O)_2CF_3$ | Et |
| G-4750 | Me | Cl | $CH_2CH_2CH_2CH_2N(CH_2OMe)S({=}O)_2CF_3$ | Et |
| G-4751 | Me | Cl | $CH_2CH(Me)NHS({=}O)_2CF_3$ | Et |
| G-4752 | Me | Cl | $CH(Me)CH_2NHS({=}O)_2CF_3$ | Et |
| G-4753 | Me | Cl | $CH_2CH_2CH(Me)NHS({=}O)_2CF_3$ | Et |
| G-4754 | Me | Cl | $CH_2CH(Me)CH_2NHS({=}O)_2CF_3$ | Et |
| G-4755 | Me | Cl | $CH(Me)CH_2CH_2NHS({=}O)_2CF_3$ | Et |
| G-4756 | Me | Cl | $CH_2CH(Me)N(Me)S({=}O)_2CF_3$ | Et |
| G-4757 | Me | Cl | $CH(Me)CH_2N(Me)S({=}O)_2CF_3$ | Et |
| G-4758 | Me | Cl | $CH_2CH_2CH(Me)N(Me)S({=}O)_2CF_3$ | Et |
| G-4759 | Me | Cl | $CH_2CH(Me)CH_2N(Me)S({=}O)_2CF_3$ | Et |
| G-4760 | Me | Cl | $CH(Me)CH_2CH_2N(Me)S({=}O)_2CF_3$ | Et |
| G-4761 | Me | Cl | $CH_2Ph$ | Et |
| G-4762 | Me | Cl | $CH_2Ph(2-CF_3)$ | Et |
| G-4763 | Me | Cl | $CH_2Ph(3-CF_3)$ | Et |
| G-4764 | Me | Cl | $CH_2Ph(4-CF_3)$ | Et |
| G-4765 | Me | Cl | $CH_2Ph(2-OCF_3)$ | Et |
| G-4766 | Me | Cl | $CH_2Ph(3-OCF_3)$ | Et |
| G-4767 | Me | Cl | $CH_2Ph(4-OCF_3)$ | Et |
| G-4768 | Me | Cl | $CH_2Ph(2-SCF_3)$ | Et |
| G-4769 | Me | Cl | $CH_2Ph(3-SCF_3)$ | Et |
| G-4770 | Me | Cl | $CH_2Ph(4-SCF_3)$ | Et |

TABLE 1228-continued

| Compound Number | $R^3$ | $R^4$ | $R^5$ | $R^{11}$ |
|---|---|---|---|---|
| G-4771 | Me | Cl | $CH_2Ph(3-CH_2SCF_3)$ | Et |
| G-4772 | Me | Cl | $CH_2Ph(4-F)$ | Et |
| G-4773 | Me | Cl | $CH_2Ph(4-Cl)$ | Et |
| G-4774 | Me | Cl | $CH_2Ph(4-Br)$ | Et |
| G-4775 | Me | Cl | $CH_2Ph(4-Me)$ | Et |
| G-4776 | Me | Cl | $CH_2Ph[4-(t-Bu)]$ | Et |
| G-4777 | Me | Cl | $CH_2Ph(4-CN)$ | Et |
| G-4778 | Me | Cl | $CH_2Ph(4-NO_2)$ | Et |
| G-4779 | Me | Cl | $CH_2Ph(4-OCHF_2)$ | Et |
| G-4780 | Me | Cl | $CH_2Ph(4-SCHF_2)$ | Et |
| G-4781 | Me | Cl | $CH_2Ph(4-CH_2SCF_3)$ | Et |
| G-4782 | Me | Cl | $CH_2Ph[4-CF(CF_3)_2]$ | Et |
| G-4783 | Me | Cl | $CH_2Ph(4-CH_2SCF_3)$ | Et |
| G-4784 | Me | Cl | $CH_2Ph[4-Ph(4-CF_3)]$ | Et |
| G-4785 | Me | Cl | $CH_2Ph(2,4-Cl_2)$ | Et |
| G-4786 | Me | Cl | $CH_2Ph[2,5-(CF_3)_2]$ | Et |
| G-4787 | Me | Cl | $CH_2Ph(3,4-Cl_2)$ | Et |
| G-4788 | Me | Cl | $CH_2Ph(3-CF_3-4-F)$ | Et |
| G-4789 | Me | Cl | $CH_2Ph(3-CF_3-4-Cl)$ | Et |
| G-4790 | Me | Cl | $CH_2Ph(3-F-4-CF_3)$ | Et |

TABLE 1229

| Compound Number | $R^3$ | $R^4$ | $R^5$ | $R^{11}$ |
|---|---|---|---|---|
| G-4791 | Me | Cl | $CH_2Ph(2,4,6-F_3)$ | Et |
| G-4792 | Me | Cl | $CH_2Ph(3,4,5-F_3)$ | Et |
| G-4793 | Me | Cl | $CH_2Ph(2,3,4-F_3)$ | Et |
| G-4794 | Me | Cl | $CH_2Ph(3,4,5-Cl_3)$ | Et |
| G-4795 | Me | Cl | $CH_2CH_2Ph$ | Et |
| G-4796 | Me | Cl | $CH_2CH_2Ph(4-F)$ | Et |
| G-4797 | Me | Cl | $CH_2CH_2Ph(4-Cl)$ | Et |
| G-4798 | Me | Cl | $CH_2CH_2Ph(4-Br)$ | Et |
| G-4799 | Me | Cl | $CH_2CH_2Ph[4-(t-Bu)]$ | Et |
| G-4800 | Me | Cl | $CH_2CH_2Ph(2-CF_3)$ | Et |
| G-4801 | Me | Cl | $CH_2CH_2Ph(3-CF_3)$ | Et |
| G-4802 | Me | Cl | $CH_2CH_2Ph(4-CF_3)$ | Et |
| G-4803 | Me | Cl | $CH_2CH_2Ph[4-CF(CF_3)_2]$ | Et |
| G-4804 | Me | Cl | $CH_2CH_2Ph[4-(c-Pr)]$ | Et |
| G-4805 | Me | Cl | $CH_2CH_2Ph\{4-[c-Pr(2,2-F_2)]\}$ | Et |
| G-4806 | Me | Cl | $CH_2CH_2Ph(4-OMe)$ | Et |
| G-4807 | Me | Cl | $CH_2CH_2Ph(3-OCF_3)$ | Et |
| G-4808 | Me | Cl | $CH_2CH_2Ph(4-OCHF_2)$ | Et |
| G-4809 | Me | Cl | $CH_2CH_2Ph(4-OCF_3)$ | Et |
| G-4810 | Me | Cl | $CH_2CH_2Ph(4-SMe)$ | Et |
| G-4811 | Me | Cl | $CH_2CH_2Ph(4-SCHF_2)$ | Et |
| G-4812 | Me | Cl | $CH_2CH_2Ph(4-SCF_3)$ | Et |
| G-4813 | Me | Cl | $CH_2CH_2Ph[4-S({=}O)Me]$ | Et |
| G-4814 | Me | Cl | $CH_2CH_2Ph[4-S({=}O)CF_3]$ | Et |
| G-4815 | Me | Cl | $CH_2CH_2Ph[4-S({=}O)_2Me]$ | Et |
| G-4816 | Me | Cl | $CH_2CH_2Ph[4-S({=}O)_2CF_3]$ | Et |
| G-4817 | Me | Cl | $CH_2CH_2Ph(4-CH_2SMe)$ | Et |
| G-4818 | Me | Cl | $CH_2CH_2Ph(4-CH_2SCF_3)$ | Et |
| G-4819 | Me | Cl | $CH_2CH_2Ph[4-OS({=}O)_2Me]$ | Et |
| G-4820 | Me | Cl | $CH_2CH_2Ph[4-OS({=}O)_2CF_3]$ | Et |
| G-4821 | Me | Cl | $CH_2CH_2Ph[4-Ph(4-CF_3)]$ | Et |
| G-4822 | Me | Cl | $CH_2CH_2Ph(4-CH_2Ph)$ | Et |
| G-4823 | Me | Cl | $CH_2CH_2Ph(4-OCH_2Ph)$ | Et |
| G-4824 | Me | Cl | $CH_2CH_2Ph(4-CN)$ | Et |
| G-4825 | Me | Cl | $CH_2CH_2Ph(4-NO_2)$ | Et |
| G-4826 | Me | Cl | $CH_2CH_2Ph(2,4-Cl_2)$ | Et |
| G-4827 | Me | Cl | $CH_2CH_2Ph(3,4-Cl_2)$ | Et |
| G-4828 | Me | Cl | $CH_2CH_2Ph(3-CF_3-4-F)$ | Et |
| G-4829 | Me | Cl | $CH_2CH_2Ph(2-CF_3-4-F)$ | Et |
| G-4830 | Me | Cl | $CH_2CH_2Ph(3-F-4-CF_3)$ | Et |
| G-4831 | Me | Cl | $CH_2CH_2Ph(2-F-4-CF_3)$ | Et |
| G-4832 | Me | Cl | $CH_2CH_2Ph(3-Cl-4-OCHF_2)$ | Et |
| G-4833 | Me | Cl | $CH_2CH_2Ph(3,4,5-Cl_3)$ | Et |
| G-4834 | Me | Cl | $CH_2CH_2Ph(2,3,4-F_3)$ | Et |

TABLE 1230

| Compound Number | $R^3$ | $R^4$ | $R^5$ | $R^{11}$ |
|---|---|---|---|---|
| G-4835 | Me | Cl | $CH_2CH_2Ph(2,4,5-F_3)$ | Et |
| G-4836 | Me | Cl | $CH_2CH_2Ph(3,4,5-F_3)$ | Et |
| G-4837 | Me | Cl | $CH_2CH_2Ph(2,4,6-F_3)$ | Et |
| G-4838 | Me | Cl | $CH_2CH_2CH_2Ph$ | Et |
| G-4839 | Me | Cl | $CH_2CH_2CH_2Ph(3-CF_3)$ | Et |
| G-4840 | Me | Cl | $CH_2CH_2CH_2Ph(4-CF_3)$ | Et |
| G-4841 | Me | Cl | $CH_2CH_2CH_2Ph(4-F)$ | Et |
| G-4842 | Me | Cl | $CH_2CH_2CH_2Ph[4-(t-Bu)]$ | Et |
| G-4843 | Me | Cl | $CH_2CH_2CH_2Ph(4-CN)$ | Et |
| G-4844 | Me | Cl | $CH_2CH_2CH_2Ph(4-CF_3)$ | Et |
| G-4845 | Me | Cl | $CH_2CH_2CH_2Ph(4-OCHF_2)$ | Et |
| G-4846 | Me | Cl | $CH_2CH_2CH_2Ph(4-OCF_3)$ | Et |
| G-4847 | Me | Cl | $CH_2CH_2CH_2Ph(4-SCHF_2)$ | Et |
| G-4848 | Me | Cl | $CH_2CH_2CH_2Ph(4-SCF_3)$ | Et |
| G-4849 | Me | Cl | $CH_2CH_2CH_2Ph[4-CF(CF_3)_2]$ | Et |
| G-4850 | Me | Cl | $CH_2CH_2CH_2Ph(3,4,5-F_3)$ | Et |
| G-4851 | Me | Cl | $CH_2CH_2CH_2Ph(2,4,6-F_3)$ | Et |
| G-4852 | Me | Cl | $CH_2CH_2CH_2CH_2Ph$ | Et |
| G-4853 | Me | Cl | $CH_2CH_2CH_2CH_2Ph(4-F)$ | Et |
| G-4854 | Me | Cl | $CH_2CH_2CH_2CH_2Ph(4-CF_3)$ | Et |
| G-4855 | Me | Cl | $CH_2CH_2CH_2CH_2Ph(4-OCF_3)$ | Et |
| G-4856 | Me | Cl | $CH_2CH_2CH_2CH_2Ph(4-SCF_3)$ | Et |
| G-4857 | Me | Cl | $CH_2CH_2CH_2CH_2CH_2Ph$ | Et |
| G-4858 | Me | Cl | $CH_2CH_2CH_2CH_2CH_2CH_2Ph$ | Et |
| G-4859 | Me | Cl | $CH_2CF_2Ph(4-F)$ | Et |
| G-4860 | Me | Cl | $CH_2CF_2Ph(4-CF_3)$ | Et |
| G-4861 | Me | Cl | $CH_2CF_2Ph(3,4,5-F_3)$ | Et |
| G-4862 | Me | Me | $CH_2CH_2SCHF_2$ | Et |
| G-4863 | Me | Me | $CH_2CH_2CH_2SCHF_2$ | Et |
| G-4864 | Me | Me | $CH_2CH_2CH_2CH_2SCHF_2$ | Et |
| G-4865 | Me | Me | $CH_2CH_2CH_2CH_2CH_2SCHF_2$ | Et |
| G-4866 | Me | Me | $CH_2CH_2CH_2CH_2CH_2CH_2SCHF_2$ | Et |
| G-4867 | Me | Me | $CH_2CH_2CH_2CH_2CH_2CH_2CH_2SCHF_2$ | Et |
| G-4868 | Me | Me | $CH_2CH_2SCF_3$ | Et |
| G-4869 | Me | Me | $CH_2CH_2CH_2SCF_3$ | Et |
| G-4870 | Me | Me | $CH_2CH_2CH_2CH_2SCF_3$ | Et |
| G-4871 | Me | Me | $CH_2CH_2CH_2CH_2CH_2SCF_3$ | Et |
| G-4872 | Me | Me | $CH_2CH_2CH_2CH_2CH_2CH_2SCF_3$ | Et |
| G-4873 | Me | Me | $CH_2CH_2CH_2CH_2CH_2CH_2CH_2SCF_3$ | Et |
| G-4874 | Me | Me | $CH_2CH_2CH_2CH_2CH_2CH_2CH_2CH_2SCF_3$ | Et |
| G-4875 | Me | Me | $CH_2CH(Me)SCF_3$ | Et |
| G-4876 | Me | Me | $CH(Me)CH_2SCF_3$ | Et |
| G-4877 | Me | Me | $CH_2CH_2CH(Me)SCF_3$ | Et |
| G-4878 | Me | Me | $CH_2CH(Me)CH_2SCF_3$ | Et |

TABLE 1231

| Compound Number | $R^3$ | $R^4$ | $R^5$ | $R^{11}$ |
|---|---|---|---|---|
| G-4879 | Me | Me | $CH(Me)CH_2CH_2SCF_3$ | Et |
| G-4880 | Me | Me | $CH_2CH_2CH_2CH(Me)SCF_3$ | Et |
| G-4881 | Me | Me | $CH_2CH_2CH(Me)CH_2SCF_3$ | Et |
| G-4882 | Me | Me | $CH_2CH(Me)CH_2CH_2SCF_3$ | Et |
| G-4883 | Me | Me | $CH(Me)CH_2CH_2CH_2SCF_3$ | Et |
| G-4884 | Me | Me | $CH_2CH_2NHS(=O)_2CF_3$ | Et |
| G-4885 | Me | Me | $CH_2CH_2CH_2NHS(=O)_2CF_3$ | Et |
| G-4886 | Me | Me | $CH_2CH_2CH_2CH_2NHS(=O)_2CF_3$ | Et |
| G-4887 | Me | Me | $CH_2CH_2CH_2CH_2CH_2NHS(=O)_2CF_3$ | Et |
| G-4888 | Me | Me | $CH_2CH_2N(Me)S(=O)_2CF_3$ | Et |
| G-4889 | Me | Me | $CH_2CH_2N(Et)S(=O)_2CF_3$ | Et |
| G-4890 | Me | Me | $CH_2CH_2N(CH_2CN)S(=O)_2CF_3$ | Et |
| G-4891 | Me | Me | $CH_2CH_2N(CH_2OMe)S(=O)_2CF_3$ | Et |
| G-4892 | Me | Me | $CH_2CH_2CH_2N(Me)S(=O)_2CF_3$ | Et |
| G-4893 | Me | Me | $CH_2CH_2CH_2N(Et)S(=O)_2CF_3$ | Et |
| G-4894 | Me | Me | $CH_2CH_2CH_2N(CH_2CN)S(=O)_2CF_3$ | Et |
| G-4895 | Me | Me | $CH_2CH_2CH_2N(CH_2OMe)S(=O)_2CF_3$ | Et |
| G-4896 | Me | Me | $CH_2CH_2CH_2CH_2N(Me)S(=O)_2CF_3$ | Et |
| G-4897 | Me | Me | $CH_2CH_2CH_2CH_2N(Et)S(=O)_2CF_3$ | Et |
| G-4898 | Me | Me | $CH_2CH_2CH_2CH_2N(CH_2CN)S(=O)_2CF_3$ | Et |
| G-4899 | Me | Me | $CH_2CH_2CH_2CH_2N(CH_2OMe)S(=O)_2CF_3$ | Et |
| G-4900 | Me | Me | $CH_2CH(Me)NHS(=O)_2CF_3$ | Et |
| G-4901 | Me | Me | $CH(Me)CH_2NHS(=O)_2CF_3$ | Et |
| G-4902 | Me | Me | $CH_2CH_2CH(Me)NHS(=O)_2CF_3$ | Et |

TABLE 1231-continued

| Compound Number | $R^3$ | $R^4$ | $R^5$ | $R^{11}$ |
|---|---|---|---|---|
| G-4903 | Me | Me | $CH_2CH(Me)CH_2NHS((=O)_2CF_3$ | Et |
| G-4904 | Me | Me | $CH(Me)CH2CH_2NHS(=O)_2CF_3$ | Et |
| G-4905 | Me | Me | $CH_2CH(Me)N(Me)S(=O)_2CF_3$ | Et |
| G-4906 | Me | Me | $CH(Me)CH_2N(Me)S(=O)_2CF_3$ | Et |
| G-4907 | Me | Me | $CH_2CH_2CH(Me)N(Me)S(=O)_2CF_3$ | Et |
| G-4908 | Me | Me | $CH_2CH(Me)CH_2N(Me)S(=O)_2CF_3$ | Et |
| G-4909 | Me | Me | $CH(Me)CH_2CH_2N(Me)S(=O)_2CF_3$ | Et |
| G-4910 | Me | Me | $CH_2Ph$ | Et |
| G-4911 | Me | Me | $CH_2Ph(2-CF_3)$ | Et |
| G-4912 | Me | Me | $CH_2Ph(3-CF_3)$ | Et |
| G-4913 | Me | Me | $CH_2Ph(4-CF_3)$ | Et |
| G-4914 | Me | Me | $CH_2Ph(2-OCF_3)$ | Et |
| G-4915 | Me | Me | $CH_2Ph(3-OCF_3)$ | Et |
| G-4916 | Me | Me | $CH_2Ph(4-OCF_3)$ | Et |
| G-4917 | Me | Me | $CH_2Ph(2-SCF_3)$ | Et |
| G-4918 | Me | Me | $CH_2Ph(3-SCF_3)$ | Et |
| G-4919 | Me | Me | $CH_2Ph(4-SCF_3)$ | Et |
| G-4920 | Me | Me | $CH_2Ph(3-CH_2SCF_3)$ | Et |
| G-4921 | Me | Me | $CH_2Ph(4-F)$ | Et |
| G-4922 | Me | Me | $CH_2Ph(4-Cl)$ | Et |

TABLE 1232

| Compound Number | $R^3$ | $R^4$ | $R^5$ | $R^{11}$ |
|---|---|---|---|---|
| G-4923 | Me | Me | $CH_2Ph(4-Br)$ | Et |
| G-4924 | Me | Me | $CH_2Ph(4-Me)$ | Et |
| G-4925 | Me | Me | $CH_2Ph[4-(t-Bu)]$ | Et |
| G-4926 | Me | Me | $CH_2Ph(4-CN)$ | Et |
| G-4927 | Me | Me | $CH_2Ph(4-NO_2)$ | Et |
| G-4928 | Me | Me | $CH_2Ph(4-OCHF_2)$ | Et |
| G-4929 | Me | Me | $CH_2Ph(4-SCHF_2)$ | Et |
| G-4930 | Me | Me | $CH_2Ph(4-CH_2SCF_3)$ | Et |
| G-4931 | Me | Me | $CH_2Ph[4-CF(CF_3)_2]$ | Et |
| G-4932 | Me | Me | $CH_2Ph(4-CH_2SCF_3)$ | Et |
| G-4933 | Me | Me | $CH_2Ph[4-Ph(4-CF_3)]$ | Et |
| G-4934 | Me | Me | $CH_2Ph(2,4-Cl_2)$ | Et |
| G-4935 | Me | Me | $CH_2Ph[2,5-(CF_3)_2]$ | Et |
| G-4936 | Me | Me | $CH_2Ph(3,4-Cl_2)$ | Et |
| G-4937 | Me | Me | $CH_2Ph(3-CF_3-4-F)$ | Et |
| G-4938 | Me | Me | $CH_2Ph(3-CF_3-4-Cl)$ | Et |
| G-4939 | Me | Me | $CH_2Ph(3-F-4-CF_3)$ | Et |
| G-4940 | Me | Me | $CH_2Ph(2,4,6-F_3)$ | Et |
| G-4941 | Me | Me | $CH_2Ph(3,4,5-F_3)$ | Et |
| G-4942 | Me | Me | $CH_2Ph(2,3,4-F_3)$ | Et |
| G-4943 | Me | Me | $CH_2Ph(3,4,5-Cl_3)$ | Et |
| G-4944 | Me | Me | $CH_2CH_2Ph$ | Et |
| G-4945 | Me | Me | $CH_2CH_2Ph(4-F)$ | Et |
| G-4946 | Me | Me | $CH_2CH_2Ph(4-Cl)$ | Et |
| G-4947 | Me | Me | $CH_2CH_2Ph(4-Br)$ | Et |
| G-4948 | Me | Me | $CH_2CH_2Ph[4-(t-Bu)]$ | Et |
| G-4949 | Me | Me | $CH_2CH_2Ph(2-CF_3)$ | Et |
| G-4950 | Me | Me | $CH_2CH_2Ph(3-CF_3)$ | Et |
| G-4951 | Me | Me | $CH_2CH_2Ph(4-CF_3)$ | Et |
| G-4952 | Me | Me | $CH_2CH_2Ph[4-CF(CF_3)_2]$ | Et |
| G-4953 | Me | Me | $CH_2CH_2Ph[4-(c-Pr)]$ | Et |
| G-4954 | Me | Me | $CH_2CH_2Ph\{4-[c-Pr(2,2-F_2)]\}$ | Et |
| G-4955 | Me | Me | $CH_2CH_2Ph(4-OMe)$ | Et |
| G-4956 | Me | Me | $CH_2CH_2Ph(3-OCF_3)$ | Et |
| G-4957 | Me | Me | $CH_2CH_2Ph(4-OCHF_2)$ | Et |
| G-4958 | Me | Me | $CH_2CH_2Ph(4-OCF_3)$ | Et |
| G-4959 | Me | Me | $CH_2CH_2Ph(4-SMe)$ | Et |
| G-4960 | Me | Me | $CH_2CH_2Ph(4-SCHF_2)$ | Et |
| G-4961 | Me | Me | $CH_2CH_2Ph(4-SCF_3)$ | Et |
| G-4962 | Me | Me | $CH_2CH_2Ph[4-S(=O)Me]$ | Et |
| G-4963 | Me | Me | $CH_2CH_2Ph[4-S(=O)CF_3]$ | Et |
| G-4964 | Me | Me | $CH_2CH_2Ph[4-S(=O)_2Me]$ | Et |
| G-4965 | Me | Me | $CH_2CH_2Ph[4-S(=O)_2CF_3]$ | Et |
| G-4966 | Me | Me | $CH_2CH_2Ph(4-CH_2SMe)$ | Et |

TABLE 1233

| Compound Number | $R^3$ | $R^4$ | $R^5$ | $R^{11}$ |
|---|---|---|---|---|
| G-4967 | Me | Me | $CH_2CH_2Ph(4\text{-}CH_2SCF_3)$ | Et |
| G-4968 | Me | Me | $CH_2CH_2Ph[4\text{-}OS({=}O)_2Me]$ | Et |
| G-4969 | Me | Me | $CH_2CH_2Ph[4\text{-}OS({=}O)_2CF_3]$ | Et |
| G-4970 | Me | Me | $CH_2CH_2Ph[4\text{-}Ph(4\text{-}CF_3)]$ | Et |
| G-4971 | Me | Me | $CH_2CH_2Ph(4\text{-}CH_2Ph)$ | Et |
| G-4972 | Me | Me | $CH_2CH_2Ph(4\text{-}OCH_2Ph)$ | Et |
| G-4973 | Me | Me | $CH_2CH_2Ph(4\text{-}CN)$ | Et |
| G-4974 | Me | Me | $CH_2CH_2Ph(4\text{-}NO_2)$ | Et |
| G-4975 | Me | Me | $CH_2CH_2Ph(2,4\text{-}Cl_2)$ | Et |
| G-4976 | Me | Me | $CH_2CH_2Ph(3,4\text{-}Cl_2)$ | Et |
| G-4977 | Me | Me | $CH_2CH_2Ph(3\text{-}CF_3\text{-}4\text{-}F)$ | Et |
| G-4978 | Me | Me | $CH_2CH_2Ph(2\text{-}CF_3\text{-}4\text{-}F)$ | Et |
| G-4979 | Me | Me | $CH_2CH_2Ph(3\text{-}F\text{-}4\text{-}CF_3)$ | Et |
| G-4980 | Me | Me | $CH_2CH_2Ph(2\text{-}F\text{-}4\text{-}CF_3)$ | Et |
| G-4981 | Me | Me | $CH_2CH_2Ph(3\text{-}Cl\text{-}4\text{-}OCHF_2)$ | Et |
| G-4982 | Me | Me | $CH_2CH_2Ph(3,4,5\text{-}Cl_3)$ | Et |
| G-4983 | Me | Me | $CH_2CH_2Ph(2,3,4\text{-}F_3)$ | Et |
| G-4984 | Me | Me | $CH_2CH_2Ph(2,4,5\text{-}F_3)$ | Et |
| G-4985 | Me | Me | $CH_2CH_2Ph(3,4,5\text{-}F_3)$ | Et |
| G-4986 | Me | Me | $CH_2CH_2Ph(2,4,6\text{-}F_3)$ | Et |
| G-4987 | Me | Me | $CH_2CH_2CH_2Ph$ | Et |
| G-4988 | Me | Me | $CH_2CH_2CH_2Ph(3\text{-}CF_3)$ | Et |
| G-4989 | Me | Me | $CH_2CH_2CH_2Ph(4\text{-}CF_3)$ | Et |
| G-4990 | Me | Me | $CH_2CH_2CH_2Ph(4\text{-}F)$ | Et |
| G-4991 | Me | Me | $CH_2CH_2CH_2Ph[4\text{-}(t\text{-}Bu)]$ | Et |
| G-4992 | Me | Me | $CH_2CH_2CH_2Ph(4\text{-}CN)$ | Et |
| G-4993 | Me | Me | $CH_2CH_2CH_2Ph(4\text{-}CF_3)$ | Et |
| G-4994 | Me | Me | $CH_2CH_2CH_2Ph(4\text{-}OCHF_2)$ | Et |
| G-4995 | Me | Me | $CH_2CH_2CH_2Ph(4\text{-}OCF_3)$ | Et |
| G-4996 | Me | Me | $CH_2CH_2CH_2Ph(4\text{-}SCHF_2)$ | Et |
| G-4997 | Me | Me | $CH_2CH_2CH_2Ph(4\text{-}SCF_3)$ | Et |
| G-4998 | Me | Me | $CH_2CH_2CH_2Ph[4\text{-}CF(CF_3)_2]$ | Et |
| G-4999 | Me | Me | $CH_2CH_2CH_2Ph(3,4,5\text{-}F_3)$ | Et |
| G-5000 | Me | Me | $CH_2CH_2CH_2Ph(2,4,6\text{-}F_3)$ | Et |
| G-5001 | Me | Me | $CH_2CH_2CH_2CH_2Ph$ | Et |
| G-5002 | Me | Me | $CH_2CH_2CH_2CH_2Ph(4\text{-}F)$ | Et |
| G-5003 | Me | Me | $CH_2CH_2CH_2CH_2Ph(4\text{-}CF_3)$ | Et |
| G-5004 | Me | Me | $CH_2CH_2CH_2CH_2Ph(4\text{-}OCF_3)$ | Et |
| G-5005 | Me | Me | $CH_2CH_2CH_2CH_2Ph(4\text{-}SCF_3)$ | Et |
| G-5006 | Me | Me | $CH_2CH_2CH_2CH_2CH_2Ph$ | Et |
| G-5007 | Me | Me | $CH_2CH_2CH_2CH_2CH_2CH_2Ph$ | Et |
| G-5008 | Me | Me | $CH_2CF_2Ph(4\text{-}F)$ | Et |
| G-5009 | Me | Me | $CH_2CF_2Ph(4\text{-}CF_3)$ | Et |
| G-5010 | Me | Me | $CH_2CF_2Ph(3,4,5\text{-}F_3)$ | Et |

Meanwhile, the compound of the present invention of formula [I] can be produced according to the following production method, but the production method is not limited to these methods. Hereinafter, for example, "the compound represented by general formula [I]", "the compound of formula [I]", and "the compound [I]" are synonymous.

<Production Method 1>

A compound of formula [III-2] among the compounds of the present invention can be produced according to a method based on the reaction scheme exemplified below.

[Chemical Formula 4]

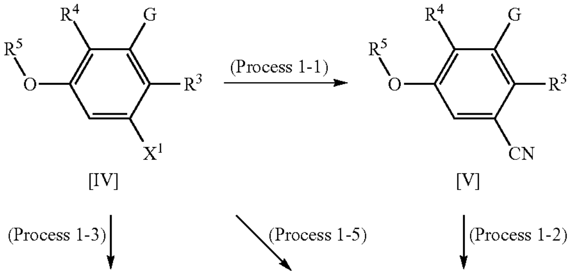

[IV] [V]

-continued

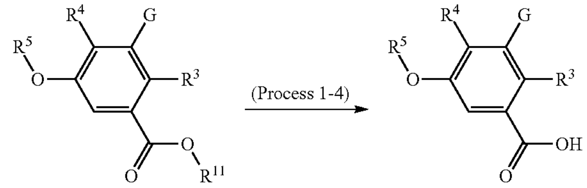

[III-1] [III-2]

(In the formula, $X^1$ represents a halogen atom, $R^{11}$ represents a (C1-C6)alkyl, and G, $R^3$, $R^4$, and $R^5$ are as defined above.)

That is, the compound of formula [III-2] can be produced by (Process 1-1) converting a compound of formula [IV] into a compound [V] using a cyanide in an appropriate solvent in the presence or absence of an appropriate catalyst, and then (Process 1-2) hydrolyzing the compound of formula [V] in an appropriate solvent in the presence of an appropriate acid or base. In addition, the compound [III-2] can be produced by (Process 1-3) subjecting a compound of formula [IV] to a carbon monoxide insertion reaction in an appropriate solvent in the presence of an appropriate catalyst, an appropriate base, and an appropriate alcohol to obtain a compound of formula [III-1] among the compounds of the present invention, and then (Process 1-4) hydrolyzing the compound of formula [III-1] in an appropriate solvent in the presence of an appropriate acid or base. Furthermore, the compound [III-2] can be produced by (Process 1-5) subjecting a compound of formula [IV] to a carbon monoxide insertion reaction in water or a mixed solvent of water and an appropriate solvent in the presence of an appropriate catalyst and an appropriate base.

(Process 1-1)

Examples of the cyanide used in the current reaction include sodium cyanide, potassium cyanide, ammonium cyanide, zinc cyanide, copper cyanide, and a mixture thereof. The amount of use of the cyanide may be appropriately selected from the range of usually 1 to 100 mol, and is preferably 1.0 to 5.0 mol per 1 mol of the compound [IV].

Examples of the catalyst used in the current reaction include tetrakis(triphenylphosphine)palladium and [1,1-bis (diphenylphosphino) ferrocene]palladium (II) dichloride dichloromethane adduct. The amount of use of the catalyst may be appropriately selected from the range of usually 0.001 to 0.5 mol, and is preferably 0.01 to 0.2 mol per 1 mol of the compound [IV].

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; halogenated hydrocarbons such as dichloromethane, chloroform, and 1,2-dichloroethane; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; alcohols such as methanol, ethanol, and 2-propanol; nitriles such as acetonitrile and propionitrile; esters such as ethyl acetate, butyl acetate, and ethyl propionate; aliphatic hydrocarbons such as pentane, hexane, cyclohexane, and heptane; pyridines such as pyridine and picoline; water, and a mixed solvent thereof. The amount of use of the solvent is 0.1 to 500 liters, and is preferably 0.3 to 50 liters per 1 mol of the compound [IV].

The reaction temperature of the current reaction may be selected from an arbitrary temperature range usually from −30° C. to the reflux temperature in the reaction system, and is preferably in the range of 0° C. to 150° C.

The reaction time of the current reaction varies depending on the reaction temperature, the reaction substrate, the reaction amount, and the like, but is usually 10 minutes to 72 hours.

After completion of the reaction, the compound [V] can be isolated by conducting an operation of pouring the reaction mixture into water and collecting the precipitated solid by filtration, or subjecting the reaction mixture to extraction with an organic solvent, followed by concentration. The isolated compound [V] also can be further purified by column chromatography, recrystallization, or the like as necessary.

(Process 1-2)

Examples of the acid that can be used in the current reaction include mineral acids such as hydrochloric acid, hydrobromic acid, and sulfuric acid; carboxylic acids such as acetic acid, propionic acid, and trifluoroacetic acid; and sulfonic acids such as methanesulfonic acid and trifluoromethanesulfonic acid. The amount of use of the acid may be appropriately selected from the range of 1 to moles corresponding to the amount of the solvent, and is preferably 1.0 to 100.0 moles per 1 mole of the compound [V].

Examples of the base that can be used in the current reaction include inorganic bases such as hydroxides of alkali metals, such as lithium hydroxide, sodium hydroxide, and potassium hydroxide; hydroxides of alkaline earth metals, such as calcium hydroxide and magnesium hydroxide; carbonates of alkali metals, such as sodium carbonate and potassium carbonate; and alkali metal bicarbonates such as sodium bicarbonate and potassium bicarbonate. The amount of use of the base may be appropriately selected from the range of 0.1 to 50.0 mol, and is preferably 0.5 to 20.0 mol per 1 mol of the compound [V].

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; aprotic polar solvents such as N,N-dimethylacetamide, N-methyl-2-pyrrolidone, dimethyl sulfoxide, sulfolane, and 1,3-dimethyl imidazolidinone; alcohols such as methanol, ethanol, and 2-propanol; ketones such as acetone, methyl ethyl ketone, and cyclohexanone; water, and a mixed solvent thereof. The amount of use of the solvent is 0.1 to 500 liters, and is preferably 0.3 to 30 liters per 1 mol of the compound [V].

The reaction temperature of the current reaction may be selected from an arbitrary temperature range usually from −30° C. to the reflux temperature in the reaction system, and is preferably in the range of 0° C. to 150° C.

The reaction time of the current reaction varies depending on the reaction temperature, the reaction substrate, the reaction amount, and the like, but is usually 10 minutes to 72 hours.

After completion of the current reaction, the compound [III-2] can be isolated by conducting an operation of pouring the reaction mixture into water to neutralize the mixture and collecting the precipitated solid by filtration, or subjecting the reaction mixture to extraction with an organic solvent, followed by concentration. The isolated compound [III-2] also can be further purified by column chromatography, recrystallization, or the like as necessary.

(Process 1-3)

As the catalyst that can be used in the current reaction, a transition metal complex or a combination of a transition metal salt and a ligand may be used. Examples of the transition metal complex include tetrakis(triphenylphosphine)palladium, dichloro[1,1'-bis(diphenylphosphino)ferrocene]palladium-dichloromethane adduct, and tris(dibenzylideneacetone)dipalladium(0). Examples of the transition metal salt include palladium chloride, palladium bromide, and palladium acetate. Examples of the ligand include trimethylphosphine, triethylphosphine, tributylphosphine, triphenylphosphine, 1,3-bis(dimethylphosphino)propane, 1,2-bis(diphenylphosphino)ethane, and 1,3-bis(diphenylphosphino)propane. The amount of use of the catalyst is 0.001 to 0.1 mol, and is preferably 0.01 to 0.05 mol per 1 mol of the compound [IV].

Examples of the base that can be used in the current reaction include inorganic bases such as hydroxides of alkali metals, such as lithium hydroxide, sodium hydroxide, and potassium hydroxide; hydroxides of alkaline earth metals, such as calcium hydroxide and magnesium hydroxide; carbonates of alkali metals, such as sodium carbonate and potassium carbonate; and alkali metal bicarbonates such as sodium bicarbonate and potassium bicarbonate; and organic bases such as triethylamine, 4-methylmorpholine, N-ethyldiisopropylamine, 1,8-diazabicyclo[5.4.0]-7-undecene, pyridine, 4-(N,N-dimethylamino)pyridine, and 2,6-lutidine. The amount of use of the base is 0.1 to 10.0 mol, and is preferably 0.1 to 2.0 mol per 1 mol of the compound [IV]. In the case of an organic base, the organic base can also be used as a solvent.

Examples of the alcohol that can be used in the current reaction include methanol, ethanol, and 2-propanol. The amount of use of the alcohols is 0.1 to 500 liters, and is preferably 0.3 to 30 liters per 1 mol of the compound [IV].

The alcohol can also be used as a solvent.

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; alcohols such as methanol, ethanol, and 2-propanol; nitriles such as acetonitrile and propionitrile; ketones such as acetone, methyl ethyl ketone, and cyclohexanone; and a mixed solvent thereof. The amount of use of the solvent is 0.1 to 500 liters, and is preferably 0.3 to 30 liters per 1 mol of the compound [IV].

The reaction temperature of the current reaction may be selected from an arbitrary temperature range usually from −30° C. to the reflux temperature in the reaction system, and is preferably in the range of 0° C. to 150° C.

The reaction pressure of the current reaction may be selected from an arbitrary pressure range usually from the atmospheric pressure to 50 atm, and is preferably in the range of 1 atm to less than 10 atm.

The reaction time of the current reaction varies depending on the reaction temperature, the reaction pressure, the reaction substrate, the reaction amount, and the like, but is usually 10 minutes to 72 hours.

After completion of the current reaction, the compound [III-1] can be isolated by conducting an operation of pouring the reaction mixture into water to neutralize the mixture and collecting the precipitated solid by filtration, or subjecting the reaction mixture to extraction with an organic solvent, followed by concentration. The isolated compound [III-1] also can be further purified by column chromatography, recrystallization, or the like as necessary.

(Process 1-4)

The acid, base, and solvent that can be used in the current reaction, the reaction temperature, and the reaction time are the same as those in Process 1-2.

After completion of the current reaction, the compound [III-2] can be isolated by conducting an operation of pouring the reaction mixture into water to neutralize the mixture and collecting the precipitated solid by filtration, or subjecting the reaction mixture to extraction with an organic solvent, followed by concentration. The isolated compound [III-2] also can be further purified by column chromatography, recrystallization, or the like as necessary.

(Process 1-5)

The base and solvent that can be used in the current reaction, the reaction temperature, and the reaction time are the same as those in Process 1-3.

After completion of the current reaction, the compound [III-2] can be isolated by conducting an operation of pouring the reaction mixture into water to neutralize the mixture and collecting the precipitated solid by filtration, or subjecting the reaction mixture to extraction with an organic solvent, followed by concentration. The isolated compound [III-2] also can be further purified by column chromatography, recrystallization, or the like as necessary.

Furthermore, the compound [III-2] can also be produced by reacting a compound of formula [IV] with an appropriate carbon monoxide equivalent in an appropriate solvent, in the presence of an appropriate acid anhydride, an appropriate base, an appropriate inorganic salt, and an appropriate catalyst, according to the method described in Org. Lett., Vol. 5 (No. 23), page 4269 to 4272 (2003) or Synthesis, Vol. 18, page 3106 to 3110 (2006).

<Production Method 2>

A compound of formula [I-1] among the compounds of the present invention can be produced using a compound of formula [III-3] according to a method based on the reaction scheme exemplified below.

[Chemical Formula 5]

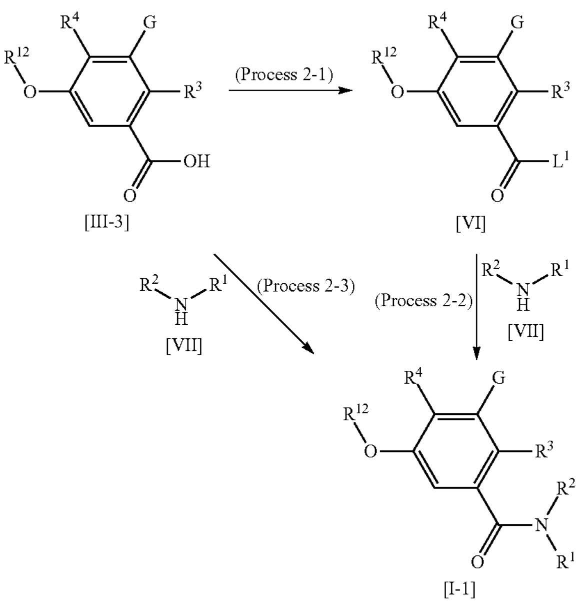

(In the formula, $L^1$ represents a leaving group such as a halogen atom, $OC(=O)OR^{11}$, a methanesulfonyloxy, a trifluoromethanesulfonyloxy, a nonafluorobutanesulfonyloxy, a benzenesulfonyloxy, or a p-toluenesulfonyloxy, $R^{12}$ represents a hydrogen atom or $R^5$, and G, $R^1$, $R^2$, $R^3$, $R^4$, $R^5$, and $R^{11}$ are as defined above.)

That is, the compound of formula [I-1] can be produced by (Process 2-1) converting a compound [III-3] into a compound [VI] which is an active derivative such as an acid halide or a mixed acid anhydride in an appropriate solvent, in the presence or absence of an appropriate catalyst, and then (Process 2-2) reacting the compound [VI] with a compound [VII], in an appropriate solvent, in the presence or absence of an appropriate base, in the presence or absence of an appropriate catalyst. Furthermore, the compound of formula [I-1] can also be produced by (Process 2-3) reacting a compound [III-3] and a compound [VII] in an appropriate solvent, in the presence or absence of an appropriate condensing agent and an appropriate additive, in the presence or absence of an appropriate catalyst, in the presence or absence of an appropriate base.

(Process 2-1)

Examples of the reagent for converting the compound [II-2] into the compound [VI] used in the current reaction include thionyl chloride, oxalyl chloride, phosphoryl chloride, isobutyl chlorocarbonate, methanesulfonyl chloride, trifluoromethanesulfonyl chloride, and p-toluenesulfonyl chloride. The amount of use of the reagent for converting the compound [II-2] into the compound [VI] may be appropriately selected from the range of 0.5 to 30.0 mol, and is preferably 0.5 to 6.0 mol per 1 mol of the compound [III-3].

Examples of the catalyst that can be used in the current reaction include N,N-dimethylformamide. The amount of use of the catalyst may be appropriately selected from the range of 0.01 to 1.0 mol, and is preferably 0.01 to 0.1 mol per 1 mol of the compound [III-3].

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; halogenated hydrocarbons such as dichloromethane, chloroform, and 1,2-dichloroethane; nitriles such as acetonitrile and propionitrile; esters such as ethyl acetate, butyl acetate, and ethyl propionate; aliphatic hydrocarbons such as pentane, hexane, cyclohexane, and heptane; and a mixed solvent thereof. The amount of use of the solvent is 0.1 to 100 liters, and is preferably 0.3 to 10 liters per 1 mol of the compound [III-3].

The reaction temperature of the current reaction may be selected from an arbitrary temperature range usually from −30° C. to the reflux temperature in the reaction system, and is preferably in the range of 0° C. to 150° C.

The reaction time of the current reaction varies depending on the reaction temperature, the reaction substrate, the reaction amount, and the like, but is usually 10 minutes to 24 hours.

After completion of the reaction, the compound [VI] can be isolated by conducting an operation such as concentration.

(Process 2-2)

The amount of use of the compound [VII] used in the current reaction may be appropriately selected from the range of usually 1 to 5 mol, and is preferably 1.0 to 2.5 mol per 1 mol of the compound [VI].

Examples of the base that can be used in the current reaction include organic bases such as triethylamine, 4-methylmorpholine, N-ethyldiisopropylamine, 1,8-diazabicyclo[5.4.0]-7-undecene, pyridine, 4-(N,N-dimethylamino) pyridine, and 2,6-lutidine; and inorganic bases such as hydroxides of alkali metals, such as lithium hydroxide, sodium hydroxide, and potassium hydroxide; carbonates of alkali metals, such as sodium carbonate and potassium carbonate; hydroxides of alkaline earth metals, such as calcium hydroxide and magnesium hydroxide; and bicarbonates of alkali metals, such as sodium bicarbonate and potassium bicarbonate. The amount of use of the base may be appropriately selected from the range of 1 to 10 mol, and is preferably 1.0 to 5 mol per 1 mol of the compound [VI].

Examples of the solvent that can be used in the current reaction include halogenated hydrocarbons such as dichloromethane, chloroform, and 1,2-dichloroethane; aliphatic hydrocarbons such as pentane, hexane, cyclohexane, and heptane; aromatic hydrocarbons such as benzene, toluene, xylene, and chlorobenzene; esters such as ethyl acetate, butyl acetate, and ethyl propionate; nitriles such as acetonitrile and propionitrile; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; ethers such as diethyl ether, cyclopentyl methyl ether, tetrahydrofuran, 2-methyltetrahydrofuran, and 1,4-dioxane; water, and a mixed solvent thereof. The amount of use of the solvent is 0.1 to 100 liters, and is preferably 0.3 to 50 liters per 1 mol of the compound [VI].

The current reaction can be carried out in the presence of a catalyst as necessary, and examples of the catalyst include tetrabutylammonium bromide, tetrabutylammonium chloride, 15-crown-5, and 18-crown-6. The amount of use of the catalyst may be appropriately selected from the range of 0.00 to 1 mol, and is preferably 0.01 to 0.1 mol per 1 mol of the compound [VI].

The reaction temperature of the current reaction may be selected from an arbitrary temperature range from −20° C. to the reflux temperature in the reaction system, and is preferably in the range of 0° C. to 80° C.

The reaction time of the current reaction varies depending on the reaction temperature, the reaction substrate, the reaction amount, and the like, but is usually 1 minute to 48 hours.

After completion of the reaction, the compound [I-1] can be isolated by conducting an operation of pouring the reaction mixture into water and collecting the precipitated solid by filtration, or subjecting the reaction mixture to extraction with an organic solvent, followed by concentration. The isolated compound [I-1] also can be further purified by column chromatography, recrystallization, or the like as necessary.

(Process 2-3)

The amount of use of the compound [VII] used in the current reaction may be appropriately selected from the range of 1 to 3 mol, and is preferably 1.0 to 1.5 mol per 1 mol of the compound [III-3].

Examples of the condensing agent that can be used in the current reaction include 1-ethyl-3-(3-dimethylaminopropyl) carbodiimide hydrochloride, 1-ethyl (3-dimethylaminopropyl)carbodiimide, N,N'-dicyclohexylcarbodiimide, N,N'-diisopropylcarbodiimide, N,N'-carbonyldiimidazole, 4-(4,6-dimethoxy-1,3,5-triazine-2-yl)-4-methylmorpholinium chloride, 1H-benzotriazole-1-yloxytris(dimethylamino) phosphonium hexafluorophosphate, {{[(1-cyano-2-ethoxy-2-oxoethylidene)amino]oxy}-4-morpholinomethylene}dimethylammonium hexafluorophosphate, and O-(7-azabenzotriazole-1-yl)-N,N,N',N'-tetramethyluronium hexafluorophosphate. The amount of use of the condensing agent may be appropriately selected from the range of 1.0 to 5.0 mol, and is preferably 1.0 to 3.0 mol per 1 mol of the compound [III-3].

When an additive is used in the current reaction, examples of the additive that can be used include 1-hydroxybenzotriazole, N-hydroxysuccinimide, and 1-hydroxy-7-azabenzotriazole. The amount of use of the additive may be appropriately selected from the range of 0.01 to 3.0 mol, and is preferably 1.0 to 1.5 mol per 1 mol of the compound [III-3].

When a base is used in the current reaction, examples of the base that can be used include organic bases such as triethylamine, 4-methylmorpholine, N-ethyldiisopropylamine, 1,8-diazabicyclo[5.4.0]-7-undecene, pyridine, 4-(N,N-dimethylamino)pyridine, and 2,6-lutidine. The amount of use of the base may be appropriately selected from the range of 0.1 to 5.0 mol, and is preferably 0.1 to 3.0 mol per 1 mol of the compound [III-3].

When a catalyst is used in the current reaction, examples of the catalyst that can be used include 4-(N,N-dimethylamino)pyridine. The amount of use of the catalyst may be appropriately selected from the range of 0.001 to 1.0 mol, and is preferably 0.01 to 0.1 mol per 1 mol of the compound [III-3].

Examples of the solvent that can be used in the current reaction include halogenated hydrocarbons such as dichloromethane, chloroform, and 1,2-dichloroethane; aliphatic hydrocarbons such as pentane, hexane, cyclohexane, and heptane; esters such as ethyl acetate, butyl acetate, and ethyl propionate; nitriles such as acetonitrile and propionitrile; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; ethers such as diethyl ether, cyclopentyl methyl ether, tetrahydrofuran, 2-methyltetrahydrofuran, and 1,4-dioxane; and a mixed solvent thereof. The amount of use of the solvent is 0.1 to 100 liters, and is preferably 0.3 to 50 liters per 1 mol of the compound [III-3].

The reaction temperature of the current reaction may be selected from an arbitrary temperature range from −20° C. to the reflux temperature in the reaction system, and is preferably in the range of 0° C. to 80° C.

The reaction time of the current reaction varies depending on the reaction temperature, the reaction substrate, the reaction amount, and the like, but is usually 1 minute to 96 hours.

After completion of the reaction, the compound [I-1] can be isolated by conducting an operation of pouring the reaction mixture into water and collecting the precipitated solid by filtration, or subjecting the reaction mixture to extraction with an organic solvent, followed by concentration. The isolated compound [I-1] also can be further purified by column chromatography, recrystallization, or the like as necessary.

<Production Method 3>

A compound of formula [I-2] among the compounds of the present invention can be produced using a compound of formula [II-1] according to a method based on the reaction scheme exemplified below.

[Chemical Formula 6]

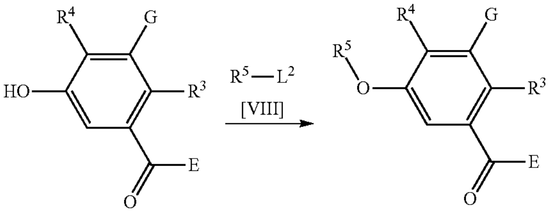

[II-1] [I-2]

(In the formula, E represents a (C1-C6)alkoxy or a group $NR^1R^2$, $L^2$ represents a leaving group such as a halogen atom, a methanesulfonyloxy, a trifluoromethanesulfonyloxy, a nonafluorobutanesulfonyloxy, a benzenesulfonyloxy, or a p-toluenesulfonyloxy, and G, $R^1$, $R^2$, $R^3$, $R^4$, and $R^5$ are as defined above). That is, the compound of the present invention of formula [I-2] can be produced by reacting a compound [II-1] and a compound [VIII] in an appropriate solvent, in the presence of an appropriate base, in the presence or absence of an appropriate catalyst.)

The amount of use of the compound [VIII] used in the current reaction may be appropriately selected from the range of 1.0 to 15.0 mol, and is preferably 1.0 to 6.0 mol per 1 mol of the compound [II-1].

Examples of the base that can be used in the current reaction include inorganic bases such as hydroxides of alkali metals, such as sodium hydroxide and potassium hydroxide; hydroxides of alkaline earth metals, such as calcium hydroxide and magnesium hydroxide; carbonates of alkali metals, such as sodium carbonate and potassium carbonate; and alkali metal bicarbonates such as sodium bicarbonate and potassium bicarbonate; metal hydrides such as sodium hydride and potassium hydride; metal salts of alcohols, such as sodium methoxide, sodium ethoxide, potassium tert-butoxide; and organic bases such as triethylamine, 4-methylmorpholine, N-ethyldiisopropylamine, 1,8-diazabicyclo [5.4.0]-7-undecene, pyridine, 4-(N,N-dimethylamino) pyridine, and 2,6-lutidine. The amount of use of the base may be appropriately selected from the range of 1.0 to 5.0 mol, and is preferably 1.0 to 1.5 mol per 1 mol of the compound [II-1].

Examples of the catalyst that can be used in the current reaction include tetra-n-butylammonium bromide and tetra-n-butylammonium iodide. The amount of use of the catalyst may be appropriately selected from the range of 0.01 to 1.0 mol, and is preferably 0.05 to 0.5 mol per 1 mol of the compound [II-1].

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; halogenated hydrocarbons such as dichloromethane, chloroform, and 1,2-dichloroethane; aprotic polar solvents such as N,N-dimethylformamide, N,N-dimethylacetamide, N-methyl pyrrolidone, dimethyl sulfoxide, sulfolane, and 1,3-dimethyl-2-imidazolidinone; alcohols such as methanol, ethanol, and 2-propanol; nitriles such as acetonitrile and propionitrile; esters such as ethyl acetate, butyl acetate, and ethyl propionate; aliphatic hydrocarbons such as pentane, hexane, cyclohexane, and heptane; pyridines such as pyridine and picoline; water, and a mixed solvent thereof. The amount of use of the solvent is 0.1 to 100 liters, and is preferably 0.1 to 15 liters per 1 mol of the compound [II-1].

The reaction temperature of the current reaction may be selected from an arbitrary temperature range usually from −30° C. to the reflux temperature in the reaction system, and is preferably in the range of 0° C. to 150° C.

The reaction time of the current reaction varies depending on the reaction temperature, the reaction substrate, the reaction amount, and the like, but is usually 10 minutes to 24 hours.

After completion of the reaction, the compound [I-2] can be isolated by conducting an operation of pouring the reaction mixture into water or the like and subjecting the mixture to extraction with an organic solvent, followed by concentration. The isolated compound [I-2] also can be further purified by column chromatography, recrystallization, or the like as necessary.

<Production Method 4>

A compound of formula [I-2] among the compounds of the present invention can also be produced using a compound of formula [II-1] according to a method based on the reaction scheme exemplified below.

[Chemical Formula 7]

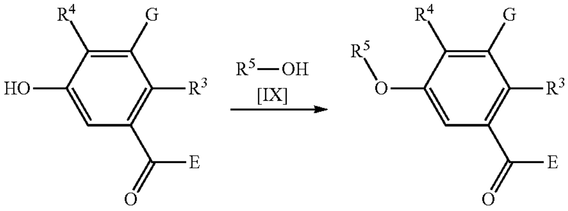

[II-1] [I-2]

(In the formula, G, $R^3$, $R^4$, $R^5$, and E are as defined above.)

That is, the compound of the present invention of formula [I-2] can be produced by reacting a compound [II-1] and a compound [IX] in an appropriate solvent, in the presence of a trisubstituted phosphine and an azodicarboxylic acid derivative, or in the presence of phosphorane.

The amount of use of the compound [IX] used in the current reaction may be appropriately selected from the range of 1.0 to 5.0 mol, and is preferably 1.0 to 3.0 mol per 1 mol of the compound [II-1].

Examples of the trisubstituted phosphine that can be used in the current reaction include triphenylphosphine, tributylphosphine, and trimethylphosphine. The amount of use of the trisubstituted phosphine may be appropriately selected from the range of 1.0 to 5.0 mol, and is preferably 1.0 to 3.0 mol per 1 mol of the compound [II-1].

Examples of the azodicarboxylic acid derivative that can be used in the current reaction include diethyl azodicarboxylate, diisopropyl azodicarboxylate, dimethoxyethyl azodicarboxylate, and N,N,N',N'-tetramethylazodicarboxamide. The amount of use of the azodicarboxylic acid derivative may be appropriately selected from the range of 1.0 to 5.0 mol, and is preferably 1.0 to 3.0 mol per 1 mol of the compound [II-1].

Examples of the phosphorane that can be used in the current reaction include cyanomethylenetrimethylphosphorane and cyanomethylenetributylphosphorane. The amount of use of the phosphorane may be appropriately selected from the range of 1.0 to 5.0 mol, and is preferably 1.0 to 3.0 mol per 1 mol of the compound [II-1].

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; halogenated hydrocarbons such as dichloromethane, chloroform, and 1,2-dichloroethane; aliphatic hydrocarbons such as pentane, hexane, cyclohexane, and heptane; ketones such as acetone, methyl ethyl ketone, and cyclohexanone; acetic acid, water, and a mixed solvent thereof. The amount of use of the solvent is 0.1 to 100 liters, and is preferably 0.3 to 15 liters per 1 mol of the compound [II-1].

The reaction temperature of the current reaction may be selected from an arbitrary temperature range usually from −30° C. to the reflux temperature in the reaction system, and is preferably in the range of 0° C. to 150° C.

The reaction time of the current reaction varies depending on the reaction temperature, the reaction substrate, the reaction amount, and the like, but is usually 10 minutes to 24 hours.

After completion of the reaction, the compound [I-2] can be isolated by conducting an operation of concentrating the reaction mixture as it is, or pouring the reaction mixture into water or the like and subjecting the mixture to extraction with an organic solvent, followed by concentration.

The isolated compound [I-2] also can be further purified by column chromatography, recrystallization, or the like as necessary.

<Production Method 5>

A compound of formula [I-4] among the compounds of the present invention can be produced using a compound of formula [I-3] according to a method based on the reaction scheme exemplified below.

[Chemical Formula 8]

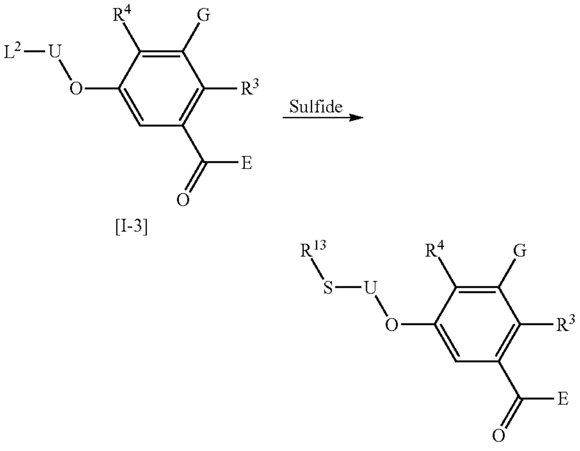

[I-3]

[I-4]

(In the formula, $R^{13}$ represents a hydrogen atom; a cyano; a (C1-C6)alkyl; a (C1-C6)haloalkyl; a (C2-C6)alkenyl; a (C2-C6)haloalkenyl; a (C3-C6)cycloalkyl (C1-C6)alkyl; a (C3-C6)halocycloalkyl (C1-C6)alkyl; a (C3-C6)cycloalkyl; a (C3-C6)halocycloalkyl; a tri (C1-C6 alkyl)silyl (C1-C6) alkyl; or a phenyl, U represents (C1-C12)alkylene; (C3-C6) cycloalkylene; (C2-C6)alkenylene; (C1-C6)alkyleneoxy (C1-C12)alkylene; or (C2-C6)alkynylene, and G, $L^2$, $R^3$, $R^4$, and E are as defined above.)

That is, the compound of formula [1-4] can be produced by reacting a compound [I-3] and a sulfide in an appropriate solvent, in the presence or absence of an appropriate base, in the presence or absence of an appropriate catalyst.

Examples of the sulfide that can be used in the current reaction include hydrosulfides of alkali metals, such as sodium hydrosulfide and potassium hydrosulfide; thiocyanates such as sodium thiocyanate, potassium thiocyanate, and ammonium thiocyanate; alkyl mercaptans such as methyl mercaptan, ethyl mercaptan, and tert-butyl mercaptan; haloalkyl mercaptans such as 2,2,2-trifluoroethyl mercaptan; cycloalkylalkyl mercaptans such as cyclopropylmethyl mercaptan; and thioureas such as thiourea. The amount of use of the sulfide may be appropriately selected from the range of 1.0 to 10.0 mol, and is preferably 1.0 to 5.0 mol per 1 mol of the compound [1-3].

Examples of the base that can be used in the current reaction include inorganic bases such as hydroxides of alkali metals, such as sodium hydroxide and potassium hydroxide; hydroxides of alkaline earth metals, such as calcium hydroxide and magnesium hydroxide; carbonates of alkali metals, such as sodium carbonate and potassium carbonate; and alkali metal bicarbonates such as sodium bicarbonate and potassium bicarbonate; metal hydrides such as sodium hydride and potassium hydride; metal salts of alcohols, such as sodium methoxide, sodium ethoxide, potassium tert-butoxide; and organic bases such as triethylamine, 4-methylmorpholine, N-ethyldiisopropylamine, 1,8-diazabicyclo [5.4.0]-7-undecene, pyridine, 4-(N,N-dimethylamino) pyridine, and 2,6-lutidine. The amount of use of the base may be appropriately selected from the range of 1.0 to 5.0 mol, and is preferably 1.0 to 2.0 mol per 1 mol of the compound [I-3].

Examples of the catalyst that can be used in the current reaction include sodium iodide and potassium iodide. The amount of use of the catalyst may be appropriately selected from the range of 0.01 to 1.0 mol, and is preferably 0.1 to 0.5 mol per 1 mol of the compound [1-3].

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; alcohols such as methanol, ethanol, and 2-propanol; nitriles such as acetonitrile and propionitrile; aliphatic hydrocarbons such as pentane, hexane, cyclohexane, and heptane; pyridines such as pyridine and picoline; and a mixed solvent thereof. The amount of use of the solvent is 0.1 to 100 liters, and is preferably 0.3 to 15 liters per 1 mol of the compound [I-3].

The reaction temperature of the current reaction may be selected from an arbitrary temperature range usually from 0° C. to the reflux temperature in the reaction system, and is preferably in the range of room temperature to 150° C.

The reaction time of the current reaction varies depending on the reaction temperature, the reaction substrate, the reaction amount, and the like, but is usually 10 minutes to 96 hours.

After completion of the reaction, the compound [I-4] can be isolated by conducting an operation of concentrating the reaction mixture as it is, or pouring the reaction mixture into water or the like and subjecting the mixture to extraction with an organic solvent, followed by concentration.

The isolated compound [I-4] also can be further purified by column chromatography, recrystallization, or the like as necessary.

<Production Method 6>

A compound of formula [I-6] among the compounds of the present invention can be produced using a compound of formula [I-5] according to a method based on the reaction scheme exemplified below.

[Chemical Formula 9]

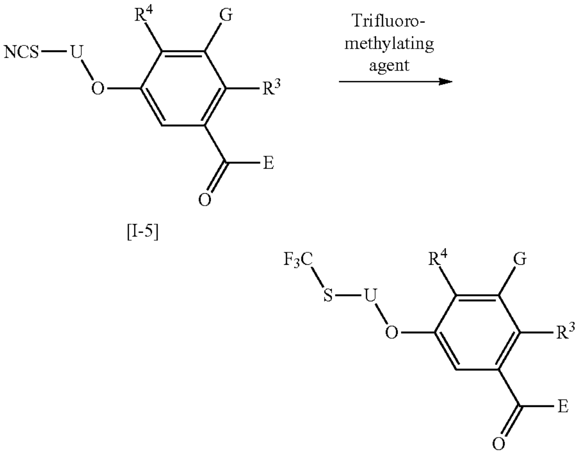

[I-5]

[I-6]

(In the formula, G, $R^3$, $R^4$, E, and U are as defined above.)

That is, the compound of formula [I-6] can be produced by reacting a compound [I-5] and a trifluoromethylating agent in an appropriate solvent in the presence of an appropriate catalyst.

Examples of the trifluoromethylating agent used in the current reaction include (trifluoromethyl)trimethylsilane, triethyl(trifluoromethyl)silane, and the trifluoromethylating agent described in WO 2015/199109. The amount of use of the trifluoromethylating agent may be appropriately selected from the range of 1.0 to 10.0 mol, and is preferably 1.0 to 5.0 mol per 1 mol of the compound [I-5].

Examples of the catalyst that can be used in the current reaction include tetra-n-butylammonium fluoride, cesium fluoride, and potassium fluoride. The amount of use of the catalyst may be appropriately selected from the range of 0.01 to 1.0 mol, and is preferably 0.05 to 0.3 mol per 1 mol of the compound [I-5].

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; halogenated hydrocarbons such as dichloromethane, chloroform, and 1,2-dichloroethane; nitriles such as acetonitrile and propionitrile; aliphatic hydrocarbons such as pentane, hexane, cyclohexane, and heptane; and a mixed solvent thereof. The amount of use of the solvent is 0.1 to 100 liters, and is preferably 0.3 to 15 liters per 1 mol of the compound [I-5].

The reaction temperature of the current reaction may be selected from an arbitrary temperature range usually from −30° C. to the reflux temperature in the reaction system, and is preferably in the range of 0° C. to room temperature.

The reaction time of the current reaction varies depending on the reaction temperature, the reaction substrate, the reaction amount, and the like, but is usually 10 minutes to 24 hours.

After completion of the reaction, the compound [I-6] can be isolated by conducting an operation of concentrating the reaction mixture as it is, or pouring the reaction mixture into water or the like and subjecting the mixture to extraction with an organic solvent, followed by concentration.

The isolated compound [I-6] also can be further purified by column chromatography, recrystallization, or the like as necessary.

<Production Method 7>

A compound of formula [I-8] among the compounds of the present invention can be produced using a compound of formula [I-7] according to a method based on the reaction scheme exemplified below.

[Chemical Formula 10]

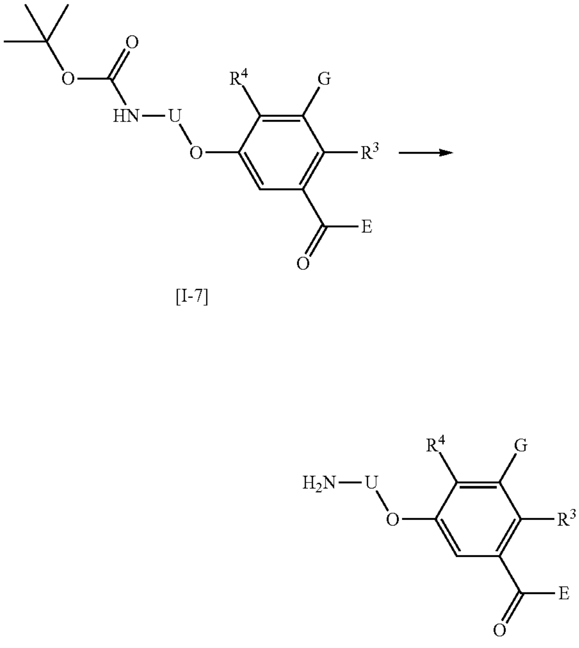

[I-7]

[I-8]

(In the formula, G, $R^3$, $R^4$, E, and U are as defined above.)

That is, the compound of formula [I-8] can be produced by reacting a compound [I-7] in an appropriate solvent, in the presence of an appropriate acid, under conditions used for deprotection of a tert-butoxycarbonyl group, for example, according to the method described in GREEN'S PROTECTIVE GROUPS in Organic Synthesis; the 5th edition (John Wiley and Sons, 2014, Peter G. M. Wuts).

<Production Method 8>

A compound of formula [I-9] among the compounds of the present invention can be produced using a compound of formula [I-8] according to a method based on the reaction scheme exemplified below.

[Chemical Formula 11]

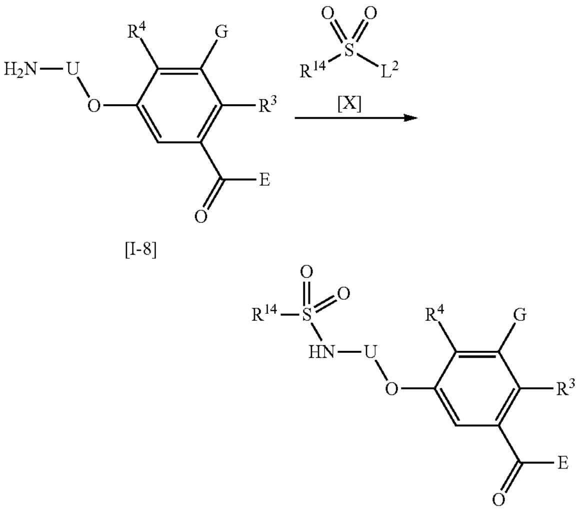

[I-8]

[I-9]

[In the formula, $R^{14}$ represents a (C1-C6)alkyl; a (C1-C6) haloalkyl; or a phenyl (the phenyl is optionally mono-substituted or poly-substituted with $R^7$), and G, $L^2$, $R^3$, $R^4$, $R^7$, E, and U are as defined above.]

That is, the compound of formula [I-9] can be produced by reacting a compound [I-8] and a compound [X] in an appropriate solvent, in the presence of an appropriate base, in the presence or absence of an appropriate additive.

The amount of use of the compound [X] used in the current reaction may be appropriately selected from the range of 1.0 to 5.0 mol, and is preferably 1.0 to 2.0 mol per 1 mol of the compound [I-8].

Examples of the base that can be used in the current reaction include inorganic bases such as hydroxides of alkali metals, such as lithium hydroxide, sodium hydroxide, and potassium hydroxide; hydroxides of alkaline earth metals, such as calcium hydroxide and magnesium hydroxide; carbonates of alkali metals, such as sodium carbonate and potassium carbonate; and alkali metal bicarbonates such as sodium bicarbonate and potassium bicarbonate; and organic bases such as triethylamine, 4-methylmorpholine, N-ethyldiisopropylamine, 1,8-diazabicyclo[5.4.0]-7-undecene, pyridine, 4-(N,N-dimethylamino)pyridine, and 2,6-lutidine. The amount of use of the base may be appropriately selected from the range of 1.0 to 10.0 mol, and is preferably 1.0 to 3.0 mol per 1 mol of the compound [I-8].

When an additive is used in the current reaction, examples of the additive that can be used include molecular sieve 3 A, molecular sieve 4 A, and molecular sieve 5 A.

The amount of use of the additive may be appropriately selected from the range of 0.01 to 10 g, and is preferably 0.1 to 1.0 g per 1 g of the compound [I-8].

Examples of the solvent that can be used in the current reaction include ethers such as diethyl ether, cyclopentyl methyl ether, tetrahydrofuran, 2-methyltetrahydrofuran, and 1,4-dioxane; halogenated hydrocarbons such as dichloromethane, chloroform, and 1,2-dichloroethane; aromatic hydrocarbons such as benzene, toluene, xylene, and chlorobenzene; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; nitriles such as acetonitrile and propionitrile; aliphatic hydrocarbons such as pentane, hexane, cyclohexane, and heptane; and a mixed solvent thereof. The amount of use of the solvent is 0.1 to 100 liters, and is preferably 0.3 to 30 liters per 1 mol of the compound [I-8].

The reaction temperature of the current reaction may be selected from an arbitrary temperature range usually from −70° C. to the reflux temperature in the reaction system, and is preferably in the range of −20° C. to room temperature.

The reaction time of the current reaction varies depending on the reaction temperature, the reaction substrate, the reaction amount, and the like, but is usually 10 minutes to 24 hours.

After completion of the reaction, the compound [I-9] can be isolated by conducting an operation of filtering off an unnecessary substance, concentrating the resulting substance as necessary, and then subjecting the concentrated resultant to extraction with an organic solvent, or pouring the reaction mixture into water or the like and subjecting the mixture with an organic solvent, followed by concentration. The isolated compound [I-9] also can be further purified by column chromatography, recrystallization, or the like as necessary.

<Production Method 9>

A compound of formula [I-10] among the compounds of the present invention can be produced using a compound of formula [I-9] according to a method based on the reaction scheme exemplified below.

[Chemical Formula 12]

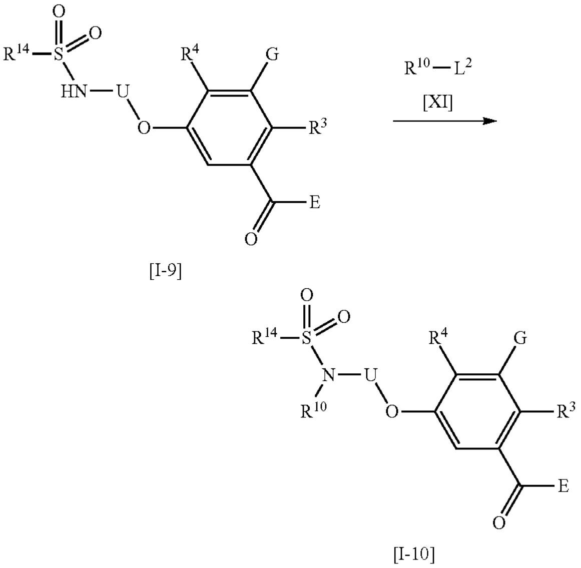

[I-9]

[I-10]

(In the formula, G, $L^2$, $R^3$, $R^4$, $R^{10}$, $R^{14}$, E, and U are as defined above.)

That is, the compound of formula [I-10] can be produced by reacting a compound [I-9] with a compound [XI] or di-tert-butyl dicarbonate in an appropriate solvent in the presence of an appropriate base.

The amount of use of the compound [XI] or di-tert-butyl dicarbonate used in the current reaction may be appropriately selected from the range of 1.0 to 5.0 mol, and is preferably 1.0 to 2.0 mol per 1 mol of the compound [I-9].

Examples of the base that can be used in the current reaction include inorganic bases such as hydroxides of alkali metals, such as sodium hydroxide and potassium hydroxide;

hydroxides of alkaline earth metals, such as calcium hydroxide and magnesium hydroxide; carbonates of alkali metals, such as sodium carbonate and potassium carbonate; and alkali metal bicarbonates such as sodium bicarbonate and potassium bicarbonate; and organic bases such as triethylamine, 4-methylmorpholine, N-ethyldiisopropylamine, 1,8-diazabicyclo[5.4.0]-7-undecene, pyridine, 4-(N,N-dimethylamino)pyridine, and 2,6-lutidine. The amount of use of the base may be appropriately selected from the range of 1.0 to 10 mol, and is preferably 1.0 to 5.0 mol per 1 mol of the compound [I-9].

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; halogenated hydrocarbons such as dichloromethane, chloroform, and 1,2-dichloroethane; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; alcohols such as methanol, ethanol, and 2-propanol; nitriles such as acetonitrile and propionitrile; esters such as ethyl acetate and ethyl propionate; aliphatic hydrocarbons such as pentane, hexane, cyclohexane, and heptane; pyridines such as pyridine and picoline; water, and a mixed solvent thereof. The amount of use of the solvent is 0.1 to 300 liters, and is preferably 0.1 to 100 liters per 1 mol of the compound [I-9].

The reaction temperature of the current reaction may be selected from an arbitrary temperature range usually from −30° C. to the reflux temperature in the reaction system, and is preferably in the range of 0° C. to 150° C.

The reaction time of the current reaction varies depending on the reaction temperature, the reaction substrate, the reaction amount, and the like, but is usually 10 minutes to 24 hours.

After completion of the reaction, the compound [I-10] can be isolated by conducting an operation of concentrating the reaction mixture as it is, or pouring the reaction mixture into water or the like and subjecting the mixture to extraction with an organic solvent, followed by concentration. The isolated compound [I-10] also can be further purified by column chromatography, recrystallization, or the like as necessary.

<Production Method 10>

A compound of formula [I-12] among the compounds of the present invention can be produced using a compound of formula [I-11] according to a method based on the reaction scheme exemplified below.

[Chemical Formula 13]

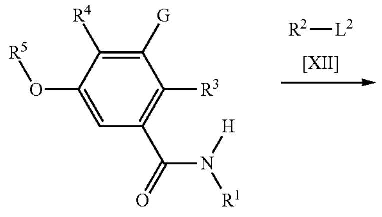

[I-11]

-continued

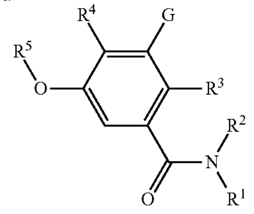

[I-12]

(In the formula, G, $L^2$, $R^1$, $R^2$, $R^3$, $R^4$, and $R^5$ are as defined above.)

That is, the compound of formula [I-12] can be produced by reacting a compound [I-11] and a compound [XII] in an appropriate solvent in the presence of an appropriate base.

The amount of use of the compound [XII] used in the current reaction may be appropriately selected from the range of 1.0 to 30.0 mol, and is preferably 1.0 to 6.0 mol per 1 mol of the compound [I-11].

Examples of the base that can be used in the current reaction include inorganic bases such as hydroxides of alkali metals, such as sodium hydroxide and potassium hydroxide; hydroxides of alkaline earth metals, such as calcium hydroxide and magnesium hydroxide; carbonates of alkali metals, such as sodium carbonate and potassium carbonate; and alkali metal bicarbonates such as sodium bicarbonate and potassium bicarbonate; metal hydrides such as sodium hydride and potassium hydride; and metal salts of alcohols, such as sodium methoxide, sodium ethoxide, and potassium tert-butoxide. The amount of use of the base may be appropriately selected from the range of 1.0 to 10.0 mol, and is preferably 1.0 to 5.0 mol per 1 mol of the compound [I-11].

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; halogenated hydrocarbons such as dichloromethane, chloroform, and 1,2-dichloroethane; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; alcohols such as methanol, ethanol, and 2-propanol; nitriles such as acetonitrile and propionitrile; esters such as ethyl acetate, butyl acetate, and ethyl propionate; aliphatic hydrocarbons such as pentane, hexane, cyclohexane, and heptane; pyridines such as pyridine and picoline; water, and a mixed solvent thereof. The amount of use of the solvent is 0.1 to 100 liters, and is preferably 0.1 to 25 liters per 1 mol of the compound [I-11].

The reaction temperature of the current reaction may be selected from an arbitrary temperature range usually from −30° C. to the reflux temperature in the reaction system, and is preferably in the range of −10° C. to 150° C.

The reaction time of the current reaction varies depending on the reaction temperature, the reaction substrate, the reaction amount, and the like, but is usually 10 minutes to 24 hours.

After completion of the reaction, the compound [I-12] can be isolated by conducting an operation of pouring the reaction mixture into water or the like and subjecting the mixture to extraction with an organic solvent, followed by concentration. The isolated compound [I-12] also can be further purified by column chromatography, recrystallization, or the like as necessary.

<Production Method 11>

A compound of formula [I-13] among the compounds of the present invention can be produced using a compound of formula [I-1] according to a method based on the reaction scheme exemplified below.

[Chemical Formula 14]

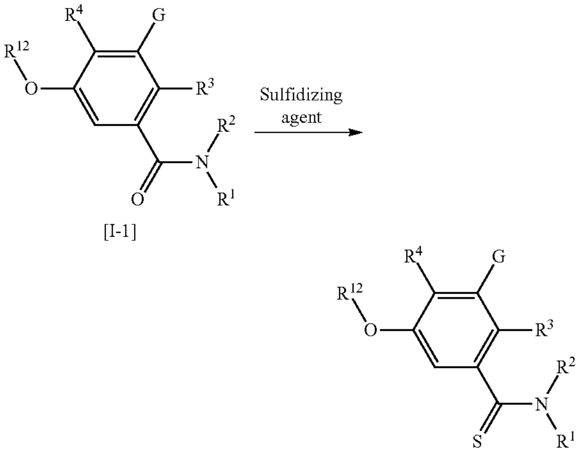

[I-1]

[I-13]

(In the formula, G, $R^1$, $R^2$, $R^3$, $R^4$, and $R^{12}$ are as defined above.)

That is, the compound of formula [I-13] can be produced by reacting a compound [I-1] and an appropriate sulfidizing agent in an appropriate solvent in the presence or absence of an appropriate base.

Examples of the sulfurizing agent that can be used in the current reaction include phosphorus pentasulfide and a Lawesson's reagent (2,4-bis(4-methoxyphenyl)-1,3,2,4-dithiadiphosphetane-2,4-disulfide). The amount of use of the sulfurizing agent may be appropriately selected from the range of 0.5 to 30.0 mol, and is preferably 0.5 to 5.0 mol per 1 mol of the compound [I-1].

Although addition of a base is not necessarily required in the current reaction, when the base is used, examples of the base that can be used include inorganic bases such as carbonates of alkali metals, such as sodium carbonate and potassium carbonate; and organic bases such as triethylamine, 4-methylmorpholine, N-ethyldiisopropylamine, 1,8-diazabicyclo[5.4.0]-7-undecene, pyridine, 4-(N,N-dimethylamino)pyridine, and 2,6-lutidine. The amount of use of the base may be appropriately selected from the range of 0.01 to 10.0 mol, and is preferably 0.1 to 2.0 mol per 1 mol of the compound [I-1].

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; halogenated hydrocarbons such as dichloromethane, chloroform, and 1,2-dichloroethane; aliphatic hydrocarbons such as pentane, hexane, cyclohexane, and heptane; water, and a mixed solvent thereof. The amount of use of the solvent is 0.1 to 300 liters, and is preferably 0.3 to 50 liters per 1 mol of the compound [I-1].

The reaction temperature of the current reaction may be selected from an arbitrary temperature range usually from −70° C. to the reflux temperature in the reaction system, and is preferably in the range of 0° C. to 150° C.

The reaction time of the current reaction varies depending on the reaction temperature, the reaction substrate, the reaction amount, and the like, but is usually 10 minutes to 24 hours.

After completion of the reaction, the compound [I-13] can be isolated by conducting an operation of filtering off an insoluble substance from the reaction mixture and concentrating the resulting substance, or pouring the reaction mixture into water and subjecting the mixture to extraction with an organic solvent, followed by concentration. Alternatively, the compound [I-13] can also be isolated from the reaction mixture by concentrating the solvent. The isolated compound [I-13] also can be further purified by column chromatography, recrystallization, or the like as necessary.

<Production Method 12>

A compound of formula [II-1] among the compounds of the present invention can be produced using a compound of formula [XIII] according to a method based on the reaction scheme exemplified below.

[Chemical Formula 15]

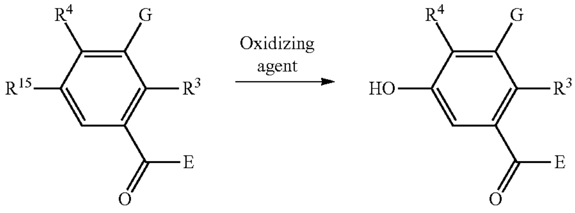

[XIII] [II-1]

(In the formula, $R^{15}$ represents a dihydroxyboryl (—B $(OH)_2$) or a pinacolato borane-2-yl, and G, $R^3$, $R^4$, and E are as defined above.)

That is, the compound of formula [II-1] can be produced by reacting a compound [XIII] with an appropriate oxidizing agent in an appropriate solvent.

Examples of the oxidizing agent that can be used in the current reaction include hydrogen peroxide and 4-methylmorpholine-N-oxide. The amount of use of the oxidizing agent may be appropriately selected from the range of 1.0 to 20.0 mol, and is preferably 1.0 to 6.0 mol per 1 mol of the compound [XIII].

Examples of the solvent that can be used in the current reaction include aromatic hydrocarbons such as benzene, toluene, xylene, and chlorobenzene; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; alcohols such as methanol, ethanol, and 2-propanol; halogenated hydrocarbons such as dichloromethane, chloroform, and 1,2-dichloroethane; aliphatic hydrocarbons such as pentane, hexane, cyclohexane, and heptane; ketones such as acetone, methyl ethyl ketone, and cyclohexanone; acetic acid, water, and a mixed solvent thereof. The amount of use of the solvent is 0.1 to 100 liters, and is preferably 0.3 to 15 liters per 1 mol of the compound [XIII].

The reaction temperature of the current reaction may be selected from an arbitrary temperature range from −30° C.

to the reflux temperature in the reaction system, and is preferably in the range of −10° C. to 150° C.

The reaction time of the current reaction varies depending on the reaction temperature, the reaction substrate, the reaction amount, and the like, but is usually 10 minutes to 24 hours.

After completion of the reaction, the compound [II-1] can be isolated by conducting an operation of pouring the reaction mixture into water or the like and subjecting the mixture to extraction with an organic solvent, followed by concentration. The isolated compound [II-1] also can be further purified by column chromatography, recrystallization, or the like as necessary.

<Production Method 13>

A compound of formula [I-15] among the compounds of the present invention can be produced according to a method based on the reaction scheme exemplified below.

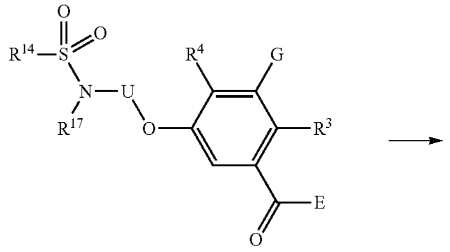

[I-14]

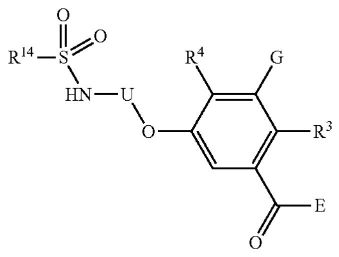

[I-15]

(In the formula, $R^{17}$ represents a (C1-C6)alkoxymethyl or a tert-butoxycarbonyl, and E, G, $R^3$, $R^4$, $R^{14}$ and U are as defined above.)

That is, the compound of formula [I-15] can be produced by reacting a compound [I-14] in an appropriate solvent in the presence of an appropriate acid.

Examples of the acid that can be used in the current reaction include mineral acids such as hydrochloric acid, hydrobromic acid, and sulfuric acid; carboxylic acids such as acetic acid, propionic acid, and trifluoroacetic acid; and sulfonic acids such as methanesulfonic acid and trifluoromethanesulfonic acid. The amount of use of the acid may be appropriately selected from the range of 0.1 to moles corresponding to the amount of the solvent, and is preferably 1.0 to 100.0 moles per 1 mole of the compound [I-14].

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; alcohols such as methanol, ethanol, and 2-propanol; halogenated hydrocarbons such as dichloromethane, chloroform, and 1,2-dichloroethane; aliphatic hydrocarbons such as pentane, hexane, cyclohexane, and heptane; ketones such as acetone, methyl ethyl ketone, and cyclohexanone; water, and a mixed solvent thereof. The amount of use of the solvent is 0.1 to 500 liters, and is preferably 0.3 to 30 liters per 1 mol of the compound [I-14].

The reaction temperature of the current reaction may be selected from an arbitrary temperature range usually from −30° C. to the reflux temperature in the reaction system, and is preferably in the range of 0° C. to 150° C.

The reaction time of the current reaction varies depending on the reaction temperature, the reaction substrate, the reaction amount, and the like, but is usually 10 minutes to 72 hours.

After completion of the current reaction, the compound [1-15] can be isolated by conducting an operation of concentrating the reaction mixture as it is, or pouring the reaction mixture into water or the like and subjecting the mixture to extraction with an organic solvent, followed by concentration. The isolated compound [I-15] also can be further purified by column chromatography, recrystallization, or the like as necessary.

<Production Method 1 of Intermediate>

A compound of formula [XVI] can be produced using a compound of formula [XIV] according to a method based on the reaction scheme exemplified below.

[Chemical Formula 16]

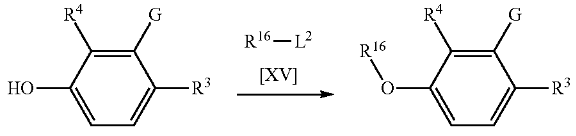

[XIV] [XVI]

(In the formula, $R^{16}$ represents a protecting group such as a (C1-C6)alkylcarbonyl, a (C1-C6)alkoxycarbonyl, a methanesulfonyl, a trifluoromethanesulfonyl, a nonafluorobutanesulfonyl, a benzenesulfonyl, or a p-toluenesulfonyl, and G, $L^2$, $R^3$, and $R^4$ are as defined above.)

That is, the compound of formula [XVI] can be produced by reacting a compound [XIV] with a compound [XV] in an appropriate solvent, in the presence of an appropriate base, under conditions used for protecting a phenolic hydroxyl group, for example, according to the method described in GREEN'S PROTECTIVE GROUPS in Organic Synthesis; the 5th edition (John Wiley and Sons, 2014, Peter G. M. Wuts).

<Production Method 2 of Intermediate>

A compound of formula [XVII] can be produced using a compound of formula [XVI] according to a method based on the reaction scheme exemplified below.

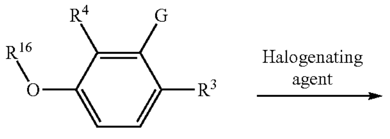

[XVI]

-continued

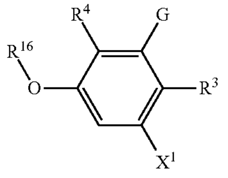

[XVII]

(In the formula, G, $X^1$, $R^3$, $R^4$, and $R^{16}$ are as defined above.)

That is, the compound of formula [XVII] can be produced by reacting a compound [XVI] with a halogenating agent in an appropriate solvent.

Examples of the halogenating agent that can be used in the current reaction include chlorine, sulfuryl chloride, N-chlorosuccinimide, bromine, N-bromosuccinimide, 1,3-dibromo-5,5-dimethylhydantoin, iodine, N-iodosuccinimide, 1,3-diiodo-5,5-dimethylhydantoin, potassium iodate, and a mixture thereof. The amount of use of the halogenating agent may be appropriately selected from the range of 0.01 to 10.0 mol, and is preferably 0.02 to 2.0 mol per 1 mol of the compound [XVI].

Examples of the solvent that can be used in the current reaction include halogenated hydrocarbons such as dichloromethane, chloroform, and 1,2-dichloroethane; aliphatic hydrocarbons such as pentane, hexane, cyclohexane, and heptane; nitriles such as acetonitrile and propionitrile; carboxylic acids such as acetic acid, propionic acid, and trifluoroacetic acid; sulfuric acid, water, and a mixed solvent thereof. The amount of use of the solvent is 0.1 to 300 liters, and is preferably 0.3 to 20 liters per 1 mol of the compound [XVI].

The reaction temperature of the current reaction may be selected from an arbitrary temperature range usually from −70° C. to the reflux temperature in the reaction system, and is preferably in the range of −20° C. to 100° C.

The reaction time of the current reaction varies depending on the reaction temperature, the reaction substrate, the reaction amount, and the like, but is usually 10 minutes to 24 hours.

After completion of the reaction, the compound [XVII] can be isolated by conducting an operation of pouring the reaction mixture into water and collecting the precipitated solid by filtration, or subjecting the reaction mixture to extraction with an organic solvent, followed by concentration. The isolated compound [XVII] also can be further purified by column chromatography, recrystallization, or the like as necessary.

<Production Method 3 of Intermediate>

A compound of formula [XVIII] can be produced using a compound of formula [XVII] according to a method based on the reaction scheme exemplified below.

[Chemical Formula 17]

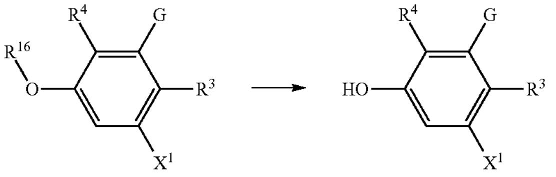

[XVII] [XVIII]

(In the formula, G, $X^1$, $R^3$, $R^4$, and $R^{16}$ are as defined above.)

That is, the compound of formula [XVIII] can be produced by hydrolyzing a compound [XVII] in an appropriate solvent in the presence of an appropriate acid or base.

The acid, base, and solvent that can be used in the current reaction, the reaction temperature, and the reaction time are the same as those in Process 1-2 of the production method 1.

After completion of the current reaction, the compound [XVIII] can be isolated by conducting an operation of pouring the reaction mixture into water to neutralize the mixture and collecting the precipitated solid by filtration, or subjecting the reaction mixture to extraction with an organic solvent, followed by concentration. The isolated compound [XVIII] also can be further purified by column chromatography, recrystallization, or the like as necessary.

<Production Method 4 of Intermediate>

A compound of formula [XIX] can be produced using a compound of formula [XVIII] according to a method based on the reaction scheme exemplified below.

[Chemical Formula 18]

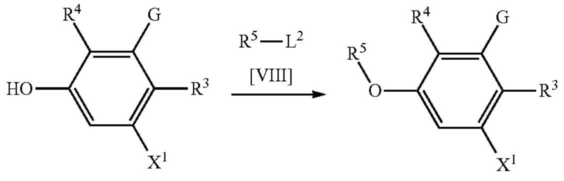

[XVIII] [XIX]

(In the formula, G, $L^2$, $R^3$, $R^4$, $R^5$ and $X^1$ are as defined above.)

That is, the compound of formula [XIX] can be produced by reacting a compound [XVIII] and a compound [VIII] in an appropriate solvent, in the presence of an appropriate base, in the presence or absence of an appropriate catalyst.

The base and catalyst used in the current reaction, the solvent that can be used in the reaction, the reaction temperature, and the reaction time are the same as those in the production method 3.

After completion of the reaction, the compound [XIX] can be isolated by conducting an operation of pouring the reaction mixture into water and collecting the precipitated solid by filtration, or subjecting the reaction mixture to extraction with an organic solvent, followed by concentration. The isolated compound [XIX] also can be further purified by column chromatography, recrystallization, or the like as necessary.

<Production Method 5 of Intermediate>

A compound of formula [XIX] can be produced using a compound of formula [XVIII] according to a method based on the reaction scheme exemplified below.

[Chemical Formula 19]

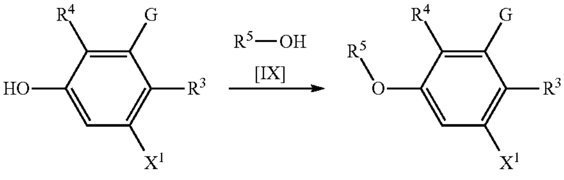

[XVIII] [XIX]

(In the formula, G, $R^3$, $R^4$, $R^5$, and $X^1$ are as defined above.)

That is, the compound of formula [XIX] can be produced by reacting a compound [XVIII] and a compound [IX] in an appropriate solvent, in the presence of a trisubstituted phosphine and an azodicarboxylic acid derivative, or in the presence of phosphorane.

The trisubstituted phosphine, azodicarboxylic acid derivative, and phosphorane used in the current reaction, the solvent that can be used in the reaction, the reaction temperature, and the reaction time are the same as those in the production method 4.

After completion of the reaction, the compound [XIX] can be isolated by conducting an operation of pouring the reaction mixture into water and collecting the precipitated solid by filtration, or subjecting the reaction mixture to extraction with an organic solvent, followed by concentration. The isolated compound [XIX] also can be further purified by column chromatography, recrystallization, or the like as necessary.

<Production Method 6 of Intermediate>

A compound of formula [XXI] can be produced using a compound of formula [XX] according to a method based on the reaction scheme exemplified below.

[Chemical Formula 20]

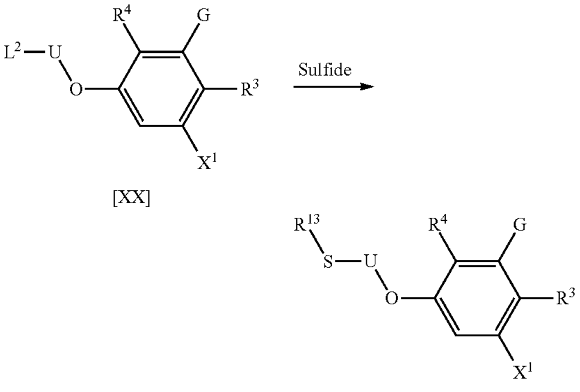

[XX] [XXI]

(In the formula, G, $L^2$, $R^3$, $R^4$, $R^{13}$, U, and $X^1$ are as defined above.)

That is, the compound of formula [XXI] can be produced by reacting a compound [XX] and a sulfide in an appropriate solvent, in the presence or absence of an appropriate base, in the presence or absence of an appropriate catalyst.

The sulfide and base used in the current reaction, the solvent that can be used in the reaction, the reaction temperature, and the reaction time are the same as those in the production method 5.

After completion of the reaction, the compound [XXI] can be isolated by conducting an operation of pouring the reaction mixture into water and collecting the precipitated solid by filtration, or subjecting the reaction mixture to extraction with an organic solvent, followed by concentration. The isolated compound [XXI] also can be further purified by column chromatography, recrystallization, or the like as necessary.

<Production Method 7 of Intermediate>

A compound of formula [XXIII] can be produced using a compound of formula [XXII] according to a method based on the reaction scheme exemplified below.

[Chemical Formula 21]

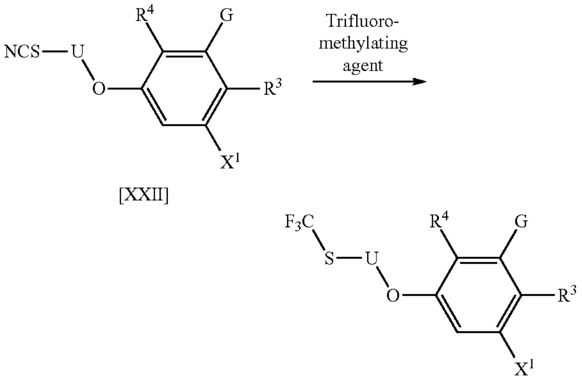

[XXII] [XXIII]

(In the formula, G, $R^3$, $R^4$, U, and $X^1$ are as defined above.)

That is, the compound of formula [XXIII] can be produced by reacting a compound [XXII] and a trifluoromethylating agent in an appropriate solvent in the presence of an appropriate catalyst.

The trifluoromethylating agent and catalyst used in the current reaction, the solvent that can be used in the reaction, the reaction temperature, and the reaction time are the same as those in the production method 6.

After completion of the reaction, the compound [XXIII] can be isolated by conducting an operation of pouring the reaction mixture into water and collecting the precipitated solid by filtration, or subjecting the reaction mixture to extraction with an organic solvent, followed by concentration. The isolated compound [XXIII] also can be further purified by column chromatography, recrystallization, or the like as necessary.

<Production Method 8 of Intermediate>

A compound of formula [XXVI] can be produced using a compound of formula [XVII] according to a method based on the reaction scheme exemplified below.

[Chemical Formula 22]

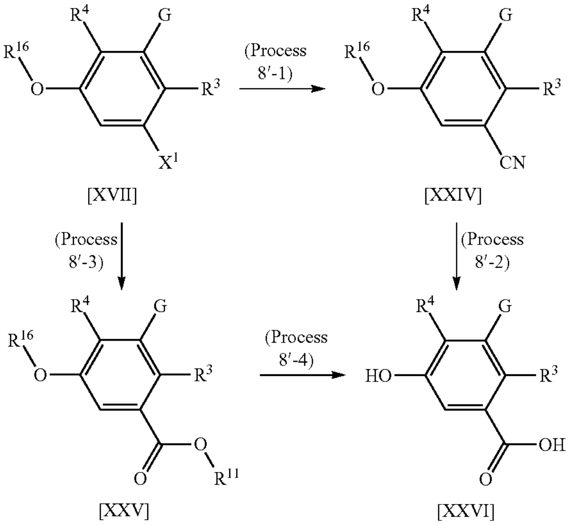

[XVII] [XXIV] [XXV] [XXVI]

(In the formula, G, $R^3$, $R^4$, $R^{11}$, $R^{16}$, and $X^1$ are as defined above.)

That is, the compound of formula [XXVI] can be produced by (Process 8'-1) converting a compound of formula [XVII] into a compound [XXIV] using a cyanide in an appropriate solvent in the presence or absence of an appropriate catalyst, and then (Process 8'-2) hydrolyzing the compound of formula [XXVI] in an appropriate solvent in the presence of an appropriate acid or base. In addition, the compound [XXVI] can be produced by (Process 8'-3) subjecting a compound of formula [XVII] to a carbon monoxide insertion reaction in an appropriate solvent in the presence of an appropriate catalyst, an appropriate base, and an appropriate alcohol to obtain a compound represented by [XXV] among the compounds of the present invention, and then (Process 8'-4) hydrolyzing the compound of formula [XXV] in an appropriate solvent in the presence of an appropriate acid or base.

The cyanide, catalyst, acid, base, and alcohol used in the current reaction, the solvent that can be used in the reaction, the reaction temperature, and the reaction time are the same as those in the production method 1.

After completion of the reaction, the compound [XXVI] can be isolated by conducting an operation of pouring the reaction mixture into water and collecting the precipitated solid by filtration, or subjecting the reaction mixture to extraction with an organic solvent, followed by concentration. The isolated compound [XXVI] also can be further purified by column chromatography, recrystallization, or the like as necessary.

<Production Method 9 of Intermediate>

A compound of formula [XXVIII] can be produced using a compound of formula [XXVII] according to a method based on the reaction scheme exemplified below.

[Chemical Formula 23]

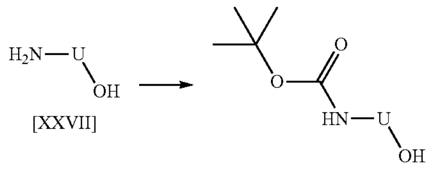

[XXVII] [XXVIII]

(In the formula, U is as defined above.)

That is, the compound of formula [XXVIII] can be produced by reacting a compound [XXVII] with an appropriate acid anhydride, in an appropriate solvent, in the presence of an appropriate base, under conditions used for protection of an amino group by a tert-butoxycarbonyl group, for example, according to the method described in GREEN'S PROTECTIVE GROUPS in Organic Synthesis; the 5th edition (John Wiley and Sons, 2014, Peter G. M. Wuts).

<Production Method 10 of Intermediate>

A compound of formula [XXX] can be produced using a compound of formula [XXIX] according to a method based on the reaction scheme exemplified below.

[Chemical Formula 24]

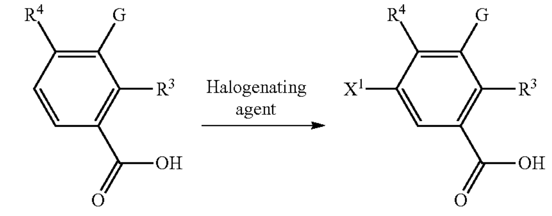

[XXIX] [XXX]

(In the formula, G, $R^3$, $R^4$, and $X^1$ are as defined above.)

That is, the compound of formula [XXX] can be produced by reacting a compound [XXIX] with a halogenating agent in an appropriate solvent.

The halogenating agent used in the current reaction, the solvent that can be used in the reaction, the reaction temperature, and the reaction time are the same as those in the production method 2 of intermediate.

After completion of the reaction, the compound [XXX] can be isolated by conducting an operation of pouring the reaction mixture into water and collecting the precipitated solid by filtration, or subjecting the reaction mixture to extraction with an organic solvent, followed by concentration. The isolated compound [XXX] also can be further purified by column chromatography, recrystallization, or the like as necessary.

<Production Method 11 of Intermediate>

A compound of formula [XXXII] can be produced using a compound of formula [XXX] according to a method based on the reaction scheme exemplified below.

[Chemical Formula 25]

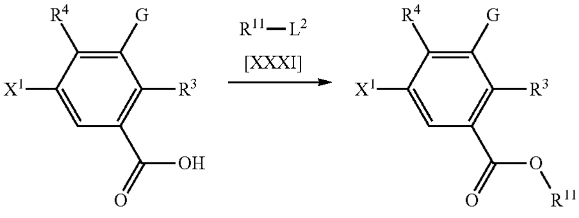

[XXX] [XXXII]

(In the formula, G, $L^2$, $R^3$, $R^4$, $R^{11}$, and $X^1$ are as defined above.)

That is, the compound of formula [XXXII] can be produced by reacting a compound [XXX] and a compound [XXXI] in an appropriate solvent, in the presence of an appropriate base, in the presence or absence of an appropriate catalyst.

The base and catalyst used in the current reaction, the solvent that can be used in the reaction, the reaction temperature, and the reaction time are the same as those in the production method 3.

After completion of the reaction, the compound [XXXII] can be isolated by conducting an operation of pouring the reaction mixture into water and collecting the precipitated solid by filtration, or subjecting the reaction mixture to extraction with an organic solvent, followed by concentration. The isolated compound [XXXII] also can be further purified by column chromatography, recrystallization, or the like as necessary.

<Production Method 12 of Intermediate>

A compound of formula [XXXIV] can be produced using a compound of formula [XXXII] according to a method based on the reaction scheme exemplified below.

[Chemical Formula 26]

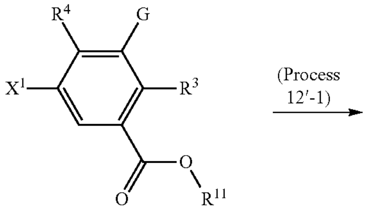

[XXXII]

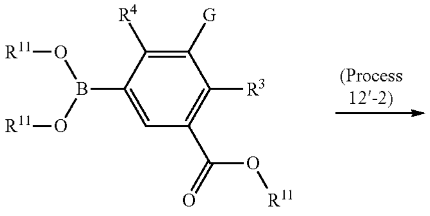

[XXXIII]

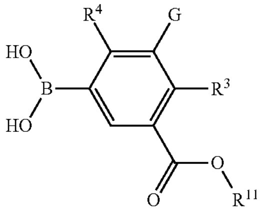

[XXXIV]

(In the formula, G, $R^3$, $R^4$, $R^{11}$, and $X^1$ are as defined above.)

That is, the compound of formula [XXXIV] can be produced by (Process 12'-1) reacting a compound [XXXII] with an appropriate organometallic compound in an appropriate solvent, then reacting the resultant with an borate ester to obtain a compound [XXXIII], and (Process 12'-2) reacting the compound [XXXIII] with an acid in an appropriate solvent.

(Process 12'-1)

Examples of the organometallic compound that can be used in the current reaction include isopropylmagnesium chloride. The amount of use of the organometallic compound may be appropriately selected from the range of 1.0 to 3.0 mol, and is preferably 1.0 to 1.2 mol per 1 mol of the compound [XXXII].

Examples of the borate ester that can be used in the current reaction include trimethyl borate, triethyl borate, triisopropyl borate, and tributyl borate. The amount of use of the borate ester may be appropriately selected from the range of 1.0 to 3.0 mol, and is preferably 1.0 to 1.2 mol per 1 mol of the compound [XXXII].

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; aliphatic hydrocarbons such as pentane, hexane, cyclohexane, and heptane; pyridines such as pyridine and picoline; and a mixed solvent thereof. The amount of use of the solvent is 0.1 to 100 liters, and is preferably 0.1 to 5 liters per 1 mol of the compound [XXXII].

The reaction temperature of the current reaction may be selected from an arbitrary range usually from −100° C. to the reflux temperature in the reaction system, and is preferably in the range of −80° C. to room temperature.

The reaction time of the current reaction varies depending on the reaction temperature, the reaction substrate, the reaction amount, and the like, but is usually 5 minutes to 24 hours.

After completion of the reaction, the compound [XXXIII] can be used as it is for the next reaction without isolation.

(Process 12'-2)

Examples of the acid that can be used in the current reaction include mineral acids such as sulfuric acid and hydrochloric acid. The amount of use of the acid may be appropriately selected from the range of 1.0 to 5.0 mol, and is preferably 0.5 to 2.0 mol per 1 mol of the compound [XXXIII].

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; halogenated hydrocarbons such as dichloromethane, chloroform, and 1,2-dichloroethane; alcohols such as methanol, ethanol, and 2-propanol; aliphatic hydrocarbons such as pentane, hexane, cyclohexane, and heptane; ketones such as acetone, methyl ethyl ketone, and cyclohexanone; water, and a mixed solvent thereof. The amount of use of the solvent is 0.1 to 100 liters, and is preferably 0.1 to 5 liters per 1 mol of the compound [XXXIII].

The reaction temperature of the current reaction may be usually selected from an arbitrary range from 0° C. to the reflux temperature in the reaction system, and is preferably in the range of 0° C. to 100° C.

The reaction time of the current reaction varies depending on the reaction temperature, the reaction substrate, the reaction amount, and the like, but is usually 10 minutes to 24 hours.

After completion of the reaction, the compound [XXXIV] can be isolated by conducting an operation of pouring the reaction mixture into water and collecting the precipitated solid by filtration, or subjecting the reaction mixture to extraction with an organic solvent, followed by concentration. The isolated compound [XXXIV] also can be further purified by column chromatography, recrystallization, or the like as necessary.

<Production Method 13 of Intermediate>

A compound of formula [XXXVI] can be produced using a compound of formula [XXXV] according to a method based on the reaction scheme exemplified below.

[Chemical Formula 27]

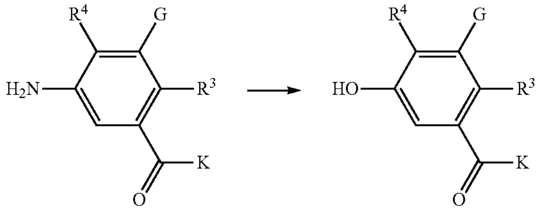

[XXXV] [XXXVI]

(In the formula, G, $R^3$, $R^4$, and K are as defined above.)

That is, the compound of formula [XXXVI] can be produced by reacting a compound [XXXV] with an acid and a nitrous acid derivative in an appropriate solvent, and then reacting the resultant with a metal salt as necessary.

Examples of the acid that can be used in the current reaction include mineral acids such as sulfuric acid and nitric acid, and organic acids such as trifluoroacetic acid and trifluoromethanesulfonic acid. The amount of use of the acid may be appropriately selected from the range of 1 to 20 mol, and is preferably 1.0 to 5.0 mol per 1 mol of the compound [XXXV]. However, when an acid is used as a solvent, the amount of use as the solvent is appropriately selected.

Examples of the nitrous acid derivative that can be used in the current reaction include nitrites such as sodium nitrite and potassium nitrite, and alkyl nitrites such as n-butyl nitrite, isopentyl nitrite, and tert-butyl nitrite. The amount of use of the nitrous acid derivative may be appropriately selected from the range of 1 to 3 mol, and is preferably 1.0 to 1.5 mol per 1 mol of the compound [XXXV].

Examples of the metal salt used as necessary in the current reaction include copper sulfate, copper nitrate, and copper oxide. The amount of use of the metal salt may be appropriately selected from the range of 0 to 2 mol, and is preferably 0 to 1.1 mol per 1 mol of the compound [XXXV].

Examples of the solvent that can be used in the current reaction include ethers such as diethyl ether, cyclopentyl methyl ether, tetrahydrofuran, 2-methyltetrahydrofuran, and 1,4-dioxane; aromatic hydrocarbons such as benzene, toluene, xylene, and chlorobenzene; aprotic polar solvents such as N,N-dimethylformamide, N,N-dimethylacetamide, N-methyl-2-pyrrolidone, dimethyl sulfoxide, sulfolane, and 1,3-dimethyl-2-imidazolidinone; halogenated hydrocarbons such as dichloromethane, chloroform, and 1,2-dichloroethane; alcohols such as methanol, ethanol, and 2-propanol; nitriles such as acetonitrile and propionitrile; esters such as ethyl acetate, butyl acetate, and ethyl propionate; aliphatic hydrocarbons such as pentane, hexane, cyclohexane, and heptane; pyridines such as pyridine and picoline; mineral acids such as acetic acid, hydrochloric acid, sulfuric acid, and nitric acid; organic acids such as trifluoroacetic acid and trifluoromethanesulfonic acid; water, and a mixed solvent thereof. The amount of use of the solvent is 0.1 to 100 liters, and is preferably 0.3 to 10 liters per 1 mol of the compound [XXXV].

The reaction temperature of the current reaction may be selected from an arbitrary range usually from −30° C. to the reflux temperature in the reaction system, and is preferably in the range of 0° C. to 150° C.

The reaction time of the current reaction varies depending on the reaction temperature, the reaction substrate, the reaction amount, and the like, but is usually 10 minutes to 24 hours.

After completion of the reaction, the compound [XXXVI] can be isolated by conducting an operation of pouring the reaction mixture into water or the like and collecting the precipitated solid by filtration, or subjecting the reaction mixture to extraction with an organic solvent, followed by concentration. The isolated compound [XXXVI] also can be further purified by column chromatography, recrystallization, or the like as necessary. Alternatively, the compound [XXXVI] can be directly used for the next reaction without isolation.

<Production Method 14 of Intermediate>

A compound of formula [XXXVIII] can be produced using a compound of formula [XXXVII] according to a method based on the reaction scheme exemplified below.

[Chemical Formula 28]

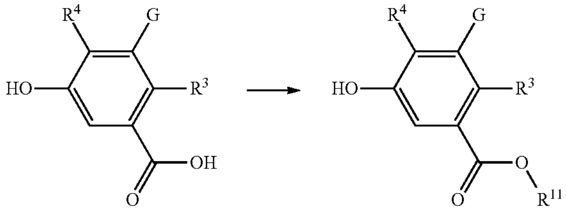

[XXXVII] [XXXVIII]

(In the formula, G, $R^3$, $R^4$, and $R^{11}$ are as defined above.)

That is, the compound of formula [XXXVIII] can be produced from a compound [XXXVII] under conditions used for esterification of a carboxy group, for example, according to the method described in GREEN'S PROTECTIVE GROUPS in Organic Synthesis; the 5th edition (John Wiley and Sons, 2014, Peter G. M. Wuts).

The hydroxybenzamide derivative of formula [II] of the present invention is a compound useful as an intermediate in the production of the 3-alkoxybenzamide derivative of formula [I] or agriculturally acceptable salt thereof according to the present invention.

The alkoxybenzoic acid derivative of formula [III] of the present invention or an ester thereof is a compound useful as an intermediate in the production of the 3-alkoxybenzamide derivative of formula [I] or agriculturally acceptable salt thereof according to the present invention.

The agrochemical composition of the present invention contains the 3-alkoxybenzamide derivative of formula [I] or agriculturally acceptable salt thereof according to the present invention as an active ingredient.

The agrochemical composition of the present invention can contain an additive component (carrier) usually used in agrochemical formulations as necessary.

The pest control agent of the present invention contains the 3-alkoxybenzamide derivative of formula [I] or agriculturally acceptable salt thereof according to the present invention as an active ingredient. The pest control agent of the present invention is typically an insecticide, an acaricide, and a nematicide.

The pest control agent of the present invention can contain an additive component (carrier) usually used in an agrochemical formulation as necessary.

Examples of the additive component include a carrier such as a solid carrier or a liquid carrier, a surfactant, a binder or a tackifier, a thickener, a colorant, a spreader, a sticker, an anti-freezing agent, an anti-caking agent, a disintegrant, and a degradation preventing agent. In addition, a preservative, a plant piece, or the like may be used as the additive component as necessary. These additive components may be used alone or in combination of two or more types thereof.

Examples of the solid carrier include mineral carriers such as pyrophyllite clay, kaolin clay, silica clay, talc, diatomaceous earth, zeolite, bentonite, acid clay, activated clay, attapulgus clay, vermiculite, perlite, pumice, white carbon (synthetic silicic acid, synthetic silicate, and the like), and titanium dioxide; plant carriers such as wood powder, cornstalks, walnut shells, fruit cores, chaff, sawdust, bran, soybean flour, powdered cellulose, starch, dextrin, and saccharides; inorganic salt carriers such as calcium carbonate, ammonium sulfate, sodium sulfate, or potassium chloride; polymer carriers such as polyethylene, polypropylene, polyvinyl chloride, polyvinyl acetate, an ethylene-vinyl acetate copolymer, and a urea-aldehyde resin.

Examples of the liquid carrier include monohydric alcohols such as methanol, ethanol, propanol, 2-propanol, butanol, and cyclohexanol; polyhydric alcohols such as ethylene glycol, diethylene glycol, propylene glycol, hexylene glycol, polyethylene glycol, polypropylene glycol, and glycerin; polyhydric alcohol derivatives such as propylene-based glycol ether; ketones such as acetone, methyl ethyl ketone, methyl isobutyl ketone, diisobutyl ketone, cyclohexanone, and isophorone; ethers such as ethyl ether, 1,4-dioxane, cellosolve, dipropyl ether, and tetrahydrofuran; aliphatic hydrocarbons such as normal paraffin, naphthene, isoparaffin, kerosene, and mineral oil; aromatic hydrocarbons such as toluene, $C_9$-$C_{10}$ alkylbenzene, xylene, solvent naphtha, alkylnaphthalene, and high-boiling-point aromatic hydrocarbon; halogenated hydrocarbons such as 1,2-dichloroethane, chloroform, and carbon tetrachloride; esters such as ethyl acetate, diisopropyl phthalate, dibutyl phthalate, dioctyl phthalate, and dimethyl adipate; lactones such as γ-butyrolactone; amides such as N,N-dimethylformamide, N,N-diethylformamide, N,N-dimethylacetamide, and N-methyl pyrrolidone; nitriles such as acetonitrile; sulfur compounds such as dimethyl sulfoxide; vegetable oils such as soybean oil, rapeseed oil, cottonseed oil, coconut oil, and castor oil; lower alkyl esters of fatty acids derived from the vegetable oils; and water.

Examples of the surfactant include nonionic surfactants such as sorbitan fatty acid ester, polyoxyethylene sorbitan fatty acid ester, sucrose fatty acid ester, polyoxyethylene fatty acid ester, polyoxyethylene resin acid ester, polyoxyethylene fatty acid diester, polyoxyethylene alkyl ether, polyoxyethylene alkylphenyl ether, polyoxyethylene dialkyl phenyl ether, polyoxyethylene alkyl phenyl ether formalin condensate, polyoxyethylene polyoxypropylene block polymer, alkyl polyoxyethylene polypropylene block polymer ether, polyoxyethylene alkylamine, polyoxyethylene fatty acid amide, polyoxyethylene fatty acid bisphenyl ether, polyalkylene benzylphenyl ether, polyoxyalkylene styrylphenyl ether, acetylene diol, polyoxyalkylene-added acetylene diol, polyoxyethylene ether-type silicone, ester-type silicone, fluorine-based surfactant, polyoxyethylene castor oil, and polyoxyethylene hydrogenated castor oil; anionic surfactants such as alkyl sulfates, polyoxyethylene alkyl ether sulfates, polyoxyethylene alkyl phenyl ether sulfates, polyoxyethylene styryl phenyl ether sulfates, alkylbenzene sulfonates, lignin sulfonates, alkyl sulfosuccinates, naphthalene sulfonates, alkyl naphthalene sulfonates, salts of formalin condensates of naphthalene sulfonates, salts of formalin condensates of alkyl naphthalene sulfonates, fatty acid salts, polycarboxylates, N-methyl-fatty acid sarcosinates, resin acid salts, polyoxyethylene alkyl ether phosphates, and polyoxyethylene alkyl phenyl ether phosphates; cationic surfactants including alkylamine salts such as laurylamine hydrochloride, stearylamine hydrochloride, oleylamine hydrochloride, stearylamine acetate, stearylaminopropylamine acetate, alkyltrimethylammonium chloride, and alkyldimethylbenzalkonium chloride; and amphoteric surfactants including betaine-type surfactants such as dialkyldiaminoethylbetaine and alkyldimethylbenzylbetaine, and amino acid-type surfactants such as dialkylaminoethylglycine and alkyldimethylbenzylglycine.

Examples of the binder and the tackifier include carboxymethyl cellulose and salts thereof, dextrin, water-soluble starch, xanthan gum, guar gum, sucrose, polyvinyl pyrrolidone, gum arabic, polyvinyl alcohol, polyvinyl acetate, sodium polyacrylate, polyethylene glycol, polyethylene oxide, and natural phospholipid (for example, cephalin acid, and lecithin).

Examples of the thickener include water-soluble polymers such as xanthan gum, guar gum, carboxymethyl cellulose, polyvinylpyrrolidone, carboxyvinyl polymers, acrylic polymers, starch derivatives, and polysaccharides; inorganic fine powders such as high-purity bentonite and white carbon; and organic fine powders such as organic bentonite.

Examples of the colorant include inorganic pigments such as iron oxide, titanium oxide, and Prussian blue; and organic dyes such as an alizarin dye, an azo dye, and a metal phthalocyanine dye.

Examples of the spreader include a silicone-based surfactant, cellulose powder, dextrin, processed starch, a polyaminocarboxylic acid chelate compound, crosslinked polyvinyl pyrrolidone, a maleic acid/styrene copolymer, a methacrylic acid copolymer, a half ester of a polymer of a polyhydric alcohol and a dicarboxylic anhydride, a water-soluble salt of polystyrene sulfonic acid, polyoxyethylene alkanediols, polyoxyethylene alkyne diols, and alkyne diols.

Examples of the sticker include various surfactants such as sodium dialkyl sulfosuccinate, polyoxyethylene alkyl ether, polyoxyethylene alkyl phenyl ether, and polyoxyethylene fatty acid ester; paraffin, terpene, polyamide resin, polyacrylate, polyoxyethylene, wax, polyvinyl alkyl ether, alkylphenol formalin condensate, and synthetic resin emulsion.

Examples of the anti-freezing agent include polyhydric alcohols such as ethylene glycol, diethylene glycol, propylene glycol, and glycerin.

Examples of the anti-caking agent include polysaccharides such as starch, alginic acid, mannose, and galactose; polyvinylpyrrolidone, white carbon, ester gum, and petroleum resin.

Examples of the disintegrant include sodium tripolyphosphate, sodium hexametaphosphate, metal stearate, cellulose powder, dextrin, a copolymer of methacrylic acid ester, polyvinylpyrrolidone, a polyaminocarboxylic acid chelate compound, a sulfonated styrene-isobutylene-maleic anhydride copolymer, and a starch-polyacrylonitrile graft copolymer.

Examples of the degradation preventing agent include desiccants such as zeolite, quicklime, and magnesium oxide; antioxidants such as phenol-based, amine-based, sulfur-based, and phosphoric acid-based antioxidants; and ultraviolet absorbers such as salicylic acid-based and benzophenone-based ultraviolet absorbers.

Examples of the preservative include potassium sorbate and 1,2-benzothiazolin-3-one.

Examples of the plant piece include sawdust, coconut shell, corn cob, and tobacco stalk.

On the other hand, when the above-described additive component is contained in the pest control agent of the present invention, the content thereof is usually selected in the range of 5 to 95%, preferably 20 to 90% in the case of a carrier such as a solid carrier or a liquid carrier, usually selected in the range of 0.1% to 30%, preferably 0.5 to 10% in the case of a surfactant, and selected in the range of 0.1 to 30%, preferably 0.5 to 10% in the case of other additives, on a mass basis.

The pest control agent of the present invention is used by being formulated in any formulation such as a powder, a powder granule, a granule, a wettable powder, a water-soluble agent, a water-dispersible granule, a tablet, a jumbo agent, an emulsifiable concentrate, an oil, a liquid, a flowable agent, an emulsion, a microemulsion, a suspoemulsion, a trace spray agent, a microcapsule, a smoking agent, an aerosol agent, a bait agent, or a paste agent.

In actual use of these formulations, they can be used as they are or diluted to a predetermined concentration with a diluent such as water. The application of various formulations containing the compound of the present invention or dilutions thereof can be carried out by an application method that is usually carried out. In other words, the application can be carried out by dispersion (for example, spraying, misting, atomizing, dusting powder, dusting granules, water surface application, and box application), soil application (for example, mixing and irrigation), surface application (for example, application, and powder coating, and coating), seed treatment (for example, smearing, powder coating treatment, and the like), immersion, poison bait, smoking application, and the like. In addition, it is also possible to control the generation and growth of harmful bugs, particularly harmful insects in excrement of domestic animals by feeding the animals with the active ingredient mixed.

The method for controlling a pest of the present invention can be carried out by using the 3-alkoxybenzamide derivative of formula [I] or agriculturally acceptable salt thereof according to the present invention in an amount of an active ingredient by the application method described above.

The blending ratio (mass %) of the active ingredient in the pest control agent of the present invention is appropriately selected as necessary. For example, the blending ratio may be appropriately selected from the range of 0.01 to 20%, preferably 0.05 to 10% in the case of a powder, a powder granule, a fine powder, or the like. The blending ratio may be appropriately selected from the range of 0.1 to 30%, preferably 0.5 to 20% in the case of a granule, or the like. The blending ratio may be appropriately selected from the range of 1 to 70%, preferably 5 to 50% in the case of a wettable powder, a water-dispersible granule, or the like. The blending ratio may be appropriately selected from the range of 1 to 95%, preferably 10 to 80% in the case of a water-soluble agent, a liquid, or the like. The blending ratio may be appropriately selected from the range of 5 to 90%, preferably 10 to 80% in the case of an emulsifiable concentrate, or the like. The blending ratio may be appropriately selected from the range of 1 to 50%, preferably 5 to 30% in the case of an oil, or the like. The blending ratio may be appropriately selected from the range of 5 to 60%, preferably 10 to 50% in the case of a flowable agent, or the like. The blending ratio may be appropriately selected from the range of 5 to 70%, preferably 10 to 60% in the case of an emulsion, a microemulsion, a suspoemulsion, or the like. The blending ratio may be appropriately selected from the range of 1 to 80%, preferably 5 to 50% in the case of a tablet, a bait agent, a paste agent, or the like. The blending ratio may be appropriately selected from the range of 0.1 to 50%, preferably 1 to 30% in the case of a smoking agent or the like. The blending ratio may be appropriately selected from the range of 0.05 to 20%, preferably 0.1 to 10% in the case of an aerosol agent or the like.

These formulations are diluted to an appropriate concentration and dispersed, or directly applied.

When the pest control agent of the present invention is used by being diluted with a diluent, the application is generally performed at an active ingredient concentration of 0.1 to 5,000 ppm. When the formulation is used as it is, the amount of application per unit area is 0.1 to 5,000 g per 1 ha as the active ingredient compound, but the amount of application is not limited thereto.

Although it is needless to say that the pest control agent of the present invention is sufficiently effective even when the compound of the present invention is used alone as an active ingredient, the pest control agent can be mixed with or used in combination with other fertilizers and pesticides, for example, insecticides, acaricides, nematicides, synergists, fungicides, antiviral agents, attractants, herbicides, and plant growth regulators as necessary, and in this case, a more excellent effect may be exhibited.

Next, known insecticides (insecticidal active ingredients), acaricides (acaricidal active ingredients), nematicides (nematicidal active ingredients), and synergist compounds (synergistic active ingredients) which may be mixed or used in combination are exemplified below.

Insecticidal active ingredients, acaricidal active ingredients, nematicidal active ingredients, synergistic active ingredients:

acrinathrin, azadirachtin, azamethiphos, acynonapyr, azinphos-ethyl, azinphos-methyl, acequinocyl, acetamiprid, acetoprole, acephate, azocyclotin, abamectin, afidopyropen, afoxolaner, amidoflumet, amitraz, alanycarb, aldicarb, aldoxycarb, allethrin [including a d-cis-trans-form and a d-trans-form], isazophos, isamidofos, isocarbophos, isoxathion, isocycloseram, isofenphos-methyl, isoprocarb, epsilon-metofluthrin, epsilon-momfluorothrin, ivermectin, imicyafos, imidacloprid, imiprothrin, indoxacarb, esfenvalerate, ethiofencarb, ethion, ethiprole, ethylene dibromide, etoxazole, etofenprox, ethoprophos, etrimfos, emamectin, emamectin benzoate, endosulfan, empenthrin, oxazosulfyl, oxamyl, oxydemeton-methyl, oxydeprofos, omethoate, Nuclear polyhedrosis virus, cadusafos, kappa-tefluthrin, kappa-bifenthrin, karanjin, cartap, Granulosis virus, carbaryl, carbosulfan, carbofuran, gamma-BHC, xylylcarb, quinalphos, kinoprene, chinomethionat, Entero virus, coumaphos, cryolite, clothianidin, clofentezine, chromafenozide, chlorantraniliprole, chlorethoxyfos, chlordane, chloropicrin, chlorpyrifos, chlorpyrifos-methyl, chlorfenapyr, chlorfenvinphos, chlorfluazuron, chlormephos, chloroprallethrin, Entomopoxi virus, Irido virus, cyazypyr, cyanophos, diafenthiuron, diamidafos, cyantraniliprole, cyetpyrafen, dienochlor, cyenopyrafen, dioxabenzofos, diofenolan, Sigma virus, cyclaniliprole, cycloxaprid, dicrotophos, dichlofenthion, cyclobutrifluram, cycloprothrin, dichlorvos, dicloromezotiaz, dicofol, dicyclanil, disulfoton, dinotefuran, dinobuton, cyhalodiamide, cyhalothrin [including a gamma-form and a lambda-form], cyphenothrin [including a 1R-trans-form], cyfluthrin [including a beta-form], diflubenzuron, cyflumetofen, diflovidazin, cyproflanilide, cyhexatin, cypermethrin [including an alpha-form, a beta-form, a theta-form, and a zeta-form], dimpropyridaz, dimethyl-2,2,2-trichloro-1-hydroxyethylphosphonate (DEP), dimethylvinphos, dimethoate, dimefluthrin, jasmone, cis-jasmone, jasmonic acid, methyl jasmonate, silafluofen, cyromazine, Steinernema carpocapsae, Steinernema kushidai, Steinernema glaseri, spinetoram, spinosad, spirodiclofen, spirotetramat, spiropidion, spiromesifen, sulcofuron-sodium, sulfluramid, sulfoxaflor, sulfotep, diazinon, thiacloprid, thiamethoxam, tioxazafen, thiodicarb, thiocyclam, thiosultap, thionazin, thiofanox, thiometon, tyclopyrazoflor, tetrachlorantraniliprole, tetrachlorvinphos, tetradifon, tetraniliprole, tetramethylfluthrin, tetramethrin, tebupirimfos, tebufenozide, tebufenpyrad, tefluthrin, teflubenzuron, demeton-S-methyl, temephos, deltamethrin, terbufos, tralomethrin, transfluthrin, triazamate, triazophos, trichlorfon, *Trichoderma asperellum, Trichoderma paecilomyces, Trichoderma harzianum*, triflumuron, triflumezopyrim, trimethacarb, tolfenpyrad, naled, nicotine, nicofluprole, nitenpyram, nemadectin, Denso virus, novaluron, noviflumuron,

*Paecilomyces lilacinus, Barkholderia cepacia, Barkholderia rinojensis, Verticillium lecanii*, hydroprene, *Pasteuria nishizawae, Pasteuria penetrans, Bacillus amyloliquefaciens, Bacillus firmus, Bacillus sphaericus, Bacillus subtillis, Bacillus thuringiensis*, insect toxin produced by *Bacillus thuringiensis, Bacillus thuringiensis* subsp. *Aizawai, Bacillus thuringiensis* subsp. *Israelensis, Bacillus thuringiensis* subsp. *Kurstaki, Bacillus thuringiensis* subsp. *Tenebrionis, Bacillus popilliae, Bacillus licheniformis*, vamidothion, parathion, parathion-methyl, halfenprox, halofenozide, bioallethrin, bioallethrin S-cyclopentenyl, bioresmethrin, bis-(2-chloro-1-methyl)ethylether (DCIP), bistrifluron, hydramethylnon, bifenazate, bifenthrin, pyflubumide, piperonyl butoxide, pymetrozine, pyraclofos, pyrafluprole, pyridaphenthion, pyridaben, pyridalyl, pyrifluquinazon, pyriprole, pyriproxyfen, pirimicarb, pyrimidifen, pyriminostrobin, pirimiphos-methyl, pyrethrin, famphur, fipronil, fenazaquin, fenamiphos, fenitrothion, fenoxycarb, fenothiocarb, phenothrin [including a 1R-trans-form], fenobucarb, fenthion, phenthoate, fenvalerate, fenpyroximate, fenbutatin oxide, fenpropathrin, fonofos, sulfuryl fluoride, butocarboxim, butoxycarboxim, buprofezin, furathiocarb, prallethrin, fluacrypyrim, fluazaindolizine, fluazuron, fluensulfone, fluopyram, sodium fluoroacetate, fluxametamide, flucycloxuron, flucythrinate, flusulfamide, fluthrin, fluvalinate [including a tau-form], flupyradifurone, flupyrazofos, flupyrimin, flufiprole, flufenerim, flufenoxystrobin, flufenoxuron, fluhexafon, flubendiamide, flupentiofenox, flumethrin, fluralaner, flurimfen, prothiofos, protrifenbute, flonicamid, propaphos, propargite, prohydrojasmon, profenofos, broflanilide, profluthrin, propetamphos, propoxur, flometoquin, bromopropylate, hexythiazox, hexaflumuron, *Pacilimyces tenuipes, Paecilomyces fumosoroceus, Paecilomyces lilacinus*, heptafluthrin, heptenophos, permethrin, benclothiaz, benzpyrimoxan, bensultap, benzoximate, bendiocarb, benfuracarb, *Pochonia chlamydoporia, Beauveria tenella, Beauveria bassiana, Beauveria brongniartii*, phoxim, phosalone, fosthiazate, fosthietan, phosphamidon, phosmet, polynactins, formetanate, phorate, machine oil, malathion, milbemectin, mecarbam, mesulfenfos, methomyl, metaldehyde, metaflumizone, methamidophos, metham, methiocarb, methidathion, methyl isothiocyanate, methyl bromide, methoxychlor, methoxyfenozide, methothrin, metofluthrin, methoprene, metolcarb, mevinphos, meperfluthrin, *Monacrosporium phymatophagum, Monacrosporium phymatophagum*, monocrotophos, momfluorothrin, *Trichoderma harzianum*, litlure-A, litlure-B, aluminium phosphide, zinc phosphide, phosphine, lufenuron, rescalure, resmethrin, lepimectin, rotenone, occlusion body of Cytoplasmic polyhedrosis virus, fenbutatin oxide, calcium cyanide, organotins, nicotine-sulfate, (Z)-11-tetradecenyl=acetate, (Z)-11-hexadecenyl, (Z)-11-hexadecenyl=acetate, (Z)-9,12-tetradecadienyl=acetate, (Z)-9-tetradecene-1-ol, (Z,E)-9,11-tetradecadienyl=acetate, (Z,E)-9,12-tetradecadienyl=acetate, 1,1,1-trichloro-2,2-bis(4-chlorophenyl)ethane (DDT), 1,3-dichloropropene, 2,4-dichloro-5-{2-[4-(trifluoromethyl)phenyl]ethoxy}phenyl-2,2,2-trifluoroethyl sulfoxide (Chemical Name, CAS Registry Number: 1472052-11-1), 2,4-dimethyl-5-[6-(trifluoromethylthio)hexyloxy]phenyl-2,2,2-trifluoroethyl sulfoxide (Chemical Name, CAS Registry Number: 1472050-34-2), 2-{2-fluoro-4-methyl-5-[(2,2,2-trifluoroethyl)sulfinyl]phenoxy}-5-(trifluoromethyl)pyridine (Chemical Name, CAS Registry Number: 1448758-62-0), 3-chloro-2-{2-fluoro-4-methyl-5-[(2,2,2-trifluoroethyl)sulfinyl]phenoxy}-5-(trifluoromethyl)pyridine (Chemical Name, CAS Registry Number: 1448761-28-1), 4,6-dinitro-o-cresol (DNOC), 4-fluoro-2-methyl-5-(5,5-dimethylhexyloxy)phenyl-2,2,2-trifluoroethyl sulfoxide (Chemical Name, CAS Registry Number: 1472047-71-4), Bt protein (Cry1Ab, Cry1Ac, Cry1Fa, Cry2Ab, mCry3 A, Cry3Ab, Cry3Bb, Cry34/35Ab1), methyl eugenol, 4-(p-acetoxyphenyl)-2-butanone, (Z)-10-tetradecenyl=acetate, (E,Z)-4,10-tetradecadienyl=acetate, (Z)-8-dodecenyl=acetate, (Z)-11-tetradecenyl=acetate, (Z)-13-icosene-10-one, 14-methyl-1-octadecene, AKD-1193 (code number), BCS-AA10147 (code number), CL900167 (code number), NA-85 (code number), NI-30 (code number), O—O-diethyl-O—[4-(dimethylsulfamoyl)phenyl]-phosphorothionate (DSP), O-ethyl-O—4-(nitrophenyl)phenylphosphonothioate (EPN), RU15525 (code number), XMC, Z-13-icosene-10-one, ZXI8901 (code number), and F4260 (code number).

Next, known fungicides (fungicidal active ingredients) or disease control agent compounds which may be mixed or used in combination are exemplified below.

Fungicidal active ingredients or disease control agent compounds:

*Agrobacterim radiobacter*, azaconazole, acibenzolar-S-methyl, azoxystrobin, anilazine, amisulbrom, aminopyrifen, ametoctradin, aldimorph, isotianil, isopyrazam, isofetamid, isoflucypram, isoprothiolane, ipconazole, ipflufenoquin, ipfentrifluconazole, iprodione, iprovalicarb, iprobenfos, imazalil, iminoctadine-albesilate, iminoctadine-triacetate, imibenconazole, inpyrfluxam, imprimatin A, imprimatin B, edifenphos, etaconazole, ethaboxam, ethirimol, ethoxyquin, etridiazole, enestroburin, enoxastrobin, epoxiconazole, organic oils, oxadixyl, oxazinylazole, oxathiapiprolin, oxycarboxin, oxine-copper, oxytetracycline, oxpoconazole-fumarate, oxolinic acid, copper dioctanoate, octhilinone, ofurace, orysastrobin, o-phenylphenol, kasugamycin, captafol, carpropamid, carbendazim, carboxin, carvone, *Candida oleophila, Candida saitoana*, quinoxyfen, quinofumelin, chinomethionat, captan, quinconazole, quintozene, guazatine, cufraneb, coumethoxystrobin, coumoxystrobin, *Gliocradium catenulatum, Cryptococcus albidus*, kresoxim-methyl, clozylacon, *Clonostachys rosea*, chlozolinate, chloroinconazide, chlorothalonil, chloroneb, *Chaetomium cupreum, Coniothyrium minitans*, cyazofamid, diethofencarb, diclocymet, dichlofluanid, dichlobentiazox, diclomezine, dicloran, dichlorophen, dithianon, diniconazole, diniconazole-M, zineb, dinocap, dipymetitrone, diphenylamine, difenoconazole, cyflufenamid, diflumetorim, cyproconazole, cyprodinil, simeconazole, dimethirimol, dimethyl disulfide, dimethomorph, cymoxanil, dimoxystrobin, *Pseudozyma flocculosa, Pseudomonas aureofaciens, Pseudomonas chlororaphis, Pseudomonas syringae, Pseudomonas flurorescens, Pseudomonas rhodesiae*, ziram, silthiofam, Zucchini yellow mosaic virus, streptomycin, *Streptomyces griseoviridis, Streptomyces lygicus*, spiroxamine, sedaxane, zoxamide, solatenol, dazomet, *Talaromyces flavus*, tiadinil, thiabendazole, thiram, thiophanate, thiophanate-methyl, thifluzamide, thiram, tecnazene, tecloftalam, tetraconazole, debacarb, tebuconazole, tebufloquin, terbinafine, dodine, dodemorph, triadimenol, triadimefon, triazoxide, trichlamide, triclopyricarb, *Trichoderma asperellum, Trichoderma atroviride, Trichoderma gamsii, Trichoderma stromaticum, Trichoderma paecilomyces, Trichoderma harzianum, Trichoderma viride, Trichoderma virens, Trichoderma polysporum, Trichoderma harzianum rifai, Trichoderma lignorum*, tricyclazole, triticonazole, tridemorph, triflumizole, trifloxystrobin, triforine, tolylfluanid, tolclofos-methyl, tolnifanide, tolprocarb, nabam, natamycin, naftifine, nitrapyrin, nitrothal-isopropyl, nuarimol, copper nonyl phenol sulfonate,

*Paenibacillus polymyxa, Barkholderia cepacia, Bacillus amyloliquefaciens, Bacillus simplex, Bacillus subtilis, Bacillus pumilus, Bacillus licheniformis*, harpin protein, *Variovorax paradoxus*, validamycin, valifenalate, *Pantoea agglomerans*, picarbutrazox, bixafen, picoxystrobin, *Pythium oligandrum*, pydiflumetofen, bitertanol, binapacryl, hinokitiol, *Erwinia carotovora, Rhizobium vitis*, biphenyl, piperalin, hymexazol, pyraoxystrobin, pyraclostrobin, pyraziflumid, pyrazophos, pyrapropoyne, pyrametostrobin, pyriofenone, pyrisoxazole, pyridachlometyl, pyrifenox, pyributicarb, pyribencarb, pyrimethanil, pyroquilon, vinclozolin, ferbam, famoxadone, phenazine oxide, fenamidone, fenaminstrobin, fenarimol, fenoxanil, ferimzone, fenpiclonil, fenpicoxamid, fenpyrazamine, fenbuconazole, fenfuram, fenpropidin, fenpropimorph, fenhexamid, folpet, phthalide, *Fusarium oxysporum*, bupirimate, fuberidazole, blasticidin-S, furametpyr, furalaxyl, furancarboxylic acid, fluazinam, fluindapyr, fluoxastrobin, fluoxapiprolin, fluopicolide, fluopimomide, fluopyram, fluoroimide, fluxapyroxad, fluquinconazole, furconazole, furconazole-cis, fludioxonil, flusilazole, flusulfamide, flutianil, flutolanil, flutriafol, flufenoxystrobin, flubeneteram, flumetover, flumorph, *Phlebiopsis gigantea*, proquinazid, prochloraz, procymidone, prothiocarb, prothioconazole, bronopol, propamocarb-hydrochloride, propiconazole, propineb, probenazole, bromuconazole, flometoquin, florylpicoxamid, hexaconazole, benalaxyl, benalaxyl-M, benodanil, benomyl, pefurazoate, penconazole, pencycuron, benzovindiflupyr, benthiazole, benthiavalicarb-isopropyl, penthiopyrad, penflufen, boscalid, fosetyl (including a salt of aluminum, calcium, sodium, or the like), polyoxin, polycarbamate, Bordeaux mixture, mancopper, mancozeb, mandipropamid, mandestrobin, maneb, myclobutanil, mineral oils, mildiomycin, methasulfocarb, metam, metalaxyl, metalaxyl-M, metiram, metyltetraprole, metconazole, metominostrobin, metrafenone, mepanipyrim, mefentrifluconazole, meptyldinocap, mepronil, iodocarb, laminarin, phosphorous acid and salts, copper oxychloride, silver, copper (II) sulfate, cuprous oxide, copper hydroxide, potassium bicarbonate, sodium bicarbonate, sulfur, oxyquinoline sulfate, copper sulfate, (3,4-dichloroisothiazole-5-yl)methyl-4-(tert-butyl) benzoic acid ester (Chemical Name, CAS Registry Number: 1231214-23-5), BAF-045 (code number), BAG-010 (code number), UK-2 A (code number), dodecylbenzenesulfonic acid bisethylenediamine copper complex [II] (DBEDC), MIF-1002 (code number), NF-180 (code number), triphenyltin acetate (TPTA), triphenyltin chloride (TPTC), triphenyltin hydroxide (TPTH), and F9650 (code number).

Next, known herbicidal compounds, herbicidal active ingredients, or plant growth regulator compounds which may be mixed or used in combination are exemplified below, but are not limited to these examples.

Herbicidal compounds or herbicidal active ingredients:

ioxynil (including lithium salt, sodium salt, a salt with octanoic acid or the like), aclonifen, acrolein, azafenidin, acifluorfen (including a salt with sodium or the like), azimsulfuron, asulam, acetochlor, atrazine, anilofos, amicarbazone, amidosulfuron, amitrole, aminocyclopyrachlor, aminopyralid, amiprofos-methyl, ametryn, Araujia Mosaic Virus, alachlor, *Alternaria destruens*, alloxydim (including a salt with sodium or the like), ancymidol, isouron, isoxachlortole, isoxaflutole, isoxaben, isodecylalcohol ethoxylate, isoproturon, ipfencarbazone, imazaquin, imazapic (including a salt with amine or the like), imazapyr (including a salt of isopropylamine or the like), imazamethabenz, imazamethabenz-methyl, imazamox, imazethapyr, imazosulfuron, indaziflam, indanofan, eglinazine-ethyl, esprocarb, ethametsulfuron-methyl, ethalfluralin, ethidimuron, ethoxysulfuron, ethoxyfen, ethoxyfen-ethyl, ethofumesate, etobenzanid, epyrifenacil, endothal-disodium, oxadiazon, oxadiargyl, oxaziclomefone, oxasulfuron, oxyfluorfen, oryzalin, Obuda Pepper virus, orthosulfamuron, orbencarb, oleic acid, cafenstrole, caprylic acid, capric acid, carfentrazone-ethyl, karbutilate, carbetamide, quizalofop, quizalofop-ethyl, quizalofop-P-ethyl, quizalofop-P-tefuryl, *Xanthomonas campestris*, quinoclamine, quinclorac, quinmerac, citric acid, cumyluron, clacyfos, glyphosate (including a salt of sodium, potassium, amine, propylamine, isopropylamine, ammonium, isopropyl ammonium, guanidine, monoethanolamine, choline, BAPMA (N,N-bis-(aminopropyl)methylamine), dimethylamine, or trimesium or the like), glufosinate (including a salt of amine, or sodium or the like), glufosinate-P, glufosinate-P-sodium, clethodim, clodinafop, clodinafop-propargyl, clopyralid (including a monoethanolamine salt), clomazone, chlomethoxyfen, clomeprop, cloransulam-methyl, chloramben, chloridazon, chlorimuron, chlorimuron-ethyl, chlorsulfuron, chlorthal-dimethyl, chlorthiamid, chlorphthalim, chlorflurenol-methyl, chlorpropham, chlorbromuron, chloroxuron, chlorotoluron, ketospiradox (including a salt of sodium, calcium, or ammonia or the like), *Colletotrichum orbiculare, Colletotrichum gloeosporioides, Colletotrichum truncatum, Chondrostercum purpureum*, saflufenacil, sarmentine, cyanazine, cyanamide, diuron, diethatyl-ethyl, dicamba (including a salt of amine, diethylamine, isopropylamine, diglycolamine, dimethyl ammonium, diolamine, isopropyl ammonium, auramine, potassium, trolamine, BAPMA (N,N-bis-(aminopropyl) methylamine), choline, sodium, or lithium or the like, or an ester such as methyl ester), cycloate, cycloxydim, diclosulam, cyclosulfamuron, cyclopyranil, cyclopyrimorate, dichlobenil, diclofop, diclofop-P-methyl, diclofop-methyl, dichlorprop, dichlorprop-P (including a salt of dimethyl ammonium, potassium, sodium, choline or the like, or an ester such as butotyl ester, 2-ethylhexyl ester, isoctyl ester, or methyl ester), diquat, diquat dibromide, dithiopyr, siduron, dinitramine, cinidon-ethyl, cinosulfuron, dinoseb (including acetate), dinoterb, cyhalofop, cyhalofop-butyl, cypyrafluone, diphenamid, difenzoquat, diflufenican, diflufenzopyr, simazine, dimesulfazet, dimethachlor, dimethametryn, dimethenamid, dimethenamid-P, simetryn, dimepiperate, dimefuron, *Pseudomonas fluorescens*, cinmethylin, swep, sulcotrione, sulfentrazone, sulfosate, sulfosulfuron, sulfometuron-methyl, sethoxydim, *Scelerothinia minor*, terbacil, daimuron, thaxtomin A, Tobacco Mild Green Mosaic Tobamovirus, Tobacco Rattle Virus, dalapon, thiazopyr, tiafenacil, thiencarbazone (including sodium salt, methyl ester, or the like), tiocarbazil, thiobencarb, thidiazimin, thidiazuron, thifensulfuron, thifensulfuron-methyl, desmedipham, desmetryne, tetflupyrolimet, thenylchlor, tebutam, tebuthiuron, tepraloxydim, tefuryltrione, terbuthylazine, terbutryn, terbumeton, tembotrione, topramezone, tralkoxydim, triaziflam, triasulfuron, triafamone, tri-allate, trietazine, triclopyr, triclopyr-butotyl, triclopyr-triethylammonium, tritosulfuron, tripyrasulfone, trifludimoxazin, triflusulfuron-methyl, trifluralin, trifloxysulfuron (including a salt of sodium or the like), tribenuron-methyl, tolpyralate, naptalam (including a salt with sodium or the like), naproanilide, napropamide, napropamide-M, nicosulfuron, lactic acid, neburon, norflurazon,

*Barkholderia rinojensis*, vernolate, paraquat, paraquat dichloride, halauxifen, halauxifen-benzyl, halauxifen-methyl, *Burkholderia rinojensis*, haloxyfop, haloxyfop-P, haloxyfop-etotyl, haloxyfop-P-methyl, halosafen, halosulfuron-methyl, bixlozone, picloram (including a salt with dichloro ammonium, trolamine or the like), picolinafen, bicyclopyrone, bispyribac-sodium, pinoxaden, bipyrazone, bifenox, piperophos, pyraclonil, pyrasulfotole, pyrazoxyfen, pyrazosulfuron-ethyl, pyrazolynate, bilanafos, pyraflufen, pyraflufen-ethyl, pyridafol, pyrithiobac-sodium, pyridate, pyriftalid, pyributicarb, pyribenzoxim, pyrimisulfan, pyriminobac-methyl, pyroxasulfone, pyroxsulam, *Phytophthora palmivora*, phenisopham, fenuron, fenoxasulfone, fenoxaprop (including methyl, ethyl, or isopropyl ester), fenoxaprop-P (including methyl, ethyl, or isopropyl ester), fenquinotrione, fenthiaprop-ethyl, fentrazamide, fenpyrazone, phenmedipham, *Phoma chenopodicola, Phoma herbarum, Phoma macrostoma*, butachlor, butafenacil, butamifos, butylate, *Puccinia canaliculata, Puccinia thlaspeos*, butenachlor, butralin, butroxydim, flazasulfuron, flamprop (including methyl, ethyl, or isopropyl ester), flamprop-M (including methyl, ethyl, or isopropyl ester), primisulfuron, primisulfuron-methyl, fluazifop-butyl, fluazifop-P, fluazifop-P-butyl, fluazolate, fluometuron, fluoroglycofen-ethyl, flucarbazone-sodium, fluchloralin, flucetosulfuron, fluthiacet-methyl, flupyrsulfuron-methyl (including a salt of sodium, calcium, or ammonia or the like), flufenacet, flufenpyr-ethyl, flupropanate (including sodium salt), flupoxame, flumioxazin, flumiclorac-pentyl, flumetsulam, fluridone, flurtamone, fluroxypyr (including an ester of butometyl, meptyl or the like, or a salt of sodium, calcium, ammonia or the like), flurochloridone, pretilachlor, procarbazone (including a salt with sodium or the like), prodiamine, prosulfuron, prosulfocarb, propaquizafop, propachlor, propazine, propanil, propyzamide, propisochlor, propyrisulfuron, propham, profluazol, prohexadione-calcium, propoxycarbazone, propoxycarbazone-sodium, profoxydim, bromacil, brompyrazon, prometryn, prometon, bromoxynil (including an ester of butyric acid, octanoic acid, or heptanoic acid or the like), bromofenoxim, bromobutide, florasulam, florpyrauxifen, florpyrauxifen-benzyl, hexazinone, pethoxamid, benazolin, benazolin-ethyl, penoxsulam, Pepino Mosaic Virus, heptamaloxyloglucan, beflubutamid, beflubutamid-M, pebulate, pelargonic acid, bencarbazone, benquitrione, benzfendizone, bensulide, bensulfuron, bensulfuron-methyl, benzobicyclon, benzofenap, bentazone, pentanochlor, pendimethalin, pentoxazone, benfluralin, benfuresate, fosamine, fomesafen, foramsulfuron, forchlorfenuron, mecoprop (including a salt of sodium, potassium, isopropylamine, triethanolamine, dimethylamine, diolamine, trolamine, choline or the like, or an ester such as ethadyl ester, 2-ethylhexyl ester, isoctyl ester, or methyl ester), mecoprop-P-potassium, mesosulfuron (including an ester of methyl or the like), mesotrione, metazachlor, metazosulfuron, methabenzthiazuron, metamitron, metamifop, metam (including a salt of sodium or the like), disodium methanearsonate (DSMA), methiozolin, methyldymuron, metoxuron, metosulam, metsulfuron-methyl, metobromuron, metobenzuron, metolachlor, metribuzin, mepiquat chloride, mefenacet, monosulfuron (including methyl, ethyl, or isopropyl ester), monolinuron, molinate, iodosulfuron, iodosulfulon-methyl-sodium, iofensulfuron, iofensulfuron-sodium, lactofen, lancotrione, linuron, rimsulfuron, lenacil, 2,2,2-trichloroacetic acid (TCA) (including a salt of sodium, calcium, or ammonia or the like), 2,3,6-trichlorobenzoic acid (2,3,6-TBA), 2,4,5-trichlorophenoxyacetic acid (2,4,5-T), 2,4-dichlorophenoxyacetic acid (2,4-D) (including a salt of amine, diethylamine, triethanolamine, isopropylamine, dimethylammonium, diolamine, dodecylammonium, heptylammonium, tetradecylammonium, triethylammonium, tris(2-hydroxypropyl)ammonium, trolamine, choline, sodium, lithium or the like, or an ester such as butotyl ester, 2-butoxypropyl ester, 2-ethylhexyl ester, methyl ester, ethylester, butyl ester, isobutyl ester, octyl ester, pentyl ester, propylester, isoctyl ester, isopropyl ester, meptyl ester, or tefuryl ester), 2,4-dichlorophenoxybutyric acid (2,4-DB) (including a salt of amine, diethylamine, triethanolamine, isopropylamine, dimethylammonium, choline, sodium, lithium or the like, or an ester such as isoctyl ester), 2-amino-3-chloro-1,4-naphthoquinone (ACN), 2-methyl-4-chlorophenoxyacetic acid (MCPA) (including a salt of sodium, dimethylammonium, choline or the like, or an ester such as 2-ethylhexyl ester, isoctyl ester, ethyl ester or the like), 2-methyl-4-chlorophenoxybutyric acid (MCPB) (including sodium salt, ethyl ester, or the like), 4-(2,4-dichlorophenoxy)butyric acid (2,4-DB), 4,6-dinitro-0-cresol (DNOC) (including a salt of amine or sodium or the like), (5S)-3-(3,5-difluorophenyl)-N-[rel-(3R,5R)-5-(trifluoromethylsulfonylcarbamoyl)tetrahydrofuran-3-yl]-5-vinyl-4H-isoxazole-5-carboxamid, (Chemical Name, CAS Registry Number: 2266183-40-6) (WO 2018/228986 A, WO 2020/114934 A), N4-(2,6-difluorophenyl)-6-(1-fluoro-1-methyl-ethyl)-1,3,5-triazine-2,4-diamine (Chemical Name, CAS Registry Number: 1606999-43-2) (WO 2014/064094 A, WO 2015/162164 A), (5S)-3-(3,5-difluorophenyl)-N-[(3R)-5-(methylsulfonylcarbamoyl)-2,3-dihydrofuran-3-yl]-5-vinyl-4H-isoxazole-5-carboxamid (Chemical Name, CAS Registry Number: 2266190-06-9) (WO 2018/228986 A, WO 2020/114934 A), (5R)-3-(3,5-difluorophenyl)-5-methyl-N-[rel-(3R,5R)-5-(methylsulfonylcarbamoyl)tetrahydrofuran-3-yl]-4H-isoxazole-5-carboxamid (Chemical Name, CAS Registry Number: 2266164-36-5) (WO 2018/228986 A, WO 2020/114934 A), (5R)-3-(3,5-difluorophenyl)-N-[(3R)-5-(methoxycarbamoyl)-2,3-dihydrofuran-3-yl]-5-methyl-4H-isoxazole-5 carboxyamide (Chemical Name, CAS Registry Number: 2266170-31-2) (WO 2018/228986 A, WO 2020/114934 A), 2-[2-(3,4-dimethoxyphenyl)-6-methyl-3-oxo-pyridazine-4-carbonyl]cyclohexane-1,3-dione (Chemical Name, CAS Registry Number: 2138855-12-4) (WO 2017/178582 A, WO 2018/015476 A), 4-hydroxy-1-methyl-3-[4-(trifluoromethyl)-2-pyridyl]imidazolidin-2-one (Chemical Name, CAS Registry Number: 1708087-22-2) (WO 2015/059262 A, WO 2018/015476 A), 6-(1-fluorocyclopentyl)-N4-(2,3,5,6-tetrafluorophenyl)-1,3,5-triazine-2,4-diamine (Chemical Name, CAS Registry Number: 1820807-75-7) (WO 2015/162164 A), 6-(1-fluoro methyl-ethyl)-N4-(2,3,5,6-tetrafluorophenyl)-1,3,5-triazine-2,4-diamine (Chemical Name, CAS Registry Number: 1606999-21-6) (WO 2014/064094 A, WO 2015/162164 A), (5S) (3-fluoro-5-methylphenyl)-N-[rel-(3R,5R) (methoxycarbamoyl)tetrahydrofuran-3-yl]-5-vinyl-4H-isoxazole-5-carboxamid (Chemical Name, CAS Registry Number: 2266292-43-5) (WO 2018/228986 A, WO 2020/114934 A), 6-(1-methylcyclobutyl)-N4-(2,3,5,6-tetrafluorophenyl)-1,3,5-triazine-2,4-diamine (Chemical Name, CAS Registry Number: 1607001-97-7) (WO 2014/064094 A, WO 2015/162164 A), AE-F-150944 (code number), F9960 (code number), IR-6396 (code number), MCPA-thioethyl, NC-656 (code number), SYP-298 (code number), SYP-300 (code number), S-ethyldipropylthiocarbamate (EPIC), S-metolachlor, S—9750 (code number), MSMA, and HW-02 (code number).

Plant Growth Regulators:

1-naphthylacetamide, 1-methylcyclopropene, 1,3-diphenylurea, 2,3,5-triiodobenzoic acid, 2-methyl-4-chlorophenoxybutyric acid (MCPB) [including sodium salt, ethyl ester, or the like], 2-(naphthalene-1-yl)acetamide, 2,6-diisopropylnaphthalene, 3-[(6-chloro-4-phenylquinazoline-2-yl) amino]propane-1-ol, 4-oxo-4-(2-phenylethyl) amino butyric acid (Chemical Name, CAS Registry Number: 1083-55-2), 4-chlorophenoxyacetic acid (4-CPA), 5-aminolevulinic acid hydrochloride, methyl 5-(trifluoromethyl)benzo[b]thiophene-2-carboxylate, aminoethoxyvinylglycine (AVG), n-decanol, aviglycine, ancymidol, abscisic acid, isoprothiolane, inabenfide, indole acetic acid, indole butyric acid, uniconazole, uniconazole-P, Ecolyst, ethychlozate, ethephon, epocholeone, calcium chloride, choline chloride, oxinesulfate, kinetin, calcium peroxide, carvone, calcium formate, cloxyfonac, cloxyfonac-potassium, cloprop, chlormequat, chlormequat-chloride, chlorpropham, choline, cytokinins, oxydized glutathione, cyanamide, sodium cyanate, cyclanilide, dichlorprop (including a salt of dimethylammonium, potassium, sodium, choline or the like, or an ester such as butotyl ester, 2-ethylhexyl ester, isoctyl ester, or methyl ester), dichlorprop-P (including a salt of sodium, potassium, dimethylammonium or the like, or 2-ethylhexyl ester), diquat, diquat dibromide, dikegulac, gibberellic acid, gibberellin A4, gibberellin A7, dimethipin, sintofen, jasmone, cis-jasmone, jasmonic acid, methyl jasmonate, streptomycin, calcium polysulfide, daminozide, calcium carbonate, thidiazuron, decan-1-ol, triacontanol, triapenthenol, trinexapac-ethyl, tribufos, paclobutrazol, paraffin, bispyribac-sodium, hymexazol, butralin, fluthiacet-methyl, pyraflufen-ethyl, flumetralin, flurprimidol, flurenol, pronitridine, prohydrojasmon, prohexadione-calcium, heptamaloxyloglucan, 6-benzylaminopurine, pendimethalin, forchlorfenuron, formononetin, maleic hydrazide, mepiquat chloride, mefluidide, lipochitooligosaccharides, for example, lipochitooligosaccharides SP104, and calcium sulfate.

Next, known phytotoxicity reducing compounds which may be mixed or used in combination are exemplified.

Phytotoxicity Reducing Compounds:

isoxadifen, isoxadifen-ethyl, oxabetrinil, octane-1,8-diamine, cloquintocet, cloquintcet-mexyl, dietholate, cyometrinil, dichlormid, dicyclonone, cyprosulfamide, daimuron, 1,8-naphthalic anhydride, fenchlorazole, fenchlorazole-O-ethyl, fenclorim, furilazole, fluxofenim, flurazole, benoxacor, metcamifen, mephenate, mefenpyr, mefenpyr-ethyl, mefenpyr-diethyl, lower alkyl-substituted benzoic acid, 2,2-dichloro-N-(1,3-dioxolan-2-ylmethyl)-N-(2-propenyl)acetamide (PPG-1292), 2-dichloromethyl-2-methyl-1,3-dioxane (MG-191), 3-dichloroacetyl-2,2,5-trimethyl-1,3-oxazolidine (R-29148), 4-dichloroacetyl-1-oxa-4-azaspiro[4.5]decane (AD-67), 4-carboxy-3,4-dihydro-2H-1-benzopyran-4-acetic acid (CL-304415, code number), MON4660 (code number), metcamifen, N1,N2-diallyl-N2-dichloroacetylglycinamide (DKA-24, code number), 1-bromo [(chloromethyl)sulfonyl]benzene (CSB), 2-propenyl-1-oxa azaspiro[4,5]decane-4-carbodithioate (MG-838, code number), 3-(dichloroacetyl)-2,2-dimethyl-1,3-oxazolidine (R-28725, code number), R-29148 (code number), and 1-(dichloroacetyl)azepane (TI-35, code number).

Next, known biological pesticides which may be mixed or used in combination are exemplified.

Biological Pesticides:

*Haplothrips brevitubus, Franklinothrips vespiformis, Diglyphus isaea, Encarsia formosa, Amblyseius cucumeris, Pseudaphycus malinus, Amblyseius womersleyi, Aphidius colemani, Eretmocerus eremicus, Aphidoletes aphidimyza, Amblyseius swirskii, Orius strigicollis, Phytoseiulus persimilis, Amblyseius degenerans, Phytoseiulus persimilis, Orius sauteri, Dacnusa sibirica, Amblyseius californicus, Chrysoperla nipponensis*, and *Anicetus beneficus.*

Next, known agricultural materials which may be mixed or used in combination will be exemplified.

Agricultural Materials:

ethylene, hypochlorous acid solution (limited to those obtained by electrolysis of hydrochloric acid or aqueous potassium chloride solution), sodium bicarbonate, vinegar, humic substances, humic acid, fulvic acid, seaweed extracts, polysaccharides, amino acid, microbial materials, functional components derived from animals and plants, microbial metabolites, microbial activation materials, soil stickers, soil permeability control materials, soil water retention materials, and the like, as well as bio-stimulants.

Next, known agricultural fertilizer components which may be mixed or used in combination are exemplified.

Examples of the fertilizer include an inorganic fertilizer and an organic fertilizer. Specific examples thereof include ammonium chloride, ammonium sulfate, ammonium nitrate, ammonium dihydrogen phosphate, ammonium urea nitrate, urea, calcium cyanamide, potassium nitrate, superphosphate of lime, double superphosphate of lime, potassium dihydrogen phosphate, potassium chloride, potassium sulfate, potassium carbonate, potassium silicate, oil cake, fish meal, rice bran, bat guano, and fermented chicken manure.

The pest control agent of the present invention configured as described above exhibits an excellent control effect on pests such as *Orthoptera* pests, *Thysanoptera* pests, *Hemiptera* pests, *Coleoptera* pests, *Diptera* pests, *Lepidoptera* pests, *Hymenoptera* pests, Collembola pests, Thysanura pests, Blattodea pests, Psocoptera pests, Mallophaga pests, Phthiraptera pests, plant parasitic mites, plant parasitic nematodes, plant parasitic mollusks, other harmful animals, unpleasant animals, hygiene pests, and parasites. Examples of such pests include the following species.

Examples of the *Orthoptera* pests include Tettigoniidae pests such as *Ruspolia lineosa*; Gryllidae pests such as *Teleogryllus emma* and *Truljalia hibinonis*; Gryllotalpidae pests such as *Gryllotalpa orientalis*; Acrididae pests such as *Oxya hyla intricate, Locusta migratoria, Melanoplus sanguinipes, Melanoplus differentialis*, and *Melanoplus femurrubrum*; Pyrgomorphidae pests such as *Atractomorpha lata*; Eneopteridae pests such as *Euscyrtus japonicus*; and Tridactylidae pests such as *Xya japonicus.*

Examples of the *Thysanoptera* pests include Thripidae pests such as *Frankliniella intonsa, Frankliniella occidentalis, Scirtothrips dorsalis, Thrips palmi, Thrips tabaci, Thrips setosus, Heliothrips haemorrhoidalis*, and *Stenchaetothrips biformis*; and Phlaeothripidae pests such as *Ponticulothrips diospyrosi, Liothrips wasabiae*, and *Haplothrips aculeatus.*

Examples of the *Hemiptera* pests include Cicadidae pests such as *Mogannia minuta*; Aphrophoridae pests such as *Aphrophora intermedia* and *Mahanarva fimbriolata*; Membracidae pests such as *Machaerotypus sibiricus*; Cicadellidae pests such as *Arboridia apicalis, Empoasca onukii, Nephotettix cincticeps, Nephotettix malayanus, Nephotettix virescens, Nephotettix nigropictus, Recilia dorsalis,*

*Amrasca biguttula, Idioscopus nitidulus, Idioscopus clypealis, Amritodus atkinsoni, Empoasca fabae*, and *Dalbulus maidis*; Cixiidae pests such as *Pentastiridius apicalis*; Delphacidae pests such as *Laodelphax striatellus, Nilaparvata lugens, Sogatella furcifera*, and *Peregrinus maidis*; Meenoplidae pests such as *Nisia nervosa*; Derbidae pests such as *Kamendaka saccharivora*; Achilidae pests such as *Achilus flammeus*; Ricaniidae pests such as *Orosanga japonicus*; Flatidae pests such as *Mimophantia maritima*; Psyllidae pests such as *Cacopsylla pyrisuga* and *Diaphorina citri*; Calophyidae pests such as *Calophya mangiferae*; Phylloxeridae pests such as *Daktulosphaira vitifoliae*; Adelgidae pests such as *Adelges laricis* and *Adelges tsugae*; Aphididae pests such as *Acyrthosiphon pisum, Aphis gossypii, Aphis spiraecola, Lipaphis erysimi, Brevicoryne brassicae, Myzus persicae, Schizaphis graminum, Rhopalosiphum padi, Toxoptera aurautii, Aulacorthum solani, Macrosiphum euphorbiae, Nasonovia ribisnigri, Sitobion avenae*, and *Aphis glycines*; Aleyrodidae pests such as *Aleurocanthus camelliae, Aleurocanthus spiniferus, Bemisia tabaci, Bemisia argentifolii*, and *Trialeurodes vaporariorum*; Monophlebidae pests such as *Drosicha corpulenta* and *Icerya purchasi*; Pseudococcidae pests such as *Dysmicoccus brevipes, Planococcus citri*, and *Pseudococcus comstocki*; Coccidae pests such as *Ceroplastes ceriferus* and *Ceroplastes rubens*; Aclerdidae pests such as *Aclerda takahashii*; Diaspididae pests such as *Aonidiella aurantii, Diaspidiotus perniciosus, Pseudaulacaspis pentagoa*, and *Unaspis yanonensis*; Miridae pests such as *Lygus lineolaris, Trigonotylus caelestialium, Apolygus lucorum, Nesidiocoris tennis*, and *Halticus bractatus*; Tingidae pests such as *Stephanitis pyrioides* and *Stephanitis nashi*; Pentatomidae pests such as *Eurydema rugosa, Eysarcoris lewisi, Eysarcoris aeneus, Lagynotomus elongatus, Nezara viridula, Plautia crossota, Nezara antennata, Eushistus heros, Piezodorus guildini, Tibraca limbativentris*, and *Dichelops furcatus*; Plataspidae pests such as *Megacopta cribraria*; Urostylididae pests such as *Urochela luteovoria*; Lygaeidae pests such as *Cavelerius saccharivorus*; Malcidae pests such as *Malcus japonicus; Pyrrhocoridae pests such as Dysdercus cingulatus*; Alydidae pests such as *Leptocorisa aceta* and *Leptocorisa chinensis*; Coreidae pests such as *Anacanthocoris striicornis*; Rhopalidae pests such as *Rhopalus maculatus*; Cydnidae pests such as *Scaptocoris castanea*; and Cimicidae pests such as *Cimex lectularis.*

Examples of the *Coleoptera* pests include Scarabaeidae pests such as *Anomara cuprea, Anomara rufocuprea, Popillia japonica, Oxycetonia jucunda, Anomala geniculata, Oryctes rhinoceros, Heptophylla picea*, and *Phyllophaga cuyabana*; Elateridae pests such as *Agriotes ogurae, Agriotes lineatus, Agriotes obscurus, Melanotus okinawensis*, and *Melanotus fortnumi*; Dermestidae pests such as *Anthrenus verbasci*; Bostrychidae pest such as *Heterobostrychus hamatipennis*; Anobiidae pests such as *Stegobium paniceum*; Ptinidae pests such as *Pitinus clavipes*; Trogossitidae pests such as *Tenebroides mauritanicus*; Cleridae pests such as *Necrobia rufipes*; Nitidulidae pests such as *Carpophilus hemipterus* and *Meligethes aeneus*; Silvanidae pests such as *Ahasverus advena*; Laemophloeidae pests such as *Cryptolestes ferrugineus*; Coccinellidae pests such as *Epilachna varivestis* and *Henosepilachna vigintioctopunctata*; Tenebrionidae pests such as *Tenebrio molitor* and *Tribolium castaneum*; Meloidae pest such as *Epicauta gorhami*; Cerambycidae pests such as *Anoplophora glabripennis, Xylotrechus pyrrhoderus, Monochamus alternatus*, and *Dectes texanus*; Bruchinae pests such as *Callosobruchus chinensis*; Chrysomelidae pests such as *Leptinotarsa decemlineata, Diabrotica virgifera, Diabrotica barberi, Diabrotica undecimpunctata howardi, Aulacophora femoralis, Phaedon brassicae, Cassida nebulosa, Oulema oryzae, Epilachna varivestis, Phyllotreta striolata, Demotina fasciculata, Psylliodes chrysocephala, Cerotoma trifurcate, Colaspis brunnea, Colaspis crinnicornis, Odontota horni, Chaetocnema pulicaria*, and *Diabrotica balteata*; Brentidae pests such as *Cylas formicarius*; Curculionidae pests such as *Hypera postica, Listroderes costirostris, Euscepes postfasciatus, Curculio sikkimensis, Anthonomus grandis*, and *Sternechus subsignatus*; Erirhinidae pests such as *Echinocnemus bipunctatus, Lissorhoptrus oryzophilus*, and *Oryzophagus oryzae*; Rhynchophoridae pests such as *Sitophilus zeamais, Sphenophrus venatus*, and *Sphenophorus levis*; Scolytidae pests such as *Tomicus piniperda*; Platypodidae pests such as *Crossotarsus niponicus*; and Lyctinae pests such as *Lyctus brunneus.*

Examples of the *Diptera* pests include Tipulidae pests such as *Tipula aino*; Bibionidae pests such as *Plecia nearctica*; Mycetophilidae pests such as *Exechia shiitakevora*; Sciaridae pests such as *Pnyxia scabiei* and *Bradysia agrestis*; Cecidomyiidae pests such as *Asphondylia yushimai, Mayetiola destructor*, and *Dasineura oxycoccana; Culicidae pests such as Aedes aegypti* and *Culex pipiens pallens*; Simuliidae pests such as *Simulium takahashii*; Chironomidae pests such as *Chironomus oryzae*; Tabanidae pests such as *Chrysops suavis* and *Tabanus trigones*; Syrphidae pests such as *Eumerus strigatus; Tephritidae* pests such as *Bactrocera dorsalis, Euphranta japonica*, and *Ceratitis capitata*; Agromyzidae pests such as *Liriomyza trifolii, Liriomyza sativae, Agromyza oryzae, Liriomyza bryoniae, Chromatomyia horticola*, and *Liriomyza chinensis*; Chloropidae pests such as *Meromyza nigriventris*; Drosophilidae pests such as *Drosophila suzukii* and *Drosophila melanogaster*; Ephydridae pests such as *Hydrellia griseola*; Hippoboscidae pests such as *Hippobosca equina*; Scathophagidae pests such as *Parallelpmma sasakawae*; Anthomyiidae pests such as *Delia antiqua* and *Delia platura*; Fanniidae pests such as *Fannia canicularis*; Muscidae pest such as *Musca domestica* and *Stomoxys calcitrans*; Sarcophagidae pests such as *Sarcophaga peregrina*; Gasterophilidae pests such as *Gasterophilus intestinalis*; Hypodermatidae pests such as *Hypoderma lineatum*; and Oestridae pests such as *Oestrus ovis.*

Examples of the *Lepidoptera* pests include Hepialidae pests such as *Endoclita excrescens*; Heliozelidae pests such as *Antispila ampelopsia*; Cossidae pests such as *Zeuzera leuconotum* and *Cossus insularis*; Tortricidae pests such as *Archips fuscocupreanus, Adoxophyes orana fasciata, Grapholita molesta, Homona magnanima, Leguminivora glycinivorella, Cydia pomonella*, and *Lobesia botrana*; Tortricidae pests such as *Eupoecilia ambiguella*; Psychidae pests such as *Bambalina* sp. and *Eumeta minuscula; Tineidae* pests such as *Nemapogon granella* and *Tinea translucens*; Bucculatricidae pest such as *Bucculatrix pyrivorella*; Tischeriidae pests such as *Lyonetia clerkella* and *Lyonetiaprunifoliella malinella*; Gracillariidae pests such as *Caloptilia theivora* and *Phyllonorycter ringoniella*; Phyllocnistidae pests such as *Phyllocnistis citrella*; Acrolepiidae pests such as *Acrolepiopsis sapporensis*; Plutellidae pests such as *Plutella xylostella*; Yponomeutidae pests such as *Yponomeuta orientalis*; Argyresthidae pests such as *Argyresthia conjugella*; Sesiidae pests such as *Nokona regalis* and *Synanthedin hector*; Gelechiidae pests such as *Phthorimaea operculella, Sitotroga cerealella, Pectinophora gossypiella*, and *Tuta absoluta*; Carposinidae pests such as *Carposina sasakii*; Zygaenidae pest such as *Illiberis pruni*; Limacodidae pests such as *Monema flavescens*; Crambidae pests such as *Ancylolomia japonica, Chilo suppressalis, Cnaphalocrocis medinalis, Ostrinia furnacalis, Hellulla undalis, Conogethes punctiferlis, Diaphania indica, Parapediasia teterrella*, and *Ostrinia nubilalis; Diatraea saccharalis*, Pyralidae pests such as *Cadra cautella* and *Galleria mellonella*; Pterophoridae pests such as *Nippoptilia vitis*; Papilionidae pests such as *Papilio xuthus*; Pieridae pests such as *Pieris rapae*; Hesperiidae pests such as *Parnara guttata*; Geometridae pests such as *Ascotis selenaria*; Lasiocampidae pests such as *Dendrolimus spectabilis* and *Malacosoma neustrium testaceum*; Sphingidae pests such as *Agrius convolvuli*; Lymantriinae pests such as *Arna pseudoconspersa, Orygia recens approximans*, and *Lymantria dispar*; Arctiidae pests such as *Hyphantria cunea*; and Noctuidae pests such as *Agrotis ipsilon, Agrotis segetum, Autographa nigrisigna, Helicoverpa armigera, Helicoverpa zea, Heliothis virescens, Spodoptera exigua, Spodoptera litura, Chrysodeix includens, Spodoptera frugiperda*, and *Nephelodes minians.*

Examples of the *Hymenoptera* pests include Argidae pests such as *Arge pagana*; Tenthredinidae pests such as *Apethymus kuri* and *Athalia rosae ruficornis*; Cynipidae pests such as *Dryocosmus kuriphilus*; Vespidae pests such as *Vespa simillima xanthoptera*; Formicidae pests such as *Solenopsis invicta* and *Linepithema humile*; and Megachilidae pests such as *Megachile nipponica.*

Examples of the Collembola pests include Sminthuridae pests such as *Bourletiella hortensis.*

Examples of the Thysanura pests include Lepismatidae pests such as *Lepisma saccharina* and *Ctenolepisma villosa.*

Examples of the Blattodea pests include Blattidae pests such as *Periplaneta americana*; Blattellidae pests such as *Blattella germanica*; Termitidae pests such as *Odontotermes formosanus*; Kalotermitidae pests such as *Incisitermes minor* and *Cryptotermes domesticus*; and Rhinotermitidae pests such as *Coptotermes formosanus* and *Reticulitermes speratus.*

Examples of the Psocoptera pests include Trogiomorpha pests such as *Trogium pulsatorium*; and Troctomorpha pests such as *Liposcelis corrodens.*

Examples of the Dermaptera pests include Labiduridae pests such as *Labodura riparia.*

Examples of the Mallophaga pests include Menoponidae pests such as *Lipeurus caponis*; and Trichodectidae pests such as *Damalinia bovis.*

Examples of the Phthiraptera pests include Haematopinidae pests such as *Haematopinus suis*; Pediculidae pests such as *Pediculus humanus*; Linognathidae pests such as *Linognathus setosus*; and Pthiridae pests such as *Pthirus pubis.*

Examples of the *Acari* pests include Eupodidae pests such as *Penthaleus major*; Tarsonemidae pests such as *Phytonemus pallidus* and *Polyphagotarsonemus latus*; Pyemotidae pests such as *Siteroptes* sp.; Tenuipalpidae pests such as *Brevipalpus lewisi*; Tuckerellidae pests such as *Tuckerella pavoniformis*; Tetranychidae pests such as *Eotetranychus boreus, Panonychus citri, Panonychus ulmi, Tetranychus urticae*, and *Tetranychus kanzawai*; Nalepellidae pests such as *Trisetacus pini*; Eriophyidae pests such as *Aculops pelekassi, Epitrimerus pyri, Phyllocoptruta oleivora*, and *Aculops lycopersici*; Diptilomiopidae pests such as *Diptacus crenatae*; Acaridae pests such as *Aleuroglyphus ovatus, Tyrophagus putrescentiae*, and *Rhizoglyphus robini*; Varroidae pests such as *Varroa jacobsoni*; Dermanyssidae pests such as *Dermanyssus gallinae*; Macronyssidae pests such as *Ornithonyssus sylviarum*; Ixodidae pests such as *Boophilus microplus, Rhipicephalus sanguineus*, and *Haemaphysalis longicornis*; and Sarcoptidae pests such as *Sarcoptes scabiei.*

Examples of the plant parasitic nematodes include those belonging to the family Longidoridae such as *Xiphinema index*; those belonging to the family Trichodoridae such as *Paratrichodorus minor*; those belonging to the family Rhabditidae such as *Rhabditella* sp.; those belonging to the family Tylenchidae such as *Aglenchus* sp.; those belonging to the family Tylodoridae such as *Cephalenchus* sp.; those belonging to the family Anguinidae such as *Nothotylenchus acris* and *Ditylenchus destructor*; those belonging to the family Hoplolaimidae such as *Rotylenchulus reniformis* and *Helicotylenchus dihystera*; those belonging to the family Paratylenchidae such as *Paratylenchus curvitatus*; those belonging to the family Meloidogynidae such as *Meloidogyne incognita, Meloidogyne hapla, Meloidogyne javanica, Meloidogyne chitwoodi*, and *Meloidogyne fallax*; those belonging to the family Heteroderidae such as *Globodera rostochiensis, Globodera pallida, Heterodera glycines*, and *Heterodera Schachtii*; those belonging to the family Telotylenchidae such as *Tylenchorhynchus claytoni*; those belonging to the family Psilenchidae such as *Psilenchus* sp.; those belonging to the family Criconematidae such as *Criconemoides* sp.; those belonging to the family Tylenchulidae such as *Tylenchulus semipenetrans*; those belonging to the family Sphaeronematinae such as *Sphaeronema camelliae*; those belonging to the family Pratylenchidae such as *Radopholus citrophilus, Radopholus similis, Nacobbus aberrans, Pratylenchus penetrans, Pratylenchus coffeae, Pratylenchus zeae*, and *Pratylenchus brachyurus*; those belonging to the family lotonchiidae such as *Iotonchium ungulatum*; those belonging to the family *Aphelenchus avenae* such as *Aphelenchus avenae*; those belonging to the family Aphelenchoididae such as *Aphelenchoides besseyi* and *Aphelenchoides fragariae*; and those belonging to the family Parasitaphelenchidae such as *Bursaphelenchus xylophilus.*

Examples of the plant parasitic mollusks include those belonging to the family Pilinidae such as *Pomacea canaliculata*; those belonging to the family Veronicellidae such as *Leavicaulis alte*; those belonging to the family Achatinidae such as *Achatina fulica*; those belonging to the family Philomycidae such as *Meghimatium bilineatum*; those belonging to the family Succineidae such as *Succinealauta*; those belonging to the family Discidae such as *Discus pauper*; those belonging to the family Zonitidae such as *Zonitoides yessoensis*; those belonging to the family Limacidae such as *Limax flavus, Lehmannia valentiana*, and *Deroceras reticulatum*; those belonging to the family Helicarionidae such as *Parakaliella harimensis*; and those belonging to the family Bradybaenidae such as *Acusta despecta sieboldiana* and *Bradybaena similaris.*

Examples of the other pests such as harmful animals, unpleasant animals, hygiene pests, pests harmful to domestic animals, and parasites include *Procambarus clarkii* of the family Cambaridae of the order Decapoda, *Porcellio scaber* of the family Porcellionidae of the order Isopoda, *Armadillidium vulgare* of the family Armadillidiidae, Chilopoda pests such as *Thereuonema tuberculata* of the family Scutigeridae of the order Scutigeromorpha, and *Scolopendra subspinipes* of the order Scolopendromorpha, Diplopoda pests such as *Oxidus gracilis* of the family Paradoxosomatidae of the order Polydesmida, *Theridiidae hasseltii* of the family *Theridiidae* of the order Araneae, *Cheiracanthium japonicum* of the family Clubionidae of the order Araneae, *Androctonus crassicauda* of the order Scorpiones, endoparasitic nematodes such as *Ascaris lumbricoides, Syphacia* sp., and *Wuchereria bancrofti*, and endoparasitic platyhelminthes such as *Distomum* sp., *Paragonimus westermanii, Metagonimus yokokawai, Schistosoma japonicum, Taenia solium, Taeniarhynchus saginatus, Echinococcus* sp., and *Diphyllobothrium latum.*

The pest control agent of the present invention also exhibits a control effect on the pests and the like exemplified above which have acquired resistance to existing pest control agents. In addition, the pest control agent of the present invention can also be used for plants which have acquired characteristics such as pest resistance, disease resistance, and herbicide resistance by genetic recombination, artificial crossing, and the like.

The "plant imparted with resistance by breeding methods or gene recombination techniques" of the present invention includes not only plants imparted with resistance by classical variety crossing and resistance imparted by gene recombination techniques, but also plants imparted with resistance by new plant breeding techniques (NBTs) in which a molecular biological technique is combined with a conventional crossing technique. The new plant breeding techniques (NBTs) are described in a book "Understanding new plant breeding techniques" (International Academic Publishing Co., Ltd., written by Ryo Ohsawa and Hiroshi Ezura), a review article "Genome Editing Tools in Plants" (Genes 2017, 8, 399, written by Tapan Kumar Mohanta, Tufail Bashir, Abeer Hashem, Elsayed Fathi Abd_Allah, and Hanhong Bae), and the like.

Next, the production method, formulation method, and use of the compound of the present invention will be described in detail in the following Examples, but the present invention is not limited to these Examples at all. The melting point, which is a physical property value of the compound of the present invention, was measured with an MP-500V micro melting point measuring apparatus manufactured by Yanaco Technical Science. The refractive index was measured using an Abbe refractometer manufactured by ATAGO Co., Ltd. The $^1$H NMR spectrum was measured using JNM-LA400 (400 MHz), JNM-LA300 (300 MHz), or JNM-ECS300 (300 MHz) manufactured by JEOL Ltd. with tetramethylsilane (TMS) as an internal standard. The high resolution mass spectrometry spectrum (HRMS) was measured using a Q Exactive Focus Hybrid Quadrupole-Orbitrap LC-MS/MS System (ESI, positive mode) manufactured by Thermo Fisher Scientific Inc.

The production example of a production intermediate of the compound of the present invention is also described.

EXAMPLES

Example 1

Production of (R)-2-chloro-4-fluoro-5-{2-[(1,1,1-trifluoro-N-methylmethyl)sulfonamido]propoxy}-N-(2,2,2-trifluoroethyl) benzamide (Compound of Present Invention No.: C-0191)

(1) Production of (R)-2-(tert-butoxycarbonylamino)-1-propanol

To a mixture of 5.00 g (66.6 mmol) of (R)-2-amino-1-propanol, 7.40 g (73.1 mmol) of triethylamine, and 70 mL of tetrahydrofuran, 14.53 g (66.6 mmol) of di-tert-butyl dicarbonate was added under ice cooling, and the mixture was stirred at room temperature for 15 hours. Ethyl acetate was added thereto, and the organic layer was washed with 2N hydrochloric acid and brine, and dried over anhydrous magnesium sulfate. The solvent was distilled off in vacuo to obtain 13.24 g (yield: quantitative) of a crude target product. This was directly used in the next process without purification.

$^1$H-NMR data (400 MHz, $CDCl_3$/TMS δ (ppm)): 1.15 (3H, d), 1.45 (9H, s), 0.72 (1H, brs), 3.51 (1H, dd), 3.64 (1H, dd), 3.77 (1H, brs), 4.65 (1H, brs)

(2) Production of (R)-(2-aminopropoxy)-2-chloro-4-fluoro-N-(2,2,2-trifluoroethyl) benzamide (Compound of Present Invention No.: A-0368)

To a mixture of 3.00 g (11.0 mmol) of 2-chloro fluoro-5-hydroxy-N-(2,2,2-trifluoroethyl) benzamide, 2.52 g (14.4 mmol) of (R)-2-(tert-butoxycarbonylamino)-1-propanol, 3.78 g (14.4 mmol) of triphenylphosphine, and 70 mL of tetrahydrofuran, 2.91 g (14.4 mmol) of diisopropyl azodicarboxylate was added under ice cooling, and the mixture was stirred at room temperature for 16 hours. Further, 1.89 g (7.21 mmol) of triphenylphosphine and 1.46 g (7.22 mmol) of diisopropyl azodicarboxylate were added thereto at room temperature, and the mixture was stirred at room temperature for 24 hours. The solvent was distilled off in vacuo, and the residue was purified by silica gel column chromatography (developing solvent, n-hexane:ethyl acetate=3:1) to obtain (R)-tert-butyl-(1-{4-chloro-2-fluoro-5-[(2,2,2-trifluoroethyl)carbamoyl]phenoxy}propan-2-yl) carbamate. To a mixture of the obtained (R)-tert-butyl-(1-{4-chloro-2-fluoro-5-[(2,2,2-trifluoroethyl)carbamoyl] phenoxy}propan-2-yl)carbamate and 30 mL of dichloromethane, 14 mL of trifluoroacetic acid was added at room temperature, and the mixture was stirred for 19 hours. Further, 2N hydrochloric acid was added thereto, and the aqueous layer was washed with isopropyl ether. Then, an aqueous sodium hydroxide solution was added to the obtained aqueous layer. The mixture was subjected to extraction with ethyl acetate, and the obtained organic layer was dried over anhydrous sodium sulfate. The solvent was distilled off in vacuo to obtain 3.50 g (yield: 96%) of a crude target product. This was directly used in the next process without purification.

$^1$H-NMR data (400 MHz, $CDCl_3$/TMS δ (ppm)): 1.16 (3H, d), 3.34-3.41 (1H, m), 3.73 (1H, dd), 3.94 (1H, dd), 4.08-4.17 (2H, m), 6.97 (1H, brs), 7.22 (1H, d), 7.40 (1H, d)

(3) Production of (R)-2-chloro-4-fluoro-N-(2,2,2-trifluoroethyl)-5-{2-[(trifluoromethyl)sulfonamido] propoxy}benzamide (Compound of Present Invention No.: C-0005)

To a mixture of 3.30 g (10.0 mmol) of crude (R)-(2-aminopropoxy)-2-chloro-4-fluoro-N-(2,2,2-trifluoroethyl) benzamide, 1.52 g (15.0 mmol) of triethylamine, 1.50 g of molecular sieve (4 A), 50 mL of tetrahydrofuran, and 50 mL of dichloromethane, 2.54 g (15.1 mmol) of trifluoromethanesulfonyl chloride was added under ice cooling, and the mixture was stirred at room temperature for 17 hours. Chloroform was added to thereto, and the organic layer was washed with 2N hydrochloric acid and brine, and dried over anhydrous sodium sulfate. The solvent was distilled off in vacuo, and the residue was purified by silica gel column chromatography (developing solvent, n-hexane:ethyl acetate=3:1) to obtain 2.34 g (yield: 51%) of a target product.

$^1$H-NMR data (400 MHz, DMSO-d6/TMS δ (ppm)): 1.26 (3H, d), 3.88 (1H, m), 3.96-4.14 (4H, m), 7.28 (1H, d), 7.55 (1H, d), 9.12 (1H, t), 9.62 (1H, brs)

(4) Production of (R)-2-chloro-4-fluoro-5-{2-[(1,1,1-trifluoro-N-methylmethyl)sulfonamido]propoxy}-N-(2,2,2-trifluoroethyl)benzamide (Compound of Present Invention No.: C-0191)

To a mixture of 1.18 g (2.56 mmol) of (R)-2-chloro-4-fluoro-N-(2,2,2-trifluoroethyl)-5-{2-[(trifluoromethyl)sulfonamido]propoxy}benzamide and 0.46 g (3.3 mmol) of potassium carbonate in 30 mL of acetonitrile, 0.47 g (3.3 mmol) of methyl iodide was added at room temperature, and the mixture was stirred for 23 hours. The mixture was filtered, and the solvent was distilled off in vacuo. The residue was purified by silica gel column chromatography (developing solvent, n-hexane:ethyl acetate=3:1) to obtain 0.81 g (yield: 67%) of a target product.

$^1$H-NMR data (300 MHz, $CDCl_3$/TMS δ (ppm)): 1.40 (3H, d), 3.05 (3H, s), 4.05-4.21 (4H, m), 4.40-4.51 (1H, m), 6.81 (1H, brs), 7.20 (1H, d), 7.43 (1H, d)

Example 2

Production of (S)-2-chloro-4-fluoro-5-{2-[(1,1,1-trifluoro-N-methylmethyl)sulfonamido]propoxy}-N-(2,2,2-trifluoroethyl)benzamide (Compound of Present Invention No.: C-0192)

(1) Production of (S)-(2-aminopropoxy)-2-chloro-4-fluoro-N-(2,2,2-trifluoroethyl)benzamide (Compound of Present Invention No.: A-0369)

To a mixture of 3.00 g (11.0 mmol) of 2-chloro-4-fluoro-5-hydroxy-N-(2,2,2-trifluoroethyl)benzamide, 2.13 g (12.2 mmol) of (S)-2-(tert-butoxycarbonylamino)-1-propanol, 3.19 g (12.5 mmol) of triphenylphosphine, and 60 mL of tetrahydrofuran, 2.46 g (12.17 mmol) of diisopropyl azodicarboxylate was added under ice cooling, and the mixture was stirred at room temperature for 13 hours. Further, 3.19 g (12.2 mmol) of triphenylphosphine and 2.46 g (12.2 mmol) of diisopropyl azodicarboxylate were added thereto at room temperature, and the mixture was stirred at room temperature for 8 hours. The solvent was distilled off in vacuo, and the residue was purified by silica gel column chromatography (developing solvent, n-hexane:ethyl acetate=3:1) to obtain (S)-tert-butyl-(1-{4-chloro-2-fluoro-5-[(2,2,2-trifluoroethyl)carbamoyl]phenoxy}propan-2-yl) carbamate. To a mixture of the obtained (S)-tert-butyl-(1-{4-chloro-2-fluoro-5-[(2,2,2-trifluoroethyl)carbamoyl] phenoxy}propan-2-yl)carbamate and 31 mL of dichloromethane, 14 mL of trifluoroacetic acid was added at room temperature, and the mixture was stirred for 1.5 hours. The solvent was distilled off in vacuo, 2N hydrochloric acid was added to the residue, and the aqueous layer was washed with isopropyl ether. Then, an aqueous sodium hydroxide solution was added to the obtained aqueous layer. The mixture was subjected to extraction with ethyl acetate, and the obtained organic layer was dried over anhydrous sodium sulfate. The solvent was distilled off in vacuo to obtain 3.90 g (yield: quantitative) of a crude target product. This was directly used in the next process without purification.

$^1$H-NMR data (400 MHz, $CDCl_3$/TMS δ (ppm)): 1.16 (3H, d), 3.34-3.39 (1H, m), 3.71 (1H, dd), 3.93 (1H, dd), 4.12 (2H, m), 7.14 (1H, brs), 7.15 (1H, d), 7.36 (1H, d)

(2) Production of (S)-2-chloro-4-fluoro-N-(2,2,2-trifluoroethyl)-5-{2-[(trifluoromethyl)sulfonamido]propoxy}benzamide (Compound of Present Invention No.: C-0006)

To a mixture of 1.50 g (4.56 mmol) of crude (S)-(2-aminopropoxy)-2-chloro-4-fluoro-N-(2,2,2-trifluoroethyl)benzamide, 0.69 g (6.8 mmol) of triethylamine, 0.75 g of molecular sieve (4 A), 45 mL of tetrahydrofuran, and 45 mL of dichloromethane, 1.15 g (6.82 mmol) of trifluoromethanesulfonyl chloride was added under ice cooling, and the mixture was stirred at room temperature for 17 hours. The mixture was filtered, ethyl acetate was added thereto, and the organic layer was washed with a saturated aqueous ammonium chloride solution and dried over anhydrous sodium sulfate. The solvent was distilled off in vacuo, and the residue was purified by silica gel column chromatography (developing solvent, n-hexane:ethyl acetate=3:1) to obtain 1.07 g (yield: 51%) of a target product.

$^1$H-NMR data (400 MHz, DMSO-d6/TMS δ (ppm)): 1.26 (3H, d), 3.88 (1H, brs), 3.96-4.15 (4H, m), 7.29 (1H, d), 7.55 (1H, d), 9.12 (1H, t), 9.62 (1H, brs)

(3) Production of (S)-2-chloro-4-fluoro-5-{2-[(1,1,1-trifluoro-N-methylmethyl)sulfonamido]propoxy}-N-(2,2,2-trifluoroethyl)benzamide (Compound of Present Invention No.: C-0192)

To a mixture of 0.86 g (1.9 mmol) of (S)-2-chloro-4-fluoro-N-(2,2,2-trifluoroethyl)-5-{2-[(trifluoromethyl)sulfonamido]propoxy}benzamide and 0.34 g (2.5 mmol) of potassium carbonate in 20 mL of acetonitrile, 0.34 g (2.4 mmol) of methyl iodide was added at room temperature, and the mixture was stirred for 23 hours. The mixture was filtered, and the solvent was distilled off in vacuo. The residue was purified by silica gel column chromatography (developing solvent, n-hexane:ethyl acetate=3:1) to obtain 0.86 g (yield: 97%) of a target product.

$^1$H-NMR data (300 MHz, $CDCl_3$/TMS δ (ppm)): 1.41 (3H, d), 3.05 (3H, s), 4.03-4.22 (4H, m), 4.40-4.51 (1H, m), 6.80 (1H, brs), 7.20 (1H, d), 7.44 (1H, d)

Example 3

Production of 2-chloro-4-fluoro-5-{2-methyl-3-[(trifluoromethyl)thio]propoxy}-N-(2,2,2-trifluoroethyl)benzamide (compound of present invention No.: B-0009)

(1) Production of 2-chloro-5-(3-chloro-2-methylpropoxy)-4-fluoro-N-(2,2,2-trifluoroethyl)benzamide (compound of present invention No.: A-0037)

To a mixture of 3.00 g (11.0 mmol) of 2-chloro-4-fluoro-5-hydroxy-N-(2,2,2-trifluoroethyl)benzamide and 100 mL of N,N-dimethylformamide, 1.99 g (14.4 mmol) of potassium carbonate, 0.36 g (1.1 mmol) of tetrabutylammonium bromide, and 3.79 g (22.1 mmol) of 1-bromo-3-chloro-2-methylpropane were added at room temperature, and the mixture was stirred at 70° C. for 7 hours. The mixture was allowed to cool at room temperature and then filtered, and ethyl acetate and hexane were added thereto. The mixture was washed with water, and dried over anhydrous sodium sulfate. The solvent was distilled off in vacuo, and the residue was purified by silica gel column chromatography (developing solvent, n-hexane:ethyl acetate=5:1) to obtain 3.71 g (purity: about 50%, yield: 46%) of a target product.

$^1$H-NMR data (400 MHz, $CDCl_3$/TMS δ (ppm)): 1.15 (3H, d), 2.32-2.48 (1H, m), 3.68 (2H, ddd), 3.98-4.19 (4H, m), 6.79 (1H, brs), 7.16 (1H, d), 7.44 (1H, d)

(2) Production of 2-chloro-4-fluoro-5-(2-methyl-3-thiocyanatopropoxy)-N-(2,2,2-trifluoroethyl)benzamide (Compound of Present Invention No.: A-0758)

To a mixture of 3.71 g (purity: about 50%, about 5.12 mmol) of 2-chloro-5-(3-chloro-2-methylpropoxy)-4-fluoro- N-(2,2,2-trifluoroethyl)benzamide and 60 mL of ethanol, 1.99 g (20.5 mmol) of potassium thiocyanate and 0.17 g (1.0 mmol) of potassium iodide were added at room temperature, and the mixture was stirred under reflux for 3 days. The mixture was allowed to cool at room temperature and then filtered, and the solvent was distilled off in vacuo. The residue was purified by silica gel column chromatography (developing solvent, n-hexane:ethyl acetate=3:1) to obtain 0.84 g (yield: 43%) of a target product.

$^1$H-NMR data (300 MHz, $CDCl_3$/TMS δ (ppm)): 1.24 (3H, d), 2.40-2.55 (1H, m), 3.06 (1H, dd), 3.23 (1H, dd), 3.99 (1H, dd), 4.07-4.18 (3H, m), 6.83 (1H, brs), 7.17 (1H, d), 7.42 (1H, d)

(3) Production of 2-chloro-4-fluoro-5-{2-methyl-3-[(trifluoromethyl)thio]propoxy}-N-(2,2,2-trifluoroethyl)benzamide (Compound of Present Invention No.: B-0009)

To a mixture of 0.76 g (2.0 mmol) of 2-chloro-4-fluoro-5-(2-methyl-3-thiocyanatopropoxy)-N-(2,2,2-trifluoroethyl)benzamide, 0.70 g (4.9 mmol) of (trifluoromethyl)trimethylsilane, and 20 mL of tetrahydrofuran, 0.2 mL (0.2 mmol) of tetrabutylammonium fluoride (about 1 mol/L tetrahydrofuran solution) was added under ice cooling, and the mixture was stirred at 0° C. for 4 hours. The solvent was distilled off in vacuo, ethyl acetate was added to the residue. The mixture was washed with a saturated aqueous sodium bicarbonate solution, and dried over anhydrous sodium sulfate. The solvent was distilled off in vacuo, and the residue was purified by silica gel column chromatography (developing solvent, n-hexane:ethyl acetate=5:1) to obtain 0.47 g (yield: 56%) of a target product.

$^1$H-NMR data (300 MHz, $CDCl_3$/TMS δ (ppm)): 1.18 (3H, d), 2.27-2.40 (1H, m), 2.94 (1H, dd), 3.13 (1H, dd), 3.95 (1H, dd), 4.06 (1H, dd), 4.14 (2H, m), 6.81 (1H, brs), 7.17 (1H, d), 7.42 (1H, d)

Example 4

Production of N-acetyl-2-chloro-4-fluoro-N-(2,2,2-trifluoroethyl)-5-({5-[(trifluoromethyl)thio]pentyl}oxy)benzamide (Compound of Present Invention No.: A-6814)

To a mixture of 0.30 g (0.68 mmol) of 2-chloro-4-fluoro-N-(2,2,2-trifluoroethyl)-5-({5-[(trifluoromethyl)thio]pentyl}oxy)benzamide in 12 mL of N,N-dimethylformamide, 0.038 g (purity: 55%, 0.87 mmol) of sodium hydride was added at room temperature, and the mixture was stirred at room temperature for 30 minutes. Thereafter, 0.069 g (0.88 mmol) of acetyl chloride was added under ice cooling, and the mixture was further stirred at room temperature for 1.5 hours. Ethyl acetate and hexane were added thereto, and the mixture was washed with a saturated aqueous sodium bicarbonate solution and brine, and dried over anhydrous magnesium sulfate. The solvent was distilled off in vacuo, and the residue was purified by silica gel column chromatography (developing solvent, n-hexane:ethyl acetate=5:1) to obtain 0.22 g (yield: 67%) of a target product.

$^1$H-NMR data (300 MHz, $CDCl_3$/TMS δ (ppm)): 1.56-1.66 (2H, m), 1.74-1.91 (4H, m), 2.37 (3H, s), 2.91 (2H, t), 4.04 (2H, t), 4.40 (2H, brd), 7.02 (1H, d), 7.18 (1H, d)

Example 5

Production of 2-chloro-N-(cyanomethyl)-4-fluoro-N-(2,2,2-trifluoroethyl)-5-({5-[(trifluoromethyl)thio]pentyl}oxy)benzamide (Compound of Present Invention No.: A-6692)

To a mixture of 0.40 g (0.91 mmol) of 2-chloro-4-fluoro-N-(2,2,2-trifluoroethyl)-5-((5-((trifluoromethyl)thio)pentyl)oxy)benzamide in 20 mL of N,N-dimethylformamide, 0.124 g (purity: 55%, 2.84 mmol) of sodium hydride was added at room temperature, and the mixture was stirred at room temperature for 30 minutes.

Thereafter, 0.55 g (4.6 mmol) of bromoacetonitrile was added thereto at room temperature, and the mixture was further stirred at room temperature for 3 hours. Ethyl acetate and hexane were added thereto, and the mixture was washed with a saturated aqueous sodium bicarbonate solution and brine, and dried over anhydrous magnesium sulfate. The solvent was distilled off in vacuo, and the residue was purified by silica gel column chromatography (developing solvent, n-hexane:ethyl acetate=5:1) to obtain 0.18 g (yield: 41%) of a target product.

$^1$H-NMR data (300 MHz, $CDCl_3$/TMS δ (ppm)): 1.60-1.66 (2H, m), 1.72-1.88 (4H, m), 2.91 (2H, t), 3.86-4.91 (6H, m), 6.89-6.97 (1H, m), 7.15-7.26 (1H, m)

Example 6

Production of 4-fluoro-2-methyl-N-(2,2,2-trifluoroethyl)-5-({5-[(trifluoromethyl)thio]pentyl}oxy)benzamide (Compound of Present Invention No.: A-4712)

(1) Production of 2-fluoro-4-methylphenyl methanesulfonate

To a mixture of 6.03 g (47.8 mmol) of 2-fluoro-4-methylphenol, 5.31 g (52.5 mmol) of triethylamine, and 70 mL of dichloromethane, 6.02 g (52.6 mmol) of methanesulfonyl chloride was added under ice cooling, and the mixture was stirred at room temperature for 5 hours.

Then, 2N hydrochloric acid was added thereto, and the mixture was subjected to extraction with chloroform. The obtained organic layer was washed with brine, and dried over anhydrous magnesium sulfate. The solvent was distilled off in vacuo, and the residue was purified by silica gel column chromatography (developing solvent, n-hexane:ethyl acetate=5:1) to obtain 9.76 g (yield: quantitative) of a target product.

$^1$H-NMR data (400 MHz, $CDCl_3$/TMS δ (ppm)): 2.36 (3H, s), 3.19 (3H, s), 6.97 (1H, d), 7.02 (1H, d), 7.25 (1H, t)

(2) Production of 2-fluoro-5-iodo-4-methylphenyl methanesulfonate

A mixture of 2.18 g (8.59 mmol) of powdery iodine, 1.00 g (4.67 mmol) of potassium iodate, and 90 mL of a 90% aqueous sulfuric acid solution was stirred at 50° C. for 1 hour. Further, a mixture of 4.00 g (19.6 mmol) of 2-fluoro-4-methylphenyl methanesulfonate and 10 mL of 90% sulfuric acid was added dropwise at 0° C. The mixture was stirred for 1.5 hours at 0° C. The mixture was added dropwise to ice water, and this was subjected to extraction with toluene. The obtained organic layer was washed with an aqueous sodium thiosulfate solution, a saturated aqueous sodium bicarbonate solution, and brine, and dried over anhydrous magnesium sulfate. The solid obtained by distilling off the solvent in vacuo was washed with a mixed solution of hexane and isopropyl ether, and then filtered, followed by drying to obtain 6.14 g (yield: 95%) of a target product.

$^1$H-NMR data (400 MHz, $CDCl_3$/TMS δ (ppm)): 2.43 (3H, s), 3.22 (3H, s), 7.12 (1H, d), 7.78 (1H, d)

(3) Production of 2-fluoro-5-iodo-4-methylphenol

To a mixture of 8.05 g (24.4 mmol) of 2-fluoro-5-iodo-4-methylphenyl methanesulfonate and 30 mL of water, 2.93 g (73.3 mmol) of sodium hydroxide was added at room temperature, and the mixture was stirred under reflux for 3 hours. Then, 2N hydrochloric acid was added thereto, and the mixture was subjected to extraction with ethyl acetate. The obtained organic layer was washed with brine, and dried over anhydrous magnesium sulfate. The solvent was distilled off in vacuo, and the residue was purified by silica gel column chromatography (developing solvent, n-hexane: ethyl acetate=7:1) to obtain 6.18 g (yield: quantitative) of a target product.

$^1$H-NMR data (400 MHz, $CDCl_3$/TMS δ (ppm)): 2.33 (3H, s), 5.47 (1H, brs), 6.96 (1H, d), 7.44 (1H, d)

(4) Production of 1-[(5-bromopentyl)oxy]-2-fluoro-5-iodo-4-methylbenzene

To a solution of 5.00 g (19.8 mmol) of 2-fluoro-5-iodo-4-methylphenol, 22.8 g (99.2 mmol) of 1,5-dibromopentane, and 250 mL of acetonitrile, 3.56 g (25.8 mmol) of potassium carbonate and 0.64 g (1.99 mmol) of tetrabutylammonium bromide were added at room temperature, and the mixture was stirred under reflux for 2 hours. The mixture was allowed to cool at room temperature and then filtered, and the solvent was distilled off in vacuo (0.1 mmHg, 65° C.). The residue was purified by silica gel column chromatography (developing solvent, n-hexane:ethyl acetate=20:1) to obtain 7.17 g (yield: 90%) of a target product.

$^1$H-NMR data (300 MHz, $CDCl_3$/TMS δ (ppm)): 1.60-1.68 (2H, m), 1.78-1.88 (2H, m), 1.89-1.99 (2H, m), 2.34 (3H, s), 3.44 (2H, t), 3.99 (2H, t), 6.96 (1H, d), 7.34 (1H, d)

(5) Production of 1-fluoro-4-iodo-5-methyl-2-((5-thiocyanatopentyl)oxy)benzene

To a mixed solution of 7.07 g (17.6 mmol) of 1-((5-bromopentyl)oxy)-2-fluoro-5-iodo-4-methylbenzene and 80 mL of ethanol, 3.47 g (35.7 mmol) of potassium thiocyanate was added at room temperature, and the mixture was stirred under reflux for 4 hours.

The mixture was allowed to cool at room temperature and then filtered, and the solvent was distilled off in vacuo. Ethyl acetate was added to the residue, and this was washed with brine and dried over anhydrous magnesium sulfate. The solvent was distilled off in vacuo, and the residue was purified by silica gel column chromatography (developing solvent, n-hexane:ethyl acetate=9:1) to obtain 6.10 g (yield: 91%) of a target product.

$^1$H-NMR data (300 MHz, $CDCl_3$/TMS δ (ppm)): 1.60-1.70 (2H, m), 1.80-1.97 (4H, m), 2.34 (3H, s), 2.98 (2H, t), 4.00 (2H, t), 6.96 (1H, d), 7.34 (1H, d)

(6) Production of [5-(2-fluoro-5-iodo methylphenoxy)pentyl](trifluoromethyl)sulfane To a mixture of 5.99 g (15.8 mmol) of 1-fluoro-4-iodo-5-methyl-2-[(5-thiocyanatopentyl)oxy]benzene, 8.98 g (63.2 mmol) of (trifluoromethyl)trimethylsilane, and 80 mL of tetrahydrofuran, 1.6 mL (1.6 mmol) of tetrabutylammonium fluoride (about 1 mol/L tetrahydrofuran solution) was added under ice cooling, and the mixture was stirred for 2.5 hours while the same temperature was maintained. The solvent was distilled off in vacuo, ethyl acetate was added to the residue, and this was washed with brine and dried over anhydrous magnesium sulfate. The solvent was distilled off in vacuo, and the residue was purified by silica gel column chromatography (developing solvent, n-hexane:ethyl acetate=15:1) to obtain 6.44 g (yield: 97%) of a target product.

$^1$H-NMR data (300 MHz, $CDCl_3$/TMS δ (ppm)): 1.54-1.65 (2H, m), 1.73-1.87 (4H, m), 2.34 (3H, s), 2.91 (2H, t), 3.98 (2H, t), 6.96 (1H, d), 7.33 (1H, d)

(7) Production of 4-fluoro-2-methyl-5-({5-[(trifluoromethyl)thio]pentyl}oxy)benzoic acid (Compound of Present Invention No.: F-0965)

A mixed solution of 1.93 g (28.4 mmol) of sodium formate, 1.93 g (18.9 mmol) of acetic anhydride, 2.45 g (19.0 mmol) of N,N-diisopropylethylamine, and 17 mL of N,N-dimethylformamide was stirred at room temperature for 1 hour under a nitrogen stream.

The resulting mixed solution was added to a mixed solution of 2.00 g (4.74 mmol) of (5-(2-fluoro-5-iodo-4-methylphenoxy)pentyl) (trifluoromethyl)sulfane, 0.22 g (0.24 mmol) of tris(dibenzylideneacetone)dipalladium, 0.60 g (14 mmol) of lithium chloride, and 20 mL of N,N-dimethylformamide at room temperature, and the mixture was stirred at 80° C. for 3 hours. After the mixture was allowed to cool to room temperature, a mixed solution obtained by stirring 1.93 g (28.4 mmol) of sodium formate, 1.93 g (18.9 mmol) of acetic anhydride, 2.45 g (19.0 mmol) of N,N-diisopropylethylamine, and 17 mL of N,N-dimethylformamide at room temperature for 0.5 hours under a nitrogen stream was added thereto. The mixture was stirred at 80° C. for 1 hour. After the mixture was allowed to cool to room temperature, ethyl acetate was added thereto. The mixture was washed with 2N hydrochloric acid and brine, and dried over anhydrous magnesium sulfate. The solvent was distilled off in vacuo to obtain 2.12 g of a crude target product.

$^1$H-NMR data (300 MHz, $CDCl_3$/TMS δ (ppm)): 1.57-1.66 (2H, m), 1.74-1.91 (4H, m), 2.57 (3H, s), 2.92 (2H, t), 4.06 (2H, t), 7.10 (1H, d), 7.67 (1H, d)

(8) Production of 4-fluoro-2-methyl-N-(2,2,2-trifluoroethyl)-5-({5-[(trifluoromethyl)thio]pentyl}oxy) benzamide (Compound of Present Invention No.: A-4712)

To a mixture of 2.12 g of crude 4-fluoro-2-methyl-5-({5-[(trifluoromethyl)thio]pentyl}oxy)benzoic acid, 1.09 g (5.69 mmol) of 1-ethyl-3-(3-dimethylaminopropyl)carbodiimide hydrochloride, 0.87 g (5.7 mmol) of 1-hydroxybenzotriazole monohydrate, 0.94 g (9.5 mmol) of 2,2,2-trifluoroethylamine, 15 mL of tetrahydrofuran, and 15 mL of dichloromethane, 0.96 g (9.5 mmol) of triethylamine was added under ice cooling, and the mixture was stirred at room temperature for 20 hours. The solvent was distilled off from the reaction mixture in vacuo, and ethyl acetate was added to the residue. The organic layer was washed with a saturated aqueous sodium bicarbonate solution and brine, and dried over anhydrous magnesium sulfate. The solvent was distilled off in vacuo, and the residue was purified by silica gel column chromatography (developing solvent, n-hexane:ethyl acetate=5:1) to obtain 0.97 g (yield: 49%, 2 processes) of a target product.

$^1$H-NMR data (300 MHz, $CDCl_3$/TMS δ (ppm)): 1.56-1.66 (2H, m), 1.73-1.89 (4H, m), 2.36 (3H, s), 2.92 (2H, t), 4.02 (2H, t), 4.04-4.15 (2H, m), 5.95 (1H, brs), 6.95 (1H, d), 7.00 (1H, d)

Example 7

Production of 2-chloro-4-fluoro-N-(2,2,2-trifluoroethyl)-5-({5-[(trifluoromethyl)thio]pentyl}oxy)benzamide (Compound of Present Invention No.: A-4689)

(1) Production of 4-chloro-2-fluorophenyl methanesulfonate

To a mixture of 40.0 g (273 mmol) of 4-chloro-2-fluorophenol, 30.4 g (300 mmol) of triethylamine, and 400 mL of dichloromethane, 34.4 g (300 mmol) of methanesulfonyl chloride was added under ice cooling, and the mixture was stirred at room temperature for 19 hours. Then, 2N hydrochloric acid was added thereto, and the mixture was subjected to extraction with chloroform. The obtained organic layer was washed with brine, and dried over anhydrous magnesium sulfate. The solvent was distilled off in vacuo to obtain 64.47 g of a crude target product.

$^1$H-NMR data (300 MHz, $CDCl_3$/TMS δ (ppm)): 7.16-7.21 (1H, m), 7.26 (1H, dd), 7.33 (1H, t)

(2) Production of 4-chloro-2-fluoro-5-iodophenyl methanesulfonate

A mixture of 30.48 g (120.1 mmol) of powdery iodine, 14.02 g (65.5 mmol) of potassium iodate, and 1,200 mL of a 90% aqueous sulfuric acid solution was stirred at 50° C. for 1 hour. Further, a mixture of 64.47 g of crude 4-chloro-2-fluorophenyl methanesulfonate and 50 mL of 90% sulfuric acid was added dropwise at 0° C. After the dropwise addition, the mixture was stirred for 3 hours at 0° C. The mixture was added dropwise to ice water, and this was subjected to extraction with toluene. The obtained organic layer was washed with a saturated aqueous sodium bicarbonate solution and brine, and dried over anhydrous magnesium sulfate. The solid obtained by distilling off the solvent in vacuo was washed with a mixed solution of hexane and isopropyl ether, and then filtered, followed by drying to obtain 67.05 g (yield: 70%, 2 processes) of a target product.

$^1$H-NMR data (400 MHz, $CDCl_3$/TMS δ (ppm)): 3.25 (3H, s), 7.37 (1H, d), 7.84 (1H, d)

(3) Production of 4-chloro-5-cyano-2-fluorophenyl methanesulfonate

To 15.0 g (42.8 mmol) of 4-chloro-2-fluoro-5 iodophenyl methanesulfonate, 5.02 g (42.8 mmol) of zinc cyanide, and 250 mL of N,N-dimethylformamide, 4.50 g (3.89 mmol) of tetrakis(triphenylphosphine)palladium was added at room temperature, and the mixture was stirred at 80° C. for 4.5 hours. After the mixture was allowed to cool at room temperature, ethyl acetate and hexane were added. The mixture was washed with a saturated aqueous sodium bicarbonate solution and brine, and then dried over anhydrous magnesium sulfate. The solvent was distilled off in vacuo, and the residue was purified by silica gel column chromatography (developing solvent, n-hexane:ethyl acetate=8:1) to obtain 9.02 g (yield: 84%) of a target product.

$^1$H-NMR data (400 MHz, $CDCl_3$/TMS δ (ppm)): 3.31 (3H, s), 7.44 (1H, d), 7.73 (1H, d)

(4) Production of 2-chloro-4-fluoro-5-hydroxybenzoic acid

A mixed solution of 21.80 g (87.33 mmol) of 4-chloro-5-cyano-2-fluorophenyl methanesulfonate and 320 mL of a 60% aqueous sulfuric acid solution was stirred at 120° C. for 27 hours. The mixed solution was allowed to cool at room temperature, and then added to ice water. This was subjected to extraction with toluene, and the obtained organic layer was dried over anhydrous magnesium sulfate. The solid obtained by distilling off the solvent in vacuo was washed with a chloroform solution, and then filtered, followed by drying to obtain 10.39 g (yield: 62%) of a target product.

$^1$H-NMR data (400 MHz, DMSO-d6/TMS δ (ppm)): 7.42 (1H, d), 7.44 (1H, d)

(5) Production of 2-chloro-4-fluoro-5-hydroxy-N-(2,2,2-trifluoroethyl)benzamide (Compound of Present Invention No.: E-0006)

To a mixture of 9.46 g (49.6 mmol) of 2-chloro-4-fluoro-5-hydroxybenzoic acid, 11.42 g (59.57 mmol) of 1-ethyl-3-(3-dimethylaminopropyl)carbodiimide hydrochloride, 9.11 g (59.5 mmol) of 1-hydroxybenzotriazole monohydrate, 9.84 g (99.3 mmol) of 2,2,2-trifluoroethylamine, and 500 mL of N,N-dimethylformamide, 10.05 g (99.32 mmol) of triethylamine was added under ice cooling, and the mixture was stirred at room temperature for 14 hours. Ethyl acetate was added thereto, and the mixture was washed with 2N hydrochloric acid, and dried over anhydrous magnesium sulfate. The solvent was distilled off in vacuo, and the residue was purified by silica gel column chromatography (developing solvent, n-hexane:ethyl acetate=1:3) to obtain 12.55 g (yield: 93%) of a target product.

$^1$H-NMR data (400 MHz, DMSO/TMS δ (ppm)): 4.00-4.09 (2H, m), 6.99 (1H, d), 7.44 (1H, d), 9.09 (1H, t), 10.48 (1H, s)

(6) Production of 5-[(5-bromopentyl)oxy]-2-chloro fluoro-N-(2,2,2-trifluoroethyl)benzamide (Compound of Present Invention No.: A-0030)

To a solution of 1.09 g (4.01 mmol) of 2-chloro-4-fluoro-5-hydroxy-N-(2,2,2-trifluoroethyl)benzamide, 4.99 g (21.7 mmol) of 1,5-dibromopentane, and 50 mL of N,N-dimethylformamide, 0.78 g (5.6 mmol) of potassium carbonate and 0.14 g (0.43 mmol) of tetrabutylammonium bromide were added at room temperature, and the mixture was stirred at 100° C. for 2.5 hours. The mixture was allowed to cool to room temperature and then filtered, and ethyl acetate was added thereto. The mixture was washed with water, and dried over anhydrous magnesium sulfate. The solvent was distilled off in vacuo, and the residue was purified by silica gel column chromatography (developing solvent, n-hexane: ethyl acetate=5:1) to obtain 0.87 g (yield: 52%) of a target product.

$^1$H-NMR data (400 MHz, $CDCl_3$/TMS δ (ppm)): 1.60-1.67 (2H, m), 1.83-1.98 (4H, m), 3.44 (2H, t), 4.06 (2H, t), 4.09-4.17 (2H, m), 6.79 (1H, brs), 7.15 (1H, d), 7.41 (1H, d)

(7) Production of 2-chloro-4-fluoro-5-[(5-thiocyanatopentyl)oxy]-N-(2,2,2-trifluoroethyl)benzamide (Compound of Present Invention No.: A-0752)

To a mixed solution of 0.79 g (1.9 mmol) of 5-[(5-bromopentyl)oxy]-2-chloro-4-fluoro-N-(2,2,2-trifluoroethyl)benzamide and 20 mL of ethanol, 0.37 g (3.8 mmol) of potassium thiocyanate was added at room temperature, and the mixture was stirred under reflux for 4 hours. The mixture was allowed to cool at room temperature and then filtered, and the solvent was distilled off in vacuo. Ethyl acetate was added to the residue, and this was washed with brine and dried over anhydrous magnesium sulfate. The solvent was distilled off in vacuo, and the residue was purified by silica gel column chromatography (developing solvent, n-hexane:ethyl acetate=5:1) to obtain 0.66 g (yield: 88%) of a target product.

$^1$H-NMR data (300 MHz, $CDCl_3$/TMS δ (ppm)): 1.61-1.71 (2H, m), 1.84-1.97 (4H, m), 2.99 (2H, t), 4.06-4.19 (4H, m), 6.79 (1H, brs), 7.17 (1H, d), 7.42 (1H, d)

(8) Production of 2-chloro-4-fluoro-N-(2,2,2-trifluoroethyl)-5-({5-[(trifluoromethyl)thio]pentyl}oxy)benzamide (Compound of Present Invention No.: A-4689)

To a mixture of 0.58 g (1.5 mmol) of 2-chloro-4-fluoro-5-[(5-thiocyanatopentyl)oxy]-N-(2,2,2-trifluoroethyl)benzamide, 0.88 g (6.2 mmol) of (trifluoromethyl)trimethylsilane, and 10 mL of tetrahydrofuran, 0.16 mL (0.16 mmol) of tetrabutylammonium fluoride (about 1 mol/L tetrahydrofuran solution) was added under ice cooling, and the mixture was stirred for 3 hours. The solvent was distilled off in vacuo, and the residue was purified by silica gel column chromatography (developing solvent, n-hexane:ethyl acetate=7:1) to obtain 0.60 g (yield: 93%) of a target product.

$^1$H-NMR data (400 MHz, $CDCl_3$/TMS δ (ppm)): 1.57-1.64 (2H, m), 1.75-1.89 (4H, m), 2.91 (2H, t), 4.06 (2H, t), 4.09-4.18 (2H, m), 6.77 (1H, brs), 7.16 (1H, d), 7.43 (1H, d)

Example 8

Production of 2-chloro-4-fluoro-N-(2,2,2-trifluoroethyl)-5-({5-[(trifluoromethyl)thio]pentyl}oxy)thiobenzamide (Compound of Present Invention No.: A-5172)

A mixture of 0.16 g (0.36 mmol) of 2-chloro-4-fluoro-N-(2,2,2-trifluoroethyl)-5-({5-[(trifluoromethyl)thio]pentyl}oxy)benzamide, 0.15 g (0.37 mmol) of a Lawesson's reagent, and 15 mL of toluene was heated reflux for 15 hours. After the mixture was cooled at room temperature, the precipitated solid was removed by filtration, and the filtrate was concentrated in vacuo. The residue was purified by silica gel column chromatography (developing solvent, n-hexane:ethyl acetate=4:1) to obtain 0.15 g (yield: 90%) of a target product.

$^1$H-NMR data (400 MHz, $CDCl_3$/TMS δ (ppm)): 1.54-1.64 (2H, m), 1.74-1.89 (4H, m), 2.91 (2H, t), 4.05 (2H, t), 4.55-4.63 (2H, m), 7.12 (1H, d), 7.25 (1H, d), 7.52 (1H, brs)

Example 9

Production of ethyl 4-fluoro-5-hydroxy-2-methylbenzoate (1) Production of 5-bromo-4-fluoro-2-methylbenzoic acid To a mixture of 20.00 g (129.8 mmol) of 4-fluoro-2-methylbenzoic acid and 100 mL of concentrated sulfuric acid, 24.24 g (136.2 mmol) of N-bromosuccinimide was added at 0° C. or lower, and the mixture was stirred at room temperature overnight. The mixture was poured into ice water, and the precipitated solid was filtered and washed with hexane and water. The obtained solid was dissolved in ethyl acetate, washed with water and brine, and dried over anhydrous magnesium sulfate. The solvent was distilled off in vacuo to obtain 30.30 g of a crude target product (including regioisomers). This was directly used in the next process without purification.

$^1$H-NMR data (400 MHz, $CDCl_3$/TMS δ (ppm)): 2.51 (3H, t), 7.37 (1H, d), 8.07 (1H, d), 13.23 (1H, brs)

(2) Production of ethyl 5-bromo-4-fluoro-2-methylbenzoate

To a mixture of 30.30 g of crude 5-bromo-4-fluoro-2-methylbenzoic acid, 19.76 g (0.143 mol) of potassium carbonate, and 200 mL of N,N-dimethylformamide, 22.25 g (0.143 mol) of ethyl iodide was added under ice cooling. The mixture was stirred at room temperature overnight, and ethyl acetate and hexane were added thereto. The mixture was washed with water and brine, and dried over anhydrous magnesium sulfate. The solvent was distilled off in vacuo and purified by recrystallization with hexane to obtain 16.97 g (yield: 49%, 2 processes) of a target product.

$^1$H-NMR data (400 MHz, $CDCl_3$/TMS δ (ppm)): 1.40 (3H, t), 2.57 (3H, s), 4.35 (2H, q), 7.00 (1H, d), 8.14 (1H, d)

(3) Production of [5-(ethoxycarbonyl)-2-fluoro-4-methylphenyl]boronic acid

To a mixture of 2.0 g (7.7 mmol) of ethyl 5-bromo-4-fluoro-2-methylbenzoate and 20 mL of tert-butyl methyl ether, 17.01 mL (1.0 M THF solution, 17.01 mmol) of isopropylmagnesium chloride was added at −60° C. After the mixture was stirred at room temperature for 1 hour, 2.16 g (11.5 mmol) of triisopropyl borate was added thereto at −60° C., and the mixture was stirred at room temperature overnight. A 15% aqueous sulfuric acid solution was added under ice cooling, and this was further stirred at room temperature for 4 hours. Ethyl acetate was added thereto, and the mixture was washed with water and brine, and dried over anhydrous magnesium sulfate. The solvent was distilled off in vacuo, and the obtained solid was washed with hexane to obtain 1.23 g (yield: 71%) of a target product.

$^1$H-NMR data (400 MHz, $CDCl_3$/TMS δ (ppm)): 1.40 (3H, t), 2.63 (3H, s), 4.36 (2H, q), 5.29 (2H, d), 6.93 (1H, d), 8.40 (1H, d)

(4) Production of ethyl 4-fluoro-5-hydroxy-2-methylbenzoate

To a mixture of 4.03 g (17.8 mmol) of [5-(ethoxycarbonyl)-2-fluoro-4-methylphenyl]boronic acid and 70 mL of toluene, 19.61 mL (50% aqueous solution, about 4.8 mol/L, 94 mmol) of 4-methylmorpholine-N-oxide was added at room temperature, and the mixture was stirred under reflux for 8 hours. After the mixture was allowed to cool at room temperature, 2N hydrochloric acid and brine were added thereto. The obtained organic layer was dried over anhydrous magnesium sulfate. The solvent was distilled off in vacuo, and the residue was purified by silica gel column chromatography (developing solvent, n-hexane:ethyl acetate=5:1) to obtain 2.89 g (yield: 82%) of a target product.

$^1$H-NMR data (400 MHz, $CDCl_3$/TMS δ (ppm)): 1.38 (3H, t), 2.52 (3H, s), 4.33 (2H, q), 5.13 (1H, brs), 6.94 (1H, d), 7.62 (1H, d)

Example 10

Production of N-acetyl-2-chloro-4-fluoro-N-(2,2,2-trifluoroethyl)-5-{2-[(trifluoromethyl)sulfonamido]propoxy}benzamide (Compound of Present Invention No.: C-4214)

(1) Production of tert-butyl(1-{4-chloro-2-fluoro-5-[(2,2,2-trifluoroethyl)carbamoyl]phenoxy}propan-2-yl)[(trifluoromethyl)sulfonyl]carbamate (Compound of Present Invention No.: C-9422)

To a mixture of 0.60 g (1.3 mmol) of 2-chloro-4-fluoro-N-(2,2,2-trifluoroethyl)-5-{2-[(trifluoromethyl)sulfonamido]propoxy}benzamide (compound of present invention No.: C-0004) produced by a similar method to that of Example 2 (1) and (2), 0.16 g (1.6 mmol) of triethylamine, 15.9 mg (0.130 mmol) of 4-dimethylaminopyridine, and 4 mL of tetrahydrofuran, 0.28 g (1.3 mmol) of di-tert-butyl dicarbonate was added at room temperature, and the mixture was stirred at room temperature for 24 hours. An aqueous citric acid solution was added to the mixture, and the mixture was subjected extraction with ethyl acetate. The obtained organic layer was washed with water and brine, and dried over anhydrous magnesium sulfate. The solvent was distilled off in vacuo, and the residue was purified by silica gel column chromatography (developing solvent, n-hexane: ethyl acetate=2:1) to obtain 0.45 g (yield: 62%) of a target product.

$^1$H-NMR data (400 MHz, $CDCl_3$/TMS δ (ppm)): 1.50 (9H, s), 1.53 (3H, d), 4.08-4.22 (3H, m), 4.48 (1H, t), 4.71 (1H, m), 6.74 (1H, brs), 7.18 (1H, d), 7.43 (1H, d)

(2) Production of tert-butyl(1-{5-[acetyl(2,2,2-trifluoroethyl)carbamoyl]-4-chloro-2-fluorophenoxy}propan-2-yl)[(trifluoromethyl)sulfonyl]carbamate (Compound of Present Invention No.: C-10702)

To a mixture of 0.44 g (0.78 mmol) of tert-butyl(1-{4-chloro-2-fluoro-5-[(2,2,2-trifluoroethyl)carbamoyl]phenoxy}propan-2-yl)[(trifluoromethyl)sulfonyl]carbamate and 10 mL of tetrahydrofuran, 44.5 mg (purity: 55%, 1.02 mmol) of sodium hydride was added at room temperature, and the mixture was stirred at room temperature for 10 minutes. Then, 0.08 g (1 mmol) of acetyl chloride was added thereto at room temperature, and the mixture was stirred at room temperature for 2 hours. An aqueous citric acid solution was added to the mixture, and the mixture was subjected extraction with ethyl acetate. The obtained organic layer was washed with water and brine, and dried over anhydrous magnesium sulfate. The solvent was distilled off in vacuo, and the residue was purified by silica gel column chromatography (developing solvent, n-hexane:ethyl acetate=3:1) to obtain 0.36 g (yield: 76%) of a target product.

$^1$H-NMR data (400 MHz, $CDCl_3$/TMS δ (ppm)): 1.50 (9H, s), 1.53 (3H, d), 2.37 (3H, s), 4.17 (1H, m), 4.31-4.49 (3H, m), 4.70 (1H, m), 7.04 (1H, d), 7.19 (1H, d)

(3) Production of N-acetyl-2-chloro-4-fluoro-N-(2,2,2-trifluoroethyl)-5-{2-[(trifluoromethyl)sulfonamido]propoxy}benzamide (Compound of Present Invention No.: C-4214)

To a mixture of 0.30 g (0.50 mmol) of tert-butyl(1-{5-[acetyl(2,2,2-trifluoroethyl)carbamoyl]-4-chloro-2-fluorophenoxy}propan-2-yl)[(trifluoromethyl)sulfonyl]carbamate and 6 mL of chloroform, 3 mL of trifluoroacetic acid was added at room temperature, and the mixture was stirred at room temperature for 4 hours. The solvent was distilled off in vacuo, and the residue was purified by silica gel column chromatography (developing solvent, n-hexane: ethyl acetate=3:1) to obtain 0.19 g (yield: 76%) of a target product.

$^1$H-NMR data (400 MHz, $CDCl_3$/TMS δ (ppm)): 1.48 (3H, d), 2.39 (3H, s), 3.99 (3H, m), 4.40 (2H, q), 5.28 (1H, d), 7.03 (1H, d), 7.22 (1H, d)

Example 11

Production of (S)-2-chloro-N-cyclopropyl-4-fluoro-5-(2-{[1,1,1-trifluoro-N-(methoxymethyl)methyl]sulfonamido}propoxy)benzamide (Compound of Present Invention No.: C-0664)

(1) Production of 4-chloro-2-fluorophenyl methyl carbonate

To a mixture of 50.00 g (341.2 mmol) of 4-chloro-2-fluorophenol, 15.01 g (375.3 mmol) of sodium hydroxide, and 340 mL of water, 38.69 g (409.5 mmol) of methyl chloroformate was added in an ice bath, and the mixture was stirred at room temperature for 2 hours. Water was added to the mixture, and the mixture was subjected to extraction with hexane. The obtained organic layer was washed with brine, and dried over anhydrous magnesium sulfate. The solvent was distilled off in vacuo to obtain 69.40 g (yield: 99%) of a target product.

$^1$H-NMR data (400 MHz, $CDCl_3$/TMS δ (ppm)): 3.94 (3H, s), 7.12-7.20 (2H, m), 7.22 (1H, dd)

(2) Production of 5-bromo-4-chloro-2-fluorophenyl methyl carbonate

To a mixture of 34.13 g (166.8 mmol) of 4-chloro-2-fluorophenyl methyl carbonate and 140 mL of concentrated sulfuric acid, 26.24 g (91.77 mmol) of 1,3-dibromo-5,5-dimethylhydantoin was added little by little in an ice bath, and the mixture was stirred in an ice bath for 2 hours. The mixture was poured into ice, followed by extraction with dichloromethane. The obtained organic layer was washed with a saturated aqueous sodium bicarbonate solution, an aqueous sodium thiosulfate solution, and brine, and dried over anhydrous magnesium sulfate. The solvent was distilled off in vacuo to obtain an oil, and n-pentane was added to the oil to obtain crystals. The crystals were collected by filtration to obtain 34.06 g (yield: 72%) of a target product.

$^1$H-NMR data (300 MHz, $CDCl_3$/TMS δ (ppm)): 3.94 (3H, s), 7.34 (1H, d), 7.52 (1H, d)

(3) Production of 5-bromo-4-chloro-2-fluorophenol

To a mixture of 22.00 g (77.61 mmol) of 5-bromo chloro-2-fluorophenyl methyl carbonate and 220 mL of methanol, 6.53 g (purity: 85.5%, 99.5 mmol) of potassium hydroxide was added in an ice bath, and the mixture was stirred at room temperature for 1 hour. The solvent was distilled off in vacuo, 1N hydrochloric acid was added to the residue, and the mixture was subjected to extraction with dichloromethane. The obtained organic layer was washed with water and brine, and dried over anhydrous magnesium sulfate. The solvent was distilled off in vacuo to obtain 17.08 g (yield: 98%) of a target product.

$^1$H-NMR data (300 MHz, $CDCl_3$/TMS δ (ppm)): 5.36 (1H, brs), 7.22 (1H, d), 7.29 (1H, d)

(4) Production of (S)-tert-butyl-[1-(5-bromo-4-chloro-2-fluorophenoxy)propan-2-yl]carbamate To a mixture of 17.08 g (75.76 mmol) of 5-bromo-4-chloro-2-fluorophenol, 15.93 g (90.91 mmol) of (S)-2-(tert-butoxycarbonylamino)-1-propanol, 23.85 g (90.93 mmol) of triphenylphosphine, and 230 mL of tetrahydrofuran, 18.38 g (90.90 mmol) of diisopropyl azodicarboxylate was added under ice cooling, and the mixture was stirred at room temperature for 15 hours. The solvent was distilled off in vacuo, and the residue was purified by silica gel column chromatography (developing solvent, n-hexane:ethyl acetate=4:1). The mixed solution of n-hexane and ethyl acetate after purification was washed with a 0.5 M aqueous sodium hydroxide solution. The solvent was distilled off in vacuo to obtain 24.32 g (yield: 84%) of a target product.

$^1$H-NMR data (300 MHz, $CDCl_3$/TMS δ (ppm)): 1.30 (3H, d), 1.45 (9H, s), 3.90-4.10 (3H, m), 4.72 (1H, brs), 7.20 (1H, d), 7.21 (1H, d)

(5) Production of methyl (S)-5-[2-(tert-butoxycarbonylamino)propoxy]-2-chloro-4-fluorobenzoate (Compound of Present Invention No.: G-0432)

A mixture of 11.70 g (30.58 mmol) of (S)-tert-butyl-[1-(5-bromo-4-chloro-2-fluorophenoxy)propan-2-yl]carbamate, 0.25 g (0.31 mmol) of [1,1'-bis(diphenylphosphino) ferrocene]palladium (II) dichloride dichloromethane adduct, 6.19 g (61.2 mmol) of triethylamine, and 50 mL of methanol was heated with stirring at 100° C. for 8.5 hours under a carbon monoxide atmosphere (9.0 kgf/$cm^2$). After the mixture was allowed to cool at room temperature, ethyl acetate was added thereto. Then, insoluble substances were removed by filtration, and the solvent was distilled off in vacuo. The residue was purified by silica gel column chromatography (developing solvent, n-hexane:ethyl acetate=4:1) to obtain 9.91 g (yield: 90%) of a target product.

$^1$H-NMR data (300 MHz, $CDCl_3$/TMS δ (ppm)): 1.31 (3H, d), 1.45 (9H, s), 3.92 (3H, s), 3.98-4.13 (3H, m), 4.75 (1H, brs), 7.19 (1H, d), 7.50 (1H, d)

(6) Production of methyl (S)-5-(2-aminopropoxy)-2-chloro-4-fluorobenzoate hydrochloride (Compound of Present Invention No.: G-0383)

To a mixture of 19.15 g (52.93 mmol) of methyl (S)-5-[2-(tert-butoxycarbonylamino)propoxy]-2-chloro-4-fluorobenzoate and 80 mL of 1,4-dioxane, 80 mL of a 1,4-dioxane solution of 4N hydrogen chloride was added at room temperature, and the mixture was stirred at room temperature for 6 hours. The solvent was distilled off in vacuo to obtain 15.10 g (yield: 96%) of a target product.

$^1$H-NMR data (300 MHz, DMSO-d6/TMS δ (ppm)): 1.31 (3H, d), 3.61 (1H, m), 3.87 (3H, s), 4.18-4.30 (2H, m), 7.66 (1H, d), 7.67 (1H, d), 8.38 (3H, brs)

(7) Production of methyl (S)-2-chloro-4-fluoro-5-{2-[(trifluoromethyl)sulfonamido]propoxy}benzoate (Compound of Present Invention No.: G-0518)

To a mixture of 15.10 g (50.65 mmol) of methyl (S)-5-(2-aminopropoxy)-2-chloro-4-fluorobenzoate hydrochloride, 15.38 g (152.0 mmol) of triethylamine, 6.34 g of molecular sieve (4 A), 200 mL of tetrahydrofuran, and 200 mL of dichloromethane, 11.10 g (65.87 mmol) of trifluoromethanesulfonyl chloride was added under ice cooling, and the mixture was stirred at room temperature for 24 hours. The mixture was filtered, the solvent was distilled off in vacuo, and then ethyl acetate was added to the residue. The organic layer was washed with 1N hydrochloric acid, water, and brine, and dried over anhydrous magnesium sulfate. The solvent was distilled off in vacuo, and the residue was purified by silica gel column chromatography (developing solvent, n-hexane:ethyl acetate=3:1) to obtain 13.84 g (yield: 69%) of a target product.

$^1$H-NMR data (300 MHz, $CDCl_3$/TMS δ (ppm)): 1.49 (3H, d), 3.93 (3H, s), 4.02 (3H, m) 5.42 (1H, brs), 7.23 (1H, s), 7.49 (1H, d)

(8) Production of (S)-2-chloro-4-fluoro-5-{2-[(trifluoromethyl)sulfonamido]propoxy}benzoic acid (Compound of Present Invention No.: F-0511)

To a mixture of 13.84 g (35.15 mmol) of methyl (S)-2-chloro-4-fluoro-5-{2-[(trifluoromethyl)sulfonamido]propoxy}benzoate, 30 mL of tetrahydrofuran, 150 mL of ethanol, and 40 mL of water, 4.42 g (105 mmol) of lithium hydroxide monohydrate was added at room temperature, and the mixture was stirred at room temperature for 15 hours. The solvent was distilled off in vacuo, 1N hydrochloric acid was added to the residue, and the mixture was subjected to extraction with ethyl acetate. The obtained organic layer was washed with water and brine, and dried over anhydrous magnesium sulfate. The solvent was distilled off in vacuo to obtain 12.07 g (yield: 90%) of a target product.

$^1$H-NMR data (300 MHz, DMSO-d6/TMS δ (ppm)): 1.25 (3H, d), 3.87 (1H, m), 3.99 (1H, m), 4.16 (1H, dd), 7.57 (1H, d), 7.59 (1H, d), 9.65 (1H, brs)

(9) Production of (S)-2-chloro-N-cyclopropyl-4-fluoro-5-{2-[(trifluoromethyl)sulfonamido]propoxy}benzamide (Compound of Present Invention No.: C-0130)

To a mixture of 5.00 g (13.2 mmol) of (S)-2-chloro-4-fluoro-5-{2-[(trifluoromethyl)sulfonamido]propoxy}benzoic acid, 27.6 mg (0.378 mmol) of N,N-dimethylformamide, and 60 mL of dichloromethane, 3.34 g (26.3 mmol) of oxalyl chloride was added at room temperature, and the mixture was stirred for 1 hour. The mixture was concentrated in vacuo, and the residue was dissolved in 20 mL of dichloromethane. The obtained mixture was added dropwise to a mixture of 1.50 g (26.3 mmol) of cyclopropylamine, 2.67 g (26.4 mmol) of triethylamine, 60 mL of dichloromethane, and 60 mL of tetrahydrofuran under ice cooling, followed by stirring at room temperature for 18 hours. The solvent was distilled off in vacuo, 1N hydrochloric acid was added to the residue, and the mixture was subjected to extraction with ethyl acetate. The obtained organic layer was washed with water and brine, and dried over anhydrous magnesium sulfate. The solvent was distilled off in vacuo, and the residue was purified by silica gel column chromatography (developing solvent, n-hexane:ethyl acetate=1:1) to obtain 4.59 g (yield: 83%) of a target product.

$^1$H-NMR data (300 MHz, DMSO-d6/TMS δ (ppm)): 0.53 (2H, m), 0.69 (2H, m), 1.25 (3H, d), 2.79 (1H, m), 3.87 (1H, m), 3.97 (1H, dd), 4.11 (1H, dd), 7.26 (1H, d), 7.49 (1H, d), 8.45 (1H, brs), 9.63 (1H, brs)

(10) Production of (S)-2-chloro-N-cyclopropyl-4-fluoro-5-(2-{[1,1,1-trifluoro-N-(methoxymethyl) methyl]sulfonamido}propoxy)benzamide (Compound of Present Invention No.: C-0664)

To a mixture of 1.50 g (3.58 mmol) of (S)-2-chloro-N-cyclopropyl-4-fluoro-5-{2-[(trifluoromethyl)sulfonamido] propoxy}benzamide, 0.54 g (5.3 mmol) of triethylamine, and 30 mL of acetonitrile, 0.43 g (5.3 mmol) of chloromethyl methyl ether was added dropwise under ice cooling, and the mixture was stirred at room temperature for 15 hours. Water was added thereto, and the mixture was subjected to extraction with ethyl acetate. The obtained organic layer was washed with water and brine, and dried over anhydrous magnesium sulfate. The solvent was distilled off in vacuo, and the residue was purified by silica gel column chromatography (developing solvent, n-hexane:ethyl acetate=1:1) to obtain 1.60 g (yield: 97%) of a target product.

$^1$H-NMR data (300 MHz, $CDCl_3$/TMS δ (ppm)): 0.66 (2H, m), 0.90 (2H, m), 1.46 (3H, d), 2.92 (1H, m), 3.38 (3H, s), 4.10 (1H, dd), 4.24 (1H, dd), 4.37-4.48 (1H, m), 4.80-4.91 (2H, m), 6.52 (1H, brs), 7.13 (1H, d), 7.40 (1H, d)

Example 12

Production of (S)-2-chloro-N-(1-cyanocyclopropyl)-4-fluoro-5-(2-{[1,1,1-trifluoro-N-(methoxymethyl) methyl]sulfonamido}propoxy)benzamide (Compound of Present Invention No.: C-3076)

(1) Production of (S)-2-chloro-N-(1-cyanocyclopropyl)-4-fluoro-5-{2-[(trifluoromethyl)sulfonamido] propoxy}benzamide (Compound of Present Invention No.: C-2980)

To a mixture of 0.14 g (0.37 mmol) of (S)-2-chloro fluoro-5-{2-[(trifluoromethyl)sulfonamido] propoxy}benzoic acid produced in Example 11 (8), 2.7 mg (0.037 mmol) of N,N-dimethylformamide, and 10 mL of dichloromethane, 0.10 g (0.79 mmol) of oxalyl chloride was added at room temperature, and the mixture was stirred for 1 hour. The mixture was concentrated in vacuo, and the residue was dissolved in 3 mL of dichloromethane. The obtained mixture was added dropwise to a mixture of 0.13 g (1.1 mmol) of 1-cyanocyclopropylamine hydrochloride, 0.22 g (2.2 mmol) of triethylamine, and 10 mL of dichloromethane under ice cooling, followed by stirring at room temperature for 18 hours. Then, 1N hydrochloric acid was added thereto, and the mixture was subjected to extraction with dichloromethane. The obtained organic layer was washed with brine, and dried over anhydrous magnesium sulfate. The solvent was distilled off in vacuo, and the residue was purified by silica gel column chromatography (developing solvent, n-hexane:ethyl acetate=1:1) to obtain 0.14 g (yield: 86%) of a target product.

$^1$H-NMR data (300 MHz, $CDCl_3$/TMS δ (ppm)): 1.39 (2H, m), 1.46 (3H, d), 1.67 (2H, m), 4.06-4.15 (3H, m), 5.77 (1H, brs), 7.14 (1H, brs), 7.16 (1H, d), 7.43 (1H, d)

(2) Production of (S)-2-chloro-N-(1-cyanocyclopropyl)-4-fluoro-5-(2-{[1,1,1-trifluoro-N-(methoxymethyl)methyl]sulfonamido}propoxy)benzamide (Compound of Present Invention No.: C-3076)

To a mixture of 0.20 g (0.45 mmol) of (S)-2-chloro-N-(1-cyanocyclopropyl)-4-fluoro-5-{2-[(trifluoromethyl) sulfonamido]propoxy}benzamide, 0.12 g (0.93 mmol) of N,N-diisopropylethylamine, and 5 mL of acetonitrile, 0.07 g (0.9 mmol) of chloromethyl methyl ether was added dropwise under ice cooling, and the mixture was stirred at room temperature for 15 hours. Water was added thereto, and the mixture was subjected to extraction with ethyl acetate. The obtained organic layer was washed with brine, and dried over anhydrous magnesium sulfate. The solvent was distilled off in vacuo, and the residue was purified by silica gel column chromatography (developing solvent, n-hexane: ethyl acetate=1:1) to obtain 0.19 g (yield: 86%) of a target product.

$^1$H-NMR data (300 MHz, $CDCl_3$/TMS δ (ppm)): 1.39 (2H, m), 1.49 (3H, d), 1.68 (2H, m), 3.38 (3H, s), 4.11 (1H, dd), 4.25 (1H, dd), 4.44 (1H, m), 4.86 (2H, m), 7.04 (1H, brs), 7.16 (1H, d), 7.47 (1H, d)

Example 13

Production of (S)-2-chloro-N-(1-cyanocyclopropyl)-3-methyl-5-{2-[(trifluoromethyl)sulfonamido] propoxy)benzamide (1) Production of methyl 2-chloro-5-hydroxy methylbenzoate To a mixture of 3.5 g (18 mmol) of methyl 5-amino chloro-3-methylbenzoate produced by the method described in WO 2020/117877, 50 mL of concentrated sulfuric acid, and 50 mL of water, 1.5 g (22 mmol) of sodium nitrite was added under ice cooling, and the mixture was stirred at room temperature for 2 hours and then stirred under reflux for 3 hours. The reaction mixture was cooled to room temperature, then ice water was added thereto, and the mixture was subjected to extraction with ethyl acetate. The organic layer was washed with water, and dried over anhydrous magnesium sulfate. The solvent was distilled off in vacuo to obtain a crude mixture containing a target product and 2-chloro-5-hydroxy-3-methylbenzoic acid. The obtained crude mixture containing a target product and 2-chloro-5-hydroxy-3-methylbenzoic acid was dissolved in 100 mL of methanol. Then, 3.7 g (38 mmol) of concentrated sulfuric acid was added thereto at room temperature, and the mixture was stirred under reflux for 8 hours. The solvent was distilled off in vacuo, water was added to the residue, and the mixture was subjected to extraction with ethyl acetate. The organic layer was washed with water, and dried over anhydrous magnesium sulfate. The solvent was distilled off in vacuo, and the residue was purified by silica gel column chromatography (developing solvent, n-hexane:ethyl acetate=2:1) to obtain 1.8 g (yield: 50%) of a target product.

$^1$H-NMR data (300 MHz, $CDCl_3$/TMS δ (ppm)): 2.36 (3H, s), 3.92 (3H, s), 5.50 (1H, brs), 6.88 (1H, d), 7.07 (1H, d)

(2) Production of methyl (S)-5-[2-(tert-butoxycarbonylamino)propoxy]-2-chloro-3-methylbenzoate (Compound of Present Invention No.: H-0001)

To a mixture of 1.8 g (9.0 mmol) of methyl 2-chloro-5-hydroxy-3-methylbenzoate, 1.9 g (11 mmol) of (S)-2-(tert-butoxycarbonylamino)-1-propanol, 2.8 g (11 mmol) of triphenylphosphine, and 100 mL of tetrahydrofuran, 2.2 g (11 mmol) of diisopropyl azodicarboxylate was added under ice cooling, and the mixture was stirred at room temperature for 15 hours. The solvent was distilled off in vacuo, and the residue was purified by silica gel column chromatography (developing solvent, n-hexane:ethyl acetate=2:1) to obtain 1.3 g (yield: 40%) of a target product.

$^1$H-NMR data (300 MHz, $CDCl_3$/TMS δ (ppm)): 1.27 (3H, d), 1.45 (9H, s), 2.39 (3H, s), 3.90 (2H, d), 3.92 (3H, s), 4.05 (1H, m), 4.71 (1H, brs), 6.94 (1H, d), 7.10 (1H, d)

(3) Production of methyl (S)-5-(2-aminopropoxy)-2-chloro-3-methylbenzoate hydrochloride (Compound of Present Invention No.: H-0002)

To a mixture of 1.3 g (3.6 mmol) of methyl (S)-5-[2-(tert-butoxycarbonylamino)propoxy]-2-chloro methylbenzoate and 10 mL of 1,4-dioxane, 3.7 g of a 1,4-dioxane solution of 4N hydrogen chloride was added at room temperature, and the mixture was stirred at room temperature for 16 hours. The solvent was distilled off in vacuo, and the obtained white crystals were washed with ethyl acetate to obtain 880 mg (yield: 82%) of a target product.

$^1$H-NMR data (300 MHz, DMSO-d6/TMS δ (ppm)): 1.27 (3H, d), 2.36 (3H, s), 3.57 (1H, m), 3.86 (3H, s), 4.02 (1H, dd), 4.15 (1H, dd), 7.19 (1H, d), 7.22 (1H, d), 8.18 (3H, brs)

(4) Production of methyl (S)-2-chloro-3-methyl-5-{2-[(trifluoromethyl)sulfonamido]propoxy}benzoate (Compound of Present Invention No.: H-0003)

To a mixture of 880 mg (2.99 mmol) of methyl (S)-5-(2-aminopropoxy)-2-chloro-3-methylbenzoate hydrochloride, 908 mg (8.97 mmol) of triethylamine, 100 mg of molecular sieve (4 A), 30 mL of tetrahydrofuran, and 60 mL of dichloromethane, 756 mg (4.49 mmol) of trifluoromethanesulfonyl chloride was added under ice cooling, and the mixture was stirred at room temperature for 17 hours. The mixture was filtered, a saturated aqueous sodium bicarbonate solution was added thereto, and the mixture was subjected to extraction with ethyl acetate. The organic layer was washed with 1N hydrochloric acid, and dried over anhydrous magnesium sulfate. The solvent was distilled off in vacuo, and the residue was purified by silica gel column chromatography (developing solvent, n-hexane:ethyl acetate=3:1) to obtain 390 mg (yield: 33%) of a target product.

$^1$H-NMR data (300 MHz, $CDCl_3$/TMS δ (ppm)): 1.46 (3H, d), 2.37 (3H, s), 3.94 (3H, s), 3.95 (1H, m), 4.06 (2H, m), 5.14 (1H, brs), 6.94 (1H, d), 7.10 (1H, d)

(5) Production of (S)-2-chloro-3-methyl-5-{2-[(trifluoromethyl)sulfonamido]propoxy}benzoic acid (Compound of Present Invention No.: H-0004)

To a mixture of 390 mg (1.00 mmol) of methyl (S)-2-chloro-3-methyl-5-{2-[(trifluoromethyl)sulfonamido]propoxy}benzoate, 20 mL of methanol, and 20 mL of water, 126 mg (3.00 mmol) of lithium hydroxide monohydrate was added at room temperature, and the mixture was stirred at room temperature for 15 hours. Then, 1N hydrochloric acid was added thereto, and the mixture was subjected to extraction with ethyl acetate. The obtained organic layer was washed with water, and dried over anhydrous magnesium sulfate. The solvent was distilled off in vacuo to obtain 370 mg (yield: 98%) of a target product.

$^1$H-NMR data (300 MHz, DMSO-d6/TMS δ (ppm)): 1.23 (3H, d), 2.33 (3H, s), 3.83 (1H, m), 3.85 (1H, dd), 3.99 (1H, dd), 7.06 (1H, d), 7.10 (1H, d)

(6) Production of (S)-2-chloro-N-(1-cyanocyclopropyl)-3-methyl-5-{2-[(trifluoromethyl)sulfonamido]propoxy) benzamide (Compound of Present Invention No.: H-0005)

To a mixture of 430 mg (1.14 mmol) of (S)-2-chloro-3-methyl-5-{2-[(trifluoromethyl)sulfonamido]propoxy}benzoic acid, 8.2 mg (0.11 mmol) of N,N-dimethylformamide, and 30 mL of dichloromethane, 436 mg (3.44 mmol) of oxalyl chloride was added at room temperature, and the mixture was stirred for 3 hours. The mixture was concentrated in vacuo, and the residue was dissolved in 10 mL of dichloromethane. The obtained mixture was added dropwise to a mixture of 407 mg (3.43 mmol) of 1-cyanocyclopropylamine hydrochloride, 695 mg (6.87 mmol) of triethylamine, and 30 mL of dichloromethane under ice cooling, followed by stirring at room temperature for 18 hours. Then, 1N hydrochloric acid was added thereto, and the mixture was subjected to extraction with ethyl acetate. The obtained organic layer was washed with a saturated aqueous sodium bicarbonate solution, and dried over anhydrous magnesium sulfate. The solvent was distilled off in vacuo, and the residue was purified by silica gel column chromatography (developing solvent, n-hexane:ethyl acetate=3:2) to obtain 280 mg (yield: 56%) of a target product.

$^1$H-NMR data (300 MHz, $CDCl_3$/TMS δ (ppm)): 1.39 (5H, m), 1.63 (2H, dd), 2.34 (3H, s), 3.98 (3H, m), 5.78 (1H, brs), 6.87 (1H, d), 6.93 (1H, d), 6.97 (1H, brs)

(7) Production of (S)-2-chloro-N-(1-cyanocyclopropyl)-3-methyl-5-(2-{[1,1,1-trifluoro-N-(methoxymethyl)methyl]sulfonamido}propoxy)benzamide (Compound of Present Invention No.: H-0006)

To a mixture of 150 mg (0.341 mmol) of (S)-2-chloro-N-(1-cyanocyclopropyl)-3-methyl-5-{2-[(trifluoromethyl)sulfonamido]propoxy}benzamide, 138 mg (1.36 mmol) of triethylamine, and 30 mL of acetonitrile, 54.9 mg (0.682 mmol) of chloromethyl methyl ether was added dropwise at room temperature, and the mixture was stirred at room temperature for 15 hours. Water was added thereto, and the mixture was subjected to extraction with ethyl acetate. The obtained organic layer was dried over anhydrous magnesium sulfate. The solvent was distilled off in vacuo, and the residue was purified by silica gel column chromatography (developing solvent, n-hexane:ethyl acetate=1:1) to obtain 110.1 mg (yield: 67%) of a target product.

$^1$H-NMR data (300 MHz, $CDCl_3$/TMS δ (ppm)): 1.43 (5H, m), 1.67 (2H, dd), 2.37 (3H, s), 3.37 (3H, s), 4.01 (1H, m), 4.14 (1H, m), 4.40 (1H, m), 4.86 (2H, m), 6.67 (1H, brs), 6.90 (1H, d), 7.01 (1H, d)

Physical property values of the compound [I] of the present invention synthesized in accordance with the above-described Examples, including the values in the above-described Examples, are shown in the following Tables 1234 to 1244, physical property values of the compound [II] of the present invention are similarly shown in Tables 1245 to 1246, and physical property values of the compound [III] of the present invention are similarly shown in Tables 1247 to 1253.

The compound numbers and symbols in the tables are the same as described above.

TABLE 1234

| Compound Number | Physical property value Melting point (° C.) | Refractive index ($n_D^{20}$) |
|---|---|---|
| A-0008 | 91-92 | |
| A-0015 | 64-66 | |
| A-0028 | 107-110 | |
| A-0030 | 86-88 | |
| A-0031 | 110-113 | |
| A-0035 | 78-79 | |
| A-0037 | 82-85 | |
| A-0049 | 88-90 | |
| A-0052 | 71-72 | |
| A-0056 | 90-93 | |
| A-0059 | 79-80 | |
| A-0060 | 47-48 | |
| A-0063 | 55-56 | |
| A-0064 | 48-50 | |
| A-0105 | 129-130 | |
| A-0106 | 92-95 | |
| A-0170 | 82-84 | |
| A-0179 | | 1.4858 |
| A-0243 | 117-120 | |
| A-0273 | | 1.4781 |
| A-0367 | 100-103 | |
| A-0368 | 75-78 | |
| A-0369 | | 1.4932 |
| A-0370 | 68-71 | |
| A-0371 | | 1.4941 |
| A-0373 | 153-155 | |
| A-0405 | 63-66 | |
| A-0419 | 111-113 | |
| A-0447 | | 1.4881 |
| A-0474 | 116-119 | |
| A-0475 | | 1.4862 |
| A-0479 | | 1.4862 |
| A-0480 | | 1.4852 |
| A-0507 | 119-121 | |
| A-0512 | 142-144 | |
| A-0538 | 107-109 | |
| A-0598 | 129-130 | |
| A-0724 | 187-190 | |
| A-0726 | 154-156 | |
| A-0751 | 107-108 | |
| A-0752 | 85-87 | |
| A-0753 | 85-87 | |
| A-0809 | 82-83 | |

TABLE 1235

| Compound Number | Physical property value Melting point (° C.) | Refractive index ($n_D^{20}$) |
|---|---|---|
| A-0942 | 66-68 | |
| A-1310 | 122-124 | |
| A-1477 | 73-75 | |
| A-1483 | 90-93 | |
| A-1523 | 100-101 | |
| A-1529 | 62-63 | |
| A-1960 | 145-146 | |
| A-3459 | 97-99 | |
| A-3506 | 161-162 | |
| A-3821 | 152-153 | |
| A-3828 | 131-134 | |
| A-4665 | 64-67 | |
| A-4687 | 96-98 | |
| A-4688 | 74-75 | |
| A-4689 | 88-89 | |
| A-4690 | 81-83 | |
| A-4691 | 81-84 | |
| A-4693 | 103-106 | |
| A-4710 | 91-94 | |

TABLE 1235-continued

| Compound Number | Physical property value Melting point (° C.) | Refractive index ($n_D^{20}$) |
|---|---|---|
| A-4712 | 88-89 | |
| A-4715 | 76-77 | |
| A-4735 | 94-95 | |
| A-4758 | 88-89 | |
| A-4781 | 75-78 | |
| A-4850 | 56-58 | |
| A-4969 | | 1.5141 |
| A-5011 | 82-83 | |
| A-5172 | 97-100 | |
| A-5797 | 180-183 | |
| A-5977 | 85-86 | |
| A-6161 | 41-43 | |
| A-6482 | | 1.4748 |
| A-6497 | | 1.4718 |
| A-6542 | | 1.4709 |
| A-6572 | | 1.4723 |
| A-6602 | | 1.4641 |
| A-6632 | | 1.4540 |
| A-6662 | | 1.4801 |
| A-6692 | | 1.4820 |
| A-6708 | | 1.4911 |
| A-6709 | | 1.4804 |
| A-6724 | | 1.4809 |
| A-6754 | | 1.4711 |

TABLE 1236

| Compound Number | Physical property value Melting point (° C.) | Refractive index ($n_D^{20}$) |
|---|---|---|
| A-6784 | | 1.4730 |
| A-6814 | | 1.4810 |
| A-6844 | | 1.4760 |
| A-6859 | | 1.4714 |
| A-6889 | | 1.4751 |
| A-6934 | 63-64 | |
| A-7024 | | 1.4698 |
| A-7054 | | 1.4739 |

TABLE 1237

| Compound Number | Physical property value [$^1$H-NMR data TMS δ (ppm)] | |
|---|---|---|
| A-0061 | 300 MHz, $CDCl_3$ | 4.02-4.23 (2H, m), 6.75 (1H, brs), 7.35 (1H, d), 7.73 (1H, d) |
| A-0155 | 300 MHz, $CDCl_3$ | 1.44 (3H, d), 3.33 (1H, q), 3.99-4.06 (2H, m), 4.08-4.20 (2H, m), 6.78 (1H, brs), 7.18 (1H, d), 7.45 (1H, d) |
| A-0156 | 300 MHz, $CDCl_3$ | 1.43 (3H, d), 2.35 (3H, s), 3.88-4.03 (2H, m), 4.08-4.20 (3H, m), 6.85 (1H, brs), 7.18 (1H, d), 7.51 (1H, d) |
| A-0372 | 300 MHz, $CDCl_3$ | 1.17 (3H, d), 1.72 (2H, brs), 3.33-3.45 (1H, m), 3.73 (1H, t), 3.93 (1H, dd), 4.05-4.19 (2H, m), 7.00 (1H, brs), 7.16 (1 H, d), 7.38 (1H, d) |
| A-0414 | 300 MHz, $CDCl_3$ | 1.25 (3H, d), 1.43 (9H, s), 3.95-4.19 (3H, m), 4.69 (1H, brs), 4.96 (2H, q), 6.83 (1H, brs), 7.15 (1H, d), 7.44 (1H, d) |
| A-0417 | 300 MHz, $CDCl_3$ | 0.99 (3H, t), 1.20-1.32 (2H, m), 1.44 (9H, s), 3.75-3.92 (1H, m), 4.09-4.20 (2H, m), 4.71 (1H, brs), 4.98 (2H, q), 6.83 (1H, brs), 7.17 (1H, d), 7.46 (1H, d) |

TABLE 1237-continued

| Compound Number | Physical property value [$^1$H-NMR data TMS δ (ppm)] | |
|---|---|---|
| A-0418 | 400 MHz, $CDCl_3$ | 0.98 (6H, d), 1.44 (9H, s), 1.94-2.10 (1H, m), 3.32-3.78 (1H, m), 4.10-4.23 (2H, m), 4.73 (1H, brs), 4.97 (2H, q), 6.83 (1H, brs), 7.17 (1H, d), 7.44 (1H, d) |
| A-0491 | 400 MHz, $CDCl_3$ | 0.93 (3H, t), 1.55-1.83 (2H, m), 3.17-3.39 (2H, m), 4.04-4.24 (2H, m), 4.27-4.39 (1H, m), 5.12 (1H, brs), 6.81 (1H, brs), 7.14 (1H, d), 7.42 (1H, d), 7.76 (2H, d), 7.98 (2H, d) |
| A-0758 | 300 MHz, $CDCl_3$ | 1.24 (3H, d), 2.40-2.55 (1H, m), 3.06 (1H, dd), 3.23 (1H, dd), 3.99 (1H, dd), 4.07-4.18 (3H, m), 6.83 (1H, brs), 7.17 (1H, d), 7.42 (1H, d) |
| A-0799 | 300 MHz, $CDCl_3$ | 2.18-2.31 (2H, m), 2.36 (3H, s), 3.75 (2H, t), 4.11 (2H, t), 4.07-4.22 (2H, m), 5.94 (1H, brs), 6.95 (1H, d), 7.30 (1H, d) |
| A-3167 | 300 MHz, $CDCl_3$ | 0.61-0.67 (4H, m), 0.75-0.79 (2H, m), 0.86-0.92 (2H, m), 1.72 (2H, brs), 2.91 (1H, m), 3.92 (2H, s), 6.51 (1H, brs), 7.12 (1H, d), 7.38 (1H, d) |
| A-3168 | 300 MHz, $CDCl_3$ | 0.62-0.67 (2H, m), 0.83-0.97 (6H, m), 1.45 (9H, s), 2.91 (1H, m), 4.05 (2H, s), 5.15 (1H, brs), 6.42 (1H, brs), 7.11 (1H, d), 7.33 (1H, d) |

TABLE 1238

| Compound Number | Physical property value [$^1$H-NMR data TMS δ (ppm)] | |
|---|---|---|
| A-3822 | 300 MHz, $CDCl_3$ | 0.62-0.68 (2H, m), 0.86-0.93 (2H, m), 1.88 (1H, brs), 2.28 (1H, m), 2.91 (1H, m), 3.80 (2H, d), 4.09-4.21 (4H, m), 6.53 (1H, brs), 7.12 (1H, d), 7.44 (1H, d) |
| A-3825 | 300 MHz, $CDCl_3$ | 0.62-0.68 (2H, m), 0.86-0.93 (2H, m), 1.45 (9H, s), 2.92 (1H, m), 3.77 (2H, m), 3.99 (1H, dd), 4.06-4.19 (4H, m), 6.57 (1H, brs), 7.12 (1H, d), 7.42 (1H, d) |
| A-3829 | 300 MHz, $CDCl_3$ | 0.62-0.68 (2H, m), 0.86-0.93 (2H, m), 2.55 (1H, m), 2.89 (1H, m), 3.56-3.62 (2H, m), 3.71-3.81 (2H, m), 4.18-4.26 (2H, m), 6.58 (1H, brs), 7.11 (1H, d), 7.39 (1H, d) |
| A-3129 | 300 MHz, $CDCl_3$ | 0.62-0.67 (2H, m), 0.86-0.93 (2H, m), 1.40 (3H, d), 2.39 (1H, m), 2.92 (1H, m), 3.62-3.73 (2H, m), 3.99-4.03 (2H, m), 6.48 (1H, brs), 7.11 (1H, d), 7.42 (1H, d) |
| A-3169 | 300 MHz, $CDCl_3$ | 0.62-0.68 (2H, m), 0.86-0.93 (2H, m), 0.98-1.03 (2H, m), 1.24-1.29 (2H, m), 2.91 (1H, m), 4.04 (2H, s), 6.02 (1H, brs), 6.51 (1H, brs), 7.14 (1H, d), 7.35 (1H, d) |
| A-3820 | 300 MHz, $CDCl_3$ | 0.62-0.67 (2H, m), 0.85-0.92 (2H, m), 1.10 (3H, d), 2.50 (1H, m), 2.91 (1H, m), 3.70 (1H, dd), 3.84 (1H, dd), 3.92-4.00 (2H, m), 6.46 (1H, brs), 7.03 (1H, d), 7.32 (1H, d), 7.70-7.74 (2H, m), 7.80-7.84 (2H, m) |
| A-7142 | 300 MHz, DMSO-$d_6$ | 0.97-1.02 (4H, m), 1.23-1.27 (2H, m), 1.56-1.60 (2H, m), 4.06 (2H, s), 7.29 (1H, d), 7.57 (1H, d), 9.36 (1H, brs), 10.16 (1H, brs) |

TABLE 1239

| Compound Number | Physical property value | |
|---|---|---|
| | Melting point (° C.) | Refractive index ($n_D^{20}$) |
| B-0009 | | 1.4759 |

TABLE 1240

| Compound Number | Physical property value | |
|---|---|---|
| | Melting point (° C.) | Refractive index ($n_D^{20}$) |
| C-0001 | | 1.4715 |
| C-0002 | | 1.4705 |
| C-0004 | 120-123 | |
| C-0005 | 119-122 | |
| C-0006 | 112-115 | |
| C-0010 | 129-132 | |
| C-0011 | 160-162 | |
| C-0035 | 129-130 | |
| C-0066 | 127-128 | |
| C-0068 | | 1.4962 |
| C-0128 | 92-95 | |
| C-0129 | 120-123 | |
| C-0130 | | 1.5023 |
| C-0188 | | 1.4692 |
| C-0190 | | 1.4699 |
| C-0192 | | 1.4691 |
| C-0196 | | 1.4731 |
| C-0197 | | 1.4731 |
| C-0221 | | 1.4619 |
| C-0314 | | 1.5051 |
| C-0315 | | 1.5009 |
| C-0316 | | 1.5039 |
| C-0448 | | 1.3495 |
| C-0590 | | 1.4699 |
| C-0664 | | 1.5002 |
| C-0698 | | 1.4749 |
| C-0806 | 67-70 | |
| C-0880 | 82-85 | |
| C-0988 | 108-111 | |
| C-1023 | 123-125 | |
| C-1349 | | 1.4760 |
| C-1367 | | 1.4744 |
| C-1403 | | 1.3779 |
| C-1439 | | 1.4764 |
| C-1457 | | 1.4732 |
| C-1475 | | 1.4720 |
| C-1511 | | 1.4695 |
| C-2980 | 54-57 | |
| C-3076 | | 1.4963 |
| C-4162 | 119-121 | |
| C-4214 | | 1.4694 |
| C-9400 | 112-114 | |
| C-9422 | 109-110 | |

TABLE 1241

| Compound Number | Physical property value | |
|---|---|---|
| | Melting point (° C.) | Refractive index ($n_D^{20}$) |
| C-9432 | 118-120 | |
| C-9464 | 51-54 | |
| C-9496 | | 1.5176 |
| C-9528 | 163-165 | |
| C-9688 | | 1.4945 |
| C-9752 | | 1.4948 |
| C-9784 | | 1.4919 |
| C-9944 | 66-69 | |
| C-11248 | | 1.4974 |
| C-11256 | 117-120 | |
| C-11264 | | 1.4880 |
| C-11272 | | 1.4892 |
| C-11408 | 56-59 | |
| C-11416 | 109-111 | |
| C-11512 | | 1.5022 |
| C-11528 | 135-138 | |
| C-11536 | 173-176 | |
| C-11568 | 132-133 | |
| C-11656 | 72-75 | |

TABLE 1241-continued

| Compound Number | Physical property value Melting point (° C.) | Refractive index ($n_D^{20}$) |
|---|---|---|
| C-11664 | 90-93 | |
| C-11680 | | 1.5005 |
| C-11688 | | 1.5033 |
| C-11704 | | 1.4877 |
| C-11712 | | 1.5010 |
| C-11720 | 106-107 | |
| C-11728 | 143-146 | |
| C-11752 | 82-85 | |
| C-11776 | 110-113 | |
| C-11784 | | 1.5327 |
| C-11792 | | 1.5266 |
| C-11800 | 180-183 | |
| C-11808 | 96-99 | |
| C-11816 | 164-166 | |
| C-11824 | 141-142 | |
| C-11840 | 90-93 | |
| C-13648 | | 1.4891 |
| C-3550 | | 1.5011 |
| C-8914 | | 1.4874 |
| C-8950 | | 1.4889 |
| C-9334 | | 1.5080 |
| C-9338 | 59-62 | |
| C-9848 | | 1.4952 |
| C-11392 | 109-112 | |
| C-11584 | 57-60 | |

TABLE 1242

| Compound Number | Physical property value [$^1$H-NMR data TMS δ (ppm)] | |
|---|---|---|
| C-0191 | 300 MHz, $CDCl_3$ | 1.40 (3H, d), 3.05 (3H, s), 4.05-4.21 (4H, m), 4.40-4.51 (1H, m), 6.81 (1H, brs), 7.20 (1H, d), 7.43 (1H, d) |
| C-0374 | 300 MHz, $CDCl_3$ | 1.27 (3H, t), 1.45 (3H, d), 3.38-3.63 (2H, m), 3.98-4.24 (4H, m), 4.28-4.44 (1H, m), 6.80 (1H, brs), 7.20 (1H, d), 7.43 (1H, d) |
| C-1022 | 400 MHz, $CDCl_3$ | 0.95 (3H, s), 1.58-1.76 (2H, m), 2.48 (3H, s), 2.83-3.04 (3H, m), 3.09 (3H, s), 3.46-3.72 (2H, m), 4.68 (1H, brs), 7.42 (1H, d), 7.48 (1H, d) |
| C-9560 | 300 MHz, $CDCl_3$ | 0.63-0.68 (2H, m), 0.86-0.93 (2H, m), 1.44 (3H, d), 2.10 (3H, s), 2.91 (1H, m), 4.05 (1H, dd), 4.28-4.42 (4H, m), 6.42 (1H, brs), 7.12 (1H, d), 7.25 (1H, d) |
| C-9592 | 300 MHz, $CDCl_3$ | 0.63-0.68 (2H, m), 0.87-0.93 (2H, m), 1.48 (3H, d), 2.91 (1H, m), 3.63 (3H, s), 4.12 (1H, dd), 4.28 (2H, s), 4.32 (1H, m), 4.43 (1H, m), 6.46 (1H, brs), 7.13 (1H, d), 7.32 (1H, d) |
| C-9656 | 300 MHz, $CDCl_3$ | 0.63-0.68 (2H, m), 0.87-0.93 (2H, m), 1.48 (3H, d), 2.05 (3H, s), 2.92 (1H, m), 4.15 (2H, m), 4.45 (1H, m), 5.40 (2H, m), 6.53 (1H, brs), 7.15 (1H, d), 7.40 (1H, d) |
| C-9720 | 300 MHz, $CDCl_3$ | 0.62-0.67 (2H, m), 0.86-0.93 (2H, m), 1.16 (9H, s), 1.48 (3H, d), 2.92 (1H, m), 4.11-4.20 (2H, m), 4.44-4.50 (1H, m), 5.56 (2H, m), 6.52 (1H, brs), 7.14 (1H, d), 7.38 (1H, d) |
| C-10702 | 300 MHz, $CDCl_3$ | 1.50 (9H, s), 1.53 (3H, d), 2.37 (3H, s), 4.19 (1H, m), 4.31-4.49 (3H, m), 4.70 (1H, m), 7.04 (1H, d), 7.19 (1H, d) |
| C-11312 | 300 MHz, $CDCl_3$ | 0.73-0.77 (2H, m), 0.86-0.90 (2H, m), 1.46 (3H, d), 1.49 (3H, s), 4.01-4.14 (3H, m), 5.73 (1H, brs), 6.64 (1H, brs), 7.13 (1H, d), 7.34 (1H, d) |
| C-11400 | 300 MHz, $CDCl_3$ | 1.20-1.26 (2H, m), 1.37-1.42 (2H, m), 1.47 (3H, d), 2.22 (1H, s), 5.54 (1H, brs), 6.94 (1H, brs), 7.15 (1H, d), 7.46 (1H, d) |

TABLE 1242-continued

| Compound Number | Physical property value [$^1$H-NMR data TMS δ (ppm)] | |
|---|---|---|
| C-11520 | 300 MHz, $CDCl_3$ | 1.46 (3H, d), 2.14-2.33 (2H, m), 2.43-2.53 (2H, m), 2.84-2.93 (2H, m), 4.03-4.15 (3H, m), 5.60 (1H, brs), 7.12 (1H, brs), 7.17 (1H, d), 7.48 (1H, d) |
| C-11552 | 300 MHz, DMSO-$d_6$ | 1.26 (3H, d), 1.76 (3H, s), 3.80 (1H, dd), 3.88 (1H, m), 3.95-4.05 (2H, m), 4.10-4.15 (2H, m), 4.42 (1H, dd), 4.58 (1H, m), 7.36 (1H, d), 7.54 (1H, d), 9.08 (1H, brs), 9.64 (1H, brs) |

TABLE 1243

| Compound Number | Physical property value [$^1$H-NMR data TMS δ (ppm)] | |
|---|---|---|
| C-11560 | 300 MHz, DMSO-$d_6$ | 1.27 (3H, d), 2.99 (3H, s), 3.19 (1H, ddd), 3.76 (1H, m), 3.85-4.01 (3H, m), 4.09-4.66 (3H, m), 7.32 (1H, d), 7.54 (1H, d), 8.84 (1H, brs), 9.65 (1H, brs) |
| C-11624 | 300 MHz, $CDCl_3$ | 1.46 (3H, d), 2.20 (6H, s), 3.99-4.16 (3H, m), 5.59 (1H, brs), 6.34 (1H, brs), 7.14 (1H, d), 7.43 (1H, d) |
| C-11672 | 300 MHz, $CDCl_3$ | 1.47 (3H, d), 2.11-2.21 (2H, m), 2.71-2.82 (4H, m), 2.96-3.09 (2H, m), 4.03-4.16 (3H, m), 5.50 (1H, brs), 6.68 (1H, brs), 7.19 (1H, d), 7.49 (1H, d) |
| C-11696 | 300 MHz, $CDCl_3$ | 0.32 (1H, m), 0.41 (1H, m), 0.48-0.62 (2H, m), 0.92 (1H, m), 1.32 (3H, d), 1.45 (3H, d), 3.59 (1H, m), 4.01-4.12 (3H, m), 5.93 (1H, brs), 6.38 (1H, brs), 7.15 (1H, d), 7.35 (1H, d) |
| C-11744 | 300 MHz, $CDCl_3$ | 1.46 (3H, d), 1.82 (6H, s), 4.05-4.16 (3H, m), 5.64 (1H, brs), 6.77 (1H, brs), 7.16 (1H, d), 7.46 (1H, d) |
| C-11760 | 300 MHz, $CDCl_3$ | 1.46 (3H, d), 3.91 (3H, s), 4.04-4.16 (3H, m), 5.85 (1H, brs), 7.17 (1H, d), 7.34 (1H, d), 9.08 (1H, brs) |

TABLE 1244

| Compound Number | Physical property value Melting point (° C.) | Refractive index ($n_D^{20}$) |
|---|---|---|
| D-0006 | 130-132 | |
| D-0125 | | 1.5130 |
| D-0130 | | 1.5077 |
| D-0592 | 69-70 | |
| D-0664 | | 1.5043 |
| D-2977 | 65-68 | |
| D-2980 | 195-198 | |
| D-2992 | 203-206 | |
| D-3076 | | 1.5029 |
| D-4423 | | 1.4248 |
| D-4495 | | 1.4657 |

TABLE 1245

| Compound Number | Physical property value Melting point (° C.) | Refractive index ($n_D^{20}$) |
|---|---|---|
| E-0002 | 127-130 | |
| E-0006 | 124-126 | |

TABLE 1245-continued

| Compound Number | Physical property value Melting point (° C.) | Physical property value Refractive index ($n_D^{20}$) |
|---|---|---|
| E-0007 | 101-102 | |
| E-0011 | 108-109 | |
| E-0012 | 136-138 | |

TABLE 1246

| Compound Number | Physical property value [$^1$H-NMR data TMS δ (ppm)] | |
|---|---|---|
| E-0010 | 400 MHz, DMSO-$d_6$ | 2.21 (3H, s), 4.04 (2H, q), 6.95 (1H, d), 7.05 (1H, d), 8.86 (1H, brs), 9.88 (1H, brs) |
| E-0030 | 300 MHz, DMSO-$d_6$ | 0.46-0.52 (2H, m), 0.64-0.71 (2H, m), 2.78 (1H, m), 6.93 (1H, d), 7.38 (1H, d), 8.40 (1H, brs), 10.39 (1H, brs) |

TABLE 1247

| Compound Number | Physical property value Melting point (° C.) | Physical property value Refractive index ($n_D^{20}$) |
|---|---|---|
| F-0423 | 160-161 | |
| F-0510 | 133-136 | |
| F-1861 | 103-104 | |

TABLE 1248

| Compound Number | Physical property value [$^1$H-NMR data TMS δ (ppm)] | |
|---|---|---|
| F-0165 | 400 MHz, $CDCl_3$ | 1.58-1.64 (2H, m), 1.73-1.90 (4H, m), 2.83 (2H, t), 4.06 (2H, t), 6.81 (1H, t), 7.20 (1H, d), 7.62 (1H, d) |
| F-0171 | 400 MHz, $CDCl_3$ | 1.57-1.65 (2H, m), 1.75-1.90 (4H, m), 2.92 (2H, t), 4.06 (2H, t), 7.20 (1H, d), 7.62 (1H, d) |
| F-0509 | 300 MHz, $CDCl_3$ | 1.50 (3H, d), 4.04-4.20 (3H, m), 5.32 (1H, brs), 7.28 (1H, d), 7.65 (1H, d) |
| F-0511 | 300 MHz, $CDCl_3$ | 1.50 (3H, d), 4.04-4.20 (3H, m), 5.34 (1H, brs), 7.28 (1H, d), 7.64 (1H, d) |
| F-0965 | 400 MHz, $CDCl_3$ | 1.57-1.66 (2H, m), 1.73-1.91 (4H, m), 2.57 (3H, s), 2.92 (2H, t), 4.06 (2H, t), 7.10 (1H, d), 7.67 (1H, d) |
| F-1303 | 400 MHz, DMSO-$d_6$ | 1.26 (3H, d), 2.46 (3H, s), 3.83-3.92 (1H, m), 3.96 (1H, t), 4.10 (1H, dd), 7.21 (1H, d), 7.57 (1H, d), 9.61 (1H, brs), 12.93 (1H, brs) |
| F-1626 | 300 MHz, DMSO-$d_6$ | 3.53 (2H, t), 4.10 (2H, t), 7.12 (1H, dd), 7.30 (1H, d), 7.46 (1H, d) |
| F-1644 | 300 MHz, DMSO-$d_6$ | 1.23 (3H, d), 3.82-3.94 (2H, m), 4.04 (1H, m), 7.11 (1H, dd), 7.30 (1H, d), 7.46 (1H, d) |
| F-1645 | 300 MHz, DMSO-$d_6$ | 1.34 (3H, d), 3.44 (1H, dd), 3.62 (1H, d), 4.57 (1H, m), 5.42 (1H, s), 7.03 (1H, d), 7.41 (1H, d), 7.52 (1H, d) |
| F-1773 | 400 MHz, $CDCl_3$ | 1.56-1.63 (2H, m), 1.72-1.83 (4H, m), 2.57 (3H, s), 2.84 (2H, t), 3.99 (2H, t), 6.81 (1H, t), 7.01 (1H, dd), 7.17 (1H, d), 7.67 (1H, d) |
| F-1779 | 400 MHz, $CDCl_3$ | 1.57-1.64 (2H, m), 1.75-1.86 (4H, m), 2.58 (3H, s), 2.92 (2H, t), 3.99 (2H, t), 7.01 (1H, dd), 7.17 (1H, d), 7.58 (1H, d), 11.71 (1H, brs) |

TABLE 1248-continued

| Compound Number | Physical property value [$^1$H-NMR data TMS δ (ppm)] | |
|---|---|---|
| F-1810 | 400 MHz, $CDCl_3$ | 1.48 (3H, d), 2.58 (3H, s), 3.97 (1H, m), 4.11 (2H, m), 5.23 (1H, brs), 7.02 (1H, dd), 7.21 (1H, d), 7.56 (1H, dd) |

TABLE 1249

| Compound Number | Physical property value [$^1$H-NMR data TMS δ (ppm)] | |
|---|---|---|
| F-1923 | 300 MHz, DMSO-$d_6$ | 1.52 (3H, d), 4.14 (3H, m), 5.77 (1H, brs), 7.38 (1H, s), 7.83 (1H, s), 8.00 (1H, s) |
| F-1926 | 300 MHz, DMSO-$d_6$ | 1.48 (3H, d), 4.00 (1H, m), 4.13 (2H, m), 5.50 (1H, brs), 7.11 (1H, dd), 7.29 (1H, d), 7.56 (1H, d) |
| F-0074 | 300 MHz, DMSO-$d_6$ | 1.00 (4H, s), 4.09 (2H, s), 7.54 (1H, d), 7.51 (1H, d) |
| F-0387 | 300 MHz, DMSO-$d_6$ | 0.84-1.02 (4H, m), 1.38 (3H, d), 2.67 (1H, m), 4.22-4.43 (3H, m), 7.57 (1H, d), 7.63 (1H, d) |

TABLE 1250

| Compound Number | Physical property value Melting point (° C.) | Physical property value Refractive index ($n_D^{20}$) |
|---|---|---|
| G-0430 | | 1.5010 |
| G-1893 | | 1.4862 |
| G-3809 | | 1.4978 |
| G-4392 | | 1.5055 |
| G-4480 | | 1.5072 |

TABLE 1251

| Compound Number | Physical property value [$^1$H-NMR data TMS δ (ppm)] | |
|---|---|---|
| G-0036 | 300 MHz, $CDCl_3$ | 1.15 (3H, d), 2.39 (1H, m), 3.65 (1H, dd), 3.71 (1H, dd), 3.92 (3H, s), 3.96-4.05 (2H, m), 7.18 (1H, d), 7.48 (1H, d) |
| G-0104 | 300 MHz, $CDCl_3$ | 2.31 (3H, s), 3.92 (3H, s), 4.64 (2H, s), 7.34 (1H, d), 7.42 (1H, d) |
| G-0378 | 300 MHz, DMSO-$d_6$ | 1.09 (3H, d), 3.18 (2H, brs), 3.23 (1H, m), 3.86 (3H, s), 3.88-3.96 (2H, m), 7.59 (1H, d), 7.63 (1H, d) |
| G-0381 | 300 MHz, DMSO-$d_6$ | 1.28 (3H, d), 3.61 (1H, m), 3.87 (3H, s), 4.16 (1H, dd), 4.25 (1H, dd), 7.65 (1H, d), 7.68 (1H, d), 8.14 (3H, brs) |
| G-0382 | 300 MHz, $CDCl_3$ | 1.32 (3H, d), 3.52 (1H, m), 3.91 (3H, s), 3.97-4.12 (2H, m), 6.03 (2H, brs), 7.25 (1H, d), 7.55 (1H, d) |
| G-0383 | 300 MHz, DMSO-$d_6$ | 1.29 (3H, d), 3.63 (1H, m), 3.87 (3H, s), 4.17 (1H, dd), 4.27 (1H, dd), 7.66 (1H, d), 7.68 (1H, d), 8.25 (3H, brs) |
| G-0393 | 300 MHz, $CDCl_3$ | 0.31-0.41 (2H, m), 0.44-0.56 (2H, m), 1.23 (3H, d), 2.17 (1H, m), 3.26 (1H, m), 3.92 (3H, s), 3.94-4.01 (3H, m), 7.19 (1H, d), 7.50 (1H, d) |
| G-0431 | 300 MHz, $CDCl_3$ | 1.31 (3H, d), 1.45 (9H, s), 3.92 (3H, s), 3.96-4.09 (3H, m), 4.75 (1H, brs), 7.19 (1H, d), 7.50 (1H, d) |
| G-0432 | 300 MHz, $CDCl_3$ | 1.29 (3H, d), 1.43 (9H, s), 3.91 (3H, s), 3.96-4.09 (3H, m), 4.72 (1H, brs), 7.18 (1H, d), 7.49 (1H, d) |
| G-0516 | 300 MHz, $CDCl_3$ | 1.49 (3H, d), 3.93 (3H, s), 4.02-4.18 (3H, m), 5.28 (1H, brs), 7.24 (1H, d), 7.49 (1H, d) |

TABLE 1251-continued

| Compound Number | Physical property value [$^1$H-NMR data TMS δ (ppm)] | |
|---|---|---|
| G-0517 | 300 MHz, $CDCl_3$ | 1.49 (3H, d), 3.93 (3H, s), 4.02-4.17 (3H, m), 5.49 (1H, brs), 7.23 (1H, d), 7.49 (1H, d) |
| G-0518 | 300 MHz, $CDCl_3$ | 1.49 (3H, d), 3.94 (3H, s), 4.02-4.18 (3H, m), 5.24 (1H, brs), 7.24 (1H, d), 7.49 (1H, d) |

TABLE 1252

| Compound Number | Physical property value [$^1$H-NMR data TMS δ (ppm)] | |
|---|---|---|
| G-1641 | 300 MHz, DMSO-$d_6$ | 3.20 (2H, t), 3.86 (3H, s), 4.23 (2H, t), 7.21 (1H, dd), 7.38 (1H, d), 7.52 (1H, d), 8.20 (3H, brs) |
| G-1652 | 300 MHz, DMSO-$d_6$ | 1.28 (3H, d), 3.60 (1H, m), 3.87 (3H, s), 4.03 (1H, dd), 4.19 (1H, dd), 7.22 (1H, dd), 7.40 (1H, d), 7.53 (1H, d), 8.23 (1H, brs) |
| G-1656 | 300 MHz, DMSO-$d_6$ | 1.27 (3H, d), 3.01 (1H, dd), 3.12 (1H, dd), 3.86 (3H, s), 4.72 (1H, s), 7.24 (1H, d), 7.40 (1H, d), 7.51 (1H, d), 8.17 (1H, brs) |
| G-1668 | 300 MHz, $CDCl_3$ | 1.45 (9H, s), 3.54 (2H, m), 3.93 (3H, s), 4.21 (2H, t), 4.93 (1H brs), 6.96 (1H, dd), 7.32 (1H, d), 7.35 (1H, d) |
| G-1674 | 300 MHz, $CDCl_3$ | 1.29 (3H, d), 1.45 (9H, s), 3.93 (3H, s), 3.94-4.11 (3H, m), 4.71 (1H, brs), 6.98 (1H, dd), 7.34 (1H, d), 7.35 (1H, d) |
| G-1677 | 300 MHz, $CDCl_3$ | 1.27 (3H, d), 1.44 (9H, s) 3.24 (1H, m), 3.46 (1H, m), 3.927 (3H, s), 4.49 (1H, m), 4.89 (1H, brs), 6.97 (1H, dd), 7.34 (d, 1H), 7.35 (1H, d,) |
| G-1703 | 300 MHz, $CDCl_3$ | 3.70 (2H, t), 3.93 (1H, s), 4.12 (2H, t), 5.40 (1H, s), 6.96 (1H, dd), 7.33 (1H, d), 7.36 (1H, d) |
| G-1721 | 300 MHz, $CDCl_3$ | 1.46 (3H, d), 3.94 (3H, s), 3.96 (1H, m), 4.05-4.13 (2H, m), 5.24 (1H, brs), 6.97 (1H, dd), 7.34 (1H, d), 7.37 (1H, d) |
| G-1722 | 300 MHz, $CDCl_3$ | 1.32 (3H, d), 3.42 (1H, dd), 3.60 (1H, dd), 4.55 (1H, m), 5.35 (1H, brs), 6.97 (1H, d), 7.35 (1H, d), 7.37 (1H, d) |
| G-1855 | 300 MHz, DMSO-$d_6$ | 1.29 (3H, d), 2.44 (3H, s), 3.58 (1H, m), 3.83 (3H, s), 4.00 (1H, dd), 4.14 (1H, dd), 7.13 (1H, dd), 7.28 (1H, d), 7.41 (1H, d), 8.17 (3H, brs) |
| G-1877 | 300 MHz, $CDCl_3$ | 1.29 (3H, d), 1.45 (9H, s), 2.52 (3H, s), 3.88 (3H, s), 3.93 (2H, m), 4.04 (1H, m), 4.76 (1H, brs), 6.96 (1H, dd), 7.14 (1H, d), 7.44 (1H, d) |
| G-1924 | 300 MHz, $CDCl_3$ | 1.46 (3H, d), 2.53 (3H, s), 3.90 (3H, s), 3.95 (1H, m), 4.07 (1H, m), 5.25 (1H, brs), 6.95 (1H, dd), 7.18 (1H, d), 7.43 (1H, d) |

TABLE 1253

| Compound Number | Physical property value [$^1$H-NMR data TMS δ (ppm)] | |
|---|---|---|
| G-2040 | 300 MHz, DMSO-$d_6$ | 1.30 (3H, d), 3.63, (1H, m), 3.91 (3H, s), 4.15 (1H, dd), 4.34 (1H, dd), 7.63 (1H, m), 7.81 (2H, m), 8.22 (3H, brs) |
| G-2043 | 300 MHz, $CDCl_3$ | 1.31 (3H, d), 1.45 (9H, s), 3.93 (3H, s), 4.01 (2H, d), 4.05 (1H, m), 4.72 (1H, brs), 7.26 (1H, m), 7.73 (1H, m), 7.90 (1H, m) |
| G-2046 | 300 MHz, $CDCl_3$ | 1.49 (3H, d), 3.94 (3H, s), 4.11 (3H, m), 5.18 (1H, brs), 7.34 (1H, m), 7.73 (1H, m), 7.95 (1H, m) |
| G-2052 | 300 MHz, DMSO-$d_6$ | 1.28 (3H, d), 3.62 (1H, m), 3.87 (3H, s), 4.04 (1H, dd), 4.22 (1H, dd), 7.34 (1H, dd), 7.50 (2H. m), 8.10 (3H, brs) |
| G-2055 | 300 MHz, $CDCl_3$ | 1.28 (3H, d), 1.45 (9H, s), 3.93 (3H, s), 3.96 (2H, d), 4.07 (1H, m), 4.67 (1H, brs), 7.07 (1H, dd), 7.23 (1H, d), 7.44 (1H, d) |

TABLE 1253-continued

| Compound Number | Physical property value [$^1$H-NMR data TMS δ (ppm)] | |
|---|---|---|
| G-2058 | 300 MHz, $CDCl_3$ | 1.47 (3H, d), 3.94 (3H, s), 3.98 (1H, m), 4.11 (2H, m), 5.17 (1H, brs), 7.07 (1H, dd), 7.28 (1H, d), 7.44 (1H, d) |
| G-3697 | 300 MHz, $CDCl_3$ | 1.19 (3H, s), 1.39 (3H, t), 2.04 (2H, brs), 2.52 (3H, s), 3.40 (1H, m), 3.77 (1H, dd), 3.96 (1H, dd), 4.35 (2H, q), 6.94 (1H, d), 7.55 (1H, d) |
| G-3749 | 300 MHz, $CDCl_3$ | 1.31 (3H, d), 1.39 (3H, t), 1.45 (9H, s), 2.52 (3H, s), 3.91-4.21 (3H, m), 4.35 (2H, q), 4.81 (1H, brs), 6.94 (1H, d), 7.56 (1H, d) |
| G-3835 | 300 MHz, $CDCl_3$ | 1.42 (3H, t), 1.47 (3H, d), 2.53 (3H, s), 4.02-4.15 (3H, m), 4.35 (2H, q), 5.55 (1H, brs), 6.96 (1H, d), 7.54 (1H, d) |
| G-0074 | 300 MHz, DMSO-$d_6$ | 0.93-0.98 (2H, m), 1.09-1.15 (2H, m), 3.86 (3H, s), 4.25 (2H, s), 7.63 (1H, s), 7.67 (1H, s), 8.69 (3H, brs) |
| G-0075 | 300 MHz, $CDCl_3$ | 0.88-0.99 (4H, m), 1.43 (9H, s), 3.92 (3H, s), 4.05 (2H, s), 5.18 (1H, brs), 7.19 (1H, d), 7.47 (1H, d) |
| G-0076 | 300 MHz, $CDCl_3$ | 1.01-1.05 (2H, m), 1.26-1.30 (2H, m), 3.93 (3H, s), 4.05 (2H, s), 5.77 (1H, brs), 7.23 (1H, d), 7.46 (1H, d) |
| G-0106 | 300 MHz, $CDCl_3$ | 2.98 (1H, brs), 3.94 (3H, s), 4.24 (1H, dd), 4.33 (1H, dd), 4.43 (1H, m), 7.23 (1H, d), 7.54 (1H, d) |
| G-0107 | 300 MHz, $CDCl_3$ | 3.77 (2H, brs), 3.94 (3H, s), 4.27 (2H, s), 7.25 (1H, d), 7.59 (1H, d) |
| G-0108 | 300 MHz, $CDCl_3$ | 3.94 (3H, s), 5.05 (2H, s), 7.23 (1H, d), 7.61 (1H, d), 8.79 (1H, brs) |
| G-0394 | 300 MHz, $CDCl_3$ | 0.84-0.94 (2H, m), 1.01 (1H, m), 1.15 (1H, m), 1.50 (3H, d), 2.63 (1H, m), 3.94 (3H, s), 4.07 (1H, dd), 4.28 (1H, dd), 4.48 (1H, m), 7.22 (1H, d), 7.48 (1H, d) |
| G-0770 | 300 MHz, $CDCl_3$ | 1.12 (3H, d), 2.57 (1H, m), 3.72 (1H, dd), 3.84 (1H, dd), 3.91 (3H, s), 3.94-4.01 (2H, m), 7.11 (1H, d), 7.43 (1H, d), 7.70-7.73 (2H, m), 7.82-7.85 (2H, m) |

Next, formulation examples of the pest control agent of the present invention using the 3-alkoxybenzamide derivative or agriculturally acceptable salt thereof according to the present invention produced as described above will be specifically described. However, the type and blending ratio of the compound and the additive are not limited thereto, and can be changed in a wide range. In the following description, "part" means part by mass.

[Formulation Example 1] Emulsifiable Concentrate

Each compound listed in Tables 1 to 1062 and Tables 1234 to 1244: 10 parts

Cyclohexanone: 30 parts

Polyoxyethylene alkyl aryl ether: 11 parts

Calcium alkylbenzenesulfonate: 4 parts

Methylnaphthalene: 45 parts

The above components were uniformly dissolved to obtain an emulsifiable concentrate.

[Formulation Example 2] Wettable Powder

Each compound listed in Tables 1 to 1062 and Tables 1234 to 1244: 10 parts

Naphthalenesulfonic acid formalin condensate sodium salt: 0.5 parts

Polyoxyethylene alkyl aryl ether: 0.5 parts

Diatomaceous earth: 24 parts

Clay: 65 parts

The above components were uniformly mixed and pulverized to obtain a wettable powder.

[Formulation Example 3] Powder

Each compound listed in Tables 1 to 1062 and Tables 1234 to 1244: 2 parts
Diatomaceous earth: 5 parts
Clay: 93 parts
The above components were uniformly mixed and pulverized to obtain a powder.

[Formulation Example 4] Granule

Each compound listed in Tables 1 to 1062 and Tables 1234 to 1244: 5 parts
Sodium salt of lauryl alcohol sulfate: 2 parts
Sodium lignin sulfonate: 5 parts
Carboxymethyl cellulose: 2 parts
Clay: 86 parts
The above components were uniformly mixed and pulverized. An amount corresponding to 20 parts of water was added to the mixture. The mixture was kneaded and processed into a granular shape of 14 to 32 mesh using an extrusion granulator, followed by drying to obtain a granule.

[Formulation Example 5] Flowable Agent

Each compound listed in Tables 1 to 1062 and Tables 1234 to 1244: 20 parts
Polyoxyethylene styrenated phenyl ether sulfate: 4 parts
Ethylene glycol: 7 parts
Silicone AF-118N (manufactured by Asahi Kasei Corporation): 0.02 parts
Water: 68.98 parts
The above components were mixed for 30 minutes with a high-speed stirrer, and pulverized with a wet pulverizer to obtain a flowable agent.

[Formulation Example 6] Water-Dispersible Granule

Each compound listed in Tables 1 to 1062 and Tables 1234 to 1244: 10 parts
Sodium lignin sulfonate: 5 parts
Polyoxyethylene alkyl aryl ether: 1 part
Sodium polycarboxylate: 3 parts
White carbon: 5 parts
Pregelatinized starch: 1 part
Calcium carbonate: 65 parts
Water: 10 parts
The above components were mixed, kneaded, and pressed to obtain a granule. The obtained granule was dried in a fluidized bed drier to obtain a water-dispersible granule.

Next, effects of the pest control agent of the present invention will be described with reference to test examples.

[Test Example 1] Test for Insecticidal Activity Against *Plutella xylostella*

The wettable powder prepared in accordance with Formulation Example 2 was diluted with water to a concentration of 500 ppm as an active ingredient. Cabbage leaves were immersed in the chemical solution, air-dried, and then placed in a plastic cup. Ten second instar larvae of *Plutella xylostella* were released into the cup, and the cup was capped. Thereafter, the cup was placed in a room at constant temperature of 25° C. The number of dead insects was examined at 6 days after the treatment, and the mortality rate was calculated by the calculation formula of Equation 1. The number of replicate is one in each test.

[Equation 1]

$$\text{Mortality rate (\%)} = \left(1 - \frac{\text{The number of surviving insects}}{\text{The number of insects provided for the test}}\right) * 100$$

The compound numbers of the compounds showing a mortality rate of 90% or more in this test are listed below.

A-0052, A-0056, A-0059, A-0060, A-0061, A-0063, A-0243, A-0405, A-0447, A-0475, A-0480, A-0491, A-0598, A-1310, A-3829, A-4710, A-4715, A-4969, A-6572, A-6692, A-6724, A-6754, A-6889, B-0009, C-0001, C-0002, C-0004, C-0006, C-0010, C-0011, C-0068, C-0128, C-0130, C-0188, C-0190, C-0192, C-0196, C-0197, C-0314, C-0316, C-0374, C-0448, C-0590, C-0664, C-0698, C-0806, C-0880, C-0988, C-1023, C-11248, C-11256, C-11264, C-11272, C-11312, C-11392, C-11400, C-11512, C-11520, C-11528, C-11536, C-11568, C-11624, C-11664, C-11680, C-11696, C-11712, C-11720, C-11744, C-11752, C-11784, C-11792, C-11800, C-1349, C-1367, C-1403, C-1439, C-1457, C-1475, C-1511, C-2980, C-3076, C-3550, C-4162, C-4214, C-8914, C-8950, C-9334, C-9338, C-9400, C-9422, C-9432, C-9464, C-9496, C-9528, C-9560, C-9592, C-9656, C-9688, C-9720, C-9752, C-9784, C-9848, C-9944, D-0006, D-0125, D-0130, D-0592, D-0664, D-2980, D-3076, D-4495

[Test Example 2] Test for Insecticidal Activity Against *Helicoverpa armigera*

The wettable powder prepared in accordance with Formulation Example 2 was diluted with water to a concentration of 500 ppm as an active ingredient. Cabbage leaves were immersed in the chemical solution, air-dried, and then placed in a plastic cup. Five hatching larvae of *Helicoverpa armigera* were released into the cup, and the cup was capped. Thereafter, the cup was placed in a room at constant temperature of 25° C. The number of dead insects was examined at 6 days after the treatment, and the mortality rate was calculated by the calculation formula of Equation 1. The number of replicate is two in each test.

The compound numbers of the compounds showing a mortality rate of 90% or more in this test are listed below.

A-0059, A-0063, A-0243, A-0405, A-0491, A-1913, A-3459, A-3506, A-3829, A-4969, B-0009, C-0002, C-0004, C-0006, C-0068, C-0128, C-0130, C-0190, C-0314, C-0316, C-0374, C-0448, C-0590, C-0664, C-0698, C-0880, C-0988, C-1349, C-1403, C-1439, C-1457, C-1475, C-1511, C-4162, C-4214, C-9400, C-9422, C-9432, C-9464, C-9496, C-9656, C-9688, C-9720, C-9752, C-9784, C-9944, C-11256, C-11264, C-11272, C-11312, C-11400, C-11512, C-11520, C-11528, C-11568, C-11624, C-11664, C-11680, C-11688, C-11696, C-11712, C-11720, C-11752, C-11784, C-11792, D-0006, D-0125, D-0130, D-0592, D-0664, D-2992, D-3076, D-4495

[Test Example 3] Test for Insecticidal Activity Against *Nilaparvata lugens*

The wettable powder prepared in accordance with Formulation Example 2 was diluted with water to a concentration of 500 ppm as an active ingredient. The rice sprouts were immersed in the chemical solution, and placed in a plastic cup. Ten second instar larvae of *Nilaparvata lugens* were released into the plastic cup, and the cup was capped.

Thereafter, the cup was placed in a room at constant temperature of 25° C. The number of dead insects was examined at 6 days after the treatment, and the mortality rate was calculated by the calculation formula of Equation 1. The number of replicate is one in each test.

The compound numbers of the compounds showing a mortality rate of 90% or more in this test are listed below.

A-0015, A-0049, A-0052, A-0056, A-0059, A-0060, A-0063, A-0064, A-0179, A-0370, A-0447, A-0474, A-0479, A-0752, A-0809, A-1483, A-1529, A-4688, A-4690, A-4710, A-4850, A-4969, A-6161, A-6482, A-6572, A-6602, A-6632, A-6662, A-6708, A-6709, A-6754, A-6814, A-6889, A-7024, B-0009, C-0001, C-0004, C-0006, C-0035, C-0066, C-0068, C-0128, C-0129, C-0130, C-0190, C-0191, C-0192, C-0314, C-0315, C-0316, C-0374, C-0448, C-0590, C-0664, C-0698, C-0806, C-0880, C-0988, C-11248, C-11256, C-11264, C-11272, C-11312, C-11392, C-11400, C-11408, C-11512, C-11520, C-11528, C-11536, C-11552, C-11584, C-11624, C-11656, C-11664, C-11680, C-11688, C-11696, C-11704, C-11712, C-11720, C-11728, C-11744, C-11752, C-11760, C-11776, C-11792, C-11808, C-11816, C-11824, C-11840, C-1349, C-13648, C-1367, C-1403, C-1439, C-1457, C-1475, C-1511, C-2980, C-3076, C-3550, C-4162, C-4214, C-8914, C-8950, C-9334, C-9338, C-9400, C-9422, C-9432, C-9464, C-9496, C-9528, C-9560, C-9592, C-9656, C-9688, C-9720, C-9752, C-9784, C-9848, C-9944, D-0006, D-0125, D-0130, D-0592, D-0664, D-2980, D-2992, D-3076, D-4495, G-3809, G-4480

[Test Example 4] Test for Control Effect Against *Aphis gossypii*

The wettable powder prepared in accordance with Formulation Example 2 was diluted with water to a concentration of 500 ppm as an active ingredient. A cucumber seedling previously inoculated with *Aphis gossypii* nymphs was immersed in the chemical solution, and air-dried. The treated cucumber seedling was placed in a room at constant temperature of 25° C. The number of surviving insects was counted at 3 days after the treatment, and the mortality rate was calculated by the calculation formula of Equation 1. The number of replicate is one in each test.

The compound numbers of the compounds showing a mortality rate of 90% or more in this test are listed below.

A-0052, A-0059, A-0060, A-0063, A-0064, A-0179, A-0405, A-0447, A-0474, A-3829, A-6572, A-6934, B-0009, C-0001, C-0004, C-0006, C-0066, C-0068, C-0128, C-0129, C-0130, C-0190, C-0191, C-0192, C-0314, C-0315, C-0316, C-0374, C-0448, C-0590, C-0664, C-0698, C-0806, C-0880, C-0988, C-1023, C-11248, C-11256, C-11264, C-11272, C-11312, C-11392, C-11400, C-11408, C-11512, C-11520, C-11528, C-11536, C-11568, C-11584, C-11624, C-11656, C-11664, C-11680, C-11688, C-11696, C-11704, C-11712, C-11720, C-11728, C-11744, C-11752, C-11760, C-11776, C-11784, C-11808, C-11816, C-11824, C-11840, C-1349, C-13648, C-1367, C-1403, C-1439, C-1457, C-1475, C-1511, C-2980, C-3076, C-3550, C-4162, C-4214, C-8914, C-9334, C-9338, C-9400, C-9422, C-9432, C-9464, C-9496, C-9528, C-9560, C-9592, C-9656, C-9688, C-9720, C-9752, C-9784, C-9848, C-9944, D-0006, D-0130, D-0592, D-0664, D-2980, D-2992, D-3076, D-4423, D-4495

[Test Example 5] Test for Control Effect Against *Tetranychus urticae*

The wettable powder prepared in accordance with Formulation Example 2 was diluted with water to a concentration of 500 ppm as an active ingredient. A soybean seedling previously inoculated with 35 female adults of *Tetranychus urticae* was immersed in the chemical solution, and air-dried. The treated soybean seedling was placed in a room at constant temperature of 25° C. The number of surviving female adults was examined at 13 days after the treatment, and the controlling value was determined by the calculation formula of Equation 2. The number of replicate is one in each test.

[Equation 2]

$$\text{Controlling value} = \left(1 - \frac{\text{The number of surviving female adults on treated seedling}}{\text{The number of surviving female adults on untreated seedling}}\right) * 100$$

The compound numbers of the compounds showing a controlling value of 90 or more in this test are listed below.

A-0008, A-0015, A-0030, A-0037, A-0049, A-0052, A-0056, A-0059, A-0060, A-0063, A-0064, A-0170, A-0179, A-0243, A-0273, A-0405, A-0447, A-0474, A-0475, A-0479, A-0480, A-0491, A-0507, A-0538, A-0598, A-0753, A-0758, A-0942, A-1310, A-1477, A-1483, A-1529, A-1960, A-3828, A-3829, A-4665, A-4687, A-4688, A-4689, A-4691, A-4693, A-4710, A-4712, A-4715, A-4735, A-4758, A-4850, A-4969, A-5011, A-5172, A-5977, A-6161, A-6482, A-6497, A-6572, A-6662, A-6692, A-6708, A-6754, A-6814, A-6844, A-6859, A-6889, A-6934, B-0009, C-0001, C-0002, C-0004, C-0005, C-0006, C-0035, C-0066, C-0068, C-0128, C-0129, C-0130, C-0188, C-0190, C-0191, C-0192, C-0196, C-0221, C-0314, C-0315, C-0316, C-0374, C-0448, C-0590, C-0664, C-0698, C-0806, C-0880, C-0988, C-1022, C-1349, C-1367, C-1403, C-1439, C-1457, C-1475, C-1511, C-2980, C-3076, C-4162, C-4214, C-9400, C-9422, C-9432, C-9464, C-9496, C-9656, C-9688, C-9720, C-9752, C-9784, C-9944, C-11248, C-11256, C-11264, C-11272, C-11312, C-11400, C-11512, C-11520, C-11528, C-11568, C-11624, C-11656, C-11664, C-11680, C-11688, C-11696, C-11704, C-11712, C-11720, C-11728, C-11744, C-11752, C-11760, C-11776, C-11784, C-11792, C-11816, C-11824, D-0006, D-0125, D-0130, D-0592, D-0664, D-2977, D-2980, D-2992, D-3076, D-4495

INDUSTRIAL APPLICABILITY

The present invention provides a novel compound having excellent insecticidal activity and a production intermediate thereof, is useful in the field of pesticides and the field of agriculture, and has industrial applicability.

The invention claimed is:

1. A 3-alkoxybenzamide derivative of formula [I], or an agriculturally acceptable salt thereof,

[Chemical Formula 1]

[I]

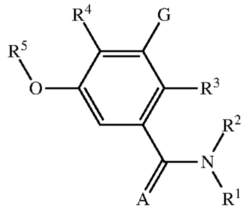

wherein in the formula [I],

A represents an oxygen atom; or a sulfur atom,

G represents a hydrogen atom, $R^1$ represents fluoromethyl; difluoromethyl; trifluoromethyl; chloromethyl; dichloromethyl; trichloromethyl; bromomethyl; dibromomethyl; tribromomethyl; iodomethyl; chlorodifluoromethyl; dichlorofluoromethyl; 1-fluoroethyl; 2-fluoroethyl; 1,1-difluoroethyl; 2,2-difluoroethyl; 2,2,2-trifluoroethyl; 1,1,2,2-tetrafluoroethyl; pentafluoroethyl; 1-chloroethyl; 1,1-dichloroethyl; 2,2-dichloroethyl; 2,2,2-trichloroethyl; 1,1,2,2-tetrachloroethyl; pentachloroethyl; 1-bromoethyl; 2,2,2-tribromoethyl; 1-iodoethyl; 2-iodoethyl; 2-chloro-2,2-difluoroethyl; 2,2-dichloro-2-fluoroethyl; 1-fluoropropyl; 2-fluoropropyl; 3-fluoropropyl; 1,1-difluoropropyl; 2,2-difluoropropyl; 3,3-difluoropropyl; 3,3,3-trifluoropropyl; 2,2,3,3,3-pentafluoropropyl; 1,1,2,3,3,3-hexafluoropropyl; heptafluoropropyl; 1-fluoro-2-propyl; 2-fluoro-2-propyl; 1,1-difluoro-2-propyl; 1,2-difluoro-2-propyl; 1,3-difluoro-2-propyl; 1,2,3-trifluoro-2-propyl; 1,1,3,3-tetrafluoro-2-propyl; 1,1,1,3,3,3-hexafluoro-2-propyl; heptafluoro-2-propyl; 1-chloropropyl; 2-chloropropyl; 3-chloropropyl; 1,1-dichloropropyl; 2,2-dichloropropyl; 3,3-dichloropropyl; 3,3,3-trichloropropyl; 2,2,3,3,3-pentachloropropyl; heptachloropropyl; 1-chloro-2-propyl; 2-chloro-2-propyl; 1,1-dichloro-2-propyl; 1,2-dichloro-2-propyl; 1,3-dichloro-2-propyl; 1,2,3-trichloro-2-propyl; 1,1,3,3-tetrachloro-2-propyl; 1,1,1,3,3,3-hexachloro-2-propyl; heptachloro-2-propyl; 1-bromopropyl; 2-bromopropyl; 3-bromopropyl; 1-bromo-2-propyl; 2-bromo-2-propyl; 1-iodopropyl 2-iodopropyl; 3-iodopropyl; 1-iodo-2-propyl; 2-iodo-2-propyl; 1-fluorobutyl; 2-fluorobutyl; 3-fluorobutyl; 4-fluorobutyl; 4,4-difluorobutyl; 4,4,4-trifluorobutyl; 4,4,4-trifluoro-3-methylbutyl; 3,3,4,4,4-pentafluorobutyl; 2,2,3,4,4,4-hexafluorobutyl; 2,2,3,3,4,4,4-heptafluorobutyl; nonafluorobutyl; 1,1,1-trifluoro-2-butyl; 4,4,4-trifluoro-2-butyl 3,3,4,4,4-pentafluoro-2-butyl; nonafluoro-2-butyl; 1,1,1,3,3,3-hexafluoro-2-(trifluoromethyl)-2-propyl; 1-chlorobutyl; 2-chlorobutyl; 3-chlorobutyl; 4-chlorobutyl; 4,4-dichlorobutyl; 4,4,4-trichlorobutyl; nonachlorobutyl; 1,1,1-trichloro-2-butyl; 4,4,4-trichloro-2-butyl; nonachloro-2-butyl; 1-bromobutyl; 2-bromobutyl; 3-bromobutyl; 4-bromobutyl; 1-iodobutyl; 2-iodobutyl; 3-iodobutyl; 4-iodobutyl; 4-chloro-1,1,2,2,3,3,4,4-octafluorobutyl; 4-bromo-1,1,2,2,3,3,4,4-octafluorobutyl; 1-fluoropentyl; 2-fluoropentyl; 3-fluoropentyl; 4-fluoropentyl; 5-fluoropentyl; 5,5,5-trifluoropentyl; 4,4,5,5,5-pentafluoropentyl; 3,3,4,4,5,5,5-heptafluoropentyl; 2,2,3,3,4,4,5,5-octafluoropentyl; 2,2,3,3,4,4,5,5,5-nonafluoropentyl; undecafluoropentyl; 1-chloropentyl; 2-chloropentyl; 3-chloropentyl; 4-chloropentyl; 5-chloropentyl; 5,5,5-trichloropentyl; 4,4,5,5,5-pentachloropentyl; 3,3,4,4,5,5,5-heptachloropentyl; 2,2,3,3,4,4,5,5,5-nonachloropentyl; undecachloropentyl; 1-bromopentyl; 2-bromopentyl; 3-bromopentyl; 4-bromopentyl; 5-bromopentyl; 5-iodopentyl; 1-fluorohexyl; 2-fluorohexyl; 3-fluorohexyl; 4-fluorohexyl; 5-fluorohexyl; 6-fluorohexyl; 6,6,6-trifluorohexyl; 5,5,6,6,6-pentafluorohexyl; 4,4,5,5,6,6,6-heptafluorohexyl; 3,3,4,4,5,5,6,6,6-nonafluorohexyl; 2,2,3,3,4,4,5,5,6,6,6-undecafluorohexyl; 2,2,3,3,4,4,5,5,6,6-decafluorohexyl; tridecafluorohexyl; 1-chlorohexyl; 2-chlorohexyl; 3-chlorohexyl; 4-chlorohexyl; 5-chlorohexyl; 6-chlorohexyl; 5-bromohexyl; 6-bromohexyl; 5-iodohexyl; 6-iodohexyl; a $C_3$-$C_6$ cycloalkyl; a $C_3$-$C_6$ halocycloalkyl; a $C_2$-$C_6$ alkenyl; a $C_2$-$C_6$ alkynyl; a $C_1$-$C_6$ alkoxy; a $C_1$-$C_6$ haloalkoxy; a $C_1$-$C_6$ alkoxy $C_1$-$C_6$ alkyl; a $C_3$-$C_6$ cycloalkyl $C_1$-$C_6$ alkyl; a cyano $C_1$-$C_6$ alkyl; a cyano $C_3$-$C_6$ cycloalkyl; a cyano $C_3$-$C_6$ cycloalkyl $C_1$-$C_6$ alkyl; a cyano heterocycloalkyl; a $C_2$-$C_6$ alkynyl $C_3$-$C_6$ cycloalkyl; a $C_1$-$C_6$ alkoxycarbonyl $C_3$-$C_6$ cycloalkyl; a carboxy $C_3$-$C_6$ cycloalkyl; a carbamoyl $C_3$-$C_6$ cycloalkyl; a $C_4$-$C_8$ bicycloalkyl; a phenyl $C_1$-$C_6$ alkyl, wherein the phenyl moiety is optionally mono-substituted or poly-substituted with $R^7$; or a heteroaryl $C_1$-$C_3$ alkyl, wherein the heteroaryl moiety is optionally mono-substituted or poly-substituted with $R^7$;

$R^2$ represents a hydrogen atom; a $C_1$-$C_6$ haloalkyl; a $C_2$-$C_6$ alkynyl; a cyano $C_1$-$C_6$ alkyl; a hydroxy $C_1$-$C_6$ alkyl; a $C_1$-$C_6$ alkoxy $C_1$-$C_6$ alkyl; a $C_1$-$C_6$ alkylcarbonyl; a $C_1$-$C_6$ alkoxycarbonyl; a $C_1$-$C_6$ haloalkoxycarbonyl; a $C_1$-$C_6$ alkoxycarbonyl $C_1$-$C_6$ alkyl; an aminocarbonyl $C_1$-$C_6$ alkyl; a $C_1$-$C_6$ alkylaminocarbonyl $C_1$-$C_6$ alkyl, wherein the amino moiety is optionally substituted with $R^{10}$; a $C_1$-$C_6$ alkylcarbonyloxy $C_1$-$C_6$ alkyl; or a $C_1$-$C_6$ alkoxycarbonyloxy $C_1$-$C_6$ alkyl or $R^1$ and $R^2$, together with the nitrogen atom to which $R^1$ and $R^2$ are attached form a 3- to 8-membered heterocyclic ring or a 3- to 8-membered heterocyclic ring having 1 to 4 heteroatoms selected from an oxygen atom, a sulfur atom, and a nitrogen atom, wherein the formed heterocyclic ring is optionally substituted with a halogen atom, a cyano, a nitro, a $C_1$-$C_6$ alkyl, a $C_1$-$C_6$ alkoxy, a $C_1$-$C_6$ haloalkyl, or an oxo, $R^3$ represents a halogen atom; a $C_1$-$C_6$ alkyl; a $C_1$-$C_6$ haloalkyl; or a $C_1$-$C_6$ haloalkoxy, $R^4$ represents a hydrogen atom; a halogen atom; or a $C_1$-$C_6$ alkyl, $R^5$ represents a $C_2$-$C_{12}$ alkyl, wherein the $C_2$-$C_{12}$ alkyl is optionally mono-substituted or poly-substituted with $R^6$; or a $C_2$-$C_6$ alkenyl, wherein the $C_2$-$C_6$ alkenyl is optionally mono-substituted or poly-substituted with $R^6$, $R^6$ represents a halogen atom; a $C_1$-$C_6$ alkyl; a $C_1$-$C_6$ haloalkyl; a $C_3$-$C_6$ cycloalkyl; a hydroxy; a thiol; a $C_1$-$C_6$ alkylthio; a $C_1$-$C_6$ haloalkylthio; a $C_1$-$C_6$ alkylsulfinyl; a $C_1$-$C_6$ haloalkylsulfinyl; a $C_1$-$C_6$ alkylsulfonyl; a $C_1$-$C_6$ haloalkylsulfonyl; a $C_1$-$C_6$ alkylcarbonyl; an amino; a $C_1$-$C_6$ alkylcarbonylamino, wherein the amino moiety is optionally substituted with $R^{10}$; a $C_1$-$C_6$ haloalkylcarbonylamino, wherein the amino moiety is optionally substituted with $R^{10}$; a $C_1$-$C_6$ alkoxycarbonylamino, wherein the amino moiety is optionally substituted with $R^{10}$; a $C_1$-$C_6$ haloalkoxycarbonylamino, wherein the amino moiety is optionally substituted with $R^{10}$; a $C_1$-$C_6$ haloalkylsulfinylamino, wherein the amino moiety is optionally substituted with $R^{10}$; a $C_1$-$C_6$ haloalkylsulfonylamino, wherein the amino moiety is optionally substituted with $R^{10}$; a phenylsulfonylamino, wherein the phenyl moiety is optionally mono-substituted or poly-substituted with $R^7$, and the amino moiety is optionally substituted with $R^{10}$; a phenyl, wherein the phenyl is optionally mono-substituted or poly-substituted with $R^7$; an azetidinyl, wherein a nitrogen atom of the azetidinyl is optionally substituted with $R^{10}$; a 1,3-dioxolanyl; a pyrazolyl, wherein the pyrazolyl is optionally mono-substituted or poly-substituted with $R^7$; a triazolyl, wherein the triazolyl is optionally mono-substituted or poly-substituted with $R^7$; a 1,3- dioxoisoindolinyl, wherein the 1,3-dioxoisoindolinyl is optionally mono-substituted or poly-substituted with $R^7$; or a thiocyanato, $R^7$ represents a halogen atom; a $C_1$-$C_6$ alkyl; a $C_1$-$C_6$ haloalkyl; or a cyano, and $R^{10}$ represents a $C_1$-$C_6$ alkyl; a $C_1$-$C_6$ haloalkyl; a $C_3$-$C_6$ cycloalkyl; a $C_1$-$C_6$ alkoxy $C_1$-$C_6$ alkyl; a $C_1$-$C_6$ alkoxy $C_1$-$C_6$ alkoxy $C_1$-$C_6$ alkyl; a $C_1$-$C_6$ alkylthio $C_1$-$C_6$ alkyl; a $C_1$-$C_6$ alkylsulfonyl $C_1$-$C_6$ alkyl; a cyano $C_1$-$C_6$ alkyl; a $C_1$-$C_6$ alkylcarbonyl; a $C_1$-$C_6$ alkoxycarbonyl; a $C_1$-$C_6$ haloalkylsulfonyl; a $C_1$-$C_6$ alkylcarbonyl $C_1$-$C_6$ alkyl; a $C_1$-$C_6$ alkoxycarbonyl $C_1$-$C_6$ alkyl; a $C_1$-$C_6$ alkylcarbonyloxy $C_1$-$C_6$ alkyl; a $C_1$-$C_6$ alkoxycarbonyloxy $C_1$-$C_6$ alkyl; or a 5-methyl-1,3-dioxole-2-one-4-ylmethyl.

2. An agrochemical composition comprising the 3-alkoxybenzamide derivative or the agriculturally acceptable salt thereof according to claim 1 as an active ingredient.

3. The agrochemical composition according to claim 2, which further comprises a surfactant.

4. The agrochemical composition according to claim 2, wherein the agrochemical composition is capable of controlling pests in a paddy field, a dry field, a lawn, an orchard, a non-crop land, a greenhouse, a seedling raising facility, and a plant factory where an agricultural or horticultural plant is cultivated.

5. The agrochemical composition according to claim 4, wherein the agricultural or horticultural plant is a plant to which resistance is imparted by a breeding or genetic modification techniques.

6. A hydroxybenzamide derivative of formula [II], or a salt thereof,

[Chemical Formula 2]

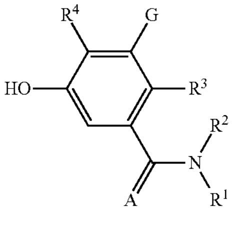

[II]

wherein in the formula [II],

A represents an oxygen atom or a sulfur atom,

G represents a hydrogen atom, $R^1$ represents an n-propyl; a sec-butyl; an isobutyl; a tert-butyl; an n-pentyl; a 1-methylbutyl; a 2-methylbutyl; a 3-methylbutyl; an 1-ethylpropyl; a 1,1-dimethylpropyl; a 1,2-dimethylpropyl; a neopentyl; an n-hexyl; a 1-methylpentyl; a 2-methylpentyl; a 3-methylpentyl; a 4-methylpentyl; a 1-ethylbutyl; a 2-ethylbutyl; a 1,1-dimethylbutyl; a 1,2-dimethylbutyl; a 1,3-dimethylbutyl; a 2,2-dimethylbutyl; a 2,3-dimethylbutyl; a 3,3-dimethylbutyl; a 1,1,2-trimethylpropyl; a 1,2,2-trimethylpropyl; 1-ethyl-1-methylpropyl; a 1-ethyl-2-methylpropyl; fluoromethyl; difluoromethyl; trifluoromethyl; chloromethyl; dichloromethyl; trichloromethyl; bromomethyl; dibromomethyl; tribromomethyl; iodomethyl; chlorodifluoromethyl; dichlorofluoromethyl; 1-fluoroethyl; 2-fluoroethyl; 1,1-difluoroethyl; 2,2-difluoroethyl; 2,2,2-trifluoroethyl; 1,1,2,2-tetrafluoroethyl; pentafluoroethyl; 1-chloroethyl; 2-chloroethyl; 1,1-dichloroethyl; 2,2-dichloroethyl; 2,2,2-trichloroethyl; 1,1,2,2-tetrachloroethyl; pentachloroethyl; 1-bromoethyl; 2-bromoethyl; 2,2,2-tribromoethyl; 1-iodoethyl; 2-iodoethyl; 2-chloro-2,2-difluoroethyl; 2,2-dichloro-2-fluoroethyl; 1-fluoropropyl; 2-fluoropropyl; 3-fluoropropyl; 1,1-difluoropropyl; 2,2-difluoropropyl; 3,3-difluoropropyl; 3,3,3-trifluoropropyl; 2,2,3,3,3-pentafluoropropyl; 1,1,2,3,3,3-hexafluoropropyl; heptafluoropropyl; 1-fluoro-2-propyl; 2-fluoro-2-propyl; 1,1-difluoro-2-propyl; 1,2-difluoro-2-propyl; 1,3-difluoro-2-propyl; 1,2,3-trifluoro-2-propyl; 1,1,3,3-tetrafluoro-2-propyl; 1,1,1,3,3,3-hexafluoro-2-propyl; heptafluoro-2-propyl; 1-chloropropyl; 3-chloropropyl; 1,1-dichloropropyl; 2,2-dichloropropyl; 3,3-dichloropropyl; 3,3,3-trichloropropyl; 2,2,3,3,3-pentachloropropyl; heptachloropropyl; 2-chloro-2-propyl; 1,1-dichloro-2-propyl; 1,2-dichloro-2-propyl; 1,3-dichloro-2-propyl; 1,2,3-trichloro-2-propyl; 1,1,3,3-tetrachloro-2-propyl; 1,1,1,3,3,3-hexachloro-2-propyl; heptachloro-2-propyl; 1-bromopropyl; 2-bromopropyl; 3-bromopropyl; 1-bromo-2-propyl; 2-bromo-2-propyl; 1-iodopropyl; 2-iodopropyl; 3-iodopropyl; 1-iodo-2-propyl; 2-iodo-2-propyl; 1-fluorobutyl; 2-fluorobutyl; 3-fluorobutyl; 4-fluorobutyl, 4,4-difluorobutyl; 4,4,4-trifluorobutyl; 4,4,4-trifluoro-3-methylbutyl; 3,3,4,4,4-pentafluorobutyl; 2,2,3,4,4,4-hexafluorobutyl; 2,2,3,3,4,4,4-heptafluorobutyl; nonafluorobutyl; 1,1,1-trifluoro-2-butyl; 4,4,4-trifluoro-2-butyl, 3,3,4,4,4-pentafluoro-2-butyl; nonafluoro-2-butyl; 1,1,1,3,3,3-hexafluoro-2-(trifluoromethyl)-2-propyl; 1-chlorobutyl; 2-chlorobutyl; 3-chlorobutyl; 4-chlorobutyl; 4,4-dichlorobutyl; 4,4,4-trichlorobutyl; nonachlorobutyl; 1,1,1-trichloro-2-butyl; 4,4,4-trichloro-2-butyl; nonachloro-2-butyl; 1-bromobutyl; 2-bromobutyl; 3-bromobutyl; 4-bromobutyl; 1-iodobutyl; 2-iodobutyl; 3-iodobutyl; 4-iodobutyl; 4-chloro-1,1,2,2,3,3,4,4-octafluorobutyl; 4-bromo-1,1,2,2,3,3,4,4-octafluorobutyl; 1-fluoropentyl; 2-fluoropentyl; 3-fluoropentyl; 4-fluoropenty; 5-fluoropentyl, 5,5,5-trifluoropentyl; 4,4,5,5,5-pentafluoropentyl; 3,3,4,4,5,5,5-heptafluoropentyl; 2,2,3,3,4,4,5,5-octafluoropentyl; 2,2,3,3,4,4,5,5,5-nonafluoropentyl; undecafluoropentyl; 1-chloropentyl; 2-chloropentyl; 3-chloropentyl; 4-chloropentyl; 5-chloropentyl; 5,5,5-trichloropentyl; 4,4,5,5,5-pentachloropentyl; 3,3,4,4,5,5,5-heptachloropentyl; 2,2,3,3,4,4,5,5,5-nonachloropentyl; undecachloropentyl; 1-bromopentyl; 2-bromopentyl; 3-bromopentyl; 4-bromopentyl; 5-bromopentyl; 5-iodopentyl; 1-fluorohexyl; 2-fluorohexyl; 3-fluorohexyl; 4-fluorohexyl; 5-fluorohexyl; 6-fluorohexyl; 6,6,6-trifluorohexyl; 5,5,6,6,6-pentafluorohexyl; 4,4,5,5,6,6,6-heptafluorohexyl; 3,3,4,4,5,5,6,6,6-nonafluorohexyl; 2,2,3,3,4,4,5,5,6,6,6-undecafluorohexyl; 2,2,3,3,4,4,5,5,6,6-decafluorohexyl; tridecafluorohexyl; 1-chlorohexyl; 2-chlorohexyl; 3-chlorohexyl; 4-chlorohexyl; 5-chlorohexyl; 6-chlorohexyl; 5-bromohexyl; 6-bromohexyl; 5-iodohexyl; and 6-iodohexyl; a $C_3$-$C_6$ cycloalkyl; a $C_3$-$C_6$ halocycloalkyl; a $C_2$-$C_6$ alkenyl; a $C_2$-$C_6$ alkynyl; a $C_1$-$C_6$ alkoxy; a $C_1$-$C_6$ haloalkoxy; a $C_1$-$C_6$ alkoxy $C_1$-$C_6$ alkyl; a $C_3$-$C_6$ cycloalkyl $C_1$-$C_6$ alkyl; a cyano $C_1$-$C_6$ alkyl; a cyano $C_3$-$C_6$ cycloalkyl; a cyano $C_3$-$C_6$ cycloalkyl $C_1$-$C_6$ alkyl; a cyano heterocycloalkyl; a $C_2$-$C_6$ alkynyl $C_3$-$C_6$ cycloalkyl; a $C_1$-$C_6$ alkoxycarbonyl $C_3$-$C_6$ cycloalkyl; a carboxy $C_3$-$C_6$ cycloalkyl; a carbamoyl $C_3$-$C_6$ cycloalkyl; a $C_4$-$C_8$ bicycloalkyl; a phenyl, wherein the phenyl is mono-substituted or poly-substituted with $R^7$; a phenyl $C_1$-$C_6$ alkyl, wherein the phenyl moiety is optionally mono-substituted or poly-substituted with $R^7$; or a heteroaryl $C_1$-$C_3$ alkyl, wherein the heteroaryl moiety is optionally mono-substituted or poly-substituted with $R^7$;

$R^2$ represents a hydrogen atom; a $C_2$-$C_6$ alkyl; a $C_1$-$C_6$ haloalkyl; a $C_2$-$C_6$ alkynyl; a cyano $C_1$-$C_6$ alkyl; a hydroxy $C_1$-$C_6$ alkyl; a $C_1$-$C_6$ alkoxy $C_1$-$C_6$ alkyl; a $C_1$-$C_6$ alkylcarbonyl; a $C_1$-$C_6$ alkoxycarbonyl; a $C_1$-$C_6$ haloalkoxycarbonyl; a $C_1$-$C_6$ alkoxycarbonyl $C_1$-$C_6$ alkyl; an aminocarbonyl $C_1$-$C_6$ alkyl; a $C_1$-$C_6$ alkylaminocarbonyl $C_1$-$C_6$ alkyl, wherein the amino moiety is optionally substituted with $R^{10}$; a $C_1$-$C_6$ alkylcarbonyloxy $C_1$-$C_6$ alkyl; or a $C_1$-$C_6$ alkoxycarbonyloxy $C_1$-$C_6$ alkyl, or $R^1$ and $R^2$, together with the nitrogen atom to which $R^1$ and $R^2$ are attached form a 3- to 8-membered heterocyclic ring or a 3- to 8-membered heterocyclic ring having 1 to 4 heteroatoms selected from an oxygen atom, a sulfur atom, and a nitrogen atom, and the heterocyclic ring is optionally substituted with a halogen atom, a cyano, a nitro, a $C_1$-$C_6$ alkyl, a $C_1$-$C_6$ alkoxy, a $C_1$-$C_6$ haloalkyl, or an oxo, $R^3$ represents a fluorine atom; a chlorine atom; a bromine atom; a $C_1$-$C_6$ alkyl; a $C_1$-$C_6$ haloalkyl; or a $C_1$-$C_6$ haloalkoxy, $R^4$ represents a hydrogen atom; a halogen atom; or a $C_1$-$C_6$ alkyl, $R^7$ represents a halogen atom; a $C_1$-$C_6$ alkyl; a $C_1$-$C_6$ haloalkyl; or a cyano, and $R^{10}$ represents a $C_1$-$C_6$ alkyl; a $C_1$-$C_6$ haloalkyl; a $C_3$-$C_6$ cycloalkyl; a $C_1$-$C_6$ alkoxy $C_1$-$C_6$ alkyl; a $C_1$-$C_6$ alkoxy $C_1$-$C_6$ alkoxy $C_1$-$C_6$ alkyl; a $C_1$-$C_6$ alkylthio $C_1$-$C_6$ alkyl; a $C_1$-$C_6$ alkylsulfonyl $C_1$-$C_6$ alkyl; a cyano $C_1$-$C_6$ alkyl; a $C_1$-$C_6$ alkylcarbonyl; a $C_1$-$C_6$ alkoxycarbonyl; a $C_1$-$C_6$ haloalkylsulfonyl; a $C_1$-$C_6$ alkylcarbonyl $C_1$-$C_6$ alkyl; a $C_1$-$C_6$ alkoxycarbonyl $C_1$-$C_6$ alkyl; a $C_1$-$C_6$ alkylcarbonyloxy $C_1$-$C_6$ alkyl; a $C_1$-$C_6$ alkoxycarbonyloxy $C_1$-$C_6$ alkyl; or a 5-methyl-1,3-dioxole-2-one-4-ylmethyl.

* * * * *